US008924269B2

(12) United States Patent
Seubert et al.

(10) Patent No.: US 8,924,269 B2
(45) Date of Patent: Dec. 30, 2014

(54) CONSISTENT SET OF INTERFACES DERIVED FROM A BUSINESS OBJECT MODEL

(75) Inventors: Michael Seubert, Sinsheim (DE); Andre Wagner, Sinsheim (DE); Andreas Brossler, Leingarten (DE); Andreas Leukert-Knapp, Heidelberg (DE); Andreas Poth, Weingarten (DE); Arno Eifel, Eppelborn (DE); Axel Kuehl, Mannheim (DE); Benjamin Klehr, Rastatt (DE); Danny Pannicke, Heidelberg (DE); Frank Reinemuth, Mannheim (DE); Georg Dopf, Schwetzingen (DE); Georg Podhajsky, Philippsburg (DE); Giovanni Deledda, Rauenberg (DE); Gunther Liebich, Walldorf (DE); Jochen Steinbach, Bad Schoenborn (DE); Klaus Reinelt, Kraichtal (DE); Klaus Schlappner, Mannheim (DE); Martin Gaub, Wiesloch (DE); Martin Schorr, Weinheim (DE); Martin Von der Emder, Wiesloch (DE); Michael Sylvester, Roemerberg (DE); Ralf Schliehe-Diecks, Berlin (DE); Robert Bieber, Walldorf (DE); Robert Doerner, Offenbach (DE); Robert Reiner, Waghaeusel-Kirrlach (DE); Rudolf Winkel, Walldorf (DE); Sergey Alekseev, Muhlhausen (DE); Stefan Adelmann, Mannheim (DE); Stefan Franke, Buxtehude (DE); Tanjana Preiser-Funke, Walldorf (DE); Thilo Kraehmer, Heidelberg (DE); Thomas Hoffmann, Roemerberg (DE); Thomas Nitschke, Nussloch (DE); Werner Gnan, Angelbachtal (DE); Yongbin He, Schriesheim (DE); Anil Joshi Jetti, Walldorf (DE); Christian Saalfrank, Berlin (DE); Sunsil S. Parvatikar, Basaveshwarnagar (IN); Sabine Montnacher, Goettelborn (DE)

(73) Assignee: SAP AG, Walldorf (DE)

( * ) Notice: Subject to any disclaimer, the term of this patent is extended or adjusted under 35 U.S.C. 154(b) by 892 days.

(21) Appl. No.: 11/803,178

(22) Filed: May 11, 2007

(65) Prior Publication Data

US 2008/0120129 A1 May 22, 2008

Related U.S. Application Data

(60) Provisional application No. 60/837,196, filed on Aug. 11, 2006, provisional application No. 60/800,352, filed on May 13, 2006.

(51) Int. Cl.
*G06Q 40/00* (2012.01)
*G06Q 30/02* (2012.01)

(Continued)

(52) U.S. Cl.
CPC ............ *G06Q 10/10* (2013.01); *G06Q 30/0283* (2013.01); *G06Q 40/04* (2013.01); *G06Q*

(Continued)

(58) Field of Classification Search
USPC ..................................................... 705/28, 35
See application file for complete search history.

(56) References Cited

U.S. PATENT DOCUMENTS

| | | | |
|---|---|---|---|
| 3,223,321 | A | 12/1965 | Baumgartner, Walter |
| 5,126,936 | A | 6/1992 | Champion et al. |

(Continued)

FOREIGN PATENT DOCUMENTS

| | | |
|---|---|---|
| CN | 1501296 | 6/2004 |
| CN | 1609866 | 4/2005 |

(Continued)

OTHER PUBLICATIONS

FSML-Financial Services Markup Language (Jul. 14, 1999) http://xml.coverpages.org/FSML-v1500a.pdf pp. 1-159.*

(Continued)

*Primary Examiner* — James A Vezeris
*Assistant Examiner* — Liz P Nguyen
(74) *Attorney, Agent, or Firm* — Fish & Richardson P.C.

(57) ABSTRACT

A business object model, which reflects data that is used during a given business transaction, is utilized to generate interfaces. This business object model facilitates commercial transactions by providing consistent interfaces that are suitable for use across industries, across businesses, and across different departments within a business during a business transaction.

44 Claims, 2037 Drawing Sheets

(51) Int. Cl.

| | |
|---|---|
| ***G06Q 40/04*** | (2012.01) |
| ***G06Q 30/04*** | (2012.01) |
| ***G06Q 10/00*** | (2012.01) |
| ***G06Q 30/06*** | (2012.01) |
| ***G06Q 10/10*** | (2012.01) |
| ***G06Q 20/10*** | (2012.01) |
| ***G06Q 10/08*** | (2012.01) |
| ***G06Q 10/06*** | (2012.01) |

(52) U.S. Cl.
CPC .. *30/0222* (2013.01); *G06Q 40/123* (2013.01); *G06Q 30/04* (2013.01); *G06Q 10/20* (2013.01); *G06Q 30/0601* (2013.01); *G06Q 20/10* (2013.01); *G06Q 10/087* (2013.01); *G06Q 40/12* (2013.01); *G06Q 40/125* (2013.01); *G06Q 10/06* (2013.01); *G06Q 40/00* (2013.01)
USPC ........................................................ 705/35

(56) References Cited

U.S. PATENT DOCUMENTS 5,210,686 A 5/1993 Jernigan
5,247,575 A 9/1993 Sprague et al.
5,255,181 A 10/1993 Chapman et al.
5,321,605 A 6/1994 Chapman et al.
5,463,555 A 10/1995 Ward et al.
5,627,764 A 5/1997 Schutzman et al.
5,717,925 A 2/1998 Harper et al.
5,787,237 A 7/1998 Reilly
5,812,987 A 9/1998 Luskin et al.
5,966,695 A 10/1999 Melchione et al.
5,970,465 A 10/1999 Dietrich et al.
5,970,475 A * 10/1999 Barnes et al. .................. 705/27
5,983,284 A 11/1999 Argade
6,044,134 A 3/2000 De La Huerga
6,047,264 A 4/2000 Fisher et al.
6,052,525 A 4/2000 Carlson et al.
6,058,378 A 5/2000 Clark et al.
6,073,137 A 6/2000 Brown et al.
6,092,196 A 7/2000 Reiche
6,104,393 A 8/2000 Santos-Gomez
6,115,690 A 9/2000 Wong
6,125,391 A 9/2000 Meltzer et al.
6,138,118 A 10/2000 Koppstein et al.
6,154,732 A 11/2000 Tarbox
6,222,533 B1 4/2001 Notani et al.
6,226,675 B1 5/2001 Meltzer et al.
6,229,551 B1 5/2001 Huang
6,275,977 B1 8/2001 Nagai et al.
6,295,548 B1 9/2001 Klein et al.
6,308,163 B1 10/2001 Du et al.
6,311,165 B1 10/2001 Coutts et al.
6,327,700 B1 12/2001 Chen et al.
6,331,972 B1 12/2001 Harris et al.
6,332,163 B1 12/2001 Bowman-Amuah
6,374,252 B1 4/2002 Althoff et al.
6,375,252 B1 4/2002 Cheron et al.
6,401,101 B1 6/2002 Britton et al.
6,424,979 B1 7/2002 Livingston et al.
6,434,159 B1 8/2002 Woodward et al.
6,438,594 B1 8/2002 Bowman-Amuah
6,442,620 B1 8/2002 Thatte et al.
6,446,136 B1 9/2002 Pohlmann et al.
6,457,041 B1 9/2002 Hutchison
6,496,825 B1 12/2002 Klein et al.
6,513,019 B2 1/2003 Lewis
6,523,027 B1 2/2003 Underwood
6,542,912 B2 4/2003 Meltzer et al.
6,591,260 B1 7/2003 Schwartzhoff et al.
6,643,660 B1 11/2003 Miller et al.
6,725,122 B2 4/2004 Mori et al.
6,738,747 B1 5/2004 Tanaka et al.
6,745,229 B1 6/2004 Gobin et al.
6,763,353 B2 7/2004 Li et al.
6,775,647 B1 8/2004 Evans et al.
6,868,370 B1 3/2005 Burbridge et al.
6,937,992 B1 8/2005 Benda et al.
6,957,230 B2 10/2005 Cameron et al.
6,970,844 B1 11/2005 Bierenbaum
7,020,594 B1 3/2006 Chacon
7,039,606 B2 5/2006 Hoffman et al.
7,055,132 B2 5/2006 Bogdan et al.
7,069,278 B2 6/2006 Telkowski
7,076,449 B2 7/2006 Tsunenari et al.
7,131,069 B1 10/2006 Rush et al.
7,206,768 B1 4/2007 deGroeve et al.
7,249,157 B2 7/2007 Stewart et al.
7,249,195 B2 7/2007 Panec et al.
7,269,569 B2 9/2007 Spira et al.
7,292,965 B1 11/2007 Mehta et al.
7,321,864 B1 1/2008 Gendler
7,363,271 B2 4/2008 Morimoto
7,379,931 B2 5/2008 Morinville
7,383,990 B2 6/2008 Veit
7,406,358 B2 7/2008 Preiss
7,426,520 B2 9/2008 Gorelik et al.
7,451,177 B1 11/2008 Johnson et al.
7,454,362 B1 11/2008 Hayes et al.
7,481,367 B2 1/2009 Fees et al.
7,509,278 B2 3/2009 Jones
7,515,697 B2 4/2009 Eng et al.
7,516,088 B2 4/2009 Johnson et al.
7,523,466 B2 4/2009 DeAngelis
7,536,697 B2 5/2009 Wiseman et al.
7,559,066 B2 7/2009 Ho et al.
7,574,383 B1 8/2009 Parasnis et al.
7,617,128 B2 11/2009 Greak
7,627,504 B2 * 12/2009 Brady et al. .................... 705/31
7,634,482 B2 12/2009 Mukherjee et al.
7,641,110 B2 1/2010 Hursta et al.
7,657,466 B2 2/2010 Klingenberg et al.
7,657,575 B2 2/2010 Eberlein et al.
7,689,711 B2 3/2010 Brouk et al.
7,761,428 B2 7/2010 Herbst et al.
7,788,319 B2 8/2010 Schmidt et al.
7,797,204 B2 9/2010 Balent
7,805,383 B2 9/2010 Veit et al.
7,813,949 B2 10/2010 Grendel et al.
7,853,491 B2 12/2010 Wittmer et al.
7,865,426 B2 1/2011 Volpert
7,873,965 B2 1/2011 Hayton et al.
7,895,209 B2 2/2011 Spence et al.
7,941,236 B2 5/2011 Spearman
7,962,385 B2 6/2011 Falk et al.
7,996,330 B2 8/2011 Veit et al.
8,082,243 B2 12/2011 Gorelik et al.
8,104,681 B2 1/2012 Eisenson
8,127,035 B1 2/2012 Hood et al.
8,150,798 B2 4/2012 Ma et al.
8,185,430 B2 5/2012 Edwards et al.
8,219,444 B2 7/2012 Zuerl et al.
8,234,375 B2 7/2012 Ghadialy et al.
8,326,795 B2 12/2012 Markovic
RE43,905 E 1/2013 Bierenbaum
8,370,272 B2 2/2013 Wicket et al.
8,396,749 B2 3/2013 Koegler et al.
8,396,751 B2 3/2013 Becker et al.
8,423,428 B2 4/2013 Grendel et al.
8,433,585 B2 4/2013 Sr et al.
8,463,666 B2 6/2013 Dorais et al.
8,473,317 B2 6/2013 Santoso et al.
2001/0042032 A1 * 11/2001 Crawshaw et al. ............. 705/32
2001/0047372 A1 11/2001 Gorelik et al.
2002/0013721 A1 1/2002 Dabbiere et al.
2002/0026394 A1 2/2002 Savage et al.
2002/0046053 A1 4/2002 Hare et al.
2002/0052754 A1 5/2002 Joyce et al.
2002/0065680 A1 5/2002 Kojima et al.
2002/0072988 A1 6/2002 Aram
2002/0087481 A1 7/2002 Harif
2002/0087483 A1 7/2002 Harif
2002/0099634 A1 7/2002 Coutts et al.
2002/0107765 A1 8/2002 Walker

(56) References Cited

U.S. PATENT DOCUMENTS

| | | | |
|---|---|---|---|
| 2002/0112171 A1 | 8/2002 | Ginter et al. | |
| 2002/0138318 A1 | 9/2002 | Ellis et al. | |
| 2002/0147668 A1 | 10/2002 | Smith et al. | |
| 2002/0152104 A1 | 10/2002 | Ojha et al. | |
| 2002/0152145 A1 | 10/2002 | Wanta et al. | |
| 2002/0156693 A1 | 10/2002 | Stewart et al. | |
| 2002/0156930 A1 | 10/2002 | Velasquez | |
| 2002/0157017 A1 | 10/2002 | Mi et al. | |
| 2002/0169657 A1 | 11/2002 | Singh et al. | |
| 2002/0184070 A1 | 12/2002 | Chen et al. | |
| 2002/0186876 A1 | 12/2002 | Jones et al. | |
| 2002/0194045 A1 | 12/2002 | Shay et al. | |
| 2003/0004799 A1* | 1/2003 | Kish | 705/14 |
| 2003/0041178 A1 | 2/2003 | Brouk et al. | |
| 2003/0046639 A1 | 3/2003 | Fai et al. | |
| 2003/0069648 A1 | 4/2003 | Douglas et al. | |
| 2003/0083910 A1 | 5/2003 | Sayal et al. | |
| 2003/0083955 A1 | 5/2003 | Ookura | |
| 2003/0084428 A1 | 5/2003 | Agostini et al. | |
| 2003/0086594 A1 | 5/2003 | Gross | |
| 2003/0097287 A1 | 5/2003 | Franz et al. | |
| 2003/0120502 A1 | 6/2003 | Robb et al. | |
| 2003/0120665 A1 | 6/2003 | Fox et al. | |
| 2003/0126077 A1 | 7/2003 | Kantor et al. | |
| 2003/0167193 A1 | 9/2003 | Jones et al. | |
| 2003/0171962 A1 | 9/2003 | Hirth et al. | |
| 2003/0172007 A1 | 9/2003 | Helmolt et al. | |
| 2003/0172135 A1* | 9/2003 | Bobick et al. | 709/220 |
| 2003/0172343 A1 | 9/2003 | Leymaster et al. | |
| 2003/0177139 A1 | 9/2003 | Cameron et al. | |
| 2003/0195815 A1 | 10/2003 | Li et al. | |
| 2003/0204452 A1 | 10/2003 | Wheeler | |
| 2003/0204637 A1 | 10/2003 | Chong | |
| 2003/0208389 A1 | 11/2003 | Kurihara et al. | |
| 2003/0212614 A1 | 11/2003 | Chu et al. | |
| 2003/0216978 A1 | 11/2003 | Sweeney et al. | |
| 2003/0220835 A1 | 11/2003 | Barnes, Jr. | |
| 2003/0220875 A1 | 11/2003 | Lam et al. | |
| 2003/0229522 A1 | 12/2003 | Thompson et al. | |
| 2003/0229550 A1 | 12/2003 | DiPrima et al. | |
| 2003/0233295 A1 | 12/2003 | Tozawa et al. | |
| 2003/0236748 A1* | 12/2003 | Gressel et al. | 705/41 |
| 2004/0002883 A1 | 1/2004 | Andrews et al. | |
| 2004/0006653 A1 | 1/2004 | Kamen et al. | |
| 2004/0015366 A1 | 1/2004 | Wiseman et al. | |
| 2004/0024662 A1 | 2/2004 | Gray et al. | |
| 2004/0024862 A1 | 2/2004 | Wall et al. | |
| 2004/0034577 A1 | 2/2004 | Van Hoose et al. | |
| 2004/0039665 A1 | 2/2004 | Ouchi | |
| 2004/0073510 A1* | 4/2004 | Logan | 705/40 |
| 2004/0083201 A1 | 4/2004 | Sholl et al. | |
| 2004/0083233 A1 | 4/2004 | Willoughby | |
| 2004/0122730 A1 | 6/2004 | Tucciarone et al. | |
| 2004/0133445 A1 | 7/2004 | Rajan et al. | |
| 2004/0138942 A1 | 7/2004 | Pearson et al. | |
| 2004/0148227 A1 | 7/2004 | Tabuchi et al. | |
| 2004/0167894 A1 | 8/2004 | Ziv | |
| 2004/0172360 A1 | 9/2004 | Mabrey et al. | |
| 2004/0186891 A1 | 9/2004 | Panec et al. | |
| 2004/0187140 A1 | 9/2004 | Aigner et al. | |
| 2004/0220910 A1 | 11/2004 | Zang et al. | |
| 2004/0254945 A1 | 12/2004 | Schmidt et al. | |
| 2004/0267597 A1 | 12/2004 | Kobrosly et al. | |
| 2004/0267714 A1 | 12/2004 | Frid et al. | |
| 2005/0005190 A1 | 1/2005 | Ofir et al. | |
| 2005/0015273 A1 | 1/2005 | Iyer | |
| 2005/0021366 A1 | 1/2005 | Pool et al. | |
| 2005/0033588 A1 | 2/2005 | Ruiz et al. | |
| 2005/0038718 A1 | 2/2005 | Barnes et al. | |
| 2005/0038744 A1* | 2/2005 | Viijoen | 705/42 |
| 2005/0049903 A1 | 3/2005 | Raja | |
| 2005/0055369 A1 | 3/2005 | Gorelik et al. | |
| 2005/0065987 A1 | 3/2005 | Telkowski et al. | |
| 2005/0066240 A1 | 3/2005 | Sykes et al. | |
| 2005/0071262 A1 | 3/2005 | Kobeh et al. | |
| 2005/0080640 A1 | 4/2005 | Bhaskaran et al. | |
| 2005/0102250 A1 | 5/2005 | Carr et al. | |
| 2005/0108085 A1 | 5/2005 | Dakar et al. | |
| 2005/0108168 A1 | 5/2005 | Halpin et al. | |
| 2005/0108276 A1 | 5/2005 | Sriram | |
| 2005/0131947 A1 | 6/2005 | Laub et al. | |
| 2005/0149539 A1 | 7/2005 | Cameron et al. | |
| 2005/0159997 A1 | 7/2005 | John | |
| 2005/0171833 A1 | 8/2005 | Jost et al. | |
| 2005/0182639 A1 | 8/2005 | Dale | |
| 2005/0187797 A1 | 8/2005 | Johnson | |
| 2005/0187866 A1* | 8/2005 | Lee | 705/39 |
| 2005/0194431 A1 | 9/2005 | Fees et al. | |
| 2005/0194439 A1 | 9/2005 | Zuerl et al. | |
| 2005/0197849 A1 | 9/2005 | Fotteler et al. | |
| 2005/0197851 A1 | 9/2005 | Veit | |
| 2005/0197878 A1 | 9/2005 | Fotteler et al. | |
| 2005/0197881 A1 | 9/2005 | Fotteler et al. | |
| 2005/0197882 A1 | 9/2005 | Fotteler et al. | |
| 2005/0197886 A1 | 9/2005 | Veit | |
| 2005/0197887 A1 | 9/2005 | Zuerl et al. | |
| 2005/0197896 A1 | 9/2005 | Veit et al. | |
| 2005/0197897 A1 | 9/2005 | Veit et al. | |
| 2005/0197898 A1 | 9/2005 | Veit et al. | |
| 2005/0197899 A1 | 9/2005 | Veit et al. | |
| 2005/0197900 A1 | 9/2005 | Veit | |
| 2005/0197901 A1 | 9/2005 | Veit et al. | |
| 2005/0197902 A1 | 9/2005 | Veit | |
| 2005/0197913 A1 | 9/2005 | Grendel et al. | |
| 2005/0197928 A1 | 9/2005 | Fotteler et al. | |
| 2005/0197941 A1 | 9/2005 | Veit | |
| 2005/0209732 A1 | 9/2005 | Audimoolam et al. | |
| 2005/0210406 A1 | 9/2005 | Biwer et al. | |
| 2005/0216321 A1 | 9/2005 | Veit | |
| 2005/0216359 A1 | 9/2005 | Welter et al. | |
| 2005/0216371 A1 | 9/2005 | Fotteler et al. | |
| 2005/0216421 A1 | 9/2005 | Barry et al. | |
| 2005/0222888 A1 | 10/2005 | Hosoda et al. | |
| 2005/0222896 A1 | 10/2005 | Rhyne et al. | |
| 2005/0222945 A1 | 10/2005 | Pannicke et al. | |
| 2005/0234754 A1 | 10/2005 | Veit | |
| 2005/0240488 A1 | 10/2005 | Grendel et al. | |
| 2005/0246240 A1 | 11/2005 | Padilla | |
| 2005/0256753 A1 | 11/2005 | Veit et al. | |
| 2005/0278693 A1 | 12/2005 | Brunell et al. | |
| 2006/0004934 A1 | 1/2006 | Guldner et al. | |
| 2006/0005098 A1 | 1/2006 | Lotz et al. | |
| 2006/0020515 A1 | 1/2006 | Lee et al. | |
| 2006/0026552 A1 | 2/2006 | Mazzitelli et al. | |
| 2006/0026586 A1 | 2/2006 | Remmel et al. | |
| 2006/0036941 A1 | 2/2006 | Neil | |
| 2006/0047574 A1 | 3/2006 | Sundaram et al. | |
| 2006/0047598 A1 | 3/2006 | Hansen | |
| 2006/0059005 A1 | 3/2006 | Horn et al. | |
| 2006/0059059 A1 | 3/2006 | Horn et al. | |
| 2006/0059060 A1 | 3/2006 | Horn et al. | |
| 2006/0069598 A1 | 3/2006 | Schweitzer et al. | |
| 2006/0069629 A1 | 3/2006 | Schweitzer et al. | |
| 2006/0069632 A1 | 3/2006 | Kahn et al. | |
| 2006/0074728 A1 | 4/2006 | Schweitzer et al. | |
| 2006/0080338 A1 | 4/2006 | Seubert et al. | |
| 2006/0085336 A1 | 4/2006 | Seubert et al. | |
| 2006/0085412 A1 | 4/2006 | Johnson et al. | |
| 2006/0085450 A1 | 4/2006 | Seubert et al. | |
| 2006/0089885 A1 | 4/2006 | Finke et al. | |
| 2006/0095373 A1 | 5/2006 | Venkatasubramanian et al. | |
| 2006/0106824 A1 | 5/2006 | Stuhec | |
| 2006/0184435 A1 | 8/2006 | Mostowfi | |
| 2006/0195563 A1 | 8/2006 | Chapin et al. | |
| 2006/0212376 A1 | 9/2006 | Snyder et al. | |
| 2006/0280302 A1 | 12/2006 | Baumann et al. | |
| 2006/0282360 A1 | 12/2006 | Kahn et al. | |
| 2007/0016601 A1 | 1/2007 | Cameron et al. | |
| 2007/0027742 A1 | 2/2007 | Emuchay et al. | |
| 2007/0027891 A1 | 2/2007 | Schauerte et al. | |
| 2007/0043583 A1 | 2/2007 | Davulcu et al. | |
| 2007/0055688 A1 | 3/2007 | Blattner | |
| 2007/0061154 A1 | 3/2007 | Markvoort et al. | |
| 2007/0067411 A1 | 3/2007 | Angelov | |

(56) References Cited

U.S. PATENT DOCUMENTS

2007/0067753 A1 3/2007 Pocklington et al.
2007/0078799 A1 4/2007 Huber-Buschbeck et al.
2007/0100491 A1 5/2007 Burrell et al.
2007/0118391 A1 5/2007 Malaney et al.
2007/0124227 A1 5/2007 Dembo et al.
2007/0129978 A1 6/2007 Shirasu et al.
2007/0132585 A1 6/2007 Llorca et al.
2007/0150387 A1 6/2007 Seubert et al.
2007/0150836 A1 6/2007 Deggelmann et al.
2007/0156428 A1 7/2007 Brecht-Tillinger et al.
2007/0156545 A1 7/2007 Lin
2007/0156552 A1 7/2007 Manganiello
2007/0156690 A1 7/2007 Moser et al.
2007/0165622 A1 7/2007 O'Rourke et al.
2007/0174811 A1 7/2007 Kaetker et al.
2007/0214065 A1* 9/2007 Kahlon et al. .................. 705/28
2007/0219864 A1 9/2007 Vollrath et al.
2007/0219941 A1 9/2007 Schnurr et al.
2007/0225949 A1* 9/2007 Sundararajan et al. ........... 703/2
2007/0226066 A1 9/2007 Brunner et al.
2007/0226090 A1 9/2007 Stratton
2007/0233574 A1 10/2007 Koegler et al.
2007/0255639 A1 11/2007 Seifert
2007/0265860 A1 11/2007 Herrmann et al.
2007/0265862 A1 11/2007 Freund et al.
2007/0288250 A1 12/2007 Lemcke et al.
2007/0294159 A1 12/2007 Cottle
2007/0295803 A1 12/2007 Levine et al.
2008/0005012 A1 1/2008 Deneef
2008/0021754 A1 1/2008 Horn et al.
2008/0027836 A1 1/2008 Chapin
2008/0040243 A1 2/2008 Chang et al.
2008/0046104 A1 2/2008 Van Camp et al.
2008/0046421 A1 2/2008 Bhatia et al.
2008/0065443 A1 3/2008 Gorur et al.
2008/0120129 A1 5/2008 Seubert et al.
2008/0120190 A1 5/2008 Joao et al.
2008/0120204 A1 5/2008 Conner et al.
2008/0120206 A1 5/2008 Weiler et al.
2008/0120313 A1 5/2008 O'Brien et al.
2008/0133303 A1 6/2008 Singh et al.
2008/0144791 A1 6/2008 Hariri et al.
2008/0154969 A1 6/2008 DeBie
2008/0162266 A1 7/2008 Griessmann et al.
2008/0184265 A1 7/2008 Kasi et al.
2008/0189360 A1 8/2008 Kiley et al.
2008/0196108 A1 8/2008 Dent et al.
2008/0208805 A1 8/2008 Wang et al.
2008/0215354 A1 9/2008 Halverson et al.
2008/0243578 A1 10/2008 Veit
2008/0263051 A1 10/2008 Kanyetzny et al.
2008/0288317 A1 11/2008 Kakar
2008/0300962 A1 12/2008 Cawston et al.
2008/0314981 A1 12/2008 Eisenson
2009/0006203 A1 1/2009 Fordyce, III et al.
2009/0063287 A1 3/2009 Tribout et al.
2009/0077074 A1 3/2009 Hosokawa
2009/0089198 A1 4/2009 Kroutik
2009/0094274 A1 4/2009 Gorelik et al.
2009/0144624 A1 6/2009 Barnes, Jr.
2009/0164497 A1 6/2009 Steinmaier et al.
2009/0192926 A1 7/2009 Tarapata
2009/0193432 A1 7/2009 Mckegney et al.
2009/0199172 A1 8/2009 Zhong et al.
2009/0222360 A1 9/2009 Schmitt et al.
2009/0222749 A1 9/2009 Marinescu et al.
2009/0248429 A1 10/2009 Doenig et al.
2009/0248430 A1 10/2009 Hubert et al.
2009/0248431 A1 10/2009 Schoknecht et al.
2009/0248463 A1 10/2009 Piochon et al.
2009/0248473 A1 10/2009 Doenig et al.
2009/0248487 A1 10/2009 Santoso et al.
2009/0248547 A1 10/2009 Doenig et al.
2009/0248558 A1 10/2009 Hollberg et al.
2009/0248586 A1 10/2009 Kaisermayr et al.
2009/0248698 A1 10/2009 Rehmann
2009/0249358 A1 10/2009 Schuette
2009/0249362 A1 10/2009 Lindemann et al.
2009/0254971 A1 10/2009 Herz et al.
2009/0271245 A1 10/2009 Joshi et al.
2009/0276338 A1 11/2009 Masermann et al.
2009/0300544 A1 12/2009 Psenka et al.
2009/0300578 A1 12/2009 Neil
2009/0326988 A1 12/2009 Barth et al.
2009/0327009 A1 12/2009 Schmitt et al.
2009/0327105 A1 12/2009 Moussa et al.
2009/0327106 A1 12/2009 Bartelt et al.
2010/0001834 A1 1/2010 Brunswig et al.
2010/0014510 A1 1/2010 Boreli et al.
2010/0070391 A1 3/2010 Storr et al.
2010/0070395 A1 3/2010 Elkeles et al.
2010/0106555 A1 4/2010 Mneimneh et al.
2010/0131379 A1 5/2010 Dorais et al.
2010/0131394 A1 5/2010 Rutsch et al.
2010/0153297 A1 6/2010 Haaf et al.
2010/0161366 A1 6/2010 Clemens et al.
2010/0161425 A1 6/2010 Sideman
2010/0169888 A1 7/2010 Hare et al.
2010/0198631 A1 8/2010 Edwards et al.
2010/0217645 A1 8/2010 Jin et al.
2010/0217820 A1 8/2010 Brouk et al.
2010/0218245 A1 8/2010 Brouk et al.
2010/0241729 A1 9/2010 Angelov
2010/0306536 A1 12/2010 Brouk et al.
2011/0046775 A1 2/2011 Bailey et al.
2011/0077999 A1 3/2011 Becker et al.
2011/0078048 A1 3/2011 Becker et al.
2011/0088000 A1 4/2011 Mackay
2011/0153505 A1 6/2011 Brunswig et al.
2011/0153767 A1 6/2011 Coldicott et al.
2011/0196717 A1 8/2011 Colliat et al.
2011/0276360 A1 11/2011 Barth et al.
2011/0276636 A1 11/2011 Cheng et al.
2011/0307289 A1 12/2011 Hosur et al.
2011/0307353 A1 12/2011 Ringl et al.
2012/0117000 A1 5/2012 Haaf et al.
2012/0118983 A1 5/2012 Harris
2012/0191604 A1 7/2012 Allin et al.
2013/0021978 A1 1/2013 Tamura et al.
2013/0144741 A1 6/2013 Becker et al.
2013/0159146 A1 6/2013 Schmitt et al.

FOREIGN PATENT DOCUMENTS

CN 1632806 6/2005
CN 1765138 4/2006
CN 1767537 5/2006
CN 101174957 5/2008
CN 101288092 10/2008
WO WO 2008/005102 1/2008

OTHER PUBLICATIONS

No Author—FSML-Financial Services Markup Language (Jul. 14, 1999) http://xml.coverpages.org/FSML-v1500a.pdf.*

SAP Structured Entity Relationship Model (SAP-SERM) for R/3 System Release 4.0 Introduction and Index; Dec. 1998; 26 pages.

SAP Structured Entity Relationship Model (SAP-SERM) for R/3 System Release 4.0 (Part 1); Dec. 1998; 5954 pages.

SAP Structured Entity Relationship Model (SAP-SERM) for R/3 System Release 4.0 (Part 2); Dec. 1998; 7838 pages.

Zencke, Peter; "Engineering a Business Platform"; SAP AG 2005; Engineering BPP; [Online] previously available at URL www.sap.com/community/pub/webcast/2006_01_16_Analyst_Summit_Vegas/2006_01_16_Analyst_Summit_Vegas_009.pdf; 36 pages.

"UML in the com Enterprise: Modeling CORBA, Components, XML/XMI and Metadata Workshop"; http://www.omg.org/news/meetings/workshops/uml_presentations.htm.

Medjahed, Brahim et al; "Business-to-Business Interactions: Issues and Enabling Technologies"; The VLDB Journal; vol. 12, No. 1; Apr. 3, 2003; pp. 59-89.

Medjahed, Brahim et al.; "Composing Web Services on the Semantic Web"; The VLDB Journal; vol. 12, No. 4, Sep. 23, 2003; pp. 333-351.

(56) References Cited

OTHER PUBLICATIONS

Born, Marc et al.; "Customizing UML for Component Design"; www.dot-profile.de; UML Workshop, Palm Springs, CA; Nov. 2000.
Kappel, Gerti et al.; "A Framework for Workflow Management Systems Based on Objects, Rules, and Roles"; ACM Computing Surveys; ACM Press; vol. 32; Mar. 2000; 5 pages.
Skonnard, Aaron et al.; "BizTalk Server 2000: Architecture and Tools for Trading Partner Integration"; MSDn Magazine; 2000; ms-help://ms.msdnqtr.2003apr.1033/dnmag00/htmal/biztalk.htm; 7 pages.
Microsoft; "Creating an XML Web Service Proxy"; 2001; mshelp://ms.msdnqtr.2003apr.1033/cpguide/html/epconcreatingwebserviceproxy.htm; 3 pages.
Proceedings of OMG Workshops: http://www.omg.org/news/meetings/workshops/proceedings.htm; pp. 1-3.
Meltzer, Bart et al.; "XML and Electronic Commerce: Enabling the Network Economy"; SIGMOD Record; ACM Press; vol. 27, No. 4; Dec. 1998; pp. 21-24.
Huhns, Michael N. et al.; "Automating Supply-Chain Mangement"; Jul. 15-19, 2002; pp. 1017-1024.
Soederstroem, Eva; "Standardising the Business Vocabulary of Standards"; SAC, Madrid, Spain; 2002; pp. 1048-1052.
Bastide, Remi et al.; "Formal Specification of CORBA Services: Experience and Lessons Learned"; 2000; pp. 105-117.
Glushko, Robert J. et al.; "An XML Framework for Agent-Based E-Commerce"; Communications of the ACM; vol. 42, No. 3; Mar. 1999; pp. 106-114.
Coen-Porisini, Alberto et al.; "A Formal Approach for Designing CORBA-Based Applications"; ACM Transactions on Software Engineering and Methodology; vol. 12, No. 2; Apr. 2003; pp. 107-151.
Yang, J. et al.; "Service Deployment for Virtual Enterprises"; IEEE; 2001; pp. 107-115.
Karp, Alan H.; "E-speak E-xplained"; Communications of the ACM; vol. 46, No. 7; Jul. 2003; pp. 113-118.
Gillibrand, David; "Essential Business Object Design"; Communications of the ACM; vol. 43, No. 2; Feb. 2000; pp. 117-119.
Cole, James et al.; "Extending Support for Contracts in ebXML"; IEEE; 2001; pp. 119-127.
DiNitto, Elisabetta et al.; "Deriving Executable Process Descriptions from UML"; ICSE '02; May 19-25, 2002; pp. 155-165.
Stumptner, Markus et al.; "On the Road to Behavior-Based Integration"; First Asia-Pacific Conferences on Conceptual Modelling; Dunedin, New Zealand; Jan. 2004; pp. 15-22.
Gosain, Sanjay et al.; "The Impact of Common E-Business Interfaces"; Communications of the ACM; vol. 46, No. 2; Dec. 2003; pp. 186-195.
Damodaran, Suresh; "B2B Integration over the Internet with XML—RosettaNet Successes and Challenges"; WWW2004; May 17-22, 2004; pp. 188-195.
Schulze, Wolfgang et al.; "Standardising on Workflow-Management—The OMG Workflow Management Facility"; SIGGROUP Bulletin; vol. 19, No. 1; Apr. 1998; pp. 24-30.
Sutherland, Jeff; "Business Objects in Corporate Information Systems"; ACM Computing Surveys; vol. 27, No. 2; Jun. 1995; pp. 274-276.
Arsanjani, Ali; "Developing and Integrating Enterprise Components and Services"; Communications of the ACM; vol. 45, No. 10; Oct. 2002; pp. 31-34.
Kim, Dan Jong et al.; "A Comparison of B2B E-Service Solutions"; Communications of the ACM; vol. 46, No. 12; Dec. 2003; pp. 317-324.
Hasselbring, Wilhelm; "Information System Integration"; Communications of the ACM; vol. 43, No. 6; Jun. 2000; pp. 33-38.
Khosravi, Navid et al.; "An Approach to Building Model Driven Enterprise Systems in Nebras Enterprise Framework"; OOPSLA '02: Companion of the 17th Annual ACM SIGPLAN Conference on Object-Oriented Programming, Systems, Languages, and Applications; Nov. 4-8, 2002; pp. 32-33.
Hogg, K. et al.; "An Evaluation of Web Services in the Design of a B2B Application"; 27th Australasian Computer Science Conference; Dunedin, New Zealand; 2004; pp. 331-340.
Gruhn, Volker et al.; "Workflow Management Based on Process Model Repositories"; IEEE 1998; pp. 379-388.
Kim, HyoungDo; "Conceptual Modeling and Specification Generation for B2B Business Processes Based on ebXML"; SIGMOD Record; vol. 31, No. 1; Mar. 2002; pp. 37-42.
Siegel, Jon; "OMG Overview: CORBA and the OMA in Enterprise Computing"; Communications of the ACM; vol. 41, No. 10; Oct. 1998; pp. 37-43.
Yang, Jian et al.; "Interoperation Support for Electronic Business": Communications of the ACM; vol. 43, No. 6; Jun. 2000; pp. 39-47.
Levi, Keith et al.; "A Goal-Driven Approach to Enterprise Component Identification and Specification"; Communications of the ACM; vol. 45. No. 10; Oct. 2002; pp. 45-52.
Terai, Koichi et al.; "Coordinating Web Services Based on Business Models"; 2003: pp. 473-478.
Aversano, Lerina et al.; "Introducing eServices in Business Process Models"; SEKE '02; Ischia Italy; Jul. 15-19, 2002; pp. 481-488.
Quix, Christoph et al.; "Business Data Management for Business-to-Business Electronic Commerce"; SIGMOD Record; vol. 31, No. I; Mar. 2002; pp. 49-54.
Sutherland, Jeff; "Why I Love the OMG: Emergence of a Business Object Component Architecture"; StandardView; vol. 6, No. 1; Mar. 1998; pp. 4-13.
Dogac, Asuman et al.; "An ebXML Infrastructure Implementation through UDDI Registries and RosettaNet PIPs"; ACM SIGMOD; Madison, Wisconsin; Jun. 4-6, 2002; pp. 512-523.
Lee, Jinyoul et al.; "Enterprise Integration with ERP and EAI"; Communications of the ACM; vol. 46, No. 2; Feb. 2003; pp. 54-60.
Bratthall, Lars G. et al.; "Integrating Hundreds of Products through One Architecture—The Industrial IT Architecture"; ICSE '02; Orlando, Florida; May 19-25, 2002; pp. 604-614.
Fingar, Peter; "Component-Based Frameworks for E-Commerce"; Communications of the ACM; vol. 43, No. 10; Oct. 2000; pp. 61-66.
Sprott, David; "Componentizing the Enterprise Application Packages"; Communications of the ACM; vol. 43, No. 4; Apr. 2000; pp. 63-69.
Gokhale, Aniruddha et al.; "Applying Model-Integrated Computing to Component Middleware and Enterprise Applications"; Communications of the ACM; vol. 45, No. 10; Oct. 2002; pp. 65-70.
Bussler, Christoph; "The Role of B2B Engines in B2B Integration Architectures"; SIGMOD Record; vol. 31, No. 1; Mar. 2002; pp. 67-72.
Fremantle, Paul et al.; "Enterprise Services"; Communications of the ACM; vol. 45, No. 10; Oct. 2002; pp. 77-79.
Trastour, David et al.; "Semantic Web Support for the Business-to-Business E-Commerce Lifecycle"; WWW2002, Honolulu, Hawaii; May 7-11, 2002; pp. 89-98.
Jaeger, Dirl et al.; "Using UML for Software Process Modeling"; pp. 91-108.
Han, Zaw Z. et al.; "Interoperability from Electronic Commerce to Litigation Using XML Rules"; 2003; pp. 93-94.
Carlson, David A.; "Designing XML Vocabularies with UML"; OOPSLA 2000 Companion; Minneapolis, Minnesota; 2000; pp. 95-96.
Stonebraker, Michael; "Too Much Middleware"; SIGMOD Record; vol. 31, No. 1; Mar. 2002; pp. 97-106.
Maamar, Zakaria et al.: "Toward Intelligent Business Objects"; Communications of the ACM; vol. 43, No. 10; Oct. 2000; pp. 99-101.
Tenenbaum, Jay M. et al.; "Eco System: An Internet Commerce Architecture"; IEEE; May 1997; pp. 48-55.
Eyal, Anat et al.; "Integrating and Customizing Heterogeneous E-Commerce Applications"; The VLDB Journal; Aug. 2001: pp. 16-38.
Office Action issued in related U.S. Appl. No. 11/145,464 on Jan. 22, 2009; 49 pages.
International Search Report and Written Opinion of the International Searching Authority issued in International Application No. PCT/US2007/011378 on Apr. 30, 2008; 17 pages.
International Preliminary Report on Patentability under Chapter 1 issued in International Application No. PCT/US2007/011378 on Nov. 17, 2008; 11 pages.

(56) References Cited

OTHER PUBLICATIONS

International Search Report and Written Opinion of the International Searching Authority issued in International Application No. PCT/IB2006/001401 on Aug. 27, 2008; 8 pages.
International Search Report and Written Opinion of the International Searching Authority issued in International Application No. PCT/US2005/019961 on Sep. 22, 2005; 8 pages.
International Preliminary Report on Patentability under Chapter 1 issued in International Application No. PCT/US2005/019961 on Dec. 4, 2006; 6 pages.
International Search Report and Written Opinion of the International Searching Authority issued in International Application No. PCT/US2005/021481 on Apr. 11, 2006; 7 pages.
International Search Report and Written Opinion of the International Searching Authority issued in International Application No. PCT/US2005/021481 on May 29, 2007; 6 pages.
International Preliminary Report on Patentability under Chapter 1 issued in International Application No. PCT/US2005/021481 on Dec. 20, 2006; 6 pages.
International Preliminary Report on Patentability under Chapter 1 issued in International Application No. PCT/US2005/021481 on Jul. 15, 2008; 5 pages.
International Search Report and Written Opinion of the International Searching Authority issued in International Application No. PCT/US2005/022137 on Sep. 23, 2005; 7 pages.
International Search Report and Written Opinion of the International Searching Authority issued in International Application No. PCT/US2005/022137 on May 12, 2006; 7 pages.
International Preliminary Report on Patentability under Chapter 1 issued in International Application No. PCT/US2005/022137 on Dec. 28, 2006; 5 pages.
He, Ning et al.; "B2B Contract Implementation Using Windows DNS"; 2001; pp. 71-79.
Webster's Revised Unabridged Dictionary (1913+1828); Def. "merchandise".
Statement in Accordance with the Notice from the European Patent Office dated Oct. 1, 2007 Concerning Business Methods—EPC ; Official Journal of the European Patent Office; Munich; Nov. 1, 2007; pp. 592-593.
Lynn, Chris; "Sony Enters Brand Asset Management Market"; The Seybold Report; Analyzing Publishing Technologies; Aug. 4, 2004; <www.Seybold365.com>; 3 pages.
"Header", Newton's Telecom Dictionary; 12th Edition, 2004; pp. 389-390).
Office Action issued in related U.S. Appl. No. 11/640,422 on Apr. 2, 2009; 13 pages.
Office Action issued in related U.S. Appl. No. 11/640,422 on Dec. 30, 2009; 9 pages.
Office Action issued in U.S. Appl. No. 11/640,422 on May 14, 2010; 12 pages.
Office Action issued in related U.S. Appl. No. 11/775,821 on Jan. 22, 2010; 16 pages.
Notice of Allowance issued in related U.S. Appl. No. 11/775,821 on Jul. 16, 2010; 4 pages.
Office Action issued in related U.S. Appl. No. 11/364,538 on Aug. 4, 2009; 5 pages.
Office Action issued in related U.S. Appl. No. 11/364,538 on Mar. 4, 2010; 40 pages.
Office Action issued in related U.S. Appl. No. 11/731,857 on May 15, 2009; 11 pages.
Office Action issued in related U.S. Appl. No. 11/731,857 on Feb. 4, 2010; 22 pages.
Office Action issued in related U.S. Appl. No. 11/864,786 on Jun. 22, 2009; 7 pages.
Office Action issued in related U.S. Appl. No. 11/864,786 on Mar. 3, 2010; 12 pages.
Office Action issued in related U.S. Appl. No. 11/864,832 on Sep. 18, 2009; 14 pages.
Notice of Allowance issued in related U.S. Appl. No. 11/864,832 on Mar. 24, 2010; 11 pages.
Office Action issued in related U.S. Appl. No. 11/864,871 on Apr. 21, 2010; 20 pages.
Office Action issued in related U.S. Appl. No. 12/059,867 on Aug. 18, 2009; 37 pages.
Office Action issued in related U.S. Appl. No. 12/059,867 on Feb. 22, 2010; 24 pages.
Office Action issued in related U.S. Appl. No. 12/060,178 on Dec. 7, 2009; 6 pages.
Office Action issued in related U.S. Appl. No. 12/060,178 on May 25, 2010; 19 pages.
Office Action issued in related U.S. Appl. No. 12/060,171 on Aug. 11, 2009; 11 pages.
Office Action issued in related U.S. Appl. No. 12/060,171 on Mar. 19, 2010; 10 pages.
Office Action issued in related U.S. Appl. No. 12/060,171 on Jul. 1, 2010; 19 pages.
Office Action issued in related U.S. Appl. No. 11/145,464 on Aug. 5, 2009; 31 pages.
Office Action issued in related U.S. Appl. No. 11/145,464 on Feb. 5, 2010; 57 pages.
Office Action issued in related U.S. Appl. No. 11/155,368 on May 14, 2009; 6 pages.
Office Action issued in related U.S. Appl. No. 11/155,368 on Dec. 10, 2009; 43 pages.
Advisory Action issued in U.S. Appl. No. 11/155,368 on Mar. 31, 2010; 3 pages.
Office Action issued in related U.S. Appl. No. 11/166,065 on Jun. 24, 2009; 6 pages.
Office Action issued in related U.S. Appl. No. 11/166,065 on Mar. 3, 2010; 25 pages.
Communication Pursuant to Article 94(3) EPC issued in related European Application No. 05757432.9 on Jan. 26, 2009; 4 pages.
Supplementary European Search Report issued in related European Application No. 05823434.5 on Sep. 28, 2009; 3 pages.
Supplementary European Search Report issued in related European Application No. 05766672.9 on Oct. 6, 2009; 3 pages.
Newton's Telecom Dictionary; 18th Edition; 2002; pp. 347, 454.
Baker, Stacy; "Benefits of Assortment Planning"; Assortment Planning for Apparel Retailers—2005 Management Briefing; Just Style; Jun. 2005; 3 pages.
"Visual and Quantitative Assortment Planning Applications Drive Partnership and Profit"; PR Newswire; Jan. 12, 2006; 3 pages.
"Dots Inc. Selects Compass Software's smartmerchandising for Merchandise Planning and Assortment Planning"; PR Newswire; Dec. 11, 2002; 2 pages.
SAP; "BC-Central Maintenance and Transport Objects"; Release 4.6C; Apr. 2001; 15 pages.
Annevelink et al.; "Heterogeneous Database Intergration in a Physician Workstation"; 1992; 5 pages.
Ketabchi et al.; "Object-Oriented Database Management Support for Software Maintenance and Reverse Engineering"; Department of Electrical Engineering and Computer Science, Santa Clara University; 1989; 4 pages.
Diehl et al.; "Service Architecture for an Object-Oriented Next Generation Profile Register"; date unknown; 8 pages.
International Search Report and Written Opinion of the International Searching Authority issued in International Application No. PCT/CN2010/073856 on Mar. 17, 2011; 8 pages.
International Search Report and Written Opinion of the International Searching Authority issued in International Application No. PCT/CN2010/073864 on Mar. 3, 2011; 8 pages.
International Search Report and Written Opinion of the International Searching Authority issued in International Application No. PCT/CN2010/073868 on Mar. 17, 2011; 10 pages.
Communication Pursuant to Rules 70(2) and 70a(2) EPC issued in related European Application No. 07835755.5 on Feb. 28, 2011; 6 pages.
Communication Pursuant to Article 94(3) issued in European Application No. 05757432.9 on Apr. 12, 2011; 5 pages.
Notice of Allowance issued in related U.S. Appl. No. 12/147,395 on Oct. 26, 2010; 10 pages.
Notice of Allowance issued in U.S. Appl. No. 12/147,395 on May 4, 2011; 10 pages.

(56) References Cited

OTHER PUBLICATIONS

Notice of Allowance issued in related U.S. Appl. No. 12/147,449 on Apr. 28, 2011; 9 pages.
Office Action issued in related U.S. Appl. No. 12/147,399 on Jan. 26, 2011; 16 pages.
Office Action issued in related U.S. Appl. No. 12/334,175 on May 27, 2011; 12 pages.
Notice of Allowance issued in related U.S. Appl. No. 11/731,857 on Nov. 29, 2010; 4 pages.
Notice of Allowance issued in related U.S. Appl. No. 11/731,857 on Apr. 11, 2011; 8 pages.
Office Action issued in U.S. Appl. No. 12/147,414 on Apr. 14, 2011; 30 pages.
Office Action issued in U.S. Appl. No. 12/147,378 on Jun. 17, 2011; 10 pages.
Notice of Allowance issued in U.S. Appl. No. 12/323,139 on Mar. 4, 2011; 13 pages.
Office Action issued in related U.S. Appl. No. 12/059,971 on Nov. 4, 2010; 20 pages.
Office Action issued in related U.S. Appl. No. 12/059,971 on May 18, 2011; 13 pages.
Office Action issued in related U.S. Appl. No. 12/060,054 on Jun. 29, 2011; 15 pages.
Office Action issued in U.S. Appl. No. 12/060,144 on Jun. 23, 2011; 16 pages.
Office Action issued in related U.S. Appl. No. 12/059,804 on Apr. 28, 2011; 14 pages.
Office Action issued in related U.S. Appl. No. 12/059,860 on Aug. 3, 2011; 15 pages.
Office Action issued in related U.S. Appl. No. 12/060,149 on Aug. 26, 2010; 15 pages.
Office Action issued in related U.S. Appl. No. 12/060,149 on Feb. 4, 2011; 19 pages.
Office Action issued in related U.S. Appl. No. 12/060,192 on Apr. 14, 2011; 18 pages.
Notice of Allowance issued in related U.S. Appl. No. 12/060,178 on Dec. 6, 2010; 4 pages.
Office Action issued in related U.S. Appl. No. 12/060,062 on Jul. 13, 2011; 16 pages.
Office Action issued in related U.S. Appl. No. 12/060,155 on May 10, 2011; 8 pages.
Office Action issued in related U.S. Appl. No. 12/060,171 on Jan. 26, 2011; 17 pages.
Notice of Allowance issued in related U.S. Application No. 11/145,464 on Nov. 1, 2010; 4 pp. (Ref.: 23067-0049001).
Notice of Allowance issued in related U.S. Application No. 11/145,464 on Feb. 23, 2011; 7 pp. (Ref.: 23067-0049001).
Notice of Allowance issued in U.S. Application No. 11/155,368 on Oct. 7, 2010; 4 pp. (Ref.: 23067-0050001).
Notice of Allowance issued in U.S. Application No. 11/155,368 on Mar. 14, 2011; 7 pp. (Ref.: 23067-0050001).
Notice of Allowance issued in related U.S. Application No. 11/166,065 on Sep. 20, 2010; 6 pp. (Ref. 23067-0051001).
Notice of Allowance issued in U.S. Application No. 11/166,065 on Mar. 8, 2011; 5 pp. (Ref.: 23067-0051001).
Office Action issued in related U.S. Application No. 11/864,866 on Feb. 3, 2011; 20 pp. (Ref.: 23067-0105001).
Notice of Allowance issued in related U.S. Application No. 11/864,866 on Jul. 22, 2011; 6 pp. (Ref.: 23067-0105001).
Notice of Allowance issued in related U.S. Application No. 11/775,821 on Oct. 22, 2010; 4 pp. (Ref.: 23067-0107001).
Notice of Allowance issued in related U.S. Application No. 11/775,821 on Feb. 4, 2011; 4 pp. (Ref.: 23067-0107001).
Notice of Allowance issued in related U.S. Application No. 11/364,538 on Dec. 13, 2010; 5 pp. (Ref.: 23067-0115001).
Notice of Allowance issued in related U.S. Application No. 11/364,538 on Jul. 26, 2011; 6 pp. (Ref.: 23067-0115001).
Office Action issued in U.S. Application No. 11/864,811 on Mar. 18, 2011; 10 pp. (Ref.: 23067- 0117001).
Office Action issued in U.S. Application No. 11/864,811 on Jul. 26, 2011; 7 pp. (Ref.: 23067- 0117001).
Notice of Allowance issued in related U.S. Application No. 11/864,832 on Aug. 23, 2010; 4 pp. (Ref.: 23067-0119001).
Notice of Allowance issued in related U.S. Application No. 11/864,832 on Dec. 3, 2010; 9 pp. (Ref.: 23067-0119001).
Notice of Allowance issued in related U.S. Application No. 11/864,832 on Jul. 7, 2011;11 pp. (Ref.: 23067-0119001).
Office Action issued in related U.S. Application No. 11/864,863 on Jul. 21, 2011; 29 pp. (Ref.: 23067-0120001).
Office Action issued in related U.S. Application No. 11/864,871 on Oct. 1, 2010; 30 pp. (Ref.: 23067-0121001).
Altintas et al.; "Aurora Software Product Line"; Cybersoft Information Technologies Co.; 2005; pp. 1-8.
Boetterweck, Goetz; "A Model-Driven Approach to the Engineering of Multiple User Interfaces"; Lecture Notes in Computer Science; 2007; vol. 4364/2007; pp. 106-115.
Gable, Julie; "Enterprise Application Integration"; Information Management Journal; Mar./Apr. 2002; pp. 48-52.
Himoff et al.; "MAGENTA Technology: Multi-Agent Systems for Industrial Logistics"; AAMAS'05; Jul. 25-29, 2005; 2005 ACM; pp. 60-66:1-7).
Lockemann et al.; "Flexibility through Multi-Agent Systems: Solutions or Illusions"; SOFSEM 2004; pp. 41-56.
Mascolo et al.; "An Analytical Method for Performance Evaluation of Kanban Controlled Production Systems"; Operations Research; vol. 44, No. 1; 1996; pp. 50-64.
SAP 2008 Annual Report; 256 pages.
"SAP Labs and HP Team to Advance Internet-Based Supply Chain Collaboration"; Business Editors and Technology Writers; Business Wire; New York; Feb. 3, 2000; 4 pages.
Shi, Min-Hua et al.; "Mqml-Message Queuing Markup Language"; Proceedings of the 4th IEEE International Workshop on Advanced Issues of E-Commerce and Web-Based Information Systems (WECWIS 2002); 2002; 8 pages.
International Search Report and Written Opinion issued in International Application No. PCT/CN2011/001238 on May 3, 2012; 9 pages.
Communication Pursuant to Article 94(3) EPC issued in European Application No. 07835755.5 on Feb. 22, 2012; 7 pages.
Communication Pursuant to Article 94(3) issued in European Application No. 05766672.9 on Jul. 14, 2011; 4 pages.
Notice of Allowance issued in related U.S. Appl. No. 11/864,866 on Mar. 13, 2012; 7 pages.
Notice of Allowance issued in related U.S. Appl. No. 11/145,464 on Feb. 6, 2012; 7 pages.
Notice of Allowance issued in related U.S. Appl. No. 11/364,538 on Jul. 13, 2012; 7 pages.
Notice of Allowance issued in related U.S. Appl. No. 11/731,857 on Dec. 14, 2011; 7 pages.
Notice of Allowance issued in related U.S. Appl. No. 11/864,832 on Jan. 9, 2012; 12 pages.
Notice of Allowance issued in related U.S. Appl. No. 11/864,832 on Jul. 30, 2012; 12 pages.
Notice of Allowance issued in related U.S. Appl. No. 12/060,178 on Sep. 2, 2011; 9 pages.
Notice of Allowance issued in U.S. Appl. No. 11/155,368 on Jul. 23, 2012; 7 pages.
Notice of Allowance issued in U.S. Appl. No. 11/155,368 on Nov. 8, 2011; 7 pages.
Notice of Allowance issued in U.S. Appl. No. 11/166,065 on Feb. 15, 2012; 7 pages.
Notice of Allowance issued in U.S. Appl. No. 11/640,422 on Sep. 29, 2011; 7 pages.
Notice of Allowance issued in U.S. Appl. No. 11/640,422 on May 22, 2012; 7 pages.
Notice of Allowance issued in U.S. Appl. No. 11/775,821 on Sep. 21, 2011; 5 pages.
Notice of Allowance issued in U.S. Appl. No. 11/775,821 on Dec. 30, 2011; 5 pages.
Notice of Allowance issued in U.S. Appl. No. 11/864,811 on Sep. 10, 2012; 10 pages.

(56) References Cited

OTHER PUBLICATIONS

Notice of Allowance issued in U.S. Appl. No. 11/864,811 on Nov. 14, 2011; 8 pages.
Notice of Allowance issued in U.S. Appl. No. 11/864,811 on Mar. 2, 2012; 8 pages.
Notice of Allowance issued in U.S. Appl. No. 12/059,971 on Jun. 28, 2012; 12 pages.
Notice of Allowance issued in U.S. Appl. No. 12/060,062 on Mar. 20, 2012; 16 pages.
Notice of Allowance issued in U.S. Appl. No. 12/060,155 on Apr. 24, 2012; 15 pages.
Notice of Allowance issued in U.S. Appl. No. 12/060,192 on Mar. 2, 2012; 18 pages.
Notice of Allowance issued in U.S. Appl. No. 12/147,378 on Aug. 31, 2012; 9 pages.
Notice of Allowance issued in U.S. Appl. No. 12/147,378 on Nov. 9, 2011; 16 pages.
Notice of Allowance issued in U.S. Appl. No. 12/323,116 on Jun. 11, 2012; 10 pages.
Notice of Allowance issued in U.S. Appl. No. 12/323,139 on Mar. 14, 2012; 10 pages.
Notice of Allowance issued in U.S. Appl. No. 12/571,140 on Mar. 20, 2012; 16 pages.
Notice of Allowance issued in U.S. Appl. No. 12/815,618 on May 10, 2012; 7 pages.
Office Action issued in related U.S. Appl. No. 11/864,863 on Dec. 22, 2011; 20 pages.
Office Action issued in related U.S. Appl. No. 12/059,860 on Jan. 23, 2012; 16 pages.
Office Action issued in related U.S. Appl. No. 12/060,054 on Dec. 7, 2011; 15 pages.
Office Action issued in related U.S. Appl. No. 12/060,155 on Oct. 31, 2011; 15 pages.
Office Action issued in related U.S. Appl. No. 12/060,171 on Mar. 1, 2012; 19 pages.
Office Action issued in related U.S. Appl. No. 12/060,192 on Sep. 6, 2011; 18 pages.
Office Action issued in U.S. Appl. No. 11/864,786 on Mar. 30, 2012; 12 pages.
Office Action issued in U.S. Appl. No. 12/059,804 on Nov. 14, 2011; 15 pages.
Office Action issued in U.S. Appl. No. 12/060,144 on Dec. 8, 2011; 18 pages.
Office Action issued in U.S. Appl. No. 12/147,414 on Oct. 26, 2011; 27 pages.
Office Action issued in U.S. Appl. No. 12/323,116 on Jan. 27, 2012; 7 pages.
Office Action issued in U.S. Appl. No. 12/323,116 on Sep. 6, 2011; 8 pages.
Office Action issued in U.S. Appl. No. 12/571,140 on Sep. 26, 2011; 14 pages.
Office Action issued in U.S. Appl. No. 12/571,154 on Apr. 2, 2012; 13 pages.
Office Action issued in U.S. Appl. No. 12/571,154 on Aug. 15, 2012; 15 pages.
Office Action issued in U.S. Appl. No. 12/815,618 on Dec. 22, 2011; 8 pages.
Office Action issued in U.S. Appl. No. 12/815,639 on May 24, 2012; 7 pages.
Office Action issued in U.S. Appl. No. 12/815,698 on Jan. 20, 2012; 10 pages.
Office Action issued in U.S. Appl. No. 12/815,698 on Jul. 20, 2012; 13 pages.
Office Action issued in U.S. Appl. No. 12/815,802 on Jul. 20, 2012; 16 pages.
Office Action issued in U.S. Appl. No. 12/816,083 on May 9, 2012; 20 pages.
Office Action issued in U.S. Appl. No. 12/816,170 on Jul. 24, 2012; 9 pages.
Office Action issued in U.S. Appl. No. 12/816,293 on Apr. 25, 2012; 10 pages.
Office Action issued in U.S. Appl. No. 13/192,543 on Aug. 28, 2012; 14 pages.
Office Action issued in U.S. Appl. No. 13/192,555 on Jul. 20, 2012; 7 pages.
Office Action issued in U.S. Appl. No. 13/349,477 on Jun. 29, 2012; 13 pages.
Business Object DTF, Common Business Objects, Ver 1.5; OMG Document born; Framingham Corporate Center, Framingham, MA; 20 pages; Dec. 4, 1997.
Chinnapen-Rimer, Subendi et al.; "An XML Model for Use Across heterogeneous Client-Server Applications," IEEE Transactions on Intrumentastion and Measurement, Oct. 2008, vol. 50, No. 10, pp. 2128-2135.
Chou et al. "Web Services for Service-Oriented Communication", International Conference on Collaborative Computing: Networking, Applications and Worksharing, CollaborateCom 2006, pp. 1-8, 2006.
Intersystems, Evaluating Integration Software, Ensemble White Paper, 2007, http://www.intersystems.com/ensemble/whitepapers/pdf/evaluating-integration-software.pdf.
Nemuraite, Lina; "Business Object Modeling Framework for Distributed Enterprise", Kaunas University of Technology, Launas, Lithuania, Jan. 1999; pp. 189-202.
Oracle Application Integration Architecture Enterprise Business Objects (EBO) Concepts—Concepts, Structure, Terminologies and Design Rules, An Oracle White Paper; 29 pages; Aug. 2009.
Notice of Allowance issued in U.S. Appl. No. 11/145,464 on Sep. 26, 2013; 8 pages.
Notice of Allowance issued in U.S. Appl. No. 11/155,368 on Jun. 13, 2013; 9 pages.
Notice of Allowance issued in U.S. Appl. No. 11/166,065 on Oct. 9, 2012; 10 pages.
Notice of Allowance issued in U.S. Appl. No. 11/640,422 on Apr. 23, 2012; 8 pages.
Notice of Allowance issued in U.S. Appl. No. 11/731,857 on Oct. 9, 2012; 7 pages.
Notice of Allowance issued in U.S. Appl. No. 11/775,821 on Nov. 2, 2012; 5 pages.
Notice of Allowance issued in U.S. Appl. No. 11/864,786 on Nov. 7, 2012; 7 pages.
Notice of Allowance issued in U.S. Appl. No. 11/864,811 on Mar. 19, 2013; 9 pages.
Notice of Allowance issued in U.S. Appl. No. 11/864,832 on Jul. 3, 2013; 14 pages.
Notice of Allowance issued in U.S. Appl. No. 11/864,866 on Jan. 25, 2013; 7 pages.
Notice of Allowance issued in U.S. Appl. No. 11/864,871 on Aug. 14, 2013; 20 pages.
Notice of Allowance issued in U.S. Appl. No. 12/059,867 on Jul. 17, 2013; 22 pages.
Notice of Allowance issued in U.S. Appl. No. 12/060,062 on Nov. 9, 2012; 7 pages.
Notice of Allowance issued in U.S. Appl. No. 12/060,144 on Mar. 20, 2013; 12 pages.
Notice of Allowance issued in U.S. Appl. No. 12/060,149 on Jul. 9, 2013; 18 pages.
Notice of Allowance issued in U.S. Appl. No. 12/060,155 on Jan. 11, 2013; 5 pages.
Notice of Allowance issued in U.S. Appl. No. 12/060,171 on Oct. 3, 2012; 10 pages.
Notice of Allowance issued in U.S. Appl. No. 12/060,178 on Feb. 14, 2013; 7 pages.
Notice of Allowance issued in U.S. Appl. No. 12/060,192 on Oct. 29, 2012; 12 pages.
Notice of Allowance issued in U.S. Appl. No. 12/147,395 on Dec. 24, 2012; 11 pages.
Notice of Allowance issued in U.S. Appl. No. 12/147,449 on Sep. 17, 2013; 9 pages.
Notice of Allowance issued in U.S. Appl. No. 12/323,116 on Jun. 27, 2013; 8 pages.
Notice of Allowance issued in U.S. Appl. No. 12/323,139 on Feb. 8, 2013; 9 pages.

(56) References Cited

OTHER PUBLICATIONS

Notice of Allowance issued in U.S. Appl. No. 12/147,414 on Jun. 19, 2013; 23 pages.
Notice of Allowance issued in U.S. Appl. No. 12/571,140 on Nov. 9, 2012; 8 pages.
Notice of Allowance issued in U.S. Appl. No. 12/815,618 on May 7, 2013; 8 pages.
Notice of Allowance issued in U.S. Appl. No. 12/815,639 on Sep. 24, 2012; 9 pages.
Notice of Allowance issued in U.S. Appl. No. 12/815,802 on Nov. 27, 2012; 9 pages.
Notice of Allowance issued in U.S. Appl. No. 12/816,293 on Sep. 19, 2012; 7 pages.
Notice of Allowance issued in U.S. Appl. No. 13/186,361 on Jun. 10, 2013; 11 pages.
Notice of Allowance issued in U.S. Appl. No. 13/192,553 on May 1, 2013; 21 pages.
Notice of Allowance issued in U.S. Appl. No. 13/192,574 on Jun. 14, 2013; 11 pages.
Notice of Allowance issued in U.S. Appl. No. 13/192,599 on Sep. 12, 2013; 14 pages.
Notice of Allowance issued in U.S. Appl. No. 13/535,864 on Sep. 24, 2013; 8 pages.
Notice of Allowance issued in U.S. Appl. No. 13/754,608 on Jul. 9, 2013; 12 pages.
Office Action issued in U.S. Appl. No. 12/059,860 on Sep. 17, 2013; 18 pages.
Office Action issued in U.S. Appl. No. 12/815,576 on Feb. 15, 2013; 13 pages.
Office Action issued in U.S. Appl. No. 12/815,576 on Oct. 12, 2012; 11 pages.
Office Action issued in U.S. Appl. No. 12/815,750 on Feb. 21, 2013; 67 pages.
Office Action issued in U.S. Appl. No. 12/815,750 on Sep. 28, 2012; 66 pages.
Office Action issued in U.S. Appl. No. 12/815,869 on Feb. 15, 2013; 27 pages.
Office Action issued in U.S. Appl. No. 12/815,869 on Jul. 18, 2013; 27 pages.
Office Action issued in U.S. Appl. No. 12/815,911 on Feb. 25, 2013; 15 pages.
Office Action issued in U.S. Appl. No. 12/815,911 on Sep. 26, 2012; 14 pages.
Office Action issued in U.S. Appl. No. 12/816,083 on Sep. 21, 2012; 22 pages.
Office Action issued in U.S. Appl. No. 12/816,268 on Apr. 26, 2013; 17 pages.
Office Action issued in U.S. Appl. No. 12/816,268 on Oct. 11, 2012; 11 pages.
Office Action issued in U.S. Appl. No. 12/823,996 on Apr. 25, 2013; 8 pages.
Office Action issued in U.S. Appl. No. 12/823,996 on Mar. 22, 2013, 7 pages.
Office Action issued in U.S. Appl. No. 13/186,361 on Feb. 26, 2013, 10 pages.
Office Action issued in U.S. Appl. No. 13/192,543 on Dec. 13, 2012; 26 pages.
Office Action issued in U.S. Appl. No. 13/192,548 on Jun. 7, 2013; 15 pages.
Office Action issued in U.S. Appl. No. 13/192,553 on Feb. 11, 2013, 23 pages.
Office Action issued in U.S. Appl. No. 13/192,555 on Sep. 13, 2013; 10 pages.
Office Action issued in U.S. Appl. No. 13/192,555 on Mar. 1, 2013; 11 pages.
Office Action issued in U.S. Appl. No. 13/192,564 on Apr. 22, 2013; 21 pages.
Office Action issued in U.S. Appl. No. 13/192,574 on Apr. 30, 2013; 5 pages.
Office Action issued in U.S. Appl. No. 13/192,574 on Oct. 24, 2012; 6 pages.
Office Action issued in U.S. Appl. No. 13/192,590 on Oct. 18, 2013; 11 pages.
Office Action issued in U.S. Appl. No. 13/192,599 on Mar. 21, 2013; 29 pages.
Office Action issued in U.S. Appl. No. 13/192,612 on Oct. 4, 2012; 12 pages.
Office Action issued in U.S. Appl. No. 13/218,876 on Apr. 5, 2013; 10 pages.
Office Action issued in U.S. Appl. No. 13/218,876 on Jul. 16, 2013; 14 pages.
Office Action issued in U.S. Appl. No. 13/349,477 on Jul. 22, 2013; 6 pages.
Office Action issued in U.S. Appl. No. 13/349,477 on Nov. 15, 2012; 15 pages.
Office Action issued in U.S. Appl. No. 13/398,191 on Oct. 15, 2013; 9 pages.
Office Action issued in U.S. Appl. No. 13/398,228 on Oct. 17, 2013; 8 pages.
Office Action issued in U.S. Appl. No. 13/535,419 on Apr. 19, 2013; 14 pages.
Office Action issued in U.S. Appl. No. 13/535,433 on Mar. 4, 2013; 11 pages.
Office Action issued in U.S. Appl. No. 13/535,433 on Aug. 2, 2013; 11 pages.
Office Action issued in U.S. Appl. No. 13/535,435 on Jun. 21, 2013; 13 pages.
Office Action issued in U.S. Appl. No. 13/535,453 on Jul. 5, 2013; 22 pages.
Office Action issued in U.S. Appl. No. 13/535,512 on Jul. 5, 2013; 10 pages.
Office Action issued in U.S. Appl. No. 13/535,521 on Aug. 30, 2013; 15 pages.
Office Action issued in U.S. Appl. No. 13/535,521 on Apr. 16, 2013; 16 pages.
Office Action issued in U.S. Appl. No. 13/535,625 on Aug. 15, 2013; 22 pages.
Office Action issued in U.S. Appl. No. 13/535,648 on Jun. 21, 2013; 14 pages.
Office Action issued in U.S. Appl. No. 13/535,667 on Dec. 26, 2012; 9 pages.
Office Action issued in U.S. Appl. No. 13,535,667 on Jun. 26, 2013; 12 pages.
Office Action issued in U.S. Appl. No. 13/535,670 on Jun. 24, 2013; 13 pages.
Office Action issued in U.S. Appl. No. 13/535,674 on Jul. 3, 2013; 17 pages.
Office Action issued in U.S. Appl. No. 13/535,723 on Aug. 23, 2013; 16 pages.
Office Action issued in U.S. Appl. No. 13/535,723 on Apr. 24, 2013; 16 pages.
Office Action issued in U.S. Appl. No. 13/535,881 on Dec. 21, 2012; 7 pages.
Office Action Issued in U.S. Appl. No. 13/535,864 on May 10, 2013; 9 pages.
Office Action issued in U.S. Appl. No. 13/754,608 on Apr. 215, 2013; 15 pages.
Office Action issued in U.S. Appl. No. 13/770,508 on Oct. 7, 2013; 6 pages.

* cited by examiner

FIG. 32C
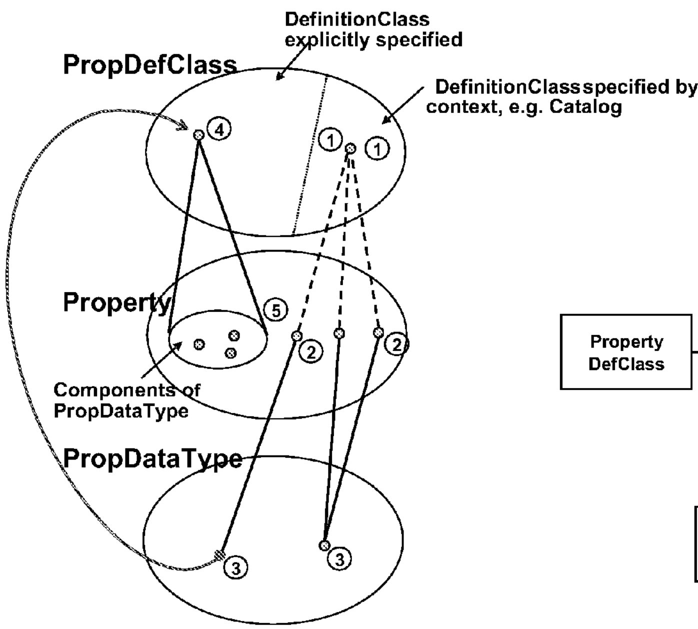
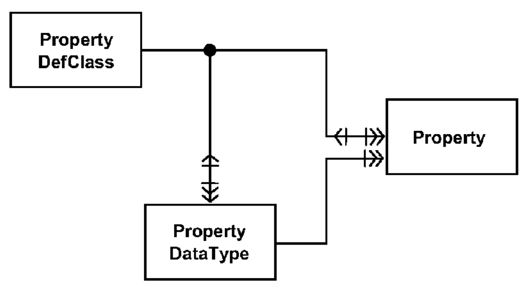
Object Model
Model (instance level) and relationship (①...⑤)

| Property | Single Value | Multiple Value |
|---|---|---|
| Simple | X | X |
| Complex | X | New |

| Package | level1 | level2 | level3 | level4 | level5 | Cardinality | Datatype Name |
|---|---|---|---|---|---|---|---|
| CustomerInvoiceRequestMessage 35000 | CustomerInvoiceRequestMessage 35002 | | | | | | CustomerInvoiceRequestMessage 35004 |
| MessageHeader 35006 | | MessageHeader 35008 | | | | 1 35010 | BusinessDocumentMessageHeader 35012 |
| CustomerInvoiceRequest 35014 | | CustomerInvoiceRequest 35016 | | | | 1 35018 | CustomerInvoiceRequest 35020 |
| | | | reconciliationPeriodCounterValue 35022 | | | 0..1 35024 | CounterValue 35026 |
| | | | actionCode 35028 | | | 0..1 35030 | ActionCode 35032 |

FIG. 35-2

| Package | level1 | level2 | level3 | level4 | level5 | Cardinality | Datatype Name |
|---|---|---|---|---|---|---|---|
| | | | itemListCompleteTransmissionIndicator 35034 | | | 0..1 35036 | Indicator 35038 |
| | | | BaseBusinessTransaction-DocumentID 35040 | | | 1 35042 | Business-TransactionDocumentID 35044 |
| | | | BaseBusinessDocumentUUID 35046 | | | 0..1 35048 | UUID 35050 |
| | | | BaseBusinessDocumentType-Code 35052 | | | 1 35054 | Business-TransactionDocumentType-Code 35056 |

FIG. 35-3

| Package | level1 | level2 | level3 | level4 | level5 | Cardinality | Datatype Name |
|---|---|---|---|---|---|---|---|
| | | | Settlement-BlockedIndi-cator 35058 | | | 0..1 35060 | Indicator 35062 |
| | | | BaseInvoic-ingBlockin-gReason-Code 35064 | | | 0..1 35066 | Invoic-ingBlockin-gReason-Code 35068 |
| | | | Cancella-tionRea-sonCode 35070 | | | 0..1 35072 | Cancella-tionRea-sonCode 35074 |
| | | | Settlement-PriorityCode 35076 | | | 0..1 35078 | Business-Transac-tionPriority-Code 35080 |
| | | | ProposedIn-voiceDate 35082 | | | 0..1 35084 | Date 35086 |

FIG. 35-4

| Package | level1 | level2 | level3 | level4 | level5 | Cardinality | Datatype Name |
|---|---|---|---|---|---|---|---|
| BusinesProcessVariant 35088 | | | BusinessProcessVariantType 35090 | | | 1..n 35092 | CustomerInvoiceRequestRequestBusinessProcessVariantType 35094 |
| | | | | BusinessProcessVariantTypeCode 35096 | | 1 35098 | BusinessProcessVariantTypeCode 35100 |
| | | | | MainIndicator 35102 | | 1 35104 | Indicator 35106 |
| Party 35108 | | | BuyerParty 35110 | | | 0..1 35112 | BusinessTransactionDocumentParty 35114 |

FIG. 35-5

| Package | level1 | level2 | level3 | level4 | level5 | Cardinality | Datatype Name |
|---|---|---|---|---|---|---|---|
| | | | SellerParty 35116 | | | 0..1 35118 | Business-TransactionDocumentParty 35120 |
| | | | ProductRecipientParty 35122 | | | 0..1 35124 | Business-TransactionDocumentParty 35126 |
| | | | VendorParty 35128 | | | 0..1 35130 | Business-TransactionDocumentParty 35132 |
| | | | BillToParty 35134 | | | 0..1 35136 | Business-TransactionDocumentParty 35138 |

FIG. 35-6

| Package | level1 | level2 | level3 | level4 | level5 | Cardinality | Datatype Name |
|---|---|---|---|---|---|---|---|
| | | | BillFromParty 35140 | | | 0..1 35142 | BusinessTransactionDocumentParty 35144 |
| | | | PayerParty 35146 | | | 0..1 35148 | BusinessTransactionDocumentParty 35150 |
| | | | PayeeParty 35152 | | | 0..1 35154 | BusinessTransactionDocumentParty 35156 |
| | | | ResponsibleEmployeeParty 35158 | | | 0..1 35160 | BusinessTransactionDocumentParty 35162 |

FIG. 35-7

| Package | level1 | level2 | level3 | level4 | level5 | Cardinality | Datatype Name |
|---|---|---|---|---|---|---|---|
| Location 35164 | | | ShipToLocation 35166 | | | 0..1 35168 | BusinessTransactionDocumentLocation 35170 |
| | | | ShipFromLocation 35172 | | | 0..1 35174 | BusinessTransactionDocumentLocation 35176 |
| | | | ServicePointLocation 35178 | | | 0..1 35180 | BusinessTransactionDocumentLocation 35182 |

FIG. 35-8

| Package | level1 | level2 | level3 | level4 | level5 | Cardinality | Datatype Name |
|---|---|---|---|---|---|---|---|
| SalesAndServiceBusinessArea 35184 | | | SalesOrganisation 35186 | | | 0..1 35188 | CustomerInvoiceRequestRequestSalesOrganisation 35190 |
| | | | | SalesOrganisationID 35192 | | 0..1 35194 | OrganisationalCentreID 35196 |
| | | | | SalesOrganisationUUID 35198 | | 0..1 35200 | UUID 35202 |
| | | | SalesGroup 35204 | | | 0..1 35206 | CustomerInvoiceRequestRequestSalesGroup 35208 |

FIG. 35-9

| Package | level1 | level2 | level3 | level4 | level5 | Cardinality | Datatype Name |
|---|---|---|---|---|---|---|---|
| | | | | Sales-GroupID 35210 | | 0..1 35212 | Organisa-tionalCen-treID 35214 |
| | | | | SalesGrou-pUUID 35216 | | 0..1 35218 | UUID 35220 |
| | | | SalesOffice 35222 | | | 0..1 35224 | CustomerIn-voiceRe-questRe-questSale-sOffice 35226 |
| | | | | Sale-sOfficeID 35228 | | 0..1 35230 | Organisa-tionalCen-treID 35232 |
| | | | | Sale-sOfficeUUID 35234 | | 0..1 35236 | UUID 35238 |

FIG. 35-10

| Package | level1 | level2 | level3 | level4 | level5 | Cardinality | Datatype Name |
|---|---|---|---|---|---|---|---|
| | | | Distribution-Channel 35240 | | | | |
| | | | | Distribution-Channel-Code 35242 | | 0..1 35244 | Distribution-Channel-Code 35246 |
| | | | ServiceOr-ganisation 35248 | | | 0..1 35250 | CustomerIn-voiceRe-questRe-questSer-viceOrgani-sation 35252 |
| | | | | ServiceOr-ganisationID 35254 | | 0..1 35256 | Organisa-tionalCen-treID 35258 |
| | | | | ServiceOr-ganisa-tionUUID 35260 | | 0..1 35262 | UUID 35264 |

FIG. 35-11

| Package | level1 | level2 | level3 | level4 | level5 | Cardinality | Datatype Name |
|---|---|---|---|---|---|---|---|
| DeliveryInformation 35266 | | | Delivery-Terms 35268 | | | 0..1 35270 | Delivery-Terms 35272 |
| PaymentInformation 35274 | | | CashDis-count 35276 | | | | CustomerIn-voiceRe-questRe-questCash-Discount 35278 |
| | | | | CashDis-countTerms 35280 | | 0..1 35282 | CashDis-countTerms 35284 |
| | | | | CashDis-countLevel 35286 | | 0..1 35288 | CashDis-countLevel 35290 |
| PriceInformation 35292 | | | PriceAndTax 35294 | | | 0..1 35296 | CustomerIn-voiceRe-questRe-quest-PriceAndTax 35298 |

FIG. 35-12

| Package | level1 | level2 | level3 | level4 | level5 | Cardinality | Datatype Name |
|---|---|---|---|---|---|---|---|
| | | | | GrossAmount 35300 | | 0..1 35302 | Amount 35304 |
| | | | | NetAmount 35306 | | 0..1 35308 | Amount 35310 |
| | | | | TaxAmount 35312 | | 0..1 35314 | Amount 35316 |
| | | | PricingTerms 35318 | | | 0..1 35320 | CustomerInvoiceRequestRequestPricingTerms 35322 |
| | | | | PricingProcedureCode 35324 | | 1 35326 | PricingProcedureCode 35328 |
| | | | | PricingDateTime 35330 | | 0..1 35332 | LOCALNORMALIZED_DateTime 35334 |

FIG. 35-13

| Package | level1 | level2 | level3 | level4 | level5 | Cardinality | Datatype Name |
|---|---|---|---|---|---|---|---|
| | | | TaxationTerms 35336 | | | 0..1 35338 | CustomerInvoiceRequestRequestTaxationTerms 35340 |
| | | | | SellerTaxID 35342 | | 0..1 35344 | PartyTaxID 35346 |
| | | | | SellerTaxIdentificationNumberTypeCode 35348 | | 0..1 35350 | TaxIdentificationNumberTypeCode 35352 |
| | | | | BuyerTaxID 35354 | | 0..1 35356 | PartyTaxID 35358 |
| | | | | BuyerTaxIdentificationNumberTypeCode 35360 | | 0..1 35362 | TaxIdentificationNumberTypeCode 35364 |

FIG. 35-14

| Package | level1 | level2 | level3 | level4 | level5 | Cardinality | Datatype Name |
|---|---|---|---|---|---|---|---|
| | | | | European-Community-VATTriangu-lationIndica-tor 35366 | | 0..1 35368 | Indicator 35370 |
| | | | | Provision-Date 35372 | | 0..1 35374 | Date 35376 |
| | | | | TaxDueDate 35378 | | 0..1 35380 | Date 35382 |
| AttachmentFolder 35384 | | | Attachment-Folder 35386 | | | 0..1 35388 | Attachment-Folder 35390 |
| | | | | Attach-mentWe-bURI 35392 | | 0..n 35394 | Attach-mentWe-bURI 35396 |
| TextCollection 35398 | | | TextCollec-tion 35400 | | | 0..1 35402 | TextCollec-tion 35404 |

FIG. 35-15

| Package | level1 | level2 | level3 | level4 | level5 | Cardinality | Datatype Name |
|---|---|---|---|---|---|---|---|
| Item 35406 | | | Item 35408 | | | 1..n 35410 | CustomerInvoiceRequestRequestItem 35412 |
| | | | | actionCode 35414 | | 0..1 35416 | ActionCode 35418 |
| | | | | BaseBusinessTransaction DocumentItemID 35420 | | 1 35422 | BusinessTransactionDocumentItemID 35424 |
| | | | | BaseBusinessTransaction DocumentItemUUID 35426 | | 0..1 35428 | UUID 35430 |

FIG. 35-16

| Package | level1 | level2 | level3 | level4 | level5 | Cardinality | Datatype Name |
|---|---|---|---|---|---|---|---|
| | | | | BaseBusinessTransaction-Document ItemType-Code 35432 | | 1 35434 | BusinessTransactionDocumentItem-TypeCode 35436 |
| | | | | Settlement-BlockedIndicator 35438 | | 0..1 35440 | Indicator 35442 |
| | | | | BaseItemInvoicingBlockingReason-Code 35444 | | 0..1 35446 | InvoicingBlockingReason-Code 35448 |
| | | | | CancellationReasonCode 35450 | | 0..1 35452 | CancellationReasonCode 35454 |

FIG. 35-17

| Package | level1 | level2 | level3 | level4 | level5 | Cardinality | Datatype Name |
|---|---|---|---|---|---|---|---|
| | | | | ReceivablesPropertyMovementDirectionCode 35456 | | 1 35458 | Property-Movement-Direction-Code 35460 |
| | | | | PricingRelevanceIndicator 35462 | | 0..1 35464 | Indicator 35466 |
| | | | | CashDiscountDeductibleIndicator 35468 | | 0..1 35470 | Indicator 35472 |
| | | | | ProposedInvoiceDate 35474 | | 0..1 35476 | Date 35478 |

FIG. 35-18

| Package | level1 | level2 | level3 | level4 | level5 | Cardinality | Datatype Name |
|---|---|---|---|---|---|---|---|
| | | | | HierarchyRelationship 35480 | | 0..1 35482 | CustomerInvoiceRequestRequestItemHierarchyRelationship 35484 |
| | | | | | ParentItemID 35486 | 1 35488 | BusinessTransactionDocumentItemID 35490 |
| | | | | | TypeCode 35492 | 1 35494 | BusinessTransactionDocumentItem HierarchyRelationshipTypeCode 35496 |

FIG. 35-19

| Package | level1 | level2 | level3 | level4 | level5 | Cardinality | Datatype Name |
|---|---|---|---|---|---|---|---|
| BusinessProcessVariant 35498 | | | | BusinessProcessVariantType 35500 | | 0..n 35502 | CustomerInvoiceRequestRequestItemBusinessProcessVariantType 35504 |
| | | | | | BusinessProcessVariantTypeCode 35506 | 1 35508 | BusinessProcessVariantTypeCode 35510 |
| | | | | | MainIndicator 35512 | 1 35514 | Indicator 35516 |
| ProductInformation 35518 | | | | Product 35520 | | 0..1 35522 | BusinessTransactionDocumentProduct 35524 |

FIG. 35-20

| Package | level1 | level2 | level3 | level4 | level5 | Cardinality | Datatype Name |
|---|---|---|---|---|---|---|---|
| | | | | ProductCategory 35526 | | 0..1 35528 | ProductCategory 35530 |
| | | | | Quantity 35532 | | 1 35534 | Quantity 35536 |
| | | | | QuantityTypeCode 35538 | | 1 35540 | QuantityTypeCode 35542 |
| PriceInformation 35544 | | | | PriceAndTax 35546 | | 0..1 35548 | CustomerInvoiceRequestRequestItemPriceAndTax 35550 |
| | | | | | GrossAmount 35552 | 0..1 35554 | Amount 35556 |
| | | | | | NetAmount 35558 | 0..1 35560 | Amount 35562 |

FIG. 35-21

| Package | level1 | level2 | level3 | level4 | level5 | Cardinality | Datatype Name |
|---|---|---|---|---|---|---|---|
| | | | | | TaxAmount 35564 | 0..1 35566 | Amount 35568 |
| | | | | | PriceComponent 35570 | 0..n 35572 | PriceComponent 35574 |
| | | | | ProductTaxDetails 35576 | | 0..n 35578 | CustomerInvoiceRequestRequestItemProductTaxDetails 35580 |
| | | | | | ProductTaxationCharacteristicsCode 35582 | 0..1 35584 | ProductTaxationCharacteristicsCode 35586 |
| | | | | | ProductTax 35588 | 1 35590 | ProductTax 35592 |

FIG. 35-22

| Package | level1 | level2 | level3 | level4 | level5 | Cardinality | Datatype Name |
|---|---|---|---|---|---|---|---|
| | | | | | TransactionCurrencyProductTax 35594 | 1 35596 | ProductTax 35598 |
| | | | | PricingTerms 35600 | | 0..1 35602 | CustomerInvoiceRequestRequestItemPricingTerms 35604 |
| | | | | | PricingDateTime 35606 | 0..1 35608 | LOCALNORMALISED_DateTime 35610 |
| | | | | | PriceRecalculationTypeCode 35612 | 0..1 35614 | PriceRecalculationTypeCode 35616 |

FIG. 35-23

| Package | level1 | level2 | level3 | level4 | level5 | Cardinality | Datatype Name |
|---|---|---|---|---|---|---|---|
| | | | | Taxation-Terms 35618 | | 0..1 35620 | CustomerIn-voiceRe-questRe-questItem-Taxation-Terms 35622 |
| | | | | | SellerTaxID 35624 | 0..1 35626 | PartyTaxID 35628 |
| | | | | | Seller-TaxIdentifi-cationNum-berType-Code 35630 | 0..1 35632 | TaxIdentifi-cationNum-berType-Code 35634 |
| | | | | | BuyerTaxID 35636 | 0..1 35638 | PartyTaxID 35640 |

FIG. 35-24

| Package | level1 | level2 | level3 | level4 | level5 | Cardinality | Datatype Name |
|---|---|---|---|---|---|---|---|
| | | | | | BuyerTaxIdentificationNumberTypeCode 35642 | 0..1 35644 | TaxIdentificationNumberTypeCode 35646 |
| | | | | | EuropeanCommunityVATTriangulationIndicator 35648 | 0..1 35650 | Indicator 35652 |
| | | | | | ProvisionDate 35654 | 0..1 35656 | Date 35658 |
| | | | | | TaxDueDate 35660 | 0..1 35662 | Date 35664 |
| Party 35666 | | | | BuyerParty 35668 | | 0..1 35670 | BusinessTransactionDocumentParty 35672 |

FIG. 35-25

| Package | level1 | level2 | level3 | level4 | level5 | Cardinality | Datatype Name |
|---|---|---|---|---|---|---|---|
| | | | | SellerParty 35674 | | 0..1 35676 | Business-Transac-tionDocu-mentParty 35678 |
| | | | | ProductRe-cipientParty 35680 | | 0..1 35682 | Business-Transac-tionDocu-mentParty 35684 |
| | | | | VendorParty 35686 | | 0..1 35688 | Business-Transac-tionDocu-mentParty 35690 |
| | | | | BillToParty 35692 | | 0..1 35694 | Business-Transac-tionDocu-mentParty 35696 |

FIG. 35-26

| Package | level1 | level2 | level3 | level4 | level5 | Cardinality | Datatype Name |
|---|---|---|---|---|---|---|---|
| | | | | BillFrom-Party 35698 | | 0..1 35700 | Business-Transac-tionDocu-mentParty 35702 |
| | | | | PayerParty 35704 | | 0..1 35706 | Business-Transac-tionDocu-mentParty 35708 |
| | | | | PayeeParty 35710 | | 0..1 35712 | Business-Transac-tionDocu-mentParty 35714 |
| Location 35716 | | | | ShipToLoca-tion 35718 | | 0..1 35720 | Business-Transac-tionDocu-mentLoca-tion 35722 |

FIG. 35-27

| Package | level1 | level2 | level3 | level4 | level5 | Cardinality | Datatype Name |
|---|---|---|---|---|---|---|---|
| | | | | ShipFrom-Location 35724 | | 0..1 35726 | Business-Transac-tionDocu-mentLoca-tion 35728 |
| | | | | Service-PointLoca-tion 35730 | | 0..1 35732 | Business-Transac-tionDocu-mentLoca-tion 35734 |
| DeliveryInformation 35736 | | | | Delivery-Terms 35738 | | 0..1 35740 | Delivery-Terms 35742 |
| BusinessTransaction-Document Reference 35744 | | | | Pur-chaseOrder Reference 35746 | | 0..1 35748 | Business-Transac-tionDocu-mentRefer-ence 35750 |

FIG. 35-28

| Package | level1 | level2 | level3 | level4 | level5 | Cardinality | Datatype Name |
|---|---|---|---|---|---|---|---|
| | | | | SalesOrderReference 35752 | | 0..1 35754 | BusinessTransactionDocumentReference 35756 |
| | | | | ServiceOrderReference 35758 | | 0..1 35760 | BusinessTransactionDocumentReference 35762 |
| | | | | DeliveryReference 35764 | | 0..1 35766 | BusinessTransactionDocumentReference 35768 |

FIG. 35-29

| Package | level1 | level2 | level3 | level4 | level5 | Cardinality | Datatype Name |
|---|---|---|---|---|---|---|---|
| | | | | SalesContract Reference 35770 | | 0..1 35772 | BusinessTransactionDocumentReference 35774 |
| | | | | ServiceContractReference 35776 | | 0..1 35778 | BusinessTransactionDocumentReference 35780 |
| AttachmentFolder 35782 | | | | AttachmentFolder 35784 | | 0..1 35786 | AttachmentFolder 35788 |
| | | | | | AttachmentWebURI 35790 | 0..n 35792 | AttachmentWebURI 35794 |
| TextCollection 35796 | | | | TextCollection 35798 | | 0..1 35800 | TextCollection 35802 |

| Package | level1 | level2 | level3 | level4 | level5 | Cardinality | Datatype Name |
|---|---|---|---|---|---|---|---|
| CustomerReturnExecutionMessage 37000 | CustomerReturnExecutionMessage 37002 | | | | | | CustomerReturnExecutionMessage 37004 |
| MessageHeader 37006 | | MessageHeader 37008 | | | | 1 37010 | BusinessDocumentMessageHeader 37012 |
| CustomerReturn 37014 | | CustomerReturn 37016 | | | | 1 37018 | CustomerReturnExecution 37020 |
| | | | ActionCode 37022 | | | 0..1 37024 | ActionCode 37026 |

FIG. 37-2

| Package | | level1 | level2 | level3 | level4 | level5 | Cardinality | Datatype Name |
|---|---|---|---|---|---|---|---|---|
| | | | | ItemListCompleteTransmissionIndicator 37028 | | | 0..1 37030 | Indicator 37032 |
| | | | | ReconciliationPeriodCounterValue 37034 | | | 0..1 37036 | CounterValue 37038 |
| | Party 37040 | | | BuyerParty 37042 | | | 0..1 37044 | BusinessTransactionDocumentParty 37046 |
| | | | | SellerParty 37048 | | | 0..1 37050 | BusinessTransactionDocumentParty 37052 |
| | | | | ProductRecipientParty 37054 | | | 0..1 37056 | BusinessTransactionDocumentParty 37058 |

FIG. 37-3

| Package | | level1 | level2 | level3 | level4 | level5 | Cardinality | Datatype Name |
|---|---|---|---|---|---|---|---|---|
| | | | | VendorParty 37060 | | | 0..1 37062 | BusinessTransactionDocumentParty 37064 |
| | | | | BillToParty 37066 | | | 0..1 37068 | BusinessTransactionDocumentParty 37070 |
| | | | | BillFromParty 37072 | | | 0..1 37074 | BusinessTransaction-Document Party 37076 |
| | | | | PayerParty 37078 | | | 0..1 37080 | BusinessTransaction-Document Party 37082 |

FIG. 37-4

| Package | | level1 | level2 | level3 | level4 | level5 | Cardinality | Datatype Name |
|---|---|---|---|---|---|---|---|---|
| | | | | PayeeParty 37084 | | | 0..1 37086 | BusinessTransaction-Document Party 37088 |
| | Location 37090 | | | ShipToLocation 37092 | | | 0..1 37094 | BusinessTransactionDocumentLocation 37096 |
| | | | | ShipFromLocation 37098 | | | 0..1 37100 | BusinessTransaction-Document Location 37102 |
| | DeliveryInformation 37104 | | | DeliveryTerms 37106 | | | 0..1 37108 | DeliveryTerms 37110 |

FIG. 37-5

| Package | | level1 | level2 | level3 | level4 | level5 | Cardinality | Datatype Name |
|---|---|---|---|---|---|---|---|---|
| | Attachment-Folder 37112 | | | AttachmentFolder 37114 | | | 0..1 37116 | Attach-ment-Folder 37118 |
| | TextCollection 37120 | | | TextCollection 37122 | | | 0..1 37124 | TextCol-lection 37126 |
| | Item 37128 | | | Item 37130 | | | 1..n 37132 | Cus-tomerRe-turn-Executio-nItem 37134 |
| | | | | | Action-Code 37136 | | 0..1 37138 | Action-Code 37140 |

FIG. 37-6

| Package | | level1 | level2 | level3 | level4 | level5 | Cardinality | Datatype Name |
|---|---|---|---|---|---|---|---|---|
| | ProductInformation 37142 | | | | Product 37144 | | 0..1 37146 | BusinessTransactionDocumentProduct 37148 |
| | Party 37150 | | | | BuyerParty 37152 | | 0..1 37154 | BusinessTransactionDocumentParty 37156 |
| | | | | | SellerParty 37158 | | 0..1 37160 | BusinessTransactionDocumentParty 37162 |

FIG. 37-7

| Package | | level1 | level2 | level3 | level4 | level5 | Cardinality | Datatype Name |
|---|---|---|---|---|---|---|---|---|
| | | | | | ProductRecipientParty 37164 | | 0..1 37166 | BusinessTransactionDocumentParty 37168 |
| | | | | | VendorParty 37170 | | 0..1 37172 | BusinessTransaction-DocumentParty 37174 |
| | | | | | BillToParty 37176 | | 0..1 37178 | BusinessTransactionDocumentParty 37180 |
| | | | | | BillFromParty 37182 | | 0..1 37184 | BusinessTransaction-DocumentParty 37186 |

FIG. 37-8

| Package | | | | | level1 | level2 | level3 | level4 | level5 | Cardinality | Datatype Name |
|---|---|---|---|---|---|---|---|---|---|---|---|
| | | | | | | | | PayerParty 37188 | | 0..1 37190 | BusinessTransactionDocumentParty 37192 |
| | | | | | | | | PayeeParty 37194 | | 0..1 37196 | BusinessTransactionDocumentParty 37198 |
| | | | | Location 37200 | | | | ShipToLocation 37202 | | 0..1 37204 | BusinessTransactionDocumentLocation 37206 |

FIG. 37-9

| Package | | level1 | level2 | level3 | level4 | level5 | Cardinality | Datatype Name |
|---|---|---|---|---|---|---|---|---|
| | | | | | ShipFromLocation 37208 | | 0..1 37210 | BusinessTransactionDocumentLocation 37212 |
| | DeliveryInformation 37214 | | | | DeliveryTerms 37216 | | 0..1 37218 | DeliveryTerms 37220 |
| | ActualValues 37222 | | | | FulfilledQuantity 37224 | | 1 37226 | Quantity 37228 |
| | | | | | FulfilledQuantityTypeCode 37230 | | 1 37232 | QuantityTypeCode 37234 |
| | | | | | AcceptedFulfilledQuantity 37236 | | 1 37238 | Quantity 37240 |

FIG. 37-10

| Package | | level1 | level2 | level3 | level4 | level5 | Cardinality | Datatype Name |
|---|---|---|---|---|---|---|---|---|
| | | | | | AcceptedFulfilledQuantityTypeCode 37242 | | 1 37244 | QuantityTypeCode 37246 |
| | BusinessTransactionDocumentReference 37248 | | | | InboundDeliveryItemReference 37250 | | 1 37252 | BusinessTransactionDocumentReference 37254 |
| | | | | | InboundDeliveryItemReferenceActualValues 37256 | | 0..1 37258 | InboundDeliveryItemReferenceActualValues 37260 |
| | | | | | | Quantity 37262 | 1 37264 | Quantity 37266 |

FIG. 37-11

| Package | | level1 | level2 | level3 | level4 | level5 | Cardinality | Datatype Name |
|---|---|---|---|---|---|---|---|---|
| | | | | | | Quantity-RoleCode 37268 | 1 37270 | Quantity-RoleCode 37272 |
| | | | | | | Quanti-tyType-Code 37274 | 1 37276 | Quanti-tyType-Code 37278 |
| | | | | | SalesOrderItemRefer-ence 37280 | | 0..1 37282 | Business-Transac-tion-Documen-tRefer-ence 37284 |
| | | | | | OutboundDelivery-ItemReference 37286 | | 0..1 37288 | Business-Transac-tion-Documen-tRefer-ence 37290 |

FIG. 37-12

| Package | | level1 | level2 | level3 | level4 | level5 | Cardinality | Datatype Name |
|---|---|---|---|---|---|---|---|---|
| | | | | | CustomerInvoiceItem-Reference 37292 | | 0..1 37294 | Business-Transaction-DocumentReference 37296 |
| | AttachementFolder 37298 | | | | Attachment-Folder 37300 | | 0..1 37302 | Attachment-Folder 37304 |
| | TextCollection 37306 | | | | TextCollection 37308 | | 0..1 37310 | TextCollection 37312 |
| | ScheduleLine 37314 | | | | RequestedScheduleLine 37316 | | 1 37318 | CustomerReturnItem-Requested-ScheduleLine 37320 |

FIG. 37-13

| Pack-age | | level1 | level2 | level3 | level4 | level5 | Cardinal-ity | Datatype Name |
|---|---|---|---|---|---|---|---|---|
| | | | | | | ID 37322 | 0..1 37324 | Business-Transac-tion-Documen-tItem-Sched-uleLineID 37326 |
| | | | | | | Quantiy 37328 | 1 37330 | Quantity 37332 |
| | | | | | | Quanti-tyType-Code 37334 | 1 37336 | Quanti-tyType-Code 37338 |
| | | | | | | DateTime Period 37340 | 1 37342 | UPPEROPEN_LOCALNORMALISED_DateTime Period 37344 |

FIG. 38-1

| Package | level1 | level2 | level3 | level4 | level5 | level6 | level7 | Cardinality | Datatype Name |
|---|---|---|---|---|---|---|---|---|---|
| FormPurchaseOrderMessage 38000 | FormPurchaseOrderMessage 38002 | | | | | | | | FormPurchaseOrderMessage 38004 |
| SalesOrder 38006 | | SalesOrder 38008 | | | | | | 1 38010 | FormSalesOrder 38012 |
| | | | ID 38014 | | | | | 1 38016 | BusinessTransactionDocumentID 38018 |
| | | | BuyerID 38020 | | | | | 0..1 38022 | BusinessTransactionDocumentID 38024 |
| | | | Date 38026 | | | | | 0..1 38028 | Date 38030 |

FIG. 38-2

| Package | level1 | level2 | level3 | level4 | level5 | level6 | level7 | Cardinality | Datatype Name |
|---|---|---|---|---|---|---|---|---|---|
| | | | Printing-Date 38032 | | | | | 0..1 38034 | Date 38036 |
| | | | Name 38038 | | | | | 0..1 38040 | MEDIUM_Name 38042 |
| | | | LastPro-mised-Date 38044 | | | | | 0..1 38046 | Date 38048 |
| | | | LastCon-firmed-Date 38050 | | | | | 0..1 38052 | Date 38054 |
| Party 38056 | | | Buyer-Party 38058 | | | | | 0..1 38060 | FormBusi-ness-Transac-tionDocu-mentParty 38062 |

FIG. 38-3

| Package | level1 | level2 | level3 | level4 | level5 | level6 | level7 | Cardinality | Datatype Name |
|---|---|---|---|---|---|---|---|---|---|
| | | | | SellerID 38064 | | | | 0..1 38066 | Party-PartyID 38068 |
| | | | | Format-tedAdress 38070 | | | | 0..1 38072 | Formatte-dAddress 38074 |
| | | | | Contact-Person 38076 | | | | 0..1 38078 | FormCon-tactPerson 38080 |
| | | | | | SellerID 38082 | | | 0..1 38084 | Contact-Person-PartyID 38086 |
| | | | | | Formatte-dAdress 38088 | | | 0..1 38090 | Formatte-dAddress 38092 |

FIG. 38-4

| Package | level1 | level2 | level3 | level4 | level5 | level6 | level7 | Cardinality | Datatype Name |
|---|---|---|---|---|---|---|---|---|---|
| | | | Seller-Party 38094 | | | | | 0..1 38096 | FormBusiness-TransactionDocumentParty 38098 |
| | | | | SellerID 38100 | | | | 0..1 38102 | Party-PartyID 38104 |
| | | | | FormattedAdress 38106 | | | | 0..1 38108 | FormattedAddress 38110 |
| | | | | Contact-Person 38112 | | | | 0..1 38114 | FormContactPerson 38116 |
| | | | | | SellerID 38118 | | | 0..1 38120 | Contact-Person-PartyID 38122 |

FIG. 38-5

| Package | level1 | level2 | level3 | level4 | level5 | level6 | level7 | Cardinality | Datatype Name |
|---|---|---|---|---|---|---|---|---|---|
| | | | | | Formatte-dAdress 38124 | | | 0..1 38126 | Formatte-dAddress 38128 |
| | | | Produc-tRecipi-entParty 38130 | | | | | 0..1 38132 | FormBusi-ness-Transac-tionDocu-mentParty 38134 |
| | | | | SellerID 38136 | | | | 0..1 38138 | Party-PartyID 38140 |
| | | | | Format-tedAdress 38142 | | | | 0..1 38144 | Formatte-dAddress 38146 |
| | | | | Contact-Person 38148 | | | | 0..1 38150 | FormCon-tactPerson 38152 |

FIG. 38-6

| Package | level1 | level2 | level3 | level4 | level5 | level6 | level7 | Cardinality | Datatype Name |
|---|---|---|---|---|---|---|---|---|---|
| | | | | | SellerID 38154 | | | 0..1 38156 | Contact-Person-PartyID 38158 |
| | | | | | Formatte-dAdress 38160 | | | 0..1 38162 | Formatte-dAddress 38164 |
| | | | Employ-eeRe-sponsi-bleParty 38166 | | | | | 0..1 38168 | Form-Busimess Transac-tionDocu-mentParty 38170 |
| | | | | SellerID 38172 | | | | 0..1 38174 | Party-PartyID 38176 |
| | | | | Format-tedAdress 38178 | | | | 0..1 38180 | Formatte-dAddress 38182 |

FIG. 38-7

| Package | level1 | level2 | level3 | level4 | level5 | level6 | level7 | Cardinality | Datatype Name |
|---|---|---|---|---|---|---|---|---|---|
| DeliveryIn-formation 38184 | | | Incoterms 38186 | | | | | 0..1 38188 | FormInco-terms 38190 |
| | | | | Classifi-cation-Code 38192 | | | | 1 38194 | |
| | | | | Classifi-cation-Code-Name 38196 | | | | 1 38198 | Name 38200 |
| | | | | Transfer-Location-Name 38202 | | | | 0..1 38204 | |
| PaymentIn-formation 38206 | | | CashDis-count-Terms 38208 | | | | | 0..1 38210 | CashDis-count-Terms 38212 |

FIG. 38-8

| Package | level1 | level2 | level3 | level4 | level5 | level6 | level7 | Cardinality | Datatype Name |
|---|---|---|---|---|---|---|---|---|---|
| | | | | Pay-mentBase LineDate 38214 | | | | 0..1 38216 | Date 38218 |
| | | | | Maximum CashDis-count 38220 | | | | 0..1 38222 | CashDis-count 38224 |
| | | | | | Days-Value 38226 | | | 1 38228 | |
| | | | | | Percent 38230 | | | 1 38232 | Percent 38234 |
| | | | | Normal-CashDis-count 38236 | | | | 0..1 38238 | CashDis-count 38240 |

FIG. 38-9

| Package | level1 | level2 | level3 | level4 | level5 | level6 | level7 | Cardinality | Datatype Name |
|---|---|---|---|---|---|---|---|---|---|
| | | | | | Days-Value 38242 | | | 1 38244 | |
| | | | | | Percent 38246 | | | 1 38248 | Percent 38250 |
| | | | | FullPayment-DueDays Value 38252 | | | | 0..1 38254 | |
| PriceInformation 38256 | | | PriceAnd Tax 38258 | | | | | 0..1 38260 | Form-PriceAnd-Tax 38262 |
| | | | | NetAmount 38264 | | | | 0..1 38266 | Amount 38268 |
| | | | | | currency-Code 38270 | | | 1 38272 | |

FIG. 38-10

| Package | level1 | level2 | level3 | level4 | level5 | level6 | level7 | Cardinality | Datatype Name |
|---|---|---|---|---|---|---|---|---|---|
| | | | | Gros-sAmount 38274 | | | | 0..1 38276 | Amount 38278 |
| | | | | | currency-Code 38280 | | | 1 38282 | |
| | | | | Tax-Amount 38284 | | | | 0..1 38286 | Amount 38288 |
| | | | | | currency-Code 38290 | | | 1 38292 | |
| | | | | FreightChargeA-mount 38294 | | | | 0..1 38296 | Amount 38298 |
| | | | | | currency-Code 38300 | | | 1 38302 | |

FIG. 38-11

| Package | level1 | level2 | level3 | level4 | level5 | level6 | level7 | Cardinality | Datatype Name |
|---|---|---|---|---|---|---|---|---|---|
| | | | | TotalDiscount 38304 | | | | 0..1 38306 | FormPriceComponent 38308 |
| BusinessTransactionDocumentReference 38310 | | | CustomerQuoteReference 38312 | | | | | 0..1 38314 | BusinessTransactionDocumentReference 38316 |
| | | | | ID 38318 | | | | 1 38320 | BusinessTransactionDocumentID 38322 |

FIG. 38-12

| Package | level1 | level2 | level3 | level4 | level5 | level6 | level7 | Cardinality | Datatype Name |
|---|---|---|---|---|---|---|---|---|---|
| | | | | ItemID 38324 | | | | 0..n 38326 | Business-TransactionDocumentItemID 38328 |
| | | | PurchaseOrderReference 38330 | | | | | 0..n 38332 | BusinessTransactionDocumentReference 38334 |
| | | | | ID 38336 | | | | 1 38338 | BusinessTransactionDocumentID 38340 |

FIG. 38-13

| Package | level1 | level2 | level3 | level4 | level5 | level6 | level7 | Cardinality | Datatype Name |
|---|---|---|---|---|---|---|---|---|---|
| | | | | ItemID 38342 | | | | 0..n 38344 | Business-Transac-tionDocu-men-tItemID 38346 |
| Description 38348 | | | TextCol-lection 38350 | | | | | 0..1 38352 | TextCol-lection 38354 |
| Item 38356 | | | Item 38358 | | | | | 0..n 38360 | FormSale-sOrde-rItem 38362 |
| | | | | ID 38364 | | | | 0..1 38366 | Business-Transac-tionDocu-men-tItemID 38368 |
| | | | | Quantity 38370 | | | | 0..1 38372 | Quantity 38374 |

FIG. 38-14

| Package | level1 | level2 | level3 | level4 | level5 | level6 | level7 | Cardinality | Datatype Name |
|---|---|---|---|---|---|---|---|---|---|
| | | | | | MeasureUnitCode 38376 | | | 1 38378 | |
| | | | | QuantityMeasureUnitCodeName 38380 | | | | 0..1 38382 | Name 38384 |
| ProductInformation 38386 | | | | Product 38388 | | | | 0..1 38390 | FormBusinessTransactionDocumentProduct 38392 |
| | | | | | BuyerID 38394 | | | 0..1 38396 | ProductPartyID 38398 |

FIG. 38-15

| Package | level1 | level2 | level3 | level4 | level5 | level6 | level7 | Cardinality | Datatype Name |
|---|---|---|---|---|---|---|---|---|---|
| | | | | | SellerID 38400 | | | 0..1 38402 | Product-PartyID 38404 |
| PriceIn-formation 38406 | | | | PriceAnd Tax 38408 | | | | 0..1 38410 | FormItem PriceAnd-Tax 38412 |
| | | | | | NetA-mount 38414 | | | 0..1 38416 | Amount 38418 |
| | | | | | | currency-Code 38420 | | 1 38422 | |
| | | | | | Gros-sAmount 38424 | | | 0..1 38426 | Amount 38428 |
| | | | | | | currency-Code 38430 | | 1 38432 | |

FIG. 38-16

| Package | level1 | level2 | level3 | level4 | level5 | level6 | level7 | Cardinality | Datatype Name |
|---|---|---|---|---|---|---|---|---|---|
| | | | | | NetWith-out-FreightChargeA-mount 38434 | | | 0..1 38436 | Amount 38438 |
| | | | | | | currency-Code 38440 | | 1 38442 | |
| | | | | | Tax-Amount 38444 | | | 0..1 38446 | Amount 38448 |
| | | | | | | currency-Code 38450 | | 1 38452 | |
| | | | | | MainPrice 38454 | | | 0..1 38456 | FormPrice Compo-nent 38458 |

FIG. 38-17

| Package | level1 | level2 | level3 | level4 | level5 | level6 | level7 | Cardinality | Datatype Name |
|---|---|---|---|---|---|---|---|---|---|
| | | | | | MainDiscount 38460 | | | 0..1 38462 | FormPriceComponent 38464 |
| | | | | | NetPrice 38466 | | | 0..1 38468 | FormPrice 38470 |
| | | | | | | Amount 38472 | | 1 38474 | Amount 38476 |
| | | | | | | | currencyCode 38478 | 1 38480 | |
| Party 38482 | | | | ProductRecipientParty 38484 | | | | 0..1 38486 | FormBusinessTransactionDocumentParty 38488 |

FIG. 38-18

| Package | level1 | level2 | level3 | level4 | level5 | level6 | level7 | Cardinality | Datatype Name |
|---|---|---|---|---|---|---|---|---|---|
| DeliveryIn-formation 38490 | | | | Delivery-Terms 38492 | | | | 0..1 38494 | FormDe-livery-Terms 38496 |
| Business-Transac-tion Documen-tRefer-ence 38498 | | | | Customer QuoteRef erence 38500 | | | | 0..1 38502 | Business-Transac-tionDocu-mentRefer ence 38504 |
| | | | | | ID 38506 | | | 1 38508 | Business-Transac-tionDocu-mentID 38510 |
| | | | | | ItemID 38512 | | | 0..n 38514 | Business-Transac-tionDocu-men-tItemID 38516 |

FIG. 38-19

| Package | level1 | level2 | level3 | level4 | level5 | level6 | level7 | Cardinality | Datatype Name |
|---|---|---|---|---|---|---|---|---|---|
| | | | | Pur-chaseOr-derRefer-ence 38518 | | | | 0..n 38520 | Business-Transac-tionDocu-mentRefer ence 38522 |
| | | | | | ID 38524 | | | 1 38526 | Business-Transac-tionDocu-mentID 38528 |
| | | | | | ItemID 38530 | | | 0..n 38532 | Business-Transac-tionDocu-men-tItemID 38534 |
| Descrip-tion 38536 | | | | Descrip-tion 38538 | | | | 0..1 38540 | Descrip-tion 38542 |

FIG. 38-20

| Package | level1 | level2 | level3 | level4 | level5 | level6 | level7 | Cardinality | Datatype Name |
|---|---|---|---|---|---|---|---|---|---|
| | | | | TextCollection 38544 | | | | 0..1 38546 | TextCollection 38548 |

FIG. 39-1

| Package | level1 | level2 | level3 | level4 | level5 | level6 | level7 | Cardinality | Datatype Name |
|---|---|---|---|---|---|---|---|---|---|
| FormQuoteMessage 39000 | FormQuoteMessage 39002 | | | | | | | | FormQuoteMessage 39004 |
| CustomerQuote 39006 | | CustomerQuote 39008 | | | | | | 1 39010 | FormCustomerQuote 39012 |
| | | | ID 39014 | | | | | 1 39016 | BusinessTransactionDocumentID 39018 |
| | | | BuyerID 39020 | | | | | 0..1 39022 | BusinessTransactionDocumentID 39024 |
| | | | Date 39026 | | | | | 0..1 39028 | Date 39030 |

FIG. 39-2

| Package | level1 | level2 | level3 | level4 | level5 | level6 | level7 | Cardinality | Datatype Name |
|---|---|---|---|---|---|---|---|---|---|
| | | | Printing-Date 39032 | | | | | 0..1 39034 | Date 39036 |
| | | | Name 39038 | | | | | 0..1 39040 | MEDIUM_ Name 39042 |
| | | | LastPro-mised-Date 39044 | | | | | 0..1 39046 | Date 39048 |
| | | | LastCon-firmed-Date 39050 | | | | | 0..1 39052 | Date 39054 |
| | | | Validity-DatePe-riod 39056 | | | | | 0..1 39058 | DatePe-riod 39060 |

FIG. 39-3

| Package | level1 | level2 | level3 | level4 | level5 | level6 | level7 | Cardinality | Datatype Name |
|---|---|---|---|---|---|---|---|---|---|
| Party 39062 | | | Buyer-Party 39064 | | | | | 0..1 39066 | FormBusiness-TransactionDocumentParty 39068 |
| | | | | SellerID 39070 | | | | 0..1 39072 | Party-PartyID 39074 |
| | | | | Formatte-dAdress 39076 | | | | 0..1 39078 | Formatte-dAddress 39080 |
| | | | | Contact-Person 39082 | | | | 0..1 39084 | FormContactPerson 39086 |
| | | | | | SellerID 39088 | | | 0..1 39090 | Contact-Person-PartyID 39092 |

FIG. 39-4

| Package | level1 | level2 | level3 | level4 | level5 | level6 | level7 | Cardinality | Datatype Name |
|---|---|---|---|---|---|---|---|---|---|
| | | | | | Formatte-dAdress 39094 | | | 0..1 39096 | Formatte-dAddress 39098 |
| | | | Seller-Party 39100 | | | | | 0..1 39102 | FormBusi-ness-Transac-tionDocu-mentParty 39104 |
| | | | | SellerID 39106 | | | | 0..1 39108 | Party-PartyID 39110 |
| | | | | Formatte-dAdress 39112 | | | | 0..1 39114 | Formatte-dAddress 39116 |
| | | | | Contact-Person 39118 | | | | 0..1 39120 | FormCon-tactPerson 39122 |

FIG. 39-5

| Package | level1 | level2 | level3 | level4 | level5 | level6 | level7 | Cardinality | Datatype Name |
|---|---|---|---|---|---|---|---|---|---|
| | | | | | SellerID 39124 | | | 0..1 39126 | Contact-Person-PartyID 39128 |
| | | | | | Formatte-dAdress 39130 | | | 0..1 39132 | Formatte-dAddress 39134 |
| | | | Produc-tRecipi-entParty 39136 | | | | | 0..1 39138 | FormBusi-ness-Transac-tionDocu-mentParty 39140 |
| | | | | SellerID 39142 | | | | 0..1 39144 | Party-PartyID 39146 |
| | | | | Formatte-dAdress 39148 | | | | 0..1 39150 | Formatte-dAddress 39152 |

FIG. 39-6

| Package | level1 | level2 | level3 | level4 | level5 | level6 | level7 | Cardinality | Datatype Name |
|---|---|---|---|---|---|---|---|---|---|
| | | | | Contact-Person 39154 | | | | 0..1 39156 | FormContactPerson 39158 |
| | | | | | SellerID 39160 | | | 0..1 39162 | Contact-Person-PartyID 39164 |
| | | | | | Formatte-dAdress 39166 | | | 0..1 39168 | Formatte-dAddress 39170 |
| | | | Employ-eeRe-sponsi-bleParty 39172 | | | | | 0..1 39174 | Form-Busimess Transac-tionDocu-mentParty 39176 |
| | | | | SellerID 39178 | | | | 0..1 39180 | Party-PartyID 39182 |

FIG. 39-7

| Package | level1 | level2 | level3 | level4 | level5 | level6 | level7 | Cardinality | Datatype Name |
|---|---|---|---|---|---|---|---|---|---|
| | | | | Formatte-dAdress 39184 | | | | 0..1 39186 | Formatte-dAddress 39188 |
| DeliveryIn-formation 39190 | | | Incoterms 39192 | | | | | 0..1 39194 | FormInco-terms 39196 |
| | | | | Classifi-cation-Code 39198 | | | | 1 39200 | |
| | | | | Classifi-cation-Code-Name 39202 | | | | 1 39204 | Name 39206 |
| | | | | Transfer-Location-Name 39208 | | | | 0..1 39210 | |

FIG. 39-8

| Package | level1 | level2 | level3 | level4 | level5 | level6 | level7 | Cardinality | Datatype Name |
|---|---|---|---|---|---|---|---|---|---|
| PaymentIn-formation 39212 | | | CashDis-count-Terms 39214 | | | | | 0..1 39216 | CashDis-count-Terms 39218 |
| | | | | Payment-Base-LineDate 39220 | | | | 0..1 39222 | Date 39224 |
| | | | | Maximum CashDis-count 39226 | | | | 0..1 39228 | CashDis-count 39230 |
| | | | | | Days-Value 39232 | | | 1 39234 | |
| | | | | | Percent 39236 | | | 1 39238 | Percent 39240 |

FIG. 39-9

| Package | level1 | level2 | level3 | level4 | level5 | level6 | level7 | Cardinality | Datatype Name |
|---|---|---|---|---|---|---|---|---|---|
| | | | | Normal-CashDis-count 39242 | | | | 0..1 39244 | CashDis-count 39246 |
| | | | | | Days-Value 39248 | | | 1 39250 | |
| | | | | | Percent 39252 | | | 1 39254 | Percent 39256 |
| | | | | FullPay-ment-DueDays Value 39258 | | | | 0..1 39260 | |
| PriceInfor-mation 39262 | | | PriceAnd Tax 39264 | | | | | 0..1 39266 | Form-PriceAnd-Tax 39268 |

FIG. 39-10

| Package | level1 | level2 | level3 | level4 | level5 | level6 | level7 | Cardinality | Datatype Name |
|---|---|---|---|---|---|---|---|---|---|
| | | | | NetAmount 39270 | | | | 0..1 39272 | Amount 39274 |
| | | | | | currencyCode 39276 | | | 1 39278 | |
| | | | | GrossAmount 39280 | | | | 0..1 39282 | Amount 39284 |
| | | | | | currencyCode 39286 | | | 1 39288 | |
| | | | | TaxAmount 39290 | | | | 0..1 39292 | Amount 39294 |
| | | | | | currencyCode 39296 | | | 1 39298 | |

FIG. 39-11

| Package | level1 | level2 | level3 | level4 | level5 | level6 | level7 | Cardinality | Datatype Name |
|---|---|---|---|---|---|---|---|---|---|
| | | | | FreightChargeAmount 39300 | | | | 0..1 39302 | Amount 39304 |
| | | | | | currencyCode 39306 | | | 1 39308 | |
| | | | | TotalDiscount 39310 | | | | 0..1 39312 | FormPriceComponent 39314 |
| Description 39316 | | | TextCollection 39318 | | | | | 0..1 39320 | TextCollection 39322 |
| Item 39324 | | | Item 39326 | | | | | 0..n 39328 | FormCustomerQuoteItem 39330 |

FIG. 39-12

| Package | level1 | level2 | level3 | level4 | level5 | level6 | level7 | Cardinality | Datatype Name |
|---|---|---|---|---|---|---|---|---|---|
| | | | | ID 39332 | | | | 0..1 39334 | Business-Transac-tionDocu-men-tItemID 39336 |
| | | | | Quantity 39338 | | | | 0..1 39340 | Quantity 39342 |
| | | | | | Meas-ureUnit-Code 39344 | | | 1 39346 | |
| | | | | Quantity-Meas-ureUnit-Code-Name 39348 | | | | 0..1 39350 | Name 39352 |

FIG. 39-13

| Package | level1 | level2 | level3 | level4 | level5 | level6 | level7 | Cardinality | Datatype Name |
|---|---|---|---|---|---|---|---|---|---|
| ProductIn-formation 39354 | | | | Product 39356 | | | | 0..1 39358 | FormBusi-ness-Transac-tionDocu-mentPro-duct 39360 |
| | | | | | BuyerID 39362 | | | 0..1 39364 | Product-PartyID 39366 |
| | | | | | SellerID 39368 | | | 0..1 39370 | Product-PartyID 39372 |
| PriceIn-formation 39374 | | | | PriceAnd Tax 39376 | | | | 0..1 39378 | FormItem PriceAnd-Tax 39380 |
| | | | | | NetA-mount 39382 | | | 0..1 39384 | Amount 39386 |

FIG. 39-14

| Package | level1 | level2 | level3 | level4 | level5 | level6 | level7 | Cardinality | Datatype Name |
|---|---|---|---|---|---|---|---|---|---|
| | | | | | | currency-Code 39388 | | 1 39390 | |
| | | | | | Gros-sAmount 39392 | | | 0..1 39394 | Amount 39396 |
| | | | | | | currency-Code 39398 | | 1 39400 | |
| | | | | | NetWith-out-FreightChargeA-mount 39402 | | | 0..1 39404 | Amount 39406 |
| | | | | | | currency-Code 39408 | | 1 39410 | |

FIG. 39-15

| Package | level1 | level2 | level3 | level4 | level5 | level6 | level7 | Cardinality | Datatype Name |
|---|---|---|---|---|---|---|---|---|---|
| | | | | | Tax-Amount 39412 | | | 0..1 39414 | Amount 39416 |
| | | | | | | currency-Code 39418 | | 1 39420 | |
| | | | | | MainPrice 39422 | | | 0..1 39424 | FormPrice Compo-nent 39426 |
| | | | | | MainDis-count 39428 | | | 0..1 39430 | FormPrice Compo-nent 39432 |
| | | | | | NetPrice 39434 | | | 0..1 39436 | FormPrice 39438 |
| | | | | | | Amount 39440 | | 1 39442 | Amount 39444 |

FIG. 39-16

| Package | level1 | level2 | level3 | level4 | level5 | level6 | level7 | Cardinality | Datatype Name |
|---|---|---|---|---|---|---|---|---|---|
| | | | | | | | currency-Code 39446 | 1 39448 | |
| Party 39450 | | | | Produc-tRecipi-entParty 39452 | | | | 0..1 39454 | FormBusi-ness-Transac-tionDocu-mentParty 39456 |
| DeliveryIn-formation 39458 | | | | Delivery-Terms 39460 | | | | 0..1 39462 | FormDe-livery-Terms 39464 |
| Descrip-tion 39466 | | | | Descrip-tion 39468 | | | | 0..1 39470 | Descrip-tion 39472 |
| | | | | TextCol-lection 39474 | | | | 0..1 39476 | TextCol-lection 39478 |

FIG. 40-1

| Package | level1 | level2 | level3 | level4 | level5 | Cardinality | Datatype Name |
|---|---|---|---|---|---|---|---|
| FormServiceRequestMessage 40000 | ServiceRequest-Message 40002 | | | | | 1 40004 | FormServiceRequest-Message 40006 |
| ServiceRequest 40008 | | ServiceRequest 40010 | | | | 1 40012 | FormCustomer-Transaction-DocumentServiceRequest 40014 |
| | | | ID 40016 | | | 1 40018 | BusinessTransaction-DocumentID 40020 |

FIG. 40-2

| Package | level1 | level2 | level3 | level4 | level5 | Cardinality | Datatype Name |
|---|---|---|---|---|---|---|---|
| | | | SellerID 40022 | | | 0..1 40024 | BusinessTransactionDocumentID 40026 |
| | | | ActionCode 40028 | | | 0..1 40030 | ActionCode 40032 |
| | | | SolutionStatusCode 40034 | | | 0..1 40036 | SolutionProposalStatusCode 40038 |
| | | | FinishIndicator 40040 | | | 0..1 40042 | Indicator 40044 |

FIG. 40-3

| Package | level1 | level2 | level3 | level4 | level5 | Cardinality | Datatype Name |
|---|---|---|---|---|---|---|---|
| | | | Reques-tAssign-ment-Status-Code 40046 | | | 0..1 40048 | Reques-tAssign-ment-Status-Code 40050 |
| | | | DateTime 40052 | | | 0..1 40054 | GLOBAL_DateTime 40056 |
| | | | Name 40058 | | | 0..1 40060 | Ex-tended_Name 40062 |
| ServiceTerms 40064 | | | Ser-viceTerms 40066 | | | 0..1 40068 | FormCus-tomer-Transac-tionDocu-mentSer-viceTerms 40070 |

FIG. 40-4

| Package | level1 | level2 | level3 | level4 | level5 | Cardinality | Datatype Name |
|---|---|---|---|---|---|---|---|
| | | | | ServiceIssueCategoryID 40072 | | 0..1 40074 | ServiceIssueCategoryID 40076 |
| | | | | ServiceIssue CategoryName 40078 | | 0..1 40080 | _MEDIUM_Name 40082 |
| Party 40084 | | | BuyerParty 40086 | | | 0..1 40088 | FormBusinessTransactionDocumentParty 40090 |
| | | | | InternalID 40092 | | 0..1 40094 | PartyInternalID 40096 |

FIG. 40-5

| Package | level1 | level2 | level3 | level4 | level5 | Cardinality | Datatype Name |
|---|---|---|---|---|---|---|---|
| | | | | Stan-dardID 40098 | | 0..n 40100 | PartyStandardID 40102 |
| | | | | BuyerID 40104 | | 0..1 40106 | Party-PartyID 40108 |
| | | | | SellerID 40110 | | 0..1 40112 | Party-PartyID 40114 |
| | | | | Address 40116 | | 0..1 40118 | Address 40120 |
| | | | | Formatte-dAddress 40122 | | 0..1 40124 | Format-tedAd-dress 40126 |
| | | | | Contact-Person 40128 | | 0..1 40130 | Contact-Person 40132 |

FIG. 40-6

| Package | | | | level1 | level2 | level3 | level4 | level5 | Cardinality | Datatype Name |
|---|---|---|---|---|---|---|---|---|---|---|
| | | | | | | | | InternalID 40134 | 0..1 40136 | Party-InternalID 40138 |
| | | | | | | | | BuyerID 40140 | 0..1 40142 | Party-PartyID 40144 |
| | | | | | | | | SellerID 40146 | 0..1 40148 | Party-PartyID 40150 |
| | | | | | | | | Address 40152 | 0..1 40154 | Address 40156 |
| | | | | | | | | FormAddress 40158 | | |

FIG. 40-7

| Package | level1 | level2 | level3 | level4 | level5 | Cardinality | Datatype Name |
|---|---|---|---|---|---|---|---|
| | | | Produc-tRecipi-entParty 40160 | | | 0..1 40162 | FormBusiness-Transac-tionDocu-ment-Party 40164 |
| | | | | InternalID 40166 | | 0..1 40168 | Party-InternalID 40170 |
| | | | | Stan-dardID 40172 | | 0..n 40174 | PartyStandardID 40176 |
| | | | | BuyerID 40178 | | 0..1 40180 | Party-PartyID 40182 |

FIG. 40-8

| Package | level1 | level2 | level3 | level4 | level5 | Cardinality | Datatype Name |
|---|---|---|---|---|---|---|---|
| | | | | SellerID 40184 | | 0..1 40186 | Party-PartyID 40188 |
| | | | | Address 40190 | | 0..1 40192 | Address 40194 |
| | | | | Contact-Person 40196 | | 0..1 40198 | Contact-Person 40200 |
| | | | | | InternalID 40202 | 0..1 40204 | Party-InternalID 40206 |
| | | | | | BuyerID 40208 | 0..1 40210 | Party-PartyID 40212 |
| | | | | | SellerID 40214 | 0..1 40216 | Party-PartyID 40218 |
| | | | | | Address 40220 | 0..1 40222 | Address 40224 |

FIG. 40-9

| Package | level1 | level2 | level3 | level4 | level5 | Cardinality | Datatype Name |
|---|---|---|---|---|---|---|---|
| | | | Seller-Party 40226 | | | 0…1 40228 | FormBusinessTransaction-DocumentParty 40230 |
| | | | | InternalID 40232 | | 0…1 40234 | Party-InternalID 40236 |
| | | | | Stan-dardID 40238 | | 0..1 40240 | PartyStandardID 40242 |
| | | | | BuyerID 40244 | | 0..1 40246 | Party-PartyID 40248 |
| | | | | SellerID 40250 | | 0..1 40252 | Party-PartyID 40254 |

FIG. 40-10

| Package | level1 | level2 | level3 | level4 | level5 | Cardinality | Datatype Name |
|---|---|---|---|---|---|---|---|
| | | | | Address 40256 | | 0..1 40258 | Address 40260 |
| | | | | Contact-Person 40262 | | 0..1 40264 | Contact-Person 40266 |
| | | | | | InternalID 40268 | 0..1 40270 | Party-InternalID 40272 |
| | | | | | BuyerID 40274 | 0..1 40276 | Party-PartyID 40278 |
| | | | | | SellerID 40280 | 0..1 40282 | Party-PartyID 40284 |
| | | | | | Address 40286 | 0..1 40288 | Address 40290 |

FIG. 40-11

| Package | level1 | level2 | level3 | level4 | level5 | Cardinality | Datatype Name |
|---|---|---|---|---|---|---|---|
| | | | Proces-sorParty 40292 | | | 0…1 40294 | FormBusiness-Transac-tionDocu-ment-Party 40296 |
| | | | | InternalID 40298 | | 0…1 40300 | Party-InternalID 40302 |
| | | | | Stan-dardID 40304 | | 0..1 40306 | PartyStandardID 40308 |
| | | | | BuyerID 40310 | | 0..1 40312 | Party-PartyID 40314 |

FIG. 40-12

| Package | level1 | level2 | level3 | level4 | level5 | Cardinality | Datatype Name |
|---|---|---|---|---|---|---|---|
| | | | | SellerID 40316 | | 0..1 40318 | Party-PartyID 40320 |
| | | | | Address 40322 | | 0..1 40324 | Address 40326 |
| | | | | Contact-Person 40328 | | 0..1 40330 | Contact-Person 40332 |
| | | | | | InternalID 40334 | 0..1 40336 | Party-InternalID 40338 |
| | | | | | BuyerID 40340 | 0..1 40342 | Party-PartyID 40344 |
| | | | | | SellerID 40346 | 0..1 40348 | Party-PartyID 40350 |
| | | | | | Address 40352 | 0..1 40354 | Address 40356 |

FIG. 40-13

| Package | level1 | level2 | level3 | level4 | level5 | Cardinality | Datatype Name |
|---|---|---|---|---|---|---|---|
| | | | Service-Support-Team-Party 40358 | | | 0…1 40360 | FormBusinessTransaction-DocumentParty 40362 |
| | | | | InternalID 40364 | | 0…1 40366 | Party-InternalID 40368 |
| | | | | Stan-dardID 40370 | | 0..1 40372 | PartyStandardID 40374 |
| | | | | BuyerID 40376 | | 0..1 40378 | Party-PartyID 40380 |
| | | | | SellerID 40382 | | 0..1 40384 | Party-PartyID 40386 |

FIG. 40-14

| Package | level1 | level2 | level3 | level4 | level5 | Cardinality | Datatype Name |
|---|---|---|---|---|---|---|---|
| | | | | Address 40388 | | 0..1 40390 | Address 40392 |
| | | | | Contact-Person 40394 | | 0..1 40396 | Contact-Person 40398 |
| | | | | | InternalID 40400 | 0..1 40402 | Party-InternalID 40404 |
| | | | | | BuyerID 40406 | 0..1 40408 | Party-PartyID 40410 |
| | | | | | SellerID 40412 | 0..1 40414 | Party-PartyID 40416 |
| | | | | | Address 40418 | 0..1 40420 | Address 40422 |

FIG. 40-15

| Package | level1 | level2 | level3 | level4 | level5 | Cardinality | Datatype Name |
|---|---|---|---|---|---|---|---|
| IncidentServiceIssueCategory 40424 | | | Incident-ServiceIs-sueCate-gory 40426 | | | 0..n 40428 | FormCus-tomer-Transac-tion-Documen tInci-dentSer-viceIs-sueCate-gory 40430 |
| | | | | MainIndi-cator 40432 | | 1 40434 | Indicator 40436 |
| | | | | Incident-ServiceIs-sueCate-goryID 40438 | | 1 40440 | Ser-viceIssue Cate-goryID 40442 |

FIG. 40-16

| Package | level1 | level2 | level3 | level4 | level5 | Cardinality | Datatype Name |
|---|---|---|---|---|---|---|---|
| | | | | Incident-ServiceIs-sueCate-gory-Name 40444 | | 0..1 40446 | _MEDIUM_Name 40448 |
| ServiceReferenceObject 40450 | | | Ser-viceReferenceOb-ject 40452 | | | 0..n 40454 | FormCus-tomer-Transac-tion-DocumentSer-viceReferenceOb-ject 40456 |
| | | | | MainIndi-cator 40458 | | 1 40460 | Indicator 40462 |

FIG. 40-17

| Package | level1 | level2 | level3 | level4 | level5 | Cardinality | Datatype Name |
|---|---|---|---|---|---|---|---|
| | | | | ServiceReferenceObjectMaterialID 40464 | | 0..1 40466 | ProductID 40468 |
| | | | | ServiceReferenceObjectMaterialDescription 40470 | | 0..1 40472 | _SHORT_Description 40474 |
| | | | | ServiceReferenceObjectIndividualMaterialSerialID 40476 | | 0..1 40478 | SerialID 40480 |

FIG. 40-18

| Package | level1 | level2 | level3 | level4 | level5 | Cardinality | Datatype Name |
|---|---|---|---|---|---|---|---|
| | | | | Ser-viceReferenceOb-jectIndi-vidualMa-terialDe-scription 40482 | | 0..1 40484 | _SHORT_Description 40486 |
| | | | | Installa-tionPoin-tAdress 40488 | | 0..1 40490 | Address 40492 |
| | | | | Installa-tionPoint-Formatte-dAdress 40494 | | 0..1 40496 | Format-tedAd-dress 40498 |
| TextCollection 40500 | | | TextCol-lection 40502 | | | 0..1 40504 | TextCol-lection 40506 |

FIG. 40-19

| Package | level1 | level2 | level3 | level4 | level5 | Cardinality | Datatype Name |
|---|---|---|---|---|---|---|---|
| AttachmentFolder 40508 | | | Attach-ment-Folder 40510 | | | 0..1 40512 | Attach-ment-Folder 40514 |
| SolutionProposal 40516 | | | Solution-Proposal 40518 | | | 0..n 40520 | FormCus-tomer-Transac-tion-DocumentSolution-Proposal 40522 |
| | | | | Customer Proble-mAndSo-lutionID 40524 | | 0..1 40526 | Knowl-edge-BaseArti-cleID 40528 |

FIG. 40-20

| Package | level1 | level2 | level3 | level4 | level5 | Cardinality | Datatype Name |
|---|---|---|---|---|---|---|---|
| | | | | CustomerProblemAndSolutionDescription 40530 | | 0..1 40532 | MEDIUM_Description 40534 |
| | | | | CustomerProblemAndSolutionValidityPeriod 40536 | | 0..1 40538 | UPPEROPEN_GLOBAL_DateTimePeriod 40540 |
| | | | | CustomerProblemAndSolutionSystemAdministrativeData 40542 | | 0..1 40544 | SystemAdministrativeData 40546 |

FIG. 40-21

| Package | level1 | level2 | level3 | level4 | level5 | Cardinality | Datatype Name |
|---|---|---|---|---|---|---|---|
| TextCollection 40548 | | | | TextCollection 40550 | | 0..1 40552 | TextCollection 40554 |

FIG. 41-1

| Package | level1 | level2 | level3 | level4 | level5 | level6 | Cardinality | Datatype Name |
|---|---|---|---|---|---|---|---|---|
| ServiceRequestMessage 41000 | ServiceRe-questMes-sage 41002 | | | | | | 1 41004 | ServiceRe questMes-sage 41006 |
| MessageHeader 41008 | | Message-Header 41010 | | | | | 0..1 41012 | Business-Docu-mentMes-sage-Header 41014 |
| | | | ID 41016 | | | | 1..1 41018 | Business-Docu-mentMes-sageID 41020 |
| | | | Referen-ceID 41022 | | | | 0..1 41024 | Business-Docu-mentMes-sageID 41026 |

FIG. 41-2

| Package | | level1 | level2 | level3 | level4 | level5 | level6 | Cardinality | Datatype Name |
|---|---|---|---|---|---|---|---|---|---|
| | | | | Creation-DateTime 41028 | | | | 1..1 41030 | DateTime 41032 |
| | | | | Sender-Party 41034 | | | | 0..1 41036 | Business-Docu-mentMes-sage-Header-Party 41038 |
| | | | | | InternalID 41040 | | | 0..1 41042 | |
| | | | | | Stan-dardID 41044 | | | 0..n 41046 | |
| | | | | | Contact-Person 41048 | | | 0..1 41050 | |
| | | | | | | InternalID 41052 | | 0..1 41054 | PartyInter-nalID 41056 |

FIG. 41-3

| Package | level1 | level2 | level3 | level4 | level5 | level6 | Cardinality | Datatype Name |
|---|---|---|---|---|---|---|---|---|
| | | | | | | SchemeID 41058 | 1 41060 | |
| | | | | | | Sche-meAgency ID 41062 | 1 41064 | |
| | | | Recipi-entParty 41066 | | | | 0..n 41068 | Business-Docu-mentMes-sage-Header-Party 41070 |
| | | | | InternalID 41072 | | | 0..1 41074 | |
| | | | | Stan-dardID 41076 | | | 0..n 41078 | |
| | | | | Contact-Person 41080 | | | 0..1 41082 | |

FIG. 41-4

| Package | level1 | level2 | level3 | level4 | level5 | level6 | Cardinality | Datatype Name |
|---|---|---|---|---|---|---|---|---|
| | | | | | InternalID 41084 | | 0..1 41086 | PartyInternalID 41088 |
| ServiceRequest 41090 | | ServiceRequest 41092 | | | | | 1 41094 | ServiceRequest 41096 |
| | | | ID 41098 | | | | 1 41100 | BusinessTransactionDocumentID 41102 |
| | | | SellerID 41104 | | | | 0..1 41106 | BusinessTransactionDocumentID 41108 |
| | | | ServicePriorityCode 41110 | | | | 0..1 41112 | BusinessTransactionPriorityCode 41114 |

FIG. 41-5

| Package | | | | level1 | level2 | level3 | level4 | level5 | level6 | Cardinality | Datatype Name |
|---|---|---|---|---|---|---|---|---|---|---|---|
| | | | | | | Action-Code 41116 | | | | 0..1 41118 | Action-Code 41120 |
| | | | | | | Solution-Status-Code 41122 | | | | 0..1 41124 | Solution-Proposal-Status-Code 41126 |
| | | | | | | FinishIndi-cator 41128 | | | | 0..1 41130 | Indicator 41132 |
| | | | | | | Reques-tAssign-ment-Status-Code 41134 | | | | 0..1 41136 | Reques-tAssign-ment-Status-Code 41138 |
| | | | | | | Buyer-DateTime 41140 | | | | 0..1 41142 | GLOBAL_ DateTime 41144 |

FIG. 41-6

| Package | | | | level1 | level2 | level3 | level4 | level5 | level6 | Cardinality | Datatype Name |
|---|---|---|---|---|---|---|---|---|---|---|---|
| | | | | | | Name 41146 | | | | 0..1 41148 | Name 41150 |
| | | Party 41152 | | | | Buyer-Party 41154 | | | | 0..1 41156 | Business-Transaction-DocumentParty 41158 |
| | | | | | | | InternalID 41160 | | | 0..1 41162 | PartyInternalID 41164 |
| | | | | | | | Stan-dardID 41166 | | | 0..n 41168 | PartyStan-dardID 41170 |
| | | | | | | | BuyerID 41172 | | | 0..1 41174 | Party-PartyID 41176 |

FIG. 41-7

| Package | | | | level1 | level2 | level3 | level4 | level5 | level6 | Cardinality | Datatype Name |
|---|---|---|---|---|---|---|---|---|---|---|---|
| | | | | | | | SellerID 41178 | | | 0..1 41180 | Party-PartyID 41182 |
| | | | | | | | Address 41184 | | | 0..1 41186 | Address 41188 |
| | | | | | | | Contact-Person 41190 | | | 0..1 41192 | Contact-Person 41194 |
| | | | | | | | | InternalID 41196 | | 0..1 41198 | PartyInter-nalID 41200 |
| | | | | | | | | BuyerID 41202 | | 0..1 41204 | Party-PartyID 41206 |
| | | | | | | | | SellerID 41208 | | 0..1 41210 | Party-PartyID 41212 |
| | | | | | | | | Address 41214 | | 0..1 41216 | Address 41218 |

FIG. 41-8

| Package | | | | level1 | level2 | level3 | level4 | level5 | level6 | Cardinality | Datatype Name |
|---|---|---|---|---|---|---|---|---|---|---|---|
| | | | | | | Produc-tRecipi-entParty 41220 | | | | 0..1 41222 | Business-Transac-tionDocu-mentParty 41224 |
| | | | | | | | InternalID 41226 | | | 0..1 41228 | PartyInter-nalID 41230 |
| | | | | | | | Stan-dardID 41232 | | | 0..n 41234 | Par-tyStandard ID 41236 |
| | | | | | | | BuyerID 41238 | | | 0..1 41240 | Party-PartyID 41242 |
| | | | | | | | SellerID 41244 | | | 0..1 41246 | Party-PartyID 41248 |
| | | | | | | | Address 41250 | | | 0..1 41252 | Address 41254 |

FIG. 41-9

| Package | | | | level1 | level2 | level3 | level4 | level5 | level6 | Cardinality | Datatype Name |
|---|---|---|---|---|---|---|---|---|---|---|---|
| | | | | | | | Contact-Person 41256 | | | 0..1 41258 | Contact-Person 41260 |
| | | | | | | | | InternalID 41262 | | 0..1 41264 | PartyInter-nalID 41266 |
| | | | | | | | | BuyerID 41268 | | 0..1 41270 | Party-PartyID 41272 |
| | | | | | | | | SellerID 41274 | | 0..1 41276 | Party-PartyID 41278 |
| | | | | | | | | Address 41280 | | 0..1 41282 | Address 41284 |
| | | | | | | Seller-Party 41286 | | | | 0…1 41288 | Business-Transac-tionDocu-mentParty 41290 |

FIG. 41-10

| Package | | | | level1 | level2 | level3 | level4 | level5 | level6 | Cardinality | Datatype Name |
|---|---|---|---|---|---|---|---|---|---|---|---|
| | | | | | | | InternalID 41292 | | | 0…1 41294 | PartyInter-nalID 41296 |
| | | | | | | | Stan-dardID 41298 | | | 0..1 41300 | Par-tyStandard ID 41302 |
| | | | | | | | BuyerID 41304 | | | 0..1 41306 | Party-PartyID 41308 |
| | | | | | | | SellerID 41310 | | | 0..1 41312 | Party-PartyID 41314 |
| | | | | | | | Address 41316 | | | 0..1 41318 | Address 41320 |
| | | | | | | | Contact-Person 41322 | | | 0..1 41324 | Contact-Person 41326 |

FIG. 41-11

| Package | | | | level1 | level2 | level3 | level4 | level5 | level6 | Cardinality | Datatype Name |
|---|---|---|---|---|---|---|---|---|---|---|---|
| | | | | | | | | InternalID 41328 | | 0..1 41330 | PartyInter-nalID 41332 |
| | | | | | | | | BuyerID 41334 | | 0..1 41336 | Party-PartyID 41338 |
| | | | | | | | | SellerID 41340 | | 0..1 41342 | Party-PartyID 41344 |
| | | | | | | | | Address 41346 | | 0..1 41348 | Address 41350 |
| | | TextCol-lection 41352 | | | | TextCol-lection 41354 | | | | 1 41356 | TextCol-lection 41358 |
| | | Attach-ment-Folder 41360 | | | | Attach-ment-Folder 41362 | | | | 0..1 41364 | Attach-ment-Folder 41366 |

FIG. 41-12

| Package | | | level1 | level2 | level3 | level4 | level5 | level6 | Cardinality | Datatype Name |
|---|---|---|---|---|---|---|---|---|---|---|
| | | Solution-Proposal 41368 | | | Solution-Proposal 41370 | | | | 0..n 41372 | ServiceRequestSolution 41374 |
| | | | | | | ExternalKnowledgeBaseArticleID 41376 | | | 1 41378 | KnowledgeBaseArticleID 41380 |
| | | | | | | ExternalKnowledgeBaseArticleDescription 41382 | | | 0..1 41384 | MEDIUM_Description 41386 |
| | | | | | | ExternalKnowledgeBaseCode 41388 | | | 1 41390 | ExternalKnowledgeBaseCode 41392 |

| Package | level1 | level2 | level3 | level4 | Cardinality | Datatype Name |
|---|---|---|---|---|---|---|
| FormDunningNotification 46000 | FormDunningNotification 46002 | | | | | FormDunningMessage 46004 |
| MessageHeader 46006 | | MessageHeader 46008 | | | 1 46010 | BusinessDocumentMessageHeader 46012 |
| | | | ID 46014 | | 1 46016 | BusinessDocumentMessageID 46018 |
| | | | CreationDateTime 46020 | | 1 46022 | DateTime 46024 |
| | | | SenderParty 46026 | | 0..1 46028 | BusinessDocumentMessageHeaderParty 46030 |
| | | | ReceiverParty 46032 | | 0..1 46034 | BusinessDocumentMessageHeaderParty 46036 |

FIG. 46-2

| Package | level1 | level2 | level3 | level4 | Cardinality | Datatype Name |
|---|---|---|---|---|---|---|
| Dunning 46038 | | Dunning 46040 | | | 1 46042 | FormDunning 46044 |
| | | | CompanyFormattedAddress 46046 | | 1 46048 | FormattedAddress 46050 |
| | | | BusinessPartnerFormattedAddress 46052 | | 1 46054 | FormattedAddress 46056 |
| | | | DocumentDate 46058 | | 1 46060 | Date 46062 |
| | | | BusinessPartnerInternalID 46064 | | 1 46066 | BusinessPartnerInternalID 46068 |
| DunningItem 46070 | | | DunningItem 46072 | | 1..n 46074 | FormDunningItem 46076 |

FIG. 46-3

| Package | level1 | level2 | level3 | level4 | Cardinality | Datatype Name |
|---|---|---|---|---|---|---|
| | | | | BaseBusiness-Transaction-Documen-tReference 46078 | 1 46080 | BusinessTrans-actionDocumen-tReference 46082 |
| | | | | BaseBusiness-Transaction-DocumentDate 46084 | 1 46086 | Date 46088 |
| | | | | DueItemType-Code 46090 | 1 46092 | TradeReceiv-ablesPayables-RegisterItem-TypeCode 46094 |
| | | | | DunningLevel-Value 46096 | 1 46098 | DunningLevel-Value 46100 |
| | | | | BaseBusiness-Transaction-DocumentA-mount 46102 | 1 46104 | Amount 46106 |

FIG. 46-4

| Package | level1 | level2 | level3 | level4 | Cardinality | Datatype Name |
|---|---|---|---|---|---|---|
| | | | | OpenItemAmount 46108 | 1 46110 | Amount 46112 |
| | | | | DunningNoticeLegallyEffectiveIndicator 46114 | 1 46116 | Indicator 46118 |
| | | | | DueDate 46120 | 1 46122 | Date 46124 |
| | | | | DaysOverdueTotalNumberValue 46126 | 1 46128 | TotalNumberValue 46130 |

| Package | level1 | level2 | level3 | level4 | level5 | Cardinality | Datatype Name |
|---|---|---|---|---|---|---|---|
| FormTradeReceivables PayablesAccountStatementNotification 50000 | FormTrad-eReceiv-ables Payable-sAccount-State-mentNotifi-cation 50002 | | | | | | FormTrade-Receivable-sPayable-sAccount-Statement-Message 50004 |
| MessageHeader 50006 | | Message Header 50008 | | | | 1 50010 | Business-Document-Message-Header 50012 |
| TradeReceivablesPayables AccountStatement 50014 | | Trade-Receiv-ablesPay ables Account-State-ment 50016 | | | | 1 50018 | FormTrade-Receivable-sPayable-sAccount-Statement 50020 |

FIG. 50-2

| Package | level1 | level2 | level3 | level4 | level5 | Cardinality | Datatype Name |
|---|---|---|---|---|---|---|---|
| | | | CompanyID 50022 | | | 0..1 50024 | OrganisationalCentreID 50026 |
| | | | CompanyFormattedAddress 50028 | | | 0..1 50030 | FormattedAddress 50032 |
| | | | CompanyContactPersonPartyID 50034 | | | 0..1 50036 | ContactPersonPartyId 50038 |
| | | | CompanyContactPersonFormattedAddress 50040 | | | 0..1 50042 | FormattedAddress 50044 |

FIG. 50-3

| Package | level1 | level2 | level3 | level4 | level5 | Cardinality | Datatype Name |
|---|---|---|---|---|---|---|---|
| | | | Com-panyCon-tactPer-sonE-mailURI 50046 | | | 0..1 50048 | EmailURI 50050 |
| | | | Business-Partner-InternalID 50052 | | | 0..1 50054 | Business-PartnerInter-nalID 50056 |
| | | | Business-Partner-Formatte-dAddress 50058 | | | 0..1 50060 | Formatte-dAddress 50062 |
| | | | Report-ingDate-Period 50064 | | | 0..1 50066 | DatePeriod 50068 |
| | | | KeyDate 50070 | | | 0..1 50072 | Date 50074 |

FIG. 50-4

| Package | | | | level1 | level2 | level3 | level4 | level5 | Cardinality | Datatype Name |
|---|---|---|---|---|---|---|---|---|---|---|
| | | | | | | ReturnLetter-DueDate 50076 | | | 0..1 50078 | Date 50080 |
| | | | | | | DocumentDate 50082 | | | 0..1 50084 | Date 50086 |
| | | | | | | ReturnLetterBusinessPartnerInternalID 50088 | | | 0..1 50090 | BusinessPartnerInternalID 50092 |
| | | | | | | ReturnLetterBusinessPartnerFormattedAddress 50094 | | | 0..1 50096 | FormattedAddress 50098 |

FIG. 50-5

| Package | level1 | level2 | level3 | level4 | level5 | Cardinality | Datatype Name |
|---|---|---|---|---|---|---|---|
| | | | TradeReceivablesPayablesAccountBalanceConfirmationProcedureCode 50100 | | | 1 50102 | TradeReceivablesPayablesAccountBalanceConfirmationProcedureCode 50104 |
| | | | TradeReceivablesPayablesAccountBalanceConfirmationProcedureName 50106 | | | 0..1 50108 | Name 50110 |

FIG. 50-6

| Package | level1 | level2 | level3 | level4 | level5 | Cardinality | Datatype Name |
|---|---|---|---|---|---|---|---|
| StartEndBalancePerCurrency 50112 | | | StartEndBalancePerCurrency 50114 | | | 0..n 50116 | FormTradeReceivablesPayablesAccountStatementStartEndBalancePerCurrency 50118 |
| | | | | TransactionCurrencyCode 50120 | | 1 50122 | CurrencyCode 50124 |
| | | | | StartTransactionCurrencyAmount 50126 | | 0..1 50128 | Amount 50130 |
| | | | | EndTransactionCurrency Amount 50132 | | 0..1 50134 | Amount 50136 |

FIG. 50-7

| Package | level1 | level2 | level3 | level4 | level5 | Cardinality | Datatype Name |
|---|---|---|---|---|---|---|---|
| Item 50138 | | | | Item 50140 | | 0..n 50142 | FormTradeReceivable-sPayable-sAccount-Statement-StartEndBal-ancePerCur-rencyItem 50144 |
| | | | | | Base-Business-Transac-tion-Documen-tRefer-ence 50146 | 1 50148 | Business-Transaction-Documen-tReference 50150 |

FIG. 50-8

| Package | level1 | level2 | level3 | level4 | level5 | Cardinality | Datatype Name |
|---|---|---|---|---|---|---|---|
| | | | | | Base-Business-Transaction-DocumentReferenceTypeCode-Name 50152 | 0..1 50154 | Name 50156 |
| | | | | | Partner-Base-Business-Transaction-DocumentReference 50158 | 0..1 50160 | Business-Transaction-DocumentReference 50162 |

FIG. 50-9

| Package | level1 | level2 | level3 | level4 | level5 | Cardinality | Datatype Name |
|---|---|---|---|---|---|---|---|
| | | | | | OriginInvoice-Business-Transaction-DocumentReference 50164 | 0..1 50166 | Business-Transaction-DocumentReference 50168 |
| | | | | | OriginOrderBusiness-Transaction-DocumentReference\ 50170 | 0..1 50172 | Business-Transaction-DocumentReference 50174 |

FIG. 50-10

| Package | level1 | level2 | level3 | level4 | level5 | Cardinality | Datatype Name |
|---|---|---|---|---|---|---|---|
| | | | | | OriginContractBusiness-Transaction-Document-tReference 50176 | 0..1 50178 | Business-Transaction-Document-tReference 50180 |
| | | | | | Base-Business-TransactionDocumentDate 50182 | 1 50184 | Date 50186 |

FIG. 50-11

| Package | level1 | level2 | level3 | level4 | level5 | Cardinality | Datatype Name |
|---|---|---|---|---|---|---|---|
| | | | | | TradeReceivablesPayablesRegisterItemClearingStatusCodeName 50188 | 1 50190 | Name 50192 |
| | | | | | TradeReceivablesPayablesRegisterItemClearingStatusCode 50194 | 1 50196 | ClearingStatusCode 50198 |

FIG. 50-12

| Package | level1 | level2 | level3 | level4 | level5 | Cardinality | Datatype Name |
|---|---|---|---|---|---|---|---|
| | | | | | TradeReceivablesPayablesRegisterItemTypeCodeName 50200 | 0..1 50202 | Name 50204 |
| | | | | | TradeReceivablesPayablesRegisterItemTypeCode 50206 | 1 50208 | TradeReceivablesPayablesRegisterItemTypeCode 50210 |
| | | | | | DunningLevelValue 50212 | 0..1 50214 | DunningLevel Value 50216 |
| | | | | | LastDunningDate 50218 | 0..1 50220 | Date 50222 |

FIG. 50-13

| Package | level1 | level2 | level3 | level4 | level5 | Cardinality | Datatype Name |
|---|---|---|---|---|---|---|---|
| | | | | | FullPayment-End-Date 50224 | 0..1 50226 | Date 50228 |
| | | | | | CashDiscount-Terms 50230 | 0..1 50232 | CashDiscountTerms 50234 |
| | | | | | TransactionCurrency-Code 50236 | 1 50238 | Currency-Code 50240 |
| | | | | | TransactionCurrencyAmount 50242 | 1 50244 | Amount 50246 |

FIG. 50-14

| Package | | | | level1 | level2 | level3 | level4 | level5 | Cardinality | Datatype Name |
|---|---|---|---|---|---|---|---|---|---|---|
| | | | | | | | | TransactionCurrencyOpenAmount 50248 | 1 50250 | Amount 50252 |
| | | | | | | | | TransactionCurrency-CashDiscoutAmount 50254 | 0..1 50256 | Amount 50258 |
| | | | | | | | | TransactionCurrencyDeductionAmount 50260 | 0..1 50262 | Amount 50264 |

| Package | level1 | level2 | level3 | level4 | level5 | level6 | Cardinality | Datatype Name |
|---|---|---|---|---|---|---|---|---|
| Receivable-sPayablesNotifi-cation 53000 | Receiv-ablesPay-ablesNotifi-cation 53001 | | | | | | | ReceivablesPay-ablesNotification 53002 |
| Message-Header 53003 | | Message Header 53004 | | | | | 1 53005 | BusinessDocu-mentMessage-Header 53006 |
| | | | ID 53007 | | | | 1 53008 | BusinessDocu-mentMessageID 53009 |
| | | | ReferenceID 53010 | | | | 0..1 53011 | BusinessDocu-mentMessageID 53012 |
| | | | Creation-DateTime 53013 | | | | 1 53014 | DateTime 53015 |

FIG. 53-2

| Package | level1 | level2 | level3 | level4 | level5 | level6 | Cardinality | Datatype Name |
|---|---|---|---|---|---|---|---|---|
| Receivable-sPayables 53016 | | Receiv-ablesPay ables 53017 | | | | | 1 53018 | ReceivablesPay-ablesDocument 53019 |
| | | | BaseBusi-nessTransac-tion Documen-tReference 53020 | | | | 1 53021 | BusinessTransac-tionDocumen-tReference 53022 |
| | | | Cancelled-Business-Transaction Documen-tReference 53023 | | | | 1 53024 | BusinessTransac-tionDocumen-tReference 53025 |
| | | | BaseBusi-nessTransac-tionDocument-Date 53026 | | | | 0..1 53027 | Date;Quali-fier:Document 53028 |

FIG. 53-3

| Package | level1 | level2 | level3 | level4 | level5 | level6 | Cardinality | Datatype Name |
|---|---|---|---|---|---|---|---|---|
| | | | BaseBusinessTransactionDocumentReceiptDate 53029 | | | | 0..1 53030 | Date;Qualifier:BaseBusiness Transaction-DocumentReceipt 53031 |
| | | | Accounting-Transaction-Date 53032 | | | | 0..1 53033 | Date;Qualifier:Transaction 53034 |
| | | | CompanyID 53035 | | | | 1 53036 | Organisational-CentreID 53037 |
| Party 53038 | | | DebtorParty 53039 | | | | 0..1 53040 | BusinessTransactionDocument-Party 53041 |
| | | | | InternalID 53042 | | | 1 53043 | PartyInternalID 53044 |
| | | | | TaxID 53045 | | | 0..1 53046 | PartyTaxID 53047 |

FIG. 53-4

| Package | level1 | level2 | level3 | level4 | level5 | level6 | Cardinality | Datatype Name |
|---|---|---|---|---|---|---|---|---|
| | | | CreditorParty 53048 | | | | 0..1 53049 | BusinessTransactionDocumentParty 53050 |
| | | | | InternalID 53051 | | | 1 53052 | PartyInternalID 53053 |
| BusinessTransactionDocumentReference 53054 | | | PartnerBaseBusinessTransactionDocumentReference 53055 | | | | 0..1 53056 | BusinessTransactionDocumentReference 53057 |
| | | | OriginInvoiceBusinessTransactionDocumentReference 53058 | | | | 0..1 53059 | BusinessTransactionDocumentReference 53060 |

FIG. 53-5

| Package | level1 | level2 | level3 | level4 | level5 | level6 | Cardinality | Datatype Name |
|---|---|---|---|---|---|---|---|---|
| | | | OriginOrder-Business-Transaction-Documen-tReference 53061 | | | | 0..1 53062 | BusinessTransac-tionDocumen-tReference 53063 |
| | | | OriginCon-tractBusiness-Transaction-Documen-tReference 53064 | | | | 0..1 53065 | BusinessTransac-tionDocumen-tReference 53066 |
| Item 53067 | | TaxRe-ceivable-sPay-ables-Register-Item 53068 | | | | | 0..1 53069 | |
| SplitItem 53070 | | | Pro-ductTaxSplit-Item 53071 | | | | 0..n 53072 | TaxDueItem 53073 |

FIG. 53-6

| Package | level1 | level2 | level3 | level4 | level5 | level6 | Cardinality | Datatype Name |
|---|---|---|---|---|---|---|---|---|
| | | | | BaseBusiness-Transaction DocumentItem-Type-Code 53074 | | | 0..1 53075 | BusinessTransactionDocumentItemTypeCode 53076 |
| | | | | Type-Code 53077 | | | 0..1 53078 | TaxReceivablesPayablesRegisterItemSplitItem-TypeCode 53079 |
| | | | | DeliveryDate 53080 | | | 0..1 53081 | Date;Qualifier:Delivery 53082 |
| | | | | TaxDueDate 53083 | | | 0..1 53084 | Date;Qualifier:Due 53085 |

FIG. 53-7

| Package | level1 | level2 | level3 | level4 | level5 | level6 | Cardinality | Datatype Name |
|---|---|---|---|---|---|---|---|---|
| | | | | CashDiscountDeductibleIndicator 53086 | | | 1 53087 | CashDiscountDeductibleIndicator 53088 |
| | | | | ProductTax 53089 | | | 1 53090 | ProductTax 53091 |
| | | | | | CountryCode 53092 | | 1 53093 | CountryCode 53094 |
| | | | | | RegionCode 53095 | | 0..1 53096 | RegionCode 53097 |
| | | | | | JurisdictionCode 53098 | | 0..1 53099 | TaxJurisdictionCode 53100 |
| | | | | | EventTypeCode 53101 | | 1 53102 | ProductTaxEventTypeCode 53103 |

FIG. 53-8

| Package | level1 | level2 | level3 | level4 | level5 | level6 | Cardinality | Datatype Name |
|---|---|---|---|---|---|---|---|---|
| | | | | | Type-Code 53104 | | 1 53105 | TaxTypeCode 53106 |
| | | | | | RateTypeCode 53107 | | 1 53108 | TaxRateType-Code 53109 |
| | | | | | Currency Code 53110 | | 0..1 53111 | CurrencyCode 53112 |
| | | | | | BaseA-mount 53113 | | 0..1 53114 | Amount 53115 |
| | | | | | Percent 53116 | | 0..1 53117 | Percent 53118 |
| | | | | | Base-Quantity 53119 | | 0..1 53120 | Quantity 53121 |
| | | | | | Rate 53122 | | 0..1 53123 | Rate 53124 |

FIG. 53-9

| Package | level1 | level2 | level3 | level4 | level5 | level6 | Cardinality | Datatype Name |
|---|---|---|---|---|---|---|---|---|
| | | | | | Amount 53125 | | 1 53126 | Amount 53127 |
| | | | | | Inter-nalAmount 53128 | | 0..1 53129 | Amount 53130 |
| | | | | | NonDe-ductible-Percent 53131 | | 0..1 53132 | Percent 53133 |
| | | | | | NonDe-ductibleAmount 53134 | | 0..1 53135 | Amount 53136 |
| | | | | | Deducti-bility-Code 53137 | | 0..1 53138 | TaxDeductibility-Code 53139 |

FIG. 53-10

| Package | level1 | level2 | level3 | level4 | level5 | level6 | Cardinality | Datatype Name |
|---|---|---|---|---|---|---|---|---|
| | | | | | BusinessTransactionDocumentItemGroupID 53140 | | 0..1 53141 | BusinessTransaction… 53142 |
| | | | | | EuropeanCommunityVATTriangulationIndicator 53143 | | 0..1 53144 | EuropeanCommunityVATTriangulationIndicator 53145 |
| | | | | | DueCategoryCode 53146 | | 1 53147 | DueCategoryCode 53148 |

FIG. 53-11

| Package | level1 | level2 | level3 | level4 | level5 | level6 | Cardinality | Datatype Name |
|---|---|---|---|---|---|---|---|---|
| | | | | | Deferred-Indicator 53149 | | 0..1 53150 | DeferredIndicator 53151 |
| | | | | | Exemp-tion 53152 | | 0..1 53153 | TaxExemption 53154 |
| | | | | | | Certifi-cateID 53155 | 1 53156 | TaxExemption-CertificateID 53157 |
| | | | | | | Internal-Certifi-cateID 53158 | 0..1 53159 | TaxExemption-CertificateID 53160 |
| | | | | | | Valid-ityPeriod 53161 | 0..1 53162 | DatePeriod 53163 |
| | | | | | | Percent-age 53164 | 0..1 53165 | Percent 53166 |
| | | | | | | Amount 53167 | 0..1 53168 | Amount 53169 |

FIG. 53-12

| Package | level1 | level2 | level3 | level4 | level5 | level6 | Cardinality | Datatype Name |
|---|---|---|---|---|---|---|---|---|
| | | | | | | ReasonCode 53170 | 0..1 53171 | TaxExemptionReasonCode 53172 |
| | | | | | LegallyRequiredPhrase 53173 | | 0..1 53174 | Text 53175 |
| | | | | | ExchangeRate 53176 | | 0..1 53177 | ExchangeRate 53178 |
| | | | | TransactionCurrencyProductTax 53179 | | | 0..1 53180 | ProductTax 53181 |
| | | | | | CountryCode 53182 | | 1 53183 | CountryCode 53184 |

FIG. 53-13

| Package | level1 | level2 | level3 | level4 | level5 | level6 | Cardinality | Datatype Name |
|---|---|---|---|---|---|---|---|---|
| | | | | | Region-Code 53185 | | 0..1 53186 | RegionCode 53187 |
| | | | | | Jurisdic-tionCode 53188 | | 0..1 53189 | TaxJurisdiction-Code 53190 |
| | | | | | Event-Type-Code 53191 | | 1 53192 | ProductTaxEvent-TypeCode 53193 |
| | | | | | Type-Code 53194 | | 1 53195 | TaxTypeCode 53196 |
| | | | | | RateTyp eCode 53197 | | 1 53198 | TaxRateType-Code 53199 |
| | | | | | BaseA-mount 53200 | | 0..1 53201 | Amount 53202 |
| | | | | | Percent 53203 | | 0..1 53204 | Percent 53205 |

FIG. 53-14

| Package | level1 | level2 | level3 | level4 | level5 | level6 | Cardinality | Datatype Name |
|---|---|---|---|---|---|---|---|---|
| | | | | | Base-Quantity 53206 | | 0..1 53207 | Quantity 53208 |
| | | | | | Rate 53209 | | 0..1 53210 | Rate 53211 |
| | | | | | Amount 53212 | | 1 53213 | Amount 53214 |
| | | | | | Inter-nalAmount 53215 | | 0..1 53216 | Amount 53217 |
| | | | | | NonDe-ductible-Percent 53218 | | 0..1 53219 | Percent 53220 |
| | | | | | NonDe-ductibleAmount 53221 | | 0..1 53222 | Amount 53223 |

FIG. 53-15

| Package | level1 | level2 | level3 | level4 | level5 | level6 | Cardinality | Datatype Name |
|---|---|---|---|---|---|---|---|---|
| | | | | | Deducti-bility-Code 53224 | | 0..1 53225 | TaxDeductibility-Code 53226 |
| | | | | | BusinessTransac-tionDocu-mentItemGroupID 53227 | | 0..1 53228 | BusinessTransac-tion… 53229 |
| | | | | | Euro-pean-Commu-nityVAT-Triangu-lationIn-dicator 53230 | | 0..1 53231 | EuropeanCom-munityVATTrian-gulationIndicator 53232 |

FIG. 53-16

| Package | level1 | level2 | level3 | level4 | level5 | level6 | Cardinality | Datatype Name |
|---|---|---|---|---|---|---|---|---|
| | | | | | DueCategoryCode 53233 | | 1 53234 | DueCategoryCode 53235 |
| | | | | | DeferredIndicator 53236 | | 0..1 53237 | DeferredIndicator 53238 |
| | | | | | Exemption 53239 | | 0..1 53240 | TaxExemption 53241 |
| | | | | | | CertificateID 53242 | 1 53243 | TaxExemptionCertificateID 53244 |
| | | | | | | InternalCertificateID 53245 | 0..1 53246 | TaxExemptionCertificateID 53247 |
| | | | | | | ValidityPeriod 53248 | 0..1 53249 | DatePeriod 53250 |

FIG. 53-17

| Package | level1 | level2 | level3 | level4 | level5 | level6 | Cardinality | Datatype Name |
|---|---|---|---|---|---|---|---|---|
| | | | | | | Percent-age 53251 | 0..1 53252 | Percent 53253 |
| | | | | | | Amount 53254 | 0..1 53255 | Amount 53256 |
| | | | | | | Reason-Code 53257 | 0..1 53258 | TaxExemption-ReasonCode 53259 |
| | | | | | Legal-lyRe-quired-Phrase 53260 | | 0..1 53261 | Text 53262 |
| | | | | | Ex-changeR ate 53263 | | 0..1 53264 | ExchangeRate 53265 |
| | | | Withholding-TaxSplitItem 53266 | | | | 0..n 53267 | TaxDueItem 53268 |

FIG. 53-18

| Package | level1 | level2 | level3 | level4 | level5 | level6 | Cardinality | Datatype Name |
|---|---|---|---|---|---|---|---|---|
| | | | | BaseBusiness-Transaction DocumentItem-Type-Code 53269 | | | 0..1 53270 | BusinessTransactionDocumentItemTypeCode 53271 |
| | | | | Type-Code 53272 | | | 0..1 53273 | TaxReceivablesPayablesRegisterItemSplitItem-TypeCode 53274 |
| | | | | TaxDueDate 53275 | | | 0..1 53276 | Date;Qualifier:Due 53277 |
| | | | | CashDiscountDeductibleIndicator 53278 | | | 1 53279 | CashDiscountDeductibleIndicator 53280 |

FIG. 53-19

| Package | level1 | level2 | level3 | level4 | level5 | level6 | Cardinality | Datatype Name |
|---|---|---|---|---|---|---|---|---|
| | | | | Withhold-ingTax 53281 | | | 1 53282 | WithholdingTax 53283 |
| | | | | | Country-Code 53284 | | 1 53285 | CountryCode 53286 |
| | | | | | Region-Code 53287 | | 0..1 53288 | RegionCode 53289 |
| | | | | | Event-Type-Code 53290 | | 1 53291 | Withholding-TaxEventType-Code 53292 |
| | | | | | Type-Code 53293 | | 1 53294 | TaxTypeCode 53295 |
| | | | | | RateTypeCode 53296 | | 1 53297 | TaxRateType-Code 53298 |

FIG. 53-20

| Package | level1 | level2 | level3 | level4 | level5 | level6 | Cardinality | Datatype Name |
|---|---|---|---|---|---|---|---|---|
| | | | | | BaseAmount 53299 | | 1 53300 | Amount 53301 |
| | | | | | Percent 53302 | | 0..1 53303 | Percent 53304 |
| | | | | | Amount 53305 | | 0..1 53306 | Amount 53307 |
| | | | | | InternalAmount 53308 | | 0..1 53309 | Amount 53310 |
| | | | | | DeferredIndicator 53311 | | 0..1 53312 | Indicator 53313 |
| | | | | | Exemption 53314 | | 0..1 53315 | TaxExemption 53316 |
| | | | | | | CertificateID 53317 | 1 53318 | TaxExemptionCertificateID 53319 |

FIG. 53-21

| Package | level1 | level2 | level3 | level4 | level5 | level6 | Cardinality | Datatype Name |
|---|---|---|---|---|---|---|---|---|
| | | | | | | Internal-Certifi-cateID 53320 | 0..1 53321 | TaxExemption-CertificateID 53322 |
| | | | | | | Valid-ityPeriod 53323 | 0..1 53324 | DatePeriod 53325 |
| | | | | | | Percent-age 53326 | 0..1 53327 | Percent 53328 |
| | | | | | | Amount 53329 | 0..1 53330 | Amount 53331 |
| | | | | | | Reason-Code 53332 | 0..1 53333 | TaxExemption-ReasonCode 53334 |
| | | | | | Legal-lyRe-quired-Phrase 53335 | | 0..1 53336 | Text 53337 |

FIG. 53-22

| Package | level1 | level2 | level3 | level4 | level5 | level6 | Cardinality | Datatype Name |
|---|---|---|---|---|---|---|---|---|
| | | | | | Ex-changeRate 53338 | | 0..1 53339 | ExchangeRate 53340 |
| | | | | Transac-tionCur-rency-Withhold-ingTax 53341 | | | 0..1 53342 | WithholdingTax 53343 |
| | | | | | Country-Code 53344 | | 1 53345 | CountryCode 53346 |
| | | | | | Region-Code 53347 | | 0..1 53348 | RegionCode 53349 |
| | | | | | Event-Type-Code 53350 | | 1 53351 | Withholding-TaxEventType-Code 53352 |

FIG. 53-23

| Package | level1 | level2 | level3 | level4 | level5 | level6 | Cardinality | Datatype Name |
|---|---|---|---|---|---|---|---|---|
| | | | | | Type-Code 53353 | | 1 53354 | TaxTypeCode 53355 |
| | | | | | RateTypeCode 53356 | | 1 53357 | TaxRateType-Code 53358 |
| | | | | | BaseA-mount 53359 | | 1 53360 | Amount 53361 |
| | | | | | Percent 53362 | | 0..1 53363 | Percent 53364 |
| | | | | | Amount 53365 | | 0..1 53366 | Amount 53367 |
| | | | | | Inter-nalAmount 53368 | | 0..1 53369 | Amount 53370 |
| | | | | | Deferred-Indicator 53371 | | 0..1 53372 | Indicator 53373 |

FIG. 53-24

| Package | level1 | level2 | level3 | level4 | level5 | level6 | Cardinality | Datatype Name |
|---|---|---|---|---|---|---|---|---|
| | | | | | Exemp-tion 53374 | | 0..1 53375 | TaxExemption 53376 |
| | | | | | | Certifi-cateID 53377 | 1 53378 | TaxExemption-CertificateID 53379 |
| | | | | | | Internal-Certifi-cateID 53380 | 0..1 53381 | TaxExemption-CertificateID 53382 |
| | | | | | | Valid-ityPeriod 53383 | 0..1 53384 | DatePeriod 53385 |
| | | | | | | Percent-age 53386 | 0..1 53387 | Percent 53388 |
| | | | | | | Amount 53389 | 0..1 53390 | Amount 53391 |
| | | | | | | Reason-Code 53392 | 0..1 53393 | TaxExemption-ReasonCode 53394 |

FIG. 53-25

| Package | level1 | level2 | level3 | level4 | level5 | level6 | Cardinality | Datatype Name |
|---|---|---|---|---|---|---|---|---|
| | | | | | Legal-lyRe-quired-Phrase 53395 | | 0..1 53396 | Text 53397 |
| | | | | | Ex-changeR ate 53398 | | 0..1 53399 | ExchangeRate 53400 |
| | | Trade-Receiv-ablesPay ables-Register-Item 53401 | | | | | 0..1 53402 | |
| | | | TypeCode 53403 | | | | 0..1 53404 | TradeReceivable-sPayablesRegis-terItemTypeCode 53405 |

FIG. 53-26

| Package | level1 | level2 | level3 | level4 | level5 | level6 | Cardinality | Datatype Name |
|---|---|---|---|---|---|---|---|---|
| | | | Transaction-CurrencyCode 53406 | | | | 1 53407 | Currency-Code;,Qualifier:Transaction 53408 |
| | | | Transaction-CurrencyA-mount 53409 | | | | 1 53410 | Amount;Qualifier: TransactionCur-rency 53411 |
| | | | CashDis-countDe-ductibleGros-sAmount 53412 | | | | 0..1 53413 | Amount;Qualifier: Gross 53414 |
| | | | CashDis-countDe-ductibleNetA-mount 53415 | | | | 0..1 53416 | Amount;Qualifier: Net 53417 |
| Central-BankRe-port 53418 | | | CentralBank-ReportItem 53419 | | | | 0..n 53420 | CentralBankRe-portItem 53421 |

FIG. 53-27

| Package | level1 | level2 | level3 | level4 | level5 | level6 | Cardinality | Datatype Name |
|---|---|---|---|---|---|---|---|---|
| SplitItem 53422 | | | SplitItem 53423 | | | | 1..n 53424 | SplitItem 53425 |
| | | | | Transac-tionCur-rencyA-mount 53426 | | | 1 53427 | Amount;Qualifier: TransactionCur-rency 53428 |
| | | | | CashDis-count-Terms 53429 | | | 0..1 53430 | CashDiscount-Terms 53431 |
| | | | | CashDis-countLev el 53432 | | | 0..1 53433 | CashDis-countLevel 53434 |
| | | | | Payment-Control 53435 | | | 0..1 53436 | PaymentControl 53437 |

| Package | level1 | level2 | level3 | level4 | level5 | level6 | level7 | Cardinality | Datatype Name |
|---|---|---|---|---|---|---|---|---|---|
| AccountingDocumentReportMessage 57000 | FormAccountingDocumentReportMessage 57002 | | | | | | | | FormAccountingDocumentReportMessage 57004 |
| MessageHeader 57006 | | MessageHeader 57008 | | | | | | 1 57010 | BusinessDocumentMessageHeader 57012 |
| | | | ID 57014 | | | | | 1 57016 | BusinessDocumentMessageID 57018 |
| | | | CreationDateTime 57020 | | | | | 1 57022 | DateTime 57024 |

FIG. 57-2

| Package | level1 | level2 | level3 | level4 | level5 | level6 | level7 | Cardinality | Datatype Name |
|---|---|---|---|---|---|---|---|---|---|
| FormAccounting-DocumentReport 57026 | | FormAc-counting-Documen-tReport 57028 | | | | | | 1 57030 | FormAc-counting-Documen tReport 57032 |
| | | | Account-ingDocu-mentRe-portOut-putFor-matCode 57034 | | | | | 1 57036 | Account-ing-Documen tRe-portOut-putFor-matCode 57038 |
| | | | Com-panyID 57040 | | | | | 1 57042 | Organisa-tional-CentreID 57044 |
| | | | Organiza-tionName 57046 | | | | | 1 57048 | Organiza-tionName 57050 |

FIG. 57-3

| Package | level1 | level2 | level3 | level4 | level5 | level6 | level7 | Cardinality | Datatype Name |
|---|---|---|---|---|---|---|---|---|---|
| Selection 57052 | | | Selection 57054 | | | | | 0..1 57056 | FormAccountingDocumentReportSelections 57058 |
| | | | | SetOfBooksID 57060 | | | | 1 57062 | SetOfBooksID 57064 |
| | | | | ChartOfAccountsCode 57066 | | | | 0..1 57068 | ChartOfAccountsCode 57070 |
| | | | | CurrencyCode 57072 | | | | 0..1 57074 | CurrencyCode 57076 |
| | | | | FiscalYearID 57078 | | | | 1 57080 | FiscalYearID 57082 |

FIG. 57-4

| Package | level1 | level2 | level3 | level4 | level5 | level6 | level7 | Cardinality | Datatype Name |
|---|---|---|---|---|---|---|---|---|---|
| | | | | LowerBoundaryChartOfAccountsItemCode 57084 | | | | 0..1 57086 | ChartOfAccountsItemCode 57088 |
| | | | | UpperBoundaryChartOfAccountsItemCode 57090 | | | | 0..1 57092 | ChartOfAccountsItemCode 57094 |
| | | | | LowerBoundaryAccountingPeriodID 57096 | | | | 0..1 57098 | AccountingPeriodID 57100 |

FIG. 57-5

| Package | level1 | level2 | level3 | level4 | level5 | level6 | level7 | Cardinality | Datatype Name |
|---|---|---|---|---|---|---|---|---|---|
| | | | | Upper-Bound-aryAc-count-ingPerio-dID 57102 | | | | 0..1 57104 | Account-ingPerio-dID 57106 |
| | | | | Lower-Bound-aryPost-ingDate 57108 | | | | 0..1 57110 | Date 57112 |
| | | | | Upper-Bound-aryPost-ingDate 57114 | | | | 0..1 57116 | Date 57118 |
| | | | | Lower-Bound-aryAc-count-ingDocu-mentID 57120 | | | | 0..1 57122 | Account-ing-Documen tID 57124 |

FIG. 57-6

| Package | level1 | level2 | level3 | level4 | level5 | level6 | level7 | Cardinality | Datatype Name |
|---|---|---|---|---|---|---|---|---|---|
| | | | | Upper-Bound-aryAc-counting-DocumentID 57126 | | | | 0..1 57128 | Account-ing-DocumentID 57130 |
| | | | | Post-edUserAccountID 57132 | | | | 0..1 57134 | UserAc-countID 57136 |
| | | | | Post-edUser-Name 57138 | | | | 0..1 57140 | MEDIUM_Name 57142 |
| | | | | Accept-edUserAccountID 57144 | | | | 0..1 57146 | UserAc-countID 57148 |
| | | | | Accept-edUser-Name 57150 | | | | 0..1 57152 | MEDIUM_Name 57154 |

FIG. 57-7

| Package | level1 | level2 | level3 | level4 | level5 | level6 | level7 | Cardinality | Datatype Name |
|---|---|---|---|---|---|---|---|---|---|
| | | | | ReportTi-tle 57156 | | | | 0..1 57158 | Long_Not e 57160 |
| | | | | Start-Page-Counter-Value 57162 | | | | 0..1 57164 | Indicator 57166 |
| | | | | StartBusi-nessTran saction-Docu-ment-Number-Value 57168 | | | | 0..1 57170 | Number-Value 57172 |
| | | | | Carry-Forward-DebitTota lAmount 57174 | | | | 0..1 57176 | Amount 57178 |

FIG. 57-8

| Package | level1 | level2 | level3 | level4 | level5 | level6 | level7 | Cardinality | Datatype Name |
|---|---|---|---|---|---|---|---|---|---|
| | | | | CarryForwardCreditTotalAmount 57180 | | | | 0..1 57182 | Amount 57184 |
| Description 57186 | | | Description 57188 | | | | | 0..n 57190 | FormAccountingDocumentReportDescription 57192 |
| | | | | Description 57194 | | | | 1 57196 | LONG_Description 57198 |
| PeriodTotal 57200 | | | PeriodTotal 57202 | | | | | 0..n 57204 | FormAccountingPeriodTotal 57206 |

FIG. 57-9

| Package | level1 | level2 | level3 | level4 | level5 | level6 | level7 | Cardinality | Datatype Name |
|---|---|---|---|---|---|---|---|---|---|
| | | | | Accounting-PeriodID 57208 | | | | 1 57210 | AccountingPeriodID 57212 |
| | | | | BusinessTransactionDocumentGroupID 57214 | | | | 0..1 57216 | BusinessTransactionDocumentGroupID 57218 |
| | | | | LineItemCurrencyStartBalanceAmount 57220 | | | | 0..1 57222 | Amount 57224 |

FIG. 57-10

| Package | level1 | level2 | level3 | level4 | level5 | level6 | level7 | Cardinality | Datatype Name |
|---|---|---|---|---|---|---|---|---|---|
| | | | | LineItem Currency-DebitTotalAmount 57226 | | | | 0..1 57228 | Amount 57230 |
| | | | | LineItem Currency-CreditTo-ta-lAmount 57232 | | | | 0..1 57234 | Amount 57236 |
| | | | | LineItem Cur-rencyEnd BalanceA mount 57238 | | | | 0..1 57240 | Amount 57242 |

FIG. 57-11

| Package | level1 | level2 | level3 | level4 | level5 | level6 | level7 | Cardinality | Datatype Name |
|---|---|---|---|---|---|---|---|---|---|
| | | | | LocalCurrencyStartBalanceAmount 57244 | | | | 1 57246 | Amount 57248 |
| | | | | LocalCurrencyDebitTotalAmount 57250 | | | | 1 57252 | Amount 57254 |
| | | | | LocalCurrencyCreditTotalAmount 57256 | | | | 1 57258 | Amount 57260 |

FIG. 57-12

| Package | level1 | level2 | level3 | level4 | level5 | level6 | level7 | Cardinality | Datatype Name |
|---|---|---|---|---|---|---|---|---|---|
| | | | | LocalCurrencyEndtBalanceAmount 57262 | | | | 1 57264 | Percent 57266 |
| | | | | EndBusinessTransactionDocumentNumberValue 57268 | | | | 0..1 57270 | NumberValue 57272 |
| | | | | CarryForwardDebitTotalAmount 57274 | | | | 0..1 57276 | NumberValue 57278 |

FIG. 57-13

| Package | level1 | level2 | level3 | level4 | level5 | level6 | level7 | Cardinality | Datatype Name |
|---|---|---|---|---|---|---|---|---|---|
| | | | | Carry-Forward-CreditTotalAmount 57280 | | | | 0..1 57282 | Amount 57284 |
| PeriodTotalItem 57286 | | | | PeriodTotalItem 57288 | | | | 0..n 57290 | FormAccountingPeriodItems 57292 |
| | | | | | AccountingDocumentID 57294 | | | 1 57296 | BusinessTransactionDocumentID 57298 |
| | | | | | PartnerOriginalEntryDocumentID 57300 | | | 0..1 57302 | PartnerOriginalEntryDocumentID 57304 |

FIG. 57-14

| Package | level1 | level2 | level3 | level4 | level5 | level6 | level7 | Cardinality | Datatype Name |
|---|---|---|---|---|---|---|---|---|---|
| | | | | | InvoiceLe-gallyRe-quiredID 57306 | | | 0..1 57308 | InvoiceLe gallyRe-quiredID 57310 |
| | | | | | Business-Transac-tionDocu-ment-Number-Value 57312 | | | 0..1 57314 | Number-Value 57316 |
| | | | | | Account-ingDocu-mentPost-ingDate 57318 | | | 1 57320 | Date 57322 |

FIG. 57-15

| Package | level1 | level2 | level3 | level4 | level5 | level6 | level7 | Cardinality | Datatype Name |
|---|---|---|---|---|---|---|---|---|---|
| | | | | | Account-ingBusi-ness-Transac-tionType-Code 57324 | | | 1 57326 | Account-ingBusi-ness-Transac-tion-TypeCod e 57328 |
| | | | | | Account-ingDocu-ment-TypeCode 57330 | | | 1 57332 | Account-ing-Documen tType-Code 57334 |
| | | | | | Ex-changeR-ate 57336 | | | 0..1 57338 | Ex-changeR ate 57340 |
| | | | | | Account-ingDocu-mentNote 57342 | | | 0..1 57344 | SHORT_ Note 57346 |

FIG. 57-16

| Package | level1 | level2 | level3 | level4 | level5 | level6 | level7 | Cardinality | Datatype Name |
|---|---|---|---|---|---|---|---|---|---|
| | | | | | Crea-tionUserAccountID 57348 | | | 0..1 57350 | UserAc-countID 57352 |
| | | | | | Crea-tionUser-Name 57354 | | | 1 57356 | MEDIUM_Name 57358 |
| PeriodTo-talItem-LineItem 57360 | | | | | PeriodTo-talItem-LineItem 57362 | | | 0..n 57364 | FormAc-count-ingPeriod LineItems 57366 |
| | | | | | | ChartO-fAc-countsCode 57368 | | 1 57370 | ChartO-fAc-countsCode 57372 |

FIG. 57-17

| Package | level1 | level2 | level3 | level4 | level5 | level6 | level7 | Cardinality | Datatype Name |
|---|---|---|---|---|---|---|---|---|---|
| | | | | | | ChartOfAccountsItemCode 57374 | | 1 57376 | ChartOfAccountsItemCode 57378 |
| | | | | | | ChartOfAccountsItemCodeDescription 57380 | | 1 57382 | LONG_Description 57384 |
| | | | | | | ExchangeRate 57386 | | 0..1 57388 | ExchangeRate 57390 |
| | | | | | | AccountingDocumentItemNote 57392 | | 0..1 57394 | SHORT_Note 57396 |

FIG. 57-18

| Package | level1 | level2 | level3 | level4 | level5 | level6 | level7 | Cardinality | Datatype Name |
|---|---|---|---|---|---|---|---|---|---|
| | | | | | | ItemID 57398 | | 0..1 57400 | BusinessTransactionDocumentItemID 57402 |
| | | | | | | LineItemCurrencyAmount 57404 | | 1 57406 | Amount 57408 |
| | | | | | | LocalCurrencyAmount 57410 | | 1 57412 | Amount 57414 |

FIG. 57-19

| Package | level1 | level2 | level3 | level4 | level5 | level6 | level7 | Cardinality | Datatype Name |
|---|---|---|---|---|---|---|---|---|---|
| PeriodTo-talItem-LineIte-mOffset-tingAc-count 57416 | | | | | | PeriodTotalItem-LineIte-mOffset-tingAc-count 57418 | | 0..n 57420 | FormAccounting-Docu-mentRe-portLineItemOffset-tingChar-tOfAc-count-sItem-Code 57422 |
| | | | | | | | Com-panyUUID 57424 | 1 57426 | UUID 57428 |
| | | | | | | | ChartO-fAc-countsCode 57430 | 1 57432 | ChartO-fAc-countsCode 57434 |

FIG. 57-20

| Package | level1 | level2 | level3 | level4 | level5 | level6 | level7 | Cardinality | Datatype Name |
|---|---|---|---|---|---|---|---|---|---|
| | | | | | | | Offset-tingChar-tOfAc-count-sItem-Code 57436 | 1 57438 | ChartO-fAccount-sItem-Code 57440 |

| Package | Level1 | level2 | level3 | level4 | Cardinality | Datatype Name |
|---|---|---|---|---|---|---|
| AccountingAccountBalanceMigrateRequestMessage 59000 | AccountingAccountBalanceMigrateRequestMessage 59002 | | | | | AccountingAccountBalanceMigrateRequestMessage 59004 |
| MessageHeader 59006 | | MessageHeader 59008 | | | 1 59010 | BusinessDocumentMessageHeader 59012 |
| AccountingAccountBalanceMigrateRequest 59014 | | AccountingAccountBalanceMigrateRequest 59016 | | | 1 59018 | AccountingAccountBalanceMigrateRequest 59020 |

FIG. 59-2

| Package | | | | Level1 | level2 | level3 | level4 | Cardinality | Datatype Name |
|---|---|---|---|---|---|---|---|---|---|
| | | | | | | Com-panyID 59022 | | 1 59024 | Organisa-tionalCen-treID 59026 |
| | | | | | | Account-ingDocu-mentType Code 59028 | | 0..1 59030 | Account-ingDocu-ment-TypeCode 59032 |
| | | | | | | SetOf-BooksID 59034 | | 0..1 59036 | SetOf-BooksID 59038 |
| | | | | | | EntryDate 59040 | | 0..1 59042 | Date,Qual ifierEntry 59044 |
| | | | | | | Posting-Date 59046 | | 1 59048 | Date,Qual ifierPost-ing 59050 |

FIG. 59-3

| Package | | | | Level1 | level2 | level3 | level4 | Cardinality | Datatype Name |
|---|---|---|---|---|---|---|---|---|---|
| | | | | | | AccountingClosingStepCode 59052 | | 0..1 59054 | AccountingClosingStepCode 59056 |
| | | | | | | Note 59058 | | 0..1 59060 | SHORT_ Note 59062 |
| | | Item 59064 | | | | Item 59066 | | 1..n 59068 | AccountingAccountBalanceMigrateRequestItem 59070 |
| | | | | | | | ChartOfAccountsItemCode 59072 | 1 59074 | ChartOfAccountsItemCode 59076 |

FIG. 59-4

| Package | | | | Level1 | level2 | level3 | level4 | Cardinality | Datatype Name |
|---|---|---|---|---|---|---|---|---|---|
| | | | | | | | GeneralLedgerMovementType Code 59078 | 0..1 59080 | GeneralLedgerMovement-TypeCode 59082 |
| | | | | | | | SegmentID 59084 | 0..1 59086 | OrganisationalCentreID 59088 |
| | | | | | | | ProfitCentreID 59090 | 0..1 59092 | OrganisationalCentreID 59094 |
| | | | | | | | ProjectReference 59096 | 0..1 59098 | ObjectNodeReference 59100 |

FIG. 59-5

| Package | | | | Level1 | level2 | level3 | level4 | Cardinality | Datatype Name |
|---|---|---|---|---|---|---|---|---|---|
| | | | | | | | ProjectTaskReference 59102 | 0..1 59104 | ObjectNodeReference 59106 |
| | | | | | | | CostCentreID 59108 | 0..1 59110 | OrganisationalCentreID 59112 |
| | | | | | | | ExpenseClassificationFunctionalAreaCode 59114 | 0..1 59116 | ExpenseClassificationFunctionalAreaCode 59118 |
| | | | | | | | PartnerCompanyID 59120 | 0..1 59122 | OrganisationalCentreID 59124 |

FIG. 59-6

| Package | | | | Level1 | level2 | level3 | level4 | Cardinality | Datatype Name |
|---|---|---|---|---|---|---|---|---|---|
| | | | | | | | PartnerSegmentID 59126 | 0..1 59128 | OrganisationalCentreID 59130 |
| | | | | | | | PartnerProfitCentreID 59132 | 0..1 59134 | OrganisationalCentreID 59136 |
| | | | | | | | Note 59138 | 0..1 59140 | SHORT_Note 59142 |
| | | | | | | | LocalCurrencyAmount 59144 | 1 59146 | Amount,QualifierLocalCurrency 59148 |
| | | | | | | | SetOfBooksCurrencyAmount 59150 | 0..1 59152 | Amount,Qualifier-SetOfBooksCurrency 59154 |

FIG. 59-7

| Package | | | | Level1 | level2 | level3 | level4 | Cardinality | Datatype Name |
|---|---|---|---|---|---|---|---|---|---|
| | | | | | | | HardCurrencyAmount 59156 | 0..1 59158 | Amount,Qualifier-HardCurrency 59160 |
| | | | | | | | LineItem-CurrencyAmount 59162 | 0..1 59164 | Amount,Qualifier-LineItem-Currency 59166 |
| | | | | | | | Index-BasedCurrencyAmount 59168 | 0..1 59170 | Amount,QualifierIndexBased Currency 59172 |
| | | | | | | | Quantity 59174 | 0..1 59176 | Quantity 59178 |
| | | | | | | | QuantityTypeCode 59180 | 0..1 59182 | QuantityTypeCode 59184 |

To FIG. 60-19
FIG. 60-23
To FIG. 60-24 }
{ To FIG. 60-22
To FIG. 60-27

| Package | level 1 | level 2 | level 3 | level 4 | level 5 | Cardinality | Datatype Name |
|---|---|---|---|---|---|---|---|
| ExpenseReportAccountingNotificationMessage 71000 | Ex-penseRe portAc-count-ingNoti-fication-Mes-sage 71002 | | | | | | Ex-penseRe-portAc-count-ingNotifi-cation-Message 71004 |
| MessageHeader 71006 | | Mes-sage-Header 71008 | | | | 1 71010 | Busi-nessDocu mentMes-sage-Header 71012 |
| | | | ID 71014 | | | 1 71016 | Busi-nessDocu mentMes-sageID 71018 |

FIG. 71-2

| Package | | level 1 | level 2 | level 3 | level 4 | level 5 | Cardinality | Datatype Name |
|---|---|---|---|---|---|---|---|---|
| | | | | CreationDateTime 71020 | | | 1 71022 | DateTime 71024 |
| | | | | .... 71026 | | | .... 71028 | .... 71030 |
| | ExpenseReportAccountingNotification 71032 | | ExpenseReportAccountingNotification 71034 | | | | 1 71036 | ExpenseReportAccountingNotification 71038 |
| | | | | BaseBusinessTransactionDocumentID 71040 | | | 1 71042 | BusinessTransactionDocumentID 71044 |

FIG. 71-3

| Package | | level 1 | level 2 | level 3 | level 4 | level 5 | Cardinality | Datatype Name |
|---|---|---|---|---|---|---|---|---|
| | | | | Base-Business-TransactionDocument-Type-Code 71046 | | | 1 71048 | Business-Transaction-Document TypeCode 71050 |
| | | | | Accounting-TransactionDate 71052 | | | 1 71054 | Date 71056 |
| | | | | Document-Date 71058 | | | 1 71060 | Date 71062 |
| | | | | Note 71064 | | | 0..1 71066 | Note 71068 |

FIG. 71-4

| Package | | | level 1 | level 2 | level 3 | level 4 | level 5 | Cardinality | Datatype Name |
|---|---|---|---|---|---|---|---|---|---|
| | | | | | Com-panyID 71070 | | | 1 71072 | Com-panyID 71074 |
| | | Party 71076 | | | Employ-eeParty 71078 | | | 1 71080 | Business-Transac-tion-Document Party 71082 |
| | | | | | | InternalID 71084 | | 1 71086 | Party-InternalID 71088 |
| | | Item 71090 | | | DueItem 71092 | | | 0..1 71094 | Ex-penseRe-portAc-count-ingNotifi-cation-DueItem 71096 |
| | | | | | | DueDate 71098 | | 1 71100 | Date 71102 |

FIG. 71-5

| Package | level 1 | level 2 | level 3 | level 4 | level 5 | Cardinality | Datatype Name |
|---|---|---|---|---|---|---|---|
| | | | | GrossAmount 71104 | | 1 71106 | Amount 71108 |
| | | | ProductTaxItem 71110 | | | 0..n 71112 | ExpenseReportAccountingNotificationProductTaxItem 71114 |
| | | | | TaxDeclarationAmount 71116 | | 0..1 71118 | Amount 71120 |
| | | | | NonDeductibleTaxDeclarationAmount 71122 | | 0..1 71124 | Amount 71126 |

FIG. 71-6

| Package | level 1 | level 2 | level 3 | level 4 | level 5 | Cardinality | Datatype Name |
|---|---|---|---|---|---|---|---|
| Tax 71128 | | | | ProductTax 71130 | | 1 71132 | ProductTax 71134 |
| | | | | | CountryCode 71136 | 1 71138 | CountryCode 71140 |
| | | | | | EventTypeCode 71142 | 1 71144 | ProductTaxEventTypeCode 71146 |
| | | | | | TypeCode 71148 | 1 71150 | TaxTypeCode 71152 |
| | | | | | RateTypeCode 71154 | 1 71156 | TaxRateTypeCode 71158 |
| | | | | | Amount 71160 | 1 71162 | Amount 71164 |

FIG. 71-7

| Package | level 1 | level 2 | level 3 | level 4 | level 5 | Cardinality | Datatype Name |
|---|---|---|---|---|---|---|---|
| | | | | | NonDe-ductible Amount 71166 | 0..1 71168 | Amount 71170 |
| | | | | | Busi-ness-Transac-tionDocu men-tItem-GroupID 71172 | 0..1 71174 | Business-Transac-tion-Documen-tItem-GroupID 71176 |
| | | | | | DueCate gory-Code 71178 | 1 71180 | DueCate-goryCode 71182 |
| | | | | | Deferred Indicator 71184 | 0..1 71186 | TaxDe-ferredIndi-cator 71188 |

FIG. 71-8

| Package | level 1 | level 2 | level 3 | level 4 | level 5 | Cardinality | Datatype Name |
|---|---|---|---|---|---|---|---|
| | | | | | RegionCode 71190 | 0..1 71192 | RegionCode 71194 |
| | | | ExpenseItem 71196 | | | 0..n 71198 | ExpenseReportAccountingNotificationExpenseItem 71200 |
| | | | | BaseBusinessTransactionDocumentItemID 71202 | | 1 71204 | BusinessTransactionDocumentItemID 71206 |
| | | | | NetAmount 71208 | | 1 71210 | Amount 71212 |

FIG. 71-9

| Package | level 1 | level 2 | level 3 | level 4 | level 5 | Cardinality | Datatype Name |
|---|---|---|---|---|---|---|---|
| | | | | AccountDeterminationExpenseGroupCode 71214 | | 1 71216 | AccountDeterminationExpenseGroupCode 71218 |
| | | | | Note 71220 | | 0..1 71222 | Note 71224 |
| | | | | BusinessTransactionDocumentItemGroupID 71226 | | 0..1 71228 | BusinessTransactionDocumentItemGroupID 71230 |
| AccountingCodingBlockDistribution 71232 | | | | AccountingObjectSetAssignment 71234 | | 0..n 71236 | AccountingObjectSetAssignment 71238 |

FIG. 71-10

| Package | | | | | level 1 | level 2 | level 3 | level 4 | level 5 | Cardinality | Datatype Name |
|---|---|---|---|---|---|---|---|---|---|---|---|
| | | | | | | | PaidInvoiceExpenseItem 71240 | | | 0..n 71242 | ExpenseReportAccountingNotificationPayedInvoiceExpenseItem 71244 |
| | | | | | | | | BaseBusinessTransactionDocumentItemID 71246 | | 1 71248 | BusinessTransactionDocumentItemID 71250 |
| | | | | | | | | NetAmount 71252 | | 1 71254 | Amount 71256 |

FIG. 71-11

| Package | | | | level 1 | level 2 | level 3 | level 4 | level 5 | Cardinality | Datatype Name |
|---|---|---|---|---|---|---|---|---|---|---|
| | | | | | | | Account-Determi-nation-Expen-seGroup Code 71258 | | 1 71260 | Account-Determi-nationEx-pen-seGroup-Code 71262 |
| | | | AccountingCodingBlockDis-tribution 71264 | | | | Account-ingOb-jectSe-tAssign-ment 71266 | | 1 71268 | Account-ingOb-jectSetAs-signment 71270 |

FIG. 72-1

| Package | level1 | level2 | level3 | level4 | level5 | level6 | Cardinality | Datatype Name |
|---|---|---|---|---|---|---|---|---|
| GoodsAndServiceAcknowledgementAccountingMessage 72000 | GoodsAndServiceAcknowledgementAccountingMessage 72002 | | | | | | | GoodsAndServiceAcknowledgementAccountingMessage 72004 |

FIG. 72-2

| Package | level1 | level2 | level3 | level4 | level5 | level6 | Cardinality | Datatype Name |
|---|---|---|---|---|---|---|---|---|
| MessageHeader 72006 | | Message Header 72008 | | | | | 1 72010 | Business Docu-mentMes sage-Header 72012 |
| | | | ID 72014 | | | | 1 72016 | Business Docu-mentMes sageID 72018 |

FIG. 72-3

| Package | level1 | level2 | level3 | level4 | level5 | level6 | Cardinality | Datatype Name |
|---|---|---|---|---|---|---|---|---|
| | | | Creation-DateTime 72020 | | | | 1 72022 | DateTime 72024 |
| | | | Sender-Party 72026 | | | | 1 72028 | Business Docu-mentMes sage-Header-Party 72030 |

FIG. 72-4

| Package | level1 | level2 | level3 | level4 | level5 | level6 | Cardinality | Datatype Name |
|---|---|---|---|---|---|---|---|---|
| | | | Recipi-entParty 72032 | | | | 1 72034 | Business Docu-mentMes sage-Header-Party 72036 |
| GoodsAndServiceAcknowledge-ment 72038 | | GoodAnd ServiceA cknowl-edge-ment 72040 | | | | | 1 72042 | Good-sAndSer-viceAc-knowl-edge-mentAc-counting 72044 |

FIG. 72-5

| Package | level1 | level2 | level3 | level4 | level5 | level6 | Cardinality | Datatype Name |
|---|---|---|---|---|---|---|---|---|
| | | | ID 72046 | | | | 1 72048 | BusinessTransactionDocumentID 72050 |
| | | | TypeCode 72052 | | | | 1 72054 | BusinessTransactionDocumentTypeCode 72056 |

FIG. 72-6

| Package | level1 | level2 | level3 | level4 | level5 | level6 | Cardinality | Datatype Name |
|---|---|---|---|---|---|---|---|---|
| | | | Busi-nessProcessVari-antType-Code 72058 | | | | 1 72060 | Busi-nessProcessVari-antType-Code 72062 |
| | | | Docu-mentDate 72064 | | | | 1 72066 | Date 72068 |
| | | | Account-ing-Transac-tion-DateTime 72070 | | | | 1 72072 | GLOBAL_DateTime 72074 |

FIG. 72-7

| Package | level1 | level2 | level3 | level4 | level5 | level6 | Cardinality | Datatype Name |
|---|---|---|---|---|---|---|---|---|
| | | | CompanyID 72076 | | | | 1 72078 | CompanyID 72080 |
| Item 72082 | | | Item 72084 | | | | 1…n 72086 | GoodsAndServiceAcknowledgementAccountingItem 72088 |

FIG. 72-8

| Package | level1 | level2 | level3 | level4 | level5 | level6 | Cardinality | Datatype Name |
|---|---|---|---|---|---|---|---|---|
| | | | | ID 72090 | | | 1 72092 | BusinessTransactionDocumentItemID 72094 |

FIG. 72-9

| Package | | | | | level1 | level2 | level3 | level4 | level5 | level6 | Cardinality | Datatype Name |
|---|---|---|---|---|---|---|---|---|---|---|---|---|
| | | | | | | | | ItemType Code 72096 | | | 1 72098 | BusinessTransactionDocumentItemType-Code 72100 |
| | | | | | | | | Description 72102 | | | 0..1 72104 | Description 72106 |
| | | | | | | | | Price 72108 | | | 1 72110 | Price 72112 |

FIG. 72-10

| Package | level1 | level2 | level3 | level4 | level5 | level6 | Cardinality | Datatype Name |
|---|---|---|---|---|---|---|---|---|
| | | | | Material-Item 72114 | | | 0..1 72116 | Good-sAndSer-viceAc-knowledg-mentMa-terialItem 72118 |
| | | | | | InternalID 72120 | | 1 72122 | Product-InternalID 72124 |
| | | | | | Material-Category 72126 | | 0..1 72128 | BTDPro-ductCate-gory 72130 |

FIG. 72-11

| Package | level1 | level2 | level3 | level4 | level5 | level6 | Cardinality | Datatype Name |
|---|---|---|---|---|---|---|---|---|
| | | | | | | InternalID 72132 | 1 72134 | Pro-ductCate gory-InternalID 72136 |
| | | | | | Order-Quantity 72138 | | 1 72140 | Quantity 72142 |
| | | | | Ser-viceItem 72144 | | | 0..1 72146 | Good-sAndSer-viceAc-knowledg mentSer-viceItem 72148 |

FIG. 72-12

| Package | | | | level1 | level2 | level3 | level4 | level5 | level6 | Cardinality | Datatype Name |
|---|---|---|---|---|---|---|---|---|---|---|---|
| | | | | | | | | Service-ProductID 72150 | | 1 72152 | Product-ID 72154 |
| | | | | | | | | Service-Product-Category 72156 | | 0..1 72158 | BTDProductCategory 72160 |
| | | | | | | | | | InternalID 72162 | 1 72164 | ProductCategory-InternalID 72166 |

FIG. 72-13

| Package | | | | level1 | level2 | level3 | level4 | level5 | level6 | Cardinality | Datatype Name |
|---|---|---|---|---|---|---|---|---|---|---|---|
| | | | | | | | | Order-Quantity 72168 | | 1 72170 | Quantity 72172 |
| | | | BusinessTransaction-DocumentReference 72174 | | | | Origin-Good-sAndSer-viceAc-knowl-edgmen-tRefer-ence 72176 | | | 0.1 72178 | Business Transac-tionDocu-men-tRefer-ence 72180 |

FIG. 72-14

| Package | | | | level1 | level2 | level3 | level4 | level5 | level6 | Cardinality | Datatype Name |
|---|---|---|---|---|---|---|---|---|---|---|---|
| | | | | | | | PurchaseOrderReference 72182 | | | 0.1 72184 | BusinessTransactionDocumentReference 72186 |
| | | | AccountingCodingBlockDistribution 72188 | | | | AccountingObjectSetAssignment 72190 | | | 0.1 72192 | AccountingObjectSetAssingment 72194 |

FIG. 73-1

| Package | level1 | level2 | level3 | level4 | level5 | level6 | Cardinality | Datatype Name |
|---|---|---|---|---|---|---|---|---|
| InventoryChangeAndActivity-ConfirmationAccountingMes-sage 73000 | Inven-toryChangeAndActivity-Confirma-tionAccount-ingMessage 73002 | | | | | | | Inven-toryChangeAndActivity-Confirma-tionAccount-ingMessage 73004 |
| MessageHeader 73006 | | Message Header 73008 | | | | | 1 73010 | Business-Document-Message-Header 73012 |
| | | | ID 73014 | | | | 1 73016 | Business-Document-MessageID 73018 |

FIG. 73-2

| Package | level1 | level2 | level3 | level4 | level5 | level6 | Cardinality | Datatype Name |
|---|---|---|---|---|---|---|---|---|
| | | | Creation-DateTime 73020 | | | | 1 73022 | DateTime 73024 |
| | | | Sender-Party 73026 | | | | 1 73028 | Business-Document-Message-HeaderParty 73030 |
| | | | Recipi-entParty 73032 | | | | 1 73034 | Business-Document-Message-HeaderParty 73036 |

FIG. 73-3

| Package | level1 | level2 | level3 | level4 | level5 | level6 | Cardinality | Datatype Name |
|---|---|---|---|---|---|---|---|---|
| InventoryChangeAndActivity-Confirmation 73038 | | Inven-toryChan geAn-dActiv-ityCon-firmation 73040 | | | | | 1 73042 | Inven-toryChangeA ndActivity-Confirma-tionAccount-ing 73044 |
| | | | ID 73046 | | | | 1 73048 | Business-Transaction-DocumentID 73050 |
| | | | Type-Code 73052 | | | | 1 73054 | Business-Transaction-Document-TypeCode 73056 |

FIG. 73-4

| Package | level1 | level2 | level3 | level4 | level5 | level6 | Cardinality | Datatype Name |
|---|---|---|---|---|---|---|---|---|
| | | | Busi-nessProcessVari-antType-Code 73058 | | | | 1 73060 | BusinessProcessVariant-TypeCode 73062 |
| | | | Account-ing-Transac-tion-DateTime 73064 | | | | 1 73066 | GLOBAL_DateTime 73068 |
| | | | Com-panyID 73070 | | | | 1 73072 | CompanyID 73074 |

FIG. 73-5

| Package | | | level1 | level2 | level3 | level4 | level5 | level6 | Cardinality | Datatype Name |
|---|---|---|---|---|---|---|---|---|---|---|
| | Item 73076 | | | | Item 73078 | | | | 1…n 73080 | Inven-toryChangeAndActivity-Confirma-tionAccount-ingItem 73082 |
| | | | | | | ID 73084 | | | 1 73086 | Business-Transaction-Documen-tItemID 73088 |

FIG. 73-6

| Package | level1 | level2 | level3 | level4 | level5 | level6 | Cardinality | Datatype Name |
|---|---|---|---|---|---|---|---|---|
| | | | | ItemType Code 73090 | | | 1 73092 | Business-Transaction-Documen-tItemType-Code 73094 |
| | | | | GroupID 73096 | | | 0.1 73098 | Business-Transaction-Documen-tItemGroupID 73100 |
| | | | | Direction 73102 | | | 0.1 73104 | Inven-toryChange-Direction 73106 |

FIG. 73-7

| Package | level1 | level2 | level3 | level4 | level5 | level6 | Cardinality | Datatype Name |
|---|---|---|---|---|---|---|---|---|
| | | | | ItemNote 73108 | | | 0.1 73110 | Note 73112 |
| | | | | Valuation Quantity 73114 | | | 0.1 73116 | Quantity 73118 |
| | | | | Material-Item 73120 | | | 0.1 73122 | Inven-toryChangeAndActivity-Confirma-tionMaterial-Item 73124 |

FIG. 73-8

| Package | level1 | level2 | level3 | level4 | level5 | level6 | Cardinality | Datatype Name |
|---|---|---|---|---|---|---|---|---|
| | | | | | Actual-Quantity 73126 | | 1 73128 | Quantity 73130 |
| | | | | | Permanent-Establishment-ID 73132 | | 1 73134 | Organisational-CentreID 73136 |
| | | | | | Owner-Party 73138 | | 1 73140 | Business-Transaction-Document-Party 73142 |

FIG. 73-9

| Package | level1 | level2 | level3 | level4 | level5 | level6 | Cardinality | Datatype Name |
|---|---|---|---|---|---|---|---|---|
| | | | | | | Inter-nalID 73144 | 1 73146 | InternalID 73148 |
| | | | | | Material 73150 | | 0.1 73152 | Business-Transaction-Document-Product 73154 |
| | | | | | | Inter-nalID 73156 | 1 73158 | ProductInter-nalID 73160 |

FIG. 73-10

| Package | level1 | level2 | level3 | level4 | level5 | level6 | Cardinality | Datatype Name |
|---|---|---|---|---|---|---|---|---|
| | | | | | Individu-alMaterial 73162 | | 0.1 73164 | Business-Transaction-Document-Product 73166 |
| | | | | | | Inter-nalID 73168 | 1 73170 | ProductInter-nalID 73172 |
| | | | | Ser-viceItem 73174 | | | 0.1 73176 | Inven-toryChangeAndActivity-Confirma-tionSer-viceItem 73178 |

FIG. 73-11

| Package | level1 | level2 | level3 | level4 | level5 | level6 | Cardinality | Datatype Name |
|---|---|---|---|---|---|---|---|---|
| | | | | | Service-Produc-tID 73180 | | 1 73182 | ProductID 73184 |
| | | | | | Service-Produc-tQuantity 73186 | | 1 73188 | Quantity 73190 |
| | | | | | Resour-ceID 73192 | | 1 73194 | ResourceID 73196 |
| | | | | | Resour-ceQuan-tity 73198 | | 1 73200 | Quantity 73202 |

FIG. 73-12

| Package | | | | level1 | level2 | level3 | level4 | level5 | level6 | Cardinality | Datatype Name |
|---|---|---|---|---|---|---|---|---|---|---|---|
| | | | BusinessTransactionDocumentReference 73204 | | | | SalesOrderReference 73206 | | | 0.1 73208 | BusinessTransactionDocumentReference 73210 |
| | | | | | | | ServiceOrderReference 73212 | | | 0.1 73214 | BusinessTransactionDocumentReference 73216 |

FIG. 73-13

| Package | level1 | level2 | level3 | level4 | level5 | level6 | Cardinality | Datatype Name |
|---|---|---|---|---|---|---|---|---|
| | | | | Pur-chaseOr-derRefer-ence 73218 | | | 0.1 73220 | Business-Transaction-Documen-tReference 73222 |
| | | | | Produc-tionLot-Refer-ence 73224 | | | 0.1 73226 | Business-Transaction-Documen-tReference 73228 |

FIG. 73-14

| Package | level1 | level2 | level3 | level4 | level5 | level6 | Cardinality | Datatype Name |
|---|---|---|---|---|---|---|---|---|
| | | | | ConfirmedInboundDeliveryReference 73230 | | | 0.1 73232 | BusinessTransactionDocumentReference 73234 |
| | | | | Supplier 73236 | | | 0.1 73238 | PartyID 73240 |
| AccountingCodingBlockDistribution 73242 | | | | AccountingObjectSetAssignment 73244 | | | 0.1 73246 | AccountingObjectSetAssingment 73248 |

FIG. 74-1

| Package | level1 | level2 | level3 | level4 | level5 | Cardinality | Datatype Name |
|---|---|---|---|---|---|---|---|
| InvoiceAccountingNotificationMessage 74000 | InvoiceAccountingNotification-Message 74002 | | | | | | InvoiceAccountingNotificationMessage 74004 |
| MessageHeader 74006 | | Message-Header 74008 | | | | 1 74010 | Business-Document-Message-Header 74012 |
| | | | ID 74014 | | | 1 74016 | Business-Document-MessageID 74018 |
| | | | Creation-DateTime 74020 | | | 1 74022 | DateTime 74024 |
| | | | .... 74026 | | | .... 74028 | .... 74030 |

FIG. 74-2

| Package | level1 | level2 | level3 | level4 | level5 | Cardinality | Datatype Name |
|---|---|---|---|---|---|---|---|
| InvoiceAccountingNotification 74032 | | InvoiceAccountingNotification 74034 | | | | 1 74036 | InvoiceAccountingNotification 74038 |
| | | | BaseBusinessTransactionDocumentID 74040 | | | 1 74042 | BusinessTransactionDocumentID 74044 |
| | | | BaseBusinessTransactionDocumentTypeCode 74046 | | | 1 74048 | BusinessTransactionDocumentTypeCode 74050 |
| | | | BusinessProcessVariantTypeCode 74052 | | | 0..n 74054 | BusinessProcessVariantTypeCode 74056 |

FIG. 74-3

| Package | level1 | level2 | level3 | level4 | level5 | Cardinality | Datatype Name |
|---|---|---|---|---|---|---|---|
| | | | Accounting-Transaction-Date 74058 | | | 1 74060 | Date 74062 |
| | | | Document-Date 74064 | | | 1 74066 | Date 74068 |
| | | | Note 74070 | | | 0..1 74072 | Note 74074 |
| | | | CompanyID 74076 | | | 1 74078 | CompanyID 74080 |
| Party 74082 | | | DebtorParty 74084 | | | 0..1 74086 | Business-Transaction-Document-Party 74088 |
| | | | | InternalID 74090 | | 1 74092 | PartyInternalID 74094 |

FIG. 74-4

| Package | level1 | level2 | level3 | level4 | level5 | Cardinality | Datatype Name |
|---|---|---|---|---|---|---|---|
| | | | CreditorParty 74096 | | | 0..1 74098 | BusinessTransactionDocumentParty 74100 |
| | | | | InternalID 74102 | | 1 74104 | PartyInternalID 74106 |
| BusinessTransactionDocumentReference 74108 | | | OriginCustomerInvoiceReference 74110 | | | 0..1 74112 | BusinessTransactionDocumentReference 74114 |
| | | | | ID 74116 | | 1 74118 | BusinessTransactionDocumentID 74120 |
| | | | OriginSupplierInvoiceReference 74122 | | | 0..1 74124 | BusinessTransactionDocumentReference 74126 |

FIG. 74-5

| Package | level1 | level2 | level3 | level4 | level5 | Cardinality | Datatype Name |
|---|---|---|---|---|---|---|---|
| | | | | ID 74128 | | 1 74130 | Business-Transaction-DocumentID 74132 |
| Item 74134 | | | DueItem 74136 | | | 1 74138 | InvoiceAc-countingNoti-fication-DueItem 74140 |
| | | | | DueDate 74142 | | 1 74144 | Date 74146 |
| | | | | Gros-sAmount 74148 | | 1 74150 | Amount 74152 |
| DueItemSchedule 74154 | | | | Schedule 74156 | | 0..n 74158 | InvoiceAc-countingNoti-fication-DueItem-Schedule 74160 |
| | | | | | DueDate 74162 | 1 74164 | Date 74166 |

FIG. 74-6

| Package | level1 | level2 | level3 | level4 | level5 | Cardinality | Datatype Name |
|---|---|---|---|---|---|---|---|
| | | | | | GrossAmount 74168 | 1 74170 | Amount 74172 |
| | | | ProductTaxItem 74174 | | | 0..n 74176 | InvoiceAccountingNotificationProductTaxItem 74178 |
| | | | | TaxDeclarationAmount 74180 | | 1 74182 | Amount 74184 |
| | | | | TaxDeclarationNonDeductibleAmount 74186 | | 0..1 74188 | Amount 74190 |
| Tax 74192 | | | | ProductTax 74194 | | 1 74196 | ProductTax 74198 |

FIG. 74-7

| Package | level1 | level2 | level3 | level4 | level5 | Cardinality | Datatype Name |
|---|---|---|---|---|---|---|---|
| | | | | | Country-Code 74200 | 1 74202 | CountryCode 74204 |
| | | | | | Event TypeCode 74206 | 1 74208 | Pro-ductTaxEvent-TypeCode 74210 |
| | | | | | TypeCode 74212 | 1 74214 | TaxTypeCode 74216 |
| | | | | | RateType-Code 74218 | 1 74220 | TaxRateType-Code 74222 |
| | | | | | Amount 74224 | 1 74226 | Amount 74228 |
| | | | | | NonDe-ductibleA-mount 74230 | 0..1 74232 | Amount 74234 |

FIG. 74-8

| Package | level1 | level2 | level3 | level4 | level5 | Cardinality | Datatype Name |
|---|---|---|---|---|---|---|---|
| | | | | | BusinessTransactionDocumentItemGroupID 74236 | 0..1 74238 | BusinessTransactionDocumentItemGroupID 74240 |
| | | | | | DueCategoryCode 74242 | 1 74244 | DueCategoryCode 74246 |
| | | | | | DeferredIndicator 74248 | 0..1 74250 | TaxDeferredIndicator 74252 |
| | | | | | RegionCode 74254 | 0..1 74256 | RegionCode 74258 |
| | | | WithholdingTaxItem 74260 | | | 0..n 74262 | InvoiceAccountingNotificationWithholdingTaxItem 74264 |

FIG. 74-9

| Package | level1 | level2 | level3 | level4 | level5 | Cardinality | Datatype Name |
|---|---|---|---|---|---|---|---|
| | | | | TaxDe-clara-tionAmount 74266 | | 1 74268 | Amount 74270 |
| Tax 74272 | | | | Withhold-ingTax 74274 | | 1 74276 | Withholding-Tax 74278 |
| | | | | | Country-Code 74280 | 1 74282 | CountryCode 74284 |
| | | | | | Event TypeCode 74286 | 1 74288 | Withhollding-TaxEvent-TypeCode 74290 |
| | | | | | TypeCode 74292 | 1 74294 | TaxTypeCode 74296 |
| | | | | | RateType-Code 74298 | 1 74300 | TaxRateType-Code 74302 |

FIG. 74-10

| Package | level1 | level2 | level3 | level4 | level5 | Cardinality | Datatype Name |
|---|---|---|---|---|---|---|---|
| | | | | | Amount 74304 | 1 74306 | Amount 74308 |
| | | | | | Region-Code 74310 | 0..1 74312 | RegionCode 74314 |
| | | | SalesItem 74316 | | | 0..n 74318 | InvoiceAccountingNotificationSalesItem 74320 |
| | | | | Base-Business-Transaction-DocumentItemID 74322 | | 1 74324 | Business-Transaction-DocumentItemID 74326 |

FIG. 74-11

| Package | level1 | level2 | level3 | level4 | level5 | Cardinality | Datatype Name |
|---|---|---|---|---|---|---|---|
| | | | | Base-Business-Transac-tion-Documen-tItem-TypeCode 74328 | | 1 74330 | Business-Transaction-Documen-tItemType-Code 74332 |
| | | | | NetA-mount 74334 | | 1 74336 | Amount 74338 |
| | | | | Quantity 74340 | | 0..1 74342 | Quantity 74344 |
| | | | | CashDis-countDe-ductibleIn dicator 74346 | | 0..1 74348 | CashDis-countDe-ductibleIndica-tor 74350 |

FIG. 74-12

| Package | level1 | level2 | level3 | level4 | level5 | Cardinality | Datatype Name |
|---|---|---|---|---|---|---|---|
| | | | | Business-Transac-tion-Documen-tItem-GroupID 74352 | | 0..1 74354 | Business-Transaction-Documen-tItemGroupID 74356 |
| Product 74358 | | | | Product 74360 | | 0..1 74362 | Business-Transaction-Document-Product 74364 |
| | | | | | InternalID 74366 | 1 74368 | ProductInter-nalID 74370 |
| | | | | | TypeCode 74372 | 1 74374 | ProductType-Code 74376 |

FIG. 74-13

| Package | level1 | level2 | level3 | level4 | level5 | Cardinality | Datatype Name |
|---|---|---|---|---|---|---|---|
| BusinessTransactionDocumentReference 74378 | | | | OutboundDeliveryReference 74380 | | 0..1 74382 | BusinessTransactionDocumentReference 74384 |
| | | | | SalesOrderReference 74386 | | 0..1 74388 | BusinessTransactionDocumentReference 74390 |
| | | | | CustomerReturnReference 74392 | | 0..1 74394 | BusinessTransactionDocumentReference 74396 |
| | | | | ServiceOrderReference 74398 | | 0..1 74400 | BusinessTransactionDocumentReference 74402 |

FIG. 74-14

| Package | level1 | level2 | level3 | level4 | level5 | Cardinality | Datatype Name |
|---|---|---|---|---|---|---|---|
| | | | | Service-Contrac-tRefer-ence 74404 | | 0..1 74406 | Business-Transaction-Documen-tReference 74408 |
| | | | | ServiceRequestReference 74410 | | 0..1 74412 | Business-Transaction-Documen-tReference 74414 |
| | | | | Service-Confirma-tion Reference 74416 | | 0..1 74418 | Business-Transaction-Documen-tReference 74420 |
| AccountingCodingBlockAs-signment 74422 | | | | Account-ingCod-ingBlock-Assign-ment 74424 | | 0..n 74426 | Accounting-CodingBlock-Assignment 74428 |

FIG. 74-15

| Package | level1 | level2 | level3 | level4 | level5 | Cardinality | Datatype Name |
|---|---|---|---|---|---|---|---|
| PriceInformation 74430 | | | | Pricing 74432 | | 0..n 74434 | InvoiceAccountingNotificationSalesItemPricing 74436 |
| | | | | | Amount 74438 | 1 74440 | Amount 74442 |
| | | | | | PriceSpecificationElementPurposeCode 74444 | 1 74446 | PriceSpecificationElementPurposeCode 74448 |
| | | | PurchasingItem 74450 | | | 0..n 74452 | InvoiceAccountingNotificationPurchasingItem 74454 |

FIG. 74-16

| Package | level1 | level2 | level3 | level4 | level5 | Cardinality | Datatype Name |
|---|---|---|---|---|---|---|---|
| | | | | Base-Business-Transac-tion-Documen-tItemID 74456 | | 1 74458 | Business-Transaction-Documen-tItemID 74460 |
| | | | | Base-Business-Transac-tion-Documen-tItem-TypeCode 74462 | | 1 74464 | Business-Transaction-Documen-tItemType-Code 74466 |
| | | | | NetA-mount 74468 | | 1 74470 | Amount 74472 |
| | | | | Quantity 74474 | | 0..1 74476 | Quantity 74478 |
| | | | | Order-Quantity 74480 | | 0..1 74482 | Quantity 74484 |

FIG. 74-17

| Package | level1 | level2 | level3 | level4 | level5 | Cardinality | Datatype Name |
|---|---|---|---|---|---|---|---|
| | | | | CashDiscountDeductibleIndicator 74486 | | 0..1 74488 | CashDiscountDeductibleIndicator 74490 |
| | | | | BusinessTransactionDocumentItemGroupID 74492 | | 0..1 74494 | BusinessTransactionDocumentItemGroupID 74496 |
| Product 74498 | | | | Product 74500 | | 0..1 74502 | BusinessTransactionDocumentProduct 74504 |
| | | | | | InternalID 74506 | 1 74508 | ProductInternalID 74510 |
| | | | | | TypeCode 74512 | 1 74514 | ProductTypeCode 74516 |

FIG. 74-18

| Package | level1 | level2 | level3 | level4 | level5 | Cardinality | Datatype Name |
|---|---|---|---|---|---|---|---|
| BusinessTransactionDocumentReference 74518 | | | | PurchaseOrderReference 74520 | | 0..1 74522 | BusinessTransactionDocumentReference 74524 |
| | | | | ConfirmedInboundDeliveryReference 74526 | | 0..1 74528 | BusinessTransactionDocumentReference 74530 |
| | | | | GoodsAndServiceAcknowledgementReference 74532 | | 0..1 74534 | BusinessTransactionDocumentReference 74536 |

FIG. 74-19

| Package | level1 | level2 | level3 | level4 | level5 | Cardinality | Datatype Name |
|---|---|---|---|---|---|---|---|
| AccountingCodingBlockDistribution 74538 | | | | AccountingCodingBlockAssignment 74540 | | 0..n 74542 | AccountingCodingBlockAssignment 74544 |

FIG. 75-1

| Package | level 1 | level2 | level3 | level4 | level5 | Cardinality | Datatype Name |
|---|---|---|---|---|---|---|---|
| CancellationAccountingMessage 75000 | Cancella-tionAc-count-ingNotifi-cation-Message 75002 | | | | | 1 75004 | CancellationAc-countingNotification Message 75006 |
| MessageHaeder 75008 | | Message Header 75010 | | | | 1 75012 | BusinessDocu-mentMessage-Header 75014 |
| CancellationAccountingNotifica-tion 75016 | | Cancella-tionAc-counting Notifica-tion 75018 | | | | 1 75020 | CancellationAc-countingNotification 75022 |

FIG. 75-2

| Package | level 1 | level2 | level3 | level4 | level5 | Cardinality | Datatype Name |
|---|---|---|---|---|---|---|---|
| | | | OriginalEntryDocumentID 75024 | | | 1 75026 | BusinessTransactionDocumentID 75028 |
| | | | AccountingTransactionDate 75030 | | | 0..1 75032 | Date 75034 |
| | | | AccountingTransactionDateTime 75036 | | | 0..1 75038 | DateTime 75040 |
| | | | Note 75042 | | | 0..1 75044 | Note 75046 |

FIG. 75-3

| Package | level 1 | level2 | level3 | level4 | level5 | Cardinality | Datatype Name |
|---|---|---|---|---|---|---|---|
| | | | CompanyID 75048 | | | 1 75050 | OrganisationalCentreID 75052 |
| BusinessTransactionDocumentReference 75054 | | | CancelledOriginalEntryDocument 75056 | | | 1 75058 | CancellationAccountingNotification CancelledOriginalEntryDocument 75060 |
| | | | | TypeCode 75062 | | 1 75064 | BusinessTransactionDocumentTypeCode 75066 |
| | | | | ID 75068 | | 1 75070 | BusinessTransactionDocumentID 75072 |

FIG. 75-4

| Package | level 1 | level2 | level3 | level4 | level5 | Cardinality | Datatype Name |
|---|---|---|---|---|---|---|---|
| | | | | Item 75074 | | 0..n 75076 | CancellationAccountingNotificationCancelledOriginalEntryDocumentItem 75078 |
| | | | | | ID 75080 | 1 75082 | BusinessTransactionDocumentItemID 75084 |

FIG. 76-1

| Package | Level1 | Level2 | Level3 | Level4 | Level5 | Level6 | Cardinality | Datatype Name |
|---|---|---|---|---|---|---|---|---|
| OpenItemAccountingNotificationMessage 76000 | OpenItemAccountingNotification-Message 76002 | | | | | | | OpenItemAccountingNotification-Message 76004 |
| MessageHeader 76006 | | Message-Header 76008 | | | | | 0..1 76010 | Business-Document-Message-Header 76012 |
| | | | ID 76014 | | | | 1 76016 | Business-Document-MessageID 76018 |
| | | | Creation-DateTime 76020 | | | | 1 76022 | DateTime 76024 |
| | | | .... 76026 | | | | .... 76028 | .... 76030 |

FIG. 76-2

| Package | Level1 | Level2 | Level3 | Level4 | Level5 | Level6 | Cardinality | Datatype Name |
|---|---|---|---|---|---|---|---|---|
| OpenItemAccountingNotification 76032 | | OpenItemAccountingNotification 76034 | | | | | 1 76036 | OpenItemAccountingNotification 76038 |
| | | | OperationalDocumentReference 76040 | | | | 1 76042 | ObjectNodeReference 76044 |
| | | | AccountingBusinessTransactionDate 76046 | | | | 1 76048 | Date 76050 |
| | | | OperationalDocumentDate 76052 | | | | 1 76054 | Date 76056 |

FIG. 76-3

| Package | Level1 | Level2 | Level3 | Level4 | Level5 | Level6 | Cardinality | Datatype Name |
|---|---|---|---|---|---|---|---|---|
| | | | Com-panyID 76058 | | | | 1 76060 | Com-panyID 76062 |
| | | | Note 76064 | | | | 0..1 76066 | SHORT_Note 76068 |
| Item 76070 | | | Item 76072 | | | | 1..n 76074 | OpenIte-mAccount-ingNotifi-cationItem 76076 |
| | | | | Transac-tionCur-rencyA-mount 76078 | | | 1 76080 | Amount 76082 |
| | | | | LocalCur-rencyA-mount 76084 | | | 1 76086 | Amount 76088 |

FIG. 76-4

| Package | Level1 | Level2 | Level3 | Level4 | Level5 | Level6 | Cardinality | Datatype Name |
|---|---|---|---|---|---|---|---|---|
| | | | | SetOf-BooksCur-rencyA-mount 76090 | | | 0..1 76092 | Amount 76094 |
| | | | | HardCur-rencyA-mount 76096 | | | 0..1 76098 | Amount 76100 |
| | | | | Index-BasedCur-rencyA-mount 76102 | | | 0..1 76104 | Amount 76106 |
| Account-ingCod-ingBlock-Assign-ment 76108 | | | | Account-ingCod-ingBlock-Assign-ment 76110 | | | 0..n 76112 | Account-ingCod-ingBlock-Assign-ment 76114 |
| | | | | ItemNote 76116 | | | 0..1 76118 | SHORT_Note 76120 |

FIG. 76-5

| Package | Level1 | Level2 | Level3 | Level4 | Level5 | Level6 | Cardinality | Datatype Name |
|---|---|---|---|---|---|---|---|---|
| | | | | DueItem 76122 | | | 0..1 76124 | OpenItemAccountingNotification-DueItem 76126 |
| Party 76128 | | | | | DebtorParty 76130 | | 0..1 76132 | BusinessTransactionDocumentParty 76134 |
| | | | | | | InternalID 76136 | 1 76138 | Party-InternalID 76140 |
| | | | | | CreditorParty 76142 | | 0..1 76144 | BusinessTransactionDocumentParty 76146 |
| | | | | | | InternalID 76148 | 1 76150 | Party-InternalID 76152 |

FIG. 76-6

| Package | Level1 | Level2 | Level3 | Level4 | Level5 | Level6 | Cardinality | Datatype Name |
|---|---|---|---|---|---|---|---|---|
| | | | | | TradeReceivablesPayablesRegisterItemTypeCode 76154 | | 0..1 76156 | TradeReceivablesPayablesRegisterItemTypeCode 76158 |
| | | | | | AccountsReceivableDueItemTypeCode 76160 | | 0..1 76162 | AccountsReceivableDueItemTypeCode 76164 |
| | | | | | AccountsPayableDueItemTypeCode 76166 | | 0..1 76168 | AccountsPayableDueItemTypeCode 76170 |
| | | | | | DueDate 76172 | | 0..1 76174 | Date 76176 |

FIG. 76-7

| Package | Level1 | Level2 | Level3 | Level4 | Level5 | Level6 | Cardinality | Datatype Name |
|---|---|---|---|---|---|---|---|---|
| DueItem-Schedule 76178 | | | | | Schedule 76180 | | 0..n 76182 | OpenItemAccountingNotification-DueItem-Schedule 76184 |
| | | | | | | DueDate 76186 | 1 76188 | Date 76190 |
| | | | | | | TransactionCurrencyAmount 76192 | 1 76194 | Amount 76196 |
| | | | | ProductTaxItem 76198 | | | 0..1 76200 | OpenItemAccountingNotificationProductTaxItem 76202 |

FIG. 76-8

| Package | Level1 | Level2 | Level3 | Level4 | Level5 | Level6 | Cardinality | Datatype Name |
|---|---|---|---|---|---|---|---|---|
| | | | | | TaxDeclarationTaxAmount 76204 | | 0..1 76206 | Amount 76208 |
| Tax 76210 | | | | | ProductTax 76212 | | 1 76214 | ProductTax 76216 |
| | | | | | | CountryCode 76218 | 1 76220 | CountryCode 76222 |
| | | | | | | EventTypeCode 76224 | 1 76226 | ProductTaxEventTypeCode 76228 |
| | | | | | | TypeCode 76230 | 1 76232 | TaxTypeCode 76234 |
| | | | | | | RateTypeCode 76236 | 1 76238 | TaxRateTypeCode 76240 |

FIG. 76-9

| Package | Level1 | Level2 | Level3 | Level4 | Level5 | Level6 | Cardinality | Datatype Name |
|---|---|---|---|---|---|---|---|---|
| | | | | | | DueCategoryCode 76242 | 1 76244 | DueCategoryCode 76246 |
| | | | | | | DeferredIndicator 76248 | 0..1 76250 | TaxDeferredIndicator 76252 |
| | | | | | | RegionCode 76254 | 0..1 76256 | RegionCode 76258 |
| | | | | WithholdingTaxItem 76260 | | | 0..1 76262 | OpenItemAccountingNotificationWithholdingTaxItem 76264 |
| | | | | | TaxDeclarationTaxAmount 76266 | | 0..1 76268 | Amount 76270 |

FIG. 76-10

| Package | Level1 | Level2 | Level3 | Level4 | Level5 | Level6 | Cardinality | Datatype Name |
|---|---|---|---|---|---|---|---|---|
| Tax 76272 | | | | | Withhold-ingTax 76274 | | 1 76276 | Withhold-ingTax 76278 |
| | | | | | | Country-Code 76280 | 1 76282 | Country-Code 76284 |
| | | | | | | Event-TypeCode 76286 | 1 76288 | With-holding-TaxEvent TypeCode 76290 |
| | | | | | | TypeCode 76292 | 1 76294 | TaxType-Code 76296 |
| | | | | | | RateType Code 76298 | 1 76300 | TaxRateT ypeCode 76302 |
| | | | | | | Region-Code 76304 | 0..1 76306 | Region-Code 76308 |

FIG. 76-11

| Package | Level1 | Level2 | Level3 | Level4 | Level5 | Level6 | Cardinality | Datatype Name |
|---|---|---|---|---|---|---|---|---|
| | | | | CashItem 76310 | | | 0..1 76312 | Paymen-tAccount-ingTrans-mission-Request-CashItem 76314 |
| Party 76316 | | | | | House-Bank 76318 | | 0..1 76320 | Business-Transac-tionDocu-mentParty 76322 |
| | | | | | | InternalID 76324 | 1 76326 | Party-InternalID 76328 |
| | | | | | Paymen-tRegister-Item-TypeCode 76330 | | 1 76332 | Paymen-tRegister-Item-TypeCode 76334 |

FIG. 76-12

| Package | | | | | | Level1 | Level2 | Level3 | Level4 | Level5 | Level6 | Cardinality | Datatype Name |
|---|---|---|---|---|---|---|---|---|---|---|---|---|---|
| | | | | | | | | | | Payment-Form-Code 76336 | | 0..1 76338 | Payment-FormCode 76340 |

FIG. 77-1

| Package | Level 1 | Level 2 | Level 3 | Level 4 | Level 5 | Level 6 | Cardinality | Datatype Name |
|---|---|---|---|---|---|---|---|---|
| PaymentAccountingNotification-Message 77000 | Paymen-tAccount-ingMes-sage 77002 | | | | | | | Paymen-tAccount-ingNotifi-cation-Message 77004 |
| MessageHeader 77006 | | Message Header 77008 | | | | | 0..1 77010 | Business-Docu-mentMes-sage-Header 77012 |
| | | | ID 77014 | | | | 1 77016 | Business-Docu-mentMes-sageID 77018 |

FIG. 77-2

| Package | | Level 1 | Level 2 | Level 3 | Level 4 | Level 5 | Level 6 | Cardinality | Datatype Name |
|---|---|---|---|---|---|---|---|---|---|
| | | | | CreationDateTime 77020 | | | | 1 77022 | DateTime 77024 |
| | | | | …. 77026 | | | | …. 77028 | …. 77030 |
| | PaymentAccountingNotification 77032 | | PaymentAccountingNotification 77034 | | | | | 1 77036 | PaymentAccountingNotification 77038 |
| | | | | BaseBusinessTransactionDocumentID 77040 | | | | 1 77042 | BusinessTransactionDocumentID 77044 |

FIG. 77-3

| Package | Level 1 | Level 2 | Level 3 | Level 4 | Level 5 | Level 6 | Cardinality | Datatype Name |
|---|---|---|---|---|---|---|---|---|
| | | | BaseBusiness-Transac-tionDocu-ment-Type-Code 77046 | | | | 1 77048 | Business-Transac-tion-Document TypeCode 77050 |
| | | | Busi-nessProcess Variant-Type-Code 77052 | | | | 1 77054 | Busi-nessProc-essVari-antType-Code 77056 |
| | | | Account-ing-Transac-tionDate 77058 | | | | 1 77060 | Date 77062 |

FIG. 77-4

| Package | Level 1 | Level 2 | Level 3 | Level 4 | Level 5 | Level 6 | Cardinality | Datatype Name |
|---|---|---|---|---|---|---|---|---|
| | | | Docu-mentDate 77064 | | | | 1 77066 | Date 77068 |
| | | | Com-panyID 77070 | | | | 1 77072 | Com-panyID 77074 |
| | | | Transac-tionCur-rency-Code 77076 | | | | 1 77078 | Cur-rencyCod e 77080 |
| | | | Note 77082 | | | | 0..1 77084 | Note 77086 |
| Item 77088 | | | Item 77090 | | | | 0..n 77092 | Paymen-tAccount-ingNotifi-cationItem 77094 |

FIG. 77-5

| Package | Level 1 | Level 2 | Level 3 | Level 4 | Level 5 | Level 6 | Cardinality | Datatype Name |
|---|---|---|---|---|---|---|---|---|
| | | | | ID 77096 | | | 1 77098 | BusinessTransactionDocumentItemID 77100 |
| | | | | TransactionCurrencyAmount 77102 | | | 1 77104 | Amount 77106 |
| | | | | CashItem JGAK108 | | | 0..1 77110 | PaymentAccountingNotificationCashItem 77112 |

FIG. 77-6

| Package | Level 1 | Level 2 | Level 3 | Level 4 | Level 5 | Level 6 | Cardinality | Datatype Name |
|---|---|---|---|---|---|---|---|---|
| | | | | | Paymen-tRegister-ItemType Code 77114 | | 1 77116 | Paymen-tRegister-Item-TypeCode 77118 |
| | | | | | Pay-mentFor mCode 77120 | | 0..1 77122 | Payment-FormCode 77124 |
| | | | | | House-BankAc-count-Type-Code 77126 | | 0..1 77128 | BankAc-count-TypeCode 77130 |

FIG. 77-7

| Package | Level 1 | Level 2 | Level 3 | Level 4 | Level 5 | Level 6 | Cardinality | Datatype Name |
|---|---|---|---|---|---|---|---|---|
| Party 77132 | | | | | House-Bank 77134 | | 0..1 77136 | Business-Transac-tion-Document Party 77138 |
| | | | | | | InternalID 77140 | 1 77142 | Party-InternalID 77144 |
| | | | | Alloca-tionCa-shItem 77146 | | | 0..1 77148 | Paymen-tAccount-ingNotifi-cationAl-location-CashItem 77150 |
| | | | | | OpenIte-mAmount 77152 | | 0..1 77154 | Amount 77156 |

FIG. 77-8

| Package | | | | | Level 1 | Level 2 | Level 3 | Level 4 | Level 5 | Level 6 | Cardinality | Datatype Name |
|---|---|---|---|---|---|---|---|---|---|---|---|---|
| | | | | Business-Transaction Documen-tReference 77158 | | | | | Paymen-tRefer-ence 77160 | | 1 77162 | Business-Transac-tion-Documen-tRefer-ence 77164 |
| | | | | | | | | | | Business-Transac-tionDocu-mentID 77166 | 1 77168 | Business-Transac-tion-Documen-tID 77170 |
| | | | | | | | | | | Business-Transac-tionDocu-mentItemID 77172 | 0..1 77174 | Business-Transac-tion-Documen-tItemID 77176 |

FIG. 77-9

| Package | Level 1 | Level 2 | Level 3 | Level 4 | Level 5 | Level 6 | Cardinality | Datatype Name |
|---|---|---|---|---|---|---|---|---|
| | | | | DueItem 77178 | | | 0..1 77180 | Paymen-tAccount-ingNotifi-cation-DueItem 77182 |
| | | | | | Type-Code 77184 | | 1 77186 | TradeRe-ceivable-sPay-ablesReg-isterItem-TypeCode 77188 |
| | | | | | DueDate 77190 | | 1 77192 | Date 77194 |

FIG. 77-10

| Package | Level 1 | Level 2 | Level 3 | Level 4 | Level 5 | Level 6 | Cardinality | Datatype Name |
|---|---|---|---|---|---|---|---|---|
| Party 77196 | | | | | DebtorParty 77198 | | 0..1 77200 | BusinessTransactionDocumentParty 77202 |
| | | | | | | InternalID 77204 | 1 77206 | PartyInternalID 77208 |
| | | | | | CreditorParty 77210 | | 0..1 77212 | BusinessTransactionDocumentParty 77214 |
| | | | | | | InternalID 77216 | 1 77218 | PartyInternal 77220 |

FIG. 77-11

| Package | | | | | Level 1 | Level 2 | Level 3 | Level 4 | Level 5 | Level 6 | Cardinality | Datatype Name |
|---|---|---|---|---|---|---|---|---|---|---|---|---|
| | | | | BusinessTransaction DocumentReference 77222 | | | | | PurchaseOrderReference 77224 | | 0..1 77226 | BusinessTransactionDocumentReference 77228 |
| | | | | | | | | | | BusinessTransactionDocumentID 77230 | 1 77232 | BusinessTransactionDocumentID 77234 |
| | | | | | | | | | | BusinessTransactionDocumentItemID 77236 | 0..1 77238 | BusinessTransactionDocumentItemID 77240 |

FIG. 77-12

| Package | Level 1 | Level 2 | Level 3 | Level 4 | Level 5 | Level 6 | Cardinality | Datatype Name |
|---|---|---|---|---|---|---|---|---|
| | | | | | SalesOrder-Reference 77242 | | 0..1 77244 | Business-Transaction-Document-Reference 77246 |
| | | | | | | Business-TransactionDocumentID 77248 | 1 77250 | Business-Transaction-DocumentID 77252 |
| | | | | | | Business-TransactionDocumentItemID 77254 | 0..1 77256 | Business-Transaction-DocumentItemID 77258 |

FIG. 77-13

| Package | Level 1 | Level 2 | Level 3 | Level 4 | Level 5 | Level 6 | Cardinality | Datatype Name |
|---|---|---|---|---|---|---|---|---|
| | | | | | ContractReference 77260 | | 0..1 77262 | BusinessTransactionDocumentReference 77264 |
| | | | | | | BusinessTransactionDocumentID 77266 | 1 77268 | BusinessTransactionDocumentID 77270 |
| | | | | | | BusinessTransactionDocumentItemID 77272 | 0..1 77274 | BusinessTransactionDocumentItemID 77276 |

FIG. 77-14

| Package | Level 1 | Level 2 | Level 3 | Level 4 | Level 5 | Level 6 | Cardinality | Datatype Name |
|---|---|---|---|---|---|---|---|---|
| | | | | Clearing-DueItem 77278 | | | 0..1 77280 | Paymen-tAccount-ingNotifi-cation-Clearing-DueItem 77282 |
| | | | | | OpenIte-mAmount 77284 | | 0..1 77286 | Amount 77288 |
| | | | | | DueClear ingID 77290 | | 0..1 77292 | Business-Transac-tion-Documen-tID 77294 |

FIG. 77-15

| Package | Level 1 | Level 2 | Level 3 | Level 4 | Level 5 | Level 6 | Cardinality | Datatype Name |
|---|---|---|---|---|---|---|---|---|
| Business-Transaction Documen-tReference 77296 | | | | | Cleared-Item-Refer-ence 77298 | | 1 77300 | Business-Transac-tion-Documen-tRefer-ence 77302 |
| | | | | | | Business-Transac-tionDocu-mentID 77304 | 1 77306 | Business-Transac-tion-Documen-tID 77308 |
| | | | | | | Business-Transac-tionDocu-mentItemID 77310 | 0..1 77312 | Business-Transac-tion-Documen-tItemID 77314 |

FIG. 77-16

| Package | Level 1 | Level 2 | Level 3 | Level 4 | Level 5 | Level 6 | Cardinality | Datatype Name |
|---|---|---|---|---|---|---|---|---|
| | | | | ExpenseAndIncomeItem 77316 | | | 0..1 77318 | PaymentAccountingNotificationExpenseAndIncomeItem 77320 |
| | | | | | TypeCode 77322 | | 1 77324 | BusinessTransactionDocumentItemTypeCode 77326 |

FIG. 77-17

| Package | Level 1 | Level 2 | Level 3 | Level 4 | Level 5 | Level 6 | Cardinality | Datatype Name |
|---|---|---|---|---|---|---|---|---|
| | | | | | ProductTax-Business Transaction-DocumentItem-GroupID 77328 | | 0..1 77330 | Business-TransactionD-coumentItem-GroupID 77332 |
| | | | | | PaymentAccount-ingNotificationItemID 77334 | | 0..1 77336 | Business-Transaction-DocumentItemID 77338 |

FIG. 77-18

| Package | | | | | | Level 1 | Level 2 | Level 3 | Level 4 | Level 5 | Level 6 | Cardinality | Datatype Name |
|---|---|---|---|---|---|---|---|---|---|---|---|---|---|
| | | | | | | | | | ProductTaxItem 77340 | | | 0..1 77342 | PaymentAccountingNotification-ProductTaxItem 77344 |
| | | | | | | | | | | PaymentAccountingNotificationItemID 77346 | | 0..1 77348 | BusinessTransaction-DocumentItemID 77350 |
| | | | | | | | | | | TaxDeclarationTaxAmount 77352 | | 0..1 77354 | Amount 77356 |

FIG. 77-19

| Package | Level 1 | Level 2 | Level 3 | Level 4 | Level 5 | Level 6 | Cardinality | Datatype Name |
|---|---|---|---|---|---|---|---|---|
| | | | | | TaxDeclarationNonDeductibleAmount 77358 | | 0..1 77360 | Amount 77362 |
| | | | | | TaxAllocationAccountingNotificationItemGroupID 77364 | | 0..1 77366 | BusinessTransactionDocumentItemGroupID 77368 |
| Tax 77370 | | | | | ProductTax 77372 | | 1 77374 | ProductTax 77376 |
| | | | | | | CountryCode 77378 | 1 77380 | CountryCode 77382 |

FIG. 77-20

| Package | Level 1 | Level 2 | Level 3 | Level 4 | Level 5 | Level 6 | Cardinality | Datatype Name |
|---|---|---|---|---|---|---|---|---|
| | | | | | | Event-TypeCode 77384 | 1 77386 | Pro-ductTaxEventType-Code 77388 |
| | | | | | | TypeCode 77390 | 1 77392 | TaxType-Code 77394 |
| | | | | | | RateType-Code 77396 | 1 77398 | TaxRateTypeCode 77400 |
| | | | | | | Amount 77402 | 1 77404 | Amount 77406 |
| | | | | | | NonDe-ductibleA-mount 77408 | 0..1 77410 | Amount 77412 |

FIG. 77-21

| Package | Level 1 | Level 2 | Level 3 | Level 4 | Level 5 | Level 6 | Cardinality | Datatype Name |
|---|---|---|---|---|---|---|---|---|
| | | | | | | BusinessTransactionDocumentItemGroupID 77414 | 0..1 77416 | BusinessTransactionDocumentItemGroupID 77418 |
| | | | | | | DueCategoryCode 77420 | 1 77422 | DueCategoryCode 77424 |
| | | | | | | DeferredIndicator 77426 | 0..1 77428 | TaxDeferredIndicator 77430 |
| | | | | | | RegionCode 77432 | 0..1 77434 | RegionCode 77436 |

FIG. 77-22

| Package | Level 1 | Level 2 | Level 3 | Level 4 | Level 5 | Level 6 | Cardinality | Datatype Name |
|---|---|---|---|---|---|---|---|---|
| | | | | Withhold-ingTax-Item 77438 | | | 0..1 77440 | Paymen-tAccount-ingNotifi-cation-Withhold-ingTax-Item 77442 |
| | | | | | TaxDe-clara-tionTax-Amount 77444 | | 0..1 77446 | Amount 77448 |
| | | | | | TaxAllo-cationAc-count-ingNotifi-catio-nItem-GroupID 77450 | | 0..1 77452 | Business-Transac-tion-Documen-tItem-GroupID 77454 |

FIG. 77-23

| Package | Level 1 | Level 2 | Level 3 | Level 4 | Level 5 | Level 6 | Cardinality | Datatype Name |
|---|---|---|---|---|---|---|---|---|
| Tax 77456 | | | | | Withholding-Tax 77458 | | 1 77460 | Withhold-ingTax 77462 |
| | | | | | | Country-Code 77464 | 1 77466 | Country-Code 77468 |
| | | | | | | Event-TypeCode 77470 | 1 77472 | With-hollding-TaxEvent-TypeCode 77474 |
| | | | | | | TypeCode 77476 | 1 77478 | TaxType-Code 77480 |
| | | | | | | RateType-Code 77482 | 1 77484 | TaxRateT ypeCode 77486 |
| | | | | | | Amount 77488 | 1 77490 | Amount 77492 |

FIG. 77-24

| Package | Level 1 | Level 2 | Level 3 | Level 4 | Level 5 | Level 6 | Cardinality | Datatype Name |
|---|---|---|---|---|---|---|---|---|
| | | | | | | Region-Code 77494 | 0..1 77496 | Region-Code 77498 |
| | | | | Alloca-tionTax-Item 77500 | | | 0..1 77502 | Paymen-tAccount-ingNotifi-cationAl-location-TaxItem 77504 |
| | | | | | TaxDe-clara-tionTax-Amount 77506 | | 0..1 77508 | Amount 77510 |

FIG. 77-25

| Package | Level 1 | Level 2 | Level 3 | Level 4 | Level 5 | Level 6 | Cardinality | Datatype Name |
|---|---|---|---|---|---|---|---|---|
| | | | | | TaxAllocationAccountingNotificationItemGroupID 77512 | | 1 77514 | BusinessTransactionDocumentItemGroupID 77516 |
| BusinessTransactionDocumentReference 77518 | | | | | TaxItemReference 77520 | | 1 77522 | BusinessTransactionDocumentReference 77524 |
| | | | | | | BusinessTransactionDocumentID 77526 | 1 77528 | BusinessTransactionDocumentID 77530 |

FIG. 77-26

| Package | | | | | Level 1 | Level 2 | Level 3 | Level 4 | Level 5 | Level 6 | Cardinality | Datatype Name |
|---|---|---|---|---|---|---|---|---|---|---|---|---|
| | | | | | | | | | | BusinessTransactionDocumentItemID 77532 | 0..1 77534 | Business-Transaction-DocumentItemID 77536 |

FIG. 78-1

| Package | level 1 | level 2 | level 3 | level 4 | Cardinality | Datatype Name |
|---|---|---|---|---|---|---|
| ProdcutionLotAccountingNotification 78000 | ProdcutionLotAccountingNotification 78002 | | | | | ProductionLotAccountingNotification 78004 |
| MessageHeader 78006 | | MessageHeader 78008 | | | 1 78010 | BusinessDocumentMessageHeader 78012 |
| | | | ID 78014 | | 1 78016 | BusinessDocumentMessageID 78018 |
| | | | CreationDateTime 78020 | | 1 78022 | DateTime 78024 |
| | | | SenderParty 78026 | | 0..1 78028 | BusinessDocumentMessageHeaderParty 78030 |
| | | | ReceiverParty 78032 | | 0..1 78034 | BusinessDocumentMessageHeaderParty 78036 |

FIG. 78-2

| Package | level 1 | level 2 | level 3 | level 4 | Cardinality | Datatype Name |
|---|---|---|---|---|---|---|
| ProductionLotAccountingNotification 78038 | | ProductionLotAccountingNotification 78040 | | | 1 78042 | ProductionLotNotification 78044 |
| | | | ProductionLotID 78046 | | 1 78048 | BusinessTransactionDocumentID 78050 |
| | | | LifeCycleStatus 78052 | | 1 78054 | LifeCycleStatusCode 78056 |
| | | | StatusChangeDateTime 78058 | | 1 78060 | DateTime 78062 |
| | | | Company 78064 | | 1 78066 | OrganisationalCentreID 78068 |
| | | | ProductionCentre 78070 | | 1 78072 | OrganisationalCentreID 78074 |

FIG. 78-3

| | | Package | level 1 | level 2 | level 3 | level 4 | Cardinality | Datatype Name |
|---|---|---|---|---|---|---|---|---|
| | | ExpectedMaterialOutput 78076 | | | Expected-Materia-lOutput 78078 | | 1..n 78080 | ExpectedMaterialOutput 78082 |
| | | | | | | Material-RoleCode 78084 | 1 78086 | MaterialRoleCode 78088 |
| | | | | | | Perma-nentEstab-lishment 78090 | 1 78092 | OrganisationalCentreID 78094 |
| | | | | | | Material 78096 | 1 78098 | BusinessTransactionDocumen-tID 78100 |
| | | | | | | Expected-Quantity 78102 | 1 78104 | Quantity 78106 |

FIG. 79-1

| Package | level 1 | level 2 | level 3 | level 4 | Cardinality | Datatype Name |
|---|---|---|---|---|---|---|
| ProjectAccountingNotificationMessage 79000 | ProjectAccountingNotification-Message 79002 | | | | 1 79004 | ProjectAccountingNotificationMessage 79006 |
| MessageHeader 79008 | | MessageHeader 79010 | | | 1 79012 | BusinessDocumentMessageHeader 79014 |
| Project 79016 | | Project 79018 | | | 1 79020 | ProjectAccountingNotificationProject 79022 |
| | | | ProjectUUID 79024 | | 1 79026 | UUID 79028 |
| | | | ProjectID 79030 | | 1 79032 | ProjectID 79034 |
| | | | @TaskListCompleteTransmissionIndicator 79036 | | 1 79038 | CompleteTransmisionIndicator 79040 |

FIG. 79-2

| Package | | | | level 1 | level 2 | level 3 | level 4 | Cardinality | Datatype Name |
|---|---|---|---|---|---|---|---|---|---|
| | | | | | | Busi-nessProc-essVariant-TypeCode 79042 | | 1 79044 | BusinessProcessVariant-TypeCode 79046 |
| | | | | | | CompanyID 79048 | | 1 79050 | CompanyID 79052 |
| | | | | | | Request-ingCost-CentreID 79054 | | 1 79056 | CostCentreID 79058 |
| | | | | | | Responsi-bleCost-CentreID 79060 | | 1 79062 | CostCentreID 79064 |
| | | | | | | @ActionCo de 79066 | | 1 79068 | ActionCode 79070 |
| | | Task 79072 | | | | Task 79074 | | 1..n 79076 | ProjectAccountingNotifi-cationProjectTask 79078 |

FIG. 79-3

| Package | | | | level 1 | level 2 | level 3 | level 4 | Cardinality | Datatype Name |
|---|---|---|---|---|---|---|---|---|---|
| | | | | | | | TaskUUID 79080 | 1 79082 | UUID 79084 |
| | | | | | | | TaskID 79086 | 1 79088 | ProjectElementID 79090 |
| | | | | | | | @ActionCode 79092 | 1 79094 | ActionCode 79096 |

FIG. 80-1

| Package | | Level1 | Level2 | Level3 | Level4 | Level5 | Cardinality | Datatype Name |
|---|---|---|---|---|---|---|---|---|
| SalesAndPurchasingAccountingNotificationMessage 80000 | | SalesAndPurchasingAccountingNotificationMessage 80002 | | | | | 1 80004 | SalesAndPurchasingAccountingNotificationMessage 80006 |
| | MessageHeader 80008 | | MessageHeader 80010 | | | | 1 80012 | BusinessDocumentMessageHeader 80014 |
| | | | | ID 80016 | | | 1 80018 | BusinessDocumentMessageID 80020 |
| | | | | CreationDateTime 80022 | | | 1 80024 | DateTime 80026 |
| | | | | .... 80028 | | | .... 80030 | .... 80032 |

FIG. 80-2

| Package | | Level1 | Level2 | Level3 | Level4 | Level5 | Cardinality | Datatype Name |
|---|---|---|---|---|---|---|---|---|
| | SalesAndPurchasingAccountingNotification 80034 | | SalesAndPurchasingAccountingNotification 80036 | | | | 1 80038 | SalesAndPurchasingAccountingNotification 80040 |
| | | | | BaseOrderID 80042 | | | 1 80044 | BusinessTransactionDocumentID 80046 |
| | | | | BaseOrderTypeCode 80048 | | | 1 80050 | BusinessTransactionDocumentTypeCode 80052 |
| | | | | BusinessProcessVariantTypeCode 80054 | | | 0..1 80056 | BusinessProcessVariantTypeCode 80058 |

FIG. 80-3

| Package | | | | | Level1 | Level2 | Level3 | Level4 | Level5 | Cardinality | Datatype Name |
|---|---|---|---|---|---|---|---|---|---|---|---|
| | | | | | | | AccountingTransactionDate 80060 | | | 1 80062 | Date 80064 |
| | | Party 80066 | | | | | CompanyID 80068 | | | 1 80070 | CompanyID 80072 |
| | | | | | | | SalesOrganizationID 80074 | | | 0..1 80076 | OrganisationalCentreID 80078 |
| | | | | | | | ServiceOrganizationID 80080 | | | 0..1 80082 | OrganisationalCentreID 80084 |
| | | | | | | | DebtorParty 80086 | | | 0..1 80088 | BusinessTransactionDocumentParty 80090 |
| | | | | | | | | InternalID 80092 | | 1 80094 | PartyInternalID 80096 |

FIG. 80-4

| Package | | | | | Level1 | Level2 | Level3 | Level4 | Level5 | Cardinality | Datatype Name |
|---|---|---|---|---|---|---|---|---|---|---|---|
| | | | | | | | CreditorParty 80098 | | | 0..1 80100 | BusinessTransactionDocumentParty 80102 |
| | | | | | | | | InternalID 80104 | | 1 80106 | PartyInternalID 80108 |
| | | Item 80110 | | | | | SalesItem 80112 | | | 0..n 80114 | SalesAndPurchasingAccountingNotificationSalesItem 80116 |
| | | | | | | | | BaseOrderItemID 80118 | | 1 80120 | BusinessTransactionDocumentItemID 80122 |

FIG. 80-5

| Package | | | | | Level1 | Level2 | Level3 | Level4 | Level5 | Cardinality | Datatype Name |
|---|---|---|---|---|---|---|---|---|---|---|---|
| | | | | | | | | BaseOrderItemTypeCode 80124 | | 1 80126 | BusinessTransactionDocumentItemTypeCode 80128 |
| | | | | | | | | ParentItemID 80130 | | 0..1 80132 | BusinessTransactionDocumentItemID 80134 |
| | | | | | | | | OrderQuantity 80136 | | 1 80138 | Quantity 80140 |
| | | | | | | | | ValuationQuantity 80142 | | 1 80144 | Quantity 80146 |
| | | | | | | | | OrderItemCompletedIndicator 80148 | | 0..1 80150 | Indicator;Qualifier:Completed 80152 |

FIG. 80-6

| Package | | | | | Level1 | Level2 | Level3 | Level4 | Level5 | Cardinality | Datatype Name |
|---|---|---|---|---|---|---|---|---|---|---|---|
| | | | | | | | | OrderItemCancelledIndicator 80154 | | 0..1 80156 | Indicator;Qualifier:Cancelled 80158 |
| | | | Product 80160 | | | | | Product 80162 | | 1 80164 | BusinessTransactionDocumentProduct 80166 |
| | | | | | | | | | InternalID 80168 | 1 80170 | ProductInternalID 80172 |
| | | | | | | | | | TypeCode 80174 | 1 80176 | ProductTypeCode 80178 |
| | | | BusinessTransactionDocumentReference 80180 | | | | | SalesOrderReference 80182 | | 0..1 80184 | BusinessTransactionDocumentReference 80186 |

FIG. 80-7

| Package | | | | Level1 | Level2 | Level3 | Level4 | Level5 | Cardinality | Datatype Name |
|---|---|---|---|---|---|---|---|---|---|---|
| | | | | | | | ServiceOrderReference 80188 | | 0..1 80190 | BusinessTransactionDocumentReference 80192 |
| | | | | | | | ServiceContractReference 80194 | | 0..1 80196 | BusinessTransactionDocumentReference 80198 |
| | | | | | | | ServiceRequestReference 80200 | | 0..1 80202 | BusinessTransactionDocumentReference 80204 |

FIG. 80-8

| Package | | | | Level1 | Level2 | Level3 | Level4 | Level5 | Cardinality | Datatype Name |
|---|---|---|---|---|---|---|---|---|---|---|
| | | | PriceInformation 80206 | | | | SalesPricingItem 80208 | | 0..n 80210 | SalesAndPurchasingAccountingNotificationSalesItemSalesPricingItem 80212 |
| | | | | | | | | Amount 80214 | 1 80216 | Amount 80218 |
| | | | | | | | | PriceSpecificationElementPurposeGroupCode 80220 | 1 80222 | PriceSpecificationElementPurposeGroupCode 80224 |
| | | | | | | PurchasingItem 80226 | | | 0..n 80228 | SalesAndPurchasingAccountingNotificationPurchasingItem 80230 |

FIG. 80-9

| Package | | | | | Level1 | Level2 | Level3 | Level4 | Level5 | Cardinality | Datatype Name |
|---|---|---|---|---|---|---|---|---|---|---|---|
| | | | | | | | | BaseOrderItemID 80232 | | 1 80234 | BusinessTransactionDocumentItemID 80236 |
| | | | | | | | | BaseOrderItemTypeCode 80238 | | 1 80240 | BusinessTransactionDocumentItemTypeCode 80242 |
| | | | | | | | | OrderQuantity 80244 | | 1 80246 | Quantity 80248 |
| | | | | | | | | FollowUpDeliveryRequirementCode 80250 | | 1 80252 | FollowUpBusinessTransactionDocumentRequirementCode 80254 |

FIG. 80-10

| Package | | | | | Level1 | Level2 | Level3 | Level4 | Level5 | Cardinality | Datatype Name |
|---|---|---|---|---|---|---|---|---|---|---|---|
| | | | | | | | | FollowUpInvoiceAccountingRequirementCode 80256 | | 1 80258 | FollowUpBusinessTransactionDocumentRequirementCode 80260 |
| | | | | | | | | DeliveryCompletedIndicator 80262 | | 0..1 80264 | Indicator;Qualifier:Completed 80266 |
| | | | | | | | | SupplierInvoiceCompletedIndicator 80268 | | 0..1 80270 | Indicator;Qualifier:Completed 80272 |
| | | | | | | | | OrderItemCancelledIndicator 80274 | | 0..1 80276 | Indicator;Qualifier:Cancelled 80278 |

FIG. 80-11

| Package | | | | | Level1 | Level2 | Level3 | Level4 | Level5 | Cardinality | Datatype Name |
|---|---|---|---|---|---|---|---|---|---|---|---|
| | | | | | | | | NetUnitPrice 80280 | | 1 80282 | Price 80284 |
| | | | Product 80286 | | | | | Product 80288 | | 1 80290 | BusinessTransactionDocumentProduct 80292 |
| | | | | | | | | | InternalID 80294 | 1 80296 | ProductInternalID 80298 |
| | | | | | | | | | TypeCode 80300 | 1 80302 | ProductTypeCode 80304 |
| | | | | | | | | ProductCategory 80306 | | 1 80308 | BusinessTransactionDocumentProductCategory 80310 |

FIG. 80-12

| Package | | | | | Level1 | Level2 | Level3 | Level4 | Level5 | Cardi-nality | Datatype Name |
|---|---|---|---|---|---|---|---|---|---|---|---|
| | | | | | | | | | InternalID 80312 | 1 80314 | Product-InternalID 80316 |
| | | | Accounting-CodingBlock-Distribution 80318 | | | | | Accountin-gObjectSe-tAssign-ment 80320 | | 0..1 80322 | Accountin-gObjectSe-tAssign-ment 80324 |

FIG. 81-1

| Package | level1 | level2 | level3 | Cardinality | Datatype Name |
|---|---|---|---|---|---|
| ServiceProvisionAccountingNotificationMessage 81000 | | | | | ServiceProvisionAccountingMessage 81002 |
| MessageHeader 81004 | MessageHeader 81006 | | | 1 81008 | MessageHeader 81010 |
| | | ID 81012 | | 1 81014 | BusinessDocumentMessageID 81016 |
| | | CreationDateTime 81018 | | 1 81020 | DateTime 81022 |
| | | SenderParty 81024 | | 0..1 81026 | BusinessDocumentMessageHeaderParty 81028 |
| | | RecipientParty 81030 | | 0..n 81032 | BusinessDocumentMessageHeaderParty 81034 |

FIG. 81-2

| | Package | | | level1 | level2 | level3 | Cardinal-ity | Datatype Name |
|---|---|---|---|---|---|---|---|---|
| | ServiceProvisionAccountingNotification 81036 | | | Service-Provi-sionAc-count-ingNotifi-cation 81038 | | | 1 81040 | |
| | | | | | Base-Business-Transac-tion-Documen-tID 81042 | | 1 81044 | BusinessTransactionDocumentID 81046 |
| | | | | | Base-Business-Transac-tionDocu-ment-TypeCode 81048 | | 1 81050 | BusinessTransactionDocument-TypeCode 81052 |

FIG. 81-3

| | Package | | | level1 | level2 | level3 | Cardinality | Datatype Name |
|---|---|---|---|---|---|---|---|---|
| | | | | | BusinessProcessVariantTypeCode 81054 | | 0..1 81056 | BusinessProcessVariantTypeCode 81058 |
| | | | | | AccountingTransactionDate 81060 | | 1 81062 | Date 81064 |
| | | | | | DocumentDate 81066 | | 0..1 81068 | Date 81070 |
| | | | | | Note 81072 | | 0..1 81074 | Note 81076 |
| | | | | | CompanyID 81078 | | 1 81080 | CompanyID 81082 |
| | | Item 81084 | | | Item 81086 | | 1..n 81088 | |

FIG. 81-4

| | Package | | | level1 | level2 | level3 | Cardinal-ity | Datatype Name |
|---|---|---|---|---|---|---|---|---|
| | | | | | | ID 81090 | 1 81092 | BusinessTransactionDocumen-tItemID 81094 |
| | | | | | | ItemNote 81096 | 0..1 81098 | Note 81100 |
| | | | | | | Service-Working-Condition-sCode 81102 | 0..1 81104 | ServiceWorkingConditionsCode 81106 |
| | | | | | | ServicePro-ductID 81108 | 1 81110 | ProductID 81112 |
| | | | | | | ServicePro-ductQuan-tity 81114 | 1 81116 | Quantity 81118 |
| | | | | | | ResourceID 81120 | 1 81122 | ResourceID 81124 |

FIG. 81-5

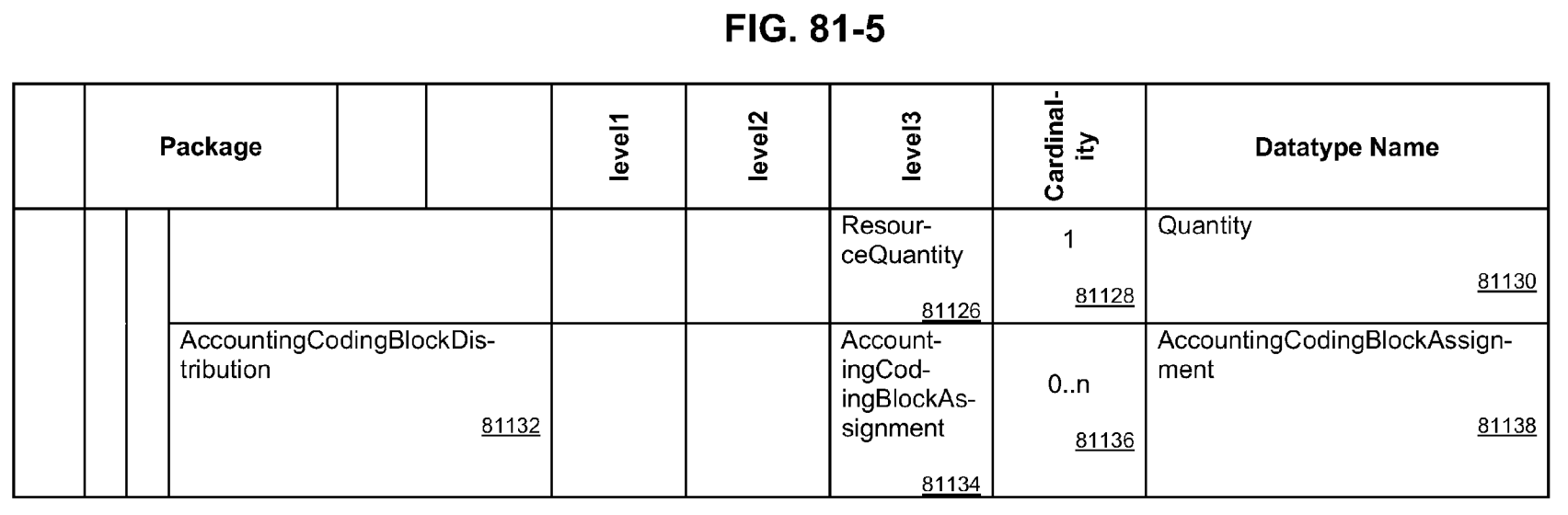

| | Package | | | level1 | level2 | level3 | Cardinal-ity | Datatype Name |
|---|---|---|---|---|---|---|---|---|
| | | | | | | Resour-ceQuantity 81126 | 1 81128 | Quantity 81130 |
| | AccountingCodingBlockDis-tribution 81132 | | | | | Account-ingCod-ingBlockAs-signment 81134 | 0..n 81136 | AccountingCodingBlockAssign-ment 81138 |

FIG. 83-1

| Package | Level1 | Level2 | Level3 | Cardinality | Datatype Name |
|---|---|---|---|---|---|
| AccountsPayableLedgerAccountTransmitRequestMessage 83000 | Ac-countsPay-ableLedger Account-Transmi-tRequest-Message 83002 | | | | Ac-countsPay-ableLedger Account-Transmi-tRequest-Message 83004 |
| MessageHeader 83006 | | Message-Header 83008 | | 0..1 83010 | Business-Document-Message-Header 83012 |
| | | | ID 83014 | 1 83016 | Business-Document-MessageID 83018 |
| | | | Creation-DateTime 83020 | 1 83022 | DateTime 83024 |
| | | | .... 83026 | .... 83028 | .... 83030 |

FIG. 83-2

| Package | Level1 | Level2 | Level3 | Cardinality | Datatype Name |
|---|---|---|---|---|---|
| AccountsPayableLedgerAccountTransmitRequest 83032 | | Ac-countsPay-ableLedger Account-Transmi-tRequest 83034 | | 1 83036 | Ac-countsPay-ableLedger Account-Transmi-tRequest 83038 |
| | | | @actionCode 83040 | 1 83042 | ActionCode 83044 |
| | | | CompanyID 83046 | 1 83048 | Organisa-tionalCen-treID 83050 |
| | | | Business-PartnerID 83052 | 1 83054 | Business-PartnerID 83056 |
| | | | AccountDeter-minationCredi-torGroupCode 83058 | 1 83060 | AccountDe-termination-Creditor-GroupCode 83062 |

FIG. 84-1

| Package | | Level1 | Level2 | Level3 | Cardinality | Datatype Name |
|---|---|---|---|---|---|---|
| AccountsReceivableLedgerAccountTransmitRequestMessage 84000 | | Accounts-Receiv-ableLedg erAccount Transmi-tRequest-Message 84002 | | | | Accounts-Receiv-ableLedge rAccount-Transmi-tRequest-Message 84004 |
| | MessageHeader 84006 | | Message-Header 84008 | | 0..1 84010 | Business-Docu-mentMes-sage-Header 84012 |
| | | | | ID 84014 | 1 84016 | Business-Docu-mentMes-sageID 84018 |

FIG. 84-2

| Package | | Level1 | Level2 | Level3 | Cardinality | Datatype Name |
|---|---|---|---|---|---|---|
| | | | | Creation-DateTime 84020 | 1 84022 | DateTime 84024 |
| | | | | .... 84026 | .... 84028 | .... 84030 |
| | AccountsReceivableLedgerAccountTransmitRequest 84032 | | Accounts-Receiv-ableLedgerAccount-Transmi-tRequest 84034 | | 1 84036 | Accounts-Receiv-ableLedgerAccount-Transmi-tRequest 84038 |
| | | | | @actionCode 84040 | 1 84042 | Action-Code 84044 |
| | | | | Com-panyID 84046 | 1 84048 | Organisa-tionalCen-treID 84050 |

FIG. 84-3

| Package | | | | | | Level1 | Level2 | Level3 | Cardinality | Datatype Name |
|---|---|---|---|---|---|---|---|---|---|---|
| | | | | | | | | Business-PartnerID 84052 | 1 84054 | Business-PartnerID 84056 |
| | | | | | | | | Account-Determi-nation-Debtor-Group-Code 84058 | 1 84060 | Account-Determi-nation-Debtor-Group-Code 84062 |

FIG. 87-1

| Package | level1 | level2 | level3 | level4 | Cardinality | Datatype Name |
|---|---|---|---|---|---|---|
| BalanceSheetAndIncomeStatementMessage 87000 | FormBalanceSheetAndIncomingStatementMessage 87002 | | | | | FormBalanceSheetAndIncomeStatementMessage 87004 |
| MessageHeader 87006 | | MessageHeader 87008 | | | 1 87010 | BusinessDocumentMessageHeader 87012 |
| | | | ID 87014 | | 1 87016 | BusinessDocumentMessageID 87018 |
| | | | CreationDateTime 87020 | | 1 87022 | DateTime 87024 |

FIG. 87-2

| Package | level1 | level2 | level3 | level4 | Cardinality | Datatype Name |
|---|---|---|---|---|---|---|
| FormBalanceSheetAndIncomingStatement 87026 | | FormBalanceSheetAndIncomingStatement 87028 | | | 1 87030 | FormBalanceSheetAndIncomingStatement 87032 |
| | | | CompanyID 87034 | | 1 87036 | OrganisationalCentreID 87038 |
| | | | SetOfBooksID 87040 | | 1 87042 | SetOfBooksID 87044 |
| | | | AccountingPeriodID 87046 | | 1 87048 | AccountingPeriodID 87050 |
| | | | FiscalYearValue 87052 | | 1 87054 | FiscalYearValue 87056 |

FIG. 87-3

| Package | level1 | level2 | level3 | level4 | Cardinality | Datatype Name |
|---|---|---|---|---|---|---|
| | | | ComparisonAccountingPeriodID 87058 | | 1 87060 | AccountingPeriodID 87062 |
| | | | ComparisonFiscalYearValue 87064 | | 1 87066 | FiscalYearValue 87068 |
| | | | TypeCode 87070 | | 1 87072 | BalanceSheetAndIncomeStatementReportTypeCode 87074 |
| Items 87076 | | | AssetsItem 87078 | | 1..n 87080 | FormBalanceSheetAndIncomingStatementAssetsItem 87082 |
| | | | | LevelValue 87084 | 1 87086 | BalanceSheetAndIncomeStatementHierarchyLevelValue 87088 |

FIG. 87-4

| Package | | | | level1 | level2 | level3 | level4 | Cardinality | Datatype Name |
|---|---|---|---|---|---|---|---|---|---|
| | | | | | | | Text 87090 | 1 87092 | Text 87094 |
| | | | | | | | Amount 87096 | 0..1 87098 | Amount 87100 |
| | | | | | | | Compari-sonAmount 87102 | 0..1 87104 | Amount 87106 |
| | | | | | | | Absolute-Differ-enceA-mount 87108 | 0..1 87110 | Amount 87112 |
| | | | | | | | Rela-tiveDiffer-encePer-cent 87114 | 0..1 87116 | Percent 87118 |

FIG. 87-5

| Package | | | | level1 | level2 | level3 | level4 | Cardinality | Datatype Name |
|---|---|---|---|---|---|---|---|---|---|
| | | | | | | | FromSummationExcludedIndicator 87120 | 0..1 87122 | Indicator 87124 |
| | | | | | | EquityAndLiabilitiesItem 87126 | | 1..n 87128 | FormBalanceSheetAndIncomingStatementEquityAndLiabilitiesItem 87130 |
| | | | | | | | LevelValue 87132 | 1 87134 | BalanceSheetAndIncomeStatementHierarchyLevelValue 87136 |
| | | | | | | | Text 87138 | 1 87140 | Text 87142 |
| | | | | | | | Amount 87144 | 0..1 87146 | Amount 87148 |

FIG. 87-6

| Package | | | | level1 | level2 | level3 | level4 | Cardinality | Datatype Name |
|---|---|---|---|---|---|---|---|---|---|
| | | | | | | | ComparisonAmount 87150 | 0..1 87152 | Amount 87154 |
| | | | | | | | AbsoluteDifferenceAmount 87156 | 0..1 87158 | Amount 87160 |
| | | | | | | | RelativeDifferencePercent 87162 | 0..1 87164 | Percent 87166 |
| | | | | | | | FromSummationExcludedIndicator 87168 | 0..1 87170 | Indicator 87172 |

FIG. 87-7

| Package | | | | level1 | level2 | level3 | level4 | Cardinality | Datatype Name |
|---|---|---|---|---|---|---|---|---|---|
| | | | | | | Inco-meState mentItem 87174 | | 1..n 87176 | FormBalanceSheetAndIn-comingStatementIn-comeStatementItem 87178 |
| | | | | | | | Level-Value 87180 | 1 87182 | BalanceSheetAndIn-comeStatementHierar-chyLevelValue 87184 |
| | | | | | | | Text 87186 | 1 87188 | Text 87190 |
| | | | | | | | Amount 87192 | 0..1 87194 | Amount 87196 |
| | | | | | | | Compari-sonAmou nt 87198 | 0..1 87200 | Amount 87202 |
| | | | | | | | Absolute-Differ-enceA-mount 87204 | 0..1 87206 | Amount 87208 |

FIG. 87-8

| Package | | | | level1 | level2 | level3 | level4 | Cardinality | Datatype Name |
|---|---|---|---|---|---|---|---|---|---|
| | | | | | | | RelativeDifferencePercent 87210 | 0..1 87212 | Percent 87214 |
| | | | | | | | FromSummationExcludedIndicator 87216 | 0..1 87218 | Indicator 87220 |

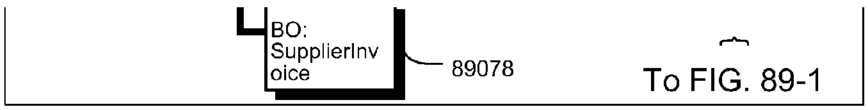
To FIG. 89-1
To FIG. 89-5 }
FIG. 89-4
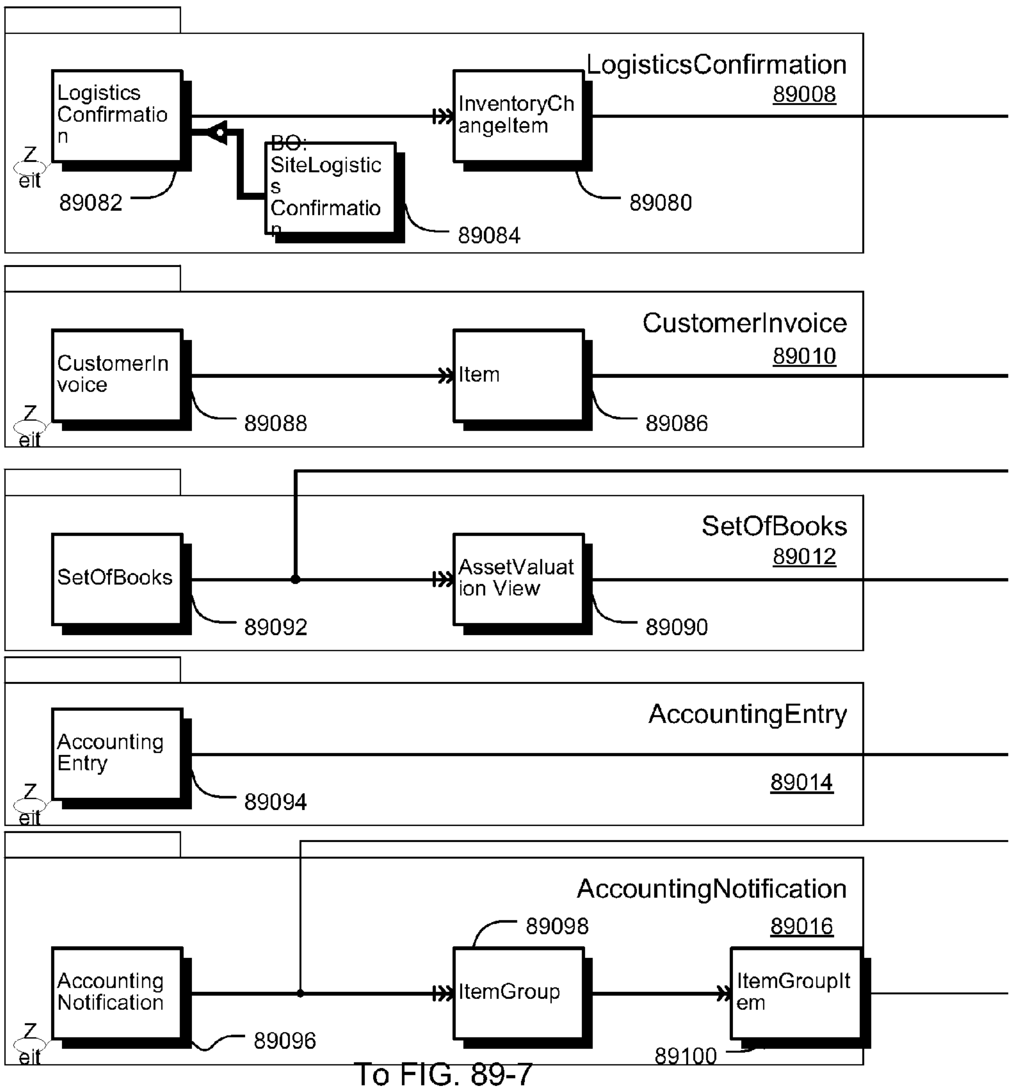
To FIG. 89-7

| Package | | Level1 | Level2 | Level3 | Level4 | Level5 | Level6 | Level7 | Cardinality | Datatype Name |
|---|---|---|---|---|---|---|---|---|---|---|
| FixedAssetMigrateRequestnMessage 90000 | | FixedAssetMigrateRequestMessage 90002 | | | | | | | | FixedAssetMigrateRequestMessage 90004 |
| | MessageHeader 90006 | | MessageHeader 90008 | | | | | | 0..1 90010 | BusinessDocumentMessageHeader 90012 |
| | | | | ID 90014 | | | | | 1 90016 | BusinessDocumentMessageID 90018 |
| | | | | CreationDateTime 90020 | | | | | 1 90022 | DateTime 90024 |

FIG. 90-2

| Package | | Level1 | Level2 | Level3 | Level4 | Level5 | Level6 | Level7 | Cardinality | Datatype Name |
|---|---|---|---|---|---|---|---|---|---|---|
| | FixedAssetMigrateRequest 90032 | | FixedAssetMigrateRequest 90034 | | | | | | 1 90036 | FixedAssetMigrateRequest 90038 |
| | | | | FixedAssetCompanyID 90040 | | | | | 1 90042 | OrganisationalCentreID 90044 |
| | | | | FixedAssetClassCode 90046 | | | | | 1 90048 | FixedAssetClassCode 90050 |
| | | | | FixedAssetName 90052 | | | | | 1 90054 | LANGUAGEINDEPENDENT_MEDIUM_Name 90056 |

FIG. 90-3

| Package | | Level1 | Level2 | Level3 | Level4 | Level5 | Level6 | Level7 | Cardinality | Datatype Name |
|---|---|---|---|---|---|---|---|---|---|---|
| | | | | AssociatedIndividualMaterial 90058 | | | | | 1..n 90060 | FixedAssetMigrateRequestAssociatedIndividualMaterial 90062 |
| | | | | | IndividualMaterialInventoryID 90064 | | | | 1..n 90066 | IndividualMaterialInventoryID 90068 |
| | | | | | IndividualMaterialID 90070 | | | | 0..n 90072 | IndividualMaterialID 90074 |

FIG. 90-4

| Package | | Level1 | Level2 | Level3 | Level4 | Level5 | Level6 | Level7 | Cardinality | Datatype Name |
|---|---|---|---|---|---|---|---|---|---|---|
| | | | | OrganisationalAssignment 90076 | | | | | 1..n 90078 | FixedAssetMigrateRequestOrganisationalAssignment 90080 |
| | | | | | ValidityPeriod 90082 | | | | 0..n 90084 | Closed_DatePriod 90086 |
| | | | | | SegmentID 90088 | | | | 0..1 90090 | OrganisationalCentreID 90092 |
| | | | | | ProfitCentreID 90094 | | | | 0..1 90096 | OrganisationalCentreID 90098 |
| | | | | | CostCentreID 90100 | | | | 0..1 90102 | OrganisationalCentreID 90104 |

FIG. 90-5

| Package | | Level1 | Level2 | Level3 | Level4 | Level5 | Level6 | Level7 | Cardinality | Datatype Name |
|---|---|---|---|---|---|---|---|---|---|---|
| | | | | SetOf-Books 90106 | | | | | 1..n 90108 | FixedAs-setMi-grateRe-quest-SEtOf-Books 90110 |
| | | | | | SetOf-BooksID 90112 | | | | 1 90114 | SetOf-BooksID 90116 |
| | | | | | Capitali-zation-Date 90118 | | | | 0..1 90120 | Date 90122 |
| | | | | | Deactiva-tionDate 90124 | | | | 0..1 90126 | Date 90128 |
| | | | | | FirstAc-quisition-Date 90130 | | | | 0..1 90132 | Date 90134 |

FIG. 90-6

| Package | | Level1 | Level2 | Level3 | Level4 | Level5 | Level6 | Level7 | Cardinality | Datatype Name |
|---|---|---|---|---|---|---|---|---|---|---|
| | | | | | LastRe-tirement-Date 90136 | | | | 0..1 90138 | Date 90140 |
| | | | | | LowVal-ueAsset-Indicator 90142 | | | | 0..1 90144 | LowVal-ueAsset-Indicator 90146 |
| | | | | | SetOf-Books-Valua-tionView 90148 | | | | 1..n 90150 | FixedAs-setMi-grateRe-quest-SetOf-Books-Valua-tionView 90152 |
| | | | | | | Asset-Valuation-ViewID 90154 | | | 1 90156 | SetOf-BooksAs-setValua-tion-ViewID 90158 |

FIG. 90-7

| Package | | Level1 | Level2 | Level3 | Level4 | Level5 | Level6 | Level7 | Cardinality | Datatype Name |
|---|---|---|---|---|---|---|---|---|---|---|
| | | | | | | Ordinary-DepreciationStart-Date 90160 | | | 0..1 90162 | Date 90164 |
| | | | | | | Special-DepreciationStart-Date 90166 | | | 0..1 90168 | Date 90170 |
| | | | | | | Interest-StartDate 90172 | | | 0..1 90174 | Date 90176 |
| | | | | | | Change-overFiscalYearID 90178 | | | 0..1 90180 | FiscalYearID 90182 |
| | | | | | | Change-overCalculation-PeriodID 90184 | | | 0..1 90186 | FixedAssetCalculationPeriodID 90188 |

FIG. 90-8

| Package | | Level1 | Level2 | Level3 | Level4 | Level5 | Level6 | Level7 | Cardinality | Datatype Name |
|---|---|---|---|---|---|---|---|---|---|---|
| | | | | | | ReplacementIndexSeriesCode 90190 | | | 0..1 90192 | IndexSeriesCode 90194 |
| | | | | | | AgeIndexSeriesCode 90196 | | | 0..1 90198 | IndexSeriesCode 90200 |
| | | | | | | AmountSignCheckExecutionCode 90202 | | | 1 90204 | FixedAssetValuationViewAmountSignCheckExecutionCode 90206 |

FIG. 90-9

| Package | | Level1 | Level2 | Level3 | Level4 | Level5 | Level6 | Level7 | Cardinality | Datatype Name |
|---|---|---|---|---|---|---|---|---|---|---|
| | | | | | | OrdinaryDepreciationExpire-dUseful-LifeWeightedCalcu-lationPe-riods-Decimal-Value 90208 | | | 0..1 90210 | Decimal-Value 90212 |
| | | | | | | SpecialDepreciationExpire-dUseful-LifeWeightedCalcu-lationPe-riods-Decimal-Value 90214 | | | 0..1 90216 | Decimal-Value 90218 |

FIG. 90-10

| Package | | Level1 | Level2 | Level3 | Level4 | Level5 | Level6 | Level7 | Cardinality | Datatype Name |
|---|---|---|---|---|---|---|---|---|---|---|
| | | | | | | Parameters 90220 | | | 1..n 90222 | FixedAssetMigrateRequest-SetOf'BooksValuationView-Parameters 90224 |
| | | | | | | | ValidityPeriod 90226 | | 1..n 90228 | Closed_DatePriod 90230 |
| | | | | | | | DepreciationCalculationProcedure-Code 90232 | | 1 90234 | DepreciationCalculationProcedure-Code 90236 |

FIG. 90-11

| Package | | Level1 | Level2 | Level3 | Level4 | Level5 | Level6 | Level7 | Cardinality | Datatype Name |
|---|---|---|---|---|---|---|---|---|---|---|
| | | | | | | | Imput-edInter-estCalcu-lation-Method-Code 90238 | | 0..1 90240 | FixedAs-setImput-edInter-estCalcu-lation-Method-Code 90242 |
| | | | | | | | Useful-LifeFis-calYear-sTotal-Number-Value 90244 | | 1 90246 | Total-Number-Value 90248 |
| | | | | | | | Useful-LifeAc-counting-Period-sTotal-Number-Value 90250 | | 1 90252 | Total-Number-Value 90254 |

FIG. 90-12

| Package | | Level1 | Level2 | Level3 | Level4 | Level5 | Level6 | Level7 | Cardinality | Datatype Name |
|---|---|---|---|---|---|---|---|---|---|---|
| | | | | | | | VariableDepreciationPortionPercent 90256 | | 0..1 90258 | Percent 90260 |
| | | | | | | | ScrapValueAmount 90262 | | 0..1 90264 | Amount 90266 |
| | | | | | | | ScrapValuePercent 90268 | | 0..1 90270 | Percent 90272 |
| | | | | | | | ShutDownIndicator 90274 | | 0..1 90276 | ShutDownIndicator 90278 |
| | | | | | | | ShiftFactorDecimalValue 90280 | | 0..1 90282 | DecimalValue 90284 |

FIG. 90-13

| Package | | Level1 | Level2 | Level3 | Level4 | Level5 | Level6 | Level7 | Cardinality | Datatype Name |
|---|---|---|---|---|---|---|---|---|---|---|
| | | | | | | Account-ingEntry 90286 | | | 1 90288 | FixedAs-setMi-grateRe-quest-SetOf'BooksValua-tion-ViewAc-countin-gEn-try+R29 90290 |
| | | | | | | | Posting-Date 90292 | | 1 90294 | Date 90296 |
| | | | | | | | Account-ingClos-ingStep-Code 90298 | | 0..1 90300 | Account-ingClos-ingStep-Code 90302 |

FIG. 90-14

| Package | | Level1 | Level2 | Level3 | Level4 | Level5 | Level6 | Level7 | Cardinality | Datatype Name |
|---|---|---|---|---|---|---|---|---|---|---|
| | | | | | | | Account-ingDocu-ment-TypeCode 90304 | | 1 90306 | Account-ingDocu-ment-TypeCode 90308 |
| | | | | | | | Account-ingBusi-ness-Transac-tionDate 90310 | | 1 90312 | Date 90314 |
| | | | | | | | EntryDate 90316 | | 1 90318 | Date 90320 |

FIG. 90-15

| Package | | Level1 | Level2 | Level3 | Level4 | Level5 | Level6 | Level7 | Cardinality | Datatype Name |
|---|---|---|---|---|---|---|---|---|---|---|
| | | | | | | | Item 90322 | | 0...n 90324 | FixedAssetMigrateRequest-SetOfBooks-ValuationViewAccountingEntryLineItem 90326 |
| | | | | | | | | MovementCategoryCode 90328 | 1 90330 | MovementCategoryCode 90332 |
| | | | | | | | | ItemGroupID-Note 90334 | 0..1 90336 | SHORT_Note 90338 |

FIG. 90-16

| Package | | Level1 | Level2 | Level3 | Level4 | Level5 | Level6 | Level7 | Cardinality | Datatype Name |
|---|---|---|---|---|---|---|---|---|---|---|
| | | | | | | | | Gener-alLedger Move-ment-TypeCode 90340 | 1 90342 | Gener-alLedger Move-ment-TypeCode 90344 |
| | | | | | | | | ValueCal-culation-Refer-enceDate 90346 | 1 90348 | Date 90350 |
| | | | | | | | | Individu-alMateri-alID 90352 | 0..1 90354 | Individu-alMateri-alID 90356 |
| | | | | | | | | Item-GroupId 90358 | 1 90360 | Business-Transac-tion-Documen-tItem-GroupID 90362 |

FIG. 90-17

| Package | | Level1 | Level2 | Level3 | Level4 | Level5 | Level6 | Level7 | Cardinality | Datatype Name |
|---|---|---|---|---|---|---|---|---|---|---|
| | | | | | | | | SubledgerAccount-LineItem-TypeCode 90364 | 0..1 90366 | SubledgerAccount-LineItem-TypeCode 90368 |
| | | | | | | | | LocalCur-rencyA-mount 90370 | 1 90372 | Amount 90374 |
| | | | | | | | | SetOf-BooksCurrencyA-mount 90376 | 0..1 90378 | Amount 90380 |
| | | | | | | | | HardCur-rencyA-mount 90382 | 0..1 90384 | Amount 90386 |
| | | | | | | | | Transac-tionCur-rencyA-mount 90388 | 0..1 90390 | Amount 90392 |

FIG. 90-18

| Package | | Level1 | Level2 | Level3 | Level4 | Level5 | Level6 | Level7 | Cardinality | Datatype Name |
|---|---|---|---|---|---|---|---|---|---|---|
| | | | | | | | | Index-BasedCurrencyA-mount 90394 | 0..1 90396 | Amount 90398 |

| Package | Level1 | Level2 | Level3 | Level4 | Cardinality | Datatype Name |
|---|---|---|---|---|---|---|
| MaterialValuationDataTransmitRequestMessage 94000 | Material-Valua-tionData-Transmi-tRequest-Message 94002 | | | | | Material-Valua-tionData-Transmi-tRequest-Message 94004 |
| MessageHeader 94006 | | Mes-sageHead er 94008 | | | 1 94010 | Business-Docu-mentMes-sage-Header 94012 |
| | | | ID 94014 | | 1 94016 | Business-Docu-mentMes-sageID 94018 |
| | | | Creation-DateTime 94020 | | 1 94022 | DateTime 94024 |

FIG. 94-2

| Package | Level1 | Level2 | Level3 | Level4 | Cardinality | Datatype Name |
|---|---|---|---|---|---|---|
| | | | ... 94026 | | | |
| MaterialValuationDataTransmitRequest 94028 | | Material-Valua-tionData-Transmi-tRequest 94030 | | | 1 94032 | Material-Valua-tionData-Transmi-tRequest 94034 |
| | | | @actionCode 94036 | | 1 94038 | Action-Code 94040 |
| | | | @valuationPrice-ListCom-pleteTransmission-Indicator 94042 | | 0..1 94044 | Indicator 94046 |

FIG. 94-3

| Package | Level1 | Level2 | Level3 | Level4 | Cardinality | Datatype Name |
|---|---|---|---|---|---|---|
| | | | @accountDetermination-Specifica-tionList-Com-pleteTransmission-Indicator 94048 | | 0..1 94050 | Indicator 94052 |
| | | | @inventoryValua-tionSpeci-fica-tionList-Com-pleteTransmission-Indicator 94054 | | 0..1 94056 | Indicator 94058 |

FIG. 94-4

| Package | Level1 | Level2 | Level3 | Level4 | Cardinality | Datatype Name |
|---|---|---|---|---|---|---|
| | | | Material-ValuationData-CompanyID 94060 | | 1 94062 | OrganisationalCentreID 94064 |
| | | | Material-ValuationData-MaterialInternalID 94066 | | 1 94068 | Product-InternalID 94070 |
| | | | Valuation-PriceDefaultBase-Quantity 94072 | | 0..1 94074 | Quantity 94076 |

FIG. 94-5

| Package | Level1 | Level2 | Level3 | Level4 | Cardinality | Datatype Name |
|---|---|---|---|---|---|---|
| | | | ValuationPriceDefaultBaseQuantityTypeCode 94078 | | 0..1 94080 | QuantityTypeCode 94082 |
| ValuationPrice 94084 | | | ValuationPrice 94086 | | 0..n 94088 | MaterialValuationDataTransmitRequestValuationPrice 94090 |
| | | | | @actionCode 94092 | 1 94094 | ActionCode 94096 |

FIG. 94-6

| Package | Level1 | Level2 | Level3 | Level4 | Cardinality | Datatype Name |
|---|---|---|---|---|---|---|
| | | | | Material-Valua-tionData-Perma-nentEstab lishmen-tID 94098 | 1 94100 | Organisa-tionalCen-treID 94102 |
| | | | | Validity-DatePe-riod 94104 | 1 94106 | CLOSED_DatePe-riod 94108 |
| | | | | PriceType Code 94110 | 1 94112 | PriceType Code 94114 |
| | | | | SetOf-BooksID 94116 | 1 94118 | SetOf-BooksID 94120 |

FIG. 94-7

| Package | Level1 | Level2 | Level3 | Level4 | Cardinality | Datatype Name |
|---|---|---|---|---|---|---|
| | | | | LocalCurrency-ValuationPrice 94122 | 0..1 94124 | Price 94126 |
| | | | | SetOfBooksCurrency-ValuationPrice 94128 | 0..1 94130 | Price 94132 |
| | | | | HardCurrency-ValuationPrice 94134 | 0..1 94136 | Price 94138 |
| | | | | Index-BasedCurrency-ValuationPrice 94140 | 0..1 94142 | Price 94144 |

FIG. 94-8

| Package | Level1 | Level2 | Level3 | Level4 | Cardinality | Datatype Name |
|---|---|---|---|---|---|---|
| AccountDeterminationSpecification 94146 | | | AccountDetermination-Specification 94148 | | 0..n 94150 | MaterialValuation-DataTransmitRequestAccountDeterminationSpecification 94152 |
| | | | | @actionCode 94154 | 1 94156 | ActionCode 94158 |
| | | | | MaterialValuationDataPermanentEstablishmentID 94160 | 1 94162 | OrganizationalCentreID 94164 |

FIG. 94-9

| Package | Level1 | Level2 | Level3 | Level4 | Cardinality | Datatype Name |
|---|---|---|---|---|---|---|
| | | | | AccountDeterminationMaterialValuationDataGroupCode 94166 | 0..1 94168 | AccountDeterminationMaterialValuationDataGroupCode 94170 |
| InventoryValuationSpecification 94172 | | | InventoryValuationSpecification 94174 | | 0..n 94176 | MaterialValuationDataTransmitRequestInventoryValuationSpecification 94178 |
| | | | | @actionCode 94180 | 1 94182 | ActionCode 94184 |

FIG. 94-10

| Package | Level1 | Level2 | Level3 | Level4 | Cardinality | Datatype Name |
|---|---|---|---|---|---|---|
| | | | | Material-Valua-tionData-Perma-nentEstab lishmen-tID 94186 | 1 94188 | Organiza-tionalCen-treID 94190 |
| | | | | Perpetu-alInven-toryValua-tionPro-cedure-Code 94192 | 0..1 94194 | Inven-toryValua-tionPro-cedure-Code 94196 |

FIG. 94-11

| Package | Level1 | Level2 | Level3 | Level4 | Cardinality | Datatype Name |
|---|---|---|---|---|---|---|
| MaterialFinancialsProcessUsability 94198 | | | Material-Financial-sProces-sUsability 94200 | | 0..n 94202 | MaterialV aluation-Data-Transmi-tRe-questMa-terialFi-nancial-sProces-sUsability 94204 |
| | | | | Material-Valua-tionData-Perma-nentEstab lishmen-tID 94206 | 1 94208 | Organiza-tionalCen-treID 94210 |
| | | | | ActiveIn-dicator 94212 | 0..1 94214 | Indicator 94216 |

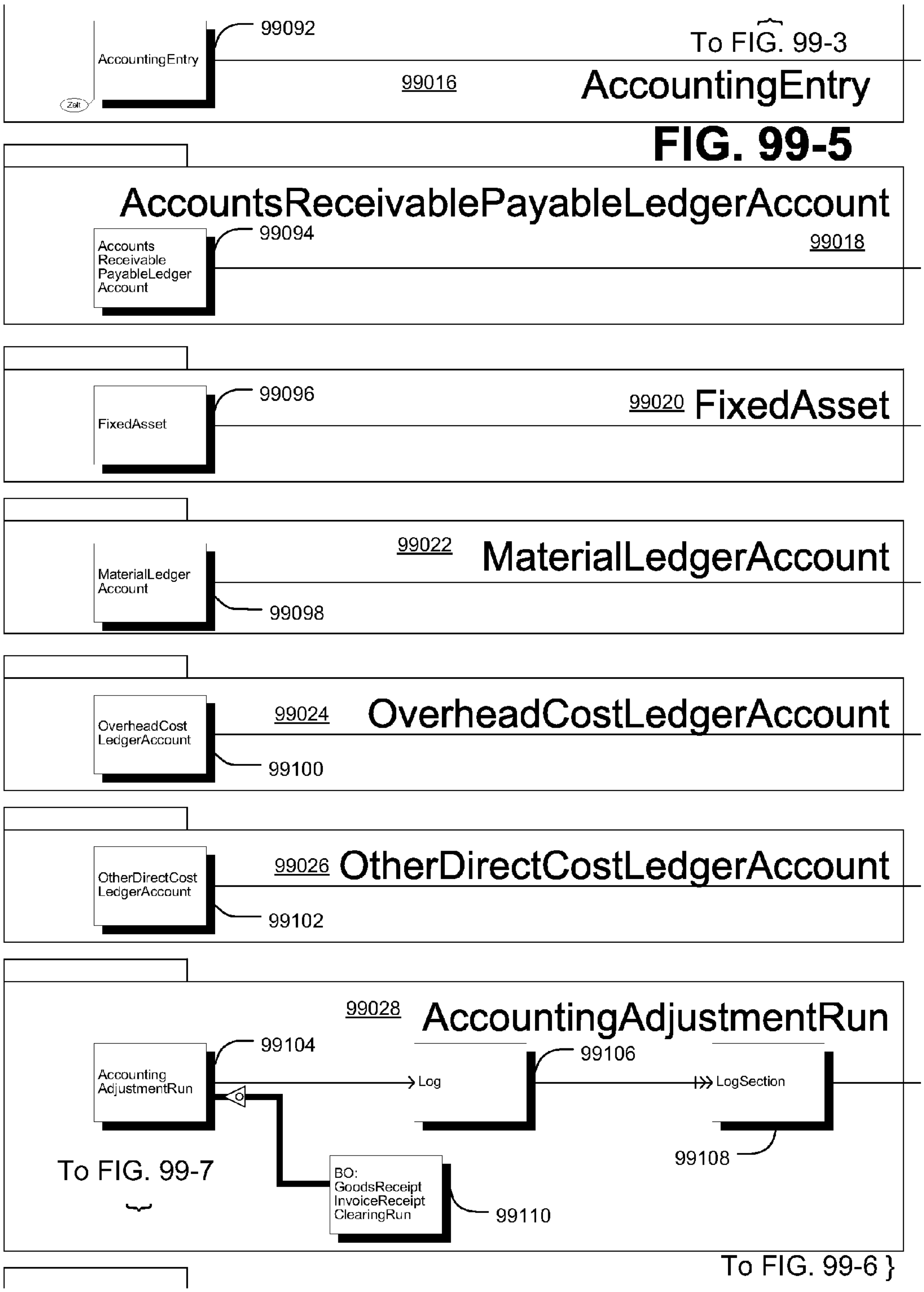

To FIG. 99-3
AccountingEntry
99092
99016
AccountingEntry
FIG. 99-5
AccountsReceivablePayableLedgerAccount
Accounts Receivable PayableLedger Account
99094
99018
FixedAsset
99096
99020
FixedAsset
MaterialLedgerAccount
MaterialLedger Account
99022
99098
OverheadCostLedgerAccount
OverheadCost LedgerAccount
99024
99100
OtherDirectCostLedgerAccount
OtherDirectCost LedgerAccount
99026
99102
AccountingAdjustmentRun
99028
Accounting AdjustmentRun
99104
Log
99106
LogSection
99108
BO: GoodsReceipt InvoiceReceipt ClearingRun
99110
To FIG. 99-7
To FIG. 99-6

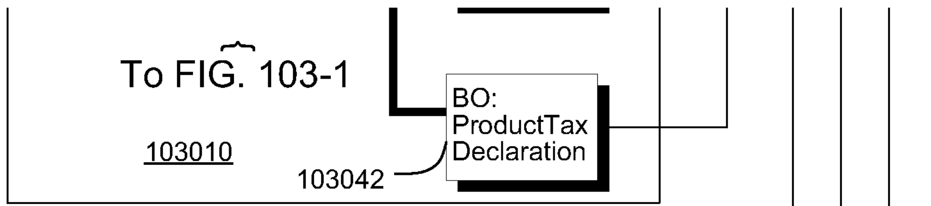
FIG. 103-3
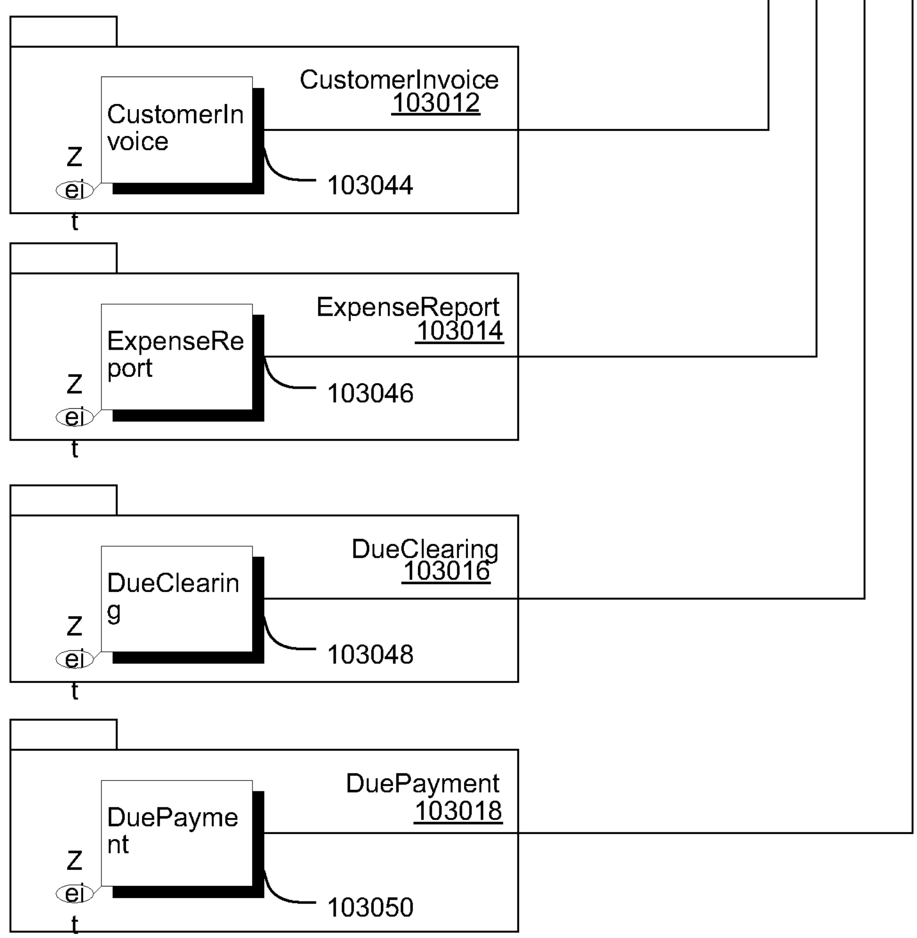

| Package | level1 | level2 | level3 | level4 | Cardinality | Datatype Name |
|---|---|---|---|---|---|---|
| AccountingObjectCheckMessage 108000 | Accountin-gObjec-tCheckMes-sage 108002 | | | | | AccountingObjec-tCheckMessage 108004 |
| MessageHeader 108006 | | Message-Header 108008 | | | 1 108010 | BusinessDocument-MessageHeader 108012 |
| | | | ID 108014 | | 1 108016 | BusinessDocument-MessageID 108018 |
| | | | Creation-DateTime 108020 | | 1 108022 | DateTime 108024 |
| AccountingObjectCheck 108026 | | AccountingOb-jectCheck 108028 | | | 1 108030 | AccountingObjec-tCheck 108032 |
| | | | ValidityDate 108034 | | 1 108036 | Date 108038 |

FIG. 108-2

| Package | level1 | level2 | level3 | level4 | Cardinality | Datatype Name |
|---|---|---|---|---|---|---|
| | | | CompanyID 108040 | | 1 108042 | CompanyID 108044 |
| | | | UserAccountID 108046 | | 0..1 108048 | UserAccountID 108050 |
| | | | LanguageCode 108052 | | 0..1 108054 | LanguageCode 108056 |
| AccountingObjectItem 108058 | | | Item 108060 | | 1..n 108062 | AccountingObjectCheckItem 108064 |
| | | | | ID 108066 | 1 108068 | BusinessTransactionDocumentItemID 108070 |
| | | | | ProjectResponsibleEmployeeID 108072 | 0..1 108074 | EmployeeID 108076 |

FIG. 108-3

| Package | level1 | level2 | level3 | level4 | Cardinality | Datatype Name |
|---|---|---|---|---|---|---|
| BusinessTransactionDocumentReferences 108078 | | | | ProjectReference 108080 | 0..1 108082 | ProjectReference 108084 |
| Log 108086 | | | | Log 108088 | 0..1 108090 | Log 108092 |

| Packages | level1 | level2 | level3 | level4 | level5 | Cardinality | Datatype Name |
|---|---|---|---|---|---|---|---|
| InteractiveFormActivityVisitReportNotification 110000 | Interactive-FormActivity-VisitReport-Notification-Message 110002 | | | | | | FormActivityVisitReport-NotificationMessage 110004 |
| MessageHeader 110006 | | Business-DocumentMessage-Header 110008 | | | | | |
| | | | ID 110010 | | | 1:1 110012 | MessageID 110014 |
| | | | ReferenceID 110016 | | | 1:C 110018 | MessageID 110020 |

FIG. 110-2

| Packages | | level1 | level2 | level3 | level4 | level5 | Cardinality | Datatype Name |
|---|---|---|---|---|---|---|---|---|
| | | | | CreationDateTime 110022 | | | 1:1 110024 | DateTime 110026 |
| | | | | Sender-Party 110028 | | | 1:C 110030 | BusinessDocu-mentMessage-Header-Party 110032 |
| | | | | Recipi-entParty 110034 | | | 1:C 110036 | BusinessDocu-mentMessage-Header-Party 110038 |

FIG. 110-3

| Packages | level1 | level2 | level3 | level4 | level5 | Cardinality | Datatype Name |
|---|---|---|---|---|---|---|---|
| ActivityVisitReport 110040 | | ActivityVisitReport 110042 | | | | 1:1 110044 | InteractiveFormActivityVisitReport 110046 |
| | | | UUID 110048 | | | 1:1 110050 | UUID 110052 |
| | | | ID 110054 | | | 1:1 110056 | BusinessTransactionDocumentID 110058 |
| | | | ActionCode 110060 | | | 1:1 110062 | ActionCode 110064 |

FIG. 110-4

| Packages | level1 | level2 | level3 | level4 | level5 | Cardinality | Datatype Name |
|---|---|---|---|---|---|---|---|
| | | | SystemAdministrativeData 110066 | | | 1:C 110068 | SystemAdministrativeData 110070 |
| | | | TypeCode 110072 | | | 1:1 110074 | BusinessTransactionDocumentTypeCode 110076 |
| | | | TypeCodeName 110078 | | | 1:C 110080 | MediumName 110082 |
| | | | TypeCodeDescription 110084 | | | 1:C 110086 | LongDescription 110088 |

FIG. 110-5

| Packages | level1 | level2 | level3 | level4 | level5 | Cardinality | Datatype Name |
|---|---|---|---|---|---|---|---|
| | | | ProcessingTypeCode 110090 | | | 1:1 110092 | BusinessTransactionDocumentProcessingTypeCode 110094 |
| | | | ProcessingTypeCodeName 110096 | | | 1:C 110098 | MediumName 110100 |
| | | | ProcessingTypeCodeDescription 110102 | | | 1:C 110104 | LongDescription 110106 |

FIG. 110-6

| Packages | level1 | level2 | level3 | level4 | level5 | Cardinality | Datatype Name |
|---|---|---|---|---|---|---|---|
| | | | Name 110108 | | | 1:C 110110 | EXTENDED_Name 110112 |
| | | | Priority-Code 110114 | | | 1:C 110116 | Priority-Code 110118 |
| | | | Priority-Name 110120 | | | 1:C 110122 | Medium-Name 110124 |
| | | | Priority-Description 110126 | | | 1:C 110128 | LongDescription 110130 |
| | | | Initiator-Code 110132 | | | 1:C 110134 | Activity-Initiator-Code 110136 |
| | | | Initiator-Name 110138 | | | 1:C 110140 | Medium-Name 110142 |

FIG. 110-7

| Packages | level1 | level2 | level3 | level4 | level5 | Cardinality | Datatype Name |
|---|---|---|---|---|---|---|---|
| | | | InitiatorDescription 110144 | | | 1:C 110146 | LongDescription 110148 |
| | | | MessageFromName 110150 | | | 1:C 110152 | _MEDIUM_Name 110154 |
| | | | InformationSensitivityCode 110156 | | | 1:C 110158 | InformationSensitivityCode 110160 |
| | | | InformationSensitivityName 110162 | | | 1:C 110164 | MediumName 110166 |

FIG. 110-8

| Packages | level1 | level2 | level3 | level4 | level5 | Cardinality | Datatype Name |
|---|---|---|---|---|---|---|---|
| | | | InformationSensitivity-Description 110168 | | | 1:C 110170 | LongDescription 110172 |
| | | | Group-Code 110174 | | | 1:C 110176 | Activity-Group-Code 110178 |
| | | | Group-Name 110180 | | | 1:C 110182 | Medium-Name 110184 |
| | | | Group-Description 110186 | | | 1:C 110188 | LongDescription 110190 |

FIG. 110-9

| Packages | | level1 | level2 | level3 | level4 | level5 | Cardinality | Datatype Name |
|---|---|---|---|---|---|---|---|---|
| | | | | DataO-rigin-Type-Code 110192 | | | 1:C 110194 | Activity-DataO-riginType Code 110196 |
| | | | | DataO-rigin-TypeNa me 110198 | | | 1:C 110200 | Medium-Name 110202 |
| | | | | DataO-rigin-TypeDe-scription 110204 | | | 1:C 110206 | LongDe-scription 110208 |
| | | | | Report-ed-DateTim e 110210 | | | 1:C 110212 | Global-DateTim e 110214 |

FIG. 110-10

| Packages | level1 | level2 | level3 | level4 | level5 | Cardinality | Datatype Name |
|---|---|---|---|---|---|---|---|
| | | | DueDate Time 110216 | | | 1:C 110218 | Global-DateTime,QualifierDue 110220 |
| | | | LifeCy-cleS-tatus 110222 | | | 1:C 110224 | Activ-ityLife-CycleS-tatus 110226 |
| | | | LifeCy-cleS-tatus-Name 110228 | | | 1:C 110230 | Medium-Name 110232 |
| | | | LifeCy-cleS-tatusDe-scription 110234 | | | 1:C 110236 | LongDe-scription 110238 |

FIG. 110-11

| Packages | | | | level1 | level2 | level3 | level4 | level5 | Cardinality | Datatype Name |
|---|---|---|---|---|---|---|---|---|---|---|
| | | | | | | Description 110240 | | | 1:C 110242 | MediumDescription,QualifierActivity 110244 |
| | | | | | | CompletedIndicator 110246 | | | 1:C 110248 | Indicator,QualifierCompleted 110250 |
| | | | | | | ResultReasonCode 110252 | | | 1:C 110254 | CustomerTransactionDocumentResultReasonCode 110256 |

FIG. 110-12

| Packages | | | | level1 | level2 | level3 | level4 | level5 | Cardinality | Datatype Name |
|---|---|---|---|---|---|---|---|---|---|---|
| | | | | | | Resul-tReason Name 110258 | | | 1:C 110260 | Medium-Name 110262 |
| | | | | | | Resul-tRea-sonDe-scription 110264 | | | 1:C 110266 | LongDe-scription 110268 |
| | | | | | | Rea-sonCode 110270 | | | 1:C 110272 | Cus-tomer-Transac-tion-Documen tRe-sultRea-sonCode 110274 |
| | | | | | | Rea-sonNam e 110276 | | | 1:C 110278 | Medium-Name 110280 |

FIG. 110-13

| Packages | | | | level1 | level2 | level3 | level4 | level5 | Cardinality | Datatype Name |
|---|---|---|---|---|---|---|---|---|---|---|
| | | | | | | ReasonDescription 110282 | | | 1:C 110284 | LongDescription 110286 |
| | | Party 110288 | | | | ActivityParty 110290 | | | 1:CN 110292 | FormBusinessTransactionDocumentParty 110294 |
| | | | | | | OrganizerParty 110296 | | | 1:C 110298 | FormBusinessTransactionDocumentParty 110300 |

FIG. 110-14

| Packages | level1 | level2 | level3 | level4 | level5 | Cardinality | Datatype Name |
|---|---|---|---|---|---|---|---|
| | | | Atten-deeParty 110302 | | | 1:CN 110304 | FormBusiness-Transac-tionDocu-ment-Party 110306 |
| | | | Refer-ence-Party 110308 | | | 1:CN 110310 | FormBusiness-Transac-tion-DocumentParty 110312 |

FIG. 110-15

| Packages | | level1 | level2 | level3 | level4 | level5 | Cardinality | Datatype Name |
|---|---|---|---|---|---|---|---|---|
| | | | | ActivityUnitParty 110314 | | | 1:C 110316 | FormBusinessTransactionDocumentParty 110318 |
| Location 110320 | | | | MainLocation 110322 | | | 1:C 110324 | FormBusinessTransactionDocumentLocation 110326 |
| Period 110328 | | | | ScheduledPeriod 110330 | | | 1:C 110332 | ActivityPeriodElements 110334 |

FIG. 110-16

| Packages | | level1 | level2 | level3 | level4 | level5 | Cardinality | Datatype Name |
|---|---|---|---|---|---|---|---|---|
| TextCollection 110336 | | | | TextCollection 110338 | | | 1:C 110340 | TextCollection 110342 |
| Item 110344 | | | | Item 110346 | | | 1:CN 110348 | FormActivityVisitReportItem 110350 |
| | | | | | ID 110352 | | 1:C 110354 | BusinessTransactionDocumentItemID 110356 |

FIG. 110-17

| Packages | | | | level1 | level2 | level3 | level4 | level5 | Cardinality | Datatype Name |
|---|---|---|---|---|---|---|---|---|---|---|
| | | | | | | | Process-ingType-Code 110358 | | 1:C 110360 | Business Transac-tion-Documen tItem-Process-ingType-Code 110362 |
| | | | | | | | Process-ing-TypeNam e 110364 | | 1:C 110366 | Medium-Name 110368 |
| | | | | | | | Process-ing-TypeDe-scription 110370 | | 1:C 110372 | LongDe-scription 110374 |
| | | | | | | | Descrip-tion 110376 | | 1:C 110378 | ShortDe-scription 110380 |

FIG. 110-18

| Packages | level1 | level2 | level3 | level4 | level5 | Cardinality | Datatype Name |
|---|---|---|---|---|---|---|---|
| | | | | ResultReasonCode 110382 | | 1:C 110384 | CustomerTransactionDocumentResultReasonCode 110386 |
| | | | | ResultReasonName 110388 | | 1:C 110390 | MediumName 110392 |
| | | | | ResultReasonDescription 110394 | | 1:C 110396 | LongDescription 110398 |
| | | | | ReturnsIndicator 110400 | | 1:C 110402 | Indicator,QualifierReturns 110404 |

FIG. 110-19

| Packages | level1 | level2 | level3 | level4 | level5 | Cardinality | Datatype Name |
|---|---|---|---|---|---|---|---|
| | | | | Quantity 110406 | | 1:C 110408 | Quantity 110410 |
| | | | | Quanti-tyType-Code 110412 | | 1:C 110414 | Quanti-tyType-Code 110416 |
| | | | | Reason-Code 110418 | | 1:C 110420 | Cus-tomer-Transac-tion-DocumentRe-sultRea-sonCode 110422 |
| | | | | Reason-Name 110424 | | 1:C 110426 | Medium-Name 110428 |
| | | | | Reason-Descrip-tion 110430 | | 1:C 110432 | LongDe-scription 110434 |

FIG. 110-20

| Packages | | | | level1 | level2 | level3 | level4 | level5 | Cardinality | Datatype Name |
|---|---|---|---|---|---|---|---|---|---|---|
| | | | ProductInformation 110436 | | | | Product 110438 | | 1:C 110440 | FormBusiness-Transaction-DocumentProduct 110442 |
| | | | | | | | | StandardID 110444 | 1:CN 110446 | Product-StandardID 110448 |
| | | | | | | | | BuyerID 110450 | 1:C 110452 | Product-PartyID 110454 |
| | | | | | | | | SellerID 110456 | 1:C 110458 | Product-PartyID 110460 |
| | | | | | | | | ManufacturerID 110462 | 1:C 110464 | Product-PartyID 110466 |

FIG. 110-21

| Packages | | | | level1 | level2 | level3 | level4 | level5 | Cardinality | Datatype Name |
|---|---|---|---|---|---|---|---|---|---|---|
| | | | | | | | | Type-Code 110468 | 1:C 110470 | ProductType Code 110472 |
| | | | | | | | | Type-Code-Name 110474 | 1:C 110476 | Medium-Name 110478 |
| | | | | | | | | TyeCod-eDescrip-tion 110480 | 1:C 110482 | LongDe-scription 110484 |
| | | | | | | | | Note 110486 | 1:C 110488 | Note,QualifierPro-duct 110490 |
| | | | PriceInformation 110492 | | | | Price 110494 | | 1:C 110496 | |
| | | | | | | | | NetPrice 110498 | 1:C 110500 | FormPrice 110502 |

FIG. 115-1

| Package | level 1 | level 2 | level 3 | level 4 | Cardinality | Datatype Name |
|---|---|---|---|---|---|---|
| BankDirectoryTransmissionMessage 115000 | BankDirectoryTransmissionResponse 115002 | | | | | BankDirectoryTransmissionMessage 115004 |
| MessageHeader 115006 | | MessageHeader 115008 | | | 1 115010 | BusinessDocumentMessageHeader 115012 |
| | | | ID 115014 | | 1 115016 | BusinessDocumentMessageID 115018 |
| | | | CreationDateTime 115020 | | 1 115022 | DateTime 115024 |
| BankDirectoryEntry 115026 | | BankDirectoryEntry 115028 | | | 1 115030 | … |

FIG. 115-2

| Package | | level 1 | level 2 | level 3 | level 4 | Cardinality | Datatype Name |
|---|---|---|---|---|---|---|---|
| | | | | BankStandardID 115032 | | 0..1 115034 | BankStandardID 115036 |
| | | | | CountryCode 115038 | | 1 115040 | CountryCode 115042 |
| | | | | BankAccountID-CheckDigitCalculation-MethodCode 115044 | | 0..1 115046 | BankAccountIDCheckDigitCalculationMethodCode 115048 |
| | | | | DeletedIndicator 115050 | | 0..1 115052 | Indicator 115054 |
| | | | | ValidityPeriod 115056 | | 0..1 115058 | DatePeriod 115060 |

FIG. 115-3

| Package | level 1 | level 2 | level 3 | level 4 | Cardinality | Datatype Name |
|---|---|---|---|---|---|---|
| | | | Bank-Cata-logueID 115062 | | 1 115064 | CatalogueID 115066 |
| NationalBankIdentification 115068 | | | National-BankIde ntifica-tion 115070 | | 1..n 115072 | BankDirectoryEntryNationalBankID 115074 |
| | | | | BankRout-ingID 115076 | 1 115078 | BankRoutingID 115080 |
| | | | | BankRout-ingID-TypeCode 115082 | 1 115084 | BankRoutingIDTypeCode 115086 |

FIG. 115-4

| Package | level 1 | level 2 | level 3 | level 4 | Cardinality | Datatype Name |
|---|---|---|---|---|---|---|
| | | | | BankAccountID-Check-DigitCalculation-Method-Code 115088 | 0..1 115090 | BankAccountIDCheckDigitCalculationMethodCode 115092 |
| Address 115094 | | | Address 115096 | | 1 115098 | Address 115100 |

To FIG. 150-2
Identity
150000
ProductionModel
150002
ProductionSegment
150004
BillOfOperations
150006
Identity
150020
ProductionModel
150022
Production Segment
150024
BillOfOperations
150026
Planning Operation
150028
BO: ProductionBillOfOperations
150030
Planning Operation Alternative
150032
Planning OperationActivity
150034
To FIG. 150-3

| Package | level1 | level2 | level3 | level4 | level5 | level6 | Cardinality | Datatype Name |
|---|---|---|---|---|---|---|---|---|
| FormSalesPriceListInformation-Message 157000 | Form-SalesPriceListIn-forma-tionMes-sage 157002 | | | | | | | Form-SalesPriceListIn-forma-tionMes-sage 157004 |
| SalesPriceListInformation 157006 | | SalesPriceListIn-formation 157008 | | | | | 1 157010 | Form-SalesPriceListIn-formation 157012 |
| | | | ID 157014 | | | | 1 157016 | SalesPriceListID 157018 |
| | | | Releas-eStatus-Code 157020 | | | | 1 157022 | NOTRELEASEDRELEASED_ReleaseStatus-Code 157024 |

FIG. 157-2

| Package | level1 | level2 | level3 | level4 | level5 | level6 | Cardinality | Datatype Name |
|---|---|---|---|---|---|---|---|---|
| | | | Releas-eStatus-Code-Name 157026 | | | | 1 157028 | Name 157030 |
| | | | Type-Code 157032 | | | | 1 157034 | SalesPriceListTypeCode 157036 |
| | | | Type-Code-Name 157038 | | | | 1 157040 | Name 157042 |
| | | | Currency Code 157044 | | | | 1 157046 | Cur-rencyCode 157048 |
| | | | Validity 157050 | | | | 1 157052 | Time-PointPe-riod 157054 |

FIG. 157-3

| Package | level1 | level2 | level3 | level4 | level5 | level6 | Cardinality | Datatype Name |
|---|---|---|---|---|---|---|---|---|
| | | | Descrip-tion 157056 | | | | 1 157058 | Descrip-tion 157060 |
| PropertyValuation 157062 | | | Proper-tyValua-tion 157064 | | | | 0..n 157066 | Form-SalesPriceList-Property-Valuation 157068 |
| | | | | Property-Valuation 157070 | | | 1 157072 | PriceSpecifica-tionEle-ment-Property-Valuation 157074 |
| | | | | Descrip-tion 157076 | | | 1 157078 | Descrip-tion 157080 |
| PriceSpecification 157082 | | | PriceSpecification 157084 | | | | 0..n 157086 | Form-PriceSpecification 157088 |

FIG. 157-4

| Package | level1 | level2 | level3 | level4 | level5 | level6 | Cardinality | Datatype Name |
|---|---|---|---|---|---|---|---|---|
| | | | | PriceSpecificationElementTypeCode 157090 | | | 1 157092 | PriceSpecificationElementTypeCode 157094 |
| | | | | PriceSpecificationElementTypeCode-Name 157096 | | | 1 157098 | Name 157100 |
| | | | | BaseQuantity 157102 | | | 0..1 157104 | Quantity 157106 |
| | | | | BaseQuantityTypeCode 157108 | | | 0..1 157110 | QuantityTypeCode 157112 |

FIG. 157-5

| Package | level1 | level2 | level3 | level4 | level5 | level6 | Cardinality | Datatype Name |
|---|---|---|---|---|---|---|---|---|
| | | | | Base-QuantityTypeCodeName 157114 | | | 0..1 157116 | Name 157118 |
| | | | | Validity 157120 | | | 1 157122 | TimePointPeriod 157124 |
| | | | | Amount 157126 | | | 0..1 157128 | Amount 157130 |
| | | | | Percent 157132 | | | 0..1 157134 | Percent 157136 |
| PriceSpecificationPropertyValuation 157138 | | | | PropertyValuation 157140 | | | 0..n 157142 | FormPriceSpecificationPropertyValuation 157144 |

FIG. 157-6

| Package | level1 | level2 | level3 | level4 | level5 | level6 | Cardinality | Datatype Name |
|---|---|---|---|---|---|---|---|---|
| | | | | | Proper-tyValua-tion 157146 | | 0..1 157148 | PriceSpe cifica-tionEle-ment-Property-Valuation 157150 |
| | | | | | Descrip-tion 157152 | | 0..1 157154 | Descrip-tion 157156 |
| PriceSpecification-ScaleLine 157158 | | | | ScaleLine 157160 | | | 0..n 157162 | Form-PriceSpe cifica-tionScale Line 157164 |
| | | | | | Base-Quantity 157166 | | 0..1 157168 | Quantity 157170 |
| | | | | | Base-Quanti-tyType-Code 157172 | | 0..1 157174 | Quanti-tyType-Code 157176 |

FIG. 157-7

| Package | level1 | level2 | level3 | level4 | level5 | level6 | Cardinality | Datatype Name |
|---|---|---|---|---|---|---|---|---|
| | | | | | Base-Quanti-tyType-Code-Name 157178 | | 0..1 157180 | Name 157182 |
| | | | | | Amount 157184 | | 0..1 157186 | Amount 157188 |
| | | | | | Percent 157190 | | 0..1 157192 | Percent 157194 |
| FirstDimensionScale-AxisStep 157196 | | | | | FirstDi-men-sionScal eAx-isStep 157198 | | 1 157200 | Form-ScaleAx-isSep 157202 |
| | | | | | | ScaleAx-isBase-Code 157204 | 1 157206 | ScaleAx-isBase-Code 157208 |

FIG. 157-8

| Package | level1 | level2 | level3 | level4 | level5 | level6 | Cardinality | Datatype Name |
|---|---|---|---|---|---|---|---|---|
| | | | | | | ScaleAxisBaseCodeName 157210 | 1 157212 | Name 157214 |
| | | | | | | ScaleAxisIntervalBoundaryCode 157216 | 1 157218 | ScaleAxisIntervalBoundaryCode 157220 |
| | | | | | | ScaleAxisIntervalBoundaryCodeName 157222 | 1 157224 | Name 157226 |
| | | | | | | Amount 157228 | 0..1 157230 | Amount 157232 |
| | | | | | | Quantity 157234 | 0..1 157236 | Quantity 157238 |

FIG. 157-9

| Package | level1 | level2 | level3 | level4 | level5 | level6 | Cardinality | Datatype Name |
|---|---|---|---|---|---|---|---|---|
| | | | | | | Quanti-tyType-Code 157240 | 0..1 157242 | Quanti-tyType-Code 157244 |
| | | | | | | Quanti-tyType-Code-Name 157246 | 0..1 157248 | Name 157250 |
| | | | | | | Decimal-value 157252 | 0..1 157254 | Decimal-Value 157256 |
| | | | | | | Integer-Value 157258 | 0..1 157260 | Integer-Value 157262 |
| SecondDimension-ScaleAxisStep 157264 | | | | | Second-Dimen-sion-ScaleAx-isStep 157266 | | 0..1 157268 | Form-ScaleAx-isSep 157270 |

FIG. 157-10

| Package | level1 | level2 | level3 | level4 | level5 | level6 | Cardinality | Datatype Name |
|---|---|---|---|---|---|---|---|---|
| | | | | | | ScaleAx-isBase-Code 157272 | 1 157274 | ScaleAx-isBase-Code 157276 |
| | | | | | | ScaleAx-isBase-Code-Name 157278 | 1 157280 | Name 157282 |
| | | | | | | ScaleAx-isInter-valBoundaryCode 157284 | 1 157286 | ScaleAx-isInterval-Boundary Code 157288 |
| | | | | | | ScaleAx-isInterval-Boundary Code-Name 157290 | 1 157292 | Name 157294 |

FIG. 157-11

| Package | level1 | level2 | level3 | level4 | level5 | level6 | Cardinality | Datatype Name |
|---|---|---|---|---|---|---|---|---|
| | | | | | | Amount 157296 | 0..1 157298 | Amount 157300 |
| | | | | | | Quantity 157302 | 0..1 157304 | Quantity 157306 |
| | | | | | | Quanti-tyType-Code 157308 | 0..1 157310 | Quanti-tyType-Code 157312 |
| | | | | | | Quanti-tyType-Code-Name 157314 | 0..1 157316 | Name 157318 |
| | | | | | | Decimal-value 157320 | 0..1 157322 | Decimal-Value 157324 |
| | | | | | | Integer-Value 157326 | 0..1 157328 | Integer-Value 157330 |

FIG. 158-1

| Package | level1 | level2 | level3 | level4 | level5 | level6 | level7 | Cardinality | Datatype Name |
|---|---|---|---|---|---|---|---|---|---|
| SalesPriceListReplicateConfirmationMessage 158000 | SalesPriceListReplicateConfirmationMessage 158002 | | | | | | | 1 158004 | SalesPriceListReplicateRequestMessage 158006 |
| MessageHeader 158008 | | MessageHeader 158010 | | | | | | 1 158012 | BusinessDocumentMessageHeader 158014 |
| SalesPriceListReplicateConfirmation 158016 | | SalesPriceListReplicateConfirmation 158018 | | | | | | 1 158020 | SalesPriceListReplicateConfirmation 158022 |
| | | | SalesPriceList 158024 | | | | | 1..n 158026 | SalesPriceList 158028 |

FIG. 158-2

| Package | level1 | level2 | level3 | level4 | level5 | level6 | level7 | Cardinality | Datatype Name |
|---|---|---|---|---|---|---|---|---|---|
| | | | | ID 158030 | | | | 1 158032 | SalesPriceListID 158034 |
| | | | | AcceptanceStatusCode 158036 | | | | 0..1 158038 | AcceptanceStatusCode 158040 |
| | | | | TypeCode 158042 | | | | 0..1 158044 | SalesPriceListTypeCode 158046 |
| | | | | ValidityPeriod 158048 | | | | 1 158050 | TimePointPeriod 158052 |

FIG. 158-3

| Package | level1 | level2 | level3 | level4 | level5 | level6 | level7 | Cardinality | Datatype Name |
|---|---|---|---|---|---|---|---|---|---|
| | | | | Property-Definition-ClassCode 158054 | | | | 0..1 158056 | PriceSpecificationElementPropertyDefinitionClass-Code 158058 |
| | | | | Currency-Code 158060 | | | | 0..1 158062 | Currency-Code 158064 |
| | | | | Descrip-tion 158066 | | | | 0..n 158068 | SalesPriceListDe-scription 158070 |
| | | | | Property-Valuation 158072 | | | | 0..n 158074 | PriceSpecification-Property-Valuation 158076 |

FIG. 158-4

| Package | level1 | level2 | level3 | level4 | level5 | level6 | level7 | Cardinality | Datatype Name |
|---|---|---|---|---|---|---|---|---|---|
| PriceSpecification 158078 | | | | PriceSpecification 158080 | | | | 1..n 158082 | PriceSpecificationElement 158084 |
| | | | | | AcceptanceStatusCode 158086 | | | 0..1 158088 | AcceptanceStatusCode 158090 |
| | | | | | TypeCode 158092 | | | 0..1 158094 | PriceSpecificationElementTypeCode 158096 |
| | | | | | CategoryCode 158098 | | | 0..1 158100 | PriceSpecificationElementCategoryCode 158102 |

FIG. 158-5

| Package | level1 | level2 | level3 | level4 | level5 | level6 | level7 | Cardinality | Datatype Name |
|---|---|---|---|---|---|---|---|---|---|
| | | | | | Purpose-Code 158104 | | | 0..1 158106 | PriceSpecificationElementPurposeCode 158108 |
| | | | | | ValidityPeriod 158110 | | | 1 158112 | TimePointPeriod 158114 |
| | | | | | PropertyDefinitionClassCode 158116 | | | 0..1 158118 | PriceSpecificationElementPropertyDefinitionClassCode 158120 |
| | | | | | Rate 158122 | | | 0..1 158124 | Rate 158126 |

FIG. 158-6

| Package | level1 | level2 | level3 | level4 | level5 | level6 | level7 | Cardinality | Datatype Name |
|---|---|---|---|---|---|---|---|---|---|
| | | | | | | Decimal-Value 158128 | | 1 158130 | Decimal-Value 158132 |
| | | | | | | Measure-UnitCode 158134 | | 0..1 158136 | Measure-UnitCode 158138 |
| | | | | | | Currency-Code 158140 | | 0..1 158142 | Currency-Code 158144 |
| | | | | | | Base-Measure-UnitCode 158146 | | 0..1 158148 | Measure-UnitCode 158150 |
| | | | | | | BaseDecimalValue 158152 | | 0..1 158154 | Decimal-Value 158156 |

FIG. 158-7

| Package | level1 | level2 | level3 | level4 | level5 | level6 | level7 | Cardinality | Datatype Name |
|---|---|---|---|---|---|---|---|---|---|
| | | | | | Rate-Quanti-tyType-Code 158158 | | | 0..1 158160 | Quanti-tyType-Code 158162 |
| | | | | | Rate-BaseQuantityType-Code 158164 | | | 0..1 158166 | Quanti-tyType-Code 158168 |
| | | | | | Property-Valuation 158170 | | | 1..n 158172 | PriceSpecificationElementProp-ertyValua-tion 158174 |
| | | | | | ScaleLine 158176 | | | 0..n 158178 | PriceSpecificationElementScaleLine 158180 |

FIG. 158-8

| Package | level1 | level2 | level3 | level4 | level5 | level6 | level7 | Cardinality | Datatype Name |
|---|---|---|---|---|---|---|---|---|---|
| | | | | | | ScaleAx-isStep 158182 | | 1..2 158184 | ScaleAx-isStep 158186 |
| | | | | | | Rate 158188 | | 0..1 158190 | Rate 158192 |
| | | | | | | | Decimal-Value 158194 | 1 158196 | Decimal-Value 158198 |
| | | | | | | | Measure-UnitCode 158200 | 0..1 158202 | Measure-UnitCode 158204 |
| | | | | | | | Currency-Code 158206 | 0..1 158208 | Currency-Code 158210 |
| | | | | | | | Base-Measure-UnitCode 158212 | 0..1 158214 | Measure-UnitCode 158216 |

FIG. 158-9

| Package | level1 | level2 | level3 | level4 | level5 | level6 | level7 | Cardinality | Datatype Name |
|---|---|---|---|---|---|---|---|---|---|
| | | | | | | | BaseDecimalValue 158218 | 0..1 158220 | Decimal-Value 158222 |
| | | | | | | Rate-Quanti-tyType-Code 158224 | | 0..1 158226 | Quanti-tyType-Code 158228 |
| | | | | | | Rate-BaseQuantityType-Code 158230 | | 0..1 158232 | Quanti-tyType-Code 158234 |

FIG. 159-1

| Package | level1 | level2 | level3 | level4 | level5 | level6 | level7 | Cardinality | Datatype Name |
|---|---|---|---|---|---|---|---|---|---|
| SalesPriceListReplicateRequestMessage 159000 | SalesPriceListReplicateRequestMessage 159002 | | | | | | | 1 159004 | SalesPriceListReplicateRequestMessage 159006 |
| MessageHeader 159008 | | MessageHeader 159010 | | | | | | 1 159012 | BusinessDocumentMessageHeader 159014 |
| SalesPriceListReplicateRequest 159016 | | SalesPriceListReplicateRequest 159018 | | | | | | 1 159020 | SalesPriceListReplicateRequest 159022 |
| | | | SalesPriceList 159024 | | | | | 1..n 159026 | SalesPriceList 159028 |

FIG. 159-2

| Package | level1 | level2 | level3 | level4 | level5 | level6 | level7 | Cardinality | Datatype Name |
|---|---|---|---|---|---|---|---|---|---|
| | | | | ID 159030 | | | | 1 159032 | SalesPriceListID 159034 |
| | | | | TypeCode 159036 | | | | 0..1 159038 | SalesPriceList-TypeCode 159040 |
| | | | | Valid-ityPeriod 159042 | | | | 1 159044 | Time-PointPe-riod 159046 |
| | | | | Property-Definition-ClassCode 159048 | | | | 0..1 159050 | PriceSpecifica-tionEle-ment-Property-Definition-ClassCode 159052 |

FIG. 159-3

| Package | level1 | level2 | level3 | level4 | level5 | level6 | level7 | Cardinality | Datatype Name |
|---|---|---|---|---|---|---|---|---|---|
| | | | | Currency-Code 159054 | | | | 0..1 159056 | Currency-Code 159058 |
| | | | | Descrip-tion 159060 | | | | 0..n 159062 | Descrip-tion 159064 |
| | | | | Property-Valuation 159066 | | | | 0..n 159068 | PriceSpec ifica-tionEle-ment-Property-Valuation 159070 |
| PriceSpec ification 159072 | | | | PriceSpec ification 159074 | | | | 1..n 159076 | PriceSpec ifica-tionEle-ment 159078 |

FIG. 159-4

| Package | level1 | level2 | level3 | level4 | level5 | level6 | level7 | Cardinality | Datatype Name |
|---|---|---|---|---|---|---|---|---|---|
| | | | | | TypeCode 159080 | | | 0..1 159082 | PriceSpecificationElementTypeCode 159084 |
| | | | | | CategoryCode 159086 | | | 0..1 159088 | PriceSpecificationElementCategoryCode 159090 |
| | | | | | PurposeCode 159092 | | | 0..1 159094 | PriceSpecificationElementPurposeCode 159096 |
| | | | | | ValidityPeriod 159098 | | | 1 159100 | TimePointPeriod 159102 |

FIG. 159-5

| Package | level1 | level2 | level3 | level4 | level5 | level6 | level7 | Cardinality | Datatype Name |
|---|---|---|---|---|---|---|---|---|---|
| | | | | | Property-Defini-tionClass-Code 159104 | | | 0..1 159106 | PriceSpec ifica-tionEle-ment-Property-Definition-ClassCod e 159108 |
| | | | | | Rate 159110 | | | 0..1 159112 | Rate 159114 |
| | | | | | | Decimal-Value 159116 | | 1 159118 | Decimal-Value 159120 |
| | | | | | | Measure-UnitCode 159122 | | 0..1 159124 | Measure-UnitCode 159126 |
| | | | | | | Currency-Code 159128 | | 0..1 159130 | Currency-Code 159132 |

FIG. 159-6

| Package | level1 | level2 | level3 | level4 | level5 | level6 | level7 | Cardinality | Datatype Name |
|---|---|---|---|---|---|---|---|---|---|
| | | | | | | Base-Measure-UnitCode 159134 | | 0..1 159136 | Measure-UnitCode 159138 |
| | | | | | | BaseDecimalValue 159140 | | 0..1 159142 | Decimal-Value 159144 |
| | | | | | Rate-Quanti-tyType-Code 159146 | | | 0..1 159148 | Quanti-tyType-Code 159150 |
| | | | | | RateBase Quanti-tyType-Code 159152 | | | 0..1 159154 | Quanti-tyType-Code 159156 |

FIG. 159-7

| Package | level1 | level2 | level3 | level4 | level5 | level6 | level7 | Cardinality | Datatype Name |
|---|---|---|---|---|---|---|---|---|---|
| | | | | | Property-Valuation 159158 | | | 1..n 159160 | PriceSpecifica-tionEle-ment-Property-Valuation 159162 |
| | | | | | ScaleLine 159164 | | | 0..n 159166 | PriceSpecifica-tionEle-mentScaleLine 159168 |
| | | | | | | ScaleAx-isStep 159170 | | 1..2 159172 | ScaleAx-isStep 159174 |
| | | | | | | Rate 159176 | | 0..1 159178 | Rate 159180 |
| | | | | | | | Decimal-Value 159182 | 1 159184 | Decimal-Value 159186 |

FIG. 159-8

| Package | level1 | level2 | level3 | level4 | level5 | level6 | level7 | Cardinality | Datatype Name |
|---|---|---|---|---|---|---|---|---|---|
| | | | | | | | Measure-UnitCode 159188 | 0..1 159190 | Measure-UnitCode 159192 |
| | | | | | | | Currency-Code 159194 | 0..1 159196 | Currency-Code 159198 |
| | | | | | | | Base-Measure-UnitCode 159200 | 0..1 159202 | Measure-UnitCode 159204 |
| | | | | | | | BaseDeci-malValue 159206 | 0..1 159208 | Decimal-Value 159210 |
| | | | | | | Rate-Quanti-tyType-Code 159212 | | 0..1 159214 | Quanti-tyType-Code 159216 |

FIG. 159-9

| Package | level1 | level2 | level3 | level4 | level5 | level6 | level7 | Cardinality | Datatype Name |
|---|---|---|---|---|---|---|---|---|---|
| | | | | | | RateBase Quanti-tyType-Code 159218 | | 0..1 159220 | Quanti-tyType-Code 159222 |

FIG. 161-1

| Package | level1 | level2 | level3 | level4 | level5 | level6 | Cardinality | Datatype Name |
|---|---|---|---|---|---|---|---|---|
| SalesPriceSpecificationReplicateConfirmationMessage 161000 | SalesPriceSpecification-Repli-cateCon-firmation-Message 161002 | | | | | | 1 161004 | SalesPriceSpecification-Repli-cateRe-quest-Message 161006 |
| MessageHeader 161008 | | Message-Header 161010 | | | | | 1 161012 | Busi-nessDocumentMes-sage-Header 161014 |
| SalesPriceSpecificationReplicateConfirmation 161016 | | SalesPriceSpecification-Repli-cateCon-firmation 161018 | | | | | 1 161020 | SalesPriceSpecification-Repli-cateRe-quest 161022 |

FIG. 161-2

| Package | level1 | level2 | level3 | level4 | level5 | level6 | Cardinality | Datatype Name |
|---|---|---|---|---|---|---|---|---|
| | | | SalesPriceSpecification 161024 | | | | 1..n 161026 | PriceSpecificationElement 161028 |
| | | | | TypeCode 161030 | | | 0..1 161032 | PriceSpecificationElementTypeCode 161034 |
| | | | | CategoryCode 161036 | | | 0..1 161038 | PriceSpecificationElementCategoryCode 161040 |
| | | | | PurposeCode 161042 | | | 0..1 161044 | PriceSpecificationElementPurposeCode 161046 |

FIG. 161-3

| Package | level1 | level2 | level3 | level4 | level5 | level6 | Cardinality | Datatype Name |
|---|---|---|---|---|---|---|---|---|
| | | | | Valid-ityPeriod 161048 | | | 1 161050 | Time-PointPe-riod 161052 |
| | | | | Property-Definition-ClassCode 161054 | | | 0..1 161056 | PriceSpecifica-tionEle-ment-Property-Defini-tionClass-Code 161058 |
| | | | | Rate 161060 | | | 0..1 161062 | Rate 161064 |
| | | | | | Decimal-Value 161066 | | 1 161068 | Decimal-Value 161070 |
| | | | | | Measure-UnitCode 161072 | | 0..1 161074 | Measure-UnitCode 161076 |

FIG. 161-4

| Package | level1 | level2 | level3 | level4 | level5 | level6 | Cardinality | Datatype Name |
|---|---|---|---|---|---|---|---|---|
| | | | | | Currency-Code 161078 | | 0..1 161080 | Cur-rencyCode 161082 |
| | | | | | Base-Measure-UnitCode 161084 | | 0..1 161086 | Measure-UnitCode 161088 |
| | | | | | BaseDecimalValue 161090 | | 0..1 161092 | Decimal-Value 161094 |
| | | | | Rate-Quanti-tyType-Code 161096 | | | 0..1 161098 | Quanti-tyType-Code 161100 |
| | | | | RateBase-Quanti-tyType-Code 161102 | | | 0..1 161104 | Quanti-tyType-Code 161106 |

FIG. 161-5

| Package | level1 | level2 | level3 | level4 | level5 | level6 | Cardinality | Datatype Name |
|---|---|---|---|---|---|---|---|---|
| | | | | Accep-tanceS-tatusCode 161108 | | | 0..1 161110 | Accep-tanceS-tatusCode 161112 |
| | | | | Property-Valuation 161114 | | | 1..n 161116 | PriceSpec ifica-tionEle-ment-Property-Valuation 161118 |
| | | | | ScaleLine 161120 | | | 0..n 161122 | PriceSpec ifica-tionEle-mentScale Line 161124 |
| | | | | | ScaleAx-isStep 161126 | | 1..2 161128 | ScaleAx-isStep 161130 |
| | | | | | Rate 161132 | | 0..1 161134 | Rate 161136 |

FIG. 161-6

| Package | level1 | level2 | level3 | level4 | level5 | level6 | Cardinality | Datatype Name |
|---|---|---|---|---|---|---|---|---|
| | | | | | | Decimal-Value 161138 | 1 161140 | Decimal-Value 161142 |
| | | | | | | Measure-UnitCode 161144 | 0..1 161146 | Measure-UnitCode 161148 |
| | | | | | | Currency-Code 161150 | 0..1 161152 | Cur-rencyCod e 161154 |
| | | | | | | Base-Measure-UnitCode 161156 | 0..1 161158 | Measure-UnitCode 161160 |
| | | | | | | BaseDeci malValue 161162 | 0..1 161164 | Decimal-Value 161166 |

FIG. 161-7

| Package | level1 | level2 | level3 | level4 | level5 | level6 | Cardinality | Datatype Name |
|---|---|---|---|---|---|---|---|---|
| | | | | | Rate-Quanti-tyType-Code 161168 | | 0..1 161170 | Quanti-tyType-Code 161172 |
| | | | | | RateBase-Quanti-tyType-Code 161174 | | 0..1 161176 | Quanti-tyType-Code 161178 |

FIG. 162-1

| Package | level1 | level2 | level3 | level4 | level5 | level6 | Cardinality | Datatype Name |
|---|---|---|---|---|---|---|---|---|
| SalesPriceSpecificationReplicateRequestMessage 162000 | SalesPriceSpecificationReplicateRequestMessage 162002 | | | | | | 1 162004 | SalesPriceSpecificationReplicateRequestMessage 162006 |
| MessageHeader 162008 | | MessageHeader 162010 | | | | | 1 162012 | BusinessDocumentMessageHeader 162014 |
| SalesPriceSpecificationReplicateRequest 162016 | | SalesPriceSpecificationReplicateRequest 162018 | | | | | 1 162020 | SalesPriceSpecificationReplicateRequest 162022 |

FIG. 162-2

| Package | level1 | level2 | level3 | level4 | level5 | level6 | Cardinality | Datatype Name |
|---|---|---|---|---|---|---|---|---|
| | | | SalesPriceSpecification 162024 | | | | 1..n 162026 | PriceSpecificationElement 162028 |
| | | | | TypeCode 162030 | | | 0..1 162032 | PriceSpecificationElementTypeCode 162034 |
| | | | | CategoryCode 162036 | | | 0..1 162038 | PriceSpecificationElementCategoryCode 162040 |

FIG. 162-3

| Package | level1 | level2 | level3 | level4 | level5 | level6 | Cardinality | Datatype Name |
|---|---|---|---|---|---|---|---|---|
| | | | | Purpose-Code 162042 | | | 0..1 162044 | PriceSpecification-ElementPurposeCode 162046 |
| | | | | ValidityPeriod 162048 | | | 1 162050 | TimePointPeriod 162052 |
| | | | | Property-Definition-ClassCode 162054 | | | 0..1 162056 | PriceSpecificationElement-Property-Definition-ClassCode 162058 |
| | | | | Rate 162060 | | | 0..1 162062 | Rate 162064 |

FIG. 162-4

| Package | level1 | level2 | level3 | level4 | level5 | level6 | Cardinality | Datatype Name |
|---|---|---|---|---|---|---|---|---|
| | | | | | Decimal-Value 162066 | | 1 162068 | Decimal-Value 162070 |
| | | | | | Measure-UnitCode 162072 | | 0..1 162074 | Measure-UnitCode 162076 |
| | | | | | Cur-rencyCode 162078 | | 0..1 162080 | Cur-rencyCode 162082 |
| | | | | | Base-Measure-UnitCode 162084 | | 0..1 162086 | Measure-UnitCode 162088 |
| | | | | | BaseDecimalValue 162090 | | 0..1 162092 | Decimal-Value 162094 |
| | | | | Rate-Quanti-tyType-Code 162096 | | | 0..1 162098 | Quanti-tyType-Code 162100 |

FIG. 162-5

| Package | level1 | level2 | level3 | level4 | level5 | level6 | Cardinality | Datatype Name |
|---|---|---|---|---|---|---|---|---|
| | | | | Rate-BaseQuantityType-Code 162102 | | | 0..1 162104 | Quanti-tyType-Code 162106 |
| | | | | Property-Valuation 162108 | | | 1..n 162110 | PriceSpecifica-tionEle-ment-Property-Valuation 162112 |
| | | | | ScaleLine 162114 | | | 0..n 162116 | PriceSpecifica-tionEle-mentScale Line 162118 |
| | | | | | ScaleAx-isStep 162120 | | 1..2 162122 | ScaleAx-isStep 162124 |

FIG. 162-6

| Package | level1 | level2 | level3 | level4 | level5 | level6 | Cardinality | Datatype Name |
|---|---|---|---|---|---|---|---|---|
| | | | | | Rate 162126 | | 0..1 162128 | Rate 162130 |
| | | | | | | Decimal-Value 162132 | 1 162134 | Decimal-Value 162136 |
| | | | | | | Measure-UnitCode 162138 | 0..1 162140 | Measure-UnitCode 162142 |
| | | | | | | Currency-Code 162144 | 0..1 162146 | Cur-rencyCode 162148 |
| | | | | | | Base-Measure-UnitCode 162150 | 0..1 162152 | Measure-UnitCode 162154 |
| | | | | | | BaseDecimalValue 162156 | 0..1 162158 | Decimal-Value 162160 |

FIG. 162-7

| Package | level1 | level2 | level3 | level4 | level5 | level6 | Cardinality | Datatype Name |
|---|---|---|---|---|---|---|---|---|
| | | | | | Rate-Quanti-tyType-Code 162162 | | 0..1 162164 | Quanti-tyType-Code 162166 |
| | | | | | Rate-BaseQuantityType-Code 162168 | | 0..1 162170 | Quanti-tyType-Code 162172 |

| Package | level1 | level2 | level3 | level4 | level5 | Cardinality | Datatype Name |
|---|---|---|---|---|---|---|---|
| CN_EmployeeTaxArrangementMessage 177000 | CN_EmployeeTaxArrangementMessage 177002 | | | | | | <Message-DataType> 177004 |
| MessageHeader 177006 | | Message-Header 177008 | | | | 1 177010 | Business-Document-Message-Header 177012 |
| | | | ID 177014 | | | 1 177016 | Business-Document-MessageID 177018 |
| | | | Creation-DateTime 177020 | | | 1 177022 | DateTime 177024 |
| | | | … | | | 0..1 177026 | … |
| CN_EmployeeTaxArrangement 177028 | | CN_EmployeeTaxAr-rangement 177030 | | | | 1 177032 | … |

FIG. 177-2

| Package | | | level1 | level2 | level3 | level4 | level5 | Cardinality | Datatype Name |
|---|---|---|---|---|---|---|---|---|---|
| | | | | | UUID 177034 | | | 1 177036 | UUID 177038 |
| | | | | | EmployeeUUID 177040 | | | 1 177042 | UUID 177044 |
| | Workagreementltem 177046 | | | | Workagreementltem 177048 | | | … | … |
| | | | | | | @workAgreementItemPeriodTermsListCompleteTransmissionIndicator 177050 | | 0..1 177052 | Indicator 177054 |
| | | | | | | WorkAgreementUUID 177056 | | 1 177058 | UUID 177060 |
| | | WorkAgreementItemPeriodTerms 177062 | | | | WorkAgreementItemPeriodTerms 177064 | | 0..n 177066 | … |

FIG. 177-3

| Package | | | level1 | level2 | level3 | level4 | level5 | Cardinality | Datatype Name |
|---|---|---|---|---|---|---|---|---|---|
| | | | | | | | @actionCode 177068 | 1 177070 | ActionCode 177072 |
| | | | | | | | UUID 177074 | 1 177076 | UUID 177078 |
| | | | | | | | ValidityPeriod 177080 | 1 177082 | CLOSED_DatePeriod 177084 |
| | | | | | | | EmployeeRegionalTaxRegulationsCode 177086 | 1 177088 | EmployeeRegionalTaxRegulationsCode 177090 |
| | | | | | | | EmployeeTaxExpatriateCategoryCode 177092 | 0..1 177094 | EmployeeTaxExpatriateCategoryCode 177096 |
| | | | | | | | TaxExemptionAmount 177098 | 1 177100 | CURRENCYCNY_MEDIUM_Amount 177102 |

FIG. 177-4

| Package | | | | level1 | level2 | level3 | level4 | level5 | Cardinality | Datatype Name |
|---|---|---|---|---|---|---|---|---|---|---|
| | | | | | | | | TaxPaidBy-CompanyIn-dicator 177104 | 0..1 177106 | PaidByCom-panyIndicator 177108 |
| | | | | | | | | TaxExempt-edIndicator 177110 | 0..1 177112 | ExemptedIndi-cator 177114 |

FIG. 181-1

| Package | level1 | level2 | level3 | level4 | level5 | level6 | level7 | Cardinality | Datatype Name |
|---|---|---|---|---|---|---|---|---|---|
| DE_EmployeeTaxArrangementMessage 181000 | DE_EmployeeTaxArrangementMessage 181002 | | | | | | | | DE_EmployeeTaxArrangement-Message 181004 |
| MessageHeader 181006 | | Message-Header 181008 | | | | | | 1 181010 | Business-Document-Message-Header 181012 |
| | | | ID 181014 | | | | | 1 181016 | Business-Document-MessageID 181018 |
| | | | Creation-DateTime 181020 | | | | | 1 181022 | DateTime 181024 |
| | | | ... | | | | | 0..1 181026 | ... |
| DE_EmployeeTax Arrangement 181028 | | DE_EmployeeTaxAr-rangement 181030 | | | | | | 1 181032 | DE_EmployeeTaxArrangement-PayrollNotification 181034 |
| | | | UUID 181036 | | | | | 1 181038 | UUID 181040 |

FIG. 181-2

| Package | level1 | level2 | level3 | level4 | level5 | level6 | level7 | Cardinality | Datatype Name |
|---|---|---|---|---|---|---|---|---|---|
| | | | Employ-eeUUID 181042 | | | | | 1 181044 | UUID 181046 |
| Employmen-tItem 181048 | | | Employ-mentItem 181050 | | | | | … | DE_EmployeeTaxAr-rangement-PayrollNoti-ficationEm-ploymen-tItem 181052 |
| | | | | @employmentItemTax-CardListCompleteTrans-missionIndi-cator 181054 | | | | 0..1 181056 | Indicator 181058 |
| | | | | @employmentItemSup-plementary-DetailsList-Com-pleteTrans-missionIndi-cator 181060 | | | | 0..1 181062 | Indicator 181064 |

FIG. 181-3

| Package | level1 | level2 | level3 | level4 | level5 | level6 | level7 | Cardinality | Datatype Name |
|---|---|---|---|---|---|---|---|---|---|
| | | | | EmploymentUUID 181066 | | | | 1 181068 | UUID 181070 |
| EmploymentItemTaxCard 181072 | | | | EmploymentItemTaxCard 181074 | | | | 0..n 181076 | DE_EmployeeTaxArrangementPayrollNotificationEmploymentItemTaxCard 181078 |
| | | | | | @actionCode 181080 | | | 1 181082 | ActionCode 181084 |
| | | | | | @employmentItemTaxCardDetailsListCompleteTransmissionIndicator 181086 | | | 0..1 181088 | Indicator 181090 |

FIG. 181-4

| Package | level1 | level2 | level3 | level4 | level5 | level6 | level7 | Cardinality | Datatype Name |
|---|---|---|---|---|---|---|---|---|---|
| | | | | | @employmentItemTaxCardPreviousEmploymentDetailsListCompleteTransmissionIndicator 181092 | | | 0..1 181094 | Indicator 181096 |
| | | | | | UUID 181098 | | | 1 181100 | UUID 181102 |
| | | | | | TaxCardYear 181104 | | | 0..1 181106 | Year 181108 |
| | | | | | EmploymentItemTaxCardDetails 181110 | | | 0..n 181112 | DE_EmployeeTaxArrangementPayrollNotificationEmploymentItemTaxCardDetails 181114 |
| | | | | | | @actionCode 181116 | | 1 181118 | ActionCode 181120 |
| | | | | | | UUID 181122 | | 1 181124 | UUID 181126 |

FIG. 181-5

| Package | level1 | level2 | level3 | level4 | level5 | level6 | level7 | Cardinality | Datatype Name |
|---|---|---|---|---|---|---|---|---|---|
| | | | | | | ValidityPeriod 181128 | | 0..1 181130 | CLOSED_DatePeriod 181132 |
| | | | | | | IssuingMunicipalityCode 181134 | | 0..1 181136 | MunicipalityCode 181138 |
| | | | | | | TaxAuthorityPartyID 181140 | | 0..1 181142 | TaxAuthorityType 181144 |
| | | | | | | EmployeeIncomeTaxClassCode 181146 | | 0..1 181148 | EmployeeIncomeTaxClassCode 181150 |
| | | | | | | EmployeeTaxationChildExemptionsValue 181152 | | 0..1 181154 | EmployeeTaxationChildExemptionslValue 181156 |
| | | | | | | EmployeeTaxationChurchCode 181158 | | 0..1 181160 | EmployeeTaxationChurchCode 181162 |
| | | | | | | SpouseTaxationChurchCode 181164 | | 0..1 181166 | EmployeeTaxationChurchCode 181168 |

FIG. 181-6

| Package | level1 | level2 | level3 | level4 | level5 | level6 | level7 | Cardinality | Datatype Name |
|---|---|---|---|---|---|---|---|---|---|
| | | | | | | Employee-Taxation-ChurchRe-gionCode 181170 | | 0..1 181172 | Employee-Taxation-ChurchRe-gionCode 181174 |
| | | | | | | PersonalAn-nualTaxEx-emptAmount 181176 | | 0..1 181178 | CURRENCY EUR_MEDI UMINTEGE R_Amount 181180 |
| | | | | | | Personal-Monthly-TaxExemp-tAmount 181182 | | 0..1 181184 | CURRENCY EUR_MEDI UMINTEGE R_Amount 181186 |
| | | | | | | Addi-tionalAnnu-alAmount 181188 | | 0..1 181190 | CURRENCY EUR_MEDI UMINTEGE R_Amount 181192 |
| | | | | | | Additional-MonthlyA-mount 181194 | | 0..1 181196 | CURRENCY EUR_MEDI UMINTEGE R_Amount 181198 |

FIG. 181-7

| Package | level1 | level2 | level3 | level4 | level5 | level6 | level7 | Cardinality | Datatype Name |
|---|---|---|---|---|---|---|---|---|---|
| | | | | | | Employee-TaxCard-MissingRea-sonCode 181200 | | 0..1 181202 | Employee-TaxCard-MissingRea-sonCode 181204 |
| | | | | | Employmen-tItemTax-CardPrevi-ousEmploy-mentDetails 181206 | | | 0..n 181208 | DE_EmployeeTaxArrangementPayrollNotifica-tionEmploy-mentItem-TaxCard-Previ-ousEmploy-mentDetails 181210 |
| | | | | | | @actionCode 181212 | | 1 181214 | ActionCode 181216 |
| | | | | | | UUID 181218 | | 1 181220 | UUID 181222 |
| | | | | | | ValidityPe-riod 181224 | | 0..1 181226 | CLOSED_DatePeriod 181228 |
| | | | | | | EmployeeIn-comeTax-ClassCode 181230 | | 0..1 181232 | EmployeeIn-comeTax-ClassCode 181234 |

FIG. 181-8

| Package | level1 | level2 | level3 | level4 | level5 | level6 | level7 | Cardinality | Datatype Name |
|---|---|---|---|---|---|---|---|---|---|
| | | | | | | Employee-Taxation-ChildExemptionsValue 181236 | | 0..1 181238 | Employee-Taxation-ChildExemptionslValue 181240 |
| | | | | | | Employee-Taxation-ChurchCode 181242 | | 0..1 181244 | Employee-Taxation-ChurchCode 181246 |
| | | | | | | Spouse-Taxation-ChurchCode 181248 | | 0..1 181250 | Employee-Taxation-ChurchCode 181252 |
| | | | | | | SpecialIncomeTax-TableApply-Indicator 181254 | | 0..1 181256 | Indicator 181258 |
| | | | | | | IncomeTax-LiabilityCode 181260 | | 0..1 181262 | IncomeTax-LiabilityCode 181264 |
| | | | | | | PeriodsWithoutEarningsEntitlement-Number-Value 181266 | | 0..1 181268 | EmployeePeriodsWithoutEarningsEntitlement-Number-Value 181270 |

FIG. 181-9

| Package | level1 | level2 | level3 | level4 | level5 | level6 | level7 | Cardinality | Datatype Name |
|---|---|---|---|---|---|---|---|---|---|
| | | | | | | EmploymentItemTaxCardPreviousEmploymentDetailsCertificatedAmounts 181272 | | 0..n 181274 | DE_EmployeeTaxArrangementPayrollNotificationEmploymentItemTaxCardPreviousEmploymentDetailsCertificatedAmounts 181276 |
| | | | | | | | TaxDeclarationKeyNumberTypeCode 181278 | 1 181280 | TaxDeclarationKeyNumberTypeCode 181282 |
| | | | | | | | TotalAmount 181284 | 0..1 181286 | CURRENCYEUR_MEDIUM_Amount 181288 |
| EmploymentItemSupplementaryDetails 181290 | | | | EmploymentItemSupplementaryDetails 181292 | | | | 0..n 181294 | DE_EmployeeTaxArrangementPayrollNotificationEmploymentItemSupplementaryDetails 181296 |

FIG. 181-10

| Package | level1 | level2 | level3 | level4 | level5 | level6 | level7 | Cardinality | Datatype Name |
|---|---|---|---|---|---|---|---|---|---|
| | | | | | @actionCode 181298 | | | 1 181300 | ActionCode 181302 |
| | | | | | UUID 181304 | | | 1 181306 | UUID 181308 |
| | | | | | ValidityPeriod 181310 | | | 0..1 181312 | CLOSED_DatePeriod 181314 |
| | | | | | IncomeTaxLiabilityCode 181316 | | | 0..1 181318 | IncomeTaxLiabilityCode 181320 |
| | | | | | EmployeeFlatRateTaxRegulationCode 181322 | | | 0..1 181324 | EmployeeFlatRateTaxRegulationCode 181326 |
| | | | | | TaxExemptionReasonCode 181328 | | | 0..1 181330 | TaxExemptionReasonCode 181332 |

FIG. 181-11

| Package | level1 | level2 | level3 | level4 | level5 | level6 | level7 | Cardinality | Datatype Name |
|---|---|---|---|---|---|---|---|---|---|
| | | | | | CrossBorderEmployeeDoubleTaxationTreatyResidenceCountryCode 181334 | | | 0..1 181336 | DoubleTaxationTreatyResidenceCountryCode 181338 |
| | | | | | TaxPassOntoEmployeeApplyIndicator 181340 | | | 0..1 181342 | Indicator 181344 |
| | | | | | EmployersAllowanceEmploymentMainIndicator 181346 | | | 0..1 181348 | Indicator 181350 |
| | | | | | SpecialIncomeTaxTableApplyIndicator 181352 | | | 0..1 181354 | Indicator 181356 |
| | | | | | AnnualEmploymentTaxAdjustmentBlockedIndicator 181358 | | | 0..1 181360 | Indicator 181362 |

FIG. 181-12

| Package | level1 | level2 | level3 | level4 | level5 | level6 | level7 | Cardinality | Datatype Name |
|---|---|---|---|---|---|---|---|---|---|
| | | | | | Employ-eeRetroac-tiveTaxa-tionCode 181364 | | | 0..1 181366 | Employ-eeRetroac-tiveTaxa-tionCode 181368 |
| | | | | | Employ-mentTax-Statement-Creation-Condition-Code 181370 | | | 0..1 181372 | Employ-mentTax-Statement-Creation-Condition-Code 181374 |

FIG. 184-1

| Package | level1 | level2 | level3 | level4 | level5 | level6 | Cardinality | Datatype Name |
|---|---|---|---|---|---|---|---|---|
| EmployeeCompensationAgreementPayrollMessage 184000 | EmployeeCompensationAgreementPayrollMessage 184002 | | | | | | | EmployeeCompensationAgreementPayrollMessage 184004 |
| MessageHeader 184006 | | MessageHeader 184008 | | | | | 1 184010 | BusinessDocumentMessageHeader 184012 |
| | | | ID 184014 | | | | 1 184016 | BusinessDocumentMessageID 184018 |

FIG. 184-2

| Package | | level1 | level2 | level3 | level4 | level5 | level6 | Cardinality | Datatype Name |
|---|---|---|---|---|---|---|---|---|---|
| | | | | Creation-DateTime 184020 | | | | 1 184022 | DateTime 184024 |
| | | | | Sender-Party 184026 | | | | 1 184028 | Business Docu-mentMessage-Header-Party 184030 |
| | | | | Recipi-entParty 184032 | | | | 1 184034 | Business Docu-mentMessage-Header-Party 184036 |

FIG. 184-3

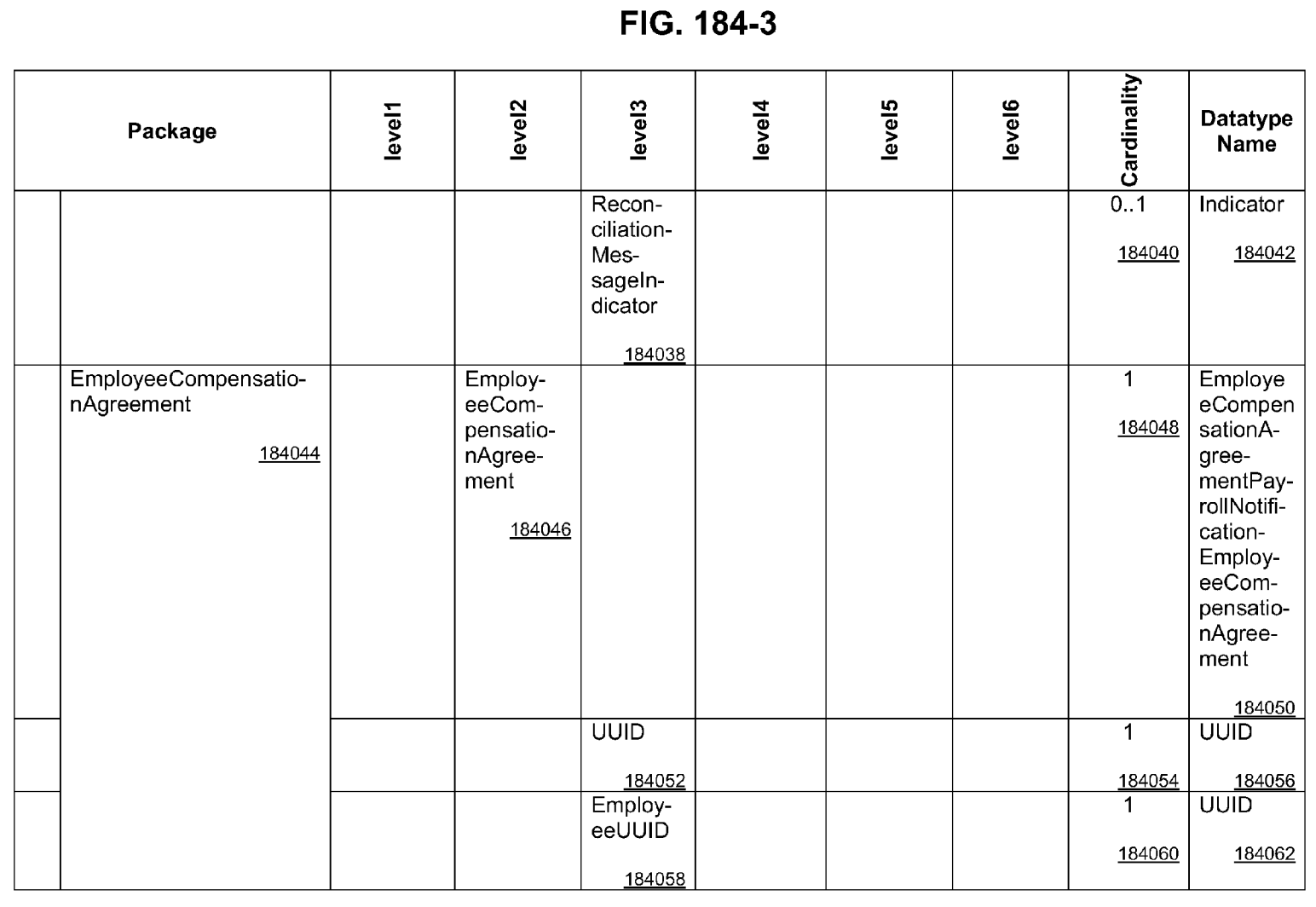

| Package | | level1 | level2 | level3 | level4 | level5 | level6 | Cardinality | Datatype Name |
|---|---|---|---|---|---|---|---|---|---|
| | | | | Recon-ciliation-Mes-sageIn-dicator 184038 | | | | 0..1 184040 | Indicator 184042 |
| | EmployeeCompensatio-nAgreement 184044 | | Employ-eeCom-pensatio-nAgree-ment 184046 | | | | | 1 184048 | Employe eCompen sationA-gree-mentPay-rollNotifi-cation-Employ-eeCom-pensatio-nAgree-ment 184050 |
| | | | | UUID 184052 | | | | 1 184054 | UUID 184056 |
| | | | | Employ-eeUUID 184058 | | | | 1 184060 | UUID 184062 |

FIG. 184-4

| Package | level1 | level2 | level3 | level4 | level5 | level6 | Cardinality | Datatype Name |
|---|---|---|---|---|---|---|---|---|
| Item 184064 | | | Item 184066 | | | | 0..n 184068 | EmployeeCompensationAgreement-Payroll-Notifica-tionEm-ployee-Compen-sationA-greemen-tItem 184070 |
| | | | | UUID 184072 | | | 1 184074 | UUID 184076 |
| | | | | WorkA-greemen-tUUID 184078 | | | 0..1 184080 | UUID 184082 |
| | | | | Employ-mentUUID 184084 | | | 0..1 184086 | UUID 184088 |

FIG. 184-5

| Package | level1 | level2 | level3 | level4 | level5 | level6 | Cardinality | Datatype Name |
|---|---|---|---|---|---|---|---|---|
| | | | | @Compensation-Component-DetailListCompleteTransmissionIndicator 184090 | | | 0..1 184092 | Indicator 184094 |

FIG. 184-6

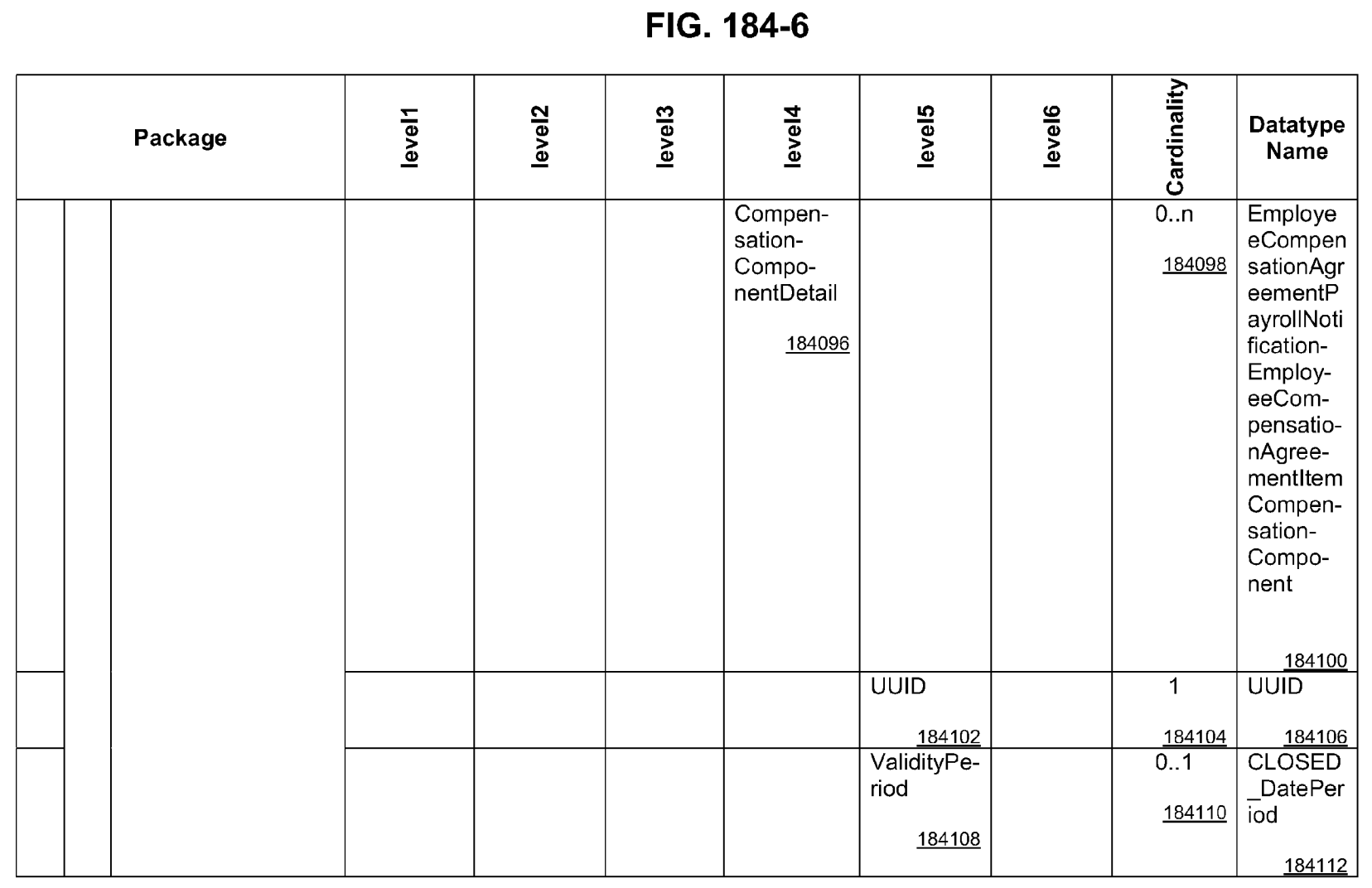

| Package | level1 | level2 | level3 | level4 | level5 | level6 | Cardinality | Datatype Name |
|---|---|---|---|---|---|---|---|---|
| | | | | Compen-sation-Compo-nentDetail 184096 | | | 0..n 184098 | EmployeeCompensationAgreementPayrollNotification-Employ-eeCom-pensatio-nAgree-mentItem Compen-sation-Compo-nent 184100 |
| | | | | | UUID 184102 | | 1 184104 | UUID 184106 |
| | | | | | ValidityPe-riod 184108 | | 0..1 184110 | CLOSED_DatePeriod 184112 |

FIG. 184-7

| Package | | | level1 | level2 | level3 | level4 | level5 | level6 | Cardinality | Datatype Name |
|---|---|---|---|---|---|---|---|---|---|---|
| | | | | | | | | StartDate 184114 | 0..1 184116 | Date 184118 |
| | | | | | | | | EndDate 184120 | 0..1 184122 | Date 184124 |
| | | | | | | | Compen-sation-Compo-nent-TypeUUID 184126 | | 0..1 184128 | UUID 184130 |
| | | | | | | | Compen-sation-Compo-nentA-mount 184132 | | 0..1 184134 | LARGE_ Amount 184136 |
| | | | | | | | | Currency Code 184138 | 0..1 184140 | Currency Code 184142 |

FIG. 184-8

| Package | level1 | level2 | level3 | level4 | level5 | level6 | Cardinality | Datatype Name |
|---|---|---|---|---|---|---|---|---|
| | | | | | Compen-sation-Compo-nentRe-currence-Frequency Code 184144 | | 0..1 184146 | COMPENSATIONCOMPONENT_Recur-rence-FrequencyCode 184148 |
| | | | | | Compen-sation-Compo-nentPer-cent 184150 | | 0..1 184152 | MEDIUM_Percent 184154 |
| | | | | | Compen-sation-Compo-nentCal-ender-DayRecur-rence 184156 | | 0..1 184158 | CalendarDayRec-curence 184160 |

FIG. 184-9

| Package | level1 | level2 | level3 | level4 | level5 | level6 | Cardinality | Datatype Name |
|---|---|---|---|---|---|---|---|---|
| | | | | | | Period 184162 | 0..1 184164 | DatePeriod 184166 |
| | | | | | | Value 184168 | 0..1 184170 | IntegerValue 184172 |
| | | | | | | MonthDayValue 184174 | 0..1 184176 | IntegerValue 184178 |
| | | | | | | FrequencyCode 184180 | 0..1 184182 | CALENDARDAY_RecurrenceFrequencyCode 184184 |
| | | | | | | FrequencyValue 184186 | 0..1 184188 | RecurrenceFrequencyValue 184190 |

FIG. 184-10

| Package | | | level1 | level2 | level3 | level4 | level5 | level6 | Cardinality | Datatype Name |
|---|---|---|---|---|---|---|---|---|---|---|
| | | | | | | | | Week-daySe-lection 184192 | 0..1 184194 | Week-daySe-lection 184196 |
| | | | | | | | | Month 184198 | 0..1 184200 | Month 184202 |
| | | | | | | | | Rela-tiveOrdi-nalNum-berValue 184204 | 0..1 184206 | Rela-tiveOrdi-nalNum-ber 184208 |
| | | | | | | | BankDe-tailsKey 184210 | | 0..1 184212 | Business Partner-BankDe-tailsKey 184214 |
| | | | | | | | | Business PartnerU UID 184216 | 0..1 184218 | UUID 184220 |

FIG. 184-11

| Package | level1 | level2 | level3 | level4 | level5 | level6 | Cardinality | Datatype Name |
|---|---|---|---|---|---|---|---|---|
| | | | | | | ID 184222 | 0..1 184224 | BusinessPartner-BankDetailsID 184226 |
| | | | | | NoteToPayeeNote 184228 | | 0..1 184230 | MEDIUM_Note 184232 |
| | | | | | | Language-Code 184234 | 0..1 184236 | Language-Code 184238 |
| | | | | | @actionCode 184240 | | 1 184242 | Action-Code 184244 |

FIG. 185-1

| Package | level1 | level2 | level3 | level4 | level5 | level6 | level7 | Cardinality | Datatype Name |
|---|---|---|---|---|---|---|---|---|---|
| EmployeeCompensationAgreementPayrollNotificationMessage 185000 | EmployeeCompensationAgreementPayrollNotificationMessage 185002 | | | | | | | | <MessageDataType> 185004 |
| MessageHeader 185006 | | MessageHeader 185008 | | | | | | 1 185010 | BusinessDocumentMessageHeader 185012 |
| | | | ID 185014 | | | | | 1 185016 | BusinessDocumentMessageID 185018 |

FIG. 185-2

| Package | level1 | level2 | level3 | level4 | level5 | level6 | level7 | Cardinality | Datatype Name |
|---|---|---|---|---|---|---|---|---|---|
| | | | Creation-DateTime 185020 | | | | | 1 185022 | DateTime 185024 |
| | | | … | | | | | 0..1 185026 | … |
| EmployeeCompensa-tionAgreement 185028 | | Employ-eeCom-pensatio-nAgree-ment 185030 | | | | | | 1 185032 | EmployeeCompensationA-gree-mentPay-rollNotifi-cation-Employ-eeCom-pensatio-nAgree-ment 185034 |
| | | | UUID 185036 | | | | | 1 185038 | UUID 185040 |

FIG. 185-3

| Package | level1 | level2 | level3 | level4 | level5 | level6 | level7 | Cardinality | Datatype Name |
|---|---|---|---|---|---|---|---|---|---|
| | | | itemList-Com-pleteTransmission-Indicator 185042 | | | | | 0..1 185044 | Indicator 185046 |
| | | | Employ-eeUUID 185048 | | | | | 1 185050 | UUID 185052 |
| Item 185054 | | | Item 185056 | | | | | 0..n 185058 | EmployeeCompensationAgreement-Payroll-Notifica-tionEm-ployee-Compen-sationA-greemen-tItem 185060 |
| | | | | UUID 185062 | | | | 1 185064 | UUID 185066 |

FIG. 185-4

| Package | | | level1 | level2 | level3 | level4 | level5 | level6 | level7 | Cardinality | Datatype Name |
|---|---|---|---|---|---|---|---|---|---|---|---|
| | | | | | | Employ-mentUUID 185068 | | | | 0..1 185070 | UUID 185072 |
| | | | | | | WorkA-greemen-tUUID 185074 | | | | 0..1 185076 | UUID 185078 |
| | | | | | | ItemCom-pensa-tionCom-ponent 185080 | | | | | EmployeeCompensationAgreementPayrollNotification-Employ-eeCom-pensatio-nAgree-mentItem Compen-sation-Compo-nent 185082 |

FIG. 185-5

| Package | | | level1 | level2 | level3 | level4 | level5 | level6 | level7 | Cardinality | Datatype Name |
|---|---|---|---|---|---|---|---|---|---|---|---|
| | | | | | | | UUID 185084 | | | | UUID 185086 |
| | | | | | | | Compen-sation-Compo-nent-TypeUUID 185088 | | | | UUID 185090 |
| | | | | | | | Compen-sation-Compo-nent-TypeID 185092 | | | | Compen-sation-Compo-nent-TypeID 185094 |
| | | | | | | | BankDe-tailKey 185096 | | | | Busi-nessPart ner-BankDe-tailsKey 185098 |
| | | | | | | | | Business-Part-nerUUID 185100 | | | UUID 185102 |

FIG. 185-6

| Package | | | level1 | level2 | level3 | level4 | level5 | level6 | level7 | Cardinality | Datatype Name |
|---|---|---|---|---|---|---|---|---|---|---|---|
| | | | | | | | | ID 185104 | | | ID 185106 |
| | | | | | | | Note 185108 | | | | |
| | | | | | | | ItemCom-pensa-tionCom-ponentDe-tail 185110 | | | | EmployeeCompensationAgreementPayrollNotificationEmployee-Compen-sationA-greemen-tItem-Compen-sation-Compo-nentDe-tail 185112 |
| | | | | | | | | UUID 185114 | | | UUID 185116 |

FIG. 185-7

| Package | | | level1 | level2 | level3 | level4 | level5 | level6 | level7 | Cardinality | Datatype Name |
|---|---|---|---|---|---|---|---|---|---|---|---|
| | | | | | | | | action-Code 185118 | | | Action-Code 185120 |
| | | | | | | | | Valid-ityPeriod 185122 | | | Closed_DatePeriod 185124 |
| | | | | | | | | Compen-sation-Compo-nentPer-cent 185126 | | | MEDIUM_Percent 185128 |
| | | | | | | | | DueDateRecurrence 185130 | | | Recur-rence 185132 |
| | | | | | | | | ItemCom-pensa-tionCom-ponentDe-tailRate 185134 | | | |

FIG. 185-8

| Package | | | level1 | level2 | level3 | level4 | level5 | level6 | level7 | Cardinality | Datatype Name |
|---|---|---|---|---|---|---|---|---|---|---|---|
| | | | | | | | | | UUID 185136 | | UUID 185138 |
| | | | | | | | | | Compen-sation-Compo-nentA-mount 185140 | | LARGE_ Amount 185142 |
| | | | | | | | | | Compen-sation-Compo-nentRe-currence-Frequenc yCode 185144 | | Recur-renceFre-quency-Code 185146 |

| Package | level1 | level2 | level3 | level4 | Cardinality | Datatype Name |
|---|---|---|---|---|---|---|
| EmployeeTimeAccountPayrollMessage 189000 | <Message-DataType> 189002 | | | | | EmployeeTimeAc-countPayrollMes-sage 189004 |
| MessageHeader 189006 | | Message Header 189008 | | | 1 189010 | BusinessDocu-mentMessage-Header 189012 |
| | | | ID 189014 | | 1 189016 | BusinessDocu-mentMessageID 189018 |
| | | | Creation-DateTime 189020 | | 1 189022 | DateTime 189024 |
| | | | Sender-Party 189026 | | 1 189028 | BusinessDocu-mentMessage-HeaderParty 189030 |

FIG. 189-2

| Package | | level1 | level2 | level3 | level4 | Cardinality | Datatype Name |
|---|---|---|---|---|---|---|---|
| | | | | Recipient-Party 189032 | | 1 189034 | BusinessDocu-mentMessage-HeaderParty 189036 |
| | | | | Recon-ciliation-Message-Indicator 189038 | | 1 189040 | Indicator 189042 |
| | EmployeeTimeAccount 189044 | | Employ-eeTimeA ccount 189046 | | | 1 189048 | EmployeeTimeAc-countPayrollNotifi-cation 189050 |
| | | | | Worka-greemen-tUUID 189052 | | 1 189054 | UUID 189056 |

FIG. 189-3

| Package | | | | level1 | level2 | level3 | level4 | Cardinality | Datatype Name |
|---|---|---|---|---|---|---|---|---|---|
| | | | | | | "@BalanceListCompleteTransmissionIndicator" 189058 | | 1 189060 | Indicator 189062 |
| | | | | | | TypeCode 189064 | | 1 189066 | EmployeeTimeAccountTypeCode 189068 |
| | | | | | | IdentifyingPeriod 189070 | | 0..1 189072 | CLOSED_DatePeriod 189074 |
| | | Balance 189076 | | | | Balance 189078 | | 1..n 189080 | EmployeeTimeAccountPayrollNotificationBalance 189082 |
| | | | | | | | "@ActionCode" 189084 | 1 189086 | ActionCode 189088 |

FIG. 189-4

| Package | | | | level1 | level2 | level3 | level4 | Cardinality | Datatype Name |
|---|---|---|---|---|---|---|---|---|---|
| | | | | | | | TypeCode 189090 | 1 189092 | EmployeeTimeAccountBalanceTypeCode 189094 |
| | | | | | | | Date 189096 | 0..1 189098 | Date 189100 |
| | | | | | | | Quantity 189102 | 0..1 189104 | Quantity 189106 |
| | | | | | | | QuantityTypeCode 189108 | 0..1 189110 | QuantityTypeCode 189112 |

| Package | level1 | level2 | level3 | level4 | level5 | Cardinality | Datatype Name |
|---|---|---|---|---|---|---|---|
| EmployeeTimeAgreementNotificationMessage 192000 | <MessageDataType> 192002 | | | | | | EmployeeTimeAgreementNotificationMessage 192004 |
| MessageHeader 192006 | | MessageHeader 192008 | | | | 1 192010 | BusinessDocumentMessageHeader 192012 |
| | | | ID 192014 | | | 1 192016 | BusinessDocumentMessageID 192018 |

FIG. 192-2

| Package | | level1 | level2 | level3 | level4 | level5 | Cardinality | Datatype Name |
|---|---|---|---|---|---|---|---|---|
| | | | | Creation-DateTime 192020 | | | 1 192022 | DateTime 192024 |
| | | | | Sender-Party 192026 | | | 1 192028 | Busi-nessDocumentMes-sageHeaderParty 192030 |
| | | | | Recipient-Party 192032 | | | 1 192034 | Business-Docu-mentMes-sageHeaderParty 192036 |
| | | | | Reconcilia-tionMes-sageIndi-cator 192038 | | | 1 192040 | Indicator 192042 |

FIG. 192-3

| Package | level1 | level2 | level3 | level4 | level5 | Cardinality | Datatype Name |
|---|---|---|---|---|---|---|---|
| EmployeeTimeAgreementNotification 192044 | | EmployeeTimeAgreementNotification 192046 | | | | 1 192048 | EmployeeTimeAgreementNotification 192050 |
| | | | WorkagreementUUID 192052 | | | 1 192054 | UUID 192056 |
| | | | AverageWorkingTimeListCompleteTransmissionIndicator 192058 | | | 1 192060 | Indicator 192062 |

FIG. 192-4

| Package | | | | level1 | level2 | level3 | level4 | level5 | Cardinality | Datatype Name |
|---|---|---|---|---|---|---|---|---|---|---|
| | | | | | | Work-WeekList-Com-pleteTransmissionIn-dicator 192064 | | | 1 192066 | Indicator 192068 |
| | | Average-WorkingTime 192070 | | | | Average-Working-Time 192072 | | | 0..n 192074 | Employ-eeTimeAgree-mentNoti-fica-tionAver-ageWork-ingTime 192076 |
| | | | | | | | Valid-ityPeriod 192078 | | 1 192080 | CLOSED_DatePeriod 192082 |

FIG. 192-5

| Package | | | | level1 | level2 | level3 | level4 | level5 | Cardinality | Datatype Name |
|---|---|---|---|---|---|---|---|---|---|---|
| | | | | | | | Rate 192084 | | 1..n 192086 | EmployeeTimeAgreementNotificationAverageWorkingTimeRate 192088 |
| | | | | | | | | Rate 192090 | 1 192092 | Rate 192094 |
| | | WorkWeek 192096 | | | | WorkWeek 192098 | | | 0..n 192100 | EmployeeTimeAgreementNotificationWorkWeek 192102 |

FIG. 192-6

| Package | | | | level1 | level2 | level3 | level4 | level5 | Cardinality | Datatype Name |
|---|---|---|---|---|---|---|---|---|---|---|
| | | | | | | | Valid-ityPeriod 192104 | | 1 192106 | CLOSED_DatePeriod 192108 |
| | | | | | | | StartDay 192110 | | 1 192112 | DayOf-Week 192114 |
| | | | | | | | Start-Time 192116 | | 1 192118 | Time 192120 |

| Package | level1 | level2 | level3 | level4 | level5 | Cardinality | Datatype Name |
|---|---|---|---|---|---|---|---|
| EmployeeTimeConfirmationViewOfServiceTransactionDocumentMessage 196000 | <MessageDataType> 196002 | | | | | | EmployeeTimeConfirmationViewOfServiceTransactionDocumentMessage 196004 |
| MessageHeader 196006 | | MessageHeader 196008 | | | | 1 196010 | BusinessDocumentMessageHeader 196012 |
| | | | ID 196014 | | | 1 196016 | BusinessDocumentMessageID 196018 |

FIG. 196-2

| Package | level1 | level2 | level3 | level4 | level5 | Cardinality | Datatype Name |
|---|---|---|---|---|---|---|---|
| | | | Creation-DateTime 196020 | | | 1 196022 | DateTime 196024 |
| | | | Sender-Party 196026 | | | 1 196028 | Business-Document-Message-HeaderParty 196030 |
| | | | Recipi-entParty 196032 | | | 1 196034 | Business-Document-Message-HeaderParty 196036 |
| | | | Recon-ciliation-Message-Indicator 196038 | | | 1 196040 | Indicator 196042 |

FIG. 196-3

| Package | level1 | level2 | level3 | level4 | level5 | Cardinality | Datatype Name |
|---|---|---|---|---|---|---|---|
| EmployeeTimeConfirmationViewOfServiceTransactionDocument 196044 | | EmployeeTimeConfirmationViewOfServiceTransactionDocument 196046 | | | | 1 196048 | EmployeeTimeConfirmationViewOfServiceTransactionDocument 196050 |
| | | | ID 196052 | | | 1 196054 | BusinessTransactionDocumentID 196056 |
| | | | Name 196058 | | | 1 196060 | Medium_Name 196062 |

FIG. 196-4

| Package | level1 | level2 | level3 | level4 | level5 | Cardinality | Datatype Name |
|---|---|---|---|---|---|---|---|
| | | | reconcil-liationPe-riodCoun-terValue 196064 | | | 1 196066 | Reconcilia-tionPeriod-CounterValue 196068 |
| Party 196070 | | | Buyer-Party 196072 | | | 0..1 196074 | Business-Transaction-Document-Party 196076 |
| | | | | InternalID 196078 | | 1 196080 | PartyInter-nalID 196082 |
| | | | Seller-Party 196084 | | | 0..1 196086 | Business-Transaction-Document-Party 196088 |

FIG. 196-5

| Package | level1 | level2 | level3 | level4 | level5 | Cardinality | Datatype Name |
|---|---|---|---|---|---|---|---|
| | | | | InternalID 196090 | | 1 196092 | PartyInternalID 196094 |
| Item 196096 | | | Item 196098 | | | 0..1 196100 | EmployeeTimeConfirmationViewOfServiceTransactionDocumentItem 196102 |
| | | | | ID 196104 | | 1 196106 | BusinessTransactionDocumentItemID 196108 |
| | | | | Quantity 196110 | | 0..1 196112 | Quantity 196114 |

FIG. 196-6

| Package | level1 | level2 | level3 | level4 | level5 | Cardinality | Datatype Name |
|---|---|---|---|---|---|---|---|
| | | | | Quanti-tyTypeCode 196116 | | 0..1 196118 | Quanti-tyTypeCode 196120 |
| | | | | Contrac-tReference 196122 | | 0..1 196124 | Business-Transaction-Documen-tReference 196126 |
| | | | | Description 196128 | | 1 196130 | MEDIUM_de scription 196132 |
| Party 196134 | | | | ServicePer-formerParty 196136 | | 0..1 196138 | Business-Transaction-Document-Party 196140 |

FIG. 196-7

| Package | level1 | level2 | level3 | level4 | level5 | Cardinality | Datatype Name |
|---|---|---|---|---|---|---|---|
| | | | | | InternalID 196142 | 1 196144 | PartyInter-nalID 196146 |
| ProductInformation 196148 | | | | ItemProduct 196150 | | 0..1 196152 | Business-Transaction-Document-Product 196154 |
| | | | | | InternalID 196156 | 1 196158 | ProductInter-nalID 196160 |
| | | | | Pro-ductCate-gory 196162 | | | |

FIG. 196-8

| Package | | | | level1 | level2 | level3 | level4 | level5 | Cardinality | Datatype Name |
|---|---|---|---|---|---|---|---|---|---|---|
| | | | | | | | | InternalID 196164 | 0..n 196166 | ProductCategoryInternalID 196168 |

| Package | level1 | level2 | level3 | level4 | level5 | Cardinality | Datatype Name |
|---|---|---|---|---|---|---|---|
| FR_EmployeeSocialInsuranceArrangementMessage 201000 | FR_EmployeeSocialInsuranceArrangementMessage 201002 | | | | | | <MessageDataType> 201004 |
| MessageHeader 201006 | | MessageHeader 201008 | | | | 1 201010 | BusinessDocumentMessageHeader 201012 |
| | | | ID 201014 | | | 1 201016 | BusinessDocumentMessageID 201018 |
| | | | CreationDateTime 201020 | | | 1 201022 | DateTime 201024 |
| | | | … | | | 0..1 201026 | … |

FIG. 201-2

| Package | level1 | level2 | level3 | level4 | level5 | Cardinality | Datatype Name |
|---|---|---|---|---|---|---|---|
| FR_EmployeeSocialInsuranceArrangement 201028 | | FR_EmployeeSocialInsuranceArrangement 201030 | | | | 1 201032 | … |
| | | | UUID 201034 | | | 1 201036 | UUID 201038 |
| | | | EmployeeUUID 201040 | | | 1 201042 | UUID 201044 |
| Workagreementltem 201046 | | | Workagreementltem 201048 | | | … | … |
| | | | | @workAgreementItemContributionModelListCompleteTransmissionIndicator 201050 | | 0..1 201052 | Indicator 201054 |

FIG. 201-3

| Package | level1 | level2 | level3 | level4 | level5 | Cardinality | Datatype Name |
|---|---|---|---|---|---|---|---|
| | | | | @workAgreementItemComplementaryContributionList-CompleteTransmissionIndicator 201056 | | 0..1 201058 | Indicator 201060 |
| | | | | WorkAgreementUUID 201062 | | 1 201064 | UUID 201066 |
| WorkAgreementItemContributionModel 201068 | | | | WorkAgreementItemContributionModel 201070 | | 0..n 201072 | … |
| | | | | | @actionCode 201074 | 1 201076 | ActionCode 201078 |
| | | | | | UUID 201080 | 1 201082 | UUID 201084 |

FIG. 201-4

| Package | level1 | level2 | level3 | level4 | level5 | Cardinality | Datatype Name |
|---|---|---|---|---|---|---|---|
| | | | | | ValidityPeriod 201086 | 1 201088 | CLOSED_DatePeriod 201090 |
| | | | | | SocialInsuranceTypeCode 201092 | 1 201094 | SocialInsuranceTypeCode 201096 |
| | | | | | EmployeeSocialInsuraceContributionModelCode 201098 | 1 201100 | EmployeeSocialInsuraceContributionModelCode 201102 |
| WorkAgreementItemComplementaryContribution | | | | WorkAgreementItemComplementaryContribution 201106 | | 0..n 201108 | … |

FIG. 201-5

| Package | level1 | level2 | level3 | level4 | level5 | Cardinality | Datatype Name |
|---|---|---|---|---|---|---|---|
| 201104 | | | | | @actionCode 201110 | 1 201112 | Action-Code 201114 |
| | | | | | UUID 201116 | 1 201118 | UUID 201120 |
| | | | | | ValidityPeriod 201122 | 1 201124 | CLOSED_DatePeriod 201126 |
| | | | | | BusinessPartnerUUID 201128 | 1 201130 | UUID 201132 |
| | | | | | EmployeeSocialInsuranceContributionTypeCode 201134 | 1 201136 | EmployeeSocialInsuranceContributionTypeCode 201138 |

FIG. 204-1

| Package | level1 | level2 | level3 | level4 | level5 | Cardinality | Datatype Name |
|---|---|---|---|---|---|---|---|
| GB_EmployeeSocialInsuranceArrangementMessage 204000 | GB_EmployeeSocialInsuranceArrangementMessage 204002 | | | | | | <MessageDataType> 204004 |
| MessageHeader 204006 | | MessageHeader 204008 | | | | 1 204010 | BusinessDocumentMessageHeader 204012 |
| | | | ID 204014 | | | 1 204016 | BusinessDocumentMessageID 204018 |
| | | | CreationDateTime 204020 | | | 1 204022 | DateTime 204024 |

FIG. 204-2

| Package | level1 | level2 | level3 | level4 | level5 | Cardinality | Datatype Name |
|---|---|---|---|---|---|---|---|
| | | | … | | | 0..1 204026 | … |
| GB_EmployeeSocialInsuranceArrangement 204028 | | GB_EmployeeSocialInsuranceArrangement 204030 | | | | 1 204032 | … |
| | | | UUID 204034 | | | 1 204036 | UUID 204038 |
| | | | EmployeeUUID 204040 | | | 1 204042 | UUID 204044 |
| WorkagreementItem 204046 | | | WorkagreementItem 204048 | | | … | … |
| | | | | @workAgreementItemPeriodTermsListCompleteTransmissionIndicator 204050 | | 1 204052 | Indicator 204054 |

FIG. 204-3

| Package | level1 | level2 | level3 | level4 | level5 | Cardinality | Datatype Name |
|---|---|---|---|---|---|---|---|
| | | | | WorkAgreementUUID 204056 | | 1 204058 | UUID 204060 |
| WorkAgreementItemPeriodTerms 204062 | | | | ~PeriodTerms 204064 | | 1..n 204066 | … |
| | | | | | @actionCode 204068 | 1 204070 | ActionCode 204072 |
| | | | | | UUID 204074 | 1 204076 | UUID 204078 |
| | | | | | ValidityPeriod 204080 | 1 204082 | CLOSED_DatePeriod 204084 |

FIG. 204-4

| Package | level1 | level2 | level3 | level4 | level5 | Cardinality | Datatype Name |
|---|---|---|---|---|---|---|---|
| | | | | | EmployeeSocialInsuranceContributionCalculationMethodCode 204086 | 1 204088 | EmployeeSocialInsuranceContributionCalculationMethodCode 204090 |
| | | | | | CertifiedIndicator 204092 | 0..1 204094 | CertifiedIndicator 204096 |
| | | | | | CompanyDirectorIndicator 204098 | 0..1 204100 | CompanyDirectorIndicator 204102 |

FIG. 204-5

| Package | level1 | level2 | level3 | level4 | level5 | Cardinality | Datatype Name |
|---|---|---|---|---|---|---|---|
| | | | | | CompanyDirectorPaymentRegularIndicator 204104 | 0..1 204106 | RegularIndicator 204108 |

FIG. 207-1

| Package | level1 | level2 | level3 | level4 | level5 | level6 | Cardinality | Datatype Name |
|---|---|---|---|---|---|---|---|---|
| IT_Employee-SocialInsurance-Arrangement-Message 207000 | IT_Employee SocialInsurance-Arrangement-Message 207002 | | | | | | | <Message-DataType> 207004 |
| MessageHeader 207006 | | MessageHeader 207008 | | | | | 1 207010 | Business-Document-Message-Header 207012 |
| | | | ID 207014 | | | | 1 207016 | Business-Document-MessageID 207018 |

FIG. 207-2

| Package | level1 | level2 | level3 | level4 | level5 | level6 | Cardinality | Datatype Name |
|---|---|---|---|---|---|---|---|---|
| | | | Crea-tionDateTime 207020 | | | | 1 207022 | DateTime 207024 |
| | | | … | | | | 0..1 207026 | … |
| IT_EmployeeSocialInsuranceArrangement 207028 | | IT_EmployeeSo-cialInsur-anceAr-range-ment 207030 | | | | | 1 207032 | … |
| | | | UUID 207034 | | | | 1 207036 | UUID 207038 |
| | | | Employ-eeUUID 207040 | | | | 1 207042 | UUID 207044 |
| WorkagreementItem 207046 | | | Worka-greemen-tItem 207048 | | | | … | … |

FIG. 207-3

| Package | level1 | level2 | level3 | level4 | level5 | level6 | Cardinality | Datatype Name |
|---|---|---|---|---|---|---|---|---|
| | | | | @workAgreementItemContributionPeriodTermsListCompleteTransmissionIndicator 207050 | | | 0..1 207052 | Indicator 207054 |
| | | | | @workAgreementItemClassification-Grouping-Period-Terms-ListCompleteTransmissionIndicator 207056 | | | 0..1 207058 | Indicator 207060 |

FIG. 207-4

| Package | level1 | level2 | level3 | level4 | level5 | level6 | Cardinality | Datatype Name |
|---|---|---|---|---|---|---|---|---|
| | | | | @workAgreementItemWorkAccidentInsuranceDetailsListCompleteTransmissionIndicator 207062 | | | 0..1 207064 | Indicator 207066 |
| | | | | WorkAgreementUUID 207068 | | | 1 207070 | UUID 207072 |
| WorkAgreementItemContributionPeriodTerms 207074 | | | | WorkAgreementItemContributionPeriodTerms 207076 | | | 0..n 207078 | … |

FIG. 207-5

| Package | level1 | level2 | level3 | level4 | level5 | level6 | Cardinality | Datatype Name |
|---|---|---|---|---|---|---|---|---|
| | | | | | @actionCode 207080 | | 1 207082 | ActionCode 207084 |
| | | | | | UUID 207086 | | 1 207088 | UUID 207090 |
| | | | | | ValidityPeriod 207092 | | 1 207094 | CLOSED_DatePeriod 207096 |
| | | | | | ContributionTypeCode 207098 | | 1 207100 | EmployeeSocialInsuranceContributionTypeCode 207102 |
| | | | | | InsuranceBody UUID 207104 | | 1 207106 | UUID 207108 |

FIG. 207-6

| Package | level1 | level2 | level3 | level4 | level5 | level6 | Cardinality | Datatype Name |
|---|---|---|---|---|---|---|---|---|
| | | | | | ContributionRuleCode 207110 | | 0..1 207112 | EmployeeSocialInsuranceContributionRuleCode 207114 |
| | | | | | PaymentRecurrence 207116 | | 0..1 207118 | EmployeeSocialInsurancePaymentRecurrenceCode 207120 |
| WorkAgreementItemClassificationGroupingPeriodTerms 207122 | | | | WorkAgreementItemClassificationGroupingPeriodTerms 207124 | | | 1..n 207126 | … |

FIG. 207-7

| Package | level1 | level2 | level3 | level4 | level5 | level6 | Cardinality | Datatype Name |
|---|---|---|---|---|---|---|---|---|
| | | | | | @actionCode 207128 | | 1 207130 | Action-Code 207132 |
| | | | | | UUID 207134 | | 1 207136 | UUID 207138 |
| | | | | | Valid-ityPeriod 207140 | | 1 207142 | CLOSED _DatePeriod 207144 |
| | | | | | Private-SectorNa-tionalIn-surance-Data 207146 | | 1 207148 | … |
| | | | | | | Employ-eeGroup-Code 207150 | 1 207152 | Private-SectorSo-cialInsur-anceEm-ployee-Group-Code 207154 |

FIG. 207-8

| Package | level1 | level2 | level3 | level4 | level5 | level6 | Cardinality | Datatype Name |
|---|---|---|---|---|---|---|---|---|
| | | | | | | WorkPlace 207156 | 1 207158 | RegionCode 207160 |
| | | | | | SocialInsuranceCollaboratorData 207162 | | 1 207164 | … |
| | | | | | | SocialInsuranceOccupationCategoryCode 207166 | 0..1 207168 | SocialInsuranceOccupationCategoryCode 207170 |
| | | | | | | SocialInsuranceAlternativeSocialInsuranceTypeCode 207172 | 0..1 207174 | SocialInsuranceTypeCode 207176 |

FIG. 207-9

| Package | level1 | level2 | level3 | level4 | level5 | level6 | Cardinality | Datatype Name |
|---|---|---|---|---|---|---|---|---|
| WorkAgreementItem-WorkAccidentInsur-ancePeriodTerms 207178 | | | | WorkA-greemen-tItem-WorkAcci-dentInsur-ancePe-riodTerms 207180 | | | 0..n 207182 | … |
| | | | | | @actionC ode 207184 | | 1 207186 | Action-Code 207188 |
| | | | | | UUID 207190 | | 1 207192 | UUID 207194 |
| | | | | | Valid-ityPeriod 207196 | | 1 207198 | CLOSED _DatePeri od 207200 |

FIG. 207-10

| Package | level1 | level2 | level3 | level4 | level5 | level6 | Cardinality | Datatype Name |
|---|---|---|---|---|---|---|---|---|
| | | | | | WorkAccidentInsuranceEmployeeGroupCode 207202 | | 1 207204 | WorkAccidentInsuranceEmployeeGroupCode 207206 |
| | | | | | WorkAccidentRiskCategoryCode 207208 | | 1 207210 | WorkAccidentRiskCategoryCode 207212 |
| | | | | | EmployeeWorkAccidentInsuranceContributionDiscountTypeCode 207214 | | 1 207216 | EmployeeWorkAccidentInsuranceContributionDiscountTypeCode 207218 |

FIG. 207-11

| Package | level1 | level2 | level3 | level4 | level5 | level6 | Cardinality | Datatype Name |
|---|---|---|---|---|---|---|---|---|
| | | | | | TravelingIndicator 207220 | | 0..1 207222 | TravelingIndicator 207224 |
| | | | | | AsbestosSilicosisHealthRiskIndicator 207226 | | 0..1 207228 | HealthRiskIndicator 207230 |

FIG. 211-1

| Package | Level 3 | Level 4 | Level 5 | Cardinal-ity | Datatype Name |
|---|---|---|---|---|---|
| | | | | | |
| CollectivePaymentOrderMessage 211000 | | | | | CollectivePaymentOrderMessage 211002 |
| MessageHeader 211004 | | | | 1 211006 | MessageHeader 211008 |
| CollectivePaymentOrder 211010 | | | | 1 211012 | CollectivePaymentOrder 211014 |
| | ID 211016 | | | 0..1 211018 | BusinessTransactionDocumentID 211020 |
| | Payment-Form-Code 211022 | | | 1 211024 | PaymentFormCode 211026 |
| | Pay-mentPro-cedure-Code 211028 | | | 1 211030 | PaymentProcedureCode 211032 |

FIG. 211-2

| Package | Level 3 | Level 4 | Level 5 | Cardinal-ity | Datatype Name |
|---|---|---|---|---|---|
| | Account-DebitIn-dicator 211034 | | | 1 211036 | AccountDebitIndicator 211038 |
| | Paymen-tExecu-tionDate 211040 | | | 1 211042 | Date 211044 |
| | Payment-Transac-tionInitia-torBankA ccountVal ueDate 211046 | | | 0..1 211048 | Date 211050 |

FIG. 211-3

| Package | Level 3 | Level 4 | Level 5 | Cardinal-ity | Datatype Name |
|---|---|---|---|---|---|
| | PaymentTransactionDestinatedBankAccountValueDate 211052 | | | 0..1 211054 | Date 211056 |
| | TotalNetAmount 211058 | | | 0..1 211060 | Amount 211062 |
| | PaymentOrderTotalNumberValue 211064 | | | 0..1 211066 | TotalNumberValue 211068 |

FIG. 211-4

| Package | Level 3 | Level 4 | Level 5 | Cardinal-ity | Datatype Name |
|---|---|---|---|---|---|
| Party 211070 | Payment-Transac-tionInitia-torParty 211072 | | | 0..1 211074 | BusinessTransactionDocument-Party 211076 |
| BankAccount 211078 | Payment-Transac-tionInitia-torBankA ccount 211080 | | | 0..1 211082 | BusinessTransactionDocument-BankAccount 211084 |
| | Bank-Charges-BankAc-count 211086 | | | 0..1 211088 | BusinessTransactionDocument-BankAccount 211090 |
| PaymentOrder 211092 | Paymen-tOrder 211094 | | | 1..n 211096 | PaymentOrder 211098 |
| | | ID 211100 | | 0..1 211102 | BusinessTransactionDocumentID 211104 |

FIG. 211-5

| Package | Level 3 | Level 4 | Level 5 | Cardinal-ity | Datatype Name |
|---|---|---|---|---|---|
| | | BillOfEx-changeDu eDate 211106 | | 0..1 211108 | Date 211110 |
| | | NetAmount 211112 | | 1 211114 | Amount 211116 |
| | | Gros-sAmount 211118 | | 0..1 211120 | Amount 211122 |
| | | CashDis-countA-mount 211124 | | 0..1 211126 | Amount 211128 |
| | | Withhold-ingTax-Amount 211130 | | 0..1 211132 | Amount 211134 |
| | | Note 211136 | | 0..1 211138 | Note 211140 |

FIG. 211-6

| Package | Level 3 | Level 4 | Level 5 | Cardinal-ity | Datatype Name |
|---|---|---|---|---|---|
| | | Bank-Charge-Bearer-Code 211142 | | 0..1 211144 | BankChargeBearerCode 211146 |
| | | Priority-Code 211148 | | 0..1 211150 | BusinessTransactionPriorityCode 211152 |
| Party 211154 | | Payment-Transac-tionDesti-natedParty 211156 | | 0..1 211158 | BusinessTransactionDocument-Party 211160 |
| | | Original-Payment-Transac-tionInitia-torParty 211162 | | 0..1 211164 | BusinessTransactionDocument-Party 211166 |

FIG. 211-7

| Package | Level 3 | Level 4 | Level 5 | Cardinality | Datatype Name |
|---|---|---|---|---|---|
| | | FinalPayment-TransactionDestinatedParty 211168 | | 0..1 211170 | BusinessTransactionDocument-Party 211172 |
| BankAccount 211174 | | Payment-TransactionDestinated-BankAccount 211176 | | 0..1 211178 | BusinessTransactionDocument-BankAccount 211180 |
| Payment Instruction 211182 | | PaymentInstruction 211184 | | 0..n 211186 | PaymentInstruction 211188 |
| | | CorrespondenceBankDetails 211190 | | 0..3 211192 | PaymentOrderCorrespondence-BankDetails 211194 |

FIG. 211-8

| Package | Level 3 | Level 4 | Level 5 | Cardinality | Datatype Name |
|---|---|---|---|---|---|
| | | | Correspondence BankTypeCode 211196 | 1 211198 | CorrespondenceBankTypeCode 211200 |
| | | | Bank 211202 | 0..1 211204 | Bank 211206 |
| | | | BankAccount 211208 | 0..1 211210 | BusinessTransactionDocumentBankAccount 211212 |
| StateCentralBankReport 211214 | | CentralBankReportItem 211216 | | 0..n 211218 | CentralBankReportItem 211220 |
| BusinessTransactionDocumentReference 211222 | | PaymentReference 211224 | | 0..1 211226 | BusinessTransactionDocumentReference 211228 |
| | | ChequeReference 211230 | | 0..1 211232 | BusinessTransactionDocumentReference 211234 |

FIG. 211-9

| Package | | | | Level 3 | Level 4 | Level 5 | Cardinal-ity | Datatype Name |
|---|---|---|---|---|---|---|---|---|
| | | | | | BillOfEx-changeRef erence 211236 | | 0..1 211238 | BusinessTransactionDocumen-tReference 211240 |
| | | | Payment Explanation 211242 | | Paymen-tExplana-tionItem 211244 | | 0..n 211246 | PaymentExplanationItem 211248 |

| Package | level1 | level2 | level3 | level4 | Cardinality | Datatype Name |
|---|---|---|---|---|---|---|
| BankAccountStatementMessage 218000 | BankAccountStatementMessage 218002 | | | | | BankAccountStatementMessage 218004 |
| MessageHeader 218006 | | MessageHeader 218008 | | | 1 218010 | MessageHeader 218012 |
| | | | ID 218014 | | 1 218016 | BusinessDocumentMessageID 218018 |
| | | | CreationDateTime 218020 | | 1 218022 | DateTime 218024 |

FIG. 218-2

| Package | level1 | level2 | level3 | level4 | Cardinality | Datatype Name |
|---|---|---|---|---|---|---|
| | | | Sender-Party 218026 | | 0..1 218028 | Busi-nessDocumentMes-sage-Header-Party 218030 |
| | | | Receiver-Party 218032 | | 0..n 218034 | Busi-nessDocumentMes-sage-Header-Party 218036 |
| BankAccountStatement 218038 | | BankAc-count-Statement 218040 | | | 1 218042 | BankAc-count-Statement 218044 |

FIG. 218-3

| Package | | | | level1 | level2 | level3 | level4 | Cardinality | Datatype Name |
|---|---|---|---|---|---|---|---|---|---|
| | | | | | | ID 218046 | | 1 218048 | Business-Transaction-DocumentID 218050 |
| | | | | | | Date 218052 | | 1 218054 | Date 218056 |
| | | | | | | ValidityPeriod 218058 | | 0..1 218060 | DatePeriod 218062 |
| | | | | | | OpeningBalanceAmount 218064 | | 0..1 218066 | Amount 218068 |
| | | | | | | ClosingBalanceAmount 218070 | | 0..1 218072 | Amount 218074 |

FIG. 218-4

| Package | level1 | level2 | level3 | level4 | Cardinality | Datatype Name |
|---|---|---|---|---|---|---|
| | | | TotalDebitAmount 218076 | | 0..1 218078 | Amount 218080 |
| | | | Total-CreditAmount 218082 | | 0..1 218084 | Amount 218086 |
| | | | ItemTotalNumberValue 218088 | | 0..1 218090 | Total-Number-Value 218092 |
| BankAccount 218094 | | | BankAccount 218096 | | 1 218098 | Business-Transaction-Document BankAccount 218100 |

FIG. 218-5

| Package | level1 | level2 | level3 | level4 | Cardinality | Datatype Name |
|---|---|---|---|---|---|---|
| Item 218102 | | | Item 218104 | | 0..n 218106 | BankAccount-StatementItem 218108 |
| | | | | ID 218110 | 0..1 218112 | BusinessTransaction-DocumentItemID 218114 |
| | | | | PaymentTransactionTypeCode 218116 | 0..1 218118 | PaymentTransactionTypeCode 218120 |

FIG. 218-6

| Package | | | | level1 | level2 | level3 | level4 | Cardinality | Datatype Name |
|---|---|---|---|---|---|---|---|---|---|
| | | | | | | | PaymentTransactionTypeDescription 218122 | 0..1 218124 | Description 218126 |
| | | | | | | | PaymentTransactionSupplementTypeCode 218128 | 0..1 218130 | PaymentTransactionSupplementTypeCode 218132 |
| | | | | | | | ValueDate 218134 | 0..1 218136 | Date 218138 |
| | | | | | | | PostingDateTime 218140 | 0..1 218142 | DateTime 218144 |
| | | | | | | | PostingDate 218146 | 0..1 218148 | Date 218150 |

FIG. 218-7

| Package | | | | level1 | level2 | level3 | level4 | Cardinality | Datatype Name |
|---|---|---|---|---|---|---|---|---|---|
| | | | | | | | Amount 218152 | 1 218154 | Amount 218156 |
| | | | | | | | Ex-changeR-ate 218158 | 0..1 218160 | Ex-changeR-ate 218162 |
| | | | | | | | Bank-ChargeA mount 218164 | 0..1 218166 | Amount 218168 |
| | | | | | | | Original-Cur-rencyA-mount 218170 | 0..1 218172 | Amount 218174 |
| | | | | | | | Original-Bank-ChargeA mount 218176 | 0..1 218178 | Amount 218180 |

FIG. 218-8

| Package | | | | level1 | level2 | level3 | level4 | Cardinality | Datatype Name |
|---|---|---|---|---|---|---|---|---|---|
| | | | | | | | Bank-Payment-Transac-tionRefer-enceID 218182 | 0..1 218184 | Payment-Transac-tionRefer-enceID 218186 |
| | | | | | | | BankPri-maNo-taNote 218188 | 0..1 218190 | Note 218192 |
| | | | | | | | Note 218194 | 0..n 218196 | Note 218198 |
| | | | Party 218200 | | | | Payment-Transac-tionInitia-torParty 218202 | 0..1 218204 | Business-Transac-tion-Document Party 218206 |

FIG. 218-9

| Package | | | | level1 | level2 | level3 | level4 | Cardinality | Datatype Name |
|---|---|---|---|---|---|---|---|---|---|
| | | | | | | | Payment-Transac-tionDesti-nated-Party 218208 | 0..1 218210 | Business-Transac-tion-Document Party 218212 |
| | | | | | | | Original-Payment-Transac-tionInitia-torParty 218214 | 0..1 218216 | Business-Transac-tion-Document Party 218218 |
| | | | | | | | Final-Payment-Transac-tionDesti-nated-Party 218220 | 0..1 218222 | Business-Transac-tion-Document Party 224 |

FIG. 218-10

| Package | | | | level1 | level2 | level3 | level4 | Cardinality | Datatype Name |
|---|---|---|---|---|---|---|---|---|---|
| | | | BankAccount 218226 | | | | PaymentTransactionInitiatorBankAccount 218228 | 0..1 218230 | BusinessTransactionDocumentBankAccount 218232 |
| | | | | | | | PaymentTransactionDestinatedBankAccount 218234 | 0..1 218236 | BusinessTransactionDocumentBankAccount 218238 |
| | | | | | | | PartnerBankAccount 218240 | 0..1 218242 | BusinessTransactionDocumentBankAccount 218244 |

FIG. 218-11

| Package | level1 | level2 | level3 | level4 | Cardinality | Datatype Name |
|---|---|---|---|---|---|---|
| Business-Transaction-DocumentReference 218246 | | | | PaymentReference 218248 | 0..1 218250 | Business-Transaction-DocumentReference 218252 |
| | | | | PaymentOrder-Reference 218254 | 0..1 218256 | Business-Transaction-DocumentReference 218258 |
| | | | | ChequeReference 218260 | 0..1 218262 | Business-Transaction-DocumentReference 218264 |

FIG. 218-12

| Package | | | | level1 | level2 | level3 | level4 | Cardinality | Datatype Name |
|---|---|---|---|---|---|---|---|---|---|
| | | | | | | | BillOfEx-changeRe ference 218266 | 0..1 218268 | Business-Transac-tion-Documen-tRefer-ence 218270 |
| | | | Paymen-tExplana-tionItem 218272 | | | | Paymen-tExplana-tionItem 218274 | 0..n 218276 | Paymen-tExplana-tionItem 218278 |

| Package | level1 | level2 | level3 | level4 | Cardinality | Datatype Name |
|---|---|---|---|---|---|---|
| LiquidityInformationMessage 221000 | LiquidityInfor-mationMes-sage 221002 | | | | | LiquidityInfor-mationMes-sage 221004 |
| MessageHeader 221006 | | Message-Header 221008 | | | 1 221010 | Business-Document-Message-Header 221012 |
| | | | ID 221014 | | 1 221016 | Business-Document-MessageID 221018 |
| | | | Creation-DateTime 221020 | | 1 221022 | DateTime 221024 |
| LquidityInformation 221026 | | Liquidity Information 221028 | | | 1 221030 | … |

FIG. 221-2

| Package | level1 | level2 | level3 | level4 | Cardinality | Datatype Name |
|---|---|---|---|---|---|---|
| | | | LiquidityFore-castProfile-Code 221032 | | 1 221034 | LiquidityFore-castProfile-Code 221036 |
| LiquidityStatusItem 221038 | | | Item 221040 | | 0..n 221042 | LiquidityInfor-mationItem 221044 |
| | | | | Business-Transaction-Documen-tReference 221046 | 1 221048 | Business-Transaction-Documen-tReference 221050 |
| | | | | ProcessCom-ponentCode 221052 | 1 221054 | ProcessCom-ponentCode notyetap-proved 221056 |
| | | | | CompanyID 221058 | 1 221060 | Organisation-alCentreID 221062 |

FIG. 221-3

| Package | | | level1 | level2 | level3 | level4 | Cardinality | Datatype Name |
|---|---|---|---|---|---|---|---|---|
| | | | | | | LiquidityItem-GroupCode 221064 | 1 221066 | LiquidityItem-GroupCode 221068 |
| | | | | | | LiquidityIte-mOperational-ProcessPro-gressCate-goryCode 221070 | 1 221072 | LiquidityIte-mOperational-ProcessPro-gressCate-goryCode 221074 |
| | | | | | | LiquidityItem-Business-Transaction-Document-StatusCate-goryCode 221076 | 1 221078 | LiquidityItem-Business-Transaction-Document-StatusCate-goryCode 221080 |
| | | | | | | Payment-FormCode 221082 | 0..1 221084 | Payment-FormCode 221086 |
| | | | | | | HouseBankAc-countUUID 221088 | 0..1 221090 | UUID 221092 |

FIG. 221-4

| Package | level1 | level2 | level3 | level4 | Cardinality | Datatype Name |
|---|---|---|---|---|---|---|
| | | | | CashStorageUUID 221094 | 0..1 221096 | UUID 221098 |
| | | | | LiquidityItem-Description 221100 | 0..1 221102 | LiquidityItem-Description 221104 |
| | | | | Transaction-CurrencyAmount 221106 | 1 221108 | Amount,Qualifier:Transaction CurrencyAmount) 221110 |
| | | | | ValueDateTime 221112 | 1 221114 | DateTime,Qualifier:Value 221116 |

| | Package | | | level1 | level2 | level3 | Cardinality | Datatype Name |
|---|---|---|---|---|---|---|---|---|
| PaymentAdviceMessage 224000 | | | | PaymentAd-viceMessage 224002 | | | | Paymen-tAd-viceMes-sage 224004 |
| | MessageHeader 224006 | | | | Message Header 224008 | | 1 224010 | Message Header 224012 |
| | | | | | | ID 224014 | 1 224016 | Business Docu-mentMes sageID 224018 |
| | | | | | | Creation-DateTim e 224020 | 1 224022 | DateTim e 224024 |

FIG. 224-2

| | Package | | | level1 | level2 | level3 | Cardinality | Datatype Name |
|---|---|---|---|---|---|---|---|---|
| | | | | | | Sender-Party 224026 | 0..1 224028 | Business Docu-mentMessage-Header-Party 224030 |
| | | | | | | Receiv-erParty 224032 | 0..n 224034 | Business Docu-mentMessage-Header-Party 224036 |
| | PaymentAdvice 224038 | | | | Paymen-tAdvice 224040 | | 1 224042 | Paymen-tAdvice 224044 |

FIG. 224-3

| | Package | | | level1 | level2 | level3 | Cardinality | Datatype Name |
|---|---|---|---|---|---|---|---|---|
| | | | | | | ID 224046 | 1 224048 | BusinessTransactionDocumentID 224050 |
| | | | | | | TypeCode 224052 | 1 224054 | PaymentAdviceTypeCode 224056 |
| | | | | | | AccountDebitIndicator 224058 | 1 224060 | AccountDebitIndicator 224062 |
| | | | | | | PaymentFormCode 224064 | 1 224066 | PaymentFormCode 224068 |

FIG. 224-4

| | Package | | | level1 | level2 | level3 | Cardinality | Datatype Name |
|---|---|---|---|---|---|---|---|---|
| | | | | | | Date 224070 | 0..1 224072 | Date 224074 |
| | | | | | | Payment Date 224076 | 1 224078 | Date 224080 |
| | | | | | | Payment Transac-tionInitia-torBankA ccount-Val-ueDate 224082 | 0..1 224084 | Date 224086 |

FIG. 224-5

| | Package | | | level1 | level2 | level3 | Cardinality | Datatype Name |
|---|---|---|---|---|---|---|---|---|
| | | | | | | PaymentTransactionDestinatedBankAccountValueDate 224088 | 0..1 224090 | Date 224092 |
| | | | | | | BillOfExchangeDueDate 224094 | 0..1 224096 | Date 224098 |
| | | | | | | NetAmount 224100 | 0..1 224102 | Amount 224104 |
| | | | | | | GrossAmount 224106 | 0..1 224108 | Amount 224110 |

FIG. 224-6

| | Package | | | level1 | level2 | level3 | Cardinality | Datatype Name |
|---|---|---|---|---|---|---|---|---|
| | | | | | | Cash-Discoun-tAmount 224112 | 0..1 224114 | Amount 224116 |
| | | | | | | With-holding-Tax-Amount 224118 | 0..1 224120 | Amount 224122 |
| | | | | | | Bank-FeeA-mount 224124 | 0..1 224126 | Amount 224128 |
| | | | | | | Note 224130 | 0..1 224132 | Note 224134 |

FIG. 224-7

| | Package | | | level1 | level2 | level3 | Cardinality | Datatype Name |
|---|---|---|---|---|---|---|---|---|
| | Party 224136 | | | | | Payment Transac-tionInitia-torParty 224138 | 1 224140 | Business Transac-tionDocu ment-Party 224142 |
| | | | | | | Payment Transac-tionDes-tinated-Party 224144 | 1 224146 | Business Transac-tionDocu ment-Party 224148 |
| | | | | | | Original-Payment Transac-tionInitia-torParty 224150 | 0..1 224152 | Business Transac-tionDocu ment-Party 224154 |

FIG. 224-8

| | Package | level1 | level2 | level3 | Cardinality | Datatype Name |
|---|---|---|---|---|---|---|
| | | | | FinalPayment-Transaction-Destinated-Party 224156 | 0..1 224158 | BusinessTransactionDocument-Party 224160 |
| | BankAccount 224162 | | | PaymentTransactionInitiatorBankAccount 224164 | 0..1 224166 | BusinessTransactionDocument-BankAccount 224168 |

FIG. 224-9

| | Package | level1 | level2 | level3 | Cardinality | Datatype Name |
|---|---|---|---|---|---|---|
| | | | | PaymentTransactionDestinatedBankAccount 224170 | 0..1 224172 | BusinessTransactionDocumentBankAccount 224174 |
| | BusinessTransactionDocumentReference 224176 | | | BankTransferReference 224178 | 0..1 224180 | BusinessTransactionDocumentReference 224182 |

FIG. 224-10

| | Package | | | level1 | level2 | level3 | Cardinality | Datatype Name |
|---|---|---|---|---|---|---|---|---|
| | | | | | | DirectDebitReference 224184 | 0..1 224186 | BusinessTransactionDocumentReference 224188 |
| | | | | | | ChequeDepositReference 224190 | 0..1 224192 | BusinessTransactionDocumentReference 224194 |

FIG. 224-11

| | Package | | | level1 | level2 | level3 | Cardinality | Datatype Name |
|---|---|---|---|---|---|---|---|---|
| | | | | | | BillOfExchangePresentationReference 224196 | 0..1 224198 | BusinessTransactionDocumentReference 224200 |
| | | | | | | ChequeReference 224202 | 0..1 224204 | BusinessTransactionDocumentReference 224206 |

FIG. 224-12

| | Package | | | level1 | level2 | level3 | Cardinality | Datatype Name |
|---|---|---|---|---|---|---|---|---|
| | | | | | | BillOfExchangeReference 224208 | 0..1 224210 | BusinessTransactionDocumentReference 224212 |
| | PaymentExplanation 224214 | | | | | PaymentExplanationItem 224216 | 0..n 224218 | PaymentExplanationItem 224220 |

| Package | level1 | level2 | level3 | level4 | level5 | Cardinality | Datatype Name |
| --- | --- | --- | --- | --- | --- | --- | --- |
| ClearingRequestMessage 227000 | ClearingRequestMessage 227002 | | | | | | <MessageDataType> 227004 |
| MessageHeader 227006 | | MessageHeader 227008 | | | | 1 227010 | BusinessDocumentMessageHeader 227012 |
| | | | ID 227014 | | | 1 227016 | BusinessDocumentMessageID 227018 |
| | | | ReferenceID 227020 | | | 1 227022 | BusinessDocumentMessageID 227024 |
| | | | CreationDateTime 227026 | | | 1 227028 | DateTime 227030 |

FIG. 227-2

| Package | level1 | level2 | level3 | level4 | level5 | Cardinality | Datatype Name |
|---|---|---|---|---|---|---|---|
| ClearingRequest 227032 | | ClearingRequest 227034 | | | | 1..N 227036 | |
| | | | BaseBusinessTransactionDocumentReference 227038 | | | 1 227040 | BusinessTransactionDocumentReference 227042 |
| | | | BaseBusinessTransactionDocumentDate 227044 | | | 0..1 227046 | Date 227048 |
| | | | OriginBusinessTransactionDocumentReference 227050 | | | 0..1 227052 | BusinessTransactionDocumentReference 227054 |

FIG. 227-3

| Package | level1 | level2 | level3 | level4 | level5 | Cardinality | Datatype Name |
|---|---|---|---|---|---|---|---|
| | | | OriginBusinessTransactionDocumentDate 227056 | | | 0..1 227058 | Date 227060 |
| | | | BusinessProcessVariantTypeCode 227062 | | | 0..1 227064 | BusinessProcessVariantTypeCode 227066 |
| | | | ClearingStatus 227068 | | | 0..1 227070 | ClearingStatus 227072 |
| | | | PaymentAmount 227074 | | | 0..1 227076 | Amount 227078 |
| | | | PayerParty 227080 | | | 0..1 227082 | BusinessTransactionDocumentParty 227084 |

FIG. 227-4

| Package | level1 | level2 | level3 | level4 | level5 | Cardinality | Datatype Name |
|---|---|---|---|---|---|---|---|
| | | | PayeeParty 227086 | | | 0..1 227088 | BusinessTransactionDocumentParty 227090 |
| | | | HousebankAccountInternalID 227092 | | | 0..1 227094 | BankAccountInternalID 227096 |
| | | | PartnerBankAccountInternalID 227098 | | | 0..1 227100 | BankAccountInternalID 227102 |
| | | | DebitValueDate 227104 | | | 0..1 227106 | Date 227108 |
| | | | CreditValueDate 227110 | | | 0..1 227112 | Date 227114 |

FIG. 227-5

| Package | level1 | level2 | level3 | level4 | level5 | Cardinality | Datatype Name |
|---|---|---|---|---|---|---|---|
| | | | PaymentFormCode 227116 | | | 0..1 227118 | PaymentFormCode 227120 |
| | | | PaymentPaymentAllocationBusinessTransactionDocumentReference 227122 | | | 0..1 227124 | BusinessTransactionDocumentReference 227126 |
| | | | PaymentReturnInitiatingBusinessTransactionDocumentReference 227128 | | | 0..1 227130 | BusinessTransactionDocumentReference 227132 |

FIG. 227-6

| Package | level1 | level2 | level3 | level4 | level5 | Cardinality | Datatype Name |
|---|---|---|---|---|---|---|---|
| | | | PaymentReturnPaymentTransactionSupplementCategoryCode 227134 | | | 0..1 227136 | PaymentTransactionSupplementCategoryCode 227138 |
| | | | PaymentReturnBankChargeBearerCode 227140 | | | 0..1 227142 | BankChargeBearerCode 227144 |
| | | | PaymentAdviceBusinessTransactionDocumentReference 227146 | | | 0..1 227148 | BusinessTransactionDocumentReference 227150 |

FIG. 227-7

| Package | level1 | level2 | level3 | level4 | level5 | Cardinality | Datatype Name |
|---|---|---|---|---|---|---|---|
| PaymentExplanation 227152 | | | NoteToPayeeNote 227154 | | | 0..1 227156 | Note 227158 |
| | | | PaymentExplanation 227160 | | | 0..N 227162 | PaymentExplanationItem 227164 |
| | | | | ID 227166 | | 0..1 227168 | BusinessTransactionDocumentItemID 227170 |
| | | | | OffsettingIndicator 227172 | | 0..1 227174 | Indicator 227176 |
| | | | | BusinessTransactionDocumentDate 227178 | | 0..1 227180 | Date 227182 |

FIG. 227-8

| Package | level1 | level2 | level3 | level4 | level5 | Cardinality | Datatype Name |
|---|---|---|---|---|---|---|---|
| | | | | NetAmount 227184 | | 1 227186 | Amount 227188 |
| | | | | GrossAmount 227190 | | 0..1 227192 | Amount 227194 |
| | | | | Transaction-Currency-GrossAmount 227196 | | 0..1 227198 | Amount 227200 |
| | | | | CashDiscou-tAmount 227202 | | 0..1 227204 | Amount 227206 |
| | | | | Transaction-Currency-CashDis-countAmount 227208 | | 0..1 227210 | Amount 227212 |
| | | | | Withholding-TaxAmount 227214 | | 0..1 227216 | Amount 227218 |

FIG. 227-9

| Package | level1 | level2 | level3 | level4 | level5 | Cardinality | Datatype Name |
|---|---|---|---|---|---|---|---|
| | | | | BankFeeA-mount 227220 | | 0..1 227222 | Amount 227224 |
| | | | | Scandinavi-anPaymen-tReferenceID 227226 | | 0..1 227228 | Identifier 227230 |
| | | | | SwissPay-mentRefer-enceID 227232 | | 0..1 227234 | Identifier 227236 |
| | | | | Note 227238 | | 0..1 227240 | Note 227242 |
| | | | | OriginalPay-mentTransac-tionInitiator-Party 227244 | | 0..1 227246 | BusinessTrans-actionDocu-mentParty 227248 |

FIG. 227-10

| Package | level1 | level2 | level3 | level4 | level5 | Cardinality | Datatype Name |
|---|---|---|---|---|---|---|---|
| | | | | FinalPaymentTransactiondestinatedParty 227250 | | 0..1 227252 | BusinessTransactionDocumentParty 227254 |
| | | | | PaymentTransactionInitiatorInvoiceReference 227256 | | 0..1 227258 | BusinessTransactionDocumentReference 227260 |
| | | | | PaymentTransactionDestinatedInvoiceReference 227262 | | 0..1 227264 | BusinessTransactionDocumentReference 227266 |

FIG. 227-11

| Package | level1 | level2 | level3 | level4 | level5 | Cardinality | Datatype Name |
|---|---|---|---|---|---|---|---|
| | | | | Payment-Transac-tionInitiator-Contrac-tReference 227268 | | 0..1 227270 | BusinessTrans-actionDocumen-tReference 227272 |
| | | | | Payment-Transaction-Destinated-Contrac-tReference 227274 | | 0..1 227276 | BusinessTrans-actionDocumen-tReference 227278 |
| | | | | Payment-Transac-tionInitiator-PurchaseOr-derReference 227280 | | 0..1 227282 | BusinessTrans-actionDocumen-tReference 227284 |

FIG. 227-12

| Package | level1 | level2 | level3 | level4 | level5 | Cardinality | Datatype Name |
|---|---|---|---|---|---|---|---|
| | | | | Payment-Transaction-Destinated-PurchaseOrderReference 227286 | | 0..1 227288 | BusinessTransactionDocumentReference 227290 |
| | | | | PaymentExplanationDifference 227292 | | 0..N 227294 | PaymentDifferenceExplanationItem 227296 |
| | | | | | OffsettingIndicator 227298 | 0..1 227300 | Indicator 227302 |
| | | | | | Amount 227304 | 1 227306 | Amount 227308 |
| | | | | | PaymentDifferenceReasonCode 227310 | 0..1 227312 | PaymentDifferenceReasonCode 227314 |

FIG. 227-13

| Package | level1 | level2 | level3 | level4 | level5 | Cardinality | Datatype Name |
|---|---|---|---|---|---|---|---|
| | | | | | Payment-Transac-tionInitiatorInvoiceRefer-ence 227316 | 0..1 227318 | BusinessTrans-actionDocumen-tReference 227320 |
| | | | | | Payment-Transac-tionDestinat-edIn-voiceRefer-ence 227322 | 0..1 227324 | BusinessTrans-actionDocumen-tReference 227326 |
| | | | | | Payment-Transac-tionInitiator-Contrac-tReference 227328 | 0..1 227330 | BusinessTrans-actionDocumen-tReference 227332 |

FIG. 227-14

| Package | level1 | level2 | level3 | level4 | level5 | Cardinality | Datatype Name |
|---|---|---|---|---|---|---|---|
| | | | | | PaymentTransactionDestinatedContractReference 227334 | 0..1 227336 | BusinessTransactionDocumentReference 227338 |
| | | | | | PaymentTransactionInitiatorPurchaseOrderReference 227340 | 0..1 227342 | BusinessTransactionDocumentReference 227344 |
| | | | | | PaymentTransactionDestinatedPurchaseOrderReference 227346 | 0..1 227348 | BusinessTransactionDocumentReference 227350 |

FIG. 229-1

| Package | level1 | level2 | level3 | level4 | level5 | Cardinality | Datatype Name |
|---|---|---|---|---|---|---|---|
| PaymentOrderMessage 229000 | PaymentOrderMessage 229002 | | | | | | PaymentOrderMessage 229004 |
| MessageHeader 229006 | | MessageHeader 229008 | | | | 1 229010 | BusinessDocumentMessageHeader 229012 |
| | | | ID 229014 | | | 1 229016 | BusinessDocumentMessageID 229018 |
| | | | ReferenceID 229020 | | | 0..1 229022 | BusinessDocumentMessageID 229024 |
| | | | CreationDateTime 229026 | | | 1 229028 | DateTime 229030 |

FIG. 229-2

| Package | level1 | level2 | level3 | level4 | level5 | Cardinality | Datatype Name |
|---|---|---|---|---|---|---|---|
| PaymentOrder 229032 | | PaymentOrder 229034 | | | | 1 229036 | … |
| | | | BaseBusinessTransactionDocumentReference 229038 | | | 1 229040 | BusinessTransactionDocumentReference 229042 |
| | | | OriginBusinessTransactionDocumentReference 229044 | | | 1 229046 | BusinessTransactionDocumentReference 229048 |
| | | | BusinessTransactionType 229050 | | | 0..1 229052 | BusinessTransactionTypeCode 229054 |

FIG. 229-3

| Package | level1 | level2 | level3 | level4 | level5 | Cardinality | Datatype Name |
|---|---|---|---|---|---|---|---|
| | | | Paymen-tExecution-Status 229056 | | | 0..1 229058 | Paymen-tExecution-Status 229060 |
| | | | StatusRespon-seRequiredIn-dicator 229062 | | | 0..1 229064 | Indicator 229066 |
| Party 229068 | | | PayerParty 229070 | | | 1 229072 | Business-Transac-tionDocu-mentParty 229074 |
| | | | | InternalID 229076 | | 0..1 229078 | PartyInter-nalID 229080 |
| | | | | StandardID 229082 | | 0..1 229084 | PartyStan-dardID 229086 |

FIG. 229-4

| Package | level1 | level2 | level3 | level4 | level5 | Cardinality | Datatype Name |
|---|---|---|---|---|---|---|---|
| | | | PayeeParty 229088 | | | 1 229090 | Business-Transac-tionDocu-mentParty 229092 |
| PaymentControl 229094 | | | PaymentCon-trol 229096 | | | 0..n 229098 | Payment-Control 229100 |
| | | | | PriorityOrdinal-NumberValue 229102 | | 1 229104 | Ordinal-Number-Value 229106 |
| | | | | HouseBankAc-countInternalID 229108 | | 0..1 229110 | BankAc-countInter-nalID 229112 |
| | | | | HouseBankAc-countDescrip-tion 229114 | | 0..1 229116 | Description 229118 |

FIG. 229-5

| Package | level1 | level2 | level3 | level4 | level5 | Cardinality | Datatype Name |
|---|---|---|---|---|---|---|---|
| | | | | PaymentForm-Code 229120 | | 0..1 229122 | Payment-FormCode 229124 |
| | | | | PaymentProce-dureCode 229126 | | 0..1 229128 | Payment-Procedure-Code 229130 |
| | | | | PaymentProce-dureCodeDe-scription 229132 | | 0..1 229134 | Description 229136 |
| | | | | PaymentA-mount 229138 | | 1 229140 | Amount 229142 |
| | | | | CompanyCon-tactPersonInter-nalID 229144 | | 0..1 229146 | Contact-PersonIn-ternalID 229148 |
| | | | | PaymentBlock 229150 | | 0..1 229152 | Payment-Block 229154 |

FIG. 229-6

| Package | level1 | level2 | level3 | level4 | level5 | Cardinality | Datatype Name |
|---|---|---|---|---|---|---|---|
| | | | | FirstPaymentInstructionCode 229156 | | 0..1 229158 | PaymentInstructionCode 229160 |
| | | | | SecondPaymentInstructionCode 229162 | | 0..1 229164 | PaymentInstructionCode 229166 |
| | | | | ThirdPaymentInstructionCode 229168 | | 0..1 229170 | PaymentInstructionCode 229172 |
| | | | | FourthPaymentInstructionCode 229174 | | 0..1 229176 | PaymentInstructionCode 229178 |
| | | | | BankChargeBearerCode 229180 | | 0..1 229182 | BankChargeBearerCode 229184 |

FIG. 229-7

| Package | level1 | level2 | level3 | level4 | level5 | Cardinality | Datatype Name |
|---|---|---|---|---|---|---|---|
| | | | | PaymentPriorityCode 229186 | | 0..1 229188 | BusinessTransactionPriorityCode 229190 |
| | | | | SinglePaymentIndicator 229192 | | 0..1 229194 | SinglePaymentIndictor 229196 |
| | | | | PaymentExecutionDate 229198 | | 0..1 229200 | Date 229202 |
| | | | | DebitValueDate 229204 | | 0..1 229206 | Date 229208 |
| | | | | CreditValueDate 229210 | | 0..1 229212 | Date 229214 |
| | | | | BusinessPartnerBankDetailsID 229216 | | 0..1 229218 | BusinessPartnerBankDetailID 229220 |

FIG. 229-8

| Package | level1 | level2 | level3 | level4 | level5 | Cardinality | Datatype Name |
|---|---|---|---|---|---|---|---|
| | | | | PaymentCard-DetailsID 229222 | | 0..1 229224 | Business-Partner-Payment-CardDetail-sID 229226 |
| | | | | PaymentCard 229228 | | 0..1 229230 | Payment-Card 229232 |
| | | | | OverdraftLim-itExceedingIndi-cator 229234 | | 0..1 229236 | Indicator 229238 |
| | | | | PaymentAu-thorisation 229240 | | 0..n 229242 | |
| | | | | | PaymentAu-thorisation-DateTime 229244 | 1 229246 | DateTime 229248 |

FIG. 229-9

| Package | level1 | level2 | level3 | level4 | level5 | Cardinality | Datatype Name |
|---|---|---|---|---|---|---|---|
| | | | | | PaymentAuthorisationID 229250 | 1 229252 | AuthorisationID 229254 |
| | | | | | PaymentAuthorisationReferenceCode 229256 | 1 229258 | AuthorisationReferenceCode 229260 |
| | | | | | PaymentAuthorisationAmount 229262 | 1 229264 | Amount 229266 |
| | | | | | PaymentAuthorisationExpirationDateTime 229268 | 1 229270 | DateTime 229272 |
| PaymentExplanation 229274 | | | PaymentExplanationItem 229276 | | | 0..n 229278 | PaymentExplanationItem 229280 |

FIG. 229-10

| Package | level1 | level2 | level3 | level4 | level5 | Cardinality | Datatype Name |
|---|---|---|---|---|---|---|---|
| | | | | ID 229282 | | 0..1 229284 | Business-Transac-tionDocu-mentItemID 229286 |
| | | | | OffsettingIndica-tor 229288 | | 0..1 229290 | Indicator 229292 |
| | | | | BusinessTrans-actionDocu-mentDate 229294 | | 0..1 229296 | Date 229298 |
| | | | | NetAmount 229300 | | 0..1 229302 | Amount 229304 |
| | | | | GrossAmount 229306 | | 0..1 229308 | Amount 229310 |
| | | | | TransactionCur-rencyGros-sAmount 229312 | | 0..1 229314 | Amount 229316 |

FIG. 229-11

| Package | level1 | level2 | level3 | level4 | level5 | Cardinality | Datatype Name |
|---|---|---|---|---|---|---|---|
| | | | | CashDiscoutA-mount 229318 | | 0..1 229320 | Amount 229322 |
| | | | | TransactionCur-rencyCashDis-countAmount 229324 | | 0..1 229326 | Amount 229328 |
| | | | | Withholding-TaxAmount 229330 | | 0..1 229332 | Amount 229334 |
| | | | | BankFeeA-mount 229336 | | 0..1 229338 | Amount 229340 |
| | | | | Scandinavian-PaymentRefer-enceID 229342 | | 0..1 229344 | Identifier 229346 |
| | | | | SwissPaymen-tReferenceID 229348 | | 0..1 229350 | Identifier 229352 |

FIG. 229-12

| Package | level1 | level2 | level3 | level4 | level5 | Cardinality | Datatype Name |
|---|---|---|---|---|---|---|---|
| | | | | Note 229354 | | 0..1 229356 | Note 229358 |
| | | | | OriginalPaymentTransactionInitiatorParty 229360 | | 0..1 229362 | BusinessTransactionDocumentParty 229364 |
| | | | | FinalPaymentTransactiondestinatedParty 229366 | | 0..1 229368 | BusinessTransactionDocumentParty 229370 |
| | | | | PaymentTransactionInitiatorInvoiceReference 229372 | | 0..1 229374 | BusinessTransactionDocumentReference 229376 |

FIG. 229-13

| Package | level1 | level2 | level3 | level4 | level5 | Cardinality | Datatype Name |
|---|---|---|---|---|---|---|---|
| | | | | PaymentTransactionDestinatedInvoiceReference 229378 | | 0..1 229380 | BusinessTransactionDocumentReference 229382 |
| | | | | PaymentTransactionInitiatorContractReference 229384 | | 0..1 229386 | BusinessTransactionDocumentReference 229388 |
| | | | | PaymentTransactionDestinatedContractReference 229390 | | 0..1 229392 | BusinessTransactionDocumentReference 229394 |

FIG. 229-14

| Package | level1 | level2 | level3 | level4 | level5 | Cardinality | Datatype Name |
|---|---|---|---|---|---|---|---|
| | | | | PaymentTransactionInitiatorPurchaseOrderReference 229396 | | 0..1 229398 | BusinessTransactionDocumentReference 229400 |
| | | | | PaymentTransactionDestinatedPurchaseOrderReference 229402 | | 0..1 229404 | BusinessTransactionDocumentReference 229406 |
| | | | | PaymentDifferenceExplanationItem 229408 | | 0..n 229410 | PaymentDifferenceExplanationItem 229412 |

| Package | level1 | level2 | level3 | level4 | level5 | Cardinality | Datatype Name |
|---|---|---|---|---|---|---|---|
| ProductionRequestConfirmationMessage 234000 | ProductionRequest-Confirmation 234002 | | | | | | ProductionRequestConfirmation-Message 234004 |
| Message-Header 234006 | | MessageHeader 234008 | | | | 1 234010 | Business-Document-Message-Header 234012 |
| ProductionRequest 234014 | | ProductionRequest 234016 | | | | 1 234018 | ProductionRequestConfirmation 234020 |
| | | | @listCompleteTransmissionIndicator 234022 | | | 1 234024 | Indicator 234026 |
| | | | @actionCode 234028 | | | 1 234030 | ActionCode 234032 |

| Package | level1 | level2 | level3 | level4 | level5 | Cardinality | Datatype Name |
|---|---|---|---|---|---|---|---|
| | | | ID 234034 | | | 1 234036 | Business-Transac-tionDocu-mentID 234038 |
| | | | Re-leasedExecu-tionProduc-tionModelID 234040 | | | 1 234042 | Produc-tionModelID 234044 |
| | | | Re-leasedExecu-tionProduc-tionModelVer sionID 234046 | | | 1 234048 | VersionID 234050 |

| Package | level1 | level2 | level3 | level4 | level5 | Cardinality | Datatype Name |
|---|---|---|---|---|---|---|---|
| | | | Status 234052 | | | 0..1 234054 | Produc-tionRe-questCon-firmation-Produc-tionRe-questStatus 234056 |
| | | | | AggregatedPro-ductionOrderLife-CycleStatusCode 234058 | | 1 234060 | Logistic-sLifecycleS-tatusCode 234062 |
| | | | | ProductionOrder-CreationProcess-ingStatusCode 234064 | | 1 234066 | Process-ingStatus-Code 234068 |
| | | | | Cancelation-StatusCode 234070 | | 1 234072 | Cancella-tionStatus-Code 234074 |

FIG. 234-4

| Package | level1 | level2 | level3 | level4 | level5 | Cardinality | Datatype Name |
|---|---|---|---|---|---|---|---|
| Production-Segment 234076 | | | Production-Segment 234078 | | | 0..n 234080 | Produc-tionRe-questCon-firmation-Produc-tionRe-questPro-duction-Segment 234082 |
| | | | | @listCompleteTransmissionIndicator 234084 | | 1 234086 | Indicator 234088 |
| | | | | @actionCode 234090 | | 1 234092 | ActionCode 234094 |
| | | | | ID 234096 | | 1 234098 | Production-SegmentID 234100 |

FIG. 234-5

| Package | level1 | level2 | level3 | level4 | level5 | Cardinality | Datatype Name |
|---|---|---|---|---|---|---|---|
| | | | | MaterialOutput-Group 234102 | | 0..n 234104 | ProductionRequestConfirmation-ProductionRequestProduction-Segment-MaterialOutput-Group 234106 |
| | | | | | @actionCode 234108 | 1 234110 | ActionCode 234112 |
| | | | | | ID 234114 | 1 234116 | MaterialOutput-GroupID 234118 |
| | | | | | BillOfMaterialVariantID 234120 | 0..1 234122 | BillOfMaterialVariantID 234124 |

FIG. 234-6

| Package | level1 | level2 | level3 | level4 | level5 | Cardinality | Datatype Name |
|---|---|---|---|---|---|---|---|
| | | | | ConfirmedMateria-lOutput 234126 | | 0..n 234128 | Production RequestCo nfirmationPr oduction-Request-Production-Segment-Confirmed-Materia-lOutput 234130 |
| | | | | | @actionCode 234132 | 1 234134 | ActionCode 234136 |
| | | | | | ID 234138 | 1 234140 | Materia-lOutputID 234142 |
| | | | | | MaterialOutput-GroupID 234144 | 1 234146 | Materia-lOutput-GroupID 234148 |
| | | | | | PlannedOpera-tionID 234150 | 0..1 234152 | OperationID 234154 |

FIG. 234-7

| Package | level1 | level2 | level3 | level4 | level5 | Cardinality | Datatype Name |
|---|---|---|---|---|---|---|---|
| | | | | | MaterialID 234156 | 1 234158 | ProductID 234160 |
| | | | | | SupplyPlanningA-realD 234162 | 1 234164 | Supply-PlanningA-realD 234166 |
| | | | | | DueDateTime 234168 | 1 234170 | GLOBAL-DateTime 234172 |
| | | | | | TotalQuantity 234174 | 1 234176 | Quantity 234178 |
| | | | | | FulfilledQuantity 234180 | 1 234182 | Quantity 234184 |

FIG. 234-8

| Package | level1 | level2 | level3 | level4 | level5 | Cardinality | Datatype Name |
| --- | --- | --- | --- | --- | --- | --- | --- |
| | | | | MaterialInputGroup 234186 | | 0..n 234188 | ProductionRequestConfirmation-ProductionRequestProduction-Segment-MaterialInputGroup 234190 |
| | | | | | @actionCode 234192 | 1 234194 | ActionCode 234196 |
| | | | | | ID 234198 | 1 234200 | MaterialInputGroupID 234202 |
| | | | | | BillOfMaterial-ItemGroupID 234204 | 0..1 234206 | BillOfMaterialItem-GroupID 234208 |

FIG. 234-9

| Package | level1 | level2 | level3 | level4 | level5 | Cardinality | Datatype Name |
|---|---|---|---|---|---|---|---|
| | | | | | BillOfMaterial-ItemGroupItemID 234210 | 0..1 234212 | BillOfMate-rialItem-GroupItemID 234214 |
| | | | | | Engineering-ChangeOrderID 234216 | 0..1 234218 | EngineeringChangeOr-derID 234220 |
| | | | | ConfirmedMateri-alInput 234222 | | 0..n 234224 | ProductionRequestConfirmationProduction-Request-Production-Segment-Confirmed-MaterialIn-put 234226 |
| | | | | | @actionCode 234228 | 1 234230 | ActionCode 234232 |

FIG. 234-10

| Package | level1 | level2 | level3 | level4 | level5 | Cardinality | Datatype Name |
|---|---|---|---|---|---|---|---|
| | | | | | ID 234234 | 1 234236 | MaterialIn-putID 234238 |
| | | | | | MaterialInput-GroupID 234240 | 1 234242 | MaterialIn-putGroupID 234244 |
| | | | | | PlannedOpera-tionID 234246 | 0..1 234248 | OperationID 234250 |
| | | | | | MaterialID 234252 | 1 234254 | ProductID 234256 |
| | | | | | SupplyPlanningA-reaID 234258 | 1 234260 | Supply-PlanningA-reaID 234262 |
| | | | | | DueDateTime 234264 | 1 234266 | GLOBAL-DateTime 234268 |
| | | | | | TotalQuantity 234270 | 1 234272 | Quantity 234274 |

FIG. 234-11

| Package | | | | level1 | level2 | level3 | level4 | level5 | Cardinality | Datatype Name |
|---|---|---|---|---|---|---|---|---|---|---|
| | | | | | | | | FulfilledQuantity 234276 | 1 234278 | Quantity 234280 |

FIG. 235-1

| Package | level1 | level2 | level3 | level4 | level5 | Cardinality | Datatype Name |
|---|---|---|---|---|---|---|---|
| ProductionRequestConfirmationReconciliation-Message 235000 | ProductionRequest-ConfirmationReconciliation-Notification 235002 | | | | | | ProductionRequestConfirmation-Reconciliation-Message 235004 |
| MessageHeader 235006 | | Message-Header 235008 | | | | 1 235010 | BusinessDocumentMessage-Header 235012 |
| | | | ID 235014 | | | 1 235016 | BusinessDocumentMessageID 235018 |

FIG. 235-2

| Package | level1 | level2 | level3 | level4 | level5 | Cardinality | Datatype Name |
|---|---|---|---|---|---|---|---|
| | | | Referen-ceID 235020 | | | 0..1 235022 | Busi-nessDocu mentMes-sageID 235024 |
| | | | Creation-DateTime 235026 | | | 1 235028 | DateTime 235030 |
| | | | Sender-Party 235032 | | | 0..1 235034 | Busi-nessDocu mentMes-sage-Header-Party 235036 |
| | | | Recipi-entParty 235038 | | | 0..n 235040 | Busi-nessDocu mentMes-sage-Header-Party 235042 |

FIG. 235-3

| Package | level1 | level2 | level3 | level4 | level5 | Cardinality | Datatype Name |
|---|---|---|---|---|---|---|---|
| ProductionRequest 235044 | | ProductionRequest 235046 | | | | 1 235048 | ProductionRequestConfirmationReconciliationNotificationProductionRequest 235050 |
| | | | @reconciliationPeriodCounterValue 235052 | | | 1 235054 | CounterValue 235056 |
| | | | ID 235058 | | | 1 235060 | BusinessTransactionDocumentID 235062 |

FIG. 235-4

| Package | level1 | level2 | level3 | level4 | level5 | Cardinality | Datatype Name |
|---|---|---|---|---|---|---|---|
| | | | Status 235064 | | | 1 235066 | ProductionRequestConfirmationReconciliation-Notification-Production-Request-Status 235068 |
| | | | | ProductionOrderListLifecycleStatusCode 235070 | | 1 235072 | LogisticsLifecycleStatusCode 235074 |

FIG. 235-5

| Package | | level1 | level2 | level3 | level4 | level5 | Cardinality | Datatype Name |
|---|---|---|---|---|---|---|---|---|
| | | | | | Produc-tionOr-derCrea-tionProc-essing-Status-Code 235076 | | 1 235078 | Process-ingStatus-Code 235080 |
| | | | | | Cancella-tionStatus Code 235082 | | 1 235084 | Cancella-tionStatus Code 235086 |

FIG. 235-6

| Package | level1 | level2 | level3 | level4 | level5 | Cardinality | Datatype Name |
|---|---|---|---|---|---|---|---|
| ProductionSegment 235088 | | | Produc-tionSeg-ment 235090 | | | 0..n 235092 | ProductionRequestConfirmationRecon-ciliation-Notifica-tionPro-duction-Request-Produc-tionSeg-ment 235094 |
| | | | | ID 235096 | | 1 235098 | Produc-tionSeg-mentID 235100 |

FIG. 235-7

| Package | level1 | level2 | level3 | level4 | level5 | Cardinality | Datatype Name |
|---|---|---|---|---|---|---|---|
| | | | | Materia-lOutput-Group 235102 | | 0..n 235104 | ProductionRequestConfirmationReconciliationNotification-Production-RequestProduction-Segment-MaterialOutputGroup 235106 |
| | | | | | ID 235108 | 1 235110 | Materia-lOutput-GroupID 235112 |

FIG. 235-8

| Package | level1 | level2 | level3 | level4 | level5 | Cardinality | Datatype Name |
|---|---|---|---|---|---|---|---|
| | | | | | Material-RoleCode 235114 | 1 235116 | Materia-lOutput-GroupMa-terial-RoleCode 235118 |
| | | | | Con-firmedMa-terialOut-put 235120 | | 1..n 235122 | ProductionRequestConfirmationReconciliationNotificationPro duction-Request-Produc-tionSeg-mentCon-firmedMa-terialOut-put 235124 |
| | | | | | ID 235126 | 1 235128 | Materia-lOutputID 235130 |

FIG. 235-9

| Package | level1 | level2 | level3 | level4 | level5 | Cardinality | Datatype Name |
|---|---|---|---|---|---|---|---|
| | | | | | Materia-lOutput-GroupID 235132 | 1 235134 | Materia-lOutput-GroupID 235136 |
| | | | | | Planne-dOpera-tionID 235138 | 0..1 235140 | Opera-tionID 235142 |
| | | | | | MaterialID 235144 | 1 235146 | ProductID 235148 |
| | | | | | Supply-Plannin-gAreaID 235150 | 1 235152 | Supply-Plannin-gAreaID 235154 |
| | | | | | DueDateT ime 235156 | 1 235158 | GLOBAL-DateTime 235160 |
| | | | | | Total-Quantity 235162 | 1 235164 | Quantity 235166 |

FIG. 235-10

| Package | level1 | level2 | level3 | level4 | level5 | Cardinality | Datatype Name |
|---|---|---|---|---|---|---|---|
| | | | | | Total-QuantityTypeCode 235168 | 1 235170 | QuantityTypeCode 235172 |
| | | | | | Fulfilled-Quantity 235174 | 1 235176 | Quantity 235178 |
| | | | | | Fulfilled-QuantityTypeCode 235180 | 1 235182 | QuantityTypeCode 235184 |

FIG. 235-11

| Package | level1 | level2 | level3 | level4 | level5 | Cardinality | Datatype Name |
|---|---|---|---|---|---|---|---|
| | | | | Materia-Input-Group 235186 | | 0..n 235188 | ProductionRequestConfirmationReconciliationNotification-Produc-tionRe-questPro-duction-Seg-mentMa-terialIn-putGroup 235190 |
| | | | | | ID 235192 | 1 235194 | Materi-alInput-GroupID 235196 |

FIG. 235-12

| Package | level1 | level2 | level3 | level4 | level5 | Cardinality | Datatype Name |
|---|---|---|---|---|---|---|---|
| | | | | | Material-RoleCode 235198 | 1 235200 | Materi-alInput-GroupMa-terial-RoleCode 235202 |
| | | | | Con-firmedMa-terialInput 235204 | | 0..n 235206 | ProductionRequestConfirmationReconciliationNotificationPro duction-Request-Produc-tionSeg-mentCon-firmedMa-terialInput 235208 |
| | | | | | ID 235210 | 1 235212 | Materi-alInputID 235214 |

FIG. 235-13

| Package | level1 | level2 | level3 | level4 | level5 | Cardinality | Datatype Name |
|---|---|---|---|---|---|---|---|
| | | | | | Materi-allnput-GroupID 235216 | 1 235218 | Materi-allnput-GroupID 235220 |
| | | | | | Planne-dOpera-tionID 235222 | 0..1 235224 | Opera-tionID 235226 |
| | | | | | MaterialID 235228 | 1 235230 | ProductID 235232 |
| | | | | | Supply-Plannin-gAreaID 235234 | 1 235236 | Supply-Plannin-gAreaID 235238 |
| | | | | | DueDateT ime 235240 | 1 235242 | GLOBAL-DateTime 235244 |
| | | | | | Total-Quantity 235246 | 1 235248 | Quantity 235250 |

FIG. 235-14

| Package | level1 | level2 | level3 | level4 | level5 | Cardinality | Datatype Name |
|---|---|---|---|---|---|---|---|
| | | | | | Total-QuantityTypeCode 235252 | 1 235254 | QuantityTypeCode 235256 |
| | | | | | FulfilledQuantity 235258 | 1 235260 | Quantity 235262 |
| | | | | | FulfilledQuantityTypeCode 235264 | 1 235266 | QuantityTypeCode 235268 |

FIG. 236-1

| Package | level1 | level2 | level3 | level4 | level5 | Cardinality | Datatype Name |
|---|---|---|---|---|---|---|---|
| ProductionRequestRequestMessage 236000 | ProductionRequestRequest 236002 | | | | | | ProductionRequestRequestMessage 236004 |
| MessageHeader 236006 | | MessageHeader 236008 | | | | 1 236010 | BusinessDocumentMessageHeader 236012 |
| ProductionRequest 236014 | | ProductionRequest 236016 | | | | 1 236018 | ProductionRequestRequest 236020 |
| | | | @actionCode 236022 | | | 1 236024 | ActionCode 236026 |
| | | | ReconciliationPeriodCounterValue 236028 | | | 1 236030 | CounterValue 236032 |

FIG. 236-2

| Package | level1 | level2 | level3 | level4 | level5 | Cardinality | Datatype Name |
|---|---|---|---|---|---|---|---|
| | | | ID 236034 | | | 1 236036 | Business-Transaction-DocumentID 236038 |
| | | | Re-leasedExecu-tionProduc-tionModelID 236040 | | | 1 236042 | Production-ModelID 236044 |
| | | | Re-leasedExecu-tionProduc-tionModelVer-sionID 236046 | | | 1 236048 | VersionID 236050 |
| | | | Re-leasedExecu-tionProduc-tionModelEx-plosionDate 236052 | | | 1 236054 | Date 236056 |

FIG. 236-3

| Package | level1 | level2 | level3 | level4 | level5 | Cardinality | Datatype Name |
|---|---|---|---|---|---|---|---|
| | | | ProductionCentreID 236058 | | | 1 236060 | OrganisationalCentreID 236062 |
| BusinessTransactionDocumentReference 236064 | | | BusinessTransactionDocumentReference 236066 | | | 0..1 236068 | BusinessTransactionDocumentReference 236070 |
| ProductionSegment 236072 | | | ProductionSegment 236074 | | | 1..n 236076 | ProductionRequestRequestProductionRequestProductionSegment 236078 |
| | | | | ID 236080 | | 1 236082 | ProductionSegmentID 236084 |

FIG. 236-4

| Package | level1 | level2 | level3 | level4 | level5 | Cardinality | Datatype Name |
|---|---|---|---|---|---|---|---|
| | | | | Produc-tionModel-Produc-tionSeg-mentID 236086 | | 0..1 236088 | Production-SegmentID 236090 |
| | | | | Planne-dOperation 236092 | | 0..n 236094 | ProductionRe questRe-questProduc-tionRequest-Production-Segment-PlannedOp-eration 236096 |
| | | | | | ID 236098 | 1 236100 | OperationID 236102 |
| | | | | | BillOfOp-era-tionsPlan-ningOp-erationID 236104 | 1 236106 | OperationID 236108 |

FIG. 236-5

| Package | level1 | level2 | level3 | level4 | level5 | Cardinality | Datatype Name |
|---|---|---|---|---|---|---|---|
| | | | | | Schedule-dExecu-tionPeriod 236110 | 0..1 236112 | UPPEROPE N_GLOBALD ateTimePe-riod 236114 |
| | | | | | Selecte-dOpera-tionAlter-nativeID 236116 | 0..1 236118 | OperationAl-ternativeID 236120 |
| | | | | Materia-lOutput-Group 236122 | | 1..n 236124 | ProductionRe questRequest Production-RequestPro-ductionSeg-mentMateria-lOutputGroup 236126 |
| | | | | | ID 236128 | 1 236130 | MaterialOut-putGroupID 236132 |

FIG. 236-6

| Package | level1 | level2 | level3 | level4 | level5 | Cardinality | Datatype Name |
|---|---|---|---|---|---|---|---|
| | | | | | Material-RoleCode 236134 | 0..1 236136 | MaterialOutputGroupMaterialRoleCode 236138 |
| | | | | | BillOfMaterialVariantID 236140 | 0..1 236142 | BillOfMaterialVariantID 236144 |
| | | | | Requested MaterialOutput 236146 | | 1..n 236148 | ProductionRequestRequestProductionRequestProductionSegmentRequestedMaterialOutput 236150 |
| | | | | | ID 236152 | 1 236154 | MaterialOutputID 236156 |

FIG. 236-7

| Package | level1 | level2 | level3 | level4 | level5 | Cardinality | Datatype Name |
|---|---|---|---|---|---|---|---|
| | | | | | Materia-lOutput-GroupID 236158 | 1 236160 | MaterialOut-putGroupID 236162 |
| | | | | | Planne-dOpera-tionID 236164 | 0..1 236166 | OperationID 236168 |
| | | | | | MaterialID 236170 | 1 236172 | ProductID 236174 |
| | | | | | Supply-Plannin-gAreaID 236176 | 1 236178 | SupplyPlan-ningAreaID 236180 |
| | | | | | DueDateT ime 236182 | 1 236184 | GLOBAL-DateTime 236186 |
| | | | | | Total-Quantity 236188 | 1 236190 | Quantity 236192 |

FIG. 236-8

| Package | level1 | level2 | level3 | level4 | level5 | Cardinality | Datatype Name |
|---|---|---|---|---|---|---|---|
| | | | | MaterialInputGroup 236194 | | 0..n 236196 | ProductionRequestRequestProductionRequestProductionSegmentMaterialInputGroup 236198 |
| | | | | | ID 236200 | 1 236202 | MaterialInputGroupID 236204 |
| | | | | | BillOfMaterialItemGroupID 236206 | 0..1 236208 | BillOfMaterialItemGroupID 236210 |
| | | | | | BillOfMaterialItemGroupItemID 236212 | 0..1 236214 | BillOfMaterialItemGroupItemID 236216 |

FIG. 236-9

| Package | level1 | level2 | level3 | level4 | level5 | Cardinality | Datatype Name |
|---|---|---|---|---|---|---|---|
| | | | | | Engineer-ing-ChangeOrderID 236218 | 0..1 236220 | Engineering-ChangeOrde-rID 236222 |
| | | | | Requested MaterialIn-put 236224 | | 0..n 236226 | ProductionRequestRequestProduction-RequestPro-ductionSeg-mentRe-questedMate-rialInput 236228 |
| | | | | | ID 236230 | 1 236232 | MaterialIn-putID 236234 |
| | | | | | Materi-alInput-GroupID 236236 | 1 236238 | MaterialIn-putGroupID 236240 |

FIG. 236-10

| Package | level1 | level2 | level3 | level4 | level5 | Cardinality | Datatype Name |
|---|---|---|---|---|---|---|---|
| | | | | | Planne-dOpera-tionID 236242 | 0..1 236244 | OperationID 236246 |
| | | | | | MaterialID 236248 | 1 236250 | ProductID 236252 |
| | | | | | Supply-Plannin-gAreaID 236254 | 1 236256 | SupplyPlan-ningAreaID 236258 |
| | | | | | DueDateT ime 236260 | 1 236262 | GLOBAL-DateTime 236264 |
| | | | | | Total-Quantity 236266 | 1 236268 | Quantity 236270 |

| Package | | | level1 | level2 | level3 | level4 | level5 | Cardinality | Datatype Name |
|---|---|---|---|---|---|---|---|---|---|
| SiteLogisticsRequestConfirmation 241000 | | | SiteLogisticsRequestConfirmation 241002 | | | | | | <MessageDataType> 241004 |
| | MessageHeader 241006 | | | MessageHeader 241008 | | | | 1 241010 | BusinessDocumentMessageHeader 241012 |
| | | | | | ID 241014 | | | 1 241016 | BusinessDocumentMessageID 241018 |
| | | | | | CreationDateTime 241020 | | | 1 241022 | DateTime 241024 |
| | | | | | SenderParty 241026 | | | 0..1 241028 | BusinessDocumentMessageHeaderParty 241030 |
| | | | | | ReceiverParty 241032 | | | 0..n 241034 | BusinessDocumentMessageHeaderParty 241036 |

FIG. 241-2

| Package | | | | level1 | level2 | level3 | level4 | level5 | Cardinality | Datatype Name |
|---|---|---|---|---|---|---|---|---|---|---|
| | | | | | | BusinessScope 241038 | | | 1 241040 | BusinessScope 241042 |
| | SiteLogisticsRequestConfirmation 241044 | | | | SiteLogisticsRequestConfirmation 241046 | | | | 1 241048 | SiteLogisticsRequestConfirmation 241050 |
| | | | | | | ActionCode 241052 | | | 1 241054 | ActionCode 241056 |
| | | | | | | ID 241058 | | | 1 241060 | BusinessTransactionDocumentID 241062 |
| | | | | | | BaseBusinessTransactionDocumentID 241064 | | | 0..1 241066 | BusinessTransactionDocumentID 241068 |
| | | | | | | BaseBusinessTransactionDocumentTypeCode 241070 | | | 0..1 241072 | BusinessTransactionDocumentTypeCode 241074 |

FIG. 241-3

| Package | | | level1 | level2 | level3 | level4 | level5 | Cardinality | Datatype Name |
|---|---|---|---|---|---|---|---|---|---|
| | | | | | LogisticsExecution-ProcessingTypeCode 241076 | | | 0..1 241078 | LogisticsExecution-ProcessingType-Code 241080 |
| | ConfirmationItem 241082 | | | | Confirma-tionItem 241084 | | | 1..n 241086 | SiteLogisticsRe-questConfirmation-ConfirmationItem 241088 |
| | | | | | | ActionCode 241090 | | 1 241092 | ActionCode 241094 |
| | | | | | | ID 241096 | | 1 241098 | BusinessTransac-tionDocumentItemID 241100 |
| | | | | | | TypeCode 241102 | | 1 241104 | BusinessTransac-tionDocumentItem-TypeCode 241106 |
| | | | | | | BaseBusinessTransac-tionDocumentReques-tItemID 241108 | | 0..1 241110 | BusinessTransac-tionDocumentItemID 241112 |

FIG. 241-4

| Package | | | | level1 | level2 | level3 | level4 | level5 | Cardinality | Datatype Name |
|---|---|---|---|---|---|---|---|---|---|---|
| | | | | | | | SupplyPlanningAreaID 241114 | | 0..1 241116 | SupplyPlanningA-realD 241118 |
| | | | Date 241120 | | | | Position-ingPeriod 241122 | | 1 241124 | … |
| | | | | | | | | Time-PointPe-riod 241126 | 1 241128 | TimePointPeriod 241130 |
| | | | | | | | Shipping-Period 241132 | | 1 241134 | … |
| | | | | | | | | Time-PointPe-riod 241136 | 1 241138 | TimePointPeriod 241140 |
| | | | | | | | DeliveryPe-riod 241142 | | 1 241144 | … |

FIG. 241-5

| Package | | | | level1 | level2 | level3 | level4 | level5 | Cardinality | Datatype Name |
|---|---|---|---|---|---|---|---|---|---|---|
| | | | | | | | | Time-PointPe-riod 241146 | 1 241148 | TimePointPeriod 241150 |
| | | | | | | | Availabili-tyPeriod 241152 | | 1 241154 | … |
| | | | | | | | | Time-PointPe-riod 241156 | 1 241158 | TimePointPeriod 241160 |
| | | | Location 241162 | | | | ShipFrom-Location 241164 | | 0..1 241166 | BusinessTransac-tionDocumentLoca-tion 241168 |
| | | | | | | | | InternalID 241170 | 1 241172 | LocationID 241174 |
| | | | | | | | | Address 241176 | 0..1 241178 | Address 241180 |

FIG. 241-6

| Package | | | | level1 | level2 | level3 | level4 | level5 | Cardinality | Datatype Name |
|---|---|---|---|---|---|---|---|---|---|---|
| | | | | | | | ShipToLocation 241182 | | 0..1 241184 | BusinessTransactionDocumentLocation 241186 |
| | | | | | | | | InternalID 241188 | 1 241190 | LocationID 241192 |
| | | | | | | | | Address 241194 | 0..1 241196 | Address 241198 |
| | | | BusinessTransactionDocumentReference 241200 | | | | PurchaseOrderItemReference 241202 | | 0..1 241204 | … |
| | | | | | | | | BusinessTransactionDocumentReference 241206 | 1 241208 | BusinessTransactionDocumentReference 241210 |

FIG. 241-7

| Package | | | | level1 | level2 | level3 | level4 | level5 | Cardinality | Datatype Name |
|---|---|---|---|---|---|---|---|---|---|---|
| | | | | | | | | BusinessTransactionDocumentItemTypeCode 241212 | 1 241214 | BusinessTransactionDocumentItemTypeCode 241216 |
| | | | | | | | SalesOrderItemReference 241218 | | 0..1 241220 | … |
| | | | | | | | | BusinessTransactionDocumentReference 241222 | 1 241224 | BusinessTransactionDocumentReference 241226 |
| | | | | | | | | BusinessTransactionDocumentItemTypeCode 241228 | 1 241230 | BusinessTransactionDocumentItemTypeCode 241232 |

FIG. 241-8

| Package | | | | level1 | level2 | level3 | level4 | level5 | Cardinality | Datatype Name |
|---|---|---|---|---|---|---|---|---|---|---|
| | | | Quantity 241234 | | | | Con-firmedQuantity 241236 | | 1 241238 | … |
| | | | | | | | | Quantity 241240 | 1 241242 | Quantity 241244 |
| | | | | | | | | QuantityO-riginType-Code 241246 | 0..1 241248 | QuantityOrigin-TypeCode 241250 |
| | | | | | | | Fulfilled-Quantity 241252 | | 0..1 241254 | … |
| | | | | | | | | Quantity 241256 | 0..1 241258 | Quantity 241260 |
| | | | | | | | | QuantityO-riginType-Code 241262 | 0..1 241264 | QuantityOrigin-TypeCode 241266 |
| | | | | | | | Rejected-Quantity 241268 | | 0..1 241270 | … |

FIG. 241-9

| Package | | | | level1 | level2 | level3 | level4 | level5 | Cardinality | Datatype Name |
|---|---|---|---|---|---|---|---|---|---|---|
| | | | | | | | | Quantity 241272 | 0..1 241274 | Quantity 241276 |
| | | | | | | | | QuantityOriginTypeCode 241278 | 0..1 241280 | QuantityOriginTypeCode 241282 |
| | | | ProductInformation 241284 | | | | Product 241286 | | 1 241288 | BusinessTransactionDocumentProduct 241290 |
| | | | | | | | | InternalID 241292 | 1 241294 | ProductInternalID 241296 |
| | | | | | | | | Description 241298 | 0..1 241300 | Note 241302 |
| | | | | | | | Batch 241304 | | 0..1 241306 | … |
| | | | | | | | | ID 241308 | 0..1 241310 | BatchID 241312 |

FIG. 242-1

| Package | level1 | level2 | level3 | level4 | level5 | level6 | Cardinality | Datatype Name |
|---|---|---|---|---|---|---|---|---|
| SiteLogisticsRequestConfirmationReconciliationMessage 242000 | SiteLogisticsRequestConfirmationReconciliationMessage 242002 | | | | | | | SiteLogisticsRequestConfirmationReconciliationMessage 242004 |
| MessageHeader 242006 | | MessageHeader 242008 | | | | | 1 242010 | BusinessDocumentMessageHeader 242012 |
| | | | ID 242014 | | | | 1 242016 | BusinessDocumentMessageID 242018 |
| | | | CreationDateTime 242020 | | | | 1 242022 | DateTime 242024 |

FIG. 242-2

| Package | level1 | level2 | level3 | level4 | level5 | level6 | Cardinality | Datatype Name |
|---|---|---|---|---|---|---|---|---|
| | | | Sender-Party 242026 | | | | 0..1 242028 | Business-Document-Message-HeaderParty 242030 |
| | | | Receiver-Party 242032 | | | | 0..n 242034 | Business-Document-Message-HeaderParty 242036 |
| | | | Busi-nessScope 242038 | | | | 1 242040 | BusinessS-cope 242042 |
| SiteLogisticsRe-quest 242044 | | SiteLo-gis-ticsRe-quest 242046 | | | | | 1 242048 | SiteLogistics RequestCon-firmation-Reconcilia-tionSiteLo-gisticsRe-quest 242050 |

FIG. 242-3

| Package | level1 | level2 | level3 | level4 | level5 | level6 | Cardinality | Datatype Name |
|---|---|---|---|---|---|---|---|---|
| | | | @reconciliationPeriodCounterValue 242052 | | | | 1 242054 | CounterValue 242056 |
| | | | ID 242058 | | | | 1 242060 | BusinessTransactionDocumentID 242062 |
| | | | UUID 242064 | | | | 0..1 242066 | UUID 242068 |
| | | | BaseBusinessTransactionDocumentID 242070 | | | | 0..1 242072 | BusinessTransactionDocumentID 242074 |
| | | | BaseBusinessTransactionDocumentUUID 242076 | | | | 0..1 242078 | UUID 242080 |

FIG. 242-4

| Package | level1 | level2 | level3 | level4 | level5 | level6 | Cardinality | Datatype Name |
|---|---|---|---|---|---|---|---|---|
| | | | BaseBusiness-TransactionDocument-TypeCode 242082 | | | | 0..1 242084 | Business-Transaction-Document-TypeCode 242086 |
| | | | SiteLogisticsProcessType-Code 242088 | | | | 0..1 242090 | SiteLogistic-sProcessType-Code 242092 |
| ConfirmationItem 242094 | | | ConfirmationItem 242096 | | | | 0..n 242098 | SiteLogistics RequestConfirmation-ReconciliationSiteLogisticsRequestConfirmationItem 242100 |

FIG. 242-5

| Package | level1 | level2 | level3 | level4 | level5 | level6 | Cardinality | Datatype Name |
|---|---|---|---|---|---|---|---|---|
| | | | | ID 242102 | | | 1 242104 | Business-Transaction-Documen-tItemID 242106 |
| | | | | UUID 242108 | | | 0...1 242110 | UUID 242112 |
| | | | | TypeCode 242114 | | | 1 242116 | Business-Transaction-Documen-tItemType-Code 242118 |
| | | | | SupplyPlan-ningAreaID 242120 | | | 0..1 242122 | SupplyPlan-ningAreaID 242124 |
| | | | | BaseBusi-nessTransac-tionDocumen-tReques-tItemID 242126 | | | 0..1 242128 | Business-Transaction-Documen-tItemID 242130 |

FIG. 242-6

| Package | level1 | level2 | level3 | level4 | level5 | level6 | Cardinality | Datatype Name |
|---|---|---|---|---|---|---|---|---|
| | | | | SiteLogistic-sProcessing-StatusCode 242132 | | | 0..1 242134 | NOTSTARTEDINPROCESSFINISHED_ProcessingStatusCode 242136 |
| Date 242138 | | | | ArrivalPeriod 242140 | | | 0..1 242142 | TimePoint-Period 242144 |
| | | | | AvailabilityPe-riod 242146 | | | 0..1 242148 | TimePoint-Period 242150 |
| | | | | PositioningPe-riod 242152 | | | 0..1 242154 | TimePoint-Period 242156 |
| | | | | IssuePeriod 242158 | | | 0..1 242160 | TimePoint-Period 242162 |
| | | | | PickupPeriod 242164 | | | 0..1 242166 | TimePoint-Period 242168 |

FIG. 242-7

| Package | level1 | level2 | level3 | level4 | level5 | level6 | Cardinality | Datatype Name |
|---|---|---|---|---|---|---|---|---|
| Location 242170 | | | | ShipFromLocation 242172 | | | 0..1 242174 | Business-Transaction-Document-Location 242176 |
| | | | | | InternalID 242178 | | 1 242180 | LocationID 242182 |
| | | | | | Address-Reference 242184 | | 0..1 242186 | LocationAddressReference 242188 |
| | | | | | Address 242190 | | 0..1 242192 | Address 242194 |
| | | | | ShipToLocation 242196 | | | 0..1 242198 | Business-Transaction-Document-Location 242200 |
| | | | | | InternalID 242202 | | 1 242204 | LocationID 242206 |

FIG. 242-8

| Package | level1 | level2 | level3 | level4 | level5 | level6 | Cardinality | Datatype Name |
|---|---|---|---|---|---|---|---|---|
| | | | | | Address-Refer-ence 242208 | | 0..1 242210 | LocationAd-dressRefer-ence 242212 |
| | | | | | Address 242214 | | 0..1 242216 | Address 242218 |
| Business-Transaction-Documen-tReference 242220 | | | | PurchaseOrde-rItemRefer-ence 242222 | | | 0..1 242224 | Business-Transaction-Documen-tReference 242226 |
| | | | | SalesOrde-rItemRefer-ence 242228 | | | 0..1 242230 | Business-Transaction-Documen-tReference 242232 |
| | | | | ServiceOrde-rItemRefer-ence 242234 | | | 0..1 242236 | Business-Transaction-Documen-tReference 242238 |

FIG. 242-9

| Package | level1 | level2 | level3 | level4 | level5 | level6 | Cardinality | Datatype Name |
|---|---|---|---|---|---|---|---|---|
| | | | | SiteLogistic-sConfirmation-Inven-toryChangeIte m 242240 | | | 0..n 242242 | ... |
| | | | | | Refer-ence 242244 | | 1 242246 | Business-Transaction-Documen-tReference 242248 |
| | | | | | Actual-Value 242250 | | 1 242252 | ... 242254 |
| | | | | | | FulfilledQuan-tity 242256 | 1 242258 | Quantity 242260 |
| | | | | | | FulfilledQuanti-tyTypeCode 242262 | 1 242264 | Quanti-tyTypeCode 242266 |

FIG. 242-10

| Package | level1 | level2 | level3 | level4 | level5 | level6 | Cardinality | Datatype Name |
|---|---|---|---|---|---|---|---|---|
| | | | | | | Transaction-TimePoint 242268 | 1 242270 | TimePoint 242272 |
| | | | | | | DocumentCancellationIndicator 242274 | 1 242276 | Indicator 242278 |
| | | | | | | CancelledSiteLogisticsConfirmationInventoryChangeItem Reference 242280 | 1 242282 | Business-Transaction-DocumentReference 242284 |
| Quantity 242286 | | | | Confirmed-Quantity 242288 | | | 1 242290 | Quantity 242292 |
| | | | | Confirmed-QuantityType-Code 242294 | | | 1 242296 | QuantityTypeCode 242298 |

FIG. 242-11

| Package | level1 | level2 | level3 | level4 | level5 | level6 | Cardinality | Datatype Name |
|---|---|---|---|---|---|---|---|---|
| | | | | FulfilledQuantity 242300 | | | 1 242302 | Quantity 242304 |
| | | | | FulfilledQuantityTypeCode 242306 | | | 1 242308 | QuantityTypeCode 242310 |
| | | | | WorkInProcessQuantity 242312 | | | 1 242314 | Quantity 242316 |
| | | | | WorkInProcessQuantityTypeCode 242318 | | | 1 242320 | QuantityTypeCode 242322 |
| | | | | ForwardedQuantity 242324 | | | 1 242326 | Quantity 242328 |
| | | | | ForwardedQuantityTypeCode 242330 | | | 1 242332 | QuantityTypeCode 242334 |

FIG. 242-12

| Package | level1 | level2 | level3 | level4 | level5 | level6 | Cardinality | Datatype Name |
|---|---|---|---|---|---|---|---|---|
| ProductInfor-mation 242336 | | | | Product 242338 | | | 1 242340 | Business-Transaction-Document-Product 242342 |
| | | | | | InternalID 242344 | | 1 242346 | Product-InternalID 242348 |

FIG. 243-1

| Packages | | level1 | level2 | level3 | level4 | level5 | Cardinality | Datatype Name |
|---|---|---|---|---|---|---|---|---|
| SiteLogisticsRequestRequest-Message 243000 | | SiteLogisticsRequestRequest 243002 | | | | | | <Message-DataType> 243004 |
| MessageHeader 243006 | | | Message-Header 243008 | | | | 1 243010 | Business-Document-Message-Header 243012 |
| | | | | ID 243014 | | | 1 243016 | Business-Document-MessageID 243018 |
| | | | | Creation-DateTime 243020 | | | 1 243022 | DateTime 243024 |
| | | | | Sender-Party 243026 | | | 0..1 243028 | Business-Document-Message-HeaderParty 243030 |

FIG. 243-2

| Packages | | level1 | level2 | level3 | level4 | level5 | Cardinality | Datatype Name |
|---|---|---|---|---|---|---|---|---|
| | | | | Receiver-Party 243032 | | | 0..n 243034 | Business-Document-Message-HeaderParty 243036 |
| | | | | BusinessS-cope 243038 | | | 1 243040 | BusinessS-cope 243042 |
| SiteLogisticsRequestRe-quest 243044 | | | SiteLogisticsRe-questRequest 243046 | | | | 1 243048 | SiteLogis-ticsRe-questRequest 243050 |
| | | | | ActionCode 243052 | | | 1 243054 | ActionCode 243056 |
| | | | | ID 243058 | | | 0..1 243060 | Business-Transaction-DocumentID 243062 |
| | | | | BaseBusinessTransac-tionDocumentID 243064 | | | 1 243066 | Business-Transaction-DocumentID 243068 |

FIG. 243-3

| Packages | | level1 | level2 | level3 | level4 | level5 | Cardinality | Datatype Name |
|---|---|---|---|---|---|---|---|---|
| | | | | BaseBusinessTransactionDocumentTypeCode 243070 | | | 1 243072 | Business-Transaction-Document-TypeCode 243074 |
| | | | | LogisticsExecution-ProcessingTypeCode 243076 | | | 1 243078 | Logis-ticsExecu-tionProcess-ingTypeCode 243080 |
| | | | | SupplyPlanningAreaID 243082 | | | 0..1 243084 | SupplyPlan-ningAreaID 243086 |
| Date 243088 | | | | Shipping-Period 243090 | | | 0..1 243092 | … |
| | | | | | Time-PointPe-riod 243094 | | 1 243096 | TimePointPe-riod 243098 |

FIG. 243-4

| Packages | | level1 | level2 | level3 | level4 | level5 | Cardinality | Datatype Name |
|---|---|---|---|---|---|---|---|---|
| | | | | DeliveryPeriod 243100 | | | 0..1 243102 | … |
| | | | | | TimePointPeriod 243104 | | 1 243106 | TimePointPeriod 243108 |
| Party 243110 | | | | VendorParty 243112 | | | 0..1 243114 | BusinessTransactionDocumentParty 243116 |
| | | | | | InternalID 243118 | | 1 243120 | PartyInternalID 243122 |
| | | | | | Address 243124 | | 0..1 243126 | Address 243128 |
| | | | | | ContactPerson 243130 | | 0..1 243132 | ContactPerson 243134 |

FIG. 243-5

| Packages | | level1 | level2 | level3 | level4 | level5 | Cardinality | Datatype Name |
|---|---|---|---|---|---|---|---|---|
| | | | | | | InternalID 243136 | 1 243138 | PartyInternalID 243140 |
| | | | | | | Address 243142 | 0..1 243144 | Address 243146 |
| | | | | ProductRecipientParty 243148 | | | 0..1 243150 | BusinessTransactionDocumentParty 243152 |
| | | | | | InternalID 243154 | | 1 243156 | PartyInternalID 243158 |
| | | | | | Address 243160 | | 0..1 243162 | Address 243164 |
| | | | | | ContactPerson 243166 | | 0..1 243168 | ContactPerson 243170 |
| | | | | | | InternalID 243172 | 1 243174 | PartyInternalID 243176 |

FIG. 243-6

| Packages | | level1 | level2 | level3 | level4 | level5 | Cardinality | Datatype Name |
|---|---|---|---|---|---|---|---|---|
| | | | | | | Address 243178 | 0..1 243180 | Address 243182 |
| | | | | FreightForwarderParty 243184 | | | 0..1 243186 | Business-Transaction-Document-Party 243188 |
| | | | | | InternalID 243190 | | 1 243192 | PartyInter-nalID 243194 |
| | | | | | Address 243196 | | 0..1 243198 | Address 243200 |
| | | | | | Contact-Person 243202 | | 0..1 243204 | ContactPer-son 243206 |
| | | | | | | InternalID 243208 | 1 243210 | PartyInter-nalID 243212 |
| | | | | | | Address 243214 | 0..1 243216 | Address 243218 |

FIG. 243-7

| Packages | | | | level1 | level2 | level3 | level4 | level5 | Cardinality | Datatype Name |
|---|---|---|---|---|---|---|---|---|---|---|
| | | | | | | Carrier-Party 243220 | | | 0..1 243222 | Business-Transaction-Document-Party 243224 |
| | | | | | | | InternalID 243226 | | 1 243228 | PartyInter-nalID 243230 |
| | | | | | | | Address 243232 | | 0..1 243234 | Address 243236 |
| | | | | | | | Contact-Person 243238 | | 0..1 243240 | ContactPer-son 243242 |
| | | | | | | | | InternalID 243244 | 1 243246 | PartyInter-nalID 243248 |
| | | | | | | | | Address 243250 | 0..1 243252 | Address 243254 |

FIG. 243-8

| Packages | | level1 | level2 | level3 | level4 | level5 | Cardinality | Datatype Name |
|---|---|---|---|---|---|---|---|---|
| Location 243256 | | | | ShipFrom-Location 243258 | | | 0..1 243260 | Business-Transaction-DocumentLocation 243262 |
| | | | | | InternalID 243264 | | 1 243266 | LocationID 243268 |
| | | | | | Address 243270 | | 0..1 243272 | Address 243274 |
| | | | | ShipToLocation 243276 | | | 0..1 243278 | Business-Transaction-DocumentLocation 243280 |
| | | | | | InternalID 243282 | | 1 243284 | LocationID 243286 |
| | | | | | Address 243288 | | 0..1 243290 | Address 243292 |

FIG. 243-9

| Packages | | level1 | level2 | level3 | level4 | level5 | Cardinality | Datatype Name |
|---|---|---|---|---|---|---|---|---|
| DeliveryInformation 243294 | | | | Delivery-Terms 243296 | | | 0..1 243298 | Business-Transaction-DocumentDe-liveryTerms 243300 |
| | | | | | PartialDeliveryCon-trolCode 243302 | | 0..1 243304 | PartialDeliv-eryControl-Code 243306 |
| | | | | | OrderCombinationAl-lowedIndicator 243308 | | 0..1 243310 | Indicator 243312 |
| | | | | | Delivery-Item-GroupID 243314 | | 0..1 243316 | Business-Transaction-Documen-tItemGroupID 243318 |
| | | | | | DeliveryPriorityCode 243320 | | 0..1 243322 | Business-Transaction-PriorityCode 243324 |

FIG. 243-10

| Packages | | level1 | level2 | level3 | level4 | level5 | Cardinality | Datatype Name |
|---|---|---|---|---|---|---|---|---|
| | | | | | Incoterms 243326 | | 0..1 243328 | Incoterms 243330 |
| | | | | | PartialDeliveryMaximumNumberValue 243332 | | 0..1 243334 | NumberValue 243336 |
| | | | | | Quantity-Tolerance 243338 | | 0..1 243340 | QuantityTolerance 243342 |
| | | | | | TimeTolerance 243344 | | 0..1 243346 | TimeTolerance 243348 |
| | | | | | MaximumLeadTime-Duration 243350 | | 0..1 243352 | Duration 243354 |
| | | | | | Descrip-tion 243356 | | 0..1 243358 | Description 243360 |
| TransportInformation 243362 | | | | TransportationTerms 243364 | | | 0..1 243366 | … |

FIG. 243-11

| Packages | | | | | level1 | level2 | level3 | level4 | level5 | Cardinality | Datatype Name |
|---|---|---|---|---|---|---|---|---|---|---|---|
| | | | | | | | | TransportServiceLevelCode 243368 | | 0..1 243370 | TransportServiceLevelCode 243372 |
| | | | | | | | | TransportModeCode 243374 | | 1 243376 | TransportModeCode 243378 |
| | | | | | | | | TransportMeans 243380 | | 1 243382 | TransportMeans 243384 |
| | | | | | | | | Description 243386 | | 1 243388 | Description 243390 |
| | | Description 243392 | | | | | Description 243394 | | | 0..1 243396 | … |
| | | | | | | | | TextCollection 243398 | | 1..n 243400 | |
| | | Attachment 243402 | | | | | Attachment 243404 | | | 0..1 243406 | … |

FIG. 243-12

| Packages | | level1 | level2 | level3 | level4 | level5 | Cardinality | Datatype Name |
|---|---|---|---|---|---|---|---|---|
| | | | | | Attach-ment 243408 | | 1..n 243410 | |
| RequestItem 243412 | | | | Reques-tItem 243414 | | | 1..n 243416 | SiteLogis-ticsRe-questRe-questReques-tItem 243418 |
| | | | | | Action-Code 243420 | | 1 243422 | ActionCode 243424 |
| | | | | | ID 243426 | | 0..1 243428 | Business-Transaction-Documen-tItemID 243430 |
| | | | | | BaseBusinessTrans-actionDocumentRe-questItemID 243432 | | 1 243434 | Business-Transaction-Documen-tItemID 243436 |

FIG. 243-13

| Packages | | level1 | level2 | level3 | level4 | level5 | Cardinality | Datatype Name |
|---|---|---|---|---|---|---|---|---|
| | | | | | TypeCode 243438 | | 1 243440 | Business-Transaction-DocumentItemType-Code 243442 |
| | | | | | SupplyPlanningAreaID 243444 | | 0..1 243446 | SupplyPlanningAreaID 243448 |
| | | | | | Request-edQuan-tity 243450 | | 1 243452 | Quantity 243454 |
| | | | | | RequestedQuantityO-riginTypeCode 243456 | | 0..1 243458 | QuantityO-riginType-Code 243460 |
| | Date 243462 | | | | Position-ingPeriod 243464 | | 0..1 243466 | … |

FIG. 243-14

| Packages | | level1 | level2 | level3 | level4 | level5 | Cardinality | Datatype Name |
|---|---|---|---|---|---|---|---|---|
| | | | | | | Time-PointPe-riod 243468 | 1 243470 | TimePointPe-riod 243472 |
| | | | | | Availabili-tyPeriod 243474 | | 0..1 243476 | … |
| | | | | | | Time-PointPe-riod 243478 | 1 243480 | TimePointPe-riod 243482 |
| | Location 243484 | | | | Ship-FromLo-cation 243486 | | 0..1 243488 | Business-Transaction-DocumentLo-cation 243490 |
| | | | | | | InternalID 243492 | 1 243494 | LocationID 243496 |
| | | | | | | Address 243498 | 0..1 243500 | Address 243502 |

FIG. 243-15

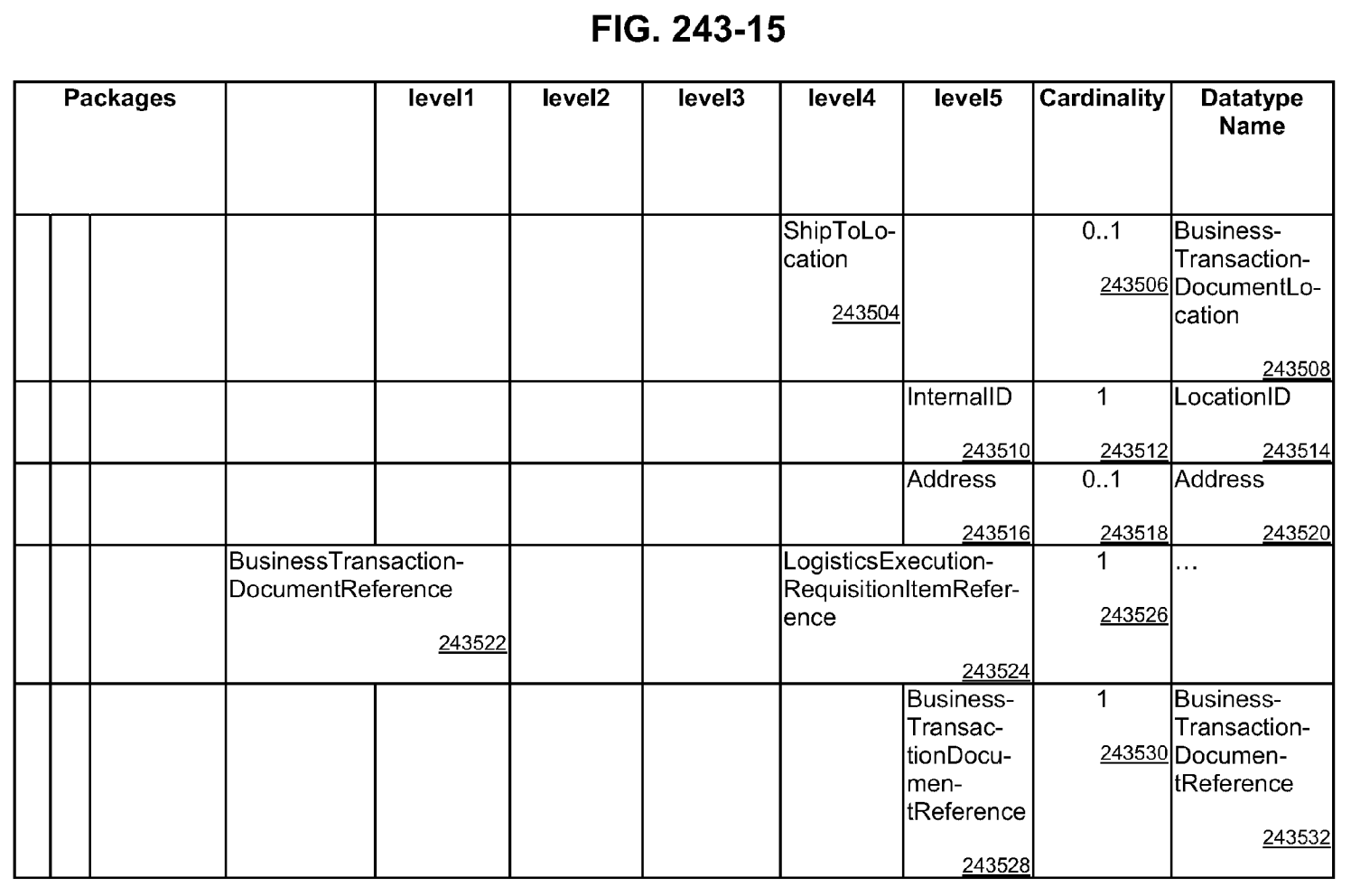

| Packages | | level1 | level2 | level3 | level4 | level5 | Cardinality | Datatype Name |
|---|---|---|---|---|---|---|---|---|
| | | | | | ShipToLocation 243504 | | 0..1 243506 | BusinessTransactionDocumentLocation 243508 |
| | | | | | | InternalID 243510 | 1 243512 | LocationID 243514 |
| | | | | | | Address 243516 | 0..1 243518 | Address 243520 |
| | BusinessTransactionDocumentReference 243522 | | | | LogisticsExecutionRequisitionItemReference 243524 | | 1 243526 | … |
| | | | | | | BusinessTransactionDocumentReference 243528 | 1 243530 | BusinessTransactionDocumentReference 243532 |

FIG. 243-16

| Packages | | | | level1 | level2 | level3 | level4 | level5 | Cardinality | Datatype Name |
|---|---|---|---|---|---|---|---|---|---|---|
| | | | | | | | | BusinessTransactionDocumentItemTypeCode 243534 | 1 243536 | BusinessTransactionDocumentItemTypeCode 243538 |
| | | | | | | | PurchaseOrderItemReference 243540 | | 0..1 243542 | … |
| | | | | | | | | BusinessTransactionDocumentReference 243544 | 1 243546 | BusinessTransactionDocumentReference 243548 |
| | | | | | | | | BusinessTransactionDocumentItemTypeCode 243550 | 1 243552 | BusinessTransactionDocumentItemTypeCode 243554 |

FIG. 243-17

| Packages | | | | level1 | level2 | level3 | level4 | level5 | Cardinality | Datatype Name |
|---|---|---|---|---|---|---|---|---|---|---|
| | | | | | | | SalesOrderItemReference 243556 | | 0..1 243558 | ... |
| | | | | | | | | BusinessTransactionDocumentReference 243560 | 1 243562 | BusinessTransactionDocumentReference 243564 |
| | | | | | | | | BusinessTransactionDocumentItemTypeCode 243566 | 1 243568 | BusinessTransactionDocumentItemTypeCode 243570 |
| | | | DeliveryInformation 243572 | | | | DeliveryTerms 243574 | | 0..1 243576 | BusinessTransactionDocumentDeliveryTerms 243578 |

FIG. 243-18

| Packages | | level1 | level2 | level3 | level4 | level5 | Cardinality | Datatype Name |
|---|---|---|---|---|---|---|---|---|
| | | | | | | PartialDeliveryControlCode 243580 | 0..1 243582 | PartialDeliveryControlCode 243584 |
| | | | | | | OrderCombinationAllowedIndicator 243586 | 0..1 243588 | Indicator 243590 |
| | | | | | | DeliveryItemGroupID 243592 | 0..1 243594 | BusinessTransactionDocumentItemGroupID 243596 |
| | | | | | | DeliveryPriorityCode 243598 | 0..1 243600 | BusinessTransactionPriorityCode 243602 |
| | | | | | | Incoterms 243604 | 0..1 243606 | Incoterms 243608 |

FIG. 243-19

| Packages | | | | level1 | level2 | level3 | level4 | level5 | Cardinality | Datatype Name |
|---|---|---|---|---|---|---|---|---|---|---|
| | | | | | | | | PartialDe-livery-Maximum-Number-Value 243610 | 0..1 243612 | NumberValue 243614 |
| | | | | | | | | Quantity-Tolerance 243616 | 0..1 243618 | QuantityTol-erance 243620 |
| | | | | | | | | TimeToler-ance 243622 | 0..1 243624 | TimeToler-ance 243626 |
| | | | | | | | | Maximum-Lead-TimeDura-tion 243628 | 0..1 243630 | Duration 243632 |
| | | | | | | | | Description 243634 | 0..1 243636 | Description 243638 |
| | | | TransportIn-formation 243640 | | | | TransportationTerms 243642 | | 0..1 243644 | … |

FIG. 243-20

| Packages | | | | level1 | level2 | level3 | level4 | level5 | Cardinality | Datatype Name |
|---|---|---|---|---|---|---|---|---|---|---|
| | | | | | | | | Transport-Ser-viceLevel-Code 243646 | 0..1 243648 | TransportSer-viceLevel-Code 243650 |
| | | | | | | | | Trans-portMode-Code 243652 | 1 243654 | Transport-ModeCode 243656 |
| | | | | | | | | Trans-portMeans 243658 | 1 243660 | Transport-Means 243662 |
| | | | | | | | | Description 243664 | 1 243666 | Description 243668 |
| | | | ProductIn-formation 243670 | | | | Product 243672 | | 1 243674 | Business-Transaction-Document-Product 243676 |
| | | | | | | | | InternalID 243678 | 1 243680 | ProductInter-nalID 243682 |

FIG. 243-21

| Packages | | | | level1 | level2 | level3 | level4 | level5 | Cardinality | Datatype Name |
|---|---|---|---|---|---|---|---|---|---|---|
| | | | | | | | | Description 243684 | 0..1 243686 | Note 243688 |
| | | | | | | | Batch 243690 | | 0..1 243692 | … |
| | | | | | | | | ID 243694 | 0..1 243696 | BatchID 243698 |
| | | | Description 243700 | | | | Descrip-tion 243702 | | 0..1 243704 | … |
| | | | | | | | | TextCollec-tion 243706 | 1..n 243708 | |
| | | | Attachment 243710 | | | | Attach-ment 243712 | | 0..1 243714 | … |
| | | | | | | | | Attachment 243716 | 1..n 243718 | |

| Package | level1 | level2 | level3 | level4 | level5 | Cardinality | Datatype Name |
|---|---|---|---|---|---|---|---|
| EmployeeTimeConfirmationViewOfProjectNotification 247000 | EmployeeTimeConfirmationViewOfProjectNotification 247002 | | | | | | EmployeeTimeConfirmationViewOfProjectNotificationMessage 247004 |
| MessageHeader 247006 | | Message Header 247008 | | | | 1 247010 | BusinessDocumentMessageHeader 247012 |

FIG. 247-2

| Package | | level1 | level2 | level3 | level4 | level5 | Cardinality | Datatype Name |
|---|---|---|---|---|---|---|---|---|
| | | | | ID 247014 | | | 1 247016 | Business Docu-mentMes sageID 247018 |
| | | | | Creation-DateTime 247020 | | | 1 247022 | DateTime 247024 |
| | | | | Sender-Party 247026 | | | 1 247028 | Business Docu-mentMes sage-Header-Party 247030 |

FIG. 247-3

| Package | | level1 | level2 | level3 | level4 | level5 | Cardinality | Datatype Name |
|---|---|---|---|---|---|---|---|---|
| | | | | Recipient-Party 247032 | | | 1 247034 | BusinessDocumentMessage-Header-Party 247036 |
| | | | | ReconciliationMessageIndicator 247038 | | | 1 247040 | Indicator 247042 |
| | Project 247044 | | Project 247046 | | | | 1 247048 | EmployeeTime-Confirmation-ViewOf-Project-NotificationProject 247050 |

FIG. 247-4

| Package | | level1 | level2 | level3 | level4 | level5 | Cardinality | Datatype Name |
|---|---|---|---|---|---|---|---|---|
| | | | | @actionCode 247052 | | | 1 247054 | ActionCode 247056 |
| | | | | @taskListCompleteTransmissionIndicator 247058 | | | 1 247060 | Indicator 247062 |
| | | | | @reconciliationPeriodCounterValue 247064 | | | 1 247066 | CounterValue 247068 |
| | | | | UUID 247070 | | | 1 247072 | UUID 247074 |
| | | | | ID 247076 | | | 1 247078 | ProjectID 247080 |
| | | | | ResponsibleCostCentreID 247082 | | | 1 247084 | OrganisationalCentreID 247086 |

FIG. 247-5

| Package | | | | level1 | level2 | level3 | level4 | level5 | Cardinality | Datatype Name |
|---|---|---|---|---|---|---|---|---|---|---|
| | | | | | | LanguageCode 247088 | | | 1 247090 | Language-Code 247092 |
| | | Task 247094 | | | | Task 247096 | | | 0..n 247098 | EmployeeTime-Confirmation-ViewOf-Project-NotificationPro-jectTask 247100 |
| | | | | | | | @actionCode 247102 | | 1 247104 | Action-Code 247106 |
| | | | | | | | @taskServiceListCompleteTransmissionIndicator 247108 | | 1 247110 | Indicator 247112 |

FIG. 247-6

| Package | level1 | level2 | level3 | level4 | level5 | Cardinality | Datatype Name |
|---|---|---|---|---|---|---|---|
| | | | | UUID 247114 | | 1 247116 | UUID 247118 |
| | | | | ID 247120 | | 1 247122 | Projec-tElemen-tID 247124 |
| | | | | Responsi-bleEm-ployeeID 247126 | | 0..1 247128 | Party-InternalID 247130 |
| | | | | Planned-Period 247132 | | 1 247134 | UPPEROPEN_GLOBAL_DateTimePeriod 247136 |
| | | | | Confirma-tionEx-tendedAp-provalRe-quiredIndi-cator 247138 | | 1 247140 | Indicator 247142 |

FIG. 247-7

| Package | | | | level1 | level2 | level3 | level4 | level5 | Cardinality | Datatype Name |
|---|---|---|---|---|---|---|---|---|---|---|
| | | | | | | | Confirma-tionAllow-edIndicator 247144 | | 1 247146 | Indicator 247148 |
| | | | | | | | TaskName 247150 | | 0..n 247152 | EmployeeTime-Confir-mation-ViewOf-Project-Notifica-tionPro-jectTask Name 247154 |
| | | | | | | | | Name 247156 | 1 247158 | MEDIUM _Name 247160 |

FIG. 247-8

| Package | level1 | level2 | level3 | level4 | level5 | Cardinality | Datatype Name |
|---|---|---|---|---|---|---|---|
| | | | | TaskService 247162 | | 0..n 247164 | EmployeeTimeConfirmationViewOfProjectProjectTaskService 247166 |
| | | | | | @actionCode 247168 | 1 247170 | ActionCode 247172 |
| | | | | | UUID 247174 | 1 247176 | UUID 247178 |
| | | | | | ServiceProductID 247180 | 0..1 247182 | ProductID 247184 |
| | | | | | AssignedEmployeeID 247186 | 0..1 247188 | PartyInternalID 247190 |

FIG. 248-1

| Package | level1 | level2 | level3 | level4 | level5 | Cardinality | Datatype Name |
|---|---|---|---|---|---|---|---|
| ProjectTaskConfirmationNotifiactionMessage 248000 | ProjectTaskConfirmationNotificationMessage 248002 | | | | | | ProjectTaskConfirmationNotificationMessage 248004 |
| MessageHeader 248006 | | MessageHeader 248008 | | | | 1 248010 | BusinessDocumentMessageHeader 248012 |
| | | | ID 248014 | | | 1 248016 | BusinessDocumentMessageID 248018 |
| | | | CreationDateTime 248020 | | | 1 248022 | DateTime 248024 |

FIG. 248-2

| Package | | level1 | level2 | level3 | level4 | level5 | Cardinality | Datatype Name |
|---|---|---|---|---|---|---|---|---|
| | | | | SenderParty 248026 | | | 1 248028 | Business-Document-Message-Header-Party 248030 |
| | | | | RecipientParty 248032 | | | 1 248034 | Business-Document-Message-Header-Party 248036 |
| | | | | Reconcilia-tionMessage-Indicator 248038 | | | 1 248040 | Indicator 248042 |
| | Project 248044 | | Project 248046 | | | | 1 248048 | ProjectTask Confirma-tionNotifica-tionProject 248050 |

FIG. 248-3

| Package | level1 | level2 | level3 | level4 | level5 | Cardinality | Datatype Name |
|---|---|---|---|---|---|---|---|
| | | | @reconciliationPeriodCounterValue 248052 | | | 1 248054 | CounterValue 248056 |
| | | | ID 248064 | | | 0..1 248066 | ProjectID 248068 |
| Task 248070 | | | Task 248072 | | | 0..n 248074 | ProjectTaskConfirmationNotificationProjectTask 248076 |
| | | | | @taskServiceConfirmationListCompleteTransmissionIndicator 248078 | | 1 248080 | Indicator 248082 |

FIG. 248-4

| Package | | | level1 | level2 | level3 | level4 | level5 | Cardinality | Datatype Name |
|---|---|---|---|---|---|---|---|---|---|
| | | | | | | ID 248090 | | 0..1 248092 | ProjectElementID 248094 |
| | | | | | | TaskServiceConfirmation 248096 | | 0..n 248098 | ProjectTaskConfirmationNotificationProjectTaskServiceConfirmation 248100 |
| | | | | | | | ServiceProductID 248102 | 0..1 248104 | ProductID 248106 |
| | | | | | | | AssignedEmployeeID 248108 | 0..1 248110 | PartyInternalID 248112 |

FIG. 248-5

| Package | | | level1 | level2 | level3 | level4 | level5 | Cardinality | Datatype Name |
|---|---|---|---|---|---|---|---|---|---|
| | | | | | | | EmployeeTime-CalendarPerio-dItemID 248114 | 1 248116 | Business-Transac-tionDocu-mentID 248118 |
| | | | | | | | Confirma-tionPeriod 248120 | 0..1 248122 | UPPEROPEN_GLOBAL_DateTime Period 248124 |
| | | | | | | | Confirmed WorkQuantity 248126 | 0..1 248128 | Quantity 248130 |
| | | | | | | | Confirmed WorkQuanti-tyTypeCode 248132 | 0..1 248134 | Quanti-tyTypeCode 248136 |

FIG. 248-6

| Package | | | level1 | level2 | level3 | level4 | level5 | Cardinality | Datatype Name |
|---|---|---|---|---|---|---|---|---|---|
| | | | | | | | Can-celledIn-dicator 248138 | 1 248140 | Indicator 248142 |
| | | | | | | | Complet-edIndica-tor 248144 | 1 248146 | Indicator 248148 |

| Package | level1 | level2 | level3 | level4 | level5 | level6 | level7 | Cardinality | Datatype Name |
|---|---|---|---|---|---|---|---|---|---|
| PurchaseOrder-Message 251000 | FormPur-chaseOr-derMes-sage 251002 | | | | | | | | FormPur-chaseOr-derMes-sage 251004 |
| Message-Header 251006 | | Mes-sageHea der 251008 | | | | | | 1 251010 | Business-Docu-mentMes-sage-Header 251012 |
| | | | Mes-sageID 251014 | | | | | 1 251016 | Business-Docu-mentMes-sageID 251018 |
| | | | Referen-ceID 251020 | | | | | 0..1 251022 | Business-Docu-mentMes-sageID 251024 |

FIG. 251-2

| Package | level1 | level2 | level3 | level4 | level5 | level6 | level7 | Cardinality | Datatype Name |
|---|---|---|---|---|---|---|---|---|---|
| | | | Creation-DateTime 251026 | | | | | 1 251028 | DateTime 251030 |
| | | | Sender-Party 251032 | | | | | 0..1 251034 | Business-Docu-mentMes-sageHead-erParty 251036 |
| | | | | InternalID 251038 | | | | 0..1 251040 | PartyInter-nalID 251042 |
| | | | | Stan-dardID 251044 | | | | 0..n 251046 | PartyStan-dardID 251048 |
| | | | | Contact-Person 251050 | | | | 0..1 251052 | Contact-Person 251054 |

FIG. 251-3

| Package | level1 | level2 | level3 | level4 | level5 | level6 | level7 | Cardinality | Datatype Name |
|---|---|---|---|---|---|---|---|---|---|
| | | | | | BuyerID 251056 | | | 0..1 251058 | Contact-Person-PartyID 251060 |
| | | | | | SellerID 251062 | | | 0..1 251064 | Contact-Person-PartyID 251066 |
| | | | | | Address 251068 | | | 0..1 251070 | Address 251072 |
| | | | Recipi-entParty 251074 | | | | | 0..n 251076 | Business-Docu-mentMes-sageHead-erParty 251078 |
| PurchaseOr-der 251080 | | Pur-chaseOr-der 251082 | | | | | | 1 251084 | FormPur-chaseOrder 251086 |

FIG. 251-4

| Package | level1 | level2 | level3 | level4 | level5 | level6 | level7 | Cardinality | Datatype Name |
|---|---|---|---|---|---|---|---|---|---|
| | | | ID 251088 | | | | | 1 251090 | Business-Transac-tionDocu-mentID 251092 |
| | | | SellerID 251094 | | | | | 0..1 251096 | Business-Transac-tionDocu-mentID 251098 |
| | | | Attrib-ute:recon ciliation-Period-Counter-Value 251100 | | | | | 0..1 251102 | Counter-Value 251104 |
| | | | Buyer-Posting-DateTime 251106 | | | | | 0..1 251108 | GLOBAL_D ateTime 251110 |

FIG. 251-5

| Package | level1 | level2 | level3 | level4 | level5 | level6 | level7 | Cardinality | Datatype Name |
|---|---|---|---|---|---|---|---|---|---|
| | | | Buyer-Last-Change-DateTime 251112 | | | | | 0..1 251114 | GLOBAL_DateTime 251116 |
| | | | Seller-Posting-DateTime 251118 | | | | | 0..1 251120 | GLOBAL_DateTime 251122 |
| | | | Seller-Last-Change-DateTime 251124 | | | | | 0..1 251126 | GLOBAL_DateTime 251128 |
| | | | Accep-tanceS-tatus-Code 251130 | | | | | 0..1 251132 | Accep-tanceS-tatusCode 251134 |
| | | | Note 251136 | | | | | 0..1 251138 | Note 251140 |

FIG. 251-6

| Package | level1 | level2 | level3 | level4 | level5 | level6 | level7 | Cardinality | Datatype Name |
|---|---|---|---|---|---|---|---|---|---|
| | | | Name 251142 | | | | | 0..1 251144 | MEDIUM_ Name 251146 |
| | | | ItemList-Complete Trans-mission-Indicator 251148 | | | | | 0..1 251150 | Indicator 251152 |
| Party 251154 | | | Buyer-Party 251156 | | | | | 0..1 251158 | FormBusi-nessTrans-action-Document-Party 251160 |
| | | | | Stan-dardID 251162 | | | | 0..n 251164 | PartyStan-dardID 251166 |
| | | | | BuyerID 251168 | | | | 0..1 251170 | Party-PartyID 251172 |

FIG. 251-7

| Package | level1 | level2 | level3 | level4 | level5 | level6 | level7 | Cardinality | Datatype Name |
|---|---|---|---|---|---|---|---|---|---|
| | | | | SellerID 251174 | | | | 0..1 251176 | Party-PartyID 251178 |
| | | | | Address 251180 | | | | 0..1 251182 | Address 251184 |
| | | | | Formatte-dAdress 251188 | | | | 0..1 251190 | Formatte-dAddress 251192 |
| | | | | Contact-Person 251194 | | | | 0..1 251196 | FormCon-tactPerson 251198 |
| | | | | | BuyerID 251200 | | | 0..1 251202 | Contact-Person-PartyID 251204 |
| | | | | | SellerID 251206 | | | 0..1 251208 | Contact-Person-PartyID 251210 |

FIG. 251-8

| Package | level1 | level2 | level3 | level4 | level5 | level6 | level7 | Cardinality | Datatype Name |
|---|---|---|---|---|---|---|---|---|---|
| | | | | | Address 251212 | | | 0..1 251214 | Address 251216 |
| | | | | | Formatte-dAdress 251220 | | | 0..1 251222 | Formatte-dAddress 251224 |
| | | | Seller-Party 251226 | | | | | 0..1 251228 | FormBusi-nessTrans-action-Document-Party 251230 |
| | | | Produc-tRecipi-entParty 251232 | | | | | 0..1 251234 | FormBusi-nessTrans-action-Document-Party 251236 |

FIG. 251-9

| Package | level1 | level2 | level3 | level4 | level5 | level6 | level7 | Cardinality | Datatype Name |
|---|---|---|---|---|---|---|---|---|---|
| | | | Vendor-Party 251238 | | | | | 0..1 251240 | FormBusinessTransaction-Document-Party 251242 |
| | | | Service-Per-former-Party 251244 | | | | | 0..1 251246 | FormBusinessTransaction-Document-Party 251248 |
| | | | Manufac-turer-Party 251250 | | | | | 0..1 251252 | FormBusinessTransaction-Document-Party 251254 |

FIG. 251-10

| Package | level1 | level2 | level3 | level4 | level5 | level6 | level7 | Cardinality | Datatype Name |
|---|---|---|---|---|---|---|---|---|---|
| | | | BillTo-Party 251256 | | | | | 0..1 251258 | FormBusinessTransaction-Document-Party 251260 |
| | | | Payer-Party 251262 | | | | | 0..1 251264 | FormBusinessTransaction-Document-Party 251266 |
| | | | Carrier-Party 251268 | | | | | 0..1 251270 | FormBusinessTransaction-Document-Party 251272 |

FIG. 251-11

| Package | level1 | level2 | level3 | level4 | level5 | level6 | level7 | Cardinality | Datatype Name |
|---|---|---|---|---|---|---|---|---|---|
| Location 251274 | | | Ship-ToLoca-tion 251276 | | | | | 0..1 251278 | FormBusi-nessTrans-action-Document-ShipToLo-cation 251280 |
| | | | | Stan-dardID 251282 | | | | 0..n 251284 | Location-StandardID 251286 |
| | | | | BuyerID 251288 | | | | 0..1 251290 | Location-PartyID 251292 |
| | | | | SellerID 251294 | | | | 0..1 251296 | Location-PartyID 251298 |
| | | | | Address 251300 | | | | 0..1 251302 | Address 251304 |

FIG. 251-12

| Package | level1 | level2 | level3 | level4 | level5 | level6 | level7 | Cardinality | Datatype Name |
|---|---|---|---|---|---|---|---|---|---|
| | | | | Formatte-dAdress 251308 | | | | 0..1 251310 | Formatte-dAddress 251312 |
| | | | Ship-FromLo-cation 251314 | | | | | 0..1 251316 | FormBusi-nessTrans-action-Document-ShipFrom-Location 251318 |
| DeliveryIn-formation 251320 | | | Delivery-Terms 251322 | | | | | 0..1 251324 | FormDeliv-eryTerms 251326 |
| | | | | Delivery-Item-GroupID 251328 | | | | 0..1 251330 | Business-Transac-tionDocu-mentItem-GroupID 251332 |

FIG. 251-13

| Package | level1 | level2 | level3 | level4 | level5 | level6 | level7 | Cardinality | Datatype Name |
|---|---|---|---|---|---|---|---|---|---|
| | | | | Deliv-eryPriori-tyCode 251334 | | | | 0..1 251336 | Business-Transac-tionPriori-tyCode 251338 |
| | | | | Deliv-eryPriori-tyCode-Name 251342 | | | | 0..1 251344 | Name 251346 |
| | | | | Incoterms 251348 | | | | 0..1 251350 | FormInco-terms 251352 |
| | | | | | Classifica-tionCode 251354 | | | 1 251356 | |
| | | | | | Classifica-tionCode-Name 251360 | | | 1 251362 | Name 251364 |

FIG. 251-14

| Package | level1 | level2 | level3 | level4 | level5 | level6 | level7 | Cardinality | Datatype Name |
|---|---|---|---|---|---|---|---|---|---|
| | | | | | Transfer-Location-Name 251366 | | | 0..1 251368 | |
| | | | | PartialDe-livery 251370 | | | | 0..1 251372 | PartialDe-livery 251374 |
| | | | | | Maximal-Number 251376 | | | 0..1 251378 | |
| | | | | | Unlimit-edIndica-tor 251380 | | | 0..1 251382 | Indicator 251384 |
| | | | | Quantity-Tolerance 251386 | | | | 0..1 251388 | Quantity-Tolerance 251390 |
| | | | | | OverPer-cent 251392 | | | 0..1 251394 | Percent 251396 |

FIG. 251-15

| Package | level1 | level2 | level3 | level4 | level5 | level6 | level7 | Cardinality | Datatype Name |
|---|---|---|---|---|---|---|---|---|---|
| | | | | | OverPercent UnlimitedIndicator 251398 | | | 0..1 251400 | Indicator 251402 |
| | | | | | UnderPercent 251404 | | | 0..1 251406 | Percent 251408 |
| | | | | Maximum LeadTimeDuration 251410 | | | | 0..1 251412 | Duration 251414 |
| | | | | Transport 251416 | | | | 0..1 251418 | |

FIG. 251-16

| Package | level1 | level2 | level3 | level4 | level5 | level6 | level7 | Cardinality | Datatype Name |
|---|---|---|---|---|---|---|---|---|---|
| | | | | | Ser-viceLevel-Code 251420 | | | 0..1 251422 | Transport-Ser-viceLevel-Code 251424 |
| | | | | | ModeCode 251426 | | | 0..1 251428 | Transport-ModeCode 251430 |
| | | | | | MeansDe-scription-Code 251432 | | | 0..1 251434 | Transport-MeansDe-scription-Code 251436 |
| | | | | Descrip-tion 251438 | | | | 0..1 251440 | Description 251442 |
| | | | | | language-Code 251444 | | | 1 251446 | |

FIG. 251-17

| Package | level1 | level2 | level3 | level4 | level5 | level6 | level7 | Cardinality | Datatype Name |
|---|---|---|---|---|---|---|---|---|---|
| PaymentIn-formation 251448 | | | CashDis-count-Terms 251450 | | | | | 0..1 251452 | CashDis-countTerms 251454 |
| | | | | Pay-mentBase LineDate 251456 | | | | 0..1 251458 | Date 251460 |
| | | | | Maximum CashDis-count 251462 | | | | 0..1 251464 | CashDis-count 251466 |
| | | | | | DaysValue 251468 | | | 1 251470 | |
| | | | | | Percent 251472 | | | 1 251474 | Percent 251476 |

FIG. 251-18

| Package | level1 | level2 | level3 | level4 | level5 | level6 | level7 | Cardinality | Datatype Name |
|---|---|---|---|---|---|---|---|---|---|
| | | | | Normal-CashDis-count 251478 | | | | 0..1 251480 | CashDis-count 251482 |
| | | | | | DaysValue 251484 | | | 1 251486 | |
| | | | | | Percent 251488 | | | 1 251490 | Percent 251492 |
| | | | | FullPay-ment-DueDays-Value 251494 | | | | 0..1 251496 | |
| | | | Pay-mentFor m 251498 | | | | | 0..1 251500 | |
| | | | | Code 251502 | | | | 1 251504 | Payment-FormCode 251506 |

FIG. 251-19

| Package | level1 | level2 | level3 | level4 | level5 | level6 | level7 | Cardinality | Datatype Name |
|---|---|---|---|---|---|---|---|---|---|
| | | | | Pay-mentCard 251508 | | | | 0..1 251510 | Payment-Card 251512 |
| | | | | | ID 251514 | | | 1 251516 | Payment-CardID 251518 |
| | | | | | Referen-ceID 251520 | | | 0..1 251522 | |
| | | | | | Sequen-ceID 251524 | | | 0..1 251526 | |
| | | | | | Holder 251528 | | | 0..1 251530 | |
| | | | | | Expira-tionDate 251532 | | | 1 251534 | Date 251536 |

FIG. 251-20

| Package | level1 | level2 | level3 | level4 | level5 | level6 | level7 | Cardinality | Datatype Name |
|---|---|---|---|---|---|---|---|---|---|
| PriceInfor-mation 251538 | | | Price 251540 | | | | | 0..1 251542 | |
| | | | | NetA-mount 251544 | | | | 0..1 251546 | Amount 251548 |
| | | | | | currency-Code 251550 | | | 1 251552 | |
| Attachment 251554 | | | Attach-ment-Folder 251556 | | | | | 0..1 251558 | Attach-mentFolder 251560 |
| Description 251562 | | | TextFold er 251564 | | | | | 0..1 251566 | TextFolder 251568 |

FIG. 251-21

| Package | level1 | level2 | level3 | level4 | level5 | level6 | level7 | Cardinality | Datatype Name |
|---|---|---|---|---|---|---|---|---|---|
| FollowUp-Message 251570 | | | Follow-UpPur-chase Order-Confir-mation 251572 | | | | | 0..1 251574 | |
| | | | | Require-ment-Code 251576 | | | | 1 251578 | FollowUp-Mes-sageRe-quirement-Code 251580 |
| | | | | Require-ment-Code-Name 251584 | | | | 1 251586 | Name 251588 |

FIG. 251-22

| Package | level1 | level2 | level3 | level4 | level5 | level6 | level7 | Cardinality | Datatype Name |
|---|---|---|---|---|---|---|---|---|---|
| | | | FollowUp Despatched DeliveryNotification 251590 | | | | | 0..1 251592 | |
| | | | | RequirementCode 251594 | | | | 1 251596 | FollowUpMessageRequirementCode 251598 |
| | | | | RequirementCodeName 251602 | | | | 1 251604 | Name 251606 |

FIG. 251-23

| Package | level1 | level2 | level3 | level4 | level5 | level6 | level7 | Cardinality | Datatype Name |
|---|---|---|---|---|---|---|---|---|---|
| | | | FollowUpServiceAcknowledgementRequest 251608 | | | | | 0..1 251610 | |
| | | | | RequirementCode 251612 | | | | 1 251614 | FollowUpMessageRequirementCode 251616 |
| | | | | RequirementCodeName 251620 | | | | 1 251622 | Name 251624 |

FIG. 251-24

| Package | level1 | level2 | level3 | level4 | level5 | level6 | level7 | Cardinality | Datatype Name |
|---|---|---|---|---|---|---|---|---|---|
| | | | Follow-UpIn-voiceRe-quest 251626 | | | | | 0..1 251628 | |
| | | | | Require-ment-Code 251630 | | | | 1 251632 | FollowUp-Mes-sageRe-quirement-Code 251634 |
| | | | | Require-ment-Code-Name 251638 | | | | 1 251640 | Name 251642 |
| | | | | Evaluat-edReceipt Settle-mentIndi-cator 251644 | | | | 0..1 251646 | Indicator 251648 |

FIG. 251-25

| Package | level1 | level2 | level3 | level4 | level5 | level6 | level7 | Cardinality | Datatype Name |
|---|---|---|---|---|---|---|---|---|---|
| Item 251650 | | | Item 251652 | | | | | 0..n 251654 | FormPurchaseOrderItem 251656 |
| | | | | ID 251658 | | | | 0..1 251660 | BusinessTransactionDocumentItemID 251662 |
| | | | | SellerID 251664 | | | | 0..1 251666 | BusinessTransactionDocumentItemID 251668 |
| | | | | ActionCode 251670 | | | | 1 251672 | ActionCode 251674 |
| | | | | ActionCodeName 251678 | | | | 1 251680 | Name 251682 |

FIG. 251-26

| Package | level1 | level2 | level3 | level4 | level5 | level6 | level7 | Cardinality | Datatype Name |
|---|---|---|---|---|---|---|---|---|---|
| | | | | Accep-tanceS-tatusCode 251684 | | | | 0..1 251686 | Accep-tanceS-tatusCode 251688 |
| | | | | Un-planned-Item Permis-sionCode 251690 | | | | 0..1 251692 | Unplanned-ItemPer-mission-Code 251694 |
| | | | | Un-planned-Item Permis-sion-CodeNam e 251698 | | | | 0..1 251700 | Name 251702 |

FIG. 251-27

| Package | level1 | level2 | level3 | level4 | level5 | level6 | level7 | Cardinality | Datatype Name |
|---|---|---|---|---|---|---|---|---|---|
| | | | | Uncon-firmed-Quantity-Can-celedIndi-cator 251704 | | | | 0..1 251706 | Indicator 251708 |
| | | | | Hierar-chyRela-tionship 251710 | | | | 0..1 251712 | |
| | | | | | Paren-tItemID 251714 | | | 0..1 251716 | Business-Transac-tionDocu-mentItemID 251718 |
| | | | | | ParentItem SellerID 251720 | | | 0..1 251722 | Business-Transac-tionDocu-mentItemID 251724 |

FIG. 251-28

| Package | level1 | level2 | level3 | level4 | level5 | level6 | level7 | Cardinality | Datatype Name |
|---|---|---|---|---|---|---|---|---|---|
| | | | | | TypeCode 251726 | | | 1 251728 | BusinessTransactionDocumentItemHierarchyRelationshipTypeCode 251730 |
| ProductInformation 251732 | | | | Product 251734 | | | | 0..1 251736 | FormBusinessTransactionDocumentProduct 251738 |
| | | | | | StandardID 251740 | | | 0..n 251742 | ProductStandardID 251744 |
| | | | | | BuyerID 251746 | | | 0..1 251748 | ProductPartyID 251750 |

FIG. 251-29

| Package | level1 | level2 | level3 | level4 | level5 | level6 | level7 | Cardinality | Datatype Name |
|---|---|---|---|---|---|---|---|---|---|
| | | | | | SellerID 251752 | | | 0..1 251754 | Product-PartyID 251756 |
| | | | | | Manufac-turerID 251758 | | | 0..1 251760 | Product-PartyID 251762 |
| | | | | | TypeCode 251764 | | | 0..1 251766 | Pro-ductType-Code 251768 |
| | | | | | TypeCode Name 251772 | | | 0..1 251774 | Name 251776 |
| | | | | | Note 251778 | | | 0..1 251780 | Note 251782 |

FIG. 251-30

| Package | level1 | level2 | level3 | level4 | level5 | level6 | level7 | Cardinality | Datatype Name |
|---|---|---|---|---|---|---|---|---|---|
| | | | | ProductCategory 251784 | | | | 0..1 251786 | FormBusinessTransactionDocumentProductCategory 251788 |
| | | | | | StandardID 251790 | | | 0..n 251792 | ProductCategoryStandardID 251794 |
| | | | | | BuyerID 251796 | | | 0..1 251798 | ProductCategoryPartyID 251800 |
| | | | | | SellerID 251802 | | | 0..1 251804 | ProductCategoryPartyID 251806 |

FIG. 251-31

| Package | level1 | level2 | level3 | level4 | level5 | level6 | level7 | Cardinality | Datatype Name |
|---|---|---|---|---|---|---|---|---|---|
| | | | | | Descrip-tion 251810 | | | 0..1 251812 | Description 251814 |
| PriceIn-formation 251816 | | | | Price 251818 | | | | 0..1 251820 | |
| | | | | | NetA-mount 251822 | | | 0..1 251824 | Amount 251826 |
| | | | | | | currency-Code 251828 | | 1 251830 | |
| | | | | | NetUnit-Price 251832 | | | 0..1 251834 | FormPrice 251836 |
| | | | | | | Amount 251838 | | 1 251840 | Amount 251842 |

FIG. 251-32

| Package | level1 | level2 | level3 | level4 | level5 | level6 | level7 | Cardinality | Datatype Name |
|---|---|---|---|---|---|---|---|---|---|
| | | | | | | | currency-Code 251844 | 1 251846 | |
| | | | | | | Base-Quantity 251848 | | 1 251850 | Quantity 251852 |
| | | | | | | | unitCode 251854 | 1 251856 | |
| | | | | | | Base-Quanti-tyMeas-ureUnit-Code-Name 251860 | | 1 251862 | Name 251864 |
| | | | | Con-firmed-Price 251866 | | | | 0..1 251868 | |

FIG. 251-33

| Package | level1 | level2 | level3 | level4 | level5 | level6 | level7 | Cardinality | Datatype Name |
|---|---|---|---|---|---|---|---|---|---|
| | | | | | NetUnit-Price 251870 | | | 0..1 251872 | FormPrice 251874 |
| | | | | | | Amount 251876 | | 1 251878 | Amount 251880 |
| | | | | | | | currency-Code 251882 | 1 251884 | |
| | | | | | | Base-Quantity 251886 | | 1 251888 | Quantity 251890 |
| | | | | | | | unitCode 251892 | 1 251894 | |
| | | | | | | Base-Quanti-tyMeas-ureUnit-Code-Name 251898 | | 1 251900 | Name 251902 |

FIG. 251-34

| Package | level1 | level2 | level3 | level4 | level5 | level6 | level7 | Cardinality | Datatype Name |
|---|---|---|---|---|---|---|---|---|---|
| Party 251904 | | | | Buyer-Party 251906 | | | | 0..1 251908 | FormBusinessTransaction-Document-Party 251910 |
| | | | | Seller-Party 251912 | | | | 0..1 251914 | FormBusinessTransaction-Document-Party 251916 |
| | | | | ProductRecipientParty 251918 | | | | 0..1 251920 | FormBusinessTransaction-Document-Party 251922 |

FIG. 251-35

| Package | level1 | level2 | level3 | level4 | level5 | level6 | level7 | Cardinality | Datatype Name |
|---|---|---|---|---|---|---|---|---|---|
| | | | | Vendor-Party 251924 | | | | 0..1 251926 | FormBusinessTransaction-Document-Party 251928 |
| | | | | Service-Performer Party 251930 | | | | 0..1 251932 | FormBusinessTransaction-Document-Party 251934 |
| | | | | ManufacturerParty 251936 | | | | 0..1 251938 | FormBusinessTransaction-Document-Party 251940 |

FIG. 251-36

| Package | level1 | level2 | level3 | level4 | level5 | level6 | level7 | Cardinality | Datatype Name |
|---|---|---|---|---|---|---|---|---|---|
| | | | | BillTo-Party 251942 | | | | 0..1 251944 | FormBusinessTransaction-Document-Party 251946 |
| | | | | Payer-Party 251948 | | | | 0..1 251950 | FormBusinessTransaction-Document-Party 251952 |
| | | | | Carrier-Party 251954 | | | | 0..1 251956 | FormBusinessTransaction-Document-Party 251958 |

FIG. 251-37

| Package | level1 | level2 | level3 | level4 | level5 | level6 | level7 | Cardinality | Datatype Name |
|---|---|---|---|---|---|---|---|---|---|
| Location 251960 | | | | ShipToLocation 251962 | | | | 0..1 251964 | FormBusinessTransactionDocumentShipToLocation 251966 |
| | | | | ShipFromLocation 251968 | | | | 0..1 251970 | FormBusinessTransactionDocumentShipFromLocation 251972 |
| DeliveryInformation 251974 | | | | DeliveryTerms 251976 | | | | 0..1 251978 | FormDeliveryTerms 251980 |

FIG. 251-38

| Package | level1 | level2 | level3 | level4 | level5 | level6 | level7 | Cardinality | Datatype Name |
|---|---|---|---|---|---|---|---|---|---|
| BusinessTransactionDocumentReference 251982 | | | | QuoteReference 251984 | | | | 0..1 251986 | BusinessTransactionDocumentReference 251988 |
| | | | | | ID 251990 | | | 1 251992 | BusinessTransactionDocumentID 251994 |
| | | | | | ItemID 251996 | | | 0..n 251998 | BusinessTransactionDocumentItemID 2511000 |

FIG. 251-39

| Package | level1 | level2 | level3 | level4 | level5 | level6 | level7 | Cardinality | Datatype Name |
|---|---|---|---|---|---|---|---|---|---|
| | | | | Pur-chaseContractReference 2511002 | | | | 0..n 2511004 | Business-Transac-tionDocu-mentRefer-ence 2511006 |
| | | | | | ID 2511008 | | | 1 2511010 | Business-Transac-tionDocu-mentID 2511012 |
| | | | | | ItemID 2511014 | | | 0..n 2511016 | Business-Transac-tionDocu-mentItemID 2511018 |
| | | | | SalesContractReference 2511020 | | | | 0..n 2511022 | Business-Transac-tionDocu-mentRefer-ence 2511024 |

FIG. 251-40

| Package | level1 | level2 | level3 | level4 | level5 | level6 | level7 | Cardinality | Datatype Name |
|---|---|---|---|---|---|---|---|---|---|
| | | | | | ID 2511026 | | | 1 2511028 | Business-Transac-tionDocu-mentID 2511030 |
| | | | | | ItemID 2511032 | | | 0..n 2511034 | Business-Transac-tionDocu-mentItemID 2511036 |
| | | | | OriginPur-chaseOr-der Refer-ence 2511038 | | | | 0..1 2511040 | Business-Transac-tionDocu-mentRefer-ence 2511042 |
| | | | | | ID 2511044 | | | 1 2511046 | Business-Transac-tionDocu-mentID 2511048 |

FIG. 251-41

| Package | level1 | level2 | level3 | level4 | level5 | level6 | level7 | Cardinality | Datatype Name |
|---|---|---|---|---|---|---|---|---|---|
| | | | | | ItemID 2511050 | | | 0..n 2511052 | Business-Transac-tionDocu-mentItemID 2511054 |
| | | | | Buyer-ProductC atalogue Refer-ence 2511056 | | | | 0..1 2511058 | Cata-logueRefer-ence 2511060 |
| | | | | | ID 2511062 | | | 1 2511064 | Cata-logueID 2511066 |
| | | | | | ItemID 2511068 | | | 0..n 2511070 | Cata-logueItemI D 2511072 |

FIG. 251-42

| Package | level1 | level2 | level3 | level4 | level5 | level6 | level7 | Cardinality | Datatype Name |
|---|---|---|---|---|---|---|---|---|---|
| | | | | Seller-ProductCatalogue Reference 2511074 | | | | 0..1 2511076 | Catalogue Reference 2511078 |
| | | | | | ID 2511080 | | | 1 2511082 | CatalogueID 2511084 |
| | | | | | ItemID 2511086 | | | 0..n 2511088 | CatalogueItemID 2511090 |
| Attachment 2511092 | | | | Attachment-Folder 2511094 | | | | 0..n 2511096 | AttachmentFolder 2511098 |
| Description 2511100 | | | | Description 2511102 | | | | 0..1 2511104 | Description 2511106 |

FIG. 251-43

| Package | level1 | level2 | level3 | level4 | level5 | level6 | level7 | Cardinality | Datatype Name |
|---|---|---|---|---|---|---|---|---|---|
| | | | | TextCol-lection 2511108 | | | | 0..1 2511110 | TextCollec-tion 2511112 |
| Follow-UpMes-sage 2511114 | | | | Follow-UpPur-chase Order-Confirma-tion 2511116 | | | | 0..1 2511118 | |
| | | | | | Require-mentCode 2511120 | | | 1 2511122 | FollowUp-Mes-sageRe-quirement-Code 2511124 |
| | | | | | Require-ment-CodeNamr 2511128 | | | 1 2511130 | Name 2511132 |

FIG. 251-44

| Package | level1 | level2 | level3 | level4 | level5 | level6 | level7 | Cardinality | Datatype Name |
|---|---|---|---|---|---|---|---|---|---|
| | | | | Follow-UpDes-patched Deliv-eryNotifi-cation 2511134 | | | | 0..1 2511136 | |
| | | | | | Require-mentCode 2511138 | | | 1 2511140 | FollowUp-Mes-sageRe-quirement-Code 2511142 |
| | | | | | Require-mentCode Name 2511146 | | | 1 2511148 | Name 2511150 |

FIG. 251-45

| Package | level1 | level2 | level3 | level4 | level5 | level6 | level7 | Cardinality | Datatype Name |
|---|---|---|---|---|---|---|---|---|---|
| | | | | FollowUpServiceAcknowledgementRequest 2511152 | | | | 0..1 2511154 | |
| | | | | | RequirementCode 2511156 | | | 1 2511158 | FollowUpMessageRequirementCode 2511160 |
| | | | | | RequirementCode Name 2511164 | | | 1 2511166 | Name 2511168 |

FIG. 251-46

| Package | level1 | level2 | level3 | level4 | level5 | level6 | level7 | Cardinality | Datatype Name |
|---|---|---|---|---|---|---|---|---|---|
| | | | | FollowUpInvoiceRequest 2511170 | | | | 0..1 2511172 | |
| | | | | | RequirementCode 2511174 | | | 1 2511176 | FollowUpMessageRequirementCode 2511178 |
| | | | | | RequirementCode Name 2511182 | | | 1 2511184 | Name 2511186 |
| | | | | | EvaluatedReceipt SettlementIndicator 2511188 | | | 0..1 2511190 | Indicator 2511192 |

FIG. 251-47

| Package | level1 | level2 | level3 | level4 | level5 | level6 | level7 | Cardinality | Datatype Name |
|---|---|---|---|---|---|---|---|---|---|
| Sched-uleLine 2511194 | | | | Sched-uleLine 2511196 | | | | 0..n 2511198 | FormPur-chaseOrde-rItemSched uleLine 2511200 |
| | | | | | ID 2511202 | | | 0..1 2511204 | Business-Transac-tionDocu-mentItem-Sched-uleLineID 2511206 |
| | | | | | SellerID 2511208 | | | 0..1 2511210 | Business-Transac-tionDocu-mentItem-Sched-uleLineID 2511212 |

FIG. 251-48

| Package | level1 | level2 | level3 | level4 | level5 | level6 | level7 | Cardinality | Datatype Name |
|---|---|---|---|---|---|---|---|---|---|
| | | | | | Delivery-Period 2511214 | | | 1 2511216 | GLOBAL_DateTimePe-riod 2511218 |
| | | | | | | Start-DateTime 2511220 | | 0..1 2511222 | GLOBAL_DateTime 2511224 |
| | | | | | | End-DateTime 2511226 | | 0..1 2511228 | GLOBAL_DateTime 2511230 |
| | | | | | | Duration 2511232 | | 0..1 2511234 | Duration 2511236 |
| | | | | | Quantity 2511238 | | | 0..1 2511240 | Quantity 2511242 |

FIG. 251-49

| Package | level1 | level2 | level3 | level4 | level5 | level6 | level7 | Cardinality | Datatype Name |
|---|---|---|---|---|---|---|---|---|---|
| | | | | | Quantity-Measure-UnitCode-Name 2511246 | | | 0..1 2511248 | Name 2511250 |
| | | | | | Quanti-tyType-Code 2511252 | | | 0..1 2511254 | Quanti-tyType-Code 2511256 |
| | | | | | Quanti-tyType-Code-Name 2511260 | | | 0..1 2511262 | Name 2511264 |
| | | | | Con-firmed-Sched-uleLine 2511266 | | | | 0..n 2511268 | FormPur-chaseOrde-rItemSched uleLine 2511270 |

FIG. 252

| Package | level1 | level2 | level3 | Cardinality | Datatype Name |
|---|---|---|---|---|---|
| PurchaseOrder Cancellation-Message 252000 | PurchaseOrder CancellationMes-sage 252002 | | | | PurchaseOrderCancela-tion Message 252004 |
| Message-Header 252006 | | MessageHeader 252008 | | 1 252010 | BusinessDocument MessageHeader 252012 |
| Pur-chaseOrder Cancellation 252014 | | PurchaseOrder-Cancellation 252016 | | 1 252018 | PurchaseOrderCancela-tion 252020 |
| | | | ID 252022 | 1 252024 | BusinessTransaction DocumentID 252026 |
| | | | Reconciliation-PeriodCounter-Value 252030 | 0..1 252032 | ReconciliationPeriod-CounterValue 252034 |

FIG. 253-1

| Package | level1 | level2 | level3 | level4 | level5 | level6 | Cardinality | Datatype Name |
|---|---|---|---|---|---|---|---|---|
| PurchaseOrderDeliveryValues-NotificationMessage 253000 | PurchaseOr-derDelivery-ValuesNotifi-cationMes-sage 253002 | | | | | | | OrderDe-livery-Values-Notifica-tionMes-sage 253004 |
| MessageHeader 253006 | | Message Header 253008 | | | | | 0..1 253010 | Business Docu-mentMes sage-Header 253012 |
| PurchaseOrder 253014 | | Pur-chaseOr-der 253016 | | | | | 1 253018 | Pur-chaseOr-derDeliv-eryVal-uesNoti-fication 253020 |

FIG. 253-2

| Package | level1 | level2 | level3 | level4 | level5 | level6 | Cardinality | Datatype Name |
|---|---|---|---|---|---|---|---|---|
| | | | ID 253022 | | | | 1 253024 | BusinessTransactionDocumentID 253026 |
| | | | ReconciliationPeriodCounterValue 253030 | | | | 0..1 253032 | ReconciliationPeriodCounterValue 253034 |
| Item 253036 | | | Item 253038 | | | | 1..n 253040 | PurchaseOrderDeliveryValuesNotificationItem 253042 |

FIG. 253-3

| Package | level1 | level2 | level3 | level4 | level5 | level6 | Cardinality | Datatype Name |
|---|---|---|---|---|---|---|---|---|
| | | | | ID 253044 | | | 1 253046 | BusinessTransactionDocumentItemID 253048 |
| | | | | DeliveryCompletedIndicator 253066 | | | 0..1 253068 | Indicator 253070 |
| FulfillingDelivery 253072 | | | | FulfillingDelivery 253074 | | | 0..n 253076 | PurchaseOrderDelivereyValuesNotification-FulfillingDelivery 253078 |

FIG. 253-4

| Package | level1 | level2 | level3 | level4 | level5 | level6 | Cardinality | Datatype Name |
|---|---|---|---|---|---|---|---|---|
| | | | | | ID 253080 | | 1 253082 | Business Transac-tion-DocumentID 253084 |
| | | | | | Type-Code 253086 | | 0..1 253088 | Business Transac-tionDocu-ment-Type-Code 253090 |

FIG. 253-5

| Package | level1 | level2 | level3 | level4 | level5 | level6 | Cardinality | Datatype Name |
|---|---|---|---|---|---|---|---|---|
| FulfillingDeliveryItem 253092 | | | | | Item 253094 | | 1..n 253096 | PurchaseOrderDeliveryValuesNotification-FulfillingDeliveryItem 253098 |
| | | | | | | ID 253100 | 1 253102 | BusinessTransactionDocumentItemID 253104 |
| | | | | | | Quantity 253108 | 0..1 253110 | Quantity 253112 |

FIG. 253-6

| Package | level1 | level2 | level3 | level4 | level5 | level6 | Cardinality | Datatype Name |
|---|---|---|---|---|---|---|---|---|
| | | | | | | NetA-mount 253116 | 0..1 253118 | Amount 253120 |

FIG. 254-1

| Package | level1 | level2 | level3 | level4 | level5 | level6 | Cardinality | Datatype Name |
|---|---|---|---|---|---|---|---|---|
| PurchaseOrderInvoiceValuesNotificationMessage 254000 | PurchaseOrderInvoiceValuesNotificationMessage 254002 | | | | | | | PurchaseOrderInvoiceValuesNotificationMessage 254004 |
| Message Header 254006 | | Message Header 254008 | | | | | 0..1 254010 | BusinessDocumentMessageHeader 254012 |
| PurchaseOrder 254014 | | PurchaseOrder 254016 | | | | | 1 254018 | SupplierInvoiceRequestAcquiredValuesNotification 254020 |

FIG. 254-2

| | Package | | | | | level1 | level2 | level3 | level4 | level5 | level6 | Cardinality | Datatype Name |
|---|---|---|---|---|---|---|---|---|---|---|---|---|---|
| | | | | | | | | ID 254022 | | | | 1 254024 | BusinessTransactionDocumentID 254026 |
| | | | | | | | | UUID 254028 | | | | 0..1 254030 | UUID 254032 |
| | | | | | | | | BaseBusiness-TransactionDocument-Type-Code 254034 | | | | 0..1 254036 | BusinessTransactionDocument-Type-Code 254038 |

FIG. 254-3

| | Package | | | | | level1 | level2 | level3 | level4 | level5 | level6 | Cardinality | Datatype Name |
|---|---|---|---|---|---|---|---|---|---|---|---|---|---|
| | | | | | | | | Recon-ciliation-Period-Counter-Value 254040 | | | | 0..1 254042 | Counter-Value 254044 |
| | | Item 254046 | | | | | | Item 254048 | | | | 1..n 254050 | Supplier-In-voiceRe-questAc-quired-Values-Notifica-tionItem 254052 |
| | | | | | | | | | ID 254054 | | | 1 254056 | Business Transac-tionDocu-men-tItemID 254058 |

FIG. 254-4

| Package | | | level1 | level2 | level3 | level4 | level5 | level6 | Cardinality | Datatype Name |
|---|---|---|---|---|---|---|---|---|---|---|
| | | | | | | UUID 254060 | | | 0..1 254062 | |
| | | FulfillingSupplierInvoice 254064 | | | | Fulfill-ingSup-plierIn-voice 254066 | | | 0..n 254068 | SupplierInvoiceRequestAc-quired-Values-Notifica-tionItem-Fulfill-ingSup-plierIn-voice 254070 |
| | | | | | | | ID 254072 | | 1 254074 | Business Transac-tionDocu-mentID 254076 |
| | | | | | | | UUID 254078 | | 0..1 254080 | UUID 254082 |

FIG. 254-5

| | Package | | | | | level1 | level2 | level3 | level4 | level5 | level6 | Cardinality | Datatype Name |
|---|---|---|---|---|---|---|---|---|---|---|---|---|---|
| | | | | | | | | | | Type-Code 254084 | | 0..1 254086 | Business Transac-tion-DocumentType-Code 254088 |
| | | | | | | | | | | Date 254090 | | 1 254092 | Date 254094 |
| | | | | | | | | | | Cancella-tionDocu-mentIn-dicator 254096 | | 0..1 254098 | Indicator 254100 |

FIG. 254-6

| Package | | | level1 | level2 | level3 | level4 | level5 | level6 | Cardinality | Datatype Name |
|---|---|---|---|---|---|---|---|---|---|---|
| | | Fulfilling-SupplierIn-voiceItem 254102 | | | | | Item 254104 | | 1..n 254106 | SupplierInvoiceRequestAcquiredVal-uesNoti-ficatio-nItemFul-filling-Supplier-In-voiceItem 254108 |
| | | | | | | | | ID 254110 | 1 254112 | BusinessTransac-tion-DocumentItemID 254114 |
| | | | | | | | | UUID 254116 | 0..1 254118 | UUID 254120 |

FIG. 254-7

| | Package | | | | | level1 | level2 | level3 | level4 | level5 | level6 | Cardinality | Datatype Name |
|---|---|---|---|---|---|---|---|---|---|---|---|---|---|
| | | | | | | | | | | | Type-Code 254122 | 0..1 254124 | Business Transac-tion-DocumentItem-Type-Code 254126 |
| | | | | | | | | | | | ActiveIn-dicator 254128 | 1 254130 | Indicator 254132 |
| | | | | | | | | | | | Quantity 254134 | 0..1 254136 | Quantity 254138 |
| | | | | | | | | | | | Quanti-tyType-Code 254140 | 0..1 254142 | Quantity 254144 |
| | | | | | | | | | | | NetA-mount 254146 | 0..1 254148 | Amount 254150 |

FIG. 254-8

| | Package | | | | | level1 | level2 | level3 | level4 | level5 | level6 | Cardinality | Datatype Name |
|---|---|---|---|---|---|---|---|---|---|---|---|---|---|
| | | | | | BusinessDocumentObjectReference 254152 | | | | | | PurchaseOrderReference 254154 | 0..1 254156 | BusinessTransactionDocumentReference 254158 |

FIG. 255-1

| Package | level1 | level2 | level3 | level4 | level5 | level6 | Cardinality | Datatype Name |
|---|---|---|---|---|---|---|---|---|
| PurchaseOrderNotificationMessage 255000 | PurchaseOrderNotificationMessage 255002 | | | | | | | PurchaseOrderNotificationMessage 255004 |
| MessageHeader 255006 | | MessageHeader 255008 | | | | | 1 255010 | BusinessDocumentMessageHeader 255012 |
| PurchaseOrder 255014 | | PurchaseOrder 255016 | | | | | 1 255018 | PurchaseOrder 255020 |
| | | | ID 255022 | | | | 1 255024 | BusinessTransactionDocumentID 255026 |

FIG. 255-2

| Package | level1 | level2 | level3 | level4 | level5 | level6 | Cardinality | Datatype Name |
|---|---|---|---|---|---|---|---|---|
| | | | Recon-ciliation-Period-Counter-Value 255028 | | | | 0..1 255030 | Reconcilia-tionPeriod-Counter-Value 255032 |
| | | | Accep-tanceS-tatus-Code 255034 | | | | 0..1 255036 | Accep-tanceS-tatusCode 255038 |
| | | | Name 255040 | | | | 0..1 255042 | _MEDIUM_Name 255044 |
| Party 255046 | | | Buyer-Party 255048 | | | | 0..1 255050 | Business-Transac-tionDocu-mentParty 255052 |

FIG. 255-3

| Package | level1 | level2 | level3 | level4 | level5 | level6 | Cardinality | Datatype Name |
|---|---|---|---|---|---|---|---|---|
| | | | Seller-Party 255054 | | | | 0..1 255056 | Business-Transac-tionDocu-mentParty 255058 |
| | | | Vendor-Party 255060 | | | | 0..1 255062 | Business-Transac-tionDocu-mentParty 255064 |
| | | | Service-Per-former-Party 255066 | | | | 0..1 255068 | Business-Transac-tionDocu-mentParty 255070 |
| | | | Re-questor-Party 255072 | | | | 0..1 255074 | Business-Transac-tionDocu-mentParty 255076 |

FIG. 255-4

| Package | level1 | level2 | level3 | level4 | level5 | level6 | Cardinality | Datatype Name |
|---|---|---|---|---|---|---|---|---|
| | | | ProductRecipientParty 255078 | | | | 0..1 255080 | BusinessTransactionDocumentParty 255082 |
| Location 255084 | | | ShipToLocation 255086 | | | | 0..1 255088 | BusinessTransactionDocumentShipToLocation 255090 |
| DeliveryInformation 255092 | | | DeliveryTerms 255094 | | | | 0..1 255096 | DeliveryTerms 255098 |
| | | | | Incoterms 255100 | | | 0..1 255102 | Incoterms 255104 |
| | | | | | ClassificationCode 255106 | | 1 255108 | |

FIG. 255-5

| Package | level1 | level2 | level3 | level4 | level5 | level6 | Cardinality | Datatype Name |
|---|---|---|---|---|---|---|---|---|
| | | | | | TransferLocationName 255110 | | 0..1 255112 | |
| PriceInformation 255114 | | | Price 255116 | | | | 0..1 255118 | |
| | | | | NetAmount 255120 | | | 0..1 255122 | Amount 255124 |
| | | | | | currencyCode 255126 | | 1 255128 | |
| Description 255130 | | | Description 255132 | | | | 0..1 255134 | Description 255136 |
| | | | | languageCode 255138 | | | 1 255140 | |

FIG. 255-6

| Package | level1 | level2 | level3 | level4 | level5 | level6 | Cardinality | Datatype Name |
|---|---|---|---|---|---|---|---|---|
| | | | Confir-mation-Descrip-tion 255142 | | | | 0..1 255144 | Description 255146 |
| | | | | language-Code 255148 | | | 1 255150 | |
| FollowUp-Message 255152 | | | Follow-UpPur-chase Order-Confir-mation 255154 | | | | 0..1 255156 | |
| | | | | Require-mentCode 255158 | | | 1 255160 | FollowUp-Mes-sageRequire mentCode 255162 |

FIG. 255-7

| Package | level1 | level2 | level3 | level4 | level5 | level6 | Cardinality | Datatype Name |
|---|---|---|---|---|---|---|---|---|
| | | | FollowUp Despatched Delivery Notification 255164 | | | | 0..1 255166 | |
| | | | | RequirementCode 255168 | | | 1 255170 | FollowUpMessageRequirementCode 255172 |
| | | | FollowUpInvoiceRequest 255174 | | | | 0..1 255176 | |
| | | | | RequirementCode 255178 | | | 1 255180 | FollowUpMessageRequirementCode 255182 |

FIG. 255-8

| Package | level1 | level2 | level3 | level4 | level5 | level6 | Cardinality | Datatype Name |
|---|---|---|---|---|---|---|---|---|
| | | | | EvaluatedReceipt Settlement Indicator 255184 | | | 0..1 255186 | EvaluatedReceiptSettlementIndicator 255188 |
| Item 255190 | | | Item 255192 | | | | 0..n 255194 | PurchaseOrderItem 255196 |
| | | | | ID 255198 | | | 0..1 255200 | BusinessTransactionDocumentItemID 255202 |
| | | | | AcceptanceStatusCode 255204 | | | 0..1 255206 | AcceptanceStatusCode 255208 |

FIG. 255-9

| Package | level1 | level2 | level3 | level4 | level5 | level6 | Cardinality | Datatype Name |
|---|---|---|---|---|---|---|---|---|
| Product-Informa-tion 255210 | | | | Product 255212 | | | 0..1 255214 | Business-Transac-tionDocu-mentProduct 255216 |
| | | | | | InternalID 255218 | | 0..1 255220 | Product-InternalID 255222 |
| | | | | | StandardID 255224 | | 0..n 255226 | Product-StandardID 255228 |
| | | | | | TypeCode 255230 | | 0..1 255232 | ProductType Code 255234 |
| | | | | | Note 255236 | | 0..1 255238 | Note 255240 |
| Delivery-Informa-tion 255242 | | | | Delivery-Terms 255244 | | | 0..1 255246 | Delivery-Terms 255248 |

FIG. 255-10

| Package | level1 | level2 | level3 | level4 | level5 | level6 | Cardinality | Datatype Name |
|---|---|---|---|---|---|---|---|---|
| | | | | | Incoterms 255250 | | 0..1 255252 | Incoterms 255254 |
| | | | | | | ClassificationCode 255256 | 1 255258 | |
| | | | | | | TransferLocationName 255260 | 0..1 255262 | |
| | | | | | QuantityTolerance 255264 | | 0..1 255266 | QuantityTolerance 255268 |
| | | | | | | OverPercent 255270 | 0..1 255272 | Percent 255274 |
| | | | | | | OverPercentUnlimitedIndicator 255276 | 0..1 255278 | UnlimitedIndicator 255280 |
| | | | | | | UnderPercent 255282 | 0..1 255284 | Percent 255286 |

FIG. 255-11

| Package | level1 | level2 | level3 | level4 | level5 | level6 | Cardinality | Datatype Name |
|---|---|---|---|---|---|---|---|---|
| PriceIn-formation 255288 | | | | Price 255290 | | | 0..1 255292 | |
| | | | | | NetAmount 255294 | | 0..1 255296 | Amount 255298 |
| | | | | | | currency-Code 255300 | 1 255302 | |
| Party 255304 | | | | Vendor-Party 255306 | | | 0..1 255308 | Business-Transac-tionDocu-mentParty 255310 |
| | | | | ServicePer-formerParty 255312 | | | 0..1 255314 | Business-Transac-tionDocu-mentParty 255316 |

FIG. 255-12

| Package | level1 | level2 | level3 | level4 | level5 | level6 | Cardinality | Datatype Name |
|---|---|---|---|---|---|---|---|---|
| | | | | RequestorParty 255318 | | | 0..1 255320 | BusinessTransactionDocumentParty 255322 |
| | | | | ProductRecipientParty 255324 | | | 0..1 255326 | BusinessTransactionDocumentParty 255328 |
| Location 255330 | | | | ShipToLocation 255332 | | | 0..1 255334 | BusinessTransactionDocumentShipToLocation 255336 |

FIG. 255-13

| Package | level1 | level2 | level3 | level4 | level5 | level6 | Cardinality | Datatype Name |
|---|---|---|---|---|---|---|---|---|
| Busi-nessTran saction Documen tRefer-ence 255338 | | | | Purchase-Contrac-tReference 255340 | | | 0..n 255342 | Business-Transac-tionDocu-mentRefer-ence 255344 |
| | | | | | ID 255346 | | 1 255348 | Business-Transac-tionDocu-mentID 255350 |
| | | | | | ItemID 255352 | | 0..n 255354 | Business-Transac-tionDocu-mentItemID 255356 |

FIG. 255-14

| Package | level1 | level2 | level3 | level4 | level5 | level6 | Cardinality | Datatype Name |
|---|---|---|---|---|---|---|---|---|
| | | | | PurchaseRequestReference 255358 | | | 0..n 255360 | BusinessTransactionDocumentReference 255362 |
| | | | | | ID 255364 | | 1 255366 | BusinessTransactionDocumentID 255368 |
| | | | | | ItemID 255370 | | 0..n 255372 | BusinessTransactionDocumentItemID 255374 |
| | | | | PurchaseRequisitionReference 255376 | | | 0..n 255378 | BusinessTransactionDocumentReference 255380 |

FIG. 255-15

| Package | level1 | level2 | level3 | level4 | level5 | level6 | Cardinality | Datatype Name |
|---|---|---|---|---|---|---|---|---|
| | | | | | ID 255382 | | 1 255384 | Business-Transac-tionDocu-mentID 255386 |
| | | | | | ItemID 255388 | | 0..n 255390 | Business-Transac-tionDocu-mentItemID 255392 |
| | | | | SalesOr-derRefer-ence 255394 | | | 0..n 255396 | Business-Transac-tionDocu-mentRefer-ence 255398 |
| | | | | | ID 255400 | | 1 255402 | Business-Transac-tionDocu-mentID 255404 |

FIG. 255-16

| Package | level1 | level2 | level3 | level4 | level5 | level6 | Cardinality | Datatype Name |
|---|---|---|---|---|---|---|---|---|
| | | | | | ItemID 255406 | | 0..n 255408 | Business-Transac-tionDocu-mentItemID 255410 |
| Descrip-tion 255412 | | | | Description 255414 | | | 0..1 255416 | Description 255418 |
| | | | | | language-Code 255420 | | 1 255422 | |
| | | | | Confirma-tionDescrip-tion 255424 | | | 0..1 255426 | Description 255428 |
| | | | | | language-Code 255430 | | 1 255432 | |

FIG. 255-17

| Package | level1 | level2 | level3 | level4 | level5 | level6 | Cardinality | Datatype Name |
|---|---|---|---|---|---|---|---|---|
| FollowUpMessage 255434 | | | | FollowUpPurchase OrderConfirmation 255436 | | | 0..1 255438 | |
| | | | | | RequirementCode 255440 | | 1 255442 | FollowUpMessageRequirementCode 255444 |
| | | | | FollowUpDespatched DeliveryNotification 255446 | | | 0..1 255448 | |
| | | | | | RequirementCode 255450 | | 1 255452 | FollowUpMessageRequirementCode 255454 |

FIG. 255-18

| Package | level1 | level2 | level3 | level4 | level5 | level6 | Cardinality | Datatype Name |
|---|---|---|---|---|---|---|---|---|
| | | | | FollowUpInvoiceRequest 255456 | | | | |
| | | | | | RequirementCode 255458 | | 1 255460 | FollowUpMessageRequirementCode 255462 |
| ScheduleLine 255464 | | | | ScheduleLine 255466 | | | 0..n 255468 | PurchaseOrderItemScheduleLine 255470 |
| | | | | | ID 255472 | | 0..1 255474 | BusinessTransactionDocumentItemScheduleLineID 255476 |

FIG. 255-19

| Package | level1 | level2 | level3 | level4 | level5 | level6 | Cardinality | Datatype Name |
|---|---|---|---|---|---|---|---|---|
| | | | | | DeliveryPe-riod 255478 | | 1 255480 | GLOBAL_DateTimePe-riod 255482 |
| | | | | | | Start-DateTime 255484 | 0..1 255486 | GLOBAL_DateTime 255488 |
| | | | | | | End-DateTime 255490 | 0..1 255492 | GLOBAL_DateTime 255494 |
| | | | | | | Duration 255496 | 0..1 255498 | Duration 255500 |
| | | | | | Quantity 255502 | | 0..1 255504 | Quantity 255506 |
| | | | | | | unitCode 255508 | 1 255510 | |

FIG. 256-1

| Package | level1 | level2 | level3 | level4 | level5 | level6 | level7 | Cardinality | Datatype Name |
|---|---|---|---|---|---|---|---|---|---|
| PurchaseOrderMessage 256000 | Pur-chaseOr derMes-sage 256001 | | | | | | | | Pur-chaseOr derMes-sage 256002 |
| MessageHeader 256003 | | Message Header 256004 | | | | | | 1 256005 | Business Docu-mentMes sage-Header 256006 |
| | | | Mes-sageID 256007 | | | | | 1 256008 | Business Docu-mentMes sageID 256009 |

FIG. 256-2

| Package | level1 | level2 | level3 | level4 | level5 | level6 | level7 | Cardinality | Datatype Name |
|---|---|---|---|---|---|---|---|---|---|
| | | | Referen-celD 256010 | | | | | 0..1 256011 | Business Docu-mentMes sageID 256012 |
| | | | Creation-DateTim e 256013 | | | | | 1 256014 | DateTim e 256015 |
| | | | Sender-Party 256016 | | | | | 0..1 256017 | Business Docu-mentMes sage-Header-Party 256018 |

FIG. 256-3

| Package | level1 | level2 | level3 | level4 | level5 | level6 | level7 | Cardinality | Datatype Name |
|---|---|---|---|---|---|---|---|---|---|
| | | | | Inter-nalID 256019 | | | | 0..1 256020 | Party-Inter-nalID 256021 |
| | | | | Stan-dardID 256022 | | | | 0..n 256023 | Par-tyStan-dardID 256024 |
| | | | | Contact-Person 256025 | | | | 0..1 256026 | Contact-Person 256027 |
| | | | | | BuyerID 256028 | | | 0..1 256029 | Contact-Person-PartyID 256030 |
| | | | | | SellerID 256031 | | | 0..1 256032 | Contact-Person-PartyID 256033 |
| | | | | | Address 256034 | | | 0..1 256035 | Address 256036 |

FIG. 256-4

| Package | level1 | level2 | level3 | level4 | level5 | level6 | level7 | Cardinality | Datatype Name |
|---|---|---|---|---|---|---|---|---|---|
| | | | Recipi-entParty 256037 | | | | | 0..n 256038 | Business Docu-mentMes sage-Header-Party 256039 |
| PurchaseOrder 256040 | | Pur-chaseOr der 256041 | | | | | | 1 256042 | Pur-chaseOr der 256043 |
| | | | ID 256044 | | | | | 1 256045 | Business Transac-tionDocu mentID 256046 |

FIG. 256-5

| Package | level1 | level2 | level3 | level4 | level5 | level6 | level7 | Cardinality | Datatype Name |
|---|---|---|---|---|---|---|---|---|---|
| | | | SellerID 256047 | | | | | 0..1 256048 | BusinessTransac-tionDocumentID 256049 |
| | | New 256050 | Recon-ciliation-Period-Coun-terValue 256051 | | | | | 0..1 256052 | Recon-ciliation-Period-Counter-Value 256053 |
| | | | Buyer-Posting-DateTime 256054 | | | | | 0..1 256055 | GLOBAL_DateTime 256056 |
| | | | Buyer-Last-ChangeDateTime 256057 | | | | | 0..1 256058 | GLOBAL_DateTime 256059 |

FIG. 256-6

| Package | level1 | level2 | level3 | level4 | level5 | level6 | level7 | Cardinality | Datatype Name |
|---|---|---|---|---|---|---|---|---|---|
| | | | Seller-Posting-DateTime 256060 | | | | | 0..1 256061 | GLOBAL_DateTime 256062 |
| | | | Seller-Last-Change DateTime 256063 | | | | | 0..1 256064 | GLOBAL_DateTime 256065 |
| | | | Accep-tanceS-tatus-Code 256066 | | | | | 0..1 256067 | Accep-tanceS-tatus-Code 256068 |
| | | | Note 256069 | | | | | 0..1 256070 | Note 256071 |
| | | | Name 256073 | | | | | 0..1 256074 | MEDIUM_Name 256075 |

FIG. 256-7

| Package | level1 | level2 | level3 | level4 | level5 | level6 | level7 | Cardinality | Datatype Name |
|---|---|---|---|---|---|---|---|---|---|
| | | | Item-ListComplete Transmission-Indicator 256076 | | | | | 0..1 256077 | Indicator 256078 |
| Party 256079 | | | Buyer-Party 256080 | | | | | 0..1 256081 | Business Transaction Document-Party 256082 |
| | | | | Stan-dardID 256083 | | | | 0..n 256084 | Par-tyStan-dardID 256085 |
| | | | | BuyerID 256086 | | | | 0..1 256087 | Party-PartyID 256088 |

FIG. 256-8

| Package | level1 | level2 | level3 | level4 | level5 | level6 | level7 | Cardinality | Datatype Name |
|---|---|---|---|---|---|---|---|---|---|
| | | | | SellerID 256089 | | | | 0..1 256090 | Party-PartyID 256091 |
| | | | | Address 256092 | | | | 0..1 256093 | Address 256094 |
| | | | | Contact-Person 256095 | | | | 0..1 256096 | Contact-Person 256097 |
| | | | | | BuyerID 256098 | | | 0..1 256099 | Contact-Person-PartyID 256100 |
| | | | | | SellerID 256101 | | | 0..1 256102 | Contact-Person-PartyID 256103 |
| | | | | | Address 256104 | | | 0..1 256105 | Address 256106 |

FIG. 256-9

| Package | level1 | level2 | level3 | level4 | level5 | level6 | level7 | Cardinality | Datatype Name |
|---|---|---|---|---|---|---|---|---|---|
| | | | Seller-Party 256107 | | | | | 0..1 256108 | Business Transac-tionDocu ment-Party 256109 |
| | | | Produc-tRecipi-entParty 256110 | | | | | 0..1 256111 | Business Transac-tionDocu ment-Party 256112 |
| | | | Vendor-Party 256113 | | | | | 0..1 256114 | Business Transac-tionDocu ment-Party 256115 |

FIG. 256-10

| Package | level1 | level2 | level3 | level4 | level5 | level6 | level7 | Cardinality | Datatype Name |
|---|---|---|---|---|---|---|---|---|---|
| | | | Service-Per-former-Party 256117 | | | | | 0..1 256118 | Business Transac-tionDocu ment-Party 256119 |
| | | | Manufac-turer-Party 256120 | | | | | 0..1 256121 | Business Transac-tionDocu ment-Party 256122 |
| | | | BillTo-Party 256123 | | | | | 0..1 256124 | Business Transac-tionDocu ment-Party 256125 |

FIG. 256-11

| Package | level1 | level2 | level3 | level4 | level5 | level6 | level7 | Cardinality | Datatype Name |
|---|---|---|---|---|---|---|---|---|---|
| | | | Payer-Party 256126 | | | | | 0..1 256127 | BusinessTransac-tionDocument-Party 256128 |
| | | | Carrier-Party 256129 | | | | | 0..1 256130 | BusinessTransac-tionDocument-Party 256131 |

FIG. 256-12

| Package | level1 | level2 | level3 | level4 | level5 | level6 | level7 | Cardinality | Datatype Name |
|---|---|---|---|---|---|---|---|---|---|
| Location 256132 | | | Ship-ToLoca-tion 256133 | | | | | 0..1 256134 | BusinessTransac-tionDocumentShipToLoca-tion 256135 |
| | | | | Stan-dardID 256136 | | | | 0..n 256137 | Loca-tionStan-dardID 256138 |
| | | | | BuyerID 256139 | | | | 0..1 256140 | Loca-tionPartyID 256141 |
| | | | | SellerID 256142 | | | | 0..1 256143 | Loca-tionPartyID 256144 |
| | | | | Address 256145 | | | | 0..1 256146 | Address 256147 |

FIG. 256-13

| Package | level1 | level2 | level3 | level4 | level5 | level6 | level7 | Cardinality | Datatype Name |
|---|---|---|---|---|---|---|---|---|---|
| | | | ShipFromLocation 256148 | | | | | 0..1 256149 | BusinessTransactionDocumentShipFromLocation 256150 |
| DeliveryInformation 256151 | | | DeliveryTerms 256152 | | | | | 0..1 256153 | DeliveryTerms 256154 |
| | | | | DeliveryItemGroupID 256155 | | | | 0..1 256156 | BusinessTransactionDocumentItemGroupID 256157 |

FIG. 256-14

| Package | level1 | level2 | level3 | level4 | level5 | level6 | level7 | Cardinality | Datatype Name |
|---|---|---|---|---|---|---|---|---|---|
| | | | | Deliv-eryPriori-tyCode 256158 | | | | 0..1 256159 | Business Transac-tionPri-ority-Code 256160 |
| | | | | Inco-terms 256161 | | | | 0..1 256162 | Inco-terms 256163 |
| | | | | | Classifi-cation-Code 256164 | | | 1 256165 | |
| | | | | | Transfer-Loca-tionName 256166 | | | 0..1 256167 | |
| | | | | Partial-Delivery 256168 | | | | 0..1 256169 | Partial-Delivery 256170 |

FIG. 256-15

| Package | level1 | level2 | level3 | level4 | level5 | level6 | level7 | Cardinality | Datatype Name |
|---|---|---|---|---|---|---|---|---|---|
| | | | | | MaximalNumber 256171 | | | 0..1 256172 | |
| | | | | | UnlimitedIndicator 256173 | | | 0..1 256174 | Indicator 256175 |
| | | | | QuantityTolerance 256176 | | | | 0..1 256177 | QuantityTolerance 256178 |
| | | | | | OverPercent 256179 | | | 0..1 256180 | Percent 256181 |
| | | | | | OverPercent UnlimitedIndicator 256182 | | | 0..1 256183 | Indicator 256184 |

FIG. 256-16

| Package | level1 | level2 | level3 | level4 | level5 | level6 | level7 | Cardinality | Datatype Name |
|---|---|---|---|---|---|---|---|---|---|
| | | | | | Under-Percent 256185 | | | 0..1 256186 | Percent 256187 |
| | | | | Maxi-mum-Lead-TimeDu-ration 256188 | | | | 0..1 256189 | Duration 256190 |
| | | | | Trans-port 256191 | | | | 0..1 256192 | |
| | | | | | Ser-viceLevel Code 256193 | | | 0..1 256194 | Trans-portSer-viceLevel Code 256195 |
| | | | | | Mode-Code 256196 | | | 0..1 256197 | Trans-portMode Code 256198 |

FIG. 256-17

| Package | level1 | level2 | level3 | level4 | level5 | level6 | level7 | Cardinality | Datatype Name |
|---|---|---|---|---|---|---|---|---|---|
| | | | | | Means-Descrip-tionCode 256199 | | | 0..1 256200 | Trans-port-Means-Descrip-tionCode 256201 |
| | | | | Descrip-tion 256202 | | | | 0..1 256203 | Descrip-tion 256204 |
| | | | | | language Code 256205 | | | 1 256206 | |
| PaymentInformation 256207 | | | Cash-Discount Terms 256208 | | | | | 0..1 256209 | Cash-Discount-Terms 256210 |
| | | | | Payment Base-LineDate 256211 | | | | 0..1 256212 | Date 256213 |

FIG. 256-18

| Package | level1 | level2 | level3 | level4 | level5 | level6 | level7 | Cardinality | Datatype Name |
|---|---|---|---|---|---|---|---|---|---|
| | | | | Maxi-mum-Cash-Discount 256214 | | | | 0..1 256215 | Cash-Discount 256216 |
| | | | | | Days-Value 256217 | | | 1 256218 | |
| | | | | | Percent 256219 | | | 1 256220 | Percent 256221 |
| | | | | Normal-Cash-Discount 256222 | | | | 0..1 256223 | Cash-Discount 256224 |
| | | | | | Days-Value 256225 | | | 1 256226 | |
| | | | | | Percent 256227 | | | 1 256228 | Percent 256229 |

FIG. 256-19

| Package | level1 | level2 | level3 | level4 | level5 | level6 | level7 | Cardinality | Datatype Name |
|---|---|---|---|---|---|---|---|---|---|
| | | | | FullPayment-DueDays Value 256230 | | | | 0..1 256231 | |
| | | | Payment Form 256232 | | | | | 0..1 256233 | |
| | | | | Code 256234 | | | | 1 256235 | Payment Form-Code 256236 |
| | | | | Payment Card 256237 | | | | 0..1 256238 | Payment Card 256239 |
| | | | | | ID 256240 | | | 1 256241 | Payment CardID 256242 |

FIG. 256-20

| Package | level1 | level2 | level3 | level4 | level5 | level6 | level7 | Cardinality | Datatype Name |
|---|---|---|---|---|---|---|---|---|---|
| | | | | | Referen-ceID 256243 | | | 0..1 256244 | |
| | | | | | Sequen-ceID 256245 | | | 0..1 256246 | |
| | | | | | Holder 256247 | | | 0..1 256248 | |
| | | | | | Expira-tionDate 256249 | | | 1 256250 | Date 256251 |
| PriceInformation 256252 | | | Price 256253 | | | | | 0..1 256254 | |
| | | | | NetA-mount 256255 | | | | 0..1 256256 | Amount 256257 |
| | | | | | cur-rencyCod e 256258 | | | 1 256259 | |

FIG. 256-21

| Package | level1 | level2 | level3 | level4 | level5 | level6 | level7 | Cardinality | Datatype Name |
|---|---|---|---|---|---|---|---|---|---|
| Attachment 256260 | | | Attach-ment-Folder 256261 | | | | | 0..n 256262 | Attach-ment-Folder 256263 |
| Description 256264 | | | TextFolder 256265 | | | | | 0..1 256266 | TextFolder 256267 |
| FollowUpMessage 256268 | | | Follow-UpPur-chase Order-Confir-mation 256269 | | | | | 0..1 256270 | |
| | | | | Re-quirementCode 256271 | | | | 1 256272 | Follow-UpMes-sageRe-quire-ment-Code 256273 |

FIG. 256-22

| Package | level1 | level2 | level3 | level4 | level5 | level6 | level7 | Cardinality | Datatype Name |
|---|---|---|---|---|---|---|---|---|---|
| | | | FollowUp Despatched Deliv-eryNotifi-cation 256274 | | | | | 0..1 256275 | |
| | | | | Require-ment-Code 256276 | | | | 1 256277 | Follow-UpMes-sageRe-quire-ment-Code 256278 |
| | | | Follow-UpSer-viceAc-knowl-edge-mentRe-quest 256279 | | | | | 0..1 256280 | |

FIG. 256-23

| Package | level1 | level2 | level3 | level4 | level5 | level6 | level7 | Cardinality | Datatype Name |
|---|---|---|---|---|---|---|---|---|---|
| | | | | Re-quirementCode 256281 | | | | 1 256282 | Follow-UpMessageRe-quire-ment-Code 256283 |
| | | | Follow-UpIn-voiceRe-quest 256284 | | | | | 0..1 256285 | |
| | | | | Require-ment-Code 256286 | | | | 1 256287 | Follow-UpMessageRe-quire-ment-Code 256288 |

FIG. 256-24

| Package | level1 | level2 | level3 | level4 | level5 | level6 | level7 | Cardinality | Datatype Name |
|---|---|---|---|---|---|---|---|---|---|
| | | | | EvaluatedReceipt SettlementIndicator 256289 | | | | 0..1 256290 | Indicator 256291 |
| Item 256292 | | | Item 256293 | | | | | 0..n 256294 | PurchaseOrderItem 256295 |
| | | | | ID 256296 | | | | 0..1 256297 | BusinessTransactionDocumentItemID 256298 |

FIG. 256-25

| Package | level1 | level2 | level3 | level4 | level5 | level6 | level7 | Cardinality | Datatype Name |
|---|---|---|---|---|---|---|---|---|---|
| | | | | SellerID 256299 | | | | 0..1 256300 | Business Transac-tionDocumen-tItemID 256301 |
| | | | | Action-Code 256302 | | | | 1 256303 | Action-Code 256304 |
| | | | | Accep-tanceS-tatus-Code 256305 | | | | 0..1 256306 | Accep-tanceS-tatus-Code 256307 |
| | | | | Un-planned-Item Permis-sion-Code 256308 | | | | 0..1 256309 | Un-planned-Item-Permis-sionCode 256310 |

FIG. 256-26

| Package | level1 | level2 | level3 | level4 | level5 | level6 | level7 | Cardinality | Datatype Name |
|---|---|---|---|---|---|---|---|---|---|
| | | | | Unconfirmed-QuantityCanceledIndicator 256311 | | | | 0..1 256312 | Indicator 256313 |
| | | | | HierarchyRelationship 256314 | | | | 0..1 256315 | |
| | | | | | ParentItemID 256316 | | | 0..1 256317 | BusinessTransactionDocumentItemID 256318 |

FIG. 256-27

| Package | level1 | level2 | level3 | level4 | level5 | level6 | level7 | Cardinality | Datatype Name |
|---|---|---|---|---|---|---|---|---|---|
| | | | | | Paren-tItem-SellerID 256319 | | | 0..1 256320 | Business Transac-tionDocu men-tItemID 256321 |
| | | | | | Type-Code 256322 | | | 1 256323 | Business Transac-tionDocu mentItem Hierar-chyRela-tionship-Type-Code 256324 |

FIG. 256-28

| Package | level1 | level2 | level3 | level4 | level5 | level6 | level7 | Cardinality | Datatype Name |
|---|---|---|---|---|---|---|---|---|---|
| ProductInformation 256325 | | | | Product 256326 | | | | 0..1 256327 | Business Transac-tionDocu ment-Product 256328 |
| | | | | | Stan-dardID 256329 | | | 0..n 256330 | Product-Stan-dardID 256331 |
| | | | | | BuyerID 256332 | | | 0..1 256333 | Product-PartyID 256334 |
| | | | | | SellerID 256335 | | | 0..1 256336 | Product-PartyID 256337 |
| | | | | | Manufac-turerID 256338 | | | 0..1 256339 | Product-PartyID 256340 |

FIG. 256-29

| Package | level1 | level2 | level3 | level4 | level5 | level6 | level7 | Cardinality | Datatype Name |
|---|---|---|---|---|---|---|---|---|---|
| | | | | | Type-Code 256341 | | | 0..1 256342 | Pro-ductType Code 256343 |
| | | | | | Note 256344 | | | 0..1 256345 | Note 256346 |
| | | | | Pro-ductCate gory 256347 | | | | 0..1 256348 | Business Transac-tionDocu ment-ProductC ategory 256349 |
| | | | | | Stan-dardID 256350 | | | 0..n 256351 | Pro-ductCate goryStan dardID 256352 |

FIG. 256-30

| Package | level1 | level2 | level3 | level4 | level5 | level6 | level7 | Cardinality | Datatype Name |
|---|---|---|---|---|---|---|---|---|---|
| | | | | | BuyerID 256353 | | | 0..1 256354 | Pro-ductCate gory-PartyID 256355 |
| | | | | | SellerID 256356 | | | 0..1 256357 | Pro-ductCate gory-PartyID 256358 |
| PriceInformation 256359 | | | | Price 256360 | | | | 0..1 256361 | |
| | | | | | NetA-mount 256362 | | | 0..1 256363 | Amount 256364 |
| | | | | | | cur-rencyCod e 256365 | | 1 256366 | |
| | | | | | NetUnit-Price 256367 | | | 0..1 256368 | Price 256369 |

FIG. 256-31

| Package | level1 | level2 | level3 | level4 | level5 | level6 | level7 | Cardinality | Datatype Name |
|---|---|---|---|---|---|---|---|---|---|
| | | | | | | Amount 256370 | | 1 256371 | Amount 256372 |
| | | | | | | | cur-rencyCode 256373 | 1 256374 | |
| | | | | | | Base-Quantity 256375 | | 1 256376 | Quantity 256377 |
| | | | | | | | unitCode 256378 | 1 256379 | |
| | | | | Con-firmed-Price 256380 | | | | 0..1 256381 | |
| | | | | | NetUnit-Price 256382 | | | 0..1 256383 | Price 256384 |
| | | | | | | Amount 256385 | | 1 256386 | Amount 256387 |

FIG. 256-32

| Package | level1 | level2 | level3 | level4 | level5 | level6 | level7 | Cardinality | Datatype Name |
|---|---|---|---|---|---|---|---|---|---|
| | | | | | | | currencyCode 256388 | 1 256389 | |
| | | | | | | BaseQuantity 256390 | | 1 256391 | Quantity 256392 |
| | | | | | | | unitCode 256393 | 1 256394 | |
| Party 256395 | | | | BuyerParty 256396 | | | | 0..1 256397 | BusinessTransactionDocumentParty 256398 |

FIG. 256-33

| Package | level1 | level2 | level3 | level4 | level5 | level6 | level7 | Cardinality | Datatype Name |
|---|---|---|---|---|---|---|---|---|---|
| | | | | Seller-Party 256399 | | | | 0..1 256400 | Business Transac-tionDocu ment-Party 256401 |
| | | | | Produc-tRecipi-entParty 256402 | | | | 0..1 256403 | Business Transac-tionDocu ment-Party 256404 |
| | | | | Vendor-Party 256405 | | | | 0..1 256406 | Business Transac-tionDocu ment-Party 256407 |

FIG. 256-34

| Package | level1 | level2 | level3 | level4 | level5 | level6 | level7 | Cardinality | Datatype Name |
|---|---|---|---|---|---|---|---|---|---|
| | | | | Service-Per-former-Party 256408 | | | | 0..1 256409 | Business Transac-tionDocu ment-Party 256410 |
| | | | | Manufac-turer-Party 256411 | | | | 0..1 256412 | Business Transac-tionDocu ment-Party 256413 |
| | | | | BillTo-Party 256414 | | | | 0..1 256415 | Business Transac-tionDocu ment-Party 256416 |

FIG. 256-35

| Package | level1 | level2 | level3 | level4 | level5 | level6 | level7 | Cardinality | Datatype Name |
|---|---|---|---|---|---|---|---|---|---|
| | | | | Payer-Party 256417 | | | | 0..1 256418 | BusinessTransac-tionDocument-Party 256419 |
| | | | | Carrier-Party 256420 | | | | 0..1 256421 | BusinessTransac-tionDocument-Party 256422 |

FIG. 256-36

| Package | level1 | level2 | level3 | level4 | level5 | level6 | level7 | Cardinality | Datatype Name |
|---|---|---|---|---|---|---|---|---|---|
| Location 256423 | | | | Ship-ToLoca-tion 256424 | | | | 0..1 256425 | Business Transac-tionDocu mentShip ToLoca-tion 256426 |
| | | | | Ship-FromLo-cation 256427 | | | | 0..1 256428 | Business Transac-tionDocu mentShip FromLo-cation 256429 |
| DeliveryInforma-tion 256430 | | | | Delive-ryTerms 256431 | | | | 0..1 256432 | Delivery-Terms 256433 |

FIG. 256-37

| Package | level1 | level2 | level3 | level4 | level5 | level6 | level7 | Cardinality | Datatype Name |
|---|---|---|---|---|---|---|---|---|---|
| BusinessTransaction DocumentReference 256434 | | | | QuoteReference 256435 | | | | 0..1 256436 | BusinessTransactionDocumentReference 256437 |
| | | | | | ID 256438 | | | 1 256439 | BusinessTransactionDocumentID 256440 |
| | | | | | ItemID 256441 | | | 0..n 256442 | BusinessTransactionDocumentItemID 256443 |

FIG. 256-38

| Package | level1 | level2 | level3 | level4 | level5 | level6 | level7 | Cardinality | Datatype Name |
|---|---|---|---|---|---|---|---|---|---|
| | | | | Pur-chase-Contrac-tRefer-ence 256444 | | | | 0..n 256445 | Business Transac-tionDocu men-tRefer-ence 256446 |
| | | | | | ID 256447 | | | 1 256448 | Business Transac-tionDocu mentID 256449 |
| | | | | | ItemID 256450 | | | 0..n 256451 | Business Transac-tionDocu men-tItemID 256452 |

FIG. 256-39

| Package | level1 | level2 | level3 | level4 | level5 | level6 | level7 | Cardinality | Datatype Name |
|---|---|---|---|---|---|---|---|---|---|
| | | | | SalesContractReference 256453 | | | | 0..n 256454 | BusinessTransactionDocumentReference 256455 |
| | | | | | ID 256456 | | | 1 256457 | BusinessTransactionDocumentID 256458 |
| | | | | | ItemID 256459 | | | 0..n 256460 | BusinessTransactionDocumentItemID 256461 |

FIG. 256-40

| Package | level1 | level2 | level3 | level4 | level5 | level6 | level7 | Cardinality | Datatype Name |
|---|---|---|---|---|---|---|---|---|---|
| | | | | Origin-Pur-chaseOrder Refer-ence 256462 | | | | 0..1 256463 | BusinessTransac-tionDocumen-tRefer-ence 256464 |
| | | | | | ID 256465 | | | 1 256466 | BusinessTransac-tionDocumentID 256467 |
| | | | | | ItemID 256468 | | | 0..n 256469 | BusinessTransac-tionDocumen-tItemID 256470 |

FIG. 256-41

| Package | level1 | level2 | level3 | level4 | level5 | level6 | level7 | Cardinality | Datatype Name |
|---|---|---|---|---|---|---|---|---|---|
| | | | | BuyerProductCatalogue Reference 256471 | | | | 0..1 256472 | CatalogueReference 256473 |
| | | | | | ID 256474 | | | 1 256475 | CatalogueID 256476 |
| | | | | | ItemID 256477 | | | 0..n 256478 | CatalogueItemID 256479 |
| | | | | SellerProductCatalogue Reference 256480 | | | | 0..1 256481 | CatalogueReference 256482 |

FIG. 256-42

| Package | level1 | level2 | level3 | level4 | level5 | level6 | level7 | Cardinality | Datatype Name |
|---|---|---|---|---|---|---|---|---|---|
| | | | | | ID 256483 | | | 1 256484 | Cata-logueID 256485 |
| | | | | | ItemID 256486 | | | 0..n 256487 | Cata-logueItemID 256488 |
| Attachment 256489 | | | | Attach-ment-Folder 256490 | | | | 0..n 256491 | Attach-ment-Folder 256492 |
| Description 256493 | | | | Descrip-tion 256494 | | | | 0..1 256495 | Descrip-tion 256496 |
| Description 256497 | | | | TextCol-lection 256498 | | | | 0..1 256499 | TextCol-lection 256500 |

FIG. 256-43

| Package | level1 | level2 | level3 | level4 | level5 | level6 | level7 | Cardinality | Datatype Name |
|---|---|---|---|---|---|---|---|---|---|
| FollowUpMessage 256501 | | | | FollowUpPurchase OrderConfirmation 256502 | | | | 0..1 256503 | |
| | | | | | RequirementCode 256504 | | | 1 256505 | FollowUpMessageRequirementCode 256506 |
| | | | | FollowUpDespatched DeliveryNotification 256507 | | | | 0..1 256508 | |

FIG. 256-44

| Package | level1 | level2 | level3 | level4 | level5 | level6 | level7 | Cardinality | Datatype Name |
|---|---|---|---|---|---|---|---|---|---|
| | | | | | Re-quirementCode 256509 | | | 1 256510 | Follow-UpMessageRe-quire-ment-Code 256511 |
| | | | | Follow-UpSer-viceAc-knowl-edge-mentRe-quest 256512 | | | | 0..1 256513 | |
| | | | | | Re-quirementCode 256514 | | | 1 256515 | Follow-UpMessageRe-quire-ment-Code 256516 |

FIG. 256-45

| Package | level1 | level2 | level3 | level4 | level5 | level6 | level7 | Cardinality | Datatype Name |
|---|---|---|---|---|---|---|---|---|---|
| | | | | Follow-UpIn-voiceRe-quest 256517 | | | | 0..1 256518 | |
| | | | | | Re-quiremen tCode 256519 | | | 1 256520 | Follow-UpMes-sageRe-quire-ment-Code 256521 |
| | | | | | Evaluat-edRe-ceipt Settle-mentIn-dicator 256522 | | | 0..1 256523 | Indicator 256524 |

FIG. 256-46

| Package | level1 | level2 | level3 | level4 | level5 | level6 | level7 | Cardinality | Datatype Name |
|---|---|---|---|---|---|---|---|---|---|
| ScheduleLine 256525 | | | | Sched-uleLine 256526 | | | | 0..n 256527 | Pur-chaseOrderItem-Sched-uleLine 256528 |
| | | | | | ID 256529 | | | 0..1 256530 | BusinessTransac-tionDocumentItemSched-uleLineID 256531 |

FIG. 256-47

| Package | level1 | level2 | level3 | level4 | level5 | level6 | level7 | Cardinality | Datatype Name |
|---|---|---|---|---|---|---|---|---|---|
| | | | | | SellerID 256532 | | | 0..1 256533 | BusinessTransactionDocumentItemScheduleLineID 256534 |
| | | | | | DeliveryPeriod 256535 | | | 1 256536 | GLOBAL_DateTimePeriod 256537 |
| | | | | | | StartDateTime 256538 | | 0..1 256539 | GLOBAL_DateTime 256540 |
| | | | | | | EndDateTime 256541 | | 0..1 256542 | GLOBAL_DateTime 256543 |

FIG. 256-48

| Package | level1 | level2 | level3 | level4 | level5 | level6 | level7 | Cardinality | Datatype Name |
|---|---|---|---|---|---|---|---|---|---|
| | | | | | | Duration 256544 | | 0..1 256545 | Duration 256546 |
| | | | | | Quantity 256547 | | | 0..1 256548 | Quantity 256549 |
| | | | | | Quanti-tyType-Code 256550 | | | 0..1 256551 | Quanti-tyType-Code 256552 |
| | | | | Con-firmed-Sched-uleLine 256553 | | | | 0..n 256554 | Pur-chaseOr derItem-Sched-uleLine 256555 |

PurchaseRequest

| Package | level1 | level2 | level3 | level4 | level5 | | Cardinal-ity | Datatype Name |
|---|---|---|---|---|---|---|---|---|
| PurchaseRequestCon-firmationMessage 259000 | Pur-chaseRe-questCon-firmation-Message 259002 | | | | | | | Pur-chaseRe-questCon-firmation-Message 259004 |
| MessageHeader 259006 | | Mes-sageHead er 259008 | | | | | 0..1 259010 | Busi-nessDocu mentMes-sage-Header 259012 |
| PurchaseRequest 259014 | | Pur-chaseRe-quest 259016 | | | | | 1 259018 | Pur-chaseRe-questCon-firmation 259020 |
| | | | ID 259022 | | | | 1..2 259024 | Business-Transac-tion-Documen-tID 259026 |

FIG. 259-2

| Package | level1 | level2 | level3 | level4 | level5 | | Cardinality | Datatype Name |
|---|---|---|---|---|---|---|---|---|
| | | | BaseBusinessTransactionDocumentID 259028 | | | | 1..2 259030 | BusinessTransactionDocumentID 259032 |
| | | | BaseBusinessTransactionDocumentTypeCode 259034 | | | | 0..1 259036 | BusinessTransactionDocumentTypeCode 259038 |
| | | | ReconciliationPeriodCounterValue 259040 | | | | 0..1 259042 | CounterValue 259044 |
| Item 259046 | | | Item 259048 | | | | 1..n 259050 | PurchaseRequestConfirmationItem 259052 |

FIG. 259-3

| Package | level1 | level2 | level3 | level4 | level5 | | Cardinal-ity | Datatype Name |
|---|---|---|---|---|---|---|---|---|
| | | | | ID 259054 | | | 1..2 259056 | Business-Transac-tion-Documen-tItemID 259058 |
| | | | | BaseBusi-nessTrans-actionDocu-mentItemID 259060 | | | 1..2 259062 | Business-Transac-tion-Documen-tItemID 259064 |
| | | | | OpenQuanti-tyCan-celledIndica-tor 259066 | | | 0..1 259068 | Indicator 259070 |
| | | | | TotalRe-quested-Quantity 259072 | | | 1 259074 | Quantity 259076 |

FIG. 259-4

| Package | level1 | level2 | level3 | level4 | level5 | | Cardinal-ity | Datatype Name |
|---|---|---|---|---|---|---|---|---|
| | | | | TotalOr-deredQuan-tity 259078 | | | 1 259080 | Quantity 259082 |
| | | | | Delivery-Complet-edIndicator 259084 | | | 0..1 259086 | Indicator 259088 |
| | | | | Invoicing-Complet-edIndicator 259090 | | | 0..1 259092 | Indicator 259094 |
| FulfillingPur-chaseOrder 259096 | | | | FulfillingPur-chaseOrder 259098 | | | 0..n 259100 | Pur-chaseRe-questCon-firmatio-nItemFul-fillingPur-chaseOr-der 259102 |

FIG. 259-5

| Package | level1 | level2 | level3 | level4 | level5 | | Cardinal-ity | Datatype Name |
|---|---|---|---|---|---|---|---|---|
| | | | | | ID 259104 | | 1 259106 | Business-Transac-tion-Documen-tID 259108 |
| | | | | | OrderedIn-dicator 259110 | | 0..1 259112 | Indicator 259114 |
| Fulfill-ingPur-chaseOr derItem 259116 | | | | | Item 259118 | | 1..n 259120 | Pur-chaseRe-questCon-firmatio-nItemFul-fillingPur-chaseOr-derItem 259122 |
| | | | | | | ID 259124 | 1 259126 | Business-Transac-tion-Documen-tItemID 259128 |

FIG. 259-6

| Package | level1 | level2 | level3 | level4 | level5 | | Cardinality | Datatype Name |
|---|---|---|---|---|---|---|---|---|
| | | | | | CHANGEDinIRMapping 259130 | Quantity 259132 | 0..1 259134 | Quantity 259136 |
| FulfillingDelivery 259138 | | | | FulfillingDelivery 259140 | | | 0..n 259142 | PurchaseRequestConfirmationItemFulfillingDelivery 259144 |
| | | | | | ID 259146 | | 1 259148 | BusinessTransactionDocumentID 259150 |
| | | | | | FulfilledIndicator 259154 | | 0..1 259156 | Indicator 259158 |

FIG. 259-7

| Package | level1 | level2 | level3 | level4 | level5 | | Cardinality | Datatype Name |
|---|---|---|---|---|---|---|---|---|
| | | | | | TypeCode 259160 | | 1 259162 | BusinessTransaction-DocumentTypeCode 259164 |
| FulfillingDeliveryItem 259166 | | | | | Item 259168 | | 1..n 259170 | PurchaseRequestConfirmationItemFulfillingDeliveryItem 259172 |
| | | | | | | ID 259174 | 1 259176 | BusinessTransaction-DocumentItemID 259178 |
| | | | | | | Quantity 259180 | 0..1 259182 | Quantity 259184 |

FIG. 259-8

| Package | level1 | level2 | level3 | level4 | level5 | | Cardinality | Datatype Name |
|---|---|---|---|---|---|---|---|---|
| BusinessDocumentObjectReference 259186 | | | | | | PurchaseOrderReference 259188 | 1 259190 | BusinessTransactionDocumentReference 259192 |
| FulfillingSupplierInvoice 259194 | | | | FulfillingSupplierInvoice 259196 | | | 0..n 259198 | PurchaseRequestConfirmationItemFulfillingSupplierInvoice 259200 |
| | | | | | ID 259202 | | 1 259204 | BusinessTransactionDocumentID 259206 |

FIG. 259-9

| Package | level1 | level2 | level3 | level4 | level5 | | Cardinality | Datatype Name |
|---|---|---|---|---|---|---|---|---|
| | | | | | TypeCode 259208 | | 1 259210 | BusinessTransactionDocumentTypeCode 259212 |
| | | | | | PostedIndicator 259216 | | 0..1 259218 | Indicator 259220 |
| FulfillingSupplierInvoiceItem 259222 | | | | | Item 259224 | | 1..n 259226 | PurchaseRequestConfirmationItemFulfillingSupplierInvoiceItem 259228 |

FIG. 259-10

| Package | level1 | level2 | level3 | level4 | level5 | | Cardinality | Datatype Name |
|---|---|---|---|---|---|---|---|---|
| | | | | | | ID 259230 | 1 259232 | BusinessTransactionDocumentItemID 259234 |
| | | | | | | Quantity 259236 | 0..1 259238 | Quantity 259240 |
| BusinessDocumentObjectReference 259242 | | | | | | PurchaseOrderReference 259244 | 1 259246 | BusinessTransactionDocumentReference 259248 |
| | | | | | | DeliveryReference 259250 | 0..1 259252 | BusinessTransactionDocumentReference 259254 |

FIG. 260-1

| Package | level1 | level2 | level3 | level4 | level5 | Cardinality | Datatype Name |
|---|---|---|---|---|---|---|---|
| PurchaseRequestNotification-Message 260000 | Pur-chaseRe questNo-tification Message 260002 | | | | | | Pur-chaseRe-quest-Message 260004 |
| MessageHeader 260006 | | Message-Header 260008 | | | | 1 260010 | Busi-nessDocu mentMes-sage-Header 260012 |
| PurchaseRequestNotifi-cation 260014 | | Pur-chaseRe-questNoti-fication 260016 | | | | 1 260018 | Pur-chaseRe-quest 260020 |
| | | | ID 260022 | | | 1 260024 | Business-Transac-tion-Documen-tID 260026 |

FIG. 260-2

| Package | | | | level1 | level2 | level3 | level4 | level5 | Cardinality | Datatype Name |
|---|---|---|---|---|---|---|---|---|---|---|
| | | | | | | UUID 260028 | | | 0..1 260030 | UUID 260032 |
| | | | | | | TypeCode 260034 | | | 0..1 260036 | Business-Transac-tionDocu-ment-TypeCode 260038 |
| | | | | | | Attrib-ute:recon ciliation-Period-Counter-Value 260040 | | | 0..1 260042 | Counter-Value 260044 |
| | | Party 260046 | | | | Seller-Party 260048 | | | 0..1 260050 | Business-Transac-tionDocu-mentParty 260052 |

FIG. 260-3

| Package | | | | level1 | level2 | level3 | level4 | level5 | Cardinality | Datatype Name |
|---|---|---|---|---|---|---|---|---|---|---|
| | | | | | | | Stan-dardID 260054 | | 0..n 260056 | PartyStandardID 260058 |
| | | | | | | | InternalID 260060 | | 0..1 260062 | Party-InternalID 260064 |
| | | | | | | | Address 260066 | | 0..1 260068 | Address 260070 |
| | | | | | | | Contact-Person 260072 | | 0..1 260074 | Contact-Person 260076 |
| | | | | | | | | InternalID 260078 | 0..n 260080 | Contact-PersonIn-ternalID 260082 |
| | | | | | | | | Address 260084 | 0..1 260086 | Address 260088 |

FIG. 260-4

| Package | | | | level1 | level2 | level3 | level4 | level5 | Cardinality | Datatype Name |
|---|---|---|---|---|---|---|---|---|---|---|
| | | | | | | Proposed-Seller-Party 260090 | | | 0..1 260092 | Business-Transac-tionDocu-mentParty 260094 |
| | | | | | | Service-Performer Party 260096 | | | 0..1 260098 | Business-Transac-tion-Document Party 260100 |
| | | | | | | Requestor Party 260102 | | | 0..1 260104 | Business-Transac-tionDocu-mentParty 260106 |
| | | | | | | Produc-tRecipi-entParty 260108 | | | 0..1 260110 | Business-Transac-tionDocu-mentParty 260112 |

FIG. 260-5

| Package | level1 | level2 | level3 | level4 | level5 | Cardinality | Datatype Name |
|---|---|---|---|---|---|---|---|
| Location 260114 | | | Ship-ToLoca-tion 260116 | | | 0..1 260118 | Business-Transac-tion-Document Location 260120 |
| | | | | Stan-dardID 260122 | | 0..1 260124 | Location-Stan-dardID 260126 |
| | | | | InternalID 260128 | | 0..1 260130 | Location-InternalID 260132 |
| | | | | Address 260134 | | 0..1 260136 | Address 260138 |
| Item 260140 | | | Item 260142 | | | 0..n 260144 | Pur-chaseRe-questItem 260146 |

FIG. 260-6

| Package | | | | level1 | level2 | level3 | level4 | level5 | Cardinality | Datatype Name |
|---|---|---|---|---|---|---|---|---|---|---|
| | | | | | | | ID 260148 | | 0..1 260150 | Business-Transac-tion-Documen-tItemID 260152 |
| | | | | | | | UUID 260154 | | 0..1 260156 | UUID 260158 |
| | | | | | | | TypeCode 260160 | | 0..1 260162 | Business-Transac-tion-Documen-tItem-TypeCode 260164 |
| | | | | | | | Hierar-chyRela-tionship 260166 | | 0..1 260168 | |

FIG. 260-7

| Package | | | | level1 | level2 | level3 | level4 | level5 | Cardinality | Datatype Name |
|---|---|---|---|---|---|---|---|---|---|---|
| | | | | | | | | ParentBaseBusinessTransactionDocumentItemID 260170 | 1 260172 | BusinessTransactionDocumentItemID 260174 |
| | | | | | | | | TypeCode 260176 | 1 260178 | BusinessTransactionDocumentItemHierarchyRelationshipTypeCode 260180 |

FIG. 260-8

| Package | | | | level1 | level2 | level3 | level4 | level5 | Cardinality | Datatype Name |
|---|---|---|---|---|---|---|---|---|---|---|
| | | | ProductIn-formation 260182 | | | | Product 260184 | | 0..1 260186 | Business-Transac-tionDocu-mentPro-duct 260188 |
| | | | | | | | | Stan-dardID 260190 | 0..n 260192 | Product-Stan-dardID 260194 |
| | | | | | | | | InternalID 260196 | 0..1 260198 | Product-InternalID 260200 |
| | | | | | | | | Type-Code 260202 | 0..1 260204 | Pro-ductType Code 260206 |
| | | | | | | | | Note 260208 | 0..1 260210 | Note 260212 |

FIG. 260-9

| Package | | | | level1 | level2 | level3 | level4 | level5 | Cardinality | Datatype Name |
|---|---|---|---|---|---|---|---|---|---|---|
| | | | | | | | Pro-ductCate-gory 260214 | | 0..1 260216 | Business-Transac-tionDocu-mentPro-ductCate-gory 260218 |
| | | | | | | | | Stan-dardID 260220 | 0..n 260222 | Pro-ductCate-goryStan-dardID 260224 |
| | | | | | | | | InternalID 260226 | 0..1 260228 | Pro-ductCate-goryInter-nalID 260230 |
| | | | PriceIn-formation 260232 | | | | Price 260234 | | 0..1 260236 | |

FIG. 260-10

| Package | | | | level1 | level2 | level3 | level4 | level5 | Cardinality | Datatype Name |
|---|---|---|---|---|---|---|---|---|---|---|
| | | | | | | | | ListUnit-Price 260238 | 0..1 260240 | Price 260242 |
| | | | | | | | CostUp-perLimi-tAmount 260244 | | 0..1 260246 | Amount 260248 |
| | | | | | | | CostUp-perLim-itExpect-edAmount 260250 | | 0..1 260252 | Amount 260254 |
| | | | Party 260256 | | | | Seller-Party 260258 | | 0..1 260260 | Business-Transac-tionDocu-mentParty 260262 |

FIG. 260-11

| Package | | | | level1 | level2 | level3 | level4 | level5 | Cardinality | Datatype Name |
|---|---|---|---|---|---|---|---|---|---|---|
| | | | | | | | Pro-posedSellerParty 260264 | | 0..1 260266 | Business-Transac-tionDocu-mentParty 260268 |
| | | | | | | | Service-Performer Party 260270 | | 0..1 260272 | Business-Transac-tionDocu-mentParty 260274 |
| | | | | | | | Requestor Party 260276 | | 0..1 260278 | Business-Transac-tionDocu-mentParty 260280 |

FIG. 260-12

| Package | | | | level1 | level2 | level3 | level4 | level5 | Cardinality | Datatype Name |
|---|---|---|---|---|---|---|---|---|---|---|
| | | | | | | | ProductRecipientParty 260282 | | 0..1 260284 | BusinessTransactionDocumentParty 260286 |
| | | | Location 260288 | | | | ShipToLocation 260290 | | 0..1 260292 | BusinessTransaction-Document Location 260294 |
| | | | BusinessDocumentObjectReference 260296 | | | | InternalRequestReference 260298 | | 0..1 260300 | BusinessTransaction-DocumentReference 260302 |

FIG. 260-13

| Package | | | | level1 | level2 | level3 | level4 | level5 | Cardinality | Datatype Name |
|---|---|---|---|---|---|---|---|---|---|---|
| | | | | | | | | ID 260304 | 1 260306 | Business-Transac-tion-Documen-tID 260308 |
| | | | | | | | | ItemID 260310 | 0..n 260312 | Business-Transac-tion-Documen-tItemID 260314 |
| | | | Account-ing 260316 | | | | Account-ingCod-ingBlock-Assign-ment 260318 | | 0..n 260320 | Account-ingCod-ingBlock-Assign-ment 260322 |
| | | | | | | | | Percent 260324 | 0..1 260326 | Percent 260328 |
| | | | | | | | | Amount 260330 | 0..1 260332 | Amount 260334 |

FIG. 260-14

| Package | | | | level1 | level2 | level3 | level4 | level5 | Cardinality | Datatype Name |
|---|---|---|---|---|---|---|---|---|---|---|
| | | | | | | | | Quantity 260336 | 0..1 260338 | Quantity 260340 |
| | | | | | | | | Accounting-Coding-Block 260342 | 1 260344 | Accounting-Coding-Block 260346 |
| | | | Attach-ment 260348 | | | | Attach-ment-Folder 260350 | | 0..1 260352 | Attach-ment-Folder 260354 |
| | | | Descrip-tion 260356 | | | | TextCol-lection 260358 | | 0..1 260360 | TextCol-lection 260362 |
| | | | | | | | Descrip-tion 260364 | | 0..1 260366 | SHORT_ Descrip-tion 260368 |

FIG. 260-15

| Package | | | | level1 | level2 | level3 | level4 | level5 | Cardinality | Datatype Name |
|---|---|---|---|---|---|---|---|---|---|---|
| | | | Sched-uleLine 260370 | | | | Sched-uleLine 260372 | | 1 260374 | Pur-chaseRe-questItem Sched-uleLine 260376 |
| | | | | | | | | Delivery-Period 260378 | 1 260380 | UPPERO PEN_LOC ALNORM ALISED_ DateTime Period 260382 |
| | | | | | | | | Quantity 260384 | 0..1 260386 | Quantity 260388 |
| | | | | | | | | Quanti-tyType-Code 260390 | 0..1 260392 | Quanti-tyType-Code 260394 |

FIG. 261-1

| Package | level1 | level2 | level3 | level4 | level5 | Cardinality | Datatype Name |
|---|---|---|---|---|---|---|---|
| PurchaseRequestMessage 261000 | PurchaseRequest Message 261002 | | | | | | PurchaseRequest-Message 261004 |
| MessageHeader 261006 | | Message Header 261008 | | | | 0..1 261010 | BusinessDocumentMessage-Header 261012 |
| PurchaseRequest 261014 | | PurchaseRequest 261016 | | | | 1 261018 | PurchaseRequest 261020 |
| | | | BaseBusiness-Transaction DocumentID 261022 | | | 1..2 261024 | BusinessTransaction-DocumentID 261026 |

FIG. 261-2

| Package | level1 | level2 | level3 | level4 | level5 | Cardi-nality | Datatype Name |
|---|---|---|---|---|---|---|---|
| | | | BaseBusiness-TransactionDocument-TypeCode 261028 | | | 0..1 261030 | BusinessTransaction-DocumentType-Code 261032 |
| | | | ReconciliationPeriodCounterValue 261034 | | | 0..1 261036 | Counter-Value 261038 |
| | | | Posting-DateTime 261040 | | | 0..1 261042 | GLOBAL_DateTime 261044 |
| | | | Note 261046 | | | 0..1 261048 | Note 261050 |
| | | | Name 261052 | | | 0..1 261054 | MEDIUM_Name 261056 |

FIG. 261-3

| Package | level1 | level2 | level3 | level4 | level5 | Cardi-nality | Datatype Name |
|---|---|---|---|---|---|---|---|
| Party 261058 | | | BuyerParty 261060 | | | 0..1 261062 | Business Transac-tion-DocumentParty 261064 |
| | | | | Stan-dardID 261066 | | 0..n 261068 | Par-tyStan-dardID 261070 |
| | | | | InternalID 261072 | | 0..1 261074 | Party-InternalID 261076 |
| | | | | Address 261078 | | 0..1 261080 | Address 261082 |
| | | | | Contact-Person 261084 | | 0..1 261086 | Contact-Person 261088 |
| | | | | | InternalID 261090 | 0..n 261092 | Contact-PersonIn-ternalID 261094 |

FIG. 261-4

| Package | | | | level1 | level2 | level3 | level4 | level5 | Cardi-nality | Datatype Name |
|---|---|---|---|---|---|---|---|---|---|---|
| | | | | | | | | Address 261096 | 0..1 261098 | Address 261100 |
| | | | | | | SellerParty 261102 | | | 0..1 261104 | Business Transac-tion-DocumentParty 261106 |
| | | | | | New 261108 | Vendor-Party 261110 | | | 0..1 261112 | Business Transac-tion-DocumentParty 261114 |
| | | | | | New 261116 | Proposed-SellerParty 261118 | | | 0..1 261120 | Business Transac-tion-DocumentParty 261122 |

FIG. 261-5

| Package | | | | level1 | level2 | level3 | level4 | level5 | Cardi-nality | Datatype Name |
|---|---|---|---|---|---|---|---|---|---|---|
| | | | | | New 261124 | Proposed-Vendor-Party 261126 | | | 0..1 261128 | Business Transac-tionDocu-ment-Party 261130 |
| | | | | | | ServicePer formerPart y 261132 | | | 0..1 261134 | Business Transac-tionDocu-ment-Party 261136 |
| | | | | | | Requestor-Party 261138 | | | 0..1 261140 | Business Transac-tionDocu-ment-Party 261142 |

FIG. 261-6

| Package | level1 | level2 | level3 | level4 | level5 | Cardinality | Datatype Name |
| --- | --- | --- | --- | --- | --- | --- | --- |
| | | | ProductRecipientParty 261144 | | | 0..1 261146 | BusinessTransactionDocumentParty 261148 |
| | | | ManufacturerParty 261150 | | | 0..1 261152 | BusinessTransactionDocumentParty 261154 |
| Location 261156 | | New 261158 | ReceivingLocation 261160 | | | 0..1 261162 | BusinessTransactionDocumentLocation 261164 |

FIG. 261-7

| Package | level1 | level2 | level3 | level4 | level5 | Cardinality | Datatype Name |
|---|---|---|---|---|---|---|---|
| | | | ShipToLocation 261166 | | | 0..1 261168 | BusinessTransactionDocumentLocation 261170 |
| | | | | StandardID 261172 | | 0..1 261174 | LocationStandardID 261176 |
| | | | | InternalID 261178 | | 0..1 261180 | LocationInternalID 261182 |
| | | | | Address 261184 | | 0..1 261186 | Address 261188 |

FIG. 261-8

| Package | | | | level1 | level2 | level3 | level4 | level5 | Cardinality | Datatype Name |
|---|---|---|---|---|---|---|---|---|---|---|
| | | | | | | ShipFromLocation 261190 | | | 0..1 261192 | BusinessTransactionDocumentLocation 261194 |
| | | Item 261196 | | | | Item 261198 | | | 0..n 261200 | PurchaseRequestItem 261202 |
| | | | | | | | BaseBusinessTransactionDocumentItemID 261204 | | 1..2 261206 | BusinessTransactionDocumentItemID 261208 |

FIG. 261-9

| Package | | | | level1 | level2 | level3 | level4 | level5 | Cardinality | Datatype Name |
|---|---|---|---|---|---|---|---|---|---|---|
| | | | | | | | ThirdPartyDealIndicator 261210 | | 0..1 261212 | BusinessTransactionDocumentItemThirdPartyDealIndicator 261214 |
| | | | | | | | DirectMaterialIndicator 261216 | | 0..1 261218 | DirectMaterialIndicator 261220 |
| | | | | | | | HierarchyRelationship 261222 | | 0..1 261224 | |

FIG. 261-10

| Package | | | | level1 | level2 | level3 | level4 | level5 | Cardinality | Datatype Name |
|---|---|---|---|---|---|---|---|---|---|---|
| | | | | | | | | ParentBaseBusinessTransactionDocumentItemID 261226 | 1 261228 | BusinessTransactionDocumentItemID 261230 |
| | | | | | | | | TypeCode 261232 | 1 261234 | BusinessTransactionDocumentItemHierarchyRelationshipTypeCode 261236 |

FIG. 261-11

| Package | level1 | level2 | level3 | level4 | level5 | Cardinality | Datatype Name |
|---|---|---|---|---|---|---|---|
| ProductInformation 261238 | | | | Product 261240 | | 0..1 261242 | BusinessTransactionDocumentProduct 261244 |
| | | | | | StandardID 261246 | 0..n 261248 | ProductStandardID 261250 |
| | | | | | InternalID 261252 | 0..1 261254 | ProductInternalID 261256 |
| | | | | | TypeCode 261258 | 0..1 261260 | ProductTypeCode 261262 |
| | | | | | Note 261264 | 0..1 261266 | Note 261268 |

FIG. 261-12

| Package | | | | level1 | level2 | level3 | level4 | level5 | Cardinality | Datatype Name |
|---|---|---|---|---|---|---|---|---|---|---|
| | | | | | | | ProductCategory 261270 | | 0..1 261272 | BusinessTransactionDocumentProductCategory 261274 |
| | | | | | | | | StandardID 261276 | 0..n 261278 | ProductCategoryStandardID 261280 |
| | | | | | | | | InternalID 261282 | 0..n 261284 | ProductCategoryInternalID 261286 |
| | | | PriceInformation 261288 | | | | Price 261290 | | 0..1 261292 | |
| | | | | | | | | ListUnitPrice 261294 | 0..1 261296 | Price 261298 |

FIG. 261-13

| Package | | | | level1 | level2 | level3 | level4 | level5 | Cardi-nality | Datatype Name |
|---|---|---|---|---|---|---|---|---|---|---|
| | | | | | | | | NetUnit-Price 261300 | 0..1 261302 | Price 261304 |
| | | | | | | | Procure-mentCos-tUpper-Limit 261306 | | 0..1 261308 | Procure-mentCos-tUpper-Limit 261310 |
| | | | Party 261312 | | | | Buyer-Party 261314 | | 0..1 261316 | Business Transac-tionDocu-ment-Party 261318 |
| | | | | | | | Seller-Party 261320 | | 0..1 261322 | Business Transac-tionDocu-ment-Party 261324 |

FIG. 261-14

| Package | level1 | level2 | level3 | level4 | level5 | Cardinality | Datatype Name |
|---|---|---|---|---|---|---|---|
| | | | | Vendor-Party 261326 | | 0..1 261328 | BusinessTransactionDocument-Party 261330 |
| | | | | ProposedSeller-Party 261332 | | 0..1 261334 | BusinessTransactionDocument-Party 261336 |
| | | | | ProposedVendor-Party 261338 | | 0..1 261340 | BusinessTransactionDocument-Party 261342 |

FIG. 261-15

| Package | | | | level1 | level2 | level3 | level4 | level5 | Cardinality | Datatype Name |
|---|---|---|---|---|---|---|---|---|---|---|
| | | | | | | | ServicePerformerParty 261344 | | 0..1 261346 | BusinessTransactionDocumentParty 261348 |
| | | | | | | | RequestorParty 261350 | | 0..1 261352 | BusinessTransactionDocumentParty 261354 |
| | | | | | | | ProductRecipientParty 261356 | | 0..1 261358 | BusinessTransactionDocumentParty 261360 |

FIG. 261-16

| Package | | | | level1 | level2 | level3 | level4 | level5 | Cardinality | Datatype Name |
|---|---|---|---|---|---|---|---|---|---|---|
| | | | | | | | ManufacturerParty 261362 | | 0..1 261364 | BusinessTransactionDocumentParty 261366 |
| | | | Location 261368 | | | | ReceivingLocation 261370 | | 0..1 261372 | BusinessTransactionDocumentLocation 261374 |
| | | | | | | | ShipToLocation 261376 | | 0..1 261378 | BusinessTransactionDocumentLocation 261380 |

FIG. 261-17

| Package | | | | level1 | level2 | level3 | level4 | level5 | Cardinality | Datatype Name |
|---|---|---|---|---|---|---|---|---|---|---|
| | | | | | | | ShipFromLocation 261382 | | 0..1 261384 | BusinessTransactionDocumentLocation 261386 |
| | | | BusinessDocumentObjectReference 261388 | | | | PurchasingContract Reference 261390 | | 0..1 261392 | BusinessTransactionDocumentReference 261394 |
| | | | | | | | OriginPurchaseOrder Reference 261396 | | 0..1 261398 | BusinessTransactionDocumentReference 261400 |

FIG. 261-18

| Package | | | | level1 | level2 | level3 | level4 | level5 | Cardi-nality | Datatype Name |
|---|---|---|---|---|---|---|---|---|---|---|
| | | | | | | | Projec-tRefer-ence 261402 | | 0..1 261404 | Projec-tRefer-ence 261406 |
| | | | | | | | Projec-tElemen-tAssign-ment 261408 | | 0..1 261410 | Projec-tElemen-tAssign-ment 261412 |
| | | | | | | | | FromPro-jectRefer-ence 261414 | 1 261416 | Projec-tRefer-ence 261418 |
| | | | | | | | | ToProjec-tRefer-ence 261420 | 1 261422 | Projec-tRefer-ence 261424 |
| | | | Accounting 261426 | | | | Amoun-tAccount-ingOb-jectSe-tAssign-ment 261428 | | 0..n 261430 | Amoun-tAccount-ingOb-jectSe-tAssign-ment 261432 |

FIG. 261-19

| Package | | | | level1 | level2 | level3 | level4 | level5 | Cardinality | Datatype Name |
|---|---|---|---|---|---|---|---|---|---|---|
| | | | | | | | | Percent 261434 | 0..1 261436 | Percent 261438 |
| | | | | | | | | Amount 261440 | 0..1 261442 | Amount 261444 |
| | | | | | | | | Quantity 261446 | 0..1 261448 | Quantity 261450 |
| | | | | | | | | AccountingObjectSet 261452 | 1 261454 | AccountingObjectSet 261456 |
| | | | Attachment 261458 | | | | AttachmentWebAddress 261460 | | 0..n 261462 | AttachmentWebAddress 261464 |
| | | | Description 261466 | | | | Description 261468 | | 0..1 261470 | Description 261472 |
| | | | | | | | InternalDescription 261474 | | 0..1 261476 | Description 261478 |

FIG. 261-20

| Package | level1 | level2 | level3 | level4 | level5 | Cardinality | Datatype Name |
|---|---|---|---|---|---|---|---|
| ScheduleLine 261480 | | | | ScheduleLine 261482 | | 1 261484 | PurchaseRequestItemScheduleLine 261486 |
| | | | | | DeliveryPeriod 261488 | 1 261490 | DateTime Period 261492 |
| | | | | | Quantity 261494 | 0..1 261496 | Quantity 261498 |

QuoteMessage

| Package | level1 | level2 | level3 | level4 | level5 | Cardinality | Datatype Name |
|---|---|---|---|---|---|---|---|
| RFQMessage 268000 | FormRFQMessage 268002 | | | | | | FormRFQ Message 268004 |
| MessageHeader 268006 | | Mes-sageHead er 268008 | | | | 1 268010 | Business-Docu-mentMes-sage-Header 268012 |
| RFQ 268014 | | RFQ 268016 | | | | 1 268018 | FormRFQ 268020 |
| | | | Attrib-ute:reconc iliationPe-riodCoun-terValue 268022 | | | 0..1 268024 | Recon-ciliation-Period-Counter-Value 268026 |

FIG. 268-2

| Package | level1 | level2 | level3 | level4 | level5 | Cardinality | Datatype Name |
|---|---|---|---|---|---|---|---|
| | | | ID 268028 | | | 1 268030 | Business-Transac-tion-Documen-tID 268032 |
| | | | Last-Change-DateTime 268034 | | | 0..1 268036 | GLOBAL_ DateTime 268038 |
| | | | Bidding-Start-DateTime 268040 | | | 0..1 268042 | LOCALN ORMALIS ED_DateT ime 268044 |
| | | | QuoteSub mission-DateTime 268046 | | | 1 268048 | LOCALN ORMALIS ED_DateT ime 268050 |

FIG. 268-3

| Package | level1 | level2 | level3 | level4 | level5 | Cardinality | Datatype Name |
|---|---|---|---|---|---|---|---|
| | | | QuoteOpening-DateTime 268052 | | | 0..1 268054 | LOCALNORMALISED_DateTime 268056 |
| | | | Quote-Binding-DateTime 268058 | | | 0..1 268060 | LOCALNORMALISED_DateTime 268062 |
| | | | Contract-Valid-ityPeriod 268064 | | | 0..1 268066 | UPPEROPEN_GLOBAL_DateTimePe-riod 268068 |
| | | | Name 268070 | | | 0..1 268072 | MEDIUM_Name 268074 |

FIG. 268-4

| Package | level1 | level2 | level3 | level4 | level5 | Cardinality | Datatype Name |
|---|---|---|---|---|---|---|---|
| | | | RFQPublicIndicator 268076 | | | 1 268078 | Indicator 268080 |
| | | | QuoteChangeAllowedIndicator 268082 | | | 0..1 268084 | Indicator 268086 |
| | | | QuoteUnplannedItemPermissionCode 268088 | | | 0..1 268090 | UnplannedItemPermissionCode 268092 |
| | | | QuoteUnplannedItemPermissionName 268094 | | | 0..1 268096 | Name 268098 |

FIG. 268-5

| Package | level1 | level2 | level3 | level4 | level5 | Cardinality | Datatype Name |
|---|---|---|---|---|---|---|---|
| | | | PriceDetailLevelCode 268100 | | | 0..1 268102 | PriceDetailLevelCode 268104 |
| | | | PriceDetailLevelName 268106 | | | 0..1 268108 | Name 268110 |
| | | | QuantityChangeAllowedIndicator 268112 | | | 0..1 268114 | Indicator 268116 |
| | | | BidOnAllItemsRequiredIndicator 268118 | | | 0..1 268120 | Indicator 268122 |
| | | | QuoteBindingIndicator 268124 | | | 0..1 268126 | Indicator 268128 |

FIG. 268-6

| Package | level1 | level2 | level3 | level4 | level5 | Cardinality | Datatype Name |
|---|---|---|---|---|---|---|---|
| | | | Follow-UpQuoteRequire-mentCode 268130 | | | 0..1 268132 | Follow-UpBusi-ness-Transac-tion-Documen-tRequire-mentCode 268134 |
| | | | Follow-UpQuoteRequire-ment-Name 268136 | | | 0..1 268138 | Name 268140 |
| | | | Request-edQuote-Cur-rencyCode 268142 | | | 1..n 268144 | Currency-Code 268146 |

FIG. 268-7

| Package | level1 | level2 | level3 | level4 | level5 | Cardinality | Datatype Name |
|---|---|---|---|---|---|---|---|
| | | | Con-tractTar-getA-mount 268148 | | | 0..1 268150 | Amount 268152 |
| Party 268154 | | | Buyer-Party 268156 | | | 0..1 268158 | Form-Business-Transac-tionDocu-mentParty 268160 |
| | | | | Stan-dardID 268162 | | 0..n 268164 | PartyStan-dardID 268166 |
| | | | | BuyerID 268168 | | 0..1 268170 | Party-PartyID 268172 |
| | | | | BidderID 268174 | | 0..1 268176 | Party-PartyID 268178 |

FIG. 268-8

| Package | level1 | level2 | level3 | level4 | level5 | Cardinality | Datatype Name |
|---|---|---|---|---|---|---|---|
| | | | | Address 268180 | | 0..1 268182 | Address 268184 |
| | | | | Formatte-dAdress 268186 | | 0..1 268188 | Formatte-dAddress 268190 |
| | | | | Contact-Person 268192 | | 0..1 268194 | FormCon-tactPer-son 268196 |
| | | | | | BuyerID 268198 | 0..1 268200 | Contact-Person-PartyId 268202 |
| | | | | | BidderID 268204 | 0..1 268206 | Contact-Person-PartyId 268208 |
| | | | | | Address 268210 | 0..1 268212 | Address 268214 |

FIG. 268-9

| Package | level1 | level2 | level3 | level4 | level5 | Cardinality | Datatype Name |
|---|---|---|---|---|---|---|---|
| | | | | | Formatte-dAdress 268216 | 0..1 268218 | Formatte-dAddress 268220 |
| | | | Bidder-Party 268222 | | | 0..1 268224 | Form-Business-Transac-tionDocu-mentParty 268226 |
| | | | Produc-tRecipi-entParty 268228 | | | 0..1 268230 | Form-Business-Transac-tionDocu-mentParty 268232 |

FIG. 268-10

| Package | level1 | level2 | level3 | level4 | level5 | Cardinality | Datatype Name |
|---|---|---|---|---|---|---|---|
| | | | ServicePerformerParty 268234 | | | 0..1 268236 | FormBusinessTransactionDocumentParty 268238 |
| | | | EmployeeResponsible 268240 | | | 0..1 268242 | FormBusinessTransactionDocumentParty 268244 |
| Location 268246 | | | ShipToLocation 268248 | | | 0..1 268250 | FormBusinessTransactionDocumentLocation 268252 |

FIG. 268-11

| Package | level1 | level2 | level3 | level4 | level5 | Cardinality | Datatype Name |
|---|---|---|---|---|---|---|---|
| | | | | Stan-dardID 268254 | | 0..n 268256 | Location-Stan-dardId 268258 |
| | | | | BuyerID 268260 | | 0..1 268262 | Location-PartyId 268264 |
| | | | | BidderID 268266 | | 0..1 268268 | Location-PartyId 268270 |
| | | | | Address 268272 | | 0..1 268274 | Address 268276 |
| | | | | Formatte-dAdress 268278 | | 0..1 268280 | Formatte-dAddress 268282 |

FIG. 268-12

| Package | level1 | level2 | level3 | level4 | level5 | Cardinality | Datatype Name |
|---|---|---|---|---|---|---|---|
| | | | ReceivingSite 268284 | | | 0..1 268286 | FormBusinessTransactionDocumentLocation 268288 |
| | | | ContractReleaseAuthorisedLocation 268290 | | | 0..n 268292 | FormBusinessTransactionDocumentLocation 268294 |

FIG. 268-13

| Package | level1 | level2 | level3 | level4 | level5 | Cardinality | Datatype Name |
|---|---|---|---|---|---|---|---|
| ProductInformation 268296 | | | ProductCategory 268298 | | | 0..1 268300 | FormBusinessTransactionDocumentProductCategory 268302 |
| | | | | StandardID 268304 | | 0..n 268306 | ProductCategoryStandardID 268308 |
| | | | | BuyerID 268310 | | 0..1 268312 | ProductCategory-PartyID 268314 |

FIG. 268-14

| Package | level1 | level2 | level3 | level4 | level5 | Cardinality | Datatype Name |
|---|---|---|---|---|---|---|---|
| | | | | BidderID 268316 | | 0..1 268318 | Pro-ductCate-gory-PartyID 268320 |
| | | | | Descrip-tion 268322 | | 0..1 268324 | Descrip-tion 268326 |
| BusinessTransaction DocumentReference 268328 | | | QuoteRef erence 268330 | | | 0..1 268332 | Business-Transac-tion-Documen-tRefer-ence 268334 |
| | | | | ID 268336 | | 1 268338 | Business-Transac-tion-Documen-tID 268340 |

FIG. 268-15

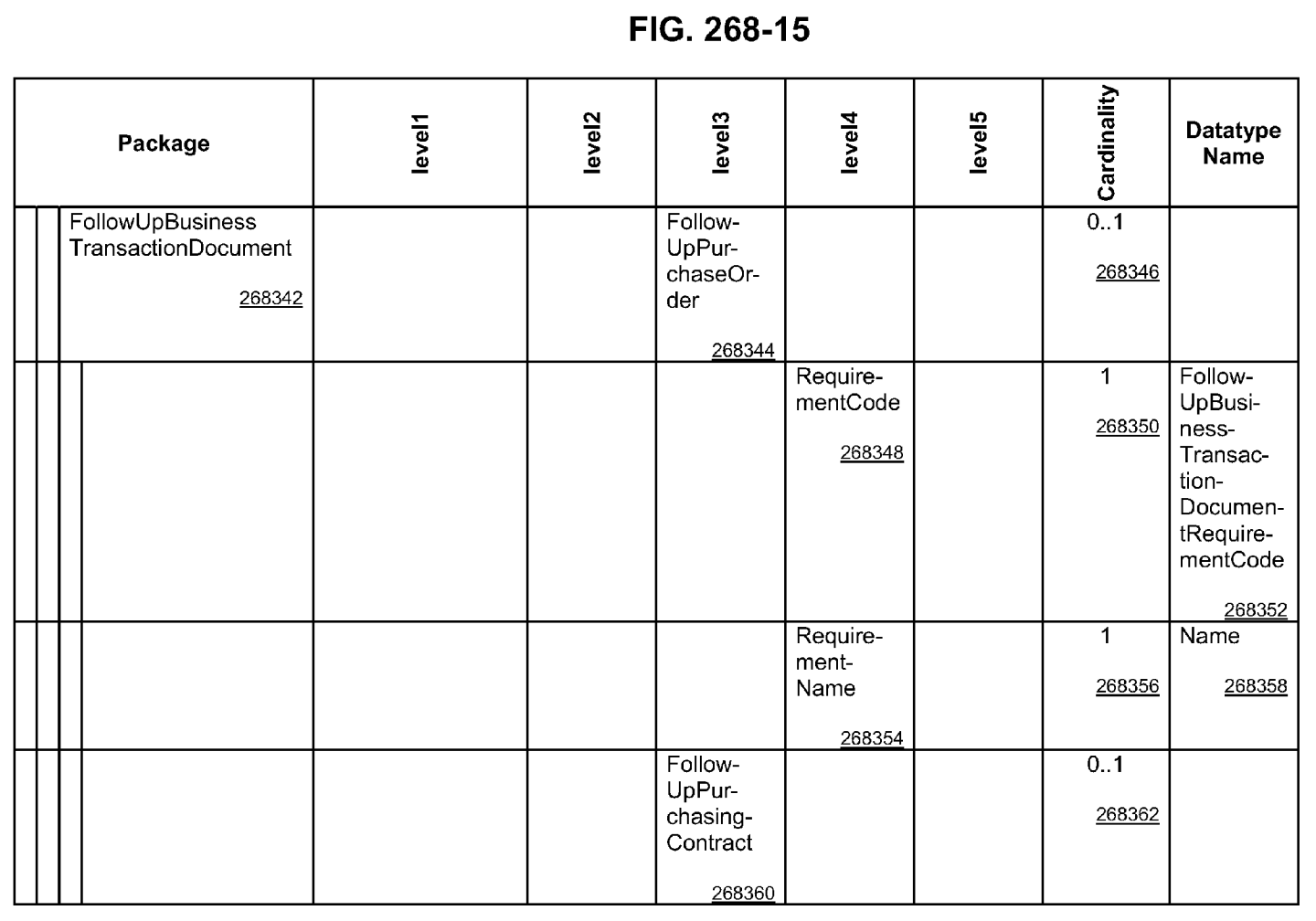

| Package | level1 | level2 | level3 | level4 | level5 | Cardinality | Datatype Name |
|---|---|---|---|---|---|---|---|
| FollowUpBusiness TransactionDocument 268342 | | | Follow-UpPur-chaseOr-der 268344 | | | 0..1 268346 | |
| | | | | Require-mentCode 268348 | | 1 268350 | Follow-UpBusi-ness-Transac-tion-Documen-tRequire-mentCode 268352 |
| | | | | Require-ment-Name 268354 | | 1 268356 | Name 268358 |
| | | | Follow-UpPur-chasing-Contract 268360 | | | 0..1 268362 | |

FIG. 268-16

| Package | level1 | level2 | level3 | level4 | level5 | Cardinality | Datatype Name |
|---|---|---|---|---|---|---|---|
| | | | | RequirementCode 268364 | | 1 268366 | FollowUpBusinessTransactionDocumentRequirementCode 268368 |
| | | | | RequirementName 268370 | | 1 268372 | Name 268374 |
| Attachment 268376 | | | AttachmentFolder 268378 | | | 0..1 268380 | AttachmentFolder 268382 |
| Description 268384 | | | TextCollection 268386 | | | 0..1 268388 | TextCollection 268390 |

FIG. 268-17

| Package | level1 | level2 | level3 | level4 | level5 | Cardinality | Datatype Name |
|---|---|---|---|---|---|---|---|
| Item 268392 | | | Item 268394 | | | 0..n 268396 | FormRFQItem 268398 |
| | | | | ID 268400 | | 1 268402 | BusinessTransactionDocumentItemID 268404 |
| | | | | ContractTargetAmount 268406 | | 0..1 268408 | Amount 268410 |
| | | | | HierarchyRelationship 268412 | | 0..1 268414 | |

FIG. 268-18

| Package | level1 | level2 | level3 | level4 | level5 | Cardinality | Datatype Name |
|---|---|---|---|---|---|---|---|
| | | | | | ParentItemID 268416 | 1 268418 | BusinessTransactionDocumentItemID 268420 |
| | | | | | TypeCode 268422 | 1 268424 | BusinessTransactionDocumentItemHierarchyRelationshipTypeCode 268426 |
| ProductInformation 268428 | | | | Product 268430 | | 0..1 268432 | FormBusinessTransactionDocumentProduct 268434 |

FIG. 268-19

| Package | level1 | level2 | level3 | level4 | level5 | Cardinality | Datatype Name |
|---|---|---|---|---|---|---|---|
| | | | | | Stan-dardID 268436 | 0..n 268438 | Product-Stan-dardID 268440 |
| | | | | | BuyerID 268442 | 0..1 268444 | Product-PartyID 268446 |
| | | | | | BidderID 268448 | 0..1 268450 | Product-PartyID 268452 |
| | | | | | Manufac-turerID 268454 | 0..1 268456 | Product-PartyID 268458 |
| | | | | | TypeCode 268460 | 0..1 268462 | Pro-ductType-Code 268464 |
| | | | | | TypeNam e 268466 | 0..1 268468 | Name 268470 |

FIG. 268-20

| Package | level1 | level2 | level3 | level4 | level5 | Cardinality | Datatype Name |
|---|---|---|---|---|---|---|---|
| | | | | ProductCategory 268472 | | 0..1 268474 | FormBusinessTransactionDocumentProductCategory 268476 |
| | | | | | StandardID 268478 | 0..n 268480 | ProductCategoryStandardID 268482 |
| | | | | | BuyerID 268484 | 0..1 268486 | ProductCategoryPartyID 268488 |

FIG. 268-21

| Package | level1 | level2 | level3 | level4 | level5 | Cardinality | Datatype Name |
|---|---|---|---|---|---|---|---|
| | | | | | BidderID 268490 | 0..1 268492 | Pro-ductCate-gory-PartyID 268494 |
| | | | | | Descrip-tion 268496 | 0..1 268498 | Descrip-tion 268500 |
| Party 268502 | | | | Produc-tRecipi-entParty 268504 | | 0..1 268506 | Form-Business-Transac-tionDocu-mentParty 268508 |
| | | | | Service-Performer Party 268510 | | 0..1 268512 | Form-Business-Transac-tionDocu-mentParty 268514 |

FIG. 268-22

| Package | level1 | level2 | level3 | level4 | level5 | Cardinality | Datatype Name |
|---|---|---|---|---|---|---|---|
| Location 268516 | | | | Ship-ToLocation 268518 | | 0..1 268520 | Form-Business-TransactionDocumentLocation 268522 |
| | | | | | Stan-dardID 268524 | 0..n 268526 | Location-Stan-dardId 268528 |
| | | | | | BuyerID 268530 | 0..1 268532 | Location-PartyId 268534 |
| | | | | | BidderID 268536 | 0..1 268538 | Location-PartyId 268540 |
| | | | | | Address 268542 | 0..1 268544 | Address 268546 |

FIG. 268-23

| Package | level1 | level2 | level3 | level4 | level5 | Cardinality | Datatype Name |
|---|---|---|---|---|---|---|---|
| | | | | | Formatte-dAdress 268548 | 0..1 268550 | Formatte-dAddress 268552 |
| | | | | Receiv-ingSite 268554 | | 0..1 268556 | Form-Business-Transac-tionDocu-mentLoca-tion 268558 |
| BusinessTransaction DocumentReference 268560 | | | | QuoteRef erence 268562 | | 0..1 268564 | Business-Transac-tion-Documen-tRefer-ence 268566 |

FIG. 268-24

| Package | level1 | level2 | level3 | level4 | level5 | Cardinality | Datatype Name |
|---|---|---|---|---|---|---|---|
| | | | | | ID 268568 | 1 268570 | Business-Transac-tion-Documen-tID 268572 |
| | | | | | ItemID 268574 | 0..n 268576 | Business-Transac-tion-Documen-tItemID 268578 |
| | | | | Purchas-ingCon-trac-tReferenc e 268580 | | 0..1 268582 | Business-Transac-tion-Documen-tRefer-ence 268584 |

FIG. 268-25

| Package | level1 | level2 | level3 | level4 | level5 | Cardinality | Datatype Name |
|---|---|---|---|---|---|---|---|
| | | | | | ID 268586 | 1 268588 | Business-Transac-tion-Documen-tID 268590 |
| | | | | | ItemID 268592 | 0..n 268594 | Business-Transac-tion-Documen-tItemID 268596 |
| | | | | BuyerPro-ductCata-logueRefe rence 268598 | | 0..1 268600 | Cata-logueRefe rence 268602 |
| | | | | | ID 268604 | 1 268606 | Cata-logueID 268608 |

FIG. 268-26

| Package | level1 | level2 | level3 | level4 | level5 | Cardinality | Datatype Name |
|---|---|---|---|---|---|---|---|
| | | | | | ItemID 268610 | 0..1 268612 | Cata-logueItemID 268614 |
| Attachment 268616 | | | | Attach-ment-Folder 268618 | | 0..1 268620 | Attach-ment-Folder 268622 |
| Description 268624 | | | | Descrip-tion 268626 | | 0..1 268628 | Descrip-tion 268630 |
| | | | | TextCol-lection 268632 | | 0..1 268634 | TextCol-lection 268636 |
| ScheduleLine 268638 | | | | Sched-uleLine 268640 | | 0..1 268642 | FormRFQItemScheduleLine 268644 |

FIG. 268-27

| Package | level1 | level2 | level3 | level4 | level5 | Cardinality | Datatype Name |
|---|---|---|---|---|---|---|---|
| | | | | | Delivery-Period 268646 | 0..1 268648 | UPPEROPEN_LOCALNORMALISED_DateTimePeriod 268650 |
| | | | | | Quantity 268652 | 0..1 268654 | Quantity 268656 |
| | | | | | Quantity-Measure-UnitName 268658 | 0..1 268660 | Name 268662 |
| | | | | | Quanti-tyType-Code 268664 | 0..1 268666 | Quanti-tyType-Code 268668 |
| | | | | | Quanti-tyTypeName 268670 | 0..1 268672 | Name 268674 |

FIG. 269-1

| Package | level1 | level2 | level3 | level4 | level5 | Cardinality | Datatype Name |
|---|---|---|---|---|---|---|---|
| RFQResultMessage 269000 | FormRFQResultMessage 269002 | | | | | | FormRFQResult-Message 269004 |
| MessageHeader 269006 | | Message-Header 269008 | | | | 1 269010 | Business-DocumentMessageHeader 269012 |
| RFQResult 269014 | | RFQResult 269016 | | | | 1 269018 | FormRFQ Result 269020 |
| | | | Attribute:reconciliation-Period-Counter-Value 269022 | | | 0..1 269024 | Counter-Value 269026 |

FIG. 269-2

| Package | | | | | level1 | level2 | level3 | level4 | level5 | Cardinality | Datatype Name |
|---|---|---|---|---|---|---|---|---|---|---|---|
| | | | | | | | ID 269028 | | | 1 269030 | Busi-nessTransaction-DocumentID 269032 |
| | | | | | | | Posting-DateTime 269034 | | | 0..1 269036 | GLOBAL_DateTime 269038 |
| | | | | | | | QuoteA-warding-Status-Code 269040 | | | 0..1 269042 | Supplier-QuoteA-warding-Status-Code 269044 |
| | | | | | | | QuoteA-warding-Status-Name 269046 | | | 0..1 269048 | Name 269050 |

FIG. 269-3

| Package | level1 | level2 | level3 | level4 | level5 | Cardinality | Datatype Name |
|---|---|---|---|---|---|---|---|
| Party 269052 | | | Bidder-Party 269054 | | | 0..1 269056 | FormBusiness-Transac-tionDocu-ment-Party 269058 |
| | | | Employ-eeRe-sponsible 269060 | | | 0..1 269062 | FormBusinessTransaction-Docu-ment-Party 269064 |
| Description 269066 | | | TextCol-lection 269068 | | | 0..1 269070 | TextCol-lection 269072 |

FIG. 269-4

| Package | level1 | level2 | level3 | level4 | level5 | Cardinality | Datatype Name |
|---|---|---|---|---|---|---|---|
| Item 269074 | | | Item 269076 | | | 0..n 269078 | FormRFQ Re-sultItem 269080 |
| | | | | ID 269082 | | 0..1 269084 | Business-Transac-tionDocu-men-tItemID 269086 |
| | | | | Hierar-chyRela-tionship 269088 | | 0..1 269090 | |

FIG. 269-5

| Package | | | | level1 | level2 | level3 | level4 | level5 | Cardinality | Datatype Name |
|---|---|---|---|---|---|---|---|---|---|---|
| | | | | | | | | ParentItemID 269092 | 1 269094 | BusinessTransactionDocumentItemID 269096 |
| | | | | | | | | TypeCode 269098 | 1 269100 | BusinessTransactionDocumentItemHierarchyRelationshipTypeCode 269102 |

FIG. 269-6

| Package | level1 | level2 | level3 | level4 | level5 | Cardinality | Datatype Name |
|---|---|---|---|---|---|---|---|
| ProductInformation 269104 | | | | Product 269106 | | 0..1 269108 | FormBusiness-Transac-tionDocu-mentPro-duct 269110 |
| | | | | | Stan-dardID 269112 | 0..n 269114 | Product-Stan-dardID 269116 |
| | | | | | BuyerID 269118 | 0..1 269120 | Product-PartyID 269122 |
| | | | | | BidderID 269124 | 0..1 269126 | Product-PartyID 269128 |

FIG. 269-7

| Package | level1 | level2 | level3 | level4 | level5 | Cardinality | Datatype Name |
|---|---|---|---|---|---|---|---|
| | | | | | TypeCode 269130 | 0..1 269132 | ProductType Code 269134 |
| | | | | | TypeName 269136 | 0..1 269138 | Name 269140 |
| | | | | ProductCategory 269142 | | 0..1 269144 | FormBusiness-TransactionDocumentProductCategory 269146 |
| | | | | | StandardID 269148 | 0..n 269150 | ProductCategoryStandardID 269152 |

FIG. 269-8

| Package | | | | level1 | level2 | level3 | level4 | level5 | Cardinality | Datatype Name |
|---|---|---|---|---|---|---|---|---|---|---|
| | | | | | | | | BuyerID 269154 | 0..1 269156 | ProductCategory-PartyID 269158 |
| | | | | | | | | BidderID 269160 | 0..1 269162 | ProductCategory-PartyID 269164 |
| | | | | | | | | Description 269166 | 0..1 269168 | Description 269170 |
| | | | BusinessTransaction DocumentReference 269172 | | | | QuoteReference 269174 | | 0..1 269176 | BusinessTransactionDocumentReference 269178 |

FIG. 269-9

| Package | level1 | level2 | level3 | level4 | level5 | Cardinality | Datatype Name |
|---|---|---|---|---|---|---|---|
| | | | | | ID 269180 | 1 269182 | BusinessTransactionDocumentID 269184 |
| | | | | | ItemID 269186 | 0..n 269188 | BusinessTransactionDocumentItemID 269190 |
| Description 269192 | | | | Description 269194 | | 0..1 269196 | Description 269198 |
| ScheduleLine 269200 | | | | ScheduleLine 269202 | | 0..1 269204 | FormRFQResultItemScheduleLine 269206 |

FIG. 269-10

| Package | level1 | level2 | level3 | level4 | level5 | Cardinality | Datatype Name |
|---|---|---|---|---|---|---|---|
| | | | | | Delivery-Period 269208 | 0..1 269210 | UPPEROPEN_LOCALNORMALISED_DateTimePeriod 269212 |
| | | | | | Quantity 269214 | 0..1 269216 | Quantity 269218 |
| | | | | | Quantity-Measure-UnitName 269220 | 0..1 269222 | Name 269224 |
| | | | | | Quanti-tyType-Code 269226 | 0..1 269228 | Quanti-tyType-Code 269230 |
| | | | | | Quanti-tyTypeName 269232 | 0..1 269234 | Name 269236 |

FIG. 270-1

| Package | level1 | level2 | level3 | level4 | level5 | Cardinality | Datatype Name |
|---|---|---|---|---|---|---|---|
| RFQMessage 270000 | InteractiveFormRFQMessage 270002 | | | | | | InteractiveFormRFQMessage 270004 |
| MessageHeader 270006 | | MessageHeader 270008 | | | | 1 270010 | BusinessDocumentMessageHeader 270012 |
| | | InteractiveFormReturnURI 270014 | | | | 0..1 270016 | URI 270018 |
| RFQ 270020 | | RFQ 270022 | | | | 1 270024 | InteractiveFormRFQ 270026 |

FIG. 270-2

| Package | level1 | level2 | level3 | level4 | level5 | Cardinality | Datatype Name |
|---|---|---|---|---|---|---|---|
| | | | Attrib-ute:reconciliation-Period-Counter-Value 270028 | | | 0..1 270030 | Recon-ciliation-Period-Counter-Value 270032 |
| | | | ID 270034 | | | 1 270036 | Business-Transac-tion-Documen-tID 270038 |
| | | | Last-Change-DateTime 270040 | | | 0..1 270042 | GLOBAL_DateTime 270044 |
| | | | Bidding-Start-DateTime 270046 | | | 0..1 270048 | LOCALNORMALISED_DateTime 270050 |

FIG. 270-3

| Package | level1 | level2 | level3 | level4 | level5 | Cardinality | Datatype Name |
|---|---|---|---|---|---|---|---|
| | | | QuoteSubmission-DateTime 270052 | | | 1 270054 | LOCALNORMALISED_DateTime 270056 |
| | | | QuoteOpening-DateTime 270058 | | | 0..1 270060 | LOCALNORMALISED_DateTime 270062 |
| | | | Quote-Binding-DateTime 270064 | | | 0..1 270066 | LOCALNORMALISED_DateTime 270068 |
| | | | Contract-Valid-ityPeriod 270070 | | | 0..1 270072 | UPPEROPEN_GLOBAL_DateTimePe-riod 270074 |

FIG. 270-4

| Package | level1 | level2 | level3 | level4 | level5 | Cardinality | Datatype Name |
|---|---|---|---|---|---|---|---|
| | | | Name 270076 | | | 0..1 270078 | MEDIUM_ Name 270080 |
| | | | RFQPub- licIndica- tor 270082 | | | 1 270084 | Indicator 270086 |
| | | | Quote- ChangeAl lowedIn- dicator 270088 | | | 0..1 270090 | Indicator 270092 |
| | | | Quote- Unplanne dItemPer- mission- Code 270094 | | | 0..1 270096 | Un- planned- ItemPer- mission- Code 270098 |

FIG. 270-5

| Package | level1 | level2 | level3 | level4 | level5 | Cardinality | Datatype Name |
| --- | --- | --- | --- | --- | --- | --- | --- |
| | | | Quote-UnplannedItemPermission-Name 270100 | | | 0..1 270102 | Name 270104 |
| | | | PriceDetailLevel-Code 270106 | | | 0..1 270108 | PriceDetailLevel-Code 270110 |
| | | | PriceDetailLevel-Name 270112 | | | 0..1 270114 | Name 270116 |
| | | | QuantityChange Allowed-Indicator 270118 | | | 0..1 270120 | Indicator 270122 |

FIG. 270-6

| Package | level1 | level2 | level3 | level4 | level5 | Cardinality | Datatype Name |
|---|---|---|---|---|---|---|---|
| | | | BidOnAl-lItemsRe quiredIn-dicator 270124 | | | 0..1 270126 | Indicator 270128 |
| | | | Quote-Bindin-gIndicator 270130 | | | 0..1 270132 | Indicator 270134 |
| | | | Follow-UpQuote Require-ment-Code 270136 | | | 0..1 270138 | Follow-UpBusi-ness-Transac-tion-Documen-tRequire-mentCode 270140 |

FIG. 270-7

| Package | level1 | level2 | level3 | level4 | level5 | Cardinality | Datatype Name |
|---|---|---|---|---|---|---|---|
| | | | Follow-UpQuote Require-ment-Name 270142 | | | 0..1 270144 | Name 270146 |
| | | | Request-ed-QuoteCurrencyCode 270148 | | | 1..n 270150 | Cur-rencyCode 270152 |
| | | | Con-tractTar-getA-mount 270154 | | | 0..1 270156 | Amount 270158 |
| | | | Quote-Con-tractTar-getA-mount 270160 | | | 0..1 270162 | Amount 270164 |

FIG. 270-8

| Package | level1 | level2 | level3 | level4 | level5 | Cardinality | Datatype Name |
|---|---|---|---|---|---|---|---|
| Party 270166 | | | Buyer-Party 270168 | | | 0..1 270170 | Form-Business-Transac-tion-Document Party 270172 |
| | | | | Stan-dardID 270174 | | 0..n 270176 | Par-tyStandar dID 270178 |
| | | | | BuyerID 270180 | | 0..1 270182 | Party-PartyID 270184 |
| | | | | BidderID 270186 | | 0..1 270188 | Party-PartyID 270190 |
| | | | | Address 270192 | | 0..1 270194 | Address 270196 |
| | | | | Formatte-dAdress 270198 | | 0..1 270200 | Formatte-dAddress 270202 |

FIG. 270-9

| Package | level1 | level2 | level3 | level4 | level5 | Cardinality | Datatype Name |
|---|---|---|---|---|---|---|---|
| | | | | Contact-Person 270204 | | 0..1 270206 | FormCon-tactPer-son 270208 |
| | | | | | BuyerID 270210 | 0..1 270212 | Contact-Person-PartyId 270214 |
| | | | | | BidderID 270216 | 0..1 270218 | Contact-Person-PartyId 270220 |
| | | | | | Address 270222 | 0..1 270224 | Address 270226 |
| | | | | | Formatte-dAdress 270228 | 0..1 270230 | Formatte-dAddress 270232 |

FIG. 270-10

| Package | level1 | level2 | level3 | level4 | level5 | Cardinality | Datatype Name |
|---|---|---|---|---|---|---|---|
| | | | Bidder-Party 270234 | | | 0..1 270236 | Form-Business-Transac-tion-Document Party 270238 |
| | | | Produc-tRecipi-entParty 270240 | | | 0..1 270242 | Form-Business-Transac-tion-Document Party 270244 |
| | | | Service-Performer Party 270246 | | | 0..1 270248 | Form-Business-Transac-tion-Document Party 270250 |

FIG. 270-11

| Package | level1 | level2 | level3 | level4 | level5 | Cardinality | Datatype Name |
|---|---|---|---|---|---|---|---|
| | | | Employ-eeRe-sponsible 270252 | | | 0..1 270254 | Form-Business-Transac-tionDocu-mentParty 270256 |
| Location 270258 | | | Ship-ToLoca-tion 270260 | | | 0..1 270262 | Form-Business-Transac-tion-Document Location 270264 |
| | | | | Stan-dardID 270266 | | 0..n 270268 | Location-Stan-dardId 270270 |
| | | | | BuyerID 270272 | | 0..1 270274 | Location-PartyId 270276 |

FIG. 270-12

| Package | level1 | level2 | level3 | level4 | level5 | Cardinality | Datatype Name |
|---|---|---|---|---|---|---|---|
| | | | | BidderID 270278 | | 0..1 270280 | Location-PartyId 270282 |
| | | | | Address 270284 | | 0..1 270286 | Address 270288 |
| | | | | Formatte-dAdress 270290 | | 0..1 270292 | Formatte-dAddress 270294 |
| | | | Receiv-ingSite 270296 | | | 0..1 270298 | Form-Business-Transac-tion-Document Location 270300 |
| | | | Contrac-tRe-leaseAu-thorised-Location 270302 | | | 0..n 270304 | Form-Business-Transac-tion-Document Location 270306 |

FIG. 270-13

| Package | level1 | level2 | level3 | level4 | level5 | Cardinality | Datatype Name |
|---|---|---|---|---|---|---|---|
| DeliveryInformation 270308 | | | QuoteDe-livery-Terms 270310 | | | 0..1 270312 | FormDe-livery-Terms 270314 |
| | | | | Maxi-mumLead-TimeDura-tion 270316 | | 0..1 270318 | Duration 270320 |
| | | | | Incoterms 270322 | | 0..1 270324 | FormInco-terms 270326 |
| | | | | | Classifica-tionCode 270328 | 1 270330 | Code 270332 |
| | | | | | Classifica-tionName 270334 | 1 270336 | Name 270338 |
| | | | | | Transfer-Location-Name 270340 | 0..1 270342 | Name 270344 |

FIG. 270-14

| Package | level1 | level2 | level3 | level4 | level5 | Cardinality | Datatype Name |
|---|---|---|---|---|---|---|---|
| PaymentInformation 270346 | | | Quote-CashDis-count-Terms 270348 | | | 0..1 270350 | CashDis-count-Terms 270352 |
| | | | | Maxi-mumCash Discount 270354 | | 0..1 270356 | CashDis-count 270358 |
| | | | | Normal-CashDis-count 270360 | | 0..1 270362 | CashDis-count 270364 |
| | | | | FullPay-ment-DueDays-Value 270366 | | 0..1 270368 | |

FIG. 270-15

| Package | level1 | level2 | level3 | level4 | level5 | Cardinality | Datatype Name |
|---|---|---|---|---|---|---|---|
| ProductInformation 270370 | | | Pro-ductCate gory 270372 | | | 0..1 270374 | Form-Business-Transac-tionDocu-mentPro-ductCate-gory 270376 |
| | | | | Stan-dardID 270378 | | 0..n 270380 | Pro-ductCate-goryStan-dardID 270382 |
| | | | | BuyerID 270384 | | 0..1 270386 | Pro-ductCate-gory-PartyID 270388 |

FIG. 270-16

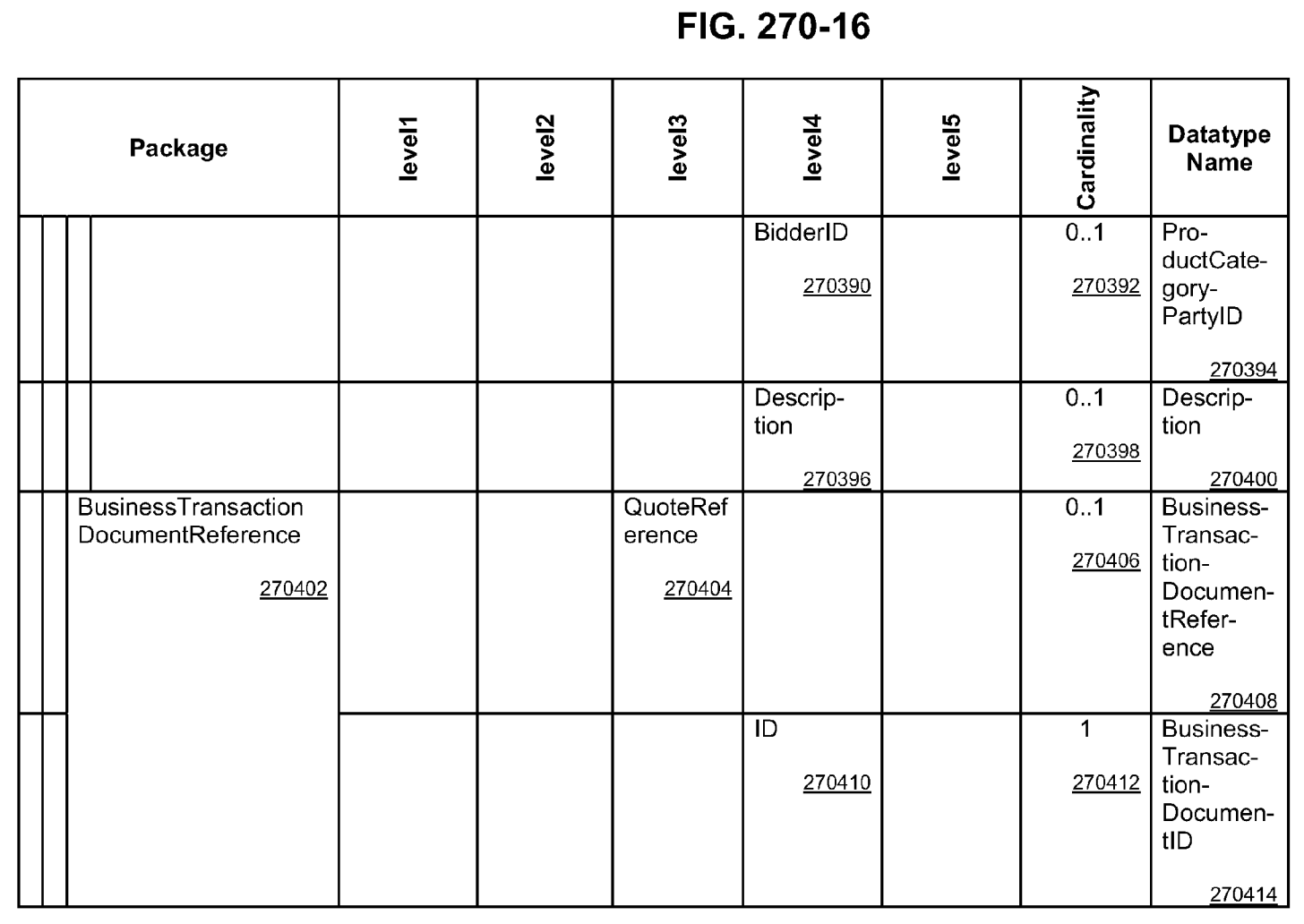

| Package | level1 | level2 | level3 | level4 | level5 | Cardinality | Datatype Name |
|---|---|---|---|---|---|---|---|
| | | | | BidderID 270390 | | 0..1 270392 | Pro-ductCate-gory-PartyID 270394 |
| | | | | Descrip-tion 270396 | | 0..1 270398 | Descrip-tion 270400 |
| BusinessTransaction DocumentReference 270402 | | | QuoteRef erence 270404 | | | 0..1 270406 | Business-Transac-tion-Documen-tRefer-ence 270408 |
| | | | | ID 270410 | | 1 270412 | Business-Transac-tion-Documen-tID 270414 |

FIG. 270-17

| Package | level1 | level2 | level3 | level4 | level5 | Cardinality | Datatype Name |
|---|---|---|---|---|---|---|---|
| FollowUpBusiness TransactionDocument 270416 | | | Follow-UpPur-chaseOr-der 270418 | | | 0..1 270420 | |
| | | | | Require-mentCode 270422 | | 1 270424 | Follow-UpBusi-ness-Transac-tion-Documen-tRequire-mentCode 270426 |
| | | | | Require-ment-Name 270428 | | 1 270430 | Name 270432 |
| | | | Follow-UpPur-chasing-Contract 270434 | | | 0..1 270436 | |

FIG. 270-18

| Package | level1 | level2 | level3 | level4 | level5 | Cardinality | Datatype Name |
|---|---|---|---|---|---|---|---|
| | | | | Require-mentCode 270438 | | 1 270440 | Follow-UpBusi-ness-Transac-tion-Documen-tRequire-mentCode 270442 |
| | | | | Require-ment-Name 270444 | | 1 270446 | Name 270448 |
| Attachment 270450 | | | Attach-ment-Folder 270452 | | | 0..1 270454 | Attach-ment-Folder 270456 |
| Description 270458 | | | TextCol-lection 270460 | | | 0..1 270462 | TextCol-lection 270464 |

FIG. 270-19

| Package | level1 | level2 | level3 | level4 | level5 | Cardinality | Datatype Name |
|---|---|---|---|---|---|---|---|
| | | | QuoteTextCollection 270466 | | | 0..1 270468 | TextCollection 270470 |
| Item 270472 | | | Item 270474 | | | 0..n 270476 | InteractiveFormRFQItem 270478 |
| | | | | ID 270480 | | 1 270482 | BusinessTransactionDocumentItemID 270484 |
| | | | | ContractTargetAmount 270486 | | 0..1 270488 | Amount 270490 |

FIG. 270-20

| Package | level1 | level2 | level3 | level4 | level5 | Cardinality | Datatype Name |
|---|---|---|---|---|---|---|---|
| | | | | QuoteContractTargetAmount 270492 | | 0..1 270494 | Amount 270496 |
| | | | | HierarchyRelationship 270498 | | 0..1 270500 | |
| | | | | | ParentItemID 270502 | 1 270504 | BusinessTransactionDocumentItemID 270506 |

FIG. 270-21

| Package | level1 | level2 | level3 | level4 | level5 | Cardinality | Datatype Name |
|---|---|---|---|---|---|---|---|
| | | | | | TypeCode 270508 | 1 270510 | Business-Transac-tion-Documen-tItemHier-archyRe-lation-shipType Code 270512 |
| ProductInformation 270514 | | | | Product 270516 | | 0..1 270518 | Form-Business-Transac-tion-Document Product 270520 |
| | | | | | Stan-dardID 270522 | 0..n 270524 | Product-Stan-dardID 270526 |
| | | | | | BuyerID 270528 | 0..1 270530 | Product-PartyID 270532 |

FIG. 270-22

| Package | level1 | level2 | level3 | level4 | level5 | Cardinality | Datatype Name |
|---|---|---|---|---|---|---|---|
| | | | | | BidderID 270534 | 0..1 270536 | Product-PartyID 270538 |
| | | | | | Manufac-turerID 270540 | 0..1 270542 | Product-PartyID 270544 |
| | | | | | TypeCode 270546 | 0..1 270548 | Pro-ductType Code 270550 |
| | | | | | TypeNam e 270552 | 0..1 270554 | Name 270556 |
| | | | | Pro-ductCate-gory 270558 | | 0..1 270560 | Form-Business-Transac-tion-Document Pro-ductCate-gory 270562 |

FIG. 270-23

| Package | level1 | level2 | level3 | level4 | level5 | Cardinality | Datatype Name |
|---|---|---|---|---|---|---|---|
| | | | | | Stan-dardID 270564 | 0..n 270566 | Pro-ductCate-goryStan-dardID 270568 |
| | | | | | BuyerID 270570 | 0..1 270572 | Pro-ductCate-gory-PartyID 270574 |
| | | | | | BidderID 270576 | 0..1 270578 | Pro-ductCate-gory-PartyID 270580 |
| | | | | | Descrip-tion 270582 | 0..1 270584 | Descrip-tion 270586 |
| PriceInformation 270588 | | | | Quote-Price 270590 | | 0..1 270592 | |

FIG. 270-24

| Package | level1 | level2 | level3 | level4 | level5 | Cardinality | Datatype Name |
|---|---|---|---|---|---|---|---|
| | | | | | NetUnit-Price 270594 | 0..1 270596 | FormPrice 270598 |
| Party 270600 | | | | Produc-tRecipi-entParty 270602 | | 0..1 270604 | Form-Business-Transac-tion-Document Party 270606 |
| | | | | Service-Per-formerPart y 270608 | | 0..1 270610 | Form-Business-Transac-tion-Document Party 270612 |
| Location 270614 | | | | ShipToLo-cation 270616 | | 0..1 270618 | Form-Business-Transac-tion-Document Location 270620 |

FIG. 270-25

| Package | level1 | level2 | level3 | level4 | level5 | Cardinality | Datatype Name |
|---|---|---|---|---|---|---|---|
| | | | | | Stan-dardID 270622 | 0..n 270624 | Location-Stan-dardId 270626 |
| | | | | | BuyerID 270628 | 0..1 270630 | Location-PartyId 270632 |
| | | | | | BidderID 270634 | 0..1 270636 | Location-PartyId 270638 |
| | | | | | Address 270640 | 0..1 270642 | Address 270644 |
| | | | | | Formatte-dAdress 270646 | 0..1 270648 | Formatte-dAddress 270650 |

FIG. 270-26

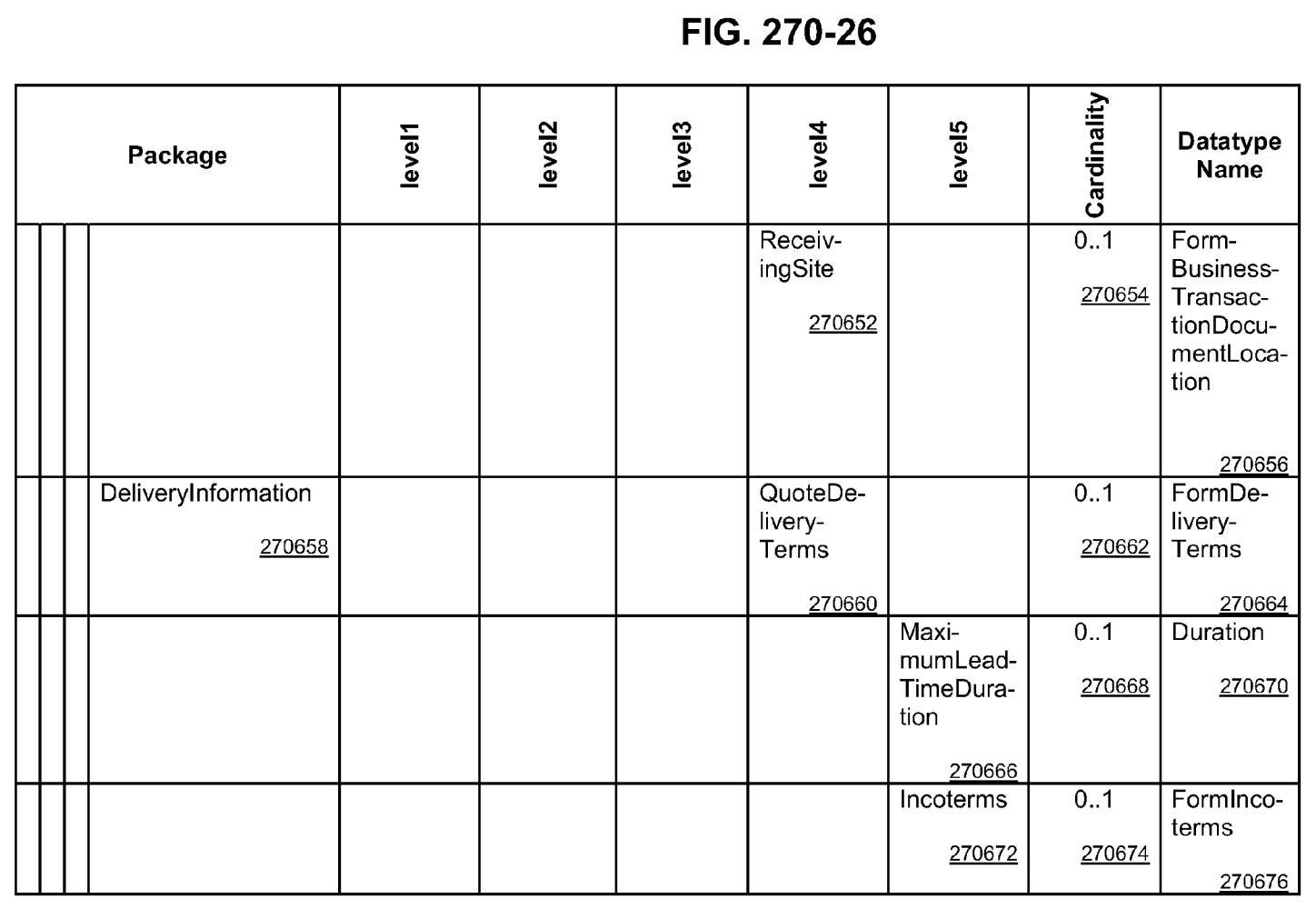

| Package | level1 | level2 | level3 | level4 | level5 | Cardinality | Datatype Name |
|---|---|---|---|---|---|---|---|
| | | | | Receiv-ingSite 270652 | | 0..1 270654 | Form-Business-Transac-tionDocu-mentLoca-tion 270656 |
| DeliveryInformation 270658 | | | | QuoteDe-livery-Terms 270660 | | 0..1 270662 | FormDe-livery-Terms 270664 |
| | | | | | Maxi-mumLead-TimeDura-tion 270666 | 0..1 270668 | Duration 270670 |
| | | | | | Incoterms 270672 | 0..1 270674 | FormInco-terms 270676 |

FIG. 270-27

| Package | level1 | level2 | level3 | level4 | level5 | Cardinality | Datatype Name |
|---|---|---|---|---|---|---|---|
| BusinessTransaction DocumentReference 270678 | | | | QuoteRef erence 270680 | | 0..1 270682 | Business- Transac- tion- Documen- tRefer- ence 270684 |
| | | | | | ID 270686 | 1 270688 | Business- Transac- tion- Documen- tID 270690 |
| | | | | | ItemID 270692 | 0..n 270694 | Business- Transac- tion- Documen- tItemID 270696 |

FIG. 270-28

| Package | level1 | level2 | level3 | level4 | level5 | Cardinality | Datatype Name |
|---|---|---|---|---|---|---|---|
| | | | | PurchasingContractReference 270698 | | 0..1 270700 | BusinessTransactionDocumentReference 270702 |
| | | | | | ID 270704 | 1 270706 | BusinessTransactionDocumentID 270708 |
| | | | | | ItemID 270710 | 0..n 270712 | BusinessTransactionDocumentItemID 270714 |

FIG. 270-29

| Package | level1 | level2 | level3 | level4 | level5 | Cardinality | Datatype Name |
|---|---|---|---|---|---|---|---|
| | | | | BuyerProductCatalogueReference 270716 | | 0..1 270718 | CatalogueReference 270720 |
| | | | | | ID 270722 | 1 270724 | CatalogueID 270726 |
| | | | | | ItemID 270728 | 0..1 270730 | CatalogueItemID 270732 |
| Attachment 270734 | | | | AttachmentFolder 270736 | | 0..1 270738 | AttachmentFolder 270740 |
| Description 270742 | | | | Description 270744 | | 0..1 270746 | Description 270748 |
| | | | | TextCollection 270750 | | 0..1 270752 | TextCollection 270754 |

FIG. 270-30

| Package | level1 | level2 | level3 | level4 | level5 | Cardinality | Datatype Name |
|---|---|---|---|---|---|---|---|
| | | | | QuoteText Collection 270756 | | 0..1 270758 | TextCol-lection 270760 |
| ScheduleLine 270762 | | | | Sched-uleLine 270764 | | 0..1 270766 | FormRFQItemSchedTuleLine 270768 |
| | | | | | ID 270770 | 0..1 270772 | Business-Transac-tion-Documen-tItem-Sched-uleLineID 270774 |
| | | | | | Delivery-Period 270776 | 0..1 270778 | UPPEROPEN_LOCALNORMALISED_DateTimePeriod 270780 |

FIG. 270-31

| Package | level1 | level2 | level3 | level4 | level5 | Cardinality | Datatype Name |
|---|---|---|---|---|---|---|---|
| | | | | | Quantity 270782 | 0..1 270784 | Quantity 270786 |
| | | | | | Quote-Quantity 270788 | 0..1 270790 | Quantity 270792 |
| | | | | | Quantity-Measure-UnitName 270794 | 0..1 270796 | Name 270798 |
| | | | | | Quanti-tyType-Code 270800 | 0..1 270802 | Quanti-tyType-Code 270804 |
| | | | | | Quanti-tyTypeName 270806 | 0..1 270808 | Name 270810 |
| | | | | QuoteScheduleLine 270812 | | 0..1 270814 | FormRFQItemScheduleLine 270816 |

FIG. 271-1

| Package | level1 | level2 | level3 | level4 | level5 | Cardinality | Datatype Name |
|---|---|---|---|---|---|---|---|
| QuoteMessage 271000 | QuoteMes-sage 271002 | | | | | | QuoteMessage 271004 |
| MessageHeader 271006 | | Message-Header 271008 | | | | 1 271010 | Business-Document-Message-Header 271012 |
| | | | ID 271014 | | | 1 271016 | Business-Document-MessageID 271018 |
| | | | ReferenceID 271020 | | | 0..1 271022 | Business-Document-MessageID 271024 |
| | | | Creation-DateTime 271026 | | | 1 271028 | GLOBAL_Date Time 271030 |

FIG. 271-2

| Package | | | | level1 | level2 | level3 | level4 | level5 | Cardinality | Datatype Name |
|---|---|---|---|---|---|---|---|---|---|---|
| | | | | | | SenderParty 271032 | | | 0..1 271034 | Business-Document-Message-HeaderParty 271036 |
| | | | | | | | InternalID 271038 | | 0..1 271040 | PartyInternalId 271042 |
| | | | | | | | StandardID 271044 | | 0..n 271046 | PartyStan-dardId 271048 |
| | | | | | | | Contact 271050 | | 0..1 271052 | ContactPerson 271054 |
| | | | | | | | | InternalID 271056 | 0..n 271058 | ContactPer-sonInternalId 271060 |
| | | | | | | | | BuyerID 271062 | 0..1 271064 | ContactPer-sonPartyId 271066 |

FIG. 271-3

| Package | level1 | level2 | level3 | level4 | level5 | Cardinality | Datatype Name |
|---|---|---|---|---|---|---|---|
| | | | | | BidderID 271068 | 0..1 271070 | ContactPer-sonPartyId 271072 |
| | | | | | Address 271074 | 0..1 271076 | Address 271078 |
| | | | RecipientParty 271080 | | | 0..n 271082 | Business-Document-Message-HeaderParty 271084 |
| Quote 271086 | | Quote 271088 | | | | 1 271090 | Quote 271092 |
| | | | ID 271094 | | | 1 271096 | Business-Transaction-DocumentID 271098 |
| | | | Reconcilia-tionPeriod-CounterValue 271102 | | | 0..1 271104 | Reconcilia-tionPeriod-CounterValue 271106 |

FIG. 271-4

| Package | | | | level1 | level2 | level3 | level4 | level5 | Cardinality | Datatype Name |
|---|---|---|---|---|---|---|---|---|---|---|
| | | | | | | Posting-DateTime 271108 | | | 0..1 271110 | GLOBAL_Date Time 271112 |
| | | | | | | LastChange-DateTime 271114 | | | 0..1 271116 | GLOBAL_Date Time 271118 |
| | | | | | | Binding-DateTime 271120 | | | 0..1 271122 | GLOBAL_Date Time 271124 |
| | | | | | | Note 271126 | | | 0..1 271128 | Note 271130 |
| | | | | | | Name 271134 | | | 0..1 271136 | MEDIUM_Nam e 271138 |
| | | | | | | ContractTar-getAmount 271140 | | | 0..1 271142 | Amount 271144 |

FIG. 271-5

| Package | level1 | level2 | level3 | level4 | level5 | Cardinality | Datatype Name |
|---|---|---|---|---|---|---|---|
| Party 271146 | | | BuyerParty 271148 | | | 0..1 271150 | Business-Transaction-Document-Party 271152 |
| | | | | StandardID 271154 | | 0..n 271156 | PartyStan-dardID 271158 |
| | | | | BuyerID 271160 | | 0..1 271162 | PartyPartyID 271164 |
| | | | | BidderID 271166 | | 0..1 271168 | PartyPartyID 271170 |
| | | | | Address 271172 | | 0..1 271174 | Address 271176 |
| | | | | Contact 271178 | | 0..1 271180 | ContactPerson 271182 |
| | | | | | BuyerID 271184 | 0..1 271186 | PartyPartyID 271188 |

FIG. 271-6

| Package | level1 | level2 | level3 | level4 | level5 | Cardinality | Datatype Name |
|---|---|---|---|---|---|---|---|
| | | | | | BidderID 271190 | 0..1 271192 | PartyPartyID 271194 |
| | | | | | Address 271196 | 0..1 271198 | Address 271200 |
| | | | BidderParty 271202 | | | 0..1 271204 | Business-Transaction-Document-Party 271206 |
| | | | BidderPortal-ProviderParty 271208 | | | 0..1 271210 | Business-Transaction-Document-Party 271212 |
| | | | ProductRe-cipientParty 271214 | | | 0..1 271216 | Business-Transaction-Document-Party 271218 |

FIG. 271-7

| Package | level1 | level2 | level3 | level4 | level5 | Cardinality | Datatype Name |
|---|---|---|---|---|---|---|---|
| | | | VendorParty 271220 | | | 0..1 271222 | Business-Transaction-Document-Party 271224 |
| | | | ServicePer-formerParty 271228 | | | 0..1 271230 | Business-Transaction-Document-Party 271232 |
| | | | Manufacturer-Party 271234 | | | 0..1 271236 | Business-Transaction-Document-Party 271238 |
| | | | PayerParty 271240 | | | 0..1 271242 | Business-Transaction-Document-Party 271244 |

FIG. 271-8

| Package | level1 | level2 | level3 | level4 | level5 | Cardinality | Datatype Name |
|---|---|---|---|---|---|---|---|
| Location 271246 | | | ShipToLocation 271248 | | | 0..n 271250 | Business-Transaction-DocumentLocation 271252 |
| | | | | StandardID 271254 | | 0..n 271256 | LocationStandardId 271258 |
| | | | | BuyerID 271260 | | 0..1 271262 | Location-PartyId 271264 |
| | | | | BidderID 271266 | | 0..1 271268 | Location-PartyId 271270 |
| | | | | Address 271272 | | 0..1 271274 | Address 271276 |
| DeliveryInformation 271278 | | | DeliveryTerms 271280 | | | 0..1 271282 | DeliveryTerms 271284 |

FIG. 271-9

| Package | level1 | level2 | level3 | level4 | level5 | Cardinality | Datatype Name |
|---|---|---|---|---|---|---|---|
| | | | | Incoterms 271286 | | 0..1 271288 | Incoterms 271290 |
| PaymentInformation 271292 | | | CashDiscountTerms 271294 | | | 0..1 271296 | CashDiscount-Terms 271298 |
| | | | | Maximum-CashDiscount 271300 | | 0..1 271302 | CashDiscount 271304 |
| | | | | Normal-CashDiscount 271306 | | 0..1 271308 | CashDiscount 271310 |
| | | | | FullPayment-DueDays-Value 271312 | | 0..1 271314 | |
| | | | PaymentForm 271316 | | | 0..1 271318 | |

FIG. 271-10

| Package | level1 | level2 | level3 | level4 | level5 | Cardinality | Datatype Name |
|---|---|---|---|---|---|---|---|
| | | | | Code 271320 | | 1 271322 | Payment-FormCode 271324 |
| PriceSpecifica-tionElement 271326 | | | PriceSpecifi-cationElement 271328 | | | 0..n 271330 | PriceSpecifica-tionElement 271332 |
| ProductInforma-tion 271334 | | | ProductCate-gory 271336 | | | 0..1 271338 | Business-Transaction-DocumentPro-ductCategory 271340 |
| | | | | StandardID 271342 | | | ProductCate-goryStan-dardID 271344 |
| | | | | BuyerID 271346 | | | ProductCate-goryPartyID 271348 |

FIG. 271-11

| Package | level1 | level2 | level3 | level4 | level5 | Cardinality | Datatype Name |
|---|---|---|---|---|---|---|---|
| | | | | BidderID 271350 | | | ProductCategoryPartyID 271352 |
| BusinessTransaction DocumentReference 271354 | | | RFQReference 271356 | | | 0..1 271358 | Business-Transaction-DocumentReference 271360 |
| | | | | ID 271362 | | 1 271364 | Business-Transaction-DocumentID 271366 |
| Attachment 271368 | | | Attachment 271370 | | | 0..n 271372 | Attachment 271374 |
| Description 271376 | | | Description 271378 | | | 0..1 271380 | Description 271382 |
| Item 271384 | | | Item 271386 | | | 0..n 271388 | QuoteItem 271390 |

FIG. 271-12

| Package | | | | level1 | level2 | level3 | level4 | level5 | Cardinality | Datatype Name |
|---|---|---|---|---|---|---|---|---|---|---|
| | | | | | | | ID 271392 | | 1 271394 | Business-Transaction-DocumentItemID 271396 |
| | | | | | | | ContractTargetAmount 271398 | | 0..1 271400 | Amount 271402 |
| | | | | | | | HierarchyRelationship 271404 | | 0..1 271406 | |
| | | | | | | | | ParentItemID 271408 | 1 271410 | Business-Transaction-DocumentItemID 271412 |

FIG. 271-13

| Package | level1 | level2 | level3 | level4 | level5 | Cardinality | Datatype Name |
|---|---|---|---|---|---|---|---|
| | | | | | TypeCode 271414 | 1 271416 | Business-Transaction-DocumentItem HierarchyRela-tionshipType-Code 271418 |
| ProductIn-formation 271420 | | | | Product 271422 | | 0..1 271424 | Business-Transaction-DocumentPro-duct 271426 |
| | | | | | StandardID 271428 | 0..n 271430 | ProductStan-dardID 271432 |
| | | | | | BuyerID 271434 | 0..1 271436 | ProductPartyID 271438 |
| | | | | | BidderID 271440 | 0..1 271442 | ProductPartyID 271444 |

FIG. 271-14

| Package | level1 | level2 | level3 | level4 | level5 | Cardinality | Datatype Name |
|---|---|---|---|---|---|---|---|
| | | | | | Manufacture-rID 271446 | 0..1 271448 | ProductPartyID 271450 |
| | | | | | TypeCode 271452 | 0..1 271454 | ProductType-Code 271456 |
| | | | | | Note 271458 | 0..1 271460 | Note 271462 |
| | | | | Pro-ductCate-gory 271464 | | 0..1 271466 | Business-Transaction-DocumentPro-duct 271468 |
| | | | | | StandardID 271470 | 0..n 271472 | ProductCate-goryStan-dardID 271474 |
| | | | | | BuyerID 271476 | 0..1 271478 | ProductCate-goryPartyID 271480 |

FIG. 271-15

| Package | level1 | level2 | level3 | level4 | level5 | Cardinality | Datatype Name |
|---|---|---|---|---|---|---|---|
| | | | | | BidderID 271482 | | ProductCategoryPartyID 271484 |
| PriceInformation 271486 | | | | Price 271488 | | 0..1 271490 | |
| | | | | | NetUnitPrice 271492 | 0..1 271494 | Price 271496 |
| | | | | | PriceSpecificationElement 271498 | 0..n 271500 | PriceSpecificationElement 271502 |
| Party 271504 | | | | BuyerParty 271506 | | 0..1 271508 | BusinessTransactionDocumentParty 271510 |

FIG. 271-16

| Package | | | | level1 | level2 | level3 | level4 | level5 | Cardinality | Datatype Name |
|---|---|---|---|---|---|---|---|---|---|---|
| | | | | | | | BidderParty 271512 | | 0..1 271514 | Business-Transaction-Document-Party 271516 |
| | | | | | | | ProductRe-cipientParty 271518 | | 0..1 271520 | Business-Transaction-Document-Party 271522 |
| | | | | | | | Vendor-Party 271524 | | 0..1 271526 | Business-Transaction-Document-Party 271528 |
| | | | | | | | ServicePer-formerParty 271532 | | 0..1 271534 | Business-Transaction-Document-Party 271536 |

FIG. 271-17

| Package | | | | level1 | level2 | level3 | level4 | level5 | Cardinality | Datatype Name |
|---|---|---|---|---|---|---|---|---|---|---|
| | | | | | | | Manufac-turerParty 271538 | | 0..1 271540 | Business-Transaction-Document-Party 271542 |
| | | | Location 271544 | | | | ShipToLo-cation 271546 | | 0..n 271548 | Business-Transaction-DocumentLo-cation 271550 |
| | | | | | | | | StandardID 271552 | 0..n 271554 | LocationStan-dardId 271556 |
| | | | | | | | | BuyerID 271558 | 0..1 271560 | Location-PartyId 271562 |
| | | | | | | | | BidderID 271564 | 0..1 271566 | Location-PartyId 271568 |

FIG. 271-18

| Package | level1 | level2 | level3 | level4 | level5 | Cardinality | Datatype Name |
|---|---|---|---|---|---|---|---|
| | | | | | Address 271570 | 0..1 271572 | Address 271574 |
| DeliveryInformation 271576 | | | | Delivery-Terms 271578 | | 0..1 271580 | DeliveryTerms 271582 |
| | | | | | Maximum-LeadTimeDuration 271584 | 0..1 271586 | Duration 271588 |
| | | | | | Incoterms 271590 | 0..1 271592 | Incoterms 271594 |
| Business-Transaction Documen-tReference 271596 | | | | RFQReference 271598 | | 0..1 271600 | Business-Transaction-Documen-tReference 271602 |
| | | | | | ID 271604 | 1 271606 | Business-Transaction-DocumentID 271608 |

FIG. 271-19

| Package | level1 | level2 | level3 | level4 | level5 | Cardinality | Datatype Name |
|---|---|---|---|---|---|---|---|
| | | | | | ItemID 271610 | 0..n 271612 | Business-Transaction-DocumentItemID 271614 |
| Attachment 271616 | | | | Attachment 271618 | | 0..n 271620 | Attachment 271622 |
| Description 271624 | | | | Description 271626 | | 0..1 271628 | Description 271630 |
| ScheduleLine 271632 | | | | ScheduleLine 271634 | | 0..1 271636 | QuoteItem-ScheduleLine 271638 |
| | | | | | ID 271640 | 0..1 271642 | Business-Transaction-DocumentItemScheduleLineID 271644 |

FIG. 271-20

| Package | | | | level1 | level2 | level3 | level4 | level5 | Cardinality | Datatype Name |
|---|---|---|---|---|---|---|---|---|---|---|
| | | | | | | | | DeliveryPe-riod 271646 | 0..1 271648 | GLOBAL_Date TimePeriod 271650 |
| | | | | | | | | Quantity 271652 | 0..1 271654 | Quantity 271656 |

FIG. 272-1

| Package | | level1 | level2 | level3 | level4 | level5 | Cardinality | Datatype Name |
|---|---|---|---|---|---|---|---|---|
| RFQCancella-tionMessage 272000 | | RFQCancella-tionMessage 272002 | | | | | | RFQCancela-tionMessage 272004 |
| | Message-Header 272006 | | Message-Header 272008 | | | | 1 272010 | BusinessDocu-mentMessage-Header 272012 |
| | | | | ID 272014 | | | 1 272016 | BusinessDocu-mentMessageID 272018 |
| | | | | ReferenceID 272020 | | | 0..1 272022 | BusinessDocu-mentMessageID 272024 |
| | | | | Creation-DateTime 272026 | | | 1 272028 | GLOBAL_DateT ime 272030 |
| | | | | SenderParty 272032 | | | 0..1 272034 | BusinessDocu-mentMessage-HeaderParty 272036 |

FIG. 272-2

| Package | | level1 | level2 | level3 | level4 | level5 | Cardinality | Datatype Name |
|---|---|---|---|---|---|---|---|---|
| | | | | | InternalID 272038 | | 0..1 272040 | PartyInternalId 272042 |
| | | | | | StandardID 272044 | | 0..n 272046 | PartyStandardId 272048 |
| | | | | | Contact 272050 | | 0..1 272052 | ContactPerson 272054 |
| | | | | | | InternalID 272056 | 0..n 272058 | ContactPerson-InternalId 272060 |
| | | | | | | BuyerID 272062 | 0..1 272064 | ContactPerson-PartyId 272066 |
| | | | | | | BidderID 272068 | 0..1 272070 | ContactPerson-PartyId 272072 |
| | | | | | | Address 272074 | 0..1 272076 | Address 272078 |

FIG. 272-3

| Package | | level1 | level2 | level3 | level4 | level5 | Cardinality | Datatype Name |
|---|---|---|---|---|---|---|---|---|
| | | | | RecipientParty 272080 | | | 0..n 272082 | BusinessDocumentMessageHeaderParty 272084 |
| | RFQCancellation 272086 | | RFQCancellation 272088 | | | | 1 272090 | RFQCancellation 272092 |
| | | | | ID 272094 | | | 1 272096 | BusinessTransactionDocumentID 272098 |
| | | | | ReconciliationPeriodCounterValue 272102 | | | 1 272104 | ReconciliationPeriodCounterValue 272106 |

FIG. 273-1

| Package | level1 | level2 | level3 | level4 | level5 | Cardinality | Datatype Name |
|---|---|---|---|---|---|---|---|
| RFQMessage 273000 | RFQMessage 273002 | | | | | | RFQMessage 273004 |
| MessageHeader 273006 | | MessageHeader 273008 | | | | 1 273010 | BusinessDocumentMessageHeader 273012 |
| | | | ID 273014 | | | 1 273016 | BusinessDocumentMessageID 273018 |
| | | | ReferenceID 273020 | | | 0..1 273022 | BusinessDocumentMessageID 273024 |

FIG. 273-2

| Package | level1 | level2 | level3 | level4 | level5 | Cardinality | Datatype Name |
|---|---|---|---|---|---|---|---|
| | | | Creation-DateTime 273026 | | | 1 273028 | GLOBAL_DateTime 273030 |
| | | | Sender-Party 273032 | | | 0..1 273034 | Business-Document-Message-Header-Party 273036 |
| | | | | InternalID 273038 | | 0..1 273040 | Party-InternalId 273042 |
| | | | | Stan-dardID 273044 | | 0..n 273046 | PartyStan-dardId 273048 |
| | | | | Contact-Person 273050 | | 0..1 273052 | Contact-Person 273054 |

FIG. 273-3

| Package | level1 | level2 | level3 | level4 | level5 | Cardinality | Datatype Name |
|---|---|---|---|---|---|---|---|
| | | | | | InternalID 273056 | 0..n 273058 | Contact-PersonIn-ternalId 273060 |
| | | | | | BuyerID 273062 | 0..1 273064 | Contact-Person-PartyId 273066 |
| | | | | | BidderID 273068 | 0..1 273070 | Contact-Person-PartyId 273072 |
| | | | | | Address 273074 | 0..1 273076 | Address 273078 |
| | | | Recipi-entParty 273080 | | | 0..n 273082 | Business-Docu-mentMes-sage-Header-Party 273084 |

FIG. 273-4

| Package | level1 | level2 | level3 | level4 | level5 | Cardinality | Datatype Name |
|---|---|---|---|---|---|---|---|
| RFQ 273086 | | RFQ 273088 | | | | 1 273090 | |
| | | | Attrib-ute:reconciliation-Period-Counter-Value 273092 | | | 0..1 273094 | Recon-ciliation-Period-Counter-Value 273096 |
| | | | ID 273098 | | | 1 273100 | Business-Transac-tionDocu-mentID 273102 |
| | | | VersionID 273104 | | | 0..1 273106 | VersionID 273108 |
| | | | Posting-DateTime 273110 | | | 0..1 273112 | GLOBAL_DateTime 273114 |

FIG. 273-5

| Package | level1 | level2 | level3 | level4 | level5 | Cardinality | Datatype Name |
|---|---|---|---|---|---|---|---|
| | | | Last-Change-DateTime 273116 | | | 0..1 273118 | GLOBAL_DateTime 273120 |
| | | | Publish-DateTime 273122 | | | 0..1 273124 | GLOBAL_DateTime 273126 |
| | | | Display-DateTime 273128 | | | 0..1 273130 | GLOBAL_DateTime 273132 |
| | | | Bidding-Start-DateTime 273134 | | | 0..1 273136 | LOCALNORMALISED_DateTime 273138 |
| | | | QuoteSubmission-DateTime 273140 | | | 1 273142 | LOCALNORMALISED_DateTime 273144 |

FIG. 273-6

| Package | level1 | level2 | level3 | level4 | level5 | Cardinality | Datatype Name |
|---|---|---|---|---|---|---|---|
| | | | QuoteOpening-DateTime 273146 | | | 0..1 273148 | LOCALNORMALISED_DateTime 273150 |
| | | | Quote-Binding-DateTime 273152 | | | 0..1 273154 | LOCALNORMALISED_DateTime 273156 |
| | | | Contract-Valid-ityPeriod 273158 | | | 0..1 273160 | UPPEROPEN_GLOBAL_DateTimePe-riod 273162 |
| | | | Note 273164 | | | 0..1 273166 | Note 273168 |
| | | | Name 273170 | | | 0..1 273172 | MEDIUM_Name 273174 |

FIG. 273-7

| Package | level1 | level2 | level3 | level4 | level5 | Cardinality | Datatype Name |
|---|---|---|---|---|---|---|---|
| | | | RFQPub-licIndica-tor 273176 | | | 1 273178 | Indicator 273180 |
| | | | Quote-PricingIn-dicator 273182 | | | 0..1 273184 | Indicator 273186 |
| | | | Quote-ChangeAl lowedIn-dicator 273188 | | | 0..1 273190 | Indicator 273192 |
| | | | QuoteUn-planned-ItemPer-mission-Code 273194 | | | 0..1 273196 | Un-planned-ItemPer-mission-Code 273198 |

FIG. 273-8

| Package | level1 | level2 | level3 | level4 | level5 | Cardinality | Datatype Name |
|---|---|---|---|---|---|---|---|
| | | | QuotePriceBiddingConditionCode 273200 | | | 0..1 273202 | BiddingConditionCode 273204 |
| | | | QuoteQuantityBiddingConditionCode 273206 | | | 0..1 273208 | BiddingConditionCode 273210 |
| | | | QuoteItemBiddingConditionCode 273212 | | | 0..1 273214 | BiddingConditionCode 273216 |
| | | | PriceDetailLevelCode 273218 | | | 0..1 273220 | PriceDetailLevelCode 273222 |

FIG. 273-9

| Package | level1 | level2 | level3 | level4 | level5 | Cardinality | Datatype Name |
|---|---|---|---|---|---|---|---|
| | | | QuantityChangeAllowedIndicator 273224 | | | 0..1 273226 | Indicator 273228 |
| | | | BidOnAllItemsRequiredIndicator 273230 | | | 0..1 273232 | Indicator 273234 |
| | | | FollowUpQuoteRequirementCode 273244 | | | 0..1 273246 | FollowUpBusinessTransactionDocumentRequirementCode 273248 |

FIG. 273-10

| Package | level1 | level2 | level3 | level4 | level5 | Cardinality | Datatype Name |
|---|---|---|---|---|---|---|---|
| | | | RequestedQuoteCurrencyCode 273250 | | | 1..n 273252 | CurrencyCode 273254 |
| | | | ContractTargetAmount 273256 | | | 0..1 273258 | Amount 273260 |
| | | | QuoteFollowUpBusinessTransactionDocumentTypeCode 273262 | | | 0..1 273264 | BusinessTransactionDocumentTypeCode 273266 |

FIG. 273-11

| Package | level1 | level2 | level3 | level4 | level5 | Cardinality | Datatype Name |
|---|---|---|---|---|---|---|---|
| Party 273268 | | | Buyer-Party 273270 | | | 0..1 273272 | Business-Transac-tionDocu-mentParty 273274 |
| | | | | Stan-dardID 273276 | | 0..n 273278 | PartyStan-dardID 273280 |
| | | | | BuyerID 273282 | | 0..1 273284 | Party-PartyID 273286 |
| | | | | BidderID 273288 | | 0..1 273290 | Party-PartyID 273292 |
| | | | | Address 273294 | | 0..1 273296 | Address 273298 |
| | | | | Contact-Person 273300 | | 0..1 273302 | Contact-Person 273304 |

FIG. 273-12

| Package | level1 | level2 | level3 | level4 | level5 | Cardinality | Datatype Name |
|---|---|---|---|---|---|---|---|
| | | | | | BuyerID 273306 | 0..1 273308 | Contact-Person-PartyId 273310 |
| | | | | | BidderID 273312 | 0..1 273314 | Contact-Person-PartyId 273316 |
| | | | | | Address 273318 | 0..1 273320 | Address 273322 |
| | | | Bidder-Party 273324 | | | 0..1 273326 | Business-Transac-tionDocu-mentParty 273328 |
| | | | Bidder-Portal-Provider-Party 273330 | | | 0..1 273332 | Business-Transac-tionDocu-mentParty 273334 |

FIG. 273-13

| Package | level1 | level2 | level3 | level4 | level5 | Cardinality | Datatype Name |
|---|---|---|---|---|---|---|---|
| | | | Portal-Provider-Party 273338 | | | 0..1 273340 | Business-Transac-tionDocu-mentParty 273342 |
| | | | Produc-tRecipi-entParty 273344 | | | 0..1 273346 | Business-Transac-tionDocu-mentParty 273348 |
| | | | Vendor-Party 273350 | | | 0..1 273352 | Business-Transac-tionDocu-mentParty 273354 |
| | | | Service-Performer Party 273356 | | | 0..1 273358 | Business-Transac-tionDocu-mentParty 273360 |

FIG. 273-14

| Package | level1 | level2 | level3 | level4 | level5 | Cardinality | Datatype Name |
|---|---|---|---|---|---|---|---|
| | | | ManufacturerParty 273362 | | | 0..1 273364 | BusinessTransactionDocumentParty 273366 |
| | | | PayerParty 273368 | | | 0..1 273370 | BusinessTransactionDocumentParty 273372 |
| Location 273374 | | | ShipToLocation 273376 | | | 0..1 273378 | BusinessTransactionDocumentLocation 273380 |
| | | | | StandardID 273382 | | 0..n 273384 | LocationStandardId 273386 |

FIG. 273-15

| Package | level1 | level2 | level3 | level4 | level5 | Cardinality | Datatype Name |
|---|---|---|---|---|---|---|---|
| | | | | BuyerID 273388 | | 0..1 273390 | Location-PartyId 273392 |
| | | | | BidderID 273394 | | 0..1 273396 | Location-PartyId 273398 |
| | | | | Address 273400 | | 0..1 273402 | Address 273404 |
| | | | Receiv-ingSite 273406 | | | 0..1 273408 | Business-Transac-tionDocu-mentLoca-tion 273410 |
| | | | Contrac-tRe-leaseAu-thorised-Location 273412 | | | 0..n 273414 | Business-Transac-tionDocu-mentLoca-tion 273416 |

FIG. 273-16

| Package | level1 | level2 | level3 | level4 | level5 | Cardinality | Datatype Name |
|---|---|---|---|---|---|---|---|
| DeliveryInformation 273418 | | | Delivery-Terms 273420 | | | 0..1 273422 | Delivery-Terms 273424 |
| | | | | Maximum Lead-TimeDu-ration 273426 | | 0..1 273428 | Duration 273430 |
| | | | | Incoterms 273432 | | 0..1 273434 | Incoterms 273436 |
| PaymentInformation 273438 | | | CashDis-count-Terms 273440 | | | 0..1 273442 | CashDis-count-Terms 273444 |
| | | | | Maximum CashDis-count 273446 | | 0..1 273448 | CashDis-count 273450 |

FIG. 273-17

| Package | level1 | level2 | level3 | level4 | level5 | Cardinality | Datatype Name |
|---|---|---|---|---|---|---|---|
| | | | | Normal-CashDis-count 273452 | | 0..1 273454 | CashDis-count 273456 |
| | | | | FullPay-ment-DueDays Value 273458 | | 0..1 273460 | |
| | | | Payment-Form 273462 | | | 0..1 273464 | |
| | | | | Code 273466 | | 1 273468 | Payment-FormCode 273470 |
| PriceInformation 273472 | | | PriceSpe cifica-tionEle-ment 273474 | | | 0..n 273476 | PriceSpeci ficationEle ment 273478 |

FIG. 273-18

| Package | level1 | level2 | level3 | level4 | level5 | Cardinality | Datatype Name |
|---|---|---|---|---|---|---|---|
| ProductInformation 273480 | | | Pro-ductCate gory 273482 | | | 0..1 273484 | Business-Transac-tionDocu-mentPro-ductCate-gory 273486 |
| | | | | Stan-dardID 273488 | | 0..n 273490 | Pro-ductCate-goryStan-dardID 273492 |
| | | | | BuyerID 273494 | | 0..1 273496 | Pro-ductCate-gory-PartyID 273498 |
| | | | | BidderID 273500 | | 0..1 273502 | Pro-ductCate-gory-PartyID 273504 |

FIG. 273-19

| Package | level1 | level2 | level3 | level4 | level5 | Cardinality | Datatype Name |
|---|---|---|---|---|---|---|---|
| BusinessTransaction DocumentReference 273506 | | | QuoteReference 273508 | | | 0..1 273510 | BusinessTransactionDocumentReference 273512 |
| | | | | ID 273514 | | 1 273516 | BusinessTransactionDocumentID 273518 |
| FollowUpBusiness TransactionDocument 273520 | | | FollowUpPurchaseOrder 273522 | | | 0..1 273524 | |

FIG. 273-20

| Package | level1 | level2 | level3 | level4 | level5 | Cardinality | Datatype Name |
|---|---|---|---|---|---|---|---|
| | | | | Require-ment-Code 273526 | | 1 273528 | Follow-UpBusi-ness-Transac-tionDocu-mentRe-quire-mentCode 273530 |
| | | | Follow-UpPur-chasing-Contract 273532 | | | 0..1 273534 | |
| | | | | Require-ment-Code 273536 | | 1 273538 | Follow-UpBusi-ness-Transac-tionDocu-mentRe-quire-mentCode 273540 |

FIG. 273-21

| Package | level1 | level2 | level3 | level4 | level5 | Cardinality | Datatype Name |
|---|---|---|---|---|---|---|---|
| Attachment 273542 | | | Attachment 273544 | | | 0..n 273546 | Attachment 273548 |
| | | | AttachmentFolder 273550 | | | 0..1 273552 | AttachmentFolder 273554 |
| Description 273556 | | | Description 273558 | | | 0..1 273560 | Description 273562 |
| | | | TextCollection 273564 | | | 0..1 273566 | TextCollection 273568 |
| Item 273570 | | | Item 273572 | | | 0..n 273574 | RFQItem 273576 |
| | | | | ID 273578 | | 1 273580 | BusinessTransactionDocumentItemID 273582 |

FIG. 273-22

| Package | level1 | level2 | level3 | level4 | level5 | Cardinality | Datatype Name |
|---|---|---|---|---|---|---|---|
| | | | | Con-tractTar-getA-mount 273584 | | 0..1 273586 | Amount 273588 |
| | | | | Hierar-chyRela-tionship 273590 | | 0..1 273592 | |
| | | | | | Paren-tItemID 273594 | 1 273596 | Business-Transac-tionDocu-men-tItemID 273598 |

FIG. 273-23

| Package | level1 | level2 | level3 | level4 | level5 | Cardinality | Datatype Name |
|---|---|---|---|---|---|---|---|
| | | | | | TypeCode 273600 | 1 273602 | BusinessTransactionDocumentItemHierarchyRelationshipTypeCode 273604 |
| ProductInformation 273606 | | | | Product 273608 | | 0..1 273610 | BusinessTransactionDocumentProduct 273612 |
| | | | | | StandardID 273614 | 0..n 273616 | ProductStandardID 273618 |
| | | | | | BuyerID 273620 | 0..1 273622 | ProductPartyID 273624 |

FIG. 273-24

| Package | level1 | level2 | level3 | level4 | level5 | Cardinality | Datatype Name |
|---|---|---|---|---|---|---|---|
| | | | | | BidderID 273626 | 0..1 273628 | Product-PartyID 273630 |
| | | | | | Manufac-turerID 273632 | 0..1 273634 | Product-PartyID 273636 |
| | | | | | Type-Code 273638 | 0..1 273640 | Pro-ductType Code 273642 |
| | | | | Pro-ductCate gory 273644 | | 0..1 273646 | Business-Transac-tionDocu-mentPro-ductCate-gory 273648 |
| | | | | | Stan-dardID 273650 | 0..n 273652 | Pro-ductCate-goryStan-dardID 273654 |

FIG. 273-25

| Package | level1 | level2 | level3 | level4 | level5 | Cardinality | Datatype Name |
|---|---|---|---|---|---|---|---|
| | | | | | BuyerID 273656 | 0..1 273658 | Pro-ductCate-gory-PartyID 273660 |
| | | | | | BidderID 273662 | 0..1 273664 | Pro-ductCate-gory-PartyID 273666 |
| PriceInformation 273668 | | | | PriceSpe cifica-tionEle-ment 273670 | | 0..n 273672 | PriceSpeci ficationEle ment 273674 |
| Party 273676 | | | | Buyer-Party 273678 | | 0..1 273680 | Business-Transac-tionDocu-mentParty 273682 |

FIG. 273-26

| Package | level1 | level2 | level3 | level4 | level5 | Cardinality | Datatype Name |
|---|---|---|---|---|---|---|---|
| | | | | Bidder-Party 273684 | | 0..1 273686 | Business-Transac-tionDocu-mentParty 273688 |
| | | | | Produc-tRecipi-entParty 273690 | | 0..1 273692 | Business-Transac-tionDocu-mentParty 273694 |
| | | | | Service-Performer Party 273696 | | 0..1 273698 | Business-Transac-tionDocu-mentParty 273700 |
| | | | | Vendor-Party 273702 | | 0..1 273704 | Business-Transac-tionDocu-mentParty 273706 |

FIG. 273-27

| Package | level1 | level2 | level3 | level4 | level5 | Cardinality | Datatype Name |
|---|---|---|---|---|---|---|---|
| | | | | ManufacturerParty 273708 | | 0..1 273710 | BusinessTransactionDocumentParty 273712 |
| Location 273714 | | | | ShipToLocation 273716 | | 0..1 273718 | BusinessTransactionDocumentLocation 273720 |
| | | | | | StandardID 273722 | 0..n 273724 | LocationStandardId 273726 |
| | | | | | BuyerID 273728 | 0..1 273730 | LocationPartyId 273732 |
| | | | | | BidderID 273734 | 0..1 273736 | LocationPartyId 273738 |

FIG. 273-28

| Package | level1 | level2 | level3 | level4 | level5 | Cardinality | Datatype Name |
|---|---|---|---|---|---|---|---|
| | | | | | Address 273740 | 0..1 273742 | Address 273744 |
| | | | | Receiv-ingSite 273746 | | 0..1 273748 | Business-Transac-tionDocu-mentLoca-tion 273750 |
| DeliveryInformation 273752 | | | | Delivery-Terms 273754 | | 0..1 273756 | Delivery-Terms 273758 |
| | | | | | Maximum Lead-TimeDu-ration 273760 | 0..1 273762 | Duration 273764 |
| | | | | | Incoterms 273766 | 0..1 273768 | Incoterms 273770 |

FIG. 273-29

| Package | level1 | level2 | level3 | level4 | level5 | Cardinality | Datatype Name |
|---|---|---|---|---|---|---|---|
| BusinessTransaction DocumentReference 273772 | | | | QuoteRef erence 273774 | | 0..1 273776 | Business-Transac-tionDocu-mentRefer ence 273778 |
| | | | | | ID 273780 | 1 273782 | Business-Transac-tionDocu-mentID 273784 |
| | | | | | ItemID 273786 | 0..n 273788 | Business-Transac-tionDocu-men-tItemID 273790 |

FIG. 273-30

| Package | level1 | level2 | level3 | level4 | level5 | Cardinality | Datatype Name |
|---|---|---|---|---|---|---|---|
| | | | | PurchasingContractReference 273792 | | 0..1 273794 | BusinessTransactionDocumentReference 273796 |
| | | | | | ID 273798 | 1 273800 | BusinessTransactionDocumentID 273802 |
| | | | | | ItemID 273804 | 0..n 273806 | BusinessTransactionDocumentItemID 273808 |

FIG. 273-31

| Package | level1 | level2 | level3 | level4 | level5 | Cardinality | Datatype Name |
|---|---|---|---|---|---|---|---|
| | | | | BuyerProductCatalogueReference 273810 | | 0..1 273812 | CatalogueReference 273814 |
| | | | | | ID 273816 | 1 273818 | CatalogueID 273820 |
| | | | | | ItemID 273822 | 0..1 273824 | CatalogueItemID 273826 |
| Attachment 273828 | | | | Attachment 273830 | | 0..n 273832 | Attachment 273834 |
| | | | | AttachmentFolder 273836 | | 0..1 273838 | AttachmentFolder 273840 |

FIG. 273-32

| Package | level1 | level2 | level3 | level4 | level5 | Cardinality | Datatype Name |
|---|---|---|---|---|---|---|---|
| Description 273842 | | | | Descrip-tion 273844 | | 0..1 273846 | Descrip-tion 273848 |
| | | | | TextCol-lection 273850 | | 0..1 273852 | TextCol-lection 273854 |
| ScheduleLine 273856 | | | | Sched-uleLine 273858 | | 0..1 273860 | RFQItem-Sched-uleLine 273862 |
| | | | | | ID 273864 | 0..1 273866 | Business-Transac-tionDocu-men-tItemSche duleLineID 273868 |

FIG. 273-33

| Package | level1 | level2 | level3 | level4 | level5 | Cardinality | Datatype Name |
|---|---|---|---|---|---|---|---|
| | | | | | Delivery-Period 273870 | 0..1 273872 | UPPEROPEN_LOCALNORMALISED_DateTimePeriod 273874 |
| | | | | | Quantity 273876 | 0..1 273878 | Quantity 273880 |
| | | | | | Quanti-tyType-Code 273882 | 0..1 273884 | Quanti-tyType-Code 273886 |

FIG. 274-1

| Package | level1 | level2 | level3 | level4 | level5 | Cardinality | Datatype Name |
|---|---|---|---|---|---|---|---|
| RFQResultMes-sage 274000 | RFQResult-Message 274002 | | | | | | RFQResultMes-sage 274004 |
| MessageHeader 274006 | | Message-Header 274008 | | | | 1 274010 | BusinessDocu-mentMessage-Header 274012 |
| | | | ID 274014 | | | 1 274016 | BusinessDocu-mentMessageID 274018 |
| | | | ReferenceID 274020 | | | 0..1 274022 | BusinessDocu-mentMessageID 274024 |
| | | | Creation-DateTime 274026 | | | 1 274028 | GLOBAL_DateT ime 274030 |
| | | | SenderParty 274032 | | | 0..1 274034 | BusinessDocu-mentMessage-HeaderParty 274036 |

FIG. 274-2

| Package | level1 | level2 | level3 | level4 | level5 | Cardinality | Datatype Name |
|---|---|---|---|---|---|---|---|
| | | | | InternalID 274038 | | 0..1 274040 | PartyInternalId 274042 |
| | | | | StandardID 274044 | | 0..n 274046 | PartyStandardId 274048 |
| | | | | Contact 274050 | | 0..1 274052 | ContactPerson 274054 |
| | | | | | InternalID 274056 | 0..n 274058 | ContactPerson-InternalId 274060 |
| | | | | | BuyerID 274062 | 0..1 274064 | ContactPerson-PartyId 274066 |
| | | | | | BidderID 274068 | 0..1 274070 | ContactPerson-PartyId 274072 |
| | | | | | Address 274074 | 0..1 274076 | Address 274078 |

FIG. 274-3

| Package | level1 | level2 | level3 | level4 | level5 | Cardinality | Datatype Name |
|---|---|---|---|---|---|---|---|
| | | | Recipient-Party 274080 | | | 0..n 274082 | BusinessDocu-mentMessage-HeaderParty 274084 |
| RFQResult 274086 | | RFQResult 274088 | | | | 1 274090 | RFQResult 274092 |
| | | | ID 274094 | | | 1 274096 | BusinessTrans-actionDocumen-tID 274098 |
| | New 274100 | | Reconcilia-tionPeriod-CounterValue 274102 | | | 0..1 274104 | Reconciliation-PeriodCounter-Value 274106 |
| Party 274108 | | | BidderParty 274110 | | | 0..1 274112 | BusinessTrans-actionDocu-mentParty 274114 |
| Description 274116 | | | Description 274118 | | | 0..1 274120 | Description 274122 |

FIG. 274-4

| Package | level1 | level2 | level3 | level4 | level5 | Cardinality | Datatype Name |
|---|---|---|---|---|---|---|---|
| Item 274124 | | | Item 274126 | | | 0..n 274128 | RFQResultItem 274130 |
| | | | | ID 274132 | | 1 274134 | BusinessTrans-actionDocumen-tItemID 274136 |
| | | | | HierarchyRela-tionship 274138 | | 0..1 274140 | |
| | | | | | Paren-tItemID 274142 | 1 274144 | BusinessTrans-actionDocumen-tItemID 274146 |
| | | | | | TypeCode 274148 | 1 274150 | BusinessTrans-actionDocumen-tItemHierarchy Relationship-TypeCode 274152 |

FIG. 274-5

| Package | level1 | level2 | level3 | level4 | level5 | Cardinality | Datatype Name |
|---|---|---|---|---|---|---|---|
| Business-Transaction Documen-tReference 274154 | | | | QuoteReference 274156 | | 0..1 274158 | BusinessTrans-actionDocumen-tReference 274160 |
| | | | | | ID 274162 | 1 274164 | BusinessTrans-actionDocumen-tID 274166 |
| | | | | | ItemID 274168 | 0..n 274170 | BusinessTrans-actionDocumen-tItemID 274172 |
| Sched-uleLine 274174 | | | | ScheduleLine 274176 | | 0..1 274178 | RFQRe-sultItemSched-uleLine 274180 |
| | | | | | ID 274182 | 0..1 274184 | BusinessTrans-actionDocumen-tItemSched-uleLineID 274186 |

FIG. 274-6

| Package | level1 | level2 | level3 | level4 | level5 | Cardinality | Datatype Name |
|---|---|---|---|---|---|---|---|
| | | | | | DeliveryPeriod 274188 | 0..1 274190 | GLOBAL_DateTimePeriod 274192 |
| | | | | | Quantity 274194 | 0..1 274196 | Quantity 274198 |

To FIG. 278-6
278032
278112
278114
278034
278036
PortalProviderParty
278084

278104
Location
ShipToLocation
Address
278106
Receiving Site
278108
Contract Release Authorised Location
278110
278044
Attachment
Attachment Folder
278118
278046
To FIG. 278-3
To FIG. 278-7

| Package | level1 | level2 | level3 | Cardinality | Datatype Name |
|---|---|---|---|---|---|
| **RFQExecutionCancellationRequestMessage** **279000** | RFQExecutionCancellationRequestMessage 279002 | | | | RFQExecutionCancellationRequestMessage 279004 |
| **MessageHeader** **279006** | | MessageHeader 279008 | | 1 279010 | BusinessDocumentMessageHeader 279012 |
| **RFQRequest** **279014** | | RFQRequest 279016 | | 1 279018 | RFQExecutionCancellationRequest 279020 |
| | | | Attribute:reconciliationPeriodCounterValue 279022 | 1 279024 | CounterValue 279026 |
| | | | BaseBusinessTransactionDocumentID 279028 | 1 279030 | BusinessTransactionDocumentID 279032 |

FIG. 279-2

| Package | | | level1 | level2 | level3 | Cardinality | Datatype Name |
|---|---|---|---|---|---|---|---|
| | | | | | BaseBusinessTransactionDocumentTypeCode 279034 | 1 279036 | BusinessTransactionDocumentTypeCode 279038 |
| | | | | | ID 279040 | 1 279042 | BusinessTransactionDocumentID 279044 |

FIG. 280-1

| Package | | | level1 | level2 | level3 | level4 | Cardinal-ity | Datatype Name |
|---|---|---|---|---|---|---|---|---|
| **RFQExecutionCon-firmationMessage** **280000** | | | RFQExec utionCon-firmation-Message 280002 | | | | | RFQExecution-Confirmation-Message 280004 |
| **MessageHeader** **280006** | | | | Message Header 280008 | | | 1 280010 | BusinessDocu-mentMessage-Header 280012 |
| **RFQRequest** **280014** | | | | RFQRe-quest 280016 | | | 1 280018 | RFQExecution-Confirmation 280020 |
| | | | | | Attrib-ute:reconcili ationPeriod-Counter-Value 280022 | | 1 280024 | CounterValue 280026 |
| | | | | | BaseBusi-nessTrans-action-DocumentID 280028 | | 1 280030 | BusinessTrans-actionDocumen-tID 280032 |

FIG. 280-2

| Package | | | level1 | level2 | level3 | level4 | Cardinal-ity | Datatype Name |
|---|---|---|---|---|---|---|---|---|
| | | | | | BaseBusinessTransaction-Document-TypeCode 280034 | | 0..1 280036 | BusinessTransactionDocumentTypeCode 280038 |
| | | | | | ID 280040 | | 1 280042 | BusinessTransactionDocumentID 280044 |
| | | | | | UUID 280046 | | 0..1 280048 | UUID 280050 |
| | | | | | CompletedIndicator 280052 | | 0..1 280054 | OPTIONAL_Indicator 280056 |
| **Item** **280058** | | | | | Item 280060 | | 0..n 280062 | RFQExecutionConfirmationItem 280064 |

FIG. 280-3

| Package | | | | | | level1 | level2 | level3 | level4 | Cardinality | Datatype Name |
|---|---|---|---|---|---|---|---|---|---|---|---|
| | | | | | | | | | BaseBusiness-Transaction DocumentItemID 280066 | 1 280068 | BusinessTransactionDocumentItemID 280070 |
| | | | | | | | | | ID 280074 | 0..1 280076 | BusinessTransactionDocumentItemID 280078 |
| | | | | | | | | | UUID 280082 | 0..1 280084 | UUID 280086 |
| | | | | | | | | | CompletedIndicator 280088 | 0..1 280090 | OPTIONAL_Indicator 280092 |

FIG. 281-1

| Package | level1 | level2 | level3 | level4 | level5 | level6 | Cardinality | Datatype Name |
|---|---|---|---|---|---|---|---|---|
| RFQExecutionRequest-Message 281000 | RFQExecution Request-Message 281002 | | | | | | | RFQExecutionRe-quest-Message 281004 |
| MessageHeader 281006 | | Message-Header 281008 | | | | | 1 281010 | Business-Docu-mentMes-sageHeader 281012 |
| RFQRequest 281014 | | RFQRe-quest 281016 | | | | | 1 281018 | RFQExecutionRe-quest 281020 |
| | | | Attrib-ute:Reconciliation-Period-Counter-Value 281022 | | | | 1 281024 | Counter-Value 281026 |

FIG. 281-2

| Package | level1 | level2 | level3 | level4 | level5 | level6 | Cardinality | Datatype Name |
|---|---|---|---|---|---|---|---|---|
| | | | Base-Business-Transac-tion Documen-tID 281028 | | | | 1 281030 | Business-Transac-tionDocu-mentID 281032 |
| | | | Base-Business-Transac-tion Docu-menUUID 281034 | | | | 0..1 281036 | UUID 281038 |
| | | | Base-Business-Transac-tion Document TypeCode 281040 | | | | 1 281042 | Business-Transac-tionDocu-mentType Code 281044 |

FIG. 281-3

| Package | level1 | level2 | level3 | level4 | level5 | level6 | Cardinality | Datatype Name |
|---|---|---|---|---|---|---|---|---|
| | | | Name 281046 | | | | 0..1 281048 | MEDIUM _Name 281050 |
| | | | Currency-Code 281052 | | | | 0..1 281054 | Currency-Code 281056 |
| | | | Follow-UpType-Code 281058 | | | | 0..1 281060 | Ob-jectType-Code 281062 |
| | | | TotalTar-getA-mount 281064 | | | | 0..1 281066 | Amount 281068 |
| | | | Valid-ityPeriod 281070 | | | | 0..1 281072 | UPPEROPEN_GLOBAL_DateTimePeriod 281074 |

FIG. 281-4

| Package | level1 | level2 | level3 | level4 | level5 | level6 | Cardinality | Datatype Name |
|---|---|---|---|---|---|---|---|---|
| ProductInformation 281076 | | | Pro-ductCate-gory 281078 | | | | 0..1 281080 | Business-Transac-tionDocu-mentPro-ductCate-gory 281082 |
| | | | | Stan-dardID 281084 | | | 0..n 281086 | Pro-ductCate-goryStan-dardID 281088 |
| | | | | InternalID 281090 | | | 0..1 281092 | Pro-ductCate-goryInter-nalID 281094 |

FIG. 281-5

| Package | level1 | level2 | level3 | level4 | level5 | level6 | Cardinality | Datatype Name |
|---|---|---|---|---|---|---|---|---|
| Party 281096 | | | Buyer-Party 281098 | | | | 0..1 281100 | Business-Transac-tionDocu-ment-Party 281102 |
| | | | | InternalID 281104 | | | 0..1 281106 | Party-InternalID 281108 |
| | | | | Stan-dardID 281110 | | | 0..n 281112 | PartyStan dardID 281114 |
| | | | | Address 281116 | | | 0..1 281118 | Address 281120 |
| | | | | Contact-Person 281122 | | | 0..1 281124 | Contact-Person 281126 |

FIG. 281-6

| Package | level1 | level2 | level3 | level4 | level5 | level6 | Cardinality | Datatype Name |
|---|---|---|---|---|---|---|---|---|
| | | | | | InternalID 281128 | | 0..1 281130 | Contact-PersonID 281132 |
| | | | | | Address 281134 | | 0..1 281136 | Address 281138 |
| | | | Requestor Party 281140 | | | | 0..1 281142 | Business-Transac-tionDocu-ment-Party 281144 |
| | | | Produc-tRecipi-entParty 281146 | | | | 0..1 281148 | Busi-nessTran saction-Documen tParty 281150 |

FIG. 281-7

| Package | level1 | level2 | level3 | level4 | level5 | level6 | Cardinality | Datatype Name |
|---|---|---|---|---|---|---|---|---|
| | | | Bidder-Party 281152 | | | | 0..n 281154 | Busi-nessTransaction-DocumentParty 281156 |
| | | | Portal-Provider-Party 281158 | | | | 0..n 281160 | Business-Transac-tionDocu-ment-Party 281162 |
| Location 281180 | | | Ship-ToLoca-tion 281182 | | | | 0..1 281184 | Business-Transac-tionDocu-mentLo-cation 281186 |

FIG. 281-8

| Package | level1 | level2 | level3 | level4 | level5 | level6 | Cardinality | Datatype Name |
|---|---|---|---|---|---|---|---|---|
| | | | | InternalID 281188 | | | 0..1 281190 | Location-InternalID 281192 |
| | | | | Stan-dardID 281194 | | | 0..n 281196 | Location-Stan-dardID 281198 |
| | | | | Address 281200 | | | 0..1 281202 | Address 281204 |
| | | | Receiv-ingSite 281206 | | | | 0..1 281208 | Business-Transac-tionDocu-mentLo-cation 281210 |
| | | | | InternalID 281212 | | | 0..1 281214 | Location-InternalID 281216 |

FIG. 281-9

| Package | level1 | level2 | level3 | level4 | level5 | level6 | Cardinality | Datatype Name |
|---|---|---|---|---|---|---|---|---|
| | | | | Stan-dardID 281218 | | | 0..n 281220 | Location-Stan-dardID 281222 |
| | | | | Address 281224 | | | 0..1 281226 | Address 281228 |
| | | | Contrac-tRe-leaseAu-thorised-Location 281230 | | | | 0..n 281232 | Business-Transac-tionDocu-mentLo-cation 281234 |
| | | | | InternalID 281236 | | | 0..1 281238 | Location-InternalID 281240 |
| | | | | Stan-dardID 281242 | | | 0..n 281244 | Location-Stan-dardID 281246 |

FIG. 281-10

| Package | | level1 | level2 | level3 | level4 | level5 | level6 | Cardinality | Datatype Name |
|---|---|---|---|---|---|---|---|---|---|
| | | | | | Address 281248 | | | 0..1 281250 | Address 281252 |
| Attachment 281254 | | | | Attach-ment-Folder 281256 | | | | 0..1 281258 | Attach-ment-Folder 281260 |
| Description 281262 | | | | TextCol-lection 281264 | | | | 0..1 281266 | TextCol-lection 281268 |
| Item 281270 | | | | Item 281272 | | | | 0..n 281274 | RFQExec utionRe-questItem 281276 |
| | | | | | Base-Business-Transac-tion Documen-tItemID 281278 | | | 1 281280 | Business-Transac-tionDocu-men-tItemID 281282 |

FIG. 281-11

| Package | level1 | level2 | level3 | level4 | level5 | level6 | Cardinality | Datatype Name |
|---|---|---|---|---|---|---|---|---|
| | | | | Base-Business-Transaction DocumentItemUUID 281284 | | | 0..1 281286 | UUID 281288 |
| | | | | Base-Business-Transaction DocumentItem-TypeCode 281290 | | | 0..1 281292 | Business-TransactionDocumentItem-Type-Code 281294 |
| | | | | TargetA-mount 281296 | | | 0..1 281298 | Amount 281300 |

FIG. 281-12

| Package | level1 | level2 | level3 | level4 | level5 | level6 | Cardinality | Datatype Name |
|---|---|---|---|---|---|---|---|---|
| | | | | GroupID 281304 | | | 0..1 281306 | Procurement-DocumentItem-GroupID 281308 |
| | | | | Hierar-chyRelationship 281310 | | | 0..1 281312 | |
| | | | | | ParentItemID 281314 | | 1 281316 | BusinessTransactionDocumentItemID 281318 |

FIG. 281-13

| Package | level1 | level2 | level3 | level4 | level5 | level6 | Cardinality | Datatype Name |
|---|---|---|---|---|---|---|---|---|
| | | | | | TypeCode 281320 | | 1 281322 | Business-Transac-tionDocu-mentItem-Hierar-chyRela-tionship-Type-Code 281324 |
| ItemPro-ductInfor-mation 281326 | | | | Product 281328 | | | 0..1 281330 | Business-Transac-tionDocu-mentPro-duct 281332 |

FIG. 281-14

| Package | level1 | level2 | level3 | level4 | level5 | level6 | Cardinality | Datatype Name |
|---|---|---|---|---|---|---|---|---|
| | | | | | Stan-dardID 281334 | | 0..n 281336 | Product-Stan-dardID 281338 |
| | | | | | InternalID 281340 | | 0..1 281342 | Product-InternalID 281344 |
| | | | | | Product-Manufac-turerID 281346 | | 0..1 281348 | Product-PartyID 281350 |
| | | | | | Note 281352 | | 0..1 281354 | Note 281356 |
| | | | | | TypeCode 281358 | | 0..1 281360 | Pro-ductType-Code 281362 |

FIG. 281-15

| Package | level1 | level2 | level3 | level4 | level5 | level6 | Cardinality | Datatype Name |
|---|---|---|---|---|---|---|---|---|
| | | | | ProductCategory 281364 | | | 0..1 281366 | BusinessTransactionDocumentProductCategory 281368 |
| | | | | | StandardID 281370 | | 0..n 281372 | ProductCategoryStandardID 281374 |
| | | | | | InternalID 281376 | | 0..1 281378 | ProductCategoryInternalID 281380 |

FIG. 281-16

| Package | | level1 | level2 | level3 | level4 | level5 | level6 | Cardinality | Datatype Name |
|---|---|---|---|---|---|---|---|---|---|
| | | | | | BuyerPro-ductCata-logueRefe rence 281382 | | | 0..1 281384 | Catalo-queRefer-ence 281386 |
| | ItemParty 281388 | | | | Buyer-Party 281390 | | | 0..1 281392 | Business-Transac-tionDocu-ment-Party 281394 |
| | | | | | | InternalID 281396 | | 0..1 281398 | Party-InternalID 281400 |
| | | | | | | Stan-dardID 281402 | | 0..n 281404 | PartyStan dardID 281406 |
| | | | | | | Address 281408 | | 0..1 281410 | Address 281412 |

FIG. 281-17

| Package | level1 | level2 | level3 | level4 | level5 | level6 | Cardinality | Datatype Name |
|---|---|---|---|---|---|---|---|---|
| | | | | | Contact-Person 281414 | | 0..1 281416 | Contact-Person 281418 |
| | | | | | | InternalID 281420 | 0..1 281422 | Contact-PersonID 281424 |
| | | | | | | Address 281426 | 0..1 281428 | Address 281430 |
| | | | | Requestor Party 281432 | | | 0..1 281434 | Business-Transac-tionDocu-ment-Party 281436 |

FIG. 281-18

| Package | level1 | level2 | level3 | level4 | level5 | level6 | Cardinality | Datatype Name |
|---|---|---|---|---|---|---|---|---|
| | | | | Produc-tRecipi-entParty 281438 | | | 0..1 281440 | Business-Transac-tionDocu-ment-Party 281442 |
| | | | | Service-Performer Party 281444 | | | 0..n 281446 | Business-Transac-tionDocu-ment-Party 281448 |

FIG. 281-19

| Package | | | | level1 | level2 | level3 | level4 | level5 | level6 | Cardinality | Datatype Name |
|---|---|---|---|---|---|---|---|---|---|---|---|
| | | | | | | | ResponsiblePurchasingUnitParty 281452 | | | 0..1 281454 | BusinessTransactionDocumentParty 281456 |
| | | | ItemLocation 281474 | | | | ShipToLocation 281476 | | | 0..1 281478 | BusinessTransactionDocumentLocation 281480 |
| | | | | | | | | InternalID 281482 | | 0..1 281484 | LocationInternalID 281486 |
| | | | | | | | | StandardID 281488 | | 0..n 281490 | LocationStandardID 281492 |

FIG. 281-20

| Package | level1 | level2 | level3 | level4 | level5 | level6 | Cardinality | Datatype Name |
|---|---|---|---|---|---|---|---|---|
| | | | | | Address 281494 | | 0..1 281496 | Address 281498 |
| | | | | Receiv-ingSite 281500 | | | 0..1 281502 | Business-Transac-tionDocu-mentLo-cation 281504 |
| | | | | | InternalID 281506 | | 0..1 281508 | Location-InternalID 281510 |
| | | | | | Stan-dardID 281512 | | 0..n 281514 | Location-Stan-dardID 281516 |
| | | | | | Address 281518 | | 0..1 281520 | Address 281522 |

FIG. 281-21

| Package | level1 | level2 | level3 | level4 | level5 | level6 | Cardinality | Datatype Name |
|---|---|---|---|---|---|---|---|---|
| ItemAttachment 281524 | | | | AttachmentFolder 281526 | | | 0..1 281528 | AttachmentFolder 281530 |
| ItemDescription 281532 | | | | Description 281534 | | | 0..1 281536 | SHORT_Description 281538 |
| | | | | TextCollection 281540 | | | 0..1 281542 | TextCollection 281544 |
| ItemScheduleLine 281546 | | | | ScheduleLine 281548 | | | 0..1 281550 | RFQExecutionItemScheduleLine 281552 |

FIG. 281-22

| Package | level1 | level2 | level3 | level4 | level5 | level6 | Cardinality | Datatype Name |
|---|---|---|---|---|---|---|---|---|
| | | | | | Delivery-Period 281554 | | 0..1 281556 | UPPEROPEN_LOCALNORMALISED_DateTimePeriod 281558 |
| | | | | | Quantity 281560 | | 1 281562 | Quantity 281564 |
| | | | | | Quanti-tyType-Code 281566 | | 0..1 281568 | Quanti-tyType-Code 281570 |

| Package | | | level1 | level2 | level3 | level4 | level5 | Cardinality | Datatype Name |
|---|---|---|---|---|---|---|---|---|---|
| SupplierQuoteAwardNotification-Message 283000 | | | SupplierQuoteAward NotificationMessage 283002 | | | | | | Supplier-QuoteAwardNo-tificationMes-sage 283004 |
| | Message-Header 283006 | | | Message-Header 283008 | | | | 0..1 283010 | BusinessDocu-mentMessage-Header 283012 |
| | SupplierQuote 283014 | | | SupplierQuote 283016 | | | | 1 283018 | Supplier-QuoteAwardNo-tification 283020 |
| | | | | | ID 283022 | | | 1 283024 | BusinessTrans-actionDocu-mentID 283026 |
| | | | | | Reconcilia-tionPeriod-Counter-Value 283030 | | | 0..1 283032 | Reconciliation-PeriodCounter-Value 283034 |

FIG. 283-2

| Package | | | | level1 | level2 | level3 | level4 | level5 | Cardinality | Datatype Name |
|---|---|---|---|---|---|---|---|---|---|---|
| | | | | | | Name 283036 | | | 0..1 283038 | MEDIUM_Name 283040 |
| | | Party 283042 | | | | BuyerParty 283044 | | | 1 283046 | BusinessTransactionDocumentParty 283048 |
| | | | | | | | InternalID 283050 | | 0..1 283052 | PartyInternalID 283054 |
| | | | | | | | StandardID 283056 | | 0..n 283058 | PartyStandardID 283060 |
| | | | | | | | Address 283062 | | 0..1 283064 | Address 283066 |
| | | | | | | | ContactPerson 283068 | | 0..1 283070 | ContactPerson 283072 |
| | | | | | | | | InternalID 283074 | 0..1 283076 | ContactPersonID 283078 |

FIG. 283-3

| Package | | | | level1 | level2 | level3 | level4 | level5 | Cardinality | Datatype Name |
|---|---|---|---|---|---|---|---|---|---|---|
| | | | | | | | | Address 283080 | 0..1 283082 | Address 283084 |
| | | | | | | Requestor-Party 283086 | | | 0..1 283088 | BusinessTrans-actionDocu-mentParty 283090 |
| | | | | | | ProductRe-cipientParty 283092 | | | 0..1 283094 | BusinessTrans-actionDocu-mentParty 283096 |
| | | | | | | BidderParty 283098 | | | 1 283100 | BusinessTrans-actionDocu-mentParty 283102 |
| | | | | | | Responsi-blePurchas-ingOrganisa-tionParty 283106 | | | 1 283108 | BusinessTrans-actionDocu-mentParty 283110 |

FIG. 283-4

| Package | | | | level1 | level2 | level3 | level4 | level5 | Cardinality | Datatype Name |
|---|---|---|---|---|---|---|---|---|---|---|
| | | | | | | ResponsiblePurchasingGroupParty 283114 | | | 1 283116 | BusinessTransactionDocumentParty 283118 |
| | | Location 283120 | | | | ShipToLocation 283122 | | | 0..1 283124 | BusinessTransactionDocumentShipToLocation 283126 |
| | | | | | | | StandardID 283128 | | 0..n 283130 | LocationStandardID 283132 |
| | | | | | | | InternalID 283134 | | 0..1 283136 | LocationInternalID 283138 |
| | | | | | | | Address 283140 | | 0..1 283142 | Address 283144 |
| | | DeliveryInformation 283146 | | | | DeliveryTerms 283150 | | | 0..1 283152 | DeliveryTerms 283154 |

FIG. 283-5

| Package | | | level1 | level2 | level3 | level4 | level5 | Cardinality | Datatype Name |
|---|---|---|---|---|---|---|---|---|---|
| | | | | | | Incoterms 283158 | | 0..1 283160 | Incoterms 283162 |
| | PaymentInformation 283164 | | | | CashDis-countTerms 283166 | | | 0..1 283168 | CashDiscount-Terms 283170 |
| | | | | | | Maximum-CashDiscount 283172 | | 0..1 283174 | CashDiscount 283176 |
| | | | | | | NormalCash-Discount 283178 | | 0..1 283180 | CashDiscount 283182 |
| | | | | | | FullPayment-DueDaysValue 283184 | | 0..1 283186 | IntegerValue 283188 |
| | Attachment 283190 | | | | Attach-mentWe-bAddress 283192 | | | 0..n 283194 | AttachmentWe-bAddress 283196 |

FIG. 283-6

| Package | | | | level1 | level2 | level3 | level4 | level5 | Cardinality | Datatype Name |
|---|---|---|---|---|---|---|---|---|---|---|
| | | | | | | InternalAt-tachmentWebAddress 283198 | | | 0..n 283200 | AttachmentWe-bAddress 283202 |
| | | Description 283204 | | | | Description 283206 | | | 0..1 283208 | Description 283210 |
| | | | | | | InternalDe-scription 283212 | | | 0..1 283214 | Description 283216 |
| | | Item 283218 | | | | Item 283220 | | | 0..n 283222 | Supplier-QuoteAwardNo-tificationItem 283224 |
| | | | | | | | ID 283226 | | 1 283228 | BusinessTrans-actionDocu-mentItemID 283230 |

FIG. 283-7

| Package | | | | level1 | level2 | level3 | level4 | level5 | Cardinality | Datatype Name |
|---|---|---|---|---|---|---|---|---|---|---|
| | | | | | | | TypeCode 283232 | | 0..1 283234 | BusinessTransactionDocumentItemTypeCode 283236 |
| | | | | | | | HierarchyRelationship 283238 | | 0..1 283240 | |
| | | | | | | | | ParentItemID 283242 | 1 283244 | BusinessTransactionDocumentItemID 283246 |
| | | | | | | | | TypeCode 283248 | 1 283250 | BusinessTransactionDocumentItemHierarchyRelationshipTypeCode 283252 |
| | | | ProductInformation 283254 | | | | Product 283256 | | 0..1 283258 | BusinessTransactionDocumentProduct 283260 |

FIG. 283-8

| Package | | | | level1 | level2 | level3 | level4 | level5 | Cardinality | Datatype Name |
|---|---|---|---|---|---|---|---|---|---|---|
| | | | | | | | | StandardID 283262 | 0..n 283264 | ProductStandardID 283266 |
| | | | | | | | | InternalID 283268 | 0..1 283270 | ProductInternalID 283272 |
| | | | | | | | | Product-SellerID 283276 | 0..1 283278 | ProductPartyID 283280 |
| | | | | | | | | Note 283282 | 0..1 283284 | Note 283286 |
| | | | | | | | | TypeCode 283288 | 0..1 283290 | ProductTypeCode 283292 |
| | | | | | | | ProductCategory 283294 | | 0..1 283296 | BusinessTransactionDocumentProductCategory 283298 |

FIG. 283-9

| Package | | | | level1 | level2 | level3 | level4 | level5 | Cardinality | Datatype Name |
|---|---|---|---|---|---|---|---|---|---|---|
| | | | | | | | | StandardID 283300 | 0..n 283302 | ProductCategoryStandardID 283304 |
| | | | | | | | | InternalID 283306 | 0..1 283308 | ProductCategoryInternalID 283310 |
| | | | PriceInformation 283312 | | | | NetUnitPrice 283314 | | 0..1 283316 | Price 283318 |
| | | | | | | | | Amount 283320 | 1 283322 | Amount 283324 |
| | | | | | | | | BaseQuantity 283326 | 1 283328 | Quantity 283330 |
| | | | Party 283332 | | | | RequestorParty 283334 | | 0..1 283336 | BusinessTransactionDocumentParty 283338 |

FIG. 283-10

| Package | | | | level1 | level2 | level3 | level4 | level5 | Cardinality | Datatype Name |
|---|---|---|---|---|---|---|---|---|---|---|
| | | | | | | | ProductRecipientParty 283340 | | 0..1 283342 | BusinessTransactionDocumentParty 283344 |
| | | | | | | | ServicePerformerParty 283348 | | 0..1 283350 | BusinessTransactionDocumentParty 283352 |
| | | | Location 283354 | | | | ShipToLocation 283356 | | 0..1 283358 | BusinessTransactionDocumentShipToLocation 283360 |
| | | | | | | | | StandardID 283362 | 0..n 283364 | LocationStandardID 283366 |
| | | | | | | | | InternalID 283368 | 0..1 283370 | LocationInternalID 283372 |
| | | | | | | | | Address 283374 | 0..1 283376 | Address 283378 |

FIG. 283-11

| Package | | | | level1 | level2 | level3 | level4 | level5 | Cardinality | Datatype Name |
|---|---|---|---|---|---|---|---|---|---|---|
| | | | DeliveryIn-formation 283380 | | | | DeliveryTerms 283382 | | 0..1 283384 | DeliveryTerms 283386 |
| | | | | | | | | Incoterms 283390 | 0..1 283392 | Incoterms 283394 |
| | | | | | | | | Maximum-LeadTime-Duration 283396 | 0..1 283398 | Duration 283400 |
| | | | BusinessTransaction-DocumentReference 283402 | | | | PurchaseRe-questRefer-ence 283404 | | 0..1 283406 | BusinessTrans-actionDocu-mentReference 283408 |
| | | | | | | | | ID 283410 | 1 283412 | BusinessTrans-actionDocu-mentID 283414 |
| | | | | | | | | ItemID 283416 | 0..1 283418 | BusinessTrans-actionDocu-mentItemID 283420 |

FIG. 283-12

| Package | | | | level1 | level2 | level3 | level4 | level5 | Cardinality | Datatype Name |
|---|---|---|---|---|---|---|---|---|---|---|
| | | | | | | | BuyerProductCatalogueReference 283424 | | 0..1 283426 | CatalogueRefernce 283428 |
| | | | Attachment 283430 | | | | AttachmentWebAddress 283432 | | 0..n 283434 | AttachmentWebAddress 283436 |
| | | | | | | | InternalAttachmentWebAddress 283438 | | 0..n 283440 | AttachmentWebAddress 283442 |
| | | | Description 283444 | | | | Description 283446 | | 0..1 283448 | Description 283450 |
| | | | | | | | InternalDescription 283452 | | 0..1 283454 | Description 283456 |

FIG. 283-13

| Package | | | | level1 | level2 | level3 | level4 | level5 | Cardinality | Datatype Name |
|---|---|---|---|---|---|---|---|---|---|---|
| | | | SchedduleLine 283458 | | | | ScheduleLine 283460 | | 0..1 283462 | BusinessTransactionDocumentScheduleLine 283464 |
| | | | | | | | | DeliveryPeriod 283466 | 0..1 283468 | GLOBAL_DateTimePeriod 283470 |
| | | | | | | | | Quantity 283472 | 1 283474 | Quantity 283476 |

| Package | level1 | level2 | level3 | Cardinality | Datatype Name |
|---|---|---|---|---|---|
| BusinessTransactionDocumentImageRecognitionRequestMessage 285000 | BusinessTransactionDocumentImageRecognitionRequest 285002 | | | | Business-TransactionDocument-ImageRecognition-Request-Message 285004 |
| MessageHeader 285006 | | Message-Header 285008 | | 1 285010 | Message-Header 285012 |
| | | | ID 285014 | 1 285016 | MessageID 285018 |
| | | | ReferenceD 285020 | 0..1 285022 | MessageID 285024 |

FIG. 285-2

| Package | | level1 | level2 | level3 | Cardinality | Datatype Name |
|---|---|---|---|---|---|---|
| | | | | Creation-DateTime 285026 | 1 285028 | DateTime 285030 |
| | | | | Sender-Party 285032 | 0..1 285034 | Busi-nessDocument Mes-sageHeaderParty 285036 |
| | | | | Recipi-entParty 285038 | 0..1 285040 | Business-Document Message-Header-Party 285042 |

FIG. 285-3

| Package | level1 | level2 | level3 | Cardinality | Datatype Name |
|---|---|---|---|---|---|
| BusinessTransactionDocument ImageRecognition 285044 | | Business-Transac-tionDocu-ment ImageRec-ognition 285046 | | 1 285048 | Business-Transac-tionDocu-mentI-mageRec ognition 285050 |
| | | | Business-Transac-tion-Document Type-Code 285052 | 1 285054 | Busi-nessTran saction-Document Type-Code 285056 |
| | | | Attrib-ute:recon ciliation-Period-Counter-Value 285058 | 0..1 285060 | Counter-Value 285062 |

FIG. 285-4

| Package | level1 | level2 | level3 | Cardinality | Datatype Name |
|---|---|---|---|---|---|
| AttachmentFolder 285064 | | | Attach-ment-Folder 285066 | 1..n 285068 | Attach-ment-Folder 285070 |

FIG. 286-1

| Package | level1 | level2 | level3 | level4 | level5 | Cardinality | Datatype Name |
|---|---|---|---|---|---|---|---|
| InvoiceMessage 286000 | InvoiceMessage 286002 | | | | | | InvoiceMessage 286004 |
| Message-Header 286006 | | Message-Header 286008 | | | | 0..1 286010 | Message-Header 286012 |
| | | | ID 286014 | | | 1 286016 | MessageID 286018 |
| | | | ReferenceD 286020 | | | 0..1 286022 | MessageID 286024 |
| | | | Creation-DateTime 286026 | | | 1 286028 | DateTime 286030 |
| | | | Sender-Party 286032 | | | 0..1 286034 | Business-Document Message-Header-Party 286036 |

FIG. 286-2

| Package | level1 | level2 | level3 | level4 | level5 | Cardinality | Datatype Name |
|---|---|---|---|---|---|---|---|
| | | | Recipient-Party 286038 | | | 0..1 286040 | Business-Document Message-Header-Party 286042 |
| Invoice 286044 | | Invoice 286046 | | | | 1 286048 | |
| | | | ID 286050 | | | 1 286052 | Business-Transaction Documen-tID 286054 |
| | | | BillToID 286056 | | | 0..1 286058 | Business-Transaction Documen-tID 286060 |

FIG. 286-3

| Package | level1 | level2 | level3 | level4 | level5 | Cardinality | Datatype Name |
|---|---|---|---|---|---|---|---|
| | | | Reconcilia-tionPeriod-Counter-Value 286062 | | | 0..1 286064 | Reconcilia-tionPeriod-Counter-Value 286066 |
| | | | TypeCode 286068 | | | 1 286070 | Business-Transaction Document-TypeCode 286072 |
| | | | DateTime 286074 | | | 1 286076 | DateTime 286078 |
| | | | Cancella-tionInvoice Indicator 286080 | | | 0..1 286082 | Indicator 286084 |
| | | | Accep-tanceS-tatusCode 286086 | | | 0..1 286088 | Accep-tanceS-tatusCode 286090 |

FIG. 286-4

| Package | level1 | level2 | level3 | level4 | level5 | Cardinality | Datatype Name |
|---|---|---|---|---|---|---|---|
| | | | Note 286092 | | | 0..1 286094 | Note 286096 |
| | | | Name 286098 | | | 0..1 286100 | Name 286102 |
| Party 286104 | | | BillToParty 286106 | | | 1 286108 | Business-Transaction Document-Party 286110 |
| | | | BillFrom-Party 286112 | | | 1 286114 | Business-Transaction Document-Party 286116 |
| | | | BuyerParty 286118 | | | 0..1 286120 | Business-Transaction Document-Party 286122 |

FIG. 286-5

| Package | level1 | level2 | level3 | level4 | level5 | Cardinality | Datatype Name |
|---|---|---|---|---|---|---|---|
| | | | SellerParty 286124 | | | 0..1 286126 | Business-Transaction Document-Party 286128 |
| | | | ServicePer-formerParty 286130 | | | 0..1 286132 | Business-Transaction Document-Party 286134 |
| | | | Requestor-Party 286136 | | | 0..1 286138 | Business-Transaction Document-Party 286140 |
| | | | ProductRe-cipientParty 286142 | | | 0..1 286144 | Business-Transaction Document-Party 286146 |

FIG. 286-6

| Package | level1 | level2 | level3 | level4 | level5 | Cardinality | Datatype Name |
|---|---|---|---|---|---|---|---|
| | | | Vendor-Party 286148 | | | 0..1 286150 | Business-Transaction Document-Party 286152 |
| | | | Manufac-turerParty 286154 | | | 0..1 286156 | Business-Transaction Document-Party 286158 |
| | | | PayerParty 286160 | | | 0..1 286162 | Business-Transaction Document-Party 286164 |
| | | | PayeeParty 286166 | | | 0..1 286168 | Business-Transaction Document-Party 286170 |

FIG. 286-7

| Package | level1 | level2 | level3 | level4 | level5 | Cardinality | Datatype Name |
|---|---|---|---|---|---|---|---|
| | | | Carrier-Party 286172 | | | 0..1 286174 | Business-Transaction Document-Party 286176 |
| Location 286178 | | | ShipToLo-cation 286180 | | | 0..1 286182 | Business-Transaction Document-Location 286184 |
| | | | ShipFrom-Location 286186 | | | 0..1 286188 | Business-Transaction Document-Location 286190 |
| DeliveryIn-formation 286192 | | | Delivery-Terms 286194 | | | 0..1 286196 | Delivery-Terms 286198 |
| PaymentIn-formation 286200 | | | CashDis-countTerms 286202 | | | 0..1 286204 | CashDis-countTerms 286206 |

FIG. 286-8

| Package | level1 | level2 | level3 | level4 | level5 | Cardinality | Datatype Name |
|---|---|---|---|---|---|---|---|
| | | | Payment-Form 286208 | | | 0..1 286210 | |
| | | | | Code 286212 | | 0..1 286214 | Payment-FormCode 286216 |
| | | | | Payment-Card 286218 | | 0..1 286220 | Payment-Card 286222 |
| PriceInforma-tion 286224 | | | Price 286226 | | | 1 286228 | |
| | | | | Gros-sAmount 286230 | | 1 286232 | Amount 286234 |
| | | | | NetAmount 286236 | | 0..1 286238 | Amount 286240 |
| | | | | TaxAmount 286242 | | 0..1 286244 | Amount 286246 |

FIG. 286-9

| Package | level1 | level2 | level3 | level4 | level5 | Cardinality | Datatype Name |
|---|---|---|---|---|---|---|---|
| | | | | Ex-changeRate 286248 | | 0..1 286250 | ExchangeRate 286252 |
| Tax 286254 | | | ProductTax 286256 | | | 0..n 286258 | ProductTax 286260 |
| Attachment 286262 | | | Attachment 286264 | | | 0..n 286266 | Attachment 286268 |
| Description 286270 | | | Description 286272 | | | 0..1 286274 | Description 286276 |
| | | | Con-firmedDe-scription 286278 | | | 0..1 286280 | Description 286282 |
| Item 286284 | | | Item 286286 | | | 1..n 286288 | |
| | | | | ID 286290 | | 1 286292 | Business-Transaction Documen-tItemID 286294 |

FIG. 286-10

| Package | level1 | level2 | level3 | level4 | level5 | Cardinality | Datatype Name |
|---|---|---|---|---|---|---|---|
| | | | | BillToID 286296 | | 0..1 286298 | Business-Transaction Documen-tItem-PartyID 286300 |
| | | | | TypeCode 286302 | | 1 286304 | Business-Transcation Documen-tItemType-Code 286306 |
| | | | | Quantity 286308 | | 0..1 286310 | Quantity 286312 |
| | | | | Hierar-chyRela-tionship 286314 | | 0..1 286316 | |

FIG. 286-11

| Package | level1 | level2 | level3 | level4 | level5 | Cardinality | Datatype Name |
|---|---|---|---|---|---|---|---|
| | | | | | Paren-tItemID 286318 | 1 286320 | Business-Transaction Documen-tItemID 286322 |
| | | | | | TypeCode 286324 | 1 286326 | ItemHierar-chyRela-tioship TypeCode 286328 |
| | | | | DeliveryPe-riod 286330 | | 0..1 286332 | DateTimeP eriod 286334 |
| ProductIn-formation 286336 | | | | Product 286338 | | 0..1 286340 | Business-Transaction Document-Product 286342 |

FIG. 286-12

| Package | level1 | level2 | level3 | level4 | level5 | Cardinality | Datatype Name |
|---|---|---|---|---|---|---|---|
| | | | | Pro-ductCate-gory 286344 | | 0..1 286346 | Business-Transaction Document-Pro-ductCate-gory 286348 |
| PriceInfor-mation 286350 | | | | Price 286352 | | 0..1 286354 | |
| | | | | | Gros-sAmount 286356 | 0..1 286358 | Amount 286360 |
| | | | | | NetAmount 286362 | 1 286364 | Amount 286366 |
| | | | | | TaxAmount 286368 | 0..1 286370 | Amount 286372 |
| | | | | | NetUnit-Price 286374 | 0..1 286376 | Price 286378 |

FIG. 286-13

| Package | level1 | level2 | level3 | level4 | level5 | Cardinality | Datatype Name |
|---|---|---|---|---|---|---|---|
| | | | | | Ex-changeRate 286380 | 0..1 286382 | ExchangeRate 286384 |
| | | | | | PricingDate 286386 | 0..1 286388 | Date 286390 |
| | | | | | Component 286392 | 0..n 286394 | PriceComponent 286396 |
| Tax 286398 | | | | ProductTax 286400 | | 0..n 286402 | ProductTax 286404 |
| Party 286406 | | | | BuyerParty 286408 | | 0..1 286410 | Business-Transaction Document-Party 286412 |
| | | | | SellerParty 286414 | | 0..1 286416 | Business-Transaction Document-Party 286418 |

FIG. 286-14

| Package | level1 | level2 | level3 | level4 | level5 | Cardinality | Datatype Name |
|---|---|---|---|---|---|---|---|
| | | | | ServicePer-formerParty 286420 | | 0..1 286422 | Business-Transaction Document-Party 286424 |
| | | | | Requestor-Party 286426 | | 0..1 286428 | Business-Transaction Document-Party 286430 |
| | | | | ProductRe-cipientParty 286432 | | 0..1 286434 | Business-Transaction Document-Party 286436 |
| | | | | Vendor-Party 286438 | | 0..1 286440 | Business-Transaction Document-Party 286442 |

FIG. 286-15

| Package | level1 | level2 | level3 | level4 | level5 | Cardinality | Datatype Name |
|---|---|---|---|---|---|---|---|
| | | | | ManufacturerParty 286444 | | 0..1 286446 | BusinessTransactionDocumentParty 286448 |
| | | | | CarrierParty 286450 | | 0..1 286452 | BusinessTransactionDocumentParty 286454 |
| Location 286456 | | | | ShipToLocation 286458 | | 0..1 286460 | BusinessTransactionDocumentLocation 286462 |
| | | | | ShipFromLocation 286464 | | 0..1 286466 | BusinessTransactionDocumentLocation 286468 |

FIG. 286-16

| Package | level1 | level2 | level3 | level4 | level5 | Cardinality | Datatype Name |
|---|---|---|---|---|---|---|---|
| DeliveryInformation 286470 | | | | DeliveryTerms 286472 | | 0..1 286474 | DeliveryTerms 286476 |
| BusinessTransaction DocumentReference 286478 | | | | PurchaseOrderReference 286480 | | 0..n 286482 | BusinessTransaction DocumentReference 286484 |
| | | | | SalesOrderReference 286486 | | 0..n 286488 | BusinessTransaction DocumentReference 286490 |
| | | | | DeliveryReference 286492 | | 0..1 286494 | BusinessTransaction DocumentReference 286496 |

FIG. 286-17

| Package | level1 | level2 | level3 | level4 | level5 | Cardinality | Datatype Name |
|---|---|---|---|---|---|---|---|
| | | | | ServiceAc-knowl-edgement Reference 286498 | | 0..1 286500 | Business-Transaction Documen-tReference 286502 |
| | | | | OriginIn-voiceRefer-ence 286504 | | 0..1 286506 | Business-Transaction Documen-tReference 286508 |
| | | | | Purchase-Contract Reference 286510 | | 0..1 286512 | Business-Transaction Documen-tReference 286514 |
| | | | | SalesCon-tract Reference 286516 | | 0..1 286518 | Business-Transaction Documen-tReference 286520 |

FIG. 286-18

| Package | level1 | level2 | level3 | level4 | level5 | Cardinality | Datatype Name |
|---|---|---|---|---|---|---|---|
| | | | | BuyerProductCatalog Reference 286522 | | 0..1 286524 | CatalogueReference 286526 |
| | | | | SellerProductCatalog Reference 286528 | | 0..1 286530 | CatalogueReference 286532 |
| Attachment 286534 | | | | Attachment 286536 | | 0..n 286538 | Attachment 286540 |
| Description 286542 | | | | Description 286544 | | 0..1 286546 | Description 286548 |
| | | | | Confirmed-Description 286550 | | 0..1 286552 | Description 286554 |

FIG. 287-1

| Package | | level1 | level2 | level3 | level4 | level5 | Cardinality | Datatype Name |
|---|---|---|---|---|---|---|---|---|
| SupplierInvoiceRequestMessage 287000 | | SupplierInvoiceRequestMessage 287002 | | | | | | SupplierInvoiceRequestMessage 287004 |
| | MessageHeader 287006 | | MessageHeader 287008 | | | | 0..1 287010 | MessageHeader 287012 |
| | SupplierInvoice 287014 | | SupplierInvoice 287016 | | | | 1 287018 | SupplierInvoiceRequest 287020 |
| | | | | ReconciliationPeriodCounterValue 287022 | | | 0..1 287024 | ReconciliationPeriodCounterValue 287026 |
| | Item 287028 | | | Item 287030 | | | 1..n 287032 | SupplierInvoiceRequestItem 287034 |

FIG. 287-2

| Package | level1 | level2 | level3 | level4 | level5 | Cardinality | Datatype Name |
|---|---|---|---|---|---|---|---|
| BusinessTransactionDocumentReference 287036 | | | | PurchaseOrderReference 287038 | | 1 287040 | BusinessTransactionDocumentReference 287042 |

FIG. 289-1

| Package | | | | level1 | level2 | level3 | level4 | level5 | | Cardinality | Datatype Name |
|---|---|---|---|---|---|---|---|---|---|---|---|
| InteractiveFormSupplierInvoiceVerificationExceptionResolutionRequestMessage 289000 | | | | InteractiveFormSupplierInvoiceVerificationExceptionResolutionRequest 289002 | | | | | | | InteractiveFormSupplierInvoiceVerificationExceptionResolutionRequestMessage 289004 |
| | MessageHeader 289006 | | | | MessageHeader 289008 | | | | | 0..1 289010 | MessageHeader 289012 |
| | | | | | | ID 289014 | | | | 1 289016 | MessageID 289018 |
| | | | | | | ReferenceID 289020 | | | | 0..1 289022 | MessageID 289024 |
| | | | | | | CreationDateTime 289026 | | | | 1 289028 | DateTime 289030 |

FIG. 289-2

| Package | | | | | level1 | level2 | level3 | level4 | level5 | | Cardinality | Datatype Name |
|---|---|---|---|---|---|---|---|---|---|---|---|---|
| | | | | | | | TestDataIndicator 289032 | | | | 0..1 289034 | Indicator 289036 |
| | | | | | | | ReconciliationIndicator 289038 | | | | 0..1 289040 | Indicator 289042 |
| | | | | | | | SenderParty 289044 | | | | 0..1 289046 | BusinessDocumentMessageHeaderParty 289048 |
| | | | | | | | RecipientParty 289050 | | | | 0..1 289052 | BusinessDocumentMessageHeaderParty 289054 |

FIG. 289-3

| Package | | | | level1 | level2 | level3 | level4 | level5 | | Cardinality | Datatype Name |
|---|---|---|---|---|---|---|---|---|---|---|---|
| | | | | | | BusinessScopeBusinessProcess 289056 | | | | 0..n 289058 | BusinessScopeBusinessProcess 289060 |
| | | | | | | | TypeCode 289062 | | | 1 289064 | BusinessScopeBusinessProcessTypeCode 289066 |
| | | | | | | | IstanceID 289068 | | | 0..1 289070 | BusinessScopeBusinessProcessInstanceID 289072 |
| | | | | | InteractiveFormReturnURI 289074 | | | | | 0..1 289076 | EmailURI 289078 |

FIG. 289-4

| Package | | | | level1 | level2 | level3 | level4 | level5 | | Cardinality | Datatype Name |
|---|---|---|---|---|---|---|---|---|---|---|---|
| | | | | | ProcessorEmailURI 289080 | | | | | 0..1 289082 | EmailURI 289084 |
| | SupplierInvoiceVerificationException 289086 | | | | SupplierInvoiceVerificationException 289088 | | | | | 1 289090 | SupplierInvoiceVerificationExceptionResolutionRequest 289092 |
| | | | | | | Attribut:reconciliationPeriodCounterValue 289094 | | | | 0..1 289096 | CounterValue 289098 |
| | | | | | | ID 289100 | | | | 1 289102 | BusinessTransactionDocumentID 289104 |

FIG. 289-5

| Pack-age | | | | leve l1 | level2 | level3 | level4 | level5 | | Cardinal-ity | Datatype Name |
|---|---|---|---|---|---|---|---|---|---|---|---|
| | | | | | | Processing-TypeCode 289106 | | | | 0..1 289108 | Business-Transac-tionDocu-mentProc-essing-TypeCode 289110 |
| | | | | | | Processing-TypeCode-Name 289112 | | | | 0..1 289114 | Name 289116 |
| | | | | | | Accep-tanceStatus-Code 289118 | | | | 0..1 289120 | Accep-tanceS-tatusCode 289122 |
| | | | | | | Accep-tanceStatus-CodeName 289124 | | | | 0..1 289126 | Name 289128 |
| | Message 289130 | | | | | Message 289132 | | | | 0..n 289134 | |

FIG. 289-6

| Package | | | | level1 | level2 | level3 | level4 | level5 | | Cardinality | Datatype Name |
|---|---|---|---|---|---|---|---|---|---|---|---|
| | | | | | | | Note 289136 | | | 1 289138 | Note 289140 |
| | Attachment 289142 | | | | | Attachment-Folder 289144 | | | | 0..1 289146 | Attach-mentFolder 289148 |
| | TextCollection 289150 | | | | | TextCollec-tion 289152 | | | | 0..1 289154 | TextCollec-tion 289156 |
| | | | | | | ReplyTextCol lection 289158 | | | | 0..1 289160 | TextCollec-tion 289162 |
| | Invoice 289164 | | | | | Invoice 289166 | | | | 1 289168 | SupplierIn-voiceVerifi-cationEx-ception-SupplierIn-voiceReq 289170 |

FIG. 289-7

| Pack-age | | | | | level1 | level2 | level3 | level4 | level5 | | Cardinal-ity | Datatype Name |
|---|---|---|---|---|---|---|---|---|---|---|---|---|
| | | | | | | | | ID 289172 | | | 1 289174 | Business-Transaction Documen-tID 289176 |
| | | | | | | | | BillToID 289178 | | | 0..1 289180 | Business-Transaction Documen-tID 289182 |
| | | | | | | | | TypeCode 289184 | | | 0..1 289186 | Business-Transaction Document-TypeCode 289188 |
| | | | | | | | | TypeCode-Name 289190 | | | 0..1 289192 | Name 289194 |

FIG. 289-8

| Pack-age | | | | level1 | level2 | level3 | level4 | level5 | | Cardinal-ity | Datatype Name |
|---|---|---|---|---|---|---|---|---|---|---|---|
| | | | | | | | DataOrigin-TypeCode 289196 | | | 0..1 289198 | Procure-ment-Document-DataO-riginType-Code 289200 |
| | | | | | | | DataOrigin-TypeCode-Name 289202 | | | 0..1 289204 | Name 289206 |
| | | | | | | | Date 289208 | | | 0..1 289210 | Date 289212 |
| | | | | | | | Transac-tionDate 289214 | | | 0..1 289216 | Date 289218 |
| | | | | | | | ReceiptDate 289220 | | | 0..1 289222 | Date 289224 |

FIG. 289-9

| Pack-age | | | | | leve l1 | level2 | level3 | level4 | level5 | | Cardinal-ity | Datatype Name |
|---|---|---|---|---|---|---|---|---|---|---|---|---|
| | | | | | | | | CancellationInvoiceIndicator 289226 | | | 0..1 289228 | Indicator 289230 |
| | | | | | | | | Name 289232 | | | 0..1 289234 | Name 289236 |
| | | | Party 289238 | | | | | BillToParty 289240 | | | 0..1 289242 | FormBusinessTransaction-Document-Party 289244 |
| | | | | | | | | BillFrom-Party 289246 | | | 0..1 289248 | FormBusinessTransaction-Document-Party 289250 |

FIG. 289-10

| Package | | | | | level1 | level2 | level3 | level4 | level5 | | Cardinality | Datatype Name |
|---|---|---|---|---|---|---|---|---|---|---|---|---|
| | | | | | | | | BuyerParty 289252 | | | 0..1 289254 | FormBusinessTransaction-Document-Party 289256 |
| | | | | | | | | SellerParty 289258 | | | 0..1 289260 | FormBusinessTransaction-Document-Party 289262 |
| | | | | | | | | ServicePerformerParty 289264 | | | 0..1 289266 | FormBusinessTransaction-Document-Party 289268 |

FIG. 289-11

| Package | | | | | level1 | level2 | level3 | level4 | level5 | | Cardinality | Datatype Name |
|---|---|---|---|---|---|---|---|---|---|---|---|---|
| | | | | | | | | RequestorParty 289270 | | | 0..1 289272 | FormBusinessTransactionDocumentParty 289274 |
| | | | | | | | | ProductRecipientParty 289276 | | | 0..1 289278 | FormBusinessTransactionDocumentParty 289280 |
| | | | | | | | | PayerParty 289282 | | | 0..1 289284 | FormBusinessTransactionDocumentParty 289286 |

FIG. 289-12

| Package | | | | level1 | level2 | level3 | level4 | level5 | | Cardinality | Datatype Name |
|---|---|---|---|---|---|---|---|---|---|---|---|
| | | | | | | | PayeeParty 289288 | | | 0..1 289290 | FormBusinessTransaction-Document-Party 289292 |
| | | | | | | | ResponsibleInvoicer-Party 289294 | | | 0..1 289296 | FormBusinessTransaction-Document-Party 289298 |
| | | Location 289300 | | | | | ShipToLocation 289302 | | | 0..1 289304 | FormBusinessTransaction-Document-Location 289306 |

FIG. 289-13

| Pack-age | | | | leve l1 | level2 | level3 | level4 | level5 | | Cardinal-ity | Datatype Name |
|---|---|---|---|---|---|---|---|---|---|---|---|
| | | | | | | | ShipFrom-Location 289308 | | | 0..1 289310 | FormBusi-nessTrans-action-Document-Location 289312 |
| | | | | | | | CashDis-countTerms 289314 | | | 0..1 289316 | CashDis-countTerms 289318 |
| | | | | | | | Gros-sAmount 289320 | | | 0..1 289322 | Amount 289324 |
| | | | | | | | TotalGros-sAmount 289326 | | | 0..1 289328 | Amount 289330 |
| | | | | | | | TotalNetA-mount 289332 | | | 0..1 289334 | Amount 289336 |
| | | | | | | | TaxAmount 289338 | | | 0..1 289340 | Amount 289342 |

FIG. 289-14

| Pack-age | | | | level1 | level2 | level3 | level4 | level5 | | Cardinal-ity | Datatype Name |
|---|---|---|---|---|---|---|---|---|---|---|---|
| | | | | | | | TotalTax-Amount 289344 | | | 0..1 289346 | Amount 289348 |
| | | | | | | | BalanceA-mount 289350 | | | 0..1 289352 | Amount 289354 |
| | | | | | | | Ex-changeRate 289356 | | | 0..1 289358 | ExchangeR ate 289360 |
| | | ProductTax 289362 | | | | | ProductTax 289364 | | | 0..n 289366 | FormPro-ductTax 289368 |
| | | TextCollection 289370 | | | | | TextCollec-tion 289372 | | | 0..1 289374 | TextCollec-tion 289376 |
| | | BusinessTransaction DocumentReference 289378 | | | | | PurchaseOr derRefer-ence 289380 | | | 0..n 289382 | Business-Transaction Documen-tReference 289384 |

FIG. 289-15

| Package | | | | level1 | level2 | level3 | level4 | level5 | | Cardinality | Datatype Name |
|---|---|---|---|---|---|---|---|---|---|---|---|
| | | | | | | | DeliveryReference 289386 | | | 0..n 289388 | BusinessTransactionDocumentReference 289390 |
| | | | | | | | ServiceAcknowledgementReference 289392 | | | 0..n 289394 | BusinessTransactionDocumentReference 289396 |
| | | | | | | | OriginInvoiceReference 289398 | | | 0..n 289400 | BusinessTransactionDocumentReference 289402 |
| | | | | | | | PurchasingContractReference 289404 | | | 0..n 289406 | BusinessTransactionDocumentReference 289408 |

FIG. 289-16

| Package | | | | level1 | level2 | level3 | level4 | level5 | | Cardinality | Datatype Name |
|---|---|---|---|---|---|---|---|---|---|---|---|
| | | Item 289410 | | | | | Item 289412 | | | 1..n 289414 | SupplierInvoiceVerificationException-SupplierInvoiceItem-Req 289416 |
| | | | | | | | | ID 289418 | | 0..1 289420 | BusinessTransactionDocumentItemID 289422 |
| | | | | | | | | BillToID 289424 | | 0..1 289426 | BusinessTransactionDocumentItem-PartyID 289428 |

FIG. 289-17

| Package | | | | level1 | level2 | level3 | level4 | level5 | | Cardinality | Datatype Name |
|---|---|---|---|---|---|---|---|---|---|---|---|
| | | | | | | | | TypeCode 289430 | | 0..1 289432 | Business-TranscationDocumentItemTypeCode 289434 |
| | | | | | | | | TypeCode-Name 289436 | | 0..1 289438 | Name 289440 |
| | | | | | | | | PurchaseOrderQuantity 289442 | | 0..1 289444 | Quantity 289446 |
| | | | | | | | | PurchaseOrderQuantityUnitCodeName 289448 | | 0..1 289450 | Name 289452 |
| | | | | | | | | DeliveryQuantity 289454 | | 0..1 289456 | Quantity 289458 |

FIG. 289-18

| Pack-age | | | | level1 | level2 | level3 | level4 | level5 | | Cardinal-ity | Datatype Name |
|---|---|---|---|---|---|---|---|---|---|---|---|
| | | | | | | | | Delivery-Quanti-tyUnitCode-Name 289460 | | 0..1 289462 | Name 289464 |
| | | | | | | | | Pur-chaseOrder NetUnitPrice 289466 | | 0..1 289468 | FormPrice 289470 |
| | | | | | | | | ExchangeR-ate 289472 | | 0..1 289474 | exchangeR ate 289476 |
| | | | | | | | | CostUpper-LimitAmount 289478 | | 0..1 289480 | Amount 289482 |
| | | | | | | | | CostUpper-LimitExpect-edAmount 289484 | | 0..1 289486 | Amount 289488 |

FIG. 289-19

| Pack-age | | | | | level1 | level2 | level3 | level4 | level5 | | Cardinality | Datatype Name |
|---|---|---|---|---|---|---|---|---|---|---|---|---|
| | | | | | | | | | HierarchyRelationship 289490 | | 0..1 289492 | ProcurementDocumentItemHierarchyRelationship 289494 |
| | | | | | | | | | | ParentItemID 289496 | 0..1 289498 | BusinessTransactionDocumentItemID 289500 |
| | | | | | | | | | | ParentItemBillToID 289502 | 0..1 289504 | BusinessTransactionDocumentItemID 289506 |
| | | | | | | | | | | TypeCode 289508 | 0..1 289510 | ItemHierarchyRelatioship TypeCode 289512 |

FIG. 289-20

| Package | | | | | level1 | level2 | level3 | level4 | level5 | | Cardinality | Datatype Name |
|---|---|---|---|---|---|---|---|---|---|---|---|---|
| | | | | | | | | | Description 289514 | | 0..1 289516 | SHORT_Description 289518 |
| | | | | | | | | | DeliveryPeriod 289520 | | 0..1 289522 | DateTimePeriod 289524 |
| | | | | | | | | | Quantity 289526 | | 0..1 289528 | Quantity 289530 |
| | | | | | | | | | QuantityUnitCodeName 289532 | | 0..1 289534 | Name 289536 |
| | | | | | | | | | NetAmount 289538 | | 0..1 289540 | Amount 289542 |
| | | | | | | | | | NetUnitPrice 289544 | | 0..1 289546 | FormPrice 289548 |

FIG. 289-21

| Package | | | | | level1 | level2 | level3 | level4 | level5 | | Cardinality | Datatype Name |
|---|---|---|---|---|---|---|---|---|---|---|---|---|
| | | | | ProductInformation 289550 | | | | | Product 289552 | | 0..1 289554 | BusinessTransaction Document-Product 289556 |
| | | | | | | | | | ProductCategory 289558 | | 0..1 289560 | BusinessTransaction Document-ProductCategory 289562 |
| | | | | ProductTax 289564 | | | | | ProductTax 289566 | | 0..n 289568 | FormProductTax 289570 |
| | | | | | | | | | ServicePerformerParty 289572 | | 0..1 289574 | FormBusinessTransaction-Document-Party 289576 |

FIG. 289-22

| Package | | | | level1 | level2 | level3 | level4 | level5 | | Cardinality | Datatype Name |
|---|---|---|---|---|---|---|---|---|---|---|---|
| | | | | | | | | RequestorParty 289578 | | 0..1 289580 | FormBusinessTransaction-Document-Party 289582 |
| | | | | | | | | ProductRecipientParty 289584 | | 0..1 289586 | FormBusinessTransaction-Document-Party 289588 |
| | | | Location 289590 | | | | | ShipToLocation 289592 | | 0..1 289594 | FormBusinessTransaction-Document-Location 289596 |

FIG. 289-23

| Pack-age | | | | level1 | level2 | level3 | level4 | level5 | | Cardinal-ity | Datatype Name |
|---|---|---|---|---|---|---|---|---|---|---|---|
| | | | | | | | | ShipFrom-Location 289598 | | 0..1 289600 | FormBusinessTransaction-Document-Location 289602 |
| | | | Business-Transaction Documen-tReference 289604 | | | | | Pur-chaseOrder Reference 289606 | | 0..1 289608 | Business-Transaction Documen-tReference 289610 |
| | | | | | | | | Deliv-eryRefer-ence 289612 | | 0..1 289614 | Business-Transaction Documen-tReference 289616 |
| | | | | | | | | ServiceAc-knowledge-ment Reference 289618 | | 0..1 289620 | Business-Transaction Documen-tReference 289622 |

FIG. 289-24

| Package | | | | level1 | level2 | level3 | level4 | level5 | | Cardinality | Datatype Name |
|---|---|---|---|---|---|---|---|---|---|---|---|
| | | | | | | | | OriginInvoiceReference 289624 | | 0..1 289626 | BusinessTransactionDocumentReference 289628 |
| | | | | | | | | PurchasingContractReference 289630 | | 0..1 289632 | BusinessTransactionDocumentReference 289634 |
| | | | Accounting 289636 | | | | | AccountingCodingBlockAssignment 289638 | | 0..1 289640 | AccountingCodingBlockAssignment 289642 |
| | DuplicateInvoice 289644 | | | | | DuplicateInvoice 289646 | | | | 0..n 289648 | SupplierInvoiceVerificationException-SupplierInvoiceReq 289650 |

FIG. 289-25

| Package | | | | level1 | level2 | level3 | level4 | level5 | | Cardinality | Datatype Name |
|---|---|---|---|---|---|---|---|---|---|---|---|
| | Properties 289652 | | | | | SupplierInvoiceProperties 289654 | | | | 0..n 289656 | SupplierInvoiceProperties 289658 |
| | | | | | | | NewSupplierInvoiceReference 289660 | ReferenzkannaufHeaderoderItemgehen 289662 | | 1 289664 | BusinessTransactionDocumentReference 289666 |
| | | | | | | | PotentialDuplicateSupplierInvoiceReference 289668 | | | 0..1 289670 | BusinessTransactionDocumentReference 289672 |
| | | | | | | | SupplierInvoiceVerificationExceptionCauseCode 289674 | CodewertefürHighlightningwieimmerdieheißenmag 289676 | | 0..n 289678 | SupplierInvoiceVerificationExceptionCauseCode 289680 |

FIG. 289-26

| Pack-age | | | | level1 | level2 | level3 | level4 | level5 | | Cardinal-ity | Datatype Name |
|---|---|---|---|---|---|---|---|---|---|---|---|
| | | | | | | | SupplierInvoiceVerificationExceptionConflictResolutionCode 289682 | CodewertefürEingabebereitschaftwieimmerdieheißenmag 289684 | | 0..n 289686 | SupplierInvoiceVerificationException-ConflictResolution-Code 289688 |

FIG. 290-1

| Package | level1 | level2 | level3 | level4 | level5 | Cardinality | Datatype Name |
|---|---|---|---|---|---|---|---|
| SupplierInvoiceVerificationExceptionResolution-ConfirmationMessage 290000 | SupplierInvoiceVerificationException-ResolutionConfirmation 290002 | | | | | | SupplierInvoiceVerificationExceptionResolution-ConfirmationMessage 290004 |
| MessageHeader 290006 | | Message-Header 290008 | | | | 0..1 290010 | Message-Header 290012 |
| | | | ID 290014 | | | 1 290016 | MessageID 290018 |
| | | | ReferenceID 290020 | | | 0..1 290022 | MessageID 290024 |
| | | | Creation-DateTime 290026 | | | 1 290028 | DateTime 290030 |

FIG. 290-2

| Package | level1 | level2 | level3 | level4 | level5 | Cardinality | Datatype Name |
|---|---|---|---|---|---|---|---|
| | | | TestDataIndicator 290032 | | | 0..1 290034 | Indicator 290036 |
| | | | Reconciliation-Indicator 290038 | | | 0..1 290040 | Indicator 290042 |
| | | | SenderParty 290044 | | | 0..1 290046 | Business-Document Message-Header-Party 290048 |
| | | | RecipientParty 290050 | | | 0..1 290052 | Business-Document Message-Header-Party 290054 |

FIG. 290-3

| Package | | level1 | level2 | level3 | level4 | level5 | Cardinality | Datatype Name |
|---|---|---|---|---|---|---|---|---|
| | | | | BusinessScopeBusinessProcess 290056 | | | 0..n 290058 | BusinessScopeBusinessProcess 290060 |
| | | | | | TypeCode 290062 | | 1 290064 | BusinessScopeBusinessProcessTypeCode 290066 |
| | | | | | IstanceID 290068 | | 0..1 290070 | BusinessScopeBusinessProcessInstanceID 290072 |
| | | | ProcessorEmailURI 290074 | | | | 0..1 290076 | EmailURI 290078 |

FIG. 290-4

| Package | level1 | level2 | level3 | level4 | level5 | Cardinality | Datatype Name |
|---|---|---|---|---|---|---|---|
| SupplierInvoiceVerificationException 290080 | | SupplierInvoiceVerificationException 290082 | | | | 1 290084 | SupplierInvoiceVerificationExceptionResolutionConfirmation 290086 |
| | | | Attribut:reconciliationPeriodCounterValue 290088 | | | 0..1 290090 | CounterValue 290092 |
| | | | ID 290094 | | | 1 290096 | BusinessTransactionDocumentID 290098 |
| | | | AcceptanceStatusCode 290100 | | | 0..1 290102 | AcceptanceStatusCode 290104 |

FIG. 290-5

| Package | level1 | level2 | level3 | level4 | level5 | Cardinality | Datatype Name |
|---|---|---|---|---|---|---|---|
| Attachment 290106 | | | Attachment-Folder 290108 | | | 0..1 290110 | Attach-mentFolder 290112 |
| TextCollection 290114 | | | TextCollection 290116 | | | 0..1 290118 | TextCollec-tion 290120 |
| Invoice 290122 | | | Invoice 290124 | | | 1 290126 | SupplierIn-voiceVerifi-cationEx-ception-SupplierIn-voiceConf 290128 |
| | | | | ID 290130 | | 1 290132 | Business-Transaction Documen-tID 290134 |

FIG. 290-6

| Package | level1 | level2 | level3 | level4 | level5 | Cardinality | Datatype Name |
|---|---|---|---|---|---|---|---|
| | | | | BillToID 290136 | | 0..1 290138 | Business-Transaction Documen-tID 290140 |
| | | | | Date 290142 | | 0..1 290144 | Date 290146 |
| | | | | Transaction-Date 290148 | | 0..1 290150 | Date 290152 |
| | | | | ReceiptDate 290154 | | 0..1 290156 | Date 290158 |
| Party 290160 | | | | BillFromParty 290162 | | 0..1 290164 | Business-Transac-tionDocu-mentParty 290166 |

Appln No.: 11/803,178 Page 1797 of 2037
Applicant(s): Michael Seubert et al.
CONSISTENT SET OF INTERFACES DERIVED FROM A BUSINESS OBJECT MODEL
Replacement Sheet

FIG. 290-7

| Package | level1 | level2 | level3 | level4 | level5 | Cardinality | Datatype Name |
|---|---|---|---|---|---|---|---|
| | | | | BuyerParty 290168 | | 0..1 290170 | Business-Transac-tionDocu-mentParty 290172 |
| | | | | SellerParty 290174 | | 0..1 290176 | Business-Transac-tionDocu-mentParty 290178 |
| | | | | PayeeParty 290180 | | 0..1 290182 | Business-Transac-tionDocu-mentParty 290184 |
| | | | | CashDis-countTerms 290186 | | 0..1 290188 | CashDis-count-Terms 290190 |
| | | | | GrossAmount 290192 | | 0..1 290194 | Amount 290196 |

FIG. 290-8

| Package | level1 | level2 | level3 | level4 | level5 | Cardinality | Datatype Name |
|---|---|---|---|---|---|---|---|
| | | | | TaxAmount 290198 | | 0..1 290200 | Amount 290202 |
| Item 290204 | | | | Item 290206 | | 1..n 290208 | SupplierInvoiceVerificationException-SupplierInvoiceItem-Conf 290210 |
| | | | | | ID 290212 | 0..1 290214 | Business-Transaction DocumentItemID 290216 |
| | | | | | BillToID 290218 | 0..1 290220 | Business-Transaction DocumentItem-PartyID 290222 |

FIG. 290-9

| Package | | | | | level1 | level2 | level3 | level4 | level5 | Cardinality | Datatype Name |
|---|---|---|---|---|---|---|---|---|---|---|---|
| | | | | | | | | | Description 290224 | 0..1 290226 | SHORT_Description 290228 |
| | | | | | | | | | Quantity 290230 | 0..1 290232 | Quantity 290234 |
| | | | | ProductInformation 290236 | | | | | Product 290238 | 0..1 290240 | BusinessTransactionDocumentProduct 290242 |
| | | | | | | | | | ProductCategory 290244 | 0..1 290246 | BusinessTransactionDocumentProductCategory 290248 |

FIG. 290-10

| Package | level1 | level2 | level3 | level4 | level5 | Cardinality | Datatype Name |
|---|---|---|---|---|---|---|---|
| Business-Transaction DocumentReference 290250 | | | | | PurchaseOrderReference 290252 | 0..1 290254 | Business-Transaction DocumentReference 290256 |
| | | | | | DeliveryReference 290258 | 0..1 290260 | Business-Transaction DocumentReference 290262 |
| | | | | | ServiceAcknowledgement Reference 290264 | 0..1 290266 | Business-Transaction DocumentReference 290268 |
| | | | | | Purchasing-Contract Reference 290270 | 0..1 290272 | Business-Transaction DocumentReference 290274 |

FIG. 290-11

| Package | level1 | level2 | level3 | level4 | level5 | Cardinality | Datatype Name |
|---|---|---|---|---|---|---|---|
| Accounting 290276 | | | | | Accounting-Cod-ingBlockAs-signment 290278 | 0..1 290280 | Account-ingCod-ingBlock-Assignment 290282 |

FIG. 293-1

| Package | level1 | level2 | level3 | level4 | level5 | Cardinality | Datatype Name |
|---|---|---|---|---|---|---|---|
| DemandForecastNotification 293000 | Demand-Fore-castNoti-fication 293002 | | | | | | Demand-Fore-castNoti-fication 293004 |
| MessageHeader 293006 | | Message-Header 293008 | | | | 1 293010 | Business-Document Mes-sageHead er 293012 |
| | | | ID 293014 | | | 1 293016 | Business-Document Mes-sageID 293018 |
| | | | Creation-DateTime 293020 | | | 1 293022 | DateTime 293024 |

FIG. 293-2

| Package | | level1 | level2 | level3 | level4 | level5 | Cardinality | Datatype Name |
|---|---|---|---|---|---|---|---|---|
| | | | | Sender-Party 293026 | | | 1 293028 | Business-Document Mes-sageHeaderParty 293030 |
| | | | | Receiv-erParty 293032 | | | 1 293034 | Business-Document Mes-sageHeaderParty 293036 |
| | DemandForecast 293038 | | Demand-Forecast 293040 | | | | 1 293042 | … |
| | | | | @actionCode 293044 | | | 0..1 293046 | Action-Code 293048 |

FIG. 293-3

| Package | level1 | level2 | level3 | level4 | level5 | Cardinality | Datatype Name |
|---|---|---|---|---|---|---|---|
| | | | @completeTrans-mission-Indicator 293050 | | | 0..1 293052 | Com-pleteTransmission-Indicator 293054 |
| | | | @reconciliationPe-riodCoun-terValue 293056 | | | 0..1 293058 | Recon-ciliation-Period-Counter-Value 293060 |
| | | | Supply-Plannin-gAreaID 293062 | | | 0..1 293064 | Supply-Plannin-gAreaID 293066 |
| Location 293068 | | | Ship-FromLo-cation 293070 | | | 0..1 293072 | INTERNAL_Busi-ness-Transac-tionDocu-mentLo-cation 293074 |

FIG. 293-4

| Package | level1 | level2 | level3 | level4 | level5 | Cardinality | Datatype Name |
|---|---|---|---|---|---|---|---|
| | | | | InternalID 293076 | | 1 293078 | Location-InternalID 293080 |
| Product 293082 | | | Product 293084 | | | 1 293086 | INTERNAL_Business-TransactionDocumentProduct 293088 |
| | | | | InternalID 293090 | | 1 293092 | Product-InternalID 293094 |
| Item 293096 | | | Demand-Planning-TimeSeriesItem 293098 | | | 0..n 293100 | Demand-Planning-TimeSeriesItem 293102 |

FIG. 293-5

| Package | | | level1 | level2 | level3 | level4 | level5 | Cardinality | Datatype Name |
|---|---|---|---|---|---|---|---|---|---|
| | | | | | | Forecast-Period 293104 | | 1 293106 | UPPEROPEN_LOCALNORMALISED_DateTimePeriod 293108 |
| | | | | | | | Start-DateTime 293110 | 1 293112 | DateTime 293114 |
| | | | | | | | End-DateTime 293116 | 1 293118 | DateTime 293120 |
| | | | | | | Fore-castQuantity 293122 | | 1 293124 | Quantity 293126 |
| | | | | | | | unitCode 293128 | 1 293130 | Meas-ureUnit-Code 293132 |

FIG. 293-6

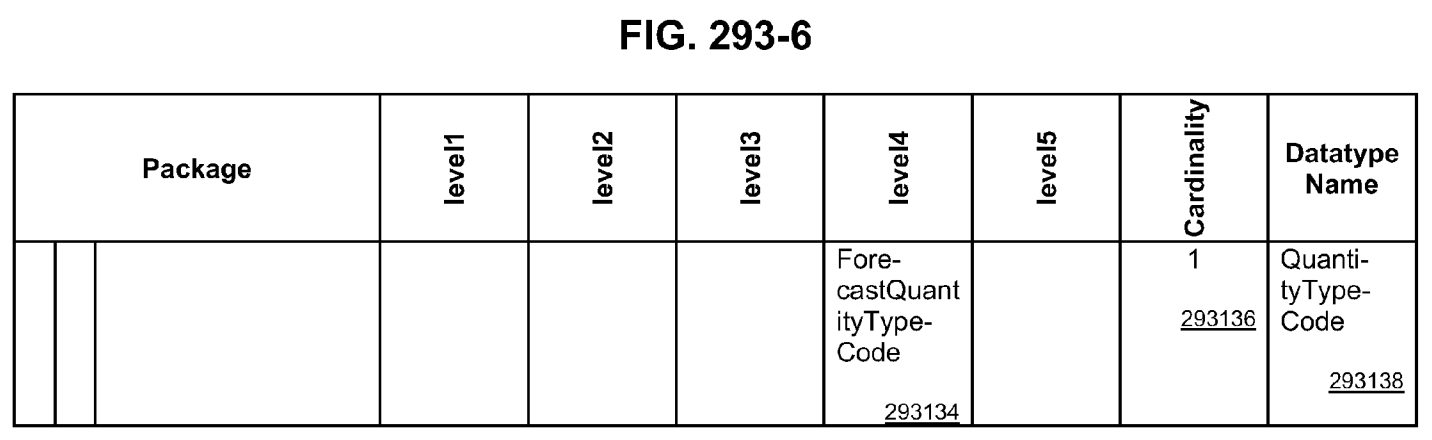

| Package | level1 | level2 | level3 | level4 | level5 | Cardinality | Datatype Name |
|---|---|---|---|---|---|---|---|
| | | | | Fore-castQuantityType-Code 293134 | | 1 293136 | Quanti-tyType-Code 293138 |

SiteLogisticsRequisition

| Package | | level1 | level2 | level3 | level4 | Cardinality | Datatype Name |
|---|---|---|---|---|---|---|---|
| PayrollProcessNotificationMessage 302000 | | PayrollProc-essNotification 302002 | | | | | PayrollProc-essNotifica-tionMessage 302004 |
| | MessageHeader 302006 | | Message-Header 302008 | | | 1 302010 | Business-DocumentMes-sageHeader 302012 |
| | | | | ID 302014 | | 1..1 302016 | Business-DocumentMes-sageID 302018 |
| | | | | Creation-DateTime 302020 | | 1..1 302022 | GLOBAL_Date Time 302024 |
| | | | | Test-DataIndi-cator 302026 | | 1 302028 | Indicator 302030 |

FIG. 302-2

| Package | | level1 | level2 | level3 | level4 | Cardinality | Datatype Name |
|---|---|---|---|---|---|---|---|
| | | | | Recon-ciliationIn-dicator 302032 | | 1 302034 | Indicator 302036 |
| | PayrollProcessNotificationPackage 302038 | | Payroll-Process 302040 | | | 1 302042 | PayrollProc-essNotifica-tionPayroll-Process 302044 |
| | | | | @reconciliationPe-riodCoun-terValue 302046 | | 1 302048 | Reconciliation-PeriodCoun-terValue 302050 |
| | | | | @action-Code 302052 | | 1 302054 | ActionCode 302056 |
| | | | | ID 302058 | | 1 302060 | Business-Transaction-DocumentID 302062 |

FIG. 302-3

| Package | | | | level1 | level2 | level3 | level4 | Cardinality | Datatype Name |
|---|---|---|---|---|---|---|---|---|---|
| | | | | | | Country-Code 302064 | | 1 302066 | CountryCode 302068 |
| | | | | | | Payroll-Group-Code 302070 | | 1 302072 | PayrollGroup-Code 302074 |
| | | | | | | PayrollPe-riod 302076 | | 1 302078 | PayrollPeriod 302080 |
| | | | | | | Payroll-DatePe-riod 302082 | | 1 302084 | CLOSED_Date Period 302086 |
| | | | | | | Selection-Date 302088 | | 0..1 302090 | Date 302092 |
| | | | | | | Payroll-RunDate 302094 | | 0..1 302096 | Date 302098 |

FIG. 302-4

| Package | | | | level1 | level2 | level3 | level4 | Cardinality | Datatype Name |
|---|---|---|---|---|---|---|---|---|---|
| | | | | | | CurrentIndicator 302100 | | 1 302102 | Indicator 302104 |
| | | | | | | Status 302106 | | 1 302108 | PayrollProcessNotificationPayrollProcessStatus 302110 |
| | | | | | | | LifeCycleStatusCode 302112 | 1 302114 | PayrollProcessLifeCycleStatusCode 302116 |

FIG. 303-1

| Package | level1 | level2 | level3 | level4 | level5 | Cardinality | Datatype Name |
|---|---|---|---|---|---|---|---|
| PayrollStepExecutionConfirmationMessage 303000 | PayrollStepExecutionConfirmation 303002 | | | | | | PayrollStepExecutionConfirmation 303004 |
| MessageHeaderPackage 303006 | | MessageHeader 303008 | | | | 1 303010 | BusinessDocumentMessageHeader 303012 |
| | | | | | | | |
| | | | ID 303014 | | | 1 303016 | BusinessDocumentMessageID 303018 |
| | | | ReferenceID 303020 | | | 0..1 303022 | BusinessDocumentMessageID 303024 |
| | | | CreationDateTime 303026 | | | 1 303028 | GLOBAL_DateTime 303030 |

FIG. 303-2

| Package | level1 | level2 | level3 | level4 | level5 | Cardinality | Datatype Name |
|---|---|---|---|---|---|---|---|
| | | | TestDataIndicator 303032 | | | 1 303034 | Indicator 303036 |
| | | | Reconciliation-Indicator 303038 | | | 1 303040 | Indicator 303042 |
| | | | SenderBusinessSystemID 303044 | | | 0..1 303046 | BusinessSystemID 303048 |
| | | | RecipientBusinessSystemID 303050 | | | 0..1 303052 | BusinessSystemID 303054 |
| | | | SenderParty 303056 | | | 0..1 303058 | Business-Document-Message-HeaderParty 303060 |
| | | | RecipientParty 303062 | | | 0..n 303064 | Business-Document-Message-HeaderParty 303066 |

FIG. 303-3

| Package | level1 | level2 | level3 | level4 | level5 | Cardinality | Datatype Name |
|---|---|---|---|---|---|---|---|
| | | | BusinessScope 303068 | | | 0..n 303070 | BusinessScope 303072 |
| PayrollStepExecutionConfirmation-Package 303074 | | PayrollProcess 303076 | | | | 1 303078 | PayrollStepExecution-Confirmation-PayrollProcess 303080 |
| | | | ID 303082 | | | 1 303084 | Business-Transaction-DocumentId 303086 |
| | | | PayrollProviderID 303088 | | | 0..1 303090 | Business-Transaction-DocumentId 303092 |
| | | | Employee 303094 | | | 0..n 303096 | PayrollStepExecution-Confirmation-PayrollProcessEmployee 303098 |

FIG. 303-4

| Package | level1 | level2 | level3 | level4 | level5 | Cardinality | Datatype Name |
|---|---|---|---|---|---|---|---|
| | | | | EmployeeUUID 303100 | | 1 303102 | UUID 303104 |
| | | | | Status 303106 | | 1 303108 | PayrollStepExecutionConfirmationPayrollProcessEmployeeStatus 303110 |
| | | | | | PayrollRunUpdateStatusCode 303112 | 1 303114 | UpdateStatusCode,Qualifier: PayrollRun 303116 |
| | | | Step 303118 | | | 1 303120 | PayrollStepExecutionConfirmationPayrollProcessStep 303122 |
| | | | | ID 303124 | | 1 303126 | PayrollProcessStepID 303128 |

FIG. 303-5

| Package | level1 | level2 | level3 | level4 | level5 | Cardinality | Datatype Name |
|---|---|---|---|---|---|---|---|
| | | | | Confirmation 303130 | | 1 303132 | PayrollStepExecution-Confirmation-PayrollProcessStepConfirmation 303134 |
| | | | | | TypeCode 303136 | 1 303138 | PayrollProcessStepConfirmationTypeCode 303140 |

FIG. 304-1

| Package | level1 | level2 | level3 | level4 | Cardinality | Datatype Name |
|---|---|---|---|---|---|---|
| PayrollStepExecutionRequestMessage 304000 | PayrollStepExecutionRequest 304002 | | | | | PayrollStepExecutionRequestMessage 304004 |
| MessageHeaderPackage 304006 | | MessageHeader 304008 | | | 1 304010 | BusinessDocumentMessageHeader 304012 |
| | | | ID 304014 | | 1 304016 | BusinessDocumentMessageID 304018 |
| | | | ReferenceID 304020 | | 0..1 304022 | BusinessDocumentMessageID 304024 |
| | | | CreationDateTime 304026 | | 1 304028 | GLOBAL_DateTime 304030 |
| | | | TestDataIndicator 304032 | | 1 304034 | Indicator 304036 |
| | | | ReconciliationIndicator 304038 | | 1 304040 | Indicator 304042 |

FIG. 304-2

| Package | level1 | level2 | level3 | level4 | Cardinality | Datatype Name |
|---|---|---|---|---|---|---|
| | | | SenderBusinessSystemID 304044 | | 0..1 304046 | BusinessSystemID 304048 |
| | | | RecipientBusinessSystemID 304050 | | 0..1 304052 | BusinessSystemID 304054 |
| | | | SenderParty 304056 | | 0..1 304058 | BusinessDocumentMessageHeaderParty 304060 |
| | | | RecipientParty 304062 | | 0..n 304064 | BusinessDocumentMessageHeaderParty 304066 |
| | | | BusinessScope 304068 | | 0..n 304070 | BusinessScope 304072 |
| PayrollProcesPackage 304074 | | PayrollProcess 304076 | | | 1 304078 | PayrollStepExecutionRequestPayrollProcess 304080 |
| | | | ID 304082 | | 1 304084 | BusinessTransactionDocumentID 304086 |

FIG. 304-3

| Package | level1 | level2 | level3 | level4 | Cardinality | Datatype Name |
|---|---|---|---|---|---|---|
| | | | PayrollProvide-rID 304088 | | 0..1 304090 | ObjectID 304092 |
| | | | CountryCode 304094 | | 1 304096 | CountryCode 304098 |
| | | | PayrollGroup-Code 304100 | | 1 304102 | PayrollGroupCode 304104 |
| | | | PayrollPeriod 304106 | | 0..1 304108 | PayrollPeriod 304110 |
| | | | Employee 304112 | | 0..n 304114 | PayrollStepExecutionRequest-PayrollProcessEmployee 304116 |
| | | | | EmployeeUUID 304118 | 1 304120 | UUID 304122 |
| | | | Step 304124 | | 1 304126 | PayrollStepExecutionRequest-PayrollProcessStep 304128 |
| | | | | ID 304130 | 1 304132 | PayrollProcessStepID 304134 |

FIG. 304-4

| Package | level1 | level2 | level3 | level4 | Cardinality | Datatype Name |
|---|---|---|---|---|---|---|
| | | | | TypeCode 304136 | 1 304138 | PayrollProcessStepTypeCode 304140 |

FIG. 307-1

| Package | level1 | | level2 | level3 | level4 | level5 | level6 | level7 | level8 | Cardinality | Cardinality (Save) | Cardinality (Create& NoAction) | Cardinality (Delete) | Datatype Name |
|---|---|---|---|---|---|---|---|---|---|---|---|---|---|---|
| **US_EmployeePayrollInputReplicationRequestMessage** **307000** | US_EmployeePayrollInputReplication-Request-Message 307001 | | | | | | | | | | | | | |
| **MessageHeader** **307002** | | Message-Header 307003 | | | | | | | | 1 307004 | 1 307005 | 1 307006 | 1 307007 | 'BusinessDocumentMessage-Header 307008 |
| | | | ID 307009 | | | | | | | 1..1 307010 | 1..1 307011 | 1..1 307012 | 1..1 307013 | BusinessDocu-mentMessageID 307014 |
| | | | ReferenceID 307015 | | | | | | | 0..1 307016 | 0..1 307017 | 0..1 307018 | 0..1 307019 | BusinessDocu-mentMessageID 307020 |

FIG. 307-2

| Package | | level1 | | level2 | level3 | level4 | level5 | level6 | level7 | level8 | Cardinality | Cardinality (Save) | Cardinality (Create& NoAction) | Cardinality (Delete) | Datatype Name |
|---|---|---|---|---|---|---|---|---|---|---|---|---|---|---|---|
| | | | | Creation-DateTime 307021 | | | | | | | 1..1 307022 | 1..1 307023 | 1..1 307024 | 1..1 307025 | GLOBAL_DateTime 307026 |
| | | | | Test-DataIn-dicator 307027 | | | | | | | 0..1 307028 | 0..1 307029 | 0..1 307030 | 0..1 307031 | Indicator 307032 |
| | | | | Recon-ciliation-Indicator 307033 | | | | | | | 0..1 307034 | 0..1 307035 | 0..1 307036 | 0..1 307037 | Indicator 307038 |
| | | | | Sender-Busi-nessSys-temID 307039 | | | | | | | 0..1 307040 | 0..1 307041 | 0..1 307042 | 0..1 307043 | Busi-nessSys-temID 307044 |
| | | | | Recipi-entBusi-nessSys-temID 307045 | | | | | | | 0..1 307046 | 0..1 307047 | 0..1 307048 | 0..1 307049 | Busi-nessSys-temID 307050 |
| | | | | Follow-UpMes-sageRe-quire-ment-Code 307051 | | | | | | | 0..1 307052 | 0..1 307053 | 0..1 307054 | 0..1 307055 | Follow-UpMes-sageRe-quire-ment-Code 307056 |

FIG. 307-3

| Package | level1 | | level2 | level3 | level4 | level5 | level6 | level7 | level8 | Cardinality | Cardinality (Save) | Cardinality (Create& NoAction) | Cardinality (Delete) | Datatype Name |
|---|---|---|---|---|---|---|---|---|---|---|---|---|---|---|
| | | | SenderParty 307057 | | | | | | | 0..1 307058 | 0..1 307059 | 0..1 307060 | 0..1 307061 | BusinessDocumentMessageHeaderParty 307062 |
| | | | RecipientParty 307063 | | | | | | | 0..n 307064 | 0..n 307065 | 0..n 307066 | 0..n 307067 | BusinessDocumentMessageHeaderParty 307068 |
| | | | BusinessScopeBusinessProcess 307069 | | | | | | | 0..n 307070 | 0..n 307071 | 0..n 307072 | 0..n 307073 | BusinessScopeBusinessProcess 307074 |
| US_EmployeePayrollInputReplicationRequest 307075 | | US_EmployeePayrollInputReplicationRequest 307076 | | | | | | | | 1 307077 | 1 307078 | 1 307079 | 1 307080 | US_EmployeePayrollInputReplicationRequest 307081 |

FIG. 307-4

| Package | level1 | | level2 | level3 | level4 | level5 | level6 | level7 | level8 | Cardinality | Cardinality (Save) | Cardinality (Create& NoAction) | Cardinality (Delete) | Datatype Name |
|---|---|---|---|---|---|---|---|---|---|---|---|---|---|---|
| | | | ObjectNodeReference 307082 | | | | | | | 1 307083 | 1 307084 | 1 307085 | 1 307086 | ObjectNodeReference 307087 |
| Employee 307088 | | | Employee 307089 | | | | | | | 1 307090 | 1 307091 | 1 307092 | 1 307093 | US_EmployeePayrollInputReplicationRequestEmployee 307094 |
| | | | | @actionCode 307095 | | | | | | 1 307096 | 1 307097 | 1 307098 | 1 307099 | ActionCode 307100 |
| | | | | @commonListCompleteTransmissionIndicator 307101 | | | | | | 0..1 307102 | 1 307103 | 0..1 307104 | | Indicator 307105 |

FIG. 307-5

| Package | level1 | | level2 | level3 | level4 | level5 | level6 | level7 | level8 | Cardinality | Cardinality (Save) | Cardinality (Create& NoAction) | Cardinality (Delete) | Datatype Name |
|---|---|---|---|---|---|---|---|---|---|---|---|---|---|---|
| | | | | @emplo yeeWork placeAd- dressIn- forma- tionList- Com- pleteTra nsmis- sionIndi- cator 307106 | | | | | | 0..1 307107 | 1 307108 | 0..1 307109 | | Indicator 307110 |
| | | | | @addres sInformat ionList- Com- pleteTra nsmis- sionIndi- cator 307111 | | | | | | 0..1 307112 | 1 307113 | 0..1 307114 | | Indicator 307115 |
| | | | | @emplo yeeTaxA rrange- ment- Federal- TaxAr- range- mentList Com- pleteTra nsmis- sionIndi- cator 307116 | | | | | | 0..1 307117 | 1 307118 | 0..1 307119 | | Indicator 307120 |

FIG. 307-6

| Package | level1 | | level2 | level3 | level4 | level5 | level6 | level7 | level8 | Cardinality | Cardinality (Save) | Cardinality (Create& NoAction) | Cardinality (Delete) | Datatype Name |
|---|---|---|---|---|---|---|---|---|---|---|---|---|---|---|
| | | | | @employmentItemListCompleteTransmissionIndicator 307121 | | | | | | 0..1 307122 | 1 307123 | 0..1 307124 | | Indicator 307125 |
| | | | | UUID 307126 | | | | | | 1 307127 | 1 307128 | 1 307129 | 1 307130 | UUID 307131 |
| | | | | EmployeeID 307132 | | | | | | 1 307133 | 1 307134 | 1 307135 | | EmployeeID 307136 |
| | | | | SocialSecurityNumber 307137 | | | | | | 0..1 307138 | 0..1 307139 | 1 307140 | | BusinessPartnerID 307141 |
| Common 307142 | | | | Common 307143 | | | | | | 0..n 307144 | 0..n 307145 | 0..n 307146 | | US_EmployeePayrollInputReplicationRequestEmployeeCommon 307147 |
| | | | | | @actionCode 307148 | | | | | 1 307149 | 1 307150 | 1 307151 | 1 307152 | ActionCode 307153 |

FIG. 307-7

| Package | level1 | | level2 | level3 | level4 | level5 | level6 | level7 | level8 | Cardinality | Cardinality (Save) | Cardinality (Create& NoAction) | Cardinality (Delete) | Datatype Name |
|---|---|---|---|---|---|---|---|---|---|---|---|---|---|---|
| | | | | | ObjectNodeReference 307154 | | | | | 1 307155 | 1 307156 | 1 307157 | 1 307158 | ObjectNodeReference 307159 |
| | | | | | ValidityPeriod 307160 | | | | | 0..1 307161 | 1 307162 | 1 307163 | | CLOSED_DatePeriod 307164 |
| Person 307165 | | | | | Person 307166 | | | | | 0..1 307167 | 0..1 307168 | 0..1 307169 | | US_EmployeePayrollInputReplicationRequestEmployeeCommonPerson 307170 |
| | | | | | | @nameListCompleteTransmissionIndicator 307171 | | | | 0..1 307172 | 1 307173 | 1 307174 | | Indicator 307175 |
| | | | | | | GenderCode 307176 | | | | 0..1 307177 | 0..1 307178 | 0..1 307179 | 0..1 307180 | GenderCode 307181 |

FIG. 307-8

| Package | level1 | | level2 | level3 | level4 | level5 | level6 | level7 | level8 | Cardinality | Cardinality (Save) | Cardinality (Create& NoAction) | Cardinality (Delete) | Datatype Name |
|---|---|---|---|---|---|---|---|---|---|---|---|---|---|---|
| | | | | | | BirthPla-ceName 307182 | | | | 0..1 307183 | 0..1 307184 | 0..1 307185 | 0..1 307186 | LANGUAGEINDEPENDENT_MEDIUM_Name.Qualifier:BirthPlace 307187 |
| | | | | | | BirthDate 307188 | | | | 0..1 307189 | 0..1 307190 | 0..1 307191 | 0..1 307192 | Date,Qualifier:Birth 307193 |
| | | | | | | Marital-Status-Code 307194 | | | | 0..1 307195 | 0..1 307196 | 0..1 307197 | 0..1 307198 | Marital-Status-Code 307199 |
| | | | | | | NonVer-balCom-munica-tionLan-guage-Code 307200 | | | | 0..1 307201 | 0..1 307202 | 0..1 307203 | 0..1 307204 | Lan-guage-Code 307205 |
| | | | | | | Nationali-tyCoun-tryCode 307206 | | | | 0..1 307207 | 0..1 307208 | 0..1 307209 | 0..1 307210 | Country-Code 307211 |

FIG. 307-9

| Package | level1 | | level2 | level3 | level4 | level5 | level6 | level7 | level8 | Cardinality | Cardinality (Save) | Cardinality (Create& NoAction) | Cardinality (Delete) | Datatype Name |
|---|---|---|---|---|---|---|---|---|---|---|---|---|---|---|
| Name 307212 | | | | | | Name 307213 | | | | 0..n 307214 | 0..n 307215 | 0..n 307216 | | US_EmployeePayrollInputReplicationRequestEmployee-CommonPersonName 307217 |
| | | | | | | | @actionCode 307218 | | | 1 307219 | 1 307220 | 1 307221 | 1 307222 | ActionCode 307223 |
| | | | | | | | PersonName 307224 | | | 0..1 307225 | 1 307226 | 1 307227 | 0..1 307228 | PersonName 307229 |
| EmployeeWorkplaceAddressInformation 307230 | | | | EmployeeWorkplaceAddressInformation 307231 | | | | | | 0..n 307232 | 0..n 307233 | 0..n 307234 | | US_EmployeePayrollInputReplicationRequestEmployeeEmployeeWorkplaceAddressInformation 307235 |
| | | | | | @actionCode 307236 | | | | | 1 307237 | 1 307238 | 1 307239 | 1 307240 | ActionCode 307241 |

FIG. 307-10

| Package | level1 | | level2 | level3 | level4 | level5 | level6 | level7 | level8 | Cardinality | Cardinality (Save) | Cardinality (Create& NoAction) | Cardinality (Delete) | Datatype Name |
|---|---|---|---|---|---|---|---|---|---|---|---|---|---|---|
| | | | | | @addressUsageListCompleteTransmissionIndicator 307242 | | | | | 0..1 307243 | 1 307244 | 0..1 307245 | | Indicator 307246 |
| | | | | | ObjectNodeReference 307247 | | | | | 1 307248 | 1 307249 | 1 307250 | 1 307251 | ObjectNodeReference 307252 |
| | | | | | ValidityPeriod 307253 | | | | | 0..1 307254 | 1 307255 | 1 307256 | | CLOSED_DatePeriod 307257 |
| AddressUsage 307258 | | | | | AddressUsage 307259 | | | | | 0..n 307260 | 1..n 307261 | 1..n 307262 | | US_EmployeePayrollInputReplicationRequestEmployeeEmployeeWorkplaceAddressInformationAddressUsage 307263 |

FIG. 307-11

| Package | level1 | | level2 | level3 | level4 | level5 | level6 | level7 | level8 | Cardinality | Cardinality (Save) | Cardinality (Create& NoAction) | Cardinality (Delete) | Datatype Name |
|---|---|---|---|---|---|---|---|---|---|---|---|---|---|---|
| | | | | | | @actionCode 307264 | | | | 1 307265 | 1 307266 | 1 307267 | 1 307268 | Action-Code 307269 |
| | | | | | | Addres-sUsage-Code 307270 | | | | 0..1 307271 | 1 307272 | 1 307273 | | Addres-sUsage-Code 307274 |
| | | | | | | Valid-ityPeriod 307275 | | | | 0..1 307276 | 1 307277 | 1 307278 | | CLOSED_DatePe-riod 307279 |
| | | | | | | De-faultIndi-cator 307280 | | | | 0..1 307281 | 1 307282 | 1 307283 | | Indicator 307284 |
| | | | | | Organi-sation-Address 307285 | | | | | 0..1 307286 | 0..1 307287 | 0..1 307288 | | Organi-sation-Address 307289 |
| | | | | | Work-placeAd-dress 307290 | | | | | 0..1 307291 | 1 307292 | 1 307293 | | Work-placeAd-dress 307294 |
| AddressInformation 307295 | | | | Address-Informa-tion 307296 | | | | | | 0..n 307297 | 0..n 307298 | 0..n 307299 | | US_EmployeePay-rollInpu-tReplica-tionRe-questEm ployeeAd dressIn-formation 307300 |

FIG. 307-12

| Package | level1 | | level2 | level3 | level4 | level5 | level6 | level7 | level8 | Cardinality | Cardinality (Save) | Cardinality (Create& NoAction) | Cardinality (Delete) | Datatype Name |
|---|---|---|---|---|---|---|---|---|---|---|---|---|---|---|
| | | | | | @actionCode 307301 | | | | | 1 307302 | 1 307303 | 1 307304 | 1 307305 | |
| | | | | | @addressUsageListCompleteTransmissionIndicator 307306 | | | | | 1 307307 | 1 307308 | 1 307309 | | |
| | | | | | ObjectNodeReference 307310 | | | | | 1 307311 | 1 307312 | 1 307313 | 1 307314 | ObjectNodeReference 307315 |
| | | | | | ValidityPeriod 307316 | | | | | 0..1 307317 | 1 307318 | 1 307319 | | CLOSED_DatePeriod 307320 |
| AddressUsage 307321 | | | | | AddressUsage 307322 | | | | | 0..n 307323 | 0..n 307324 | 0..n 307325 | | US_EmployeePayrollInputReplicationRequestEmployeeAddressInformationAddressUsage 307326 |

FIG. 307-13

| Package | level1 | | level2 | level3 | level4 | level5 | level6 | level7 | level8 | Cardinality | Cardinality (Save) | Cardinality (Create& NoAction) | Cardinality (Delete) | Datatype Name |
|---|---|---|---|---|---|---|---|---|---|---|---|---|---|---|
| | | | | | | @action Code 307327 | | | | 1 307328 | 1 307329 | 1 307330 | | Action-Code 307331 |
| | | | | | | Addres-sUsage-Code 307332 | | | | 0..1 307333 | 1 307334 | 1 307335 | | Addres-sUsage-Code 307336 |
| | | | | | | Valid-ityPeriod 307337 | | | | 0..1 307338 | 1 307339 | 1 307340 | | CLOSED _DatePe-riod 307341 |
| | | | | | | De-faultIndi-cator 307342 | | | | 0..1 307343 | 1 307344 | 1 307345 | | Indicator 307346 |
| | | | | | Per-sonalAd-dress 307347 | | | | | 0..1 307348 | 1 307349 | 1 307350 | | Per-sonalAd-dress 307351 |

FIG. 307-14

| Package | level1 | | level2 | level3 | level4 | level5 | level6 | level7 | level8 | Cardinality | Cardinality (Save) | Cardinality (Create& NoAction) | Cardinality (Delete) | Datatype Name |
|---|---|---|---|---|---|---|---|---|---|---|---|---|---|---|
| EmployeeTaxArrangementFederalTaxArrangement 307352 | | | | EmployeeTaxArrangementFederalTaxArrangement 307353 | | | | | | 0..n 307354 | 0..n 307355 | 0..n 307356 | | US_EmployeePayrollInputReplicationRequestEmployeeEmployeeTaxArrangementFederalTaxArrangement 307357 |
| | | | | | @actionCode 307358 | | | | | 1 307359 | 1 307360 | 1 307361 | 1 307362 | ActionCode 307363 |
| | | | | | @taxAuthorityItemListCompleteTransmissionIndicator 307364 | | | | | 0..1 307365 | 1 307366 | 0..1 307367 | | Indicator 307368 |
| | | | | | ObjectNodeReference 307369 | | | | | 1 307370 | 1 307371 | 1 307372 | 1 307373 | ObjectNodeReference 307374 |

FIG. 307-15

| Package | level1 | | level2 | level3 | level4 | level5 | level6 | level7 | level8 | Cardinality | Cardinality (Save) | Cardinality (Create& NoAction) | Cardinality (Delete) | Datatype Name |
|---|---|---|---|---|---|---|---|---|---|---|---|---|---|---|
| | | | | | TaxIden-tification-Number 307375 | | | | | 0..1 307376 | 1 307377 | 1 307378 | | Party-TaxID 307379 |
| TaxAuthority-Item 307380 | | | | | TaxAu-thority-Item 307381 | | | | | 0..n 307382 | 0..n 307383 | 0..n 307384 | | US_EmployeePayrollInputReplicationRequestEmployeeEm-ployee-TaxAr-range-ment-Federal-TaxAr-range-ment-TaxAu-thority-Item 307385 |
| | | | | | | @action Code 307386 | | | | 1 307387 | 1 307388 | 1 307389 | 1 307390 | Action-Code 307391 |
| | | | | | | @period Term-sListCompleteTransmission-Indicator 307392 | | | | 0..1 307393 | 1 307394 | 0..1 307395 | | Identifier 307396 |

FIG. 307-16

| Package | level1 | | level2 | level3 | level4 | level5 | level6 | level7 | level8 | Cardinality | Cardinality (Save) | Cardinality (Create& NoAction) | Cardinality (Delete) | Datatype Name |
|---|---|---|---|---|---|---|---|---|---|---|---|---|---|---|
| | | | | | | @withholdingFormListCompleteTransmissionIndicator 307397 | | | | 0..1 307398 | 1 307399 | 0..1 307400 | | Identifier 307401 |
| | | | | | | ObjectNodeReference 307402 | | | | 1 307403 | 1 307404 | 1 307405 | 1 307406 | ObjectNodeReference 307407 |
| | | | | | | TaxAuthorityID 307408 | | | | 0..1 307409 | 1 307410 | 1 307411 | | BusinessPartnerID 307412 |
| PeriodTerms 307413 | | | | | | PeriodTerms 307414 | | | | 0..n 307415 | 0..n 307416 | 0..n 307417 | | US_EmployeePayrollInputReplicationRequestEmployeeEmployeeTaxArrangementFederalTaxArrangementTaxAuthorityItemPeriodTerms 307418 |

FIG. 307-17

| Package | level1 | | level2 | level3 | level4 | level5 | level6 | level7 | level8 | Cardinality | Cardinality (Save) | Cardinality (Create& NoAction) | Cardinality (Delete) | Datatype Name |
|---|---|---|---|---|---|---|---|---|---|---|---|---|---|---|
| | | | | | | | @actionCode 307419 | | | 1 307420 | 1 307421 | 1 307422 | 1 307423 | ActionCode 307424 |
| | | | | | | | @federalListCompleteTransmissionIndicator 307425 | | | 0..1 307426 | 1 307427 | 0..1 307428 | | Indicator 307429 |
| | | | | | | | @stateListCompleteTransmissionIndicator 307430 | | | 0..1 307431 | 1 307432 | 0..1 307433 | | Indicator 307434 |
| | | | | | | | @localityListCompleteTransmissionIndicator 307435 | | | 0..1 307436 | 1 307437 | 0..1 307438 | | Indicator 307439 |
| | | | | | | | ObjectNodeReference 307440 | | | 1 307441 | 1 307442 | 1 307443 | 1 307444 | ObjectNodeReference 307445 |
| | | | | | | | ValidityPeriod 307446 | | | 0..1 307447 | 1 307448 | 1 307449 | | CLOSED_DatePeriod 307450 |

FIG. 307-18

| Package | level1 | | level2 | level3 | level4 | level5 | level6 | level7 | level8 | Cardinality | Cardinality (Save) | Cardinality (Create& NoAction) | Cardinality (Delete) | Datatype Name |
|---|---|---|---|---|---|---|---|---|---|---|---|---|---|---|
| | | | | | | | Federal 307451 | | | 0..1 307452 | 0..1 307453 | 0..1 307454 | | US_EmployeePayrollInputReplicationRequestEmployeeETA-Federal-TaxArrangement-TaxAuthority-ItemPeriod-Terms-Federal 307455 |
| | | | | | | | | @action Code 307456 | | 1 307457 | 1 307458 | 1 307459 | 1 307460 | Action-Code 307461 |

FIG. 307-19

| Package | level1 | | level2 | level3 | level4 | level5 | level6 | level7 | level8 | Cardinality | Cardinality (Save) | Cardinality (Create& NoAction) | Cardinality (Delete) | Datatype Name |
|---|---|---|---|---|---|---|---|---|---|---|---|---|---|---|
| | | | | | | | | Employ-eeTaxa-tion-Method 307462 | | 0..1 307463 | 0..1 307464 | 0..1 307465 | | US_EmployeePayrollInputReplicationRequestEmployeeETAF-TATaxAuthority-ItemPe-riod-Terms-Feder-alEm-ployee-Taxation-Method 307466 |
| | | | | | | | | | Feder-alIn-comeEmployee-Taxa-tionEx-emption-Method-Code 307467 | 0..1 307468 | 0..1 307469 | 0..1 307470 | | Employ-eeTaxa-tionEx-emption-Method-Code 307471 |
| | | | | | | | | | Feder-alIn-comeModifiedTaxAmount 307472 | 0..1 307473 | 0..1 307474 | 0..1 307475 | | Amount 307476 |

FIG. 307-20

| Package | level1 | | level2 | level3 | level4 | level5 | level6 | level7 | level8 | Cardinality | Cardinality (Save) | Cardinality (Create& NoAction) | Cardinality (Delete) | Datatype Name |
|---|---|---|---|---|---|---|---|---|---|---|---|---|---|---|
| | | | | | | | | | | 0..1 307477 | 0..1 307478 | 0..1 307479 | | Currency Code 307480 |
| | | | | | | | | | Feder-allIn-comeMo dified-TaxPer-cent 307481 | 0..1 307482 | 0..1 307483 | 0..1 307484 | | Percent 307485 |
| | | | | | | | | | Federal-Social-Securi-tyEm-ployee-Taxa-tionEx-emption-Method-Code 307486 | 0..1 307487 | 0..1 307488 | 0..1 307489 | | Employ-eeTaxa-tionEx-emption-Method-Code 307490 |
| | | | | | | | | | Feder-alMedi-careEm-ployee-Taxa-tionEx-emption-Method-Code 307491 | 0..1 307492 | 0..1 307493 | 0..1 307494 | | Employ-eeTaxa-tionEx-emption-Method-Code 307495 |

Appln No.: 11/803,178 Page 1897 of 2037
Applicant(s): Michael Seubert et al.
CONSISTENT SET OF INTERFACES DERIVED FROM A BUSINESS OBJECT MODEL
Replacement Sheet

FIG. 307-21

| Package | level1 | | level2 | level3 | level4 | level5 | level6 | level7 | level8 | Cardinality | Cardinality (Save) | Cardinality (Create& NoAction) | Cardinality (Delete) | Datatype Name |
|---|---|---|---|---|---|---|---|---|---|---|---|---|---|---|
| | | | | | | | | | FederalUnemploymentTaxActEmployeeTaxationExemptionMethodCode 307496 | 0..1 307497 | 0..1 307498 | 0..1 307499 | | EmployeeTaxationExemptionMethodCode 307500 |
| | | | | | | | | FederalMaximumIncomeWithholdingTaxExemptionNumberValue 307501 | | 0..1 307502 | 0..1 307503 | 0..1 307504 | | NumberValue 307505 |
| | | | | | | | | PensionPlanCoverageIncludedIndicator 307506 | | 0..1 307507 | 1 307508 | 1 307509 | | Indicator 307510 |

FIG. 307-22

| Package | level1 | | level2 | level3 | level4 | level5 | level6 | level7 | level8 | Cardinality | Cardinality (Save) | Cardinality (Create& NoAction) | Cardinality (Delete) | Datatype Name |
|---|---|---|---|---|---|---|---|---|---|---|---|---|---|---|
| | | | | | | | State 307511 | | | 0..1 307512 | 0..1 307513 | 0..1 307514 | | US_EmployeePayrollInputReplicationRequestEmployeeETA-Federal-TaxArrangement-TaxAuthority-ItemPeriodTermsState 307515 |
| | | | | | | | | @action Code 307516 | | 1 307517 | 1 307518 | 1 307519 | | Action-Code 307520 |
| | | | | | | | | Employ-eeWork-StateTax Authori-tyRoleIn-dicator 307521 | | 0..1 307522 | 1 307523 | 1 307524 | | Indicator 307525 |
| | | | | | | | | State-Work-TaxAu-thori-tyTimeP ercent 307526 | | 0..1 307527 | 0..1 307528 | 0..1 307529 | | Percent 307530 |

FIG. 307-23

| Package | level1 | | level2 | level3 | level4 | level5 | level6 | level7 | level8 | Cardinality | Cardinality (Save) | Cardinality (Create& NoAction) | Cardinality (Delete) | Datatype Name |
|---|---|---|---|---|---|---|---|---|---|---|---|---|---|---|
| | | | | | | | | EmployeeResident-StateTaxAuthorityRoleIndicator 307531 | | 0..1 307532 | 1 307533 | 1 307534 | | Indicator 307535 |
| | | | | | | | | EmployeeStateUnemploymentInsuranceTaxAuthorityRoleIndicator 307536 | | 0..1 307537 | 1 307538 | 1 307539 | | Indicator 307540 |
| | | | | | | | | State-Unemployment-Insurance-WorksiteCode 307541 | | 0..1 307542 | 0..1 307543 | 0..1 307544 | | Unemployment-Insurance-WorksiteCode 307545 |
| | | | | | | | | EmployeePrimary-Work-StateTaxAuthorityRoleIndicator 307546 | | 0..1 307547 | 1 307548 | 1 307549 | | Indicator 307550 |

FIG. 307-24

| Package | level1 | | level2 | level3 | level4 | level5 | level6 | level7 | level8 | Cardinality | Cardinality (Save) | Cardinality (Create& NoAction) | Cardinality (Delete) | Datatype Name |
|---|---|---|---|---|---|---|---|---|---|---|---|---|---|---|
| | | | | | | | | Employ-eeTaxa-tion-Method 307551 | | 0..1 307552 | 0..1 307553 | 0..1 307554 | | US_EmployeePayrollInputReplicationRequestEmployeeETAF-TATaxAuthority-ItemPe-riodTermsStateEmploy-eeTaxa-tion-Method 307555 |
| | | | | | | | | | StateIn-comeEmployee-Taxa-tionEx-emption-Method-Code 307556 | 0..1 307557 | 0..1 307558 | 0..1 307559 | | Employ-eeTaxa-tionEx-emption-Method-Code 307560 |
| | | | | | | | | | StateIn-comeModifiedTax Amount 307561 | 0..1 307562 | 0..1 307563 | 0..1 307564 | | Amount 307565 |

FIG. 307-25

| Package | level1 | | level2 | level3 | level4 | level5 | level6 | level7 | level8 | Cardinality | Cardinality (Save) | Cardinality (Create& NoAction) | Cardinality (Delete) | Datatype Name |
|---|---|---|---|---|---|---|---|---|---|---|---|---|---|---|
| | | | | | | | | | | 0..1 307566 | 0..1 307567 | 0..1 307568 | | Currency Code 307569 |
| | | | | | | | | | StateIn-comeMo dified-taxPer-cent 307570 | 0..1 307571 | 0..1 307572 | 0..1 307573 | | Percent 307574 |
| | | | | | | | | | State-Unem-ployment TaxAc-tEmploy-eeTaxa-tionEx-emption-Method-Code 307575 | 0..1 307576 | 0..1 307577 | 0..1 307578 | | Employ-eeTaxa-tionEx-emption-Method-Code 307579 |
| | | | | | | | | | State-Disabili-tyInsur-anceEm ployee-Taxa-tionEx-emption-Method-Code 307580 | 0..1 307581 | 0..1 307582 | 0..1 307583 | | Employ-eeTaxa-tionEx-emption-Method-Code 307584 |

FIG. 307-26

| Package | level1 | | level2 | level3 | level4 | level5 | level6 | level7 | level8 | Cardinality | Cardinality (Save) | Cardinality (Create& NoAction) | Cardinality (Delete) | Datatype Name |
|---|---|---|---|---|---|---|---|---|---|---|---|---|---|---|
| | | | | | | | | | WorkersCompensationEmployeeTaxationExemptionMethodCode 307585 | 0..1 307586 | 0..1 307587 | 0..1 307588 | | EmployeeTaxationExemptionMethodCode 307589 |
| | | | | | | | | StateMaximumIncomeWithholdingTaxExemptionNumberValue 307590 | | 0..1 307591 | 0..1 307592 | 0..1 307593 | | NumberValue 307594 |

FIG. 307-27

| Package | level1 | | level2 | level3 | level4 | level5 | level6 | level7 | level8 | Cardinality | Cardinality (Save) | Cardinality (Create& NoAction) | Cardinality (Delete) | Datatype Name |
|---|---|---|---|---|---|---|---|---|---|---|---|---|---|---|
| | | | | | | | Locality 307595 | | | 0..1 307596 | 0..1 307597 | 0..1 307598 | | US_EmployeePayrollInputReplicationRequestEmployeeETA-Federal-TaxAr-range-ment-TaxAu-thority-ItemPe-riod-TermsLocality 307599 |
| | | | | | | | | @action Code 307600 | | 1 307601 | 1 307602 | 1 307603 | | Action-Code 307604 |
| | | | | | | | | Employ-eeWork-Local-TaxAu-thority-RoleIn-dicator 307605 | | 0..1 307606 | 1 307607 | 1 307608 | | Indicator 307609 |
| | | | | | | | | Local-Work-TaxAu-thori-tyTimePercent 307610 | | 0..1 307611 | 0..1 307612 | 0..1 307613 | | Percent 307614 |

FIG. 307-28

| Package | level1 | | level2 | level3 | level4 | level5 | level6 | level7 | level8 | Cardinality | Cardinality (Save) | Cardinality (Create& NoAction) | Cardinality (Delete) | Datatype Name |
|---|---|---|---|---|---|---|---|---|---|---|---|---|---|---|
| | | | | | | | | Employ-eeResi-dence-Local-TaxAu-thority-RoleIn-dicator 307615 | | 0..1 307616 | 1 307617 | 1 307618 | | Indicator 307619 |
| | | | | | | | | Employ-eeTem-porary-WorkLo-cal-TaxAu-thority-RoleIn-dicator 307620 | | 0..1 307621 | 1 307622 | 1 307623 | | Indicator 307624 |
| | | | | | | | | Employ-eeTaxa-tion-Method 307625 | | 0..n 307626 | 0..n 307627 | 0..n 307628 | | US_EmployeePayrollInputReplicationRequestEmployeeETAFTATaxAu-thority-ItemPe-riod-TermsLocalityEm-ployee-Taxation-Method 307629 |

FIG. 307-29

| Package | level1 | | level2 | level3 | level4 | level5 | level6 | level7 | level8 | Cardinality | Cardinality (Save) | Cardinality (Create& NoAction) | Cardinality (Delete) | Datatype Name |
|---|---|---|---|---|---|---|---|---|---|---|---|---|---|---|
| | | | | | | | | | LocalIncomeEmployee-Taxation-Method-Code 307630 | 0..1 307631 | 0..1 307632 | 0..1 307633 | | Employ-eeTaxa-tionEx-emption-Method-Code 307634 |
| | | | | | | | | | Local-SchoolD-istrictIn-comeEmployee-Taxation-Method-Code 307635 | 0..1 307636 | 0..1 307637 | 0..1 307638 | | Employ-eeTaxa-tionEx-emption-Method-Code 307639 |
| Withholding-Form 307640 | | | | | | Withhold-ingForm 307641 | | | | 0..n 307642 | 0..n 307643 | 0..n 307644 | | US_EmployeePayrollInputReplicationRequest Employ-eeETA-Federal-TaxAr-range-ment-TaxAu-thority-Item-Withhold-ingForm 307645 |

FIG. 307-30

| Package | level1 | | level2 | level3 | level4 | level5 | level6 | level7 | level8 | Cardinality | Cardinality (Save) | Cardinality (Create& NoAction) | Cardinality (Delete) | Datatype Name |
|---|---|---|---|---|---|---|---|---|---|---|---|---|---|---|
| | | | | | | | @action Code 307646 | | | 1 307647 | 1 307648 | 1 307649 | 1 307650 | Action-Code 307651 |
| | | | | | | | @federal ListCom-pleteTra nsmis-sionIndi-cator 307652 | | | 0..1 307653 | 1 307654 | 0..1 307655 | | Indicator 307656 |
| | | | | | | | @stateLi stCom-pleteTra nsmis-sionIndi-cator 307657 | | | 0..1 307658 | 1 307659 | 0..1 307660 | | Indicator 307661 |
| | | | | | | | @locality ListCom-pleteTra nsmis-sionIndi-cator 307662 | | | 0..1 307663 | 1 307664 | 0..1 307665 | | Indicator 307666 |
| | | | | | | | ObjectNo deRefer-ence 307667 | | | 1 307668 | 1 307669 | 1 307670 | 1 307671 | ObjectNo deRefer-ence 307672 |

FIG. 307-31

| Package | level1 | | level2 | level3 | level4 | level5 | level6 | level7 | level8 | Cardinality | Cardinality (Save) | Cardinality (Create& NoAction) | Cardinality (Delete) | Datatype Name |
|---|---|---|---|---|---|---|---|---|---|---|---|---|---|---|
| | | | | | | | Employ-eeTax-Withholdi ngEx-emp-tionCerti-fi-cateType Code 307673 | | | 0..1 307674 | 0..1 307675 | 0..1 307676 | | Employ-eeTax-Withhold-ingEx-emption-Certifi-cateType Code 307677 |
| | | | | | | | Valid-ityPeriod 307678 | | | 0..1 307679 | 1 307680 | 1 307681 | | CLOSED _DatePe-riod 307682 |
| | | | | | | | Federal 307683 | | | 0..1 307684 | 0..1 307685 | 0..1 307686 | | US_Empl oyeePayr ollInputR eplication Request Employe eETA-Federal-TaxAr-range-ment-TaxAu-thority-Item-Withhold-ingForm-Federal 307687 |
| | | | | | | | | @action Code 307688 | | 1 307689 | 1 307690 | 1 307691 | | Action-Code 307692 |

FIG. 307-32

| Package | level1 | | level2 | level3 | level4 | level5 | level6 | level7 | level8 | Cardinality | Cardinality (Save) | Cardinality (Create& NoAction) | Cardinality (Delete) | Datatype Name |
|---|---|---|---|---|---|---|---|---|---|---|---|---|---|---|
| | | | | | | | | Feder-alEm-ployee-Taxa-tionMari-talStatus Code 307693 | | 0..1 307694 | 0..1 307695 | 0..1 307696 | | Employ-eeTaxa-tionMari-tal-StatusCo de 307697 |
| | | | | | | | | Feder-alIn-comeTa xExemp-tionNum-berValue 307698 | | 0..1 307699 | 0..1 307700 | 0..1 307701 | | Number-Value 307702 |
| | | | | | | | | Feder-alIn-comeAd dition-alWith-holding-Tax-Amount 307703 | | 0..1 307704 | 0..1 307705 | 0..1 307706 | | Amount 307707 |
| | | | | | | | | | Currency Code 307708 | 0..1 307709 | 0..1 307710 | 0..1 307711 | | Currency Code 307712 |

FIG. 307-33

| Package | level1 | | level2 | level3 | level4 | level5 | level6 | level7 | level8 | Cardinality | Cardinality (Save) | Cardinality (Create& NoAction) | Cardinality (Delete) | Datatype Name |
|---|---|---|---|---|---|---|---|---|---|---|---|---|---|---|
| | | | | | | | | Feder-alIn-comeTaxExemptedIndi-cator 307713 | | 0..1 307714 | 1 307715 | 1 307716 | | Indicator 307717 |
| | | | | | | | | FederalEarnedIncome-CreditAdvance-Pay-mentEmployee-taxa-tionMari-talStatusCode 307718 | | 0..1 307719 | 0..1 307720 | 0..1 307721 | | Employ-eeTaxa-tionMari-tal-StatusCode 307722 |

FIG. 307-34

| Package | level1 | | level2 | level3 | level4 | level5 | level6 | level7 | level8 | Cardinality | Cardinality (Save) | Cardinality (Create& NoAction) | Cardinality (Delete) | Datatype Name |
|---|---|---|---|---|---|---|---|---|---|---|---|---|---|---|
| | | | | | | | State 307723 | | | 0..1 307724 | 0..1 307725 | 0..1 307726 | | US_EmployeePayrollInputReplicationRequestEmployeeETA-Federal-TaxArrange-ment-TaxAu-thority-Item-Withhold-ing-FormState 307727 |
| | | | | | | | | @action Code 307728 | | 1 307729 | 1 307730 | 1 307731 | | Action-Code 307732 |
| | | | | | | | | StateEmployee-Taxa-tionMari-talStatus Code 307733 | | 0..1 307734 | 0..1 307735 | 0..1 307736 | | Employ-eeTaxa-tionMari-tal-StatusCode 307737 |

FIG. 307-35

| Package | level1 | | level2 | level3 | level4 | level5 | level6 | level7 | level8 | Cardinality | Cardinality (Save) | Cardinality (Create& NoAction) | Cardinality (Delete) | Datatype Name |
|---|---|---|---|---|---|---|---|---|---|---|---|---|---|---|
| | | | | | | | | StateIn-comeWithhold-ingTax-Allow-anceNumber-value 307738 | | 0..1 307739 | 0..1 307740 | 0..1 307741 | | Number-Value 307742 |
| | | | | | | | | StateIn-comeWithholding TaxEx-emptA-mount 307743 | | 0..1 307744 | 0..1 307745 | 0..1 307746 | | Amount 307747 |
| | | | | | | | | | Currency Code 307748 | 0..1 307749 | 0..1 307750 | 0..1 307751 | | Currency Code 307752 |
| | | | | | | | | StateIn-comeAddition-alWith-holding-TaxEx-emptA-mount 307753 | | 0..1 307754 | 0..1 307755 | 0..1 307756 | | Amount 307757 |
| | | | | | | | | | Currency Code 307758 | 0..1 307759 | 0..1 307760 | 0..1 307761 | | Currency Code 307762 |

FIG. 307-36

| Package | level1 | | level2 | level3 | level4 | level5 | level6 | level7 | level8 | Cardinality | Cardinality (Save) | Cardinality (Create& NoAction) | Cardinality (Delete) | Datatype Name |
|---|---|---|---|---|---|---|---|---|---|---|---|---|---|---|
| | | | | | | | | StateIn-comeR-educed With-holding-TaxEx-emptA-mount 307763 | | 0..1 307764 | 0..1 307765 | 0..1 307766 | | Amount 307767 |
| | | | | | | | | | Currency Code 307768 | 0..1 307769 | 0..1 307770 | 0..1 307771 | | Currency Code 307772 |
| | | | | | | | | StateIn-comeTa xExempt edIndi-cator 307773 | | 0..1 307774 | 1 307775 | 1 307776 | | Indicator 307777 |
| | | | | | | | | StateIn-comeWit hhold-ingPer-sonal-TaxAllow anceNu mber-Value 307778 | | 0..1 307779 | 0..1 307780 | 0..1 307781 | | Number-Value 307782 |

FIG. 307-37

| Package | level1 | | level2 | level3 | level4 | level5 | level6 | level7 | level8 | Cardinality | Cardinality (Save) | Cardinality (Create& NoAction) | Cardinality (Delete) | Datatype Name |
|---|---|---|---|---|---|---|---|---|---|---|---|---|---|---|
| | | | | | | | | StateIn-comeWithhold-ingDe-pendentTaxAllowanceNumber-Value 307783 | | 0..1 307784 | 0..1 307785 | 0..1 307786 | | Number-Value 307787 |
| | | | | | | | | Arizona-In-comeTaxWithholdingPer-cent-Code 307788 | | 0..1 307789 | 0..1 307790 | 0..1 307791 | | In-comeTaxWithhold-ingPer-centCode 307792 |
| | | | | | | | | State-Non-Residen-tWork-TimePercent 307793 | | 0..1 307794 | 0..1 307795 | 0..1 307796 | | Percent 307797 |
| | | | | | | | | NewYorkCityRe-sidentIn-dicator 307798 | | 0..1 307799 | 1 307800 | 1 307801 | | Indicator 307802 |

FIG. 307-38

| Package | level1 | | level2 | level3 | level4 | level5 | level6 | level7 | level8 | Cardinality | Cardinality (Save) | Cardinality (Create& NoAction) | Cardinality (Delete) | Datatype Name |
|---|---|---|---|---|---|---|---|---|---|---|---|---|---|---|
| | | | | | | | | NewYorkCityIncomeWithholdingTaxAllowanceNumberValue 307803 | | 0..1 307804 | 0..1 307805 | 0..1 307806 | | NumberValue 307807 |
| | | | | | | | | PuertoRicoIncomeWithholdingDeductionTaxAllowanceNumberValue 307808 | | 0..1 307809 | 0..1 307810 | 0..1 307811 | | NumberValue 307812 |
| | | | | | | | | YonkersCityResidentIndicator 307813 | | 0..1 307814 | 1 307815 | 1 307816 | | Indicator 307817 |

FIG. 307-39

| Package | level1 | | level2 | level3 | level4 | level5 | level6 | level7 | level8 | Cardinality | Cardinality (Save) | Cardinality (Create& NoAction) | Cardinality (Delete) | Datatype Name |
|---|---|---|---|---|---|---|---|---|---|---|---|---|---|---|
| | | | | | | | | Yonker-sCityIn-comeWit hhold-ingTax-Allow-anceNu mber-Value 307818 | | 0..1 307819 | 0..1 307820 | 0..1 307821 | | Number-Value 307822 |
| | | | | | | | | Yonkers Non-Residen-tWork-TimePer cent 307823 | | 0..1 307824 | 0..1 307825 | 0..1 307826 | | Percent 307827 |
| | | | | | | | Locality 307828 | | | 0..1 307829 | 0..1 307830 | 0..1 307831 | | US_Empl oyeePayr ollInputR eplication Request Employe eETAFed eralTax-Ar-rangeme ntTaxAu-thority-Item-Withhold-ingForm-Locality 307832 |
| | | | | | | | | @action Code 307833 | | 1 307834 | 1 307835 | 1 307836 | | Action-Code 307837 |

FIG. 307-40

| Package | level1 | | level2 | level3 | level4 | level5 | level6 | level7 | level8 | Cardinality | Cardinality (Save) | Cardinality (Create& NoAction) | Cardinality (Delete) | Datatype Name |
|---|---|---|---|---|---|---|---|---|---|---|---|---|---|---|
| | | | | | | | | Local-ResidentIndicator 307838 | | 0..1 307839 | 1 307840 | 1 307841 | | Indicator 307842 |
| | | | | | | | | LocalIncomeTaxWorktimePercent 307843 | | 0..1 307844 | 0..1 307845 | 0..1 307846 | | Percent 307847 |
| | | | | | | | | LocalIncomeWithholdingTaxAllowanceNumber-Value 307848 | | 0..1 307849 | 0..1 307850 | 0..1 307851 | | Number-Value 307852 |
| | | | | | | | | LocalIncomeWithholdingPersonal-TaxExemption-Number Value 307853 | | 0..1 307854 | 0..1 307855 | 0..1 307856 | | SMALL_ Number-Value 307857 |

FIG. 307-41

| Package | level1 | | level2 | level3 | level4 | level5 | level6 | level7 | level8 | Cardinality | Cardinality (Save) | Cardinality (Create& NoAction) | Cardinality (Delete) | Datatype Name |
|---|---|---|---|---|---|---|---|---|---|---|---|---|---|---|
| | | | | | | | | LocalIn-comeAd dition-alWith-holding-Tax-Amount 307858 | | 0..1 307859 | 0..1 307860 | 0..1 307861 | | CURREN CYUSD_ MEDIUM _Amount 307862 |
| | | | | | | | | LocalIn-comeWit hhold-ingS-pouse-TaxEx-emption-Number Value 307863 | | 0..1 307864 | 0..1 307865 | 0..1 307866 | | SMALL_ Number-Value 307867 |
| | | | | | | | | LocalIn-comeWit hhold-ingDe-pendant-TaxEx-emption-Number Value 307868 | | 0..1 307869 | 0..1 307870 | 0..1 307871 | | SMALL_ Number-Value 307872 |

FIG. 307-42

| Package | level1 | | level2 | level3 | level4 | level5 | level6 | level7 | level8 | Cardinality | Cardinality (Save) | Cardinality (Create& NoAction) | Cardinality (Delete) | Datatype Name |
|---|---|---|---|---|---|---|---|---|---|---|---|---|---|---|
| **EmploymentItem** 307873 | | | | Employ-mentItem 307874 | | | | | | 0..n 307875 | | 1 307876 | | US_EmployeePay-rollInpu-tReplica-tionRe-questEm ploy-eeEm-ploymen-tItem 307877 |
| | | | | | @action Code 307878 | | | | | 1 307879 | 1 307880 | 1 307881 | 1 307882 | Action-Code 307883 |
| | | | | | @workA greemen tItemList-Complet eTransmi ssionIndi cator 307884 | | | | | 0..1 307885 | 1 307886 | 0..1 307887 | | Indicator 307888 |
| | | | | | ObjectNo deRefer-ence 307889 | | | | | 1 307890 | 1 307891 | 1 307892 | 1 307893 | ObjectNo deRefer-ence 307894 |
| | | | | | Coun-tryCode 307895 | | | | | 0..1 307896 | 1 307897 | 1 307898 | | Country-Code 307899 |

FIG. 307-43

| Package | level1 | | level2 | level3 | level4 | level5 | level6 | level7 | level8 | Cardinality | Cardinality (Save) | Cardinality (Create& NoAction) | Cardinality (Delete) | Datatype Name |
|---|---|---|---|---|---|---|---|---|---|---|---|---|---|---|
| **WorkAgreementItem** 307900 | | | | | WorkA-gree-mentItem 307901 | | | | | 0..n 307902 | 0..n 307903 | 0..n 307904 | | US_EmployeePayrollInputReplica-tionRe-questEmploy-eeEm-ploymen-tItem-WorkA-greemen-tItem 307905 |
| | | | | | | @action Code 307906 | | | | 1 307907 | 1 307908 | 1 307909 | 1 307910 | Action-Code 307911 |
| | | | | | | @employeePayrol-lAgree-mentItem ListCom-pleteTran smission-Indicator 307912 | | | | 0..1 307913 | 1 307914 | 0..1 307915 | | Indicator 307916 |
| | | | | | | @perma nent-Establish mentList Com-pleteTran smission-Indicator 307917 | | | | 0..1 307918 | 1 307919 | 0..1 307920 | | Indicator 307921 |

FIG. 307-44

| Package | level1 | | level2 | level3 | level4 | level5 | level6 | level7 | level8 | Cardinality | Cardinality (Save) | Cardinality (Create& NoAction) | Cardinality (Delete) | Datatype Name |
|---|---|---|---|---|---|---|---|---|---|---|---|---|---|---|
| | | | | | | @costCentreList-Com-pleteTransmission-Indicator 307922 | | | | 0..1 307923 | 1 307924 | 0..1 307925 | | Indicator 307926 |
| | | | | | | @wageSepara-tionList-Com-pleteTransmission-Indicator 307927 | | | | 0..1 307928 | 1 307929 | 0..1 307930 | | Indicator 307931 |
| | | | | | | @employeeTaxArrange-ment-Federal-TaxAr-range-mentList Com-pleteTransmission-Indicator 307932 | | | | 0..1 307933 | 1 307934 | 0..1 307935 | | Indicator 307936 |

FIG. 307-45

| Package | level1 | | level2 | level3 | level4 | level5 | level6 | level7 | level8 | Cardinality | Cardinality (Save) | Cardinality (Create& NoAction) | Cardinality (Delete) | Datatype Name |
|---|---|---|---|---|---|---|---|---|---|---|---|---|---|---|
| | | | | | | @employeeTime-Calen-darValu-ated-TimeList Com-pleteTransmission-Indicator 307937 | | | | 0..1 307938 | 1 307939 | 0..1 307940 | | Indicator 307941 |
| | | | | | | @employeeTimeCalendar-Planned Working-TimeList Com-pleteTransmission-Indicator 307942 | | | | 0..1 307943 | 1 307944 | 0..1 307945 | | Indicator 307946 |
| | | | | | | @valuatedAverage Working-Timet-ListCom-pleteTransmission-Indicator 307947 | | | | 0..1 307948 | 1 307949 | 0..1 307950 | | Indicator 307951 |

FIG. 307-46

| Package | level1 | | level2 | level3 | level4 | level5 | level6 | level7 | level8 | Cardinality | Cardinality (Save) | Cardinality (Create& NoAction) | Cardinality (Delete) | Datatype Name |
|---|---|---|---|---|---|---|---|---|---|---|---|---|---|---|
| | | | | | | @employeeTimeCalendar-TimeAc-count-Payout-ListCom-pleteTransmission-Indicator 307952 | | | | 0..1 307953 | 1 307954 | 0..1 307955 | | Indicator 307956 |
| | | | | | | @employeeTimeAccount-Balance-ListCom-pleteTransmission-Indicator 307957 | | | | 0..1 307958 | 1 307959 | 0..1 307960 | | Indicator 307961 |
| | | | | | | @employeeTimeAgreemen-tWork-Week-ListCom-pleteTransmission-Indicator 307962 | | | | 0..1 307963 | 1 307964 | 0..1 307965 | | Indicator 307966 |

FIG. 307-47

| Package | level1 | | level2 | level3 | level4 | level5 | level6 | level7 | level8 | Cardinality | Cardinality (Save) | Cardinality (Create& NoAction) | Cardinality (Delete) | Datatype Name |
|---|---|---|---|---|---|---|---|---|---|---|---|---|---|---|
| | | | | | | @compensationAgreementItemCompensationComponentDetailListCompleteTransmissionIndicator 307967 | | | | 0..1 307968 | 1 307969 | 0..1 307970 | | Indicator 307971 |
| | | | | | | ObjectNodeReference 307972 | | | | 1 307973 | 1 307974 | 1 307975 | 1 307976 | ObjectNodeReference 307977 |
| | | | | | | ValidityPeriod 307978 | | | | 0..1 307979 | 1 307980 | 1 307981 | | CLOSED_DatePeriod 307982 |
| | | | | | | WorkAgreementTypeCode 307983 | | | | 0..1 307984 | 1 307985 | 1 307986 | | WorkAgreementTypeCode 307987 |
| | | | | | | AdministrativeCategoryCode 307988 | | | | 0..1 307989 | 1 307990 | 1 307991 | | WorkAgreementAdministrativeCategoryCode 307992 |

FIG. 307-48

| Package | level1 | | level2 | level3 | level4 | level5 | level6 | level7 | level8 | Cardinality | Cardinality (Save) | Cardinality (Create& NoAction) | Cardinality (Delete) | Datatype Name |
|---|---|---|---|---|---|---|---|---|---|---|---|---|---|---|
| PermanentEstab-lishment 307993 | | | | | | Perma-nent-Estab-lishment 307994 | | | | 0..n 307995 | 1..n 307996 | 1..n 307997 | | US_EmployeePayrollInputReplicationRequest Employ-eeEm-ploymen-tItem-WorkA-greemen-tItem-Perma-nent-Estab-lishment 307998 |
| | | | | | | | @action Code 307999 | | | 1 3071000 | 1 3071001 | 1 3071002 | 1 3071003 | Action-Code 3071004 |
| | | | | | | | ObjectNo deRefer-ence 3071005 | | | 1 3071006 | 1 3071007 | 1 3071008 | 1 3071009 | ObjectNo deRefer-ence 3071010 |
| | | | | | | | Valid-ityPeriod 3071011 | | | 1 3071012 | 1 3071013 | 1 3071014 | | CLOSED _DatePe-riod 3071015 |
| | | | | | | | Perma-nent-Estab-lishmen-tID 3071016 | | | 1 3071017 | 1 3071018 | 1 3071019 | | Organi-sational-CentreID 3071020 |

FIG. 307-49

| Package | level1 | | level2 | level3 | level4 | level5 | level6 | level7 | level8 | Cardinality | Cardinality (Save) | Cardinality (Create& NoAction) | Cardinality (Delete) | Datatype Name |
|---|---|---|---|---|---|---|---|---|---|---|---|---|---|---|
| CostCentre 3071021 | | | | | | CostCentre 3071022 | | | | 0..n 3071023 | 1..n 3071024 | 1..n 3071025 | | US_EmployeePayrollInputReplicationRequestEmployeeEmploymentItemWorkAgreementItemCostCentre 3071026 |
| | | | | | | | @actionCode 3071027 | | | 1 3071028 | 1 3071029 | 1 3071030 | 1 3071031 | ActionCode 3071032 |
| | | | | | | | ObjectNodeReference 3071033 | | | 1 3071034 | 1 3071035 | 1 3071036 | 1 3071037 | ObjectNodeReference 3071038 |
| | | | | | | | ValidityPeriod 3071039 | | | 1 3071040 | 1 3071041 | 1 3071042 | | CLOSED_DatePeriod 3071043 |
| | | | | | | | CostcentreID 3071044 | | | 1 3071045 | 1 3071046 | 1 3071047 | | OrganisationalCentreID 3071048 |

FIG. 307-50

| Package | level1 | | level2 | level3 | level4 | level5 | level6 | level7 | level8 | Cardinality | Cardinality (Save) | Cardinality (Create& NoAction) | Cardinality (Delete) | Datatype Name |
|---|---|---|---|---|---|---|---|---|---|---|---|---|---|---|
| WageSeparation 3071049 | | | | | | WageSeparation 3071050 | | | | 0..n 3071051 | 0..n 3071052 | 0..n 3071053 | | US_EmployeePayrollInputReplicationRequestEmployeeEmploymentItemWorkAgreementItemWageSeparation 3071054 |
| | | | | | | | @actionCode 3071055 | | | 1 3071056 | 1 3071057 | 1 3071058 | 1 3071059 | ActionCode 3071060 |
| | | | | | | | ObjectNodeReference 3071061 | | | 1 3071062 | 1 3071063 | 1 3071064 | 1 3071065 | ObjectNodeReference 3071066 |
| | | | | | | | Date 3071067 | | | 1 3071068 | 1 3071069 | 1 3071070 | | Date 3071071 |

FIG. 307-51

| Package | level1 | | level2 | level3 | level4 | level5 | level6 | level7 | level8 | Cardinality | Cardinality (Save) | Cardinality (Create& NoAction) | Cardinality (Delete) | Datatype Name |
|---|---|---|---|---|---|---|---|---|---|---|---|---|---|---|
| EmployeePayrollAgreementItem 3071072 | | | | | | EmployeePayrollAgreementItem 3071073 | | | | 0..n 3071074 | 0..n 3071075 | 0..n 3071076 | | S_EmployeePayrollInputReplicationRequestEmployeeEmploymentItem-WorkAgreementItemEmployeePayrollAgreementItem 3071077 |
| | | | | | | | @actionCode 3071078 | | | 1 3071079 | 1 3071080 | 1 3071081 | 1 3071082 | Action-Code 3071083 |
| | | | | | | | @payrollProcessingConditionsListCompleteTransmissionIndicator 3071084 | | | 1 3071085 | 1 3071086 | 1 3071087 | 1 3071088 | Indicator 3071089 |

FIG. 307-52

| Package | level1 | | level2 | level3 | level4 | level5 | level6 | level7 | level8 | Cardinality | Cardinality (Save) | Cardinality (Create& NoAction) | Cardinality (Delete) | Datatype Name |
|---|---|---|---|---|---|---|---|---|---|---|---|---|---|---|
| | | | | | | | @mainPay-mentList Com-pleteTra nsmis-sionIndi-cator 3071090 | | | 1 3071091 | 1 3071092 | 1 3071093 | 1 3071094 | Indicator 3071095 |
| | | | | | | | @further Pay-ments-PlanList Com-pleteTra nsmis-sionIndi-cator 3071096 | | | 1 3071097 | 1 3071098 | 1 3071099 | 1 3071100 | Indicator 3071101 |
| | | | | | | | ObjectNo deRefer-ence 3071102 | | | 1 3071103 | 1 3071104 | 1 3071105 | 1 3071106 | ObjectNo deRefer-ence 3071107 |
| | | | | | | | WorkA-gree-ment-Payroll-Provide-rID 3071108 | | | 0..1 3071109 | | | | WorkA-greemen-tID 3071110 |

FIG. 307-53

| Package | level1 | | level2 | level3 | level4 | level5 | level6 | level7 | level8 | Cardinality | Cardinality (Save) | Cardinality (Create& NoAction) | Cardinality (Delete) | Datatype Name |
|---|---|---|---|---|---|---|---|---|---|---|---|---|---|---|
| | | | | | | | PayrollProcessingConditions 3071111 | | | 0..n 3071112 | 0..n 3071113 | 0..n 3071114 | | US_EmployeePayrollInputReplicationRequestEmployeeETItemWAItemEmployeePayrollAgreementItemPayrollProcessingConditions 3071115 |
| | | | | | | | | @action Code 3071116 | | 1 3071117 | 1 3071118 | 1 3071119 | 1 3071120 | ActionCode 3071121 |
| | | | | | | | | ObjectNodeReference 3071122 | | 1 3071123 | 1 3071124 | 1 3071125 | 1 3071126 | ObjectNodeReference 3071127 |
| | | | | | | | | ValidityPeriod 3071128 | | 0..1 3071129 | 1 3071130 | 1 3071131 | | CLOSED_DatePeriod 3071132 |
| | | | | | | | | PayrollGroupCode 3071133 | | 0..1 3071134 | 1 3071135 | 1 3071136 | | PayrollGroupCode 3071137 |

FIG. 307-54

| Package | level1 | | level2 | level3 | level4 | level5 | level6 | level7 | level8 | Cardinality | Cardinality (Save) | Cardinality (Create& NoAction) | Cardinality (Delete) | Datatype Name |
|---|---|---|---|---|---|---|---|---|---|---|---|---|---|---|
| | | | | | | | | PayrollInactiveIndicator 3071138 | | 0..1 3071139 | 1 3071140 | 1 3071141 | | Indicator 3071142 |
| | | | | | | | MainPayment 3071143 | | | 0..n 3071144 | 0..n 3071145 | 0..n 3071146 | | US_EmployeePayrollInputReplicationRequestEmployeeEmploymentItemWorkAgreementItemEmployeePayrollAgreementItemMainPayment 3071147 |
| | | | | | | | | @actionCode 3071148 | | 1 3071149 | 1 3071150 | 1 3071151 | 1 3071152 | ActionCode 3071153 |
| | | | | | | | | ObjectNodeReference 3071154 | | 1 3071155 | 1 3071156 | 1 3071157 | 1 3071158 | ObjectNodeReference 3071159 |
| | | | | | | | | ValidityPeriod 3071160 | | 0..1 3071161 | 1 3071162 | 1 3071163 | | CLOSED_DatePeriod 3071164 |

FIG. 307-55

| Package | level1 | | level2 | level3 | level4 | level5 | level6 | level7 | level8 | Cardinality | Cardinality (Save) | Cardinality (Create& NoAction) | Cardinality (Delete) | Datatype Name |
|---|---|---|---|---|---|---|---|---|---|---|---|---|---|---|
| | | | | | | | | Payment Form-Code 3071165 | | 0..1 3071166 | 1 3071167 | 1 3071168 | | Payment-Form-Code 3071169 |
| | | | | | | | | Payment Compo-nentBusiness-Transac-tionDocument-BankAc-count 3071170 | | 0..1 3071171 | 0..1 3071172 | 0..1 3071173 | | ADDRESSINDEPENDENT_BusinessTrans-action-Docu-ment-BankAc-count 3071174 |
| | | | | | | | Further-Pay-ments-Plan 3071175 | | | 0..n 3071176 | 0..n 3071177 | 0..n 3071178 | | S_EmployeePayrollInputReplicationRequestEmploy-eeETItemWAlte-mEmployeePayrol-lAgree-mentItemFurther-Pay-ments-Plan 3071179 |

FIG. 307-56

| Package | level1 | | level2 | level3 | level4 | level5 | level6 | level7 | level8 | Cardinality | Cardinality (Save) | Cardinality (Create& NoAction) | Cardinality (Delete) | Datatype Name |
|---|---|---|---|---|---|---|---|---|---|---|---|---|---|---|
| | | | | | | | | @action Code 3071180 | | 1 3071181 | 1 3071182 | 1 3071183 | 1 3071184 | Action-Code 3071185 |
| | | | | | | | | @compo nentList Com-pleteTra nsmis-sionIndi-cator 3071186 | | 1 3071187 | 1 3071188 | 1 3071189 | 1 3071190 | Com-pleteTran smission-Indicator 3071191 |
| | | | | | | | | Object-No-deRefer ence 3071192 | | 1 3071193 | 1 3071194 | 1 3071195 | 1 3071196 | ObjectNo deRefer-ence 3071197 |
| | | | | | | | | Valid-ityPeriod 3071198 | | 0..1 3071199 | 1 3071200 | 1 3071201 | 0..1 3071202 | CLOSED _DatePe-riod 3071203 |

FIG. 307-57

| Package | level1 | | level2 | level3 | level4 | level5 | level6 | level7 | level8 | Cardinality | Cardinality (Save) | Cardinality (Create& NoAction) | Cardinality (Delete) | Datatype Name |
|---|---|---|---|---|---|---|---|---|---|---|---|---|---|---|
| | | | | | | | | Compo-nent 3071204 | | 0..n 3071205 | 1..n 3071206 | 1..n 3071207 | | US_EmployeePayrollInputReplicationRequestEmployeeEmploymentItemWorkAgreementItemFurtherPaymentsPlanComponent 3071208 |
| | | | | | | | | | @action Code 3071209 | 1 3071210 | 1 3071211 | 1 3071212 | 1 3071213 | Action-Code 3071214 |
| | | | | | | | | | Descrip-tion 3071215 | 0..1 3071216 | 1 3071217 | 1 3071218 | | Me-dium_Description 3071219 |
| | | | | | | | | | Percent 3071220 | 0..1 3071221 | 0..1 3071222 | 0..1 3071223 | | Percent 3071224 |
| | | | | | | | | | Amount 3071225 | 0..1 3071226 | 0..1 3071227 | 0..1 3071228 | | |
| | | | | | | | | | Payment Form-Code 3071229 | 0..1 3071230 | 1 3071231 | 1 3071232 | | Payment-Form-Code 3071233 |

FIG. 307-58

| Package | level1 | | level2 | level3 | level4 | level5 | level6 | level7 | level8 | Cardinality | Cardinality (Save) | Cardinality (Create& NoAction) | Cardinality (Delete) | Datatype Name |
|---|---|---|---|---|---|---|---|---|---|---|---|---|---|---|
| | | | | | | | | | PaymentComponentBusiness-TransactionDocument-BankAccount 3071234 | 0..1 3071235 | 0..1 3071236 | 0..1 3071237 | | ADDRESSINDEPENDENT_BusinessTransaction-Document-BankAccount 3071238 |
| EmployeeTaxArrangementFederalTaxArrangement 3071239 | | | | | | Employ-eeTaxArrangement-Federal-TaxArrangement 3071240 | | | | 0..1 3071241 | 0..1 3071242 | 0..1 3071243 | | US_EmployeePayrollInputReplicationRequestEmployeeETItemWorkA-greementItemEmployee-TaxArrangement-Federal-TaxArrangement 3071244 |
| | | | | | | | TaxArrangementUUID 3071245 | | | 1 3071246 | 1 3071247 | 1 3071248 | | UUID 3071249 |

FIG. 307-59

| Package | level1 | | level2 | level3 | level4 | level5 | level6 | level7 | level8 | Cardinality | Cardinality (Save) | Cardinality (Create& NoAction) | Cardinality (Delete) | Datatype Name |
|---|---|---|---|---|---|---|---|---|---|---|---|---|---|---|
| EmployeeTime-CalendarValuat-edTime 3071250 | | | | | | Employ-eeTime-Calen-darValu-atedTime 3071251 | | | | 0..n 3071252 | 0..n 3071253 | 0..n 3071254 | | US_EmployeePayrollInputReplicationRequestEmployeeEmploymentItemWorkA-greemen-tItemEm-ploy-eeTime-Calen-darValu-atedTime 3071255 |
| | | | | | | | @action Code 3071256 | | | 1 3071257 | 1 3071258 | 1 3071259 | 1 3071260 | Action-Code 3071261 |
| | | | | | | | @paymentList-Com-pleteTransmis-sionIndi-cator 3071262 | | | 0..1 3071263 | 1 3071264 | 0..1 3071265 | | Indicator 3071266 |
| | | | | | | | ObjectNodeRefer-ence 3071267 | | | 1 3071268 | 1 3071269 | 1 3071270 | 1 3071271 | ObjectNodeRefer-ence 3071272 |

FIG. 307-60

| Package | level1 | | level2 | level3 | level4 | level5 | level6 | level7 | level8 | Cardinality | Cardinality (Save) | Cardinality (Create& NoAction) | Cardinality (Delete) | Datatype Name |
|---|---|---|---|---|---|---|---|---|---|---|---|---|---|---|
| | | | | | | | Employ-eeTimeItemPay-rollCate-gory-Code 3071273 | | | 0..1 3071274 | 1 3071275 | 1 3071276 | | Employ-eeTimeItemPay-rollCate-gory-Code 3071277 |
| | | | | | | | Employ-eeTimeItemPay-rollType Code 3071278 | | | 0..1 3071279 | 0..1 3071280 | 0..1 3071281 | | Employ-eeTimeItemPay-rollType-Code 3071282 |
| | | | | | | | Date 3071283 | | | 0..1 3071284 | 1 3071285 | 1 3071286 | | Date 3071287 |
| | | | | | | | HourQuantity 3071288 | | | 0..1 3071289 | 1 3071290 | 1 3071291 | | UNITHOUR_SMALL_Quantity 3071292 |
| | | | | | | | HourQuantityType Code 3071293 | | | 0..1 3071294 | 1 3071295 | 1 3071296 | | Quanti-tyType-Code 3071297 |
| | | | | | | | Original-DatePe-riod 3071298 | | | 0..1 3071299 | 0..1 3071300 | 0..1 3071301 | | CLOSED_DatePe-riod 3071302 |

FIG. 307-61

| Package | level1 | | level2 | level3 | level4 | level5 | level6 | level7 | level8 | Cardinality | Cardinality (Save) | Cardinality (Create& NoAction) | Cardinality (Delete) | Datatype Name |
|---|---|---|---|---|---|---|---|---|---|---|---|---|---|---|
| | | | | | | | Payment 3071303 | | | 0..n 3071304 | 0..n 3071305 | 0..n 3071306 | | US_EmployeePayrollInputReplicationRequestEmployeeEmploymentItemWorkAgreementItemEmployeeTimeCalendarValuatedTimePayment 3071307 |
| | | | | | | | | @actionCode 3071308 | | 1 3071309 | 1 3071310 | 1 3071311 | 1 3071312 | ActionCode 3071313 |
| | | | | | | | | EmployeeTimePayment 3071314 | | 0..1 3071315 | 1 3071316 | 1 3071317 | 1 3071318 | EmployeeTimePayment 3071319 |
| | | | | | | | | | BaseCompensationComponentTypeUUID 3071320 | 0..1 3071321 | | | | UUID 3071322 |

FIG. 307-62

| Package | level1 | | level2 | level3 | level4 | level5 | level6 | level7 | level8 | Cardinality | Cardinality (Save) | Cardinality (Create& NoAction) | Cardinality (Delete) | Datatype Name |
|---|---|---|---|---|---|---|---|---|---|---|---|---|---|---|
| | | | | | | | | | BaseCompensation-Component-TypeID 3071323 | 0..1 3071324 | | | | Compensation-Component-TypeID 3071325 |
| | | | | | | | | | BaseAmount 3071326 | 0..1 3071327 | | | | Amount 3071328 |
| | | | | | | | | | BaseRecurrence Frequency-Code 3071329 | 0..1 3071330 | | | | COMPENSATIONCOMPONENT_RecurrenceFrequency-Code 3071331 |
| | | | | | | | | | Result-Compensation-Component-TypeUUID 3071332 | 0..1 3071333 | | | | UUID 3071334 |

FIG. 307-63

| Package | level1 | | level2 | level3 | level4 | level5 | level6 | level7 | level8 | Cardinality | Cardinality (Save) | Cardinality (Create& NoAction) | Cardinality (Delete) | Datatype Name |
|---|---|---|---|---|---|---|---|---|---|---|---|---|---|---|
| | | | | | | | | | Result-Com-pensa-tion-Compo-nent-TypeID 3071335 | 0..1 3071336 | | | | Compen-sation-Compo-nent-TypeID 3071337 |
| | | | | | | | | | Resul-tAmount 3071338 | 0..1 3071339 | | | | Amount 3071340 |
| EmployeeTimeA-greement-PlannedWorking-Time 3071341 | | | | | | Employ-eeTime-Calendar Planned Working-Time 3071342 | | | | 0..n 3071343 | 0..n 3071344 | 0..n 3071345 | | US_EmployeePayrollInputReplicationRequestEmployeeEmploymentItemWorkA-greemen-tItemEm-ploy-eeTime-Calendar Planned Working-Time 3071346 |
| | | | | | | | @action Code 3071347 | | | 1 3071348 | 1 3071349 | 1 3071350 | 1 3071351 | Action-Code 3071352 |

FIG. 307-64

| Package | level1 | | level2 | level3 | level4 | level5 | level6 | level7 | level8 | Cardinality | Cardinality (Save) | Cardinality (Create& NoAction) | Cardinality (Delete) | Datatype Name |
|---|---|---|---|---|---|---|---|---|---|---|---|---|---|---|
| | | | | | | | ObjectNodeReference 3071353 | | | 1 3071354 | 1 3071355 | 1 3071356 | 1 3071357 | ObjectNodeReference 3071358 |
| | | | | | | | Date 3071359 | | | 0..1 3071360 | 1 3071361 | 1 3071362 | | Date 3071363 |
| | | | | | | | HourQuantity 3071364 | | | 0..1 3071365 | 1 3071366 | 1 3071367 | | UNITHOUR_SMALL_Quantity 3071368 |
| | | | | | | | HourQuantityTypeCode 3071369 | | | 0..1 3071370 | 1 3071371 | 1 3071372 | | QuantityTypeCode 3071373 |
| | | | | | | | PublicHolidayIndicator 3071374 | | | 0..1 3071375 | 0..1 3071376 | 0..1 3071377 | | Indicator,Qualifier:Holiday(NEW) 3071378 |
| | | | | | | | EmployeePlannedWorkingTimeDayTypeCode 3071379 | | | 0..1 3071380 | 0..1 3071381 | 0..1 3071382 | | EmployeePlannedWorkingTimeDayTypeCode 3071383 |

FIG. 307-65

| Package | level1 | | level2 | level3 | level4 | level5 | level6 | level7 | level8 | Cardinality | Cardinality (Save) | Cardinality (Create& NoAction) | Cardinality (Delete) | Datatype Name |
|---|---|---|---|---|---|---|---|---|---|---|---|---|---|---|
| ValuatedAverageWorkingTime 3071384 | | | | | | Valuate-dAverage Working-Time 3071385 | | | | 0..1 3071386 | 0..1 3071387 | 0..1 3071388 | | US_EmployeePayrollInputReplicationRequestEmployeeEmploymentItem-WorkAgreementItem-ValuatedAverageWorking-Time 3071389 |
| | | | | | | | @actionCode 3071390 | | | 1 3071391 | 1 3071392 | 1 3071393 | 1 3071394 | Action-Code 3071395 |
| | | | | | | | @periodListCompleteTransmissionIndicator 3071396 | | | 0..1 3071397 | 1 3071398 | 0..1 3071399 | | Indicator 3071400 |
| | | | | | | | ObjectNodeReference 3071401 | | | 1 3071402 | 1 3071403 | 1 3071404 | 1 3071405 | ObjectNodeReference 3071406 |

FIG. 307-66

| Package | level1 | | level2 | level3 | level4 | level5 | level6 | level7 | level8 | Cardinality | Cardinality (Save) | Cardinality (Create& NoAction) | Cardinality (Delete) | Datatype Name |
|---|---|---|---|---|---|---|---|---|---|---|---|---|---|---|
| | | | | | | | Period 3071407 | | | 0..n 3071408 | 1..n 3071409 | 1..n 3071410 | | US_EmployeePayrollInputReplicationRequestEmployeeETItemWorkAgreementItemValuatedAverageWorkingTimePeriod 3071411 |
| | | | | | | | | @actionCode 3071412 | | 1 3071413 | 1 3071414 | 1 3071415 | 1 3071416 | ActionCode 3071417 |
| | | | | | | | | @rateListCompleteTransmissionIndicator 3071418 | | 0..1 3071419 | 1 3071420 | 1 3071421 | | Indicator 3071422 |
| | | | | | | | | ValidityPeriod 3071423 | | 0..1 3071424 | 1 3071425 | 1 3071426 | | CLOSED_DatePeriod 3071427 |

FIG. 307-67

| Package | level1 | | level2 | level3 | level4 | level5 | level6 | level7 | level8 | Cardinality | Cardinality (Save) | Cardinality (Create& NoAction) | Cardinality (Delete) | Datatype Name |
|---|---|---|---|---|---|---|---|---|---|---|---|---|---|---|
| | | | | | | | | Rate 3071428 | | 0..n 3071429 | 1..n 3071430 | 1..n 3071431 | | US_EmployeePayrollInputReplication Re-questEm ploy-eeETItemWAItemValuatedAverage Working-TimePe-riodRate 3071432 |
| | | | | | | | | | @action Code 3071433 | 1 3071434 | 1 3071435 | 1 3071436 | 1 3071437 | Action-Code 3071438 |
| | | | | | | | | | Rate 3071439 | 0..1 3071440 | 1 3071441 | 1 3071442 | | Working-TimeR-ate 3071443 |
| | | | | | | | | PayPe-riodWork ing-TimeR-ate 3071444 | | 0..1 3071445 | 1 3071446 | 1 3071447 | | Rate 3071448 |

FIG. 307-68

| Package | level1 | | level2 | level3 | level4 | level5 | level6 | level7 | level8 | Cardinality | Cardinality (Save) | Cardinality (Create& NoAction) | Cardinality (Delete) | Datatype Name |
|---|---|---|---|---|---|---|---|---|---|---|---|---|---|---|
| EmployeeTime-CalendarTimeAc-countPayout 3071449 | | | | | | Employ-eeTime-Calendar TimeAc-count-Payout 3071450 | | | | 0..n 3071451 | 0..n 3071452 | 0..n 3071453 | | US_EmployeePayrollInputReplicationRequestEmployeeEmploymentItemWorkA-greemen-tItemEm-ploy-eeTime-Calendar TimeAc-count-Payout 3071454 |
| | | | | | | | @action Code 3071455 | | | 1 3071456 | 1 3071457 | 1 3071458 | 1 3071459 | Action-Code 3071460 |
| | | | | | | | @paymentList-Com-pleteTransmis-sionIndi-cator 3071461 | | | 0..1 3071462 | 1 3071463 | 0..1 3071464 | | Indicator 3071465 |
| | | | | | | | ObjectNodeRefer-ence 3071466 | | | 1 3071467 | 1 3071468 | 1 3071469 | 1 3071470 | ObjectNodeRefer-ence 3071471 |

FIG. 307-69

| Package | level1 | | level2 | level3 | level4 | level5 | level6 | level7 | level8 | Cardinality | Cardinality (Save) | Cardinality (Create& NoAction) | Cardinality (Delete) | Datatype Name |
|---|---|---|---|---|---|---|---|---|---|---|---|---|---|---|
| | | | | | | | Date 3071472 | | | 0..1 3071473 | 1 3071474 | 1 3071475 | | Date 3071476 |
| | | | | | | | Quantity 3071477 | | | 0..1 3071478 | 1 3071479 | 1 3071480 | | Quantity 3071481 |
| | | | | | | | Quanti-tyType-Code 3071482 | | | 0..1 3071483 | 1 3071484 | 1 3071485 | | Quanti-tyType-Code 3071486 |
| | | | | | | | Payment 3071487 | | | 0..1 3071488 | 1 3071489 | 1 3071490 | | US_EmployeePayrollInputReplicationRequestEmployeeETItemWorkA-greemen-tItemEm-ploy-eeTime-CalendarTimeAc-count-Payout-Payment 3071491 |
| | | | | | | | | @action Code 3071492 | | 1 3071493 | 1 3071494 | 1 3071495 | | Action-Code 3071496 |
| | | | | | | | | Employ-eeTime-Payment 3071497 | | 0..1 3071498 | 1 3071499 | 1 3071500 | | Employ-eeTime-Payment 3071501 |

FIG. 307-70

| Package | level1 | | level2 | level3 | level4 | level5 | level6 | level7 | level8 | Cardinality | Cardinality (Save) | Cardinality (Create& NoAction) | Cardinality (Delete) | Datatype Name |
|---|---|---|---|---|---|---|---|---|---|---|---|---|---|---|
| | | | | | | | | | BaseCompensation-Component-TypeUUID 3071502 | 0..1 3071503 | | 1 3071504 | | UUID 3071505 |
| | | | | | | | | | BaseCompensation-Component-TypeID 3071506 | 0..1 3071507 | | | | Compensation-Component-TypeID 3071508 |
| | | | | | | | | | BaseAmount 3071509 | 0..1 3071510 | | | | Amount 3071511 |
| | | | | | | | | | BaseRecurrence Frequency-Code 3071512 | 0..1 3071513 | | | | COMPENSATIONCOMPONENT_RecurrenceFrequency-Code 3071514 |

FIG. 307-71

| Package | level1 | | level2 | level3 | level4 | level5 | level6 | level7 | level8 | Cardinality | Cardinality (Save) | Cardinality (Create& NoAction) | Cardinality (Delete) | Datatype Name |
|---|---|---|---|---|---|---|---|---|---|---|---|---|---|---|
| | | | | | | | | | Result-Compensa-tion-Compo-nent-TypeUUID 3071515 | 0..1 3071516 | | | | UUID 3071517 |
| | | | | | | | | | Result-Compensa-tion-Compo-nent-TypeID 3071518 | 0..1 3071519 | | | | Compen-sation-Compo-nent-TypeID 3071520 |
| | | | | | | | | | Resul-tAmount 3071521 | 0..1 3071522 | | | | Amount 3071523 |
| EmployeeTimeAc-countBalance 3071524 | | | | | | Employ-eeTimeA ccount-Balance 3071525 | | | | 0..n 3071526 | 0..n 3071527 | 0..n 3071528 | | US_EmployeePayrollInputReplicationRequestEmployeeEm-ploymen-tItem-WorkA-greemen-tItemEm-ploy-eeTimeAccount-Balance 3071529 |

FIG. 307-72

| Package | level1 | | level2 | level3 | level4 | level5 | level6 | level7 | level8 | Cardinality | Cardinality (Save) | Cardinality (Create& NoAction) | Cardinality (Delete) | Datatype Name |
|---|---|---|---|---|---|---|---|---|---|---|---|---|---|---|
| | | | | | | | @action Code 3071530 | | | 1 3071531 | 1 3071532 | 1 3071533 | 1 3071534 | Action-Code 3071535 |
| | | | | | | | ObjectNo deRefer-ence 3071536 | | | 1 3071537 | 1 3071538 | 1 3071539 | 1 3071540 | ObjectID 3071541 |
| | | | | | | | Type-Code 3071542 | | | 0..1 3071543 | 1 3071544 | 1 3071545 | | Employ-eeTimeA ccount-Balan-ceType-Code 3071546 |
| | | | | | | | Date 3071547 | | | 0..1 3071548 | 0..1 3071549 | 0..1 3071550 | | Date 3071551 |
| | | | | | | | Employ-eeTimeA ccount-Pay-rollType Code 3071552 | | | 0..1 3071553 | 1 3071554 | 1 3071555 | | Employ-eeTimeA ccount-Pay-rollType-Code 3071556 |
| | | | | | | | Identify-ingPe-riod 3071557 | | | 0..1 3071558 | 0..1 3071559 | 0..1 3071560 | | CLOSED _DatePe-riod 3071561 |
| | | | | | | | Quantity 3071562 | | | 0..1 3071563 | 1 3071564 | 1 3071565 | | Quantity 3071566 |

FIG. 307-73

| Package | level1 | | level2 | level3 | level4 | level5 | level6 | level7 | level8 | Cardinality | Cardinality (Save) | Cardinality (Create& NoAction) | Cardinality (Delete) | Datatype Name |
|---|---|---|---|---|---|---|---|---|---|---|---|---|---|---|
| | | | | | | | QuantityTypeCode 3071567 | | | 0..1 3071568 | 1 3071569 | 1 3071570 | | QuantityTypeCode 3071571 |
| EmployeeTimeAgreementWorkWeek 3071572 | | | | | | EmployeeTimeAgreementWorkWeek 3071573 | | | | 0..1 3071574 | 0..1 3071575 | 0..1 3071576 | | US_EmployeePayrollInputReplicationRequestEmployeeEmploymentItemWorkAgreementItemEmployeeTimeAgreementWorkWeek 3071577 |
| | | | | | | | @actionCode 3071578 | | | 1 3071579 | 1 3071580 | 1 3071581 | 1 3071582 | ActionCode 3071583 |
| | | | | | | | @periodListCompleteTransmissionIndicator 3071584 | | | 0..1 3071585 | 1 3071586 | 0..1 3071587 | | Indicator 3071588 |

FIG. 307-74

| Package | level1 | | level2 | level3 | level4 | level5 | level6 | level7 | level8 | Cardinality | Cardinality (Save) | Cardinality (Create& NoAction) | Cardinality (Delete) | Datatype Name |
|---|---|---|---|---|---|---|---|---|---|---|---|---|---|---|
| | | | | | | | ObjectNodeReference 3071589 | | | 1 3071590 | 1 3071591 | 1 3071592 | 1 3071593 | ObjectNodeReference 3071594 |
| | | | | | | | Period 3071595 | | | 0..n 3071596 | 1..n 3071597 | 1..n 3071598 | | US_EmployeePayrollInputReplicationRequestEmployeeEmploymentItemWorkAgreementItemEmployeeTimeAgreementWorkWeekPeriod 3071599 |
| | | | | | | | | @actionCode 3071600 | | 1 3071601 | 1 3071602 | 1 3071603 | | ActionCode 3071604 |
| | | | | | | | | ValidityPeriod 3071605 | | 0..1 3071606 | 1 3071607 | 1 3071608 | | CLOSED_DatePeriod 3071609 |
| | | | | | | | | StartWeekdayCode 3071610 | | 0..1 3071611 | 1 3071612 | 1 3071613 | | WeekdayCode 3071614 |

FIG. 307-75

| Package | level1 | | level2 | level3 | level4 | level5 | level6 | level7 | level8 | Cardinality | Cardinality (Save) | Cardinality (Create& NoAction) | Cardinality (Delete) | Datatype Name |
|---|---|---|---|---|---|---|---|---|---|---|---|---|---|---|
| | | | | | | | | Start-Time 3071615 | | 0..1 3071616 | 1 3071617 | 1 3071618 | | Time 3071619 |
| | | | | | | | | LengthQuantity 3071620 | | 0..1 3071621 | 1 3071622 | 1 3071623 | | UNITHOURDAY_SMALL_Quantity 3071624 |
| EmployeeCompensationAgreementItemCompensationComponentDetail 3071625 | | | | | | EmployeeCompensationAgreementItemCompensationComponentDetail 3071626 | | | | 0..n 3071627 | 0..n 3071628 | 0..n 3071629 | | US_EmployeePayrollInputReplicationRequestEmployeeETItemWAItemECAItemCompensationComponentDetail 3071630 |
| | | | | | | | @actionCode 3071631 | | | 1 3071632 | 1 3071633 | 1 3071634 | 1 3071635 | ActionCode 3071636 |
| | | | | | | | ObjectNodeReference 3071637 | | | 1 3071638 | 1 3071639 | 1 3071640 | 1 3071641 | ObjectNodeReference 3071642 |

FIG. 307-76

| Package | level1 | | level2 | level3 | level4 | level5 | level6 | level7 | level8 | Cardinality | Cardinality (Save) | Cardinality (Create& NoAction) | Cardinality (Delete) | Datatype Name |
|---|---|---|---|---|---|---|---|---|---|---|---|---|---|---|
| | | | | | | | Valid-ityPeriod 3071643 | | | 0..1 3071644 | 1 3071645 | 1 3071646 | | CLOSED _DatePe-riod 3071647 |
| | | | | | | | | Valid-ityPeriod Start-Date 3071648 | | 1 3071649 | 1 3071650 | 1 3071651 | | Date 3071652 |
| | | | | | | | | Valid-ityPerio-dEnd-Date 3071653 | | 1 3071654 | 1 3071655 | 1 3071656 | | Date 3071657 |
| | | | | | | | Com-pensa-tion-Compo-nent-TypeID 3071658 | | | 0..1 3071659 | 1 3071660 | 1 3071661 | | Compen-sation-Compo-nent-TypeID 3071662 |
| | | | | | | | Com-pensa-tion-Compo-nent-TypeUUI ID 3071663 | | | 0..1 3071664 | 1 3071665 | 1 3071666 | | UUID 3071667 |

FIG. 307-77

| Package | level1 | | level2 | level3 | level4 | level5 | level6 | level7 | level8 | Cardinality | Cardinality (Save) | Cardinality (Create& NoAction) | Cardinality (Delete) | Datatype Name |
|---|---|---|---|---|---|---|---|---|---|---|---|---|---|---|
| | | | | | | | Com-pensa-tion-Compo-nentA-mount 3071668 | | | 0..1 3071669 | 0..1 3071670 | 0..1 3071671 | | Amount 3071672 |
| | | | | | | | | Decimal-Value 3071673 | | 1 3071674 | 1 3071675 | 1 3071676 | | Decimal-Value 3071677 |
| | | | | | | | | Currency Code 3071678 | | 1 3071679 | 1 3071680 | 1 3071681 | | Currency Code 3071682 |
| | | | | | | | Com-pensa-tion-Compo-nentRe-currence Fre-quency-Code 3071683 | | | 0..1 3071684 | 1 3071685 | 1 3071686 | | COMPE NSATIO NCOMP ONENT_ Recur-renceFre quency-Code 3071687 |
| | | | | | | | Com-pensa-tion-Compo-nentPer-cent 3071688 | | | 0..1 3071689 | 0..1 3071690 | 0..1 3071691 | | Percent 3071692 |

FIG. 307-78

| Package | level1 | | level2 | level3 | level4 | level5 | level6 | level7 | level8 | Cardinality | Cardinality (Save) | Cardinality (Create& NoAction) | Cardinality (Delete) | Datatype Name |
|---|---|---|---|---|---|---|---|---|---|---|---|---|---|---|
| | | | | | | | Calender DayRe-currence 3071693 | | | 0..1 3071694 | 0..1 3071695 | 0..1 3071696 | | Calendar DayRe-currence 3071697 |
| | | | | | | | Com-pensa-tion-Compo-nentBusiness-Transac-tionDocument-BankAc-count 3071698 | | | 0..1 3071699 | 0..1 3071700 | 0..1 3071701 | | ADDRESSINDEPENDENT_BusinessTrans-action-Docu-ment-BankAc-count 3071702 |
| | | | | | | | NoteTo-Pay-eeNote 3071703 | | | 0..1 3071704 | 0..1 3071705 | 0..1 3071706 | | MEDIUM_Note 3071707 |
| | | | | | | | | Lan-guage-Code 3071708 | | 0..1 3071709 | 0..1 3071710 | 0..1 3071711 | | Lan-guage 3071712 |
| ExpenseReport-SettlementResult 3071713 | | | | | | Ex-penseReportSet-tlemen-tResult 3071714 | | | | 0..n 3071715 | 0..n 3071716 | 0..n 3071717 | | Ex-penseReportSet-tlemen-tResult 3071718 |

FIG. 307-79

| Package | level1 | | level2 | level3 | level4 | level5 | level6 | level7 | level8 | Cardinality | Cardinality (Save) | Cardinality (Create& NoAction) | Cardinality (Delete) | Datatype Name |
|---|---|---|---|---|---|---|---|---|---|---|---|---|---|---|
| | | | | | | | @actionCode 3071719 | | | 1 3071720 | 1 3071721 | 1 3071722 | 1 3071723 | Action-Code 3071724 |
| | | | | | | | @payrollTotalItemListCompleteTransmissionIndicator 3071725 | | | 1 3071726 | 1 3071727 | 1 3071728 | | Indicator 3071729 |
| | | | | | | | ObjectNodeReference 3071730 | | | 1 3071731 | 1 3071732 | 1 3071733 | 1 3071734 | ObjectNodeReference 3071735 |
| | | | | | | | ExpenseReportID 3071736 | | | 1 3071737 | 1 3071738 | 1 3071739 | 1 3071740 | ExpenseReportID 3071741 |
| | | | | | | | ExpenseReportStartDate 3071742 | | | 1 3071743 | 1 3071744 | 1 3071745 | | Date 3071746 |
| | | | | | | | ExpenseReportEndDate 3071747 | | | 1 3071748 | 1 3071749 | 1 3071750 | | Date 3071751 |

FIG. 307-80

| Package | level1 | | level2 | level3 | level4 | level5 | level6 | level7 | level8 | Cardinality | Cardinality (Save) | Cardinality (Create& NoAction) | Cardinality (Delete) | Datatype Name |
|---|---|---|---|---|---|---|---|---|---|---|---|---|---|---|
| | | | | | | | Posting-Transac-tionBase Posting-Date 3071752 | | | 1 3071753 | 1 3071754 | 1 3071755 | | Date 3071756 |
| | | | | | | | Payroll-TotalItem 3071757 | | | 1..n 3071758 | 1..n 3071759 | 1..n 3071760 | | Payroll-TotalItem 3071761 |
| | | | | | | | | Action-Code 3071762 | | | | | | |
| | | | | | | | | Amount 3071763 | | 1 3071764 | 1 3071765 | 1 3071766 | | Amount 3071767 |
| | | | | | | | | | Currency Code 3071768 | 1 3071769 | 1 3071770 | 1 3071771 | | Currency Code 3071772 |
| | | | | | | | | Payrol-lExpen-seGroup Code 3071773 | | 1 3071774 | 1 3071775 | 1 3071776 | | Payrol-lExpen-seGroup Code 3071777 |
| | | | | | | | | MealRe-ceipt-Num-berValue 3071778 | | 0..1 3071779 | 0..1 3071780 | 0..1 3071781 | | Number-Value 3071782 |
| | | | | | | | | Note 3071783 | | 0..1 3071784 | 0..1 3071785 | 0..1 3071786 | | Note 3071787 |

FIG. 307-81

| Package | level1 | | level2 | level3 | level4 | level5 | level6 | level7 | level8 | Cardinality | Cardinality (Save) | Cardinality (Create& NoAction) | Cardinality (Delete) | Datatype Name |
|---|---|---|---|---|---|---|---|---|---|---|---|---|---|---|
| | | | | | | | | | Lan-guage-Code 3071788 | 1 3071789 | 1 3071790 | 1 3071791 | | Lan-guage-Code 3071792 |

| Package | Level 1 | Level 2 | Level 3 | Cardinality | Datatype Name |
|---|---|---|---|---|---|
| CataloguePublication ConfirmationMessage 309000 | CataloguePublication ConfirmationMessage 309002 | | | | CataloguePublication ConfirmationMessage 309004 |
| MessageHeader 309006 | | MessageHeader 309008 | | 1 309010 | BusinessDocumentMessageHeader 309012 |
| | | | ID 309014 | 1 309016 | BusinessDocumentMessageID 309018 |
| | | | CreationDateTime 309020 | 1 309022 | DateTime 309024 |
| | | | SenderParty 309026 | 0..1 309028 | BusinessDocumentMessageHeaderParty 309030 |
| TransmissionInformation 309032 | | TransmissionHeader 309034 | | 0..1 309036 | |
| | | | ID 309038 | 1 309040 | TransmissionID 309042 |

FIG. 309-2

| Package | Level 1 | Level 2 | Level 3 | Cardinality | Datatype Name |
|---|---|---|---|---|---|
| | | TransmissionLog 309044 | | 0..1 309046 | |
| | | | Item 309048 | 1..n 309050 | LogItem 309052 |
| Catalogue 309054 | | Catalogue 309056 | | 1 309058 | CataloguePublicationConfirmation 309060 |
| | | | ID 309062 | 1 309064 | CatalogueID 309066 |
| | | | PublicationCompleted Indicator 309068 | 1 309070 | BusinessTransactionCompletedIndicator 309072 |

FIG. 310-1

| Package | Level 1 | Level 2 | Level 3 | Level 4 | Cardinality | Datatype Name |
|---|---|---|---|---|---|---|
| CataloguePublicationTransmission CancellationConfirmationMessage 310000 | CataloguePublication-Transmission CancellationConfirmationMessage 310002 | | | | | CataloguePublication-Transmission CancellationConfirmation-Message 310004 |
| MessageHeader 310006 | | Message-Header 310008 | | | 1 310010 | BusinessDocumentMessageHeader 310012 |
| | | | ID 310014 | | 1 310016 | BusinessDocumentMessageID 310018 |
| | | | Creation-DateTime 310020 | | 1 310022 | DateTime 310024 |
| | | | Sender-Party 310026 | | 0..1 310028 | BusinessDocumentMessageHeaderParty 310030 |

FIG. 310-2

| Package | Level 1 | Level 2 | Level 3 | Level 4 | Cardinal-ity | Datatype Name |
|---|---|---|---|---|---|---|
| TransmissionInformation 310032 | | Transmis-sionLog 310034 | | | 0..1 310036 | |
| | | | Item 310038 | | 1..n 310040 | LogItem 310042 |
| CataloguePublicationTransmission 310044 | | Cata-loguePubli-cation Transmis-sion 310046 | | | 1 310048 | CataloguePublication-Transmisseion CancellationConfirmation 310050 |
| | | | ID 310052 | | 1 310054 | TransmissionID 310056 |
| | | | Cancella-tionCom-pleted Indicator 310058 | | 1 310060 | BusinessTransactionCom-pletedIndicator 310062 |
| Catalogue 310064 | | | Catalogue 310066 | | 1 310068 | |

FIG. 310-3

| Package | Level 1 | Level 2 | Level 3 | Level 4 | Cardinal-ity | Datatype Name |
|---|---|---|---|---|---|---|
| | | | | ID 310070 | 1 310072 | CatalogueID 310074 |

FIG. 311-1

| Package | Level 1 | Level 2 | Level 3 | Level 4 | Cardinality | Datatype Name |
|---|---|---|---|---|---|---|
| CataloguePublicationTransmission CancellationRequestMessage 311000 | CataloguePublicationTransmission CancellationRequestMessage 311002 | | | | | CataloguePublicationTransmission CancellationRequestMessage 311004 |
| MessageHeader 311006 | | MessageHeader 311008 | | | 1 311010 | BusinessDocumentMessageHeader 311012 |
| | | | ID 311014 | | 1 311016 | BusinessDocumentMessageID 311018 |
| | | | CreationDateTime 311020 | | 1 311022 | DateTime 311024 |
| | | | SenderParty 311026 | | 0..1 311028 | BusinessDocumentMessageHeaderParty 311030 |

FIG. 311-2

| Package | Level 1 | Level 2 | Level 3 | Level 4 | Cardinality | Datatype Name |
|---|---|---|---|---|---|---|
| TransmissionInformation 311032 | | TransmissionHeader 311034 | | | 0..1 311036 | BusinessDocument-TransmissionHeader 311038 |
| | | | MinimalRequested LogItem-Severity-Code 311040 | | 0..1 311042 | LogItemSeverityCode 311044 |
| CataloguePublicationTransmission 311046 | | CataloguePublication Transmission 311048 | | | 1 311050 | CataloguePublication-Transmission CancellationRequest 311052 |
| | | | ID 311054 | | 1 311056 | TransmissionID 311058 |
| Catalogue 311060 | | | Catalogue 311062 | | 1 311064 | |
| | | | | ID 311066 | 1 311068 | CatalogueID 311070 |

FIG. 312-1

| Package | | Level 1 | Level 2 | Level 3 | Cardinality | Datatype Name |
| --- | --- | --- | --- | --- | --- | --- |
| CataloguePublication TransmissionPackageMessage 312000 | | Cata-loguePublication Trans-mis-sionPackage-Mes-sage 312002 | | | | CataloguePublication TransmissionPackage-Message 312004 |
| | MessageHeader 312006 | | Message-Header 312008 | | 1 312010 | BusinessDocumentMes-sageHeader 312012 |
| | | | | ID 312014 | 1 312016 | BusinessDocumentMes-sageID 312018 |
| | | | | Creation-DateTime 312020 | 1 312022 | DateTime 312024 |
| | | | | SenderParty 312026 | 0..1 312028 | BusinessDocumentMes-sageHeaderParty 312030 |

FIG. 312-2

| Package | | | Level 1 | Level 2 | Level 3 | Cardinality | Datatype Name |
|---|---|---|---|---|---|---|---|
| | TransmissionInformation 312032 | | | TransmissionLog 312034 | | 0..1 312036 | |
| | | | | | Item 312038 | 1..n 312040 | LogItem 312042 |
| | CataloguePublication Transmission 312044 | | | CataloguePublication Transmission 312046 | | 1 312048 | CataloguePublicationTransmissionPackage 312050 |
| | | | | | ID 312052 | 1 312054 | TransmissionID 312056 |
| | | | | | Package OrdinalNumberValue 312058 | 1 312060 | OrdinalNumberValue 312062 |
| | | | | | PackageCompletedIndicator 312064 | 1 312066 | BusinessTransactionCompletedIndicator 312068 |

FIG. 313-1

| Package | level1 | level2 | level3 | level4 | level5 | level6 | level7 | level8 | level9 | level10 | level11 | Cardinality | Datatype Name |
|---|---|---|---|---|---|---|---|---|---|---|---|---|---|
| CatalogueUpdateMessage 313000 | CatalogueUpdate Message 313001 | | | | | | | | | | | | CatalogueUpdateMessage 313002 |
| MessageHeader 313003 | | Message Header 313004 | | | | | | | | | | 1 313005 | BusinessDocumentMessageHeader 313006 |
| | | | ID 313007 | | | | | | | | | 1 313008 | BusinessDocumentMessageID 313009 |
| | | | CreationDateTime 313010 | | | | | | | | | 1 313011 | DateTime 313012 |

FIG. 313-2

| Package | level1 | level2 | level3 | level4 | level5 | level6 | level7 | level8 | level9 | level10 | level11 | Cardinality | Datatype Name |
|---|---|---|---|---|---|---|---|---|---|---|---|---|---|
| | | | Sender-Party 313013 | | | | | | | | | 0..1 313014 | BusinessDocumentMessageHeaderParty 313015 |
| TransmissionInformation 313016 | | TransmissionHeader 313017 | | | | | | | | | | 0..1 313018 | BusinessDocumentTransmissionHeader 313019 |
| | | | ID 313020 | | | | | | | | | 1 313021 | TransmissionID 313022 |
| | | | PackageOrdinalNumberValue 313023 | | | | | | | | | 1 313024 | OrdinalNumberValue 313025 |

FIG. 313-3

| Package | level1 | level2 | level3 | level4 | level5 | level6 | level7 | level8 | level9 | level10 | level11 | Cardinality | Datatype Name |
|---|---|---|---|---|---|---|---|---|---|---|---|---|---|
| | | | Package Total-Number-Value 313026 | | | | | | | | | 0..1 313027 | Total-Number-Value 313028 |
| | | | Minimum-Requested LogItem-Severity-Code 313029 | | | | | | | | | 0..1 313030 | LogItem-Severity-Code 313031 |
| Catalogue 313032 | | Cata-logue 313033 | | | | | | | | | | 1 313034 | Transmis-sionCata-logue 313035 |
| | | | @actionCode 313036 | | | | | | | | | 0..1 313037 | Action-Code 313038 |
| | | | @languageCode 313039 | | | | | | | | | 0..1 313040 | Lan-guageCode 313041 |

FIG. 313-4

| Package | level1 | level2 | level3 | level4 | level5 | level6 | level7 | level8 | level9 | level10 | level11 | Cardinality | Datatype Name |
|---|---|---|---|---|---|---|---|---|---|---|---|---|---|
| | | | @currencyCode 313042 | | | | | | | | | 0..1 313043 | Currency-Code 313044 |
| | | | @unitCode 313045 | | | | | | | | | 0..1 313046 | Measure-UnitCode 313047 |
| | | | Com-pleteTransmissionIn-dicator 313048 | | | | | | | | | 0..1 313049 | Com-pleteTransmissionIn-dicator 313050 |
| | | | Provider-Property-Valua-tionList-Com-pleteTransmissionIn-dicator 313051 | | | | | | | | | 0..1 313052 | Com-pleteTransmissionIn-dicator 313053 |
| | | | ID 313054 | | | | | | | | | 1 313055 | Cata-logueID 313056 |

FIG. 313-5

| Package | level1 | level2 | level3 | level4 | level5 | level6 | level7 | level8 | level9 | level10 | level11 | Cardinality | Datatype Name |
|---|---|---|---|---|---|---|---|---|---|---|---|---|---|
| | | | VersionID 313057 | | | | | | | | | 0..1 313058 | VersionID 313059 |
| | | | Name 313060 | | | | | | | | | 0..n 313061 | Name 313062 |
| | | | TypeCode 313063 | | | | | | | | | 1 313064 | Catalogue TypeCode 313065 |
| | | | BaseWebAddress 313066 | | | | | | | | | 0..1 313067 | WebAddress 313068 |
| | | | ValidityPeriod 313069 | | | | | | | | | 0..1 313070 | DateTime Period 313071 |
| | | | | StartDateTime 313072 | | | | | | | | 0..1 313073 | DateTime 313074 |

FIG. 313-6

| Package | level1 | level2 | level3 | level4 | level5 | level6 | level7 | level8 | level9 | level10 | level11 | Cardinal-ity | Datatype Name |
|---|---|---|---|---|---|---|---|---|---|---|---|---|---|
| | | | | End-DateTime 313075 | | | | | | | | 0..1 313076 | DateTime 313077 |
| GlobalInfor-mation 313078 | | | Provider Property-Valuation 313079 | | | | | | | | | 0..n 313080 | Property-Valuation 313081 |
| | | | | @actionCo de 313082 | | | | | | | | 0..1 313083 | Action-Code 313084 |
| | | | | Proper-tyReference 313085 | | | | | | | | 1 313086 | Proper-tyRefer-ence 313087 |
| | | | | | ID 313088 | | | | | | | 1 313089 | PropertyID 313090 |
| | | | | ValueGroup 313091 | | | | | | | | 1..n 313092 | Property-ValueIt-erator 313093 |

FIG. 313-7

| Package | level1 | level2 | level3 | level4 | level5 | level6 | level7 | level8 | level9 | level10 | level11 | Cardinal-ity | Datatype Name |
|---|---|---|---|---|---|---|---|---|---|---|---|---|---|
| | | | | | ID 313094 | | | | | | | 0..1 313095 | Identifier 313096 |
| | | | | | ParentID 313097 | | | | | | | 0..1 313098 | Identifier 313099 |
| | | | | | Ordinal-Number-Value 313100 | | | | | | | 0..1 313101 | Ordinal-Number-Value 313102 |
| | | | | | Property-Value 313103 | | | | | | | 0..n 313104 | Property-Value 313105 |
| | | | | | | AmountS-pecification 313106 | | | | | | 0..1 313107 | |
| | | | | | | | Amount 313108 | | | | | 0..1 313109 | Amount 313110 |
| | | | | | | | LowerA-mount 313111 | | | | | 0..1 313112 | Amount 313113 |

FIG. 313-8

| Package | level1 | level2 | level3 | level4 | level5 | level6 | level7 | level8 | level9 | level10 | level11 | Cardinality | Datatype Name |
|---|---|---|---|---|---|---|---|---|---|---|---|---|---|
| | | | | | | | UpperAmount 313114 | | | | | 0..1 313115 | Amount 313116 |
| | | | | | | QuantitySpecification 313117 | | | | | | 0..1 313118 | |
| | | | | | | | Quantity 313119 | | | | | 0..1 313120 | Quantity 313121 |
| | | | | | | | LowerQuantity 313122 | | | | | 0..1 313123 | Quantity 313124 |
| | | | | | | | UpperQuantity 313125 | | | | | 0..1 313126 | Quantity 313127 |
| | | | | | | DecimalSpecification 313128 | | | | | | 0..1 313129 | |

FIG. 313-9

| Package | level1 | level2 | level3 | level4 | level5 | level6 | level7 | level8 | level9 | level10 | level11 | Cardinal-ity | Datatype Name |
|---|---|---|---|---|---|---|---|---|---|---|---|---|---|
| | | | | | | | Decimal-Value 313130 | | | | | 0..1 313131 | Decimal-Value 313132 |
| | | | | | | | Lower-Decimal-Value 313133 | | | | | 0..1 313134 | Decimal-Value 313135 |
| | | | | | | | Upper-Decimal-Value 313136 | | | | | 0..1 313137 | Decimal-Value 313138 |
| | | | | | | FloatSpeci-fication 313139 | | | | | | 0..1 313140 | |
| | | | | | | | FloatValue 313141 | | | | | 0..1 313142 | FloatValue 313143 |
| | | | | | | | Lower-FloatValue 313144 | | | | | 0..1 313145 | FloatValue 313146 |

FIG. 313-10

| Package | level1 | level2 | level3 | level4 | level5 | level6 | level7 | level8 | level9 | level10 | level11 | Cardinal-ity | Datatype Name |
|---|---|---|---|---|---|---|---|---|---|---|---|---|---|
| | | | | | | | Upper-FloatValue 313147 | | | | | 0..1 313148 | FloatValue 313149 |
| | | | | | | Integer-Specifica-tion 313150 | | | | | | 0..1 313151 | |
| | | | | | | | Integer-Value 313152 | | | | | 0..1 313153 | Integer-Value 313154 |
| | | | | | | | LowerInte-gerValue 313155 | | | | | 0..1 313156 | Integer-Value 313157 |
| | | | | | | | UpperInte-gerValue 313158 | | | | | 0..1 313159 | Integer-Value 313160 |
| | | | | | | DateTime-Specifica-tion 313161 | | | | | | 0..1 313162 | |

FIG. 313-11

| Package | level1 | level2 | level3 | level4 | level5 | level6 | level7 | level8 | level9 | level10 | level11 | Cardinal-ity | Datatype Name |
|---|---|---|---|---|---|---|---|---|---|---|---|---|---|
| | | | | | | | DateTime 313163 | | | | | 0..1 313164 | DateTime 313165 |
| | | | | | | | Start-DateTime 313166 | | | | | 0..1 313167 | DateTime 313168 |
| | | | | | | | End-DateTime 313169 | | | | | 0..1 313170 | DateTime 313171 |
| | | | | | | Name-Specifica-tion 313172 | | | | | | 0..1 313173 | |
| | | | | | | | Name 313174 | | | | | 0..1 313175 | Name 313176 |
| | | | | | | | | @language Code 313177 | | | | 0..1 313178 | Lan-guageCod e 313179 |

FIG. 313-12

| Package | level1 | level2 | level3 | level4 | level5 | level6 | level7 | level8 | level9 | level10 | level11 | Cardinal-ity | Datatype Name |
|---|---|---|---|---|---|---|---|---|---|---|---|---|---|
| | | | | | | Indicator-Specifica-tion 313180 | | | | | | 0..1 313181 | |
| | | | | | | | Indicator 313182 | | | | | 0..1 313183 | Indicator 313184 |
| Model 313185 | | | Model 313186 | | | | | | | | | 0..1 313187 | Cata-logueMod el 313188 |
| | | | | Property-DataType-List Com-pleteTrans-missionIn-dicator 313189 | | | | | | | | 0..1 313190 | Com-pleteTrans missionIn-dicator 313191 |
| | | | | PropertyList Com-pleteTrans-missionIn-dicator 313192 | | | | | | | | 0..1 313193 | Com-pleteTrans missionIn-dicator 313194 |

FIG. 313-13

| Package | level1 | level2 | level3 | level4 | level5 | level6 | level7 | level8 | level9 | level10 | level11 | Cardinality | Datatype Name |
|---|---|---|---|---|---|---|---|---|---|---|---|---|---|
| | | | | CatalogueSectionTypeList CompleteTransmissionIndicator 313195 | | | | | | | | 0..1 313196 | CompleteTransmissionIndicator 313197 |
| | | | | CatalogueSchemaList CompleteTransmissionIndicator 313198 | | | | | | | | 0..1 313199 | CompleteTransmissionIndicator 313200 |
| PropertyDefinitionClass 313201 | | | | PropertyDefinitionClass 313202 | | | | | | | | 0..n 313203 | PropertyDefinitionClass 313204 |
| | | | | | ID 313205 | | | | | | | 1 313206 | PropertyDefinitionClassID 313207 |

FIG. 313-14

| Package | level1 | level2 | level3 | level4 | level5 | level6 | level7 | level8 | level9 | level10 | level11 | Cardinality | Datatype Name |
|---|---|---|---|---|---|---|---|---|---|---|---|---|---|
| | | | | | Preferred-Name 313208 | | | | | | | 1 313209 | Name 313210 |
| | | | | | Defined-Property 313211 | | | | | | | 0..n 313212 | |
| | | | | | | Reference 313213 | | | | | | 1 313214 | Proper-tyRefer-ence 313215 |
| | | | | | | | ID 313216 | | | | | 1 313217 | PropertyID 313218 |
| | | | | | | Ordinal-Number-Value 313219 | | | | | | 0..1 313220 | Ordinal-Number-Value 313221 |
| Property-DataType 313222 | | | | Property-DataType 313223 | | | | | | | | 0..n 313224 | Property-DataType 313225 |

FIG. 313-15

| Package | level1 | level2 | level3 | level4 | level5 | level6 | level7 | level8 | level9 | level10 | level11 | Cardinal-ity | Datatype Name |
|---|---|---|---|---|---|---|---|---|---|---|---|---|---|
| | | | | | @actionCode 313226 | | | | | | | 0..1 313227 | Action-Code 313228 |
| | | | | | ID 313229 | | | | | | | 0..1 313230 | Property-DataTypeID 313231 |
| | | | | | Preferred-Name 313232 | | | | | | | 1..n 313233 | Name 313234 |
| | | | | | Format-Code 313235 | | | | | | | 1 313236 | Property-DataType Format-Code 313237 |
| | | | | | Maximum-TotalDigit-Number-Value 313238 | | | | | | | 0..1 313239 | DigitNum-berValue 313240 |

FIG. 313-16

| Package | level1 | level2 | level3 | level4 | level5 | level6 | level7 | level8 | level9 | level10 | level11 | Cardinality | Datatype Name |
|---|---|---|---|---|---|---|---|---|---|---|---|---|---|
| | | | | | FractionalDigitNumberValue 313241 | | | | | | | 0..1 313242 | DigitNumberValue 313243 |
| | | | | | PropertyDefinitionClassReference 313244 | | | | | | | 0..1 313245 | PropertyDefinitionClassReference 313246 |
| | | | | | | ID 313247 | | | | | | 1 313248 | PropertyDefinitionClassID 313249 |
| | | | | | AllowedPropertyValueElement 313250 | | | | | | | 0..n 313251 | |
| | | | | | | PropertyValue 313252 | | | | | | | |

FIG. 313-17

| Package | level1 | level2 | level3 | level4 | level5 | level6 | level7 | level8 | level9 | level10 | level11 | Cardinal-ity | Datatype Name |
|---|---|---|---|---|---|---|---|---|---|---|---|---|---|
| | | | | | | | AmountS-pecification 313253 | | | | | | |
| | | | | | | | Quanti-tySpecifi-cation 313254 | | | | | | |
| | | | | | | | Name-Specifica-tion 313255 | | | | | 1 313256 | Property-Value 313257 |
| Property 313258 | | | | Property 313259 | | | | | | | | 0..n 313260 | Property 313261 |
| | | | | | @actionCo de 313262 | | | | | | | 0..1 313263 | Action-Code 313264 |
| | | | | | ID 313265 | | | | | | | 1 313266 | PropertyID 313267 |

FIG. 313-18

| Package | level1 | level2 | level3 | level4 | level5 | level6 | level7 | level8 | level9 | level10 | level11 | Cardinal-ity | Datatype Name |
|---|---|---|---|---|---|---|---|---|---|---|---|---|---|
| | | | | | Definition-Class-Reference 313268 | | | | | | | 0..1 313269 | Property-Defini-tionClass-Reference 313270 |
| | | | | | | ID 313271 | | | | | | 1 313272 | Property-Defini-tionClas-sID 313273 |
| | | | | | Preferred-Name 313274 | | | | | | | 1..n 313275 | Name 313276 |
| | | | | | Property-DataTypeR eference 313277 | | | | | | | 1 313278 | Property-DataType Reference 313279 |
| | | | | | | ID 313280 | | | | | | 1 313281 | Property-DataTypeI D 313282 |

FIG. 313-19

| Package | level1 | level2 | level3 | level4 | level5 | level6 | level7 | level8 | level9 | level10 | level11 | Cardinality | Datatype Name |
|---|---|---|---|---|---|---|---|---|---|---|---|---|---|
| | | | | | UnitPropertyReference 313283 | | | | | | | 0..1 313284 | PropertyReference 313285 |
| | | | | | | ID 313286 | | | | | | 1 313287 | PropertyID 313288 |
| | | | | | AspectID 313289 | | | | | | | 0..n 313290 | AspectID 313291 |
| | | | | | Target InterfaceElementID 313292 | | | | | | | 0..n 313293 | InterfaceElementID 313294 |
| | | | | | MultipleValueIndicator 313295 | | | | | | | 0..1 313296 | PropertyMultipleValueIndicator 313297 |
| | | | | | TextSearchableIndicator 313298 | | | | | | | 0..1 313299 | TextSearchableIndicator 313300 |

FIG. 313-20

| Package | level1 | level2 | level3 | level4 | level5 | level6 | level7 | level8 | level9 | level10 | level11 | Cardinality | Datatype Name |
|---|---|---|---|---|---|---|---|---|---|---|---|---|---|
| | | | | | ParametricSearchable Indicator 313301 | | | | | | | 0..1 313302 | PropertyParametricSearchableIndicator 313303 |
| | | | | | ValuationRequiredIndicator 313304 | | | | | | | 0..1 313305 | PropertyValuationRequiredIndicator 313306 |
| | | | | | OrdinalNumberValue 313307 | | | | | | | 1 313308 | OrdinalNumberValue 313309 |
| CatalogueItem Property 313310 | | | | CatalogueItemProperty 313311 | | | | | | | | 0..n 313312 | CatalogueItem Property 313313 |
| | | | | | PropertyReference 313314 | | | | | | | 1 313315 | PropertyReference 313316 |

FIG. 313-21

| Package | level1 | level2 | level3 | level4 | level5 | level6 | level7 | level8 | level9 | level10 | level11 | Cardinality | Datatype Name |
|---|---|---|---|---|---|---|---|---|---|---|---|---|---|
| | | | | | | ID 313317 | | | | | | 1 313318 | PropertyID 313319 |
| | | | | | Ordinal-Number-Value 313320 | | | | | | | 1 313321 | Ordinal-Number-Value 313322 |
| Cata-logueSec-tionType 313323 | | | | Catalogue-Section-Type 313324 | | | | | | | | 0..n 313325 | Cata-logueSec-tionType 313326 |
| | | | | | @actionCode 313327 | | | | | | | 0..1 313328 | Action-Code 313329 |
| | | | | | ID 313330 | | | | | | | 1 313331 | Cata-logueSec-tionTypeID 313332 |
| | | | | | Name 313333 | | | | | | | 0..n 313334 | Name 313335 |

FIG. 313-22

| Package | level1 | level2 | level3 | level4 | level5 | level6 | level7 | level8 | level9 | level10 | level11 | Cardinal-ity | Datatype Name |
|---|---|---|---|---|---|---|---|---|---|---|---|---|---|
| | | | | | Section-Property 313336 | | | | | | | 0..n 313337 | Cata-logueSec-tionType-Section-Property 313338 |
| | | | | | | Proper-tyRefer-ence 313339 | | | | | | 1 313340 | Proper-tyRefer-ence 313341 |
| | | | | | | | ID 313342 | | | | | 1 313343 | PropertyID 313344 |
| | | | | | | Ordinal-Number-Value 313345 | | | | | | 1 313346 | Ordinal-Number-Value 313347 |
| Cata-logueSche ma 313348 | | | | Cata-logueSche ma 313349 | | | | | | | | 0..n 313350 | Cata-logueSche ma 313351 |

FIG. 313-23

| Package | level1 | level2 | level3 | level4 | level5 | level6 | level7 | level8 | level9 | level10 | level11 | Cardinality | Datatype Name |
|---|---|---|---|---|---|---|---|---|---|---|---|---|---|
| | | | | | @actionCode 313352 | | | | | | | 0..1 313353 | ActionCode 313354 |
| | | | | | CatalogueSectionList CompleteTransmissionIndicator 313355 | | | | | | | 0..1 313356 | CompleteTransmissionIndicator 313357 |
| | | | | | CatalogueSectionRelationshipList CompleteTransmissionIndicator 313358 | | | | | | | 0..1 313359 | CompleteTransmissionIndicator 313360 |
| | | | | | ID 313361 | | | | | | | 1 313362 | CatalogueSchemaID 313363 |

FIG. 313-24

| Package | level1 | level2 | level3 | level4 | level5 | level6 | level7 | level8 | level9 | level10 | level11 | Cardinality | Datatype Name |
|---|---|---|---|---|---|---|---|---|---|---|---|---|---|
| | | | | | TypeCode 313364 | | | | | | | 0..1 313365 | CatalogueSchemaTypeCode 313366 |
| | | | | | Name 313367 | | | | | | | 0..n 313368 | Name 313369 |
| | | | | | CatalogueItemProperty 313370 | | | | | | | 0..n 313371 | CatalogueSchemaCatalogueItem Property 313372 |
| | | | | | | PropertyReference 313373 | | | | | | 1 313374 | PropertyReference 313375 |
| | | | | | | | ID 313376 | | | | | 1 313377 | PropertyID 313378 |

FIG. 313-25

| Package | level1 | level2 | level3 | level4 | level5 | level6 | level7 | level8 | level9 | level10 | level11 | Cardinality | Datatype Name |
|---|---|---|---|---|---|---|---|---|---|---|---|---|---|
| | | | | | | Ordinal-Number-Value 313379 | | | | | | 1 313380 | Ordinal-Number-Value 313381 |
| | | | | | Catalogue-Section 313382 | | | | | | | 0..n 313383 | Cata-logueSec-tion 313384 |
| | | | | | | @actionCode 313385 | | | | | | 0..1 313386 | Action-Code 313387 |
| | | | | | | Property-Valua-tionList Com-pleteTrans-missionIn-dicator 313388 | | | | | | 0..1 313389 | Com-pleteTrans missionIn-dicator 313390 |
| | | | | | | ID 313391 | | | | | | 1 313392 | Cata-logueSec-tionID 313393 |

FIG. 313-26

| Package | level1 | level2 | level3 | level4 | level5 | level6 | level7 | level8 | level9 | level10 | level11 | Cardinality | Datatype Name |
|---|---|---|---|---|---|---|---|---|---|---|---|---|---|
| | | | | | | TypeID 313394 | | | | | | 0..1 313395 | CatalogueSectionTypeID 313396 |
| | | | | | | Name 313397 | | | | | | 0..n 313398 | Name 313399 |
| | | | | | | IndexLetterText 313400 | | | | | | 0..n 313401 | IndexLetterText 313402 |
| | | | | | | PropertyValuation 313403 | | | | | | 0..n 313404 | PropertyValuation 313405 |
| | | | | | | | @actionCode 313406 | | | | | 0..1 313407 | ActionCode 313408 |
| | | | | | | | PropertyReference 313409 | | | | | 1 313410 | PropertyReference 313411 |

FIG. 313-27

| Package | level1 | level2 | level3 | level4 | level5 | level6 | level7 | level8 | level9 | level10 | level11 | Cardinal-ity | Datatype Name |
|---|---|---|---|---|---|---|---|---|---|---|---|---|---|
| | | | | | | | | ID 313412 | | | | 1 313413 | PropertyID 313414 |
| | | | | | | | Value-Group 313415 | | | | | 1..n 313416 | Property-ValueIt-erator 313417 |
| | | | | | | | | ID 313418 | | | | 0..1 313419 | Identifier 313420 |
| | | | | | | | | ParentID 313421 | | | | 0..1 313422 | Identifier 313423 |
| | | | | | | | | Ordinal-Number-Value 313424 | | | | 0..1 313425 | Ordinal-Number-Value 313426 |
| | | | | | | | | Property-Value 313427 | | | | 0..n 313428 | Property-Value 313429 |

FIG. 313-28

| Package | level1 | level2 | level3 | level4 | level5 | level6 | level7 | level8 | level9 | level10 | level11 | Cardinal-ity | Datatype Name |
|---|---|---|---|---|---|---|---|---|---|---|---|---|---|
| | | | | | | | | | AmountS-pecifica-tion 313430 | | | 0..1 313431 | |
| | | | | | | | | | | Amount 313432 | | 0..1 313433 | Amount 313434 |
| | | | | | | | | | | LowerA-mount 313435 | | 0..1 313436 | Amount 313437 |
| | | | | | | | | | | UpperA-mount 313438 | | 0..1 313439 | Amount 313440 |
| | | | | | | | | | Quanti-tySpecifi-cation 313441 | | | 0..1 313442 | |
| | | | | | | | | | | Quantity 313443 | | 0..1 313444 | Quantity 313445 |

FIG. 313-29

| Package | level1 | level2 | level3 | level4 | level5 | level6 | level7 | level8 | level9 | level10 | level11 | Cardinal-ity | Datatype Name |
|---|---|---|---|---|---|---|---|---|---|---|---|---|---|
| | | | | | | | | | | Lower-Quantity 313446 | | 0..1 313447 | Quantity 313448 |
| | | | | | | | | | | Upper-Quantity 313449 | | 0..1 313450 | Quantity 313451 |
| | | | | | | | | | Decimal-Specifica-tion 313452 | | | 0..1 313453 | |
| | | | | | | | | | | Decimal-Value 313454 | | 0..1 313455 | Decimal-Value 313456 |
| | | | | | | | | | | Lower-Decimal-Value 313457 | | 0..1 313458 | Decimal-Value 313459 |
| | | | | | | | | | | Upper-Decimal-Value 313460 | | 0..1 313461 | Decimal-Value 313462 |

FIG. 313-30

| Package | level1 | level2 | level3 | level4 | level5 | level6 | level7 | level8 | level9 | level10 | level11 | Cardinal-ity | Datatype Name |
|---|---|---|---|---|---|---|---|---|---|---|---|---|---|
| | | | | | | | | | FloatS-pecifica-tion 313463 | | | 0..1 313464 | |
| | | | | | | | | | | FloatValue 313465 | | 0..1 313466 | FloatValue 313467 |
| | | | | | | | | | | Lower-FloatValue 313468 | | 0..1 313469 | FloatValue 313470 |
| | | | | | | | | | | Upper-FloatValue 313471 | | 0..1 313472 | FloatValue 313473 |
| | | | | | | | | | Integer-Specifica-tion 313474 | | | 0..1 313475 | |
| | | | | | | | | | | Integer-Value 313476 | | 0..1 313477 | Integer-Value 313478 |

FIG. 313-31

| Package | level1 | level2 | level3 | level4 | level5 | level6 | level7 | level8 | level9 | level10 | level11 | Cardinal-ity | Datatype Name |
|---|---|---|---|---|---|---|---|---|---|---|---|---|---|
| | | | | | | | | | | LowerIn-tegerValue 313479 | | 0..1 313480 | Integer-Value 313481 |
| | | | | | | | | | | UpperIn-tegerValue 313482 | | 0..1 313483 | Integer-Value 313484 |
| | | | | | | | | | DateTime Specifica-tion 313485 | | | 0..1 313486 | |
| | | | | | | | | | | DateTime 313487 | | 0..1 313488 | DateTime 313489 |
| | | | | | | | | | | Start-DateTime 313490 | | 0..1 313491 | DateTime 313492 |
| | | | | | | | | | | End-DateTime 313493 | | 0..1 313494 | DateTime 313495 |

FIG. 313-32

| Package | level1 | level2 | level3 | level4 | level5 | level6 | level7 | level8 | level9 | level10 | level11 | Cardinality | Datatype Name |
|---|---|---|---|---|---|---|---|---|---|---|---|---|---|
| | | | | | | | | | Name-Specification 313496 | | | 0..1 313497 | |
| | | | | | | | | | | Name 313498 | | 0..1 313499 | Name 313500 |
| | | | | | | | | | | | @languageCode 313501 | 0..1 313502 | LanguageCode 313503 |
| | | | | | | | | | IndicatorSpecification 313504 | | | 0..1 313505 | |
| | | | | | | | | | | Indicator 313506 | | 0..1 313507 | Indicator 313508 |
| | | | | | | CatalogueItem-Property 313509 | | | | | | 0..n 313510 | CatalogueSectionCatalogueItem Property 313511 |

FIG. 313-33

| Package | level1 | level2 | level3 | level4 | level5 | level6 | level7 | level8 | level9 | level10 | level11 | Cardinality | Datatype Name |
|---|---|---|---|---|---|---|---|---|---|---|---|---|---|
| | | | | | | | PropertyReference 313512 | | | | | 1 313513 | PropertyReference 313514 |
| | | | | | | | | ID 313515 | | | | 1 313516 | PropertyID 313517 |
| | | | | | | | OrdinalNumberValue 313518 | | | | | 1 313519 | OrdinalNumberValue 313520 |
| | | | | | CatalogueSectionRelationship 313521 | | | | | | | 0..n 313522 | CatalogueSectionRelationship 313523 |
| | | | | | | @actionCode 313524 | | | | | | 0..1 313525 | ActionCode 313526 |

FIG. 313-34

| Package | level1 | level2 | level3 | level4 | level5 | level6 | level7 | level8 | level9 | level10 | level11 | Cardinality | Datatype Name |
|---|---|---|---|---|---|---|---|---|---|---|---|---|---|
| | | | | | | Source-CatalogueSectionID 313527 | | | | | | 1 313528 | CatalogueSectionID 313529 |
| | | | | | | TargetCatalogueSectionID 313530 | | | | | | 1 313531 | CatalogueSectionID 313532 |
| Content 313533 | | | Content 313534 | | | | | | | | | 0..1 313535 | CatalogueContent 313536 |
| | | | | CatalogueItemList CompleteTransmissionIndicator 313537 | | | | | | | | 0..1 313538 | CompleteTransmissionIndicator 313539 |

FIG. 313-35

| Package | level1 | level2 | level3 | level4 | level5 | level6 | level7 | level8 | level9 | level10 | level11 | Cardinality | Datatype Name |
|---|---|---|---|---|---|---|---|---|---|---|---|---|---|
| | | | | CatalogueItem-RelationshipList CompleteTransmissionIndicator 313540 | | | | | | | | 0..1 313541 | CompleteTransmissionIndicator 313542 |
| | | | | CatalogueViewList CompleteTransmissionIndicator 313543 | | | | | | | | 0..1 313544 | CompleteTransmissionIndicator 313545 |
| | | | | CatalogueSchemaID 313546 | | | | | | | | 0..1 313547 | CatalogueSchemaID 313548 |
| CatalogueItem 313549 | | | | CatalogueItem 313550 | | | | | | | | 0..n 313551 | CatalogueItem 313552 |

FIG. 313-36

| Package | level1 | level2 | level3 | level4 | level5 | level6 | level7 | level8 | level9 | level10 | level11 | Cardinality | Datatype Name |
|---|---|---|---|---|---|---|---|---|---|---|---|---|---|
| | | | | | @actionCode 313553 | | | | | | | 0..1 313554 | Action-Code 313555 |
| | | | | | DescriptionListCompleteTransmissionIndicator 313556 | | | | | | | 0..1 313557 | CompleteTransmissionIndicator 313558 |
| | | | | | ClassificationListCompleteTransmissionIndicator 313559 | | | | | | | 0..1 313560 | CompleteTransmissionIndicator 313561 |
| | | | | | PropertyValuationList CompleteTransmissionIndicator 313562 | | | | | | | 0..1 313563 | CompleteTransmissionIndicator 313564 |

FIG. 313-37

| Package | level1 | level2 | level3 | level4 | level5 | level6 | level7 | level8 | level9 | level10 | level11 | Cardinality | Datatype Name |
|---|---|---|---|---|---|---|---|---|---|---|---|---|---|
| | | | | | ID 313565 | | | | | | | 1 313566 | CatalogueItemID 313567 |
| | | | | | Description 313568 | | | | | | | 0..n 313569 | Description 313570 |
| | | | | | Classification 313571 | | | | | | | 0..n 313572 | CatalogueItemClassification 313573 |
| | | | | | | CatalogueSchemaID 313574 | | | | | | 0..1 313575 | CatalogueSchemaID 313576 |
| | | | | | | CatalogueSectionID 313577 | | | | | | 1 313578 | CatalogueSectionID 313579 |

FIG. 313-38

| Package | level1 | level2 | level3 | level4 | level5 | level6 | level7 | level8 | level9 | level10 | level11 | Cardinality | Datatype Name |
|---|---|---|---|---|---|---|---|---|---|---|---|---|---|
| | | | | | Property-Valuation 313580 | | | | | | | 0..n 313581 | Property-Valuation 313582 |
| | | | | | | @actionCode 313583 | | | | | | 0..1 313584 | Action-Code 313585 |
| | | | | | | Proper-tyRefer-ence 313586 | | | | | | 1 313587 | Proper-tyRefer-ence 313588 |
| | | | | | | | ID 313589 | | | | | 1 313590 | PropertyID 313591 |
| | | | | | | Value-Group 313592 | | | | | | 1..n 313593 | Property-ValueIt-erator 313594 |
| | | | | | | | ID 313595 | | | | | 0..1 313596 | Identifier 313597 |

FIG. 313-39

| Package | level1 | level2 | level3 | level4 | level5 | level6 | level7 | level8 | level9 | level10 | level11 | Cardinality | Datatype Name |
|---|---|---|---|---|---|---|---|---|---|---|---|---|---|
| | | | | | | | ParentID 313598 | | | | | 0..1 313599 | Identifier 313600 |
| | | | | | | | Ordinal-Number-Value 313601 | | | | | 0..1 313602 | Ordinal-Number-Value 313603 |
| | | | | | | | Property-Value 313604 | | | | | 0..n 313605 | Property-Value 313606 |
| | | | | | | | | AmountS-pecification 313607 | | | | 0..1 313608 | |
| | | | | | | | | | Amount 313609 | | | 0..1 313610 | Amount 313611 |
| | | | | | | | | | LowerA-mount 313612 | | | 0..1 313613 | Amount 313614 |

FIG. 313-40

| Package | level1 | level2 | level3 | level4 | level5 | level6 | level7 | level8 | level9 | level10 | level11 | Cardinal-ity | Datatype Name |
|---|---|---|---|---|---|---|---|---|---|---|---|---|---|
| | | | | | | | | | UpperA-mount 313615 | | | 0..1 313616 | Amount 313617 |
| | | | | | | | | Quanti-tySpecifica-tion 313618 | | | | 0..1 313619 | |
| | | | | | | | | | Quantity 313620 | | | 0..1 313621 | Quantity 313622 |
| | | | | | | | | | Lower-Quantity 313623 | | | 0..1 313624 | Quantity 313625 |
| | | | | | | | | | Upper-Quantity 313626 | | | 0..1 313627 | Quantity 313628 |
| | | | | | | | | Decimal-Specifica-tion 313629 | | | | 0..1 313630 | |

FIG. 313-41

| Package | level1 | level2 | level3 | level4 | level5 | level6 | level7 | level8 | level9 | level10 | level11 | Cardinal-ity | Datatype Name |
|---|---|---|---|---|---|---|---|---|---|---|---|---|---|
| | | | | | | | | | Decimal-Value 313631 | | | 0..1 313632 | Decimal-Value 313633 |
| | | | | | | | | | Lower-Decimal-Value 313634 | | | 0..1 313635 | Decimal-Value 313636 |
| | | | | | | | | | Upper-Decimal-Value 313637 | | | 0..1 313638 | Decimal-Value 313639 |
| | | | | | | | | FloatSpeci-fication 313640 | | | | 0..1 313641 | |
| | | | | | | | | | Float-Value 313642 | | | 0..1 313643 | FloatValue 313644 |
| | | | | | | | | | Lower-Float-Value 313645 | | | 0..1 313646 | FloatValue 313647 |

FIG. 313-42

| Package | level1 | level2 | level3 | level4 | level5 | level6 | level7 | level8 | level9 | level10 | level11 | Cardinal-ity | Datatype Name |
|---|---|---|---|---|---|---|---|---|---|---|---|---|---|
| | | | | | | | | | Upper-Float-Value 313648 | | | 0..1 313649 | FloatValue 313650 |
| | | | | | | | | Integer-Specifica-tion 313651 | | | | 0..1 313652 | |
| | | | | | | | | | Integer-Value 313653 | | | 0..1 313654 | Integer-Value 313655 |
| | | | | | | | | | LowerIn-teger-Value 313656 | | | 0..1 313657 | Integer-Value 313658 |
| | | | | | | | | | UpperIn-teger-Value 313659 | | | 0..1 313660 | Integer-Value 313661 |

FIG. 313-43

| Package | level1 | level2 | level3 | level4 | level5 | level6 | level7 | level8 | level9 | level10 | level11 | Cardinal-ity | Datatype Name |
|---|---|---|---|---|---|---|---|---|---|---|---|---|---|
| | | | | | | | | DateTime-Specifica-tion 313662 | | | | 0..1 313663 | |
| | | | | | | | | | DateTime 313664 | | | 0..1 313665 | DateTime 313666 |
| | | | | | | | | | Start-DateTime 313667 | | | 0..1 313668 | DateTime 313669 |
| | | | | | | | | | End-DateTime 313670 | | | 0..1 313671 | DateTime 313672 |
| | | | | | | | | Name-Specifica-tion 313673 | | | | 0..1 313674 | |
| | | | | | | | | | Name 313675 | | | 0..1 313676 | Name 313677 |

FIG. 313-44

| Package | level1 | level2 | level3 | level4 | level5 | level6 | level7 | level8 | level9 | level10 | level11 | Cardinal-ity | Datatype Name |
|---|---|---|---|---|---|---|---|---|---|---|---|---|---|
| | | | | | | | | Indicator-Specifica-tion 313678 | | | | 0..1 313679 | |
| | | | | | | | | | Indicator 313680 | | | 0..1 313681 | Indicator 313682 |
| | | | | Cata-logueItem-Relation-ship 313683 | | | | | | | | 0..n 313684 | Cata-logueItem Relation-ship 313685 |
| | | | | | @actionCo de 313686 | | | | | | | 0..1 313687 | Action-Code 313688 |
| | | | | | SourceCata logueItemI D 313689 | | | | | | | 1 313690 | Cata-logueItemI D 313691 |

FIG. 313-45

| Package | level1 | level2 | level3 | level4 | level5 | level6 | level7 | level8 | level9 | level10 | level11 | Cardinality | Datatype Name |
|---|---|---|---|---|---|---|---|---|---|---|---|---|---|
| | | | | | TargetCatalogueItemID 313692 | | | | | | | 1 313693 | CatalogueItemID 313694 |
| | | | | | TypeCode 313695 | | | | | | | 1 313696 | CatalogueItemRelationshipTypeCode 313697 |
| CatalogueView 313698 | | | | CatalogueView 313699 | | | | | | | | 0..n 313700 | CatalogueView 313701 |
| | | | | | @actionCode 313702 | | | | | | | 0..1 313703 | ActionCode 313704 |
| | | | | | @itemListCompleteTransmissionIndicator 313705 | | | | | | | 0..1 313706 | CompleteTransmissionIndicator 313707 |

FIG. 313-46

| Package | level1 | level2 | level3 | level4 | level5 | level6 | level7 | level8 | level9 | level10 | level11 | Cardinal-ity | Datatype Name |
|---|---|---|---|---|---|---|---|---|---|---|---|---|---|
| | | | | | @itemRelationship-TypeList Com-pleteTrans-missionIn-dicator 313708 | | | | | | | 0..1 313709 | Com-pleteTrans missionIn-dicator 313710 |
| | | | | | @excluded Proper-tyList Com-pleteTrans-missionIn-dicator 313711 | | | | | | | 0..1 313712 | Com-pleteTrans missionIn-dicator 313713 |
| | | | | | ID 313714 | | | | | | | 1 313715 | Cata-logueView ID 313716 |
| | | | | | Name 313717 | | | | | | | 0..n 313718 | Name 313719 |

FIG. 313-47

| Package | level1 | level2 | level3 | level4 | level5 | level6 | level7 | level8 | level9 | level10 | level11 | Cardinal-ity | Datatype Name |
|---|---|---|---|---|---|---|---|---|---|---|---|---|---|
| | | | | | Schema 313720 | | | | | | | 0..n 313721 | Cata-logueView Schema 313722 |
| | | | | | | @sectionList Com-pleteTrans-missionIn-dicator 313723 | | | | | | 0..1 313724 | Com-pleteTrans missionIn-dicator 313725 |
| | | | | | | Cata-logueSche-maID 313726 | | | | | | 1 313727 | Cata-logueSche maID 313728 |
| | | | | | | Section 313729 | | | | | | 0..n 313730 | Cata-logueView Sche-maSection 313731 |
| | | | | | | | @actionCode 313732 | | | | | 0..1 313733 | Action-Code 313734 |

FIG. 313-48

| Package | level1 | level2 | level3 | level4 | level5 | level6 | level7 | level8 | level9 | level10 | level11 | Cardinality | Datatype Name |
|---|---|---|---|---|---|---|---|---|---|---|---|---|---|
| | | | | | | | CatalogueSectionID 313735 | | | | | 1 313736 | CatalogueSectionID 313737 |
| | | | | | Item 313738 | | | | | | | 0..n 313739 | CatalogueViewItem 313740 |
| | | | | | | @actionCode 313741 | | | | | | 0..1 313742 | ActionCode 313743 |
| | | | | | | CatalogueItemID 313744 | | | | | | 1 313745 | CatalogueItemID 313746 |
| | | | | | ItemRelationshipType 313747 | | | | | | | 0..n 313748 | CatalogueViewItemRelationshipType 313749 |

FIG. 313-49

| Package | level1 | level2 | level3 | level4 | level5 | level6 | level7 | level8 | level9 | level10 | level11 | Cardinality | Datatype Name |
|---|---|---|---|---|---|---|---|---|---|---|---|---|---|
| | | | | | | @actionCode 313750 | | | | | | 0..1 313751 | ActionCode 313752 |
| | | | | | | CatalogueItemRelationshipTypeCode 313753 | | | | | | 1 313754 | ObjectStructureRelationshipTypeCode 313755 |
| | | | | | ExcludedProperty 313756 | | | | | | | 0..n 313757 | CatalogueViewExcludedProperty 313758 |
| | | | | | | @actionCode 313759 | | | | | | 0..1 313760 | ActionCode 313761 |
| | | | | | | PropertyReference 313762 | | | | | | 1 313763 | PropertyReference 313764 |

FIG. 313-50

| Package | level1 | level2 | level3 | level4 | level5 | level6 | level7 | level8 | level9 | level10 | level11 | Cardinal-ity | Datatype Name |
|---|---|---|---|---|---|---|---|---|---|---|---|---|---|
| | | | | | | | ID 313765 | | | | | 1 313766 | PropertyID 313767 |

CONSISTENT SET OF INTERFACES DERIVED FROM A BUSINESS OBJECT MODEL

RELATED APPLICATION

This application claims the benefit of U.S. Provisional Application No. 60/800,352 filed May 13, 2006 and of U.S. Provisional Application No. 60/837,196 filed Aug. 11, 2006, and fully incorporating the contents therein.

COPYRIGHT NOTICE

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever.

TECHNICAL FIELD

The subject matter described herein relates generally to the generation and use of consistent interfaces (or services) derived from a business object model. More particularly, the present disclosure relates to the generation and use of consistent interfaces or services that are suitable for use across industries, across businesses, and across different departments within a business.

BACKGROUND

Transactions are common among businesses and between business departments within a particular business. During any given transaction, these business entities exchange information. For example, during a sales transaction, numerous business entities may be involved, such as a sales entity that sells merchandise to a customer, a financial institution that handles the financial transaction, and a warehouse that sends the merchandise to the customer. The end-to-end business transaction may require a significant amount of information to be exchanged between the various business entities involved. For example, the customer may send a request for the merchandise as well as some form of payment authorization for the merchandise to the sales entity, and the sales entity may send the financial institution a request for a transfer of funds from the customer's account to the sales entity's account.

Exchanging information between different business entities is not a simple task. This is particularly true because the information used by different business entities is usually tightly tied to the business entity itself. Each business entity may have its own program for handling its part of the transaction. These programs differ from each other because they typically are created for different purposes and because each business entity may use semantics that differ from the other business entities. For example, one program may relate to accounting, another program may relate to manufacturing, and a third program may relate to inventory control. Similarly, one program may identify merchandise using the name of the product while another program may identify the same merchandise using its model number. Further, one business entity may use U.S. dollars to represent its currency while another business entity may use Japanese Yen. A simple difference in formatting, e.g., the use of upper-case lettering rather than lower-case or title-case, makes the exchange of information between businesses a difficult task. Unless the individual businesses agree upon particular semantics, human interaction typically is required to facilitate transactions between these businesses. Because these "heterogeneous" programs are used by different companies or by different business areas within a given company, a need exists for a consistent way to exchange information and perform a business transaction between the different business entities.

Currently, many standards exist that offer a variety of interfaces used to exchange business information. Most of these interfaces, however, apply to only one specific industry and are not consistent between the different standards. Moreover, a number of these interfaces are not consistent within an individual standard.

SUMMARY

Methods and systems consistent with the subject matter described herein facilitate e-commerce by providing consistent interfaces that can be used during a business transaction. Such business entities may include different companies within different industries. For example, one company may be in the chemical industry, while another company may be in the automotive industry. The business entities also may include different businesses within a given industry, or they may include different departments within a given company.

The interfaces are consistent across different industries and across different business units because they are generated using a single business object model. The business object model defines the business-related concepts at a central location for a number of business transactions. In other words, the business object model reflects the decisions made about modeling the business entities of the real world acting in business transactions across industries and business areas. The business object model is defined by the business objects and their relationships to each other (overall net structure).

A business object is a capsule with an internal hierarchical structure, behavior offered by its operations, and integrity constraints. Business objects are semantically disjointed, i.e., the same business information is represented once. The business object model contains all of the elements in the messages, user interfaces and engines for these business transactions. Each message represents a business document with structured information. The user interfaces represent the information that the users deal with, such as analytics, reporting, maintaining or controlling. The engines provide services concerning a specific topic, such as pricing or tax. Semantically related business objects may be grouped into process components that realize a certain business process. The process component exposes its functionality via enterprise services. Process components are part of the business process platform. Defined groups of process components can be deployed individually, where each of these groups is often termed a deployment unit.

Methods and systems consistent with the subject matter described herein generate interfaces from the business object model by assembling the elements that are required for a given transaction in a corresponding hierarchical manner. Because each interface is derived from the business object model, the interface is consistent with the business object model and with the other interfaces that are derived from the business object model. Moreover, the consistency of the interfaces is also maintained at all hierarchical levels. By using consistent interfaces, each business entity can easily exchange information with another business entity without the need for human interaction, thus facilitating business transactions.

Example methods and systems described herein provide an object model and, as such, derive two or more interfaces that are consistent from this object model. Further, the subject matter described herein can provide a consistent set of interfaces that are suitable for use with more than one industry. This consistency is reflected at a structural level as well as through the semantic meaning of the elements in the interfaces. Additionally, the techniques and components described herein provide a consistent set of interfaces suitable for use with different businesses. Methods and systems consistent with the subject matter described herein provide a consistent set of interfaces suitable for use with a business scenario that spans across the components within a company. These components, or business entities, may be heterogeneous.

For example, a user or a business application of any number of modules, including one may execute or otherwise implement methods that utilize consistent interfaces that, for example, query business objects, respond to the query, create/change/delete/cancel business objects, and/or confirm the particular processing, often across applications, systems, businesses, or even industries. The foregoing example computer implementable methods—as well as other disclosed processes—may also be executed or implemented by or within software. Moreover, some or all of these aspects may be further included in respective systems or other devices for identifying and utilizing consistence interfaces. For example, one system implementing consistent interfaces derived from a business object model may include memory storing a plurality of global data types and at least a subset of various deployment units. In one instance, the deployment units may include Catalogue Authoring, Customer Invoicing, Customer Relationship Management, Due Item Management, Financial Accounting, Foundation, Human Capital Management, Payment, Payroll, Production and Site Logistics Execution, Project Management, Purchasing, Requisitioning, RFQ Processing, Supplier Invoicing, Supply Chain Control, as well as others.

Each of these deployment units include one or more business objects. For example, deployment unit Catalogue Authoring includes ProductCatalogueChangeList derived from CatalogueChangeList Template and ProductCatalogue derived from Catalogue Template.

Customer Invoicing includes the CustomerInvoiceRequest business object. Deployment unit Customer Relationship Management includes the following business objects: CustomerTransactionDocument_Template, and Opportunity. Deployment unit Due Item Management includes the following business objects: DueClearing, DuePayment, Dunning, TaxReceivablesPayablesRegister, TradeReceivablesPayablesAccount, TradeReceivablesPayablesAccountStatement, and TradeReceivablesPayablesRegister. Deployment unit Financial Accounting includes the following business objects: AccountingClearingObjectHistory, AccountingDocument, AccountingDocumentReport, AccountingEntry, AccountingNotification, AccountsReceivablePayableLedgerAccount, BalanceSheetAndIncomeStatementReport, CashLedgerAccount, FixedAsset, GeneralLedgerAccount, MaterialLedgerAccount, MaterialValuationData, OtherDirectCostLedgerAccount, OverheadCostLedgerAccount, OverheadCostScheme, ProductionLedgerAccount, PurchaseLedgerAccount, ResourceValuationData, SalesLedgerAccount, ServiceProductValuationData, and TaxLedgerAccount.

The Foundation includes the following business objects: AccessControlList, AccessGroup, AccountingCodingBlockDistribution, Activity_Template, Address_Template, AttachmentFolder, BankDirectoryEntry, BusinessPartner_Template, CashDiscountTerms, ChangeDocument, CompanyTaxArrangement, CompensationComponentType, ControlledOutputRequest, CrossProductCatalogueSearch, Document, Employment, EngineeringChangeOrder, ExchangeRate, FinancialAuditTrailDocumentation, IdentifiedStock, Identity, InstallationPoint, InstalledBase, Job, Location, LogisticsArea, LogisticsShift, Logisticunit, MarketSegment, OperatingHours, OrganisationalCentre_Template, Party, PaymentAgreement, PaymentControl, PaymentExplanation, Position, PriceAndTaxCalculation_Template, ProcurementArrangement, ProductCategoryHierarchy, ProductionSegment, ReleasedExecutionProductionModel, ReleasedPlanningProductionModel, ReleasedSiteLogisticsProcessModel, Resource_Template, ResourceOperatingTimeTemplate, Responsibility, SalesArrangement, SalesPriceList, SalesPriceSpecification, ServiceIssueCategoryCatalogue, SiteLogisticsProcessModel, SiteLogisticsProcessSegment, SourceOfSupply, SourcingList, StorageBehaviourMethod, StorageControl, SupplyPlanningArea, SupplyQuotaArrangement, TextCollection, TransportationLane, and WorkAgreement.

Deployment unit Human Capital Management includes the following business objects: CN_EmployeeTaxArrangement, CompensationStructure, DE_EmployeeTaxArrangement, EmployeeCompensationAgreement, EmployeeTime, EmployeeTimeAccount, EmployeeTimeAgreement, EmployeeTimeConfirmationViewOfProject, EmployeeTimeConfirmationViewOfServiceTransactionDocument, EmployeeTimeRecordingView, EmployeeTimeValuation, FR_EmployeeSocialInsuranceArrangement, GB_EmployeeSocialInsuranceArrangement, IT_EmployeeSocialInsuranceArrangement, and WorkingTimeModel.

Deployment unit Payment includes the following business objects: BankPaymentOrder, CashTransfer, ChequeStorage, CompanyPaymentFileRegister, ExpectedLiquidityItem, HouseBankStatement, LiquidityForecast, PaymentAdvice, PaymentAllocation, and PaymentOrder.

Deployment unit Payroll includes US_Employee Payroll Input and Payroll Process.

Deployment unit Production and Site Logistics Execution includes the following business objects: Inventory, LogisticsTaskFolder, PhysicalInventoryCount, ProductionRequest, and SiteLogisticsRequest. Deployment unit Project Management includes Project_Template and ProjectPurchaseRequest.

Deployment unit Purchasing includes the following business objects: PurchaseOrder, PurchaseOrderConfirmation, and PurchaseRequest. Deployment unit Requisitioning includes the InternalRequest business object. Deployment unit RFQ Processing includes the following business objects: RequestForQuote, RFQRequest, and SupplierQuote.

Deployment unit Supplier Invoicing includes the SupplierInvoice and SupplierInvoiceVerificationException business objects. Deployment unit Supply Chain Control includes the following business objects: DemandForecast, LogisticsExecutionRequisition, PlannedIndependentRequirement, PlanningViewOfPurchaseOrder, ProductionRequisition, SiteLogisticsRequisition, and SupplyPlanningRequirement.

Turning to these example business objects delineated above, Customer Invoice Request is a request to create one or several customer invoices, or to take account of the data for the underlying business document when creating a customer invoice.

Customer Transaction Document Template is the template for various business objects. For example, it can be considered an offer by a seller to a customer for the delivery of goods or services according to fixed terms. The offer is legally binding for the seller for a specific period of time. It may also be request made by the customer for the seller to take back goods that have been delivered, and to cancel the sale. The template can also be the basis for an agreement between a seller and a customer concerning the sale and delivery of goods, as well as any services that are associated with these processes, on a specific date, for a specific quantity, and for a specific price. It can also be the template for an agreement between a service provider and a customer concerning the execution of services at a specific time and for a specific price. In addition, the service order contains planning for personnel, spare parts, and other expenses that are necessary for providing the services. Moreover, it can be a service request from a customer to a service provider to solve an issue that the customer has with regard to a product. In addition to the description and the categorization of the issue, the Service Request contains the documentation and the results of the resolution, as well as the expenses incurred.

Opportunity is a recognized possibility for sales of goods or services.

Due Clearing is a group of receivables and payables for clearing.

Due Payment is a payment request or payment confirmation with regard to trade receivables and payables.

Dunning is a reminder or demand from a company (creditor) to a business partner (debtor) to make a payment by a certain point in time.

Tax Receivables Payables Register is the register of the following tax receivables and payables of a company for: —Delivered goods and rendered services between buyers and sellers—Consumption of goods—Transfer of goods—Amounts withheld from payments to sellers Trade Receivables Payables Account is an account of trade receivables and payables of a company from or to a business partner. It also contains guidelines and agreements concerning the payments and dunning of receivables and payables for a business partner.

Trade Receivables Payables Account Statement is a list of the increases or decreases to trade receivables or payables of a company from or to a business partner within a certain time period.

Trade Receivables Payables Register is the register of the trade receivables and payables of a company from or to its business partners.

Accounting Clearing Object History is a chronological record of creation and clearing information relating to a clearing object in accounting.

Accounting Document is a representation of changes to values of general ledger and subledger accounts resulting from a business transaction and relating to a company and a set of books.

Accounting Document Report is a record of accounting documents grouped by period and formatted as stipulated by the legal authorities.

Accounting Entry is a captured business transaction concerning a value change in the asset and equity structure of a company. The entry is made in relation to the accounts of the general ledger and of the subledgers, applying the rules of one or more sets of books.

Accounting Notification is a notification sent to Financial Accounting by an operational component regarding a business transaction. It represents this operational business transaction in a standardized form for business transaction documents and contains the data needed to valuate the business transaction.

Accounts Receivable Payable Ledger Account is a record for a company based on the principle of double-entry bookkeeping that reflects the effects of business transactions on the valuated balance of trade payables and receivables. It serves as a structuring element for collecting and evaluating postings in the customer/vendor subledger (payables/receivables subledger). It contains values concerning the payables or receivables that a company has with a business partner.

Balance Sheet and Income Statement Report is a report that discloses the book value and net income of a business or other organization at a particular date, often at the end of its fiscal year in a predefined format as stipulated by the legal authorities.

Cash Ledger Account is a record for a company based on the principle of double-entry bookkeeping that reflects the effects of business transactions on a restricted part of the evaluated balance for means of payment. Serves as a structuring element for collecting and evaluating postings in the cash ledger. Contains values that concern the means of payment of a company at a house bank or the cash in the cash fund.

Fixed Asset is a view, defined for the purposes of financial accounting, of usually one or more physical objects, rights or other economic values belonging to a company. They are in long-term use, are recognized in the financial statements at closing, and are usually individually identifiable. It also includes the recording of the values (based on the principle of double-entry bookkeeping) that reflects the effects of business transactions on this view. Serves as a structuring element for collecting and evaluating postings in the asset subledger. A fixed asset encompasses the given view definition and the values for this view resulting from acquisitions, retirements, depreciation, revaluation and interest. It also contains the calculation parameters to determine depreciation, revaluation and interest. In addition to individual account movements related to business transactions, it contains period-based totals and balances that summarize the movements.

GeneralLedger Account is a record of quantities and values of a company that are relevant to valuation and that relate to a functional grouping item of a chart of accounts (business object Chart Of Accounts, node Item). This record serves the purposes of a company's proper financial reporting in accordance with a set of books.

Material Ledger Account is a record of the quantities and values for part of the value-based inventory of materials in a company that shows the effects of business transactions on the value of the inventories.

Material Valuation Data is data that references a material or material group for valuating business transactions, for cost estimates, and for value-based management of material inventories. In particular, it contains internal valuation prices for a material or material group.

Other Direct Cost Ledger Account is a record for a company based on the principle of double-entry bookkeeping that shows the effects of business transactions on direct costs that are not recorded in the production, sales, or purchasing ledgers. In addition to individual account movements related to business transactions, it contains period-based totals that summarize the movements.

Overhead Cost Ledger Account is a record for a Company based on the principle of double-entry bookkeeping that reflects the effects of business transactions on the costs incurred in the provision of company resources (overhead). Serves as a structuring element for collecting and evaluating postings and for planning in the overhead cost ledger. Contains the overhead costs and the activity and consumption quantities of a company for a cost center, resource, or project task (project of the normal business activities of the company). In addition to individual movements related to business transactions, it contains period-based totals that summarize the individual movements along with period-based planned overhead costs.

Overhead Cost Scheme is a list of rules for the calculation and application of overhead rates.

Production Ledger Account is a record of quantities and values that shows the effects of business transactions on the value of a defined part of the work-in-process inventory or expenses in production.

Purchase Ledger Account is a record that shows the effects of business transactions in purchasing, of deliveries, and of invoice verification on the valuation of the purchased materials and services.

Resource Valuation Data is data that references a resource or resource group for the valuation of business transactions and for cost estimates and cost accounting. In particular, it contains the internal cost rates for a resource or resource group.

Sales Ledger Account is a record that shows the effects of business transactions on revenues and the cost of sales.

Service Product Valuation Data is data that references a service product or service product group for the valuation of business transactions and for cost estimates and cost accounting. In particular, it contains the internal cost rates for a service product or service product group.

Tax Ledger Account is a record for a company based on the principle of double-entry bookkeeping that reflects the effects of business transactions on a restricted part of the valuated balance of payables and receivables from sales tax and excise duty with regard to the tax authorities. Serves as a structuring element for collecting and evaluating postings in the tax ledger in Accounting. Contains values that concern a company and where applicable various tax characteristics (such as (tax authority) tax type, tax rate).

Access Control List is a list of access groups that have access to the entire host object during a validity period.

Access Group is a group of identities for which access control is specified in a certain context.

Accounting Coding Block Distribution is an Accounting Coding Block Distribution is the Distribution of Coding Blocks to enterprise resources changes, such as expenses or material movements. A Coding Block is a set of accounting objects to which an enterprise resource change is assigned. The resource change is ultimately valued in Accounting.

Activity Template is a structured view of various types of activities, such as letter, email, or fax activities, for the purpose of planning and documenting actions and interactions related to business partners.

Address Template is the data that describes addressee, postal address, and communication addresses.

Attachment Folder is a collection of documents attached to a business object or a part of a business object.

Bank Directory Entry is an entry for a bank in a directory of banks.

Business Partner Temple is a person, an organization, or a group of persons or organizations, in which a company has a business interest.

Cash Discount Terms is the modalities agreed on by business partners for the payment of goods delivered or services provided. These modalities consist of incremental payment periods and the deductions that are allowed when payment is made within one of these periods.

Change Document is a record of changes made to a object instance. It specifies the identity of the user responsible for the change and the change date and time.

Company Tax Arrangement is an agreement between a company and a tax authority regarding the declaration and payment of taxes.

Compensation Component Type is a description of the employee compensation components in the context of Human Resources.

Controlled Output Request is a controller of output requests and processed output requests related to the Hosting Business Object. Several output channels are supported for sending out documents.

Cross Product Catalogue Search is an object that represents the condition search parameters used for and the result of a search across product catalogs.

Document is a carrier of unstructured information and additional control and monitoring information.

Employment is a relationship that comes into being by virtue of one or more valid work agreements. Whereas the work agreement consists only of the specific labor-related arrangements agreed between company and employee, the employment encompasses the entire legal relationship between the contracting parties.

Engineering Change Order is a set of instructions to make changes to a number of objects from the areas of engineering or production. It defines the conditions under which these changes become effective and specifies the release status of these changes.

Exchange Rate is the relationship in which one currency can be exchanged for another currency at a specified time.

Financial Audit Trail Documentation is a uniform documentation of the changes to receivables and payables and financial transactions linked to a business transaction for audit purposes.

Identified Stock is a subset of a material that shares a set of common characteristics, is logistically handled separately from other subsets of the same material and is uniquely identified.

Identity is a representation of the uniqueness of a human person or non-human subject in a uniform way. The identity specifies the person's or subject's credentials for accessing systems in a system landscape, the granted authorizations and the system settings which are valid for the person or subject.

Installation Point is a physical or logical location at which a business object, for example software or a material, is installed during a certain period of time. An installation point contains descriptive information about its installed object, for example, the quantity of materials used, and can be structured in a hierarchical relationship with other installation points.

Installed Base is a container that holds structured information of business components and their compositions as well as their business features. Installed Base Components carry properties of business objects (e.g. Material or Individual Material), which have been assigned to an Installed Base. They can be multi-level structured, are time dependent and contain descriptive information about their corresponding business component. Content of an Installed Base Component might for instance be: Address and/or application specific extensions.

Job is the type of a position.

Location is a geographical place.

Logistics Area is a freely definable area within a location providing detailed physical and operational information for storage and production. Logistics areas can be arranged in a hierarchy according to physical aspects or logistical functions.

Logistics Shift is a period of working time (called shift) in supply chain processes such as production, warehousing, and transportation that can be interrupted by breaks.

Logistic Unit is an item established for logistics operations, such as storage, movement, and packing. A Logistic Unit represents physical units handled in the same manner during logistic operations, whether they are packed or unpacked goods.

Market Segment is a sector of the overall market that is characterized by a particular supply and demand situation and that exhibits specific customer and product characteristics as well as characteristics for regional and organizational classification.

Operating Hours is a generic description of time periods based on a recurrence pattern, during which operations are performed.

Organisational Centre Template is a collection of pre-defined information used to create a new Organisational Centre. It is used to facilitate the creation of new Organisational Centres which have several attributes in common.

Party is a representation of a business partner or an organizational center.

Payment Agreement is an agreement between a company and a business partner on the handling of payments. It defines, for example, the payment methods allowed and which bank details or credit cards should be used.

Payment Control is an agreement between a company and a business partner on processing payments for an individual business transaction.

Payment Explanation is a reason/reasons for a payment, typically with reference to one or more business documents such as contracts, invoices, credit memos, or sales orders.

Position is an organizational element within the organizational plan of an enterprise. It comprises a fixed combination of tasks, competencies, and responsibilities that can be taken care of by one or more appropriate employees.

Price and Tax Calculation is the summary of the determined price and tax components for a business case.

Procurement Arrangement is an arrangement between a strategic purchasing unit and a supplier that is used for procurement transactions. The arrangement can also be established for one supplier across purchasing units. This arrangement contains, for example, payment terms, invoice currency, and incoterms. This arrangement does not constitute a contract with the supplier.

Product Category Hierarchy is a hierarchical arrangement of product categories according to objective business aspects. Subordinate product categories represent a semantic refinement of the respective higher-level product category.

ProductionSegment is a part of a production process specified by a network of operations and assigned materials for the production of a material.

Released Execution Production Model a released version of a production model that contains the production bill of operations and production bill of material data for the execution of a production process.

Released Planning Production Model is a released version of a production model that contains the production bill of operations and production bill of material data for the planning of a production process.

Released Site Logistics Process Model a released version of a site logistics process model that contains elements for defining and describing the execution of a site logistics process.

Resource Template is an asset that contributes to the sourcing, production or delivery of a product.

Resource Operating Time Template is a template of an operating time definition that contains information to maintain the operating times for multiple resources.

Responsibility describes specific rights and duties of an acting agent responsible such as a person or an organizational centre etc.

Sales Arrangement is an arrangement between a sales organization and a customer that is used for sales transactions. This arrangement contains, for example, payment terms, invoice currency, and incoterms. This arrangement does not constitute a contract with the customer.

Sales Price List is a combination of specifications for prices, discounts or surcharges, (PriceSpecification), in Sales and Service. The list is defined for a combination of properties, and is valid for a specific time period.

Sales Price Specification is the specification of a price, a discount, or a surcharge for sales and service. The specification is defined for a combination of properties and is valid for a specific period.

Service Issue Category Catalogue is a structured directory of issue categories that group business transactions in Customer Service from an objective or a subjective point of view.

Site Logistics Process Model is a model of site logistics process that is specified by a sequence of site logistics process segments.

Site Logistics Process Segment is a part of a logistics process specified by a net of operations for packing, moving and checking of goods.

Source of Supply is a source for the internal and external procurement and the internal production of one or more products.

Sourcing List is a list of sources for the internal and external procurement and the internal production of one or more products. It defines possible sources of supply that can be subject to supply quota arrangements.

Storage Behaviour Method is a set of rules that defines the manner in which a storage location is managed.

Storage Control is a specification of inventory items' constraints and inventory items' rules applied in a storage location (such as, logistics area or resource), as well as requirements for actions (that is replenishment, cleanup).

Supply Planning Area is an area for which a separate planning ensures the availability of products on time.

Supply Quota Arrangement is an arrangement that specifies how material demands or material issues are distributed to different sources of supply, business partners, or internal organizational units.

Text Collection is a set of multilingual textual descriptions including formatting information for a Business Object or a part of a Business Object Transportation Lane is a relationship between two locations or transportation zones that specifies the materials that can be transported between locations or transportation zones, and the means of transport that can be used.

Work Agreement is a contract between employer and employee that obligates the employee to provide his or her labor and the employer to provide the agreed compensation.

CN Employee Tax Arrangement is an arrangement between the employee and the tax authorities of the People's Republic of China that defines the rules of how the employer calculates and reports taxes for this employee to be compliant with the legal requirements.

Compensation Structure is an organized structure of pay grade ranges. A pay grade range reflects the value of tasks and activities in the company. Employees can be assigned to a pay grade range based on the tasks and activities they perform. A Compensation Structure can be company-specific or can be predefined according to pay scale regulations.

DE Employee Tax Arrangement is an arrangement by the German tax authority for the employee, concerning calculation and reporting of income tax deductions according to German legal requirements.

Employee Compensation Agreement is an agreement between an employer and an employee detailing compensation components that are relevant to the employee, such as base salary, one-time and recurring payments and payments for employee benefits. Also part of this agreement can be the assignment of a Compensation Structure Grade which shall be valid for the employee.

Employee Time is a recorded document of the working times of an internal or external employee. In addition to planned and actual working times and activities carried out for the company, it also documents absence times, break times, and availability times.

Employee Time Account is a summary of valuated employee times and of periodic valuations administered by employee time valuation.

Employee Time Agreement is an agreement between employer and employee consisting of time management stipulations that are derived from legal, company-specific, and pay-related provisions, and from terms agreed individually with the employee.

Employee Time Confirmation View of Project is a view of a project restricted to those project tasks for which employee times are confirmed.

Employee Time Confirmation View of Service Transaction Document is a view of a business transaction document specifying sold or purchased services that are relevant for employee time confirmation.

Employee Time Recording View is an Employee Time Recording View is a view of several times of one employee for recording purposes.

Employee Time Valuation is an object responsible for the execution of valuations of employee times and other time management documents (such as employee time account maintenance requests) for one internal or external employee.

FR Employee Social Insurance Arrangement is an arrangement for the employee by responsible French bodies that are legally responsible for administering the employee's social insurance contributions. This arrangement concerns the information for calculation of French social insurance contributions and reporting according to the French legal requirements.

GB Employee Social Insurance Arrangement is an arrangement for the employee by United Kingdom social insurance authority concerning calculation and reporting of contributions according to the United Kingdom legal requirements.

IT Employee Social Insurance Arrangement is an arrangement for the employee by the Italian bodies that are legally responsible for administering the employee's social insurance contributions and benefits. This arrangement concerns the information for calculation of Italian social insurance contributions and reporting according to the Italian's Social Insurance bodies.

Working Time Model is an employee-independent, structured description of working times. In addition to working times, it may also describe absence times, break times, and availability times.

Bank Payment Order is an order to a house bank to make a transfer or direct debit from a specified house bank account to fulfill a payment order.

Cash Transfer is a company-internal money transfer that includes the following payments: —From one house bank account to another (house bank account transfer)—From one cash storage to another (cash transfer)—From a cash storage to a house bank account (cash deposit)—from a house bank account to a cash storage (cash withdrawal)

Cheque Storage is a location for incoming checks that a company receives from its business partners, such as customers.

Company Payment File Register is a company's register for payment files that are exchanged with house banks.

Expected Liquidity Item is an expected single amount that increases or reduces the liquidity of a company.

House Bank Statement is a legally binding notification from the house bank about the revenues within a specific time period at a house bank account with a defined starting and closing balance.

Liquidity Forecast is a preview of the medium- to long-term development of the liquidity situation of a company or a group of companies.

Payment Advice is an announcement of a payment transaction by a business partner to the company, specifying payment reasons.

Payment Allocation is an assignment of a payment item to the payment reasons from which the payment item originated.

Payment Order is an order within a company to make a payment to a business partner at a specified time. A payment order can be a collective order that contains several individual orders.

Inventory is the quantity of the materials in a certain location including the material reservations at this location. Quantities of materials can be physically grouped using Identified Logistic Unit or Logistic Units.

Logistics Task Folder is a folder for storing and grouping logistics tasks according to business criteria. Logistics Task Folder contains details about the processors that are registered at the folder.

Physical Inventory Count is the instructions on how to execute and approve a physical inventory count of materials and packages. A physical inventory count also contains the results of the physical inventory and any differences between this physical inventory and the book inventory.

Production Request is a request to Production Execution to produce a certain quantity of a specific material by a requested due date. In addition it contains accepted and fulfillment data representing the response from Production Execution Site Logistics Request is an internal request for site logistics to prepare and perform, within a certain time period, an outbound, inbound, or internal site logistics process.

Project Template defines the structure and non-operational data of a project. It is used for a standardized project planning and execution—a new project may be generated from a project template.

Project Purchase Request is a request to purchasing to procure products during a project. A request can originate in a project, or it can originate outside a project, in which case it are usually assigned to a project task as an accounting object.

Purchase Order is a request from a buyer to a seller to deliver a specified quantity of material, or perform a specified service, at a specified price within a specified time.

Purchase Order Confirmation is a confirmation from a seller to deliver a specified quantity of goods, or perform a specified service, at a specified price within a specified time.

Purchase Request is a request or instruction to the purchasing department to purchase specified goods or services in specified quantities at a specified price within a specified time.

Internal Request is a request from an employee of a company for the procurement of goods or services for their own or for company use.

Request for Quote is a request from a buyer to a bidder to submit a quote for goods or services according to specified criteria.

RFQ Request is a request to the purchasing department to prepare a request for quote.

Supplier Quote is a response to a request for quote in which a bidder offers to sell goods and services to a buyer according to the requested criteria.

Supplier Invoice is a company's obligation to pay the supplier for goods received or services rendered.

Supplier Invoice Verification Exception is a group of related issues arising during a supplier invoice verification process. The issues causing the exception are bundled according to certain business criteria. A complex follow-up clarification process is utilized to resolve the issues.

Demand Forecast is a group of related issues arising during a supplier invoice verification process. The issues causing the exception are bundled according to certain business criteria. A complex follow-up clarification process is utilized to resolve the issues.

Logistics Execution Requisition is a requisition to Logistics to control, trigger and monitor the execution of a logistic process on a macro logistics level to fulfill an order.

Planned Independent Requirement is an independent requirement derived from the forecast, and planned for a material for a particular time period in a particular supply planning area.

Planning View of Purchase Order is a planning view of the materials, date, quantities, delivery conditions, parties, and sources of supply of a purchase order that are relevant to planning.

Production Requisition is a requisition to production execution to produce a certain quantity of a specific material by a requested due date.

Site Logistics Requisition is a request to Logistics Execution to execute a site logistics process for a certain quantity of material, by a certain time.

Supply Planning Requirement is a request to Logistics Execution to execute a site logistics process for a certain quantity of material, by a certain time.

Product Catalogue Change List is a list of changes to a catalog. Changes contained in the list are typically approved and published together.

Product Catalogue is a structured directory of catalog items, where each catalog item represents a product and provides information about it.

US Employee Payroll Input is a summary of employee-specific input for US payroll for one employee.

Payroll Process is a process that runs the payroll for a group of employees in a payroll period.

For example, these business objects may be involved in a message choreography that depicts one or more messages between applications that can reside in heterogenous systems. In some cases, the messages may include data from or based on such processes represented by the business object.

In another example, the business objects may include a root node, with a plurality of data elements located directly at the root node, and one or more subordinate nodes of varying cardinality. This cardinality may be 1:1, 1:n, 1:c, 1:cn, and so forth. Each of these subordinate nodes may include it own data elements and may further include other subordinate nodes. Moreover, each node may reference any number of appropriate dependent objects.

The foregoing example computer implementable methods—as well as other disclosed processes—may also be executed or implemented by or within software. Moreover, some or all of these aspects may be further included in respective systems or other devices for creating and utilizing consistent services or interfaces. The details of these and other aspects and embodiments of the disclosure are set forth in the accompanying drawings and the description below. Other features, objects, and advantages of the various embodiments will be apparent from the description and drawings, as well as from the claims. It should be understood that the foregoing business objects in each deployment unit are for illustration purposes only and other complementary or replacement business objects may be implemented.

BRIEF DESCRIPTION OF THE DRAWINGS

FIG. 4 illustrates an example application implementing certain techniques and components in accordance with one embodiment of the system of. FIG. 1;

FIGS. 32A through 32E depict various processes involving Global Data Types;

FIGS. 33-1 through 33-6 show an exemplary CustomerInvoiceRequest object model;

FIGS. 34-1 through 34-8 show an exemplary CustomerInvoiceRequest Message Data Type;

FIGS. 35-1 through 35-29 show an exemplary CustomerInvoiceRequestRequest element structure;

FIGS. 36-1 through 36-20 show an exemplary CustomerTransactionDocument_Template object model;

FIGS. 37-1 through 37-13 show an exemplary CustomerReturnExecutionRequest element structure;

FIGS. 38-1 through 38-20 show an exemplary FormPurchaseOrderConfirmation element structure;

FIGS. 39-1 through 39-16 show an exemplary FormQuoteNotification element structure;

FIGS. 40-1 through 40-21 show an exemplary FormServiceRequestMessage element structure;

FIGS. 41-1 through 41-12 show an exemplary ServiceRequestMessage element structure;

FIGS. 42-1 through 42-4 show an exemplary Opportunity object model;

FIGS. 43-1 through 43-2 show an exemplary DueClearing object model;

FIGS. 44-1 through 44-4 show an exemplary DuePayment object model;

FIGS. 46-1 through 46-4 show an exemplary FormDunningNotification element structure;

FIGS. 47-1 through 47-4 show an exemplary TaxReceivablesPayablesRegister object model;

FIGS. 50-1 through 50-14 show an exemplary FormTradeReceivablesPayablesAccountStatementNotification element structure;

FIGS. 51-1 through 51-6 show an exemplary TradeReceivablesPayablesRegister object model;

FIGS. 53-1 through 53-27 show exemplary ReceivablesPayablesNotification and CancellationReceivablesPayablesNotification element structures;

FIGS. 55-1 through 55-43 show an exemplary AccountingDocument object model;

FIGS. 57-1 through 57-20 show an exemplary FormAccountingDocumentReport element structure;

FIGS. 58-1 through 58-8 show an exemplary AccountingEntry object model;

FIGS. 59-1 through 59-7 show an exemplary AccountingAccountBalanceMigrateRequest element structure;

FIGS. 60-1 through 60-28 show an exemplary AccountingNotification object model.

FIGS. 62-1 through 62-4 show an exemplary ExpenseReportAccountingNotificationMessage Message Data Type;

FIGS. 63-1 through 63-2 show an exemplary GoodsAndServiceAcknowledgementAccountingMessage Message Data Type;

FIGS. 64-1 through 64-4 show an exemplary InventoryChangeAndActivityConfirmationAccountingNotificationMessage Message Data Type;

FIGS. 65-1 through 65-8 show an exemplary InvoiceAccountingNotificationMessage Message Data Type;

FIGS. 66-1 through 66-4 show an exemplary PaymentAccountingNotificationMessage Message Data Type;

FIGS. 69-1 through 69-4 show an exemplary SalesAndPurchasingAecountingNotificationMessage Message Data Type;

FIGS. 71-1 through 71-11 show an exemplary ExpenseReportAccountingNotification element structure;

FIGS. 72-1 through 72-14 show an exemplary GoodsAndServiceAcknowledgementAccountingNotification element structure;

FIGS. 73-1 through 73-14 show an exemplary InventoryChangeAndActivityConfirmationAccountingNotification element structure;

FIGS. 74-1 through 74-19 show an exemplary InvoiceAccountingNotification element structure;

FIGS. 75-1 through 75-4 show an exemplary CancellationAccountingNotification element structure;

FIGS. 76-1 through 76-12 show an exemplary OpenItemAccountingNotification element structure;

FIGS. 77-1 through 77-26 show an exemplary PaymentAccountingNotification element structure;

FIGS. 78-1 through 78-3 show an exemplary ProductionLotAccountingNotification element structure;

FIGS. 79-1 through 79-3 show an exemplary ProjectAccountingNotification element structure;

FIGS. 80-1 through 80-12 show an exemplary SalesAndPurchasingAccountingNotification element structure;

FIGS. 81-1 through 81-5 show an exemplary ServiceProvisionAccountingNotification element structure;

FIGS. 82-1 through 82-8 show an exemplary AccountsReceivablePayableLedgerAccount object model;

FIGS. 83-1 through 83-2 show an exemplary AccountsPayableLedgerAccountReplicateRequest element structure;

FIGS. 84-1 through 84-3 show an exemplary AccountsReceivableLedgerAccountTransmitRequest element structure;

FIGS. 87-1 through 87-8 show an exemplary FormBalanceSheetAndIncomeStatementRequest element structure;

FIGS. 88-1 through 88-15 show an exemplary CashLedgerAccount object model;

FIGS. 89-1 through 89-8 show an exemplary FixedAsset object model;

FIGS. 90-1 through 90-18 show an exemplary FixedAssetMigateRequest element structure;

FIGS. 91-1 through 91-9 show an exemplary GeneralLedgerAccount object model;

FIGS. 92-1 through 92-7 show an exemplary MaterialLedgerAccount object model;

FIGS. 93-1 through 93-4 show an exemplary MaterialValuationData object model;

FIGS. 94-1 through 94-11 show an exemplary MaterialValuationDataTransmitRequest element structure;

FIGS. 95-1 through 95-6 show an exemplary OtherDirectCostLedgerAccount object model;

FIGS. 96-1 through 96-20 show an exemplary OverheadCostLedgerAccount object model;

FIGS. 97-1 through 97-2 show an exemplary OverheadCostScheme object model;

FIGS. 98-1 through 98-4 show an exemplary ProductionLedgerAccount object model;

FIGS. 99-1 through 99-8 show an exemplary PurchaseLedgerAccount object model;

FIGS. 100-1 through 100-2 show an exemplary ResourceValuationData object model;

FIGS. 101-1 through 101-8 show an exemplary SalesLedgerAccount object model;

FIGS. 103-1 through 103-3 show an exemplary TaxLedgerAccount object model;

FIGS. 106-1 through 106-2 show an exemplary AccountingCodingBlockDistribution object model;

FIGS. 107-1 through 107-2 show an exemplary AccountingObjectCheckMessage Message Data Type;

FIGS. 108-1 through 108-3 show exemplary AccountingObjectCheckRequest and AccountingObjectCheckConfirmation element structures;

FIGS. 109-1 through 109-6 show an exemplary Activity_Template object model;

FIGS. 110-1 through 110-21 show an exemplary FormActivityVisitReportNotification element structure;

FIGS. 111-1 through 111-2 show an exemplary Address_Template object model;

FIGS. 115-1 through 115-4 show exemplary BankDirectoryTransmissionRequest and BankDirectoryTransmissionResponse element structures;

FIGS. 116-1 through 116-12 show an exemplary BusinessPartner_Template object model;

FIG. 120 shows an exemplary CompensationComponentType object model;

FIG. 121 shows an exemplary ControlledOutputRequest object model;

FIG. 122 shows an exemplary CrossProductCatalogueSearch object model;

FIG. 123 shows an exemplary Document object model;

FIG. 124 shows an exemplary Employment object model;

FIGS. 125-1 through 125-2 show an exemplary EngineeringChangeOrder object model;

FIG. 126 shows an exemplary ExchangeRate object model;

FIGS. 127-1 through 127-8 show an exemplary FinancialAuditTrailDocumentation object model;

FIG. 128 shows an exemplary IdentifiedStock object model;

FIG. 129 shows an exemplary Identity object model;

FIGS. 130-1 through 130-4 show an exemplary InstallationPoint object model;

FIG. 131 shows an exemplary InstalledBase object model;

Figure 1:
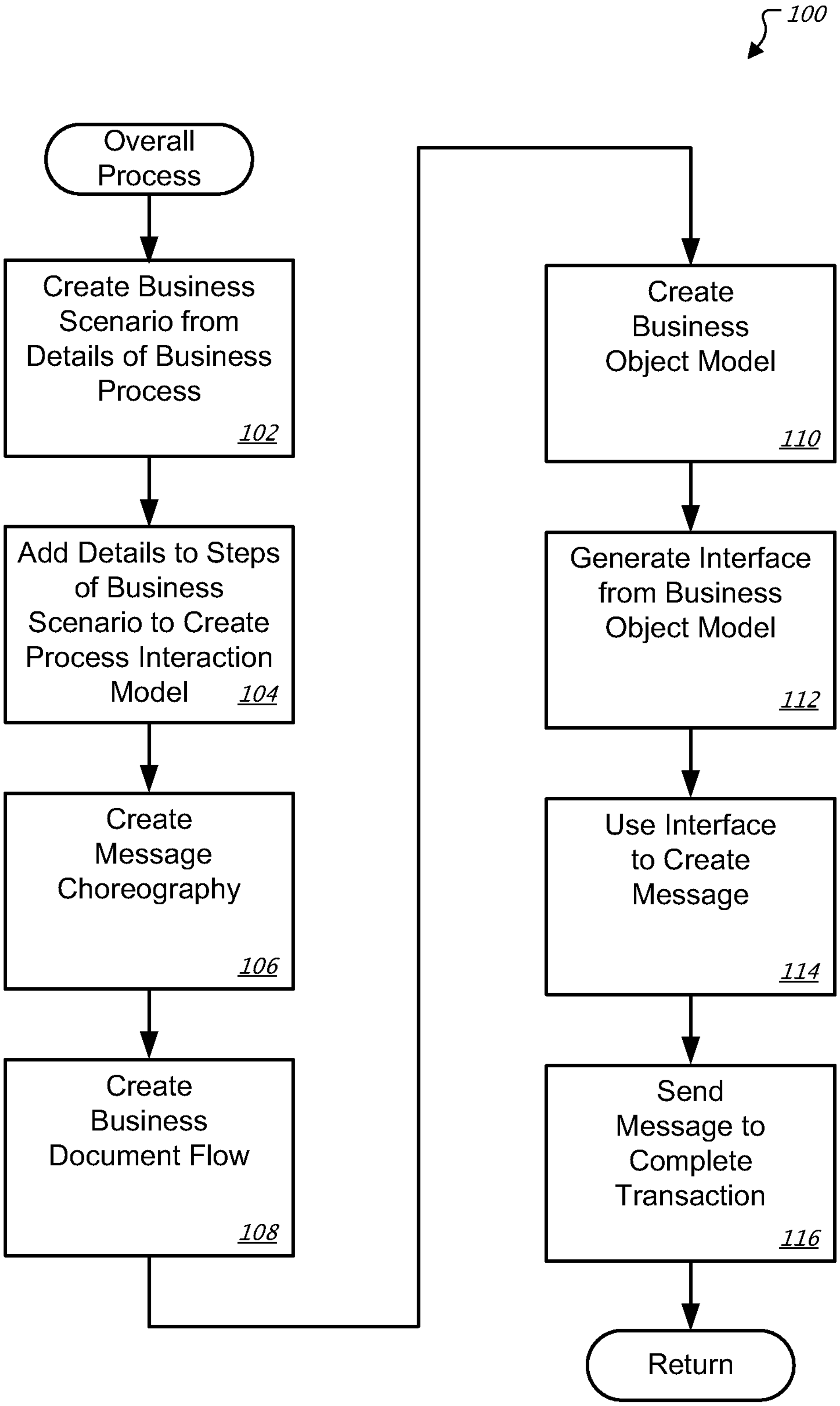
FIG. 1 depicts a flow diagram of the overall steps performed by methods and systems consistent with the subject matter described herein.
Figure 2:
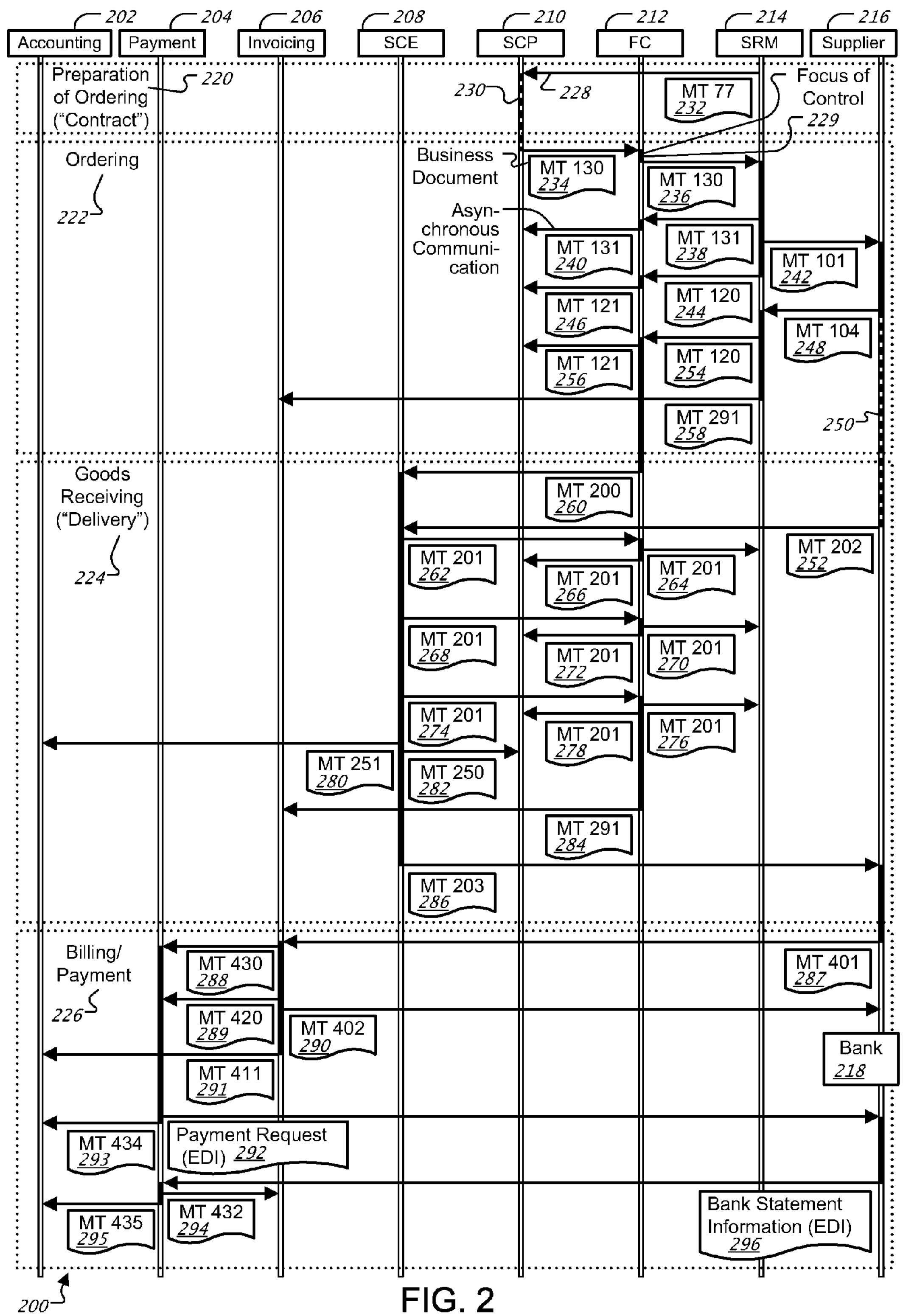
FIG. 2 depicts a business document flow for an invoice request in accordance with methods and systems consistent with the subject matter described herein.
Figure 4:
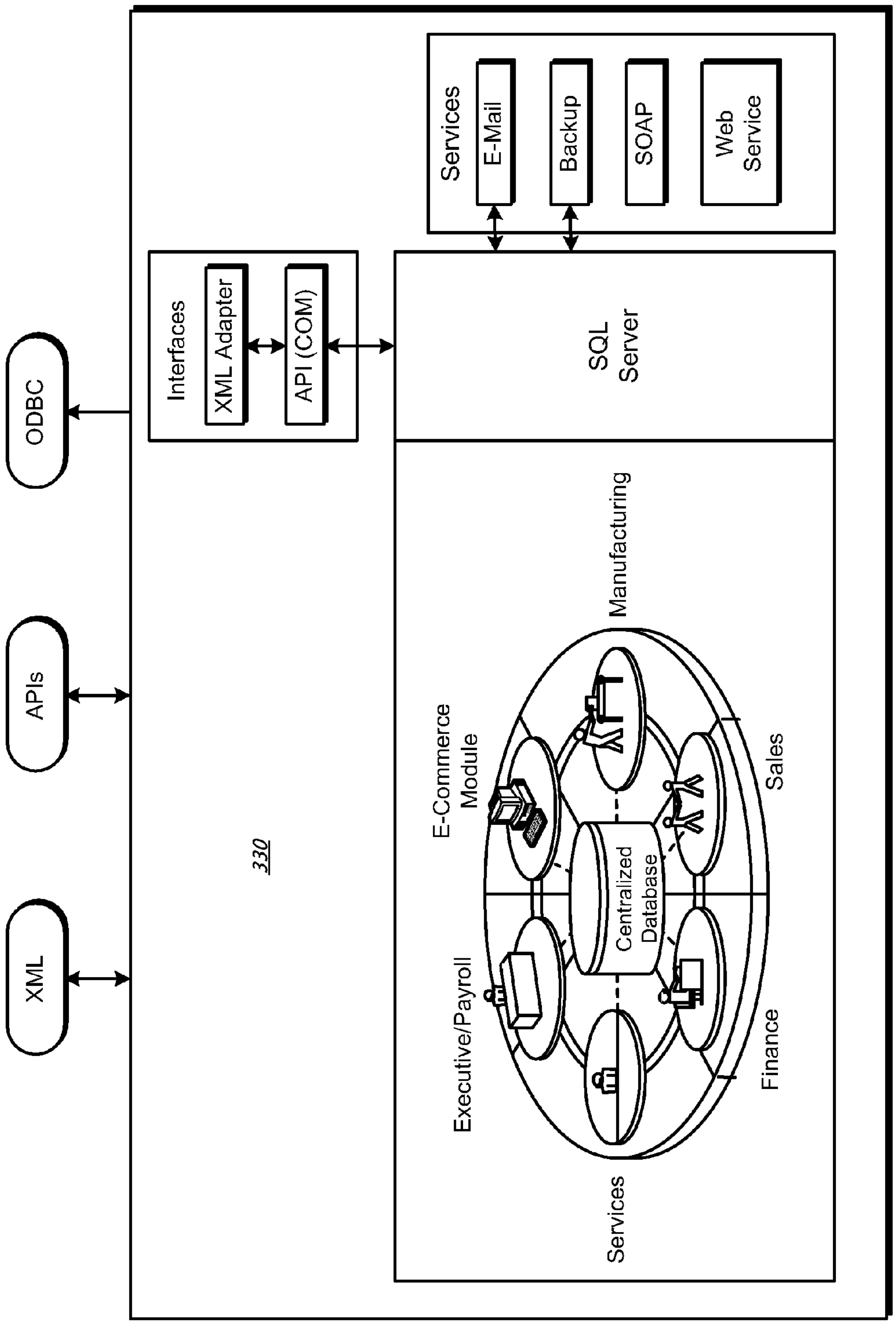
Figure 6:
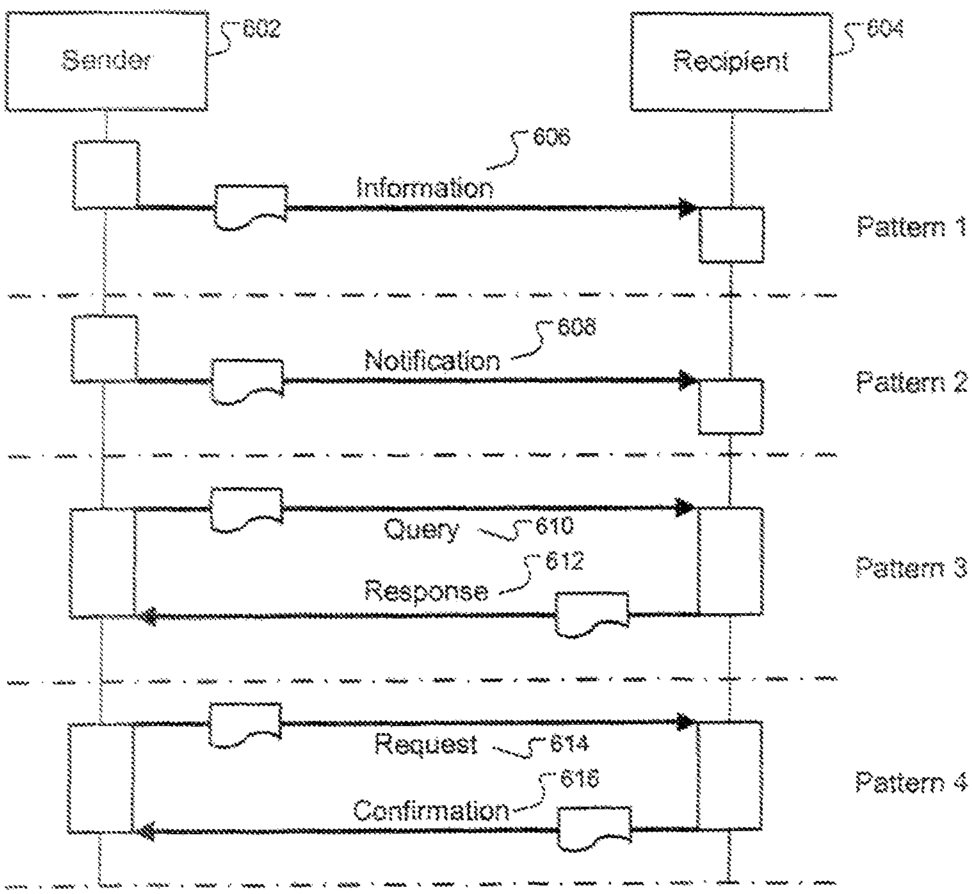
FIG. 6 depicts message categories in accordance with methods and systems consistent with the subject matter described herein.
Figure 7:
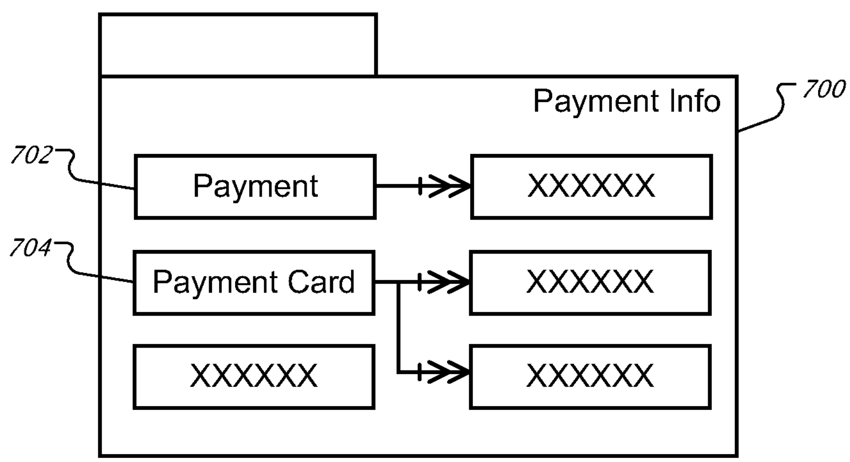
FIG. 7 depicts an example of a package in accordance with methods and systems consistent with the subject matter described herein.
Figure 8:
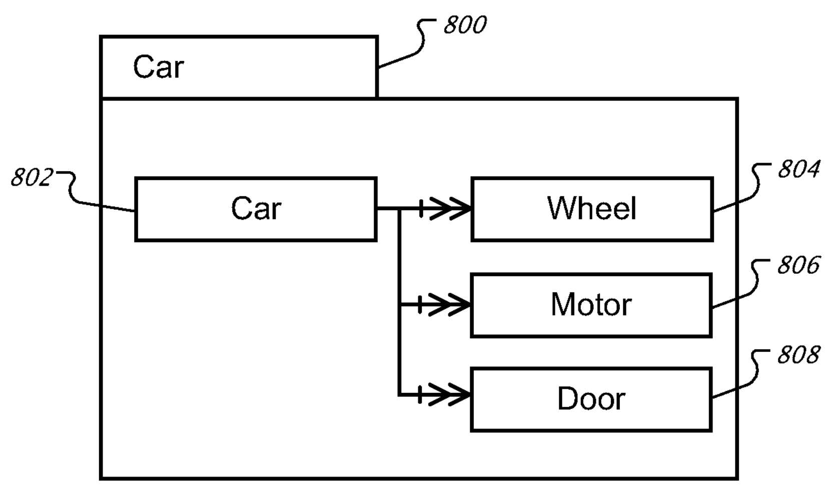
FIG. 8 depicts another example of a package in accordance with methods and systems consistent with the subject matter described herein.
Figure 9:
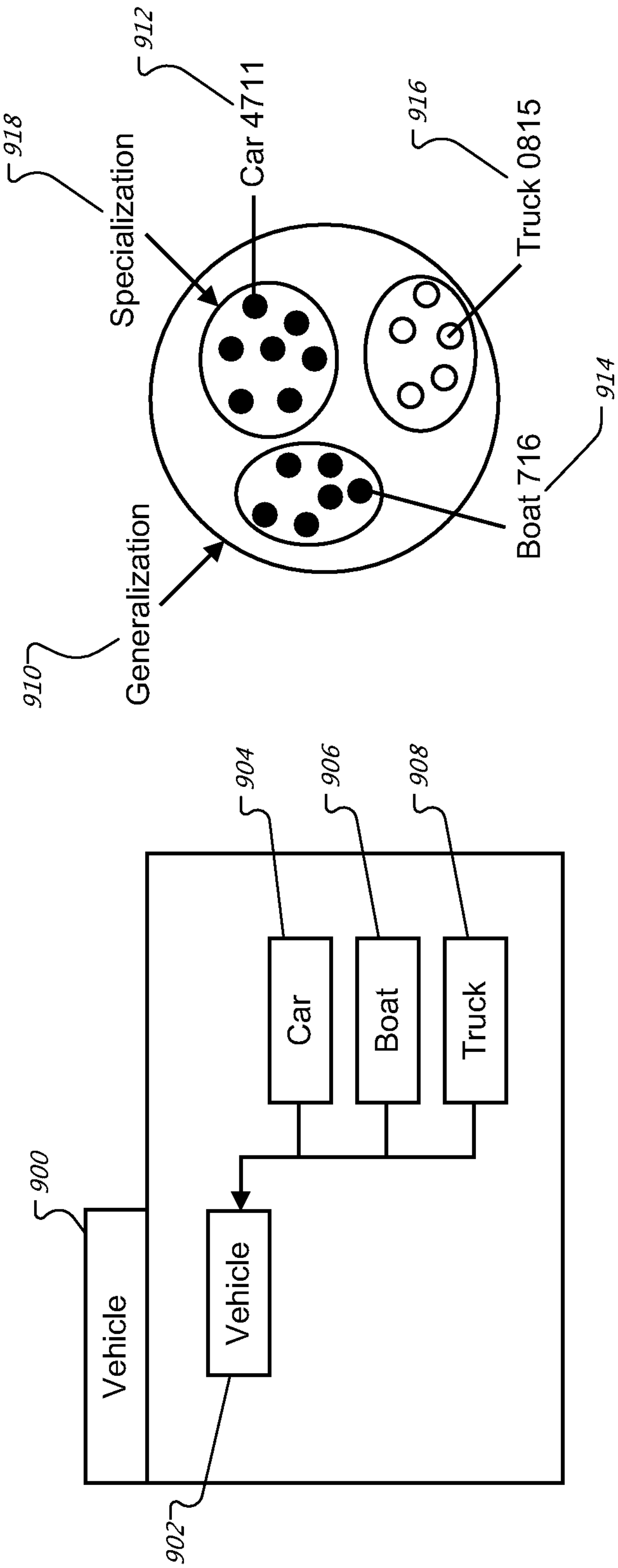
FIG. 9 depicts a third example of a package in accordance with methods and systems consistent with the subject matter described herein.
Figure 10:
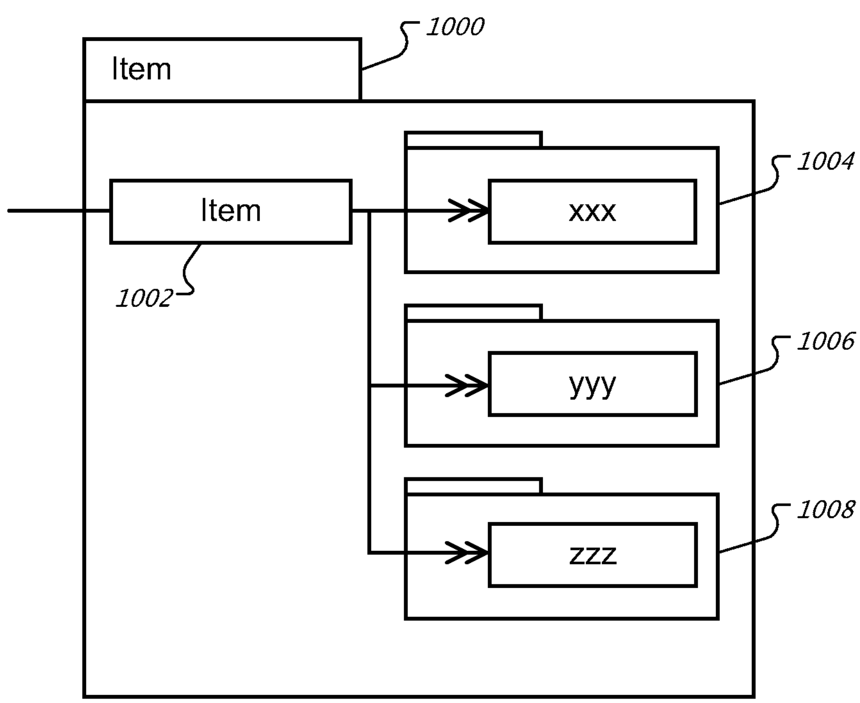
FIG. 10 depicts a fourth example of a package in accordance with methods and systems consistent with the subject matter described herein.
Figure 11:
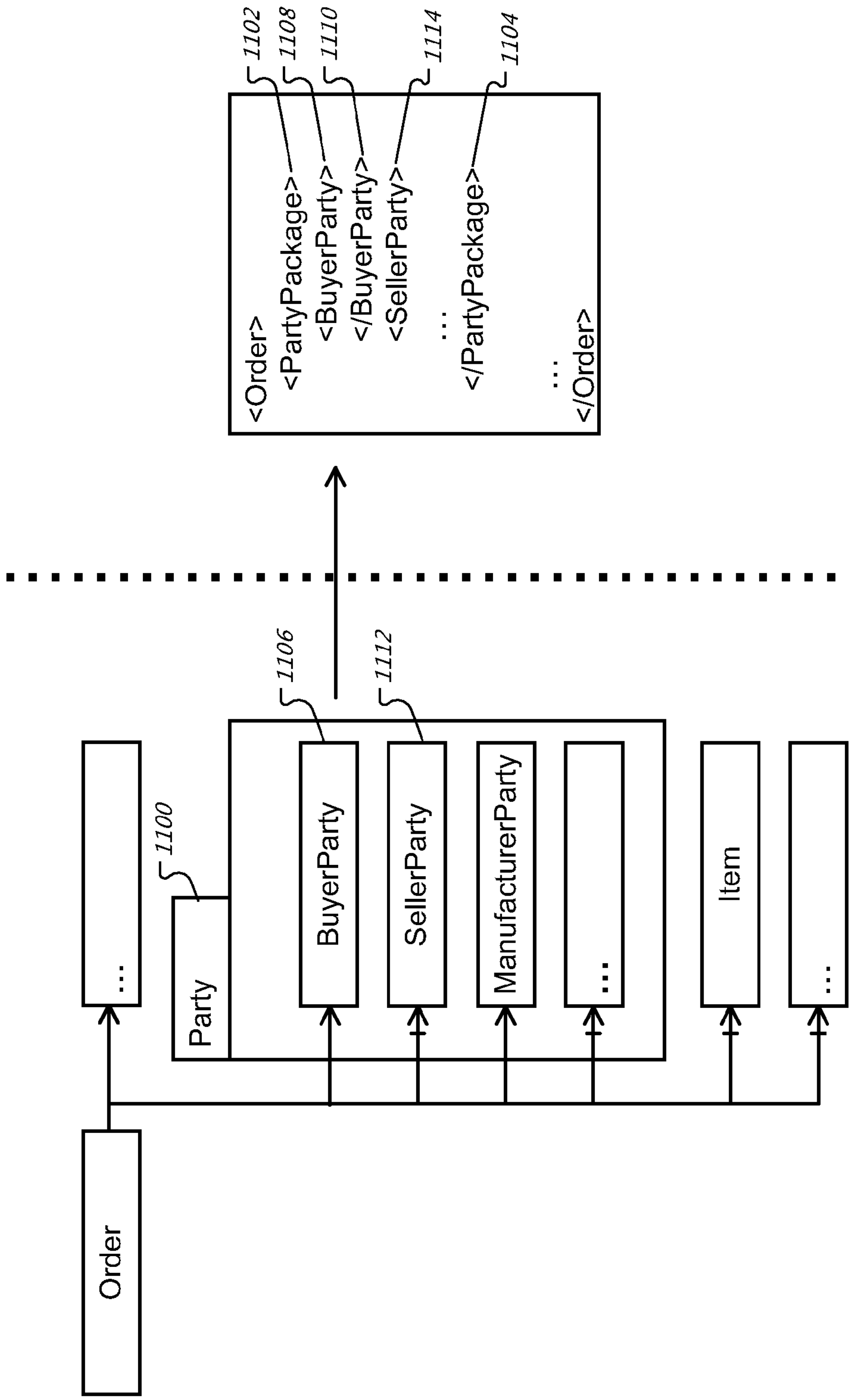
FIG. 11 depicts the representation of a package in the XML schema in accordance with methods and systems consistent with the subject matter described herein.
Figure 12:
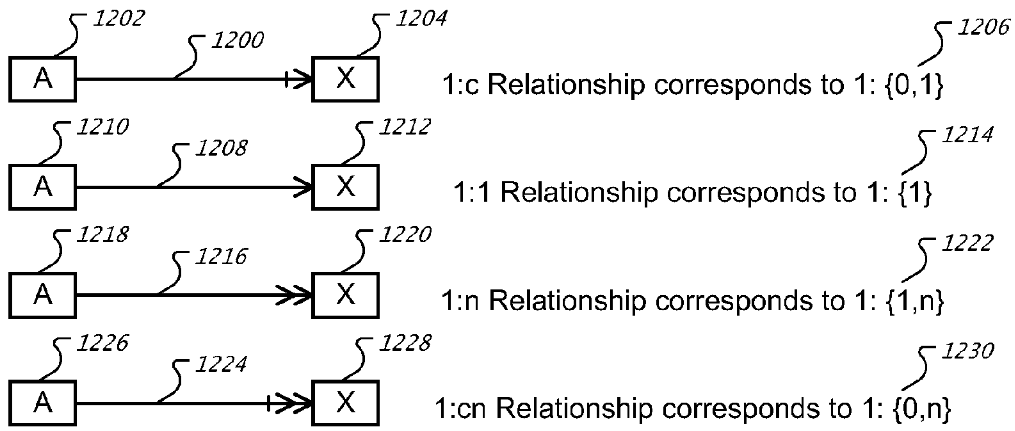
FIG. 12 depicts a graphical representation of cardinalities between two entities in accordance with methods and systems consistent with the subject matter described herein.
Figure 13:
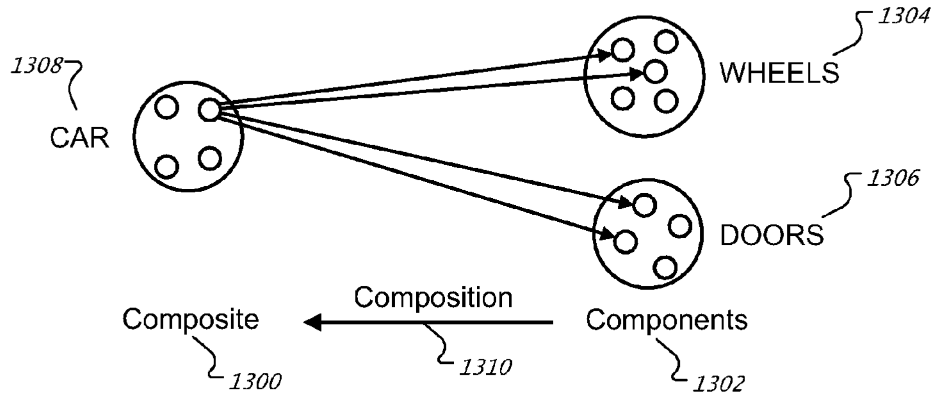
FIG. 13 depicts an example of a composition in accordance with methods and systems consistent with the subject matter described herein.
Figure 14:
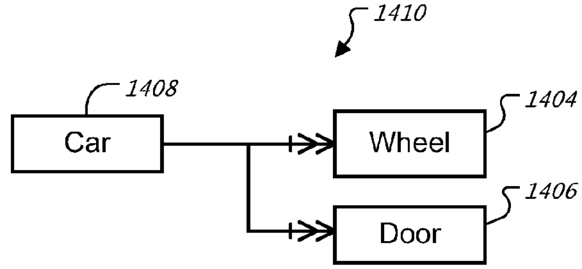
FIG. 14 depicts an example of a hierarchical relationship in accordance with methods and systems consistent with the subject matter described herein.
Figure 15:
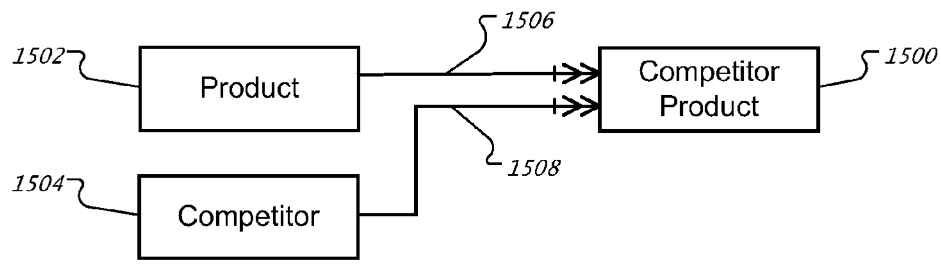
FIG. 15 depicts an example of an aggregating relationship in accordance with methods and systems consistent with the subject matter described herein.
Figure 17:
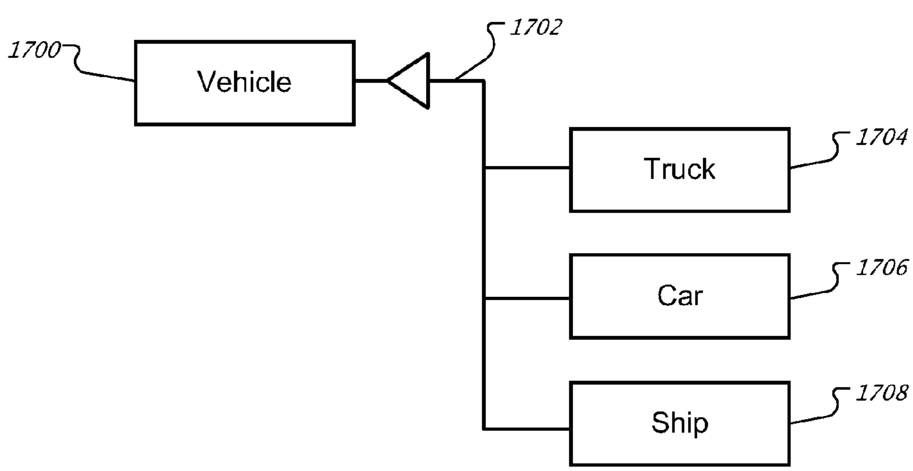
FIG. 17 depicts an example of a specialization in accordance with methods and systems consistent with the subject matter described herein.
Figure 18:
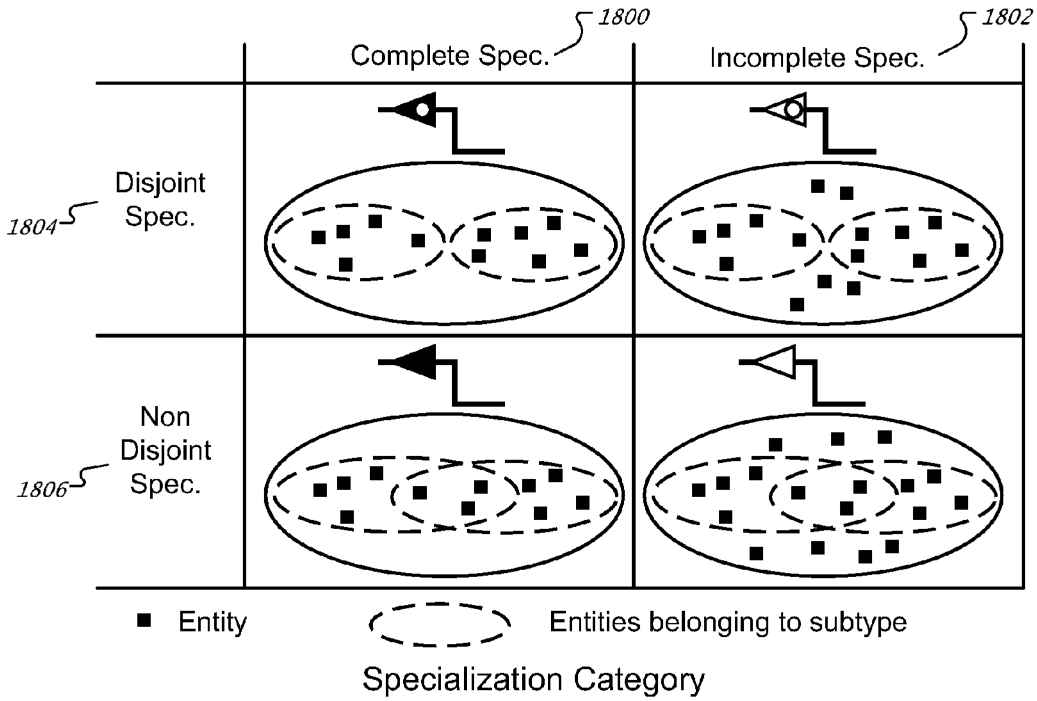
FIG. 18 depicts the categories of specializations in accordance with methods and systems consistent with the subject matter described herein.
Figure 19:
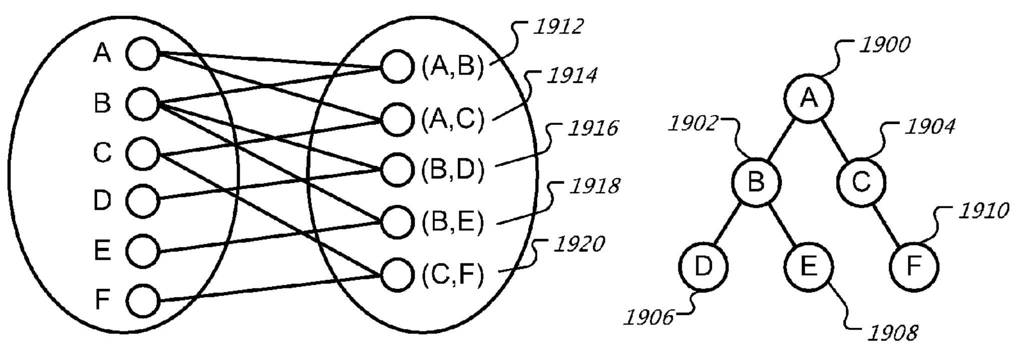
FIG. 19 depicts an example of a hierarchy in accordance with methods and systems consistent with the subject matter described herein.
Figure 20:
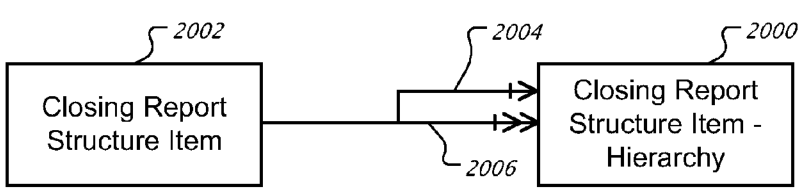
FIG. 20 depicts a graphical representation of a hierarchy in accordance with methods and systems consistent with the subject matter described herein.
Figure 31:
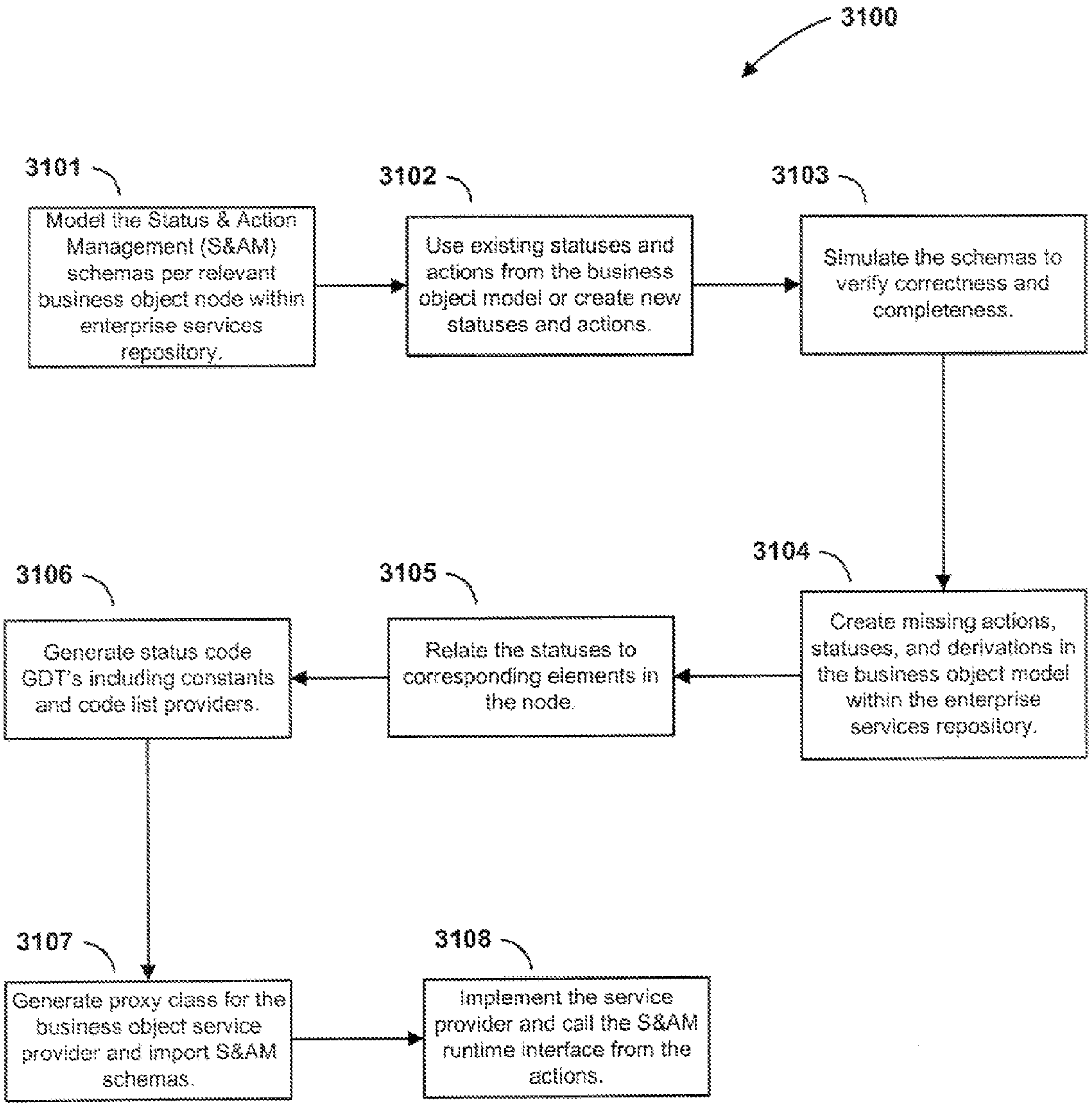
FIG. 31 illustrates an example method for status and action management in accordance with one embodiment of the present disclosure.
Figure 32A:
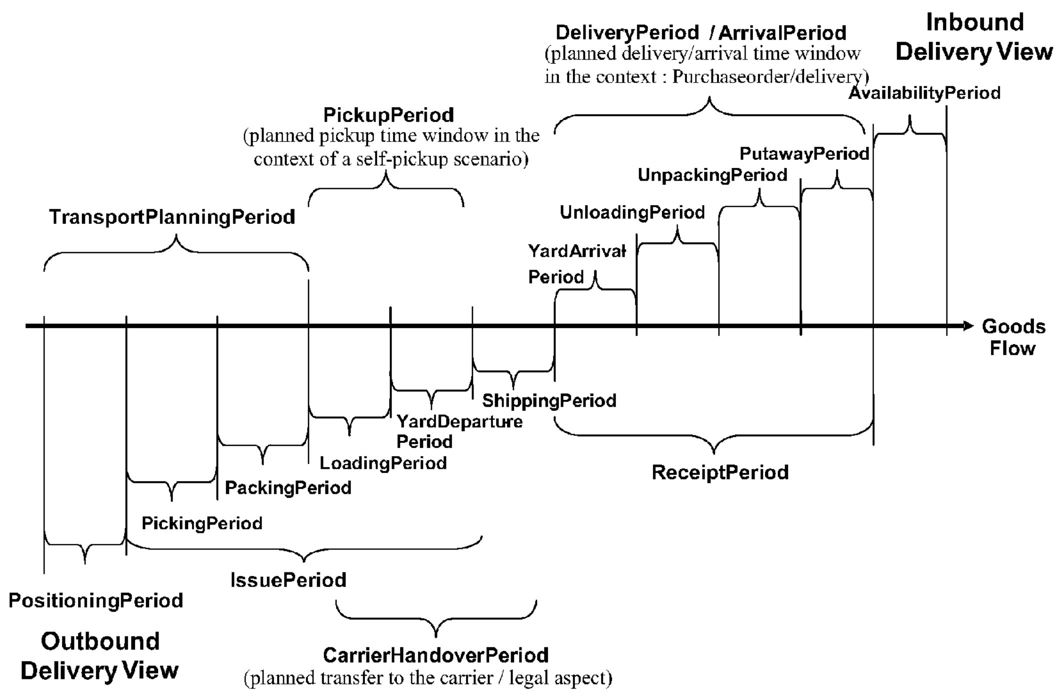
Figure 32B:
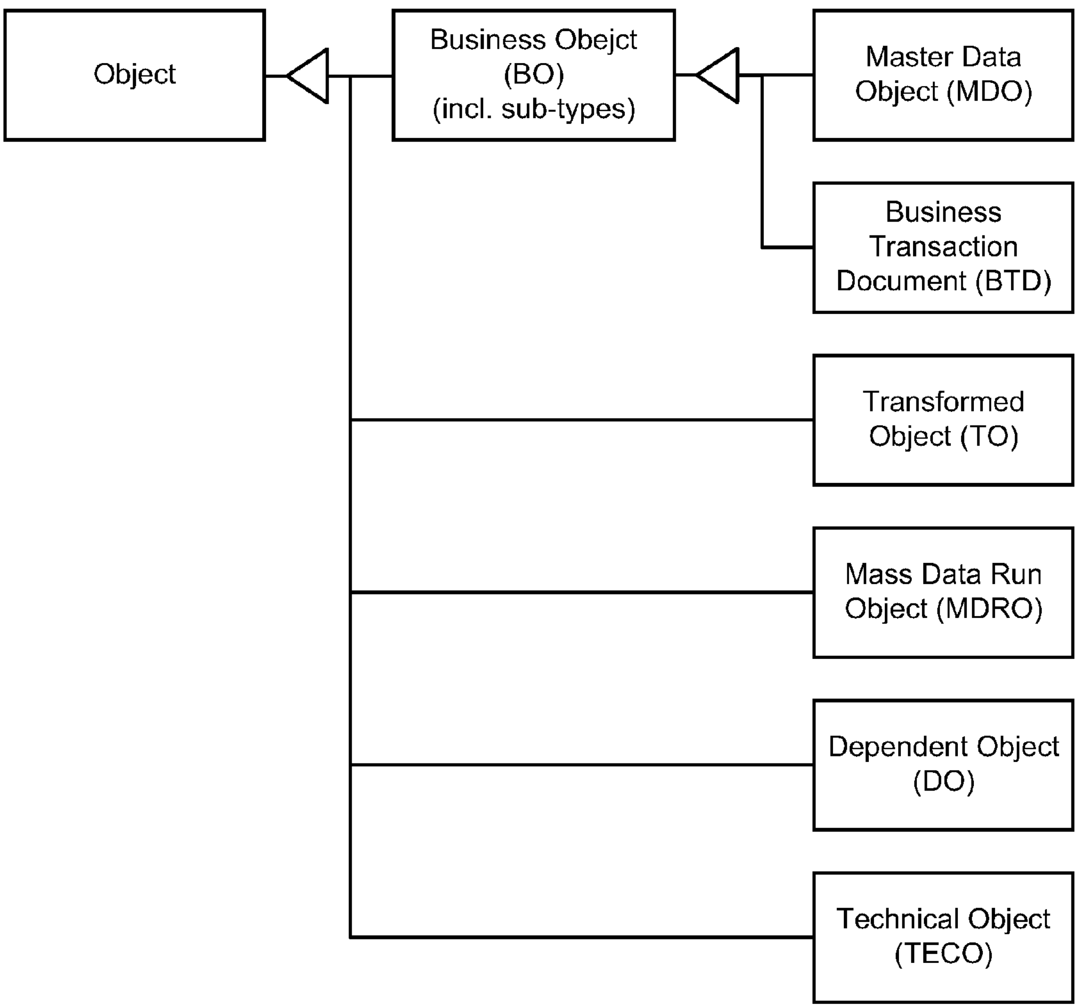
Figure 32D:
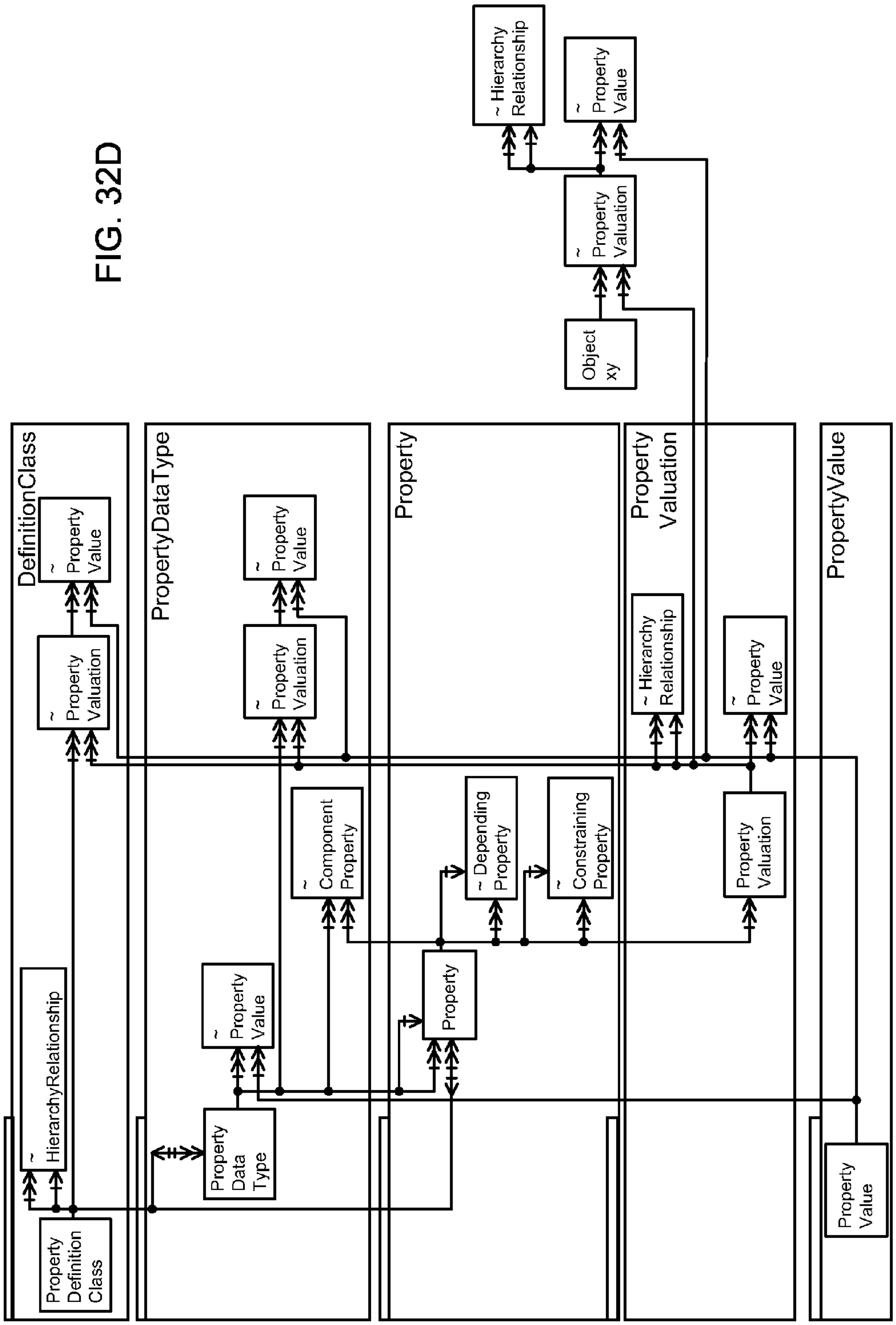
Figure 32E:
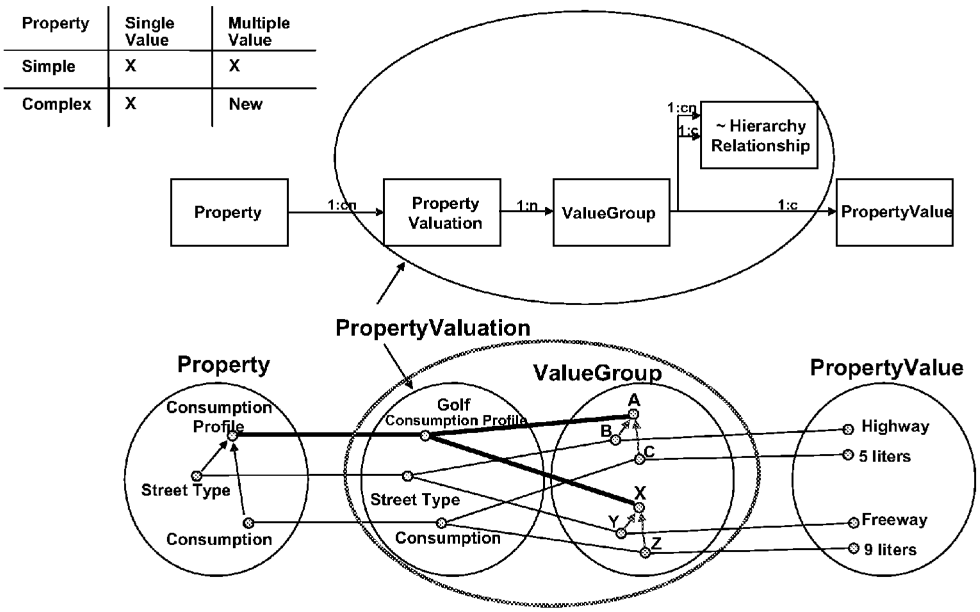
Figures 1, 33:
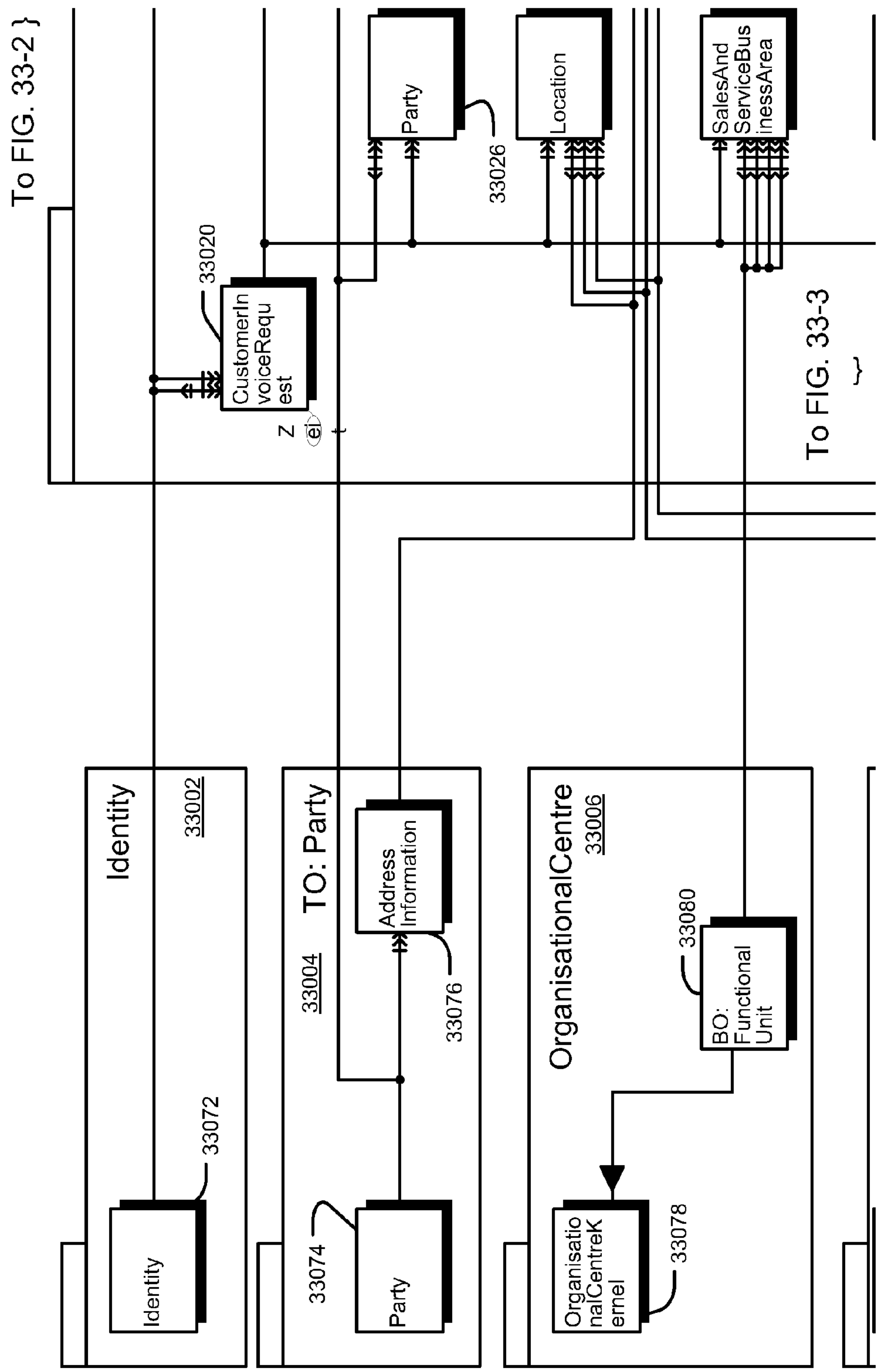
Figures 2, 33:
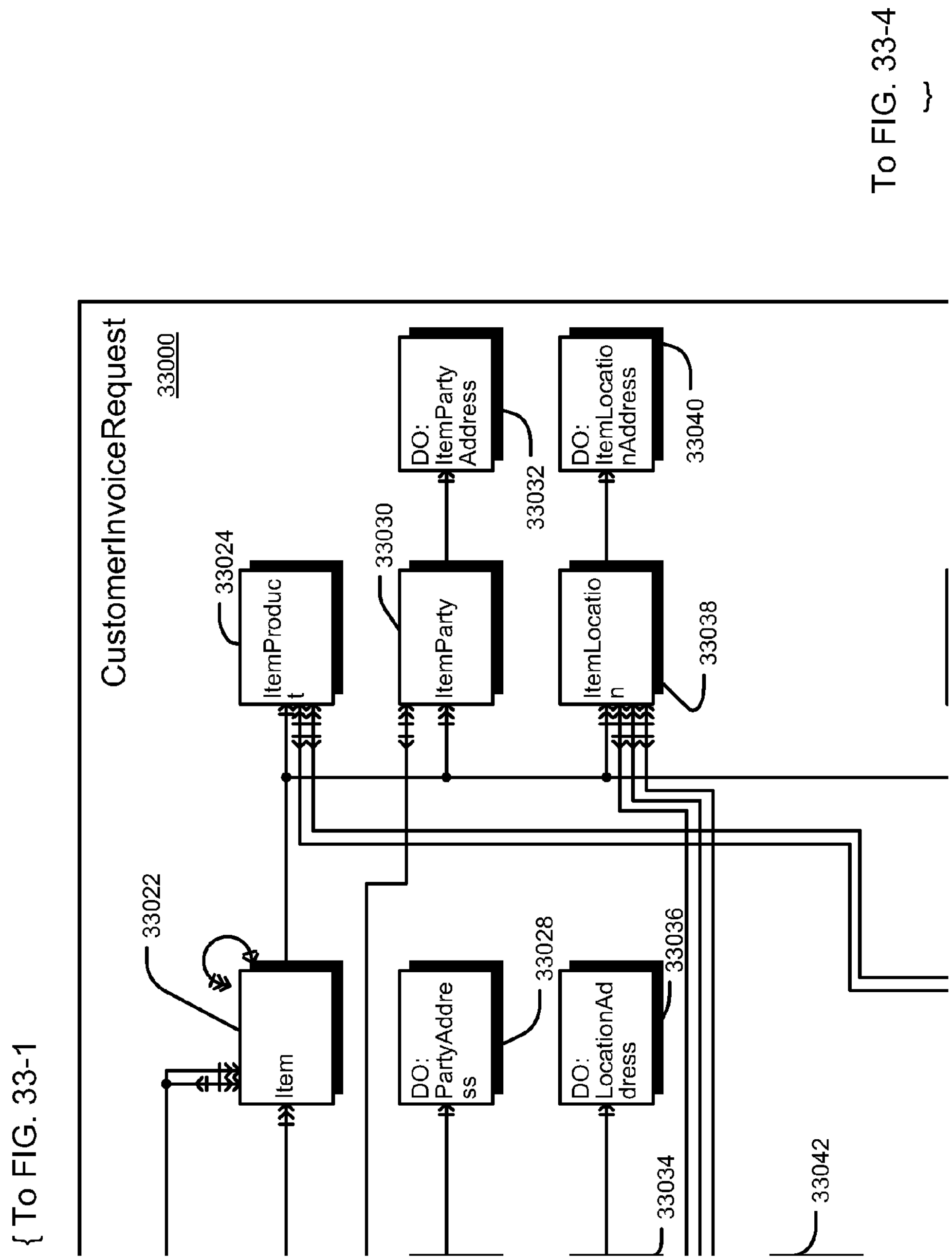
Figures 3, 33:
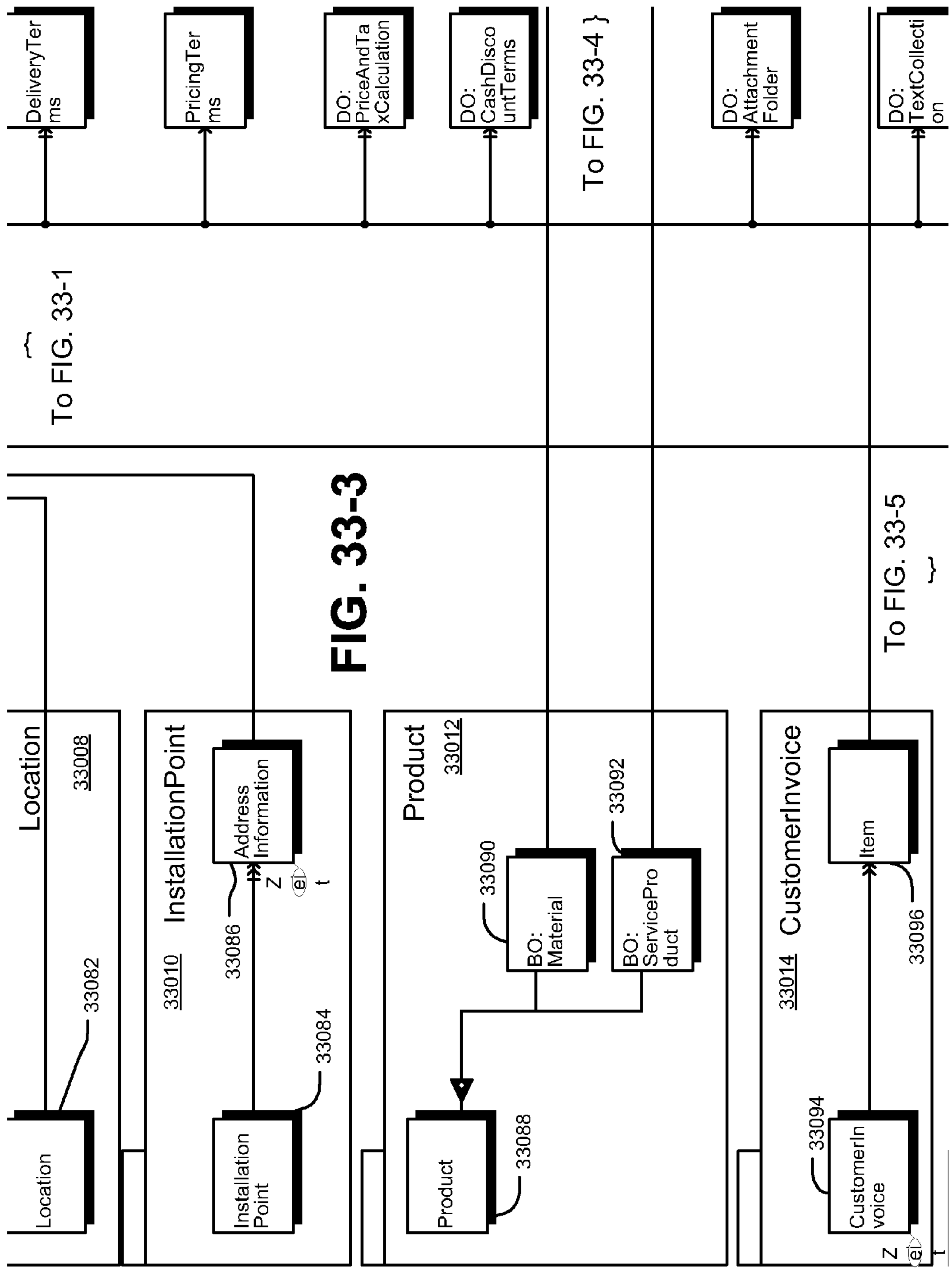
Figures 4, 33:
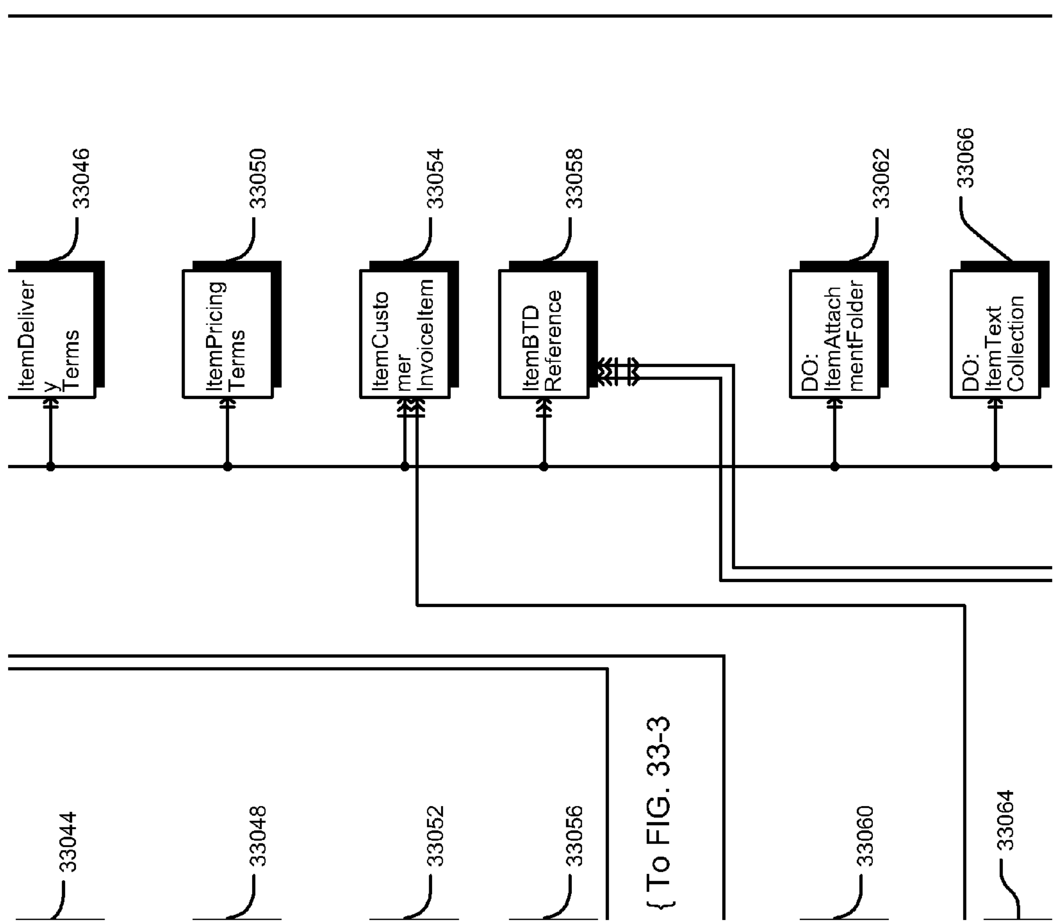
Figures 5, 33:
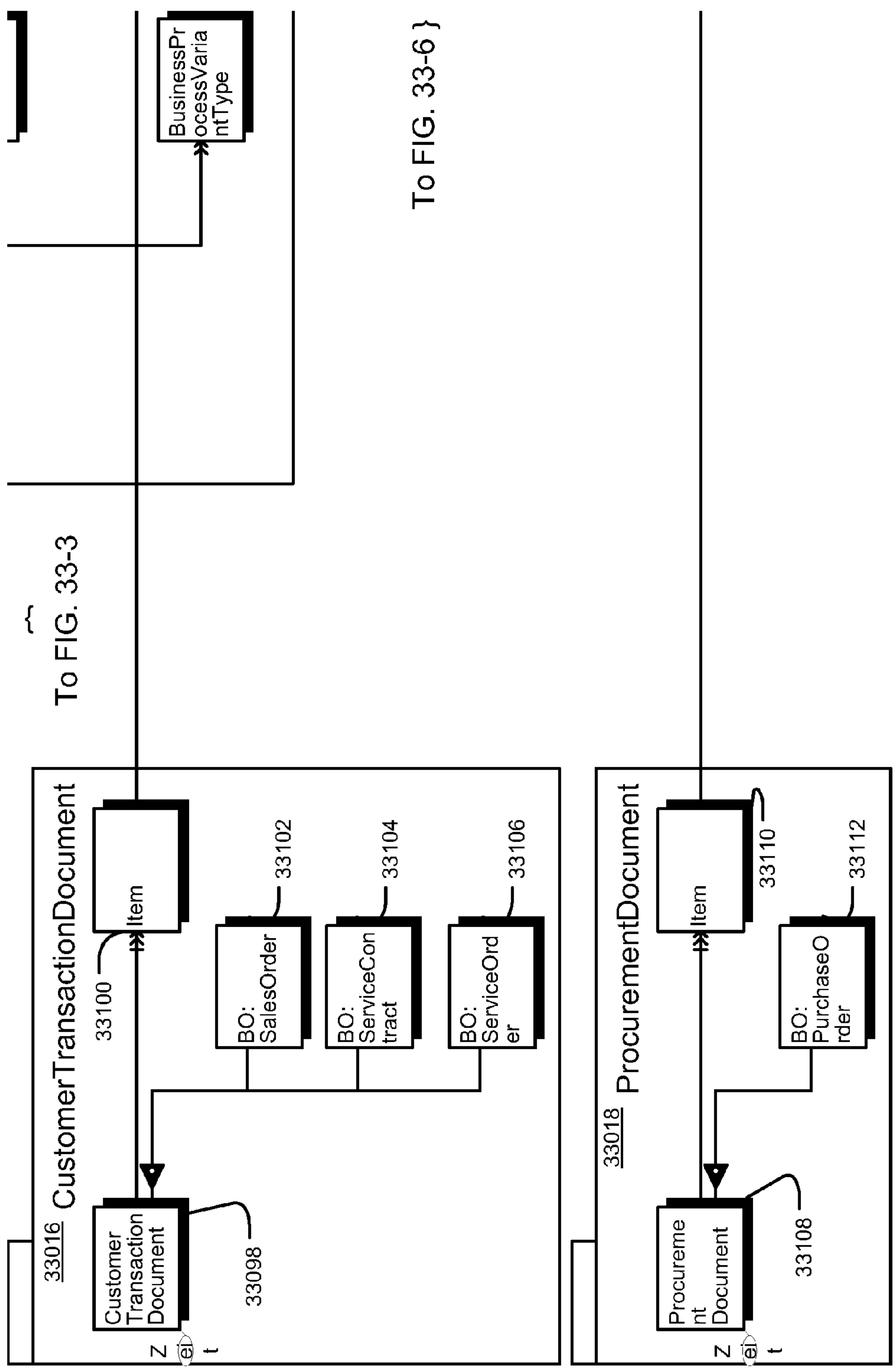
Figures 6, 33:
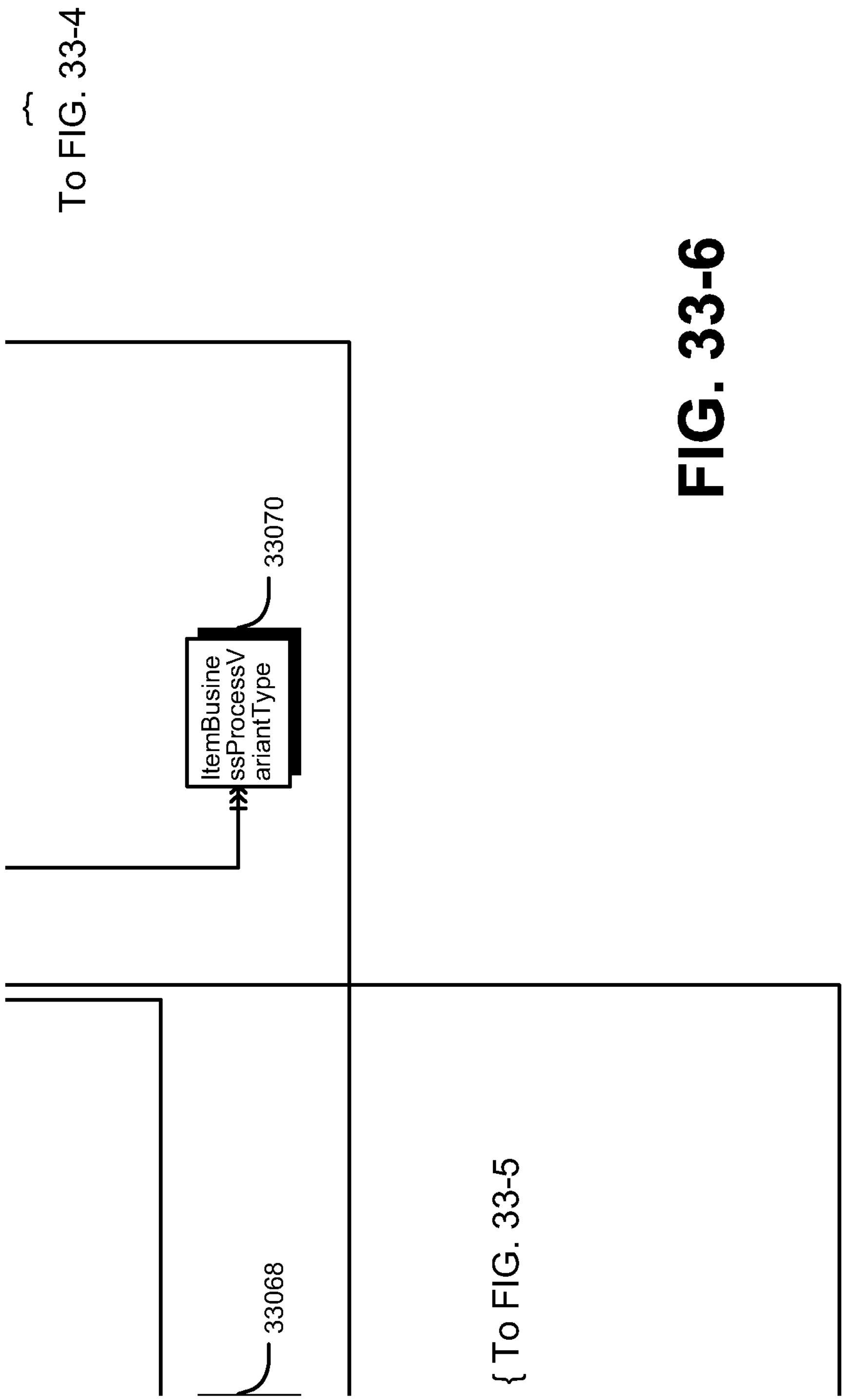
Figure 48:
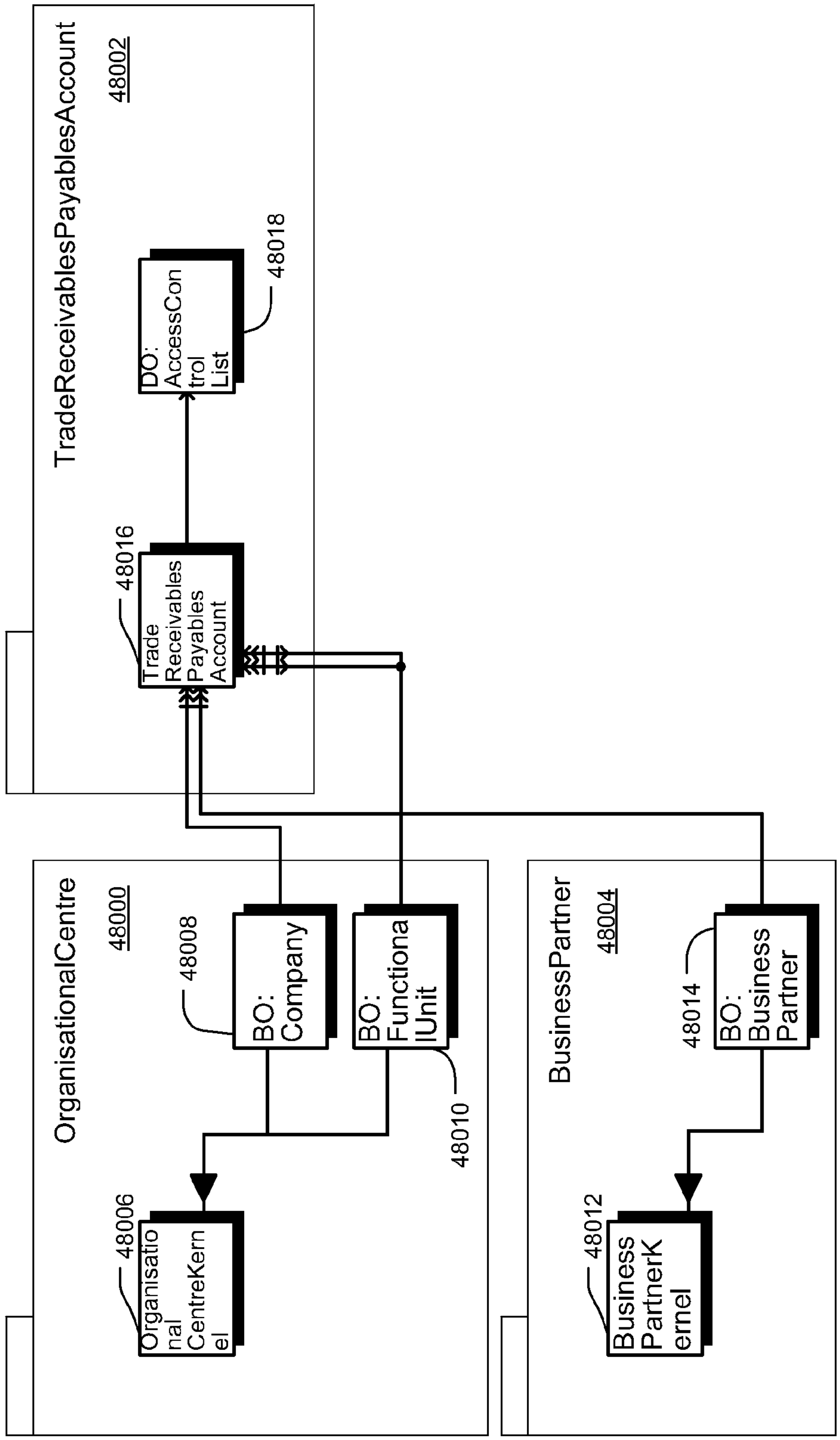
FIG. 48 shows an exemplary TradeReceivablesPayablesAccount object model.
Figure 49:
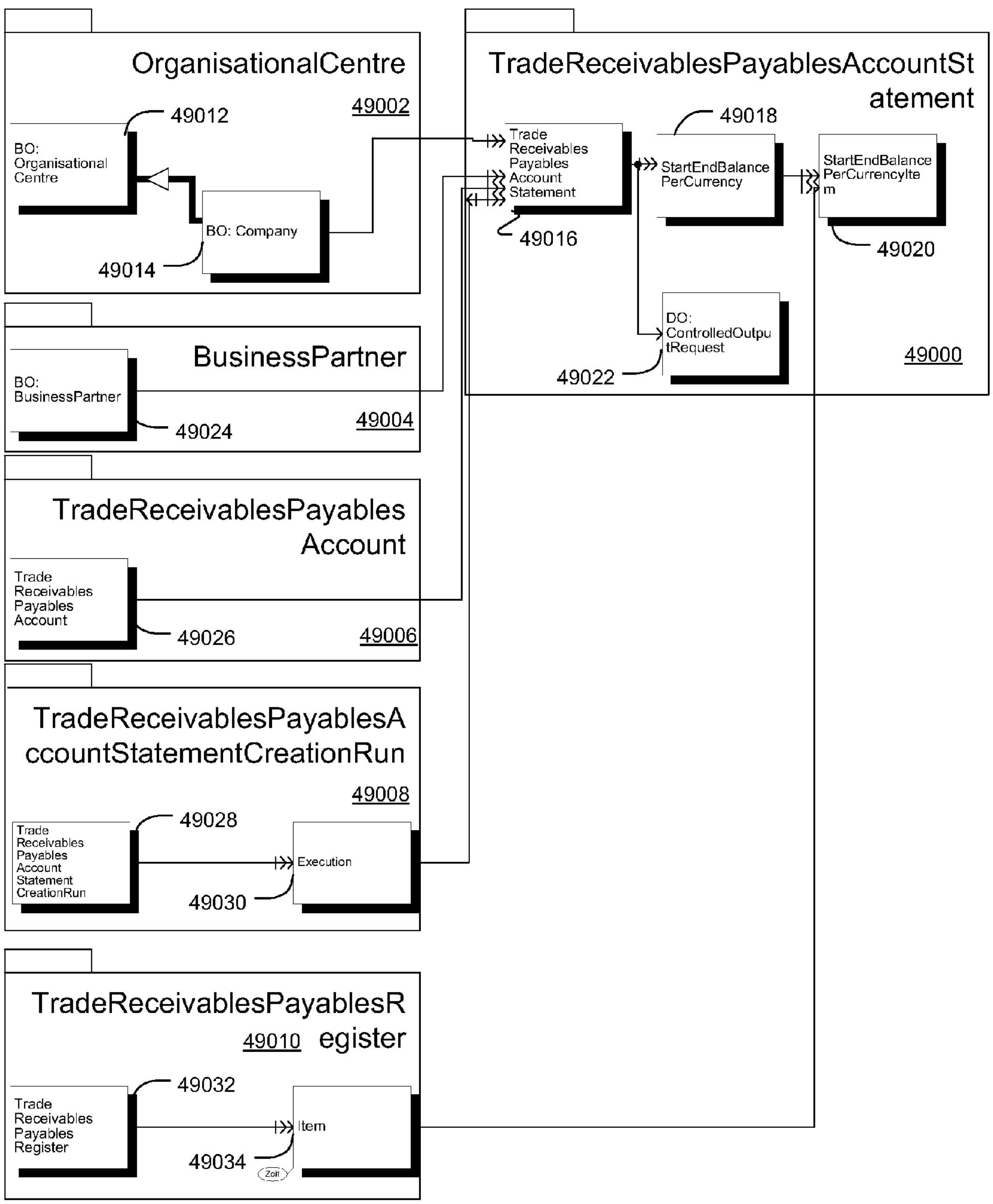
FIG. 49 shows an exemplary TradeReceivablesPayablesAccountStatement object model.
Figures 1, 55:
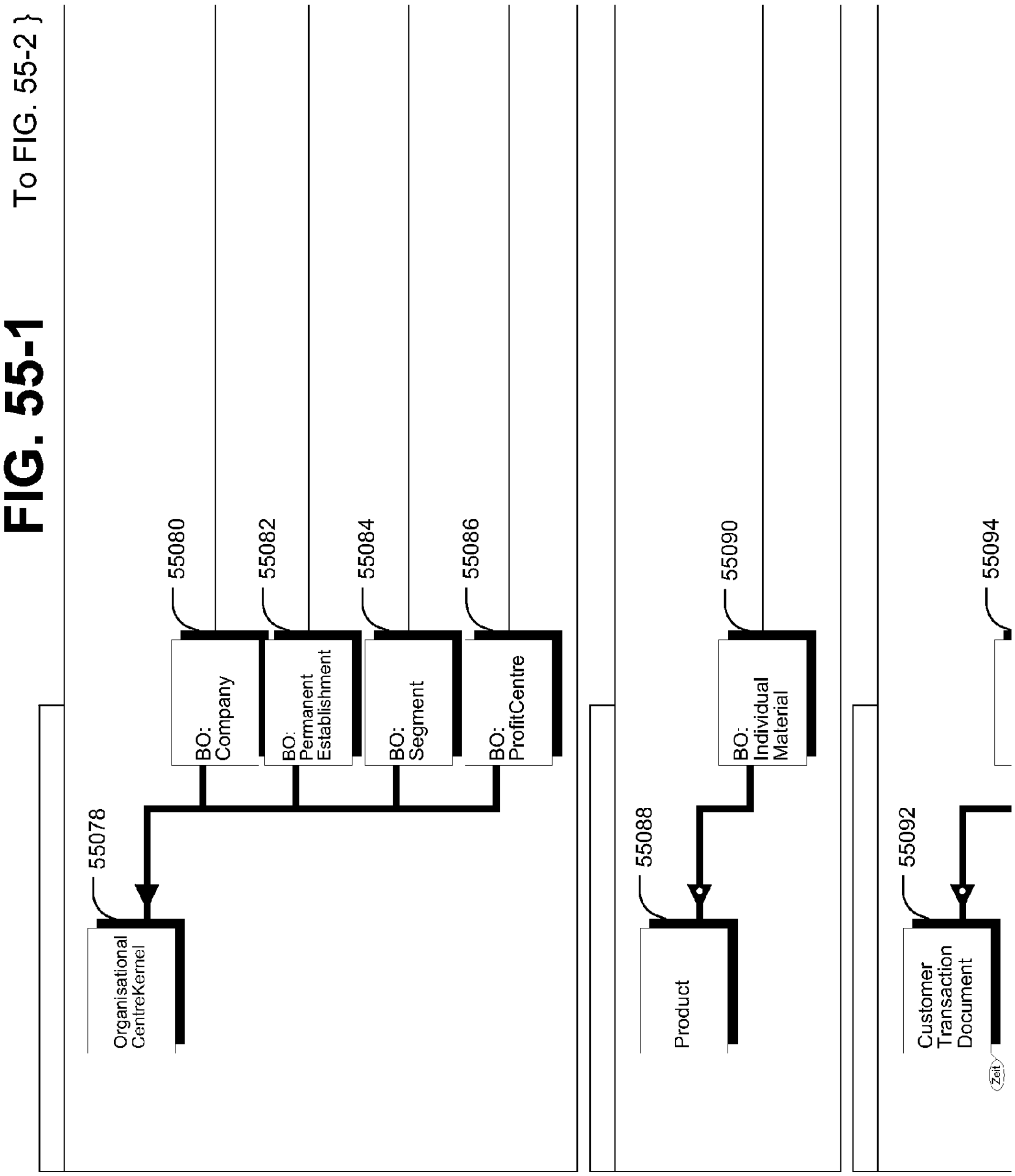
Figures 2, 55:
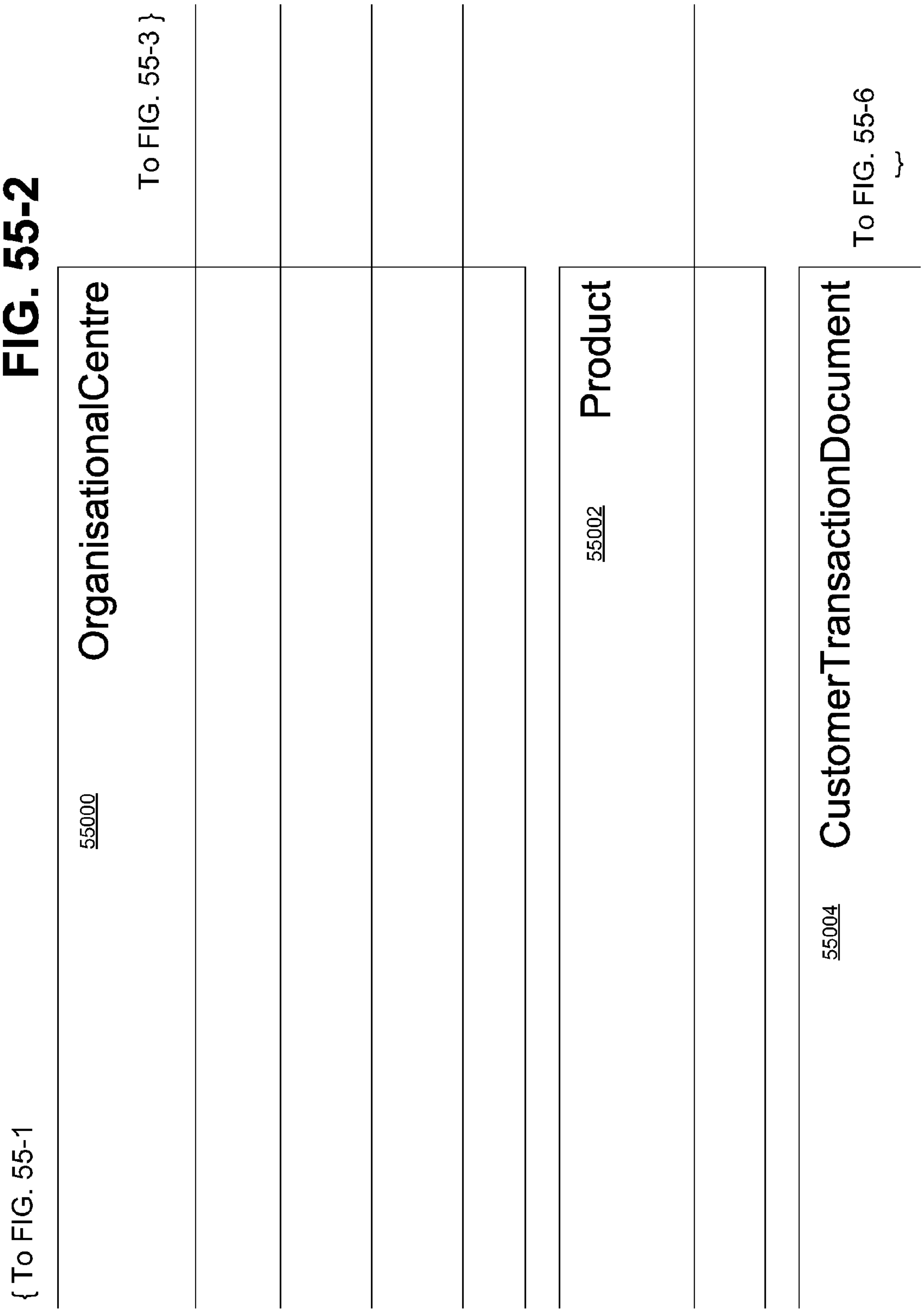
Figures 3, 55:
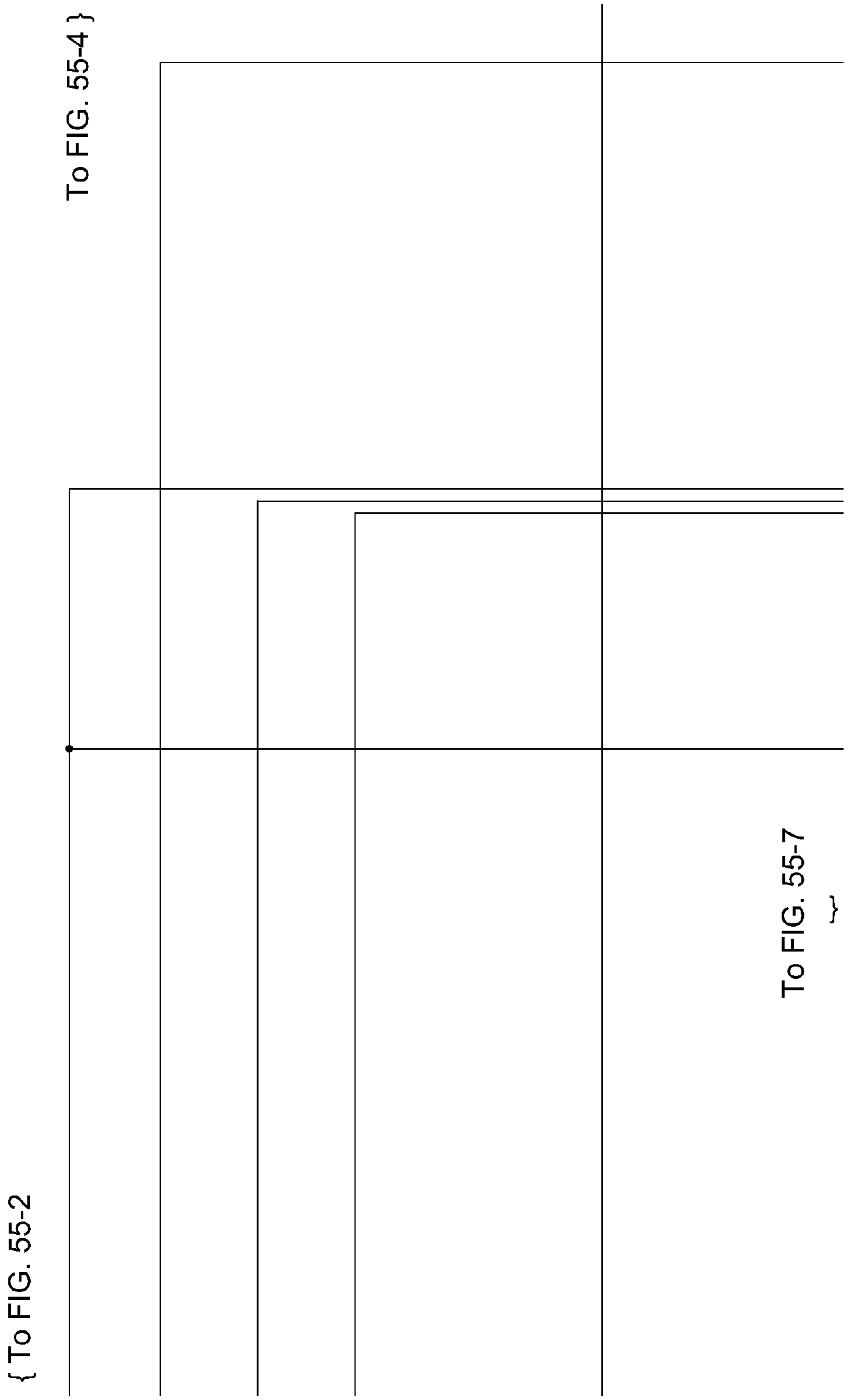
Figures 5, 55:
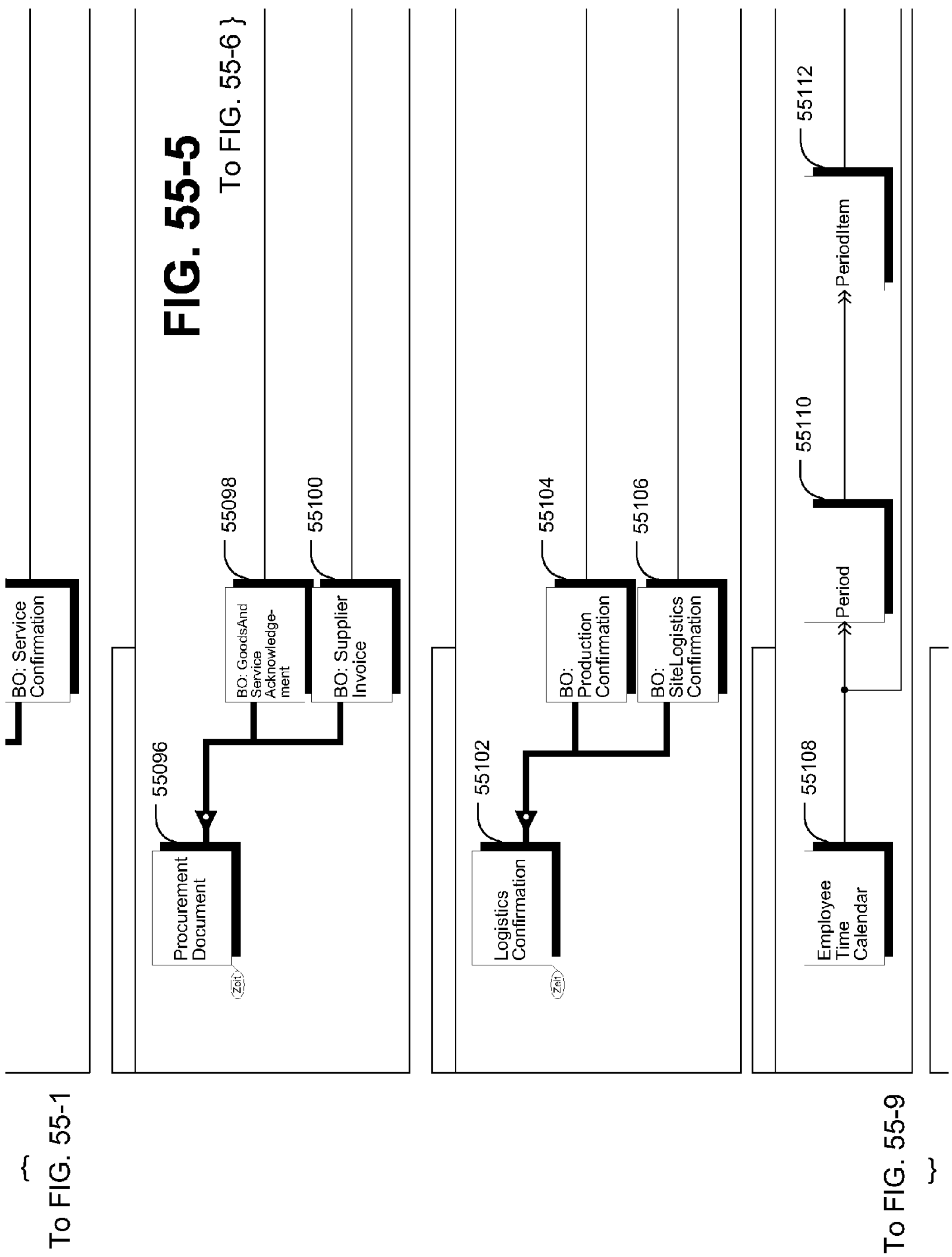
Figures 6, 55:
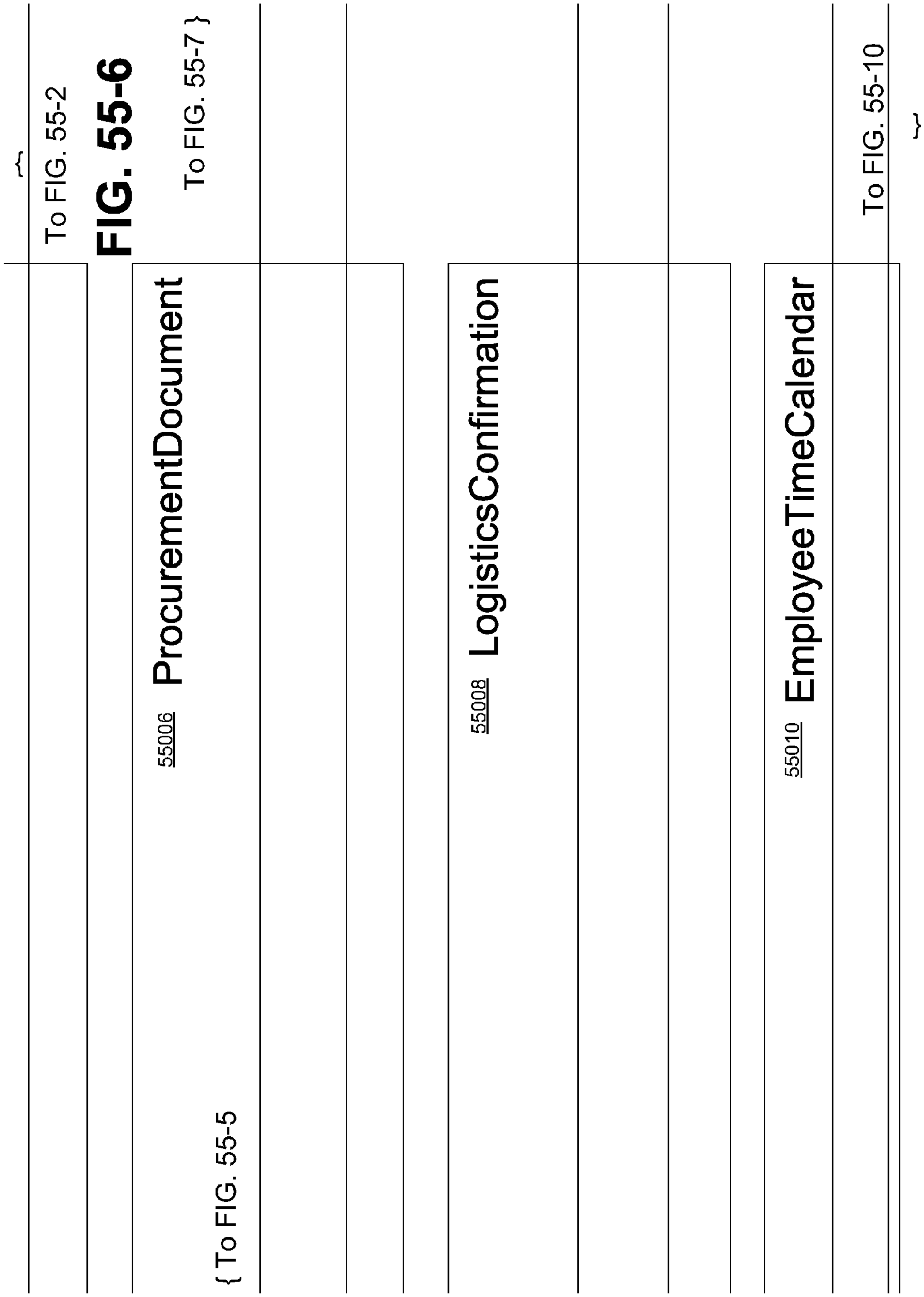
Figures 7, 55:
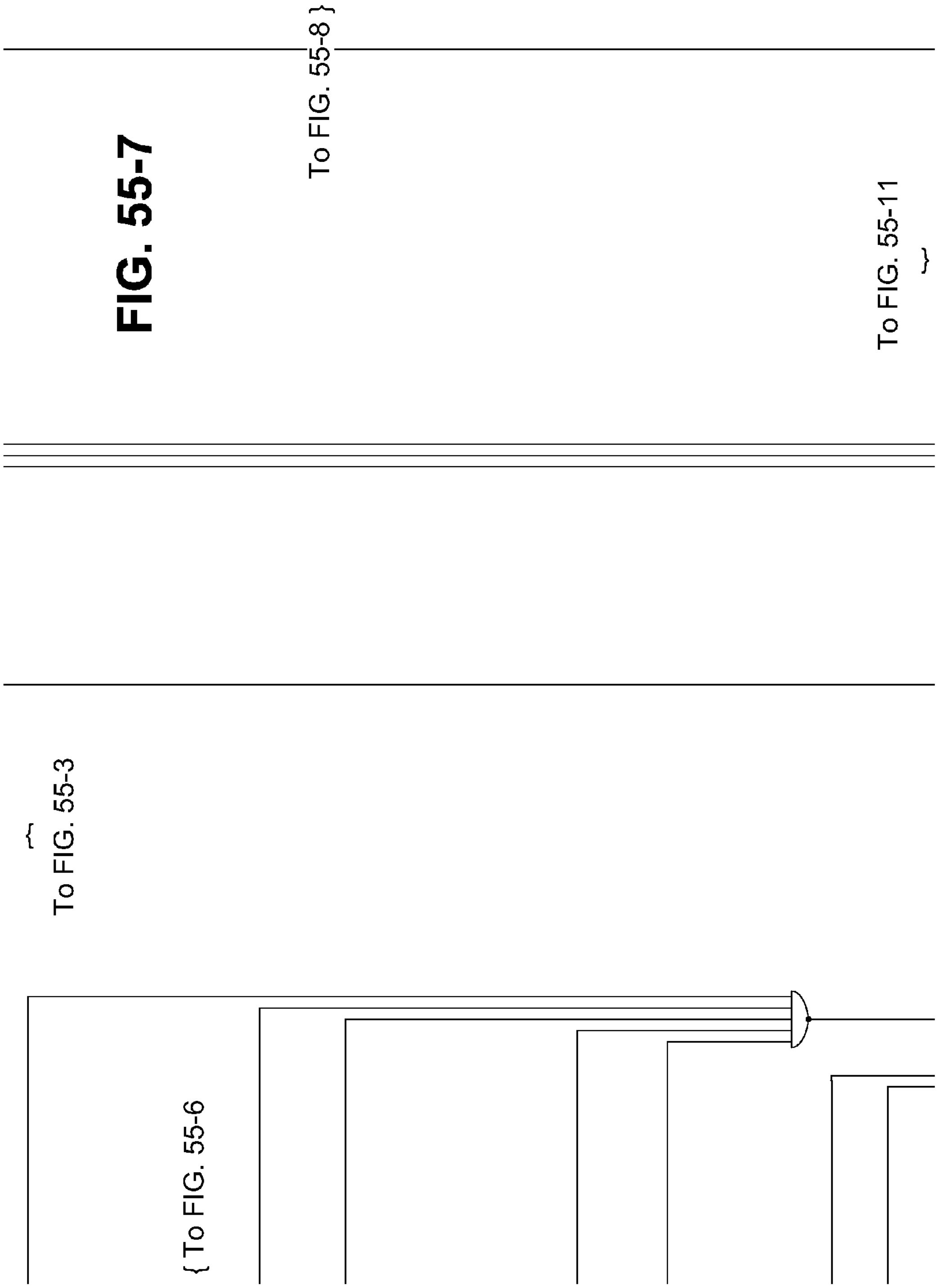
Figures 9, 55:
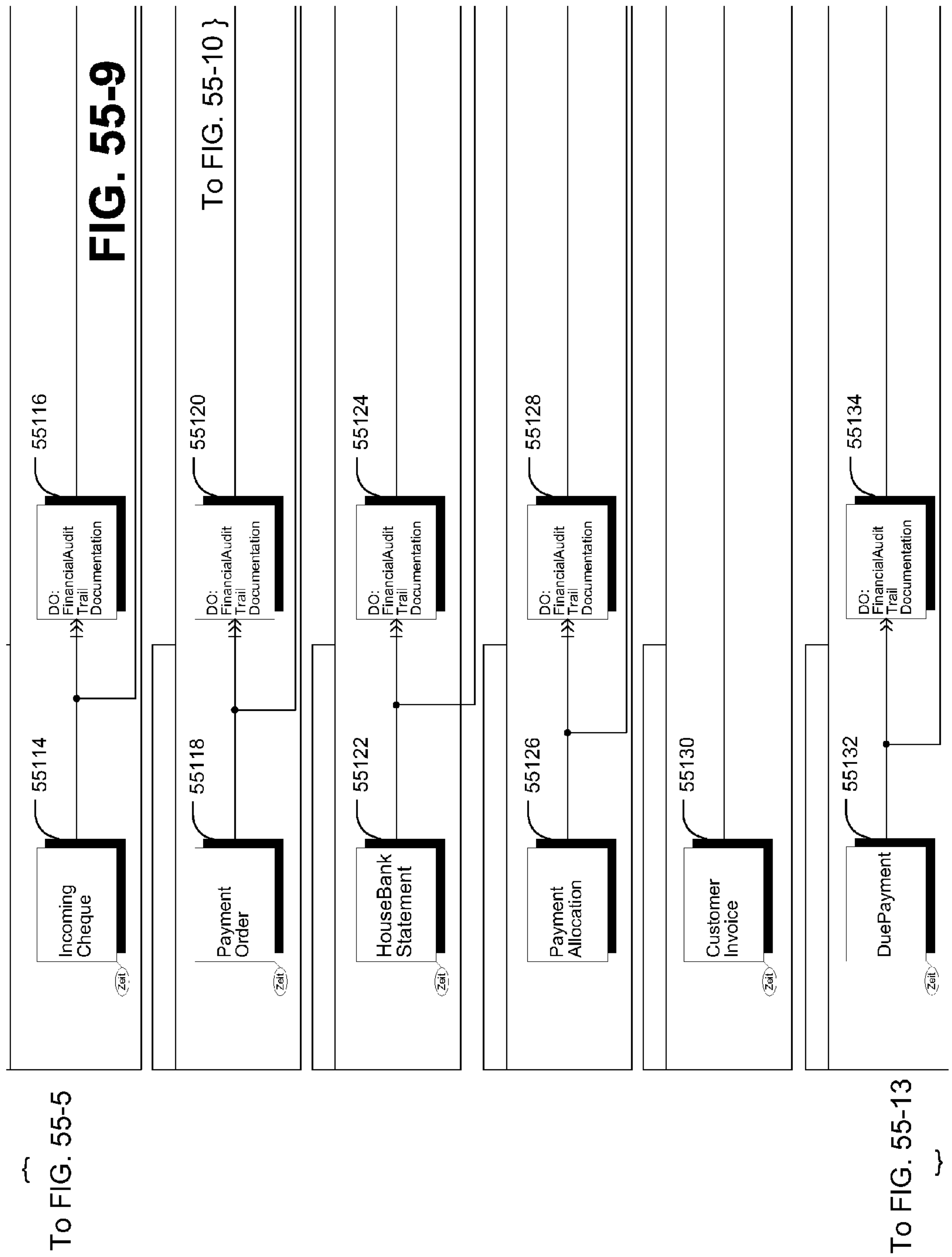
Figures 10, 55:
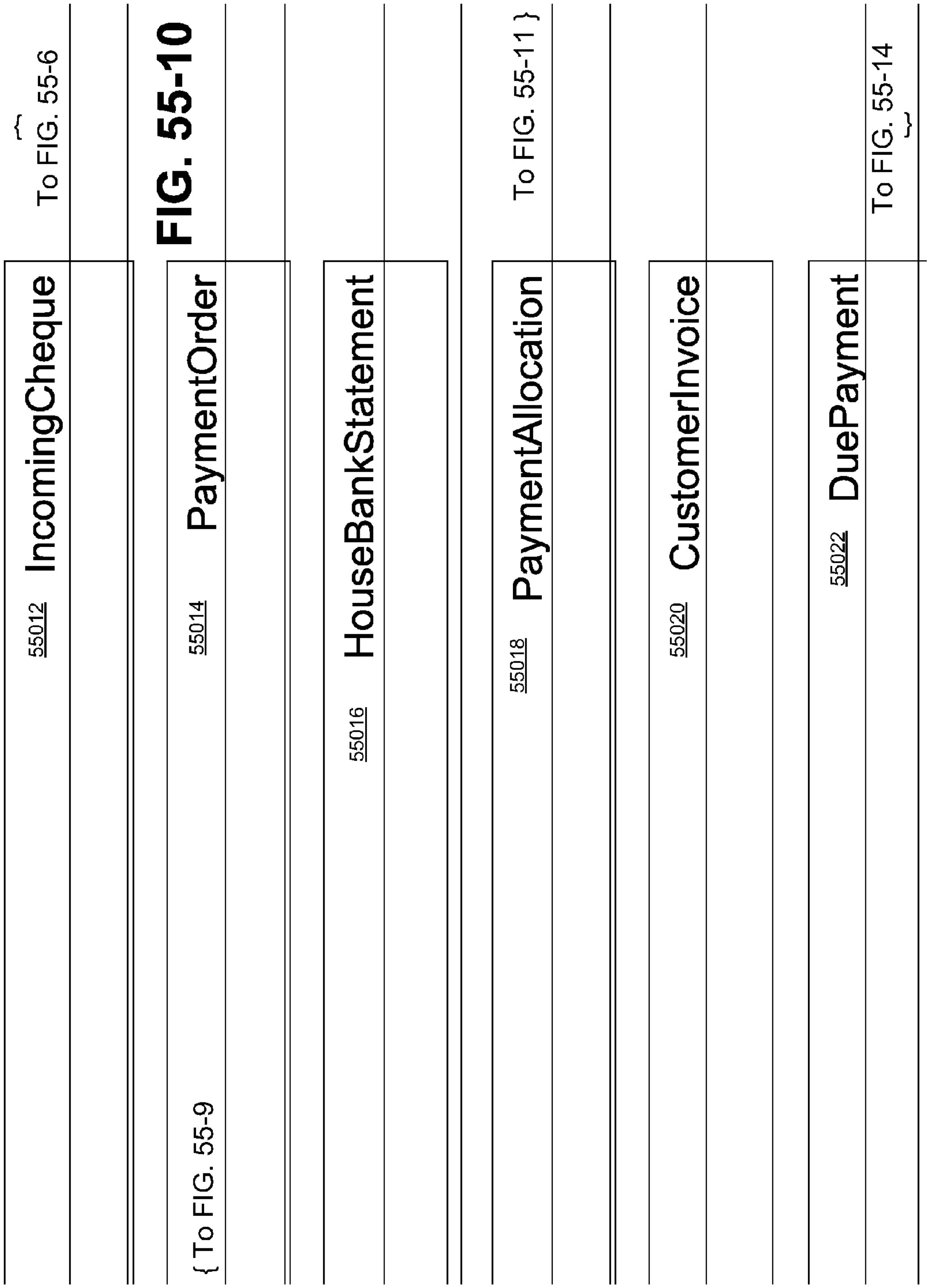
Figures 11, 55:
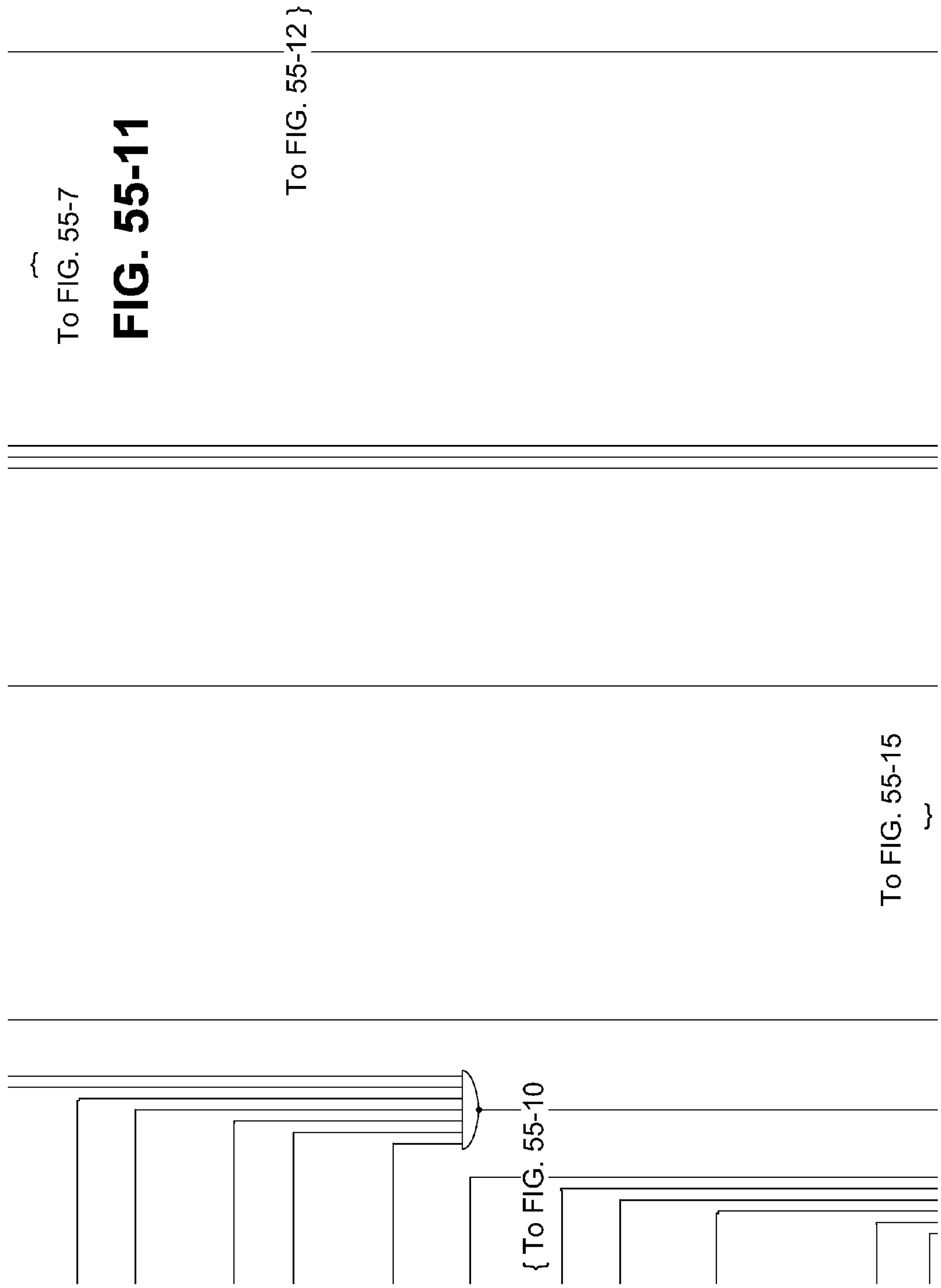
Figures 13, 55:
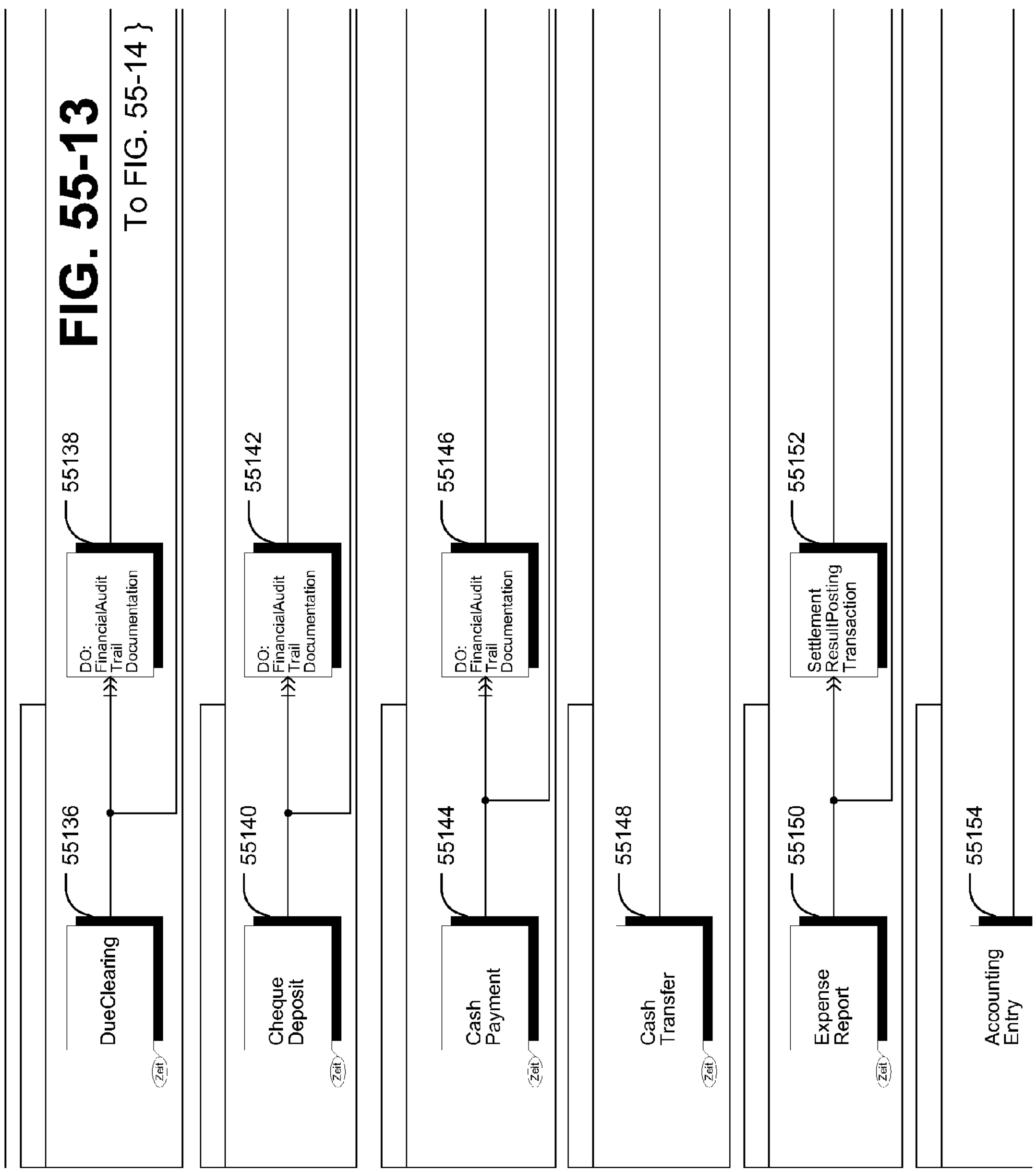
Figures 14, 55:
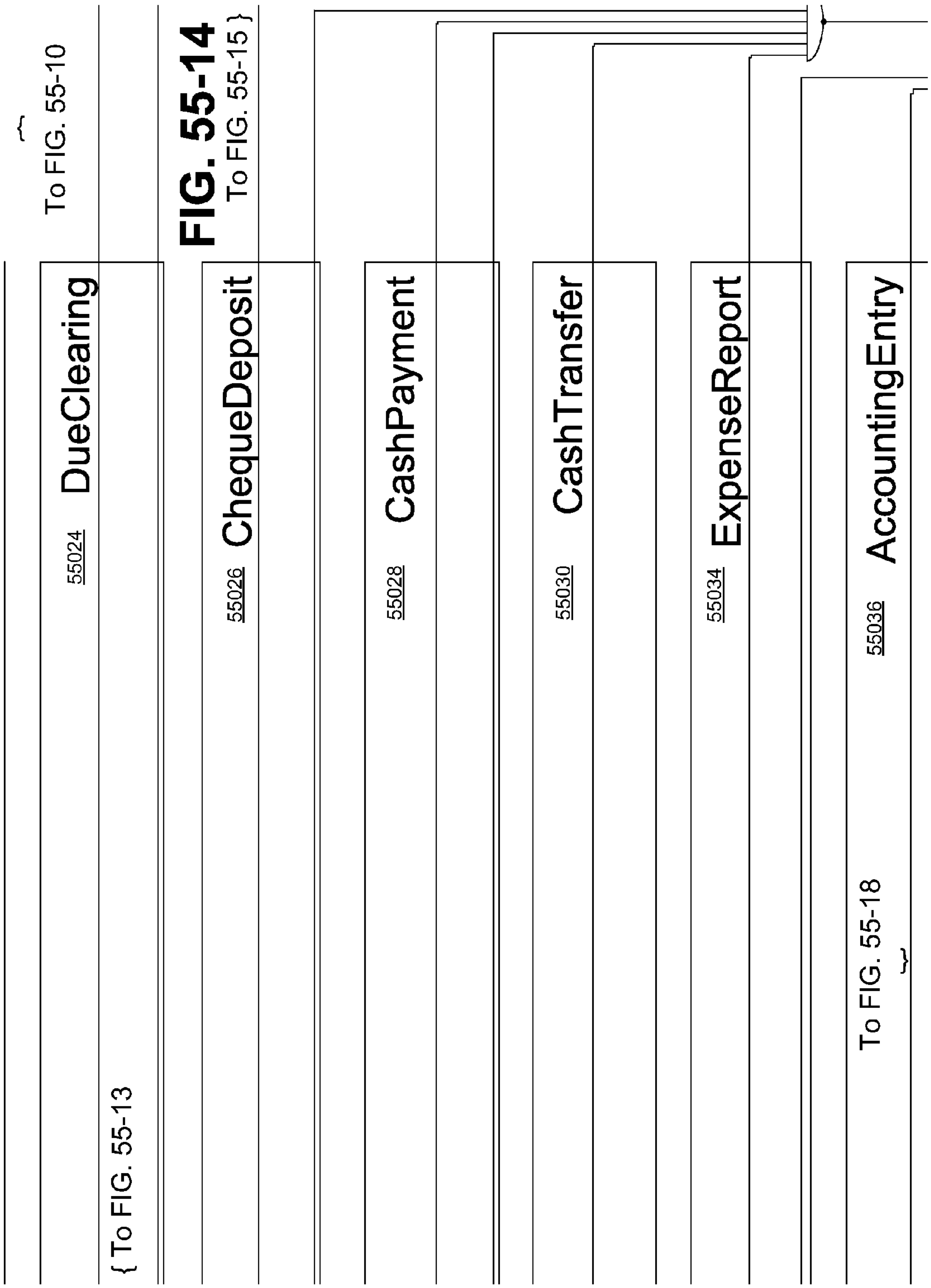
Figures 15, 55:
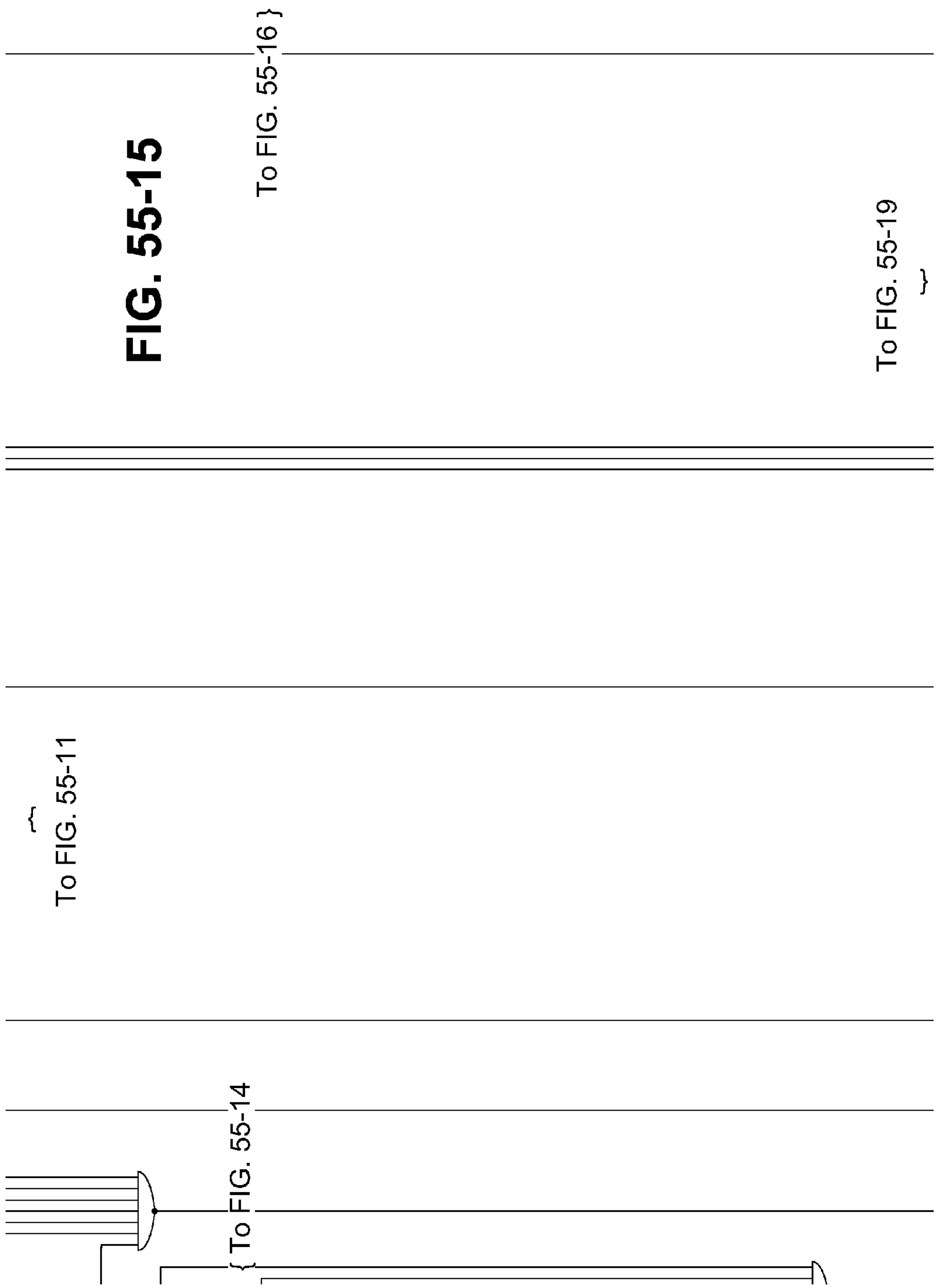
Figures 17, 55:
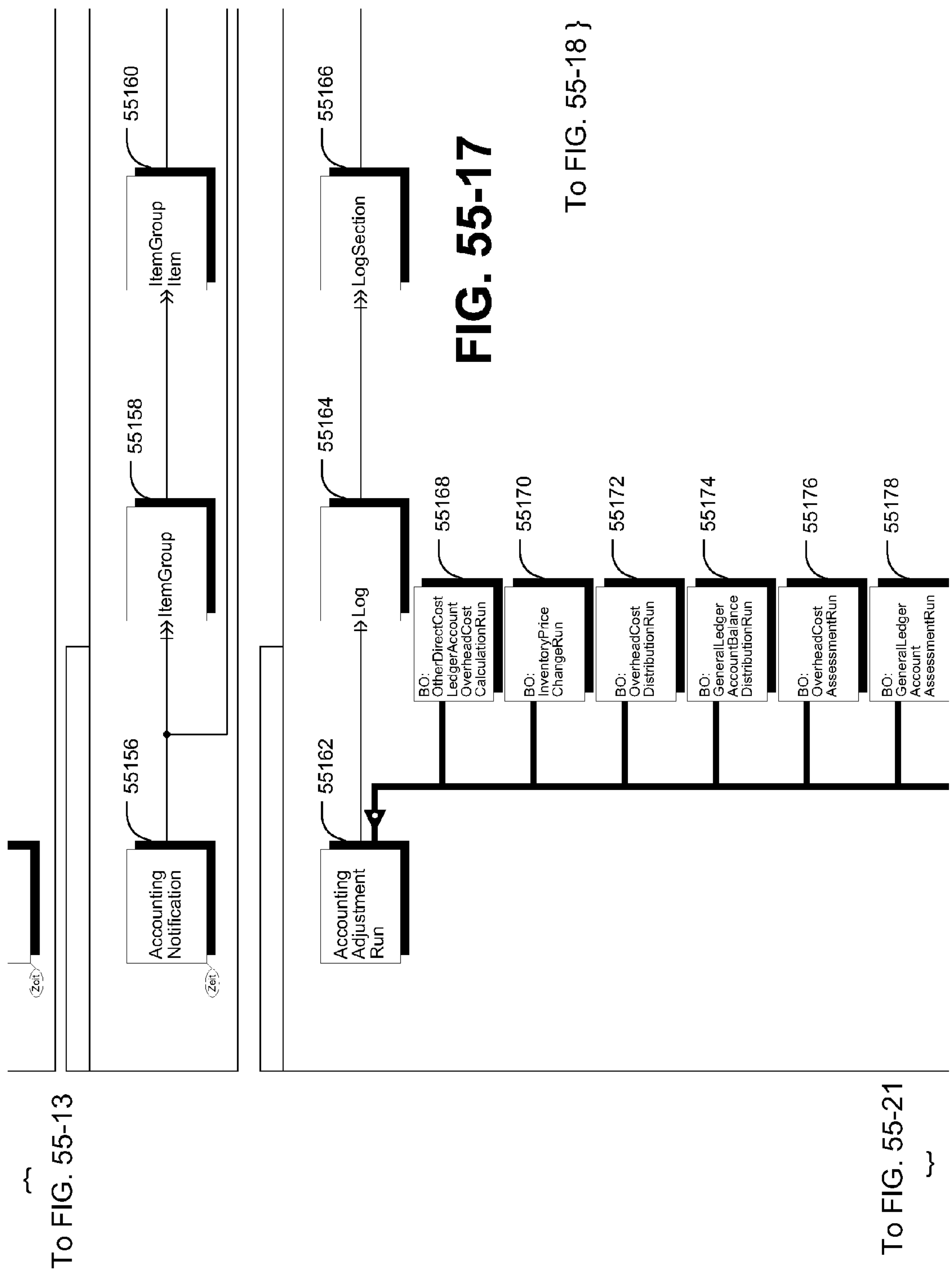
Figures 18, 55:
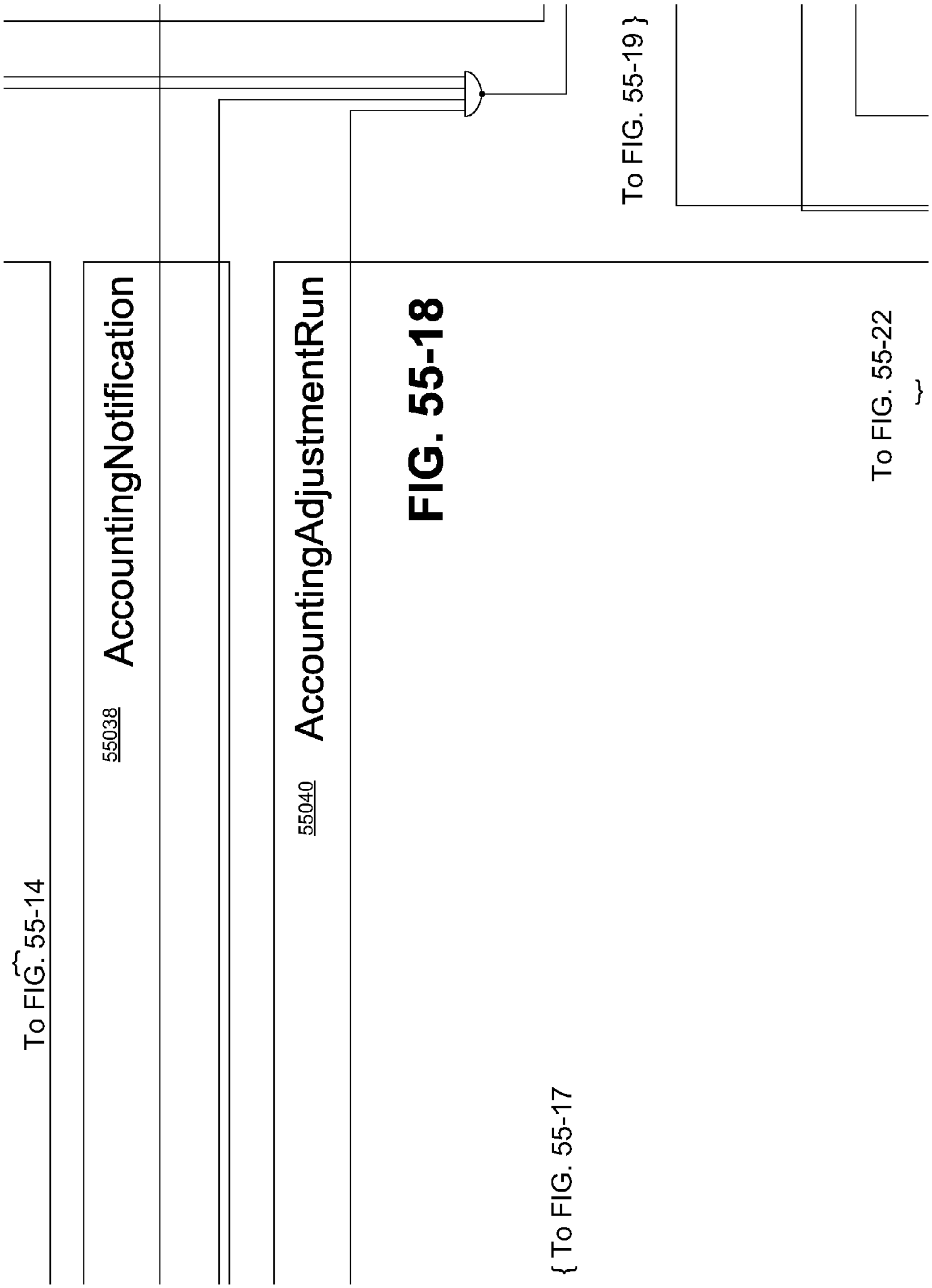
Figures 19, 55:
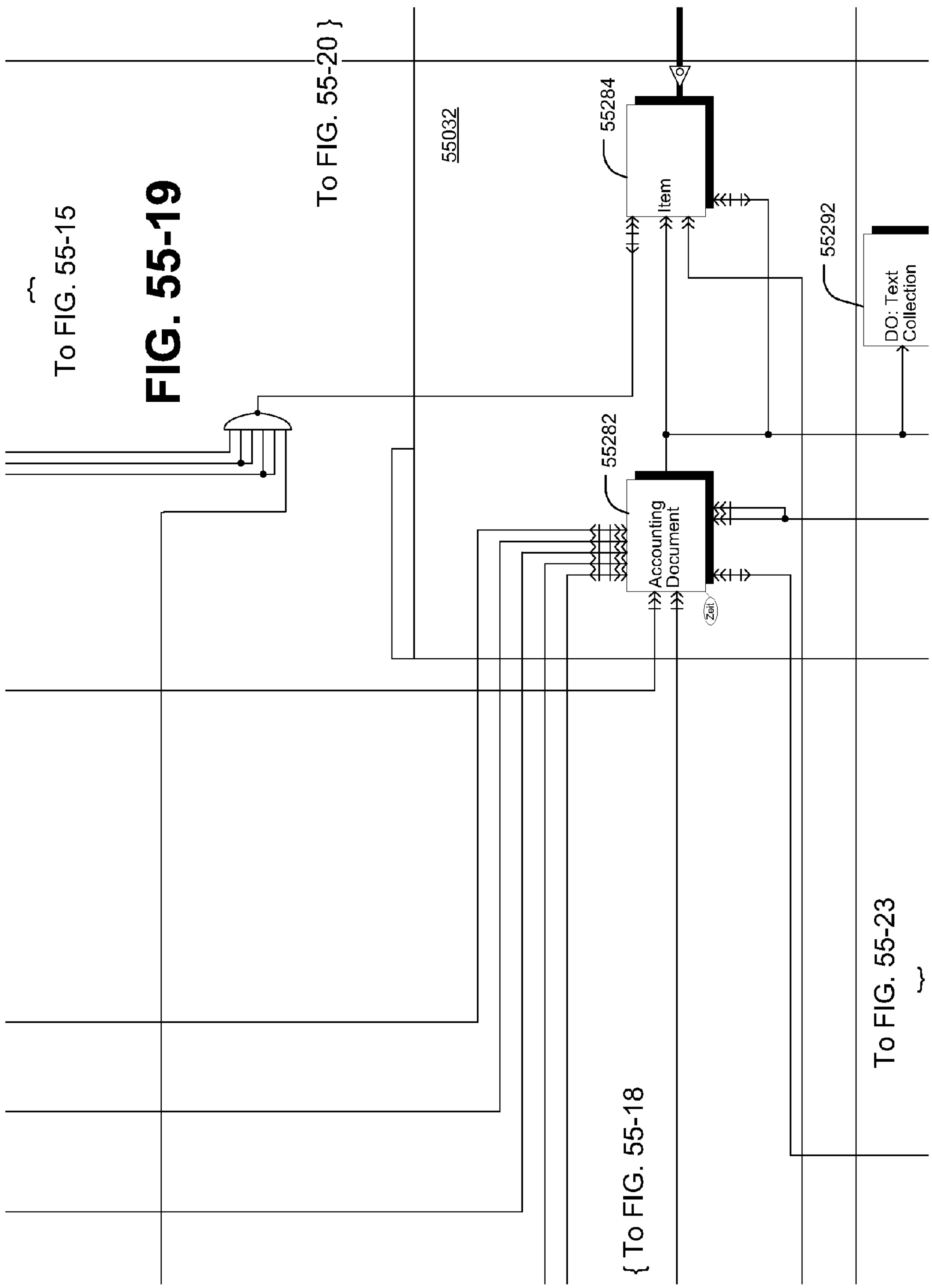
Figures 20, 55:
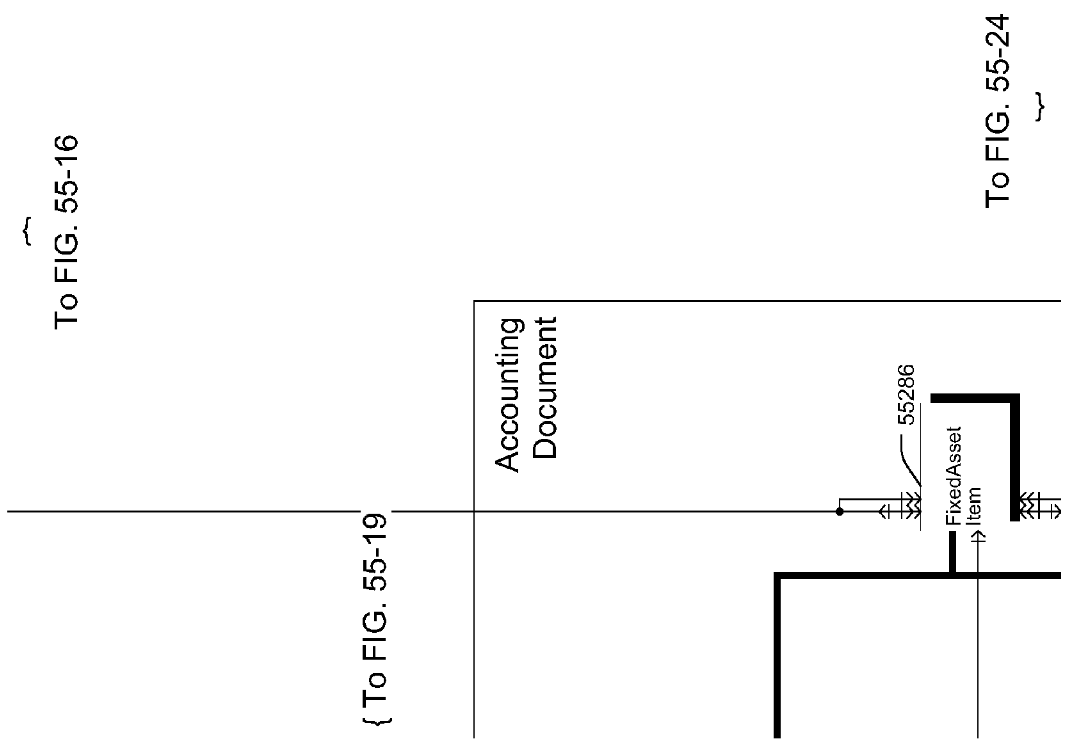
Figures 21, 55:
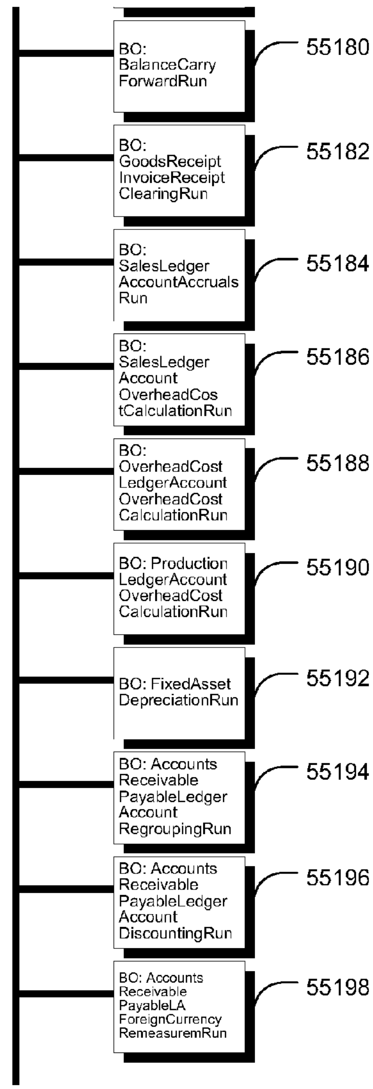
Figures 22, 55:
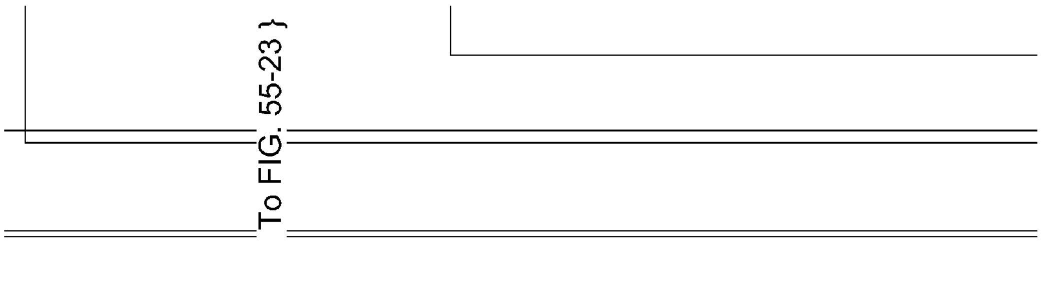
Figures 23, 55:
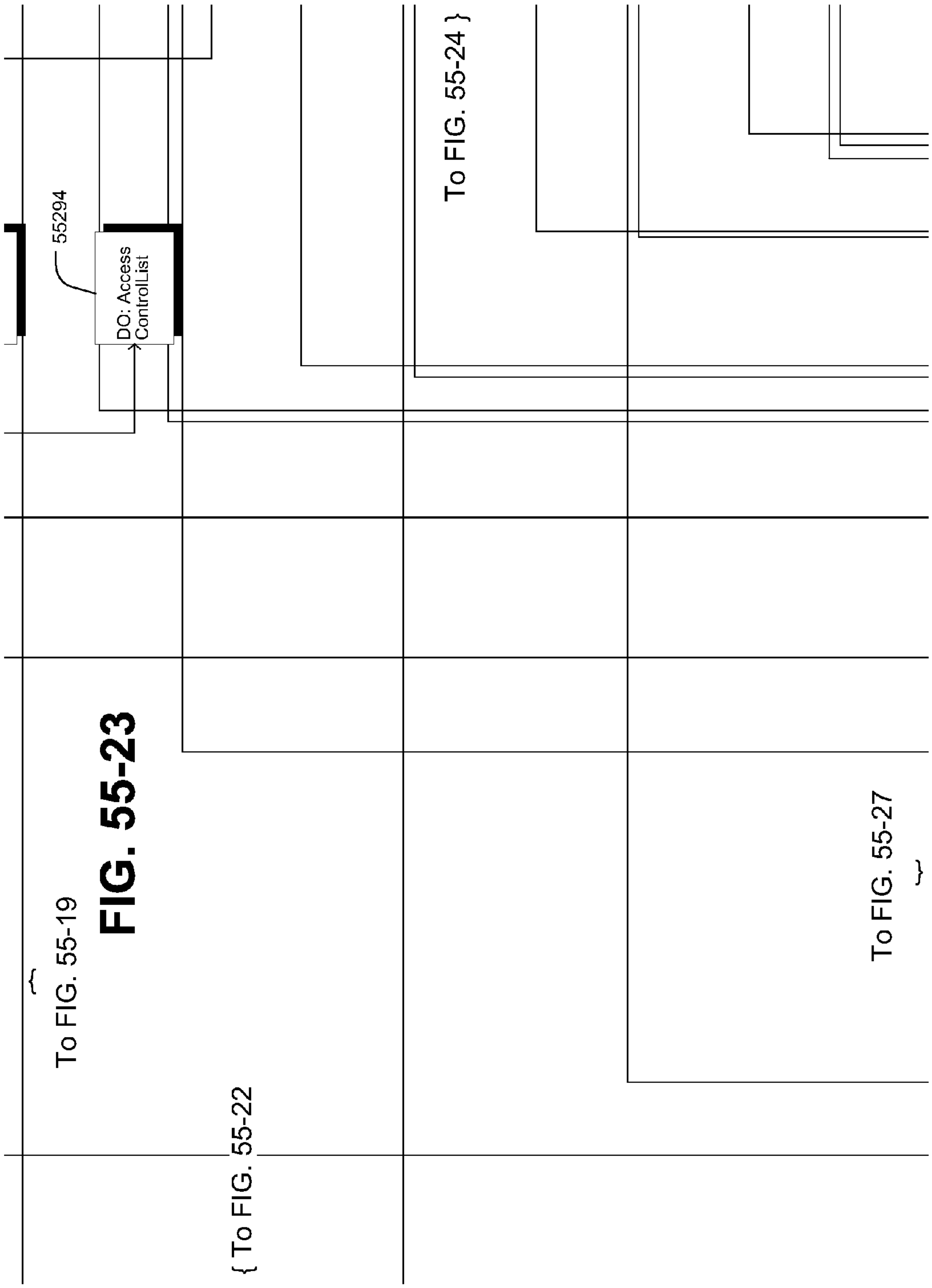
Figures 24, 55:
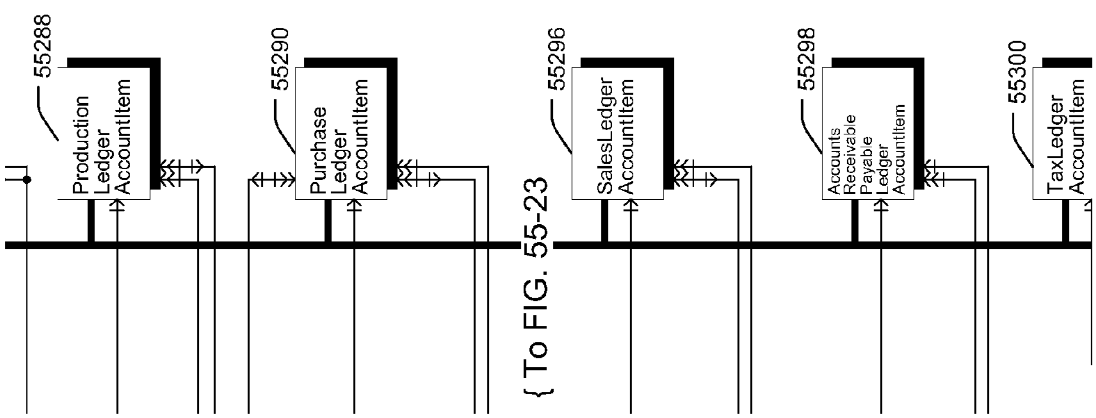
Figures 25, 55:
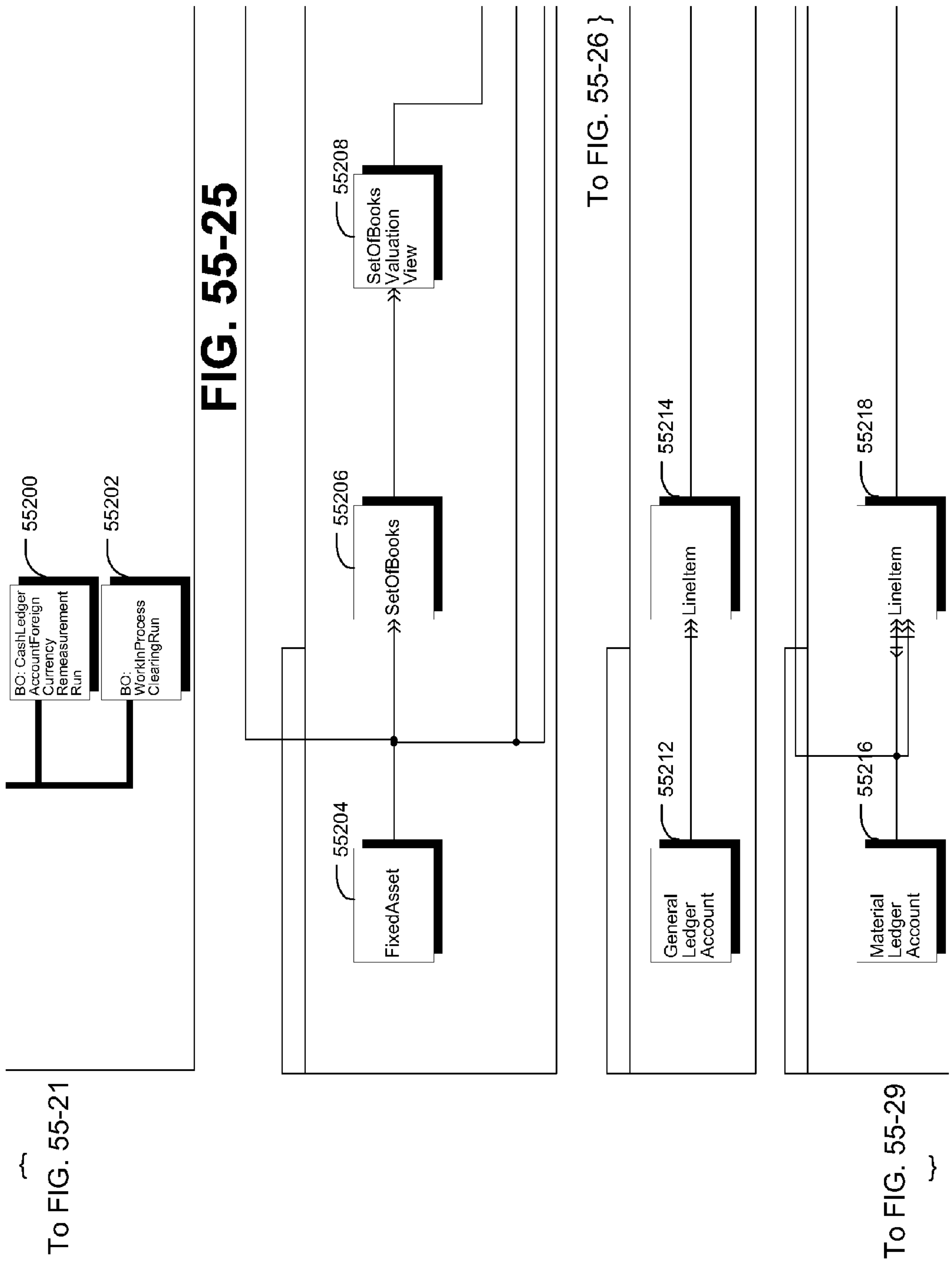
Figures 26, 55:
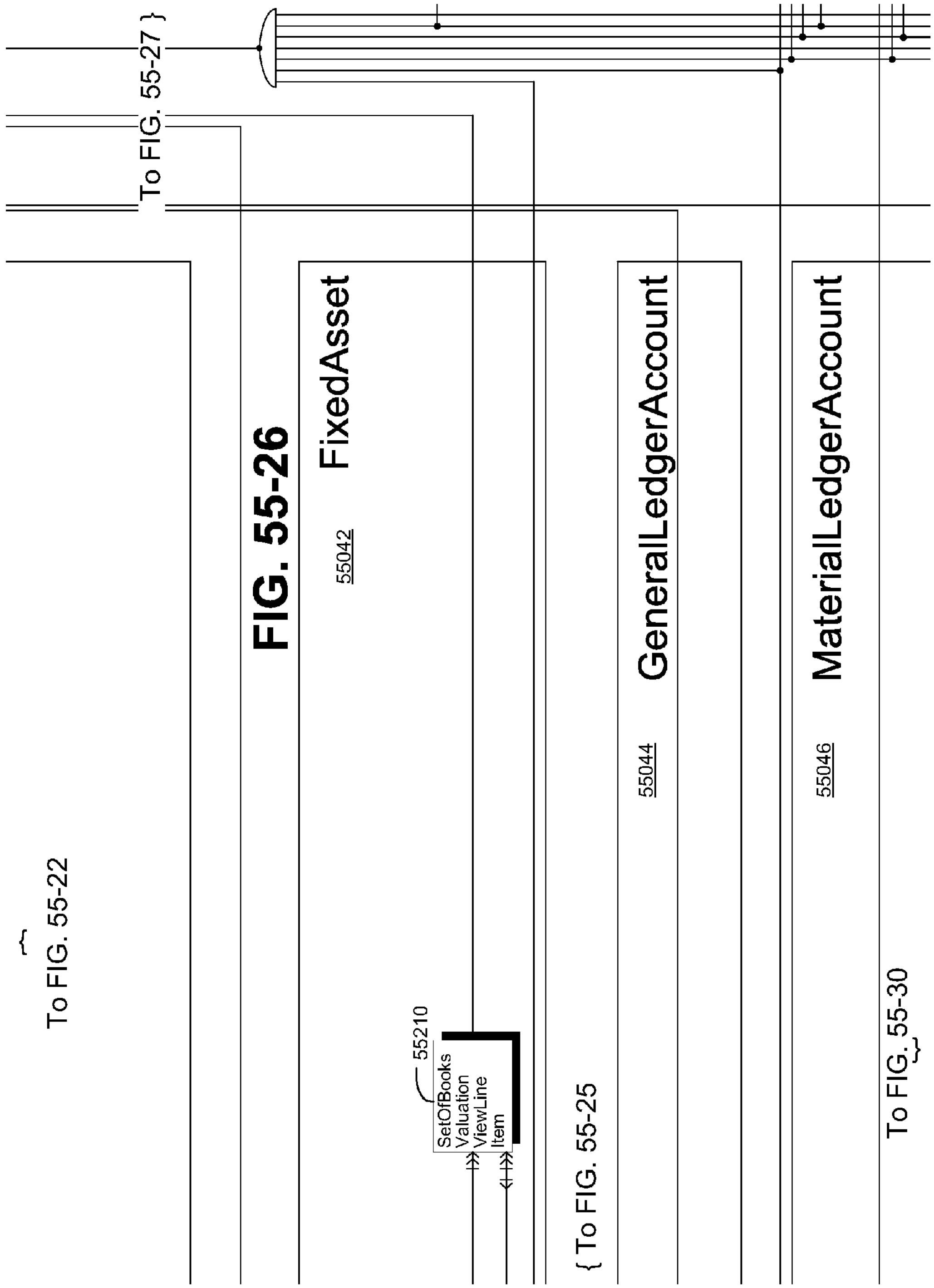
Figures 27, 55:
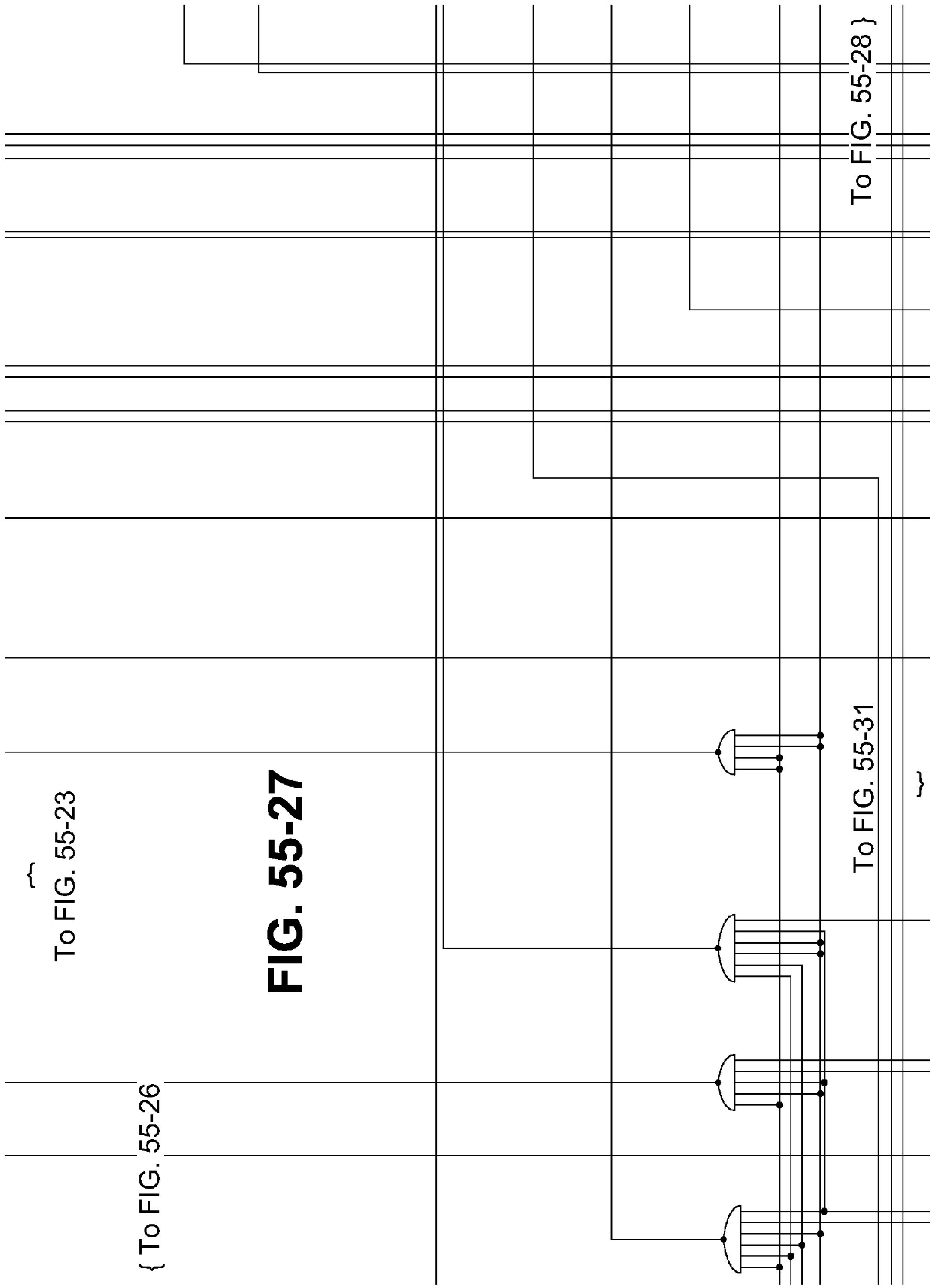
Figures 28, 55:
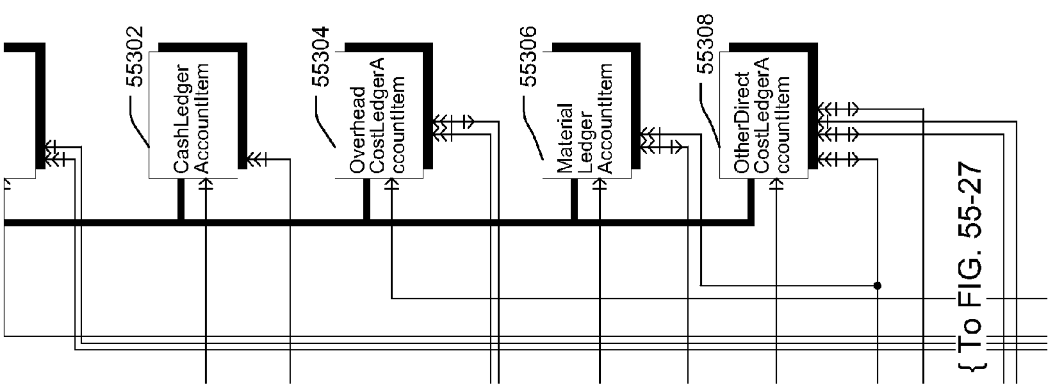
Figures 29, 55:
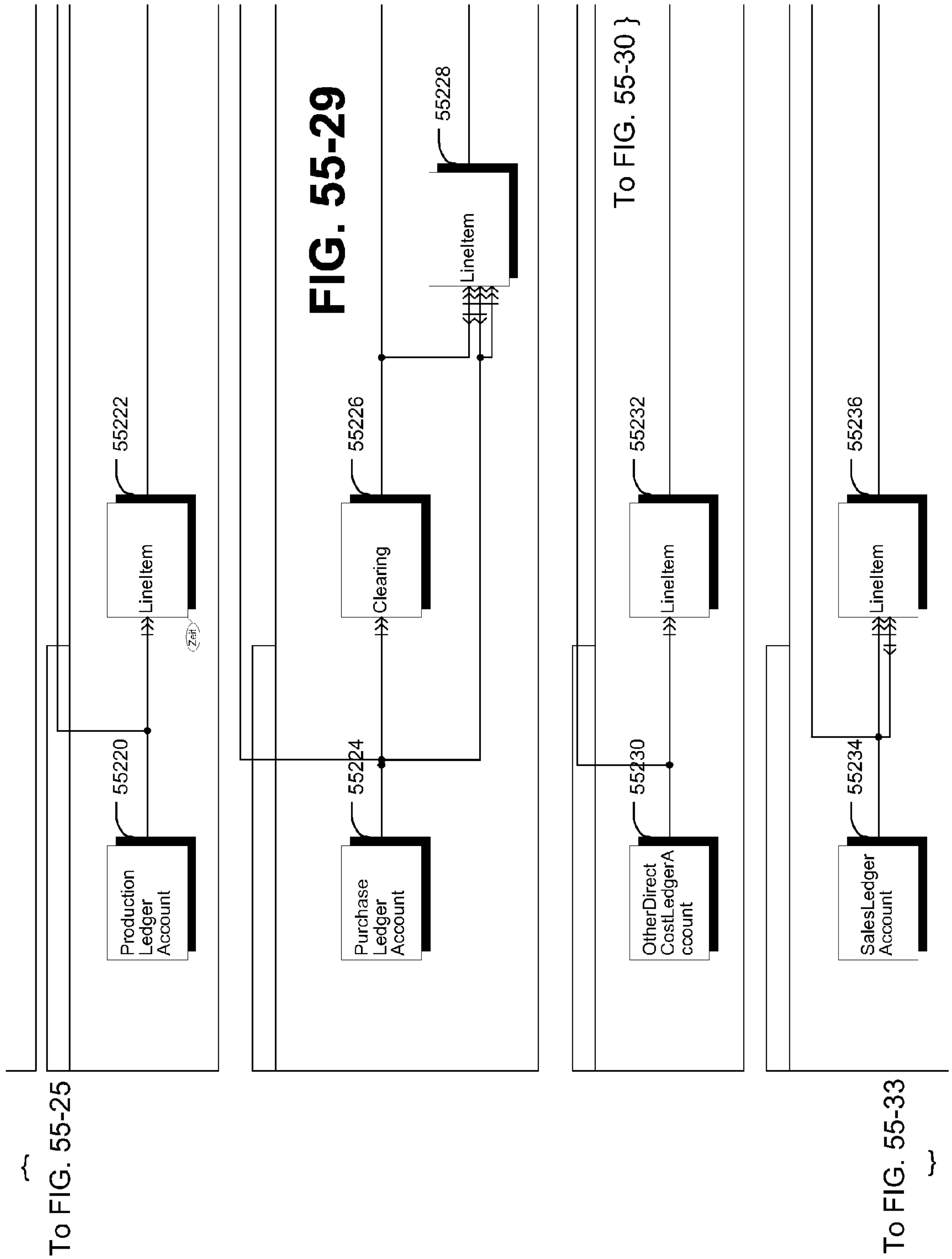
Figures 30, 55:
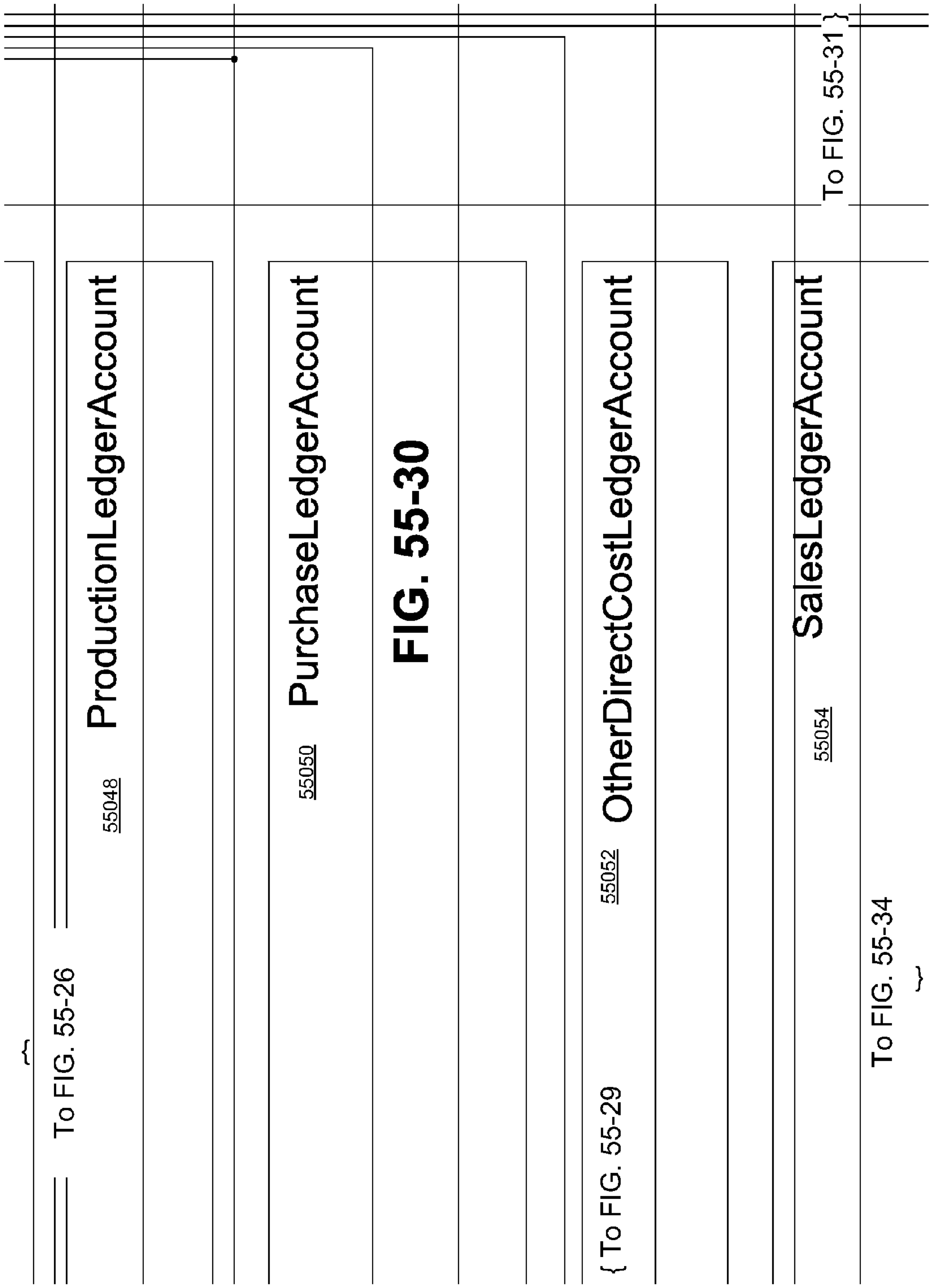
Figures 31, 55:
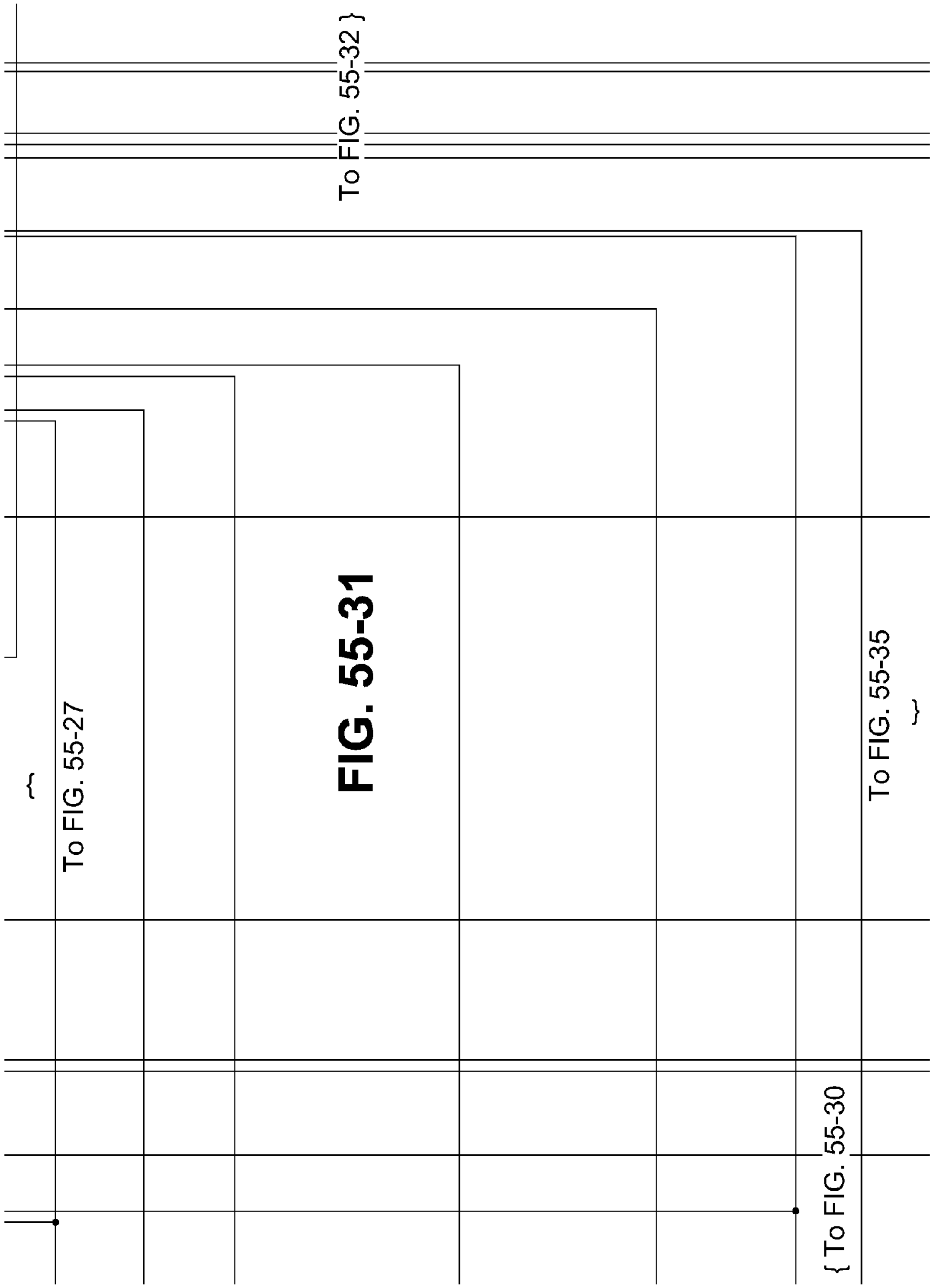
Figure 132:
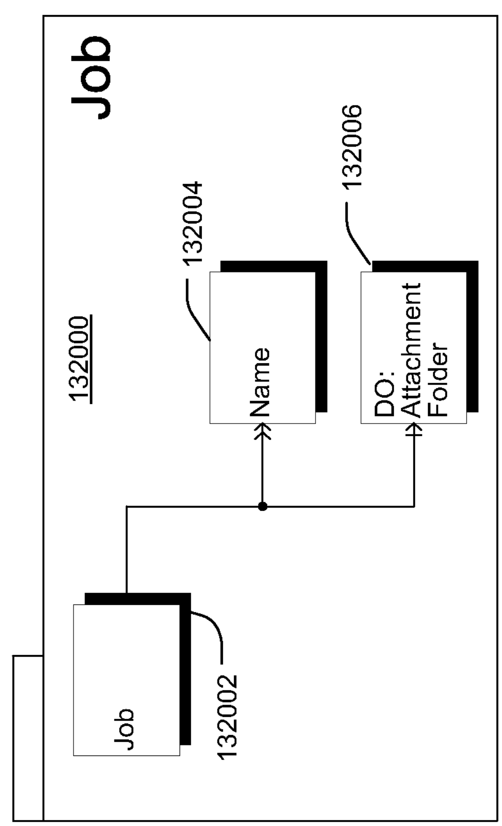
Figures 1, 133:
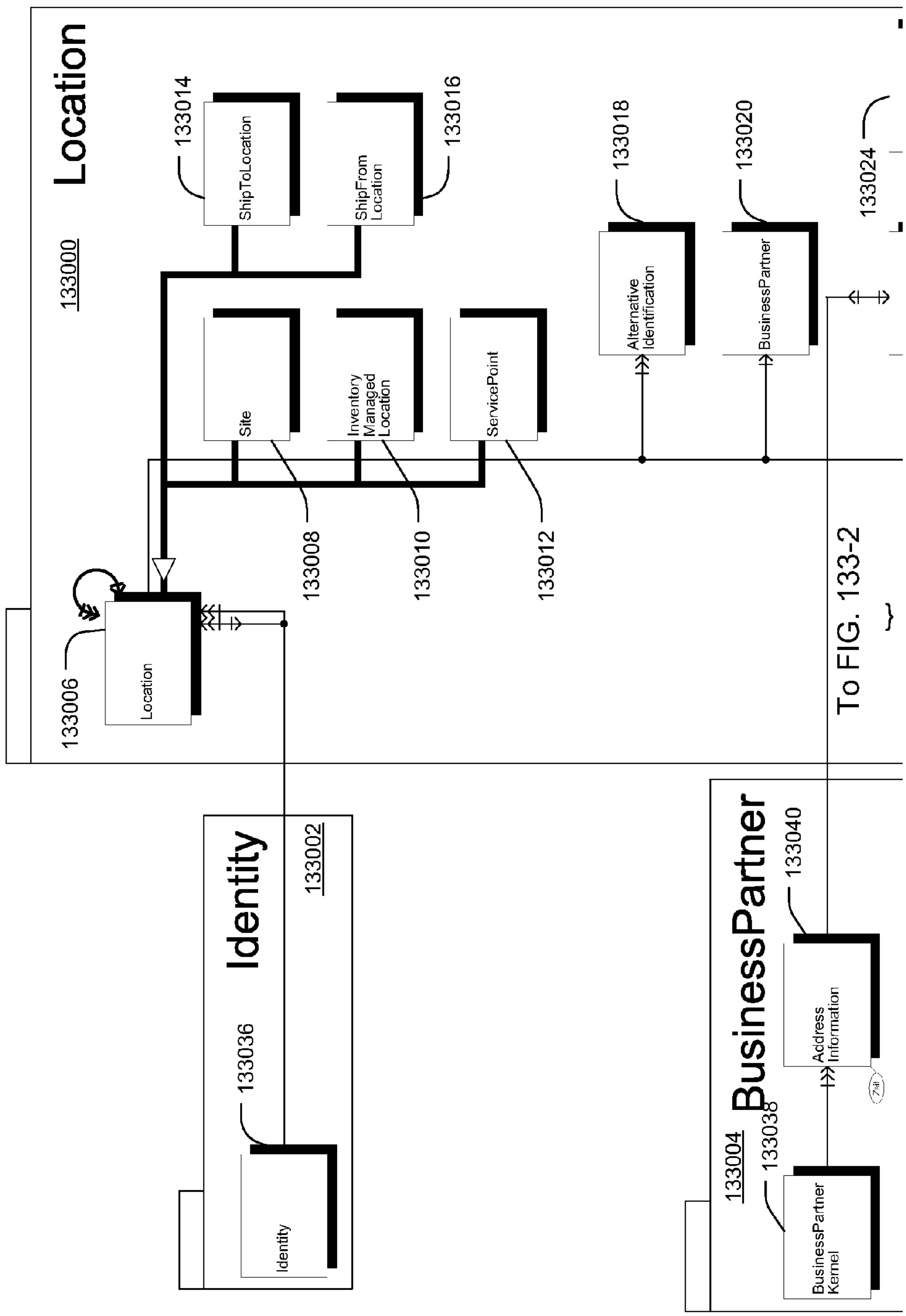
Figures 2, 133:
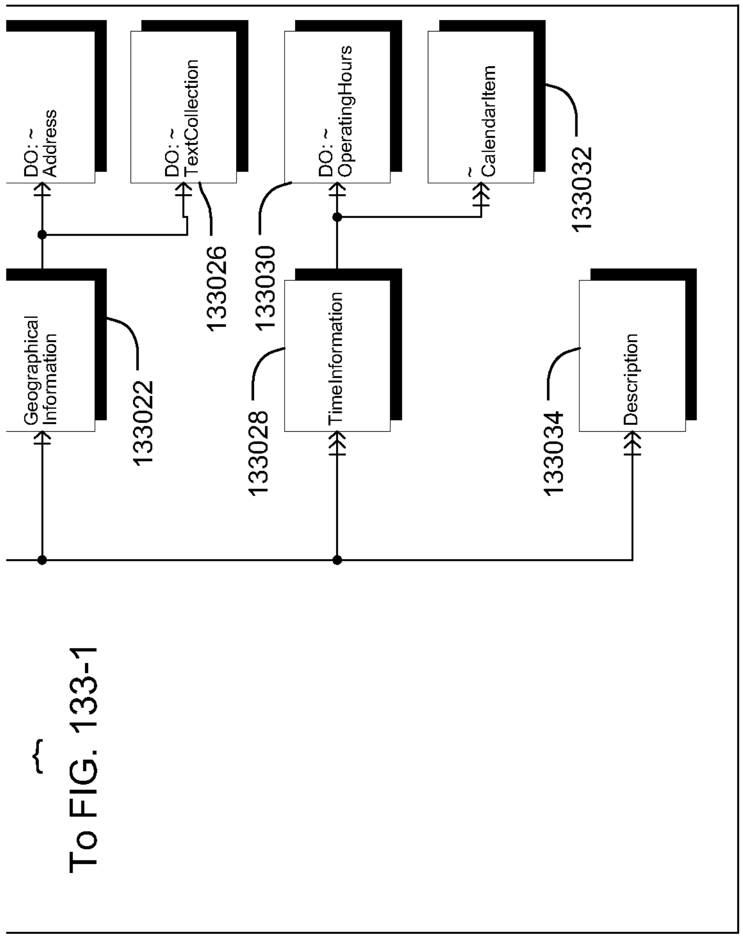
Figures 1, 134:
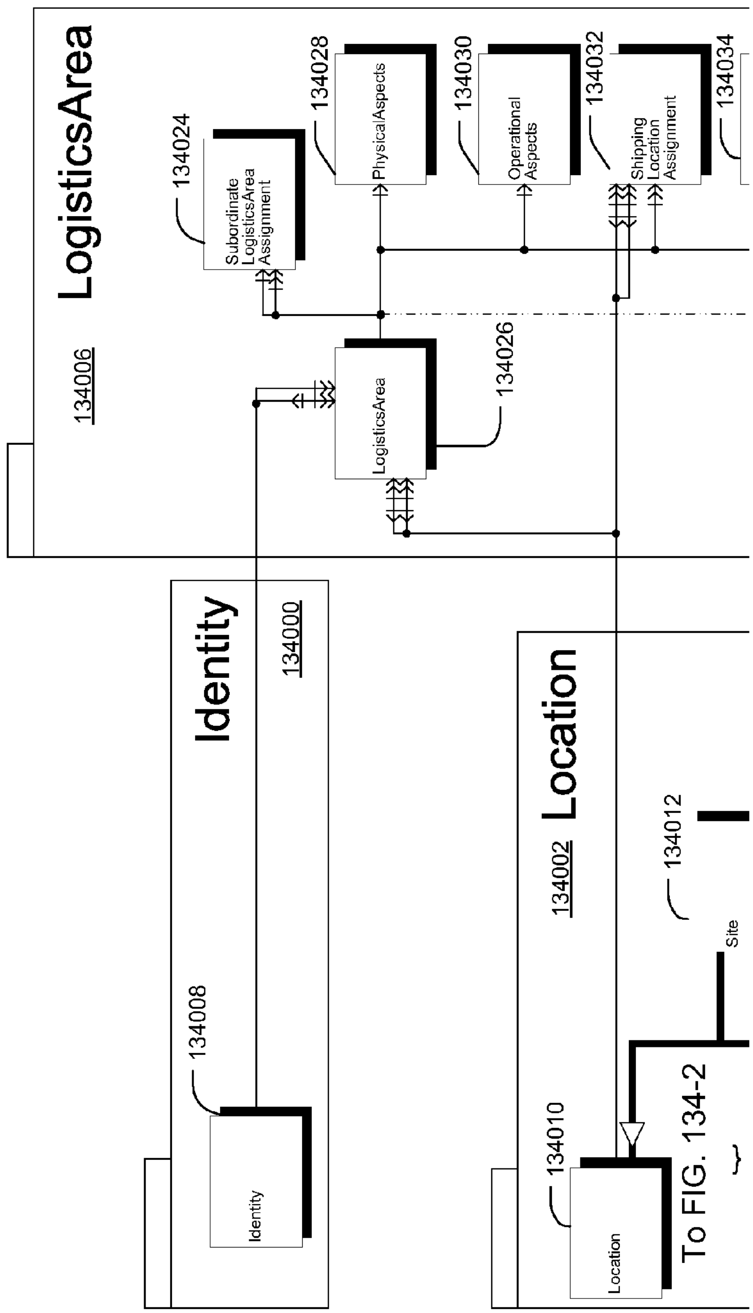
Figures 2, 134:
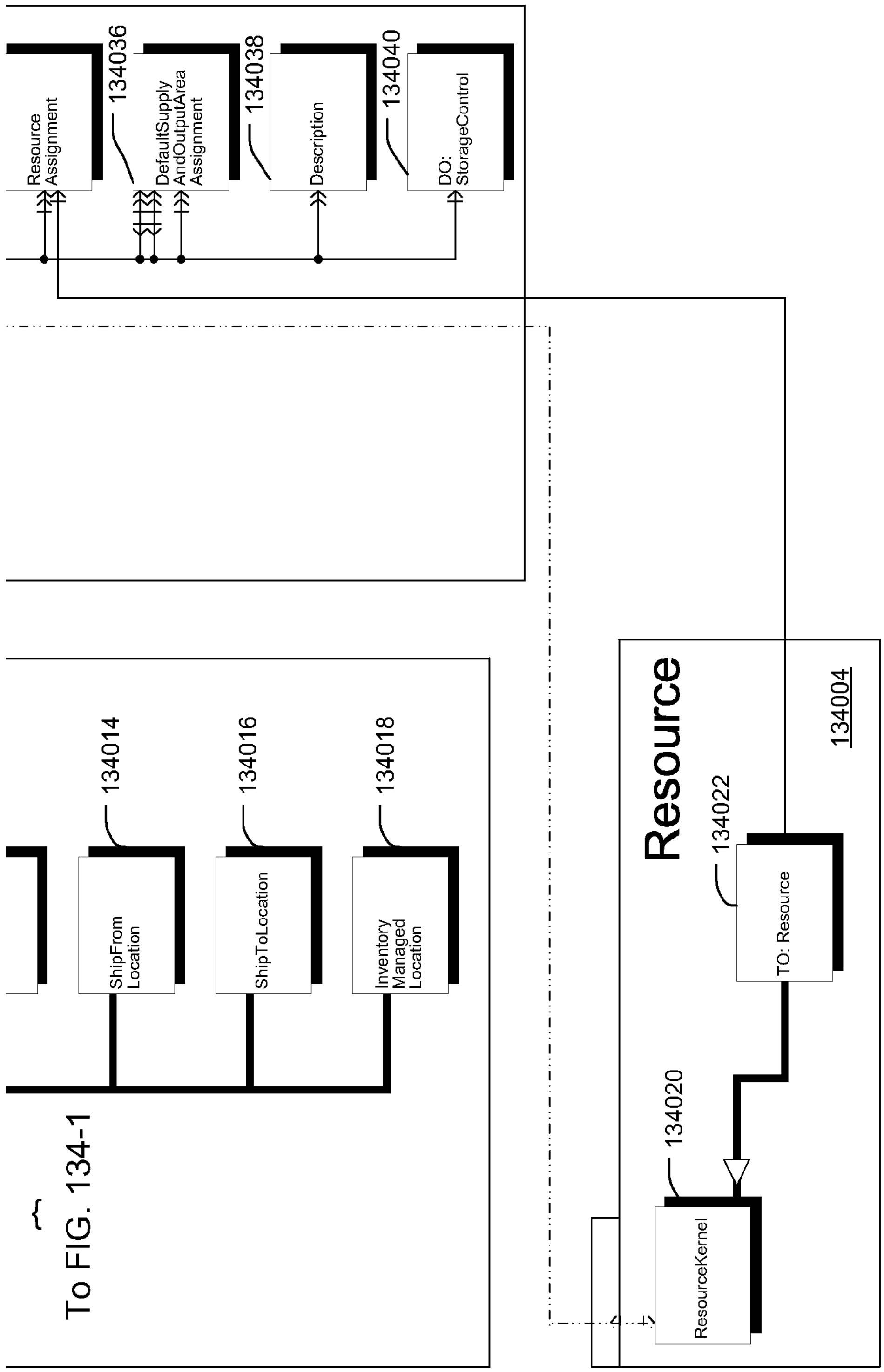
Figure 135:
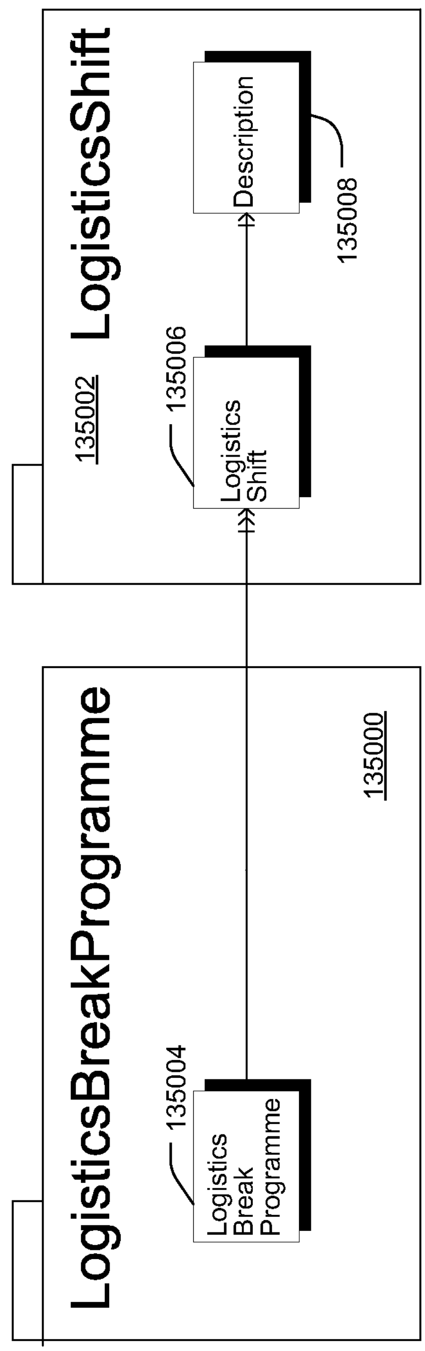
Figure 136:
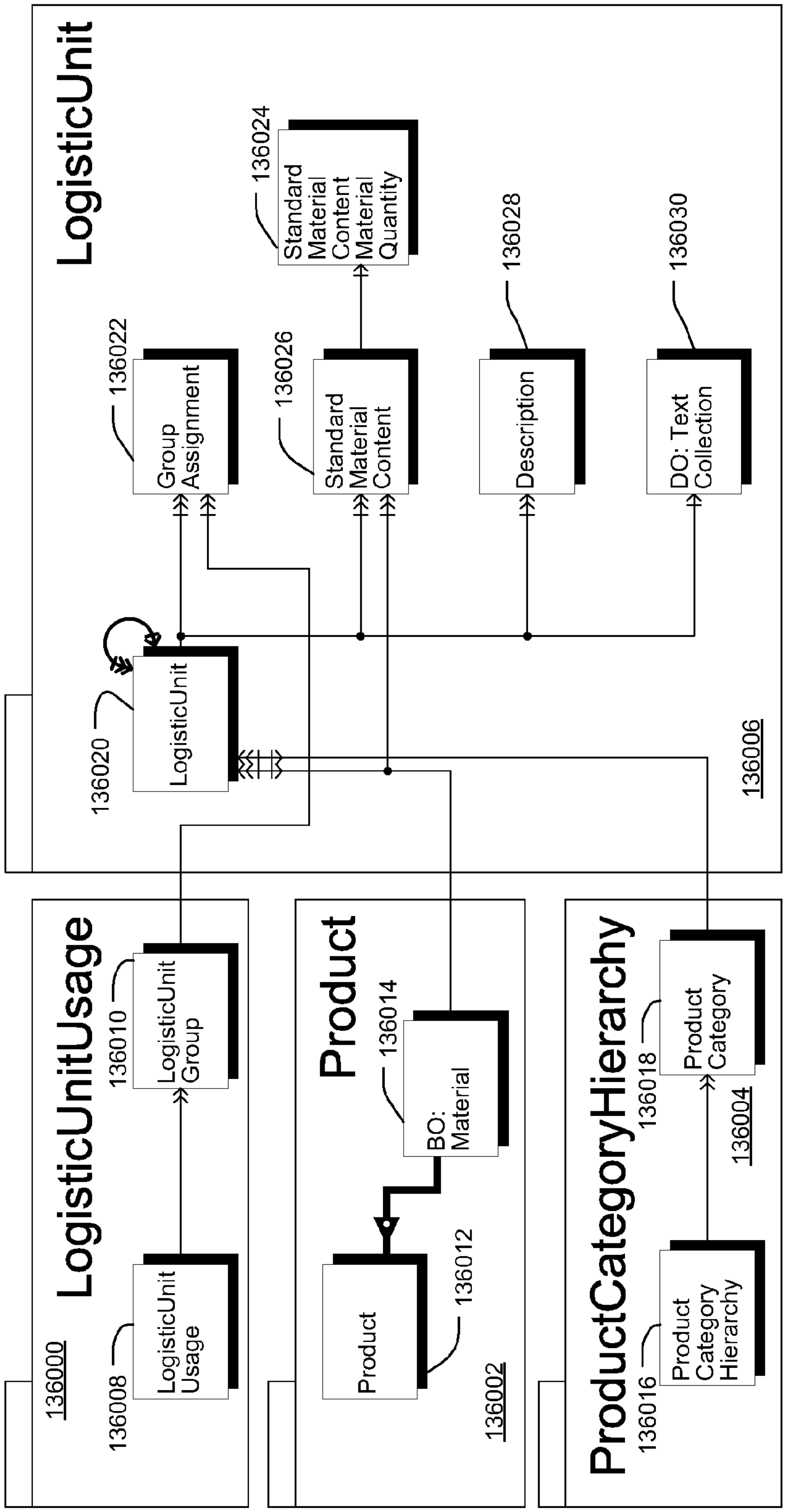
Figure 137:
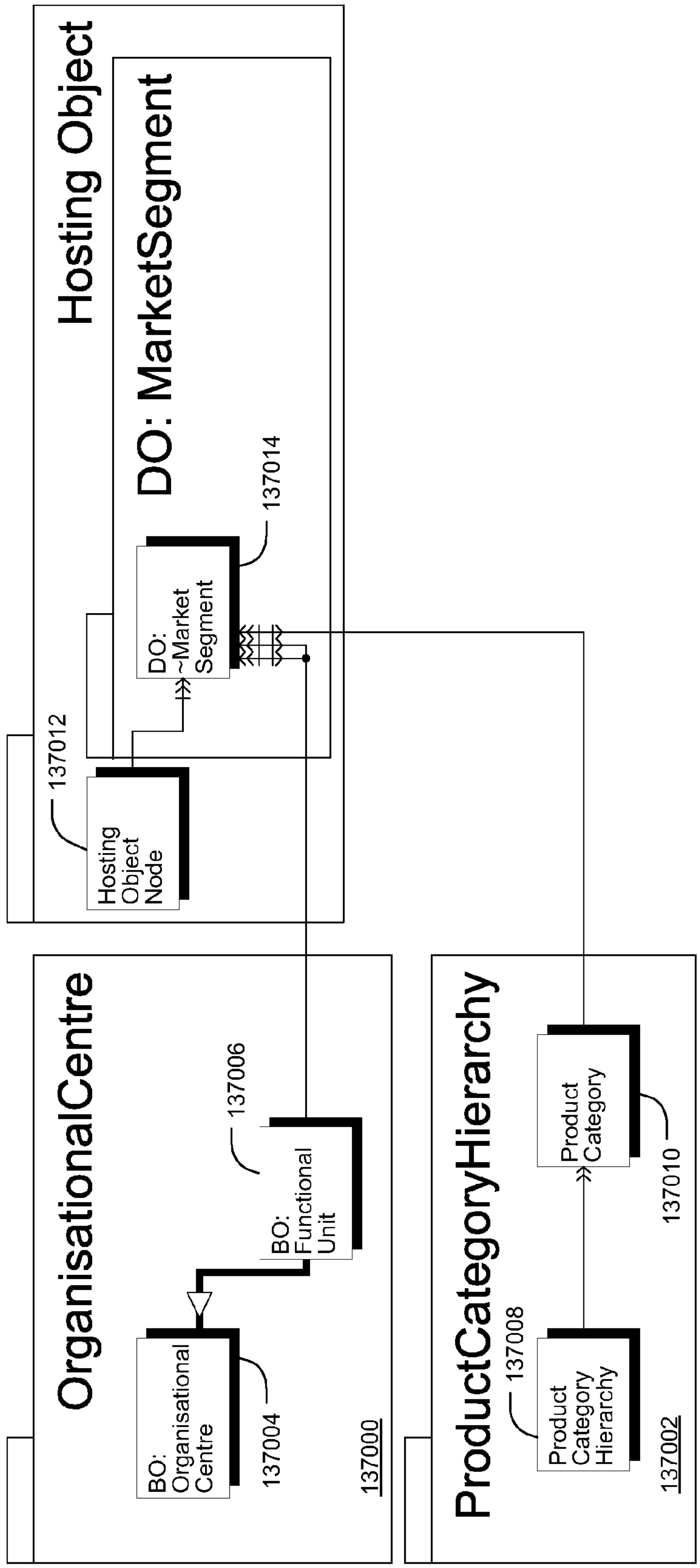
Figure 138:
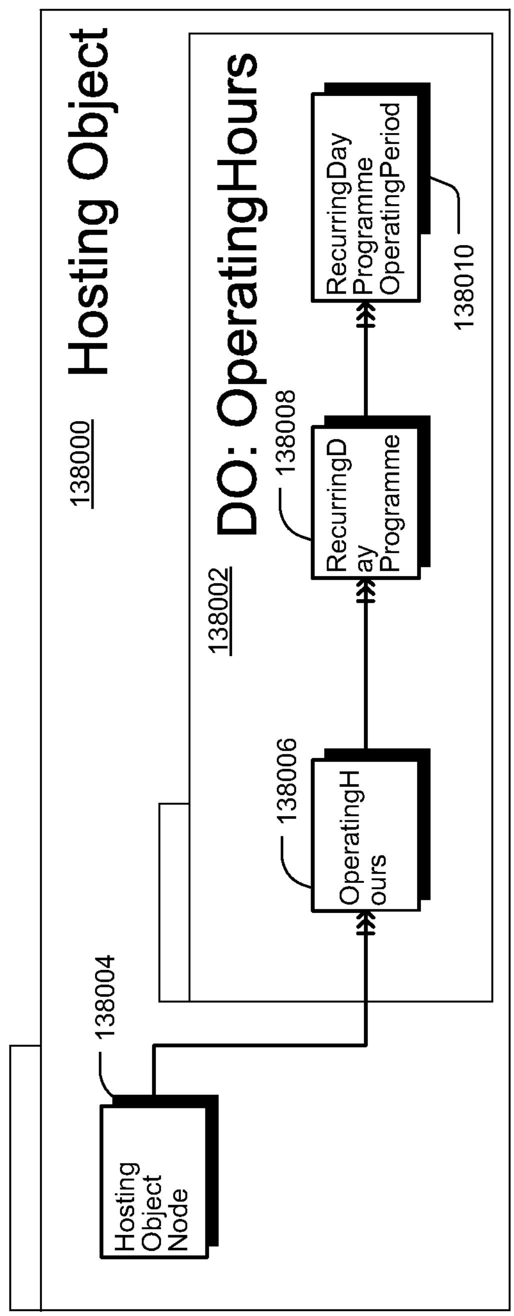
Figure 139:
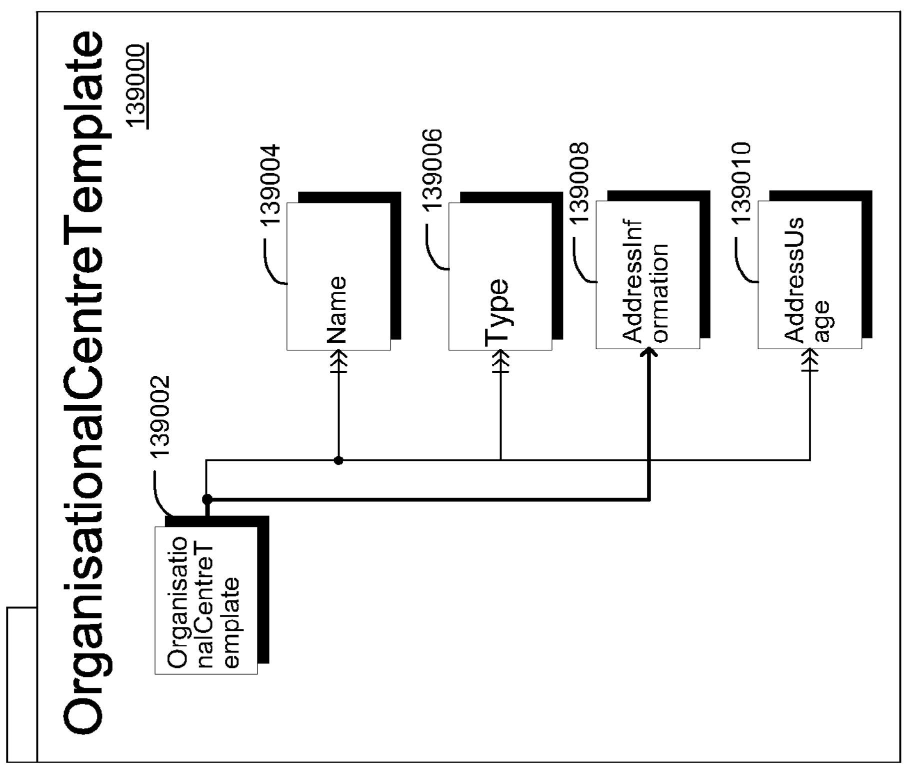
Figures 1, 140:
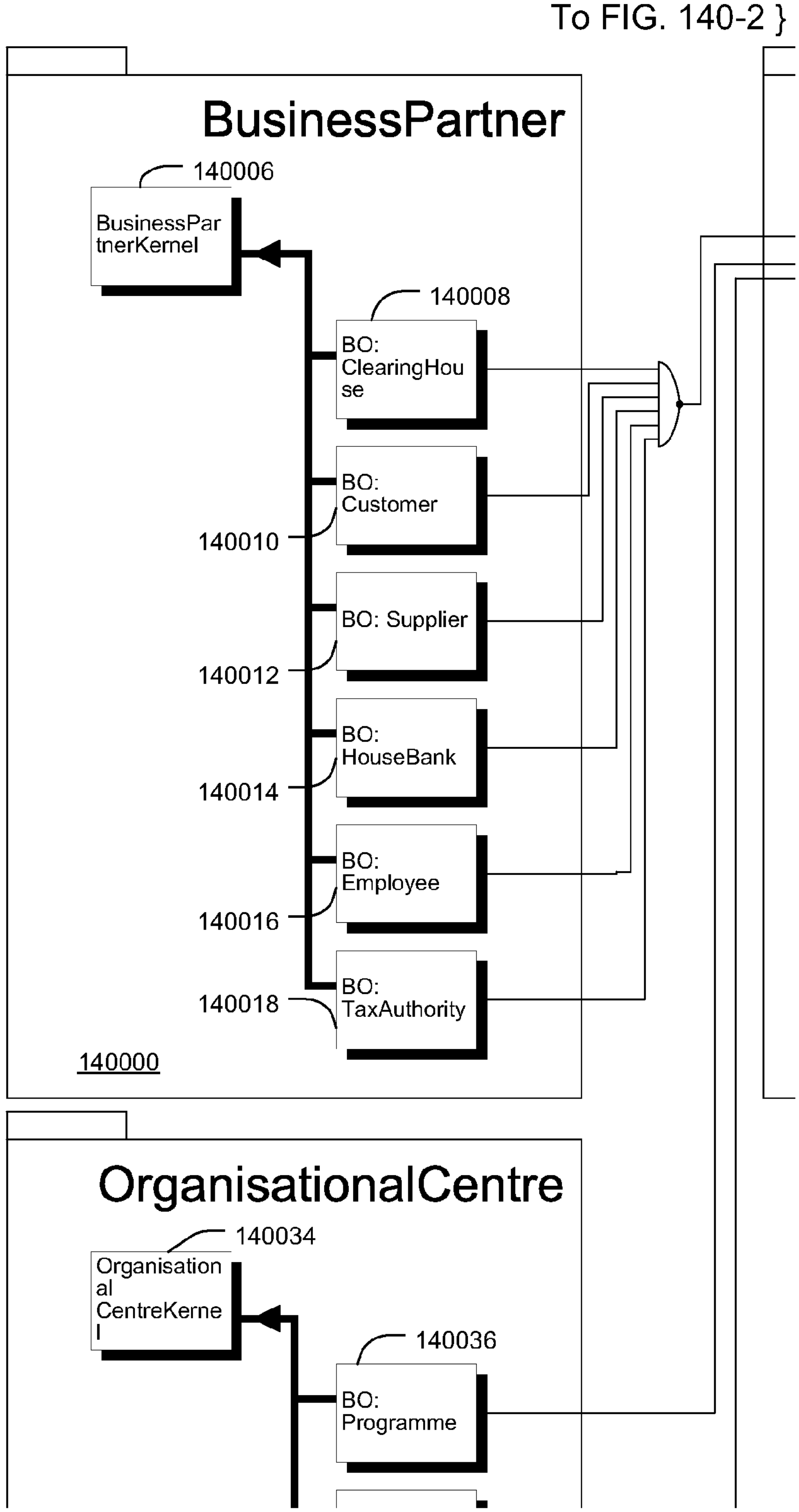
Figures 2, 140:
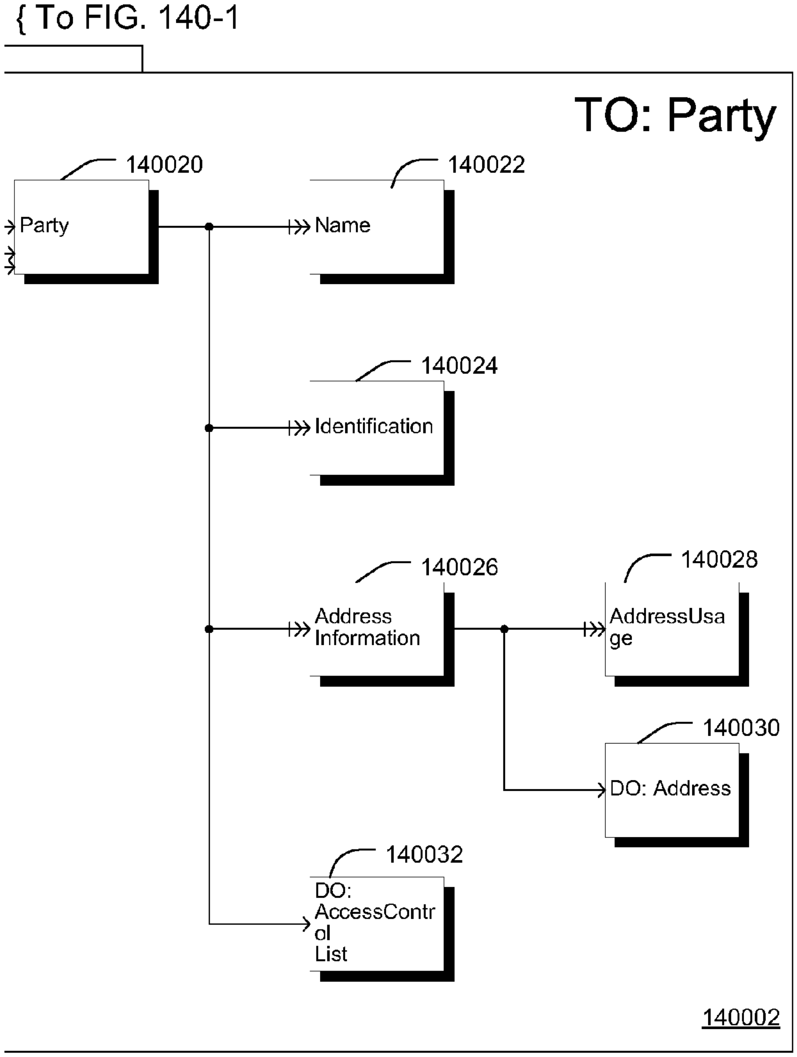
Figures 3, 140:
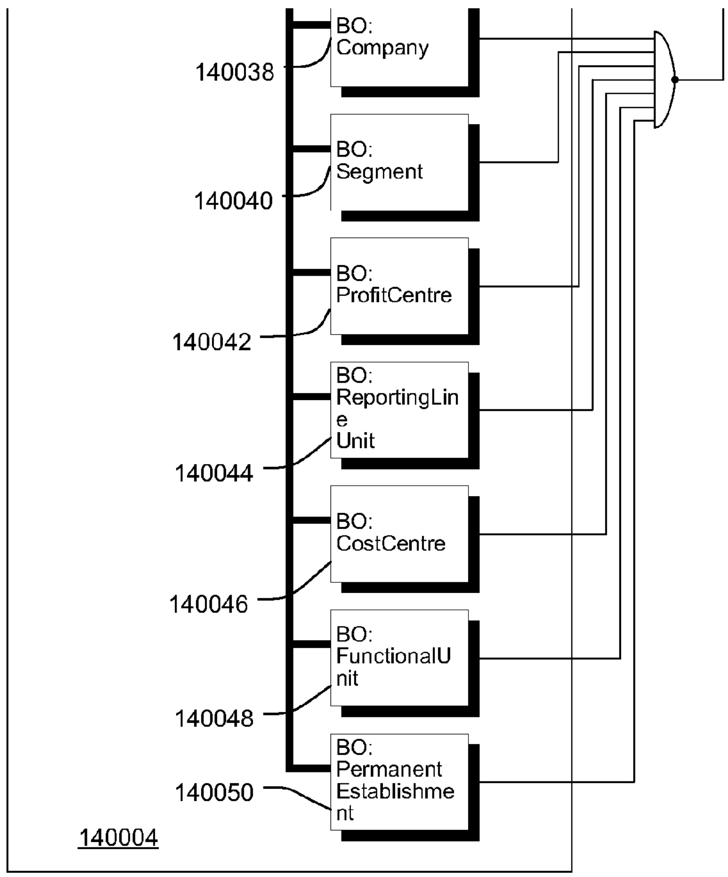
Figure 141:
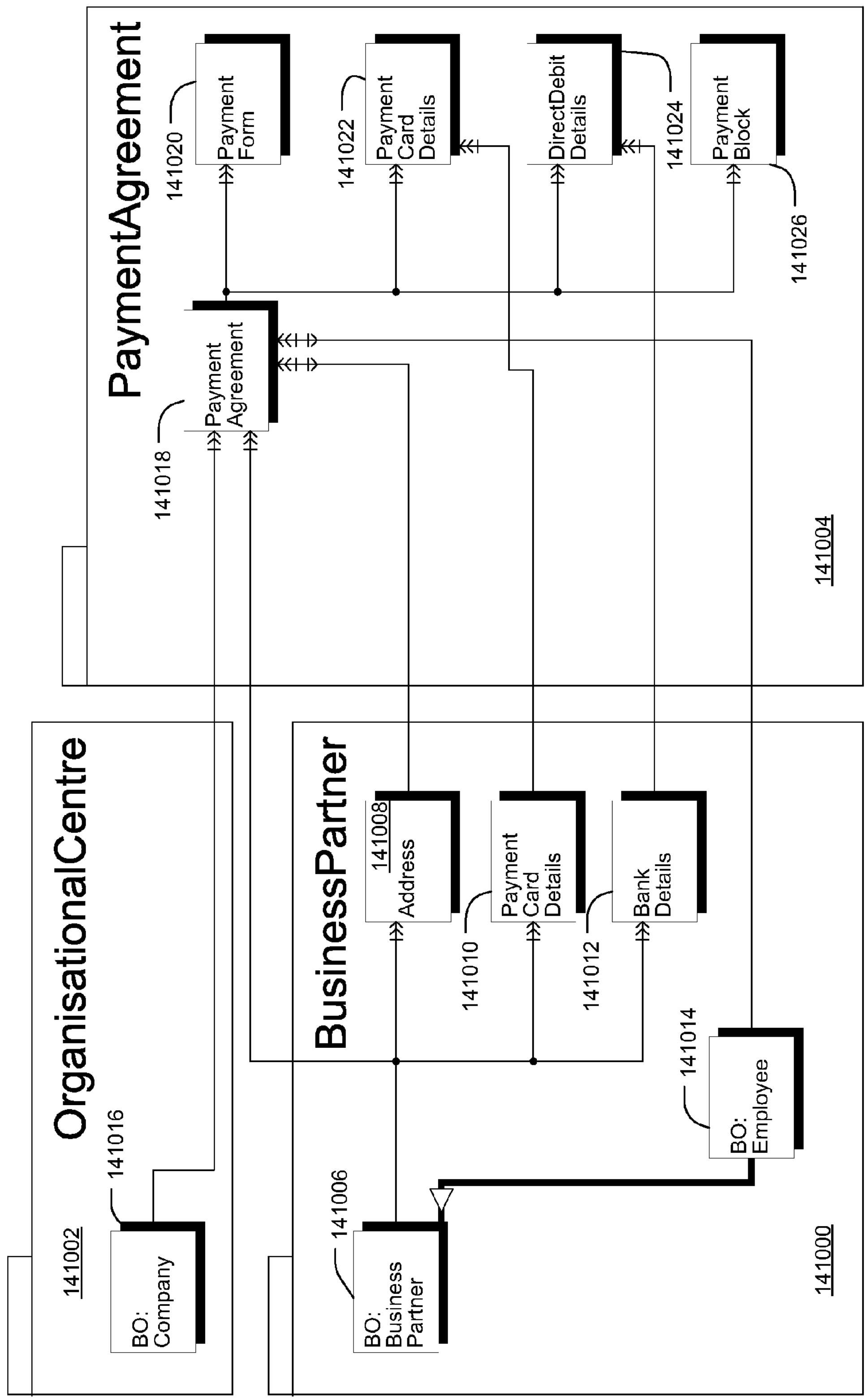
Figures 1, 142:
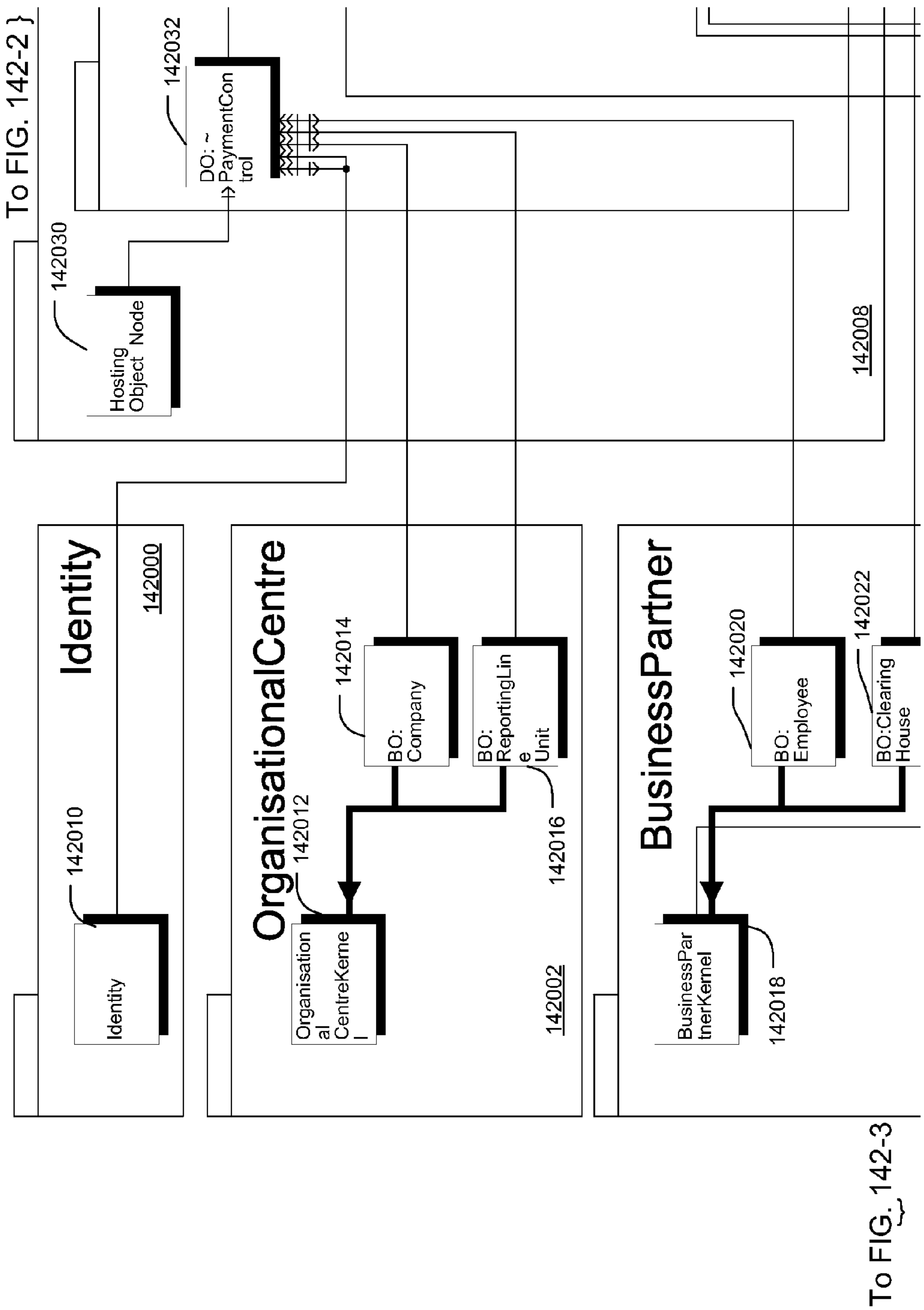
Figures 2, 142:
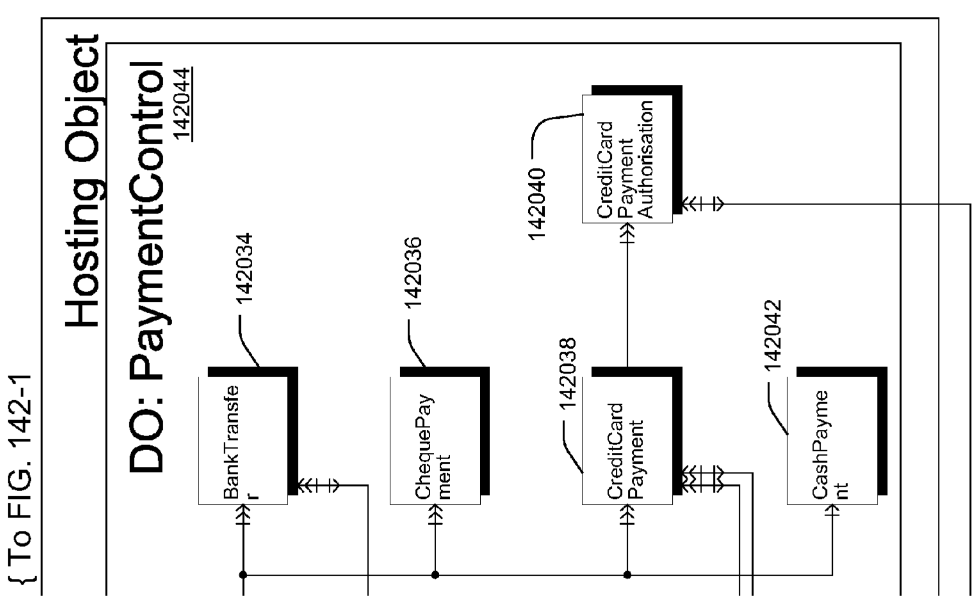
Figures 3, 142:
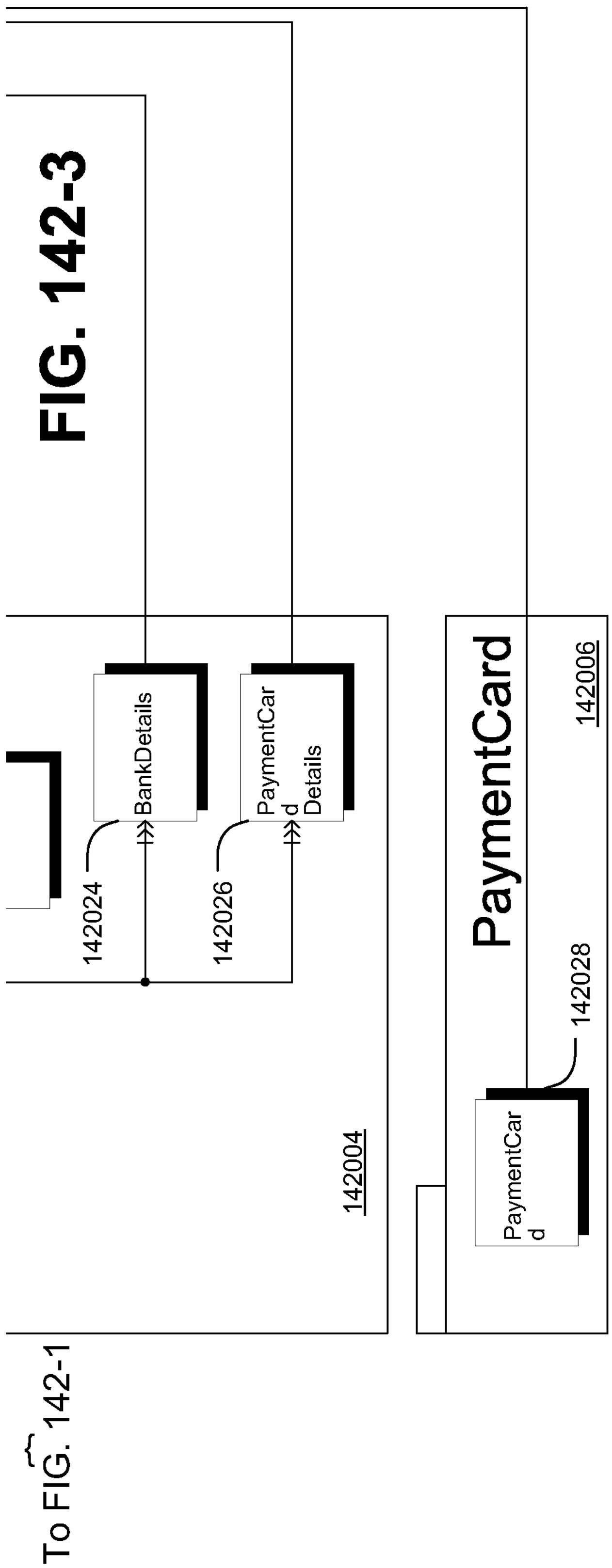
Figure 143:
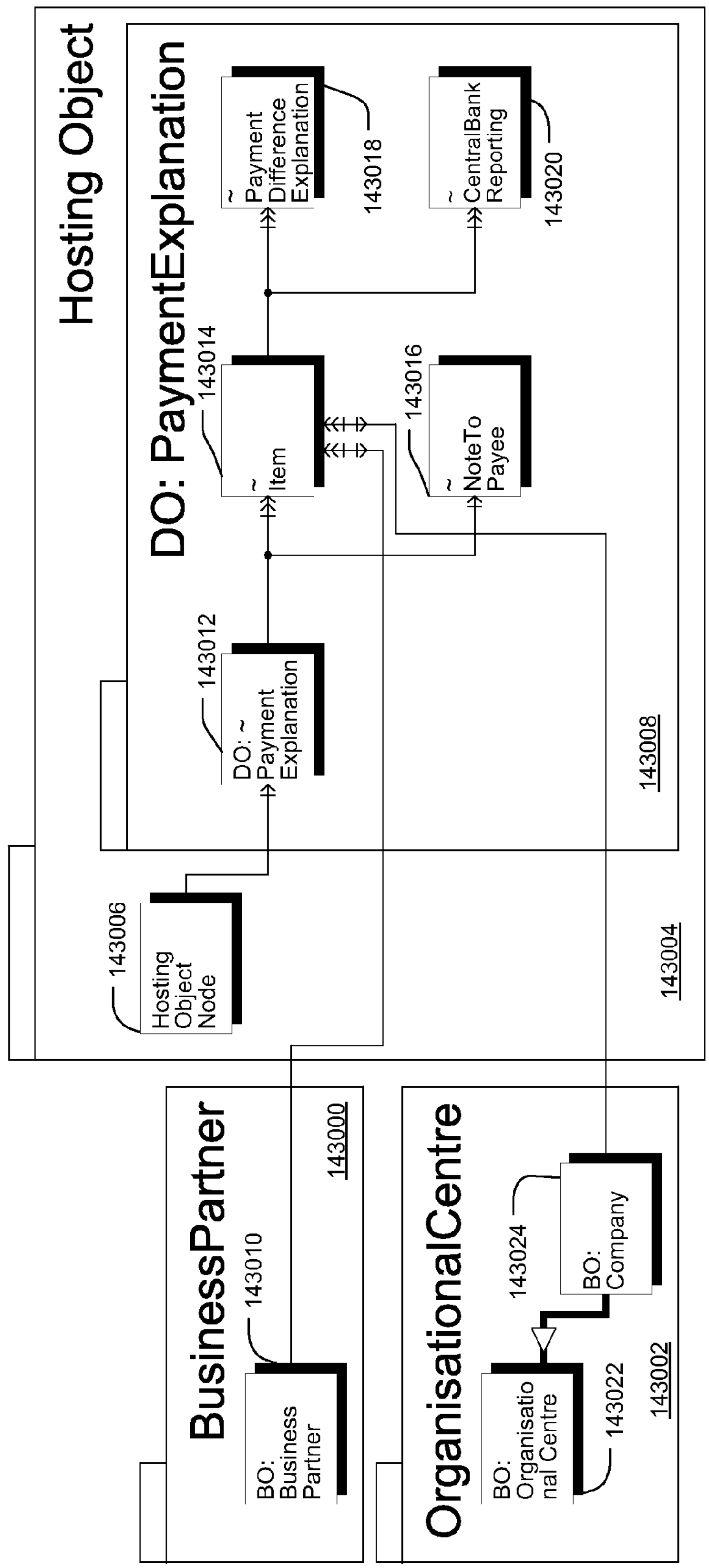
Figures 1, 144:
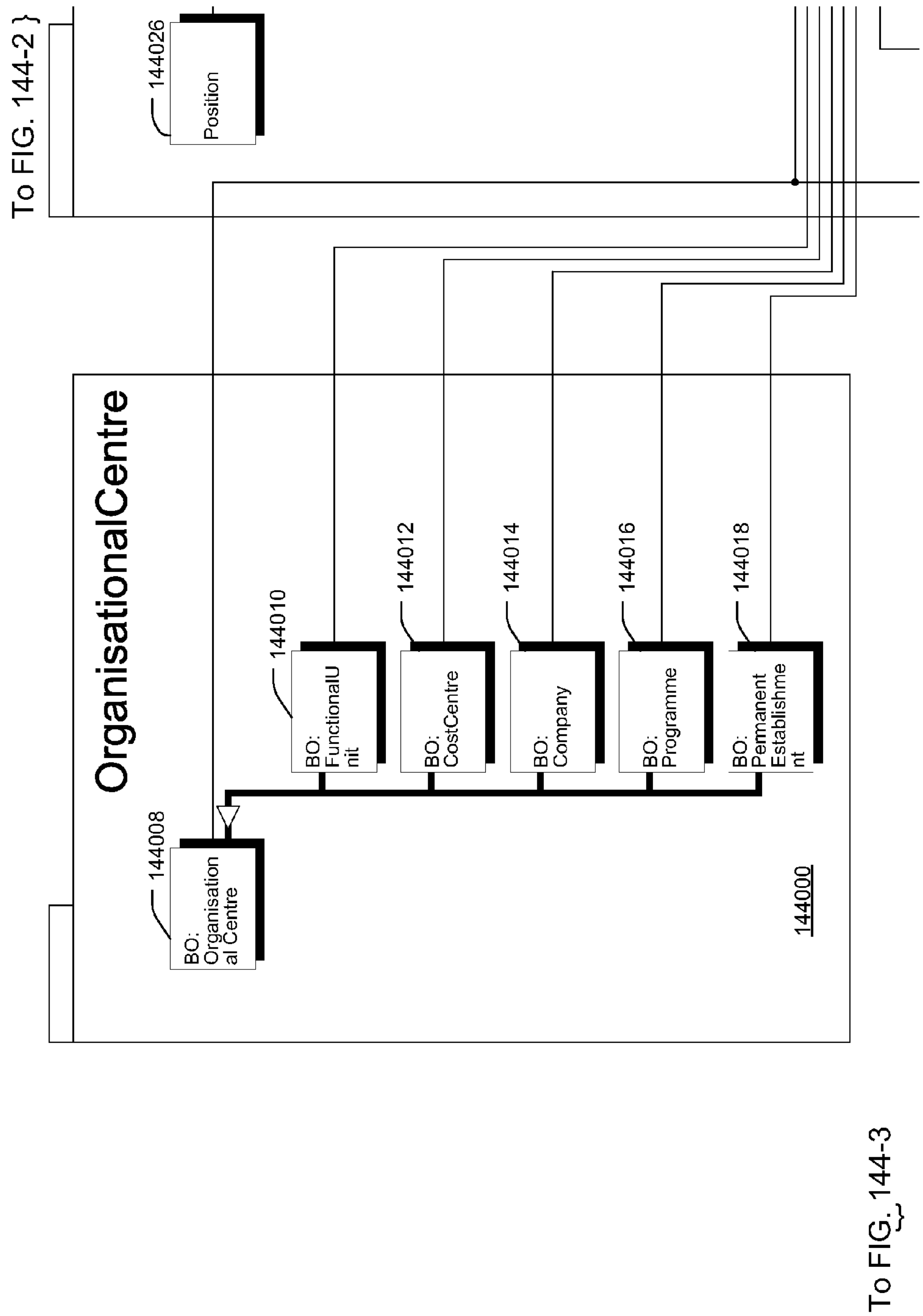
Figures 2, 144:
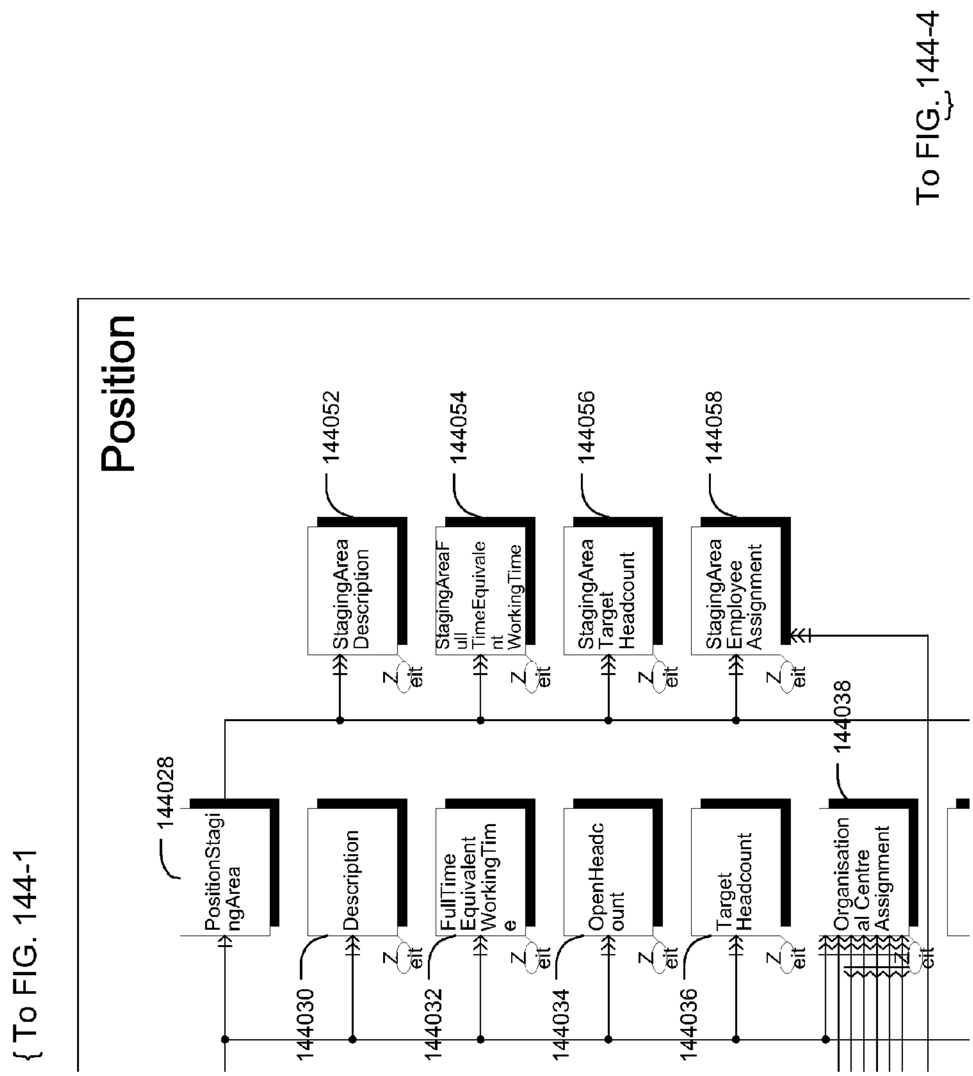
Figures 3, 144:
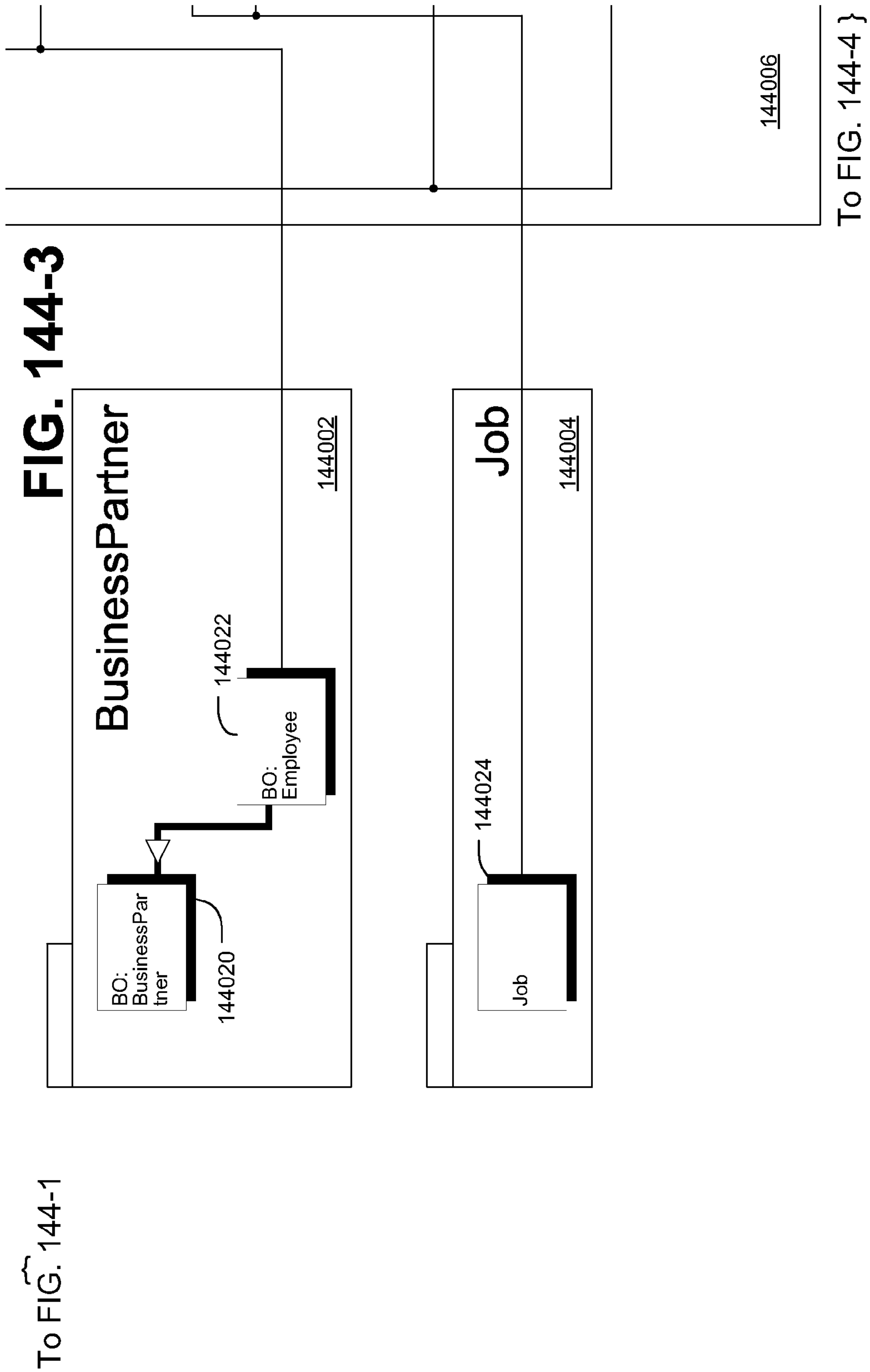
Figures 4, 144:
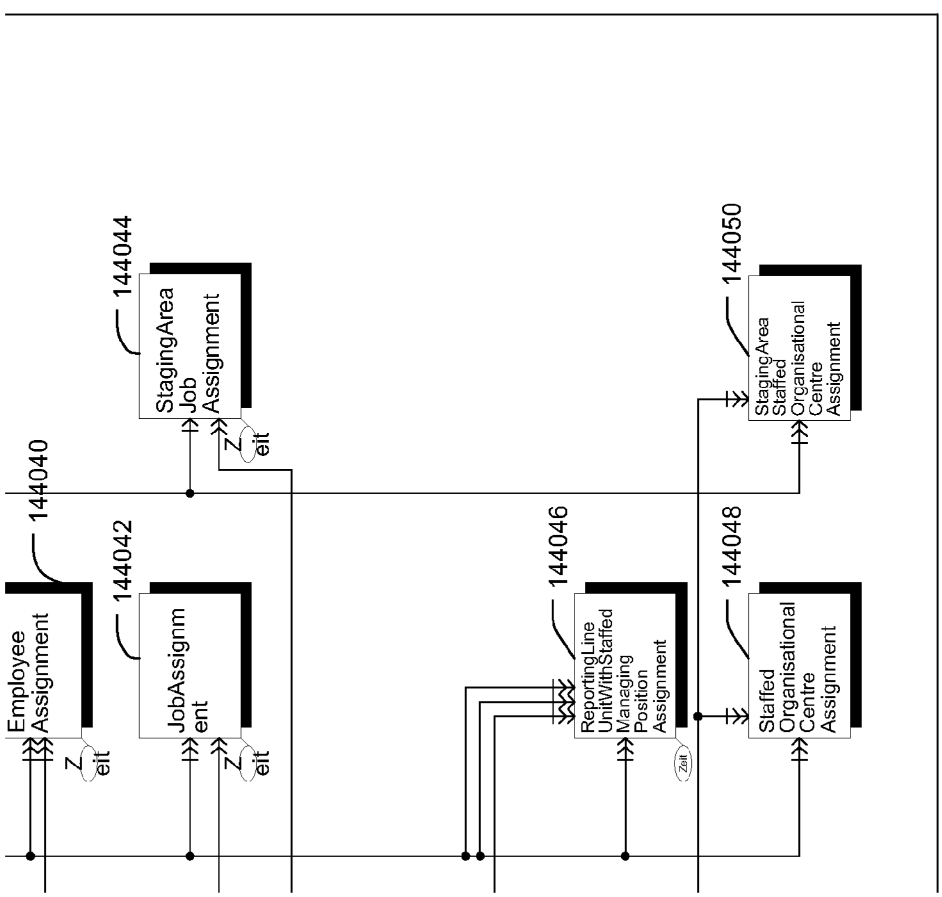
Figure 145:
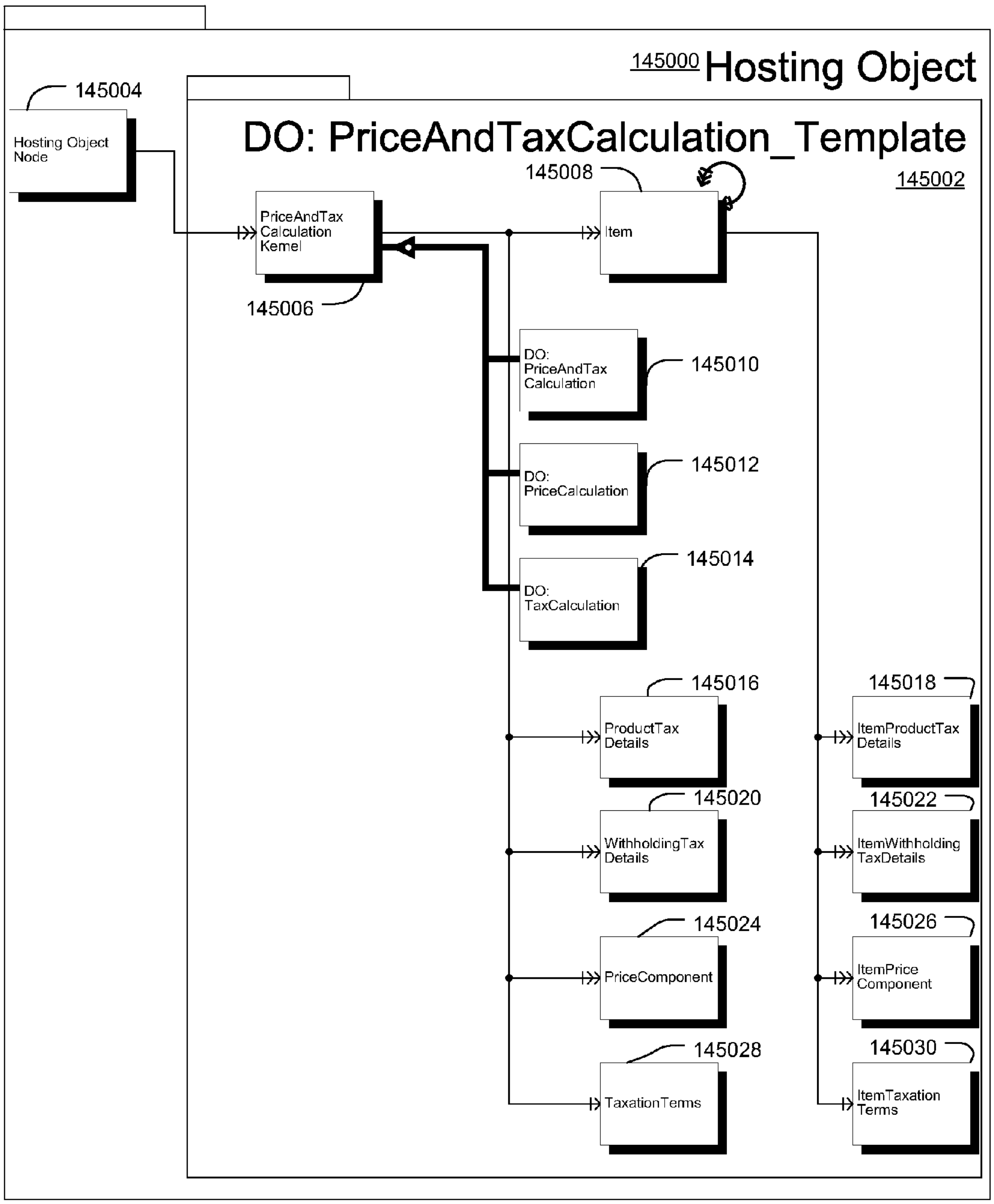
Figure 146:
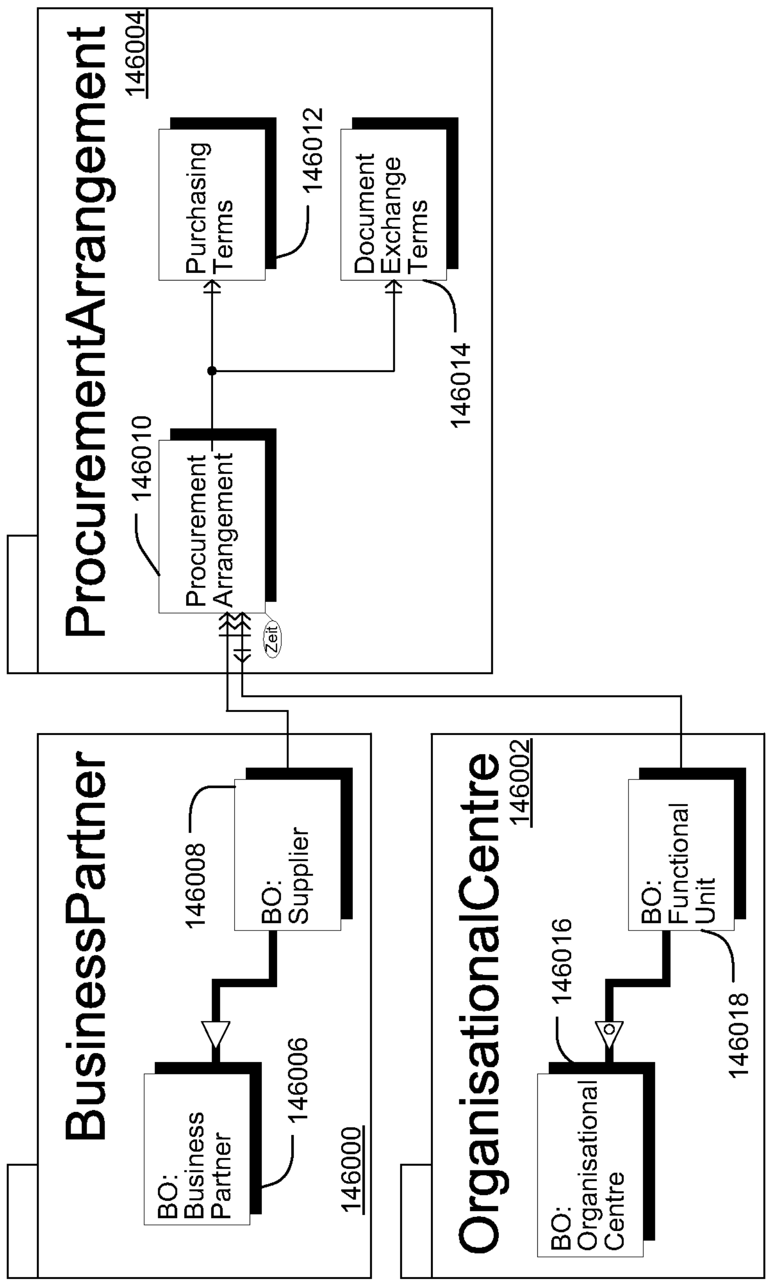
Figure 147:
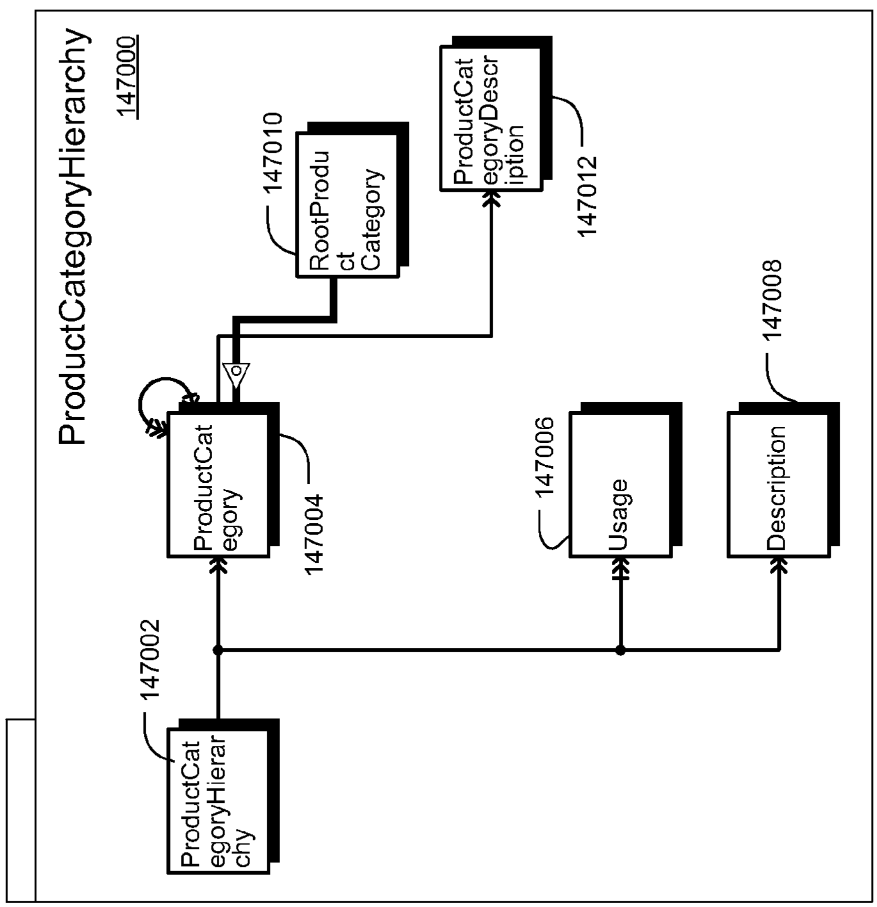
Figures 1, 148:
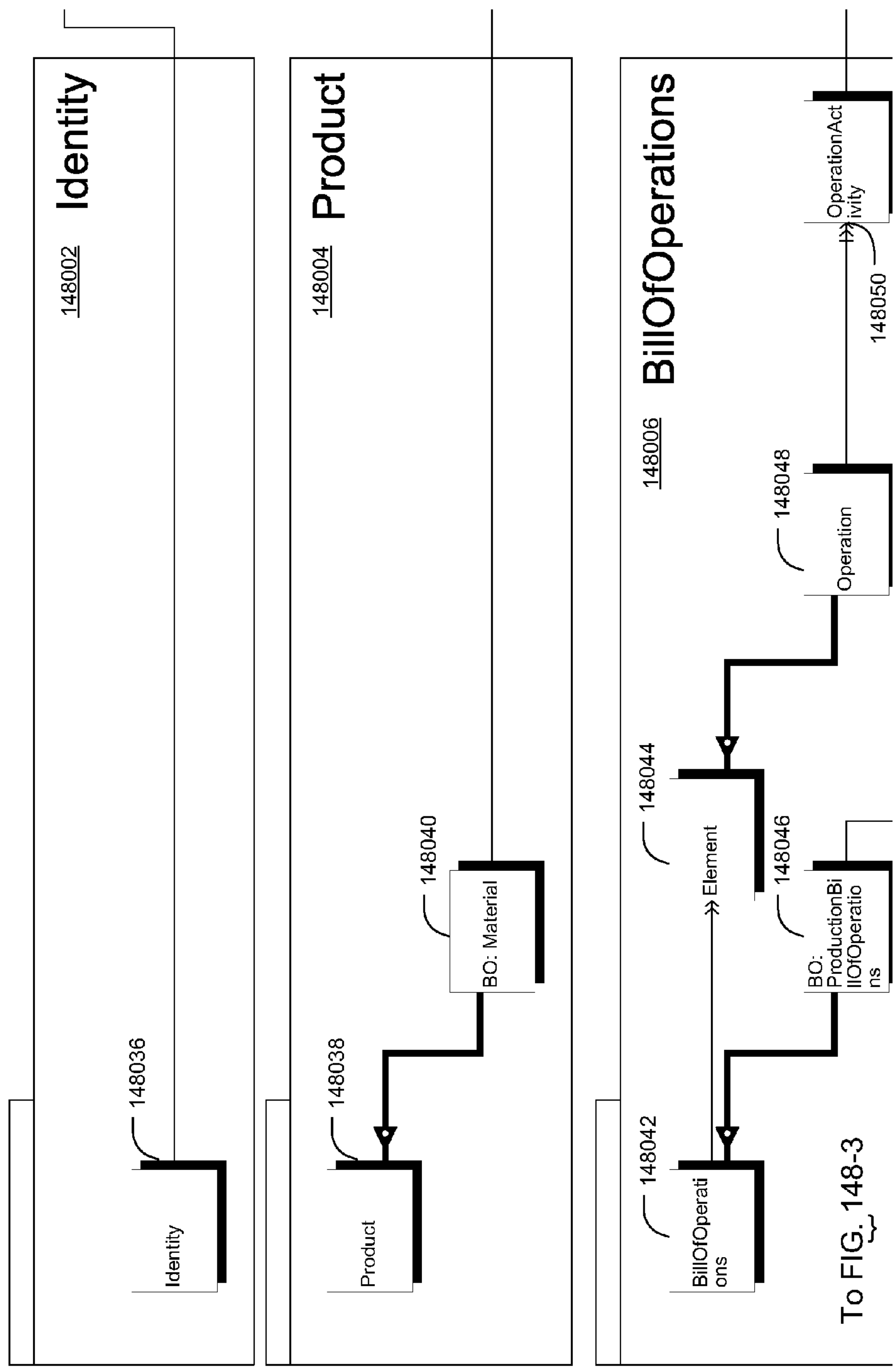
Figures 2, 148:
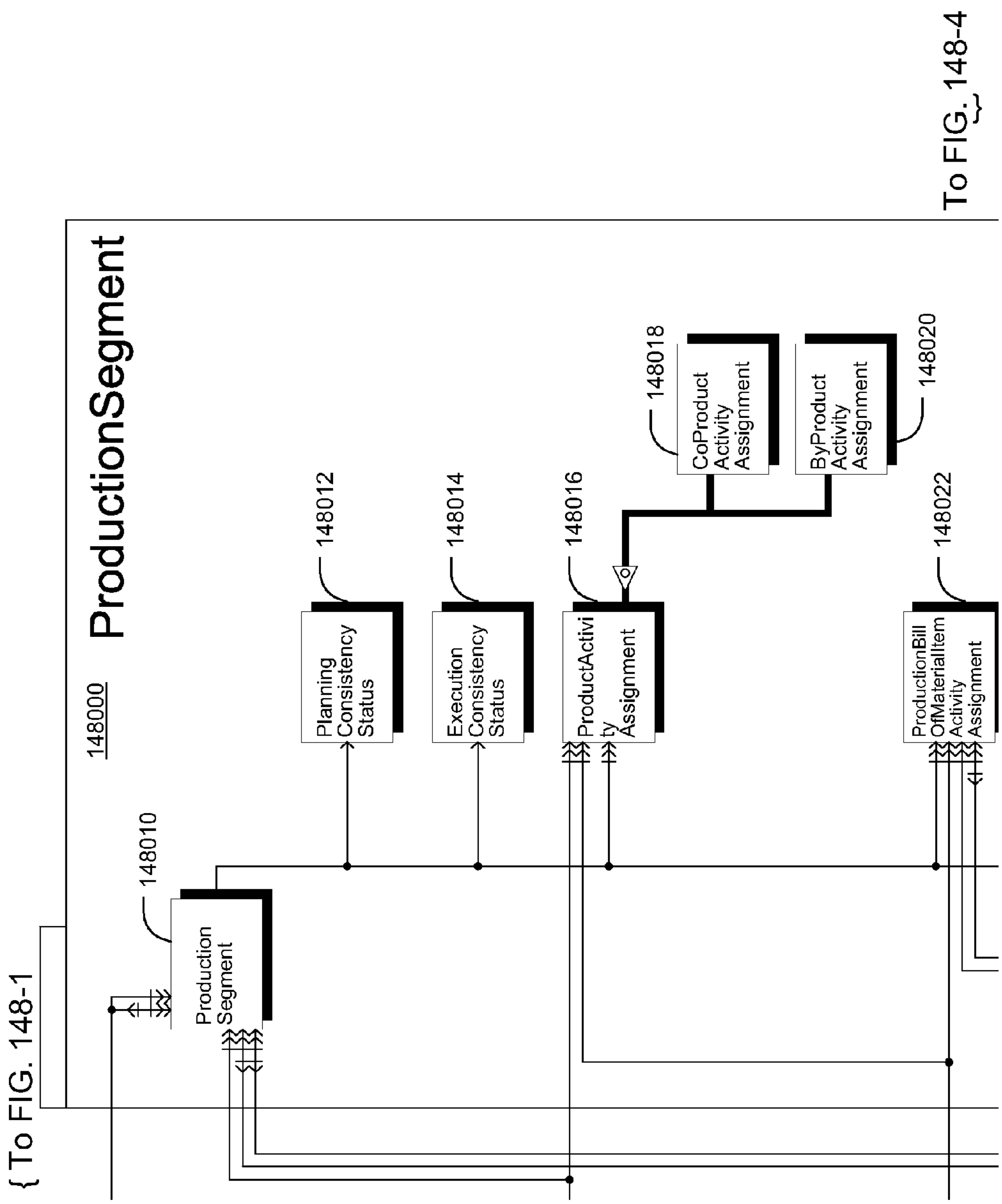
Figures 3, 148:
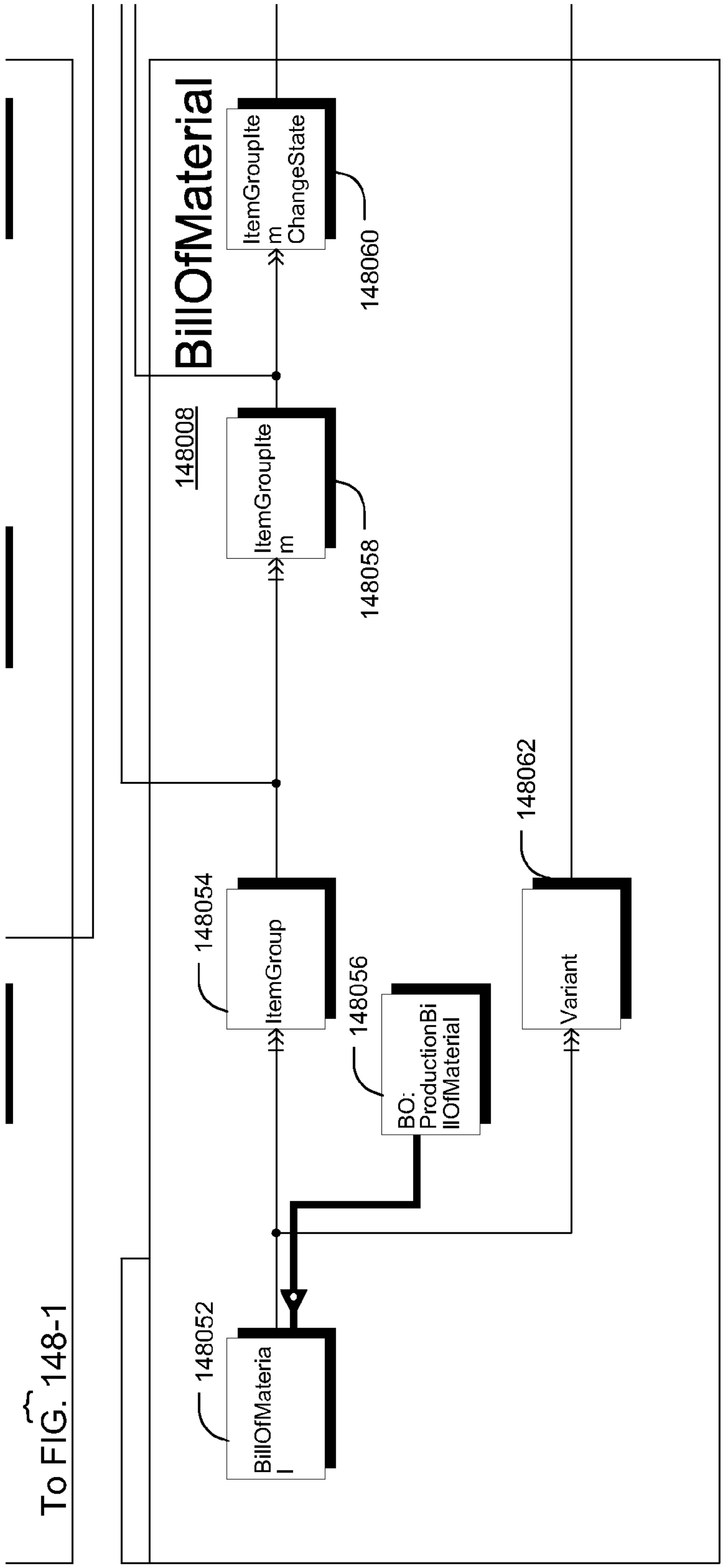
Figures 4, 148:
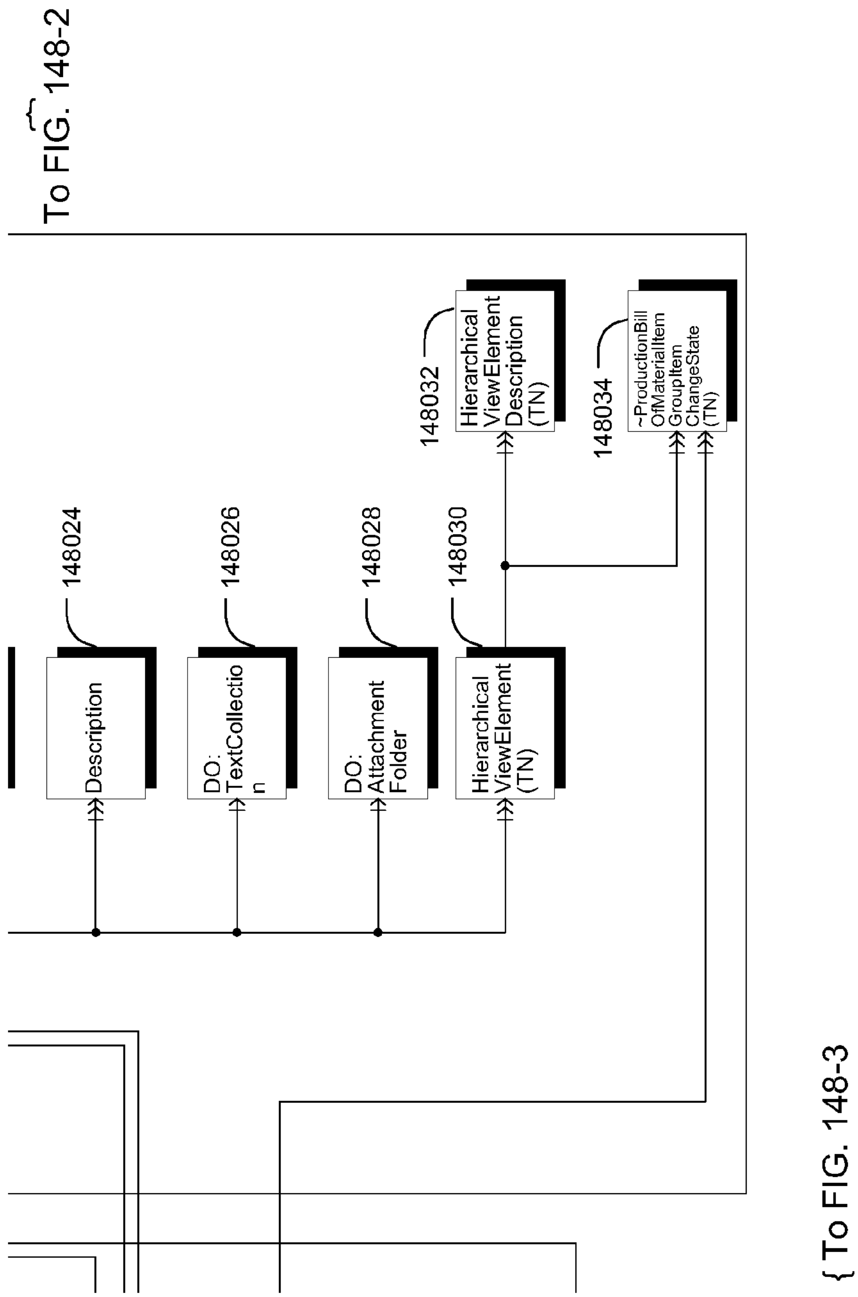
Figures 1, 149:
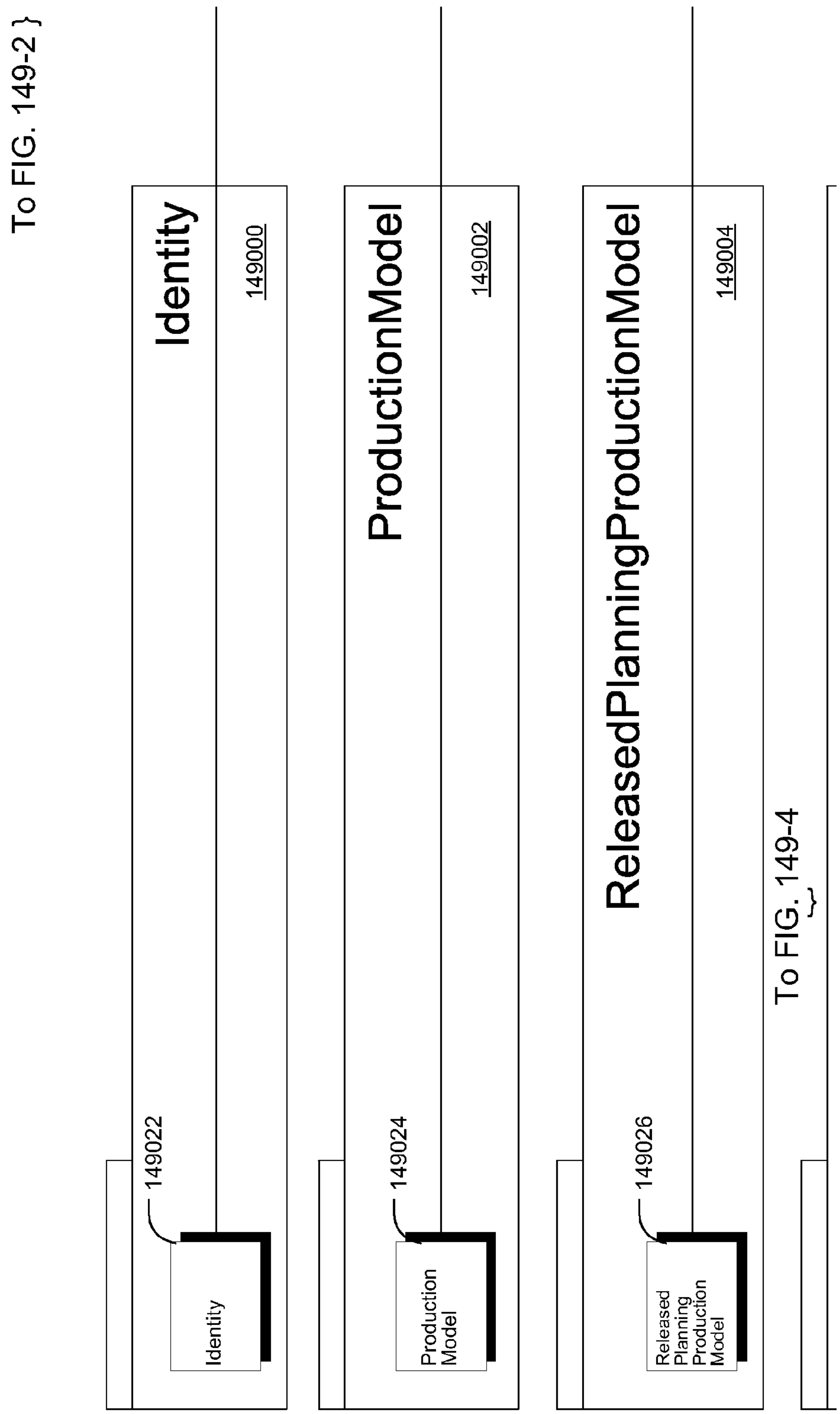
Figures 2, 149:
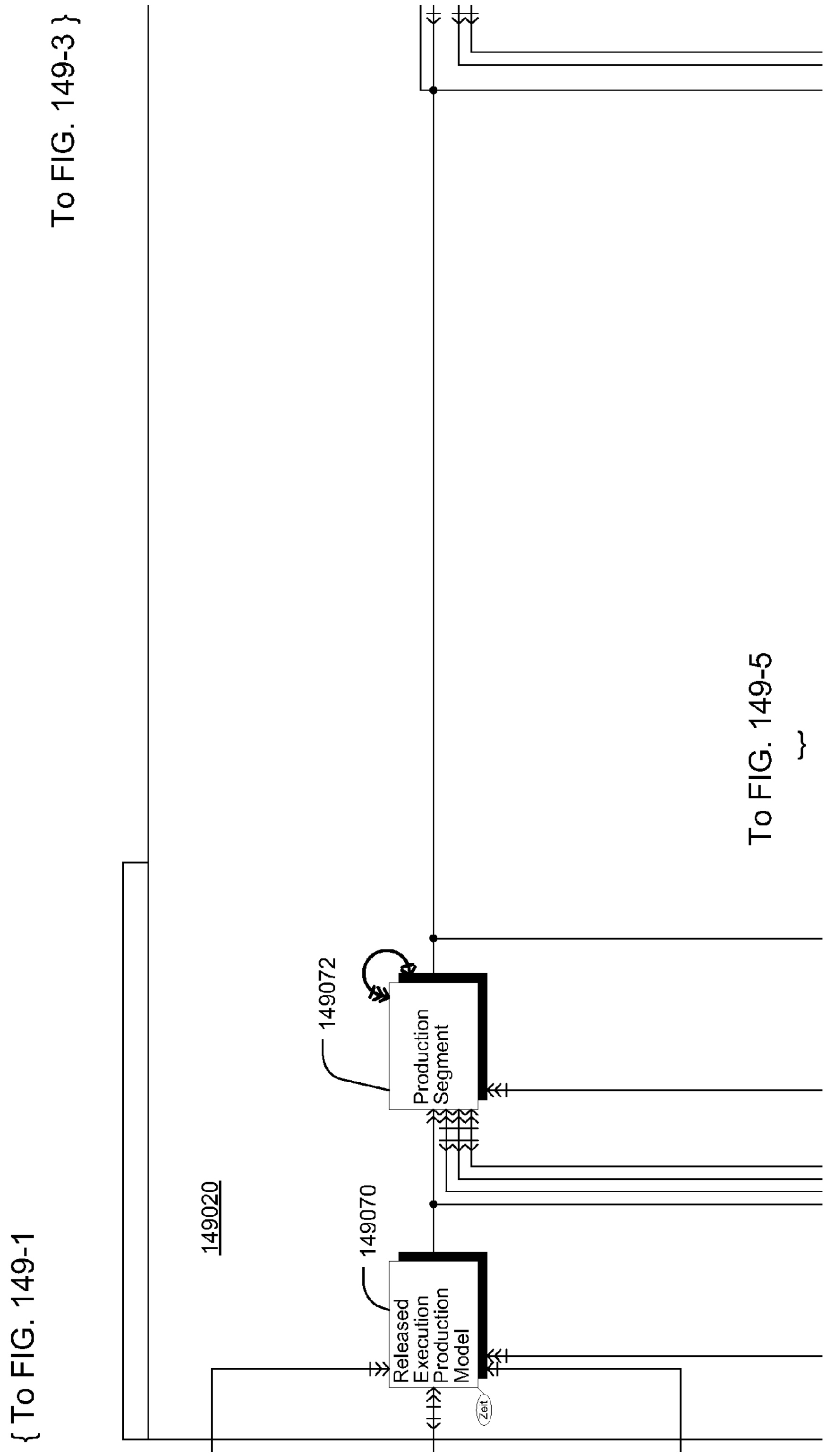
Figures 3, 149:
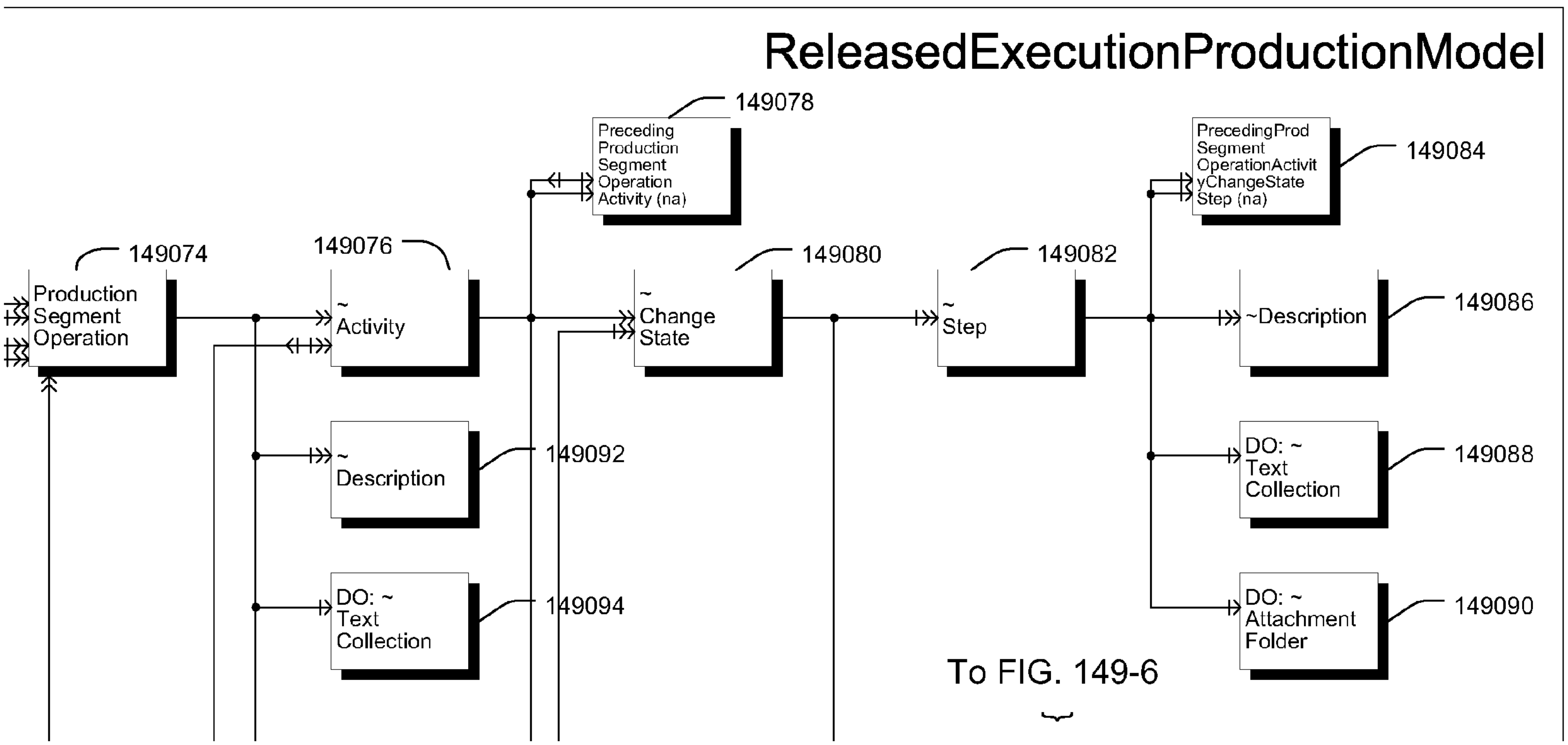
Figures 4, 149:
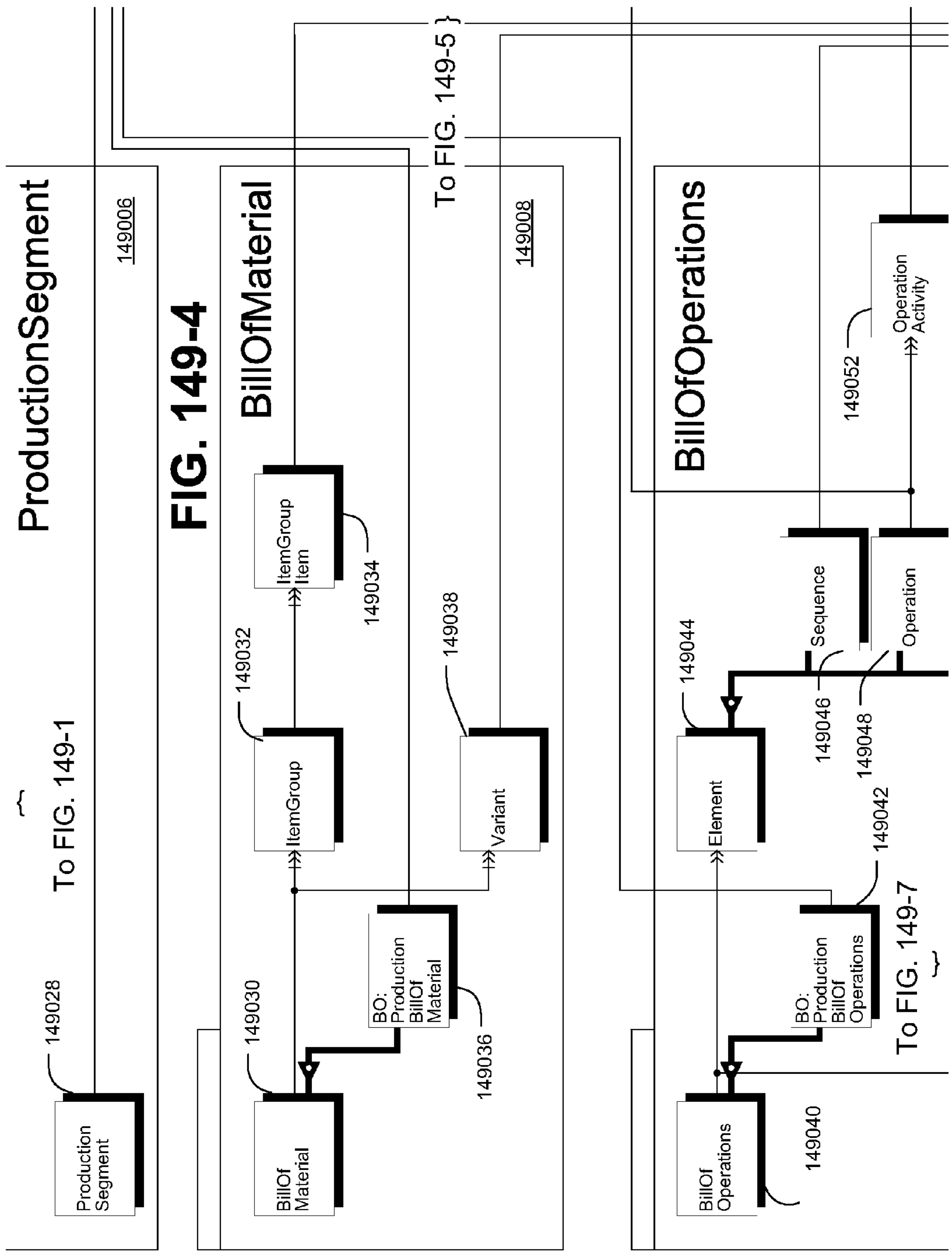
Figures 5, 149:
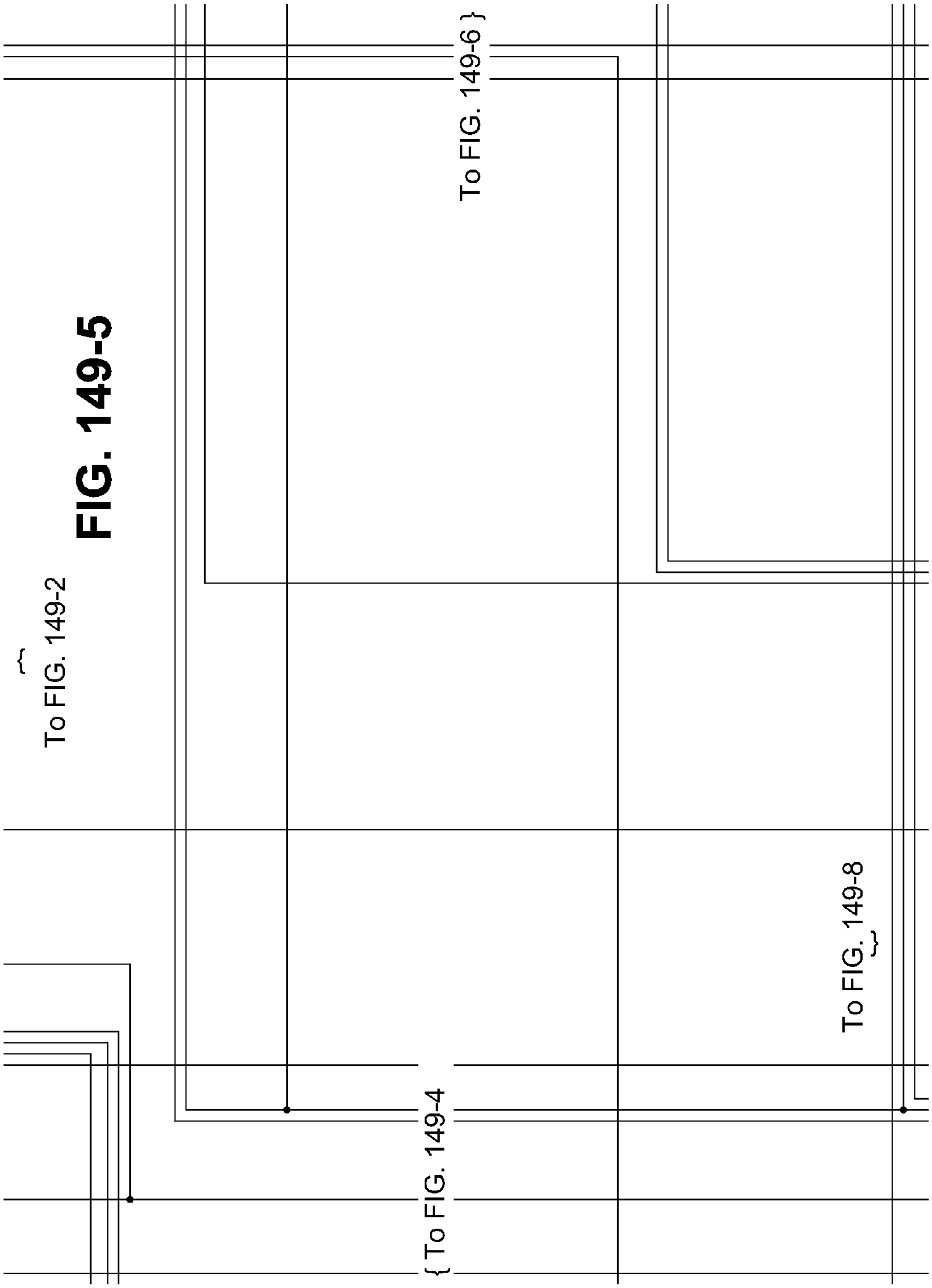
Figures 6, 149:
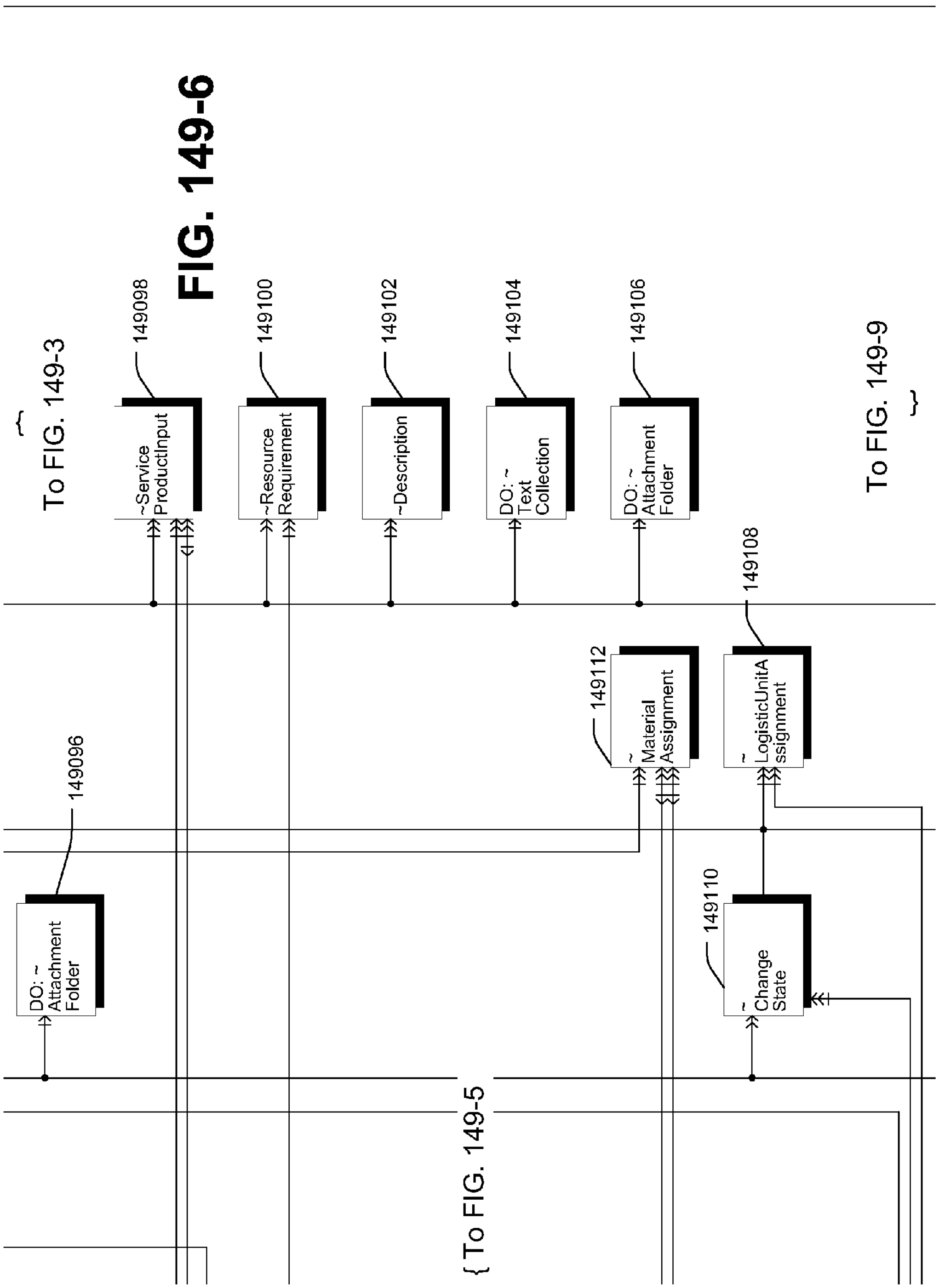
Figures 7, 149:
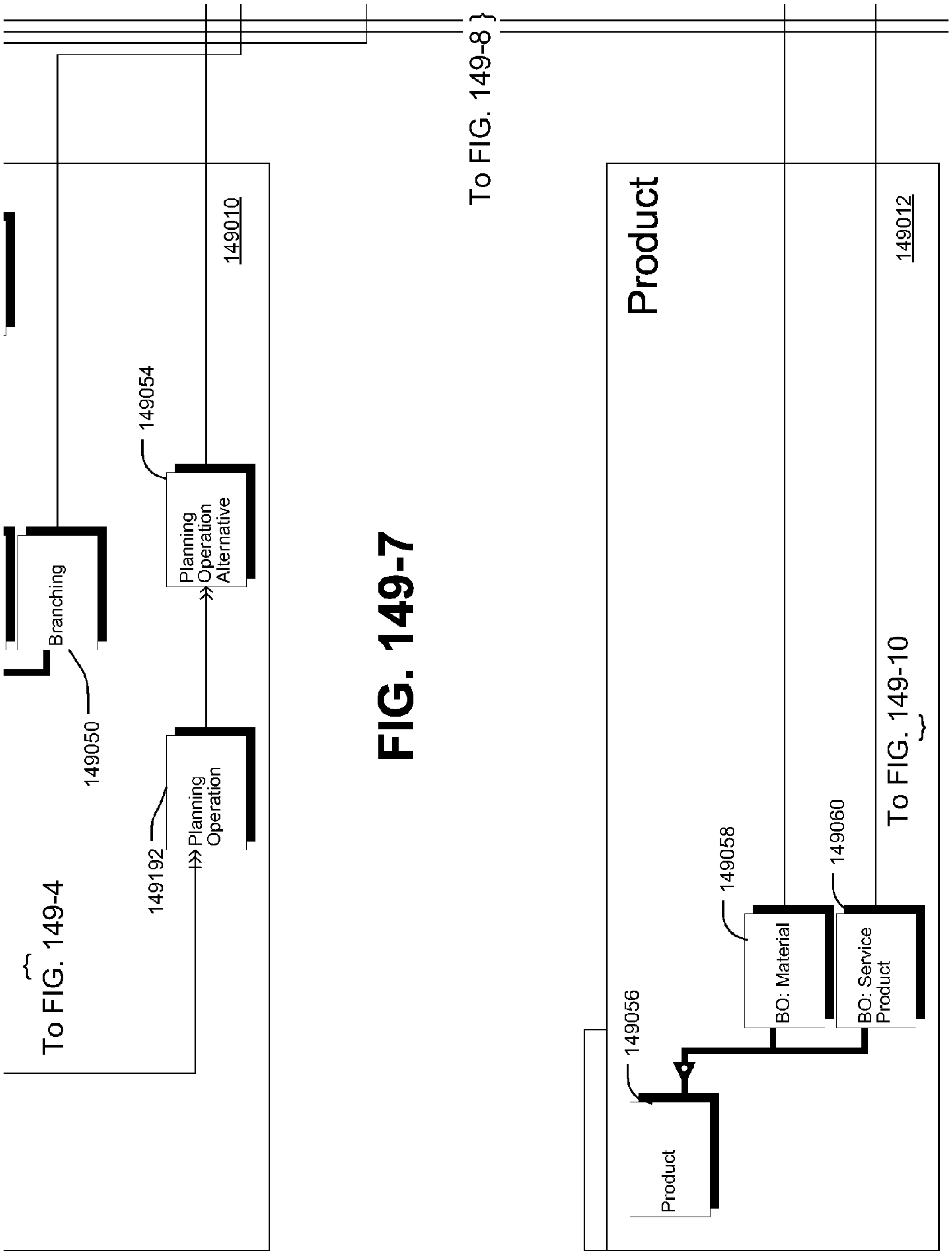
Figures 8, 149:
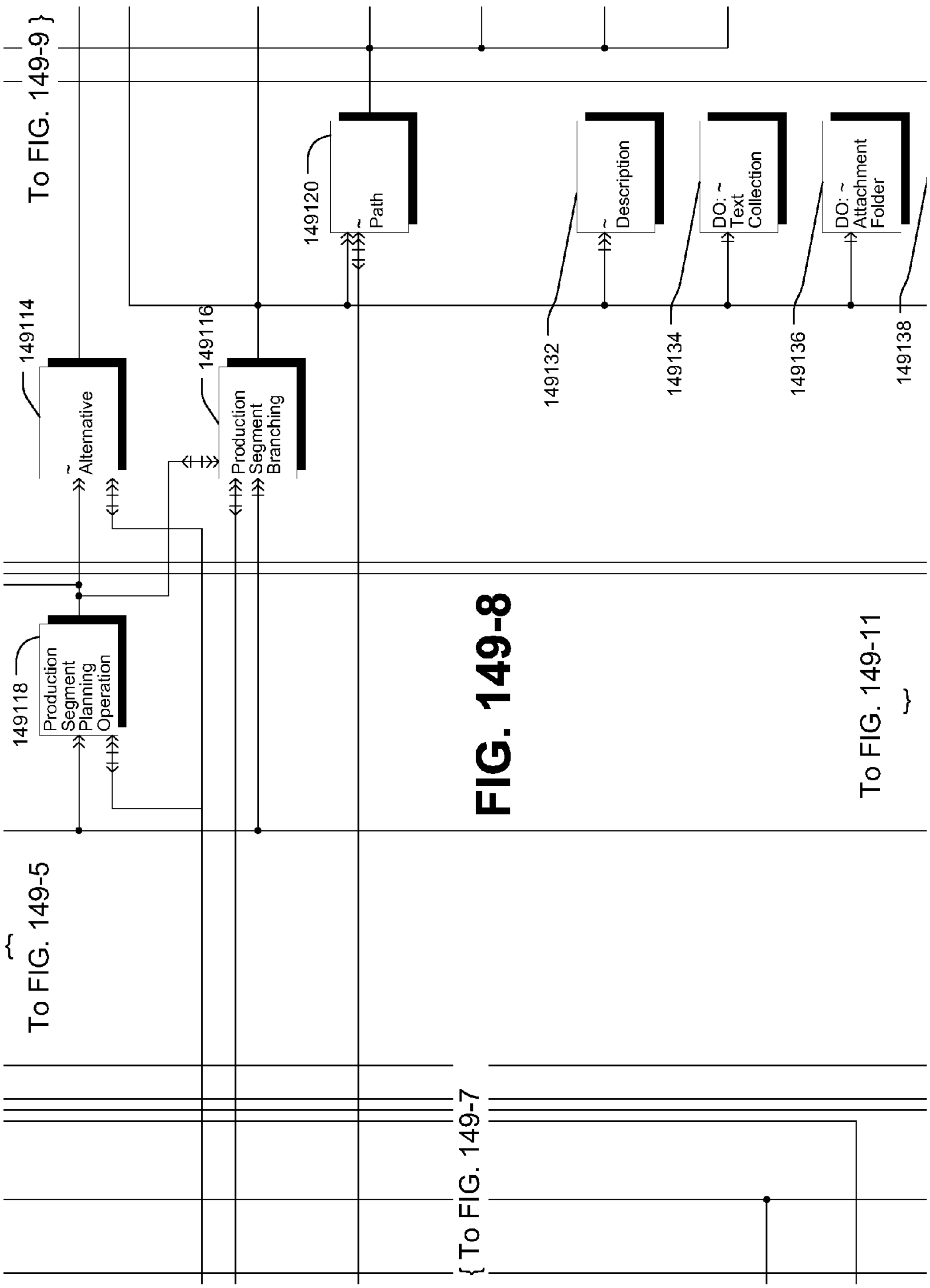
Figures 9, 149:
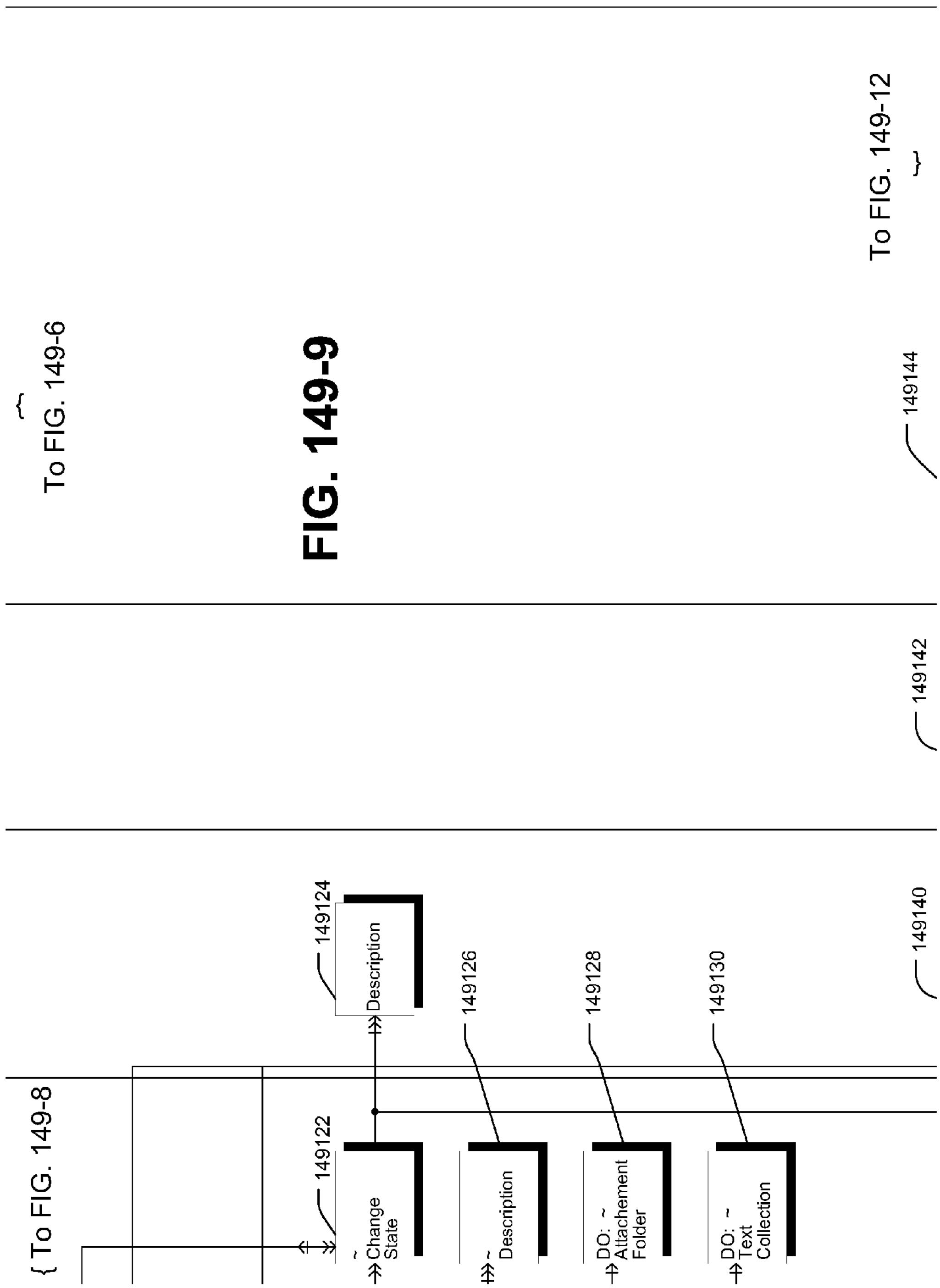
Figures 10, 149:
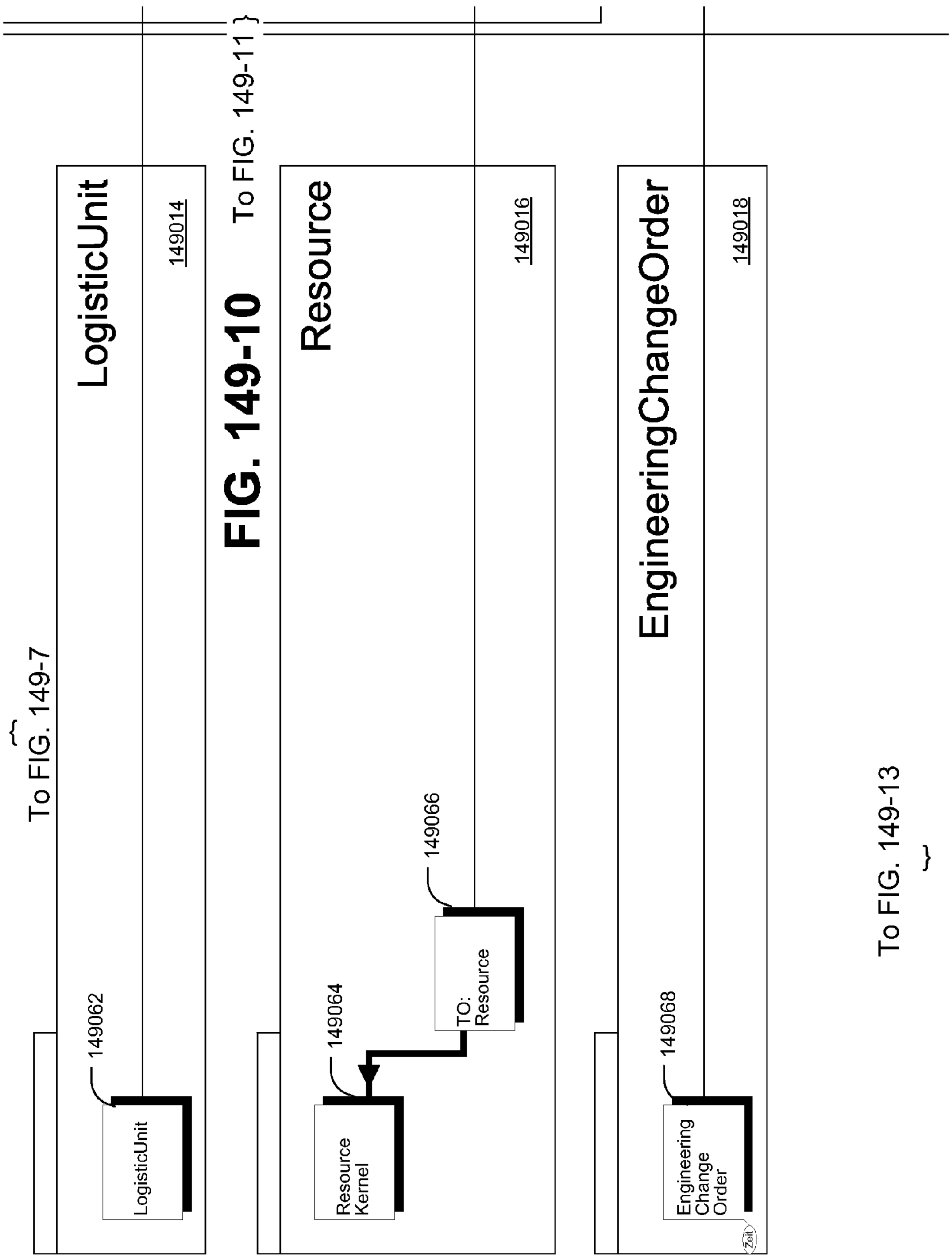
Figures 11, 149:
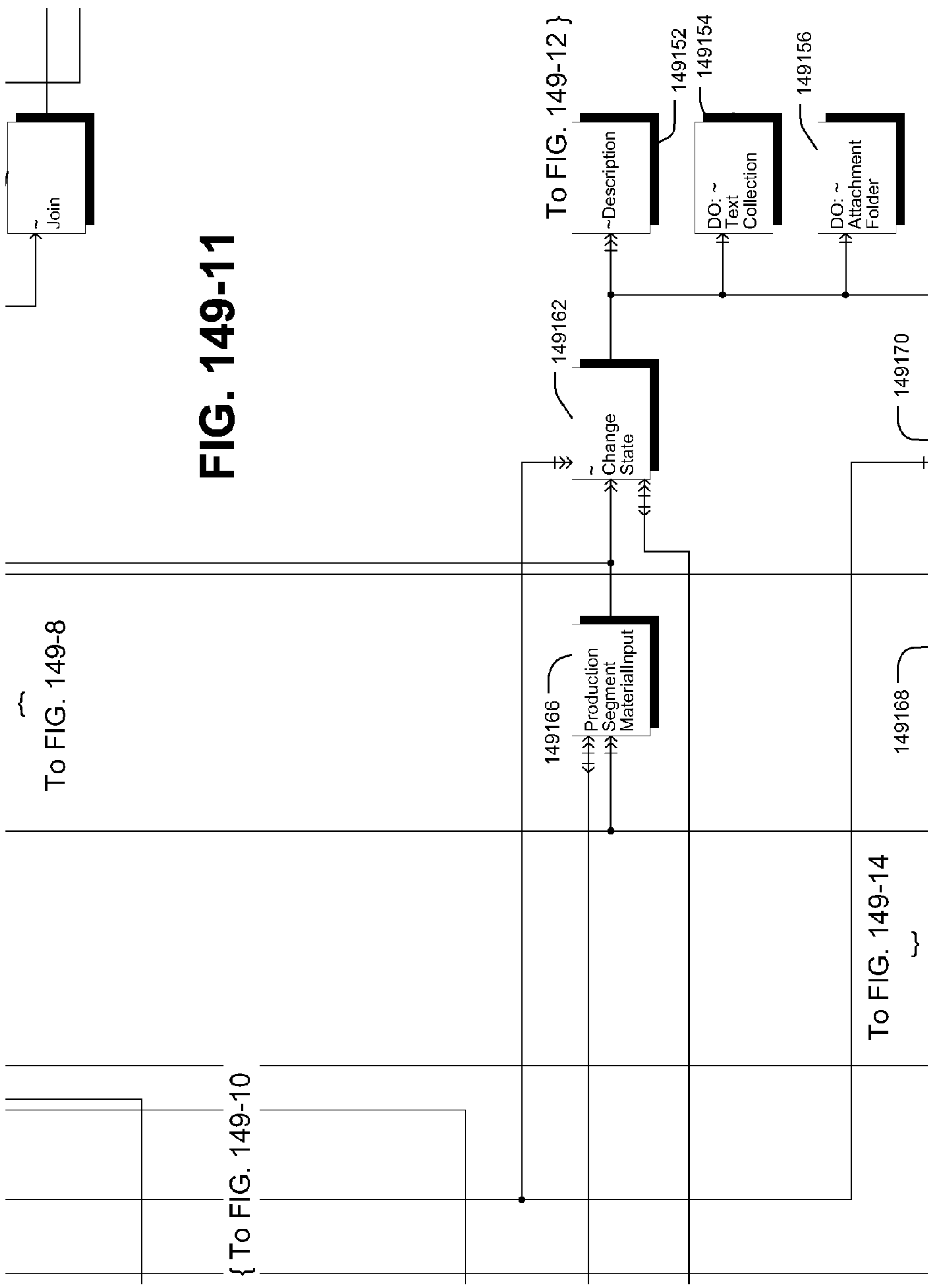
Figures 12, 149:
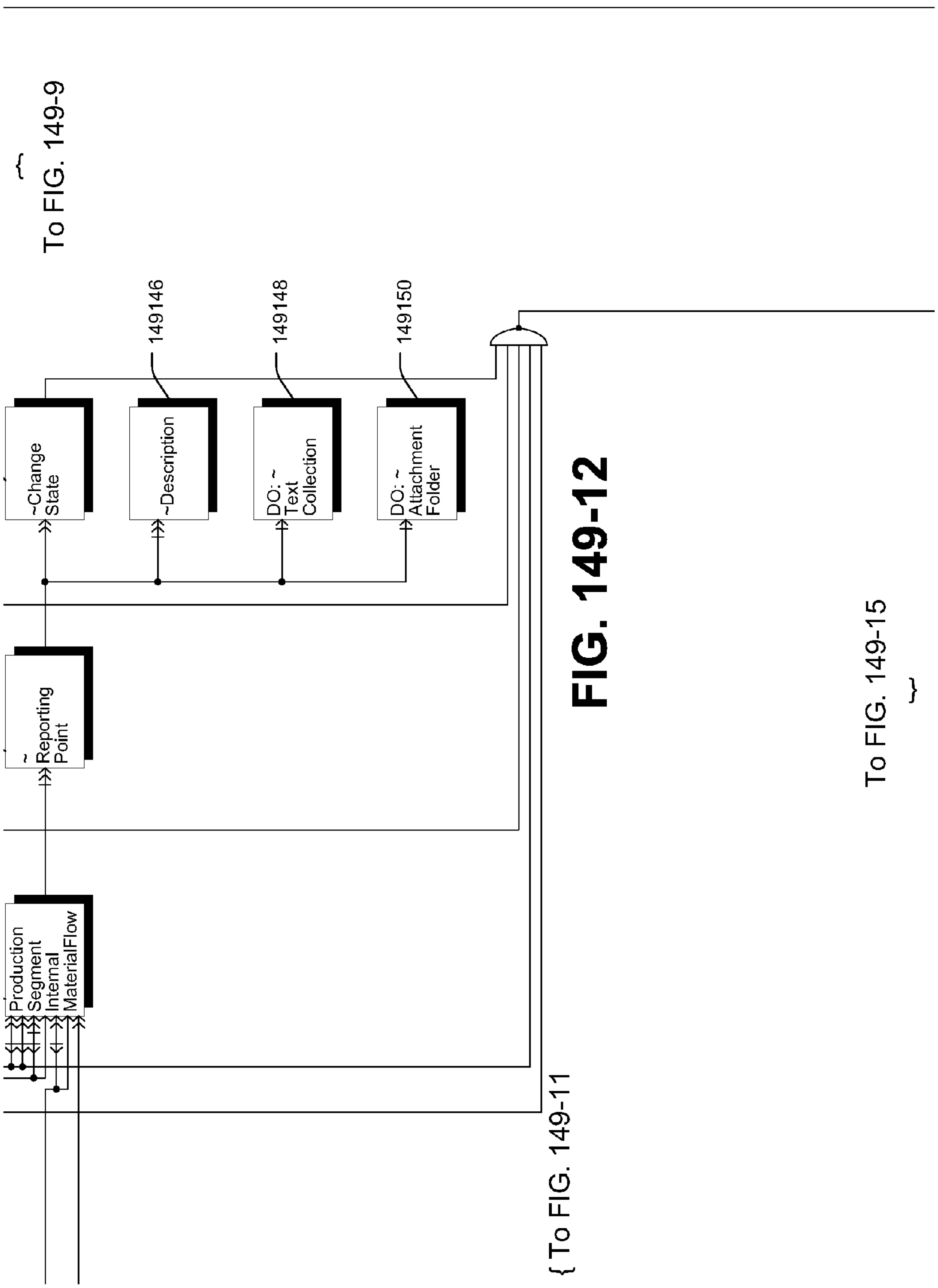
Figures 14, 149:
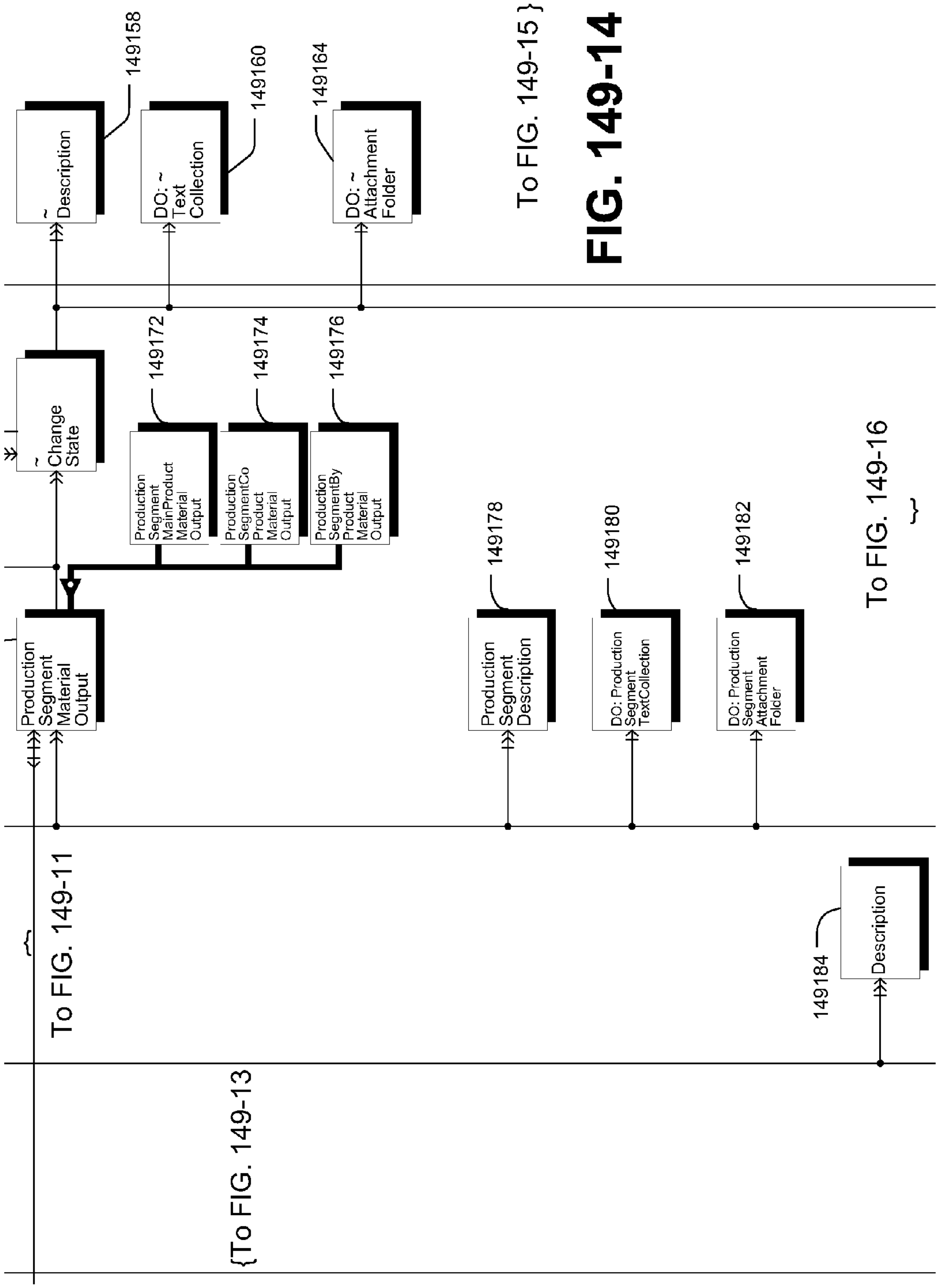
Figures 16, 149:
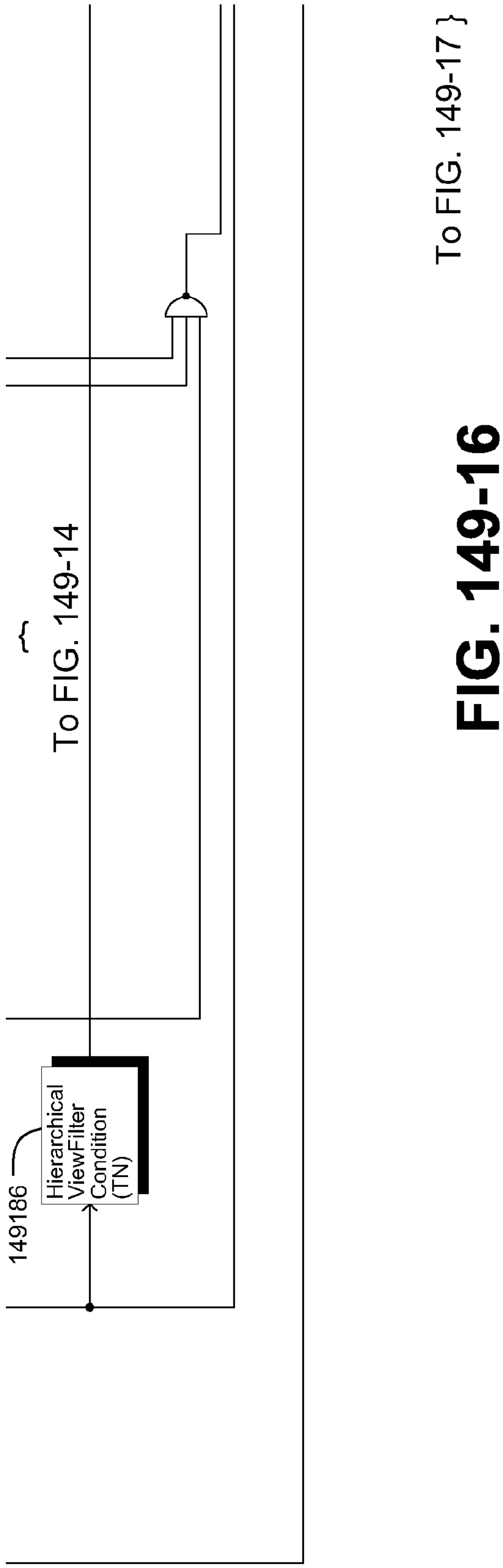
Figures 17, 149:
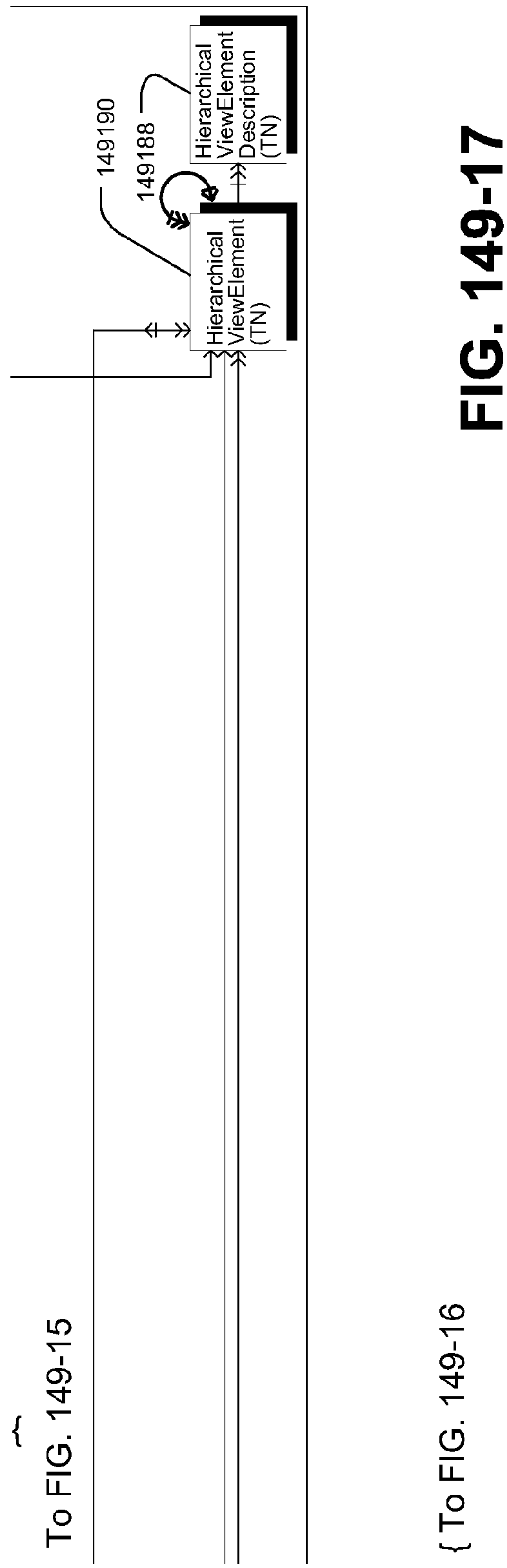
Figures 1, 150:
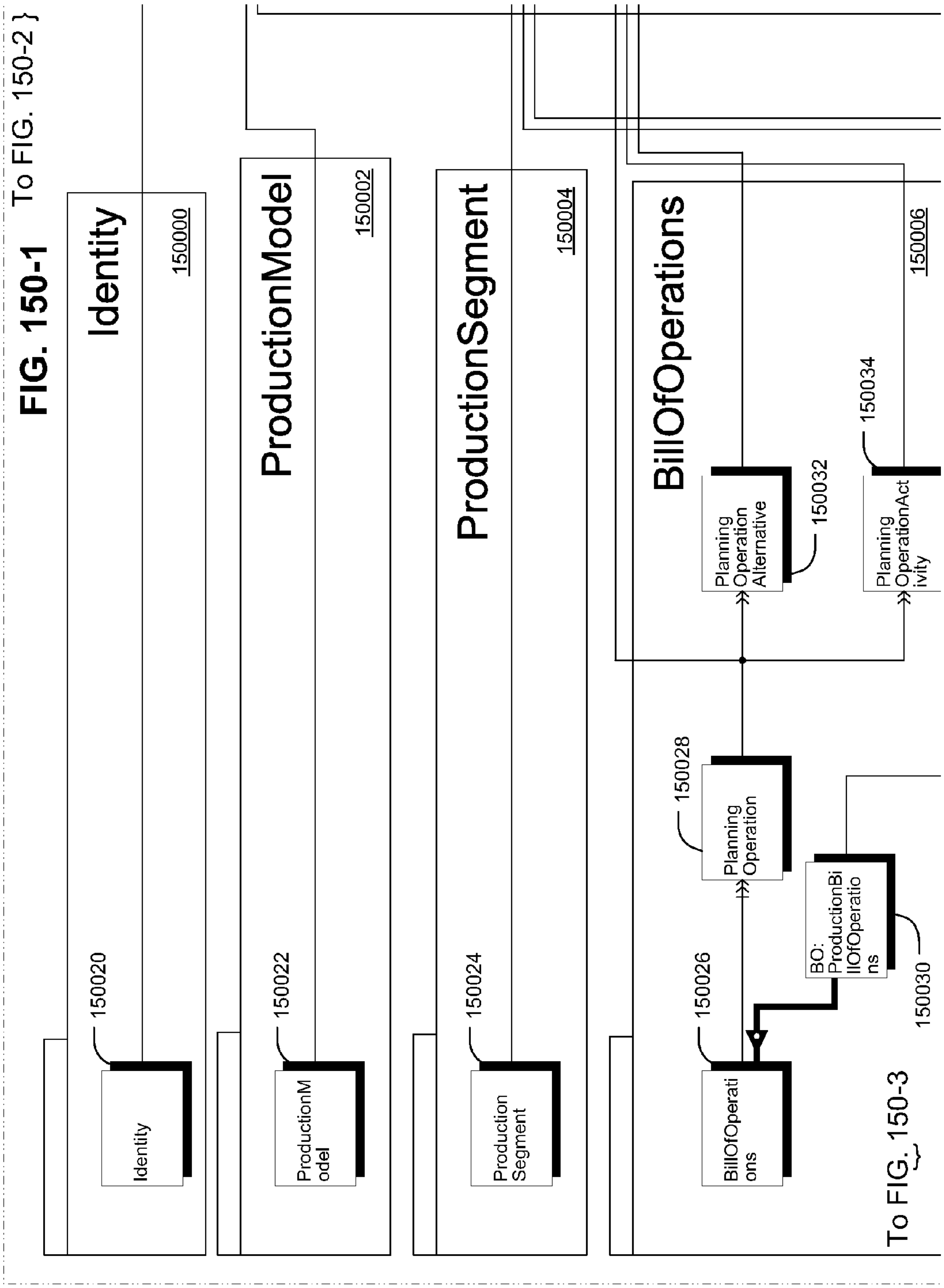
Figures 2, 150:
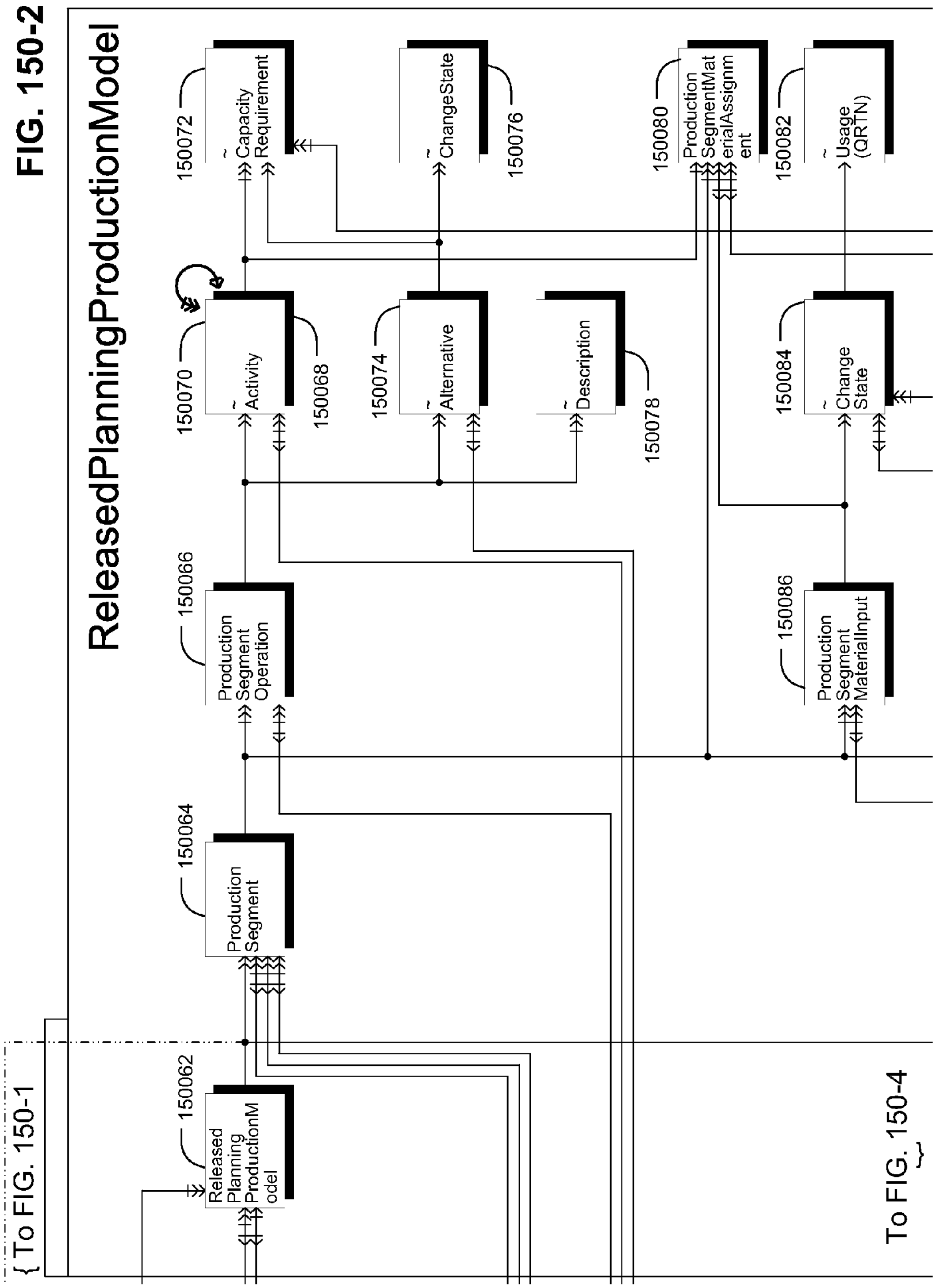
Figures 3, 150:
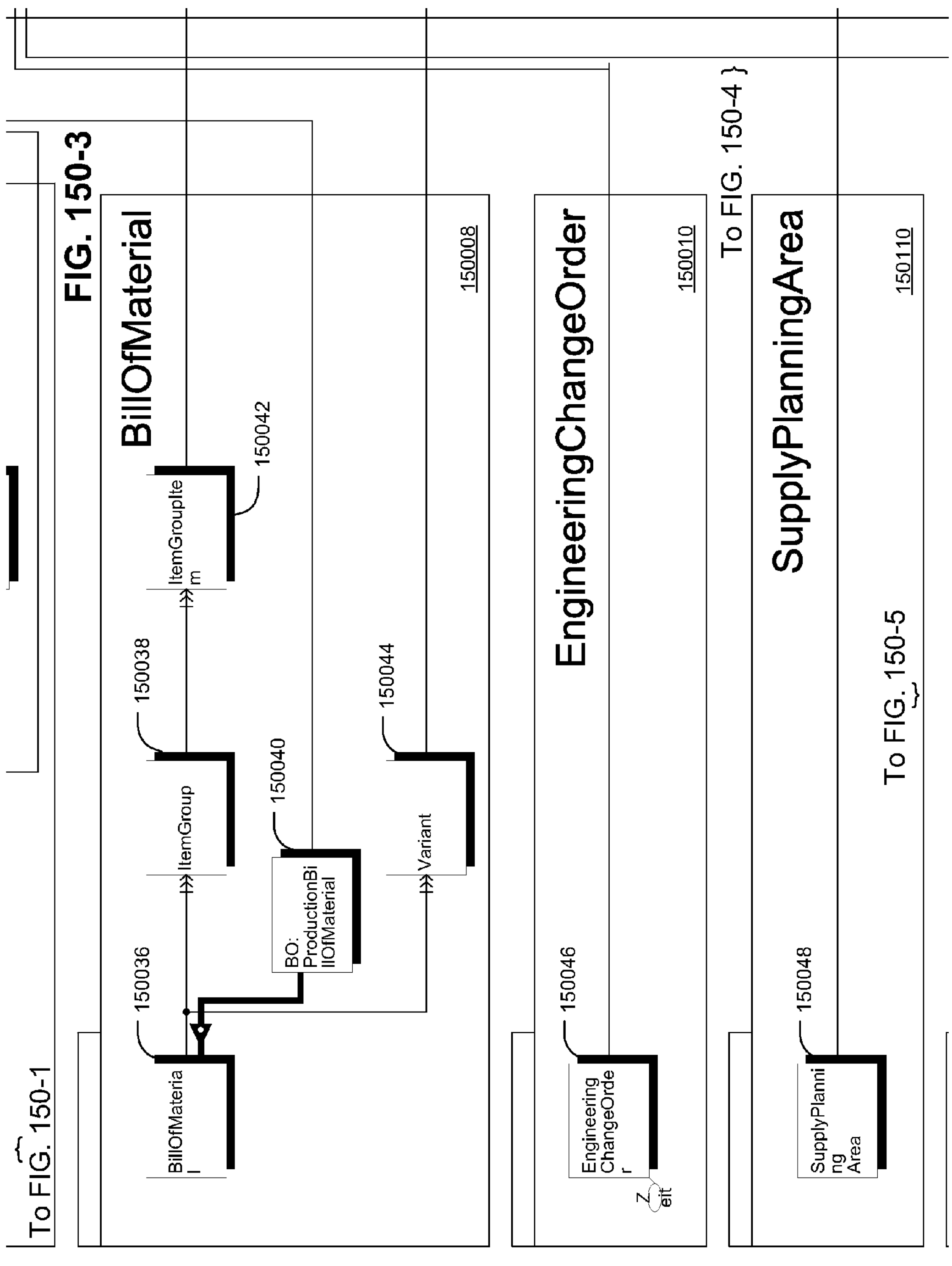
Figures 4, 150:
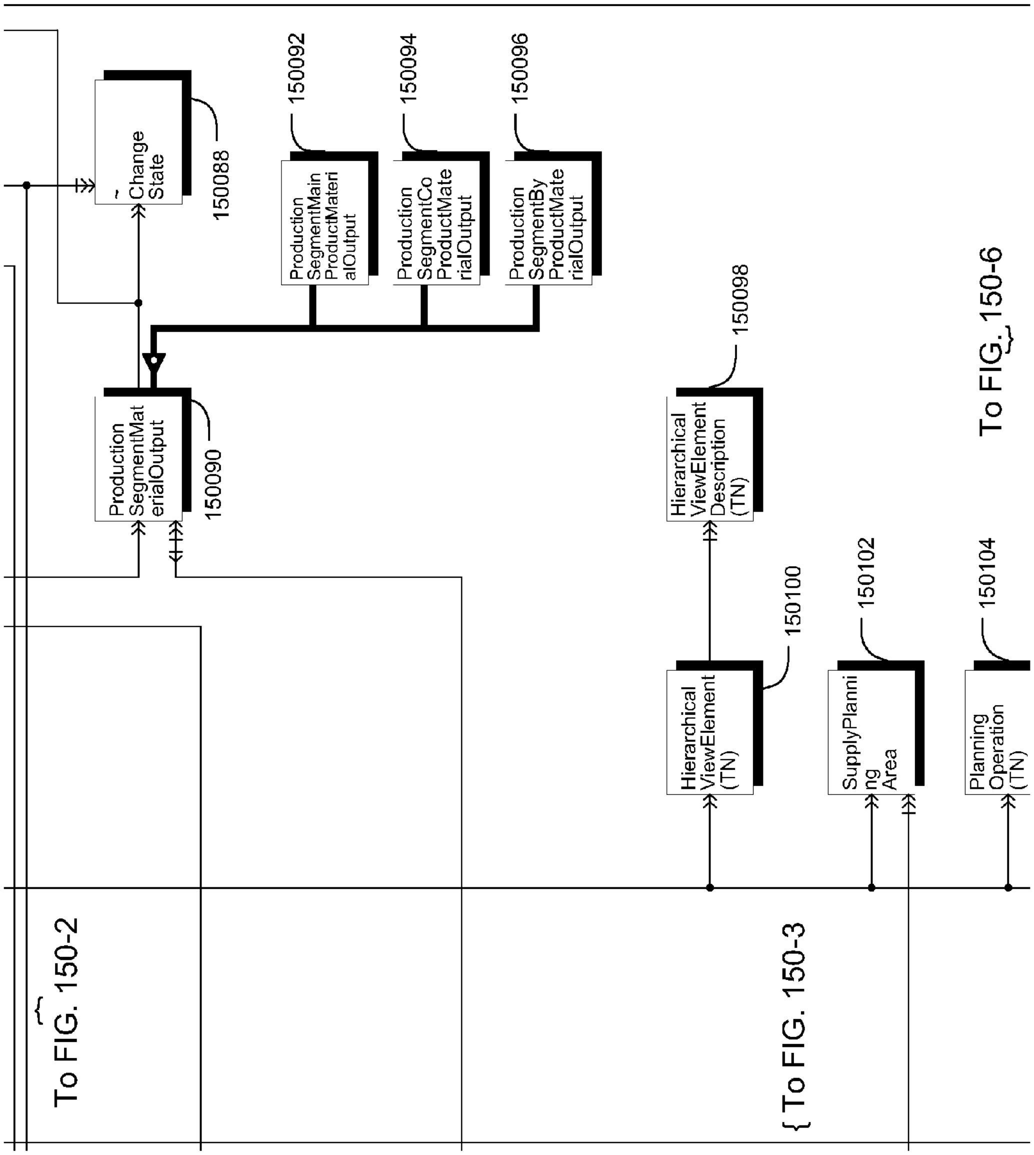
Figures 5, 150:
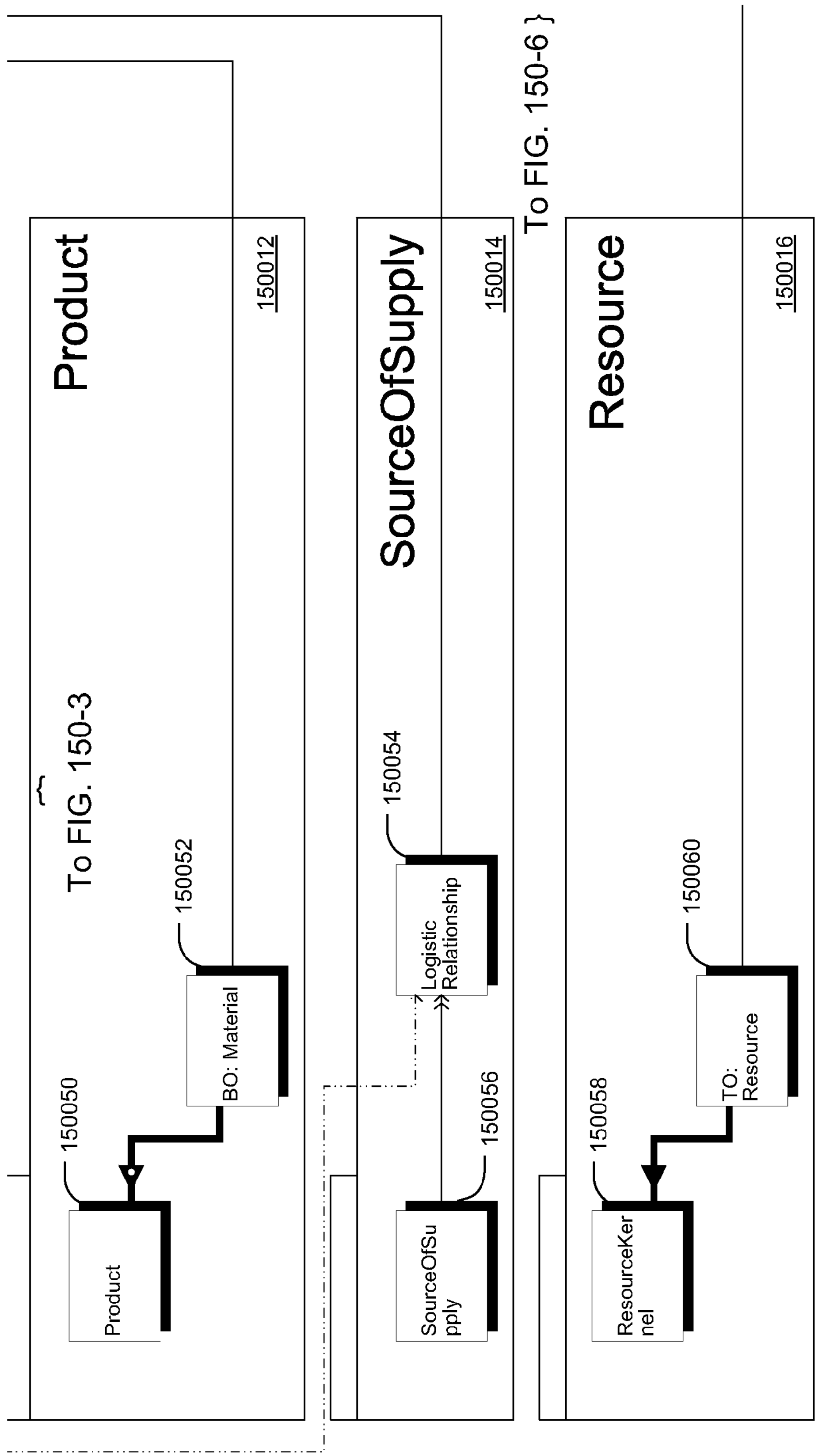
Figures 6, 150:
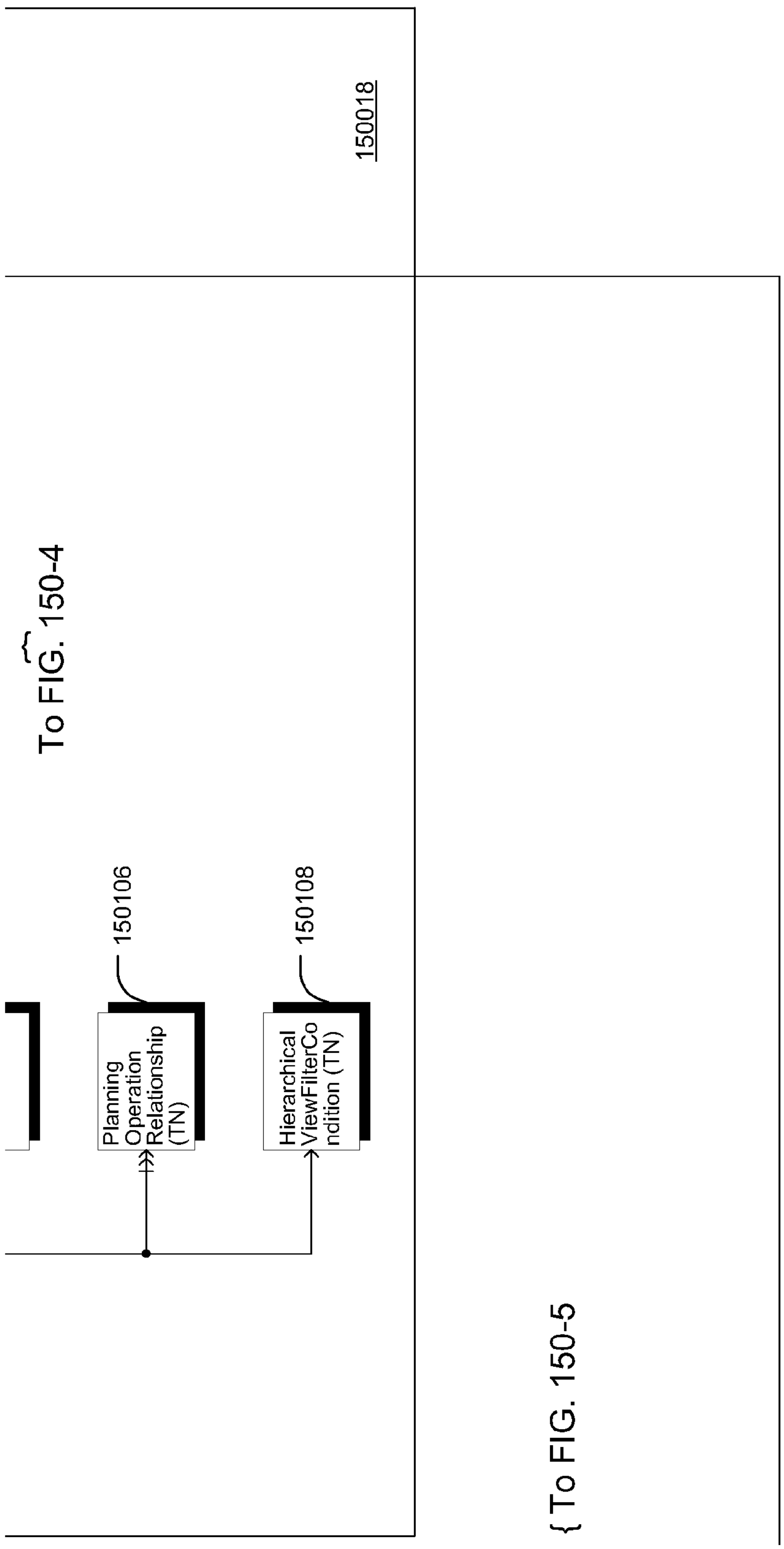
Figures 1, 151:
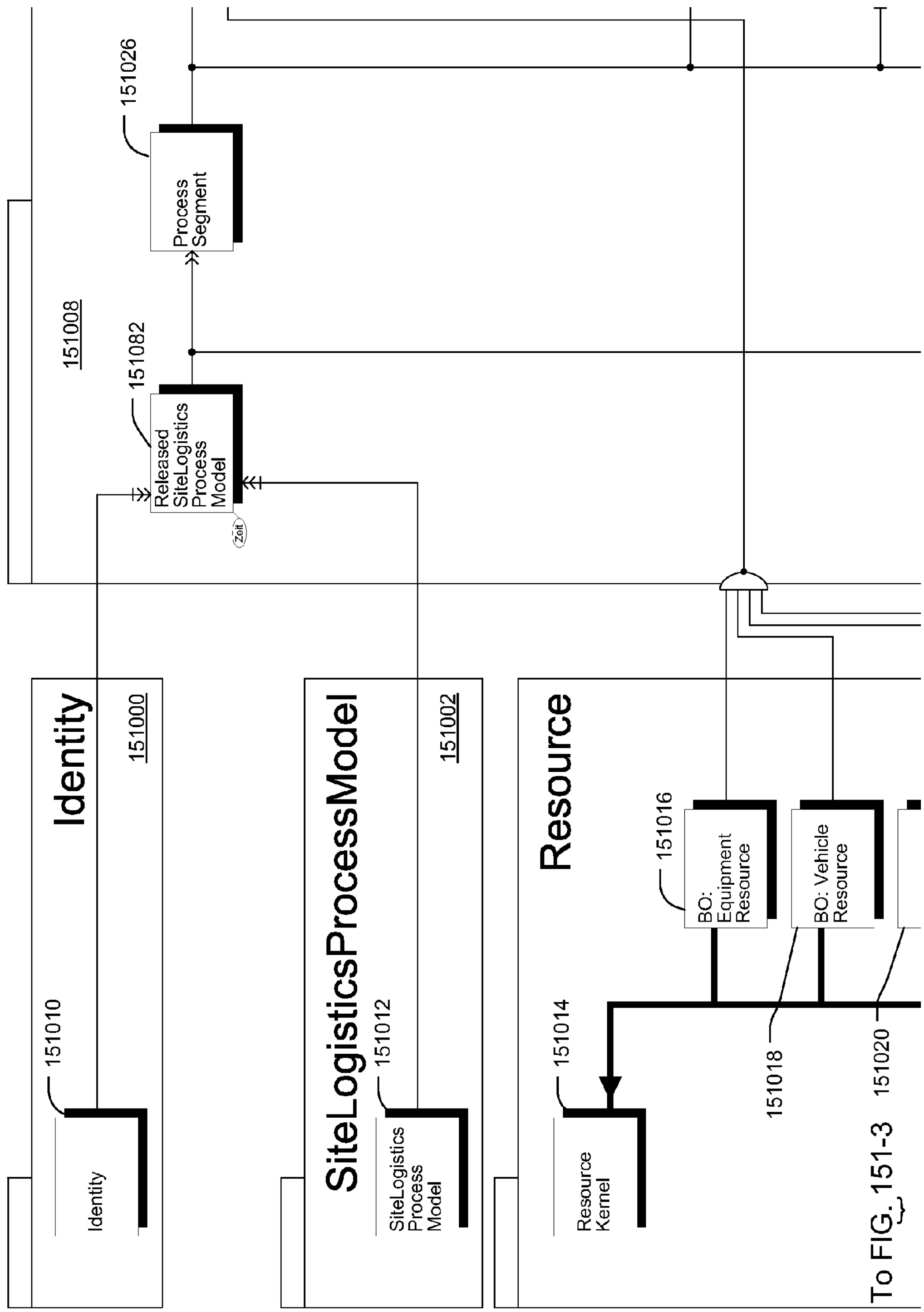
Figures 2, 151:
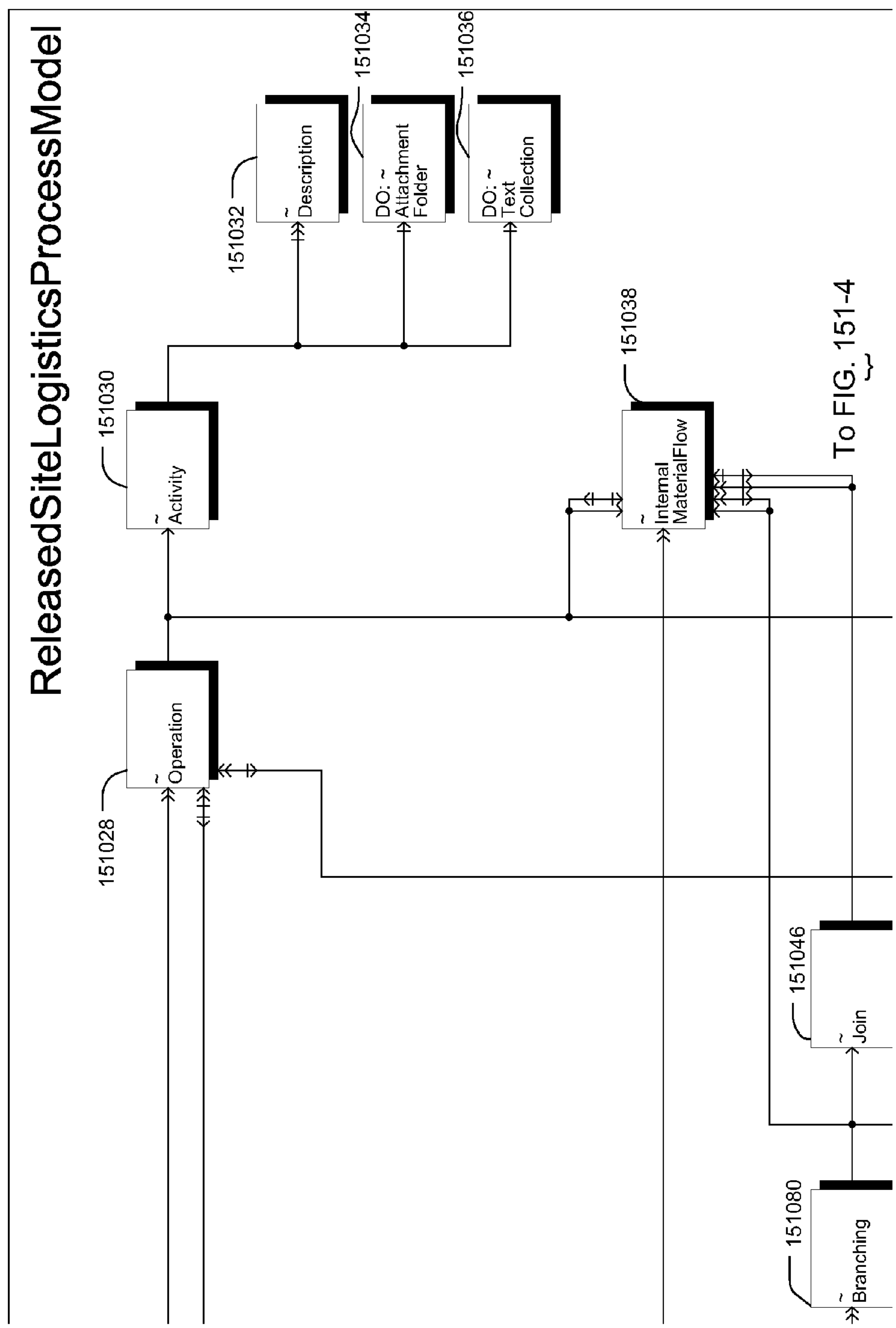
Figures 3, 151:
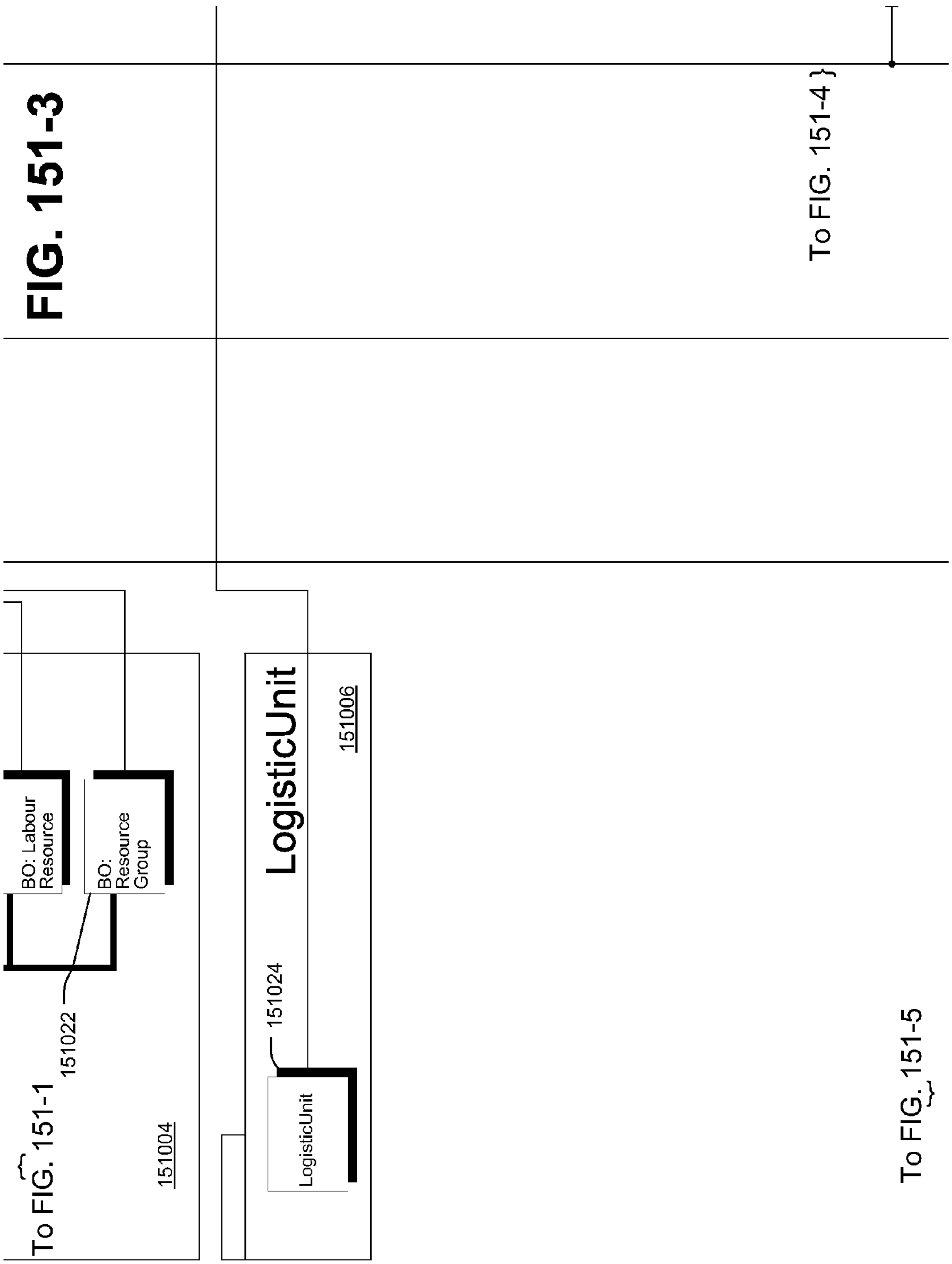
Figures 4, 151:
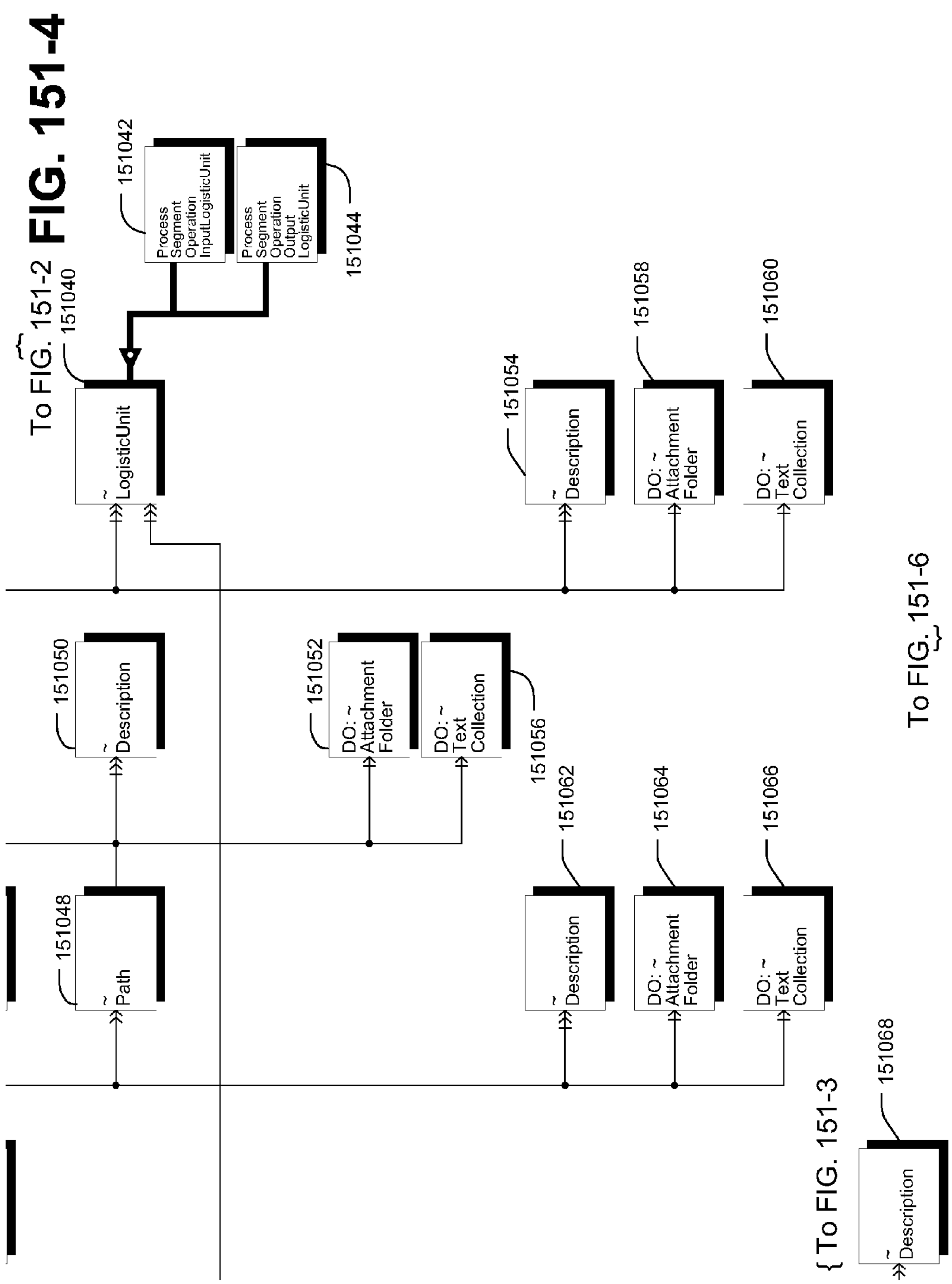
Figures 5, 151:
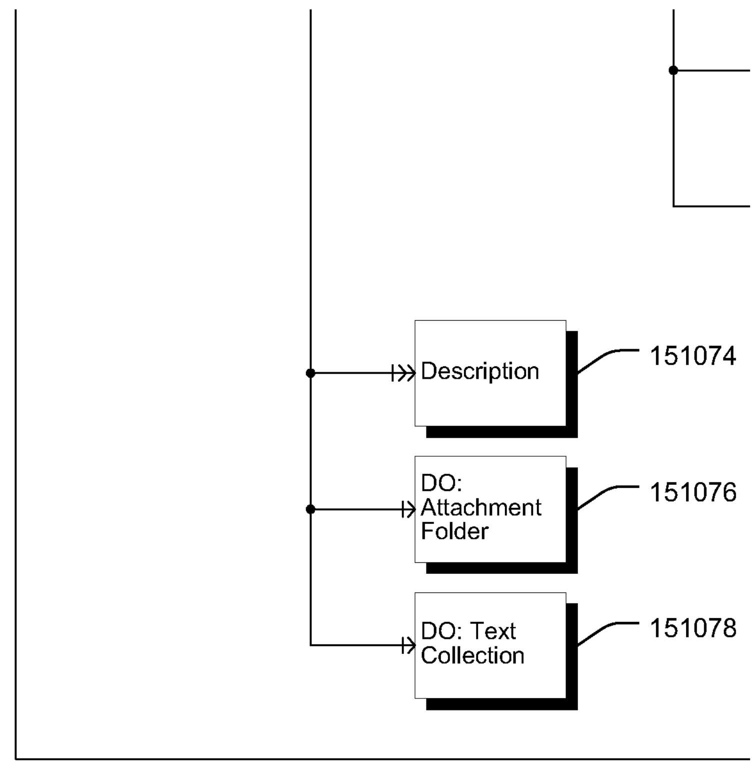
Figures 6, 151:
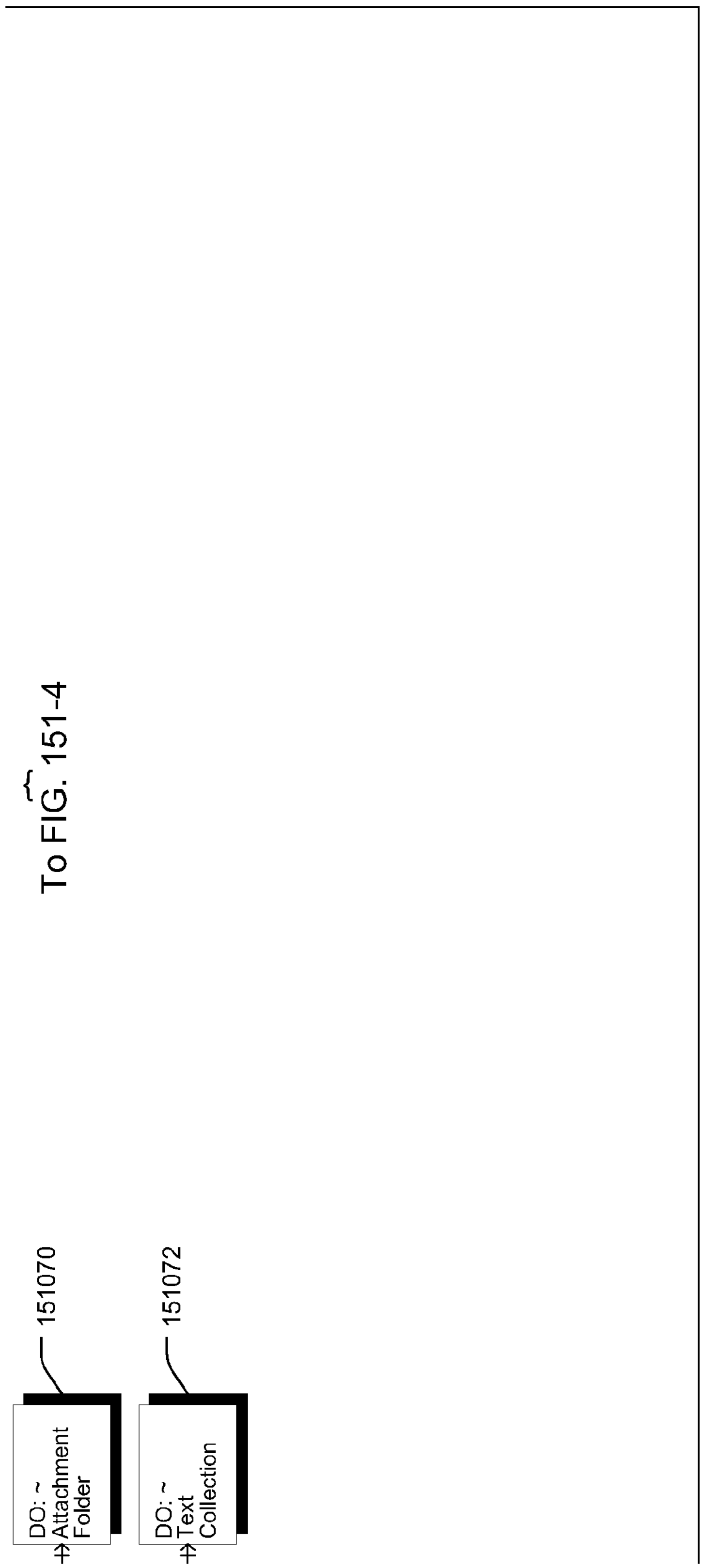
Figures 1, 152:
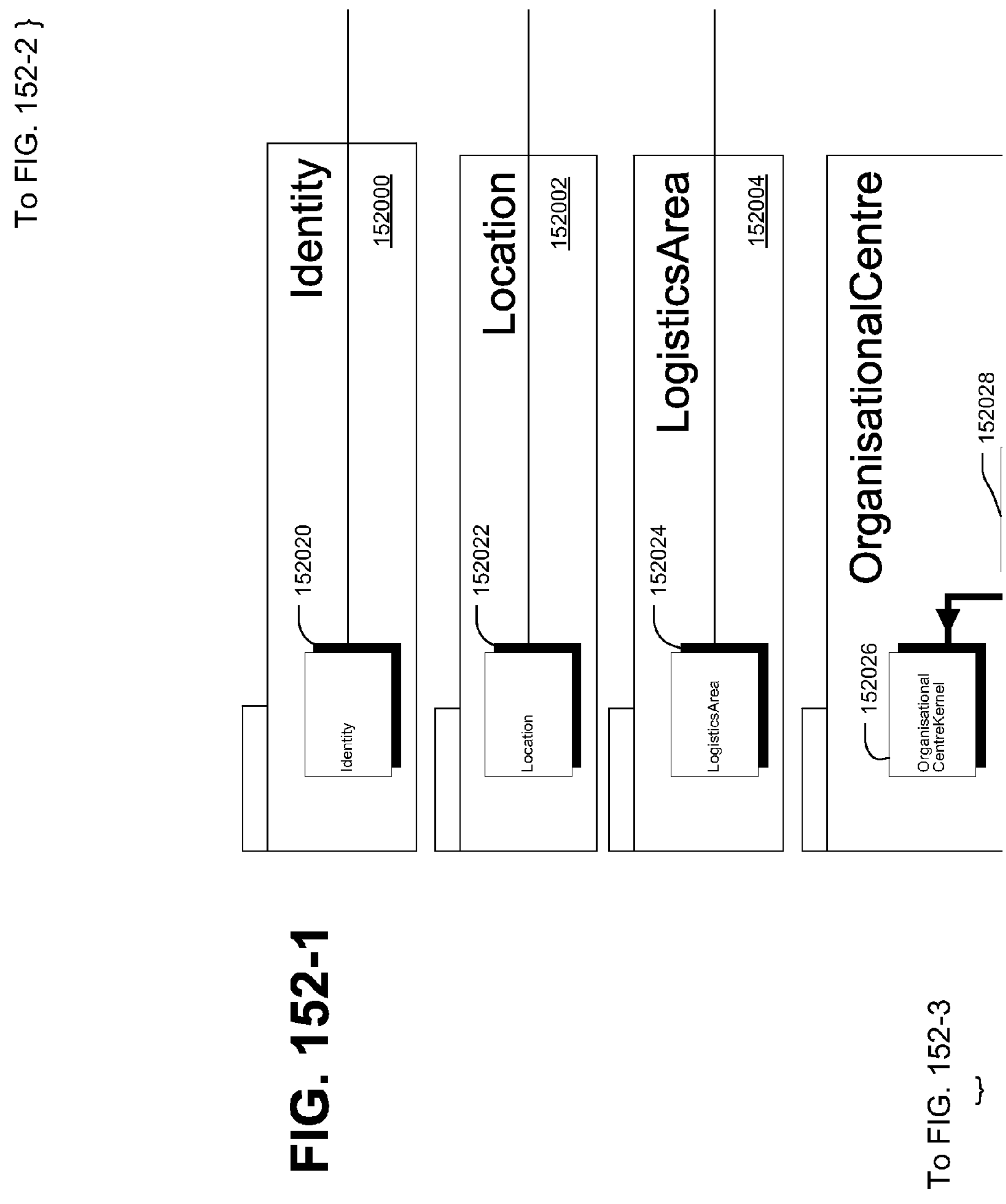
Figures 2, 152:
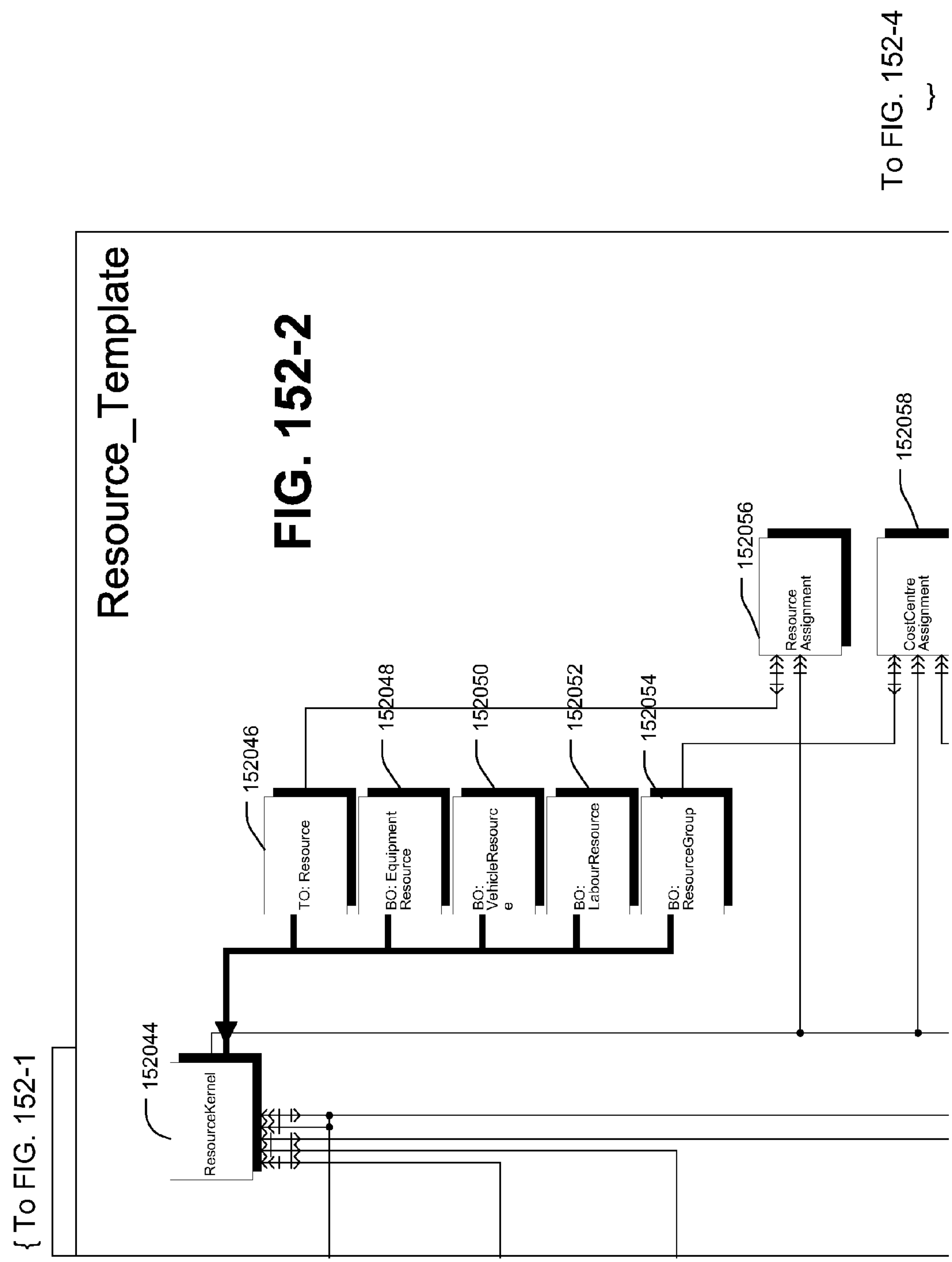
Figures 3, 152:
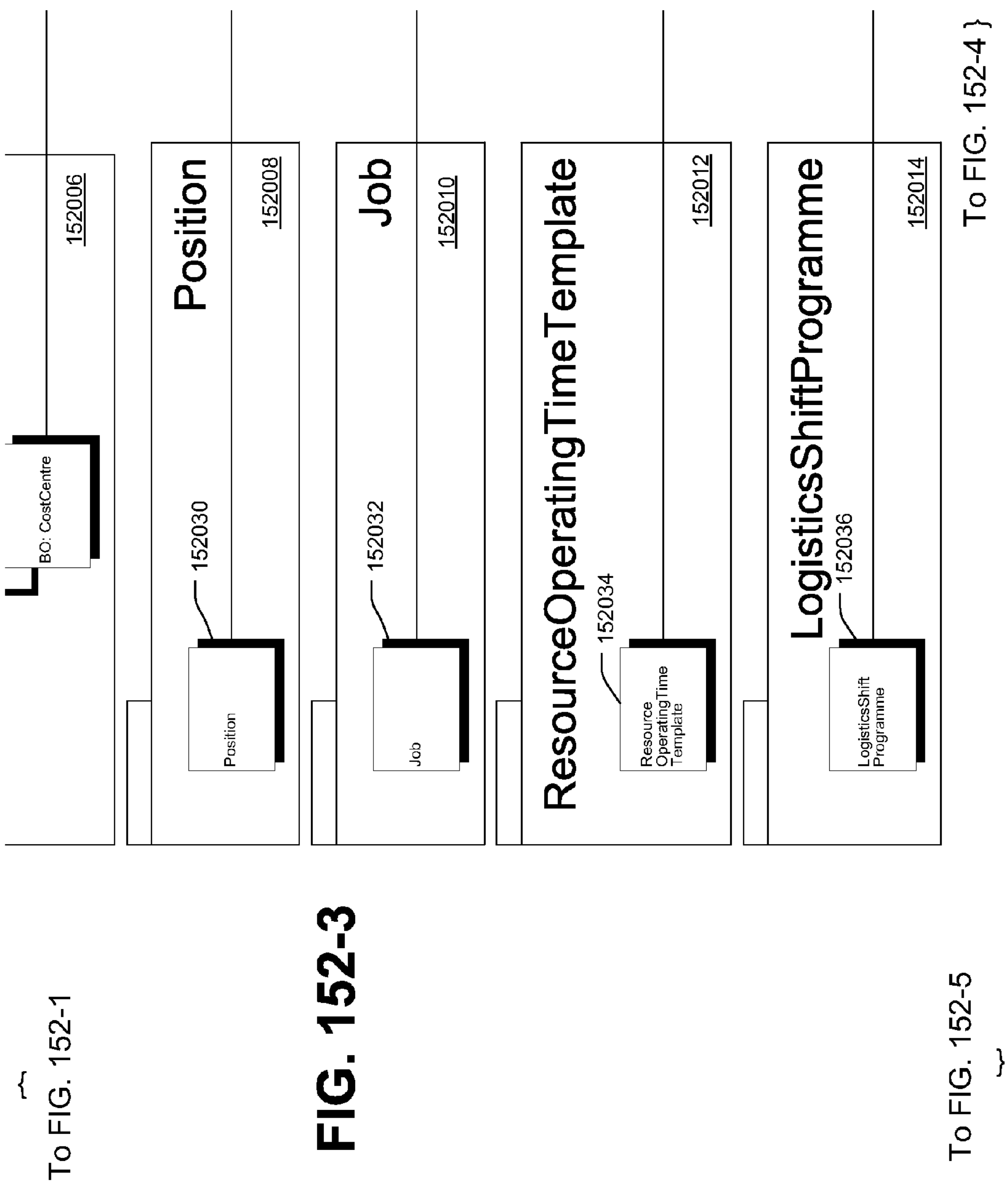
Figures 4, 152:
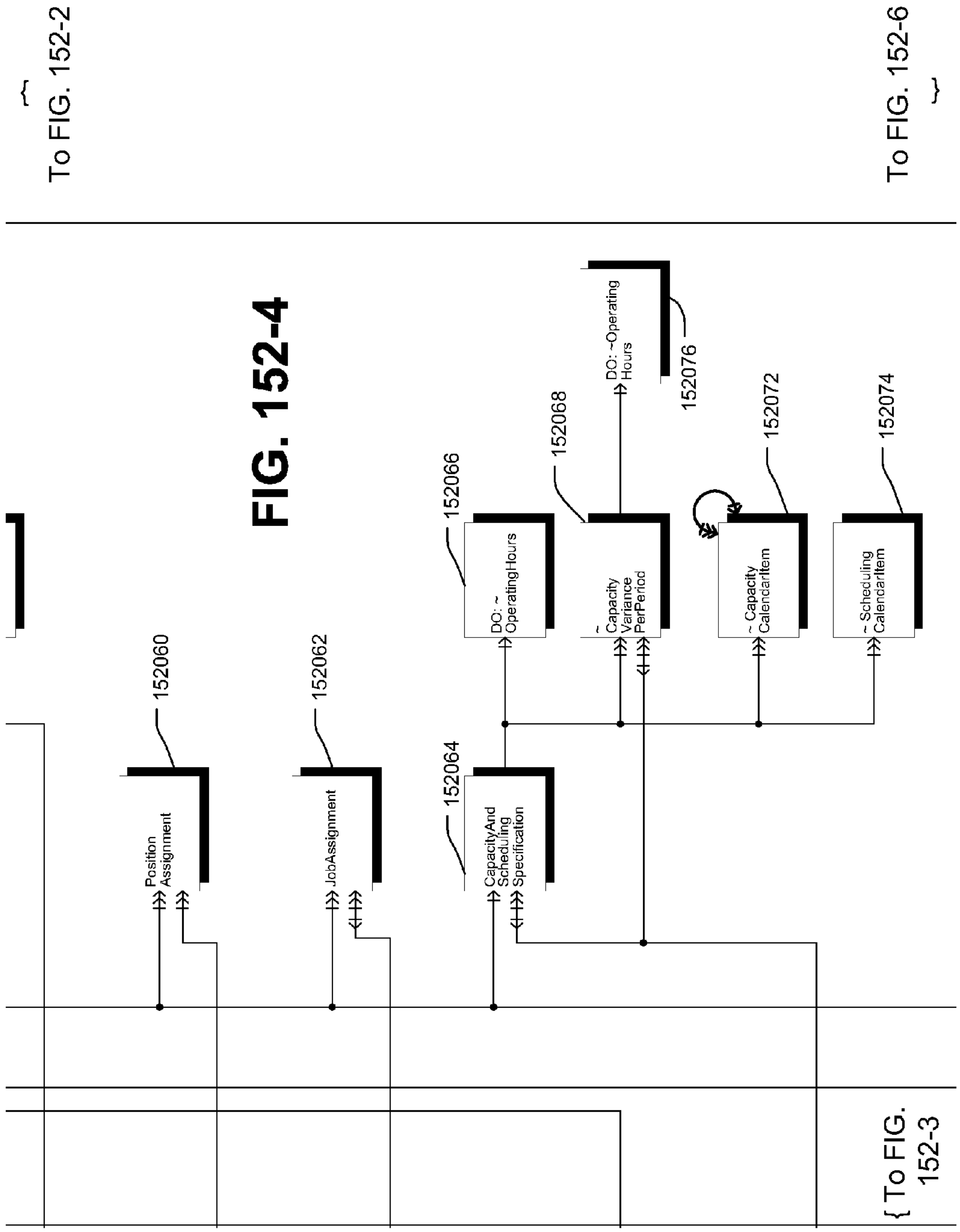
Figures 5, 152:
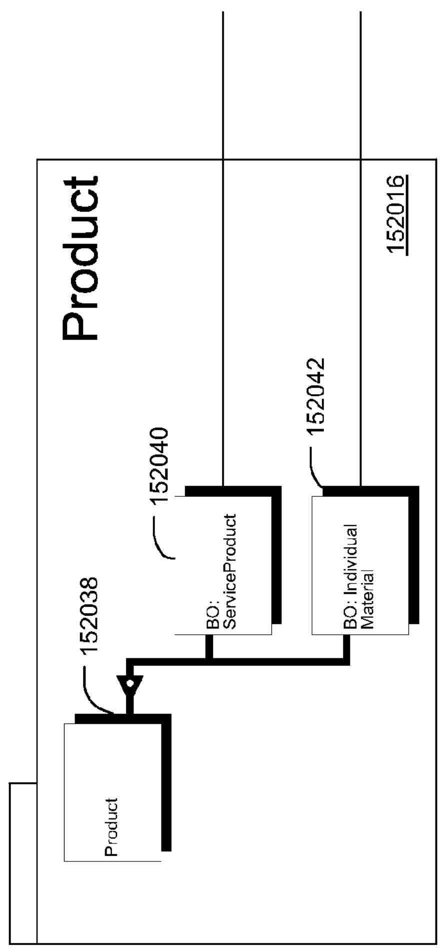
Figures 6, 152:
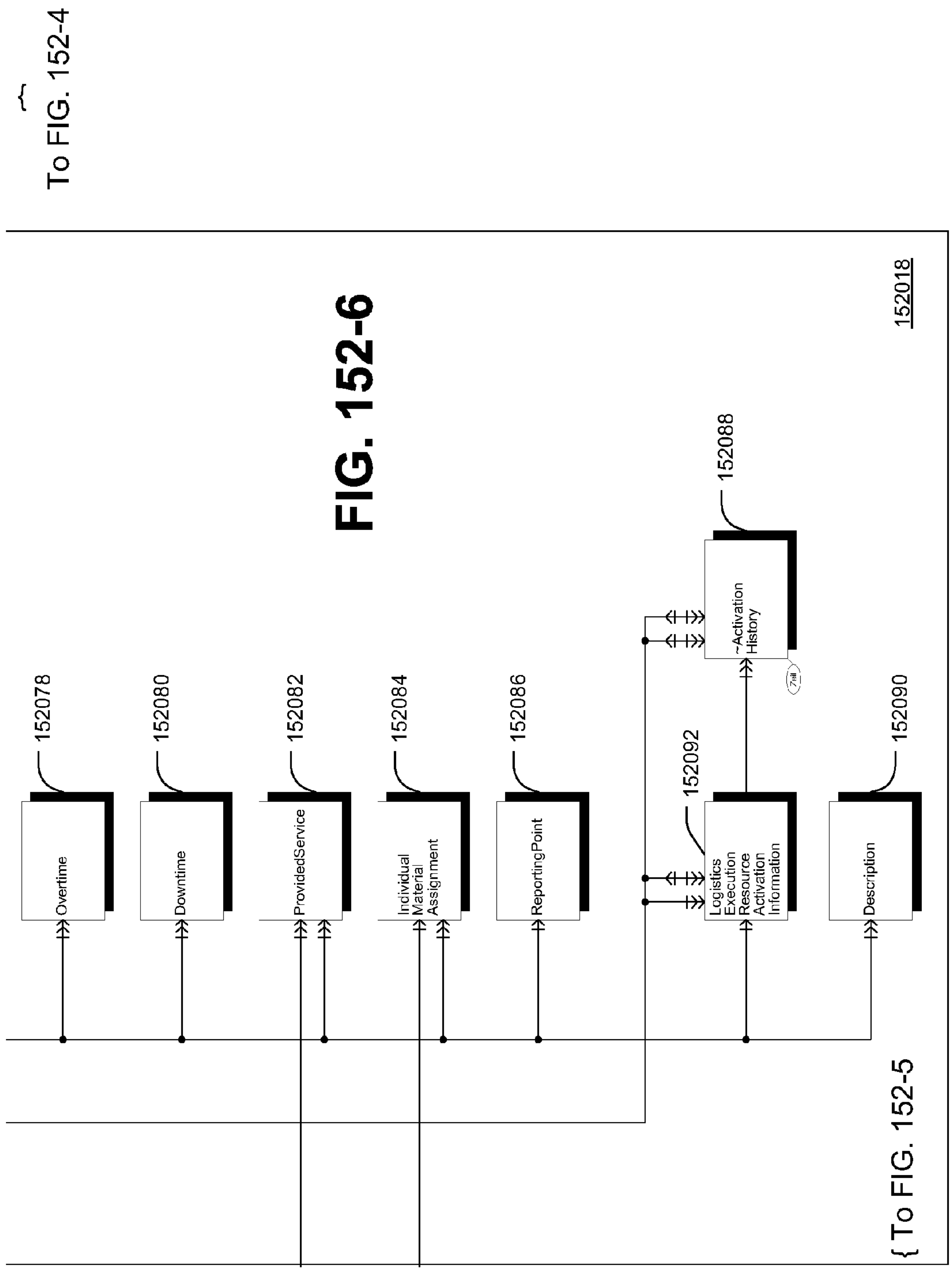
Figure 153:
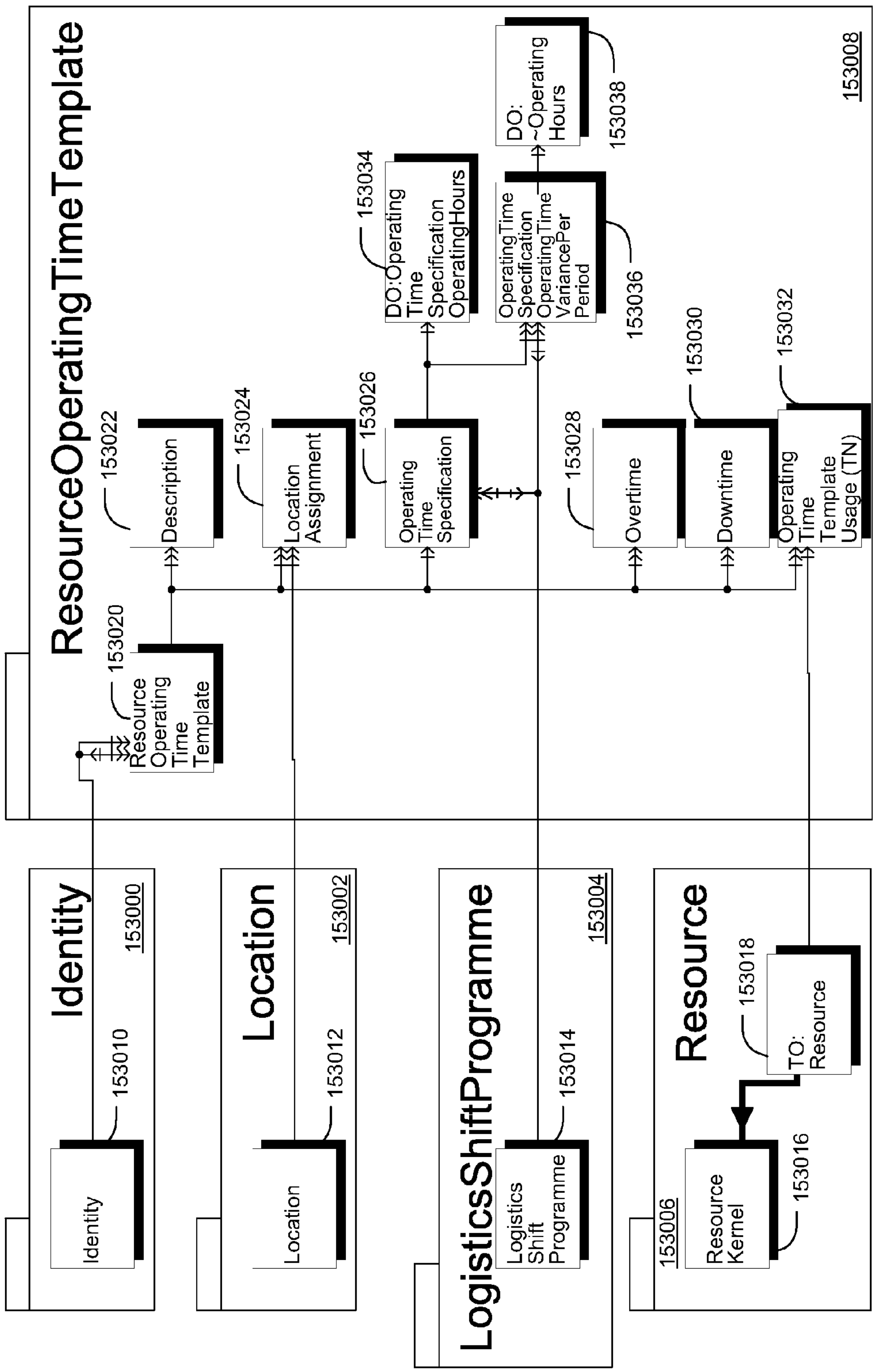
Figure 154:
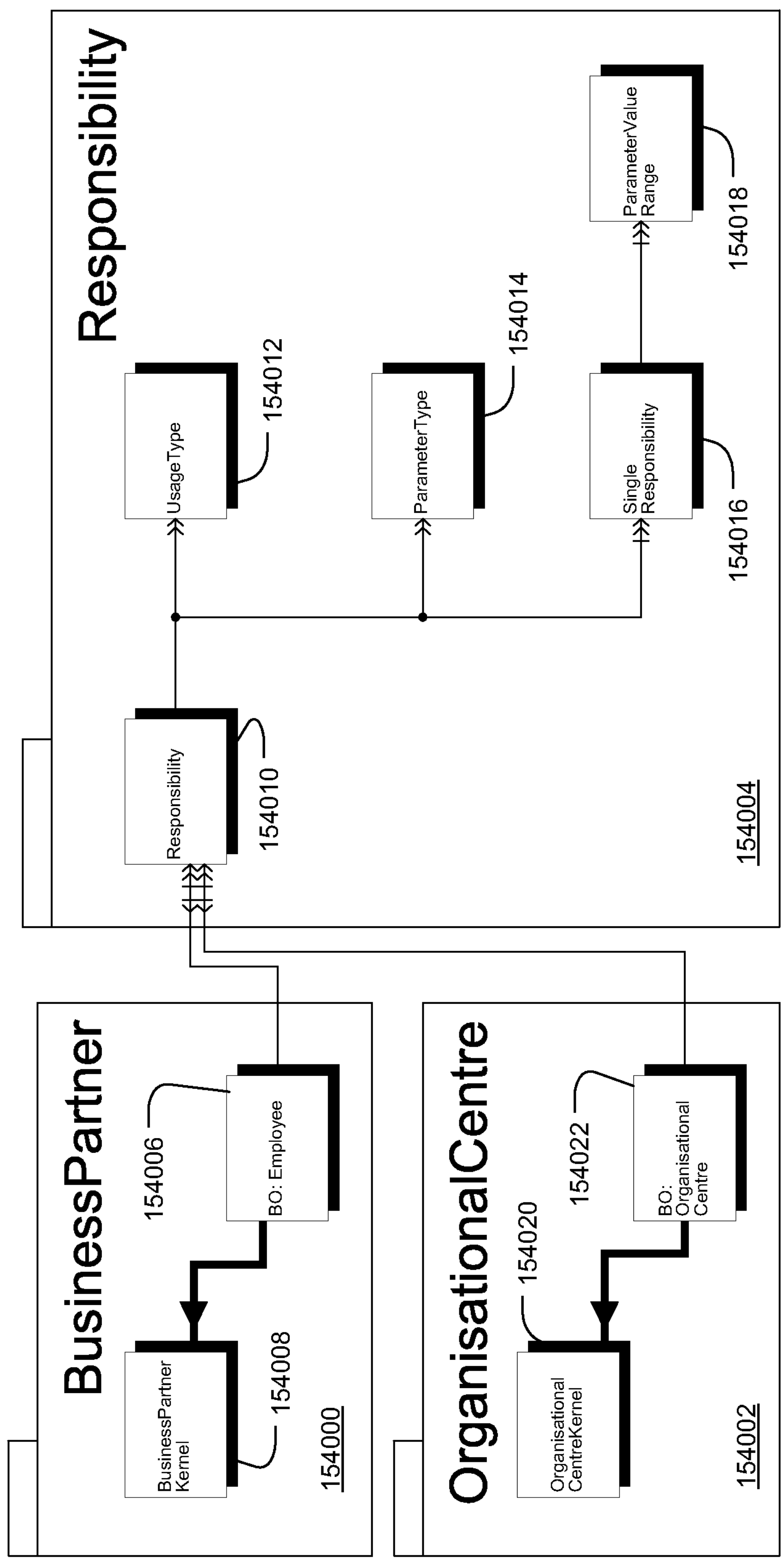
Figure 155:
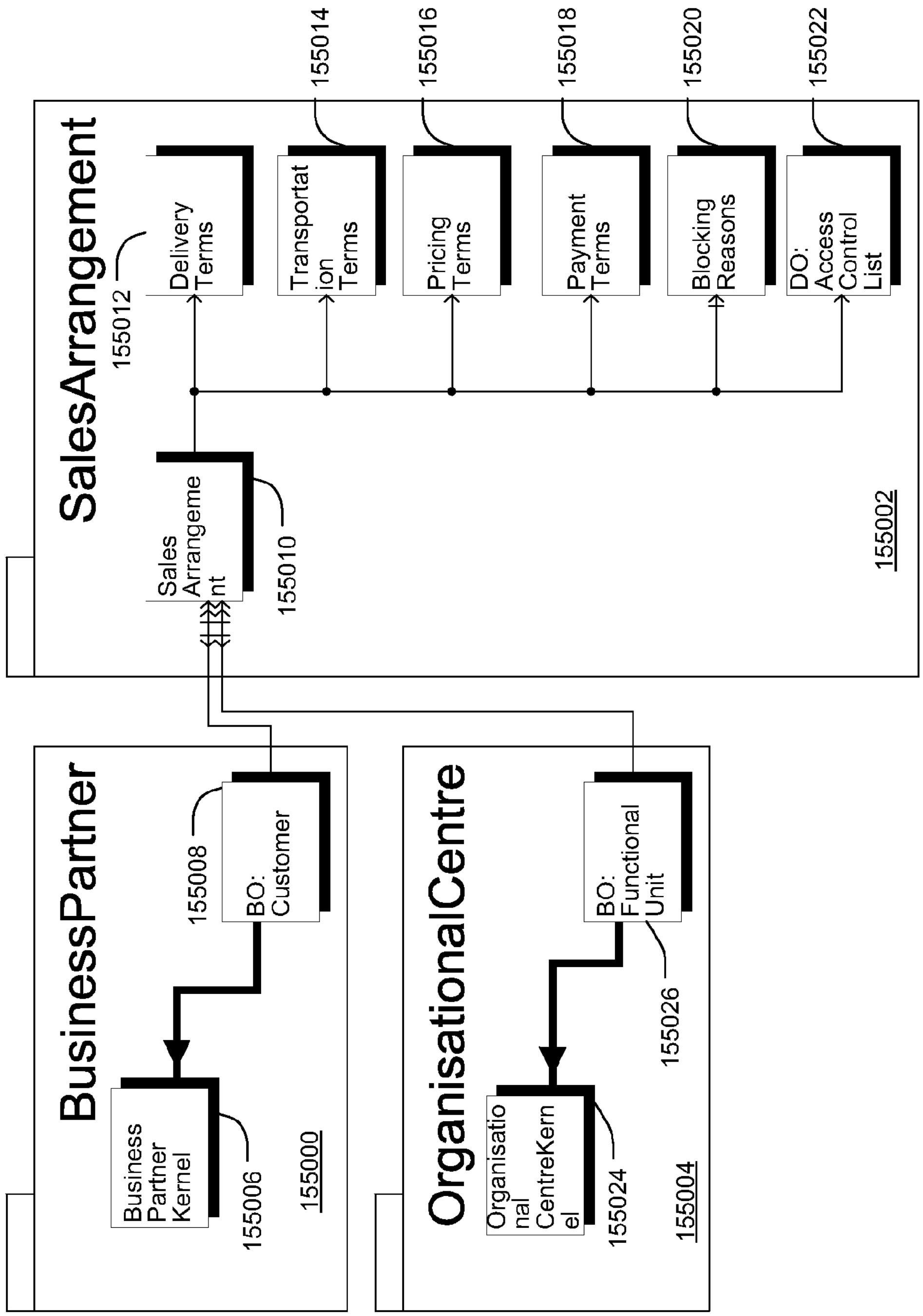
Figure 156:
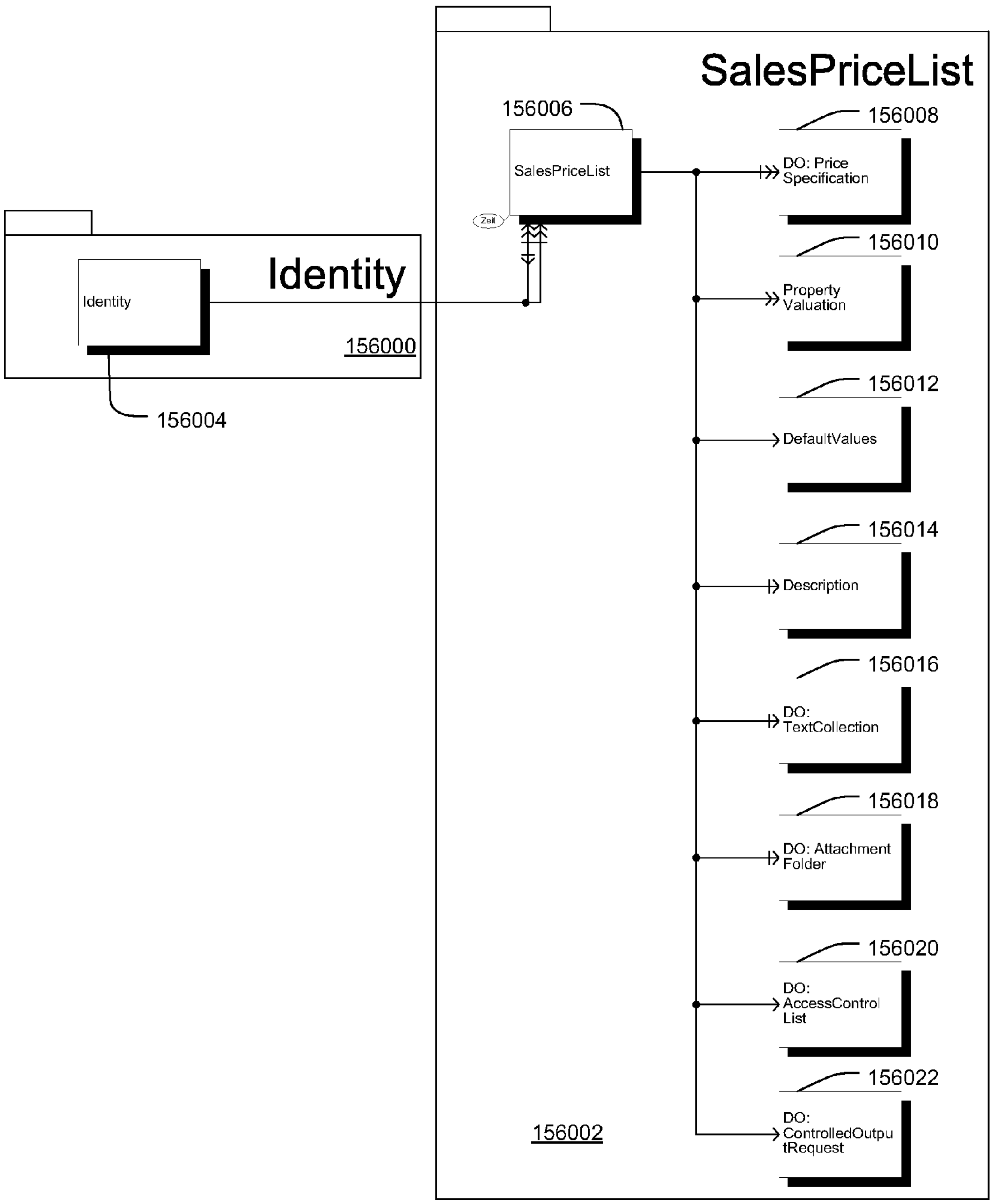
Figure 160:
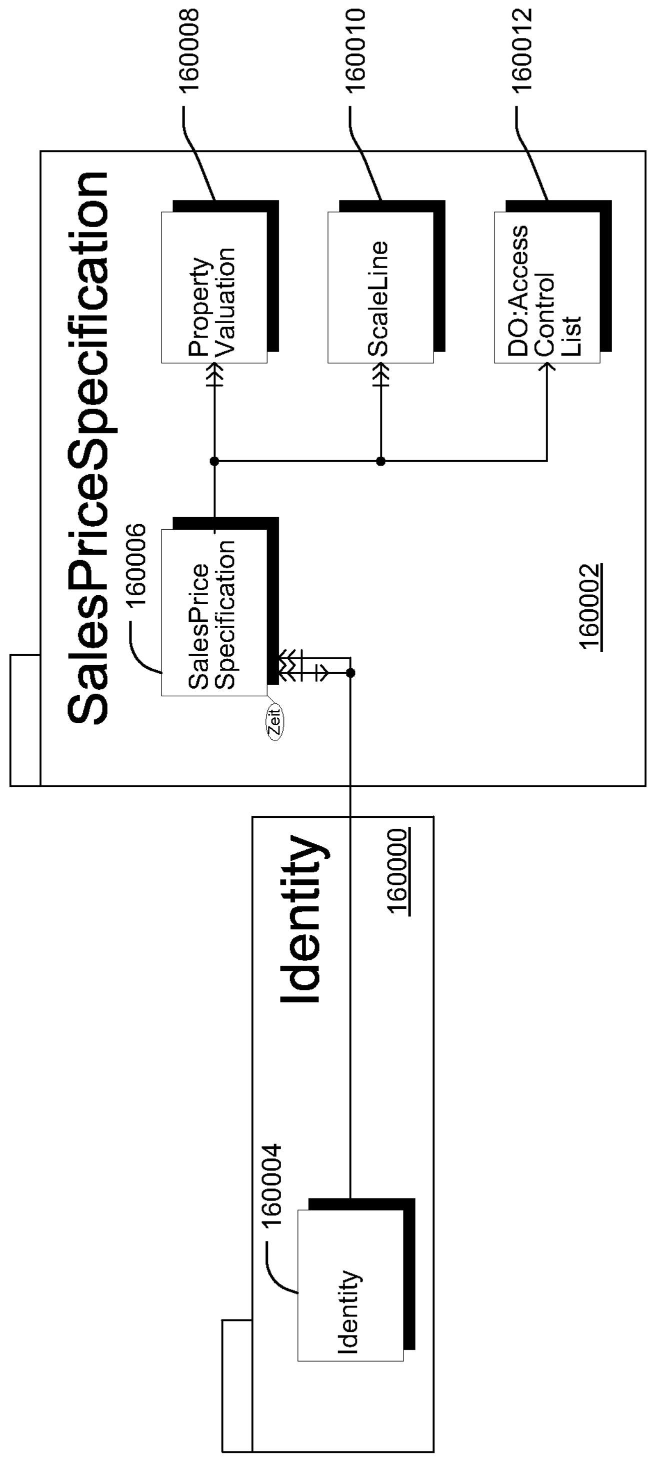
Figure 163:
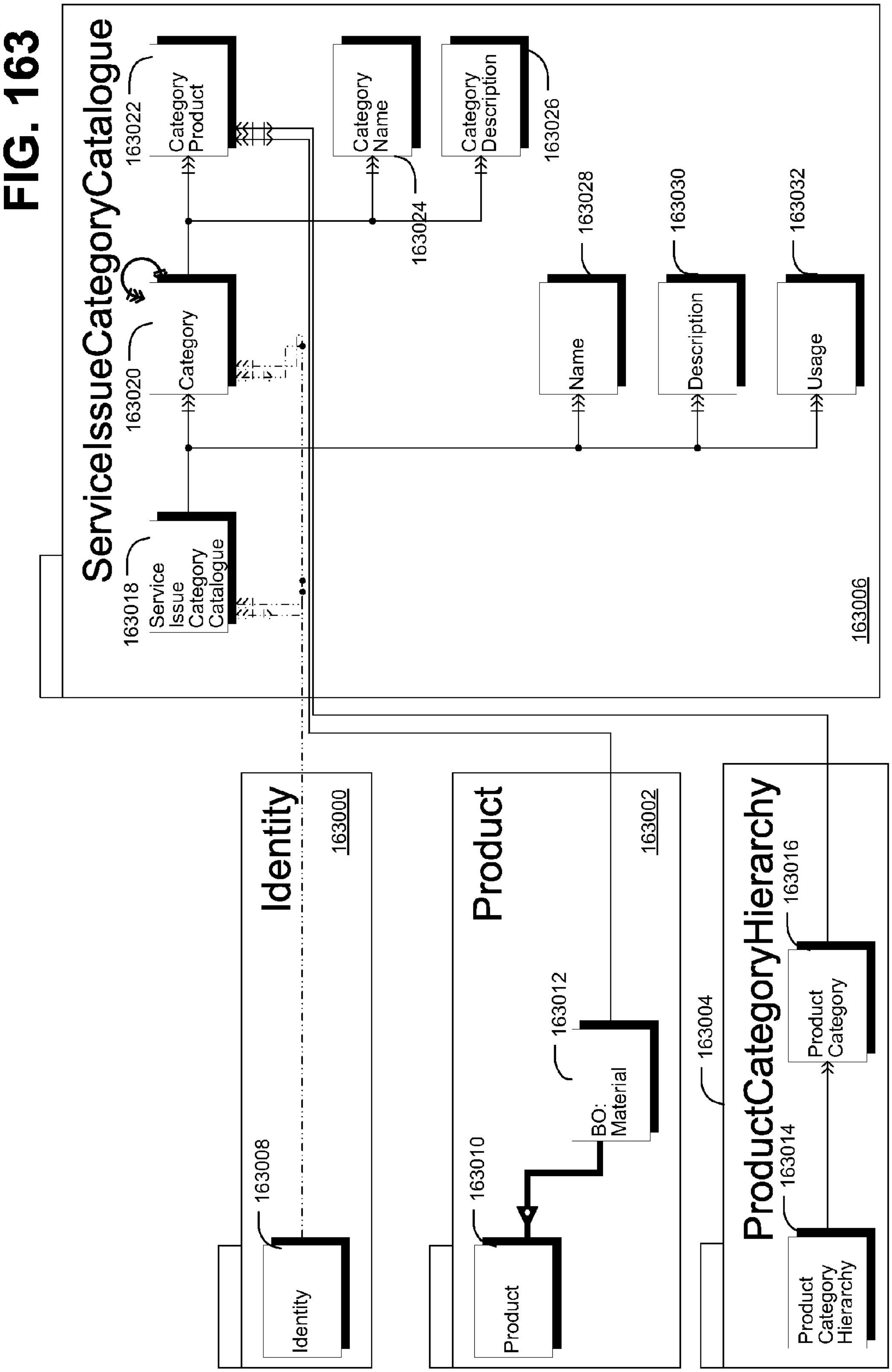
Figure 164:
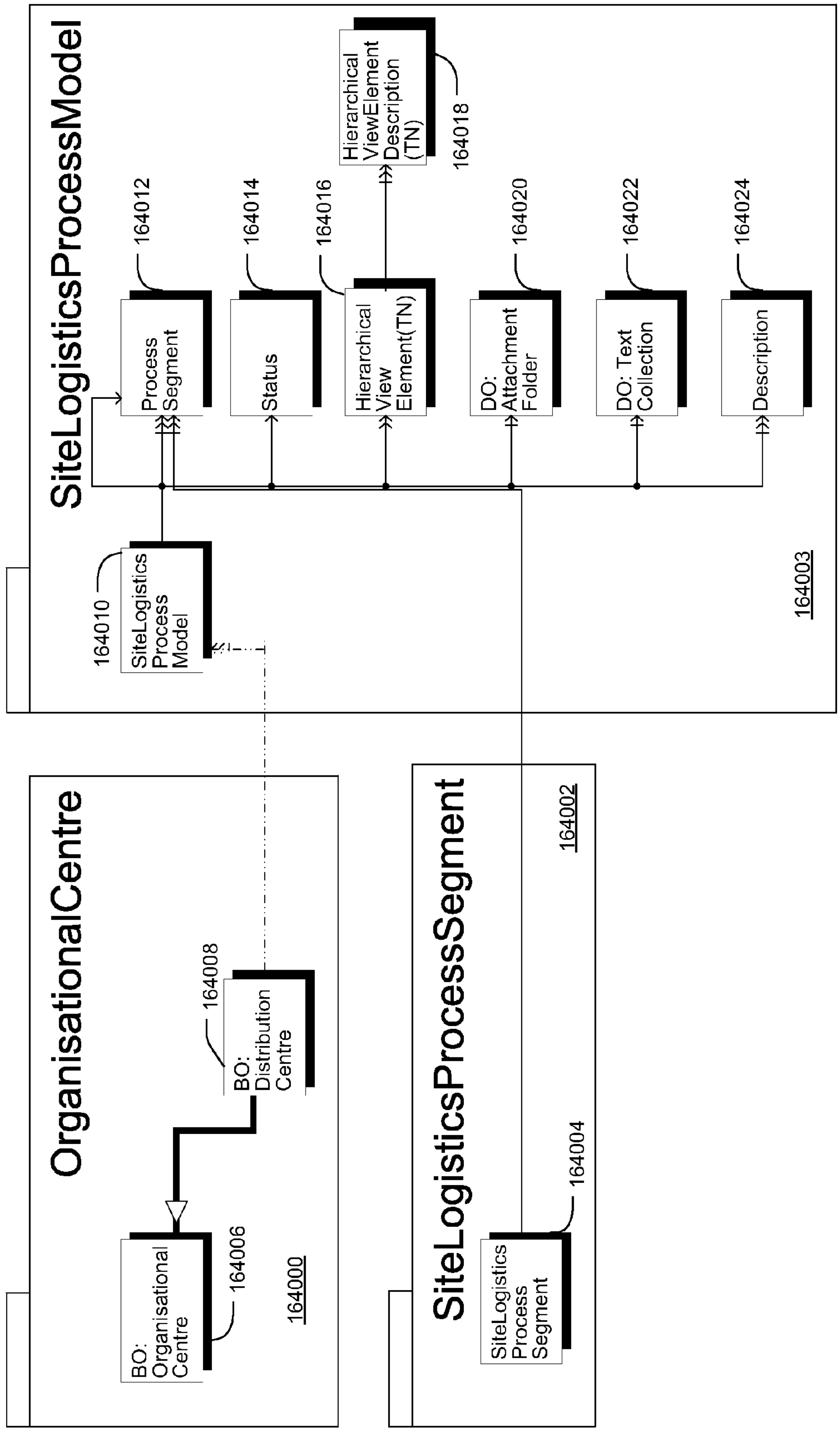
Figure 165:
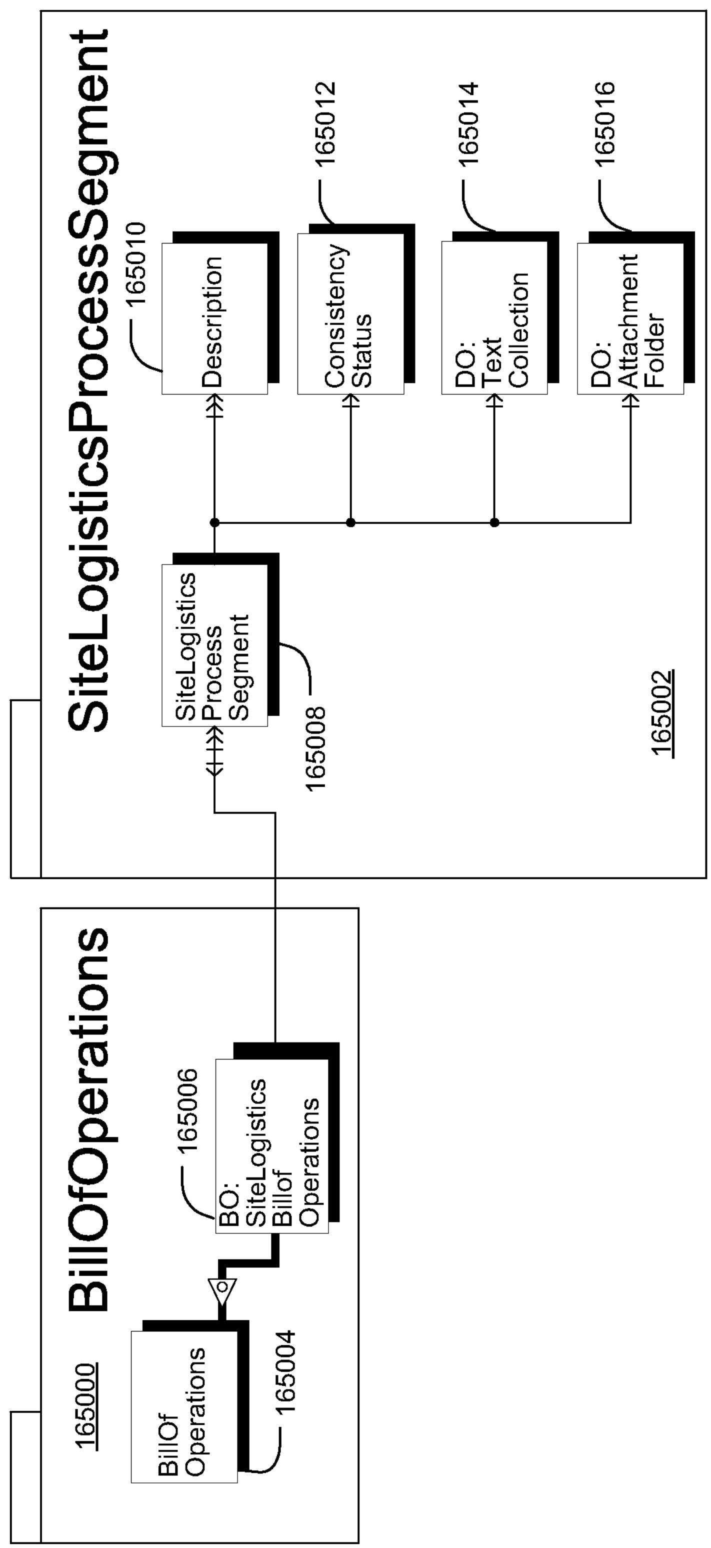
Figures 1, 166:
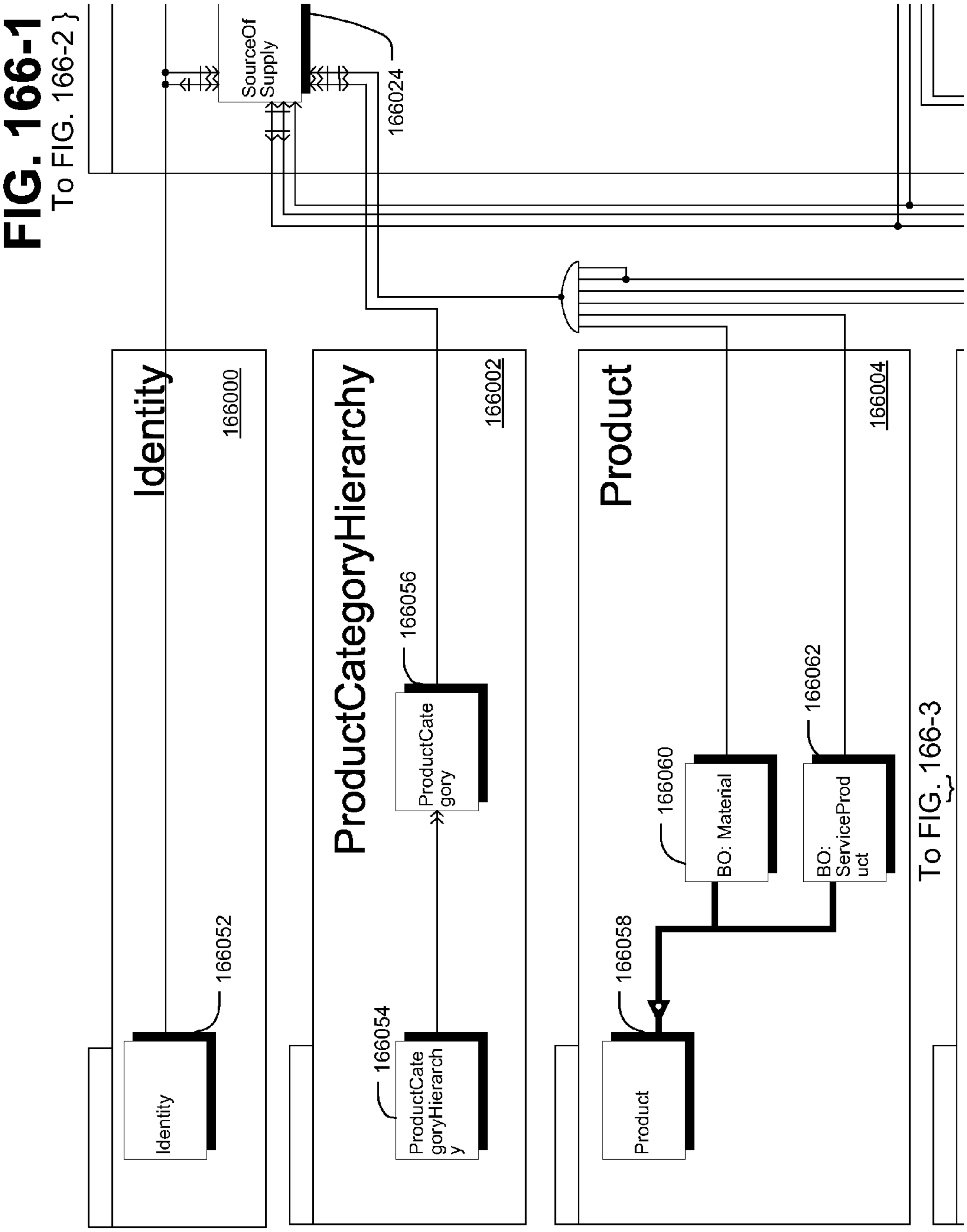
Figures 2, 166:
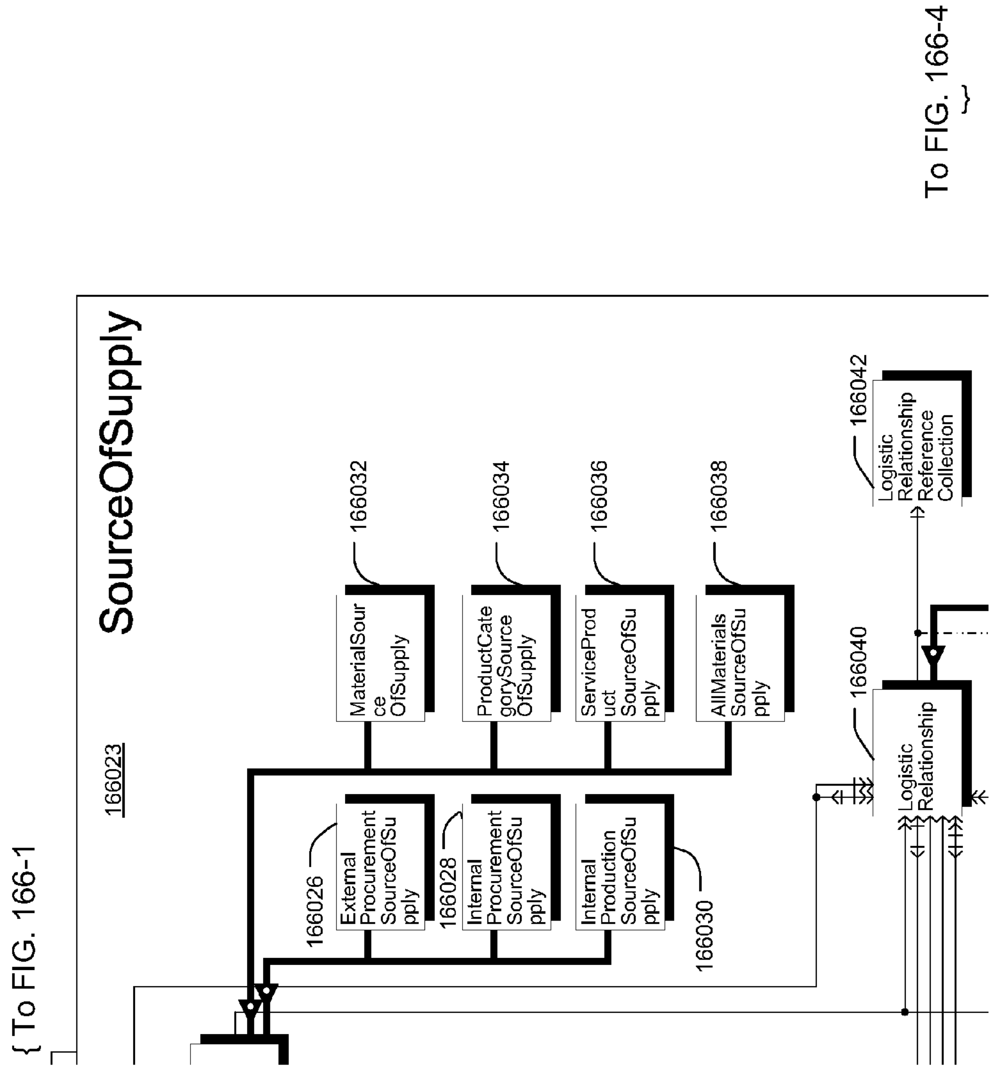
Figures 3, 166:
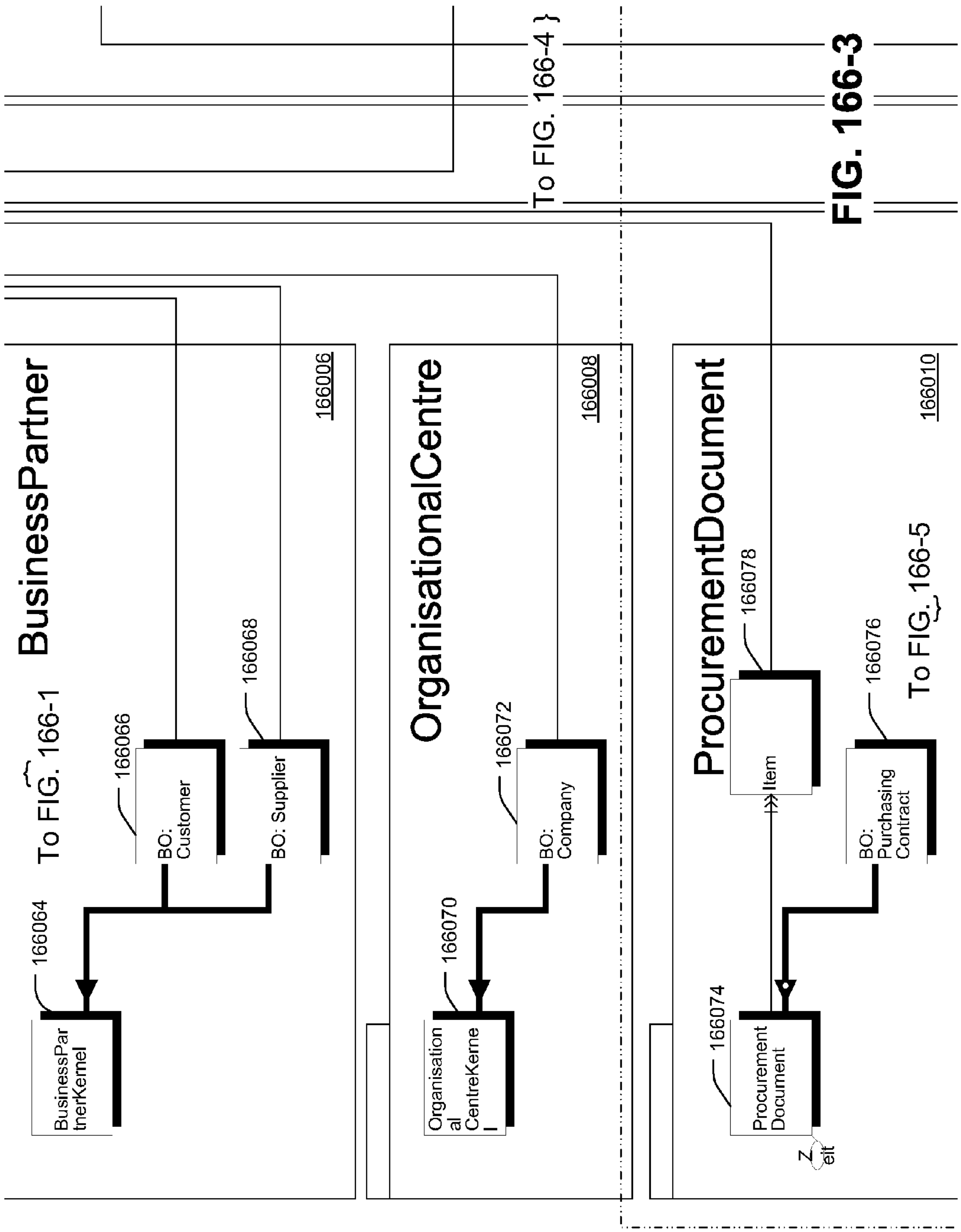
Figures 4, 166:
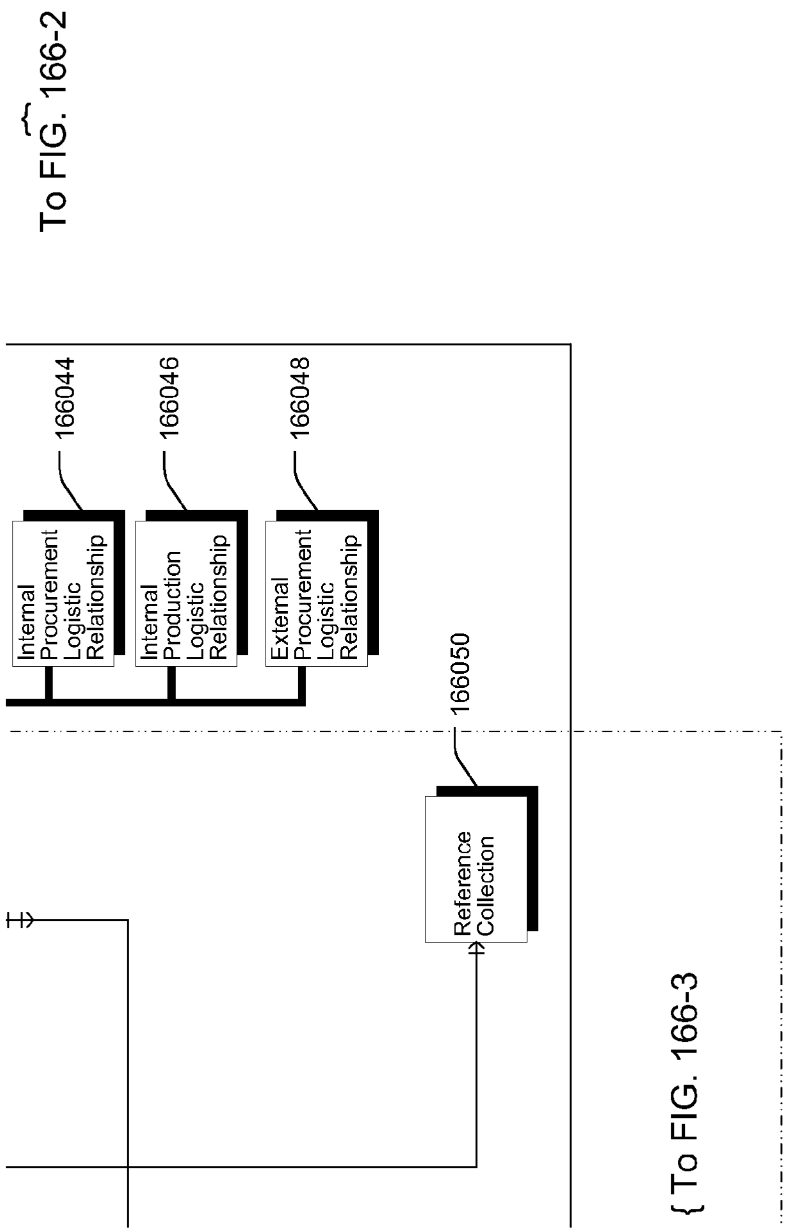
Figures 5, 166:
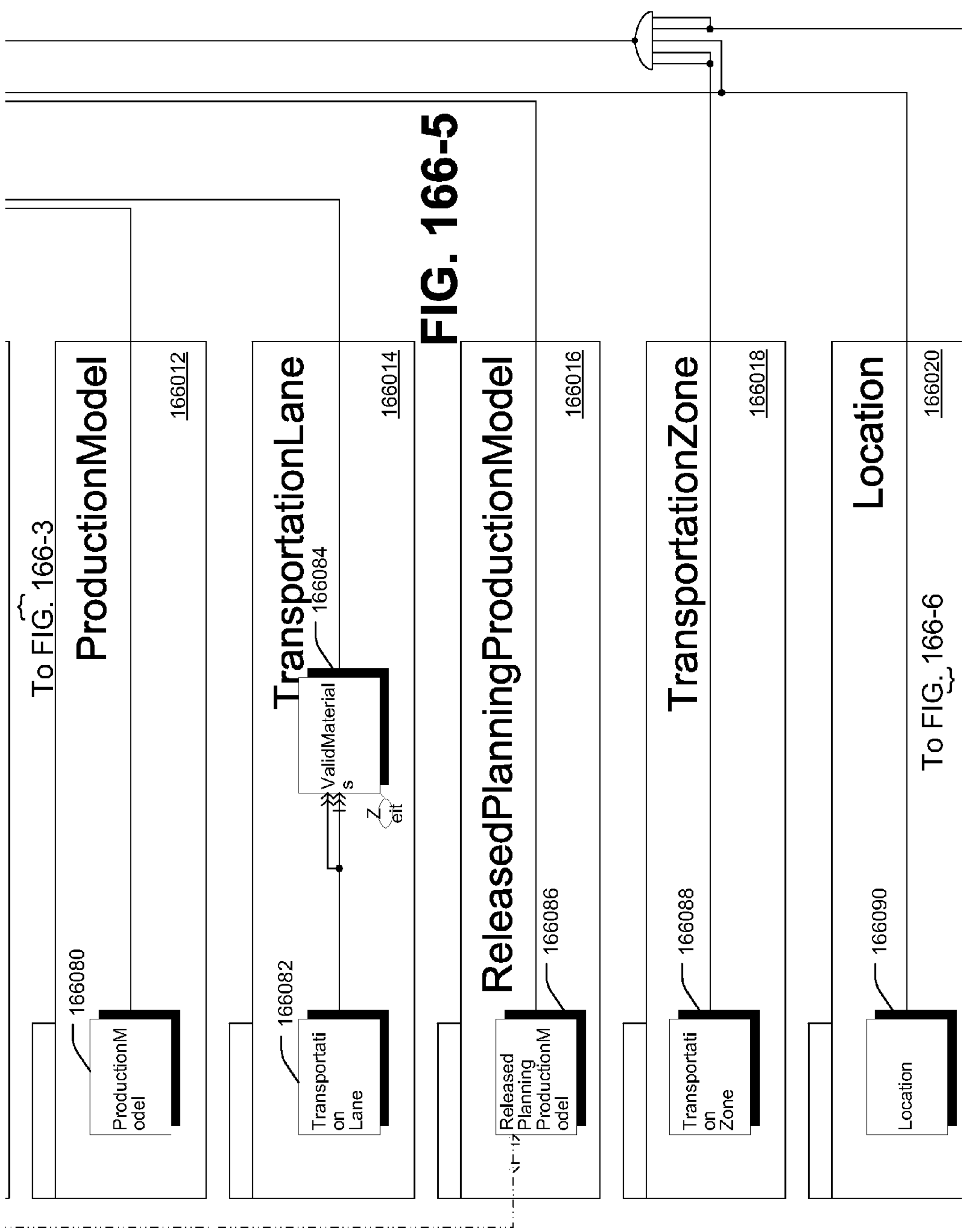
Figures 6, 166:
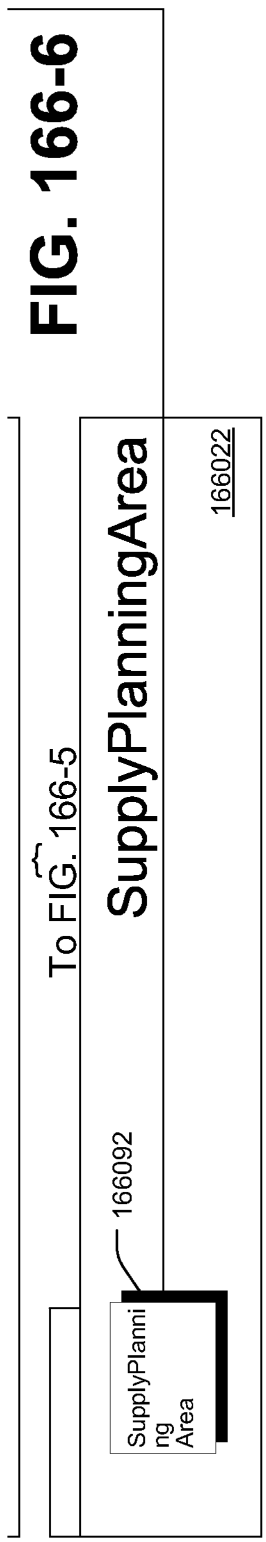
Figures 1, 167:
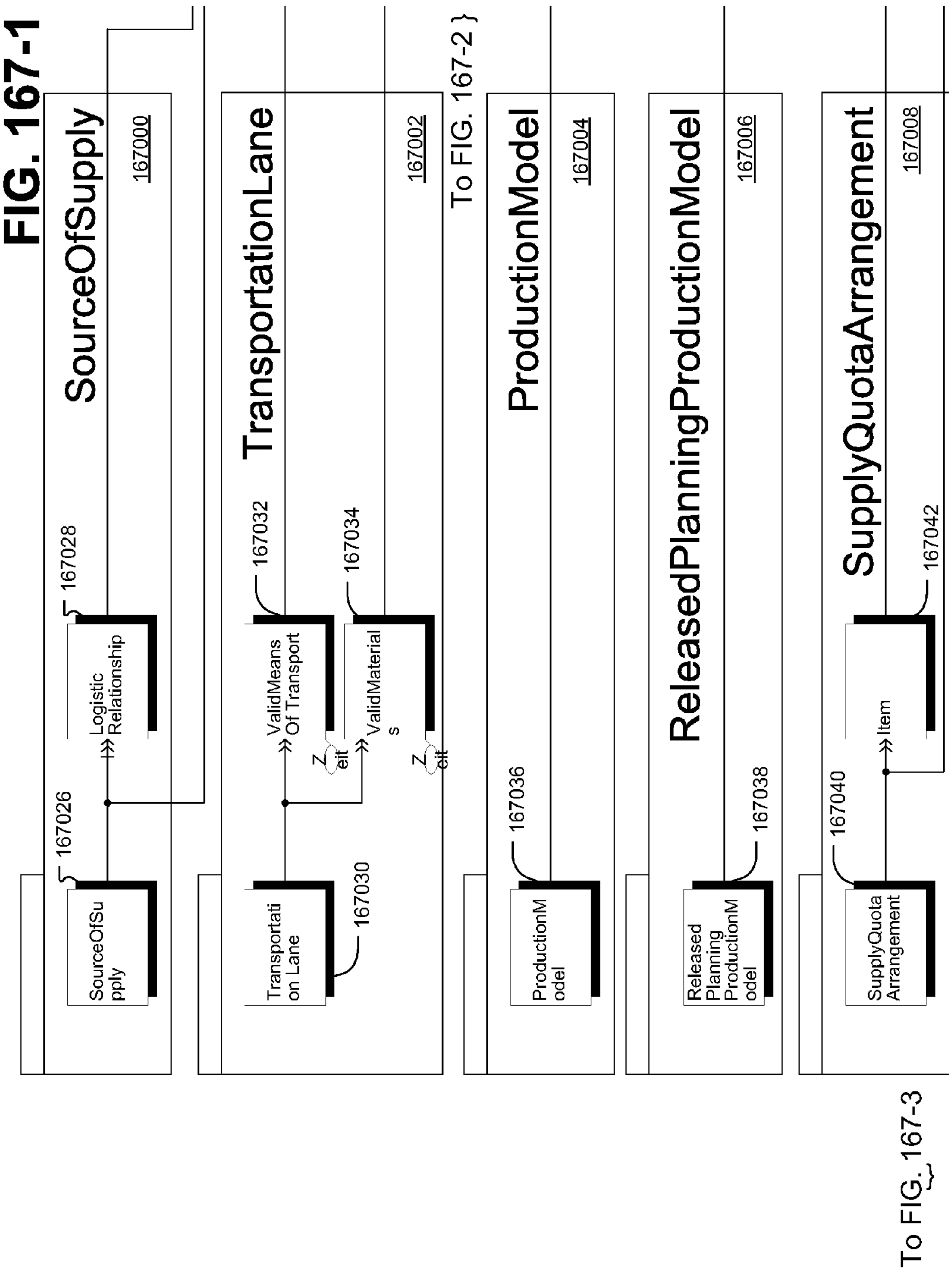
Figures 2, 167:
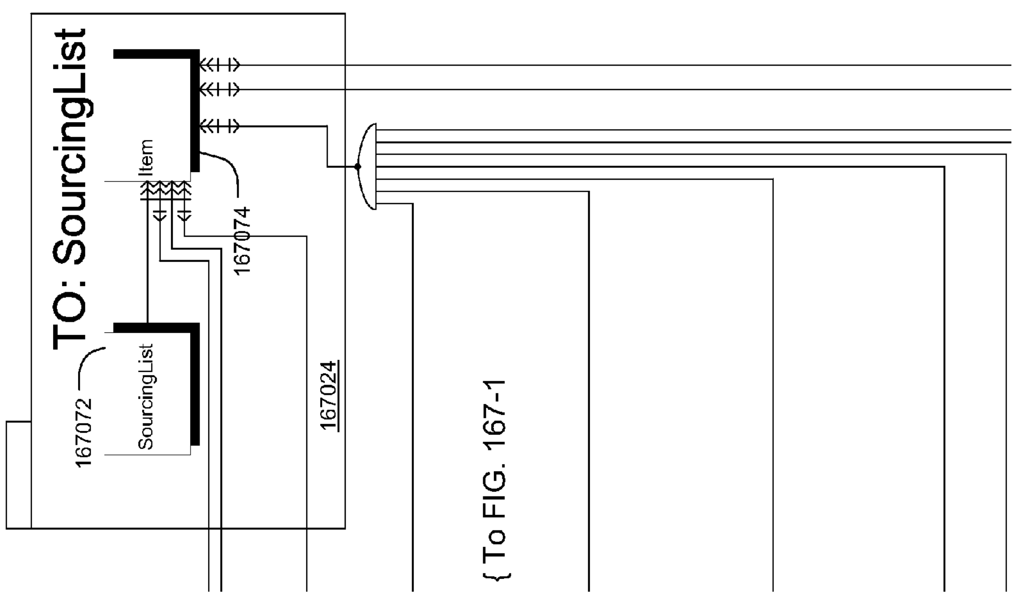
Figures 3, 167:
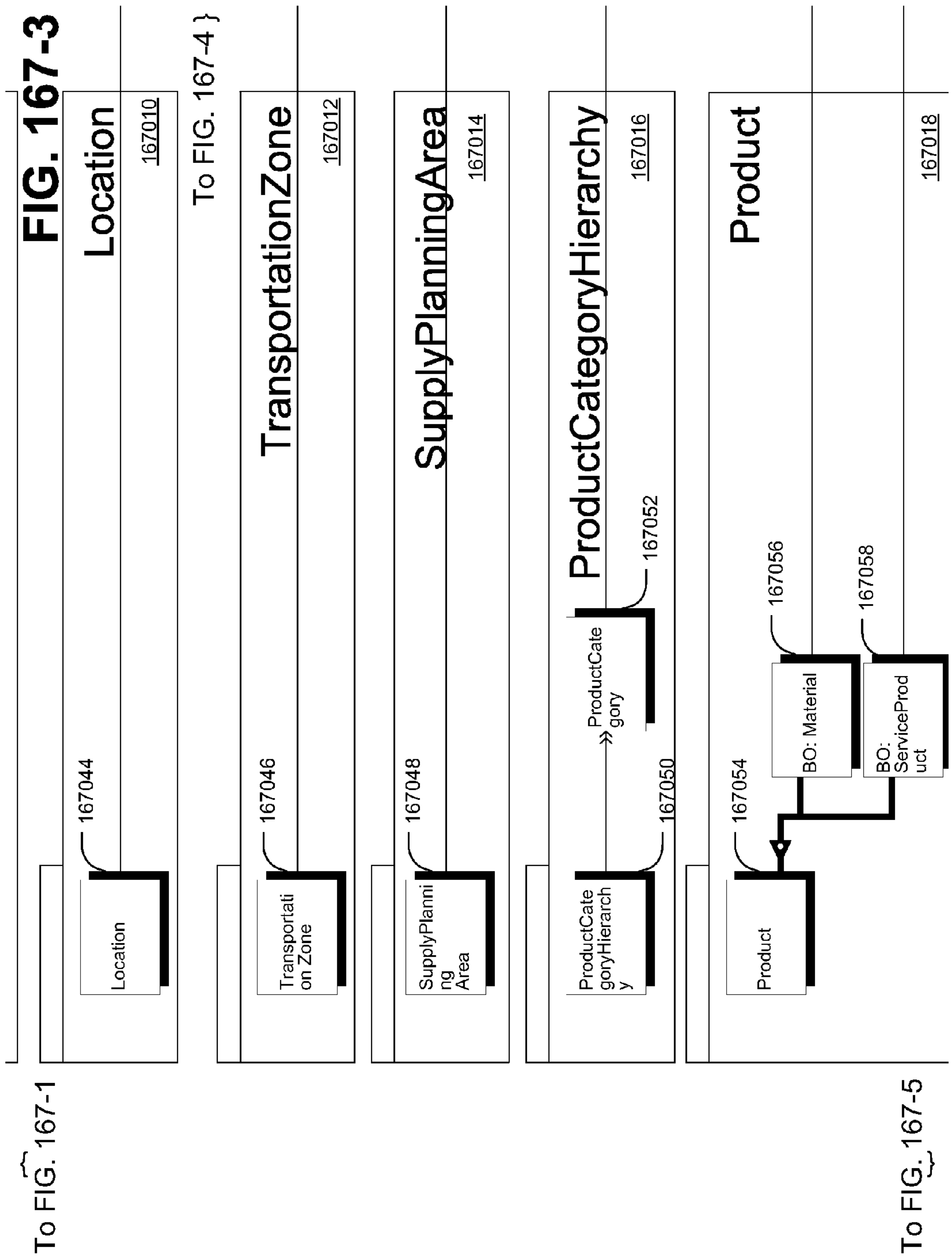
Figures 4, 167:
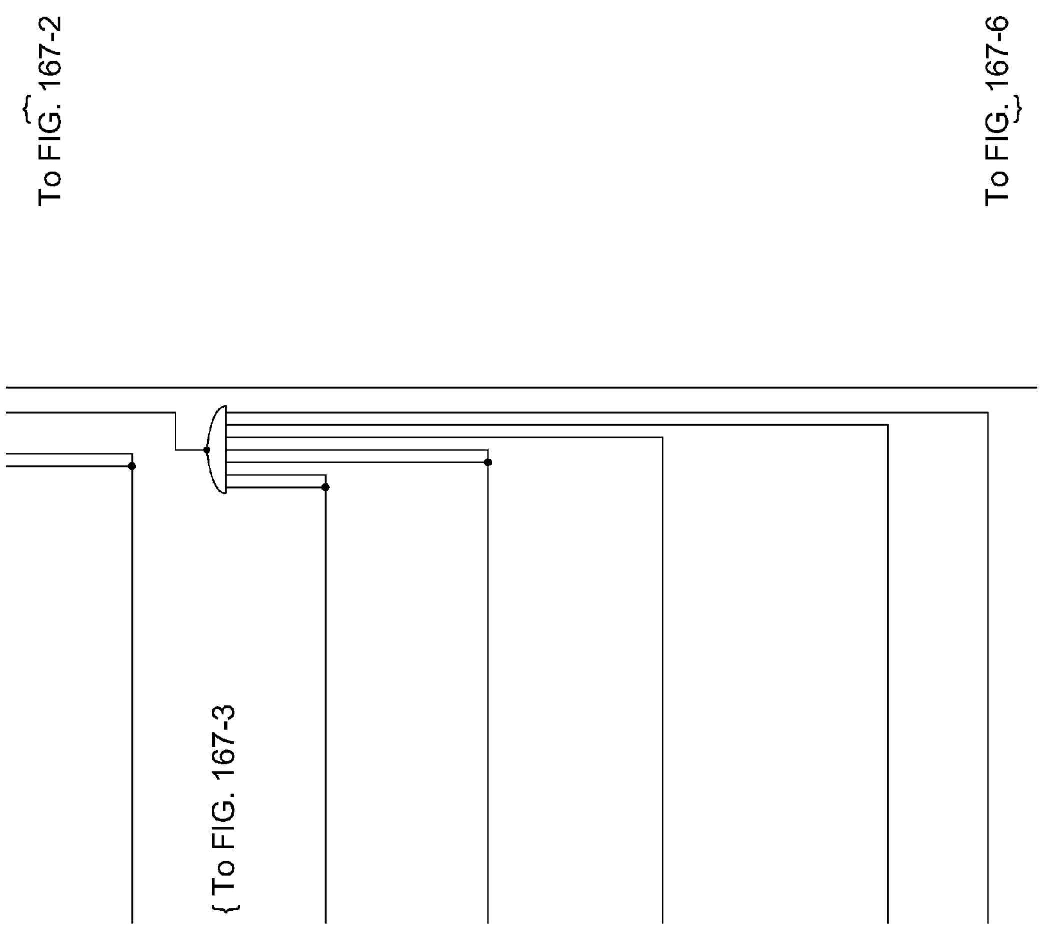
Figures 5, 167:
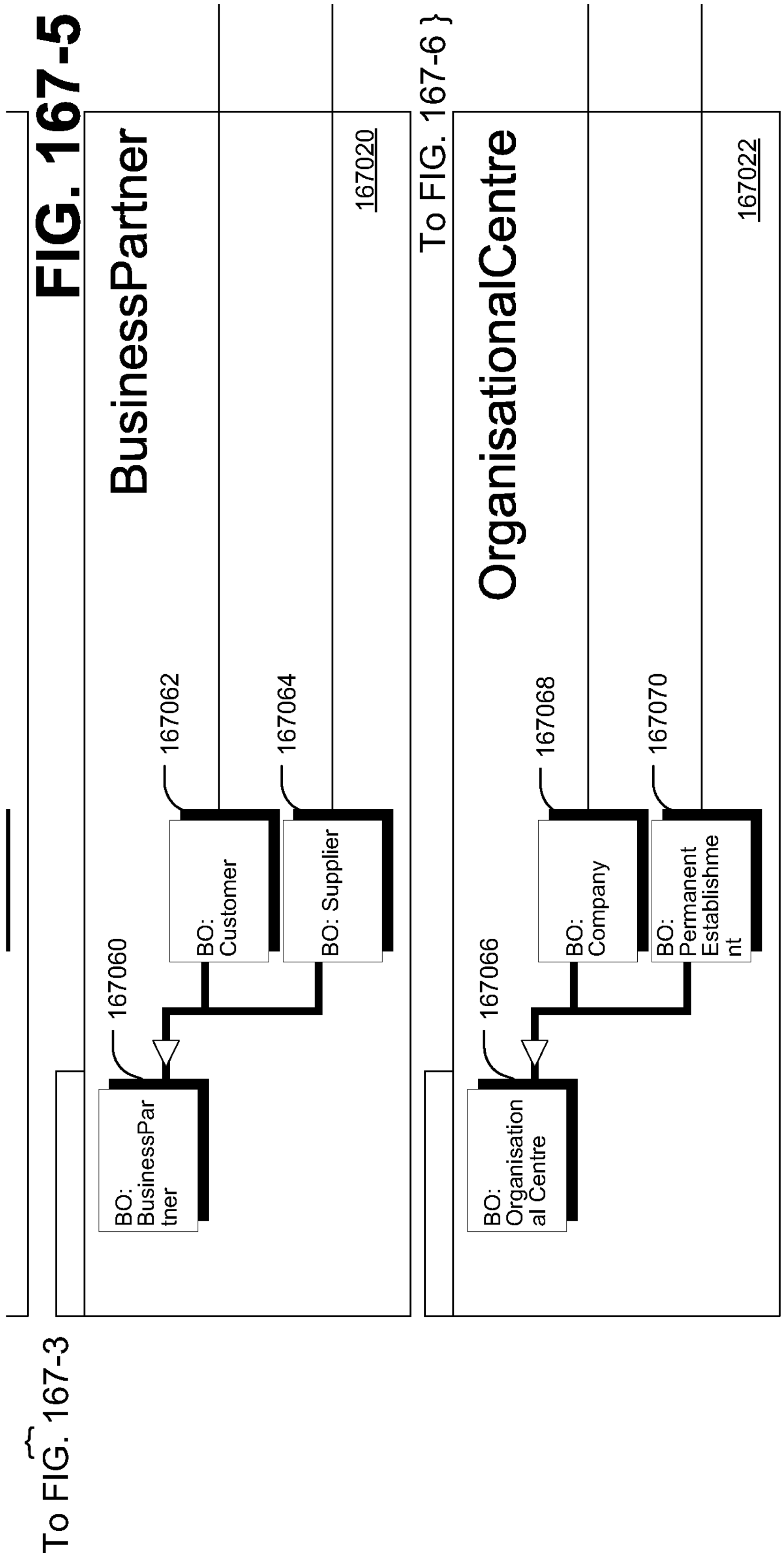
Figures 6, 167:
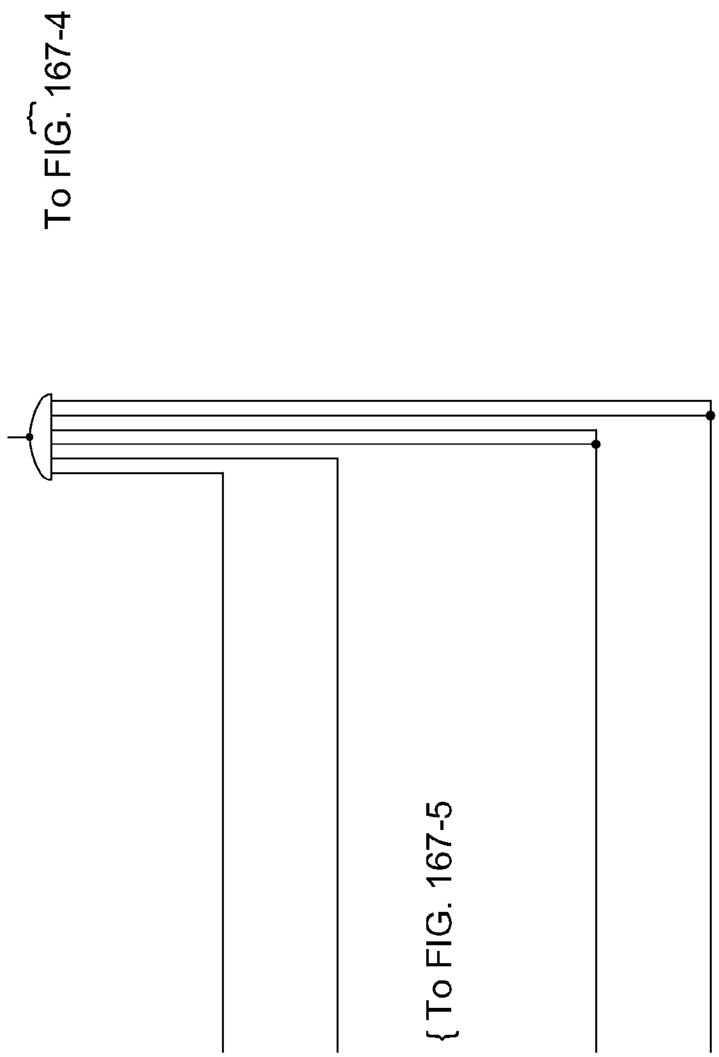
Figure 168:
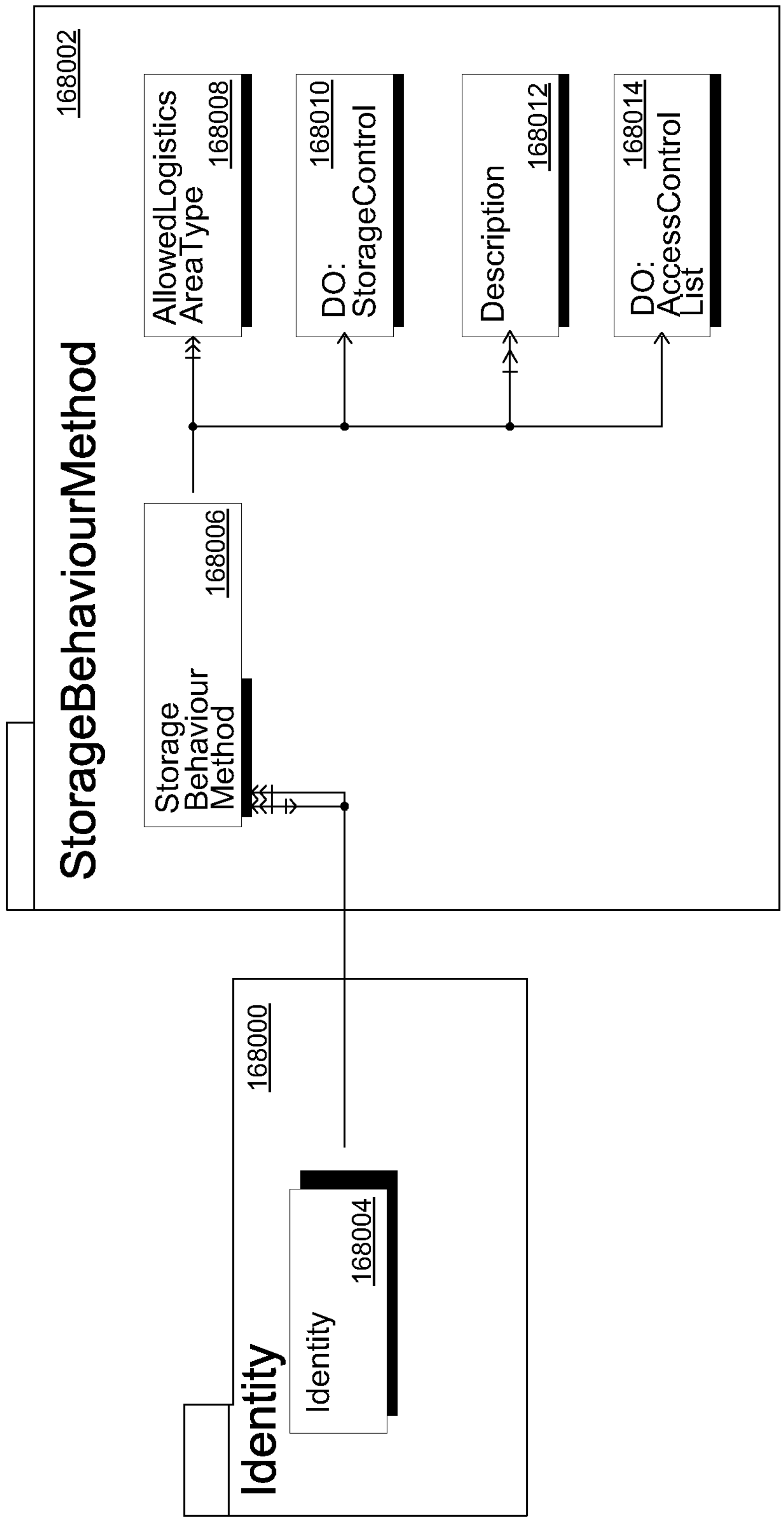
Figure 169:
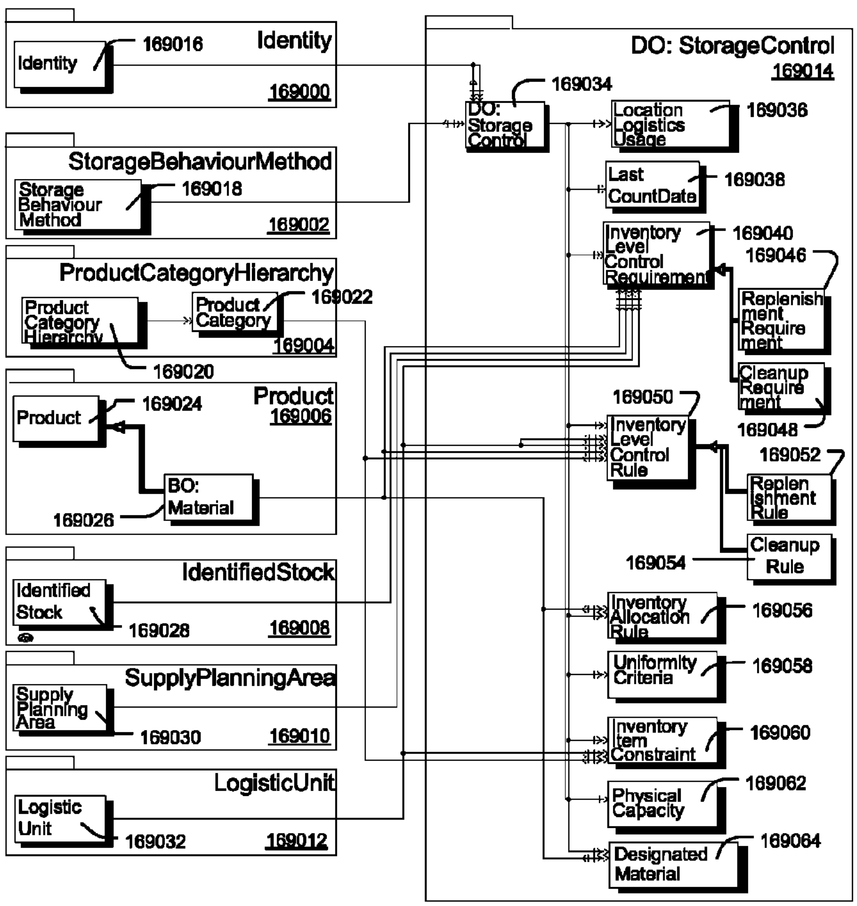
Figure 170:
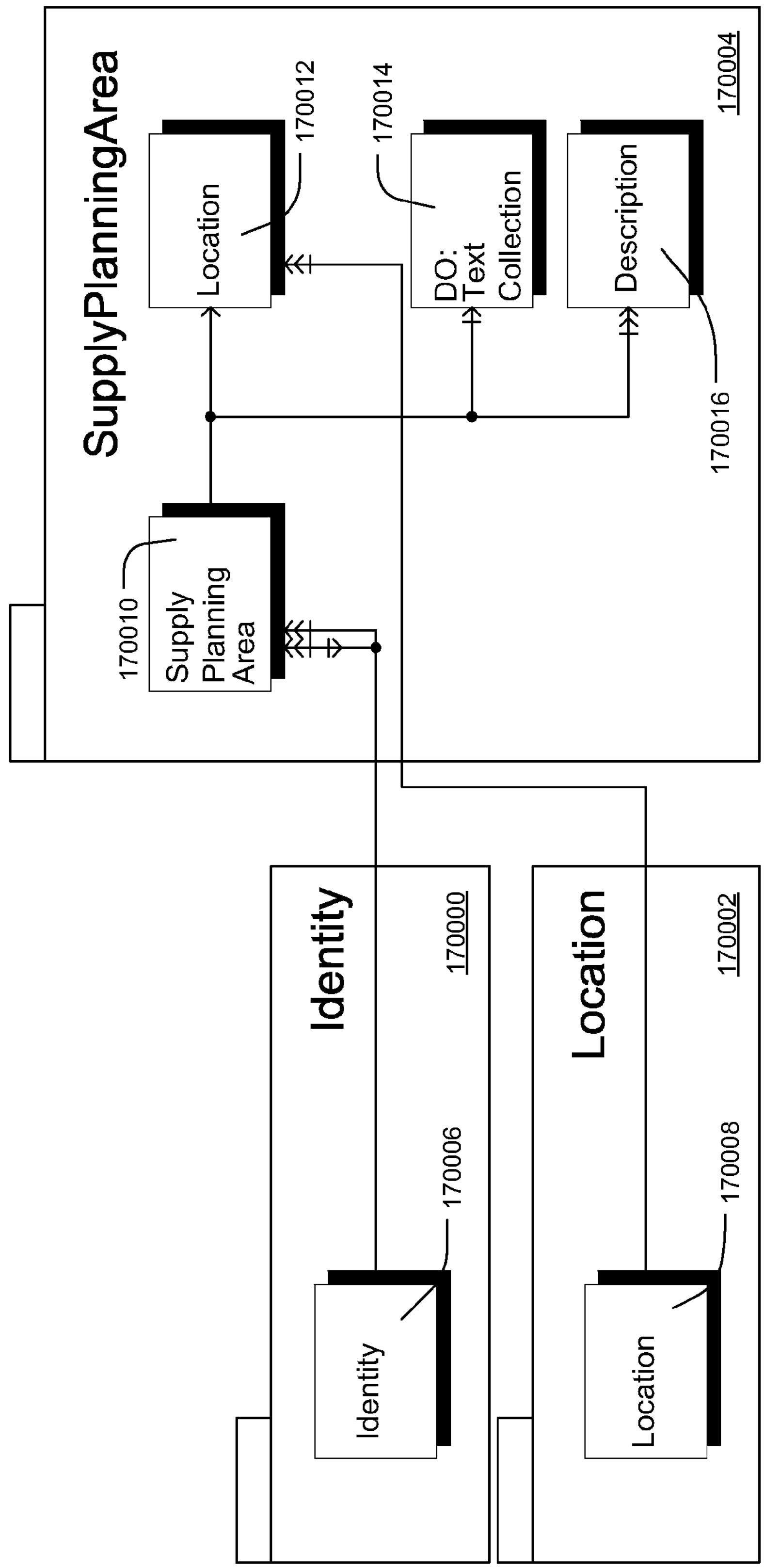
Figures 1, 171:
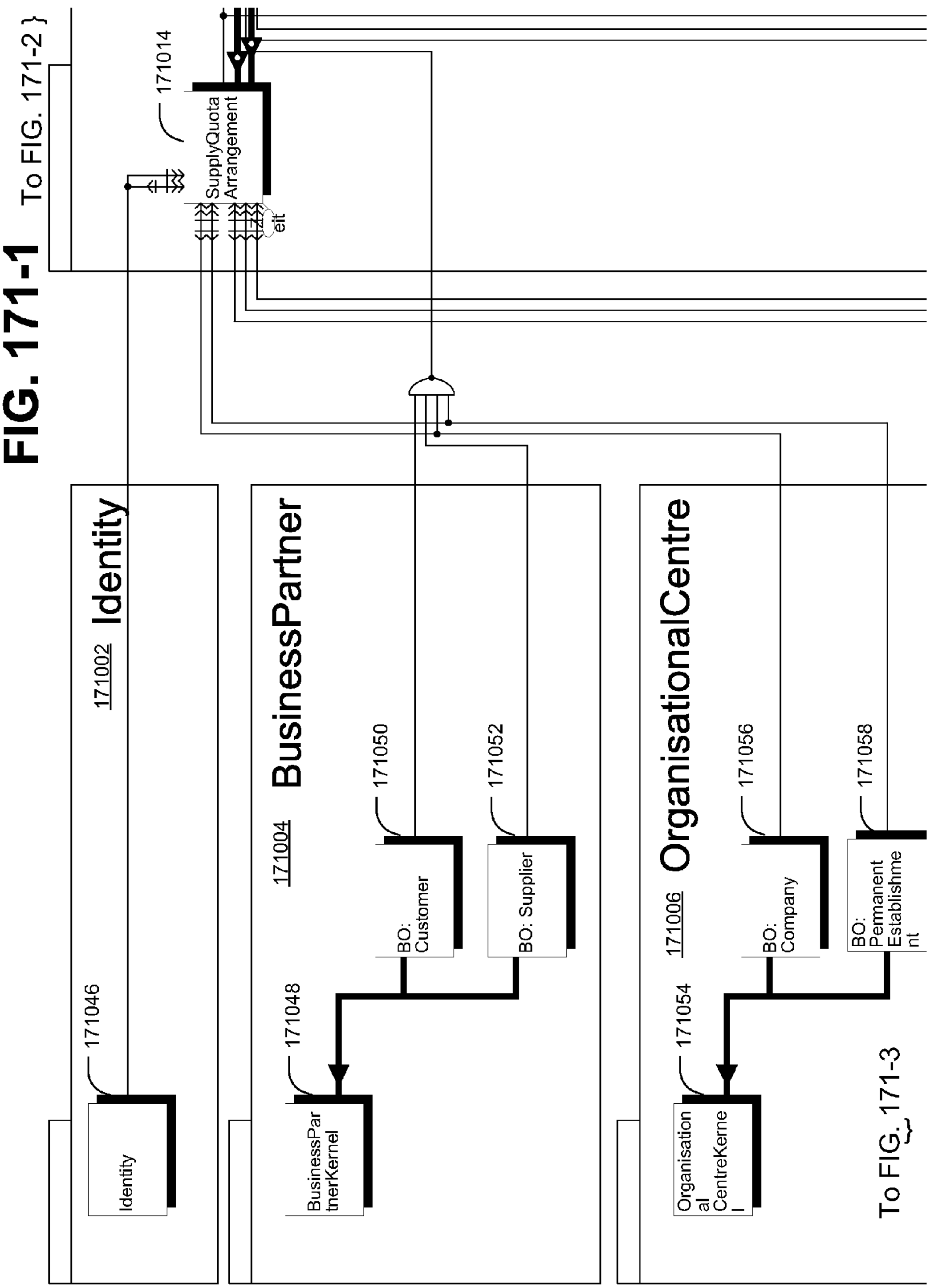
Figures 2, 171:
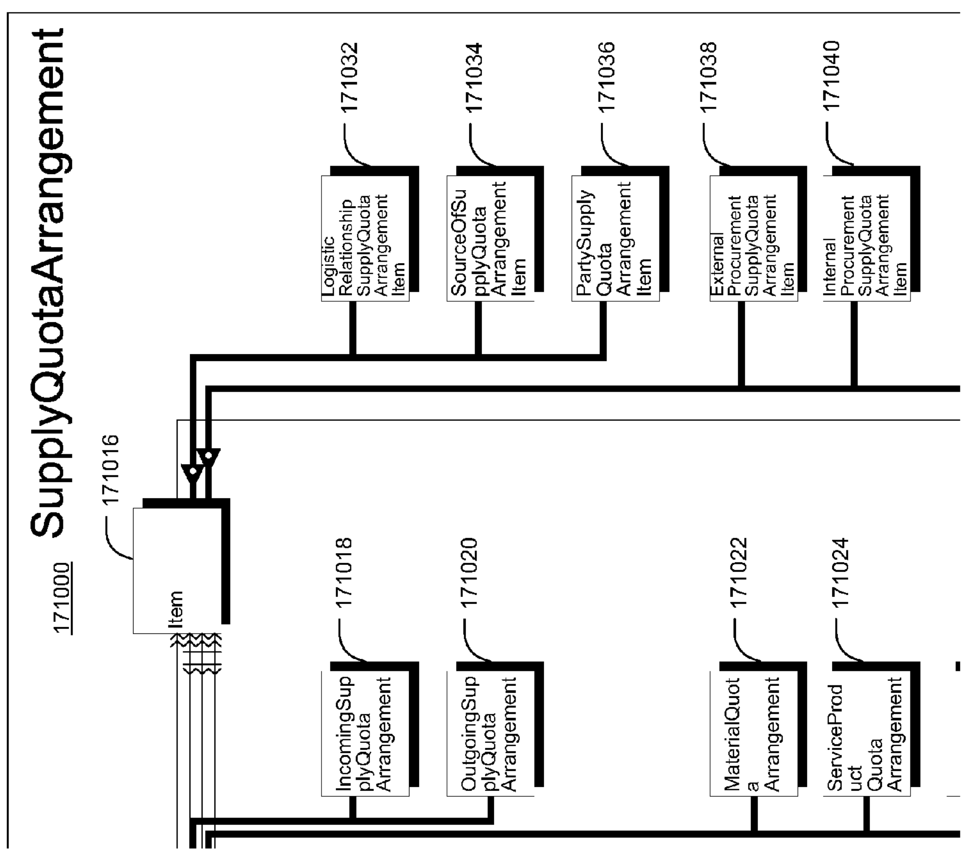
Figures 3, 171:
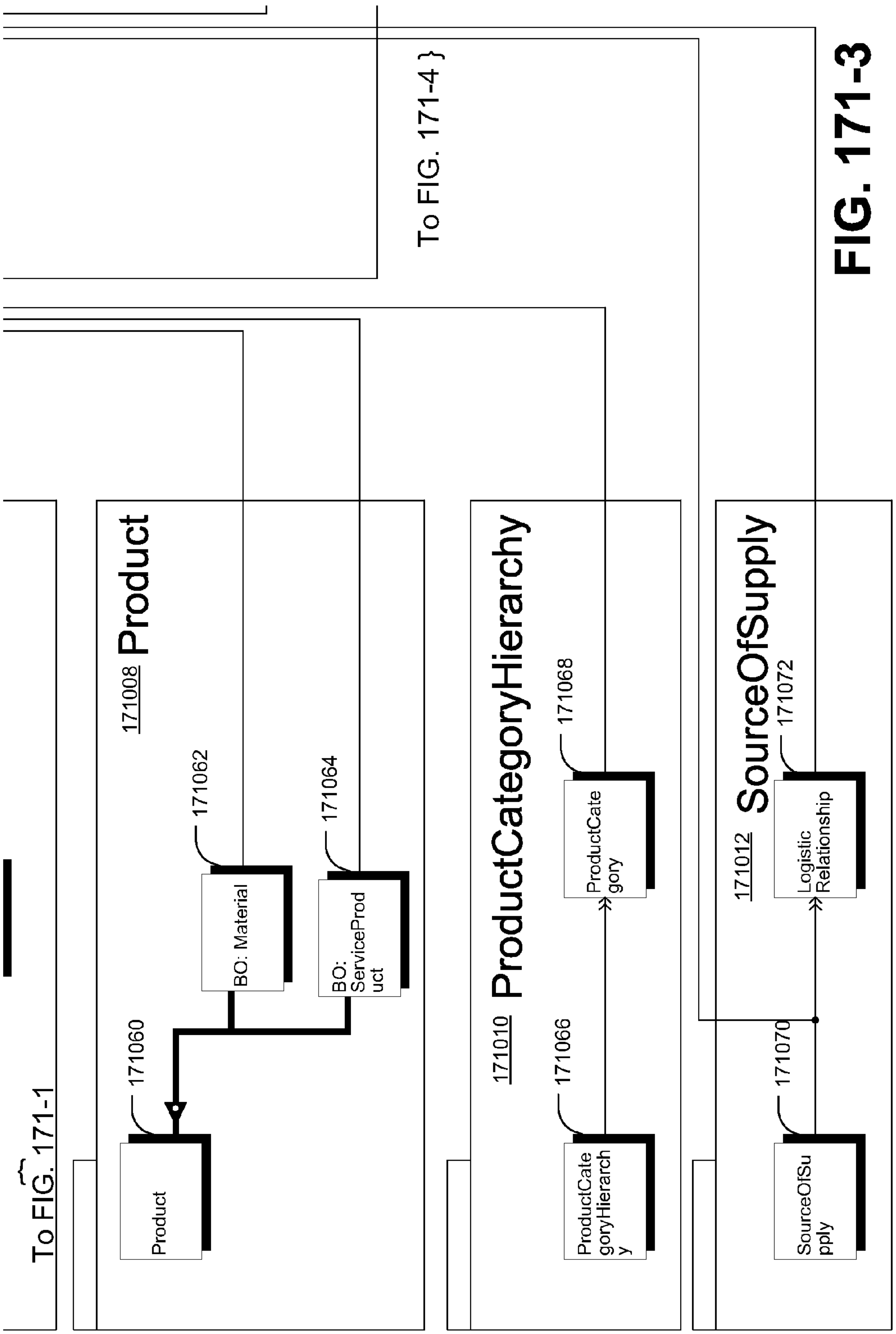
Figures 4, 171:
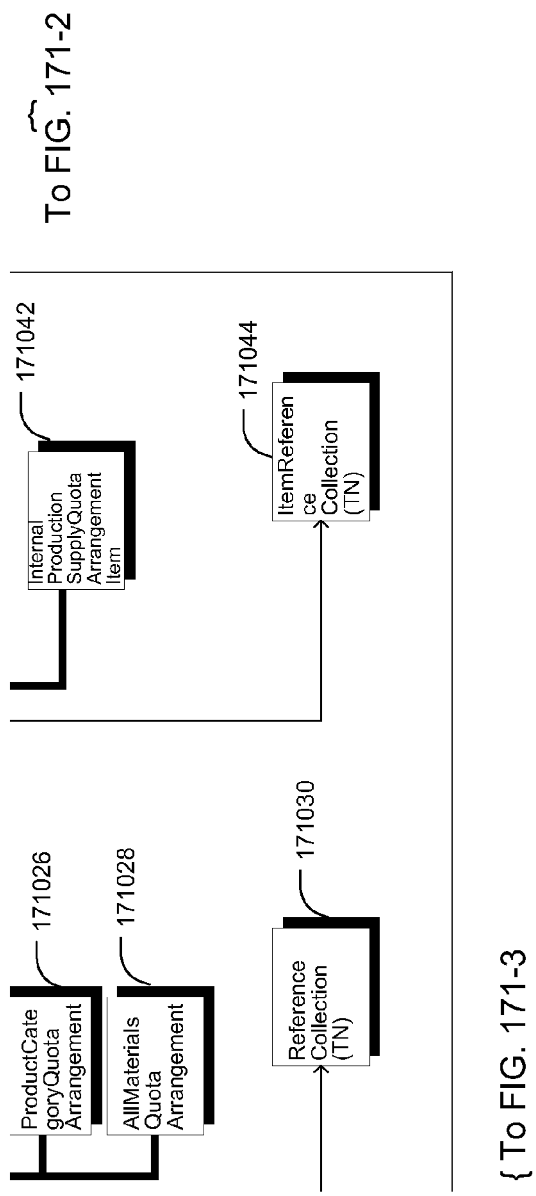
Figure 172:
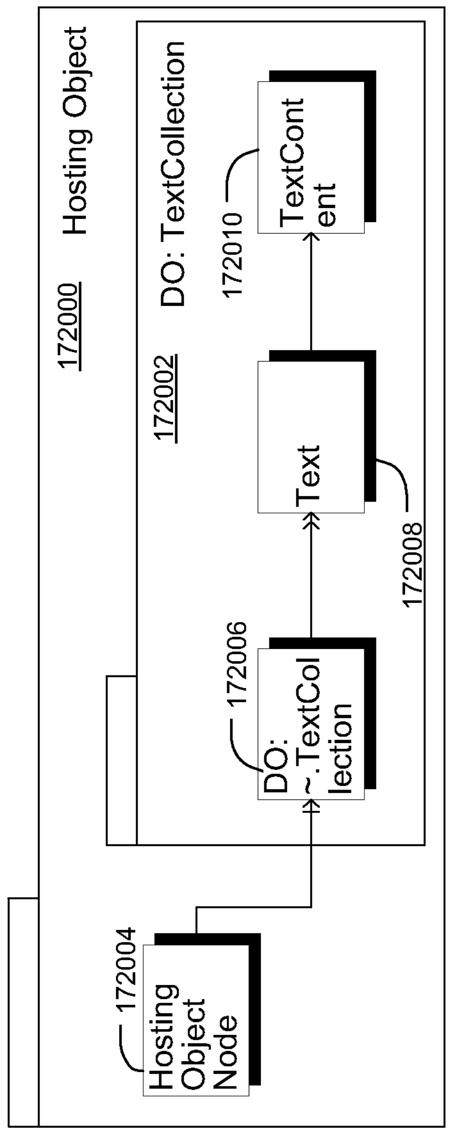
Figures 1, 173:
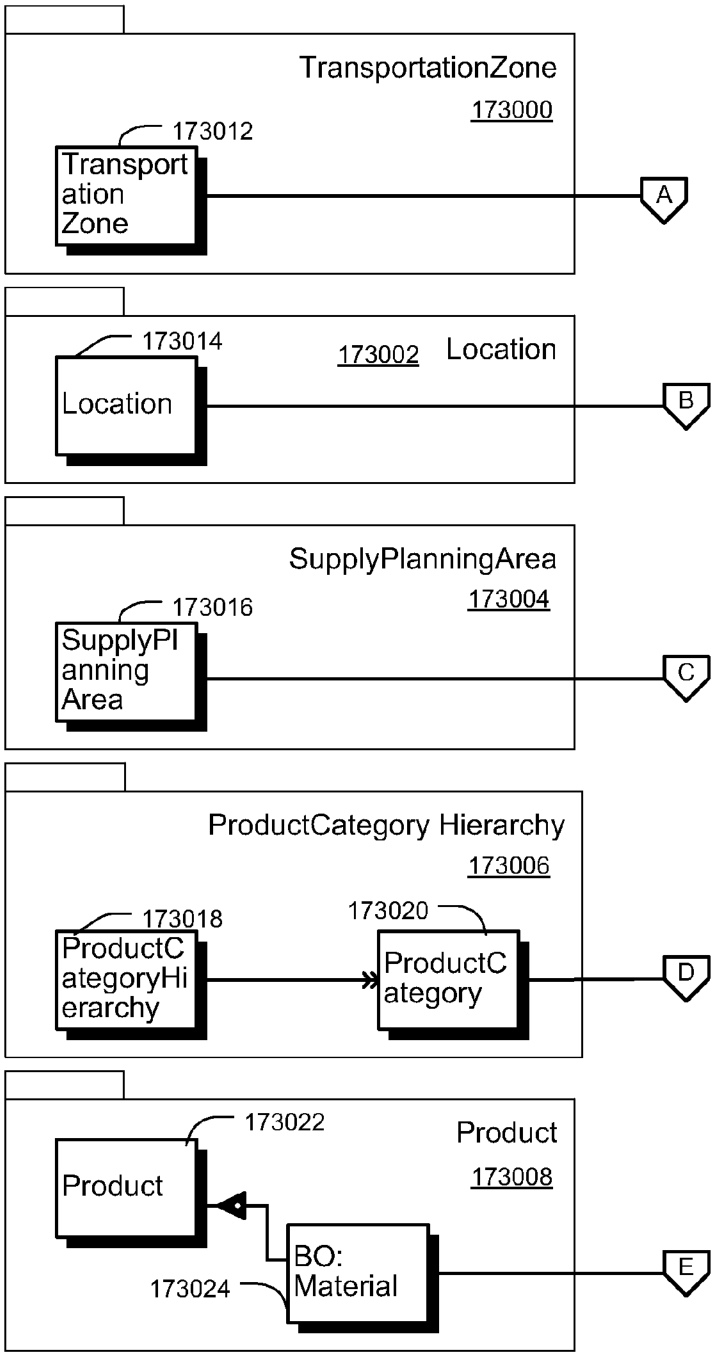
Figures 2, 173:
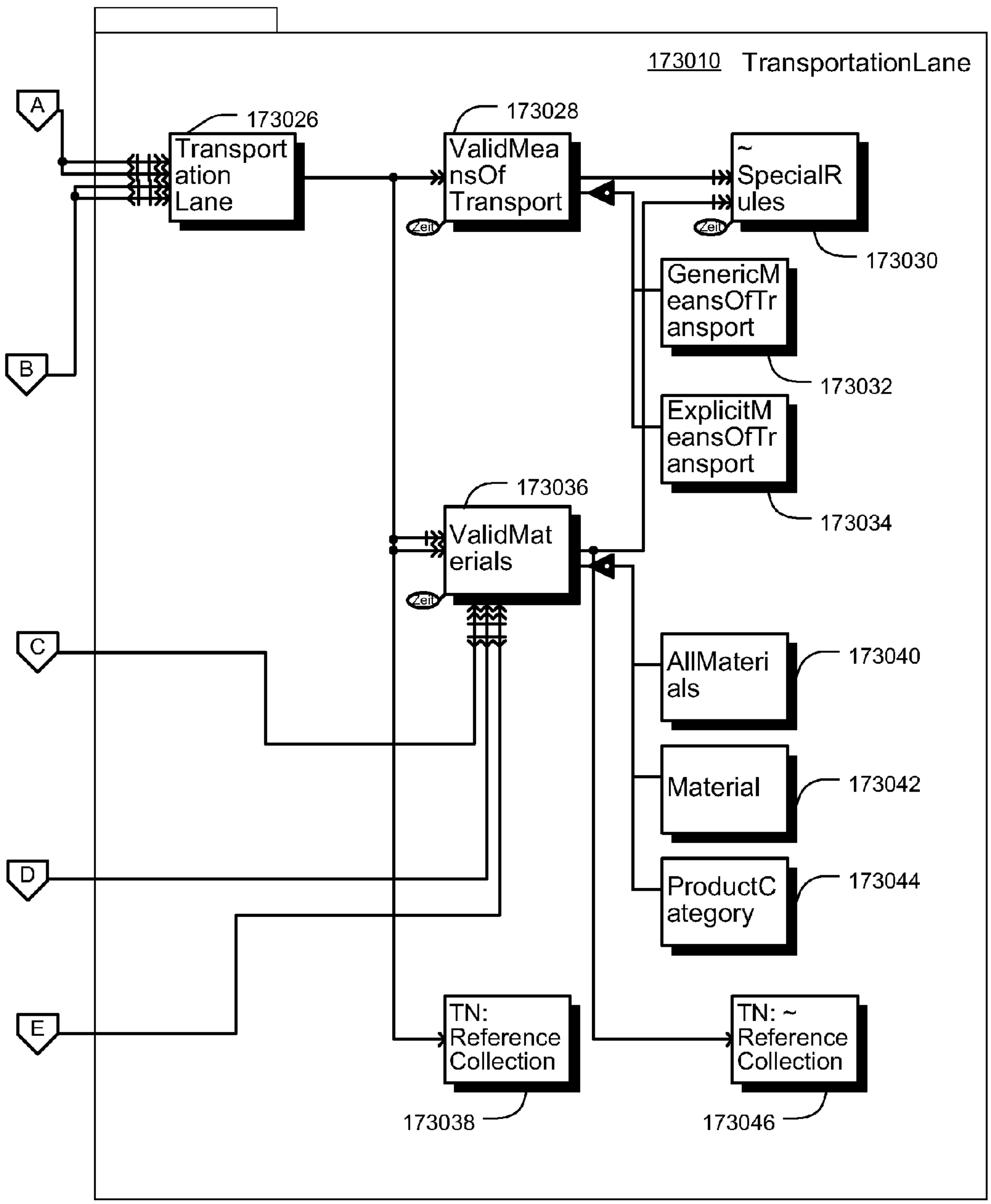
Figure 174:
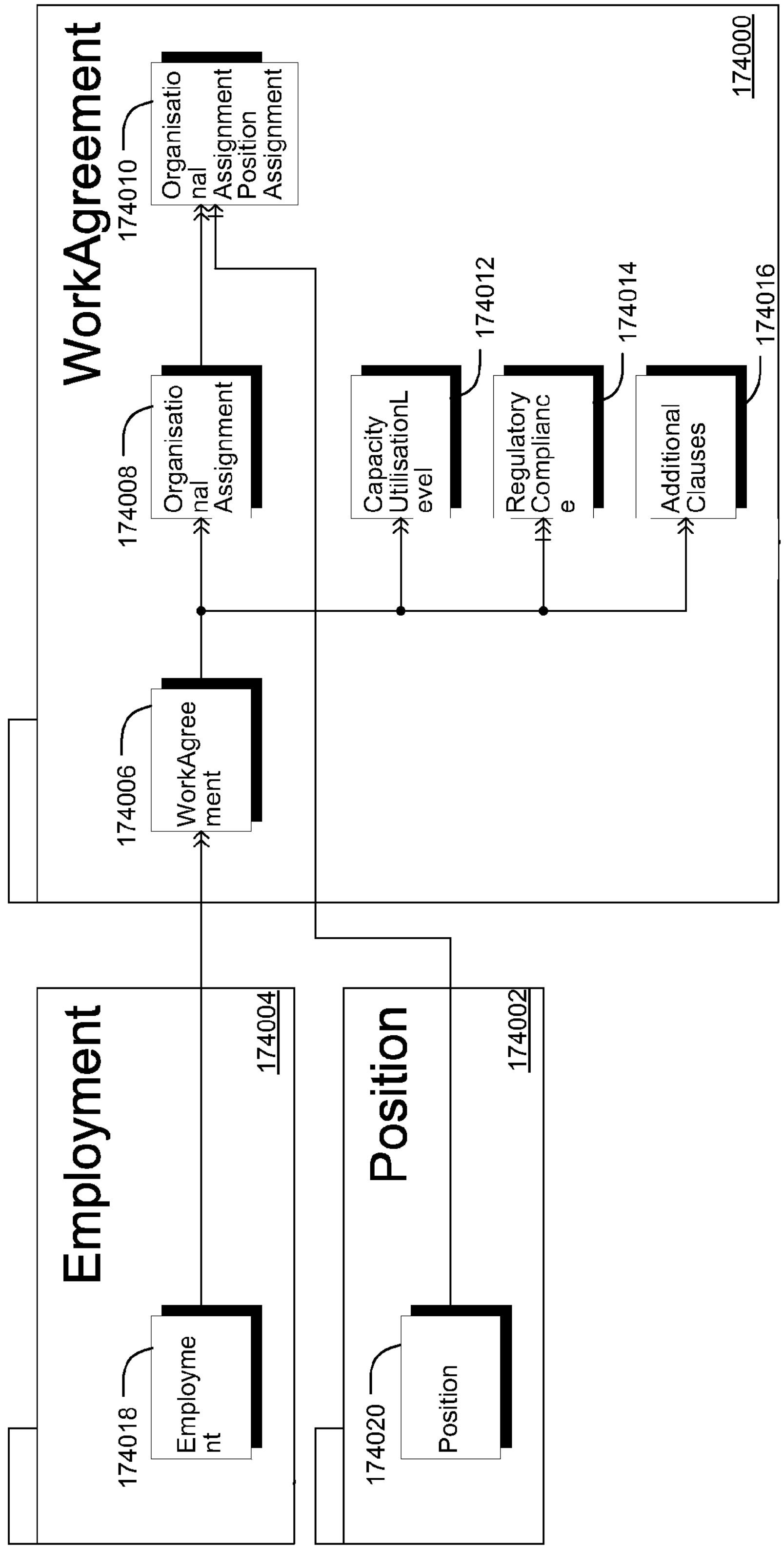
Figure 175:
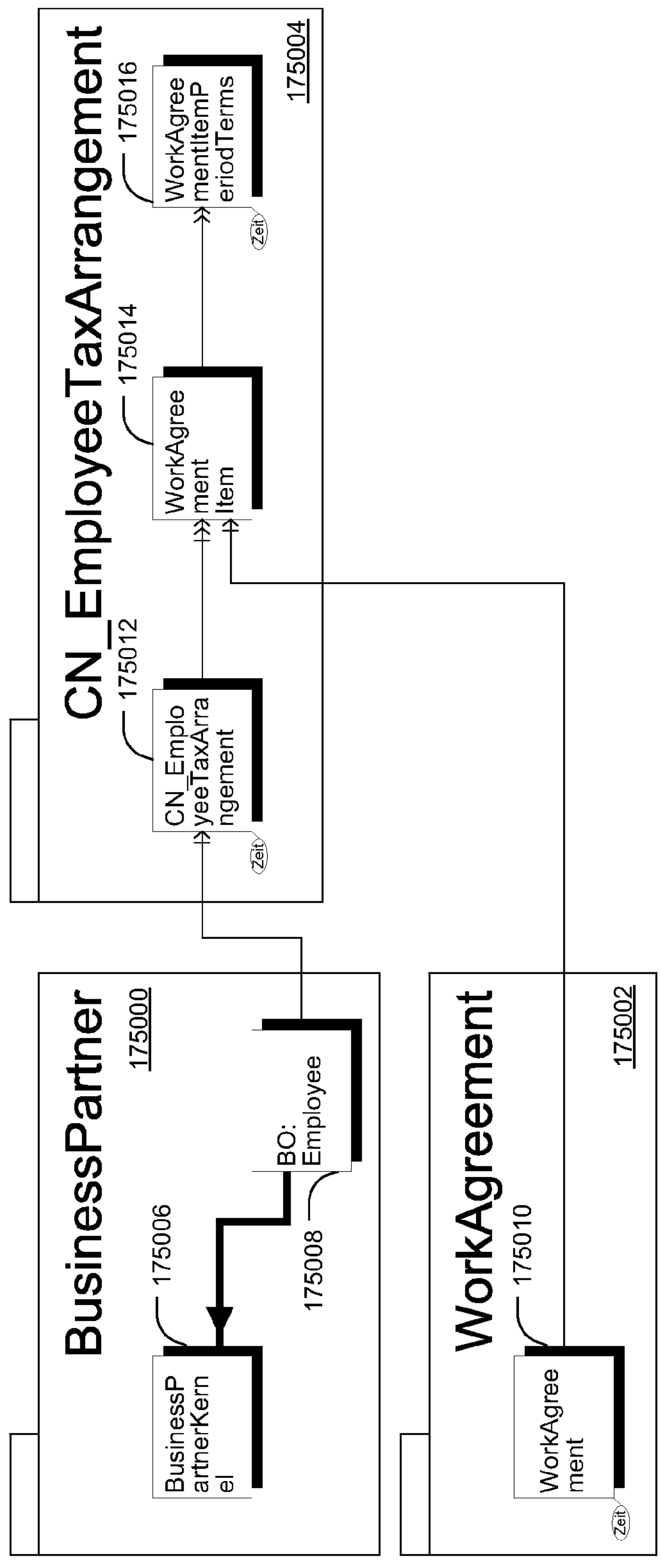
Figure 176:
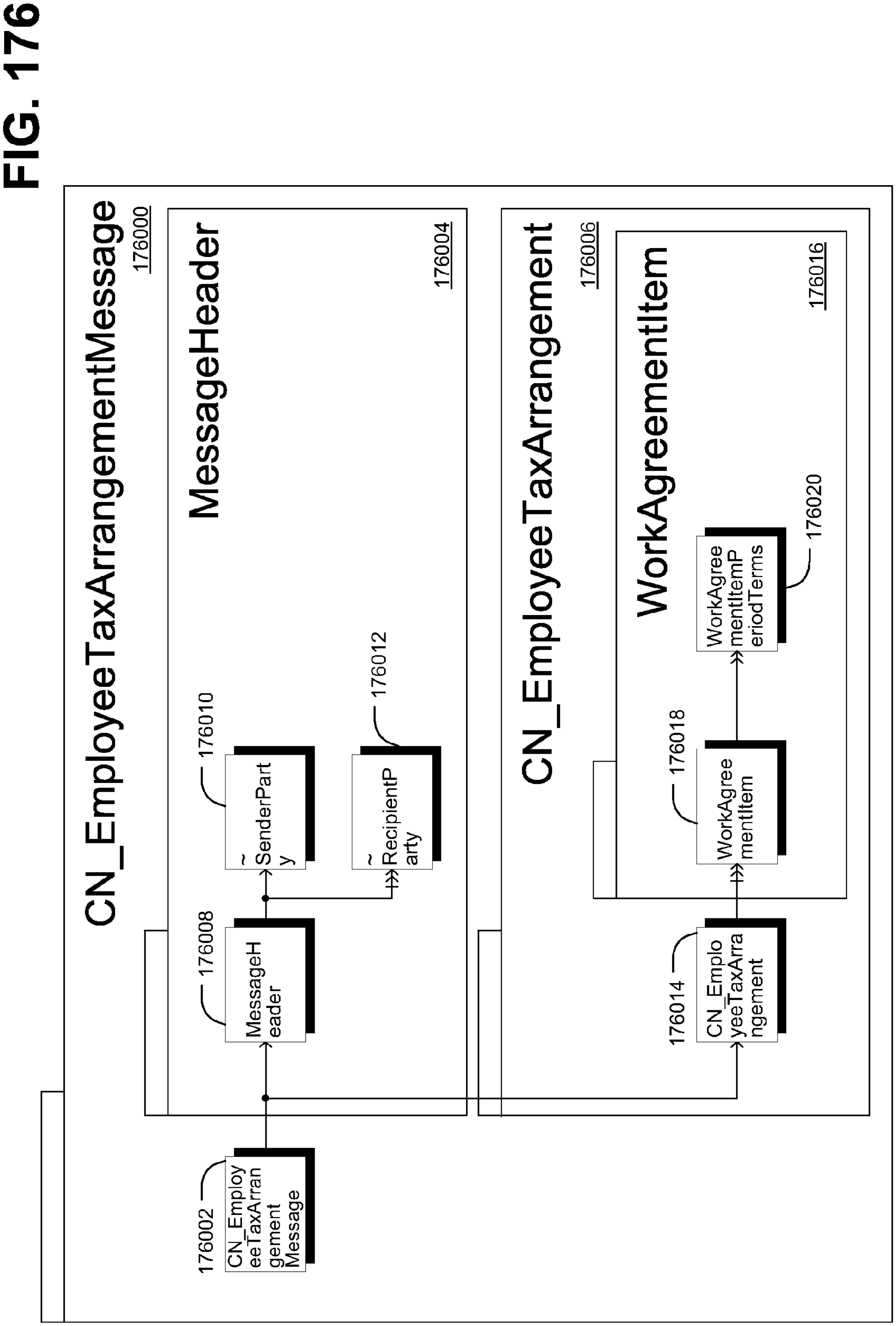
Figure 178:
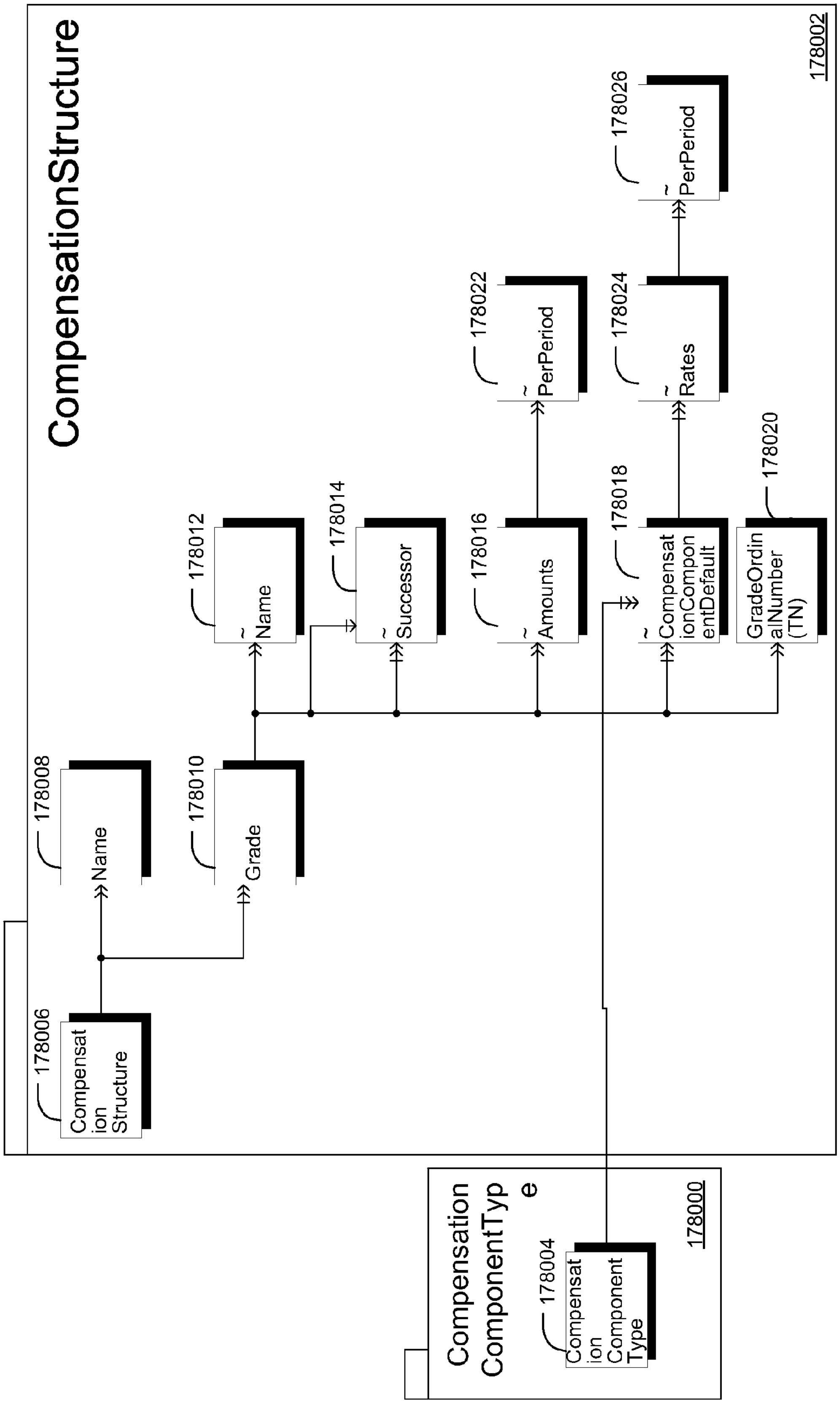
Figures 1, 179:
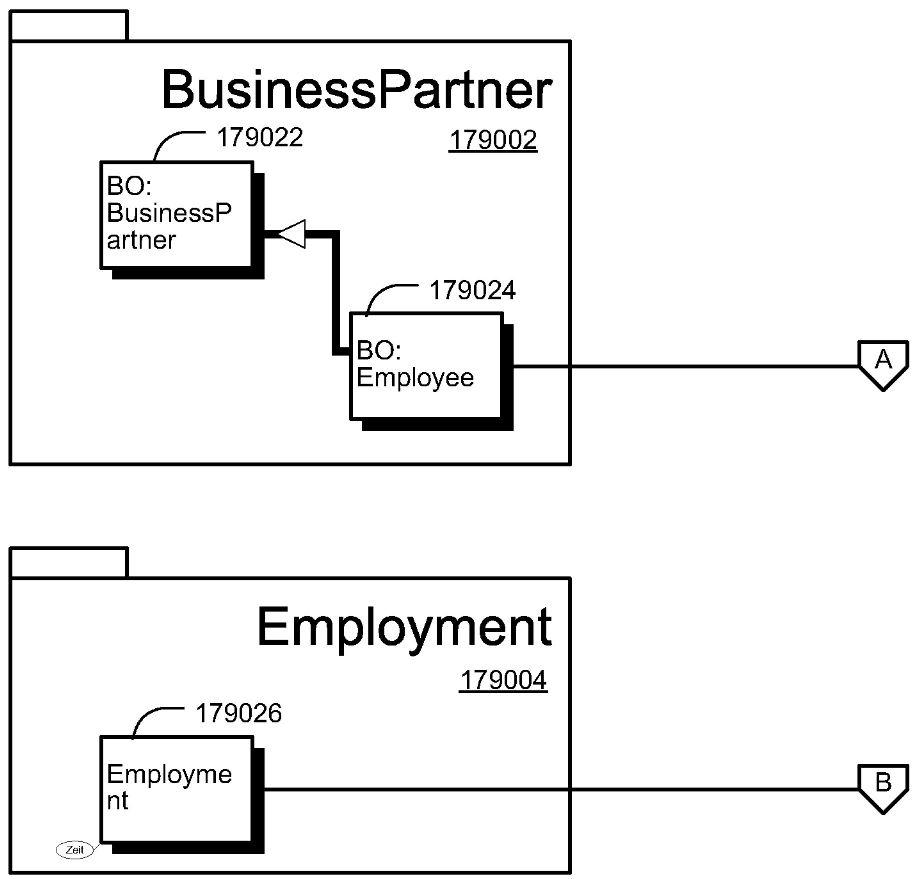
Figures 2, 179:
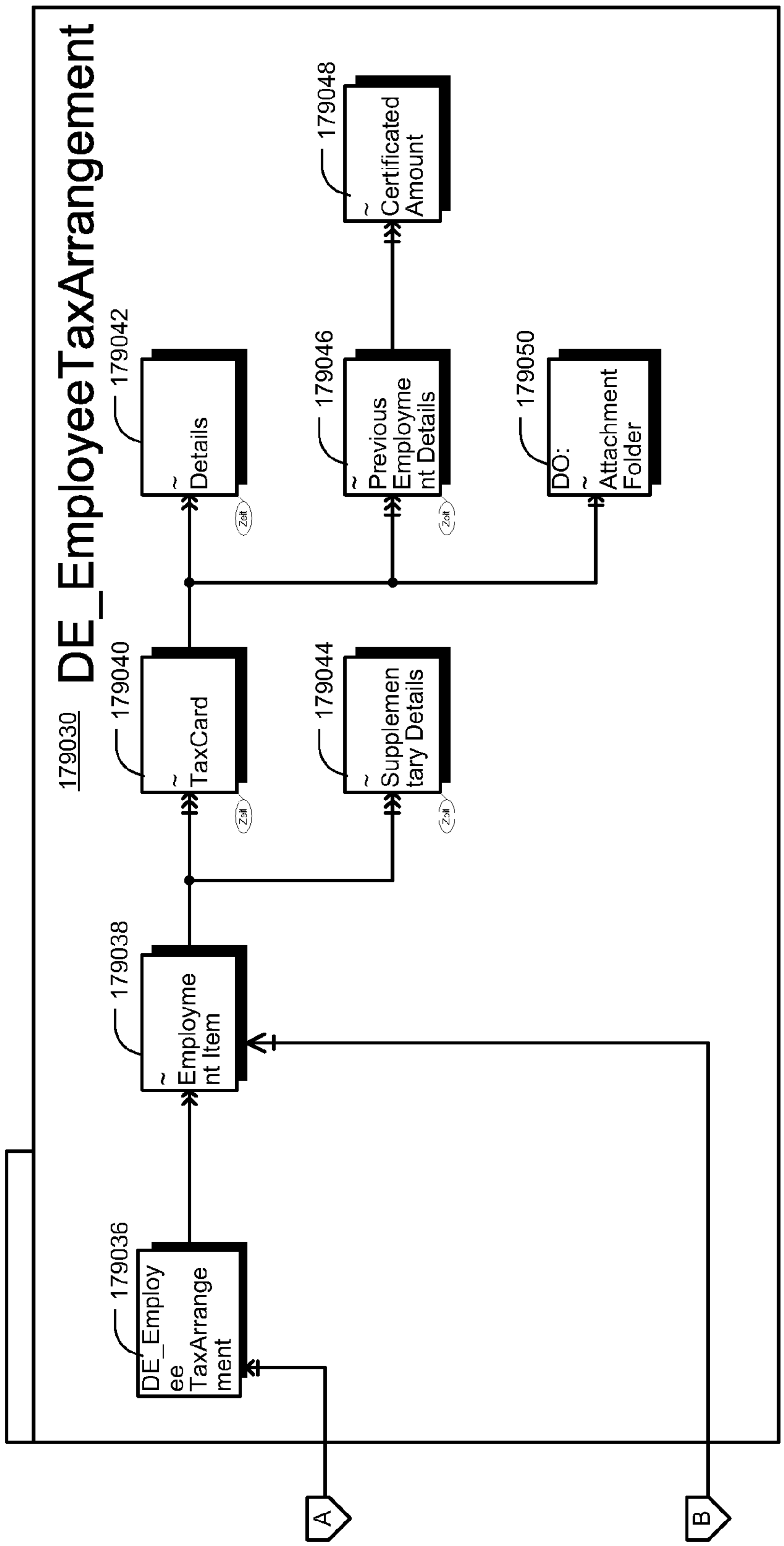
Figures 1, 180:
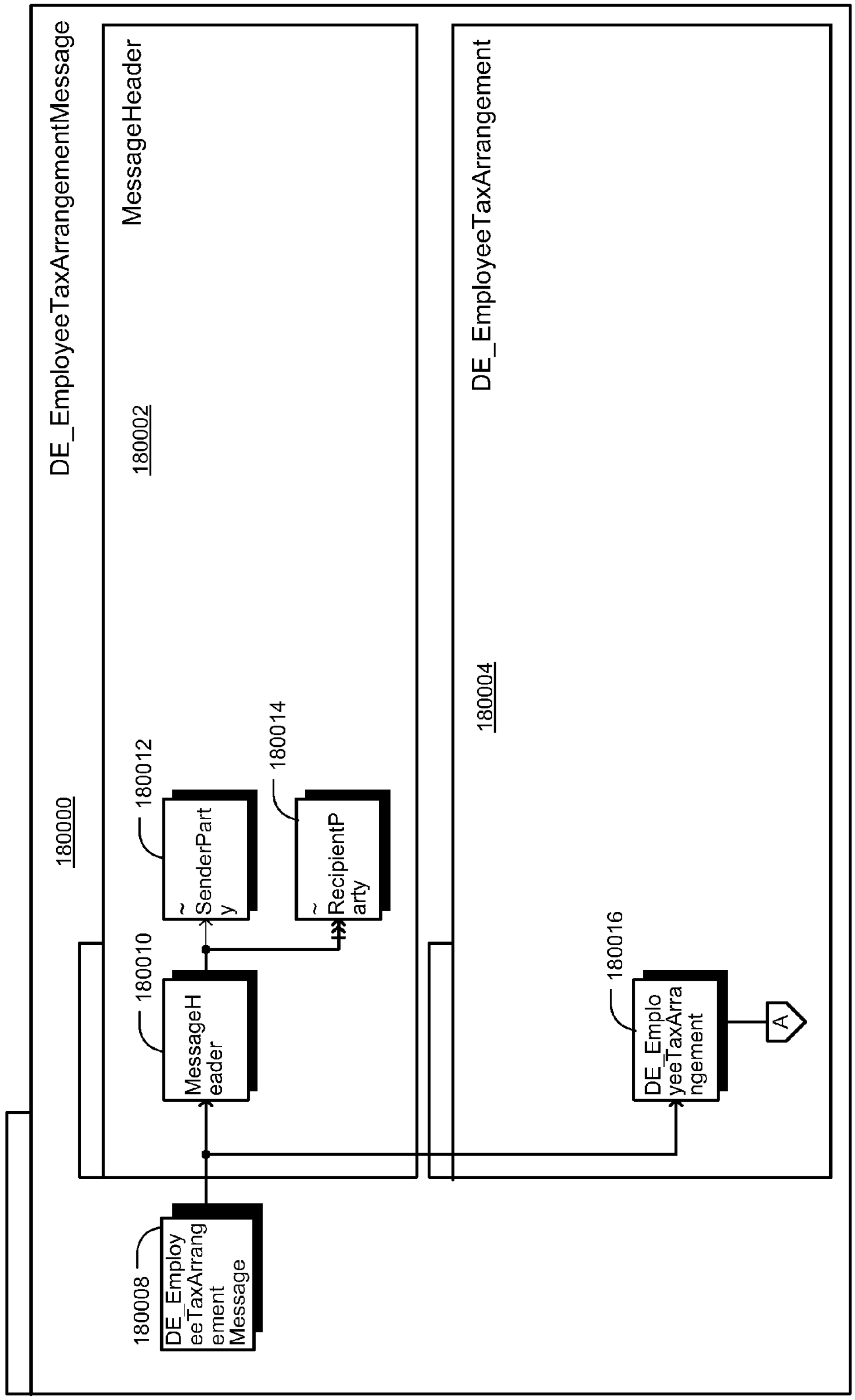
Figures 2, 180:
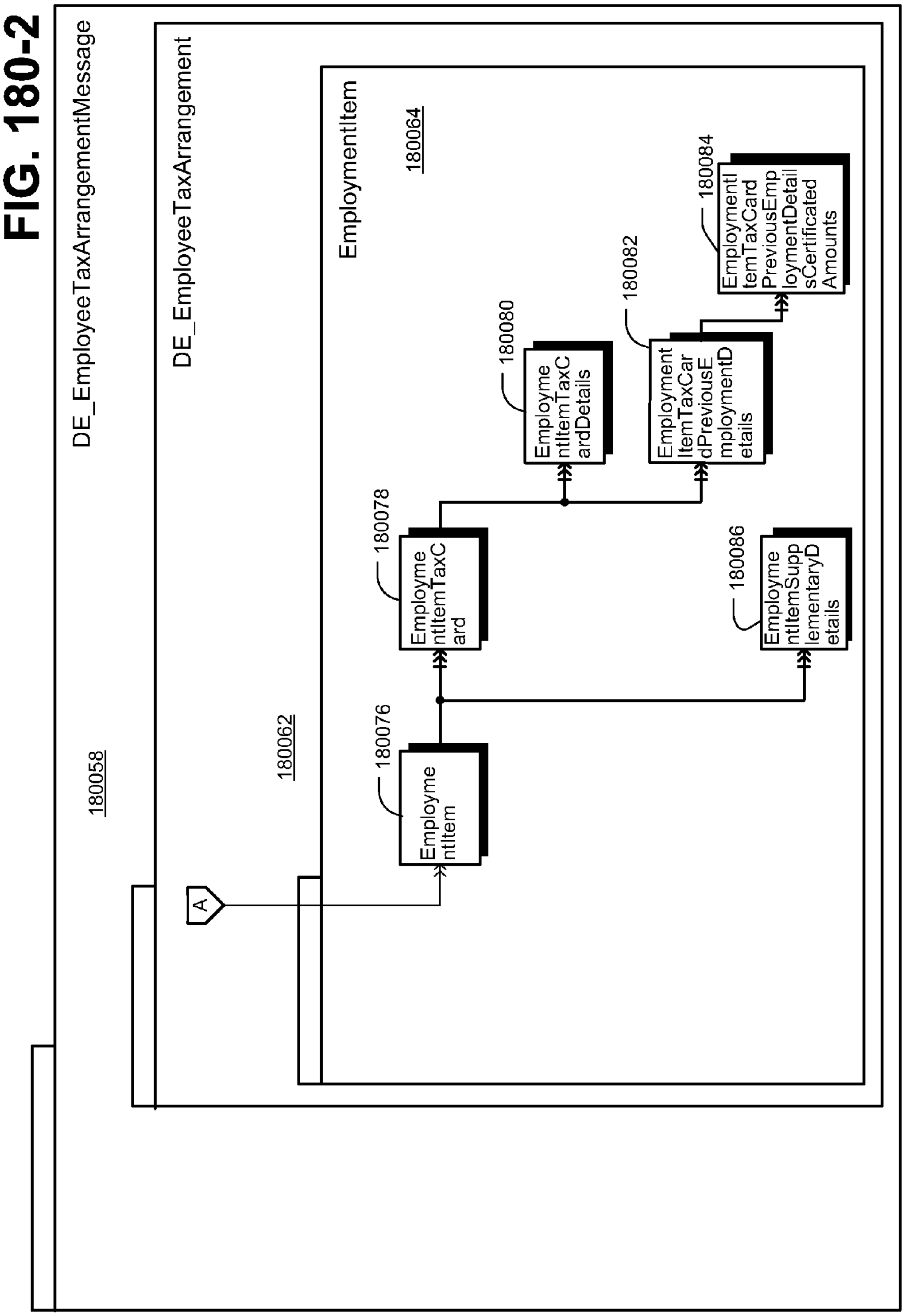
Figure 182:
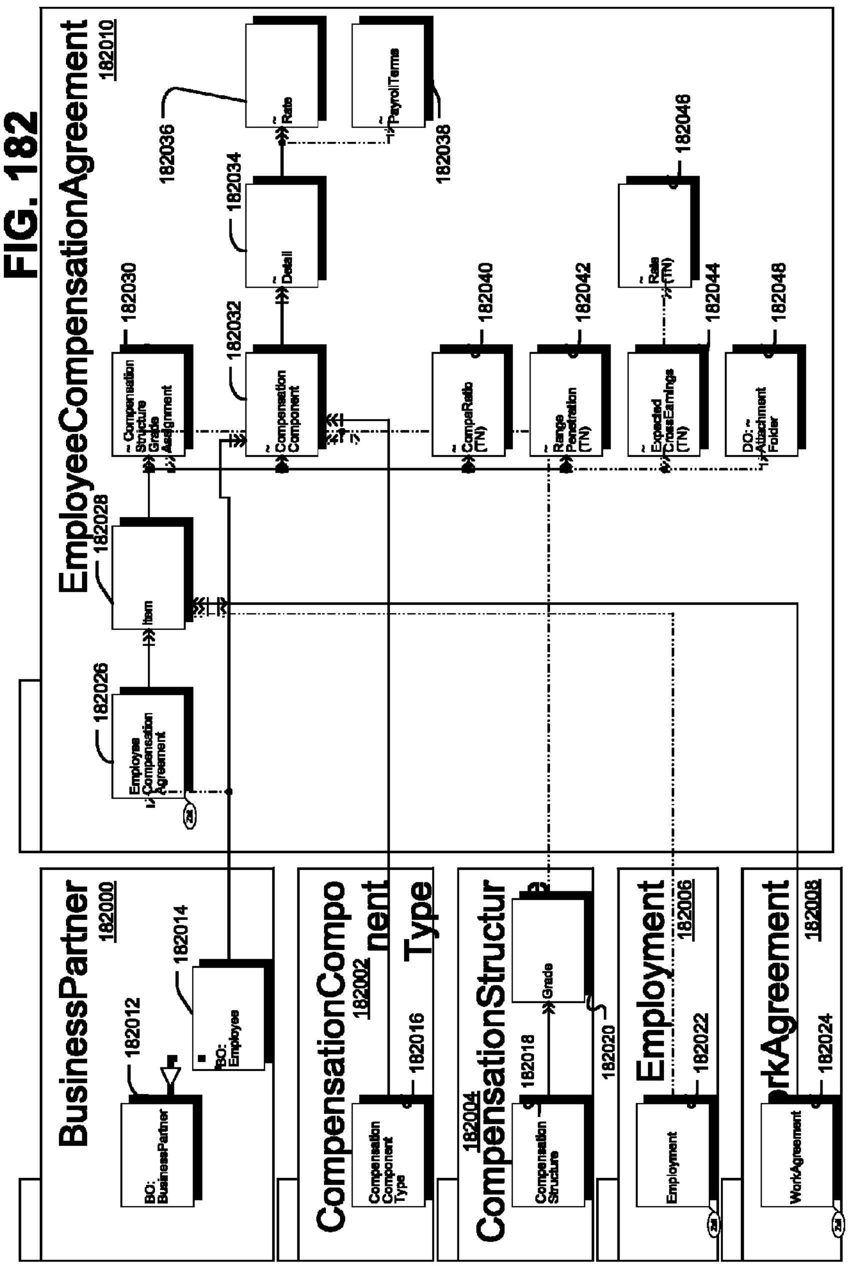
Figure 183:
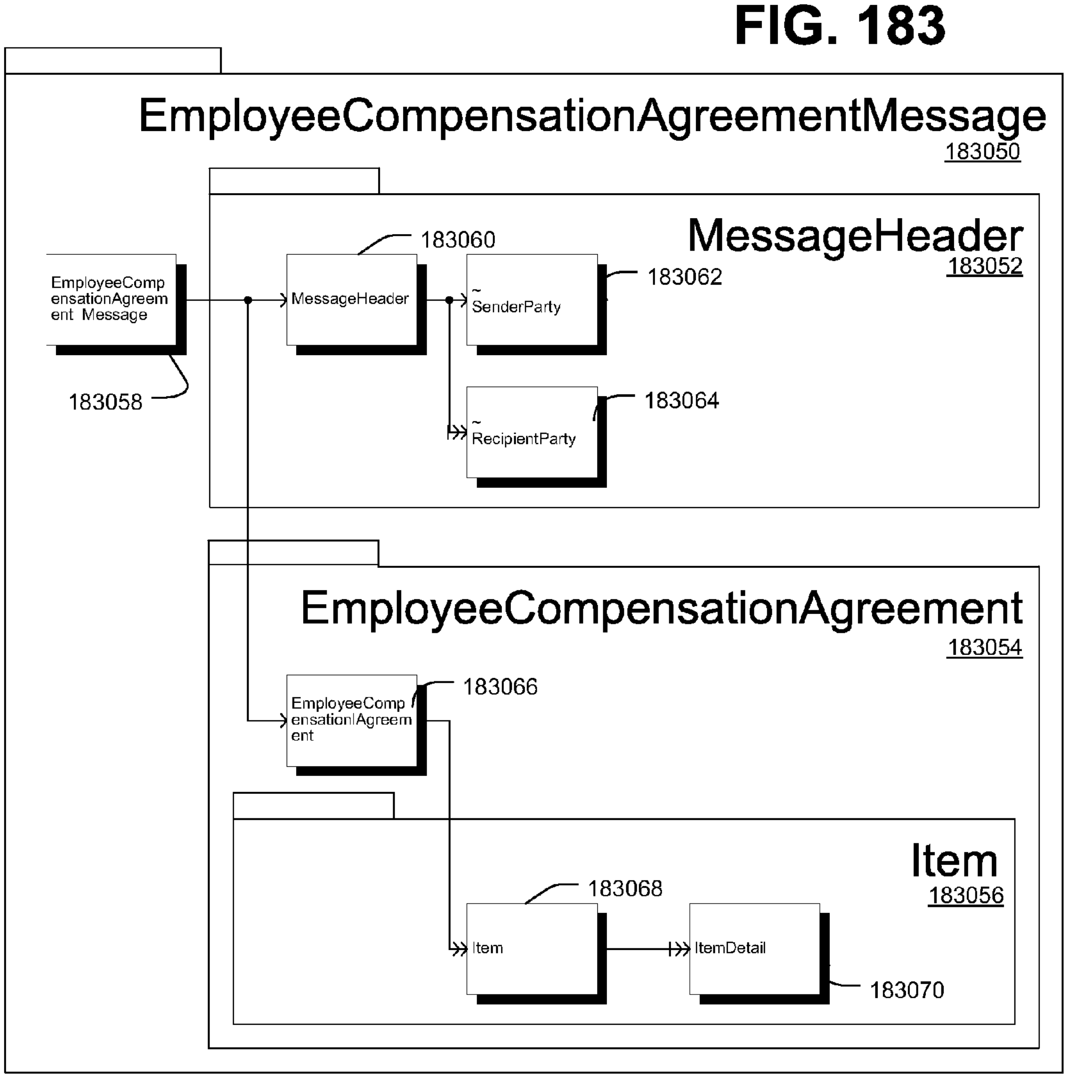
Figures 1, 186:
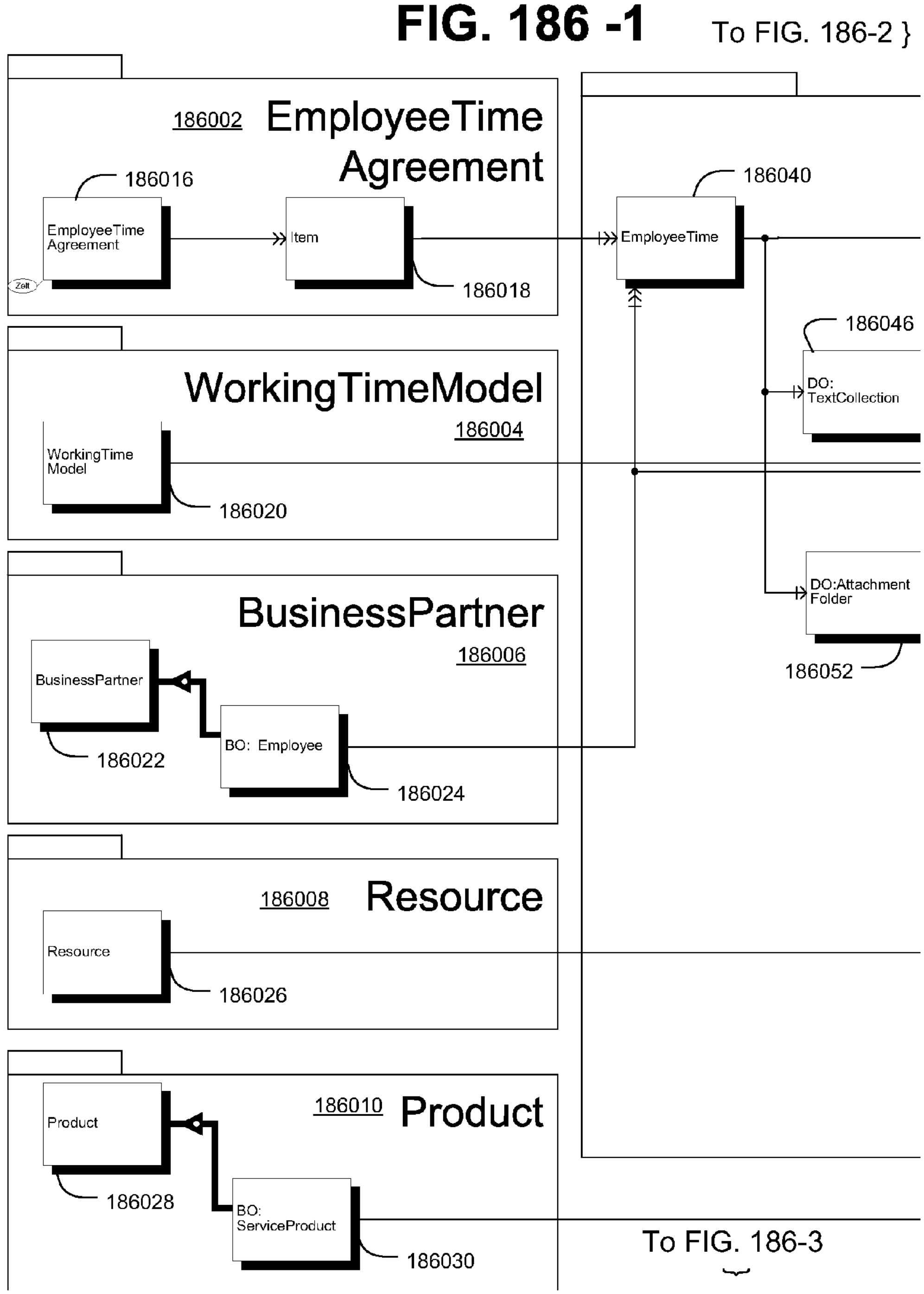
Figures 2, 186:
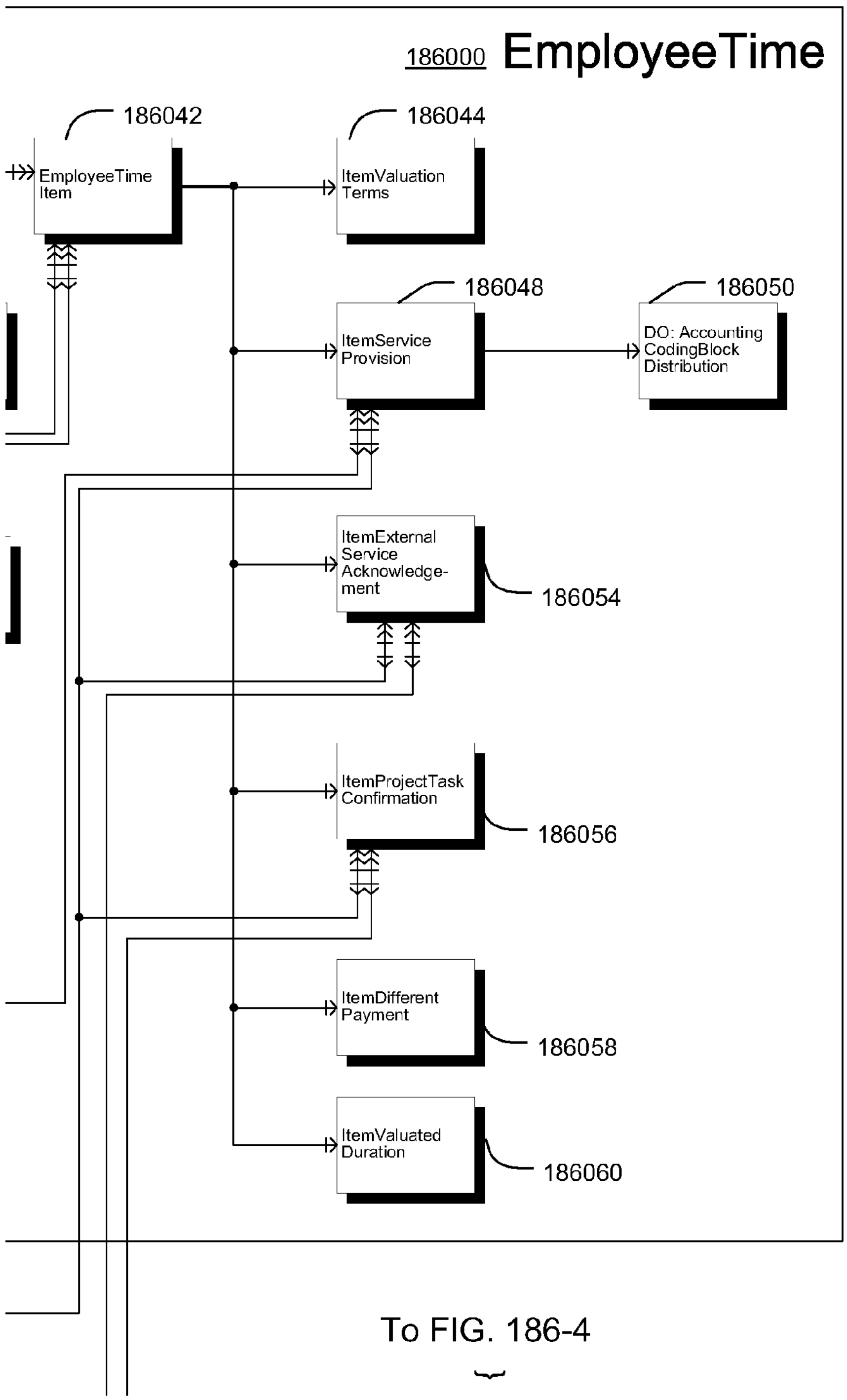
Figures 3, 186:
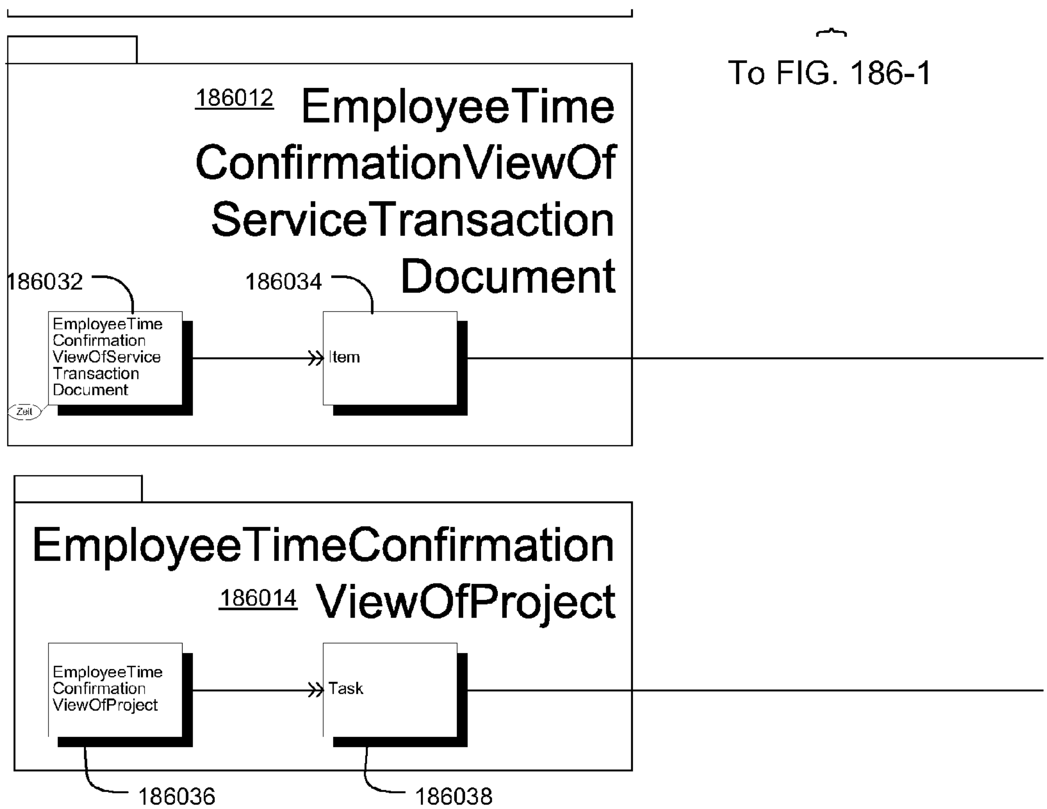
Figures 1, 187:
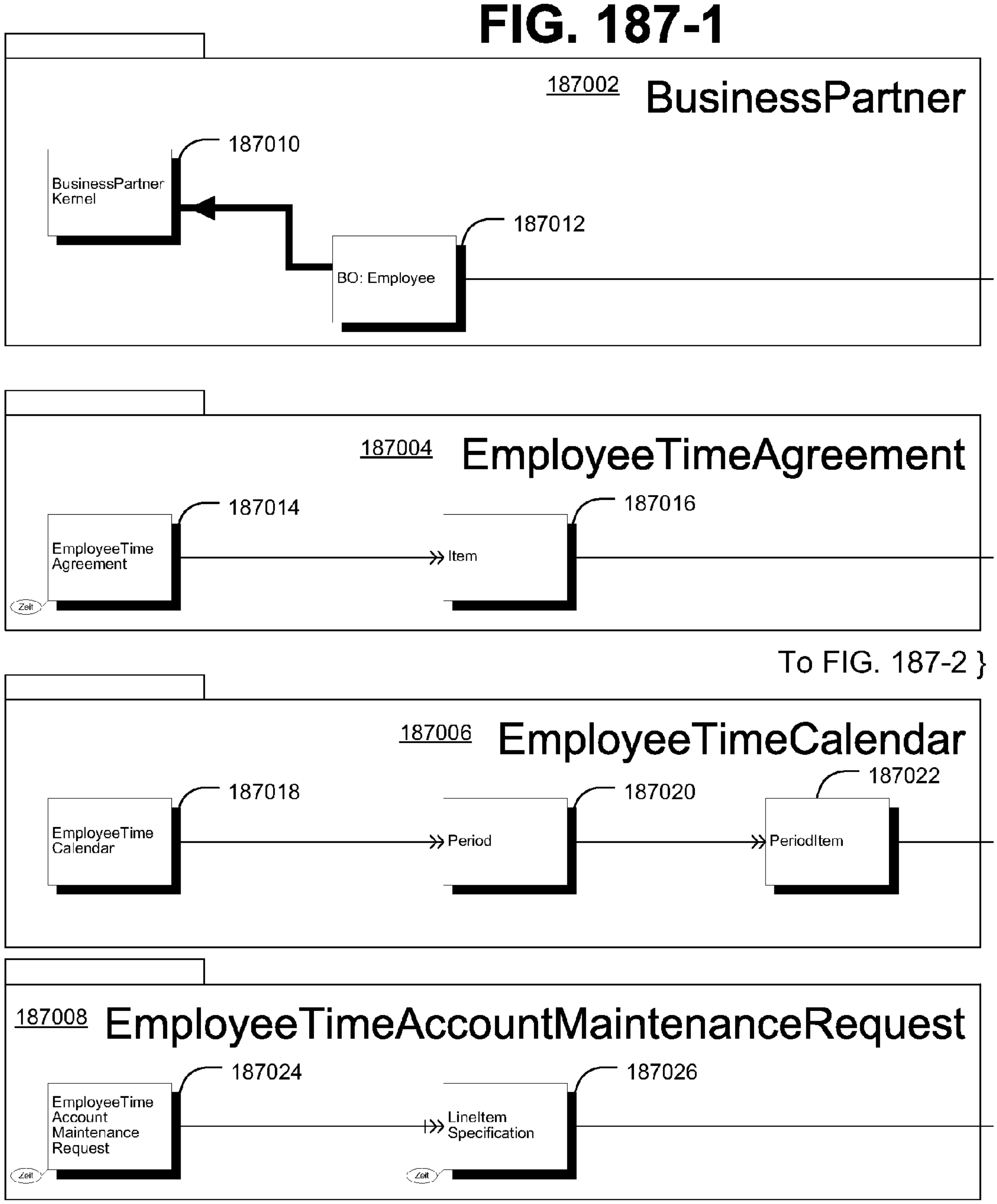
Figures 2, 187:
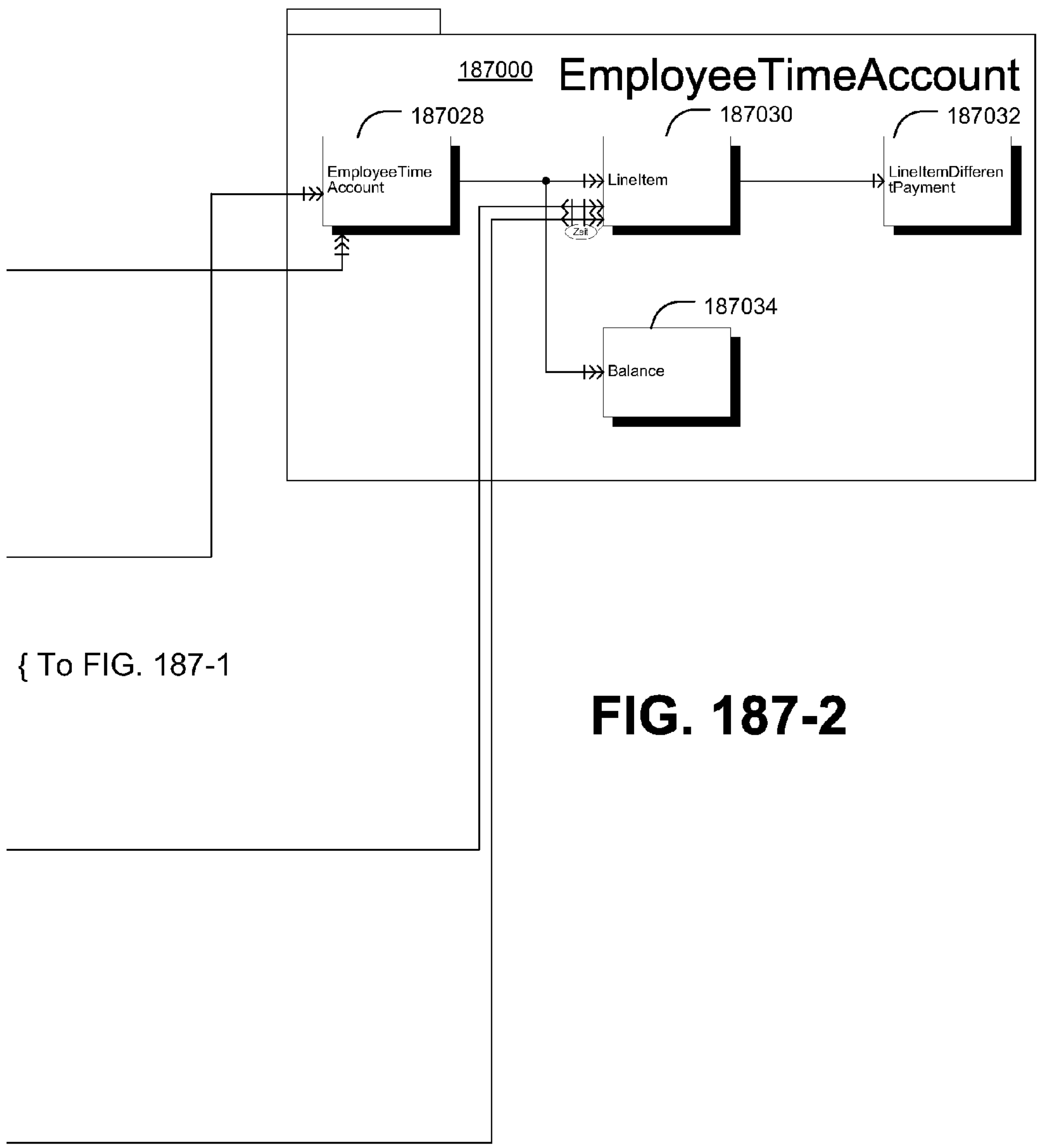
Figure 188:
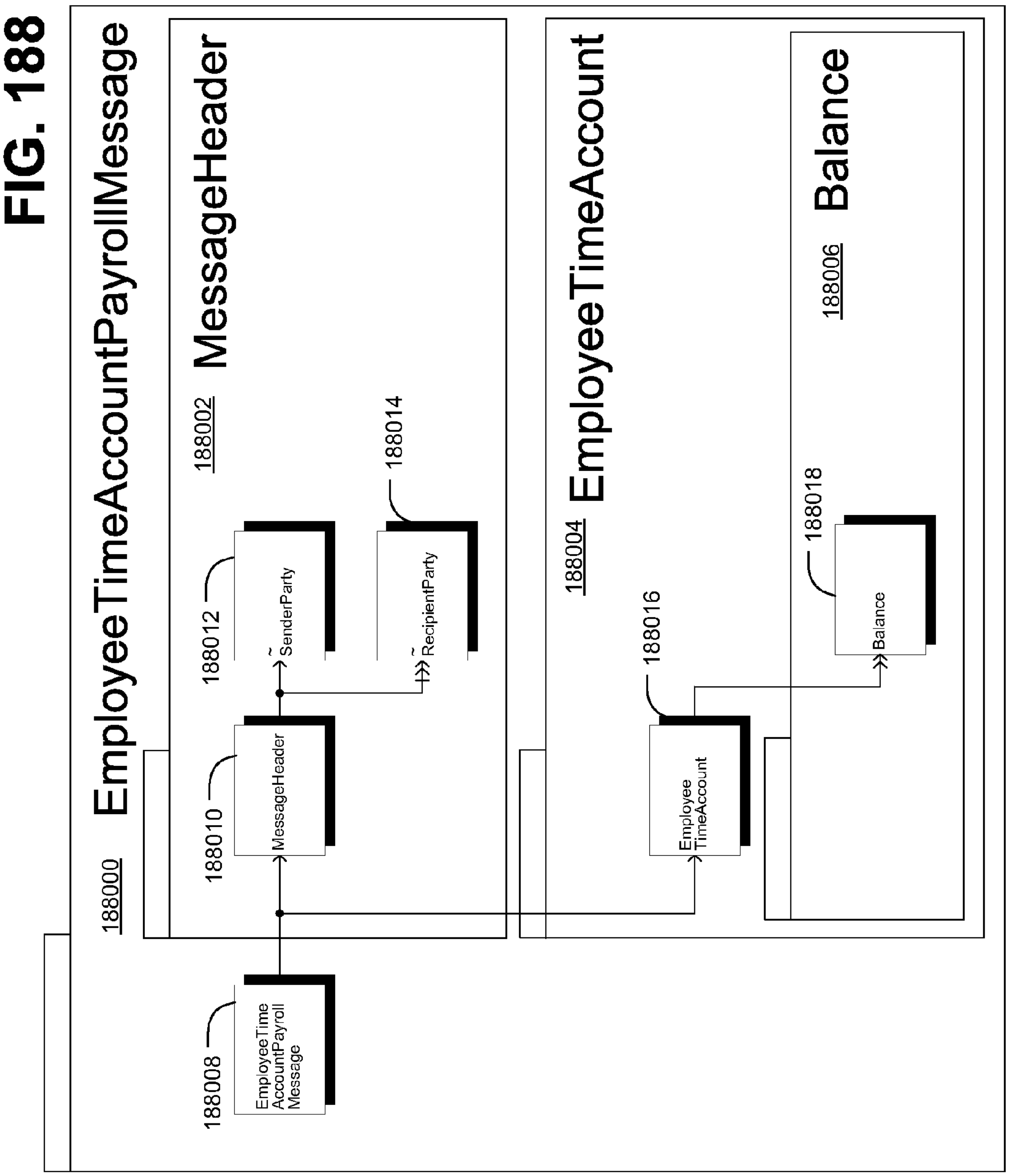
Figures 1, 190:
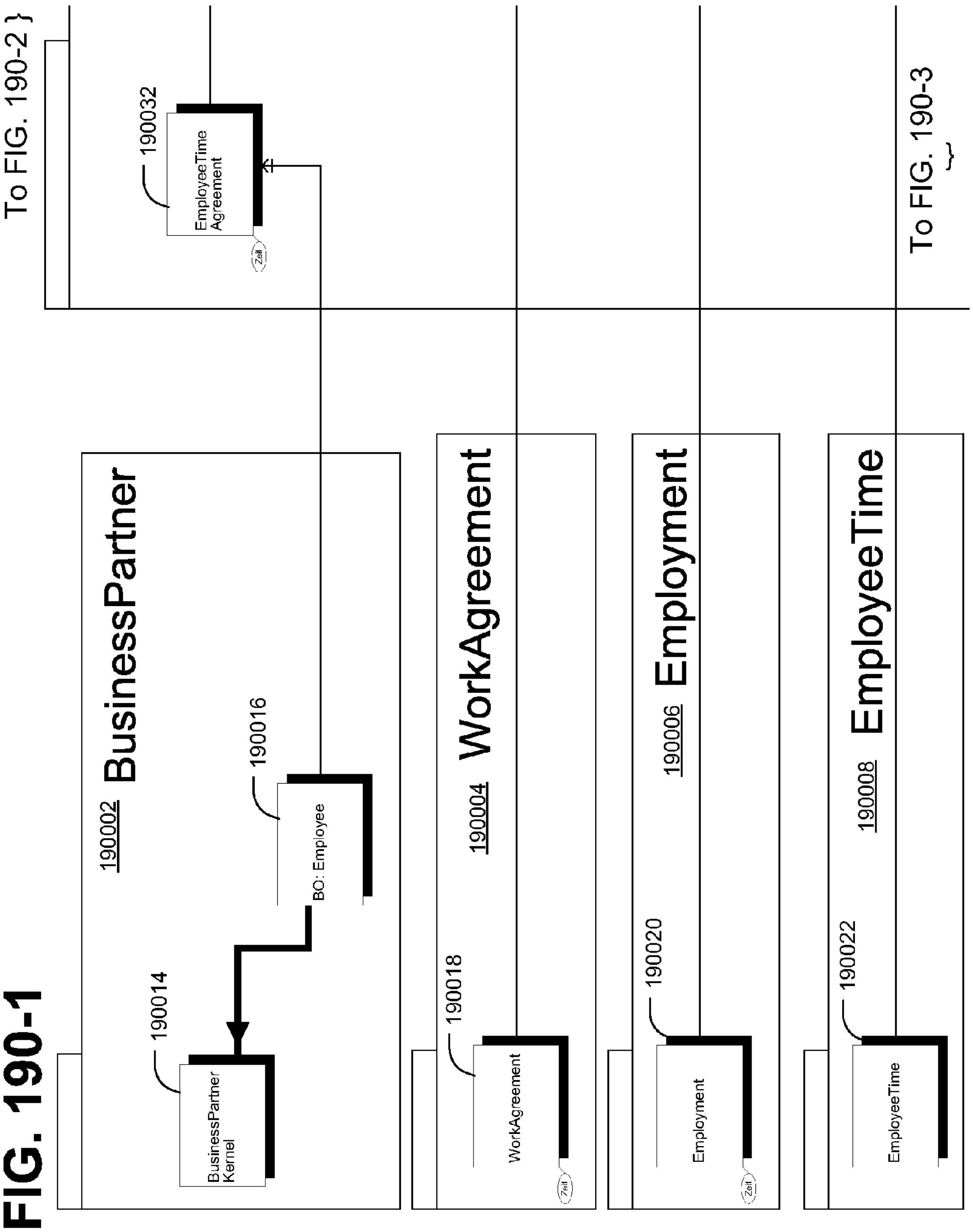
Figures 2, 190:
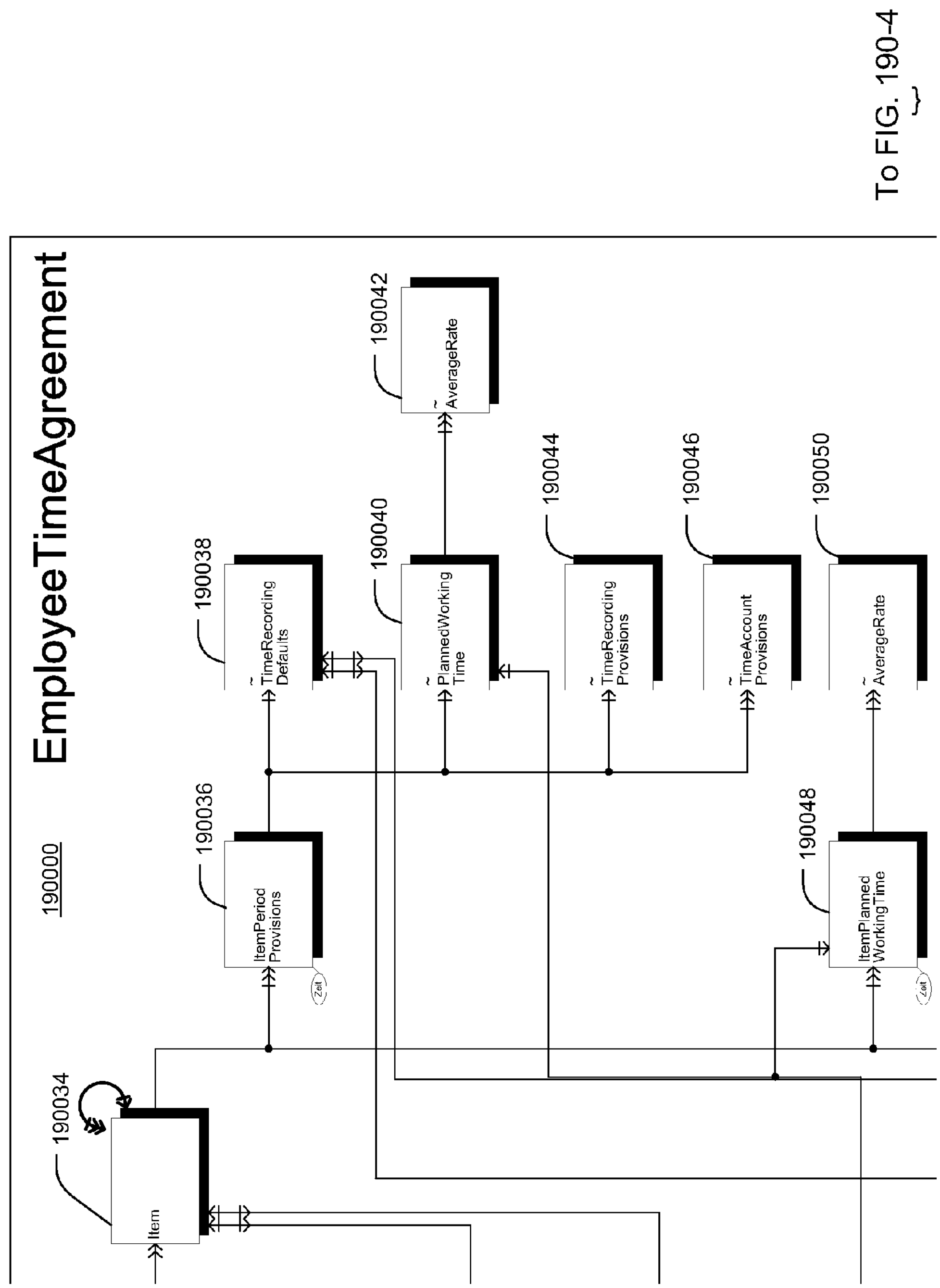
Figures 3, 190:
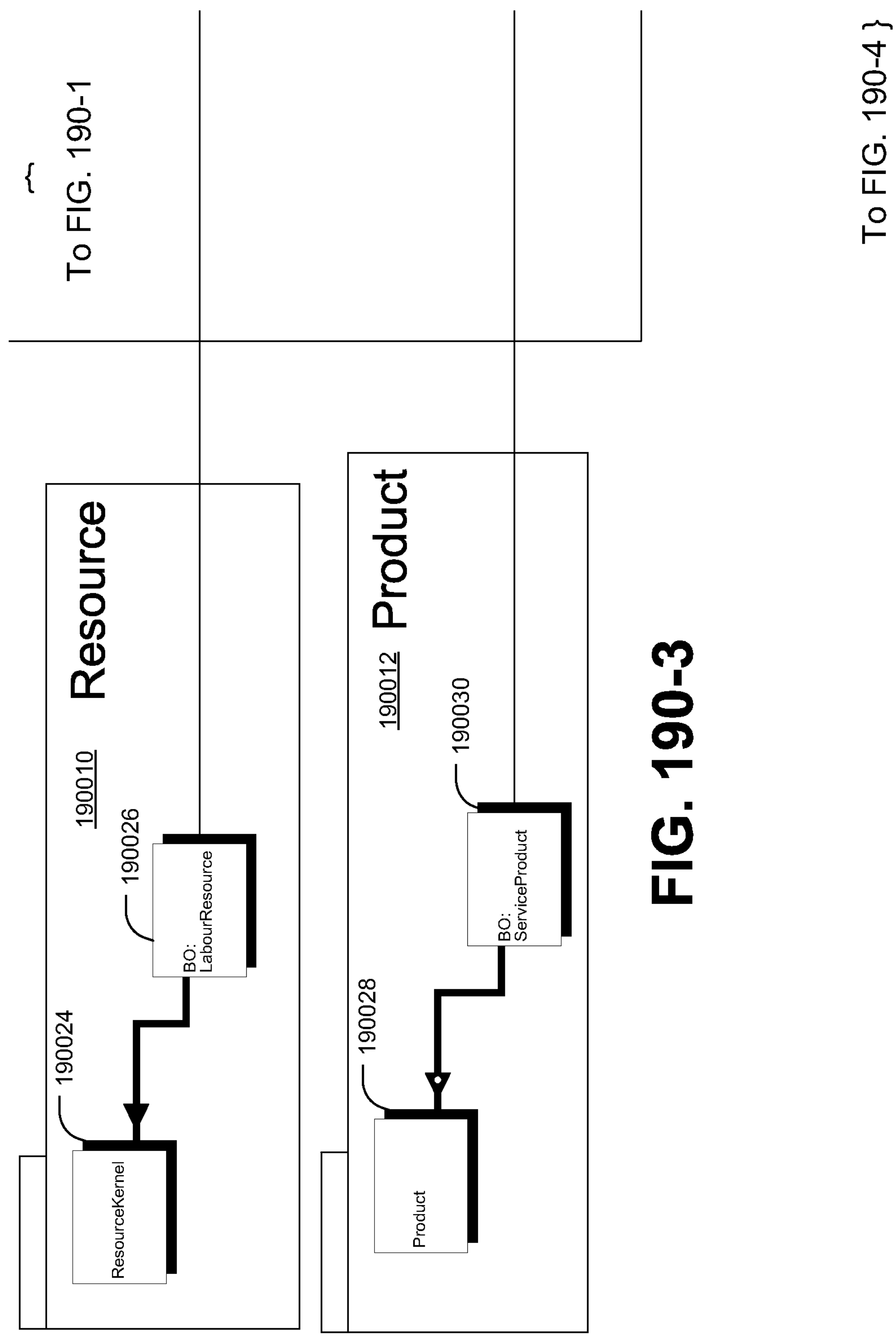
Figures 4, 190:
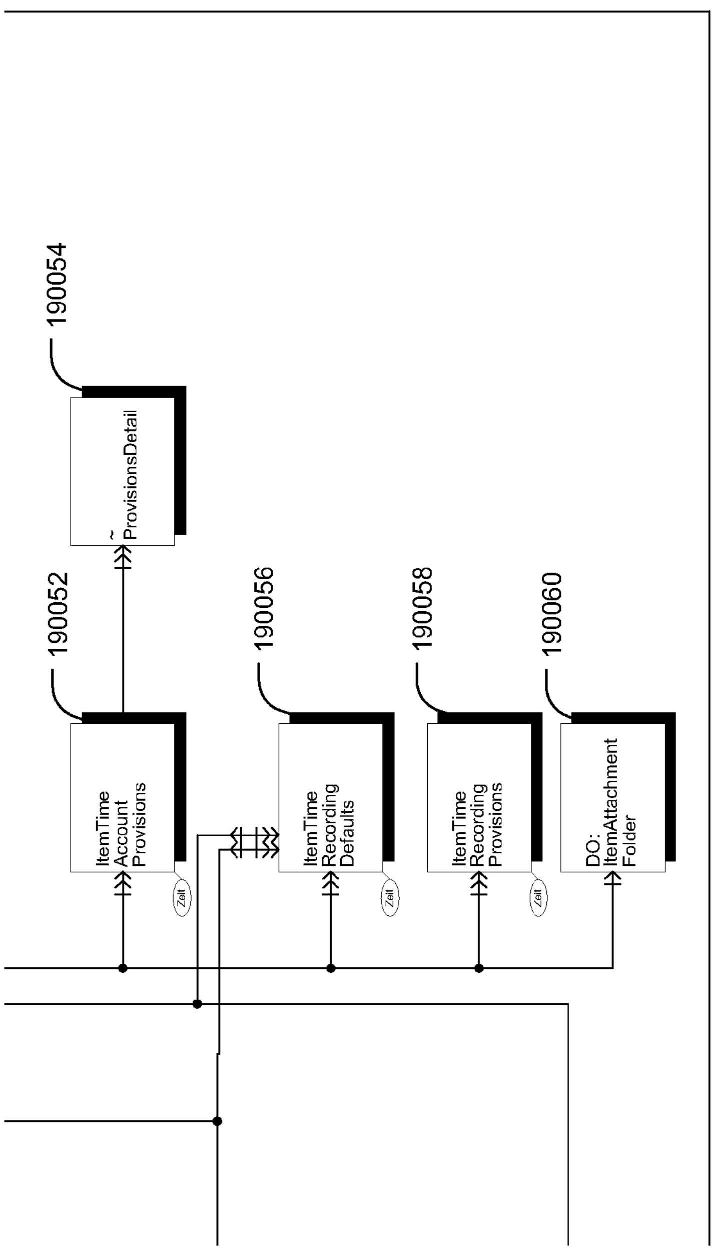
Figures 1, 191:
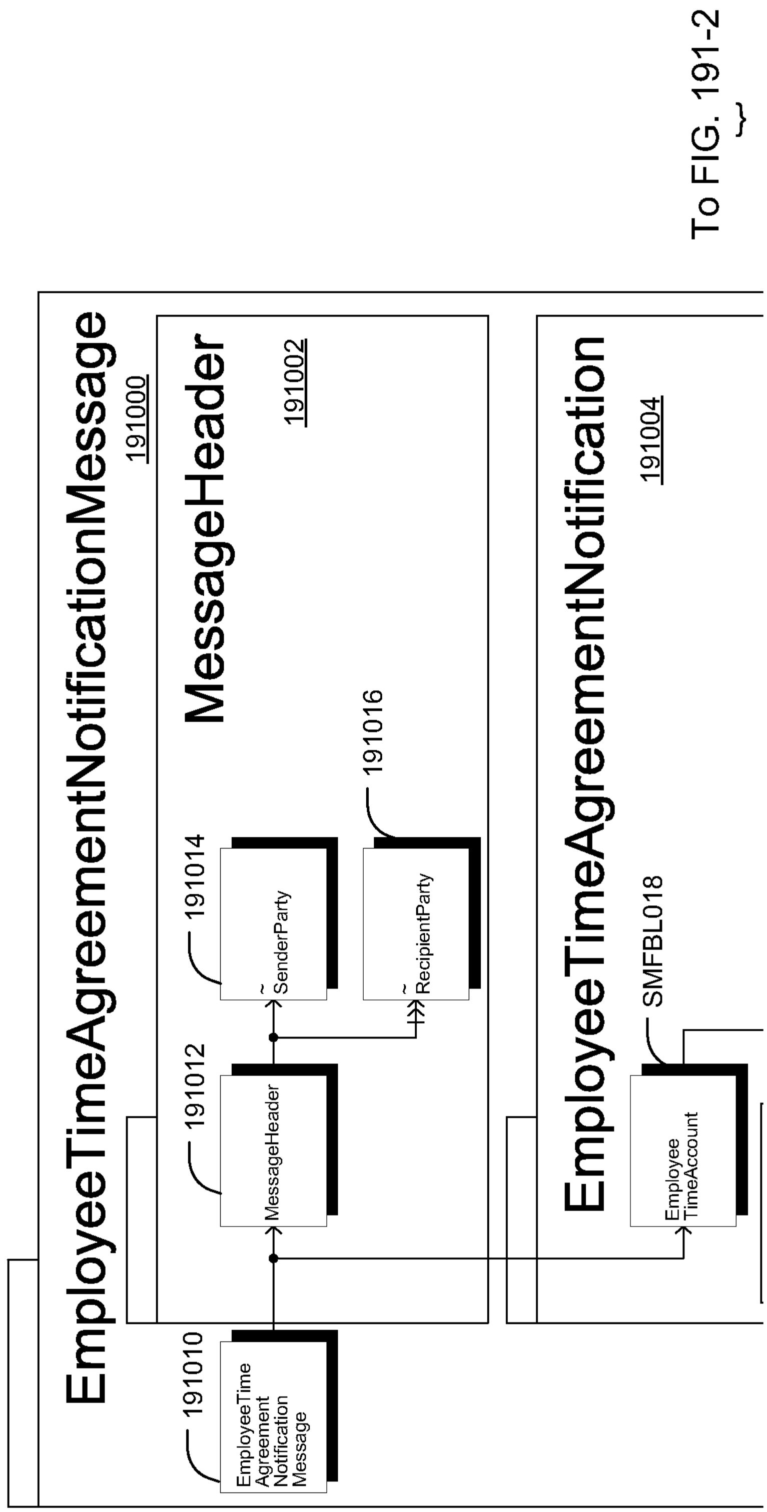
Figures 2, 191:
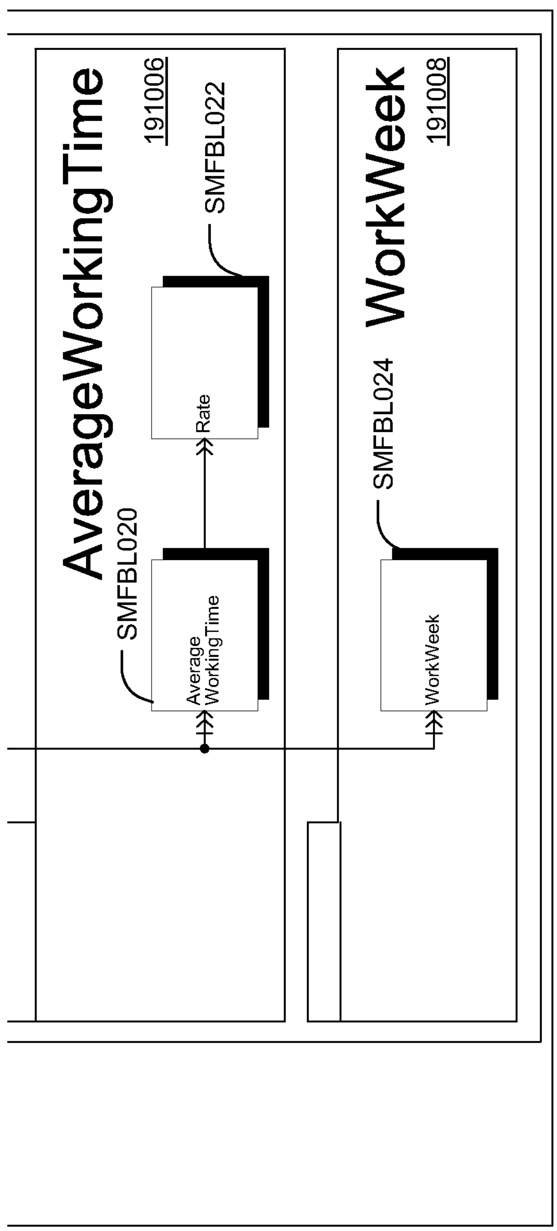
Figures 1, 193:
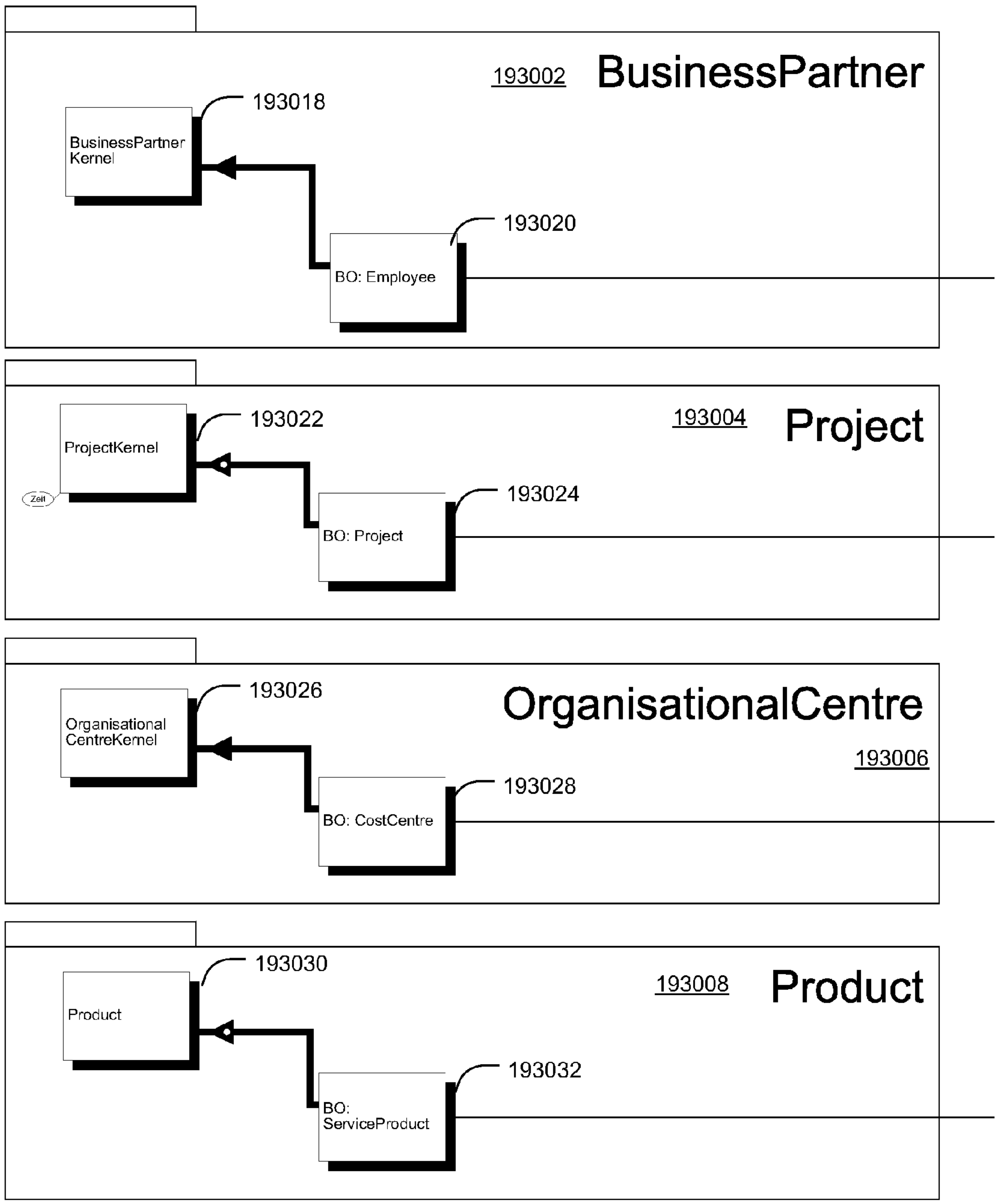
Figures 2, 193:
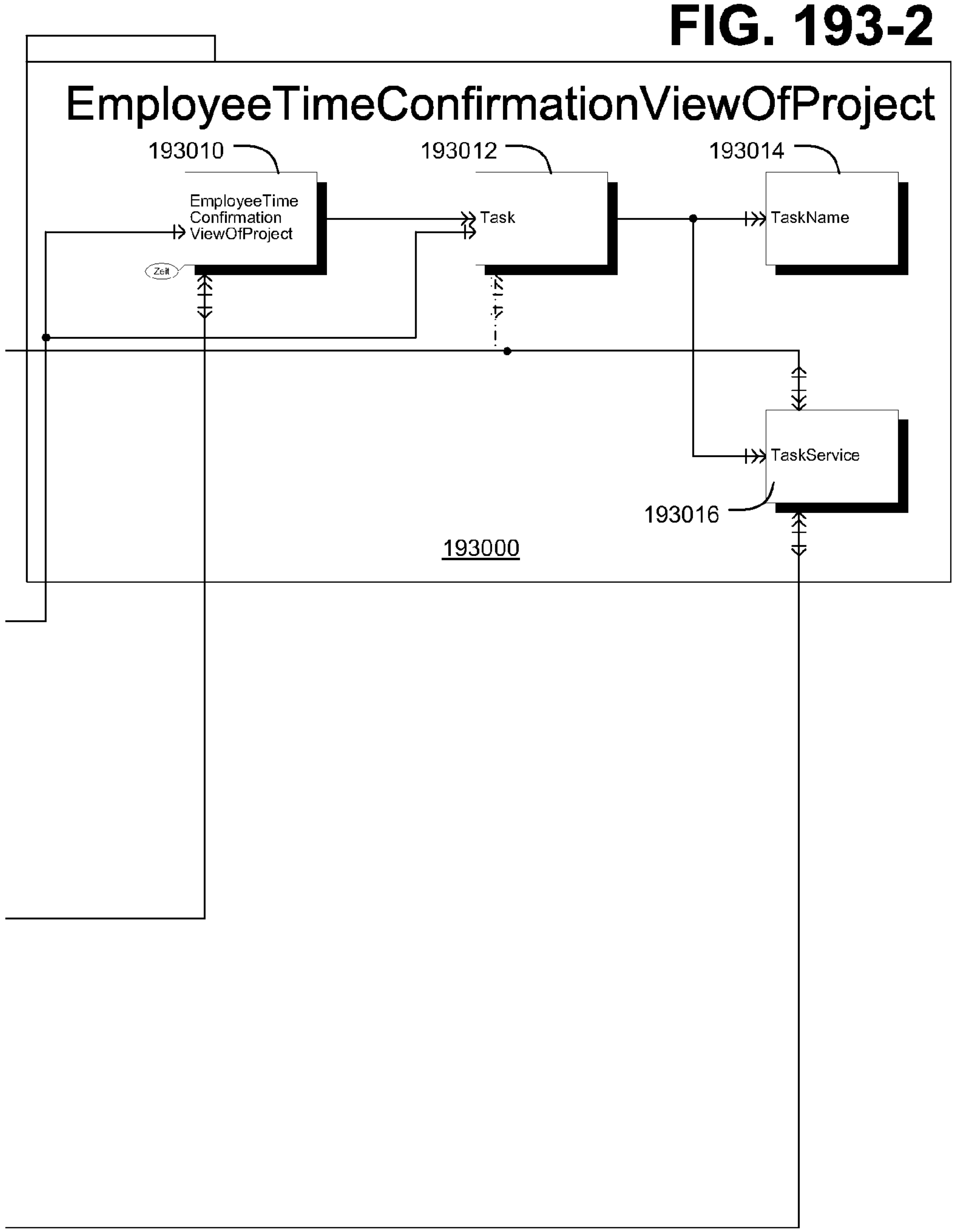
Figures 1, 194:
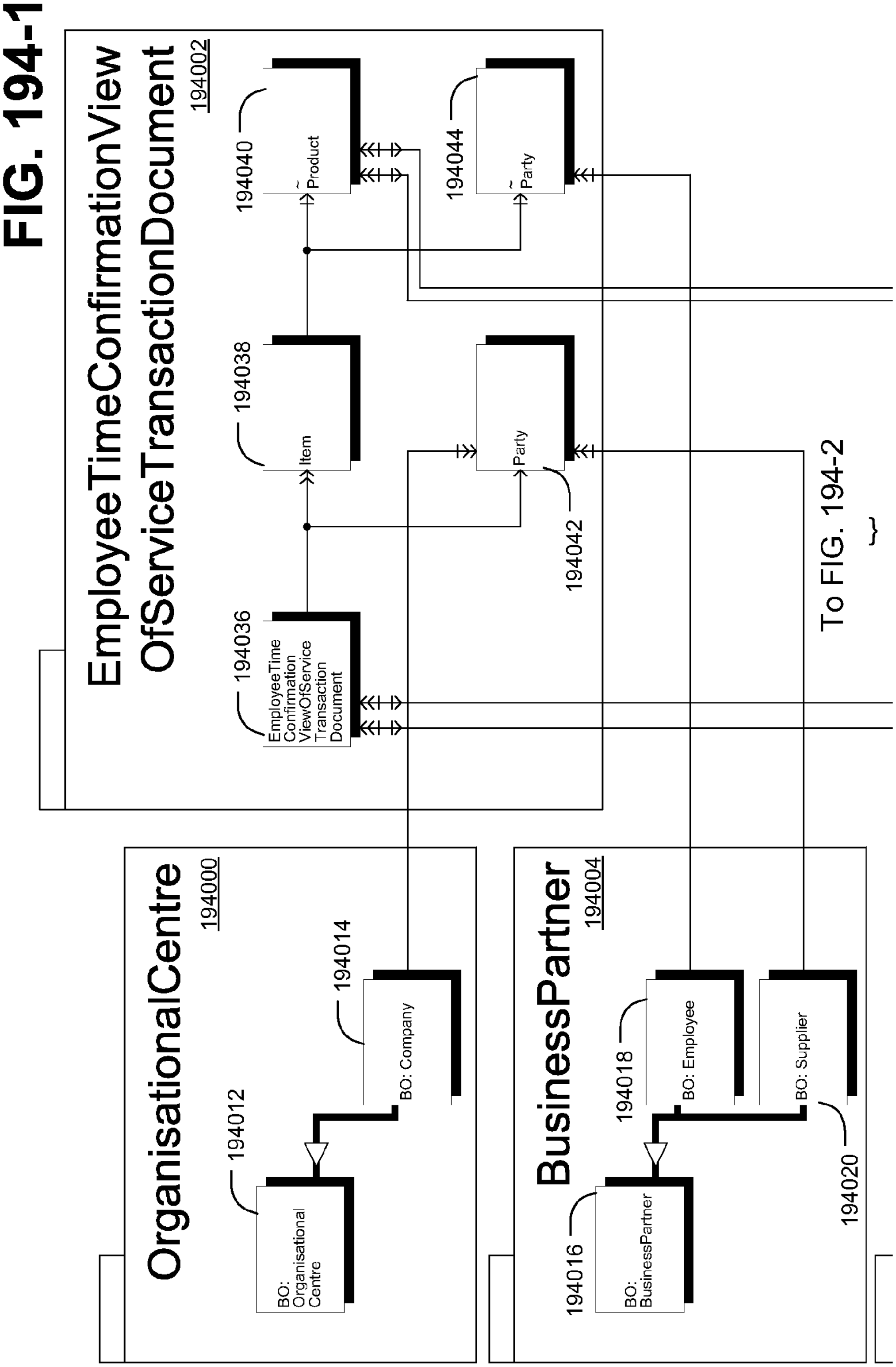
Figures 2, 194:
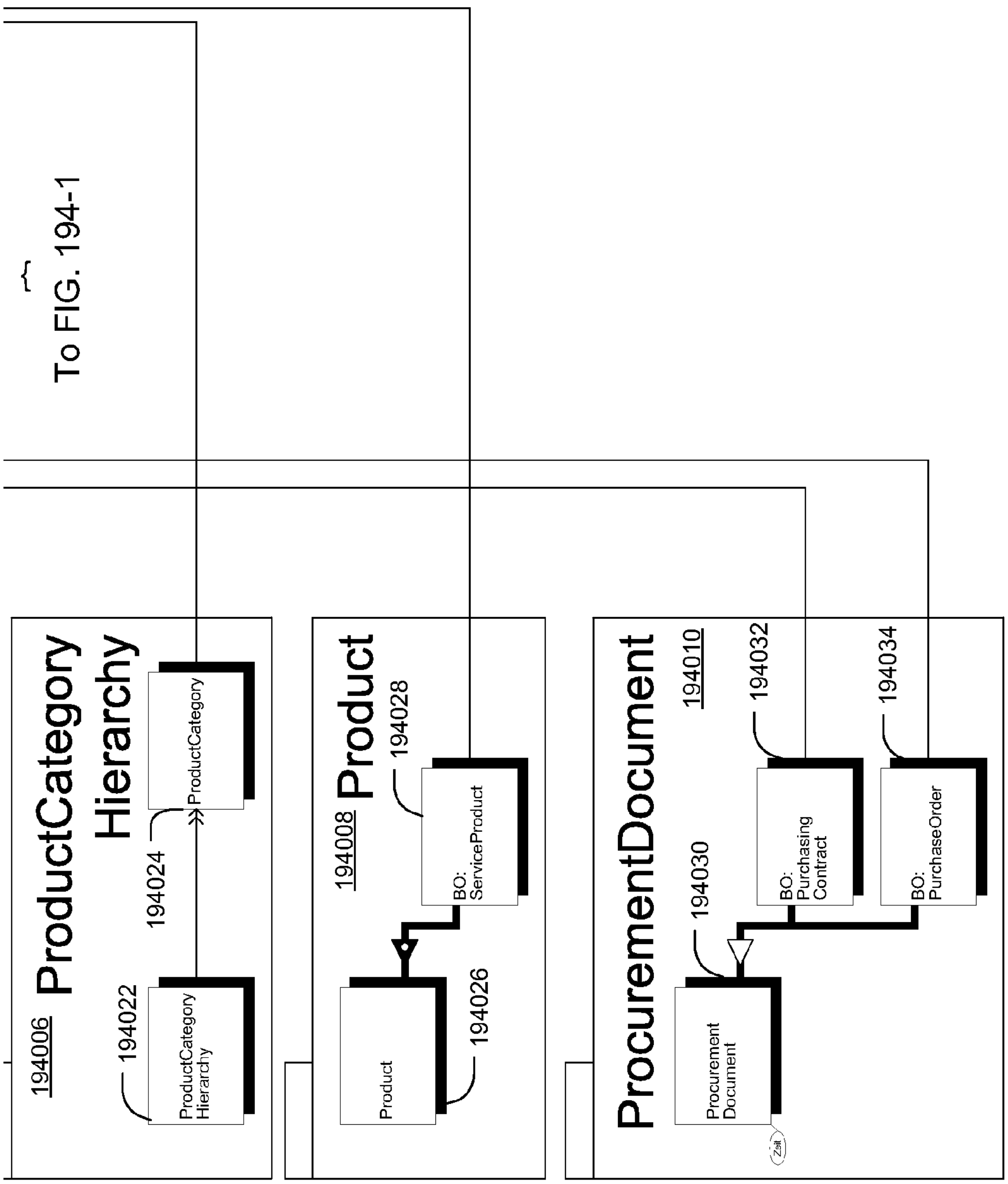
Figure 195:
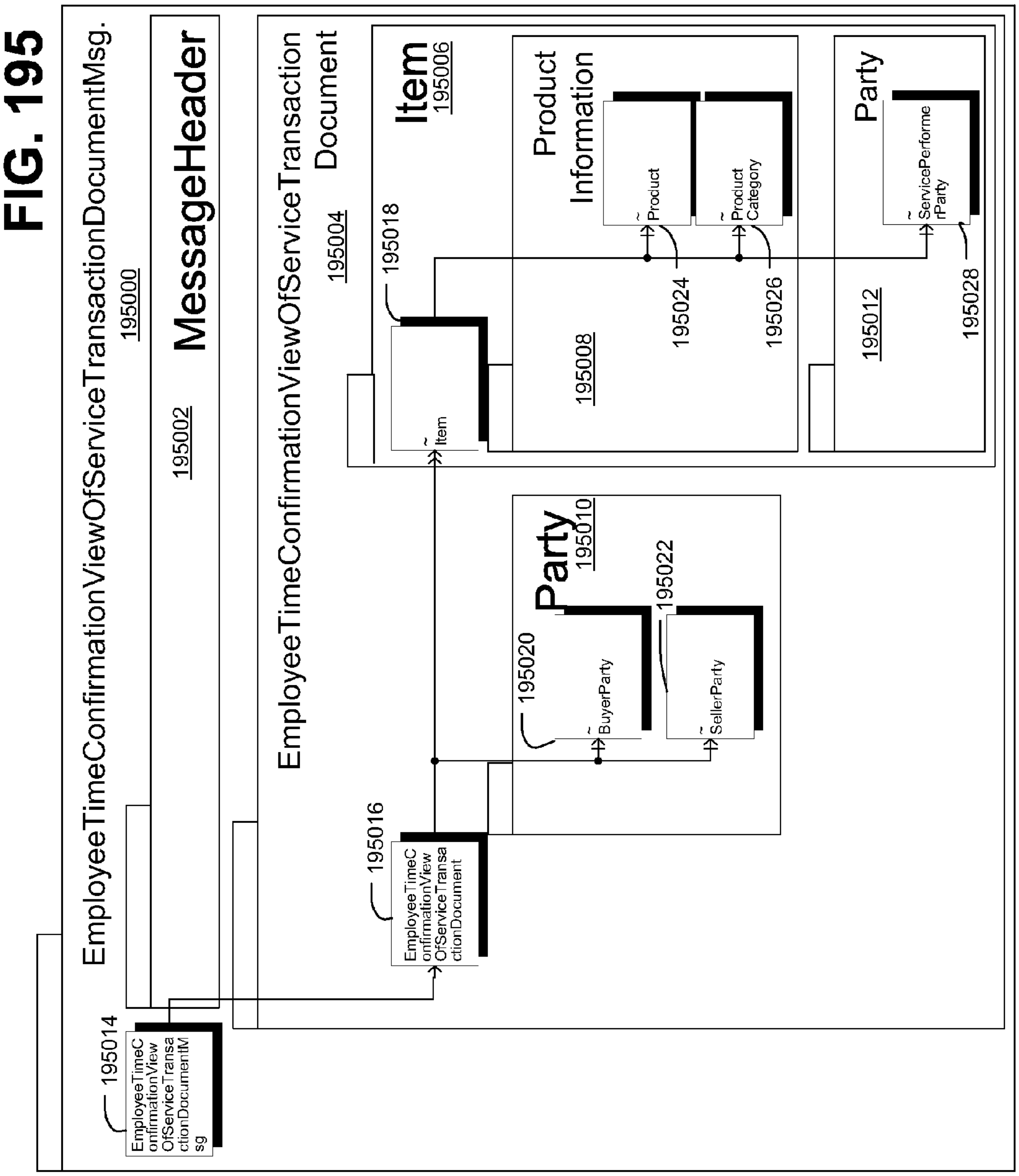
Figures 1, 197:
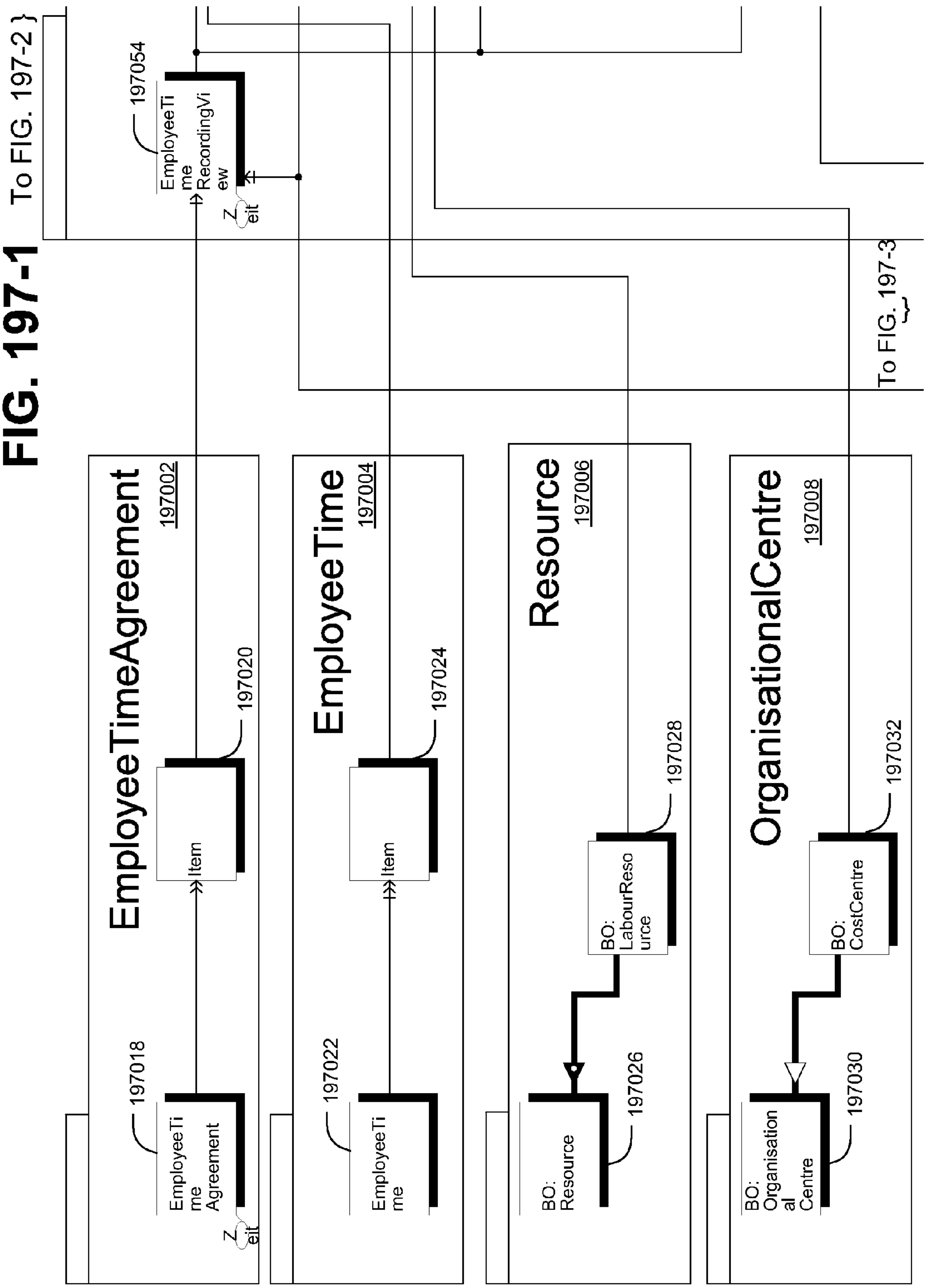
Figures 2, 197:
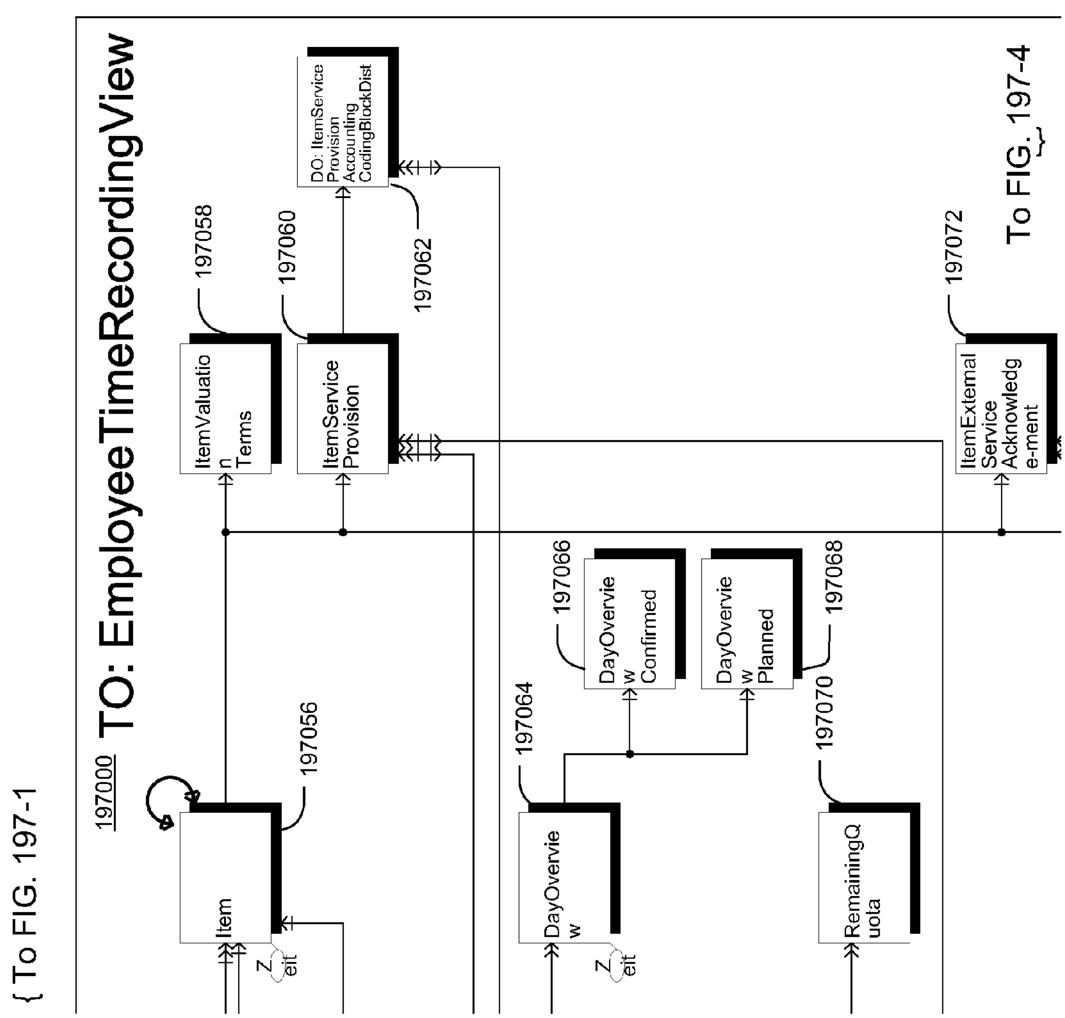
Figures 3, 197:
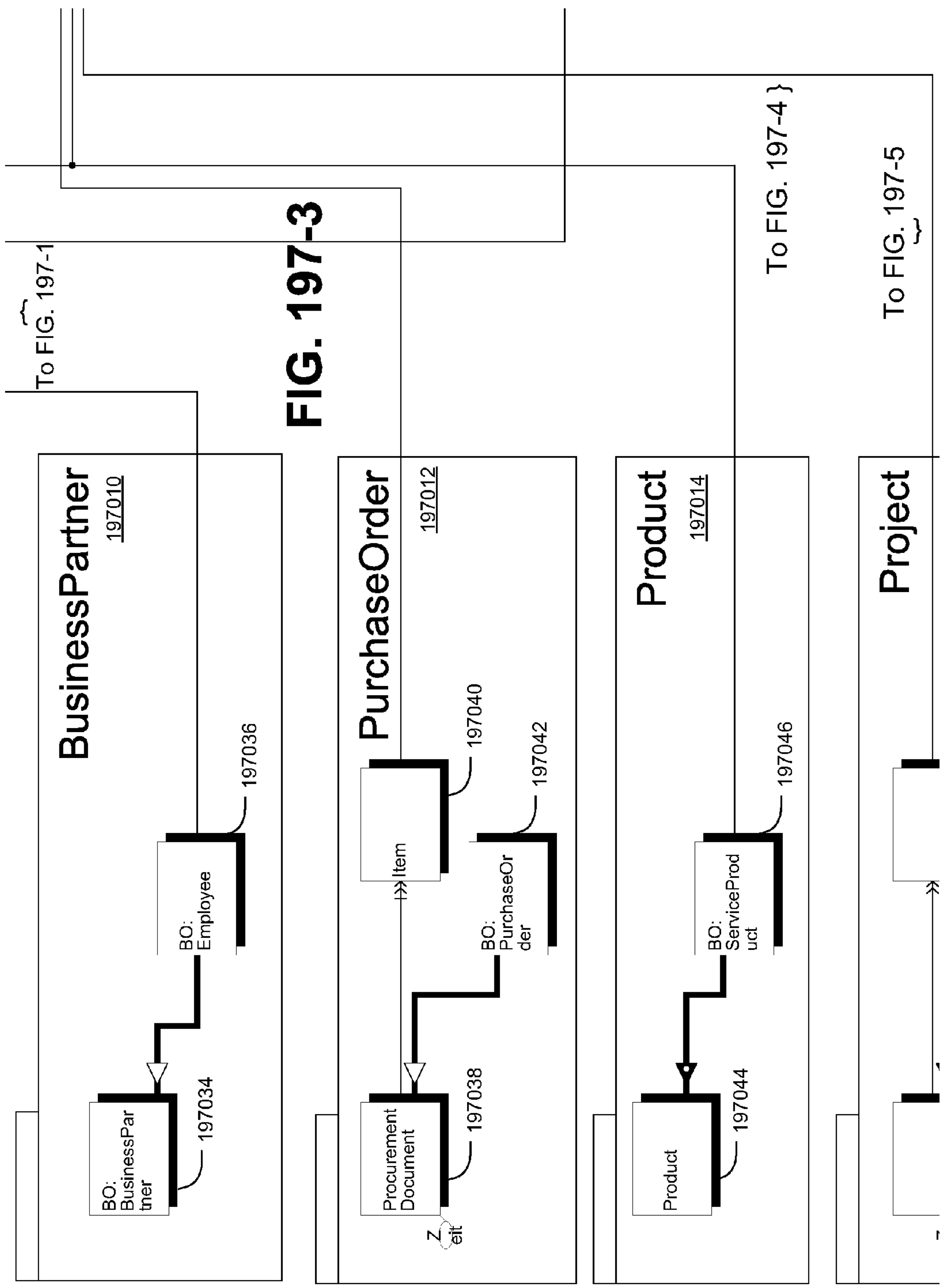
Figures 4, 197:
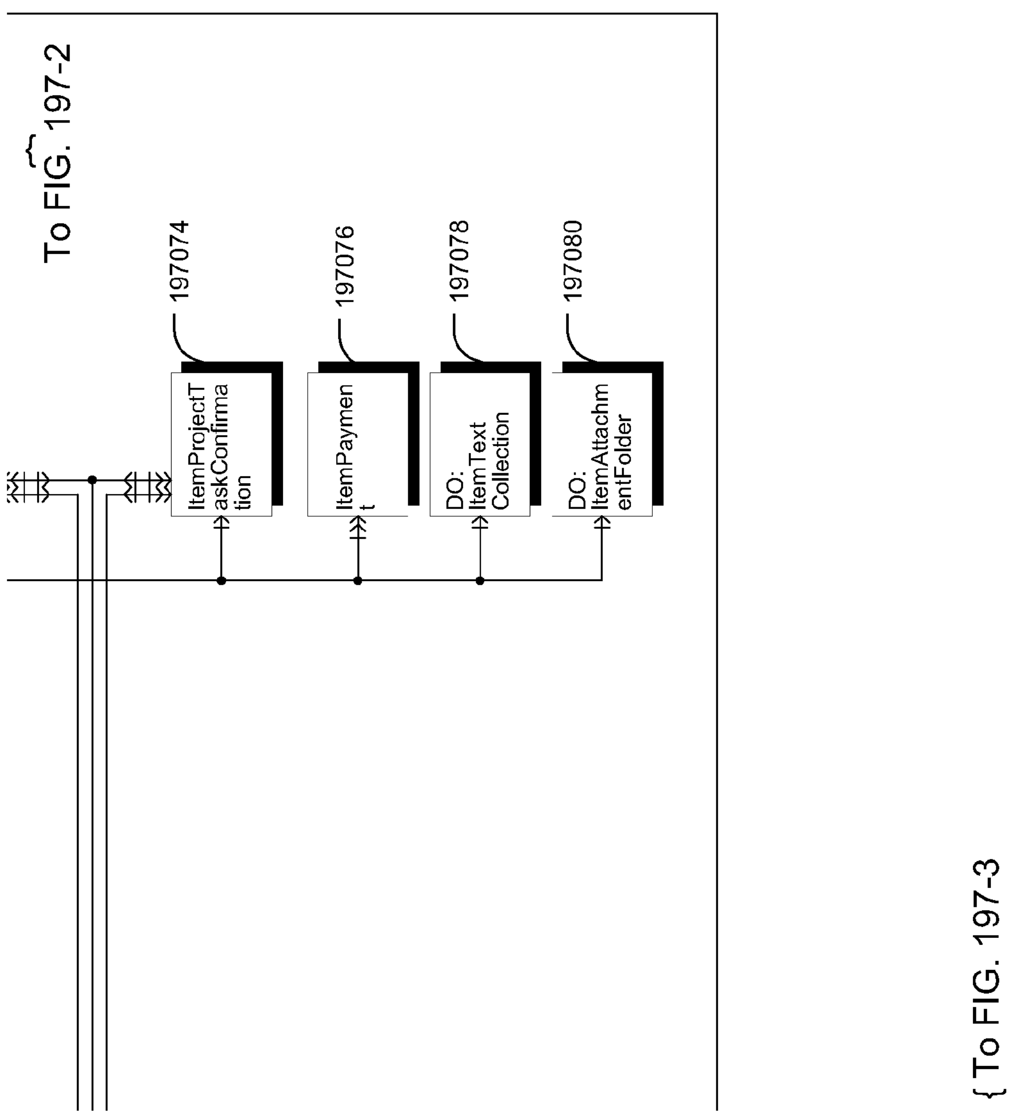
Figures 5, 197:
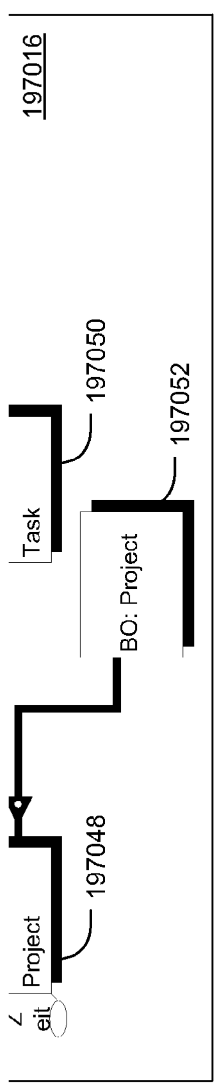
Figure 198:
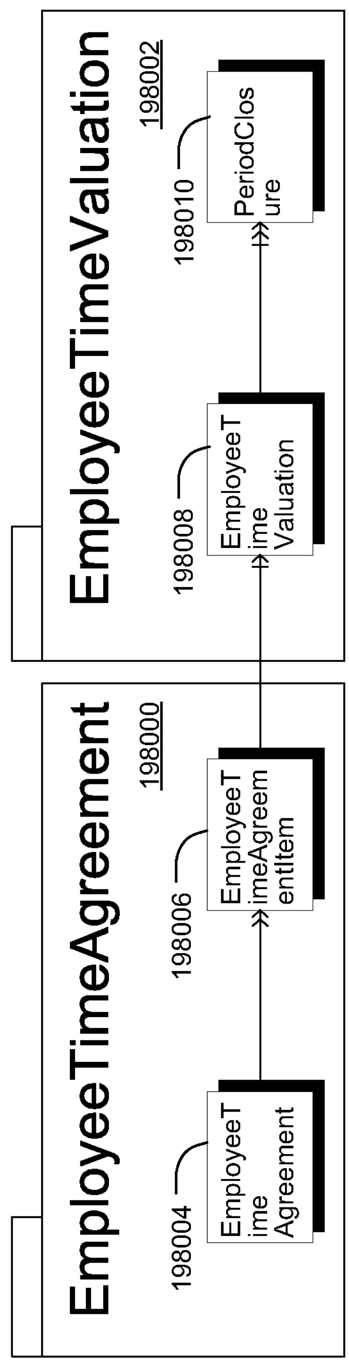
Figure 199:
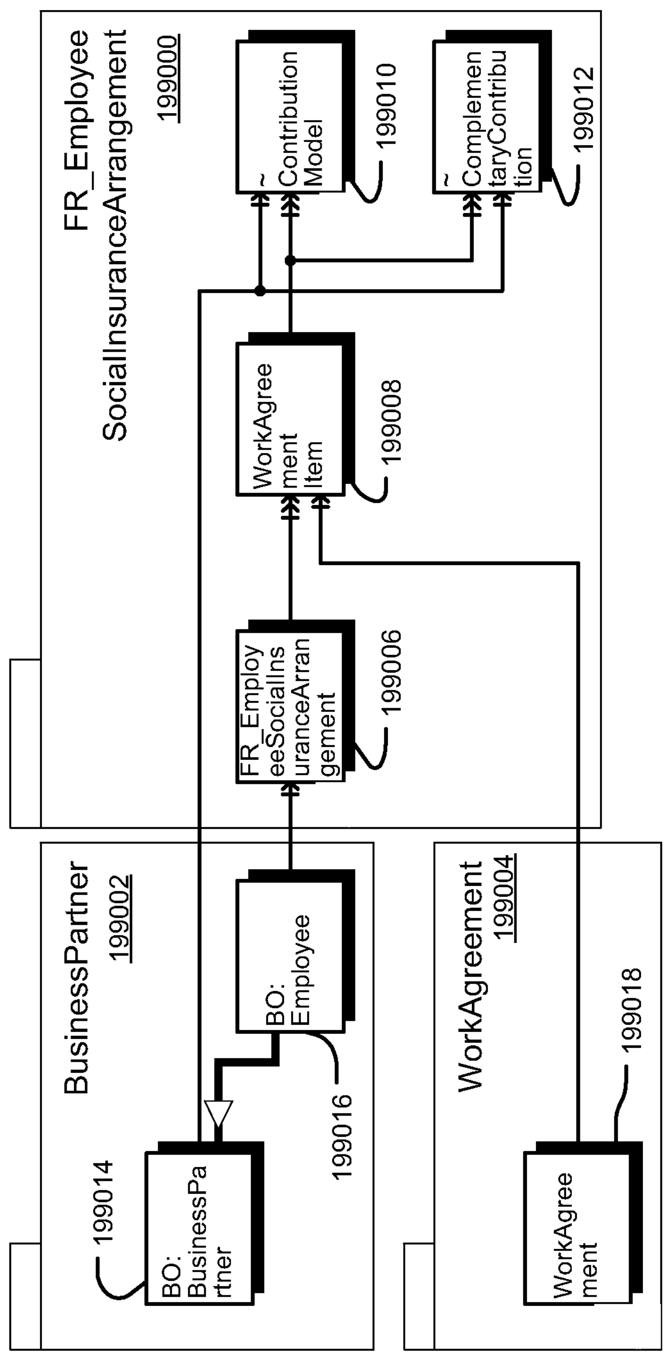
Figure 200:
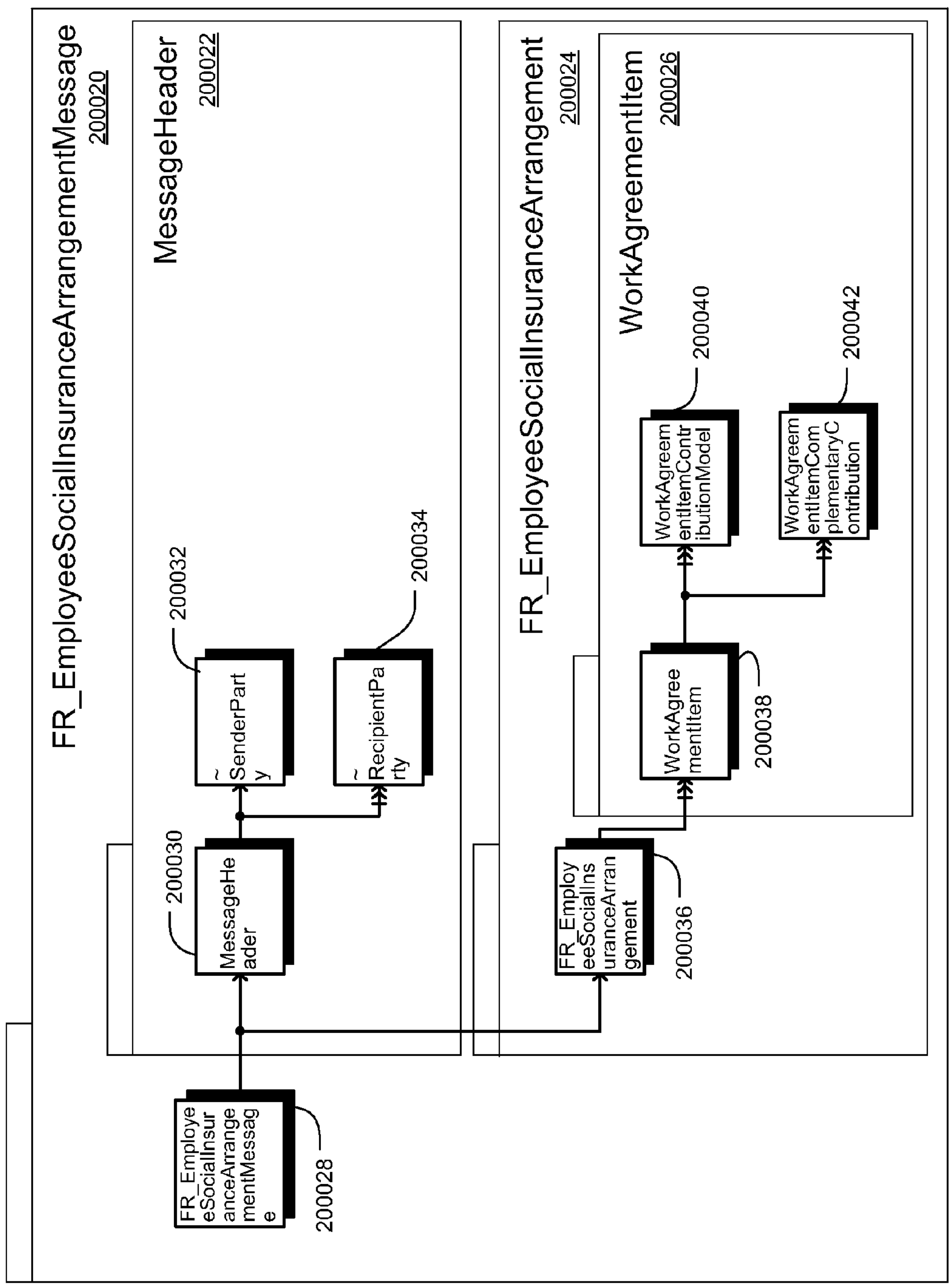
Figure 202:
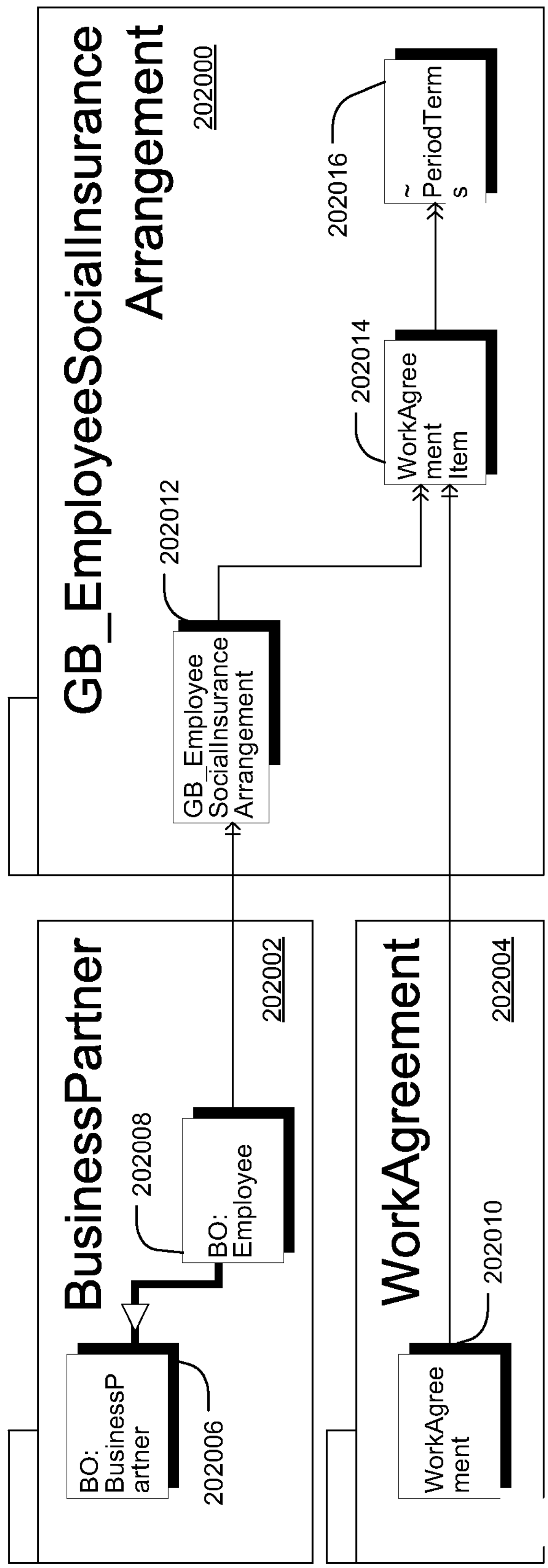
Figure 203:
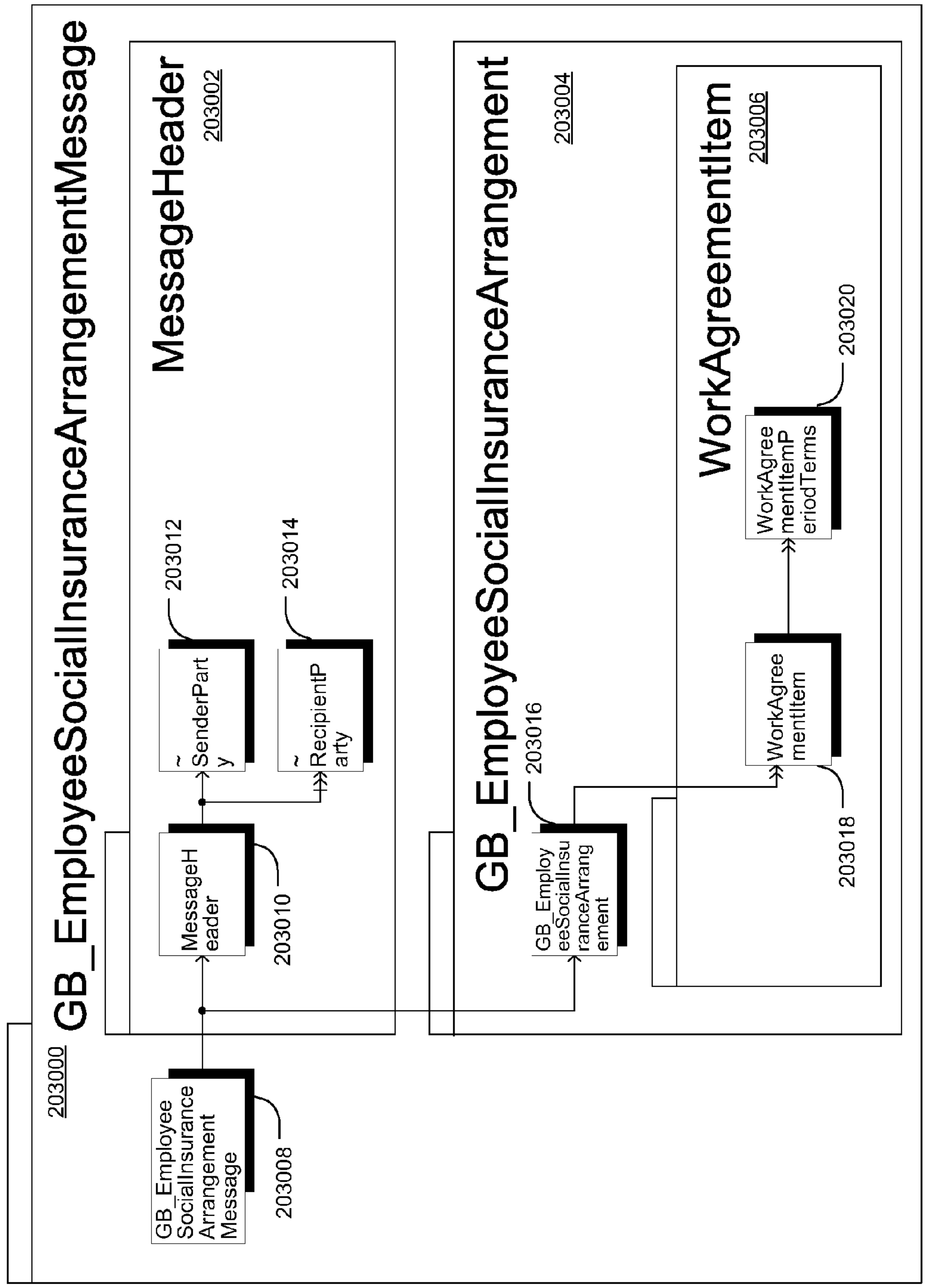
Figure 205:
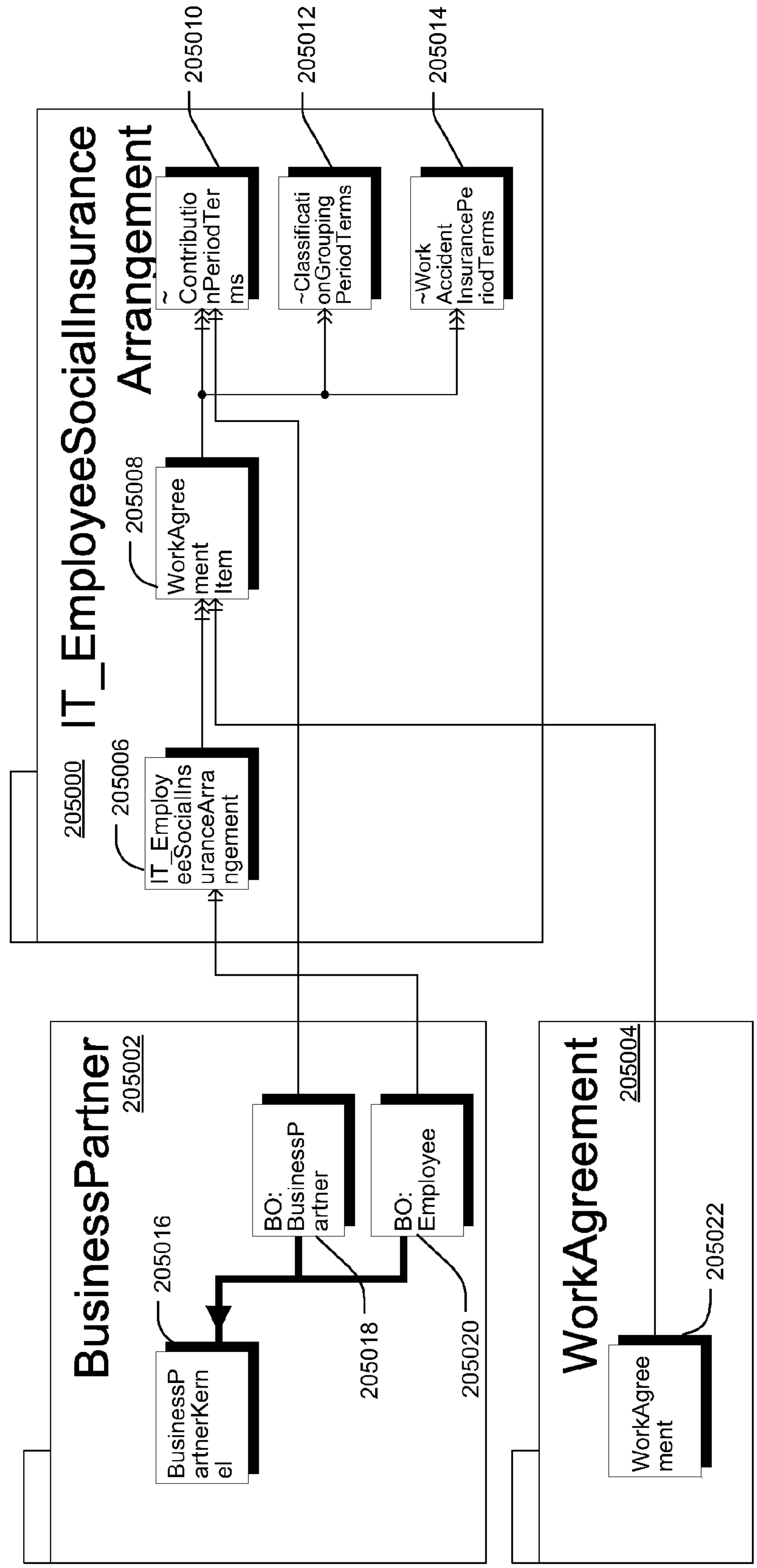
Figure 206:
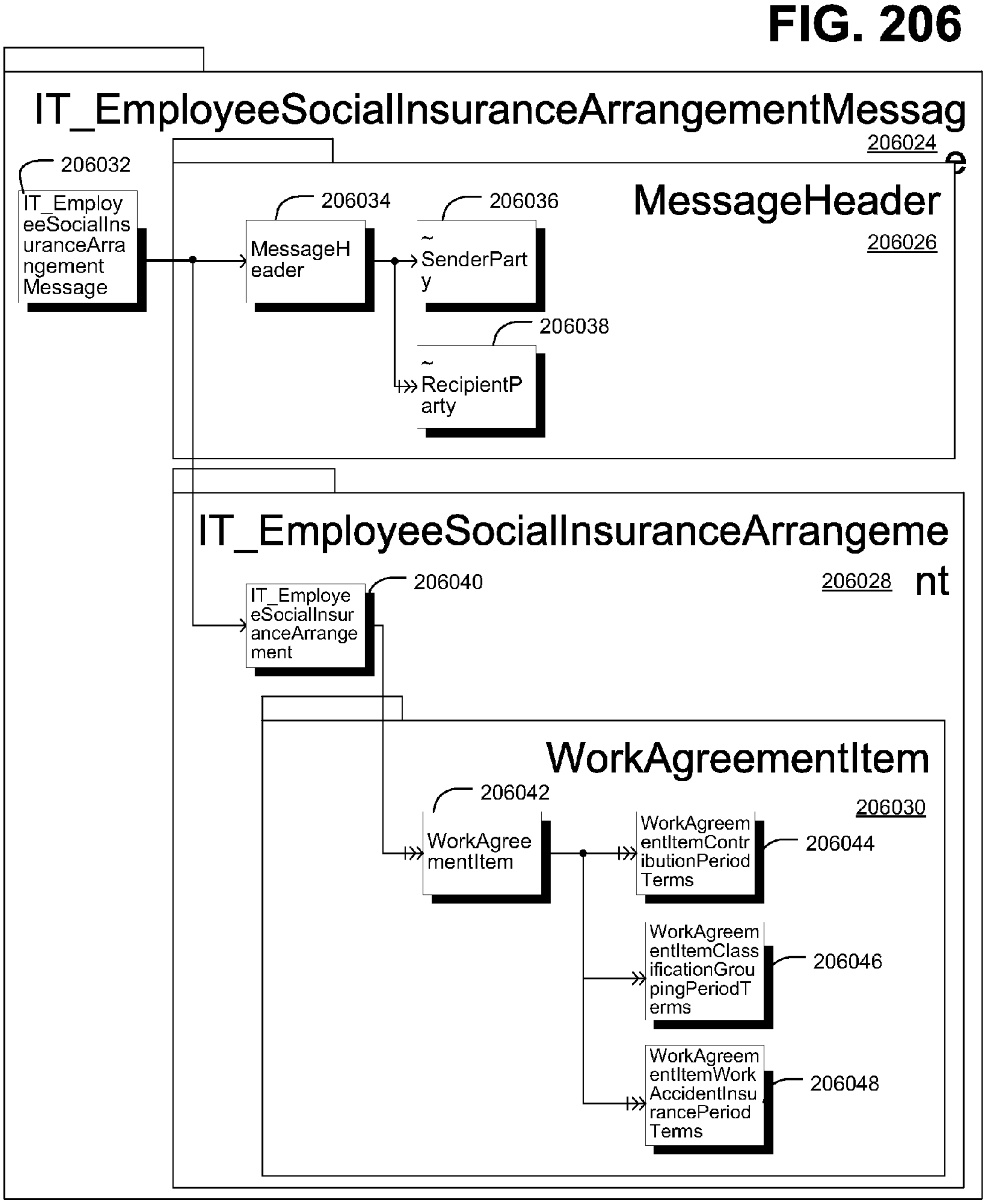
Figure 208:
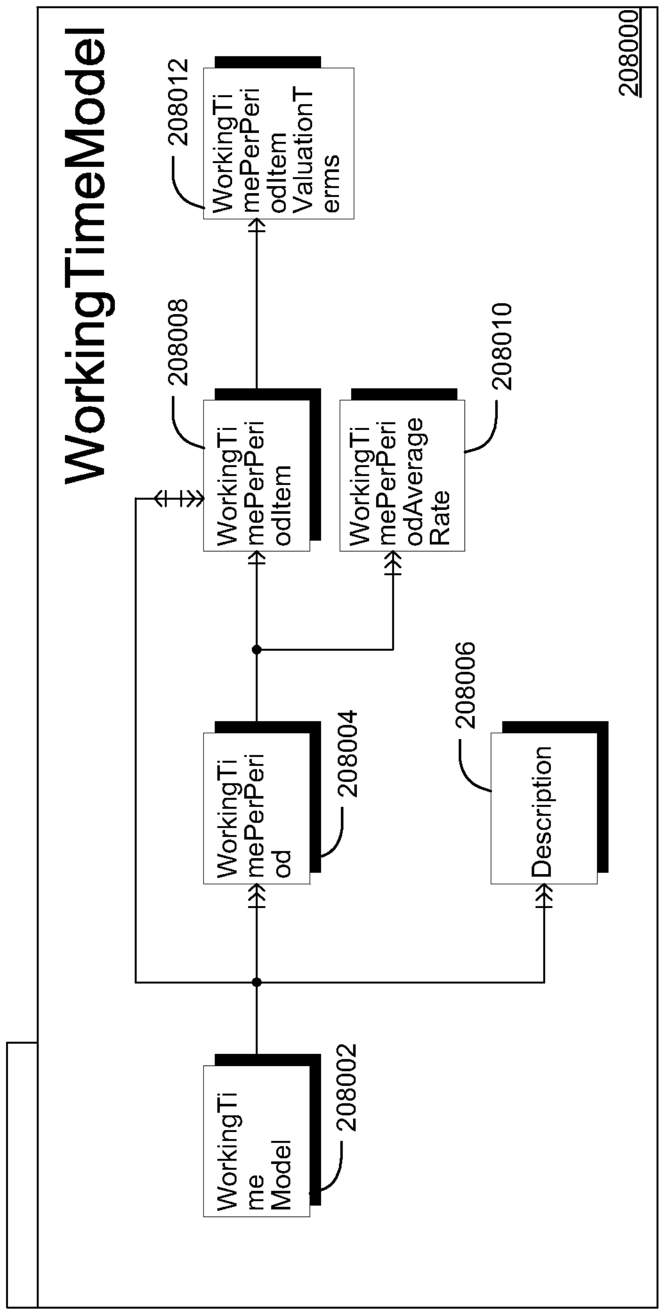
Figure 209:
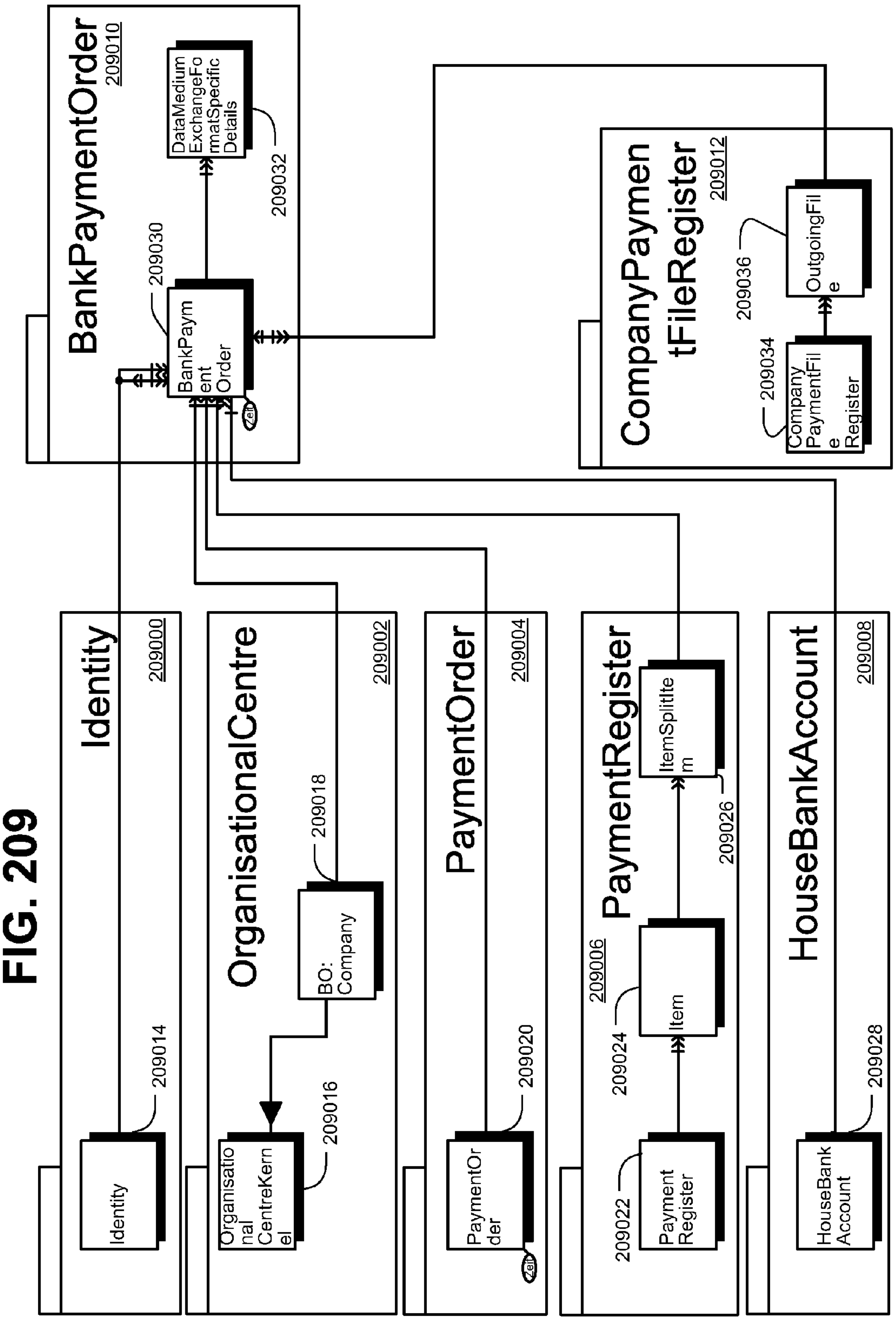
Figures 1, 210:
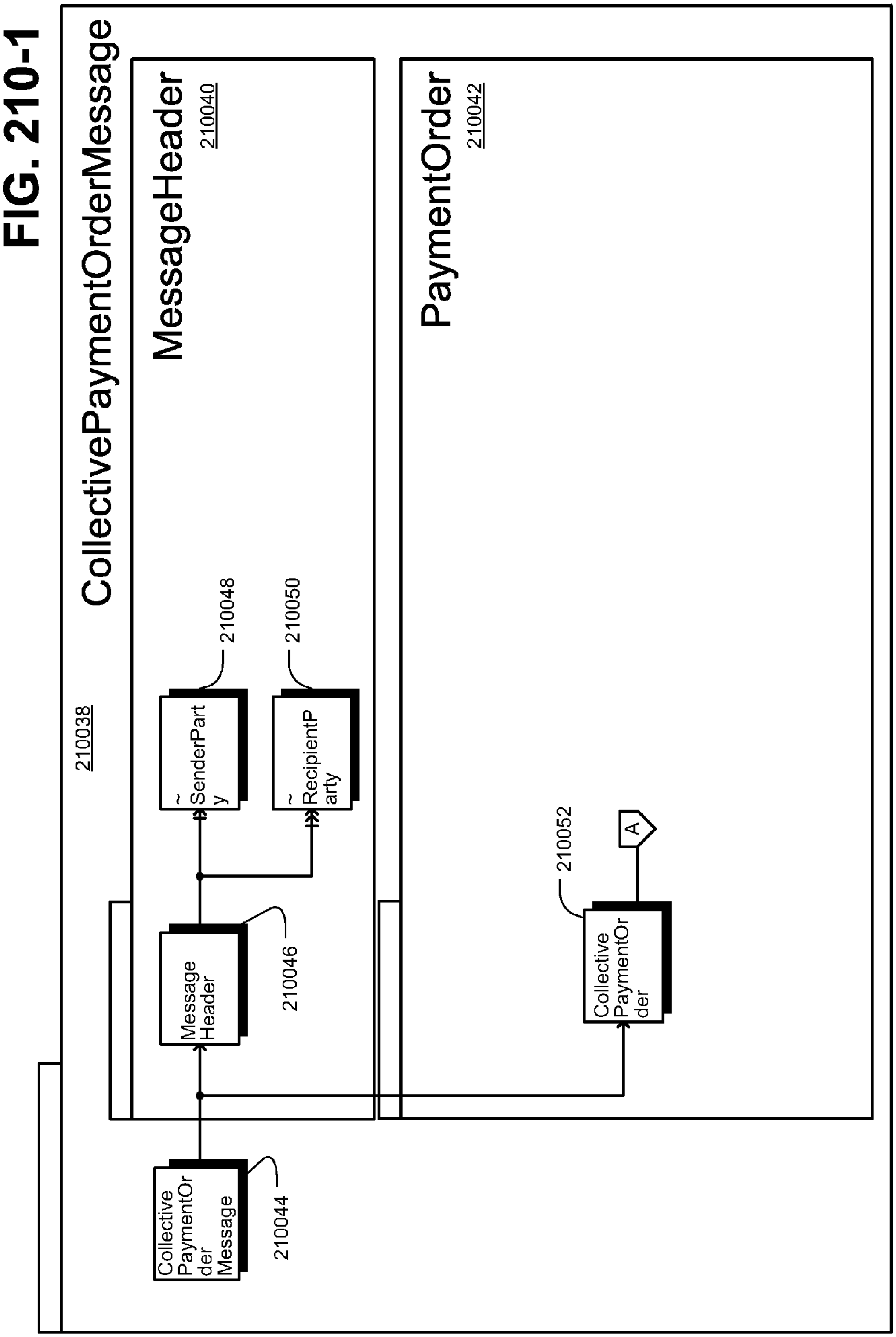
Figures 2, 210:
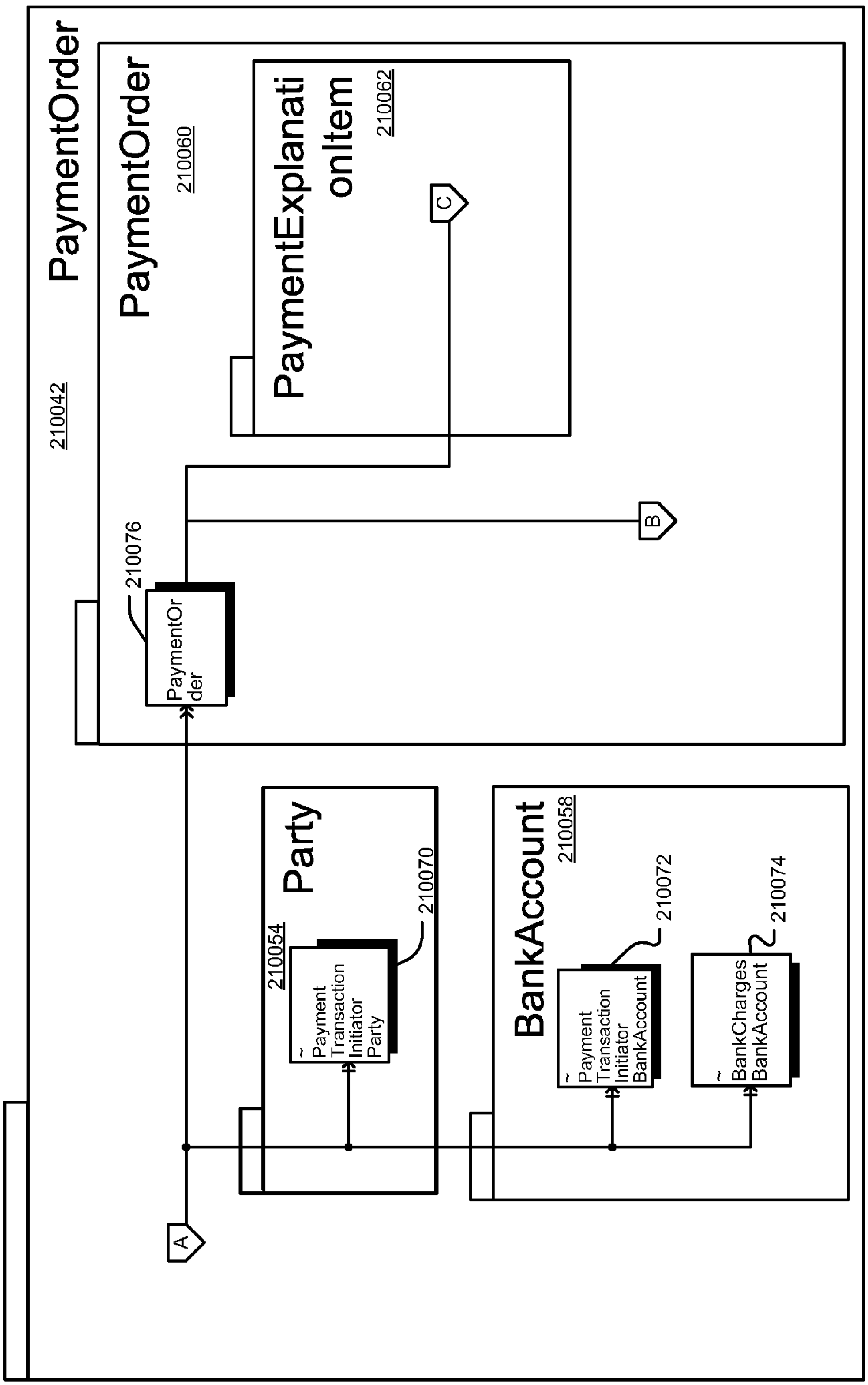
Figures 3, 210:
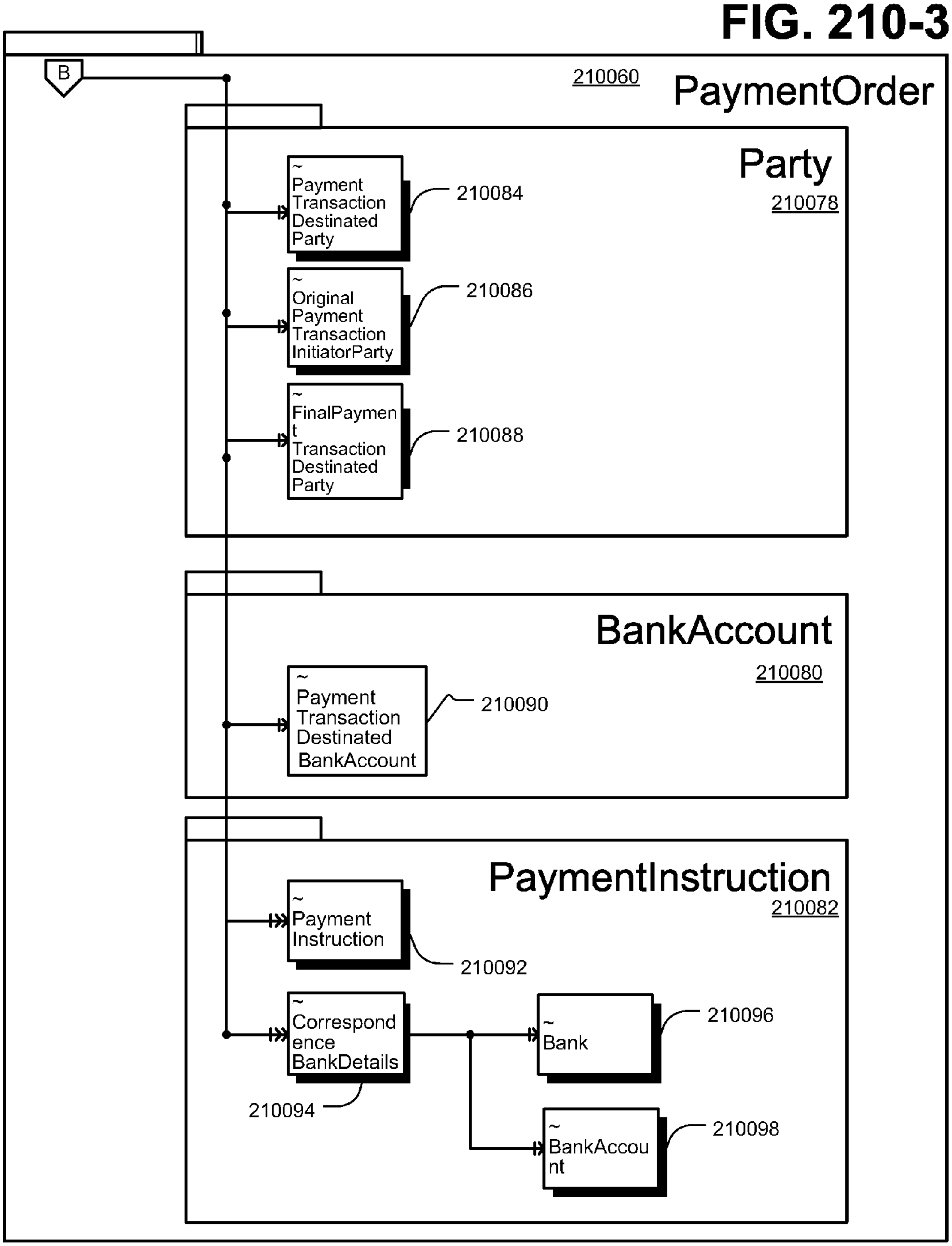
Figures 4, 210:
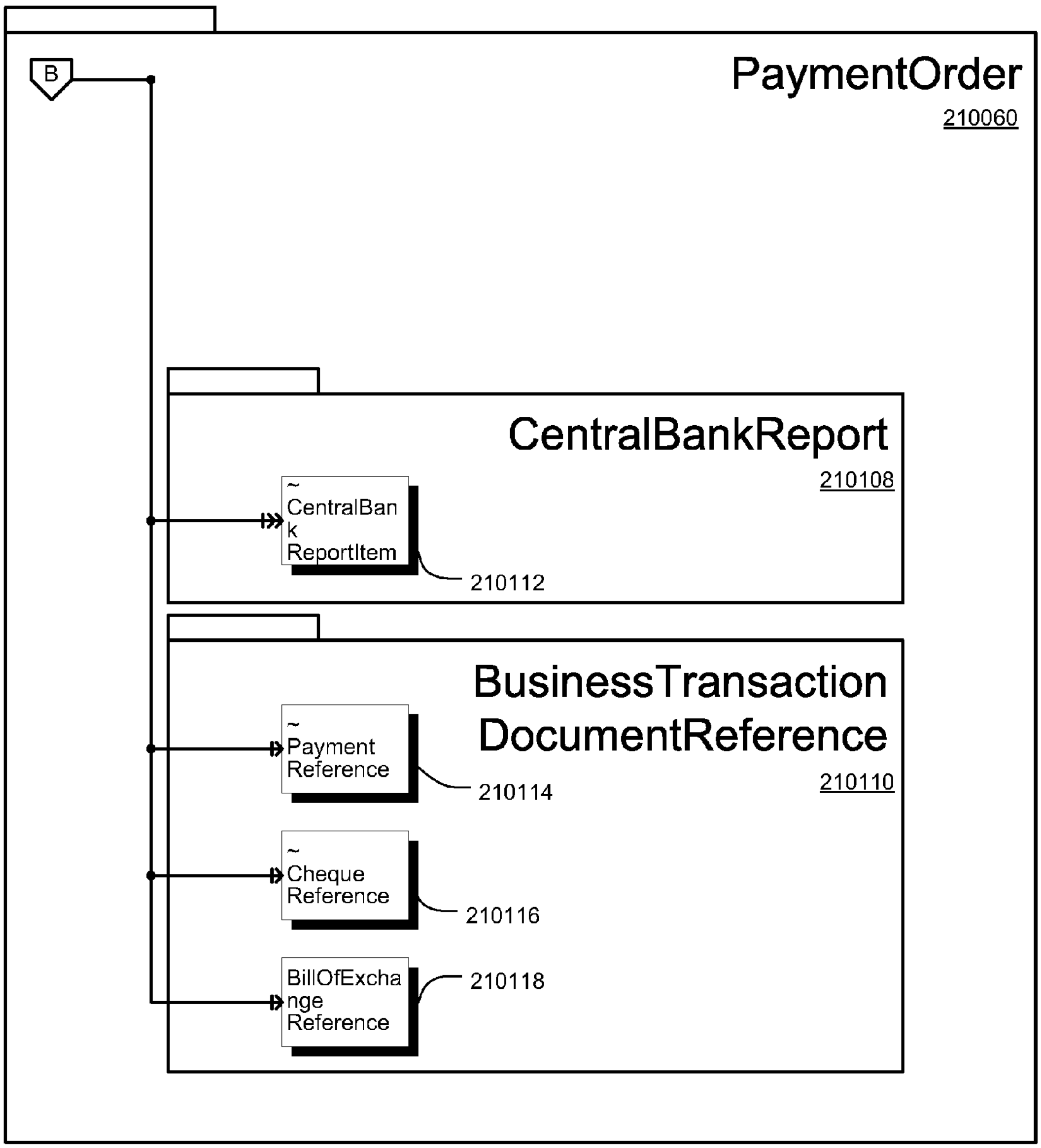
Figures 5, 210:
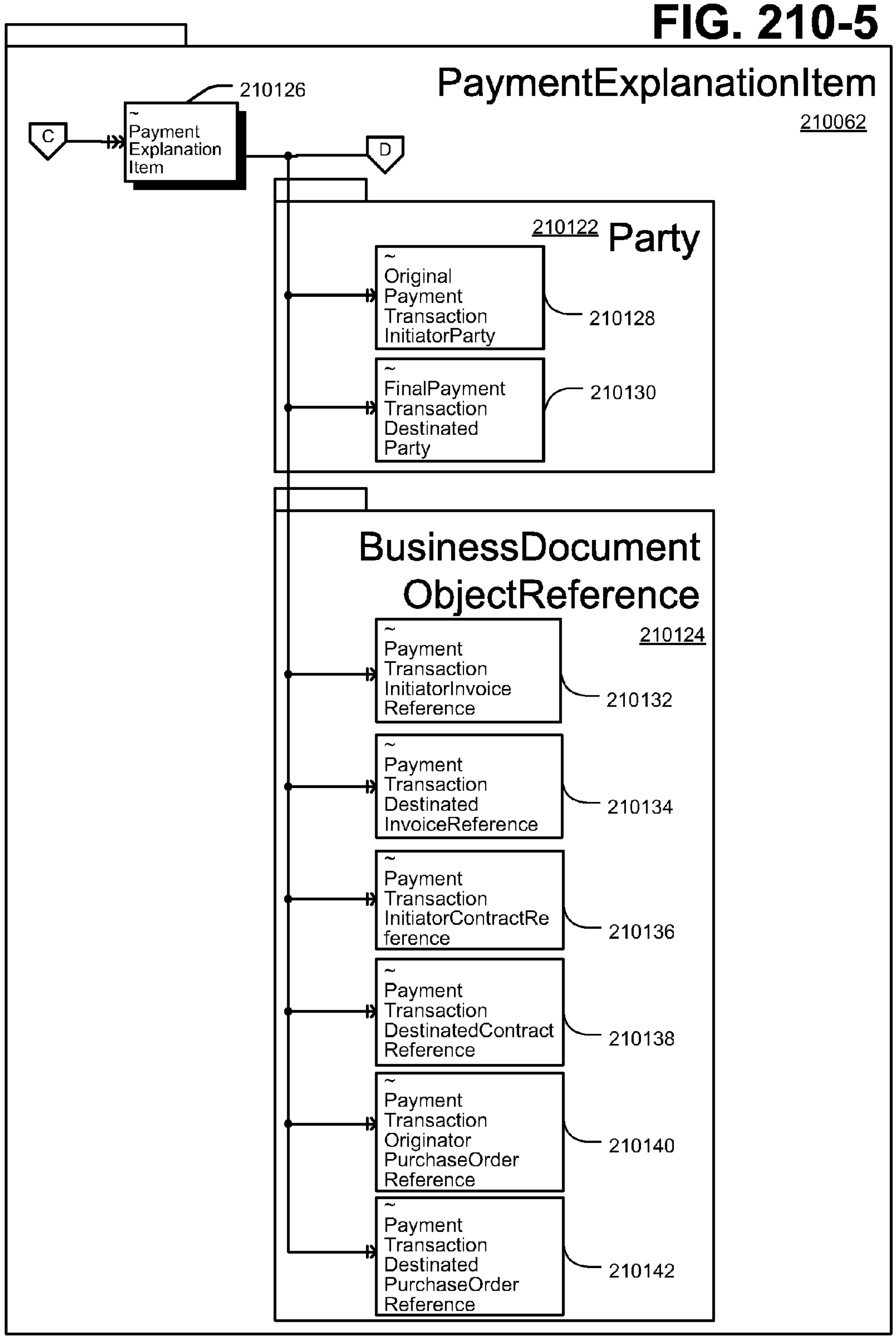
Figures 6, 210:
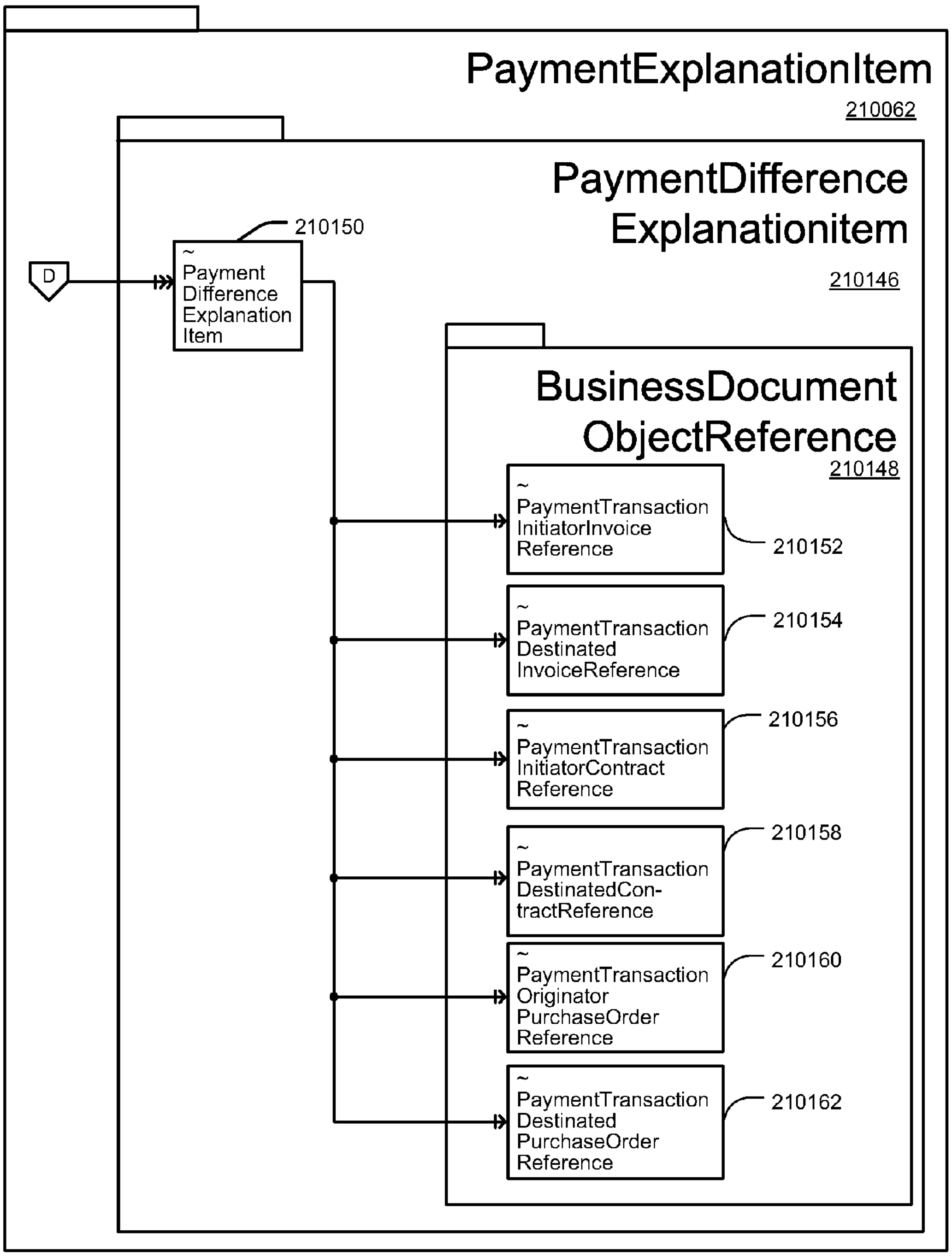
Figure 212:
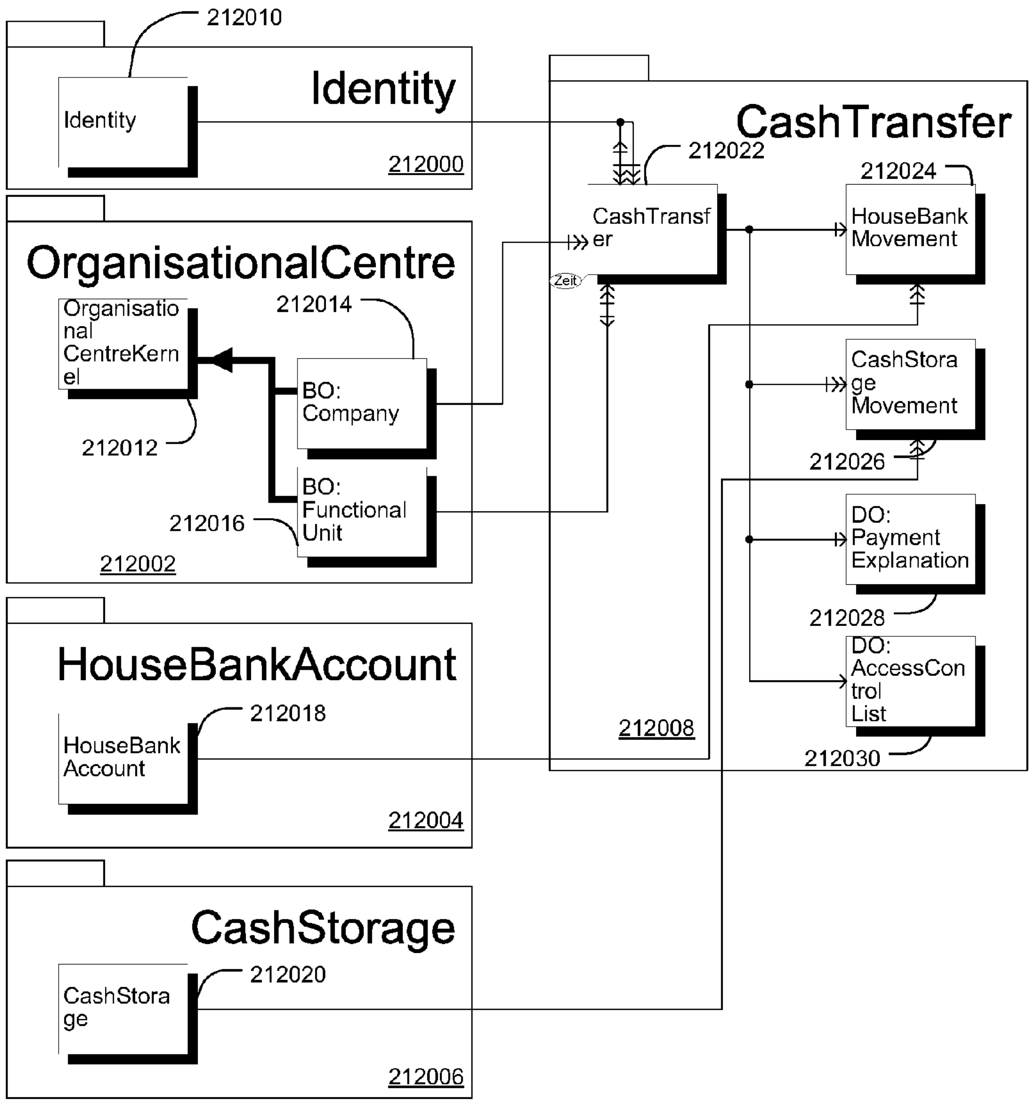
Figure 213:
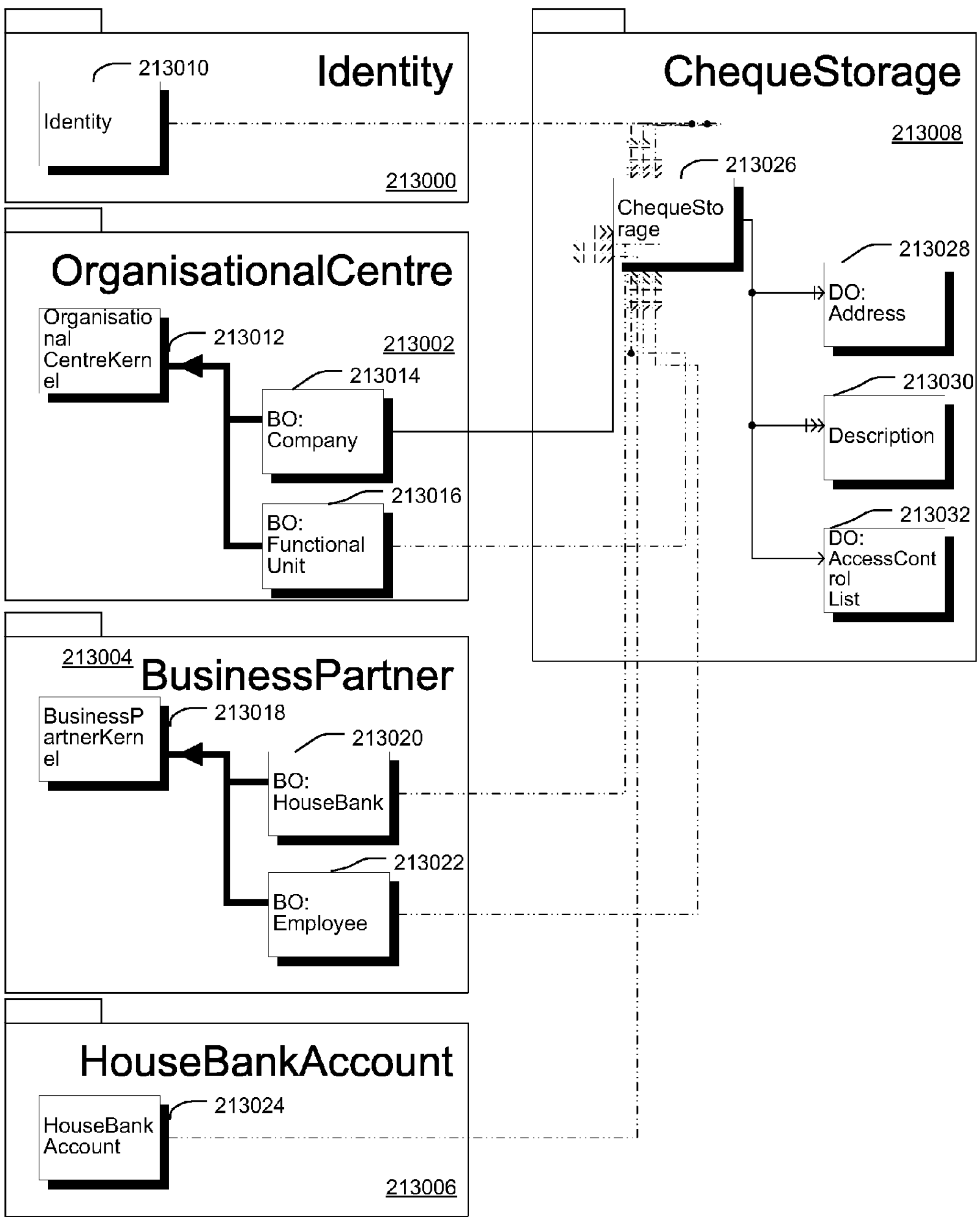
Figure 214:
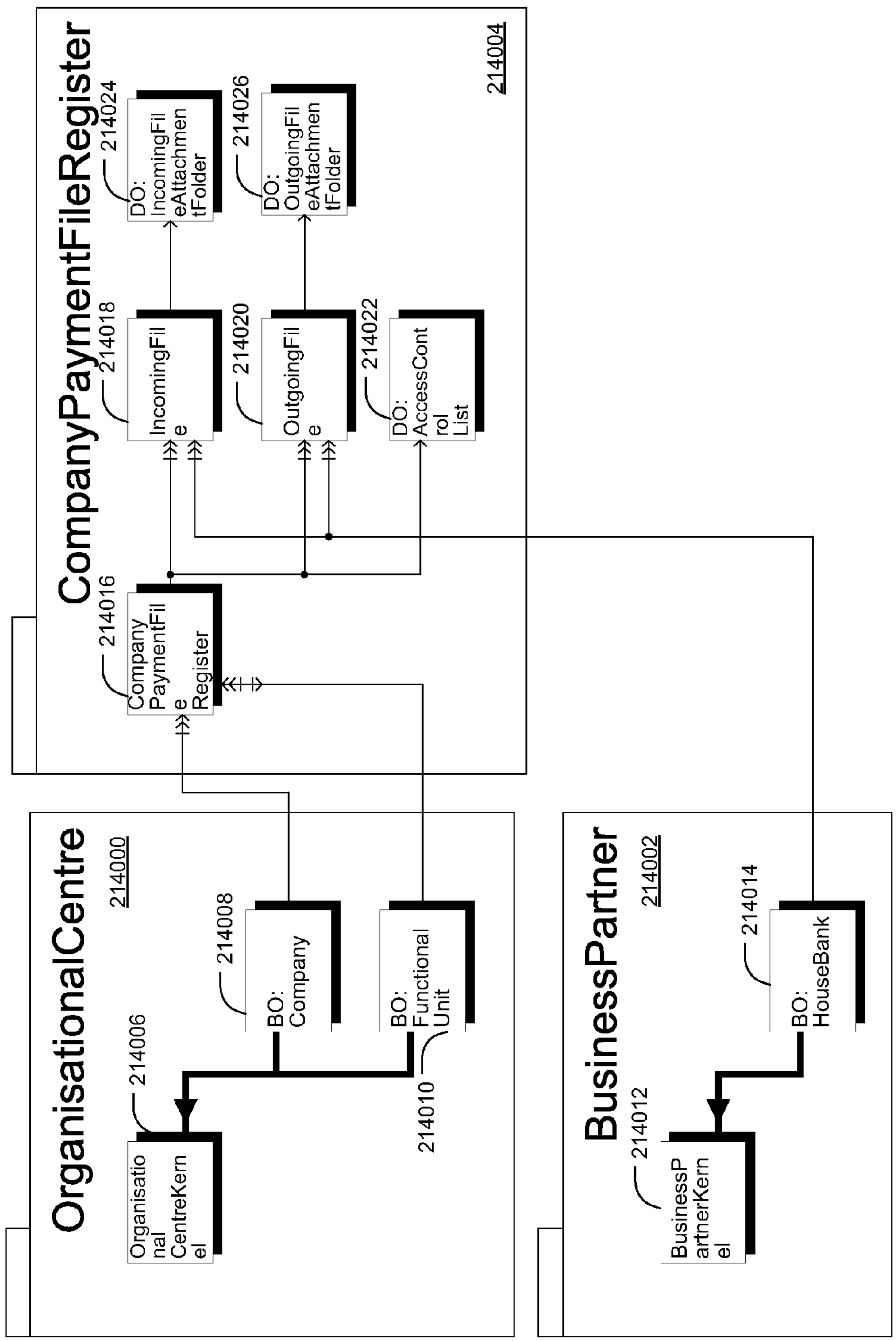
Figure 215:
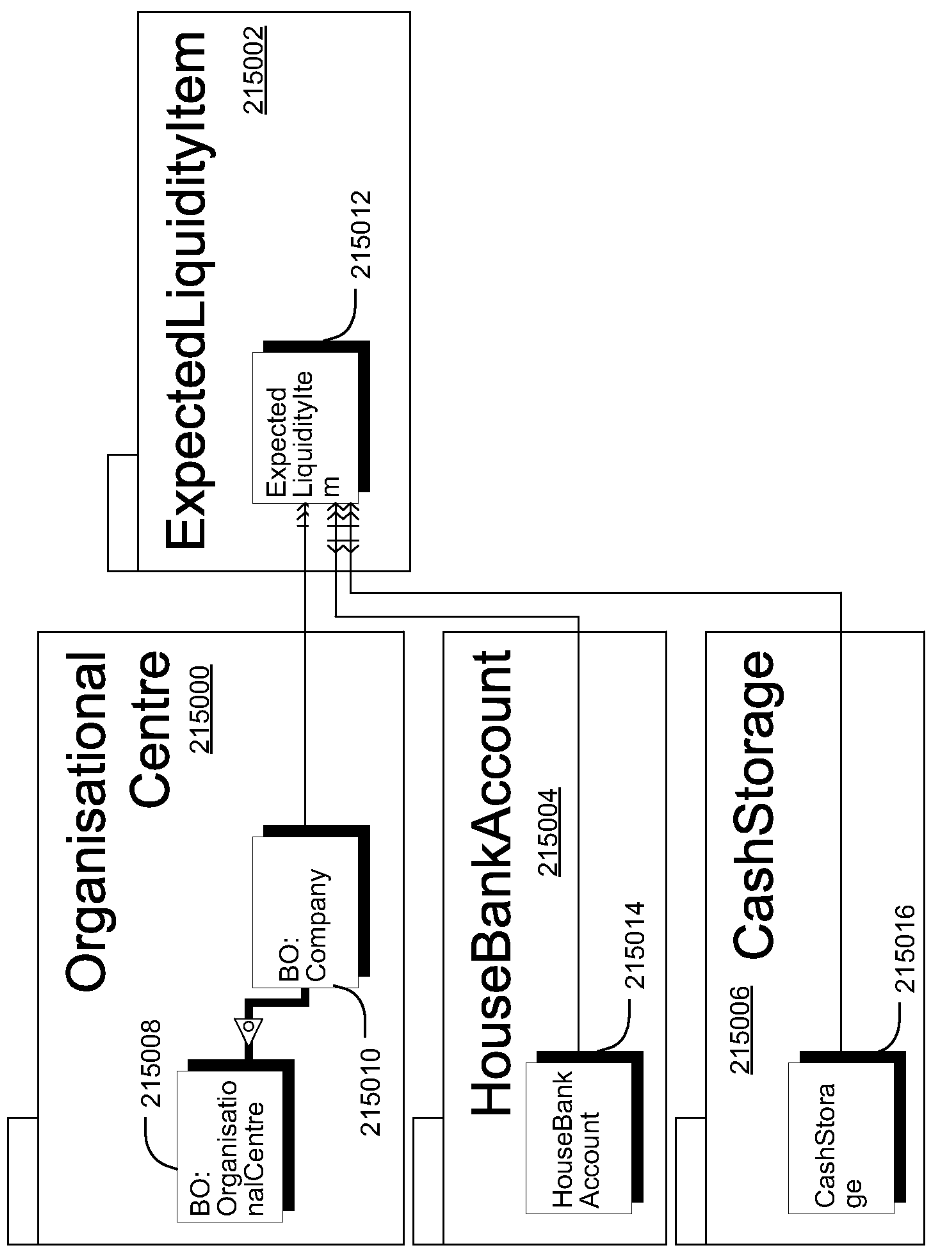
Figure 216:
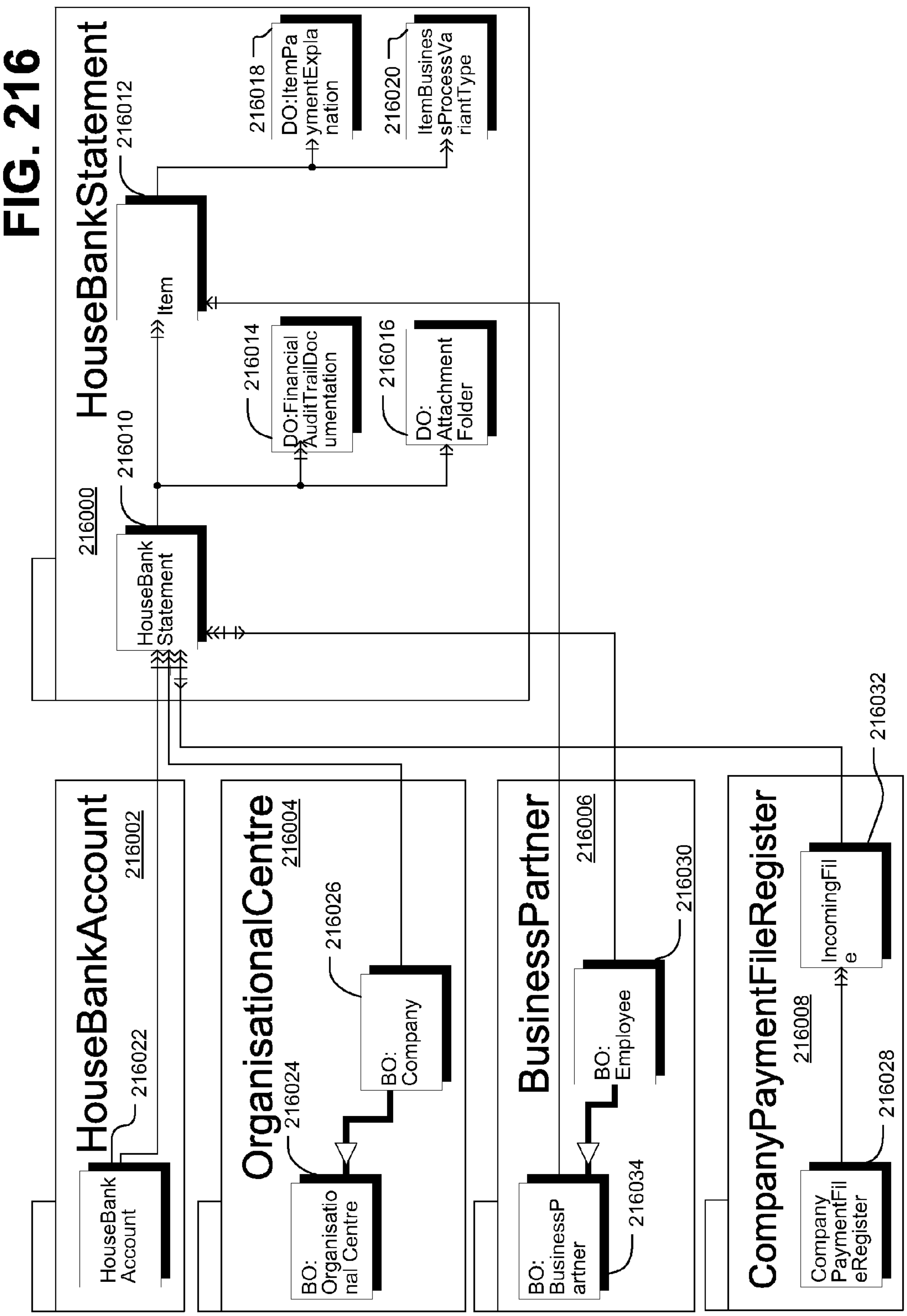
Figures 1, 217:
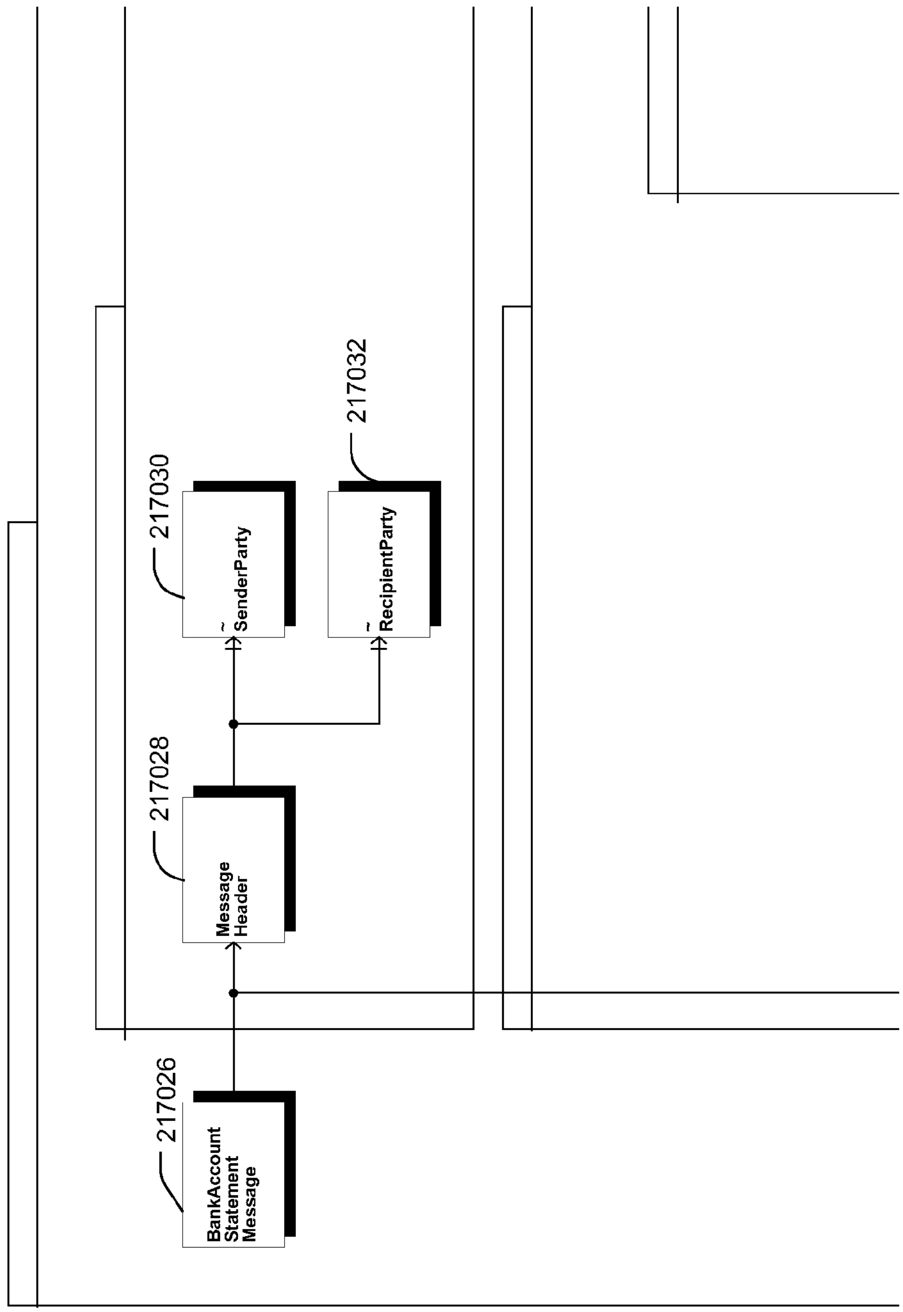
Figures 2, 217:
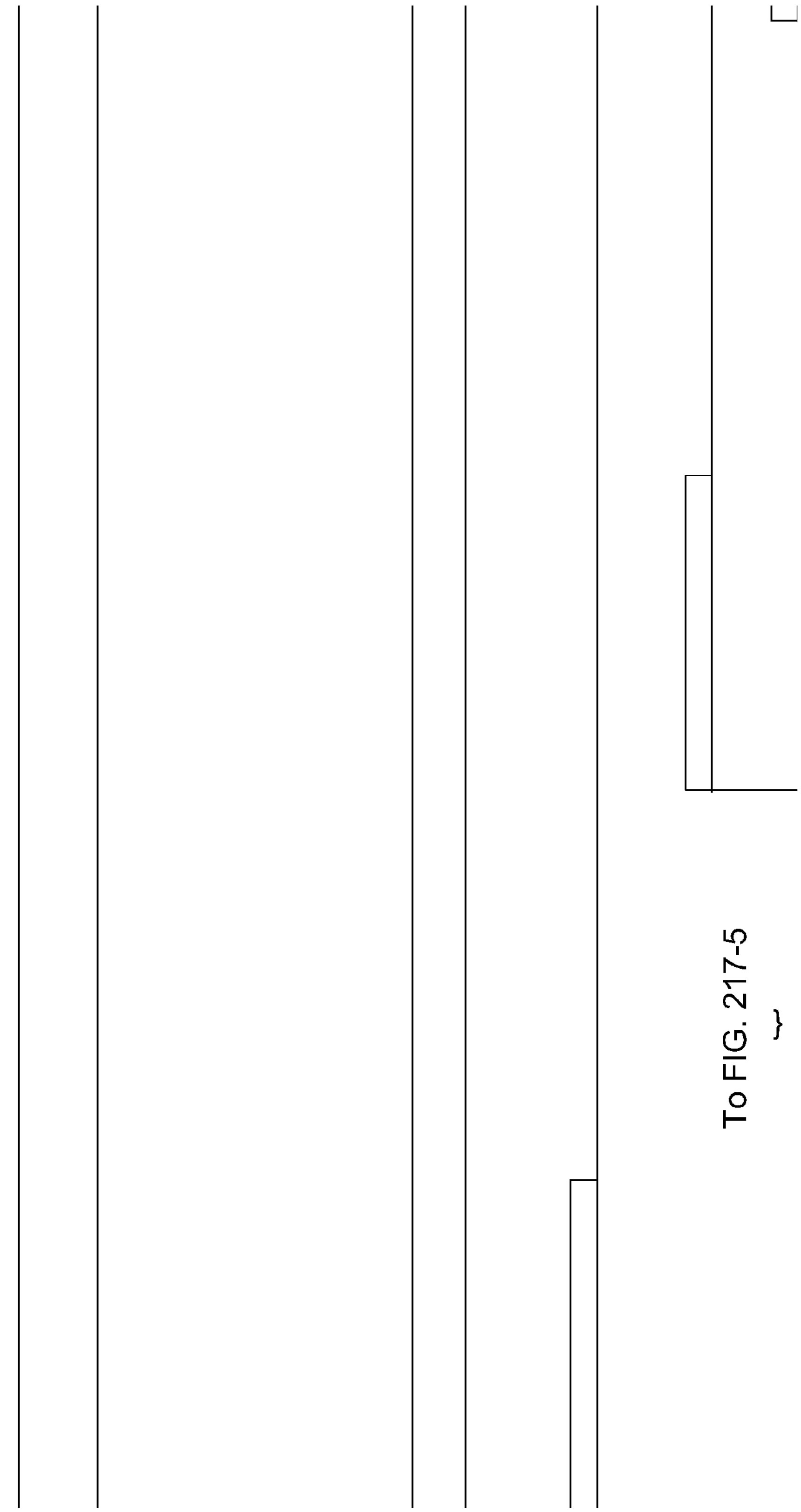
Figures 3, 217:
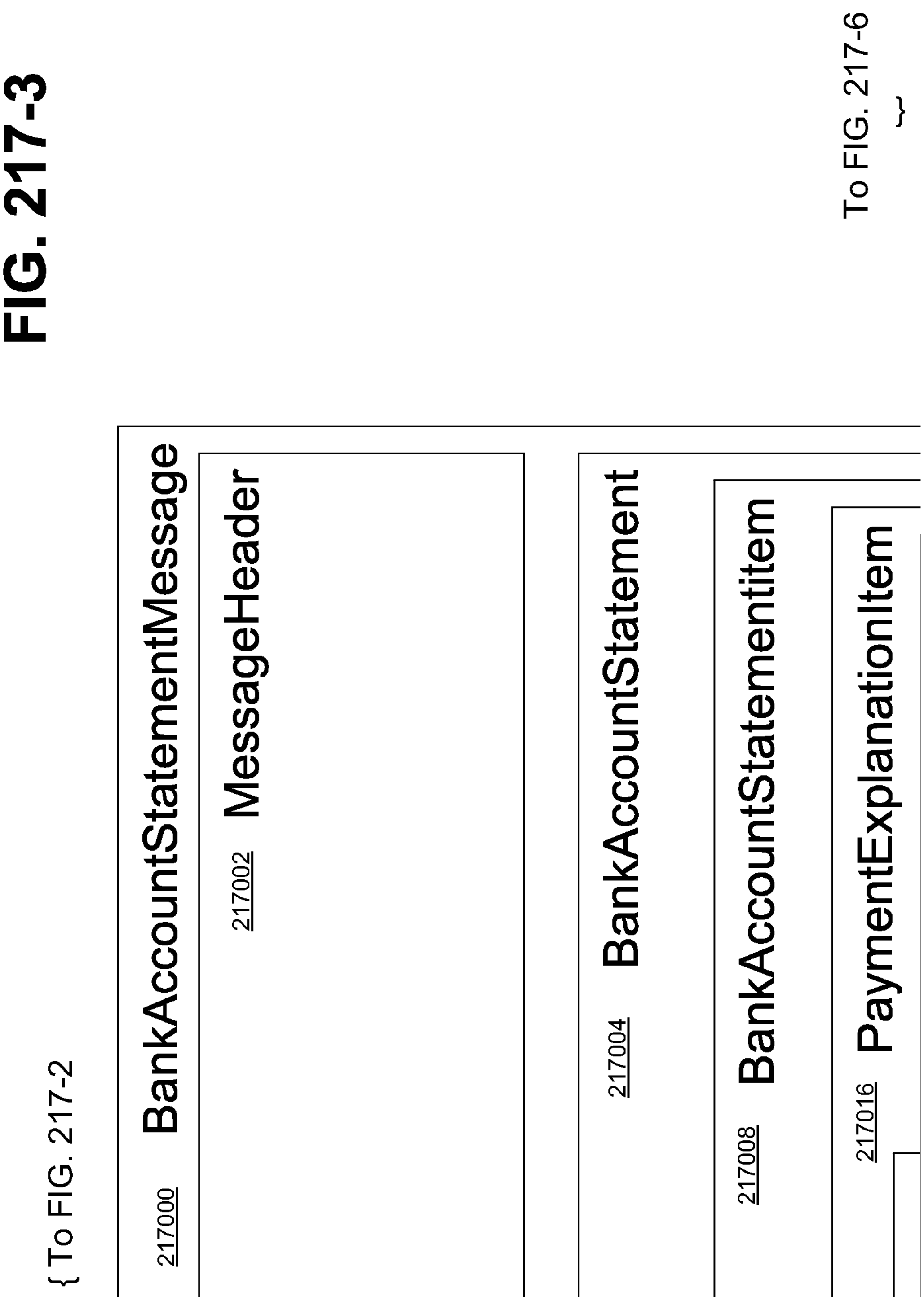
Figures 4, 217:
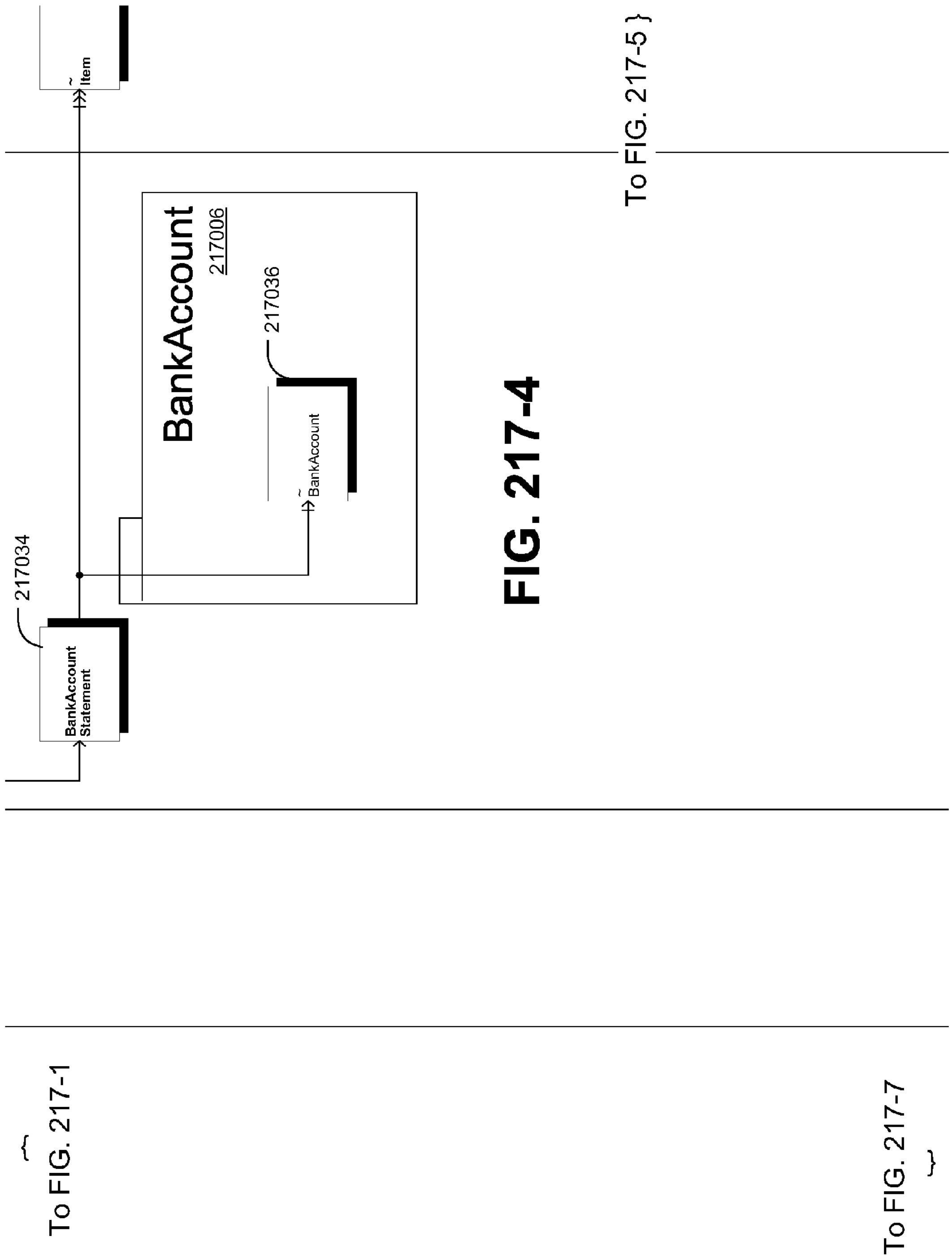
Figures 5, 217:
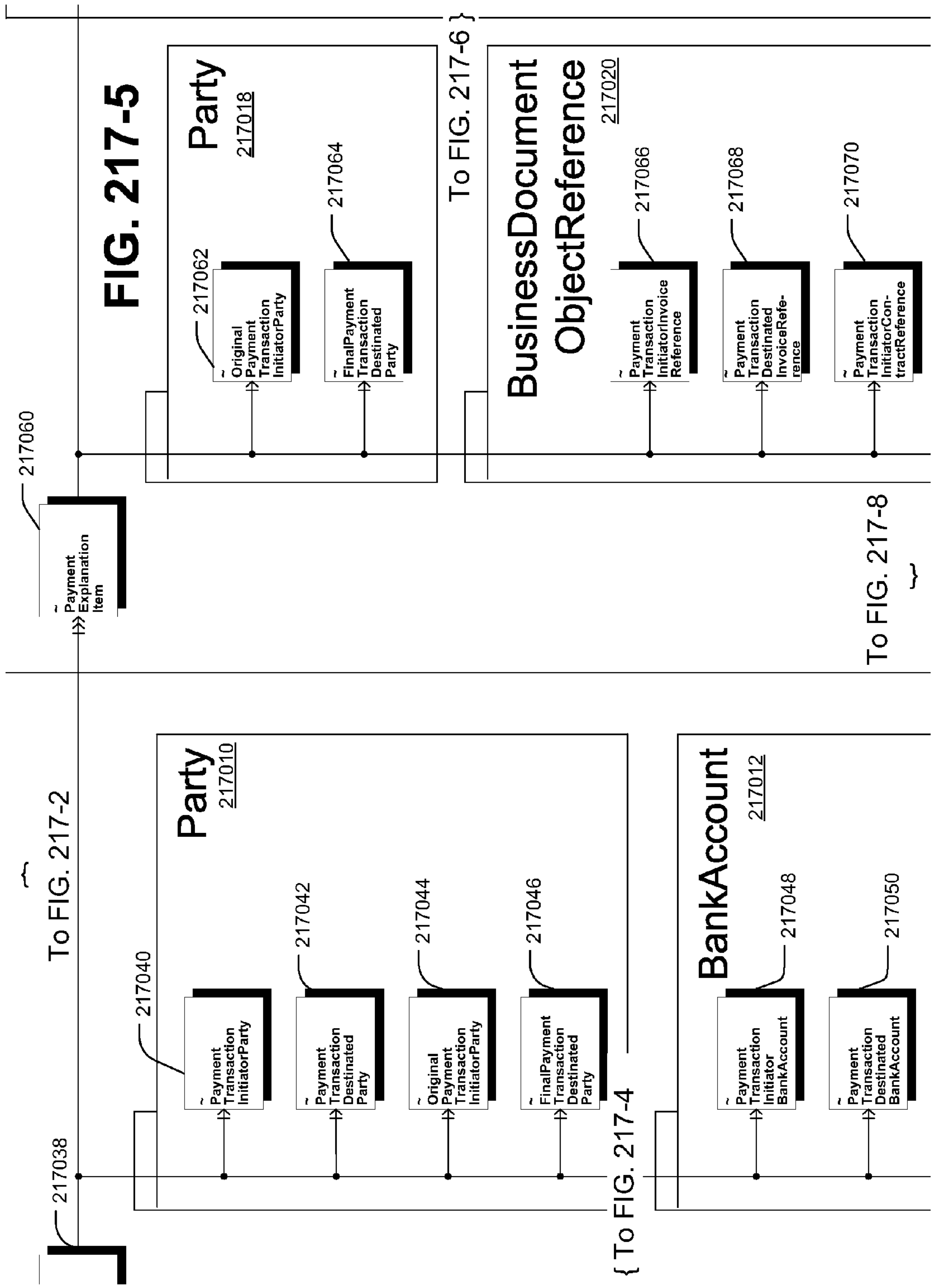
Figures 6, 217:
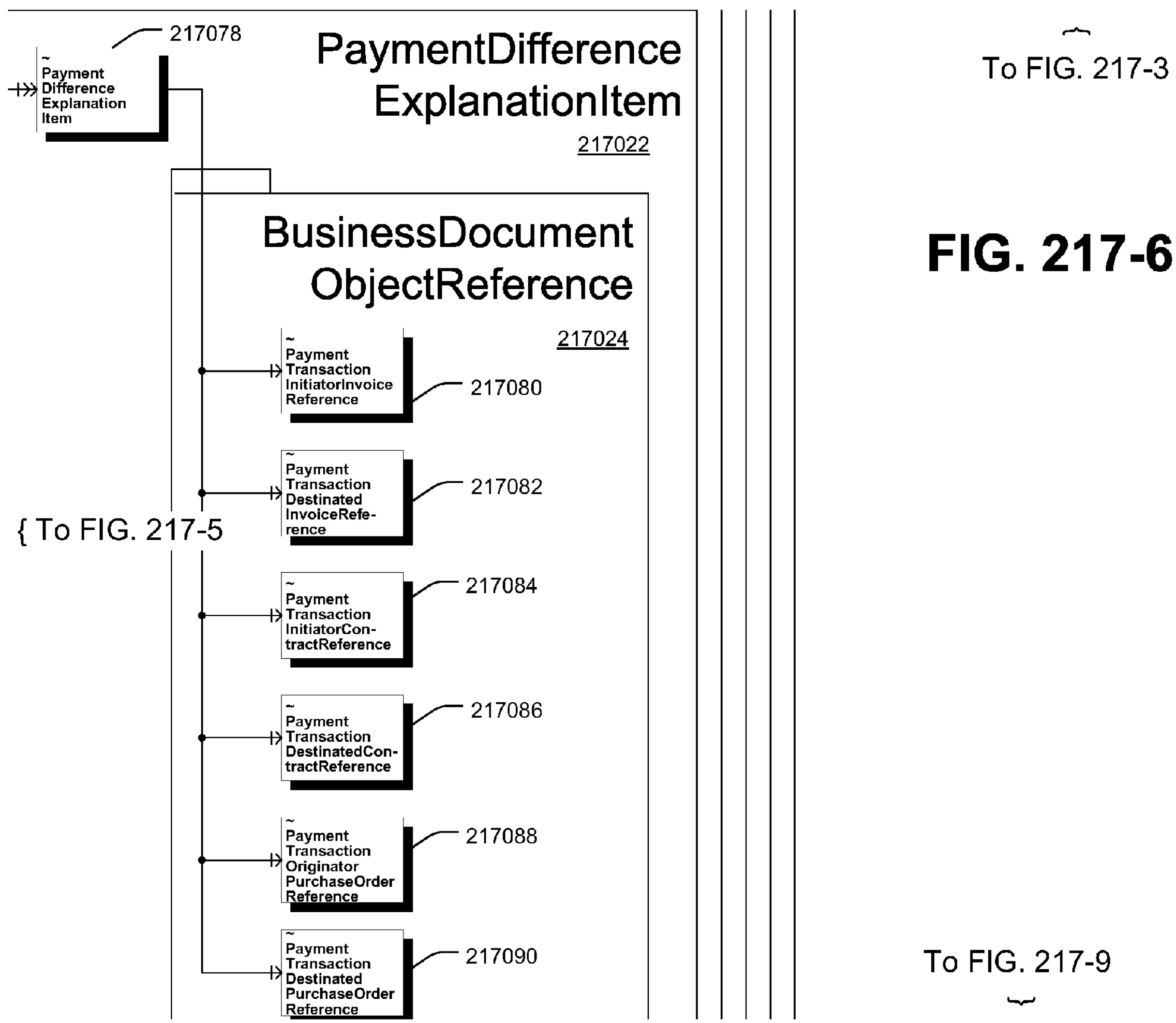
Figures 8, 217:
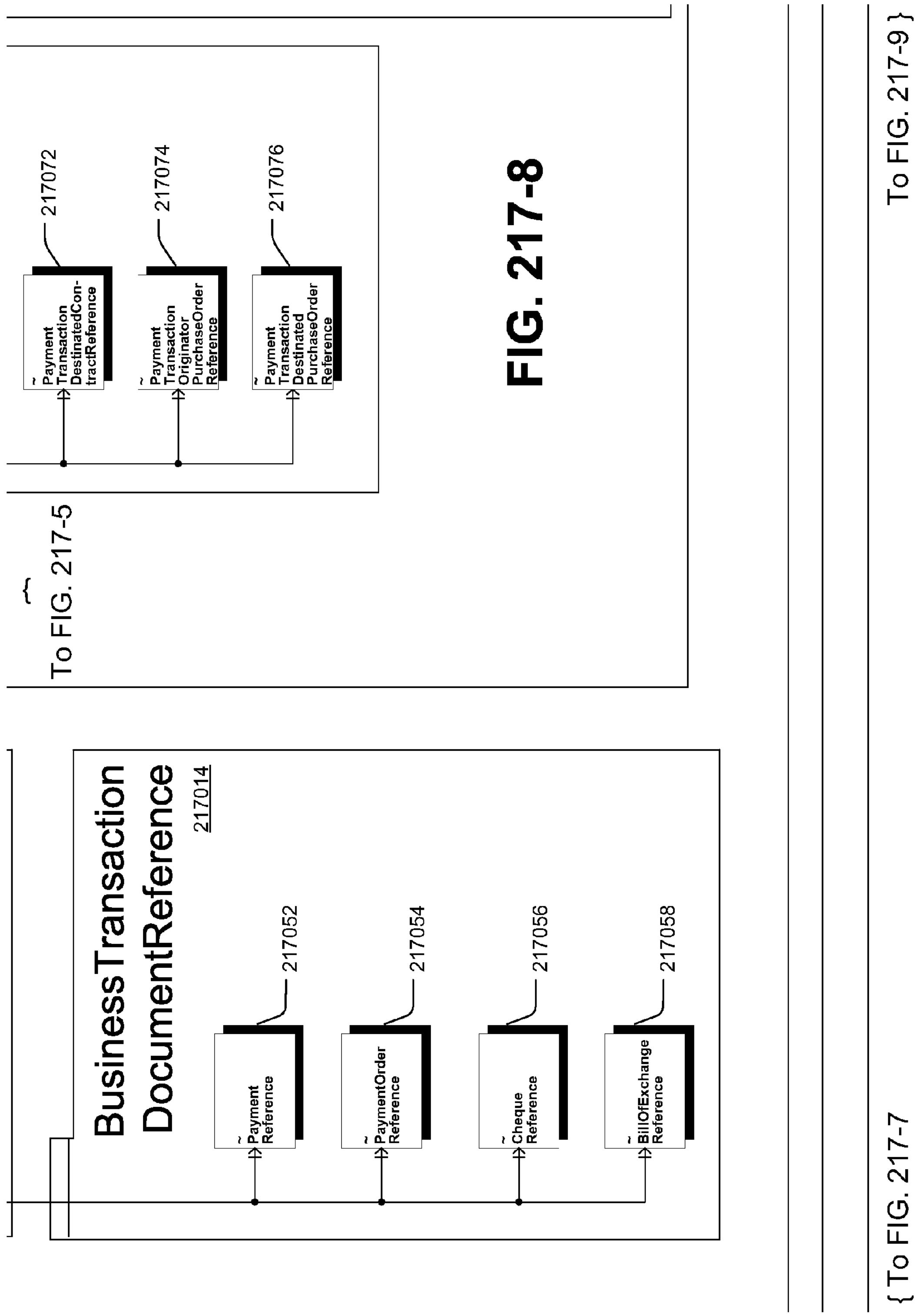
Figures 9, 217:
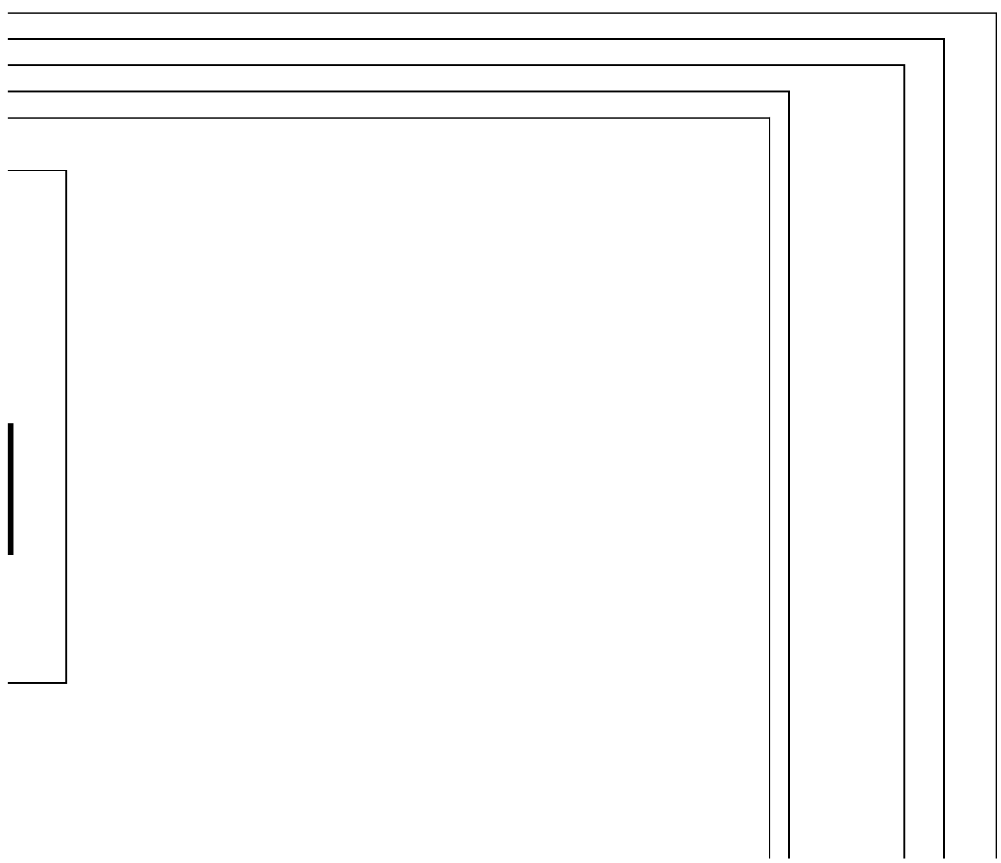
Figures 1, 219:
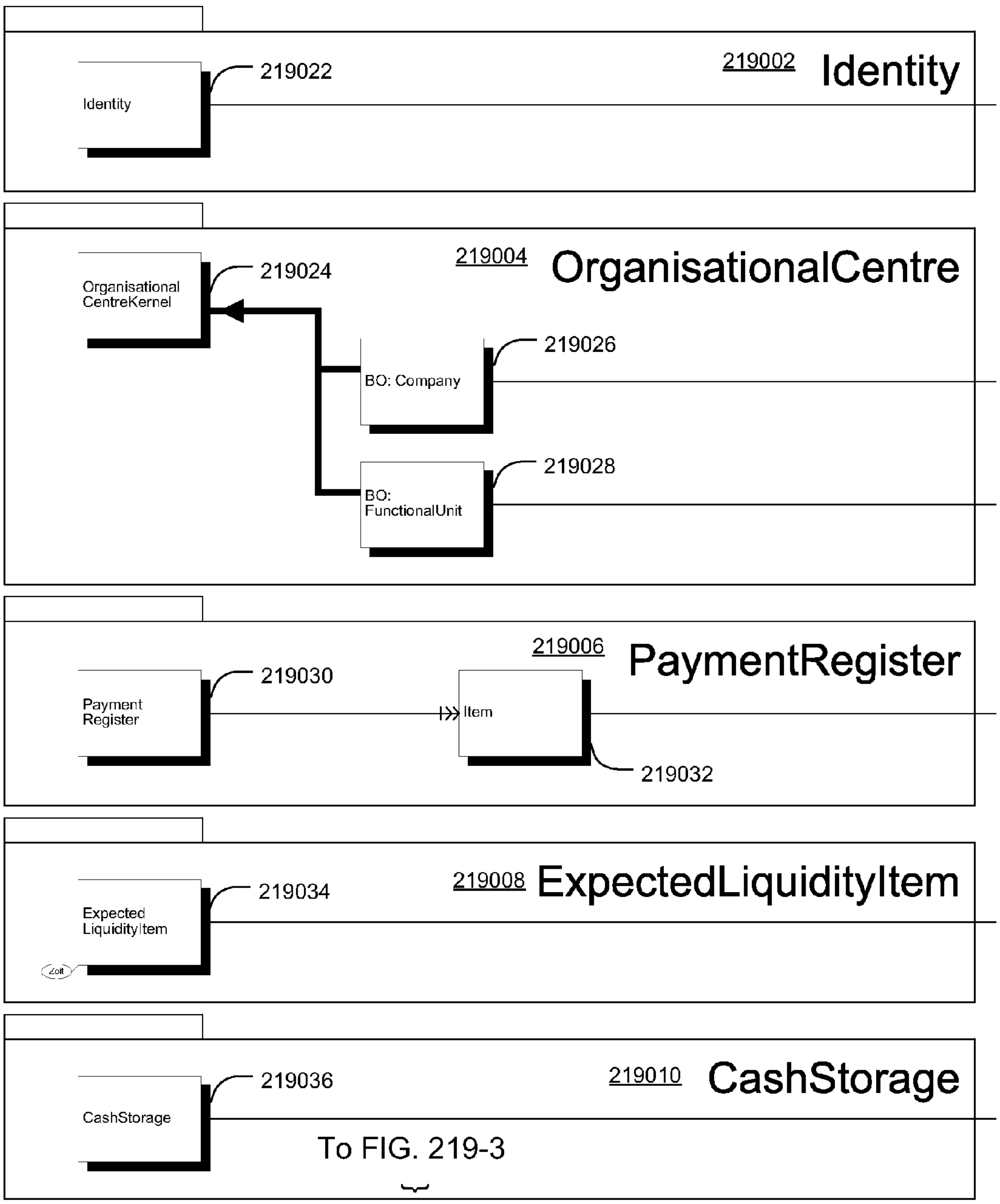
Figures 2, 219:
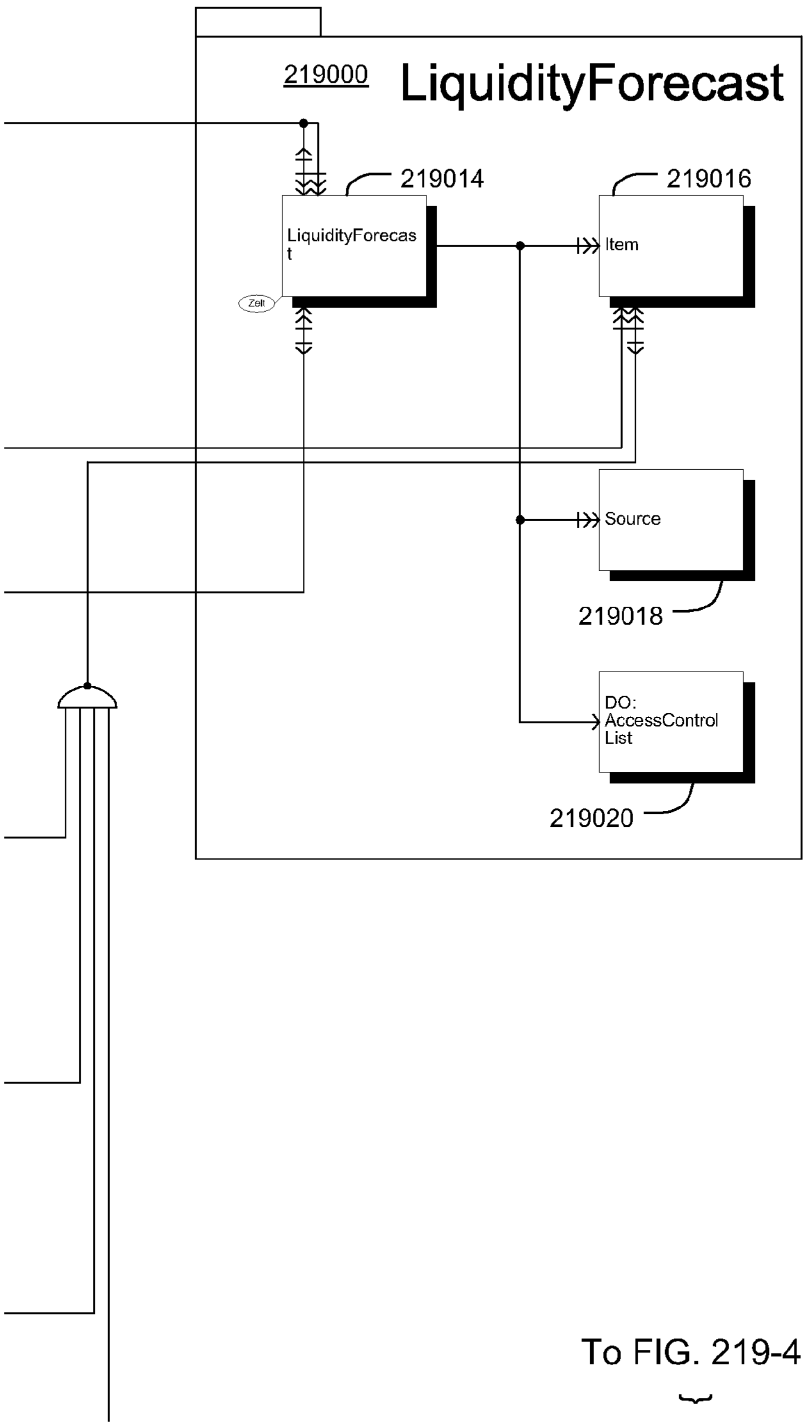
Figures 3, 219:
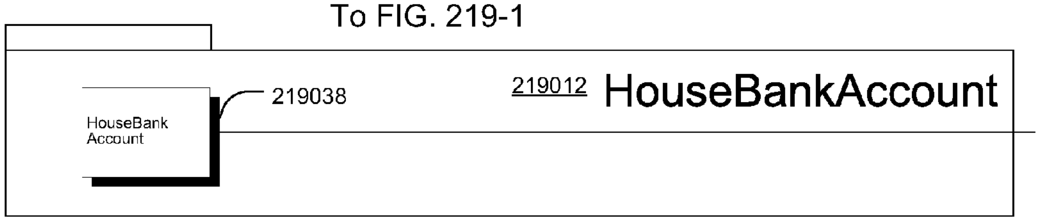
Figure 220:
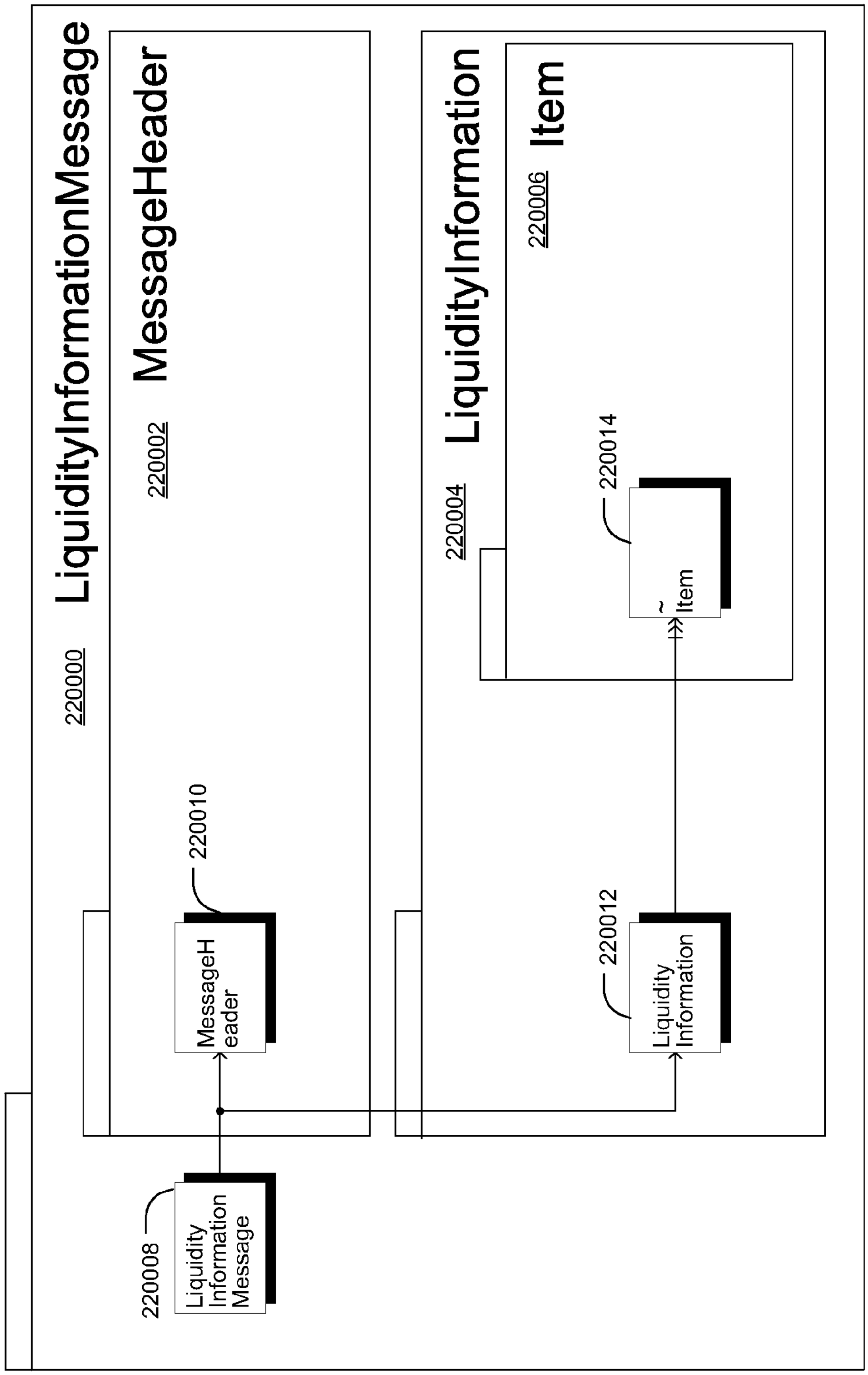
Figure 222:
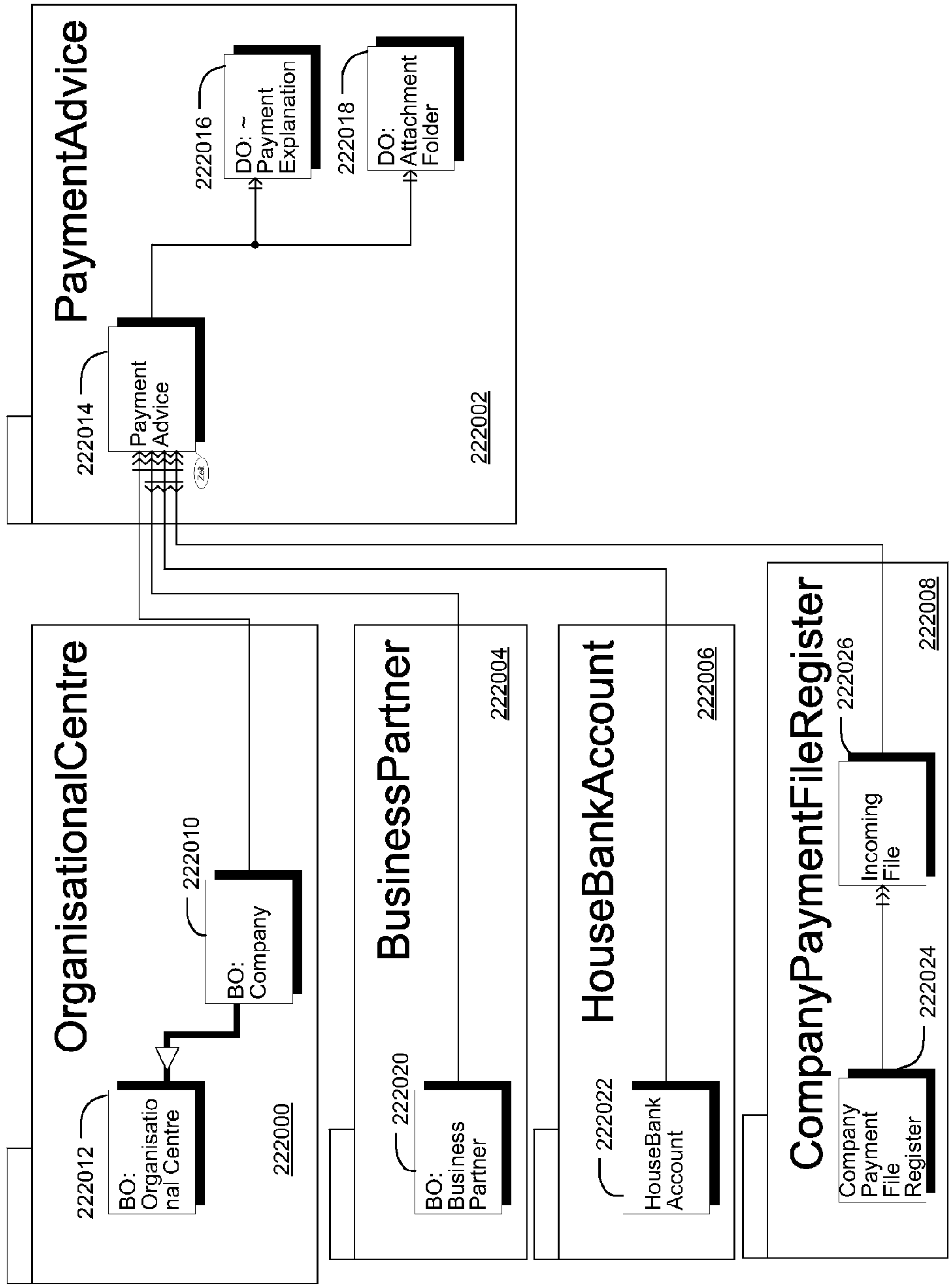
Figures 1, 223:
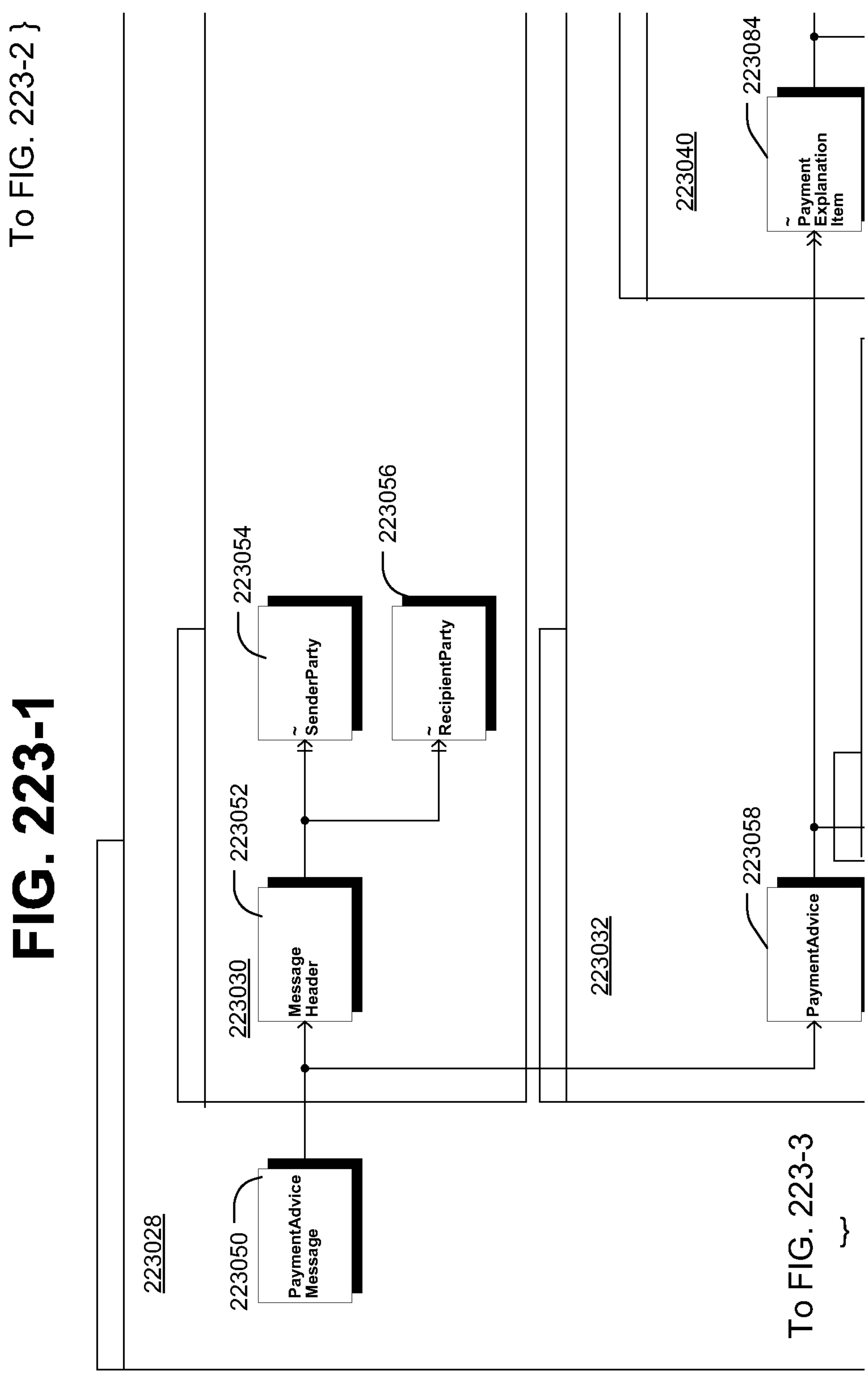
Figures 2, 223:
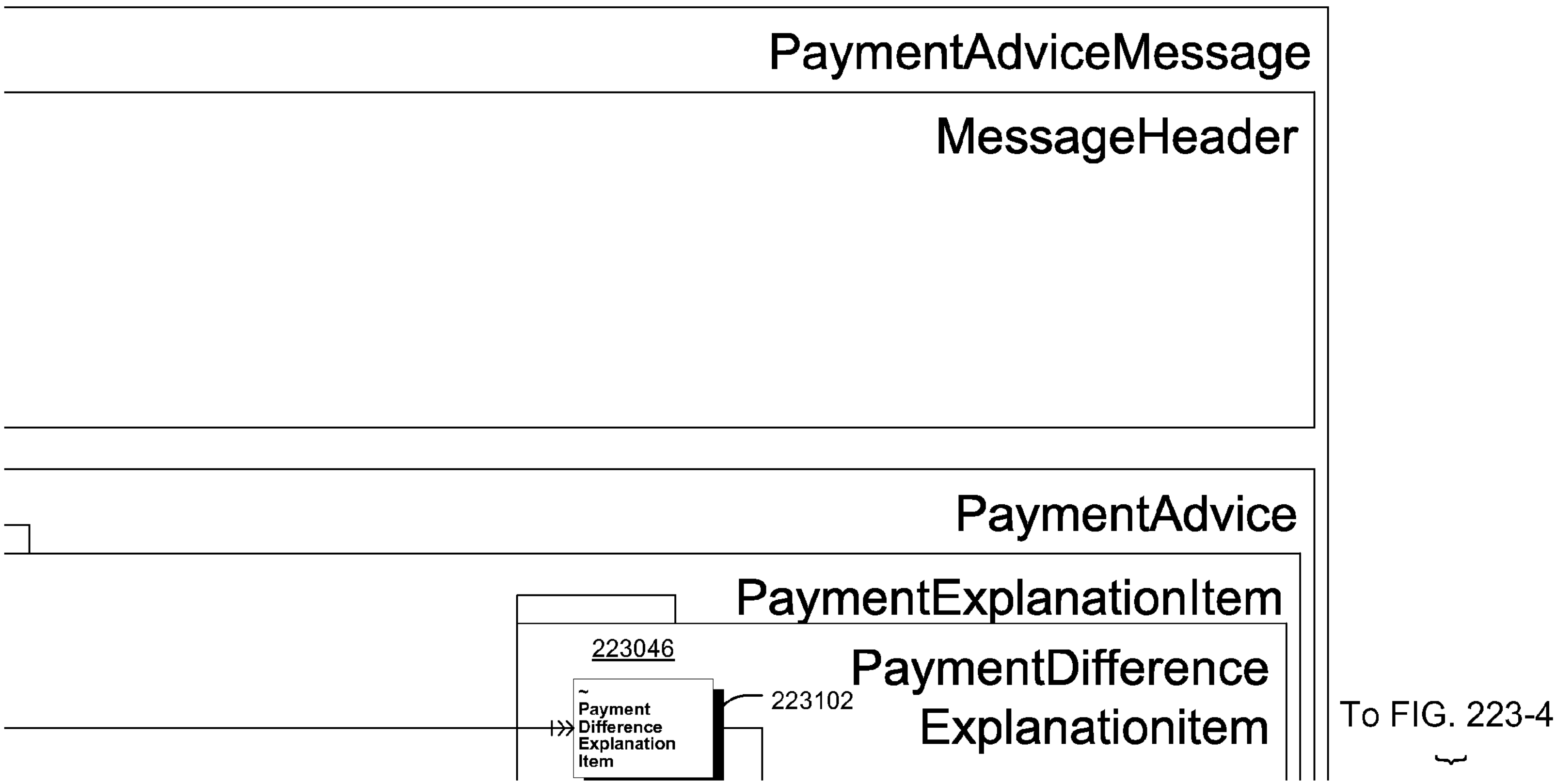
Figures 3, 223:
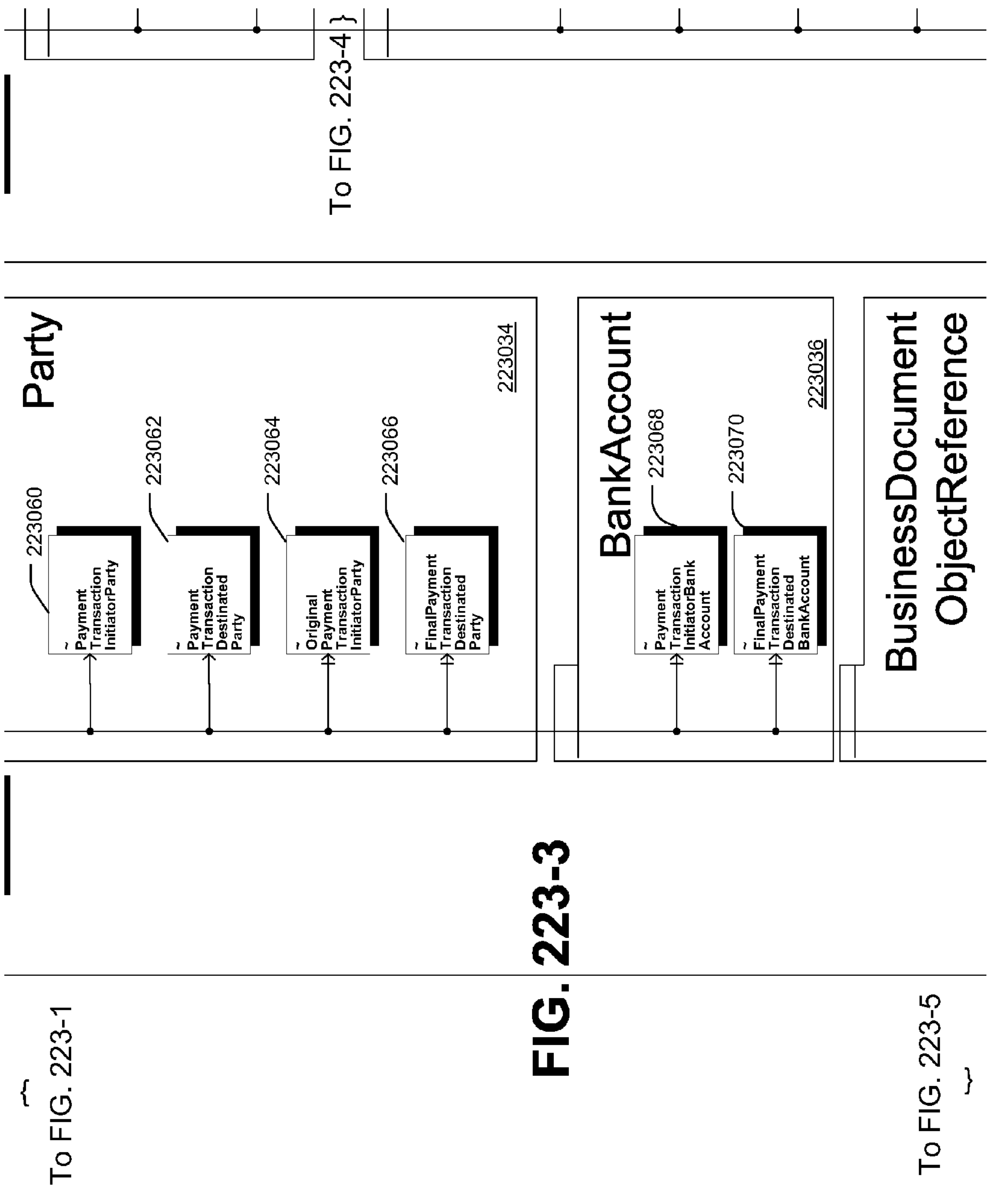
Figures 4, 223:
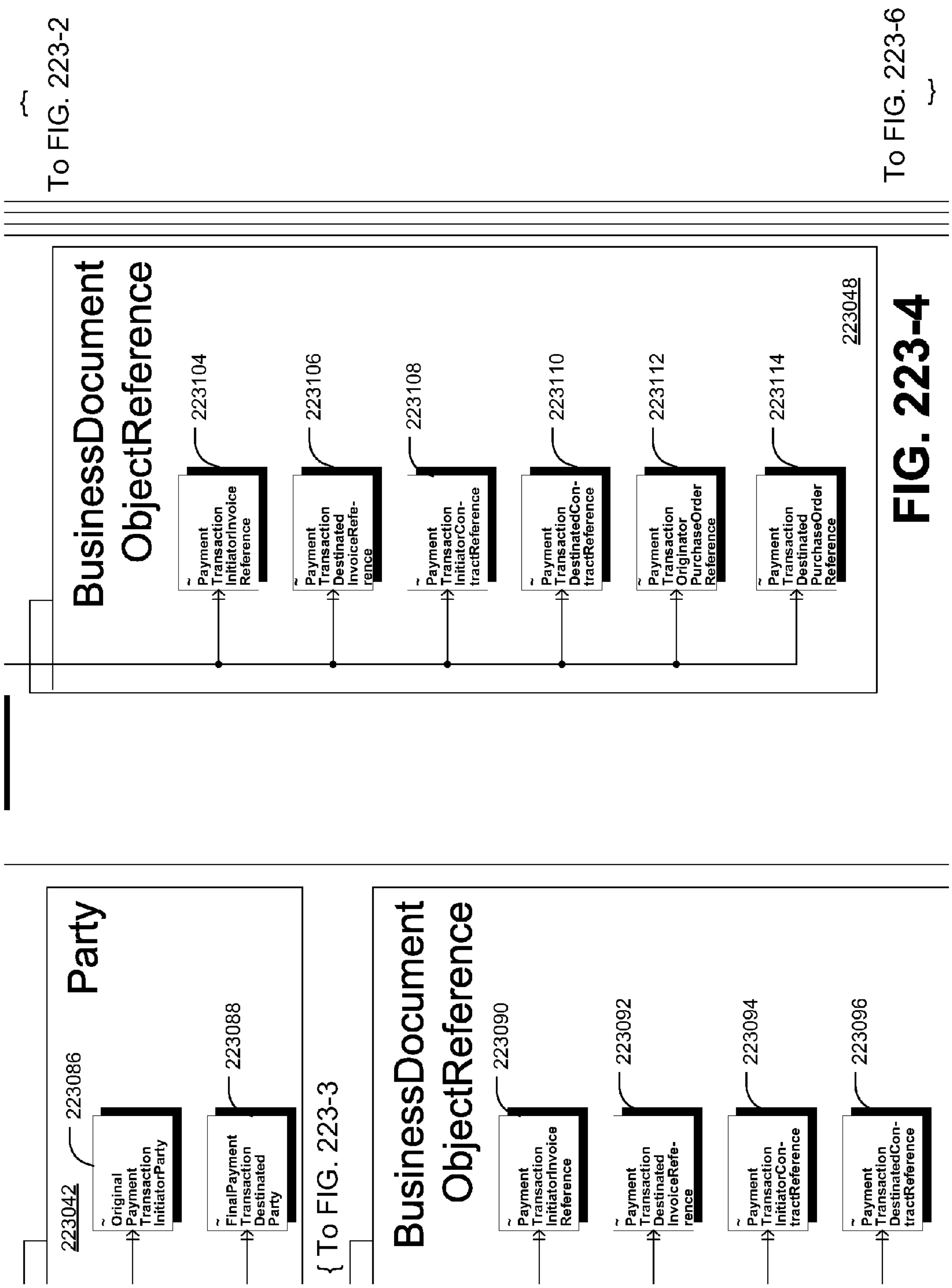
Figures 5, 223:
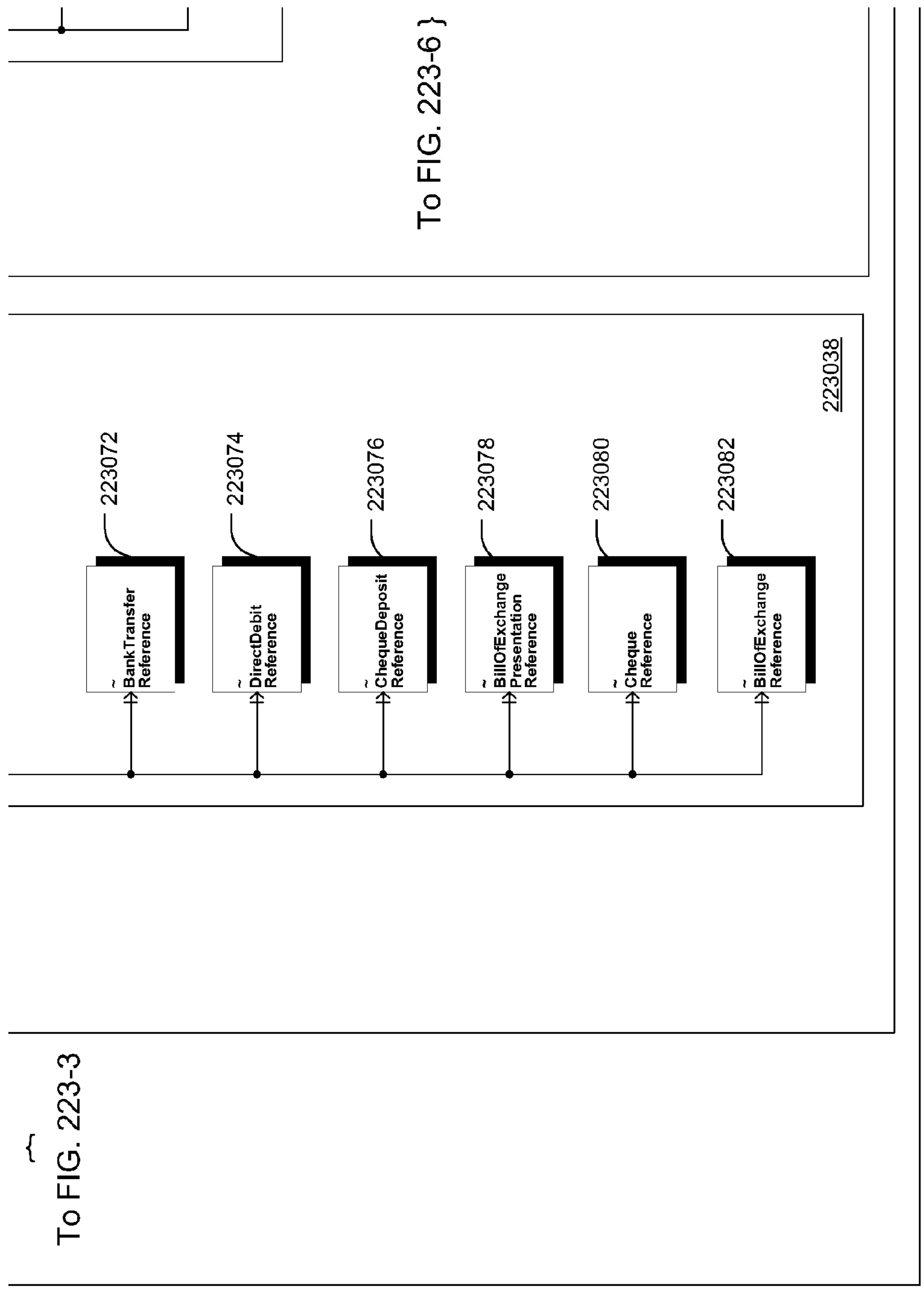
Figures 6, 223:
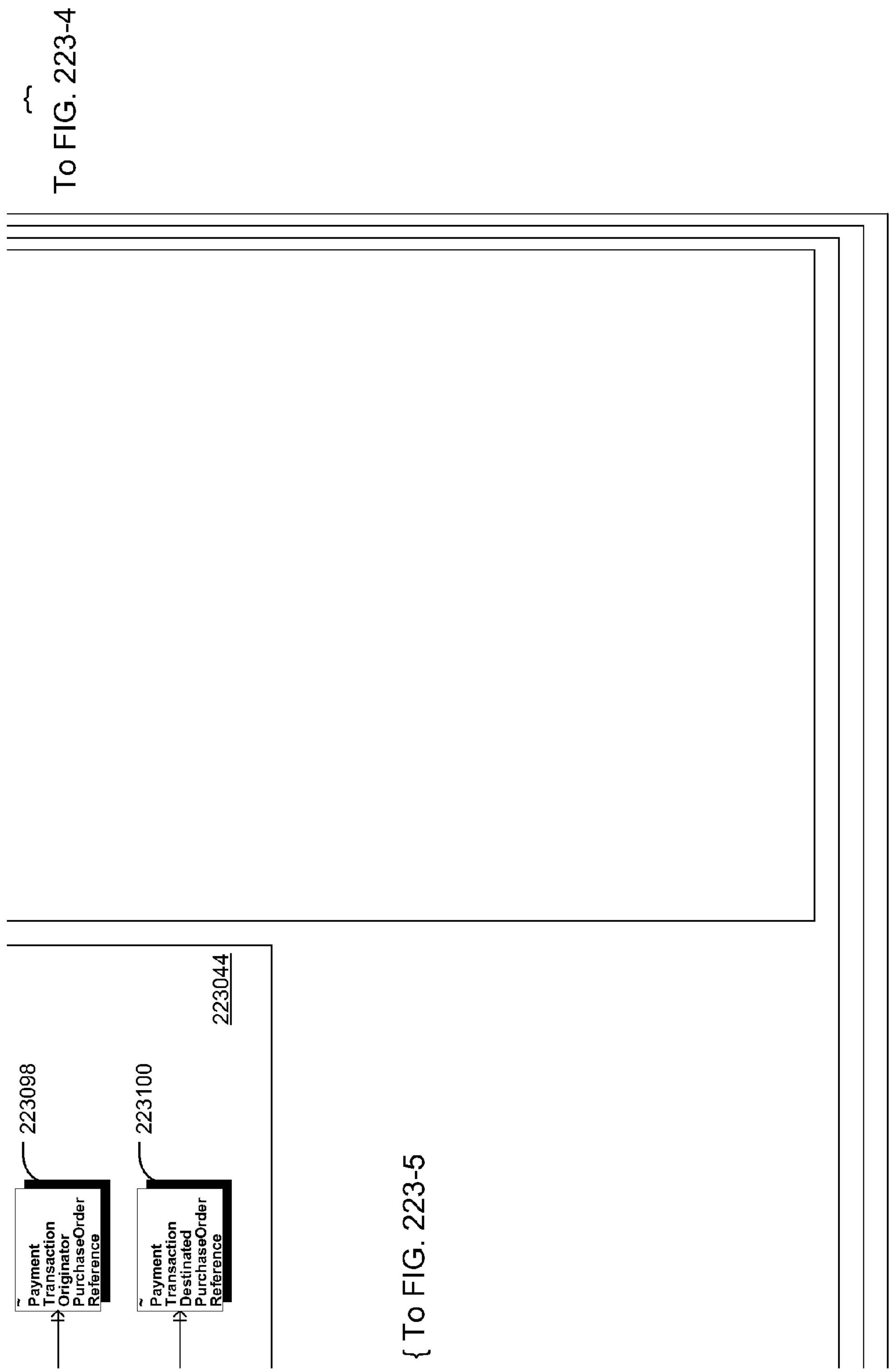
Figures 1, 225:
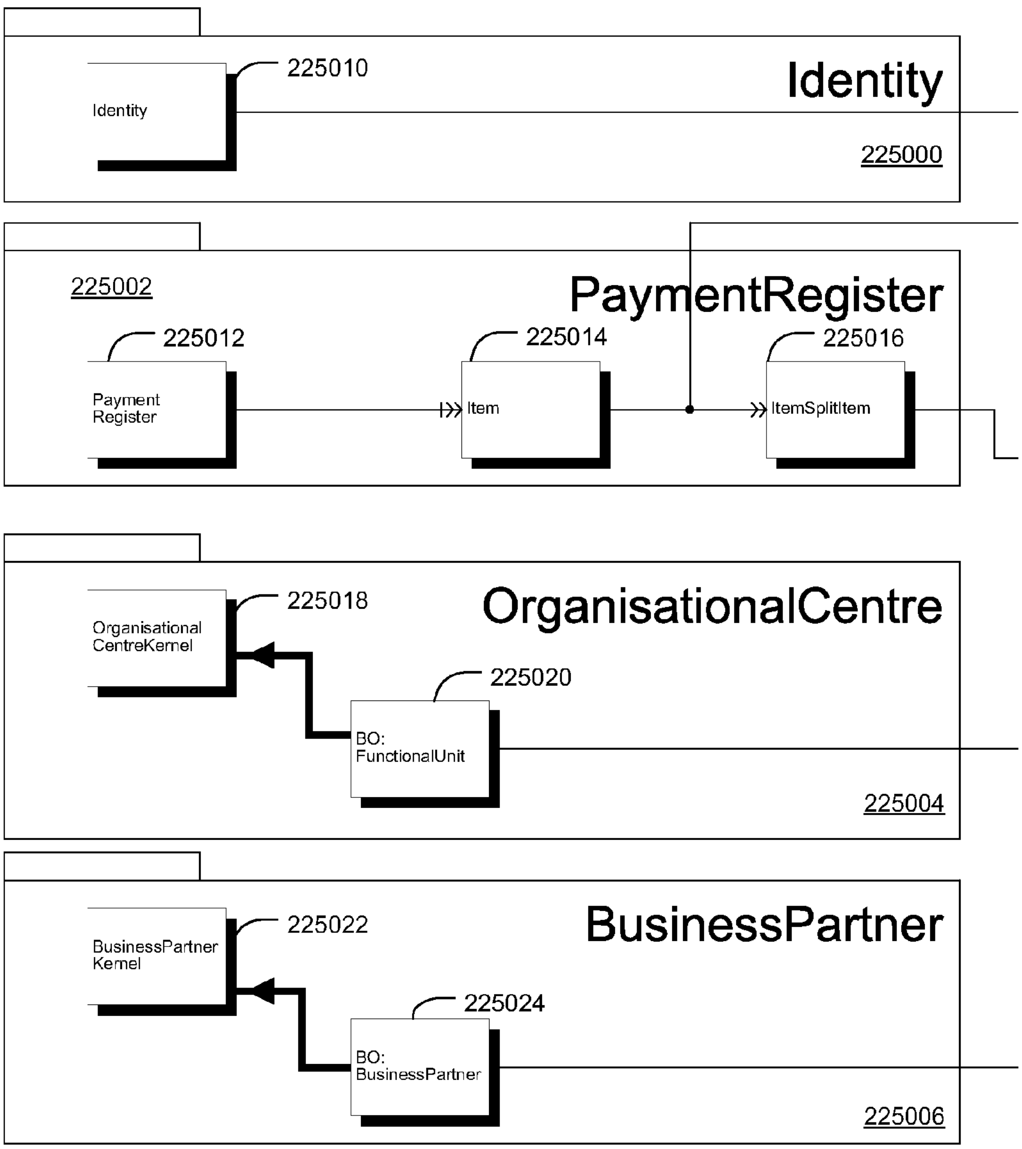
Figures 2, 225:
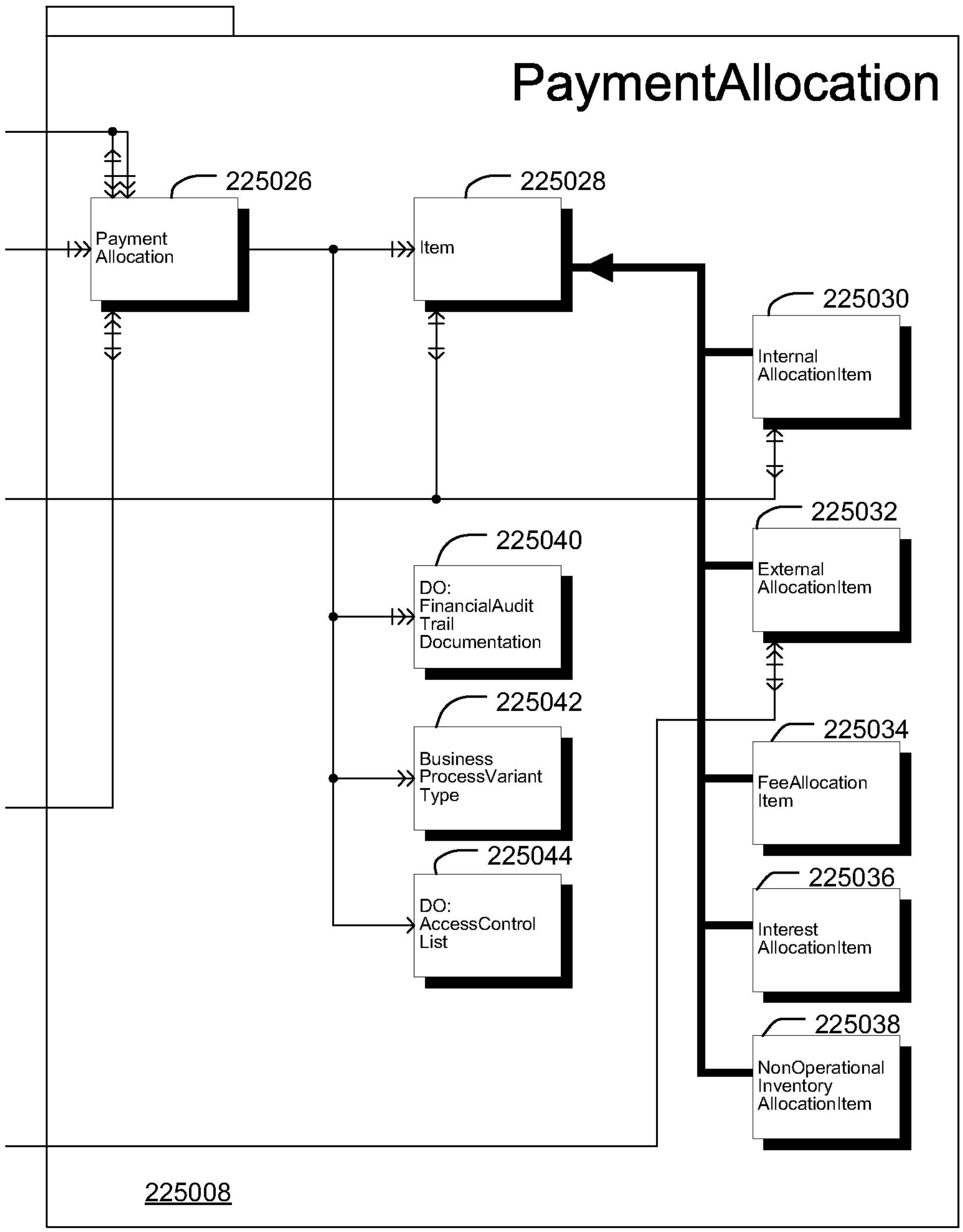
Figures 1, 226:
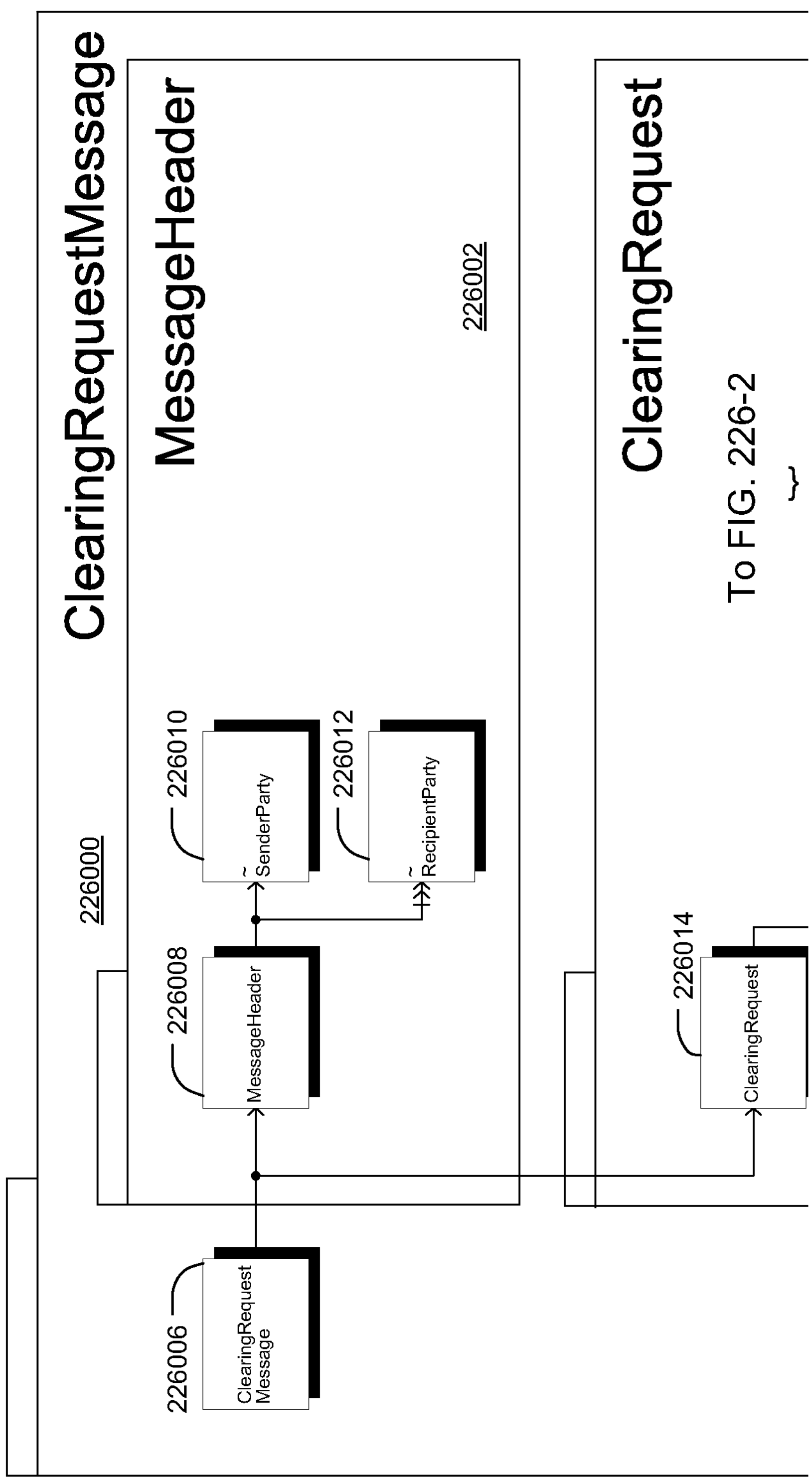
Figures 2, 226:
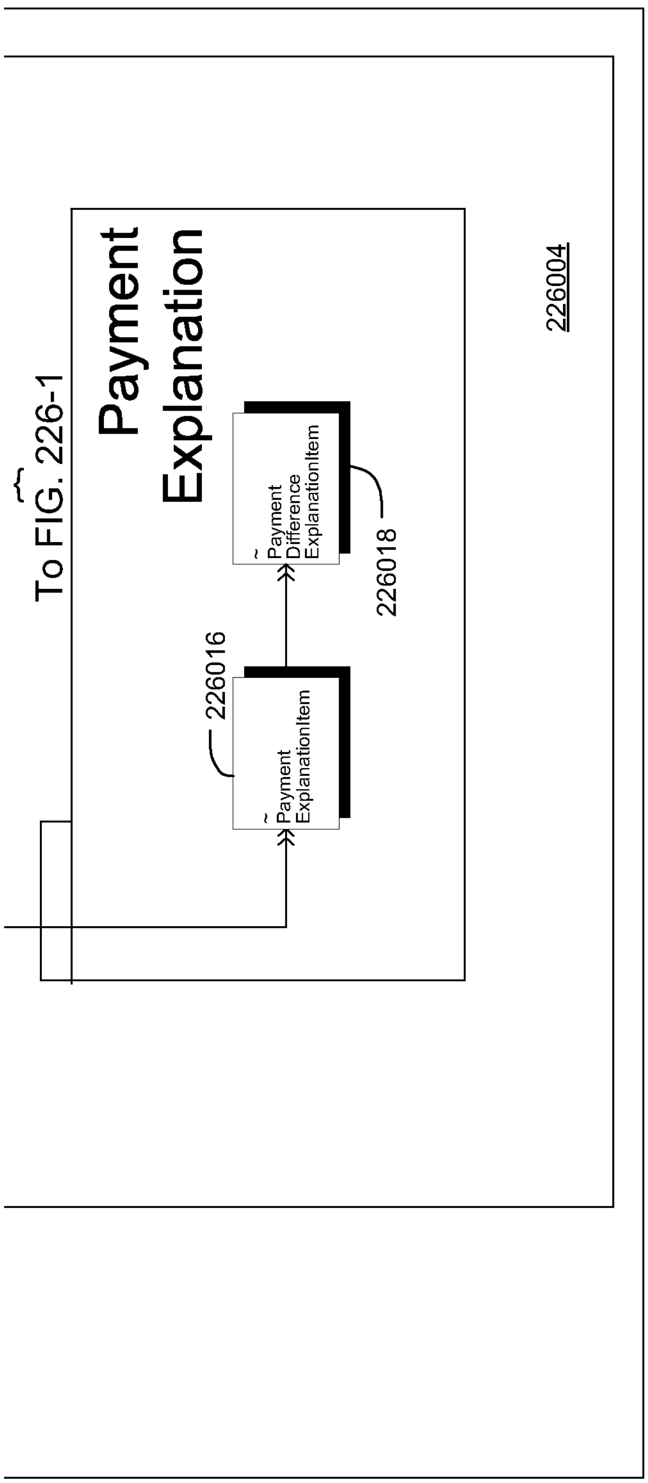
Figures 1, 228:
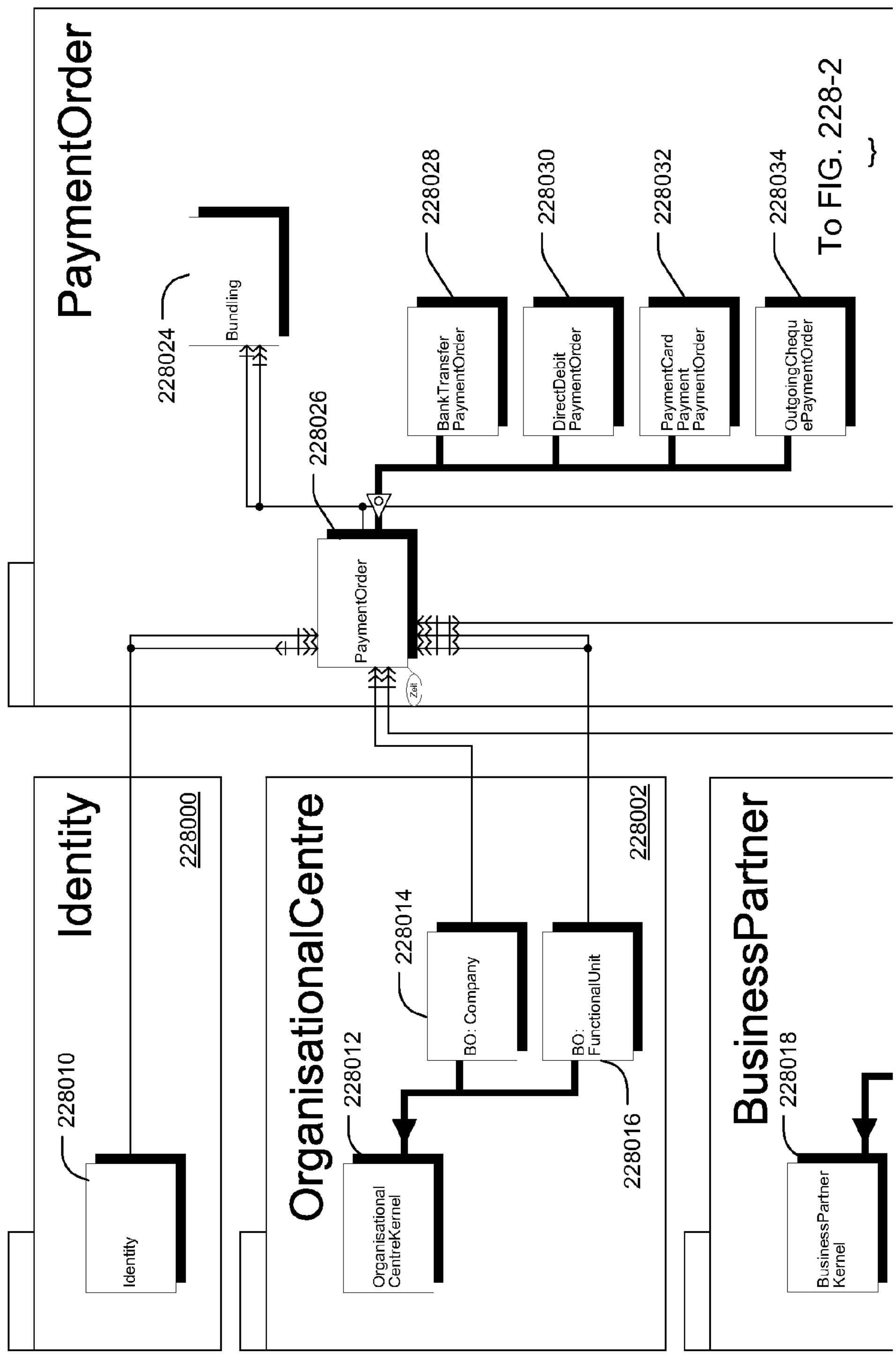
Figures 2, 228:
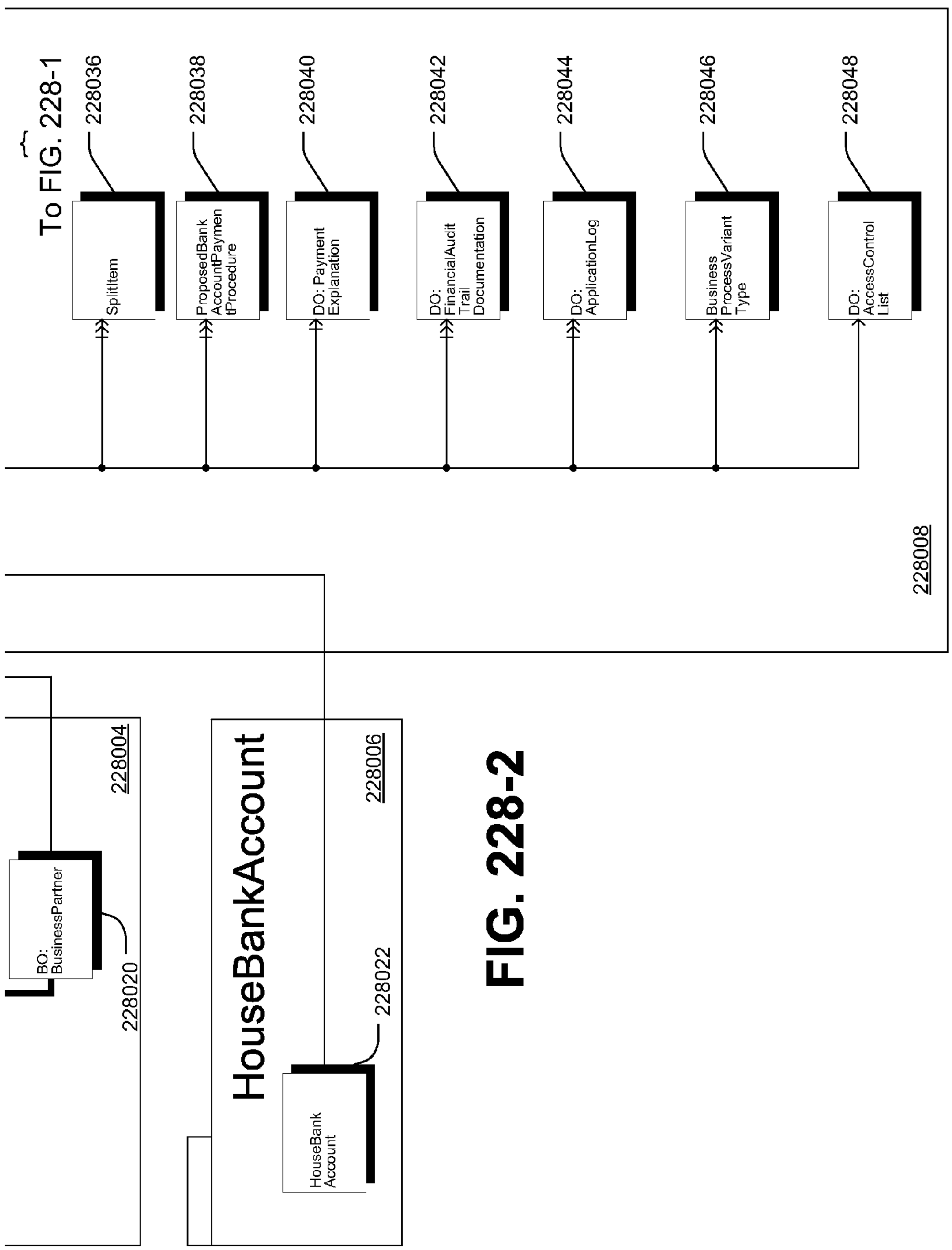
Figures 1, 230:
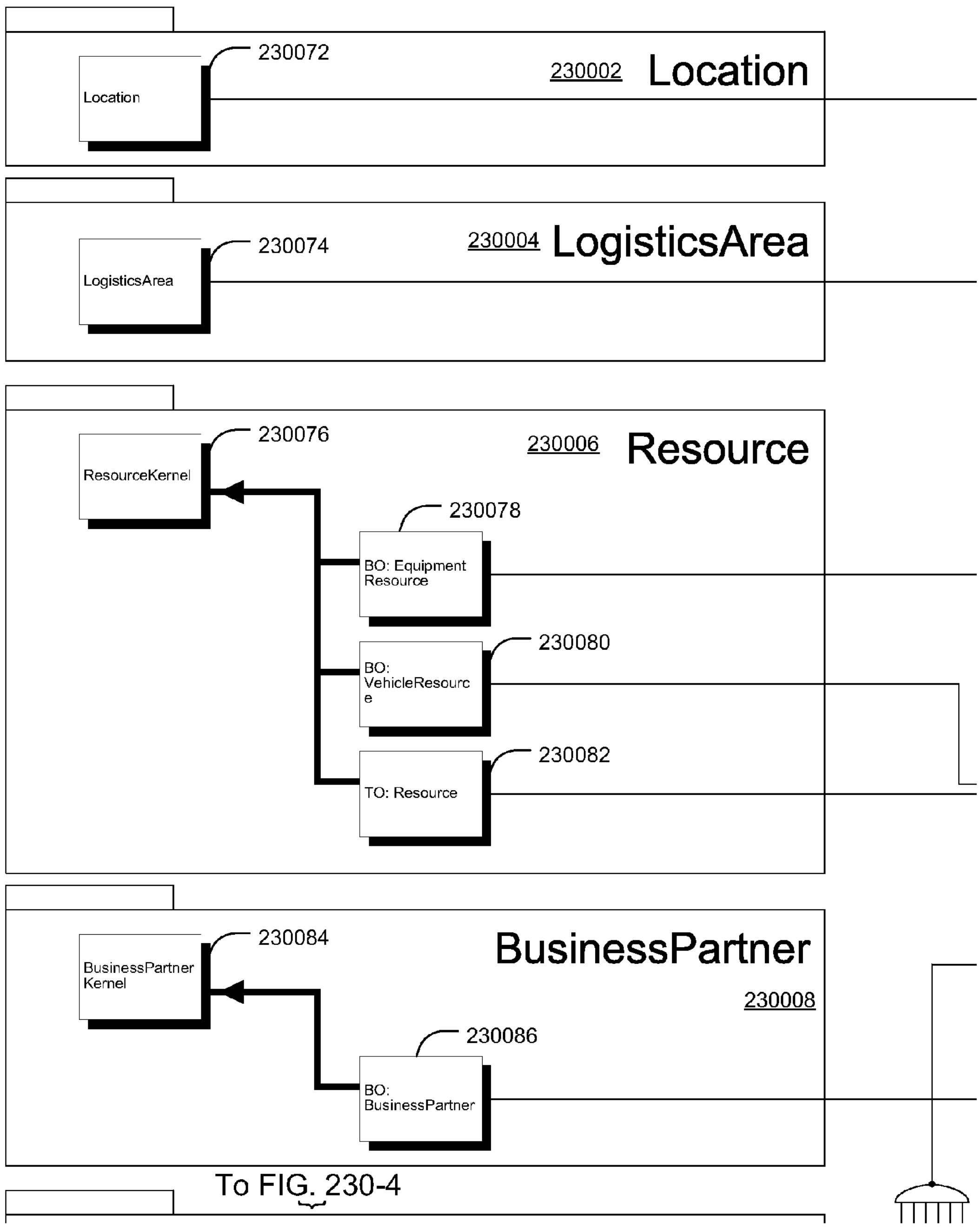
Figures 2, 230:
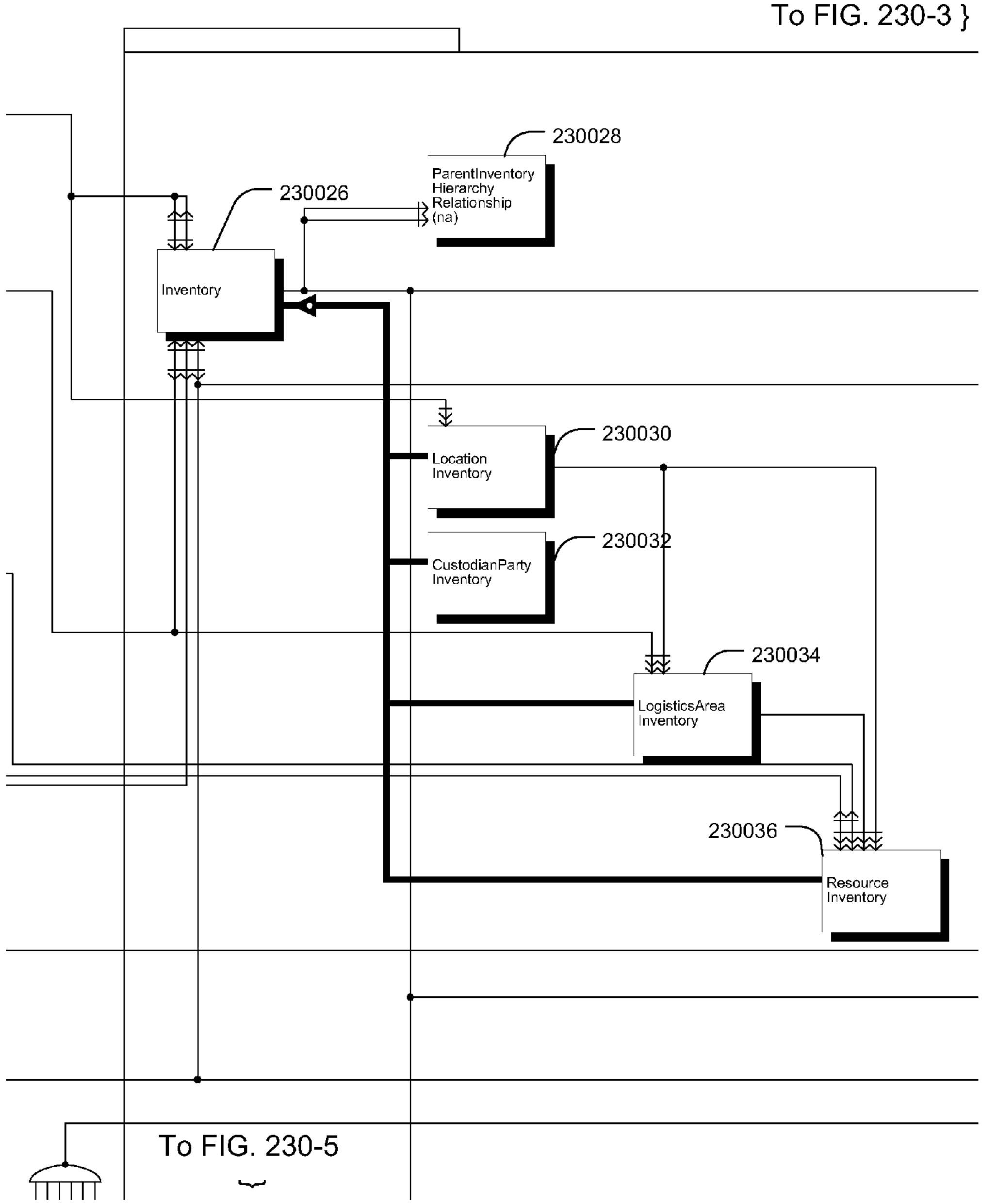
Figures 3, 230:
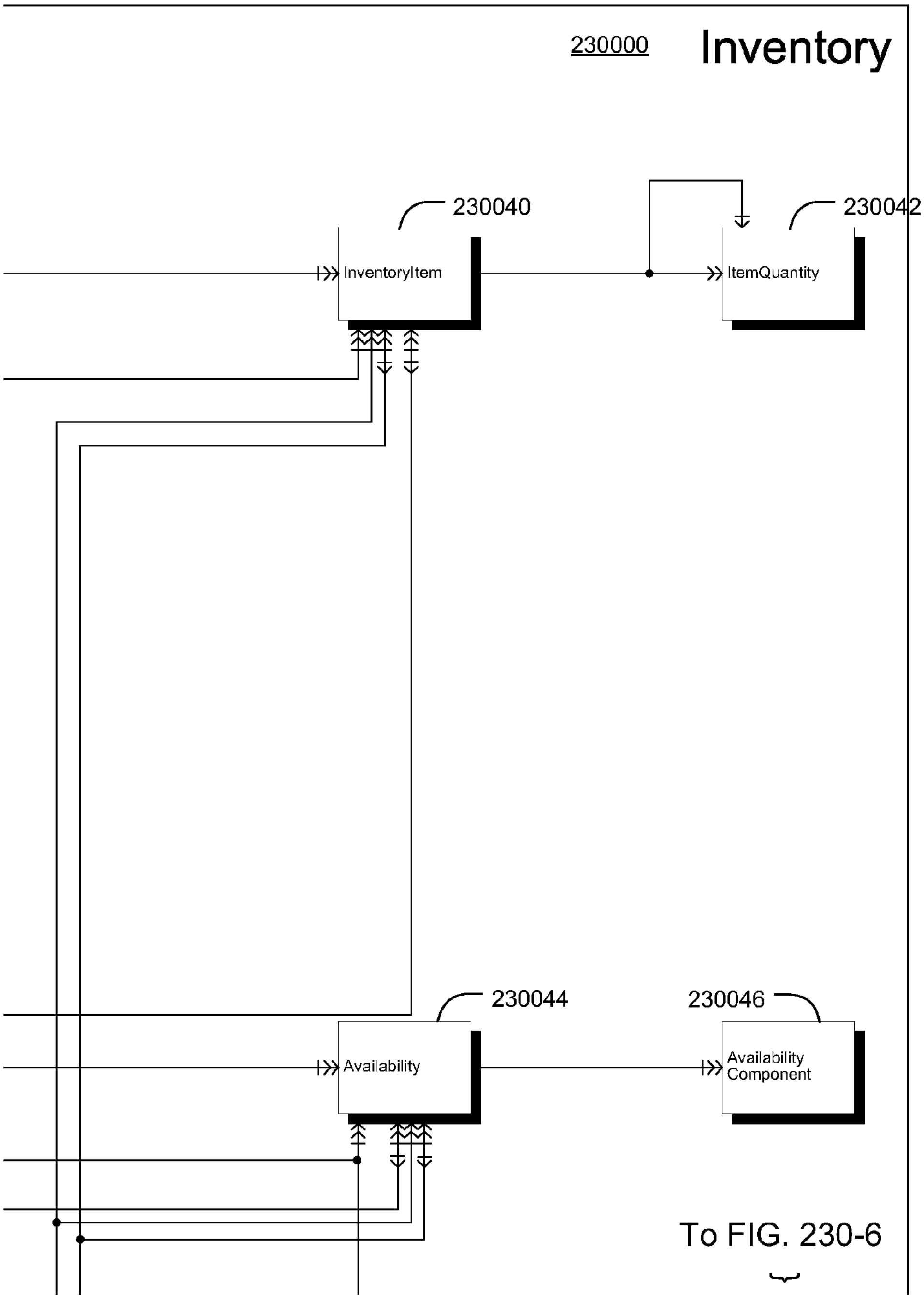
Figures 4, 230:
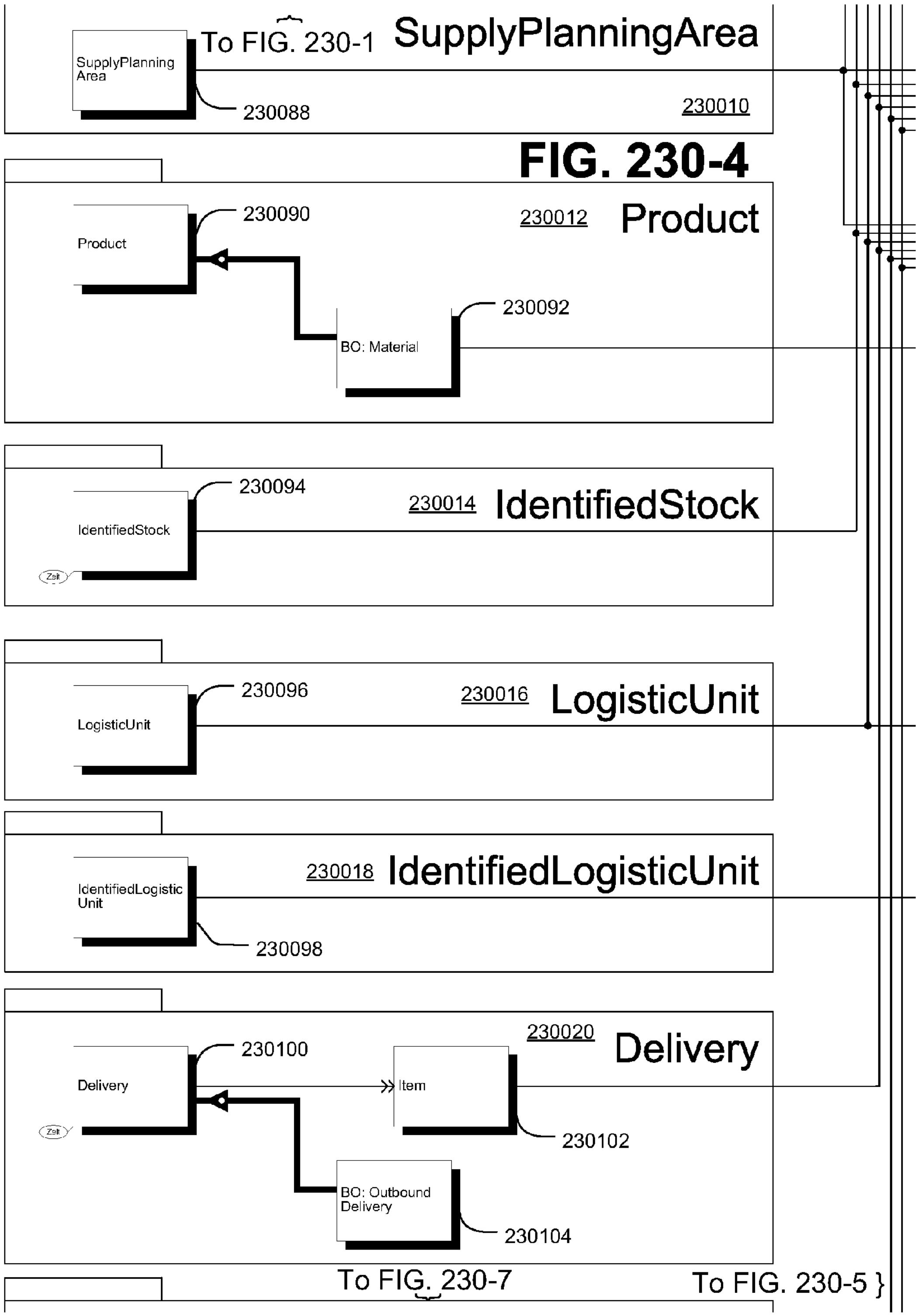
Figures 5, 230:
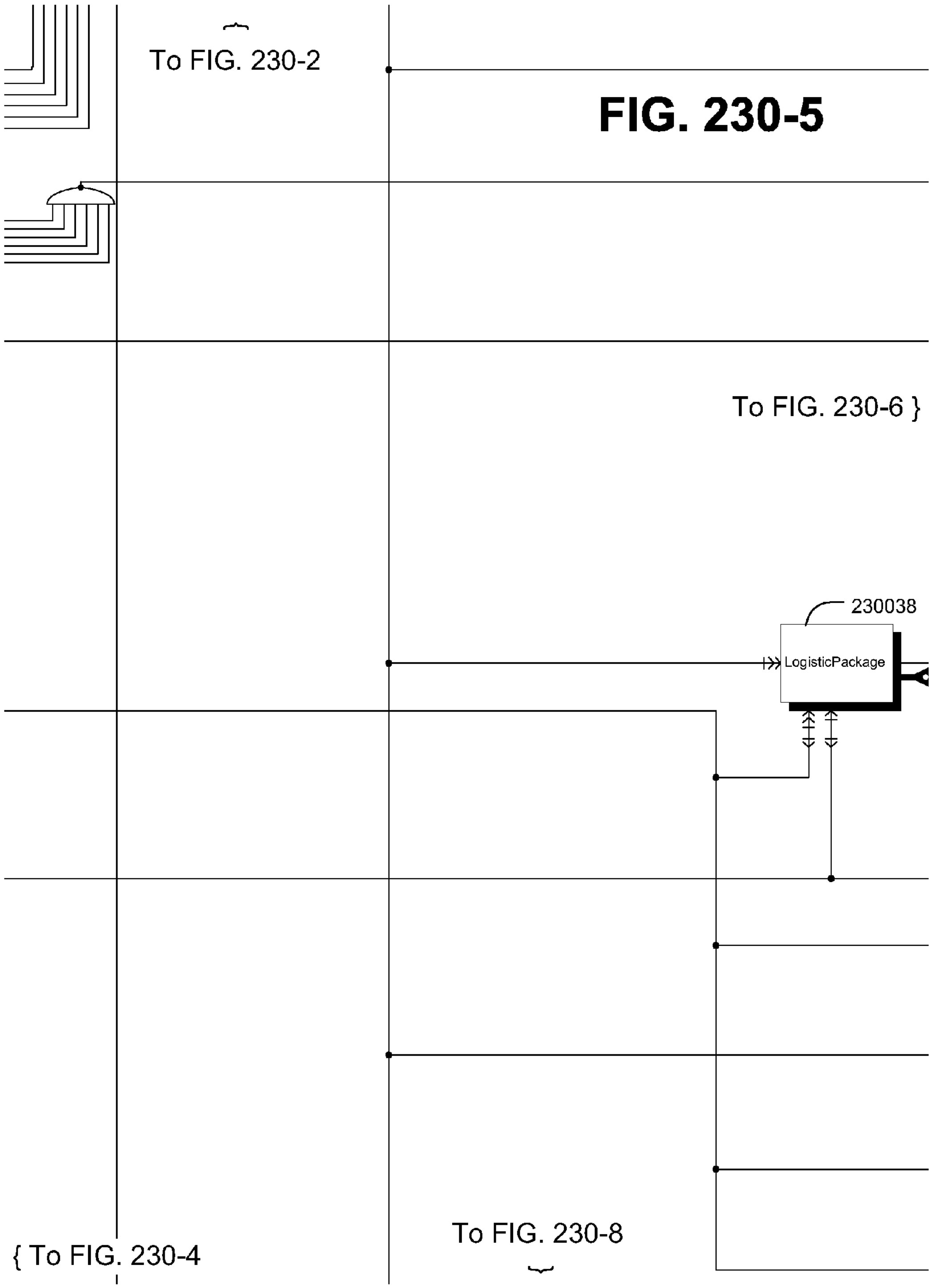
Figures 6, 230:
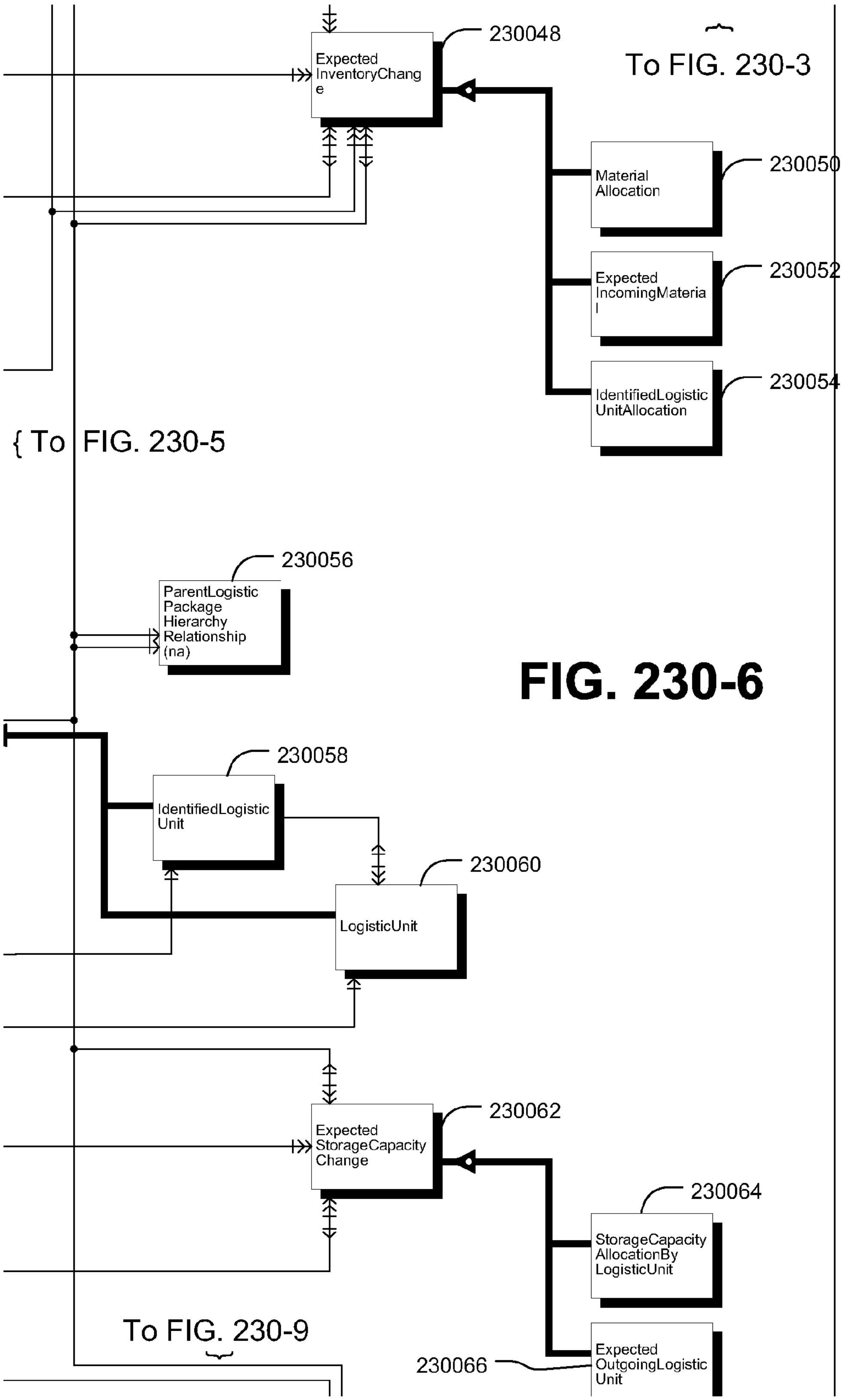
Figures 7, 230:
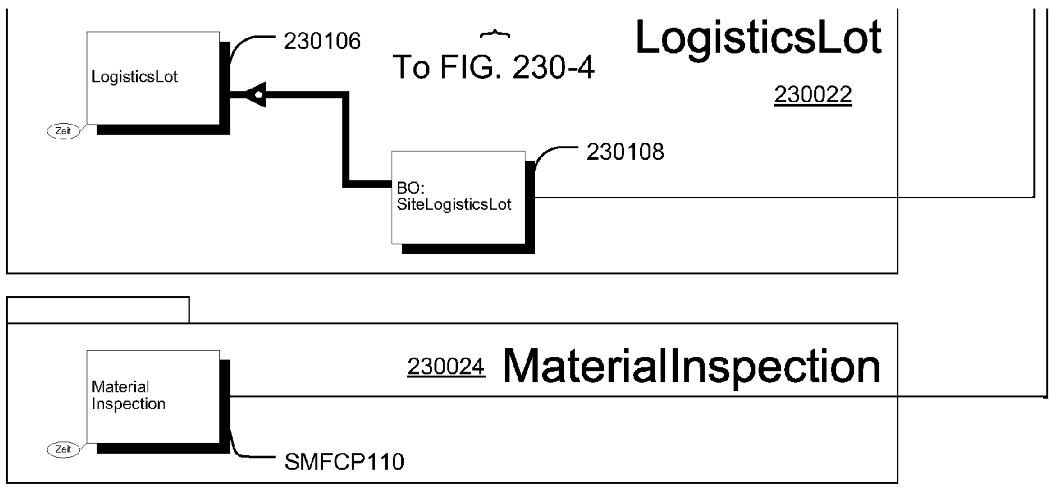
Figures 8, 230:
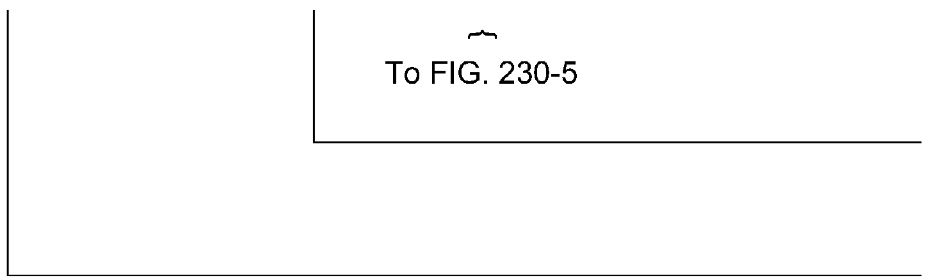
Figures 9, 230:
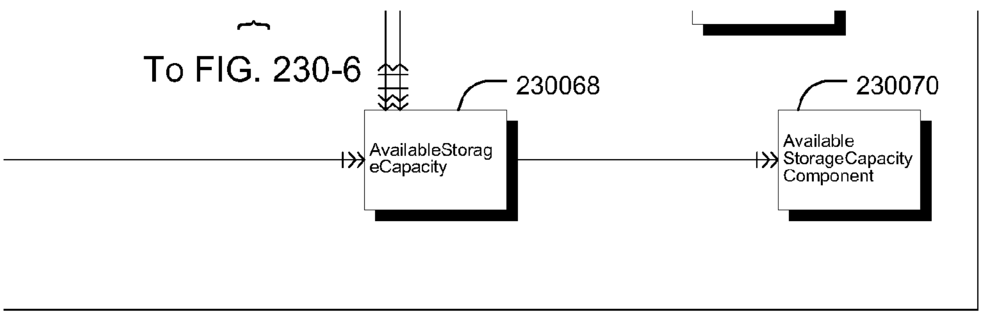
Figures 1, 231:
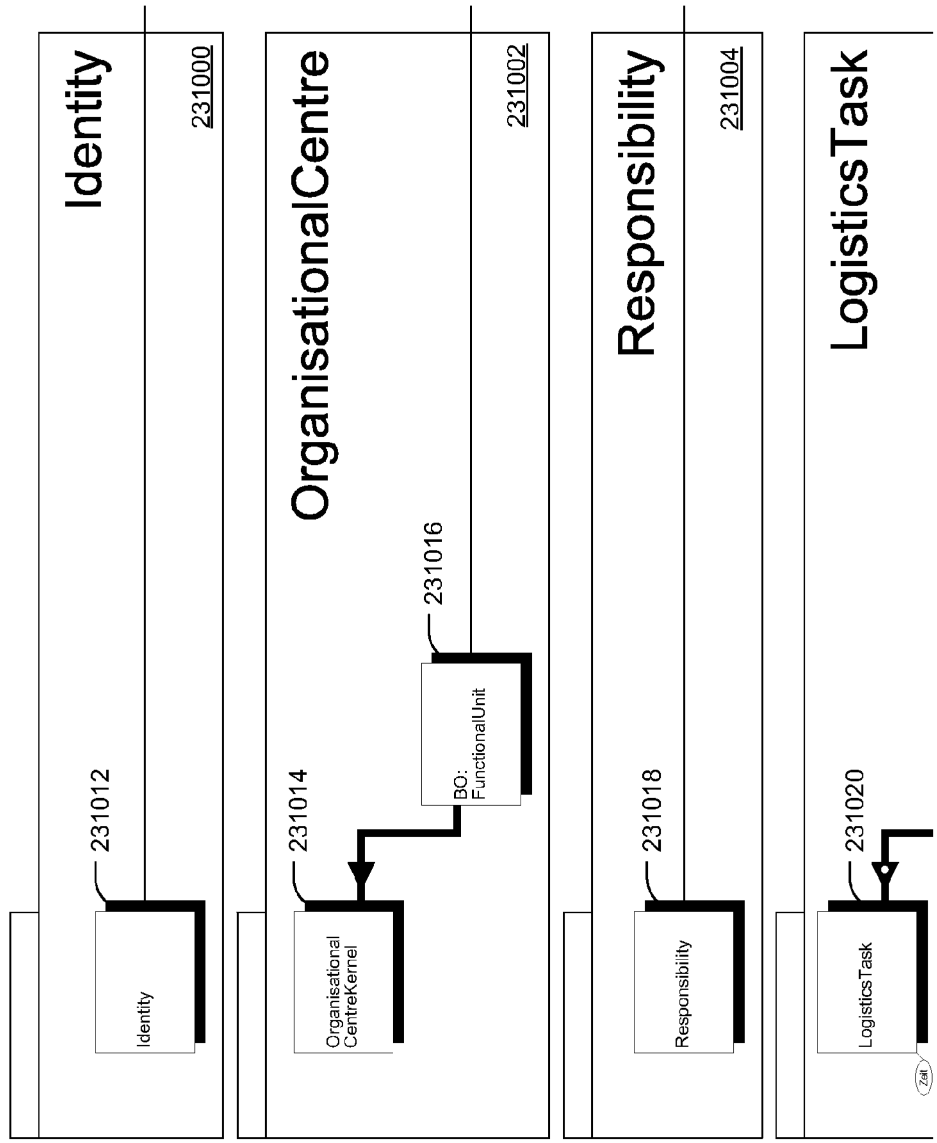
Figures 2, 231:
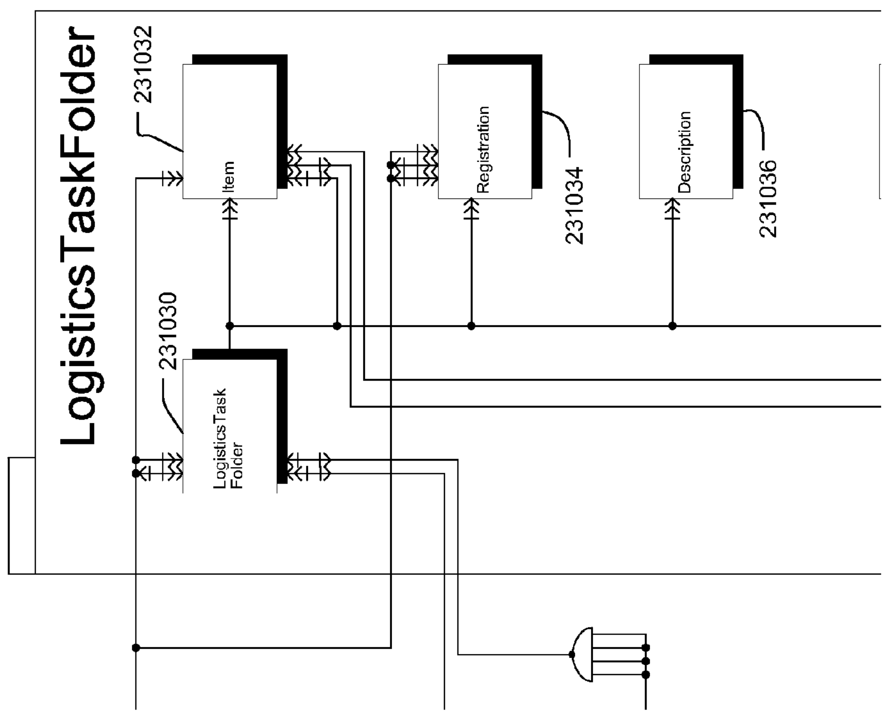
Figures 3, 231:
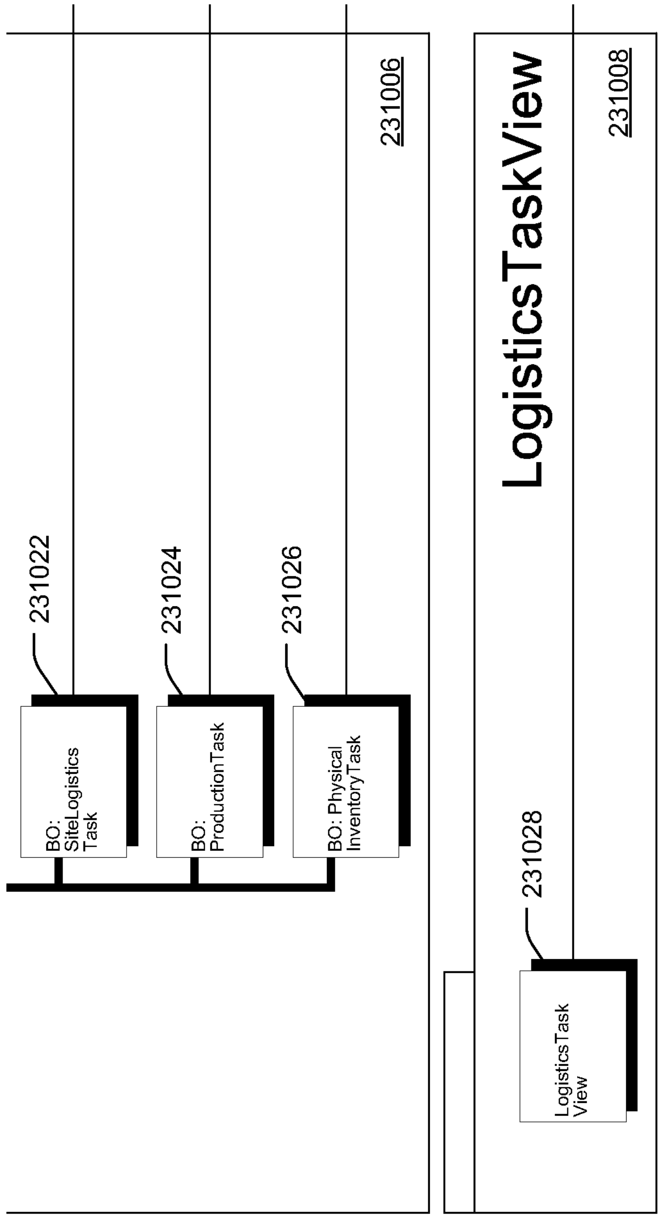
Figures 4, 231:
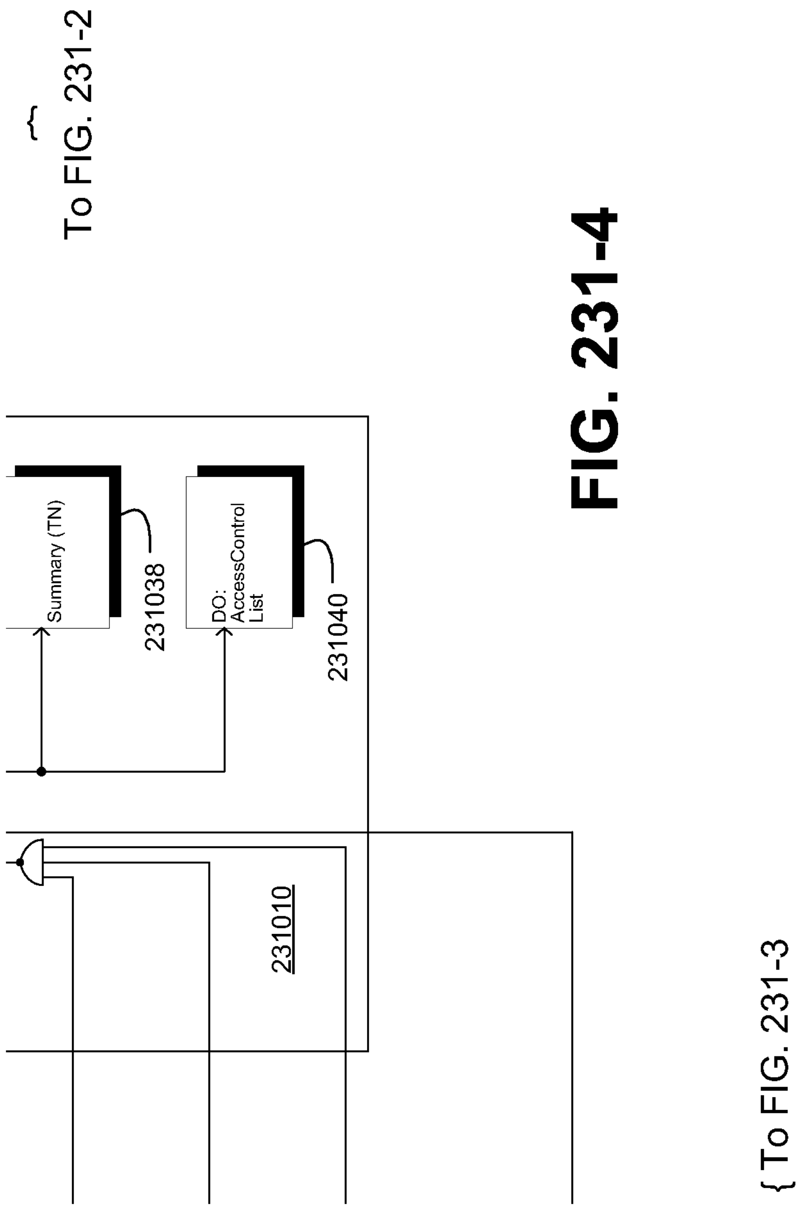
Figures 1, 232:
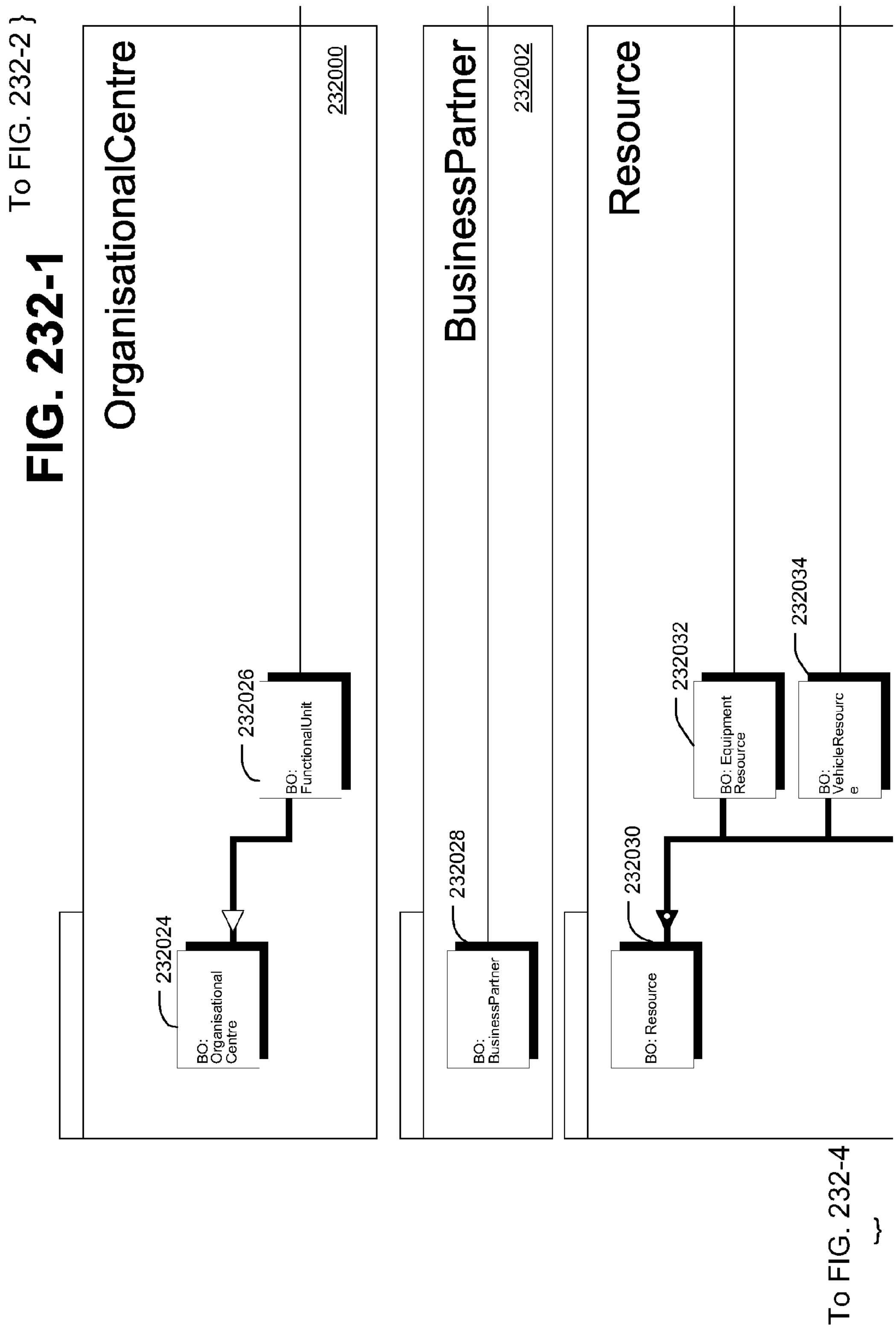
Figures 2, 232:
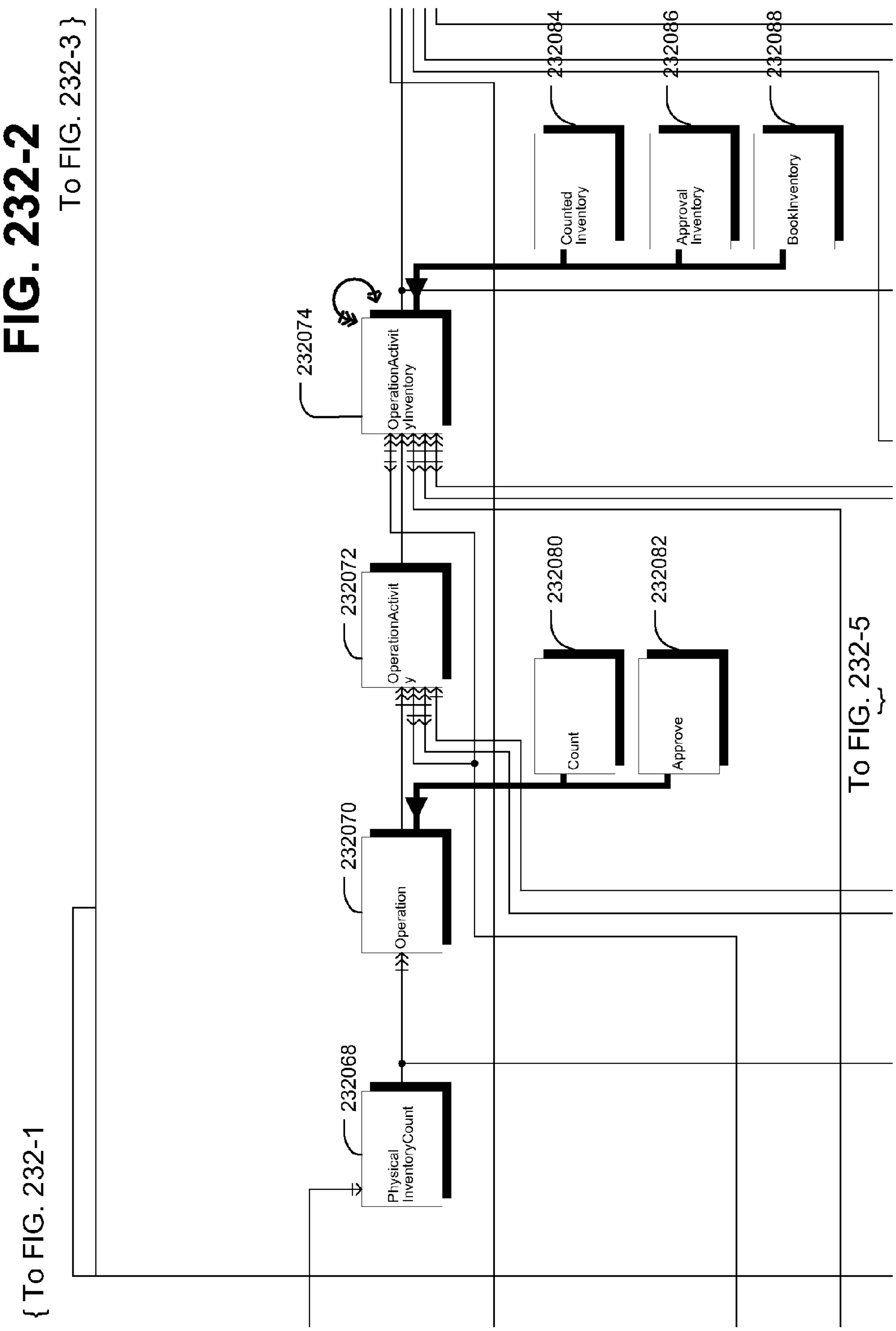
Figures 3, 232:
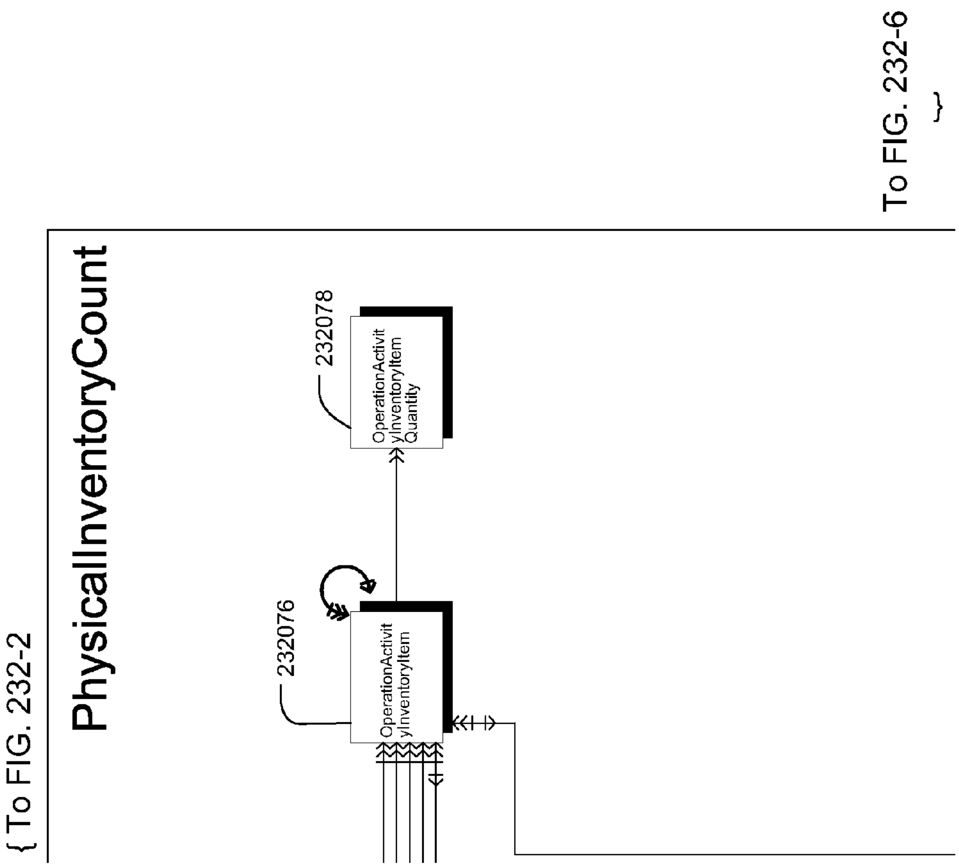
Figures 4, 232:
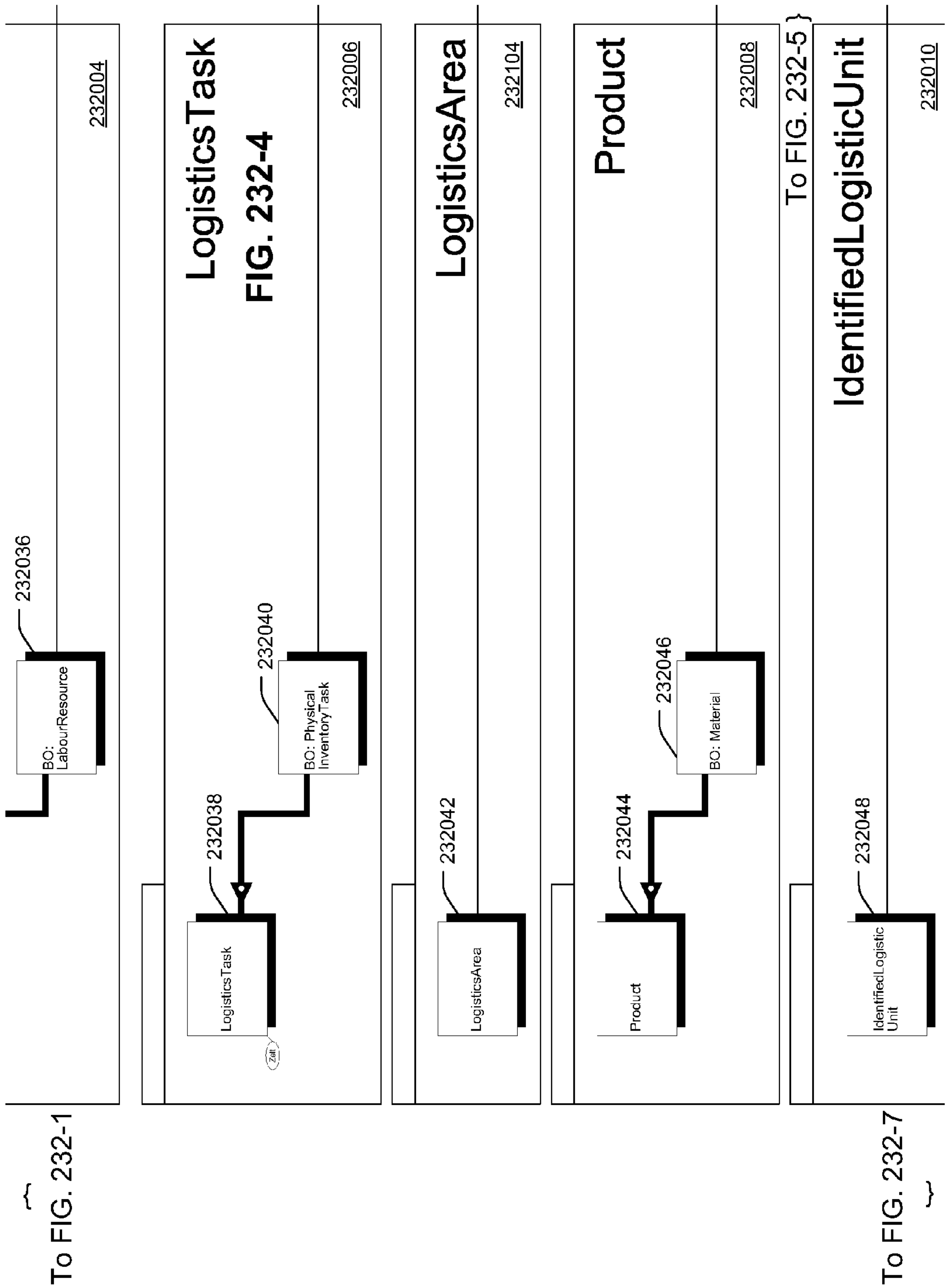
Figures 5, 232:
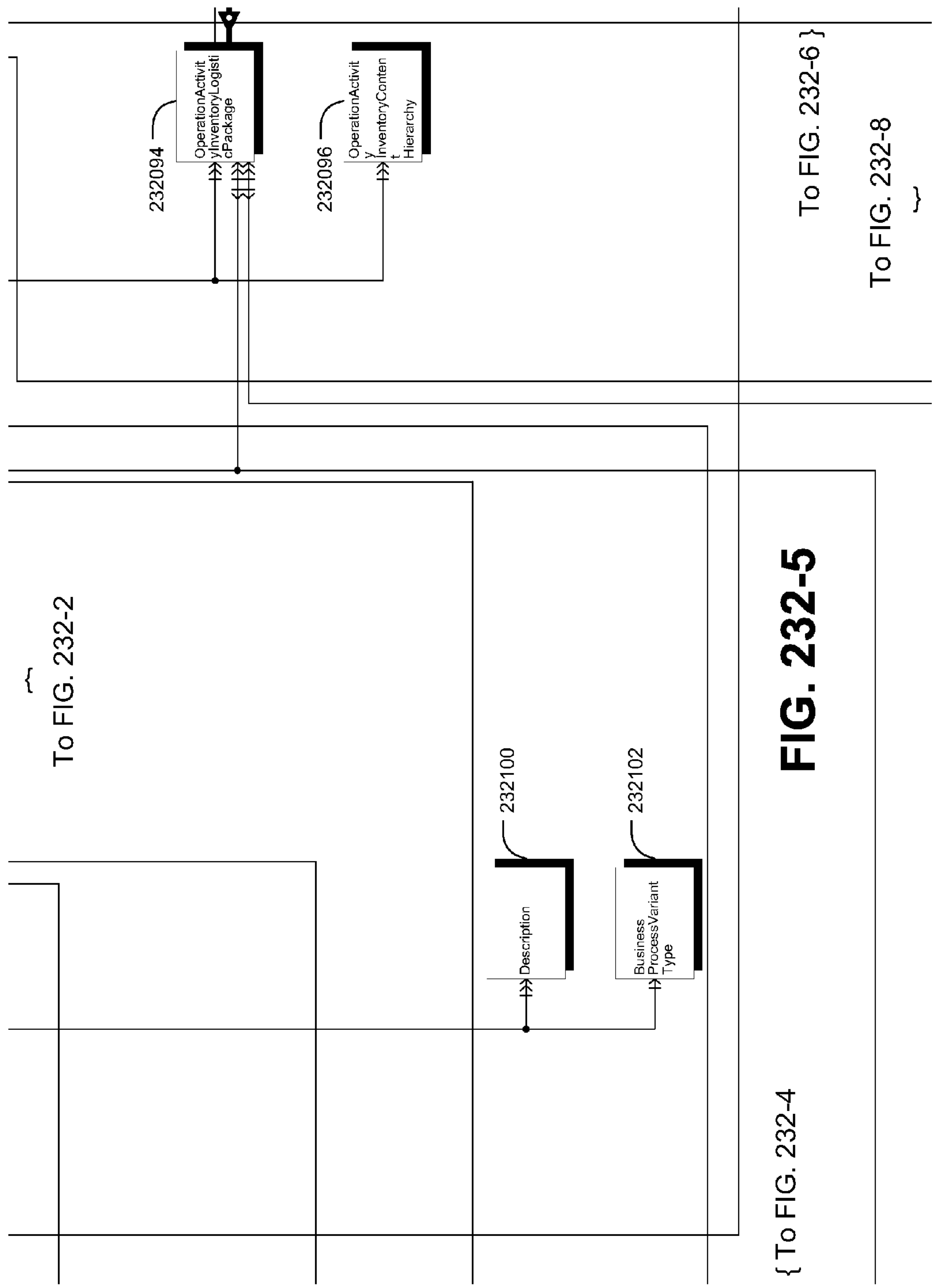
Figures 6, 232:
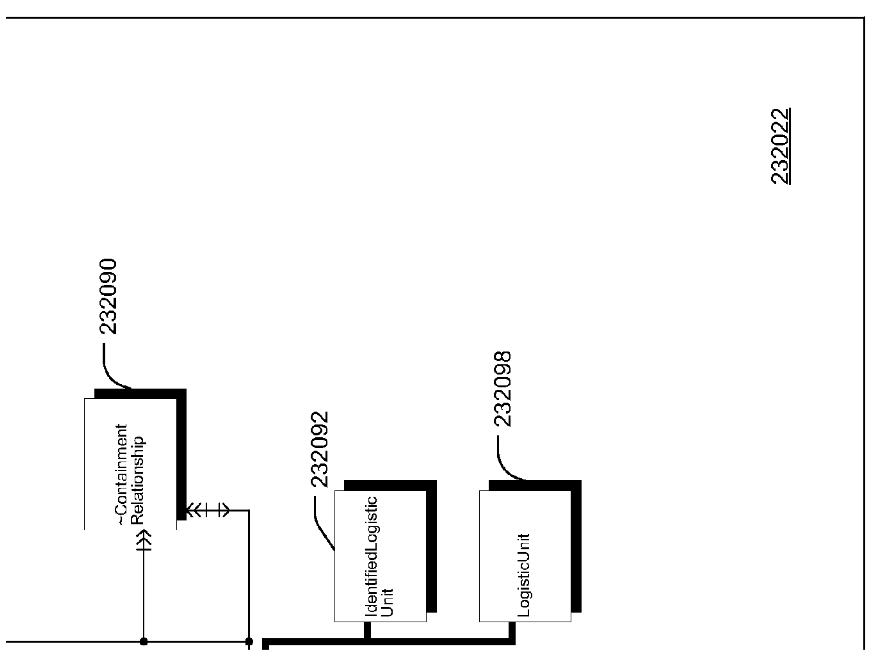
Figures 7, 232:
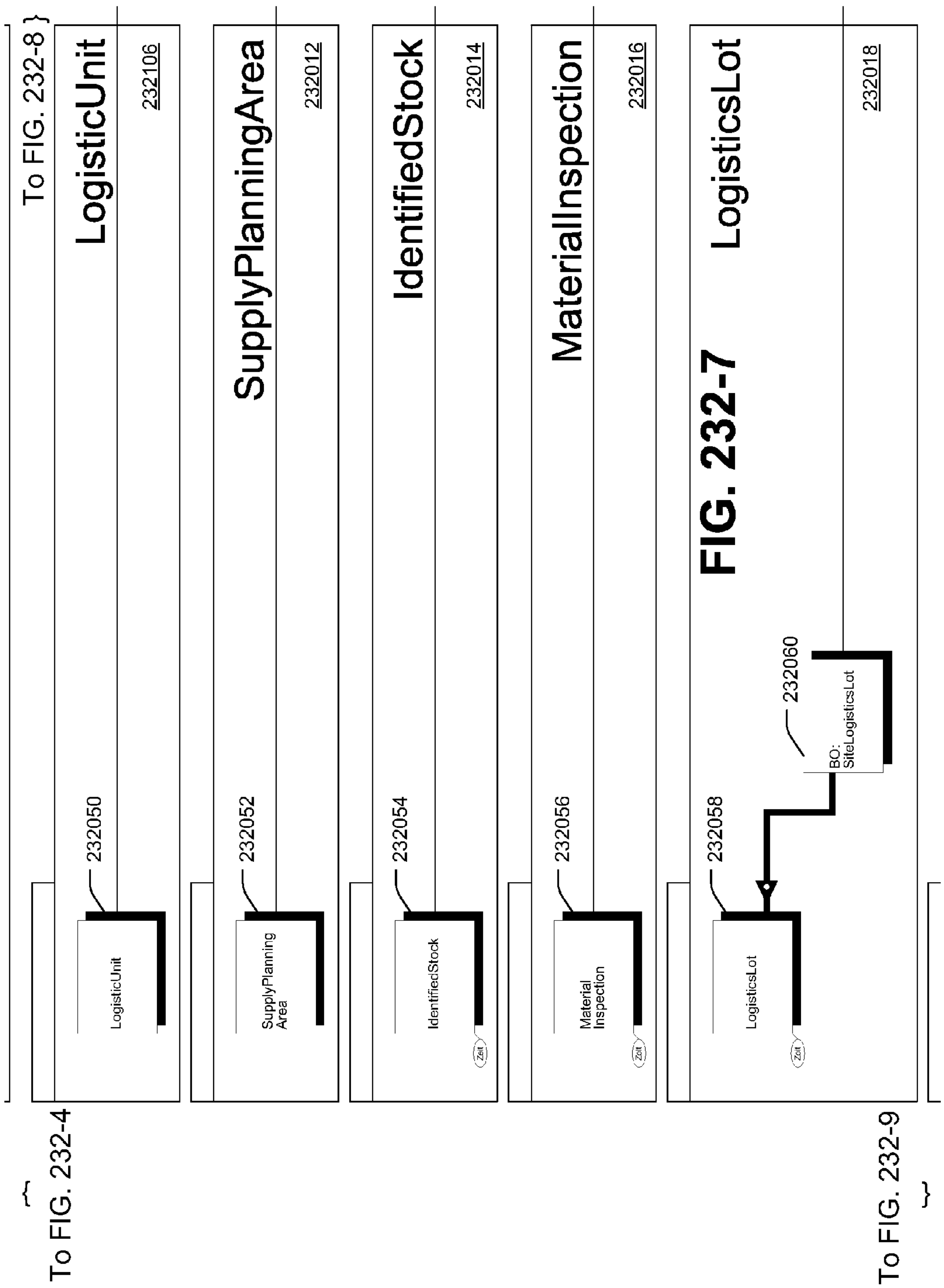
Figures 8, 232:
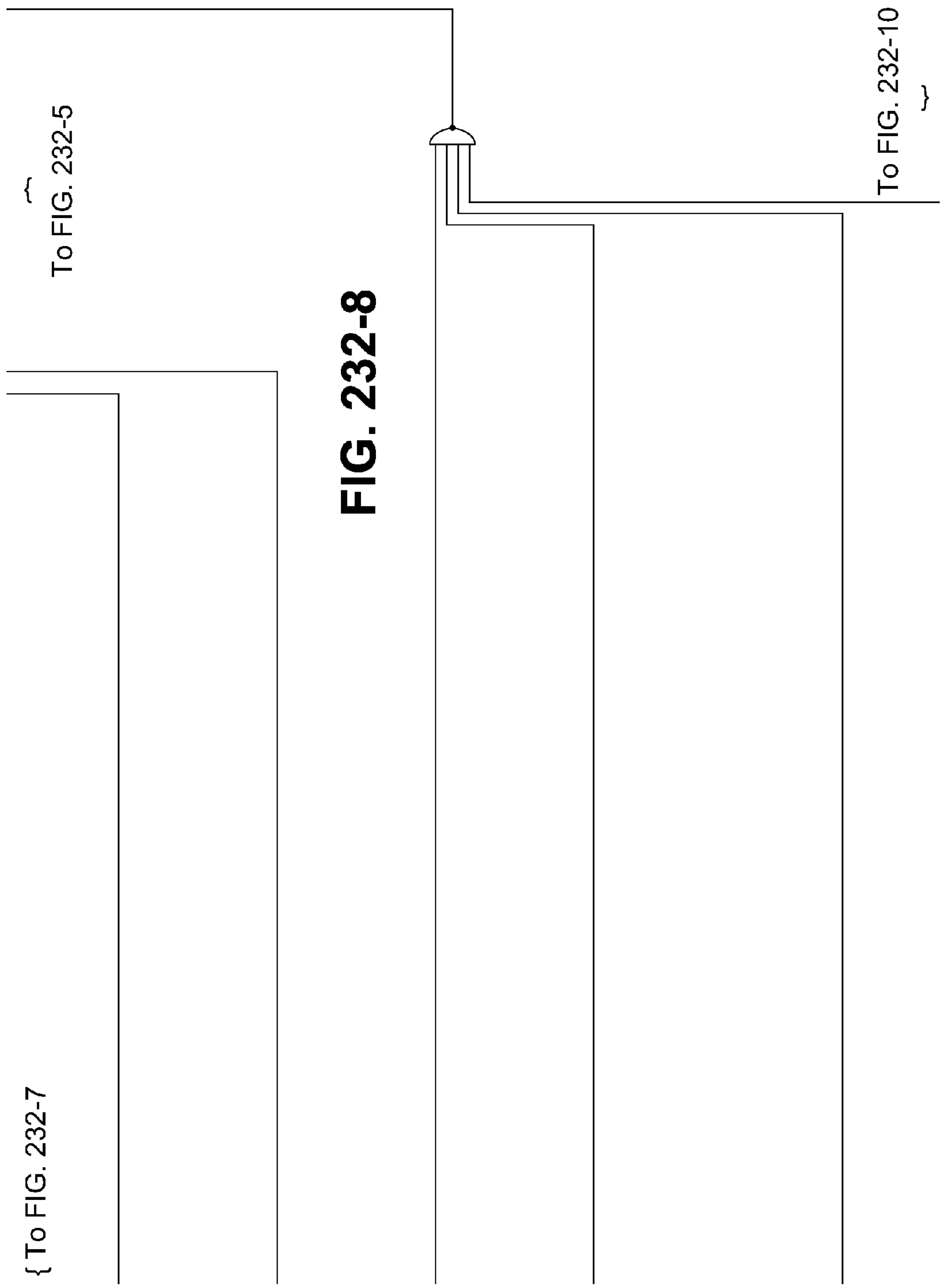
Figures 9, 232:
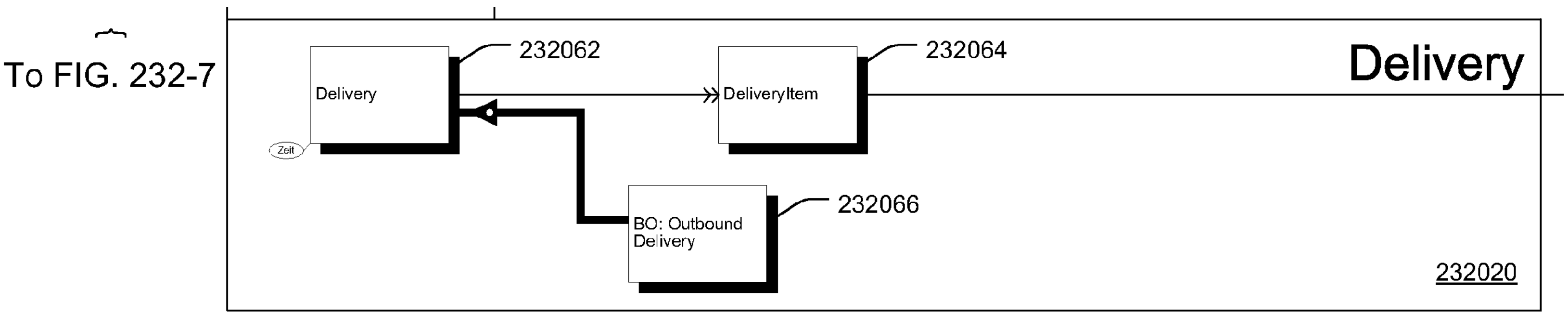
Figures 1, 233:
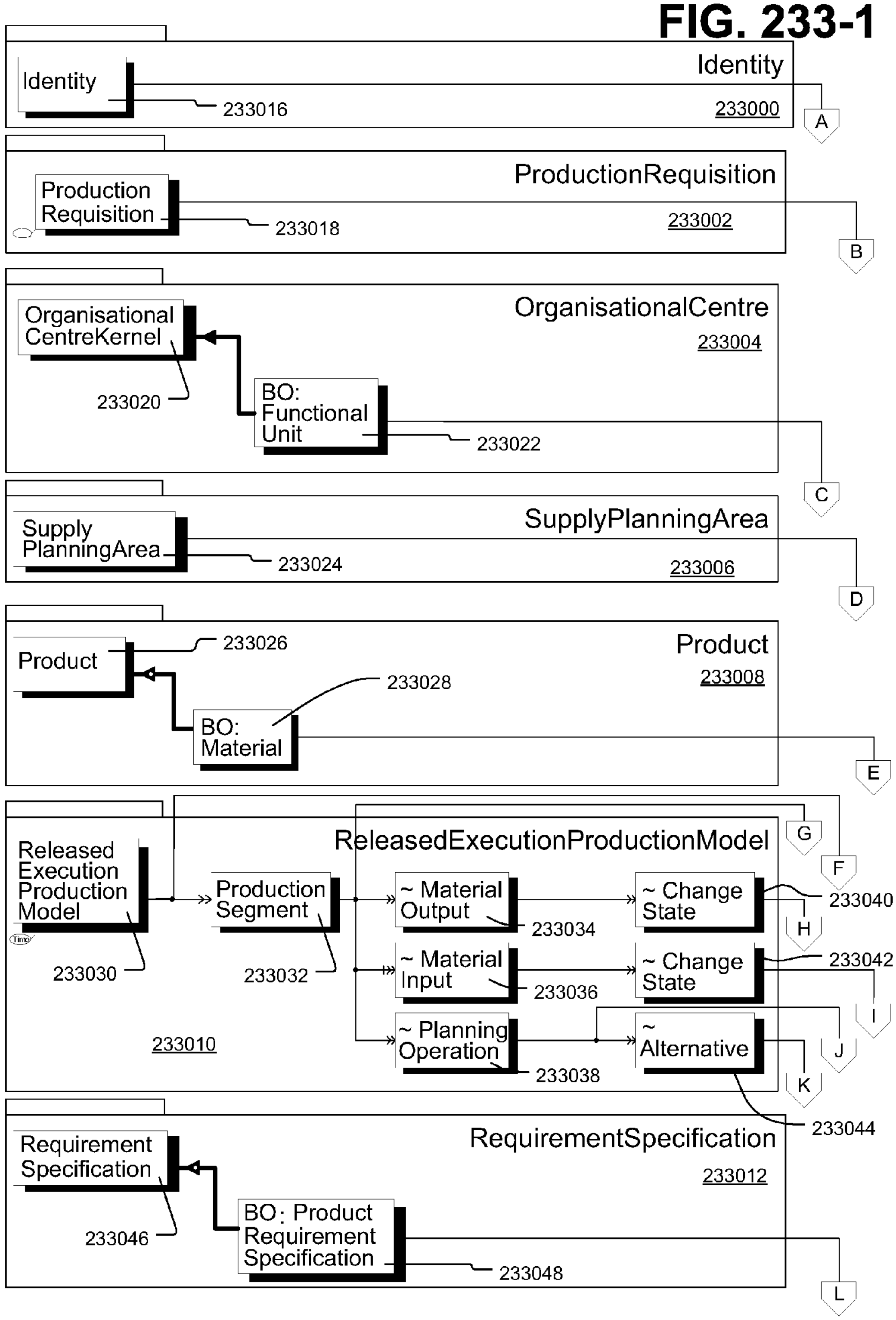
Figures 2, 233:
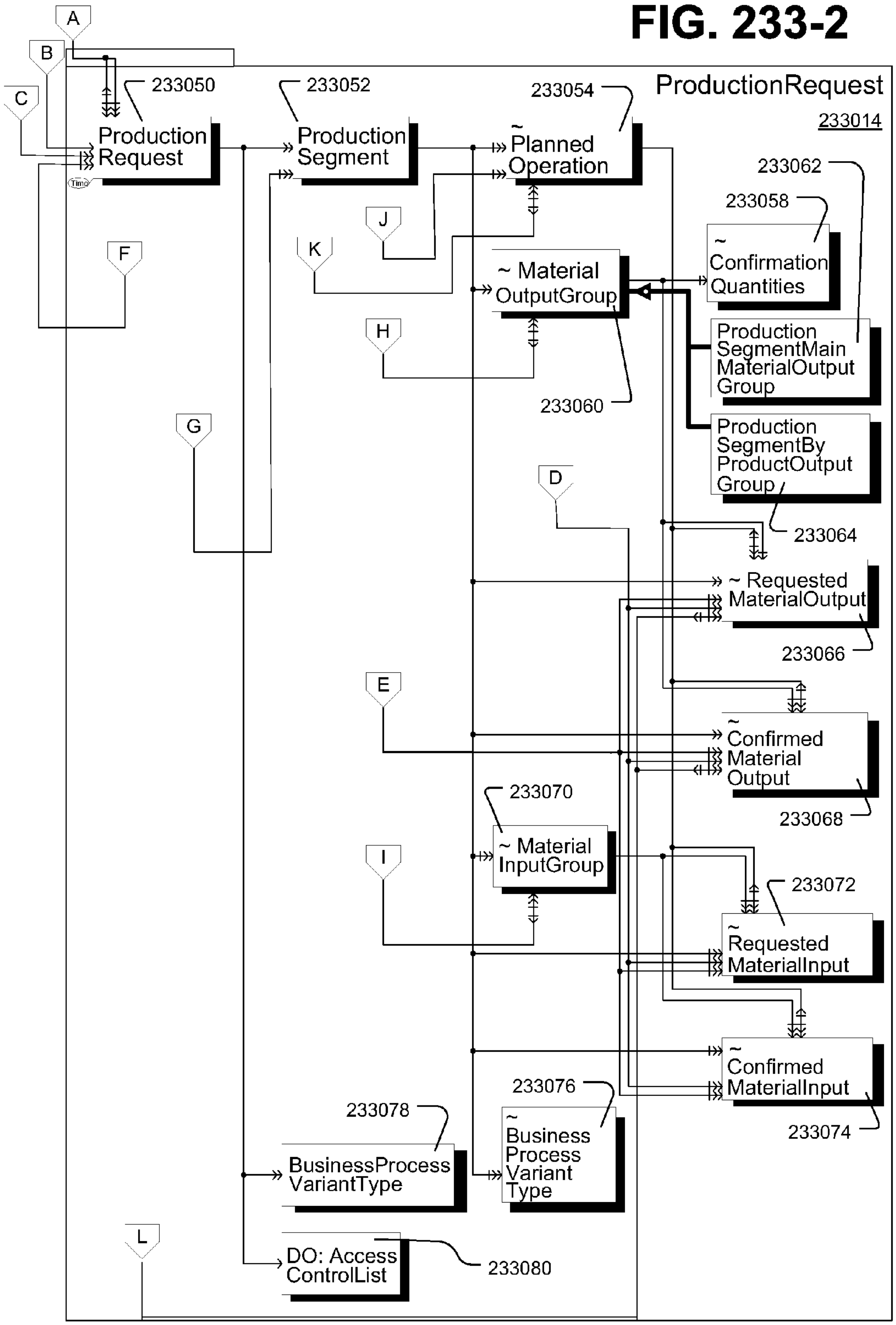
Figures 1, 237:
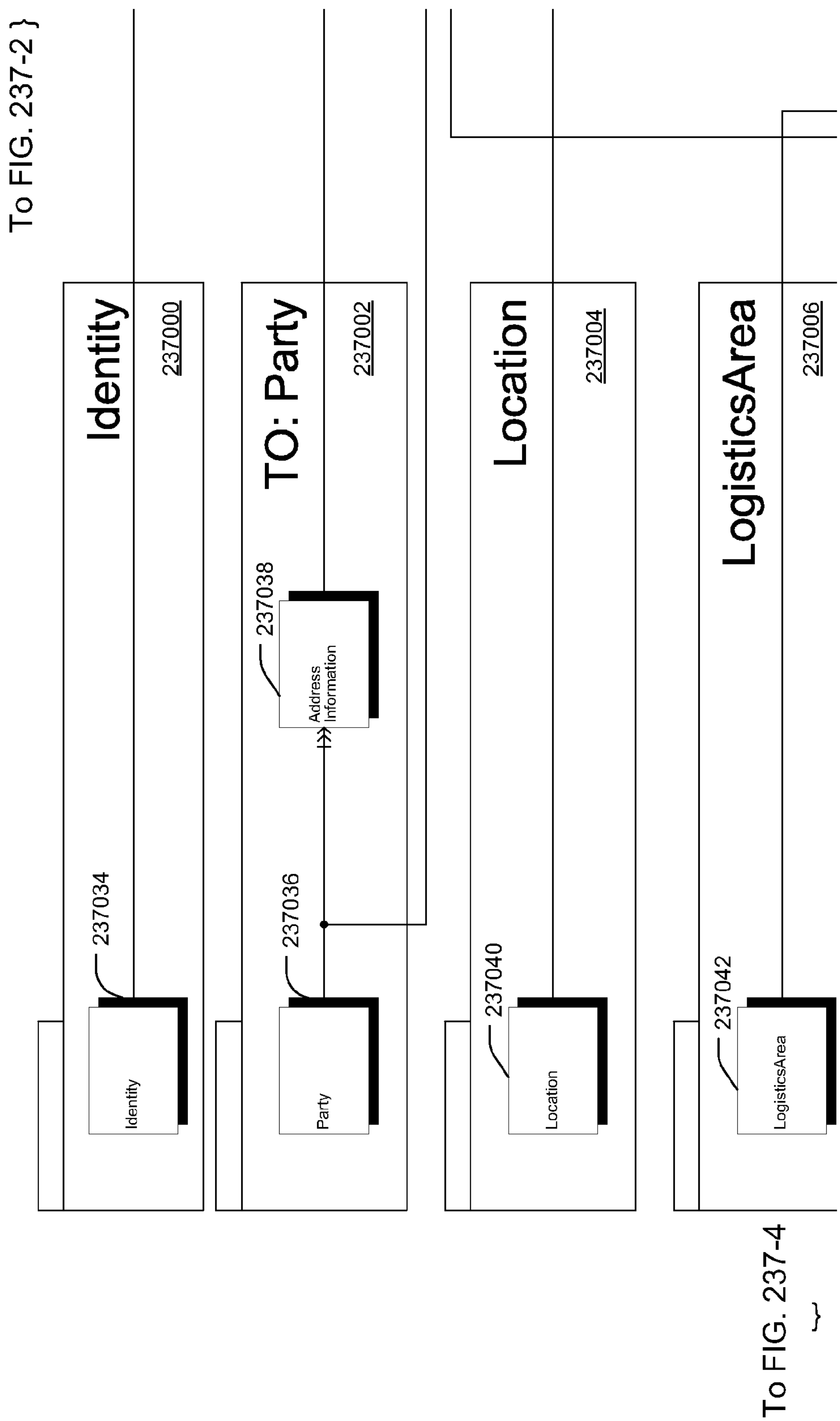
Figures 2, 237:
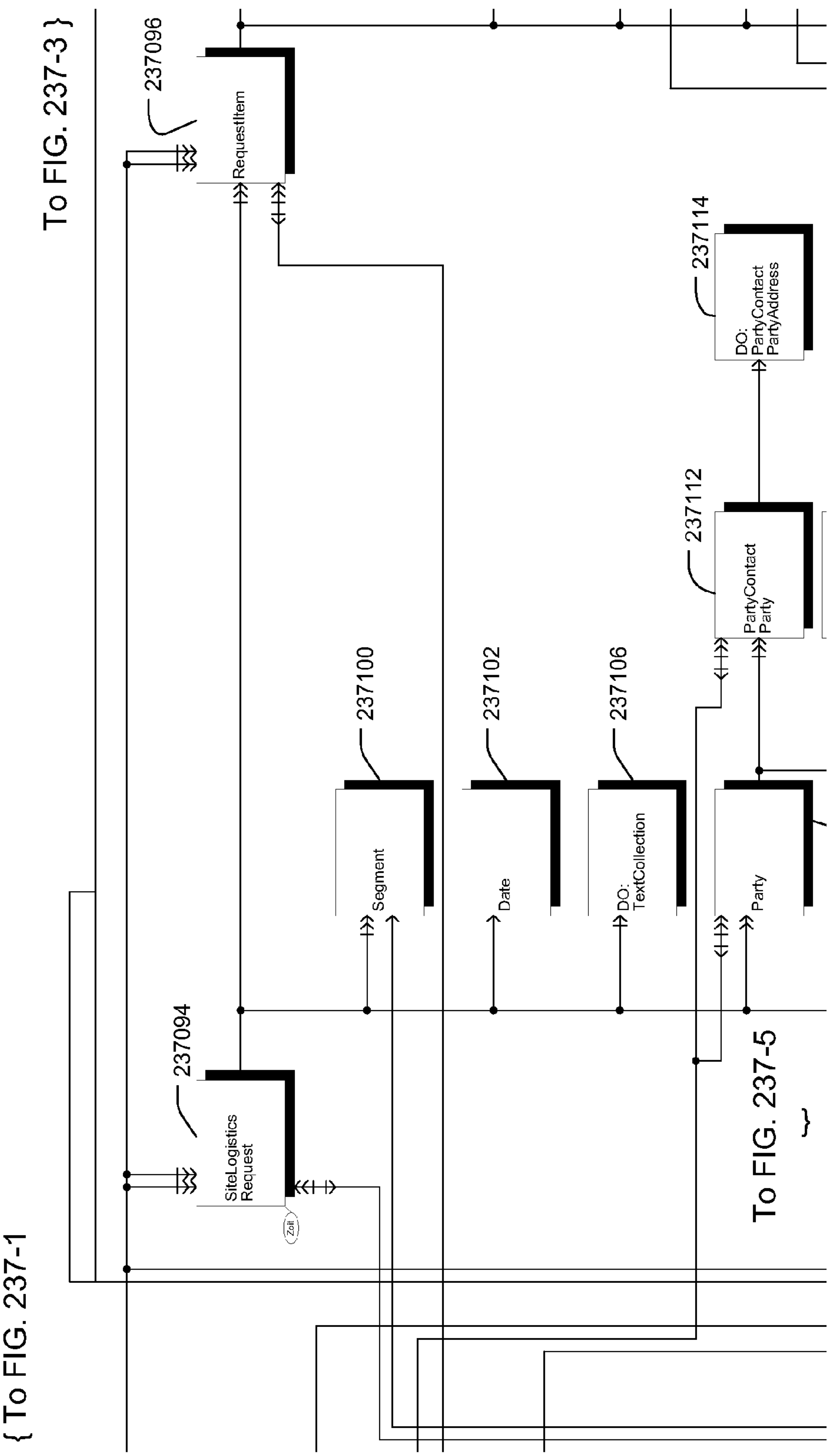
Figures 3, 237:
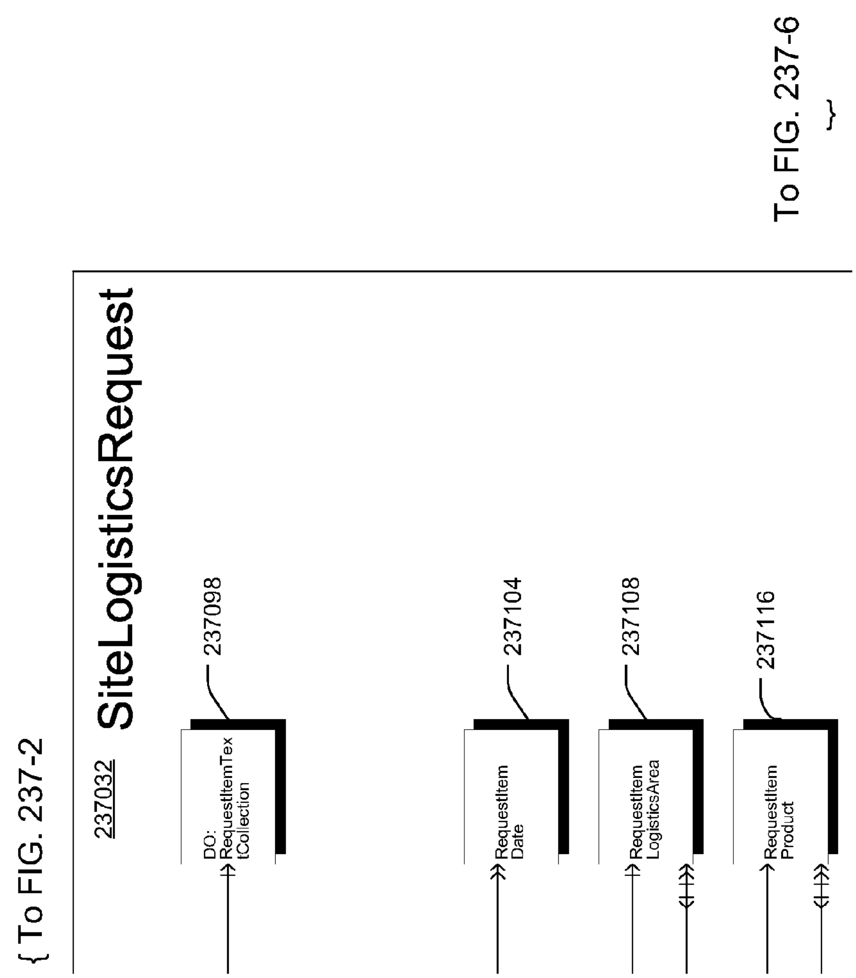
Figures 4, 237:
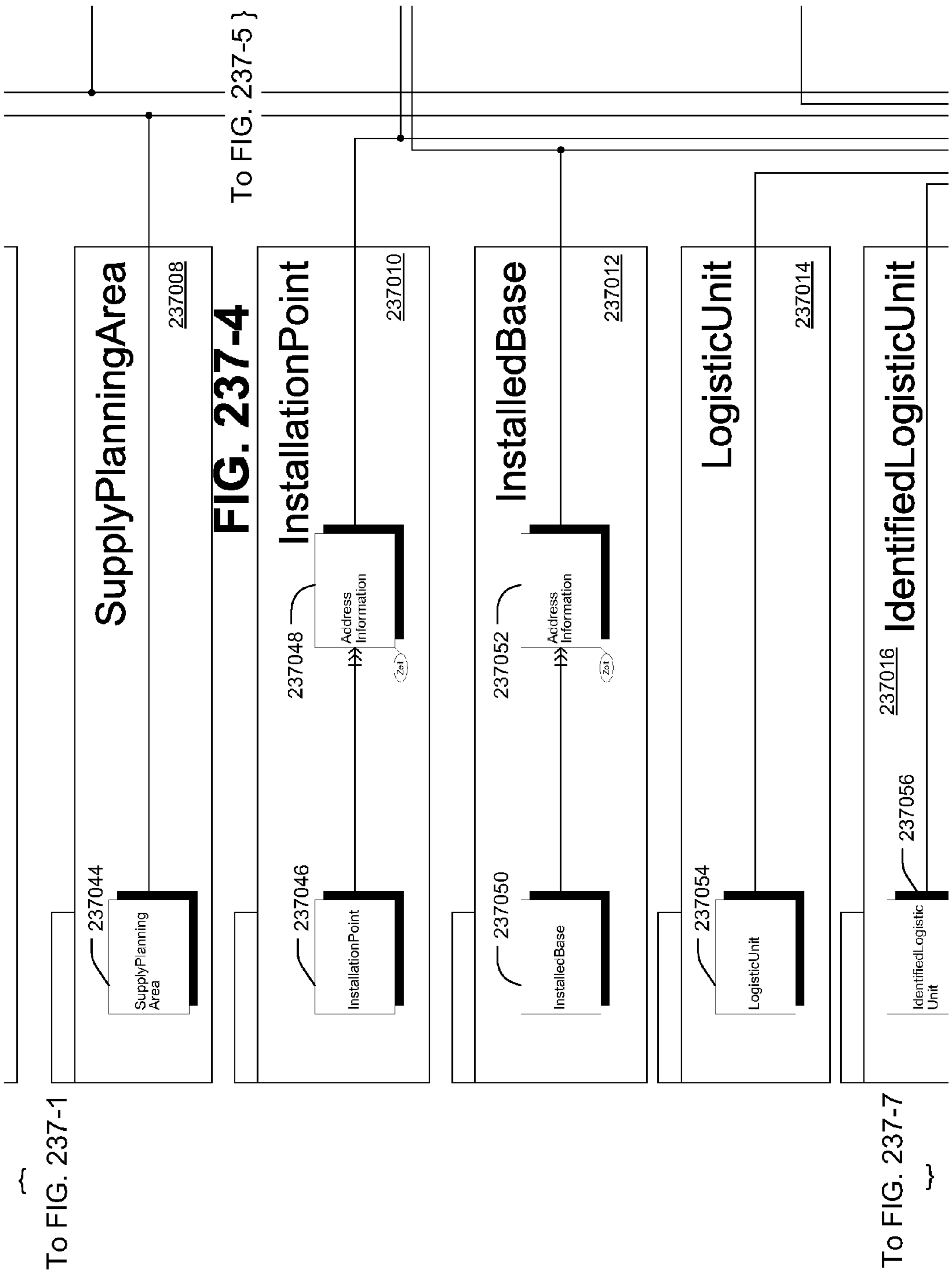
Figures 5, 237:
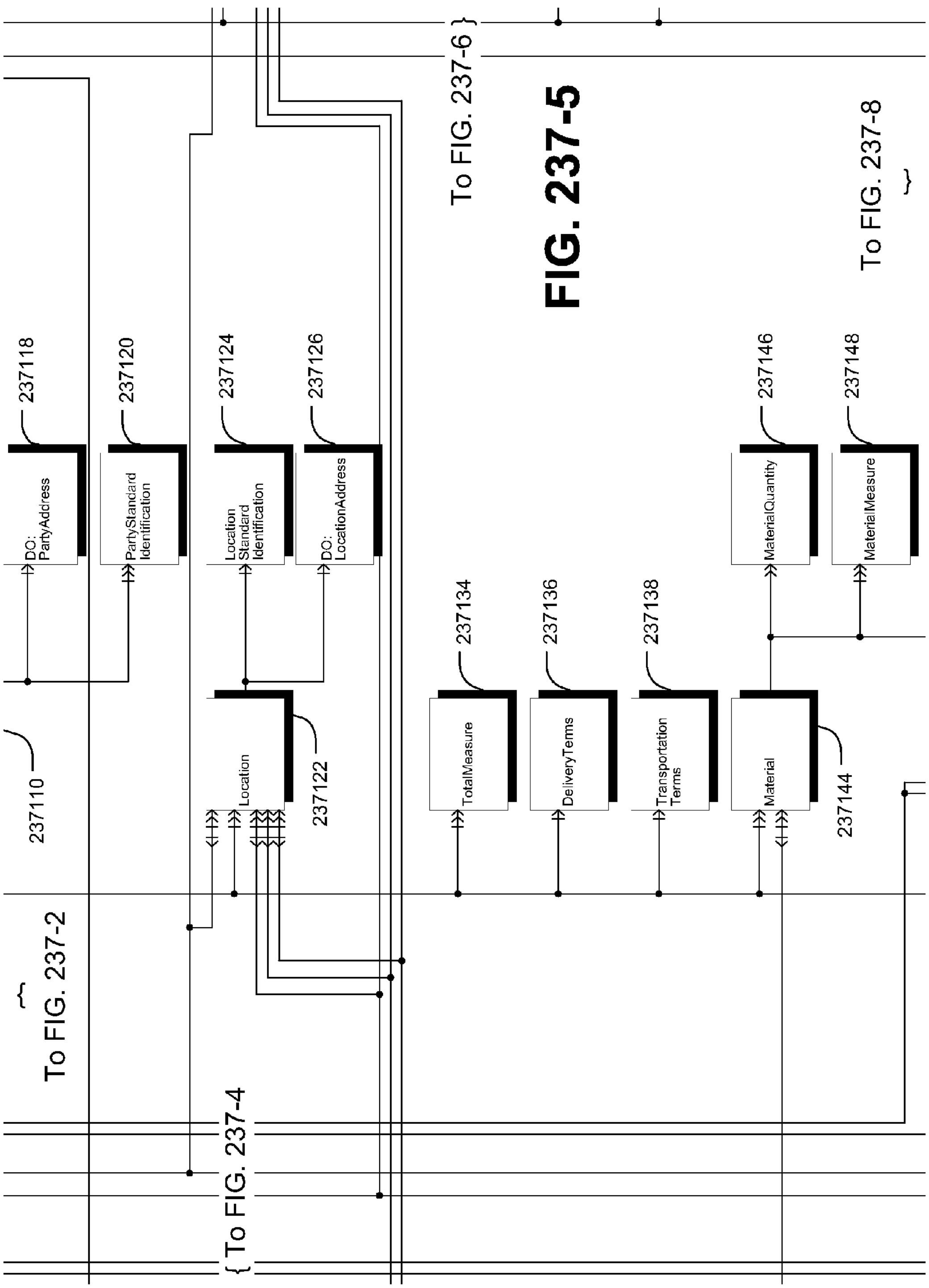
Figures 6, 237:
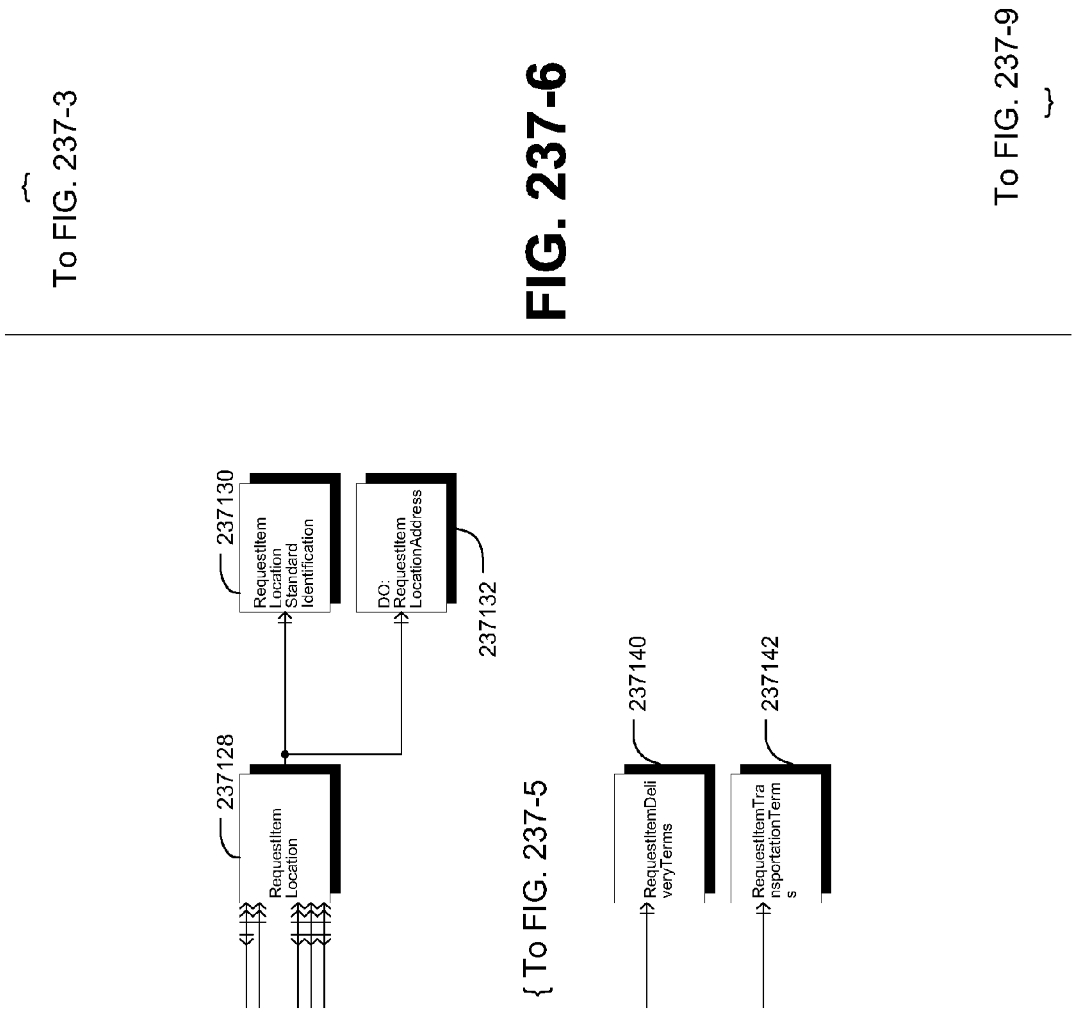
Figures 7, 237:
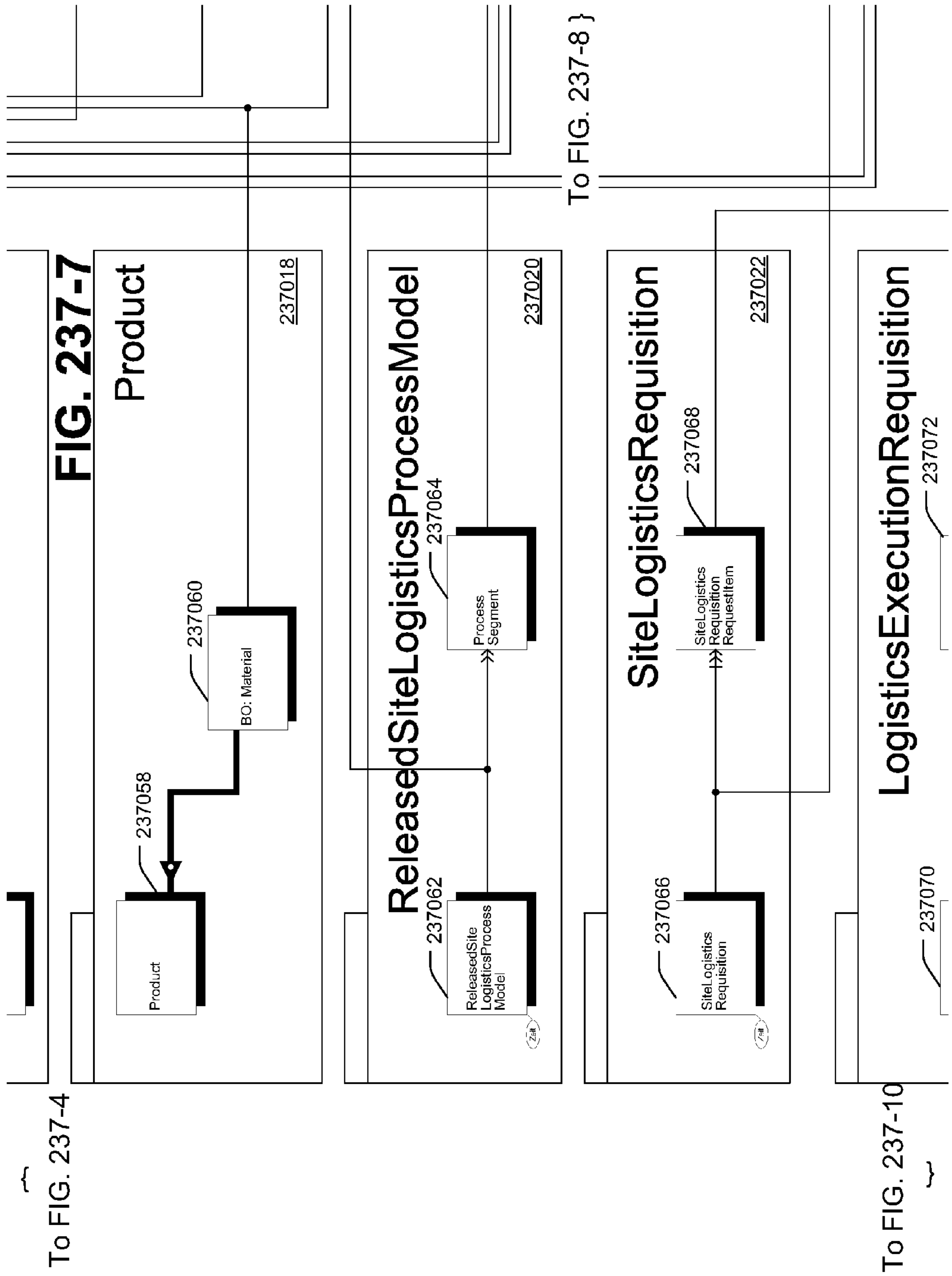
Figures 8, 237:
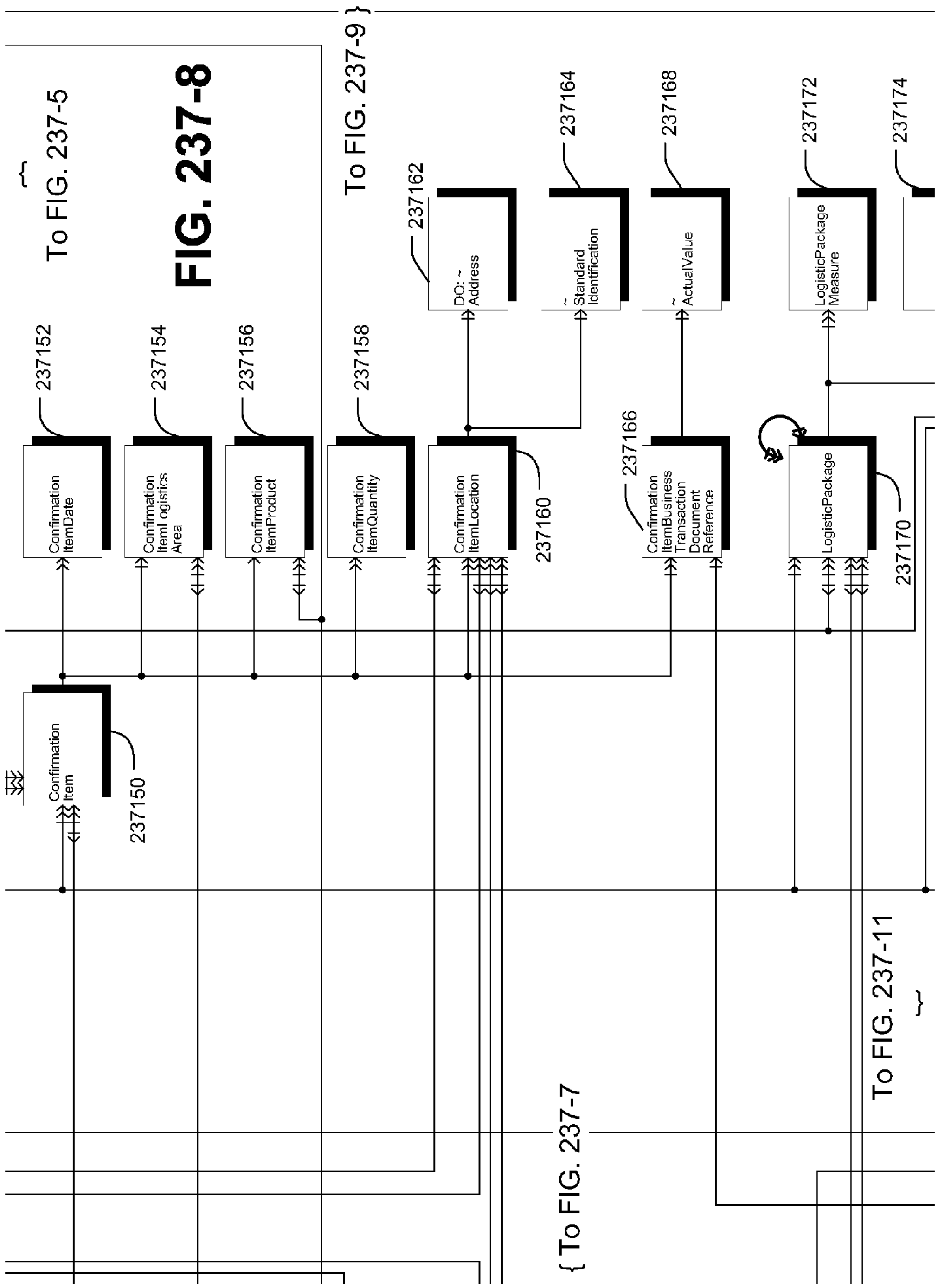
Figures 10, 237:
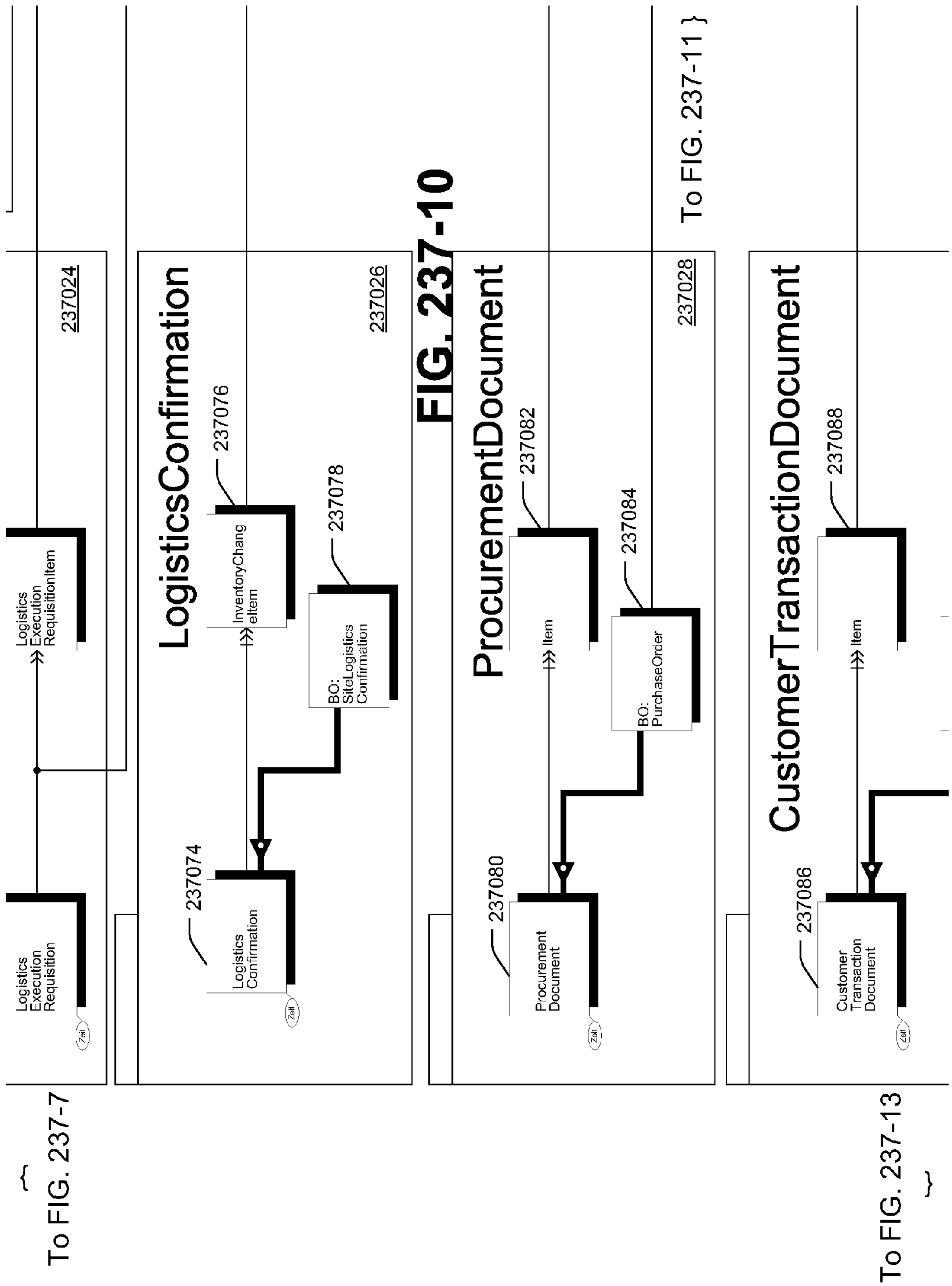
Figures 11, 237:
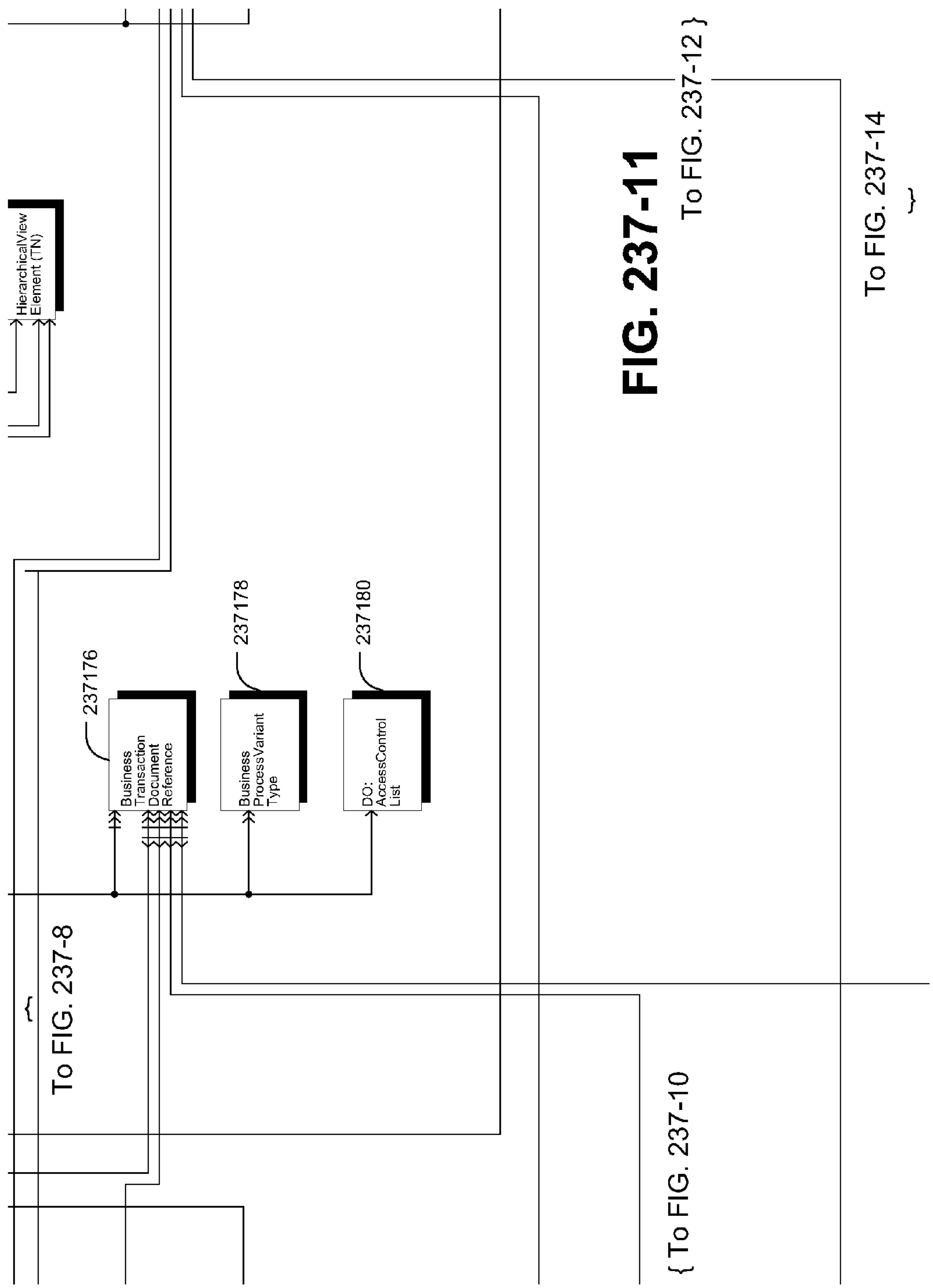
Figures 12, 237:
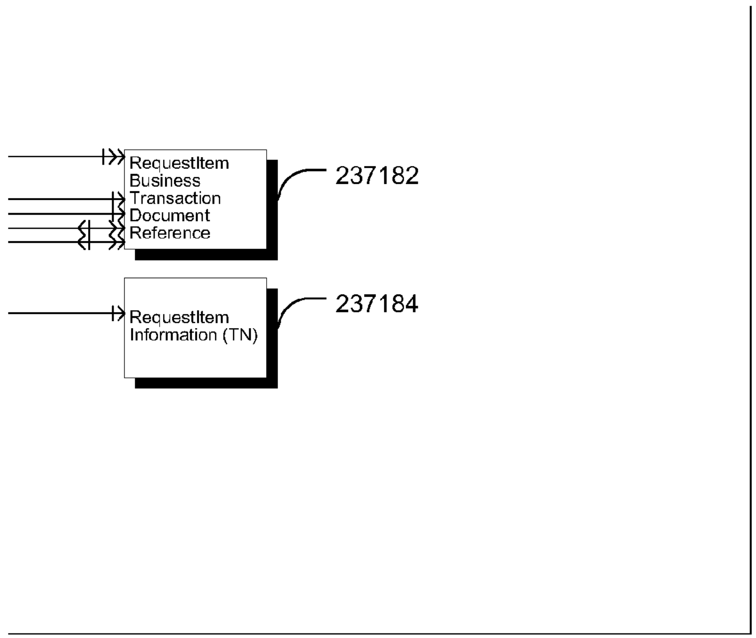
Figures 13, 237:
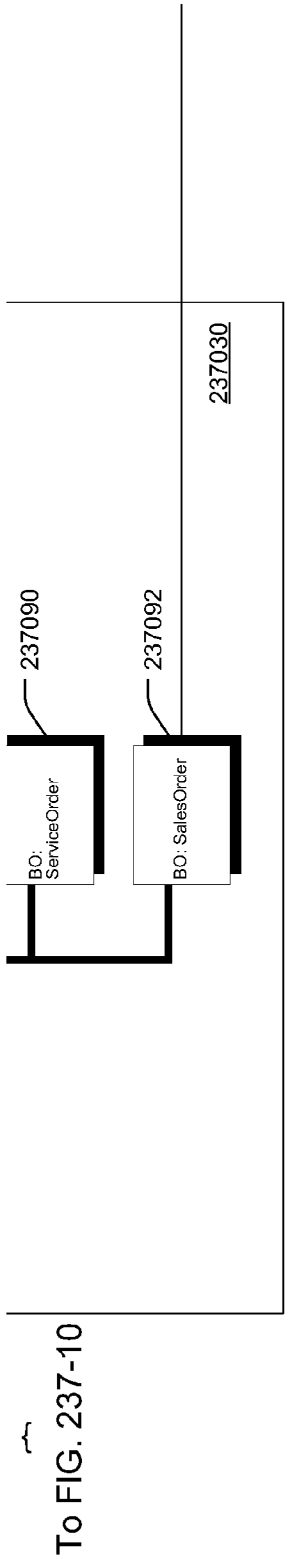
Figures 1, 238:
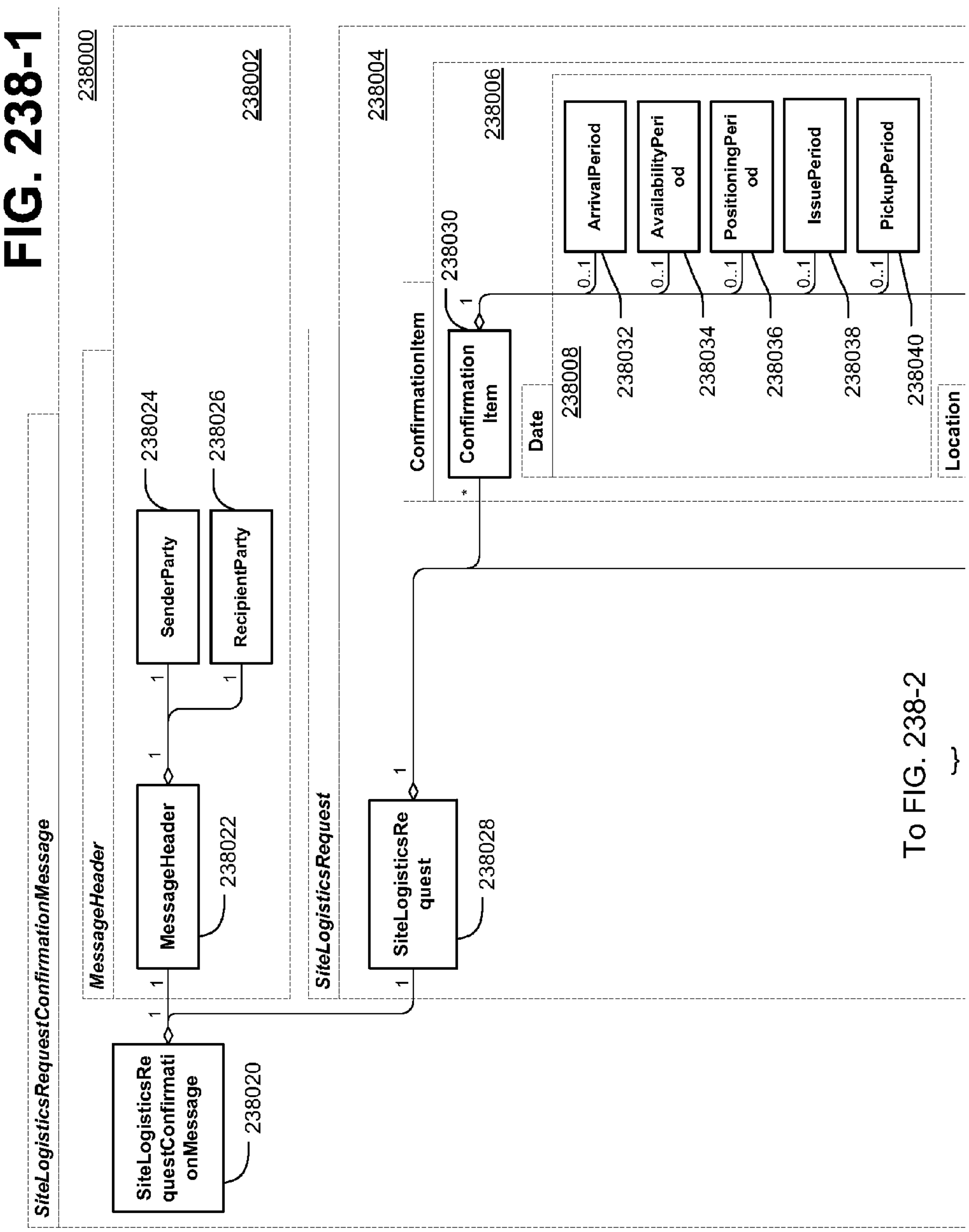
Figures 2, 238:
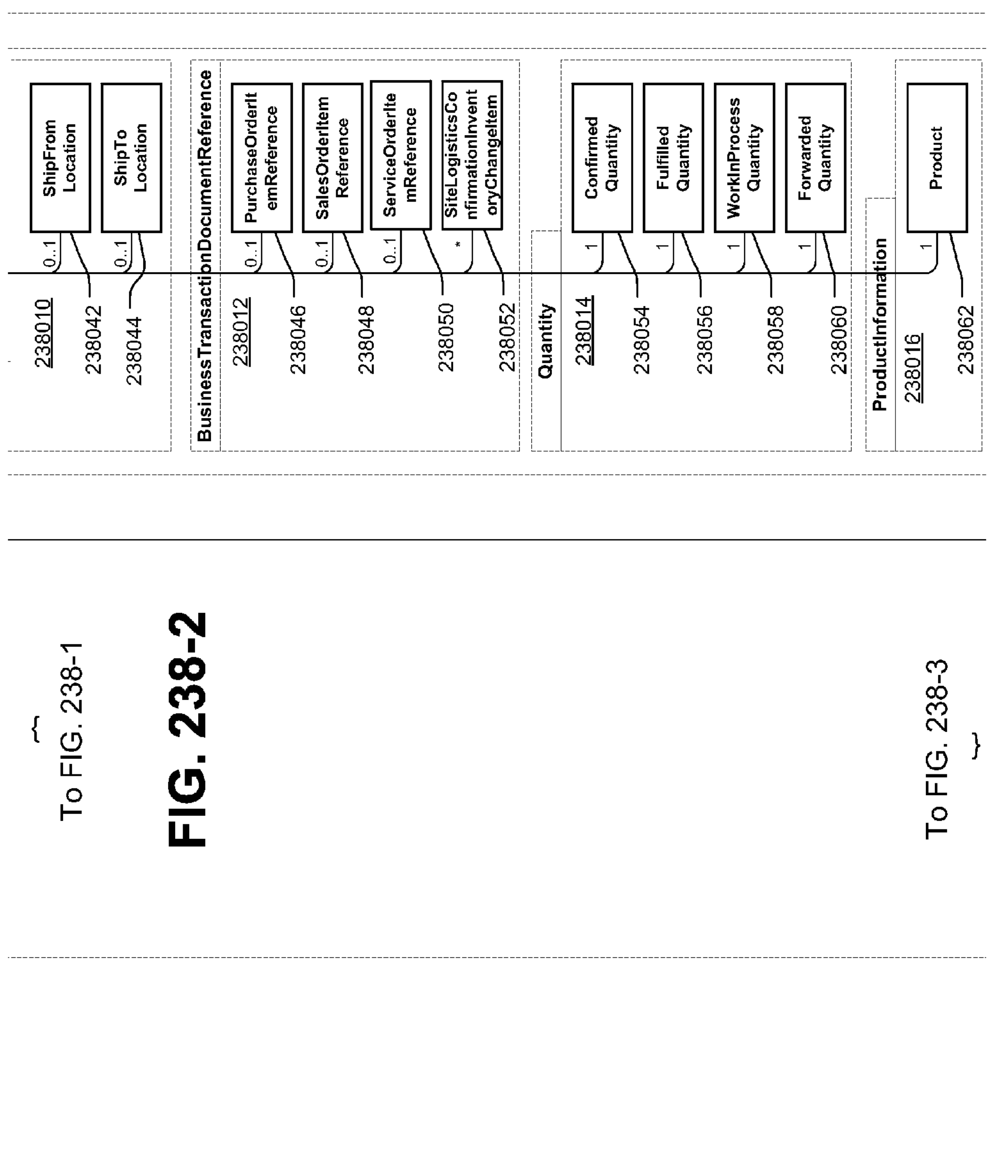
Figures 3, 238:
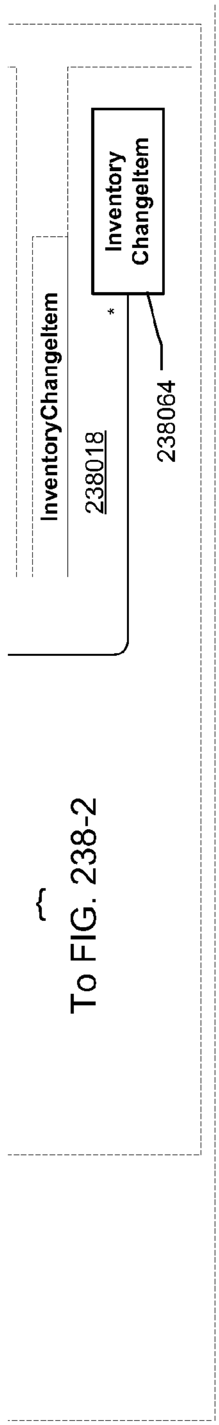
Figures 1, 239:
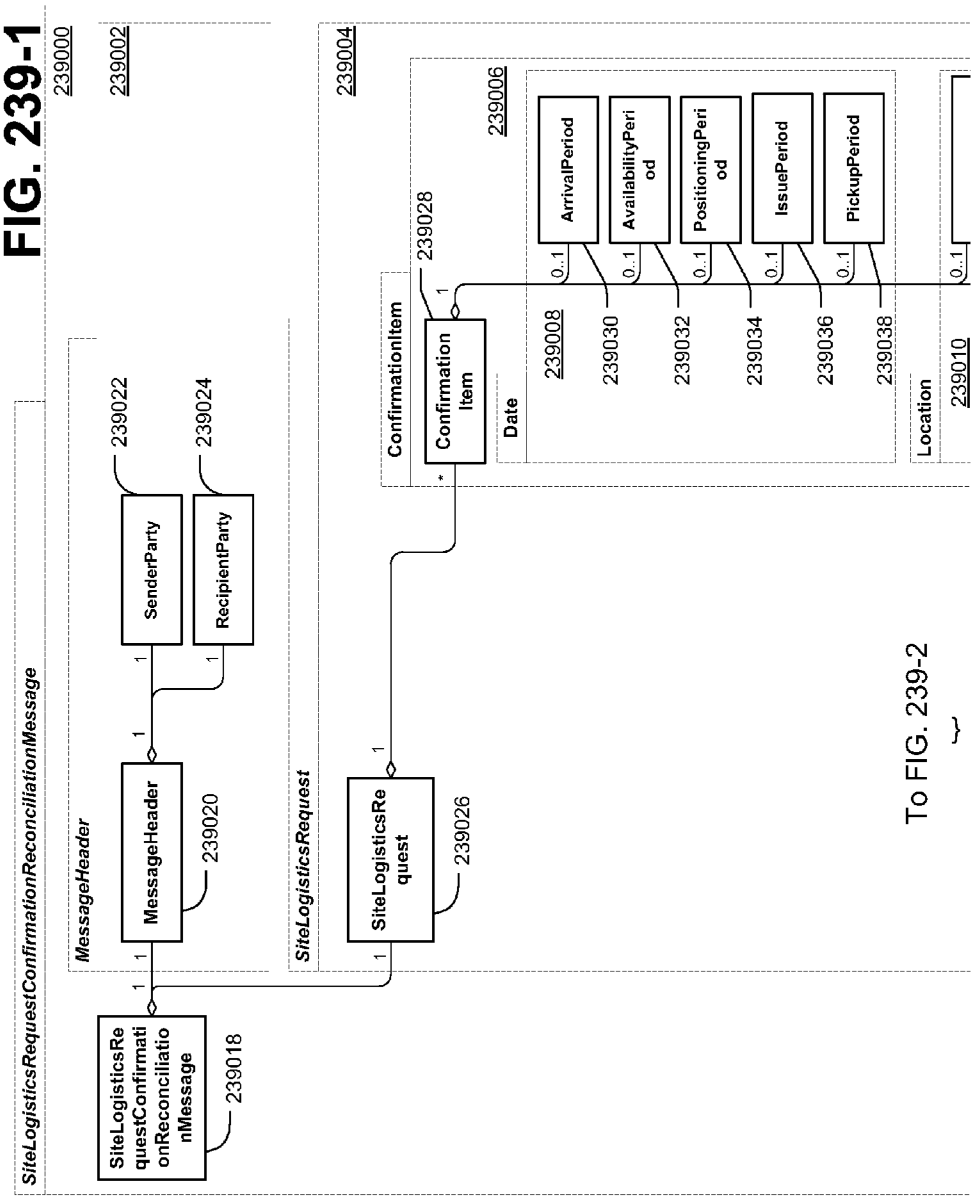
Figures 2, 239:
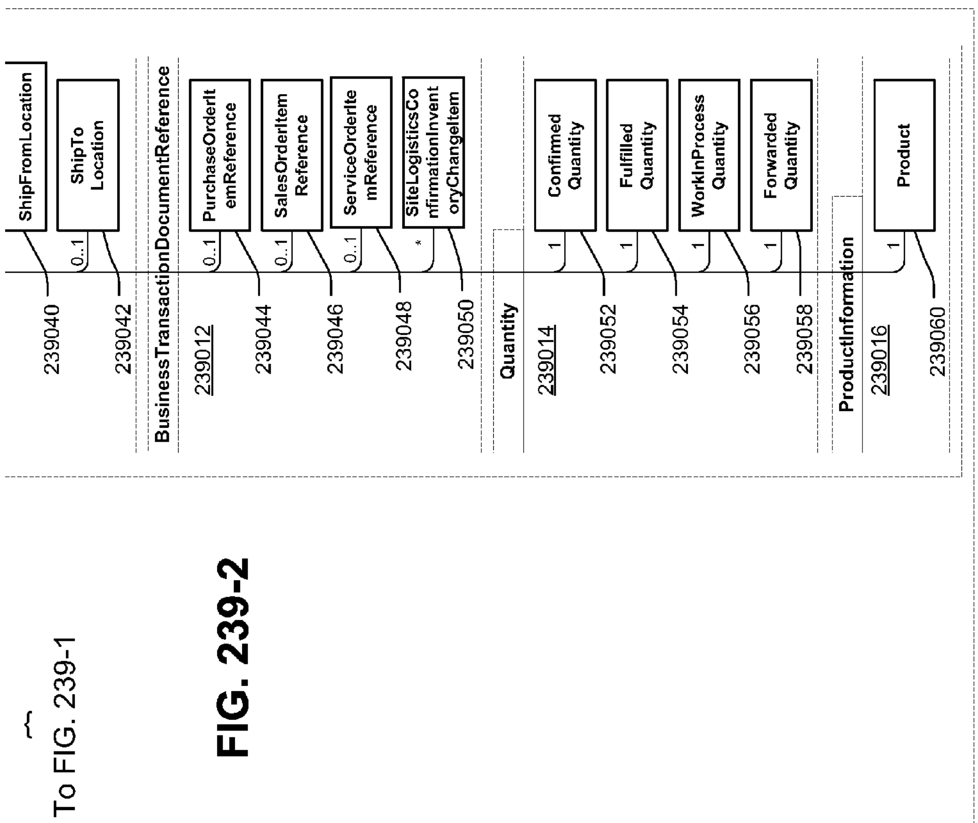
Figures 1, 240:
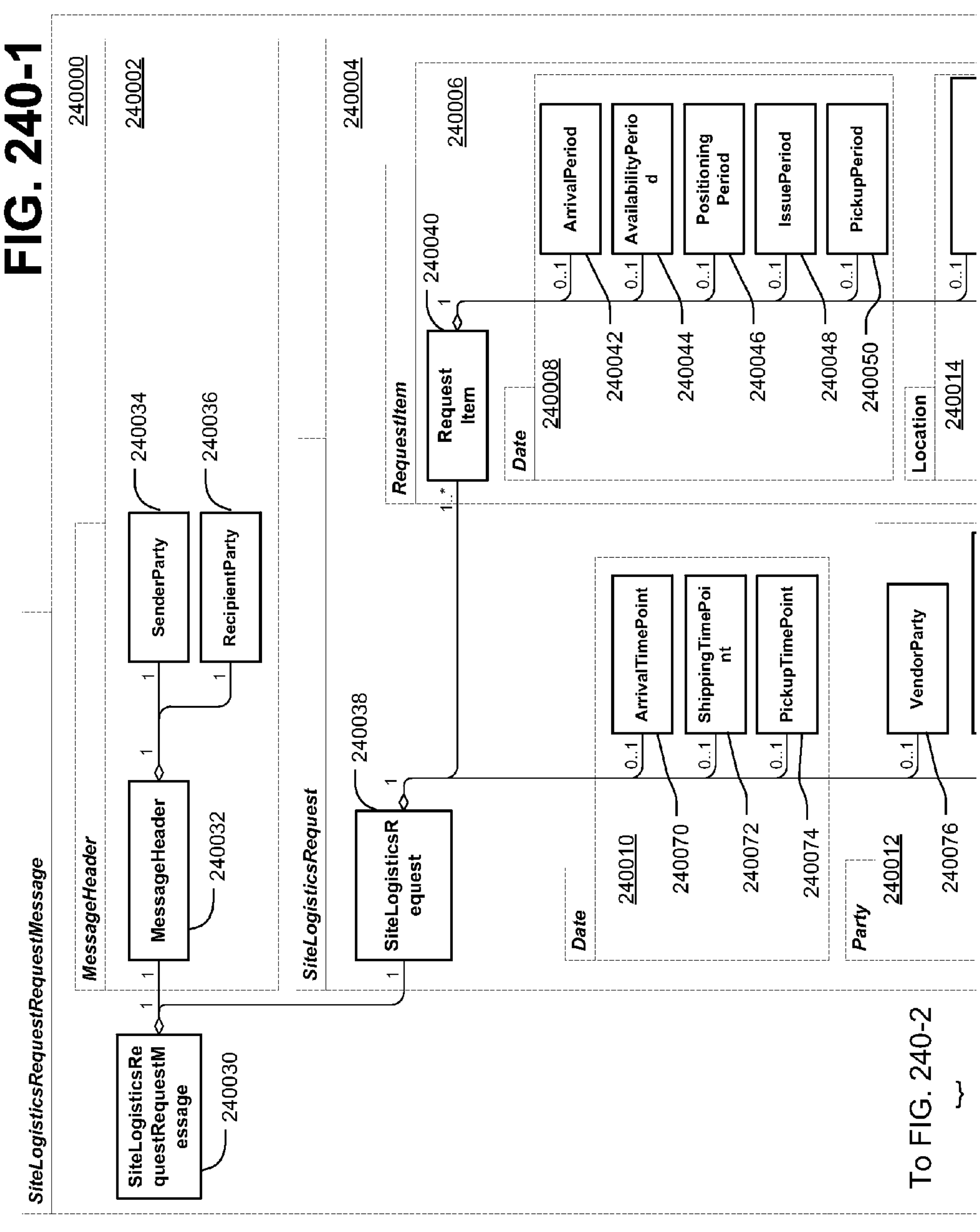
Figures 2, 240:
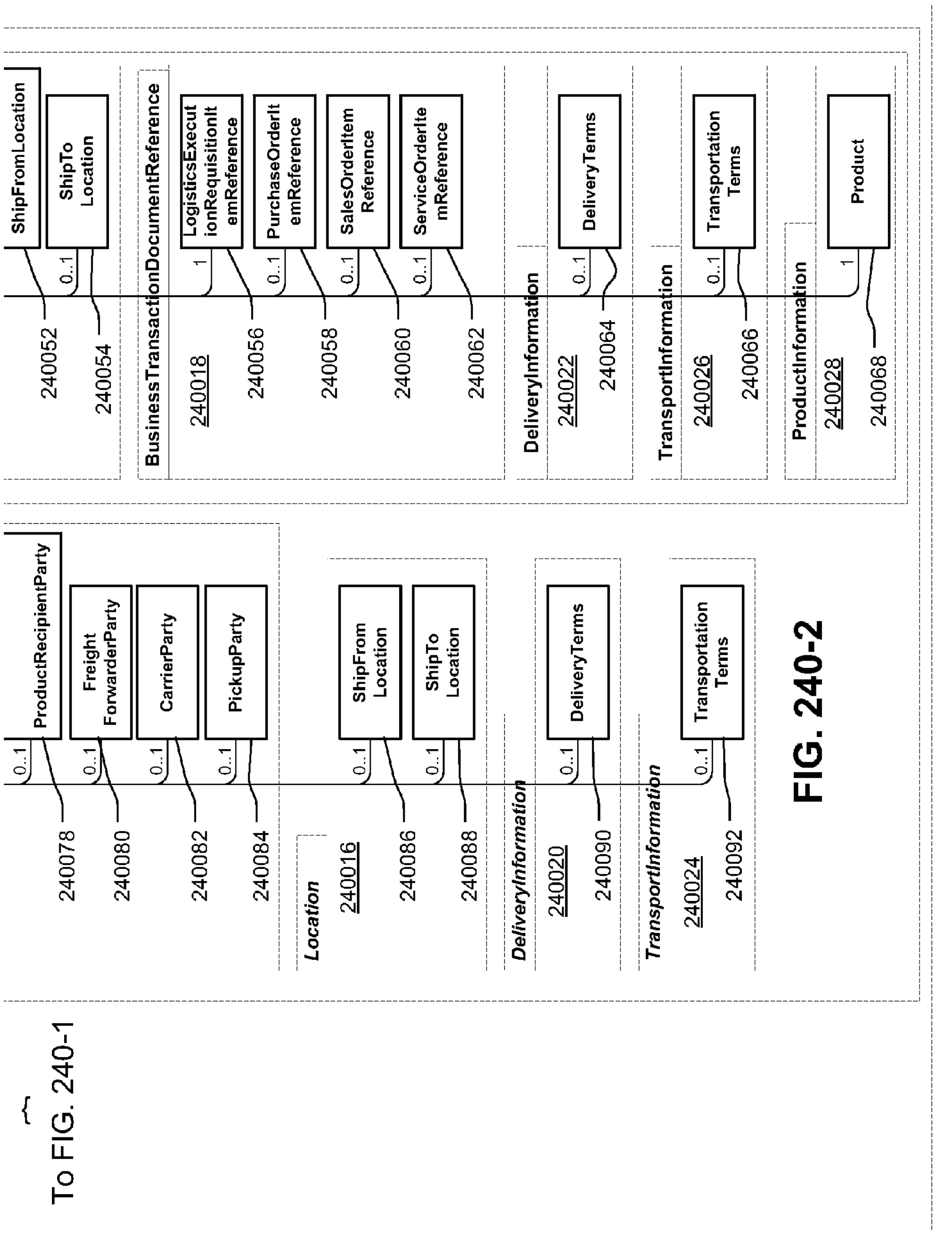
Figures 1, 244:
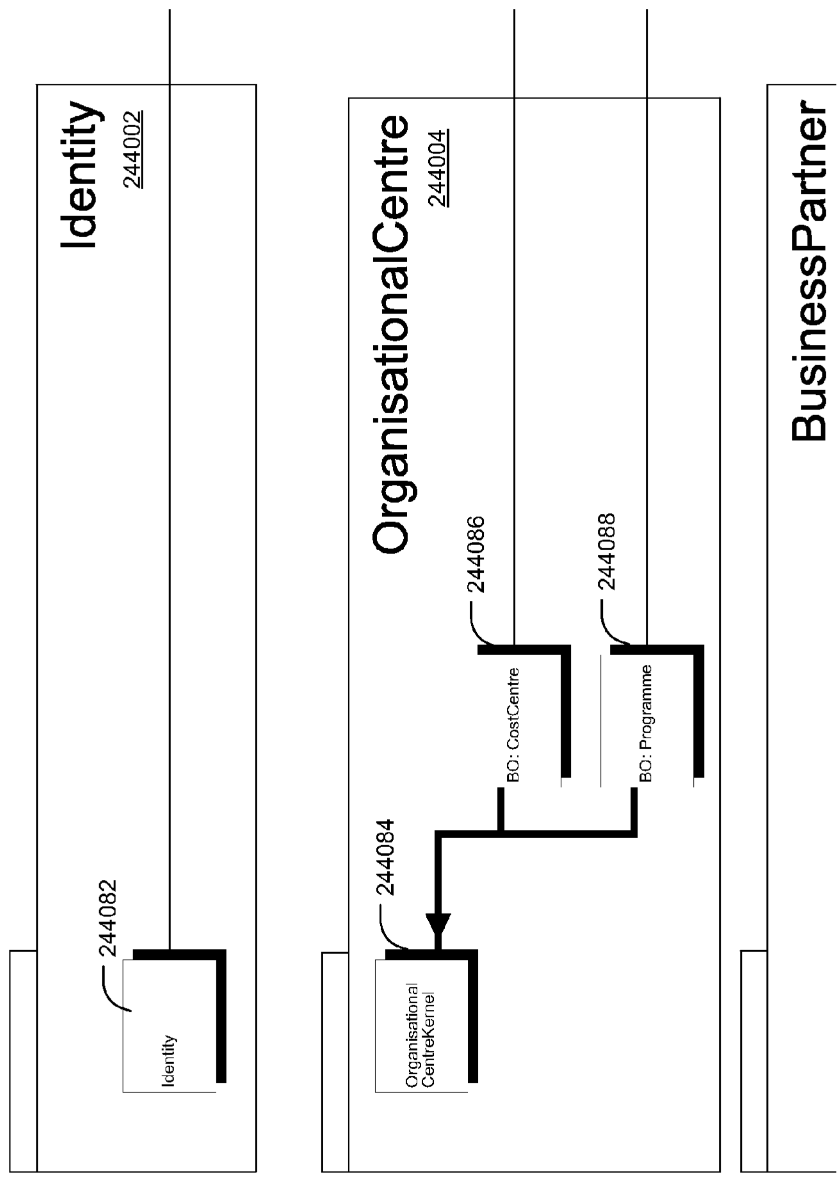
Figures 2, 244:
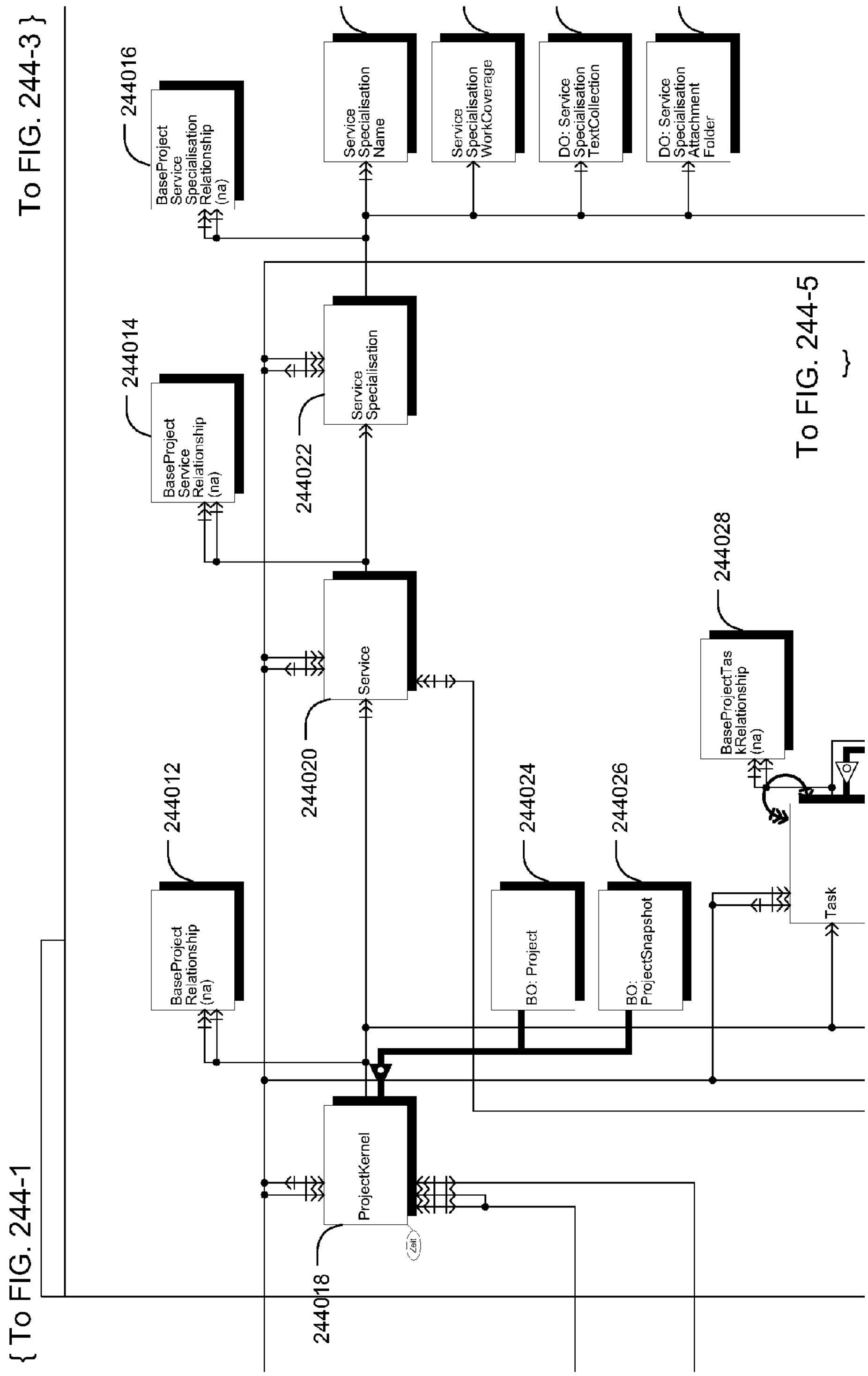
Figures 3, 244:
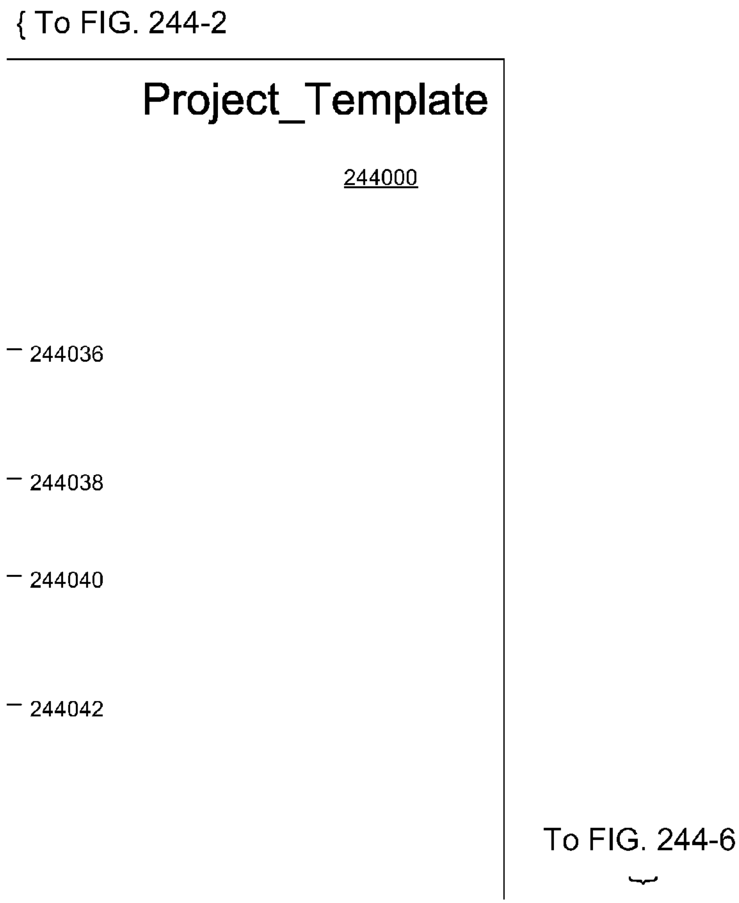
Figures 4, 244:
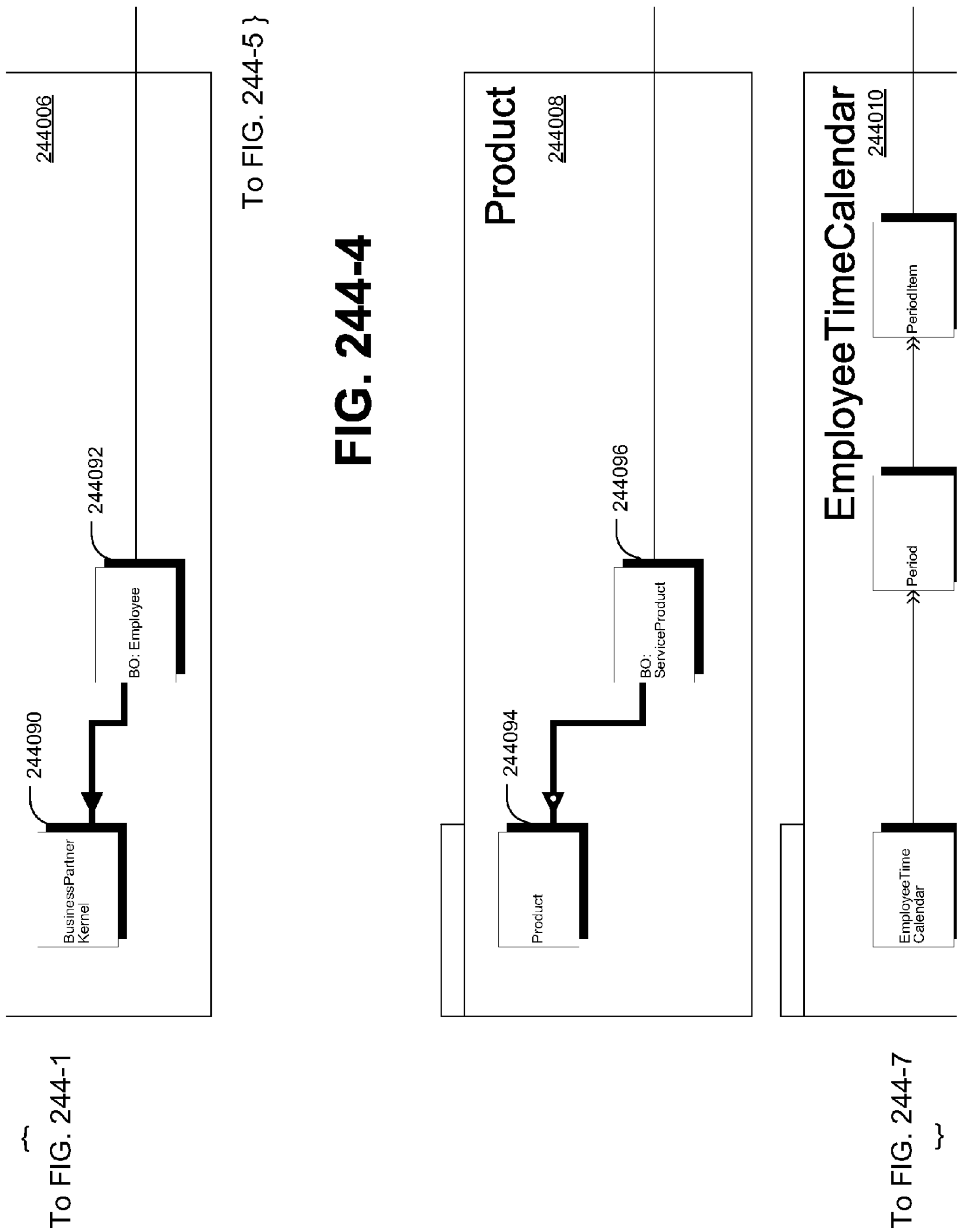
Figures 5, 244:
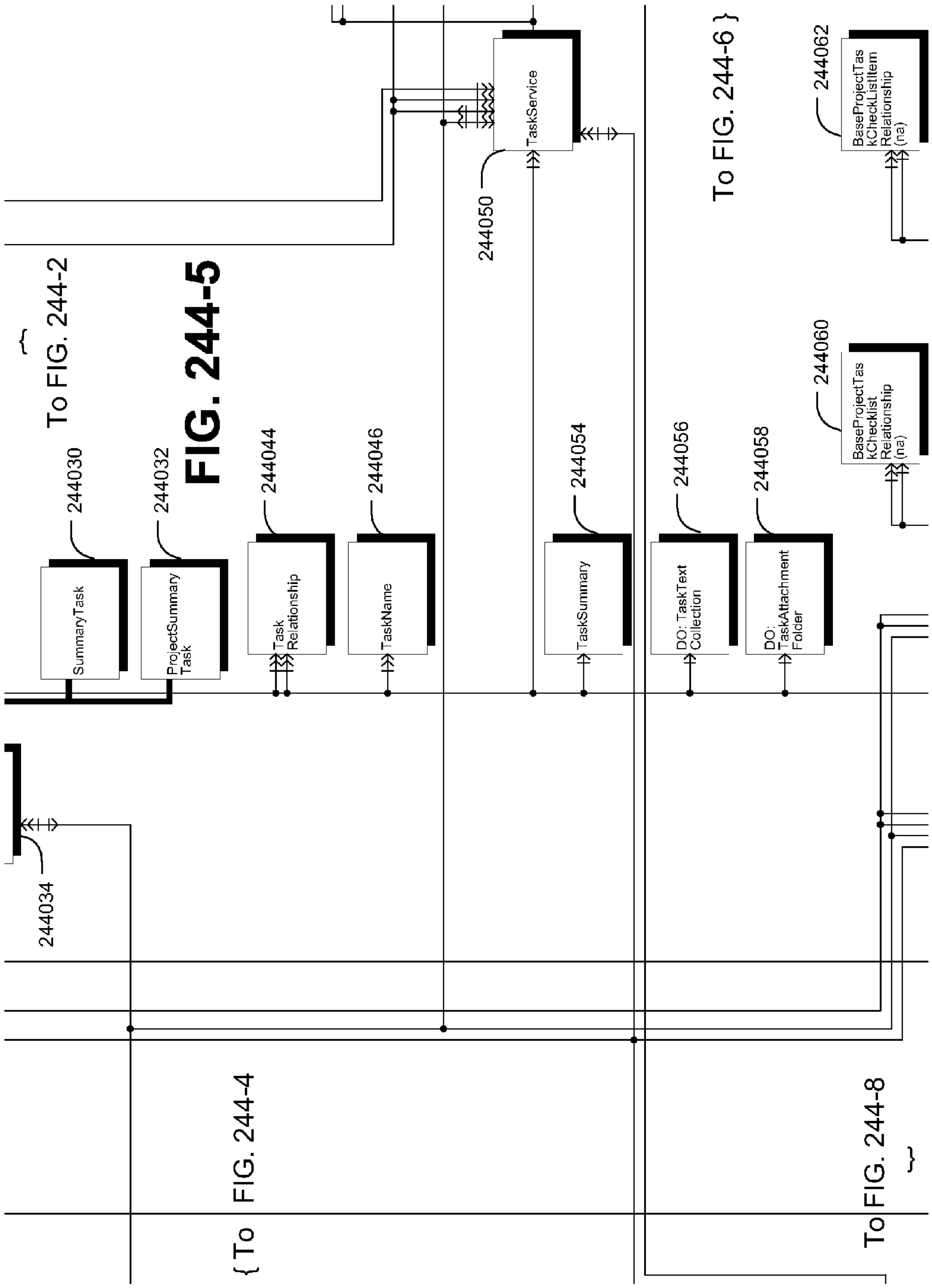
Figures 6, 244:
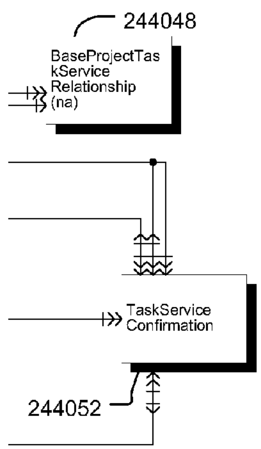
Figures 7, 244:
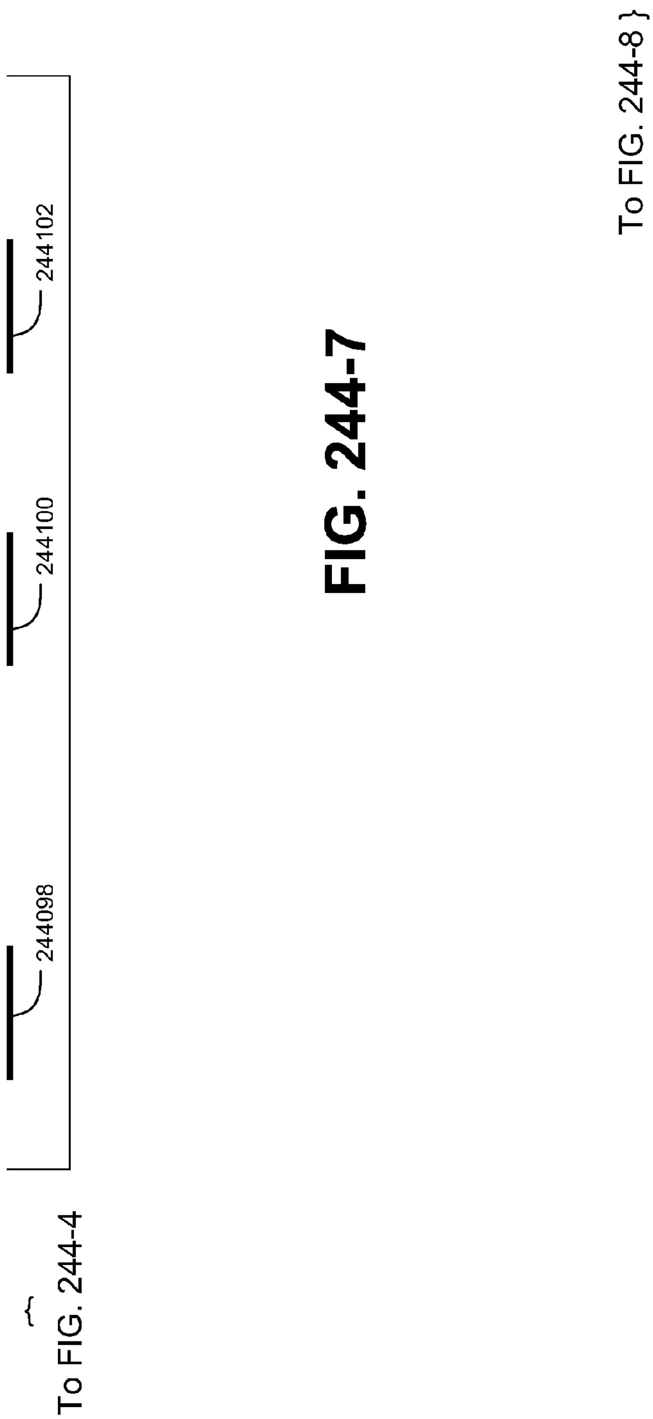
Figures 8, 244:
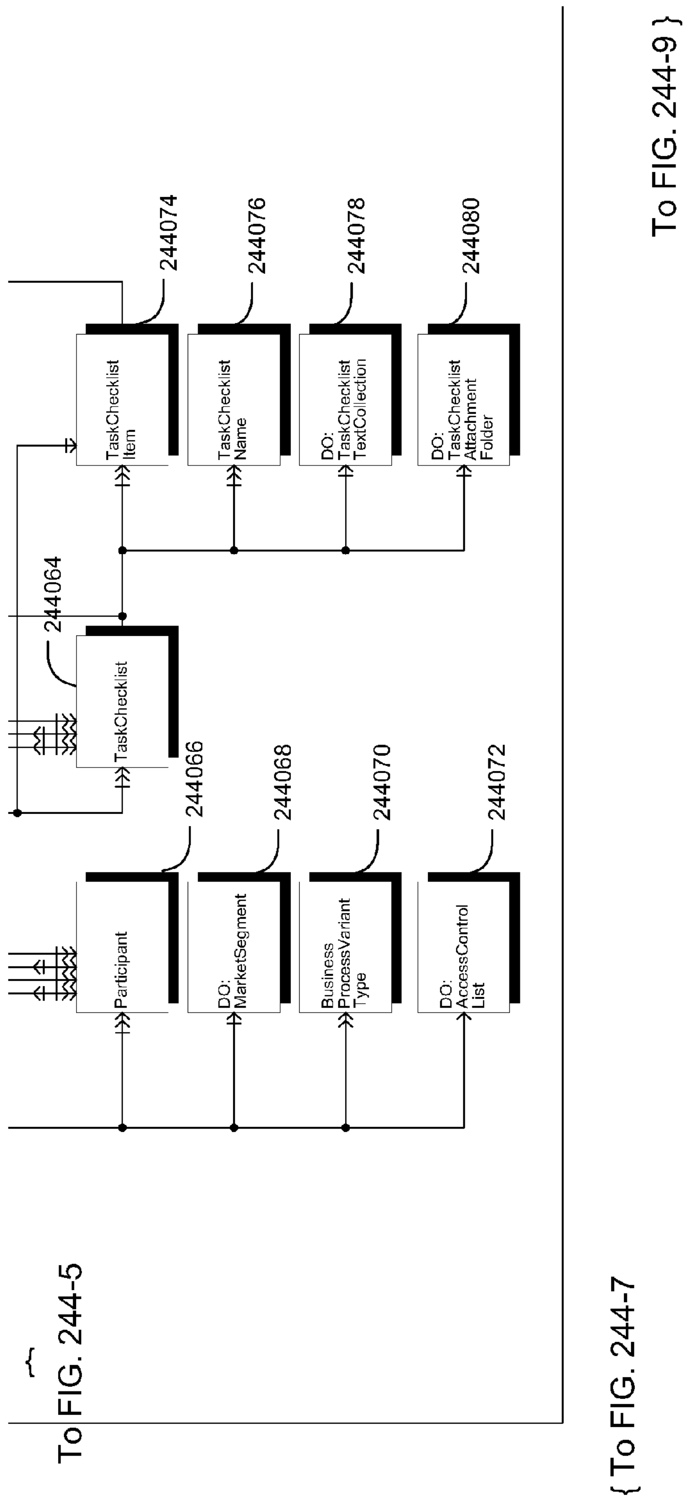
Figure 245:
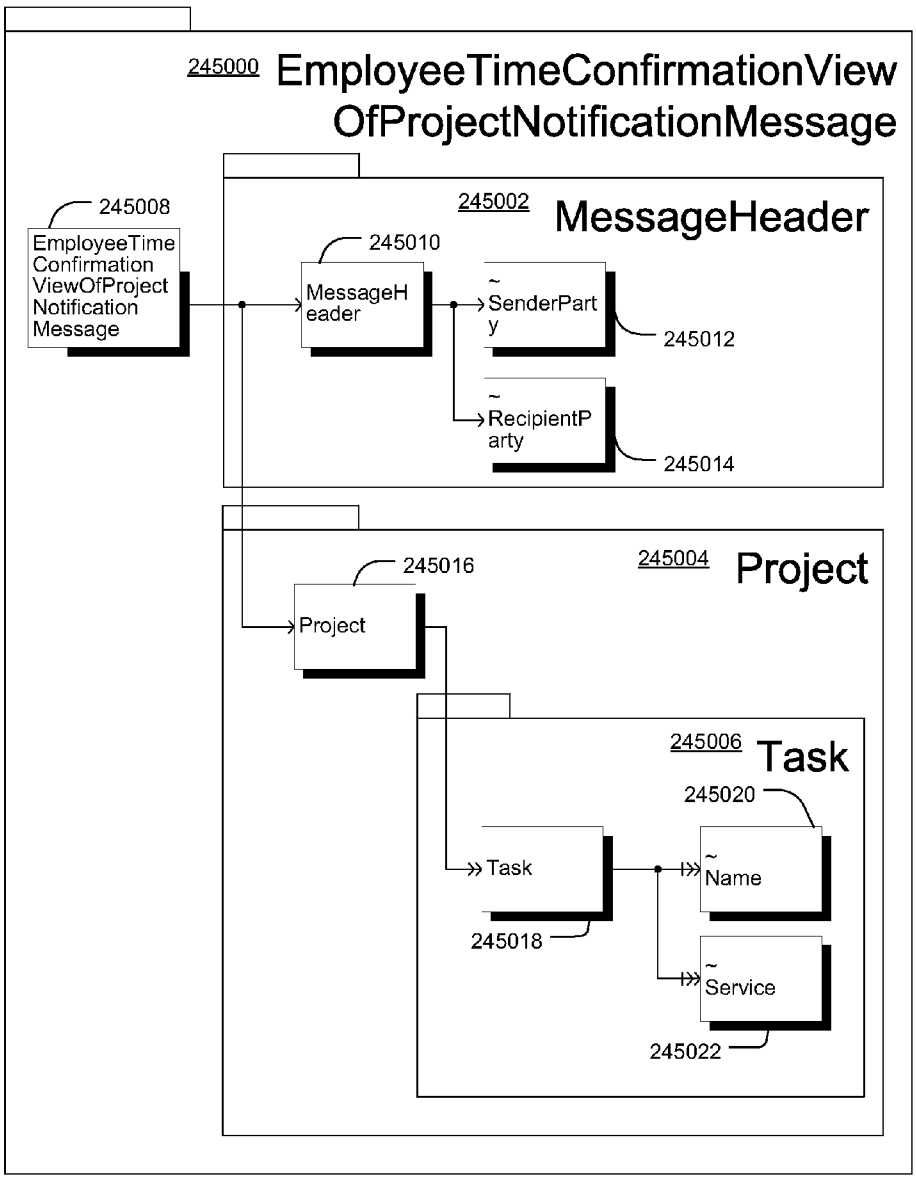
Figure 246:
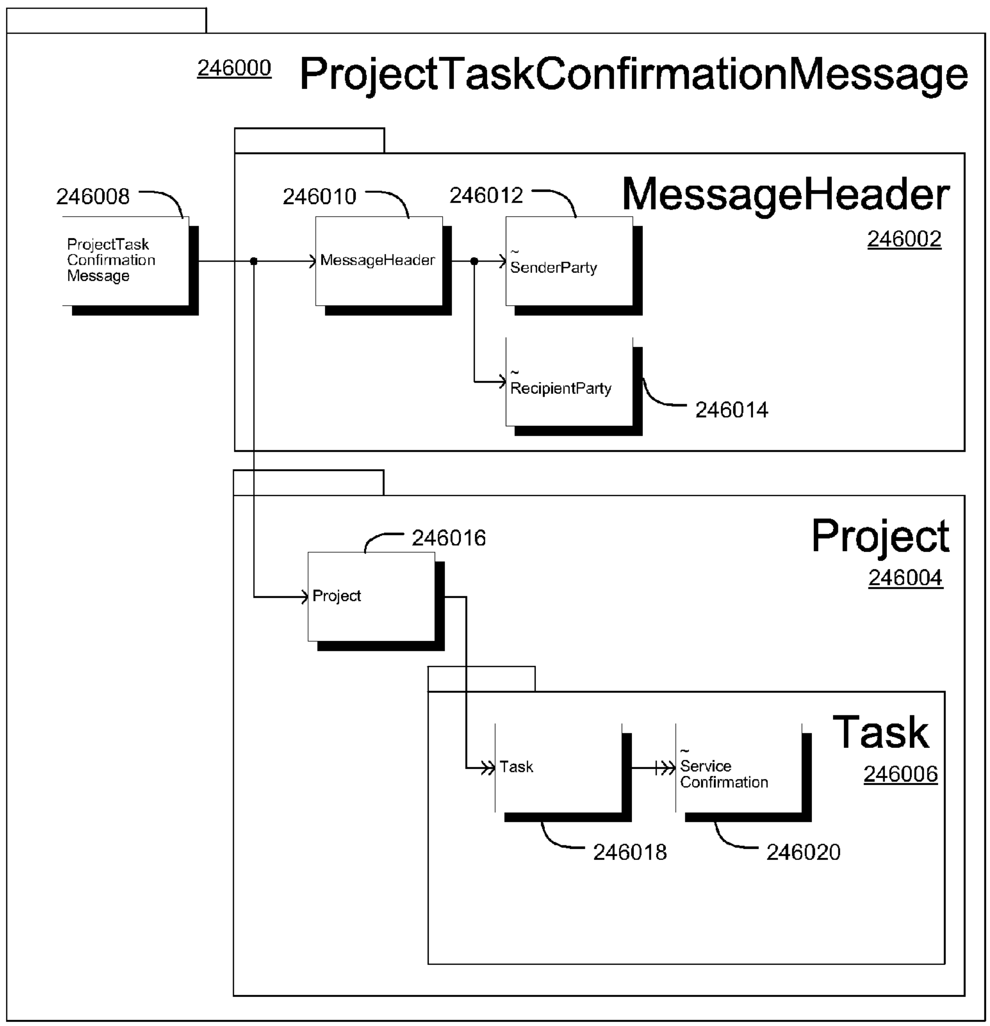
Figures 1, 249:
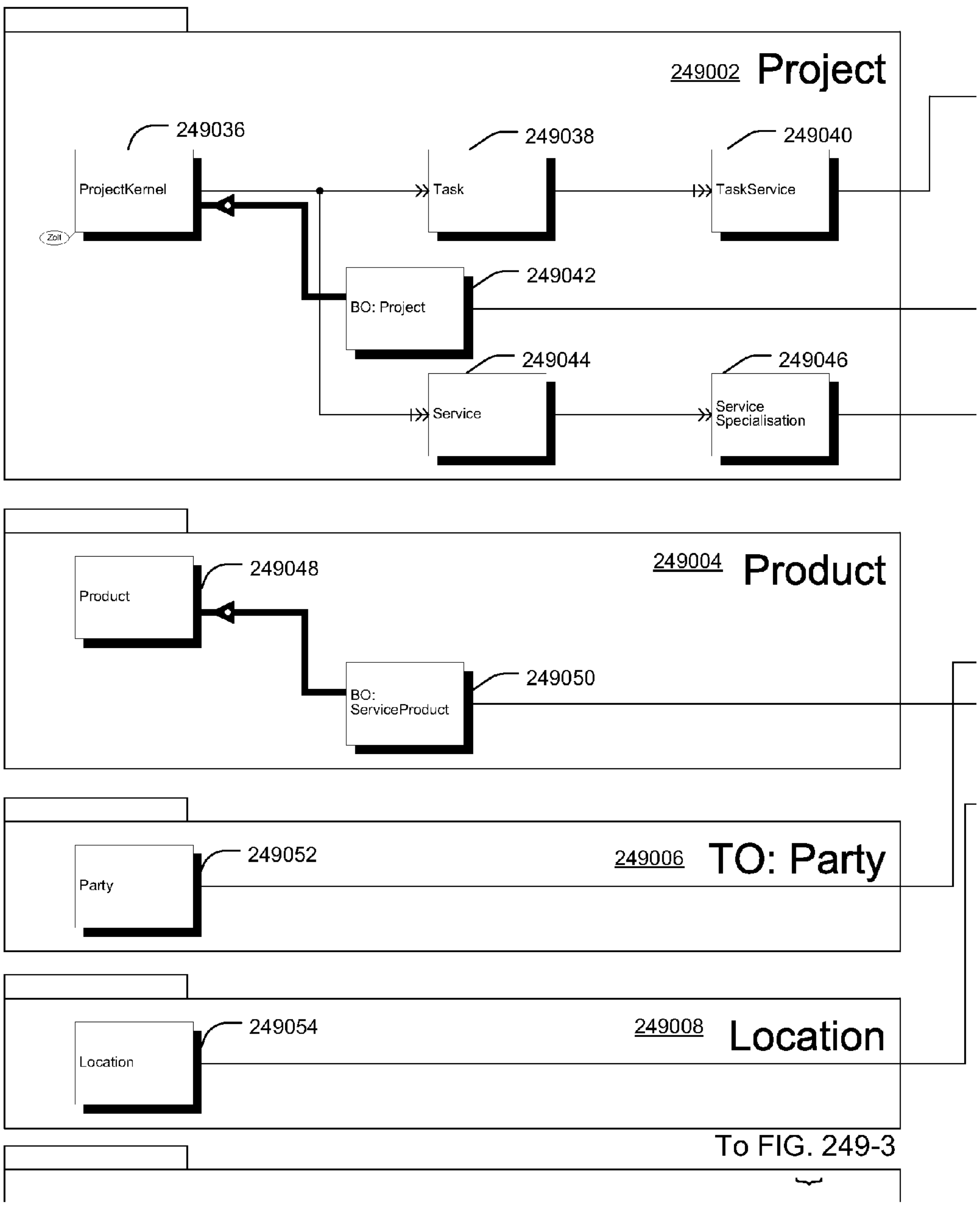
Figures 2, 249:
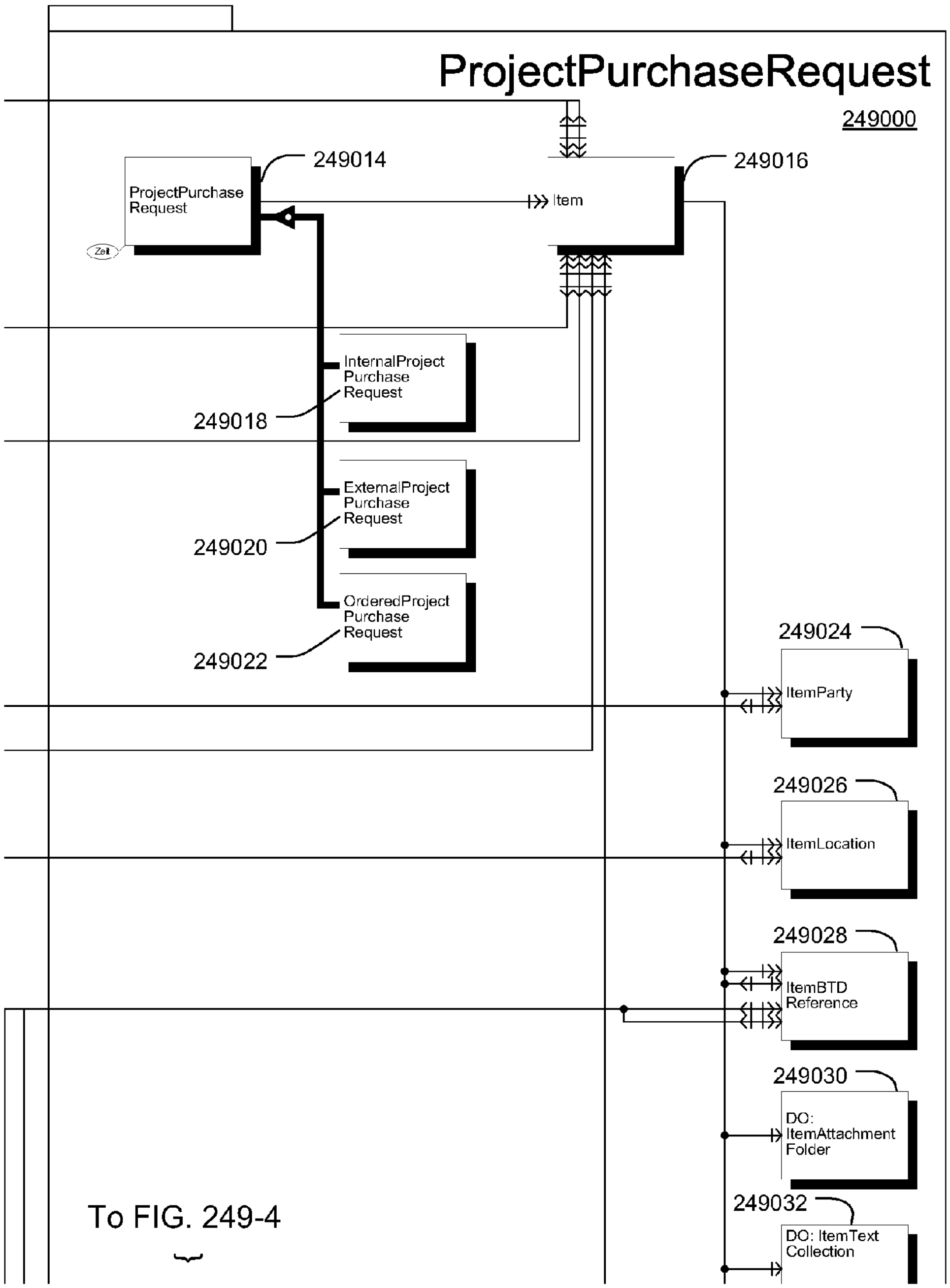
Figures 3, 249:
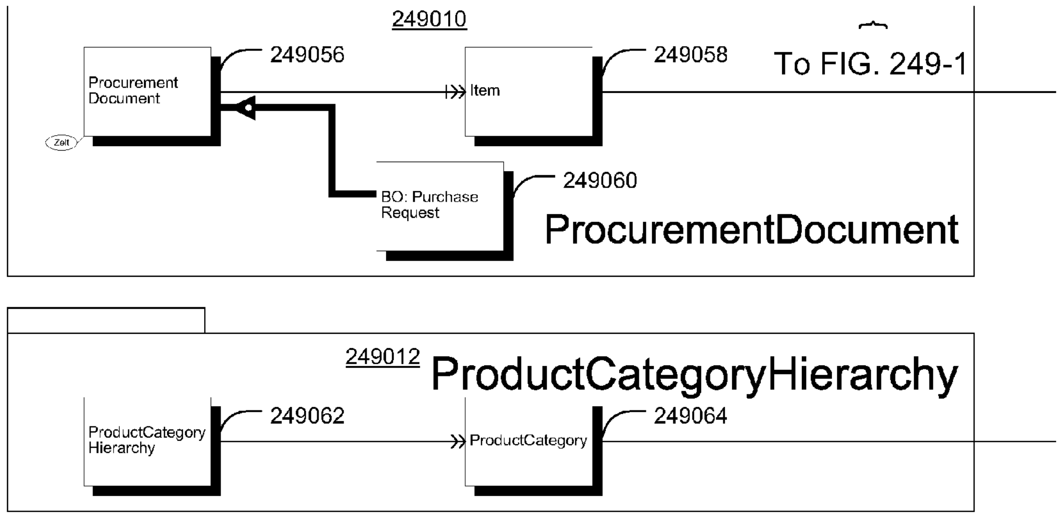
Figures 4, 249:
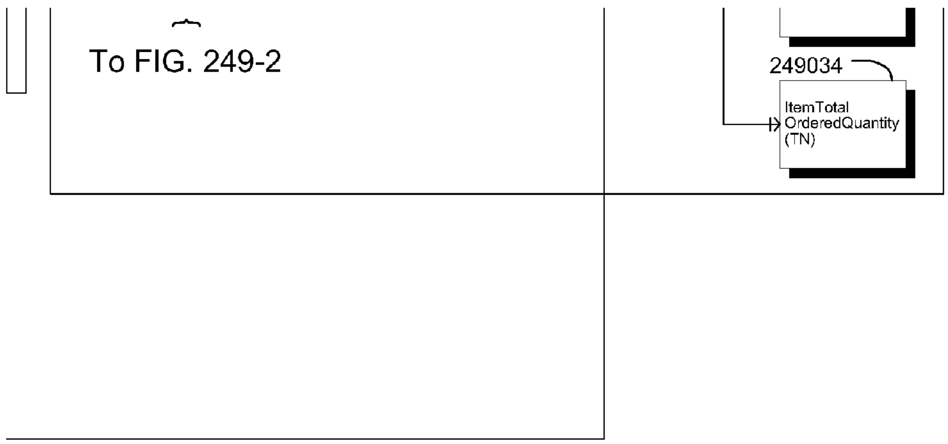
Figures 1, 250:
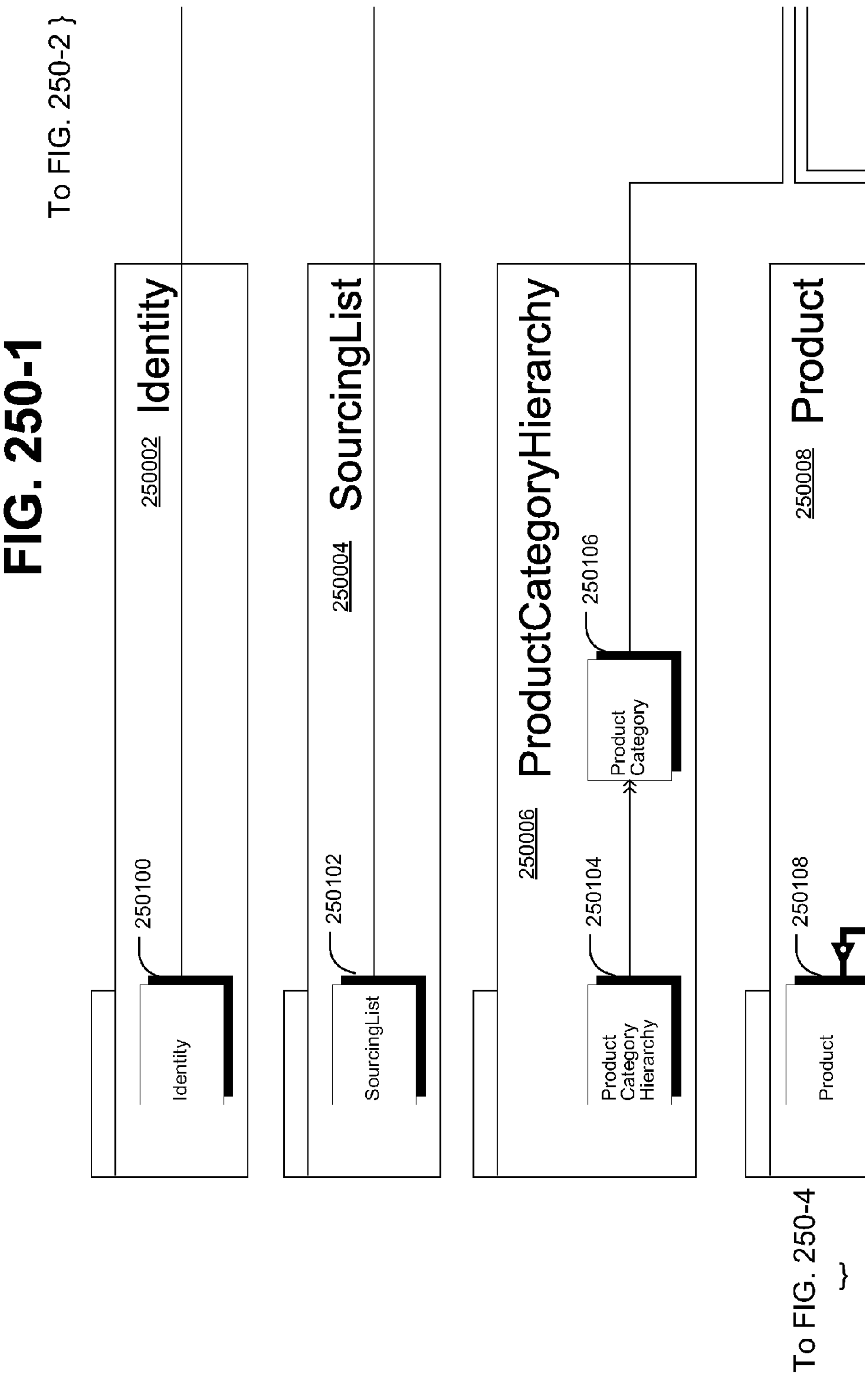
Figures 2, 250:
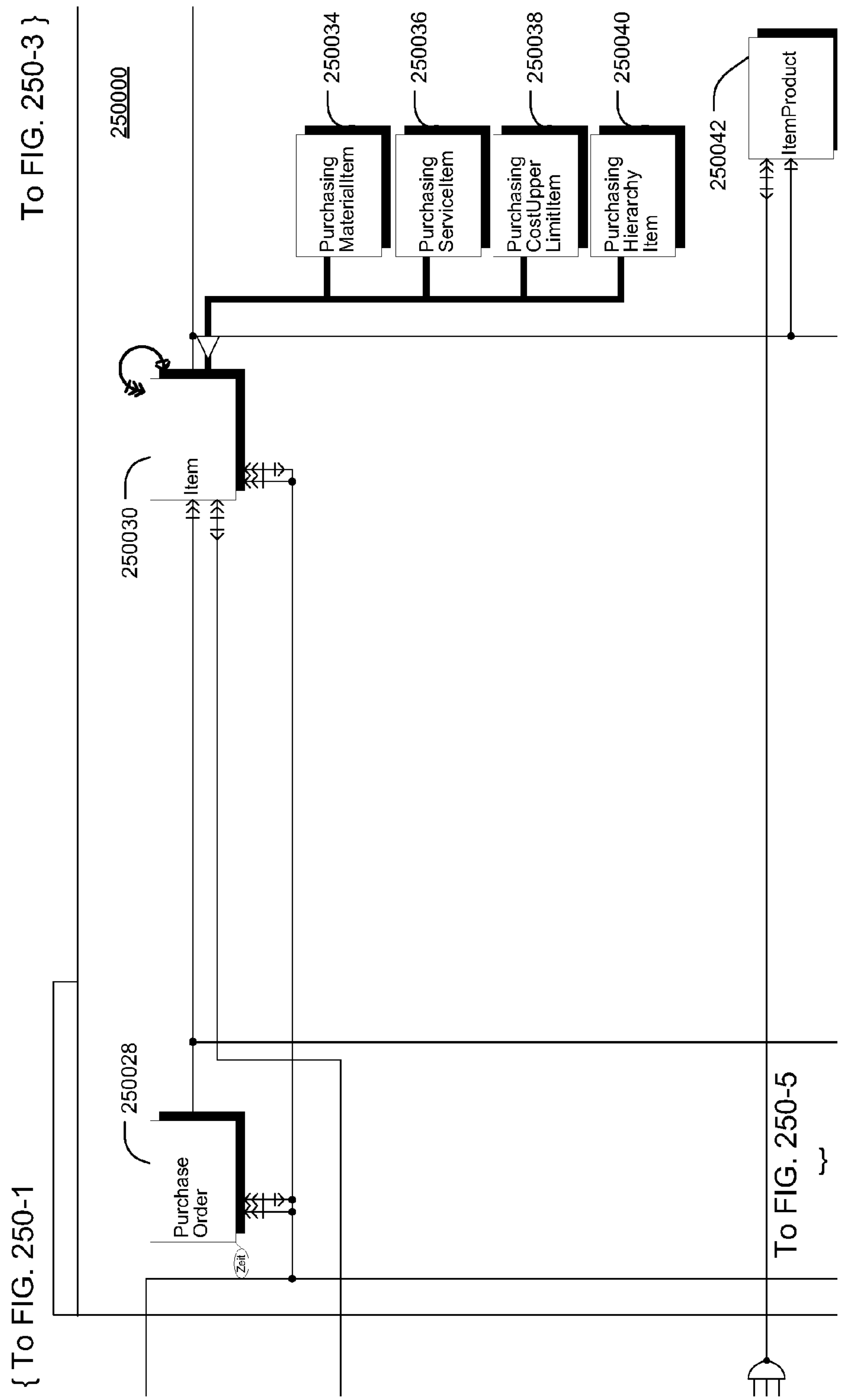
Figures 3, 250:
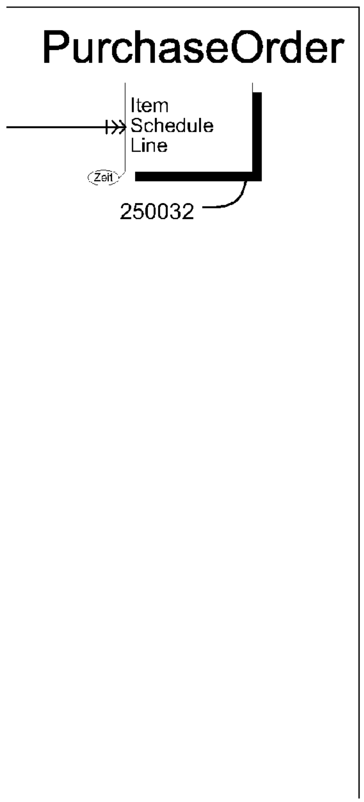
Figures 4, 250:
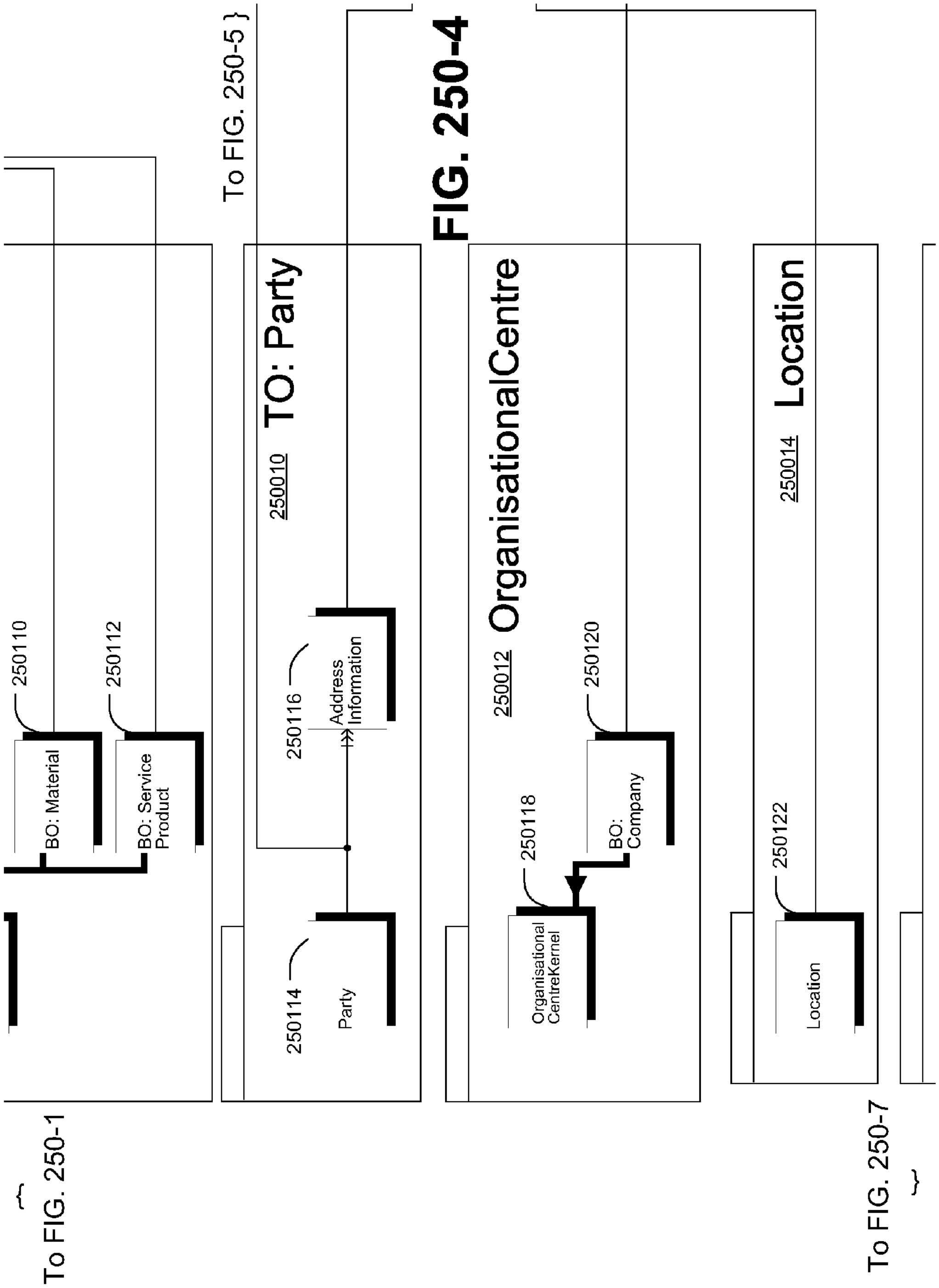
Figures 5, 250:
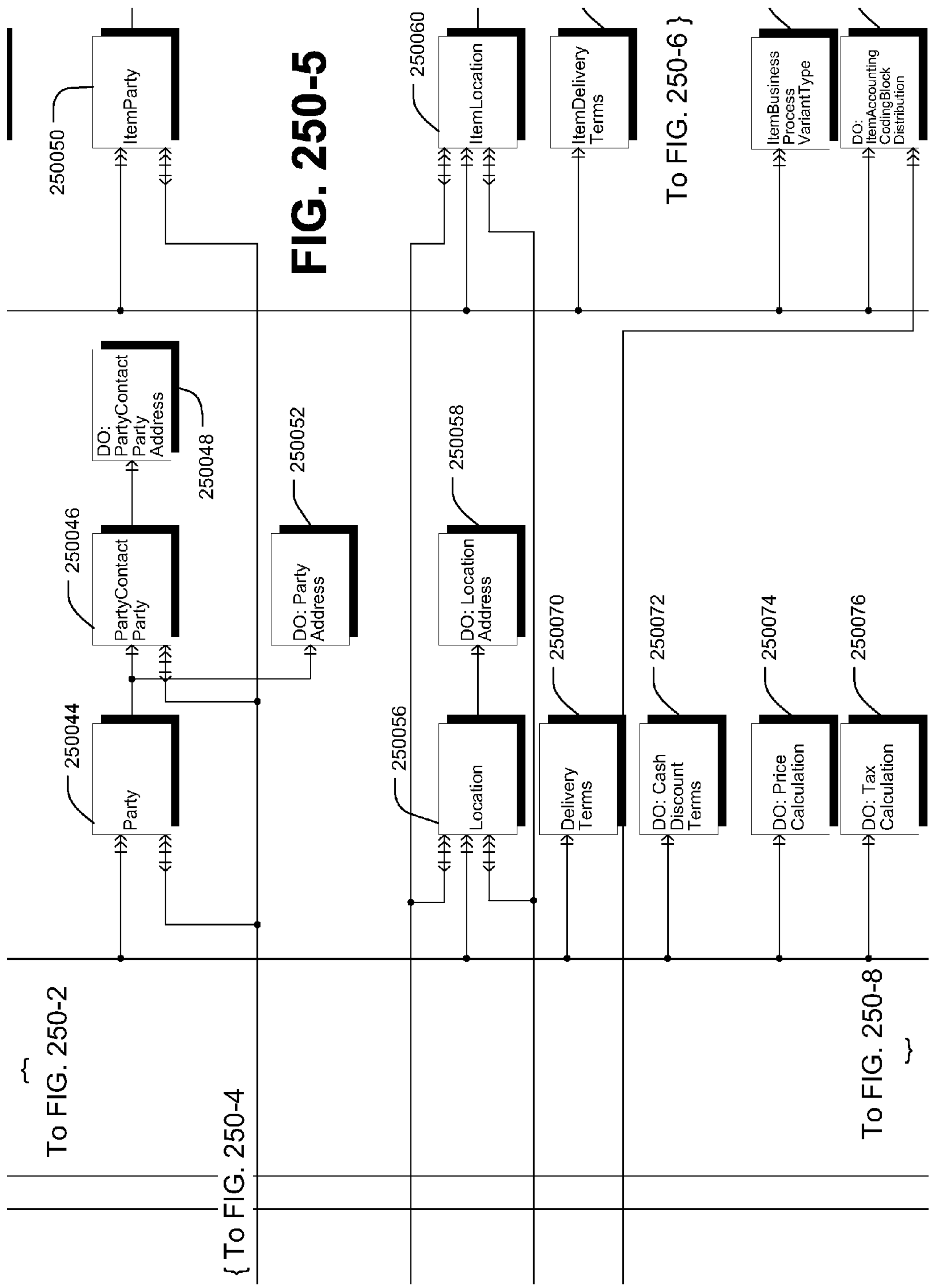
Figures 6, 250:
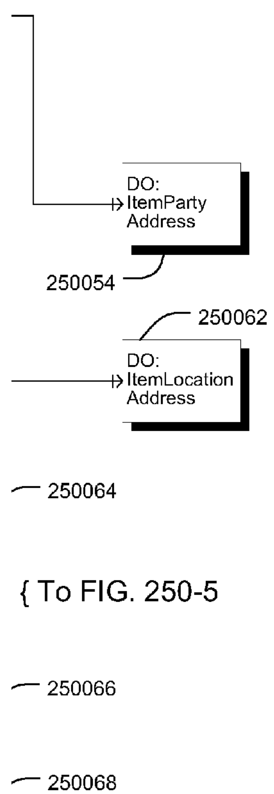
Figures 7, 250:
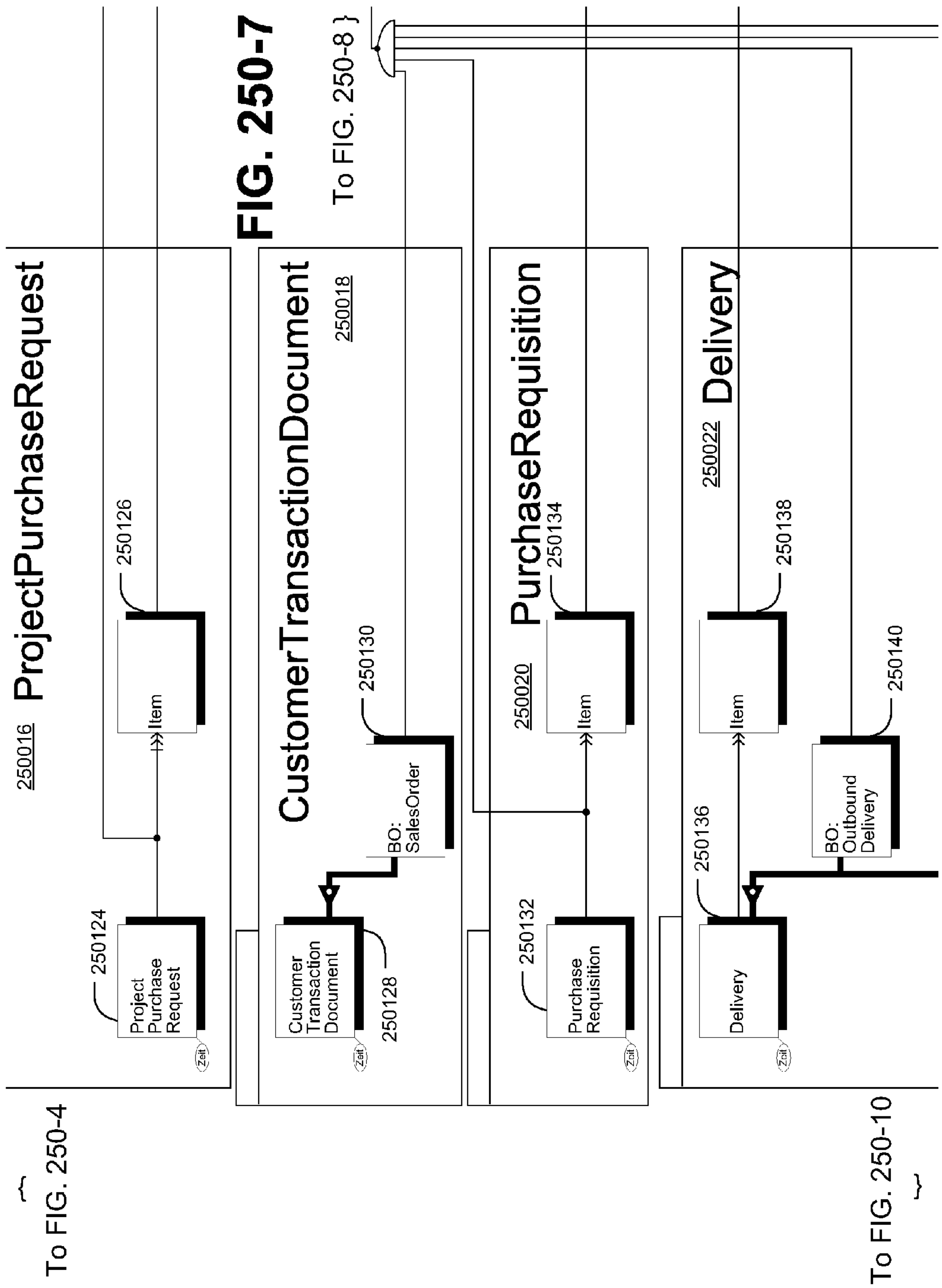
Figures 8, 250:
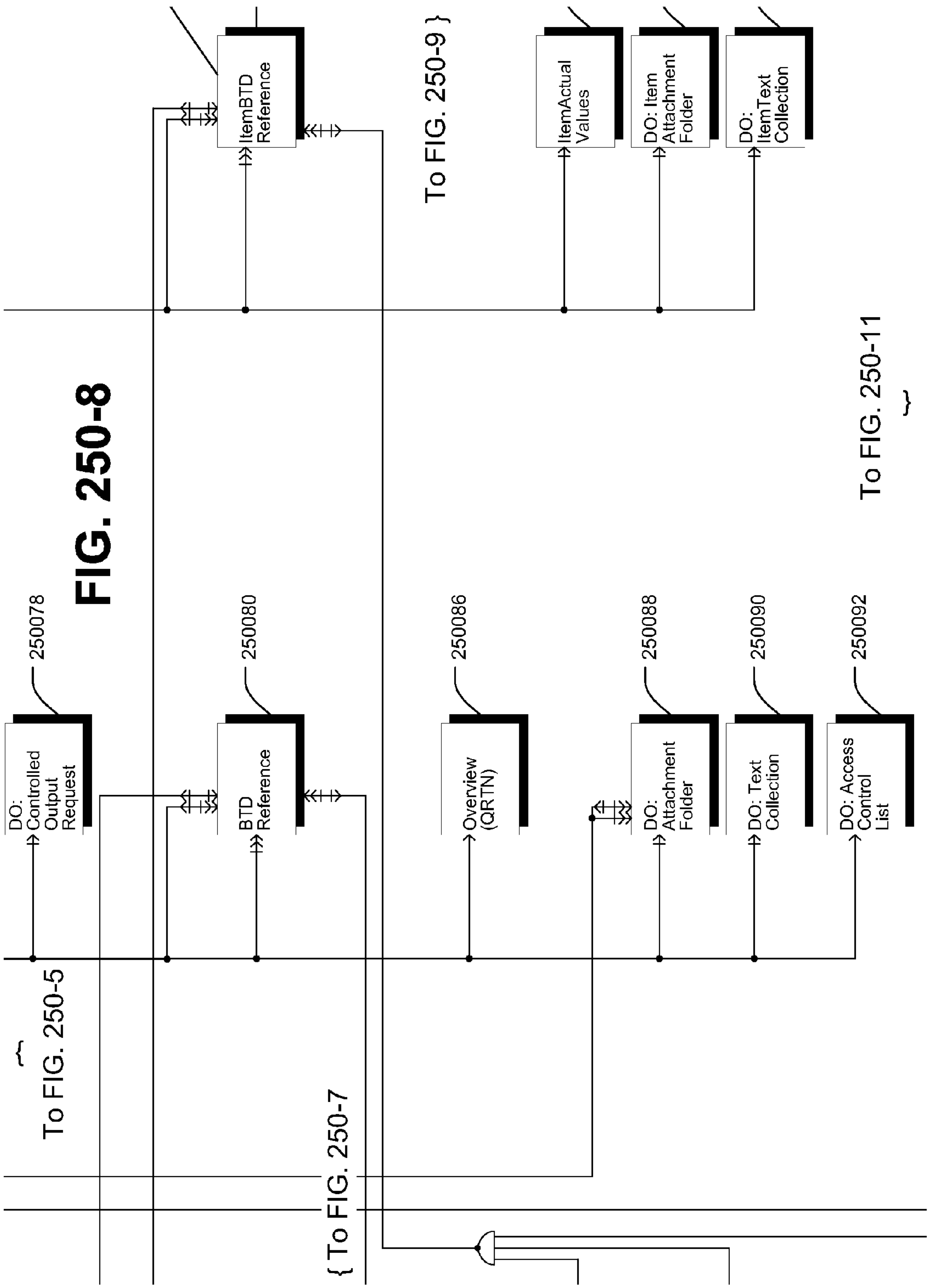
Figures 9, 250:
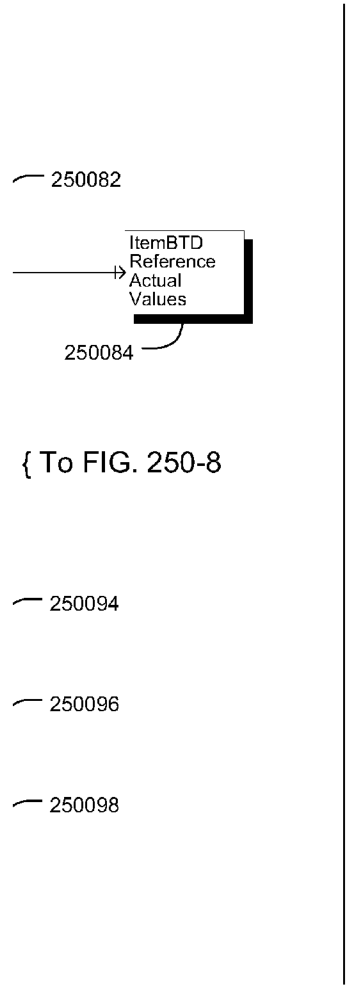
Figures 10, 250:
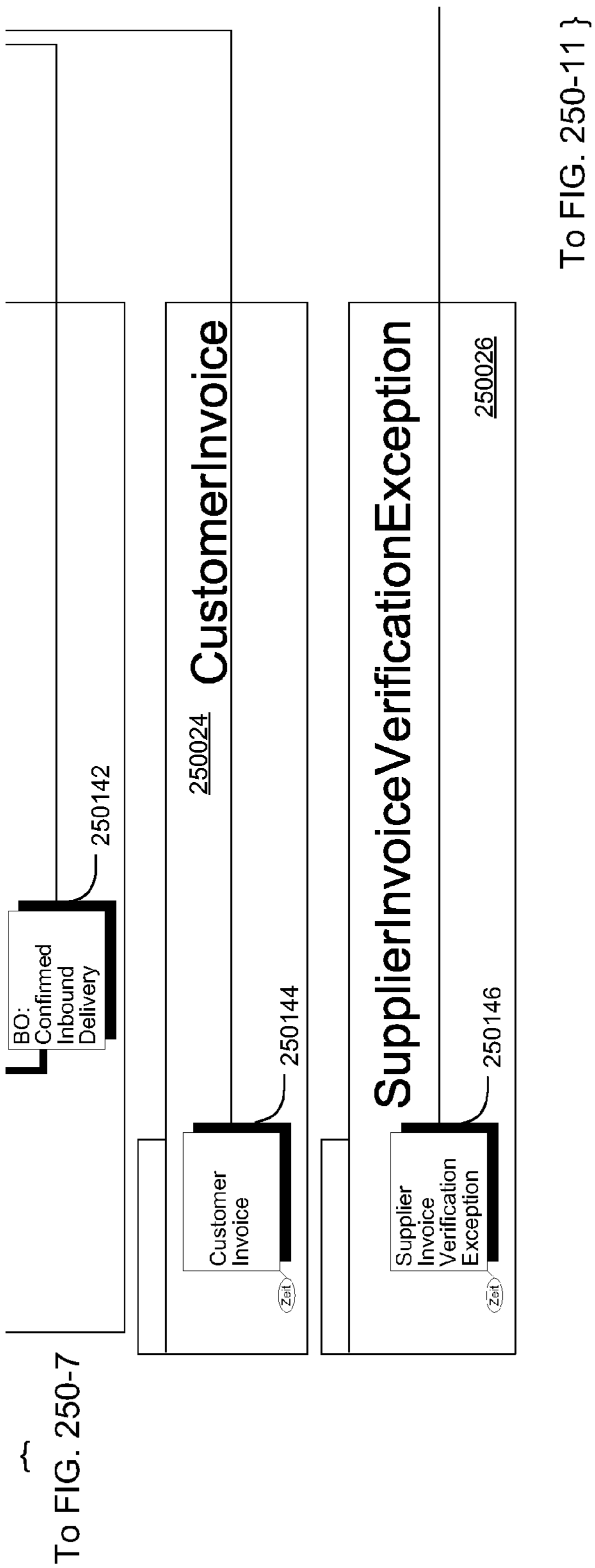
Figures 1, 257:
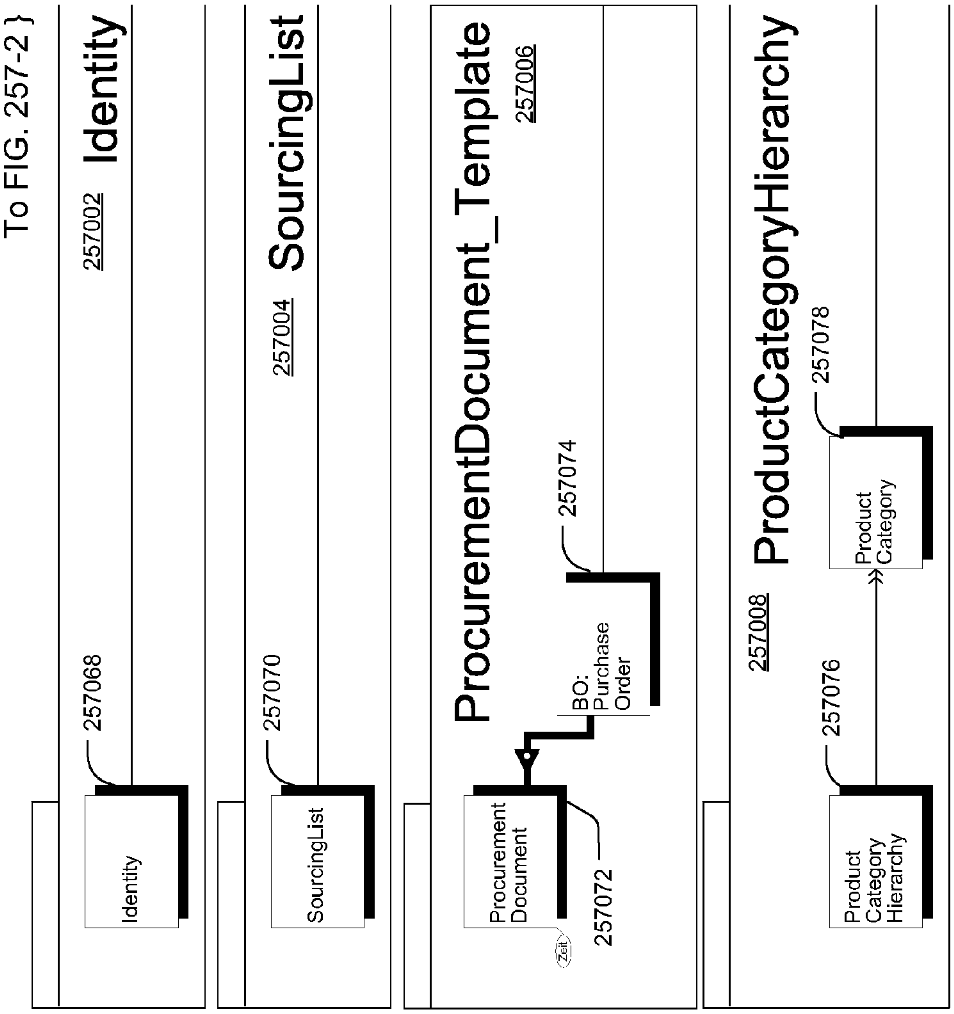
Figures 2, 257:
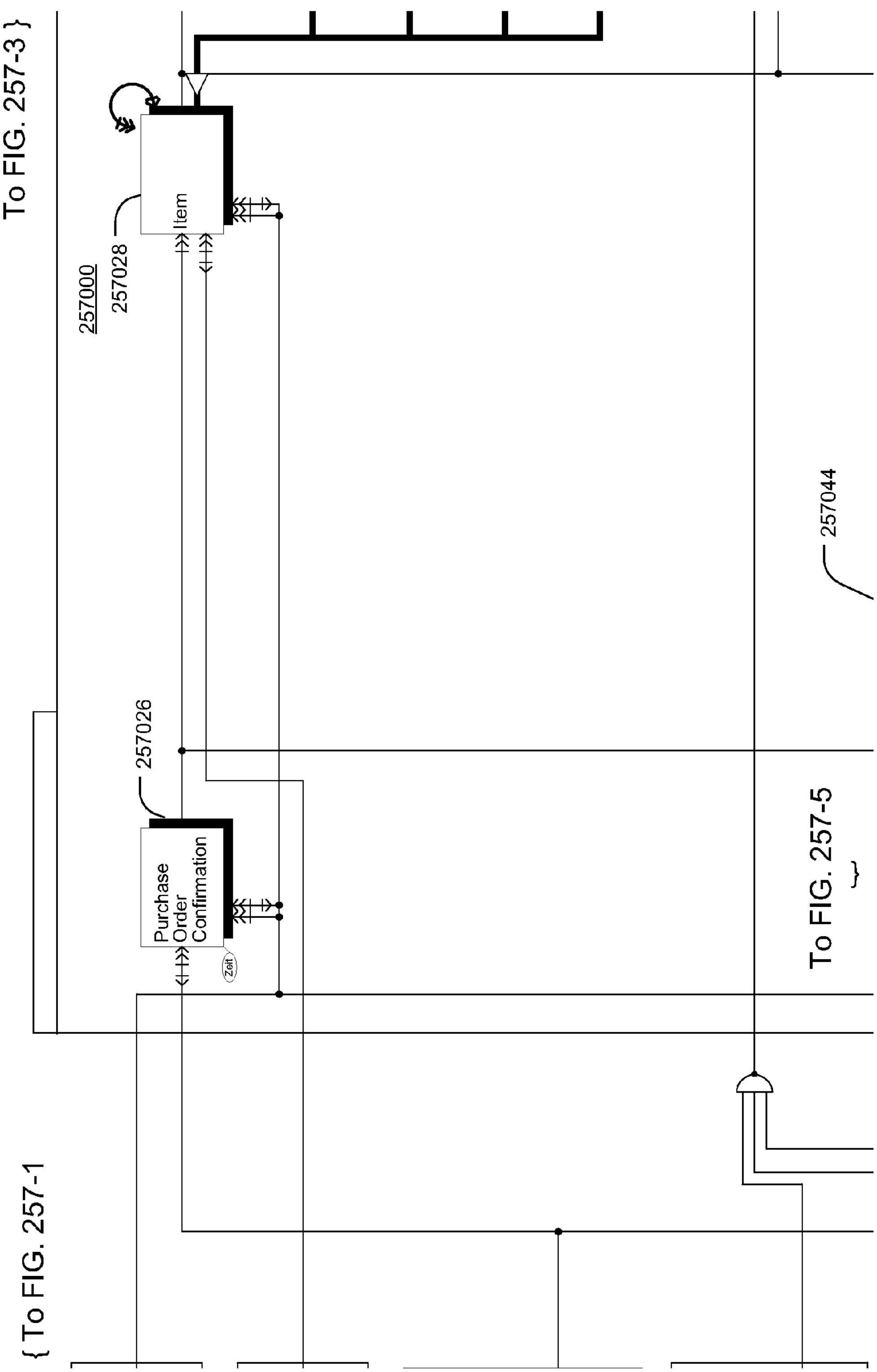
Figures 3, 257:
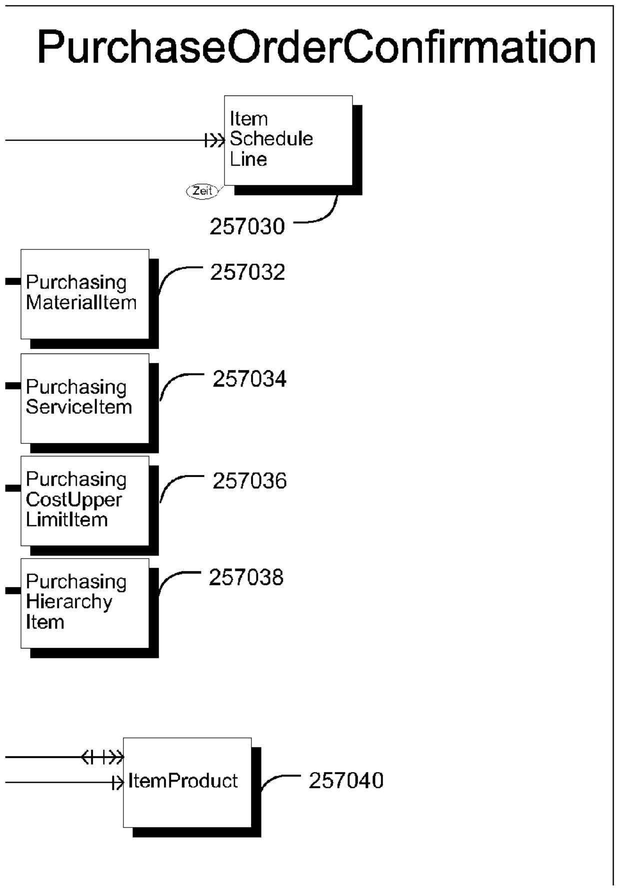
Figures 4, 257:
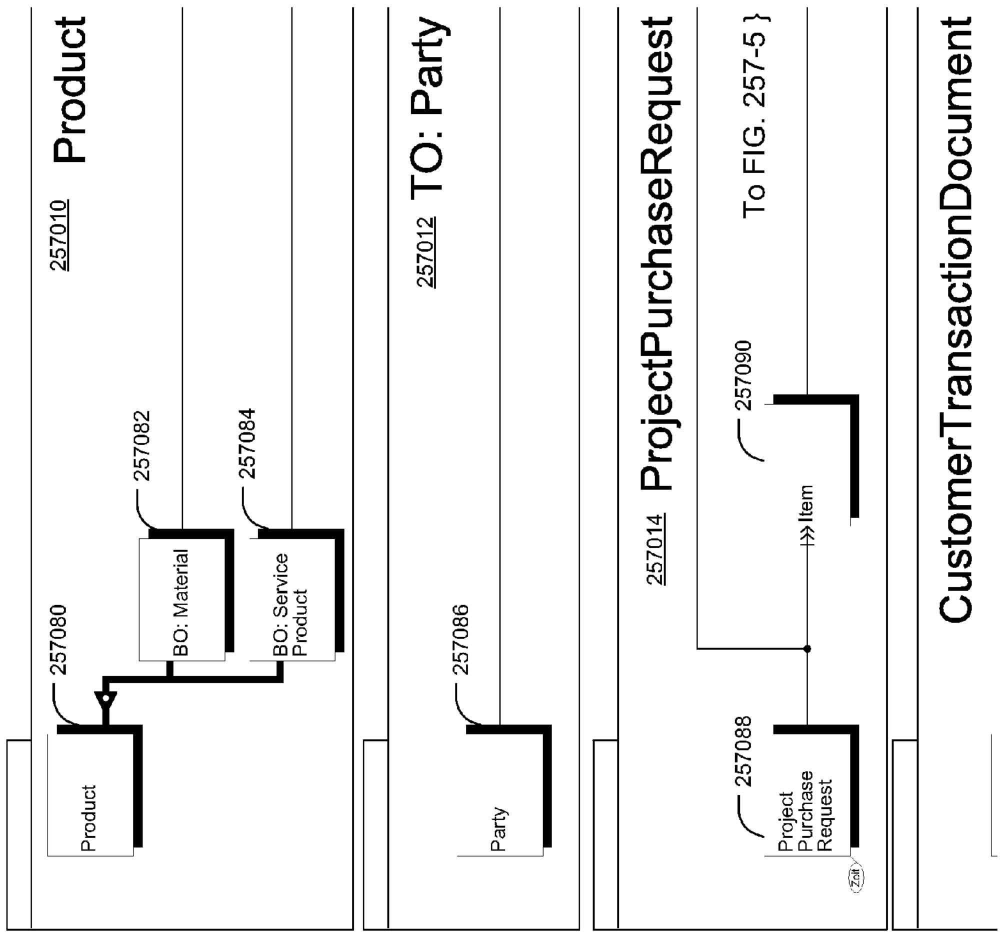
Figures 5, 257:
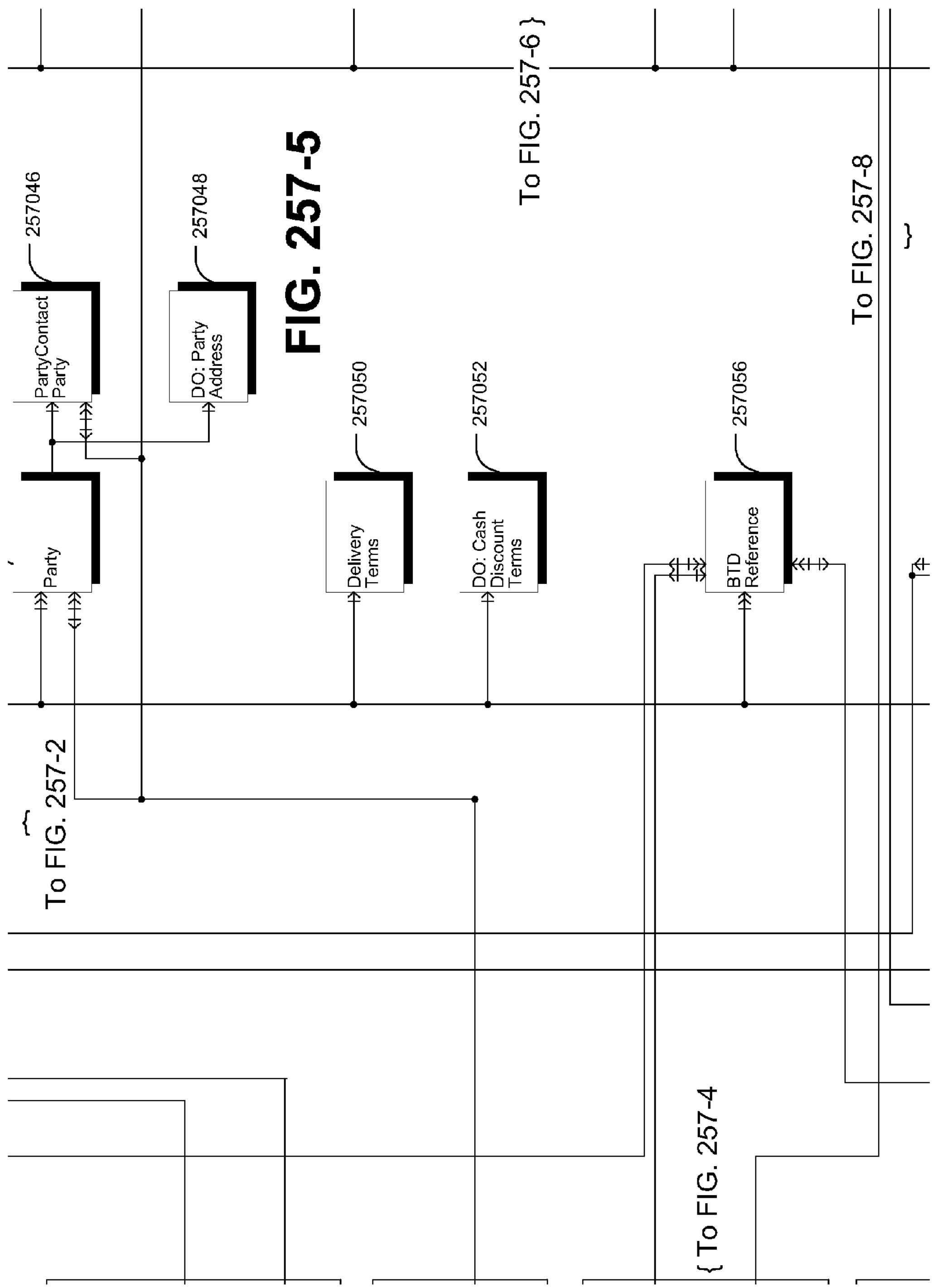
Figures 6, 257:
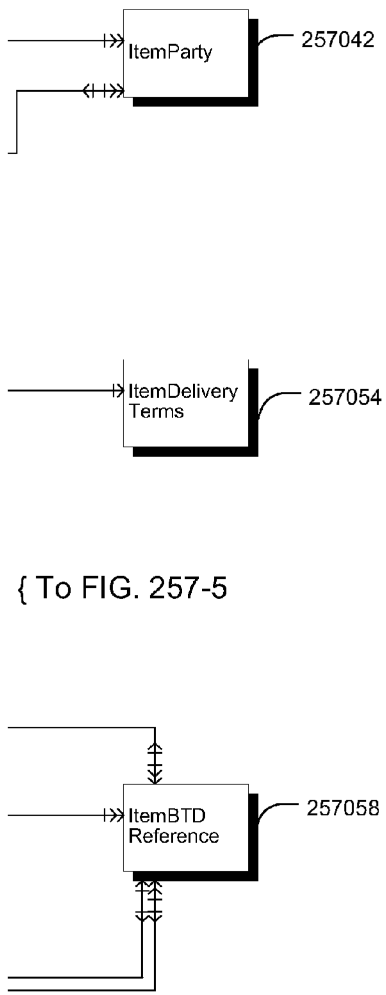
Figures 7, 257:
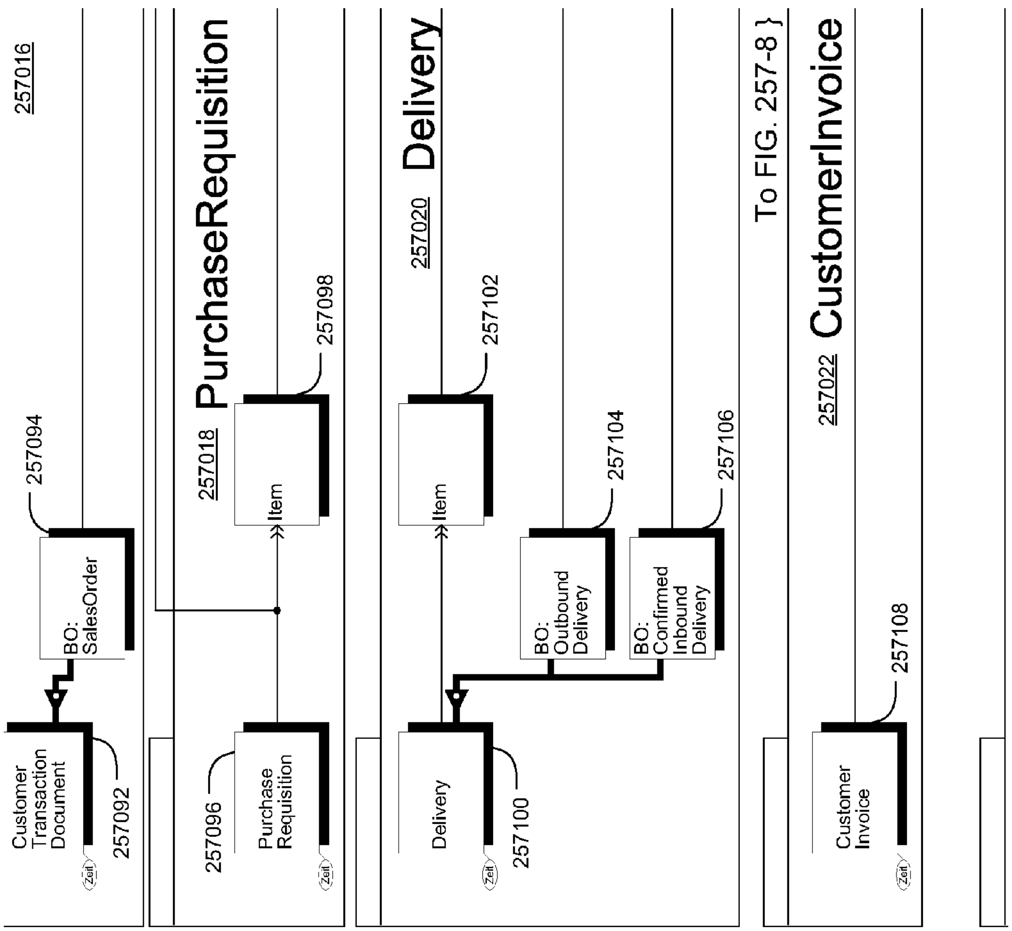
Figures 8, 257:
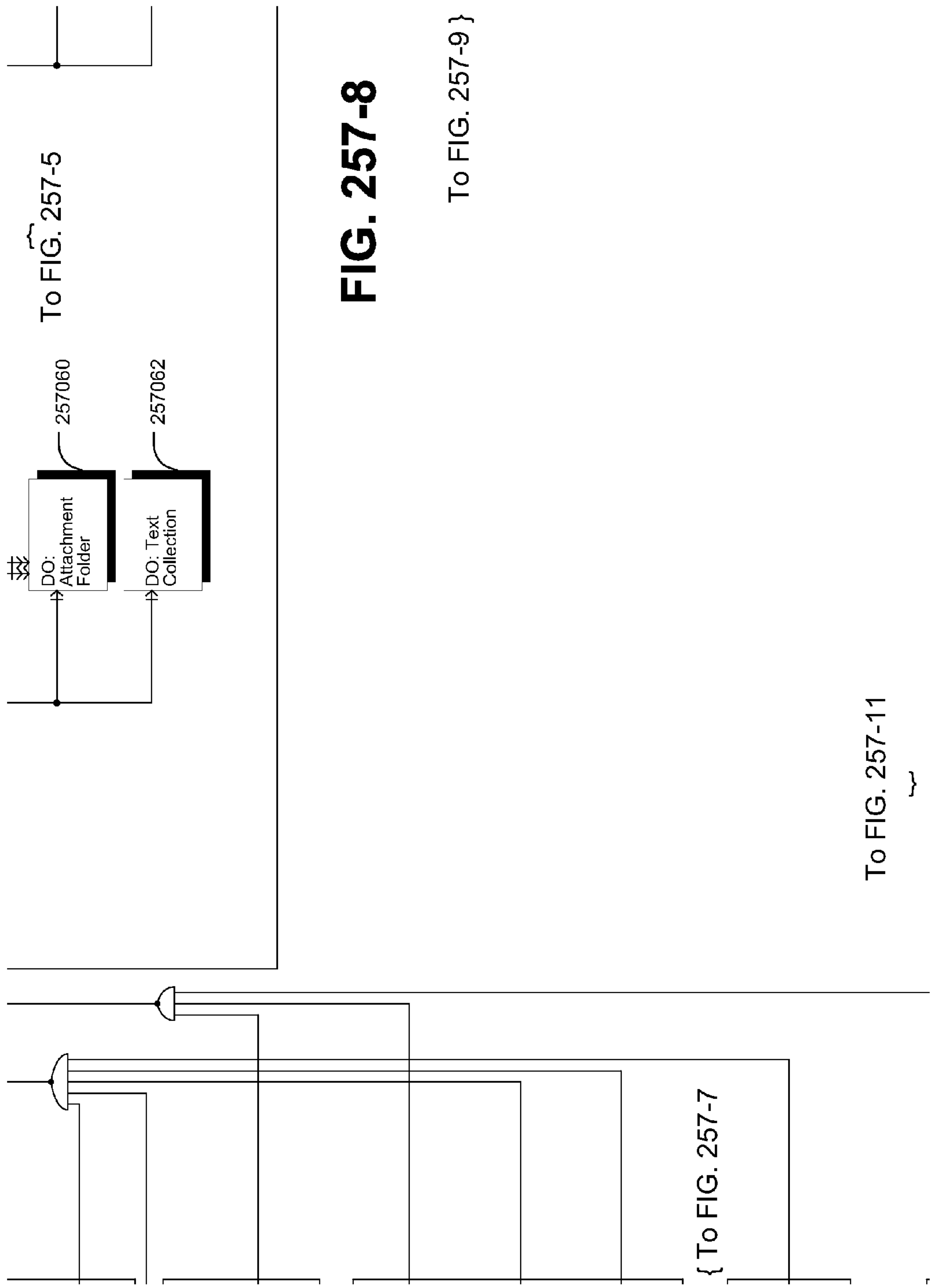
Figures 9, 257:
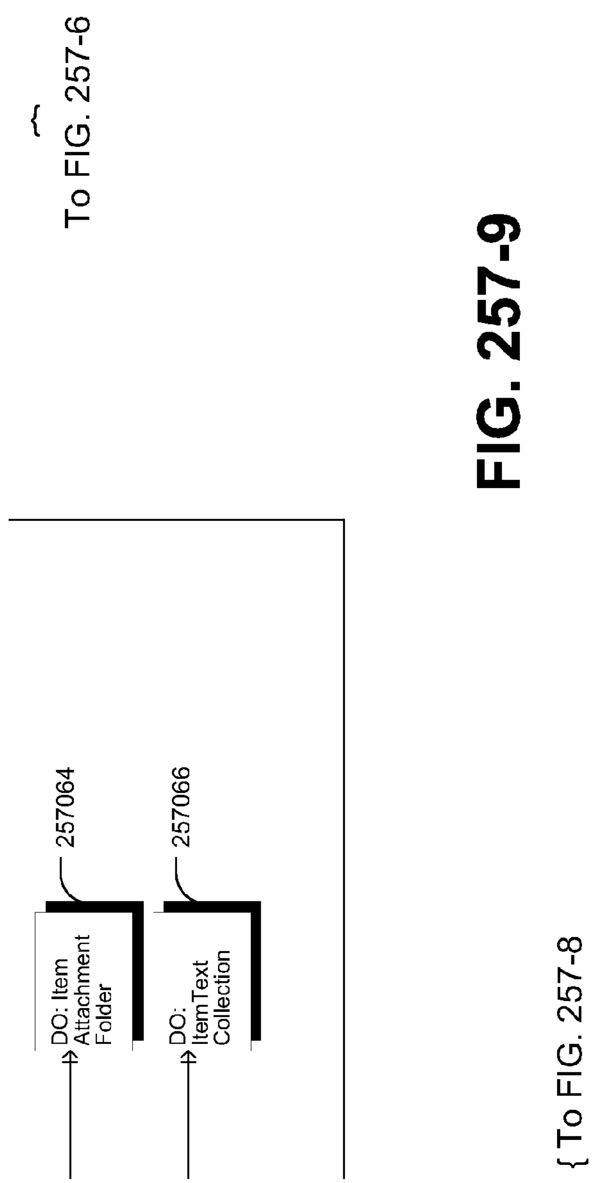
Figures 10, 257:
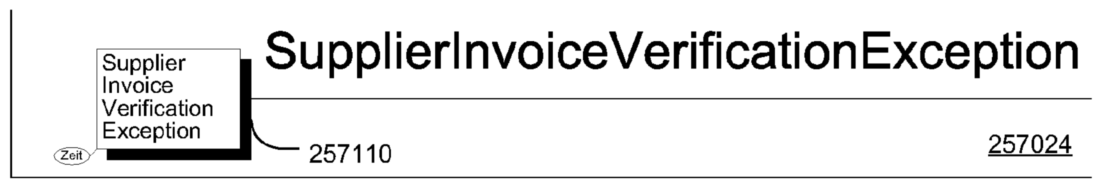
Figures 1, 258:
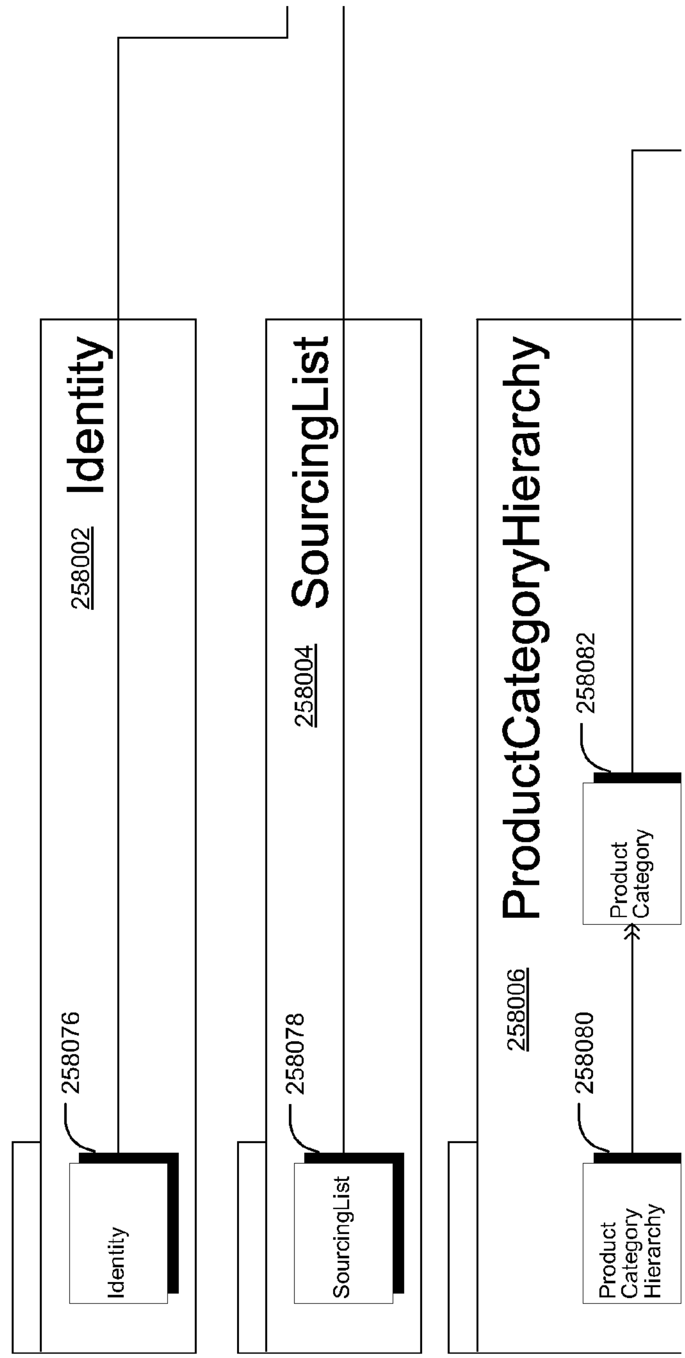
Figures 2, 258:
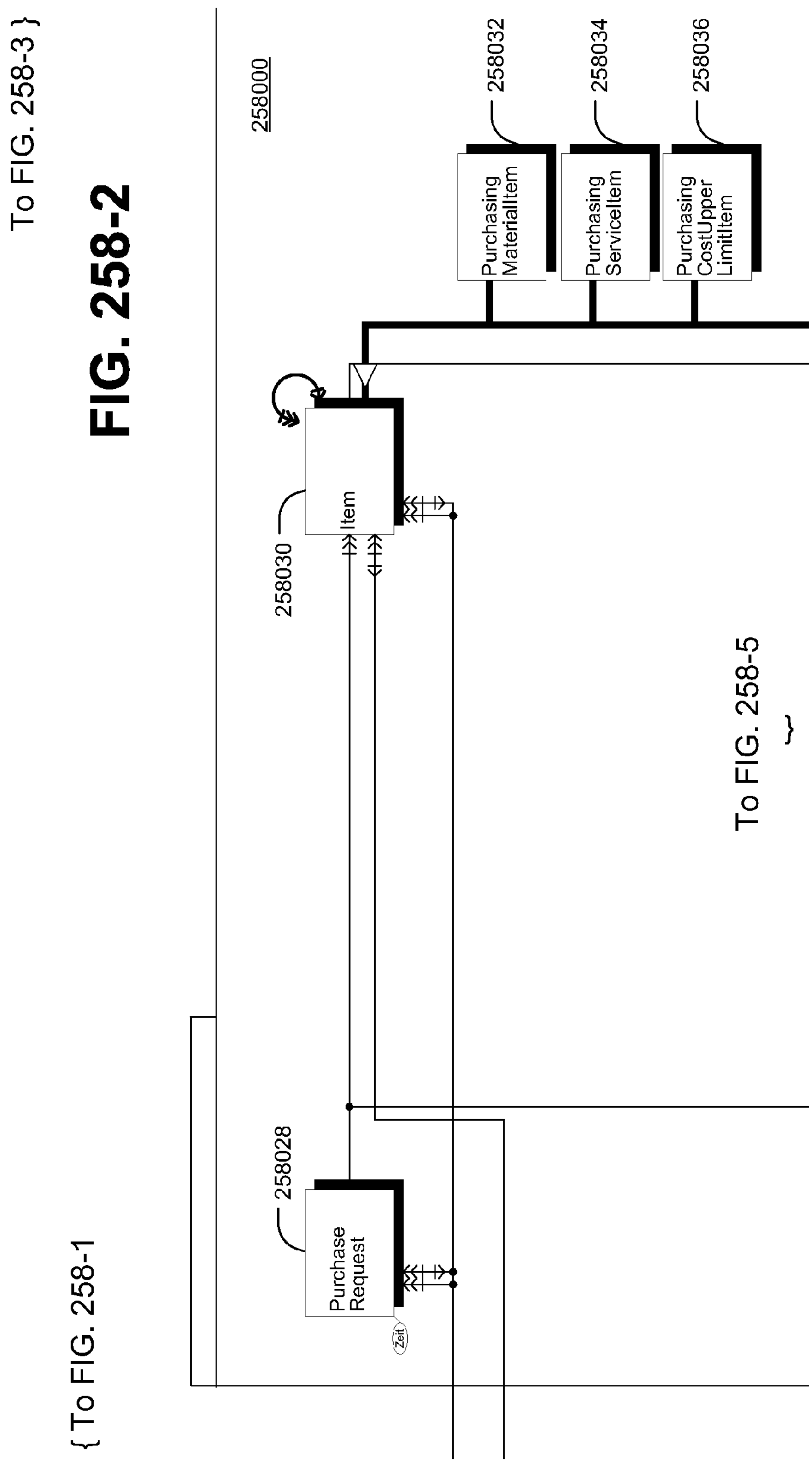
Figures 4, 258:
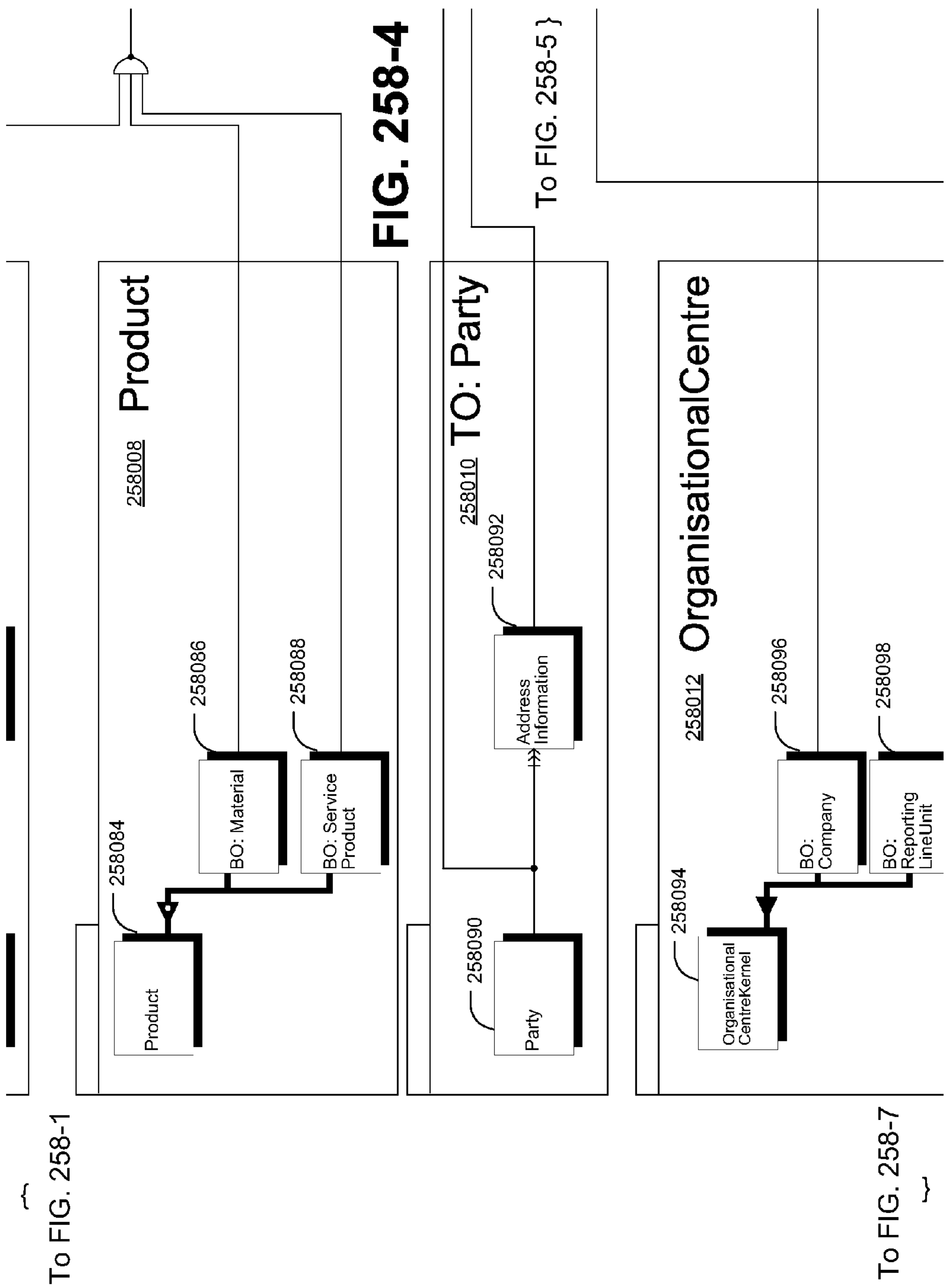
Figures 5, 258:
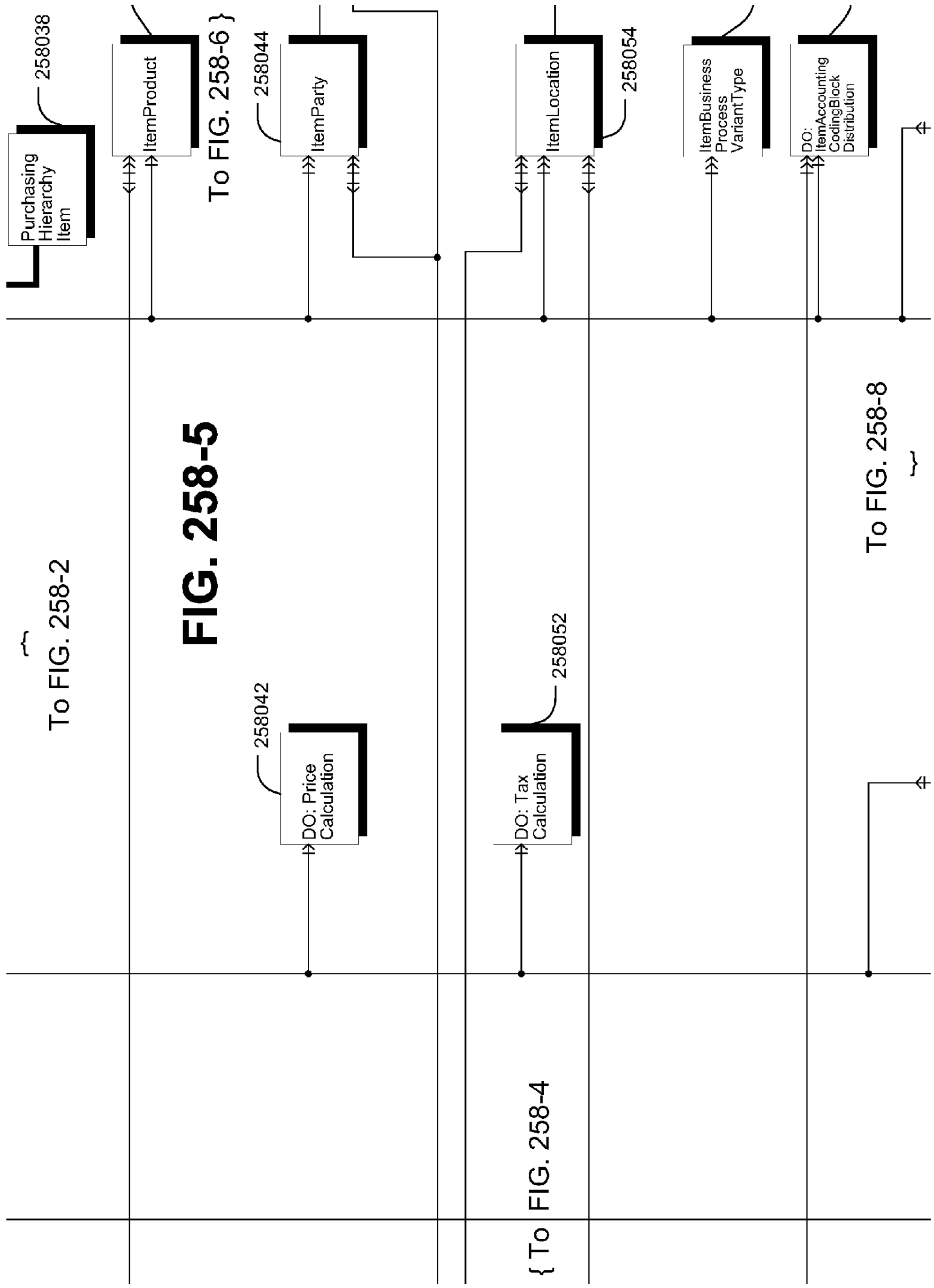
Figures 6, 258:
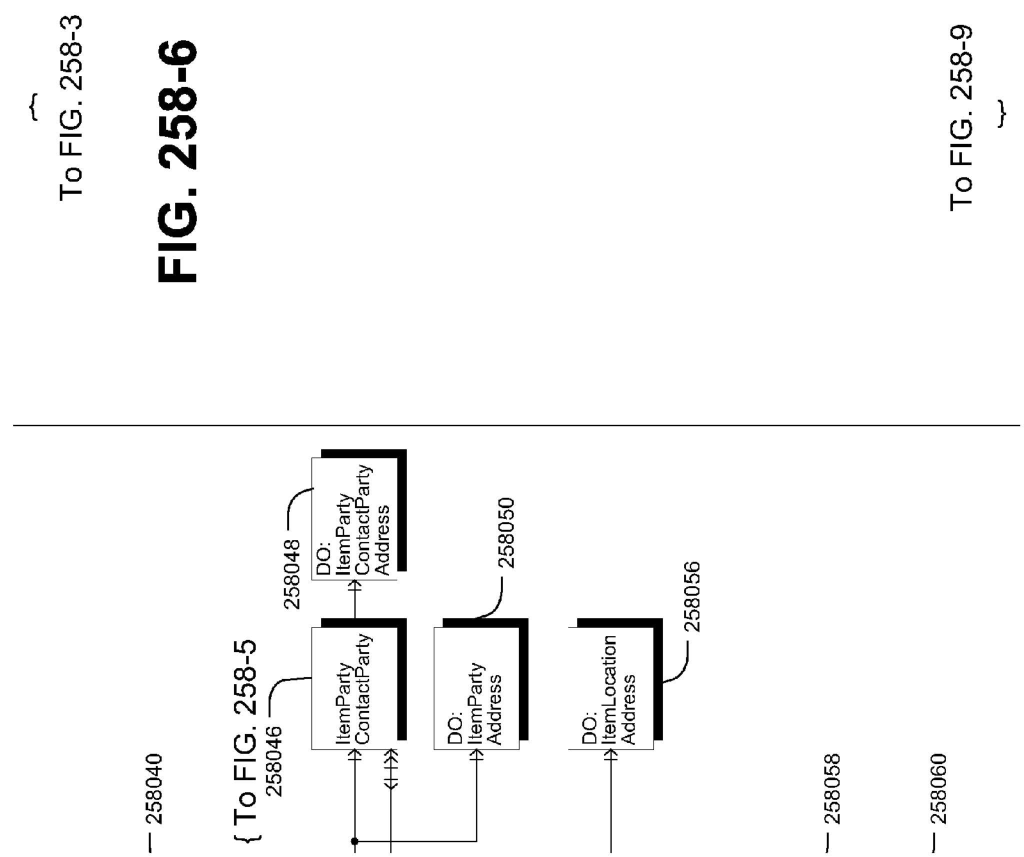
Figures 7, 258:
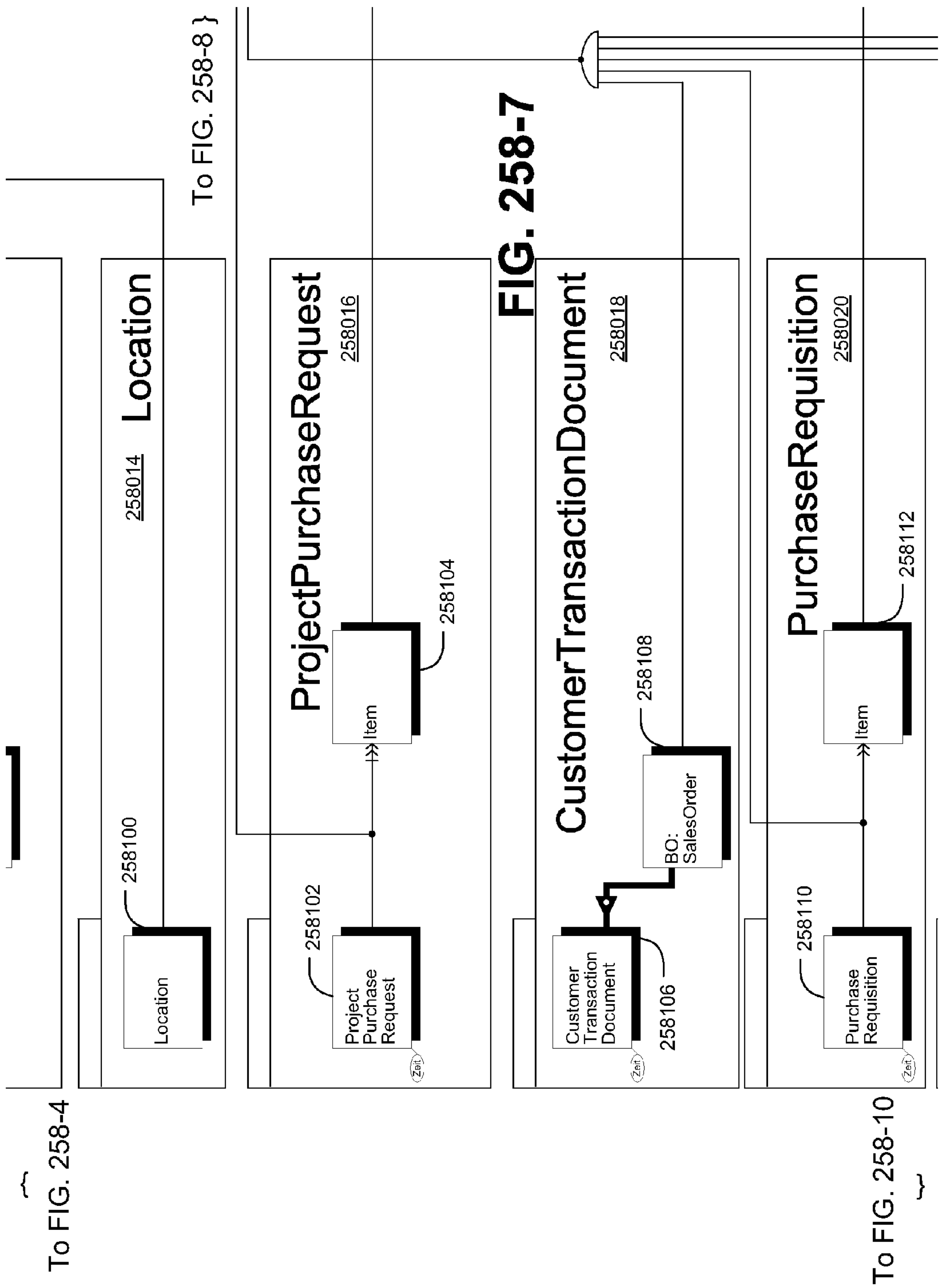
Figures 8, 258:
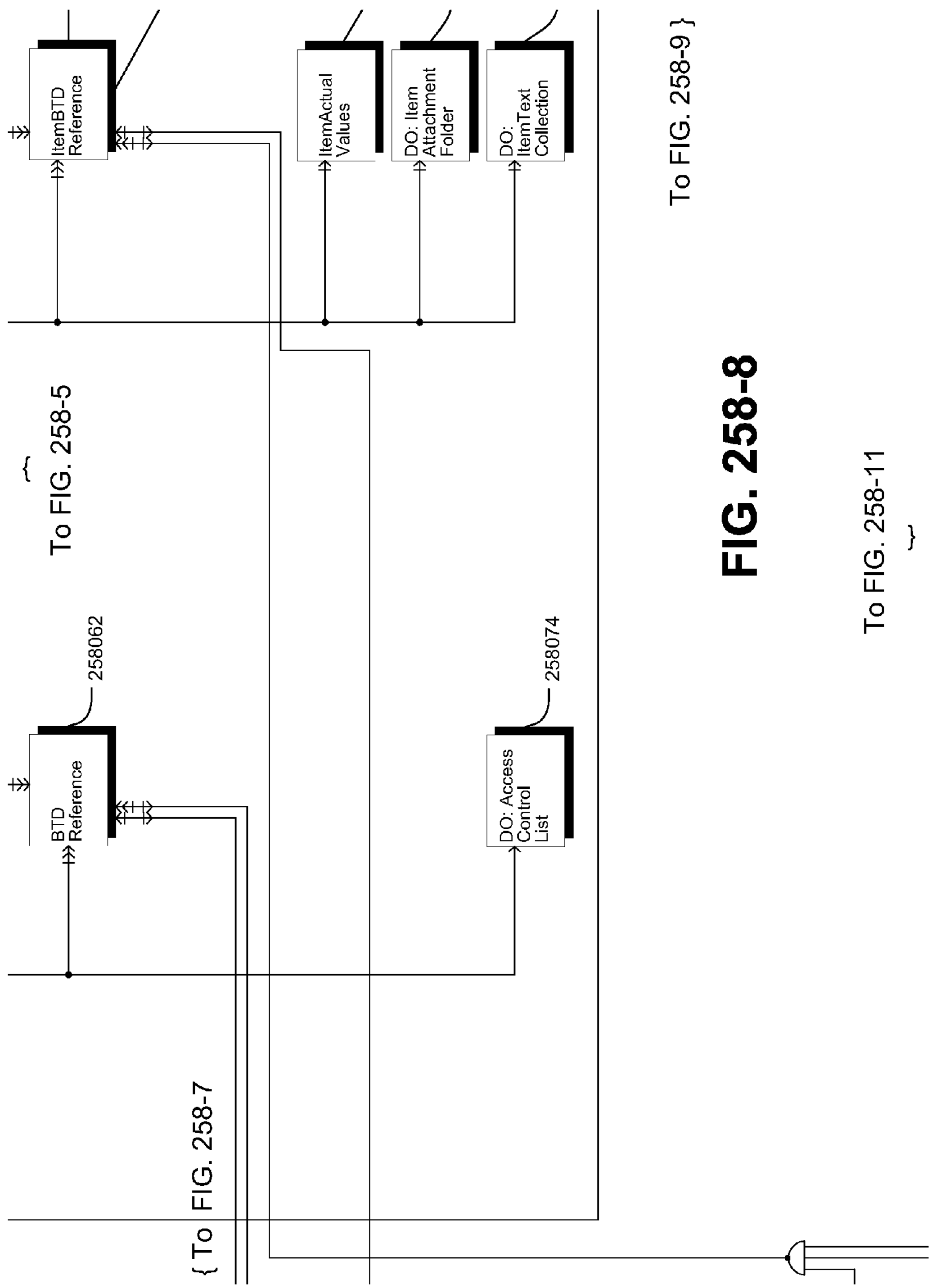
Figures 9, 258:
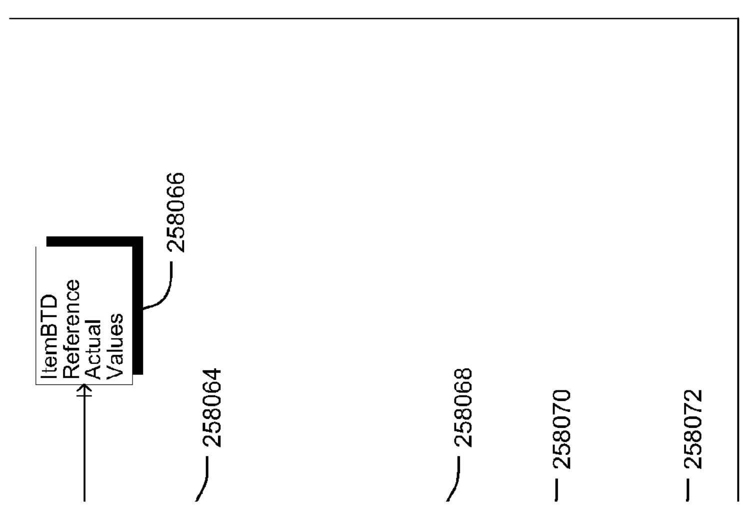
Figures 10, 258:
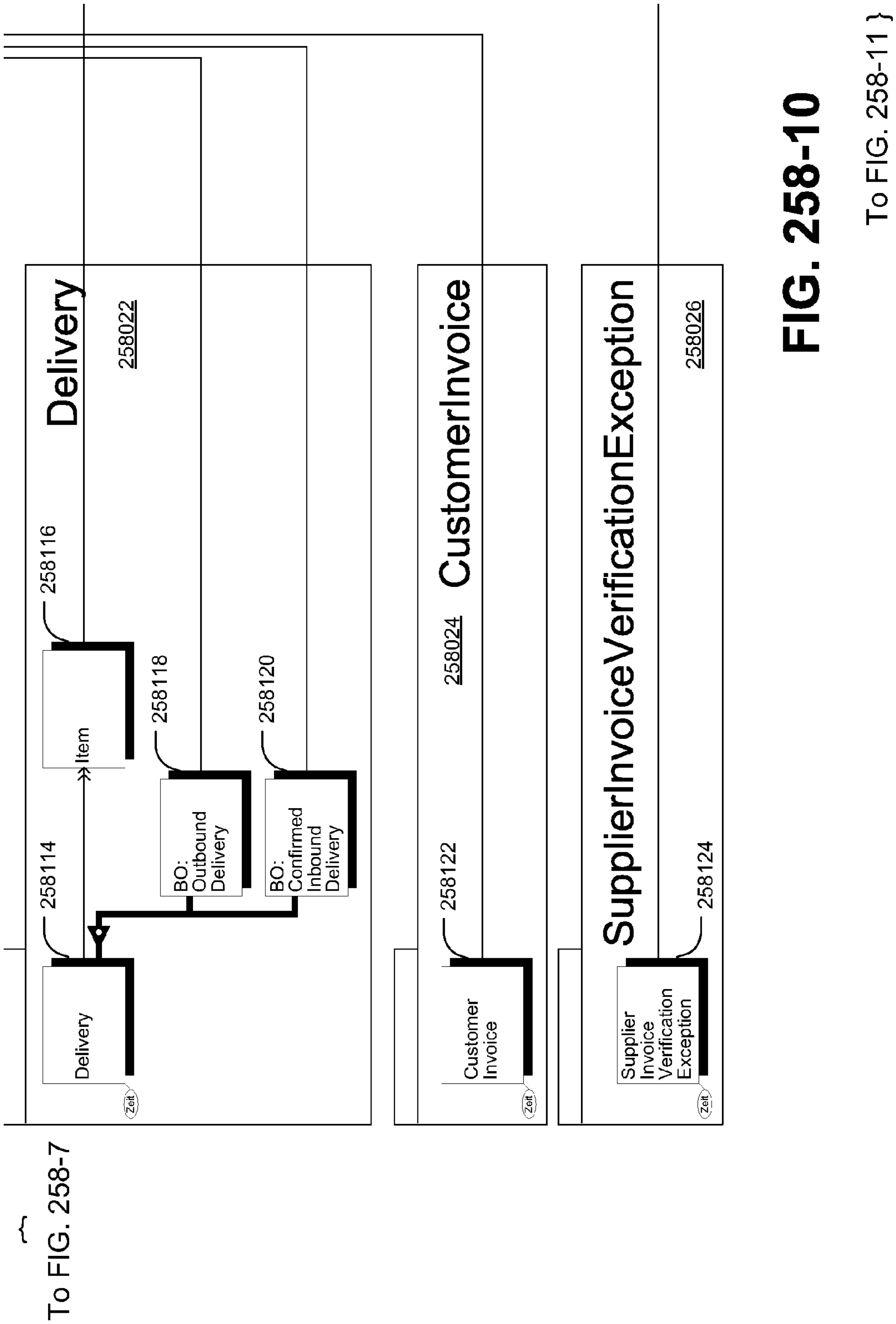
Figures 1, 262:
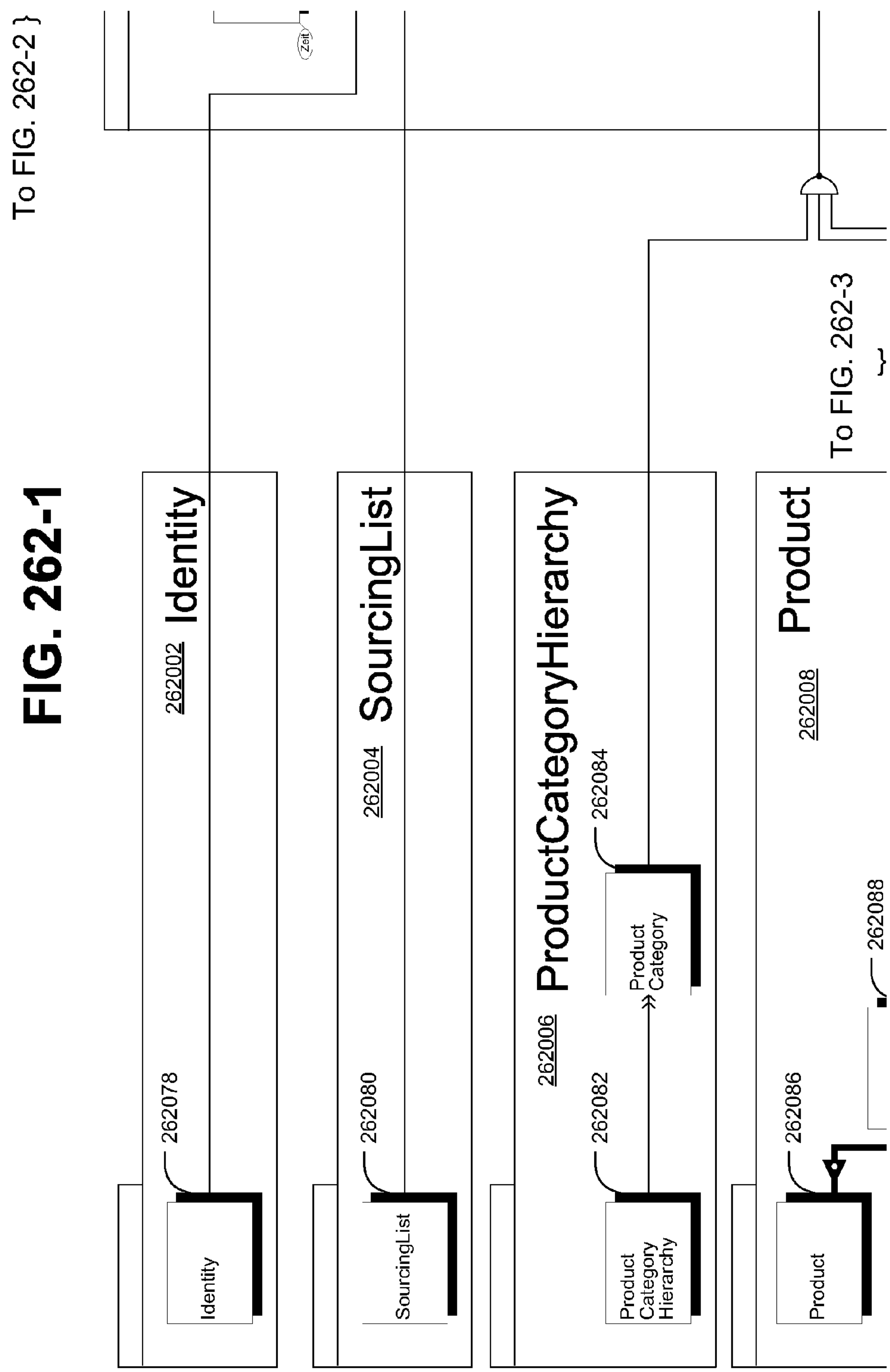
Figures 2, 262:
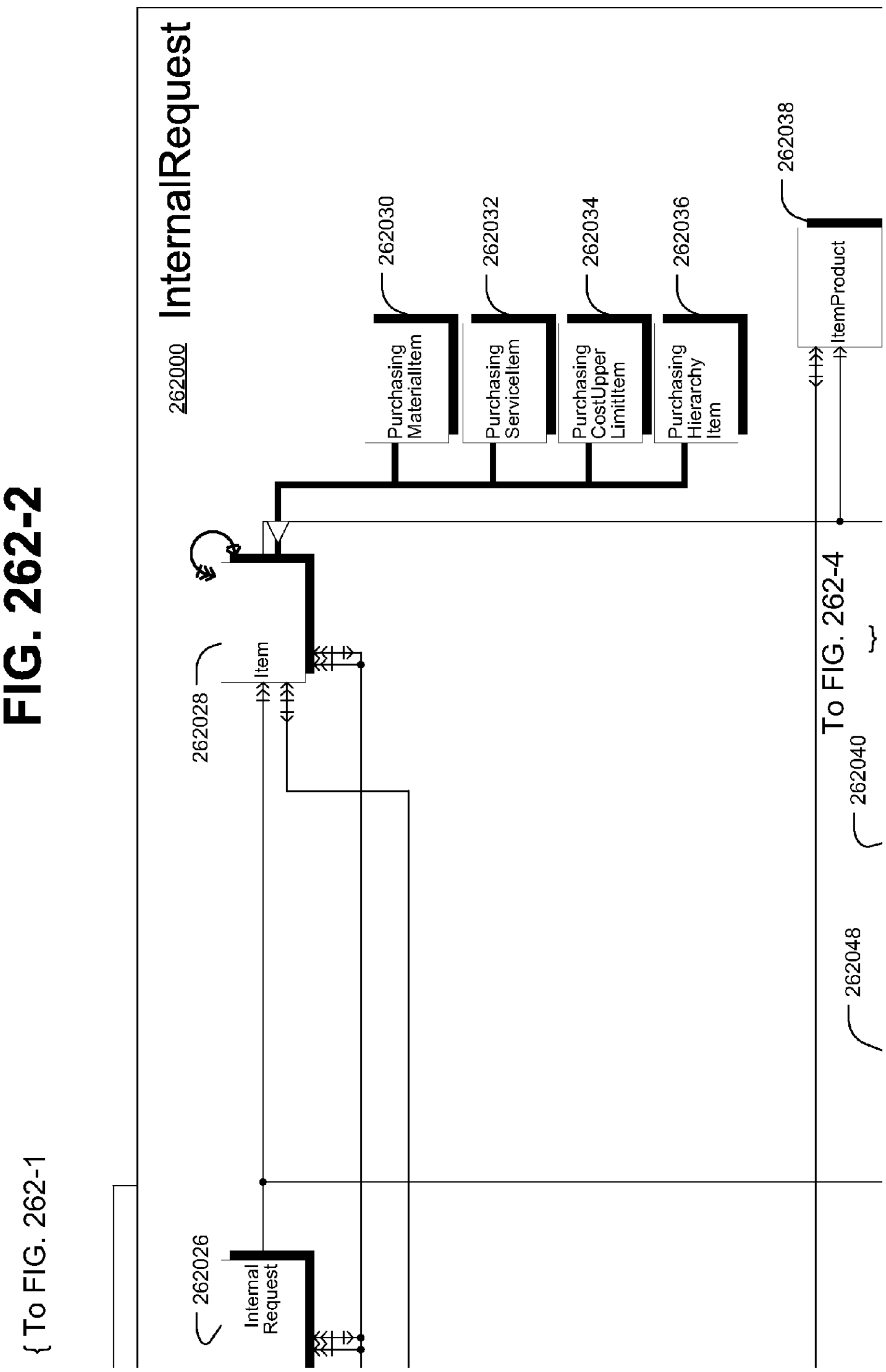
Figures 3, 262:
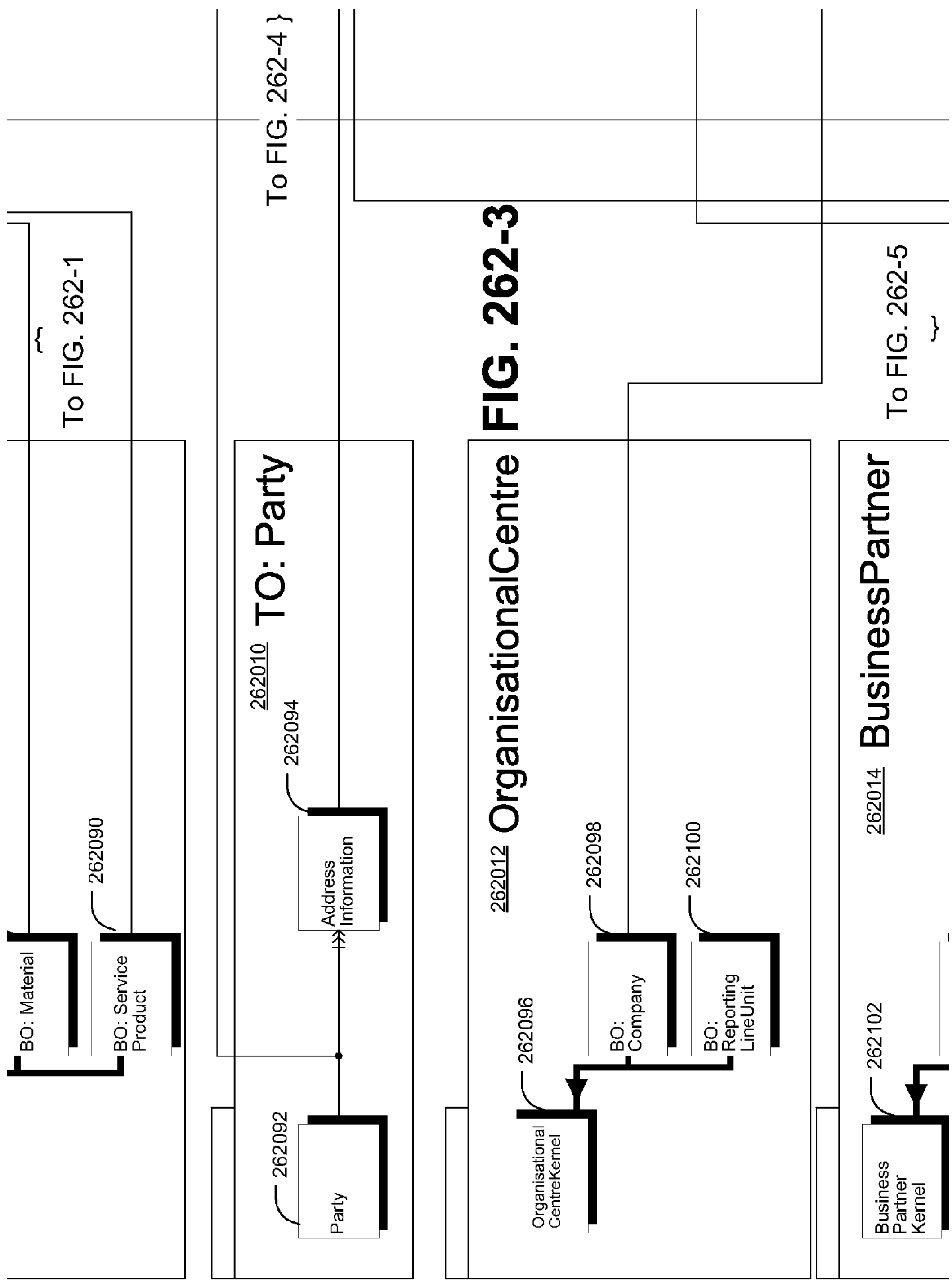
Figures 4, 262:
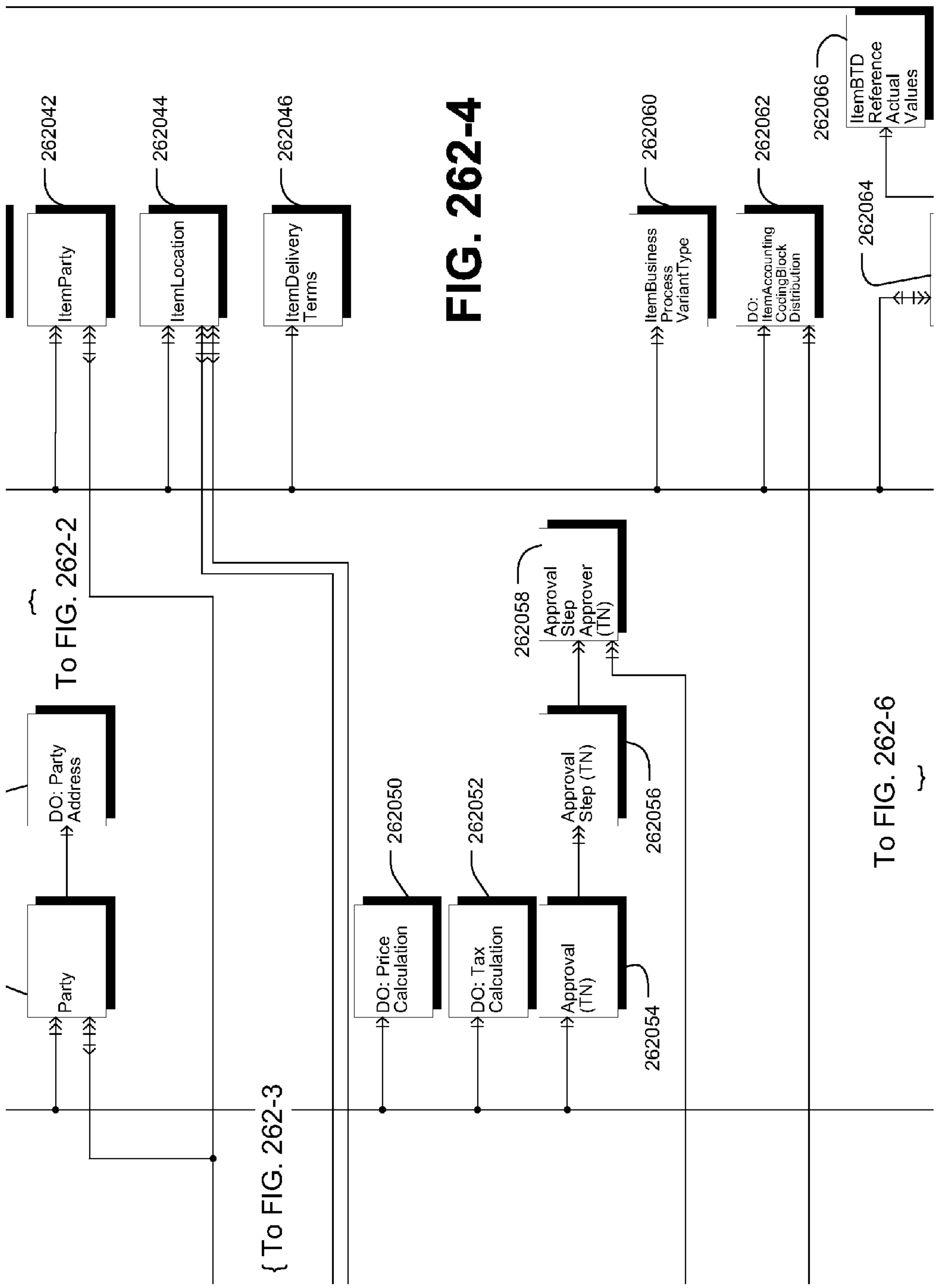
Figures 5, 262:
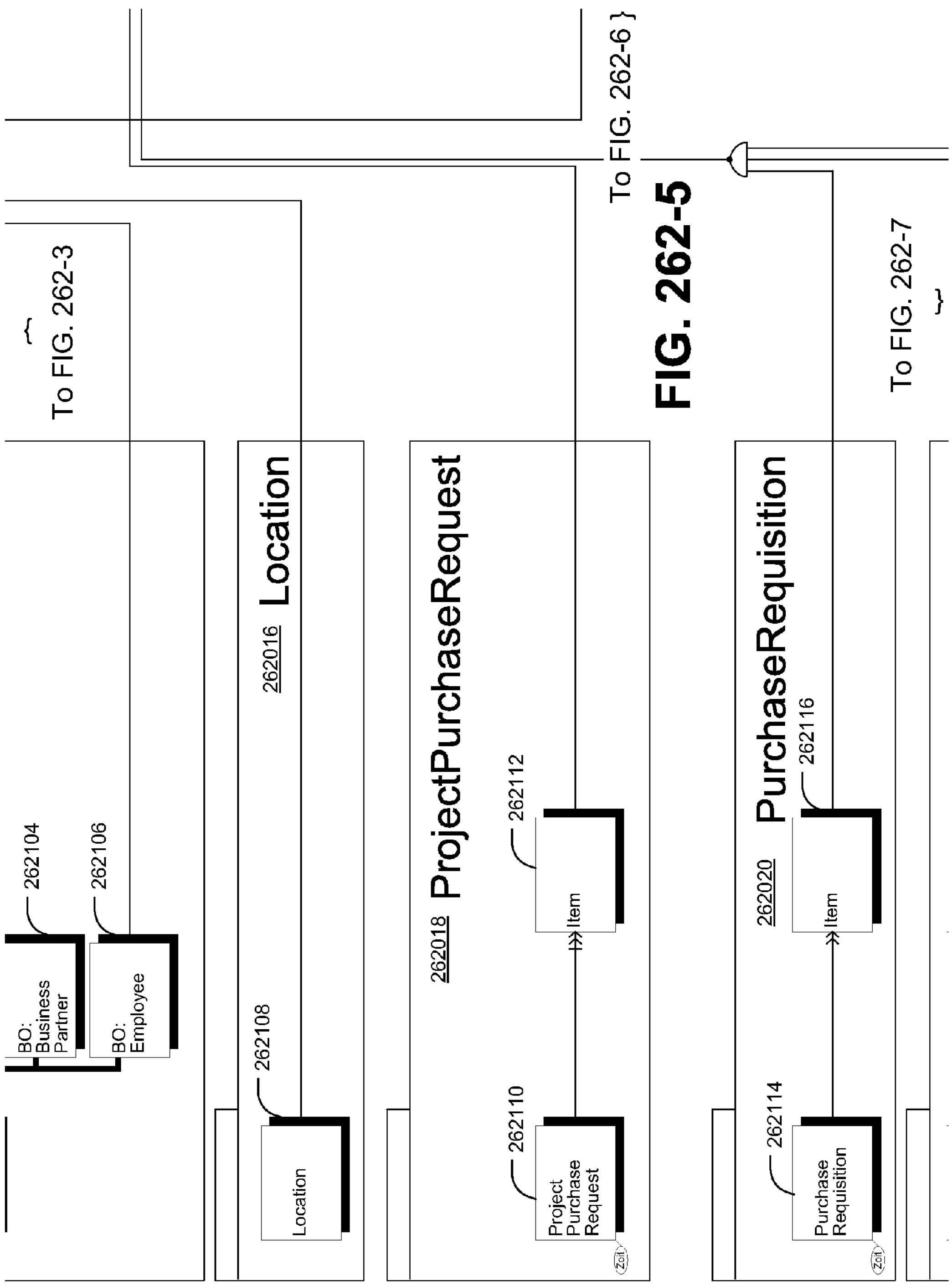
Figures 6, 262:
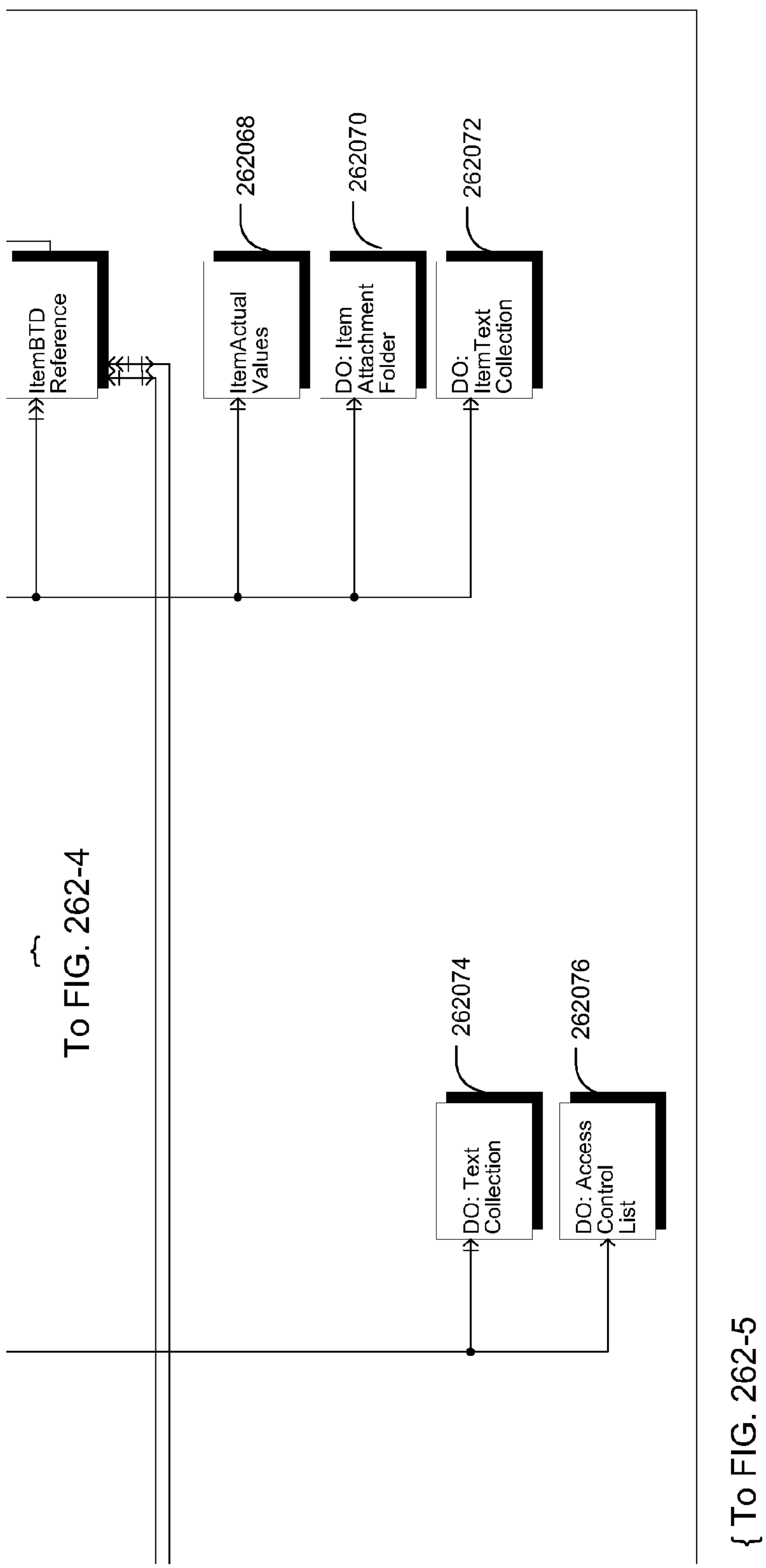
Figures 7, 262:
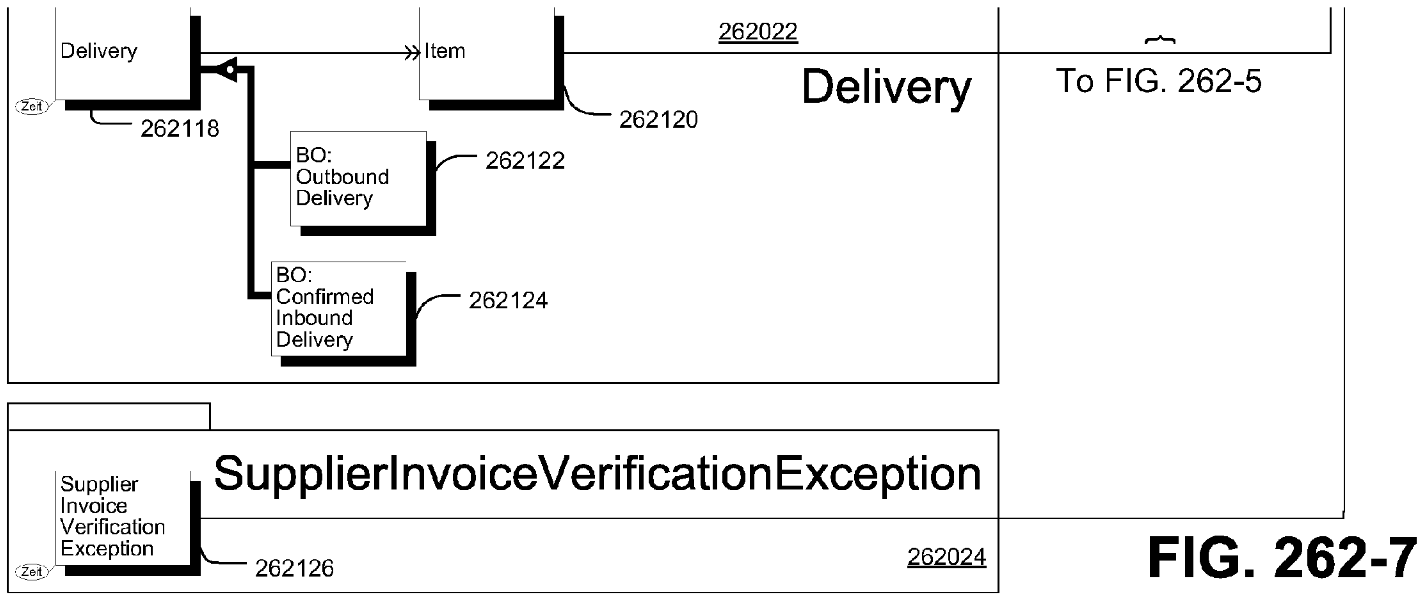
Figures 1, 263:
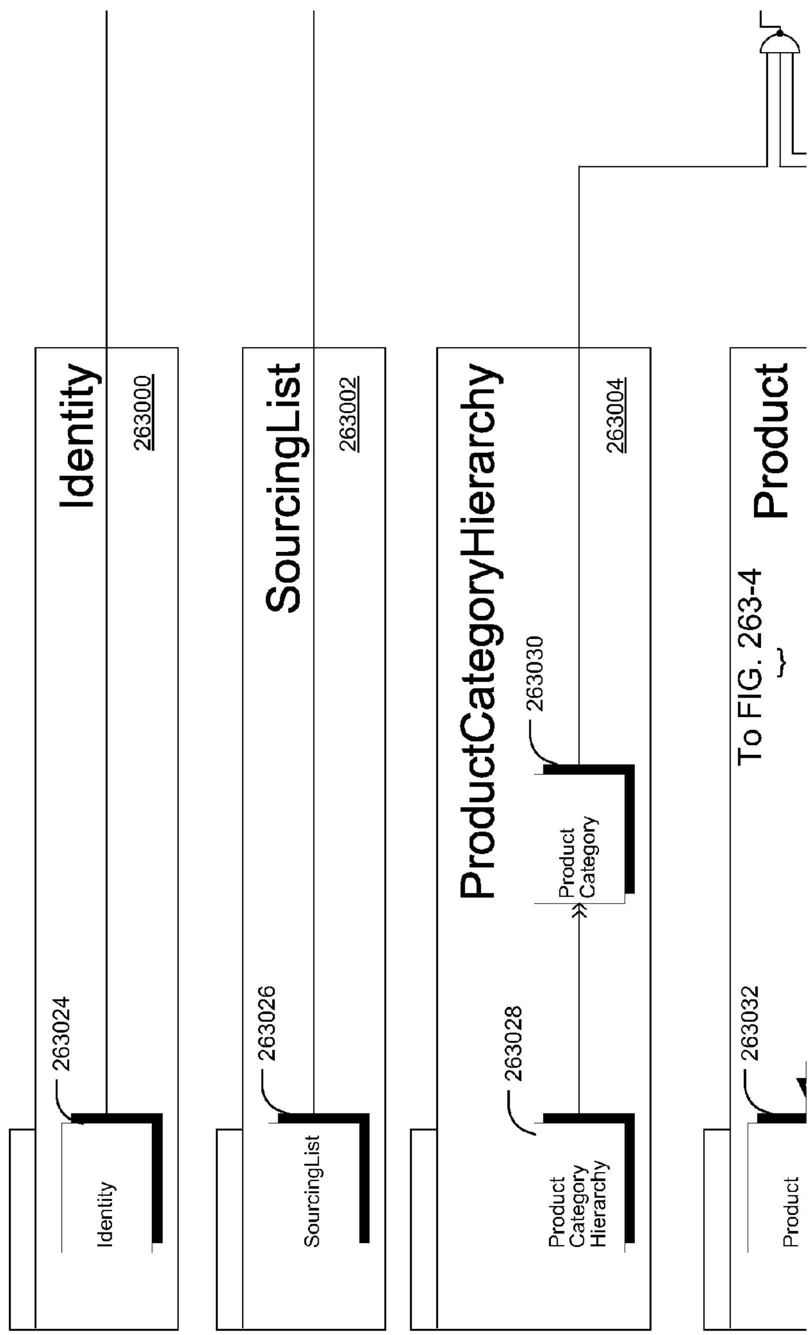
Figures 2, 263:
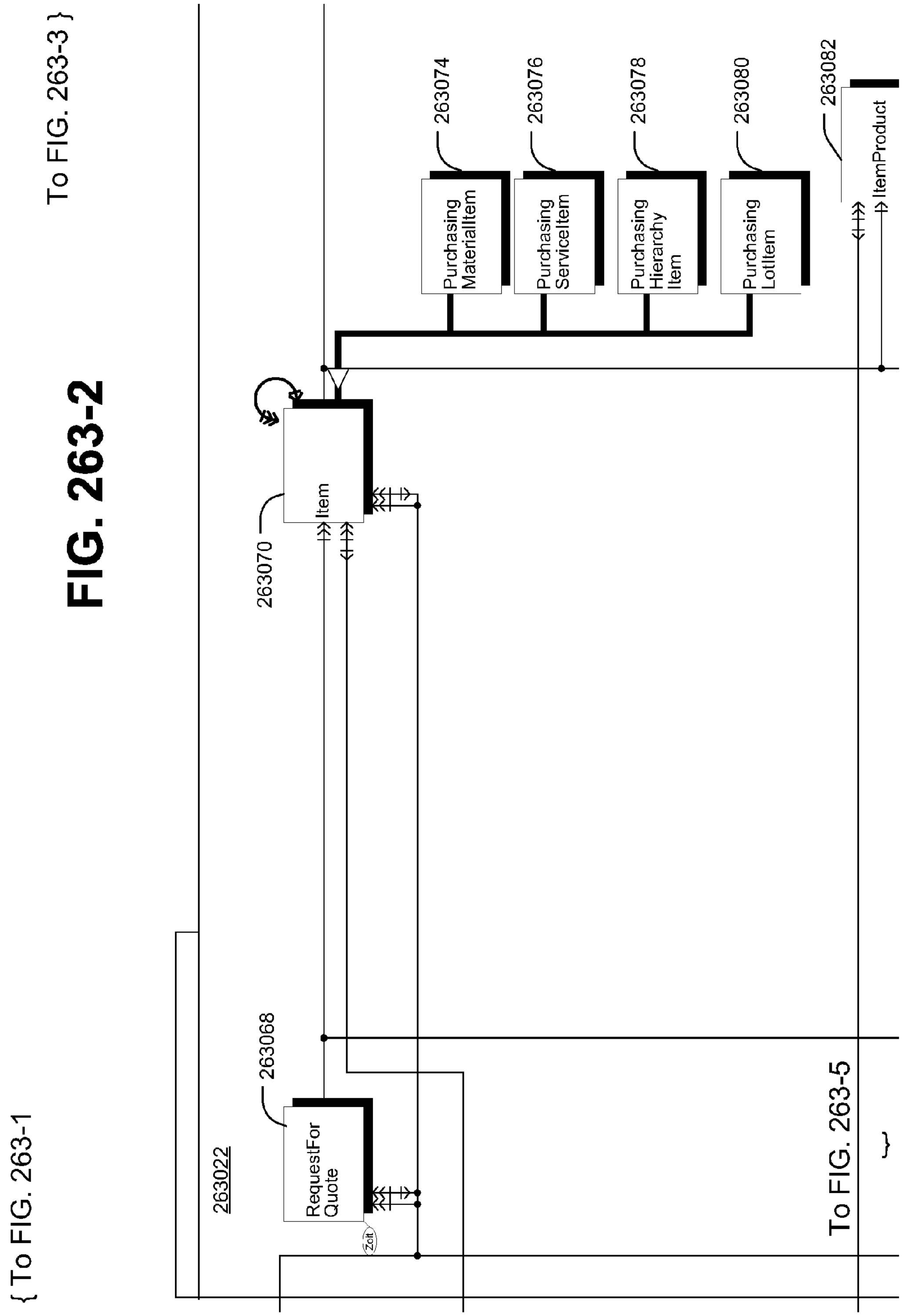
Figures 3, 263:
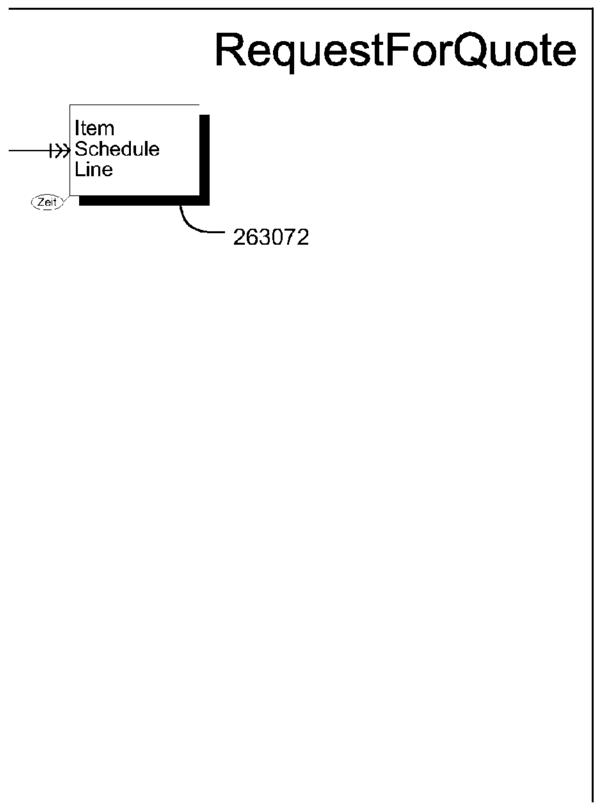
Figures 4, 263:
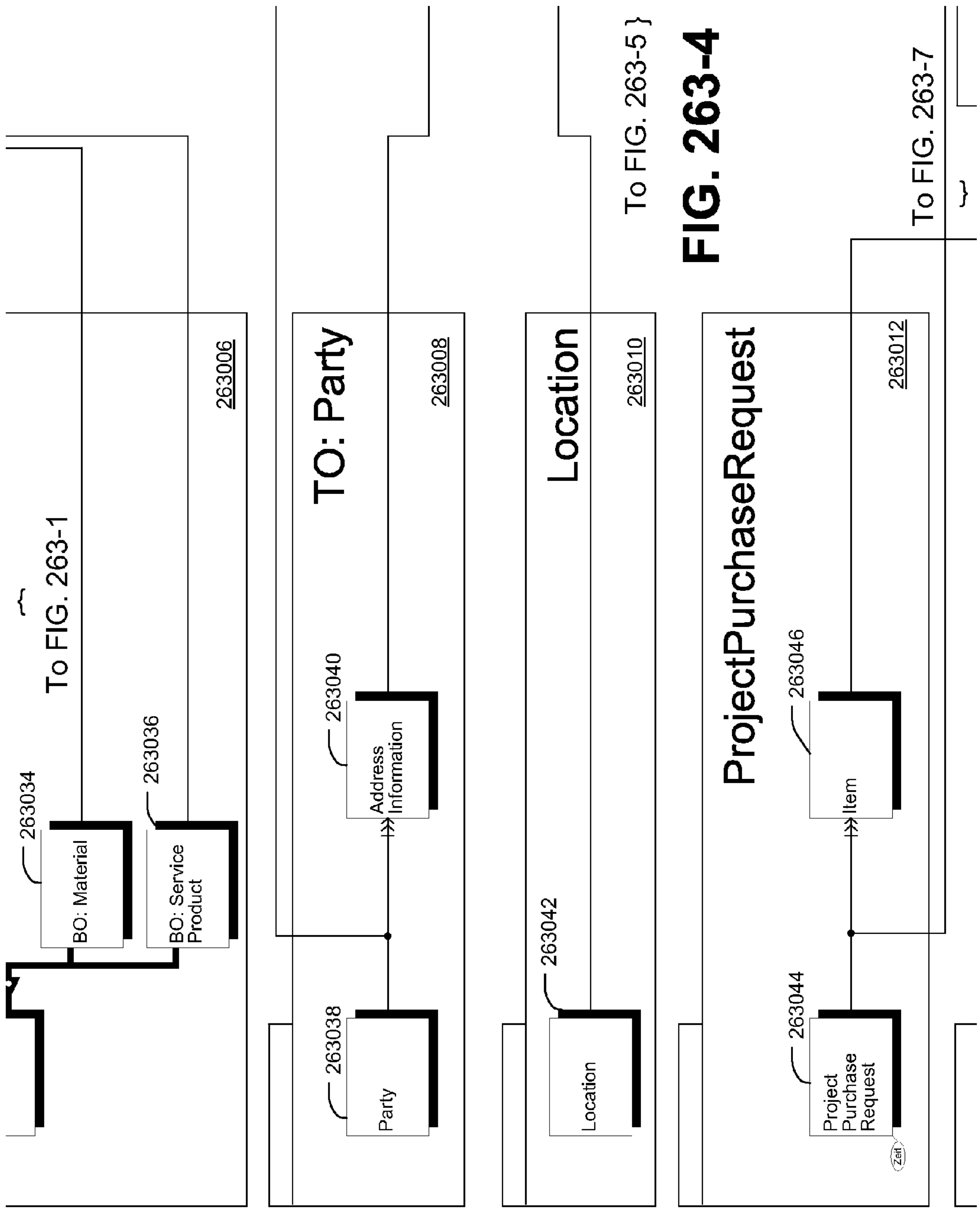
Figures 5, 263:
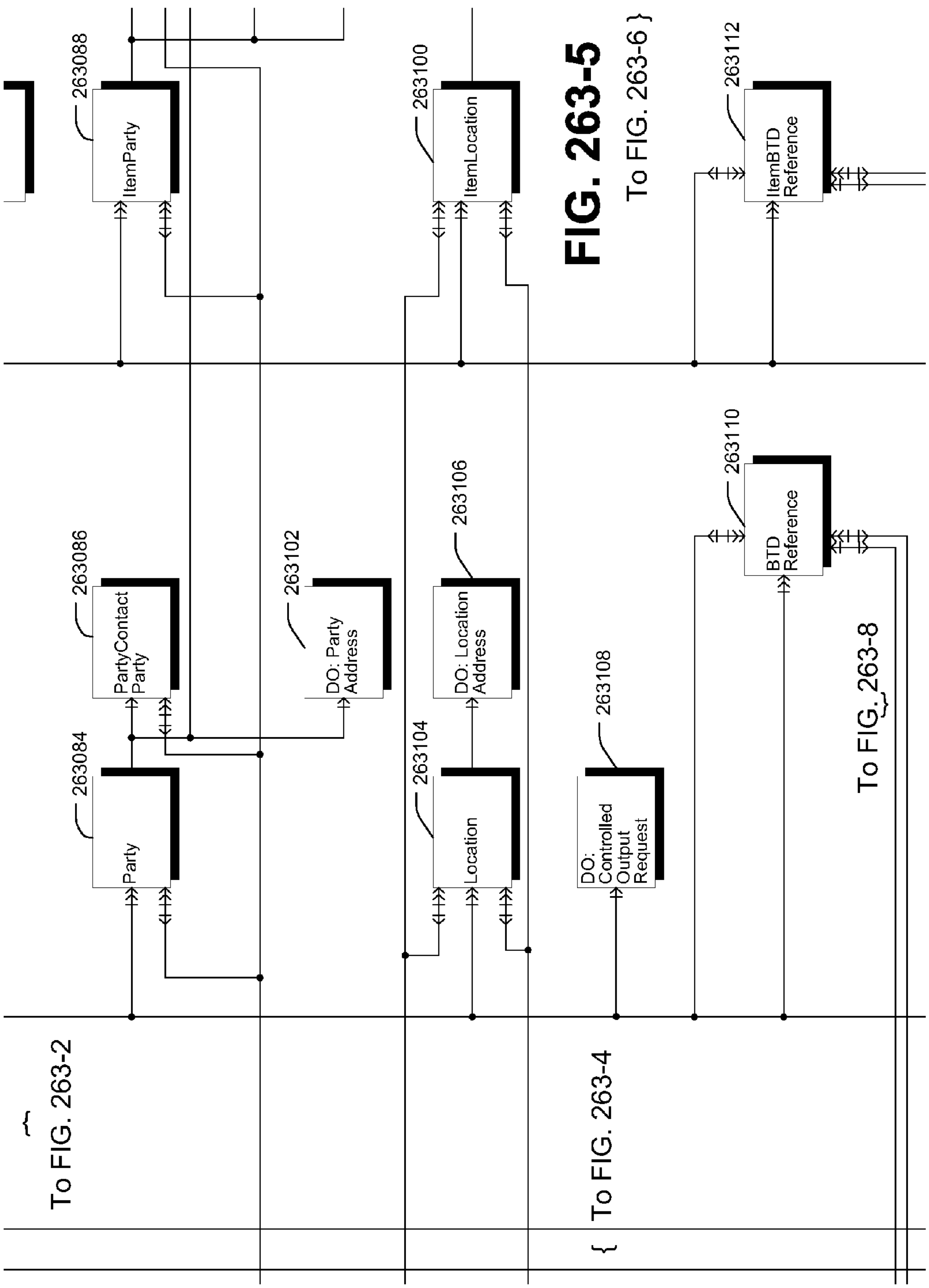
Figures 6, 263:
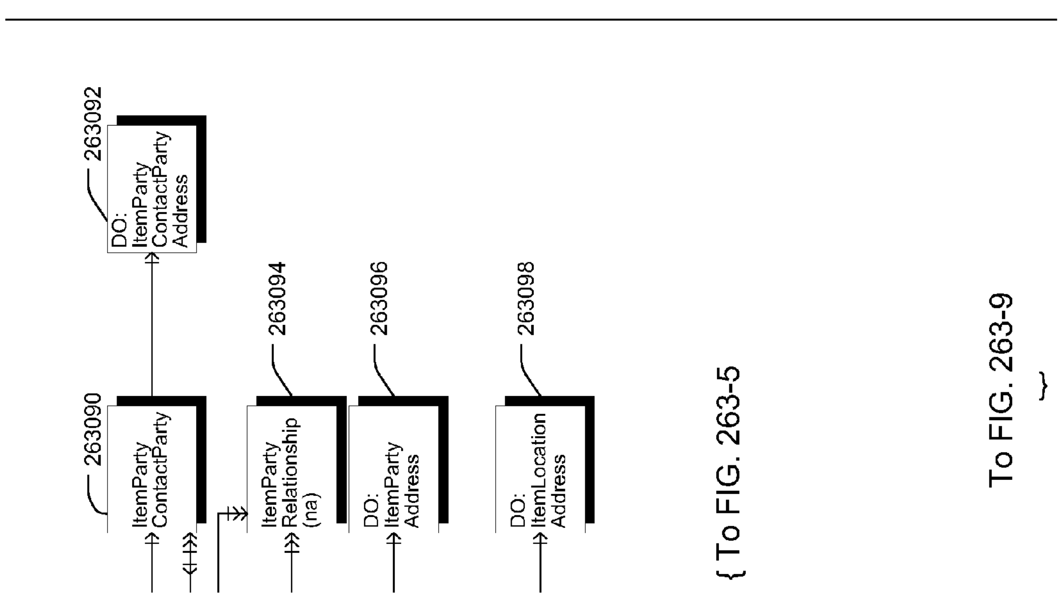
Figures 7, 263:
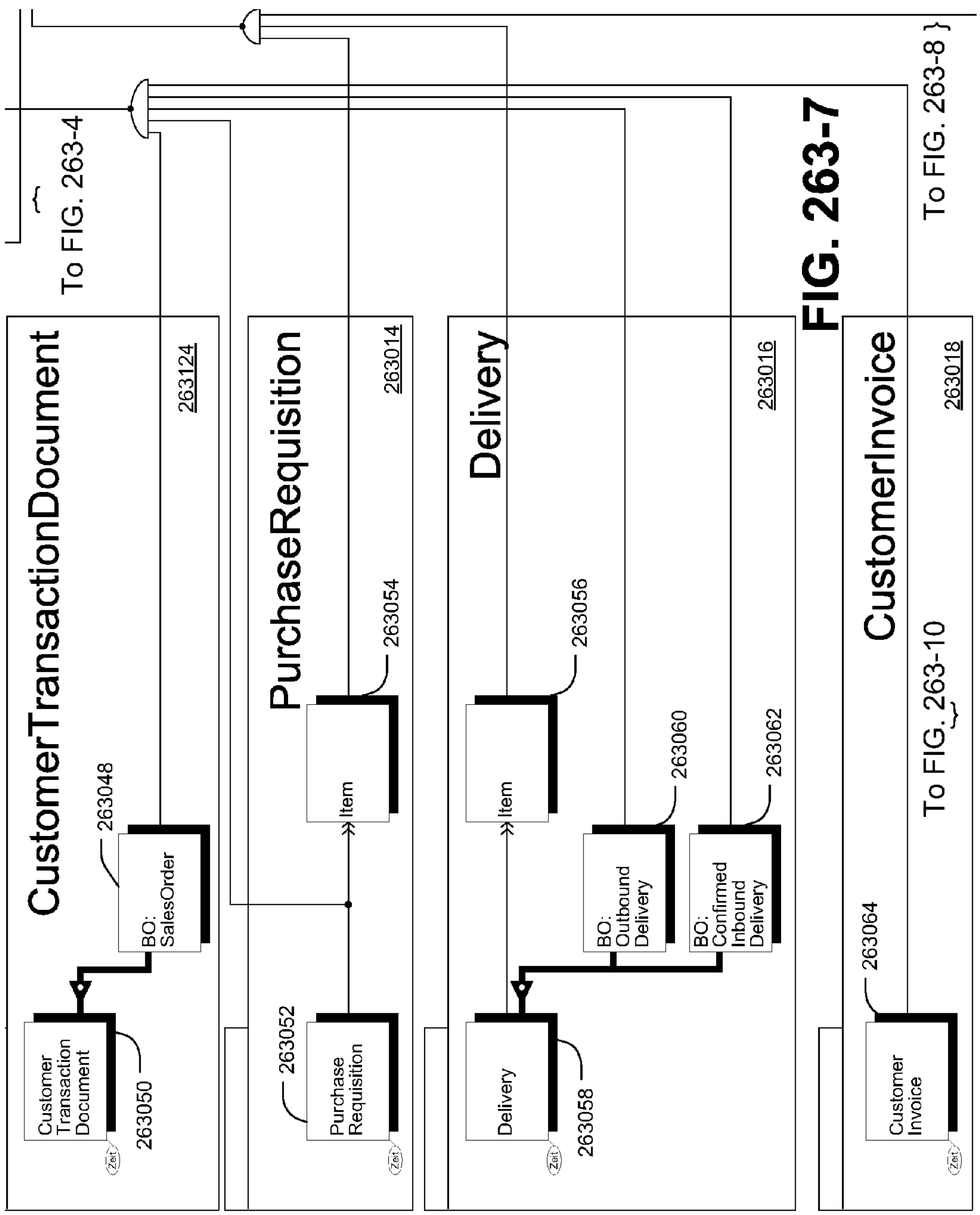
Figures 8, 263:
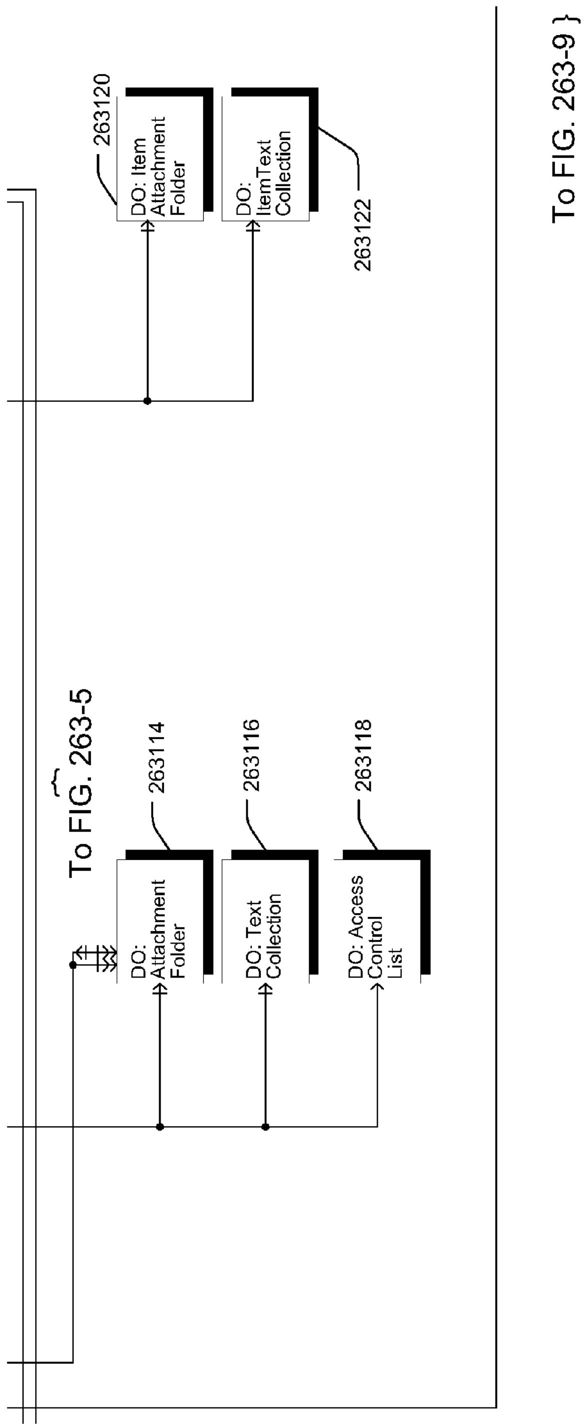
Figures 10, 263:
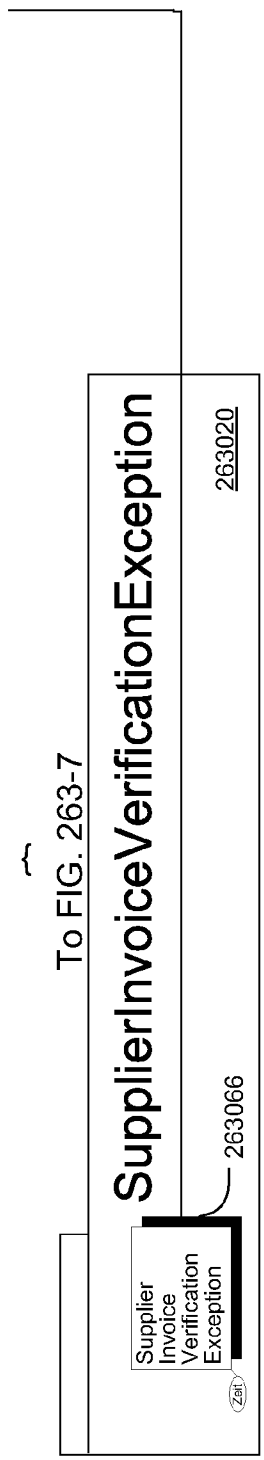
Figures 1, 264:
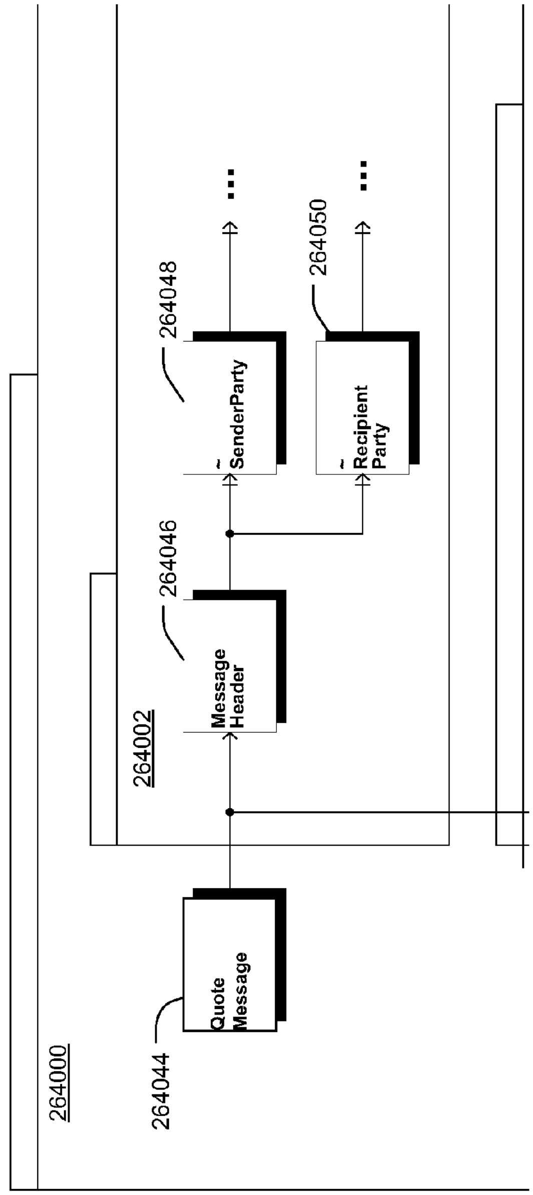
Figures 2, 264:
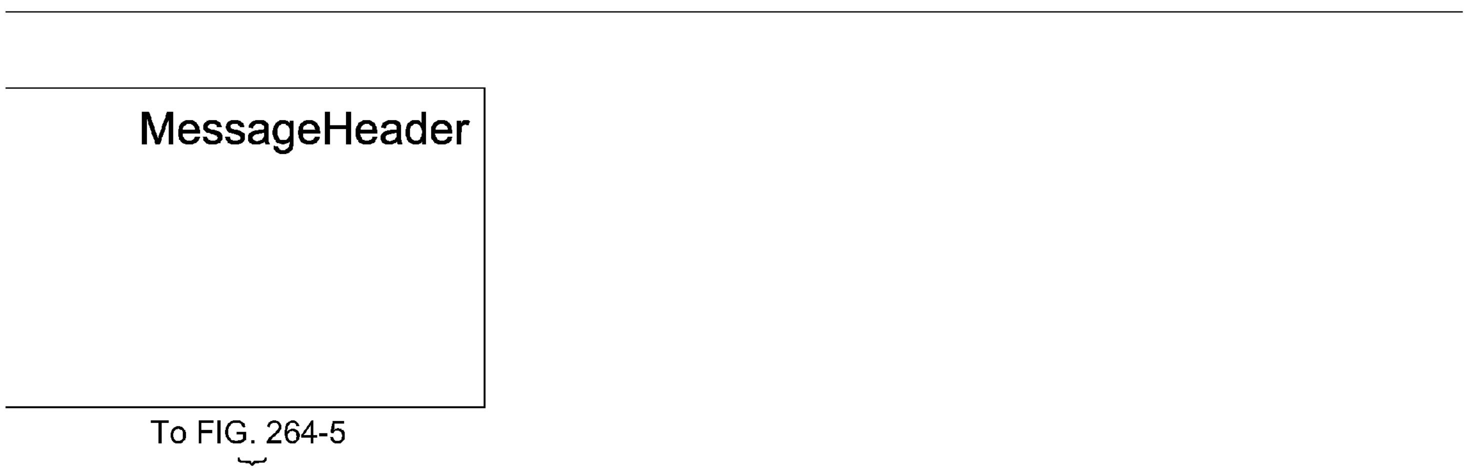
Figures 4, 264:
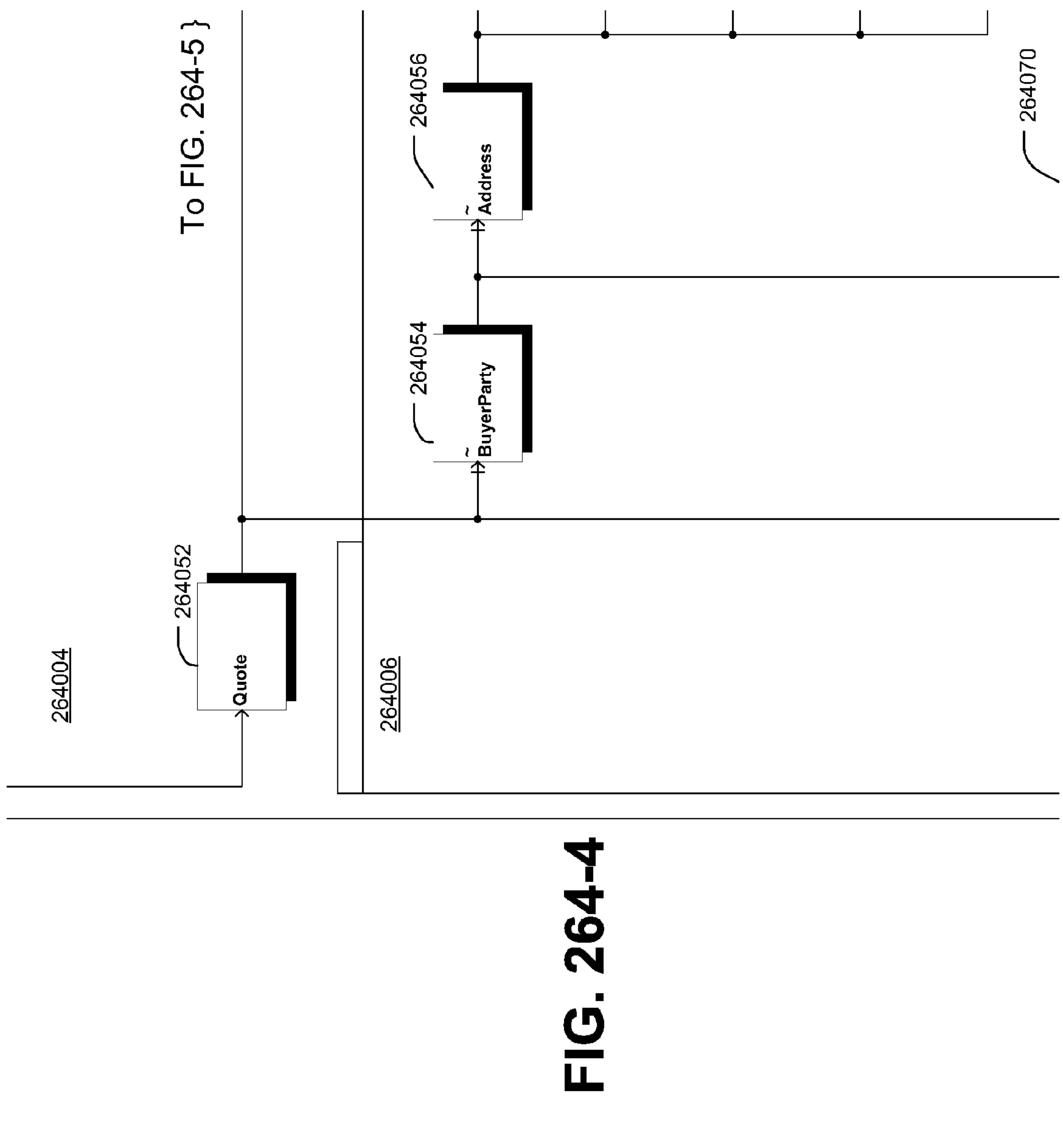
Figures 5, 264:
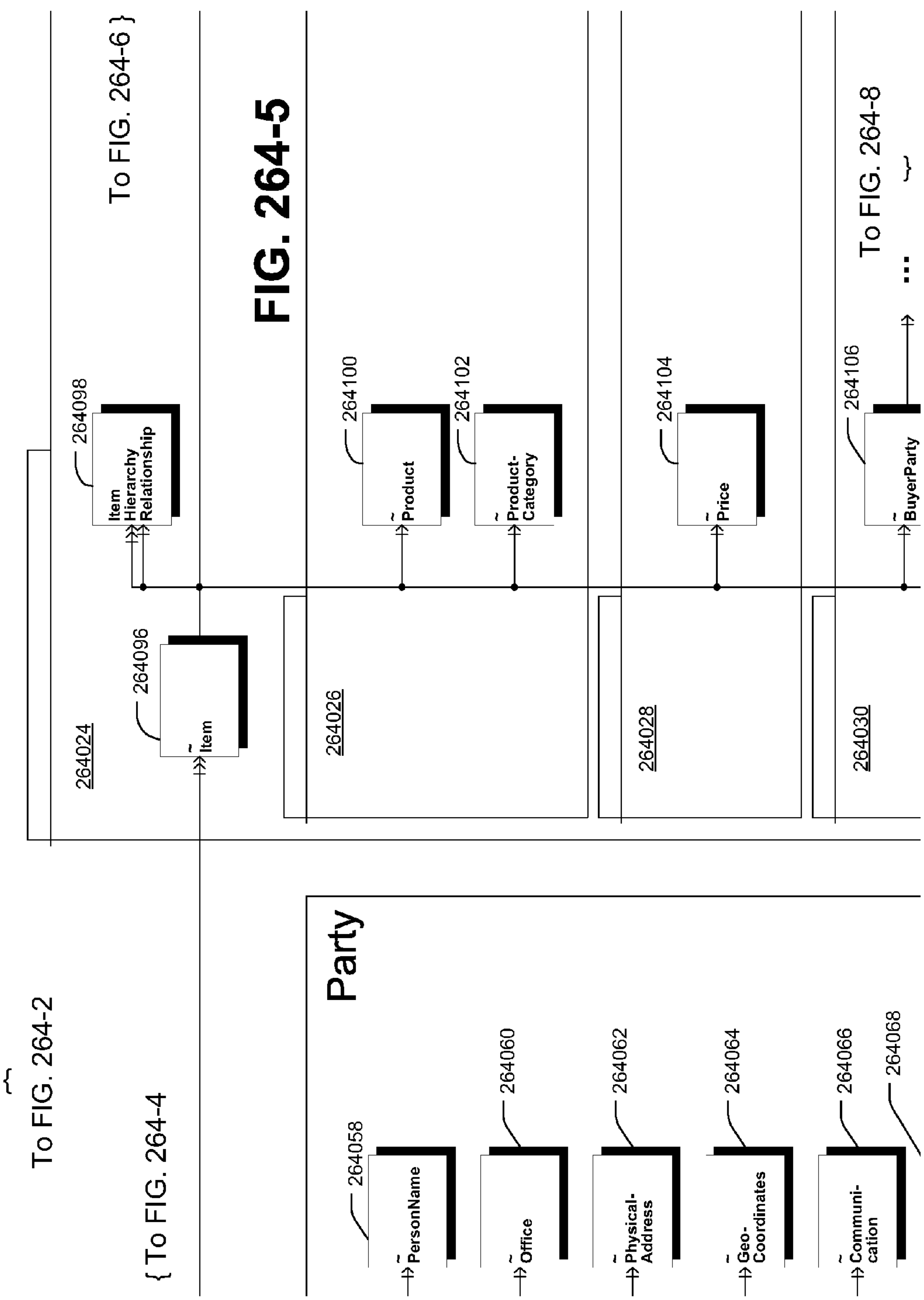
Figures 6, 264:
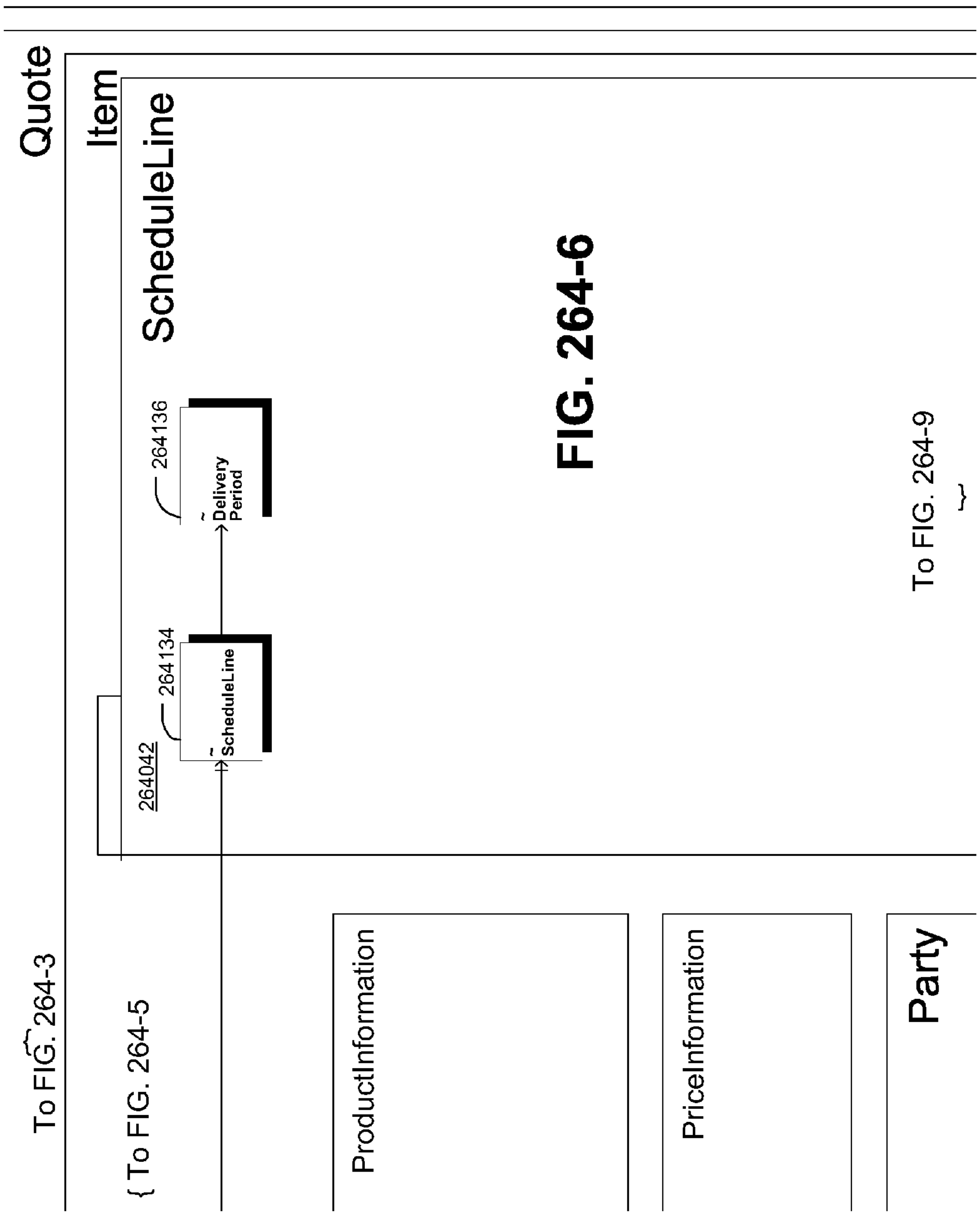
Figures 7, 264:
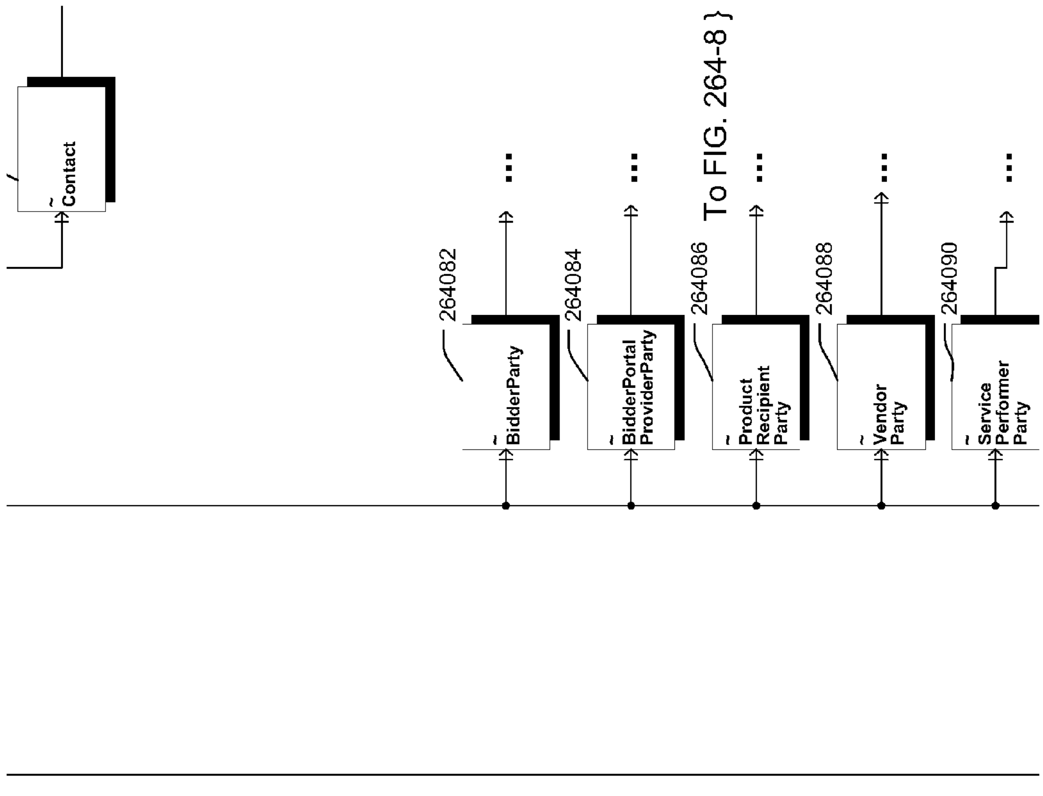
Figures 8, 264:
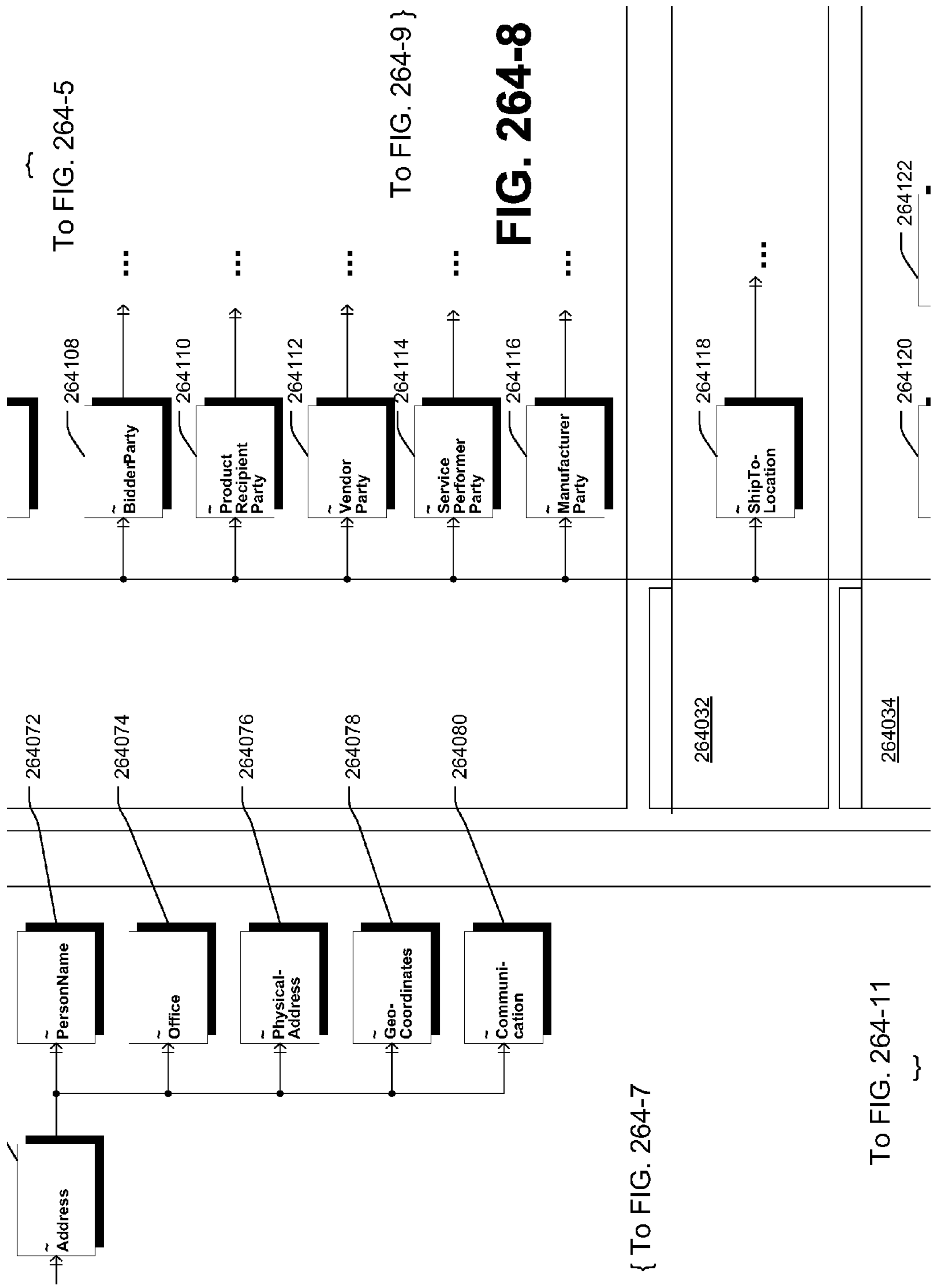
Figures 9, 264:
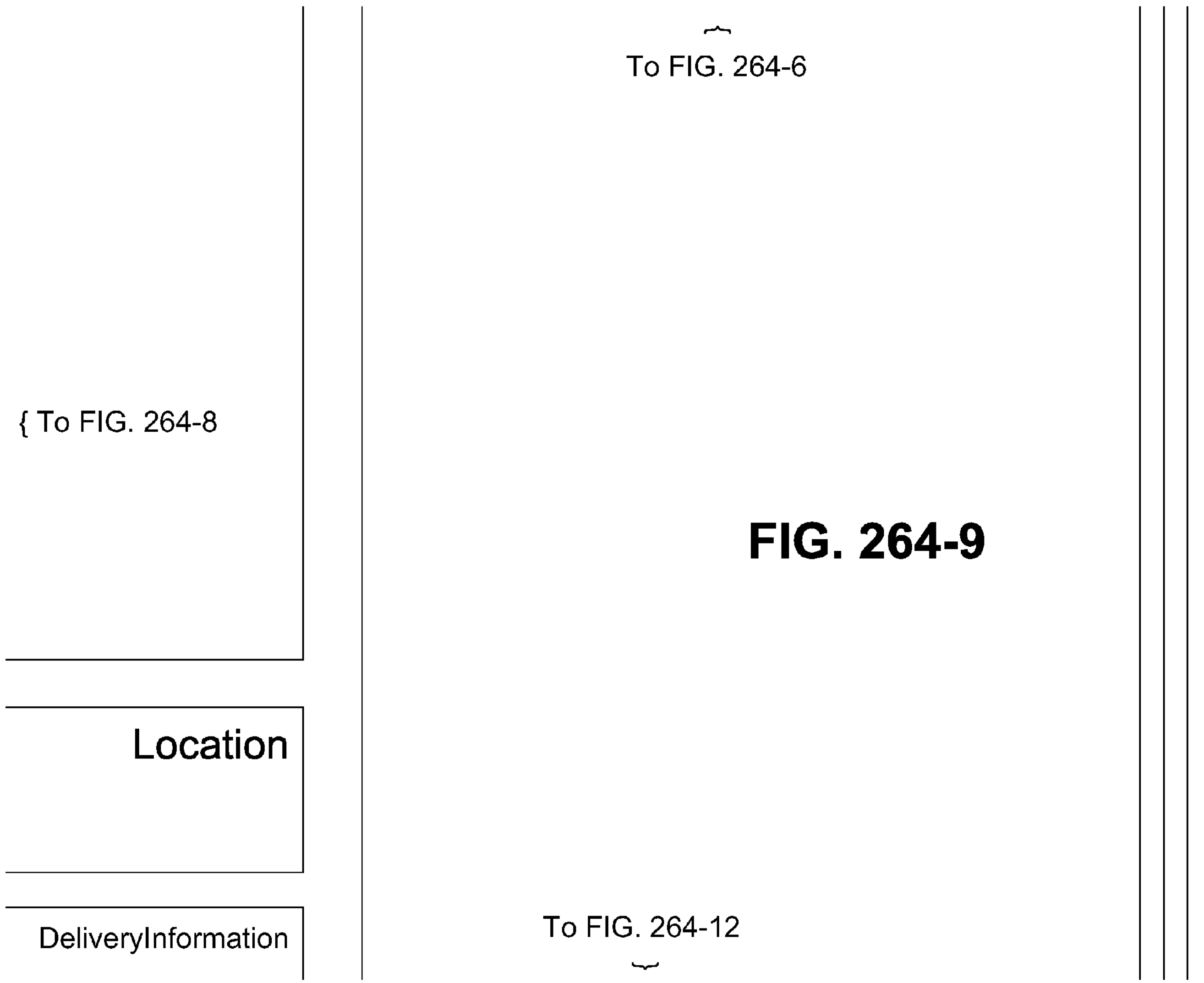
Figures 10, 264:
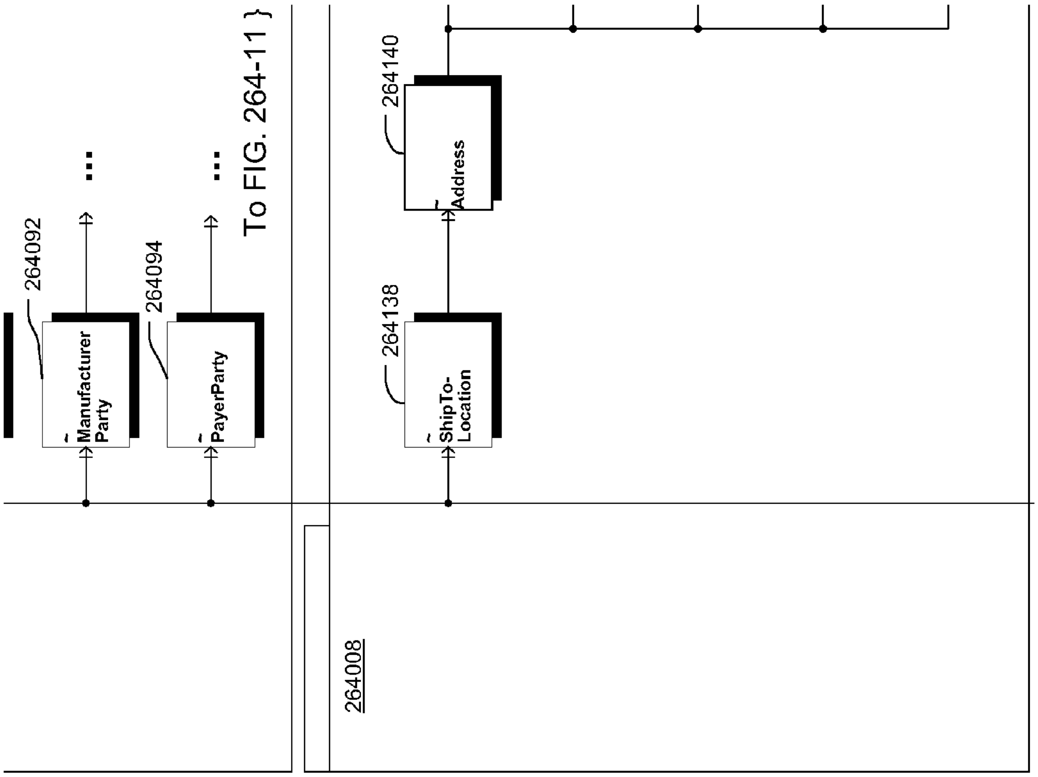
Figures 11, 264:
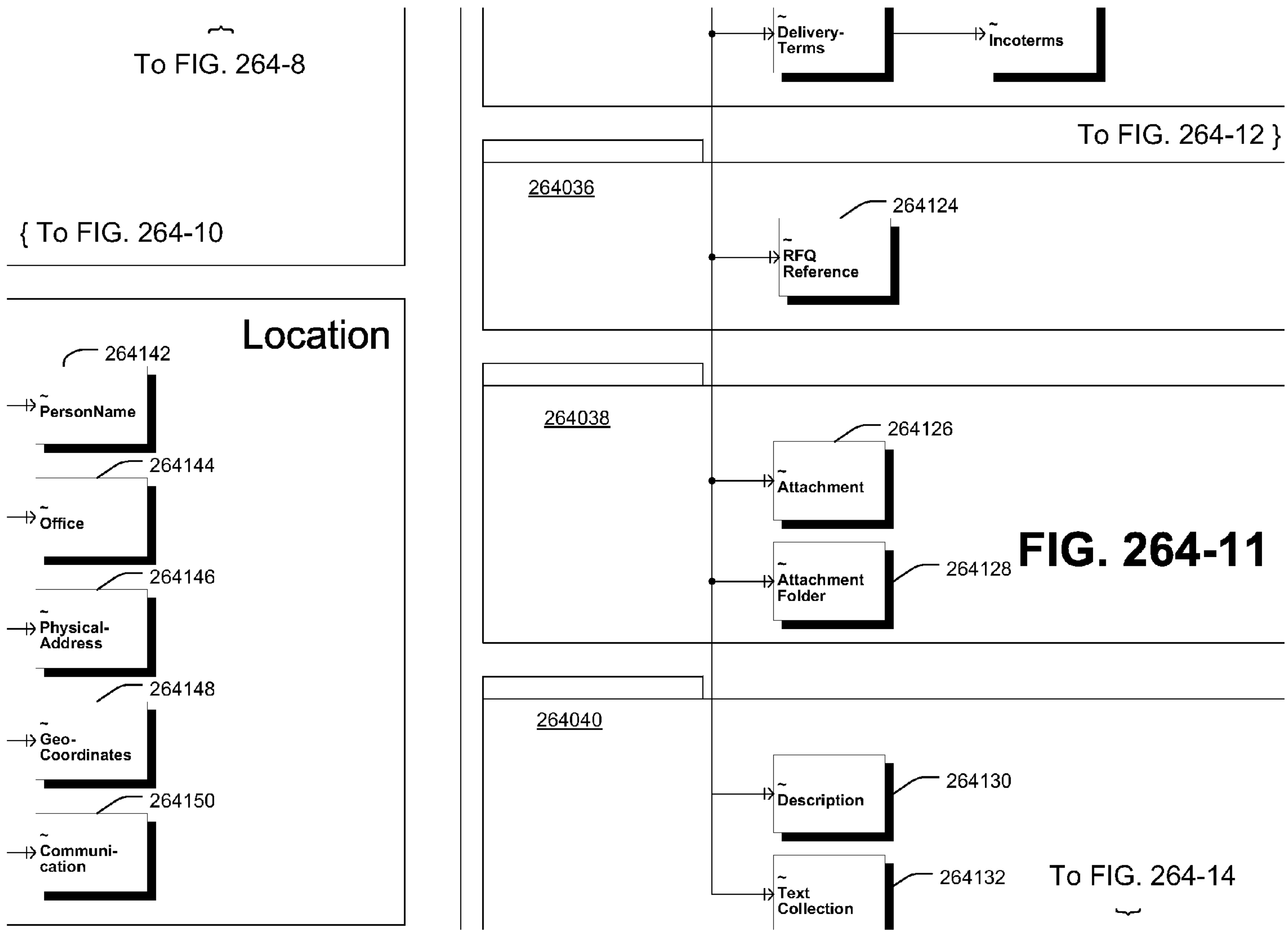
Figures 12, 264:
Figures 13, 264:
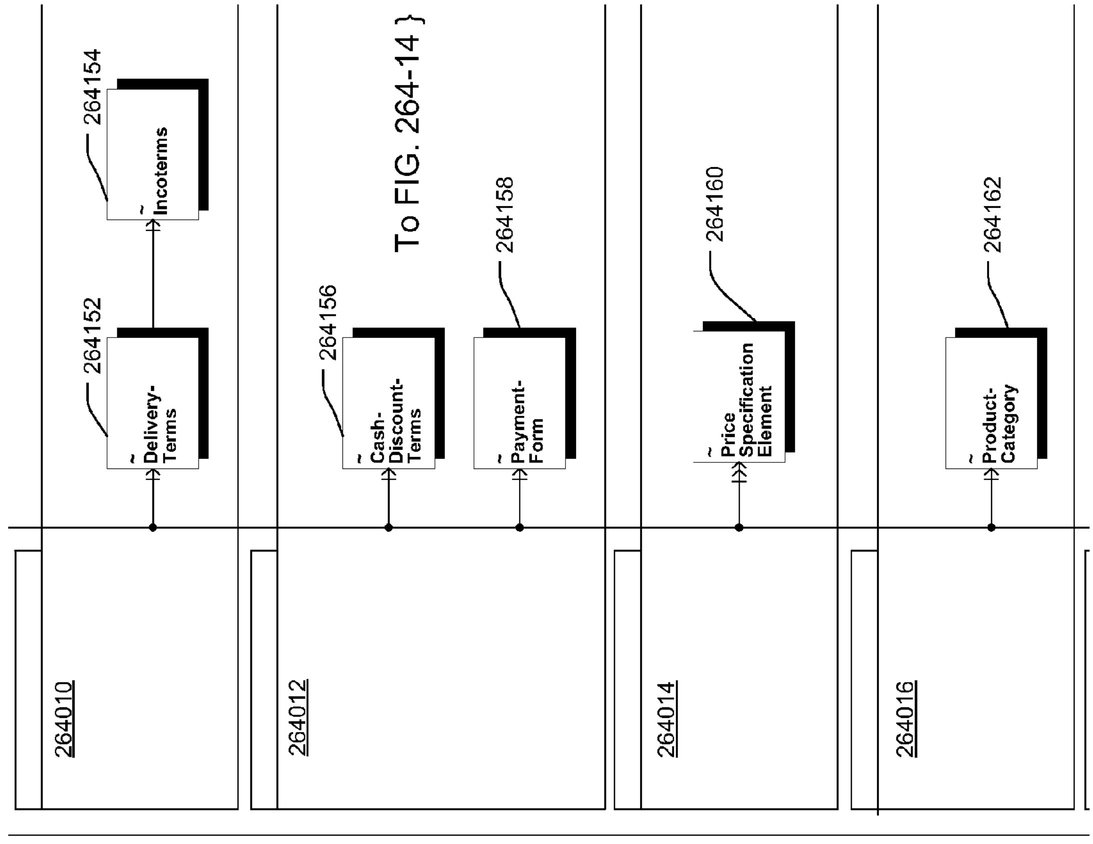
Figures 14, 264:
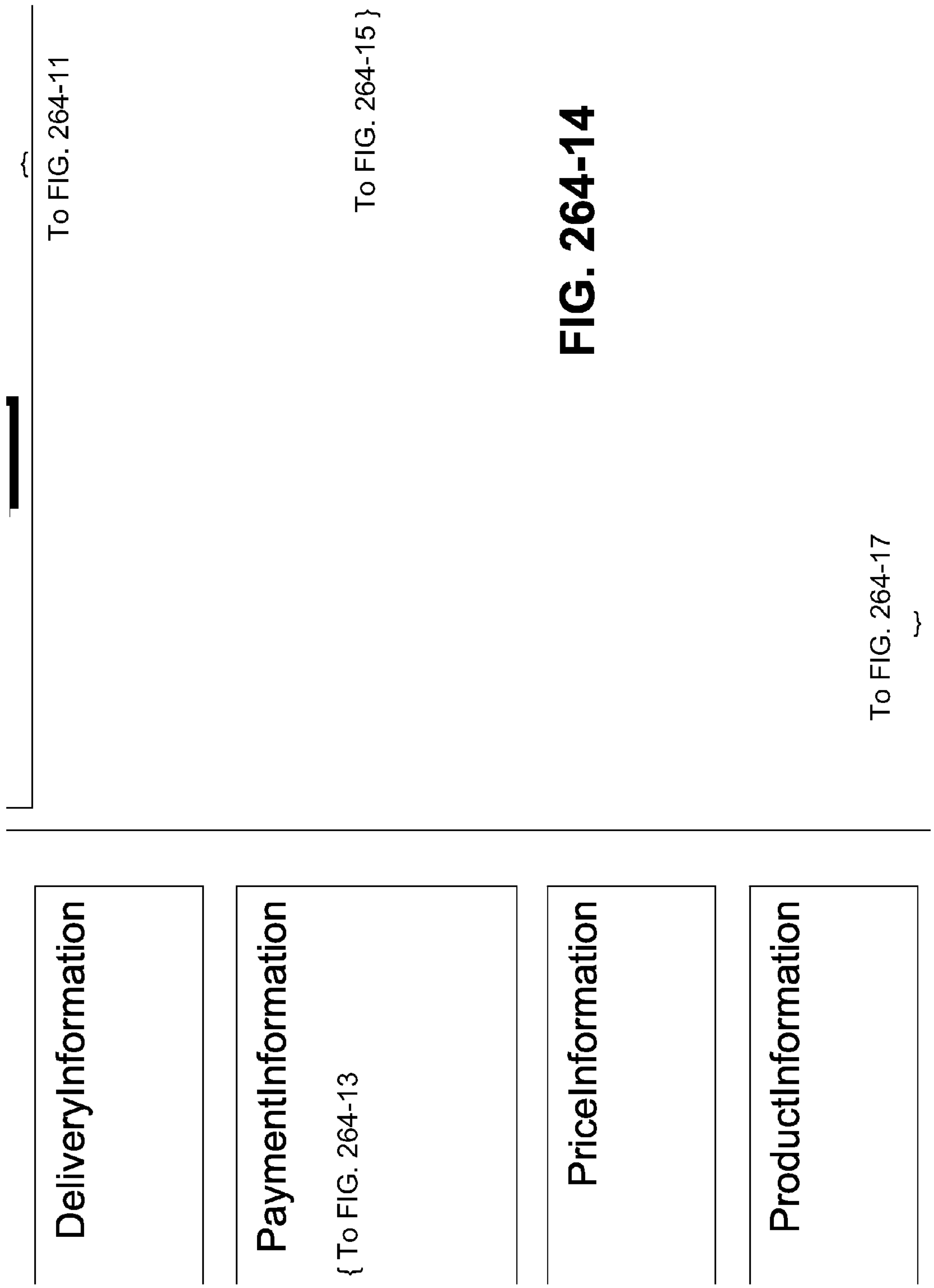
Figures 16, 264:
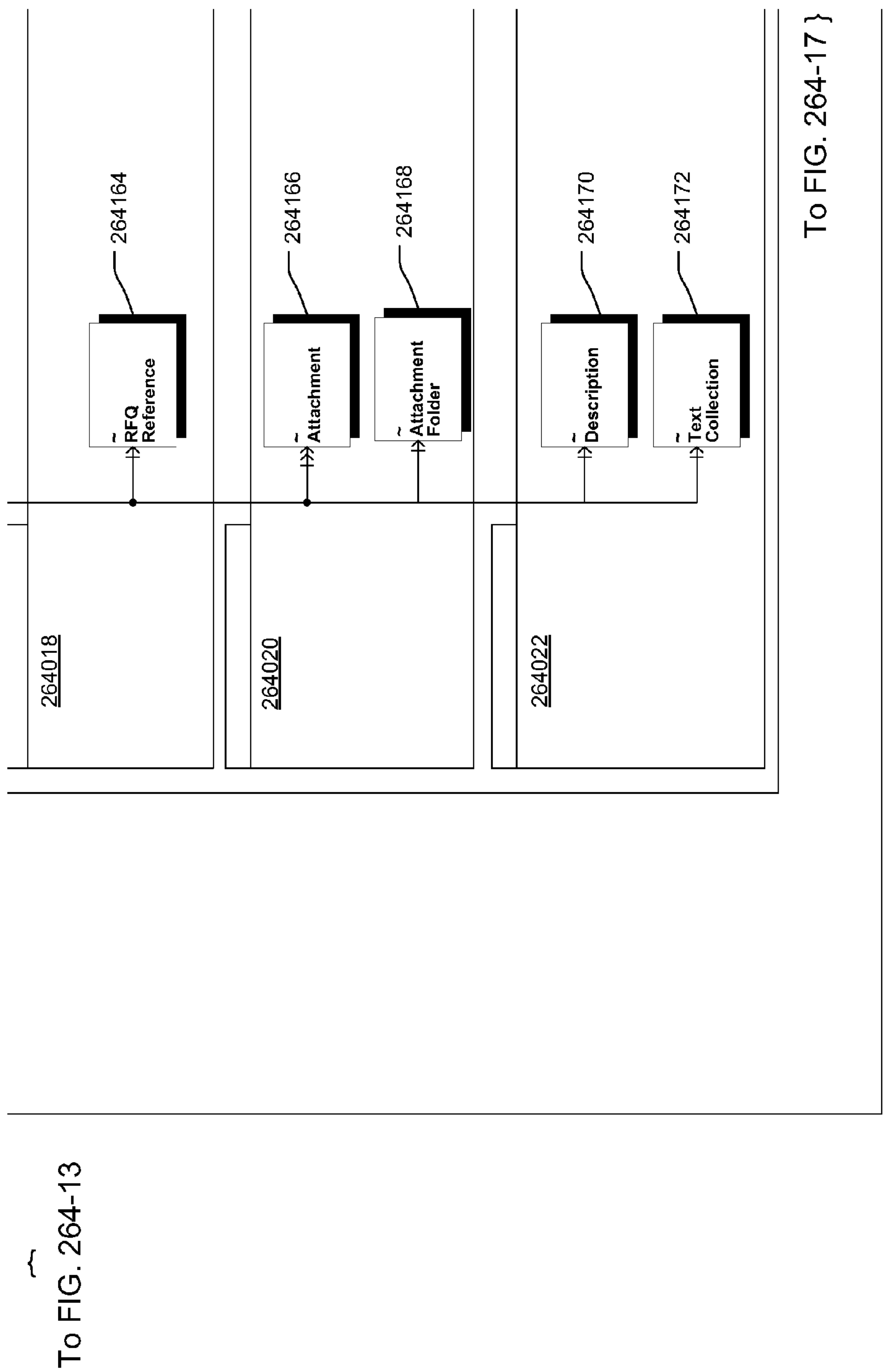
Figures 17, 264:
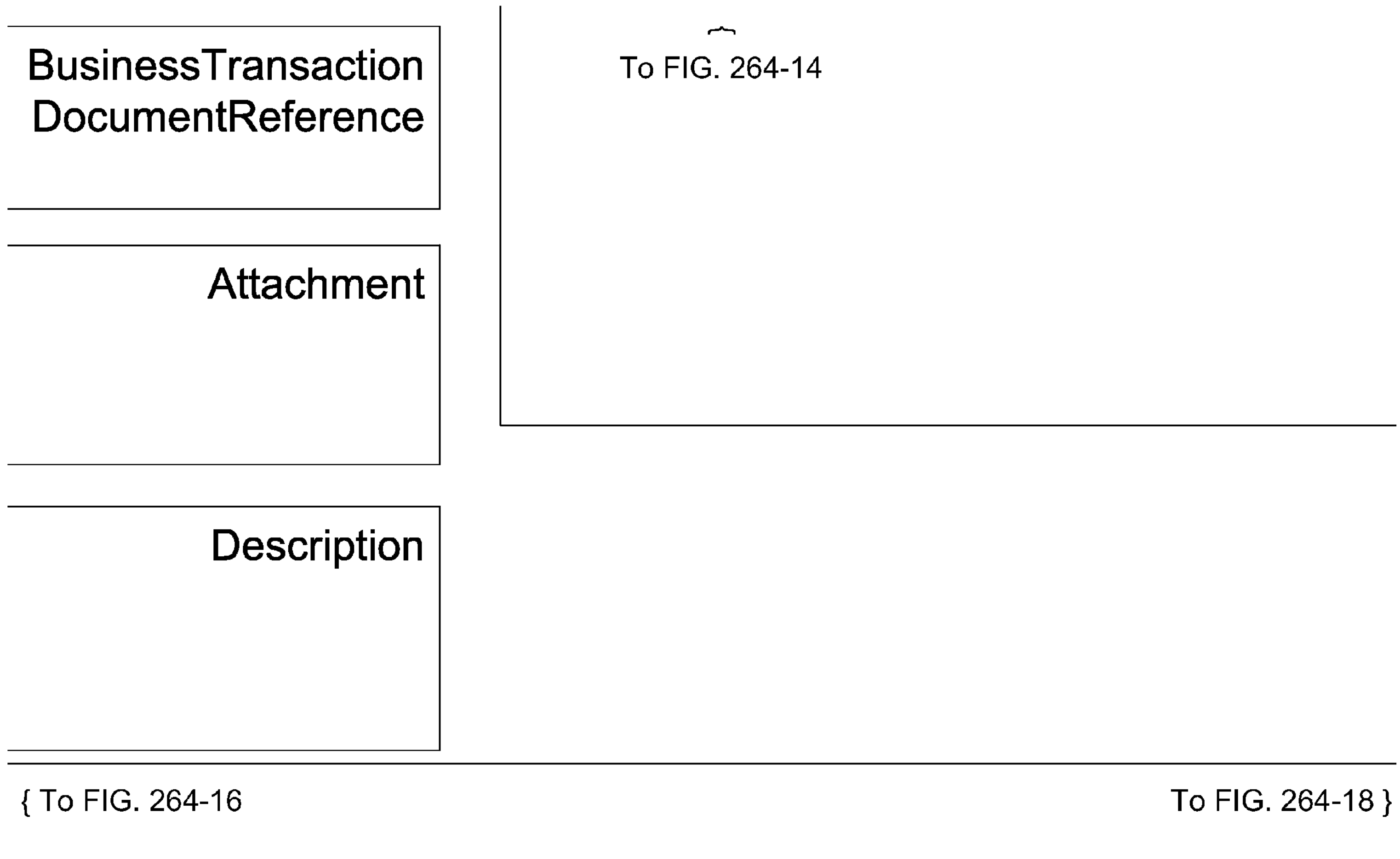
Figures 18, 264:
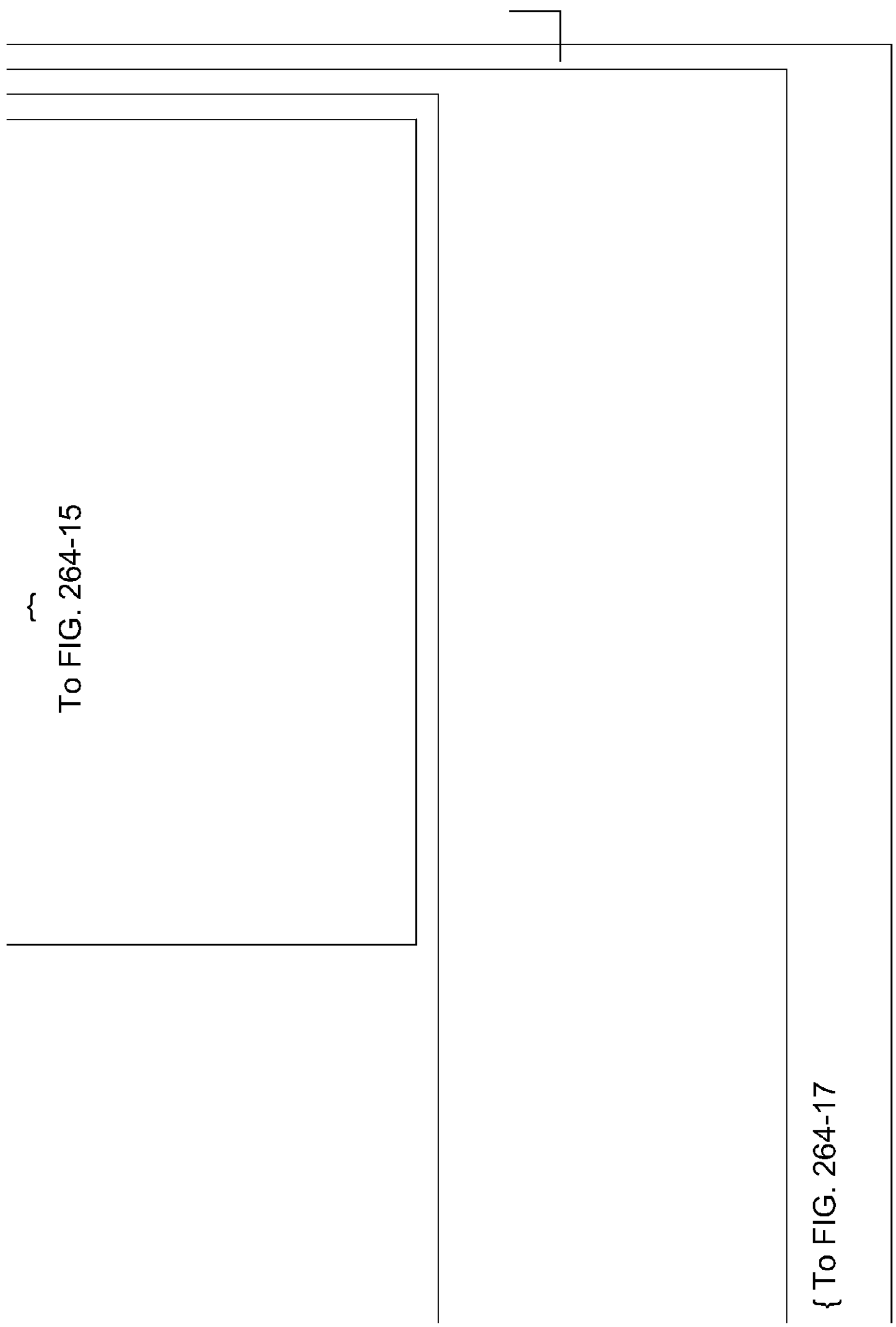
Figure 265:
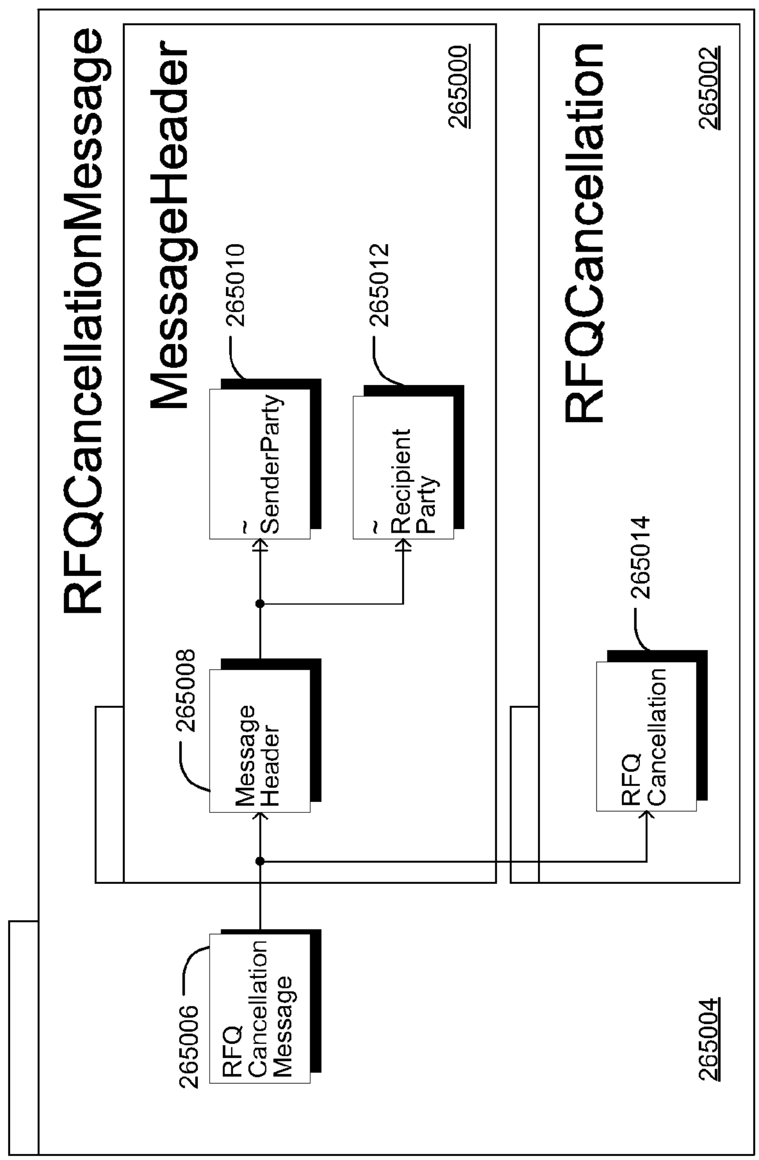
Figures 1, 266:
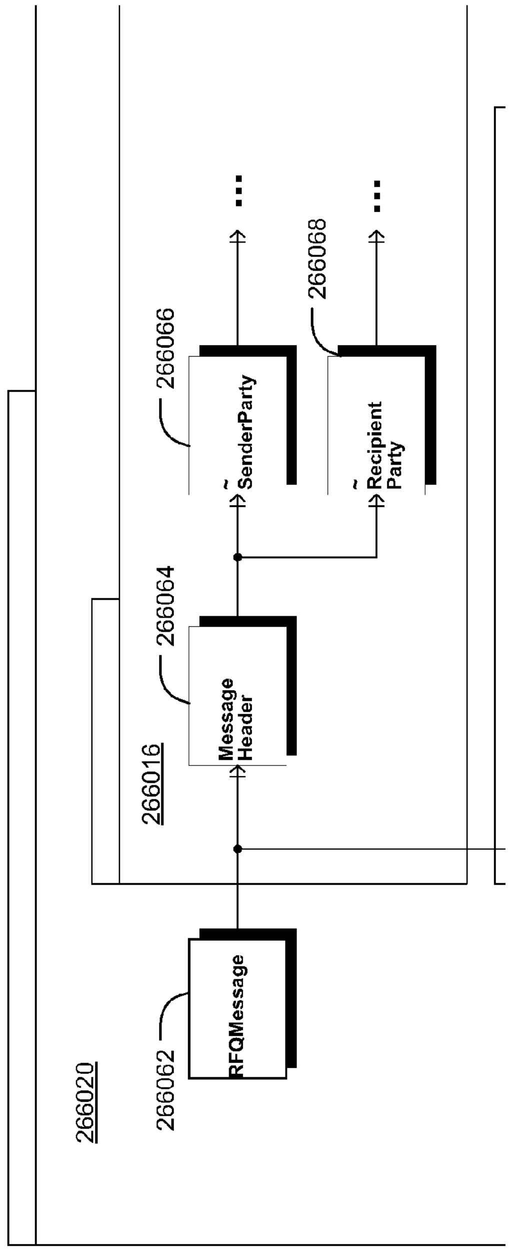
Figures 2, 266:
Figures 3, 266:
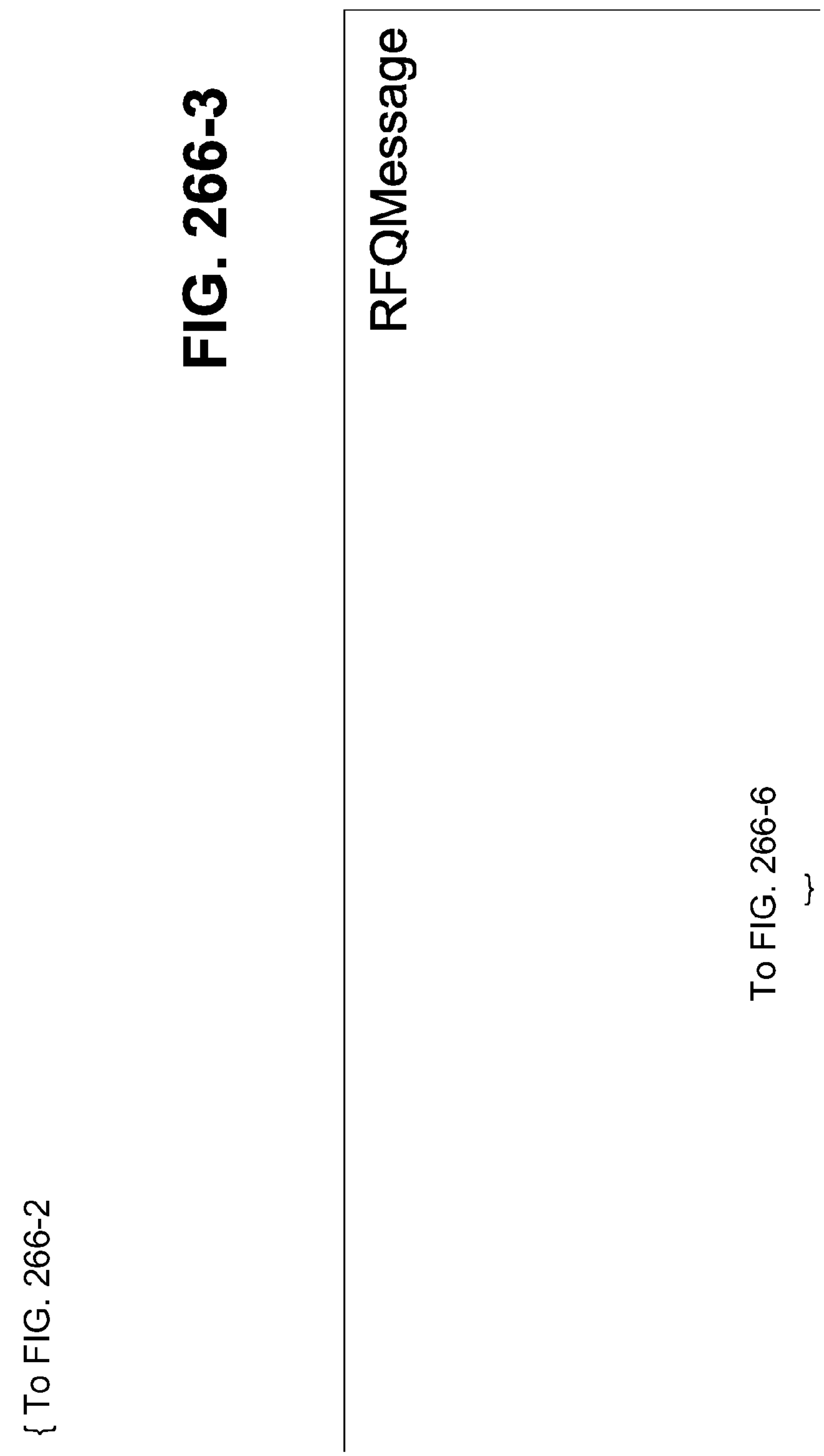
Figures 4, 266:
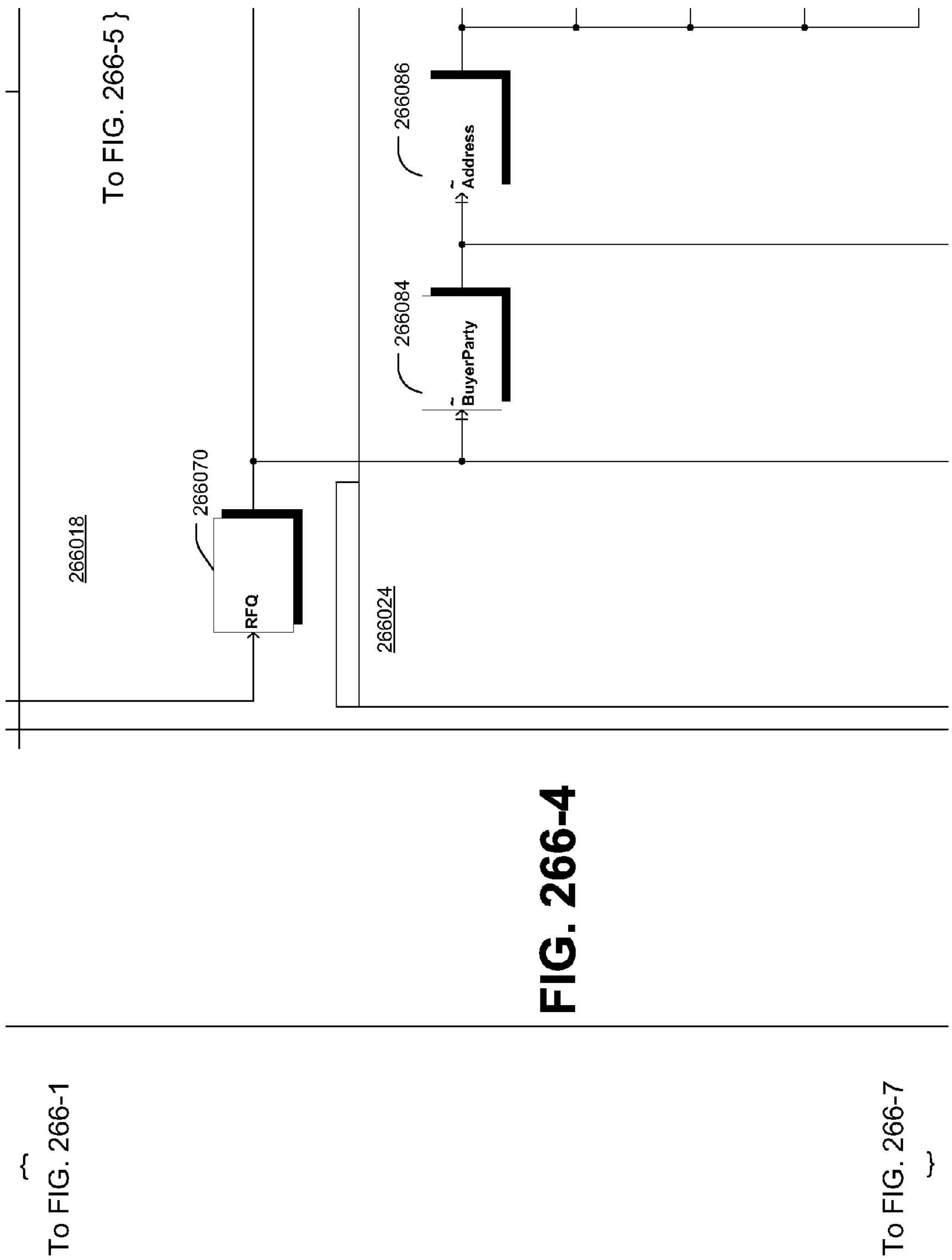
Figures 5, 266:
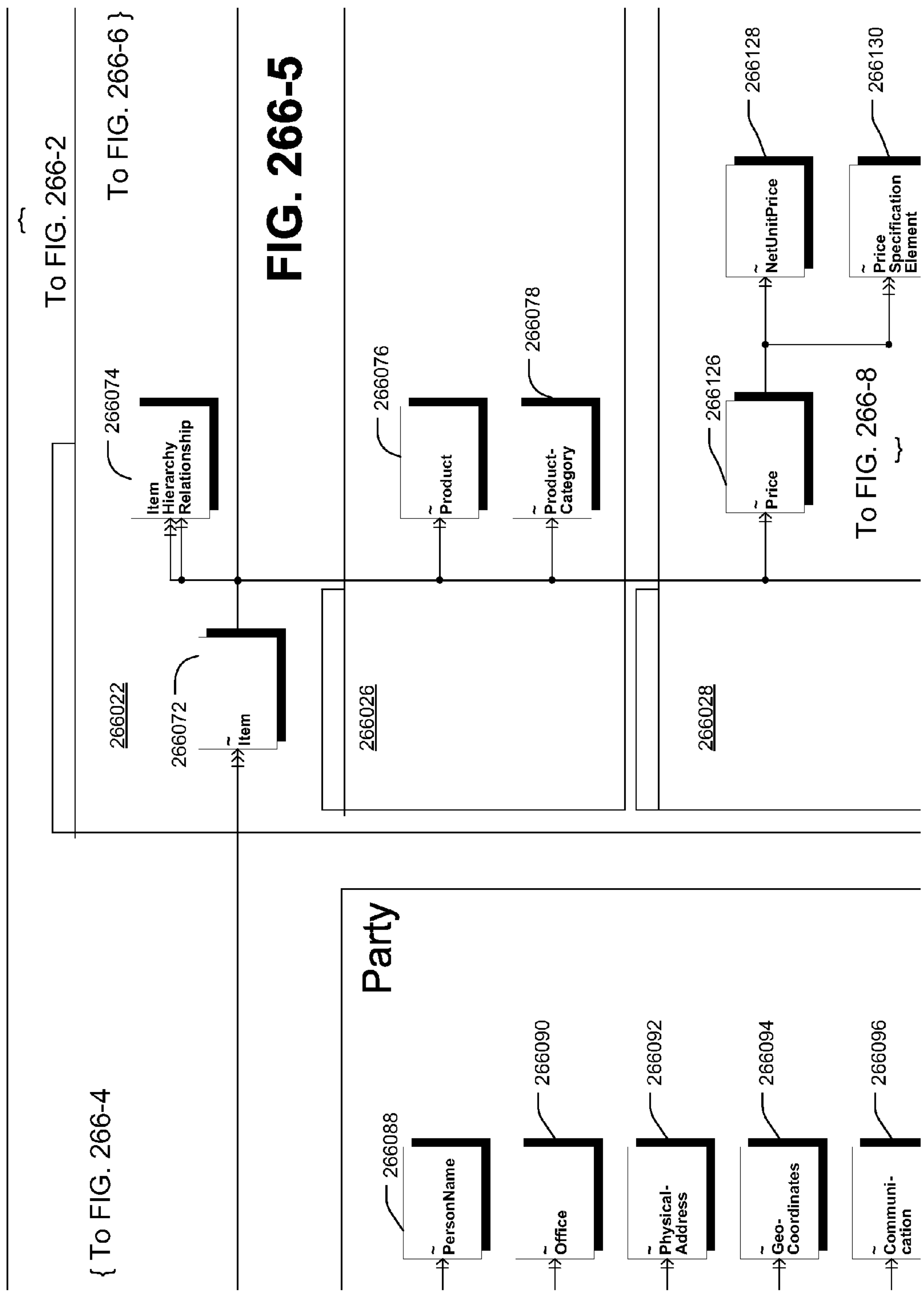
Figures 6, 266:
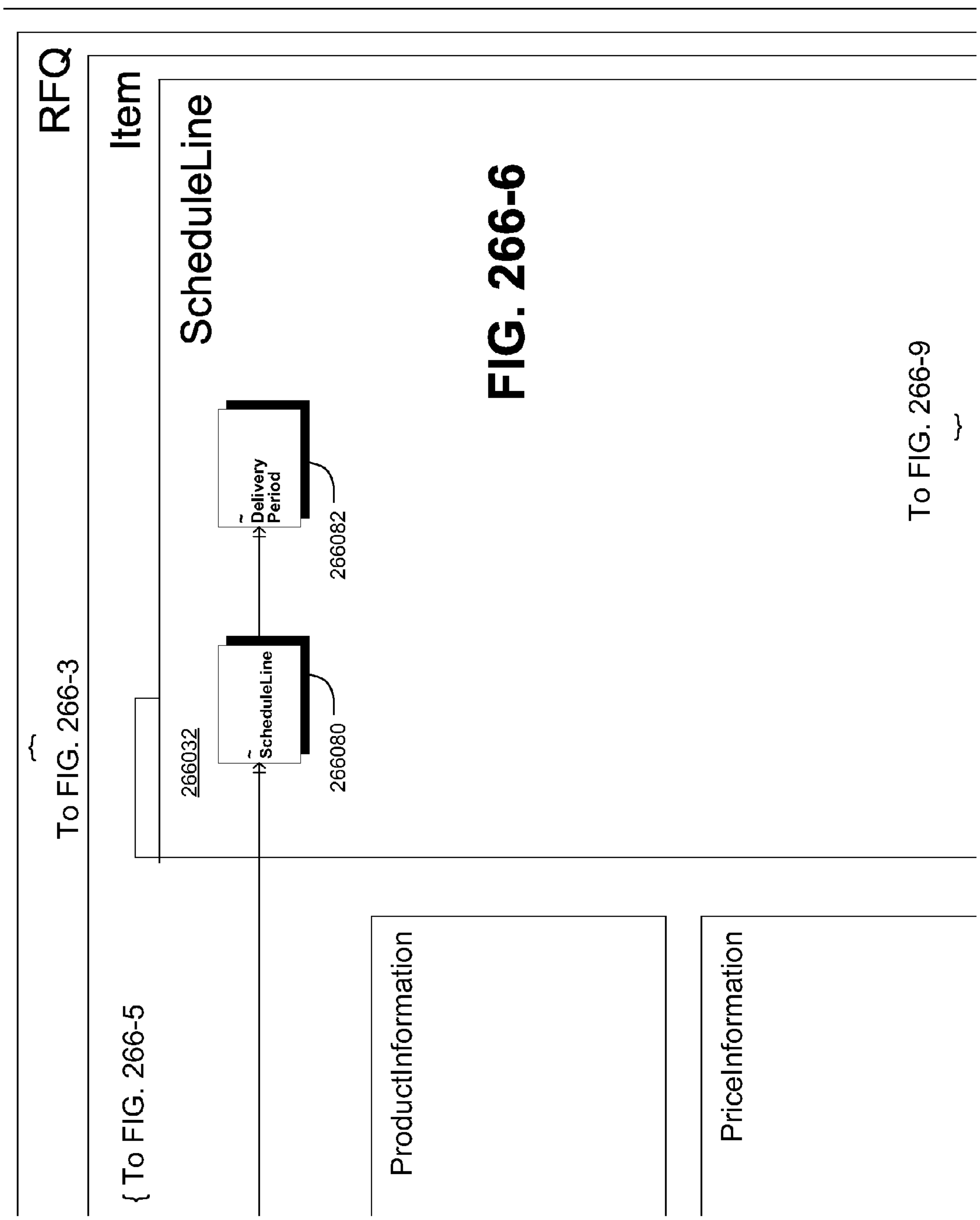
Figures 7, 266:
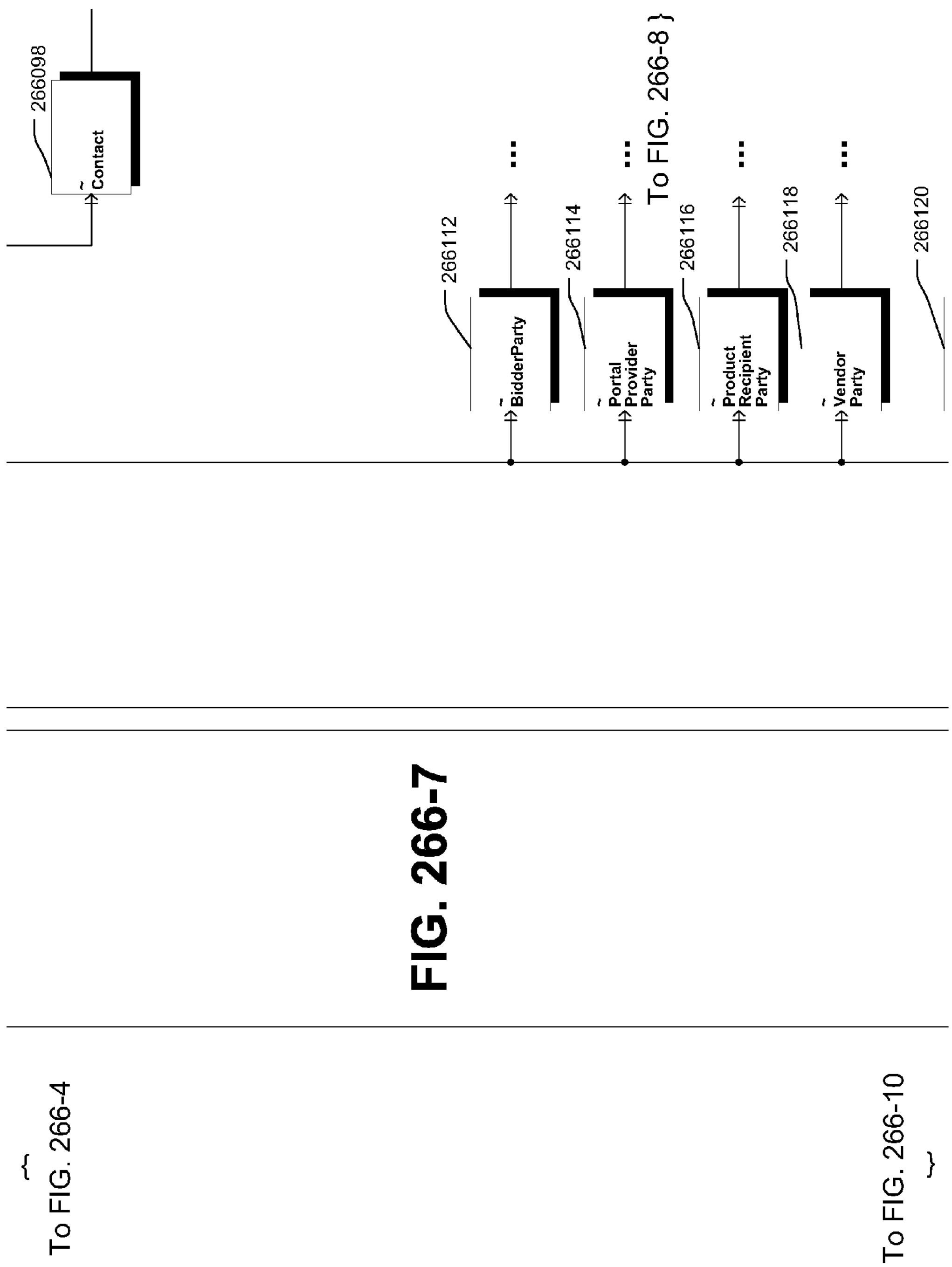
Figures 8, 266:
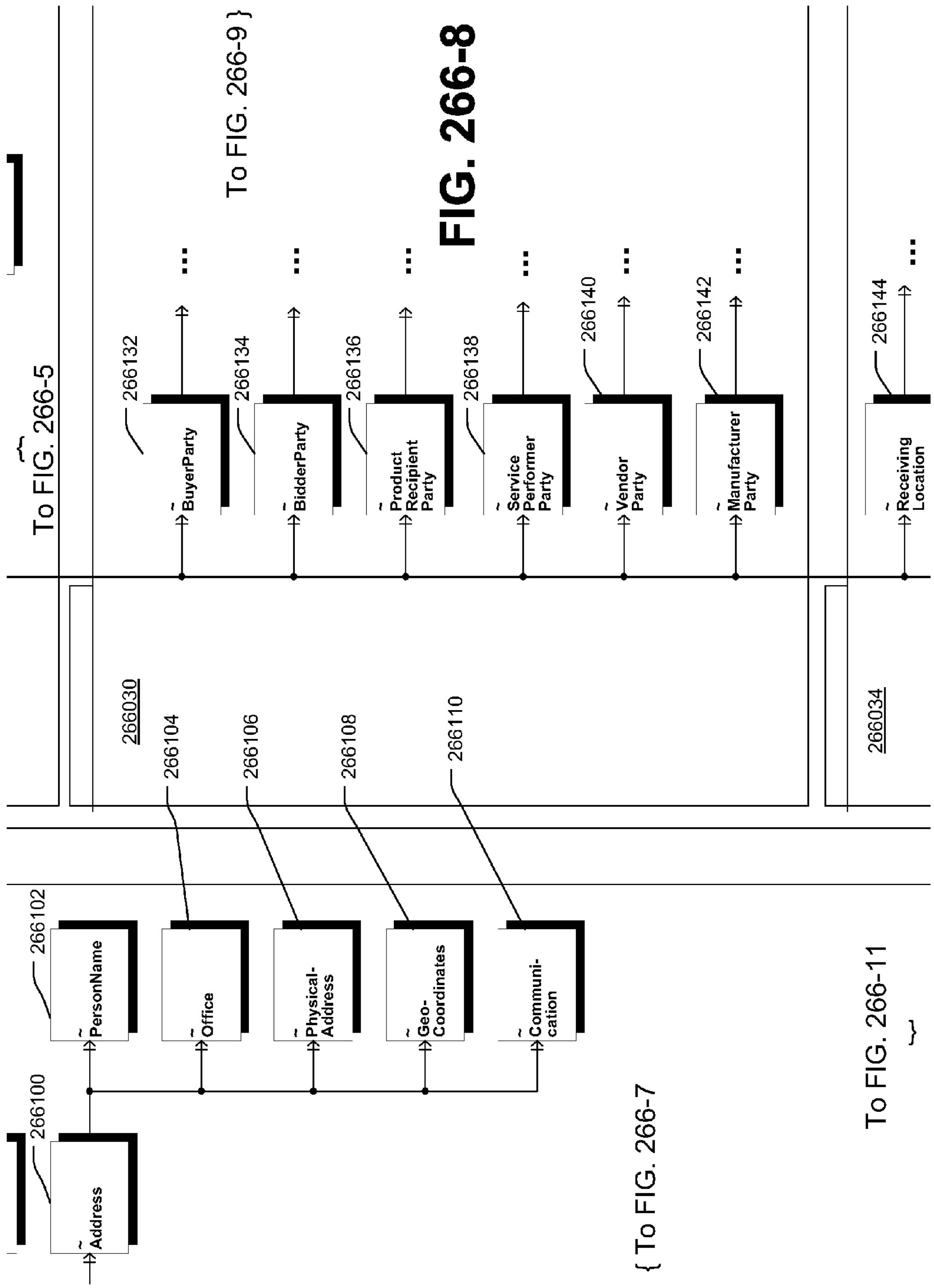
Figures 9, 266:
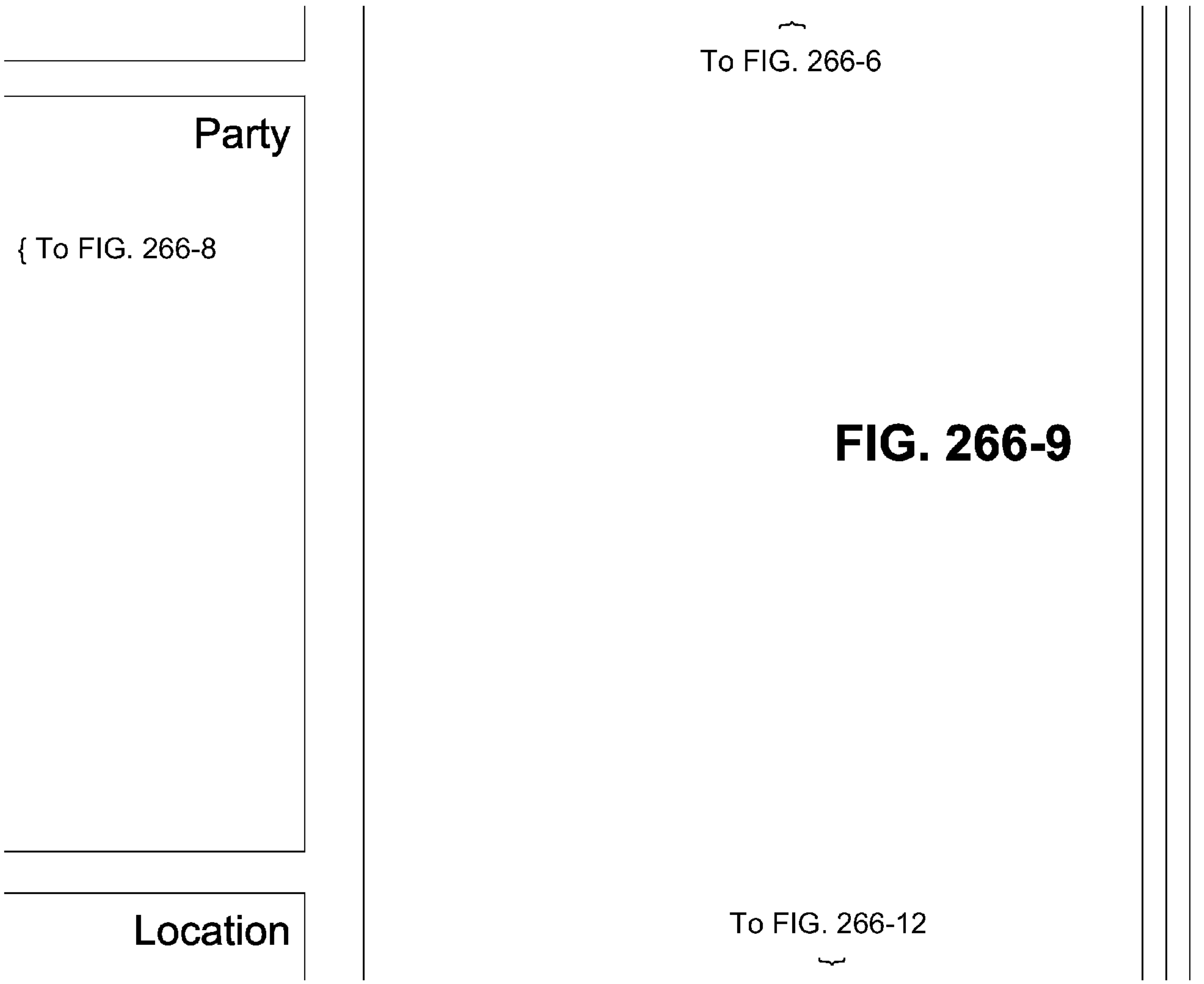
Figures 10, 266:
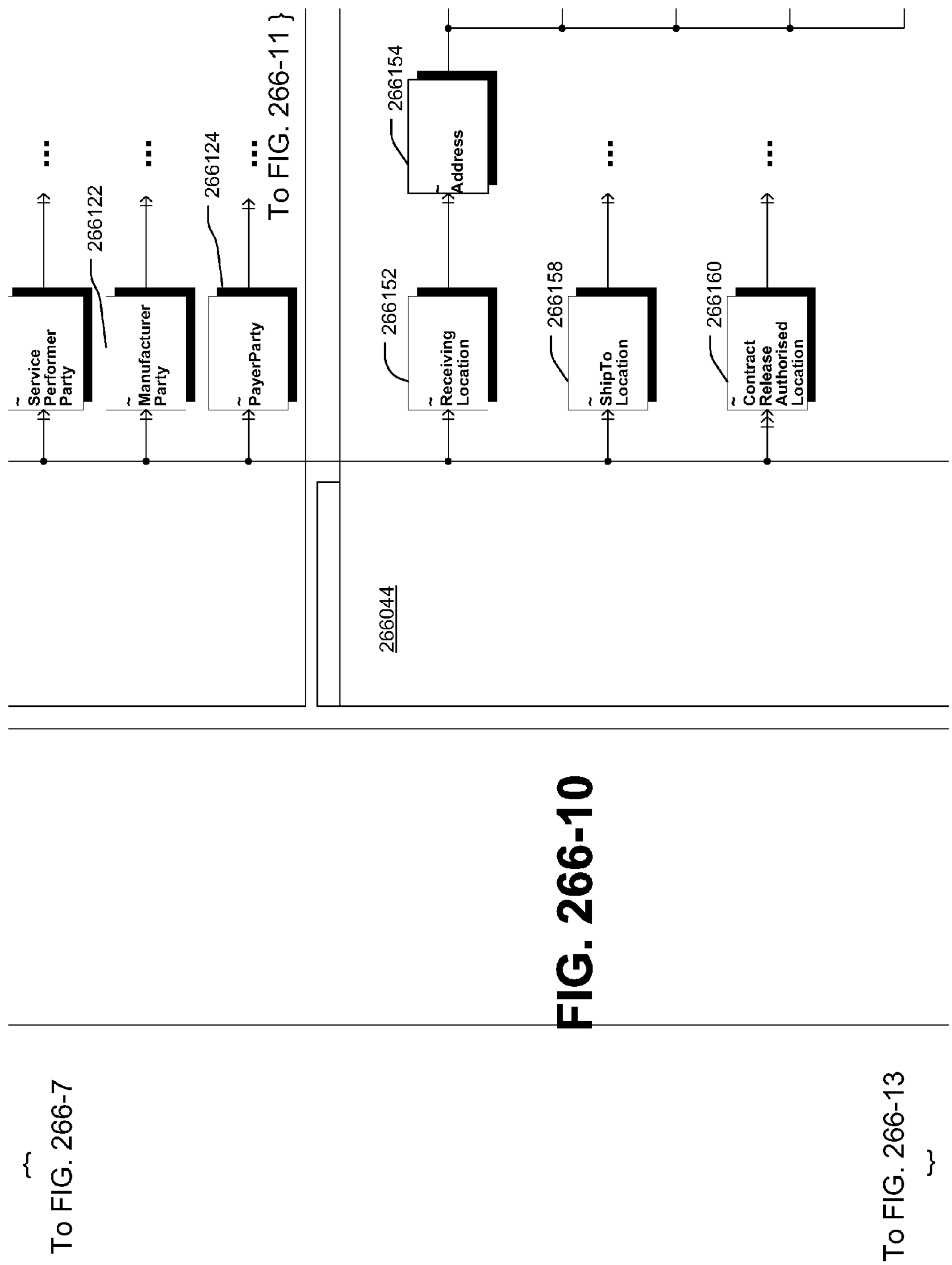
Figures 11, 266:
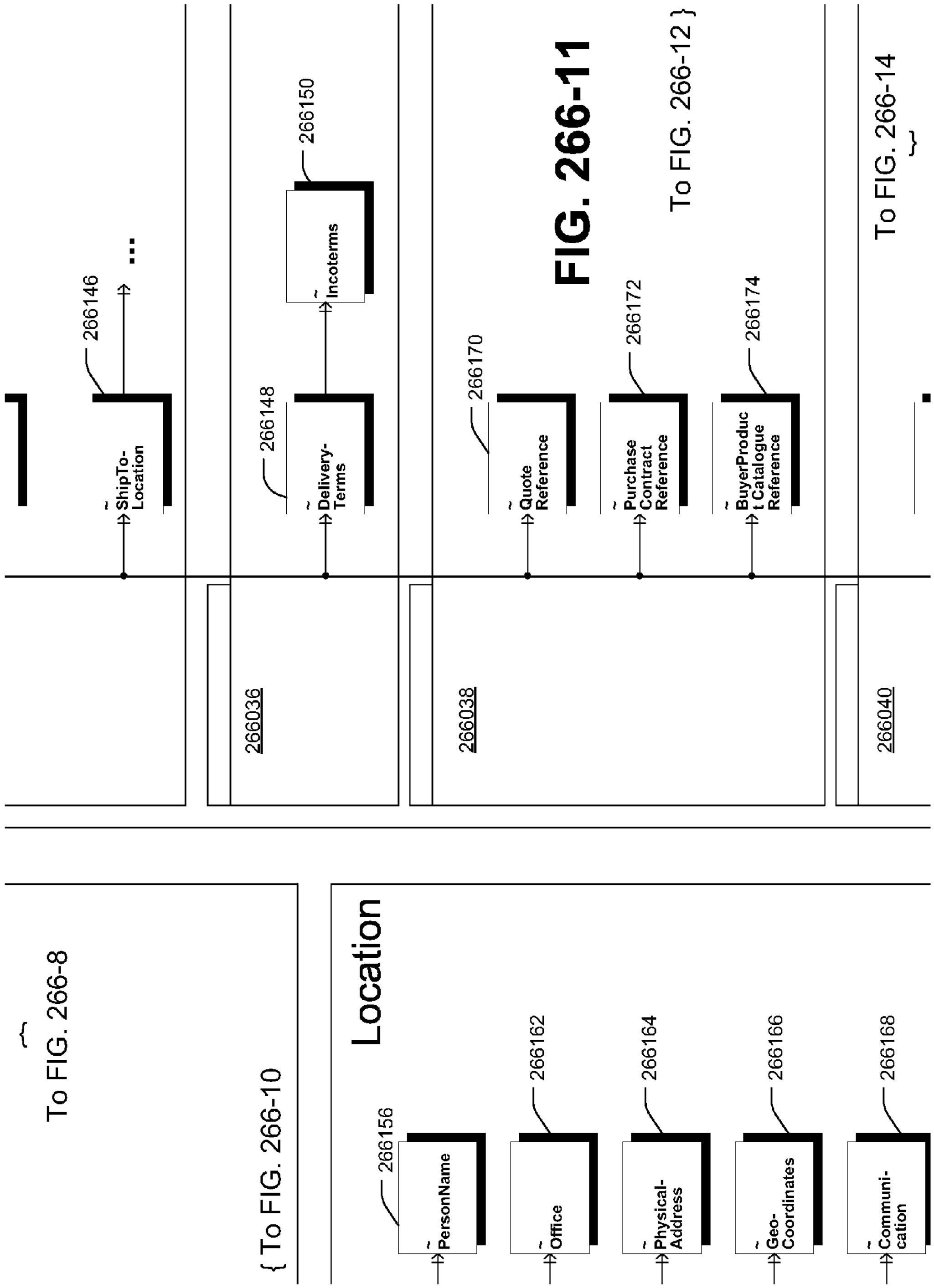
Figures 12, 266:
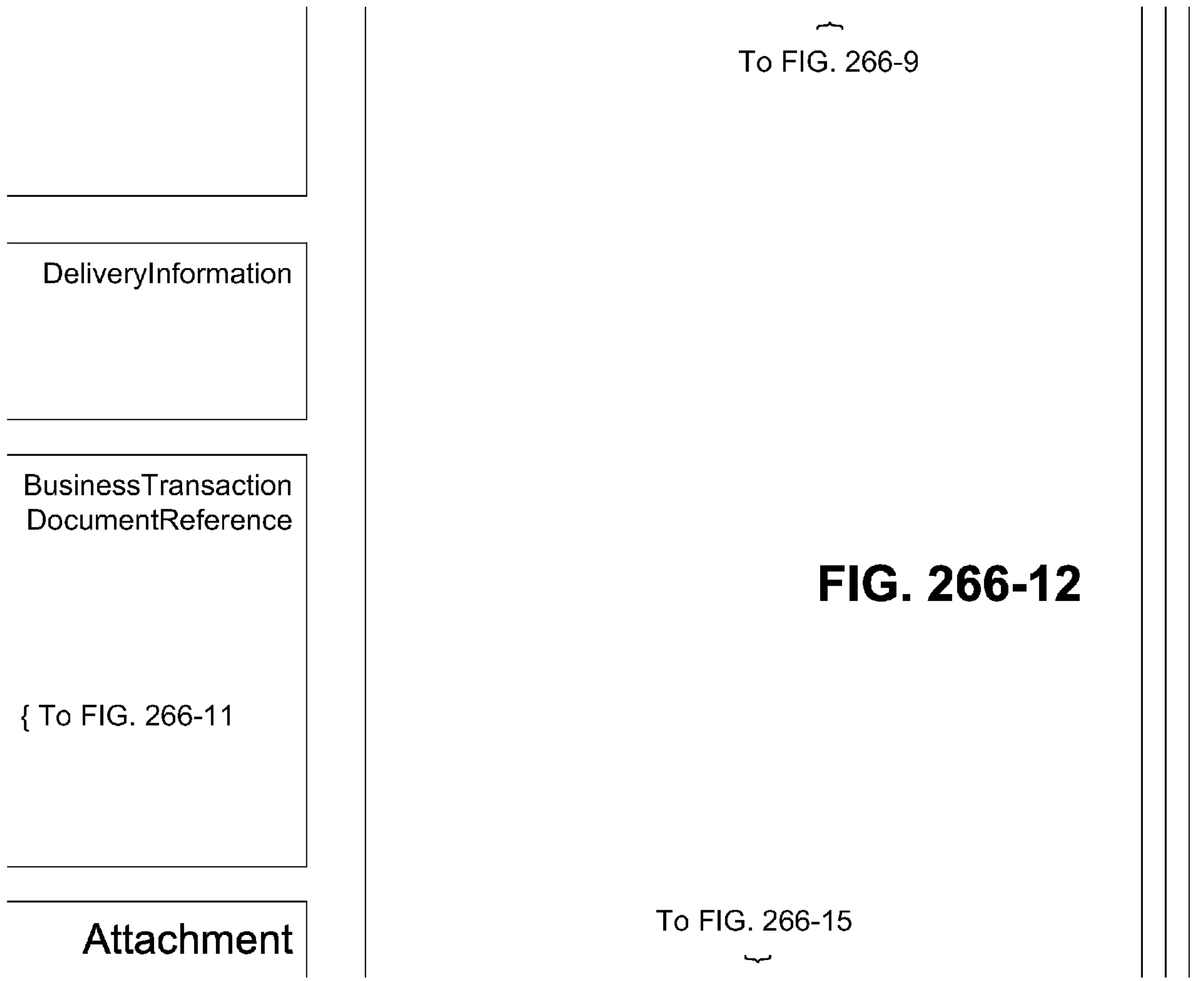
Figures 13, 266:
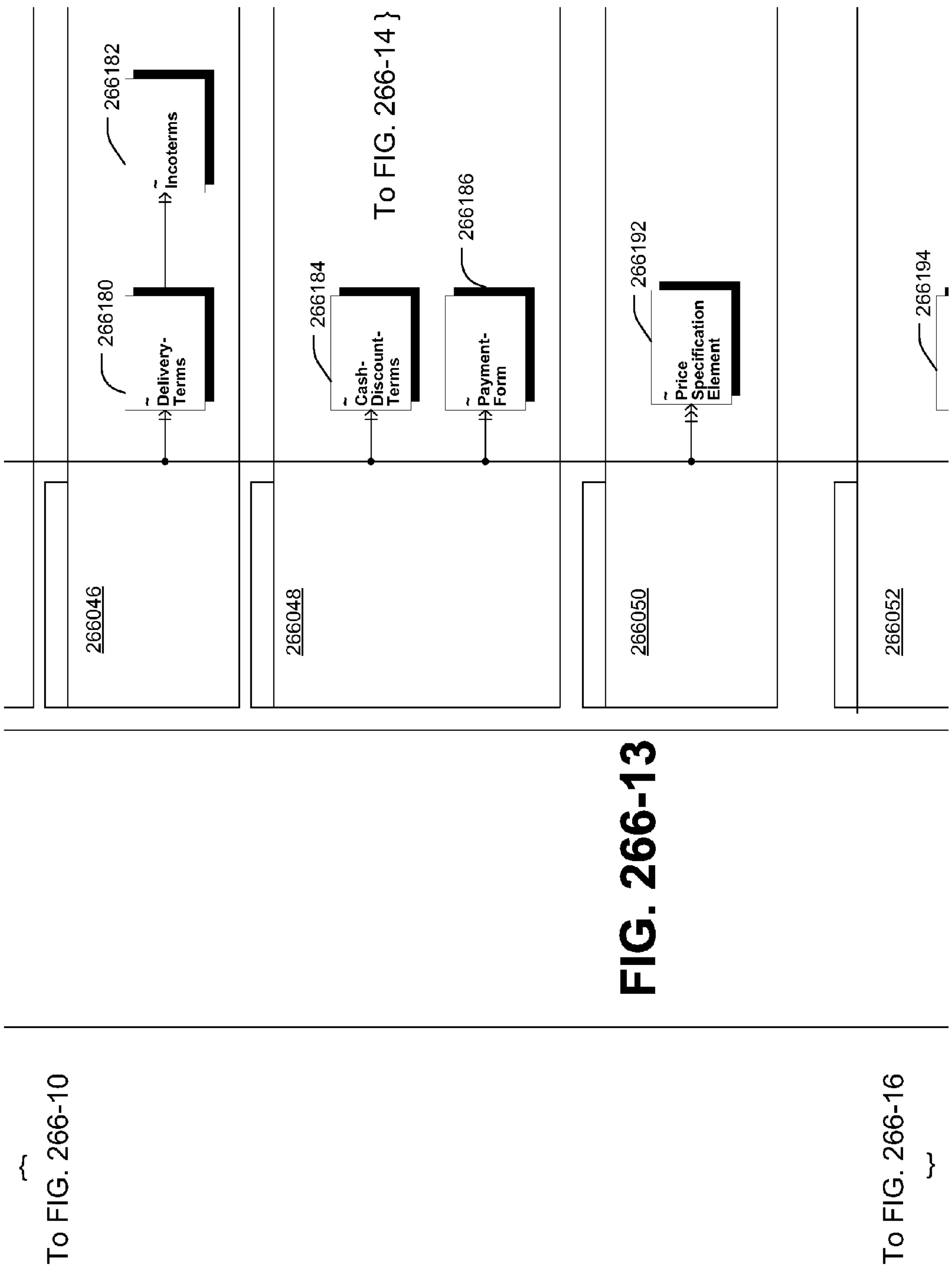
Figures 14, 266:
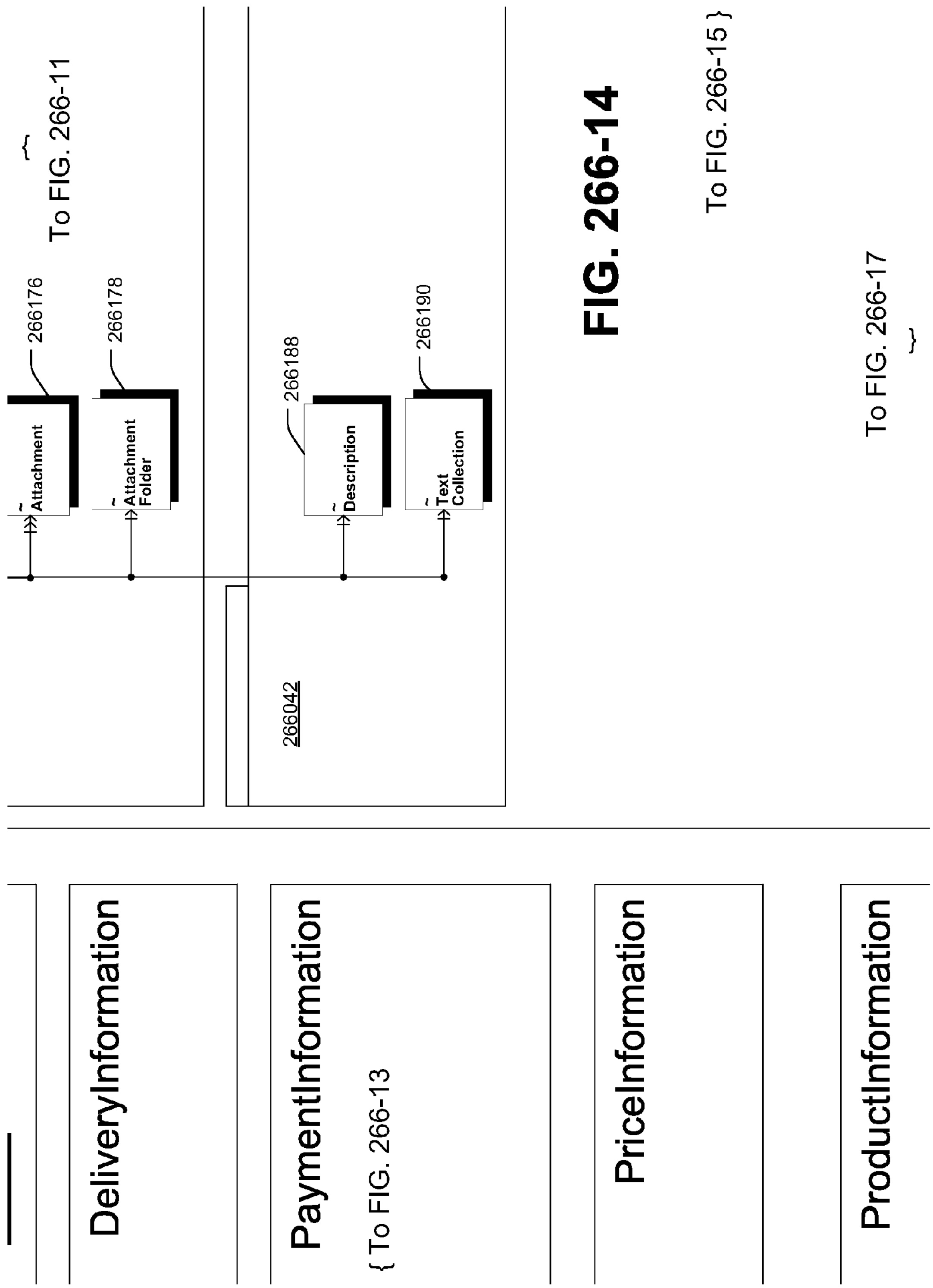
Figures 15, 266:
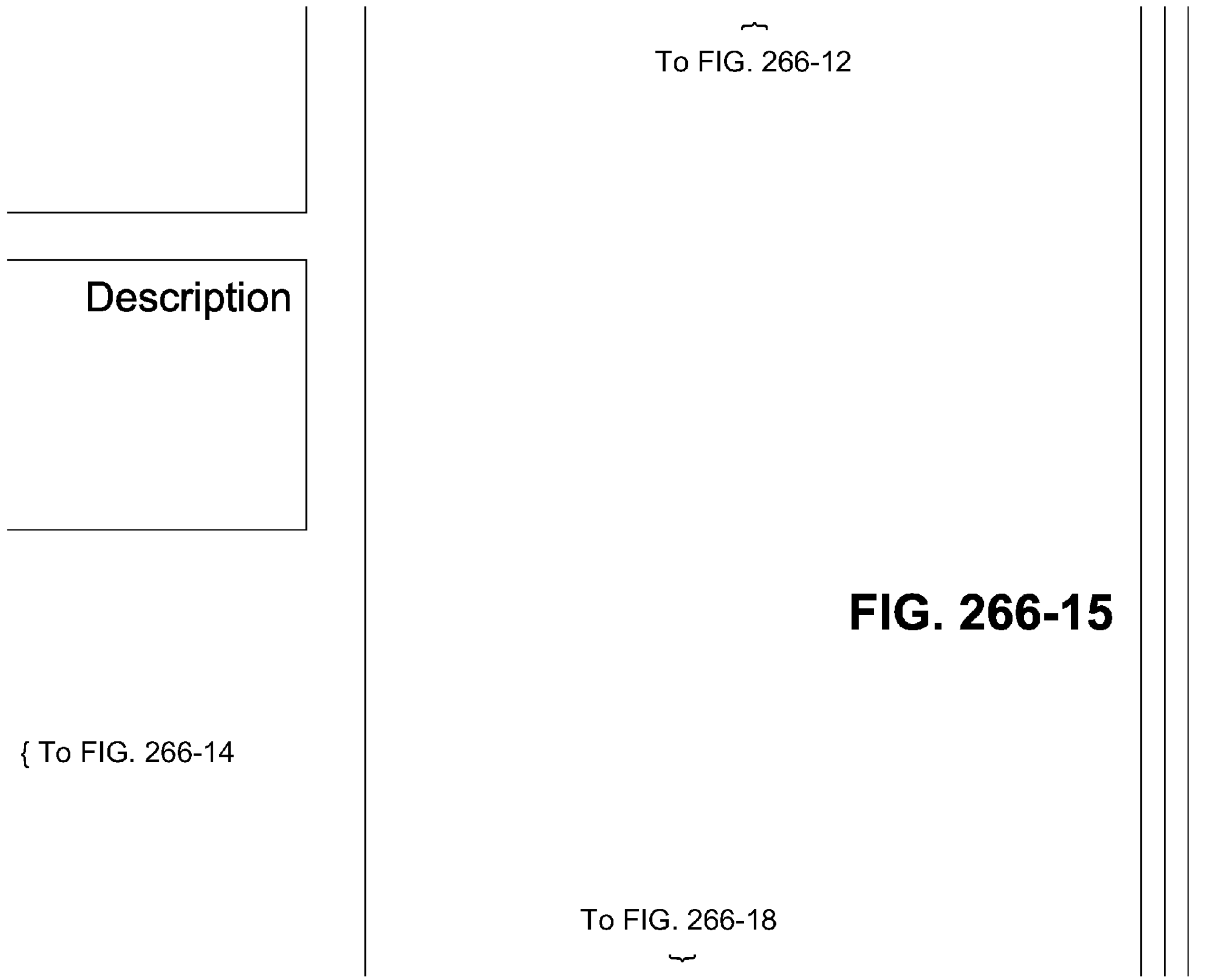
Figures 16, 266:
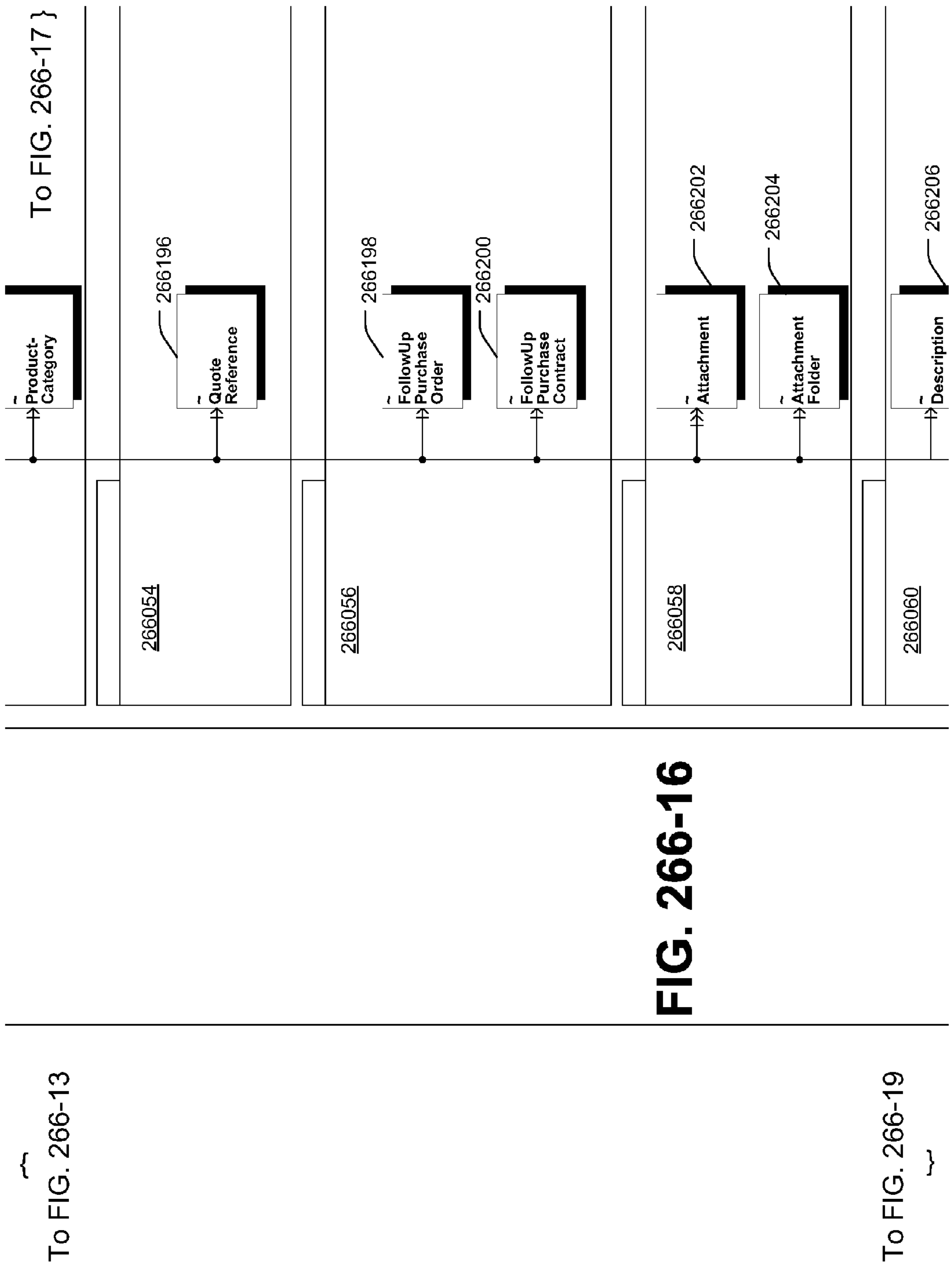
Figures 17, 266:
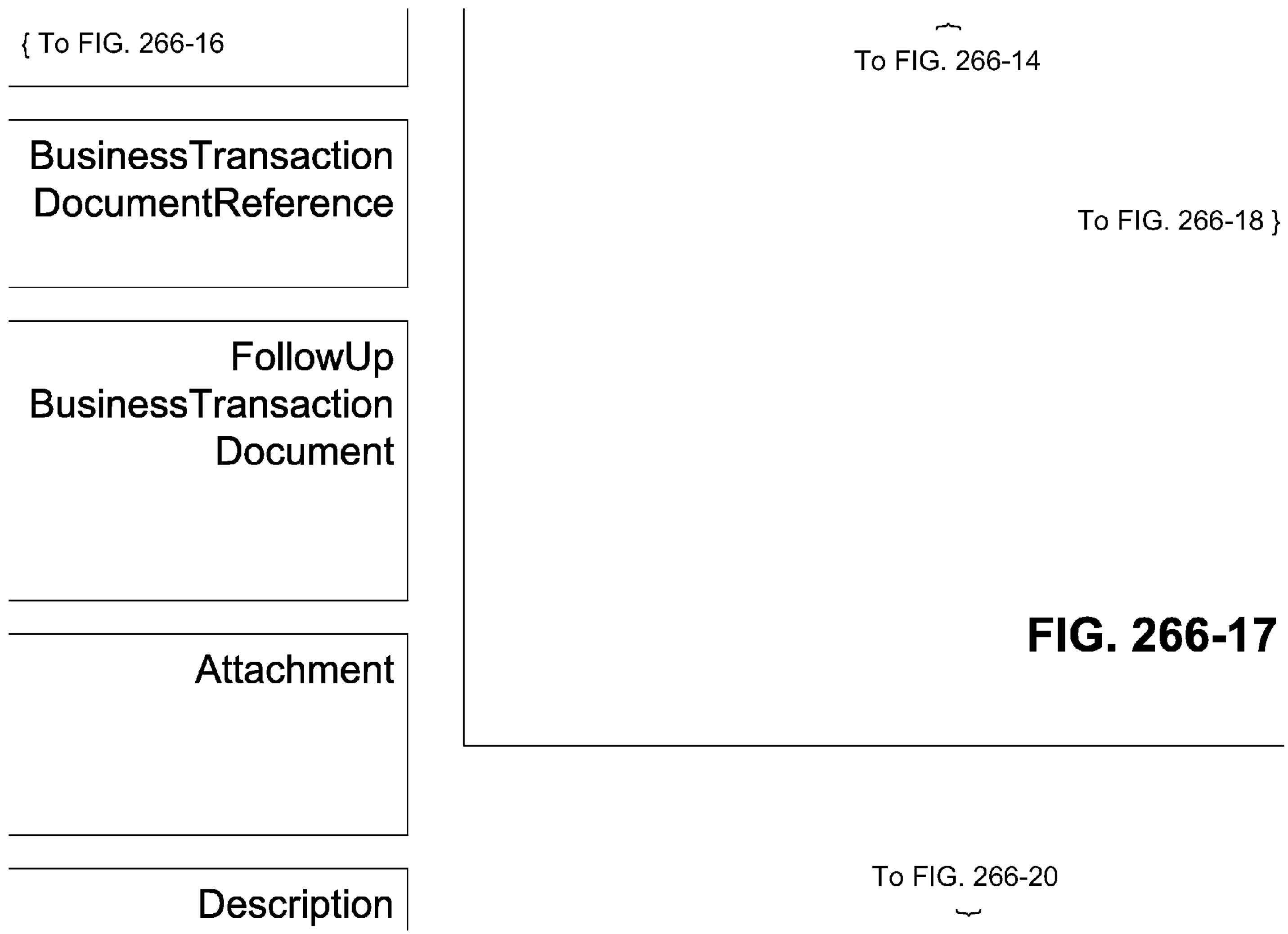
Figures 19, 266:
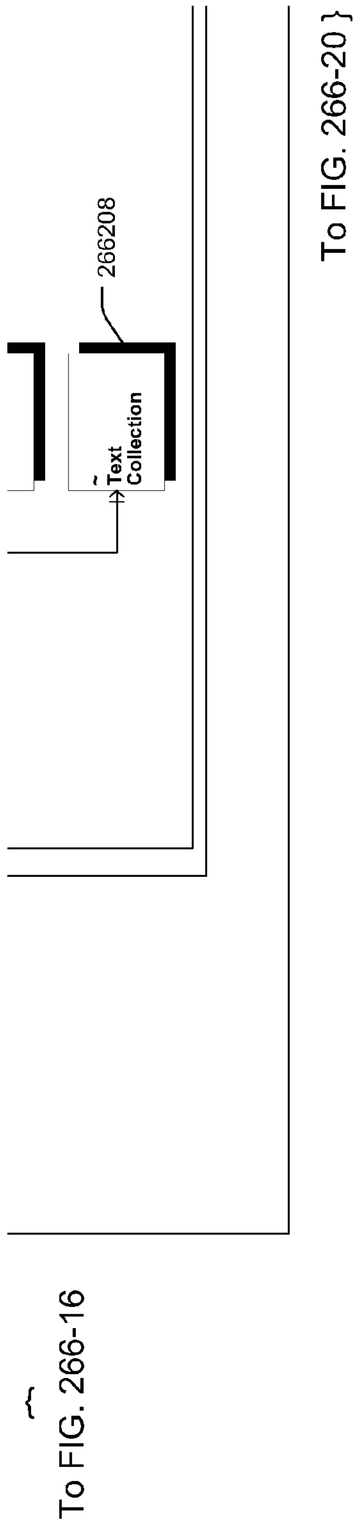
Figures 20, 266:
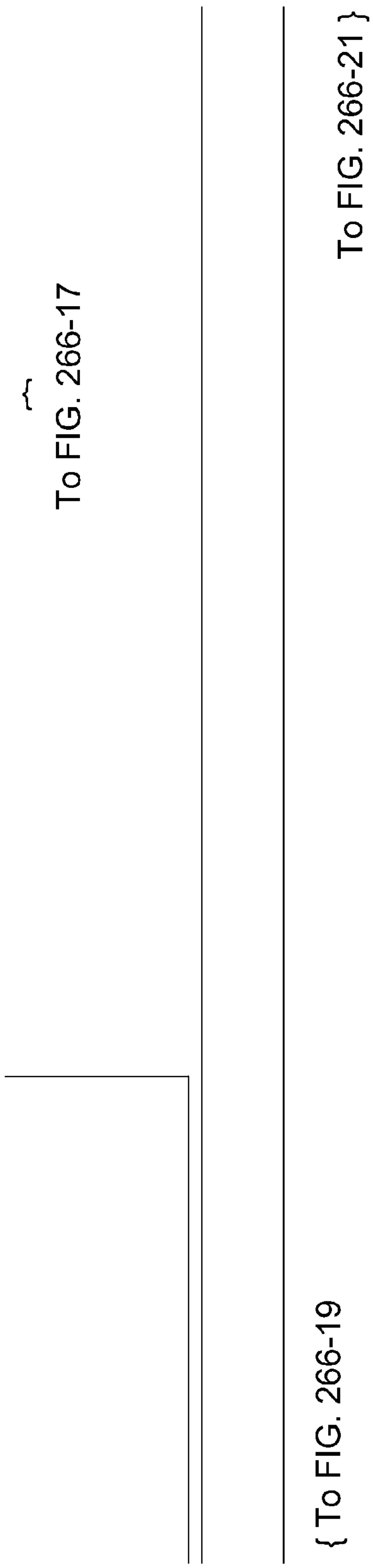
Figures 21, 266:
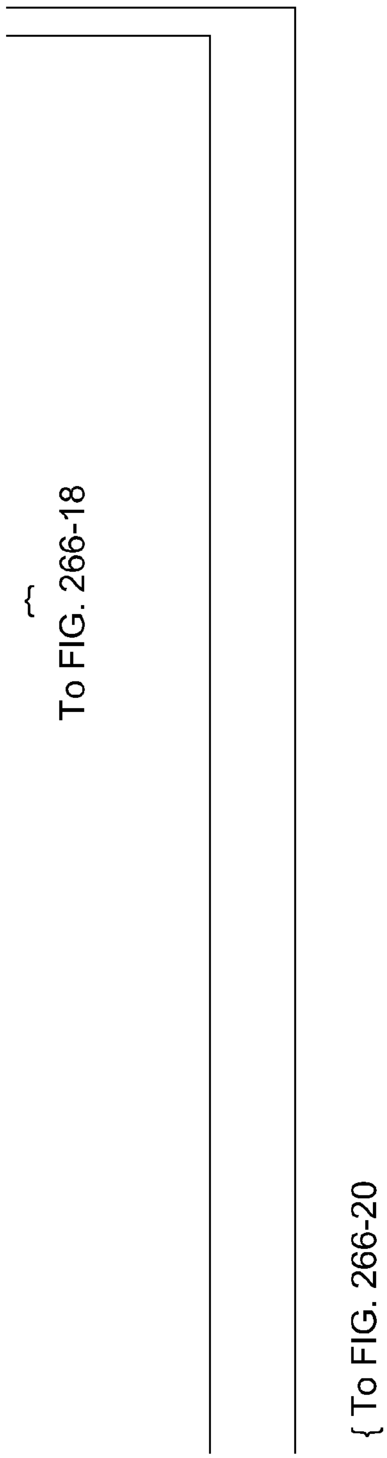
Figures 1, 267:
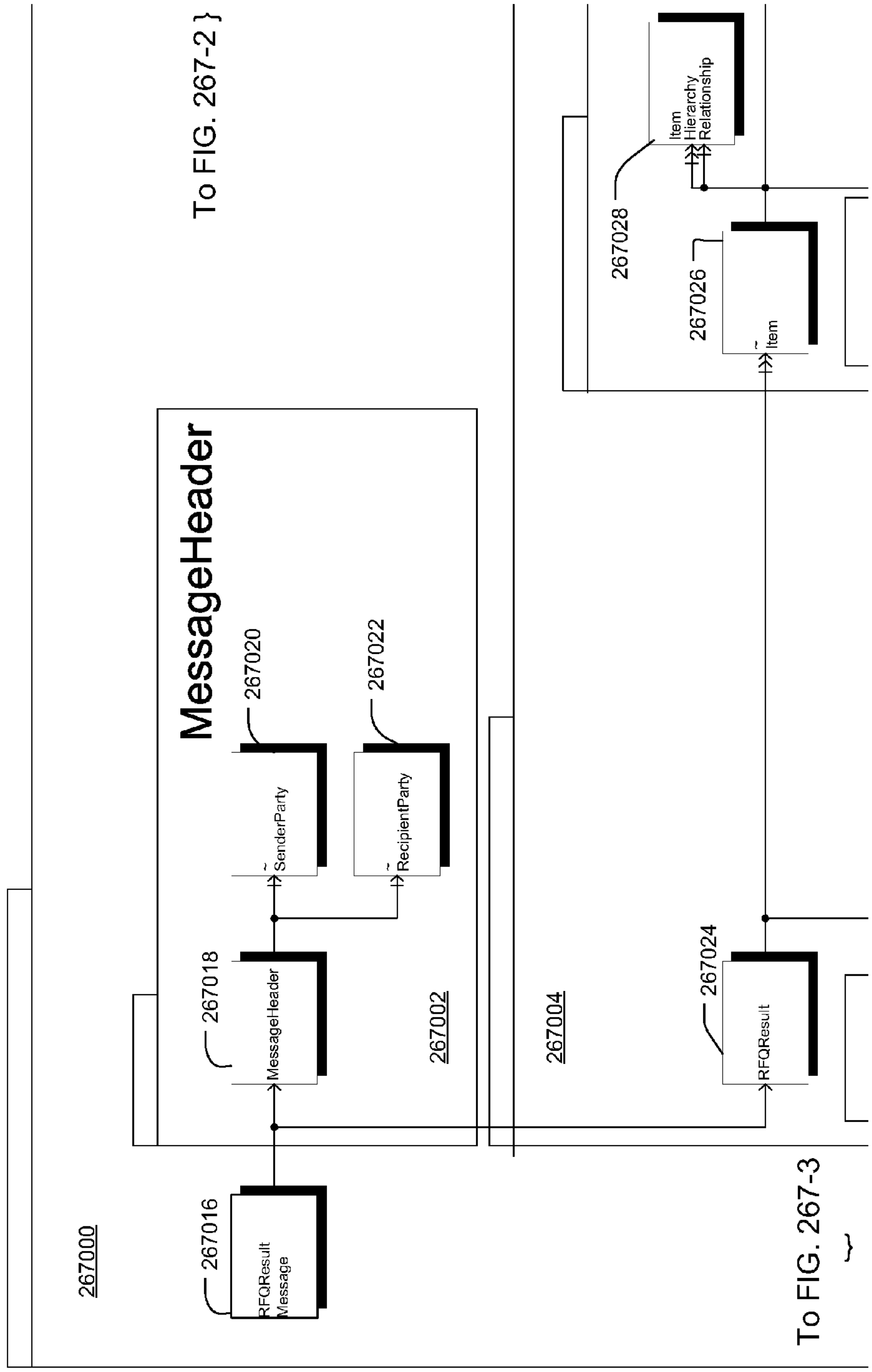
Figures 2, 267:
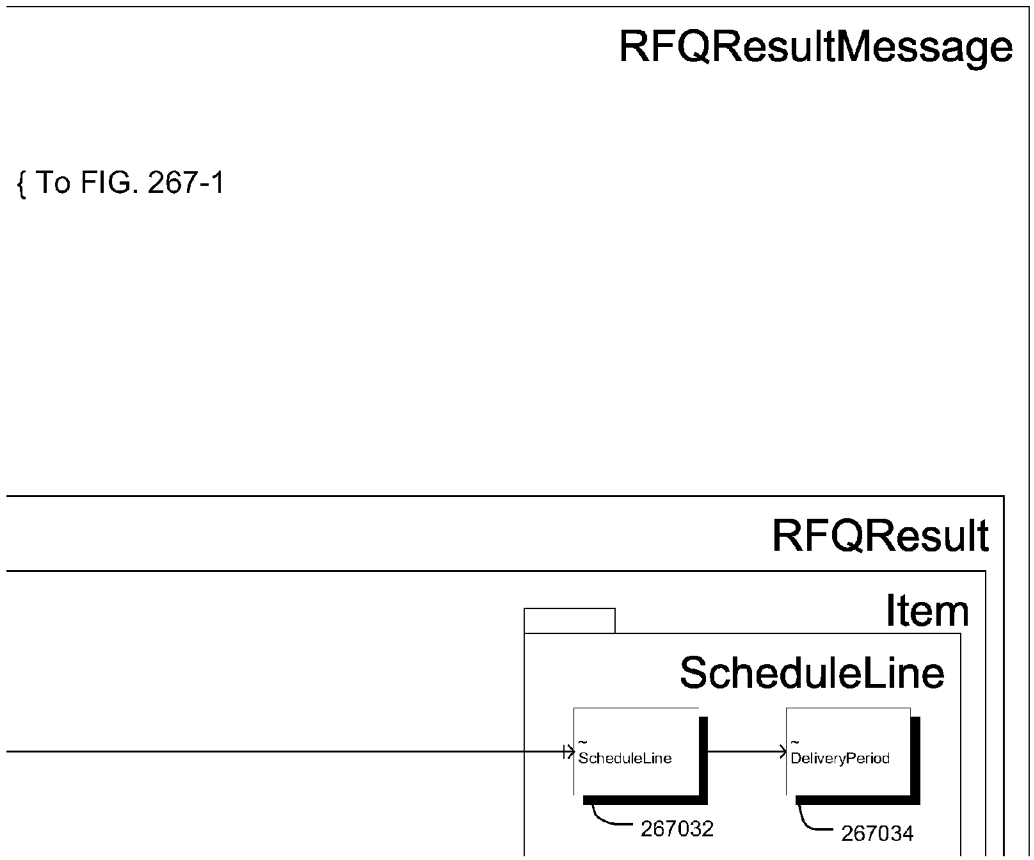
Figures 3, 267:
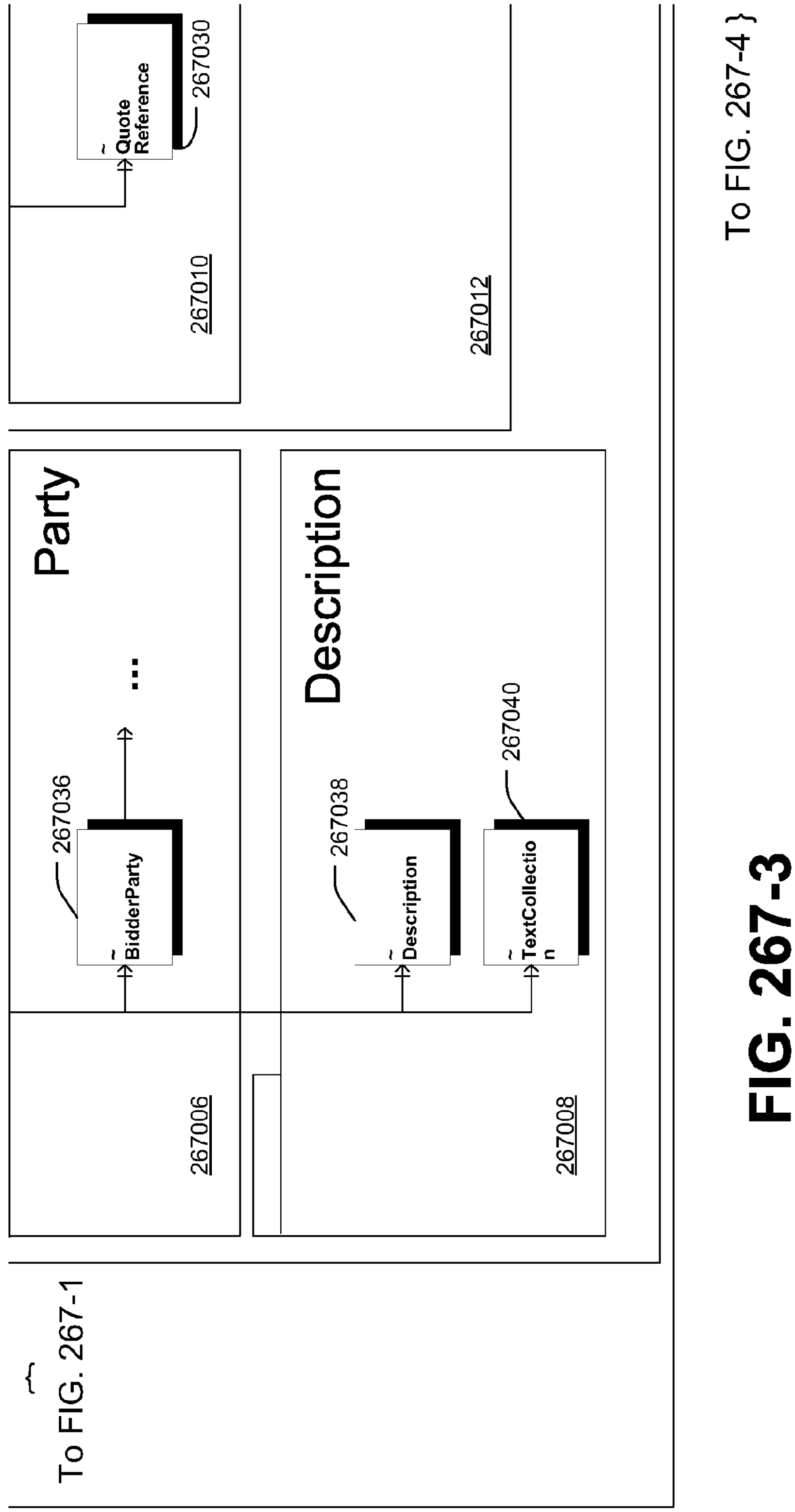
Figures 4, 267:
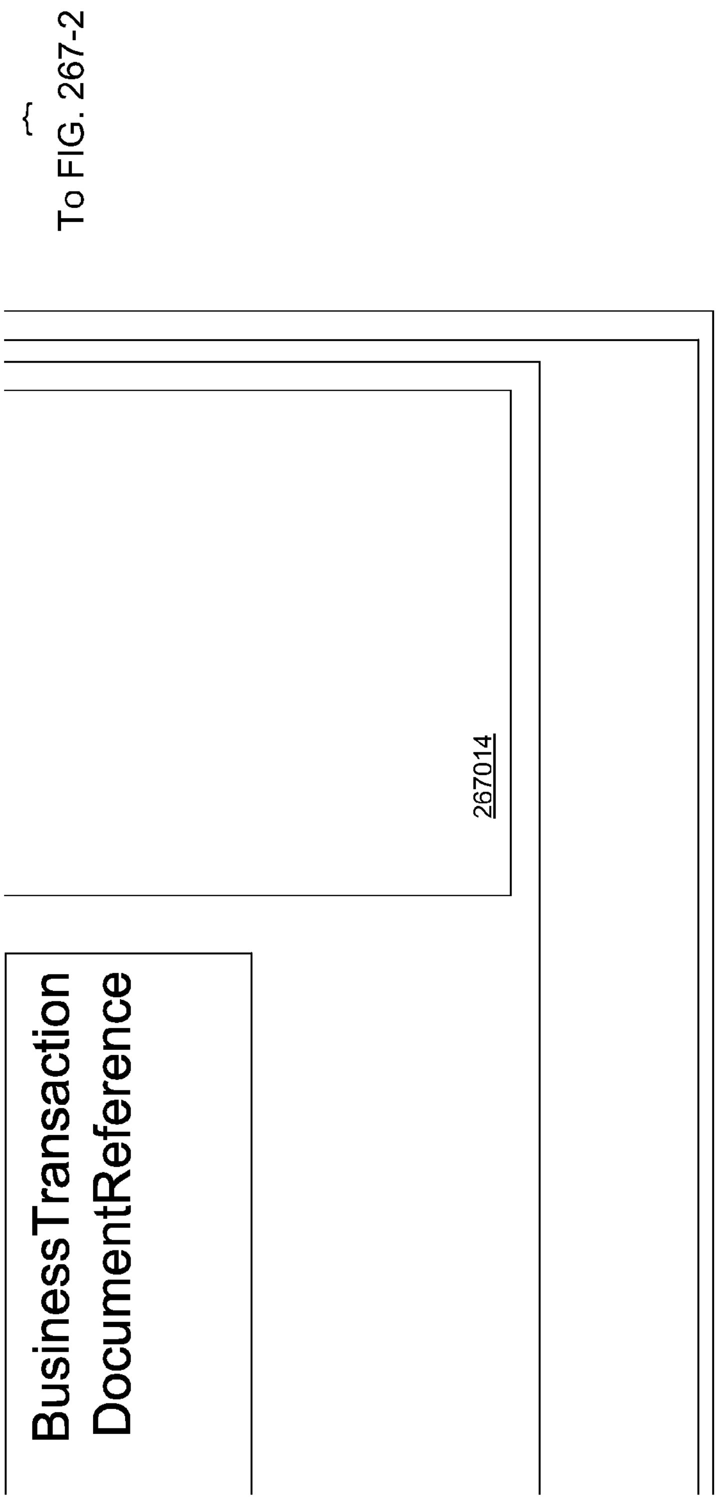
Figures 1, 275:
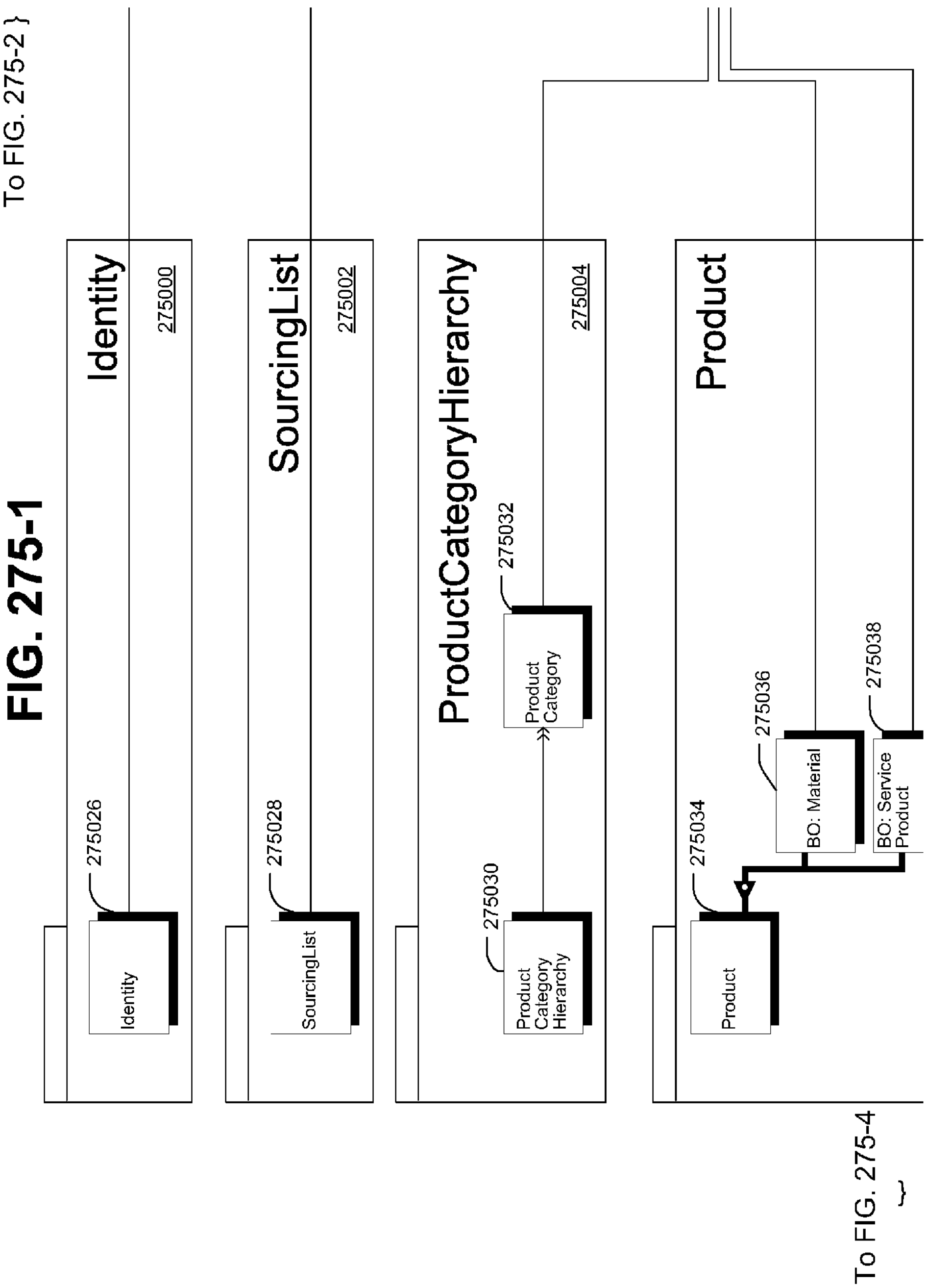
Figures 2, 275:
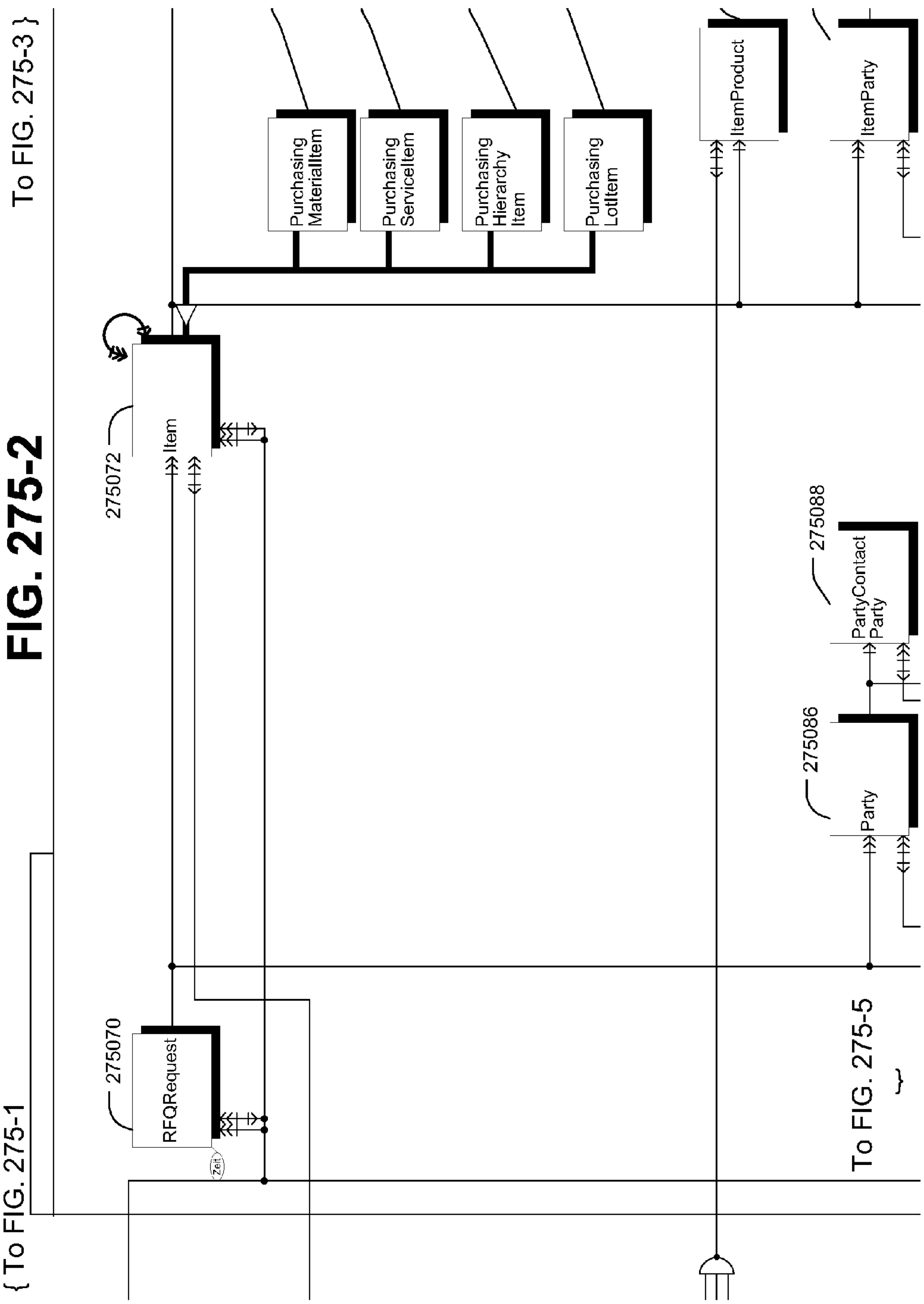
Figures 3, 275:
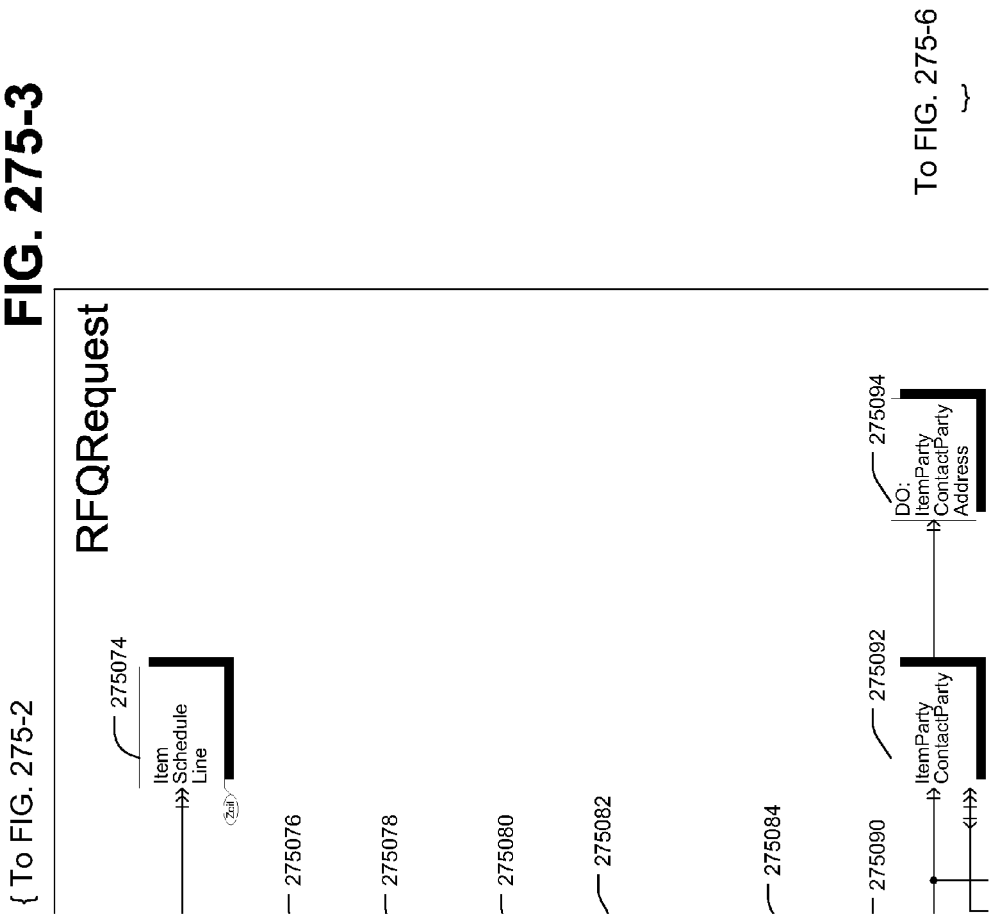
Figures 4, 275:
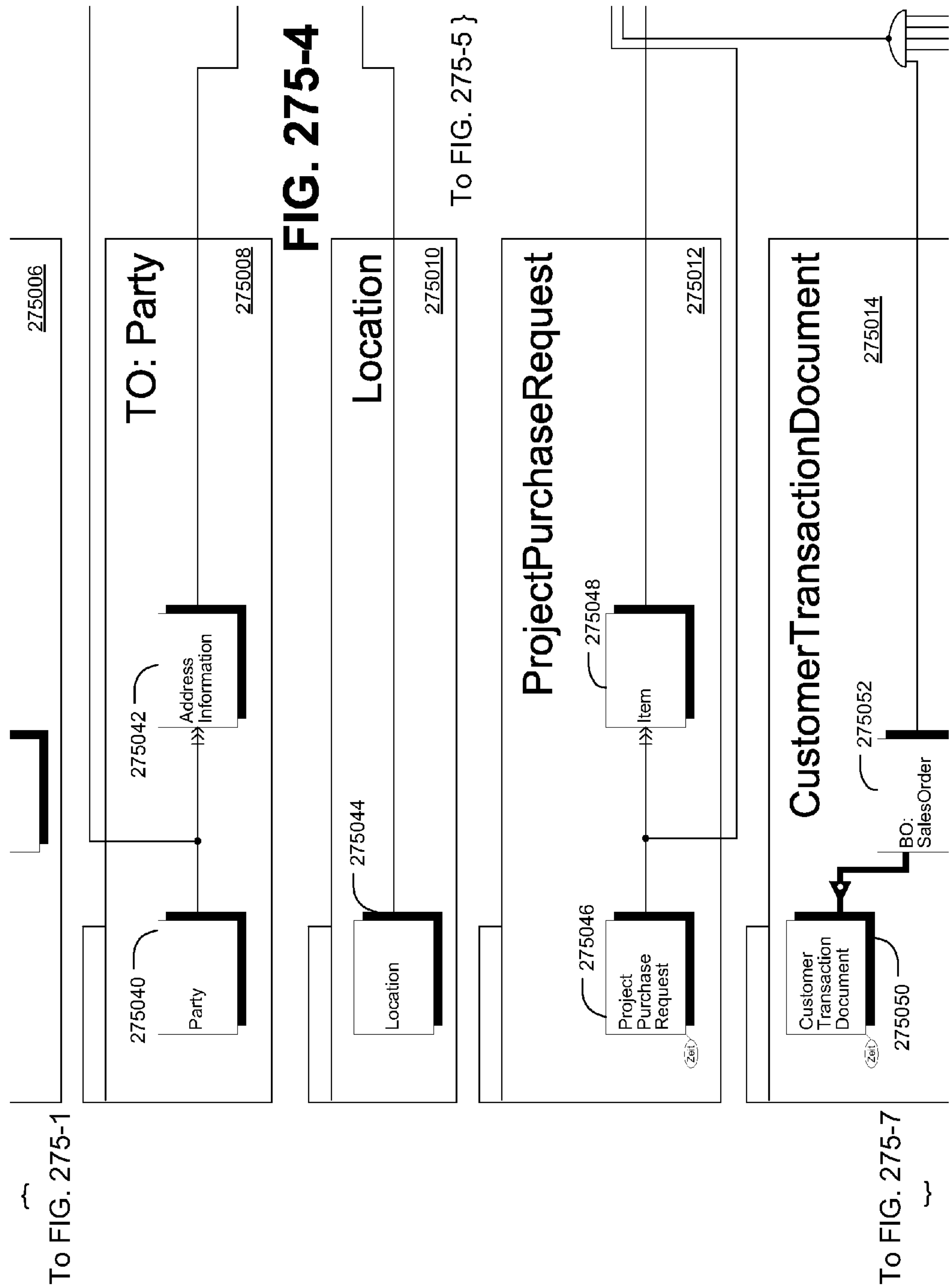
Figures 5, 275:
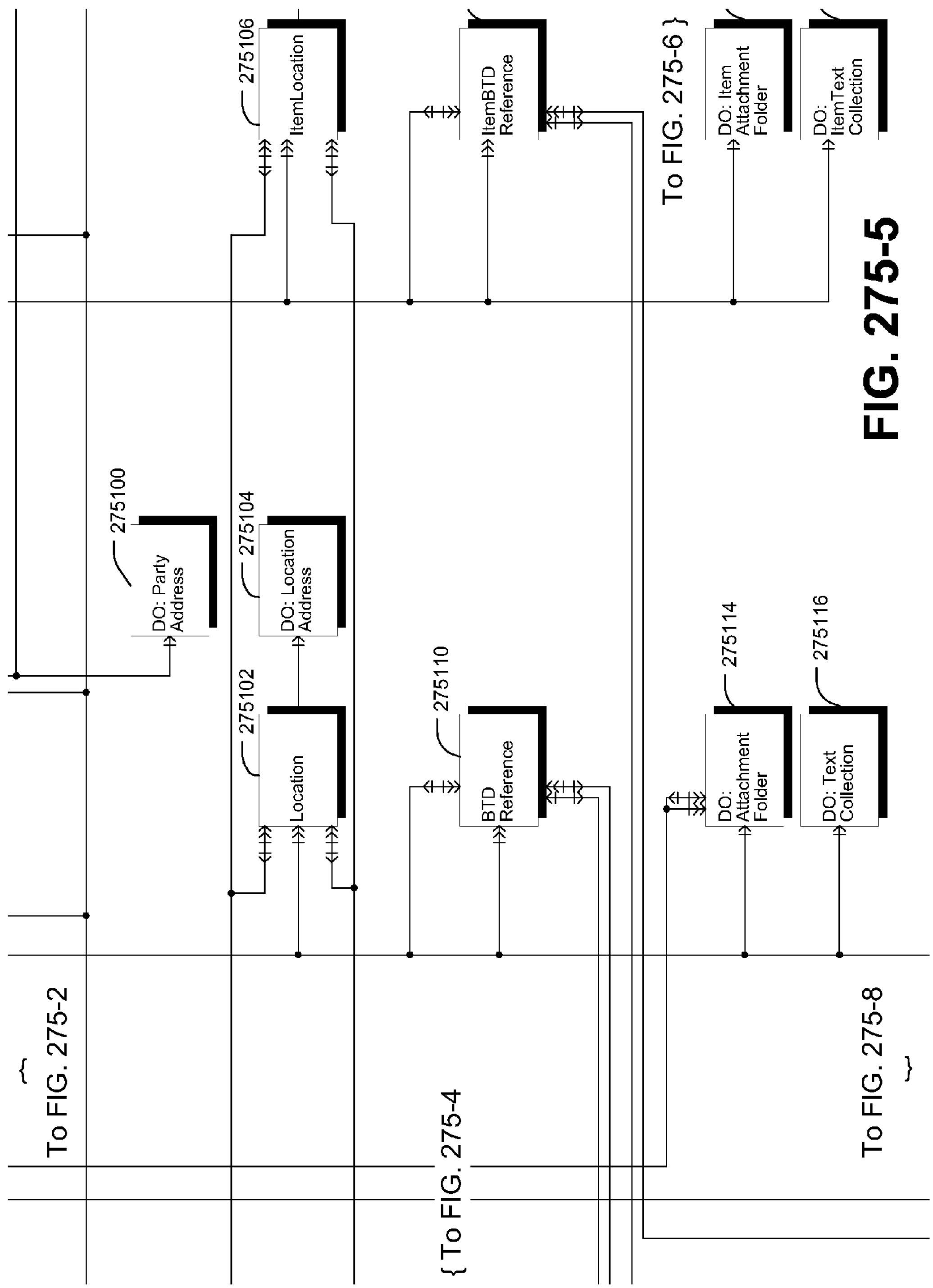
Figures 6, 275:
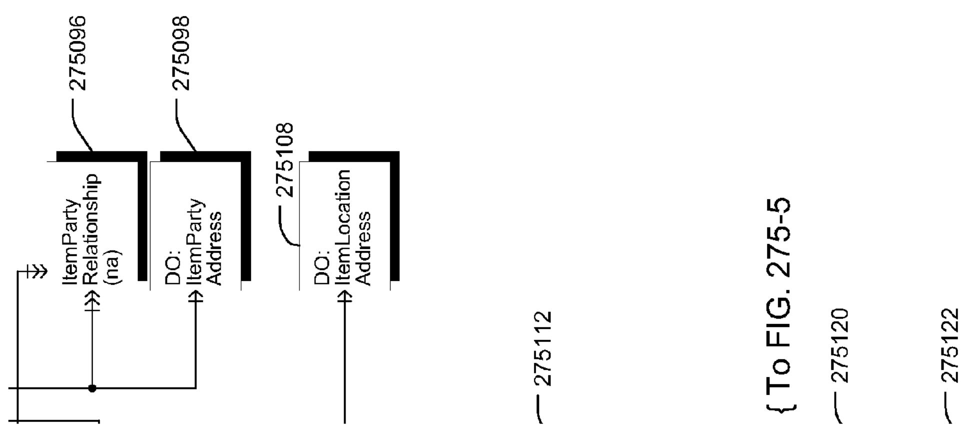
Figures 7, 275:
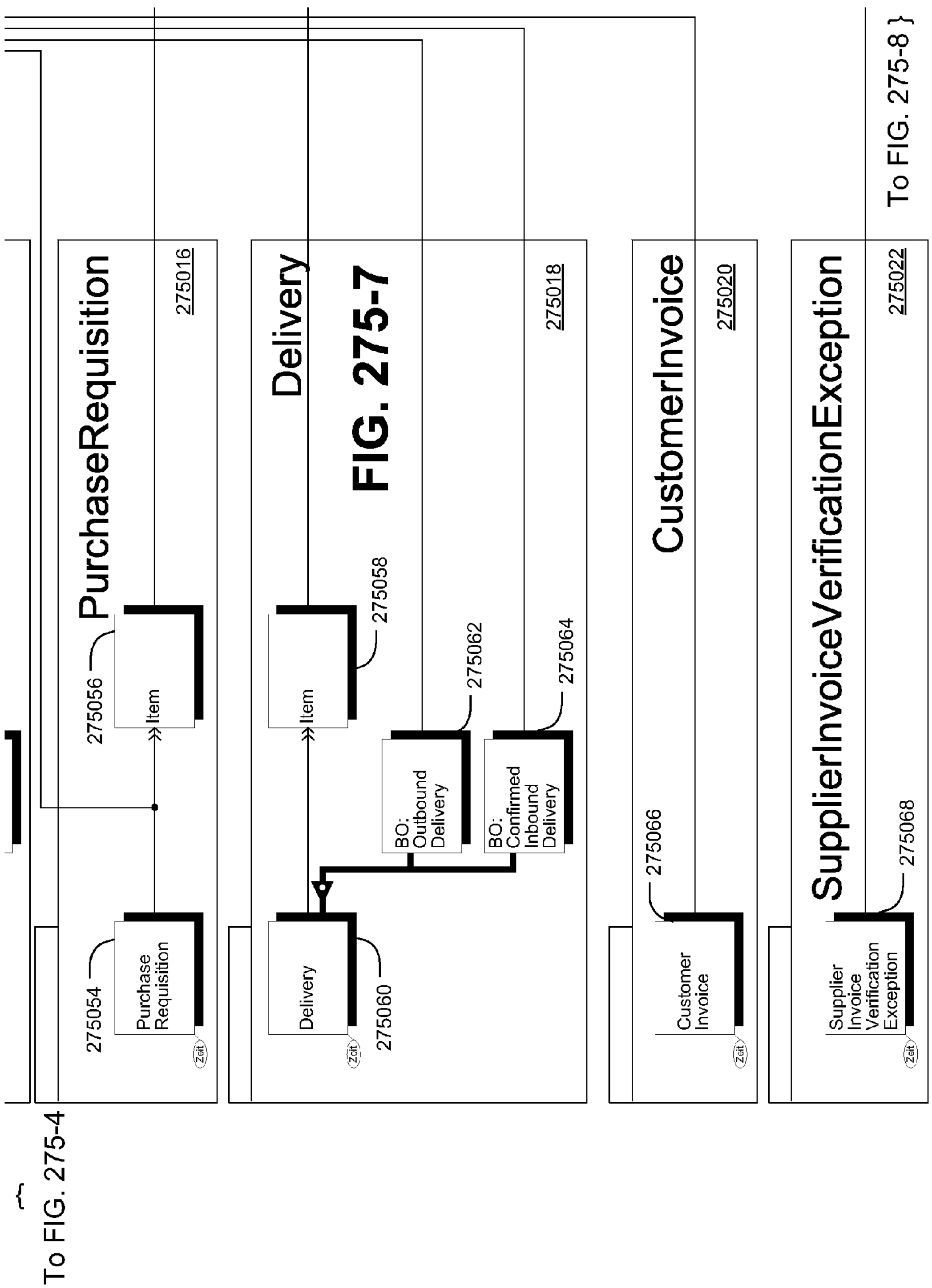
Figures 8, 275:
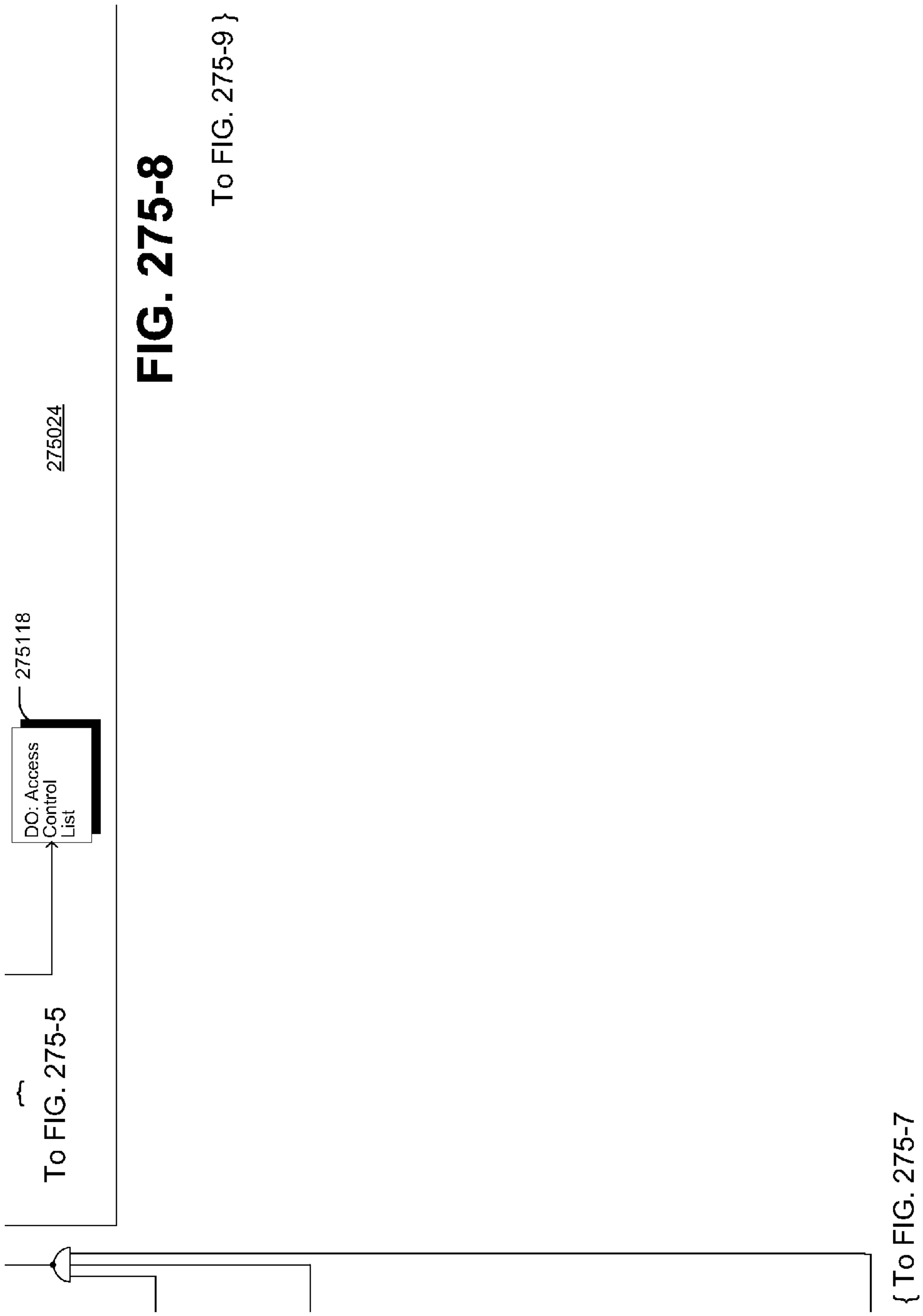
Figure 276:
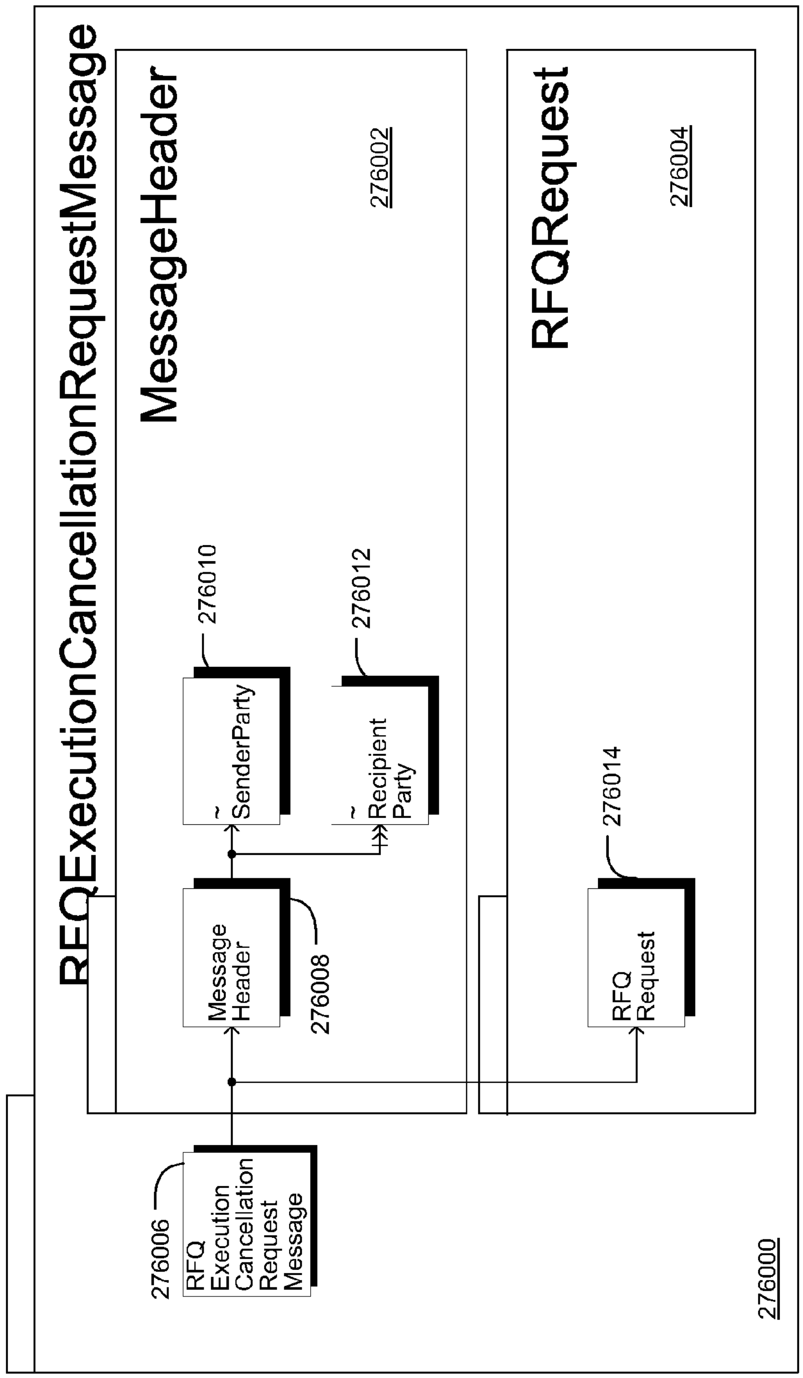
Figure 277:
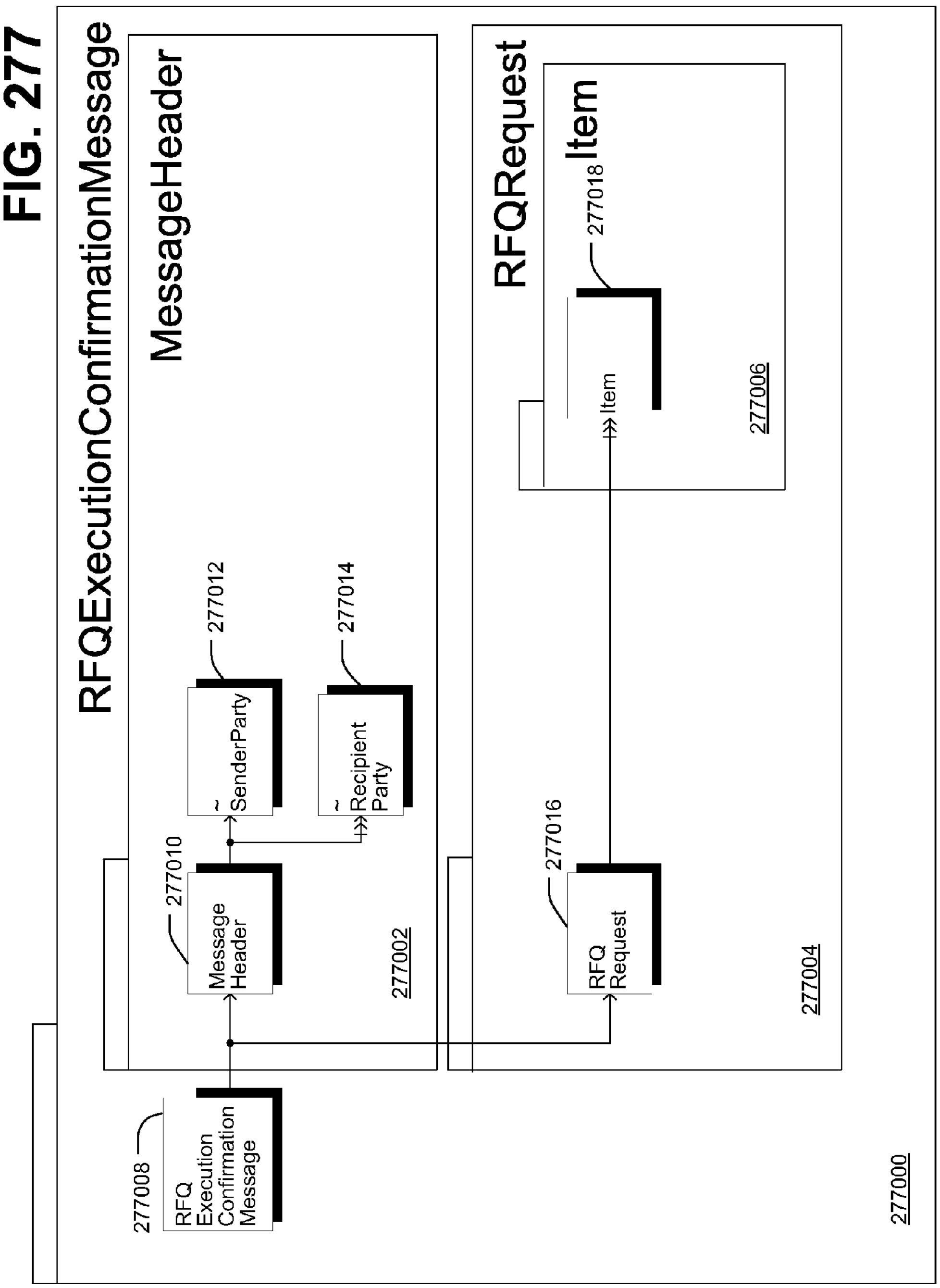
Figures 1, 278:
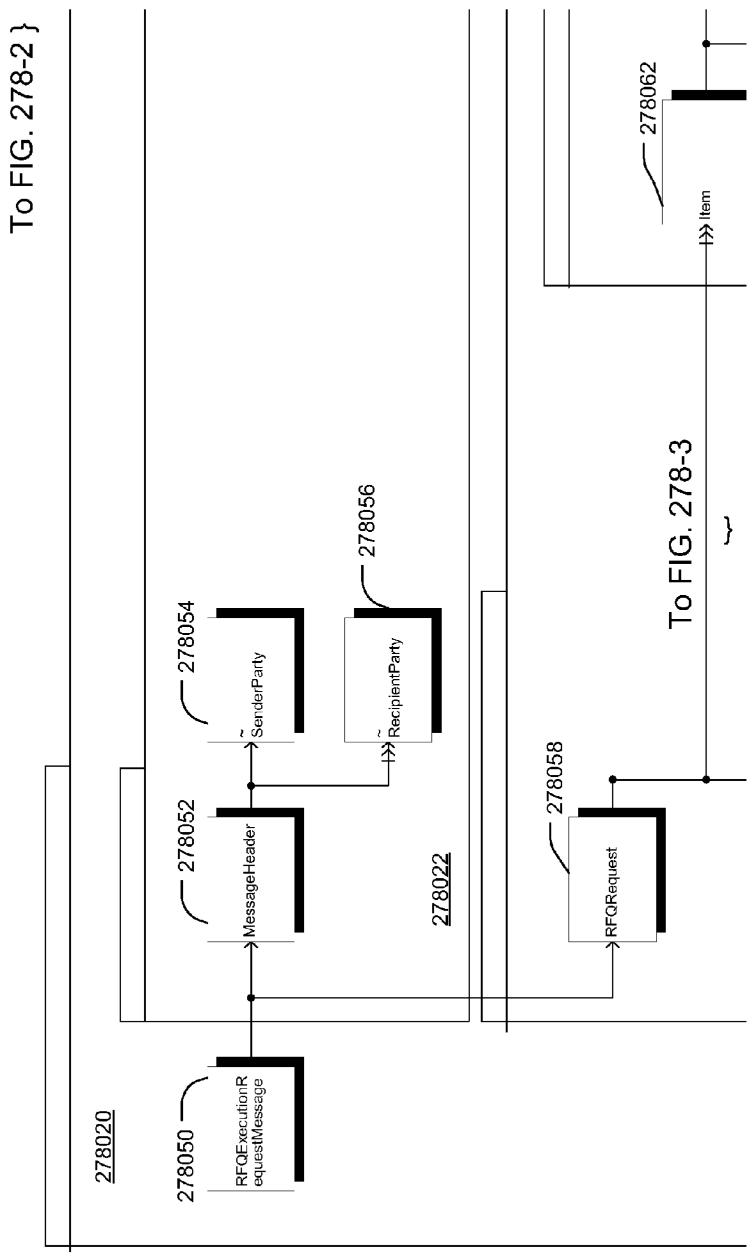
Figures 2, 278:
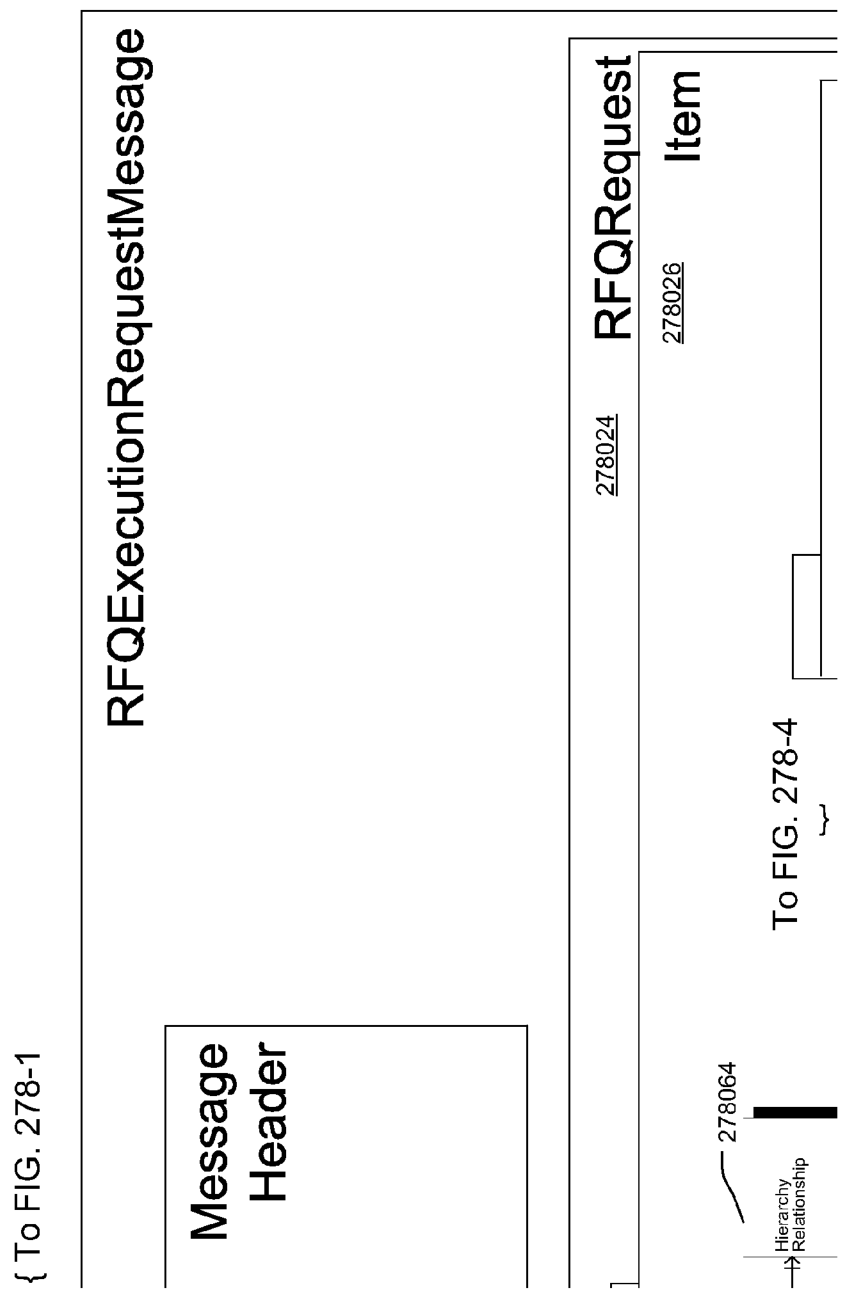
Figures 3, 278:
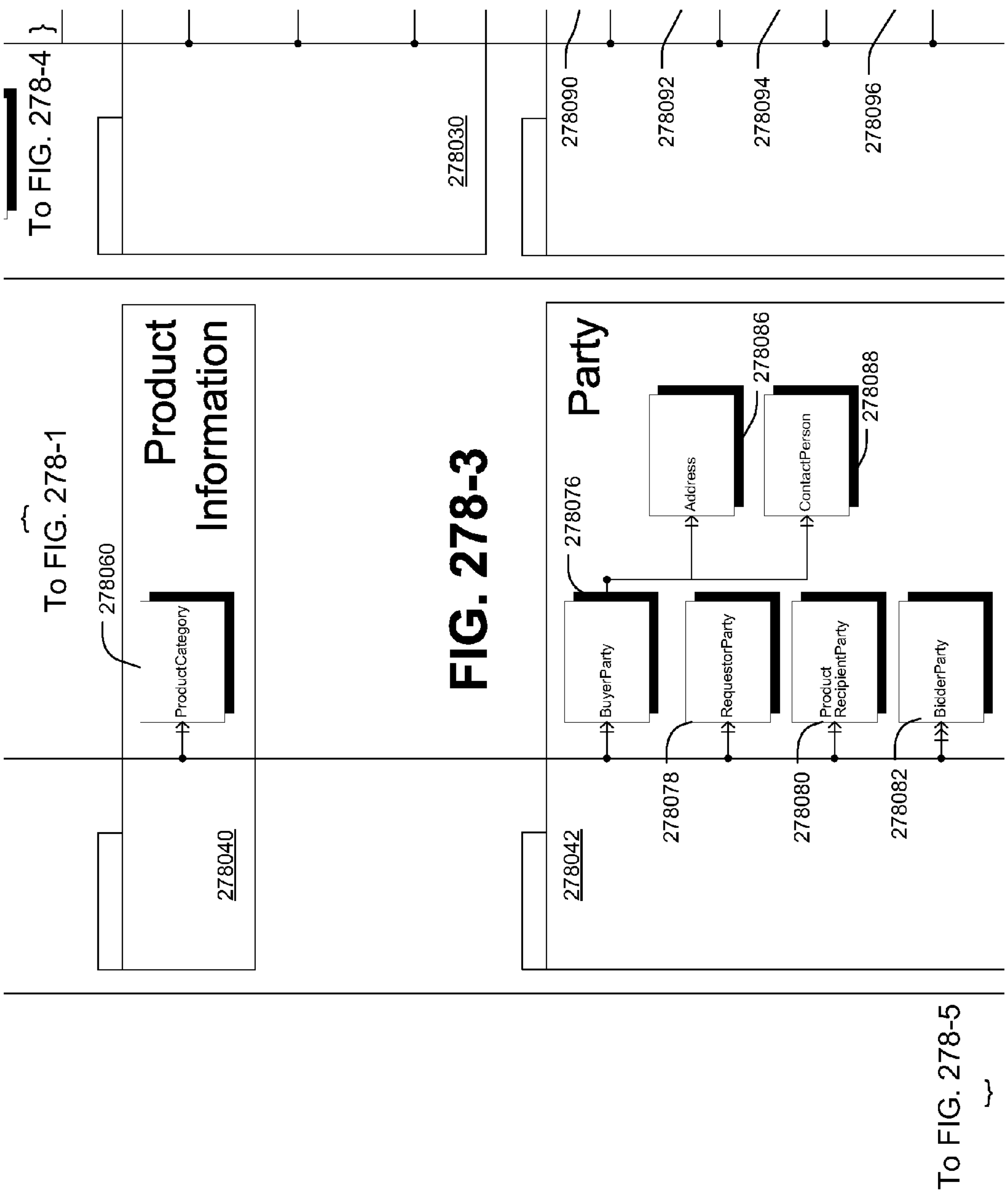
Figures 4, 278:
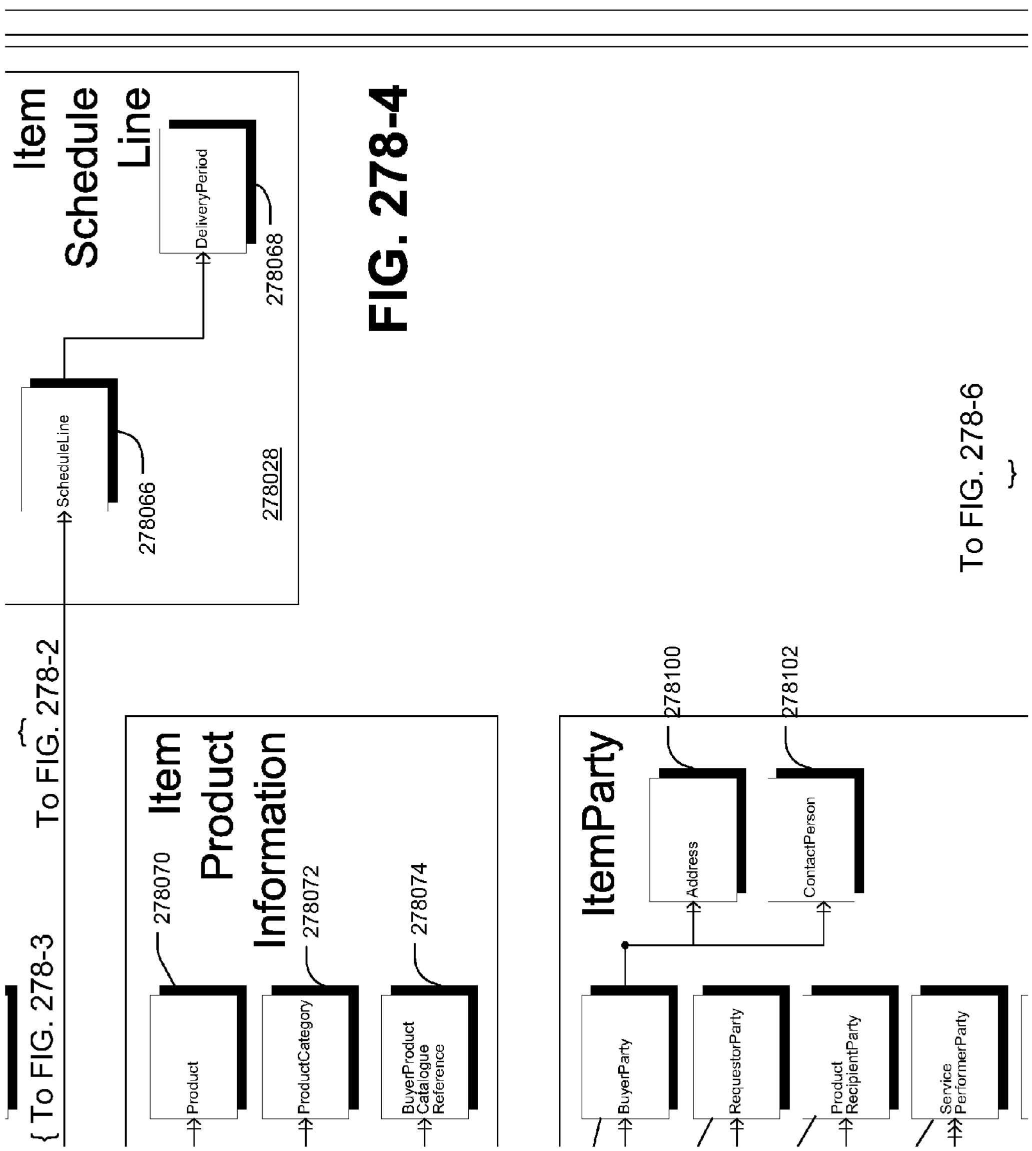
Figures 5, 278:
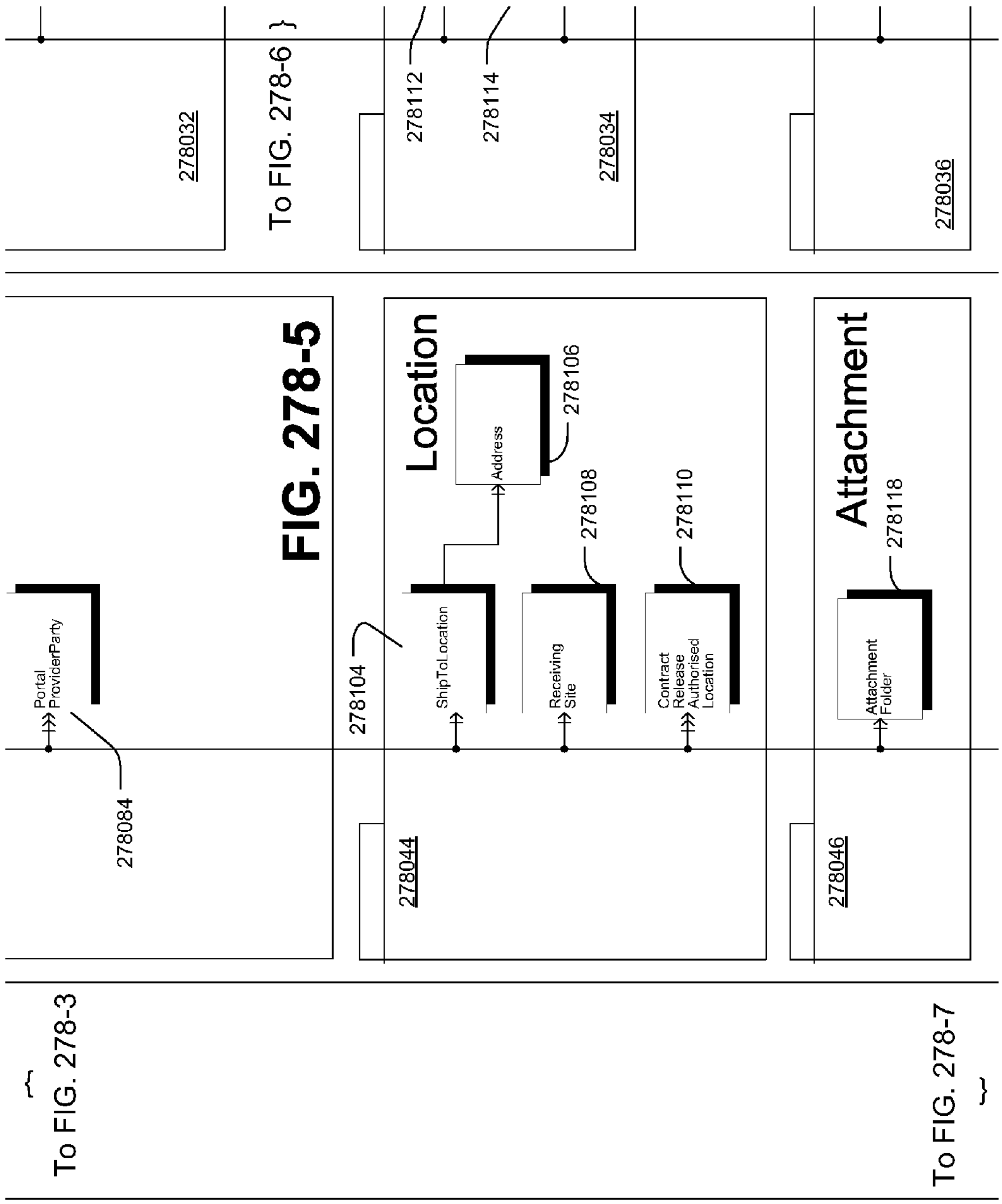
Figures 6, 278:
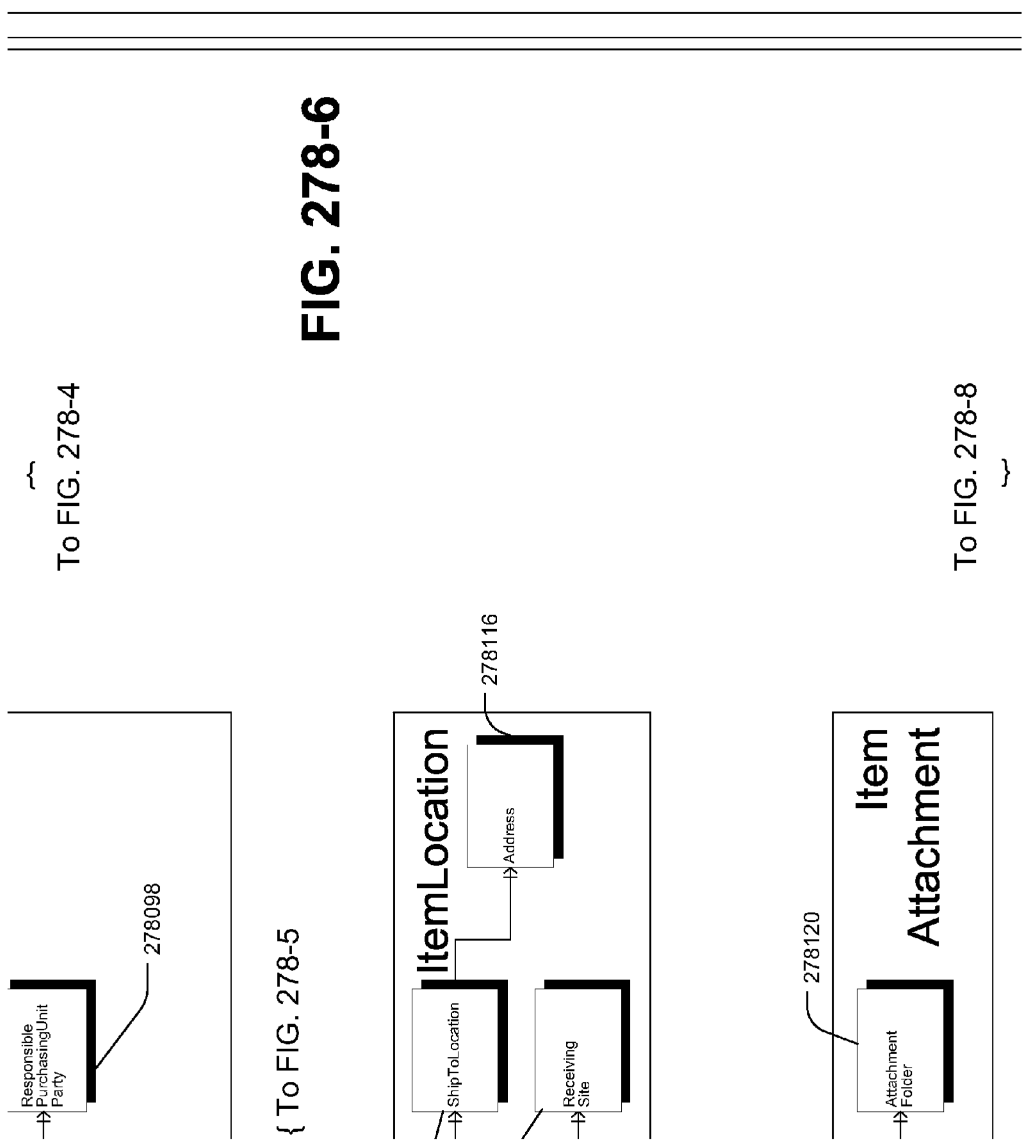
Figures 7, 278:
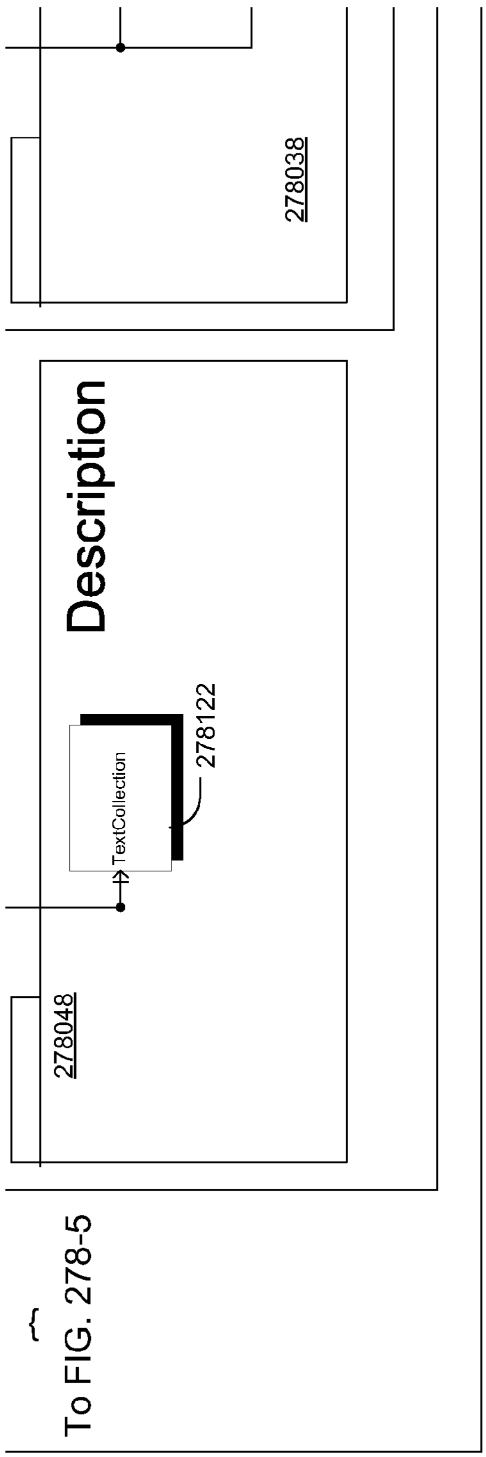
Figures 8, 278:
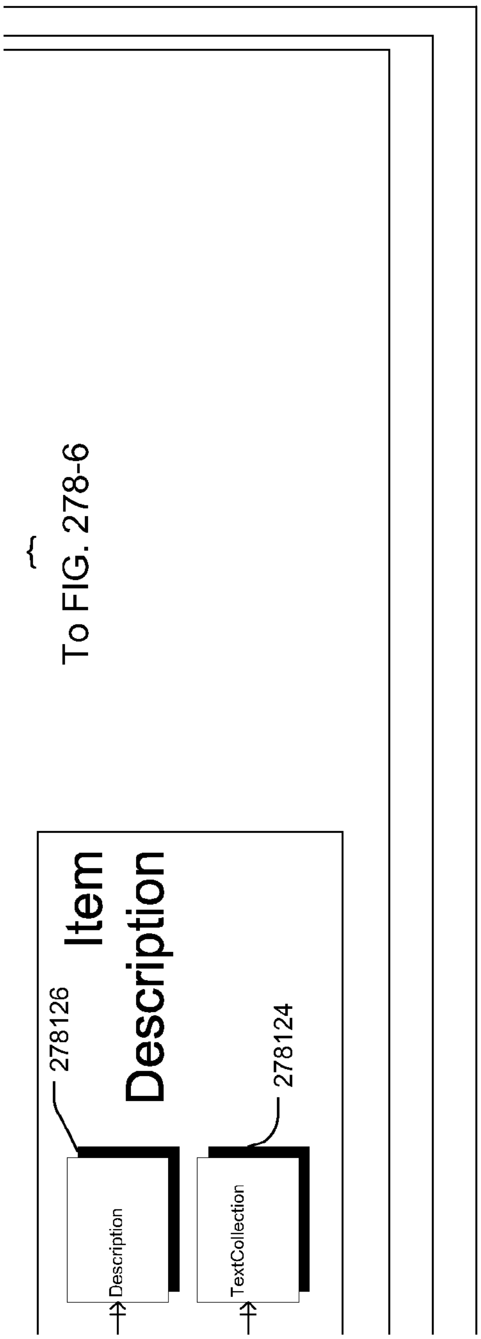
Figures 1, 282:
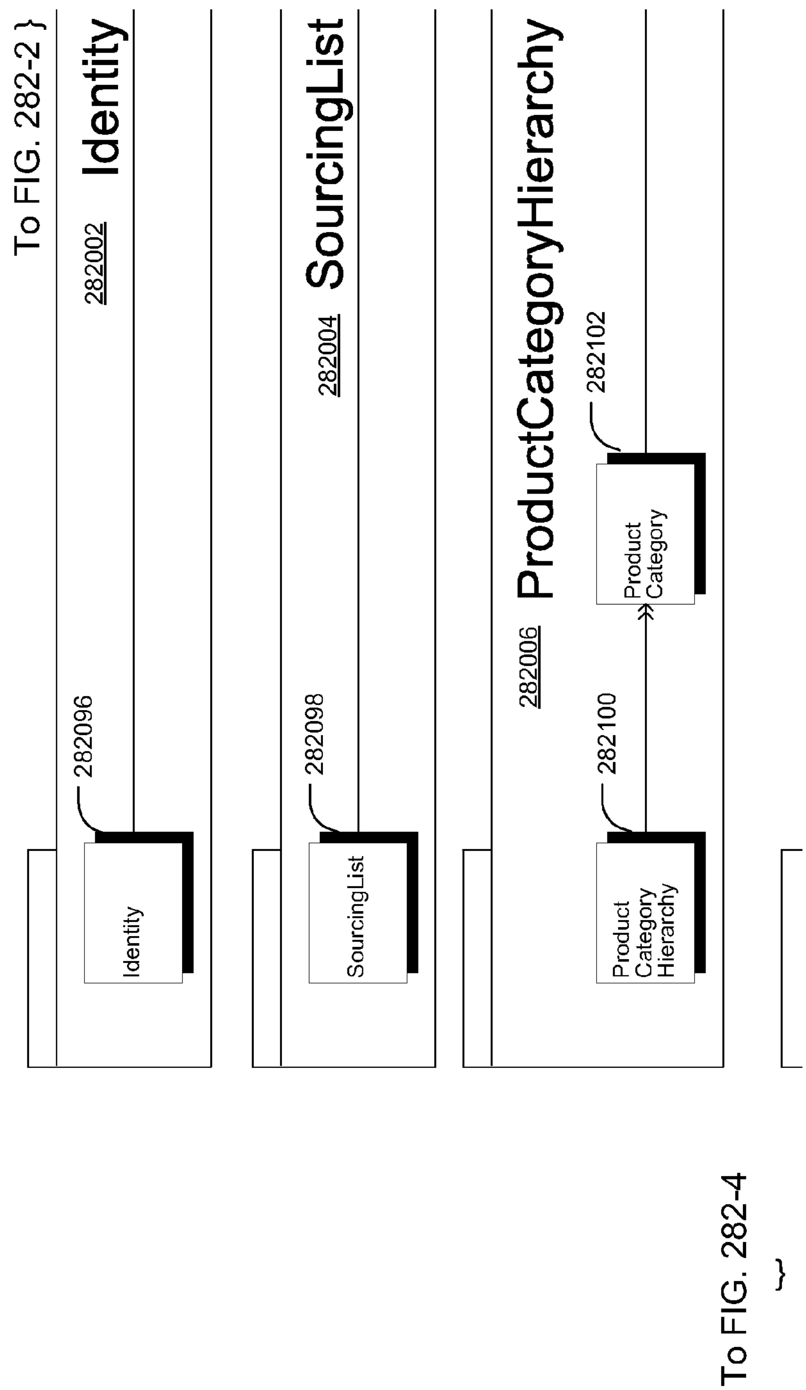
Figures 2, 282:
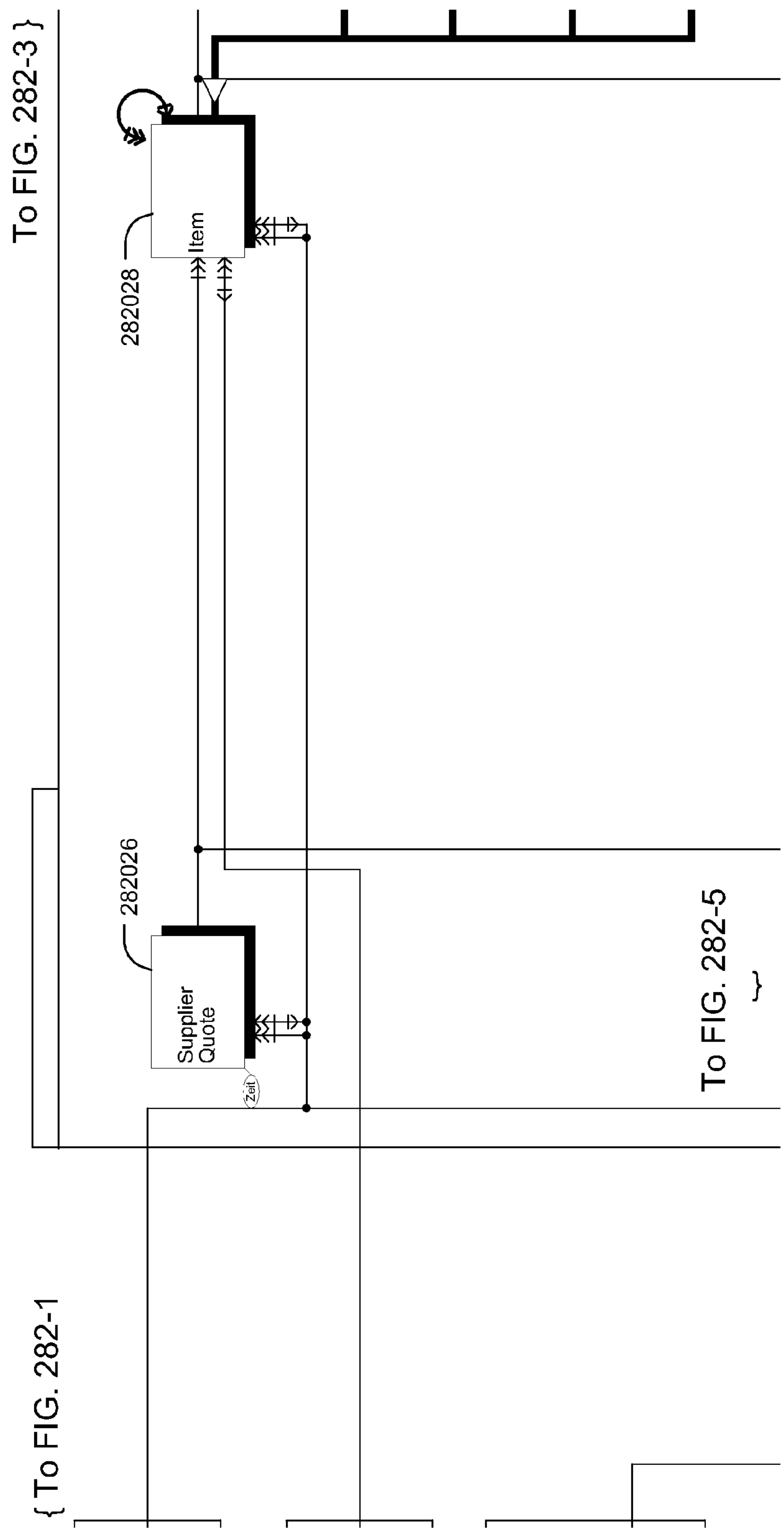
Figures 3, 282:
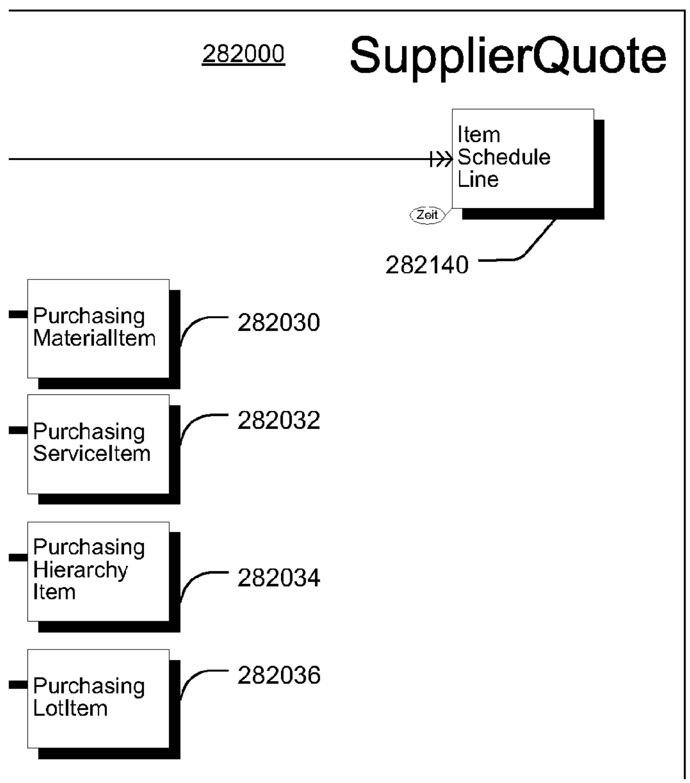
Figures 4, 282:
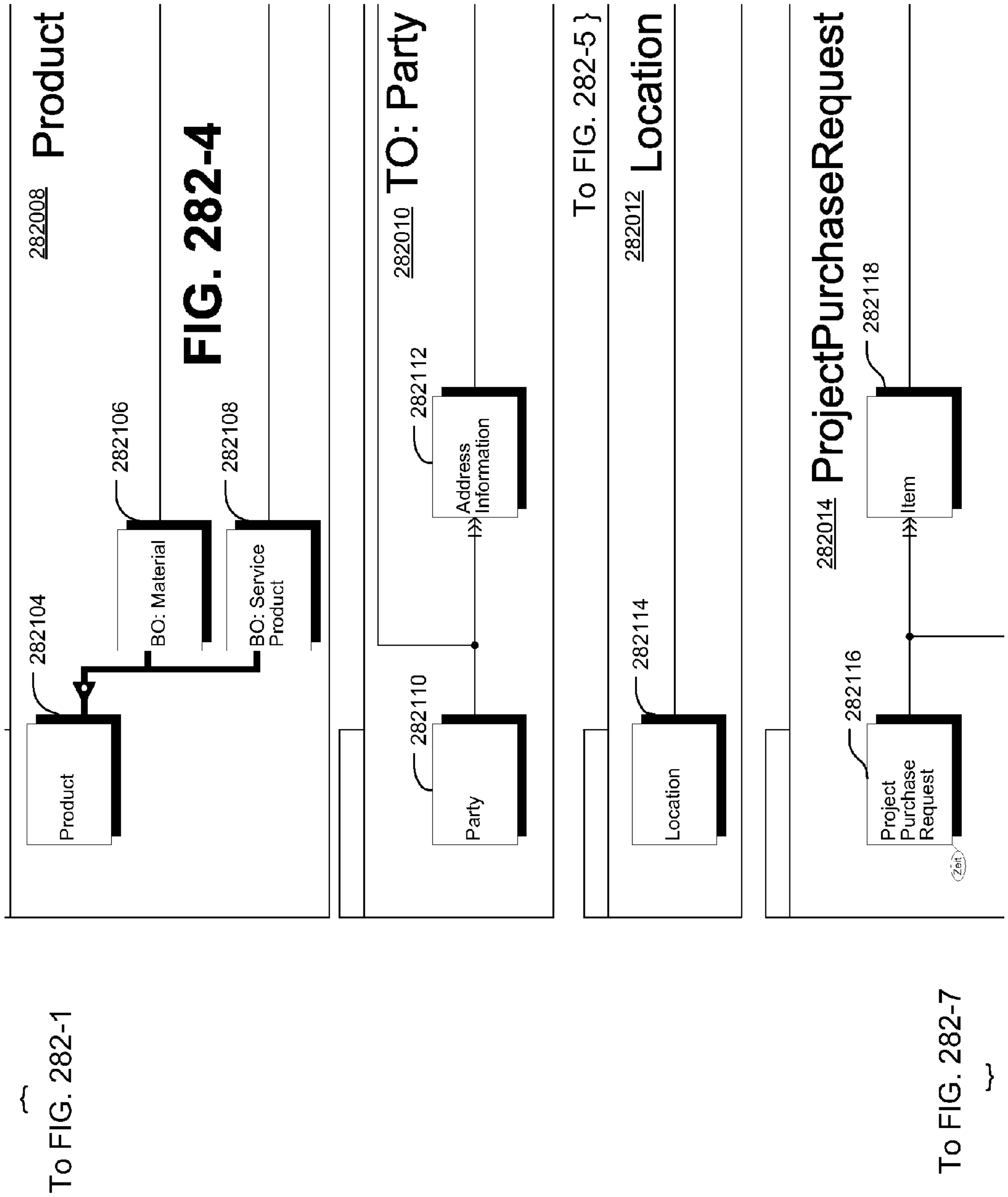
Figures 5, 282:
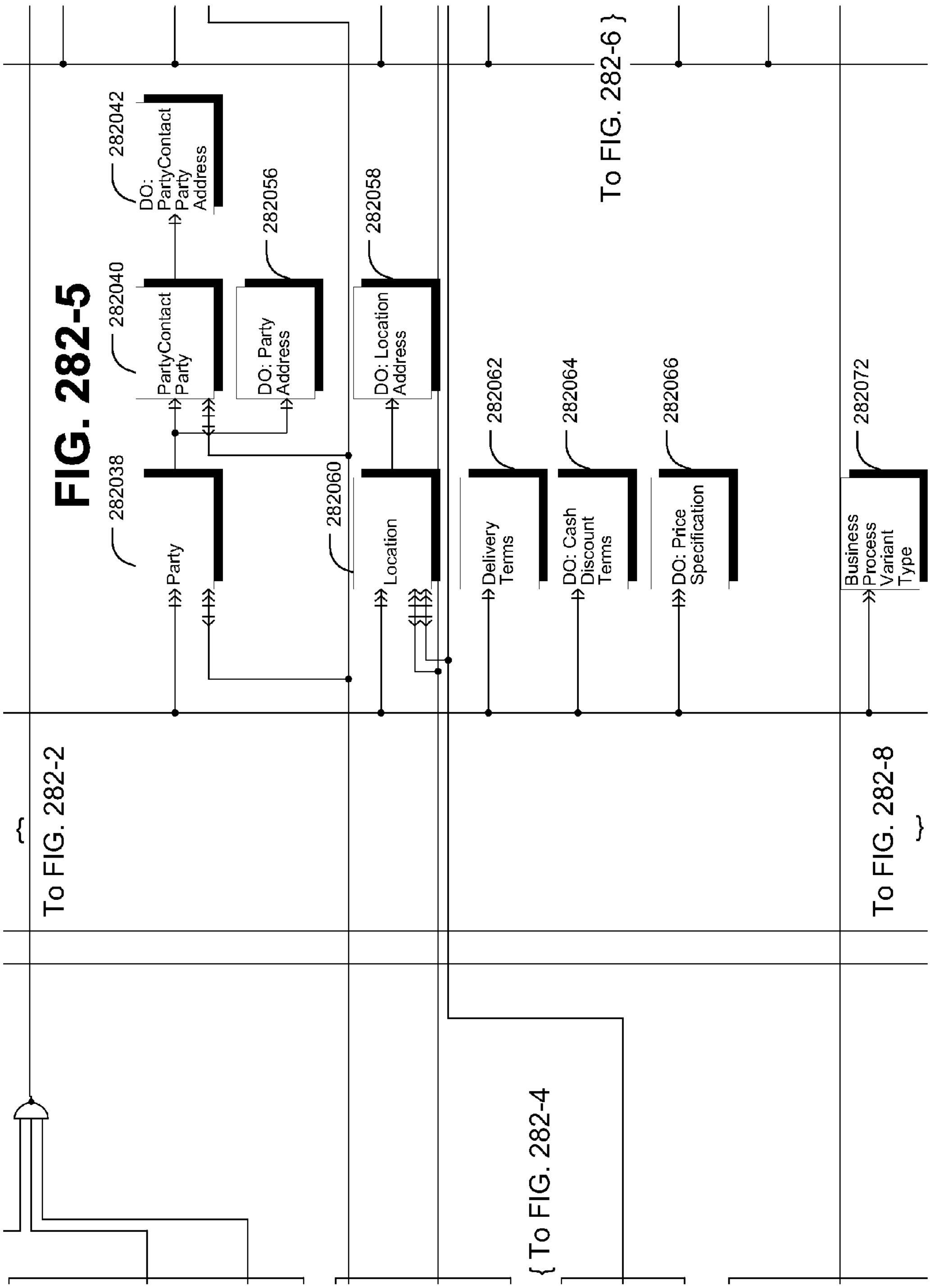
Figures 6, 282:
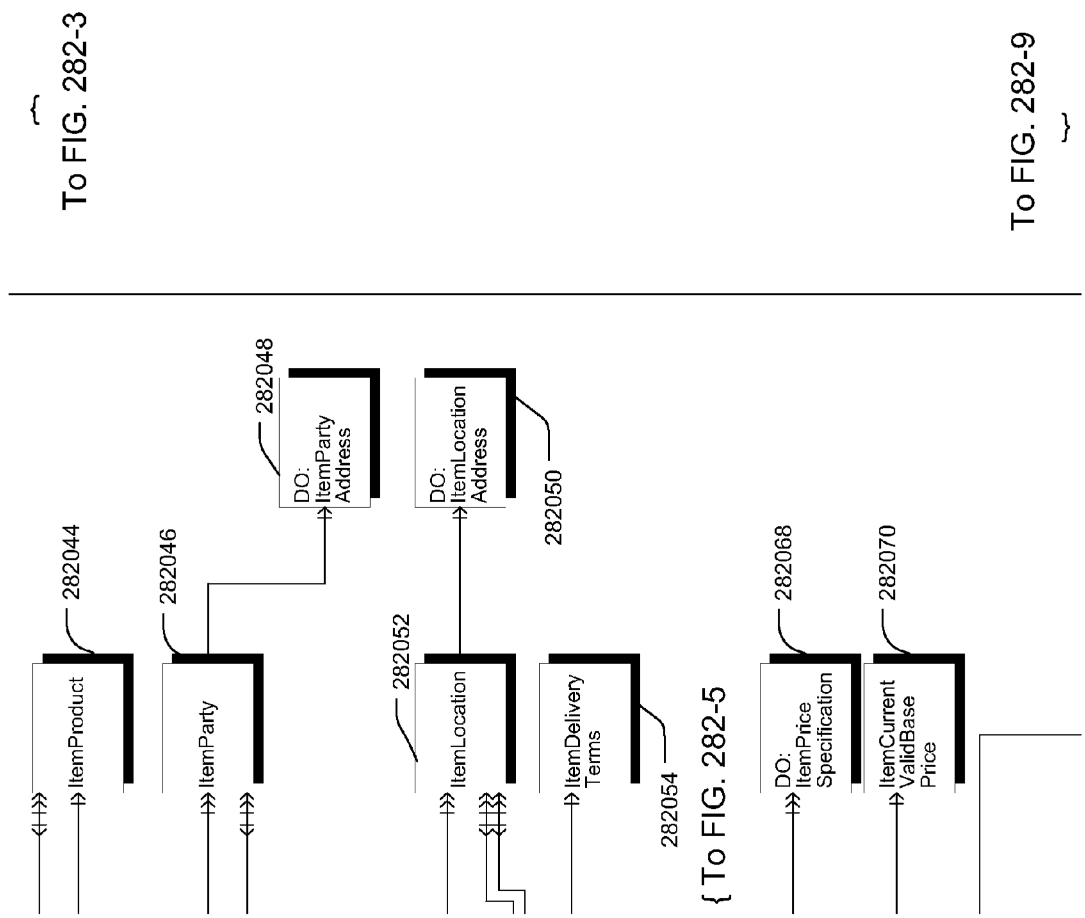
Figures 7, 282:
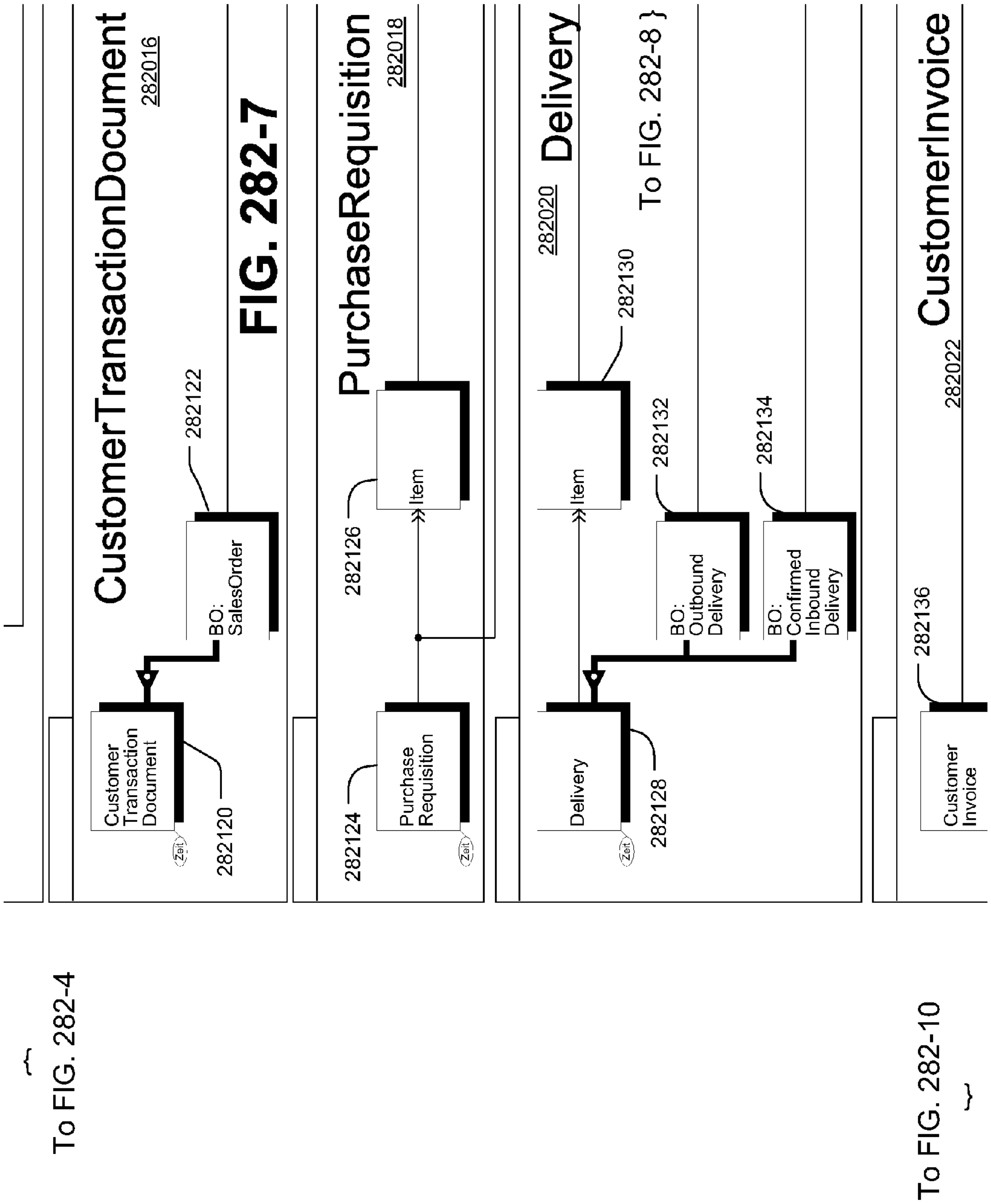
Figures 8, 282:
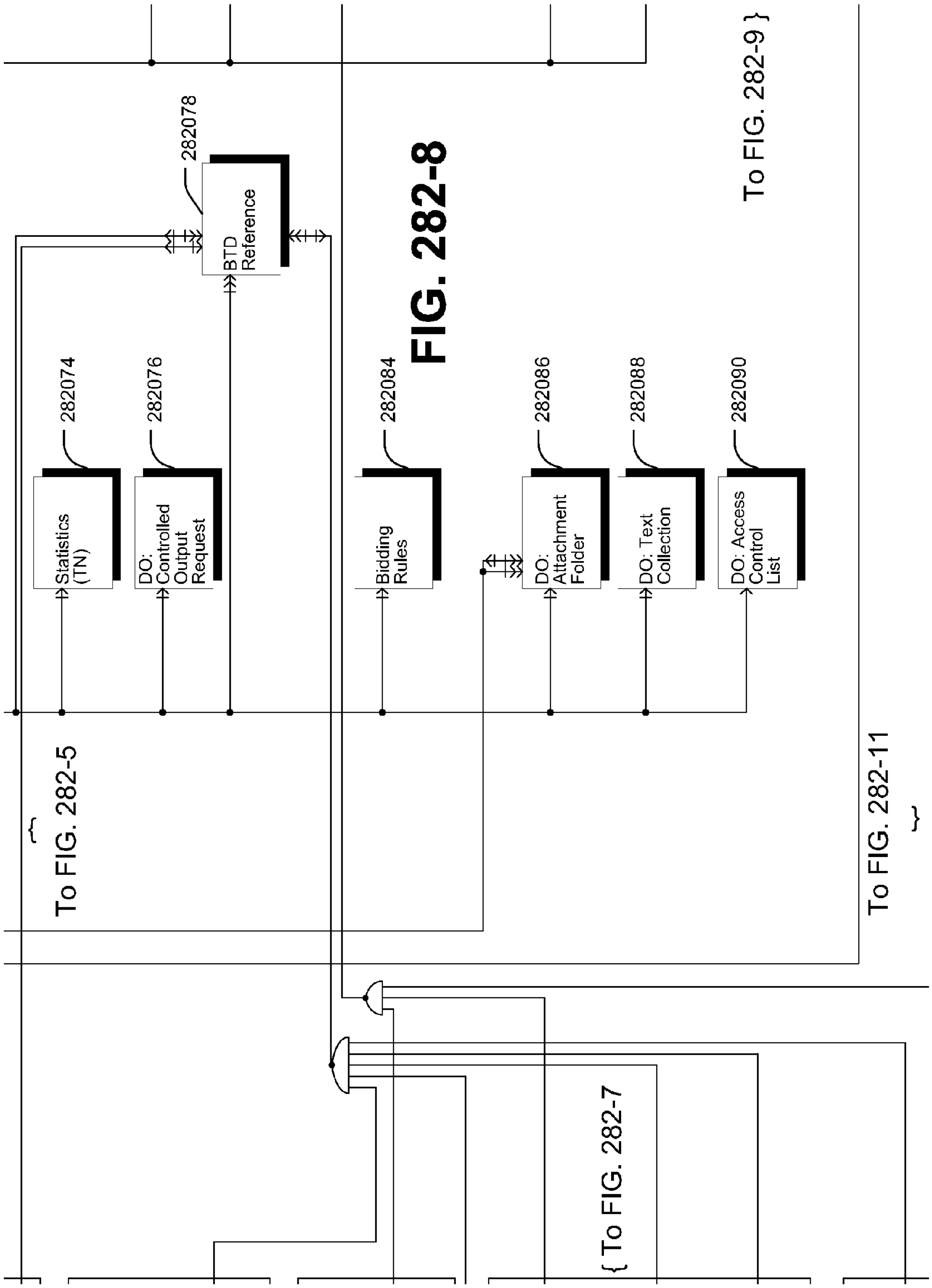
Figures 9, 282:
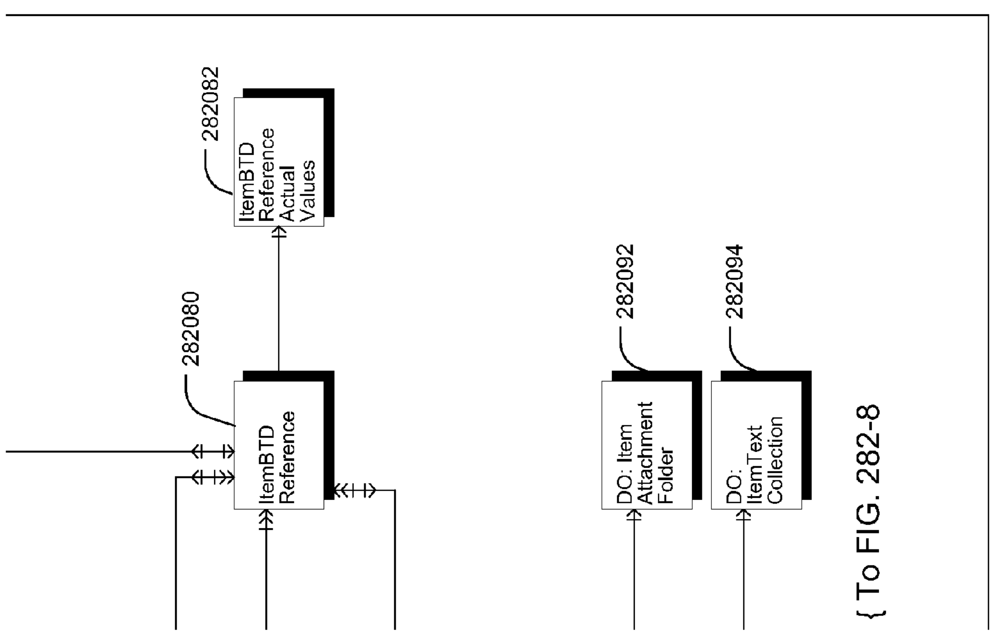
Figures 10, 282:
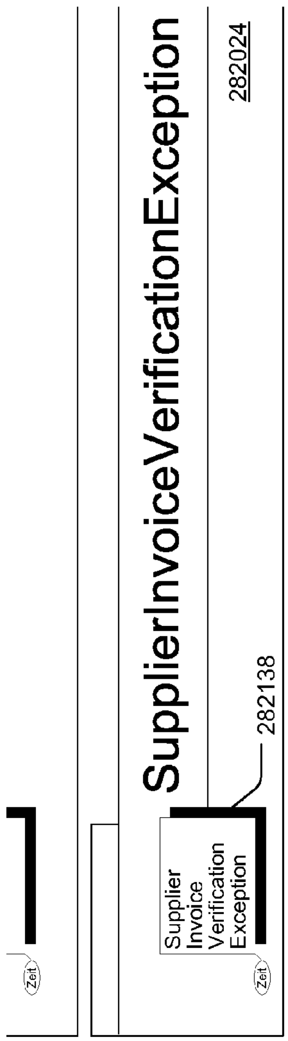
Figures 1, 284:
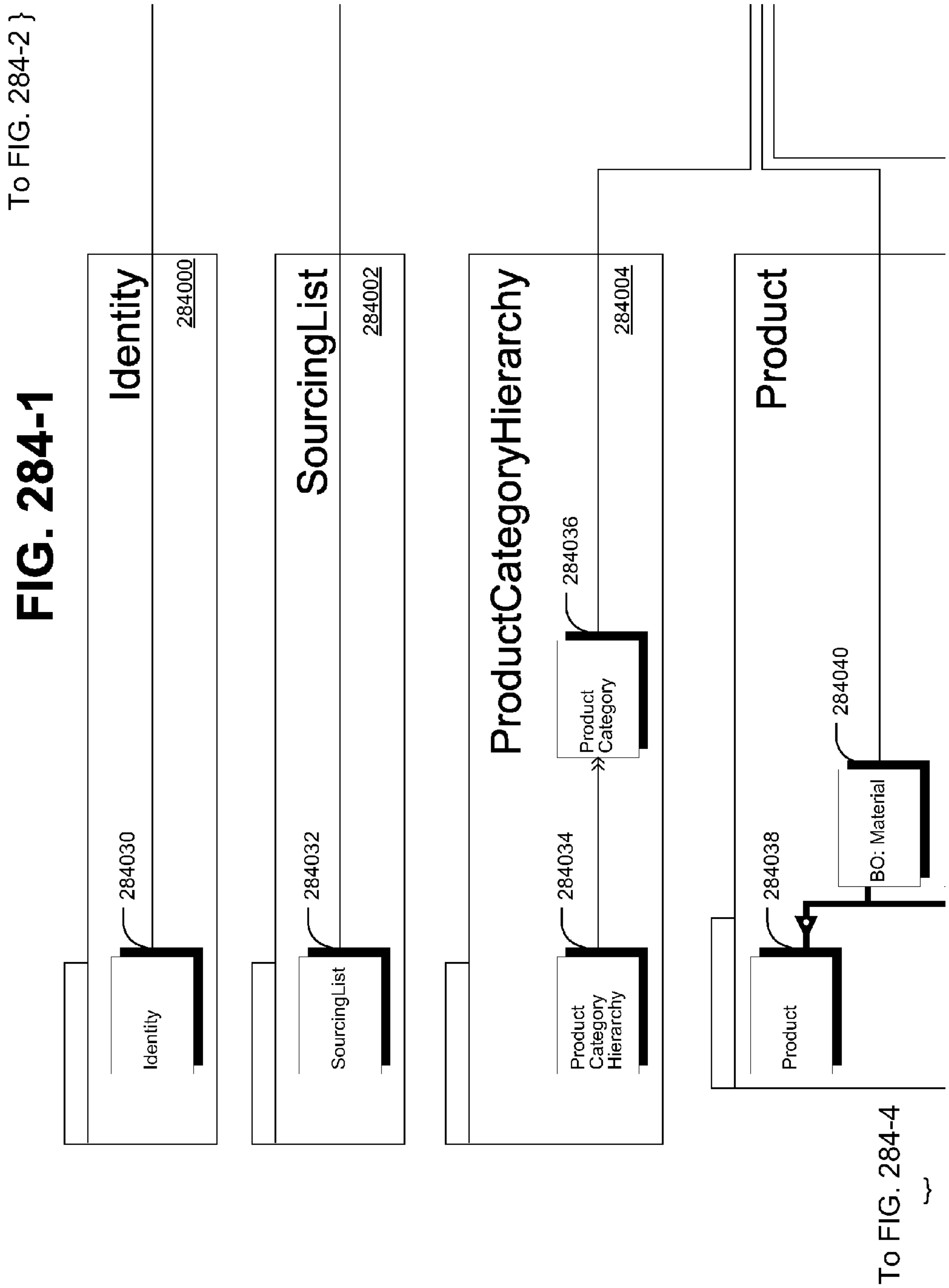
Figures 2, 284:
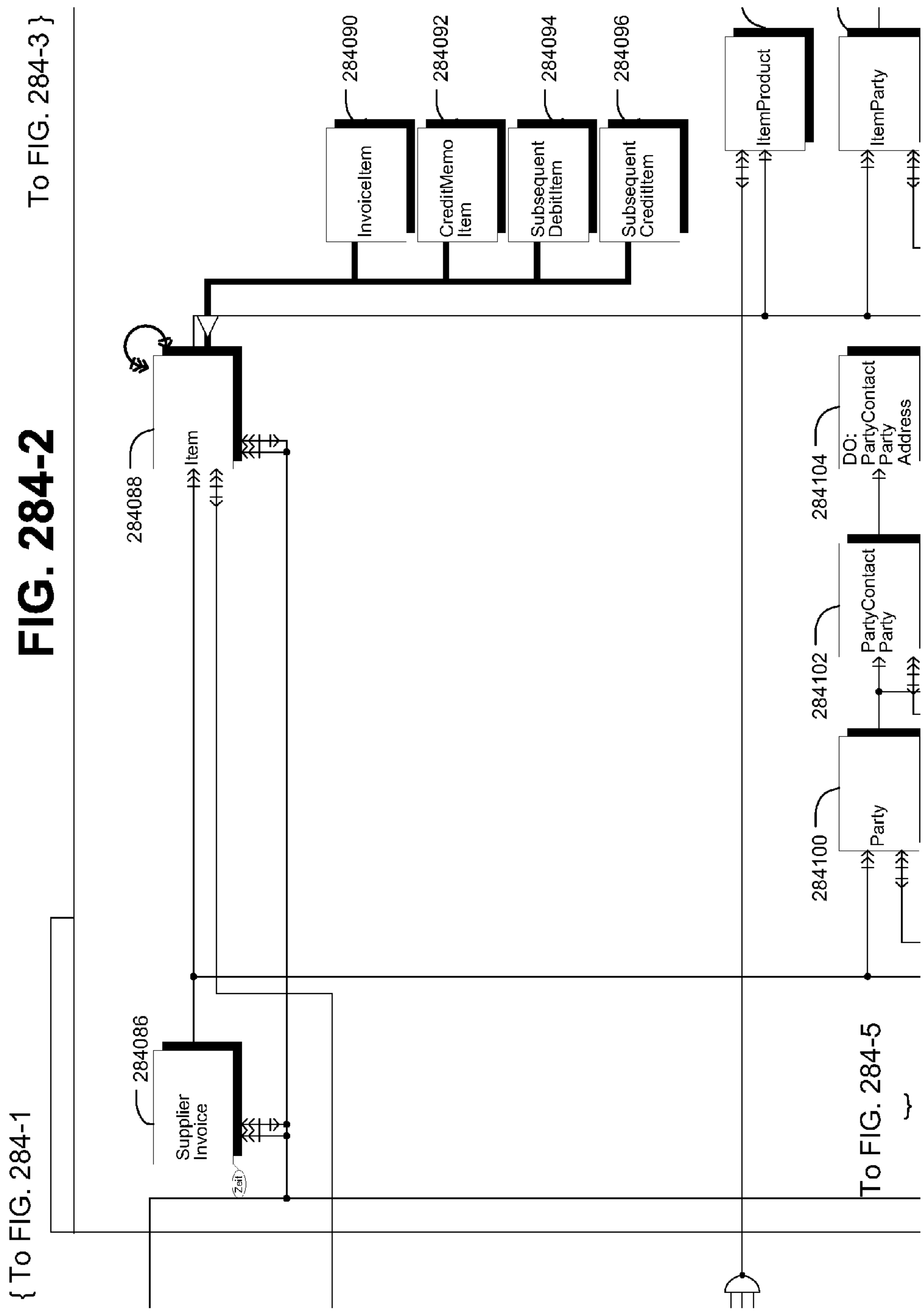
Figures 3, 284:
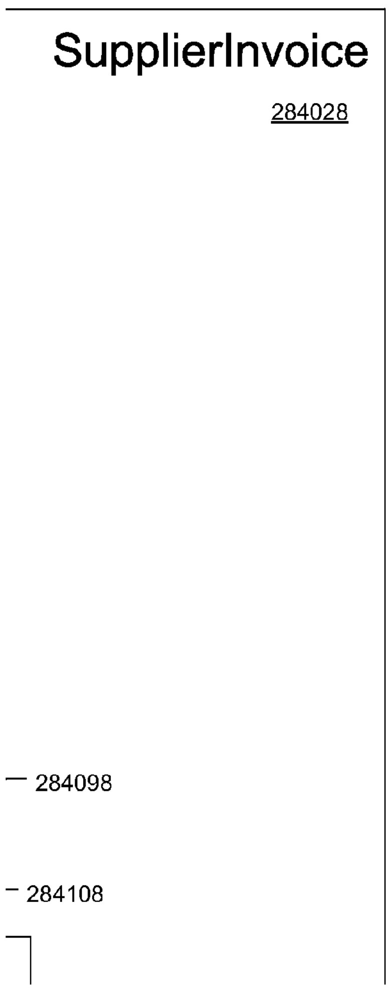
Figures 4, 284:
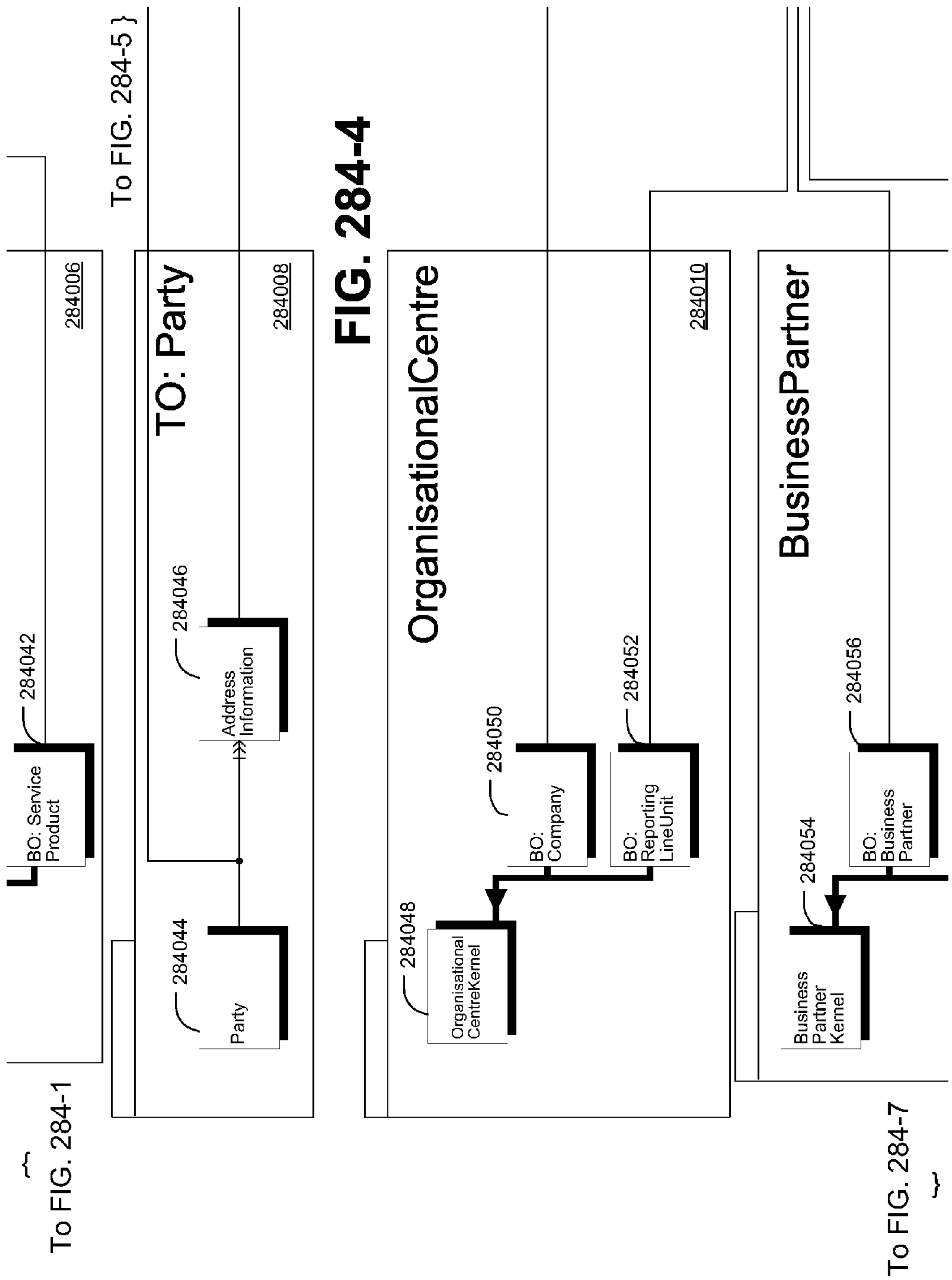
Figures 5, 284:
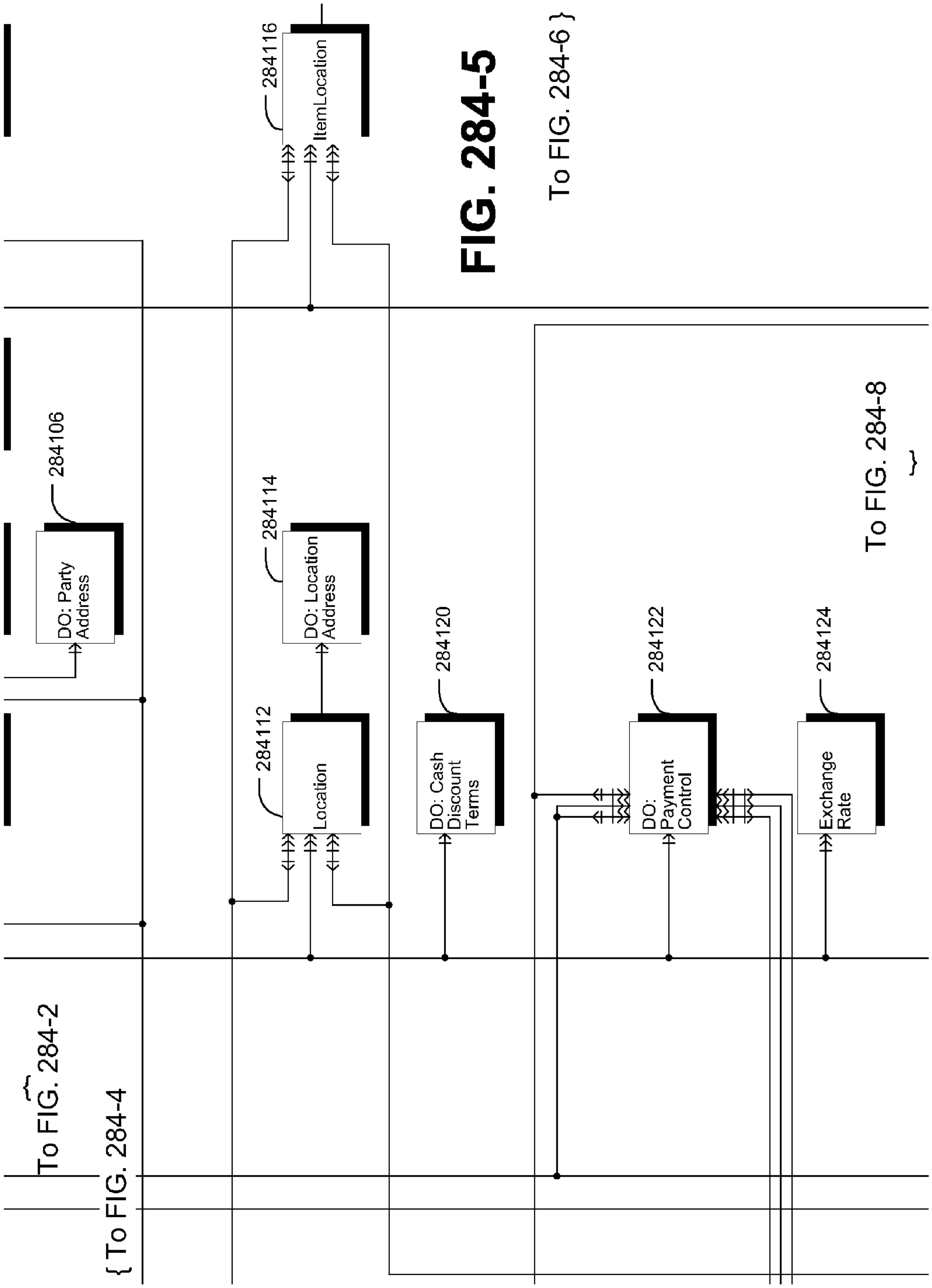
Figures 6, 284:
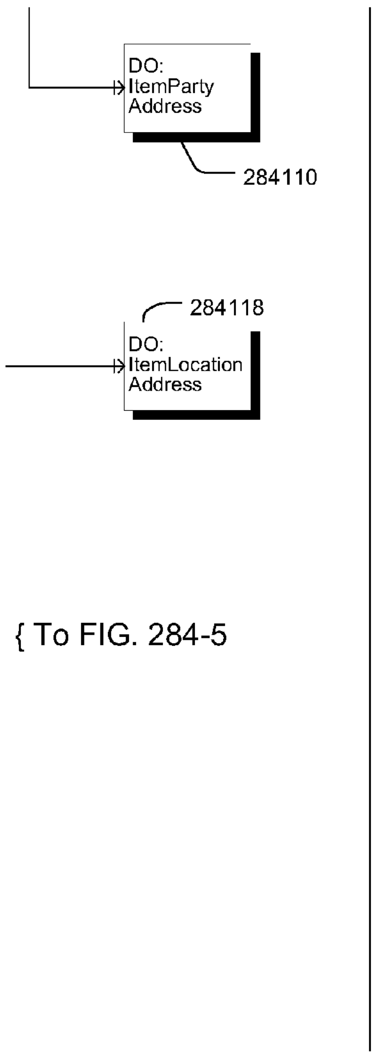
Figures 7, 284:
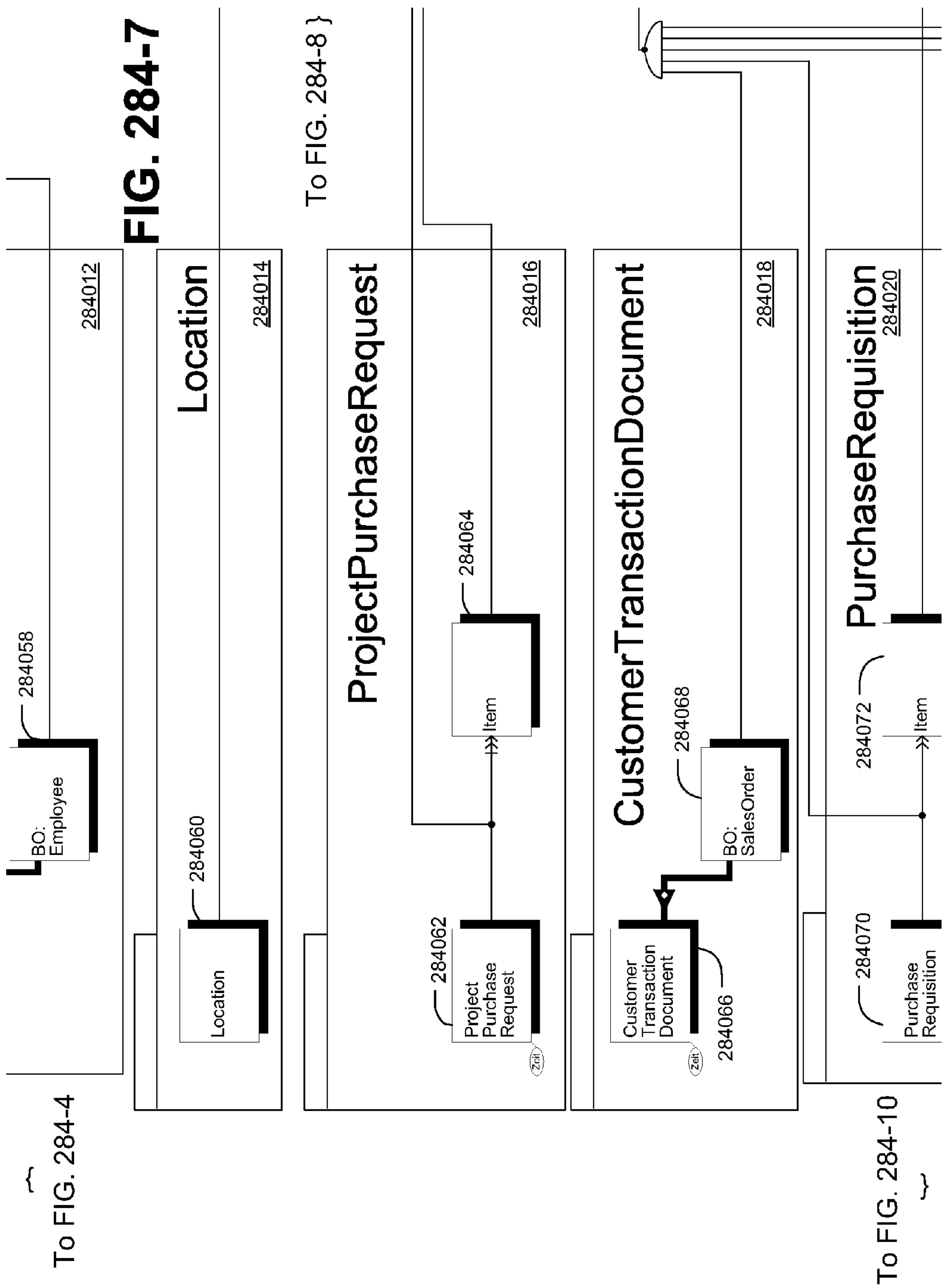
Figures 8, 284:
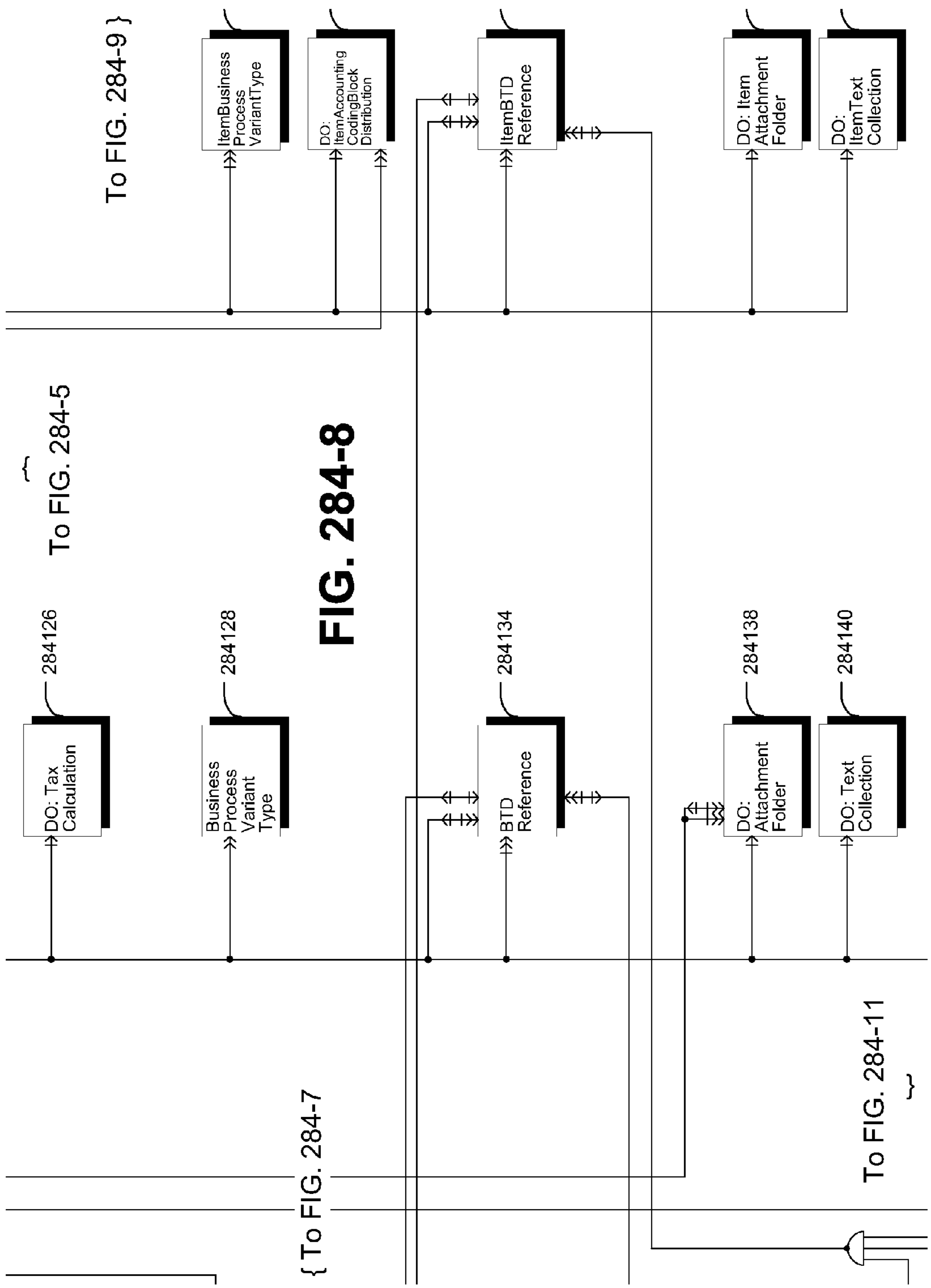
Figures 10, 284:
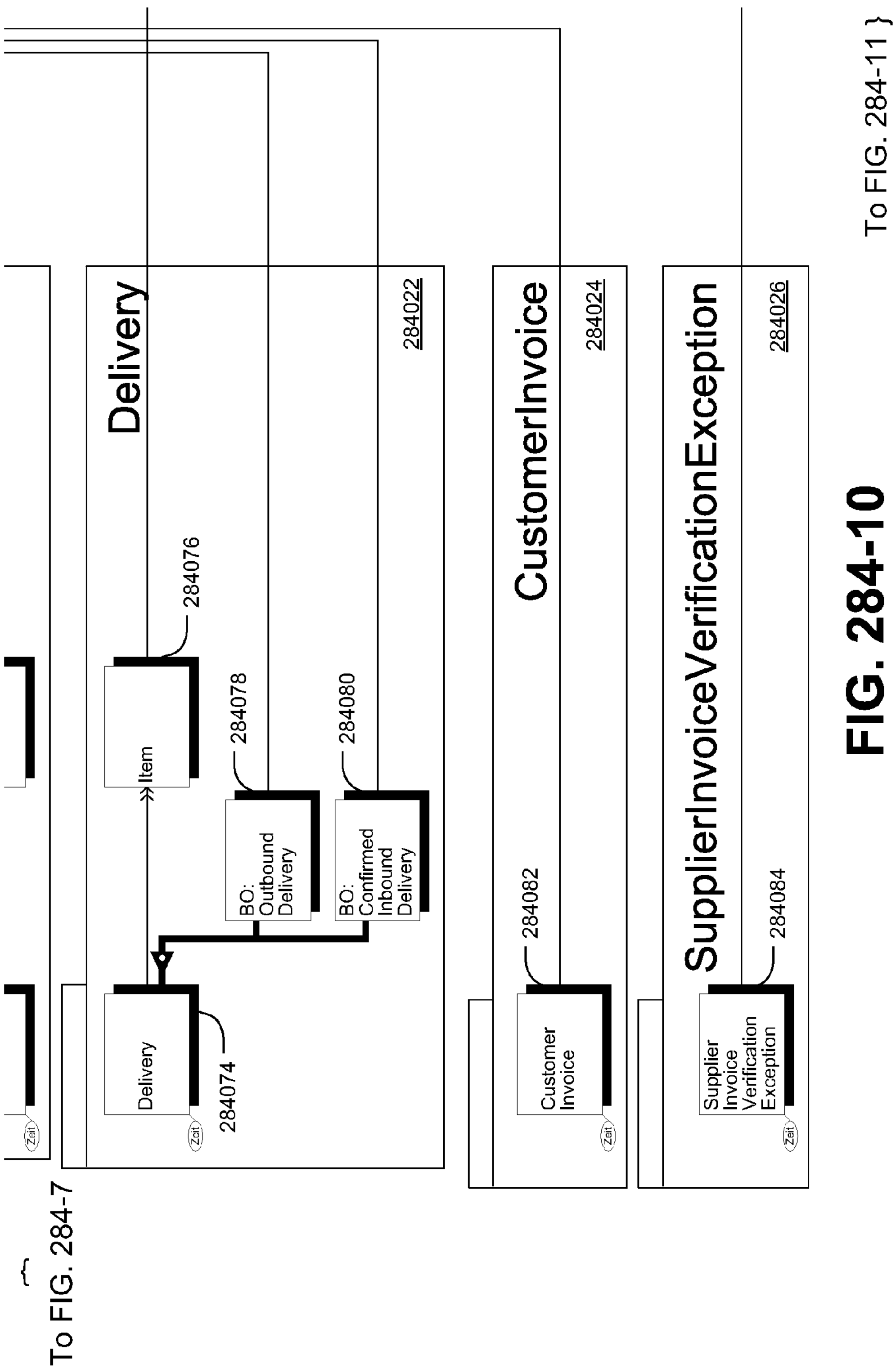
Figures 11, 284:
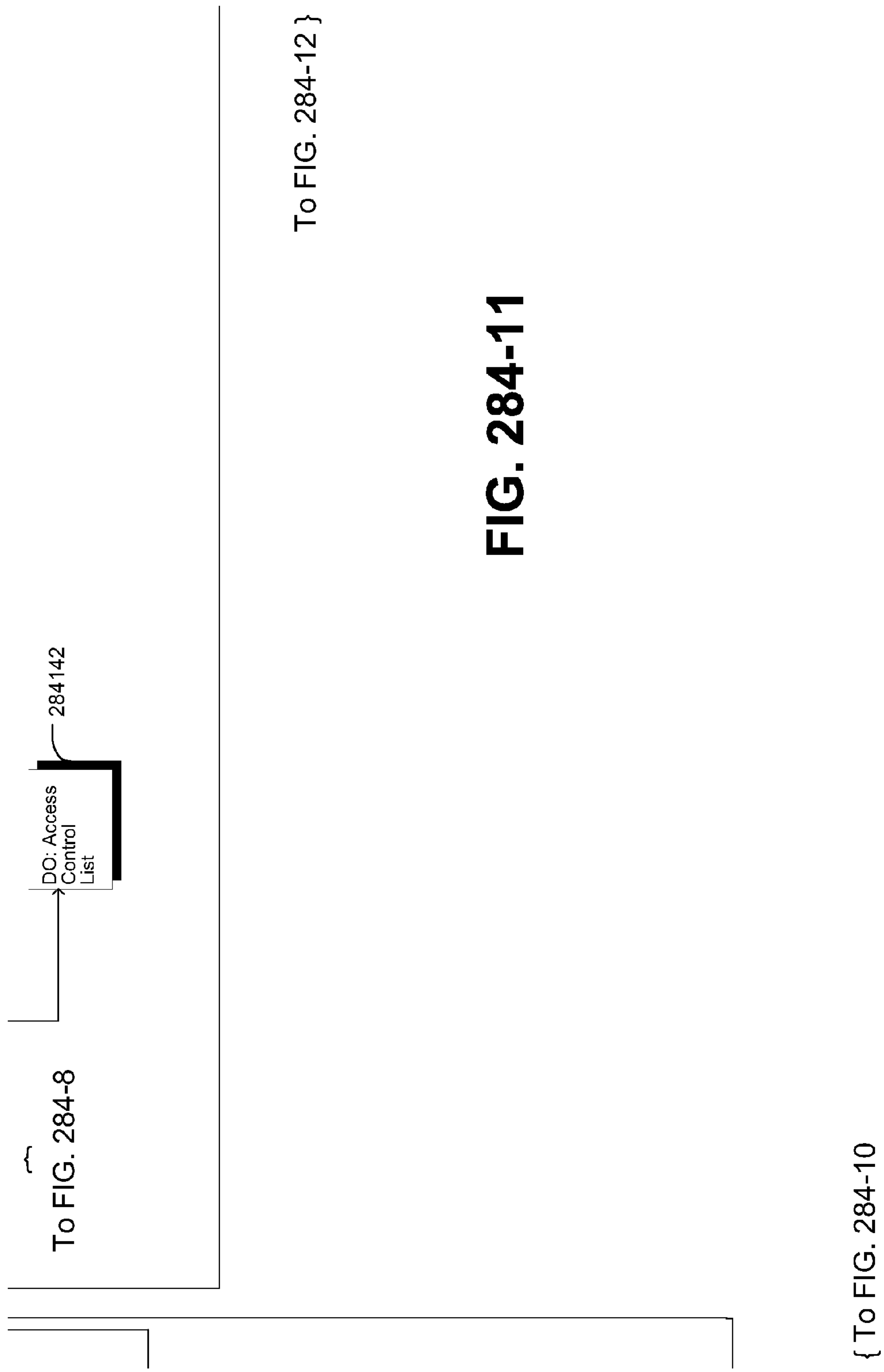
Figure 288:
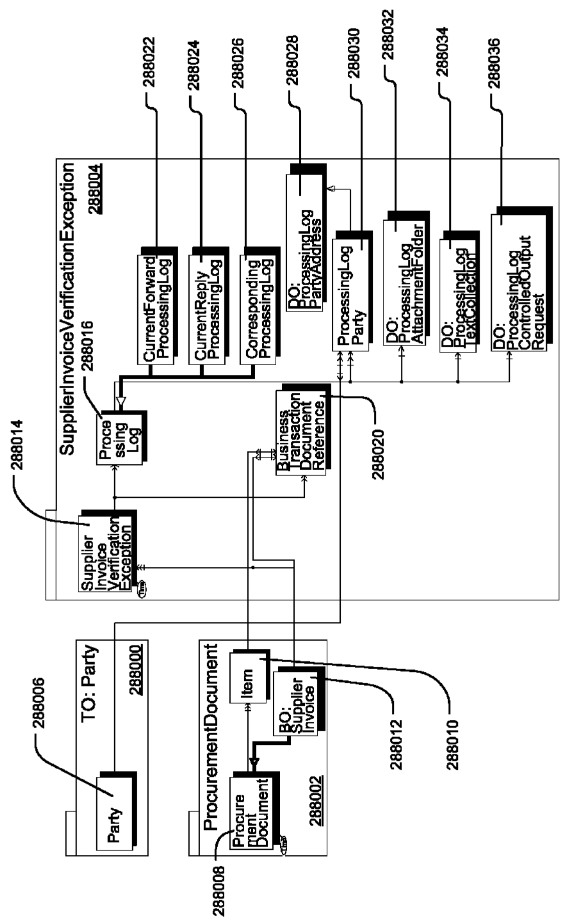
Figure 291:
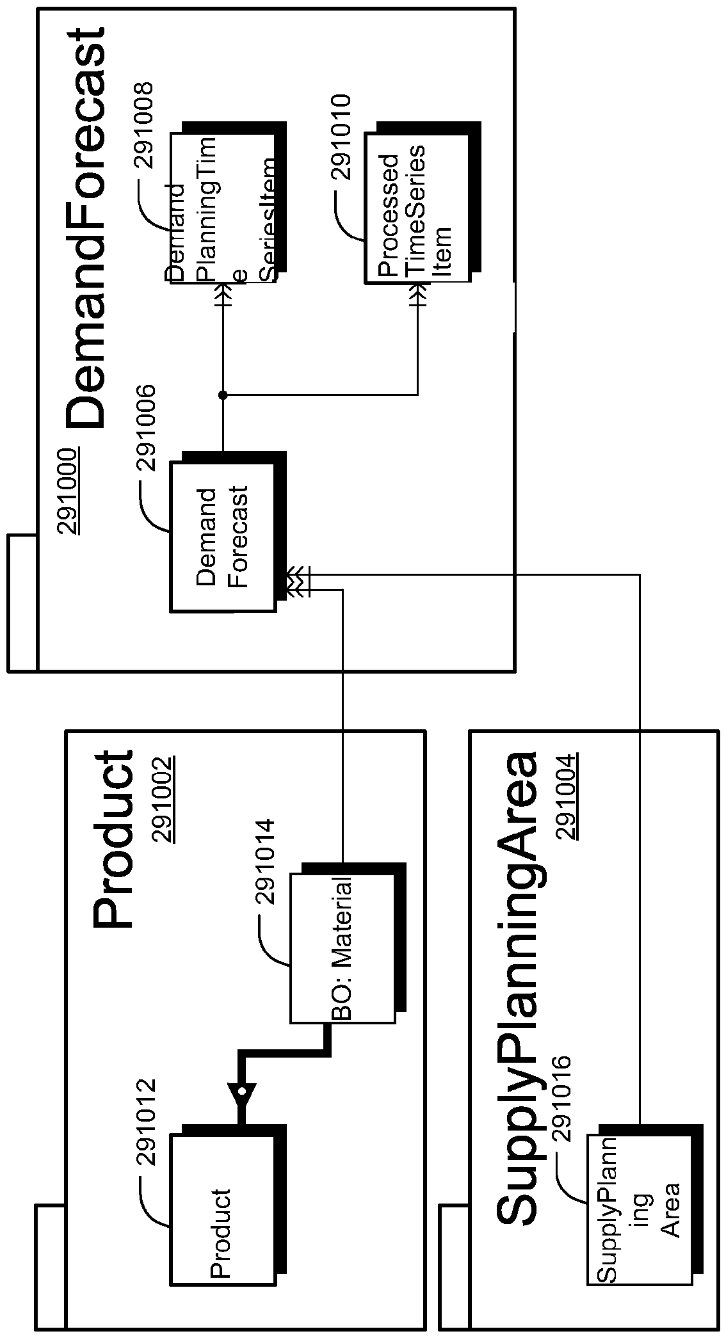
Figures 1, 292:
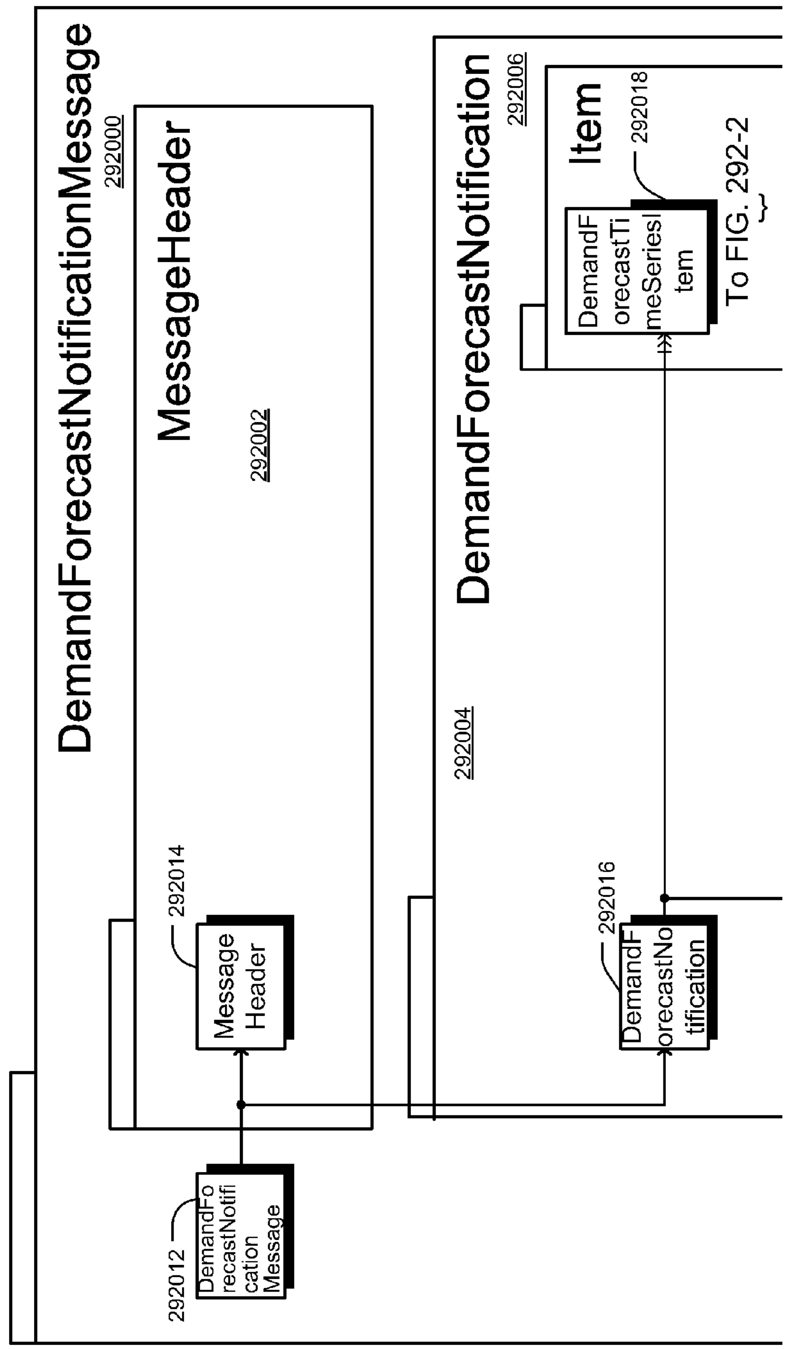
Figures 2, 292:
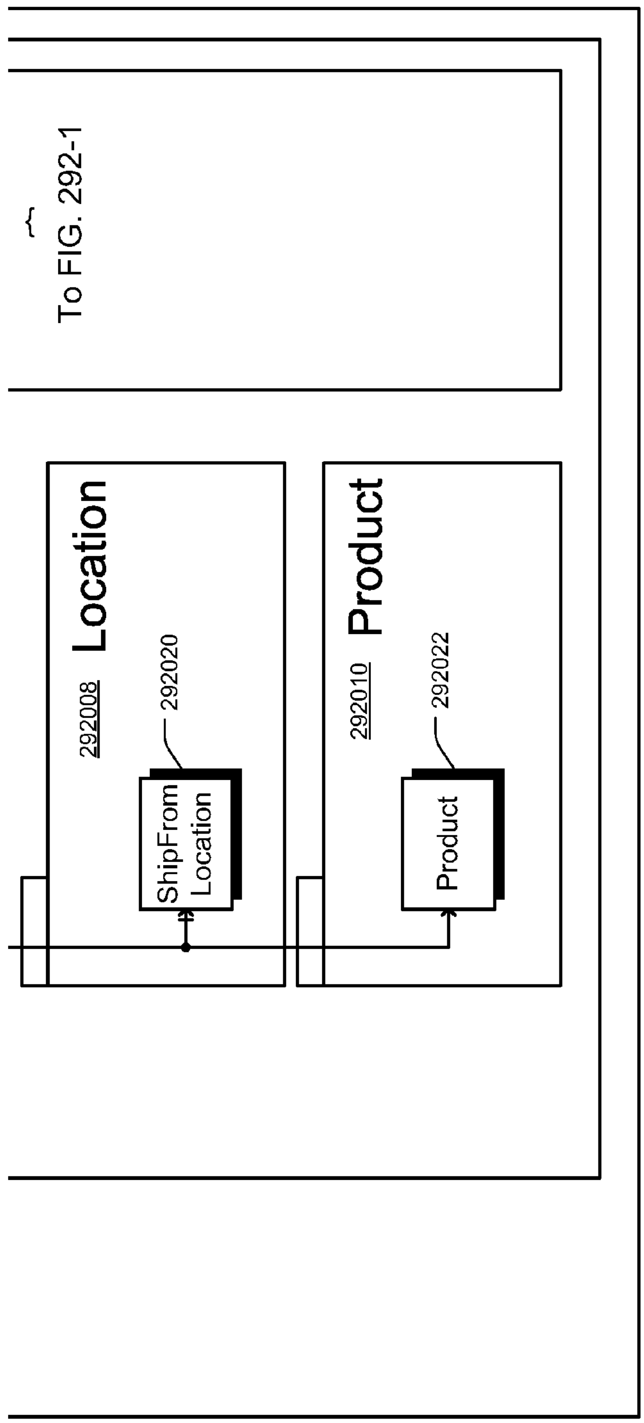
Figures 1, 294:
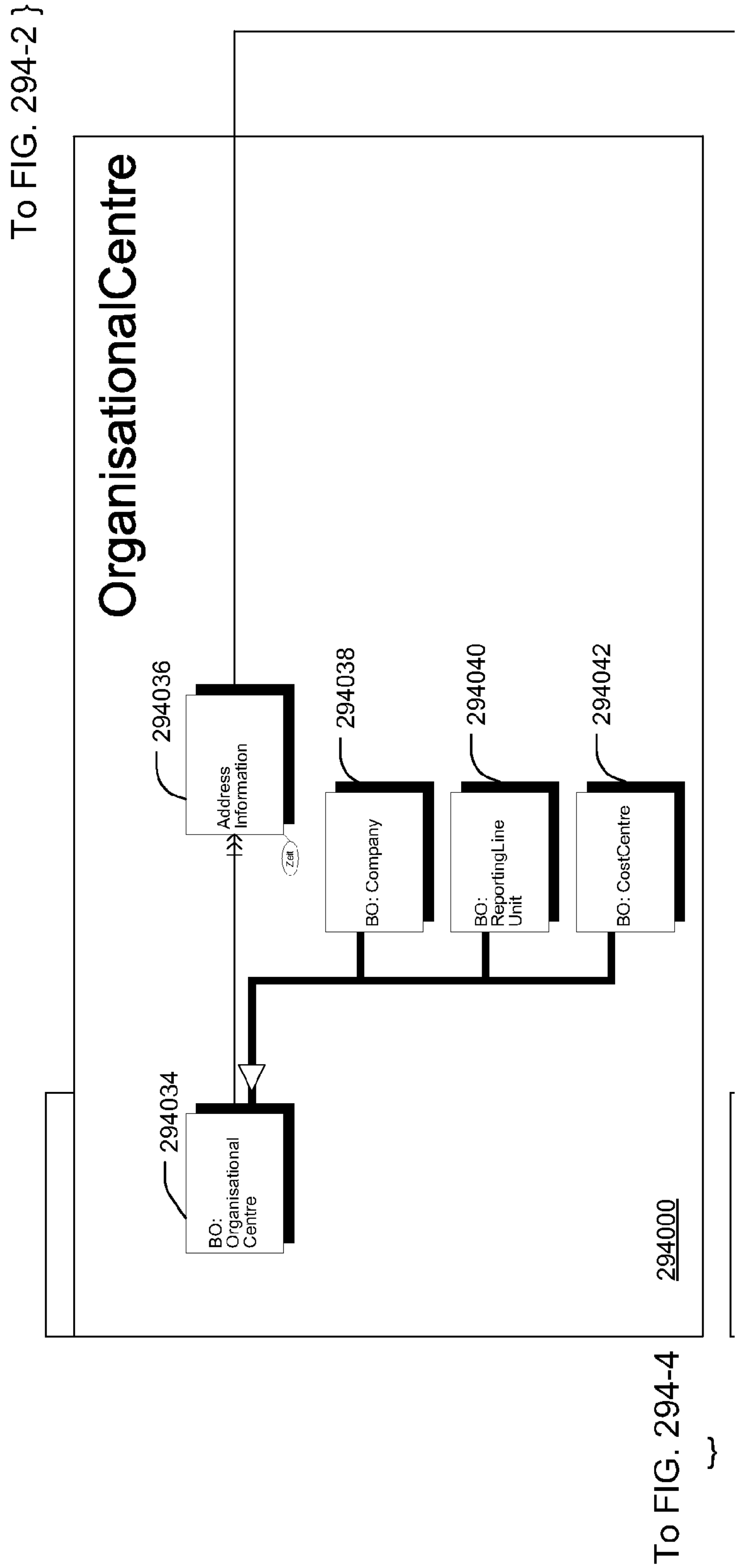
Figures 2, 294:
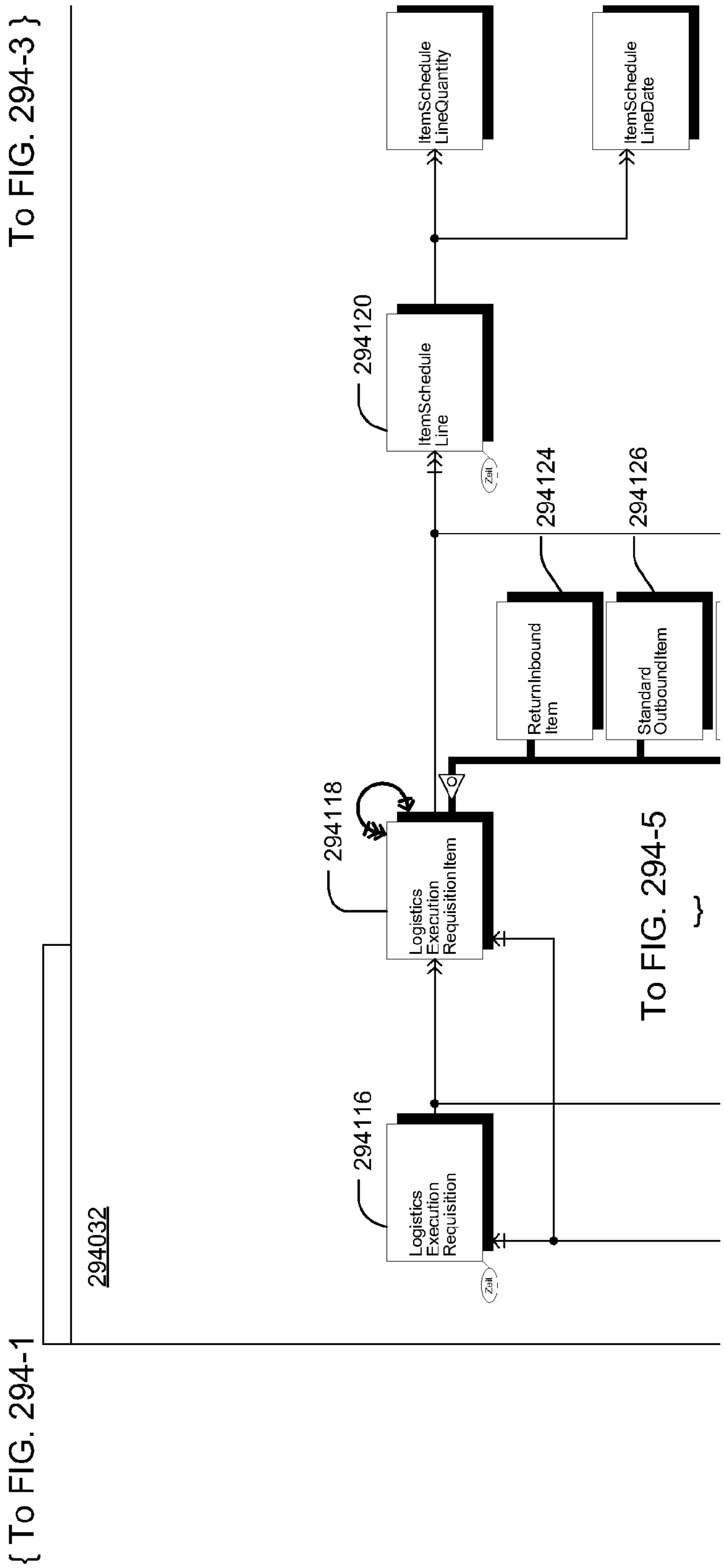
Figures 3, 294:
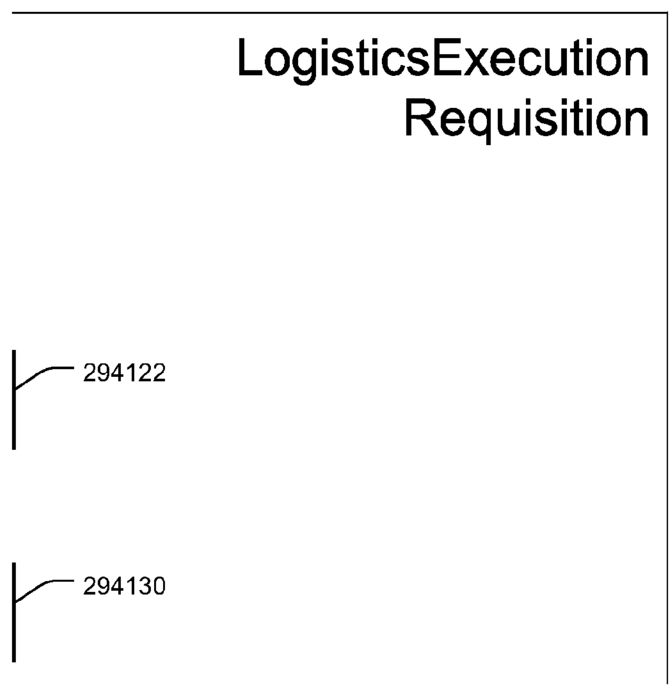
Figures 4, 294:
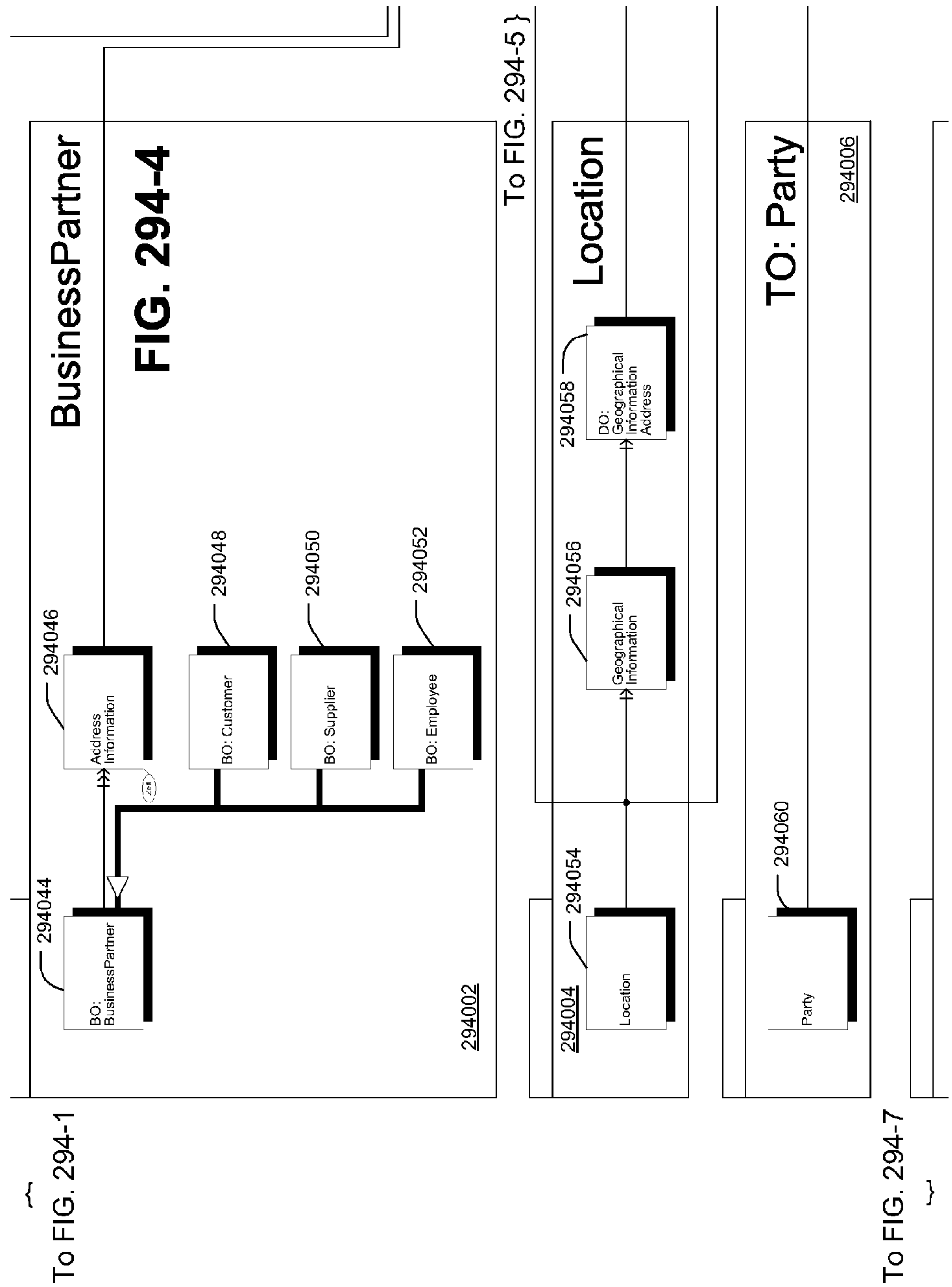
Figures 5, 294:
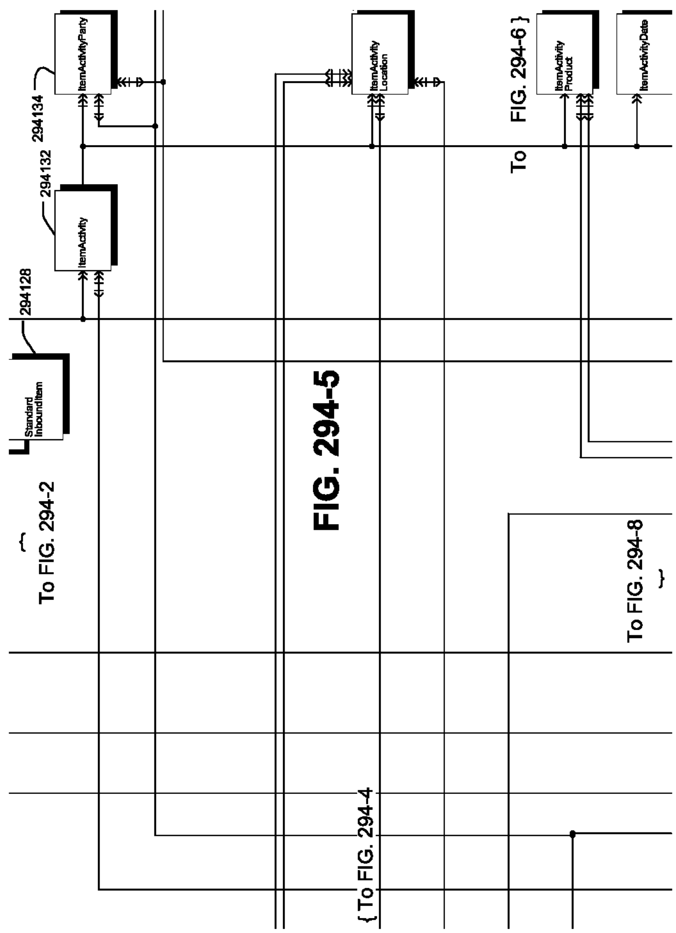
Figures 6, 294:
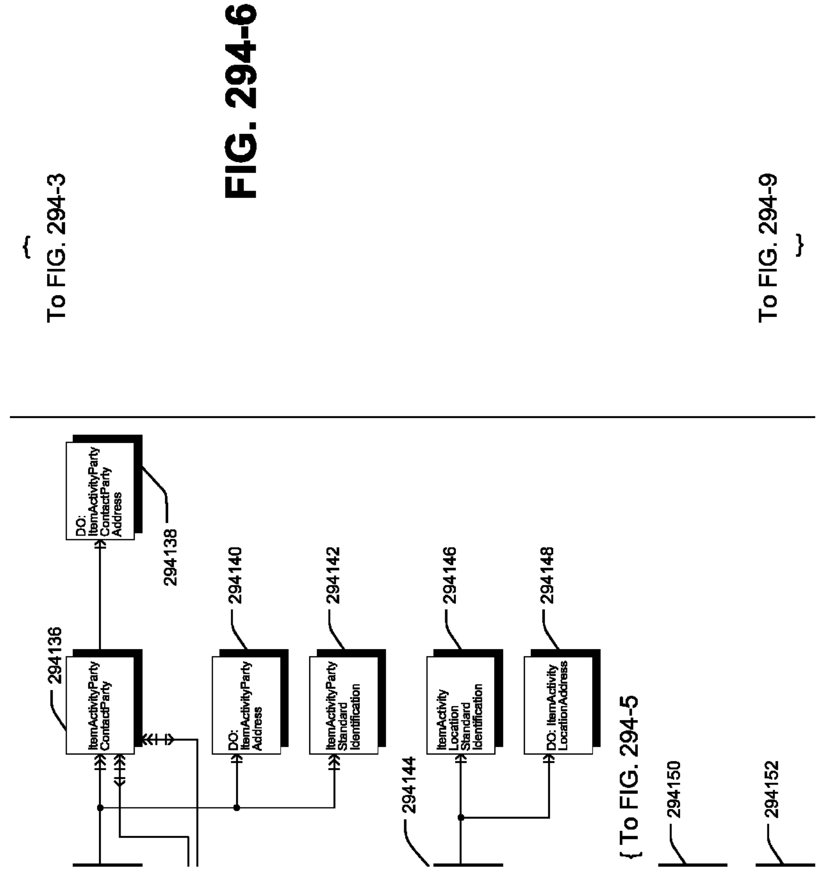
Figures 7, 294:
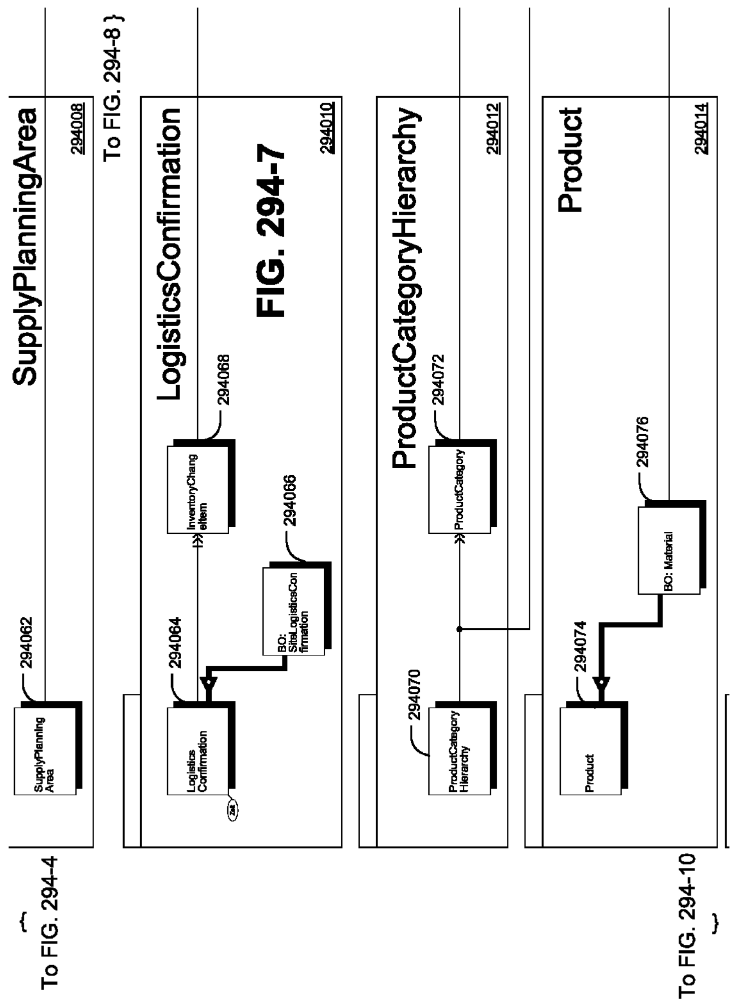
Figures 8, 294:
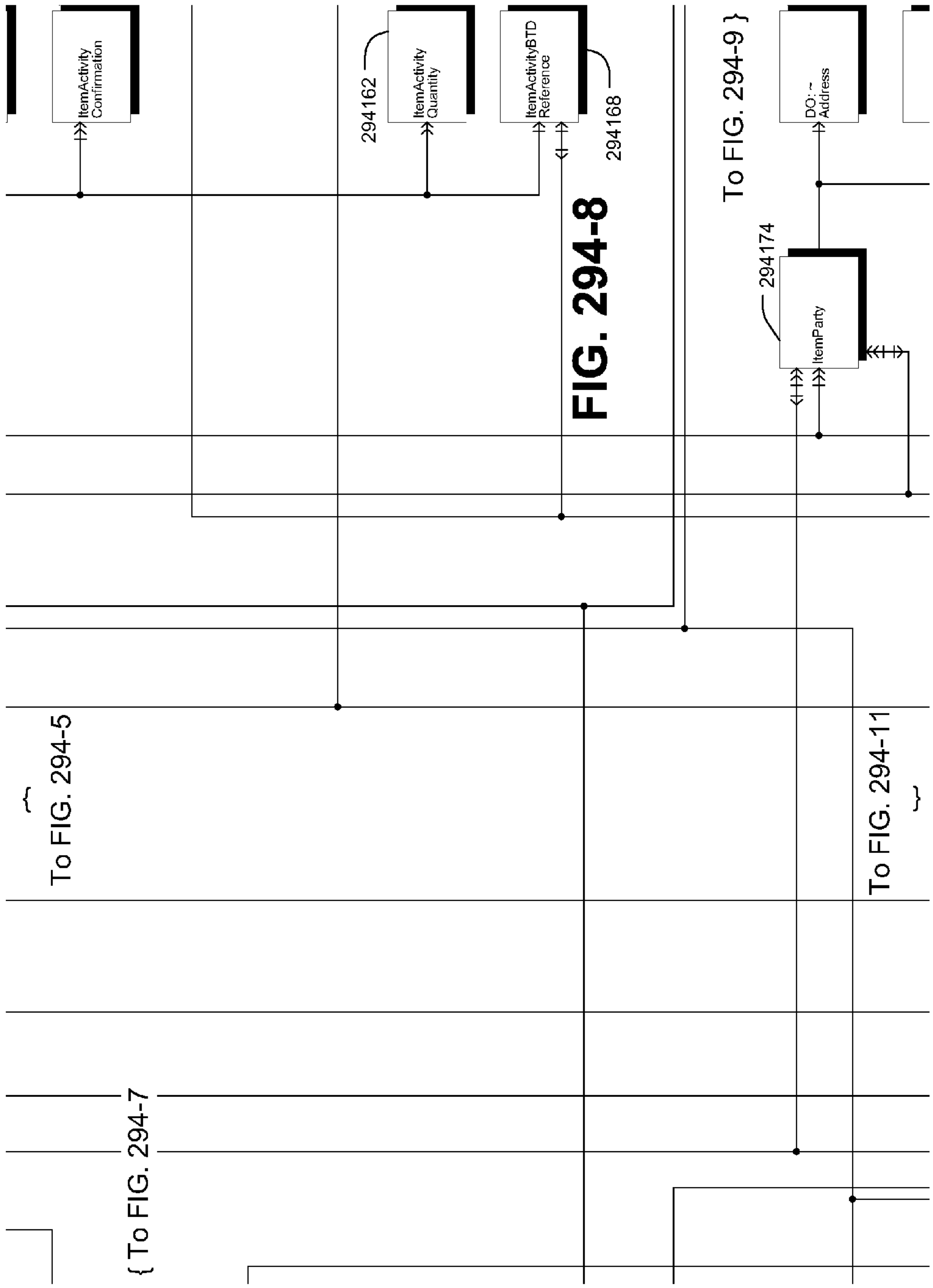
Figures 9, 294:
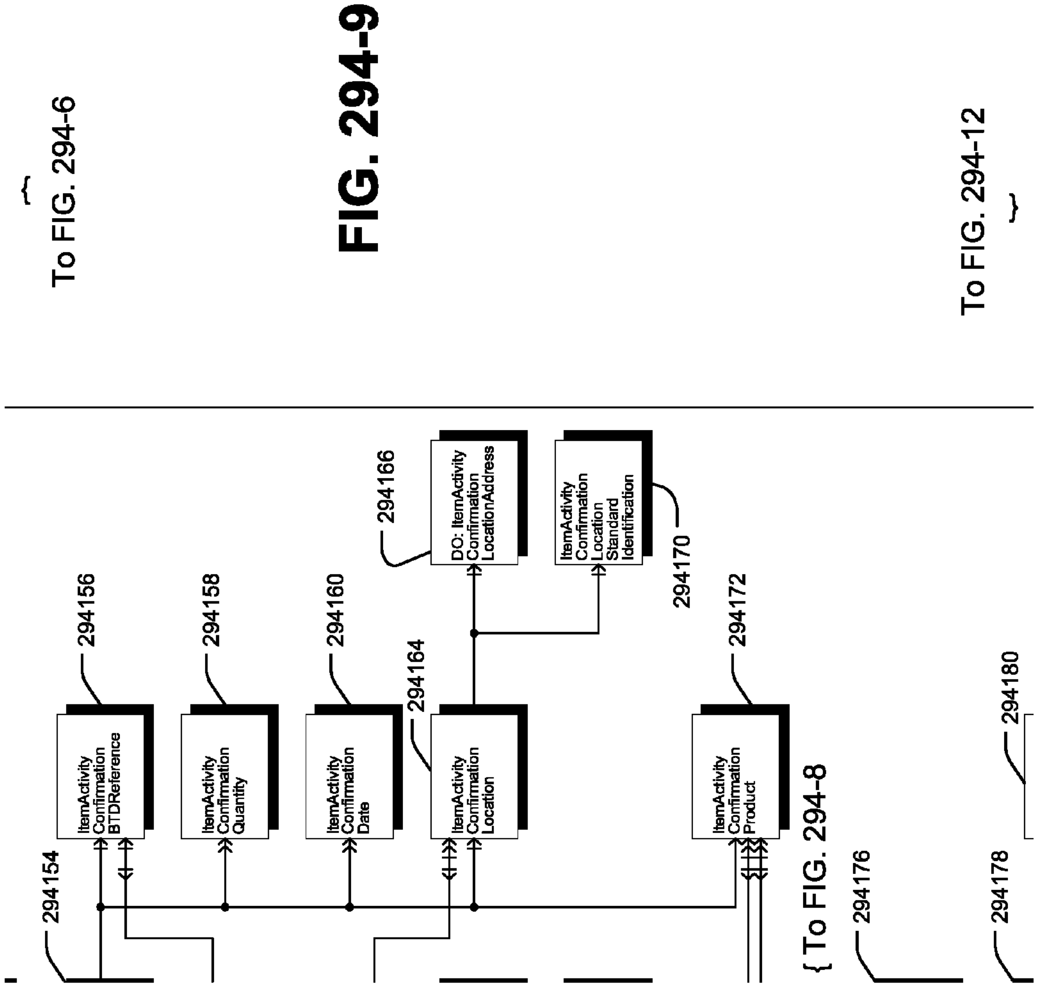
Figures 10, 294:
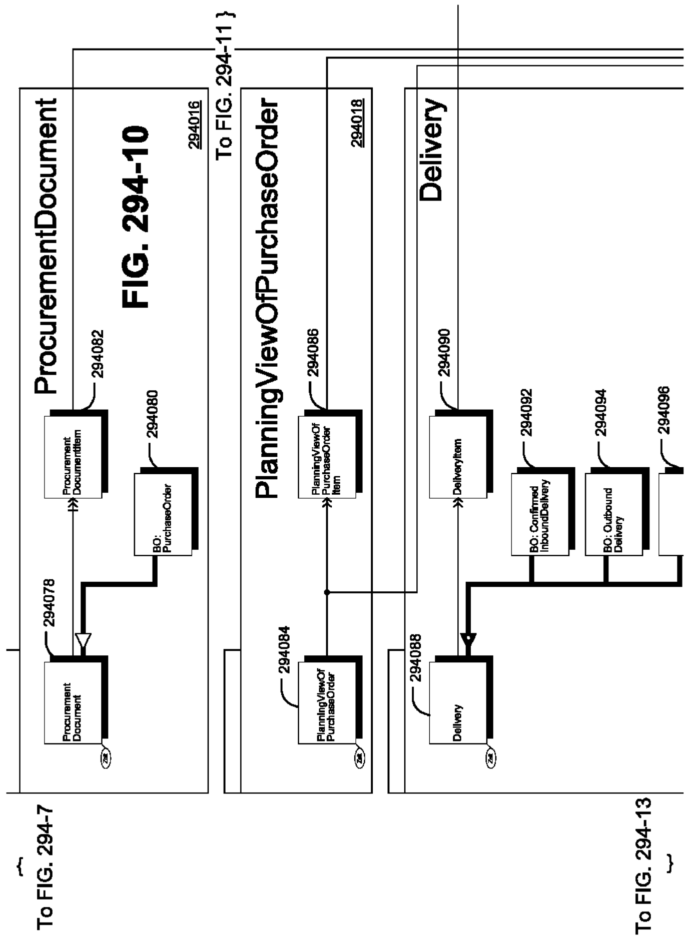
Figures 11, 294:
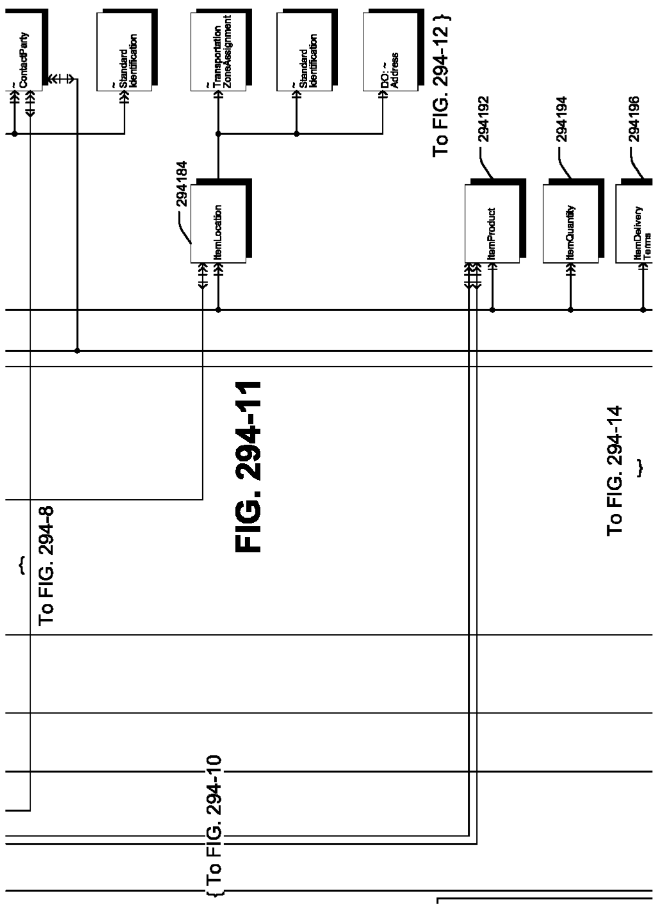
Figures 12, 294:
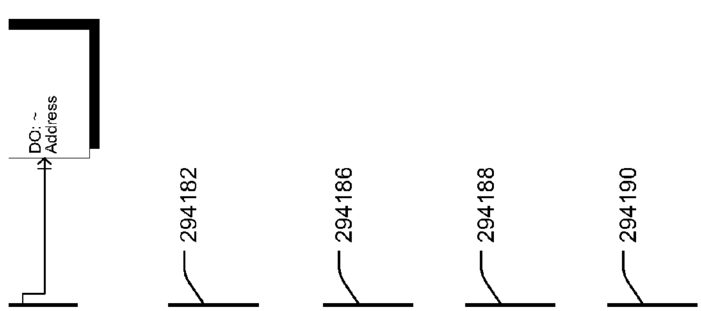
Figures 13, 294:
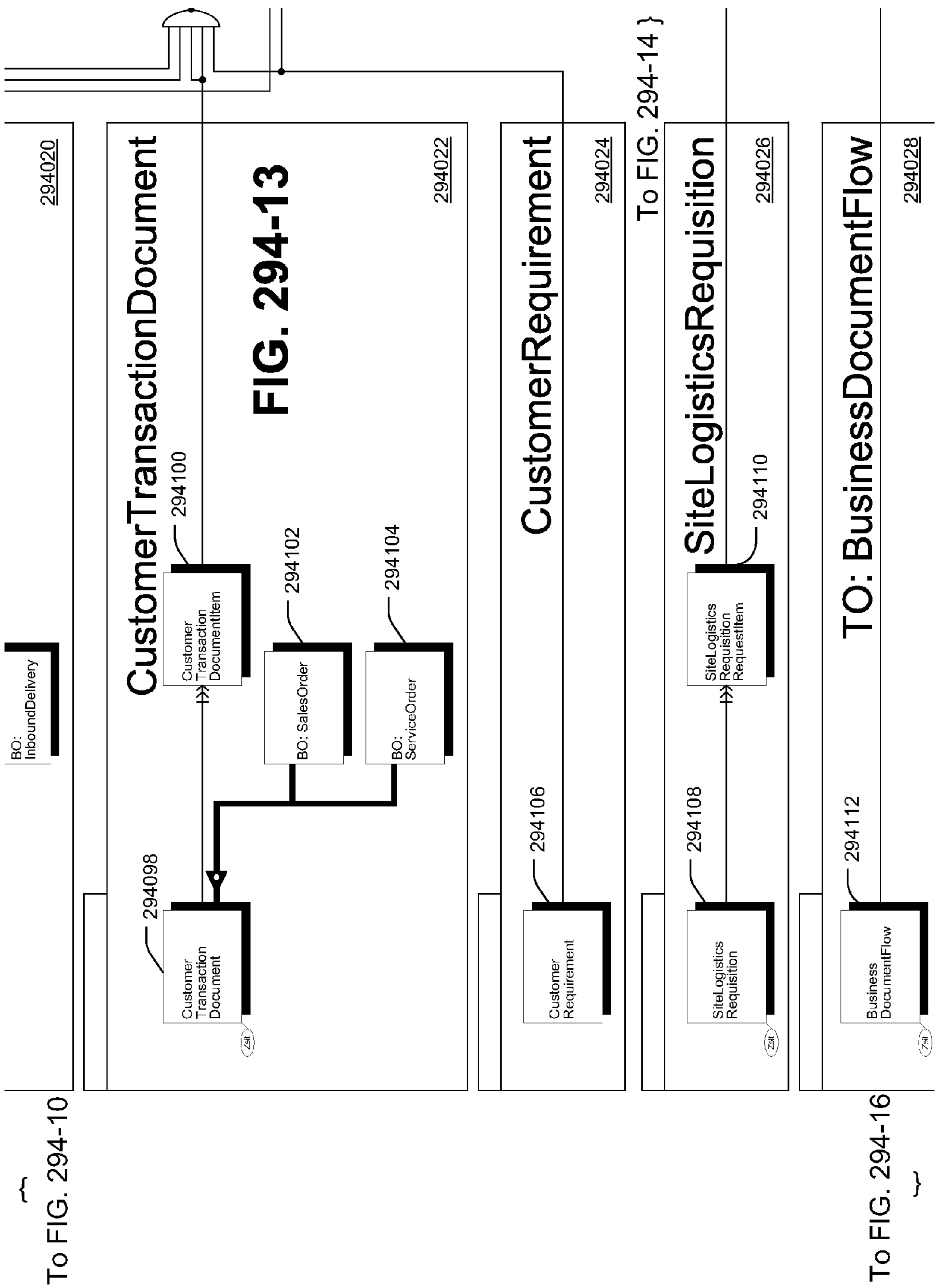
Figures 14, 294:
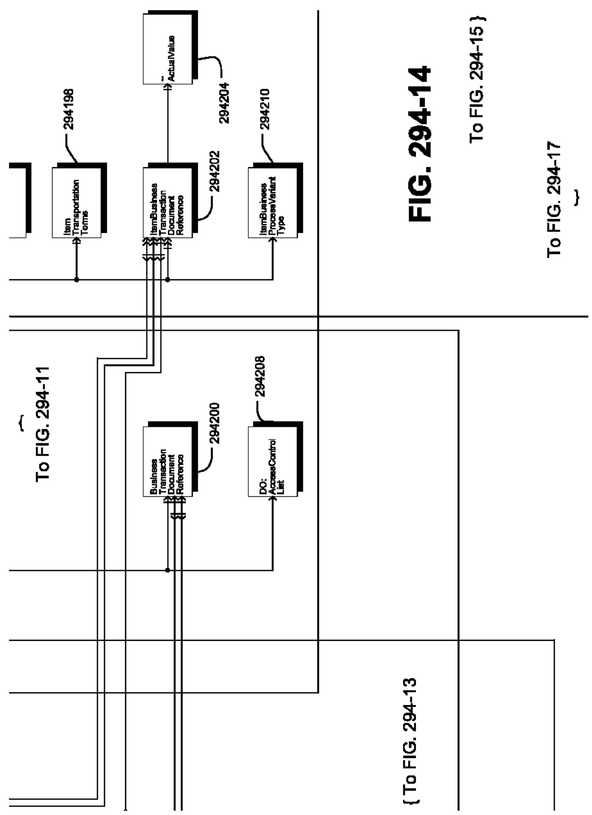
Figures 15, 294:
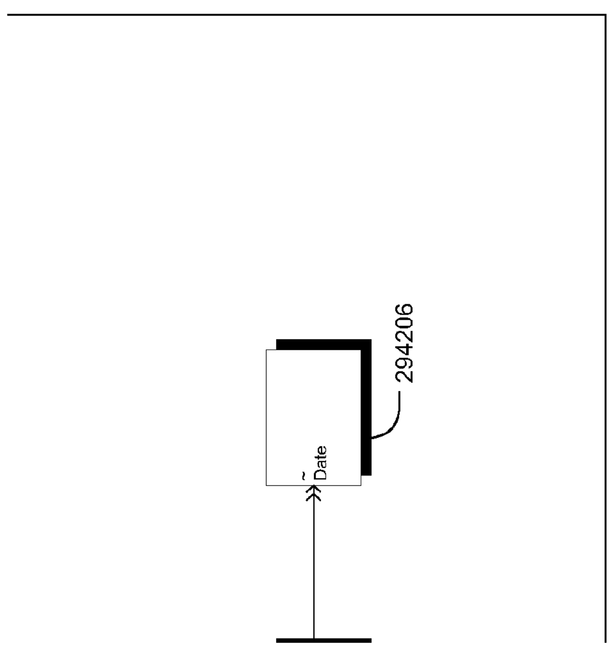
Figures 16, 294:
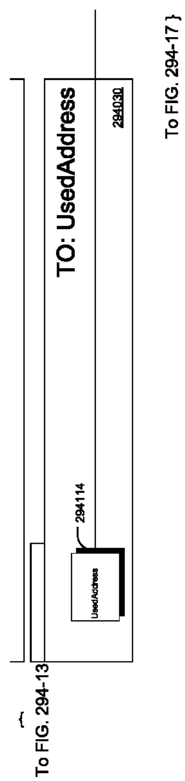
Figure 295:
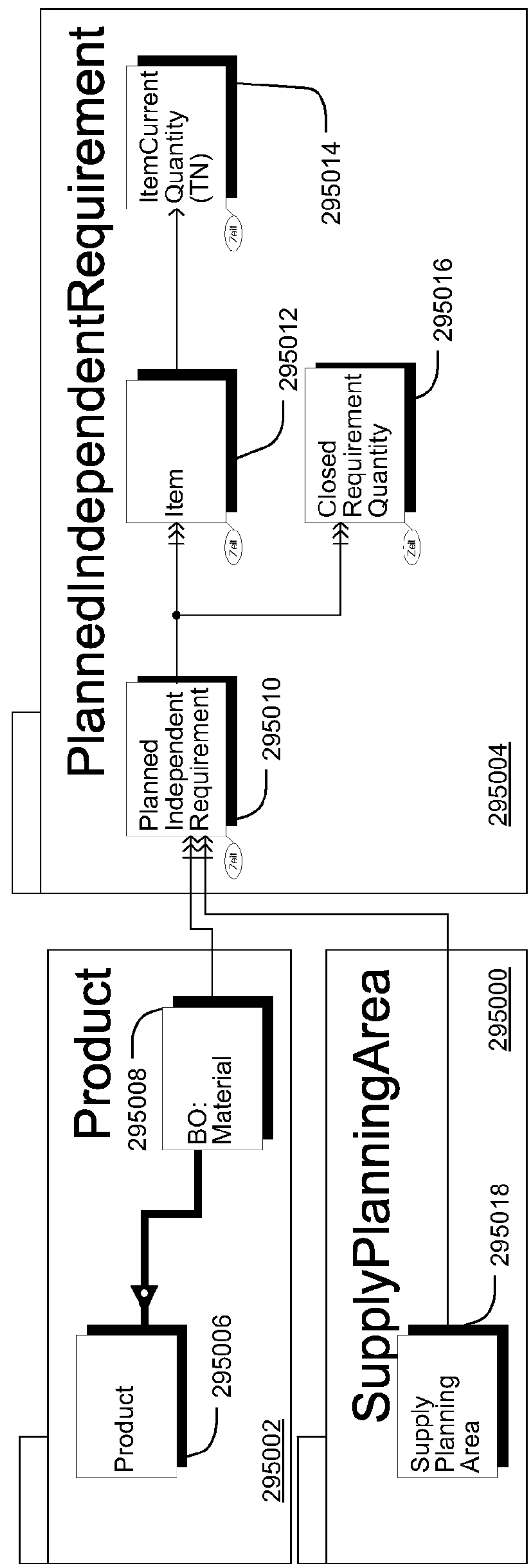
Figures 1, 296:
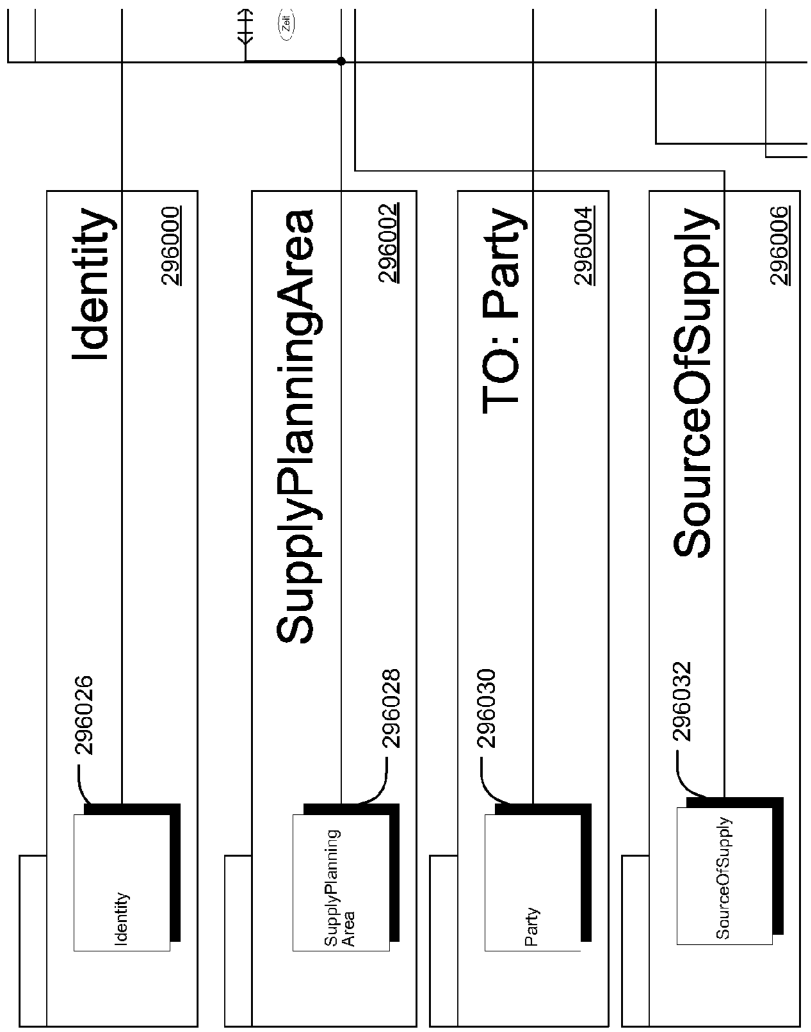
Figures 2, 296:
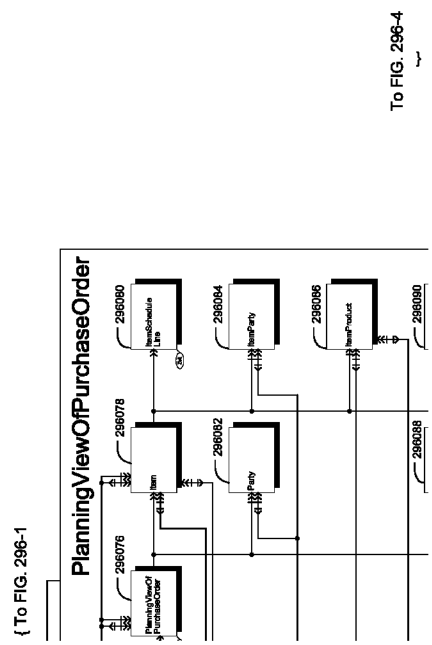
Figures 3, 296:
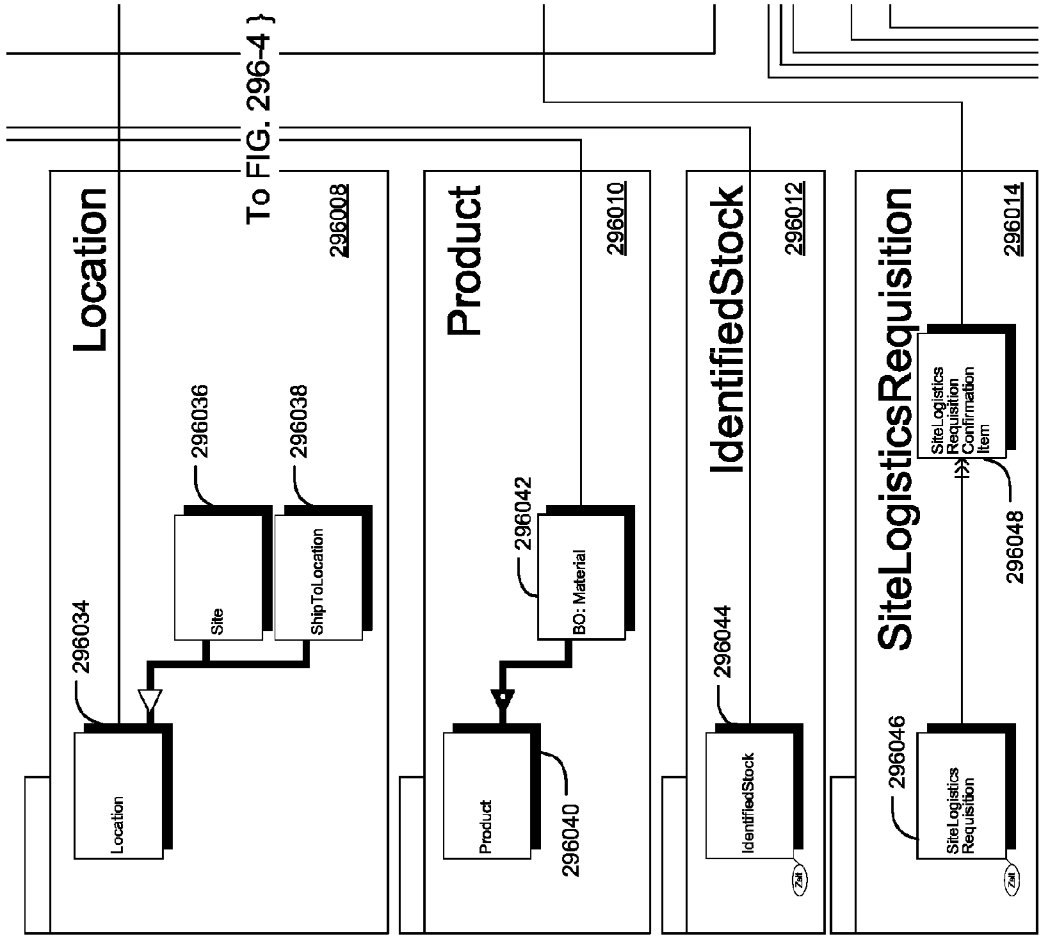
Figures 4, 296:
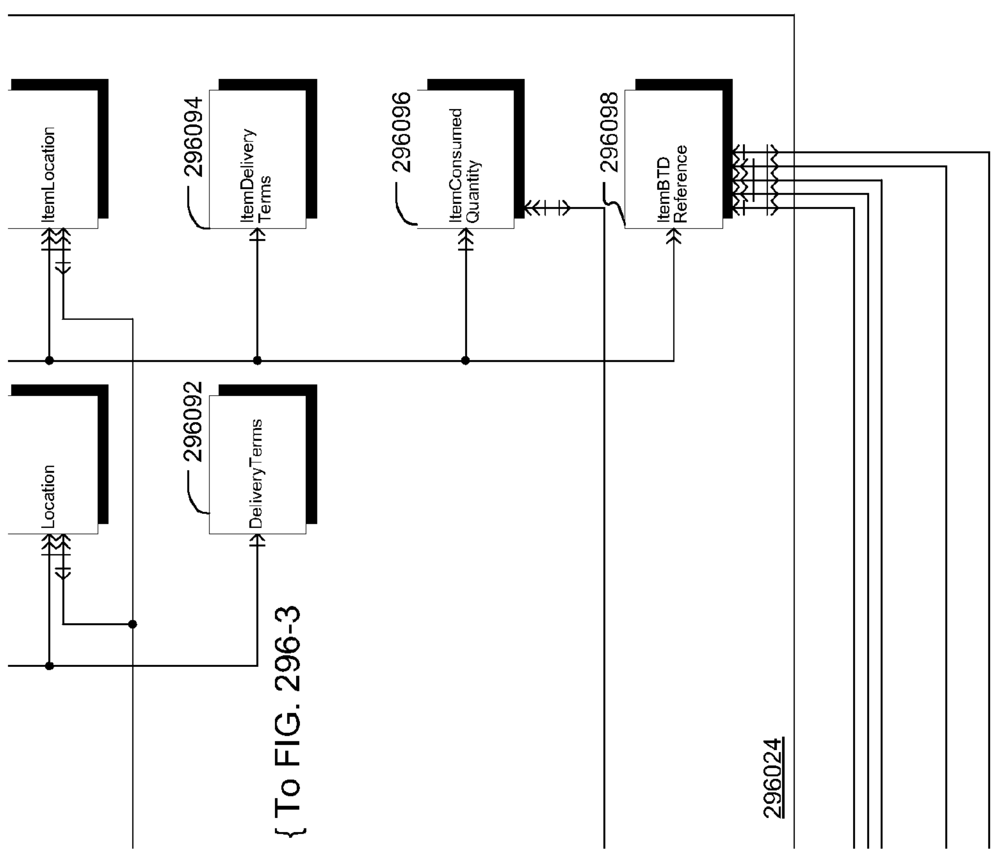
Figures 5, 296:
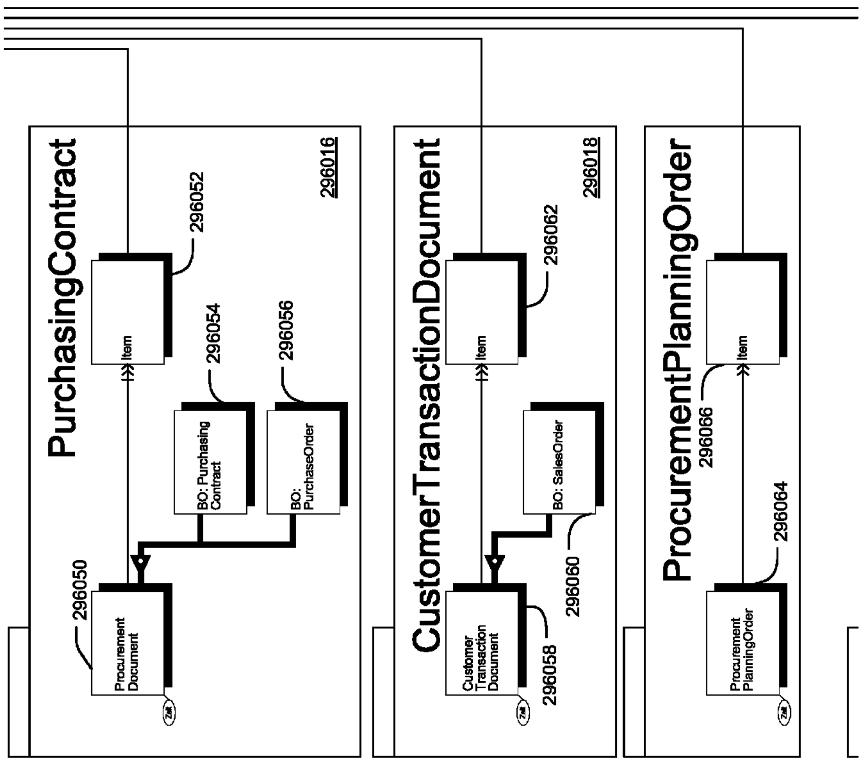
Figures 6, 296:
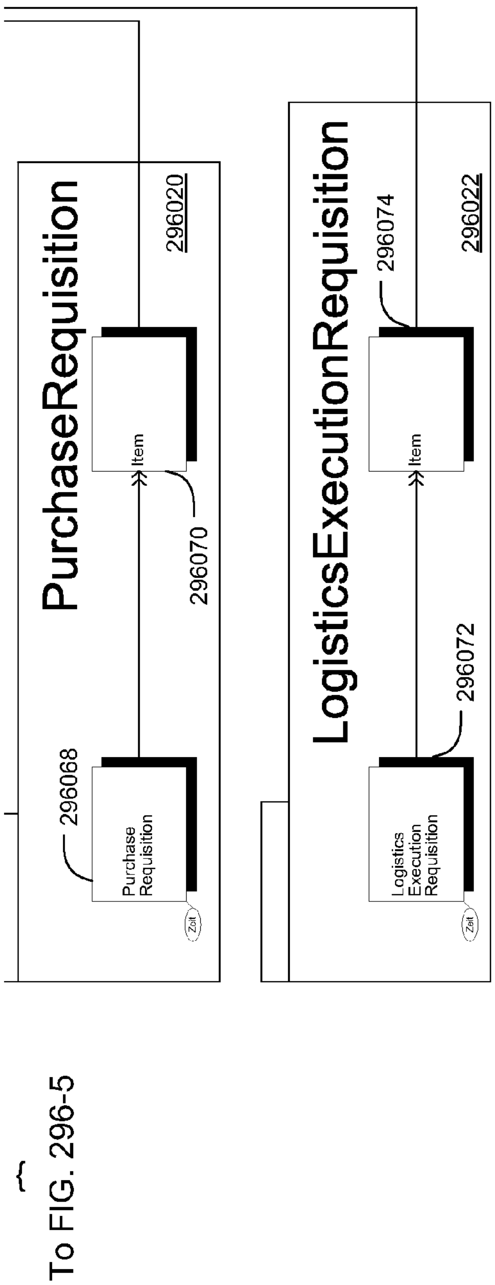
Figure 297:
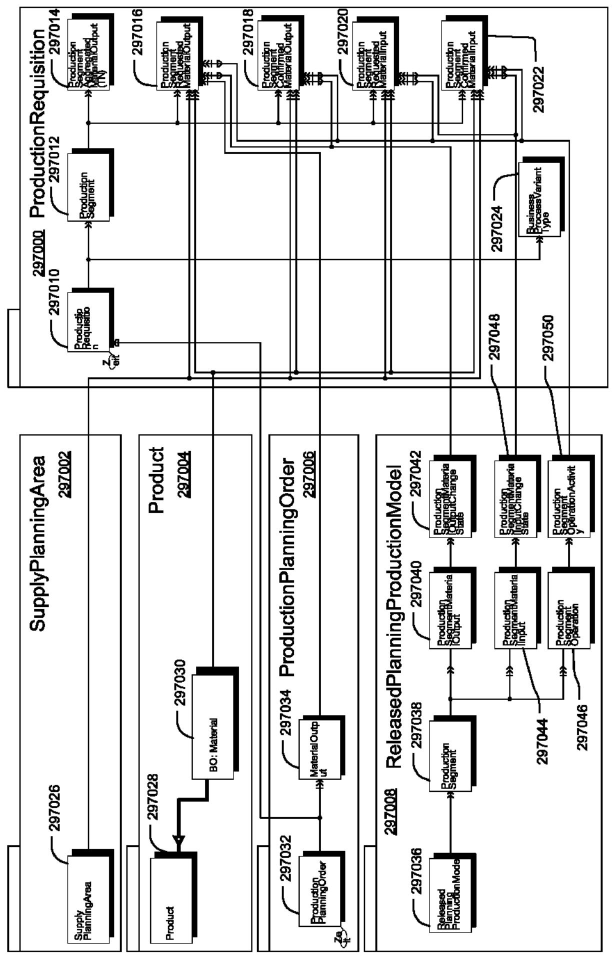
Figures 1, 298:
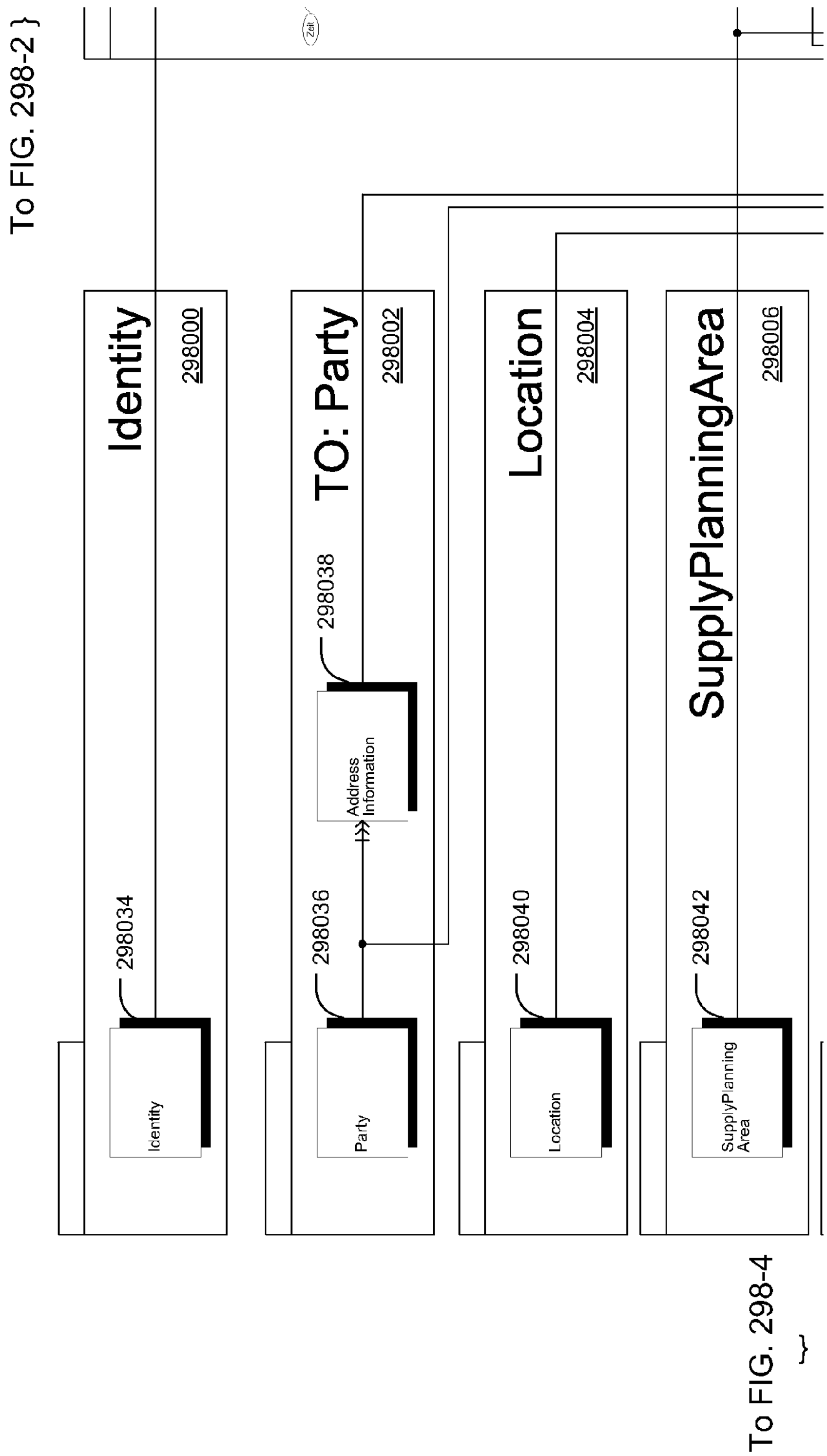
Figures 2, 298:
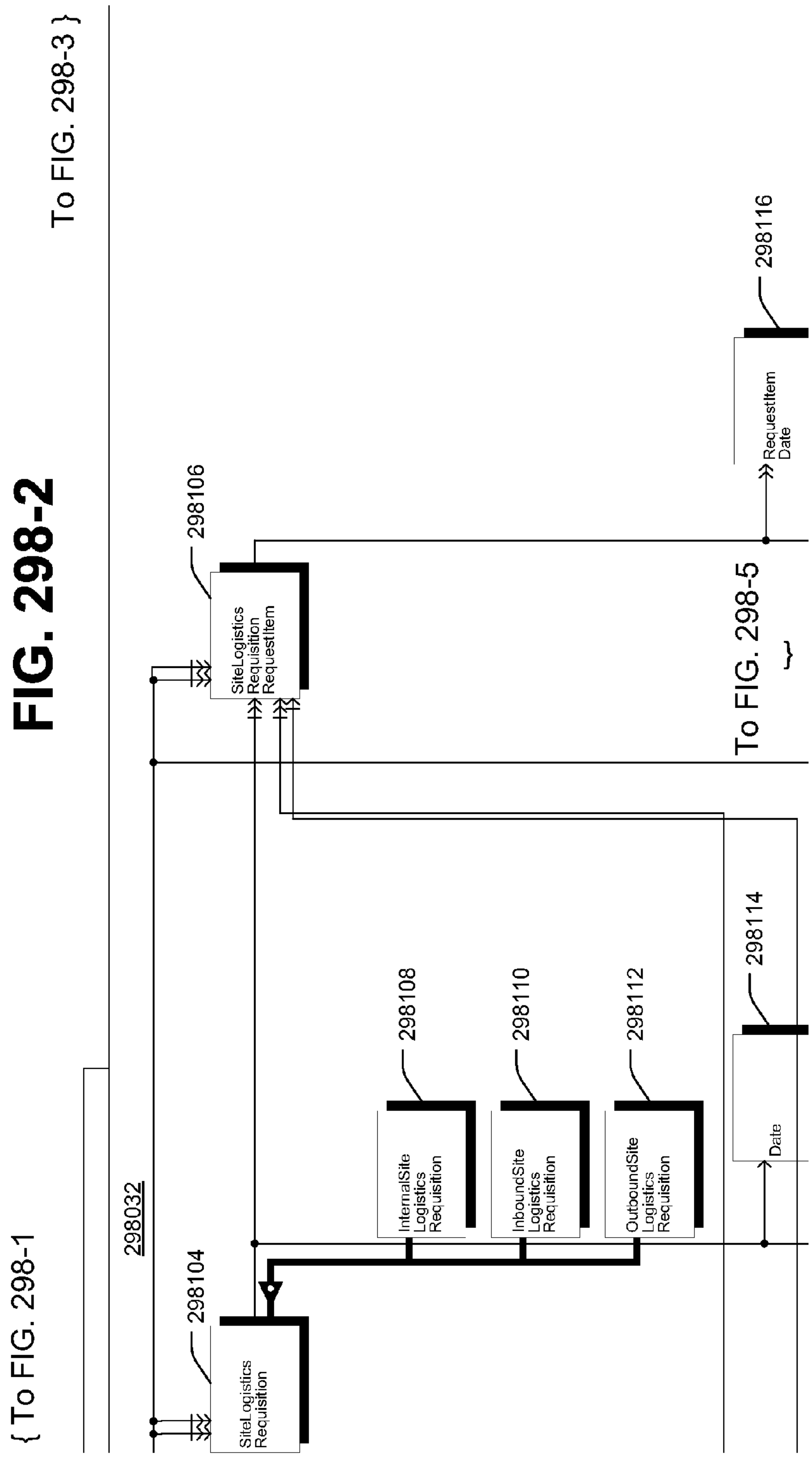
Figures 4, 298:
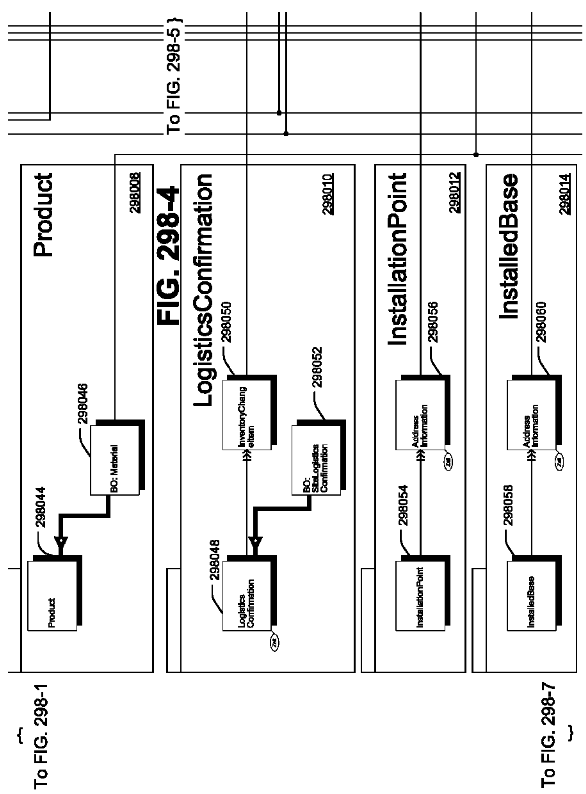
Figures 5, 298:
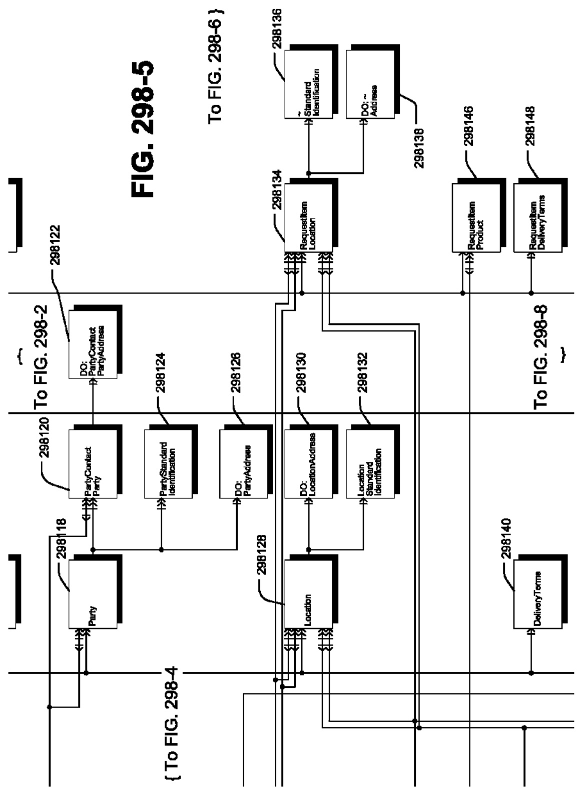
Figures 7, 298:
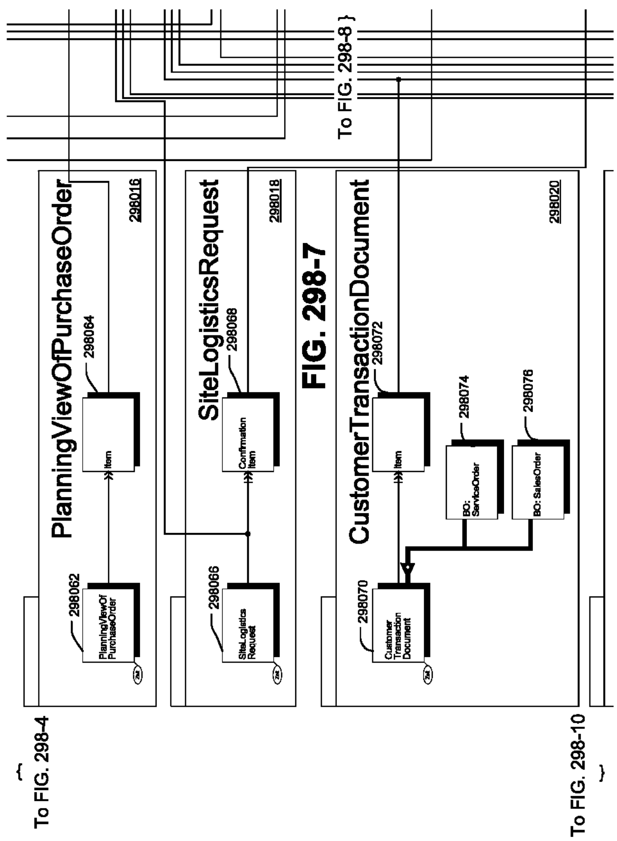
Figures 8, 298:
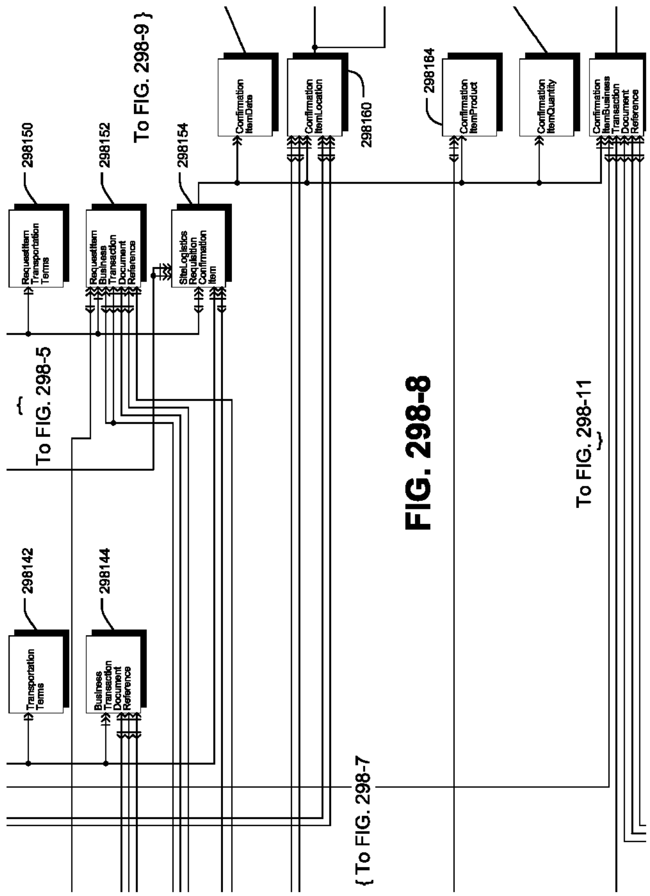
Figures 9, 298:
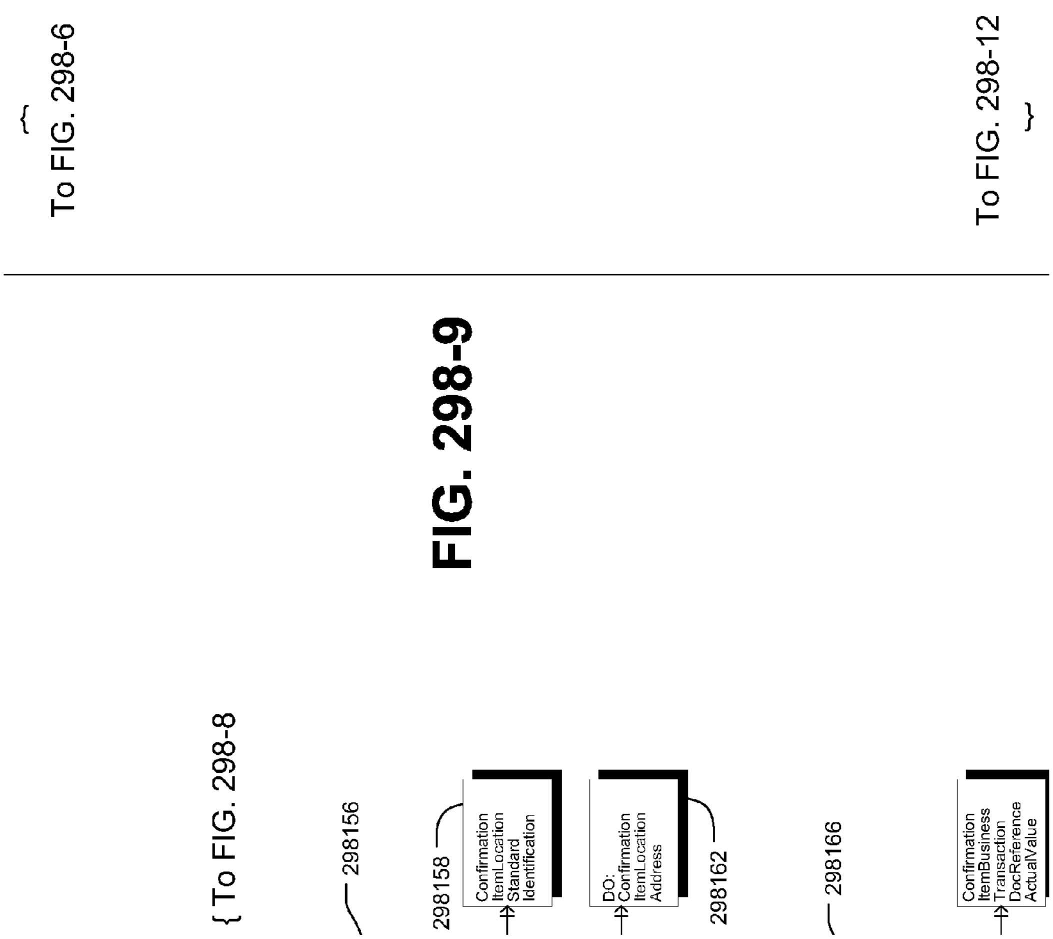
Figures 10, 298:
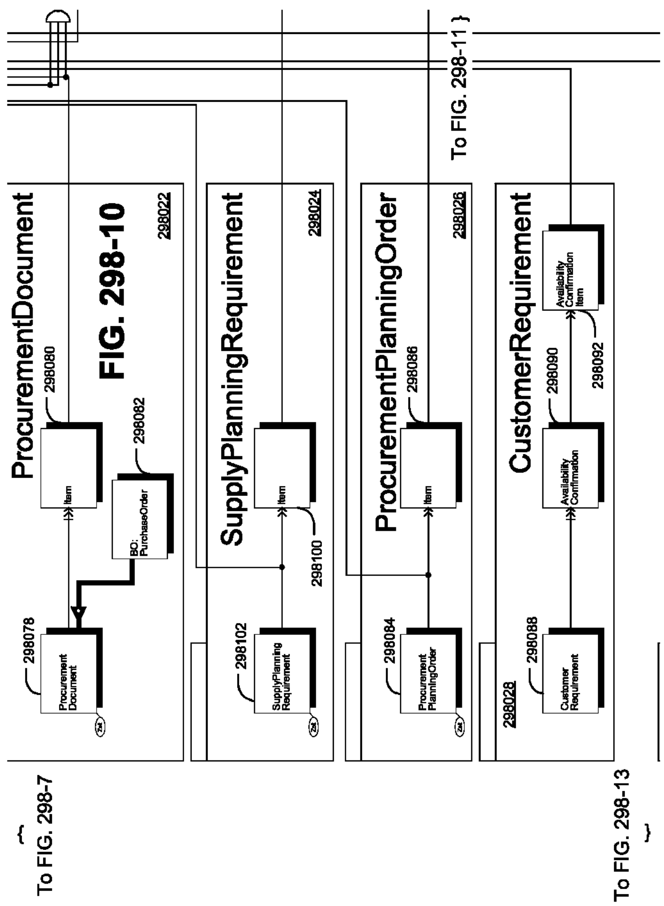
Figures 11, 298:
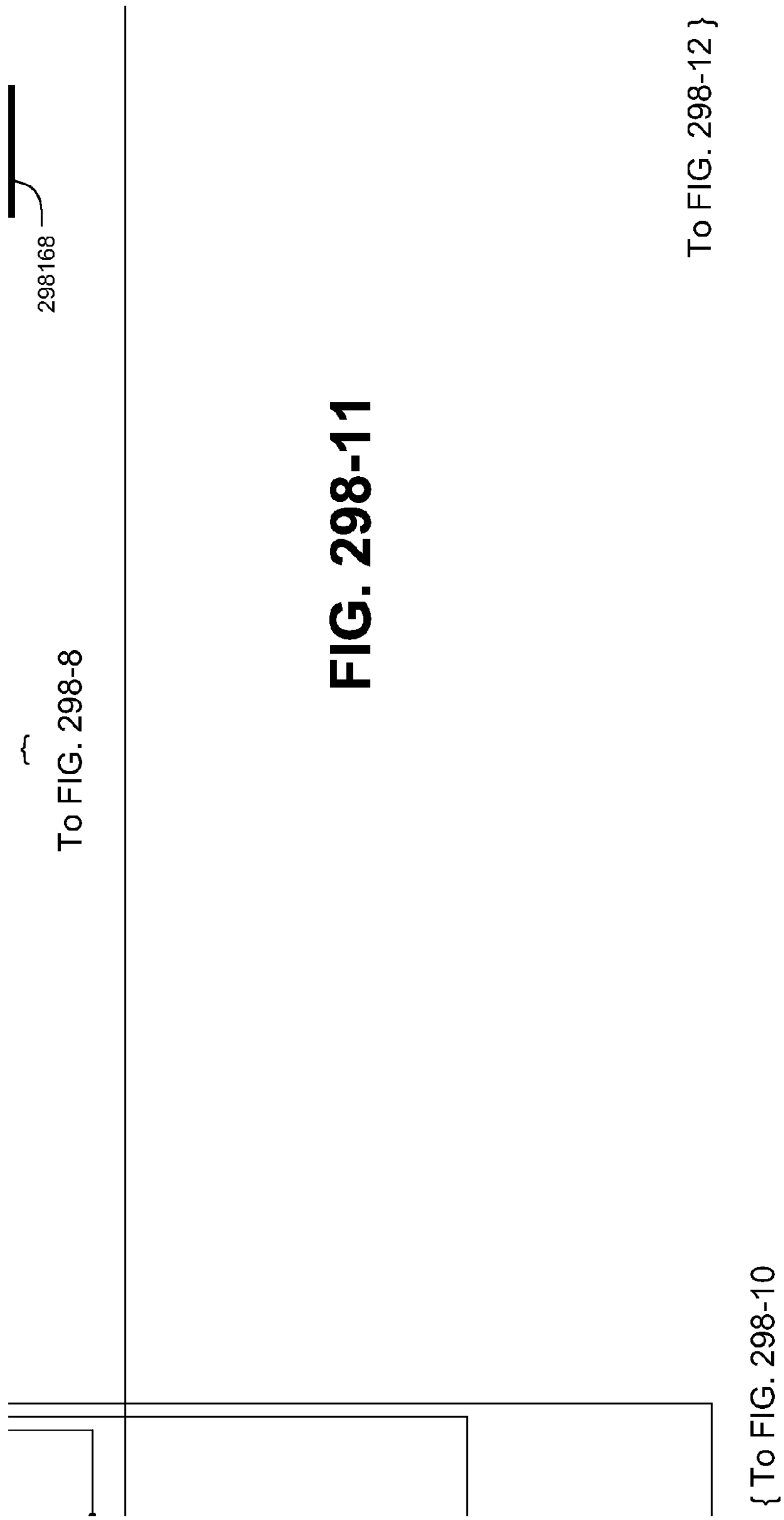
Figures 12, 298:
Figures 13, 298:
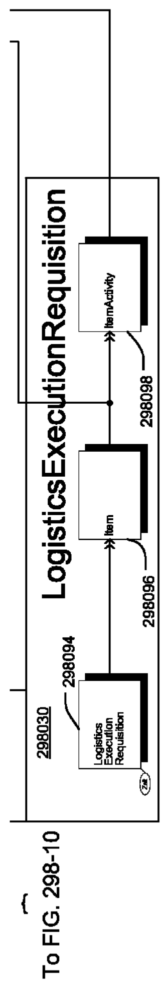
Figure 299:
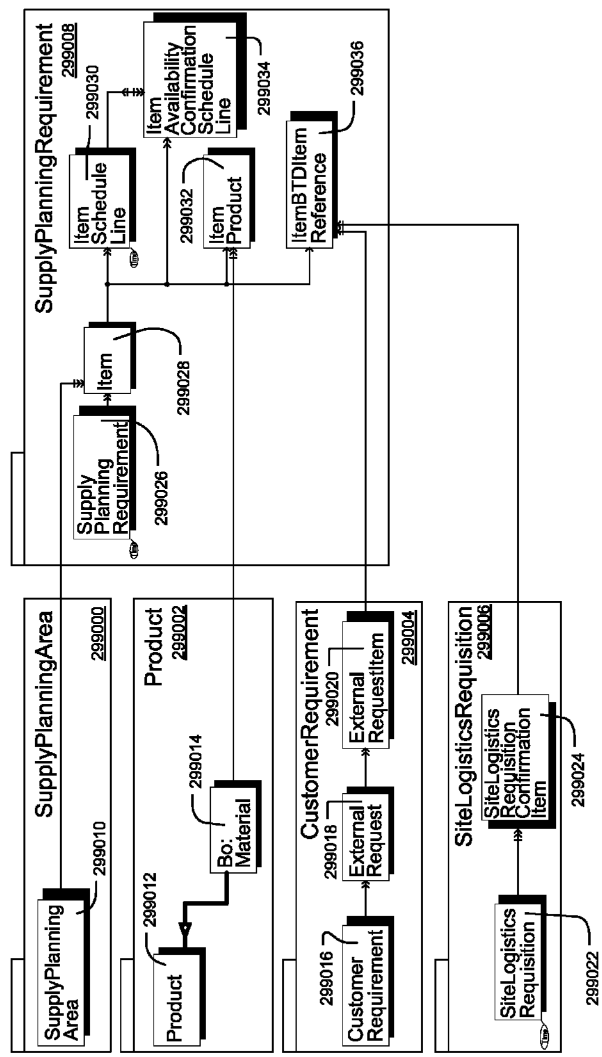
Figures 1, 300:
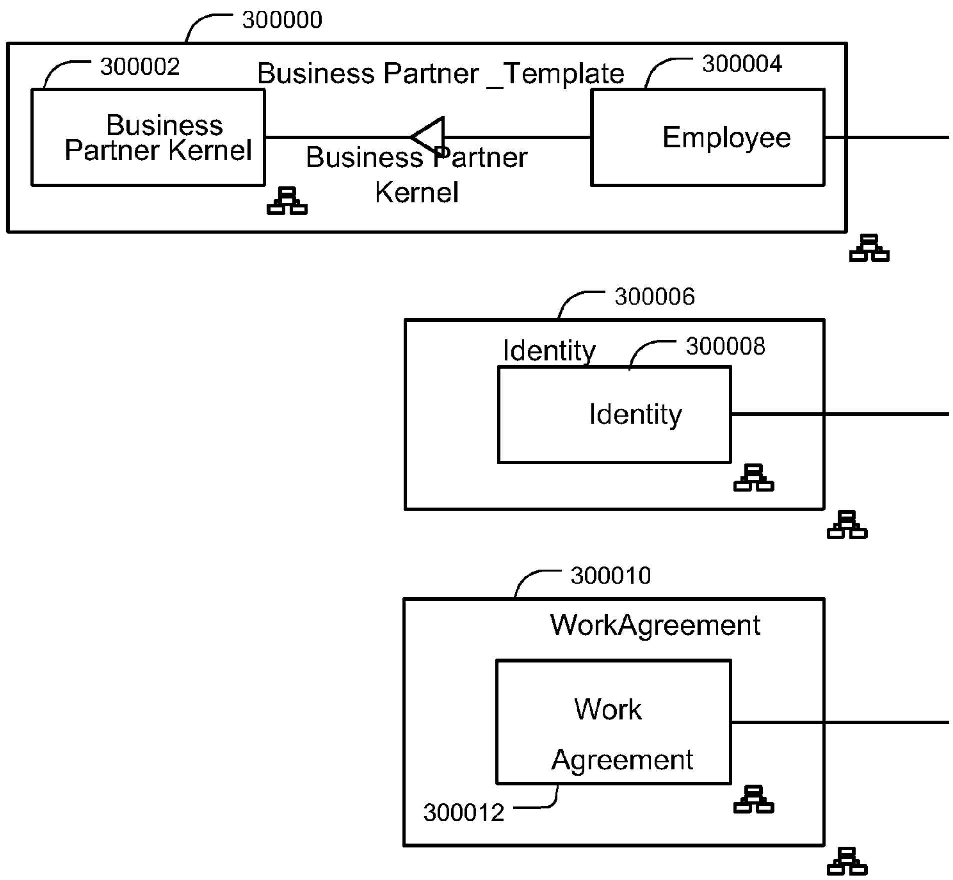
Figures 2, 300:
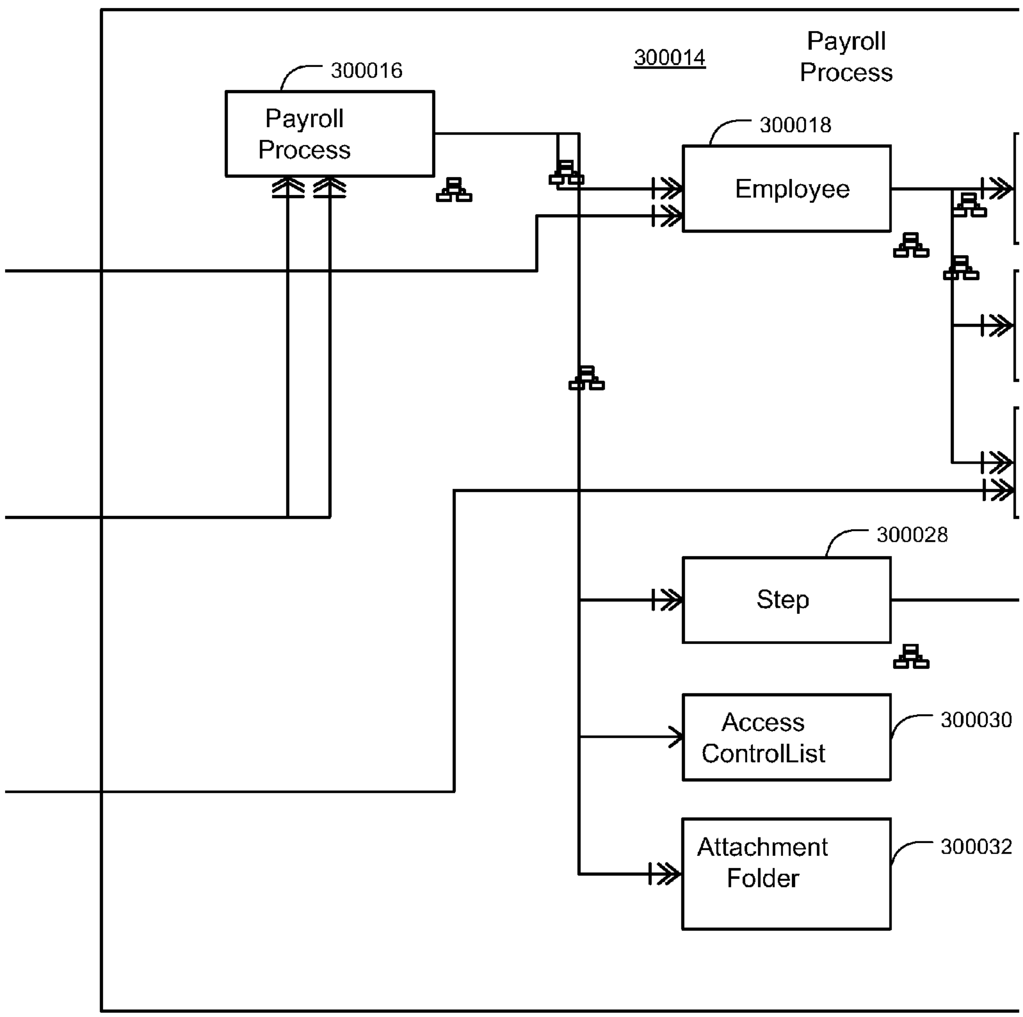
Figures 3, 300:
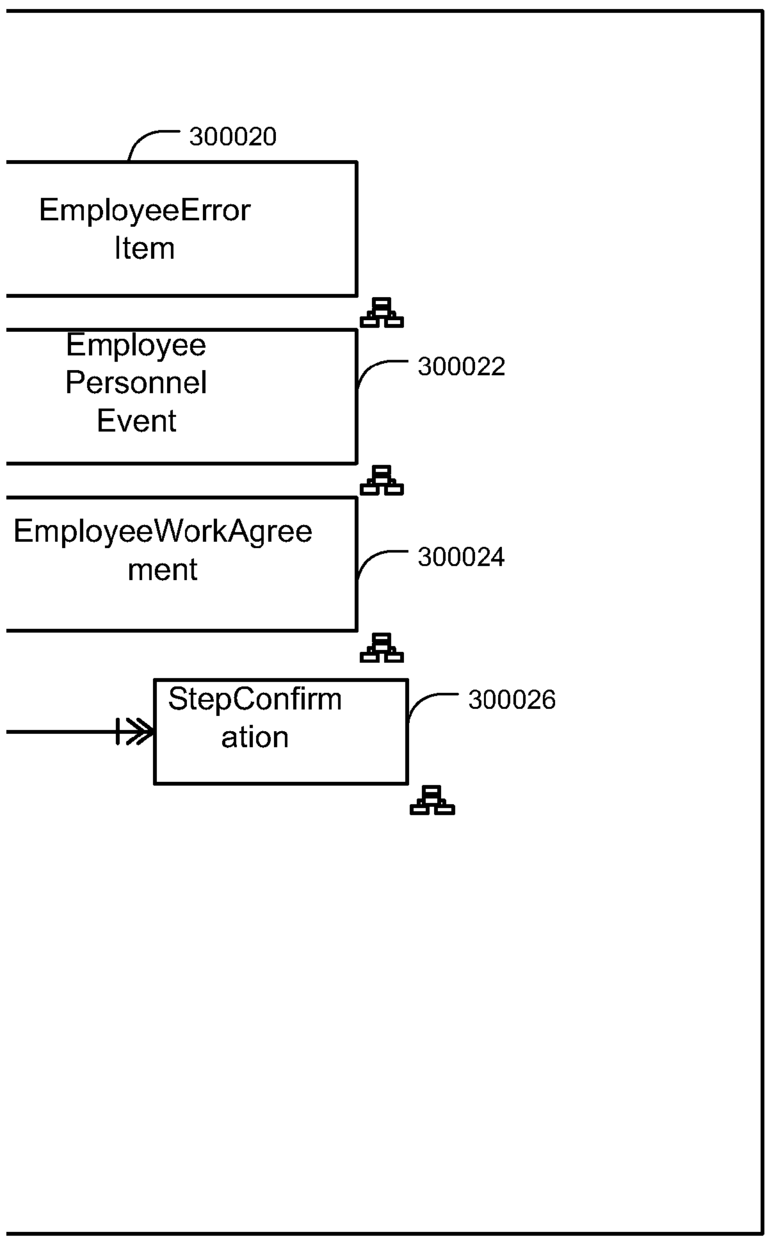
Figure 301:
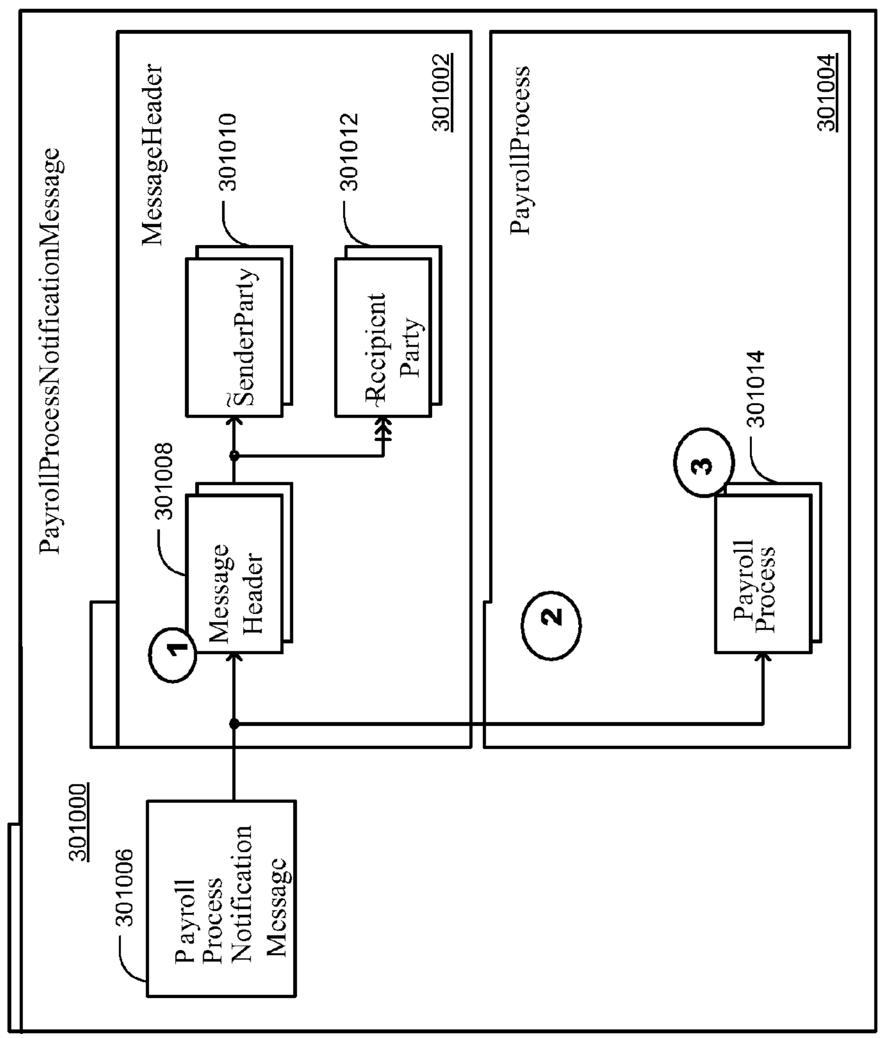
Figure 305:
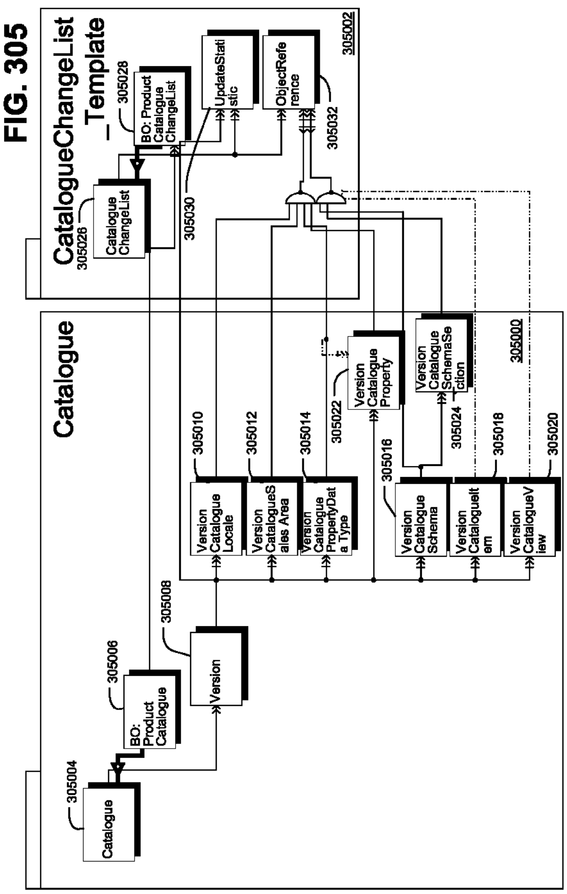
Figures 1, 306:
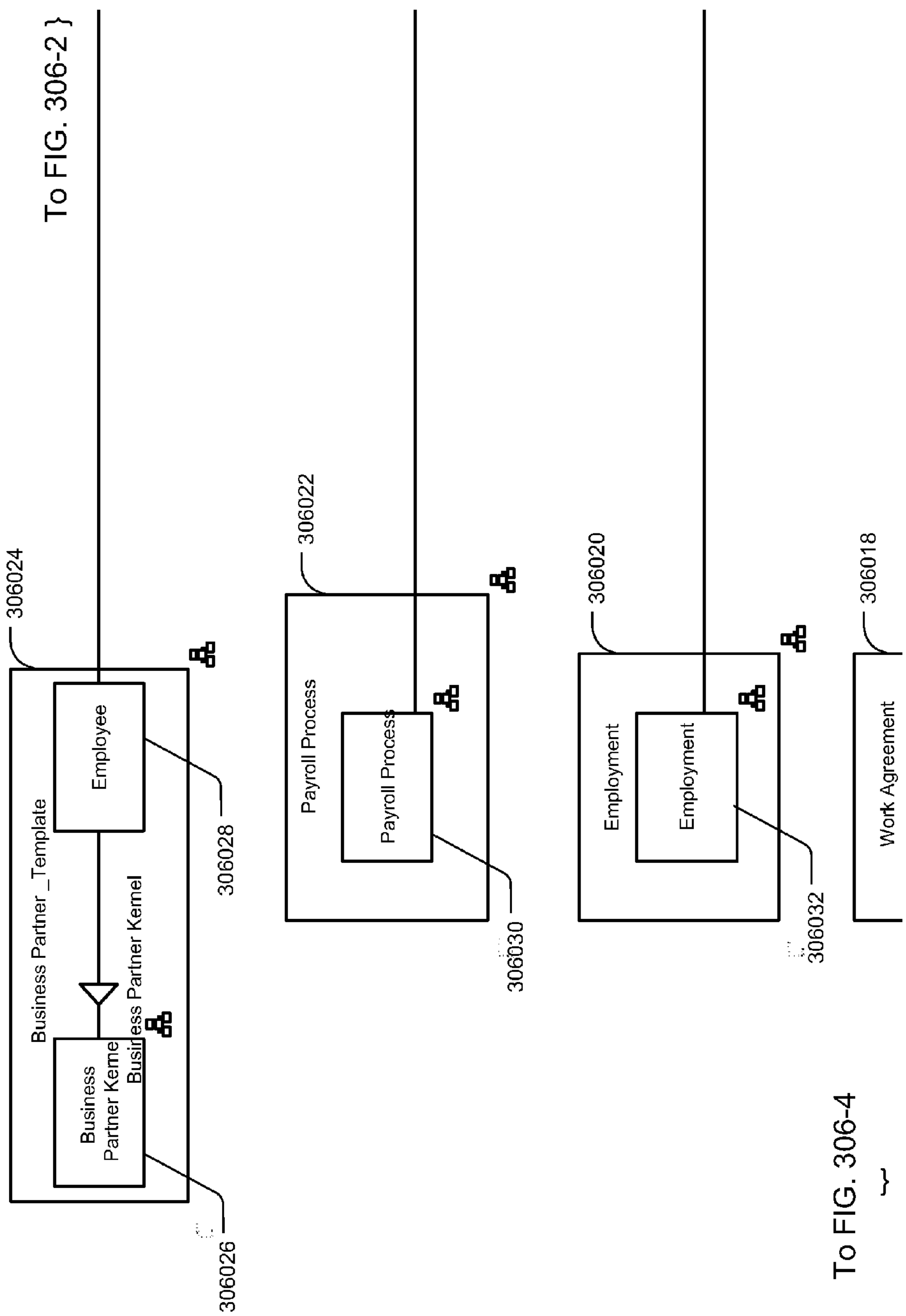
Figures 2, 306:
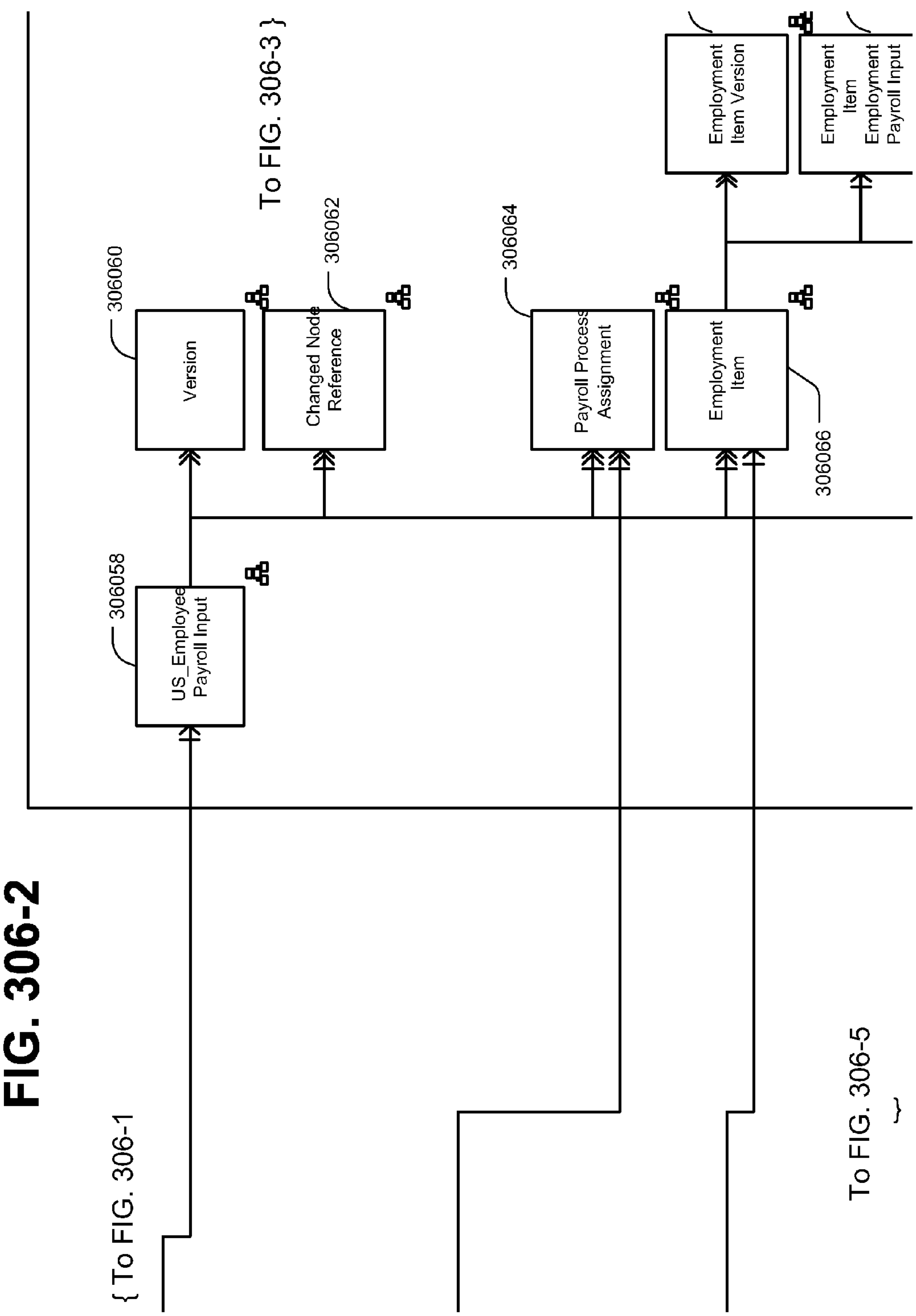
Figures 3, 306:
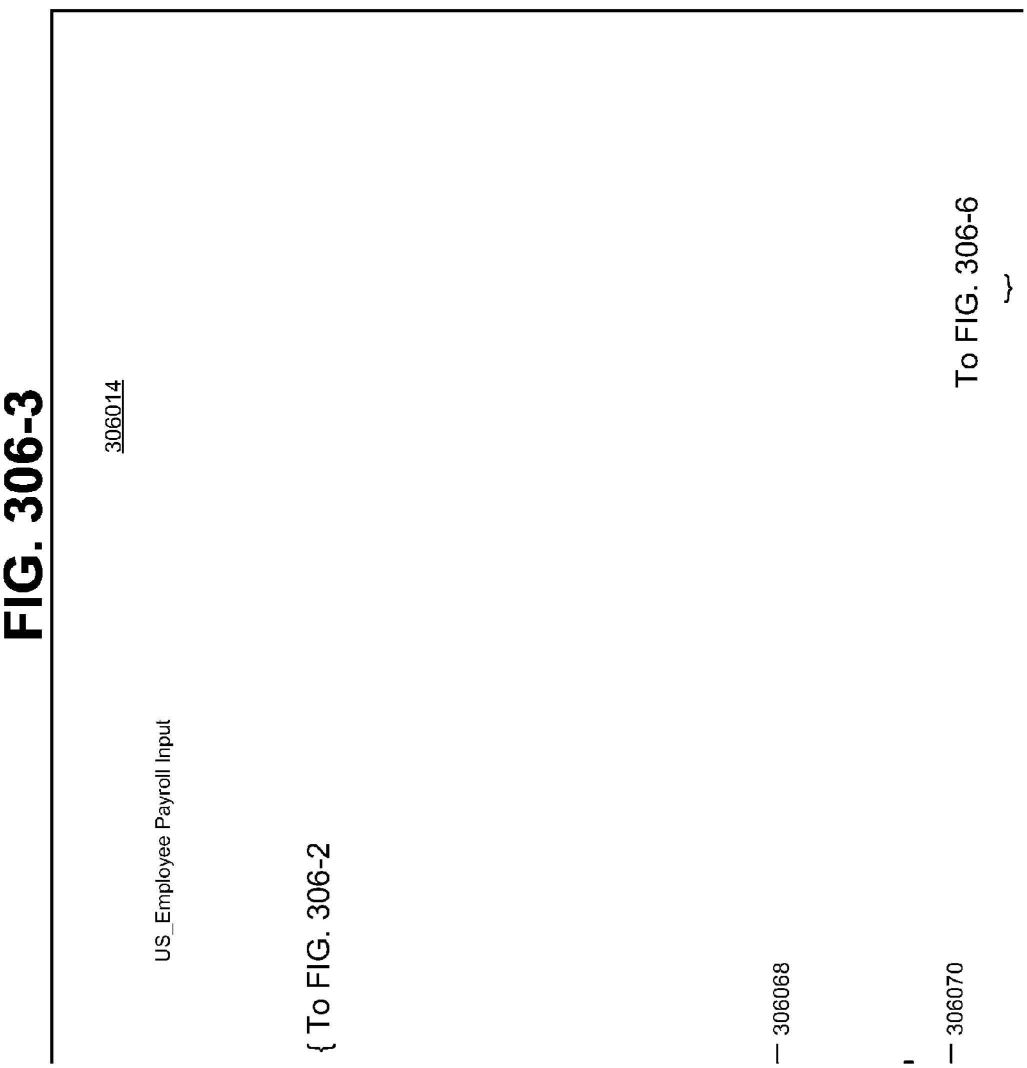
Figures 4, 306:
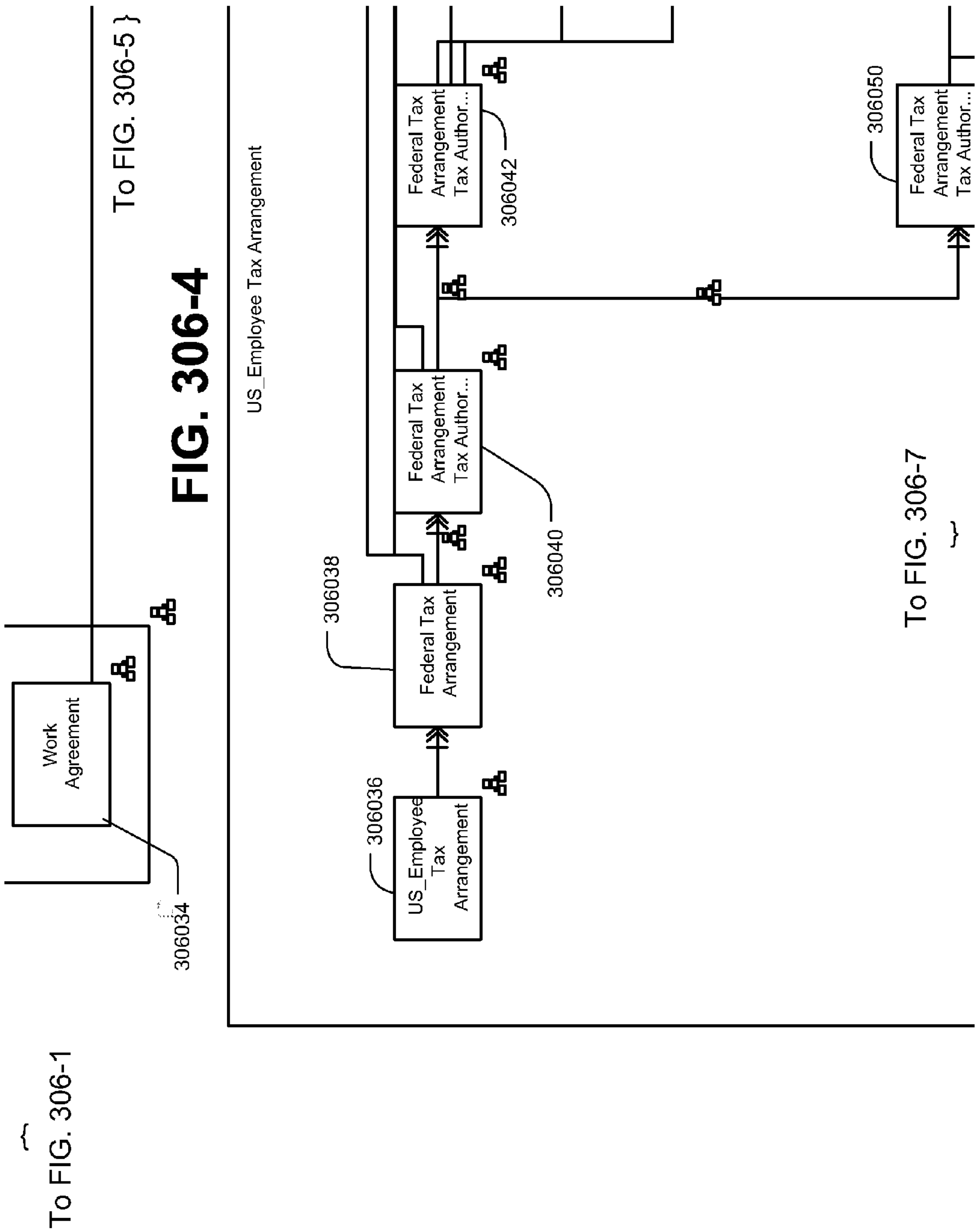
Figures 5, 306:
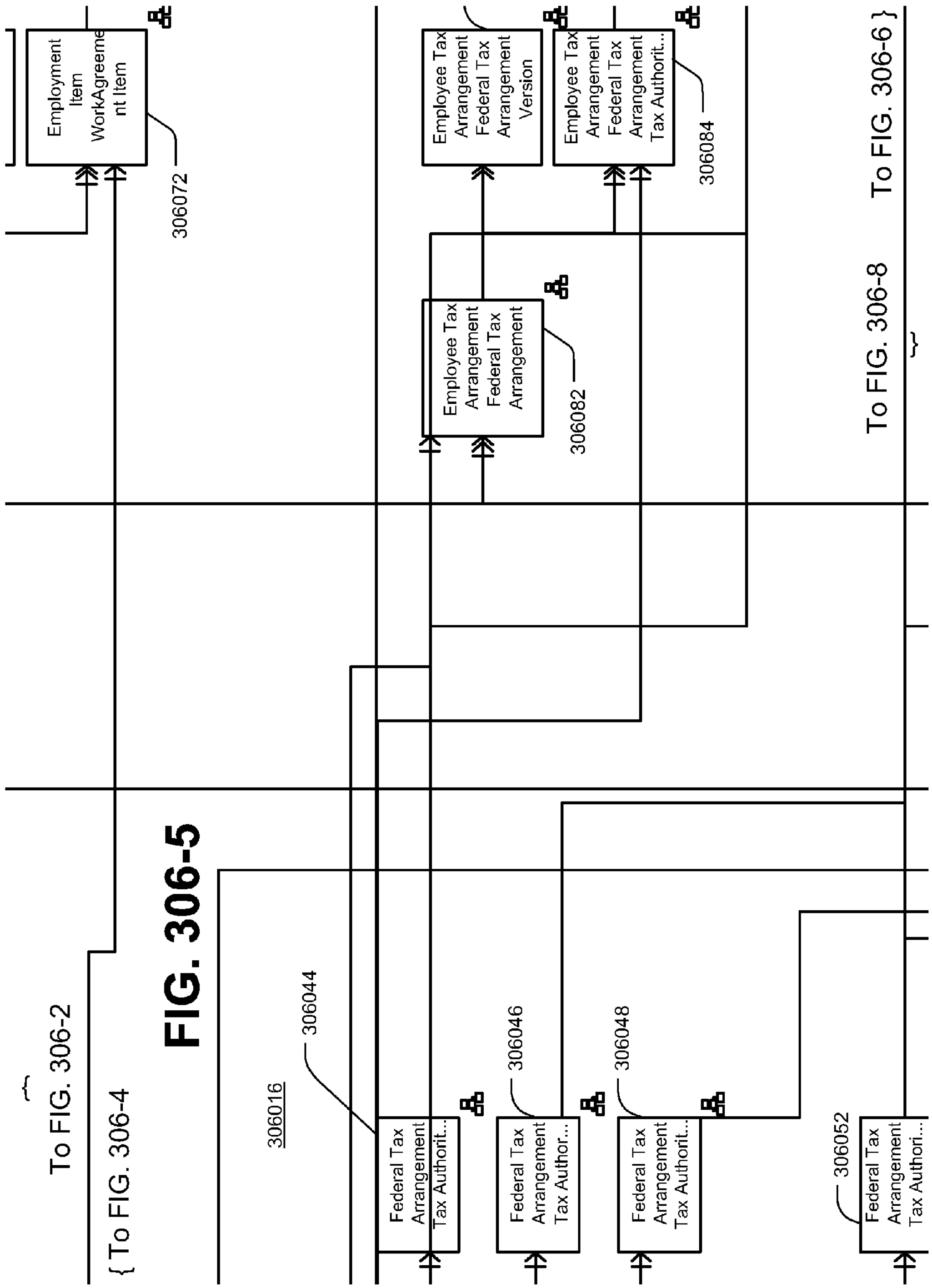
Figures 6, 306:
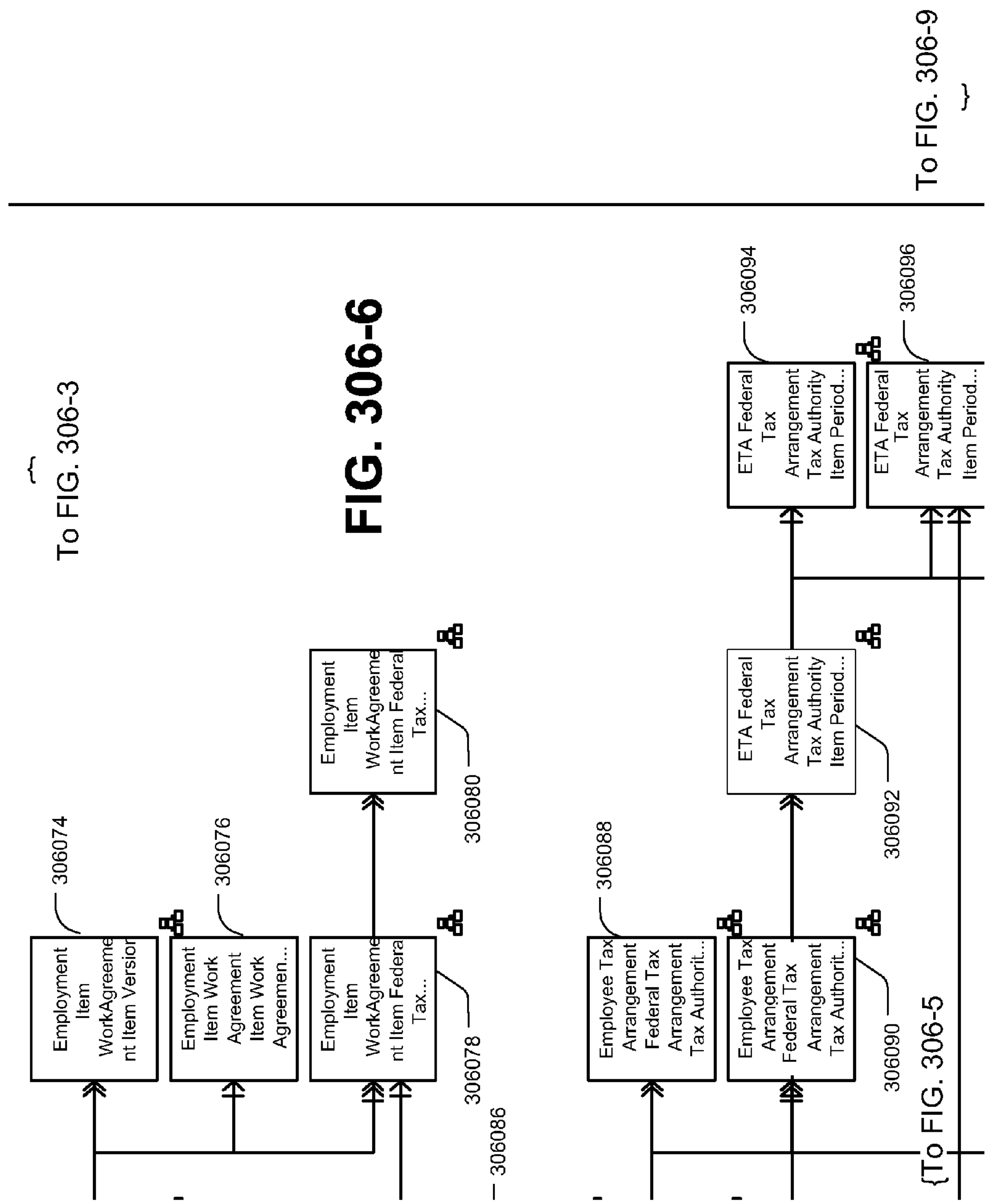
Figures 7, 306:
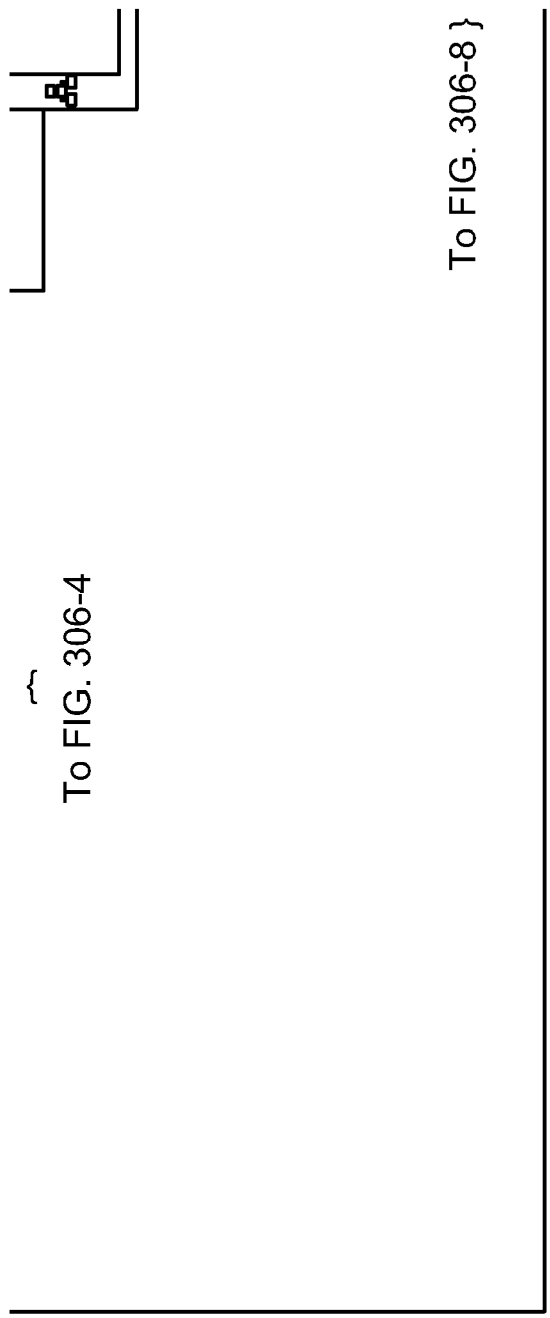
Figures 8, 306:
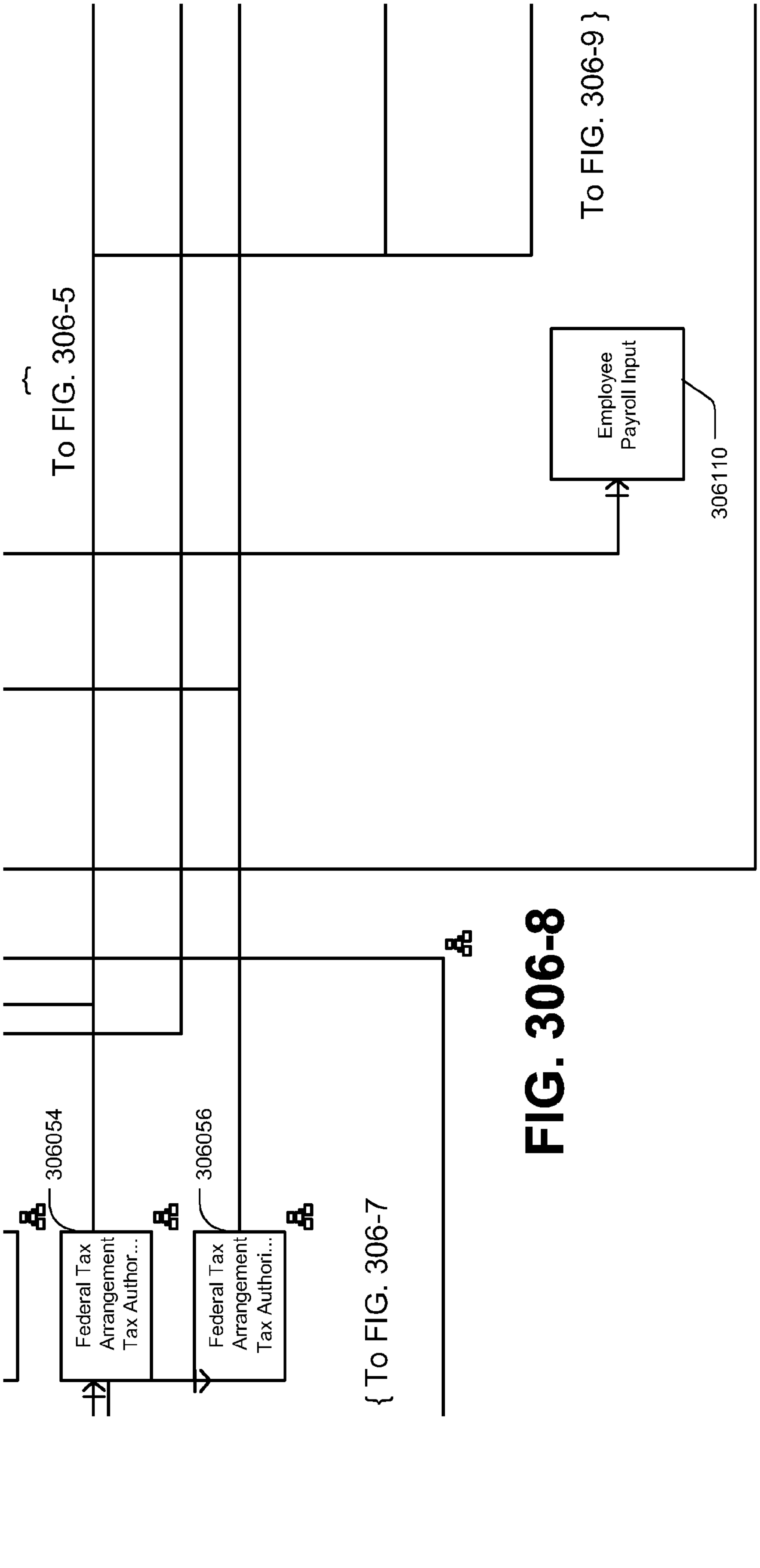
Figures 9, 306:
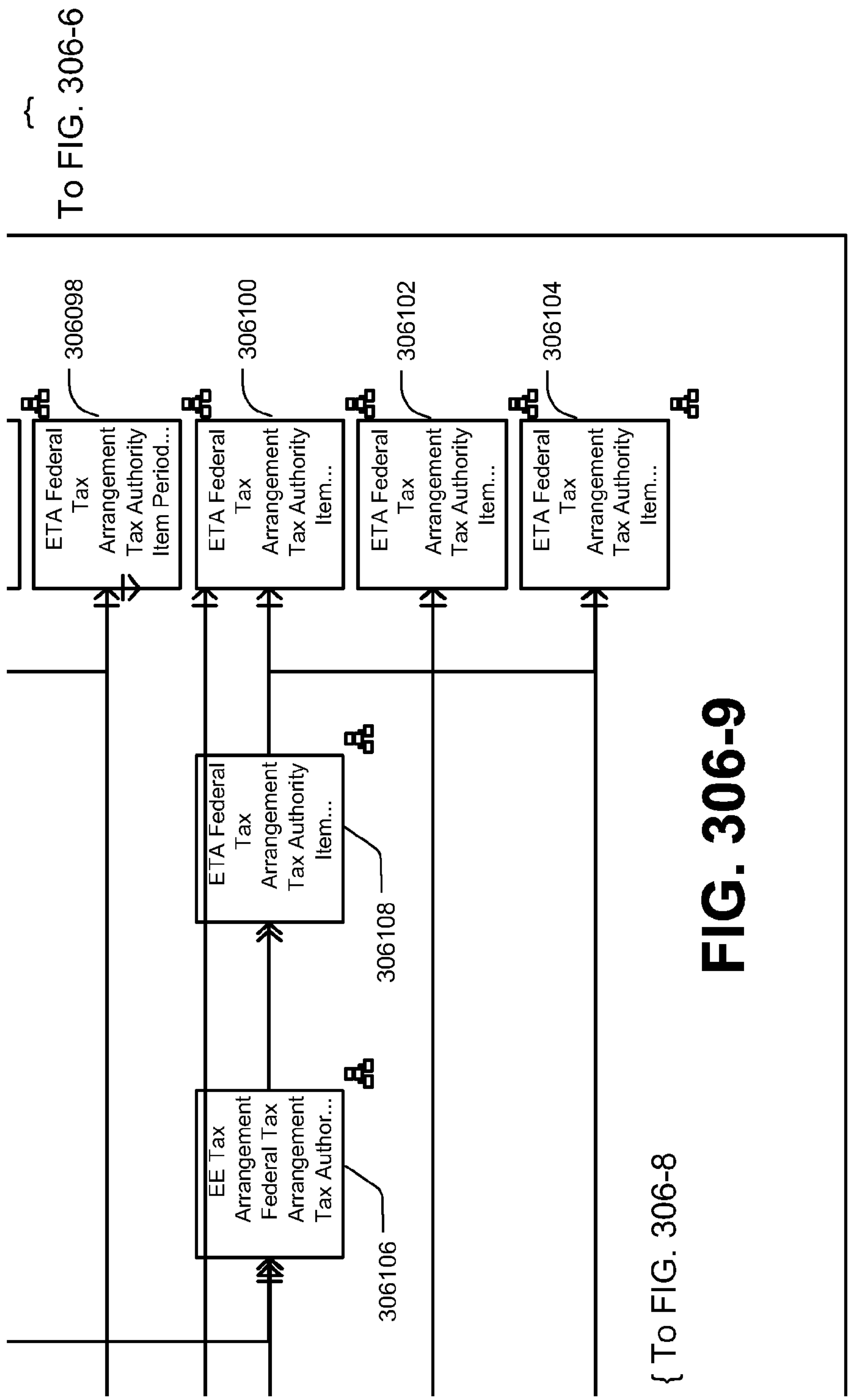
Figures 1, 308:
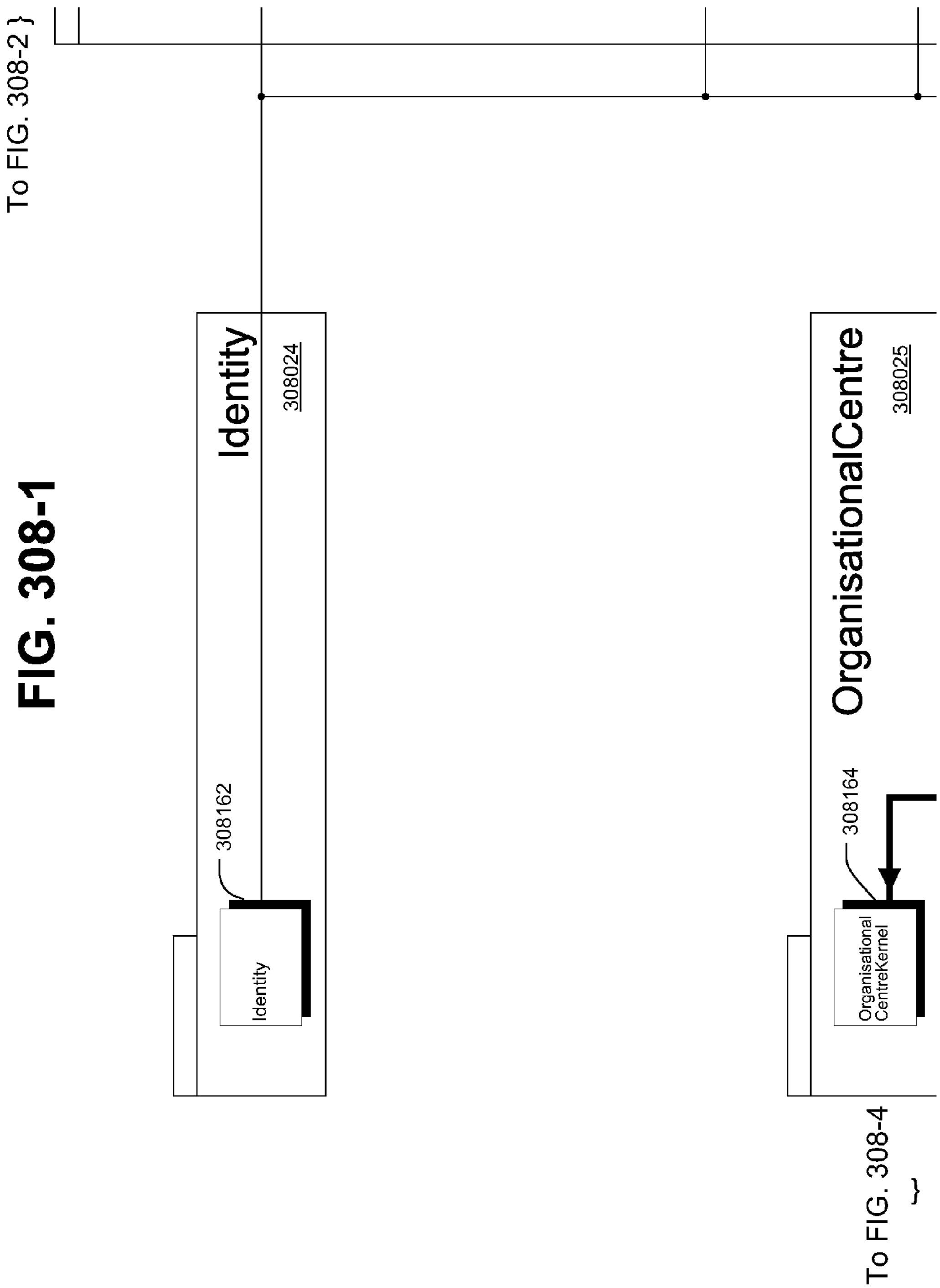
Figures 2, 308:
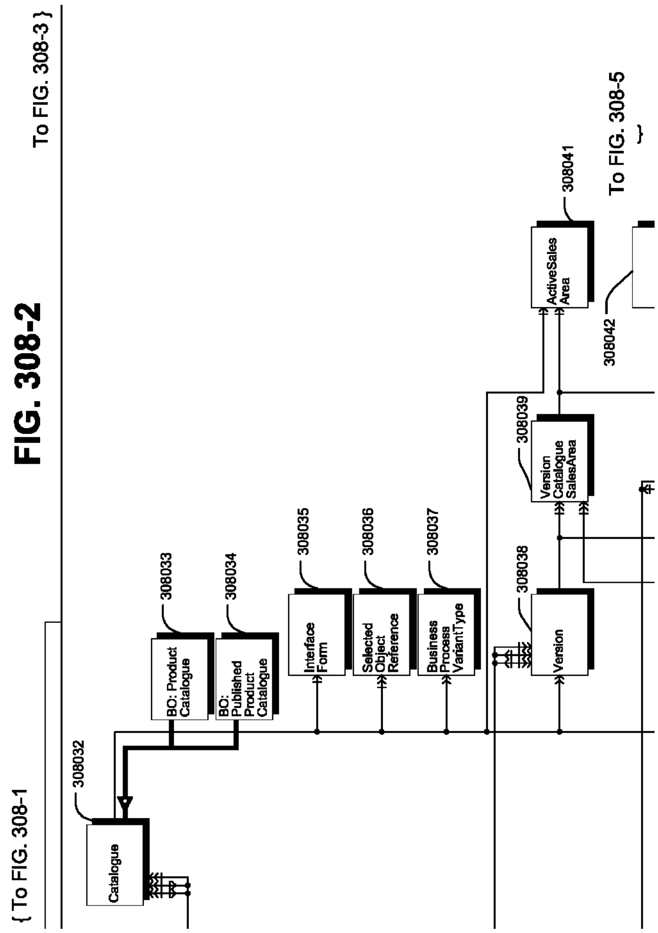
Figures 3, 308:
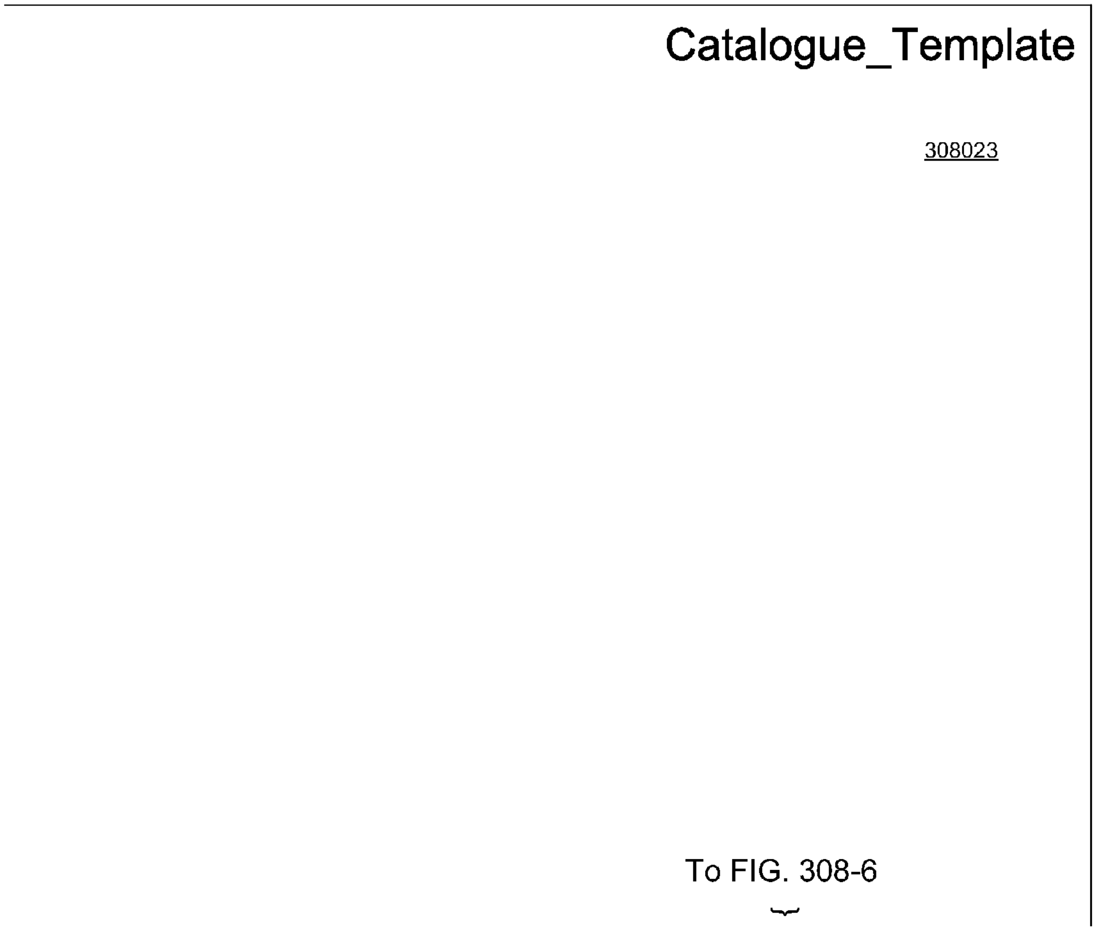
Figures 4, 308:
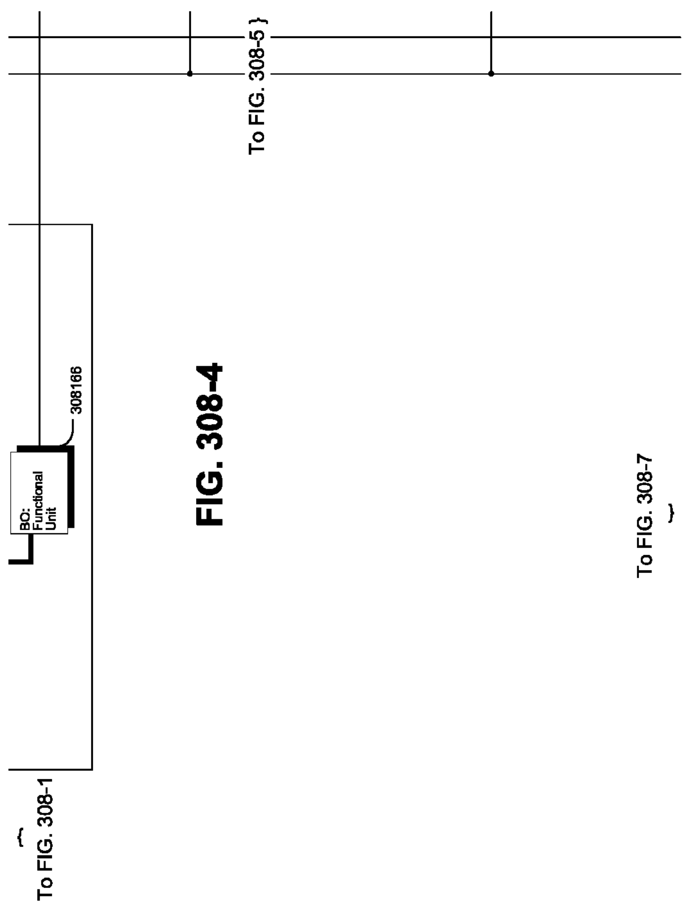
Figures 5, 308:
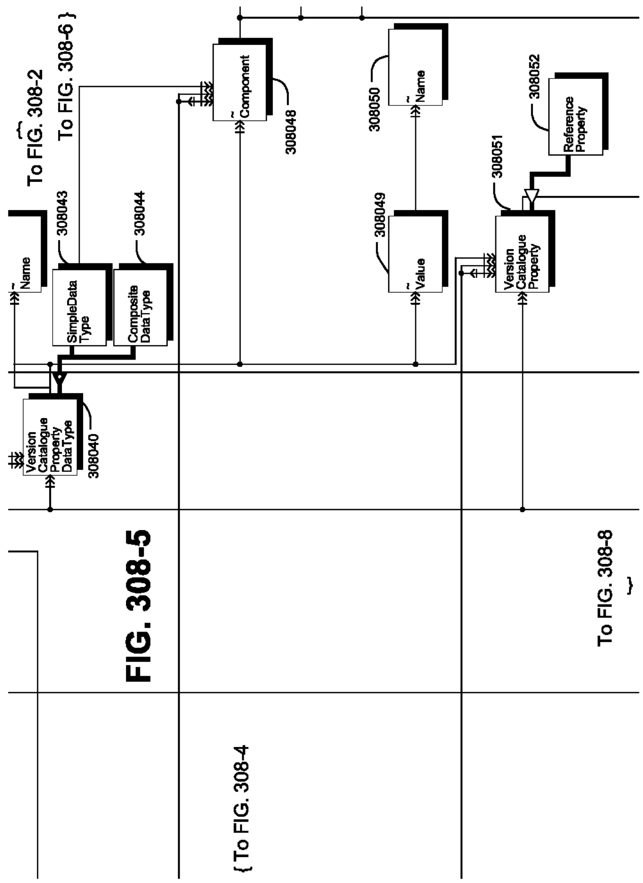
Figures 6, 308:
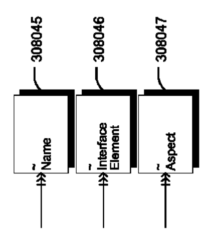
Figures 7, 308:
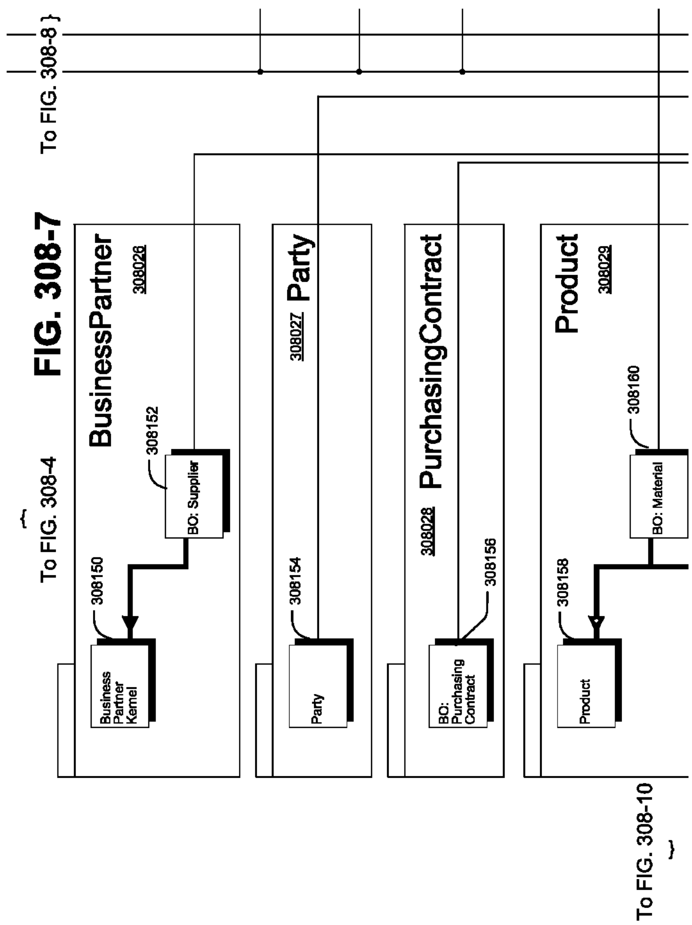
Figures 8, 308:
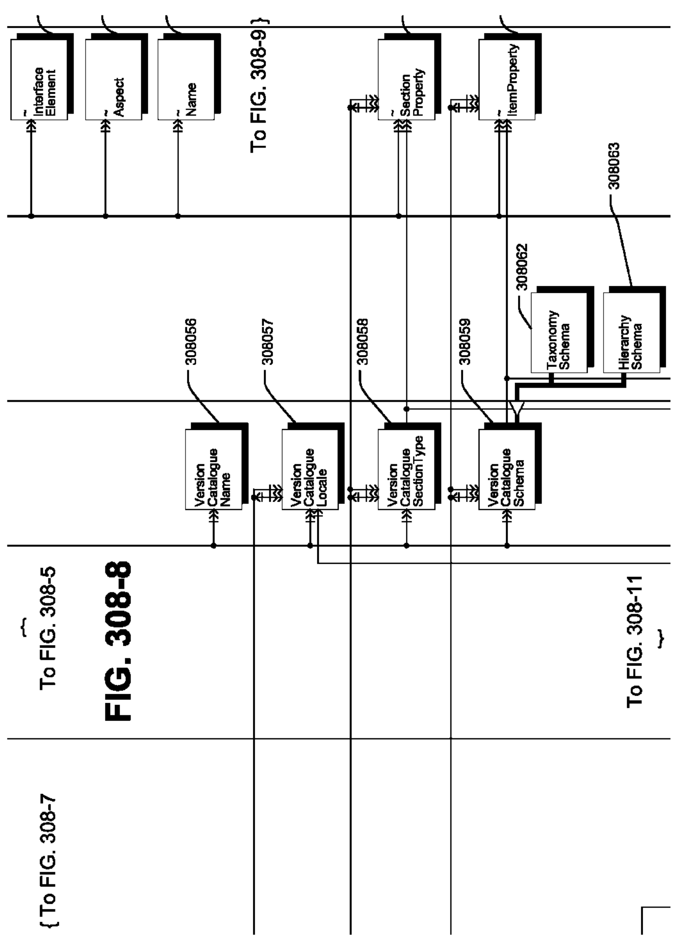
Figures 10, 308:
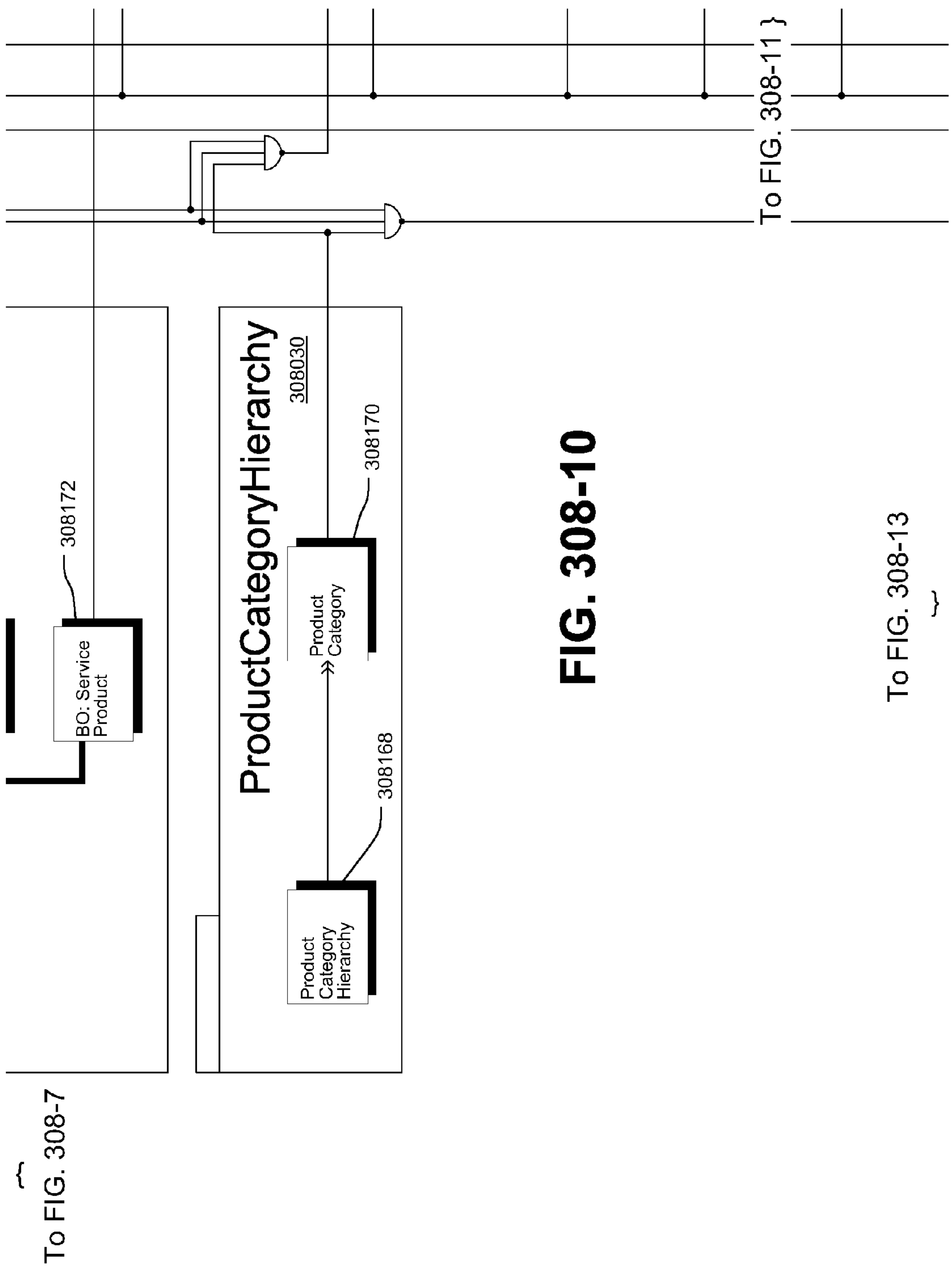
Figures 11, 308:
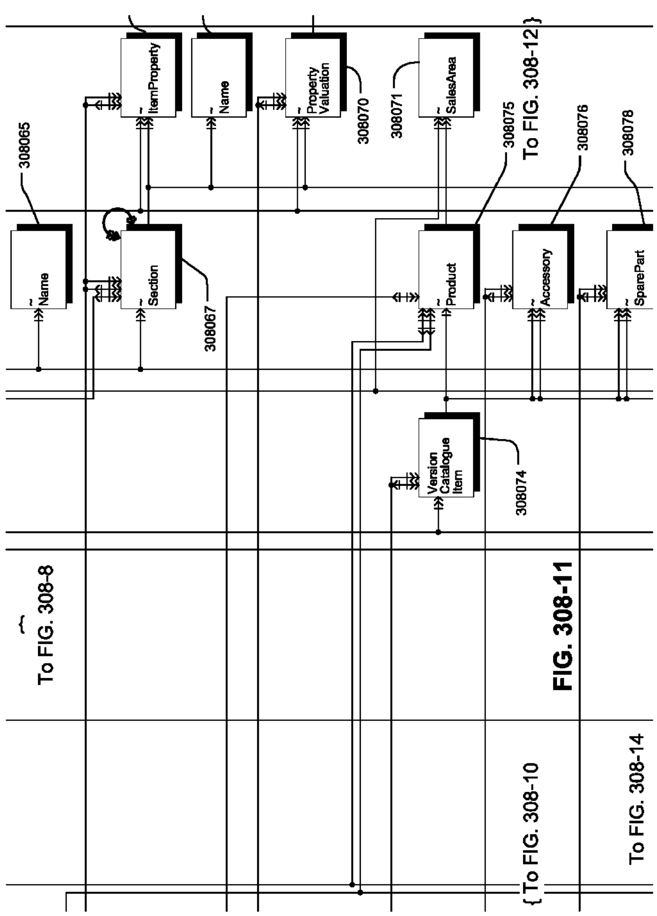
Figures 12, 308:
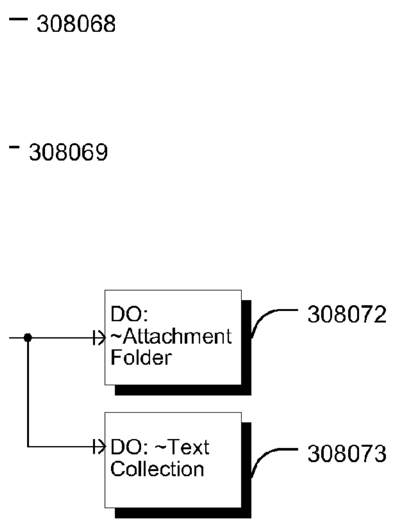
Figures 13, 308:
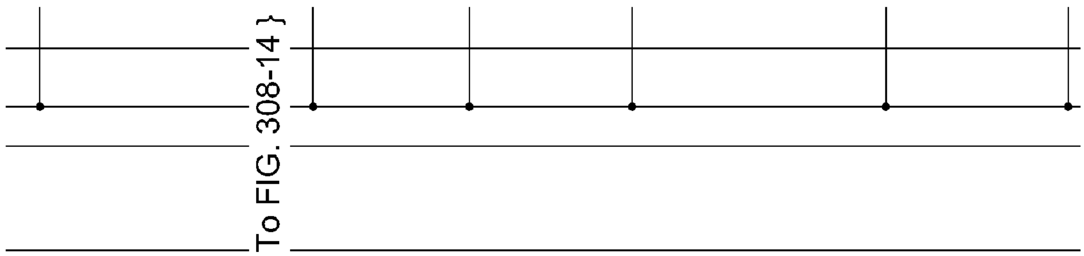
Figures 14, 308:
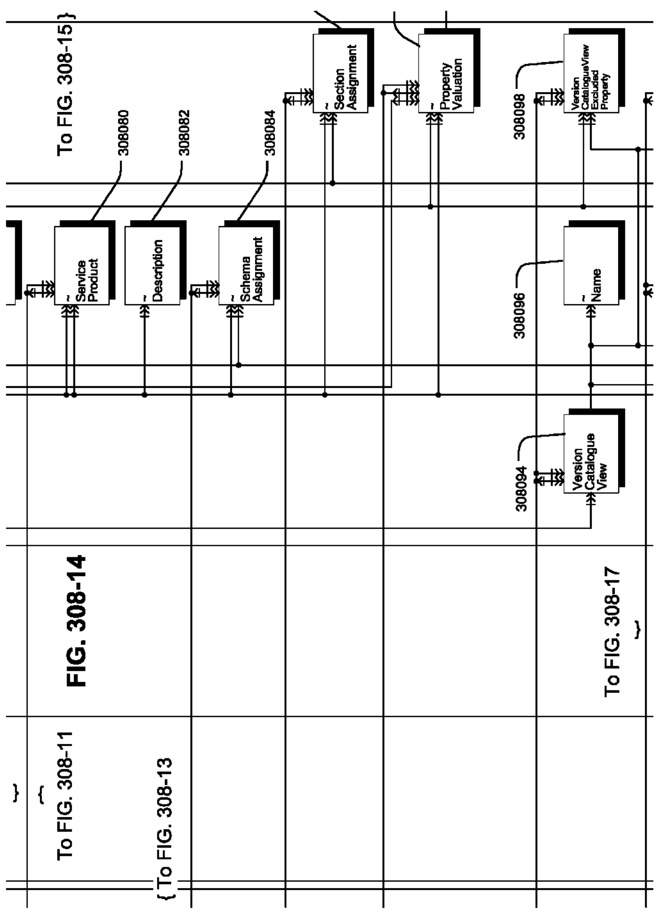
Figures 15, 308:
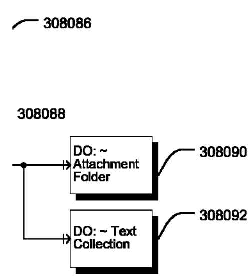
Figures 16, 308:
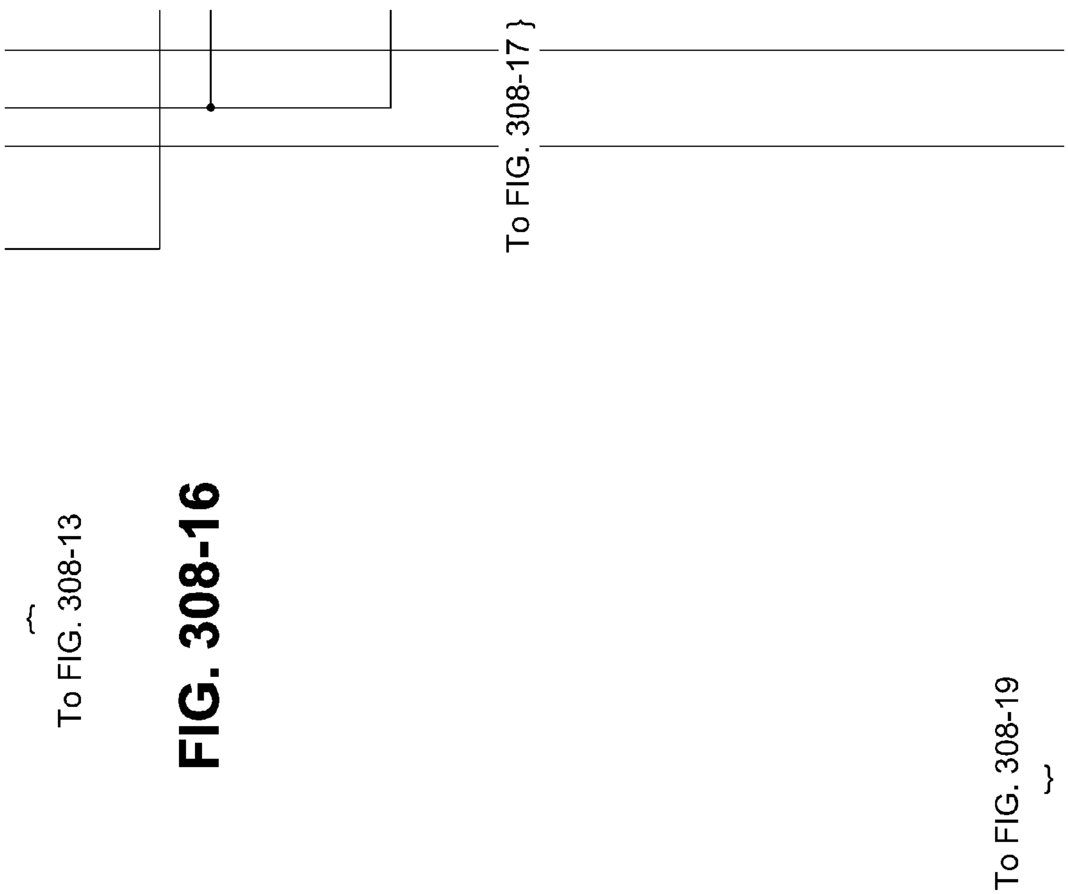
Figures 17, 308:
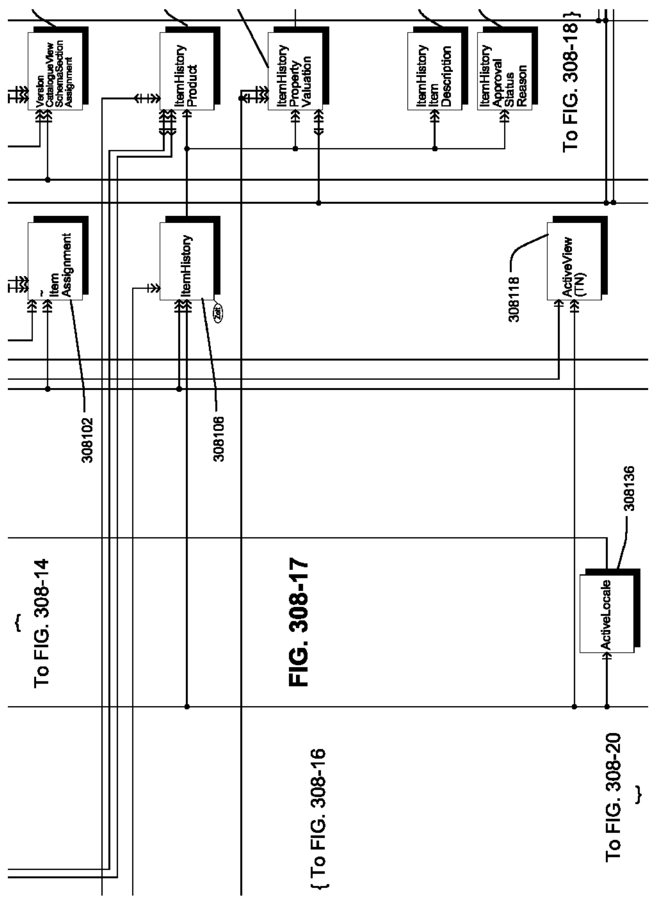
Figures 18, 308:
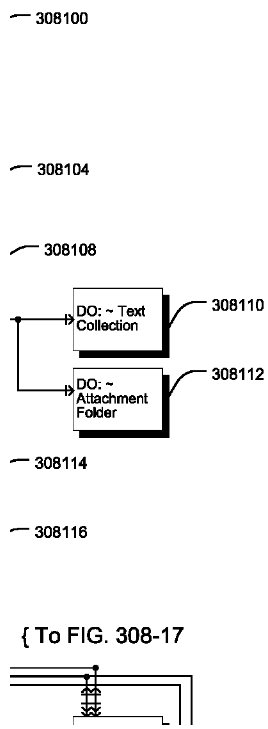
Figures 19, 308:
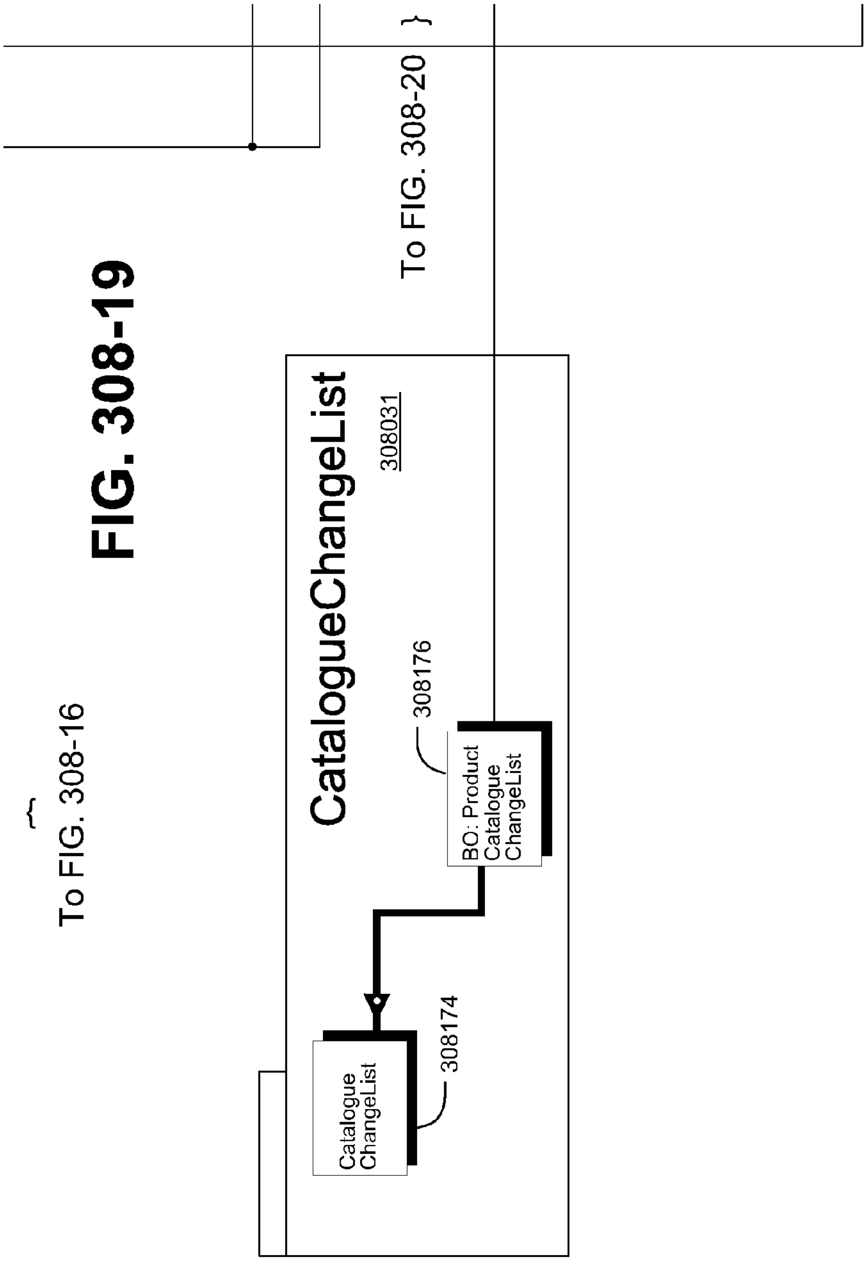
Figures 20, 308:
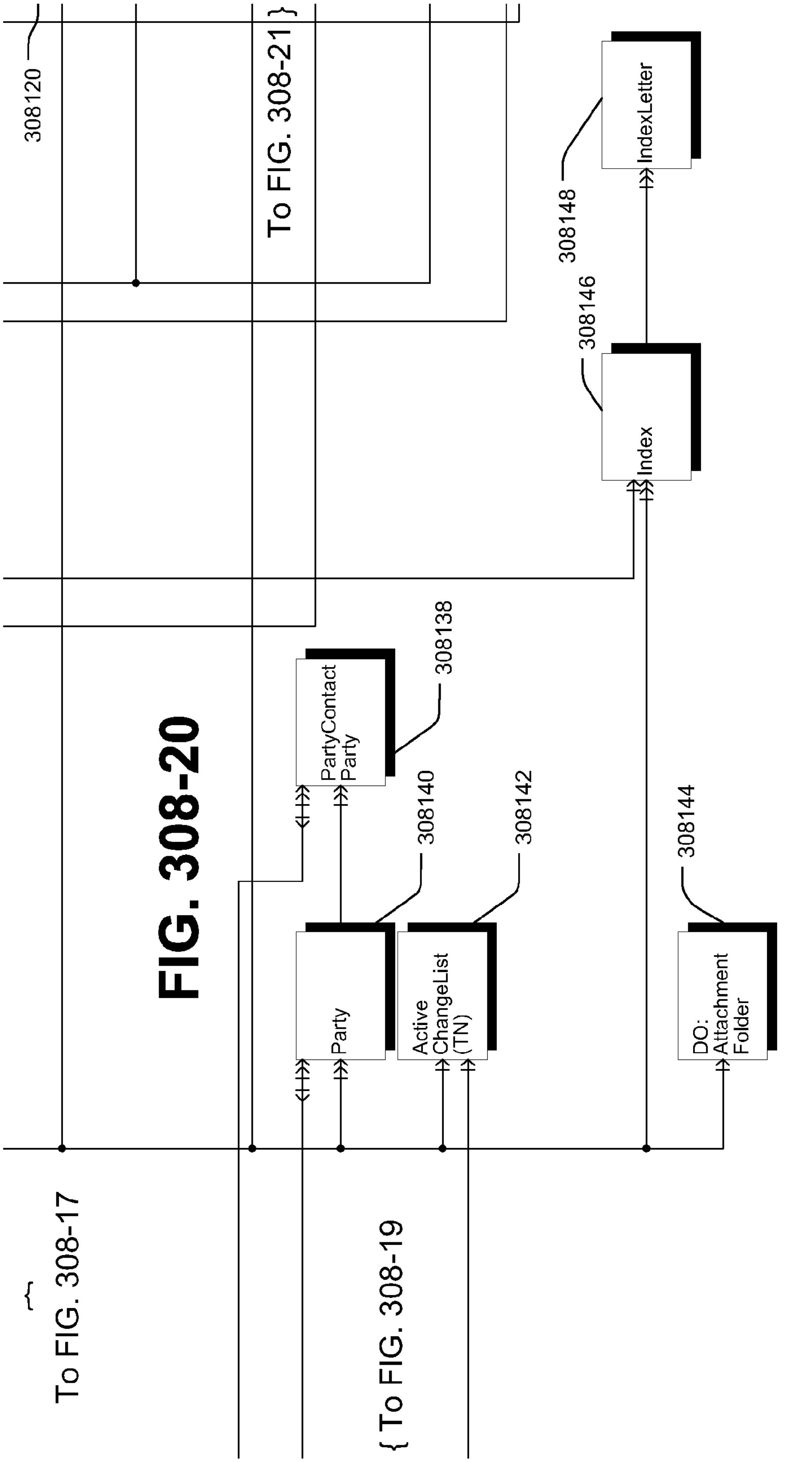
Figures 21, 308:
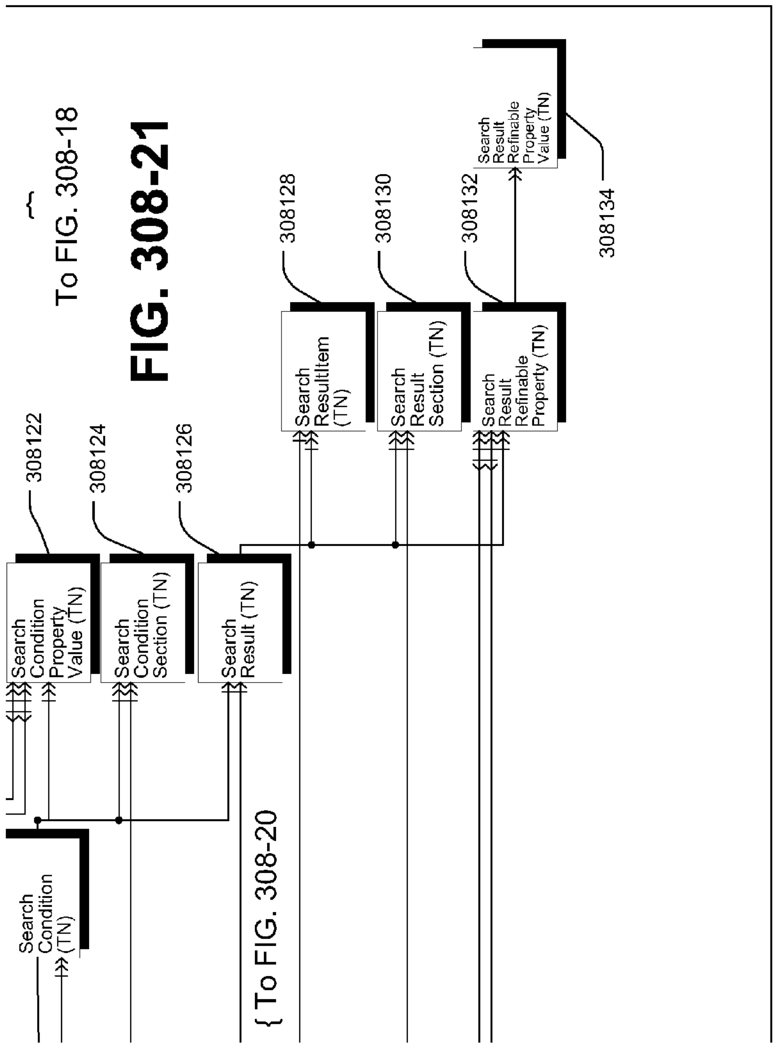

FIG. 132 shows an exemplary Job object model;

FIGS. 133-1 through 133-2 show an exemplary Location object model;

FIGS. 134-1 through 134-2 show an exemplary LogisticsArea object model;

FIG. 135 shows an exemplary LogisticsShift object model;

FIG. 136 shows an exemplary LogisticUnit object model;

FIG. 137 shows an exemplary MarketSegment object model;

FIG. 138 shows an exemplary OperatingHours object model;

FIG. 139 shows an exemplary OrganisationalCentre_Template object model;

FIGS. 140-1 through 140-3 show an exemplary Party object model;

FIG. 141 shows an exemplary PaymentAgreement object model;

FIGS. 142-1 through 142-3 show an exemplary PaymentControl object model;

FIG. 143 shows an exemplary PaymentExplanation object model;

FIGS. 144-1 through 144-4 show an exemplary Position object model;

FIG. 145 shows an exemplary PriceAndTaxCalculation_Template object model;

FIG. 146 shows an exemplary ProcurementArrangement object model;

FIG. 147 shows an exemplary ProductCategoryHierarchy object model;

FIGS. 148-1 through 148-4 show an exemplary ProductionSegment object model;

FIGS. 149-1 through 149-17 show an exemplary ReleasedExecutionProductionModel object model;

FIGS. 150-1 through 150-6 show an exemplary ReleasedPlanningProductionModel object model;

FIGS. 151-1 through 151-6 show an exemplary ReleasedSiteLogisticsProcessModel object model;

FIGS. 152-1 through 152-6 show an exemplary Resource_Template object model;

FIG. 153 shows an exemplary ResourceOperatingTimeTemplate object model;

FIG. 154 shows an exemplary Responsibility object model;

FIG. 155 shows an exemplary SalesArrangement object model;

FIG. 156 shows an exemplary SalesPriceList object model;

FIGS. 157-1 through 157-11 show an exemplary FormSalesPriceListInformation element structure;

FIGS. 158-1 through 158-9 show an exemplary SalesPriceListReplicateConfirmation element structure;

FIGS. 159-1 through 159-9 show an exemplary SalesPriceListReplicateRequest element structure;

FIG. 160 shows an exemplary SalesPriceSpecification object model;

FIGS. 161-1 through 161-7 show an exemplary SalesPriceSpecificationReplicateConfirmation element structure;

FIGS. 162-1 through 162-7 show an exemplary SalesPriceSpecificationReplicateRequest element structure;

FIG. 163 shows an exemplary ServiceIssueCategoryCatalogue object model; ,

FIG. 164 shows an exemplary SiteLogisticsProcessModel object model;

FIG. 165 shows an exemplary SiteLogisticsProcessSegment object model;

FIGS. 166-1 through 166-6 show an exemplary SourceOfSupply object model;

FIGS. 167-1 through 167-6 show an exemplary SourcingList object model;

FIG. 168 shows an exemplary StorageBehaviourMethod object model;

FIG. 169 shows an exemplary StorageControl object model;

FIG. 170 shows an exemplary SupplyPlanningArea object model;

FIGS. 171-1 through 171-4 show an exemplary SupplyQuotaArrangement object model;

FIG. 172 shows an exemplary TextCollection object model;

FIGS. 173-1 through 173-2 show an exemplary TransportationLane object model;

FIG. 174 shows an exemplary WorkAgreement object model;

FIG. 175 shows an exemplary CN_EmployeeTaxArrangement object model;

FIG. 176 shows an exemplary CN_EmployeeTaxArrangementMessage Message Data Type;

FIGS. 177-1 through 177-4 show an exemplary CN_EmployeeTaxArrangementPayrollNotificationMessage element structure;

FIG. 178 shows an exemplary CompensationStructure object model;

FIGS. 179-1 through 179-2 show an exemplary DE_EmployeeTaxArrangement object model;

FIGS. 180-1 through 180-2 show an exemplary DE_EmployeeTaxArrangementMessage Message Data Type;

FIGS. 181-1 through 181-12 show an exemplary DE_EmployeeTaxArrangementPayrollNotificationMessage element structure;

FIG. 182 shows an exemplary EmployeeCompensationAgreement object model;

FIG. 183 shows an exemplary EmployeeCompensationAgeementMessage Message Data Type;

FIGS. 184-1 through 184-11 show an exemplary ECA_PayrollMessage element structure;

FIGS. 185-1 through 185-8 show an exemplary ECA_PayrollNotification element structure;

FIGS. 186-1 through 186-4 show an exemplary EmployeeTime object model;

FIGS. 187-1 through 187-2 show an exemplary EmployeeTimeAccount object model;

FIG. 188 shows an exemplary EmployeeTimeAccountPayrollMessage Message Data Type;

FIGS. 189-1 through 189-4 show an exemplary EmployeeTimeAccountPayrollMessage element structure;

FIGS. 190-1 through 190-4 show an exemplary EmployeeTimeAgreement object model;

FIGS. 191-1 through 191-2 show an exemplary EmployeeTimeAgreementNotificationMessage Message Data Type;

FIGS. 192-1 through 192-6 show an exemplary EmployeeTimeAgreementNonficationMesage element structure;

FIGS. 193-1 through 193-2 show an exemplary EmployeeTimeConfirmationViewOfProject object model;

FIGS. 194-1 through 194-2 show an exemplary EmployeeTimeConfirmationViewOfServiceTransactionDocument object model;

FIG. 195 shows an exemplary EmployeeTimeConfirmationViewOfServiceTransactionDocumentMessage Message Data Type;

FIGS. 196-1 through 196-8 show an exemplary EmployeeTimeConfirmationViewOfServiceTransactionDocumentMessage element structure;

FIGS. 197-1 through 197-5 show an exemplary EmployeeTimeRecordingView object model;

FIG. 198 shows an exemplary EmployeeTimeValuation object model;

FIG. 199 shows an exemplary FR_EmployeeSocialInsuranceArrangement object model;

FIG. 200 shows an exemplary FR_EmployeeSocialInsuranceArrangementMessage Message Data Type;

FIGS. 201-1 through 201-5 show an exemplary FR_EmployeeSocialInsuranceArrangementPayrollNotificationMessage element structure;

FIG. 202 shows an exemplary GB_EmployeeSocialInsuranceArrangement object model;

FIG. 203 shows an exemplary GB_EmployeeSocialInsuranceArrangementMessage Message Data Type;

FIGS. 204-1 through 204-5 show an exemplary GB_EmployeeSocialInsuranceArrangementPayrollNotificationMessage element structure;

FIG. 205 shows an exemplary IT_EmployeeSocialInsuranceArrangement object model;

FIG. 206 shows an exemplary IT_EmployeeSocialInsuranceArrangementMessage Message Data Type;

FIGS. 207-1 through 207-11 show an exemplary IT_EmployeeSocialInsuranceArrangementPayrollNotificationMessage element structure;

FIG. 208 shows an exemplary WorkingTimeModel object model;

FIG. 209 shows an exemplary BankPaymentOrder object model;

FIGS. 210-1 through 210-6 show an exemplary CollectivePaymentOrderMessage Message Data Type;

FIGS. 211-1 through 211-9 show an exemplary CollectivePaymentOrderRequest element structure;

FIG. 212 shows an exemplary CashTransfer object model;

FIG. 213 shows an exemplary ChequeStorage object model;

FIG. 214 shows an exemplary CompanyPaymentFileRegister object model;

FIG. 215 shows an exemplary ExpectedLiquidityItem object model;

FIG. 216 shows an exemplary HouseBankStatement object model;

FIGS. 217-1 through 217-9 show an exemplary HouseBankStatementMessage Message Data Type;

FIGS. 218-1 through 218-12 show an exemplary BankAccountStatementNotification element structure;

FIGS. 219-1 through 219-4 show an exemplary LiquidityForecast object model;

FIG. 220 shows an exemplary LiquidityInformationMessage Message Data Type;

FIGS. 221-1 through 221-4 show exemplary LiquidityInformationQuery and LiquidityInformationResponse element structures;

FIG. 222 shows an exemplary PaymentAdvice object model;

FIGS. 223-1 through 223-6 show an exemplary PaymentAdviceMessage Message Data Type;

FIGS. 224-1 through 224-12 show an exemplary PaymentAdviceNotification element structure;

FIGS. 225-1 through 225-2 show an exemplary PaymentAllocation object model;

FIGS. 226-1 through 226-2 show an exemplary ClearingRequestMessage Message Data Type;

FIGS. 227-1 through 227-14 show exemplary ClearingRequest, ClearingCancellationRequest, and ClearingConfirmation element structures;

FIGS. 228-1 through 228-2 show an exemplary PaymentOrder object model;

FIGS. 229-1 through 229-14 show exemplary PaymcntOrderRequest, PaymentOrderCancellationRequest, PaymentOrderConfirmation, PaymentOrderReservationRequest, PaymentOrderReservationConfirmation, PaymentOrderReservationCancellationRequest, PaymentOrderReservationChangeRequest, PaymentOrderReservationChangeCancellationRequest, and PaymentOrderReservationChangeConfirmation element structures;

FIGS. 230-1 through 230-9 show an exemplary Inventory object model;

FIGS. 231-1 through 231-4 show an exemplary LogisticsTaskFolder object model;

FIGS. 232-1 through 232-10 show an exemplary PhysicalInventoryCount object model;

FIGS. 233-1 through 233-2 show an exemplary ProductionRequest object model;

FIGS. 234-1 through 234-11 show an exemplary ProductionRequestConfinnationMessage element structure;

FIGS. 235-1 through 235-14 show an exemplary ProductionRequestConfirmationReconciliationMessage element structure;

FIGS. 236-1 through 236-10 show an exemplary ProductionRequestRequestMessage element structure;

FIGS. 237-1 through 237-14 show an exemplary SiteLogisticsRequest object model;

FIGS. 238-1 through 238-3 show an exemplary SiteLogisticsRequestConfirmationMessage Message Data Type;

FIGS. 239-1 through 239-2 show an exemplary SiteLogisticsRequestConfirmationReconciliationMessage Message Data Type;

FIGS. 240-1 through 240-2 show an exemplary SiteLogisticsRequestRequestMessage Message Data Type;

FIGS. 241-1 through 241-9 show an exemplary SiteLogisticsRequestConfirmationMessage element structure;

FIGS. 242-1 through 242-12 show an exemplary SiteLogisticsRequestConfirmationReconciliation element structure;

FIGS. 243-1 through 243-21 show an exemplary SiteLogisticsRequestRequestMessage element structure;

FIGS. 244-1 through 244-9 show an exemplary Project_Template object model;

FIG. 245 shows an exemplary EmployeeTimeConfirmationViewOfProjectNotificationMessage Message Data Type;

FIG. 246 shows an exemplary ProjectTaskConfirmationMessage Message Data Type;

FIGS. 247-1 through 247-8 show an exemplary EmployeeTimeConfirmationViewOfProjectNotification element structure;

FIGS. 248-1 through 248-6 show an exemplary ProjectTaskConfirmationNotification element structure;

FIGS. 249-1 through 249-4 show an exemplary ProjectPurchaseRequest object model;

FIGS. 250-1 through 250-12 show an exemplary PurchaseOrder object model;

FIGS. 251-1 through 251-49 show exemplary FormPurchaseOrderRequest, FormPurchaseOrderChangeRequest, FormPurchaseOrderCancellationRequest, InteractiveFormPurchaseOrderRcquest, InteractiveFormPurchaseOrderChangeRquest and InteractiveFormPurchaseOrderC element structures;

FIG. 252 shows an exemplary PurchaseOrderCancellationRequest element structure;

FIGS. 253-1 through 253-6 show an exemplary PurchaseOrderDeliveryValuesNotification element structure;

FIGS. 254-1 through 254-8 show an exemplary PurchaseOrderInvoiceValuesNotification element structure;

FIGS. 255-1 through 255-19 show an exemplary PurchaseOrderNotification element structure;

FIGS. 256-1 through 256-48 show exemplary PurchaseOrderRequest, PurchaseOrderChangeRequest, and PurchaseOrderConfirmation element structures;

FIGS. 257-1 through 257-11 show an exemplary PurchaseOrderConfirmation object model;

FIGS. 258-1 through 258-11 show an exemplary PurchascRequest object model;

FIGS. 259-1 through 259-10 show an exemplary PurchaseRquestConfirmation element structure;

FIGS. 260-1 through 260-15 show an exemplary PurchaseRequestNotification element structure;

FIGS. 261-1 through 261-20 show an exemplary PurchaseRequestRequest element structure;

FIGS. 262-1 through 262-7 show an exemplary InternalRequest object model;

FIGS. 263-1 through 263-10 show an exemplary RequestForQuote object model;

FIGS. 264-1 through 264-18 show an exemplary QuoteMessage Message Data Type;

FIG. 265 shows an exemplary RFQCancellationMessagc Message Data Type;

FIGS. 266-1 through 266-21 show an exemplary RFQRequestMessage Message Data Type;

FIGS. 267-1 through 267-4 show an exemplary RFQResultMessage Message Data Type;

FIGS. 268-1 through 268-27 show an exemplary FormRFQRequest element structure;

FIGS. 269-1 through 269-10 show an exemplary FormRFQResultNotification element structure;

FIGS. 270-1 through 270-31 show an exemplary InteractiveFormRFQRequest element structure;

FIGS. 271-1 through 271-20 show an exemplary QuoteNotification element structure;

FIGS. 272-1 through 272-3 show an exemplary RFQCancellationRequest element structure;

FIGS. 273-1 through 273-33 show an exemplary RFQRequest element structure;

FIGS. 274-1 through 274-6 show an exemplary RFQResultNotification element structure;

FIGS. 275-1 through 275-9 show an exemplary RFQRequest object model;

FIG. 276 shows an exemplary RMExecutionCancellationRequestMessage Message Data Type;

FIG. 277 shows an exemplary RFQExecutionConfinnationMessagc Message Data Type;

FIGS. 278-1 through 278-8 show an exemplary RFQExecutionRequestMessage Message Data Type;

FIGS. 279-1 through 279-2 show an exemplary RFQExecutionCancellationRcquest element structure;

FIGS. 280-1 through 280-3 show an exemplary RFQExecutionConfirmation element structure;

FIGS. 281-1 through 281-22 show an exemplary RFQExecutionRequest element structure;

FIGS. 282-1 through 282-11 show an exemplary SupplierQuote object model;

FIGS. 283-1 through 283-13 show an exemplary SupplierQuoteAwardNotification element structure;

FIGS. 284-1 through 284-12 show an exemplary SupplierInvoice object model;

FIGS. 285-1 through 285-4 show an exemplary BusinessTransactionDocumentImageRecognitionRequest element structure;

FIGS. 286-1 through 286-18 show exemplary InvoiceRequest and InvoiceConfirmation element structures;

FIGS. 287-1 through 287-2 show an exemplary SupplierInvoiceRequest element structure;

FIG. 288 shows an exemplary SupplierInvoiceVerificationException object model;

FIGS. 289-1 through 289-26 show an exemplary InteractiveFormSupplerInvoiceVerificationExceptionResolutionRequest element structure;

FIGS. 290-1 through 290-11 show an exemplary SupplierInvoiceVerficationExceptionResolutionConfirmation element structure;

FIG. 291 shows an exemplary DemandForecast object model;

FIGS. 292-1 through 292-2 show an exemplary DemandForecastNotificationMessage Message Data Type;

FIGS. 293-1 through 293-6 show an exemplary DemandForecastNotification element structure;

FIGS. 294-1 through 294-17 show an exemplary LogisticsExecutionRequisition object model;

FIG. 295 shows an exemplary Planned IndependentRequirement object model;

FIGS. 296-1 through 296-6 show an exemplary PlanningViewOfPurchascOrder object model;

FIG. 297 shows an exemplary ProductionRequisition object model;

FIGS. 298-1 through 298-13 show an exemplary SiteLogisticsRequisition object model;

FIG. 299 shows an exemplary SupplyPlanningRequirement object model;

FIGS. 300-1 through 300-3 show an exemplary PayrollProcess object model;

FIG. 301 shows an exemplary PayrollProcessNotificationMessage Message Data Type;

FIGS. 302-1 through 302-4 show an exemplary PayrollProcessNotificationMessage element structure;

FIGS. 303-1 through 303-5 show an exemplary PayrollStepExecutionConfirmationMessage element structure;

FIGS. 304-1 through 304-4 show an exemplary PayrollStepExecutionRquestMessage element structure;

FIG. 305 shows an exemplary CatalogueChangeList_Template object model;

FIGS. 306-1 through 306-9 show an exemplary US_EmployeePayrollInput object model;

FIGS. 307-1 through 307-81 show an exemplary US_EmployeePayrollInputReplicationRequestMessage element structure;

FIGS. 308-1 through 308-21 show an exemplary Catalogue_Template object model;

FIGS. 309-1 through 309-2 show an exemplary CataloguePublicationConfirmation element structure;

FIGS. 310-1 through 310-3 show an exemplary CataloguePublicationTransmissionCancellationConfirmation element structure;

FIGS. 311-1 through 311-2 show an exemplary CataloguePublicationTransmissionCancellationRequest element structure;

FIGS. 312-1 through 312-2 show an exemplary CataloguePublicationTransmissionPackageNotification element structure; and FIGS. 313-1 through 313-50 show exemplary CatalogueUpdateNotification and CataloguePublicationRequest element structures.

DETAILED DESCRIPTION

A. Overview

Methods and systems consistent with the subject matter described herein facilitate e-commerce by providing consistent interfaces that are suitable for use across industries, across businesses, and across different departments within a business during a business transaction. To generate consistent interfaces, methods and systems consistent with the subject matter described herein utilize a business object model, which reflects the data that will be used during a given business transaction. An example of a business transaction is the exchange of purchase orders and order confirmations between a buyer and a seller. The business object model is generated in a hierarchical manner to ensure that the same type of data is represented the same way throughout the business object model. This ensures the consistency of the information in the business object model. Consistency is also reflected in the semantic meaning of the various structural elements. That is, each structural element has a consistent business meaning. For example, the location entity, regardless of in which package it is located, refers to a location.

From this business object model, various interfaces are derived to accomplish the functionality of the business transaction. Interfaces provide an entry point for components to access the functionality of an application. For example, the interface for a Purchase Order Request provides an entry point for components to access the functionality of a Purchase Order, in particular, to transmit and/or receive a Purchase Order Request. One skilled in the art will recognize that each of these interfaces may be provided, sold, distributed, utilized, or marketed as a separate product or as a major component of a separate product. Alternatively, a group of related interfaces may be provided, sold, distributed, utilized, or marketed as a product or as a major component of a separate product. Because the interfaces are generated from the business object model, the information in the interfaces is consistent, and the interfaces are consistent among the business entities. Such consistency facilitates heterogeneous business entities in cooperating to accomplish the business transaction.

Generally, the business object is a representation of a type of a uniquely identifiable business entity (an object instance) described by a structural model. In the architecture, processes may typically operate on business objects. Business objects represent a specific view on some well-defined business content. In other words, business objects represent content, which a typical business user would expect and understand with little explanation. Business objects are further categorized as business process objects and master data objects. A master data object is an object that encapsulates master data (i.e., data that is valid for a period of time). A business process object, which is the kind of business object generally found in a process component, is an object that encapsulates transactional data (i.e., data that is valid for a point in time). The term business object will be used generically to refer to a business process object and a master data object, unless the context requires otherwise. Properly implemented, business objects are implemented free of redundancies.

The architectural elements also include the process component. The process component is a software package that realizes a business process and generally exposes its functionality as services. The functionality contains business transactions. In general, the process component contains one or more semantically related business objects. Often, a particular business object belongs to no more than one process component. Interactions between process component pairs involving their respective business objects, process agents, operations, interfaces, and messages are described as process component interactions, which generally determine the interactions of a pair of process components across a deployment unit boundary. Interactions between process components within a deployment unit are typically not constrained by the architectural design and can be implemented in any convenient fashion. Process components may be modular and context-independent. In other words, process components may not be specific to any particular application and as such, may be reusable. In some implementations, the process component is the smallest (most granular) element of reuse in the architecture. An external process component is generally used to represent the external system in describing interactions with the external system; however, this should be understood to require no more of the external system than that able to produce and receive messages as required by the process component that interacts with the external system. For example, process components may include multiple operations that may provide interaction with the external system. Each operation generally belongs to one type of process component in the architecture. Operations can be synchronous or asynchronous, corresponding to synchronous or asynchronous process agents, which will be described below. The operation is often the smallest, separately-callable function, described by a set of data types used as input, output, and fault parameters serving as a signature.

The architectural elements may also include the service interface, referred to simply as the interface. The interface is a named group of operations. The interface often belongs to one process component and process component might contain multiple interfaces. In one implementation, the service interface contains only inbound or outbound operations, but not a mixture of both. One interface can contain both synchronous and asynchronous operations. Normally, operations of the same type (either inbound or outbound) which belong to the same message choreography will belong to the same interface. Thus, generally, all outbound operations to the same other process component are in one interface.

The architectural elements also include the message. Operations transmit and receive messages. Any convenient messaging infrastructure can be used. A message is information conveyed from one process component instance to another, with the expectation that activity will ensue. Operation can use multiple message types for inbound, outbound, or error messages. When two process components are in different deployment units, invocation of an operation of one process component by the other process component is accomplished by the operation on the other process component sending a message to the first process component.

The architectural elements may also include the process agent. Process agents do business processing that involves the sending or receiving of messages. Each operation normally has at least one associated process agent. Each process agent can be associated with one or more operations. Process agents can be either inbound or outbound and either synchronous or asynchronous. Asynchronous outbound process agents are called after a business object changes such as after a "create", "update", or "delete" of a business object instance. Synchronous outbound process agents are generally triggered directly by business object. An outbound process agent will generally perform some processing of the data of the business object instance whose change triggered the event. The outbound agent triggers subsequent business process steps by sending messages using well-defined outbound services to another process component, which generally will be in another deployment unit, or to an external system. The outbound process agent is linked to the one business object that triggers the agent, but it is sent not to another business object but rather to another process component. Thus, the outbound process agent can be implemented without knowledge of the exact business object design of the recipient process component. Alternatively, the process agent may be inbound. For example, inbound process agents may be used for the inbound part of a message-based communication. Inbound process agents are called after a message has been received. The inbound process agent starts the execution of the business process step requested in a message by creating or updating one or multiple business object instances. Inbound process agent is not generally the agent of business object but of its process component. Inbound process agent can act on multiple business objects in a process component. Regardless of whether the process agent is inbound or outbound, an agent may be synchronous if used when a process component requires a more or less immediate response from another process component, and is waiting for that response to continue its work.

The architectural elements also include the deployment unit. Each deployment unit may include one or more process components that are generally deployed together on a single computer system platform. Conversely, separate deployment units can be deployed on separate physical computing systems. The process components of one deployment unit can interact with those of another deployment unit using messages passed through one or more data communication networks or other suitable communication channels. Thus, a deployment unit deployed on a platform belonging to one business can interact with a deployment unit software entity deployed on a separate platform belonging to a different and unrelated business, allowing for business-to-business communication. More than one instance of a given deployment unit can execute at the same time, on the same computing system or on separate physical computing systems. This arrangement allows the functionality offered by the deployment unit to be scaled to meet demand by creating as many instances as needed.

Since interaction between deployment units is through process component operations, one deployment unit can be replaced by other another deployment unit as long as the new deployment unit supports the operations depended upon by other deployment units as appropriate. Thus, while deployment units can depend on the external interfaces of process components in other deployment units, deployment units are not dependent on process component interaction within other deployment units. Similarly, process components that interact with other process components or external systems only through messages, e.g., as sent and received by operations, can also be replaced as long as the replacement generally supports the operations of the original.

Services (or interfaces) may be provided in a flexible architecture to support varying criteria between services and systems. The flexible architecture may generally be provided by a service delivery business object. The system may be able to schedule a service asynchronously as necessary, or on a regular basis. Services may be planned according to a schedule manually or automatically. For example, a follow-up service may be scheduled automatically upon completing an initial service. In addition, flexible execution periods may be possible (e.g. hourly, daily, every three months, etc.). Each customer may plan the services on demand or reschedule service execution upon request.

FIG. 1 depicts a flow diagram 100 showing an example technique, perhaps implemented by systems similar to those disclosed herein. Initially, to generate the business object model, design engineers study the details of a business process, and model the business process using a "business scenario" (step 102). The business scenario identifies the steps performed by the different business entities during a business process. Thus, the business scenario is a complete representation of a clearly defined business process.

After creating the business scenario, the developers add details to each step of the business scenario (step 104). In particular, for each step of the business scenario, the developers identify the complete process steps performed by each business entity. A discrete portion of the business scenario reflects a "business transaction," and each business entity is referred to as a "component" of the business transaction. The developers also identify the messages that are transmitted between the components. A "process interaction model" represents the complete process steps between two components.

After creating the process interaction model, the developers create a "message choreography" (step 106), which depicts the messages transmitted between the two components in the process interaction model. The developers then represent the transmission of the messages between the components during a business process in a "business document flow" (step 108). Thus, the business document flow illustrates the flow of information between the business entities during a business process.

FIG. 2 depicts an example business document flow 200 for the process of purchasing a product or service. The business entities involved with the illustrative purchase process include Accounting 202, Payment 204, Invoicing 206, Supply Chain Execution ("SCE") 208, Supply Chain Planning ("SCP") 210, Fulfillment Coordination ("FC") 212, Supply Relationship Management ("SRM") 214, Supplier 216, and Bank 218. The business document flow 200 is divided into four different transactions: Preparation of Ordering ("Contract") 220, Ordering 222, Goods Receiving ("Delivery") 224, and Billing/Payment 226. In the business document flow, arrows 228 represent the transmittal of documents. Each document reflects a message transmitted between entities. One of ordinary skill in the art will appreciate that the messages transferred may be considered to be a communications protocol. The process flow follows the focus of control, which is depicted as a solid vertical line (e.g., 229) when the step is required, and a dotted vertical line (e.g., 230) when the step is optional.

During the Contract transaction 220, the SRM 214 sends a Source of Supply Notification 232 to the SCP 210. This step is optional, as illustrated by the optional control line 230 coupling this step to the remainder of the business document flow 200. During the Ordering transaction 222, the SCP 210 sends a Purchase Requirement Request 234 to the FC 212, which forwards a Purchase Requirement Request 236 to the SRM 214. The SRM 214 then sends a Purchase Requirement Confirmation 238 to the FC 212, and the FC 212 sends a Purchase Requirement Confirmation 240 to the SCP 210. The SRM 214 also sends a Purchase Order Request 242 to the Supplier 216, and sends Purchase Order Information 244 to the FC 212. The FC 212 then sends a Purchase Order Planning Notification 246 to the SCP 210. The Supplier 216, after receiving the Purchase Order Request 242, sends a Purchase Order Confirmation 248 to the SRM 214, which sends a Purchase Order Information confirmation message 254 to the FC 212, which sends a message 256 confirming the Purchase Order Planning Notification to the SCP 210. The SRM 214 then sends an Invoice Due Notification 258 to Invoicing 206.

During the Delivery transaction 224, the FC 212 sends a Delivery Execution Request 260 to the SCE 208. The Supplier 216 could optionally (illustrated at control line 250) send a Dispatched Delivery Notification 252 to the SCE 208. The SCE 208 then sends a message 262 to the FC 212 notifying the FC 212 that the request for the Delivery Information was created. The FC 212 then sends a message 264 notifying the SRM 214 that the request for the Delivery Information was created. The FC 212 also sends a message 266 notifying the SCP 210 that the request for the Delivery Information was created. The SCE 208 sends a message 268 to the FC 212 when the goods have been set aside for delivery. The FC 212 sends a message 270 to the SRM 214 when the goods have been set aside for delivery. The FC 212 also sends a message 272 to the SCP 210 when the goods have been set aside for delivery.

The SCE 208 sends a message 274 to the FC 212 when the goods have been delivered. The FC 212 then sends a message 276 to the SRM 214 indicating that the goods have been delivered, and sends a message 278 to the SCP 210 indicating that the goods have been delivered. The SCE 208 then sends an Inventory Change Accounting Notification 280 to Accounting 202, and an Inventory Change Notification 282 to the SCP 210. The FC 212 sends an Invoice Due Notification 284 to Invoicing 206, and SCE 208 sends a Received Delivery Notification 286 to the Supplier 216.

During the Billing/Payment transaction 226, the Supplier 216 sends an Invoice Request 287 to Invoicing 206. Invoicing 206 then sends a Payment Due Notification 288 to Payment 204, a Tax Due Notification 289 to Payment 204, an Invoice Confirmation 290 to the Supplier 216, and an Invoice Accounting Notification 291 to Accounting 202. Payment 204 sends a Payment Request 292 to the Bank 218, and a Payment Requested Accounting Notification 293 to Accounting 202. Bank 218 sends a Bank Statement Information 296 to Payment 204. Payment 204 then sends a Payment Done Information 294 to Invoicing 206 and a Payment Done Accounting Notification 295 to Accounting 202.

Within a business document flow, business documents having the same or similar structures are marked. For example, in the business document flow 200 depicted in FIG. 2, Purchase Requirement Requests 234, 236 and Purchase Requirement Confirmations 238, 240 have the same structures. Thus, each of these business documents is marked with an "O6." Similarly, Purchase Order Request 242 and Purchase Order Confirmation 248 have the same structures. Thus, both documents are marked with an "O1." Each business document or message is based on a message type.

From the business document flow, the developers identify the business documents having identical or similar structures, and use these business documents to create the business object model (step 110). The business object model includes the objects contained within the business documents. These objects are reflected as packages containing related information, and are arranged in a hierarchical structure within the business object model, as discussed below.

Methods and systems consistent with the subject matter described herein then generate interfaces from the business object model (step 112). The heterogeneous programs use instantiations of these interfaces (called "business document objects" below) to create messages (step 114), which are sent to complete the business transaction (step 116). Business entities use these messages to exchange information with other business entities during an end-to-end business transaction. Since the business object model is shared by heterogeneous programs, the interfaces are consistent among these programs. The heterogeneous programs use these consistent interfaces to communicate in a consistent manner, thus facilitating the business transactions.

Standardized Business-to-Business ("B2B") messages are compliant with at least one of the e-business standards (i.e., they include the business-relevant fields of the standard). The e-business standards include, for example, RosettaNet for the high-tech industry, Chemical Industry Data Exchange ("CIDX"), Petroleum Industry Data Exchange ("PIDX") for the oil industry, UCCnet for trade, PapiNet for the paper industry, Odette for the automotive industry, HR-XML for human resources, and XML Common Business Library ("xCBL"). Thus, B2B messages enable simple integration of components in heterogeneous system landscapes. Application-to-Application ("A2A") messages often exceed the standards and thus may provide the benefit of the full functionality of application components. Although various steps of FIG. 1 were described as being performed manually, one skilled in the art will appreciate that such steps could be computer-assisted or performed entirely by a computer, including being performed by either hardware, software, or any other combination thereof.

B. Implementation Details

As discussed above, methods and systems consistent with the subject matter described herein create consistent interfaces by generating the interfaces from a business object model. Details regarding the creation of the business object model, the generation of an interface from the business object model, and the use of an interface generated from the business object model are provided below.

Figure 3A:
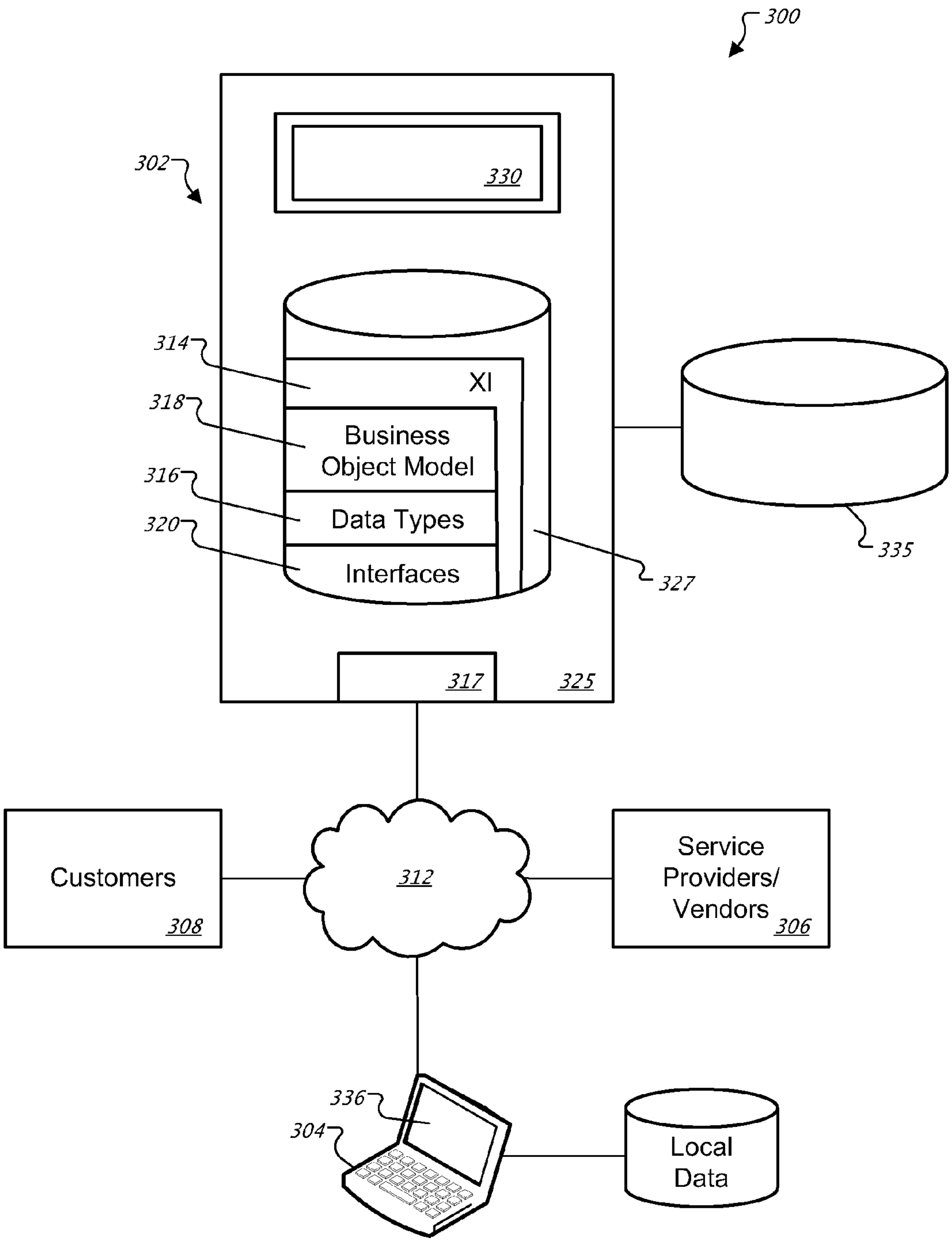
FIGS. 3A-B illustrate example environments implementing the transmission, receipt, and processing of data between heterogeneous applications in accordance with certain embodiments included in the present disclosure.

Turning to the illustrated embodiment in FIG. 3A, environment 300 includes or is communicably coupled (such as via a one-, bi- or multi-directional link or network) with server 302, one or more clients 304, one or more or vendors 306, one or more customers 308, at least some of which communicate across network 312. But, of course, this illustration is for example purposes only, and any distributed system or environment implementing one or more of the techniques described herein may be within the scope of this disclosure. Server 302 comprises an electronic computing device operable to receive, transmit, process and store data associated with environment 300. Generally, FIG. 3 provides merely one example of computers that may be used with the disclosure. Each computer is generally intended to encompass any suitable processing device. For example, although FIG. 3 illustrates one server 302 that may be used with the disclosure, environment 300 can be implemented using computers other than servers, as well as a server pool. Indeed, server 302 may be any computer or processing device such as, for example, a blade server, general-purpose personal computer (PC), Macintosh, workstation, Unix-based computer, or any other suitable device. In other words, the present disclosure contemplates computers other than general purpose computers as well as computers without conventional operating systems. Server 302 may be adapted to execute any operating system including Linux, UNIX, Windows Server, or any other suitable operating system. According to one embodiment, server 302 may also include or be communicably coupled with a web server and/or a mail server.

As illustrated (but not required), the server 302 is communicably coupled with a relatively remote repository 335 over a portion of the network 312. The repository 335 is any electronic storage facility, data processing center, or archive that may supplement or replace local memory (such as 327). The repository 335 may be a central database communicably coupled with the one or more servers 302 and the clients 304 via a virtual private network (VPN), SSH (Secure Shell) tunnel, or other secure network connection. The repository 335 may be physically or logically located at any appropriate location including in one of the example enterprises or off-shore, so long as it remains operable to store information associated with the environment 300 and communicate such data to the server 302 or at least a subset of plurality of the clients 304.

Illustrated server 302 includes local memory 327. Memory 327 may include any memory or database module and may take the form of volatile or non-volatile memory including, without limitation, magnetic media, optical media, random access memory (RAM), read-only memory (ROM), removable media, or any other suitable local or remote memory component. Illustrated memory 327 includes an exchange infrastructure ("XI") 314, which is an infrastructure that supports the technical interaction of business processes across heterogeneous system environments. XI 314 centralizes the communication between components within a business entity and between different business entities. When appropriate, XI 314 carries out the mapping between the messages. XI 314 integrates different versions of systems implemented on different platforms (e.g., Java and ABAP). XI 314 is based on an open architecture, and makes use of open standards, such as eXtensible Markup Language (XML)™ and JavA environments. XI 314 offers services that are useful in a heterogeneous and complex system landscape. In particular, XI 314 offers a runtime infrastructure for message exchange, configuration options for managing business processes and message flow, and options for transforming message contents between sender and receiver systems.

XI 314 stores data types 316, a business object model 318, and interfaces 320. The details regarding the business object model are described below. Data types 316 are the building blocks for the business object model 318. The business object model 318 is used to derive consistent interfaces 320. XI 314 allows for the exchange of information from a first company having one computer system to a second company having a second computer system over network 312 by using the standardized interfaces 320.

While not illustrated, memory 327 may also include business objects and any other appropriate data such as services, interfaces, VPN applications or services, firewall policies, a security or access log, print or other reporting files, HTML files or templates, data classes or object interfaces, child software applications or sub-systems, and others. This stored data may be stored in one or more logical or physical repositories. In some embodiments, the stored data (or pointers thereto) may be stored in one or more tables in a relational database described in terms of SQL statements or scripts. In the same or other embodiments, the stored data may also be formatted, stored, or defined as various data structures in text files, XML documents, Virtual Storage Access Method (VSAM) files, flat files, Btrieve files, comma-separated-value (CSV) files, internal variables, or one or more libraries. For example, a particular data service record may merely be a pointer to a particular piece of third party software stored remotely. In another example, a particular data service may be an internally stored software object usable by authenticated customers or internal development. In short, the stored data may comprise one table or file or a plurality of tables or files stored on one computer or across a plurality of computers in any appropriate format. Indeed, some or all of the stored data may be local or remote without departing from the scope of this disclosure and store any type of appropriate data.

Server 302 also includes processor 325. Processor 325 executes instructions and manipulates data to perform the operations of server 302 such as, for example, a central processing unit (CPU), a blade, an application specific integrated circuit (ASIC), or a field-programmable gate array (FPGA). Although FIG. 3 illustrates a single processor 325 in server 302, multiple processors 325 may be used according to particular needs and reference to processor 325 is meant to include multiple processors 325 where applicable. In the illustrated embodiment, processor 325 executes at least business application 330.

At a high level, business application 330 is any application, program, module, process, or other software that utilizes or facilitates the exchange of information via messages (or services) or the use of business objects. For example, application 130 may implement, utilize or otherwise leverage an enterprise service-oriented architecture (enterprise SOA), which may be considered a blueprint for an adaptable, flexible, and open IT architecture for developing services-based, enterprise-scale business solutions. This example enterprise service may be a series of web services combined with business logic that can be accessed and used repeatedly to support a particular business process. Aggregating web services into business-level enterprise services helps provide a more meaningful foundation for the task of automating enterprise-scale business scenarios Put simply, enterprise services help provide a holistic combination of actions that are semantically linked to complete the specific task, no matter how many cross-applications are involved. In certain cases, environment 300 may implement a composite application 330, as described below in FIG. 4. Regardless of the particular implementation, "software" may include software, firmware, wired or programmed hardware, or any combination thereof as appropriate. Indeed, application 330 may be written or described in any appropriate computer language including C, C++, Java, Visual Basic, assembler, Perl, any suitable version of 4GL, as well as others. For example, returning to the above mentioned composite application, the composite application portions may be implemented as Enterprise Java Beans (EJBs) or the design-time components may have the ability to generate run-time implementations into different platforms, such as J2EE (Java 2 Platform, Enterprise Edition), ABAP (Advanced Business Application Programming) objects, or Microsoft's .NET. It will be understood that while application 330 is illustrated in FIG. 4 as including various submodules, application 330 may include numerous other sub-modules or may instead be a single multi-tasked module that implements the various features and functionality through various objects, methods, or other processes. Further, while illustrated as internal to server 302, one or more processes associated with application 330 may be stored, referenced, or executed remotely. For example, a portion of application 330 may be a web service that is remotely called, while another portion of application 330 may be an interface object bundled for processing at remote client 304. Moreover, application 330 may be a child or sub-module of another software module or enterprise application (not illustrated) without departing from the scope of this disclosure. Indeed, application 330 may be a hosted solution that allows multiple related or third parties in different portions of the process to perform the respective processing.

More specifically, as illustrated in FIG. 4, application 330 may be a composite application, or an application built on other applications, that includes an object access layer (OAL) and a service layer. In this example, application 330 may execute or provide a number of application services, such as customer relationship management (CRM) systems, human resources management (HRM) systems, financial management (FM) systems, project management (PM) systems, knowledge management (KM) systems, and electronic file and mail systems. Such an object access layer is operable to exchange data with a plurality of enterprise base systems and to present the data to a composite application through a uniform interface. The example service layer is operable to provide services to the composite application. These layers may help the composite application to orchestrate a business process in synchronization with other existing processes (e.g., native processes of enterprise base systems) and leverage existing investments in the IT platform. Further, composite application 330 may run on a heterogeneous IT platform. In doing so, composite application may be cross-functional in that it may drive business processes across different applications, technologies, and organizations. Accordingly, composite application 330 may drive end-to-end business processes across heterogeneous systems or sub-systems. Application 330 may also include or be coupled with a persistence layer and one or more application system connectors. Such application system connectors enable data exchange and integration with enterprise sub-systems and may include an Enterprise Connector (EC) interface, an Internet Communication Manager/Internet Communication Framework (ICM/ICF) interface, an Encapsulated PostScript (EPS) interface, and/or other interfaces that provide Remote Function Call (RFC) capability. It will be understood that while this example describes a composite application 330, it may instead be a standalone or (relatively) simple software program. Regardless, application 330 may also perform processing automatically, which may indicate that the appropriate processing is substantially performed by at least one component of environment 300. It should be understood that automatically further contemplates any suitable administrator or other user interaction with application 330 or other components of environment 300 without departing from the scope of this disclosure.

Returning to FIG. 3, illustrated server 302 may also include interface 317 for communicating with other computer systems, such as clients 304, over network 312 in a client-server or other distributed environment. In certain embodiments, server 302 receives data from internal or external senders through interface 317 for storage in memory 327, for storage in DB 335, and/or processing by processor 325. Generally, interface 317 comprises logic encoded in software and/or hardware in a suitable combination and operable to communicate with network 312. More specifically, interface 317 may comprise software supporting one or more communications protocols associated with communications network 312 or hardware operable to communicate physical signals.

Network 312 facilitates wireless or wireline communication between computer server 302 and any other local or remote computer, such as clients 304. Network 312 may be all or a portion of an enterprise or secured network. In another example, network 312 may be a VPN merely between server 302 and client 304 across wireline or wireless link. Such an example wireless link may be via 802.11a, 802.11b, 802.11g, 802.20, WiMax, and many others. While illustrated as a single or continuous network, network 312 may be logically divided into various sub-nets or virtual networks without departing from the scope of this disclosure, so long as at least portion of network 312 may facilitate communications between server 302 and at least one client 304. For example, server 302 may be communicably coupled to one or more “local” repositories through one sub-net while communicably coupled to a particular client 304 or “remote” repositories through another. In other words, network 312 encompasses any internal or external network, networks, sub-network, or combination thereof operable to facilitate communications between various computing components in environment 300. Network 312 may communicate, for example, Internet Protocol (IP) packets, Frame Relay frames, Asynchronous Transfer Mode (ATM) cells, voice, video, data, and other suitable information between network addresses. Network 312 may include one or more local area networks (LANs), radio access networks (RANs), metropolitan area networks (MANs), wide area networks (WANs), all or a portion of the global computer network known as the Internet, and/or any other communication system or systems at one or more locations. In certain embodiments, network 312 may be a secure network associated with the enterprise and certain local or remote vendors 306 and customers 308. As used in this disclosure, customer 308 is any person, department, organization, small business, enterprise, or any other entity that may use or request others to use environment 300. As described above, vendors 306 also may be local or remote to customer 308. Indeed, a particular vendor 306 may provide some content to business application 330, while receiving or purchasing other content (at the same or different times) as customer 308. As illustrated, customer 308 and vendor 06 each typically perform some processing (such as uploading or purchasing content) using a computer, such as client 304.

Client 304 is any computing device operable to connect or communicate with server 302 or network 312 using any communication link. For example, client 304 is intended to encompass a personal computer, touch screen terminal, workstation, network computer, kiosk, wireless data port, smart phone, personal data assistant (PDA), one or more processors within these or other devices, or any other suitable processing device used by or for the benefit of business 308, vendor 306, or some other user or entity. At a high level, each client 304 includes or executes at least GUI 336 and comprises an electronic computing device operable to receive, transmit, process and store any appropriate data associated with environment 300. It will be understood that there may be any number of clients 304 communicably coupled to server 302. Further, “client 304,” “business,” “business analyst,” “end user,” and “user” may be used interchangeably as appropriate without departing from the scope of this disclosure. Moreover, for ease of illustration, each client 304 is described in terms of being used by one user. But this disclosure contemplates that many users may use one computer or that one user may use multiple computers. For example, client 304 may be a PDA operable to wirelessly connect with external or unsecured network. In another example, client 304 may comprise a laptop that includes an input device, such as a keypad, touch screen, mouse, or other device that can accept information, and an output device that conveys information associated with the operation of server 302 or clients 304, including digital data, visual information, or GUI 336. Both the input device and output device may include fixed or removable storage media such as a magnetic computer disk, CD-ROM, or other suitable media to both receive input from and provide output to users of clients 304 through the display, namely the client portion of GUI or application interface 336.

GUI 336 comprises a graphical user interface operable to allow the user of client 304 to interface with at least a portion of environment 300 for any suitable purpose, such as viewing application or other transaction data. Generally, GUI 336 provides the particular user with an efficient and user-friendly presentation of data provided by or communicated within environment 300. For example, GUI 336 may present the user with the components and information that is relevant to their task, increase reuse of such components, and facilitate a sizable developer community around those components. GUI 336 may comprise a plurality of customizable frames or views having interactive fields, pull-down lists, and buttons operated by the user. For example, GUI 336 is operable to display data involving business objects and interfaces in a user-friendly form based on the user context and the displayed data. In another example, GUI 336 is operable to display different levels and types of information involving business objects and interfaces based on the identified or supplied user role. GUI 336 may also present a plurality of portals or dashboards. For example, GUI 336 may display a portal that allows users to view, create, and manage historical and real-time reports including role-based reporting and such. Of course, such reports may be in any appropriate output format including PDF, HTML, and printable text. Real-time dashboards often provide table and graph information on the current state of the data, which may be supplemented by business objects and interfaces. It should be understood that the term graphical user interface may be used in the singular or in the plural to describe one or more graphical user interfaces and each of the displays of a particular graphical user interface. Indeed, reference to GUI 336 may indicate a reference to the front-end or a component of business application 330, as well as the particular interface accessible via client 304, as appropriate, without departing from the scope of this disclosure. Therefore, GUI 336 contemplates any graphical user interface, such as a generic web browser or touchscreen, that processes information in environment 300 and efficiently presents the results to the user. Server 302 can accept data from client 304 via the web browser (e.g., Microsoft Internet Explorer or Netscape Navigator) and return the appropriate HTML or XML responses to the browser using network 312.

Figure 3B:
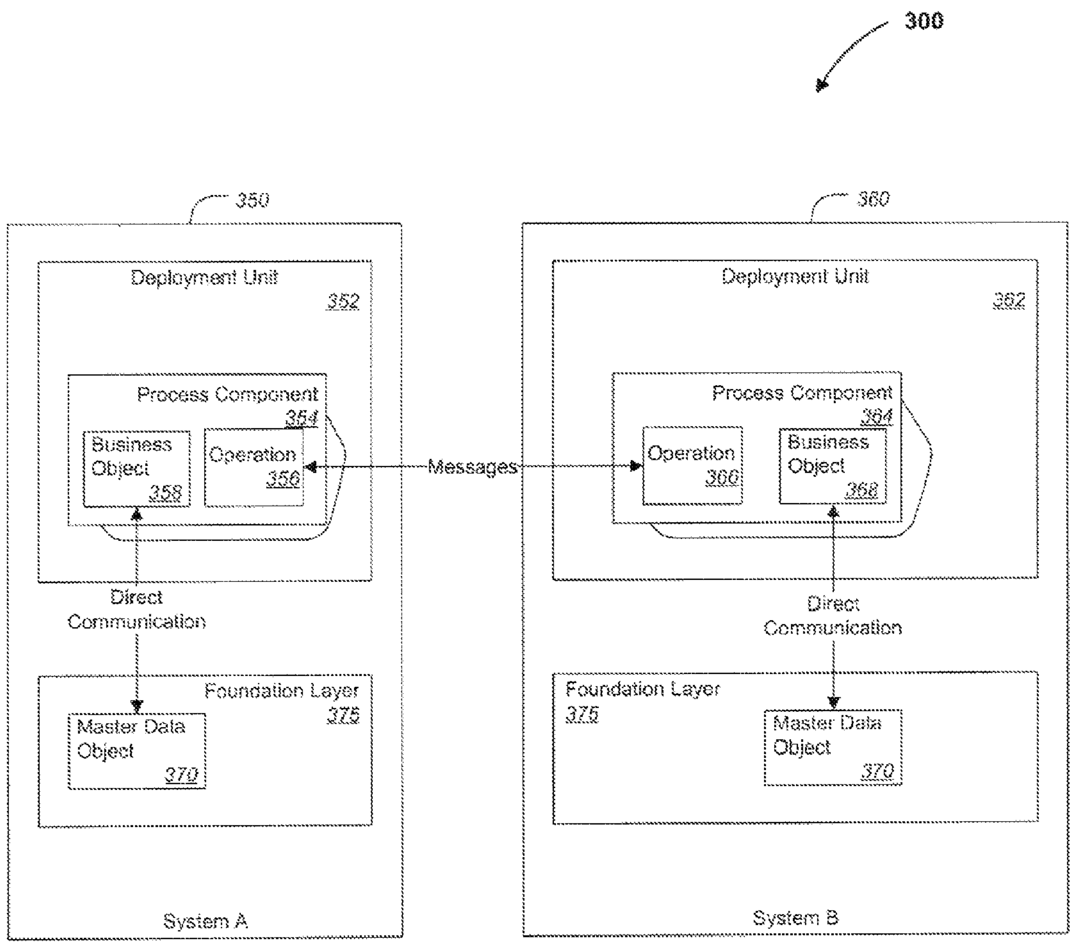

More generally in environment 300 as depicted in FIG. 3B, a Foundation Layer 375 can be deployed on multiple separate and distinct hardware platforms, e.g., System A 350 and System B 360, to support application software deployed as two or more deployment units distributed on the platforms, including deployment unit 352 deployed on System A and deployment unit 362 deployed on System B. In this example, the foundation layer can be used to support application software deployed in an application layer. In particular, the foundation layer can be used in connection with application software implemented in accordance with a software architecture that provides a suite of enterprise service operations having various application functionality. In some implementations, the application software is implemented to be deployed on an application platform that includes a foundation layer that contains all fundamental entities that can used from multiple deployment units. These entities can be process components, business objects, and reuse service components. A reuse service component is a piece of software that is reused in different transactions. A reuse service component is used by its defined interfaces, which can be, e.g., local APIs or service interfaces. As explained above, process components in separate deployment units interact through service operations, as illustrated by messages passing between service operations 356 and 366, which are implemented in process components 354 and 364, respectively, which are included in deployment units 352 and 362, respectively. As also explained above, some form of direct communication is generally the form of interaction used between a business object, e.g., business object 358 and 368, of an application deployment unit and a business object, such as master data object 370, of the Foundation Layer 375.

Figure 5A:
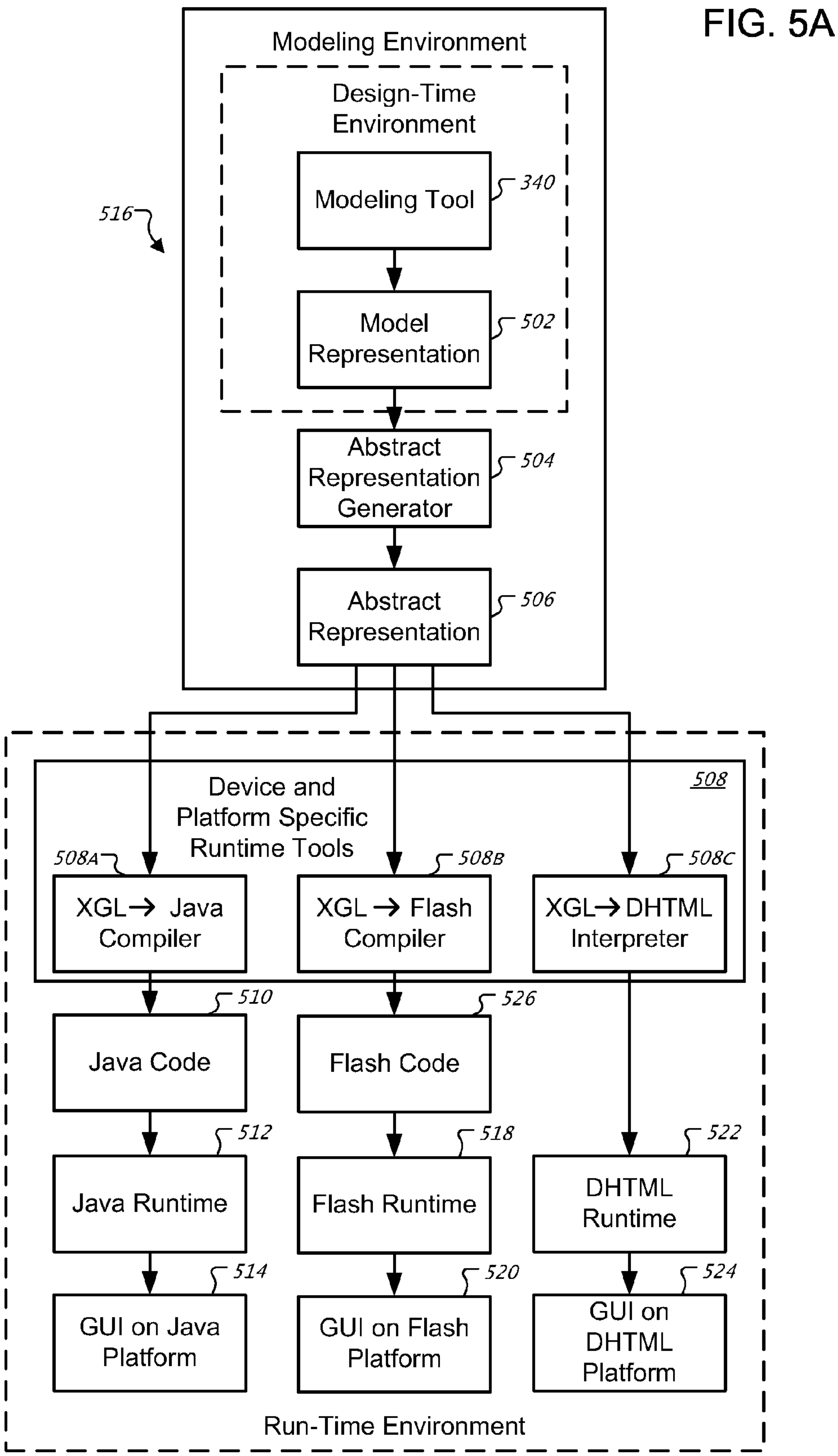
FIG. 5A depicts an example development environment in accordance with one embodiment of FIG. 1.

Various components of the present disclosure may be modeled using a model-driven environment. For example, the model-driven framework or environment may allow the developer to use simple drag-and-drop techniques to develop pattern-based or freestyle user interfaces and define the flow of data between them. The result could be an efficient, customized, visually rich online experience. In some cases, this model-driven development may accelerate the application development process and foster business-user self-service. It further enables business analysts or IT developers to compose visually rich applications that use analytic services, enterprise services, remote function calls (RFCs), APIs, and stored procedures. In addition, it may allow them to reuse existing applications and create content using a modeling process and a visual user interface instead of manual coding. FIG. 5A depicts an example modeling environment 516, namely a modeling environment, in accordance with one embodiment of the present disclosure. Thus, as illustrated in FIG. 5A, such a modeling environment 516 may implement techniques for decoupling models created during design-time from the runtime environment. In other words, model representations for GUIs created in a design time environment are decoupled from the runtime environment in which the GUIs are executed. Often in these environments, a declarative and executable representation for GUIs for applications is provided that is independent of any particular runtime platform, GUI framework, device, or programming language.

According to some embodiments, a modeler (or other analyst) may use the model-driven modeling environment 516 to create pattern-based or freestyle user interfaces using simple drag-and-drop services. Because this development may be model-driven, the modeler can typically compose an application using models of business objects without having to write much, if any, code. In some cases, this example modeling environment 516 may provide a personalized, secure interface that helps unify enterprise applications, information, and processes into a coherent, role-based portal experience. Further, the modeling environment 516 may allow the developer to access and share information and applications in a collaborative environment. In this way, virtual collaboration rooms allow developers to work together efficiently, regardless of where they are located, and may enable powerful and immediate communication that crosses organizational boundaries while enforcing security requirements. Indeed, the modeling environment 516 may provide a shared set of services for finding, organizing, and accessing unstructured content stored in third-party repositories and content management systems across various networks 312. Classification tools may automate the organization of information, while subject-matter experts and content managers can publish information to distinct user audiences. Regardless of the particular implementation or architecture, this modeling environment 516 may allow the developer to easily model hosted business objects 140 using this model-driven approach.

In certain embodiments, the modeling environment 516 may implement or utilize a generic, declarative, and executable GUI language (generally described as XGL). This example XGL is generally independent of any particular GUI framework or runtime platform. Further, XGL is normally not dependent on characteristics of a target device on which the graphic user interface is to be displayed and may also be independent of any programming language. XGL is used to generate a generic representation (occasionally referred to as the XGL representation or XGL-compliant representation) for a design-time model representation. The XGL representation is thus typically a device-independent representation of a GUI. The XGL representation is declarative in that the representation does not depend on any particular GUI framework, runtime platform, device, or programming language. The XGL representation can be executable and therefore can unambiguously encapsulate execution semantics for the GUI described by a model representation. In short, models of different types can be transformed to XGL representations.

The XGL representation may be used for generating representations of various different GUIs and supports various GUI features including full windowing and componentization support, rich data visualizations and animations, rich modes of data entry and user interactions, and flexible connectivity to any complex application data services. While a specific embodiment of XGL is discussed, various other types of XGLs may also be used in alternative embodiments. In other words, it will be understood that XGL is used for example description only and may be read to include any abstract or modeling language that can be generic, declarative, and executable.

Turning to the illustrated embodiment in FIG. 5A, modeling tool 340 may be used by a GUI designer or business analyst during the application design phase to create a model representation 502 for a GUI application. It will be understood that modeling environment 516 may include or be compatible with various different modeling tools 340 used to generate model representation 502. This model representation 502 may be a machine-readable representation of an application or a domain specific model. Model representation 502 generally encapsulates various design parameters related to the GUI such as GUI components, dependencies between the GUI components, inputs and outputs, and the like. Put another way, model representation 502 provides a form in which the one or more models can be persisted and transported, and possibly handled by various tools such as code generators, runtime interpreters, analysis and validation tools, merge tools, and the like. In one embodiment, model representation 502 maybe a collection of XML documents with a well-formed syntax.

Illustrated modeling environment 516 also includes an abstract representation generator (or XGL generator) 504 operable to generate an abstract representation (for example, XGL representation or XGL-compliant representation) 506 based upon model representation 502. Abstract representation generator 504 takes model representation 502 as input and outputs abstract representation 506 for the model representation. Model representation 502 may include multiple instances of various forms or types depending on the tool/language used for the modeling. In certain cases, these various different model representations may each be mapped to one or more abstract representations 506. Different types of model representations may be transformed or mapped to XGL representations. For each type of model representation, mapping rules may be provided for mapping the model representation to the XGL representation 506. Different mapping rules may be provided for mapping a model representation to an XGL representation.

This XGL representation 506 that is created from a model representation may then be used for processing in the runtime environment. For example, the XGL representation 506 may be used to generate a machine-executable runtime GUI (or some other runtime representation) that may be executed by a target device. As part of the runtime processing, the XGL representation 506 may be transformed into one or more runtime representations, which may indicate source code in a particular programming language, machine-executable code for a specific runtime environment, executable GUI, and so forth, which may be generated for specific runtime environments and devices. Since the XGL representation 506, rather than the design-time model representation, is used by the runtime environment, the design-time model representation is decoupled from the runtime environment. The XGL representation 506 can thus serve as the common ground or interface between design-time user interface modeling tools and a plurality of user interface runtime frameworks. It provides a self-contained, closed, and deterministic definition of all aspects of a graphical user interface in a device-independent and programming-language independent manner. Accordingly, abstract representation 506 generated for a model representation 502 is generally declarative and executable in that it provides a representation of the GUI of model representation 502 that is not dependent on any device or runtime platform, is not dependent on any programming language, and unambiguously encapsulates execution semantics for the GUI. The execution semantics may include, for example, identification of various components of the GUI, interpretation of connections between the various GUI components, information identifying the order of sequencing of events, rules governing dynamic behavior of the GUI, rules governing handling of values by the GUI, and the like. The abstract representation 506 is also not GUI runtime-platform specific. The abstract representation 506 provides a self-contained, closed, and deterministic definition of all aspects of a graphical user interface that is device independent and language independent.

Abstract representation 506 is such that the appearance and execution semantics of a GUI generated from the XGL representation work consistently on different target devices irrespective of the GUI capabilities of the target device and the target device platform. For example, the same XGL representation may be mapped to appropriate GUIs on devices of differing levels of GUI complexity (i.e., the same abstract representation may be used to generate a GUI for devices that support simple GUIs and for devices that can support complex GUIs), the GUI generated by the devices are consistent with each other in their appearance and behavior.

Abstract representation generator 504 may be configured to generate abstract representation 506 for models of different types, which may be created using different modeling tools 340. It will be understood that modeling environment 516 may include some, none, or other sub-modules or components as those shown in this example illustration. In other words, modeling environment 516 encompasses the design-time environment (with or without the abstract generator or the various representations), a modeling toolkit (such as 340) linked with a developer's space, or any other appropriate software operable to decouple models created during design-time from the runtime environment. Abstract representation 506 provides an interface between the design time environment and the runtime environment. As shown, this abstract representation 506 may then be used by runtime processing.

As part of runtime processing, modeling environment 516 may include various runtime tools 508 and may generate different types of runtime representations based upon the abstract representation 506. Examples of runtime representations include device or language-dependent (or specific) source code, runtime platform-specific machine-readable code, GUIs for a particular target device, and the like. The runtime tools 508 may include compilers, interpreters, source code generators, and other such tools that are configured to generate runtime platform-specific or target device-specific runtime representations of abstract representation 506. The runtime tool 508 may generate the runtime representation from abstract representation 506 using specific rules that map abstract representation 506 to a particular type of runtime representation. These mapping rules may be dependent on the type of runtime tool, characteristics of the target device to be used for displaying the GUI, runtime platform, and/or other factors. Accordingly, mapping rules may be provided for transforming the abstract representation 506 to any number of target runtime representations directed to one or more target GUI runtime platforms. For example, XGL-compliant code generators may conform to semantics of XGL, as described below. XGL-compliant code generators may ensure that the appearance and behavior of the generated user interfaces is preserved across a plurality of target GUI frameworks, while accommodating the differences in the intrinsic characteristics of each and also accommodating the different levels of capability of target devices.

For example, as depicted in example FIG. 5A, an XGL-to-Java compiler 508*a* may take abstract representation 506 as input and generate Java code 510 for execution by a target device comprising a Java runtime 512. Java runtime 512 may execute Java code 510 to generate or display a GUI 514 on a Java-platform target device. As another example, an XGL-to-Flash compiler 508*b* may take abstract representation 506 as input and generate Flash code 526 for execution by a target device comprising a Flash runtime 518. Flash runtime 518 may execute Flash code 516 to generate or display a GUI 520 on a target device comprising a Flash platform. As another example, an XGL-to-DHTML (dynamic HTML) interpreter 508*c* may take abstract representation 506 as input and generate DHTML statements (instructions) on the fly which are then interpreted by a DHTML runtime 522 to generate or display a GUI 524 on a target device comprising a DHTML platform.

It should be apparent that abstract representation 506 may be used to generate GUIs for Extensible Application Markup Language (XAML) or various other runtime platforms and devices. The same abstract representation 506 may be mapped to various runtime representations and device-specific and runtime platform-specific GUIs. In general, in the runtime environment, machine executable instructions specific to a runtime environment may be generated based upon the abstract representation 506 and executed to generate a GUI in the runtime environment. The same XGL representation may be used to generate machine executable instructions specific to different runtime environments and target devices.

According to certain embodiments, the process of mapping a model representation 502 to an abstract representation 506 and mapping an abstract representation 506 to some runtime representation may be automated. For example, design tools may automatically generate an abstract representation for the model representation using XGL and then use the XGL abstract representation to generate GUIs that are customized for specific runtime environments and devices. As previously indicated, mapping rules may be provided for mapping model representations to an XGL representation. Mapping rules may also be provided for mapping an XGL representation to a runtime platform-specific representation.

Since the runtime environment uses abstract representation 506 rather than model representation 502 for runtime processing, the model representation 502 that is created during design-time is decoupled from the runtime environment. Abstract representation 506 thus provides an interface between the modeling environment and the runtime environment. As a result, changes may be made to the design time environment, including changes to model representation 502 or changes that affect model representation 502, generally to not substantially affect or impact the runtime environment or tools used by the runtime environment. Likewise, changes may be made to the runtime environment generally to not substantially affect or impact the design time environment. A designer or other developer can thus concentrate on the design aspects and make changes to the design without having to worry about the runtime dependencies such as the target device platform or programming language dependencies.

Figure 5B:
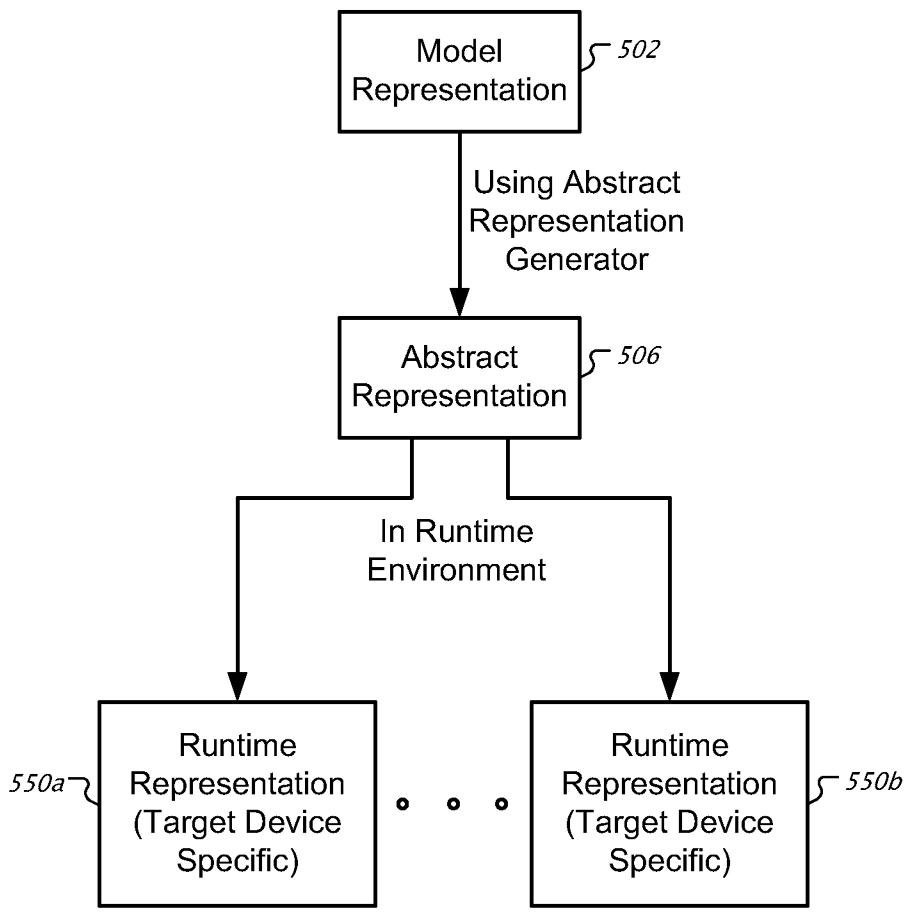
FIG. 5B depicts a simplified process for mapping a model representation to a runtime representation using the example development environment of FIG. 4A or some other development environment.

FIG. 5B depicts an example process for mapping a model representation 502 to a runtime representation using the example modeling environment 516 of FIG. 5A or some other modeling environment. Model representation 502 may comprise one or more model components and associated properties that describe a data object, such as hosted business objects and interfaces. As described above, at least one of these model components is based on or otherwise associated with these hosted business objects and interfaces. The abstract representation 506 is generated based upon model representation 502. Abstract representation 506 may be generated by the abstract representation generator 504. Abstract representation 506 comprises one or more abstract GUI components and properties associated with the abstract GUI components. As part of generation of abstract representation 506, the model GUI components and their associated properties from the model representation are mapped to abstract GUI components and properties associated with the abstract GUI components. Various mapping rules may be provided to facilitate the mapping. The abstract representation encapsulates both appearance and behavior of a GUI. Therefore, by mapping model components to abstract components, the abstract representation not only specifies the visual appearance of the GUI but also the behavior of the GUI, such as in response to events whether clicking/dragging or scrolling, interactions between GUI components and such.

One or more runtime representations 550*a*, including GUIs for specific runtime environment platforms, may be generated from abstract representation 506. A device-dependent runtime representation may be generated for a particular type of target device platform to be used for executing and displaying the GUI encapsulated by the abstract representation. The GUIs generated from abstract representation 506 may comprise various types of GUI elements such as buttons, windows, scrollbars, input boxes, etc. Rules may be provided for mapping an abstract representation to a particular runtime representation. Various mapping rules may be provided for different runtime environment platforms.

Methods and systems consistent with the subject matter described herein provide and use interfaces 320 derived from the business object model 318 suitable for use with more than one business area, for example different departments within a company such as finance, or marketing. Also, they are suitable across industries and across businesses. Interfaces 320 are used during an end-to-end business transaction to transfer business process information in an application-independent manner. For example the interfaces can be used for fulfilling a sales order.

1. Message Overview

To perform an end-to-end business transaction, consistent interfaces are used to create business documents that are sent within messages between heterogeneous programs or modules.

a) Message Categories

As depicted in FIG. 6, the communication between a sender 602 and a recipient 604 can be broken down into basic categories that describe the type of the information exchanged and simultaneously suggest the anticipated reaction of the recipient 604. A message category is a general business classification for the messages. Communication is sender-driven. In other words, the meaning of the message categories is established or formulated from the perspective of the sender 602. The message categories include information 606, notification 608, query 610, response 612, request 614, and confirmation 616.

(1) Information

Information 606 is a message sent from a sender 602 to a recipient 604 concerning a condition or a statement of affairs. No reply to information is expected. Information 606 is sent to make business partners or business applications aware of a situation. Information 606 is not compiled to be application-specific. Examples of "information" are an announcement, advertising, a report, planning information, and a message to the business warehouse.

(2) Notification

A notification 608 is a notice or message that is geared to a service. A sender 602 sends the notification 608 to a recipient 604. No reply is expected for a notification. For example, a billing notification relates to the preparation of an invoice while a dispatched delivery notification relates to preparation for receipt of goods.

(3) Query

A query 610 is a question from a sender 602 to a recipient 604 to which a response 612 is expected. A query 610 implies no assurance or obligation on the part of the sender 602. Examples of a query 610 are whether space is available on a specific flight or whether a specific product is available. These queries do not express the desire for reserving the flight or purchasing the product.

(4) Response

A response 612 is a reply to a query 610. The recipient 604 sends the response 612 to the sender 602. A response 612 generally implies no assurance or obligation on the part of the recipient 604. The sender 602 is not expected to reply. Instead, the process is concluded with the response 612. Depending on the business scenario, a response 612 also may include a commitment, i.e., an assurance or obligation on the part of the recipient 604. Examples of responses 612 are a response stating that space is available on a specific flight or that a specific product is available. With these responses, no reservation was made.

(5) Request

A request 614 is a binding requisition or requirement from a sender 602 to a recipient 604. Depending on the business scenario, the recipient 604 can respond to a request 614 with a confirmation 616. The request 614 is binding on the sender 602. In making the request 614, the sender 602 assumes, for example, an obligation to accept the services rendered in the request 614 under the reported conditions. Examples of a request 614 are a parking ticket, a purchase order, an order for delivery and a job application.

(6) Confirmation

A confirmation 616 is a binding reply that is generally made to a request 614. The recipient 604 sends the confirmation 616 to the sender 602. The information indicated in a confirmation 616, such as deadlines, products, quantities and prices, can deviate from the information of the preceding request 614. A request 614 and confirmation 616 may be used in negotiating processes. A negotiating process can consist of a series of several request 614 and confirmation 616 messages. The confirmation 616 is binding on the recipient 604. For example, 100 units of X may be ordered in a purchase order request; however, only the delivery of 80 units is confirmed in the associated purchase order confirmation.

b) Message Choreography

A message choreography is a template that specifies the sequence of messages between business entities during a given transaction. The sequence with the messages contained in it describes in general the message "lifecycle" as it proceeds between the business entities. If messages from a choreography are used in a business transaction, they appear in the transaction in the sequence determined by the choreography. This illustrates the template character of a choreography, i.e., during an actual transaction, it is not necessary for all messages of the choreography to appear. Those messages that are contained in the transaction, however, follow the sequence within the choreography. A business transaction is thus a derivation of a message choreography. The choreography makes it possible to determine the structure of the individual message types more precisely and distinguish them from one another.

2. Components of the Business Object Model

The overall structure of the business object model ensures the consistency of the interfaces that are derived from the business object model. The derivation ensures that the same business-related subject matter or concept is represented and structured in the same way in all interfaces.

The business object model defines the business-related concepts at a central location for a number of business transactions. In other words, it reflects the decisions made about modeling the business entities of the real world acting in business transactions across industries and business areas. The business object model is defined by the business objects and their relationship to each other (the overall net structure).

Each business object is generally a capsule with an internal hierarchical structure, behavior offered by its operations, and integrity constraints. Business objects are semantically disjoint, i.e., the same business information is represented once. In the business object model, the business objects are arranged in an ordering framework. From left to right, they are arranged according to their existence dependency to each other. For example, the customizing elements may be arranged on the left side of the business object model, the strategic elements may be arranged in the center of the business object model, and the operative elements may be arranged on the right side of the business object model. Similarly, the business objects are arranged from the top to the bottom based on defined order of the business areas, e.g., finance could be arranged at the top of the business object model with CRM below finance and SRM below CRM.

To ensure the consistency of interfaces, the business object model may be built using standardized data types as well as packages to group related elements together, and package templates and entity templates to specify the arrangement of packages and entities within the structure.

a) Data Types

Data types are used to type object entities and interfaces with a structure. This typing can include business semantic. For example, the data type BusinessTransactionDocumentID is a unique identifier for a document in a business transaction. Also, as an example, Data type BusinessTransactionDocumentParty contains the information that is exchanged in business documents about a party involved in a business transaction, and includes the party's identity, the party's address, the party's contact person and the contact person's address. BusinessTransactionDocumentParty also includes the role of the party, e.g., a buyer, seller, product recipient, or vendor.

The data types are based on Core Component Types ("CCTs"), which themselves are based on the World Wide Web Consortium ("W3C") data types. "Global" data types represent a business situation that is described by a fixed structure. Global data types include both context-neutral generic data types ("GDTs") and context-based context data types ("CDTs"). GDTs contain business semantics, but are application-neutral, i.e., without context. CDTs, on the other hand, are based on GDTs and form either a use-specific view of the GDTs, or a context-specific assembly of GDTs or CDTs. A message is typically constructed with reference to a use and is thus a use-specific assembly of GDTs and CDTs. The data types can be aggregated to complex data types.

To achieve a harmonization across business objects and interfaces, the same subject matter is typed with the same data type. For example, the data type "GeoCoordinates" is built using the data type "Measure" so that the measures in a GeoCoordinate (i.e., the latitude measure and the longitude measure) are represented the same as other "Measures" that appear in the business object model.

b) Entities

Entities are discrete business elements that are used during a business transaction. Entities are not to be confused with business entities or the components that interact to perform a transaction. Rather, "entities" are one of the layers of the business object model and the interfaces. For example, a Catalogue entity is used in a Catalogue Publication Request and a Purchase Order is used in a Purchase Order Request. These entities are created using the data types defined above to ensure the consistent representation of data throughout the entities.

c) Packages

Packages group the entities in the business object model and the resulting interfaces into groups of semantically associated information. Packages also may include "sub"-packages, i.e., the packages may be nested.

Packages may group elements together based on different factors, such as elements that occur together as a rule with regard to a business-related aspect. For example, as depicted in FIG. 7, in a Purchase Order, different information regarding the purchase order, such as the type of payment 702, and payment card 704, are grouped together via the PaymentInformation package 700.

Packages also may combine different components that result in a new object. For example, as depicted in FIG. 8, the components wheels 804, motor 806, and doors 808 are combined to form a composition "Car" 802. The "Car" package 800 includes the wheels, motor and doors as well as the composition "Car."

Another grouping within a package may be subtypes within a type. In these packages, the components are specialized forms of a generic package. For example, as depicted in FIG. 9, the components Car 904, Boat 906, and Truck 908 can be generalized by the generic term Vehicle 902 in Vehicle package 900. Vehicle in this case is the generic package 910, while Car 912, Boat 914, and Truck 916 are the specializations 918 of the generalized vehicle 910.

Packages also may be used to represent hierarchy levels. For example, as depicted in FIG. 10, the Item Package 1000 includes Item 1002 with subitem xxx 1004, subitem yyy 1006, and subitem zzz 1008.

Packages can be represented in the XML schema as a comment. One advantage of this grouping is that the document structure is easier to read and is more understandable. The names of these packages are assigned by including the object name in brackets with the suffix "Package." For example, as depicted in FIG. 11, Party package 1100 is enclosed by <PartyPackage> 1102 and </PartyPackage> 1104. Party package 1100 illustratively includes a Buyer Party 1106, identified by <BuyerParty> 1108 and </BuyerParty> 1110, and a Seller Party 1112, identified by <SellerParty> 1114 and </SellerParty>, etc.

d) Relationships

Relationships describe the interdependencies of the entities in the business object model, and are thus an integral part of the business object model.

(1) Cardinality of Relationships

FIG. 12 depicts a graphical representation of the cardinalities between two entities. The cardinality between a first entity and a second entity identifies the number of second entities that could possibly exist for each first entity. Thus, a 1:c cardinality 1200 between entities A 1202 and X 1204 indicates that for each entity A 1202, there is either one or zero 1206 entity X 1204. A 1:1 cardinality 1208 between entities A 1210 and X 1212 indicates that for each entity A 1210, there is exactly one 1214 entity X 1212. A 1:n cardinality 1216 between entities A 1218 and X 1220 indicates that for each entity A 1218, there are one or more 1222 entity Xs 1220. A 1:cn cardinality 1224 between entities A 1226 and X 1228 indicates that for each entity A 1226, there are any number 1230 of entity Xs 1228 (i.e., 0 through n Xs for each A).

(2) Types of Relationships (a) Composition

A composition or hierarchical relationship type is a strong whole-part relationship which is used to describe the structure within an object. The parts, or dependent entities, represent a semantic refinement or partition of the whole, or less dependent entity. For example, as depicted in FIG. 13, the components 1302, wheels 1304, and doors 1306 may be combined to form the composite 1300 "Car" 1308 using the composition 1310. FIG. 14 depicts a graphical representation of the composition 1410 between composite Car 1408 and components wheel 1404 and door 1406.

(b) Aggregation

An aggregation or an aggregating relationship type is a weak whole-part relationship between two objects. The dependent object is created by the combination of one or several less dependent objects. For example, as depicted in FIG. 15, the properties of a competitor product 1500 are determined by a product 1502 and a competitor 1504. A hierarchical relationship 1506 exists between the product 1502 and the competitor product 1500 because the competitor product 1500 is a component of the product 1502. Therefore, the values of the attributes of the competitor product 1500 are determined by the product 1502. An aggregating relationship 1508 exists between the competitor 1504 and the competitor product 1500 because the competitor product 1500 is differentiated by the competitor 1504. Therefore the values of the attributes of the competitor product 1500 are determined by the competitor 1504.

(c) Association

Figure 16:
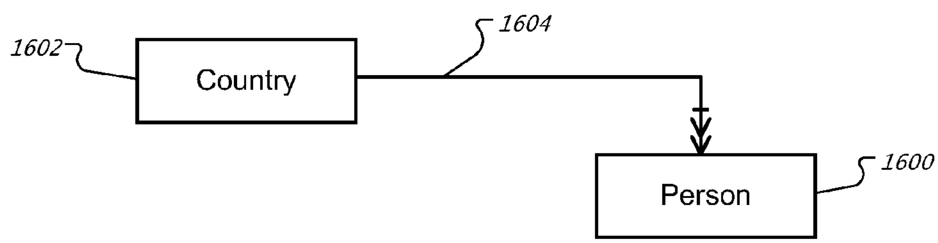
FIG. 16 depicts an example of an association in accordance with methods and systems consistent with the subject matter described herein.

An association or a referential relationship type describes a relationship between two objects in which the dependent object refers to the less dependent object. For example, as depicted in FIG. 16, a person 1600 has a nationality, and thus, has a reference to its country 1602 of origin. There is an association 1604 between the country 1602 and the person 1600. The values of the attributes of the person 1600 are not determined by the country 1602.

(3) Specialization

Entity types may be divided into subtypes based on characteristics of the entity types. For example, FIG. 17 depicts an entity type "vehicle" 1700 specialized 1702 into subtypes "truck" 1704, "car" 1706, and "ship" 1708. These subtypes represent different aspects or the diversity of the entity type.

Subtypes may be defined based on related attributes. For example, although ships and cars are both vehicles, ships have an attribute, "draft," that is not found in cars. Subtypes also may be defined based on certain methods that can be applied to entities of this subtype and that modify such entities. For example, "drop anchor" can be applied to ships. If outgoing relationships to a specific object are restricted to a subset, then a subtype can be defined which reflects this subset.

As depicted in FIG. 18, specializations may further be characterized as complete specializations 1800 or incomplete specializations 1802. There is a complete specialization 1800 where each entity of the generalized type belongs to at least one subtype. With an incomplete specialization 1802, there is at least one entity that does not belong to a subtype. Specializations also may be disjoint 1804 or nondisjoint 1806. In a disjoint specialization 1804, each entity of the generalized type belongs to a maximum of one subtype. With a nondisjoint specialization 1806, one entity may belong to more than one subtype. As depicted in FIG. 18, four specialization categories result from the combination of the specialization characteristics.

e) Structural Patterns (1) Item

An item is an entity type which groups together features of another entity type. Thus, the features for the entity type chart of accounts are grouped together to form the entity type chart of accounts item. For example, a chart of accounts item is a category of values or value flows that can be recorded or represented in amounts of money in accounting, while a chart of accounts is a superordinate list of categories of values or value flows that is defined in accounting.

The cardinality between an entity type and its item is often either 1:n or 1:cn. For example, in the case of the entity type chart of accounts, there is a hierarchical relationship of the cardinality 1:n with the entity type chart of accounts item since a chart of accounts has at least one item in all cases.

(2) Hierarchy

A hierarchy describes the assignment of subordinate entities to superordinate entities and vice versa, where several entities of the same type are subordinate entities that have, at most, one directly superordinate entity. For example, in the hierarchy depicted in FIG. 19, entity B 1902 is subordinate to entity A 1900, resulting in the relationship (A,B) 1912. Similarly, entity C 1904 is subordinate to entity A 1900, resulting in the relationship (A,C) 1914. Entity D 1906 and entity E 1908 are subordinate to entity B 1902, resulting in the relationships (B,D) 1916 and (B,E) 1918, respectively. Entity F 1910 is subordinate to entity C 1904, resulting in the relationship (C,F) 1920.

Because each entity has at most one superordinate entity, the cardinality between a subordinate entity and its superordinate entity is 1:c. Similarly, each entity may have 0, 1 or many subordinate entities. Thus, the cardinality between a superordinate entity and its subordinate entity is 1:cn. FIG. 20 depicts a graphical representation of a Closing Report Structure Item hierarchy 2000 for a Closing Report Structure Item 2002. The hierarchy illustrates the 1:c cardinality 2004 between a subordinate entity and its superordinate entity, and the 1:cn cardinality 2006 between a superordinate entity and its subordinate entity.

3. Creation of the Business Object Model

Figure 21A:
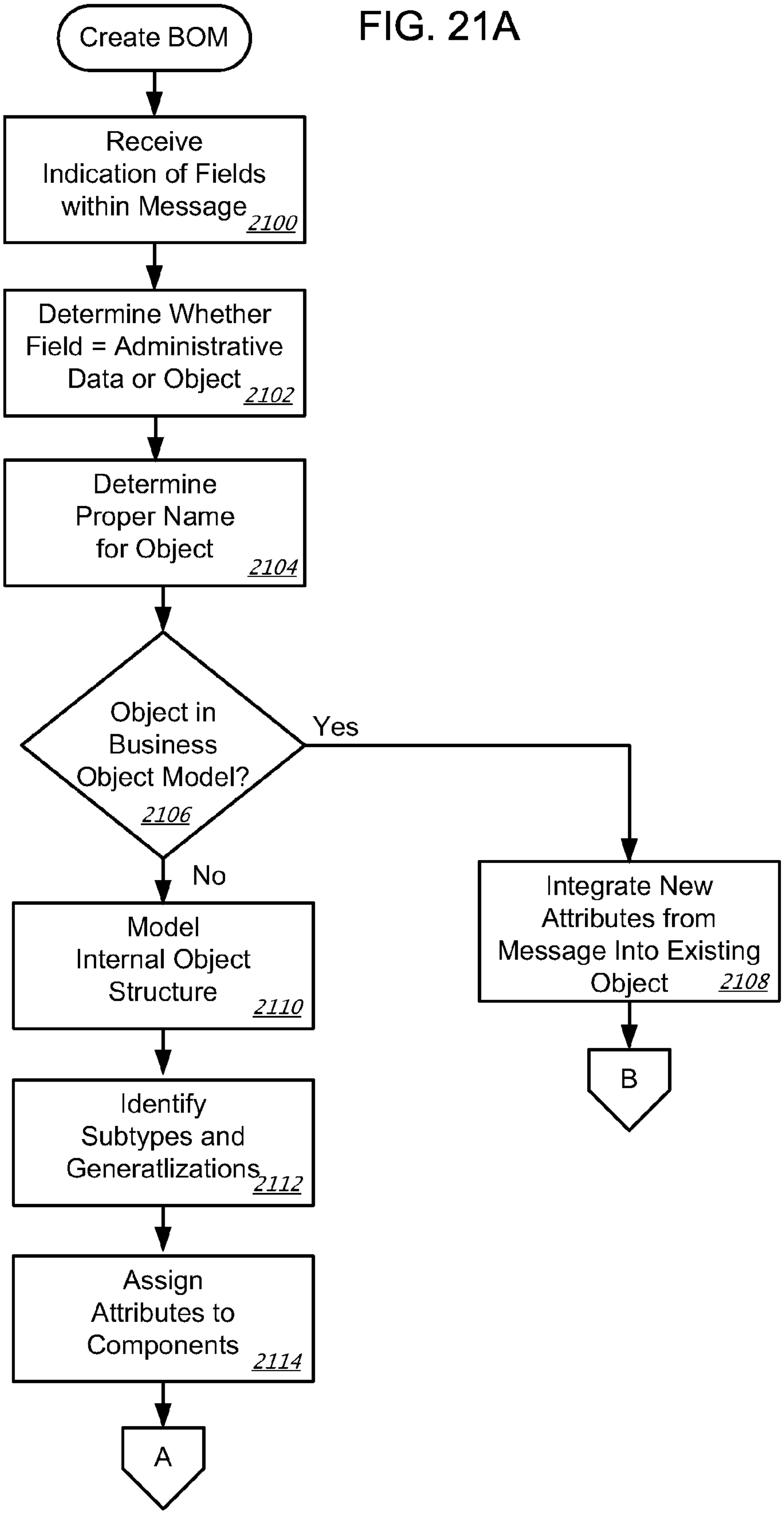
FIGS. 21A-B depict a flow diagram of the steps performed to create a business object model in accordance with methods and systems consistent with the subject matter described herein.
Figure 21B:
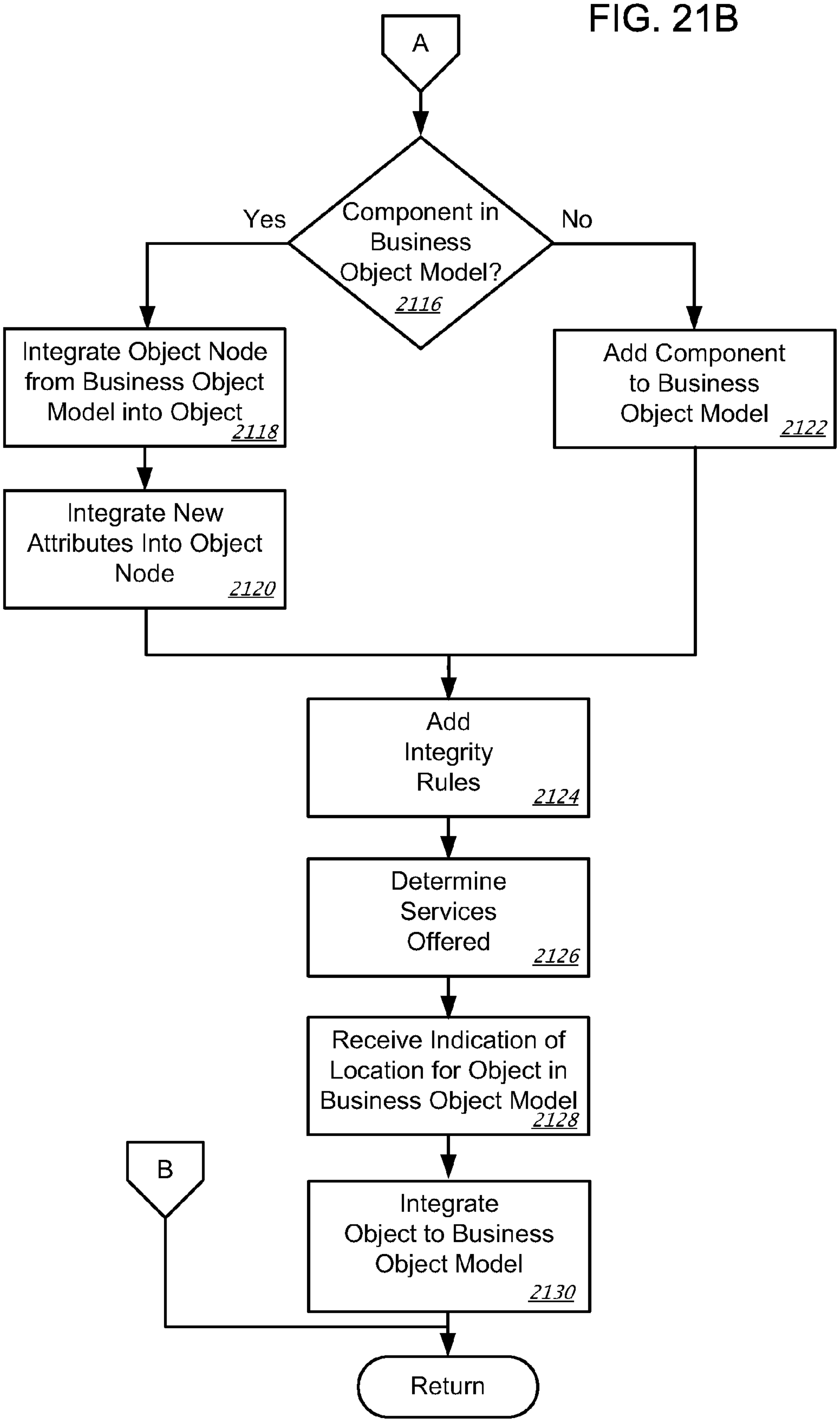

FIGS. 21A-B depict the steps performed using methods and systems consistent with the subject matter described herein to create a business object model. Although some steps are described as being performed by a computer, these steps may alternatively be performed manually, or computer-assisted, or any combination thereof. Likewise, although some steps are described as being performed by a computer, these steps may also be computer-assisted, or performed manually, or any combination thereof.

As discussed above, the designers create message choreographies that specify the sequence of messages between business entities during a transaction. After identifying the messages, the developers identify the fields contained in one of the messages (step 2100, FIG. 21A). The designers then determine whether each field relates to administrative data or is part of the object (step 2102). Thus, the first eleven fields identified below in the left column are related to administrative data, while the remaining fields are part of the object.

| | |
|---|---|
| MessageID | Admin |
| ReferenceID | |
| CreationDate | |
| SenderID | |
| AdditionalSenderID | |
| ContactPersonID | |
| SenderAddress | |
| RecipientID | |
| AdditionalRecipientID | |
| ContactPersonID | |
| RecipientAddress | |
| ID | Main Object |
| AdditionalID | |
| PostingDate | |
| LastChangeDate | |
| AcceptanceStatus | |
| Note | |

-continued

| |
|---|
| CompleteTransmission Indicator |
| Buyer |
| BuyerOrganisationName |
| Person Name |
| FunctionalTitle |
| DepartmentName |
| CountryCode |
| StreetPostalCode |
| POBox Postal Code |
| Company Postal Code |
| City Name |
| DistrictName |
| PO Box ID |
| PO Box Indicator |
| PO Box Country Code |
| PO Box Region Code |
| PO Box City Name |
| Street Name |
| House ID |
| Building ID |
| Floor ID |
| Room ID |
| Care Of Name |
| AddressDescription |
| Telefonnumber |
| MobileNumber |
| Facsimile |
| Email |
| Seller |
| SellerAddress |
| Location |
| LocationType |
| DeliveryItemGroupID |
| DeliveryPriority |
| DeliveryCondition |
| TransferLocation |
| NumberofPartialDelivery |
| QuantityTolerance |
| MaximumLeadTime |
| TransportServiceLevel |
| TranportCondition |
| TransportDescription |
| CashDiscountTerms |
| PaymentForm |
| PaymentCardID |
| PaymentCardReferenceID |
| SequenceID |
| Holder |
| ExpirationDate |
| AttachmentID |
| AttachmentFilename |
| DescriptionofMessage |
| ConfirmationDescriptionof Message |
| FollowUpActivity |
| ItemID |
| ParentItemID |
| HierarchyType |
| ProductID |
| ProductType |
| ProductNote |
| ProductCategoryID |
| Amount |
| BaseQuantity |
| ConfirmedAmount |
| ConfirmedBaseQuantity |
| ItemBuyer |
| ItemBuyerOrganisationName |
| Person Name |
| FunctionalTitle |
| DepartmentName |
| CountryCode |
| StreetPostalCode |
| POBox Postal Code |
| Company Postal Code |
| City Name |
| DistrictName |
| PO Box ID |

-continued

| |
|---|
| PO Box Indicator |
| PO Box Country Code |
| PO Box Region Code |
| PO Box City Name |
| Street Name |
| House ID |
| Building ID |
| Floor ID |
| Room ID |
| Care Of Name |
| AddressDescription |
| Telefonnumber |
| MobilNumber |
| Facsimile |
| Email |
| ItemSeller |
| ItemSellerAddress |
| ItemLocation |
| ItemLocationType |
| ItemDeliveryItemGroupID |
| ItemDeliveryPriority |
| ItemDeliveryCondition |
| ItemTransferLocation |
| ItemNumberofPartialDelivery |
| ItemQuantityTolerance |
| ItemMaximumLeadTime |
| ItemTransportServiceLevel |
| ItemTranportCondition |
| ItemTransportDescription |
| ContractReference |
| QuoteReference |
| CatalogueReference |
| ItemAttachmentID |
| ItemAttachmentFilename |
| ItemDescription |
| ScheduleLineID |
| DeliveryPeriod |
| Quantity |
| ConfirmedScheduleLineID |
| ConfirmedDeliveryPeriod |
| ConfirmedQuantity |

Next, the designers determine the proper name for the object according to the ISO 11179 naming standards (step 2104). In the example above, the proper name for the "Main Object" is "Purchase Order." After naming the object, the system that is creating the business object model determines whether the object already exists in the business object model (step 2106). If the object already exists, the system integrates new attributes from the message into the existing object (step 2108), and the process is complete.

If at step 2106 the system determines that the object does not exist in the business object model, the designers model the internal object structure (step 2110). To model the internal structure, the designers define the components. For the above example, the designers may define the components identified below.

| | | |
|---|---|---|
| ID | Purchase | |
| AdditionalID | Order | |
| PostingDate | | |
| LastChangeDate | | |
| AcceptanceStatus | | |
| Note | | |
| CompleteTransmission Indicator | | |
| Buyer | | Buyer |
| BuyerOrganisationName | | |
| Person Name | | |
| FunctionalTitle | | |
| DepartmentName | | |
| CountryCode | | |
| StreetPostalCode | | |

-continued

| | | |
|---|---|---|
| POBox Postal Code | | |
| Company Postal Code | | |
| City Name | | |
| DistrictName | | |
| PO Box ID | | |
| PO Box Indicator | | |
| PO Box Country Code | | |
| PO Box Region Code | | |
| PO Box City Name | | |
| Street Name | | |
| House ID | | |
| Building ID | | |
| Floor ID | | |
| Room ID | | |
| Care Of Name | | |
| AddressDescription | | |
| Telefonnumber | | |
| MobileNumber | | |
| Facsimile | | |
| Email | | |
| Seller | Seller | |
| SellerAddress | | |
| Location | Location | |
| LocationType | | |
| DeliveryItemGroupID | DeliveryTerms | |
| DeliveryPriority | | |
| DeliveryCondition | | |
| TransferLocation | | |
| NumberofPartialDelivery | | |
| QuantityTolerance | | |
| MaximumLeadTime | | |
| TransportServiceLevel | | |
| TranportCondition | | |
| TransportDescription | | |
| CashDiscountTerms | | |
| PaymentForm | Payment | |
| PaymentCardID | | |
| PaymentCardReferenceID | | |
| SequenceID | | |
| Holder | | |
| ExpirationDate | | |
| AttachmentID | | |
| AttachmentFilename | | |
| DescriptionofMessage | | |
| ConfirmationDescriptionof Message | | |
| FollowUpActivity | | |
| ItemID | Purchase Order | |
| ParentItemID | Item | |
| HierarchyType | | |
| ProductID | | Product |
| ProductType | | |
| ProductNote | | |
| ProductCategoryID | | ProductCategory |
| Amount | | |
| BaseQuantity | | |
| ConfirmedAmount | | |
| ConfirmedBaseQuantity | | |
| ItemBuyer | | Buyer |
| ItemBuyerOrganisation Name | | |
| Person Name | | |
| FunctionalTitle | | |
| DepartmentName | | |
| CountryCode | | |
| StreetPostalCode | | |
| POBox Postal Code | | |
| Company Postal Code | | |
| City Name | | |
| DistrictName | | |
| PO Box ID | | |
| PO Box Indicator | | |
| PO Box Country Code | | |
| PO Box Region Code | | |
| PO Box City Name | | |
| Street Name | | |
| House ID | | |
| Building ID | | |
| Floor ID | | |

| | |
|---|---|
| Room ID | |
| Care Of Name | |
| AddressDescription | |
| Telefonnumber | |
| MobilNumber | |
| Facsimile | |
| Email | |
| ItemSeller | Seller |
| ItemSellerAddress | |
| ItemLocation | Location |
| ItemLocationType | |
| ItemDeliveryItemGroupID | |
| ItemDeliveryPriority | |
| ItemDeliveryCondition | |
| ItemTransferLocation | |
| ItemNumberofPartial Delivery | |
| ItemQuantityTolerance | |
| ItemMaximumLeadTime | |
| ItemTransportServiceLevel | |

| | |
|---|---|
| ItemTranportCondition | |
| ItemTransportDescription | |
| ContractReference | Contract |
| QuoteReference | Quote |
| CatalogueReference | Catalogue |
| ItemAttachmentID | |
| ItemAttachmentFilename | |
| ItemDescription | |
| ScheduleLineID | |
| DeliveryPeriod | |
| Quantity | |
| ConfirmedScheduleLineID | |
| ConfirmedDeliveryPeriod | |
| ConfirmedQuantity | |

During the step of modeling the internal structure, the designers also model the complete internal structure by identifying the compositions of the components and the corresponding cardinalities, as shown below.

| | | | | |
|---|---|---|---|---|
| PurchaseOrder | | | | 1 |
| | Buyer | | | 0..1 |
| | | Address | | 0..1 |
| | | ContactPerson | | 0..1 |
| | | | Address | 0..1 |
| | Seller | | | 0..1 |
| | Location | | | 0..1 |
| | | Address | | 0..1 |
| | DeliveryTerms | | | 0..1 |
| | | Incoterms | | 0..1 |
| | | PartialDelivery | | 0..1 |
| | | QuantityTolerance | | 0..1 |
| | | Transport | | 0..1 |
| | CashDiscountTerms | | | 0..1 |
| | | MaximumCashDiscount | | 0..1 |
| | | NormalCashDiscount | | 0..1 |
| | PaymentForm | | | 0..1 |
| | | PaymentCard | | 0..1 |
| | Attachment | | | 0..n |
| | Description | | | 0..1 |
| | Confirmation | | | 0..1 |
| | Description | | | |
| | Item | | | 0..n |
| | | HierarchyRelationship | | 0..1 |
| | | Product | | 0..1 |
| | | ProductCategory | | 0..1 |
| | | Price | | 0..1 |
| | | | NetunitPrice | 0..1 |
| | | ConfirmedPrice | | 0..1 |
| | | | NetunitPrice | 0..1 |
| | | Buyer | | 0..1 |
| | | Seller | | 0..1 |
| | | Location | | 0..1 |
| | | DeliveryTerms | | 0..1 |
| | | Attachment | | 0..n |
| | | Description | | 0..1 |
| | | ConfirmationDescription | | 0..1 |
| | | ScheduleLine | | 0..n |
| | | | DeliveryPeriod | 1 |
| | | ConfirmedScheduleLine | | 0..n |

After modeling the internal object structure, the developers identify the subtypes and generalizations for all objects and components (step 2112). For example, the Purchase Order may have subtypes Purchase Order Update, Purchase Order Cancellation and Purchase Order Information. Purchase Order Update may include Purchase Order Request, Purchase Order Change, and Purchase Order Confirmation. Moreover, Party may be identified as the generalization of Buyer and Seller. The subtypes and generalizations for the above example are shown below.

| | | | | | |
|---|---|---|---|---|---|
| PurchaseOrder | | | | | 1 |
| | PurchaseOrder Update | | | | |
| | | PurchaseOrder Request | | | |
| | | PurchaseOrder Change | | | |
| | | PurchaseOrder Confirmation | | | |
| | PurchaseOrder Cancellation | | | | |
| | PurchaseOrder Information | | | | |
| | Party | | | | |
| | | BuyerParty | | | 0..1 |
| | | | Address | | 0..1 |
| | | | ContactPerson | | 0..1 |
| | | | | Address | 0..1 |
| | | SellerParty | | | 0..1 |
| | Location | | | | |
| | | ShipToLocation | | | 0..1 |
| | | | Address | | 0..1 |
| | | ShipFromLocation | | | 0..1 |
| | | | Address | | 0..1 |
| | DeliveryTerms | | | | 0..1 |
| | | Incoterms | | | 0..1 |
| | | PartialDelivery | | | 0..1 |
| | | QuantityTolerance | | | 0..1 |
| | | Transport | | | 0..1 |
| | CashDiscount Terms | | | | 0..1 |
| | | MaximumCash Discount | | | 0..1 |
| | | NormalCashDiscount | | | 0..1 |
| | PaymentForm | | | | 0..1 |
| | | PaymentCard | | | 0..1 |
| | Attachment | | | | 0..n |
| | Description | | | | 0..1 |
| | Confirmation Description | | | | 0..1 |
| | Item | | | | 0..n |
| | | HierarchyRelationship | | | 0..1 |
| | | Product | | | 0..1 |
| | | ProductCategory | | | 0..1 |
| | | Price | | | 0..1 |
| | | | NetunitPrice | | 0..1 |
| | | ConfirmedPrice | | | 0..1 |
| | | | NetunitPrice | | 0..1 |
| | | Party | | | |
| | | | BuyerParty | | 0..1 |
| | | | SellerParty | | 0..1 |
| | | Location | | | |
| | | | ShipTo Location | | 0..1 |
| | | | ShipFrom Location | | 0..1 |
| | | DeliveryTerms | | | 0..1 |
| | | Attachment | | | 0..n |
| | | Description | | | 0..1 |
| | | Confirmation Description | | | 0..1 |
| | | ScheduleLine | | | 0..n |
| | | | Delivery Period | | 1 |
| | | ConfirmedScheduleLine | | | 0..n |

After identifying the subtypes and generalizations, the developers assign the attributes to these components (step 2114). The attributes for a portion of the components are shown below.

| | | | | |
|---|---|---|---|---|
| Purchase Order | | | | 1 |
| | ID | | | 1 |
| | SellerID | | | 0..1 |
| | BuyerPosting DateTime | | | 0..1 |
| | BuyerLast ChangeDate Time | | | 0..1 |
| | SellerPosting DateTime | | | 0..1 |
| | SellerLast ChangeDate Time | | | 0..1 |
| | Acceptance StatusCode | | | 0..1 |
| | Note | | | 0..1 |
| | ItemList Complete Transmission Indicator | | | 0..1 |
| | BuyerParty | | | 0..1 |
| | | StandardID | | 0..n |
| | | BuyerID | | 0..1 |
| | | SellerID | | 0..1 |
| | | Address | | 0..1 |
| | | ContactPerson | | 0..1 |
| | | | BuyerID | 0..1 |
| | | | SellerID | 0..1 |
| | | | Address | 0..1 |
| | SellerParty | | | 0..1 |
| | Product RecipientParty | | | 0..1 |
| | VendorParty | | | 0..1 |
| | Manufacturer Party | | | 0..1 |
| | BillToParty | | | 0..1 |
| | PayerParty | | | 0..1 |
| | CarrierParty | | | 0..1 |
| | ShipTo Location | | | 0..1 |
| | | StandardID | | 0..n |
| | | BuyerID | | 0..1 |
| | | SellerID | | 0..1 |
| | | Address | | 0..1 |
| | ShipFrom Location | | | 0..1 |

The system then determines whether the component is one of the object nodes in the business object model (step 2116, FIG. 21B). If the system determines that the component is one of the object nodes in the business object model, the system integrates a reference to the corresponding object node from the business object model into the object (step 2118). In the above example, the system integrates the reference to the Buyer party represented by an ID and the reference to the ShipToLocation represented by an into the object, as shown below. The attributes that were formerly located in the PurchaseOrder object are now assigned to the new found object party. Thus, the attributes are removed from the PurchaseOrder object.

| | | |
|---|---|---|
| PurchaseOrder | | |
| | ID | |
| | SellerID | |
| | BuyerPostingDateTime | |
| | BuyerLastChangeDateTime | |
| | SellerPostingDateTime | |
| | SellerLastChangeDateTime | |

-continued

| | | |
|---|---|---|
| | AcceptanceStatusCode | |
| | Note | |
| | ItemListComplete | |
| | TransmissionIndicator | |
| | BuyerParty | |
| | | ID |
| | SellerParty | |
| | ProductRecipientParty | |
| | VendorParty | |
| | ManufacturerParty | |
| | BillToParty | |
| | PayerParty | |
| | CarrierParty | |
| | ShipToLocation | |
| | | ID |
| | ShipFromLocation | |

During the integration step, the designers classify the relationship (i.e., aggregation or association) between the object node and the object being integrated into the business object model. The system also integrates the new attributes into the object node (step 2120). If at step 2116, the system determines that the component is not in the business object model, the system adds the component to the business object model (step 2122).

Regardless of whether the component was in the business object model at step 2116, the next step in creating the business object model is to add the integrity rules (step 2124). There are several levels of integrity rules and constraints which should be described. These levels include consistency rules between attributes, consistency rules between components, and consistency rules to other objects. Next, the designers determine the services offered, which can be accessed via interfaces (step 2126). The services offered in the example above include PurchaseOrderCreateRequest, PurchaseOrderCancellationRequest, and PurchaseOrderReleaseRequest. The system then receives an indication of the location for the object in the business object model (step 2128). After receiving the indication of the location, the system integrates the object into the business object model (step 2130).

4. Structure of the Business Object Model

The business object model, which serves as the basis for the process of generating consistent interfaces, includes the elements contained within the interfaces. These elements are arranged in a hierarchical structure within the business object model.

5. Interfaces Derived from Business Object Model

Interfaces are the starting point of the communication between two business entities. The structure of each interface determines how one business entity communicates with another business entity. The business entities may act as a unified whole when, based on the business scenario, the business entities know what an interface contains from a business perspective and how to fill the individual elements or fields of the interface. Communication between components takes place via messages that contain business documents. The business document ensures a holistic business-related understanding for the recipient of the message. The business documents are created and accepted or consumed by interfaces, specifically by inbound and outbound interfaces. The interface structure and, hence, the structure of the business document are derived by a mapping rule. This mapping rule is known as "hierarchization." An interface structure thus has a hierarchical structure created based on the leading business object. The interface represents a usage-specific, hierarchical view of the underlying usage-neutral object model.

Figure 27A:
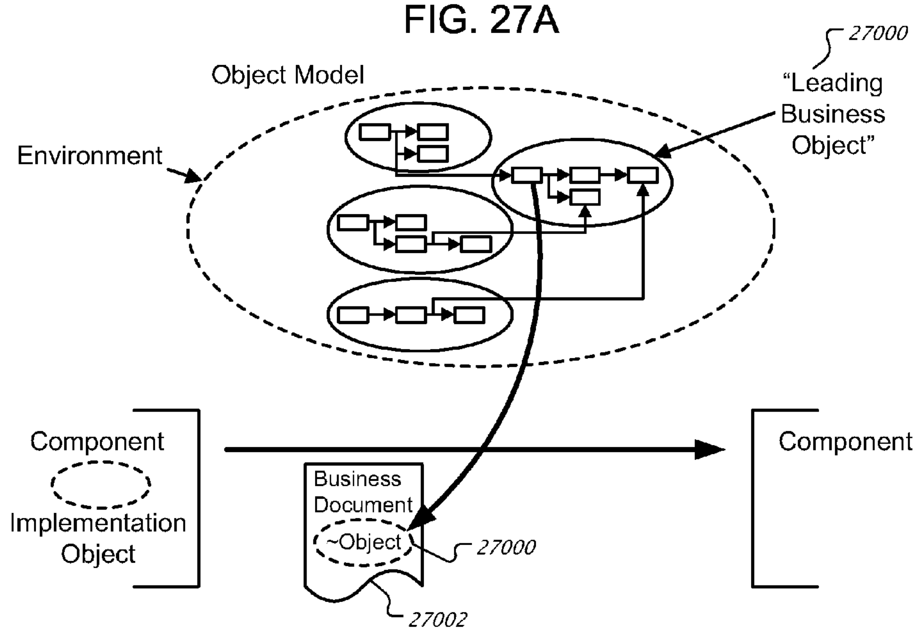
FIGS. 27A-E depict a hierarchization process in accordance with methods and systems consistent with the subject matter described herein.
Figure 27B:
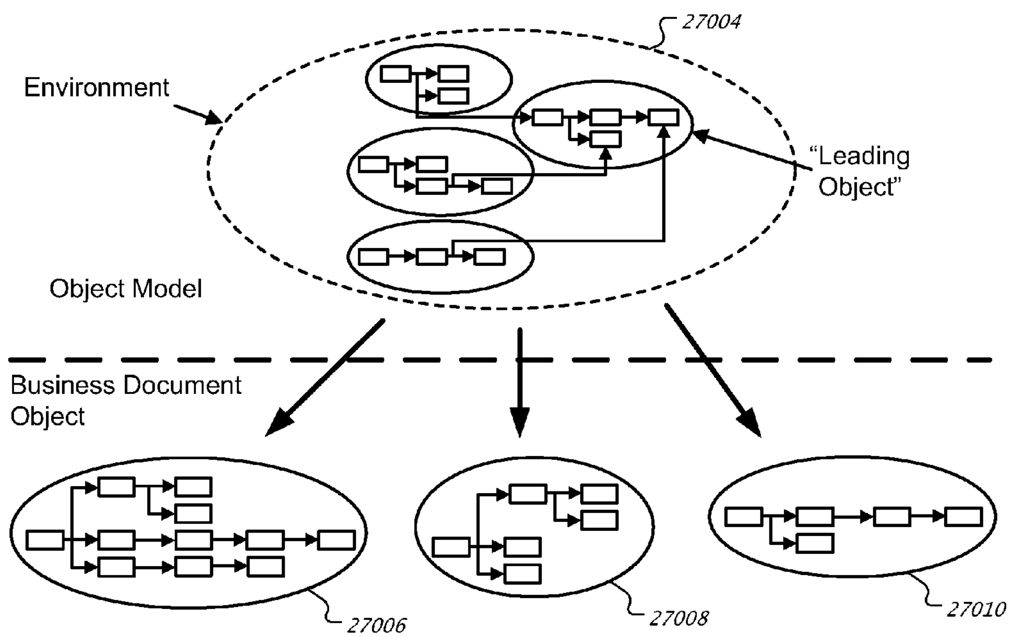

As illustrated in FIG. 27B, several business document objects 27006, 27008, and 27010 as overlapping views may be derived for a given leading object 27004. Each business document object results from the object model by hierarchization.

Figure 27C:
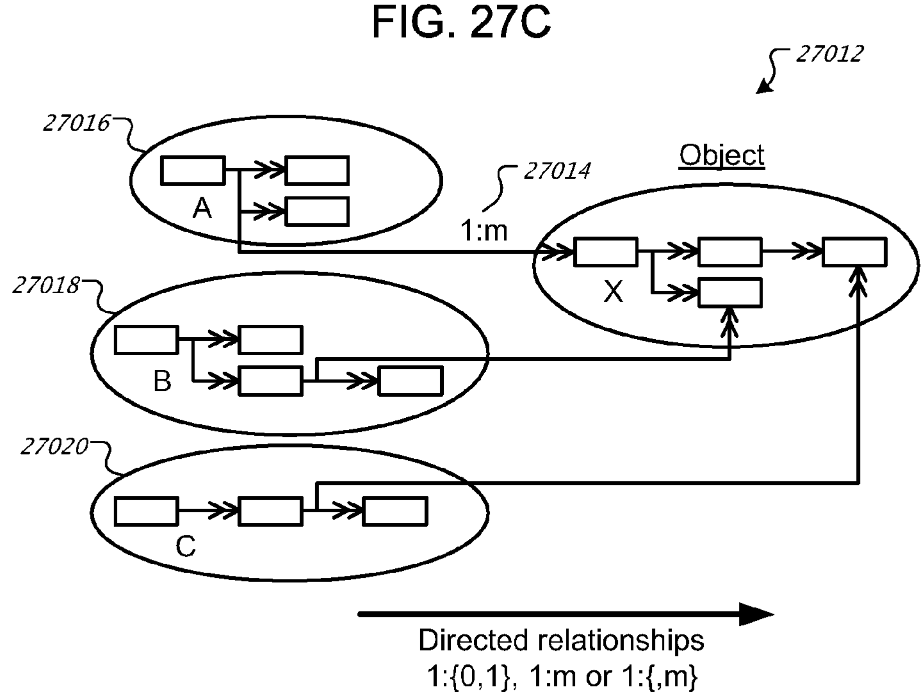

To illustrate the hierarchization process, FIG. 27C depicts an example of an object model 27012 (i.e., a portion of the business object model) that is used to derive a service operation signature (business document object structure). As depicted, leading object X 27014 in the object model 27012 is integrated in a net of object A 27016, object B 27018, and object C 27020. Initially, the parts of the leading object 27014 that are required for the business object document are adopted. In one variation, all parts required for a business document object are adopted from leading object 27014 (making such an operation a maximal service operation). Based on these parts, the relationships to the superordinate objects (i.e., objects A, B, and C from which object X depends) are inverted. In other words, these objects are adopted as dependent or subordinate objects in the new business document object.

For example, object A 27016, object B 27018, and object C 27020 have information that characterize object X. Because object A 27016, object B 27018, and object C 27020 are superordinate to leading object X 27014, the dependencies of these relationships change so that object A 27016, object B 27018, and object C 27020 become dependent and subordinate to leading object X 27014. This procedure is known as "derivation of the business document object by hierarchization."

Business-related objects generally have an internal structure (parts). This structure can be complex and reflect the individual parts of an object and their mutual dependency. When creating the operation signature, the internal structure of an object is strictly hierarchized. Thus, dependent parts keep their dependency structure, and relationships between the parts within the object that do not represent the hierarchical structure are resolved by prioritizing one of the relationships.

Relationships of object X to external objects that are referenced and whose information characterizes object X are added to the operation signature. Such a structure can be quite complex (see, for example, FIG. 27D). The cardinality to these referenced objects is adopted as 1:1 or 1:C, respectively. By this, the direction of the dependency changes. The required parts of this referenced object are adopted identically, both in their cardinality and in their dependency arrangement.

Figure 27D:
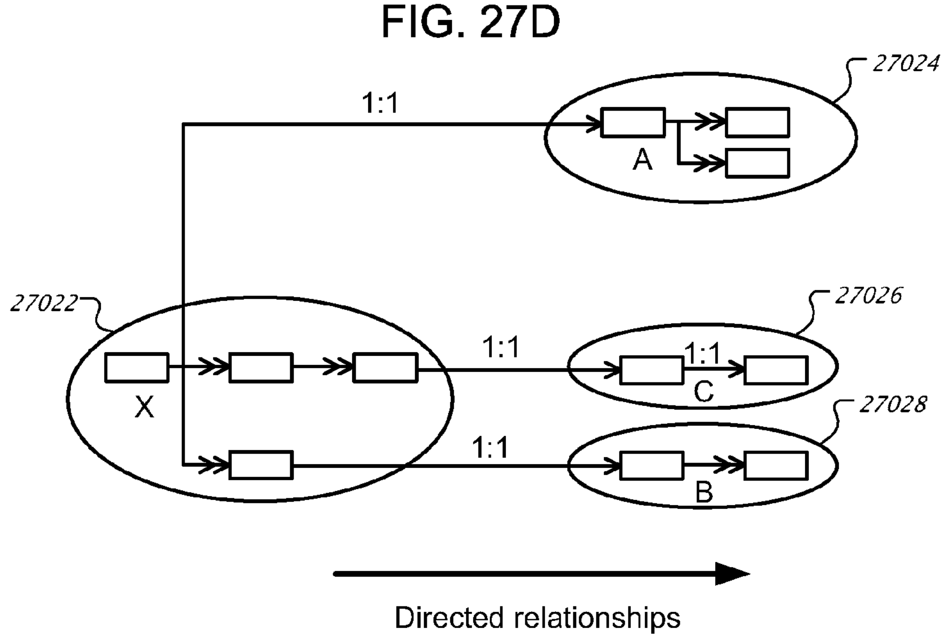

The newly created business document object contains all required information, including the incorporated master data information of the referenced objects. As depicted in FIG. 27D, components Xi in leading object X 27022 are adopted directly. The relationship of object X 27022 to object A 27024, object B 27028, and object C 27026 are inverted, and the parts required by these objects are added as objects that depend from object X 27022. As depicted, all of object A 27024 is adopted. B3 and B4 are adopted from object B 27028, but B1 is not adopted. From object C 27026, C2 and C1 are adopted, but C3 is not adopted.

Figure 27E:
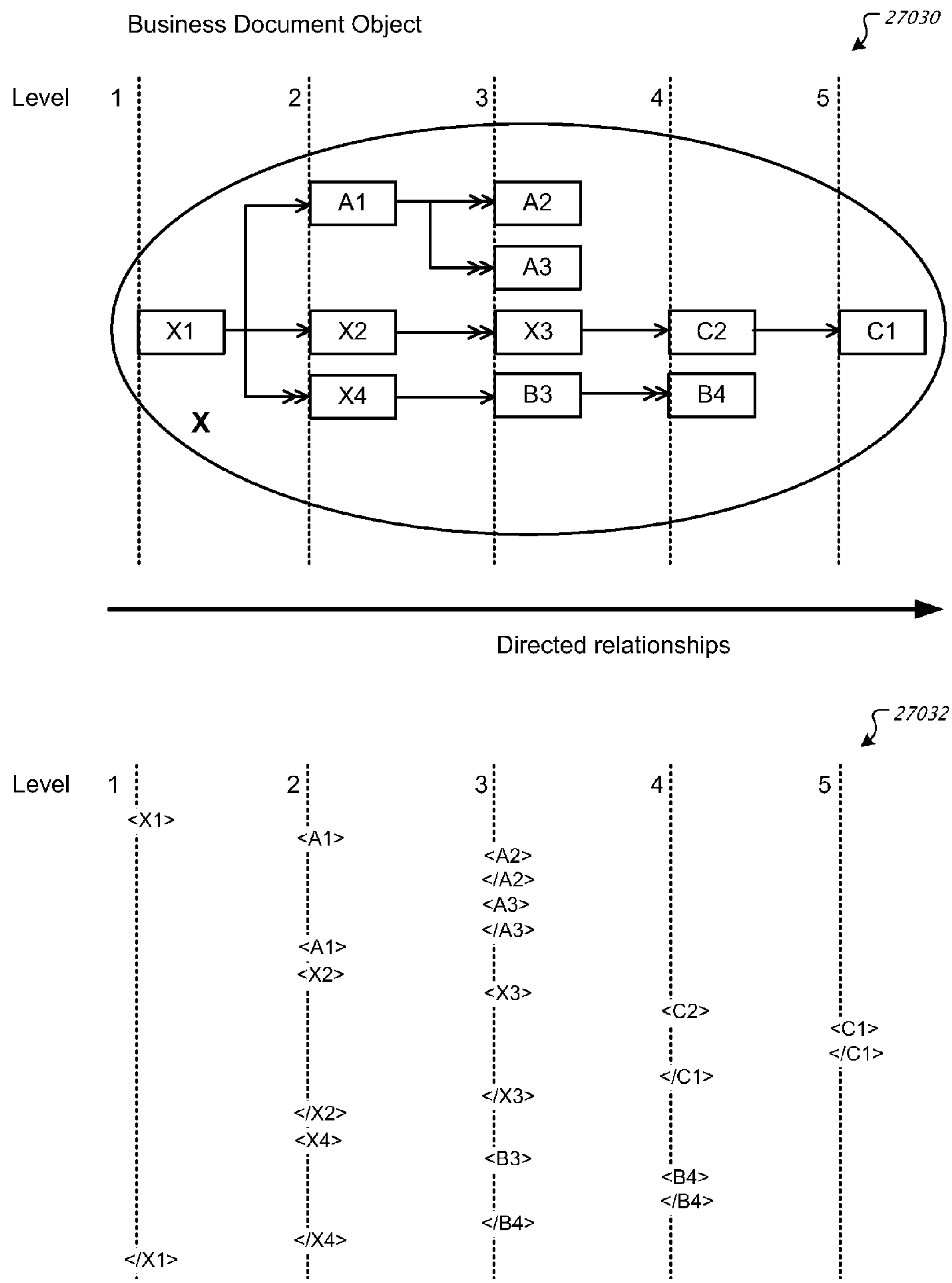

FIG. 27E depicts the business document object X 27030 created by this hierarchization process. As shown, the arrangement of the elements corresponds to their dependency levels, which directly leads to a corresponding representation as an XML structure 27032.

The following provides certain rules that can be adopted singly or in combination with regard to the hierarchization process:

- A business document object always refers to a leading business document object and is derived from this object.
- The name of the root entity in the business document entity is the name of the business object or the name of a specialization of the business object or the name of a service specific view onto the business object.
- The nodes and elements of the business object that are relevant (according to the semantics of the associated message type) are contained as entities and elements in the business document object.
- The name of a business document entity is predefined by the name of the corresponding business object node. The name of the superordinate entity is not repeated in the name of the business document entity. The "full" semantic name results from the concatenation of the entity names along the hierarchical structure of the business document object.
- The structure of the business document object is, except for deviations due to hierarchization, the same as the structure of the business object.
- The cardinalities of the business document object nodes and elements are adopted identically or more restrictively to the business document object.
- An object from which the leading business object is dependent can be adopted to the business document object. For this arrangement, the relationship is inverted, and the object (or its parts, respectively) are hierarchically subordinated in the business document object.
- Nodes in the business object representing generalized business information can be adopted as explicit entities to the business document object (generally speaking, multiply TypeCodes out). When this adoption occurs, the entities are named according to their more specific semantic (name of TypeCode becomes prefix).
  - Party nodes of the business object are modeled as explicit entities for each party role in the business document object. These nodes are given the name <Prefix><Party Role>Party, for example, BuyerParty, ItemBuyerParty.
  - BTDReference nodes are modeled as separate entities for each reference type in the business document object. These nodes are given the name <Qualifier><BO><Node>Reference, for example SalesOrderReference, OriginSalesOrderReference, SalesOrderItemReference.
  - A product node in the business object comprises all of the information on the Product, ProductCategory, and Batch. This information is modeled in the business document object as explicit entities for Product, ProductCategory, and Batch.
- Entities which are connected by a 1:1 relationship as a result of hierarchization can be combined to a single entity, if they are semantically equivalent. Such a combination can often occurs if a node in the business document object that results from an assignment node is removed because it does not have any elements.
- The message type structure is typed with data types.
  - Elements are typed by GDTs according to their business objects.
  - Aggregated levels are typed with message type specific data types (Intermediate Data Types), with their names being built according to the corresponding paths in the message type structure.
  - The whole message type structured is typed by a message data type with its name being built according to the root entity with the suffix "Message".

For the message type, the message category (e.g., information, notification, query, response, request, confirmation, etc.) is specified according to the suited transaction communication pattern.

In one variation, the derivation by hierarchization can be initiated by specifying a leading business object and a desired view relevant for a selected service operation. This view determines the business document object. The leading business object can be the source object, the target object, or a third object. Thereafter, the parts of the business object required for the view are determined. The parts are connected to the root node via a valid path along the hierarchy. Thereafter, one or more independent objects (object parts, respectively) referenced by the leading object which are relevant for the service may be determined (provided that a relationship exists between the leading object and the one or more independent objects).

Once the selection is finalized, relevant nodes of the leading object node that are structurally identical to the message type structure can then be adopted. If nodes are adopted from independent objects or object parts, the relationships to such independent objects or object parts are inverted. Linearization can occur such that a business object node containing certain TypeCodes is represented in the message type structure by explicit entities (an entity for each value of the TypeCode). The structure can be reduced by checking all 1:1 cardinalities in the message type structure. Entities can be combined if they are semantically equivalent, one of the entities carries no elements, or an entity solely results from an n:m assignment in the business object.

After the hierarchization is completed, information regarding transmission of the business document object (e.g., CompleteTransmissionIndicator, ActionCodes, message category, etc.) can be added. A standardized message header can be added to the message type structure and the message structure can be typed. Additionally, the message category for the message type can be designated.

Invoice Request and Invoice Confirmation are examples of interfaces. These invoice interfaces are used to exchange invoices and invoice confirmations between an invoicing party and an invoice recipient (such as between a seller and a buyer) in a B2B process. Companies can create invoices in electronic as well as in paper form. Traditional methods of communication, such as mail or fax, for invoicing are cost intensive, prone to error, and relatively slow, since the data is recorded manually. Electronic communication eliminates such problems. The motivating business scenarios for the Invoice Request and Invoice Confirmation interfaces are the Procure to Stock (PTS) and Sell from Stock (SFS) scenarios. In the PTS scenario, the parties use invoice interfaces to purchase and settle goods. In the SFS scenario, the parties use invoice interfaces to sell and invoice goods. The invoice interfaces directly integrate the applications implementing them and also form the basis for mapping data to widely-used XML standard formats such as RosettaNet, PIDX, xCBL, and CIDX.

The invoicing party may use two different messages to map a B2B invoicing process: (1) the invoicing party sends the message type InvoiceRequest to the invoice recipient to start a new invoicing process; and (2) the invoice recipient sends the message type InvoiceConfirmation to the invoicing party to confirm or reject an entire invoice or to temporarily assign it the status "pending."

An InvoiceRequest is a legally binding notification of claims or liabilities for delivered goods and rendered services—usually, a payment request for the particular goods and services. The message type InvoiceRequest is based on the message data type InvoiceMessage. The InvoiceRequest message (as defined) transfers invoices in the broader sense. This includes the specific invoice (request to settle a liability), the debit memo, and the credit memo.

InvoiceConfirmation is a response sent by the recipient to the invoicing party confirming or rejecting the entire invoice received or stating that it has been assigned temporarily the status "pending." The message type InvoiceConfirmation is based on the message data type InvoiceMessage. An InvoiceConfirmation is not mandatory in a B2B invoicing process, however, it automates collaborative processes and dispute management.

Usually, the invoice is created after it has been confirmed that the goods were delivered or the service was provided. The invoicing party (such as the seller) starts the invoicing process by sending an InvoiceRequest message. Upon receiving the InvoiceRequest message, the invoice recipient (for instance, the buyer) can use the InvoiceConfirmation message to completely accept or reject the invoice received or to temporarily assign it the status "pending." The InvoiceConfirmation is not a negotiation tool (as is the case in order management), since the options available are either to accept or reject the entire invoice. The invoice data in the InvoiceConfirmation message merely confirms that the invoice has been forwarded correctly and does not communicate any desired changes to the invoice. Therefore, the InvoiceConfirmation includes the precise invoice data that the invoice recipient received and checked. If the invoice recipient rejects an invoice, the invoicing party can send a new invoice after checking the reason for rejection (AcceptanceStatus and ConfirmationDescription at Invoice and InvoiceItem level). If the invoice recipient does not respond, the invoice is generally regarded as being accepted and the invoicing party can expect payment.

FIGS. 22A-F depict a flow diagram of the steps performed by methods and systems consistent with the subject matter described herein to generate an interface from the business object model. Although described as being performed by a computer, these steps may alternatively be performed manually, or using any combination thereof. The process begins when the system receives an indication of a package template from the designer, i.e., the designer provides a package template to the system (step 2200).

Package templates specify the arrangement of packages within a business transaction document. Package templates are used to define the overall structure of the messages sent between business entities. Methods and systems consistent with the subject matter described herein use package templates in conjunction with the business object model to derive the interfaces.

The system also receives an indication of the message type from the designer (step 2202). The system selects a package from the package template (step 2204), and receives an indication from the designer whether the package is required for the interface (step 2206). If the package is not required for the interface, the system removes the package from the package template (step 2208). The system then continues this analysis for the remaining packages within the package template (step 2210).

Figure 22A:
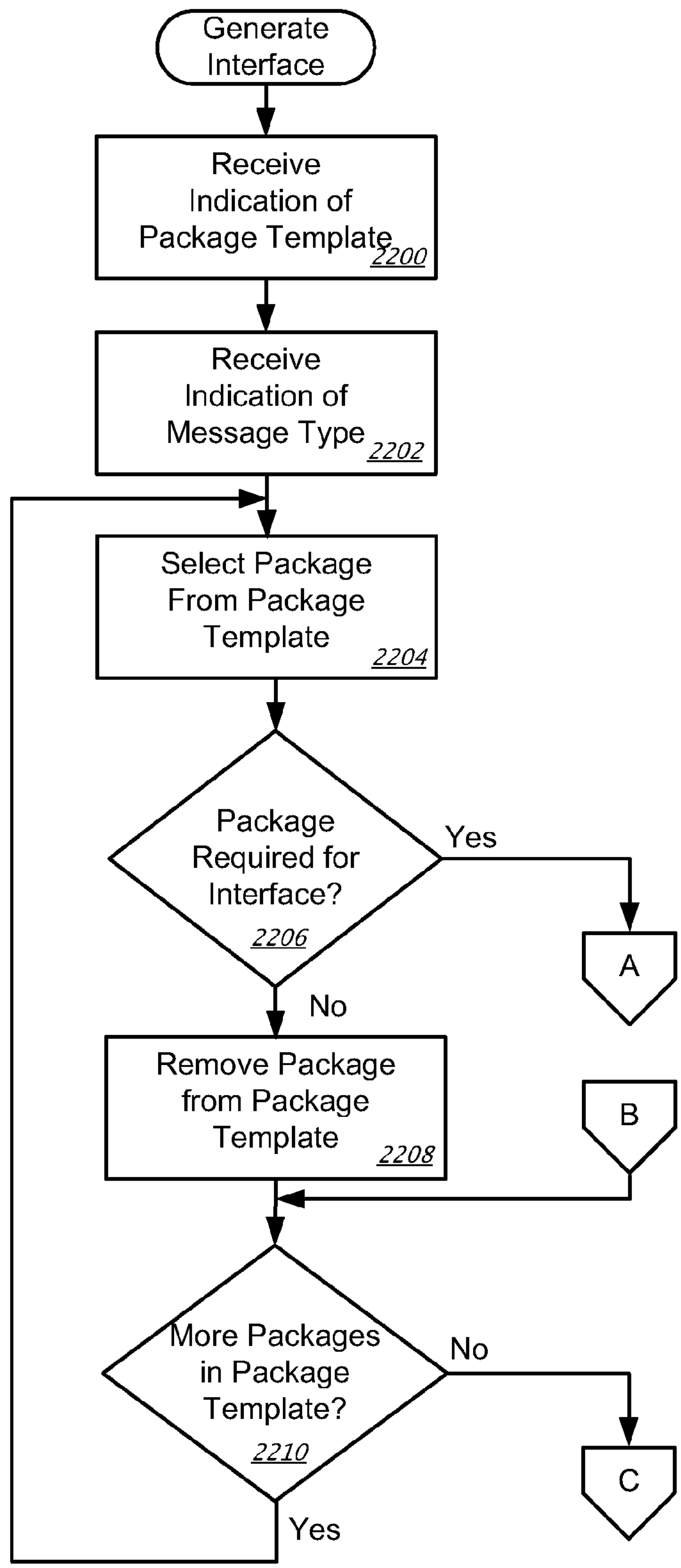
FIGS. 22A-F depict a flow diagram of the steps performed to generate an interface from the business object model in accordance with methods and systems consistent with the subject matter described herein.
Figure 22B:
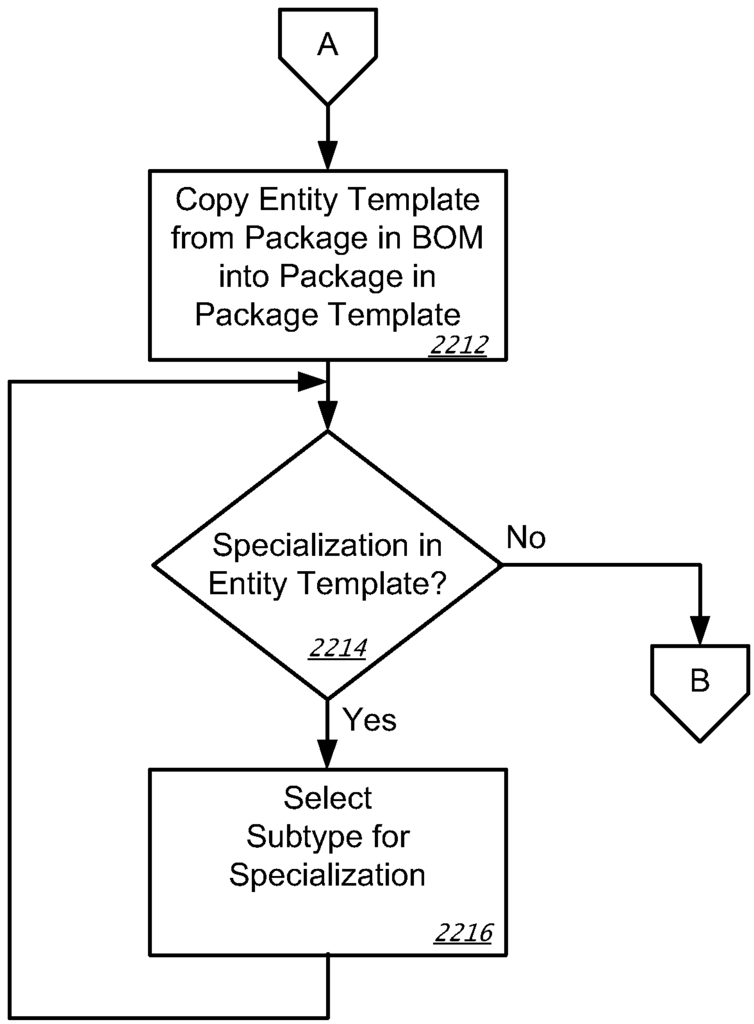
Figure 22C:
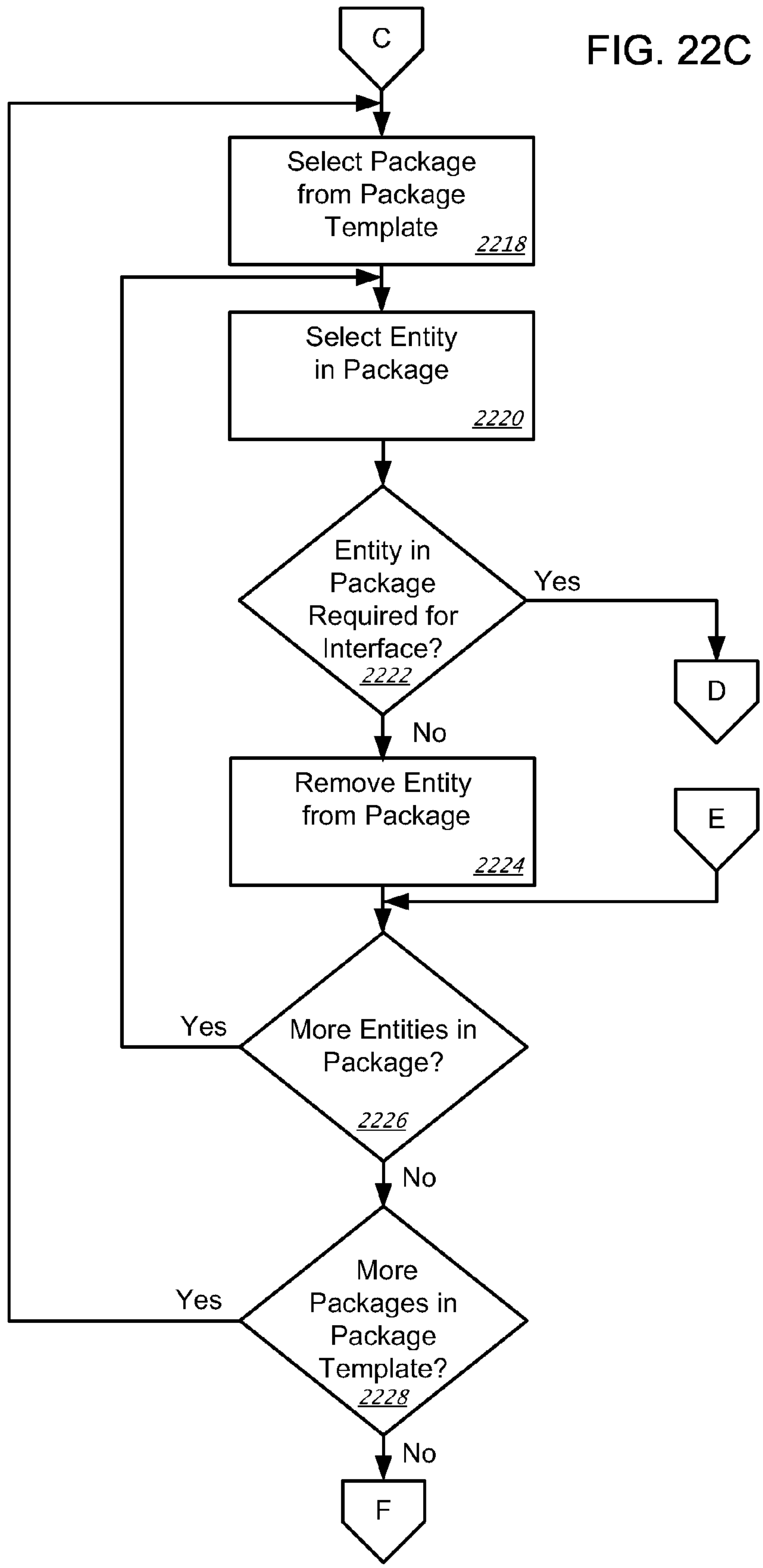

If, at step 2206, the package is required for the interface, the system copies the entity template from the package in the business object model into the package in the package template (step 2212, FIG. 22B). The system determines whether there is a specialization in the entity template (step 2214). If the system determines that there is a specialization in the entity template, the system selects a subtype for the specialization (step 2216). The system may either select the subtype for the specialization based on the message type, or it may receive this information from the designer. The system then determines whether there are any other specializations in the entity template (step 2214). When the system determines that there are no specializations in the entity template, the system continues this analysis for the remaining packages within the package template (step 2210, FIG. 22A).

At step 2210, after the system completes its analysis for the packages within the package template, the system selects one of the packages remaining in the package template (step 2218, FIG. 22C), and selects an entity from the package (step 2220). The system receives an indication from the designer whether the entity is required for the interface (step 2222). If the entity is not required for the interface, the system removes the entity from the package template (step 2224). The system then continues this analysis for the remaining entities within the package (step 2226), and for the remaining packages within the package template (step 2228).

Figure 22D:
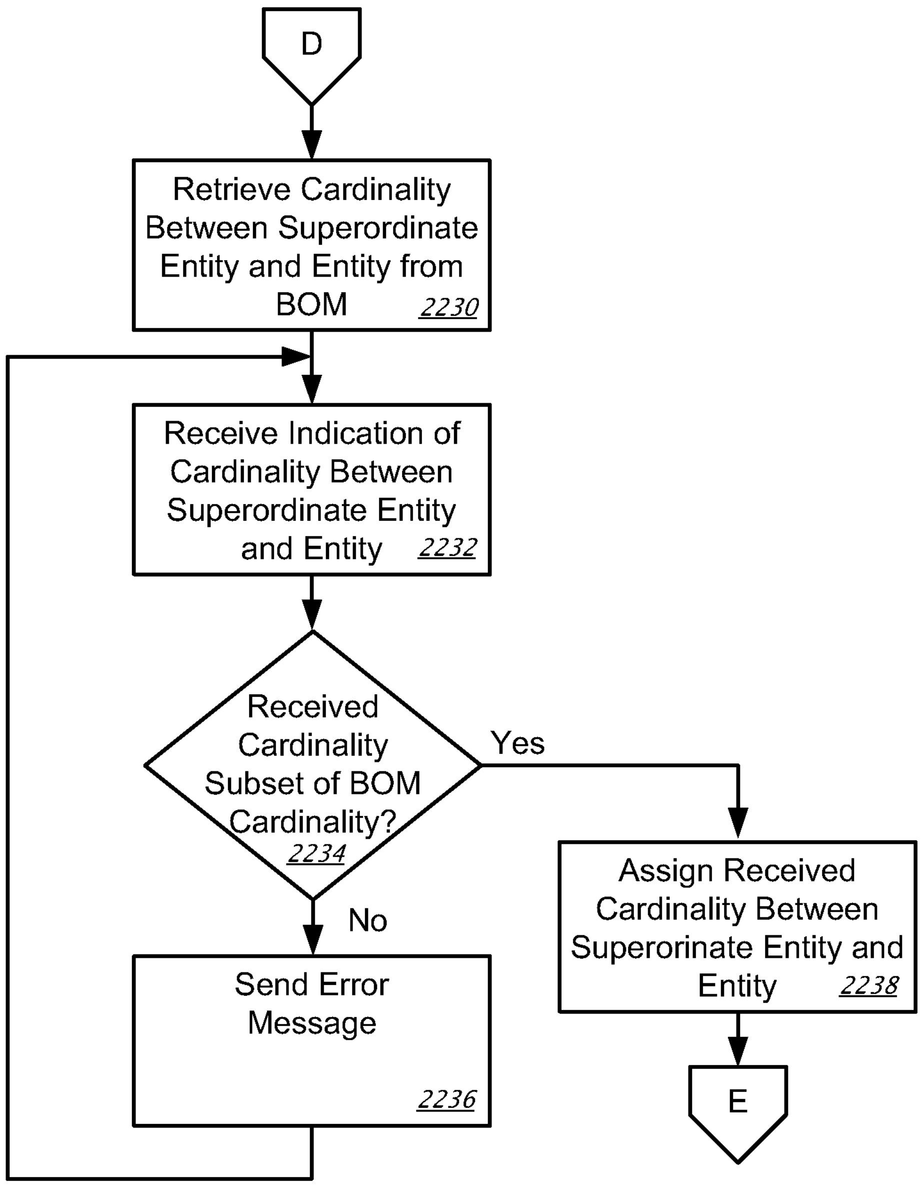

If, at step 2222, the entity is required for the interface, the system retrieves the cardinality between a superordinate entity and the entity from the business object model (step 2230, FIG. 22D). The system also receives an indication of the cardinality between the superordinate entity and the entity from the designer (step 2232). The system then determines whether the received cardinality is a subset of the business object model cardinality (step 2234). If the received cardinality is not a subset of the business object model cardinality, the system sends an error message to the designer (step 2236). If the received cardinality is a subset of the business object model cardinality, the system assigns the received cardinality as the cardinality between the superordinate entity and the entity (step 2238). The system then continues this analysis for the remaining entities within the package (step 2226, FIG. 22C), and for the remaining packages within the package template (step 2228).

Figure 22E:
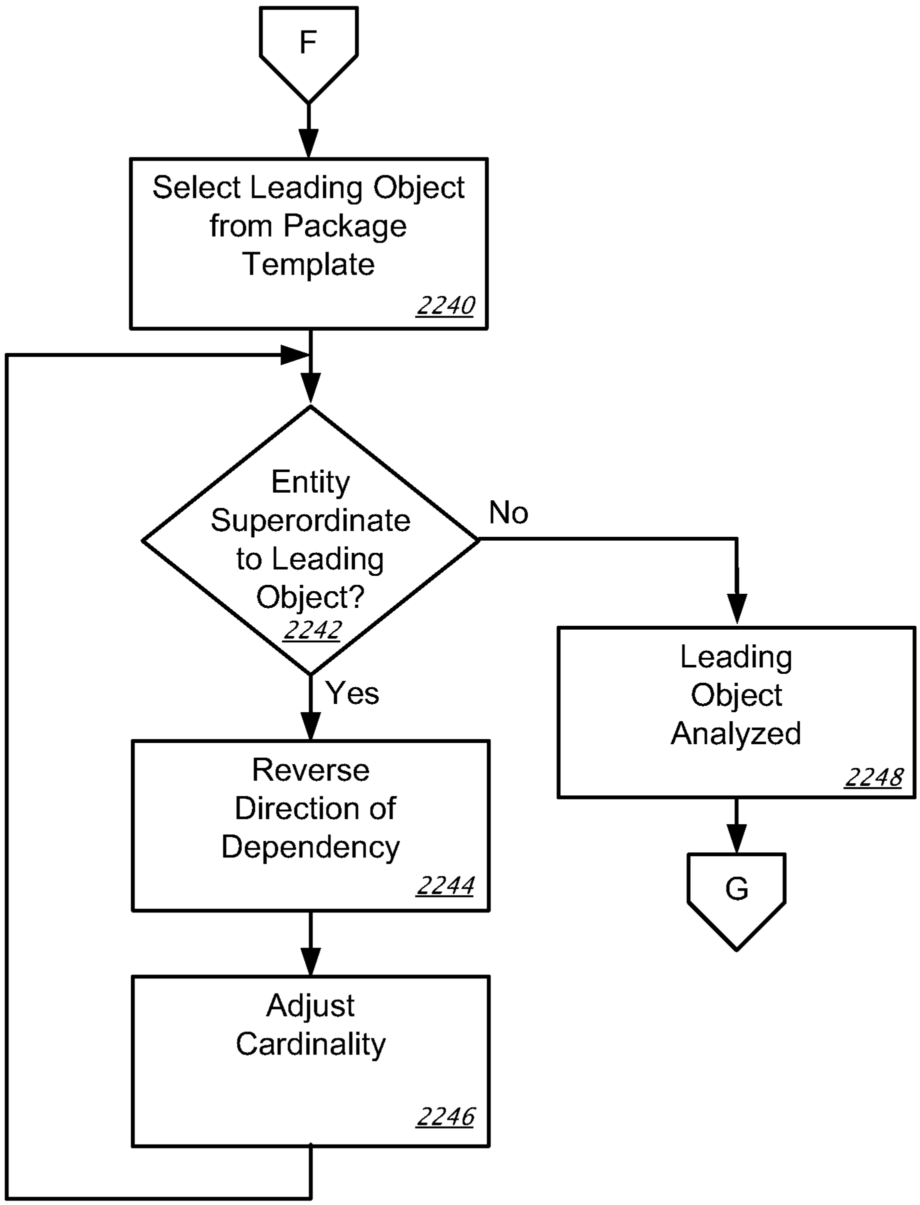

The system then selects a leading object from the package template (step 2240, FIG. 22E). The system determines whether there is an entity superordinate to the leading object (step 2242). If the system determines that there is an entity superordinate to the leading object, the system reverses the direction of the dependency (step 2244) and adjusts the cardinality between the leading object and the entity (step 2246). The system performs this analysis for entities that are superordinate to the leading object (step 2242). If the system determines that there are no entities superordinate to the leading object, the system identifies the leading object as analyzed (step 2248).

Figure 22F:
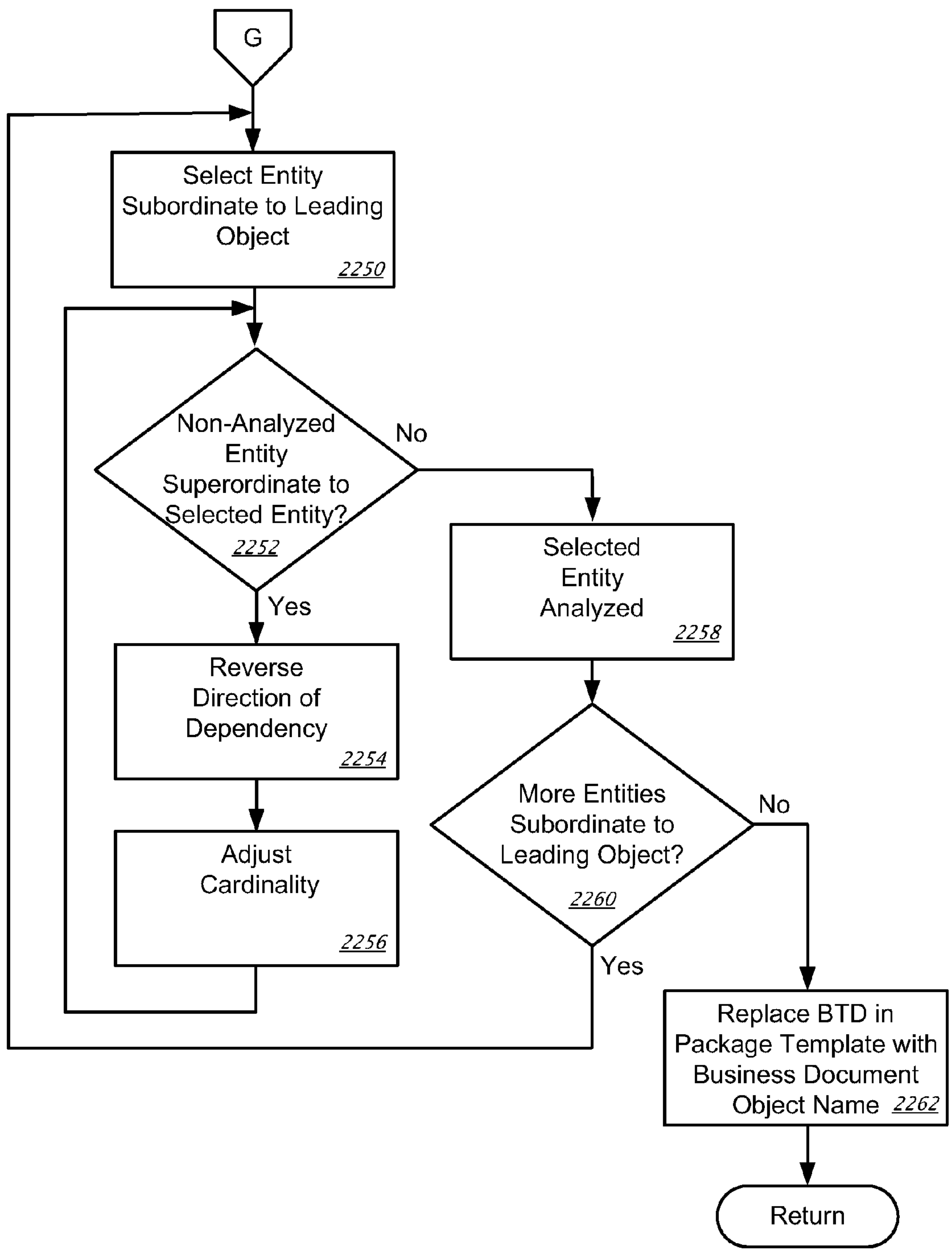

The system then selects an entity that is subordinate to the leading object (step 2250, FIG. 22F). The system determines whether any non-analyzed entities are superordinate to the selected entity (step 2252). If a non-analyzed entity is superordinate to the selected entity, the system reverses the direction of the dependency (step 2254) and adjusts the cardinality between the selected entity and the non-analyzed entity (step 2256). The system performs this analysis for non-analyzed entities that are superordinate to the selected entity (step 2252). If the system determines that there are no non-analyzed entities superordinate to the selected entity, the system identifies the selected entity as analyzed (step 2258), and continues this analysis for entities that are subordinate to the leading object (step 2260). After the packages have been analyzed, the system substitutes the BusinessTransactionDocument ("BTD") in the package template with the name of the interface (step 2262). This includes the "BTD" in the BTDItem package and the "BTD" in the BTDItemScheduleLine package.

6. Use of an Interface

Figure 23:
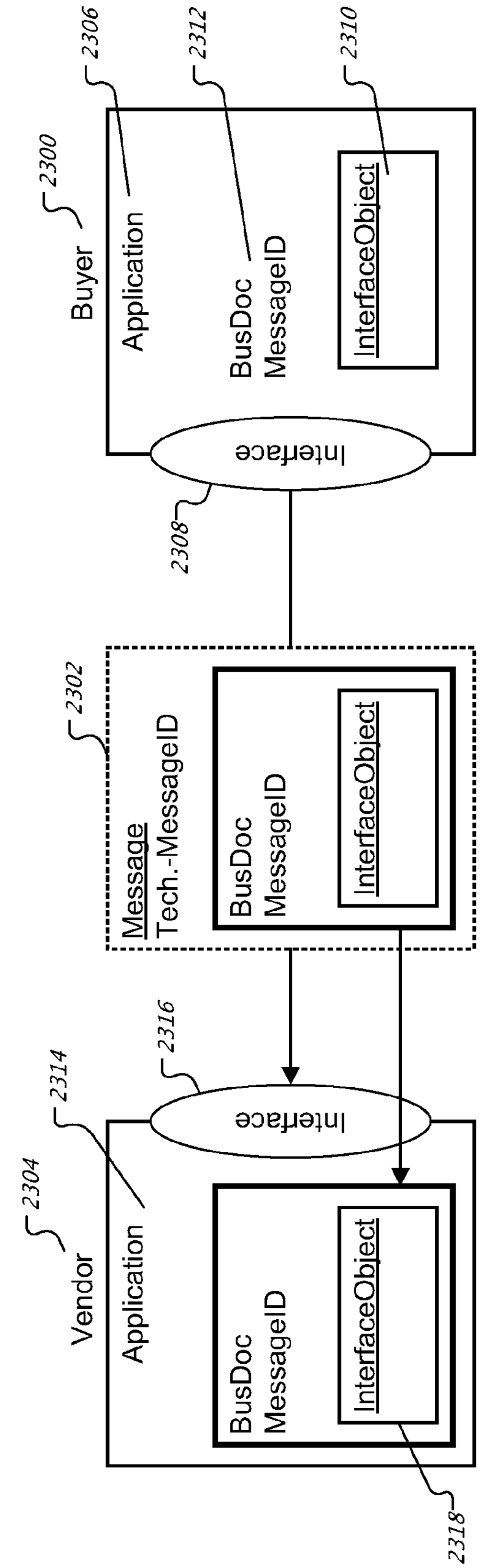
FIG. 23 depicts an example illustrating the transmittal of a business document in accordance with methods and systems consistent with the subject matter described herein.

The XI stores the interfaces (as an interface type). At runtime, the sending party's program instantiates the interface to create a business document, and sends the business document in a message to the recipient. The messages are preferably defined using XML. In the example depicted in FIG. 23, the Buyer 2300 uses an application 2306 in its system to instantiate an interface 2308 and create an interface object or business document object 2310. The Buyer's application 2306 uses data that is in the sender's component-specific structure and fills the business document object 2310 with the data. The Buyer's application 2306 then adds message identification 2312 to the business document and places the business document into a message 2302. The Buyer's application 2306 sends the message 2302 to the Vendor 2304. The Vendor 2304 uses an application 2314 in its system to receive the message 2302 and store the business document into its own memory. The Vendor's application 2314 unpacks the message 2302 using the corresponding interface 2316 stored in its XI to obtain the relevant data from the interface object or business document object 2318.

Figure 24:
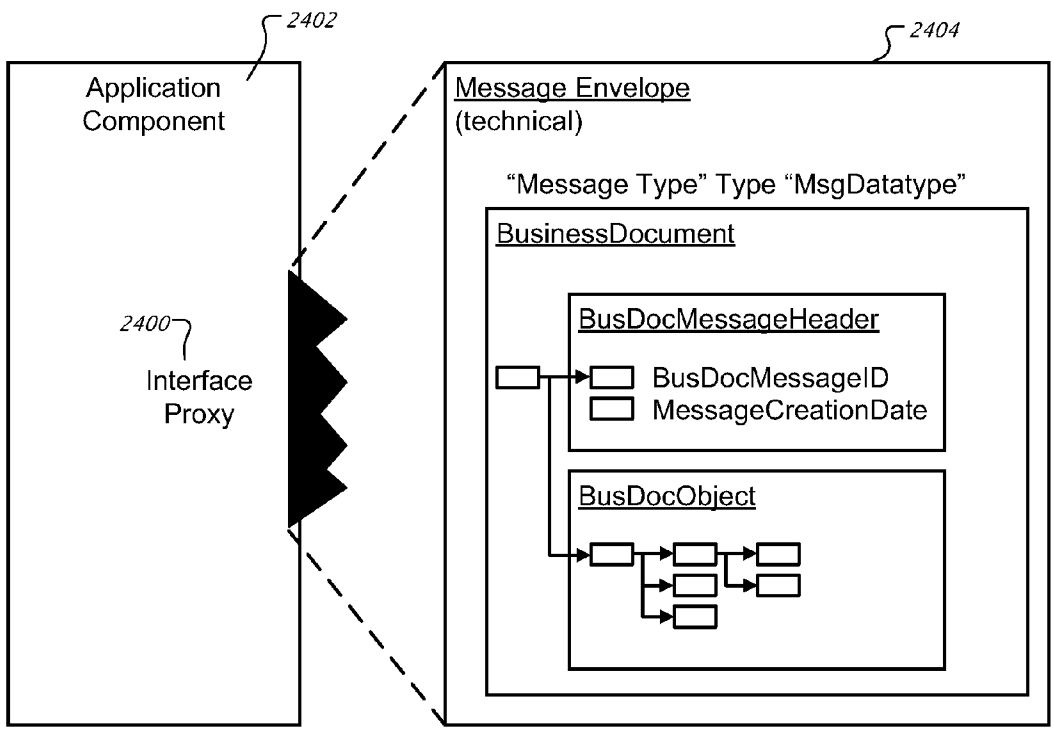
FIG. 24 depicts an interface proxy in accordance with methods and systems consistent with the subject matter described herein.
Figure 25:
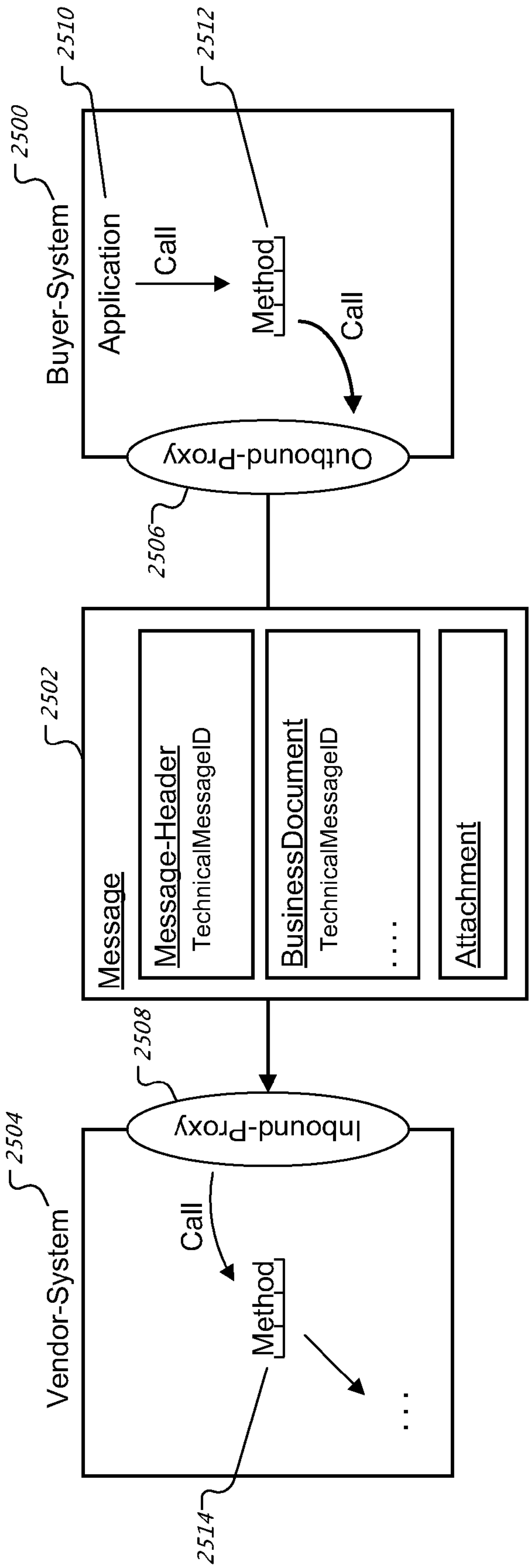
FIG. 25 depicts an example illustrating the transmittal of a message using proxies in accordance with methods and systems consistent with the subject matter described herein.

From the component's perspective, the interface is represented by an interface proxy 2400, as depicted in FIG. 24. The proxies 2400 shield the components 2402 of the sender and recipient from the technical details of sending messages 2404 via XI. In particular, as depicted in FIG. 25, at the sending end, the Buyer 2500 uses an application 2510 in its system to call an implemented method 2512, which generates the outbound proxy 2506. The outbound proxy 2506 parses the internal data structure of the components and converts them to the XML structure in accordance with the business document object. The outbound proxy 2506 packs the document into a message 2502. Transport, routing and mapping the XML message to the recipient 28304 is done by the routing system (XI, modeling environment 516, etc.).

When the message arrives, the recipient's inbound proxy 2508 calls its component-specific method 2514 for creating a document. The proxy 2508 at the receiving end downloads the data and converts the XML structure into the internal data structure of the recipient component 2504 for further processing.

Figure 26A:
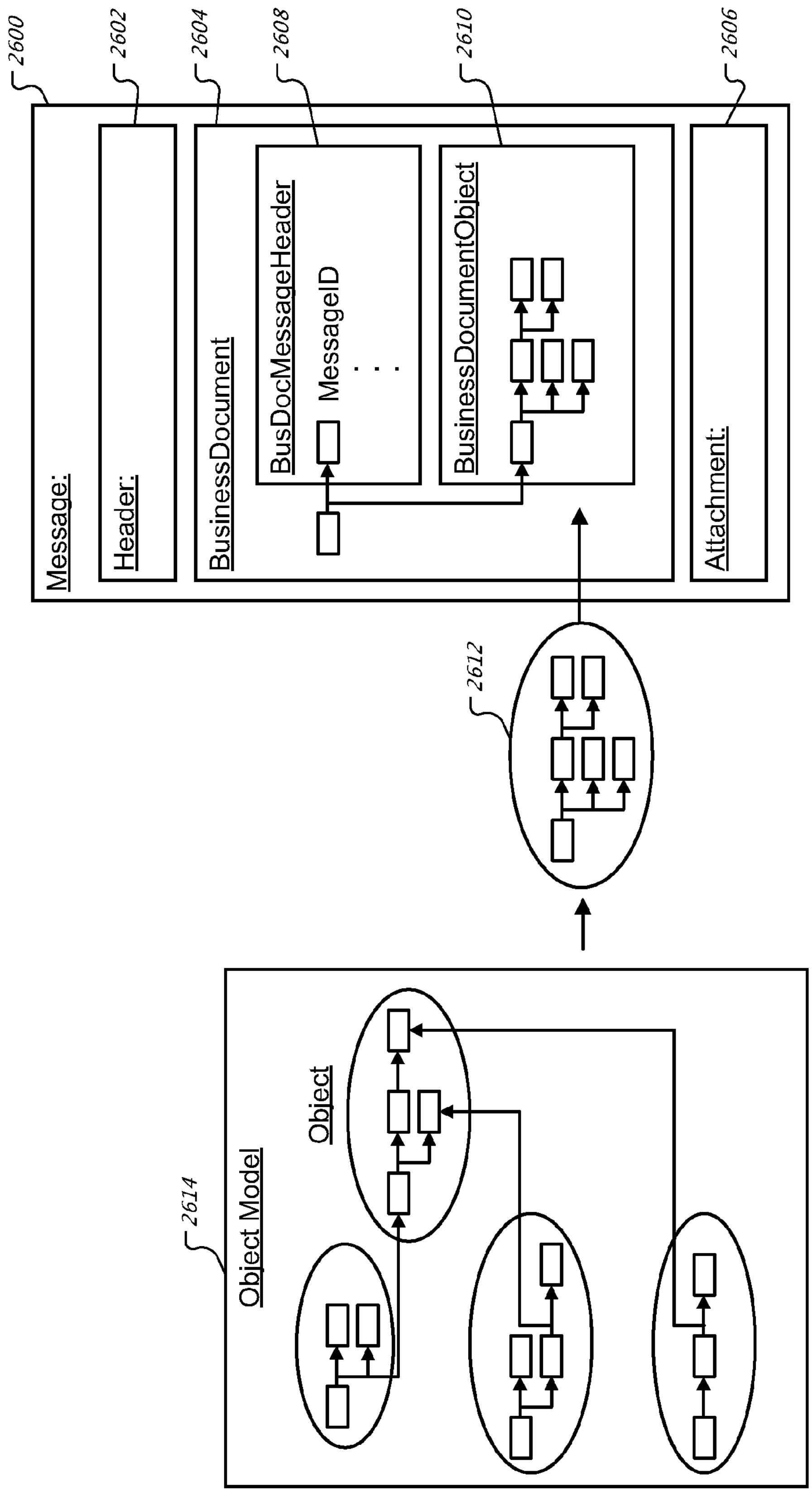
FIG. 26A depicts components of a message in accordance with methods and systems consistent with the subject matter described herein.

As depicted in FIG. 26A, a message 2600 includes a message header 2602 and a business document 2604. The message 2600 also may include an attachment 2606. For example, the sender may attach technical drawings, detailed specifications or pictures of a product to a purchase order for the product. The business document 2604 includes a business document message header 2608 and the business document object 2610. The business document message header 2608 includes administrative data, such as the message ID and a message description. As discussed above, the structure 2612 of the business document object 2610 is derived from the business object model 2614. Thus, there is a strong correlation between the structure of the business document object and the structure of the business object model. The business document object 2610 forms the core of the message 2600.

In collaborative processes as well as Q&A processes, messages should refer to documents from previous messages. A simple business document object ID or object ID is insufficient to identify individual messages uniquely because several versions of the same business document object can be sent during a transaction. A business document object ID with a version number also is insufficient because the same version of a business document object can be sent several times. Thus, messages require several identifiers during the course of a transaction.

Figure 26B:
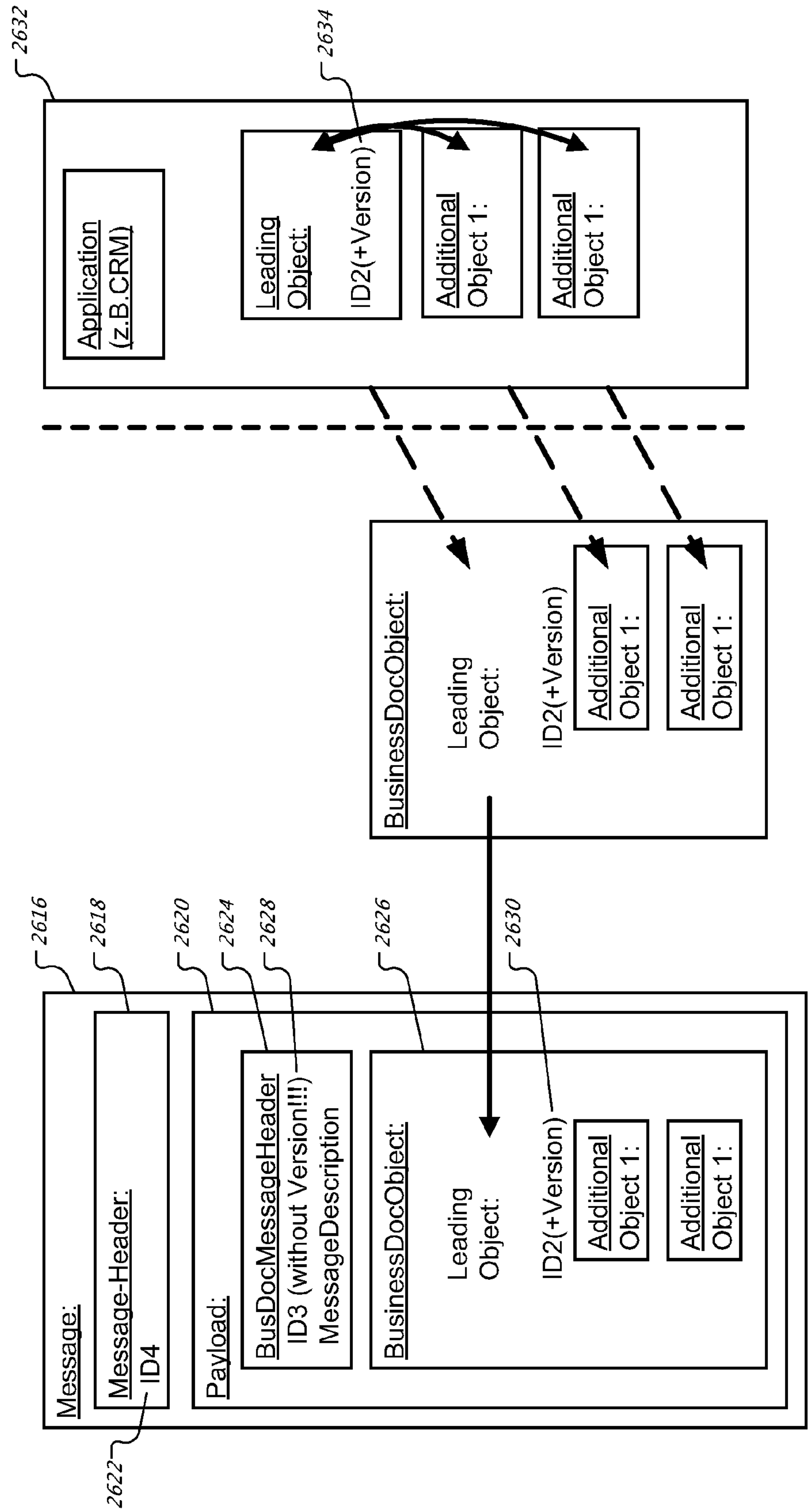
FIG. 26B depicts IDs used in a message in accordance with methods and systems consistent with the subject matter described herein.

As depicted in FIG. 26B, the message header 2618 in message 2616 includes a technical ID ("ID4") 2622 that identifies the address for a computer to route the message. The sender's system manages the technical ID 2622.

The administrative information in the business document message header 2624 of the payload or business document 2620 includes a BusinessDocumentMessageID ("ID3") 2628. The business entity or component 2632 of the business entity manages and sets the BusinessDocumentMessageID 2628. The business entity or component 2632 also can refer to other business documents using the BusinessDocumentMessageID 2628. The receiving component 2632 requires no knowledge regarding the structure of this ID. The BusinessDocumentMessageID 2628 is, as an ID, unique. Creation of a message refers to a point in time. No versioning is typically expressed by the ID. Besides the BusinessDocumentMessageID 2628, there also is a business document object ID 2630, which may include versions.

The component 2632 also adds its own component object ID 2634 when the business document object is stored in the component. The component object ID 2634 identifies the business document object when it is stored within the component. However, not all communication partners may be aware of the internal structure of the component object ID 2634. Some components also may include a versioning in their ID 2634.

7. Use of Interfaces Across Industries

Methods and systems consistent with the subject matter described herein provide interfaces that may be used across different business areas for different industries. Indeed, the interfaces derived using methods and systems consistent with the subject matter described herein may be mapped onto the interfaces of different industry standards. Unlike the interfaces provided by any given standard that do not include the interfaces required by other standards, methods and systems consistent with the subject matter described herein provide a set of consistent interfaces that correspond to the interfaces provided by different industry standards. Due to the different fields provided by each standard, the interface from one standard does not easily map onto another standard. By comparison, to map onto the different industry standards, the interfaces derived using methods and systems consistent with the subject matter described herein include most of the fields provided by the interfaces of different industry standards. Missing fields may easily be included into the business object model. Thus, by derivation, the interfaces can be extended consistently by these fields. Thus, methods and systems consistent with the subject matter described herein provide consistent interfaces or services that can be used across different industry standards.

Figure 28:
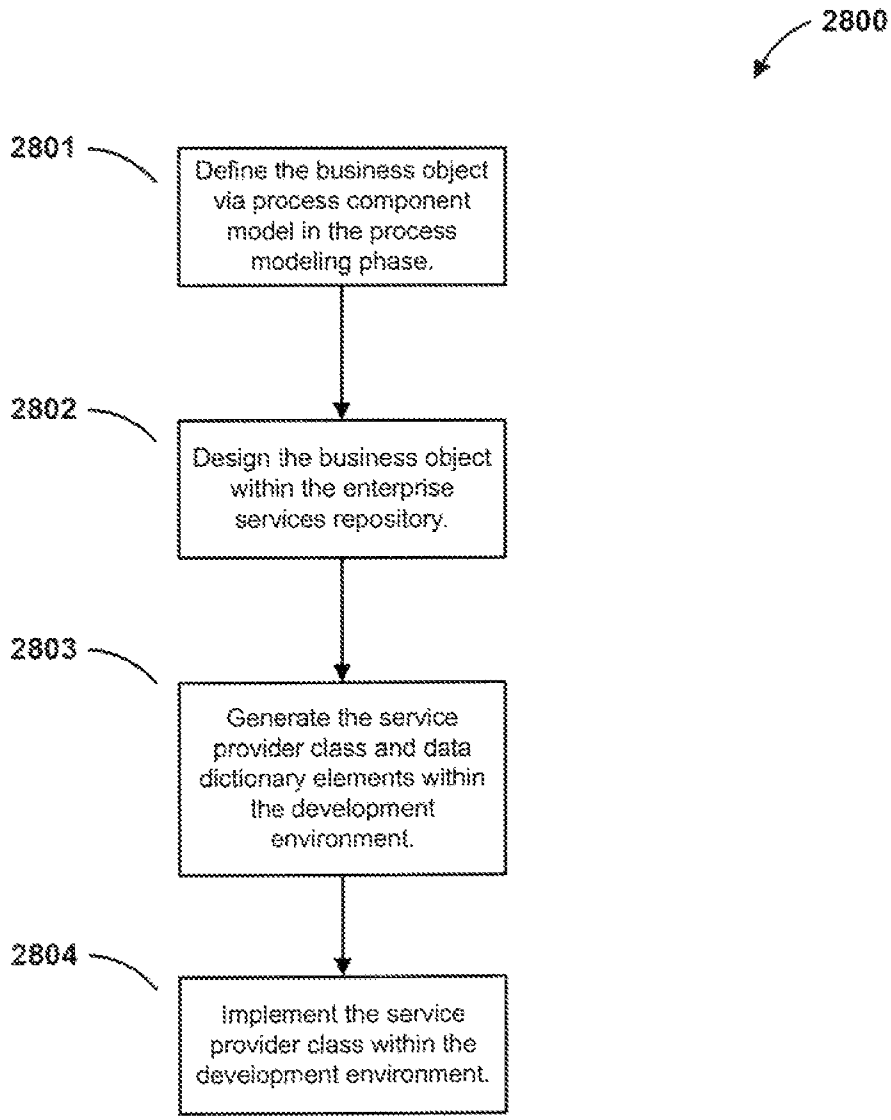
FIG. 28 illustrates an example method for service enabling in accordance with one embodiment of the present disclosure.
Figure 29:
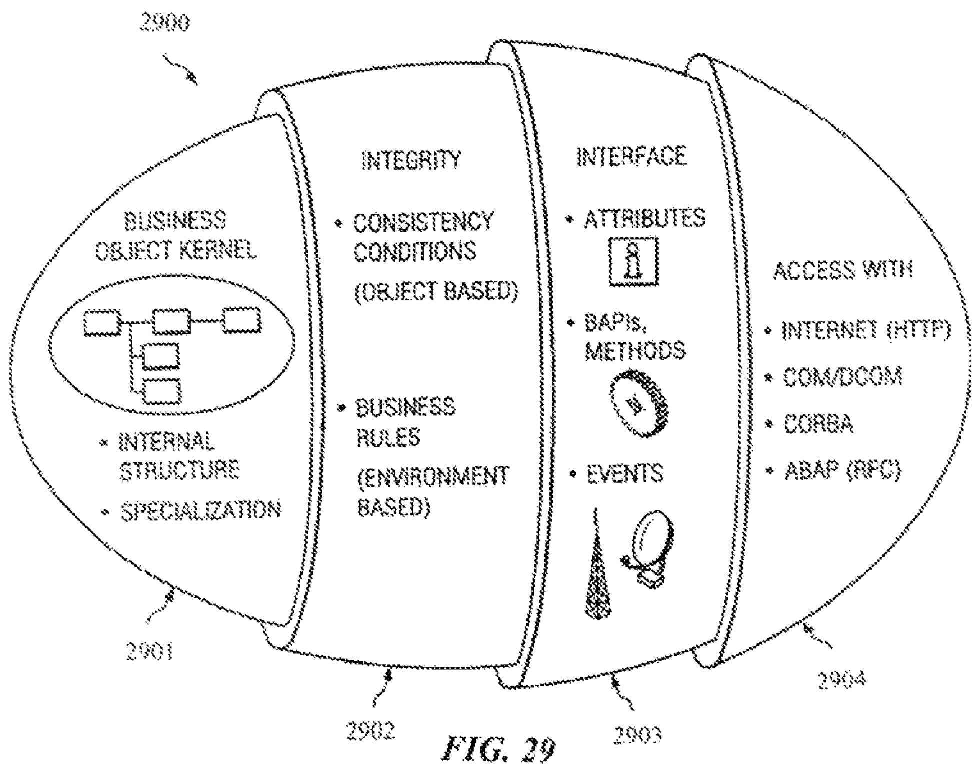
FIG. 29 is a graphical illustration of an example business object and associated components as may be used in the enterprise service infrastructure system of the present disclosure.

For example, FIG. 28 illustrates an example method 2800 for service enabling. In this example, the enterprise services infrastructure may offer one common and standard-based service infrastructure. Further, one central enterprise services repository may support uniform service definition, implementation and usage of services for user interface, and cross-application communication. In step 2801, a business object is defined via a process component model in a process modeling phase. Next, in step 2802, the business object is designed within an enterprise services repository. For example, FIG. 29 provides a graphical representation of one of the business objects 2900. As shown, an innermost layer or kernel 2901 of the business object may represent the business object's inherent data. Inherent data may include, for example, an employee's name, age, status, position, address, etc. A second layer 2902 may be considered the business object's logic. Thus, the layer 2902 includes the rules for consistently embedding the business object in a system environment as well as constraints defining values and domains applicable to the business object. For example, one such constraint may limit sale of an item only to a customer with whom a company has a business relationship. A third layer 2903 includes validation options for accessing the business object. For example, the third layer 2903 defines the business object's interface that may be interfaced by other business objects or applications. A fourth layer 2904 is the access layer that defines technologies that may externally access the business object.

Accordingly, the third layer 2903 separates the inherent data of the first layer 2901 and the technologies used to access the inherent data. As a result of the described structure, the business object reveals only an interface that includes a set of clearly defined methods. Thus, applications access the business object via those defined methods. An application wanting access to the business object and the data associated therewith usually includes the information or data to execute the clearly defined methods of the business object's interface. Such clearly defined methods of the business object's interface represent the business object's behavior. That is, when the methods are executed, the methods may change the business object's data. Therefore, an application may utilize any business object by providing the information or data without having any concern for the details related to the internal operation of the business object. Returning to method 2800, a service provider class and data dictionary elements are generated within a development environment at step 2803. In step 2804, the service provider class is implemented within the development environment.

Figure 30:
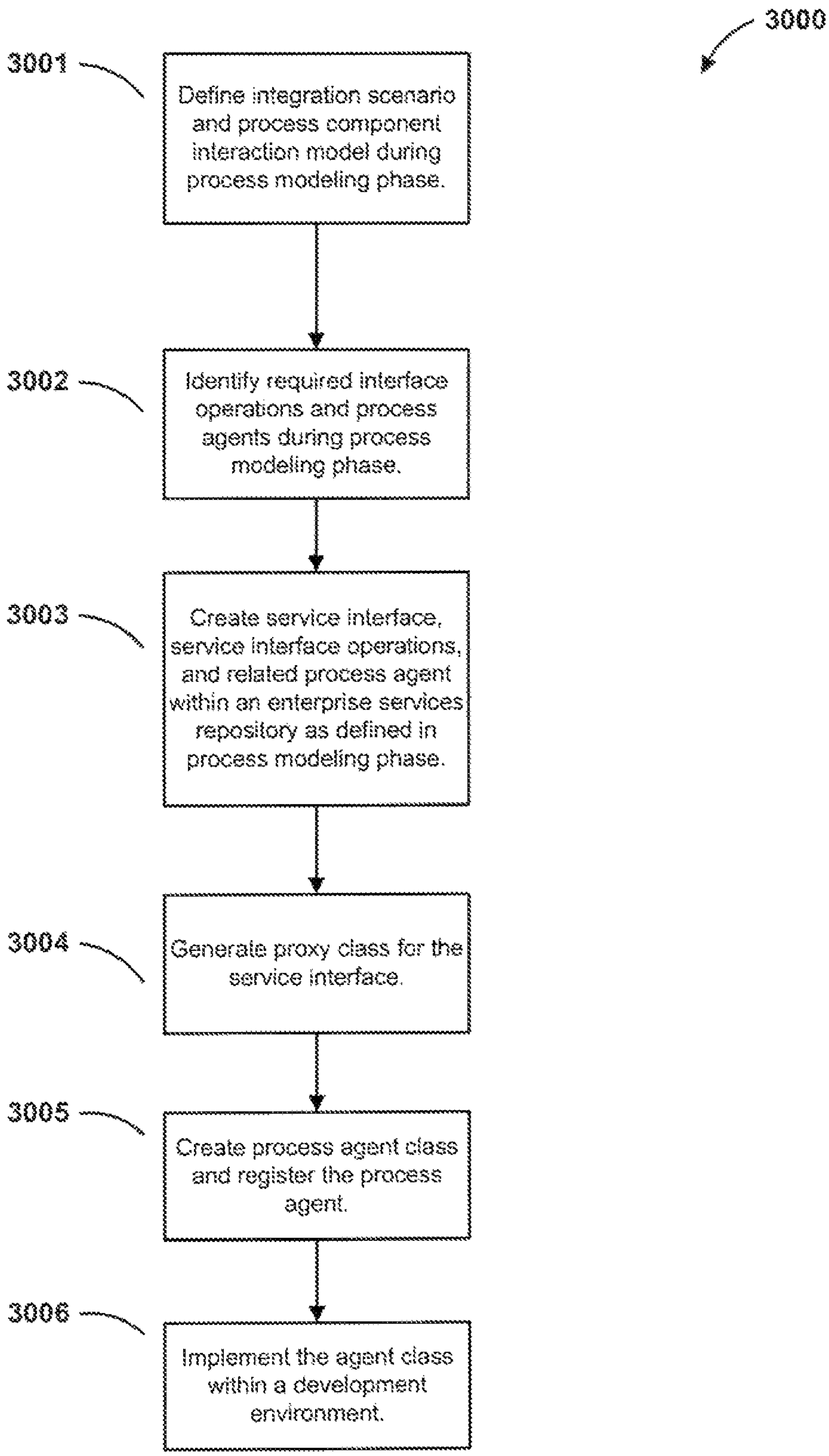
FIG. 30 illustrates an example method for managing a process agent framework in accordance with one embodiment of the present disclosure.

FIG. 30 illustrates an example method 3000 for a process agent framework. For example, the process agent framework may be the basic infrastructure to integrate business processes located in different deployment units. It may support a loose coupling of these processes by message based integration. A process agent may encapsulate the process integration logic and separate it from business logic of business objects. As shown in FIG. 30, an integration scenario and a process component interaction model are defined during a process modeling phase in step 3001. In step 3002, required interface operations and process agents are identified during the process modeling phase also. Next, in step 3003, a service interface, service interface operations, and the related process agent are created within an enterprise services repository as defined in the process modeling phase. In step 3004, a proxy class for the service interface is generated. Next, in step 3005, a process agent class is created and the process agent is registered. In step 3006, the agent class is implemented within a development environment.

FIG. 31 illustrates an example method 3100 for status and action management (S&AM). For example, status and action management may describe the life cycle of a business object (node) by defining actions and statuses (as their result) of the business object (node), as well as, the constraints that the statuses put on the actions. In step 3101, the status and action management schemas are modeled per a relevant business object node within an enterprise services repository. In step 3102, existing statuses and actions from the business object model are used or new statuses and actions are created. Next, in step 3103, the schemas are simulated to verify correctness and completeness. In step 3104, missing actions, statuses, and derivations are created in the business object model with the enterprise services repository. Continuing with method 3100, the statuses are related to corresponding elements in the node in step 3105. In step 3106, status code GDT's are generated, including constants and code list providers. Next, in step 3107, a proxy class for a business object service provider is generated and the proxy class S&AM schemas are imported. In step 3108, the service provider is implemented and the status and action management runtime interface is called from the actions.

Regardless of the particular hardware or software architecture used, the disclosed systems or software are generally capable of implementing business objects and deriving (or otherwise utilizing) consistent interfaces that are suitable for use across industries, across businesses, and across different departments within a business in accordance with some or all of the following description. In short, system 100 contemplates using any appropriate combination and arrangement of logical elements to implement some or all of the described functionality.

Moreover, the preceding flowcharts and accompanying description illustrate example methods. The present services environment contemplates using or implementing any suitable technique for performing these and other tasks. It will be understood that these methods are for illustration purposes only and that the described or similar techniques may be performed at any appropriate time, including concurrently, individually, or in combination. In addition, many of the steps in these flowcharts may take place simultaneously and/or in different orders than as shown. Moreover, the services environment may use methods with additional steps, fewer steps, and/or different steps, so long as the methods remain appropriate.

Data Types

Turning to the data types that be utilized within these consistent interfaces and the business object models, systems may use one or more of the following CDTs and GDTs as appropriate.

Amount

A CDT Amount is an amount with the corresponding currency unit. An example of CDT Amount is:

<Amount currencyCode="EUR">777.95</Amount>

In certain implementations, CDT Amount may have the following structure:

| CDT | | Category | Object Class | Property Term | Representation Term | Type | Type Name | Length | Cardinality | Remarks |
|---|---|---|---|---|---|---|---|---|---|---|
| Amount | | | | Amount | Content | xsd | decimal | 22.6 | | |
| | Currency Code | A | Amount | Currency | Code | xsd | token | 3 | 1 | Mandatory |

For the data type CDT Amount, the following attribute may be used: currencyCode (i.e., currency unit in accordance with the ISO 4217 three-character code). A currency may be specified.

The value in CDT Amount could be represented with up to 22 predecimal places and 6 decimal places. Both positive and negative amounts can be used.

The CDT Amount can be used to represent amounts, costs, remunerations, and/or fees.

For a conversion of the XML representation into the internal format, methods can be provided by the ABAP class CL_GDT_CONVERSION.

Allowed qualifiers of CDT Amount can be roles defined at GDT AmountRoleCode (described below).

BinaryObject

A CDT BinaryObject is a data stream of any number of characters in binary notation (i.e., octets). In certain implementations, the CDT BinaryObject can be delivered to a partner using the following methods: as a MIME attachment within a message or with a URI-based reference to the corresponding attachment. An example of CDT BinaryObject is:

<BinaryObject typeCode="application/zip" name="photos.zir">
T2xkIE1hY0RvbmFsZCBoYWQgYSBmYXJtCkUgSS
BFIEkgTwpBbmQgb24gaG1zIGZhcm0gaGUgaGFk
IHNvbWUgZHVja3MKRSBJIEUgSSBPC1dpdGggYS
BxdWFjayBxdWFjayBoZXJ1-LAphIHF1YWNrIHF1
YWNrIHRoZXJ1LApldmVyeSB3aGVyZSBhIHF1YW
NrIHF1YWNrCkUgSSBFIEkgTwo=</BinaryObject>

The above example is a representation of the CDT BinaryObject as an element value based on base64 encoding:

Another example of CDT BinaryObject is:

<BinaryObject uri="cid:a34ccrt@15.4.9.92/s445"/>

In certain implementations, CDT BinaryObject may have the following structure:

| CDT | | Category | Object Class | Property Term | Representation Term | Type | Type Name |
|---|---|---|---|---|---|---|---|
| BinaryObject | | | | Binary Object | Content | xsd | base64 binary |
| | MimeCode | A | Binary Object | Mime | Code | xsd | token |
| | charSetCode | A | Binary Object | Character Set | Code | xsd | token |

-continued

| CDT | | Category | Object Class | Property Term | Representation Term | Type | Type Name |
|---|---|---|---|---|---|---|---|
| | format | A | Binary Object | Format | Text | xsd | token |
| | filename | A | Binary Object | Filename | Text | xsd | string |
| | URI | A | Binary Object | Uniform Resource | Identifier | xsd | any URI |

The element value of CDT BinaryObject can be based on the XML-scheme-specific built in data type xsd:base64binary. This can enable any binary data to be represented using base64 encoding. In certain implementations, a base64 Content-Transfer-Encoding procedure is used.

The CDT BinaryObject may use the following attributes: MimeCode identifies the medium type (e.g., image, audio, video, application) of the binary content according to the MIME type definition and the corresponding MIME type recommendations. CharsetCode identifies the character set of text data. Format describes the format of the binary content if the format is not clear or from the “MimeCode”. Filename contains the corresponding name or file name of the binary content according to the MIME protocol. URI references the physical location of “BinaryObject” if this is represented as a MIME attachment in a SOAP message or in an ebXML-MSG message. The syntax of the URI is defined as follows: <scheme>.<scheme-specific part>.

The following MIME types can be available for MimeCode. The subtype, which can follow the slash, can specify the particular format of the media type.

The following character sets can be available for “CharSetCode”: iso-8859-n (i.e., n is a placeholder for the number of the relevant ISO character set from 1 to 9 (e.g., iso-8859-1)) or us-ascii.

The following URI schemes can be available for the scheme-specific part in the URI: cid (i.e., content identifier) and uuid (i.e., universal identifier scheme)

In certain implementations, the CDT BinaryObject can represent binary data and binary files. This can include graphics (e.g., diagrams, mathematic curves, etc.), pictures (e.g., photos, passport photos, etc.), sound recordings, video recordings, and documents in binary notation (e.g., PDF, DOC, and XLS files).

The primary representation term for the CDT “BinaryObject” is BinaryObject. Additional secondary representation terms can be graphic, picture, sound, or video.

The data in CDT Binary Object can be delivered, as an element value using base64 octet representation or as a MIME attachment, to name two examples. In certain implementations, a “BinaryObject” may not be used to reference a file that is located on a Web server. In such implementations, a GDT WebAddress (described below) can be available for this purpose.

If CDT BinaryObject is in a MIME attachment, the URI may reference the corresponding “Content ID” of the respective MIME attachment. The following URI schemes are used for this purpose: cid (i.e., identifies a freely defined “Content ID”), uuid (i.e., identifies an identification in accordance with the UUID guidelines). In certain implementations, it is not necessary to specify the “TypeCode” and “FileName” attributes in a MIME attachment, since this information can be contained in the MIME attachment itself.

The following qualifier can be available for CDT BinaryObject: FileContentBinaryObject which is an unstructured binary information of a file.

Code

A CDT Code is a character string of letters, numbers, special characters, and symbols. It can represent a definitive value, a method, or a property description in an abbreviated or language-independent form. An example of CDT Code is:

<SecurityError Code listID=“DE 0571” listAgencyID=“6”>4</SecurityError Code>

Another example of CDT Code is:

<SecurityErrorCode listID=“SEC” listAgencyID=“065055766” listAgencySchemeID=“DUNS” listAgencySchemeAgencyID=“016”>ANS</SecurityErrorCode>

Another example of CDT Code is:

<SecurityErrorCode listID =“SEC” listAgencyID=“4711” listAgencySchemeID=“PartyA” listAgencySchemeAgencyID=“ZZZ”>ER05</SecurityErrorCode>

In certain implementations, CDT Code may have the following structure:

| CDT | | Category | Object Class | Property Term | Representation Term | Type | Type Name | Cardinality | Remarks |
|---|---|---|---|---|---|---|---|---|---|
| Code | | | | Code | Content | xsd | token | | |
| | listID | A | Code List | Identification | Identifier | xsd | token | 0..1 | Optional |
| | list-VersionID | A | Code List | Version | Identifier | xsd | token | 0..1 | Optional |
| | list-AgencyID | A | Code List Agency | Identification | Identifier | xsd | token | 0..1 | Optional |
| | list-Agency-SchemeID | A | Code List Agency | Scheme | Identifier | xsd | token | 0..1 | Optional |
| | list-Agency-Scheme-AgencyID | A | Code List Agency | Scheme Agency | Identifier | xsd | token | 0..1 | Optional |

For CDT Code, the following attributes are available. A listID identifies a list of the codes that belong together. In certain implementations, the listID is within the agency that manages the code list. A listAgencyID identifies the agency that manages the code list. In certain implementations, the default value may be agencies from DE 3055. A listVersionID identifies the version of a code list. A listAgencySchemeID identifies the identification scheme that can represent the context that is used to identify the agency. A listAgencySchemeAgencyID identifies the agency that manages the listAgencySchemeID. In certain implementations, this attribute can contain values from DE 3055.

The CDT Code can be used for elements that are used in the communication between partners or systems to enable a common coded value representation in place of texts, methods, or properties. This code list should be relatively stable, and not subject to frequent or significant changes (e.g., CountryCode, LanguageCode, and so on). In certain implementations, the agency that manages the code list is not named explicitly, but is specified by using a role, which can be done in the tag name.

Numerous types of code can be represented. For standardized codes, code lists can be managed by an agency from the DE 3055 code list. A listID can be a code list for the standard code. A listVersionID can be a version of the code list. A listAgencyID can be the agency from DE 3055, excluding roles. For proprietary codes, whose code lists are managed by an agency that can be identified using a standard. A listID can be a code list for the proprietary code. A listVersionID can be a version of the code list. A listAgencyID can be a standardized ID for the agency (e.g., the company that manages the proprietary code list). A listAgencySchemeID can be a identification scheme for the schemeAgencyID. A listAgencySchemeAgencyID can be an agency from DE 3055 that manages the standardized ID 'ListAgencyId'. For proprietary codes, whose code lists are managed by an agency that can be identified without the use of a standard. A listID can be a code list for the proprietary code. A listVersionID can be a version of the code list. A listAgencyID can be a proprietary ID for the agency (e.g., the company that manages the proprietary code list). A ListAgencySchemeID can be an identification scheme for the SchemeAgencyId. A ListAgencySchemeAgencyID can be 'ZZZ' (i.e., mutually defined from DE 3055). For proprietary codes, whose code lists are managed by an agency that is specified using a role, the role can be specified as a prefix in the tag name. In certain implementations, if there is more than one code list, listID and listVersionID can be used as attributes. In certain implementations, attributes are not required if there is one code list. A listID can be an identification scheme for the proprietary identifier. A listVersionID can be a version of the identification scheme.

If the CDT code is used as a basis to define a specific code GDT that can combine standard code lists of different standardization organizations, and the complied lists are not disjunctive, the following attributes of the CDT code may be included in the GDT: ListID, ListVersionID, and ListAgencyID. In certain implementations, the compiled lists are not disjunctive. However, each interface that uses the GDT, the lists supported by the interface can be disjunctive. In this case, the attributes are not required in the GDT.

To be able to represent values, methods, and property descriptions as code, the corresponding code list may be consistent and, unlike identifier lists, can be subject to very few changes to its content. In certain implementations, "Code" cannot be used to identify any logical or real objects. In certain implementations, it is not possible to differentiate clearly between "Identifier" and "Code" for coded values. This can be particularly applicable if a coded value is used to identify an object and, at the same time, this coded value can be used to replace a longer text. For example, this includes the coded values for "Country," "Currency," "Organization," "Region," etc. If the list of coded values in this case is consistent, then the GDT "Code" can be used for the individual coded values. The following cases are examples. A passport number (i.e., PassportId) can be an "Identifier," because it can identify a real object (e.g., a natural person) and the list of passport numbers may constantly be growing as new passport numbers are issued. A country code (i.e., CountryCode or CountryId) can be either an "Identifier" or a "Code." The country code can identify a real object (e.g., the country). However, the country code itself can be a replacement for the respective country name. Therefore, it can also be a "Code." In certain implementations, the code list is consistent so the country name could be represented as a "Code." Changes can be caused by political events and such changes are few in comparison to those relating to natural persons. A process code (i.e., ProcessCode) can be a "Code," because it can describe a method type and not an object and, in certain implementations, the list of process codes seldom changes.

DateTime

In certain implementations, CDT DateTime is no longer intended for direct usage. GDTs TIMEZONE_INDEPENDENT_DateTime (described below), GLOBAL_DateTime (described below), LOCAL_DateTime (described below), and LOCALOFFSET_DateTime (described below) can be used instead.

DateTime is the time stamp, accurate to the second, of a calendar day. An example of CDT DateTime is:

<ConstructionDateTime>2002-04-19T15:30:00+01:00</ConstructionDateTime><ConstructionDateTime timeZoneCode="CET"daylightSavingTimeIndicator="true">2005-10-30T02:30:00</ConstructionDateTime>

In certain implementations, CDT DateTime may have the following structure:

| CDT | | Cat. | Object Class | Property | Rep./Ass. | Type | Type Name | Card. |
|---|---|---|---|---|---|---|---|---|
| DateTime | | | Date Time | | Details | XSD | DateTime | |
| | timeZoneCode | A | Date Time | Time Zone | Code | GDT | TimeZoneCode | 0..1 |
| | daylightSavingTimeIndicator | A | Date Time | Daylight Saving Time | Indicator | GDT | Indicator | 0..1 |

The CDT DateTime core component type may use the W3C built-in data type xsd:dateTime. This can be structured in accordance with the extended representation of ISO 8601. However, unlike in xsd:date, it is not possible to represent negative years or years with more than four numeric values in "Date." The extended representation can be as follows: CCYY-MM-DDThh:mm:ss(.sss)(Z) or CCYY-MM-DDThh:

mm:ss(.sss)(+/−)hh:mm. For example, 2002-04-19T15:30:00Z or 2002-04-19T10:30:00+05:00.

The extended representation can use the following literals: CC for century (e.g., 00-99), YY for year (e.g., 00-99), MM for month (e.g., 01-12) DD for day (e.g., 01-28 for month 02; 01-29 for month 02 when the year is a leap year; 01-30 for months 04, 06, 09, and 11; 01-31 for months 01, 03, 05, 07, 08, 10, and 12), a hyphen between the year, month, and day may be mandatory as well as a separator between the date and time, hh for hours (e.g., 00-23), mm for minutes (e.g., 00-59), ss for seconds (00-59), .sss (i.e., one or more characters after the decimal point) can represent fractions of a second. The representation can be limited to a maximum of three decimal places (e.g., the time can be expressed to a thousandth of a second). A colon between the hours, minutes, and seconds may be mandatory. Z may be specified when the represented time is also the UTC time. +hh:mm may be specified when the represented time is a local time that is ahead of UTC time. −hh:mm may be specified when the represented time is a local time that is behind UTC time. The time stamp can be indicated without additional information (e.g., Z, +hh:mm, −hh:mm) relative to the coordinated world time (i.e., UTC time). In certain implementations, this time stamp cannot be converted to the respective local time.

The following value ranges can be defined for CDT DateTime: Day (e.g., represents all dates from the Gregorian calendar), Time (e.g., represents 24 hours (i.e., 0-23), Minutes (e.g., represents 60 minutes (i.e., 0-59), seconds (e.g., represents 60 seconds (i.e., 0-59), Time zone (e.g., usually expressed in UTC (i.e., Coordinated Universal Time). In certain implementations, the CDT DateTime represents a local time, the time difference with respect to UTC time may also be specified.

The following attributes may apply to CDT DateTime. In some implementations, if DateTime contains neither offset nor Z, then DateTime is local and TimeZoneCode can specify the TimeZone to which DateTime refers. If DateTime contains Z, then DateTime is in UTC and TimeZoneCode can specify the TimeZone in which DateTime should be displayed to the user. DaylightSavingTimeIndicator can specify if DateTime is in daylight saving time.

The following integrity conditions for CDT DateTime may be observed. Years may be represented by a four-character code. In certain implementations, the years 0001 to 9999 can be supported. In certain implementations, leading positive or negative signs before the year are not supported. According to the constraints above, the regular expression can restrict the character pattern of date and time to the following example: [0-9]{4}-[0-9]{2}-[0-9]{2}T[0-9]{2}[0-9]{2}:[09]{2}[0-9]{2}:[09]{2}[0-9]{2}(.[09]*)?([Z+−][0-9]{2}[0-9]{2}:[09]{2}[0-9]{2})? In addition, data such as 0000-00-00T00:00Z can be represented by this regular expression. However, explicit restrictions may mean that this is not possible for the built-in data type "xsd:DateTime." In certain implementations, the attribute DaylightSavingTimeIndicator can be present, if attribute TimeZoneCode is present. The value of DaylightSavingTimeIndicator may fit to the date, time, and time zone. During the duplicate hour when switching back from daylight saving time, the value of DaylightSavingTimeIndicator may not be determined by date, time, and time zone. Date and time may not have the value of the missing hour at the beginning of daylight saving time. The attribute TimeZoneCode can be present if no offset to UTC (i.e., +/−hh:mm) is specified in DateTime. The attribute TimeZoneCode may be present if DateTime is specified as UTC (i.e., postfix Z).

In certain implementations, DateTime may not be intended for direct usage. GDTs_TIMEZONE_INDEPENDENT_DateTime (described below), _GLOBAL_DateTime (described below), _LOCAL_DateTime (described below), and _LOCALOFFSET_DateTime (described below) may be use instead. Further restricted GDTs can be derived from DateTime. The CDT DateTime can be used for time points that may contain the day and time. For example, it can be creation date/time, receipt date/time, processing date/time, delivery date/time, expiry date/time, etc.

In some implementations, the representation term for the CDT "DateTime" is DateTime. Additional representation terms can be Date (i.e., a calendar definition of a particular day) or Time (i.e., a time stamp, accurate to the second, of a particular time).

In the case of a business transaction, DateTime may arise in a business role. In the element name, these roles can be placed in front of the term "DateTime," whereby additional qualifiers could also be added. For example, PlannedArrivalDateTime is a date/time of a planned arrival.

Times that are relevant in logistics execution are displayed below graphically in their logistical sequence. They are described here.

The coordinated world time or coordinated universal time (UTC) can be the uniform basis for time specifications that can be used internationally. It can be based on the route of the sun and usually is a constant time unit. This may mean that solar time at the Greenwich meridian can be used as an approximate guide value for UTC. UTC replaced Greenwich Mean Time (GMT) in 1972 because it was more accurate. In certain implementations, the Gregorian calendar is used in the western world and can approximate the complicated calculation of a "tropical year." The meaning of the "tropical year" is 365.2422 days. The Gregorian calendar, in use since 1582, can define the rules for leap years. For a conversion of the XML representation into an internal format, methods can be provided by the ABAP class CL_GDT_CONVERSION. Besides to UTC, various local time zones can exist all over the world, which may adapt to the daylight times of a given location (e.g., 12:00 is near to the mid of daylight time and 0:00 near to the mid of night). Time zones may be defined by an offset to UTC and an optional rule for daylight saving time. Daylight saving time can be used by some countries to improve use of daylight time. Offset to UTC may increase at the beginning of summer and reset at end of summer.

GLOBAL_DateTime

A CDT GLOBAL_DateTime is the accurate time point of a calendar day in TimeZone UTC. An example of CDT GLOBAL_DataTime is:

<ConstructionDataTime>2002-04-19T15:30:00Z</ConstructionDateTime>

In certain implementations, CDT GLOBAL_DateTime may have the following structure:

| CDT | Rep./Ass. Qual. | Rep./Ass. | Type | Type Name | Remarks |
|---|---|---|---|---|---|
| GLOBAL_DateTime | GLOBAL_ | DateTime | GDT | DateTime | restricted |

Elements DaylightSavingIndicator and TimeZoneCode may be omitted if the time point is given in UTC. The extended representation can be as follows: CCYY-MM-DDThh:mm:ss(.sss)Z.

The following integrity conditions may be observed: according to the constraints above, the regular expression can restrict the character pattern of date and time to the following: [0-9]{4}-[0-9]{2}-[0-9]{2}T[0-9]{2} [0-9]{2}:[0-9]{2} [0-9]{2}:[0-9]{2} [0-9]{2}(.[0-9]*)?(Z).

In certain implementations, The GLOBAL_DateTime can be a restriction on CDT DateTime. GLOBAL_DateTime can contain the variable "GLOBAL_," which can be replaced by one or more qualifiers. For the possible qualifiers of GLOBAL_DateTime refer to GDT TimePointRoleCode (described below).

LOCAL_DateTime

A CDT LOCAL_DateTime is the accurate time-point of a calendar day in local time, with time zone and daylight saving time indication. An example of CDT LOCAL_DateTime is:

<TimeOfAccidentDateTime timeZoneCode="CET"daylightSavingTimeIndicator="true">2005-10-30T02:30:00</TimeOfAccidentDateTime>

In certain implementations, CDT LOCAL_DateTime may have the following structure:

| CDT | | Cat. | Object Class | Property | Rep./Ass. | Type | Type Name | Card. |
|---|---|---|---|---|---|---|---|---|
| LOCAL_ DateTime | | | LOCAL_ DateTime | | Details | GDT | DateTime | |
| | timeZoneCode | A | LOCAL_ DateTime | TimeZone | Code | GDT | TimeZoneCode | 1 |
| | daylightSavingTimeIndicator | A | LOCAL_ DateTime | DaylightSavingTime | Indicator | GDT | Indicator | 1 |

The extended representation of DateTime can be as follows: CCYY-MM-DDThh:mm:ss(.sss).

The following integrity conditions may be observed: according to the constraints above, the regular expression can restrict the character pattern of date and time to the following: [0-9]{4}-[0-9]{2}-[0-9]{2}T[0-9]{2}[0-9]{2}:[0-9]{2}[0-9]{2}:[0-9]{2}[0-9]{2}(.[0-9]*)?.

The CDT LOCAL_DateTime may be used to specify time points in local representation. This can be used for time points that may not be converted to UTC for legal reasons.

In certain implementations, LOCAL_DateTime can be a restriction on CDT DateTime (described above). LOCAL_DateTime can contain the variable "LOCAL_," which can be replaced by one or more qualifiers. For the possible qualifiers of LOCAL_DateTime refer to GDT TimePointRoleCode (described below).

LOCALNORMALISED_DateTime

A CDT LOCALNORMALISED_DateTime is a local time-point represented by the corresponding UTC date and time and the local time zone. An example of CDT LOCALNORMALISED_DateTime is:

<ConstructionDateTimetimeZoneCode="CET">2005-10-30T02:30:00Z</ConstructionDateTime>

In certain implementations, CDT LOCALNORMALISED_DateTime may have the following structure:

| CDT | | Cat. | Object Class | Property | Rep./Ass. | Type | Type Name | Card. |
|---|---|---|---|---|---|---|---|---|
| LOCALNORMALISED_ DateTime | | | LOCALNORMALISED_ DateTime | | Details | GDT | DateTime | |
| | timeZoneCode | A | LOCALNORMALISED_ DateTime | TimeZone | Code | GDT | TimeZoneCode | 1 |

In some implementations, the Element DaylightSavingIndicator may be omitted if the time point is given in UTC and the DST indicator can be derived from the given time zone. The extended representation of the content is as follows: CCYY-MM-DDThh:mm:ss(.sss)Z.

The following integrity conditions may be observed: according to the constraints above, the regular expression can restrict the character pattern of date and time to the following: [0-9]{4}-[0-9]{2}-[0-9]{2}T[0-9]{2}:[0-9]{2}:[0-9]{2}(.[0-9]*)?(Z).

LOCALNORMALISED_DateTime can be similar to LOCAL_DateTime. It may be possible to convert between both representations because both can carry the same set of information. A correct conversion can imply that involved parties are working with the same configuration for time zones, in particular begin and end of daylight saving times. In certain implementations, time zones are not part of a standard and can be changed by countries so a decision between the two types LOCAL_DateTime and LOCALNORMALISED_DateTime can be made. The CDT LOCAL_DateTime can ensure that the value entered by the user is kept as it is, without any time zone conversion. Transforming the local date and time into time zone UTC can belong to each system. LOCALNORMALISED_DateTime can ensure that date and time in UTC (i.e., GLOBAL_DateTime) is the same in involved systems. In general, LOCALNORMALISED_DateTime can be preferred when working with local time-points, because it can allow easier handling in applications and can make the data exchange between applications more precise. LOCAL_DateTime may be used when legal requirements assume the user input is not manipulated by the system.

In certain implementations, LOCALNORMALISED_DateTime can be a restriction on CDT DateTime. LOCALNORMALISED_DateTime can contain the variable "LOCALNORMALISED_", which can be replaced by one or more qualifiers. For examples of the possible qualifiers of LOCALNORMALISED_DateTime see GDT TimePointRoleCode (described below).

LOCALOFFSET_DateTime

A CDT LOCALOFFSET_DateTime is the time-point of a calendar day specified in local date and local time with the offset to UTC. An example of CDT LOCALOFFSET_DateTime is:

<ConstructionDateTime>2002-04-19T15:30:00+01:00</ConstructionDateTime>

In certain implementations, CDT LOCALOFFSET_DateTime may have the following structure:

| CDT | Rep./Ass. Qual. | Rep./Ass. | Type | Type Name | Remarks |
|---|---|---|---|---|---|
| LOCALOFF-SET_DateTime | LOCALOFF-SET_ | DateTime | GDT | DateTime | restricted |

The extended representation can be as follows: CCYY-MM-DDThh:mm:ss(.sss)(+/−)hh:mm.

The following integrity conditions may be observed: according to the constraints above, the regular expression restricts the character pattern of date and time to the following: [0-9]{4}-[0-9]{2}-[0-9]{2}T[0-9]{2} [0-9]{2}:[0-9]{2} [0-9]{2}:[0-9]{2}[0-9]{2}(.[0-9]*)?([+−][0-9]{2}[0-9]{2}:[0-9]{2}[0-9]{2})?.

The CDT LOCALOFFSET_DateTime can be used for local time stamps that may contain the date and time, where the time zone is not known relevant.

In certain implementations, LOCALOFFSET_DateTime can be a restriction on CDT DateTime. LOCAL_DateTime (described above) can contain the variable "LOCALOFFSET_", which can be replaced by one or more qualifiers. For the possible qualifiers of LOCALOFFSET_DateTime refer to GDT TimePointRoleCode (described below).

TIMEZONEINDEPENDENT_DateTime

A CDT TIMEZONEINDEPENDENT_DateTime is the time-point of a calendar day without the context of a TimeZone. An example of CDT TIMEZONEINDEPENDENT_DateTime is:

<PollingStationOpeningHourDateTime>2005-0918T08:00:00</PollingStationOpeningHourDateTime> <PollingStationClosingHour-DateTime>2005-09-18T18:00:00</PollingStationOpeningHourDateTime>

In certain implementations, CDT TIMEZONEINDEPENDENT_DateTime may have the following structure:

ence to a time zone. It can be used to derive a local time point when applied to a time zone. This may result in a different data type (i.e., LocaleTimePoint). For example, the general opening hours of polling stations (e.g., 2005-09-18T08:00:00) can be transformed to different time zones. For example, 2005-09-18T08:00:00 CET (DST) can be transformed into 2005-09-18T06:00:00Z, 2005-09-18T08:00:00 WET (DST) can be trans-formed into 2005-09-18T07:00:00Z, and 2005-09-18T08:00:00 EET (DST) can be transformed into 2005-09-18T05:00:00Z.

In certain implementations, the transformation of TIMEZONEINDEPENDENT_DateTime into a local time zone is not always possible (e.g., due to the missing or duplicate hour when moving to or from daylight saving time). The TIMEZONEINDEPENDENT_DateTime can be a restriction on CDT DateTime (described above). The CDT TIMEZONEINDEPENDENT_DateTime can contain the variable "TIMEZONEINDEPENDENT_", which can be replaced by one or more qualifiers. For the possible qualifiers of TIMEZONEINDEPENDENT_DateTime refer to GDT TimePointRoleCode (described below).

Allowed qualifiers of DateTime can be roles defined at TimePointRoleCode. In certain implementations, in an element name, "TimePoint" may be replaced by "DateTime" (e.g., ApprovalTimePoint can be replaced by ApprovalDateTime).

ElectronicAddress

A CDT ElectronicAddress is a digital address that is represented by the Unified Resource Identifier (i.e., URI). An example of CDT ElectronicAddress is:

<Address>http://www.xyz.com/InterfaceRepository/ElectronicAddresses/description.htm </Address>

Another example of CDT ElectronicAddress is:

<Address protocolID="XF">mailto:c=DE;a=XYZ;p=XYZ;o=EXCHANGE;s=STUHEC;g=GUNTHER </Address>

In certain implementations, CDT ElectronicAddress may have the following structure:

| CDT | | Category | Object Class | Property Term | Representation Term | Type | Type Name | Length | Cardinality | Remarks |
|---|---|---|---|---|---|---|---|---|---|---|
| Electronic-Address | | | | Electronic Address | Content | xsd | anyURI | | | |
| | protocolID | A | Electronic Address | Protocol | Identifier | xsd | token | | 0..1 | Optional |
| | language Code | A | Electronic Address | Language | Code | xsd | language | 2..9 | 0..1 | Optional |

| CDT | Rep./Ass. Qual. | Rep./Ass. | Type | Type Name | Remarks |
|---|---|---|---|---|---|
| TIMEZONE-INDEPEN-DENT_DateTime | TIMEZONE-INDEPEN-DENT_ | DateTime | GDT | DateTime | restricted |

The extended representation can be as follows: CCYY-MM-DDThh:mm:ss(.sss).

The following integrity conditions may be observed: according to the constraints above, the regular expression restricts the character pattern of date and time to the following: [0-9]{4}-[0-9]{2}-[0-9]{2}T[0-9]{2}[0-9]{2}:[0-9]{2} [0-9]{2}:[0-9]{2}[0-9]{2}(.[0-9]*)?.

The TIMEZONEINDEPENDENT_DateTime can be used for an abstract specification of date and time without refer- A URI can consist of the scheme (i.e., how to access a resource), followed by a colon and the scheme-specific part. In certain implementations, the scheme-specific part is relevant for the service that is connected to the particular scheme. A resource can have multiple URIs. One reason may be that a resource can exist physically at multiple locations, due to mirroring, or it may be addressed using different protocols, which can be specified by the scheme name (e.g., a file can be referenced using http and ftp). A URI may therefore generally be constructed as follows:

<scheme>:<scheme-specific part>

The following is an example of a URL with partial expression types:

<scheme>://<user>:<password>@<host>:<port>/<path>?<query><argument>=<value>&<argument>=<value>#<fragment>

The following URI schemes are available: ftp (i.e., File Transfer Protocol), http (i.e., Hypertext Transfer Protocol), mailto (i.e., Electronic mail address), file (i.e., Host-specific file names), cid (i.e., content identifier), mid (i.e., message identifier), nfs (i.e., network file system protocol), https (i.e., Hypertext Transfer Protocol Secure), uuid (i.e., Universal Identifier Scheme). In certain implementations, the above-listed URI schemes are not sufficient to determine the address protocol. In such cases, you can either apply for another URI scheme or define the corresponding protocol type more precisely by specifying the "protocolID" attribute as well. For this protocol type, the codes from the UN/EDIFACT DE 3155 "Communication Address Code Qualifier" code list can be used. The main ones can be: AB (i.e., communications number assigned by Societe Internationale de Telecommunications Aeronautiques), AD (i.e., AT&T mailbox identifier), AF (i.e., the switched telecommunications network of the United States Department of Defense), AN (i.e., ODETTE File Transfer Protocol0, AO (i.e., Identification of the Uniform Resource Location Synonym: World wide web address), EM (i.e., Electronic Mail Exchange of mail by electronic means), EI (i.e., Number identifying the service and service user), FT (i.e., File transfer access method according to ISO), GM (i.e., General Electric Information Service mailbox, the communication number identifies a GEIS mailbox), IM (i.e., Internal mail address/number), SW (i.e., S.W.I.F.T., communications address assigned by Society for Worldwide Interbank Financial Telecommunications s.c.), XF (i.e., X.400 address). In certain implementations, no codings exist for the following protocols, the respective coding proposals can be submitted to the UN/CEFACT Forum for standardization: ms (i.e., Microsoft Mail), ccmail, languagecode (i.e., if the attachment is a document or text, this can be used to represent the language of the attachment).

"ElectronicAddress" can be a core component type that can be used to represent global data types (i.e., GDTs) for email addresses, Web sites, and documents or information provided on Web sites. The representation term for the CDT "ElectronicAddress" can be ElectronicAddress.

In certain implementations, the CDT ElectronicAddress may not be used as a reference component for binary data that is sent as an additional MIME attachment. The CDT BinaryObject (described above) can be available for this purpose.

Identifier

A CDT Identifier is a identification of an object within an identification scheme that can be managed by an agency. There are usually multiple identification schemes for identifying an object. An example of CDT Identifier is:

Another example of CDT Identifier is:

<ProductID schemeID="GTIN" schemeAgencyID="113">10614141000415</ ProductId>

Another example of CDT Identifier is:

<ProductID schemeID ="householdappliance" schemeAgencyID="065055766" schemeAgencySchemeID="DUNS" schemeAgencySchemeAgencyID="016">123</ ProductId>

Another example of CDT Identifier is:

<ProductID schemeID ="householdappliance" schemeAgencyID="4711" schemeAgencySchemeID="PartyA" schemeAgencySchemeAgencyID="ZZZ">456</ ProductId>

In certain implementations, CDT Identifier may have the following structure:

| CDT | | Category | Object Class | Property Term | Representation Term | Type | Datatype | Length | Cardinality | Remarks |
|---|---|---|---|---|---|---|---|---|---|---|
| Identifier | | | Identifier | Identifier | Content | xsd | token | | | |
| | schemeID | A | Identification Scheme | Identification | Identifier | xsd | token | 1..60 | 0..1 | Optional |
| | scheme-VersionID | A | Identification Scheme | Version | Identifier | xsd | token | 1..15 | 0..1 | Optional |
| | scheme-AgencyID | A | Identification Scheme Agency | Identification | Identifier | xsd | token | 1..60 | 0..1 | Optional |
| | scheme-Agency-SchemeID | A | Identification Scheme Agency | Scheme | Identifier | xsd | token | 1..60 | 0..1 | Optional |
| | scheme-Agency-Scheme-AgencyID | A | Identification Scheme Agency | Scheme Agency | Identifier | xsd | token | 3 | 0..1 | Optional |

The following attributes can be assigned to the CDT Identifier. schemeID can be the ID of the ID scheme (e.g., released and maintained by the responsible organization of the ID scheme). The GDT owner may retrieve the correct ID from the responsible organization. If there is no ID available, the name of the identifier or identifier type may be entered, which can be used in the corresponding standard, specification, or scheme of the responsible organization. schemeVersionID can be the version of the ID scheme (e.g., released and maintained by the organization, which is named in schemeAgencyID). The owner may retrieve the relevant version ID from the responsible organization. If there is no version for the ID scheme, the version of the standard, the specification, or the scheme can be used. SchemeAgencyID can be the ID of the organization maintaining the ID scheme. This identification can be released by an organization contained in DE 3055 (e.g., DUNS, EAN). The GDT owner may retrieve the correct ID from the responsible organization. SchemeAgencySchemeID can be the identification of the schema, which can identify the organization named in schemeAgencyID. It can be a certain scheme ID of partners, companies, members, etc. (e.g., DUNS+4) of an organization named in schemeAgencySchemeAgencyID (e.g., EAN, DUNS, SWIFT, etc.). SchemeAgencySchemeAgencyID can be the identification of the maintaining organization (e.g., DUNS, EAN, SWIFT, etc.), which can be responsible for the identification of the organization named in schemeAgencyID. The organization may be contained in DE 3055.

The CDT Identifier can be used for elements or attributes that are used in the communication between partners or systems to enable identification of logical or real objects. If the agency that manages the identification scheme is not explicitly identified, but is specified using a role, this can be done in the tag name.

In some implementations, the following types of identifier can be represented. For standardized identifiers whose identification schemes are managed by an agency from the DE 3055 code list. A schemeID can be the identification scheme for the standard identifier. SchemeVersionID can be the version of the identification scheme. SchemeAgencyID can be the agency from DE 3055. For proprietary identifiers whose identification schemes are managed by an agency that can be identified using a standard, a schemeID can be the identification scheme for the proprietary identifier. A schemeVersionID can be the version of the identification scheme. A schemeAgencyID can be the standardized ID for the agency (e.g., normally the company that manages the proprietary identifier). A schemeAgencySchemeID can be the identification scheme for the schemeAgencyId. A schemeAgency-SchemeAgencyID can be the agency from DE 3055 that manages the standardized ID schemeAgencyId. For proprietary identifiers whose identification schemes are managed by an agency that can be identified without the use of a standard, a schemeID can be the identification scheme for the proprietary identifier. A schemeVersionID can be a version of the identification scheme. A schemeAgencyID can be a proprietary ID for the agency (e.g., normally the company that manages the proprietary identifier), A schemeAgency-SchemeID can be a identification scheme for the schemeAgencyId. A schemeAgencySchemeAgencyID can be ‘ZZZ’ (e.g., mutually defined from DE 3055). For proprietary identifiers whose identification schemes are managed by an agency that can be specified using a role at all. The role can be specified as a prefix in the tag name. If there is more than one identification scheme, schemeID, and schemeVersionID can be used as attributes. In certain implementations, attributes are not required if there is one identification scheme. A schemeID can be a identification scheme for the proprietary identifier. A schemeVersionID can be a version of the identification scheme. The representation term for the CDT Identifier can be Identifier.

Indicator

A CDT Indicator is the representation of a situation that has two mutually exclusive Boolean values. An example of CDT Indicator is:

<Indicator>true</Indicator>

In certain implementations, CDT Indicator may have the following structure:

| CDT | Category | Object Class Term | Representation Term | Based Type |
|---|---|---|---|---|
| Indicator | simpleType | Indicator | Type | xsd:boolean |

The attributes for CDT Indicator may have the following values: 1 (i.e., true) or 0 (i.e., false).

The CDT Indicator can be used for binary classifications, indicators, flags, etc. For a conversion of the XML representation into the internal format methods can be provided by the ABAP class CL_GDT_CONVERSION.

The CDT Indicator may include the following list of qualifiers: an AccountDebitIndicator specifies whether an account has been debited during an account movement. For example, AccountDebitIndicator can be used with a payment message to display that the recipient’s bank account will be debited. The AccountingRelevanceIndicator indicates whether something is relevant for Accounting. This indicator can be based on the already existing GDT RelevanceIndicator (described below). An ActiveIndicator indicates whether an object is commercially active and whether it can be used in a process. For example, the ActiveIndicator can be used to label objects that can be commercially active or inactive (e.g., sources of supply). In the context of an interface, there may be a description of which object the ActiveIndicator refers to and what it means in terms of business. An AllowedIndicator indicates whether something is allowed. The word “something” generally can stand for procedures, operations, or statuses. For example, the AllowedIndicator can be used to indicate whether a customer is allowed to submit an online purchase order in lower-case letters. For each AllowedIndicator, what is allowed may be indicated. This can be reflected in an appropriate name prefix. For example, a NegativeValueAllowedIndicator can specify whether negative numeric values are allowed, while a LowerCaseAllowedIndicator can specify whether lower-case letters are allowed. In the context of an interface, the business significance of “what is allowed” may be described for the AllowedIndicator in addition to using the name prefix. An AlternativeExistsIndicator may specify whether an alternative exists for something. Specifications regarding what can have alternatives may be made for each AlternativeExistsIndicator. An AmountBalanceIndicator may indicate whether an amount is a balance. For example, AmountBalanceIndicator can be used to indicate whether the balance of all open receivables can be transferred in a message to a party or whether the amount transferred is an individual receivable.

In certain implementations, a balance amount can be positive or negative. In the context of an interface, the amount to which the AmountBalanceIndicator refers and the business significance of the balance may be described. An AppliedIndicator specifies whether something was applied. The indication of whether something was applied can refer to a rule, method, or procedure. An ApplyIndicator can indicate whether something should be used. The word “something” may stand for processes, objects, or the like. The AppliedIndicator can specify whether something was used whereas the ApplyIndicator can specify whether something should be used. An AssociationExistsIndicator indicates whether a business object has an association to or from another specific business object. An AttachmentExistsIndicator specifies whether an attachment exists. For example, individual attachments can be managed within the dependent object “Attachment Folder.” An AttachmentExistsIndicator can be used to indicate whether an attachment exists for a particular business object within the related dependent object “Attachment Folder.” It may be clear in the context which attachment the indicator refers to. In some implementations, AutomaticallyGeneratedIndicator specifies whether something was generated automatically. In this context, “automatically generated” can mean that in the given circumstances, a result was achieved with no manual interference. For example, the automatic generation by a system is understood as the opposite of a manual or a user-triggered generation. For example, a HandlingUnit can be moved from one storage location to another. To document this stock change, an inventory change item can be created. As a result of this movement, the other materials contained in the HandlingUnit and SubHandlingUnits are also moved. To document these other materials’ movements and the SubHandlingUnits, additional inventory change items can be created that have the AutomaticallyGeneratedIndicator. These additional document items can be created by the system automatically with no queries to the user.

An AutomaticIndicator specifies whether something occurs automatically. For example, the AutomaticIndicator can be used to display the fact the decision for an inspection result in an inspection lot was made automatically. The AutomaticNumberingIndicator specifies whether identifiers are assigned automatically. The AutomaticNumberingIndicator may be used in business objects and/or their replication messages. The AutomaticNumberingIndicator is used mainly for numerical or alphanumerical identifiers so restrictions may be specified for each usage. For example, the AutomaticNumberingIndicator can be used to control whether identifiers (e.g., document numbers or product numbers) are assigned automatically. Product category identifiers may be assigned automatically. A BalanceCarryForwardIndicator indicates whether a balance is carried forward. For example, from this indicator, it can be determined if the balance for the fund in funds management will be carried forward as part of year-end closing. The balance can be recorded for the fund and then carried forward to the next fiscal year. The BalanceCarryForwardIndicator can be based on the data element FM_KZBST. A BaseQuantityUnitIndicator specifies whether a quantity unit is the base unit of quantity. A base unit of quantity is the unit to which all alternative units of quantity (e.g., of a product) can be converted. A unit of quantity can be indicated as the base unit of quantity for each product. For example, you can use the base unit of quantity of a product to convert all the quantity details of this product to another unit of quantity. For example, when a product is sold where the sales unit of quantity deviates from the price unit of quantity, the sales unit of quantity is converted to the price unit of quantity using the base unit of quantity, so that the sales price can be determined. When taking inventory, stocks that have different units of quantity can be converted to stock-keeping units using the base unit of quantity. The BaseQuantityUnitIndicator can be represented by the table field COMM_PR_UNIT-IS_BASE_UNIT. The BindingIndicator indicates whether something is binding. A BlockedIndicator specifies whether something is blocked. The word "something" may stand for specific documents, processes or objects. It can specify what is blocked for every BlockedIndicator. This can be reflected in a corresponding name prefix. For example, AccountBlockedIndicator can specify whether an account is blocked. The BlockedIndicator can be required for indicating objects that can be blocked, such as credit cards, accounts, escalators, and streets. In addition to the name prefix entry, the business meaning of the block may also be specified for the BlockedIndicator.

A BusinessTransactionBlockedIndicator indicates whether the execution of a business transaction is blocked. For example, the GDT can be used in various environments in delivery and in billing. Delivery Execution can be used by a requesting application (e.g., Sales) to send a delivery request to Supply Chain Execution (e.g., for planning purposes) at an early stage, but, at the same time, to inform Supply Chain Execution that the delivery should not be executed yet since, e.g., in the case of a sales order, several points still have to be clarified with the customer, necessary papers are missing, or the customer's credit limit has been exceeded or has not yet been checked. Billing can be used by a requesting application (e.g., Sales) to setup a billing due list in billing but, at the same time, to specify that billing may not yet be executed. There are many reasons for the billing block. It is possible that the requesting application first executes a release procedure, that the customer-specific prices have not yet been determined, that certain necessary documents have not yet been received (e.g., letter of credit procedure), or that the customer's credit limit has been exceeded. A BusinessTransactionDocumentItemThirdPartyDealIndicator indicates whether a document item is used in the context of a third-party deal. For example, the BusinessTransactionDocumentItemThirdPartyDealIndicator can be used to indicate that a document item can be used in the context of a third-party deal. A third-party deal can be a process in which a company processes a sales order via a third party rather than fulfilling it directly itself. The context to which the BusinessTransactionDocumentItemThirdPartyDealIndicator can refer may be clear from the usage of the GDT. The BusinessTransactionDocumentPricingIndicator indicates whether pricing/price determination should be performed for all items or for selected items in a business transaction. Business documents or items in business documents for which pricing/price determination can be performed are generally linked to the purchase or sale of products (e.g., order, delivery and trans-port documents, and their items). For example, the BusinessTransactionDocumentPricingIndicator can be used in the ordering, delivery, and transport of products to indicate in the corresponding Business Transaction documents whether pricing/price determination should be performed, and, if so, for which items. A BusinessTransactionDocumentPublicIndicator indicates whether a business document is public. "Public" in this case means that access to the business document is not restricted in any way and the document is published in a standard place. For example, the BusinessTransactionDocumentPublicIndicator can be used in a bid invitation to indicate whether the bid invitation is open to the public or limited to an exclusive group of participants. It therefore can indicate to potential participants whether the group of fellow bidders is restricted in advance. When the GDT is used, the name component "BusinessTransactionDocument" can be replaced with an actual BusinessTransactionDocumentType (e.g., PurchaseOrder, RFQ, etc.).

A BusinessTransactionDocumentSettlementRelevanceIndicator indicates whether a given Business Transaction document or one of its items should be settled. Settlement can incorporate both billing and invoice verification. For example, the BusinessTransactionDocumentSettlementRelevanceIndicator can be applied to business documents that are created when products are ordered, goods are delivered, or services are provided, or that transmit information from such business documents. It can be applied to the entire document or to individual items. If it is transmitted with the value "true" for an entire document or one of that document's items, the whole document or the marked item can be settled. References are used to ensure that additional information is taken into account. If the indicator is transmitted with the value "false" for an entire document or one of that document's items, then the whole document or the marked item may not settled. References can be used to ensure that transmitted information is also taken into account during settlement of documents/items that are transmitted with an indicator with value true. If an Order Management credit memo request prompts the creation of a credit memo in billing, then the credit memo request can be transferred with the indicator value set to "true." For example, if an Order Management standard order needs to be taken into account during the billing of the deliveries that resulted from it, then that standard order can be transferred with the indicator set to "false," and the subsequent delivery document with the indicator set to "true". The references in the delivery document to the items in the standard order may ensure that the standard order may then be taken into account during settlement. The BusinessTransactionDocument-SettlementRelevanceIndicator can correspond largely to "billing relevance" in R/3 or CRM, with which it can be possible to control which quantities should be settled when they should be settled.

A CancellationDocumentIndicator specifies whether a document is a cancellation document. For example, a CancellationDocumentIndicator can be used to specify whether an accounting document is a cancellation document. CancellationDocumentIndicator is not to be confused with CancelledIndicator. In some cases, the CancelledIndicator can be set to "true" for a cancelled document because that document has been rejected or withdrawn. However, for the cancelled document that documents this transaction, the CancellationDocumentIndicator is set to "true."

A CancelledIndicator is the indication whether an object was or was not cancelled or revoked for business management reasons. A CancelledIndicator is related either to objects closely tied to a transaction (e.g., open remaining quantities or dates) or to objects that have a transactional type character (e.g., supply determination for a requirement, product catalog transfer in several steps, business transactions, quantity or value of changes in stock). For example, the ActionCode can be a request for the receiver to do something. In contrast, the CancelledIndicator can be a status notification to the receiver. For some objects, there is the choice to use either a CompletedIndicator or CancelledIndicator, depending what emphasis should be used. If the processing of the object is regularly completed (i.e., CompletedIndicator) or if the object is cancelled due to an exceptional situation (i.e., CancelledIndicator). In the context of the user interface, it may be described to which object the CancelledIndicator can be related, what the actual business meaning can be and if the CancelledIndicator can be reversed in a follow up message.

A CashDiscountDeductibleIndicator specifies whether a cash discount can be deducted from, for example, an invoice, credit memo, purchase order, sales order, and the like. A ChangeAllowedIndicator indicates whether, for example, the values of objects can be changed. A ChangedIndicator is the indication of whether, for example, an object or attribute was changed. A CheckedIndicator specifies whether something was checked. A CheckedIndicator does not say anything about the result of the check.

A CheckedOutIndicator specifies whether something has been taken from or borrowed by someone, for example. A CollectionAuthorisationIndicator shows whether a collection authorization exists. A collection authorization is the basis for the collection authorization process: The paying party uses this to authorize the payee to draw on the paying party's account. A CombinationAllowedIndicator specifies whether several things of something are allowed to be combined in a single different something. In some implementations, a CompanyControlIndicator shows whether a person controls a company. A CompanyDirectorIndicator can indicate whether an employee is a company director. A company director may be, for example, a member of a board, or similar body where the company is managed by a board or similar body, or a single person where the company is managed by an individual.

A CompetitorProductIndicator specifies whether a product is a competitor product. A competitor product may be a product offered by a competitor. A CompleteIndicator specifies whether, for example, processes or objects are complete. A CompletedIndicator is the information on whether an object is completed in a business sense. In general, a CompletedIndicator relates to business transactions (for example, invoice creation, delivery, sourcing) or to objects that have the character of a transaction (for example, product catalog transfer in multiple steps). The CompleteTransmissionIndicator specifies whether an element transferred in a message or a transmitted list of similar elements is transmitted in its entirety. For example, the complete transmission of all the child elements of an element that are relevant for the message. When an element is deleted, all the child elements are regarded as also deleted with the result that even with a complete transmission in this case, the identification of the object is transferred. The ConsignmentIndicator indicates whether the transaction form of the consignment is present.

A CopyIndicator indicates whether something is a copy of an original. A CorrectionRunIndicator specifies whether a run is a correction run. A CorrespondenceBrailleRequiredIndicator indicates whether correspondence should be written in Braille. A CorrespondenceUpperCaseRequiredIndicator indicates whether correspondence should be written in uppercase. A CreditAgencyReportRetrievalPermissionIndicator indicates whether a party has consented to have credit information about it obtained. A CreateNewVersionIndicator specifies whether a new version is to be created for something. A CreditWorthinessIndicator indicates whether a party is creditworthy. A CustomerServiceSupportTeamIndicator specifies whether something is a customer service & support team for the processing of service requirements and customer complaints. A DangerousGoodsIndicator indicates whether dangerous goods are contained in a combination of products. A DaylightSavingTimeIndicator indicates whether a given local time-point is in daylight saving time. A DeductionIndicator specifies whether something is a deduction. A DefaultIndicator shows whether, for example, a function that has to be carried out or an object/element that has to be selected has been designated as a default. A DeletedIndicator indicates whether an object has been logically deleted.

A DeliveryBasedInvoiceVerificationIndicator is the declaration whether invoice verification occurs against the goods receipt. A DependencyIndicator indicates whether, for example, an object or an object's attribute has a dependency. If it does not get clear by the context from what something is dependent a second level qualifier may be used to clarify the dependency. Possible 2nd level qualifiers include Language and SalesArea, for example. A DetailedIndicator specifies whether, for example, processes or objects are detailed.

A DeviationIndicator specifies whether there is a deviation. A DirectMaterialIndicator indicates whether a material is used as a direct material in the context of a process. A direct material is a product of the type "material" that is used directly in the production of products and that affects the value of the finished product in terms of manufacturing costs. A DocumentExistsIndicator specifies whether something exists as a document. In certain implementations, the DocumentExistsIndicator may not be used as an AttachmentIndicator.

A DoubtfulIndicator indicates whether something is doubtful. A DueClearedIndicator specifies whether an item due for payment (receivable or payable) was cleared with another item due for payment. In certain implementations, "cleared" means that both items due for payment balance to zero taking granted deductions and discounts into account. A DueClearingIndicator indicates whether receivables and payables are cleared against each other. An EffectiveIndicator specifies whether something is effective. An EnabledIndicator indicates whether, for example, attributes or processes have been enabled.

A EuropeanCommunityVATTriangulationIndicator indicates whether a delivery is an intra-community triangulation according to the VAT law of a member state of the European Community. In Germany, for example, intra-community triangulations are governed by paragraph 25 of the UStG (turnover tax law). The VAT laws of the other member states of the European Community contain similar paragraphs. An EvaluatedReceiptSettlementIndicator indicates whether the evaluated receipt settlement (ERS) procedure is to be used for settlement. An ExcludedIndicator specifies whether something is excluded. An ExemptedIndicator indicates whether someone/something is exempted from something. The FieldServiceTeamIndicator specifies whether something is a field service team for the processing of on-site service orders.

A FixedIndicator indicates whether a value/object is fixed. 'Fixed' may indicate that the value/object is limited in its use, for example, it cannot be changed. A FlatRateReimbursementIndicator specifies whether there is a flat rate reimbursement. A GroupedIndicator indicates whether something is grouped. A HealthRiskIndicator indicates whether a person has a health risk. A InformationOutdatedIndicator indicates whether information is outdated. A InheritedIndicator specifies whether an object has been inherited from another object. By object, we generally mean a business object (such as a product category). The InhouseRepairTeamIndicator specifies whether something is an in-house repair team for the processing of in-house repair orders. An InstalledIndicator specifies whether something is installed. An InternalEmployeeIndicator specifies whether an employee is an internal employee. An employee is an internal employee if he or she is in a position of subordination to another's authority. An InternalIndicator specifies whether something is internal. InventoryManagedIndicator indicates whether inventory is managed. Inventory can be managed in a storage location (e.g., logistics area). A InventoryManagedLocationIndicator specifies whether a location is used to manage stock. An inventory managed location is a location in which materials are stored. The InventoryRelevanceIndicator indicates whether something is relevant for Inventory. An InvoiceCancellationInvoiceIndicator indicates whether an invoice is a cancellation invoice. An InvoiceIntraCorporateIndicator indicates whether an invoice is between independent companies in a corporate group.

A LimitViolationIndicator specifies whether a limit was violated. A LinkToFolderIndicator specifies whether a link refers to a folder. MainIndicator indicates whether, for example, an object or a transaction within a specific context has an emphasized meaning. A ManagingPositionIndicator indicates whether a position is a managing position. A ManuallyConfirmedIndicator specifies whether something was confirmed manually. A MinorityOwnedIndicator specifies whether something is owned by a minority. A MobilePhoneNumberIndicator specifies whether a telephone number is a mobile number. A MultipleSystemsAttributesIndicator specifies whether an object in an application system contains attributes from different application systems. An application system is a system where applications supporting business or technical tasks are integrated, and run on a common data basis, for example. A NaturalPersonIndicator specifies whether the party is a natural person. In some implementations, all people are considered natural persons.

A NumberedIndicator specifies whether something is numbered. OffsettingIndicator specifies whether an amount, a quantity, or a number is offset. 'Offset' generally means that an amount, quantity, or number is added to an amount, quantity or number with a reverse plus/minus sign. PackagingMaterialTiedIndicator specifies whether a packaging material (load carrier, additional packaging material) is tied to a packaging unit. A packaging unit is a HandlingUnit or a LogisticsUnit, for example. A PaidByCompanyIndicator specifies whether the company paid something. A PartTimeIndicator indicates whether the something is part-time. In certain implementations, not part time implies fulltime. A PartyInitiatedActionIndicator specifies whether a party triggered an action. The "PickUpIndicator" indicates whether something (e.g., materials) is picked up.

A PlannedIndicator indicates whether something is or has been planned. A POBoxIndicator specifies whether there is a PO Box address. This indicator is necessary if a PO Box number is not specified within a PO Box address. A PreAuthorisationIndicator specifies whether something is a preauthorization. A preauthorization is a check using a small amount (such as 1 Euro) whether the credit card to be used is valid. In some implementations, a preauthorization does not replace an authorization; instead it is a weaker form of authorization. A PregnancyWithMultiplesIndicator indicates whether a pregnancy is a pregnancy with multiples. A PriceSpecificationElement-PropertyValuationIdentifyingIndicator indicates whether the property valuation is identifying for a specification of a price, discount, or surcharge. A non-identifying property valuation is generally known as 'characterizing.' A ProductConfigurableIndicator specifies whether a product can be configured. A ProductDiscontinuationIndicator indicates whether a product is to be discontinued, e.g., removed from the product line. A ProjectTaskChecklistItemIndicator specifies whether a task in a project corresponds to a checklist item. A checklist defines which items are to be executed or checked for a task in a project. The checklist items themselves are also tasks. A ProjectTaskMilestoneIndicator specifies whether a task in a project is a milestone. A milestone is an intermediate goal that may be achieved during a project.

A ProjectTaskPhaseIndicator specifies whether a task in a project is a phase. A phase is a section of a project that is executed in a defined period of time, and that is distinct from other sections in terms of its content. A ProjectTaskSummaryTaskIndicator specifies whether a task in a project is a summary task. A summary task is a task in a project that has one or more subordinate tasks. A PropertyMultipleValueIndicator indicates whether a property can incorporate a list of values. A PropertyParametricSearchableIndicator indicates whether a property is suitable for a parametric search. A parametric search (also called an 'attribute search') is a search for an object using explicit information about which values a property in the object is to contain. For example, in the case of a parametric search for a red vehicle with 100 HP, the properties: Color="red" and Performance="100 HP" are specified explicitly. A PropertyValuationRequiredIndicator indicates whether a value has to be specified for a property.

A PurchaseOrderOrderedIndicator indicates whether a purchase order has been sent to a vendor. The PurchasingGroupIndicator specifies whether something is a purchasing group. A PurchasingOrganisationIndicator specifies whether something is a purchasing organization. A ReadIndicator indicates whether, for example, documents, processes or objects have already been read. A ReconciliationIndicator specifies whether something relates to a reconciliation. A ReferenceIndicator specifies whether something is a reference to something else. A RegularIndicator indicates whether something occurs on a regular basis. A ReleasedIndicator specifies whether, for example, an object is released. The RelevanceIndicator indicates whether, for example, specific objects, procedures, actions or transactions are to be considered.

A RentedIndicator specifies whether something is rented. A RepeatIndicator indicates whether something is repeated. A ReplaceIndicator specifies whether, for example, objects or parts of objects have replaced something else. A RequiredIndicator indicates whether, for example, specific procedures, operations or events are required. The ResidentIndicator indicates whether a person is a resident of a location. The location is derived from the qualifier (e.g. New York, or Yonkers). The ReturnsIndicator specifies whether something is returned. The RevaluationIndicator indicates whether a value-based representation of a business transaction is a revaluation.

A RevocationIndicator indicates whether, for example, a legally binding statement, agreement or authority is revoked. The RoleIndicator indicates whether a person or party plays a specific role. The qualifiers for the role indicator are generally taken from the party roles. For example, EmployeeWorkStateTaxAuthority is a qualifier that indicates whether the tax authority plays the role of the employee's work state. A RoundTripIndicator indicates whether a trip is to a single destination and starts and ends at the same location. The SalesGroupIndicator specifies whether something is a sales group. The SalesOfficeIndicator specifies whether something is a sales office. The SalesOrganisationIndicator specifies whether something is a sales organization. A ServiceAcknowledgementCancellationServiceAcknowledgementIndicator indicates whether a service acknowledgement has been cancelled. The ServicePointIndicator specifies whether something is a service point. A ServiceProductBasedValuationIndicator indicates whether a valuation is based on a service product.

A ShipFromIndicator specifies whether you can retrieve goods from, for example, a location. A ShipToIndicator specifies whether you can deliver goods to something. A ShutDownIndicator specifies whether an object is technically shut down. A SignedIndicator indicates whether a document was signed. A SinglePaymentIndicator specifies whether something (e.g., a business document that is based on a payment) may be paid individually. A SiteIndicator specifies whether something is a site. In certain implementations, a Site is a Location at which parts of a company are located. A SkipIndicator indicates whether something should be skipped. A SkippedIndicator indicates whether something has been skipped. A SporadicIndicator specifies whether something (e.g., a process or object) is sporadic within a specific context. A StartedIndicator indicates whether something is already started. A SubContractingIndicator indicates whether the transaction form is subcontracting. A SubHierarchyDefinitionIndicator indicates whether something (e.g., specific properties or facts) is used to establish a subhierarchy.

A SubmittedIndicator is a specification as to whether something (e.g., documents, requests, or explanations that are submitted or have been submitted for checking or approval) has been submitted. A SubstitutionAllowedIndicator indicates whether it is allowed to substitute something. A SuspendedIndicator indicates that something (e.g., process, process step, or function) has been suspended. An SystematicIndicator specifies whether something occurs systematically. A TaxDeferredIndicator specifies whether a tax payment has been deferred. A TestDataIndicator indicates whether the specified data is test data. A TestRunIndicator specifies whether something is a test run. A TextExistsIndicator specifies whether a text exists A TextSearchableIndicator indicates whether an object is available for text search. In certain implementations, a search is performed for a text that is contained either entirely or in part in objects indicated by the indicator. A TotalAmortizementIndicator is an indicator as to whether the loan is to be repaid in one amount at the end of its term. A TravelingIndicator indicates whether a person is traveling.

A ValueDifferenceIndicator indicates whether a value-related difference exists. A ValueUnlimitedIndicator indicates whether a value is unlimited. A VisibleIndicator indicates whether something (e.g., specific characters, documents, properties, or facts) is visible. A WithinOpeningPeriodIndicator indicates whether planning order start dates are in the opening period. In certain implementations, the opening period is the time period during which a planning order should be converted into a production order or a purchase order. A WithoutNoticeIndicator specifies whether something (e.g., process or operation) occurs with notice. A WomanOwnedIndicator indicates whether something is owned by a woman or a group of women.

Measure

A CDT Measure is a physical measurement with the corresponding unit of measurement. An example of CDT Measure is:

<NetWeightMeasure unitCode="KGM">420.5</NetWeightMeasure>

In the previous example, "KGM" represents a kilogram (i.e., the net weight measures 420.5 kilograms). In certain implementations, CDT Measure may have the following structure:

| GDT | | Cat. | Object Class | Property | Representation/ Association | Data Type | Len. | Card. | Remarks |
|---|---|---|---|---|---|---|---|---|---|
| Measure | | | | | Measure | xsd:decimal | 17.14 | | |
| | unit-Code | A | Measure | Unit | Code | Measure-UnitCode | 1..3 | 0..1 | Mandatory/ Optional, if a default value is set. |

Measure can be the result of the measurement of a physical size in relation to a standard size, which can be the standard against which everything else is measured. Positive and negative entries may be possible by using the built-in data type "xsd:decimal." Negative entries may be prefixed with a negative sign. Positive entries may be prefixed with a positive sign. Measurement units can be represented in the attribute "unitCode." The permitted variations of the "unitCode" attribute of Measure can be the physical units included in GDT MeasureUnitCode (described below).

Measure can be used to specify physical business sizes. See the GDT Quantity (described below). Examples of such measurements are the height, width, length, weight, and volume of a handling unit, or the latitude or longitude of a geographic location.

Measure should not be confused with Quantity. In contrast to Measure, Quantity can be used for the definition of quantity values or units. Quantities can be, for example, piece sizes (e.g., packets, containers, and the like) and physical sizes (e.g., meters, centimeters, and kilograms). For a conversion of the XML representation into the internal format methods can be provided by the ABAP class CL_GDT_CONVERSION. Allowed qualifiers of Measure can be roles defined at GDT MeasureRoleCode (described below).

Numeric

A CDT Numeric is a decimal value. An example of CDT Numeric is:

<Numeric>123.345</Numeric>

In certain implementations, CDT Numeric may have the following structure:

| CDT | Category | Property Term | Representation Term | Datatype |
|---|---|---|---|---|
| Numeric | complexType | Numeric | Content | xsd:decimal |

Positive and negative numeric values can be used by using the built-in data type "xsd:decimal." Negative values may be prefixed with a negative sign. However, positive values do not require a positive sign prefix. The decimal sign can be represented as a period.

The primary representation term for the CDT "Numeric" is Numeric. Other secondary representation terms can be representation term, value, rate, or percent. In certain implementations, the CDT Numeric may not be used for an indication of quantity, measure, or amount.

Quantity

A CDT Quantity is the non-monetary numerical specification of an amount in a unit of measurement. An example of CDT Quantity is:

<OrderedQuantity unitCode="CT">100</OrderedQuantity>

In the previous example, "CT" represents a carton (i.e., there are 100 cartons ordered). In certain implementations, CDT Quantity may have the following structure:

| GDT | Category | Property Term | Representation Term | Datatype |
|---|---|---|---|---|
| Numeric | complexType | Numeric | Content | xsd:decimal |

A quantity can be the result of the numerical comparison of the number, amount, or size of a given item or attribute and a standard number, amount, or size. Depending on the item or attribute to be qualified and the business context, the comparison can be made by physically measuring or counting. Positive and negative entries can be possible by using the built-in data type "xsd:decimal." Negative entries may be prefixed with a negative sign. In certain implementations, positive entries do not have to be prefixed with a positive sign. Measurement units can be represented in the attribute "unitCode," in accordance with UN/ECE Recommendation No. 20 or X12 355.

The permitted variations of the "unitCode" attribute can be described in more detail in the GDT MeasureUnitCode (described below). Quantity can be used to specify the amount of a (e.g., manufactured, ordered, transported, delivered, etc.) product. In each given context, a decision may be made as to whether an amount (i.e., Quantity) or a physical measurement (i.e., Measure) is being specified. For this purpose, the physical units (i.e., PhysicalMeasureUnits) used in Measure can form a subset of the measurement units (i.e., MeasureUnits) used in Quantity. MeasureUnitCode can help to determine the "UnitCode" attribute.

SMALLINTEGER_Quantity

The CDT SMALLINTEGER_Quantity is a representation of a small numerical value. An example of CDT SMALLINTEGER_Quantity is:

<Quantity unitCode="DAY">365</Quantity> (DAY=Day)

In certain implementations, CDT SMALLINTEGER_Quantity may have the following structure:

| GDT | | Cat. | Object Class Qualifier | Object Class | Property | Representation/ Association | Data Type | Len. | Card. |
|---|---|---|---|---|---|---|---|---|---|
| SMALL-INTEGER__ Quantity | | | SMALL-INTEGER__ | Quantity | | Type | xsd:integer | 3 | |
| | unit-Code | A | SMALL-INTEGER__ | Quantity | Unit | Code | Measure-UnitCo | 1..3 | 1 |

The CDT SMALLINTEGER_Quantity can be a restriction on CDT Quantity (described above) to specify a uniform length for short integer quantities. The CDT SMALLINTEGER_Quantity can contain the variable "SMALLINTEGER_," which can be replaced by one or more qualifiers. The qualifiers can be contained in the list in section QuantityRoleCode.

LARGE_Quantity

A CDT LARGE_Quantity is a representation of a large numerical value. An example of CDT LARGE_Quantity is:

<Quantity unitCode="KGM">20590.5</Quantity> (KGM=Kilogram)

In certain implementations, CDT LARGE_Quantity may have the following structure:

| GDT | | Cat. | Object Class Qualifier | Object Class | Property | Representation/ Association | Data Type | Len. | Card. | Remarks |
|---|---|---|---|---|---|---|---|---|---|---|
| LARGE__ Quantity | | | LARGE__ | Quantity | | Type | xsd:Decimal | 12.3 | | |
| | unit Code | A | LARGE__ | Quantity | Unit | Code | Measure-UnitCode | 1..3 | 1 | |

The CDT LARGE Quantity may be a restriction on Core Data Type Quantity to specify a uniform length for large quantities. LARGE_Quantity contains the variable “LARGE_,” which gets replaced by one (or more) qualifier. The qualifiers are contained in the list in section QuantityRoleCode.

INTEGER_Quantity

An example of CDT INTEGER_Quantity is:

<Quantity unitCode=“BX”>1000</Quantity>

In the above example, “BX” represents a box. In certain implementations, CDT INTEGER_Quantity may have the following structure:

| GDT | | Cat. | Object Class Qualifier | Object Class | Property | Representation/ Association | Data Type | Len. | Card. | Remarks |
|---|---|---|---|---|---|---|---|---|---|---|
| INTEGER_ Quantity | | | INTEGER_ | Quantity | | Type | xsd:integer | 17 | | |
| | unit Code | A | INTEGER_ | Quantity | Unit | Code | Measure-UnitCode | 1..3 | 1 | |

The CDT INTEGER_Quantity may be a restriction on the CDT Quantity (described above) to specify a uniform length for integer quantities. INTEGER_Quantity can include the variable “INTEGER_,” which gets replaced by one (or more) qualifier. The qualifiers are contained in the list in section QuantityRoleCode.

The CDT INTEGER_Quantity may include qualifiers, for example, MaximumQuantity.

Text

A CDT Text is a character string with an optional language specification. An example of CDT Text is:

<Text languageCode=“DE”>Text is a character string with optional language specification.</Text>

In certain implementations, CDT Text may have the following structure:

| CDT | | Category | Object Class | Property Term | Representation Term | DataType | Length | Cardinality |
|---|---|---|---|---|---|---|---|---|
| Text | | | Text | | Content | xsd string | ∞ | |
| | language-Code | A | Text | Language | Code | Language-Code | 2..9 | 0..1 |

In certain implementations, an upper limit for the number of characters that a “Text” can include is not defined.

Text may include the following attributes: languageCode (i.e., an attribute for determining the particular language of the element content).

LANGUAGEINDEPENDENT_Text

An example of CDT LANGUAGEINDEPENDENT_Text is:

<PropertyValueText>DIN 912</PropertyValueText>

In the above example, “PropertyValue” is a qualifier, which replaces “LANGUAGEINDEPENDENT_” in a business entity (e.g., element name). In certain implementations, CDT LANGUAGEINDEPENDENT_Text has the following structure:

| GDT | Cat. | Object Class Qualifier | Property Qualifier | Representation/ Property | Association | Type | Type Name | Len. | Card. | Remarks |
|---|---|---|---|---|---|---|---|---|---|---|
| LANGUAGE_ INDEPENDENT_ Text | | | LANGUAGE_ INDEPENDENT_ | Text | Type | CDT | Text | ∞ | | restricted |

CDT LANGUAGEINDEPENDENT_Text may be a restriction on the CDT Text. In certain implementations, CDT LANGUAGEINDEPENDENT_Text is language independent, so that the attribute languageCode of the CDT Text (described above) is omitted. In certain implementations, for language, dependent attributes of the CDT Text should be used. For example, the CDT Text has an attribute languageCode to specify the language.

REGIONDEPENDENTLANGUAGE_Text

An example of CDT REGIONDEPENDENTLANGUAGE_Text is:

<CatalogueText languageCode="en-US">Text in American English</CatalogueText>

In the above example, "Catalogue" is a qualifier, which replaces REGIONDEPENDENTLANGUAGE_in a business entity (e.g., element name). In certain implementations, CDT REGIONDEPENDENTLANGUAGE_Text can have the following structure:

| GDT | Cat. | Object Class Qual. | Object Class | Property | Rep./ Ass. | Type | Type Name | Len. | Card. | Remarks |
|---|---|---|---|---|---|---|---|---|---|---|
| REGION-DEPENDENT-LANGUAGE_ Text | | REGION-DEPENDENT-LANGUAGE_ | Text | | Content | | xsd:string | ∞ | | |

The CDT REGIONDEPENDENTLANGUAGE_Text may be a restriction on CDT Text (described above). In certain implementations, the _REGIONDEPENDENTLANGUAGE_Text is region dependent. In such an implementation, the "restricted" GDT REGIONDEPENDENT_LanguageCode is used as type for the attribute languageCode.

The CDT REGIONDEPENDENTLANGUAGE_Text can have the following qualifiers: CatalogueText (i.e., text used in a catalog). In certain implementations, BinaryObject can be represented by a graphic, a picture, a sound, or a video. In some implementation DateTime can be represented by a date or a time. In certain implementations, Numeric can be represented by a value, a rate, or a percent. In certain implementations, Text can be represented by a name.

ActivationStatusCode

A GDT ActivationStatusCode is a coded representation of an activation status. An active object can be active in a business point of view and can be used in a process. An example of GDT ActivationStatusCode is:

<ActivationStatusCode>1</ActivationStatusCode>

In certain implementations, GDT ActivationStatusCode may have the following structure:

| GDT | Property | Representation/ Association | Type | Type Name | Len. | Remarks |
|---|---|---|---|---|---|---|
| Activation-StatusCode | Activation_ Status | Code | CCT | Code | 1..2 | restricted |

The data type GDT ActivationStatusCode may assign a code list to the code. The attributes may be assigned the following values: listID="90024" and listAgencyID="310."

The data type GDT ActivationStatusCode may use the following codes: 1 (i.e., Active), 2 (i.e., Inactive).

ApprovalStatusCode

A GDT ApprovalStatusCode is a coded representation of an approval status. An active object can be active in a business point of view and can be used in a process. An example of GDT ApprovalStatusCode is:

<ApprovalStatusCode>1</ApprovalStatusCode>

In certain implementations, GDT ApprovalStatusCode may have the following structure:

| GDT | Property | Representation/ Association | Type | Type Name | Len. | Remarks |
|---|---|---|---|---|---|---|
| Approval StatusCode | Approval_ Status | Code | CCT | Code | 1..2 | restricted |

The data type GDT ApprovalStatusCode may assign a code list to the code. The attributes may be assigned the following values: listID="90001" and listAgencyID="310." You can use this data type to model approvals using Business Task Management.

The data type GDT ApprovalStatusCode may use the following codes: 1 (i.e., Not Started), 2 (i.e., Approval Not Necessary), 3 (i.e., In Approval), 4 (i.e., Approved), 5 (i.e., Rejected).

ArchivingStatusCode

A GDT ArchivingStatusCode is a coded representation of an archiving status. Archiving during normal system operation can be used to move data from the database in order to limit the amount of data that has to be maintained. Data archiving thereby helps to optimize required disk, space, administration overhead and performance. Archived data cannot be changed anymore. Archiving can be also associated with a reduction in functionality in the access of the data. An active object can be active in a business point of view and can be used in a process. An example of GDT ArchivingStatusCode is:

<ArchivingStatusCode>1</ArchivingStatusCode>

In certain implementations, GDT ArchivingStatusCode may have the following structure:

| GDT | Property | Representation/ Association | Type | Type Name | Len. | Remarks |
|---|---|---|---|---|---|---|
| Archiving-StatusCode | Archiving_ Status | Code | CCT | Code | 1..2 | restricted |

The data type GDT ArchivingStatusCode may assign a code list to the code. The attributes may be assigned the following values: listID="90041" and listAgencyID="310." The use of the ArchivingStatusCode can be mandatory for each BO type for which archiving is supported. If the complete BO instance is to be archived as a whole it should be included in the status scheme associated to the BO root node. In certain implementations, it is valid for the BO node in which the status scheme belongs to the associated and to all hierarchically lower BO nodes.

The data type GDT ArchivingStatusCode may use the following codes: 1 (i.e., Not Archived), 2 (i.e., Archiving in Process), 3 (i.e., Archived).

AuthorisationStatusCode

A GDT AuthorisationStatusCode is the coded representation of the status of an authorization. An example of AuthorisationStatusCode is:

<AuthorisationStatusCode>1</AuthorisationStatusCode>

In certain implementations, GDT AuthorisationStatusCode may have the following structure:

| GDT | Property | Representation/ Association | Type | Type Name | Len. | Remarks |
|---|---|---|---|---|---|---|
| Authorisation-StatusCode | Authorisation_ Status | Code | CDT | Code | 1..2 | restricted |

The data type GDT AuthorisationStatusCode may assign a code list to the code. The attributes may be assigned the following values: listID="90055" and listAgencyID="310." The AuthorisationStatusCode can be used, for an example, in a clearing house payment order to represent the authorization status of a payment done via a payment card.

The data type GDT AuthorisationStatusCode may use the following codes: 1 (i.e., Check Pending), 2 (i.e., Not Authorized), 3 (i.e., Authorized), 4 (i.e., Authorized not Required).

BlockingStatusCode

A GDT BlockingStatusCode is a coded representation of a blocking status. Blocking can be the prohibition of a subsequent process, a change of an object or the usage of an object. An example of GDT BlockingStatusCode is:

<BlockingStatusCode>1</BlockingStatusCode>

In certain implementations, GDT BlockingStatusCode may have the following structure:

| GDT | Property | Representation/ Association | Type | Type Name | Len. | Remarks |
|---|---|---|---|---|---|---|
| Blocking-StatusCode | Blocking_ Status | Code | CCT | Code | 1..2 | restricted |

The data type BlockingStatusCode may assign a code list to the code. The attributes may be assigned the following values: listID="90015" and listAgencyID="310." Setting and resetting the BlockingStatusCode either results from a user decision or from an incoming message. The BlockingStatusCode indicates whether certain subsequent processes or change of an object or usage of an object can be executed or not. If no qualifier can be specified the whole object is affected. A qualifier can be used to indicate the subsequent process. Examples are the FulfillmentBlockingStatusCode which prevent the order from being executed in a delivery process or the InvoiceBlockingStatusCode which prevents an order or a delivery note from being invoiced. A prominent example for the prohibition of the usage of an object is the material blocking. If a material master has this blocking, the sales order cannot be allowed to use this master data record. The BlockingStatusCode can be accompanied by a BlockingReasonCode.

The data type GDT BlockingStatusCode may use the following codes: 1 (i.e., Not Blocked), 2 (i.e., Partially Blocked), 3 (i.e., Blocked).

CancellationStatusCode

A GDT CancellationStatusCode is a coded representation of the status of a cancellation. The cancellation can be a process in which the premature termination of this process or an object means to revoke or take back the object. An example of GDT CancellationStatusCode is:

<CancellationStatusCode>1</CancellationStatusCode>

In certain implementations, GDT CancellationStatusCode may have the following structure:

| GDT | Property | Representation/ Association | Type | Type Name | Len. | Remarks |
|---|---|---|---|---|---|---|
| Cancellation-StatusCode | Cancellation_ Status | Code | CCT | Code | 1..2 | restricted |

The data type GDT CancellationStatusCode may assign a code list to the code. The attributes may be assigned the following values: listID="90000" and listAgencyID="310." The cancellation of a business object denotes the cancellation of the process or processes that are handled by this business object. The cancellation might happen in two steps if, for instance, the confirmation of another business object is needed. When an object can be cancelled, it generally becomes irrelevant for subsequent processes. If these processes have already started, they might be revoked as well.

The data type GDT CancellationStatusCode may use the following codes: 1 (i.e., Not Cancelled), 2 (i.e., In Cancellation), 3 (i.e., Cancel Discarded), 4 (i.e., Cancelled), and/or 5 (i.e., Partially Cancelled).

CashLocationLifeCycleStatusCode

A GDT CashLocationLifeCycleStatusCode is a coded representation of the life cycle status of a cash location. A cash location can be a house bank account, a cash account, a check storage, a bill of exchange book, or a payment card receivables account. A life cycle status can be a status that denotes a prominent stage of a life cycle, series of prominent stages through which an object can pass during its lifetime. A possible sequence of the stages can be determined by the constraints under which an object can pass from one stage to another. An example of GDT CashLocationLifeCycleStatusCode is:

<CashLocationStatusCode>3</CashLocationStatusCode>

In certain implementations, GDT CashLocationLifeCycleStatusCode may have the following structure:

| GDT | Object Class | Property | Representation/ Association | Type | Type Name | Len. | Remarks |
|---|---|---|---|---|---|---|---|
| CashLocation-LifeCycle-StatusCode | Cash Location | Life Cycle_ Status | Code | CCT | Code | 1..2 | restricted |

The data type GDT CashLocationLifeCycleStatusCode may assign a code list to the code. The attributes may be assigned the following values: listID="90050" and listAgencyID="310."

The data type GDT CashLocationLifeCycleStatusCode may use the following codes: 1 (i.e., In Preparation), 2 (i.e., In Revision), 3 (i.e., Active), 4 (i.e., Closed).

CashPaymentLifeCycleStatusCode

A GDT CashPaymentLifeCycleStatusCode is a coded representation of the life cycle status of a CashPayment. A CashPayment can be the inflow or outflow of cash in or from a cash storage. A life cycle status can be a status that denotes a prominent stage of a life cycle, a series of prominent stages through which an object can pass during its lifetime. A possible sequence of the stages can be determined by the constraints under which an object can pass from one stage to another. An example of GDT CashPaymentLifeCycleStatusCode is:

<CashPaymentLifeCycleStatusCode>3</CashPaymentLifeCycleStatusCode>

In certain implementations, GDT CashPaymentLifeCycleStatusCode may have the following structure:

| GDT | Object Class | Property | Representation/ Association | Type | Type Name | Len. | Remarks |
|---|---|---|---|---|---|---|---|
| CashPayment-LifeCycle-StatusCode | Cash Payment | Life Cycle_ Status | Code | CCT | Code | 1..2 | restricted |

The data type GDT CashPaymentLifeCycleStatusCode may assign a code list to the code. The attributes may be assigned the following values: listID="90054" and listAgencyID="310."

The data type GDT CashPaymentLifeCycleStatusCode may use the following codes: 1 (i.e., In Preparation), 2 (i.e., Advised), 3 (i.e., Confirmed), 4 (i.e., Cancelled).

ChecklistResultStatusCode

A GDT ChecklistResultStatusCode is a coded representation of the possible outcome of a checklist. A checklist can be a list of items to be checked or consulted. A check usually is a verification of something with a result. In contrast to a check an inspection can be a formal examination of something. It takes into consideration many variables and has a more detailed result. An example of GDT ChecklistResultStatusCode is:

<ChecklistResultStatusCode>1</ChecklistResultStatusCode>

In certain implementations, GDT ChecklistResultStatusCode may have the following structure:

| GDT | Object Class | Property | Representation/ Association | Type | Type Name | Len. | Remarks |
|---|---|---|---|---|---|---|---|
| ChecklistResult-StatusCode | Checklist | Result_ Status | Code | CCT | Code | 1..2 | restricted |

The data type GDT ChecklistResultStatusCode may assign a code list to the code. The attributes may be assigned the following values: listID="90008" and listAgencyID="310." The ChecklistResultStatusCode can be used to represent the result of a checklist or a checklist item within a project.

The data type GDT ChecklistResultStatusCode may use the following codes: 1 (i.e., Open), 2 (i.e., OK), 3 (i.e., Not OK), 4 (i.e., Not Relevant).

ClosureStatusCode

A GDT ClosureStatusCode is a coded representation of a closure status. When an object can be closed, it can no longer participate in any business processes. Bookings or postings on the object are no longer possible. The closed object cannot be changeable and not open for processing of follow-on documents. In contrast to the cancellation, the closure can be the expected end of the life cycle. An example of GDT ClosureStatusCode is:

<ClosureStatusCode>1</ClosureStatusCode>

In certain implementations, GDT ClosureStatusCode may have the following structure:

| GDT | Property | Representation/ Association | Type | Type Name | Len. | Remarks |
|---|---|---|---|---|---|---|
| Closure-StatusCode | Closure_ Status | Code | CCT | Code | 1..2 | restricted |

The data type GDT ClosureStatusCode may assign a code list to the code. The attributes may be assigned the following values: listID="90031" and listAgencyID="310." Although the blocking and closure statuses generally lead to a similar behavior within the object, they have different semantics. The blocking status has a temporary nature and will often be revoked. The closure status has a more permanent nature. It can be revoked if the closure was an error. The closure status should not be interpreted as a completion status. A completed object cannot be closed for further processing; a closed one can be. Completion has a more business related meaning. For example, in the case "The work on the object has been completed", other processes may continue to involve this object. Closure means that the object will no longer take part in any business processes. The closure of an object can be a precondition for archiving. This status can be used, for example, in transaction data. It may not be mandatory for master data. Master data may preferably use an obsolete status.

The data type GDT ClosureStatusCode may use the following codes: 1 (i.e., Not Closed), 2 (i.e., Closed).

ConsistencyStatusCode

A GDT ConsistencyStatusCode is a coded representation of the consistency status of an object. An object can be consistent if the content of the obligatory attributes can be completely filled and the content of all attributes contains no contradictions, for an example, all predefined constraints regarding this content are fulfilled. A consistency status describes whether an object has been checked regarding the predefined constraints and the last check of this object found no inconsistencies violating these constraints. An example of GDT ConsistencyStatusCode is:

<ConsistencyStatusCode>2</ConsistencyStatusCode>

In certain implementations, GDT ConsistencyStatusCode may have the following structure:

| GDT | Property | Representation/ Association | Type | Type Name | Len. | Remarks |
|---|---|---|---|---|---|---|
| Consistency-Status-Code | Consis-tency_ Status | Code | CCT | Code | 1..2 | re-stricted |

The data type GDT ConsistencyStatusCode may assign a code list to the code. The attributes may be assigned the following values: listID="90003" and listAgencyID="310." The ConsistencyStatusCode can be used to ensure that the business object's lifecycle may progress if the business object's aspect that was checked is consistent. In certain implementations, other actions that contribute to the progress of the business object's lifecycle can be permitted if the ConsistencyStatusCode has a status value of "Consistent." Examples of objects that may require consistency checks can be the business object as a whole, a node within the business object or the data necessary for a process step within the business object, e.g., data inside a sales order needed for Invoicing or Delivery.

The data type GDT ConsistencyStatusCode may use the following codes: 1 (i.e., Check Pending), 2 (i.e., Inconsistent), 3 (i.e., Consistent).

INCONSISTENTCONSISTENT_ConsistencyStatusCode

The GDT INCONSISTENTCONSISTENT_ConsistencyStatusCode can be used in cases where the consistency check is processed automatically after every change. The INCONSISTENTCONSISTENT_ConsistencyStatusCode is a restriction on GDT ConsistencyStatusCode (described above). It restricts the latter's code list to the values listed in the appendix. INCONSISTENTCONSISTENT_ConsistencyStatusCode contains the variable "INCONSISTENTCONSISTENT_", which has to be replaced by one (or more) qualifiers when using it.

The data type GDT INCONSISTENTCONSISTENT_ConsistencyStatusCode may use the following codes: 1 (i.e., Inconsistent), 2 (i.e., Consistent).

DataCompletenessStatusCode

A GDT DataCompletenessStatusCode is a coded representation of the data completeness status of an object. Data completeness of an object means that in a given context the content of the obligatory attributes can be completely filled. This can be determined by a data completeness check. An example of GDT DataCompletenessStatusCode is:

<DataCompletenessStatusCode>1</DataCompletenessStatusCode>

In certain implementations, GDT DataCompletenessStatusCode may have the following structure:

| GDT | Property | Representation/ Association | Type | Type Name | Len. | Remarks |
|---|---|---|---|---|---|---|
| DataCompleteness-StatusCode | Data_Completeness_ Status | Code | CCT | Code | 1..2 | restricted |

The data type GDT DataCompletenessStatusCode may assign a code list to the code. The attributes may be assigned the following values: listID="90044" and listAgencyID="310." The DataCompletenessStatusCode may have qualifiers. Examples are FulfillmentDataCompletenessStatusCode and InvoiceDataCompletenessStatusCode. The FulfillmentDataCompletenessStatusCode signifies whether all data that are relevant for execution or fulfillment are available such as the ship-to party. The InvoiceDataCompletenessStatusCode signifies whether all data required for invoicing are available such as currency.

The data type GDT DataCompletenessStatusCode may use the following codes: 1 (i.e., Check Pending), 2 (i.e., Incomplete), 3 (i.e., Complete).

DecisionStatusCode

A GDT DecisionStatusCode is the coded representation of the status of a decision. The DecisionStatusCode displays whether or not a decision has been made about something. An example of GDT DecisionStatusCode is:

<DecisionStatusCode>2</DecisionStatusCode>

In certain implementations, GDT DecisionStatusCode may have the following structure:

| GDT | Property | Representation/ Association | Type | Type Name | Len. | Remarks |
|---|---|---|---|---|---|---|
| Decision-StatusCode | Decision_ Status | Code | CCT | Code | 1..2 | Restricted |

The data type GDT DecisionStatusCode may assign a code list to the code. The attributes may be assigned the following values: listID="90036" and listAgencyID="310." The DecisionStatusCode can, for example, be used in the context of a material inspection. In a material inspection, this code can be used to show whether or not the decision about the acceptance or rejection of the inspected material for the further production process has been made.

The data type GDT DecisionStatusCode may use the following codes: 1 (i.e., Not Made), 2 (i.e., Made).

DueClearingLifeCycleStatusCode

A GDT DueClearingLifeCycleStatusCode is the coded representation of the life cycle status of a DueClearing. A DueClearing can be a group of receivables and payables for clearing. A life cycle status can be a status that denotes a prominent stage of a life cycle, a series of prominent stages through which an object can pass during its lifetime. A possible sequence of the stages can be determined by the constraints under which an object can pass from one stage to another. An example of GDT DueClearingLifeCycleStatusCode is:

<DueClearingLifecycleStatusCode>1</DueClearingLifecycleStatusCode>

In certain implementations, GDT DueClearingLifeCycleStatusCode may have the following structure:

| GDT | Object Class | Property | Representation/ Association | Type | Type Name | Len. | Remarks |
|---|---|---|---|---|---|---|---|
| DueClearing-LifeCycle-StatusCode | Due Clearing | Life Cycle_ Status | Code | CCT | Code | 1..2 | restricted |

The data type GDT DueClearingLifeCycleStatusCode may assign a code list to the code. The attributes may be assigned the following values: listID="90030" and listAgencyID="310."

The data type GDT DueClearingLifeCycleStatusCode may use the following codes: 1 (i.e., Proposed), 2 (i.e., Void), 3 (i.e., Completed), 4 (i.e., Cancelled).

EmployeeCompensationAgreementItemCompensationComponentLifeCycleStatusCode

A GDT EmployeeCompensationAgreementItemCompensationComponentLifeCycleStatusCode is a coded representation of the life cycle status of an EmployeeCompensationAgreementItemCompensationComponent. An EmployeeCompensationAgreement usually comprises the rules governing an employee's compensation. An Item Compensation component can be a single rule governing an employee's compensation component. Examples of an ItemCompensationAgreement include a rule for basic pay, a special payment or company car. The LifeCycleStatus of the ECAItemCompensationAgreement shows if the ItemCompensationComponent contains active, planned or deleted data. An example of GDT EmployeeCompensationAgreementItemCompensationComponentLifeCycleStatusCode is:

<EmployeeCompensationAgreementItemCompensationComponentLifeCycleStatus>1</EmployeeCompensationAgreementItemCompensationComponentLifeCycleStatus>

In certain implementations, GDT EmployeeCompensationAgreementItemCompensationComponentLifeCycleStatusCode may have the following structure:

| GDT | Object Class | Property | Representation/ Association | Type | Type Name | Len. | Remarks |
|---|---|---|---|---|---|---|---|
| EmployeeCompensation-AgreementItem-Compensation-Component-LifeCycle-StatusCode | Employee Compensation Agreement | Life Cycle_ Status | Code | CCT | Code | 1..2 | restricted |

The data type GDT EmployeeCompensationAgreementItemCompensationComponentLifeCycleStatusCode may assign a code list to the code. The attributes may be assigned the following values: listID="90011" and listAgencyID="310."

The data type GDT EmployeeCompensationAgreementItemCompensationComponentLifeCycleStatusCode may use the following codes: 1 (i.e., Inactive), 2 (i.e., Active), 3 (i.e., Active with Pending Changes), 4 (i.e., Active with Pending Deletion).

EmployeeTimeBalanceAdjustmentLifeCycleStatusCode

A GDT EmployeeTimeBalanceAdjustmentLifeCycleStatusCode is a coded representation of the life cycle status of an EmployeeTimeBalanceAdjustment. For example, an "*" can be an instruction, entered manually, to change the balances of EmployeeTimeAccounts. An EmployeeTimeBalanceAdjustment can increase or reduce balances of one EmployeeTimeAccount, or it can transfer balances between various EmployeeTimeAccounts, such as a transfer of balances from the overtime account to the time-off account. An example of GDT EmployeeTimeBalanceAdjustmentLifeCycleStatusCode is:

<EmployeeTimeBalanceAdjustmentLifeCycleStatus>1</EmployeeTimeBalanceAdjustmentLifeCycleStatus>

In certain implementations, GDT EmployeeTimeBalanceAdjustmentLifeCycleStatusCode may have the following structure:

| GDT | Object Class | Property | Representation/ Association | Type | Type Name | Len. | Remarks |
|---|---|---|---|---|---|---|---|
| EmployeeTime-BalanceAdjustment-LifeCycle-StatusCode | Employee Time Balance Adjustment | Life Cycle_ Status | Code | CCT | Code | 1..2 | restricted |

The data type GDT EmployeeTimeBalanceAdjustmentLifeCycleStatusCode may assign a code list to the code. The attributes may be assigned the following values: listID="90006" and listAgencyID="310."

The data type GDT EmployeeTimeBalanceAdjustmentLifeCycleStatusCode may use the following codes: 1 (i.e., Inactive), 2 (i.e., Active), 3 (i.e., Active with Pending Changes), 4 (i.e., Active with Pending Deletion), 5 (i.e., Cancelled).

EmployeeTimeLifeCycleStatusCode

A GDT EmployeeTimeLifeCycleStatusCode is a coded representation of the life cycle of an Employee Time. An EmployeeTime can be a document of the working times of an internal or external employee. In addition to planned and actual working times and activities carried out for the company, it also documents absence times, break times, and availability times. An example of GDT EmployeeTimeLifeCycleStatusCode is:

<EmployeeTimeLifeCycleStatus>1</EmployeeTimeLifeCycleStatus>

In certain implementations, GDT EmployeeTimeLifeCycleStatusCode may have the following structure:

| GDT | Object Class | Property | Representation/ Association | Type | Type Name | Len. | Remarks |
|---|---|---|---|---|---|---|---|
| EmployeeTime-LifeCycle-StatusCode | EmployeeTime | Life Cycle_ Status | Code | CCT | Code | 1..2 | restricted |

The data type GDT EmployeeTimeLifeCycleStatusCode may assign a code list to the code. The attributes may be assigned the following values: listID="90005" and listAgencyID="310."

The data type GDT EmployeeTimeLifeCycleStatusCode may use the following codes: 1 (i.e., Inactive), 2 (i.e., Active), 3 (i.e., Active with Pending Changes), 4 (i.e., Active with Pending Deletion), 5 (i.e., Cancelled).

ExceptionStatusCode

A GDT ExceptionStatusCode is a coded representation of the status of an exception in a business sense. An exception can be used to report unsolved issues or incorrect planning situation. The status of an exception describes its relevance for planners. An example of GDT ExceptionStatusCode is:

<ExceptionStatusCode>1</ExceptionStatusCode>

In certain implementations, GDT ExceptionStatusCode may have the following structure:

| GDT | Object Class | Property | Representation/ Association | Type | Type Name | Len. | Remarks |
|---|---|---|---|---|---|---|---|
| Exception-Status-Code | Exception | Status | Code | CCT | Code | 1..2 | restricted |

The data type GDT ExceptionStatusCode may assign a code list to the code. The attributes may be assigned the following values: listID="90020" and listAgencyID="310." The ExceptionStatusCode represents the current processing status of an exception.

The data type GDT ExceptionStatusCode may use the following codes: 1 (i.e., Pending), 2 (i.e., Acknowledged).

ExpectedLiquidityItemLifeCycleStatusCode

A GDT ExpectedLiquidityItemLifeCycleStatusCode is a coded representation of the life cycle status of an ExpectedLiquidityItem. An ExpectedLiquidityItem can be an expected inflow or outflow of liquidity in a company. A life cycle status can be a status that denotes a prominent stage of a life cycle, a series of prominent stages through which an object can pass during its lifetime. A possible sequence of the stages can be determined by the constraints under which an object can pass from one stage to another, for example. An example of GDT ExpectedLiquidityItemLifeCycleStatusCode is:

<ExpectedLiquidityItemLifeCycleStatusCode>1</ExpectedLiquidityItemLifeCycleStatusCode>

In certain implementations, GDT ExpectedLiquidityItemLifeCycleStatusCode may have the following structure:

| GDT | Object Class | Property | Representation/ Association | Type | Type Name | Len. | Remarks |
|---|---|---|---|---|---|---|---|
| ExpectedLiquity-ItemLifeCycle-StatusCode | Expected Liquidity Item | Life Cycle_ Status | Code | CCT | Code | 1..2 | restricted |

The data type GDT ExpectedLiquidityItemLifeCycleStatusCode may assign a code list to the code. The attributes may be assigned the following values: listID="90049" and listAgencyID "310."

The data type GDT ExpectedLiquidityItemLifeCycleStatusCode may use the following codes: 1 (i.e., In Preparation), 2 (i.e., Release), 3 (i.e., Closed).

FixationStatusCode

A GDT FixationStatusCode is a coded representation of a status if an object is fixed or not. An example of GDT FixationStatusCode is:

<FixationStatusCode>1</FixationStatusCode>

In certain implementations, GDT FixationStatusCode may have the following structure:

| GDT | Object Class | Property | Representation/ Association | Type | Type Name | Len. | Remarks |
|---|---|---|---|---|---|---|---|
| FixationStatus-Code | Fixation | Status | Code | CCT | Code | 1..2 | restricted |

The data type GDT FixationStatusCode may assign a code list to the code. The attributes may be assigned the following values: listID="90059" and listAgencyID="310."

The data type GDT FixationStatusCode may use the following codes: 1 (i.e., Not Fixed), 2 (i.e., Fixed).

IdentifiedLogisticUnitLifeCycleStatusCode

A GDT IdentifiedLogisticUnitLifeCycleStatusCode is a coded representation of the life cycle status of an IdentifiedLogisticUnit. An IdentifiedLogisticUnit can be a physical unit existing in the real world, which can be identifiable for logistic purposes. An IdentifiedLogisticUnit describes the logistics and physical aspects of a product or package. An example of GDT IdentifiedLogisticUnitLifeCycleStatusCode is:

<IdentifiedLogisticUnitLifeCycleStatusCode>1</IdentifiedLogisticUnitLifeCycleStatusCode>

In certain implementations, GDT IdentifiedLogisticUnitLifeCycleStatusCode may have the following structure:

| GDT | Object Class | Property | Representation/ Association | Type | Type Name | Len. | Remarks |
|---|---|---|---|---|---|---|---|
| IdentifiedLogistic-UnitLifeCycle-StatusCode | Identified Logistic Unit | Life Cycle_ Status | Code | CCT | Code | 1..2 | Restricted |

The data type GDT IdentifiedLogisticUnitLifeCycleStatusCode may assign a code list to the code. The attributes may be assigned the following values: listID="90060" and listAgencyID The data type GDT IdentifiedLogisticUnitLifeCycleStatusCode may use the following codes: 1 (i.e., Unassigned), 2 (i.e., Planned for Use), 3 (i.e., In Use), 4 (i.e., Closed).

IdentifiedStockLifeCycleStatusCode

A GDT IdentifiedStockLifeCycleStatusCode is a coded representation of the life cycle status of an IdentifiedStock. An IdentifiedStock can be a subset of a material that shares a set of common characteristics, is logistically handled separately from other subsets of the same material and is uniquely identified.

A life cycle status can be a status that denotes a prominent stage of a life cycle, a series of prominent stages through which an object can pass during its lifetime.

A possible sequence of the stages can be determined by the constraints under which an object can pass from one stage to another. An example of GDT IdentifiedStockLifeCycleStatusCode is:

<IdentifiedStockLifeCycleStatusCode>1</IdentifiedStockLifeCycleStatusCode>

In certain implementations, GDT IdentifiedStockLifeCycleStatusCode may have the following structure:

| GDT | Object Class | Property | Representation/ Association | Type | Type Name | Len. | Remarks |
|---|---|---|---|---|---|---|---|
| IdentifiedStock-LifeCycle-StatusCode | Identified Stock | Life Cycle_ Status | Code | CDT | Code | 1..2 | Restricted |

The data type GDT IdentifiedStockLifeCycleStatusCode may assign a code list to the code. The attributes may be assigned the following values: listID="90079" and listAgencyID="310."

The data type GDT IdentifiedStockLifeCycleStatusCode may use the following codes: 1 (i.e., In Preparation), 2 (i.e., Active), 3 (i.e., Blocked), 4 (i.e., Obsolete).

InclusionStatusCode

A GDT InclusionStatusCode is a coded representation of the status of the inclusion of an object in a specified set. An example of GDT InclusionStatusCode is:

<InclusionStatusCode>1</InclusionStatusCode>

In certain implementations, GDT InclusionStatusCode may have the following structure:

| GDT | Property | Representation/ Association | Type | Type Name | Len. | Remarks |
|---|---|---|---|---|---|---|
| Inclusion-StatusCode | Inclusion_ Status | Code | GDT | Code | 1..2 | restricted |

The data type GDT InclusionStatusCode may assign a code list to the code. The attributes may be assigned the following values: listID="90048" and listAgencyID="310." A qualifier can be used to specify the set that the status refers to. For example, if submittedSupplierQuoteItemsInclusionStatusCode is used at a SupplierQuoteItem, this specifies if the SupplierQuoteItem is included in the set of submitted SupplierQuoteItems.

The data type GDT InclusionStatusCode may use the following codes: 1 (i.e., Excluded), 2 (i.e., Included).

IncomingChequePaymentExecutionStatusCode

A GDT IncomingChequePaymentExecutionStatusCode is a coded representation of the status of a payment execution for check payments between companies and their business partners, from a company's point of view. An IncomingChequePaymentExecutionStatusCode defines the milestones of a payment execution dependent on payment with checks. An example of GDT IncomingChequePaymentExecutionStatusCode is:

<InicomingChequePaymentExecutionStatusCode>2</IncomingChequePaymentExecutionStatusCode>

In certain implementations, GDT IncomingChequePaymentExecutionStatusCode may have the following structure:

| GDT | Object Class | Property | Representation/ Association | Type | Type Name | Len. | Remarks |
|---|---|---|---|---|---|---|---|
| IncomingCheque-PaymentExecution-StatusCode | Incoming Cheque | Payment Execution_ Status | Code | CDT | Code | 1..2 | restricted |

The data type GDT IncomingChequePaymentExecutionStatusCode may assign a code list to the code. The attributes may be assigned the following values: listID="90075" and listAgencyID="310." A payment execution may be initiated from a business partner with the company responsible for the final execution. For example incoming checks will be sent by a business partner to a company and deposited by a company at a house bank for cashing. The IncomingChequePaymentExecutionStatusCode can be used to track the payment execution for paid checks independent of the flow of cash and the direction of the payment initiation.

The data type GDT IncomingChequePaymentExecutionStatusCode may use the following codes: 1 (i.e., Not Started), 2 (i.e., Cashed), 3 (i.e., Bounced).

InternalRequestLifeCycleStatusCode

A GDT InternalRequestLifeCycleStatusCode is a coded representation of the life cycle status of an Internal Request. An example of GDT InternalRequestLifeCycleStatusCode is:

<InternalRequestLifeCycleStatusCode>1</InternalRequestLifeCycleStatusCode>

In certain implementations, GDT InternalRequestLifeCycleStatusCode may have the following structure:

| GDT | Object Class | Property | Representation/ Association | Type | Type Name | Len. | Remarks |
|---|---|---|---|---|---|---|---|
| InternalRequest-LifeCycle-StatusCode | Internal Request | Life Cycle_ Status | Code | CCT | Code | 1..2 | restricted |

The data type GDT InternalRequestLifeCycleStatusCode may assign a code list to the code. The attributes may be assigned the following values: listID="90018" and listAgencyID="310."

The data type GDT InternalRequestLifeCycleStatusCode may use the following codes: 1 (i.e., In Preparation), 2 (i.e., In Approval), 3 (i.e., in Revision), 4 (i.e., Rejected), 5 (i.e., Ordered).

LogisticsLifeCycleStatusCode

A GDT LogisticsLifeCycleStatusCode is a coded representation of the life cycle status of a logistics object. An example of GDT LogisticsLifeCycleStatusCode is:

<LogisticsLifeCycleStatus>1</LogisticsLifeCycleStatus>

In certain implementations, GDT LogisticsLifeCycleStatusCode may have the following structure:

| GDT | Object Class | Property | Representation/ Association | Type | Type Name | Len. | Remarks |
|---|---|---|---|---|---|---|---|
| Logistics-LifeCycle-StatusCode | Logistics | Life Cycle_ Status | Code | CCT | Code | 1..2 | restricted |

The data type GDT LogisticsLifeCycleStatusCode may assign a code list to the code. The attributes may be assigned the following values: listID="90019" and listAgencyID="310." Most of the logistics objects have a life cycle. The object can be in preparation during preliminary checks before and after creation. Subsequent to some successful preliminarily checks it can be released for operative use. The operational steps are started and then finished at the end. If not further changes or cancellations to the object are allowed it reaches the final state closed. The object can also be cancelled under certain preconditions. At the point the object can be closed or cancelled it can be reorganized (e.g. archived or deleted).

The data type GDT LogisticsLifeCycleStatusCode may use the following codes: 1 (i.e., In Preparation), 2 (i.e., Released), 3 (i.e., in Started), 4 (i.e., Finished), 5 (i.e., Closed), 6 (i.e., Cancelled).

LogisticsOrderSchedulingStatusCode

A GDT LogisticsOrderSchedulingStatusCode is a coded representation of the status of the scheduling of a LogisticsOrder and denotes to what extent the LogisticsOrder has been scheduled. An example of GDT LogisticsOrderSchedulingStatusCode is:

<LogisticsOrderSchedulingStatusCode>2</LogisticsOrderSchedulingStatusCode>

In certain implementations, GDT LogisticsOrderSchedulingStatusCode may have the following structure:

| GDT | Object Class | Property | Representation/ Association | Type | Type Name | Len. | Remarks |
|---|---|---|---|---|---|---|---|
| LogisticsOrder-Scheduling-StatusCode | Logistics Order Order | Scheduling_ Status | Code | CCT | Code | 1..2 | restricted |

The data type GDT LogisticsOrderSchedulingStatusCode may assign a code list to the code. The attributes may be assigned the following values: listID="90023" and listAgencyID="310." In R/3 there is a status 'NTUP' (i.e., Not up to date) for the Production Order which corresponds to 'Not scheduled' this LogisticsOrderSchedulingStatusCode. In certain implementations, there is not a corresponding value to the other status values. A Production Order in R/3 can be released if it is scheduled (e.g., status 'REL').

The data type GDT LogisticsOrderSchedulingStatusCode may use the following codes: 1 (i.e., Not Scheduled), 2 (i.e., Basic Dates Scheduled), 3 (i.e., Scheduled).

LogisticUnitLifeCycleStatusCode

A GDT LogisticUnitLifeCycleStatusCode is the coded representation of the life cycle status of a LogisticUnit. A LogisticUnit is an item established for logistics operations, such as storage, movement, and packing. A LogisticUnit represents all physical units handled in the same manner during logistic operations, whether they are packed or unpacked goods. Examples of a LogisticUnit include high pallet and liter milk carton. A life cycle status is a status that denotes a prominent stage of a life cycle, a series of prominent stages through which an object can pass during its lifetime. A possible sequence of the stages is determined by the constraints under which an object can pass from one stage to another. An example of GDT LogisticUnitLifeCycleStatusCode is:

<LogisticUnitLifeCycleStatusCode>1</LogisticUnitLifeCycleStatusCode>

In certain implementations, GDT LogisticUnitLifeCycleStatusCode may have the following structure:

| GDT | Object Class | Property | Representation/ Association | Type | Type Name | Len. | Remarks |
|---|---|---|---|---|---|---|---|
| LogisticsUnit-LifeCycle-StatusCode | Logistic Unit | Life Cycle_ Status | Code | CCT | Code | 1..2 | Restricted |

The data type GDT LogisticUnitLifeCycleStatusCode may assign a code list to the code. The attributes may be assigned the following values: listID="90078" and listAgencyID="310."

The data type GDT LogisticUnitLifeCycleStatusCode may use the following codes: 1 (i.e., In Preparation), 2 (i.e., Active), 3 (i.e., Blocked), 4 (i.e., Obsolete).

MaterialInspectionLifeCycleStatusCode

A GDT MaterialInspectionLifeCycleStatusCode is the coded representation of the lifecycle status of a material inspection. A MaterialInspection can be a document that describes the execution of an inspection for a particular material, and that can be used to record this inspection. A life cycle status can be a status that denotes a prominent stage of a life cycle, a series of prominent stages through which an object can pass during its lifetime. A possible sequence of the stages can be determined by the constraints under which an object can pass from one stage to another. An example of GDT MaterialInspectionLifeCycleStatusCode is:

<MaterialInspectionLifeCycleStatusCode>1</MaterialInspectionLifeCycleStatusCode>

In certain implementations, GDT MaterialInspectionLifeCycleStatusCode may have the following structure:

| GDT | Object Class | Property | Representation/ Association | Type | Type Name | Len. | Remarks |
|---|---|---|---|---|---|---|---|
| MaterialInspection-LifeCycle-StatusCode | Material Inspection | Life Cycle_ Status | Code | CCT | Code | 1..2 | Restricted |

The data type GDT MaterialInspectionLifeCycleStatusCode may assign a code list to the code. The attributes may be assigned the following values: listID="90026" and listAgencyID="310."

The data type GDT MaterialInspectionLifeCycleStatusCode may use the following codes: 1 (i.e., New), 2 (i.e., Released), 3 (i.e., Inspection Prepared), 4 (i.e., Results Recorded), 5 (i.e., Decision Made).

MaterialInspectionSampleLifeCycleStatusCode

A GDT MaterialInspectionSampleLifeCycleStatusCode is the coded representation of the life-cycle status of a sample in the context of a material inspection. For example, a "*" is a sample required for an examination in the context of a material inspection. The sample is the subject of examination for inspection procedures. A sample can be drawn from a material independently of a material inspection and, if necessary, it can later be assigned to a material inspection. A life cycle status is a status that denotes a prominent stage of a life cycle, a series of prominent stages through which an object can pass during its lifetime. A possible sequence of the stages is determined by the constraints under which an object can pass from one stage to another. An example of GDT MaterialInspectionSampleLifeCycleStatusCode is:

<MaterialInspectionSampleLifeCycleStatusCode>1 </MaterialInspectionSampleLifeCycleStatusCode>

In certain implementations, GDT MaterialInspectionSampleLifeCycleStatusCode may have the following structure:

| GDT | Object Class | Property | Representation/ Association | Type | Type Name | Len. | Remarks |
|---|---|---|---|---|---|---|---|
| MaterialInspection-Sample-LifeCycle-StatusCode | Material Inspection Sample | Life Cycle_ Status | Code | CCT | Code | 1..2 | Restricted |

The data type GDT MaterialInspectionSampleLifeCycleStatusCode may assign a code list to the code. The attributes may be assigned the following values: listID="90028" and listAgencyID="310."

The data type GDT MaterialInspectionSampleLifeCycleStatusCode may use the following codes: 1 (i.e., New), 2 (i.e., Released), 3 (i.e., Sample Prepared), 4 (i.e., Results Recorded), 5 (i.e., Decision Made).

MaterialInspectionSkippingStatusCode

A GDT MaterialInspectionSkippingStatusCode is the coded representation of the skipping status of a material inspection. This skipping status shows if a material inspection has been skipped. An example of GDT MaterialInspectionSkippingStatusCode is:

<MaterialInspectionSkippingStatusCode>1</MaterialInspectionSkippingStatusCode>

In certain implementations, GDT MaterialInspectionSkippingStatusCode may have the following structure:

| GDT | Object Class | Property | Representation/ Association | Type | Type Name | Len. | Card. | Remarks |
|---|---|---|---|---|---|---|---|---|
| MaterialInspection-Skipping-StatusCode | Material Inspection | Skipping_ Status | Code | CCT | Code | 1..2 | | Restricted |

The data type GDT MaterialInspectionSkippingStatusCode may assign a code list to the code. The attributes may be assigned the following values: listID="90027" and listAgencyID="310." When a material inspection can be created, a decision can be made about whether to execute or skip the inspection. A material inspection can be skipped to reduce inspection effort. A predefined rule can be used to determine whether or not an inspection should be skipped.

The data type GDT MaterialInspectionSkippingStatusCode may use the following codes: 1 (i.e., Not Skipped), 2 (i.e., Skipped).

MeasurementStatusCode

A GDT MeasurementStatusCode is a coded representation of a measurement status. The measurement status of an object can be determined by checking the measurement data of the object against a given measurement tolerance range which has a lower and upper measurement limit. The lower and upper measurement limit of the tolerance range may be the same value. An example of GDT MeasurementStatusCode is:

<MeasurementStatusCode>1</MeasurementStatusCode>

In certain implementations, GDT MeasurementStatusCode may have the following structure:

| GDT | Property | Representation/ Association | Type | Type Name | Len. | Remarks |
|---|---|---|---|---|---|---|
| Measurement-StatusCode | Measurement_Status | Code | CCD | Code | 1..2 | Restricted |

The data type GDT MeasurementStatusCode may assign a code list to the code. The attributes may be assigned the following values: listID="90070" and listAgencyID="310." The measurement status code shows whether the current measurement data of an object lies within the limits of the measurement range. The measurement status code can, for example, be used for temperatures, pressures, weights, or other dimensions.

The data type GDT MeasurementStatusCode may use the following codes: 1 (i.e., Check Pending), 2 (i.e., Too Low), 3 (i.e., Within Tolerance), 4 (i.e., Too High).

NegotiationStatusCode

A GDT NegotiationStatusCode is a coded representation of the status of a negotiation. An example of GDT NegotiationStatusCode is:

<NegotiationStatusCode>1</NegotiationStatusCode>

In certain implementations, GDT NegotiationStatusCode may have the following structure:

| GDT | Property | Representation/ Association | Type | Type Name | Len. | Remarks |
|---|---|---|---|---|---|---|
| Negotiation-StatusCode | Negotiation_ Status | Code | CCT | Code | 1..2 | restricted |

The data type GDT NegotiationStatusCode may assign a code list to the code. The attributes may be assigned the following values: listID="90061" and listAgencyID="310."

The data type GDT NegotiationStatusCode may use the following codes: 1 (i.e., Not in Negotiation), 2 (i.e., In Negotiation), 3 (i.e., Negotiation Cancelled), 4 (i.e., Negotiation Completed).

OrderingStatusCode

A GDT OrderingStatusCode is a coded representation of an ordering status. Ordering can be the request or instruction to purchase, sell, or supply specified goods or services. An example of GDT OrderingStatusCode is:

<OrderingStatusCode>3</OrderingStatusCode>

In certain implementations, GDT OrderingStatusCode may have the following structure:

| GDT | Property | Representation/ Association | Type | Type Name | Len. | Remarks |
|---|---|---|---|---|---|---|
| Ordering-StatusCode | Ordering_ Status | Code | CCT | Code | 1..2 | restricted |

The data type GDT OrderingStatusCode may assign a code list to the code. The attributes may be assigned the following values: listID="90025" and listAgencyID="310."

The data type GDT OrderingStatusCode may use the following codes: 1 (i.e., Not Ordered), 2 (i.e., Partially Ordered), 3 (i.e., Ordered).

PackingBillOfMaterialLifeCycleStatusCode

A GDT PackingBillOfMaterialLifeCycleStatusCode is a coded representation of the life cycle status of a PackingBillOfMaterial. A PackingBillOfMaterial can be a complete and structured list of components that defines the packing structure of logistic units. An example of GDT PackingBillOfMaterialLifeCycleStatusCode is:

<PackingBillOfMaterialLifeCycleStatusCode>1</PackingBillOfMaterialLifeCycleStatusCode>

In certain implementations, GDT PackingBillOfMaterialLifeCycleStatusCode may have the following structure:

| GDT | Object Class | Property | Representation/ Association | Type | Type Name | Len. | Remarks |
|---|---|---|---|---|---|---|---|
| PackingBillOfMaterial-LifeCycle-StatusCode | Packing Bill Of Material | Life Cycle_ Status | Code | CCT | Code | 1..2 | Restricted |

The data type GDT PackingBillOfMaterialLifeCycleStatusCode may assign a code list to the code. The attributes may be assigned the following values: listID="90053" and listAgencyID="310." The PackingBillOfMaterialLifeCycleStatusCode controls the usage of a PackingBillOfMaterial in further processes, an active PackingBillOfMaterial can be referenced by other BOs.

The data type GDT PackingBillOfMaterialLifeCycleStatusCode may use the following codes: 1 (i.e., In Preparation), 2 (i.e., Active), 3 (i.e., Blocked).

PaymentAllocationLifeCycleStatusCode

A GDT PaymentAllocationLifeCycleStatusCode is the coded representation of the life cycle status of a PaymentAllocation. A PaymentAllocation can be the allocation of a payment to payment reasons. A life cycle status can be a status that denotes a prominent stage of a life cycle, series of prominent stages through which an object can pass during its lifetime. A possible sequence of the stages can be determined by the constraints under which an object can pass from one stage to another. An example of GDT PaymentAllocationLifeCycleStatusCode is:

<PaymentAllocationLifeCycleStatusCode>1 <PaymentAllocationLifeCycleStatusCode>

In certain implementations, GDT PaymentAllocationLifeCycleStatusCode may have the following structure:

| GDT | Object Class | Property | Representation/ Association | Type | Type Name | Len. | Card. | Remarks |
|---|---|---|---|---|---|---|---|---|
| PaymentAllocation-LifeCycle-StatusCode | Payment Allocation | Life Cycle_ Status | Code | CCT | Code | 1...2 | | restricted |

The data type GDT PaymentAllocationLifeCycleStatusCode may assign a code list to the code. The attributes may be assigned the following values: listID="90051" and listAgencyID="310."

The data type GDT PaymentAllocationLifeCycleStatusCode may use the following codes: 1 (i.e., In Preparation), 2 (i.e., Released), 3 (i.e., Cancelled).

PaymentOrderLifeCycleStatusCode

A GDT PaymentOrderLifeCycleStatusCode is a coded representation of the life cycle status of a PaymentOrder. A PaymentOrder can be an order within a company to make a payment to a business partner at a specified time. A Payment Order can be a collective instruction that contains several separate instructions. An example of GDT PaymentOrderLifeCycleStatusCode is:

<PaymentOrderLifeCycleStatusCode>1</PaymentOrderLifeCycleStatusCode>

In certain implementations, GDT PaymentOrderLifeCycleStatusCode may have the following structure:

| GDT | Object Class | Property | Representation/ Association | Type | Type Name | Len. | Card. | Remarks |
|---|---|---|---|---|---|---|---|---|
| PaymentOrder-LifeCycle-StatusCode | Payment Order | Life Cycle_ Status | Code | CCT | Code | 1..2 | | restricted |

The data type GDT PaymentOrderLifeCycleStatusCode may assign a code list to the code. The attributes may be assigned the following values: listID="90071" and listAgencyID="310."

The data type GDT PaymentOrderLifeCycleStatusCode may use the following codes: 1 (i.e., Reserved), 2 (i.e., Requested), 3 (i.e., Released), 4 (i.e., Cancelled), 5 (i.e., Bundled).

PhysicalInventoryCountApprovalResultStatusCode

A GDT PhysicalInventoryCountApprovalResultStatusCode is a coded representation of the approval result status in a physical inventory count. A physical inventory count can be an instruction on how to execute a physical inventory of materials and packages and its approval. An example of GDT PhysicalInventoryCountApprovalResultStatusCode is:

<PhysicalInventoryCountApprovalResultStatusCode> 1<PhysicalInventoryCountApprovalResultStatusCode>

In certain implementations, GDT PhysicalInventoryCountApprovalResultStatusCode may have the following structure:

| GDT | Object Class | Property | Representation/ Association | Type | Type Name | Len. | Card. | Remarks |
|---|---|---|---|---|---|---|---|---|
| PhysicalInventory-CountApproval-Result-StatusCode | Physical Inventory Count | Approval Result_ Status | Code | CCT | Code | 1..2 | | Restricted |

The data type GDT PhysicalInventoryCountApprovalResultStatusCode may assign a code list to the code. The attributes may be assigned the following values: listID="90047" and listAgencyID="310." The PhysicalInventoryCountApprovalResultStatusCode can be used to represent the result of the count approval process for an inventory item.

The data type GDT PhysicalInventoryCountApprovalResultStatusCode may use the following codes: 1 (i.e., No Further Action), 2 (i.e., Recount Requested), 3 (i.e., Deviation Posted).

PhysicalInventoryCountOperationActivityInventoryLifeCycleStatusCode

A GDT PhysicalInventoryCountOperationActivityInventoryLifeCycleStatusCode is a coded representation of the life cycle status of a PhysicalInventoryCount OperationActivityInventory. A Physical Inventory Count can be an instruction on how to execute a physical inventory of materials and packages and its approval.

A PhysicalInventoryCount also can contain the results of the physical inventory and any differences between this physical inventory and the book inventory.

The OperationActivityInventory can be the book inventory, the counted inventory, or the inventory to be approved or determined by an activity in a specific location. An example of GDT PhysicalInventoryCountOperationActivityInventoryLifeCycleStatusCode is:

<PhysicalInventoryCountOperationActivityInventoryLifeCycleStatusCode>1</PhysicalInventoryCountOperationActivityInventoryLifeCycleStatusCode>

In certain implementations, GDT PhysicalInventoryCountOperationActivityInventoryLifeCycleStatusCode may have the following structure:

| GDT | Object Class | Property | Representation/ Association | Type | Type Name | Len. | Remarks |
|---|---|---|---|---|---|---|---|
| PhysicalInventory-CountOperation-ActivityInventory-LifeCycle-StatusCode | Physical Inventory Count Operation Activity Inventory | Life Cycle_ Status | Code | CCT | Code | 1..2 | Restricted |

The data type GDT PhysicalInventoryCountOperationActivityInventoryLifeCycleStatusCode may assign a code list to the code. The attributes may be assigned the following values: listID="90046" and listAgencyID="310." The PhysicalInventoryCountApprovalResultStatusCode can be used to represent the result of the count approval process for an inventory item. It may also be used to represent the most important steps in the life cycle of a PhysicalInventoryCount OperationActivityInventory The data type GDT PhysicalInventoryCountOperationActivityInventoryLifeCycleStatusCode may use the following codes: 1 (i.e., Not Started), 2 (i.e., In Process), 3 (i.e., Finished), 4 (i.e., Submitted to Approval), 5 (i.e., Cancelled).

ProcessingStatusCode

A GDT ProcessingStatusCode is a coded representation of a processing status. A processing status describes the execution progress of a process. An example of GDT ProcessingStatusCode is:

<ProcessingStatusCode>3</ProcessingStatusCode>

In certain implementations, GDT ProcessingStatusCode may have the following structure:

| GDT | Object Class | Property | Representation/ Association | Type | Type Name | Len. | Remarks |
|---|---|---|---|---|---|---|---|
| Processing-StatusCode | Processing_ Status | Code | CCT | Code | 1..2 | restricted | |

The data type GDT ProcessingStatusCode may assign a code list to the code. The attributes may be assigned the following values: listID="90007" and listAgencyID="310." The ProcessingStatusCode can be used to document the execution progress in a user interface (UI) or in outgoing messages, especially for an acknowledgement regarding the process to which the ProcessingStatus refers. It may also be used to control other actions. In some implementations, major changes or deletions are allowed when the ProcessingStatusCode has a value of "Not started."

The data type GDT ProcessingStatusCode may use the following codes: 1 (i.e., Not Started), 2 (i.e., In Process), 3 (i.e., Finished).

ProcurementPlanningOrderLifeCycleStatusCode

A GDT ProcurementPlanningOrderLifeCycleStatusCode is the coded representation of the life cycle status of a procurement planning order. A procurement planning order can be a planned order for procuring materials that is to be placed with an external vendor. It can define the required quantities and availability dates. An example of GDT ProcurementPlanningOrderLifeCycleStatusCode is:

<ProcurementPlanningOrderLifeCycleStatusCode>1
</ProcurementPlanningOrderLifeCycleStatusCode>

In certain implementations, GDT ProcurementPlanningOrderLifeCycleStatusCode may have the following structure:

| GDT | Object Class | Property | Representation/ Association | Type | Type Name | Len. | Remarks |
|---|---|---|---|---|---|---|---|
| ProcurementPlanning-OrderLifeCycle-StatusCode | Procurement Planning Order | Life Cycle_ Status | Code | CCT | Code | 1..2 | restricted |

The data type GDT ProcurementPlanningOrderLifeCycleStatusCode may assign a code list to the code. The attributes may be assigned the following values: listID="90067" and listAgencyID="310."

The data type GDT ProcurementPlanningOrderLifeCycleStatusCode may use the following codes: 1 (i.e., Planned), 2 (i.e., Execution Requested).

ProductionPlanningOrderLifeCycleStatusCode

A GDT ProductionPlanningOrderLifeCycleStatusCode is the coded representation of the life cycle status of a production planning order. A production planning order can be a request made to a planning area (SupplyPlanningArea) to initiate the production of a particular quantity of a material on a defined date. An example of GDT ProductionPlanningOrderLifeCycleStatusCode is:

<ProductionPlanningOrderLifeCycleStatusCode>1 </ProductionPlanningOrderLifeCycleStatusCode>

In certain implementations, GDT ProductionPlanningOrderLifeCycleStatusCode may have the following structure:

| GDT | Object Class | Property | Representation/ Association | Type | Type Name | Len. | Remarks |
|---|---|---|---|---|---|---|---|
| ProductionPlanning-OrderLifeCycle-StatusCode | Production Planning Order | Life Cycle_ Status | Code | CCT | Code | 1..2 | restricted |

The data type GDT ProductionPlanningOrderLifeCycleStatusCode may assign a code list to the code. The attributes may be assigned the following values: listID="90068" and listAgencyID="310."

The data type GDT ProductionPlanningOrderLifeCycleStatusCode may use the following codes: 1 (i.e., Planned), 2 (i.e., Execution Requested).

ProductionRequisitionLifeCycleStatusCode

A GDT ProductionRequisitionLifeCycleStatusCode is a coded representation of the life cycle status of a ProductionRequisition. A Production Requisition can be a requisition to Production Execution to produce a certain quantity of a specific material by a requested due date time. The life cycle describes the states of an object during the period of time it exists. An example of GDT ProductionRequisitionLifeCycleStatusCode is:

<ProductionRequisitionLifeCycleStatus>1</ProductionRequisitionLifeCycleStatus>

In certain implementations, GDT ProductionRequisitionLifeCycleStatusCode may have the following structure:

| GDT | Object Class | Property | Representation/ Association | Type | Type Name | Len. | Remarks |
|---|---|---|---|---|---|---|---|
| Production-RequisitionLifeCycle-StatusCode | Production Requisition | Life Cycle_ Status | Code | CCT | Code | 1..2 | restricted |

The data type GDT ProductionRequisitionLifeCycleStatusCode may assign a code list to the code. The attributes may be assigned the following values: listID="90013" and listAgencyID="310." Basically the ProductionRequisition has a life cycle that combines the status variables of the ProductionRequest. First it has the "Production Requested" status after creation. If the corresponding ProductionRequest already has created any ProductionOrders it switches the status to "Production Order Creation Started". If the production of the ProductionRequest is finished the LifeCycleStatus of ProductionRequisition is "Production Finished". If the ProductionRequest is closed the ProductionRequisition is "Closed" as well.

The data type GDT ProductionRequisitionLifeCycleStatusCode may use the following codes: 1 (i.e., Production Requested), 2 (i.e., Production Order Creation Started), 3 (i.e., Production Finished), 4 (i.e., Closed).

ProjectLifeCycleStatusCode

A GDT ProjectLifeCycleStatusCode is a coded representation of the life cycle status of a Project. A project can be a business plan with a defined goal that can be attained in a specified time frame. It can be achieved using predefined funds and planned resources, while reaching an agreed quality level. The project can be characterized by the fact that it is unique and that it involves an element of risk. An example of GDT ProjectLifeCycleStatusCode is:

<ProjectLifeCycleStatusCode>1</ProjectLifeCycleStatusCode>

In certain implementations, GDT ProjectLifeCycleStatusCode may have the following structure:

| GDT | Object Class | Property | Representation/ Association | Type | Type Name | Len. | Remarks |
|---|---|---|---|---|---|---|---|
| Project-LifeCycle-StatusCode | Project | Life Cycle_ Status | Code | CCT | Code | 1..2 | restricted |

The data type GDT ProjectLifeCycleStatusCode may assign a code list to the code. The attributes may be assigned the following values: listID="90009" and listAgencyID="310." The ProjectLifeCycleStatusCode may represent the current state of a project and can be used to determine which business processes can be performed on it.

The data type GDT ProjectLifeCycleStatusCode may use the following codes: 1 (i.e., In Planning), 2 (i.e., Started), 3 (i.e., Released), 4 (i.e., Stopped), 5 (i.e., Closed).

ProjectTaskLifeCycleStatusCode

A GDT ProjectTaskLifeCycleStatusCode is a coded representation of the life cycle status of a Project Task. A project task can be an element used to define the required work in a project. In certain implementations, a task contains the data indicating what needs to be carried out in a project within which time frame, and the amount of work required. A project can be a business plan with a defined goal that is to be attained in a specified time frame. It can be achieved using predefined funds and planned resources, while reaching an agreed quality level. The project can be characterized by the fact that it can be unique and that it involves an element of risk. An example of GDT ProjectTaskLifeCycleStatusCode is:

<ProjectTaskLifeCycleStatusCode>1</ProjectTaskLifeCycleStatusCode>

In certain implementations, GDT ProjectTaskLifeCycleStatusCode may have the following structure:

| GDT | Object Class | Property | Representation/ Association | Type | Type Name | Len. | Remarks |
|---|---|---|---|---|---|---|---|
| ProjectTask-LifeCycle-StatusCode | Project Task | Life Cycle_ Status | Code | CCT | Code | 1..2 | restricted |

The data type GDT ProjectTaskLifeCycleStatusCode may assign a code list to the code. The attributes may be assigned the following values: listID="90010" and listAgencyID="310." The ProjectTaskLifeCycleStatusCode may represent the current state of a task and can be used to determine which business processes can be performed on it.

The data type GDT ProjectTaskLifeCycleStatusCode may use the following codes: 1 (i.e., In Planning), 2 (i.e., Released), 3 (i.e., Stopped), 4 (i.e., Closed).

PublishingStatusCode

A GDT PublishingStatusCode is a coded representation of a publishing status. An example of GDT PublishingStatusCode is:

<PublishingStatusCode>1</PublishingStatusCode>

In certain implementations, GDT PublishingStatusCode may have the following structure:

| GDT | Property | Representation/ Association | Type | Type Name | Len. | Remarks |
|---|---|---|---|---|---|---|
| PublishingStatus-Code | Publishing Status | Code | GDT | Code | 1..2 | restricted |

The data type GDT PublishingStatusCode may assign a code list to the code. The attributes may be assigned the following values: listID="90045" and listAgencyID="310."

The data type GDT PublishingStatusCode may use the following codes: 1 (i.e., Not Published), 2 (i.e., Published).

PurchaseOrderConfirmationStatusCode

A GDT PurchaseOrderConfirmationStatusCode is a coded representation of a status of confirmation from a supplier. An example of GDT PurchaseOrderConfirmationStatusCode is:

<PurchaseOrderConfirmationStatusCode>1</PurchaseOrderConfirmationStatusCode>

In certain implementations, GDT PurchaseOrderConfirmationStatusCode may have the following structure:

| GDT | Property | Representation/ Association | Type | Type Name | Len. | Remarks |
|---|---|---|---|---|---|---|
| PurchaseOrder-Confirmation-StatusCode | Purchase Order Confirmation_Status | Code | CCT | Code | 1..2 | restricted |

The data type GDT PurchaseOrderConfirmationStatusCode may assign a code list to the code. The attributes may be assigned the following values: listID="90043" and listAgencyID="310."

The data type GDT PurchaseOrderConfirmationStatusCode may use the following codes: 1 (i.e., No Confirmation Received), 2 (i.e., Deviation in Confirmation), 3 (i.e., Receipt Confirmed), 4 (i.e., Rejected), 5 (i.e., Partially Rejected), 6 (i.e., Partially Confirmed), 7 (i.e., Confirmed), 8 (i.e., New Confirmation Expected).

PurchasingContractLifeCycleStatusCode

A GDT PurchasingContractLifeCycleStatusCode is a coded representation of the status of a Life Cycle of a Purchasing Contract. A Purchasing Contract can be a legally binding purchase agreement that contains special conditions that are negotiated between a buyer and a seller, covering the supply of goods or the performance of services. A purchasing contract can be valid for a specific period. An example of GDT PurchasingContractLifeCycleStatusCode is:

<PurchasingContractLifeCycleStatusCode>1</PurchasingContractLifeCycleStatusCode>

In certain implementations, GDT PurchasingContractLifeCycleStatusCode may have the following structure:

| GDT | Object Class | Property | Representation/ Association | Type | Type Name | Len. | Remarks |
|---|---|---|---|---|---|---|---|
| PurchasingContractLifeCycleStatusCode | Purchasing Contract | Life Cycle_Status | Code | CCT | Code | 1..2 | restricted |

The data type GDT PurchasingContractLifeCycleStatusCode may assign a code list to the code. The attributes may be assigned the following values: listID="90062" and listAgencyID="310."

The data type GDT PurchasingContractLifeCycleStatusCode may use the following codes: 1 (i.e., In Preparation), 2 (i.e., In Negotiation), 3 (i.e., In Renewal), 4 (i.e., In Approval), 5 (i.e., In Revision), 6 (i.e., Rejected), 7 (i.e., Released), 8 (i.e., Closed).

PurchaseRequestBiddingStatusCode

A GDT PurchaseRequestBiddingStatusCode is a coded representation of the Purchase Request's bidding status. A PurchaseRequest can be a request or instruction to the purchasing department for purchasing specified materials or services in specified quantities at a specified price within a specified time. An example of GDT PurchaseRequestBiddingStatusCode is:

<PurchaseRequestBiddingStatusCode>1</PurchaseRequestBiddingStatusCode>

In certain implementations, GDT PurchaseRequestBiddingStatusCode may have the following structure:

| GDT | Object Class | Property | Representation/ Association | Type | Type Name | Len. | Remarks |
|---|---|---|---|---|---|---|---|
| PurchaseRequestBiddingStatusCode | Purchase Request | Bidding_Status | Code | CCT | Code | 1..2 | restricted |

The data type GDT PurchaseRequestBiddingStatusCode may assign a code list to the code. The attributes may be assigned the following values: listID="90032" and listAgencyID="310."

The data type GDT PurchaseRequestBiddingStatusCode may use the following codes: 1 (i.e., Not in Bidding), 2 (i.e., In Bidding).

PurchaseRequestContractingStatusCode

A GDT PurchaseRequestContractingStatusCode is a coded representation of the Purchase Request's contracting status. A PurchaseRequest can be a request or instruction to the purchasing department for purchasing specified materials or services in specified quantities at a specified price within a specified time. An example of GDT PurchaseRequestContractingStatusCode is:

<PurchaseRequestContractingStatusCode>1</PurchaseRequestContractingStatusCode>

In certain implementations, GDT PurchaseRequestContractingStatusCode may have the following structure:

| GDT | Object Class | Property | Representation/ Association | Type | Type Name | Len. | Remarks |
|---|---|---|---|---|---|---|---|
| PurchaseRequestContractingStatusCode | Purchase Request | Contracting_Status | Code | CCT | Code | 1..2 | restricted |

The data type GDT PurchaseRequestContractingStatusCode may assign a code list to the code. The attributes may be assigned the following values: listID="90033" and listAgencyID="310."

The data type GDT PurchaseRequestContractingStatusCode may use the following codes: 1 (i.e., No Purchasing Contract), 2 (i.e., Fulfilling Purchasing Contract Created), 3 (i.e., Not Fulfilling Purchasing).

PurchaseRequestFollowUpDocumentStatusCode

A GDT PurchaseRequestFollowUpDocumentStatusCode is a coded representation of the purchase request related to its follow-up document. A PurchaseRequest can be a request or instruction to the purchasing department for purchasing specified materials or services in specified quantities at a specified price within a specified time. An example of GDT PurchaseRequestFollowUpDocumentStatusCode is:

<PurchaseRequestFollowUpDocumentStatus-Code>1 </PurchaseRequestFollowUpDocumentStatusCode>

In certain implementations, GDT PurchaseRequestFollowUpDocumentStatusCode may have the following structure:

| GDT | Object Class | Property | Representation/ Association | Type | Type Name | Len. | Remarks |
|---|---|---|---|---|---|---|---|
| PurchaseRequest-FollowUpDocumentStatusCode | Purchase Request | Follow Up_Status | Code | CCT | Code | 1..2 | restricted |

The data type GDT PurchaseRequestFollowUpDocumentStatusCode may assign a code list to the code. The attributes may be assigned the following values: listID="90034" and listAgencyID="310."

The data type GDT PurchaseRequestFollowUpDocumentStatusCode may use the following codes: 1 (i.e., No Follow-up), 2 (i.e., Purchase Order Created), 3 (i.e., Request for Quote Created), 4 (i.e., Purchasing Contract Created).

PurchaseRequestSourcingStatusCode

A GDT PurchaseRequestSourcingStatusCode is a coded representation of a sourcing status. Sourcing can be the search for as well as the assignment of sources of supply. An example of GDT PurchaseRequestSourcingStatusCode is:

<PurchaseRequestSourcingStatusCode>1</PurchaseRequestSourcingStatusCode>

In certain implementations, GDT PurchaseRequestSourcingStatusCode may have the following structure:

| GDT | Property | Representation/ Association | Type | Type Name | Len. | Remarks |
|---|---|---|---|---|---|---|
| PurchaseRequest-SourcingStatusCode | Sourcing_Status | Code | CCT | Code | 1..2 | restricted |

The data type GDT PurchaseRequestSourcingStatusCode may assign a code list to the code. The attributes may be assigned the following values: listID="90035" and listAgencyID="310."

The data type GDT PurchaseRequestSourcingStatusCode may use the following codes: 1 (i.e., In Manual Sourcing), 2 (i.e., In Manual Check), 3 (i.e., Not In Sourcing), 4 (i.e., Grouped for Sourcing by), 5 (i.e., Grouped for Sourcing by Request for Quote Creation).

RejectionStatusCode

A GDT RejectionStatusCode is the coded representation of a rejection status.

In certain implementations, the RejectionStatusCode specifies whether or not something was rejected. An example of GDT RejectionStatusCode is:

<RejectionStatusCode>1</RejectionStatusCode>

In certain implementations, GDT RejectionStatusCode may have the following structure:

| GDT | Object Class | Property | Representation/ Association | Type | Type Name | Len. | Remarks |
|---|---|---|---|---|---|---|---|
| RejectionStatus-Code | Rejection | Status | Code | CCT | Code | 1..2 | restricted |

The data type GDT RejectionStatusCode may assign a code list to the code. The attributes may be assigned the following values: listID="90052" and listAgencyID="310." The RejectionStatusCode can be used, for example, in an ExternalPaymentAllocationItem to display whether or not a request for clearing was rejected by the clearing house. Unlike the ApprovalStatusCode, the RejectionStatusCode can be used when an explicit answer can be expected in the case of a rejection.

The data type GDT RejectionStatusCode may use the following codes: 1 (i.e., Not Rejected), 2 (i.e., Rejected).

ReleasedSiteLogisticsProcessModelLifeCycleStatusCode

A GDT ReleasedSiteLogisticsProcessModelLifeCycleStatusCode is a coded representation of the life cycle status of a ReleasedSiteLogisticsProcessModel. A ReleasedSiteLogisticsProcessModel can be a released version of a SiteLogisticsProcessModel in a distribution center that contains all details from the SiteLogisticsBillOfOperations necessary for the execution of a site logistics process. A life cycle status can be a status that denotes a prominent stage of a life cycle, a series of prominent stages through which an object can pass during its lifetime.

A possible sequence of the stages can be determined by the constraints under which an object can pass from one stage to another. An example of GDT ReleasedSiteLogisticsProcessModelLifeCycleStatusCode is:

<ReleasedSiteLogisticsProcessModelLifeCycleStatus>1</ReleasedSiteLogisticsProcessModelLifeCycleStatus>

In certain implementations, GDT ReleasedSiteLogisticsProcessModelLifeCycleStatusCode may have the following structure:

| GDT | Object Class | Property | Representation/ Association | Type | Type Name | Len. | Remarks |
|---|---|---|---|---|---|---|---|
| ReleasedSiteLogistics-ProcessModelLife-CycleStatusCode | Released Site Logistics Process Model | Life Cycle_Status | Code | CDT | Code | 1..2 | restricted |

-

The data type GDT ReleasedSiteLogisticsProcessModelLifeCycleStatusCode may assign a code list to the code. The attributes may be assigned the following values: listID="90080" and listAgencyID="310."

The data type GDT ReleasedSiteLogisticsProcessModelLifeCycleStatusCode may use the following codes: 2 (i.e., Active), 4 (i.e., Obsolete).

ReleaseStatusCode

A GDT ReleaseStatusCode is a coded representation of the status of the release of an object. Release can be the end of the preparation and the start of the operative use. An example of GDT ReleaseStatusCode is:

<ReleaseStatusCode>1</ReleaseStatusCode>

In certain implementations, GDT ReleaseStatusCode may have the following structure:

| GDT | Property | Representation/ Association | Type | Type Name | Len. | Remarks |
|---|---|---|---|---|---|---|
| ReleaseStatusCode | Release_Status | Code | CCT | Code | 1..2 | restricted |

The data type GDT ReleaseStatusCode may assign a code list to the code. The attributes may be assigned the following values: listID="90002" and listAgencyID="310." In certain implementations, there can be a preparation and an operative use. They are separated by the release of the object. Release can be allowed after a successfully finished preparation or release finishes the preparation implicitly. Usually, preparations (including certain changes) are not allowed when the object is released. The release has to be revoked before the changes can be done. The steps of the operative use or usage by other objects can be allowed after release.

The data type GDT ReleaseStatusCode may use the following codes: 1 (i.e., Not Released), 2 (i.e., Partially Released), 3 (i.e., Released).

RequestAssignmentStatusCode

A GDT RequestAssignmentStatusCode is a coded representation of a status of the assignment within a Request. An example of GDT RequestAssignmentStatusCode is:

<RequestAssignmentStatusCode>1</RequestAssignmentStatusCode>

In certain implementations, GDT RequestAssignmentStatusCode may have the following structure:

| GDT | Object Class | Property | Representation/ Association | Type | Type Name | Len. | Remarks |
|---|---|---|---|---|---|---|---|
| RequestAssignmentStatusCode | Request Assignment | Status | Code | CCT | Code | 1..2 | restricted |

The data type GDT RequestAssignmentStatusCode may assign a code list to the code. The attributes may be assigned the following values: listID="90066" and listAgencyID="310."

The data type GDT RequestAssignmentStatusCode may use the following codes: 1 (i.e., Processor Action), 2 (i.e., Requestor Action), 3 (i.e., Provider Action), 4 (i.e., Not Assigned).

RequestForQuoteLifeCycleStatusCode

A GDT RequestForQuoteLifeCycleStatusCode is a coded representation of the life cycle status of a Request for Quote. A Request for Quote can be a request from a buyer to a bidder to submit a quote for a material or a service according to specified criteria. An example of GDT RequestForQuoteLifeCycleStatusCode is:

<RequestForQuoteLifeCycleStatusCode>1</RequestForQuoteLifeCycleStatusCode>

In certain implementations, GDT RequestForQuoteLifeCycleStatusCode may have the following structure:

| GDT | Object Class | Property | Representation/ Association | Type | Type Name | Len. | Remarks |
|---|---|---|---|---|---|---|---|
| RequestForQuoteLifeCycleStatusCode | Request For Quote | Life Cycle Status | Code | GDT | Code | 1..2 | restricted |

The data type GDT RequestForQuoteLifeCycleStatusCode may assign a code list to the code. The attributes may be assigned the following values: listID="90012" and listAgencyID="310." There can be two types of Request for Quotes. For example, operational Requests for Quotes which are used in the bidding process and template Requests for Quotes which can be used as a template for creating new Request for Quote instances, templates cannot occur in a business process. Both of these two types can have change versions and active versions. This GDT can be used to represent the most important steps in the lifecycle of a Request for Quote (e.g., In Preparation, In Approval, In Revision, Rejected, Published, Cancelled and closed) and in the lifecycle of a Request for Quote template (e.g., In Preparation, In Approval, In Revision, Rejected, Released and closed).

The data type GDT RequestForQuoteLifeCycleStatusCode may use the following codes: 1 (i.e., In Preparation), 2 (i.e., In Approval), 3 (i.e., In Revision), 4 (i.e., Rejected), 5 (i.e., Published), 6 (i.e., Cancelled), 7 (i.e., Closed), 8 (i.e., Released).

ServiceIssueCategoryCatalogueLifeCycleStatusCode

A GDT ServiceIssueCategoryCatalogueLifeCycleStatusCode is a coded representation of the life cycle status of a ServiceIssueCategoryCatalogue. A ServiceIssueCategoryCatalogue can be a structured directory of issue categories that describe business transactions in Customer Service from an objective or subjective point of view. An example of GDT ServiceIssueCategoryCatalogueLifeCycleStatusCode is:

<ServiceIssueCategoryCatalogueLifeCycleStatusCode>1</ServiceIssueCategoryCatalogueLifeCycleStatusCode>

In certain implementations, GDT ServiceIssueCategoryCatalogueLifeCycleStatusCode may have the following structure:

| GDT | Object Class | Property | Representation/ Association | Type | Type Name | Len. | Remarks |
|---|---|---|---|---|---|---|---|
| ServiceIssueCategoryCatalogueLifeCycleStatusCode | Service Issue Category-Catalogue | Life Cycle_Status | Code | CCT | Code | 1..2 | restricted |

The data type GDT ServiceIssueCategoryCatalogueLifeCycleStatusCode may assign a code list to the code. The attributes may be assigned the following values: listID="90063" and listAgencyID="310."

The data type GDT ServiceIssueCategoryCatalogueLifeCycleStatusCode may use the following codes: 1 (i.e., In Preparation), 2 (i.e., Released).

ServiceRequestLifeCycleStatusCode

A GDT ServiceRequestLifeCycleStatusCode is a coded representation of the life cycle status of a Service Request. A ServiceRequest can be a request from a customer to a service provider to solve an issue that the customer has with regard to a product. In addition to the description and the categorization of the issue, the ServiceRequest contains the documentation and the results of the resolution, as well as the expenses incurred. An example of GDT ServiceRequestLifeCycleStatusCode is:

<ServiceRequestLifeCycleStatusCode>1</ServiceRequestLifeCycleStatusCode>

In certain implementations, GDT ServiceRequestLifeCycleStatusCode may have the following structure:

| GDT | Object Class | Property | Representation/ Association | Type | Type Name | Len. | Remarks |
|---|---|---|---|---|---|---|---|
| ServiceRequest-LifeCycleStatus-Code | Service Request | Life Cycle_Status | Code | CCT | Code | 1..2 | restricted |

The data type GDT ServiceRequestLifeCycleStatusCode may assign a code list to the code. The attributes may be assigned the following values: listID="90064" and listAgencyID="310."

The data type GDT ServiceRequestLifeCycleStatusCode may use the following codes: 1 (i.e., Open), 2 (i.e., in Process), 3 (i.e., Finished), 4 (i.e., Closed)

SolutionProposalStatusCode

A GDT SolutionProposalStatusCode is a coded representation of a status of a solution proposal. An example of GDT SolutionProposalStatusCode is:

<SolutionProposalStatusCode>1</SolutionProposalStatusCode>

In certain implementations, GDT SolutionProposalStatusCode may have the following structure:

| GDT | Object Class | Property | Representation/ Association | Type | Type Name | Len. | Remarks |
|---|---|---|---|---|---|---|---|
| SolutionProposal-StatusCode | Solution Proposal | Status | Code | CCT | Code | 1..2 | restricted |

The data type GDT SolutionProposalStatusCode may assign a code list to the code. The attributes may be assigned the following values: listID="90065" and listAgencyID="310."

The data type GDT SolutionProposalStatusCode may use the following codes: 1 (i.e., No Solution), 2 (i.e., Solution Proposed), 3 (i.e., Solution Accepted), 4 (i.e., Solution Rejected).

SourceAndDestinationDeterminationRuleLifeCycleStatusCode

A GDT SourceAndDestinationDeterminationRuleLifeCycleStatusCode is a coded representation of the life cycle status of a SourceAndDestinationDeterminationRule. A SourceAndDestinationDeterminationRule can be a rule for determining the logistics source for inventory retrieval or the logistics destination for inventory placement. A life cycle status can be a status that denotes a prominent stage of a life cycle, a series of prominent stages through which an object can pass during its lifetime. A possible sequence of the stages can be determined by the constraints under which an object can pass from one stage to another. An example of GDT SourceAndDestinationDeterminationRuleLifeCycleStatusCode is:

<SourceAndDestinationDeterminationRuleLifeCycleStatusCode>1</SourceAndDestinationDeterminationRuleLifeCycleStatusCode>

In certain implementations, GDT SourceAndDestinationDeterminationRuleLifeCycleStatusCode may have the following structure:

| GDT | Object Class | Property | Representation/ Association | Type | Type Name | Len. | Remarks |
|---|---|---|---|---|---|---|---|
| SourceAndDestination Determination-RuleLife CycleStatusCode | Source And Destination Determination Rule | Life Cycle_Status | Code | CDT | Code | 1..2 | Restricted |

The data type GDT SourceAndDestinationDeterminationRuleLifeCycleStatusCode may assign a code list to the code. The attributes may be assigned the following values: listID="90081" and listAgencyID="310."

The data type GDT SourceAndDestinationDeterminationRuleLifeCycleStatusCode may use the following codes: 1 (i.e., In Preparation), 2 (i.e., Active), 3 (i.e., Blocked), 4 (i.e., Obsolete).

SourcingAvailabilityStatusCode

A GDT SourcingAvailabilityStatusCode is a coded representation of the Sourcing Availability Status of something. Something usually stands for objects that may or may not be available for sourcing, for example a PurchasingContract. An example of GDT SourcingAvailabilityStatusCode is:

<SourcingAvailabilityStatusCode>1</SourcingAvailabilityStatusCode>

In certain implementations, GDT SourcingAvailabilityStatusCode may have the following structure:

| GDT | Object Class | Property | Representation/ Association | Type | Type Name | Len. | Remarks |
|---|---|---|---|---|---|---|---|
| Sourcing-Availability-StatusCode | Sourcing | Availability_Status | Code | CCT | Code | 1..2 | restricted |

The data type GDT SourcingAvailabilityStatusCode may assign a code list to the code. The attributes may be assigned the following values: listID="90073" and listAgencyID="310."

The data type GDT SourcingAvailabilityStatusCode may use the following codes: 1 (i.e., Available), 2 (i.e., Unavailable), 3 (i.e., Available for Manual Sourcing).

SourceOfSupplyLifeCycleStatusCode

A GDT SourceOfSupplyLifeCycleStatusCode is a coded representation of the life cycle status of a source of supply. A SourceOfSupply can be a source for the external and internal procurement of products. A life cycle status can be a status that denotes a prominent stage of a life cycle, a series of prominent stages through which an object can pass during its lifetime. A possible sequence of the stages can be determined by the constraints under which an object can pass from one stage to another. An example of GDT SourceOfSupplyLifeCycleStatusCode is:

<SourceOfSupplyLifeCycleStatusCode>1</SourceOfSupplyLifeCycleStatusCode>

In certain implementations, GDT SourceOfSupplyLifeCycleStatusCode may have the following structure:

| GDT | Object Class | Property | Representation/ Association | Type | Type Name | Len. | Remarks |
|---|---|---|---|---|---|---|---|
| SourceOfSupply LifeCycleStatusCode | Source Of Supply | Life Cycle_Status | Code | CDT | Code | 1..2 | Restricted |

The data type GDT SourceOfSupplyLifeCycleStatusCode may assign a code list to the code. The attributes may be assigned the following values: listID="90083" and listAgencyID="310."

The data type GDT SourceOfSupplyLifeCycleStatusCode may use the following codes: 1 (i.e., In Preparation), 2 (i.e., Active), 3 (i.e., Blocked), 4 (i.e. Obsolete).

SourceOfSupplyLogisticRelationshipLifeCycleStatusCode

A GDT SourceOfSupplyLogisticRelationshipLifeCycleStatusCode is a coded representation of the life cycle status of a logistic relationship of a source of supply. A SourceOfSupply can be a source for the external and internal procurement of products. A LogisticRelationship can be a relationship between two locations that can be used to procure and produce products. In certain implementations, it defines logistical characteristics. A life cycle status can be a status that denotes a prominent stage of a life cycle, a series of prominent stages through which an object can pass during its lifetime. A possible sequence of the stages can be determined by the constraints under which an object can pass from one stage to another. An example of GDT SourceOfSupplyLogisticRelationshipLifeCycleStatusCode is:

<SourceOfSupplyLogisticRelationshipLifeCycleStatusCode>1</SourceOfSupplyLogisticRelationshipLifeCycleStatusCode>

In certain implementations, GDT SourceOfSupplyLogisticRelationshipLifeCycleStatusCode may have the following structure:

| GDT | Object Class | Property | Representation/ Association | Type | Type Name | Len. | Remarks |
|---|---|---|---|---|---|---|---|
| SourceOfSupply LogisticRelationshipLife CycleStatusCode | Source Of Supply Logistic Relationship | Life Cycle_Status | Code | CDT | Code | 1..2 | Restricted |

The data type GDT SourceOfSupplyLogisticRelationshipLifeCycleStatusCode may assign a code list to the code. The attributes may be assigned the following values: listID="90084" and listAgencyID="310."

The data type GDT SourceOfSupplyLogisticRelationshipLifeCycleStatusCode may use the following codes: 1 (i.e., In Preparation), 2 (i.e., Active), 3 (i.e., Blocked), 4 (i.e. Obsolete).

StorageBehaviourMethodLifeCycleStatusCode

A GDT StorageBehaviourMethodLifeCycleStatusCode is a coded representation of the life cycle status of a StorageBehaviourMethod. A StorageBehaviourMethod can be a set of rules that defines the manner in which a storage location is managed. A life cycle status can be a status that denotes a prominent stage of a life cycle, a series of prominent stages through which an object can pass during its lifetime. A possible sequence of the stages can be determined by the constraints under which an object can pass from one stage to another. An example of GDT StorageBehaviourMethodLifeCycleStatusCode is:

<StorageBehaviourMethodLifeCycleStatusCode>1</StorageBehaviourMethodLifeCycleStatusCode>

In certain implementations, GDT StorageBehaviourMethodLifeCycleStatusCode may have the following structure:

| GDT | Object Class | Property | Representation/ Association | Type | Type Name | Len. | Remarks |
|---|---|---|---|---|---|---|---|
| StorageBehaviourMethod LifeCycleStatusCode | Storage Behaviour Method | Life Cycle_Status | Code | CDT | Code | 1..2 | Restricted |

The data type GDT StorageBehaviourMethodLifeCycleStatusCode may assign a code list to the code. The attributes may be assigned the following values: listID="90082" and listAgencyID="310."

The data type GDT StorageBehaviourMethodLifeCycleStatusCode may use the following codes: 1 (i.e., In Preparation), 2 (i.e., Active), 3 (i.e., Blocked), 4 (i.e. Obsolete).

SolutionProposalStatusCode

A GDT SolutionProposalStatusCode is a coded representation of a status of a solution proposal. An example of GDT SolutionProposalStatusCode is:

<SolutionProposalStatusCode>1</SolutionProposalStatusCode>

In certain implementations, GDT SolutionProposalStatusCode may have the following structure:

| GDT | Object Class | Property | Representation/ Association | Type | Type Name | Len. | Remarks |
|---|---|---|---|---|---|---|---|
| SolutionProposal-StatusCode | Solution Proposal | Status | Code | CCT | Code | 1..2 | restricted |

The data type GDT SolutionProposalStatusCode may assign a code list to the code. The attributes may be assigned the following values: listID="90065" and listAgencyID="310."

The data type GDT SolutionProposalStatusCode may use the following codes: 1 (i.e., No Solution Proposed), 2 (i.e., Solution Proposed), 3 (i.e., Solution Accepted), 4 (i.e. Solution Rejected).

SourceAndDestinationDeterminationRuleLifeCycleStatusCode

A GDT SourceAndDestinationDeterminationRuleLifeCycleStatusCode is a coded representation of the life cycle status of a SourceAndDestinationDeterminationRule. A SourceAndDestinationDeterminationRule can be a rule for determining the logistics source for inventory retrieval or the logistics destination for inventory placement. A life cycle status can be a status that denotes a prominent stage of a life cycle, a series of prominent stages through which an object can pass during its lifetime.

A possible sequence of the stages can be determined by the constraints under which an object can pass from one stage to another. An example of GDT SourceAndDestinationDeterminationRuleLifeCycleStatusCode is:

<SourceAndDestinationDeterminationRuleLifeCycleStatusCode>1</SourceAndDestinationDeterminationRuleLifeCycleStatusCode>

In certain implementations, GDT SourceAndDestinationDeterminationRuleLifeCycleStatusCode may have the following structure:

| GDT | Object Class | Property | Representation/ Association | Type | Type Name | Len. | Remarks |
|---|---|---|---|---|---|---|---|
| SourceAndDestination Determination RuleLifeCycleStatus-Code | Source And Destination Determination Rule | Life Cycle_Status | Code | CDT | Code | 1..2 | Restricted |

The data type GDT SourceAndDestinationDeterminationRuleLifeCycleStatusCode may assign a code list to the code. The attributes may be assigned the following values: listID="90081" and listAgencyID="310."

The data type GDT SourceAndDestinationDeterminationRuleLifeCycleStatusCode may use the following codes: 1 (i.e., In Preparation), 2 (i.e., Active), 3 (i.e., Blocked), 4 (i.e. Obsolete).

SourcingAvailabilityStatusCode

A GDT SourcingAvailabilityStatusCode is a coded representation of the Sourcing Availability Status of something. Something usually stands for objects that may or may not be available for sourcing, for example a PurchasingContract (described above). An example of GDT SourcingAvailabilityStatusCode is:

<SourcingAvailabilityStatusCode>1</SourcingAvailabilityStatusCode>

In certain implementations, GDT SourcingAvailabilityStatusCode may have the following structure:

| GDT | Object Class | Property | Representation/ Association | Type | Type Name | Len. | Remarks |
|---|---|---|---|---|---|---|---|
| Sourcing-Availability-StatusCode | Sourcing | Availability_Status | Code | CCT | Code | 1..2 | restricted |

The data type GDT SourcingAvailabilityStatusCode may assign a code list to the code. The attributes may be assigned the following values: listID="90073" and listAgencyID="310."

The data type GDT SourcingAvailabilityStatusCode may use the following codes: 1 (i.e., Available), 2 (i.e., Unavailable), 3 (i.e., Available for Manual Sourcing).

StartingStatusCode

A GDT StartingStatusCode is a coded representation of a status which describes if a process has started. An example of GDT StartingStatusCode is:

<StartingStatusCode>1</StartingStatusCode>

In certain implementations, GDT StartingStatusCode may have the following structure:

| GDT | Property | Representation/ Association | Type | Type Name | Len. | Remarks |
|---|---|---|---|---|---|---|
| StartingStatusCode | Starting_Status | Code | CCT | Code | 1..2 | restricted |

The data type GDT StartingStatusCode may assign a code list to the code. The attributes may be assigned the following values: listID="90016" and listAgencyID="310." In certain implementations, the StartingStatusCode describes if a process has started and the ProcessingStatusCode describes the progress made in the execution of a process.

The data type GDT StartingStatusCode may use the following codes: 1 (i.e., Not Started), 2 (i.e., Started).

StoppingStatusCode

A GDT StoppingStatusCode is a coded representation of the status of a stopping of something. The stopping of a business object denotes the stopping of the process or processes that are handled by this business object. The stopping of a process can be the premature termination of this process. No revoking of data takes place. An example of GDT StoppingStatusCode is:

<StoppingStatusCode>1</StoppingStatusCode>

In certain implementations, GDT StoppingStatusCode may have the following structure:

| GDT | Property | Representation/ Association | Type | Type Name | Len. | Remarks |
|---|---|---|---|---|---|---|
| StoppingStatusCode | Stopping_Status | Code | CCT | Code | 1..2 | restricted |

The data type GDT StoppingStatusCode may assign a code list to the code. The attributes may be assigned the following values: listID="90072" and listAgencyID="310." In difference to the CancellationStatusCode usually no revoking of processes takes place.

The data type GDT StoppingStatusCode may use the following codes: 1 (i.e., Not Stopped), 2 (i.e., Stopped).

SubmissionStatusCode

A GDT SubmissionStatusCode is a coded representation of a submission status. Sub-mission can be the act of submitting something (as for consideration or inspection) to a receiving party. An example of GDT SubmissionStatusCode is:

<SubmissionStatusCode>1</SubmissionStatusCode>

In certain implementations, GDT SubmissionStatusCode may have the following structure:

| GDT | Property | Representation/ Association | Type | Type Name | Len. | Remarks |
|---|---|---|---|---|---|---|
| SubmissionStatusCode | Submission_Status | Code | GDT | Code | 1..2 | restricted |

The data type GDT SubmissionStatusCode may assign a code list to the code. The attributes may be assigned the following values: listID="90042" and listAgencyID="310."

The data type GDT SubmissionStatusCode may use the following codes: 1 (i.e., Not Submitted), 2 (i.e., Submitted), 3 (i.e., Withdrawn), 4 (i.e., Returned).

SupplierQuoteAwardingStatusCode

A GDT SupplierQuoteAwardingStatusCode is a coded representation of the Supplier Quote's awarding status. An example of GDT SupplierQuoteAwardingStatusCode is:

<SupplierQuoteAwardingStatusCode>1</SupplierQuoteAwardingStatusCode>

In certain implementations, GDT SupplierQuoteAwardingStatusCode may have the following structure:

| GDT | Object Class | Property | Representation/ Association | Type | Type Name | Len. | Remarks |
|---|---|---|---|---|---|---|---|
| SupplierQuote-AwardingStatus-Code | Supplier Quote | Awarding_Status | Code | GDT | Code | 1..2 | restricted |

The data type GDT SupplierQuoteAwardingStatusCode may assign a code list to the code. The attributes may be assigned the following values: listID="90037" and listAgencyID="310."

The data type GDT SupplierQuoteAwardingStatusCode may use the following codes: 1 (i.e., Not Awarded), 2 (i.e., Declined), 3 (i.e., Accepted for Awarding), 4 (i.e., Awarded).

SupplierQuoteLifeCycleStatusCode

A GDT SupplierQuoteLifeCycleStatusCode is a coded representation of the life cycle status of a Supplier Quote. A SupplierQuote can be an offer by a bidder to supply materials or services to a buyer according to specified criteria. An example of GDT SupplierQuoteLifeCycleStatusCode is:

<SupplierQuoteLifeCycleStatusCode>5</SupplierQuoteLifeCycleStatusCode>

In certain implementations, GDT SupplierQuoteLifeCycleStatusCode may have the following structure:

| GDT | Object Class | Property | Representation/ Association | Type | Type Name | Len. | Remarks |
|---|---|---|---|---|---|---|---|
| SupplierQuoteLifeCycleStatusCode | Supplier Quote | Life Cycle_Status | Code | GDT | Code | 1..2 | restricted |

The data type GDT SupplierQuoteLifeCycleStatusCode may assign a code list to the code. The attributes may be assigned the following values: listID="90039" and listAgencyID="310." The SupplierQuoteLifeCycleStatusCode can be used to represent the most important steps in a SupplierQuote's life cycle.

The data type GDT SupplierQuoteLifeCycleStatusCode may use the following codes: 1 (i.e., In Preparation), 2 (i.e., Submitted), 3 (i.e., Withdrawn), 4 (i.e., Returned), 5 (i.e., Declined), 6 (i.e., In Approval), 7 (i.e., In Revision), 8 (i.e., Approval Rejected), 9 (i.e., Awarded), 10 (i.e., Closed).

SupplierQuotePreparationStatusCode

A GDT SupplierQuotePreparationStatusCode is a coded representation of the status of a Supplier Quote's preparation. The Supplier Quote can be prepared by different parties, namely the bidder and the buyer party. An example of GDT SupplierQuotePreparationStatusCode is:

<SupplierQuotePreparationStatusCode>3</SupplierQuotePreparationStatusCode>

In certain implementations, GDT SupplierQuotePreparationStatusCode may have the following structure:

| GDT | Object Class | Property | Representation/ Association | Type | Type Name | Len. | Remarks |
|---|---|---|---|---|---|---|---|
| SupplierQuotePreparationStatusCode | SupplierQuote | Preparation_Status | Code | GDT | Code | 1..2 | restricted |

The data type GDT SupplierQuotePreparationStatusCode may assign a code list to the code. The attributes may be assigned the following values: listID="90038" and listAgencyID="310."

The data type GDT SupplierQuotePreparationStatusCode may use the following codes: δ 1 (i.e., Submission In Preparation), 2 (i.e., Award In Preparation), 3 (i.e., Preparation Finished).

SupplyQuotaArrangementItemLifeCycleStatusCode

A GDT SupplyQuotaArrangementItemLifeCycleStatusCode is a coded representation of the life cycle status of an item of a supply quota arrangement. A SupplyQuotaArrangement can describe the distribution of material requirements or material issues to different sources of supply, business partners, or internal organizational units An Item can define the portion of a supply quota arrangement that can be covered by a source of supply and contains the current quantity in the supply quota arrangement. A life cycle status can be a status that denotes a prominent stage of a life cycle, a series of prominent stages through which an object can pass during its lifetime. A possible sequence of the stages can be determined by the constraints under which an object can pass from one stage to another. An example of GDT SupplyQuotaArrangementItemLifeCycleStatusCode is:

<SupplyQuotaArrangementItemLifeCycleStatusCode>1</SupplyQuotaArrangementItemLifeCycleStatusCode>

In certain implementations, GDT SupplyQuotaArrangementItemLifeCycleStatusCode may have the following structure:

| GDT | Object Class | Property | Representation/ Association | Type | Type Name | Len. | Remarks |
|---|---|---|---|---|---|---|---|
| SupplyQuota-ArrangementItemLifeCycle-StatusCode | Supply Quota Arrangement Item | Life Cycle_Status | Code | CDT | Code | 1..2 | Restricted |

The data type GDT SupplyQuotaArrangementItemLifeCycleStatusCode may assign a code list to the code. The attributes may be assigned the following values: listID="90085" and listAgencyID="310."

The data type GDT SupplyQuotaArrangementItemLifeCycleStatusCode may use the following codes: 1 (i.e., In Preparation), 2 (i.e., Active), 3 (i.e., Blocked), 4 (i.e., Obsolete).

SupplyQuotaArrangementLifeCycleStatusCode

A GDT SupplyQuotaArrangementLifeCycleStatusCode is a coded representation of the life cycle status of a supply quota arrangement. A SupplyQuotaArrangement can describe the distribution of material requirements or material issues to different sources of supply, business partners, or internal organizational units. A life cycle status can be a status that denotes a prominent stage of a life cycle, a series of prominent stages through which an object can pass during its lifetime. A possible sequence of the stages can be determined by the constraints under which an object can pass from one stage to another. An example of GDT SupplyQuotaArrangementLifeCycleStatusCode is:

<SupplyQuotaArrangemnetLifeCycleStatusCode>1</SupplyQuotaArrangementLifeCycleStatusCode>

In certain implementations, GDT SupplyQuotaArrangementLifeCycleStatusCode may have the following structure:

| GDT | Object Class | Property | Representation/ Association | Type | Type Name | Len. | Remarks |
|---|---|---|---|---|---|---|---|
| SupplyQuota-ArrangementLifeCycleStatus-Code | Supply Quota Arrangement | Life Cycle_Status | Code | CDT | Code | 1..2 | Restricted |

The data type GDT SupplyQuotaArrangementLifeCycleStatusCode may assign a code list to the code. The attributes may be assigned the following values: listID="90086" and listAgencyID="310."

The data type GDT SupplyQuotaArrangementLifeCycleStatusCode may use the following codes: 1 (i.e., In Preparation), 2 (i.e., Active), 3 (i.e., Blocked), 4 (i.e., Obsolete).

TransportationLaneLifeCycleStatusCode

A GDT TransportationLaneLifeCycleStatusCode is a coded representation of the life cycle status of a transportation lane. A TransportationLane can be a relationship between two locations or transportation zones that can specify which materials can be transported between the locations or transportation zones, and which means of transport can be used. A life cycle status can be a status that denotes a prominent stage of a life cycle, a series of prominent stages through which an object can pass during its lifetime. A possible sequence of the stages can be determined by the constraints under which an object can pass from one stage to another. An example of GDT TransportationLaneLifeCycleStatusCode is:

<TransportationLaneLifeCycleStatusCode>1</TransportationLaneLifeCycleStatusCode>

In certain implementations, CDT TransportationLaneLifeCycleStatusCode may have the following structure:

| GDT | Object Class | Property | Representation/ Association | Type | Type Name | Len. | Remarks |
|---|---|---|---|---|---|---|---|
| TransportationLane LifeCycleStatus-Code | Transportation Lane | Life Cycle_Status | Code | CDT | Code | 1..2 | Restricted |

The data type GDT TransportationLaneLifeCycleStatusCode may assign a code list to the code. The attributes may be assigned the following values: listID="90087" and listAgencyID="310."

The data type GDT TransportationLaneLifeCycleStatusCode may use the following codes: 1 (i.e., In Preparation), 2 (i.e., Active), 3 (i.e., Blocked), 4 (i.e., Obsolete).

TransportationLaneValidMaterialLifeCycleStatusCode

A GDT TransportationLaneValidMaterialLifeCycleStatusCode is a coded representation of the life cycle status of a valid material of a transportation lane. A TransportationLane can be a relationship between two locations or transportation zones that specifies which materials can be transported between the locations or transportation zones, and which means of trans-port can be used. ValidMaterials represents one or more material(s) which are assigned to a transportation lane. A material can be defined directly; several materials can be defined using a product category; or all materials can be defined without specifying a restriction. A life cycle status can be a status that denotes a prominent stage of a life cycle, a series of prominent stages through which an object can pass during its lifetime. A possible sequence of the stages can be determined by the constraints under which an object can pass from one stage to another. An example of GDT TransportationLaneValidMaterialLifeCycleStatusCode is:

<TransportationLaneValidMaterialLifeCycleStatusCode>1</TransportationLaneValidMaterialLifeCycleStatusCode>

In certain implementations, GDT TransportationLaneValidMaterialLifeCycleStatusCode may have the following structure:

| GDT | Object Class | Property | Representation/ Association | Type | Type Name | Len. | Remarks |
|---|---|---|---|---|---|---|---|
| TransportationLaneValid-Material LifeCycleStatusCode | Transportation Lane Valid Material | Life Cycle_Status | Code | CDT | Code | 1..2 | Restricted |

The data type GDT TransportationLaneValidMaterialLifeCycleStatusCode may assign a code list to the code. The attributes may be assigned the following values: listID="90088" and listAgencyID="310."

The data type GDT TransportationLaneValidMaterialLifeCycleStatusCode may use the following codes: 1 (i.e., In Preparation), 2 (i.e., Active), 3 (i.e., Blocked), 4 (i.e., Obsolete).

TransportationLaneValidTransportMeansLifeCycleStatusCode

A GDT TransportationLaneValidTransportMeansLifeCycleStatusCode is a coded representation of the life cycle status of a valid means of transport of a transportation lane. A TransportationLane can be a relationship between two locations or transportation zones that specifies which materials can be transported between the locations or transportation zones, and which means of transport can be used.

A ValidTransportMeans can be a valid means of transport that can be used in a transportation lane to transport materials. A life cycle status can be a status that denotes a prominent stage of a life cycle, a series of prominent stages through which an object can pass during its lifetime. A possible sequence of the stages can be determined by the constraints under which an object can pass from one stage to another. An example of GDT TransportationLaneValidTransportMeansLifeCycleStatusCode is:

<TransportationLaneValidTransportMeansLifeCycleStatusCode>1</TransportationLaneValidTransportMeansLifeCycleStatusCode>

In certain implementations, GDT TransportationLaneValidTransportMeansLifeCycleStatusCode may have the following structure:

| GDT | Object Class | Property | Representation/ Association | Type | Type Name | Len. | Remarks |
|---|---|---|---|---|---|---|---|
| TransportationLaneValid-Transport MeansLifeCycleStatusCode | Transportation Lane Valid Transport Means | Life Cycle_Status | Code | CDT | Code | 1..2 | Restricted |

The data type GDT TransportationLaneValidTransportMeansLifeCycleStatusCode may assign a code list to the code. The attributes may be assigned the following values: listID="90089" and listAgencyID="310."

The data type GDT TransportationLaneValidTransportMeansLifeCycleStatusCode may use the following codes: 1 (i.e., In Preparation), 2 (i.e., Active), 3 (i.e., Blocked), 4 (i.e., Obsolete).

UpToDatenessStatusCode

An GDT UpToDatenessStatusCode is a coded representation of a status that describes the up-to-dateness of an object. An example of GDT UpToDatenessStatusCode is:

<UpToDatenessStatusCode>1</UpToDatenessStatusCode>

In certain implementations, GDT UpToDatenessStatusCode may have the following structure:

| GDT | Property | Representation/ Association | Type | Type Name | Len. | Remarks |
|---|---|---|---|---|---|---|
| UpTo-Dateness-StatusCode | Up To Dateness_Status | Code | CCT | Code | 1..2 | restricted |

The data type GDT UpToDatenessStatusCode may assign a code list to the code. The attributes may be assigned the following values: listID="90017" and listAgencyID="310."

The data type GDT UpToDatenessStatusCode may use the following codes: 1 (i.e., Up-to-Date), 2 (i.e., Partially up-to-Date), 3 (i.e., Out of Date).

WorkingTimeModelLifeCycleStatusCode

A GDT WorkingTimeModelLifeCycleStatusCode is a coded representation of the life cycle status of a WorkingTimeModel. A WorkingTimeModel can be a structured description of working times. In addition to working hours, it may also describe absence times, break times, and availability times. An example of GDT WorkingTimeModelLifeCycleStatusCode is:

<WorkingTimeModelLifeCycleStatus>1</WorkingTimeModelLifeCycleStatus>

In certain implementations, GDT WorkingTimeModelLifeCycleStatusCode may have the following structure:

| GDT | Object Class | Property | Representation/ Association | Type | Type Name | Len. | Remarks |
|---|---|---|---|---|---|---|---|
| Working-Time-Model-Life-Cycle-Status-Code | Working Time Model | Life Cycle_Status | Code | CCT | Code | 1..2 | restricted |

The data type GDT WorkingTimeModelLifeCycleStatusCode may assign a code list to the code. The attributes may be assigned the following values: listID="90014" and listAgencyID="310."

The data type GDT WorkingTimeModelLifeCycleStatusCode may use the following codes: 1 (i.e., Inactive), 2 (i.e., Active), 3 (i.e., Active with Pending Changes), 4 (i.e., Active with Pending), 5 (i.e., Cancelled).

ABCClassificationCode

A GDT ABCClassificationCode is the result of an ABC Analysis. An ABC Analysis can be used as an analytical method which assigns a specific level of importance to an object (e.g., customers, suppliers, products) with respect to specific criteria (e.g., business volume, profit, purchasing volume). An example of GDT ABCClassificationCode is:

<ABCClassificationCode>A</ABCClassificationCode>

In certain implementations GDT ABCClassificationCode may have the following structure:

| GDT | Property | Representation/ Association | Type | Type Name | Len. | Remarks |
|---|---|---|---|---|---|---|
| ABC-Classification-Code | ABC Classification | Code | T | Code | 1 | restricted |

The data type GDT ABCClassificationCode may assign a code list to the code. The attributes may be assigned the following values: listID="Keine Angabe" and listAgencyID="310."

The data type GDT ABCClassificationCode may use the following codes: A (i.e., important), B (i.e., less important), C (i.e., unimportant).

AcademicTitleCode

An GDT AcademicTitleCode is the coded representation of an academic title. An example of GDT AcademicTitleCode is:

<AcademicTitleCode listAgencyID=310>0001</AcademicTitleCode>

In certain implementations, GDT AcademicTitleCode may have the following structure:

| GDT | | Cat. | Object Class | Property | Representation/ Association | Type | Type Name | Len. | Card. |
|---|---|---|---|---|---|---|---|---|---|
| Academic-TitleCode | | | | Academic Title | Code | CDT | Code | 1..4 | 0..1 |
| | listID | A | Code List | Identification | Identifier | xsd | token | | 0..1 |
| | listAgencyID | A | Code List Agency | Identification | Identifier | xsd | token | | 0..1 |
| | listVersionID | A | Code List | Version | Identifier | xsd | token | | 0..1 |
| | listAgency-SchemeID | A | Code List Agency | Scheme | Identifier | xsd | token | | 0..1 |
| | listAgency-Scheme-AgencyID | A | Code List Agency | Scheme Agency | Identifier | xsd | token | | 0..1 |

For GDT AcademicTitleCode, a customer-specific code list can be assigned to the code. A listID can be "10115." If the code list is unchanged, a listAgencyID can be "310." Otherwise, a listAgencyID can be the ID of the customer (e.g., ID from DE 3055, if listed there). A listVersionID can be the version of the particular code list (e.g., assigned and managed by the customer). A listAgencySchemeID can be the ID of the scheme if the listAgencyID does not come from DE 3055. The listAgencySchemeAgencyID can be the ID of the organization from DE 3055 that manages the listAgencySchemeID scheme.

The data type AcademicTitleCode can be used as part of a name of a person. The following dictionary objects can be assigned to the GDT AcademicTitleCode: Data element (e.g., AD_TITLE1) Domain (e.g., AD_TITLE1). The possible values for AcademicTitleCode are maintained in table TSAD2.

The data type GDT AcademicTitleCode may use the following codes: 0001 (i.e., Doctor), 0002 (i.e., Professor), 0003 (i.e., Professor doctor), 0004 (i.e., Bachelor of Arts), 0005 (i.e., Master of Business Administration), 0006 (i.e., Doctor of Philosophy).

AcceptanceStatusCode

A GDT AcceptanceStatusCode is a coded representation of the status of the acceptance by a communication partner regarding a business transaction that has been transmitted to that partner. An example of GDT AcceptanceStatusCode is:

<AcceptanceStatusCode>AP</AcceptanceStatusCode>

In certain implementations, GDT AcceptanceStatusCode may have the following structure:

| GDT | Property | Representation/Association | Type | Type Name | Len. | Remarks |
|---|---|---|---|---|---|---|
| AcceptanceStatusCode | Acceptance Status | Code | CDT | Code | 2 | restricted |

In certain implementations, the GDT AcceptanceStatusCode can be used as a business status and not as a technical acknowledgment of a message. The GDT AcceptanceStatusCode can be used as an immediate response to individual messages in bilateral negotiation processes between communication partners.

The data type GDT AcceptanceStatusCode may use the following codes: AP (i.e., accepted), AJ (i.e., pending), RE (i.e., rejected).

AccountDeterminationCompanyGroupCode

A GDT AccountDeterminationCompanyGroupCode is the coded representation of a group of companies from the viewpoint of identical determination of accounts in accounting. For the purposes of proper financial reporting, the value-based representation of business trans-actions in accounting may use different accounts. An example of GDT AccountDeterminationCompanyGroupCode is:

<AccountDeterminationCompanyGroupCode>1</AccountDeterminationCompanyGroupCode>

In certain implementations, GDT AccountDeterminationCompanyGroupCode may have the following structure:

| GDT | Object Class Term Qualifier | Object Class Term | Representation/Association | Type | Type Name | Len. | Remarks |
|---|---|---|---|---|---|---|---|
| AccountDetermination-CompanyGroupCode | Account Determination | Company Group | Code | CDT | Code | 1..4 | Restricted |

The data type GDT AccountDeterminationCompanyGroupCode involved can be a custom code list.

The GDT AccountDeterminationCompanyGroupCode can be used in the business object models and in A2A messages. The data type GDT AccountDeterminationCompanyGroupCode may use the following codes: domestic companies, foreign companies.

AccountDeterminationCreditorGroupCode

A GDT AccountDeterminationCreditorGroupCode is the coded representation of a group of creditors based on the viewpoint of a similar derivation of accounts in accounting. For the purposes of proper financial reporting, the value-based representation of business trans-actions in accounting may use different accounts. An example of GDT AccountDeterminationCreditorGroupCode is:

<AccountDeterminationCreditorGroupCode>1</AccountDeterminationCreditorGroupCode>

In certain implementations, GDT AccountDeterminationCreditorGroupCode may have the following structure:

| GDT | Object Class | Representation/Association | Type | Type Name | Len. | Remarks |
|---|---|---|---|---|---|---|
| AccountDetermination-Creditor-GroupCode | Account Determination-Creditor Group | Code | CDT | Code | 1..4 | restricted |

The data type GDT AccountDeterminationCreditorGroupCode may assign a code list to the code. The attributes may be assigned the following values: listID="10317."

The GDT AccountDeterminationCreditorGroupCode can be used in the business object models and in A2A messages. The data type GDT AccountDeterminationCreditorGroupCode may use the following codes: domestic vendors (i.e., vendors with headquarters in home country), foreign vendors (i.e., vendors with headquarters abroad).

AccountDeterminationDebtorGroupCode

A GDT AccountDeterminationDebtorGroupCode is the coded representation of a group of debtors based on the viewpoint of a similar derivation of accounts in accounting. For the purposes of proper financial reporting, the value-based representation of business transactions in accounting may use different accounts. An example of GDT AccountDeterminationDebtorGroupCode is:

<AccountDeterminationDebtorGroupCode>1
<AccountDeterminationDebtorGroupCode>

In certain implementations, GDT AccountDeterminationDebtorGroupCode may have the following structure:

| GDT | Object Class | Representation/Association | Type | Type Name | Len. | Remarks |
|---|---|---|---|---|---|---|
| AccountDetermination-Debtor-GroupCode | Account Determination Debtor Group | Code | CDT | Code | 1..4 | restricted |

For GDT AccountDeterminationDebtorGroupCode, a customer-specific code list can be assigned to the code. The attributes may be assigned the following values: listID="10466."

The AccountDeterminationDebtorGroupCode can be used in the business object models and in A2A messages.

The data type GDT AccountDeterminationDebtorGroupCode may use the following codes: domestic customers (i.e., customers with headquarters in home country), foreign customers (i.e., customers with headquarters abroad).

AccountDeterminationExpenseGroupCode

A GDT AccountDeterminationExpenseGroupCode is the coded representation of a group of expenses from the perspective of an identical or similar determination of an account in accounting. For the purposes of proper financial reporting, the value-based representation of business transactions in accounting can use different accounts. An example of GDT AccountDeterminationExpenseGroupCode is:

<AccountDeterminationExpenseGroupCode>10</AccountDeterminationExpenseGroupCode>

In certain implementations, GDT AccountDeterminationExpenseGroupCode may have the following structure:

| GDT | Object Class Term Qualifier | Object Class Term | Representation/ Association | Type | Type Name | Len. | Remarks |
|---|---|---|---|---|---|---|---|
| Account-Determination-Expense-Group-Code | Account Determination | Expense Group | Code | CDT | Code | 1..4 | restricted |

For GDT AccountDeterminationExpenseGroupCode, a customer-specific code list can be assigned to the code. A listID can be "10319." A listAgencyID can be the ID of the customer (e.g., ID from DE 3055, if listed there). A listVersionID can be the version of the particular code list (e.g., assigned and managed by the customer). A listAgencySchemeID can be the ID of the scheme if the listAgencyID does not come from DE 3055. The listAgencySchemeAgencyID can be the ID of the organization from DE 3055 that manages the listAgencySchemeID scheme.

The GDT AccountDeterminationExpenseGroupCode can be used in the business object models and in A2A messages. The data type GDT AccountDeterminationExpenseGroupCode may use the following codes: costs for meals, costs for accommodations, travel costs for attending a seminar, costs for domestic trips.

AccountDeterminationFixedAssetClassGroupCode

A GDT AccountDeterminationFixedAssetClassGroupCode is the coded representation of a group of FixedAssetClasses based on the viewpoint of a similar derivation of accounts in accounting. For the purposes of proper financial reporting, the value-based representation of business transactions in accounting can use different accounts. An example of GDT AccountDeterminationFixedAssetClassGroupCode is:

<AccountDeterminationFixedAssetClassGroupCode>
1<AccountDeterminationFixedAssetClassGroupCode>

In certain implementations, GDT AccountDeterminationFixedAssetClassGroupCode may have the following structure:

| GDT | Object Class | Representation/ Association | Type | Type Name | Len. | Remarks |
|---|---|---|---|---|---|---|
| Account-Determination-Fixed-AssetClass-GroupCode | Account Determination Fixed Asset Class Group | Code | CDT | Code | 1..4 | restricted |

For GDT AccountDeterminationFixedAssetClassGroupCode, a customer-specific code list can be assigned to the code. A listID can be "10320." A listAgencyID can be the ID of the customer (e.g., ID from DE 3055, if listed there). A listVersionID can be the version of the particular code list (e.g., assigned and managed by the customer). A listAgencySchemeID can be the ID of the scheme if the listAgencyID does not come from DE 3055. The listAgencySchemeAgencyID can be the ID of the organization from DE 3055 that manages the listAgencySchemeID scheme.

In certain implementations, the GDT AccountDeterminationFixedAssetClassGroupCode can be used in the business object models and in A2A messages. The data type GDT AccountDeterminationFixedAssetClassGroupCode may use the following codes: vehicle fleet (i.e., cars and vans), real estate (i.e., houses and property).

AccountDeterminationHouseBankGroupCode

A GDT AccountDeterminationHouseBankGroupCode is the coded representation of a group of house banks based on the viewpoint of a similar determination of accounts in accounting. For the purposes of proper financial reporting, the value-based representation of business transactions in accounting can use different accounts. An example of GDT AccountDeterminationHouseBankGroupCode is:

<AccountDeterminationHouseBankGroupCode>1</AccountDeterminationHouseBankGroupCode>

In certain implementations, GDT AccountDeterminationHouseBankGroupCode may have the following structure:

| GDT | Object Class Term Qualifier | Object Class Term | Representation/ Association | Type | Type Name | Len. | Remarks |
|---|---|---|---|---|---|---|---|
| Account-Determination-House Bank-GroupCode | Account Determination | House Bank Group | Code | CDT | Code | 1..4 | restricted |

For GDT, a customer-specific code list can be assigned to the code. A listID can be "10316."

A listAgencyID can be the ID of the customer (e.g., ID from DE 3055, if listed there). A listVersionID can be the version of the particular code list (e.g., assigned and managed by the customer). A listAgencySchemeID can be the ID of the scheme if the listAgencyID does not come from DE 3055. The listAgencySchemeAgencyID can be the ID of the organization from DE 3055 that manages the listAgencySchemeID scheme.

The GDT AccountDeterminationHouseBankGroupCode can be used in the business object models and in A2A messages. The data type GDT AccountDeterminationHouseBankGroupCode may use the following codes: domestic house banks, foreign house banks.

AccountDeterminationIncomeGroupCode

A GDT AccountDeterminationIncomeGroupCode is the coded representation of a group of revenues from the perspective of an identical or similar determination of an account in accounting. For the purposes of proper financial reporting, the value-based representation of business transactions in accounting can use different accounts. An example of GDT AccountDeterminationIncomeGroupCode is:

<AccountDeterminationIncomeGroupCode>10</AccountDeterminationIncomeGroupCode>

In certain implementations, GDT AccountDeterminationIncomeGroupCode may have the following structure:

| GDT | Object Class Term Qualifier | Object Class Term | Representation/ Association | Type | Type Name | Len. | Remarks |
|---|---|---|---|---|---|---|---|
| Account-Determina-tionIncome GroupCode | Account Determination | Income Group | Code | CDT | Code | 1..4 | restricted |

For GDT AccountDeterminationIncomeGroupCode, a customer-specific code list can be assigned to the code. A listID can be "10400." A listAgencyID can be the ID of the customer (e.g., ID from DE 3055, if listed there). A listVersionID can be the version of the particular code list (e.g., assigned and managed by the customer). A listAgencySchemeID can be the ID of the scheme if the listAgencyID does not come from DE 3055. The listAgencySchemeAgencyID can be the ID of the organization from DE 3055 that manages the listAgencySchemeID scheme.

The GDT AccountDeterminationIncomeGroupCode can be used in the business object models and in A2A messages. The data type GDT AccountDeterminationIncomeGroupCode may use the following codes: revenue from employee sales, revenue from sale of old PCs.

AccountDeterminationMaterialValuationDataGroupCode

A GDT AccountDeterminationMaterialValuationDataGroupCode is the coded representation of a group of material valuation data based on the viewpoint of identical determination of accounts in accounting. For the purposes of proper financial reporting, the value-based representation of business transactions in accounting may use different accounts. Material valuation data is data that references a material or material group for valuating business transactions, for cost estimates, and for value-based management of material inventories. An example of GDT AccountDeterminationMaterialValuationDataGroupCode is:

<AccountDeterminationMaterialValuationDataGroupCode>1<AccountDeterminationMaterialValuationDataGroupCode>

In certain implementations, GDT AccountDeterminationMaterialValuationDataGroupCode may have the following structure:

| GDT | Object Class Term Qualifier | Object Class | Representation/ Association | Type | Type Name | Len. | Remarks |
|---|---|---|---|---|---|---|---|
| Account-Determina-tionMaterial-ValuationData GroupCode | Account Determination | Material Valuation Data Group | Code | CDT | Code | 1..10 | Restricted |

-

For GDT AccountDeterminationMaterialValuationDataGroupCode, a customer-specific code list can be assigned to the code. The attributes of the code are not required because constant values would be assigned to them in a customer system at runtime. A listID can be "10482."

A listAgencyID can be the ID of the user of the code (e.g., ID from DE 3055, if listed there). A listVersionID can be assigned and managed by the customer. A listAgencySchemeID can be the ID of the scheme if the listAgencyID does not come from DE 3055. The listAgencySchemeAgencyID can be the ID of the organization from DE 3055 that manages the listAgencySchemeID scheme.

The GDT AccountDeterminationMaterialValuationDataGroupCode can be used in business object models. The data type GDT AccountDeterminationMaterialValuationDataGroupCode may use the following codes: raw materials (i.e., unprocessed material), finished products (i.e., products that are available for sale).

AccountDeterminationOverheadCostAssessmentRuleGroupCode

A GDT AccountDeterminationOverheadCostAssessmentRuleGroupCode is the coded representation of a group of overhead cost assessment rules from the viewpoint of identical determination of accounts in accounting. For the purposes of proper financial reporting, the value-based representation of business transactions in accounting may use different accounts. An overhead cost assessment rule is a rule for the assessment of costs in income statement accounts in Accounting. The rule can determine the amount to allocate, the receivers, and the base for distribution to the individual receivers. An example of GDT AccountDeterminationOverheadCostAssessmentRuleGroupCode is:

<AccountDeterminationOverheadCostAssessmentRuleGroupCode>1</AccountDeterminationOverheadCostAssessmentRuleGroupCode>

In certain implementations, GDT AccountDeterminationOverheadCostAssessmentRuleGroupCode may have the following structure:

| GDT | Object Class | Representation/ Association | Type | Type Name | Len. | Remarks |
|---|---|---|---|---|---|---|
| AccountDetermination-OverheadCost-AssessmentRule GroupCode | Account Determination Overhead Cost Assessment Rule Group | Code | CDT | Code | 1..4 | restricted |

For GDT AccountDeterminationOverheadCostAssessmentRuleGroupCode, a customer-specific code list can be assigned to the code.

The GDT AccountDeterminationOverheadCostAssessmentRuleGroupCode can be used in the business object models and in A2A messages.

The data type GDT AccountDeterminationOverheadCostAssessmentRuleGroupCode may use the following codes: canteen assessment, IT assessment.

AccountDeterminationOverheadCostSchemeLineGroupCode

A GDT AccountDeterminationOverheadCostSchemeLineGroupCode is the coded representation of a group of lines in an overhead cost scheme from the viewpoint of identical determination of accounts in accounting. For the purposes of proper financial reporting, the value-based representation of business transactions in accounting may use different accounts. An overhead cost scheme can be a scheme for calculating overhead rates. It contains a description line that can define the method for calculating the rate, rate rules that can determine the amount of overhead to be allocated, and offsetting rules that can define the object to be credited. An example of GDT AccountDeterminationOverheadCostSchemeLineGroupCode is:

<AccountDeterminationOverheadCostSchemeLineGroupCode>1</AccountDeterminationOverheadCostSchemeLineGroupCode>

In certain implementations, GDT AccountDeterminationOverheadCostSchemeLineGroupCode may have the following structure:

| GDT | Object Class | Representation/ Association | Type | Type Name | Len. | Remarks |
|---|---|---|---|---|---|---|
| AccountDeterminationOverheadCostSchemeLine-GroupCode | Account Determination Overhead Cost Scheme Line Group | Code | CDT | Code | 1..4 | restricted |

For GDT AccountDeterminationOverheadCostSchemeLineGroupCode, a customer-specific code list can be assigned to the code. A listID can be "10427."

The data type GDT AccountDeterminationOverheadCostSchemeLineGroupCode may use the following codes: energy overhead, material overhead.

AccountDeterminationPriceSpecificationElementPurposeGroupCode

A GDT AccountDeterminationPriceSpecificationElementPurposeGroupCode is the coded representation of a group of PriceSpecificationElementPurposes from the viewpoint of an identical or similar derivation of an account in GeneralLedger Accounting. A PriceSpecificationElementPurpose can specify the purpose of a PriceSpecificationElement. A PriceSpecificationElement can also specify a price, a discount, a surcharge, or a tax. An example of GDT AccountDeterminationPriceSpecificationElementPurposeGroupCode is:

<AccountDeterminationPriceSpecificationElementPurposeGroupCode>1</AccountDeterminationPriceSpecificationElementPurposeGroupCode>

In certain implementations, GDT AccountDeterminationPriceSpecificationElementPurposeGroupCode may have the following structure:

| GDT | Object Class | Representation/ Association | Type | Type Name | Len. | Remarks |
|---|---|---|---|---|---|---|
| Account-Determination-PriceSpecificationElement-PurposeGroupCode | Account Determination Price Specification Element Purpose Group | Code | CDT | Code | 1..4 | restricted |

For GDT AccountDetermination-PriceSpecificationElementPurposeGroupCode, a user-specific code list can be assigned to the code. A user of the code can determine the codes in the code list during configuration. A listID can be "10468." A listAgencyID can be the ID of the user of the code (e.g., ID from DE 3055, if listed there). A listVersionID can be assigned and managed by the user of the code. A listAgencySchemeID can be the ID of the scheme if the listAgencyID does not come from DE 3055. The listAgencySchemeAgencyID can be the ID of the organization from DE 3055 that manages the listAgencySchemeID scheme.

The GDT AccountDetermination-PriceSpecificationElementPurposeGroupCode can be used in the business object models and in A2A messages. The data type GDT AccountDetermination-PriceSpecificationElementPurposeGroupCode may use the following codes: revenues, customer discounts, freight revenue.

AccountDeterminationResourceGroupCode

A GDT AccountDeterminationResourceGroupCode is the coded representation of a group of resources from the viewpoint of identical determination of accounts in accounting. For the purposes of proper financial reporting, the value-based representation of business trans-actions in accounting may use different general ledger accounts. An example of GDT AccountDeterminationResourceGroupCode is:

<AccountDeterminationResourceGroupCode>1<AccountDeterminationResourceGroupCode>

In certain implementations, GDT AccountDeterminationResourceGroupCode may have the following structure:

| GDT | Object Class | Representation/ Association | Type | Type Name | Len. | Remarks |
|---|---|---|---|---|---|---|
| Account-Determination-ResourceGroupCode | Account Determination Resource Group | Code | CDT | Code | 1..4 | restricted |

For GDT AccountDeterminationResourceGroupCode a customer-specific code list can be assigned to the code.

The GDT AccountDeterminationResourceGroupCode can be used in the business object models and in A2A messages. The data type GDT AccountDeterminationResourceGroupCode may use the following codes: Machines, Workers, Consultants, Equipment.

AccountDeterminationServiceProductGroupCode

A GDT AccountDeterminationServiceProductGroupCode is the coded representation of a group of service products from the viewpoint of identical determination of accounts in accounting. For the purposes of proper financial reporting, the value-based representation of business transactions in accounting may use different accounts. An example of GDT AccountDeterminationServiceProductGroupCode is:

<AccountDeterminationServiceProductGroupCode>1<AccountDeterminationServiceProductGroupCode>

In certain implementations, GDT AccountDeterminationServiceProductGroupCode may have the following structure:

| GDT | Object Class Term Qualifier | Object Class Term | Representation/ Association | Type | Type Name | Len. | Remarks |
|---|---|---|---|---|---|---|---|
| Account-Determina-tionService-ProductGroup-Code | Account Determination | Service Product Group | Code | CDT | Code | 1..4 | restricted |

For GDT AccountDeterminationServiceProductGroupCode a customer-specific code list can be assigned to the code.

The GDT AccountDeterminationService-ProductGroupCode can be used in the business object models and in A2A messages. The data type GDT AccountDeterminationServiceProductGroupCode may use the following codes: sales services, purchasing services.

AccountingBusinessTransactionTypeCode

A GDT AccountingBusinessTransactionTypeCode is the coded representation of the type of business transaction from the accounting view. A business transaction can be a self-contained, logically coherent business event that results in a change in quantity or value. An example of GDT AccountingBusinessTransactionTypeCode is:

<AccountingBusinessTransactionTypeCode>104</AccountingBusinessTransactionTypeCode>

In certain implementations, GDT AccountingBusinessTransactionTypeCode may have the following structure:

| GDT | Object Class | Property | Representation/ Association | Type | Type Name | Len. | Remarks |
|---|---|---|---|---|---|---|---|
| Accounting-Business-Transaction-TypeCode | Accounting Business Transaction | Type | Code | CDT | Code | 1..4 | restricted |

The data type GDT AccountingBusinessTransactionTypeCode may assign a code list to the code. The attributes may be assigned the following values: listID="10007" and listAgencyID="310."

The GDT AccountingBusinessTransactionTypeCode can be used to categorize all business transactions that are relevant for accounting and can be used in accounting for account determination or to valuate business transactions correctly, for example. Each process component describes its processes using the GDT BusinessProcessVariantTypeCode (described below). This GDT can be transferred in messages to the process component accounting, where it can then be used possibly in combination with other information to determine the GDT AccountingBusinessTransactionTypeCode. For example, goods receipt for an order in the warehouse (in the process component SiteLogisticsProcessing) as well as the manually entered confirmation of goods receipt of consumable materials (in the process component GoodsAndServiceAcknowledgement) are both business transactions with the type "Goods Receipt from Vendor" from the accounting view.

Business transactions can generate or can change business transaction documents. The GDT AccountingBusinessTransactionTypeCode and the GDT BusinessTransactionDocumentTypeCode (described below) are therefore closely related. Since complex business transactions (e.g., such as the confirmation of a production order) can generate or can change more than one business transaction document, in certain implementations, it is not possible to create a simple (e.g., 1:1 or 1:n) relationship between the code lists of these data types.

In certain implementations, the GDT AccountingBusinessTransactionTypeCode can replace GDT BusinessTransactionTypeCode (described below) in accounting. The data type GDT AccountingBusinessTransactionTypeCode may use the following codes: 101 (i.e., Incoming Bank Transfer), 102 (i.e., Incoming Direct Debit), 103 (i.e., Incoming Check Payment), 104 (i.e., Incoming Cash Payment), 105 (i.e., Incoming BoE Payment), 106 (i.e., Incoming Payment Request), 107 (i.e., Incoming Payment Advice), 108 (i.e., Incoming Credit Card Payment), 109 (i.e., Incoming Lockbox Payment), 141 (i.e., Outgoing Bank Transfer), 142 (i.e., Outgoing Direct Debit), 143 (i.e., Outgoing Check Payment), 144 (i.e., Outgoing Cash Payment), 145 (i.e., Outgoing BoE Payment), 146 (i.e., Outgoing Payment Request), 147 (i.e., Outgoing Payment Advice), 148 (i.e., Credit Card Settlement), 181 (i.e., Check Deposit), 182 (i.e., BoE Submission), 183 (i.e., Cash Transfer), 184 (i.e., Bank Account Statement), 201 (i.e., Incoming Invoice), 212 (i.e., Outgoing Invoice), 301 (i.e., Goods Receipt from Vendor), 302 (i.e., Goods Receipt from Customer), 303 (i.e., Goods Receipt from Production), 304 (i.e., Goods Receipt w/o Reference (Sender)), 341 (i.e., Goods Issue for Customer), 342 (i.e., Goods Issue for Transfer), 343 (i.e., Goods Issues for Vendor), 344 (i.e., Goods Issue for Production), 345 (i.e., Goods Issue for Consumption), 346 (i.e., Goods Issue w/o Reference), 381 (i.e., Goods Transfer), 401 (i.e., Service Receipt from Vendor), 402 (i.e., Service Confirmation for Sales), 403 (i.e., Internal Service Confirmation), 501 (i.e., Maintain Purchase Order), 502 (i.e., Maintain Production Lot), 503 (i.e., Maintain Sales Order), 504 (i.e., Maintain Customer Return), 505 (i.e., Maintain Service Order), 506 (i.e., Maintain Service Contract), 507 (i.e., Maintain Service Confirmation), 508 (i.e., Maintain Service Request), and 509 (i.e., Maintain Project).

AccountingClosingStepCode

A GDT AccountingClosingStepCode is the coded representation of a step in an accounting closing. Closing in accounting can describe a consolidated status on the key date in the books in accounting. Closing can be divided into steps that are processed in a logical order from the business view. An example of GDT AccountingClosingStepCode is:

<AccountingClosingStepCode>10</AccountingClosingStepCode>

In certain implementations, GDT AccountingClosingStepCode may have the following structure:

| GDT | Object Class | Representation/ Association | Type | Type Name | Len. | Remarks |
|---|---|---|---|---|---|---|
| AccountingClosingStepCode | Accounting Closing Step | Code | CDT | Code | 1..3 | Restricted |

For GDT AccountingClosingStepCode, a customer-specific code list can be assigned to the code. A listID can be "10109."

In certain implementations, the GDT AccountingClosingStepCode is not used in A2A or B2B messages. The definition of a step in closing can be meant by GDT AccountingClosingStepCode and not an instance, that is, not a concrete posting in a concrete closing.

The data type GDT AccountingClosingStepCode may use the following codes: posting of a depreciation posting run as a closing process of the period/quarter/fiscal year, posting of a material price valuation as a closing process of the period/quarter/fiscal year, posting of a regrouping of receivables and payables as a closing process of the period/quarter/fiscal year, posting of an assessment as a closing process of the period/quarter/fiscal year, manual correction by the head of accounting at the end of the period (e.g., manual accrual).

An initial GDT AccountingClosingStepCode represents a business transaction that takes place outside Accounting (e.g., invoice issue or receipt, goods issue or receipt).

AccountingCodingBlock

A GDT AccountingCodingBlock is a set of accounting objects of different types. An accounting object can be a business object to which value changes from business transactions are assigned in Accounting. An example of GDT AccountingCodingBlock is:

<AccountingCodingBlock><CostCentreID schemeID="CostCentreID"schemeAgencyID="FIN_001">CC1000</CostCentreID></Accounting CodingBlock>

In certain implementations, GDT AccountingCodingBlock may have the following structure:

| GDT | | Cat. | Object Class | Property | Representation/ Association | Type | Type Name | Card. |
|---|---|---|---|---|---|---|---|---|
| Accounting-Coding-Block | | | Accounting Coding Block | | Details | | | |
| | General-Ledger Account-AliasCode | E | Accounting Coding Block | General Ledger Account Alias | Code | GDT | General-Ledger Account-Alias-Code | 0..1 |
| | Profit-CentreID | E | Accounting Coding Block | Profit Centre Identifica-tion | Identifier | GDT | ProfitCen-treID | 0..1 |
| | CostCen-treID | E | Accounting Coding Block | Cost Cen-tre Identi-fication | Identifier | GDT | CostCen-treID | 0..1 |
| | Product-InternalID | E | Accounting Coding Block | Product Internal Identifica-tion | Identifier | GDT | Product-InternalID | 0..1 |
| | SalesOr-derRefer-ence | E | Accounting Coding Block | | Sales Order Reference | GDT | Business-Transac-tion Document-Reference | 0..1 |
| | Project-Reference | E | Accounting Coding Block | | Project Reference | GDT | Project-Reference | 0..1 |
| | ServiceRe-questRefe-rence | E | Accounting Coding Block | | Service Request Reference | GDT | Business-Transac-tion Document-Reference | 0..1 |
| | Service-Contract-Reference | E | Accounting Coding Block | | Service Contract Reference | GDT | Business-Transac-tion Document Reference | 0..1 |
| | Service-Order-Reference | E | Accounting Coding Block | | Service Order Reference | GDT | Business-Transac-tion Document Reference | 0..1 |
| | Service-Confirmation-Reference | E | Accounting Coding Block | | Service Confirmation Reference | GDT | Business-Transac-tion Document Reference | 0..1 |

The GDT AccountingCodingBlock can be used to identify the following types of accounting objects: GeneralLedgerAccountAliasCode (e.g., Alias for a G/L account reference to a G/L account in a chart of accounts), ProfitCentreID (e.g., Identifier of a profit center), CostCentreID (e.g., Identifier of a cost center), ProductInternalID (e.g., Proprietary identifier for a product (material or service)), SalesOrderReference (e.g., Reference to a sales order, or to an item in a sales order), ProjectReference (e.g., Reference to a project), ServiceRequestReference (e.g., Reference to a request for a service), ServiceContractReference (e.g., Reference to a service contract), ServiceOrderReference (e.g., Reference to a service order), ServiceConfirmationReference (e.g., Reference to a confirmation of a service). In certain implementations, the elements are optional.

The GDT AccountingCodingBlock can be used to perform account assignments, that is, to assign an amount or a quantity to a set of accounting objects. In this way, the amount or quantity can be assigned to all accounting objects of the AccountingCodingBlock in accordance with accounting rules. For example, expenses from the purchase of office supplies, once the incoming invoice for this material has been checked, can be transferred to Accounting and then assigned there to cost center CC1000 and profit center PC3050.

The GDT AccountingCodingBlock can replace the GDT AccountingObjectSet (described below). The name change is due to its use in the Dependent Business Object AccountingCodingBlockDistribution. Where required, references to other accounting objects can be included. To assign or distribute (e.g., using percentage shares) an amount or a quantity to multiple accounting objects, the GDT AccountingCodingBlockAssignment can be used.

AccountingCodingBlockAssignment

A GDT AccountingCodingBlockAssignment is the assignment of something to a coding block. Items that are assigned to a coding block can be an amount that is known from the context, a quantity, or a company resource such as office space or working time. A coding block can be a set of account assignment objects of different types. An account assignment object can be a business object to which value changes from business transactions are assigned in Accounting. An example of GDT AccountingCodingBlockAssignment is:

<InvoiceItem> <NetAmount (currencyCode="EUR">100</NetAmount> <AccountingCodingBlockAssignment><Percent>40</Percent> <AccountingCodingBlock> <CostCentreID>CC1000</CostCentreID> </AccountingCodingBlock> </AccountingCodingBlockAssignment> <AccountingCodingBlockAssignment> <Percent> </Percent> <AccountingCodingBlock> <CostCentreID>CC2000</CostCentreID> </AccountingCodingBlock> </AccountingCodingBlockAssignment> </InvoiceItem>

In certain implementations, GDT AccountingCodingBlockAssignment may have the following structure:

| GDT | | Cat. | Object Class | Property | Representation/ Association | Type | Type Name | Card. |
|---|---|---|---|---|---|---|---|---|
| AccountingCodingBlock Assignment | | | Accounting Coding Block Assignment | | Details | | | |
| | Percent | E | Accounting Coding Block Assignment | Percent | Percent | CDT | Percent | 0..1 |
| | Amount | E | Accounting Coding Block Assignment | Amount | Amount | CDT | Amount | 0..1 |
| | Quantity | E | Accounting Coding Block Assignment | Quantity | Quantity | CDT | Quantity | 0..1 |
| | AccountingCodingBlock | E | Accounting CodingBlock Assignment | Accounting-CodingBlock | Details | GDT | AccountingCodingBlock | 1 |

For the GDT AccountingCodingBlockAssignment structure described above, Percent is a Percentage share of "something" that is known from the context and that is assigned to an AccountingCodingBlock. Amount is an amount that is assigned to an AccountingCodingBlock. Quantity is a quantity that is assigned to an AccountingCodingBlock. AccountingCodingBlock is a set of account assignment objects to which something is assigned.

A percentage, an amount, or a quantity may be specified. In certain implementations, a combination is not possible. More than one GDT AccountingCodingBlockAssignment can be used to assign parts of a total amount known from the context (e.g., parts of a total quantity to different GDT AccountingCodingBlocks), the following conditions can apply: the sum of all percentage values may equal 100 percent, the sum of all amount values may equal the total amount, the sum of all quantity values may equal the total quantity.

The GDT AccountingCodingBlockAssignment can be used for multiple account assignments (e.g., assigning something to multiple AccountingCodingBlocks). Distribution can occur using percentage shares or value-based or quantity-based portions. For example, expenses from the purchase of office supplies (e.g., 100 EUR for 10 boxes of copier paper at 10 EUR each) can be transferred to Accounting once the incoming invoice for this material has been checked and then assigned there (e.g., using the AccountingCodingBlockAssignment twice) as follows: percentage distribution (e.g., 40% to cost center CC1000 and profit center PC3050 and 60% to sales order 100002345), amount-based distribution (e.g., 40 EUR to cost center CC1000 and profit center PC3050 and 60 EUR to sales order 100002345), and quantity-based distribution (e.g., 4 boxes to cost center CC1000 and profit center PC3050 and 6 boxes to sales order 100002345).

The GDT AccountingCodingBlockAssignment can replace the GDT AccountingObjectSetAssignment (described below). The name change is due to its use in the Dependent Business Object AccountingCodingBlockDistribution.

AccountingCodingBlockTypeCode

A GDT AccountingCodingBlockTypeCode is the coded representation of the type of a coding block. The type of a coding block can determine which object(s) of a coding block need to be specified, may optionally be specified, or may not be specified. A coding block is a set of account assignment objects of different types. An account assignment object is a business object to which value changes from business transactions are assigned in Accounting. An example of GDT AccountingCodingBlockTypeCode is:

<AccountingCodingBlockTypeCode>ANLG</AccountingCodingBlockTypeCode>

In certain implementations, GDT AccountingCodingBlockTypeCode may have the following structure:

| GDT | | Cat. | Object Class | Property | Representation/ Association | Type | Type Name | Len. | Card. | Remarks |
|---|---|---|---|---|---|---|---|---|---|---|
| Accounting-CodingBlock Type Code | | | | Accounting_CodingBlock-Type | Code | CDT | Code | 1..4 | | Restricted |
| | listID | A | Code List | Identification | Identifier | xsd | token | | 0..1 | |

-continued

| GDT | | Cat. | Object Class | Property | Representation/ Association | Type | Type Name | Len. | Card. | Remarks |
|---|---|---|---|---|---|---|---|---|---|---|
| | listAgencyID | A | Code List Agency | Identification | Identifier | xsd | token | | 0..1 | |
| | listVersionID | A | Code List | Version | Identifier | xsd | token | | 0..1 | |
| | listAgency SchemeID | A | Code List Agency | Scheme | Identifier | xsd | token | | 0..1 | |
| | listAgency SchemeAgencyID | A | Code List Agency | Scheme Agency | Identifier | xsd | token | | 0..1 | |

For GDT AccountingCodingBlockTypeCode, a customer-specific code list can be assigned to the code. A listID can be "10426." A listAgencyID can be the ID of the customer (e.g., ID from DE 3055, if listed there). A listVersionID can be the version of the particular code list (e.g., assigned and managed by the customer). A listAgencySchemeID can be the ID of the scheme if the listAgencyID does not come from DE 3055. The listAgencySchemeAgencyID can be the ID of the organization from DE 3055 that manages the listAgencySchemeID scheme.

The GDT AccountingCodingBlockTypeCode may be used in business objects or A2A messages. A code describes which objects of the account assignment which may be specified. Which objects of a coding block need to be specified for a given type and which can optionally be specified is determined in the business configuration. This information can be used to guide the user in the UI as well as for consistency checks. Example: The customer-specific code ANLG means the account assignment of a material to asset. Consequently, the account assignment object "Asset" can be specified. Furthermore, the material can be assigned to a task from a project. Consequently, the task may be specified.

AccountingDocumentTypeCode

A GDT AccountingDocumentTypeCode is the coded representation of the type of accounting document. The type of accounting document is based on customer-defined criteria. A unique GDT AccountingDocumentTypeCode can be assigned to each AccountingDocument. An accounting document is the representation of changes to values resulting from a business transaction and relating to a company and a set of books. An example of GDT AccountingDocumentTypeCode is:

<AccountingDocumentTypeCode>1</AccountingDocumentTypeCode>

In certain implementations, GDT AccountingDocumentTypeCode may have the following structure:

| GDT | Object Class | Property | Representation/ Association | Type | Type Name | Len. | Remarks |
|---|---|---|---|---|---|---|---|
| Accounting-Document-TypeCode | Accounting Document | Type | Code | CDT | Code | 1..5 | restricted |

For GDT AccountingDocumentTypeCode, a customer-defined code list can be assigned to the code. The GDT AccountingDocumentTypeCode may be used in business objects and A2A messages.

For business transactions that are entered in the operational system and transferred to Accounting, the GDT AccountingDocumentTypeCode can be derived from the BusinessTransactionTypeCode. For a more refined derivation, other characteristics for the business transaction can be included in the derivation. For business transactions that are entered in Accounting, the GDT AccountingDocumentTypeCode is entered.

The data type GDT AccountingDocumentTypeCode may use the following codes: customer invoice (i.e., accounting document that represents an outgoing invoice), vendor invoice (i.e., accounting document that represents an incoming invoice), goods movement (i.e., accounting document that represents a movement of goods), depreciation of fixed assets (i.e., accounting document that represents the depreciation of a fixed asset).

There is an n:m relationship between GDT AccountingDocumentTypeCodes and GDT BusinessTransactionTypeCode. Some business transaction types may have a very similar meaning (e.g., in Inventory Accounting), in which case it can be useful to summarize them as AccountingDocumentTypeCodes. On the other hand, there are business transaction types that are of a more general nature (e.g., a basic G/L account posting). For such business transaction types, it can be useful from the customer perspective to differentiate further using AccountingDocumentTypeCodes.

AccountingPeriodID

A GDT AccountingPeriodID is a unique identifier for an accounting period in a fiscal year. An accounting period is a subdivision of a fiscal year for which the operating results can determine and financial statements can be prepared. An example of GDT AccountingPeriodID is:

<AccountingPeriodID>12</AccountingPeriodID>

In certain implementations, GDT AccountingPeriodID may have the following structure:

| GDT | Object Class | Property | Representation/ Association | Type | Type Name | Len. | Remarks |
|---|---|---|---|---|---|---|---|
| Account-ingPeriodID | Account-ingPeriod | Identification | Identifier | CDT | Identifier | 1..3 | Restricted |

The data type GDT AccountingPeriodID can be represented by a 3 digit positive number, by a restriction of CDT Identifier.

AccountsPayableDueItemTypeCode

A GDT AccountsPayableDueItemTypeCode is the coded representation of the type of due item of an accounts payable. An example of GDT AccountsPayableDueItemTypeCode is:

<AccountsPayableDueItemTypeCode>PAYMT</AccountsPayableDueItemTypeCode>

In certain implementations, GDT AccountsPayableDueItemTypeCode may have the following structure:

| GDT | Object Class | Property | Representation/ Association | Type | Type Name | Len. | Remarks |
|---|---|---|---|---|---|---|---|
| AccountsPayable-DueItemTypeCode | Accounts Payable Due Item | Type | Code | CDT | Code | 1..5 | restricted |

For GDT AccountsPayableDueItemTypeCode a customer-specific code list can be assigned to the code. The attributes can be omitted in the structure table, because they may contain constant, customer specific values during runtime. A listID can be "10384."

The GDT AccountsPayableDueItemTypeCode can be used to distinguish between different types of trade payables. This makes it possible to have different views of the accounts payable due items in the system. The differentiation generated in this way can be used in Financial Accounting to display the accounts payable due items for specific G/L accounts. The legal requirements of the respective country determine for which AccountsPayableDueItemTypeCodes it is necessary to display the accounts payable due items for specific G/L accounts. This can then be specified in the configuration.

The data type GDT AccountsPayableDueItemTypeCode may use the following codes: Invoice accounts payable due item (i.e., An invoice accounts payable due item is a due item that results from an invoice), Down payment accounts payable due item (i.e., A down payment accounts payable due item is a due item that results from a down payment (i.e., payment made before the service is provided)), Security retention amount (i.e., A security retention amount is a due item resulting from an invoice of which a specific part cannot be paid to the payee and may be retained (i.e., due to legal regulations).

AccountsReceivableDueItemTypeCode

A GDT AccountsReceivableDueItemTypeCode is the coded representation of the type of due item of an accounts receivable. An example of GDT AccountsReceivableDueItemTypeCode is:

<AccountsReceivableDueItemTypeCode>PAYMT</AccountsReceivableDueItemTypeCode>

In certain implementations, GDT AccountsReceivableDueItemTypeCode may have the following structure:

| GDT | Object Class | Property | Representation/ Association | Type | Type Name | Len. | Remarks |
|---|---|---|---|---|---|---|---|
| Accounts-Receivable-DueItem-TypeCode | Accounts Receivable Due Item | Type | Code | CDT | Code | 1..5 | restricted |

For GDT AccountsReceivableDueItemTypeCode, a customer-specific code list can be assigned to the code. The attributes are omitted in the structure table, because they may contain constant, customer specific values during runtime. A listID can be "10385."

The GDT AccountsReceivableDueItemTypeCode can be used to distinguish between different types of trade receivables. This makes it possible to have different views of the accounts receivable due items in the system. The differentiation generated in this way can be used in Financial Accounting to display the accounts receivable due items for specific G/L accounts. The legal requirements of the respective country determine for which GDT AccountsReceivableDueItemTypeCodes it is necessary to display the accounts receivable due items for specific G/L accounts. This can then be specified in the configuration.

The data type GDT AccountsReceivableDueItemTypeCode may have the following codes: invoice accounts receivable due item (i.e., an invoice accounts receivable due item is a due item that results from an invoice), down payment accounts receivable due item (i.e., a down payment accounts receivable due item is a due item that results from a down payment (i.e., payment made before the service is provided).

AccrualMethodCode

A GDT AccrualMethodCode is the coded representation of a method for accruing expenses and revenues. Accrual refers to the method of assigning expenses and revenues to specific periods of time regardless of when they are realized in the profit and loss statement. This can prevent distortions in the operating profit for the period in which the expenses are paid or the revenues received. For this purpose, postings can be made to special accrual accounts in the balance sheet (such as Accrued Revenue, Unbilled Receivables, Accrued Costs, and Reserves for Unrealized Costs) in addition to the postings on the expense and revenue accounts. The accrual method can specify which procedure can be used for the different sets of books. An example of GDT AccrualMethodCode is:

<AccrualMethodCode>SERV001</AccrualMethodCode>

In certain implementations, GDT AccrualMethodCode may have the following structure:

| GDT | Object Class | Representation/ Association | Type | Type Name | Len. | Remarks |
|---|---|---|---|---|---|---|
| AccrualMethodCode | AccrualMethod | Code | CDT | Code | 1..10 | restricted |

For GDT AccrualMethodCode a customer-specific code list can be assigned to the code. A listID can be "10325." A listAgencyID can be the ID of the customer (e.g., ID from DE 3055, if listed there). A listVersionID can be the version of the particular code list (e.g., assigned and managed by the customer). A listAgencySchemeID can be the ID of the scheme if the listAgencyID does not come from DE 3055. The listAgencySchemeAgencyID can be the ID of the organization from DE 3055 that manages the listAgencySchemeID scheme.

The GDT AccrualMethodCode can be selected based on the configuration in the LDU Financial Accounting. In the case of processes in CRM Sales and CRM Service, selection can be based on the concepts of those applications. The accrual method can then be stored in the business object SalesLedgerAccount. Configuration settings can determine which rules are applied for the postings described under 1.29.5. The GDT AccrualMethodCode points to that configuration.

The data type GDT AccrualMethodCode may use the following codes: delivery-based revenue realization (i.e., revenue is realized when the product is issued from the warehouse), invoice-based revenue realization (i.e., revenue is realized when the invoice is sent to the customer), periodic revenue realization (i.e., revenue is realized periodically during the time interval specified in the contract), periodic expense accrual (i.e., the expenses resulting from an incoming invoice are accrued periodically over the entered time interval).

ActionCode

A GDT ActionCode is a coded representation of an instruction to the recipient of a message telling it how to process a transmitted element. An example of GDT ActionCode is:

<Item actionCode='04'> <ID>10</ID> <!-- . . . Further Elements . . . --> </Item>

In certain implementations, GDT ActionCode may have the following structure:

| GDT | Property | Representation/ Association | Type | Type Name | Len. | Remarks |
|---|---|---|---|---|---|---|
| ActionCode | Action | Code | CDT | Code | 2 | restricted |

The data type GDT ActionCode may assign a code list to the code. The attributes may be assigned the following values: listID="10001," listAgencyID="310," and listVersionID="tbd."

The code can have the meaning of code "01" (i.e., create). To ensure compatibility with regard to enhancements, code "04" (i.e., save) may be allowed because this code is the default code if no code is transferred. In certain implementations, a sender does not send this code. A recipient may handle this code as a code "06" (i.e., No Action). In certain implementations, no further codes should occur under a code "03" (i.e., Delete) or "05" (i.e., Remove) because, apart from the element ID, no further data should be transferred. A recipient may check the existence of an element using the rules described for the individual codes and generate an error if necessary. A recipient may check the validity of the codes in a hierarchy of elements according to the rules described and can generate an error if necessary. A recipient may ignore elements and ActionCodes transferred under a code "03" (i.e., Delete) or "05" (i.e., Remove) and behave as if these elements and ActionCodes had not been transferred. A syntax check can be allowed for these elements.

The actions requested at the recipient can have the names usual in the business context of a message, as long as this does not change the semantics of the ActionCodes defined above. For example, "Annul" or "Cancel" can be used instead of "Delete." An ActionCode can attribute of the element to which it refers. The ActionCodes "01" (i.e., Create), "02" (i.e., Change), "03" (i.e., Delete), and "06" (i.e., No Action) model strict semantics that lead to errors at the recipient if the elements corresponding to the actions requested by the sender exist "01" or do not exist "02," "03," "06") at the recipient. Using strict semantics, therefore, can require that the sender has and uses information about the messages it has already sent. The ActionCodes "04" (i.e., Save) and "05" (i.e., Remove) model soft semantics that do not lead to errors if the respective elements do not exist at the recipient. In certain implementations, these soft semantics do not require that the sender has and uses information about the messages it has already sent. An ActionCode that can not be filled in a message instance or does not exist in an interface is implicitly assumed to be "04" (i.e., Save). This is necessary to ensure compatibility when enhancing interfaces to include an ActionCode. In some messages, the action at the top level is represented in the name of the message type rather than by an ActionCode. These messages behave semantically as if the ActionCode were at the level of the transferred BusinessTransactionDocument (e.g., a message of the message type PurchaseOrderChangeRequest behaves semantically as if an ActionCode "02" (i.e., Change) were specified at the PurchaseOrder level). A GDT ActionCode can usually be used with a GDT CompleteTransmissionIndicator (described below) for the parent element. The GDT on Code, however, can also be used for an element whose parent element does not have a CompleteTransmissionIndicator. In this case, all the child elements of the parent element may be transferred. In certain implementations, it is not possible to transfer just the changed child elements.

The GDT ActionCode can be used for elements that remain uniquely identifiable across several messages in a business process or that can occur once in a message (e.g., cardinality 0..1 or 1). If an element cannot be clearly identified, it may be documented explicitly when the ActionCode is used. In certain implementations, the GDT ActionCodes "03" (i.e., Delete) and "05" (i.e., Remove) do not stipulate that the recipient delete the respective element physically. However, once the element has been deleted, the recipient application may handle further transmitted ActionCodes as if the element has been physically deleted. For example, in the case of the ActionCode "01" (i.e., Create), it may be possible to create a new element with the same identification as the deleted element. Any exceptions to this ActionCode behavior may be explicitly explained and documented in the corresponding description of the interface or message type.

The data type GDT ActionCode may use the following codes: 01 (i.e., create), 02 (i.e., change), 03 (i.e., delete), 04 (i.e., save), 05 (i.e., remove), 06 (i.e., no action).

ActivityGroupCode

A GDT ActivityGroupCode is a group of activities, grouped using subjective criteria. An activity can be used in Activity Management, to document interactions with external business partners. Activities may include receiving telephone calls, sending e-mails, and agreeing dates. An example of GDT ActivityGroupCode is:

<ActivityGroupCode listAgencyId="310">1</ActivityGroupCode>

In certain implementations, GDT ActivityGroupCode may have the following structure:

For GDT ActivityGroupCode, several code lists can be permitted for the ActivityGroupCode. Other code lists can be added by the customer. A listID can be "10044." If the code list is unchanged, a listAgencyID can be "310." Otherwise, a listAgencyID can be the ID of the customer (e.g., ID from DE 3055, if listed there). A listVersionID can be the version of the particular code list (e.g., assigned and managed by the customer). A listAgencySchemeID can be the ID of the scheme if the listAgencyID does not come from DE 3055. The listAgencySchemeAgencyID can be the ID of the organization from DE 3055 that manages the listAgencySchemeID scheme. The attributes are defined as follows: listID="10044, "listAgencyID="310," listVersionID=version of corresponding code list (e.g., assigned and managed by the customer).

The GDT ActivityGroupCode can primarily be used in reporting. In certain implementations, the GDT ActivityGroupCode is not used for coding communication channels. A number of business objects are available to this end. A Miscellaneous category can be defined in addition to the defined categories.

The data type GDT ActivityGroupCode may use the following code: key Customer (i.e., the ActivityGroupCode groups activities according to key customers). This code is based on the Category property of RFC2445. Data element (e.g., CRMT_ACT_CATEGORY), Type (e.g., CHAR 03), Software component (e.g., BBPCRM). Moreover, the data type GDT ActivityGroupCode may use the following codes: 1 (i.e., miscellaneous), 2 (i.e., customer care), 3 (i.e., new business).

ActivityInitiator Code

A GDT ActivityInitiator Code is the coded representation of the initiator of the activity. It can specify, if the activity was triggered internally or externally. An example of an activity could be accepting a phone call, or sending an e-mail. An example of GDT ActivityInitiatorCode is:

<ActivityInitiator Code listAgencyId="310">1</ActivityInitiator Code>

In certain implementations, GDT ActivityInitiator Code may have the following structure:

| GDT | | Cat. | Object Class | Property | Representation/ Association | Type | Type Name | Len. | Remarks |
|---|---|---|---|---|---|---|---|---|---|
| ActivityGroupCode | | | Activity | Group | Code | CDT | Code | 1..4 | |
| | listID | A | Code List | Identification | Identifier | xsd | token | | 0..1 |
| | listAgencyID | A | Code List Agency | Identification | Identifier | xsd | token | | 0..1 |
| | listVersionID | A | Code List | Version | Identifier | xsd | token | | 0..1 |
| | listAgencyScheme ID | A | Code List Agency | Scheme | Identifier | xsd | token | | 0..1 |
| | listAgencyScheme Agency ID | A | Code List Agency | Scheme Agency | Identifier | xsd | token | | 0..1 |

| GDT | Object Class | Property | Representation/ Association | Type | Type Name | Len. | Remarks |
|---|---|---|---|---|---|---|---|
| Activity-Initiator-Code | Activity | Initiator | Code | CDT | Code | 1 | restricted |

The GDT ActivityInitiator Code attributes may be assigned the following values: listID="10045" and listAgencyID="310." The GDT ActivityInitiator Code can be a fixed code list. In certain implementations, the attributes listID, listAgencyID, listVersionID, listAgencySchemeID, listAgencySchemeAgencyID are not included in the structure, as they are allocated constant values at runtime. This code list can be defined and delivered. In certain implementations, customers do not change this code list. The GDT can be used for defining business objects and electronic messages, (e.g., Groupware synchronization). If an external party cannot transfer an ActivityInitiator Code, the default code 1 can be used.

The GDT ActivityInitiator Code can particularly be used in reporting in order to group business objects in terms of whether an activity was initiated from within an enterprise, or by a customer, prospect, and so on.

The GDT ActivityInitiator can specify the direction from which an activity is triggered; in certain implementations, it does not specify the type of activity. The activity itself can be defined by the respective technical object or business object. Data element (e.g., CRMT_DIRECTION), Type (e.g., CHAR 01), Software component (e.g., BBPCRM). The data type GDT ActivityInitiator Code may use the following codes: 1 (i.e., not specified), 2 (i.e., external initiator), 3 (i.e., internal initiator).

Address

A GDT Address contains structured information about all types of addresses. This information can include details about addressees, the postal address, and the physical location and communication connections. Address comprises the following: OrganisationFormattedName, PersonName, FunctionalTitleName, DepartmentName, Office, PhysicalAddress, TaxJurisdictionCode, TimeZoneDifferenceValue, GeoCoordinates, and Communication. Within the global data type "Address," "OrganisationFormattedName" can contain the name of an organization (for example, a company or corporate body) as a part of the address. This might be the address of a business partner, for example. "PersonName" can contain the parts of a natural person's name. "FunctionalTitleName" can contain the function of a contact person and can be a part of the address of the contact person in the organization. "DepartmentName" can contain the department of a contact person and can be a part of the address of the contact person in the organization. "Office" can contain information that describes the working environment of a contact person as well as information for addressing or identifying this person within the organization. "PhysicalAddress" can contain the postal address data of a physical location. "TaxJurisdictionCode" is the tax jurisdiction code belonging to the address. This code can be used in various countries and can normally be derived uniquely from the address. However, in certain implementations, it is dependent on the code list of the provider. A country can have multiple code-list providers. "TimeZoneDifferenceValue" is the difference (e.g., in hours) between the local time zone of the location defined by "PhysicalAddress" and UTC (Coordinated Universal Time). "GeoCoordinates" can contain the geographic data (e.g., longitude and latitude) specified in accordance with the WGS84 reference system, with which a location on the globe can be determined. The UnitCode "DD" corresponds to the unit for the degree of an angle (i.e., UN/CEFACT Recommendation No. 20). "Communication" can contain information about communication paths with which a person or organization can be reached. An example of GDT Address is:

<Address> <OrganisationFormattedName>Systems, Applications and Products</OrganisationFormattedName> <OrganisationFormattedName>in Data Processing</OrganisationFormattedName> <PersonName> <Formatted Name>Mr. Paul John Tester</Formatted Name> <Legal Name>Paul John Tester</Legal Name> <Given Name></GivenName> <PreferredGivenName>Paul</PreferredGivenName> <MiddleName>John</MiddleName> <Family> <FamilyName>Tester</FamilyName> <PrimaryIndicator>true</PrimaryIndicator> <FamilyNamePrefix></FamilyNamePrefix> </Family> <Affix> <AffixName>Mr.</AffixName> <AffixCode>FormOfAddress</AffixCode> </Affix> </PersonName> <FunctionalTitleName>Sales Manager</FunctionalTitleName> <DepartmentName>Sales Department</DepartmentName> <Office> <BuildingID>WDF01</BuildingID> <FloorID>2</FloorID> <RoomID>G2.01</RoomID> <InhouseMailID>SCM IBD 2</InhouseMailID> <CorrespondenceShortName>TeP</CorrespondenceShortName> </Office> <PhysicalAddress> <CountryCode>MX</CountryCode> <RegionCode>DIF</RegionCode> <StreetPostalCode>01210</StreetPostalCode> <CityName>Mexico</CityName> <DistrictName>Santa Fé </DistrictName> <StreetName>Piso Col Pena Blanca</StreetName> <StreetPrefixName>Edificio Plaza Reforma Santy Fé</StreetPrefixName> <StreetPrefixName>Prologacion Paseo de la Reforma</StreetPrefixName> <HouseID>No 600-2°</HouseID> </PhysicalAddress> <TaxJurisdictionCode listID=,"" listVersionID=,"" listAgencyID=,"" listAgencySchemeID=,"" listAgencySchemeAgencyID=""">123456789101112</TaxJurisdictionCode> <TimeZoneDifferenceValue>+08:00</TimeZoneDifferenceValue> <GeoCoordinates> <LatitudeMeasure unitCode="DD">40.23232300000</LatitudeMeasure> <LongitudeMeasure unitCode="DD">123.12121200000</LongitudeMeasure> </GeoCoordinates> <Communication> <Telephone> <TelephoneNumber> <AreaID>6227</AreaID> <SubscriberID>7</SubscriberID> <ExtensionID>47474</ExtensionID> <CountryCode>DE</CountryCode> </TelephoneNumber> <TelephoneNumberDefaultIndicator>1 </TelephoneNumberDefaultIndicator> <Description></Description> <UsageDenialIndicator>0</UsageDenialIndicator> </Telephone> <MobilePhone> <MobilePhoneNumber> <AreaID>170</AreaID> <SubscriberID>1234567</SubscriberID> <ExtensionID></ExtensionID> <CountryCode>DE</CountryCode> </MobilePhoneNumber> <MobilePhoneNumberDefaultIndicator>1</MobilePhoneNumberDefaultIndicator> <Description></Description>

<UsageDenialIndicator>0</UsageDenialIndicator> </MobilePhone> <Facsimile> <FacsimileNumber> <AreaID>6227</AreaID> <SubscriberID>78</SubscriberID> <ExtensionID>99999</ExtensionID> <CountryCode>DE</CountryCode> </FacsimileNumber> <FacsimileNumberDefaultIndicator>1</FacsimileNumberDefaultIndicator> <Description>Secretary</Description> <UsageDenialIndicator>0</UsageDenialIndicator> </Facsimile> <EmailAddress>paul.tester@xyz.com</EmailAddress> <EmailAddressDefaultIndicator>1</EmailAddressDefaultIndicator> <Description></Description> <UsageDenialIndicator>0</UsageDenialIndicator> <Web> <WebAddress>http://www.xyz.com</WebAddress> <WebAddressDefaultIndicator>1</WebAddressDefaultIndicator> <Description>Official information<Description> </Web> </Communication> </Address>.

In certain implementations, GDT Address may have the following structure:

| GDT | | | Cat. | Object Class | Property | Represen-/tation/Association | Type | Type Name | Len. | Card. | Remarks |
|---|---|---|---|---|---|---|---|---|---|---|---|
| Address | | | | Address | | Details | | | | | |
| | Organisation-FormattedName | | E | Address | Organisation Formatted Name | Name | CDT | Text | 1..40 | 0..4 | restricted |
| | Person Name | | E | Address | Person Name | Details | GDT | Person Name | | 0..1 | |
| | Functional-TitleName | | E | Address | Functional Title Name | Name | CDT | Text | 1..40 | 0..1 | restricted |
| | Department-Name | | E | Address | Department Name | Name | CDT | Text | 1..40 | 0..1 | restricted |
| | Office | | E | Address | Office | Details | | | | 0..1 | |
| | | Building-ID | E | Office | Building Identification | Identifier | CDT | Identifier | 1..10 | 0..1 | restricted |
| | | FloorID | E | Office | Floor Identification | Identifier | CDT | Identifier | 1..10 | 0..1 | restricted |
| | | RoomID | E | Office | Room Identification | Identifier | CDT | Identifier | 1..10 | 0..1 | restricted |
| | | Inhouse-MailID | E | Office | Inhouse Mail Identification | Identifier | CDT | Identifier | 1..10 | 0..1 | restricted |
| | | Correspon-denceShort-Name | E | Office | Correspondence Short Name | Name | CDT | Text | 1..10 | 0..1 | restricted |
| | Physical-Address | | E | Address | Physical Address | Details | | | | 0..1 | |
| | | Country-Code | E | Physical Address | Country Code | Code | GDT | Country-Code | | 0..1 | |
| | | Region Code | E | Physical Address | Region Code | Code | GDT | Region Code | | 0..1 | |
| | | StreetPostal Code | E | Physical Address | Street Zip Code | Code | CDT | Code | 1..10 | 0..1 | restricted |
| | | POBox-PostalCode | E | Physical Address | POBox Zip Code | Code | CDT | Code | 1..10 | 0..1 | restricted |
| | | Company-Postal Code | E | Physical Address | Company Zip Code | Code | CDT | Code | 1..10 | 0..1 | restricted |
| | | CityName | E | Physical Address | City Name | Name | CDT | Text | 1..40 | 0..1 | restricted |
| | | Additional-CityName | E | Physical Address | Additional City Name | Name | CDT | Text | 1..40 | 0..1 | restricted |
| | | District-Name | E | Physical Address | District Name | Name | CDT | Text | 1..40 | 0..1 | restricted |
| | | POBoxID | E | Physical Address | PO Box Identification | Identifier | CDT | Identifier | 1..10 | 0..1 | restricted |
| | | POBox-Indicator | E | Physical Address | PO Box Indicator | Indicator | CDT | Indicator | | 0..1 | |
| | | POBox-Country-Code | E | Physical Address | PO Box Country Code | Code | GDT | Country-Code | | 0..1 | |
| | | POBox-Region-Code | E | Physical Address | PO Box Region Code | Code | GDT | Region Code | | 0..1 | |
| | | POBox-CityName | E | Physical Address | PO Box City Name | Name | CDT | Text | 1..40 | 0..1 | restricted |
| | | Street Name | E | Physical Address | Street Name | Name | CDT | Text | 1..60 | 0..1 | restricted |
| | | StreetPre-fixName | E | Physical Address | Street Prefix Name | Name | CDT | Text | 1..40 | 0..2 | restricted |
| | | StreetSuf-fixName | E | Physical Address | Street Suffix Name | Name | CDT | Text | 1..40 | 0..2 | restricted |
| | | HouseID | E | Physical Address | House Identification | Identifier | CDT | Identifier | 1..10 | 0..1 | restricted |
| | | Additional-HouseID | E | Physical Address | Additional House Identification | Identifier | CDT | Identifier | 1..10 | 0..1 | restricted |

-continued

| GDT | | | Cat. | Object Class | Property | Represen-/tation/As-sociation | Type | Type Name | Len. | Card. | Re-marks |
|---|---|---|---|---|---|---|---|---|---|---|---|
| | BuildingID | | E | Physical Address | Building Identification | Identifier | CDT | Identifier | 1..20 | 0..1 | re-stricted |
| | FloorID | | E | Physical Address | Floor Identification | Identifier | CDT | Identifier | 1..10 | 0..1 | re-stricted |
| | RoomID | | E | Physical Address | Room Identification | Identifier | CDT | Identifier | 1..10 | 0..1 | re-stricted |
| | CareOf-Name | | E | Physical Address | Care Of Name | Name | CDT | Text | 1..40 | 0..1 | re-stricted |
| | Description | | E | Physical Address | Description | Text | CDT | Descrip-tion | | 0..n | |
| TaxJurisdic-tionCode | | | E | Address | Tax Juris-diction Code | Code | GDT | TaxJuris-diction-Code | | 0..1 | |
| TimeZone-Difference-Value | | | E | Address | Time Zone Difference Value | Value | GDT | TimeZone-Differ-enceValue | | 0..1 | |
| GeoCoor-dinates | | | E | Address | GeoCoor-dinates | GeoCoor-dinates | GDT | GeoCoor-dinates | | 0..1 | |
| Commu-nication | | | E | Address | Communi-cation | Details | | | | 0..1 | |
| | Correspon-dence Language Code | | E | Commu-nication | Correspon-dence Language Code | Code | GDT | Language Code | | 0..1 | |
| | Telephone | | E | Commu-nication | Telephone | Details | | | | 0..n | |
| | | Number | E | Telephone | Phone Number | Details | GDT | Phone-Number | | 1 | |
| | | Number-Default-Indicator | E | Telephone | Number Default Indicator | Indicator | CDT | Indicator | | 1 | |
| | | Number Description | E | Telephone | Number Description | Text | CDT | Descrip-tion | | 0..n | |
| | | NumberUs-ageDenial-Indicator | E | Telephone | Number Usage Denial Indicator | Indicator | CDT | Indicator | | 1 | |
| | Mobile Phone | | E | Commu-ication | Mobile Phone | Details | | | | 0..n | |
| | | Number | E | Mobile phone | Phone Number | Details | GDT | Phone-Number | | 1 | |
| | | Number-Default-Indicator | E | Mobile phone | Number Default Indicator | Indicator | CDT | Indicator | | 1 | |
| | | Number-Description | E | Mobile phone | Number Description | Text | CDT | Descrip-tion | | 0..n | |
| | | NumberUs-ageDenial-Indicator | E | Mobile phone | Number Usage Denial Indicator | Indicator | CDT | Indicator | | 1 | |
| | Facsimile | | E | Commu-nication | Facsimile | Details | | | | 0..n | |
| | | Number | E | Facsimile | Phone Number | Details | GDT | Phone-Number | | 1 | |
| | | Number Default-Indicator | E | Facsimile | Number Default Indicator | Indicator | CDT | Indicator | | 1 | |
| | | Number Description | E | Facsimile | Number Description | Text | CDT | Descrip-tion | | 0..n | |
| | | NumberUs-ageDenial-Indicator | E | Facsimile | Number Usage Denial Indicator | Indicator | CDT | Indicator | | 1 | |
| | Email | | E | Commu-nication | Email | Details | | | | 0..n | |
| | | Address | E | Email | Email Address | Email Address | GDT | Email Address | | 1 | |
| | | Address-Default-Indicator | E | Email | Email Ad-dress Default-Indicator | Indicator | CDT | Indicator | | 1 | |
| | | Address-Description | E | Email | Email Ad-dress De-scription | Text | CDT | Descrip-tion | | 0..n | |
| | | Address-Usage-Denial-Indicator | E | Email | Email Ad-dress Usage Denial Indicator | Indicator | CDT | Indicator | | 1 | |

-continued

| GDT | | | Cat. | Object Class | Property | Represen-/tation/As-sociation | Type | Type Name | Len. | Card. | Re-marks |
|---|---|---|---|---|---|---|---|---|---|---|---|
| | Web | | E | Commu-nication | Web | Details | | | | 0..n | |
| | | Address | E | Web | Web Address | Address | GDT | WebAd-dress | | 1 | |
| | | Address-Default-Indicator | E | Web | Address Default Indicator | Indicator | CDT | Indicator | | 1 | |
| | | Address-Description | E | Web | Address Description | Text | CDT | Descrip-tion | | 0..n | |

For the GDT Address structure described above, "OrganisationFormattedName" can be the name of an organization that can be represented in four fields, each with a maximum of 40 characters. "FunctionalTitleName" can specify the functional title of a person (e.g., as a contact person in a company). This can often part of a formatted address in Anglo-Saxon countries. "DepartmentName" can contain the department as a part of the business address. It can describe the department from the perspective of the corresponding company or organization. "BuildingID" can be the number or ID of the building in the address of a contact person (Synonym: BuildingNumber). "FloorID" can refer to the floor of the building in the address of a contact person (Synonym: Floor Number). "RoomID" can specify the room number in the address of a contact person (Synonym: RoomNumber). "InhouseMailID" can specify the internal mail address. "CorrespondenceShortName" can be the short name of the contact person for use in all correspondence. This short name can be used both internally and externally. "CountryCode" can be the country code of the address in accordance with ISO 3166-1. "RegionCode" can be the code for the region of the country in the address. This specification may sometimes part of the address. "StreetPostalCode" can be the zip code in the street address. The rules for creating zip codes are country-specific. "CompanyPostalCode" can be the zip code of the company when the receiver is an organization with its own zip code. "POBoxPostalCode" can be the box zip code. "CityName" can be the name of the city in the address. "AdditionalCityName" can be the name of the city of residence if it differs from the city in the postal address. In certain implementations, AdditionalCityName has a different semantics (e.g., field HOME_CITY in the ADRC) and may therefore not be handled using cardinality. Analogous to AdditionalHouseID. "DistrictName" can be the name of the district. "POBoxID" can be the number of the post-office box (i.e., POBoxNumber). "POBoxIDIndicator" can specify whether the post-office box has a number that is unknown. "POBoxCountryCode" can be the country code for the post-office box in the address. "POBoxRegionCode" can be the code for the region of the country for the post-office box in the address. "POBoxCityName" can be the name of the city for the post-office box in the address. "StreetName" can be the name of the street in the address. "StreetPrefixName" can be an additional prefix in the address and precedes the street name in the previous line. "StreetSuffixName" can be an additional suffix in the address and comes after the street name in the subsequent line. "HouseID" can be the house number for the street in the address (i.e., HouseNumber). "AdditionalHouseID" can be an addition to the house number (e.g., apartment number). "BuildingID" can be the number or abbreviation for a building (e.g., WDF03) (synonym: BuildingNumber). "FloorID" can be the number of the floor in the building (synonym: Floor Number). "RoomID" can be the number of the room in the building (synonym: RoomNumber). "CareOfName" can be a different receiver when the receiver is not the same as the addressee. "Description" can be an addition to the address that refers to any special details. TaxJurisdictionCode can specify the tax jurisdiction code and has a maximum length of 15 characters. The meaning of the attributes listID, listVersionID, listAgencyID, listAgencySchemeID, and listAgencySchemeAgencyID is described in the definition of the CDT Code. For example, in the US there are many providers of software for calculating tax that manage TaxJurisdictionCodes. The name of one of these providers can be specified in the listAgencyID attribute. TimeZoneDifferenceValue can be the difference (in hours) between the local time zone of the location defined by "PhysicalAddress" and UTC (Coordinated Universal Time). LatitudeMeasure: Geographic latitude in degrees. The measurement unit degrees is specified by the attribute "unitCode" LongitudeMeasure: Geographic longitude in degrees. The measurement unit degrees is specified by the attribute "unitCode."

In certain implementations, the following convention is used: Southern latitudes are negative and northern latitudes are positive. Western longitudes are negative and eastern longitudes are positive. In certain implementations, positive values do not require a positive sign (e.g., "+") for a prefix. However, in some implementations, all negative values may have a negative sign (e.g., "−") for a prefix. The unitCode "DD" can correspond to the unit for the degree of an angle (i.e., UN/CEFACT Recommendation No. 20).

"CorrespondenceLanguageCode" can specify the language for written correspondence. "Telephone" can contain one telephone number in each instance. "TelephoneNumberDefaultIndicator" can indicate whether a telephone number is the default number for the address. In certain implementations, there is a default telephone number, provided the address contains a telephone number. The default value is "false." "Description" can be an addition to the telephone number that refers to special details or that contains other unstructured information. "TelephoneNumberUsageDenial" can indicate whether the telephone number may be used or not. If this indicator is set to "true," this means that, in accordance with the legal requirements of the respective country, the telephone number may not be used. There are exceptions, however. For example, return calls requested by the business partner or calls made for service purposes may still be permitted. Furthermore, it is advisable to save telephone numbers so that calls from business partners can still be identified, even if this indicator is set. The default is "false." "MobilePhone" can contain a mobile phone number in each instance. "MobilePhoneDefaultIndicator" can indicate whether a mobile phone number is the default mobile phone number for the address. In certain implementations, there is a default mobile phone number, provided the address contains a mobile phone number. "Description" can be an addition to the mobile phone number that refers to special details or that contains other unstructured information. "MobilePhoneNumberUsageDenial" can indicate whether the mobile phone number may be used or not. If this indicator is set to "true," this means that, in accordance with the legal requirements of the respective country, the mobile phone number may not be used. There are exceptions, however. For example, return calls requested by the business partner or calls made for service purposes may still be permitted. Furthermore, it is advisable to save mobile phone numbers so that calls from business partners can still be identified, even if the indicator is set. "Facsimile" can contain one fax number in each instance. "FacsimileDefaultIndicator" can indicate whether a fax number is the default number for the address. In certain implementations, there is a default fax number, provided the address contains a fax number. "FacsimileDescription" can be an addition to the fax number that refers to special details or that contains other unstructured information. "FacsimileNumberUsageDenial" can indicate whether the fax number may be used or not. If this indicator is set to "true," this means that, in accordance with the legal requirements of the respective country, the fax number may not be used. There are exceptions, however. For example, response faxes requested by the business partner or faxes sent for service purposes may still be permitted. Furthermore, it is advisable to save fax numbers so that faxes sent by business partners can still be identified, even if the indicator is set. "Email" can contain one email address in each instance. "EmailAddress" can specify the email address. "EmailAddressDefaultIndicator" can indicate whether an email address is the default e-mail address for this address. In certain implementations, there is an e-mail address, provided there are any e-mail addresses for this address. "Description" can be in addition to the e-mail address that refers to special details or that contains other unstructured information. "EmailAddressUsageDenial" can indicate whether the e-mail address may be used or not. If this indicator is set to "true," this means that, in accordance with the legal requirements of the respective country, the e-mail address may not be used. There are exceptions, for example, responses to e-mail enquiries may still be permitted. Furthermore, it is advisable to save e-mail addresses so that e-mails sent by business partners can still be identified, even if the indicator is set. "Web" can contain one Web address in each instance. "WebAddress" can specify the URI of a Web site. The length is due to the fact that technically generated URIs can easily reach this length. "WebAddressDefaultIndicator" can indicate whether a Web address is the default Web address for this address. In certain implementations, there is a default Web address, provided the address contains a Web address. "Description" can be an addition to the Web address that refers to special details or that contains other unstructured information.

If BuyerParty is an organization then PersonName may be empty. If BuyerParty is a natural person then OrganisationFormattedName may be empty.

AddressGroupCode

A GDT AddressGroupCode is the coded representation of an address group. An address group is formed based on business scenarios. An example of GDT AddressGroupCode is <AddressGroupCode listAgencyID='310'>BP</AddressGroupCode>

In certain implementations, GDT AddressGroupCode may have the following structure:

| GDT | | Cat. | Object Class | Property | Representation/ Association | Type | Type Name | Len. | Card. | Remarks |
|---|---|---|---|---|---|---|---|---|---|---|
| Address-Group Code | | | Address | Group | Code | CDT | Code | 1..4 | | Restricted |
| | listAgency-ID | A | Code List Agency | Identifi-cation | Identifier | xsd | token | | 0..1 | |
| | listVersion-ID | A | Code List | Version | Identifier | xsd | token | | 0..1 | |
| | listAgency-SchemeID | A | Code List Agency | Scheme | Identifier | xsd | token | | 0..1 | |
| | listAgency-Scheme-AgencyID | A | Code List Agency | Scheme Agency | Identifier | xsd | token | | 0..1 | |

An extendable code list is assigned to the GDT AddressGroupCode. Customers can change this code list. A listID can be "10179." If the code list is unchanged, a listAgencyID can be "310." Otherwise, a listAgencyID can be the ID of the customer (e.g., ID from DE 3055, if listed there). If the code list is unchanged, list version ID can be the version of the particular code list assigned and managed. Otherwise, a list version ID is the version of particular code list assigned and managed by the code user. A listAgencySchemeID can be the ID of the scheme if the listAgencyID does not come from DE 3055. The listAgencySchemeAgencyID can be the ID of the organization from DE 3055 that manages the listAgencySchemeID scheme.

For GDT AddressGroupCode the following dictionary objects can be assigned: data element (e.g., AD_GROUP) and domain (e.g., AD_GROUP).

The data type GDT AddressGroupCode may use the following codes: AB01 (i.e., address of a one-time customer in the agency business), BBP1 (i.e., manual document address (BBP)), BC01 (i.e., Company address for users), BEA1 (i.e., Manual addresses for billing engine), BP (i.e., Addresses of a business partner), CA01 (i.e., Customizing addresses), CA02 (i.e., Bank addresses), CADE (i.e., Address of a deleted Customizing object), CAM1 (i.e., Communication data without postal address), CMSR (i.e., Address of a property), CRM1 (i.e., Manual document addresses), DFP1 (i.e. Stationing address for structure elements), EHS1 (i.e., Address of an EHS report recipient), EHS2 (i.e., Address of an EHS data supplier), EHS3 (i.e., EHS medical address), EHS4 (i.e., Business partner address in waste management), FIIR (i.e., Company address of the contact persons in the inter-company agreement), HR01 (i.e., Employee address), HR02 (i.e., Address of a drug test), HRMY (i.e., Employee address), HRUS (i.e., Processor address), IB00 (i.e., Address of an iBase object), IB01 (i.e., Installed Base address), ME01 (i.e., Delivery address (master data)), ME02 (i.e., Delivery address (for each purchase order)), ME03 (i.e., Address of a one-time supplier), ME04 (i.e., Address for the scheduling agreement item in the APO), MKT1 (i.e., Manual addresses marketing planner), PA01 (i.e., Address of a pension fund), PA02 (i.e., Address of a government agency), PA03 (i.e., Address of a court of law), PA04 (i.e., Address of a pension insurance provider), PA05 (i.e., Address of an employer), PACH (i.e., Address of a settlement unit in Switzerland (HR)), PK01 (i.e., Closed-loop address (Logistics)), PLMD (i.e., Development projects: address of a person involved in a project), PM01 (i.e., Address of the maintenance object), PS02 (i.e., Project system, delivery address), PSL2 (i.e., Project system, different delivery address), RE01 (i.e., Object address (property)), SD01 (i.e., Manual address of an SD document), SDAK (i.e., Financial document address), SOD1 (i.e., Address of a direct communication partner in an office), SOEX (i.e., Address of an external communication partner in an office), WBHK (i.e., Address of a trading contract), WCB1 (i.e., Address of a GTM condition contract), WST1 (i.e., Address of a city in the transportation section).

AddressID

A GDT AddressID is a unique identifier of an address. An example of GDT AddressID is:

<AddressID>ADACR300000105130000010512</AddressID>

In certain implementations, GDT AddressID may have the following structure:

| GDT | Object Class | Property | Representation/ Association | Type | Type Name | Len. | Remarks |
|---|---|---|---|---|---|---|---|
| AddressID | Address | Identification | Identifier | CDT | Identifier | 1..40 | Restricted |

The following dictionary objects can be assigned to the GDT AddressID: data element (e.g., ADDR_NODE_ID), domain (e.g., ADDR_NODE_ID).

AddressPersonID

A GDT AddressPersonID is a clear proprietary identifier of the person part of an address. An example of GDT AddressPersonID is:

<AddressPersonID>00000110512</AddressPersonID>

In certain implementations, GDT AddressPersonID may have the following structure:

| GDT | Object Class | Property | Representation/ Association | Type | Type Name | Len. | Remarks |
|---|---|---|---|---|---|---|---|
| AddressPersonID | Address Person | Identification | Identifier | CDT | Identifier | 1..10 | Restricted |

The GDT AddressPersonID can be used to identify personal addresses and workplace addresses because, in certain implementations, these are not identified by the AddressPostalAddressID.

The following dictionary objects can be assigned to the GDT AddressPersonID: data element (e.g., AD_PERSNUM), domain (e.g., AD_PERSNUM).

AddressPostalAddressID

A GDT AddressPostalAddressID is a unique, proprietary identifier of the postal address part of an address. An example of GDT AddressPostalAddressID is:

<AddressPostalAddressID>00000100512</AddressPostalAddressID>

In certain implementations, GDT AddressPostalAddressID may have the following structure:

| GDT | Object Class | Property | Representation/ Association | Type | Type Name | Len. | Remarks |
|---|---|---|---|---|---|---|---|
| AddressPostalAddressID | Address Postal Address | Identification | Identifier | CDT | Identifier | 1..10 | Restricted |

The GDT AddressPostalAddressID can be used to identify personal addresses and workplace addresses because, in certain implementations, these are not identified by the AddressPersonID.

The following dictionary objects can be assigned to the GDT AddressPostalAddressID: data element (e.g., ADDR_ADDRNUM), domain (e.g., AD_ADDRNUM).

AddressRepresentationCode

A GDT AddressRepresentationCode is the code for the representation of an address. As well as the standard version, other representations can be maintained for an address, for example, in other languages. An example of GDT AddressRepresentationCode is:

<AddressRepresentationCode listAgencyID=310>K</AddressRepresentationCode>

In certain implementations, GDT AddressRepresentationCode may have the following structure:

| GDT | | Cat. | Object Class | Property | Representation/ Association | Type | Type Name | Len. | Card. | Remarks |
|---|---|---|---|---|---|---|---|---|---|---|
| Address-Representation Code | | | Address | Representation | Code | CDT | Code | 1 | | Restricted |
| | listID | A | Code List | Identification | Identifier | Xsd | token | | 0..1 | |
| | listAgency-ID | A | Code List Agency | Identification | Identifier | xsd | token | | 0..1 | |
| | listVersion-ID | A | Code List | Version | Identifer | xsd | token | | 0..1 | |
| | listAgency-SchemeID | A | Code List Agency | Scheme | Identifer | xsd | token | | 0..1 | |
| | listAgency-Scheme-AgencyID | A | Code List Agency | Scheme Agency | Identifer | xsd | token | | 0..1 | |

For GDT AddressRepresentationCode, a customer-specific code list can be assigned to the code. A listID can be "10181." If the code list is unchanged, a listAgencyID can be "310." Otherwise, a listAgencyID can be the ID of the customer (e.g., ID from DE 3055, if listed there). A listVersionID can be the version of the particular code list (e.g., assigned and managed by the customer). A listAgencySchemeID can be the ID of the scheme if the listAgencyID does not come from DE 3055. The listAgencySchemeAgencyID can be the ID of the organization from DE 3055 that manages the listAgencySchemeID scheme.

The GDT AddressRepresentationCode can be used in the administration of address data to indicate different address representations.

The following dictionary objects can be assigned to the GDT AddressRepresentationCode: data element (e.g., AD_NATION), domain: (e.g., AD_NATION). The possible values for GDT AddressAlternativeRepresentationCode can be maintained in table TSADV. A value for the GDT AddressAlternativeRepresentationCode can be flagged as "Active" in the table TSADVC.

The data type GDT AddressRepresentationCode may use the following codes: A (i.e., Arabic), B (i.e., Hebrew), C (i.e., Chinese), G (i.e., Greek), H (i.e., Hangul), I (i.e., International), K (i.e., Kanji), M (i.e., Traditional Chinese), N (i.e., Katakana), R (i.e., Cyrillic), T (i.e., Thai).

AddressTypeCode

A GDT AddressTypeCode is the coded representation of the type of an address. The address type can describe the basic features of an address by means of the type of address data. An example of GDT AddressTypeCode is:

<AddressTypeCode listAgencyId='310'>1</AddressTypeCode>

In certain implementations, GDT AddressTypeCode may have the following structure:

| GDT | Property | Representation/ Association | Type | Type Name | Len. | Remarks |
|---|---|---|---|---|---|---|
| Addrss-TypeCode | Address-Type | Code | CDT | Code | 1 | restricted |

The data type GDT AddressTypeCode may assign a code list to the code. The attributes may be assigned the following values: listID="10087" and listAgencyID="310."

The data type GDT AddressTypeCode can be used to determine the address type in addresses.

The following dictionary objects can be assigned to the GDT AddressTypeCode: data element (e.g., ADDR_ADDRESS TYPE), domain (e.g., ADDR_ADDRESS TYPE).

The data type GDT AddressTypeCode may use the following codes: 1 (i.e., organization address), 2 (i.e., person address), 3 (i.e., workplace address), 4 (i.e., communication data without postal address), 5 (i.e., personal address without postal address).

AddressUsageCode

A GDT AddressUsageCode is the coded representation of the usage of an address. A business usage can be stored for the address of a business object (for example, a business partner, or an organizational unit). An example of GDT AddressUsageCode is:

<AddressUsageCode>XXDEFAULT</AddressUsageCode>

In certain implementations, GDT AddressUsageCode may have the following structure:

| GDT | | Cat. | Object Class | Property | Representation/ Association | Type | Type Name | Len. | Card. | Remarks |
|---|---|---|---|---|---|---|---|---|---|---|
| Address-Usage Code | | | Address | Usage | Code | CDT | Code | 1..10 | | Restricted |
| | listID | A | Code List | Identification | Identifier | Xsd | token | | 0..1 | |

-continued

| GDT | | Cat. | Object Class | Property | Representation/ Association | Type | Type Name | Len. | Card. | Remarks |
|---|---|---|---|---|---|---|---|---|---|---|
| | list-AgencyID | A | Code List Agency | Identification | Identifier | xsd | token | | 0..1 | |
| | listVersionID | A | Code List | Version | Identifier | xsd | token | | 0..1 | |
| | list-Agency-SchemeID | A | Code List Agency | Scheme | Identifier | xsd | token | | 0..1 | |
| | list-Agency-Scheme-AgencyID | A | Code List Agency | Scheme Agency | Identifier | xsd | token | | 0..1 | |

For GDT AddressUsageCode, a customer-specific code list can be assigned to the code. A listID can be "10127." If the code list is unchanged, a listAgencyID can be "310." Otherwise, a listAgencyID can be the ID of the customer (e.g., ID from DE 3055, if listed there). A listVersionID can be the version of the particular code list (e.g., assigned and managed by the customer). A listAgencySchemeID can be the ID of the scheme if the listAgencyID does not come from DE 3055. The listAgencySchemeAgencyID can be the ID of the organization from DE 3055 that manages the listAgencySchemeID scheme.

The GDT AddressUsageCode can, for example, be used to record that an address of a business partner is suitable as a delivery address. An example of a customer-specific code semantic can be: correspondence address (e.g., address to which correspondence can be addressed).

The following dictionary object can be assigned to the GDT AddressUsageCode: data element (e.g., BU_ADRKIND).

The data type GDT AddressUsageCode may use the following codes: XXDEFAULT (i.e., standard address), BILL_FROM (i.e., invoicing party address), BILL_TO (i.e., invoice recipient address), GOODS_REC (i.e., goods recipient address), POST_TO (i.e., ordering address), SHIP_FROM (i.e., shipping address), SHIP_TO (i.e., delivery address), HCM001 (i.e., private address), HCM002 (i.e., employee workplace address).

AdjustmentReasonCode

The GDT AdjustmentReasonCode is a coded representation for the reason for an adjustment. An example of GDT AdjustmentReasonCode is:

<AdjustmentReasonCode>CANCELED_PROMOTION</AdjustmentReasonCode>

In certain implementations, GDT AdjustmentReasonCode may have the following structure:

| GDT | | Cat. | Property | Representation/ Association | Type | Type Name | Len. | Card. | Remarks |
|---|---|---|---|---|---|---|---|---|---|
| Adjustment-Reason-Code | | | Adjustment Reason | Code | CDT | Code | 0..35 | | restricted |
| | listID | A | Identification | Identifier | xsd | token | 1..60 | 0..1 | |
| | listVersionID | A | Version | Identifier | xsd | token | 1..15 | 0..1 | |
| | listAgencyID | A | Identification | Identifier | xsd | token | 1..60 | 0..1 | |

The GDT AdjustmentReasonCode can be general and can be used in many contexts. The standard code list which can be used in an interface depends on the particular context. In certain implementations, if an interface supports one of the lists or if the supported (partial quantities of the) code lists are disjunctive, none of the attributes (supplementary components) are used for identification of the particular standard code lists. For the use of GDTs in revisions of forecast time series, the possible code values are subsets of the "Adjustment Reason Code List" of the "EAN.UCC XML Business Message Standards, version 1.3 (July 2003)." A listID can be the ID of the particular code list (e.g., assigned by the customer). A listAgencyID can be 310. A listVersionID can be the version of the particular code list (e.g., assigned and managed by the customer). For each use, the context and code list used may be documented.

The data type GDT AdjustmentReasonCode may use the following codes: CANCELED PROMOTION (i.e., promotion cancelled), DISCONTINUED PRODUCT (i.e., discontinued product), DISTRIBUTION_ISSUE (i.e., issues related to distribution center inventory, labor, or equipment), EXPANDED_PROMOTION (i.e., promotion expanded to incorporate additional displays, ad size/placement, products, locations, or other attributes), FORWARD_BUY (i.e., elected to purchase a quantity in excess of immediate demand), INVENTORY_POLICY_CHANGE (i.e., policies related to safety stock, withdrawals, or inventory placements have been changed), MISCELLANEOUS_EVENT (i.e., a reason not covered by the standard reason codes), NEW_LOCATION (i.e., one or more selling or distribution locations closed), NEW_PRODUCT (i.e., new product introduction), NEW_PROMOTION (i.e., new promotion), ORDER_POLICY_CHANGE (i.e., policies related to reorder points, order intervals, lead time, minimum or incremental order sizes have changed), OVERSTOCK_CONDITION (i.e., there is an excess of inventory for the item), PRICE_CHANGE (i.e., the price of the item changed), PRODUCT_CHANGEOVER (i.e., changeover from one revision of a product to the next impacted demand), PRODUCTION_ISSUE (i.e., issues related to production capacity, yield, material, or labor availability), REDUCED_PROMOTION (i.e., promotion scope reduced in terms of products, locations, or other terms), REVISED_PLAN (i.e., revised the sales or order forecast for this item), REVISED_PROMOTION (i.e., promotion pricing, products, locations, displays, ads, or other terms revised), STORE_CLOSURE (store closure), TRANSPORTATION_ISSUE (i.e., issues related to transportation availability or performance), WEATHER_RELATED_EVENT (i.e., weather-related event affected demand such as heat wave, flood, blizzard, hurricane, or other).

AmountInterval

The GDT AmountInterval is an interval of amounts defined by a lower and an upper boundary. An example of GDT AmountInterval is:

<AmountInterval> <IntervalBoundaryTypeCode>5</IntervalBoundaryTypeCode> <LowerBoundaryAmount currencyCode="USD">50.00</LowerBoundaryAmount> <UpperBoundaryAmount currencyCode="USD">70.50</UpperBoundaryAmount> </AmountInterval>

In certain implementations, GDT AmountInterval may have the following structure:

| GDT | | Cat. | Object Class | Property Qualifier | Property | Representation/ Association | Type | Type Name | Card. |
|---|---|---|---|---|---|---|---|---|---|
| Amount-Interval | | | Amount Interval | | | Details | | | |
| | Interval-Boundary-TypeCode | E | Amount Interval | | Interval Boundary Type | Code | GDT | Interval-Boundary-TypeCode | 1 |
| | Lower-Boundary-Amount | E | Amount Interval | Lower | Boundary | Amount | CDT | Amount | 0..1 |
| | Upper-Boundary-Amount | E | Amount Interval | Upper | Boundary | Amount | CDT | Amount | 0..1 |

The GDT IntervalBoundaryTypeCode is a coded representation of an interval boundary type. LowerBoundaryAmount is the lower boundary of the amount interval. It may be also used for amount intervals that contain a single value. UpperBoundaryAmount is the upper boundary of the amount interval.

LowerBoundaryAmount and UpperBoundaryAmount may both contain the same currency code. UpperBoundaryAmount may be greater than LowerBoundaryAmount.

AmountInterval can be used to restrict the output of a query operation: for all output items the values of the attribute linked to the AmountInterval instance provided as query input can be located in the specified amount interval.

AmountRoleCode

A GDT AmountRoleCode is the coded representation of the role of an amount. An example of GDT AmountRoleCode is:

<AmountRoleCode>1</AmountRoleCode>

In certain implementations, GDT AmountRoleCode may have the following structure:

| GDT | Object Class | Property | Representation/ Association | Type | Type Name | Len. | Remarks |
|---|---|---|---|---|---|---|---|
| Amount-RoleCode | Amount | Role | Code | GDT | Amount-RoleCode | 1..3 | restricted |

The data type GDT AmountRoleCode may assign a code list to the code. The attributes may be assigned the following values: listID="10391" and listAgencyID="310."

The GDT AmountRoleCode can be used in order to describe the role of an amount dynamically.

The GDT AmountRoleCode may use the static qualifiers of the GDT Amount. Identical codes and qualifiers may describe the same semantics.

The data type GDT AmountRoleCode may use the following codes: 1 (i.e., additional amount), 2 (i.e., balance amount), 3 (i.e., budget amount), 4 (i.e., calculated amount), 5 (i.e., cash discount amount), 6 (i.e., credit exposure amount), 7 (i.e., credit limit amount), 8 (i.e., deduction amount), 9 (i.e., delivered amount), 10 (i.e., equity participation amount), 11 (i.e., expected amount), 12 (i.e., fee amount), 13 (i.e., fixed costs amount), 14 (i.e., flat rate tax base amount), 15 (i.e., gross amount), 16 (i.e., guaranteed amount), 17 (i.e., hard currency amount), 18 (i.e., income related expenses amount), 19 (i.e., index based currency amount), 20 (i.e., interest amount), 21 (i.e., limit amount), 22 (i.e., line item currency amount), 23 (i.e., loan contract amount), 24 (i.e., local currency amount), 25 (i.e., maximum amount), 26 (i.e., minimum amount), 27 (i.e., monitored amount), 28 (i.e., net amount), 29 (i.e., net without freight charge amount), 30 (i.e., non deductible amount), 31 (i.e., operational currency amount), 32 (i.e., ordered amount), 33 (i.e., paid by company amount), 34 (i.e., payment amount), 35 (i.e., posted amount), 36 (i.e., posting amount), 37 (i.e., property value amount), 38 (i.e., purchasing contract release amount), 39 (i.e., receipt amount), 40 (i.e., reference amount), 41 (i.e., reimbursement amount), 42 (i.e., requested amount), 43 (i.e., revenue amount), 44 (i.e., rounding difference amount), 45 (i.e., sales volume amount), 46 (i.e., set of books currency amount), 47 (i.e., submitted amount), 48 (i.e., target amount), 49 (i.e., tax amount), 50 (i.e., tax base amount), 51 (i.e., tax exempt amount), 52 (i.e., threshold amount), 53 (i.e., total amount), 54 (i.e., withholding tax amount.

AmountTolerance

A GDT AmountTolerance is the acceptable deviation between an expected and an actual monetary amount. An example of GDT AmountTolerance is:

<LowerVarianceAmount currencyCode="EUR">5</LowerVarianceAmount>

<LowerVarianceAmountUnlimitedIndicator>false

<LowerVarianceAmountUnlimitedIndicator>

<UpperVarianceAmountcurrencyCode="EUR">10</UpperVarianceAmount>

<UpperVarianceAmountUnlimitedIndicator>false <UpperVarianceAmountUnlimitedIndicator> <LowerVariancePercent>3.5</LowerVariancePercent> <UpperVariancePercent>4</UpperVariancePercent> <UpperVariancePercentUnlimitedIndicator>false</UpperVariancePercentUnlimitedIndicator> </AmountTolerance>

In certain implementations, GDT AmountTolerance may have the following structure:

| GDT | Cat. | Object Class | Property Qualifier | Property | Rep./Ass. | Type | Type Name | Card. |
|---|---|---|---|---|---|---|---|---|
| Amount-Tolerance | | Amount Tolerance | | | Details | | | |
| Lower-Variance-Amount | E | Amount Tolerance | Lower | Variance | Amount | CDT | Amount | 0..1 |
| Lower-Variance-Amount Unlimited-Indicator | E | Amount Tolerance | Lower Variance Amount | Unlimited | Indicator | CDT | Indicator | 0..1. |
| Upper-Variance-Amount | E | Amount Tolerance | Upper | Variance | Amount | CDT | Amount | 0..1 |
| Upper-Variance-Amount Unlimited-Indicator | E | Amount Tolerance | Upper Variance Amount | Unlimited | Indicator | CDT | Amount | 0..1 |
| Lower-Variance-Percent | E | Amount Tolerance | Lower | Variance | Percent | CDT | Percent | 0..1 |
| Upper-Variance-Percent | E | Amount Tolerance | Upper | Variance | Percent | CDT | Percent | 0..1 |
| Upper-Variance-Percent-Unlimited-Indicator | E | Amount Tolerance | Upper Variance Percent | Unlimited | Indicator | CDT | Indicator | 0..1 |

The specification of the value x in the LowerVarianceAmount can mean that amount y is accepted if y is less than z minus x. For example: In a purchase order, an item worth 50€ is ordered, in which the LowerVarianceAmount is set at 10, and the currency is set to Euro, so a purchase order confirmation will be accepted if the entered value is at least 40€, in relation to LowerVarianceAmount. The LowerVarianceAmountUnlimitedIndicator can indicate that amount y may be well below expected amount z. The specification of the value x in the UpperVarianceAmount can mean that amount y is accepted if y is more than z minus x. For example: In a purchase order, an item worth 50€ is ordered, in which the UpperVarianceAmount is set at 5, and the currency is set to Euro, so a purchase order confirmation will be accepted if the entered value is at least 55€, in relation to UpperVarianceAmount. The UpperVarianceAmountUnlimitedIndicator can indicate that amount y may be well above expected amount z. The specification of the value x in the LowerVariancePercent means that amount y is accepted if y is less than z minus x percent. For example: In a purchase order, an item worth 50€ is ordered, in which the LowerVariancePercent is set at 10, and the currency is set to Euro, so a purchase order confirmation will be accepted if the entered value is at least 45€, in relation to LowerVariancePercent. The specification of the value x in the UpperVariancePercent can mean that amount y is accepted if y is more than z minus x percent. For example: In a purchase order, an item worth 50€ is ordered, in which the UpperVariancePercent is set at 5, and the currency is set to Euro, so a purchase order confirmation will be accepted if the entered value is at least 52.50€, in relation to UpperVariancePercent. The UpperVariancePercentUnlimitedIndicator can indicate that amount y as a percentage may be well above expected amount z.

In certain implementations, variances can be based on an amount or a percentage and are not affected by sign (i.e., plus or minus). For example, in certain implementations, negative amounts or percentages are not allowed. The maximum value for LowerVariancePercent allowed can be 100 since the threshold value of an amount in some implementations, can not be more than 100%. In certain implementations, unlimited indicators that are not specified will be interpreted as 'false.' The indicators may have priority over eventual maintained values, that means that if UpperVarianceAmountUnlimitedIndicator has the value 'true, then the value of the attribute UpperVarianceAmount will not be evaluated, this can apply for the other unlimited indicators as well. In certain implementations, if no absolute or percentage value for the variance upwards or downwards is entered, then the relevant variance is not allowed. If an absolute or percentage value for an upwards or downwards variation can be maintained, then both values are consulted for verification of the variance (this can involve a AND relationship of the absolute and percentage conditions). If only one absolute value or only one percentage value for the upwards or downwards variance can be maintained (e.g., the respective other value is '0'), then only the values differing from null are consulted for verification. In this case, the value '0' can be interpreted as user-defined.

A GDT AmountTolerance can be used in business documents. For example, to determine if specified value of goods in the vendor order confirmation are accepted or not, based on the specified value in the order. AmountTolerance can be assigned by a buyer—this is equal to an authorization that the buyer can accept variances up to the entered variances for AmountTolerance, or assigned by a vendor, in this case it is a type of control function that variances outside of the AmountTolerance are not accepted.

AspectID

A GDT AspectID is a unique identifier for an aspect. An aspect can determine a selection of attributes relevant for the aspect for a predefined object type. An example of GDT AspectID is:

<AspectID>DETAIL</AspectID>

In certain implementations, GDT AspectID may have the following structure:

| GDT | Object Class | Property | Representation/ Association | Type | Type Name | Len. |
|---|---|---|---|---|---|---|
| AspectID | Aspect | Identification | Identifier | CDT | Identifier | 1..40 |

The GDT AspectID could be up to 40 characters long.

When a catalog is published, an AspectID can be used as the CatalogueItemAspectID (described below) to specify which properties and their values are to be displayed in the view for a catalog item. Example: In a product catalog, the "LIST" aspect contains those product properties that are used to select a product from a list. The "DETAIL" aspect contains all the properties, while the "COMPARISON" aspect contains those that are useful for comparing the details of two products.

A distinction may be made between an aspect and a "view." A view of a predefined object can be a restriction of the object's attributes. An aspect is a semantic criterion that can be used to decide which attributes belong to a particular object view. When a given aspect is applied to various object types, the result can be a view. For this reason, an aspect usually has many different views.

AssessmentAndDistributionRuleBaseScalingMethodCode

A GDT AssessmentAndDistributionRuleBaseScalingMethodCode is the coded representation of the method used to scale an allocation base in an assessment or distribution rule. An assessment and distribution rule (AssessmentAndDistributionRule) is a rule for assessing or distributing costs and balances from income statement accounts and balance sheet accounts in Accounting. It can define which amounts are allocated, the receivers, and the basis for calculating the shares to be allocated to the individual receivers. An example of GDT AssessmentAndDistributionRuleBaseScalingMethodCode is:

<AssessmentAndDistributionRuleBaseScalingMethodCode>1<AssessmentAndDistributionRuleBaseScalingMethodCode>

In certain implementations, GDT AssessmentAndDistributionRuleBaseScalingMethodCode may have the following structure:

| GDT | Object Class | Property | Representation/ Association | Type | Type Name | Len. | Remarks |
|---|---|---|---|---|---|---|---|
| AssessmentAndDistributionRuleBaseScalingMethodCode | Assessment And Distribution Rule | Base Scaling Method | Code | CDT | Code | 1 | restricted |

The data type GDT AssessmentAndDistributionRuleBaseScalingMethodCode may assign a code list to the code. The attributes may be assigned the following values: listID="10452," listAgencyID="310," and listVersionID=version of the relevant code list (e.g., assigned and managed by customer).

The GDT AssessmentAndDistributionRuleBaseScalingMethodCode can specify how the allocation base is scaled when the values are negative.

The data type GDT AssessmentAndDistributionRuleBaseScalingMethodCode may use the following codes: 1 (i.e., no scaling), 2 (i.e., standard scaling), 3 (i.e., absolute value), 4 (i.e., negative allocation bases set to zero), 5 (i.e., smallest negative allocation base set to zero), 6 (i.e., smallest negative allocation base set to zero; zero remains zero).

AssessmentAndDistributionBaseValue

A GDT AssessmentAndDistributionBaseValue is the value of the allocation base used in an assessment or distribution. An allocation base can be a currency amount or a quantity. An example of GDT AssessmentAndDistributionBaseValue is:

<AssessmentAndDistributionBaseValue>15.000</AssessmentAndDistributionBaseValue>

In certain implementations, GDT AssessmentAndDistributionBaseValue may have the following structure:

| GDT | Object Class Qual. | Object Class | Property | Rep./Ass. | Type | Type Name | Len. | Remarks |
|---|---|---|---|---|---|---|---|---|
| AssessmentAndDistributionBaseValue | | Assessment And Distribution | Base | Value | xsd | decimal | 22.6 | restricted |

The currency unit or unit of measure of the allocation base may be known from the context.

The GDT AssessmentAndDistributionBaseValue can be used to display the value of an allocation base that can be determine dynamically.

AssessmentAndDistributionRuleEquivalenceNumberValue

A GDT AssessmentAndDistributionRuleEquivalenceNumberValue is an equivalence number that defines how the assessment or distribution rule allocates the amounts. An assessment and distribution rule is a rule for assessing or distributing costs and balances from income statement accounts and balance sheet accounts in Accounting. It can define which amounts are allocated, the receivers, and the basis for calculating the shares to be allocated to the individual receivers. The amounts can be determined by the rule itself based on equivalence numbers, or they can be recalculated for each assessment or distribution run based on a variable allocation base. An example of GDT AssessmentAndDistributionRuleEquivalenceNumberValue is:

<AssessmentAndDistributionRuleEquivalenceNumberValue>1.5</AssessmentAndDistributionRuleEquivalenceNumberValue>

In certain implementations, GDT AssessmentAndDistributionRuleEquivalenceNumberValue may have the following structure:

| GDT | Object Class | Property | Rep./Ass. | Type | Type Name | Len. | Remarks |
|---|---|---|---|---|---|---|---|
| AssessmentAnd-DistributionRule-Equivalence-NumberValue | Assessment And Distribution Rule | Equivalence Number | Value | xsd | decimal | 7.2 | restricted |

The GDT AssessmentAndDistributionRuleEquivalenceNumberValue can be a nonnegative decimal number.

The GDT AssessmentAndDistributionRuleEquivalenceNumberValue can be used in an assessment or distribution rule to define how the amount to be allocated is allocated. The following qualifier can exist for property: AssessmentAndDistributionRuleReceiverBaseValueEquivalenceNumberValue (i.e., equivalence number for the value of an allocation base defined by an AssessmentAndDistributionRule for the receiver of an assessment or distribution).

AssessmentAndDistributionRuleID

A GDT AssessmentAndDistributionRuleID is an identifier for an assessment or distribution rule. An AssessmentAndDistributionRule is a rule for allocating costs and balances from income statement accounts and balance sheet accounts in Accounting. It can define which amounts are allocated, the receivers, and the basis for calculating the shares to be allocated to the individual receivers. An example of GDT AssessmentAndDistributionRuleID is:

<AssessmentAndDistributionRuleID>IT_MAINT</AssessmentAndDistributionRuleID>

In certain implementations, GDT AssessmentAndDistributionRuleID may have the following structure:

| GDT | Object Class | Property | Representation/ Association | Type | Type Name | Len. | Remarks |
|---|---|---|---|---|---|---|---|
| Assessment-AndDistribution-RuleID | Assessment And Distribution Rule | Identification | Identifier | CDT | Identifier | 1..20 | restricted |

For GDT AssessmentAndDistributionRuleID some examples of assessment rules can be CANTEEN, IT_SUPP, TEL_COSTS.

AssessmentAndDistributionRuleVariableBaseDeterminationCode

A GDT AssessmentAndDistributionRuleVariableBaseDeterminationCode is the coded representation of the determination of a variable allocation base and can define in an assessment and distribution rule of the type assessment and distribution rule with variable allocation bases. An assessment and distribution rule is a rule for assessing or distributing costs and balances from income statement accounts and balance sheet accounts in Accounting. It can define which amounts are allocated, the receivers, and the basis for calculating the shares to be allocated to the individual receivers. The shares can be calculated using equivalence numbers or variable allocation bases. An example of GDT AssessmentAndDistributionRuleVariableBaseDeterminationCode is:

<AssessmentAndDistributionRuleVariableBaseDeterminationCode>2</AssessmentAndDistributionRuleVariableBaseDeterminationCode>

In certain implementations, GDT AssessmentAndDistributionRuleVariableBaseDeterminationCode may have the following structure:

| GDT | Object Class | Property | Representation/ Association | Type | Type Name | Len. | Remarks |
|---|---|---|---|---|---|---|---|
| AssessmentAnd-DistributionRule-VariableBase-Determination-Code | Assessment And Distribution Rule | Variable Base Determination | Identifier | CDT | Identifier | 1..20 | restricted |

The data type GDT AssessmentAndDistributionRuleVariableBaseDeterminationCode may assign a code list to the code. The attributes may be assigned the following values: listID="10472," listAgencyID="310," and listVersionID=version of the relevant code list (e.g., assigned and managed by customer).

The GDT AssessmentAndDistributionRuleVariableBaseDeterminationCode can define how a variable allocation base can be calculated for an assessment or distribution.

The data type GDT AssessmentAndDistributionRuleVariableBaseDeterminationCode may use the following codes: 1 (i.e., amounts in currency of set of books), 2 (i.e., amounts in item currency), 3 (i.e., amounts in local currency), 4 (i.e., key figure).

Attachment

A GDT Attachment is an arbitrary document type that is related to either the whole message or just a particular part. An example of GDT Attachment is:

<Attachment id="sampleAttachment.xml"> </Attachment>

In certain implementations, GDT Attachment may have the following structure:

| GDT | Cat. | Object Class | Property | Representation/ Association | Type | Type Name | Len. | Card. | Remarks |
|---|---|---|---|---|---|---|---|---|---|
| Attachment | | Attachment | | Type | xsd | normalized String | | | Title |
| iD | A | Attachment | Identification | Identifier | xsd | string | 1..35 | 1 | May be unique as used for references using the manifest |
| filename | A | Attachment | Filename | Text | xsd | string | 1..70 | 0..1 | |

The element value of “BinaryObject” can be based on the XML-scheme-specific built-in data type xsd:normalizedString and can be used to represent an intelligible title or name of the binary object. The following attributes can be used in BinaryObject: id (e.g., can identify the binary content within the message that corresponds to SOAP or ebXML messaging protocol) and filename (e.g., can contain the relevant name or file name of the binary content).

The attachment can technically be sent in the same message in the form of a MIME attachment. The technical referencing can be done using the manifest of the respective message protocol (e.g., SOAP or ebXML messaging). The value from the “id” attribute can be used as the referencing code. Every attachment may have this attribute and the identifiers may be unique in the same document instance.

Attachments can be similar to the attachments in electronic message transfer (e.g., STMP). In certain implementations, the attachments can be documents that can be read by humans, such as word-processing documents, spreadsheet documents, presentation documents, etc. These documents can be in many different formats (e.g., doc, pdf, ppt, xls, etc.).

In certain implementations, the binary data streams of Attachment may not be stored on a Web server as a file. The global data type “WebAddress” can be available for this purpose.

AttachmentFolder

A GDT AttachmentFolder is the collection of all documents attached to a business object or a part of a business object. An example of GDT AttachmentFolder is: <AttachmentFolder actionCode=“01”> <Document actionCode=“01”> <PathName>/ESABusinessAttachments/AE100/EMAIL/ROOT/12345/prd_desc.doc</PathName> <Name>prd_desc.doc</Name> <VersionID>1</VersionID> <SystemAdministrativeData> <CreationDateTime>2004-04-19T11:11Z+01:00</CreationDateTime> <CreationUserAccountID>Bach</CreationUserAccountID> <LastChangeDateTime>2004-04-19T12:21Z+01:00</LastChangeDateTime> <LastChangeUserAccountID>Bach</LastChangeUserAccountID> </SystemAdministrativeData> <LinkInternalIndicator></LinkInternalIndicator> <VisibleIndicator>X</VisibleIndicator> <VersioningEnabledIndicator>X <VersioningEnabledIndicator> <CategoryCode>1</CategoryCode> <TypeCode>10</TypeCode> <MimeCode>application/msword<MimeCode> <AlternativeName>ProductDescription</AlternativeName> <Description>ProductDescription for P100</Description> <FileContentURI>http://host:8000/irj/go/km/docs/ESABusinessAttachments/AE100/EMAIL/ROOT/12345/prd_desc.doc</FileContentURI> <FileSizeMeasure unitCode=“AD”>645<FileSizeMeasure> <FileContentBinaryObject> T2xk1E1hY0RvbmFsZCBoYWQgYSBmYXJtCkUgSS <FileContentBinaryObject> <Property actionCode=“01”>> <Name>DocumentType</Name> <DataTypeFormatCode>string</DataTypeFormatCode> <VisibleIndicator>X</VisibleIndicator> <ChangeAllowedIndicator>X</ChangeAllowedIndicator> <MultipleValueIndicator></MultipleValueIndicator> <NamespaceURI>http://xyz.com/xmlns/cm</NamespaceURI> <Description>Document Type</Description> <Value> <Text>DIN A4</Text> </Value> </Property> <Document> </AttachmentFolder>

In certain implementations, GDT AttachmentFolder may have the following structure:

| GDT | Cat. | Object Class | Property | Rep./Ass. | Type | Type Name | Card. |
|---|---|---|---|---|---|---|---|
| AttachmentFolder | | AttachmentFolder | | Details | GDT | | |
| actionCode | A | AttachmentFolder | Action | Code | GDT | actionCode | 0..1 |
| Document | E | AttachmentFolder | Document | Details | GDT | Document | 0..n |

A ActionCode is an instruction to the recipient of a message as to how it should handle a submitted property. A document is a document is an attachment that was assigned and contains unstructured information and additional control and monitoring information. A document can contain unstructured information, as well as additional control and monitoring information.

The GDT AttachmentFolder can be used to integrate the dependent object AttachmentFolder in other objects’ messages.

AttachmentFolderConfigurationProfileCode

A GDT AttachmentFolderConfigurationProfileCode is the coded representation of the configuration profile for an attachment folder. A configuration profile is a group of configuration settings that can control the behavior of the configured object. An attachment folder is the collection of all documents attached to a business object or a part of a business object. An example of GDT AttachmentFolderConfigurationProfileCode is: <AttachmentFolderConfigurationProfileCode>1<AttachmentFolderConfigurationProfileCode>

In certain implementations, GDT AttachmentFolderConfigurationProfileCode may have the following structure:

| GDT | Cat. | Object Class | Property | Representation/ Association | Type | Type Name | Len. | Card. |
|---|---|---|---|---|---|---|---|---|
| AttachmentFolder-Configuration-ProfileCode | | Attachment Folder_ Configuration Profile | | Code | CDT | Code | 1..10 | |
| listID | A | Code List | Identifi-cation | Identifier | Xsd | token | | 0..1 |
| listAgencyID | A | Code List Agency | Identifi-cation | Identifier | xsd | token | | 0..1 |
| listVersionID | A | Code List | Version | Identifier | xsd | token | | 0..1 |
| listAgency-SchemeID | A | Code List Agency | Scheme | Identifier | xsd | token | | 0..1 |
| listAgency-SchemeAgencyID | A | Code List Agency | Scheme Agency | Identifier | xsd | token | | 0..1 |

For GDT AttachmentFolderConfigurationProfileCode, a customer-specific code list can be assigned to the code. A listID can be "10432." If the code list is unchanged, a listAgencyID can be "310." Otherwise, a listAgencyID can be the ID of the customer (e.g., ID from DE 3055, if listed there). A listVersionID can be the version of the particular code list (e.g., assigned and managed by the customer). A listAgency-SchemeID can be the ID of the scheme if the listAgencyID does not come from DE 3055. The listAgencySchemeAgencyID can be the ID of the organization from DE 3055 that manages the listAgencySchemeID scheme.

The data type GDT AttachmentFolderConfigurationProfileCode may use the following code: purchase order (i.e., configuration of the attachments for purchasing).

AttachmentWebAddress

A GDT AttachmentWebAddress is a Web address for a document of any type that is related to the transmitted message or part of the message, but is not itself transmitted as part of the message. An example of GDT AttachmentWebAddress is:

<AttachmentWebAddress>http://www.abc.com/Attachments/HelloWorld.txt<AttachmentWebAddress>

In certain implementations, GDT AttachmentWebAddress may have the following structure:

| GDT | Object Class Qual. | Object Class | Rep./Ass. |
|---|---|---|---|
| AttachmentWebAd-dress | Attachment | Web Address | Details |

The specification of an AttachmentWebAddress can support http and https URI schemes.

The GDT AttachmentWebAddress can be used to transmit a link to an attachment, instead of transmitting the attachment itself. The recipient can use the transmitted link to access the attachment.

In certain implementations, when using a GDT AttachmentWebAddress in an interface or other GDT, a description of how the link is interpreted can be included. For example, as a simple link to enable the user to display the attachment on the interface, as a request to the recipient system to load the attachment from the specified address as soon as possible, whether there are restrictions on how long the attachment is available at the specified URL, and whether and by whom the attachment can be changed.

AuditTrailDocumentationID

A GDT AuditTrailDocumentationID is an identifier for the documentation of changes to a business transaction document that are relevant for auditing. An example of GDT AuditTrailDocumentationID is:

<AuditTrailDocumentationID>1800000001</AuditTrailDocumentationID>

In certain implementations, GDT AuditTrailDocumentationID may have the following structure:

| GDT | Object Class | Property | Representation/ Association | Type | Type Name | Len. | Remarks |
|---|---|---|---|---|---|---|---|
| AuditTrail-DocumentationID | AuditTrail-Documentation | Identifi-cation | Identifier | CCT | Identifier | 1..35 | restricted |

A GDT AuditTrailDocumentationID can identify an AuditTrailDocumentation together with the ID of the superordinate business transaction document.

The GDT AuditTrailDocumentationID can be used in the FinancialAuditTrailDocumentation dependent object.

The data type GDT AuditTrailDocumentationID may use the following qualifier: FinancialAuditTrailDocumentationID (i.e., identifier of the uniform documentation of the changes to receivables and payables and financial transactions linked to a business transaction for audit purposes).

AuditTrailDocumentationItemID

A GDT AuditTrailDocumentationItemID is an identifier for an item within the documentation of changes to a business transaction document that are relevant for auditing. An example of GDT AuditTrailDocumentationItemID is:

<AuditTrailDocumentationItemID>1</AuditTrailDocumentationItemID>

In certain implementations, GDT AuditTrailDocumentationItemID may have the following structure:

| GDT | Object Class | Property | Representation/ Association | Type | Type Name | Len. | Remarks |
|---|---|---|---|---|---|---|---|
| AuditTrail-Documentation-ItemID | AuditTrail-Documentation-Item | Identifi-cation | Identifier | CCT | Identifier | 1..10 | restricted |

A GDT AuditTrailDocumentationItemID can identify an item of the AuditTrailDocumentation together with the AuditTrailDocumentationID and the ID of the superordinate business transaction document.

The GDT AuditTrailDocumentationItemID can be used in the PaymentRegisterItem, PaymentRegisterAllocationItem, TradeReceivablesPayablesRegisterItem, TradeReceivables-PayablesRegisterClearingItem, ExpenseAndIncomeItem, ProductTaxItem, and WithholdingTaxItem of FinancialAuditTrailDocumentation.

The data type GDT AuditTrailDocumentationItemID may use the following qualifier: FinancialAuditTrailDocumentationItemID (i.e., identifier of an item in the uniform documentation of the changes to receivables and payables and financial transactions linked to a business transaction for audit purposes).

AuthorisationResultCode

A GDT AuthorisationResultCode is the coded representation of the result of an authorization. An example of GDT AuthorisationResultCode is:

<AuthorisationResultCode>1</AuthorisationResultCode>

In certain implementations, GDT AuthorisationResultCode may have the following structure:

| GDT | Object Class | Property | Representation/ Association | Type | Type Name | Len. | Remarks |
|---|---|---|---|---|---|---|---|
| Authorisation-ResultCode | Authorisation | Result | Code | CDT | Code | 1..2 | restricted |

The data type GDT AuthorisationResultCode may assign a code list to the code. The attributes may be assigned the following values: listID="10205," listAgencyID="310," and listVersionID=version of the relevant code list (e.g., assigned and managed by the customer).

The data type GDT AuthorisationResultCode can, for example, be used to display the result of the authorization of card payments.

The GDT AuthorisationResultCode can correspond to the data element COMT_AUTH_RESP in CRM.

The data type GDT AuthorisationResultCode may use the following code: 1 (i.e., successful), 2 (i.e., unsuccessful), 3 (i.e., not determined).

AuthorityTypeCode

A GDT AuthorityTypeCode is the code indicating the type of authority. An example of GDT AuthorityTypeCode is:

<AuthorityTypeCode listID=20501 listAgencyID=310>1</AuthorityTypeCode>

In certain implementations, GDT AuthorityTypeCode may have the following structure:

| GDT | Cat. | Object Class | Property | Representation/ Association | Type | Type Name | Len. | Card. | Remarks |
|---|---|---|---|---|---|---|---|---|---|
| Authority-TypeC Code | | Authority | Type | Code | CDT | Code | 1..2 | | restricted |
| listID | A | Code List | Identifi-cation | Identifier | xsd | token | | 0..1 | |
| list-AgencyID | A | Code List Agency | Identifi-cation | Identifier | xsd | token | | 0..1 | |
| listVer-sionID | A | Code List | Version | Identifier | xsd | token | | 0..1 | |
| listAgency-SchemeID | A | Code List Agency | Scheme | Identifier | xsd | token | | 0..1 | |
| listAgency-Scheme-AgencyID | A | Code List Agency | Scheme Agency | Identifier | xsd | token | | 0..1 | |

The data type GDT AuthorityTypeCode may have several fixed, country-specific code lists, which can be different at runtime, can be assigned to the code. The attributes may be assigned the following values: listID="20501" and listAgencyID="310." A listVersionID can be the version of the particular code list (e.g., assigned and managed by the customer). A listAgencySchemeID can be the ID of the scheme if the listAgencyID does not come from DE 3055. The list AgencySchemeAgencyID can be the ID of the organization from DE 3055 that manages the list AgencySchemeID scheme.

The code can be used in Personnel Administration to fulfill the legal obligations with regard to the contributions for severely disabled persons. The appendix can be supplemented in the future with code lists for other countries.

The data type GDT AuthorityTypeCode may use the following codes: 1 (i.e., the authority is an employment agency), 2 (i.e., the authority is the department of family and social services), 3 (i.e., the authority is a trade association), 4 (i.e., the authority is the welfare office, a division within the social services department), 5 (i.e., the authority is the department for integration, which is responsible for the integration of severely disabled persons into the general labor market), 6 (i.e., the authority is the regional employment office), 7 (i.e., the authority is the regional board).

In certain implementations, the GDT AuthorityTypeCode may include AuthorityTypeCodeContextElements. A AuthorityTypeCodeContextElements can define a dependency or an environment in which the AuthorityTypeCode appears. The environment can be described by context categories. With the context categories in AuthorityTypeCodeContextElements the valid portion of code values of AuthorityTypeCode can be restricted according to an environment during use.

In certain implementations, AuthorityTypeCodeContextElements may have the following structure:

| GDT | Cat. | Object Class | Property | Representation/ Association | Type | Type Name | Card. |
|---|---|---|---|---|---|---|---|
| Authority-TypeCode Context-Elements | | Authority-TypeCode Context-Elements | | Details | | | |
| Country-Code | E | Authority-TypeCode Context-Elements | Country | Code | GDT | Country-Code | 0..1 |

For the AuthorityTypeCodeContextElements structure described above, CountryCode is the context category which defines the context country. It can also determine the valid code values for a specific country.

Bank

A GDT Bank is a business entity that performs financial investment services and payment transactions. An example of GDT Bank is:

A branch of a bank with a registered office in Germany with information about the SWIFT code and the bank number <Bank> <InternalID>Comdirect Bank Quickborn</InternalID> <StandardID>COBADEHDXXX</StandardID> <RoutingID>20041111</RoutingID>
<RoutingIDTypeCode>BL</RoutingIDTypeCode>
<CountryCode>DE<CountryCode> </Bank>

In certain implementations, GDT Bank may have the following structure:

| GDT | Cat. | Object Class | Property | Representation/ Association | Type | Type Name | Card. |
|---|---|---|---|---|---|---|---|
| Bank | | Bank | | Details | | | |
| InternalID | E | Bank | Internal Identification | Identifier | GDT | BankInternalID | 0..1 |
| StandardID | E | Bank | Standard Identification | Identifier | GDT | BankStandardID | 0..1 |
| RoutingID | E | Bank | Routing Identification | Identifier | GDT | BankRoutingID | 0..1 |
| RoutingID-TypeCode | E | Bank | Routing Identification Type | Code | GDT | BankRoutingID-TypeCode | 0..1 |
| Country-Code | E | Bank | Country | Code | GDT | CountryCode | 0..1 |
| Address | E | Bank | Address | Details | GDT | Address | 0..1 |
| Branch-Address | E | Bank | Branch Address | Details | GDT | Address | 0..n |

For the GDT Bank structure described above, InternalID is a proprietary identifier for the bank that is used when both sender and recipient can access shared master data (i.e., extended enterprise). StandardID is a bank Identification Code (i.e., BIC) of the Society for Worldwide Interbank Financial Telecommunications (i.e., S.W.I.F.T.). See GDT BankStandardID (described below). RoutingID is a number of the bank in a clearing system (see GDT BankRoutingID (described below)). RoutingIDTypeCode is a type of RoutingID (see GDT BankRoutingIDTypeCode (described below)). CountryCode is a bank country, the country in which the bank identified earlier goes about its business. If the bank is a member in a national clearing system, the country to which this clearing system belongs can be entered here. Address is the address of the bank. BranchAddress is the address of the branch of the bank.

To identify a bank, at least the StandardID, the RoutingID, or the InternalID may be entered, or at least the OrganisationFormattedName and PhysicalAddress.CityName may be entered in the address. If the bank is identified by the InternalID, the RoutingID, or by entering the name and location in the address, the CountryCode may be entered. The CountryCode can be omitted if the StandardID is entered. The RoutingIDTypeCode may be entered if the RoutingID is filled and if there are multiple clearing systems in the country of the bank.

The GDT Bank can represent the attributes of a bank that identify a bank within the requirements of the payment transaction. In certain implementations, it is not suitable for representing the organizational structure of a credit institution.

BankAccountBalance

A GDT BankAccountBalance is the difference between the relevant debit and credit turnover for a bank account at a certain point in time. An example of GDT BankAccountBalance is:

<BankAccountBalance> <TypeCode>100</TypeCode> <CreationDateTime>2005-01-01</CreationDateTime> <Amount currencyCode="EUR">100.55</Amount> </BankAccountBalance>

In certain implementations, GDT BankAccountBalance may have the following structure:

| GDT | Cat. | Object Class | Property | Representation/ Association | Type | Type Name | Card. |
|---|---|---|---|---|---|---|---|
| Bank-Account-Balance | | Bank-Account-Balance | | Details | | | |
| TypeCode | E | Bank-Account-Balance | Type | Code | GDT | BankAccount-BalanceType-Code | 0..1 |
| Creation-DateTime | E | Bank-Account-Balance | Creation Date Time | Date Time | CDT | DateTime | 1 |
| Amount | E | Bank-Account-Balance | Amount | Amount | CDT | Amount | 1 |

The BankAccountBalance can contain the following elements: TypeCode (i.e., can specify the type of bank account balance), CreationDateTime (i.e., can specify the balance at a certain point in time), Amount (i.e., can specify the balance of a bank account).

BankAccountBalanceTypeCode

A GDT BankAccountBalanceTypeCode is the coded representation of a type of bank account balance. Turnover on an account can be categorized according to various criteria. Using categorized turnover on a bank account, you can categorize balances. In certain implementations, these balances are not communicated to the customer. An example of GDT BankAccountBalanceTypeCode is:

<BankAccountBalanceTypeCode>100</BankAccountBalanceTypeCode>

In certain implementations, GDT BankAccountBalanceTypeCode may have the following structure:

| GDT | | Cat. | Object Class | Property | Representation/ Association | Type | Type Name | Len. | Card. | Remarks |
|---|---|---|---|---|---|---|---|---|---|---|
| Bank-Account-Balance-TypeCode | | | Bank-Account-Balance | Type | Code | CDT | Code | 1..30 | | restricted |
| | listID | A | Code List | Identification | Identifier | xsd | token | 1..60 | 0..1 | |
| | list-VersionID | A | Code List | Version | Identifier | xsd | token | 1..15 | 0..1 | |
| | list-AgencyID | A | Code List Agency | Identification | Identifier | xsd | token | 1..60 | 0..1 | |

-continued

| GDT | | Cat. | Object Class | Property | Representation/ Association | Type | Type Name | Len. | Card. | Remarks |
|---|---|---|---|---|---|---|---|---|---|---|
| | listAgency-SchemeID | A | Code List Agency | Scheme | Identifier | xsd | token | 1..60 | 0..1 | |
| | listAgency-Scheme-AgencyID | A | Code List Agency | Scheme Agency | Identifier | xsd | token | 1..3 | 0..1 | |

For GDT BankAccountBalanceTypeCode, a customer-specific code list can be assigned to the code. A listID can be "10326." A listAgencyID can be the ID of the customer (e.g., ID from DE 3055, if listed there). A listVersionID can be the version of the particular code list (e.g., assigned and managed by the customer). A listAgencySchemeID can be the ID of the scheme if the listAgencyID does not come from DE 3055. The listAgencySchemeAgencyID can be the ID of the organization from DE 3055 that manages the listAgency-SchemeID scheme.

For data type GDT BankAccountBalanceTypeCode examples of the types of bank account balance: 100 (i.e., balance of salary deposits), 200 (i.e., balance of cash deposits), 3000 (i.e., notice lock period balance), PL02 (i.e., balance of debit memo deposits).

BankAccountDifferentiatorID

A GDT BankAccountDifferentiatorID is a identifier to differentiate between bank accounts. The BankAccountDifferentiatorID can be used to differentiate between bank accounts that are managed under one account number. For example: various terms for time deposits (i.e., monthly, quarterly, and annual fixed interest periods) managed under one account number, accounts in different currencies managed under one account number, various products (i.e., checking, deposit, savings, time deposit account) managed under one account number. It can be differentiated between the individual accounts by using a different two-digit end number. An example of GDT BankAccountDifferentiatorID is:

<BankAccountDifferentiatorID>USD</BankAccountDifferentiatorID>

In certain implementations, GDT BankAccountDifferentiatorID may have the following structure:

| GDT | Object Class | Property | Representation/ Association | Type | Type Name | Len. | Remarks |
|---|---|---|---|---|---|---|---|
| Bank-Account-Differen-tiatorID | Bank Account | Differentiator Identification | Identifier | CDT | Identifier | 1..20 | restricted |

The GDT BankAccountDifferentiatorID can differentiate between bank accounts that are managed under one bank account number.

Various products (i.e., checking, deposit, savings, time deposit account) can be managed under one account number. It can be differentiated between the individual accounts by using a different two-digit end number.

BankAccountHolderName

A GDT BankAccountHolderName is the name of the account holder of a bank account. An example of GDT BankAccountHolderName is:

<BankAccountHolderName>Max Mayermann</BankAccountHolderName>

In certain implementations, GDT BankAccountHolderName may have the following structure:

| GDT | Object Class | Property | Representation/Association | Type | Type Name | Len. | Remarks |
|---|---|---|---|---|---|---|---|
| Bank-Account-Holder-Name | Bank Account | Holder | Name | GDT | Name | 1..80 | restricted |

BankAccountHolderName can contain the name of the account holder in the form as defined at the bank.

The GDT BankAccountHolderName can correspond to the following data elements: KOINH_FI and BU_KOINH.

BankAccountID

A GDT BankAccountID is the unique identifier assigned to a bank account by the account managing bank (Basic Bank Account Number, BBAN). An example of GDT BankAccountID is:

<BankAccountID>0078400542</BankAccountID>

In certain implementations, GDT BankAccountID may have the following structure:

| GDT | Object Class | Property | Representation/ Association | Type | Type Name | Len. | Remarks |
|---|---|---|---|---|---|---|---|
| Bank-AccountID | Bank-Account | Identification | Identifier | CDT | Identifier | 1..35 | Restricted |

The GDT BankAccountID can correspond to the data type BNKN35 in ERP.

BankAccountIDCheckDigitValue

A GDT BankAccountIDCheckDigitValue is a check digit for a bank account number. An example of GDT BankAccountIDCheckDigitValue is:

<BankAccountIDCheckDigitValue>42</BankAccountID-CheckDigitValue>

In certain implementations, GDT BankAccountIDCheckDigitValue may have the following structure:

| GDT | Object Class | Property | Representation/ Association | Type | Type Name | Len. |
|---|---|---|---|---|---|---|
| Bank-Account-IDCheck-DigitValue | Bank Account | Identifier Check Digit | Value | xsd | String | 1..2 |

Check digits can be numerical. There can be some exceptions, for example, Italian bank account numbers, where a check digit can be alphanumeric.

A GDT BankAccountIDCheckDigitValue can be used to display the check digit separate from the bank account number. In some account numbers, the check digit can be a fixed part of the account number. In certain implementations, for example, when the check digit is a fixed part of the account number, BankAccountIDCheckDigitValue is not used.

Separate check digits can be stored in the control key (e.g., data element BKONT). In countries which do not use any separate check digits, the control key can be filled with other data.

BankAccountInternalID

A GDT BankAccountInternalID is a proprietary identifier for a bank account. An example of GDT BankAccountInternalID is:

<BankAccountInternalIDschemeAgencyID="VV4__000">DE_COBA_GIRO_EUR</BankAccountInternalID>

In certain implementations, GDT BankAccountInternalID may have the following structure:

| GDT | Cat. | Object Class | Property Qual. | Property | Representation/ Association | Type | Type Name | Len. | Card. | Remarks |
|---|---|---|---|---|---|---|---|---|---|---|
| Bank-Account-InernalID | | Bank Account | Internal | Identification | Identifier | CDT | Identifier | 1..32 | | Restricted |
| scheme-AgencyID | A | Identification Scheme Agency | Identification | Identification | Identifier | xsd | token | 1..60 | 0..1 | |

For the GDT BankAccountInternalID attributes can be filled as follows: schemeID="BankID" and schemeAgencyID=business System, which issued the ID.

The GDT BankAccountInternalID can be used when both sender and recipient have access to shared master data (e.g., during internal communication within an enterprise).

In an ERP system, GDT BankAccountInternalID can contain the key fields BUKRS, HBKID, and HKTID of table T012K.

BankAccountStandardID

A GDT BankAccountStandardID is the International Bank Account Number (IBAN), that is, a standardized identifier for a bank account. An example of GDT BankAccountStandardID is:

<BankAccountStandardID>DE24200411110078400542</BankAccountStandardID>

In certain implementations, GDT BankAccountStandardID may have the following structure:

| GDT | Object Class | Property Qual. | Property | Representation/ Association | Type | Type Name | Len. | Remarks |
|---|---|---|---|---|---|---|---|---|
| Bank-Account-Standard-ID | Bank-Account | Standard | Identification | Identifier | CDT | Identifier | 1..34 | Restricted |

The permitted values for BankAccountStandardID can be formed according to ISO 13616. This standard can define the format in which the account managing bank can assign the IBAN of a bank account. The attributes of the CDT Identifier can be filled with the following values, which can identify the standard ISO 13616: schemeID="13616" and schemeAgencyID="5."

The GDT BankAccountStandardID can correspond to the data type IBAN in ERP.

BankAccountTypeCode

A GDT BankAccountTypeCode is the coded representation of the type of a bank account. An example of GDT BankAccountTypeCode is:

<BankAccountTypeCode>3</BankAccountTypeCode>

In certain implementations, GDT BankAccountTypeCode may have the following structure:

| GDT | Object Class | Property | Representation/Association | Type | Type Name | Len. | Remarks |
|---|---|---|---|---|---|---|---|
| Bank-Account-TypeCode | Bank-Account | Type | Code | CDT | Code | 1..3 | Restricted |

The data type GDT BankAccountTypeCode may assign a code list to the code. The attributes may be assigned the following values: listID="569" and listAgencyID="116."

The GDT BankAccountTypeCode can be used to specify the type of a bank account, such as current account, loan account, and savings account. It can also be used for specific business transactions.

BankBranchID

A GDT BankBranchID is an identifier for a branch of a bank. An example of GDT BankBranchID is:

<BankBranchIDschemeAgencyID="AE4__000">BRANCH1</BankBranchID>

In certain implementations, GDT BankBranchID may have the following structure:

| GDT | Cat. | Object Class | Property | Representation/Association | Type | Type Name | Len. | Card. | Remarks |
|---|---|---|---|---|---|---|---|---|---|
| Bank-BranchID | | Bank Branch | Identification | Identifier | CDT | Identifier | 1..20 | | restricted |
| scheme-AgencyID | A | Identification Scheme Agency | Identification | Identifier | xsd | token | 1..60 | 0..1 | |

The values of the attributes of GDT BankBranchID attributes can be assigned as follows: schemeID="BankBranchID" and schemeAgencyID=business system, which issued the ID.

In certain implementations, all branches of a bank act under the same bank identifier (e.g., BankInternalID (described below)) in payment transactions but can be differentiated by the BankBranchID. BankBranchID can be used when both sender and recipient have access to shared master data (e.g., during internal communication within an enterprise).

BankChargeBearerCode

A GDT BankChargeBearerCode is the coded representation of the bearer of the charges of a bank transaction. An example of GDT BankChargeBearerCode is:

<BankChargeBearerCode>OUR</BankChargeBearerCode>

In certain implementations, GDT BankChargeBearerCode may have the following structure:

| GDT | Object Class | Representation/Association | Type | Type Name | Len. | Remarks |
|---|---|---|---|---|---|---|
| BankCharge-BearerCode | Bank Charge Bearer | Code | CDT | Code | 1..4 | restricted |

The data type GDT BankChargeBearerCode may assign a code list to the code. The attributes may be assigned the following values: listID="ChargeBearerCode," listAgencyID="117" and listVersionID=version of the particular code list assigned and managed by customer.

The GDT BankChargeBearerCode can be used to describe the distribution of costs between the initiator and the recipient of a payment transaction.

The data type GDT BankChargeBearerCode may use the following codes: OUR (i.e., initiator), BEN (i.e., beneficiary), SHA (i.e., share), INTR (i.e., intermediary), INVR (i.e., investor). Typically, the codes INTR and INVR are not supported initially.

BankGroupCode

A GDT BankGroupCode is the coded representation of a group of banks which have a common agreement. Such an agreement can lead to lesser bank fees and shorter processing times for transactions within that group. An example of GDT BankGroupCode is:

<BankGroupCode>1</BankGroupCode>

In certain implementations, GDT BankGroupCode may have the following structure:

| GDT | Cat. | Object Class | Property | Representation/Association | Type | Type Name | Len. | Card. | Remarks |
|---|---|---|---|---|---|---|---|---|---|
| Bank-GroupCode | | Bank Group | | Code | CDT | Code | 1..4 | | restricted |
| listID | A | Code List | Identification | Identifier | xsd | token | | 0..1 | |
| list-AgencyID | A | Code List Agency | Identification | Identifier | xsd | token | | 0..1 | |
| list-VersionID | A | Code List | Version | Identifier | xsd | token | | 0..1 | |

-continued

| GDT | Cat. | Object Class | Property | Representation/ Association | Type | Type Name | Len. | Card. | Remarks |
|---|---|---|---|---|---|---|---|---|---|
| listAgency-SchemeID | A | Code List Agency | Scheme | Identifier | xsd | token | | 0..1 | |
| listAgency-Scheme-AgencyID | A | Code List Agency | Scheme Agency | Identifier | xsd | token | | 0..1 | |

For GDT BankGroupCode, a customer-specific code list can be assigned to the code. A listID can be “10293.” A listAgencyID can be the ID of the customer (e.g., ID from DE 3055, if listed there). A listVersionID can be the version of the particular code list (e.g., assigned and managed by the customer). A listAgencySchemeID can be the ID of the scheme if the listAgencyID does not come from DE 3055. The listAgencySchemeAgencyID can be the ID of the organization from DE 3055 that manages the listAgencySchemeID scheme.

Bank Groups can help in optimizing the costs of transactions for transactions between the banks within the group. Each Bank (i.e., Bank Master Data) can be assigned a BankGroupCode when a bank is created to specify that the bank belongs to a particular Bank Group. Examples for customer-specific code semantics: TBCashGroup (i.e., Trade Bank Cash Group (Group of Trade banks that do not charge for using each others ATMs)) and InternationalG (i.e., German Banks which offer International Transfers at low costs).

BankInternalID

A GDT BankInternalID is a proprietary identifier for a bank. An example of GDT BankInternalID is:

<BankInternalID schemeAgencyID=“VV4_000”>COBA</BankInternalID>

In certain implementations, GDT BankInternalID may have the following structure:

| GDT | Cat. | Object Class | Property | Representation/ Association | Type | Type Name | Len. | Card. | Remarks |
|---|---|---|---|---|---|---|---|---|---|
| Bank-InternalID | | Bank | Internal Identification | Identifier | CDT | Identifier | 1..18 | | Restricted |
| scheme-AgencyID | A | Identification Scheme Agency | Identification | Identifier | XSD | Token | 1..60 | 0..1 | |

The attributes for the data type GDT BankInternalID can be as follows: schemeID=“BankID” and schemeAgencyID=business System, which issued the ID.

The GDT BankInternalID can be used when both sender and recipient have access to shared master data (e.g., during internal communication within an enterprise).

In an ERP system, GDT BankInternalID can correspond to the field bank key (e.g., data element BANKK).

BankRoutingID

A GDT BankRoutingID identifies a bank by its number in a clearing system. A clearing system is an electronic system with which the participating banks eliminate (balance) their non-cash payment flows with each other and clear receivables and payables. An example of GDT BankRoutingID is:

<BankRoutingID>20041111</BankRoutingID>

In certain implementations, GDT BankRoutingID may have the following structure:

| GDT | Object Class | Property | Representation/ Association | Type | Type Name | Len. | Remarks |
|---|---|---|---|---|---|---|---|
| Bank-RoutingID | Bank | Routing Identification | Identifier | CDT | Identifier | 1..35 | restricted |

The BankRoutingID is the routing number of a bank in a clearing system (e.g.; bank number, sort code, ABA Routing Number, CHIPS Participant Number). The length and the form of the ID can be dependent on the clearing system.

The GDT BankRoutingID can be within one clearing system. This may be known from the context and can usually identify by using the type of BankRoutingID. In some countries there can be one national clearing system. If this is the case and the bank country is known from the context, in certain implementations, the BankRoutingIDTypeCode may not be entered.

BankRoutingIDTypeCode

A GDT BankRoutingIDTypeCode is a coded representation of the type of a bank number. An example is:

<BankRoutingIDTypeCode>BL</BankRoutingIDTypeCode>

In certain implementations, GDT BankRoutingIDTypeCode may have the following structure:

| GDT | Object Class | Property | Representation/ Association | Type | Type Name | Len. | Remarks |
|---|---|---|---|---|---|---|---|
| BankRoutingID-TypeCode | BankRouting-Identifier | Type | Code | CDT | Code | 1..3 | Restricted |

The GDT BankRoutingIDTypeCode can be displayed according to the S.W.I.F.T. standards for the element 52*a* of message MT103.

Each type of a bank number can belong to a different clearing system. For example, there can be multiple clearing systems in some countries (e.g., United States). In these cases, a bank number is typically not sufficient. The GDT BankRoutingIDTypeCode can be used to enter the type of a bank number and thus identify the clearing system.

A clearing system is an electronic system with which the participating banks eliminate balance their non-cash payment flows with each other and clear receivables and payables.

The data type GDT BankRoutingIDTypeCode may use the following SWIFT Codes: AT (i.e., Austrian Bankleitzahl), AU (i.e., Australian Bank State Branch), BL (i.e., German Bankleitzahl), CC (i.e., Canadian Payments Association Payment Routing Number), CH (i.e., CHIPS Universal Identifier), CP (i.e., CHIPS Participant Identifier), ES (i.e., Spanish Domestic Interbanking Code), FW (i.e., Fedwire Routing Number), GR (i.e., Hellenic Bank Identification Code), HK (i.e., Bank Code of Hong Kong), IE (i.e., Irish National Clearing Code), IN (i.e., Indian Financial System Code), IT (i.e., Italian Domestic Identification Code), PT (i.e., Portuguese National Clearing Code), RU (i.e., Russian Central Bank Identification Code).

BankStandardID

A GDT BankStandardID is a standardized identifier for a bank according to the worldwide identification scheme of the S.W.I.F.T. organization (i.e., BIC code). An example of GDT BankStandardID is:

<BankStandardID>COBADEHDXXX</BankStandardID>

In certain implementations, GDT BankStandardID may have the following structure:

| GDT | Object Class | Property Qual. | Property | Representation/ Association | Type | Type Name | Len. | Remarks |
|---|---|---|---|---|---|---|---|---|
| Bank-StandardID | Bank | Standard | Identification | Identifier | CDT | Identifier | 8..11 | restricted |

Permitted values for GDT BankStandardID can be BIC codes according to ISO 9362. These can be assigned by the S.W.I.F.T. organization. The attributes of the CDT Identifier can be implicitly filled with the following value to identify the S.W.I.F.T organization: schemeAgencyID="17."

The GDT BankStandardID can correspond to the data element SWIFT in ERP.

BiddingConditionCode

The GDT BiddingConditionCode is a coded representation of the bidding conditions for a bid invitation property. An example of GDT BiddingConditionCode is:

<QuoteQuantityBiddingConditionCode>01</QuoteQuantityBiddingConditionCode>

In certain implementations, GDT BiddingConditionCode may have the following structure:

| GDT | Object Class | Property | Representation/ Association | Type | Type Name | Len. |
|---|---|---|---|---|---|---|
| Bidding-ConditionCode | Bidding | Condition | Code | CDT | Code | 2 |

The data type GDT BiddingConditionCode may assign a code list to the code. The attributes may be assigned the following values: listID="10002," listAgencyID="310" and listVersionID="tbd," and the following values: 01 (i.e., Required, not changeable), 02 (i.e., Required, changeable), 03 (i.e., Optional, not changeable), 04 (i.e., Optional, changeable).

Typical bid invitation properties for which bidding conditions can be specified can be quantity, price, and terms of delivery. When the GDT BiddingConditionCode is applied to a bid invitation property, it can be identified in the prefix (e.g., GDT QuoteQuantityBiddingConditionCode (described below)). A default procedure could be specified for each usage of a BiddingConditionCode.

The GDT BiddingConditionCode can be a proprietary code list with predefined values. Changes to the permitted values can involve changes to the interface.

BillOfMaterialID

A GDT BillOfMaterialID is a unique identifier for a Bill of Material. A Bill of Material is a group of elements used in engineering and production to define and describe the components that are used to assemble a material. It can group similar components with the same function according to the requirements in engineering and production. An example of GDT BillOfMaterialID is:

<BillOfMaterialID>CARTRIDGE</BillOfMaterialID>

In certain implementations, GDT BillOfMaterialID may have the following structure:

| GDT | Cat. | Object Class | Property | Representation/ Association | Type | Type Name | Len. | Card. |
|---|---|---|---|---|---|---|---|---|
| BillOf-MaterialID | | Bill Of Material | Identification | Identifier | CDT | Identifier | 1..40 | |
| scheme-AgencyID | A | Identification Scheme Agency | Identification | Identifier | xsd | token | 1..60 | 0..1 |

The data type GDT BillOfMaterialID may assign a code list to the code. The attributes may be assigned the following values: schemeAgencyID=business System, which issued the ID.

BillOfMaterialItemGroupID

A GDT BillOfMaterialItemGroupID is a unique identifier for a Bill of Material item group. A Bill of Material Item Group is a group of Bill of Material Items whose assigned components have or describe the same function or can be handled in the same way during the design phase or production process. An example of GDT BillOfMaterialItemGroupID is:

<BillOfMaterialItemGroupID>INK</BillOfMaterialItemGroupID>

In certain implementations, GDT BillOfMaterialItemGroupID may have the following structure:

| GDT | Object Class | Property | Representation/ Association | Type | Type Name | Len. |
|---|---|---|---|---|---|---|
| BillOfMaterial-ItemGroupID | Bill Of Material Item Group | Identification | Identifier | CDT | Identifier | 1..40 |

A GDT BillOfMaterialItemGroupID can be unique within the context of a particular Bill of Material.

A GDT Bill of Material item group can be used to group items with similar properties. For Example, various types of ink like "Red ink" or "Blue ink" can be grouped as Item Group "Ink."

BillOfMaterialItemGroupItemID

A GDT BillOfMaterialItemGroupItemID is a unique identifier for an item of a Bill of material item group. A Bill of material Item group item is the part of a bill of material that, from a business perspective, can contain a material, document, or natural-language text or a combination of a material, document, and natural-language text that can be used for the design and production of a specific material. An example of GDT BillOfMaterialItemGroupItemID is:

<BillOfMaterialItemGroupItemID>RED_INK </BillOfMaterialItemGroupItemID>

In certain implementations, GDT BillOfMaterialItemGroupItemID may have the following structure:

| GDT | Object Class | Property | Representation/ Association | Type | Type Name | Len. |
|---|---|---|---|---|---|---|
| BillOfMaterial-ItemGroupID | Bill Of Material Item Group Item | Identification | Identifier | CDT | Identifier | 1..8 |

A GDT BillOfMaterialItemGroupItemID can be used in the context of a particular Item Group of a Bill of Material.

BillOfMaterialVariantID

A GDT BillOfMaterialVariantID is a unique identifier for Bill of Material Variant. A Bill of Material Variant is a specification of a bill of material that can describe a change in the basic form, composition, and properties of a material that can occur when certain components are used, omitted, or added. An example of GDT BillOfMaterialVariantID is:

<BillOfMaterialVariantID>RED_CARTRIDGE</BillOfMaterialVariantID>

In certain implementations, GDT BillOfMaterialVariantID may have the following structure:

| GDT | Object Class | Property | Representation/ Association | Type | Type Name | Len. |
|---|---|---|---|---|---|---|
| BillOfMaterial-VariantID | BillOfMaterialVariant | Identification | Identifier | CDT | Identifier | 1..8 |

A GDT BillOfMaterialVariantID can be used in the context of a particular Bill of Material.

BillOfOperationsConnectionTypeCode

A GDT BillOfOperationsConnectionTypeCode is the coded display of the type of a connection in a bill of operations. A connection element is an element used to structure the "feeder" or "junction" processing paths. Using a connection element, one processing path can be linked to another processing path. An example of GDT BillOfOperationsConnectionTypeCode is:

<BillOfOperationsConnectionTypeCode>1</BillOfOperationsConnectionTypeCode>

In certain implementations, GDT BillOfOperationsConnectionTypeCode may have the following structure:

| GDT | Object Class | Property | Representation/ Association | Type | Type Name | Len. | Remarks |
|---|---|---|---|---|---|---|---|
| BillOf-Operations-Connection-TypeCode | Bill Of Operations Connection | Type | Code | CDT | Code | 1..2 | Restricted |

The data type GDT BillOfOperationsConnectionTypeCode may assign a code list to the code. The attributes may be assigned the following values: listID="10135," listAgencyID="310," and listVersionID=version of the relevant code list (e.g., assigned and managed by the customer).

The data type GDT BillOfOperationsConnectionTypeCode may use the following codes: 1 (i.e., feeder), 2 (i.e., Junction).

BillOfOperationsElementID

A GDT BillOfOperationsElementID is a unique identifier of an element of a bill of operations. An element is a part of a process description with which the basic structure of a process can be defined along with its hierarchical and processing-specific dependencies. An example of GDT BillOfOperationsElementID is:

<BillOfOperationsElementID>ASSEMBLY</BillOfOperationsElementID>

In certain implementations, GDT BillOfOperationsElementID may have the following structure:

| GDT | Object Class | Property | Representation/ Association | Type | Type Name | Len. | Remarks |
|---|---|---|---|---|---|---|---|
| BillOf-Operations-ElementID | Bill Of Operations Element | Identification | Identifier | CDT | Identifier | 1..40 | Restricted |

A GDT BillOfOperationsElementID can be explicit in the context of a bill of operations.

BillOfOperationsElementTypeCode

A GDT BillOfOperationsElementTypeCode is the coded display of the type of an element in the bill of operations. An element is a part of a process description with which the basic structure of a process can be defined along with its hierarchical and processing-specific dependencies. The type can specialize the element that can occur in the following specializations: Operation, Sequence, Branching, Connection, Mark. An example of GDT BillOfOperationsElementTypeCode is:

<BillOfOperationsElementTypeCode>1</BillOfOperationsElementTypeCode>

In certain implementations, GDT BillOfOperationsElementTypeCode may have the following structure:

| GDT | Object Class | Property | Representation/ Association | Type | Type Name | Len. | Remarks |
|---|---|---|---|---|---|---|---|
| BillOf-Operations-Element-TypeCode | Bill Of Operations Element | Type | Code | CDT | Code | 1..2 | Restricted |

The data type GDT BillOfOperationsElementTypeCode may assign a code list to the code. The attributes may be assigned the following values: listID="10136," listAgencyID="310," and listVersionID=version of the relevant code list (e.g., assigned and managed by the customer).

The data type GDT BillOfOperationsElementTypeCode may use the following codes: 1 (i.e., sequence), 2 (i.e., branching), 3 (i.e., connection), 4 (i.e., operation), 5 (i.e., mark).

BillOfOperationsID

A GDT BillOfOperationsID is a unique identifier of a bill of operations. A bill of operations is the definition of a process description in logistics. The following types of bills of operations can exist: production bill of operations, the description of a production process for manufacturing a product, production bill of operations template, a pattern for the creation of complex production processes or of individual production operations that can be included in production bills of operations by copying, site logistics bill of operations, the description of a process of the internal movement of goods, the goods receipt, or the goods issue. An example of GDT BillOfOperationsID is:

<BillOfOperationsID>ENGINEPRODUCTION</BillOfOperationsID>

In certain implementations, GDT BillOfOperationsID may have the following structure:

| GDT | Object Class | Property | Representation/ Association | Type | Type Name | Len. | Remarks |
|---|---|---|---|---|---|---|---|
| BillOf-OperationsID | Bill Of Operations | Identification | Identifier | CDT | Identifier | 1..40 | Restricted |

BillOfOperationsTemplateTypeCode

A GDT BillOfOperationsTemplateTypeCode is the coded display of the type of a bill of operations template. A bill of operations template is a pattern used to create process descriptions in logistics. The type of the bill of operations template can be used to differentiate whether a complex process description or an individual operation is described. An example of GDT BillOfOperationsTemplateTypeCode is:

<BillOfOperationsTemplateTypeCode>1</BillOfOperationsTemplateTypeCode>

In certain implementations, GDT BillOfOperationsTemplateTypeCode may have the following structure:

| GDT | Object Class | Property | Representation/ Association | Type | Type Name | Len. | Remarks |
|---|---|---|---|---|---|---|---|
| BillOf-Operations-Template-TypeCode | Bill Of Operations Template | Type | Code | CDT | Code | 1..2 | Restricted |

The data type GDT BillOfOperationsTemplateTypeCode may assign a code list the code. The attributes may be assigned the following values: listID="10138," listAgencyID="310," and listVersionID=version of the relevant code list (e.g., assigned and managed by the customer).

The data type GDT BillOfOperationsTemplateTypeCode may use the following codes: 1 (i.e., process), 2 (i.e., operation).

BlockingReasonCode

A GDT BlockingReasonCode is a coded representation for the reason why a processing of a document is blocked. An example of GDT BlockingReasonCode is:

<BlockingReasonCode>1</BlockingReasonCode>

In certain implementations, GDT BlockingReasonCode may have the following structure:

| GDT | Object Class | Representation/ Association | Type | Type Name | Len. | Remarks |
|---|---|---|---|---|---|---|
| Blocking-ReasonCode | Blocking Reason | Code | CDT | Code | 1..2 | restricted |

For GDT BlockingReasonCode, a customer-specific code list can be assigned to the code. Multiple code lists can be allowed and can be differentiated by their attributes. The following ListIDs can be defined: BILLING (i.e., code list for grouping customers according to special pricing requirements) and DELIVERY (i.e., code list for grouping customers for general statistical and pricing purposes). The other attributes listAgencyID, listVersionID, listAgencySchemeID, listAgencySchemeAgencyID can be omitted in the structure table, because they may contain constant, customer specific values during runtime.

In messages, GDT BlockingReasonCode can be used when both sender and recipient have access to shared or harmonized Business Configuration (e.g., during internal communication in an enterprise).

The GDT BlockingReasonCode can be used to state why the document processing is blocked for a particular business partner. It can state that the processing of document is blocked for the partner for the entire company or only for selected sales areas. Examples for the semantics of the code list in billing scenarios can be as follows: Calculation Missing (i.e., further processing is blocked due to missing calculation), Completion Confirmation Missing (i.e., further processing is blocked due to missing completion confirmation), Prices Incomplete (i.e., further processing is blocked due to incomplete prices). Examples for the semantics of the code list in delivery scenarios cab be as follows: Political Reasons (i.e., further processing is blocked due to political reasons), Bottleneck Material (i.e., further processing is blocked due to a bottleneck in supply of material).

BuildingID

A GDT BuildingID is a unique identifier of a building or part of a building. An example of GDT BuildingID is:

<BuildingID>WDF03</BuildingID>

In certain implementations, GDT BuildingID may have the following structure:

| GDT | Object Class | Property | Representation/Association | Type | Type Name | Len. | Remarks |
|---|---|---|---|---|---|---|---|
| BuildingID | Building | Identification | Identifier | CDT | Identifier | 1..10 | Restricted |

The GDT BuildingID may be unique in the usage context. GDT BuildingID can be used in addresses.

The following dictionary objects can be assigned to the GDT BuildingID: Data element (i.e., BU_BLDNG), Domain (i.e., TEXT20).

BusinessDocumentFlowBusinessTransactionDocumentProperty

A GDT BusinessDocumentFlowBusinessTransactionDocumentProperty is a property of a business document in a document flow. An example of GDT BusinessDocumentFlowBusinessTransaction DocumentProperty is:

<BusinessDocumentFlowBusinessTransactionDocumentProperty> <ID>CREATION_DATETIME</ID> <Name languageCode="en">Time of creation</Name> </BusinessDocumentBusinessTransactionDocumentFlowProperty>

In certain implementations, GDT BusinessDocumentFlowBusinessTransactionDocumentProperty may have the following structure:

| GDT | Cat. | Object Class Qual. | Object Class | Property | Rep./ Ass. | Type | Type Name | Len. | Card. |
|---|---|---|---|---|---|---|---|---|---|
| Business Document-Flow-Business Transaction-Document-Property | | Business Document Flow_ Business Transaction Document | Property | | Details | | | | |
| ID | E | Business Document Flow_ Business Transaction Document | Property | Identifcation | Identifier | GDT | Business Document-Flow-Business Transaction-Document-PropertyID | 1..50 | 1 |
| Name | E | Business Document Flow_ Business Transaction Document | Property | Name | Name | GDT | LONG_ Name | | 0..1 |

For the GDT BusinessDocumentFlowBusinessTransactionDocumentProperty structure described above, ID is a identifier of the property. Name is a description of the property.

The GDT BusinessDocumentFlowBusinessTransactionDocumentProperty may be used in the BusinessDocumentFlow object.

BusinessDocumentFlowBusinessTransactionDocumentPropertyValue

A GDT BusinessDocumentFlowBusinessTransactionDocumentPropertyValue is the value that can be assigned to a property of a business document in a document flow. An example of GDT BusinessDocumentFlowBusinessTransactionDocumentPropertyValue is:

<BusinessDocumentFlowBusinessTransactionDocumentPropertyValue> <Amount currencyCode="USD">777.95</Amount> </BusinessDocumentFlowBusinessTransactionDocumentPropertyValue>

In certain implementations, GDT BusinessDocumentFlowBusinessTransactionDocumentPropertyValue may have the following structure:

| GDT | | Cat. | Object Class Qual. | Object Class | Property | Rep./ Ass. | Type | Type Name | Card. |
|---|---|---|---|---|---|---|---|---|---|
| Business Document-Flow-Document-Business Transaction-PropertyValue | | | | | | Details | | | |
| | Amount | E | Business Document Flow_ Business Transaction Document | Property Value | Amount | Amount | GDT | Amount | 0..1 |
| | Quantity | E | Business Document Flow_ Business Transaction Document | Property Value | Quantity | Quantity | GDT | Quantity | 0..1 |
| | Decimal-Value | E | Business Document Flow_ Business Transaction Document | Property Value | Decimal Value | Value | GDT | Decimal-Value | 0..1 |
| | Integer-Value | E | Business Document Flow_ Business Transaction Document | Property Value | Integer Value | Value | GDT | Integer-Value | 0..1 |
| | Time-Point | E | Business Document Flow_ Business Transaction Document | Property Value | Time Point | Time-Point | GDT | Time-Point | 0..1 |
| | Name | E | Business Document Flow_ Business Transaction Document | Property Value | Name | Name | GDT | LONG_ Name | 0..1 |
| | Description | E | Business Document Flow_ Business Transaction Document | Property Value | Description | Description | GDT | LONG_ Description | 0..1 |
| | Indicator | E | Business Document Flow_ Business Transaction Document | Property Value | Indicator | Indicator | GDT | Indicator | 0..1 |
| | Code | E | Business Document Flow_ Business Transaction Document | Property Value | Code | Code | GDT | Business Document-Flow Business Transaction-Document-Property-ValueCode | 0..1 |

For the GDT BusinessDocumentFlowBusinessTransactionDocumentPropertyValue structure described above, Amount is a Specification of a currency based value (e.g., amount). Quantity is a specification of an amount in a unit of measure. DecimalValue is a specification of a discrete decimal value (e.g., a percentage). IntegerValue is a specification of a discrete integer value (e.g., the specification of a year as a number). TimePoint is a specification of a point of time (e.g., either as a date, a time, or a time stamp). Name is a specification of a word, or a combination of words, designating or describing an object. Description is a specification of a natural language representation of the characteristics of an object. Indicator is a specification of a binary logical value (e.g., yes/no). Code is a specification of a coded value.

In certain implementations, one element may be specified. The element that can be appropriate for the value may be used. The GDT BusinessDocumentFlowBusinessTransactionDocumentPropertyValue may be used in the BusinessDocumentFlow object.

BusinessDocumentFlowBusinessTransactionDocumentPropertyValueCode

A GDT BusinessDocumentFlowBusinessTransactionDocumentPropertyValueCode is a coded property value of a business document or a business document item in a document flow. An example of GDT BusinessDocumentFlowBusinessTransactionDocumentPropertyValueCode is:

</BusinessDocumentFlowBusinessTransactionDocumentPropertyValueCode>

In certain implementations, GDT BusinessDocumentFlowBusinessTransactionDocumentPropertyValueCode may have the following structure:

| GDT | Object Class | Property | Representation/Association | Type | Type Name |
|---|---|---|---|---|---|
| BusinessDocumentFlow-Business-Transaction-Document-PropertyValueCode | Business Document Flow_Business Transaction Document_Property Value | Code | Code | CDT | Code |

In certain implementations, the GDT BusinessDocumentFlowBusinessTransactionDocumentPropertyValueCode does not have any static value lists.

The GDT BusinessDocumentFlowBusinessTransactionDocumentPropertyValueCode may be used in the GDT BusinessDocumentFlowBusinessTransactionDocumentPropertyValue.

The elements of the GDT BusinessDocumentFlowBusinessTransactionDocumentPropertyValue can represent the types of the permitted concrete property values. In certain implementations, if the property value is the unique identifier for something, the element Code can be used with which the GDT BusinessDocumentFlowBusinessTransactionDocumentPropertyValueCode is classified.

BusinessDocumentMessageHeader

A GDT BusinessDocumentMessageHeader comprises business information from the perspective of the sender application for identifying and processing of a business document (instance) within a (technical) message (if applicable, with a reference to a previous instance of a business document within a previous (technical) message), information about the sender, and any information about the receiver. An example of GDT BusinessDocumentMessageHeader is:

<PurchaseOrderRequest> <MessageHeader> <ID schemeID="INVOIC">00000000123456</ID> <ReferenceID schemeID="ORDER">00000000123455</ReferenceID> <CreationDateTime>2003-10-21T12:21Z+01:00</ID> <SenderParty> <StandardID schemeAgencyID="016">4711</StandardID> <ContactPerson> <InternalID schemeID="PartyID" schemeAgencyID="MPL__002">820</InternalID> <Address> . . . </Address> </ContactPerson> </SenderParty> <RecipientParty> <InternalID schemeID="PartyID" schemeAgencyID="BPL__300">747</InternalID> <ContactPerson> <InternalID schemeID="PartyID"schemeAgencyID="BPL__300">737</InternalID> <Address> . . . </Address> </ContactPerson> </RecipientParty> </MessageHeader> </PurchaseOrderRequest>

In certain implementations, GDT BusinessDocumentMessageHeader may have the following structure:

| GDT | | Cat. | Object Class | Property | Representation/Association | Type | Type Name | Len. | Card. |
|---|---|---|---|---|---|---|---|---|---|
| Business Document-Message-Header | | | Business Document Message Header | | Details | GDT | | | |
| | ID | E | Business Document Message Header | Identification | Identifier | GDT | Business Document-MessageID | 1..35 | 1..1 |
| | ReferenceID | E | Business Document Message Header | Reference Identification | Identifier | GDT | Business-Document-MessageID | 1..35 | 0..1 |
| | CreationDate Time | E | Business Document Message Header | Creation Date Time | Date Time | CDT | DateTime | | 1..1 |
| | TestData-Indicator | E | Business Document Message Header | Test Data | Indicator | CDT | Indicator | | 0..1 |

-continued

| GDT | | Cat. | Object Class | Property | Representation/Association | Type | Type Name | Len. | Card. |
|---|---|---|---|---|---|---|---|---|---|
| | SenderParty | E | Business Document Message Header | Sender Party | Details | GDT | Business Document-Message-Header-Party | | 0..1 |
| | RecipientParty | E | Business Document Message Header | Recipient Party | Details | GDT | Business Document-Message-Header-Party | | 0..n |

The following elements can be defined within BusinessDocumentMessageHeader. ID is a identifier for the instance of the business document within a technical message that is generated by the business application level at the sender. ReferenceID is a identifier of another instance of a business document in another technical message that the BusinessDocument references (e.g., a BusinessDocument can link to another BusinessDocumentMessage to represent a business interrelation or a dependency). CreationDateTime is a date and time stamp for when a message is created for the business document within the business application. TestDataIndicator indicates if the business data contained in the message is test data or not. This element can be optional and if omitted its default can be “false.” SenderParty is the party that creates and sends the BusinessDocument at business application level. SenderParty can contain a unique sender identification. The identifiers contained in SenderParty can also be used for internal forwarding at application level. The contact person in it can contain the necessary direct contact information in case there are problems or errors during processing of the respective BusinessDocument. RecipientParty is the party that receives and processes the BusinessDocument at business application level. RecipientParty can contain a unique receiver identification. The identifiers contained in RecipientParty can be used for internal forwarding at application level. The contact person in it can contain the necessary direct contact information in case there are problems or errors during processing of the respective BusinessDocument.

In certain implementations, BusinessDocuments used for B2B scenarios may use the GDT BusinessDocumentMessageHeader. In certain implementations, BusinessDocumentMessageHeader can also be used in BusinessDocuments intended for A2A scenarios.

A GDT BusinessDocumentMessageHeader can be used for the following: for forwarding to the relevant position or target person within a business application, for administration and error handling (e.g., the unique identification can be used for referencing and in the case of errors at business application level, the contact person in SenderParty or RecipientParty can be contacted directly; the name, telephone number, e-mail address, fax number, etc. can be transmitted by the BusinessDocumentMessageHeader for this purpose), for tracing and monitoring of a BusinessDocument and its processing status at business application level, for managing and monitoring business processes, for converting general information to other standards such as IDoc, UN/CEFACT, ANSI X.12, ODETTE, TRADACOMMS, xCBL, OAG BODs, RosettaNet-PIPs, etc. (e.g., these are standards that can represent reference data for the business application level according to predefined conventions; this can be guaranteed if the general header information of a BusinessDocument is identical to the envelope or header information of the respective default message). The ReferenceID can be used to represent references that originate from the succession of BusinessDocuments in the BusinessDocument choreography, these can be query/response or request/confirmation messages. The respective interface document may identify the previous BusinessDocument to which the ReferenceID refers (i.e., what the reference specified by the BusinessDocument reference means).

BusinessDocumentMessageHeaderParty

A GDT BusinessDocumentMessageHeaderParty is general information about a party that is responsible for sending or receiving a BusinessDocument at business application level. GDT BusinessDocumentMessageHeaderParty can contain the necessary general business information about an involved sender or receiver party. A party can be a natural person, organization, or business partner group in which a company has a business or intra-enterprise interest. This could be a person, organization, or group within or outside of the company. An example of GDT BusinessDocumentMessageHeaderParty is:

<PurchaseOrderRequest> <MessageHeader> <SenderParty> <StandardID schemeAgencyID=“16”>4711</StandardID> <ContactPerson> <InternalID schemeID=“PartyID”schemeAgencyID=“MPL__002”>820</InternalID> <Address> . . . </Address> </ContactPerson> <SenderParty> <RecipientParty> <InternalID schemeID=“PartyID” schemeAgencyID=“BPL__300”>747</InternalID> <ContactPerson> <InternalID schemeID=“PartyID”schemeAgencyID=“BPL__300”>737</InternalID> <Address> . . . </Address> <ContactPerson> <RecipientParty> . . . </MessageHeader> . . . </PurchaseOrderRequest>

In certain implementations, GDT BusinessDocumentMessageHeaderParty may have the following structure:

| GDT | | Cat. | Object Class | Property | Representation/Association | Type | Type Name | Card. |
|---|---|---|---|---|---|---|---|---|
| Business-Document-Message-Header-Party | | | Business Document Message Header Party | | Details | | | |
| | InternalID | E | Business Document Message Header Party | Internal Identification | Identifier | GDT | Party-InternalID | 0..1 |
| | StandardID | E | Business Document Message Header Party | Standard Identification | Identifier | GDT | Party-StandardID | 0..n |
| | Contact-Person | E | Business Document Message Header Party | Contact Person | Details | GDT | Contact-Person | 0..1 |

The following elements can be defined within GDT BusinessDocumentMessageHeaderParty. InternalID is a proprietary identifier used when SenderParty or RecipientParty use common master data (i.e., Extended Enterprise) or when they are in alignment with regard to the semantics and use of InternalID. StandardID is a standardized identifier for SenderParty or RecipientParty of the organization based on the code list DE 3055. ContactPerson is a contact person of the party.

The GDT BusinessDocumentMessageHeaderParty may be used in the BusinessDocumentMessageHeader of a BusinessDocument. In certain implementations, the GDT BusinessDocumentMessageHeaderParty is meant for defining the SenderParty or RecipientParty. The different IDs of a BusinessDocumentMessageHeaderParty can identify the same party. A party can be identified in the following ways: InternalID (i.e., when SenderParty and RecipientParty use common master data or are in alignment with regard to the semantics and use of InternalID), StandardID (i.e., when SenderParty and RecipientParty can manage standardized identifiers). Of all of the IDs available to the SenderParty, those IDs the RecipientParty can expect to understand are used in a BusinessDocument. Either company-internalID or a standardized ID can be used for identification.

The GDT BusinessDocumentMessageHeaderParty can be used for the details and identification of the sender or recipient of a BusinessDocument. Furthermore, additional information about the contact person, including address, can be defined, which makes it possible to contact this person directly should any problems or errors occur when validating or processing the inbound BusinessDocument.

BusinessDocumentMessageHeaderPartyContactPerson

A GDT BusinessDocumentMessageHeaderPartyContactPerson is a contact person of a party that is responsible for sending or receiving a BusinessDocument at business application level. A party is a natural person, organization, or business partner group in which a company has a business or intra-enterprise interest. This could be a person, organization, or group within or outside of the company. An example of GDT BusinessDocumentMessageHeaderPartyContactPerson is:

<ContactPerson> <InternalID schemeID="PartyID" schemeAgencyID="MPL_002">820</InternalID>
<EmailAddress>john.doe@acme.com</EmailAddress>
</ContactPerson>

In certain implementations, GDT BusinessDocumentMessageHeaderPartyContactPerson may have the following structure:

| GDT | | Cat. | Object Class | Property | Representation/Association | Type | Type Name | Len. | Card. | Remarks |
|---|---|---|---|---|---|---|---|---|---|---|
| Business-Document-Message-Header-Party-Contact-Person | | | Business Document Message Header Party Contact Person | | Details | | | | | |
| | InternalID | E | Business Document Message Header Party Contact Person | Internal Identification | Identifier | GDT | Contact-Person-InternalID | | 0..1 | |

-continued

| GDT | | Cat. | Object Class | Property | Representation/Association | Type | Type Name | Len. | Card. | Remarks |
|---|---|---|---|---|---|---|---|---|---|---|
| | Organisation-Formatted-Name | E | Business Document Message Header Party Contact Person | Organisation Formatted Name | Name | CCT | Text | 0..40 | 0..4 | restricted |
| | Person-Formatted-Name | E | Business Document Message Header Party Contact Person | Organisation Formatted Name | Name | CCT | Text | 0..80 | 0..4 | restricted |
| | PhoneNumber | E | Business Document Message Header Party Contact Person | Phone Number | Phone Number | GDT | PhoneNumber | | 0..n | |
| | FaxNumber | E | Business Document Message Header Party Contact Person | Fax Number | Phone Number | GDT | PhoneNumber | | 0..n | |
| | EmailAddress | E | Business Document Message Header Party Contact Person | Email Address | Email Address | GDT | EmailAddress | | 0..n | |

For GDT BusinessDocumentMessageHeaderPartyContactPerson structure described above, InternalID is a proprietary identifier for the ContactPerson that is used when both sender and recipient can access shared master data (i.e., extended enterprise). This can be a personnel number. OrganisationFormattedName is a name of an organization (e.g., a company or corporate body), which is formatted according to specific rules. PersonFormattedName is a name of a person, which can be formatted according to specific rules. PhoneNumber is a telephone number that comprises the international dialing code, regional area code, number, and extension. FaxNumber is a fax number that can comprise the international dialing code, regional area code, number, and extension. EmailAddress is an electronic mail address.

In certain implementations, a ContactPerson does not have a StandardID. A contact person can therefore be identified using an internalID. The names and communication channels (e.g., phone, fax, or email) belong to the same person.

The GDT BusinessDocumentMessageHeaderPartyContactPerson can be used for detailed information about a sender party's contact person like their communication paths.

BusinessDocumentMessageID

A GDT BusinessDocumentMessageID is an identifier of a business document in a technical message that is issued by the sender business application. An example of GDT BusinessDocumentMessageID is:

<PurchaseOrderRequest><MessageHeader> <IDschemeID="ORDER"schemeAgencyID="124224" schemeAgencySchemeAgencyID="234">00000000000001</ID> . . . </MessageHeader> . . . </PurchaseOrderRequest>

In certain implementations, GDT BusinessDocumentMessageID may have the following structure:

| GDT | | Category | Object Class | Property Term | Representation Term | Type | Type Name | Length | Cardinality | Remarks |
|---|---|---|---|---|---|---|---|---|---|---|
| Business-Document-MessageID | | | Business Document Message | Identification | Identifier | CDT | Identifier | 1..35 | | restricted |
| | schemeID | A | Identification Scheme | Identification | Identifier | xsd | token | 1..60 | 0..1 | |
| | schemeAgencyID | A | Identification Scheme-Agency | Identification | Identifier | xsd | token | 1..60 | 0..1 | |

-continued

| GDT | | Category | Object Class | Property Term | Representation Term | Type | Type Name | Length | Cardinality | Remarks |
|---|---|---|---|---|---|---|---|---|---|---|
| | schemeAgency-SchemeAgencyID | A | Identification Scheme-Agency | Scheme Agency | Identifier | xsd | token | 1..3 | 0..1 | |

The format of this identification can be a sequential number comprising of up to 35 characters, this number should be positive. This representation can comply with the UN/EDIFACT conventions (see DE 0340 (Interactive Message Reference Number)).

For GDT BusinessDocumentMessageID can have the following attributes. schemeID can be the ID of the ID scheme. Can be released and maintained by the responsible organization of the ID scheme. The GDT owner may retrieve the correct ID from the responsible organization. If there is no unique ID available, the name of the identifier or identifier type may be entered, which can be used in the corresponding standard, specification, or scheme of the responsible organization. schemeAgencyID can be the ID of the organization maintaining the ID scheme. This identification can be released by an organization contained in DE 3055 (e.g., DUNS, EAN . . . ). The GDT owner may retrieve the correct ID from the responsible organization. If the organization is not contained in DE 3055, proceed like described in "Data Type Catalog," 5.6.6.c). SchemeAgencySchemeAgencyID can be the identification of the maintaining organization (e.g., DUNS, EAN, SWIFT, etc.) which can be responsible for the identification of the organization named in SchemeAgencyID. The organization may be contained in DE 3055.

The GDT BusinessDocumentMessageID is identification for the entire lifetime of a BusinessDocument. The identification can generate by the respective business application of the creator and, in certain implementations, is not created or interpreted by the technical message transfer systems.

The technical MessageID can depend on the respective technical transfer protocol and, typically cannot be associated with the BusinessDocumentMessageID. When a technical message is sent, the BusinessDocument can be the payload in the message. The MessageID can change as a result of the forwarding mechanisms of the respective middleware systems or the different transfer protocols used. In certain implementations, the "SchemeID" attribute is not used if the BusinessDocumentMessageID is unique within a SchemeAgencyID. In the inbound direction, mapping can be performed to the in-house message code.

Note the following cases in the outbound direction when using SchemeID, SchemeAgencyID, and SchemeAgency-SchemeAgencyID: Sender is known because it can be given by SenderParty. In certain implementations, sender is unknown because it is not specified by SenderParty. Identification of business level at the sender can be standardized: schemeAgencyID can be a standardized ID for the agency that can generate the MessageID and schemeAgency-SchemeAgencyID is an agency from DE 3055 that can manage the standardized ID "SchemeAgencyID." Identification of business level at the sender is proprietary: schemeAgencyID is a proprietary ID for the agency that can generate the MessageID and schemeAgencySchemeAgencyID can be "ZZZ" (i.e., mutually defined from DE 3055). Sender has multiple business systems that are unique within an agency (e.g., System Landscape Directory. Uniqueness can be ensured by the sender. In certain implementations, sender is not used in internal communication. SchemeAgencyID can be an ID of business system that may be unique within an agency.

The GDT BusinessDocumentMessageID can identify a BusinessDocument within a business process and can reference the business document in a subsequent business message in the same business process.

BusinessObjectNodeElementModificationTypeCode

A GDT BusinessObjectNodeElementModificationTypeCode is a coded representation of the type of modification of a Business Object Node Element instance. An example of GDT BusinessObjectNodeElementModificationTypeCode is:

<BusinessObjectNodeElementModificationTypeCode>U</BusinessObjectNodeElementModificationTypeCode>

In certain implementations, GDT BusinessObjectNodeElementModificationTypeCode may have the following structure:

| GDT | Object Class | Property | Representation/Association | Type | Type Name | Len. | Remarks |
|---|---|---|---|---|---|---|---|
| Business-Object-Node-Element-Modification-TypeCode | Business Object Node Element | ModificationType | Code | CDT | Code | 1 | Restricted |

The data type GDT BusinessObjectNodeElementModificationTypeCode may assign a code list to the code. The attributes may be assigned the following values: listID="10246" and listAgencyID="310."

The data type GDT BusinessObjectNodeElementModificationTypeCode may use the following codes: C (i.e., created), U (i.e., updated), D (i.e., deleted).

BusinessObjectNodeElementName

A GDT BusinessObjectNodeElementName is the name of an element of a Business Object node. An element can itself be simple, structured, or part of another structured element. In case the element is part of a structure, then the name can contain the path from a selected business object node to the element. An example of GDT BusinessObjectNodeElementName is:

<BusinessObjectNodeElementName>Amount/CurrencyCode</BusinessObjectNodeElementName>

In certain implementations, GDT BusinessObjectNodeElementName may have the following structure:

| GDT | Object Class | Property | Representation/Association | Type | Type Name |
|---|---|---|---|---|---|
| BusinessObjectNodeElementName | Business Object Node Element | Name | Text | GDT | LANGUAGE-INDEPENDENT_Name |

In case the element is part of a structure, then the element name can be the path from the depicted business object node down to the element. The different layers of structures can be separated by slashes (e.g., XPATH notation). GDT BusinessObjectNodeElementName can contain the ESR names and not the ABAP or JAVA proxy names. The GDT BusinessObjectNodeElementName can be valid within one node of a business object. In certain implementations, GDT BusinessObjectNodeElementName does not contain the node name or business object name.

BusinessObjectTypeCode

A GDT BusinessObjectTypeCode is the coded representation of the type of business object. A business object is a representation of a type of an identifiable business entity described by a structural model, an internal process model, and one or more service interfaces. An example of GDT BusinessObjectTypeCode is:

<BusinessObjectTypeCode>4</BusinessObjectTypeCode>

In certain implementations, GDT BusinessObjectTypeCode may have the following structure:

| GDT | Object Class | Property | Representation/Association | Type | Type Name | Len. | Remarks |
|---|---|---|---|---|---|---|---|
| Business-Object-Type-Code | Business Object | Type | Code | CDT | Code | 1..5 | restricted |

The data type GDT BusinessObjectTypeCode may assign a code list to the code. The attributes may be assigned the following values: listID="10315," listAgencyID="310," and listVersionID=version of the relevant code list (e.g., assigned and managed by the customer).

The data type GDT BusinessObjectTypeCode may use the following code: 001 (i.e., purchase order), 6 (i.e., accounting document), 7 (i.e., accounting entry), 8 (i.e., accounting notification), 9 (i.e., accounts receivable payable ledger account discounting run), 10 (i.e., accounts receivable payable ledger account foreign currency remeasurement run), 11 (i.e., accounts receivable payable ledger account regrouping run), 12 (i.e., appointment activity), 13 (i.e., balance carry forward run), 14 (i.e., bank payment order), 15 (i.e., bank statement), 16 (i.e., bill of exchange payable), 17 (i.e., bill of exchange receivable), 18 (i.e., bill of exchange submission), 19 (i.e., cash ledger account foreign currency remeasurement run), 20 (i.e., cash payment), 21 (i.e., cash transfer), 22 (i.e., cheque deposit), 23 (i.e., clearing house payment order), 24 (i.e., confirmed inbound delivery), 25 (i.e., confirmed outbound delivery), 26 (i.e., credit card payment), 27 (i.e., customer complaint), 28 (i.e., customer invoice), 29 (i.e., customer invoice request), 30 (i.e., customer quote), 31 (i.e., customer requirement), 32 (i.e., customer return), 33 (i.e., debt guarantee), 34 (i.e., demand forecast), 35 (i.e., demand planning forecast), 36 (i.e., due clearing), 37 (i.e., due payment), 38 (i.e., dunning), 39 (i.e., email activity), 40 (i.e., employee time balance adjustment), 42 (i.e., employee time valuation), 43 (i.e., employee compensation agreement), 44 (i.e., employee time agreement), 45 (i.e., engineering change order), 46 (i.e., European community sales list report), 47 (i.e., expense report), 48 (i.e., expense arrangement), 49 (i.e., factoring), 50 (i.e., fax activity), 52 (i.e., fixed asset depreciation run), 53 (i.e., general ledger account assessment run), 54 (i.e., general ledger account distribution run), 55 (i.e., goods and activity confirmation), 56 (i.e., goods and service acknowledgement), 57 (i.e., goods receipt invoice receipt clearing run), 58 (i.e., inbound delivery), 59 (i.e., inbound delivery request), 60 (i.e., incoming cheque), 61 (i.e., in-house requirement), 62 (i.e., internal request), 63 (i.e., inventory price change run), 64 (i.e., lead), 65 (i.e., letter activity), 66 (i.e., liquidity forecast), 67 (i.e., expected liquidity item), 68 (i.e., logistics execution requisition), 69 (i.e., material cost estimate), 70 (i.e., material inspection), 71 (i.e., material inspection sample), 72 (i.e., opportunity), 73 (i.e., outbound delivery), 74 (i.e., outbound delivery request), 75 (i.e., outgoing cheque), 76 (i.e., overhead cost ledger account assessment run), 77 (i.e., overhead cost ledger account distribution run), 78 (i.e., overhead cost ledger account overhead cost calculation run); 79 (i.e., parental leave), 80 (i.e., payment advice), 81 (i.e., payment allocation), 82 (i.e., payment order), 83 (i.e., personnel hiring), 84 (i.e., personnel leaving), 85 (i.e., personnel transfer), 86 (i.e., phone call activity), 87 (i.e., physical inventory task), 88 (i.e., physical inventory count), 89 (i.e., procurement planning order), 90 (i.e., planned independent requirement), 91 (i.e., planned material flow), 92 (i.e., production planning order), 93 (i.e., planning view on purchase order), 94 (i.e., production confirmation), 95 (i.e., production ledger account overhead cost calculation run), 96 (i.e., production lot), 97 (i.e., production order), 98 (i.e., production request), 99 (i.e., production requisition), 100 (i.e., production task), 101 (i.e., product tax declaration), 103 (i.e., project cost estimate), 104 (i.e., planning view on inventory), 107 (i.e., purchase order confirmation), 108 (i.e., purchase request), 109 (i.e., purchase requisition), 110 (i.e., purchasing contract), 111 (i.e., request for quote), 112 (i.e., sales ledger account accruals run), 113 (i.e., sales ledger account overhead cost calculation run), 114 (i.e., sales order), 115 (i.e., service confirmation), 116 (i.e., service contract), 117 (i.e., service order), 118 (i.e., service request), 119 (i.e., site logistics confirmation), 120 (i.e., site logistics lot), 121 (i.e., site logistics order), 122 (i.e., site logistics request), 123 (i.e., site logistics requisition), 124 (i.e., site logistics task), 125 (i.e., software problem report), 126 (i.e., special leave), 127 (i.e., supplier invoice), 128 (i.e., supplier invoice request), 129 (i.e., supplier quote), 130 (i.e., supply planning exception), 131 (i.e., supplyplanningrequirement), 132 (i.e., task), 133 (i.e., tax receivables payables register), 134 (i.e., withholding tax declaration), 135 (i.e., work in process clearing run), 142 (i.e., accounting view on project), 143 (i.e., accounts receivable payable ledger account), 144 (i.e., bank directory entry), 145 (i.e., batch), 146 (i.e., bill of exchange book), 147 (i.e., business partner), 148 (i.e., capacity aggregation group), 149 (i.e., cash ledger account), 150 (i.e., cash storage), 151 (i.e., cheque storage), 152 (i.e., clearing house), 153 (i.e., clearing house account), 154 (i.e., company), 155 (i.e., compensation component type), 156 (i.e., compensationcomponenttypecatalogue), 157 (i.e., compensation structure), 158 (i.e., cost centre), 159 (i.e., customer), 160 (i.e., customer problem and solution), 161 (i.e., de employee social insurance arrangement), 162 (i.e., de employee tax arrangement), 163 (i.e., demand history), 164 (i.e., ordered procurement planning order), 165 (i.e., distribution centre), 166 (i.e., document), 167 (i.e., employee), 168 (i.e., employee time), 169 (i.e., employee time account), 170 (i.e., employee time calendar), 171 (i.e., employee time confirmation view on project), 172 (i.e., employee time confirmation worklist), 173 (i.e., employment), 174 (i.e., equipment resource), 175 (i.e., exchange rate), 176 (i.e., fixed asset), 177 (i.e., general ledger account), 178 (i.e., general ledger account balance distribution rule), 179 (i.e., handling unit), 180 (i.e., house bank), 181 (i.e., house bank account), 182 (i.e., identity), 183 (i.e., individual material), 184 (i.e., inspection rule), 185 (i.e., installation point), 186 (i.e., installed base), 187 (i.e., inventory), 188 (i.e., labour resource), 189 (i.e., location), 190 (i.e., logistic unit), 191 (i.e., logistic unit usage), 192 (i.e., logistics area), 193 (i.e., logistics task folder), 194 (i.e., material), 195 (i.e., material inspection quality level), 196 (i.e., material inspection task), 197 (i.e., material interchangeability group), 198 (i.e., material ledger account), 199 (i.e., maternity protection), 200 (i.e., organisational centre), 201 (i.e., other direct cost ledger account), 202 (i.e., overhead cost assessment rule), 203 (i.e., overhead cost ledger account), 204 (i.e., overhead cost sheet), 205 (i.e., packing bill of material), 206 (i.e., payment agreement), 207 (i.e., payment card), 208 (i.e., payment register), 209 (i.e., permanent establishment), 210 (i.e., position), 211 (i.e., procurement arrangement), 212 (i.e., procurement price specification), 213 (i.e., product catalog change list), 214 (i.e., product catalog update method), 215 (i.e., product catalog update run), 216 (i.e., product catalogue), 217 (i.e., product catalogue cleanup run), 218 (i.e., product catalogue duplication run), 219 (i.e., product catalogue file upload run), 220 (i.e., product catalogue publishing sending run), 221 (i.e., product category hierarchy), 222 (i.e., production bill of material), 223 (i.e., production bill of operations), 224 (i.e., production bill of operations template), 225 (i.e., production centre), 226 (i.e., production ledger account), 227 (i.e., production model), 228 (i.e., production segment), 229 (i.e., profit center), 230 (i.e., programme), 231 (i.e., project), 232 (i.e., project request), 233 (i.e., project simulation), 234 (i.e., project snapshot), 235 (i.e., project template), 236 (i.e., published product catalogue), 237 (i.e., published product catalogue cleanup run), 238 (i.e., purchase ledger account), 239 (i.e., purchasing unit), 240 (i.e., quality code catalogue), 241 (i.e., release supply plan to execution run), 242 (i.e., released execution production model), 243 (i.e., released planning production model), 244 (i.e., released site logistics process model), 245 (i.e., reporting line unit), 246 (i.e., resource group), 247 (i.e., sales arrangement), 248 (i.e., sales ledger account), 249 (i.e., sales price list), 250 (i.e., sales price specification), 251 (i.e., sales unit), 252 (i.e., sample drawing procedure), 253 (i.e., service delivery), 254 (i.e., software change), 255 (i.e., support request), 256 (i.e., segment), 257 (i.e., service issue category catalogue), 258 (i.e., service product), 259 (i.e., service unit), 260 (i.e., site logistics bill of operations), 261 (i.e., site logistics process model), 262 (i.e., site logistics process segment), 263 (i.e., source and destination determination rule), 264 (i.e., sourceofsupply), 265 (i.e., storage behaviour method), 266 (i.e., supplier), 267 (i.e., supply planning area), 268 (i.e., supply planning run), 269 (i.e., supplyquotaarrangement), 270 (i.e., tax arrangement), 271 (i.e., tax authority), 272 (i.e., tax ledger account), 273 (i.e., trade receivables payables account), 274 (i.e., trade receivables payables register), 275 (i.e., transportationlane), 276 (i.e., transportation zone), 277 (i.e., vehicle resource), 278 (i.e., warranty), 279 (i.e., work agreement), 280 (i.e., working time model), 281 (i.e., working time model catalogue).

BusinessPartnerBankDetailsID

In the context of the Business Partner, a GDT BusinessPartnerBankDetailsID identifies bank details. In addition to specifying an account, the bank details of a business partner can also contain administrative information. The account can be identified by means of the BBAN (e.g., country key of the bank, bank key, bank account number). The name of the account holder can also be specified. The following are examples of administrative information for bank details: the validity of the bank details, additional Information for the bank details, identification of the bank details in an external system, an Indicator showing whether collection authorization has been granted, a description of the bank details, information about whether a change to different bank details took place, and if so, when this occurred. An example of GDT BusinessPartnerBankDetailsID is:

<BusinessPartnerBankDetailsID>A1W3</BusinessPartner-BankDetailsID>

In certain implementations, GDT BusinessPartnerBankDetailsID may have the following structure:

| GDT | Object Class | Property | Represen-tation/As-sociation | Type | Type Name | Len. | Re-marks |
|---|---|---|---|---|---|---|---|
| Business-Partner-Bank-DetailsID | Business Partner Bank Details | Identifi-cation | Identifier | CDT | Identi-fier | 1..4 | Re-stricted |

The GDT BusinessPartnerBankDetailsID can be used in order to identify the bank details of a business partner.

The following dictionary object can be assigned to the GDT BusinessPartnerBankDetailsID: Data element (e.g., BU_BKVID).

BusinessPartnerCategoryCode

A GDT BusinessPartnerCategoryCode is the description, in the form of a code, of a business partner category. A business partner category can describe the nature of a business partner and can establish the category of the business partner. The following categories can exist: natural person, organization, business partner group. The categories can represent a classification of business partners that is both complete and disjoint. An example of GDT BusinessPartnerCategoryCode is:

<BusinessPartnerCategoryCode>2</BusinessPartnerCat-egoryCode>

In certain implementations, GDT BusinessPartnerCategory-Code may have the following structure:

| GDT | Object Class | Property | Represen-tation/As-sociation | Type | Type Name | Len. | Re-marks |
|---|---|---|---|---|---|---|---|
| Business-Partner-Category-Code | Business Partner | Category | Code | CDT | Code | 1 | re-stricted |

For GDT BusinessPartnerCategoryCode a code list can be assigned. The attributes may be assigned the following values: ListID="10046," listAgencyID="310," and ListVersionID=version of the relevant code list (e.g., assigned and managed by the customer.

The GDT BusinessPartnerCategoryCode can be used to distinguish a business partner as a natural person, an organization, or a group. Depending on the category of the business partner, different information can be stored, or different data may be entered when a business partner is created.

The following dictionary objects can be assigned to the GDT BusinessPartnerCategoryCode: Data element (e.g., BU_TYPE) and Domain (e.g., BU_TYPE).

The data type GDT BusinessPartnerCategoryCode may use the following codes: 1 (i.e., person), 2 (i.e., organization), 3 (i.e., Group).

BusinessPartnerID

A GDT BusinessPartnerID is a identifier for a business partner. A business party can be a person, organization, group of people, or organizations in which a company has a business interest. An example of GDT BusinessPartnerID is:

<BusinessPartnerID>065055766</BusinessPartnerID>

In certain implementations, GDT BusinessPartnerID may have the following structure:

| GDT | Object Class | Property | Represen-tation/As-sociation | Type | Type Name | Len. | Re-marks |
|---|---|---|---|---|---|---|---|
| Business-PartnerID | Business Partner | Identifi-cation | Identifier | CDT | Identi-fier | 1..60 | Re-stricted |

The GDT BusinessPartnerID can be used to represent an alternative business partner number. In certain implementations, the GDT BusinessPartnerID may not be used in messages; the GDT PartyID (described below) is used instead. When mapping from BusinessPartnerID to PartyID the attributes are transferred 1:1. The contents of the scheme attributes can be determined by the type of alternative business partner number (see GDT PartyIDTypeCode, described below). For example, the alternative business partner number is a DUNS, the values would be as follows: SchemeID (e.g., "DUNS") and SchemeAgencyID ("16").

The following dictionary object can be assigned to the GDT BusinessPartnerID: Data element (e.g., BU_PARTNER).

BusinessPartnerInternalID

A GDT BusinessPartnerInternalID is a proprietary identifier for a business partner. A business party is a person, organization, group of people, or organizations in which a company has a business interest. An example of GDT BusinessPartnerInternalID is:

<BusinessPartnerInternalID>12345</BusinessPartnerInternalID>

In certain implementations, GDT BusinessPartnerInternalID may have the following structure:

| GDT | Object Class | Qualifier Property | Property | Represen-tation/As-sociation | Type | Type Name | Len. | Remarks |
|---|---|---|---|---|---|---|---|---|
| Business-Partner-InternalID | Business Partner | Internal | Identifi-cation | Identifier | GDT | Business-PartnerID | 1..10 | Restricted |

The GDT BusinessPartnerInternalID can be used to map the 10 character business partner numbers. In certain implementations, the GDT BusinessPartnerInternalID may not be used in messages; the GDT PartyInternalID (describe below) or GDT PartyID (described below) may be use instead.

The scheme attributes for map to PartyInternalID may have the following values: SchemeID="PartyID") and SchemeAgencyID=business system in which the indicator was assigned.

The scheme attributes for map to PartyID may have the following values: SchemeID="PartyID," SchemeAgencyID=business system in which the indicator was assigned, and schemeAgencyschemeAgencyID="ZZZ."

The following dictionary object can be assigned to the GDT BusinessPartnerInternalID:

Data element (e.g., BU_ID_NUMBER).

BusinessPartnerPartnerGroupTypeCode

A GDT BusinessPartnerPartnerGroupTypeCode is the code indicating the type of partner group that occurs as a business partner. Party group is persons or organizations that have merged. This merger can be the result of a common purpose or the occurrence of an event. Partner groups can be mapped as business partners of the category group GDT BusinessPartnerCategoryCode (described above). An example of GDT BusinessPartnerPartnerGroupTypeCode is:

<BusinessPartnerPartnerGroupTypeCode>1234</BusinessPartnerPartnerGroupTypeCode>

In certain implementations, GDT BusinessPartnerPartnerGroupTypeCode may have the following structure:

| GDT | | Cat. | Object Class Qualifier | Object Class | Property | Represen-tation/As-sociation | Type | Type Name | Len. | Card. | Remarks |
|---|---|---|---|---|---|---|---|---|---|---|---|
| Business-Partner-Partner-Group Type-Code | | | Business Partner | Partner Group | Type | Code | CDT | Code | 1..4 | | Restricted |
| | listID | A | | Code List | Identifi-cation | Identifier | Xsd | token | | 0..1 | |
| | listVersionID | A | | Code List | Version | Identifier | xsd | token | | 0..1 | |
| | listAgencyID | A | | Code List Agency | Identifi-cation | Identifier | xsd | token | | 0..1 | |
| | listAgency-SchemeID | A | | Code List Agency | Scheme | Identifier | xsd | token | | 0..1 | |
| | listAgency-SchemeAgencyID | A | | Code List Agency | Scheme Agency | Identifier | xsd | token | | 0..1 | |

For GDT BusinessPartnerPartnerGroupTypeCode, a customer-specific code list can be assigned to the code. A listID can be "10092." A listAgencyID can be the ID of the customer (e.g., ID from DE 3055, if listed there). A listVersionID can be the version of the particular code list (e.g., assigned and managed by the customer). A listAgencySchemeID can be the ID of the scheme if the listAgencyID does not come from DE 3055. The listAgencySchemeAgencyID can be the ID of the organization from DE 3055 that manages the listAgency-SchemeID scheme.

For GDT BusinessPartnerPartnerGroupTypeCode examples of possible semantics for codes can be household (e.g., the partner group would be the persons living in a household) and joint heirship (e.g., the partner group would be the members of a joint heirship).

The following dictionary object can be assigned to the GDT BusinessPartnerPartnerGroupTypeCode: Data element (e.g., BU_GRPTYP).

BusinessPartnerPaymentCardDetailsID

A GDT BusinessPartnerPaymentCardDetailsID is a identifier for the business partner payment card details. PaymentCardDetails can contain the relationship of business partner with a payment or credit card. Such a relationship can include a payment card and other details that can describe the significance of the payment card for the business partner. An example of GDT BusinessPartnerPaymentCardDetailsID is:

<BusinessPartnerPaymentCardDetailsID>123456</BusinessPartnerPaymentCardDetailsID>

In certain implementations, GDT BusinessPartnerPaymentCardDetailsID may have the following structure:

| GDT | Object Class | Property | Representation/ Association | Type | Type Name | Len. | Remarks |
|---|---|---|---|---|---|---|---|
| Business-Partner-Payment-CardDetailsID | Business Partner Payment Card Details | Identification | Identifier | CDT | Identifier | 1..6 | Restricted |

The GDT BusinessPartnerPaymentCardDetailsID can be used to identify the payment card details of a business partner.

The following dictionary object can be assigned to the GDT BusinessPartnerPaymentCardDetailsID: Data element (e.g., BU_CCID).

BusinessPartnerRelationshipCategoryCode

A GDT BusinessPartnerRelationshipCategoryCode is the description, in the form of a code, of a business partner relationship. A category of a business partner relationship can describe the nature of relationships between business partners, and can establish the basic characteristics for relationships of this category. An example of GDT BusinessPartnerRelationshipCategoryCode is:

<BusinessPartnerRelationshipCategoryCode>12WE45</BusinessPartnerRelationshipCategoryCode>

In certain implementations, GDT BusinessPartnerRelationshipCategoryCode may have the following structure:

| GDT | | Cat. | Object Class | Property | Representation/ Association | Type | Type Name | Len. | Card. | Remarks |
|---|---|---|---|---|---|---|---|---|---|---|
| Business-PartnerRe-lationship-Category-Code | | | Business Partner Relationship | Category | Code | CDT | Code | 1..6 | | Restricted |
| | listID | A | Code List | Identification | Identifier | xsd | token | | 0..1 | |
| | listAgencyID | A | Code List Agency | Identification | Identifier | xsd | token | | 0..1 | |
| | list-Versio | A | Code List | Version | Identifier | xsd | token | | 0..1 | |
| | nIDAgency-SchemeID | A | Code List Agency | Scheme | Identifier | xsd | token | | 0..1 | |
| | listAgency-SchemeAgencyID | A | Code List Agency | Scheme Agency | Identifier | xsd | token | | 0..1 | |

For GDT BusinessPartnerRelationshipCategoryCode alternative code lists differ at configuration and/or runtime. A listID can be a ID of the particular code list (e.g., assigned and administered by a customer) where the customer usually is responsible for the values of the ID in question. If the code list is unchanged, a listAgencyID can be "310." Otherwise, a listAgencyID can be the ID of the customer (e.g., ID from DE 3055, if listed there). A listVersionID can be the version of the particular code list (e.g., assigned and managed by the customer). A listAgencySchemeID can be the ID of the scheme if the listAgencyID does not come from DE 3055. The listAgencySchemeAgencyID can be the ID of the organization from DE 3055 that manages the listAgencySchemeID scheme.

For GDT BusinessPartnerRelationshipCategoryCode examples of the possible semantics of the codes can be: Contact Person Relationship (i.e., the business partner A is a contact person of business partner B) or Shareholder Relationship (i.e., the business partner A is a shareholder of business partner B.

The following dictionary objects can be assigned to the GDT BusinessPartnerRelationshipCategoryCode: Data element (e.g., BU_RELTYP) and Domain (e.g., BU_RELTYP).

The data type GDT BusinessPartnerRelationshipCategoryCode may use the following codes: BUR001 (i.e., contact person relationship), BUR002 (i.e., activity partner relationship), BUR003 (i.e., shared living arrangement relationship), BUR004 (i.e., marriage relationship), BUR006 (i.e., alias, identity relationship), BUR010 (i.e., employee relationship), BUR011 (i.e., employee responsible relationship), BUR013 (i.e., replacement relationship), BUR020 (i.e., department relationship), BUR021 (i.e., parent-child relationship), BUR022 (i.e., guardian relationship), BUR023 (i.e., relative relationship), BUR024 (i.e., marriage partnership relationship), BURC01 (i.e., shareholder relationship).

BusinessPartnerRelationshipRoleCode

A GDT BusinessPartnerRelationshipRoleCode is the coded representation of a relationship role that can exist between two business partners. An example of GDT BusinessPartnerRelationshipRoleCode is:

<BusinessPartnerRelationshipRoleCode>BUR001-1</BusinessPartnerRelationshipRoleCode>

In certain implementations, GDT BusinessPartnerRelationshipRoleCode may have the following structure:

| GDT | | Cat. | Object Class | Property | Representation/ Association | Type | Type Name | Len. | Card. | Remarks |
|---|---|---|---|---|---|---|---|---|---|---|
| Business-Partner-Relationship-Role-Code | | | Business Partner Relationship | Role | Code | CDT | Code | 1..8 | | Restricted |
| | listID | A | Code List | Identification | Identifier | xsd | token | | 0..1 | |
| | listAgencyID | A | Code List Agency | Identification | Identifier | xsd | token | | 0..1 | |
| | list-Versio | A | Code List | Version | Identifier | xsd | token | | 0..1 | |
| | nIDAgency-SchemeID | A | Code List Agency | Scheme | Identifier | xsd | token | | 0..1 | |
| | listAgency-SchemeAgencyID | A | Code List Agency | Scheme Agency | Identifier | xsd | token | | 0..1 | |

For GDT BusinessPartnerRelationshipRoleCode, a customer-specific code list can be assigned to the code. A listID can be "10419." If the code list is unchanged, a listAgencyID can be "310." Otherwise, a listAgencyID can be the ID of the customer (e.g., ID from DE 3055, if listed there). A listVersionID can be the version of the particular code list (e.g., assigned and managed by the customer). A listAgencySchemeID can be the ID of the scheme if the listAgencyID does not come from DE 3055. The listAgencySchemeAgencyID can be the ID of the organization from DE 3055 that manages the listAgencySchemeID scheme.

In certain implementations, if changing direction of the relationship category changes the semantics, the GDT then can contain two code values that can result from the following formulas:

<Code value in GDT BusinessPartnerRelationshipCategoryCode>−1

<Code value in GDT BusinessPartnerRelationshipCategoryCode>−2

For example, Business partner A Is Shareholder Of business partner B or Business partner A Has Shareholder business partner B.

In certain implementations, if changing direction of the relationship category does not change the semantics, the GDT then can contain one code value that can result from the following formula:

<Code value in GDT BusinessPartnerRelationshipCategoryCode>−0

For example, Business partner A Is Married To business partner B or Business partner B Is Married To business partner A.

For GDT BusinessPartnerRelationshipRoleCode examples of the possible semantics of the codes can be: Is heir of (e.g., business partner A is the heir of business partner B) or Has the vendor (i.e., Business partner A has the vendor business partner B).

The GDT BusinessPartnerRelationshipCategoryCode (described above) is the code for a relationship, whereas the GDT BusinessPartnerRelationshipRoleCode is the code for the role that business partner has when in a relationship.

The data type GDT BusinessPartnerRelationshipRoleCode may have the following codes: BUR001-1 (i.e., has contact person), BUR001-2 (i.e., is contact person for), BUR002-1 (i.e., has activity partner), BUR002-2 (i.e., is activity partner for), BUR003-1 (i.e., has shared living arrangement member), BUR003-2 (i.e., belongs to shared living arrangement), BUR004-0 (i.e., is married to), BUR006-0 (i.e., is identical to), BUR01-1 (i.e., has the employee responsible), BUR011-2 (i.e., is the employee responsible for), BUR013-1 (i.e., is replaced by), BUR013-2 (i.e., replaces), BUR020-1 (i.e., has department), BUR020-2 (i.e., is department of), BUR021-1 (i.e., has child), BUR021-2 (i.e., is child of), BUR022-1 (i.e., is guardian), BUR022-2 (i.e., has guardian), BUR023-0 (i.e., is related to), BUR024-1 (i.e., has partner in marriage partnership), BUR024-2 (i.e., belongs to marriage partnership), BURC01-1 (i.e., is shareholder of), BURC01-2 (i.e., has shareholder).

In certain implementations, the GDT BusinessPartnerRelationshipRoleCode may include BusinessPartnerRelationshipRoleCodeCodeContextElements. A BusinessPartnerRelationshipRoleCodeCodeContextElements can define a dependency or an environment in which the BusinessPartnerRelationshipRoleCode appears. The environment can be described by context categories. With the context categories in BusinessPartnerRelationshipRoleCodeCodeContextElements, the valid portion of code values of BusinessPartnerRelationshipRoleCode can be restricted according to an environment during use.

In certain implementations, GDT BusinessPartnerRelationshipRoleCodeCodeContextElements may have the following structure:

| GDT | | Cat. | Object Class | Property | Representation/ Association | Type | Type Name | Card. |
|---|---|---|---|---|---|---|---|---|
| Business-Partner-Relationship-RoleCodeContextElements | | | Business Partner-Relationship Role Code Context Elements | | Details | | | |
| | Business-PartnerCategory-Code | | Business Partner-Relationship Role Code Context Elements | Business Partner Category Code | Code | GDT | BusinessPartnerCategory-Code | 0..1 |
| | Relationship-Business PartnerCategory-Code | | Business Partner-Relationship Role Code Context Elements | Relationship_ Business Partner Category Code | Code | GDT | BusinessPartnerCategory-Code | 0..1 |

For the BusinessPartnerRelationshipRoleCodeCodeContextElements structure described above, BusinessPartnerCategoryCode can specify the context (e.g., category of business partner from whose perspective the relationship is viewed). In this way, possible roles can be determined for the business partner. The GDT BusinessPartnerCategoryCode (described above) can specify the context (e.g., category of business partner with whom the relationship exists). In this way, possible roles can be determined for the business partner involved.

BusinessPartnerRelationshipSubCategoryCode

A GDT BusinessPartnerRelationshipSubCategoryCode represents, in the form of a code, a subcategory of the GDT BusinessPartnerRelationshipCategoryCode (described above). The GDT BusinessPartnerRelationshipSubCategoryCode can represent a refinement of the business partner relationship category. An example of GDT BusinessPartnerRelationshipSubCategoryCode is:

<BusinessPartnerRelationshipSubCategoryCode>1A3</BusinessPartnerRelationshipSubCategoryCode>

In certain implementations, GDT BusinessPartnerRelationshipSubCategoryCode may have the following structure:

| GDT | | Cat. | Object Class | Property | Representation/ Association | Type | Type Name | Len. | Card. | Remarks |
|---|---|---|---|---|---|---|---|---|---|---|
| Business-PartnerRe-lationship-Sub-Category-Code | | | Business Partner Relationship | Sub Category | Code | CDT | Code | 1..4 | | Restricted |
| | listID | A | Code List | Identification | Identifier | xsd | token | | 0..1 | |
| | listAgencyID | A | Code List Agency | Identification | Identifier | xsd | token | | 0..1 | |
| | list-Versio | A | Code List | Version | Identifier | xsd | token | | 0..1 | |
| | nIDAgency-SchemeID | A | Code List Agency | Scheme | Identifier | xsd | token | | 0..1 | |
| | listAgency-SchemeAgencyID | A | Code List Agency | Scheme Agency | Identifier | xsd | token | | 0..1 | |

For GDT BusinessPartnerRelationshipSubCategoryCode alternative code lists can exist that can differ at configuration and/or runtime. A customer-specific code list can be assigned to the code. A listID can be "10327." If the code list is unchanged, a listAgencyID can be "310." Otherwise, a listAgencyID can be the ID of the customer (e.g., ID from DE 3055, if listed there). A listVersionID can be the version of the particular code list (e.g., assigned and managed by the customer). A listAgencySchemeID can be the ID of the scheme if the listAgencyID does not come from DE 3055. The listAgencySchemeAgencyID can be the ID of the organization from DE 3055 that manages the listAgencySchemeID scheme.

A code value of GDT BusinessPartnerRelationshipSubCategoryCode may be assigned to a code value of GDT BusinessPartnerRelationshipCategoryCode (described above). A code value of GDT BusinessPartnerRelationshipSubCategoryCode can be assigned to a code value of GDT BusinessPartnerRelationshipCategoryCode (described above).

The GDT BusinessPartnerRelationshipSubCategoryCode can be used to differentiate a business partner relationship category in more detail. In certain implementations, a subcategory is not assigned to a business partner relationship category.

For GDT BusinessPartnerRelationshipSubCategoryCode examples of possible semantics for codes are: Minority shareholding (i.e., the shareholder relationship is based on minority shareholding), Majority shareholding (i.e., the shareholder relationship is based on majority shareholding), Reciprocal shareholding (i.e., the shareholder relationship is based on reciprocal shareholding), Co-guardianship (i.e., the guardianship relationship is based on co-guardianship; meaning that guardianship is carried out jointly with another guardian), or a type of supervisory guardianship that exists in German or other law (i.e., the guardianship relationship is based on supervisory guardianship; meaning that the purpose of this guardianship is to monitor how the guardian does his job).

The following dictionary objects can be assigned to the GDT BusinessPartnerRelationshipSubCategoryCode: Data element (e.g., BU_RELKIND), Domain (e.g., BU_RELKIND).

BusinessPartnerRoleCategoryCode

A GDT BusinessPartnerRoleCategoryCode is the coded representation of a BusinessPartnerRoleCategory. A BusinessPartnerRoleCategory is a grouping of BusinessPartnerRoles. An example of GDT BusinessPartnerRoleCategoryCode is:

<BusinessPartnerRoleCategoryCode>BUP001</BusinessPartnerRoleCategoryCode>

In certain implementations, GDT BusinessPartnerRoleCategoryCode may have the following structure:

| GDT | | Cat. | Object Class | Property | Representation/ Association | Type | Type Name | Len. | Card. | Remarks |
|---|---|---|---|---|---|---|---|---|---|---|
| Business-PartnerRole-Category-Code | | | Business Partner | Role Category | Code | CDT | Code | 1..6 | | Restricted |
| | listID | A | Code List | Identification | Identifier | xsd | token | | 0..1 | |
| | listAgencyID | A | Code List Agency | Identification | Identifier | xsd | token | | 0..1 | |
| | list-Versio | A | Code List | Version | Identifier | xsd | token | | 0..1 | |
| | IDAgency-SchemeID | A | Code List Agency | Scheme | Identifier | xsd | token | | 0..1 | |

-continued

| GDT | | Cat. | Object Class | Property | Representation/ Association | Type | Type Name | Len. | Card. | Remarks |
|---|---|---|---|---|---|---|---|---|---|---|
| | listAgency-SchemeAgencyID | A | Code List Agency | Scheme Agency | Identifier | xsd | token | | 0..1 | |

For GDT BusinessPartnerRoleCategoryCode alternative code lists can exist that differ at configuration and/or runtime. A customer-specific code list can be assigned to the code. A listID can be "10249." If the code list is unchanged, a listAgencyID can be "310." Otherwise, a listAgencyID can be the ID of the customer (e.g., ID from DE 3055, if listed there). A listVersionID can be the version of the particular code list (e.g., assigned and managed by the customer). A listAgency-SchemeID can be the ID of the scheme if the listAgencyID does not come from DE 3055. The listAgencySchemeAgencyID can be the ID of the organization from DE 3055 that manages the listAgencySchemeID scheme.

Each business partner can be an instance of the Business-Partner business object. A business partner can be instantiated for another business object using a code for the BusinessPartnerRoleCategory according to the table shown below. These business objects can be projections of the Business Partner Template.

| Name | Customer | Supplier | Em-ployee | House Bank | Clearing House | Tax Authority |
|---|---|---|---|---|---|---|
| Contact person | | | | | | |
| Prospect | X | | | | | |
| Responsible Employee | | | X | | | |
| Vendor | | X | | | | |
| Bidder | | X | | | | |
| Portal provider | | X | | | | |
| House bank | | | | X | | |
| Clearing house | | | | | X | |
| Tax office | | | | | | X |

For GDT BusinessPartnerRoleCategoryCode the distinction between BusinessPartnerRoleCategoryCode and PartyRoleCategoryCode GDT is as follows: a PartyRoleCategory is a grouping of PartyRoles according to process-controlling criteria and can specify which rights and obligations the Party has in Global Data Types (e.g., definition corresponding processes) and a BusinessPartnerRoleCategory is a grouping of BusinessPartnerRoles and can classify a business partner according to business criteria.

The following dictionary objects can be assigned to the GDT BusinessPartnerRoleCategoryCode: Data element (e.g., BU_PARTNERROLECAT) and Domain (e.g., BU_ROLECAT).

When requesting a new BusinessPartnerRoleCategory, a check may be made as to whether PartyRoleCategories exist that need to be assigned to the role type.

The data type GDT BusinessPartnerRoleCategoryCode may use the following codes: BUP001 (i.e., contact person), BUP002 (i.e., prospect), BUP003 (i.e., responsible employee), BBP000 (i.e., vendor), BBP001 (i.e., bidder), BBP002 (i.e., portal provider), PAY001 (i.e., house bank), PAY002 (i.e., clearing house), TAX001 (i.e., tax office).

BusinessPartnerRoleCode

A GDT BusinessPartnerRoleCode is the coded representation of a BusinessPartnerRole. A BusinessPartnerRole can classify a business partner according to business criteria. An example of GDT BusinessPartnerRoleCode is:

<BusinessPartnerRoleCode>BUP002</BusinessPartner-RoleCode>

In certain implementations, GDT BusinessPartnerRoleCategoryCode may have the following structure:

| GDT | | Cat. | Object Class | Property | Representation/ Association | Type | Type Name | Len. | Card. | Remarks |
|---|---|---|---|---|---|---|---|---|---|---|
| Business-Partner-RoleCode | | | Business Partner | Role | Code | CDT | Code | 1..6 | | Restricted |
| | listID | A | Code List | Identification | Identifier | xsd | token | | 0..1 | |
| | listAgencyID | A | Code List Agency | Identification | Identifier | xsd | token | | 0..1 | |
| | listVersionID | A | Code List | Version | Identifier | xsd | token | | 0..1 | |
| | listAgency-SchemeID | A | Code List Agency | Scheme | Identifier | xsd | token | | 0..1 | |
| | listAgency-SchemeAgencyID | A | Code List Agency | Scheme Agency | Identifier | xsd | token | | 0..1 | |

For GDT BusinessPartnerRoleCode alternative code lists can exist that can differ at configuration and/or runtime. A listID can be “10248.” If the code list is unchanged, a listAgencyID can be “310.” Otherwise, a listAgencyID can be the ID of the customer (e.g., ID from DE 3055, if listed there). A listVersionID can be the version of the particular code list (e.g., assigned and managed by the customer). A listAgencySchemeID can be the ID of the scheme if the listAgencyID does not come from DE 3055. The listAgencySchemeAgencyID can be the ID of the organization from DE 3055 that manages the listAgencySchemeID scheme.

In certain implementations, a BusinessPartnerRole can be assigned to a BusinessPartnerRoleCategory according to the following table:

| Code | Name | Customer | Supplier | Employee | House Bank | Clearing House | Tax Authority |
|---|---|---|---|---|---|---|---|
| BUP 001 | Contact person | | | | | | |
| BUP 002 | Prospect | X | | | | | |
| BUP 003 | Responsible Employee | | | X | | | |
| BBP 000 | Vendor | | X | | | | |
| BBP 001 | Bidder | | X | | | | |
| BBP 002 | Portal provider | | X | | | | |
| PAY 001 | House bank | | | | X | | |
| PAY 002 | Clearing house | | | | | X | |
| TAX 001 | Tax office | | | | | | X |

For GDT BusinessPartnerRoleCategoryCode the distinction between BusinessPartnerRole and PartyRole is as follows: a PartyRole can specify which rights and obligations the Party has in Global Data Types (e.g., definition corresponding processes) and a BusinessPartnerRole can authorize a business partner to assume certain rights and roles in a process for the corresponding configuration. However, there can also be PartyRoles that any or all business partners may assume regardless of BusinessPartnerRole.

The following Dictionary objects can be assigned to the GDT BusinessPartnerRoleCategoryCode: Data element (e.g., BU_PARTNERROLE) and Domain (e.g., BU_ROLE).

For data type GDT BusinessPartnerRoleCode, multiple BusinessPartnerRoles can be assigned to a BusinessPartnerRoleCategory. A BusinessPartnerRole can be designated as default. In certain implementations, a BusinessPartnerRoleCategory can be assigned to a BusinessPartnerRole.

The data type GDT BusinessPartnerRoleCategoryCode may use the following codes: BUP001 (i.e., contact person), BUP002 (i.e., prospect), BUP003 (i.e., responsible employee), BBP000 (i.e., vendor), BBP001 (i.e., bidder), BBP002 (i.e., portal provider), PAY001 (i.e., house bank), PAY002 (i.e., clearing house), TAX001 (i.e., tax office).

BusinessProcessVariantTypeCode

A GDT BusinessProcessVariantTypeCode is a coded representation of a business process variant type. A business process variant type can determine the character of a business process variant. It can represent a typical way of processing within a process component from a business point of view. A process component is a software package that realizes a business process and exposes its functionality as services. The functionality can contain business transactions. An example of GDT BusinessProcessVariantTypeCode is:

<BusinessProcessVariantTypeCode>1</BusinessProcessVariantTypeCode>

In certain implementations, GDT BusinessProcessVariantTypeCode may have the following structure:

| GDT | Object Class | Property | Representation/Association | Type | Type Name | Len. | Remarks |
|---|---|---|---|---|---|---|---|
| BusinessProcessVariantTypeCode | Business Process Variant | Type | Code | CDT | Code | 1..4 | Restricted |

The data type GDT BusinessProcessVariantTypeCode may assign a code list to the code. The attributes may be assigned the following values: listID=“10495,” listAgencyID=“310,” and listVersionID=ID of the particular code list (e.g., assigned and managed by the customer).

A business process variant type can be assigned to a process component. A process component can contain one or more business process variant types.

Business process variant types can restrict the interactions a process component has. A business process variant type can define the needed process component interaction models and hence the active outbound agents. In certain implementations, it is a parameter in the relevance condition of an outbound agent. An Integration scenario can restrict the allowed or needed business process variant types for all process components of the integration scenario. Business process variant types can be related to questions in business configuration scoping (e.g., Business Topics). They can restrict the consistent configuration possibilities. Business objects with process variability can have an element to handle the business process variant type on the “process carrying unit” (e.g., header, item, or other node). Business process variant types can be used to transfer information about an executed process step in messages to subsequent process components.

The business process variant type could be considered as a refinement of the process component and can deliver therefore an additional degree of transparency for the process models. A business process variant type can be a development entity. Business process variant types can be defined from the point of view of the Process Component they belong to.

BusinessScopeBusinessProcess

The GDT BusinessScopeBusinessProcess describes the business process aspects of the environment from which a message is sent. The BusinessScopeBusinessProcess can include a business description of the business process as well as technical aspects of it such as transaction protocols (e.g., UN/CEFACT Transaction Pattern). An example of GDT BusinessScopeBusinessProcess is:

<PurchaseOrderRequest> <MessageHeader> <BusinessScopeBusinessProcess> <TypeCode>1</TypeCode> <InstanceID>42d3cfca-5996-57b0-e100-00000a44201b</InstanceID> </BusinessScopeBusinessProcess> </MessageHeader> . . . </PurchaseOrderRequest>

In certain implementations, GDT BusinessScopeBusinessProcess may have the following structure:

| GDT | | Cat. | Object Class | Property | Representation/ Association | Type | Type Name | Card. |
|---|---|---|---|---|---|---|---|---|
| Business-ScopeBusinessProcess | | | Business Scope Business Process | | Details | | | |
| | TypeCode | E | Business Scope Business Process | Type | Code | GDT | Business-ScopeBusinessProcessType-Code | 1..1 |
| | InstanceID | E | Business Scope Business Process | Instance Identification | Identifier | GDT | Business-ScopeBusinessProcess-InstanceID | 0..1 |

For the GDT BusinessScopeBusinessProcess structure described above, TypeCode specifies the type of BusinessScopeBusinessProcess (e.g., a client transaction in the a TUC/C protocol or an ebXML: BusinessService). InstanceID is an identifier for the instance of the BusinessScopeBusinessProcess (e.g., transaction instance, service instance).

The following integrity condition can apply depending on the choice of TypeCode: InstanceID may contain an ID that can identify that technical client transaction in which the message was created.

The GDT BusinessScopeBusinessProcess can be used as part of the BusinessDocumentMessageHeader in messages. Both, the business environment or scenario in which messages are exchanged as well as the technical details of the communication (e.g., the transaction protocol) can influence how and according to what rules these messages should be processed by the receiving system. Example scenarios are: trade within the EU versus outside the EU, payment via invoice versus cash on delivery (i.e., COD), and tentative Update & Confirm/Compensate Protocol.

Systems can have these rules coded into the application. As a result, different rules can correspond to different coding passages used for message processing. By using the BusinessScopeBusinessProcess in the BusinessDocumentMessageHeader, this information can be forced up front so that all types of systems that have to process the message (e.g., this may also apply to middle ware systems that have to pass on the message) can select the correct set of rules without having to analyze the message itself. In particular, this also can work if the payload of the message is encrypted.

The data type GDT BusinessScopeBusinessProcess can be based on the Business Scope block of the UN/CEFACT Standard Business Document Header.

BusinessScopeBusinessProcessInstanceID

A GDT BusinessScopeBusinessProcessInstanceID is an identifier for the instance of a BusinessScopeBusinessProcess. The BusinessScopeBusinessProcess can describe the business process aspects of the environment from which a message is sent. The BusinessScopeBusinessProcess can include a business description of the business process as well as technical aspects such as transaction protocols (e.g., UN/CEFACT Transaction Pattern). An example of GDT BusinessScopeBusinessProcess InstanceID is:

<BusinessScopeBusinessProcess> <TypeCode>1</TypeCode> <InstanceID>42d3cfca-5996-57b0-e100-00000a44201b<InstanceID> </BusinessScopeBusinessProcess>

In certain implementations, GDT BusinessScopeBusinessProcess InstanceID may have the following structure:

| GDT | | Cat. | Object Class | Property | Representation/ Association | Type | Type Name | Len. | Card. | Remarks |
|---|---|---|---|---|---|---|---|---|---|---|
| Business-Scope-Business-Process-InstanceID | | | Business Scope Business Process | Instance Identification | Identifier | CDT | Identifier | 1..36 | | restricted |
| | schemeID | A | Identification Scheme | Identification | Identifier | xsd | token | 1..60 | 0..1 | |
| | scheme-AgencyID | A | Identification Scheme-Agency | Identification | Identifier | xsd | token | 1..60 | 0..1 | |

The GDT BusinessScopeBusinessProcessInstanceID can identify those instances of a BusinessScopeBusinessProcess that correspond to an entry in the code list of the GDT BusinessScopeBusinessProcessTypeCode (described below). For the schemeID "ClientTransactionUUID" the instance identifier is a UUID of a client transaction in the Tentative Update & Confirm/Compensate protocol.

The GDT BusinessScopeBusinessProcessInstanceID may be used with a BusinessScopeBusinessProcessTypeCode. The value of the attribute schemeID can correspond to the type of business process of the BusinessScopeBusinessProcessTypeCode.

The GDT BusinessScopeBusinessProcessInstanceID can be used in the BusinessDocumentMessageHeader to identify the instance of a business process as part of which the message is sent. This description can include transaction protocols at application level (e.g., a client transaction in a TUC/C protocol or an ebXML: BusinessService).

BusinessScopeBusinessProcessTypeCode

A GDT BusinessScopeBusinessProcessTypeCode is a coded representation of the type of a BusinessScopeBusinessProcess. The BusinessScopeBusinessProcess can describe the business process aspects of the environment from which a message is sent. The BusinessScopeBusinessProcess can include a business description of the business process as well as technical aspects such as transaction protocols (e.g., UN/CEFACT Transaction Pattern). An example of GDT BusinessScopeBusinessProcessTypeCode is: <BusinessScopeBusinessProcess> <TypeCode>1</TypeCode> <InstanceIdentifier>42d3cfca-5996-57b0-e100-00000a44201b</InstanceIdentifier> </BusinessScopeBusinessProcess>

In certain implementations, GDT BusinessScopeBusinessProcessTypeCode may have the following structure:

| GDT | | Cat. | Object Class | Property | Representation/ Association | Type | Type Name | Len. | Card. |
|---|---|---|---|---|---|---|---|---|---|
| Business-Scope-Business-Pro-cessTypeCode | | | Business Scope Business Process | Type | Code | CDT | Code | 1..4 | |
| | listID | A | Code-List | Identification | Identifier | xsd | token | | 0..1 |
| | listAgencyID | A | Code-ListAgency | Identification | Identifier | xsd | token | | 0..1 |
| | listVersionID | A | Code-List | Version | Identifier | xsd | token | | 0..1 |
| | listAgency-Scheme | A | Code-ListAgency | Scheme | Identifier | xsd | token | | 0..1 |
| | IDAgency-Scheme Agency ID | A | Code-ListAgency | Scheme-Agency | Identifier | xsd | token | | 0..1 |

In some implementations, for GDT BusinessScopeBusinessProcessTypeCode several alternative code lists, which can be different at runtime, can be assigned to the GDT BusinessScopeBusinessProcessTypeCode.

The GDT BusinessScopeBusinessProcessTypeCode can be used as part of the BusinessDocumentMessageHeader in messages.

The code value "Client Transaction" can be used for the Tentative Update & Confirm/Compensate protocol for synchronous write-access messages. In this protocol, the client can send synchronous messages to the receiver. The receiver may post these messages tentatively. Tentatively can mean that the receiver can be able to roll back the data if the technical transaction in which the client sent the messages fails. For this reason, the client sends an asynchronous message at the end of the transaction informing the receiver whether the transaction was successful. If the transaction was successful, the message can be a confirmation message and the receiver may have to convert the tentative updates into permanent updates. If the transaction failed, the message can be a compensate message and the receiver has to roll back tentative updates that belong to the transaction. From the BusinessScopeBusinessProcess, the receiver can take the client transaction to determine which synchronous messages the asynchronous message relates to. In certain implementations, it can be used in messages utilizing this protocol.

The data type GDT BusinessScopeBusinessProcessTypeCode may use the following code: 1 (i.e., client transaction).

BusinessSystemID

A GDT BusinessSystemID is a identifier for a business system. A business system is one that participates in message exchange either as a sending or receiving system. An example of GDT BusinessSystemID is:

<BusinessSystemID>AE1__805</BusinessSystemID>

In certain implementations, GDT BusinessSystemID may have the following structure:

| GDT | Object Class | Property | Representation/ Association | Type | Type Name | Len. |
|---|---|---|---|---|---|---|
| Business-SystemID | Business System | Identifi-cation | Identifier | CDT | Identifier | 1..60 |

For the data type GDT BusinessSystemID alphanumerical characters can be permitted.

The GDT BusinessSystemID can be designated for use within a system landscape. The GDT BusinessSystemID can be used to identify the source and target system of data. For example, in the SLD (i.e., System Landscape Directory), the BusinessSystemID is the identification of a system in a system landscape.

The GDT BusinessSystemID can be represented by the data element SLD_BSKEY.

BusinessTransactionDocumentBankAccount

According to general business understanding, a GDT BusinessTransactionDocumentBankAccount can contain the information exchanged in business documents about a bank account involved in business transactions. A bank account can record a customer's bank transactions. An example of GDT BusinessTransactionDocumentBankAccount is:

<BusinessTransactionDocumentBankAccount> <ID>0078400542</ID> <CurrencyCode>EUR</CurrencyCode> <HolderName>Max Mayermann</HolderName> <Bank> <StandardID>COBADEHDXXX</StandardID> <RoutingID>20041111</RoutingID> <RoutingIDTypeCode>BL</RoutingIDTypeCode> <CountryCode>DE<CountryCode> </Bank> </BusinessTransactionDocumentBankAccount>

In certain implementations, GDT BusinessTransactionDocumentBankAccount may have the following structure:

| GDT | | Cat. | Object Class | Property | Representation/ Association | Type | Type Name | Len. | Card. | Remarks |
|---|---|---|---|---|---|---|---|---|---|---|
| Business-Transaction-Document-BankAccount | | | Business-Transaction Document Bank Account | | Details | | | | | |
| | ID | E | Business-Transaction Document Bank Account | Identification | Identifier | GDT | Bank-AccountID | | 0..1 | |
| | ID-Check-Digit-Value | E | Business-Transaction Document Bank Account | ID Check Digit | Value | GDT | Bank-AccountID Check-Digit-Value | | 0..1 | |
| | InternalID | E | Business-Transaction Document Bank Account | Internal_ Identification | Identifier | GDT | Bank-Account-InternalID | | 0..1 | |
| | StandardID | E | Business-Transaction Document Bank Account | Standard_ Identification | Identifier | GDT | Bank-Account-StandardID | | 0..1 | |
| | Type-Code | E | Business-Transaction Document Bank Account | Type | Code | GDT | Bank-Account-Type-Code | | 0..1 | |
| | Currency-Code | E | Business-Transaction Document Bank Account | Currency | Code | GDT | Currency-Code | | 0..1 | |
| | Holder Name | E | Business-Transaction Document Bank Account | Holder Name | Name | GDT | Bank-Account-Holder Name | | 0..1 | |
| | Description | E | Business-Transaction Document Bank Account | Description | Text | GDT | Description | 1..50 | 0..1 | restricted |
| | Bank | E | Business-Transaction Document Bank Account | Bank | Details | GDT | Bank | | 0..1 | |

For the GDT BusinessTransactionDocumentBankAccount structure described above, ID is a bank account number (e.g., Basic Bank Account Number, BBAN), which is an account number that can be assigned by the account managing bank. It can identify a bank account in most countries together with the bank. IDCheckDigitValue is a check digit for the bank account number (e.g., ID). InternalID is a proprietary identifier for the bank account that can be used when both sender and recipient can access shared master data (e.g., extended enterprise). StandardID is an international bank account number (e.g., International Bank Account Number, IBAN). TypeCode is a type of account. CurrencyCode is a account currency. HolderName is a name of the account holder. Description is the description of the account. Bank can be the bank where the account is held.

To identify a bank account, the InternalID, StandardID, or ID may be entered. In certain implementations, the bank should also be entered, however, it may not be entered if the ID does not exists. If a check digit belongs to the ID, it can be entered in IDCheckDigitValue. In certain implementations, the IDCheckDigitValue can be entered if the ID has been filled.

BusinessTransactionDocumentGroupID

A GDT BusinessTransactionDocumentGroupID can identify a group of business documents that are to be considered as one group within a business process. An example of GDT BusinessTransactionDocumentGroupID is:
<DeliveryGroupID>4711</DeliveryGroupID>

In certain implementations, GDT BusinessTransactionDocumentGroupID may have the following structure:

| GDT | Object Class | Property | Representation/ Association | Type | Type Name | Length | Remarks |
|---|---|---|---|---|---|---|---|
| Business-Transac-tionDocu-ment-GroupID | Business Transac-tion Document | Group Identifica-tion | Identifier | CDT | Identifier | 1..10 | restricted |

The GDT BusinessTransactionDocumentGroupID can be used to identify documents that belong together to enable them to be processed together by the application.

"BusinessTransactionDocument" can be replaced by the description of each document in the XML instance (e.g., "PurchaseOrder" for a purchase order and "Delivery" for a delivery, etc.).

BusinessTransactionDocumentID

A GDT BusinessTransactionDocumentID is a identifier for a business transaction document. An example of GDT BusinessTransactionDocumentID is:

<PurchaseOrderID schemeID="BTD.001"schemeAgencyID="SYS__010"schemeAgencySchemeAgencyID="ZZZ">54 00000012</PurchaseOrderID>

In certain implementations, GDT BusinessTransactionDocumentID may have the following structure:

The GDT BusinessTransactionDocumentID may be used in the context of an attribute value. In the case of incompatible business systems, then the ID can be used in the context of the business partner. The respective business partner may come from the interface documentation. If the business partner has more than one business system, then the BusinessTransactionDocumentIDs may be used with the same schemeID, so that additional attributes of the schemeAgencyID and schemeAgencySchemeAgencyID may also be specified. In the case of compatible business systems the attribute schemeAgencyID in the specified business system can be guaranteed.

The GDT BusinessTransactionDocumentID can be used to identify a document in a business transaction (e.g., a purchase order or an invoice in a business process). The first partner

| GDT | | Cat. | Object Class | Property | Representation/ Association | Type | Type Name | Len. | Card. | Remarks |
|---|---|---|---|---|---|---|---|---|---|---|
| Business-Trans-action-Docu-mentID | | | Business Trans-action Document | Identifi-cation | Identifier | CCT | Identifier | 1..35 | | Restricted |
| | Scheme-ID | A | Identification Scheme | Identifi-cation | Identifier | xsd | token | 1..60 | 0..1 | |
| | Scheme-Agency-ID | A | Identification Scheme Agency | Identifi-cation | Identifier | xsd | token | 1..60 | 0..1 | |
| | Scheme-Agency-Scheme Agency-ID | A | Identifi-cation Scheme Agency | Scheme Agency | Identifier | xsd | token | 1..3 | 0..1 | |

In certain implementations, the length allowed for the BusinessTransactionDocumentID can be up to 35 characters, which can take into account the xsd-string-defined constraints. References to external documents in applications can be stored with a 35 character string, in order to handle long document IDs from external systems.

For data type GDT BusinessTransactionDocumentID the following attributes may be assigned. A schemeID (e.g., BTD<TypeCode>or BTDGUID<TypeCode>) can be the type code of the BusinessTransactionDocuments from the code list of GDT BusinessTransactionDocumentTypeCode (e.g., 001 for purchase order). In certain implementations, the schemeID is not used by applications to determine the type of the identified business transaction document. BTD<TypeCode>can be an identification of an business transaction document by an identifier. BTDGUID<TypeCode>can be an identification of an business transaction document by a Global Identifier. A schemeAgencyID can be the ID of the Business system in which the identifier was assigned. A schemeAgencySchemeAgencyID can be ZZZ (e.g., mutually defined).

informs the other partner with GDT BusinessTransactionDocumentID in one initial step (e.g., at the creation or first transfer of data about the business transaction) about the assigned document ID in a business transaction. The second partner can then use the identifier in subsequent processes in order to refer to a document in a business transaction. In certain implementations, for transaction data, there are no standardized IDs. "BusinessTransactionDocument" can be replaced in the XML instance by the description in the respective document (e.g., "PurchaseOrder" for an order or "Delivery" for a delivery).

BusinessTransactionDocumentItemGroupID

A GDT BusinessTransactionDocumentItemGroupID can identify a group of business document items that are to be characterized as a group within a business document. An example of GDT BusinessTransactionDocumentItemGroupID is:

<DeliveryItemGroupID>123</DeliveryItemGroupID>

In certain implementations, GDT BusinessTransactionDocumentItemGroupID may have the following structure:

| GDT | Object Class | Property | Representation/-Association | Type | Type Name | Len. | Remarks |
|---|---|---|---|---|---|---|---|
| Business-Transac-tionDocu-mentItem-GroupID | Business Transaction Document Item | Group Identifica-tion | Identifier | CDT | Identifier | 1..10 | restricted |

A freely-definable numeric sequence can be used for display purposes. In certain implementations, it is a 3-digit, numeric text field and not a number. Leading zeros can also be displayed. In certain implementations, according to the definition in R/3 in the processing applications "order" and "delivery," a 3-figure, numeric text field (NUMC3) (i.e., a freely-definable 3 character string using the character set "0," "1," "2," "3," "4," "5," "6," "7," "8," "9") should be used. Otherwise, a corresponding mapping would be necessary. In certain implementations, this requirement cannot be ensured explicitly per definition/data type and therefore may be documented.

The GDT BusinessTransactionDocumentItemGroupID can be used to indicate the items of a business document that belong together to guarantee a identification of this item grouping in subsequent steps. For example, delivery groups can be used to check the availability of materials that may be delivered together. Items that belong to the same delivery group could be delivered at the same time. From the point of view of the availability check, the products/materials selected in the highlighted items may be available in sufficient quantities at the same time on the requested date so that the requirement can be fulfilled.

In the XML instance, the "BusinessTransactionDocument" can be replaced by the description of the respective document (e.g., "PurchaseOrder" for a purchase order or "Delivery" for a delivery). In certain implementations, in the R/3 context a 3-figure NUMC values can be processed. The definition here can also initially be a 3-figure field. In certain implementations, the field can be lengthened as appropriate. In R/3, the delivery date of the last schedule line of the delivery group can be defined as the general delivery date for the complete delivery group. A general field for identifying groups can exist in the UN/EDIFACT Standard with the Data Element 9164 (e.g., group identifier) "an . . . 4" (e.g., up to 4 alpha-numeric characters). This can be an identifier field (e.g., no code/no code list).

BusinessTransactionDocument-ItemHierarchyRelationshipTypeCode

A BusinessTransactionDocument-ItemHierarchyRelationshipTypeCode is a coded representation of the business type of a hierarchical relationship between items of a BusinessTransactionDocument. An example of BusinessTransactionDocument-ItemHierarchyRelationshipTypeCode is:

<HierarchyRelationshipTypeCode>001</HierarchyRelationshipTypeCode>

In certain implementations, BusinessTransactionDocument-ItemHierarchyRelationshipTypeCode may have the following structure:

| CDT | Object Class Qual. | Object Class | Property | Rep./Ass. | Type | Type Name | Len. | Remarks |
|---|---|---|---|---|---|---|---|---|
| Business-Transac-tion-Document-Item-Hierarchy-Rela-tionship-TypeCode | Business Transac-tion Document Item_ Hierarchy | Relation-ship | Type Code | Code | CDT | Code | 1..3 | restricted |

BusinessTransactionDocument-ItemHierarchyRelationshipTypeCode may assign a code list to the code. The attributes may be assigned the following values: listID="10328" and listAgencyID="310."

The BusinessTransactionDocument-ItemHierarchyRelationshipTypeCode can be used together with a ParentItemID to map item hierarchies. An item hierarchy can be a tree of subordinated items, where the BusinessTransactionDocumentHierarchyRelationshipTypeCode can describe the meaning of the hierarchical level of an item. When using the BusinessTransactionDocument-ItemHierarchyRelationshipTypeCode, which can type of lower-level items can be permitted in use context and which integrity conditions may apply to items in a hierarchy of a BusinessTransactionDocument-ItemHierarchyRelationshipTypeCode may be defined. It may be specified how hierarchies with different BusinessTransactionDocumentItemHierarchyRelationshipTypeCodes can be combined with each other (e.g., can a bill of material hierarchy and a grouping hierarchy exist for one item? can a grouping hierarchy exist for an item?).

In the XML instance, "BusinessTransactionDocument" can be replaced by the description of the specific business transaction document (e.g., "PurchaseOrder" for a purchase order or "Delivery" for a delivery). Generally, there is only one hierarchy for each item, (e.g., the same BusinessTransactionDocumentItemHierarchyRelationshipTypeCode) that can be specified for lower-level items. However, there can be exceptions to this rule. A purchase order can contain items that have both a bill of material hierarchy and a discount in kind hierarchy. The BusinessTransactionDocument-ItemHierarchyRelationshipTypeCode can have a proprietary code list with predefined values. Changes to the permitted values may involve changes to the interface.

The data type BusinessTransactionDocumentItemHierarchyRelationshipTypeCode may use the following codes: 001 (i.e., bill of materials), 002 (i.e., group), 003 (i.e., discount in kind), 006 (i.e., substitute product), 007 (i.e., split), 008 (i.e., identified stock), 009 (i.e., kit).

BusinessTransactionDocumentItemID

A GDT BusinessTransactionDocumentItemID is a identifier of an item or subitem of a document within a business transaction and can be in the context of the business transaction. An example of GDT BusinessTransactionDocumentItemID is:

<PurchaseOrderItemID>12</PurchaseOrderItemID>

In certain implementations, GDT BusinessTransactionDocumentItemID may have the following structure:

| GDT | Object Class | Property | Representation/ Association | Type | Type Name | Len. | Remarks |
|---|---|---|---|---|---|---|---|
| Business-Transac-tionDocu-ment-ItemID | Buisiness Transaction Document Item | Identifica-tion | Identifier | CCT | Identifier | 1..10 | restricted |

The data type GDT BusinessTransactionDocumentItemID can be a sequence of numbers with approximately ten characters. In certain implementations, leading zeros are not significant can be ignored (e.g., not sent to a recipient).

Many business transactions, such as purchase orders or invoices, can be divided into items and subitems. The GDT BusinessTransactionDocumentItemID can be used in a business process to identify an item or subitem within a business transaction. A partner can use its BusinessTransactionDocumentItemID to inform the other partner of its identification of the item in an initial step (e.g., when creating an item or transmitting it for the first time). The second partner can then use this identifier to reference the respective item of the document in the subsequent process.

In the XML instance, "BusinessTransactionDocument" can be replaced by the description of the respective document (e.g., "PurchaseOrder" for a purchase order, "Delivery" for a delivery, etc).

BusinessTransactionDocumentItemProcessingTypeCode

A GDT BusinessTransactionDocumentItemProcessingTypeCode is the coded representation of the way in which an item in a business document is processed. This can be defined as a transaction item type in the business transaction of the CRM/EBP 4.0 object model. The code can control the internal behavior of a document and its structure, among other things. An example of GDT BusinessTransactionDocumentItemID is:

<BusinessTransactionDocumentItemProcessingTypeCode>DLV<BusinessTransactionDocumentItemProcessingTypeCode>

In certain implementations, GDT BusinessTransactionDocumentItemID may have the following structure:

| GDT | Object Class | Property | Representation/ Association | Type | Type Name | Len. |
|---|---|---|---|---|---|---|
| Business-Transac-tionDocu-mentItem-Processing-TypeCode | Business Transaction Document Item | Processing Type | Code | CDT | Code | 1..4 |

For GDT BusinessTransactionDocumentItemProcessingTypeCode, a customer-specific code list can be assigned to the code. A listID can be "10329." A listAgencyID can be the ID of the customer (e.g., ID from DE 3055, if listed there). A listVersionID can be the version of the particular code list (e.g., assigned and managed by the customer). A listAgencySchemeID can be the ID of the scheme if the listAgencyID does not come from DE 3055. The listAgencySchemeAgencyID can be the ID of the organization from DE 3055 that manages the listAgencySchemeID scheme.

The GDT BusinessTransactionDocumentItemProcessingTypeCode can refer to a BusinessTransactionDocumentItemTypeCode. A BusinessTransactionDocumentProcessingTypeCode may be used for business objects.

The GDT BusinessTransactionDocumentItemProcessingTypeCode can be used to control the processes relating to a document item (e.g., can be defined by the BusinessTransactionDocumentItemTypeCode).

The following are examples of code semantics: Delivery (i.e., DLV, Standard delivery item type), Delivery (i.e., RET, Standard returns item type), Sales order (i.e., TAN, Standard order item type). Delivery item type, purchase order item type, order item type, or CRM/SRM item type are equivalents in R/3 and CRM/SRM. A GDT length of four can be selected, in line with these. The code can differ from the following codes: BusinessTransactionDocumentItemTypeCode (e.g., coded representation of an item type in a document occurring in the context of business transactions). The document item type can describe the business nature of document items that are similar and can define the basic properties of document items of this type. DeliveryTypeCode (e.g., coded representation of a delivery type, which can describe the business nature and basic properties of the delivery for the purposes of its logistical processing).

In certain implementations, the GDT BusinessTransactionDocumentItemProcessingTypeCode may include BusinessTransactionDocumentItemProcessingTypeCodeContextElements. The BusinessTransactionDocumentItemProcessingTypeCodeContextElements defines a dependency or an environment in which the BusinessTransactionDocumentItemProcessingTypeCode appears. The environment is described by context categories. With the context categories in BusinessTransactionDocumentItemProcessingTypeCodeContextElements the valid portion of code values of BusinessTransactionDocument- ItemProcessingTypeCodeContextElements is restricted according to an environment during use.

In certain implementations, BusinessTransactionDocumentItemProcessingTypeCodeContextElements may have the following structure:

| GDT | | Cat. | Object Class | Property | Representation/ Association | Type | Type Name | Card. |
|---|---|---|---|---|---|---|---|---|
| Business Transac-tionDocu-mentItem Process-ing-TypeCode-Con-textEle-ments | | | Business Transac-tion Docu-ment Item Process-ing Type Code Context Elements | | Details | | | |
| | Business Transac-tionDocu-ment-Type-Code | E | Business Transac-tion Docu-ment Item Process-ing Type Code Context Elements | Business Transac-tion Docu-ment Type | Code | GDT | Business Transac-tionDocu-ment-Type-Code | 0..1 |
| | Business Transac-tionDocu-mentItem Type-Code | E | Business Transac-tion Docu-ment Item Process-ing Type Code Context Elements | Business Transac-tion Docu-ment Item Type | Code | GDT | Business Transac-tionDocu-mentItem Type-Code | 0..1 |
| | Business Transac-tionDocu-ment-Process-ing-TypeCode | E | Business Transac-tion Docu-ment Item Process-ing Type Code Context Elements | Business Transac-tion Docu-ment Process-ing Type | Code | GDT | Business Transac-tionDocu-ment-Process-ing-TypeCode | 0..1 |

For the BusinessTransactionDocumentItemProcessingTypeCodeContextElements structure described above, BusinessTransactionDocumentTypeCode is a context category that can define the BusinessTransactionDocumentType context. This can determine the valid code values for a BusinessTransactionDocumentType. BusinessTransactionDocumentItemTypeCode is a category that defines the BusinessTransactionDocumentItemType context. This can determine the valid code values for a specific BusinessTransactionDocumentItemType. BusinessTransactionDocumentProcessingTypeCode is a category that defines the BusinessTransactionDocumentProcessingType context. This can determine the valid code values for a specific BusinessTransactionDocumentProcessingType.

BusinessTransactionDocumentItemScheduleLineID

A GDT BusinessTransactionDocumentItemScheduleLineID is a identifier that uses the deadline to identify the schedule line of a document item within a business transaction. An example of GDT BusinessTransactionDocumentItemScheduleLineID is:

<PurchaseOrderItemScheduleLineID>0001</PurchaseOrderItemScheduleLineID>

In certain implementations, GDT BusinessTransactionDocumentItemScheduleLineID may have the following structure:

| GDT | Object Class | Property | Rep./Ass. | Type | Type Name | Len. | Remarks |
|---|---|---|---|---|---|---|---|
| Business-Transac-tionDocu-mentItem-Schedule-LineID | Business Transaction Document Item Schedule Line | Identifica-tion | Identifier | CDT | Identifier | 1..4 | restricted |

Documents such as purchase orders, sales orders, or invoices can be divided into items. Items may then further be divided according to schedule lines. Each of these schedule lines can specify a deadline and relevant product quantities for this deadline.

"BusinessTransactionDocument" can be replaced by the description of each document in the XML instance (e.g., "PurchaseOrder" for a purchase order, "Delivery" for a delivery, etc.).

BusinessTransactionDocumentItemSplitItemID

A GDT BusinessTransactionDocumentItemSplitItemID is a identifier for a BusinessTransactionDocumentItemSplitItem. A GDT BusinessTransactionDocumentItemSplitItem can be a part of a value-based subdivision of the item of a business document according to the criteria that can result from the type of the business document or the underlying business transaction. An example of GDT BusinessTransactionDocumentItemSplitItemID is:

<PaymentRegisterItemSplitItemID>13</PaymentRegisterItemSplitItemID>

In certain implementations, GDT BusinessTransactionDocumentItemSplitItemID may have the following structure:

| GDT | Object Class | Property | Representation/ Association | Type | Type Name | Len. | Remarks |
|---|---|---|---|---|---|---|---|
| Business-Transac-tionDocu-ment-ItemSplit-ItemID | Business-Transaction Document-Item | Split Item | Identifier | GCT | Identifier | 1..10 | restricted |

The data type GDT BusinessTransactionDocumentItemSplitItemID can be a numerical sequence with approximately ten characters without leading zeros. The GDT BusinessTransactionDocumentItemSplitItemID can be unique within the split (i.e., higher-level) item.

The GDT BusinessTransactionDocumentItemSplitItemID can be used to identify the SplitItems of a TradeReceivablesPayablesRegisterItems or a PaymentRegisterItems. The SplitItems of a TradeReceivablesPayablesRegisterItems and PaymentRegisterItems can be disjoint and distribution of the item amount can assign different status values to the partial amounts such as 'open' and 'cleared'.

"BusinessTransactionDocument" can be replaced by the name of a business object or a business document (e.g., "TradeReceivablesPayablesRegister" or "PaymentRegister").

BusinessTransactionDocumentItemScheduleLineTypeCode

A GDT BusinessTransactionDocumentItemScheduleLineTypeCode is the coded representation of a type of schedule line of an item in a document. The schedule line type of a schedule line in a document item can specify which quantity and which date/time is involved in the schedule line. An example of GDT BusinessTransactionDocumentItemScheduleLineTypeCode is:

<SalesOrderItemScheduleLineTypeCode>1</SalesOrderItemScheduleLineTypeCode>

In certain implementations, GDT BusinessTransactionDocumentItemScheduleLineTypeCode may have the following structure:

| GDT | Object Class | Property | Representation/ Association | Type | Type Name | Len. | Remarks |
|---|---|---|---|---|---|---|---|
| Business-Transac-tion-Document-Item-Schedule-LineType-Code | Business Transac-tion Document Item Schedule Line | Type | Code | CDT | Code | 1..2 | Restricted |

The data type GDT BusinessTransactionDocumentItemScheduleLineTypeCode may assign a code list to the code. The attributes may be assigned the following values: listID="10094" and listAgencyID="310." In certain implementations, this code list may not be changed by the customer.

The GDT BusinessTransactionDocumentItemScheduleLineTypeCode can be used (e.g., in the sales order item) to represent the date/time and quantity requested by the customer, and the planned delivery date/time and quantity.

In certain implementations, the GDT BusinessTransactionDocumentItemScheduleLineTypeCode can correspond to the field EVENT_TYPE in the database table CRMD_SCHEDLIN.

The data type GDT BusinessTransactionDocumentItemScheduleLineTypeCode may use the following codes: 1 (i.e., requested), 2 (i.e., confirmed), 3 (i.e., promised).

BusinessTransactionDocumentItemTypeCode

A GDT BusinessTransactionDocumentItemTypeCode is a coded representation of the type of an item in a document that occurs in business transactions. The document item type can describe the business nature of similar document items and can define the basic features of the document items of this type. An example of GDT BusinessTransactionDocumentItemTypeCode is:

<BusinessTransactionDocumentItemTypeCode>001</BusinessTransactionDocumentItemTypeCode>

In certain implementations, GDT BusinessTransactionDocumentItemTypeCode may have the following structure:

| GDT | Object Class | Property | Representation/ Association | Type | Type Name | Len. | Remarks |
|---|---|---|---|---|---|---|---|
| Business-TransactionDocumentItem-TypeCode | Business Transaction Document Item | Type | Code | CDT | Code | ..3 | restricted |

The data type GDT BusinessTransactionDocumentItemTypeCode may assign a code list to the code. The attributes may be assigned the following values: listID="10003," listAgencyID="310," and listVersionID=version of the particular code list (e.g., assigned and managed by the customer).

Allowed combinations of the BusinessTransactionDocumentItemTypeCode when specifying a BusinessTransactionDocumentTypeCode can be: 001 (e.g., 001), 004 (e.g., 002, 003, 004), 005 (e.g., 002, 003, 004).

The GDT BusinessTransactionDocumentItemTypeCode can categorize an item in a document that is sent if the concrete semantic meaning of the item or sub-item is not defined by the message itself or if semantically different items can occur in one message. In particular, there are documents in many applications that can contain items with different types so that it is not enough to specify the type of the complete document. For example, in addition to a "standard" invoice item for an ordered product, an invoice can contain a delivery costs item that is to be shown separately.

The data type GDT BusinessTransactionDocumentItemTypeCode may use the following codes: 001 (i.e., PurchaseOrderItem), 002 (i.e., InvoiceItem), 003 (i.e., CreditMemoItem), 004 (i.e., DeliveryCostItem), 005 (i.e., SubsequentDebitItem), 006 (i.e., SubsequentCreditItem).

In R/3, the GDT BusinessTransactionDocumentItemTypeCode can correspond to VBTYP+POSAR in Sales or BSTYP in Purchasing or MRM_REFERENZBELEG in Invoice Verification, etc., at a less detailed level.

In certain implementations, the GDT BusinessTransactionDocumentItemTypeCode may include BusinessTransactionDocumentItemTypeCodeContextElements. The BusinessTransactionDocumentItemTypeCodeContextElements define a dependency or an environment in which the BusinessTransactionDocumentItemTypeCode appears. The environment can be described by context categories. With the context categories in BusinessTransactionDocumentItemTypeCodeContextElements the valid portion of code values of BusinessTransactionDocumentItemTypeCode may be restricted according to an environment during use.

In certain implementations, BusinessTransactionDocumentItemTypeCodeContextElements may have the following structure:

| GDT | | Cat. | Object Class | Property | Representation/ Association | Type | Type Name | Card. |
|---|---|---|---|---|---|---|---|---|
| Business TransactionDocumentItem TypeCode-ContextElements | | | Business TransactionDocumentItem TypeCode-Context Elements | | Details | | | |
| | Business TransactionDocument-Type-Code | E | Business TransactionDocumentItem TypeCode-Context Elements | Business TransactionDocument-Type | Code | GDT | Business TransactionDocument-Type-Code | 0..1 |

For BusinessTransactionDocumentItemTypeCodeContextElements structure described above, BusinessTransactionDocumentTypeCode is a context category that can define the context BusinessTransactionDocumentType. It can determine the valid code values for a specific BusinessTransactionDocumentTypeCode.

BusinessTransactionDocumentLocation

A GDT BusinessTransactionDocumentLocation contains the information that is exchanged in business documents about a location relevant for business transactions. This information can identify the location and its address. The identification may be a company-internal ID, a standardized ID, or one or several partner-specific IDs. A location is a logical or a physical place. An ID for a location assigned by a party can identify in the name the role the assigning party plays in the business transaction. These can be the role descriptions: Buyer, Seller, ProductRecipient, Vendor, BillTo, and BillFrom. In certain implementations, according to the rule Rx, the GDT BusinessTransactionDocumentLocation can be converted in the XML instance as shown in the accompanying example. An example of GDT BusinessTransactionDocumentLocation is:

<InventoryChange> . . . <Location> <StandardID-schemeAgencyID="16">4711</StandardID> <BuyerID>9873</BuyerID> <Address> . . . </Address> <Location> <InventoryChange>

In certain implementations, GDT BusinessTransactionDocumentLocation may have the following structure:

| GDT | | Cat. | Object Class | Property Qualifier | Property | Representation/ Association | Type | Type Name | Card. |
|---|---|---|---|---|---|---|---|---|---|
| Business Transac-tionDocu-mentLo-cation | | | Business Transac-tion Docu-ment Location | | | Details | | | |
| | Internal-ID | E | Business Transac-tion Docu-ment Location | Internal | Identifi-cation | Identifier | GDT | Loca-tionIn-ternalID | 0..1 |
| | Stan-dardID | E | Business Transac-tion Docu-ment Location | Standard | Identifi-cation | Identifier | GDT | Location Standard ID | 0..n |
| | BuyerID | E | Business Transac-tion Docu-ment Location | Buyer | Identifi-cation | Identifier | GDT | Location PartyID | 0..1 |
| | SellerID | E | Business Transac-tion Docu-ment Location | Seller | Identifi-cation | Identifier | GDT | Location PartyID | 0..1 |
| | Product-Recipient-ID | E | Business Transac-tion Docu-ment Location | Product Recipient | Identifi-cation | Identifier | GDT | Location PartyID | 0..1 |
| | Ven-dorID | E | Business Transac-tion Docu-ment Location | Vendor | Identifi-cation | Identifier | GDT | Location PartyID | 0..1 |
| | BillToID | E | Business Transac-tion Docu-ment Location | BillTo | Identifi-cation | Identifier | GDT | Location PartyID | 0..1 |
| | BillFrom-ID | E | Business Transac-tion Docu-ment Location | BillFrom | Identifi-cation | Identifier | GDT | Location PartyID | 0..1 |
| | BidderID | E | Business Transac-tion Docu-ment Location | Bidder | Identifi-cation | Identifier | GDT | Location PartyID | 0..1 |
| | Address | E | Business Transac-tion Docu-ment Location | | Address | Address | GDT | Address | 0..1 |
| | Note | E | Business Transac-tion Docu-ment Location | | Note | Text | CDT | Note | 0..1 |

For the GDT BusinessTransactionDocumentLocation structure described above, InternalID is a proprietary identifier that is used when both sender and recipient can access shared master data (e.g., extended enterprise). StandardID are standardized identifiers, whose identification schemes are managed by an agency from the DE 3055 code list. BuyerID is a identifier that is used by the BuyerParty proprietarily for this location. SellerID is a identifier that is used by the SellerParty proprietarily for this location. ProductRecipientID is a identifier that is used by the ProductRecipientParty proprietarily for this location. VendorID is a identifier that is used by the Vendor Party proprietarily for this location. BillToID is a identifier that is used by the BillToParty proprietarily for this location. BillFromID is a identifier that is used by the BillFromParty proprietarily for this location. BidderID is a identifier that is used by the BidderParty proprietarily for this location. Address describes the location by specifying postal address, geographic coordinates, etc. Note is any additional information (e.g., directions).

In certain implementations, organization addresses are supported when defining addresses. See GDT Address (described above). The different IDs of a GDT BusinessTransactionDocumentLocation can identify the same location. A location can be identified in the following ways: InternalID (e.g., when sender and recipient can access shared master data), StandardID (e.g., when sender and recipient can manage standardized identifiers), or PartyIDs (e.g., when sender and recipient are interested in the PartyIDs assigned by the parties involved). From all of the IDs available to the sender, generally the IDs that the recipient is expected to understand can be used. The GDT BusinessTransactionDocumentLocation can be used in business documents (e.g., BusinessTransactionDocuments).

BusinessTransactionDocumentParty

A GDT BusinessTransactionDocumentParty contains the information that is exchanged, in accordance with common business understanding, in business documents about a party involved in business transactions. This information can be used to identify the party and the party's address, as well as the party's contact person and the contact person's address. This identification can take place using an internalID, a standardized ID, or IDs assigned by the parties involved. A party is a natural person, organization, or business partner group in which a company has a business or intra-enterprise interest. This could be a person, organization, or group within or outside of the company. An ID assigned by a party can identify the name the role the assigning party plays in the business transaction. The roles can be Buyer, Seller, ProductRecipient, Vendor, BillTo, BillFrom and Bidder. The examples below show the xml instance of the GDT BusinessTransactionDocumentParty within a purchase order for different identification types (e.g., standard ID, party IDs, internalID). Here, the party assumes the role of Buyer. In certain implementations, according to the rule Rx, the GDT name BusinessTransactionDocumentParty can be converted in the XML instance as shown in the examples below. An example of GDT BusinessTransactionDocumentParty is:

<PurchaseOrder> . . . <BuyerParty> <StandardID-schemeAgencyID="016">4711</StandardID> <BuyerID>9873</BuyerID> <SellerID>487847</SellerID> <Address> . . . </Address> <ContactPerson> <BuyerID>9874</BuyerID> <SellerID>487848</SellerID> <Address> . . . </Address> </ContactPerson> </BuyerParty> </PurchaseOrder>

Another example of GDT BusinessTransactionDocumentParty is:

<PurchaseOrder> . . . <BuyerParty> <InternalID schemeID="PartyID"schemeAgencyID="BPL__300">747</InternalID> <Address> . . . </Address> <ContactPerson><InternalID schemeID="PartyID"schemeAgencyID="BPL__300">737</InternalID> <Address> . . . </Address> </ContactPerson> </BuyerParty> <PurchaseOrder>

In certain implementations, GDT BusinessTransactionDocumentParty may have the following structure:

| GDT | | Cat. | Object Class Qualifier | Object Class | Property Qualifier | Property | Rep./Ass. Qual. | Representation/ Association | Type | Type Name | Card. |
|---|---|---|---|---|---|---|---|---|---|---|---|
| Business-Transaction-Document Party | | | | Business Transaction Document Party | | | | Details | | | |
| | Internal-ID | E | | Business Transaction Document Party | Internal | Identification | | Identifier | GDT | Party-Internal-ID | 0..1 |
| | Standard-ID | E | | Business Transaction Document Party | Standard | Identification | | Identifier | GDT | Party-StandardID | 0..n |
| | BuyerID | E | | Business Transaction Document Party | Buyer | Identification | | Identifier | GDT | Party-PartyID | 0..1 |

-continued

| GDT | | Cat. | Object Class Qualifier | Object Class | Property Qualifier | Property | Rep./Ass. Qual. | Representation/ Association | Type | Type Name | Card. |
|---|---|---|---|---|---|---|---|---|---|---|---|
| | SellerID | E | | Business Transaction Document Party | Seller | Identification | | Identifier | GDT | Party-PartyID | 0..1 |
| | Product Recipient-ID | E | | Business Transaction Document Party | Product Recipient | Identification | | Identifier | GDT | Party-PartyID | 0..1 |
| | Vendor-ID | E | | Business Transaction Document Party | Vendor | Identification | | Identifier | GDT | Party-PartyID | 0..1 |
| | Bill-ToID | E | | Business Transaction Document Party | BillTo | Identification | | Identifier | GDT | Party-PartyID | 0..1 |
| | BillFrom-ID | E | | Business Transaction Document Party | Bill-From | Identification | | Identifier | GDT | Party-PartyID | 0..1 |
| | Bidder-ID | E | | Business Transaction Document Party | Bidder | Identification | | Identifier | GDT | Party-PartyID | 0..1 |
| | TaxID | E | | Business Transaction Document Party | | TaxIdentification | | Identifier | GDT | Party-TaxID | 0..1 |
| | Address | E | | Business Transaction Document Party | | Address | | Address | GDT | Address | 0..1 |
| | Contact Person | E | | Business Transaction Document Party | | Contact Person | | Contact Person | GDT | Contact Person | 0..1 |

For the GDT BusinessTransactionDocumentParty structure described above, InternalID is a proprietary identifier that is used when both sender and recipient can access shared master data (e.g., extended enterprise). StandardID is a standardized identifier for this party, whose identification scheme is managed by an agency from the DE 3055 code list. BuyerID is a identifier that is used by the BuyerParty for this party. SellerID is a identifier that is used by the SellerParty for this party. ProductRecipientID is a identifier that is used by the ProductRecipientParty for this party. VendorID is a identifier that is used by the Vendor Party for this party. BillToID is a identifier that is used by the BillToParty for this party. BillFromID is a identifier that is used by the BillFromParty for this party. BidderID is a identifier that is used by the BidderParty for this party. TaxID is a identifier issued by an tax authority for a party. Address is the address of the party. ContactPerson is the contact person of the party.

The different IDs of a GDT BusinessTransactionDocumentParty can identify the same party. A party can be identified in the following ways: InternalID (e.g., when sender and recipient can access shared master data), StandardID (e.g., when sender and recipient can manage standardized identifiers), or PartytPartyIDs (e.g., when sender and recipient are interested in the PartyIDs assigned by the parties involved). Of all of the IDs available to the sender, generally IDs that the recipient is expected to understand can be used in a message. The GDT BusinessTransactionDocumentParty can only be used in business documents (i.e., BusinessTransactionDocuments).

The GDT BusinessTransactionDocumentParty can be used in messages for internal and external communication to transmit information about the parties involved.

BusinessTransactionDocumentProcessingTypeCode

A GDT BusinessTransactionDocumentProcessingTypeCode is the coded representation of the way in which a business document is processed. This can be defined as a transaction type in the business transaction of the CRM/EBP 4.0 object model. The code can control the internal behavior of a document and its structure, among other things. An example of GDT BusinessTransactionDocumentProcessingTypeCode is:

<BusinessTransactionDocumentProcessingTypeCode>
DLVO</BusinessTransactionDocumentProcessingType
Code>

In certain implementations, GDT BusinessTransactionDocumentProcessingTypeCode may have the following structure:

| GDT | Cat. | Object Class | Property | Representation/ Association | Type | Type Name | Len. |
|---|---|---|---|---|---|---|---|
| Business-Transac-tion-Document Processing TypeCode | | Business Transac-tion Document | Processing Type | Code | CDT | Code | 1..4 |

For GDT BusinessTransactionDocumentProcessingTypeCode, a customer-specific code list can be assigned to the code. A listID can be "10330." A listAgencyID can be the ID of the customer (e.g., ID from DE 3055, if listed there). A listVersionID can be the version of the particular code list (e.g., assigned and managed by the customer). A listAgencySchemeID can be the ID of the scheme if the listAgencyID does not come from DE 3055. The listAgencySchemeAgencyID can be the ID of the organization from DE 3055 that manages the listAgencySchemeID scheme.

A GDT BusinessTransactionDocumentProcessingTypeCode may refer to a single BusinessTransactionDocumentTypeCode. A GDT BusinessTransactionDocumentProcessingTypeCode may be used for business objects.

The GDT BusinessTransactionDocumentProcessingTypeCode can be used to control the methods of processing a document defined by the BusinessTransactionDocumentTypeCode.

The following can be examples of code semantics: Delivery (i.e., Standard delivery type (DLVO)) and Sales order (i.e., Standard order type (TA)).

Delivery type, purchase order type, order type, or CRM/SRM transaction type can be equivalents in R/3 and CRM/SRM. A GDT length of four can be selected, in line with these. The code can differ from the following codes as described below: BusinessTransactionDocumentTypeCode (e.g., coded representation of a type of document occurring in the context of business transactions). The document type can describe the business nature of documents that are very similar and can define the basic properties of documents of this type. This code can be a prefix for references, among other things. BusinessTransactionTypeCode (e.g., coded representation of a business transaction type.) This code can be cross-BTD and can describe the business transaction as such. DeliveryTypeCode (e.g., coded representation of a delivery type, which describes the business nature and basic properties of the delivery for the purposes of its logistical processing.)

In certain implementations, the GDT BusinessTransactionDocumentProcessingTypeCode may include BusinessTransactionDocumentProcessingTypeCode ContextElements. The BusinessTransactionDocumentProcessing TypeCodeContextElements defines a dependency or an environment in which the GDT BusinessTransactionDocumentProcessingTypeCode can appear. The environment can be described by context categories. With the context categories in BusinessTransactionDocumentProcessingTypeCodeContextElements the valid portion of code values of BusinessTransactionDocumentProcessingTypeCode can be restricted according to an environment during use.

In certain implementations, the BusinessTransactionDocumentProcessingTypeCodeContextElements may have the following structure:

| GDT | | Cat. | Object Class | Property | Representation/ Association | Type | Type Name | Card. |
|---|---|---|---|---|---|---|---|---|
| Business Transac-tion-Docu-ment-Processing-Type-Code-Con-textEle-ments | | | Business Transac-tion Docu-ment Processing Type Code Context Elements | | Details | | | |
| | Business Transac-tionDocu-ment-Type-Code | E | Business Transac-tion Docu-ment-Process-ing Type Code Context Elements | Business Transac-tion Docu-ment Type | Code | GDT | Business Transac-tionDocu-ment-Type-Code | 0..1 |

For the BusinessTransactionDocument-ProcessingTypeCodeContextElements structure described above, BusinessTransactionDocumentTypeCode defines the BusinessTransactionDocumentType context. This can determine the valid code values for a specific BusinessTransactionDocumentType.

BusinessTransactionDocumentProduct

A GDT BusinessTransactionDocumentProduct contains the information that is exchanged, in accordance with common business understanding, in business documents about a product. This information can identify the product and product type, and can describe the product. This identification can occur using an internalID, a standardized ID, or IDs assigned by the parties involved. A product is either a tangible or intangible good, and is a part of the business activities of a company. It can be traded and can contribute directly or indirectly to value added. An ID assigned by a party can identify in the name the role the assigning party plays in the business transaction. The roles can be: Buyer, Seller, ProductRecipient, Vendor, Manufacturer, BillTo, BillFrom and Bidder. In certain implementations, according to the rule Rx, the GDT BusinessTransactionDocumentProduct can be converted to the XML instance as shown in the examples below. An example of GDT BusinessTransactionDocumentProduct is:

<PurchaseOrder> . . . <Product> <StandardID schemeAgencyID="9">4711</StandardID> <BuyerID>A6B7915634654</BuyerID> <SellerID>234532358B4</SellerID> <ManufacturerID>6546</ManufacturerID> <TypeCode>1</TypeCode> <Note>XYZ NetWeaver</Note> </Product> </PurchaseOrder>

Another example of GDT BusinessTransactionDocumentProduct is:

<PurchaseOrder> . . . <Product> <InternalIDschemeID="ProductGUID"schemeAgencyID="MPL__002">1C743CEC501F6A4D8826C7EC5A85 54B9</InternalID> <TypeCode>1</TypeCode> <Note>XYZ NetWeaver</Note> </Product> </PurchaseOrder>

In certain implementations, GDT BusinessTransactionDocumentProduct may have the following structure:

| GDT | | Cat. | Object Class | Property Qualifier | Property | Repre-senta-tion/ Association | Type | Type Name | Card. |
|---|---|---|---|---|---|---|---|---|---|
| Business Transac-tionDocu-ment-Product | | | Business Transac-tion Docu-ment Product | | | Details | | | |
| | Inter-nalID | E | Business Transac-tion Docu-ment Product | Internal | Identifi-cation | Identifier | GDT | Product-Internal-ID | 0..1 |
| | Stan-dardID | E | Business Transac-tion Docu-ment Product | Standard | Identifi-cation | Identifier | GDT | Product-Stan-dardID | 0..n |

-continued

| GDT | | Cat. | Object Class | Property Qualifier | Property | Representation/ Association | Type | Type Name | Card. |
|---|---|---|---|---|---|---|---|---|---|
| | BuyerID | E | Business Transaction Document Product | Buyer | Identification | Identifier | GDT | ProductPartyID | 0..1 |
| | SellerID | E | Business Transaction Document Product | Seller | Identification | Identifier | GDT | ProductPartyID | 0..1 |
| | ProductRecipientID | E | Business Transaction Document Product | Product Recipient | Identification | Identifier | GDT | ProductPartyID | 0..1 |
| | VendorID | E | Business Transaction Document Product | Vendor | Identification | Identifier | GDT | ProductPartyID | 0..1 |
| | ManufacturerID | E | Business Transaction Document Product | Manufacturer | Identification | Identifier | GDT | ProductPartyID | 0..1 |
| | BillToID | E | Business Transaction Document Product | BillTo | Identification | Identifier | GDT | ProductPartyID | 0..1 |
| | BillFromID | E | Business Transaction Document Product | BillFrom | Identification | Identifier | GDT | ProductPartyID | 0..1 |
| | BidderID | E | Business Transaction Document Product | Bidder | Identification | Identifier | GDT | ProductPartyID | 0..1 |
| | TypeCode | E | Business Transaction Document Product | | Type Code | Code | GDT | ProductTypeCode | 0..1 |
| | Note | E | Business Transaction Document Product | | Note | Text | GDT | Note | 0..1 |
| | ChangeID | E | Business Transaction Document Product | | Change Identification | Identifier | GDT | ProductChangeID | 0..1 |
| | DiscontinuationIndicator | E | Business Transaction Document Product | | Discontinuation | Indicator | GDT | ProductDiscontinuationIndicator | 0..1 |

-continued

| GDT | | Cat. | Object Class | Property Qualifier | Property | Representation/ Association | Type | Type Name | Card. |
|---|---|---|---|---|---|---|---|---|---|
| | PackageQuantity | E | Business Transaction Document Product | Package | Quantity | Quantity | CDT | Quantity | 0..1 |

For the GDT BusinessTransactionDocumentProduct structure described above, InternalID is a proprietary identifier for the product that is used when both sender and recipient can access shared master data (e.g., extended enterprise). StandardID is a standardized identifier for this product, whose identification scheme is managed by an agency from the DE 3055 code list. BuyerID is a identifier that is used proprietarily by the BuyerParty for this product. SellerID is a identifier that is used proprietarily by the SellerParty for this product. ProductRecipientID is a identifier that is used proprietarily by the ProductRecipientParty for this product. VendorID is a identifier that is used proprietarily by the Vendor Party for this product. ManufacturerID is a identifier that is used proprietarily by the ManufacturerParty for this product. BillToID is a identifier that is used proprietarily by the BillToParty for this product. BillFromID is a identifier that is used proprietarily by the BillFromParty for this product. BidderID is a identifier that is used proprietarily by the BidderParty for this product. Type Code is a coded representation of the type of a product; possible values are "1"=material and "2"=service product. See GDT ProductTypeCode (described below). Note is a product description. ChangeID is a identifier for a change to a product that has no effect on the properties that are relevant for the user. DiscontinuationIndicator indicates whether the offering of a product is to be discontinued (e.g., removed from the line). PackageQuantity is a amount per container (e.g., package amount). In certain implementations, this information is necessary if different package quantities are relevant, but the same product ID can have different package quantities depending on the item. This information is variable movement data at time of the message.

The different IDs of a BusinessTransactionDocumentProduct can identify the same product. Identification of a product can take place in the following ways: InternalID (e.g., when sender and recipient can access shared master data, StandardID (e.g., when sender and recipient can manage standardized identifiers, ProductPartyIDs (e.g., when sender and recipient are interested in the ProductIDs assigned by the parties involved). Of all of the IDs available to the sender, generally only IDs that the recipient is expected to understand are used in a message. In certain implementations, the GDT BusinessTransactionDocumentProduct can be used in business documents (e.g., BusinessTransactionDocuments).

The GDT BusinessTransactionDocumentProduct can be used in messages for internal and external communication to transmit information about a product.

BusinessTransactionDocumentProductCategory

A GDT BusinessTransactionDocumentProductCategory contains the information that is exchanged, in accordance with common business understanding, in business documents about a product category. It can identify the product category using an internalID, a standard ID, and IDs assigned by parties involved. A product category is a division of products according to objective criteria. An ID assigned by a party can identify in the name the role the assigning party plays in the business transaction. Roles can be: Buyer, Seller, ProductRecipient, Vendor, BillTo, BillFrom and Bidder. An example of GDT BusinessTransactionDocumentProductCategory is:

<BusinessTransactionDocumentProductCategory>
<StandardIDschemeID="UNSPSC"schemeVersionID="11.0"schemeAgencyID="257">4711</StandardID>
<BuyerID>1234</BuyerID> <SellerID>2345</SellerID>
</BusinessTransactionDocumentProductCategory>

In certain implementations, GDT BusinessTransactionDocumentProductCategory may have the following structure:

| GDT | | Cat. | Object Class | Property Qualifier | Property | Representation/ Association | Type | Type Name | Card. |
|---|---|---|---|---|---|---|---|---|---|
| BusinessTransactionDocumentProductCategory | | | Business Transaction Document Product Category | | | Details | | | |
| | InternalID | E | Business Transaction Document Product Category | Internal | Identification | Identifier | GDT | ProductCategoryInternalID | 0..1 |

-continued

| GDT | | Cat. | Object Class | Property Qualifier | Property | Representation/ Association | Type | Type Name | Card. |
|---|---|---|---|---|---|---|---|---|---|
| | StandardID | E | Business Transaction Document Product Category | Standard | Identification | Identifier | GDT | ProductCategoryStandardID | 0..n |
| | BuyerID | E | Business Transaction Document Product Category | Buyer | Identification | Identifier | GDT | ProductCategoryPartyID | 0..1 |
| | SellerID | E | Business Transaction Document Product Category | Seller | Identification | Identifier | GDT | ProductCategoryPartyID | 0..1 |
| | ProductRecipientID | E | Business Transaction Document Product | Product Recipient | Identification | Identifier | GDT | ProductCategoryPartyID | 0..1 |
| | VendorID | E | Business Transaction Document Product | Vendor | Identification | Identifier | GDT | ProductCategoryPartyID | 0..1 |
| | BillToID | E | Business Transaction Document Product | BillTo | Identification | Identifier | GDT | ProductCategoryPartyID | 0..1 |
| | BillFromID | E | Business Transaction Document Product | BillFrom | Identification | Identifier | GDT | ProductCategoryPartyID | 0..1 |
| | BidderID | E | Business Transaction Document Product | BidderFrom | Identification | Identifier | GDT | ProductCategoryPartyID | 0..1 |

For the CDT BusinessTransactionDocumentProductCategory structure described above, InternalID is a proprietary identifier for the product category that is used when both sender and recipient can access shared master data (e.g., extended enterprise). StandardID is a standardized identifier for this product category whose identification scheme is managed by an agency from the DE 3055 code list. BuyerID is a identifier that is used proprietarily by the BuyerParty for this product category. SellerID is a identifier that is used proprietarily by the SellerParty for this product category. ProductRecipientID is a identifier that is used proprietarily by the ProductRecipientParty for this product category. VendorID is a identifier that is used proprietarily by the Vendor Party for this product category. BillToID is a identifier that is used proprietarily by the BillToParty for this product category. BillFromID is a identifier that is used proprietarily by the BillFromParty for this product category. BidderID is a identifier that is used proprietarily by the BidderParty for this product category.

The different IDs of a BusinessTransactionDocumentProductCategory can identify the same product category. A product category can be identified in the following ways: ProductCategoryInternalID (e.g., when sender and recipient can access shared master data), ProductCategoryStandardID (e.g., when sender and recipient can manage standardized identifiers). ProductCategoryPartyIDs (e.g., when sender or recipient are interested in the ProductCategoryIDs assigned by the parties involved). Of all of the IDs available to the sender, generally only IDs that the recipient is expected to understand are used in a message. At least one ID may be specified. The GDT BusinessTransactionDocumentProductCategory can be used in business documents (i.e., BusinessTransactionDocuments).

The GDT BusinessTransactionDocumentProductCategory can be used in messages for internal and external communication to transmit information about a product category.

BusinessTransactionDocumentReference

A GDT BusinessTransactionDocumentReference is a reference to other business documents or business document items that are of significance within each respective business process. A reference to an item within the same business document is possible. An example of GDT BusinessTransactionDocumentReference is:

<BusinessTransactionDocumentReference> <ID>102321</ID> <UUID>f81d4fae-7dec-1d0-a765-00a0c91e6bf6</UUID> <TypeCode>001</TypeCode> <ItemID>1</ItemID> <ItemUUID>f93d4fae-7def-1d0-b765-10a0c91e6bf4</ItemUUID> <ItemTypeCode>001</ItemTypeCode> </BusinessTransactionDocumentReference>

In certain implementations, GDT BusinessTransactionDocumentReference may have the following structure:

For the GDT BusinessTransactionDocumentReference structure described above, ID is a identifier for the referenced business document. UUID is a global identifier of the referenced business document. TypeCode is a coded representation of the type of business document that is referenced. ItemID is a identifier for the referenced business document item. ItemUUID is a global identifier of the referenced business document item. ItemTypeCode is a coded representation of the type of business document item that is referenced.

The ItemID may be filled for references to business document items. If the ItemID is filled, this may match the ID. The SchemeID for the ID, and or the ItemID may each match the TypeCode, and or the ItemTypeCode. UUID and ItemUUID may not be filled in B2B messages.

The GDT BusinessTransactionDocumentReference can be used for referencing to relevant documents within a business process. They can serve as a reference asset for the respective business document. Referencing a single item in the respective document may also be possible. For example, within the document "Order," reference assets can be displayed to business documents "Quote," "Contract" and "PurchaseOrder," as well as their individual item row.

| GDT | | Cat. | Object Class | Property | Representation/ Association | Type | Type Name | Card. |
|---|---|---|---|---|---|---|---|---|
| Business-Transaction-Document-Reference | | | Business Transaction Document Reference | | Details | | | |
| | ID | E | Business Transaction Document Reference | Identification | Identifier | GDT | Business TransactionDocumentID | 1 |
| | UUID | E | Business Transaction Document Reference | UUID | Identifier | GDT | UUID | 0..1 |
| | TypeCode | E | Business Transaction Document Reference | Type Code | Code | GDT | Business TransactionDocument-Type-Code | 0..1 |
| | ItemID | E | Business Transaction Document Reference | Item Identification | Identifier | GDT | Business TransactionDocument-ItemID | 0..1 |
| | Item-UUID | E | Business Transaction Document Reference | Item UUID | Identifier | GDT | UUID | 0..1 |
| | Item-TypeCode | E | Business Transaction Document Reference | Item Type Code | Code | GDT | Business TransactionDocument-Item-Type-Code | 0..1 |

BusinessTransactionDocument" can be replaced in the XML instance by the description in the respective document (e.g., "PurchaseOrder" for an order, "Delivery" for a delivery, and so on).

BusinessTransactionDocumentRelationshipRoleCode

The GDT BusinessTransactionDocumentRelationshipRoleCode is the coded representation of the role that a business document, or a business document item has when set against another business document or business document item within a relationship. An example of GDT BusinessTransactionDocumentRelationshipRoleCode is:

<BusinessTransactionDocumentRelationshipRoleCode>
1<BusinessTransactionDocumentRelationshipRoleCode>

In certain implementations, GDT BusinessTransactionDocumentRelationshipRoleCode may have the following structure:

| GDT | Object Class | Property | Representation/ Association | Type | Type Name | Len. | Remarks |
|---|---|---|---|---|---|---|---|
| Business-Transac-tionDocu-mentRela-tionship-RoleCode | Business-Transac-tion-Document _ Re-lationship | Role | Code | CDT | Code | 1..3 | Restricted |

-

The data type GDT BusinessTransactionDocumentRelationshipRoleCode may assign a code list to the code. The attributes may be assigned the following values: listID="10177" and listAgencyID="310."

Business Configuration can specify for which business documents, or business document items a specific BusinessTransactionDocumentRelationshipRoleCode may be used. Within a relationship, the GDT BusinessTransactionRelationshipRoleCode and the GDT BusinessTransactionDocumentRelationshipTypeCode (described below) may be used in the following combinations:

| | 1 - Sequence Relationship | 2 - Usage Relationship | 3 - Copy Relationship | 4 - Business Parter Document Relationship | 5 - Exception Occurence Relationship |
|---|---|---|---|---|---|
| 1 - Predecessor | x | | | | |
| 2 - Successor | x | | | | |
| 3 - User | | x | | | |
| 4 - Document Used | | x | | | |
| 5 - Copy Template | | | x | | |
| 6 - Copy | | | x | | |
| 7 - Internal Document | | | | x | |
| 8 - Business Partner Document | | | | x | |
| 9 - Trigger of Exception | | | | | x |
| 10 - Exception | | | | | x |

The GDT BusinessTransactionDocumentRelationshipRoleCode can be used to describe the role a business document, or a business document item has within a relationship between two business documents, and/or business document items. For example, in a relationship between PurchaseRequest and PurchaseOrder, the role is used to indicate that the PurchaseRequest represents the predecessor, and the PurchaseOrder the successor.

More than just one relationship can exist between the same business documents or business document items. A business document or a business document item can have a different role in several relationships. For this and other reasons, code values are typically not disjoint.

The data type GDT BusinessTransactionDocumentRelationshipRoleCode may have the following codes: 1 (i.e., predecessor), 2 (i.e., successor), 3 (i.e., user), 4 (i.e., used document), 5 (i.e., copy template), 6 (i.e., copy), 7 (i.e., internal document), 8 (i.e., business partner document), 9 (i.e., trigger of exception), 10 (i.e., exception).

BusinessTransactionDocumentRelationshipTypeCode

A GDT BusinessTransactionDocumentRelationshipTypeCode is the coded representation of the relationship between two business documents, or business document items. The type of relationship can describe the basic type of relationship. An example of GDT BusinessTransactionDocumentRelationshipTypeCode is:

<BusinessTransactionDocumentRelationshipRoleCode>
1<BusinessTransactionDocumentRelationshipTypeCode>

In certain implementations, GDT BusinessTransactionDocumentRelationshipTypeCode may have the following structure:

| GDT | Object Class | Property | Representation/ Association | Type | Type Name | Len. | Remarks |
|---|---|---|---|---|---|---|---|
| Business-Transac-tionDocu-mentRela-tionship-TypeCode | Business Transac-tion Docu-ment_ Re-lationship | Type | Code | CDT | Code | 1..3 | Restricted |

The data type GDT BusinessTransactionDocumentRelationshipTypeCode may assign a code list to the code. The attributes may be assigned the following values: listID="10170" and listAgencyID="310."

Within a relationship, the GDT BusinessTransactionRelationshipTypeCode and the GDT BusinessTransactionDocumentReferenceRoleCode (described above) may be used in the following combinations:

| | 1 - Prede-cessor | 2 - Successor | 3 - User | 4 - Used Document | 5 - Copy Template | 6 - Copy | 7 - Internal Document | 8 - Business Partner Document | 9 - Trigger of Exception | 10 - Exception |
|---|---|---|---|---|---|---|---|---|---|---|
| 1 - Sequence Relationship | x | x | | | | | | | | |
| 2 - Usage Relationship | | | x | x | | | | | | |
| 3 - Copy Relationship | | | | | x | x | | | | |
| 4 - Business Partner Document Relationship | | | | | | | x | x | | |
| 5 - Exception Occurence Relationship | | | | | | | | | x | x |

The GDT BusinessTransactionDocumentRelationshipTypeCode can be used to differentiate between the type of relationship between two business documents, and/or their items. For example, the relationship between two business documents, and/or business document items can (e.g., indicate a business sequence).

The data type GDT BusinessTransactionDocumentRelationshipTypeCode may use the following code: 1 (i.e., sequence relationship), 2 (i.e., usage relationship), 3 (i.e., copy relationship), 4 (i.e., business partner document relationship), 5 (i.e., exception occurrence relationship).

BusinessTransactionDocumentShipFromLocation

A GDT BusinessTransactionDocumentShipFromLocation contains the information that is exchanged in business documents about a location relevant for business transactions and from which goods or services are shipped. The information can identify the location, its address, and, if necessary, a different loading location. The identification may be a company-internal ID, a standardized ID, or one or more partner-specific IDs. A location is a logical or a physical place. An ID assigned by a party can identify in the name the role the assigning party occupies in the business transaction. Roles can be: Buyer, Seller, ProductRecipient, and Vendor. According to the rule Rx, the GDT name BusinessTransactionDocumentShipfromLocation can be converted in the XML instance as shown in the example below. An example of GDT BusinessTransactionDocumentShipFromLocation is:

<ReplenishmentOrder> . . . <ShipFromLocation> <StandardID schemeAgencyID="16">4711</StandardID> <BuyerID>9873</BuyerID> <SellerID>487847</SellerID> <Address> . . . </Address> <LoadingLocation> . . . </LoadingLocation> <ShipFromLocation> <ReplenishmentOrder>

In certain implementations, GDT BusinessTransactionDocumentShipFromLocation may have the following structure:

| GDT | | Cat. | Object Class | Property Qualifier | Property | Representation/ Association | Type | Type Name | Card. |
|---|---|---|---|---|---|---|---|---|---|
| Business TransactionDocument-Ship-FromLocation | | | Business Transaction Document Ship From Location | | | Details | | | |
| | InternalID | E | Business Transaction Document Ship From Location | Internal | Identification | Identifier | GDT | LocationInternalID | 0..1 |
| | StandardID | E | Business Transaction Document Ship From Location | Standard | Identification | Identifier | GDT | Location Standard ID | 0..n |
| | BuyerID | E | Business Transaction Document Ship From Location | Buyer | Identification | Identifier | GDT | Location PartyID | 0..1 |
| | SellerID | E | Business Transaction Document Ship From Location | Seller | Identification | Identifier | GDT | Location PartyID | 0..1 |
| | Product-Recipient-ID | E | Business Transaction Document Ship From Location | Product Recipient | Identification | Identifier | GDT | Location PartyID | 0..1 |
| | VendorID | E | Business Transaction Document Ship From Location | Vendor | Identification | Identifier | GDT | Location PartyID | 0..1 |
| | Address | E | Business Transaction Document Ship From Location | | Address | Address | GDT | Address | 0..1 |
| | Note | E | Business Transaction Document Ship From Location | | Note | Text | CDT | Note | 0..1 |

-continued

| GDT | | Cat. | Object Class | Property Qualifier | Property | Representation/Association | Type | Type Name | Card. |
|---|---|---|---|---|---|---|---|---|---|
| | Loading-Location | E | Business Transaction Document Ship From Location | | Loading Location | Business Transaction Document Location | GDT | Business Transaction DocumentLocation | 0..1 |

For the GDT BusinessTransactionDocumentShipFromLocation structure described above, InternalID is a proprietary identifier that is used when both sender and recipient can access shared master data (e.g., extended enterprise). StandardID is a standardized identifier for this location, whose identification scheme is managed by an agency from the DE 3055 code list. BuyerID is a identifier that is used proprietarily by the BuyerParty for this location. SellerID is a identifier that is used proprietarily by the SellerParty for this location. ProductRecipientID is a identifier that is used proprietarily by the ProductRecipientParty for this location. VendorID is a identifier that is used proprietarily by the Vendor Party for this location. Address describes the location by indicating postal address, geographic coordinates, etc. Note is any additional information (e.g., directions). LoadingLocation is a location itself and can be identified proprietarily or partner-specifically.

In certain implementations, when defining addresses, organization addresses are supported. See GDT Address (described above). In certain implementations, the different IDs of a BusinessTransactionDocumentShipFromLocation identify the same location. A location can be identified in the following ways: InternalID (e.g., when sender and recipient can access shared master data), StandardID (e.g., when sender and recipient can manage standardized identifiers), PartyIDs (e.g., when sender and recipient are interested in the PartyIDs assigned by the parties involved). In certain implementations, the sender uses IDs that the recipient is expected to understand. The GDT BusinessTransactionDocumentShipFromLocation can be used in business documents (i.e., BusinessTransactionDocuments).

BusinessTransactionDocumentShipToLocation

A GDT BusinessTransactionDocumentShipToLocation contains the information that is exchanged in business documents about a location relevant for business transactions and to which goods or services are shipped. This information can identify the location, its address and, if necessary, a different unloading location. The identification may be a company-internal ID, a standardized ID, or one or many partner-specific IDs. A location is a logical or a physical place. An ID assigned by a party can identify in the name the role the assigning party plays in the business transaction. Roles can be: Buyer, Seller, ProductRecipient, and Vendor. According to the rule Rx, the GDT BusinessTransactionDocumentShipToLocation can be converted in the XML instance as shown in the example below. An example of GDT BusinessTransactionDocumentShipFromLocation is:

<ReplenishmentOrder> . . . <ShipToLocation> <StandardID schemeAgencyID="16">4711</StandardID> <SellerID>487847</SellerID> <Address> . . . </Address> <UnloadingLocation> . . . </UnloadingLocation> </ShipToLocation> </ReplenishmentOrder>

In certain implementations, GDT BusinessTransactionDocumentShipFromLocation may have the following structure:

| GDT | | Cat. | Object Class | Property Qualifier | Property | Representation/Association | Type | Type Name | Card. |
|---|---|---|---|---|---|---|---|---|---|
| Business TransactionDocument-Ship-ToLocation | | | Business Transaction Document Ship To Location | | | Details | | | |
| | InternalID | E | Business Transaction Document Ship To Location | Internal | Identification | Identifier | GDT | LocationInternalID | 0..1 |
| | StandardID | E | Business Transaction Document Ship To Location | Standard | Identification | Identifier | GDT | Location Standard ID | 0..n |

-continued

| GDT | | Cat. | Object Class | Property Qualifier | Property | Representation/ Association | Type | Type Name | Card. |
|---|---|---|---|---|---|---|---|---|---|
| | BuyerID | E | Business Transaction Document Ship To Location | Buyer | Identification | Identifier | GDT | Location PartyID | 0..1 |
| | SellerID | E | Business Transaction Document Ship To Location | Seller | Identification | Identifier | GDT | Location PartyID | 0..1 |
| | Product-Recipient-ID | E | Business Transaction Document Ship To Location | Product Recipient | Identification | Identifier | GDT | Location PartyID | 0..1 |
| | VendorID | E | Business Transaction Document Ship To Location | Vendor | Identification | Identifier | GDT | Location PartyID | 0..1 |
| | Address | E | Business Transaction Document Ship To Location | | Address | Address | GDT | Address | 0..1 |
| | Note | E | Business Transaction Document Ship To Location | | Note | Text | CDT | Note | 0..1 |
| | UnloadingLocation | E | Business Transaction-Document Ship To Location | | Unloading Location | Business Transaction Document Location | GDT | Business Transaction DocumentLocation | 0..1 |

For the GDT BusinessTransactionDocument-ShipFromLocation structure described above, InternalID is a proprietary identifier that is used when both sender and recipient can access shared master data. StandardID is a standardized identifier for this location, whose identification scheme is managed by an agency from the de 3055 code list. BuyerID is a identifier that is used by the BuyerParty proprietarily for this location. SellerID is a identifier that is used by the SellerParty proprietarily for this location. ProductRecipientID is a identifier that is used by the ProductRecipientParty proprietarily for this location. VendorID is a identifier that is used by the Vendor Party proprietarily for this location. Address identifies the location by indicating postal address, geographic coordinates, etc. Note is any additional information (e.g., directions). UnloadingLocation is an unloading location and is a location itself and therefore can be identified proprietarily or partner-specifically.

In certain implementations, when defining addresses, organization addresses are used. See GDT Address (described above). The different IDs of a BusinessTransactionDocumentShipToLocation can identify the same location. A location is identified in the following ways: InternalID (e.g., when sender and recipient can access shared master data), StandardID (e.g., when sender and recipient can manage standardized identifiers), PartyIDs (e.g., when sender and recipient are interested in the IDs assigned by the parties involved). Of all of the IDs available to the sender, those that the recipient can be expected to understand can be used. The GDT BusinessTransactionDocumentShipFromLocation can be used in business documents (i.e., BusinessTransactionDocuments).

BusinessTransactionDocumentTransshipmentLocation

A GDT BusinessTransactionDocumentTransshipmentLocation contains the information that is exchanged in business documents about a relevant location for business transactions where goods are transshipped (e.g., unloaded and reloaded). This information can identify the location, its address, a loading location, and an unloading location. The identification may be a company-internalID, a standardized ID, or one or more partner-specific IDs. A location is a logical or a physical place. An ID assigned by a party can identify in the name the role the assigning party plays in the business transaction. The roles can be: Buyer, Seller, ProductRecipient, and Vendor. According to the rule Rx, the GDT BusinessTransactionDocumentTransshipmentLocation can be converted in the XML instance as shown in the example below. An example of GDT BusinessTransactionDocumentShipFromLocation is:

<ReplenishmentOrder> . . . <TransshipmentLocation> <StandardIDschemeAgencyID="16">4711</StandardID> <Address> . . . </Address> <LoadingLocation> . . . </LoadingLocation> <UnloadingLocation> . . . </UnloadingLocation> <TransshipmentLocation> </ReplenishmentOrder>

In certain implementations, GDT BusinessTransactionDocumentShipFromLocation may have the following structure:

| GDT | | Cat. | Object Class | Property Qualifier | Property | Representation/ Association | Type | Type Name | Card. |
|---|---|---|---|---|---|---|---|---|---|
| Business TransactionDocument-Transshipment-Location | | | Business Transaction Document Transshipment Location | | | Details | | | |
| | InternalID | E | Business Transaction Document Transshipment Location | Internal | Identification | Identifier | GDT | Location-InternalID | 0..1 |
| | StandardID | E | Business Transaction Document Transshipment Location | Standard | Identification | Identifier | GDT | Location Standard ID | 0..n |
| | BuyerID | E | Business Transaction Document Transshipment Location | Buyer | Identification | Identifier | GDT | Location PartyID | 0..1 |
| | SellerID | E | Business Transaction Document Transshipment Location | Seller | Identification | Identifier | GDT | Location PartyID | 0..1 |
| | Product-Recipient | E | Business Transaction Document Transshipment Location | Product Recipient | Identification | Identifier | GDT | Location-PartyID | 0..1 |
| | VendorID | E | Business Transaction Document Transshipment Location | Vendor | Identification | Identifier | GDT | Location PartyID | 0..1 |
| | Address | E | Business Transaction Document Transshipment Location | | Address | Address | GDT | Address | 0..1 |

-continued

| GDT | | Cat. | Object Class | Property Qualifier | Property | Representation/ Association | Type | Type Name | Card. |
|---|---|---|---|---|---|---|---|---|---|
| | Note | E | Business Transaction Document Transshipment Location | | Note | Text | CDT | Note | 0..1 |
| | Loading-Location | E | Business Transaction Document Transshipment Location | | Loading Location | Business Transaction Document Location | GDT | Business Transaction-Document-Location | 0..1 |
| | Unload-ingLocation | E | Business Transaction Document Transshipment Location | | Unloading Location | Business Transaction Document Location | GDT | Business Transaction-Document-Location | 0..1 |

In some implementations, for the GDT BusinessTransactionDocumentShipFromLocation structure described above, InternalID is a proprietary identifier that is used when both sender and recipient can access shared master data. StandardID is a standardized identifier for this location, whose identification scheme is managed by an agency from the de 3055 code list. BuyerID is a identifier that is used by the BuyerParty proprietarily for this location. SellerID is a identifier that is used by the sellerparty proprietarily for this location. ProductRecipientID is a identifier that is used by the productrecipientparty proprietarily for this location. VendorID is a identifier that is used by the vendorparty proprietarily for this location. Address describes the location by identifying postal address, geographic coordinates, etc. Note is any additional information (e.g., directions). LoadingLocation one loading location is a location itself and can be identified proprietarily or partner-specifically. UnloadingLocation one unloading location is a location itself and can be identified proprietarily or partner-specifically.

In certain implementations, when defining addresses, organization addresses are supported. See GDT Address (described above). The different IDs of a BusinessTransactionDocumentTransshipmentLocation can identify the same location. A location is identified in the following ways: InternalID (e.g., when sender and recipient can access shared master data), StandardID (e.g., when sender and recipient can manage standardized identifiers), PartyIDs (e.g., when sender and recipient are interested in the IDs assigned by the parties involved). In certain implementations, the sender uses IDs that the recipient is expected to understand. The GDT can be used in business documents (i.e., BusinessTransactionDocuments).

BusinessTransactionDocumentTypeCode

A GDT BusinessTransactionDocumentTypeCode is a coded representation of the type of a document that occurs in business transactions. The document type describes the business nature of similar documents and can define the basic features of the documents of this type. An example of GDT BusinessTransactionDocumentTypeCode is:

<BusinessTransactionDocumentTypeCode>001</BusinessTransactionDocumentTypeCode>

In certain implementations, GDT BusinessTransactionDocumentTypeCode may have the following structure:

| GDT | Object Class | Property | Representation/ Association | Type | Type Name | Len. | Remarks |
|---|---|---|---|---|---|---|---|
| Business-TransactionDocumentType-Code | Business Transaction Document | Type | Code | CDT | Code | 1..5 | restricted |

The data type GDT BusinessTransactionDocumentTypeCode may assign a code list to the code. The attributes may be assigned the following values: listID="10004," listAgencyID="310," and listVersionID="tbd."

The GDT BusinessTransactionDocumentTypeCode can be used, for example, to categorize business transaction documents into messages if the document type is not already apparent based on the message. Several applications provide "service-driven" interfaces: The messages of these interfaces can be filled from various applications from different underlying documents. However, the "service" application has to know the type of business transaction document in question (e.g., the document type from which the message arose). For examples, DeliveryExecutionRequest (e.g., consistent request to Logistics to prepare and execute goods receipts or deliveries), BillingDueNotification (e.g., creation of the billing due list based on data from various applications and business documents), or PaymentDueNotification (e.g., creation of payment dues based on data from various applications and business documents.)

Messages may correspond to business documents. Such a business document can contain a business document object. A business document object can be a: Business Transaction Document or Master Data Document. The GDT BusinessTransactionDocumentTypeCode can categorize the Business Transaction Document. In R/3, the GDT BusinessTransactionDocumentTypeCode can correspond in principle, to VBTYP in Sales or BSTYP in Purchasing or MRM_REFERENZBELEG in Invoice Verification, etc. The Code Names can be defined in the code list may also be used in the tag names of the XML instance for references to Business Transaction Documents.

The data type GDT BusinessTransactionDocumentTypeCode may use the following codes: 001 (i.e., purchase order), 002 (i.e., sales contract), 003 (i.e., quote), 004 (i.e., invoice), 005 (i.e., credit memo), 006 (i.e., accounting document), 007 (i.e., accounting entry), 008 (i.e., accounting notification), 009 (i.e., accounts receivable payable ledger account discounting run), 010 (i.e., accounts receivable payable ledger account foreign currency remeasurement run), 011 (i.e., accounts receivable payable ledger account regrouping run), 012 (i.e., appointment activity), 013 (i.e., balance carry forward run), 014 (i.e., bank payment order), 015 (i.e., bank statement), 016 (i.e., bill of exchange payable), 017 (i.e., bill of exchange receivable), 018 (i.e., bill of exchange submission), 019 (i.e., cash ledger account foreign currency remeasurement run), 020 (i.e., cash payment), 021 (i.e., cash transfer), 022 (i.e., cheque deposit), 023 (i.e., clearing house payment order), 024 (i.e., confirmed inbound delivery), 025 (i.e., confirmed outbound delivery), 026 (i.e., credit card payment), 027 (i.e., customer complaint), 028 (i.e., customer invoice), 029 (i.e., customer invoice request), 030 (i.e., customer quote), 031 (i.e., customer requirement), 032 (i.e., customer return), 033 (i.e., debt guarantee), 034 (i.e., demand forecast), 035 (i.e., demand planning forecast), 036 (i.e., due clearing), 037 (i.e., due payment), 038 (i.e., dunning), 039 (i.e., email activity), 040 (i.e., employee time balance adjustment), 042 (i.e., employee time valuation), 043 (i.e., employee compensation agreement), 044 (i.e., employee time agreement), 045 (i.e., engineering change order), 046 (i.e., European community sales list report), 047 (i.e., expense report), 048 (i.e., expense arrangement), 049 (i.e., factoring), 050 (i.e., fax activity), 052 (i.e., fixed asset depreciation run), 053 (i.e., general ledger account assessment run), 054 (i.e., general ledger account distribution run), 055 (i.e., goods and activity confirmation), 056 (i.e., goods and service acknowledgement), 057 (i.e., goods receipt invoice receipt clearing run), 058 (i.e., inbound delivery), 059 (i.e., inbound delivery request), 060 (i.e., incoming cheque), 061 (i.e., in-house requirement), 062 (i.e., internal request), 063 (i.e., inventory price change run), 064 (i.e., lead), 065 (i.e., letter activity), 066 (i.e., liquidity forecast), 067 (i.e., liquidity planning item), 068 (i.e., logistics execution requisition), 069 (i.e., material cost estimate), 070 (i.e., material inspection), 071 (i.e., material inspection sample), 072 (i.e., opportunity), 073 (i.e., outbound delivery), 074 (i.e., outbound delivery request), 075 (i.e., outgoing cheque), 076 (i.e., overhead cost ledger account assessment run), 077 (i.e., overhead cost ledger account distribution run), 078 (i.e., overhead cost ledger account overhead cost calculation run), 079 (i.e., parental leave), 080 (i.e., payment advice), 081 (i.e., payment allocation), 082 (i.e., payment order), 083 (i.e., personnel hiring), 084 (i.e., personnel leaving), 085 (i.e., personnel transfer), 086 (i.e., phone call activity), 087 (i.e., physical inventory task), 088 (i.e., physical inventorycount), 089 (i.e., planned external procurement order), 090 (i.e., planned independent requirement), 091 (i.e., planned material flow), 092 (i.e., planned production order), 093 (i.e., planning view on purchase order), 094 (i.e., production confirmation), 095 (i.e., production ledger account overhead cost calculation run), 096 (i.e., production lot), 097 (i.e., production order), 098 (i.e., production request), 099 (i.e., production requisition), 100 (i.e., production task), 101 (i.e., product tax declaration), 103 (i.e., project cost estimate), 104 (i.e., project request), 105 (i.e., project simulation), 106 (i.e., project snapshot), 107 (i.e., purchase order confirmation), 108 (i.e., purchase request), 109 (i.e., purchase requisition), 110 (i.e., purchasing contract), 111 (i.e., request for quote), 112 (i.e., sales ledger account accruals run), 113 (i.e., sales ledger account overhead cost calculation run), 114 (i.e., sales order), 115 (i.e., service confirmation), 116 (i.e., service contract), 117 (i.e., service order), 118 (i.e., service request), 119 (i.e., site logistics confirmation), 120 (i.e., site logistics lot), 121 (i.e., site logistics order), 122 (i.e., site logistics request), 123 (i.e., site logistics requisition), 124 (i.e., site logistics task), 125 (i.e., software problem report), 126 (i.e., special leave), 127 (i.e., supplier invoice), 128 (i.e., supplier invoice request), 129 (i.e., supplier quote), 130 (i.e., supply planning exception), 131 (i.e., supply planning requirement), 132 (i.e., task), 133 (i.e., tax receivables payables), 134 (i.e., withholding tax declaration), 135 (i.e., work in process clearing run).

BusinessTransactionExecutionStatusCode

A GDT BusinessTransactionExecutionStatusCode is an encoded representation of the status of the execution of a business transaction. An example of GDT BusinessTransactionExecutionStatusCode is:

<GoodsIssueExecutionStatusCode>3</GoodsIssueExecutionStatusCode>

In certain implementations, GDT BusinessTransactionExecutionStatusCode may have the following structure:

| GDT | Object Class | Property | Representation/ Association | Type | Type Name | Len. | Remarks |
|---|---|---|---|---|---|---|---|
| BusinessTransactionExecutionStatusCode | Business Transaction | Execution Status | Code | CDT | Code | 1 | restricted |

The data type GDT BusinessTransactionExecutionStatusCode may have the following code list: Before execution (i.e., indicates that the execution of a business transaction has not yet started), In execution (i.e., indicates that a business transaction is currently being executed), or Executed (i.e., indicates that the execution of a business transaction has been completed)

When using the GDT BusinessTransactionExecutionStatusCode for a certain business transaction, the part of the name “BusinessTransaction” of the GDT can be replaced by the English description of the business transaction. In certain implementations, business transactions from the code list of the GDT BusinessTransactionTypeCode (described below) are allowed. For example, the execution status of a "GoodsIssue" is specified by the GoodsIssueExecutionStatusCode and the execution status of a "GoodsPutaway" is specified by the GoodsPutawayExecutionStatusCode.

The execution status of a business transaction in Sales (i.e., Sales and Delivery) can be represented in R/3 by the data element STATV.

In certain implementations, GDT BusinessTransactionExecutionStatusCode may have separation from existing GDTs. BusinessTransactionBlockedIndicator (i.e., indicates whether or not the execution of a business transaction is blocked). While the GDT BusinessTransactionExecutionStatusCode can indicate the current execution status of a business transaction, the BusinessTransactionBlockedIndicator may show whether or not the execution of a business transaction should start or be continued. For example, when a delivery is requested, it can also be requested that the delivery not be executed yet. BusinessTransactionCompletedIndicator may indicate whether or not the execution of a business transaction has been completed. This indicator can specify whether or not a business transaction is regarded as completed, regardless of its execution status. For example, a delivery that is being executed can be considered completed, even though the entire quantity has not been delivered.

may have the same level of detail (e.g., the codes are elementary for the application area). This can mean that there are no refinement or grouping relationships between the codes of an area. The codes to be used from the code list in the interface can be defined for each interface that uses the BusinessTransactionTypeCode. For every interface that uses the BusinessTransactionTypeCode the admissible codes may be specified in the interface documentation.

Business transactions can create or change BusinessTransactionDocuments. The data types GDT BusinessTransactionTypeCode and GDT BusinessTransactionDocumentTypeCode (described above) are therefore closely related. Since complex business transactions (e.g., confirmation of a production order) can create or change several business documents, in certain implementations, it is not possible to create a simple (e.g., 1:1 or 1:n) relationship between the code lists of these data types.

The data type GDT BusinessTransactionTypeCode may use the following code: 0001 (i.e., Service Entry).

CalendarUnitCode

A GDT CalendarUnitCode is the coded representation of a calendar-related unit. The calendar concerned can be the Gregorian calendar, but units from other calendars are also possible (e.g., work week from the factory calendar.) An example of GDT CalendarUnitCode is:

<CalendarUnitCode>DAY</CalendarUnitCode>

In certain implementations, GDT CalendarUnitCode may have the following structure:

| GDT | Property | Representation/ Association | Type | Type Name | Len. | Remarks |
|---|---|---|---|---|---|---|
| Calendar-UnitCode | Calendar Unit | Code | CDT | Code | 1..3 | Restricted |

BusinessTransactionTypeCode

The GDT BusinessTransactionTypeCode is a coded representation of the type of a business transaction. A business transaction is a self-sufficient, logical commercial transaction that results in a value change, a quantity change, or an event. An example of GDT BusinessTransactionTypeCode is:

<BusinessTransactionTypeCode>0001</BusinessTransactionTypeCode>

In certain implementations, GDT BusinessTransactionTypeCode may have the following structure:

| GDT | Object Class | Property | Representation/ Association | Type | Type Name | Len. | Remarks |
|---|---|---|---|---|---|---|---|
| Business-Transac-tionType-Code | Business Transaction | Type | Code | CDT | Code | 4 | restricted |

The data type GDT CalendarUnitCode may assign a code list to the code. The attributes may be assigned the following values: listID="10171" and listAgencyID="310."

The GDT CalendarUnitCode can be used to define recurring time periods which are the reference for capacity information specified in employee times (e.g., duration of productive work.)

In addition to the values currently listed in the code lists other values may be support (e.g., payroll periods or work weeks that do not span from Monday to Sunday) and may also include customer code lists. Therefore, the data type GDT CalendarUnitCode could be used if the recurring time periods can also be defined by such values. On the other hand, if only the values currently supported occur, it also may be possible to use the data type MeasureUnitCode. To facilitate mapping between MeasureUnitCode and CalendarUnitCode values, the corresponding ISO codes can be taken for the codes of those values that are MeasureUnitCode values. When using the Code FYP the specification of the underlying fiscal year can be obligatory.

The data type GDT BusinessTransactionTypeCode may assign a code list to the code. The attributes may be assigned the following values: listID="10007," listAgencyID="310," and listVersionID="tbd."

A GDT BusinessTransactionTypeCode can be used to provide Accounting with information about the type of a business transaction, the quantities, amounts, and other data from this business transaction. In Accounting, the business transaction type is a central control element for the document structure, account determination, etc. For any one business application area (e.g., Accounting), the BusinessTransactionTypeCodes The data type GDT CalendarUnitCode may use the following codes: DAY (i.e., day), WEE (i.e., week), MON (i.e., month), QUA (i.e., quarter), ANN (i.e., year), FYP (i.e., fiscal year period).

CancellationReasonCode

A GDT CancellationReasonCode is a coded representation for the reason for a cancellation. An example of GDT CancellationReasonCode is:

<ReplenishmentOrder> . . . <Item> <CancellationReasonCode>1<CancellationReasonCode> </Item> . . . </ReplenishmentOrder>

In certain implementations, GDT CancellationReasonCode may have the following structure:

| GDT | Property | Representation/ Association | Type | Type Name | Len. |
|---|---|---|---|---|---|
| Cancellation-ReasonCode | Cancellation Reason | Code | CDT | Code | 1..4 |

For GDT CancellationReasonCode, a customer-specific code list can be assigned to the code. A listID can be "10008." If the code list is unchanged, a listAgencyID can be "310." Otherwise, a listAgencyID can be the ID of the customer (e.g., ID from DE 3055, if listed there). A listVersionID can be the version of the particular code list (e.g., assigned and managed by the customer). A listAgencySchemeID can be the ID of the scheme if the listAgencyID does not come from DE 3055. The listAgencySchemeAgencyID can be the ID of the organization from DE 3055 that manages the listAgencySchemeID scheme.

For each type of BusinessTransactionDocument it may be specified which CancellationReasonCodes can be permitted.

The GDT CancellationReasonCode can be used to motivate a cancellation from a business point of view. It can make sense to specify this reason, in particular in the case of document changes on the basis of previous confirmations by the business partner.

The data element ABGRU (i.e., cancellation reason code for quotations and orders) can correspond to the CancellationReasonCode.

The data type GDT CancellationReasonCode may use the following code: 1 (i.e., delivery date too late), 2 (i.e., delivery date too early), 3 (i.e., delivery quantity too large), 4 (i.e., delivery quantity too small), 5 (i.e., quality of the substitute product is inadequate).

CartesianCoordinates

A GDT CartesianCoordinates are coordinates within a three-dimensional Cartesian system. An example of GDT CartesianCoordinates is:

<CartesianCoordinates> <XCoordinateMeasureunitCode="M">100.000</XCoordinateMeasure> <YCoordinateMeasure unitCode="M">150.000</YCoordinateMeasure> <ZCoordinateMeasure unitCode="M">100.000</ZCoordinateMeasure> </CartesianCoordinates>

In certain implementations, GDT CartesianCoordinates may have the following structure:

| GDT | | Cat. | Object Class | Property | Representation Term. | Type | Type Name | Card. |
|---|---|---|---|---|---|---|---|---|
| Carte-sianCoor-dinates | | | Cartesian Coordi-nates | | Details | | | |
| | XCoordi-nate-Measure | E | Cartesian Coordi-nates | X Coor-dinate | Measure | CDT | Measure | 1 |
| | YCoordi-nate-Measure | E | Cartesian Coordi-nates | Y Coor-dinate | Measure | CDT | Measure | 1 |
| | ZCoordi-nate-Measure | E | Cartesian Coordi-nates | Z Coor-dinate | Measure | CDT | Measure | 0..1 |

For the GDT CartesianCoordinates structure described above, the position is specified relative to a chosen origin (i.e., 0, 0, 0). XCoordinateMeasure specifies the coordinates of the length dimension in the Cartesian system relative to the chosen origin. YCoordinateMeasure specifies the coordinates of the width dimension in the Cartesian system relative to the chosen origin. ZCoordinateMeasure specifies the coordinates of the height dimension in the Cartesian system relative to the chosen origin.

The alignment and origin of the coordinate system may be specified in or known from the context. All the coordinates may be length coordinates.

The GDT CartesianCoordinates would be used for route calculation in the area of logistics execution to determine the storage area which can be the nearest to a Staging Area where materials can be put away for storage purposes. In certain implementations, CartesianCoordinates occurs in a specific business role. In element names these roles can appear as a qualifier prefix. For GDT CartesianCoordinates a valid qualifier can be: PositionCartesianCoordinates (i.e., PositionCoordinates specify a physical position).

CashDiscount

A GDT CashDiscount is an agreement on the percentage of cash discount that is granted during a sales transaction when payment takes place within a certain number of days after the baseline date for payment has passed. CashDiscount can consist of the two elements DaysValue and Percent from the core component type 'numeric.' An example of GDT CashDiscount is:

<MaximumCashDiscount> <DaysValue>15</DaysValue> <Percent>1.75</Percent> </MaximumCashDiscount>

In certain implementations, GDT CashDiscount may have the following structure:

| GDT | | Cat. | Object Class | Property | Rep./Ass. Qual. | Rep./Ass. | Type | Type Name | Len. | Card. |
|---|---|---|---|---|---|---|---|---|---|---|
| CashDiscount | | | CashDiscount | | Details | | | | | |
| | DaysValue | E | CashDiscount | Days | | Value | GDT | IntegerValue | 3 | 0..1 |
| | DayOfMonthValue | E | CashDiscount | DayOfMonth | | Value | GDT | IntegerValue | 2 | 0..1 |
| | MonthOffsetValue | E | CashDiscount | MonthOfffset | | Value | GDT | IntegerValue | 2 | 0..1 |
| | EndDate | E | CashDiscount | EndDate | | Date | CDT | Date | | 0..1 |
| | Percent | E | CashDiscount | Percent | | Percent | CDT | Percent | 5.3 | 1 |

For the GDT CashDiscount structure described above, DaysValue is the number of days after the baseline payment date has passed. DayOfMonthValue is the day of a following month when the payment period ends. MonthOffsetValue is the starting from the baseline payment date the MonthOffsetValue defines the following month when the payment period ends. EndDate defines the date when the payment period ends. Percent is the cash discount percentage rate. In certain implementations, it is a decimal number with a maximum of two places before the decimal point and three places after the decimal point.

The payment period can be specified by: the element DaysValue, the elements DayOfMonthValue and MonthOffsetValue, or the element EndDate.

CashDiscountLevelCode

A GDT CashDiscountLevelCode is the coded description of a cash discount level. A cash discount level is the determination of the cash discount that is granted for a payment. An example of GDT CashDiscountLevelCode is:

<Global Data Types—Definitionen>1</Global Data Types—Definitionen>

In certain implementations, GDT CashDiscountLevelCode may have the following structure:

The data type GDT CashDiscountLevelCode may assign a code list to the code. The attributes may be assigned the following values: listID="10275" and listVersionID=version of the particular code list (e.g., assigned and managed by the customer.

The GDT CashDiscountLevelCode can be used to specify a cash discount level with which a payment should take place or to document the cash discount level chosen for a payment.

The data type GDT CashDiscountLevelCode may use the following codes: 1 (i.e., maximum discount), 2 (i.e., normal discount), 3 (i.e., full payment).

CashDiscountTerms

A GDT CashDiscountTerms is an agreement of cash discounts for a payment. Cash discount terms are the specification of a period in which a payment is to be made completely and the discounts if a payment is made earlier. The following example contains the information that the complete payment is to be made within 15 days. A cash discount of 2 percent is granted if the payment is made within 10 days. An example of GDT CashDiscountTerms is:

<CashDiscountTerms> <NormalCashDiscount> <DaysValue>10</DaysValue> <Percent>2</Percent> </NormalCashDiscount> <FullPaymentDueDaysValue>15</FullPaymentDueDaysValue> </CashDiscountTerms>

In certain implementations, GDT CashDiscountTerms may have the following structure:

| GDT | | Cat. | Object Class | Property | Representation/Association | Type | Type Name | Len. | Card. | Remarks |
|---|---|---|---|---|---|---|---|---|---|---|
| Global Data Types-Definitionen | | | Cash Discount Level | | Code | CDT | Code | 1 | | restricted |
| | listVersionID | A | Code List | Version | Identifier | xsd | token | | 0..1 | |

| GDT | | Cat. | Object Class | Property | Rep./ Ass. | Type | Type Name | Len. | Card. |
|---|---|---|---|---|---|---|---|---|---|
| Cash-Discount Terms | | | Cash Discount Terms | | Details | | | | |
| | Payment Base-lineDate | E | Cash Discount Terms | Payment Baseline Date | Date | CDT | Date | | 0..1 |
| | Maxi-mum-Cash-Discount | E | Cash Discount Terms | Maxi-mum Cash Discount | Details | GDT | Cash-Discount | | 0..1 |
| | Normal-Cash-Discount | E | Cash Discount Terms | Normal Cash Discount | Details | GDT | Cash-Discount | | 0..1 |
| | Full-Payment DueDays Value | E | Cash Discount Terms | Full Payment Due Days | Value | GDT | Integer-Value | 3 | 0..1 |
| | Full-Payment DayOf-Month-Value | E | Cash Discount Terms | Full Payment Day Of Month | Value | GDT | Integer-Value | 2 | 0..1 |
| | Full-Payment Month-Offset-Value | E | Cash Discount Terms | Full Payment Month Offset | Value | GDT | Integer-Value | 2 | 0..1 |
| | Full-Payment-EndDate | E | Cash Discount Terms | Full Payment End Date | Date | CDT | Date | | 0..1 |
| | Descrip-tion | E | Cash Discount Terms | Descrip-tion | Text | GDT | Cash-Discount Terms-Descrip-tion | 1..80 | 0..1 |

For the GDT CashDiscountTerms structure described above, PaymentBaselineDate contains the baseline date for the calculation of payment deadlines. MaximumCashDiscount is the CashDiscount for the maximum cash discount. NormalCashDiscount is the CashDiscount for the normal cash discount. The following elements may describe the deadline on which everything may be paid completely: FullPaymentDueDaysValue contains the number of days for the payment deadline on which the full amount may be paid. FullPaymentDayOfMonthValue contains the information on which day of a following month the payment deadline for the payment of the full amount ends. FullPaymentMonthOffsetValue contains the information in which following month the payment deadline for the payment of the full amount ends. FullPaymentEndDate can contain a fixed date for the payment deadline on which the complete amount may be paid. Description contains the natural-language description of the terms of payment.

The following conditions may apply: the payment deadline on which the full amount may be paid can be specified as follows: by entering FullPaymentDueDaysValue, by entering FullPaymentDayOfMonthValue and FullPaymentMonthOffsetValue, or By entering FullPaymentEndDate. In certain implementations, MaximumCashDiscount exists if NormalCashDiscount is also specified. If only one cash discount percentage rate is specified, NormalCashDiscount may be used. In certain implementations, PaymentBaselineDate is specified if terms have been transferred for a specific payment, such as for an invoice. In certain implementations, if the baseline date for payment has not yet been determined (e.g., for an order), this element can be ignored. The payment deadline defined by MaximumCashDiscount may before the payment deadline defined by NormalCashDiscount. The payment deadline defined by NormalCashDiscount may before the payment deadline for payment of the full amount.

CashDiscountTermsCode

A GDT CashDiscountTermsCode is a coded representation of an agreement of cash discounts for a payment. CashDiscountTerms can be an agreement of cash discounts for a payment. An example of GDT CashDiscountTermsCode is:

<CashDiscountTermsCode>1</CashDiscountTermsCode>

In certain implementations, GDT CashDiscountTermsCode may have the following structure:

| GDT | | Cat. | Object Class | Property | Representation/ Association | Type | Type Name | Len. | Card. | Remarks |
|---|---|---|---|---|---|---|---|---|---|---|
| CashDis-count-Terms-Code | | | Cash Dis-count Terms | | Code | CDT | Code | 1..4 | | restricted |
| | listID | A | Code List | Identi-fica-tion | Identi-fier | xsd | token | | 0..1 | |

-continued

| GDT | | Cat. | Object Class | Property | Representation/ Association | Type | Type Name | Len. | Card. | Remarks |
|---|---|---|---|---|---|---|---|---|---|---|
| | listAgency-ID | A | Code List Agency | Identi-fica-tion | Identi-fier | xsd | token | | 0..1 | |
| | listVer-sionID | A | Code List | Ver-sion | Identi-fier | xsd | token | | 0..1 | |
| | listAgency-Scheme-ID | A | Code List Agency | Scheme | Identi-fier | xsd | token | | 0..1 | |
| | listAgency-Scheme-AgencyID | A | Code List Agency | Scheme Agency | Identi-fier | xsd | token | | 0..1 | |

For GDT CashDiscountTermsCode, a customer-specific code list can be assigned to the code. A listID can be "100063." A listAgencyID can be the ID of the customer (e.g., ID from DE 3055, if listed there). A listVersionID can be the version of the particular code list (e.g., assigned and managed by the customer). A listAgencySchemeID can be the ID of the scheme if the listAgencyID does not come from DE 3055. The listAgencySchemeAgencyID can be the ID of the organization from DE 3055 that manages the listAgencySchemeID scheme.

CashLocationBlockingReasonCode

A GDT CashLocationBlockingReasonCode is a coded representation of a reason why the use of a cash location is blocked. A cash location can be a physical or logical location where means of payment (e.g., cash, checks, bill of exchange) are stored and managed. An example of GDT CashLocation-BlockingReasonCode is:

<CashLocationBlockingReasonCode>1</CashLocation-BlockingReasonCode>

In certain implementations, GDT CashLocationBlockingReasonCode may have the following structure:

| GDT | | Cat. | Object Class | Property | Representation/ Association | Type | Type Name | Len. | Card. | Remarks |
|---|---|---|---|---|---|---|---|---|---|---|
| CashLoca-tionBlock-ingReason-Code | | | Cash Location | Block-ing Reason | Code | CDT | Code | 1..2 | | restricted |
| | listID | A | Code List | Iden-tifica-tion | Identifier | xsd | token | | 0..1 | |
| | listAgency-ID | A | Code List Agency | Iden-tifica-tion | Identifier | xsd | token | | 0..1 | |
| | listVer-sionID | A | Code List | Ver-sion | Identifier | xsd | token | | 0..1 | |
| | listAgen-cyScheme-ID | A | Code List Agency | Scheme | Identifier | xsd | token | | 0.. | |
| | listAgency-Scheme-Agency-ID | A | Code List Agency | Scheme Agency | Identifier | xsd | token | | | |

In certain implementations, the GDT CashDiscountTermsCode is used in messages if a sender and a receiver can access common a Business Configuration (e.g., during in-house communication).

The GDT CashDiscountTermsCode can be used in sales orders, purchase orders, and invoices. The corresponding terms of payment deliver information can be for financial planning, dunning, and payment transactions. Examples of the possible semantics of the codes can be: 14 days, 3%, 30 2%, 45 net (i.e., payable in 45 days without deduction or within 30 days with 2% cash discount or within 14 days with 3%), Days 0%, 0/0, 0 net (i.e., payable immediately without deductions).

The agreement of cash discounts for a payment is usually represented with the CashDiscountTerms. However, CashDiscountTerms can be predefined in the Business Configuration and be provided with a CashDiscountTermsCode to assign it to a sales order.

In some implementations, for GDT CashLocationBlockingReasonCode, a customer-specific code list can be assigned to the code. A listID can be assigned by the coaching team. If the code list is unchanged, a listAgencyID can be "310." Otherwise, a listAgencyID can be the ID of the customer (e.g., ID from DE 3055, if listed there). A listVersionID can be the version of the particular code list (e.g., assigned and managed by the customer). A listAgencySchemeID can be the ID of the scheme if the listAgencyID does not come from DE 3055. The listAgencySchemeAgencyID can be the ID of the organization from DE 3055 that manages the listAgencySchemeID scheme.

In messages, CashLocationBlockingReasonCode can be used when both sender and recipient have access to shared or harmonized Business Configuration (e.g., during internal communication in an enterprise).

The data type GDT CashLocationBlockingReasonCode may use the following code: 1 (i.e., disputed).

CashLocationTypeCode

A GDT CashLocationTypeCode is the coded representation of the type of a physical or logical location where means of payment (e.g., cash, checks, bill of exchange) are stored and managed. An example of GDT CashLocationTypeCode is:

<CashLocationTypeCode>1</CashLocationTypeCode>

In certain implementations, GDT CashLocationTypeCode may have the following structure:

| GDT | Object Class | Property | Representation/ Association | Type | Type Name | Len. | Remarks |
|---|---|---|---|---|---|---|---|
| CashLocationTypeCode | Cash Location | Type | Code | CDT | Code | 1..3 | Restricted |

The data type GDT CashLocationTypeCode may assign a code list to the code. The attributes may be assigned the following values: listID="10233," listAgencyID="310," and listVersionID=version of the relevant code list (e.g., assigned and managed by the customer).

The GDT CashLocationTypeCode can be used to differentiate between cash accounts depending on the type of the physical or logical location where they are stored.

The data type GDT CashLocationTypeCode may use the following codes: 1 (i.e., house bank account), 2 (i.e., cash account), 3 (i.e., check storage), 4 (i.e., bill of exchange book), 5 (i.e., payment card receivables account).

CashStorageID

A GDT CashStorageID is an identifier for a storage of cash in a currency. An example of GDT CashStorageID is:

<CashStorageIDschemeAgencyID="VV4__000">Kasse1</CashStorageID>

In certain implementations, GDT CashStorageID may have the following structure:

| GDT | | Cat. | Object Class | Property | Representation/ Association | Type | Type Name | Len. | Card. | Remarks |
|---|---|---|---|---|---|---|---|---|---|---|
| CashStorageID | | | Cash Storage | Identification | Identifier | CDT | Identifier | 1..32 | | Restricted |
| | schemeAgencyID | A | Identification Scheme Agency | Identification | Identifier | xsd | token | 1..60 | 0..1 | |

The data type GDT CashStorageID may assign a code list the code. The attributes may be assigned the following values: schemaID="CashStorageID" and schemeAgencyID=business System, which issued the ID.

The GDT CashStorageID can be used to identify internal storages for cash of a currency such as cash desks and safe deposit boxes.

CatalogueApprovalStatusReasonCode

A GDT CatalogueApprovalStatusReasonCode is the coded display of the reason for an approval status in the catalog. A catalog is a structured directory of catalog items, where each item represents an object and provides information about this object. The approval status can indicate both the approval status of the catalog itself and the approval status of catalog parts (e.g., catalog item). An example of GDT CatalogueApprovalStatusReasonCode is:

<CatalogueApprovalStatusReasonCode>1</CatalogueApprovalStatusReasonCode>

In certain implementations, GDT CatalogueApprovalStatusReasonCode may have the following structure:

| GDT | Object Class | Property | Representation/ Association | Type | Type Name | Len. | Remarks |
|---|---|---|---|---|---|---|---|
| CatalogueAppprovalStatusReasonCode | Catalogue Approval Status | Reason | Code | CDT | Code | 1..2 | Restricted |

The data type GDT CatalogueApprovalStatusReasonCode may assign a code list to the code. The attributes may be assigned the following values: listID="10235" and listAgencyID="310."

The data type GDT CatalogueApprovalStatusReasonCode may use the following codes: 1 (i.e., result approval rule), 2 (i.e., approval rule not applicable), 3 (i.e., standard approval status set), 4 (i.e., approval status unchanged), 5 (i.e., approval status set due to invalid valuation), 6 (i.e., approval status set due to missing valuation), 7 (i.e., approval status changed by business add-in).

CatalogueChangeListID

A GDT CatalogueChangeListID is an identifier for a catalog change list. A catalog change list is a list of changed catalog parts (e.g., properties, property data types, catalog schemas, catalog sections, catalog section types, catalog items and catalog views), which were changed since the most recent version of the catalog, which is fully published. An example of GDT CatalogueChangeListID is:

<CatalogueChangeListID>SMITHJD2005-11-11T11:11:11</CatalogueChangeListID>

In certain implementations, GDT CatalogueChangeListID may have the following structure:

| GDT | Object Class | Property | Representation/ Association | Type | Type Name | Len. | Remarks |
|---|---|---|---|---|---|---|---|
| Catalogue-Change-ListID | Catalogue Change List | Identification | Identifier | CDT | Identifier | 1..40 | restricted |

In certain implementations, a GDT CatalogueChangeListID is in the context of the catalogue to which the change list belongs.

CatalogueID

A GDT CatalogueID is an identifier for a catalog. A catalog is a systematically arranged directory of objects of a particular type that are identified within the catalog. An example of GDT CatalogueID is:

<CatalogueIDschemeID='ProductCatalogues'schemeAgencyID='123456789'schemeAgencySchemeAgencyID='16'>MyProducts2002</CatalogueID>

In certain implementations, GDT CatalogueID may have the following structure:

| GDT | | Cat. | Object Class | Property | Representation/ Association | Type | Type Name | Length | Card. | Remarks |
|---|---|---|---|---|---|---|---|---|---|---|
| Catalogue-ID | | | Catalog | Identification | Identifier | CDT | Identifier | 1..40 | | restricted |
| | schemeID | A | Identification Scheme | Identification | Identifier | xsd | token | 1..60 | 0..1 | |
| | scheme-AgencyID | A | Identification Scheme Agency | Identification | Identifier | xsd | token | 1..60 | 0..1 | |
| | scheme-Agency-SchemeID | A | Identification Scheme Agency | Scheme | Identifier | xsd | token | 1..60 | 0..1 | |
| | scheme-Agency-Scheme AgencyID | A | Identification Scheme Agency | Scheme Agency | Identifier | xsd | token | 1..3 | 0..1 | |

For the data type GDT CatalogueID the attributes may be assigned the following values. SchemeID can be the ID of the ID scheme (e.g., released and maintained by the responsible organization of the ID scheme). The GDT owner may retrieve the correct ID from the responsible organization. If there is no ID available, the name of the identifier or identifier type may be entered, which can be used in the corresponding standard, specification, or scheme of the responsible organization. SchemeAgencyID can be the ID of the organization maintaining the ID scheme. This identification can be released by an organization contained in DE 3055. The GDT owner may retrieve the correct ID from the responsible organization. If the organization is not contained in DE 3055, proceed as described in "Data Type Catalog," 5.6.6.c. SchemeAgencySchemeID can be the identification of the schema which can identify the organization named in SchemeAgencyID. SchemeAgencyID is a certain scheme ID of partners, companies, members etc. of an organization named in SchemeAgencySchemeAgencyID. SchemeAgencySchemeAgencyID can be the identification of the maintaining organization which may be responsible for the identification of the organization named in schemeAgencyID. The organization may be contained in DE 3055.

The GDT CatalogueID can be used to identify a catalog (e.g., electronic product or vendor catalogs). The attributes SchemeID, SchemeAgencyID, SchemeAgencySchemeID, and SchemeAgencySchemeAgencyID can be used in the same way as planned for the CDT Identifier, in order to define the context for which a CatalogueID may be guaranteed.

CatalogueInterfaceTypeCode

A GDT CatalogueInterfaceTypeCode is a coded representation of a catalog interface type. The type of a catalog interface can define the kind of catalog data transferred to or handled by a catalog interface. An example of GDT CatalogueInterfaceTypeCode is:

<CatalogueInterfaceTypeCode>1</CatalogueInterfaceTypeCode>

In certain implementations, GDT CatalogueInterfaceTypeCode may have the following structure:

| GDT | | Cat. | Object Class | Property | Representation/ Association | Type | Type Name | Len. | Card. | Remarks |
|---|---|---|---|---|---|---|---|---|---|---|
| Catalogue-Interface-Type-Code | | | Catalogue Interface | Type | Code | CDT | Code | 1..2 | | restricted |
| | listID | A | Code List | Identification | Identifier | xsd | token | | 0..1 | |
| | list-AgencyID | A | Code List Agency | Identification | Identifier | xsd | token | | 0..1 | |
| | list-VersionID | A | Code List | Version | Identifier | xsd | token | | 0..1 | |
| | list-Agency-SchemeID | A | Code List Agency | Scheme | Identifier | xsd | token | | 0..1 | |
| | list-Agency-Scheme-AgencyID | A | Code List Agency | Scheme Agency | Identifier | xsd | token | | 0..1 | |

For GDT CatalogueInterfaceTypeCode, a customer-specific code list can be assigned to the code. A listID can be assigned by the coaching team. If the code list is unchanged, a listAgencyID can be "310." Otherwise, a listAgencyID can be the ID of the customer (e.g., ID from DE 3055, if listed there). A listVersionID can be the version of the particular code list (e.g., assigned and managed by the customer). A listAgency-SchemeID can be the ID of the scheme if the listAgencyID does not come from DE 3055. The listAgencySchemeAgencyID can be the ID of the organization from DE 3055 that manages the listAgencySchemeID scheme.

CatalogueItemRelationshipTypeCode

A GDT CatalogueItemRelationshipTypeCode is a coded representation of the type of a business relationship between objects of the same object type within a catalogue, and is used to create structures (e.g., hierarchies or networks) on these objects. An example of GDT CatalogueItemRelationship-TypeCode is:

<CatalogueItemRelationshipTypeCode>001</CatalogueItemRelationshipTypeCode>

In certain implementations, GDT CatalogueItemRelationshipTypeCode may have the following structure:

| GDT | Object Class | Property | Representation/ Association | Type | Type Name | Len. | Remarks |
|---|---|---|---|---|---|---|---|
| Catalogue-Item-Relation-shipType-Code | Catalogue Item Rela-tionship | Type Code | Code | CDT | Code | 3 | restricted |

For GDT CatalogueInterfaceTypeCode an example for a customer-specific code can be: OPI (i.e., open partner interface).

The data type GDT CatalogueInterfaceTypeCode may use the following code: 01 (i.e., open catalog interface).

CatalogueItemID

A GDT CatalogueItemID is a identifier for an object within a catalog and is unique within the context of the catalog. An example of GDT CatalogueItemID is:

<CatalogueItemID>1AXX3332-0</CatalogueItemID>

In certain implementations, GDT CatalogueItemID may have the following structure:

| GDT | Object Class | Property | Representation/ Association | Type | Type Name | Length | Remarks |
|---|---|---|---|---|---|---|---|
| Catalogue-ItemID | Catalogue Item | Identifi-cation | Identifier | CDT | Identifier | 1..40 | restricted |

In certain implementations, the GDT CatalogueItemID is a character string that can consist of a length of approximately 40 characters and can conform to the rules defined for xsd: token. The GDT CatalogueItemID can be used to identify an object within a catalog.

In certain implementations, the code list X12/735 (i.e., "Hierarchical Structure Characteristic Level Code") is not used, because it can restrict to hierarchical structures and does not contain the codes. Therefore, the data type GDT CatalogueItemRelationshipTypeCode may assign a code list to the code. The attributes may be assigned the following values: listID="10033," listAgencyID="310," and listVersionID="tbd."

The GDT CatalogueItemRelationshipTypeCode can be used for typing relationships between objects of an object type within a catalogue, for example, relationships between products (e.g., a spare-part relationship), relationships between document items (e.g., a discount-in-kind relationship), or relationships between project plans. In certain implementations, the typing of relationships between objects of different object types is may not be covered by this GDT. This can include (e.g., relationships) between a product and a business document, between a marketing plan and a marketing campaign, between a business document and an item of a document, or between a project plan and a project plan element. Furthermore, the GDT CatalogueItemRelationshipTypeCode can be restricted to the typing of relationships from a purely business perspective.

The data type GDT CatalogueItemRelationshipTypeCode may use the following codes: 001 (i.e., spare part), 002 (i.e., accessories), 003 (i.e., service product).

CataloguePublishingTypeCode

A GDT CataloguePublishingTypeCode is a coded representation of a catalog publishing type. Catalog publishing can be the process of releasing changes to a catalog for access by, or exchange with, the target group of people the catalog's content has been tailored for. Changes can mean the creation, update, or deletion of a catalog, or parts of it. An example of GDT CataloguePublishingTypeCode is:

<CataloguePublishingTypeCode>1</CataloguePublishingTypeCode>

In certain implementations, GDT CataloguePublishingTypeCode may have the following structure:

| GDT | Cat. | Object Class | Property | Representation/ Association | Type | Type Name | Len. | Card. | Remarks |
|---|---|---|---|---|---|---|---|---|---|
| CataloguePublishingTypeCode | | Catalogue Publishing | Type | Code | CDT | Code | 1..2 | | restricted |

The data type GDT CataloguePublishingTypeCode may assign a code list to the code. The attributes may be assigned the following values: listID="10423," listAgencyID="310," and listVersionID=version of the particular code list (e.g., assigned and managed by the customer).

The data type GDT CataloguePublishingTypeCode may use the following codes: 1 (i.e., changes only), 2 (i.e., complete), 3 (i.e., revert).

CatalogueReference

A GDT CatalogueReference is a reference to a catalog or to an object within a catalog. A catalog is a list of objects of a particular type that can be identified within the list and that have access functions for this list. An example of GDT CatalogueReference is:

<CatalogueReference> <CatalogueIDschemeID='Product Catalogues'schemeAgencyID='123456789'scheme AgencySchemeAgencyID='16'>MyProducts2002</CatalogueID> <CatalogueItemID>1AXX3332-0</CatalogueItemID> </CatalogueReference>

In certain implementations, GDT CatalogueReference may have the following structure:

| GDT | | Cat. | Object Class | Property | Representation/ Association | Type | Type Name | Card. |
|---|---|---|---|---|---|---|---|---|
| Catalogue-Reference | | | Catalogue Reference | | Details | | | |
| | ID | E | Catalogue Reference | Identification | Identifier | GDT | Catalogue-ID | 1 |
| | ItemID | E | Catalogue Reference | Item Identification | Identifier | GDT | Catalogue-ItemID | 0..1 |

The GDT CatalogueReference can be used to reference a catalog or an item within a catalog (e.g., the "Order" document can contain references to a vendor's product catalog).

CatalogueSchemaID

A GDT CatalogueSchemaID is a identifier for a catalog schema. A catalog schema can define the structure of a catalog by means of sections (i.e., group together similar catalog objects) Relationships between sections or attributes can be assigned to all the catalog items or to catalog items within a particular section. An example of GDT CatalogueSchemaID is:

<CatalogueSchemaID>UNSPC</CatalogueSchemaID>

In certain implementations, GDT CatalogueSchemaID may have the following structure:

| GDT | Object Class | Property | Representation/ Association | Type | Type Name | Len. | Remarks |
|---|---|---|---|---|---|---|---|
| Catalogue-SchemaID | Catalogue Schema | Identification | Identifier | CDT | Identifier | 1..40 | restricted |

In certain implementations, the GDT CatalogueSchemaID can be up to 40 characters long. The attributes may be assigned the following values: upper and lowercase characters from A to Z, digits from 0 to 9, minus sign, underscore, dash, and/or a period. In certain implementations, the GDT CatalogueSchemaID is in the context of a catalog and no distinction is made between upper and lowercase characters.

The GDT CatalogueSchemaID can be used to identify a catalog schema within the catalog.

CatalogueSchemaTypeCode

A GDT CatalogueSchemaTypeCode is a coded representation of the type of a catalog schema. An example of GDT CatalogueSchemaTypeCode is:

<CatalogueSchemaTypeCode>01</CatalogueSchemaTypeCode>

In certain implementations, GDT CatalogueSchemaTypeCode may have the following structure:

| GDT | Object Class | Property | Representation/ Association | Type | Type Name | Len. | Remarks |
|---|---|---|---|---|---|---|---|
| Catalogue-Schema-Type-Code | Catalogue Schema | Type | Code | CDT | Code | 2 | restricted |

The data type GDT CatalogueSchemaTypeCode may assign a code list to the code. The attributes may be assigned the following values: listID="10009," listAgencyID="310," and listVersionID="tbd."

The GDT CatalogueSchemaTypeCode can be a proprietary code list with predefined values. Changes to the permitted values can involve changes to the interface.

The data type GDT CatalogueSchemaTypeCode may use the following codes: 01 (i.e., neutral schema), 02 (i.e., goods group schema), 03 (i.e., taxonomy schema).

CatalogueSectionID

A GDT CatalogueSectionID is a identifier for a catalog section. A catalog section can be a means of structuring the contents of a catalog using a particular system. A section can contain additional sections, as well as catalog items and the attributes that describe the types of the items. An example of GDT CatalogueSectionID is:

<CatalogueSectionID>Bicycles</CatalogueSectionID>

In certain implementations, GDT CatalogueSectionID may have the following structure:

| GDT | Object Class | Property | Representation/ Association | Type | Type Name | Len. | Remarks |
|---|---|---|---|---|---|---|---|
| Catalogue-SectionID | Catalogue Section | Identification | Identifier | CDT | Identifier | 1..40 | restricted |

The data type GDT CatalogueSectionID can be up to 40 characters long. In certain implementations, characters can include: upper and lowercase characters from A to Z, digits from 0 to 9, minus sign, underscore, backslash, forward slash, and/or period.

The GDT CatalogueSectionID can be used in the context of a catalog schema. In certain implementations, no distinction is made between upper and lowercase characters.

The GDT CatalogueSectionID can be used to identify a section within a catalog schema.

CatalogueSectionTypeID

A GDT CatalogueSectionTypeID is a identifier for a catalog section type. A catalog section type can describe the business nature of a catalog section and can define a set of attributes that is assigned to a section of this type. An example of GDT CatalogueSectionTypeID is:

<CatalogueSectionTypeID>Vehicles<CatalogueSection TypeID>

In certain implementations, GDT CatalogueSectionTypeID may have the following structure:

| GDT | Object Class | Property | Representation/ Association | Type | Type Name | Len. | Remarks |
|---|---|---|---|---|---|---|---|
| Catalogue-Section-TypeID | Catalogue Section Type | Identification | Identifier | CDT | Identifier | 1..40 | restricted |

For data type GDT CatalogueSectionTypeID could be up to 40 characters long. The following values may be allowed: upper and lowercase characters from A to Z, digits from 0 to 9, minus sign, underscore, backslash, forward slash, and/or period.

The GDT CatalogueSectionTypeID can be used in the context of the catalog. In certain implementations, no distinction is made between upper and lowercase characters.

CatalogueTypeCode

A GDT CatalogueTypeCode is a coded representation of the type of a catalog. This can be determined by its business purpose, from which the basic attributes are derived. An example of GDT CatalogueTypeCode is:

<CatalogueTypeCode>01</CatalogueTypeCode>

In certain implementations, GDT CatalogueTypeCode may have the following structure:

| GDT | Object Class | Property | Representation/ Association | Type | Type Name | Len. | Remarks |
|---|---|---|---|---|---|---|---|
| Catalogue-TypeCode | Catalogue | Type | Code | CDT | Code | 2 | restricted |

The data type GDT CatalogueTypeCode may assign a code list to the code. The attributes may be assigned the following values: listID="10010," listAgencyID="310," and listVersionID="tbd."

For example, a purchasing catalog (i.e., code 01) could be XYZ-B2B. The company can use this catalog for purchasing. The products contained in the catalog can come from different vendors.

The GDT CatalogueTypeCode can be a proprietary code list with predefined values. Changes to the permitted values can involve changes to the interface.

The data type GDT CatalogueTypeCode may use the following codes: 01 (i.e., purchasing product catalog), 02 (i.e., vendor product catalog), 03 (i.e., purchase contract product catalog), 04 (i.e., sales product catalog).

CatalogueUpdateMethodTypeCode

A GDT CatalogueUpdateMethodTypeCode is a coded representation of the type of an update method of a catalog. An update method for a catalog can be a set of rules that can control how objects (e.g., products) are cataloged in a catalog and how to update the catalog when cataloged objects are changed. A catalog can be a structured directory of catalog items, where each catalog item can represent an object and provides information about it. An example of GDT CatalogueUpdateMethodTypeCode is:

<CatalogueUpdateMethodTypeCode>1</CatalogueUpdateMethodTypeCode>

In certain implementations, GDT CatalogueUpdateMethodTypeCode may have the following structure:

| GDT | Object Class | Prop- | Representation/ Association | Type | Type Name | Len. | Remarks |
|---|---|---|---|---|---|---|---|
| CatalogueUpdateMethod TypeCode | Catalogue Update Method | Type | Code | CDT | Code | 1..2 | restricted |

The data type GDT CatalogueUpdateMethodTypeCode may assign a code list to the code. The attributes may be assigned the following values: listID="10464" and listAgencyID="310."

The data type GDT CatalogueUpdateMethodTypeCode may use the following code: 1 (i.e., update from master data).

CatalogueUpdateTypeCode

A GDT CatalogueUpdateTypeCode is a coded representation of the type of a catalog update. A catalog update can be executing catalog update methods, deleting large parts of a catalog, or other changes affecting large parts of a catalog. An example of GDT CatalogueUpdateTypeCode is:

<CatalogueUpdateTypeCode>2</CatalogueUpdateTypeCode>

In certain implementations, GDT CatalogueUpdateTypeCode may have the following structure:

| GDT | Object Class | Property | Representation/ Association | Type | Type Name | Len. | Remarks |
|---|---|---|---|---|---|---|---|
| Catalogue-Update-Type-Code | Catalogue Update | Type | Code | CDT | Code | 1..2 | restricted |

The data type GDT CatalogueUpdateTypeCode may assign a code list to the code. The attributes may be assigned the following values: listID="10433" and listAgencyID="310."

The data type may use the following codes: 1 (i.e., catalog update method execution), 2 (i.e., catalog consolidation), 3 (i.e., deletion).

CatalogueViewID

A GDT CatalogueViewID is a identifier for a catalog view. A catalog view is a subset of the information contained in the catalog. The view can be determined by its: catalog schemes, sections, catalog items. Individual attributes can be excluded from a view. An example of GDT CatalogueViewID is:

<CatalogueViewID>ManagerView</CatalogueViewID>

In certain implementations, GDT CatalogueViewID may have the following structure:

| GDT | Object Class | Property | Representation/ Association | Type | Type Name | Len. | Remarks |
|---|---|---|---|---|---|---|---|
| Catalogue-ViewID | Catalogue View | Identification | Identifier | CDT | Identifier | 1..40 | restricted |

The data type GDT CatalogueViewID can be up to 40 characters long. The following values can be allowed: upper and lowercase characters from A to Z, digits from 0 to 9, minus sign, underscore, backslash, forward slash, and/or period.

The GDT CatalogueViewID can be used in the context of the catalog to which the view belongs. In certain implementations, no distinction is made between upper and lowercase characters.

CentralBankReportItem

A GDT CentralBankReportItem is a single report to the central bank during a foreign payment. An example of GDT CentralBankReportItem is:

<CentralBankReportItem> <ReportingCountryCode>DE</CountryCode> <SupplyingCountryCode>US</VendorCountryCode> <Amount currencyCode="USD">2500.00</Amount> <ReasonClassificationCode>2</ClassificationCode> <ReasonCode>520</Code> <ReasonDescription>Entgelte für selbständige Arbeit</Description> </CentralBankReportItem>

In certain implementations, GDT CentralBankReportItem may have the following structure:

| GDT | | Cat. | Object Class | Property | Representation/Association | Type | Type Name | Card. |
|---|---|---|---|---|---|---|---|---|
| Central-Bank-Report-Item | | | Central Bank Report Item | | Details | | | |
| | Reporting-Country-Code | E | Central Bank Report Item | Reporting-Country | Code | GDT | Country-Code | 1 |
| | Supplying-Country-Code | E | Central Bank Report Item | Supplying-Country | Code | GDT | Country-Code | 0..1 |

-continued

| GDT | | Cat. | Object Class | Property | Represen-tation/As-sociation | Type | Type Name | Card. |
|---|---|---|---|---|---|---|---|---|
| | Amount | E | Central Bank Re-port Item | Amount | Amount | CDT | Amount | 1 |
| | Reason-Classifi-cation-Code | E | Central Bank Re-port Item | Reason Classifi-cation | Code | GDT | Central-BankRe-portRea-sonClassi-fication-Code | 0..1 |
| | Reason-Code | E | Central Bank Re-port Item | Reason | Code | GDT | Central-BankRe-portRea-sonCode | 0..1 |
| | Reason-Descrip-tion | E | Central Bank Re-port Item | Reason | Descrip-tion | CDT | Descrip-tion | 0..1 |

For the GDT CentralBankReportItem structure described above, ReportingCountryCode is a reporting country, this can mean the country in which is reported to the state central bank. SupplyingCountryCode is a delivering country, this can mean the country in which the service was provided or from which the delivered goods came which resulted in the payment. Amount is an amount to be reported. ReasonClassificationCode is a coded representation of the classification of the reason for the report (i.e., reason for notification). ReasonCode is a coded representation of the reason for the report (i.e., reason for notification) (e.g., key figure according to national service specifications). ReasonDescription is a description of the reason for the report (i.e., reason for notification).

In certain implementations, these integrity conditions are valid in the following countries: Germany (i.e., ReasonClassificationCode and ReasonCode may be specified), Japan (i.e., only ReasonCode is specified), Netherlands (i.e., only ReasonClassificationCode is specified.

StateCentralBankReport can be used, for example, in a payment order to give the bank the data necessary for a report to the state central bank.

CentralBankReportReasonClassificationCode

A GDT CentralBankReportReasonClassificationCode is the coded representation of the classification of reasons for a report to the state central bank (i.e., reasons for notification). An example of GDT CentralBankReportReasonClassificationCode is:

<CentralBankReportReasonClassificationCode>2</CentralBankReportReasonClassificationCode>

In certain implementations, GDT CentralBankReportReasonClassificationCode may have the following structure:

| GDT | Object Class | Property | Represen-tation/As-sociation | Type | Type Name | Len. | Remarks |
|---|---|---|---|---|---|---|---|
| Central-Bank-Report-Reason-Classi-fication-Code | Central Bank Report Reason | Classifica-tion | Code | CDT | Code | 1 | restricted |

The data type GDT CentralBankReportReasonClassificationCode can be a country-specific code list. The country may be known from the context. The two character country code can be used in the name of the code list, according to ISO-3166-1.

The GDT CentralBankReportReasonClassificationCode can be used in CentralBankReportItem. The country of the code list can be the reporting country (i.e., CentralBankReportItem.CountryCode).

In foreign payment transactions in Germany, the CentralBankReportReasonClassificationCode can be specified using the document type. In the data medium exchange (i.e., format DTAZV), the document type can be transferred in field W3, the values 2 and 4 are possible. The document type can also used during the creation of the Z4 form. In foreign payment trans-actions in the Netherlands (i.e., format BTL91), the CentralBankReportReasonClassificationCode can be transferred in the field "Code Betaling Betreft."

The data type GDT CentralBankReportReasonClassificationCode may use the following codes: 1 (i.e., services, transfers for incoming payment), 2 (i.e., services, transfers for outgoing payment), 3 (i.e., capital transactions, income on investment for incoming payment), 4 (i.e., capital transactions, income on investment for outgoing payment), 5 (i.e., transit trade for incoming payment), 6 (i.e., transit trade for outgoing payment).

CentralBankReportReasonCode

A GDT CentralBankReportReasonCode is the coded representation of the reason for a report to the state central bank (i.e., reasons for notification). An example of GDT CentralBankReportReasonCode is:

<CentralBankReportReasonCodeschemeAgencyID=
"DE">520</CentralBankReportReasonCode>

In certain implementations, GDT CentralBankReportReasonCode may have the following structure:

| GDT | Object Class | Property | Represen-tation/As-sociation | Type | Type Name | Len. | Remarks |
|---|---|---|---|---|---|---|---|
| Central-Bank-Report-Reason-Code | Central Bank Report | Reason | Code | CDT | Code | 1..3 | restricted |

The data type GDT CentralBankReportReasonCode may have several country-specific code lists, which can be different at runtime, can be assigned to the code. The GDT CentralBankReportReasonCode can be used in CentralBankReportItem. The country of the code list can be the reporting country (i.e., CentralBankReportItem.CountryCode). The attributes may be assigned the following values: listID="22001," listAgencyID=nn, listVersionID=version of the code list (e.g., assigned by the standardization organization), listAgencySchemeID=scheme used to assign the listAgencyID (e.g., EAN, DUNS)], and listAgencySchemeAgencyID organization according to DE 3055 that manages the scheme.

ChangeDocumentItemID

A GDT ChangeDocumentItemID is a identifier of an item of a change document. A change document item can contain information about a single changed element of a business object. An example of GDT ChangeDocumentItemID is:

<ChangeDocumentItemID>1<ChangeDocumentItemID>

<ChangeDocumentItemID>2</ChangeDocumentItemID>

In certain implementations, GDT ChangeDocumentItemID may have the following structure:

| GDT | Object Class | Property | Representation/Association | Type | Type Name | Len. | Remarks |
|---|---|---|---|---|---|---|---|
| ChangeDocumentItemID | Change Document | Item | Identifier | CDT | Identifier | 1..10 | Restricted |

The data type GDT ChangeDocumentItemID can be a sequence of numbers with up to ten characters. In certain implementations, leading zeros are not significant at the recipient and may or may not be sent.

The GDT ChangeDocumentItemID can be used in the context of a change document.

ChartOfAccountsCode

A GDT ChartOfAccountsCode is the coded representation of a chart of accounts. A chart of accounts is an ordered repository of account numbers for which a G/L account can be created in the GeneralLedger for each company. The items of the chart of accounts can determine the account number as well as the type of value-based changes made in the G/L accounts. An example of GDT ChartOfAccountsCode is:

<ChartOfAccountsCode>INT</ChartOfAccountsCode>

In certain implementations, GDT ChartOfAccountsCode may have the following structure:

| GDT | Object Class | Representation/Association | Type | Type Name | Len. | Remarks |
|---|---|---|---|---|---|---|
| ChartOfAccountsCode | Chart Of Accounts | Code | CDT | Code | 1..4 | Restricted |

For GDT ChartOfAccountsCode, a customer-specific code list can be assigned to the code. A user of this code can determine the codes in the code list during configuration. In certain implementations, the attributes of GDT ChartOfAccountsCode are not used because they may be assigned to constant values in a customer system at runtime. A listID can be "10584." Examples for user-specific codes semantics can be: GKR (i.e., German joint standard accounting system) or INT (i.e., International chart of accounts).

ChartOfAccountsID

A GDT ChartOfAccountsID is an identifier for a chart of accounts. A chart of accounts is an ordered repository of account numbers for which a G/L account can be created in the GeneralLedger for each company. The items of the chart of accounts can determine the account number as well as the type of value-based changes made in the G/L accounts. An example of GDT ChartOfAccountsID is:

<ChartOfAccountsID schemeAgencyID="FIN_001">0001</ChartOfAccountsID>

In certain implementations, GDT ChartOfAccountsID may have the following structure:

| GDT | | Cat. | Object Class | Property | Representation/Association | Type | Type Name | Len. | Card. | Remarks |
|---|---|---|---|---|---|---|---|---|---|---|
| ChartOfAccountsID | | | Chart Of Accounts | Identification | Identifier | CDT | Identifier | 1..4 | | Restricted |
| | schemeAgencyID | A | Identification Scheme Agency | Identification | Identifier | XSD | Token | 60 | 0..1 | |

The data type GDT ChartOfAccountsID may assign a code list to the code. The attributes may be assigned the following values: schemeID=ChartOfAccountsID and schemeAgencyID=Business System, which issued the ID.

The GDT ChartOfAccountsID can be used in the GDT GeneralLedgerAccount (e.g., to identify the chart of accounts for the G/L account).

ChartOfAccountsItemCode

A GDT ChartOfAccountsItemCode is the coded representation of an item in the chart of accounts. A chart of accounts item groups together assets, payables, stockholders' equity, revenues, or expenses and can be used to enter and represent for accounting purposes any changes to these values resulting from business transactions. An example of GDT ChartOfAccountsItemCode is:

<ChartOfAccountsItemCodelistID="10584.INT">400000 </ChartOfAccountsItemCode>

In certain implementations, GDT ChartOfAccountsItemCode may use the following structure:

| GDT | | Cat. | Object Class | Property | Represen-tation/As-sociation | Type | Type Name | Len. | Card. | Remarks |
|---|---|---|---|---|---|---|---|---|---|---|
| Chart-OfAc-counts-Item-Code | | | Chart Of Accounts Item | | Code | CDT | Code | 1..10 | | Restricted |
| | listID | A | Code List | Identification | Identifier | xsd | token | 1..4 | 0..1 | |

For GDT ChartOfAccountsItemCode a user-specific code list can be assigned to the code. A user of this code can determine the codes in the code list during configuration. A listID can be an identifier for a chart of accounts, entries from the GDT ChartOfAccountsCode can be used. The listID can be formed according to the format "<listID><code>," (e.g., "10584.1NT" for the chart of accounts "INT"). Examples for user-specific codes semantics can be: 400000 (i.e., consumption, raw material) or 800000 (i.e., sales revenues—domestic).

ChartOfAccountsItemID

A GDT ChartOfAccountsItemID is an identifier for an item in the chart of accounts. A chart of accounts item groups together assets, payables, stockholders' equity, revenues, or expenses and can be used to enter and represent for accounting purposes any changes to these values resulting from business transactions. An example of GDT ChartOfAccountsItemID is:

<ChartOfAccountsItemID>400000</ChartOfAccountsItemID>

In certain implementations, GDT ChartOfAccountsItemID may have the following structure:

| GDT | Object Class | Prop-erty | Represen-tation/As-sociation | Type | Type Name | Len. | Re-marks |
|---|---|---|---|---|---|---|---|
| Chart-OfAc-counts-ItemID | Chart Of Accounts Item | Identi-fication | Identifier | CDT | Iden-tifier | 1..10 | restricted |

A chart of accounts item can be identified by specifying a ChartOfAccountsID and a ChartOfAccountsItemID. The GDT ChartOfAccountsItemID can be used in the context of the chart of accounts. For this reason, the GDT ChartOfAccountsItemKey should usually be used to identify a chart of accounts item because it contains both elements. If, however, the chart of accounts is known from the context, such as from a superordinate element, a chart of accounts item can also be identified by specifying the ChartOfAccountsItemID.

ChequeID

A GDT ChequeID is a unique identifier for a check. A check is an instruction to a bank to debit the amount named from the check issuer's account when the check is presented and to pay it to the check recipient or credit the check recipient's account. An example of GDT ChequeID is:

<ChequeID>0000550766555</ChequeID>

In certain implementations, GDT ChequeID may have the following structure:

| GDT | Object Class | Prop-erty | Represen-tation/As-sociation | Type | Type Name | Len. |
|---|---|---|---|---|---|---|
| ChequeID | Cheque | Identi-fication | Identifier | CDT | Identi-fier | 1..20 |

A check number can identify a check if the bank and the bank account number are known in the context. A ChequeID can be used, for example, to identify incoming bank checks with which invoices can be paid.

ChequeLotID

A GDT ChequeLotID is an identifier for a check lot. A check lot can describe a restricted quantity of unissued outgoing checks for a house bank account by a number interval. An example of GDT ChequeLotID is:

<ChequeLotID>Lot1</ChequeLotID>

In certain implementations, GDT ChequeLotID may have the following structure:

| GDT | Object Class | Prop-erty | Represen-tation/As-sociation | Type | Type Name | Len. | Re-marks |
|---|---|---|---|---|---|---|---|
| Cheque-LotID | Check Lot | Identi-fication | Identifier | CDT | Identi-fier | 1..8 | Re-stricted |

In certain implementations, a ChequeLotID is unique per house bank account. The GDT ChequeLotID can be stored in the field STAPL of table PCEC in an R/3 system.

ChequeStorageInternalID

A GDT ChequeStorageInternalID is a proprietary identifier for storage for incoming checks. An example of GDT ChequeStorageInternalID is:

<ChequeStorageInternalIDschemeAgencyID="VV4__000">DWDF01/3.12</ChequeStorageInternalID>

In certain implementations, GDT ChequeStorageInternalID may have the following structure:

| GDT | | Cat. | Object Class | Property Qual. | Property | Representation/Association | Type | Type Name | Len. | Card. | Remarks |
|---|---|---|---|---|---|---|---|---|---|---|---|
| ChequeStorageInternalID | | | Cheque Storage | Internal | Identification | Identifier | CDT | Identifier | 1..32 | | Restricted |
| | schemeAgencyID | A | Identification Scheme Agency | Identification | Identification | Identifier | xsd | token | 1..60 | 0..1 | |

The data type GDT ChequeStorageInternalID may assign a code list to the code. The attributes may be assigned the following values: schemeID="ChequeStorageID" and schemeAgencyID=business System, which issued the ID.

ChequeStorageLocationTypeCode

A GDT ChequeStorageLocationTypeCode is the coded representation of the type of a storage location for incoming checks. An example of GDT ChequeStorageLocationTypeCode is:

<ChequeStorageLocationTypeCode>0</ChequeStorageLocationTypeCode>

In certain implementations, GDT ChequeStorageLocationTypeCode may have the following structure:

| GDT | | Cat. | Object Class | Property | Representation/Association | Type | Type Name | Len. | Card. | Remarks |
|---|---|---|---|---|---|---|---|---|---|---|
| ChequeStorageLocationTypeCode | | | Cheque Storage Location | Type | Code | CDT | Code | 1 | | restricted |
| | listID | A | Code List | Identification | Identifier | xsd | token | | 0..1 | |
| | listAgencyID | A | Code List Agency | Identification | Identifier | xsd | token | | 0..1 | |

The data type GDT ChequeStorageLocationTypeCode may assign a code list to the code. The attributes may be assigned the following values: listID="10182" and listAgencyID="310."

The GDT ChequeStorageLocationTypeCode can be used to specify whether a storage location for incoming checks is managed internally or externally (e.g., lockbox). Depending on this, it can or cannot be used for specific business transactions.

External storage locations for incoming checks may play an important role in the United States under the name "lockbox." Here a house bank can offer the service of managing and processing incoming checks.

The data type GDT ChequeStorageLocationTypeCode may use the following codes: 1 (i.e., internal), 2 (i.e., house bank), 3 (i.e., company).

ChequeStoragePartyID

A GDT ChequeStoragePartyID is an identifier for the storage of incoming checks. The ChequeStoragePartyID can be used for storages that are managed externally and can be assigned by the institution that manages the storage. An example of GDT ChequeStoragePartyID is:

<ChequeStoragePartyID>0078238283</ChequeStoragePartyID>

In certain implementations, GDT ChequeStoragePartyID may have the following structure:

| GDT | Object Class | Property Qual. | Property | Representation/Association | Type | Type Name | Len. | Remarks |
|---|---|---|---|---|---|---|---|---|
| ChequeStoragePartyID | Cheque Storage | Party | Identification | Identifier | CDT | Identifier | 1..32 | Restricted |

A GDT ChequeStoragePartyID can be used in the context of the assigning institution. External ChequeStorages may play an important role in the United States under the name "lockbox." Here a house bank can offer the service of managing and processing incoming checks.

ChequeVoidReasonCode

A GDT ChequeVoidReasonCode is the coded representation of a void reason code for a check. Checks that can be voided can receive a description why they cannot be used as means of payment (i.e., void reason codes). An example of GDT ChequeVoidReasonCode is:

<ChequeVoidReasonCode>1</ChequeVoidReasonCode>

In certain implementations, GDT ChequeVoidReasonCode may have the following structure:

Before sending (i.e., Loss at check issuer, before sending, a check is lost at the issuer), After sending (i.e., Loss at check recipient, after sending, a check is lost at the recipient), Torn during printing (i.e., when issuing a check, the check is torn due to a paper jam at the printer), Printed incorrectly (i.e., when issuing the check, specific fields of the check are printed incorrectly).

The data type GDT ChequeVoidReasonCode may use the following codes: 1 (i.e., lost/unusable before issuing), 2 (i.e., unusable when issuing), 3 (i.e., lost/unusable after sending), 4 (i.e., check payment reversed), 5 (i.e., cashing period exceeded).

| GDT | | Cat. | Object Class | Property | Representation/Association | Type | Type Name | Len. | Card. |
|---|---|---|---|---|---|---|---|---|---|
| Cheque VoidReasonCode | | | Cheque | Void Reason | Code | CDT | Code | 1..2 | |
| | listAgencyID | A | Code List Agency | Identification | Identifier | xsd | token | | 0..1 |
| | listVersionID | A | Code List | Version | Identifier | xsd | token | | 0..1 |
| | list-Agency-SchemeID | A | Code List Agency | Scheme | Identifier | xsd | token | | 0..1 |
| | listAgency-Scheme Agency ID | A | Code List Agency | Scheme Agency | Identifier | xsd | token | | 0..1 |

For GDT ChequeVoidReasonCode, a customer-specific code list can be assigned to the code. A listID can be "10183." If the code list is unchanged, a listAgencyID can be "310." Otherwise, a listAgencyID can be the ID of the customer (e.g., ID from DE 3055, if listed there). A listVersionID can be the version of the particular code list (e.g., assigned and managed by the customer). A listAgencySchemeID can be the ID of the scheme if the listAgencyID does not come from DE 3055. The listAgencySchemeAgencyID can be the ID of the organization from DE 3055 that manages the listAgencySchemeID scheme.

For GDT ChequeVoidReasonCode some examples of customer-specific code semantics may include the following:

CleanupQuantityDeterminationMethodCode

A GDT CleanupDeterminationMethodCode is a coded representation of a method to determine the quantity to be cleaned up for a particular inventory level control rule execution method. An inventory level control rule execution method can define the measures that have to be taken if replenishment or cleanup is performed. An example of GDT CleanupDeterminationMethodCode is:

<CleanupQuantityDeterminationMethodCodelistID= 10453listAgencyID=310>1</CleanupQuantityDeterminationMethodCode>

In certain implementations, GDT CleanupDeterminationMethodCode may have the following structure:

| GDT | | Cat. | Object Class | Property | Representation/Association | Type | Type Name | Len. | Card. |
|---|---|---|---|---|---|---|---|---|---|
| Cleanup-Quantity-Determination-Method-Code | | | Cleanup Quantity Determination Method | | Code | CDT | Code | 1..2 | |
| | listID | A | Code List | Identification | Identifier | xsd | token | | 0..1 |
| | listAgency ID | A | Code List Agency | Identification | Identifier | xsd | token | | 0..1 |
| | listVersionID | A | Code List | Version | Identifier | xsd | token | | 0..1 |
| | listAgencyScheme-ID | A | Code List Agency | Scheme | Identifier | xsd | token | | 0..1 |
| | listAgencyScheme-Agency ID | A | Code List | Scheme | Identi- | xsd | token | | 0..1 |

For the data type, GDT CleanupDeterminationMethodCode an extensible code list can be assigned. A customer can change this code list. A listID can be "10453." If the code list is unchanged, a listAgencyID can be "310." Otherwise, a listAgencyID can be the ID of the customer (e.g., ID from DE 3055, if listed there). A listVersionID can be the version of the particular code list (e.g., assigned and managed by the customer). A listAgencySchemeID can be the ID of the scheme if the listAgencyID does not come from DE 3055. The listAgencySchemeAgencyID can be the ID of the organization from DE 3055 that manages the listAgencySchemeID scheme.

Prior to a cleanup process, the GDT CleanupQuantityDeterminationMethodCode can specify the relevant method to be used for calculating the quantity to be cleaned up. The method for calculating the quantity is part of the inventory level control rule execution method. An example for customer-specific code semantics can be Order Quantity (i.e., quantity is determined according to the quantity defined in the order).

The data type GDT CleanupDeterminationMethodCode may use the following codes: 1 (i.e., safety stock level based), 2 (i.e., constant).

ClearingHouseAccountID

A GDT ClearingHouseAccountID is an identifier for a ClearingHouseAccount. A ClearingHouseAccount is the internal representation of an account that is set up and can be managed at a clearing house for card payments based on an agreement between the company and the clearing house. An example of GDT ClearingHouseAccountID is:

<ClearingHouseAccountIDschemeAgencyID="VV4__000">DWDF01/3.12</ClearingHouseAccountID>

In certain implementations, GDT ClearingHouseAccountID may have the following structure:

| GDT | | Cat. | Object Class | Property | Representation/Association | Type | Type Name | Len. | Card. | Remarks |
|---|---|---|---|---|---|---|---|---|---|---|
| ClearingHouseAccountID | | | Clearing House Account | Identification | Identifier | CDT | Identifier | 1..32 | | Restricted |
| | schemeAgencyID | A | Identification Scheme Agency | Identification | Identifier | xsd | token | 1..60 | 0..1 | |

The attributes of GDT ClearingHouseAccountID may be assigned the following values: schemeID=ClearingHouseID and schemeAgencyID=business System, which issued the ID.

CommissionProductGroupCode

A GDT CommissionProductGroupCode is the coded representation of a group of products for which a certain commission is granted. An example of GDT CommissionProductGroupCode is:

<CommissionProductGroupCode>1</CommissionProductGroupCode>

In certain implementations, GDT CommissionProductGroupCode may have the following structure:

| GDT | | Cat. | Object Class Qualifier | Object Class | Property | Representation/Association | Type | Type Name | Len. | Card. |
|---|---|---|---|---|---|---|---|---|---|---|
| CommissionProductGroupCode | | | Commission | Product Group | | Code | CDT | Code | 1..2 | |
| | listID | A | | Code List | Identification | Identifier | xsd | token | | 0..1 |
| | listAgencyID | A | | Code List Agency | Identification | Identifier | xsd | token | | 0..1 |
| | listVersionID | A | | Code List | Version | Identifier | xsd | token | | 0..1 |
| | listAgencySchemeID | A | | Code List Agency | Scheme | Identifier | xsd | token | | 0..1 |
| | listAgencySchemeAgencyID | A | | Code List Agency | Scheme Agency | Identifier | xsd | token | | 0..1 |

For GDT CommissionProductGroupCode, a customer-specific code list can be assigned to the code. A listID can be "10331." A listAgencyID can be the ID of the customer (e.g., ID from DE 3055, if listed there). A listVersionID can be the version of the particular code list (e.g., assigned and managed by the customer). A listAgencySchemeID can be the ID of the scheme if the listAgencyID does not come from DE 3055. The listAgencySchemeAgencyID can be the ID of the organization from DE 3055 that manages the listAgencySchemeID scheme.

The GDT CommissionProductGroupCode may be used in business objects and A2A messages. The GDT CommissionProductGroupCode can be used for price determination and analysis in sales and billing documents. Examples of possible semantics of the codes can be: Maximum commission (i.e., products for which the maximum commission applies) or Minimum commission (i.e., products for which the minimum commission applies).

The following dictionary objects can be assigned to the GDT CommissionProductGroupCode: Data element (e.g., CRMT_PROD_PR_GROUP) and Domain (e.g., CRM_COMM_GROUP).

CommunicationAddressUsageCode

A GDT CommunicationAddressUsageCode is the coded representation for the usage of a communication address. A communication address may, e.g., be a telephone number, a fax number or an e-mail address. An example of GDT CommunicationAddressUsageCode is:

<CommunicationAddressUsageCode ListAgencyID=310>AD_DEFAULT</CommunicationAddressUsageCode>

In certain implementations, GDT CommunicationAddressUsageCode may have the following structure:

| GDT | | Cat. | Object Class | Property | Representation/Association | Type | Type Name | Len. | Card. | Remarks |
|---|---|---|---|---|---|---|---|---|---|---|
| CommunicationAddressUsageCode | | | Communication Address Usage | | Code | CDT | Code | 1..10 | | Restricted |
| | listAgencyID | A | Code List Agency | Identification | Identifier | xsd | token | | 0..1 | |
| | listVersionID | A | Code List | Version | Identifier | xsd | token | | 0..1 | |
| | listAgencySchemeID | A | Code List Agency | Scheme | Identifier | xsd | token | | 0..1 | |
| | listAgencySchemeAgencyID | A | Code List Agency | Scheme Agency | Identifier | xsd | token | | 0..1 | |

A code list can be assigned to the GDT CommunicationAddressUsageCode. Customers can extend this code list by adding additional entries; however, in certain implementations, the already-existing entries are not removed from this code list.

For GDT CommunicationAddressUsageCode, a customer-specific code list can be assigned to the code. A listID can be "10261." If the code list is unchanged, a listAgencyID can be "310." Otherwise, a listAgencyID can be the ID of the customer (e.g., ID from DE 3055, if listed there). A listVersionID can be the version of the particular code list (i.e., assigned and managed by the customer). A listAgencySchemeID can be the ID of the scheme if the listAgencyID does not come from DE 3055. The listAgencySchemeAgencyID can be the ID of the organization from DE 3055 that manages the listAgencySchemeID scheme.

For GDT CommunicationAddressUsageCode, AD_MBDEFAU and AD_NMBDEFA can be assigned to telephone numbers. The following dictionary objects can be assigned to this GDT: Data element: (i.e., AD_CUSAGE), Domain (e.g., AD_CUSAGE). The possible values for CommunicationAddressUsageCode can be maintained in table ADRU.

The data type GDT CommunicationAddressUsageCode may use the following codes: AD_DEFAULT (i.e., Standard), AD_HOME (i.e., Home address), AD_MBDEFAU (i.e., Standard mobile telephone), AD_NMBDEFA (i.e., Standard landline).

CommunicationMediumTypeCode

A GDT CommunicationMediumTypeCode is the coded representation of the type of a medium used for communication. An example of GDT CommunicationMediumTypeCode is:

<CommunicationMediumTypeCode>MA</CommunicationMediumTypeCode>

In certain implementations, GDT CommunicationMediumTypeCode may have the following structure:

| GDT | | Cat. | Object Class | Property | Represen-tation/As-sociation | Type | Type Name | Len. | Card. | Re-marks |
|---|---|---|---|---|---|---|---|---|---|---|
| Commu-nication-Medium-Type-Code | | | | Commu-nication Medium_Type | Code | CDT | Code | 1..2 | | re-stricted |
| | listID | A | Code List | Identifi-cation | Identifier | xsd | token | | 0..1 | |
| | listAgen-cyID | A | Code List Agency | Identifi-cation | Identifier | xsd | token | | 0..1 | |
| | list-Version-ID | A | Code List | Version | Identifier | xsd | token | | 0..1 | |

A code list can be assigned to the GDT CommunicationMediumTypeCode.

The code list for external communication is the UN/ECE code list 3153, "Communication medium type code." It may be used whenever the alternative code list can be mapped to this. Within an application the list may be used.

For GDT CommunicationMediumTypeCode, listID is the ID of the particular code list. For example, the listID can be 3153 if the code list UN/ECE is used. Otherwise, the listID can be 30100. The listAgencyID can be 6 (i.e., UN/ECE from 3055) if UN/ECE is used. Otherwise, the listAgencyID can be 310. The listVersionID can be d05a/tred if the UN/ECE code list is used. Otherwise, the listVersionID can be the version of the particular code list.

In the system configuration CommunicationMediumTypeCode can be used to control which medium will be used for which purpose. For example, a dunning schema might lay down that a letter may be used for legally effective dunning while e-mail is appropriate for a mere reminder.

In an overview of a dispute history CommunicationMediumTypeCode can show which media were used in all the communication steps. In the address maintenance PreferredCommunicationMediumTypeCode is used to describe with which media an addressee or business partner wants to be contacted.

In the procurement process SupplierProcurementDocumentExchangeCommunicationMediumTypeCode (described below) is used to describe which medium is used to exchange business documents between the supplier and the purchasing company or its purchasing units. In certain implementations, the GDT CommunicationMediumTypeCode is represented by the data element AD_COMM and the domain AD_COMM.

In certain implementations, the GDT CommunicationMediumTypeCode may have the following qualifiers: PaymentAdviceCommunicationMediumTypeCode (i.e., Coded representation of the medium used for the transmission of payment advice notes), PreferredCommunicationMediumTypeCode (i.e., Coded representation of the medium by which an addressee wants to be contacted), SupplierProcurementDocumentExchangeCommunicationMediumTypeCode (i.e., Coded representation of the medium used for the exchange of documents between supplier and purchaser within the procurement process).

In certain implementations, the GDT CommunicationMediumTypeCode can use a UN/ECE code list (e.g., listID="3153," listAgencyID="6" (i.e., UN/ECE from 3055), and listVersionID="d04a/tred"). The UN/ECE code list may include the following codes: AA (i.e., Circuit switching), AB (i.e., SITA), AC (i.e., ARINC), AD (i.e., Courier), CA (i.e., Cable address), EI (i.e., EDI transmission), EM (i.e., Electronic mail), EX (i.e., Extension), FT (i.e., File transfer access method), FX (i.e., Telefax), GM (i.e., GEIS (General Electric Information Service) mailbox), IE (i.e., IBM information exchange), IM (i.e., Internal mail), MA (i.e., Mail), PB (i.e., Postbox no.), PS (i.e., Packet switching), SW (i.e., S.W.I.F.T.), TE (i.e., Telephone), TG (i.e., Telegraph), TL (i.e., Telex), TM (i.e., Telemail), TT (i.e., Teletext), TX (i.e., TWX), XF (i.e., X.400).

In certain implementations, the GDT CommunicationMediumTypeCode can use a proprietary code list (e.g., listID="30100," listAgencyID="310," and listVersionID is a version of the particular code list, which can be assigned and managed). The proprietary code list may include the following codes: FAX (i.e., Fax), INT (i.e., E-Mail), LET (i.e., Post (letter)), PAG (i.e., Pager/SMS), PRT (i.e., Printer), RML (i.e., Remote Mail), SSF (i.e., Secure Store and Forwarding), TEL (i.e., Telephone), TLX (i.e., Telex), TTX (i.e., Teletex), URI (i.e., URL (Homepage)), VIS (i.e., Sales call), XML (i.e., XML), X40 (i.e., X.400).

CompanyLegalFormCode

A GDT CompanyLegalFormCode represents the legal form of a company. An example of GDT CompanyLegalFormCode is:

<CompanyLegalFormCode>1</CompanyLegalFormCode>

In certain implementations, GDT CompanyLegalFormCode may have the following structure:

| GDT | | Cat. | Object Class | Property Qualifier | Property | Represen-tation/As-sociation | Type | Type Name | Len. | Card. | Re-marks |
|---|---|---|---|---|---|---|---|---|---|---|---|
| Company-Legal-Form-Code | | | | Company | Legal Form | Code | CDT | Code | 1..2 | | Re-stricted |
| | listID | A | Code List | | Identifica-tion | Identifier | xsd | token | | 0..1 | |

-continued

| GDT | | Cat. | Object Class | Property Qualifier | Property | Represen-tation/As-sociation | Type | Type Name | Len. | Card. | Re-marks |
|---|---|---|---|---|---|---|---|---|---|---|---|
| | listAgencyID | A | Code List Agency | | Identification | Identifier | xsd | token | | 0..1 | |
| | list-VersionID | A | Code List | | Version | Identifier | xsd | token | | 0..1 | |
| | listAgency-SchemeID | A | Code List Agency | | Scheme | Identifier | xsd | token | | 0..1 | |
| | listAgency-Scheme-AgencyID | A | Code List Agency | | Scheme Agency | Identifier | xsd | token | | 0..1 | |

There may be alternative code lists that can be changed at configuration and/or runtime.

The GDT CompanyLegalFormCode may be a customer-specific code list.

For CompanyLegalFormCode, a customer-specific code list can be assigned to the code. A listID can be "10332." If the code list is unchanged, a listAgencyID can be the customer ID. A listVersionID can be the version of the particular code list (i.e., assigned and managed by the customer). A listAgencySchemeID can be the ID of the scheme if the listAgencyID does not come from DE 3055. The listAgencySchemeID can be the ID of the organization from DE 3055 that manages the listAgencySchemeID scheme.

For CompanyLegalFormCode, the following dictionary objects can be assigned to this GDT: Data element: (e.g, BU_LEGENTY), Domain (e.g., BU_LEGENTY). The possible values for CompanyLegalFormCode can be maintained in table ADRU.

CompanyTaxArrangementTaxDeclarationArrangement Code

A GDT CompanyTaxArrangementTaxDeclarationArrangementID is a unique identifier. A TaxDeclarationArrangement contains specifications concerning certain tax declaration types and a CompanyTaxArrangement is an agreement between a company and tax authority regarding declaring and paying of taxes.

In certain implementations, GDT CompanyTaxArrangementTaxDeclarationArrangementCode may have the following structure:

| GDT | Object Class | Property | Represen-tation/As-sociation | Type | Type Name | Len. | Card. | Re-marks |
|---|---|---|---|---|---|---|---|---|
| CompanyTax-Arrangement-TaxDeclaration-ArrangementID | Company Tax Arrangement Tax Declaration Arrangement | Identification | Identifier | CDT | Identi-fier | 1..40 | | Re-stricted |

CompareOperatorCode

A GDT CompareOperatorCode is the coded representation of a comparison (or relational) operator. An example of GDT CompareOperatorCode is:

<CompareOperatorCode>LT</CompareOperatorCode>

In certain implementations, GDT CompareOperatorCode may have the following structure:

| GDT | Property | Represen-tation/As-sociation | Type | Type Name | Len. |
|---|---|---|---|---|---|
| Compare-OperatorCode | Compare Operator | Code | CDT | Code | 2 |

A code list can be assigned to CompareOperatorCode.

The data type GDT CompareOperatorCode may assign a code list to the code. The attributes may be assigned the following values: listID="10451" and listAgencyID="310."

The data type GDT CompareOperatorCode may use the following codes: LT (i.e., Less than), GT (i.e., Greater than), EQ (i.e. Equal to), LE (i.e. Less than or equal to), GE (i.e., Greater than or equal to), NE (i.e. Not equal to).

CompensationComponentOccurrenceTypeCode

A GDT CompensationComponentOccurrenceTypeCode is the coded representation of the occurrence type of a compensation component. An example of GDT CompensationComponentOccurrence TypeCode is:

CompensationComponentOccurrenceTypeCode>1 <CompensationComponent OccurrenceTypeCode>

In certain implementations, GDT CompensationComponentOccurrenceTypeCode may have the following structure:

| GDT | Object Class | Property | Represen-tation/As-sociation | Type | Type Name | Len. | Re-marks |
|---|---|---|---|---|---|---|---|
| CompensationComponentOccurrence-TypeCode | Compensa-tion Compo-nent | Occurrence Type | Code | CDT | Code | 1 | Re-stricted |

The data type GDT CompensationComponentOccurrenceType Code may assign one code list to the code. The attributes may be assigned the following values: listID="10245" and listAgencyID="310"

The data type GDT CompensationComponentOccurrenceTypeCode may use the following codes: 1 (i.e., Multiple occurrences), 2 (i.e., One-time fixed occurrence), 3 (i.e., Multiple occurrences on fixed due dates.

CompensationComponentPayrollCategoryCode

A GDT CompensationComponentPayrollCategoryCode is the coded result of employee compensation components. An example of GDT CompensationComponentPayrollCategoryCode is:

<CompensationComponentPayrollCategoryCode>1</CompensationComponentPayrollCategoryCode>

In certain implementations, GDT CompensationComponentPayrollCategoryCode may have the following structure:

| GDT | | Cat. | Object Class | Property | Represen-tation/As-sociation | Type | Type Name | Len. | Card. | Re-marks |
|---|---|---|---|---|---|---|---|---|---|---|
| Compensation-ComponentPayroll-CategoryCode | | | Compensa-tion Compo-nent | Payroll_ Category | Code | CDT | Code | 1..5 | | Re-stricted |
| | listAgen-cyID | A | Code List Agency | Identifi-cation | Identifier | xsd | token | | 0..1 | |
| | listVer-sionID | A | Code List | Version | Identifier | xsd | token | | 0..1 | |
| | listAgency-SchemeID | A | Code List Agency | Scheme | Identifier | xsd | token | | 0..1 | |
| | listAgen-cyScheme-AgencyID | A | Code List Agency | Scheme Agency | Identifier | xsd | token | | 0..1 | |

Certain customers can assign country-specific code lists to the GDT CompensationComponentPayrollCategoryCode.

For GDT CompensationComponentPayrollCategoryCode, a customer-specific code list can be assigned to the code. A listAgencyID can be the ID of the customer (e.g., ID from DE 3055, if listed there). A listVersionID can be the version of the particular code list (e.g., assigned and managed by the customer). A listAgencySchemeID can be the ID of the scheme if the listAgencyID does not come from DE 3055. The listAgencySchemeAgencyID can be the ID of the organization from DE 3055 that manages the listAgencySchemeID scheme.

The values can differ in payroll with regard to tax relevance, inclusion in base wage types, legal requirements, and the like.

CompensationComponentTypeCatalogueCode

A GDT CompensationComponentTypeCatalogueID is a unique identifier for a CompensationComponentTypeCatalogue. An example of GDT CompensationComponentTypeCatalogueID is:

<CompensationComponentTypeCatalogueID>Catal01</CompensationComponentTypeCatalogueID>

In certain implementations, GDT CompensationComponentTypeCatalogueID may have the following structure:

| GDT | Object Class | Property | Represen-tation/As-sociation | Type | Type Name | Len. | Remarks |
|---|---|---|---|---|---|---|---|
| Compensation-ComponentType-CatalogueID | Compensa-tion Compo-nent Type Catalogue | Identification | Identifier | CDT | Identi-tier | 1..10 | restricted |

CompensationComponentTypeGroupCode

A GDT CompensationComponentTypeGroupCode is a unique identifier for a CompensationComponentTypeGroup. A GDT CompensationComponentTypeGroup is a group of components defined by the same rules. A CompensationComponentType describes employee compensation items with respect to human resources. An example of GDT CompensationComponentTypeGroupCode is:

<CompensationComponentTypeGroupID>CompaRatio <CompensationComponentTypeGroupID>

In certain implementations, GDT CompensationComponentTypeGroupCode may have the following structure:

| GDT | Object Class | Property | Representation/Association | Type | Type Name | Len. | Remarks |
|---|---|---|---|---|---|---|---|
| Compensation-Component-TypeGroupID | Compensation-Component-TypeGroup | Identification | Identifier | CDT | Identifier | 1..10 | restricted |

nentTypeGroupUsageCodes that can have no more than one compensation component type group for each country. This property can be assigned to a code in the business configuration. An example of this is the German code with the name "Capital Formation Savings Payment."

In certain implementations, there are CompensationComponentTypeGroupUsageCodes that are used for more than one country. This includes the code with the name "Compa-Ratio."In such a case, it is important to ensure that the code value itself is the same in each country, in the example, this is "1."

CompensationComponentTypeGroupUsageCode

A GDT CompensationComponentTypeGroupUsageCode is the result of the use of a compensation component type group. A compensation component type group is a group of components subject to the same rules. An example of GDT CompensationComponentTypeGroupUsageCode is:

<CompensationComponentTypeGroupUsageCode listID=21301 listAgencyID=310 listVersionID=1>6</CompensationComponentTypeGroup UsageCode>

In certain implementations, for the country Germany, this is the code for the usage "Capital Formation Savings Payment."

In certain implementations, GDT CompensationComponentTypeGroupCode may have the following structure:

For example, if the CompensationComponentTypeGroupUsageCodes is for Germany (i.e., DE), the code list can have the following values: listID="21301," listAgencyID="310," and listVersionID=Version of the particular code list, which can be assigned and managed. In addition, the code list may include the following codes: 1 (i.e., Compa-Ratio), 2 (i.e., Comparison), 3 (i.e., Total Cash Compensation), 4 (i.e., Voluntary Deductions), 5 (i.e., Non Voluntary Deductions), 6 (i.e., Capital Formation Savings Payments).

In another example, if the CompensationComponentTypeGroupUsageCodes is for the United States (i.e., US) the code list can have the following values: listID="21302," listAgencyID="310," and listVersionID can be the version of the particular code list, which can be assigned and managed. In

| GDT | | Cat. | Object Class | Property | Representation/Association | Type | Type Name | Len. | Card. | Remarks |
|---|---|---|---|---|---|---|---|---|---|---|
| Compensation-Component-TypeGroup-UsageCode | | | Compensation Component Type Group | Usage | Code | CDT | Code | 1..4 | 1 | Restricted |
| | listID | A | Code List | Identification | Identifier | xsd | token | | 0..1 | |
| | listAgencyID | A | Code List Agency | Identification | Identifier | xsd | token | | 0..1 | |
| | list-VersionID | A | Code List | Version | Identifier | xsd | token | | 0..1 | |
| | listAgency-SchemeID | A | Code List Agency | Scheme | Identifier | xsd | token | | 0..1 | |
| | listAgency-Scheme-AgencyID | A | Code List Agency | Scheme Agency | Identifier | xsd | token | | 0..1 | |

The data type GDT CompensationComponentTypeGroupCode may have several extensive, country-specific code lists assigned. Customers can change these code lists. The attributes may be assigned the following values: listID="21301" and listAgencyID="310." The listVersionID can be the version of the particular code list, which can be assigned and managed.

In certain implementations, the assigned attributes can correspond to values for the US. For example, listID="21302," listAgencyID="310," and listVersionID can Version of the particular code list, which can be assigned and managed.

In certain implementations, the GDT CompensationComponentTypeGroupCode may include CompensationCompoaddition, the code list may include the following codes: 1 (i.e., Compa-Ratio), 2 (i.e., Comparison), 3 (i.e., Total Cash Compensation), 4 (i.e., Voluntary Deductions), 5 (i.e., Non Voluntary Deductions), 6 (i.e., Benefits).

CompensationComponentTypeCode

A GDT CompensationComponentTypeCode is a unique identifier for a CompensationComponentType in the CompensationComponentTypeCatalogue. It describes employee compensation with respect to human resources. An example of GDT CompensationComponentTypeCode is:

<CompensationComponentTypeID>AB11</CompensationComponentTypeID>

In certain implementations, GDT CompensationComponent-TypeGroupCode may have the following structure:

| GDT | Object Class | Property | Represen-tation/As-sociation | Type | Type Name | Len. | Re-marks |
|---|---|---|---|---|---|---|---|
| Compensa-tion Compo-nentTypeID | Compensa-tion Com-ponent Type | Identification | Identifier | CDT | Identi-fier | 1..10 | re-stricted |

A GDT CompensationComponentTypeID can be used within a CompensationComponentTypeCatalogue.

CompensationStructureGradeCode

A GDT CompensationStructureGradeCode is an identifier for a grade. A GDT CompensationStructureGradeCode is a pay grade range effective for a certain period assigning a value level to the tasks and activities in the company. An example of GDT CompensationStructureGradeCode is:

<CompensationStructureGradeID>Z1</Compensation-StructureGradeID>

In certain implementations, GDT CompareOperatorCode may have the following structure:

| GDT | Object Class | Property | Represen-tation/As-sociation | Type | Type Name | Len. | Re-marks |
|---|---|---|---|---|---|---|---|
| Compensation-StructureGradeID | Compensation Structure Grade | Identification | Identifier | CDT | Identifier | 1..10 | Re-stricted |

GDT CompensationStructureGradeID can be used in the context of a compensation structure.

CompensationStructureCode

A GDT CompensationStructureCode is an identifier for a CompensationStructure.

A CompensationStructure is an organized range of pay grades showing the value of tasks and activities performed by employees in the company. It can be specific to the company or defined according to pay scale regulations. An example of GDT CompensationStructure Code is:

<Compensation StructureID>AB4711</Compensation-StructureID>

In certain implementations, GDT CompensationStructure-Code may have the following structure:

| GDT | Object Class | Property | Represen-tation/As-sociation | Type | Type Name | Len. | Re-marks |
|---|---|---|---|---|---|---|---|
| Compensation-StructureID | Compensation Structure | Identifi-cation | Identifier | CDT | Identifier | 1..10 | Re-stricted |

CompensationStructureTypeCode

A GDT CompensationStructureTypeCode is a coded representation of the type of a compensation structure, differentiated by the pay grade range attributes it contains. A CompensationStructure is a group of pay grade ranges showing the value of tasks and activities in the company. An example of GDT CompensationStructure Code is:

<CompensationStructureTypeCode listAgencyID='310' listVersionID='1'>1</CompensationStructureTypeCode>

In certain implementations, GDT CompensationStructure-TypeCode may have the following structure:

This is the code for the compensation structure type Single point-based structure.

| GDT | | Cat. | Object Class | Property | Representation/ Association | Type | Type Name | Len. | Card. | Remarks |
|---|---|---|---|---|---|---|---|---|---|---|
| Compensation-Structure-TypeCode | | | Compensation Structure | Type | Code | CDT | Code | 1..2 | | Restricted |
| | listID | A | Code List | Identification | Identifier | xsd | token | | 0..1 | |
| | listAgencyID | A | Code List Agency | Identification | Identifier | xsd | token | | 0..1 | |
| | listVersionID | A | Code List | Version | Identifier | xsd | token | | 0..1 | |
| | listAgency-SchemeID | | Code List Agency | Scheme | Identifier | xsd | token | | 0..1 | |
| | listAgency-Scheme-AgencyID | | Code List Agency | Scheme Agency | Identifier | xsd | token | | 0..1 | |

An extensive code list is assigned to the GDT Compensation-StructureTypeCode. Customers can change this code list.

For GDT CompensationStructureTypeCode, a customer-specific code list can be assigned to the code. A listID can be "10215." If the code list is unchanged, a listAgencyID can be "310." Otherwise a listAgencyID can be the ID of the customer (i.e. ID from DE 3055, if listed there). A listVersionID can be the version of the particular code list (i.e. assigned and managed by the customer). A listAgencySchemeID can be the ID of the scheme if the ListAgencyID does not come from DE 3055. The listAgencySchemeAgencyID can be the ID of the organization from DE 3055 that manages the listAgency-SchemeID scheme.

The data type GDT CompensationStructureTypeCode may use the following codes: 1 (i.e. Single point-based structure); 2 (i.e. Range-based structure).

ComplaintCorrectiveActionCode

A GDT ComplaintCorrectiveActionCode is the coded representation of the corrective action for a complaint, performed to improve a rendered service or delivery of goods. An example of GDT ComplaintCorrectiveActionCode is:

<ComplaintCorrectiveActionCode>1</ComplaintCorrectiveActionCode>

In certain implementations, GDT CompensationStructure-TypeCode may have the following structure:

| GDT | Object Class | Property | Representation/Association | Type | Type Name | Len. | Remark |
|---|---|---|---|---|---|---|---|
| Complaint-Corrective-ActionCode | Complaint | Corrective Action | Code | CDT | Code | 1..2 | Restricted |

Exactly one fixed code list has been assigned to GDT ComplaintCorrectiveActionCode.

The data type GDT ComplaintCorrectiveActionCode may assign one fixed code list to the code. The attributes may be assigned the following values: listID="10247" and listAgencyID="310."

The specification of the corrective action to correct a rendered service or delivery of goods can be used in the business scenario Customer Complaints Processing. It is possible to specify, i.e., which corrective action is requested by the customer in a complaints process, or which corrective action is actually taken.

The data type GDT ComplaintCorrectiveActionCode may use the following codes: 1 (i.e. Refund); 2 (i.e. Compensation Delivery).

ContactAllowedCode

A GDT ContactAllowedCode is the coded description of contact permission. An example of GDT ContractAllowed-Code is:

<ContactAllowedCode>1</ContactAllowedCode>

In certain implementations, GDT ContactAllowedCode may have the following structure:

| GDT | Property | Representation/ Association | Type | Type Name | Len. | Remarks |
|---|---|---|---|---|---|---|
| Contact-AllowedCode | Contact Allowed | Code | CDT | Code | 1 | Restricted |

The data type GDT ContactAllowedCode is an code list. The attributes may be assigned the following implicitly given values: listID="10050," listAgencyID="310," and listVersionID=(to be defined).

The GDT ContactAllowedCode is used to confirm whether contact with a particular person or company is allowed or not.

The data type GDT ContactAllowedCode may use the following codes: BU_CONTACT (i.e., Data element), BU_CONTACT (i.e., Domain).

The data type GDT ContactAllowedCode may use the following codes: 1 (i.e. Allowed); 2 (i.e. Not allowed); 3 (i.e. Check).

ContactPerson

A GDT ContactPerson is a natural person who is the contact person during the execution of business processes. ContactPerson identifies the contact person and the contact person's address. Identification can occur using an ID assigned by the parties involved. An ID assigned by a party identifies the name of the role the assigning party plays in the business transaction. The roles may include Buyer, Seller, ProductRecipient, Vendor, BillTo, BillFrom and Bidder. An example of GDT ContactPerson is:

<ContactPerson>
<BuyerID>9874</BuyerID>
<SellerID>487848</SellerID>
<Address> . . . </Address>
</ContactPerson>

Another example of GDT ContactPerson is:

<ContactPerson>
<InternalID schemeID="ContactPersonID" schemeAgencyID="BPL__300">737</InternalID>
<Address> . . . </Address>
</ContactPerson>

In the previous examples, schemeID="ContactPersonID" specifies that the scheme "ContactPersonID" was used to identify the party. Additionally, schemeAgencyID="BPL__300" specifies that the scheme was assigned by the system "BPL__300."

In certain implementations, ContactPerson may have the following structure:

| CDT | | Cat. | Object Class | Property Qualifier | Property | Representation/ Association | Type | Type Name | Card. |
|---|---|---|---|---|---|---|---|---|---|
| Contact-Person | | | Contact Person | | | Details | | | |
| | InternalID | E | Contact Person | Internal | Identification | Identifier | GDT | ContactPersonInternalID | 0..1 |
| | BuyerID | E | Contact Person | Buyer | Identification | Identifier | GDT | ContactPersonPartyID | 0..1 |
| | SellerID | E | Contact Person | Seller | Identification | Identifier | GDT | ContactPersonPartyID | 0..1 |
| | ProductRecipientID | E | Contact Person | Product Recipient | Identification | Identifier | GDT | ContactPersonPartyID | 0..1 |
| | VendorID | E | Contact Person | Vendor | Identification | Identifier | GDT | ContactPersonPartyID | 0..1 |
| | BillToID | E | Contact Person | BillTo | Identification | Identifier | GDT | ContactPersonPartyID | 0..1 |
| | BillFromID | E | Contact Person | BillFrom | Identification | Identifier | GDT | ContactPersonPartyID | 0..1 |
| | BidderID | E | Contact Person | Bidder | Identification | Identifier | GDT | ContactPersonPartyID | 0..1 |
| | Address | E | Contact Person | | Address | Details | GDT | Address | 0..1 |

The attributes may be assigned the following values: InternalID can be an identifier for the ContactPerson that is used when both sender and recipient can access shared master data (extended enterprise). This is usually a personnel number; BuyerID can be an identifier that is used by the BuyerParty for this ContactPerson; SellerID can be an identifier that is used by the SellerParty for this ContactPerson; ProductRecipientID can be an identifier that is used by the ProductRecipientParty for this ContactPerson; VendorID can be an identifier that is used by the Vendor Party for this ContactPerson; BillToID can be an identifier that is used by the BillToParty for this ContactPerson; BillFromID can be an identifier that is used by the BillFromParty for this ContactPerson; BidderID can be an identifier that is used by the BidderParty for this party and Address=Contact person's address. The different IDs of a BusinessTransactionDocumentParty can identify the same ContactPerson. There is no StandardID for a ContactPerson. A contact person can therefore be identified using an internalID, as well as by an ID assigned by an involved party.

The data type ContactPerson is identified in the following ways: 1 (i.e. InternalID: when sender and recipient can access shared master data) and; 2 (i.e. ContactPersonPartyIDs: when sender and recipient are interested in the Party IDs assigned by the parties involved. Of all of the IDs available to the sender, generally only IDs the recipient is expected to understand are used in a message. The address only includes the elements of a personal address. See GDT Address.

ContactPersonFunctionalAreaCode

A GDT ContactPersonFunctionalAreaCode is the coded representation for a functional area, with respect to the fact that contact persons can be assigned to this functional area. A functional area relates to a subtask for the purpose of achieving company goals (i.e. procurement, production, administration, or marketing), and does not represent a company's organizational unit. An example of GDT ContactPersonFunctionalAreaCode is:

<ContactPersonFunctionalAreaCode>2</ContactPersonFunctionalAreaCode>

In certain implementations, GDT ContactPersonFunctionalAreaCode may have the following structure:

| GDT | | Cat. | Object Class Qualifier | Object Class | Property | Representation/ Association | Type | Type Name | Len. | Card. | Remarks |
|---|---|---|---|---|---|---|---|---|---|---|---|
| Contact-Person-Functional-AreaCode | | | Contact Person | Functional Area | | Code | CDT | Code | 1..4 | | Restricted |
| | listID | A | | Code List | Identification | Identifier | xsd | token | | 0..1 | |
| | listAgencyID | A | | Code List Agency | Identification | Identifier | xsd | token | | 0..1 | |
| | listVersionID | A | | Code List | Version | Identifier | xsd | token | | 0..1 | |
| | listAgencySchemeID | A | | Code List Agency | Scheme | Identifier | xsd | token | | 0..1 | |
| | listAgencySchemeAgencyID | A | | Code List Agency | Scheme Agency | Identifier | xsd | token | | 0..1 | |

A customer-specific code list is assigned to the GDT ContactPersonFunctionalAreaCode. An customer defines the codes in the code list.

For GDT ContactPersonFunctionalAreaCode, a customer-specific code list can be assigned to the code. A listID can be “10262.” A listAgencyID can be the ID of the customer (i.e., ID from DE 3055, if listed there). A listVersionID can be the version of the particular code list (i.e., assigned and managed by the customer). A listAgencySchemeID can be the ID of the scheme if the ListAgencyID does not come from DE 3055. The listAgencySchemeAgencyID can be the ID of the organization from DE 3055 that manages the listAgencySchemeID scheme.

The GDT ContactPersonFunctionalAreaCode is used in order to specify the functional area for which a contact person is a temporary contact person for a business partner. Examples of possible semantics for codes are: Sales and Distribution, i.e. Sales and distribution functional area; Purchasing (i.e., Purchasing functional area).

The following dictionary object is assigned to this GDT in systems: Data element (e.g., BU_ABTNR).

ContactPersonFunctionTypeCodem

A GDT ContactPersonFunctionTypeCode represents, in the form of a code, the type of function that a contact person has. This refers to the areas within the organization where the person is employed. An example of GDT ContactPersonFunctionTypeCode is:

<ContactPersonFunctionTypeCode>1</ContactPersonFunctionTypeCode>

In certain implementations, GDT ContactPersonFunctionTypeCode may have the following structure:

A customer-specific code list is assigned to the code. An customer determines the codes in the code list.

For GDT ContactPersonFunctionTypeCode, a customer-specific code list can be assigned to the code. A listID can be “10333.” A listAgencyID can be the ID of the customer, (i.e., ID from DE 3055, if listed there). A listVersionID can be the version of the particular code list (i.e., assigned and managed by the customer). A listAgencySchemeID can be the ID of the scheme if the ListAgencyID does not come from DE 3055. The listAgencySchemeAgencyID can be the ID of the organization from DE 3055 that manages the listAgencySchemeID scheme.

Examples of the possible semantics of the codes are: Member of executive board (i.e. the contact person is a member of the executive board; Purchasing manager (i.e. the contact person is the purchasing manager).

The following dictionary objects are assigned to this GDT in systems: Data element (e.g. BU_PAFKT), Domains (e.g. BU_PAFKT).

ContactPersonID

A GDT ContactPersonID is a unique identifier for a contact person. It is a natural person who is the contact person during the execution of business processes. It identifies the contact person and that person’s address. An example of GDT ContactPersonID is:

<ContactPersonID schemeID=“PartyID” schemeAgencyID=“BPL__300” schemeAgencySchemeAgencyID=“ZZZ”>4711

</ContactPersonID>

In the above example, 4711 is a contact person in system BPL__300, scheme is PartyID, and ZZZ is a proprietary Agency.

In certain implementations, GDT ContactPersonID may have the following structure:

| GDT | | Cat. | Object Class | Property | Representation/ Association | Type | Type Name | Len. | Card. | Remarks |
|---|---|---|---|---|---|---|---|---|---|---|
| Contact-Person-Function-TypeCode | | | Contact Person | Function Type | Code | CDT | Code | 1..4 | | Restricted |
| | listID | A | Code List | Identification | Identifier | xsd | token | | 0..1 | |
| | listAgencyID | A | Code List Agency | Identification | Identifier | xsd | token | | 0..1 | |
| | listVersionID | A | Code List | Version | Identifier | xsd | token | | 0..1 | |
| | listAgency-SchemeID | A | Code List Agency | Scheme | Identifier | xsd | token | | 0..1 | |
| | listAgency-Scheme-AgencyID | A | Code List Agency | Scheme Agency | Identifier | xsd | token | | 0..1 | |

| GDT | | Cat. | Object Class | Property | Representation/ Association | Type | Type Name | Len. | Card. | Remarks |
|---|---|---|---|---|---|---|---|---|---|---|
| Contact-PersonID | | | Contact Person | Identification | Identifier | CDT | Identifier | 1..60 | | restricted |
| | schemeID | A | Identification Scheme | Identification | Identifier | XSD | Token | 1..60 | 0..1 | |
| | scheme-AgencyID | A | Identification Scheme Agency | Identification | Identifier | XSD | Token | 1..60 | 0..1 | |
| | scheme-Agency-SchemeID | A | Identification Scheme Agency | Scheme | Identifier | XSD | Token | 1..60 | 0..1 | |
| | scheme-Agency-Scheme-AgencyID | A | Identification Scheme Agency | Scheme Agency | Identifier | XSD | Token | 1..3 | 0..1 | |

For GDT ContactPersonID, a customer-specific code scheme can be assigned to the code. A schemeID can be released and maintained by the responsible organization. A schemeAgencyID can be the ID of the organization (i.e., ID from DE 3055, if listed there). A schemeAgencySchemeID can be the version of the particular scheme (i.e., assigned and managed by the organization). A schemeAgency-SchemeAgencyID can be the ID of the scheme if the ListAgencyID does not come from DE 3055. The listAgencySchemeAgencyID can be the ID of the organization from DE 3055 that manages the listAgencySchemeAgencyID scheme.

Contact persons are currently only used as contact persons for a party, not for products, etc. ContactPerson only identifies a contact person for a party. This can take place explicitly within the GDT BusinessTransactionDocumentParty or implicitly in a message. In the latter case, the party for which the contact person is being specified should be clear. In an MDM, a contact person is a subtype of a party and can be identified like a party using a GUID or a PartyID.

ContactPersonInternalID

A GDT ContactPersonInternalID is a proprietary identifier for a contact person. The ContactPerson is the contact person during the execution of business processes. An example of GDT ContactPersonInternalID of a contact person is:

<ContactPersonInternalIDschemeID="PartyID" schemeAgencyID="MPL__002">4711<ContactPersonInternalID>

Another examples of GDT ContactPersonInternalID is:

<ContactPersonInternalID schemeID="PartyGUID" schemeAgencyID="MPL__002">1C743CEC501F6A4D8826C7EC5A8554B9</ContactPersonInternalID>

In the above example, schemeID="PartyGUID" which can indicate that the scheme "PartyGUID" was used to identify the contact person. Additionally, schemeAgencyID="MPL__002" which can indicate that the scheme was assigned by the business system "MPL__002."

In certain implementations, ContactPersonInternalID may have the following structure:

| CDT | | Cat. | Object Class | Property Qualifier | Property | Representation/ Association | Type | Type Name | Len. | Card. | Remarks |
|---|---|---|---|---|---|---|---|---|---|---|---|
| Contact-Person-InternalID | | | Contact Person | Internal | Identification | Identifier | GDT | Contact-PersonID | 1..32 | | restricted |
| | schemeID | A | Identification Scheme | | Identification | Identifier | XSD | Token | 1..60 | 0..1 | |
| | scheme-AgencyID | A | Identification Scheme Agency | | Identification | Identifier | XSD | Token | 1..60 | 0..1 | |

The attributes may be assigned the following values: schemeID="Party GUID" and "PartyID" and schemeAgencyID=Business System.

The CDT 'ContactPersonInternalID' represents a projection of the GDT 'ContactPersonID,' in which only the attributes 'schemeID' and 'schemeAgencyID' are contained for describing an internally assigned ID. If an attribute is not explicitly assigned in the use of the CDT, it should be clearly determined through the context. The InternalID is used when both sender and recipient can access shared master data, e.g., during internal communication. In an MDM, a contact person is a subtype of a party and can be identified like a party using a GUID or a PartyID.

ContactPersonPartyID

A GDT ContactPersonPartyID is an identifier for a contact person and is assigned by a party. A ContactPerson is the contact person during the execution of business processes. ContactPerson identifies the contact person and that person's address. An example of GDT ContactPersonPartyID is:

<ContactPersonSellerID>4711</ContactPersonSellerID>

In certain implementations, GDT ContactPersonPartyID may have the following structure:

| GDT | Object Class | Property Qual. | Property | Rep./ Ass. | Type | Type Name | Len. | Remarks |
|---|---|---|---|---|---|---|---|---|
| Contact-Person-PartyID | Contact Person | Party | Identification | Identifier | GDT | Contact-Person-ID | 1..60 | restricted |

The GDT ContactPersonPartyID is the proprietary identifier assigned by a party. The party (in its role) that assigned this identifier may derive from the context of the message that the ContactPersonPartyID uses. 'ContactPersonPartyID' limits the general identifier 'ContactPersonID'. In contrast to 'ContactPersonInternalID', the use of 'ContactPersonPartyID' within ContactPerson is role-dependent (e.g., as an ID assigned by the Buyer). The party that assigns the ID is indicated by its role. The name component 'Party' in ContactPersonPartyID is replaced with the corresponding role (e.g., ContactPersonSellerID). SchemeID and schemeVersionID are to be included as attributes as soon as there is a need for differentiating between several schemes. See also GDT ContactPersonID and ContactPersonInternalID.

CorrespondenceBankTypeCode

A GDT CorrespondenceBankTypeCode is the coded representation of the type of a correspondence bank. A correspondence bank is a bank (generally abroad) with which a bank has a business relationship. Correspondence banks are involved mainly in foreign trade, i.e., processing payment transactions, cashing foreign securities, and trading with foreign notes and coins. An example of GDT CorrespondenceBankTypeCode is:

<CorrespondenceBankTypeCode>1</CorrespondenceBankTypeCode>

In certain implementations, GDT CorrespondenceBankTypeCode may have the following structure:

| GDT | Object Class | Property | Representation/ Association | Type | Type Name | Len. | Remarks |
|---|---|---|---|---|---|---|---|
| CorrespondenceBankTypeCode | Correspondence Bank | Type | Code | CDT | Code | 1 | Restricted |

The GDT CorrespondenceBankTypeCode is a code list with the implicitly given attributes listID="10088," listAgencyID="310" and listVersionID="tbd." The GDT CorrespondenceBankTypeCode is used, for example, to specify the type of a correspondence bank during a payment order with a foreign payee.

The data type GDT CorrespondenceBankTypeCode may use the following codes: 1 (i.e., Sender), 2 (i.e., Intermediary), 3 (i.e., Recipient).

CostCentreTypeCode

A GDT CostCentreTypeCode is the coded representation of the nature of a cost center. An example of GDT CostCentreTypeCode is:

<CostCentreTypeCode>1</CostCentreTypeCode>

In certain implementations, GDT CostCentreTypeCode may have the following structure:

| GDT | Object Class | Property | Representation/ Association | Type | Type Name | Len. | Remarks |
|---|---|---|---|---|---|---|---|
| CostCentreTypeCode | Cost Centre | Type | Code | CDT | Code | 1..4 | restricted |

A customer-specific code list is assigned to the code. A customer determines the codes in the code list. The attributes of the code are assigned the following values: listID="10334," listAgencyID=ID of the customer (ID from DE 3055, if listed there), listVersionID=version of the particular code list, which can be assigned and managed by the customer. The listAgencySchemeID can be the ID of the scheme if the listAgencyID does not come from DE 3055 and listAgencySchemeAgencyID can be the ID of the organization from DE 3055 that manages the listAgencySchemeID scheme The data type GDT CostCentreTypeCode makes it possible to define sets of cost centers on the basis of the value of the data type GDT CostCentreTypeCode. Reference can then be made to these sets in the assessment, overhead costing, or settlement, for example.

The data type GDT CostCentreTypeCode may use the following code semantics: "Production," "Personnel," and "Administration." The CostCentreTypeCode may not be used in cross-enterprise communication.

CostEstimateItemTypeCode

A GDT CostEstimateItemTypeCode is the coded representation of the type of a costing item. The item is a component within an estimate, typed according to origin or source of costs, i.e. material consumption, service utilization or cost overhead. An example of GDT CostEstimateItemTypeCode is:

<CostEstimateItemTypeCode>1</CostEstimateItemTypeCode>

In certain implementations, GDT CostEstimateItemTypeCode may have the following structure:

| GDT | Object Class | Property | Representation/ Association | Type | Type Name | Len. |
|---|---|---|---|---|---|---|
| CostEstimateItemTypeCode | Cost Estimate Item | Type | Code | CDT | Code | 1..2 |

Only one code list is permitted for the CostEstimateItemTypeCode. This code list is delivered. The code list may not be changed by customers.

The attributes may be assigned the following values: listID="10196" AND listAgencyID="310."

The data type GDT CostEstimateItemTypeCode may use the following codes: 1 (i.e., Material), 2 (i.e., Service), 3 (i.e., Overhead).

CostEstimateTypeCode

A GDT CostEstimateTypeCode is the coded representation of the type of a cost estimate. A Cost Estimate is a statement of the costs calculated for a cost object, i.e., a material, project, and production order costing. An example of GDT CostEstimateTypeCode is:

<CostEstimateTypeCode>1</CostEstimateTypeCode>

In certain implementations, GDT CostEstimateTypeCode may have the following structure:

| GDT | Object Class | Property | Representation/ Association | Type | Type Name | Len. | Remarks |
|---|---|---|---|---|---|---|---|
| CostEstimateTypeCode | Cost Estimate | Type | Code | CDT | Code | 1..2 | restricted |

In certain implementations, the data type GDT CostEstimateTypeCode assigns a code list. The attributes may be assigned the following values: listID="10491," listAgencyID="310" and listVersionID can be a version of the particular code list.

The data type GDT CostEstimateTypeCode may use the following codes: 1 (i.e., Material Cost Estimate), 2 (i.e., Project Cost Estimate).

CostingStructureLevelValue

A GDT CostingStructureLevelValue is the level at which the cost estimate has to be carried out for a costing object in a multilevel structure. It defines the sequence in which the cost estimates for the individual cost objects of a costing structure are done. The costing structure is made up by linking similar costing objects, where the link can take the form of a hierarchy or network. The CostingStructureLevelValue for the individual costing objects is determined by the system. The sequence of cost estimates for the individual costing objects is based on the costing structure levels, beginning with level 1. An example of GDT CostingStructureLevelValue is:

<CostingStructureLevelValue>1</CostingStructureLevelValue>

In certain implementations, GDT CostEstimateTypeCode may have the following structure:

| GDT | Object Class | Property | Rep./ Ass. | Type | Type Name | Len. |
|---|---|---|---|---|---|---|
| Costing-Structure-LevelValue | Costing Structure | Level | Value | CDT | Numeric | 4 |

Only non-negative whole values greater than zero are permitted.

Costing objects may be materials, the procurement or production process usually multilevel. The entire process is designated as a multilevel cost structure beginning from the raw materials and ending with the finished product, and may be costed. Starting with the costing of the raw materials on level 1, the costing is made in steps up to the costing of the finished products, that are on a level greater than 1.

For a mass data costing, the user can determine which costing structure level is to be costed. This means that mass data can be divided into subpackages to make it easier to deal with.

An example of GDT CostingStructureLevel Value is: Data element (e.g., CK_KALST Costing level) and Domain (e.g., CK_KALST Costing level).

In certain implementations, GDT CostingVariantCode may have the following structure:

| GDT | Object Class | Representation/ Association | Type | Type Name | Len. | Remarks |
|---|---|---|---|---|---|---|
| Costing-Variant-Code | Costing Variant | Code | CDT | Code | 1..10 | Restricted |

A customer-specific code list can be assigned to the data type GDT CostingVariantCode. In certain implementations, a customer can define the codes in the code list.

The attributes listID, listAgencyID, listVersionID, listAgencySchemeID, listAgencySchemeAgencyID are missing from the structure, as they were reserved for customer-specific constant values during the runtime. In certain implementations, the code list has the ID 10212.

The data type GDT CostingVariantCode controls implementing and using the cost estimate, and may affect the value of the costing items involved and determination of costing dates and overhead rates. Examples of possible code semantics are: Standard price cost estimate during the year—material costing to determine the standard price based on existing inventory prices, Standard price cost estimate for new fiscal year—material costing to determine the standard price based on plan prices and Project preliminary costing—plan cost calculation for a project The following dictionary objects can be assigned to this GDT: Data element: CK_KLVAR costing variant, Domain: KLVAR costing variant.

CostRevenueElementCode

A GDT CostRevenueElementCode is the coded representation of a cost or revenue element in financial accounting. Cost or revenue elements classify currency amounts according to business criteria. An example of GDT CostRevenueElementCode is:

<CostRevenueElementCode>M1</CostRevenueElementCode>

In certain implementations, GDT CostRevenueElementCode may have the following structure:

| GDT | | Cat. | Object Class | Property | Representation/ Association | Type | Type Name | Len. | Card. |
|---|---|---|---|---|---|---|---|---|---|
| CostRevenue-ElementCode | | | | Cost Revenue Element | Code | CDT | Code | 1..10 | |
| | listID | A | Code List | Identification | Identifier | xsd | token | | 0..1 |
| | listAgencyID | A | Code List Agency | Identification | Identifier | xsd | token | | 0..1 |
| | listVersionID | A | Code List | Version | Identifier | xsd | token | | 0..1 |
| | listAgency-SchemeID | A | Code List Agency | Scheme | Identifier | xsd | token | | 0..1 |
| | listAgency-Scheme-AgencyID | A | Code List Agency | Scheme Agency | Identifier | xsd | token | | 0..1 |

CostingVariantCode

A GDT CostingVariantCode is the coded representation of a variant of cost estimates. A cost estimate is a procedure to determine the costs of materials, projects and other cost objects. The procedure can be varied in accordance with valuation approach, date determination and use of the costing result. An example of GDT CostingVariantCode is:

<CostingVariantCode>STANDARD01</CostingVariantCode>

The code is assigned to a user specific code list. A user of the code determines the codes of the code list during configuration.

A customer-specific code list is assigned to the code. An customer determines the codes in the code list. The attributes of the code are assigned the following values: listID="10166," <listAgencyID=ID of the customer (ID from DE 3055, if listed there), listVersionID=version of the particular code list. assigned and managed by the customer, listAgencySchemeID=ID of the scheme if the listAgencyID does not come from DE 3055 and listAgencySchemeAgencyID can be the ID of the organization from DE 3055 that manages the listAgencySchemeID scheme In certain implementations, the CostRevenueElementCode has the following functions in the financial accounting: Reporting (e.g., Customer specific level of reporting, Enables plan/actual comparison, Enables uniform reporting across business object boundaries and Profitabiliy reporting), Costing (e.g., Serves for illustration of the cost component split, Could be a criterion for the determination of the standard price relevant elements in the future), Basis for overhead calculation (e.g., Entity for the manual planning (e.g. cost center planning)).

For example, the CostRevenueElementCode is used among others in the production ledger account, where it classifies the amount on a balance sheet account into its single cost elements. The single cost elements like material costs and internal activities serve then also as basis for the overhead calculation.

In certain implementation, product costing the CostRevenueElementCode is used for the cost component split. On the basis of the CostRevenueElementCode then also a plan actual comparison can take place (plan costs are determined by costing, actual costs by the split of the wip amount). Examples of customer specific codes include: Material usage of purchased parts, Material usage of trading goods, Internal activity allocation of assembly, Material overhead, Product revenues, Freight revenues, Purchase order related delivery costs of freight, Assessment of cost center areas.

CounterValue

A CounterValue specifies a value that counts a number that changes in fixed increments. An example of GDT CounterValue is:

<CounterValue>42</CounterValue>

In certain implementations, GDT CounterValue may have the following structure:

| GDT | Rep./Ass. Qual. | Representation/ Association | Type | Type Name | Len. |
|---|---|---|---|---|---|
| CounterValue | Counter | Value | xsd | nonNegative-Integer | 9 |

GDT CounterValue is a qualified basic GDT based on the secondary representation term Value of the CDT Numeric and can have a restriction of xsd: decimal. In certain implementations, non-negative whole numbers equal to or less than one billion are permitted.

GDT CounterValue can be used, for example, to count collection notices to a debtor, orders in a line, or telephone calls requiring billing. It can count forwards and backwards. Changes to a CounterValue are usually made in steps of +1 or −1.

The permitted value range can be restricted depending on how the GDT CounterValue is actually used.

While CounterValue focuses on certain changes to numbers, TotalNumberValue describes a (static) number at one time or a certain period. The increase in a set by one number at a time, which can be counted using the CounterValue, can show linear ordering of the numbers in the set, which is reflected in the item numbers of the elements (OrdinalNumberValue).

The data type GDT CounterValue may use the following codes: DunningCounterValue (i.e., number of dunnings), InspectionCounterValue (i.e., number of inspections, ReconciliationPeriodCounterValue (i.e., number of reconciliation periods), RecountCounterValue (i.e., number of recounts). In certain implementations, the GDT CounterValue may include a ReconciliationPeriodCounterValue. A ReconciliationPeriodCounterValue is the number of reconciliation periods.

A reconciliation period is the time span between two successive reconciliation messages of the same sequence context.

A reconciliation message creates a common synchronization point between a sender and a receiver. To achieve this, the sender can send the receiver a current copy of the business object instance affected. This copy contains all data relevant for the receiver.

A sequence context can be defined by the receiver instance and the union of all nodes of a business object instance that are sent to this receiver instance for reconciliation purposes.

In certain implementations, the ReconciliationPeriodCounterValue is a counter value with a minimum value of 1. If a ReconciliationPeriodCounterValue is used as an attribute of a GDT/IDT (in a message), it may only occur once in the complete substructure of the GDT/IDT.

In certain implementations, ReconciliationPeriodCounterValue is used as an attribute and never as an element in messages. ReconciliationPeriodCounterValue is used when reconciliation messages are the means for ensuring restartability.

The reconciliation period refers to a sequence context. This sequence context spans all those nodes of a business object instance that are sent to the same receiver instance using reconciliation messages. For a given receiver instance, every node of a business object instance belongs to one sequence context at most. Thus for a given receiver instance, every node also belongs to at most one reconciliation period. The counter value of the first reconciliation period is 1; in certain implementations, a reconciliation message increases it by 1.

In a message containing information from a node of a particular sequence context, the receiver may be able to determine the corresponding reconciliation period. In certain implementations, this is achieved with the following rule: If an element of a message contains a ReconciliationPeriodCounterValue as an attribute, this counter value denotes the reconciliation period of all business object nodes contained in the substructure of this element.

For example:

```
<ProductionProgressMessage>
  . . .
  <ProductionProgress>
  <ID>4711</ID>
  <ProductionRequestFulfillment reconciliationCounter-
    Value="2">
    <ProductionRequestID>0815</ProductionRequestID>
    <ProductionOperation>
    . . .
    </ProductionOperation>
  </ProductionRequestFulfillment>
  <InventoryChangeItem>
    <ID>77432</ID>
    <Outbound reconciliationCounterValue="87451">
      <Location>
        <InternalID>1000CWM</InternalID>
      </Location>
      <Product>
        <IternalID>100-100</InternalID>
      </Product>
      <Quantity>20</Quantity>
    </Outbound>
```

<ID>77432</ID>
<Inbound reconciliationCounterValue="2327">
. . .
<Quantity>5</Quantity>
</Inbound>
</InventoryChangeItem>
</ProductionProgress>
</ProductionProgressMessage>

As shown in the example, nodes contained in ProductionRequestFulfillment including ProductionRequestID belong to the same sequence context. The reconciliation period of this sequence context is 2. The consumed material (Outbound) whose node is uniquely determined by location and product ID makes up a separate sequence context, which is in reconciliation period 87451. The produced material (Inbound) constitutes another sequence context with reconciliation period 2327.

CountryCode

The GDT CountryCode is a coded representation of a country defined by either national or administrative/political borders. An example of GDT CountryCode is:

<CountryCode>DE</CountryCode>

In certain implementations, GDT CountryCode may have the following structure:

| GDT | Property | Representation/ Association | Type | Type Name | Len. | Remarks |
|---|---|---|---|---|---|---|
| CountryCode | Country | Code | CDT | Code | 2..3 | restricted |

| GDT | Object Class | Property | Representation/ Association | Type | Type Name | Len. |
|---|---|---|---|---|---|---|
| CreditAgency-ReportQuery-Reason-Code | Credit Agency Report Query | Reason | Code | CDT | Code | 2 |

The GDT CreditAgencyReportQueryReasonCode is a codelist with the implicitly given attributes listID="10011," listAgencyID="310," listVersionID="tbd" and may have the following values: 01 (i.e., Business initiation) 02 (i.e., Existing business connection).

The specification of the data type GDT CreditAgencyReportQueryReasonCodes can be a legal requirement in Germany and other places. The data type GDT CreditAgencyReportQueryReasonCode may be a proprietary code list with fixed predefined values. Changes to the permitted values involve changes to the interface.

CreditAgencyReportScoring

A GDTCreditAgencyReportScoring is the rating of a party for credit information using a scorecard. An example of GDT CreditAgencyReport Scoring is:

<CreditAgencyReportScoring>
<ScoreCardID>5</ScoreCardID>
<ResultValue>85</ResultValue>
<Description languageCode="EN">ScoreCard for real estate</Description>
</CreditAgencyReportScoring>

In certain implementations, GDT CreditAgencyReportScoring may have the following structure:

| GDT | | Cat. | Object Class | Property | Representation/ Association | Type | Type Name | Len. | Card. | Rearks |
|---|---|---|---|---|---|---|---|---|---|---|
| Credit-Agency-Report-Scoring | | | Credit Agency Report Scoring | | Details | | | | | |
| | ScoreCardID | E | Credit Agency Report Scoring | Score Card Identification | Identifier | GDT | Score-CardID | 1..20 | 0..1 | |
| | ResultValue | E | Credit Agency Report Scoring | Result | Value | GDT | Decimal Value | 6.2 | 1 | restricted |
| | Description | E | Credit Agency Report Scoring | Description | Text | CDT | Description | | 0..1 | |

Exactly one fixed standard code list can be assigned to the code. The attributes are assigned the following values: listID="3166-1," listAgencyID="5" and listVersionID can be a version of the code list. Assigned by the standardization organization (if available).

The data type GDT CountryCode can be used to identify a country by national or administrative/political borders at a physical address, or a country of origin.

The data type GDT CountryCode may use the following codes: HomeCountryCode, LocationCountryCode and OriginCountryCode.

CreditAgencyReportQueryReasonCode

The GDT CreditAgencyReportQueryReasonCode is the coded representation of the reason for a query to a credit agency for credit information. An example of GDT CreditAgencyReportQueryReasonCode is:

<CreditAgencyReportQueryReasonCode>01</CreditAgencyReportQueryReasonCode>

In certain implementations, GDT CreditAgencyReportQueryReasonCode may have the following structure:

A scorecard is a scheme used by a credit agency for assessing a party using different characteristics. Several individual characteristics are examined for each scorecard, which means that several scorecards are usually necessary for a comprehensive rating, resulting in more scorings.

The data type GDT CreditAgencyReportScoring may use the following codes: ScoreCardID, ResultValue and Description.

CreditAgencyReportTypeCode

A GDT CreditAgencyReportTypeCode is the coded representation of the type of credit information according to the source and scope of the information. Credit information is information provided by an agency about the creditworthiness of a party. An example of GDT CreditAgencyReport Scoring is:

<CreditAgencyReportTypeCode>2</CreditAgencyReportTypeCode>

In certain implementations, GDT AgencyReportTypeCode may have the following structure:

| GDT | | Cat. | Object Class | Property | Representation/ Association | Type | Type Name | Len. | Card. | Remark |
|---|---|---|---|---|---|---|---|---|---|---|
| Credit-Agency-Report-TypeCode | | | Credit-Agency-Report | Type | Code | CDT | Code | 2 | | Restricted |
| | listID | A | Code List | Identification | Identifier | xsd | token | | 0..1 | |
| | listAgencyID | A | Code List Agency | Identification | Identifier | xsd | token | | 0..1 | |
| | listVersionID | A | Code List | Version | Identifier | xsd | token | | 0..1 | |
| | listAgency-SchemeID | A | Code List Agency | Scheme | Identifier | xsd | token | | 0..1 | |
| | listAgency-Scheme-AgencyID | A | Code List Agency | Scheme Agency | Identifier | xsd | token | | 0..1 | |

For GDT CreditAgencyReportTypeCode, a customer-specific code list can be assigned to the code. A listID can be "10159." If the code list is unchanged, a listAgencyID can be the ID of the customer (e.g., ID from DE 3055, if listed there). A listVersionID can be the version of the particular code list (e.g., assigned and managed by the customer). A listAgencySchemeID can be the ID of the scheme if the listAgencyID does not come from DE 3055. The listAgencySchemeAgencyID can be the ID of the organization from DE 3055 that manages the listAgencySchemeID scheme In the business object CreditAgencyReport, the data type GDT CreditAgencyReportTypeCode classifies credit information by source and scope. The data type GDT CreditAgencyReportTypeCode may use the following codes: Schufa (i.e., information created by Schufa), D&B, short (i.e., information created by Dun & Bradstreet with the scope 'Quick Check TM') and D&B, extensive (i.e., information created by Dun & Bradstreet with the scope 'Decision Support').

CreditCommitmentTypeCode

The GDT CreditCommitmentTypeCode is the coded representation of the type of a payment obligation (liability). An example of GDT CreditCommitmentTypeCode is:

<CreditCommitmentTypeCode>001</CreditCommitmentTypeCode>

In certain implementations, GDT CreditCommitmentTypeCode may have the following structure:

| GDT | Object Class | Property | Representation/ Association | Type | Type Name | Len. |
|---|---|---|---|---|---|---|
| Credit-Commitment-TypeCode | Credit Com-mitment | Type | Code | CDT | Code | 3 |

The GDT CreditCommitmentTypeCode is a codelist assigned the following values: listID="10012," listAgencyID="310," and listVersionID="tbd."

The data type GDT CreditCommitmentTypeCode is used, i.e., to inform central credit management about the type of payment obligation. The data type GDT CreditCommitmentTypeCode is an proprietary code list with fixed predefined values. Changes to the permitted values involve changes to the interface.

The data type GDT CreditCommitmentTypeCode may use the following codes: 001 (i.e., Liability from a sales order), 002 (i.e., Liability from an accounting open item (receivable from delivery and service), 003 (i.e., Liability from a special general ledger transaction (down payment, collateral), 004 (i.e., Liability from a delivery), 005 (i.e., Liability from a billing document).

CreditRatingCode

The GDT CreditRatingCode is the coded representation of the rating of the creditworthiness of a party. An example of GDT CreditRatingCodeCode is:

<CreditRatingCode listAgencyID="016">5A1</CreditRatingCode>

In certain implementations, GDT CreditRatingCode may have the following structure:

| GDT | | Cat. | Object Class | Property | Representation/ Association | Type | Type Name | Len. | Card. |
|---|---|---|---|---|---|---|---|---|---|
| Credit-RatingCode | | | Credit | Rating | Code | CDT | Code | 1..10 | 1 |
| | listID | A | Code List | Identification | Identifier | xsd | token | | 0..1 |
| | listAgencyID | A | Code List Agency | Identification | Identifier | xsd | token | 1..60 | 0..1 |
| | listAgency-Scheme-AgencyID | A | Code List Agency | Scheme Agency | Identifier | xsd | token | 3 | 0..1 |

The GDT CreditRatingCode is the proprietary code list of a credit agency, but is also a company's credit management code list. The individual values of the code represent a score value, i.e., a ranking using German school report card grades (1="very good" through 6="unsatisfactory") or percentage points. There are also codes whose meaning is explained separately (i.e., for Dun & Bradstreet).

For GDT CreditRatingCode, a customer-specific code list is assigned to the code. A listID can be "10339." If the code list is unchanged, a listAgencyID can be the ID of the customer (i.e., ID from DE 3055, if listed there). A listAgencySchemeID can be the ID of the scheme if the listAgencyID does not come from DE 3055. The listAgencySchemeAgencyID can be the ID of the organization from DE 3055 that manages the listAgencySchemeID scheme In certain implications, the data type GDT CreditRating-Code may use the following code lists: Dun & Bradstreet Rating Code where listAgencyID "016," Schufa where listAgencyID="344149856 and ListAgencySchemeAgencyID="016," Burgel where listAgencyID="DUNS number fromBurgel" and ListAgencySchemeAgencyID="016," Creditreform where listAgencyID="325636231 and ListAgencySchemeAgencyID—"016" and Mutually agreed where listAgencyID="ZZZ."

CreditRiskClassCode

The GDT CreditRiskClassCode is the coded representation for the risk of non-payment. An example of GDT CreditRiskClassCode is:

<CreditRiskClassCode listAgencyID="016">A</CreditRiskClassCode>

In certain implementations, GDT CreditRiskClassCode may have the following structure:

| GDT | | Cat. | Object Class | Property | Representation/ Association | Type | Type Name | Len. | Card. |
|---|---|---|---|---|---|---|---|---|---|
| CreditRisk-ClassCode | | | Credit | Risk Class | Code | CDT | Code | 10 | 1 |
| | listID | A | Code List | Identification | Identifier | xsd | token | | 0..1 |
| | listAgencyID | A | Code List Agency | Identification | Identifier | xsd | token | 1..60 | 0..1 |
| | listAgency-Scheme-AgencyID | A | Code List Agency | Scheme Agency | Identifier | xsd | token | 3 | 0..1 |

The GDT CreditRiskClassCode is the proprietary code list of a credit agency, but is also a company's credit management code list. The individual values of the code represent a risk class, i.e., "high," "medium," "low" (self-explanatory). However, there are also codes whose meaning is explained separately (i.e., for Dun & Bradstreet). The number of values is usually low.

For the GDT CreditRiskClassCode, a customer-specific code list is assigned to the code. A listID can be "10340." If the code list is unchanged, a listAgencyID can be the ID of the customer (e.g., ID from DE 3055, if listed there). The listAgencySchemeAgencyID can be the ID of the organization from DE 3055 that manages the listAgencySchemeID scheme In certain implications, the data type GDT CreditRiskClassCode may use the following code lists: Dun & Bradstreet Rating. Code where listAgencyID="016," Schufa where listAgencyID="344149856 and ListAgencySchemeAgencyID="016," Burgel where listAgencyID="DUNS number fromBurgel" and ListAgencySchemeAgencyID="016," Creditreform where listAgencyID="325636231" and ListAgencySchemeAgencyID—"016" and Mutually agreed where listAgencyID="ZZZ."

The data type GDT CreditRiskClassCode is used to represent the risk of non-payment involved in a business transaction. The risk of non-payment refers to the party involved in the business transaction concerned.

CreditSegmentInternalID

A GDT CreditSegmentInternalID is a proprietary identifier for a credit segment. A credit segment groups a company's business transactions from the perspective of credit assignment and control. An example of GDT CreditSegmentInternalID is:

<CreditSegmentInternalID>2000</CreditSegmentInternalID>

In certain implementations, GDT CreditSegmentInternalID may have the following structure:

| GDT | Object Class | Property | Representation/ Association | Type | Type Name | Len. | Remarks |
|---|---|---|---|---|---|---|---|
| Credit-Segment-InternalID | Credit Segment | Internal Identification | Identifier | CDT | Identifier | 1..10 | Restricted |

At present, the credit segment ID is assigned only by a company's credit manager(s).

The data type GDT CreditSegmentInternalID is used when both sender and recipient can access shared master data, i.e., during internal communication. A company's business transactions are grouped into a small number of credit segments (1 to 5). In credit control, telecommunications companies distinguish between the product categories (ProductCategory), i.e., "fixed network" and "mobile business." Other grouping criteria are, i.e., the selling organization (SellerParty) or creditor (Creditor Party).

CreditWorthinessChangeReasonCode

The GDT CreditWorthinessChangeReasonCode is the coded representation of the reason for a change in the creditworthiness of a party. An example of GDT CreditWorthinessChangeReasonCode is:

<CreditWorthinessChangeReasonCode>CL<Credit WorthinessChangeReasonCode>

In certain implementations, GDT CreditWorthinessChangeReasonCode may have the following structure:

| GDT | Object Class | Property | Representation/ Association | Type | Type Name | Len. |
|---|---|---|---|---|---|---|
| CreditWorthiness-ChangeReasonCode | Credit Worthiness | Change Reason | Code | CDT | Code | 2 |

The GDT CreditWorthinessChangeReasonCode is a codelist with the implicitly given attributes listID="10015," listAgencyID="310" and listVersionID="tbd." The CreditWorthinessChangeReasonCode is a proprietary code list with fixed values. Changes to the permitted values require changes to the interface.

The data type GDT CreditWorthinessChangeReasonCode may use the following codes: 01 (i.e., Creditworthiness changed), 02 (i.e., Creditworthiness expired), 03 (i.e., Creditworthiness at credit agency changed), 04 (i.e., Creditworthiness at credit agency expired), 05 (i.e., Risk class changed), 06 (i.e., Credit limit changed), 07 (i.e., Credit limit expired), 08 (i.e., Credit limit utilization changed), 09 (i.e., Credit limit utilization shortfall), 10 (i.e., Credit limit utilization exceeded), 11 (i.e., Credit limit change requested), 12 (i.e., Check procedure changed), 13 (i.e., Negative response to credit query).

CreditWorthinessCheckingRuleCode

The GDT CreditWorthinessCheckingRuleCode is the coded representation of the check procedure to be used to determine creditworthiness. An example of GDT CreditWorthinessCheckingRuleCode is:

<CreditWorthinessCheckingRuleCode>02</CreditWorthinessCheckingRuleCode>

In certain implementations, GDT CreditWorthinessChangeReasonCode may have the following structure:

| GDT | Object Class | Property | Representation/ Association | Type | Type Name | Len. |
|---|---|---|---|---|---|---|
| Credit-Worthiness-Checking-RuleCode | Credit Worthiness | Checking Rule | Code | CDT | Code | 2 |

The GDT CreditWorthinessCheckingRuleCode is a codelist with the implicitly given attributes listID="10016," listAgencyID="310," listVersionID="tbd."

The data type GDT CreditWorthinessCheckingRuleCode is used, i.e., when querying the creditworthiness of a business partner, to define the procedure for determining the score and the credit limit. The GDT CreditWorthinessCheckingRuleCode is a proprietary code list with fixed predefined values. Changes to the permitted values involve changes to the interface.

The data type GDT CreditWorthinessCheckingRuleCode may use the following codes: 01, (i.e., Procedure for determining the creditworthiness of new business customers (legal persons)), 02 (i.e., Procedure for determining the creditworthiness of existing business customers (legal persons)), 03 (i.e., Procedure for determining the creditworthiness of new private customers (natural persons)), 04 (i.e., Procedure for determining the creditworthiness of existing private customers (natural persons)).

CreditWorthinessCheckingSeverityCode

The GDT CreditWorthinessCheckingSeverityCode is the coded representation of the severity of the checking procedure for determining creditworthiness. An example of GDT CreditWorthinessCheckingSeverityCode is:

<CreditWorthinessCheckingSeverityCode>3</CreditWorthinessCheckingSeverityCode>

In certain implementations, GDT CreditWorthinessCheckingSeverityCode may have the following structure:

| GDT | Object Class | Property | Representation/ Association | Type | Type Name | Len. |
|---|---|---|---|---|---|---|
| CreditWorthiness-CheckingSeverityCode | Credit Worthiness | Checking Severity | Code | CDT | Code | 1 |

The GDT CreditWorthinessCheckingSeverityCode is a codelist with the implicitly given attributes listID="10017," listAgencyID="310," listVersionID="tbd."

The following linear order (from low to high severity) applies for the severity of the checking procedure for determining creditworthiness: 1<2<3. The GDT CreditWorthinessCheckingSeverityCode can be used, i.e., when querying the creditworthiness of a business partner, in order to define the severity of the creditworthiness check, i.e., if a high severity check is to be performed for a goods issue, but a low severity check is to be performed for a bid. The GDT CreditWorthinessCheckingSeverityCode is a proprietary code list with fixed predefined values. Changes to the permitted values involve changes to the interface.

The data type GDT CreditWorthinessCheckingSeverityCode may use the following codes: 1 (i.e., Low), 2 (i.e., Medium), 3 (i.e., High).

CriticalityCode

The GDT CriticalityCode is a coded representation of how critical a status is. An example of GDT CriticalityCode is:

<CriticalityCode>1</CriticalityCode>

In certain implementations, GDT CriticalityCode may have the following structure:

| GDT | Property | Representation/ Association | Type | Type Name | Len. | Remarks |
|---|---|---|---|---|---|---|
| Criticality-Code | Criticality | Code | CDT | Code | 1 | restricted |

One fixed code list is assigned to the data type GDT CriticalityCode. The attributes may be assigned the following values: listID="10264," listAgencyID="310," and list VersionID=Version of the relevant code list. The data type GDT CriticalityCode is used to specify whether a status is critical, partially critical or not critical.

The data type GDT CriticalityCode may use the following codes: 1 (i.e., Critical), 2 (i.e., Partially critical), 3 (i.e., Not critical).

CurrencyCode

The GDT CurrencyCode is a coded representation of the currency. An example of GDT CurrencyCode is:

<PaymentCurrencyCode>EUR</PaymentCurrencyCode>

In certain implementations, GDT CurrencyCode may have the following structure:

| GDT | Object Class | Property | Representation/ Association | Type | Type Name | Len. | Remarks |
|---|---|---|---|---|---|---|---|
| CurrencyCode | Currency | Code | Code | CDT | Code | 3 | restricted |

Exactly one fixed standard code list is to be assigned to the code. The attributes are assigned values as follows: listID="4217" and listAgencyID="5."

Amounts (GDT Amount) may contain a currency. However, an additional currency may be specified with GDT CurrencyCode, e.g., the specification of an alternative payment currency in the message "Payment Due Notification."

The data type GDT CurrencyCode is already used as an attribute to GDT Amount. For a conversion of the XML representation into the internal format methods are provided by the ABAP class CL_GDT_CONVERSION. Allowed qualifiers of CurrencyCode are roles defined at GDT CurrencyRoleCode (described below).

CurrencyRoleCode

A GDT CurrencyRoleCode is the coded representation of the role of a currency. An example of GDT CurrencyRoleCode is:

<CurrencyRoleCode>1</CurrencyRoleCode>

In certain implementations, GDT CurrencyRoleCode may have the following structure:

| GDT | Object Class | Property | Representation/Association | Type | Type Name | Len. | Remarks |
|---|---|---|---|---|---|---|---|
| CurrencyRoleCode | Currency | Role | Code | GDT | CurrencyRoleCode | 1..3 | restricted |

Exactly one fixed code list has been assigned to the code. The attributes are as follows: listID="10414" and listAgencyID="310."

The data type GDT CurrencyRoleCode is used to specify, i.e., the currencies that may be used in a company. GDT CurrencyRoleCodes use the static qualifiers of the CurrencyCode. Identical codes and qualifiers may describe the same semantics. Currently, only the qualifiers listed are represented.

The data type GDT CurrencyRoleCode may use the following codes: 1 (i.e., CashLocationCurrency), 2 (i.e., DefaultCurrency), 3 (i.e., HardCurrency), 4 (i.e., IndexBasedCurrency), 5 (i.e., LineItemCurrency), 6 (i.e., LocalCurrency), 7 (i.e., PaymentCurrency), 8 (i.e., ReferenceCurrency), 9 (i.e., Reporting Currency), 10 (i.e., SetOfBooksCurrency), 11 (i.e., TransactionCurrency).

CurrencyUsageCode

A GDT CurrencyUsageCode is the coded representation of how a currency is used. An example of GDT CurrencyUsageCode is:

<CurrencyUsageCode>1</CurrencyUsageCode>

In certain implementations, GDT CurrencyUsageCode may have the following structure:

| GDT | Property | Representation/ Association | Type | Type Name | Len. | Remarks |
|---|---|---|---|---|---|---|
| Currency-Usage-Code | Currency Usage | Code | CDT | Code | 1..3 | restricted |

The GDT CurrencyUsageCode may be a fixed code list. The attributes may be assigned the following values: listID="10051," listAgencyID="310." ListVersionID=(to be defined) is missing in the structure as it would be filled with constant values at run-time.

The data type GDT CurrencyUsageCode may use the following codes: 1 (i.e., Currency for payment of wages), 2 (i.e., Currency for transactions with customers/vendors).

CustomerGroupCode

A GDT CustomerGroupCode is the coded representation of a group of customers. An example of GDT CustomerGroupCode is:

<CustomerGroupCode>1</CustomerGroupCode>

In certain implementations, GDT CustomerGroupCode may have the following structure:

| GDT | | Cat. | Object Class | Property | Representation/ Association | Type | Type Name | Len. | Card. |
|---|---|---|---|---|---|---|---|---|---|
| Customer-Group-Code | | | Customer Group | | Code | CDT | Code | 1..2 | |
| | listID | A | Code List | Identification | Identifier | xsd | token | | 0..1 |
| | listAgencyID | A | Code List Agency | Identification | Identifier | xsd | token | | 0..1 |
| | listVersionID | A | Code List | Version | Identifier | xsd | token | | 0..1 |
| | listAgency-SchemeID | A | Code List Agency | Scheme | Identifier | xsd | token | | 0..1 |
| | listAgency-Scheme-AgencyID | A | Code List Agency | Scheme Agency | Identifier | xsd | token | | 0..1 |

A customer-specific code list may be assigned to the code. A customer determines the codes in the code list.

For GDT CustomerGroupCode, a customer-specific code list may be assigned to the code. A listID can be "10335." A listAgencyID can be the customer ID. A listVersionID can be the version of the particular code list (i.e., assigned and managed by the customer). A listAgencySchemeID can be the ID of the scheme if the listAgencyID does not come from DE 3055. The listAgencySchemeAgencyID can be the ID of the organization from DE 3055 that manages the listAgencySchemeID scheme.

In certain implementations, the CustomerGroupCode is not used in B2B messages. The CustomerGroupCode may be used, for example, in the sales order for pricing and statistics purposes. Examples of the possible semantics of the codes are: Industrial Enterprise (i.e., Customer group that includes industrial enterprises), Commercial enterprise (i.e., Customer group that includes commercial enterprises), Private customer (i.e., customer group that includes private customers).

The following dictionary objects may be assigned to this GDT in CRM: Data element (e.g., CRMT_CUST_GROUP) and Domain (e.g., CRM_CUST_GROUP).

CustomerPriceListTypeCode

A GDT CustomerPriceListTypeCode is a coded representation of a price list type for customers. A price list type describes the underlying structure of a price list according to its characteristic usage. An example of GDT CustomerPriceListTypeCode is:

<CustomerPriceListTypeCode>1</CustomerPriceListTypeCode>

In certain implementations, GDT CustomerPriceListTypeCode may have the following structure:

| GDT | Cat. | Object Class | Representation/ Association | Type | Type Name | Len. | Remarks |
|---|---|---|---|---|---|---|---|
| CustomerPriceListTypeCode | | Customer Price List Type | Code | CDT | Code | 1..2 | restricted |

For GDT CustomerPriceListTypeCode, a customer-specific code list can be assigned to the code. A listID can be "10336." A listAgencyID can be the ID of the customer (i.e., ID from DE 3055, if listed there). A listVersionID can be the version of the particular code list (i.e., assigned and managed by the customer). A listAgencySchemeID can be the ID of the scheme if the listAgencyID does not come from DE 3055. The listAgencySchemeAgencyID can be the ID of the organization from DE 3055 that manages the listAgencySchemeID scheme.

In messages GDT CustomerPriceListTypeCode may only be used when both sender and recipient have access to shared or harmonized Business Configuration, i.e., during internal communication in an enterprise.

GDT CustomerPriceListTypeCode is used to define price list type for customers based on price lists that have the same features. The following codes may be used: Wholesale (i.e., the price list is for wholesale customers), Retail (i.e., the price list is for retail customers), Public sector (i.e., the price list is for public sector customers), Internet (i.e., the price list is for internet sales).

CustomerTransactionDocumentItemProcessingTypeDeterminationProductGroupCode

A GDT CustomerTransactionDocumentItemProcessingTypeDeterminationProductGroupCode is the coded representation of a group of products from the viewpoint of identical determination of Item Processing Type of a Customer Transaction Document. An example of CustomerTransactionDocumentItemProcessingTypeDeterminationProductGroupCode is:

<CustomerTransactionDocumentItemProcessingTypeDeterminationProductGroupCode>NORM </CustomerTransactionDocumentItemProcessingTypeDeterminationProductGroupCode>

In certain implementations, GDT CustomerTransactionDocumentItemProcessingTypeDeterminationProductGroupCode may have the following structure:

| GDT | Object Class Qualifier | Object Class | Representation/ Association | Type | Type Name | Len. | Remarks |
|---|---|---|---|---|---|---|---|
| CustomerTransactionDocumentItemProcessingTypeDeterminationProductGroupCode | Customer Transaction Document Item_ Processing Type Determination | ProductGroup | Code | CCT | Code | 1..4 | Restricted |

A customer-specific code list may be assigned to the GDT CustomerTransactionDocumentItemProcessingTypeDeterminationProductGroupCode. The attributes may be assigned the following values: listID="10284" and listVersionID can be a version of the particular code list.

The GDT CustomerTransactionDocumentItemProcessingTypeDeterminationProductGroupCode may only be used in business objects.

The data type GDT CustomerTransactionDocumentItemProcessingTypeDeterminationProductGroupCode may use the following codes: NORM (i.e., Standard Material product group), SRVP (i.e., Customer Service product group), SRVM (i.e., Service spare part product group).

CustomerTransactionDocumentOriginTypeCode

CustomerTransactionDocumentOriginTypeCode is the coded representation of the type of origin of customer-specific transaction documents. The type of origin of a transaction document provides the business origin of a transaction document, i.e., an organizational unit, or a transaction from which the transaction document arises. An example of CustomerTransactionDocumentOriginTypeCode is:

<CustomerTransactionDocumentOriginTypeCode>1</CustomerTransactionDocumentOriginTypeCode>

In certain implementations, GDT CustomerTransactionDocumentOriginTypeCode may have the following structure:

| GDT | | Cat. | Object Class | Property | Representation/ Association | Type | Type Name | Len. | Card. |
|---|---|---|---|---|---|---|---|---|---|
| Customer-Transaction-Document-Origin-TypeCode | | | Customer Transaction Document | Origin Type | Code | CDT | Code | 1...3 | |
| | listID | A | Code List | Identification | Identifier | xsd | token | | 0..1 |
| | listAgencyID | A | Code List Agency | Identification | Identifier | xsd | token | | 0..1 |
| | listVersionID | A | Code List | Version | Identifier | xsd | token | | 0..1 |
| | listAgency-SchemeID | A | Code List Agency | Scheme | Identifier | xsd | token | | 0..1 |
| | listAgency-Scheme-AgencyID | A | Code List Agency | Scheme Agency | Identifier | xsd | token | | 0..1 |

An extendable code list is assigned to the code. Customers may replace lists with their own.

For GDT CustomerTransactionDocument-OriginTypeCode, a customer specific code list can be assigned to the code. A listID can be the ID of the particular code list. If the code list is unchanged, a listAgencyID can be "310." Otherwise, a listAgencyID can be the ID of the customer (i.e., ID from DE 3055, if listed there). A listVersionID can be the version of the particular code (i.e., assigned and managed by the customer). A listAgencySchemeID can be the ID of the scheme if the listAgencyID does not come from DE 3055. The listAgencySchemeAgencyID can be the ID of the organization from DE 3055 that manages the listAgency-SchemeID scheme.

The GDT CustomerTransactionDocument-OriginTypeCode may be used primarily in reporting.

For GDT CustomerTransactionDocument-OriginTypeCode, the following dictionary objects can be assigned to this GDT: Data element: (e.g., CRMT-_SOURCE), Type (e.g., CHAR 03), Software component: (e.g., BBPCRM).

The data type GDT CustomerTransactionDocument-OriginTypeCode may use the following codes: 1 (i.e., Trade Fair), 2 (i.e., External Partner), 3 (i.e., Campaign), 4 (i.e., Telephone Inquiry), 5 (i.e., Roadshow).

CustomerTransactionDocumentReasonCode

A GDT CustomerTransactionDocumentReasonCode is the coded representation of the reason for creating a document within a customer-specific business transaction. A business transaction is a self-contained, logically coherent business transaction that results in a change in quantity and/or value, or event. An example of GDT CustomerTransaction-DocumentReasonCode is:

<BusinessTransactionDocument>

Another example of GDT CustomerTransactionDocumentReasonCode is:

<CustomerTransactionDocumentReasonCode>1</CustomerTransactionDocumentReasonCode>

Another example of GDT CustomerTransactionDocumentReasonCode is:

</BusinessTransactionDocument>

In certain implementations, GDT CustomerTransaction-DocumentReasonCode may have the following structure:

| GDT | | Cat. | Object Class | Property | Representation/ Association | Type | Type Name | Len. | Card. | Remarks |
|---|---|---|---|---|---|---|---|---|---|---|
| Customer-Transaction-Document-ReasonCode | | | Customer Transaction Document Reason | | Code | CDT | Code | 1..4 | | Restricted |
| | listAgencyID | A | Code List Agency | Identification | Identifier | xsd | token | | 0..1 | |
| | listVersionID | A | Code List | Version | Identifier | xsd | token | | 0..1 | |
| | listAgency SchemeID | A | Code List Agency | Scheme | Identifier | xsd | token | | 0..1 | |
| | listAgency Scheme-AgencyID | A | Code List Agency | Scheme Agency | Identifier | xsd | token | | 0..1 | |

The attribute may be assigned the following value: listID="10309."

For GDT CustomerTransactionDocumentReasonCode, a extendable code list may be assigned to the code. A listID can be the ID of the particular code list. If the code list is unchanged, a listAgencyID can be "310." Otherwise, a listAgencyID can be the ID of the customer (e.g., ID from DE 3055, if listed there). A listVersionID can be the version of the particular code (e.g., assigned and managed by the customer). A listAgencySchemeID can be the ID of the scheme if the listAgencyID does not come from DE 3055. The listAgency-SchemeAgencyID can be the ID of the organization from DE 3055 that manages the listAgencySchemeID scheme.

A typical example of a GDT CustomerTransactionDocumentReasonCode is the reason for assigning an order, e.g., the coded reason 'Good service'. If goods are returned, the reason could be 'Transport damage.' The GDT Customer-TransactionDocumentReasonCode already existed in R/3. There, it may be modeled at header level, e.g., in VBAK with the attribute AUGRU. Table TVAU contains characteristic values.

The data type GDT CustomerTransactionDocumentReasonCode may use the following codes: 1 (i.e., Favorable price), 2 (i.e., Fast delivery), 3 (i.e., Good service), 4 (i.e., Poor quality), 5 (i.e., Transport damages), 6 (i.e., Spoilt goods).

CustomerTransactionDocumentResultReasonCode

A GDT CustomerTransactionDocumentResultReasonCode is the coded representation for a substantiation of a result within a customer specific business transaction. A business transaction is a self-contained, logically coherent business transaction that results in a change in quantity and/or value, or event. An example of GDT CustomerTransactionDocumentResultReasonCode is:

<LeadResultReason>1</LeadResultReason>

In certain implementations, GDT CustomerTransactionDocumentResultReasonCode may have the following structure:

| GDT | | Cat. | Object Class | Property | Representation/ Association | Type | Type Name | Len. | Card. | Remarks |
|---|---|---|---|---|---|---|---|---|---|---|
| Customer-Transaction-Document-Result-ReasonCode | | | Customer Transaction Document | Result Reason | Code | CDT | Code | 1..3 | | restricted |
| | listID | A | Code List | Identification | Identifier | xsd | token | | 0..1 | |
| | listAgencyID | A | Code List Agency | Identification | Identifier | xsd | token | | 0..1 | |
| | listVersionID | A | Code List | Version | Identifier | xsd | token | | 0..1 | |
| | listAgency SchemeID | A | Code List Agency | Scheme | Identifier | xsd | token | | 0..1 | |
| | listAgency Scheme-AgencyID | A | Code List Agency | Scheme Agency | Identifier | xsd | token | | 0..1 | |

For GDT CustomerTransactionDocumentResultReasonCode, a extendable code list may be assigned to the code. A listID can be "10455." If the code list is unchanged, a listAgencyID can be "310." Otherwise, a listAgencyID can be the ID of the customer (i.e., ID from DE 3055, if listed there). A listVersionID can be the version of the particular code (i.e., assigned and managed by the customer). A listAgencySchemeID can be the ID of the scheme if the listAgencyID does not come from DE 3055. The listAgencySchemeAgencyID can be the ID of the organization from DE 3055 that manages the listAgencySchemeID scheme.

The context the GDT CustomerTransactionDocumentResultReason is used in has to assure what business transaction brings up the result. The result itself may also be described clearly in the context. The GDT CustomerTransactionDocumentResultReasonCode is used to explain the result of a lead or opportunity for business management reasons. The declaration of a reason is especially meaningful with won or lost leads or opportunities to report about the reasons later on.

The data type GDT CustomerTransactionDocumentResultReason may use the following codes: 1 (i.e., Lost to competitor), 2 (i.e., Lost because of product), 3 (i.e., Lost because of service), 4 (i.e., Won against competitor), 5 (i.e., Won because of product), 6 (i.e., Won because of service).

CustomsCommodityClassificationCode

The GDT CustomsCommodityClassificationCode is a coded representation of the customs-related classification of trading goods. An example of GDT CustomsCommodityClassificationCode is:

<CustomsCommodityClassificationCode>85281252000 </CustomsCommodityClassificationCode>

In the previous example, the code stands for "Television receivers, color, with integral tube, with a screen width/height ratio k1. 1, 5, with a diagonal measurement of the screen of k1.=42 cm (excl. incorporating video-recording or reproducing apparatus and video monitors)."

In certain implementations, GDT CustomsCommodityClassificationCode may have the following structure:

| GDT | Property | Representation/ Association | Type | Type Name | Len. | Remarks |
|---|---|---|---|---|---|---|
| Customs-Commodity-Classification-Code | Commodity Classification | Code | CDT | Code | 4..11 | Restricted |

All character strings from four to 11 characters may be allowed as value ranges. The attributes may be assigned the following values: One-two characters (i.e., Chapter), Three-four characters (i.e., Item), Five-six characters (i.e., Subitem Harmonized System), Seven-eight characters (i.e., Combined Nomenclature), Nine-eleven characters (i.e., International and National Features).

The basis for the first six characters of the code may be the Harmonized System (HS) managed by the World Customs Organization (WCO) and providing an internationally valid classification for all trading goods. The WCO has the entry "I" in the DE3055. The characters seven to 11 are used to classify products nationally or internationally.

The GDT CustomsCommodityClassificationCode may be used mainly for classifying trading goods with tariff code numbers and for implementing regulatory measures.

CustomsPreferentialStatementStatusCode

A GDT CustomsPreferentialStatementStatusCode is a coded representation of the status of a customs preferential statement of a vendor. An example of GDT CustomsPreferentialStatementStatusCode is:

<CustomsPreferentialStatementStatusCode>02</CustomsPreferentialStatementStatusCode>

In certain implementations, GDT CustomsPreferentialStatementStatusCode may have the following structure:

| GDT | Object Class | Property | Representation/ Association | Type | Type Name | Len. | Remarks |
|---|---|---|---|---|---|---|---|
| Customs-Preferential-Statement-Status-Code | Customs | Preferential Statement Status | Code | CDT | Code | 2 | Restricted |

The data type GDT CustomsPreferentialStatementStatusCode may be a codelist with the attributes assigned the following values: listID="10018," listAgencyID="310," listVersionID="tbd."

The data type GDT CustomsPreferentialStatementStatusCode may use the following codes: 01 (i.e., Negative), 02 (i.e., Detailed Negative), 03 (i.e., Positive).

DangerousGoods

A GDT DangerousGoods represents substances or objects that, due to their properties, present a danger to public safety, to the life and health of people and animals or to the safety of things. An example of DangerousGoods is:

<DangerousGoods>
<ClassID>1<ClassID>
<DivisionID>3</DivisionID>
</DangerousGoods>

In certain implementations, DangerousGoods may have the following structure:

| GDT | | Cat. | Object Class | Property | Representation/ Association | Type | Type Name | Len. | Card. |
|---|---|---|---|---|---|---|---|---|---|
| Dangerous Goods | | | Dangerous Goods | | Details | | | | |
| | ID | E | Dangerous Goods | Identification | Identifier | GDT | Dangerous-GoodsID | 4 | 0..1 |
| | Regulations-Code | E | Dangerous Goods | Regulations | Code | GDT | DangerousGoods-Regulation-Code | 1..3 | 0..1 |
| | ClassID | E | Dangerous Goods | Division | Identifier | CDT | Identifier | 1..3 | 0..1 |
| | DivisionID | | Dangerous Goods | Division | Identifier | CDT | Identifier | 1..6 | 0.. |

For DangerousGoods, the attributes may be assigned the following values: ID="identifies a hazardous material using the United Nations Dangerous Goods (UNDG) identifier," RegulationsCode="Coded representation of national or international dangerous goods rules or regulations according to the UN/EDIFACT code list 8273 'Dangerous goods regulations code,'" ClassID="Identifies a dangerous goods class," DivisionID="Identifies a breakdown of the dangerous goods class."

If the RegulationCode is specified, ClassID can be filled in and, if necessary, DivisionID of this RegulationCode can be filled in. Currently, only dangerous goods rules or regulations can be used that have a maximum of two steps in their classification scheme. The information DangerousGoods may be a requirement for an appropriate and environmentally-friendly handling, transport and storage of a product that may contain or contains a dangerous good.

The DangerousGoodsCode can be used with the DangerousGoodsIndicator, e.g., in that the DangerousGoodsIndicator displays that dangerous goods are contained in a delivery, while the data type DangerousGoodsCode provides more detail about the danger posed by a delivery item. "Dangerous Goods" may be the usual name for dangerous goods/materials at national and international level. In the USA, however, the term "Hazardous Materials" may also be common. In certain implementations, the terms "Dangerous Goods" and "Hazardous Materials" and variants of these two are not used to differentiate between the transport of dangerous goods and the storage of dangerous goods.

DangerousGoodsID

DangerousGoodsID is the unique identifier for a dangerous good, using the United Nations Dangerous Goods (UNDG) Number. An example of DangerousGoodsID is:

<DangerousGoodsID>2453</DangerousGoodsID>

In certain implementations, DangerousGoodsID may have the following structure:

| GDT | Object Class | Property | Representation/ Association | Type | Type Name | Len. |
|---|---|---|---|---|---|---|
| Dangerous GoodsID | Dangerous Goods | Identification | Identifier | CDT | Identifier | 4 |

Since the UNGD number identifies individual chemicals or groups of chemicals, its explicit list may be very extensive and should therefore be consulted directly in the original documents of the "UN Model Regulations."

The code "UN ID" may often be used for a dangerous good instead of the term "UN number".

DangerousGoodsRegulationsCode

The DangerousGoodsRegulationsCode is the coded representation of a national or international dangerous goods rules or regulations according to the UN/EDIFACT code list 8273 "Dangerous goods regulations code." An example of DangerousGoodsRegulationCode is:

<DangerousGoodsRegulationsCode>GVS</DangerousGoodsRegulationsCode>

In certain implementations, DangerousGoodsRegulationsCode may have the following structure:

| GDT | Object Class | Property | Representation/ Association | Type | Type Name | Len. |
|---|---|---|---|---|---|---|
| Dangerous-Goods-Regulations-Code | Dangerous Goods | Regulations | Code | CDT | Code | 1..3 |

The DangerousGoodsRegulationsCode may have one fixed standard code list (e.g., UN/EDIFACT code list 8273 "Dangerous goods regulations code") assigned. The attributes may be assigned the following values: listID="8273," listAgencyID="6" and listVersionID can be a version of the code list assigned by the standardization organization (if available).

The code list and its values may include: ADR (i.e., European agreement on the international carriage of dangerous goods on road (ADR)), ADS (i.e., NDR European agreement for the transport of dangerous goods on the river Rhine), ADT (i.e., CA, Transport Canada's dangerous goods requirements), ADU (i.e., JP, Japanese maritime safety agency dangerous goods regulation code), AGS (i.e., DE, ADR and GGVS combined regulations for combined transport), ANR (i.e., ADNR, Autorisation de transport de matieres Dangereuses pour la Navigation sur le Rhin), ADR (i.e., DE, ADR and RID—combined regulations for combined transport), CFR (i.e., US, 49 Code of federal regulations), COM (i.e., DE, ADR, RID, GGVS, and GGVE—Combined regulations for combined transport), GVE (i.e., DE, GGVE (Gefahrgutverordnung)), GVS (i.e., DE, GGVS (Gefahrgutverordnung Strasse)), ICA (i.e., IATA ICAO), IMD (i.e., IMO IMDG code), RGE (i.e., DE, Rid and GGVE, Combined regulations for combined transport on rails), RID (i.e., Railroad dangerous goods book (RID)), UI (i.e., UK IMO book), ZZZ (i.e., Mutually defined).

DataOriginTypeCode

A DataOriginTypeCode is the coded description of where the data originates. An example of DataOriginTypeCode is:

<DataOriginTypeCode>1</DataOriginTypeCode>

In certain implementations, DataOriginTypeCode may have the following structure:

| GDT | | Cat. | Object Class | Property Qualifier | Property | Representation/ Association | Type | Type Name | Len. | Card. | Rearks. |
|---|---|---|---|---|---|---|---|---|---|---|---|
| DataOrigin-TypeCode | | | | Data | Origin Type | Code | CDT | Code | 1..4 | | Restricted |
| | listID | A | Code List | | Identification | Identifier | XSD | Token | | 0..1 | |
| | listAgencyID | A | Code List Agency | | Identification | Identifier | XSD | Token | | 0..1 | |
| | listVersionID | A | Code List | | Version | Identifier | XSD | Token | | 0..1 | |
| | listAgency-SchemeID | A | Code List Agency | | Scheme | Identifier | XSD | Token | | 0..1 | |
| | listAgency-Scheme-AgencyID | A | Code List Agency | | Scheme Agency | Identifier | XSD | Token | | 0..1 | |

The DataOriginTypeCode may assign a customer-specific code list to the code. A customer determines the codes in the code list.

A listID can be "10337." A listAgencyID can be the ID of the customer (e.g., ID from DE 3055, if listed there). A listVersionID can be the version of the particular code list (e.g., assigned and managed by the customer). A listAgencySchemeID can be the ID of the scheme if the listAgencyID does not come from DE 3055. The listAgencySchemeAgencyID can be the ID of the organization from DE 3055 that manages the listAgencySchemeID scheme.

The DataOriginTypeCode may be used to display the origin of the data that is saved in a data processing system. Examples of possible values may include: Legacy data transfer (e.g., The data comes from the transfer of legacy data), Address purchase (i.e., The data comes from the purchase of addresses).

Dictionary objects assigned to the DataOriginTypeCode may be: Data element (e.g., BU_SOURCE), Domain (e.g., BU_SOURCE).

Date

A Date is the specification of an exact day in the Gregorian calendar. An example of DateCode is:

<OrderDate>2002-04-19</OrderDate>

In certain implementations, Date may have the following structure:

| GDT | Object Class | Representation/ Association | Type | Type Name |
|---|---|---|---|---|
| Date | Date | Type | Xsd | Date |

The GDT Date can use the W3C built-in data type xsd:date. This may be structured according to the extended representation of ISO 8601. The extended representation is as follows: CCYY-MM-DD (e.g., 2002-04-19).

The extended representation uses the following literals: CC is for century (e.g., 00-99), YY represents the year (e.g., 00-99), MM represents the month (e.g., 01-12), DD represents the day (e.g., 01-28). In certain implementations, the number of days can be greater than 28 depending on the month. For example, 01-29 days for month when the year is a leap year, 01-30 days for months 04, 06, 09, and 11, and 01-31 days for months 01, 03, 05, 07, 08, 10, and 12.

In certain implementations, there may be a hyphen between the year, month, and day. Years may be represented by a four-character code (i.e., 0001 to 9999). Leading positive or negative signs before the year may not be supported. Time zones prefixed with the time-zone-character "Z" may not be supported for the date. The regular expression restricts the character pattern of date to the following: [0-9]{4}-[0-9]{2}-[0-9]{2}. Meaningless data such as 0000-00-00 can be represented by this regular expression. However, explicit restrictions mean that this may not be possible for the built-in data type "xsd:date".

Date may be used to represent points in time or time stamps in which the day may be exact. Date may not be used to specify periodic events. The length of a day can vary due to changes in daylight savings.

In certain implementations, the "Gregorian calendar" is used and may be a compromise for the complicated calculation of a "tropical" year. The length of a mean "tropical" year is 365.2422 days. The "Gregorian calendar" determines the rules for leap years and was introduced in 1582.

In an element name "TimePoint" may be replaced by "Date," (e.g., ApprovalTimePoint can be replaced with ApprovalDate).

DateCalculationFunctionCode

A DateCalculationFunctionCode is a coded representation of a DateCalculationFunction. A DateCalculationFunction is a function used to evaluate a time-point or a duration. The expression specifying the function can be any combination of operations exposed on a Calendar, for example, moving on the time axes or rounding. An example of DateCalculationFunctionCode is:

<DateCalculationFunctionCode>1</DateCalculationFunctionCode>

In certain implementations, DateCalculationFunctionCode may have the following structure:

| GDT | | Cat | Object Class | Property | Representation/ Association | Type | Type Name | Len. | Card. | Remarks |
|---|---|---|---|---|---|---|---|---|---|---|
| Date-Calculation-Function-Code | | | Date Calculation Function | | Code | CDT | Code | 1..4 | | restricted |
| | listID | A | Code List | Identification | Identifier | xsd | token | | 0..1 | |
| | listAgencyID | A | Code List Agency | Identification | Identifier | xsd | token | | 0..1 | |
| | listVersionID | A | Code List | Version | Identifier | xsd | token | | 0..1 | |
| | listAgency-SchemeID | A | Code List Agency | Scheme | Identifier | xsd | token | | 0..1 | |
| | listAgency-Scheme-AgencyID | A | Code List Agency | Scheme Agency | Identifier | xsd | token | | 0..1 | |

DateCalculationFunctionCode may assign an extensible code list to the code. A customer can replace this code list with his own one. A customer can only extend the code list.

For DateCalculationFunctionCode, a customer-specific code list can be assigned to the code. A listID can be "10415." If the code is unchanged, a listAgencyID can be "310." Otherwise, a listAgencyID can be the ID of the customer (e.g., ID from DE 3055, if listed there). A listVersionID can be the version of the particular code list (e.g., assigned and managed by the customer). A listAgencySchemeID can be the ID of the scheme if the listAgencyID does not come from DE 3055. The listAgencySchemeAgencyID can be the ID of the organization from DE 3055 that manages the listAgencySchemeID scheme.

DateCalculationFunctionCode may only be used as part of DateCalculationFunctionReferences. DateCalculation Functions may be part of the Reuse Service Component Date&Time.

The code list and its values may include: Code 1 (i.e., Today—Today function returns the current date and current time as a Local DateTime time-point), Code 2 (i.e., Today Noon Today Noon function returns the current date and sets the time to noon as a Local DateTime time-point).

DateCalculationFunctionGroupCode

A DateCalculationFunctionGroupCode is a coded representation of a DateCalculationFunctionGroup. A DateCalculation Function Group groups one or more Date Calculation Functions. A Date Calculation Function may be a function used to evaluate a time-point or a duration. The expression, specifying the function, can be any combination of operations exposed on a Calendar like moving on the time axes or rounding, e.g. An example of DataCalculationFunctionGroupCode is:

<DateCalculationFunctionGroupCode>1</DateCalculationFunctionGroupCode>

In certain implementations, DateCalculationFunctionGroupCode may have the following structure:

| GDT | | Cat. | Object Class | Property | Representation/Association | Type | Type Name | Len. | Card. | Remarks |
|---|---|---|---|---|---|---|---|---|---|---|
| DateCalculation-FunctionGroupCode | | | Date Calculation Function Group | | Code | CDT | Code | 1..4 | | restricted |
| | listID | A | Code List | Identification | Identifier | xsd | token | | 0..1 | |
| | listAgencyID | A | Code List Agency | Identification | Identifier | xsd | token | | 0..1 | |
| | listVersionID | A | Code List | Version | Identifier | xsd | token | | 0..1 | |
| | listAgency-SchemeID | A | Code List Agency | Scheme | Identifier | xsd | token | | 0..1 | |
| | listAgency-SchemeAgencyID | A | Code List Agency | Scheme Agency | Identifier | xsd | token | | 0..1 | |

DateCalculationFunctionGroupCode may assign an extensible code list to the code. A customer can replace this code list with his own one. A customer can only extend the code list.

For DateCalculationFunctionGroupCode, a customer-specific code list can be assigned to the code. A listID can be “10416.” If the code is unchanged, a listAgencyID can be “310.” Otherwise, a listAgencyID can be the ID of the customer (e.g., ID from DE 3055, if listed there). A listVersionID can be the version of the particular code list (e.g., assigned and managed by the customer). A listAgencySchemeID can be the ID of the scheme if the listAgencyID does not come from DE 3055. The listAgencySchemeAgencyID can be the ID of the organization from DE 3055 that manages the listAgencySchemeID.

An extensible code list is assigned to the code. A customer can replace this code list with his own one.

DateCalculationFunctionGroupCode may only be used as part of DateCalculationFunctionReferences. DateCalculationFunctions are part of the Reuse Service Component Date&Time.

The code list and its value may include: Global (i.e., Default function group, containing the standard date calculation functions).

DateCalculationFunctionReference

A DateCalculationFunctionReference is a reference to a predefined DateCalculationFunction. A DateCalculationFunction is a function used to evaluate a time-point or a duration. The expression specifying the function can be any combination of operations exposed on a calendar like moving on the time axis or rounding. An example of DateCalculationFunctionReference is:

<DateCalculationFunctionReference>

<DateCalculationFunctionGroupCode>1</DateCalculationFunctionGroupCode>

<DateCalculationFunctionCode>1<DateCalculation FunctionCode>

<DateCalculationVersionID>2</DateCalculationVersionID>

</DateCalculationFunctionReference>

In certain implementations, DateCalculationFunctionReference may have the following structure:

DateCalculationFunctionReference may be an aggregation and may include the following sub-elements: FunctionGroupCode, FunctionCode and FunctionVersionID.

The DateCalculationFunctionReference may reference an existing function. However, this can only be checked during runtime, since the values for all elements of the structure can also be maintained by the customer. Function group and function code can be mandatory to identify a single function. If the version of the function is missing, the latest version may be used.

DateCalculationFunctionReference may be used when an application needs to call a predefined DateCalculation function to determine the value of a time-point or a duration. DateCalculationFunctions may be part of the Reuse Service Component Date&Time. In the Reuse Service Component DateCalculation may be called DateRules.

DatePeriod

A DatePeriod is a period that is defined by two points in time. These points in time may be expressed in calendar days. The date period may be determined by a start time point and an end time, duration and a start time point or duration with an end time point. It may not specified whether the interval includes or excludes the given time-points. In certain implementations, DatePeriod does not explicitly specify if the given dates for start and end are include or excluded. In such implementations, GDT CLOSED_DatePeriod (described below) or UPPEROPEN_DatePeriod (described below) can be used instead. An example of DatePeriod is:

<HolidayPeriod>

<StartDate>2003-07-01</StartDate>

<EndDate>2003-10-25</EndDate>

</HolidayPeriod>

Another example of DatePeriod is:

<HolidayPeriod>

<StartDate>2006-01-02</StartDate>

<Duration>P7D</Duration>

</HolidayPeriod>

In certain implementations, DatePeriod may have the following structure:

| GDT | | Cat. | Object Class | Property | Rep./Ass. | Type | Type Name | Len. | Card. | Remarks |
|---|---|---|---|---|---|---|---|---|---|---|
| DateCalculation-FunctionReference | | | Date Calculation Function Reference | | Details | | | | | |
| | DateCalculation-FunctionGroup-Code | E | Date Calculation Function Reference | Date Calculation Function Group | Code | GDT | DateCalculation-FunctionGroup-Code | 1..12 | 1 | |
| | DateCalculation-FunctionCode | E | Date Calculation Function Reference | Date Calculation Function | Code | GDT | DateCalculation-FunctionCode | 1..12 | 1 | |
| | DateCalculation-FunctionVersionID | E | Date Calculation Function Reference | Date Calculation Version | Identification | GDT | VersionID | 1..3 | 0..1 | restricted |

| GDT | | Cat. | Object Class | Property | Representation/Association | Type | Type Name | Card. |
|---|---|---|---|---|---|---|---|---|
| DatePeriod | | | Date Period | | Details | | | |
| | StartDate | E | Date Period | Start Date | Date | GDT | Date | 0..1 |
| | EndDate | E | Date Period | End Date | Date | GDT | Date | 0..1 |
| | Duration | E | Date Period | Duration | Duration | GDT | Duration | 0..1 |

Period may be an aggregation and includes the following sub-elements: StartDate, EndDate and Duration. The following conventions may be used: years (YY), months (MM) and days (DD). In certain implementations, hours (HH), minutes (MM) and seconds (S.SSSS) are not used in this context.

The sub-elements in Period can be optional. However, the representation can only include one of the following tuples: StartDate and EndDate, StartDate and Duration and EndDate and Duration. The EndDate may be greater than or equal to the StartDate. Duration can be specified in years, months or days. Hours, minutes and seconds may not be valid.

DatePeriod may be used to specify a period that is expressed using two dates or one date and one relative duration (i.e., the start and end dates of a holiday or the start date and duration in days of a temporary work contract).

The term Date in Object Class Term may be obsolete in GDTs. Therefore, this term may only comprise Period. This is because the term Date is given by the sub-elements using Property Term. As a result, the semantic of these GDTs may be unique.

CLOSED_DatePeriod

A GDT CLOSED_DatePeriod is a period that is defined by two points in time. These points in time may be expressed in calendar days. An example of Restricted GDT CLOSED_DatePeriod is:

<HolidayPeriod>
<StartDate>2003-07-01</StartDate>
<EndDate>2003-10-25</EndDate>
</HolidayPeriod>

In certain implementations, GDT CLOSED_DatePeriod may have the following structure:

| GDT | | Cat. | Object Class | Property | Representation/Association | Type | Type Name | Card. | Remarks |
|---|---|---|---|---|---|---|---|---|---|
| CLOSED_DatePeriod | | | CLOSED_ Date Period | Details | | | | | restricted |
| | StartDate | E | Time Period | Start Date | Date | GDT | Date | 1 | |
| | EndDate | E | Date Period | End Date | Date | GDT | Date | 1 | |

EndDate may be greater than or equal to the StartDate. If the EndDate and the StartDate are equal, the duration of the period is 1 Day, due to the fact that the end time-point is included. In certain implementations, GDT CLOSED_DatePeriod may be a restriction on GDT DatePeriod. The GDT CLOSED_DatePeriod may include the variable "CLOSED_" which may get replaced by one (or more) qualifiers.

UPPEROPEN_DatePeriod

A GDT UPPEROPEN_DatePeriod is a period that is defined by two points in time. These points in time may be expressed in calendar days. GDT UPPEROPEN_DatePeriod includes the start time-point and excludes the end time-point. An example of GDT UPPEROPEN_DatePeriod is:

<HolidayPeriod>
<StartDate>2003-07-01</StartDate>
<EndDate>2003-10-25</EndDate>
</HolidayPeriod>

In certain implementations, GDT UPPEROPEN_DatePeriod may have the following structure:

| GDT | | Cat. | Object Class | Property | Representation/Association | Type | Type Name | Card. |
|---|---|---|---|---|---|---|---|---|
| UPPEROPEN_DatePeriod | | | UPPEROPEN_ Date Period | Details | | | | |
| | StartDate | E | Time Period | Start Date | Date | GDT | Date | 0..1 |
| | EndDate | E | Date Period | End Date | Date | GDT | Date | 0..1 |

The GDT UPPEROPEN_DatePeriod may be a restriction on GDT DatePeriod. Restricted GDT UPPEROPEN_DatePeriod may include the variable "UPPEROPEN_", which may get replaced by one (or more) qualifiers.

Allowed qualifiers of DatePeriod are roles defined at GDT PeriodRoleCode (i.e., ActivePeriod).

DateTimePeriod

Figures 32, 55:
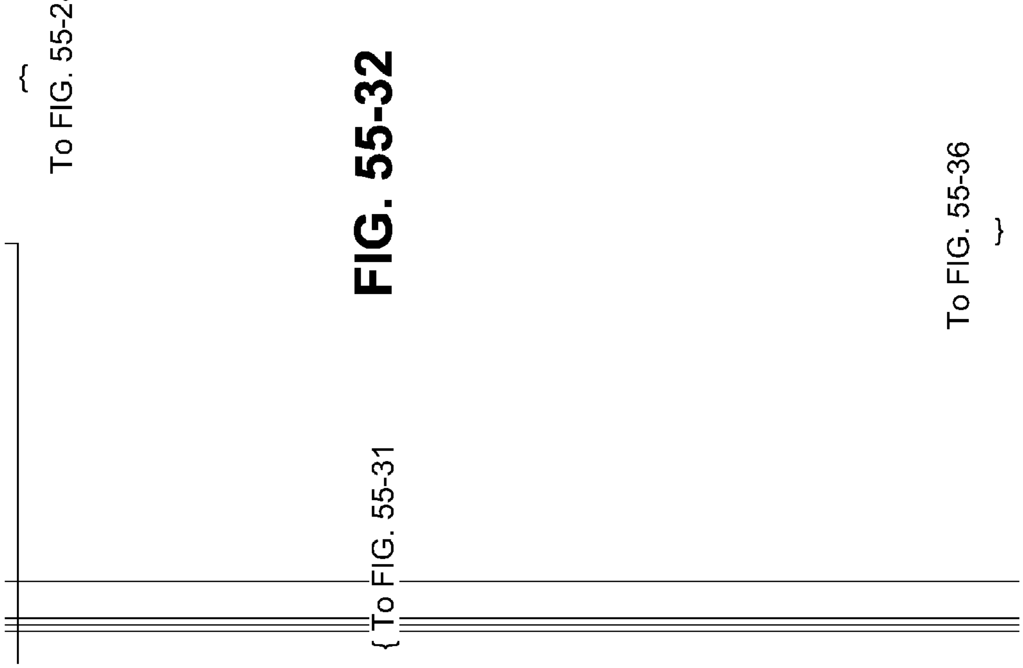
Figures 33, 55:
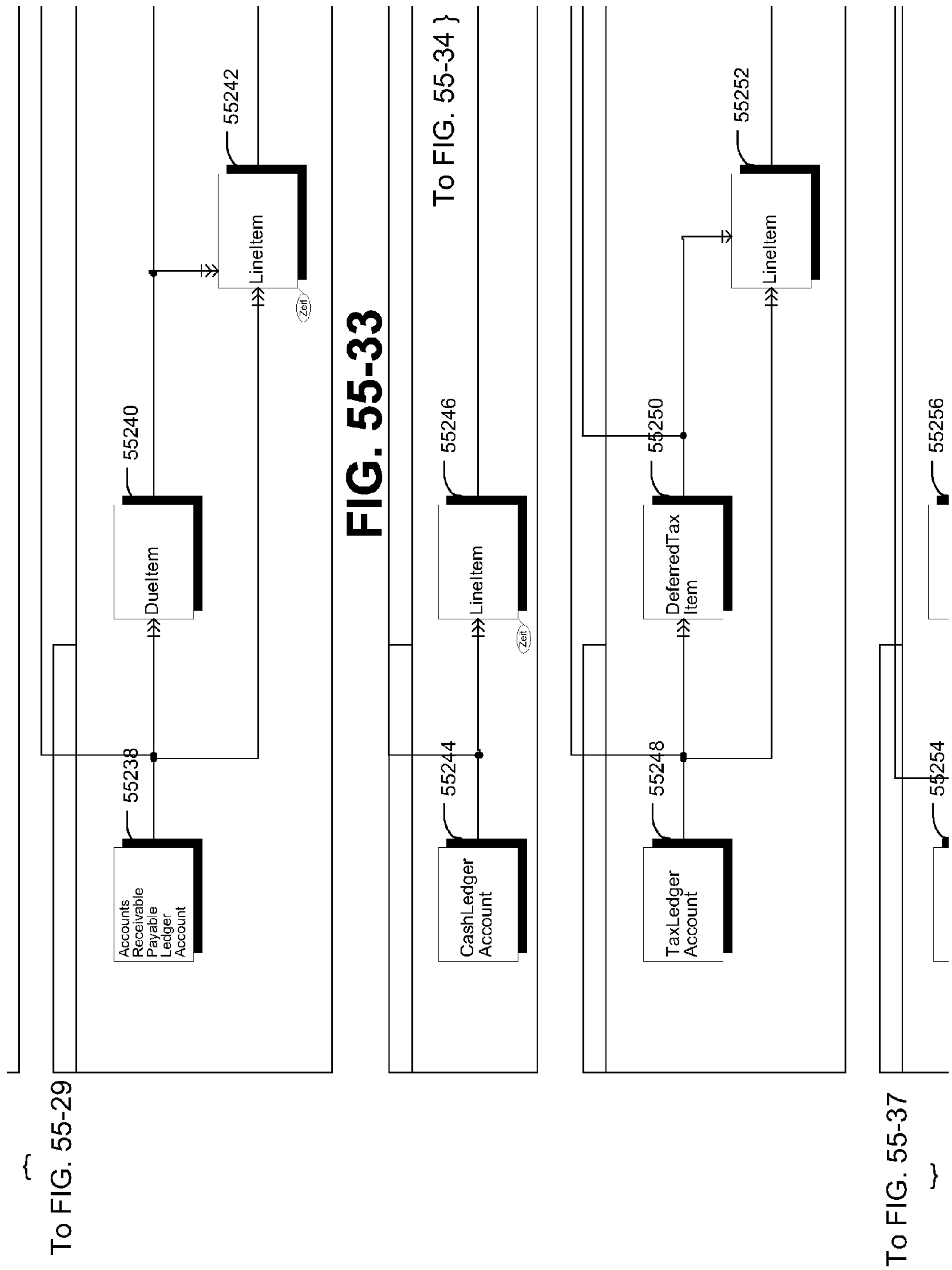
Figures 34, 55:
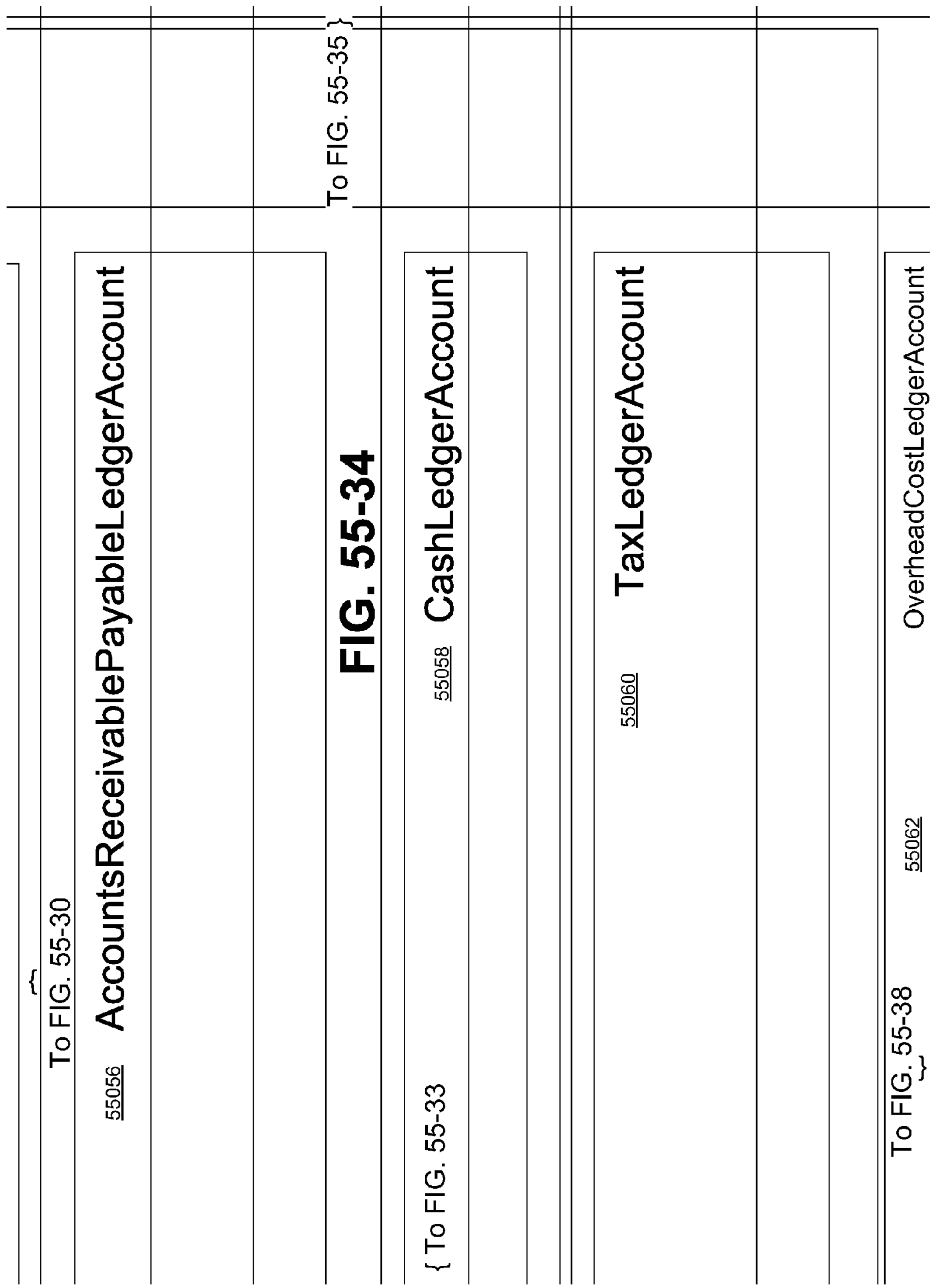

FIG. 32-A illustrates various DateTimePeriods. A DateTimePeriod is a period that is defined by two points in time. These points in time may be expressed by accurate-to-the-second time stamps together with calendar days. The date time period may be determined by a start time and an end time; a start time with a duration or a duration with an end time. It may not be specified whether the interval includes or excludes the given time-points. In certain implementations, the GDTs UPPEROPEN_TIMEZONEINDEPENDENT_DateTimePeriod (described below), UPPEROPEN_GLOBAL_DateTimePeriod (described below), UPPEROPEN_LOCAL_DateTimePeriod (described below) and UPPEROPEN_LOCALOFFSET_DateTimePeriod (described below) can be used instead. An example of DateTimePeriod is:

<ContractValidityPeriod>
<StartDateTime>2003-03-01T12:00:00</StartDateTime>
<EndDateTime>2005-06-15T12:00:00</EndDateTime>
</ContractValidityPeriod>

Another example of DateTimePeriod is:

<ContractValidityPeriod>

<StartDateTime>2003-03-01T12:00:00</StartDateTime>

<Duration>P1D</Duration>

</ContractValidityPeriod>

In certain implementations, DateTimePeriod may have the following structure:

| GDT | | Cat. | Object Class | Property | Represen-tation/As-sociation | Type | Type Name | Card. |
|---|---|---|---|---|---|---|---|---|
| DateTimePeriod | | | Date Time Period | Details | | | | |
| | StartDateTime | E | Date Time Period | Start Date Time | Date Time | GDT | DateTime | 0..1 |
| | EndDateTime | E | Date Time Period | End Date Time | Date Time | GDT | DateTime | 0..1 |
| | Duration | E | Date Time Period | Duration | Duration | GDT | Duration | 0..1 |

DateTimePeriod is an aggregation and may include the following sub-elements: StartDateTime, EndDateTime and Duration (e.g., <Duration>P1H7M9T12H10M13.3S</Duration>).

The sub-elements in Period may be sent to optional. Furthermore, the representation can include one of the following data sets: StartDateTime and EndDateTime, StartDateTime and Duration and EndDateTime and Duration.

The time stamp (EndDateTime) may be larger than or equal to the start time stamp (StartDateTime) (both accurate to the second). An example of time stamp is:

<StartDateTime>2003-03-01T12:00:00</StartDateTime>

<EndDateTime>2005-06-15T18:30:00</EndDateTime>

Another example of time stamp is:

<StartDateTime>2003-03-01T12:00:00<StartDateTime>

<EndDateTime>2005-03-01T12:00:00</EndDateTime>

Period can be used to specify a time period that can be expressed by means of two time stamps (both accurate to the second) or one accurate-to-the-second time stamp and one relative duration. This period might be the validity of a contract, which is expressed by a start and end time. In the case of a business transaction, DateTimePeriod may arise in a specific business role. In the element name, these roles may be placed in front of the term Period, whereby additional context-specific qualifiers could also be added. For example, PlannedArrivalPeriod is a period of a planned arrival.

The term DateTime in Object Class Term can be obsolete in GDTs. Therefore, this term may only comprise Period. This is because the term DateTime can be given by the sub-elements using Property Term. As a result, the semantic of these GDTs can be unique.

UPPEROPEN_GLOBAL_DateTimePeriod

A GDT UPPEROPEN_GLOBAL_DateTimePeriod is a period that is defined by two points in time. These points in time can be expressed by GLOBAL_DateTime. The GDT UPPEROPEN_GLOBAL_DateTimePeriod can include the start time-point and may exclude the end time-point. An example of GDT UPPEROPEN_GLOBAL-DateTimePeriod is:

<OpeningPeriod>

<StartDateTime>2005-10-18T06:00:00Z</StartDateTime>

<EndDateTime>2005-10-18T16:00:00Z</EndDateTime>

</OpeningPeriod>

In certain implementations, the GDT UPPEROPEN_GLOBAL DateTimePeriod may have the following structure:

| GDT | | Cat. | Object Class | Property | Represen-tation/As-sociation | Type | Type Name | Card. |
|---|---|---|---|---|---|---|---|---|
| UPPEROPEN_GLOBAL_DateTimePeriod | | | UPPEROPEN_GLOBAL_Date Time Period | Details | | | | |
| | StartDateTime | E | Date Time Period | Start Date Time | Date Time | GDT | GLOBAL_DateTime | 0..1 |
| | EndDateTime | E | Date Time Period | End Date Time | Date Time | GDT | GLOBAL_DateTime | 0..1 |

The term "DateTime" in the "Object Class Term" of the Global Data Type may be redundant. Therefore, in certain implementations, it typically can consist of the term "Period." This is because the term "DateTime" is given by the "Property Term" of the sub-elements. As a result, the semantic of this GDT may be unique.

The GDT UPPEROPEN_GLOBAL_DateTimePeriod may be a restriction on GDT DateTimePeriod. The GDT UPPEROPEN_GLOBAL_DateTimePeriod can include the variable "UPPEROPEN_GLOBAL_", which can be replaced by one (or more) qualifiers.

UPPEROPEN_LOCAL_DateTimePeriod

A GDT UPPEROPEN_LOCAL_DateTimePeriod is a period that is defined by two points in time. These points in time can be expressed by LOCAL_DateTime. The GDT UPPEROPEN_LOCAL_DateTimePeriod can include the start time-point and may exclude the end time-point. An example of GDT UPPEROPEN_LOCAL_DateTimePeriod is:

<OpeningPeriod>

<StartDateTime timeZoneCode="CET" daylightSavingTimeIndicator="true">2005-10-18T08:00:00</StartDateTime>

<EndDateTime timeZoneCode="CET" daylightSavingTimeIndicator="true">2005-10-18T18:00:00</EndDateTime>

</OpeningPeriod>

In certain implementations, Restricted GDT UPPEROPEN_LOCAL_DateTimePeriod may have the following structure:

| GDT | | Cat. | Object Class | Property | Representation/Association | Type | Type Name | Card. |
|---|---|---|---|---|---|---|---|---|
| UPPEROPEN_LOCAL_DateTimePeriod | | | UPPEROPEN_LOCAL_Date Time Period | Details | | | | |
| | StartDateTime | E | Date Time Period | Start Date Time | Date Time | GDT | LOCAL_Date Time | 0..1 |
| | EndDateTime | E | Date Time Period | End Date Time | Date Time | GDT | LOCAL_Date Time | 0..1 |

The GDT UPPEROPEN_LOCAL_DateTimePeriod may be a restriction on GDT DateTimePeriod. GDT UPPEROPEN_LOCAL_DateTimePeriod contains the variable "UPPEROPEN_LOCAL_", which can be replaced by one (or more) qualifiers. For GDT UPPEROPEN_LOCAL_DateTimePeriod, the time zone of start and end time-point may be different.

UPPEROPEN_LOCALNORMALISED_DateTimePeriod

A GDT UPPEROPEN_LOCALNORMALISED_DateTimePeriod is a period that is defined by two points in time. These points in time can be expressed by LOCALNORMALISED_DateTime. UPPEROPEN_LOCALNORMALISED_DateTimePeriod can include the start time-point, and may exclude the end time-point. An example of Restricted GDT UPPEROPEN_LOCALNORMALISED_DateTimePeriod is:

<ValidityPeriod>

<StartDateTime timeZoneCode="CET">2005-10-18T08:00:00Z</StartDateTime>

<EndDateTime timeZoneCode="CET">2005-10-18T18:00:00Z</EndDateTime>

</ValidityPeriod>

In certain implementations, the GDT UPPEROPEN_LOCALNORMALISED_DateTimePeriod may have the following structure:

| GDT | | Cat. | Object Class | Property | Representation/Association | Type | Type Name | Card. |
|---|---|---|---|---|---|---|---|---|
| UPPEROPEN_TIMEZONEINDEPENDENT_DateTimePeriod | | | UPPEROPEN_TIMEZONEINDEPENDENT_Date Time Period | Details | | | | |
| | StartDateTime | E | Date Time Period | Start Date Time | Date Time | GDT | TIMEZOONEINDEPENEND_DateTime | 0..1 |
| | EndDateTime | E | Date Time Period | End Date Time | Date Time | GDT | TIMEZOONEINDEPENEND_DateTime | 0..1 |

The term "DateTime" in the "Object Class Term" of the Global Data Type may be redundant. Therefore, it typically includes the term "Period". This is because the term "DateTime" may be given by the "Property Term" of the sub-elements. As a result, the semantic of this GDT may be unique.

The GDT UPPEROPEN_LOCALNORMALISED_DateTimePeriod may be a restriction on GDT DateTimePeriod. The GDT UPPEROPEN_LOCALNORMALISED_DateTimePeriod may include the variable "UPPEROPEN_LOCALNORMALISED_", which may get replaced by one (or more) qualifiers.

UPPEROPEN_LOCALOFFSET_DateTimePeriod

A GDT UPPEROPEN_LOCALOFFSET_DateTimePeriod is a period that is defined by two points in time. These points in time can be expressed by LOCALOFFSET_DateTime. UPPEROPEN_LOCALOFFSET_DateTimePeriod can include the start time-point and excludes the end time-point. An example of GDT UPPEROPEN_LOCALOFFSET_DateTimePeriod is:

<OpeningPeriod>

<StartDateTime>2005-10-18T08:00:00+02:00</StartDateTime>

<EndDateTime>2005-10-18T18:00:00+02:00</EndDateTime>

</OpeningPeriod>

In certain implementations, the GDT UPPEROPEN_LOCALOFFSET_DateTimePeriod may have the following structure:

The term "DateTime" in the "Object Class Term" of the Global Data Type may be redundant. Therefore, it typically includes the term "Period". This is because the term "DateTime" may be given by the "Property Term" of the sub-elements. As a result, the semantic of this GDT may be unique.

| GDT | | Cat. | Object Class | Property | Representation/Association | Type | Type Name | Card. |
|---|---|---|---|---|---|---|---|---|
| UPPEROPEN_LOCAL-OFFSET_DateTimePeriod | | | UPPEROPEN_LOCAL-OFFSET_Date Time Period | Details | | | | |
| | StartDateTime | E | Date Time Period | Start Date Time | Date Time | GDT | LOCALOFFSET_DateTime | 0..1 |
| | EndDateTime | E | Date Time Period | End Date Time | Date Time | GDT | LOCALOFFSET_DateTime | 0..1 |

The term "DataTime" in the "Object Class Term" of the Global Data Type may be redundant. Therefore, it typically includes the term "Period." This is because the term "DateTime" may be given by the "Property Term" of the sub-elements. As a result, the semantic of this GDT may be unique.

The GDT UPPEROPEN_LOCALOFFSET_DateTimePeriod may be a restriction on GDT DateTimePeriod. GDT UPPEROPEN_LOCALOFFSET_DateTimePeriod includes the variable "UPPEROPEN_LOCALOFFSET", which can be replaced by one (or more) qualifiers.

UPPEROPEN_TIMEZONEINDEPENDENT_ DateTimePeriod

A GDT UPPEROPEN_TIMEZONEINDEPENDENT_DateTimePeriod is a period that is defined by two points in time. These points in time may be expressed by TIMEZONEINDEPENDENT_DateTime. The GDT UPPEROPEN_TIMEZONEINDEPENDENT_DateTimePeriod can include the start time-point and excludes the end time-point. An example of GDT UPPEROPEN_TIMEZONEINDEPENDENT_DateTimePeriod is:

<PollingstationOpeningPeriod>

<StartDateTime>2005-10-18T08:00:00</StartDateTime>

<EndDateTime>2005-10-18T18:00:00</EndDateTime>

</PollingstationOpeningPeriod>

In certain implementations, the GDT UPPEROPEN_TIMEZONEINDEPENDENT_DateTimePeriod may have the following structure:

The GDT UPPEROPEN_TIMEZONEINDEPENDENT_DateTimePeriod may be a restriction on GDT DateTimePeriod. GDT UPPEROPEN_TIMEZONEINDEPENDENT_DateTimePeriod can include the variable "UPPEROPEN_TIMEZONEINDEPENDENT_," which can be replaced by one (or more) qualifiers.

In certain implementations, allowed qualifiers of DateTimePeriod are roles defined at PeriodRoleCode (i.e., ActivePeriod).

DecimalValue

A DecimalValue is a numeric value represented as a decimal. An example of DecimalValue is:

<PropertyValue>

. . .

<DecimalValue>3.14159</DecimalValue>

. . .

</PropertyValue>

In certain implementations, DecimalValue may have the following structure:

| GDT | Rep./Ass. Qualifier. | Representation/ Association | Type | Type Name |
|---|---|---|---|---|
| DecimalValue | Decimal | Value | xsd | decimal |

DecimalValue is a qualified basic GDT that is based on the secondary representation term Value of the CDT Numeric.

DecimalValue may be used if the reference to the decimal representation of the element based on DecimalValue is both meaningful and desired from a semantic perspective. This is the case with mathematical/scientific and technical numeric

| GDT | | Cat. | Object Class | Property | Representation/Association | Type | Type Name | Card. |
|---|---|---|---|---|---|---|---|---|
| UPPEROPEN_TIME-ZONEINDEPEN-DENT_DateTime-Period | | | UPPEROPEN_TIME-ZONEINDEPEN-DENT_Date Time Period | Details | | | | |
| | Start-DateTime | E | Date Time Period | Start Date Time | Date Time | GDT | TIMEZOONE-INDEPENEND_DateTime | 0..1 |
| | End-DateTime | E | Date Time Period | End Date Time | Date Time | GDT | TIMEZOONE-INDEPENEND_DateTime | 0..1 |

values. The Decimal qualifier then forms part of the relevant element name. Numeric business values may not be defined using their decimal representation; rather, this representation may be derived implicitly from the semantics of the numeric value (e.g., Price or ExchangeRate). In this case, DecimalValue is not used.

DebitCreditCode

The DebitCreditCode is the coded representation of the credit or debit side of an account. An example of DebitCreditCode is:

<DebitCreditCode>1</DebitCreditCode>

In certain implementations, DebitCreditCode may have the following structure:

| GDT | Object Class | Representation/Association | Type | Type Name | Len. | Remarks |
|---|---|---|---|---|---|---|
| DebitCreditCode | Debit Credit | Code | CDT | Code | 1 | Restricted |

The DebitCreditCode is a code list.

The DebitCreditCode may be used for a G/L account posting, for example, to denote whether an amount is posted to the G/L account as a credit or a debit posting.

The code list and its values may include: Debit (i.e., something relating to the debit side of an account), and Credit (i.e., something relating to the credit side of an account).

DefectClassCode

A DefectClassCode is the coded representation of a defect class. Defects are divided up into defect classes based on the valuation of the consequences of the defects. The American Society for Quality (ASQ) defines a defect as follows: "A product's or service's non-fulfillment of an intended requirement or reasonable expectation for use, including safety considerations."In accordance with ISO 2859, defects can be divided up into three main classes—"critical defect," "major defect," and "minor defect"—based on the seriousness of their consequences. An example of DefectClassCode is:

<DefectClass>1</DefectClass>

In certain implementations, DefectClassCode may have the following structure:

An extendable code list can be assigned to the code. Customers may replace lists with their own.

A listID can be assigned by the Coaching Team. If the code list is unchanged, a listAgencyID can be "310." Otherwise, a listAgencyID can be the ID of the customer (e.g., ID from DE 3055, if listed there). A listVersionID can be the version of the particular code list (e.g., assigned and managed by the customer). A listAgencySchemeID can be the ID of the scheme if the listAgencyID does not come from DE 3055. The listAgencySchemeAgencyID can be the ID of the organization from DE 3055 that manages the listAgencySchemeID scheme.

If a defect is recorded, for example, in the context of a finding for a material inspection, then this defect can be assigned to a suitable defect class based on its possible consequences.

Examples of DefectClassCode customer-specific code semantics are: Major Defect A (i.e., The item is completely inoperative or its handling is severely impaired), Major defect B (i.e., The item is partially inoperative or its handling is significantly impaired). In the system that runs the QIE, DefectClassCode may be represented by the following dictionary objects: Data element (e.g., QIE_TV_FIND_CLASS), Domain (e.g., QIE_FIND_CLASS).

For GDT DefectClassCode, the code list and its values may include: Critical Defect (i.e., a defect that makes an item unusable, jeopardizes human health, safety, and the environment, or contravene legal requirements), Major Defect (i.e., a defect related to major problems with respect to intended normal or reasonably foreseeable use), Minor Defect (i.e., a defect that is related to minor problems with respect to intended normal or reasonably foreseeable use).

DefectWeightingClassCode

A DefectWeightingClassCode is the coded representation of the classification of defects that takes their weighting into account. The American Society for Quality (ASQ) defines a defect as follows: "A product's or service's non-fulfillment of an intended requirement or reasonable expectation for use, including safety considerations." The weighting can, for example, be related to the justifiable inspection effort needed to prove that a requirement has been fulfilled, or to the effects of not fulfilling a requirement in production. An example of DefectWeightingClassCode is:

<DefectWeightingClassCode>HIGH_EFFORT</DefectWeightingClassCode>

In certain implementations, DefectWeightingClassCode may have the following structure:

| GDT | | Cat. | Object Class | Property | Representation/Association | Type | Type Name | Len. | Card. | Remarks |
|---|---|---|---|---|---|---|---|---|---|---|
| DefectClassCode | | | Defect Class | | Code | CDT | Code | 1..40 | | Restricted |
| | listID | A | CodeList | Identification | Identifier | xsd | token | | 0..1 | |
| | listAgencyID | A | Code List Agency | Identification | Identifier | xsd | token | | 0..1 | |
| | listVersionID | A | Code List | Version type | Identifier | xsd | token | | 0..1 | |
| | listAgency-SchemeID | A | Code List Agency | Scheme | Identifier | xsd | token | | 0..1 | |
| | listAgency-SchemeAgencyID | A | Code List Agency | Scheme Agency | Identifier | xsd | token | | 0..1 | |

| GDT | | Cat. | Object Class | Property | Represen-tation/As-sociation | Type | Type Name | Len. | Card. | Remarks |
|---|---|---|---|---|---|---|---|---|---|---|
| DefectWeighting-ClassCode | | | Defect Weighting Class | | Code | CDT | Code | 1..40 | | Restricted |
| | listID | A | CodeList | Identifi-cation | Identifier | xsd | token | | 0..1 | |
| | listAgencyID | A | Code List Agency | Identifi-cation | Identifier | xsd | token | | 0..1 | |
| | listVersionID | A | Code List | Version | Identifier | xsd | token | | 0..1 | |
| | listAgency-SchemeID | A | Code List Agency | Scheme | Identifier | xsd | token | | 0..1 | |
| | listAgency-SchemeAgencyID | A | Code List Agency | Scheme Agency | Identifier | xsd | token | | 0..1 | |

A customer-specific code list is assigned to the code. A customer can define the codes in the code list.

A listID can be assigned by the Coaching Team. A listAgencyID can be the ID of the customer (e.g., ID from DE 3055, if listed there). A listVersionID can be the version of the particular code list (e.g., assigned and managed by the customer). A listAgencySchemeID can be the ID of the scheme if the listAgencyID does not come from DE 3055. The listAgencySchemeAgencyID can be the ID of the organization from DE 3055 that manages the listAgencySchemeID scheme.

A defect can, for example, be valuated based on the associated inspection effort. The attributes may be assigned the following values: High (i.e., a large amount of inspection effort is needed to prove that a requirement has been fulfilled), Normal (i.e., a normal amount of inspection effort is needed to prove that a requirement has been fulfilled), Low (i.e., a small amount of inspection effort is needed to prove that a requirement has been fulfilled).

In the system that runs the QIE, DefectWeightingClassCode may be represented by the following dictionary objects: Data element (e.g., QIE_TV_FIND_VALUATION), Domain (e.g, QIE_FIND_VALUATION).

DeliveryCompletionMethodCode

A GDT DeliveryCompletionMethodCode is the coded representation of the method used for completing a delivery. Delivery may be a composition of goods that may be provided for shipping by a vendor or that may be received by a product recipient. An example of DeliveryCompletionMethodCode is:

<DeliveryCompletionMethodCode>1</DeliveryCompletionMethodCode>

In certain implementations, DeliveryCompletionMethodCode may have the following structure:

The DeliveryCompletionMethodCode may assign one static code list to the code. The attributes may be assigned the following values: listID="10457" and listAgencyID="310"

The DeliveryCompletionMethod Code may be used to specify the point in the process as well as the method for finalizing a delivery, i.e., when executing an outbound process. DeliveryCompletionMethodCode may specify for site logistics lot, the operation in which the relevant outbound delivery shall be finalized. In addition, it can indicate if the outbound delivery shall be completed manually by the user or automatically when the operation is confirmed.

The DeliveryCompletionMethodCode may use the following codes: Manual (i.e., delivery is completed manually), Operation Confirmation (i.e., delivery is completed automatically when the logistics operation is confirmed).

DeliveryCreationMethodCode

A DeliveryCreationMethodCode is the coded representation of the method used for creating a delivery. Delivery is a composition of goods that is provided for shipping by a vendor or that is received by a product recipient. An example of DeliveryCreationMethodCode is:

<DeliveryCreationMethodCode>1</DeliveryCreationMethodCode>

In certain implementations, DeliveryCreationMethodCode may have the following structure:

| GDT | Cat. | Object Class | Property | Represen-tation/As-sociation | Type | Type Name | Len. | Card. | Remarks |
|---|---|---|---|---|---|---|---|---|---|
| DeliveryCompletionMethodCode | | Delivery Completion Method | | Code | CDT | Code | 1 | | restricted |

| GDT | Cat. | Object Class | Property | Represen-tation/As-sociation | Type | Type Name | Len. | Card. | Remarks |
|---|---|---|---|---|---|---|---|---|---|
| Delivery-Creation-MethodCode | | Delivery Creation Method | | Code | CDT | Code | 1 | | restricted |

The DeliveryCreationMethodCode may assign one static code list to the code. The attributes may be assigned the following values: listID="10456," listAgencyID="310" and listVersionID can be a version of the particular code list which can be assigned and managed by customer.

The DeliveryCreationMethodCode is used to specify the point in the process as well as the method for creating a delivery. For example, when executing an outbound process, DeliveryCreationMethodCode may specify for site logistics lot, the operation in which an outbound delivery shall be created. In addition DeliveryCreationMethodCode can indicate if the outbound delivery shall be created manually by the user or automatically when the operation is confirmed.

The DeliveryCreationMethodCode may use the following codes: Manual (i.e., the delivery is created manually), Operation Confirmation (i.e., the delivery is created automatically when a logistics operation is confirmed), Request release (i.e., the delivery is created automatically when a logistics request is released).

DeliveryScheduleTypeCode

The DeliveryScheduleTypeCode is a coded representation of the type of a delivery schedule. This type describes the (business) character of a delivery schedule and defines its fundamental properties. An example of DeliverySchedule-TypeCode is:

<DeliverySchedule>

<ID>4711</ID>

<TypeCode>2</TypeCode>

. . .

</DeliverySchedule>

In certain implementations, DeliveryScheduleTypeCode may have the following structure:

| GDT | Object Class | Property | Represen-tation/As-sociation | Type | Type Name | Len. |
|---|---|---|---|---|---|---|
| Delivery-Schedule-TypeCode | Delivery Schedule | Type | Code | CDT | Code | 1 |

The attributes may be implicitly given the following values: listID="10020," listAgencyID="310" and listVersionID="tbd."

The DeliveryScheduleTypeCode may be used within the scheduling-agreement-based release ordering to communicate the business character of a delivery schedule to a vendor. It may often be used in the automotive industry.

The DeliveryScheduleTypeCode may use the following codes: Delivery Schedule (i.e., delivery schedule for the short-, medium- and/or long-term area on the basis of daily, weekly and/or monthly time specifications), Just-in-time delivery schedule (i.e., delivery schedule for just-in-time deliveries on the basis of time specifications throughout the day, if necessary, in terms of minutes).

DeliveryTerms

DeliveryTerms are a collection of the conditions and agreements that apply when delivering the ordered goods and providing the necessary services and activities for this. An example of DeliveryTerms is:

<DeliveryTerms>

<DeliveryItemGroupID>123</DeliveryItemGroupID>

<DeliveryPriorityCode>1</DeliveryPriorityCode>

<Incoterms>

<ClassificationCode listID="Incoterms" listVersionID="2000" listAgencyID="4">FOB</ClassificationCode >

<TransferLocationName langCode="de">Hamburg Hafen</TransferLocationName>

</Incoterms>

<OrderCombinationAllowedIndicator>true </OrderCombinationAllowedIndicator>

<PartialDeliveryControlCode>1</PartialDeliveryControlCode>

<PartialDeliveryMaximumNumberValue>5</PartialDeliveryMaximumNumberValue>

<QuantityTolerance>

<OverPercent>33.0</OverPercent>

<UnderPercent>1.0</UnderPercent>

</QuantityTolerance>

<TimeTolerance>

<UpperLimitDuration>P2D</UpperLimitDuration>

<LowerLimitDuration>P2D</LowerLimitDuration>

</TimeTolerance>

<MaximumLeadTimeDuration>P2M5D </MaximumLeadTimeDuration>

<Description langCode="de">

This is a German description text.

</Description>

</DeliveryTerms>

In the previous example, listAgencyID="4" represents "ICC/WBO," PartialDeliveryControlCode="1" represents "Partial Delivery" (i.e., partial delivery allowed), UpperLimitDuration/LowerLimitDuration="P2D" representations a duration of 2 days (as described below by the GDT "Duration"), and MaximumLeadTimeDuration=P2M5D represents a duration of 2 months (as described below by the GDT "Duration").

In certain implementations, DeliveryTerms may have the following structure:

| GDT | | Cat. | Object Class | Property | Representation/Association | Type | Type Name | Len. | Card. |
|---|---|---|---|---|---|---|---|---|---|
| DeliveryTerms | | | Delivery Terms | | Details | | | | |
| | DeliveryItem-GroupID | E | Delivery Terms | Delivery_ Item Group Identification | Identifier | GDT | Business-Transaction-Document-ItemGroupID | | 0..1 |
| | DeliveryPriority-Code | E | Delivery Terms | Delivery_ Priority | Code | GDT | PriorityCode | | 0..1 |
| | Incoterms | E | Delivery Terms | Incoterms | Details | GDT | Incoterms | | 0..1 |
| | OrderCombination-AllowedIndicator | E | Delivery Terms | Order Combination_ Allowed | Indicator | CDT | Indicator | | 0..1 |
| | PartialDelivery-ControlCode | E | Delivery Terms | Partial Delivery Control | Code | GDT | PartialDelivery-ControlCode | | 0..1 |
| | PartialDelivery-MaximumNumberValue | E | Delivery Terms | Partial Delivery_ Maximum_ Number | Value | GDT | NumberValue | | 0..1 |
| | QuantityTolerance | E | Delivery Terms | Quantity Tolerance | Details | GDT | QuantityTolerance | | 0..1 |
| | TimeTolerance | E | Delivery Terms | Time Tolerance | Details | GDT | TimeTolerance | | 0..1 |
| | MaximumLead-TimeDuration | E | Delivery Terms | Maximum_ Lead Time | Duration | GDT | Duration | | 0..1 |
| | Description | E | Delivery Terms | Description | Text | GDT | Description | | 0..1 |

DeliveryTerms include detailed information on the agreed contract formulas for delivery conditions (in co-terms) and delivery modes (acceptance of order groupings, maximum accepted number of partial deliveries, delivery priority, grouping requirements of deliveries, tolerances regarding quantity and date deviations and maximum accepted runtime until delivery receipt as recorded in the contract). Additional information can also be specified in the form of free text. Certain frequent combinations of specifications can be defined in a simplified form using a coded representation PartialDeliveryControlCode (i.e., "One delivery only on desired date". See below.).

In certain implementations, GDT DeliverTerms may include the following details. DeliveryItemGroupID is an identifier of a group of items that have to be delivered together. DeliveryPriorityCode is the priority or urgency of the delivery/delivery item according to the requirements of the purchaser. Incoterms is the conventional contract formulations for the delivery terms. OrderCombinationAllowed-Indicator specifies whether a combination of several orders can be delivered together. PartialDeliveryControlCode is a coded representation for certain frequent combinations of specifications for controlling the delivery (for example, one delivery only on the desired date). PartialDeliveryMaximum-NumberValue is the maximum number of partial deliveries that can be carried out/may be carried out to deliver the ordered quantity. QuantityTolerance is the tolerated quantity difference between a requested and a delivered quantity. TimeTolerance is the tolerated time difference between the agreed delivery date and the actual delivery date. Maximum-LeadTimeDuration is the maximum lead time from the time the order is placed until the receipt of the delivery. This duration can be defined in the scope of shipment tendering or offers, or it can be negotiated in a scheduling agreement or in a sales order and then provides a binding contract for calculating the latest possible delivery receipt date for a given order date. Description is the natural language text for defining additional information.

The specification of each structural element is optional as DeliveryTerms are not usually renegotiated for each individual business transaction between the involved business partners. They can be derived from general business conditions or they can be determined from business partner-specific master data. The code list for the GDT PartialDelivery-ControlCode includes codes that, according to the GDT definition, can only be used in the scope of documents (e.g., 1, 2, 3) and codes to be used in the scope of master data (e.g., 4, 5, 6, 7). As the DeliveryTerms may not be used in the scope of master data, the list of used codes is limited to: 1 (i.e., partial delivery), 2 (i.e., one-time delivery on requested delivery date/time) and 3 (i.e., complete delivery).

In certain implementations, the GDT DeliveryTerms may use the following integrety conditions:

| Partial-Delivery-Control-Code - Value | Partial-Delivery Maximum Number | Quantity-Tolerance | Time-Tolerance | DeliveryItem-GroupID |
|---|---|---|---|---|
| 1 (partial delivery) | >1 | Random | random | random |
| 2 (one-time delivery on requested delivery date/time) | =1 | Random | Not allowed | No ID or one ID per business object |
| 3 (complete delivery) | =1 | Not allowed | Random | No ID or one ID per business object |

With the information in DeliveryTerms, the involved business partners (purchaser and seller) agree on the conditions regarding the delivery of the ordered products/goods in the form of sales orders, purchase orders, quotations, or contracts. They may determine and influence the flow of the subsequent logistic processes (i.e., they influence the selection of a logistic organizational unit for the delivery, and so on). DeliveryTerms can be valid for the complete document or for one single item.

DeliveryTypeCode

A DeliveryTypeCode is a coded representation of the type of a delivery. This type describes the (business) nature and basic features of the delivery for its logistical processing. An example of DeliveryTypeCode is:

<DeliveryTypeCode>0002</DeliveryTypeCode>

In certain implementations, DeliveryTypeCode may have the following structure:

| GDT | Object Class | Property | Represen-tation/As-sociation | Type | Type Name | Len. |
|---|---|---|---|---|---|---|
| DeliveryType-Code | Delivery | Type | Code | CDT | Code | 4 |

The DeliveryTypeCode is a codelist with the implicity given attributes: listID="10021," listAgencyID="310," and listVersionID="tbd."

The DeliveryTypeCode describes the features of the delivery that have an affect on its logistical processing; for example, on the type and quality of the packaging, the selection of the means of transport, and the handling of the goods in transit. The DeliveryTypeCode can be used for the ascertainment of goods for inbound and outbound deliveries. It can also be used to describe return deliveries.

If there is communication with R/3, the attributes of the DeliveryTypeCode can correspond to the R/3 delivery types. The GDT is defined with four digits in accordance with the LFART (CHAR4) field.

The DeliveryTypeCode may use the following codes: Delivery of new goods (i.e., delivery of new undamaged products or products in their original packaging with the relevant logistical handling), Delivery of damaged goods or new goods requiring repair (i.e., delivery of new but damaged products or products requiring repair with the relevant logistical handling), Delivery of used goods (i.e., delivery of used products with the relevant logistical handling), Delivery of scrap (i.e., delivery of products for scrapping with the relevant logistical handling).

DemandForecastRequirementProfileCode

A DemandForecastRequirementProfileCode is the coded representation of a profile for forecast requirements. A forecast requirement may be a requirement that exists as a direct result of a forecast. A profile for forecast requirements may be a grouping of configurable features that controls the creation and use (in planning) of forecast requirements. It can include: parameters that control whether the requirement is relevant to planning, parameters that control the consumption of requirements and parameters that control the scheduling and release of requirements. An example of DemandForecastRequirementProfileCode is:

<DemandForecastRequirementProfileCode>FINAS001 </DemandForecastRequirementProfileCode>

In certain implications, DemandForecastRequirementProfileCode may have the following structure:

| GDT | | Cat. | Object Class | Property | Represen-tation/As-sociation | Type | Type Name | Len. | Card. | Remarks |
|---|---|---|---|---|---|---|---|---|---|---|
| Demand-Forecast-Requirement ProfileCode | | | Demand Forecast Requirement Profile | | Code | CDT | Code | 1..8 | | restricted |
| | listAgencyID | A | Code List Agency | Identifica-tion | Identifier | xsd | token | | 0..1 | |
| | listVersionID | A | Code List | Version | Identifier | xsd | token | | 0..1 | |
| | listAgency-SchemeID | A | Code List Agency | Scheme | Identifier | xsd | token | | 0..1 | |
| | listAgency-SchemeAgencyID | A | Code List Agency | Scheme Agency | Identifier | xsd | token | | 0..1 | |

The DemandForecastRequirementProfileCode may assign a customer-specific code list. A customer defines the codes in the code list. The attribute may be assigned the following value: listID="10384."

A listAgencyID can be the ID of the customer (e.g., ID from DE 3055, if listed there). A listVersionID can be the version of the particular code list (e.g., assigned and managed by the customer). A listAgencySchemeID can be the ID of the scheme if the listAgencyID does not come from DE 3055. The listAgencySchemeAgencyID can be the ID of the organization from DE 3055 that manages the listAgencySchemeID scheme.

The profile for forecast requirements can control the relevance of forecast requirements for planning. It also can control the consumption and creation of forecast requirements. Examples of customer-specific code semantics can include: anonymous planning with consumption, (i.e., actual sales order consumes forecast requirements). The finished products can be produced without sales orders.

DemandPlanID

A DemandPlanID is a unique identifier for a Demand Plan. A Demand Plan may be a summary of quantitative forecasts of product requirements in a planning period that may be created according to the requirements at product, brand, or customer group level. An example of DemandPlanID is:

<DemandPlanID>PLN0001</DemandPlanID>

In certain implementations, DemandPlanID may have the following structure:

| GDT | Object Class | Property | Represen-tation/As-sociation | Type | Type Name | Len. | Re-marks |
|---|---|---|---|---|---|---|---|
| Demand-PlanID | Demand Plan | Identifi-cation | Identifier | CDT | Iden-tifier | 1...30 | Re-stricted |

DemandPlanningForecastVersionTypeCode

A DemandPlanningForecastVersionTypeCode is the coded representation of a demand planning forecast version type. A version may be a version of the sales forecast that is recorded separately and that is usually distinguished from the other versions in the forecast sales as well as from the other versions. The versions may be distinguished by the order in which they originated. A demand planning forecast may be a quantitative forecast of the product sales within a planning period that may be generated according to requirements at product, brand or customer group level. Planning functions may be used to calculate sales and demand quantities on the basis of a sales history, which can be refined in interactive planning. An example of DemandPlanningForecastVersionTypeCode is:

<DemandPlanningForecastVersionTypeCode>1 <DemandPlanningForecastVersion TypeCode>

In certain implementations, DemandPlanningForecastVersionTypeCode may have the following structure:

| GDT | Object Class | Property | Representation/Association | Type | Type Name | Len. | Remarks |
|---|---|---|---|---|---|---|---|
| Demand-Planning-Forecast-Version-TypeCode | Demand Planning Forecast Version | Type | Code | CDT | Code | 1..2 | Restricted |

The DemandPlanningForecastVersionTypeCode may assign a particular fixed code list to the code. The attributes may be assigned the following values: listID="10304" and listAgencyID=310."

The TypeCode may be used to distinguish the various version types in a demand planning forecast (e.g., working version or simulation version). Every version in a demand planning forecast may be assigned to a version type.

The DemandPlanningForecastVersionTypeCode may use the following codes: Working version (i.e., the version of the demand planning forecast currently being used) and Simulation version (i.e., the version of the demand history that can be used for simulations).

DemandPlanningFunctionTypeCode

A DemandPlanningFunctionTypeCode is the coded representation of a demand planning forecast function type. A demand planning function may be a mathematical function or a rule for calculating forecast sales quantities in demand planning. An example of DemandPlanningFunctionTypeCode is:

<DemandPlanningFunctionTypeCode>1</DemandPlanningFunctionTypeCode>

In certain implementations, DemandPlanningFunctionTypeCode may have the following structure:

| GDT | | Cat. | Object Class | Property | Representation/Association | Type | Type Name | Len. | Card. | Remarks |
|---|---|---|---|---|---|---|---|---|---|---|
| Demand-Planning-Function-TypeCode | | | Demand Planning Function | Type | Code | CDT | Code | 1..3 | | Restricted |
| | listID | A | Code List | Identification | Identifier | xsd | token | | 0..1 | |
| | listAgencyID | A | Code List Agency | Identification | Identifier | Xsd | Token | | 0..1 | |
| | listVersionID | A | Code List | Version | Identifier | Xsd | Token | | 0..1 | |
| | listAgency-SchemeID | A | Code List Agency | Scheme | Identifier | Xsd | Token | | 0..1 | |
| | listAgency-SchemeAgencyID | A | Code List Agency | Scheme Agency | Identifier | Xsd | Token | | 0..1 | |

The DemandPlanningFunctionTypeCode may assign a customer-specific code list. A customer defines the codes in the code list.

A listID can be "10278." A listAgencyID can be the ID of the customer (e.g., ID from DE 3055, if listed there). A listVersionID can be the version of the particular code list (e.g., assigned and managed by the customer). A listAgencySchemeID can be the ID of the scheme if the listAgencyID does not come from DE 3055. The listAgencySchemeAgencyID can be the ID of the organization from DE 3055 that manages the listAgencySchemeID scheme.

The DemandPlanningFunctionTypeCode specifies the type of the planning function that can be executed in demand planning to calculate forecast quantities. Examples of DemandPlanningFunctionTypeCode values may be: Forecast calculation with trend model, and forecast calculation with season model and distribution calculation.

DemandPlanPlanningLevelID

A DemandPlanPlanningLevelID is a unique identifier for a planning level in the demand plan. A Demand Plan may be a summary of quantitative forecasts of product requirements in a planning period that is created according to requirements at the product, brand, or customer group levels. A planning level is a view of requirements or demand data. In this view, data can be changed interactively or using planning functions. An example of DemandPlanPlanningLevelID is:

<DemandPlanPlanningLevelID>RELEASE_LVL</DemandPlanPlanningLevelID>

In certain implementations, DemandPlanPlanningLevelID may have the following structure:

| GDT | Object Class | Property | Representation/Association | Type | Type Name | Len. | Remarks |
|---|---|---|---|---|---|---|---|
| DemandPlan-Planning-LevelID | Demand Plan Planning Level | Identification | Identifier | CDT | Identifier | 1..30 | Restricted |

The DemandPlanPlanningLevelID may only be unique within the context of a Demand Plan.

DemandPlanPlanningLevelSelectionID

A DemandPlanPlanningLevelSelectionID is an identifier for a selection at demand plan planning level. A planning level may be a view of requirements or demand data. In this view, data can be changed interactively or using planning functions. A planning level selection may be a selection of plannable objects. An example of DemandPlanPlanningLevelSelectionID is:

<DemandPlanPlanningLevelSelectionID>PRDCTS_ SMITH</DemandPlanPlanningLevelSelectionID>

In certain implementations, DemandPlanPlanningLevelSelectionID may have the following structure:

| GDT | Object Class | Property | Representation/Association | Type | Type Name | Len. | Remarks |
|---|---|---|---|---|---|---|---|
| Demand-Plan-Planning-Level-Selection-ID | Demand Plan Planning Level | Identification | Identifier | CDT | Identifier | 1..30 | Restricted |

The DemandPlanPlanningLevelSelectionID may be only used within the context of a planning level.

DepreciationCalculationProcedureCode

A DepreciationCalculationProcedureCode is the coded representation of a procedure for calculating the depreciation of a fixed asset. A procedure for calculating the depreciation of a fixed asset may have between one and three calculation phases. Each of these calculation phases can be assigned to an individual calculation method. The fixed asset may go through each of the calculation phases during its life cycle.

SchemeID, listAgencySchemeAgencyID are missing from the structure because constant values were assigned to them during runtime. The attribute has been assigned the following value: listID="10497."

Examples of possible codes used in the DepreciationCalculationProcedureCode are: 110 (i.e., Building declining 10.0/5.0/2.5%), 200 (i.e., LVA 100% complete depreciation), 302 (i.e., Straight-line acquisition value pro rata from zero without interest).

In R/3 the FixedAssetImputedInterestCalculationMethodCode may be represented by the DDIC data element AFASL "depreciation key". The calculation methods are assigned in table T090NAZ.

Description

A Description is a representation of the properties of an object in natural language. An example of Description is:

<OrderDescription langCode="en">

A character string with a specified language.

</OrderDescription>

In certain implementations, Description may have the following structure:

| GDT | | Cat. | Object Class | Property | Representation/Association | Type | Type Name | Len. | Card. | Remarks |
|---|---|---|---|---|---|---|---|---|---|---|
| Description | | | Description | | Text | CDT | Text | | | Restricted |
| | languageCode | A | Description | Language Code | Code | CDT | LanguageCode | 2..9 | 0..1 | |

Whether the next phase is started depends on the calculation results (i.e., amount from declining-balance/straight-line calculation, the net book value of the fixed asset) and/or the time interval (i.e., within/beyond the normal business useful life) in which the fixed asset is. An example of DepreciationCalculationProcedureCode is:

<DepreciationCalculationProcedureCode>302</DepreciationCalculationProcedureCode>

In certain implementations, DepreciationCalculationProcedureCode may have the following structure:

| GDT | Object Class | Representation/Association | Type | Type Name | Len. | Remarks |
|---|---|---|---|---|---|---|
| Depreciation-Calculation-ProcedureCode | Depreciation Calculation Procedure | Code | CDT | Code | 1..8 | Restricted |

The DepreciationCalculationProcedureCode has a user-specific code list assigned to the code. A user of the code determines the codes in the code list during configuration. The attributes listID, listAgencyID, listVersionID, listAgency- Description may be based on the CDT text. Description may contain a "languageCode" attribute for determining the particular language of the element content.

Description can be used for the following types of values, for example, readable additional information for the structured information, and descriptions of products and services.

The character string of "Description" may not be defined and may therefore be system-dependent. Description should not be used to transfer the following values: proprietary control information, coded and mutually agreed values, extensive descriptions of values that could otherwise be represented as coded values or identifiers (i.e., could be used as a supplement, if necessary), and numerical values.

SHORT_Description

In certain implementations, the GDT Description may be of type SHORT_Description. An example of GDT SHORT_Description is:

<ProductDescription languageCode='EN' >Clock</ProductDescription>

In certain implementations, "Product" is a qualifier, which replaces SHORT_in a business entity (element names). Additionally, in certain implementations, the GDT SHORT_Description may have the following structure:

| GDT | | Cat. | Object Class Qualifier | Object Class | Property | Representation/Association | Type | Type Name | Len. | Card. |
|---|---|---|---|---|---|---|---|---|---|---|
| SHORT_Description | | | SHORT_ | Description | Type | | CDT | Text | 0..40 | |
| | language-Code | A | SHORT_ | Description | Language | Code | CDT | Language-Code | 2..9 | 0..1 |

SHORT_Description may be a restriction on GDT Description to specify a uniform length for short descriptions. SHORT_Description can include the variable "SHORT_", which can be replaced by one (or more) qualifiers.

MEDIUM_Description

In certain implementations, the GDT Description may be of type MEDIUM_Description. An example of GDT MEDIUM_Description is:

<ProductCategoryDescription languageCode='EN'>Competitor products</ProductCategoryDescription>

In certain implementations, "ProductCategory" is a qualifier, which replaces MEDIUM_in a business entity (element names). Additionally, in certain implementations, the GDT MEDIUM_Description may have the following structure:

| GDT | | Cat. | Object Class Qualifier | Object Class | Property | Represen-tation/As-sociation | Type | Type Name | Len. | Card. |
|---|---|---|---|---|---|---|---|---|---|---|
| MEDIUM_Description | | | MEDIUM_ | Description | Type | | CDT | Text | 0..80 | |
| | language-Code | A | MEDIUM_ | Description | Language | Code | CDT | Language-Code | 2..9 | 0..1 |

MEDIUM_Description may be a restriction on GDT Description to specify a uniform length for descriptions of medium length. MEDIUM_Description can include the variable "MEDIUM_", which gets replaced by one (or more) qualifiers.

LONG_Description

In certain implementations, the GDT Description may be of type LONG_Description. An example of GDT LONG_Description is:

<CountryDescription languageCode='EN'>As Europe's largest economy and . . . </CountryDescription>

In certain implementations, "Country" is a qualifier, which replaces LONG_in the business entity (element names). Additionally, in certain implementations, LONG_Description may have the following structure:

| GDT | | Cat. | Object Class Qualifier | Object Class | Property | Represen-tation/As-sociation | Type | Type Name | Len. | Card. |
|---|---|---|---|---|---|---|---|---|---|---|
| LONG_Description | | | LONG_ | Description | Type | | CDT | Text | 0..255 | |
| | language-Code | A | LONG_ | Description | Language | Code | CDT | Language-Code | 2..9 | 0..1 |

LONG_Description may be a restriction on GDT Description to specify a uniform length for long descriptions. LONG_Description can include the variable "LONG_", which gets replaced by one (or more) qualifiers.

REGIONDEPENDENTLANGUAGE_LONG_Description

In certain implementations, the GDT Description may be of type REGIONDEPENDENTLANGUAGE_LONG_Description. An example of GDT REGIONDEPENDENTLANGUAGE_LONG_Description is:

<CatalogueItemDescription languageCode="en-US"> Name of this catalog item in American English</CatalogueItemDescription>

In certain implementations, "Catalogue" is a qualifier, which replaces REGIONDEPENDENTLANGUAGE_LONG_ in a business entity (element name). Additionally, in certain implementations, GDT REGIONDEPENDENTLANGUAGE_LONG_Description may have the following structure:

| GDT | | Cat. | Object Class Qual. | Object Class | Property | Rep./Ass. | Type | Type Name | Len. | Card. |
|---|---|---|---|---|---|---|---|---|---|---|
| REGIONDEPENDENT-LANGUAGE_LONG_Description | | | REGIONDEPENDENT-LANGUAGE_LONG_ | Description | Type | | CDT | Text | 0..255 | |
| | language-Code | A | REGIONDEPENDENT-LANGUAGE_LONG_ | Description | Language | Code | CDT | REGIONDE-PENDENT_LanguageCode | 2..9 | 0..1 |

The _REGIONDEPENDENTLANGUAGE_LONG_Description is region dependent, so the "restricted" GDT REGIONDEPENDENT_LanguageCode is used as type for the attribute languageCode.

In certain implementations, for language, but not country or region, dependent long descriptions such as the GDT LONG_Name can be used. The GDT LONG_Name uses the "unrestricted" GDT LanguageCode for the attribute languagecode to specify the language.

In certain implementations, REGIONDEPENDENTLANGUAGE_LONG_Description may include the following qualifiers:

| Qualified GDT Description | Type | Definition |
|---|---|---|
| ActivityDescription | MEDIUM_Description | Description of an activity. An activity can be an interaction undertaken by employees on behalf of their company. An activity may contain information about the business partner involved and the date on which it takes place. An activity can, but does not have to be, private in nature. |
| AuthorisationResultDescription | SHORT_Description | Description of the result of a payment card authorisation |
| BillOfMaterialDescription | MEDIUM_Description | Description of a Bill Of Material is a natural-language representation of the properties of a bill of material. A Bill of Material can be a complete and structured list that contains variants, items, documents, and natural-language texts that are used to define and describe the composition of a material. |
| BillOfMaterialItemGroupDescription | MEDIUM_Description | Description of a bill of material item group is a natural-language representation of the properties of a bill of material item group. A BillOfMaterialItemGroup can be a group of items whose assigned components have or describe the same function or can be handled in the same way during the design phase or production process. |
| BillOfMaterialItemGroupItem-ChangeStateDescription | MEDIUM_Description | Description of the change state of a group item of a bill of material item is a natural-language representation of the properties of a bill of material item change state. ItemGroupItemChangeState can be a change state of the attributes of a bill of material item that can be created or changed with reference to an EngineeringChangeOrder. |
| BillOfMaterialVariantDescription | MEDIUM_Description | Description of a bill of material variant is a natural-language representation of the properties of a bill of material variant. A bill of material variant can be a specification of a bill of material that describes a change in the basic form, composition, and properties of a material that occurs when certain components are used, omitted, or added. |
| BusinessPurposeDescription | MEDIUM_Description | Description of a business purpose. |
| CatalogueApprovalReasonDescription | LONG_Description | A description of the reason why a catalog, or parts of it, was approved or rejected. |
| CatalogueItemDescription | LONG_Description | Description of a catalog item. A catalog item can specify information about an object included and classified within the catalog according to the catalog's schema(s) |
| ChartOfAccountsItemDescription | MEDIUM_Description | Description of an item in the chart of accounts. A chart of accounts item can group together assets, payables, stockholders' equity, revenues, or expenses and can be used to enter and represent for accounting purposes any changes to these values resulting from business transactions. |

-continued

| Qualified GDT Description | Type | Definition |
|---|---|---|
| CustomerProblemAndSolutionDescription | MEDIUM_Description | Description of a CustomerProblemAndSolution. A CustomerProblemAndSolution can be a collection consisting of one or several problems that are reported by a customer, and one or several solutions that are provided by one or more experts. |
| EngineeringChangeOrderChangeGroupDescription | SHORT_Description | Description for a change group of an engineering change order. A change group can group and manage the concrete changes to objects that are to be carried out using an engineering change order. |
| EngineeringChangeOrderDescription | SHORT_Description | Description of an engineering change order. An engineering change order can be a set of instructions to make changes to a number of objects from the areas of engineering or production. It can define the conditions under which these changes become effective and specifies the release status of these changes. |
| ExceptionDescription | LONG_Description | Description of an exception in a business sense. |
| FormattedPhoneNumberDescription | SHORT_Decription | FormattedPhoneNumberText is the formatted representation of a phone number in text. |
| InstallationPointDescription | SHORT_Decription | An InstallationPointDescription is a representation of the properties of an InstallationPoint in natural language. An installation point can be the physical or logical location at which a business object, for example a material or software, is installed during a certain period of time. An installation point can have a multilevel structure. |
| InstalledBaseDescription | SHORT_Decription | An InstalledBaseDescription is a representation of the properties of an InstalledBase in natural language. An installed base can be a functionally-structured arrangement of business objects at a logical or physical location. |
| LiquidityItemDescription | MEDIUM_Description | Description for a liquidity item (increase or decrease of liquidity). Comment: Liquidity items can be realized or expected cash flows of a company on which one or more (aggregation) operational business processes are based. |
| LocationDescription | SHORT_Description | Description for a Location. |
| LogisticsAreaDescription | SHORT_Description | Description of a logistics area A LogisticsArea can be an area with physical and operational features of locations in a company, used for storage and production, and groups these locations based on their logistical functions. |
| LogisticsBranchingDescription | MEDIUM_Description | Description of a branching in logistics Logistics branching can be used as a means to structure a process description in logistics by splitting a process into several paths. The process path can describe a direct material flow in logistics. In additon to a common starting point, the branched process paths can also have a common end point at which they join together |

-continued

| Qualified GDT Description | Type | Definition |
|---|---|---|
| LogisticstBranchingJoinDescription | MEDIUM_Description | Description of a branching join in logistics<br>A branching join can specify a point at which the branched paths of a logistics branching meet.<br>A logistics branching can be used as a means to structure a process description in logistics by splitting a process into several paths. The process path can describe a direct material flow in logistics. In additon to a common starting point, the branched process paths also have a common end point at which they join together. |
| LogisticsBranchingPathDescription | MEDIUM_Description | Description of a branching path in logistics<br>Branching path can specify a sequence of operations that defines a course of action in a logistics process. Logistics branching can be used as a means to structure a process description in logistics by splitting a process into several paths. The process path can describe a direct material flow in logistics. In additon to a common starting point, the branched process paths can also have a common end point at which they join together. |
| LogisticsTaskDescription | SHORT_Description | Description of a logistics task.<br>A logistics task can be a task at a defined step in a production or site logistics process to be completed by a processor at a certain time. |
| LogisticsTaskFolderDescription | MEDIUM_Description | Description of a logistics task folder.<br>A logistics task folder can be a folder for storing and grouping of logistics tasks according to business criteria. It can determine the business assignment criteria that a logistics task may meet to be stored in a specific folder and can include details about the processors that are registered at the folder. |
| LogisticUnitDescription | SHORT_Description | Description of a logistic unit<br>A logistic unit can be an item established for logistics operations, such as storage, movement, and packing. A logistic unit can represent all physical units handled in the same manner during logistic operations, whether they are packed or unpacked goods. Examples are high pallet, and liter milk carton. |
| LogisticUnitGroupDescription | SHORT_Description | Description of a logistic unit group<br>A logistic unit group can specify for a logistic unit usage a classification to which logistic units are assigned. The logistic units that are assigned to a logistic unit group have similar attributes relevant for the purposes of the logistic unit usage.<br>A logistic unit usage can be a logistics purpose for which logistic units are grouped. The logistic unit usage can represent a process or an activity, such as conveying, packing, or storing.<br>A logistic unit can be an item established for logistics operations, such as storage, movement, and packing. A logistic unit can represent all physical units handled in the same manner during logistic operations, whether they are packed or unpacked goods. Examples are high pallet, and liter milk carton. |

-continued

| Qualified GDT Description | Type | Definition |
|---|---|---|
| LogisticUnitUsageDescription | SHORT_Description | Description of a logistic unit usage A logistic unit usage can be a logistics purpose for which logistic units are grouped. The logistic unit usage can represent a process or an activity, such as conveying, packing, or storing. A logistic unit can be an item established for logistics operations, such as storage, movement, and packing. A logistic unit can represent all physical units handled in the same manner during logistic operations, whether they are packed or unpacked goods. Examples are high pallet, and liter milk carton. |
| MassDataRunObjectDescription | LONG_Description | Description of a Mass Data Run Object. A Mass Data Run Object is a Business Object especially designed for mass data processing purposes that follows a special structure. Mass Data Run Objects can be scheduled in the background and can use the Framework for Parallel Processing to obtain transactional control and the possibility for parallel service calls. |
| NormalisedPhoneNumberDescription | SHORT_Description | NormalisedPhoneNumberDescription is the normalized representation of a telephone number. |
| OperationDescription | MEDIUM_Description | Description of an operation Operation can specify a course of action to be carried out by a resource or group of resources. |
| PackingBillOfMaterialContentItemDescription | SHORT_Description | Description of a ContentItem of a PackingBillOfMaterial A PackingBillOfMaterialContentItem can be a certain quantity of content to be packed. The content can be either a material or a logistic unit |
| PackingBillOfMaterialDescription | SHORT_Description | Description of a PackingBillOfMaterial A PackingBillOfMaterial can be a complete, structured list of the components that are used in a packing operation. The PackingBillOfMaterial can refer to a LogisticUnit (LU) on which the output of a packing operation is based. |
| PaymentCardDescription | SHORT_Description | Description of a payment card A payment card can be an issued identification card that authorizes the holder to pay an invoice without cash at a merchant. |
| PaymentTransactionDescription | MEDIUM_Description | Description of a payment transaction |
| PhysicalInventoryCountDescription | MEDIUM_Description | Description of a Physical Inventory Count. A PhysicalInventoryCount can be the instruction on how to execute a physical inventory of materials and packages and its approval. It may also contain the results of the physical inventory and any differences between this physical inventory and the book inventory. |
| ProcessorDescription | SHORT_Description | Description of a processor. A processor can be a person or another resource. |
| ProductCategoryDescription | MEDIUM_Decription | Natural-language representation of the properties of a product category. |
| ProductCategoryHierarchyDescription | SHORT_Decription | Natural-language representation of the properties of a product category hierarchy. |
| ProductDescription | SHORT_Decription | Natural-language representation of the properties of a product. |

-continued

| Qualified GDT Description | Type | Definition |
|---|---|---|
| ProjectSnapshotCreationRunDescription | LONG_Description | Description of an automated run that creates project snapshots of selected projects. |
| ReasonDescription | MEDIUM_Description | Description of a reason. |
| ReceiptDescription | MEDIUM_Description | Description of a receipt. |
| ReleasedSiteLogisticsProcessModelProcessSegmentDescription | MEDIUM_Description | Description of a process segment in a ReleasedSiteLogisticsProcessModel A process segment can specify a set of operations for moving, packing or checking stock in a logistics division. ReleasedSiteLogisticsProcessModel can be a released version of a SiteLogisticsProcessModel in a logistics division that contains all details from the SiteLogisticsBillOfOperations necessary for the execution of a site logistics process |
| RequestProcurementRunDescription | LONG_Description | Description of a Request Procurement Run. |
| RequestProductionRunDescription | LONG_Description | Description of a Request Production Run. |
| RequirementSpecificationProcessingInformationFolderProcessingInformationDescription | SHORT_Description | Description of a ProcessingInformation within a ProcessingInformationFolder of a RequirementSpecification. |
| RequirementSpecificationRequirementFolderRequirementDescription | SHORT_Description | Description of a Requirement within a RequirementFolder of a RequirementSpecification. |
| RequirementSpecificationSpecificationFolderSpecificationDescription | SHORT_Description | Description of a Specification within a SpecificationFolder of a RequirementSpecification. |
| ResourceDescription | SHORT_Description | Description of a resource A Resource can be a tangible and reusable factor that adds value to a material or service in its creation, production, or delivery. |
| SalesCycleStepDescription | LONG_Description | Description for a step within a phase of the sales cycle. |
| SalesOrderItemDescription | SHORT_Description | Description of a SalesOrderItem A Sales order can be the item of a customer-specific business transaction that focuses on delivering goods or providing a service, on the prices and on preparing the invoice. Item can be the identifying and administrative item information in a SalesOrder which, in addition to the schedule lines, contains all the data that applies to the item, for example, the product information, the parties involved, the sales/delivery/invoicing-specific agreements, status and references, and so on. |
| SoftwareChangeActionLogEntryDescription | Description | A description of an SoftwareChangeActionLogEntry. A SoftwareChangeActionLogEntry can be a log record of each action performed by a user or the system during the implementation of the Software-Change. |
| SoftwareChangeDescription | Description | Description of a Software Change. A Software Change can be the notification on a recommended maintenance package (patch, update or continuous change package) for a dedicated system. It can include information used to control the implementation process. |
| SoftwareChangeManualTaskDescription | Description | Description/Long Text for a manual task used during implementation of a Software Change |
| SoftwareChangeMotivationDescription | Description | Description of a reason for implementation of a Software Change |

-continued

| Qualified GDT Description | Type | Definition |
|---|---|---|
| SoftwareChangeSystemNewsDescription | Description | Description, which was input by system administrator and is forwarded to system news in Control Center to announce impacts of Software Change on Business Operations. |
| ServiceIssueCategoryCatalogueDescription | LONG_Description | Description for an issue category catalog in Customer Service |
| ServiceIssueCategoryDescription | LONG_Description | Description for an issue category in Customer Service |
| SettlementResultDescription | SHORT_Description | Description of the result of a settlement |
| SiteLogisticsProcessModelDescription | MEDIUM_Description | Description is language-dependent short-length statement describing the SiteLogisticsProcessModel.<br>A SiteLogisticsProcessModel can be a model of a site logistics process in a distribution center that can be specified by a sequence of SiteLogistics-ProcessSegments. It can include information about the category of the process (e.g. standard receiving, standard shipping) represented by the model, as well as the distribution center which is the organizational unit responsible for the process. |
| SiteLogisticsProcessSegmentDescription | MEDIUM_Description | Description of a site logistics process segment<br>A site logistics process segment can be part of a logistic process in a LogisticsDivision specified by a net of operations for packing, moving and checking of goods. |
| StayDescription | MEDIUM_Description | Description of a stay. |
| StorageBehaviourMethodDescription | LONG_Description | Description of a storage behaviour method.<br>Storage Behaviour Method can be a set of rules that defines the manner in which a storage location is managed. |
| TaskDescription | LONG_Description | Description of a Task in the context of Business Task Management.<br>Describes the purpose of a task to the end user. |
| TechnicalUserDescription | MEDIUM_Description | Description of a technical user. |
| TransportationLaneDescription | SHORT_Description | Description of a TransportationLane<br>Relationship between two locations or transportation zones that can specify which materials can be transported between the locations or transportation zones, and which means of transport can be used. |
| TransportationTermsDescription | LONG_Description | Natural-language representation of the characteristics of the transport |
| VehicleDescription | MEDIUM_Description | Description of a vehicle. |

DeviceID

A DeviceID is a unique identifier for an input or output device in computing. An example of DeviceID is:

<DeviceID>P115746</DeviceID>

In certain implementations, DeviceID may have the following structure:

| GDT | | Cat. | Object Class | Property | Representation/Association | Type | Type Name | Len. | Card. | Remarks |
|---|---|---|---|---|---|---|---|---|---|---|
| DeviceID | | | Device | Identification | Identifier | CDT | Identifier | 1..65 | | Restricted |
| | schemeAgencyID | A | Identification Scheme Agency | Identification | Identifier | xsd | token | 1..60 | 0..1 | |

The attributes of the DeviceID may be assigned the following values: schemeID="DeviceID (implicit)." A schemeAgencyID can be the ID of the business organization which issued the scheme.

The DeviceID can be used to identify input and output devices in computing.

DisabledPersonCertificateTypeCode

A GDT DisabledPersonCertificateTypeCode is the coded representation of the type of certificate attesting a person's disability. A disability can be attested by different types of certificates. An example of DisabledPersonCertificateTypeCode is:

<DisabledPersonCertificateTypeCode listID="10048" listAgencyID="310">4</DisabledPersonCertificateTypeCode>

In certain implementations, DisabledPersonCertificateTypeCode may have the following structure:

| GDT | | Cat. | Object Class | Property | Representation/Association | Type | Type Name | Len. | Card. | Remarks |
|---|---|---|---|---|---|---|---|---|---|---|
| DisabledPersonCertificateTypeCode | | | Disabled Person Certificate | Type | Code | CDT | Code | 1..4 | | Restricted |
| | listID | A | Code List | Identification | Identifier | xsd | token | | 0..1 | |
| | listAgencyID | A | Code List Agency | Identification | Identifier | xsd | token | | 0..1 | |
| | listVersionID | A | Code List | Version | Identifier | xsd | token | | 0..1 | |
| | listAgencySchemeID | A | Code List Agency | Scheme | Identifier | xsd | token | | 0..1 | |
| | listAgencySchemeAgencyID | A | Code List Agency | Scheme Agency | Identifier | xsd | token | | 0..1 | |

The GDT DisabledPersonCertificateTypeCode may have several fixed, country-specific code lists, which are different at runtime, assigned to it.

The DisabledPersonCertificateTypeCode may be used in Personnel Administration to enable fulfillment of the employer's legal obligations with regard to the contributions for disabled persons. This code is currently valid for the country Germany.

The GDT DisabledPersonCertificateTypeCode may have Data element R/3: P01_SB_NACHW assigned to it.

The GDT DisabledPersonCertificateTypeCode for DE may be assigned the following values: listID="10048," listAgencyID="310" and listVersionID="version of the relevant code list assigned and managed by the customer."

The GDT DisabledPersonCertificateTypeCode may include the following codes: self-service document of identification/acknowledgment certificate (i.e., an ID issued to a severely disabled person or a letter attesting the disability), equalization certificate (i.e., a letter documenting equivalence with a severe disability), answer multiple charge certificate (i.e., a letter documenting that a disabled person can be calculated several times), miner certificate (i.e., a letter documenting that the person is or has been a miner and has a disability).

The DisabledPersonCertificateTypeCodeContextElements can define a dependency or an environment in which the DisabledPersonCertificateTypeCode appears. The environment may be described by context categories. With the context categories in DisabledPersonCertificateTypeCodeContextElements the valid portion of code values of DisabledPersonCertificateTypeCode may be restricted according to an environment during use.

In certain implementations, DisabledPersonCertificateTypeCodeContextElements may have the following structure:

| GDT | Cat. | Object Class | Property | Representation/Association | Type | Type Name | Card. |
|---|---|---|---|---|---|---|---|
| DisabledPersonCertificateTypeCodeContextElements | | DisabledPersonCertificateTypeCodeContext Elements | | Details | | | |

-continued

| GDT | | Cat. | Object Class | Property | Representation/Association | Type | Type Name | Card. |
|---|---|---|---|---|---|---|---|---|
| | Disabled-Person-GroupCode | E | DisabledPerson-CertificateType-CodeContext Elements | Disabled-Person-Group | Code | GDT | Disabled-Person-GroupCode | 0..1 |
| | CountryCode | E | DisabledPerson-CertificateType-CodeContext Elements | Country | Code | GDT | CountryCode | 0..1 |

The DisabledPersonGroupCode can define the context group. This can determine the valid code values for a specific DisabledPersonGroupCode. The Country Code can define the context country. This can determine the valid code values for a specific country.

DisabledPersonGroupCode

A DisabledPersonGroupCode is the coded representation of the disability group to which a disabled person belongs, according to the legislation of a given country. An example of DisabledPersonGroupCode is:

<DisabledPersonGroupCode listID="20601" listAgencyID="310">SBA </DisabledPersonGroupCode>

In certain implementations, DisabledPersonGroupCode may have the following structure:

| GDT | | Cat. | Object Class | Property | Representation/Association | Type | Type Name | Len. | Card. | Remarks |
|---|---|---|---|---|---|---|---|---|---|---|
| Disabled-Person-GroupCode | | | Disabled Person | Group | Code | CDT | Code | 1..4 | | Restricted |
| | listID | A | Code List | Identification | Identifier | xsd | token | | 0..1 | |
| | listAgencyID | A | Code List Agency | Identification | Identifier | xsd | token | | 0..1 | |
| | listVersionID | A | Code List | Version | Identifier | xsd | token | | 0..1 | |
| | listAgency-SchemeID | A | Code List Agency | Scheme | Identifier | xsd | token | | 0..1 | |
| | listAgency-SchemeAgencyID | A | Code List Agency | Scheme Agency | Identifier | xsd | token | | 0..1 | |

The DisabledPersonGroupCode may assign several fixed, country-specific code lists, which are different at runtime. The attributes may be assigned the following values: listID="20601" and listAgencyID="310," listVersionID can be the version of the particular code list (e.g., assigned and managed by the customer), listAgencySchemeID can be the ID of the scheme if the listAgencyID does not come from DE 3055. The listAgencySchemeAgencyID can be the ID of the organization from DE 3055 that manages the listAgencySchemeID scheme.

In Germany and other countries, the disabled person group can be used, for example, to distinguish between disabled trainees and qualified persons with disabilities. In certain implementations, the GDT may only be available for the country of Germany. For example, a DisabledPersonGroupCode in Germany may have the following attributes: listID="20601" and listAgencyID="310."

Additionally, an implementation in Germany may include the following codes: severely disabled (i.e., individual with a severe disability), severely disabled trainee (i.e., trainee with a severe disability), severely disabled employer (i.e., employer with a severe disability), classified severely disabled (i.e., individual with a disability classed as equivalent to a severe disability), classified severely disabled trainee (i.e., trainee with a disability classed as equivalent to a severe disability), multiple employee severely disabled (i.e., severely disabled person with more than one employment relationship), multiple trainee severely disabled (i.e., severely disabled trainee with more than one employment relationship), severely disabled employee with multiple employment (i.e., disabled person with severe disability equivalence holding more than one employment relationship), severely disabled trainee with multiple employment (i.e., disabled trainee with severe disability equivalence holding more than one employment relationship).

In some implementations, according to the German Social Security Code (SGB), individuals are deemed "severely disabled" if they have an impairment of at least 50%, and their permanent place of residence, usual abode, or their place of employment lies within the scope of the SGB. Disabled individuals with severe disability equivalence are persons whose degree of impairment is less than 50% but more than 30%, and who, without equivalence, would not attain or retain suitable employment as a result of their disability. In the event that multiple code values apply, the most specific one is typically used. Other classification may be necessary based on the implementation. For example, a German classification may differ from a United States classification.

The DisabledPersonGroupCodeContextElements can define a dependency or an environment in which the DisabledPersonGroupCode appears. The environment can be described by context categories. With the context categories in DisabledPersonGroupCodeContextElements the valid portion of code values of DisabledPersonGroupCode may be restricted according to an environment during use.

In certain implementations, DisabledPersonGroupCodeContextElements may have the following structure:

| GDT | | Cat. | Object Class | Property | Representation/Association | Type | Type Name | Card. |
|---|---|---|---|---|---|---|---|---|
| Disabled-Person-Group-Code-Context-Elements | | | Disabled-Person-Group-Code-Context Elements | | Details | | | |
| | Country-Code | E | Disabled-Person-Group-Code-Context Elements | Country | Code | GDT | Country-Code | 0..1 |

Country Code can define the context country. This can determine the valid code values for a specific country.

DisabledPersonStatisticExceptionReasonCode

A DisabledPersonStatisticExceptionReasonCode is the code indicating the reason for an exception when entering the statistic data for a disabled person. An example of DisabledPersonStatisticExceptionReasonCode is:

<DisabledPersonStatisticExceptionReasonCode>3</DisabledPersonStatisticExceptionReasonCode>

In certain implementations, DisabledPersonStatisticExceptionReasonCode may have the following structure:

| GDT | Object Class | Property | Representation/Association | Type | Type Name | Len. | Remarks |
|---|---|---|---|---|---|---|---|
| Disabled-Person-Statistic-Exception-ReasonCode | Disabled Person | Statistic Exception Reason | Code | CDT | Code | 1..2 | restricted |

The DisabledPersonStatisticExceptionReasonCode is a fixed code list and may include the following attributes: listID="10049," listAgencyID="310" and listVersionID can be the version of the relevant code list assigned and managed by the customer.

There may be exception rules that apply for certain person groups when creating statistics, for example, severely disabled employees, who are only allowed to work part-time (less than 18 hours/week) due to their disability, may be processed differently for statutory statistical purposes. The code may be used to describe these exceptions. This code is typically relevant to Germany.

The GDT DisabledPersonStatisticExceptionReasonCode may be defined as the following: Data element R/3 (e.g., P015_STAUS), Documentation of the code list in R/3 (e.g., Report RPLEHAD0).

The GDT DisabledPersonStatisticExceptionReasonCode may include the following codes: employer (i.e., The employer (natural person) can be excluded from the statistical data entry if the employer is severely disabled.), excluded in rehabilitation (i.e., Disabled persons who participate in measures in the company for rehabilitation purposes are excluded from the statistical data entry.), part-time less than 18 hours (i.e., Persons who can only work part-time for less than 18 hours due to their severe disability are excluded from the statistical data entry.), reacclimatizing (i.e., Persons who are severely disabled and are employed for refamiliarization purposes are excluded from the statistical data entry.), change in practice (i.e., Persons who were selected after continual practice in their jobs are excluded from the statistical data entry.), entitled to job (i.e., Persons who are severely disabled and are entitled to a job are excluded from the statistical data entry.), participate in job-creating measures (i.e., Persons who are severely disabled and participate in job-creating measures are excluded from the statistical data entry.), charitable work activity (i.e., Persons who are severely disabled and are in a work relationship that does not serve primarily as an acquisition but rather is motivated predominantly for charitable reasons are excluded from the statistical data entry.), religious work activity (i.e., Persons who are severely disabled and are in a work relationship that does not serve primarily as an acquisition but rather is motivated predominantly for religious reasons are excluded from the statistical data entry.), maximum of eight weeks work activity (i.e., Persons who are severely disabled and are in a work relationship that lasts for a maximum of eight weeks (only if not employed mariginally or for a short time) are excluded from the statistical data entry), not relevant (i.e., Severely disabled persons that are not relevant for the survey are excluded from the statistical data entry.), work center job (i.e., Severely disabled persons are excluded from the statistical data entry if their part-time job may be attributed as a work center and position reserved for severely disabled persons.), suspended work relationship (i.e., Severely disabled persons are excluded from the statistical data entry if their work relationship is suspended due to military or non-military service, parental leave, unpaid leave due to drawing a temporary annuity or during semiretirement in the release phase, provided that a replacement employee is hired for them.), Federal Social Security Act defined work relationship (i.e., Severely disabled persons whose work relationship is defined in §19 (Creation of Employment Opportunities) of the Federal Social Security Act are excluded from the statistical data entry.), short-term work relationship (i.e., Severely disabled persons are excluded from the statistical data entry if they have a short-term work relationship for which a position reserved for severely disabled persons is specified.).

DisabledPersonWorkCapabilityLimitationCode

DisabledPersonWorkCapabilityLimitationCode is the coded representation of the limitation of a disabled person's work capability. An example of DisabledPersonWorkCapabilityLimitationCode is:

<DisabledPersonWorkCapabilityLimitationCode listID=4711 listAgencyID=310>1</DisabledPersonWorkCapabilityLimitationCode>

In certain implementations, DisabledPersonWorkCapabilityLimitationCode may have the following structure:

| GDT | | Cat. | Object Class | Property | Representation/Association | Type | Type Name | Len. | Card. | Remarks |
|---|---|---|---|---|---|---|---|---|---|---|
| Disabled-Person-Work-Capability-Limitation-Code | | | Disabled Person | Work Capability Limitation | Code | CDT | Code | 1..2 | | Restricted |
| | listID | A | Code List | Identification | Identifier | xsd | token | | 0..1 | |
| | listAgencyID | A | Code List Agency | Identification | Identifier | xsd | token | | 0..1 | |
| | listVersionID | A | Code List | Version | Identifier | xsd | token | | 0..1 | |
| | listAgencySchemeID | A | Code List Agency | Scheme | Identifier | xsd | token | | 0..1 | |
| | listAgencySchemeAgencyID | A | Code List Agency | Scheme Agency | Identifier | xsd | token | | 0..1 | |

The DisabledPersonWorkCapabilityLimitationCode may have several fixed, country-specific code lists that are handled differently at runtime assigned. The attributes may be assigned the following values: listID="20701" (e.g., assigned and managed by customer), listAgencyID "310," listVersionID can be the version of the relevant code list assigned and managed by the customer, a listAgencySchemeID can be the ID of the scheme if the listAgencyID does not come from DE 3055. The listAgencySchemeAgencyID can be the ID of the organization from DE 3055 that manages the listAgencySchemeID scheme.

In certain implementations, for Country DE (i.e., Germany), it may be possible to specify the degree to which the work capability of a disabled person is limited. Code lists for other countries can be added to the appendix in the future.

The DisabledPersonWorkCapabilityLimitationCode may be defined as the following: Data element R/3 (e.g., SBART).

The attributes for the DisabledPersonWorkCapabilityLimitationCode for DE (i.e., Germany) may be assigned the following values: listID="20701" (e.g., assigned and managed by customer), listAgencyID="310" and listVersionID can be the version of the relevant code list assigned and managed by the customer.

The code list and its values may include: Unlimited Work Capability (i.e., when the person's work capability is not limited), Limited work capability (i.e., when the person's work capability is limited) and Sedentary Work Only (i.e., when the person can only work in a seated position.)

The DisabledPersonWorkCapabilityLimitationCodeContextElements defines a dependency or an environment in which the DisabledPersonWorkCapabilityLimitationCode appears. The environment may be described by context categories. Within the context categories in the DisabledPersonWorkCapabilityLimitationCodeContextElements, the valid portion of the code values of DisabledPersonWorkCapabilityLimitationCode may be restricted according to an environment during use.

In certain implementations, DisabledPersonWorkCapabilityLimitationCodeContextElements may have the following structure.

| GDT | | Cat. | Object Class | Property | Representation/Association | Type | Type Name | Card. |
|---|---|---|---|---|---|---|---|---|
| Disabled-Person-Work-Capability-Limitation-Code-Context-Elements | | | Disabled-Person-Work-Capability-Limitation-Code-Context-Elements | | Details | | | |
| | CountryCode | E | Disabled-Person-Work-Capability-Limitation-Code-Context-Elements | Country | Code | GDT | CountryCode | 0..1 |

This context category may define the context country. It may determine the valid code values for a specific country.

DisagioDeductionEventTypeCode

A DisagioDeductionEventTypeCode is the coded representation of the type of event that leads to a disagio deduction. A disagio deduction may be the deduction of an amount that is calculated using a disagio percentage. An example of DisagioDeductionEventTypeCode is:

<DisagioDeductionEventTypeCode>1</DisagioDeductionEventTypeCode>

In certain implementations, DisagioDeductionEventTypeCode may have the following structure:

| GDT | Object Class | Property | Represen-tation/As-sociation | Type | Type Name | Len. | Remarks |
|---|---|---|---|---|---|---|---|
| Disagio-Deduction-EventTypeCode | Disagio | Deduction Event Type | Code | CDT | Code | 1..2 | restricted |

The DisagioDeductionEventTypeCode is a proprietary code list. The DisagioDeductionEventTypeCode can be used in the context of loan contracts.

The DisagioDeductionEventTypeCode uses a proprietary code list with predefined values. In some implementations, if you change permitted values you also may have to make changes to interfaces. In the ERP system, the DisagioDeductionTypeCode is based on the data element SDISEIN in the software component EA-FINSERV.

The code list and its values may include: First Disbursement (i.e., first disbursement is made with the first partial disbursement of a loan), Partial Disbursement (i.e., when the disagio deduction is made proportionally for each partial disbursement of a loan), Last Disbursement (i.e., when the disagio deduction is made with the last partial disbursement of a loan).

DisagioPercent

A DisagioPercent is a percentage amount by which the exchange rate of a security or loan commitment capital, or the parity of a currency lies below the nominal value. An example of DisagioPercentCode is:

<DisagioPercent>2.5</DisagioPercent>

In certain implementations, DisagioPercentCode may have the following structure:

| GDT | Cat. | Object Class | Represen-tation/As-sociation | Type | Type Name | Len. | Re-marks |
|---|---|---|---|---|---|---|---|
| Disagio-Percent | E | Disagio | Percent | GDT | Percent | 3.3 | re-stricted |

The DisagioPercent may be stated as a positive percentage.

The DisagioPercentCode can be used to calculate either the disbursement obligation for a loan granted or the exchange rate of a security.

DistributionChannelCode

A DistributionChannelCode is a channel via which goods or services reach the customer. An example of DistributionChannelCode is:

<DistributionChannelCode>1</DistributionChannelCode>

In certain implementations, DistributionChannelCode may have the following structure:

| GDT | | Cat. | Object Class | Property | Represen-tation/As-sociation | Type | Type Name | Len. | Card. | Re-marks |
|---|---|---|---|---|---|---|---|---|---|---|
| Distri-bution-Chan-nelCode | | | Distri-bution Channel | | Code | CDT | Code | 1..2 | | Re-stricted |
| | listID | A | Code List | Identifi-cation | Identifier | xsd | token | | 0..1 | |
| | listA-gencyID | A | Code List Agency | Identifi-cation | Identifier | xsd | token | | 0..1 | |
| | listVer-sionID | A | Code List | Version | Identifier | xsd | token | | 0..1 | |
| | listA-gency-Scheme-ID | A | Code List Agency | Scheme | Identifier | xsd | token | | 0..1 | |
| | list-Agency-Scheme-AgencyID | A | Code List Agency | Scheme Agency | Identifier | xsd | token | | 0..1 | |

For a DistributionChannelCode, a customer-specific code list can be assigned to the code. A listID can be "10113." A listAgencyID can be the ID of the customer (e.g., ID from DE 3055, if listed there). A listVersionID can be the version of the particular code list (e.g., assigned and managed by the customer). A listAgencySchemeID can be the ID of the scheme if the listAgencyID does not come from DE 3055. A listAgencySchemeAgencyID can be the ID of the organization from DE 3055 that manages the listAgencySchemeID scheme.

The data type DistributionChannelCode may use the following codes: Retail Sales (i.e., goods or services reach the customer via the distribution channel "Retail Sales"), Direct Sales (i.e., goods or services reach the customer via the distribution channel "Direct Sales"), Internet Sales (i.e., goods or services reach the customer via the distribution channel "Internet Sales").

The DistributionChannelCodeContextElements can define a dependency or an environment in which the DistributionChannelCode appears.

In certain implementations, DistributionChannelCodeContextElements may have the following structure:

| GDT | | Cat. | Object Class | Property | Represen-tation/As-sociation | Type | Type Name | Card. |
|---|---|---|---|---|---|---|---|---|
| Distribu-tionChan-nelCode-Context-Elements | | | Distribution Channel Code Context Elements | | Details | | | |
| | Divi-sion-Code | E | Distribution Channel Code Context Elements | Division | Code | GDT | Divison-Code | 0..1 |
| | Sales-Organ-isation-UUID | E | Distribution Channel Code Context Elements | Sales Organi-zation | Identifier | GDT | UUID | 0..1 |

The context category DivisionCode can define the context division. It may determine the valid code values for a specific Division. The context category SalesOrganization can define the context sales organization. It can determine a valid Organizational Center.

DivisionCode

A DivisionCode defines the responsibility for sales or profits for salable materials or services. An organizational unit can have a division; however, a division is not an organizational unit. An example of DivisionCode is:

<DivisionCode>1</DivisionCode>

In certain implementations, DivisionCode may have the following structure:

| GDT | | Cat. | Object Class | Prop-erty | Represen-tation/As-sociation | Type | Type Name | Len. | Card. | Remarks |
|---|---|---|---|---|---|---|---|---|---|---|
| Divi-sion-Code | | | Division | | Code | CDT | Code | 1..2 | | Restricted |
| | listID | A | Code List | Identi-fication | Identifier | xsd | token | | 0..1 | |
| | listAgen-cyID | A | Code List Agency | Identi-fication | Identifier | xsd | token | | 0..1 | |
| | listVer-sionID | A | Code List | Ver-sion | Identifier | xsd | token | | 0..1 | |
| | list-Agency-Scheme-ID | A | Code List Agency | Scheme | Identifier | xsd | token | | 0..1 | |
| | list-Agency-Scheme-Agency-ID | A | Code List Agency | Scheme Agency | Identifier | xsd | token | | 0..1 | |

For DivisionCode, a customer-specific code list can be assigned to the code. A listID can be "10114." A listAgencyID can be the ID of the customer (e.g., ID from DE 3055, if listed there). A listVersionID can be the version of the particular code list (e.g., assigned and managed by the customer). A listAgencySchemeID can be the ID of the scheme if the listAgencyID does not come from DE 3055. A listAgency-SchemeAgencyID can be the ID of the organization from DE 3055 that manages the listAgencySchemeID scheme.

Divisions can provide the option of specifying the responsibility for sales or profits for salable materials or services. Companies and sales organizations can be organized according to divisions.

The data type DivisionCode may use the following codes: Cars (i.e., division for the sale of cars), Trucks (i.e., division for the sale of trucks), Buses (i.e., division for the sale of buses).

The DivisionCodeContextElements can define a dependency or an environment in which the DivisionCode appears. In certain implementations, DivisionCodeContextElements may have the following structure:

| GDT | | Cat. | Object Class | Property | Represen-tation/As-sociation | Type | Type Name | Card. |
|---|---|---|---|---|---|---|---|---|
| Division-CodeCon-textEle-ments | | | Division Code Con-text Ele-ments | | Details | | | |
| | Distribu-tionChan-nelCode | E | Division Code Con-text Ele-ments | Distri-bution-Channel | Code | GDT | Distribu-tionChan-nelCode | 0..1 |
| | Sales-Organisa-tionUUID | E | Division Code Con-text Ele-ments | SalesOr-ganisa-tion | Identifier | GDT | UUID | 0..1 |

The context category DistributionChannel Code can define the context DistributionChannel. It can determine the valid code values for a specific DistributionChannel. The context category Sales Organization may define the context sales organization. It can determine a valid Organizational Center.

Document

A Document typically contains unstructured information, as well as additional control and monitoring information. An example of Document is:

<Document actionCode="01">
<PathName>/ESABusinessAttachments/AE100/EMAIL/ROOT/12345/prd_desc.d oc</PathName>
<Name>prd_desc.doc</Name>
<VersionID>1</VersionID>
<SystemAdministrativeData>
<CreationDateTime>2004-04-19T11:11Z+01:00</CreationDateTime>
<CreationUserAccountID>Bach</CreationUserAccountID>
<LastChangeDateTime>2004-04-19T12:21Z+01:00</LastChangeDateTime>
<LastChangeUserAccountID>Bach</LastChangeUserAccountID>
</SystemAdministrativeData>
<LinkInternalIndicator></LinkInternalIndicator>
<VisibleIndicator>X</VisibleIndicator>
<VersioningEnabledIndicator>X<VersioningEnabled Indicator>
<CategoryCode>1</CategoryCode>
<TypeCode>10</TypeCode>
<MIMECode>application/msword<MIMECode>
<AlternativeName>ProductDescription</AlternativeName>
<Description>ProductDescription for P-100</Description>
<FileContentURI>http://host:8000/irj/go/km/docs/ESABusinessAttachments/AE100/EMAIL/ROOT/12345/prd_desc.doc<FileContentURI>
<FileSizeMeasure unitCode="AD">645<FileSizeMeasure>
<FileContentBinaryObject>T2xkIE1hY0RvbmFsZC BoYWQgYSBmYXJtCkUgSS<FileContentBinaryObject>
<Property actionCode="01">
<Name>DocumentType</Name>
<DataTypeFormatCode>string<DataTypeFormatCode>
<VisibleIndicator>X</VisibleIndicator>
<ChangeAllowedIndicator>X</ChangeAllowedIndicator>
<MultipleValueIndicator></MultipleValueIndicator>
<NamespaceURI>http://xyz.com/xmlns/cm</NamespaceURI>
<Description>Document Type</Description>
<Value>
<Text>DIN A4</Text>
</Value>
</Property>
</Document>

In certain implementations, Document may have the following structure:

| GDT | | Cat. | Object Class | Property | Rep./Ass. | Type | Type Name | Card. | Remarks |
|---|---|---|---|---|---|---|---|---|---|
| Docu-ment | | | Document | | Details | GDT | Document | | |
| | Action-Code | A | Document | Action | Code | GDT | actionCode | 0..1 | |
| | PathName | E | Document | Path Name | Name | GDT | LANGUAGE-INDEPEND-ENT_Name | 1 | |
| | Name | E | Document | Name | Name | GDT | LANGUAGE-INDEPEND-ENT_Name | 1 | |
| | VersionID | E | Document | Version | Identifier | GDT | VersionID | 0..1 | |
| | System-Admin-istrative-Data | E | Document | System Adminis-trative Data | Details | GDT | SystemAd-ministra-tiveData | 1 | |
| | LinkInter-nalIndica-tor | E | Document | Link In-ternal | Indicator | CDT | Indicator | 0..1 | |
| | VisibleIn-dicator | E | Document | Visible | Indicator | CDT | Indicator | 1 | |

-continued

| GDT | | Cat. | Object Class | Property | Rep./Ass. | Type | Type Name | Card. | Remarks |
|---|---|---|---|---|---|---|---|---|---|
| | VersioningEnabledIndicator | E | Document | Versioning Enabled | Indicator | CDT | Indicator | 1 | |
| | CategoryCode | E | Document | Category | Code | GDT | DocumentCategoryCode | 1 | |
| | TypeCode | E | Document | Type | Code | GDT | DocumentTypeCode | 0..1 | |
| | MIMECode | E | Document | MIME | Code | GDT | MIMECode | 0..1 | |
| | AlternativeName | E | Document | Alternative Name | Name | GDT | LANGUAGEINDEPENDENT_Name | 0..1 | |
| | InternalLinkPathName | E | Document | Internal Link Path Name | Name | GDT | LANGUAGEINDEPENDENT_Name | 0..1 | |
| | Description | E | Document | Description | Description | GDT | Description | 0..1 | |
| | ExternalLinkWebAddress | E | Document | External Link Web Address | WebAddress | GDT | WebAddress | 0..1 | restricted |
| | FileContentURI | E | Document | File Content URI | URI | CCT | URI | 0..1 | |
| | FileSizeMeasure | E | Document | File Size | Measure | CCT | Measure | 0..1 | |
| | FileContentBinaryObject | E | Document | File Content | BinaryObject | CCT | BinaryObject | 0..1 | |
| | Attachment | E | Document | Attachment | Attachment | GDT | Attachment | 0..1 | |
| | Property | E | Document | Property | Details | GDT | DocumentProperty | 0..n | |

In the implementation of the Document structure above, ActionCode can be an instruction to the recipient of a message as to how it should handle a submitted property. PathName can be the complete name of a document. The PathName can be structured hierarchically and may comprise the complete name of the folder in which the document is stored and the name of the document itself, where the two components are separated by a "/." Name can be the name for a document that identifies that document within its higher-level folder. VersionID can be the unique identifier for a document version. SystemAdministrativeData can be the administrative data stored in a system. LinkInternalIndicator may indicate whether a link is internal or not. VisibleIndicator can specify whether or not the document is visible. VersioningEnabledIndicator can specify whether or not versioning is activated for the document. CategoryCode may indicate whether a document is a folder, link or file. TypeCode may define the document type and thus the main document settings. MIMECode may specify the MIMECode for a document. AlternativeName is the language-independent document name. InternalLinkPathName can be the name of the document pointed to by the link, if the link is internal. Description can be the language-independent description of the document. ExternalLinkWebAddress can be the destination address (if the link is external). WebAddress may not use any of the attributes. FileContentURI can be the URI for accessing the unstructured data (file content). FileSizeMeasure can specify the size of the unstructured data (file content). FileContentBinaryObject can describe the unstructured data of the document in binary form. Attachment may identify the document within the message if the unstructured data are transmitted as an attachment to the message. Property can describe a document property. A property can include a unique name, a data type, a description, and other control information, and may have multiple values.

The data type Document may include the following constraints: Attachments, and FileContentBinaryObject. The Document can also support sending the unstructured data (file content) of a document. Since this data can in some cases be very large, there are several ways to send them, for example, as a message attachment. In such a case, the file content can be appended to the message as an attachment. The message itself can be referenced to the relevant message attachment in the field Attachment. If the field Attachment is filled, FileContentBinaryObject can be optional. As another example, the unstructured data can be part of the message. In such a case, the file content can be sent with the message in the FileContentBinaryObject element as a binary object. If the FileContentBinaryObject field is filled, Attachment can be optional.

DocumentProperty

A DocumentProperty is the description of a document property. A DocumentProperty can include a unique name, a data type, a description, and other control information, and may have multiple values. An example of DocumentProperty is:

<DocumentProperty actionCode="01">
<Name>DocumentType</Name>
<DataTypeFormatCode>string</DataTypeFormatCode>
<VisibleIndicator>X</VisibleIndicator>
<ChangeAllowedIndicator>X</ChangeAllowedIndicator>
<MultipleValueIndicator></MultipleValueIndicator>
<NamespaceURI>http://xyz.com/xmlns/cm</NamespaceURI>
<Description>Document Type</Description>
<Value>
<Text>DIN A4</Text>
</Value>
</DocumentProperty>

In certain implementations, GDT DocumentProperty may have the following structure:

| GDT | | Cat. | Object Class | Property | Rep./Ass. | Type | Type Name | Card. |
|---|---|---|---|---|---|---|---|---|
| Document-Property | | | Document Property | | Details | | Document-Property | 0..n |
| | ActionCode | A | Document Property | Action | Code | GDT | actionCode | 0..1 |
| | Name | E | Document Property | Name | Name | GDT | LANGUAGE INDEPEND-ENT_Name | 1 |
| | DataType-FormatCode | E | Document Property | Data Type Format | Code | GDT | Property-DataType-FormatCode | 1 |
| | Visible-Indicator | E | Document Property | Visible | Indicator | CDT | Indicator | 1 |
| | ChangeAl-lowedIndi-cator | E | Document Property | Changed Allowed | Indicator | CDT | Indicator | 1 |
| | Multi-pleValueIn-dicator | E | Document Property | Multiple Value | Indicator | CDT | Indicator | 1 |
| | Name-spaceURI | E | Document Property | Namespace | URI | GDT | Name-spaceURI | 0..1 |
| | Description | E | Document Property | Description | Descrip-tion | GDT | Description | 0..1 |
| | Description Value | E | Document Property | Value | Details | | Document-PropertyValue | 0..n |

In the implementation of the DocumentProperty structure above, ActionCode can be an instruction to the recipient of a message as to how it should handle a submitted property. Name can be the name for a document property that identifies that property within its higher-level folder. DataTypeFormat-Code can be the specification of the representation for the format of a property data type. VisibleIndicator may specify whether or not the property is visible. ChangeAllowedIndicator can indicate whether or not users can change a document property (e.g, properties that the system records and maintains cannot be changed by users). MultipleValueIndicator can indicate whether or not a property can save a list of values. NamespaceURI can be the namespace of the property; each property is assigned a namespace during property definition in order to avoid naming conflicts. Description can be the language-independent description of document property. Value can be the values that are assigned to a DocumentProperty.

DocumentPropertyValue

A DocumentPropertyValue is a value that has been assigned to a DocumentProperty (see above). An example of DocumentPropertyValue is:

<DocumentPropertyValue>

<Text>DIN A4</Text>

</DocumentPropertyValue>

In certain implementations, DocumentPropertyValue may have the following structure:

| GDT | | Cat. | Object Class | Property | Rep./Ass. | Type | Type Name | Card. |
|---|---|---|---|---|---|---|---|---|
| Document-Property-Value | | | Document Property Value | | Details | GDT | Document-Property-Value | |
| | Text | E | Document Property Value | Text | Text | CDT | LANGUAGEINDE-PENDENT_Text | 0..1 |
| | Indicator | E | Document Property Value | Indicator | Indicator | CDT | Indicator | 0..1 |
| | DateTime | E | Document Property Value | Date Time | DateTime | CDT | DateTime | 0..1 |
| | Integer-Value | E | Document Property Value | Integer Value | Integer Value | GDT | IntegerValue | 0..1 |

In the implementation of the DocumentPropertyValue described above, Text may specify texts. Indicator can specify binary values. DateTime can specify a time-stamp (to nearest second). IntegerValue may specify a discrete, integer value.

The data type DocumentPropertyValue may include the following constraint: At least one of the values may be set.

DocumentCategoryCode

A DocumentCategoryCode is the coded representation of the document category. An example of DocumentCategory-Code is:

<DocumentCategoryCode>1</DocumentCategoryCode>

In certain implementations, GDT DocumentCategoryCode may have the following structure:

| GDT | Object Class | Property | Representation/Association | Type | Type Name | Len. | Remarks |
|---|---|---|---|---|---|---|---|
| DocumentCategoryCode | Document | Category | Code | CDT | Code | 1 | Restricted |

A code list may be assigned to the DocumentCategoryCode. The attributes may be assigned the following values: listID="10295" and listAgencyID="310."

The data type DocumentCategoryCode may use the following codes: Folder (i.e., receptacle for documents and folders, File (i.e., includes unstructured information (i.e., the file content) and additional descriptive attributes), and Link (i.e. Link to another document within the Document Management System or a link to an external URL).

A DocumentLockID may be unique within a document

A document lock can be used to prevent parallel access to a document. Multiple persistent locks of various types can be set for a document, all of which can be identified by the relevant DocumentLockInformationID.

DocumentTypeCode

A DocumentTypeCode typically describes the business nature of documents and specifies the basic characteristics of documents of this type. An example of DocumentTypeCode is:

<DocumentTypeCode>1</DocumentTypeCode>

In certain implementations, DocumentTypeCode may have the following structure:

| GDT | | Cat. | Object Class | Property | Representation/Association | Type | Type Name | Len. | Card. |
|---|---|---|---|---|---|---|---|---|---|
| Document TypeCode | | | Document | Type | Code | CDT | Code | 1..5 | |
| | listID | A | Code List | Identification | Identifier | xsd | token | | 0..1 |
| | listAgencyID | A | Code List Agency | Identification | Identifier | xsd | token | | 0..1 |
| | listVersionID | A | Code List | Version | Identifier | xsd | token | | 0..1 |
| | listAgency-SchemeID | A | Code List Agency | Scheme | Identifier | xsd | token | | 0..1 |
| | listAgency-Scheme-AgencyID | A | Code List Agency | Scheme Agency | Identifier | xsd | token | | 0..1 |

DocumentLockID

A DocumentLockID is a restriction placed on access to a document. The type of restriction may be either exclusive or shared. Exclusive locks may prevent any other locks being set. However, shared locks may also allow shared locks to be set for other end users. An example of DocumentLockID is:

<DocumentLockID>e00f4d07-befd-2710-689e-916eb65b973d:47244640359</DocumentLockID>

In certain implementations, DocumentLockID may have the following structure:

| GDT | Object Class | Property | Representation/Association | Type | Type Name |
|---|---|---|---|---|---|
| DocumentLockID | Document Lock | Identification | Identifier | CDT | Identifier |

For DocumentTypeCode, a customer-specific code list can be assigned to the code. A listID can be "10296." If the code list is unchanged, a listAgencyID can be "310." Alternatively, a listAgencyID can be the ID of the customer (e.g., ID from DE 3055, if listed there). A listVersionID can be the version of the particular code list (e.g., assigned and managed by the customer). A listAgencySchemeID can be the ID of the scheme if the listAgencyID does not come from DE 3055. A listAgencySchemeAgencyID can be the ID of the organization from DE 3055 that manages the listAgencySchemeID scheme.

The DocumentTypeCode can determine the document type in more detail. It may qualify a document instance and, to do this, it may define centralized settings.

The DocumentTypeCode may include the following customer-specific codes: Presentation, ProjectPlan, Technical- Report, Specification, EngineeringDrawing, DINNorm (i.e., reference to a DIN norm), Help (i.e., link to a help page), ProjectFolder.

DueCategoryCode

A DueCategoryCode is the coded representation of the category (receivable or payable) of an item due for payment. An example of DueCategoryCode is:

<DueCategoryCode>1</DueCategoryCode>

In certain implementations, DueCategoryCode may have the following structure:

| GDT | Object Class | Property | Represen-tation/As-sociation | Type | Type Name | Len. | Re-marks |
|---|---|---|---|---|---|---|---|
| DueCate-goryCode | Due | Category | Code | CDT | Code | 1 | re-stricted |

The DueCategoryCode may be a code list. The attributes may be assigned the following values: listID="10052," listAgencyID="310," listVersionID="to be defined" may be missing in the structure as they would be filled with constant values at run-time.

The DueCategoryCode may need to be entered for each item due for payment. This GDT can be used in DueItem-Management to differentiate an item due for payment by receivables and payables.

The data type DueCategoryCode may contain the following qualifier: TaxDueCategoryCode (see below).

The data type DueCategoryCode may use the following codes: Payable and Receivable.

DueTypeCode

A DueTypeCode is a receivable or a payable. An example of DueTypeCode is:

<DueTypeCode>PAYMT</DueTypeCode>

In certain implementations, DueTypeCode may have the following structure:

| GDT | | Cat. | Object Class | Property | Representation/ Association | Type | Type Name | Len. | Card. |
|---|---|---|---|---|---|---|---|---|---|
| DueType-Code | | | Due | Type | Code | CDT | Code | 1..5 | |
| | listID | A | Code List | Identification | Identifier | xsd | token | | 0..1 |
| | listAgencyID | A | Code List Agency | Identification | Identifier | xsd | token | | 0..1 |
| | listVersionID | A | Code List | Version | Identifier | xsd | token | | 0..1 |
| | listAgency-SchemeID | A | Code List Agency | Scheme | Identifier | xsd | token | | 0..1 |
| | listAgency-Scheme-AgencyID | A | Code List Agency | Scheme Agency | Identifier | xsd | token | | 0..1 |

The DueTypeCode may be a customer-specific code. It may be that one code list is permitted for each administrative organization (agency). The attributes may be assigned the following values: listID="10338." However, listAgencyID, listVersionID, listAgencySchemeID, listAgency-SchemeAgencyID may be filled during runtime with constant values that can be customer-specific.

The DueTypeCode can be used in business objects and A2A messages. The DueTypeCode can be used to distinguish between different types of trade payables and receivables. In some implementations, it may be possible to have different views of the due items in the system. The differentiation generated in this way can be used in Financial Accounting to display the due items for specific G/L accounts. The legal requirements of the respective country may determine for which DueTypeCodes it is necessary to display the due items for specific G/L accounts. This may then be specified in the configuration.

The DueTypeCode may include the following codes: Invoice due item (i.e., a due item that results from an invoice), Payment due item (i.e., a due item that results from a payment), Down payment due item (i.e., a due item that results from a down payment, which is a payment made before the service is provided), Security retention amount (i.e., a due item resulting from an invoice of which a specific part cannot be paid to the payee and may be retained due to legal regulations).

In some implementations, there can be two categories of due item: receivable and payable. These are described in the DueCategoryCode (see above).

DunningBlockingReasonCode

A DunningBlockingReasonCode is the coded representation of a reason why dunning of a partner or document is blocked. An example of DunningBlockingReasonCode is:

<DunningBlockingReasonCode>1</DunningBlockingReasonCode>

In certain implementations, DunningBlockingReasonCode may have the following structure:

| GDT | | Cat. | Object Class | Property | Representation/ Association | Type | Type Name | Len. | Card. | Remarks |
|---|---|---|---|---|---|---|---|---|---|---|
| Dunning-Blocking-Reason-Code | | | Dunning | Blocking Reason | Code | CDT | Code | 1..2 | | restricted |
| | listID | A | Code List | Identification | Identifier | xsd | token | | 0..1 | |
| | listAgencyID | A | Code List Agency | Identification | Identifier | xsd | token | | 0..1 | |
| | listVersionID | A | Code List | Version | Identifier | xsd | token | | 0..1 | |
| | listAgency-SchemeID | A | Code List Agency | Scheme | Identifier | xsd | token | | 0..1 | |
| | listAgency-Scheme-AgencyID | A | Code List Agency | Scheme Agency | Identifier | xsd | token | | 0..1 | |

In some implementations of a DunningBlockingReasonCode, a customer-specific code list can be assigned to the code. A listID can be assigned by the coaching team. If the code list is unchanged, a listAgencyID can be "310." Otherwise, a listAgencyID can be the ID of the customer (e.g., ID from DE 3055, if listed there). A listVersionID can be the version of the particular code list (e.g., assigned and managed by the customer). A listAgencySchemeID can be the ID of the scheme if the listAgencyID does not come from DE 3055. A listAgencySchemeAgencyID can be the ID of the organization from DE 3055 that manages the listAgencySchemeID scheme.

In some implementations of messages, DunningBlockingReasonCode can be used when both sender and recipient have access to shared or harmonized Business Configuration (e.g., during internal communication in an enterprise).

The data type DunningBlockingReasonCode may use the following codes: Disputed (i.e., further dunning is blocked because of disputes with the Business Partner about invoices, credit memos, payments etc) and Promised to pay (i.e., Further dunning is blocked because the Business Partner promised to pay soon).

DunningCounterValue

A DunningCounterValue is the number of dunning notices sent. An example of a GDT DunningCounterValue is:

<DunningCounterValue>2</DunningCounterValue>

In certain implementations, DunningCounterValue may have the following structure:

| GDT | Object Class | Property | Representation/ Association | Type | Type Name |
|---|---|---|---|---|---|
| DunningCounter-Value | Dunning | Counter | Value | GDT | Counter-Value |

Non-negative, whole number values may be permitted.

DunningCounterValue can specify, for example, the number of dunning notices that have been sent to one or more business partners in a specified period with regard to one or more receivables. For example, in a company, this information is sent from Current Account Accounting to Credit Management.

Several dunning notices can exist for a receivable. These dunning notices may also be grouped by dunning level (DunningLevelValue, see below). However, the dunning level does not have to increase automatically each time a dunning notice is sent. For example:

On 15/01/2003: $1^{st}$ dunning notice at dunning level 1

On 01/02/2003: $2^{nd}$ dunning notice at dunning level 1

On 15/02/2003: $1^{st}$ dunning notice at dunning level 2

On 28/02/2003: $1^{st}$ dunning notice at dunning level 3

In the implementation shown above, DunningCounterValue=4 and maximum DunningLevelValue=3.

DunningLevelValue

A DunningLevelValue is the level of intensity with which a party is urged to pay existing receivables. An example of a GDT DunningLevelValue is:

<DunningLevelValue>4</DunningLevelValue>

In certain implementations, DunningLevelValue may have the following structure:

| GDT | Object Class | Property | Representation/Association | Type | Type Name | Len. |
|---|---|---|---|---|---|---|
| Dunning-Level-Value | Dunning | Level | Value | CDT | Numeric | 1 |

Non-negative, whole number values from 0 to a maximum value may be used; the maximum value typically may not exceed 9.

For the dunning level, the following linear order may apply: 0<1<2< . . . <maximum value.

The DunningLevelValue can convey the relative intensity of a dunning notice based on a linear integer scale between zero and a specified maximum value. It may not be necessary to know the semantic for individual dunning levels.

Dunning is a process for contacting customers to collect unpaid bills. It can start with a payment reminder and progresses to dunning notices and even threats as payments become more overdue. Overall, dunning levels can be regulated and prescribed by country-specific laws. Within the scope of the statutory regulations, however, a dunning company can also define several additional dunning levels that differ in the form of the dunning notice (e.g. a friendly payment reminder at level 1 and a more abrupt payment reminder at level 2). The purpose of the DunningLevelValue can be not to define a DunningLevelCode that is used to define the semantics of individual dunning levels. Since these semantics can differ from country to country and company to company, a DunningLevelCode can be defined using additional attributes such as schemeAgencyID. In some implementations, the use of the GDT DunningLevelValue may presuppose that the semantic of a conveyed dunning level is either known to the sender and recipient or is not relevant in the given context.

DunningProcedureCode

A DunningProcedureCode is the coded representation of a dunning procedure. Customers can be contacted within a dunning procedure so that they can pay their unpaid invoices.

The dunning procedures may be company-specific and defined by country-specific laws, but each company can define its own dunning procedure. Dunning procedures may differ regarding their insistency. They can include dunning levels and may describe the attributes of the dunning notices at the different dunning levels. An example of DunningProcedureCode is:

<DunningProcedureCode>1</DunningProcedureCode>

In certain implementations, DunningProcedureCode may have the following structure:

| GDT | | Cat. | Object Class | Property | Representation/ Association | Type | Type Name | Len. | Card. |
|---|---|---|---|---|---|---|---|---|---|
| Dunning-Procedure-Code | | | Dunning | Procedure | Code | CDT | Code | 1..2 | |
| | listID | A | Code List | Identification | Identifier | xsd | token | | 0..1 |
| | listVersionID | A | Code List | Version | Identifier | xsd | token | 1..15 | 0..1 |
| | listAgencyID | A | Code List Agency | Identification | Identifier | xsd | token | 1..60 | 0..1 |
| | listAgency-SchemeID | A | Code List Agency | Scheme | Identifier | xsd | token | 1..60 | 0..1 |
| | listAgency-Scheme-AgencyID | A | Code List Agency | Scheme Agency | Identifier | xsd | token | 1..3 | 0..1 |

In some implementations of a DunningProcedureCode, a customer-specific code list can be assigned to the code. A listID can be "10716." If the code list is unchanged, a listAgencyID can be "310." Alternatively, a listAgencyID can be the ID of the customer (e.g., ID from DE 3055, if listed there). A listVersionID can be the version of the particular code list (e.g., assigned and managed by the customer). A listAgency-SchemeID can be the ID of the scheme if the listAgencyID does not come from DE 3055. A listAgencySchemeAgencyID can be the ID of the organization from DE 3055 that manages the listAgencySchemeID scheme.

A DunningProcedureCode can be used to differ different procedures in the case of a dunning notice. A DunningProcedureCode may use the following dunning procedures: urgent, normal, or lenient. For example, an urgent dunning procedure can include an appropriate formulation of the letter and high dunning charges.

Duration

A Duration is a period of time of a particular length without a fixed start or end time. This period of time may be expressed in years, months, days, hours, minutes, seconds, and fractions of a second. An example of a Duration is:

<TravelDuration>PT23H12M</TravelDuration>

In certain implementations, Duration may have the following structure:

| GDT | Property | Representation/ Association | Type | Type Name |
|---|---|---|---|---|
| Duration | Duration | DateTime | xsd | Duration |

Duration can be based on the built-in data type of W3C xsd:duration. This data type can be structured according to the extended representation of ISO 8601 (i.e., PnYnMnDT-nHnMnS). An example of this representation is: P12Y12M2DT4H12M40S.

The representation can use the following literals: P denotes the duration and may precede every duration value, nY where the number prefix (n) represents the duration in years, nM where the number prefix (n) represents the duration in months, nD where the number prefix (n) represents the duration in days, T is the prefix for the time period in hours, minutes, and seconds, nH where the number prefix (n) represents the duration in hours, nM where the number prefix (n) represents the duration in minutes, nS where the number prefix (n) represents the duration in seconds or n.nnnS where a decimal point precedes fractions of seconds. Tenths (nS), hundredths (nnS), and thousandths (nnnS) of a second can be shown. The number prefix (n) in each case is the duration in fractions of a second.

In certain implementations, time values that are not needed may be omitted (e.g., P12Y1M). When hours, minutes, and/or seconds are represented, "T" may precede the time values (e.g., PT23H12M or P3Y1MT9H).

Duration can describe a time period, with a particular length, of an event or process (e.g., working time, duration of stay, or processing time). However, it may not be dependent on a fixed point in time.

In certain implementations, the duration in years, months, days, hours, minutes, and seconds may be required. However, the individual time values may be divided based on the customer's discretion.

It may be advisable to use the time and Gregorian calendar when defining value ranges. This can mean the following: Year can represent one year (this corresponds to 365 days when the year is not a leap year, and 366 days when it is), Month can represent 12 months (1-12), Day can represent 28 days in month 02 (1-28), Day can represent 29 days in month 02 when the year is a leap year (1-29), Day can represent 30 days in months 04, 06, 09, and 11 (1-30), Day can represent 31 days in months 01, 03, 05, 07, 08, 10, and 12 (1-31), Time can represent 24 hours (0-23), Minutes can represent 60 minutes (0-59), and Seconds can represent 60 seconds (0-59).

For the purpose of conversion, in some implementations, it may be easier to use one time format (e.g., minutes) when two processing times that are expressed in minutes are to be compared. If one of the processing times exceeds sixty minutes, it may not be necessary to convert the values into hours and minutes.

TIME_Duration

TIME_Duration is a period of time of a particular length without a fixed start or end time. This period of time can be expressed in hours, minutes, seconds, and fractions of a second. An example of TIME_Duration is:

<AppointmentDuration>PT2H30M</AppointmentDuration>

In certain implementations, TIME_Duration may have the following structure:

| CDT | Object Class Term | Repre-sentation Term | Type | Type Name | Remarks |
|---|---|---|---|---|---|
| TIME_Duration | Duration | Type | XSD | xsd:duration | Restricted |

In certain implementations, TIME_Duration may be considered a restriction of the Core Data Type Duration where, for example, values for hours, minutes, seconds and fractions of seconds may be allowed.

The TIME_Duration can be represented as follows: PTnHnMnS (e.g., PT4H12M40S).

TIME_Duration can include the variable "TIME_," which may be replaced by one (or more) qualifiers. For example qualifiers of TIME_Duration see GDT DurationRoleCode.

YEAR_Duration

YEAR_Duration is a period of time of a particular length without a fixed start or end time. This period of time can be expressed in years. An example of YEAR_Duration is:

<EmploymentDuration>P10Y</EmploymentDuration>

In certain implementations, YEAR_Duration may have the following structure:

| CDT | Object Class Term | Repre-sentation Term | Type | Type Name | Remarks |
|---|---|---|---|---|---|
| YEAR_Duration | Duration | Type | XSD | xsd:duration | Restricted |

In certain implementations, YEAR_Duration may be considered a restriction of the Core Data Type Duration where perhaps only values for years are allowed (for example).

The YEAR_Duration can be represented as follows: PnY (e.g., P10Y).

YEAR_Duration can contain the variable "YEAR_," which may be replaced by one (or more) qualifiers. For example qualifiers of YEAR_Duration see GDT DurationRoleCode.

MONTH_Duration

MONTH_Duration is a period of time of a particular length without a fixed start or end time. This period of time can be expressed in months. An example of MONTH_Duration is:

<EmploymentDuration>P30M</EmploymentDuration>

In certain implementations, MONTH_Duration may have the following structure:

| CDT | Object Class Term | Repre-sentation Term | Type | Type Name | Re-marks |
|---|---|---|---|---|---|
| MONTH_Duration | Duration | Type | XSD | xsd:duration | Re-stricted |

In certain implementations, MONTH_Duration may be considered a restriction of the Core Data Type Duration where, for example, only values for months are allowed.

The MONTH_Duration can be represented as follows: PnM (e.g., P10M).

MONTH_Duration can contain the variable "MONTH_," which may be replaced by one (or more) qualifiers. For example qualifiers of MONTH_Duration see GDT DurationRoleCode.

DAY_Duration

DAY_Duration is a period of time of a particular length without a fixed start or end time. This period of time is expressed in days. An example of DAY_Duration is:

<VacationDuration>P30D</VacationDuration>

In certain implementations, DAY_Duration may have the following structure:

| CDT | Object Class Term | Repre-sentation Term | Type | Type Name | Remarks |
|---|---|---|---|---|---|
| DAY_Duration | Duration | Type | XSD | xsd:duration | Restricted |

In certain implementations, DAY_Duration may be considered a restriction of the Core Data Type Duration where perhaps only values for days are allowed (for example).

The DAY_Duration can be represented as follows: PnD (e.g., P10D).

DAY_Duration can contain the variable "DAY_," which may be replaced by one (or more) qualifier. For example qualifiers of DAY_Duration see GDT DurationRoleCode.

DurationInterval

A DurationInterval is an interval of durations defined by a lower and an upper boundary. An example of DurationInterval is:

<DurationInterval>

<IntervalBoundaryTypeCode>5</IntervalBoundaryTypeCode>

<LowerBoundaryDuration>PT8H30M</LowerBoundaryDuration>

<UpperBoundaryDuration>PT10H30M</UpperBoundaryDuration>

</DurationInterval>

In certain implementations, DurationInterval may have the following structure:

| GDT | | Cat. | Object Class | Property Qualifier | Property | Representation/ Association | Type | Type Name | Card. |
|---|---|---|---|---|---|---|---|---|---|
| Duration-Interval | | | Duration Interval | | | Details | | | |
| | Interval-Boundary-TypeCode | E | Duration Interval | | Interval Boundary Type | Code | GDT | Interval Boundary-Type Code | 1 |

-continued

| GDT | | Cat. | Object Class | Property Qualifier | Property | Representation/ Association | Type | Type Name | Card. |
|---|---|---|---|---|---|---|---|---|---|
| | Lower-Boundary-Duration | E | Duration Interval | Lower | Boundary | Duration | GDT | Duration | 0..1 |
| | Upper-Boundary-Duration | E | Duration Interval | Upper | Boundary | Duration | GDT | Duration | 0..1 |

In the implementation of the DurationInterval structure above, IntervalBoundaryTypeCode can be a coded representation of an interval boundary type. LowerBoundaryDuration can be the lower boundary of the duration interval. LowerBoundaryDuration can be typically used for duration intervals that contain a single value. UpperBoundaryDuration can be the upper boundary of the duration interval, which can be greater than LowerBoundaryDuration.

The DurationInterval can be used to restrict the output of a query operation. For output items, the values of the attribute linked to the DurationInterval instance, provided as query input, can be located in the specified duration interval.

DurationRoleCode

A DurationRoleCode is a coded representation of the business role of a duration. An example of DurationRoleCode is:

<DurationRoleCode>1</DurationRoleCode>

In certain implementations, DurationRoleCode may have the following structure:

| GDT | | Cat. | Object Class | Property | Representation/ Association | Type | Type Name | Len. | Card. | Remarks |
|---|---|---|---|---|---|---|---|---|---|---|
| Duration-Role Code | | | | Duration Role | Code | CDT | Code | 1..3 | | restricted |
| | listID | A | Code List | Identification | Identifier | xsd | token | | 0..1 | |
| | listAgencyID | A | Code List Agency | Identification | Identifier | xsd | token | | 0..1 | |
| | listVersionID | A | Code List | Version | Identifier | xsd | token | | 0..1 | |
| | listAgency-SchemeID | A | Code List Agency | Scheme | Identifier | xsd | token | | 0..1 | |
| | listAgency-Scheme-AgencyID | A | Code List Agency | Scheme Agency | Identifier | xsd | token | | 0..1 | |

In some implementations of a DurationRoleCode, a customer-specific code list can be assigned to the code. A listID can be “10396.” If the code list is unchanged, a listAgencyID can be “310.” Otherwise, a listAgencyID can be the ID of the customer (e.g., ID from DE 3055, if listed there). A listVersionID can be the version of the particular code list (e.g., assigned and managed by the customer). A listAgencySchemeID can be the ID of the scheme if the listAgencyID does not come from DE 3055. A listAgencySchemeAgencyID can be the ID of the organization from DE 3055 that manages the listAgencySchemeID scheme.

The DurationRoleCode can be used to specify the semantic of a duration during runtime. Durations may be typed with Duration or Quantity. DurationRoleCodes may cover all the business semantics of durations. As a result, the codes can also include all qualifiers of GDT Durations and those qualifiers of Quantity that are used for a time duration. The DurationRoleCode may not include the type name; a restriction to a subset of the available time-point types may not be possible. Identical Qualifiers and RoleCodes may have the same business semantic.

The data type GDT DurationRoleCode may use the following codes: ArrearsDuration (i.e., duration for which a payment is in arrears), AverageDuration (i.e., average duration), ConfirmDuration (i.e., duration that will be confirmed), ConfirmedDuration (i.e., duration that has been confirmed), DefaultDuration (i.e., duration meant for the default case), DeliveryDuration (i.e., period of time it takes to deliver something), FixedDuration (i.e., duration that has been defined independent of a reference value), FloatDuration (i.e., duration that has been planned or calculated as buffer), IssueDuration (i.e., period of time it takes to issue something), LagDuration (i.e. duration between two events), LeadTimeDuration (i.e., duration between placing the order and the receipt of delivery), LockDuration (i.e., duration for which something is locked), MaximumDuration (i.e., maximum duration), MinimumDuration (i.e., minimum duration), NetDuration (i.e., duration excluding breaks interruptions of an operation), OrderToPickupDuration (i.e., period of time that passes between the receipt of the order and availability for collection), PersonnelTimeDuration (i.e., duration of personnel time of a certain type), PlannedDuration (i.e., Duration for which something is planned), ProbationPeriodDuration (i.e., duration of probation time of an employee), ProcessingDuration (i.e., duration for which something is in process), ProductionDuration (i.e., period of time it takes to produce something), ReceiptDuration (i.e., period of time it takes to post the goods receipt), ShippingDuration (i.e., period of time it takes to ship something), TotalConfirmedDuration (i.e., total duration that has been confirmed), TotalDuration (i.e., total duration), and VariableDuration (i.e., duration that has been defined dependent on a reference value).

DurationValueRecurrence

A DurationValueRecurrence is a representation for a number of recurrences within a time frame. The GDT may be based on the GDT Recurrence_Template and implements case c, and may initially support case c. An example of DurationValueRecurrence is:

“Two recurrences in one month, “eight recurrences in 50 days”

<DurationValueRecurrence>
<Duration>P7D<Duration>
<Value>1</Value>
</DurationValueRecurrence>

In certain implementations, DurationValueRecurrence may have the following structure:

| GDT | | Cat. | Object Class | Property | Representation/ Association | Type | Type Name | Len. | Card. |
|---|---|---|---|---|---|---|---|---|---|
| Duration-Value-Recurrence | | | Duration Value Recurrence | | Details | | | | |
| | Duration | E | Duration Value Recurrence | Duration | Duration | GDT | Duration | | 1 |
| | Value | E | Duration Value Recurrence | Value | Value | GDT | Integer-Value | 3 | 1 |

In the implementation of the DurationValueRecurrence structure described above, Duration may indicate the time frame within which the specified number of recurrences takes place. Value can be the number of recurrences in terms of the time frame.

EffectiveYieldCalculationMethodCode

A EffectiveYieldCalculationMethodCode is the coded representation of the method for calculating the effective interest rate. The effective interest rate may indicate the profitability of a capital investment or the costs of a loan. In addition to the nominal interest rate, other factors such as disagio, fees, and repayment type can be used to calculate the effective interest rate. There are a number of different methods for calculating the effective interest rate. An example of EffectiveYieldCalculationMethodCode is:

<EffectiveYieldCalculationMethodCode>1<Effective YieldCalculationMethodCode>

In certain implementations, EffectiveYieldCalculationMethodCode may have the following structure:

| GDT | Object Class | Property | Representation/ Association | Type | Type Name | Len. |
|---|---|---|---|---|---|---|
| Effective-Yield-Calculation-MethodCode | Effective Yield | Calculation Method | Code | CDT | Code | 1..2 |

This code list may not be extended by customers.

The data type GDT EffectiveYieldCalculationMethodCode may use the following codes: PAngV (i.e., effective interest rate calculation according to price regulations), AIBD/ISMA (i.e., effective interest rate calculation according to AIBD/ISMA, Braess (i.e., effective interest rate calculation according to Braess), Moosmueller (i.e., effective interest rate calculation according to Moosmuller), US method (i.e., effective interest rate calculation according to US American method), EU Act/365 (i.e., effective interest rate calculation on current daily basis (EU)), EU 30.42/365 (i.e., effective interest rate calculation on monthly basis (EU)), Linear (i.e., linear effective interest rate calculation).

EmailAddress

The EmailAddress is the abbreviation for Electronic Mail Address and represents a digital and unique address in a mailbox system. An example of EmailAddress is:

<EmailAddress> mailto:gunther.stuhec@xyz.com

</EmailAddress>

In certain implementations, EmailAddress may have the following structure:

| GDT | | Cat. | Object Class | Property | Representation/ Association | Type | Type Name | Card. | Remarks |
|---|---|---|---|---|---|---|---|---|---|
| Email Address | | | Email | Address | Electronic-Address | CDT | Elecronic-Address | | restricted |
| | protocol-Code | A | Email Address | Protocol | Code | xsd | token | 0..1 | default: EM (smtp) |

The element content for "EmailAddress" can be structured using URL conventions. The scheme may be the uriType "mailto:." The part following the colon may be the scheme-specific part that represents the respective email address. In certain implementations, "mailto:" can specify the electronic mail address.

The predefined representation of the email address in the scheme-specific part is the SMTP address. In certain implementations, the additional attribute "protocolCode" may not be necessary.

If the email address is not based on the SMTP address, another URI scheme can be applied or the relevant email address can be indicated by an additional "protocolCode" attribute.

In certain implementations, the following attributes can be used within GDT EmailAddress: protocolCode (i.e., specification of an address representation of a particular message protocol). For this email address type, the codes from the UN/EDIFACT DE 3155 "Communication Address Code Qualifier" code list can be used. In some implementations, it is not necessary to state the attribute because "EM" is the default value for the SMTP protocol.

In certain implementations, the attribute "protocolCode" may use the following codes: AB (i.e., SITA: communications number assigned by Societe Internationale de Telecommunications Aeronautiques (SITA)), AD (i.e., AT&T mailbox, AT&T mailbox identifier), AF (i.e., U.S. Defense Switched Network—The switched telecommunications network of the United States Department of Defense), AN (i.e., O.F:T.P.: ODETTE File Transfer Protocol), AO (i.e., Uniform Resource Location (URL): identification of the Uniform Resource Location (URL) Synonym: World wide web address), EI (i.e., EDI transmission: number identifying the service and service user), EM (i.e., Electronic Mail: exchange of mail by electronic means), FT (i.e., FTAM: File transfer access method according to ISO), GM (i.e., GEIS: General Electric Information Service mailbox; the communication number may identify a GEIS mailbox), IM (i.e., Internal mail address/number), SW (i.e., S.W.I.F.T.: communications address assigned by Society for Worldwide Interbank Financial Telecommunications s.c.), XF (i.e., X.400 address). Codings typically do not exist for the following protocols: ms (i.e., Microsoft Mail; for example, MM) and ccmail (i.e., CC Mail; for example, CC).

The GDT EmailAddress may use the following protocols: smtp (e.g., mailto:gunther.stuhec@xyz.com), X.400 (e.g., mailto:c=DE;a=XYZ;p=XYZ;o=EXCHANGE; s=STUHEC;g=GUNTHER), Microsoft Mail (e.g., mailto: XYZ/EUROPE/GUNTHER/STUHEC), CC Mail (e.g., mailto:Stuhec, Gunther at Europe2).

EmailAddress can be used for the email address of a person, group, organization or system.

EmployeeID

A EmployeeID is a person who contributes or has contributed to the creation of goods or services for a company. This term can be used to describe “internal” employees but can also include “external” employees, or “externals.” Unlike externals, an internal employee may be in a position of subordination to another's authority. An example of EmployeeID is:

<EmployeeID>12345678901234</EmployeeID>

In certain implementations, EmployeeID may have the following structure:

| GDT | | Cat. | Object Class | Property | Representation/ Association | Type | Type Name | Len. | Card. | Remarks |
|---|---|---|---|---|---|---|---|---|---|---|
| Employee-ID | | | Employee | Identification | Identifier | GDT | Identifier | 1..36 | | restricted |
| | scheme-AgencyID | A | Identification Scheme Agency | Identification | Identifier | xsd | token | 1..60 | 0..1 | |

For the GDT EmployeeID Structure described above, schemeAgencyID can be the business system that issued the ID. SchemeID can be the scheme according to which the identifier was assigned. In some implementations, the following scheme can be supported: schemeID: EmployeeID—may identify an employee using an internal identifier of the schemeAgency.

An Employee can be a subtype of Business Partner. Therefore any EmployeeID can map to an existing BusinessPartnerID.

EmployeeRegionalTaxRegulationsCode

A EmployeeRegionalTaxRegulationsCode is a coded representation of the regional regulations that determine the employee tax calculation. Within a country there can be different regional regulations on how to calculate employee taxes. The same regulations may apply to more than one region. In this case, a single code may represent the regulations for a set of regions. An example of EmployeeRegionalTaxRegulationsCode is:

<EmployeeRegionalTaxRegulationsCode>1</EmployeeRegionalTaxRegulationsCode>

In certain implementations, EmployeeRegionalTaxRegulationsCode may have the following structure:

| GDT | | Cat. | Object Class | Property | Representation/ Association | Type | Type Name | Len. | Card. | Remarks |
|---|---|---|---|---|---|---|---|---|---|---|
| Employee-Regional-TaxRegulationsCode | | | Employee Regional Tax Regulations | | Code | CDT | Code | 1..4 | | restricted |
| | listID | A | Code List | Identification | Identifier | xsd | token | | 0..1 | |
| | list-AgencyID | A | Code List Agency | Identification | Identifier | xsd | token | | 0..1 | |
| | listVersionID | A | Code List | Version | Identifier | xsd | token | | 0..1 | |
| | list-Agency-SchemeID | A | Code List Agency | Scheme | Identifier | xsd | token | | 0..1 | |
| | list-Agency-Scheme-AgencyID | A | Code List Agency | Scheme Agency | Identifier | xsd | token | | 0..1 | |

In certain implementations, the EmployeeRegionalTaxRegulationsCode can be the CountryCode CN. In this case, the EmployeeRegionalTaxRegulationsCode can have the following attributes: listID="23901," listAgencyID="310," and the listVersionID can be a version of the particular code list.

The GDT EmployeeRegionalTaxRegulationsCode can be an extensible code list. Lists may be delivered for some countries (e.g., China) that may not contain certain regional regulation codes if they are out of the legal coverage scope. Customers can replace the code list with a customer code list.

The following dictionary objects may be assigned to this GDT: Data element (e.g., PCN_TXARE).

As described previously, the GDT EmployeeRegionalTaxRegulationsCode can be the CountryCode CN. In this case, the GDT may use the following codes: rest of China (i.e., Tax Regulations applicable to the rest of Chinese Regions), Beijing area (i.e., Tax Regulations applicable to the Beijing Area), Guang Zhou area (i.e., Tax Regulations applicable to Guang Zhou Area), Shanghai area (i.e., Tax Regulations applicable to the Shanghai Area), Tianjin area (i.e., Tax Regulations applicable to the Tianjin Area), Nei Mongol area (i.e., Tax Regulations applicable to the Nei Mongol Area), Shanxi area (i.e., Tax Regulations applicable to the Shanxi Area), Hebei area (i.e., Tax Regulations applicable to the Hebei Area), Liaoning area (i.e., Tax Regulations applicable to the Liaoning Area), Gansu area (i.e., Tax Regulations applicable to the Gansu Area), Shaanxi area (i.e., Tax Regulations applicable to the Shaanxi Area).

The GDT EmployeeRegionalTaxRegulationsCodeContextElements can define a dependency or an environment in which the EmployeeRegionalTaxRegulationsCode appears. The environment may be described by context categories. With the context categories in EmployeeRegionalTaxRegulationsCodeContextElements, the valid portion of code values of EmployeeRegionalTaxRegulationsCode may be restricted according to an environment during use. In certain implementations, GDT EmployeeRegionalTaxRegulationsCodeContextElements may have the following structure:

| GDT | | Cat. | Object Class | Property | Representation/ Association | Type | Type Name | Card. |
|---|---|---|---|---|---|---|---|---|
| Employee-RegionalTax-Regulations-CodeContext-Elements | | | Employee-RegionalTax-Regulations-Code Context Elements | | Details | | | |
| | Country-Code | E | Employee-RegionalTax-Regulations-Code Context Elements | Country | Code | GDT | CountryCode | 0..1 |

-

The context category CountryCode typically defines the context country. It can determine the valid code values for a specific country.

EmployeeSocialInsuranceContributionAccountChangeReasonCode

A EmployeeSocialInsuranceContributionAccountChangeReasonCode is the coded representation of the change reason for a SocialInsuranceContributionAccount (i.e., the structure to maintain the Social Insurance Contribution amounts of an employee). An example of EmployeeSocialInsuranceContributionAccountChangeReasonCode is:

<EmployeeSocialInsuranceContributionAccountChangeReasonCode>1</EmployeeSocialInsuranceContributionAccountChangeReasonCode>

In certain implementations, EmployeeSocialInsuranceContributionAccountChangeReasonCode may have the following structure:

| GDT | | Cat. | Object Class | Property | Representation/ Association | Type | Type Name | Len. | Card. | Remarks |
|---|---|---|---|---|---|---|---|---|---|---|
| EmployeeSocialInsurance-Contribution-AccountChange-ReasonCode | | | Employee Social Insurance Contribution Account | Change Reason | Code | CDT | Code | 1..2 | | restricted |
| | listID | A | Code List | Identification | Identifier | xsd | token | | 0..1 | |
| | listAgency-ID | A | Code List Agency | Identification | Identifier | xsd | token | | 0..1 | |
| | listVersion-ID | A | Code List | Version | Identifier | xsd | token | | 0..1 | |
| | listAgency-SchemeID | A | Code List Agency | Scheme | Identifier | xsd | token | | 0..1 | |

-continued

| GDT | | Cat. | Object Class | Property | Representation/ Association | Type | Type Name | Len. | Card. | Remarks |
|---|---|---|---|---|---|---|---|---|---|---|
| | listAgency-Scheme-AgencyID | A | Code List Agency | Scheme Agency | Identifier | xsd | token | | 0..1 | |

For an EmployeeSocialInsuranceContributionAccountChangeReasonCode, a customer-specific code list can be assigned to the code. A listID can be "10478." If the code list is unchanged, a listAgencyID can be "310." Otherwise, a listAgencyID can be the ID of the customer (e.g., ID from DE 3055, if listed there). A listVersionID can be the version of the particular code list (e.g., assigned and managed by the customer). A listAgencySchemeID can be the ID of the scheme if the listAgencyID does not come from DE 3055. A listAgencySchemeAgencyID can be the ID of the organization from DE 3055 that manages the listAgencySchemeID scheme. The GDT EmployeeSocialInsuranceContributionAccountChangeReasonCode can be used for administrative reporting in order to be able to explain the reason for the change of the account for the given Social Insurance Contribution.

The following are examples for user-specific code semantics within the context EmployeeSocialInsuranceContributionTypeCode='1' (Pension Insurance) and RegionalEmployeeSocialInsuranceRegulationsCode='1' (Beijing): Used for creation (i.e., the related Social Insurance Contribution can start collecting to a new contribution account), Used for termination (i.e., the related Social Insurance Contribution can no longer collect into the current contribution account), Used for frozen (i.e., the related Social Insurance Contribution can be frozen).

The following dictionary object may be assigned to this GDT in the systems: Data element (e.g., PCN_CHRSN).

The

EmployeeSocialInsuranceContributionAccountChange ReasonCodeContextElements can define a dependency or an environment in which the EmployeeSocialInsuranceContributionAccountChangeReasonCode can appear. The environment may be described by context categories. With the context categories in EmployeeSocialInsuranceContributionAccountChangeReasonCodeContextElements, the valid portion of code values of EmployeeSocialInsuranceContributionAccountChangeReasonCode may be restricted according to an environment during use.

In certain implementations, GDT EmployeeSocialInsuranceContributionAccountChangeReasonCodeContextElements may have the following structure:

| GDT | | Cat. | Object Class | Property | Representation/ Association | Type | Type Name | Card. |
|---|---|---|---|---|---|---|---|---|
| EmployeeSocialInsurance-Contribution-AccountChange-ReasonCode-ContextElements | | | EmployeeSocialInsurance-Contribution-AccountChange-Reason Code Context Elements | | Details | | | |
| | Employee-Regional-SocialInsuranceRegulationsCode | E | EmployeeSocial-InsuranceContri-butionAccount-ChangeReason-Code Context Elements | Regional Social Insurance Regulations | Code | GDT | Employee-Regional-SocialInsur-anceRegula-tions | 1..2 |
| | Employee-SocialInsur-anceCon-tribution-TypeCode | E | EmployeeSocial-InsuranceContri-butionAccount-ChangeReason-Code Context Elements | Social Insurance Contribution | Code | GDT | Employee-SocialIn-suranceCon-tribution-TypeCode | 1..4 |

The context category EmployeeRegionalSocialInsuranceRegulationsCode can define the context Regional Social Insurance Regulations. It may determine the valid code values for a specific Regional Regulation. The context category EmployeeSocialInsuranceContributionTypeCode can define the context Social Insurance Contribution. It can determine the valid code values for a specific Social Insurance Contribution.

EmployeeSocialInsuranceContributionAccountID

An EmployeeSocialInsuranceContributionAccountID is the identifier of the contribution account of an employee assigned by a Social Insurance Authority or body. An EmployeeSocialInsuranceContributionAccount is the structure to maintain the Social Insurance Contribution amounts of an employee. An example of EmployeeSocialInsuranceContributionAccountID is:

<EmployeeSocialInsuranceContributionAccountID>110108197701011129</EmployeeSocialInsuranceContributionAccountID>

In certain implementations, EmployeeSocialInsuranceContributionAccountID may have the following structure:

| GDT | Cat. | Object Class | Property | Representation/ Association | Type | Type Name | Len. | Card. | Remarks |
|---|---|---|---|---|---|---|---|---|---|
| Employee-SocialInsur-anceContri-butionAc-countID | | Employee So-cial Insurance Contribution Account | Identifi-cation | Identifier | CDT | Identifier | 1..20 | | restricted |

EmployeeSocialInsuranceContributionAccountID can include a social insurance number that can be up to 20 characters long. Account numbers can be used to identify contributors to the Social Insurance Authority or body. Since there are various types of contributions, a contributor may have more than one contribution account number. The identifier EmployeeSocialInsuranceContributionAccountID may be used for communications with the corresponding authority or body. In certain implementations, no additional information for that account may be maintained.

EmployeeSocialInsuranceContributionCalculationMethodCode

A EmployeeSocialInsuranceContributionCalculationMethodCode is a coded representation of a method of calculating social insurance contributions for both the employee and employer. An example of EmployeeSocialInsuranceContributionCalculationMethodCode is:

<EmployeeSocialInsuranceContributionCalculationMethodCode listID="24601" listAgencyID="xx" listVersionID="xxxxx">0<EmployeeSocialInsurance ContributionCalculation MethodCode>

In certain implementations, EmployeeSocialInsuranceContributionCalculationMethodCode may have the following structure:

In certain implementations, the GDT EmployeeSocialInsuranceContributionCalculationMethodCode can be the CountryCode UK. In this implementation, the EmployeeSocialInsuranceContributionCalculationMethodCode can have the following attributes: listID="24601," listAgencyID="UK," listAgencySchemeID="ISO 3166-1," listAgencySchemeAgencyID="5" (ISO).

The information can be recorded by the GDT EmployeeSocialInsuranceContributionCalculationMethodCode for employees of the United Kingdom and is relevant for the National Insurance Contribution (NIC) payments calculation in that country.

As described previously, the GDT EmployeeSocialInsuranceContributionCalculationMethodCode can be the country code UK. In this case, the GDT may use the following codes (note: the following codes are the official code values according to United Kingdom regulations): A (i.e., standard rate not contracted out), B (i.e., reduced rate not contracted out), C (i.e., employer only), D (i.e., COSRS: standard rate), E (i.e., COSRS: reduced rate), F (i.e., COMPS: standard rate), G (i.e., COMPS: reduced rate), H (i.e., COMPS: mariners standard rate), J (i.e., deferment only not contracted out), L (i.e., COSRS: deferment only), N (i.e., COSRS: mariners standard rate), R (i.e., mariners rate not contracted out), S (i.e., COMPS: employer only), X (i.e., N.I. non applicable).

| GDT | | Cat. | Object Class | Property | Representation/ Association | Type | Type Name | Len. | Card. | Remarks |
|---|---|---|---|---|---|---|---|---|---|---|
| Employee-SocialInsur-anceCate-goryCode | | | Employee So-cial Insurance Contribution Calculation Method | | Code | CDT | Code | 1..4 | | restricted |
| | listID | A | Code List | Identifi-cation | Identifier | xsd | token | | 0..1 | |
| | list-AgencyID | A | Code List Agency | Identifi-cation | Identifier | xsd | token | | 0..1 | |
| | listVersion-ID | A | Code List | Version | Identifier | xsd | token | | 0..1 | |
| | listAgency-SchemeID | A | Code List Agency | Scheme | Identifier | xsd | token | | 0..1 | |
| | listAgency-Scheme-AgencyID | A | Code List Agency | Scheme Agency | Identifier | xsd | token | | 0..1 | |

Several extensible, country-specific code lists, which are different at runtime, may be assigned to the GDT EmployeeSocialInsuranceContributionCalculationMethodCode. A listAgencyID can be the ID of the customer (e.g., ID from DE 3055, if listed there). A listVersionID can be the version of the particular code list (e.g., assigned and managed by the customer). A listAgencySchemeID can be the ID of the scheme if the listAgencyID does not come from DE 3055. A listAgencySchemeAgencyID can be the ID of the organization from DE 3055 that manages the listAgencySchemeID scheme.

EmployeeSocialInsuranceContributionEmployeeGroupCode

A EmployeeSocialInsuranceContributionEmployeeGroupCode is the coded representation of a group of employees for whom the same Social Insurance Contributions rules applies. An example of EmployeeSocialInsuranceContributionEmployeeGroupCode is:

<EmployeeSocialInsuranceContributionEmployeeGroupCode>1</EmployeeSocial InsuranceContributionEmployeeGroupCode>

In certain implementations, EmployeeSocialInsuranceContributionEmployeeGroupCode may have the following structure:

| GDT | | Cat. | Object Class | Property | Representation/ Association | Type | Type Name | Len. | Card. | Remarks |
|---|---|---|---|---|---|---|---|---|---|---|
| EmployeeSocialInsurance-Contribution-Employee-GroupCode | | | Social Insurance Contribution Employee Group | | Code | CDT | Code | 1..4 | | restricted |
| | listID | A | Code List | Identification | Identifier | xsd | token | | 0..1 | |
| | listAgency-ID | A | Code List Agency | Identification | Identifier | xsd | token | | 0..1 | |
| | listVersion-ID | A | Code List | Version | Identifier | xsd | token | | 0..1 | |
| | listAgency-SchemeID | A | Code List Agency | Scheme | Identifier | xsd | token | | 0..1 | |
| | listAgency-Scheme-AgencyID | A | Code List Agency | Scheme Agency | Identifier | xsd | token | | 0..1 | |

For GDT EmployeeSocialInsuranceContributionEmployeeGroupCode, several user-specific, country-specific code lists, which may be different at runtime, can be assigned to the code. A user of EmployeeSocialInsuranceContributionEmployeeGroupCode can determine the codes in the code list during configuration. A listID can be from the number range 51200-51299.

The EmployeeSocialInsuranceContributionEmployeeGroupCode can be used in Payroll processing to fulfill the legal obligations with regards to Social Insurance Contributions. The Social Insurance Contribution Group in combination with the Social Insurance Contribution, Social Insurance Contribution Industry, Social Insurance Contribution Subgroup, and the Regional Regulation Code can determine the contribution base and the rate that may be used for the proper calculation of the Social Insurance Contribution.

The following are examples for user-specific code semantics with the context CountryCode='CN': Day workers (i.e., group of employees who work during day time) and Night workers (i.e., group of employees who work during night time).

The following dictionary objects may be assigned to GDT EmployeeSocialInsuranceContributionEmployeeGroup Code in the systems: Data element (e.g., PCN_ICNGR).

The GDT EmployeeSocialInsuranceContributionEmployeeGroupCodeContextElements can define a dependency or an environment in which the EmployeeSocialInsuranceContributionEmployeeGroupCode appears. The environment may be described by context categories. Within the context categories in EmployeeSocialInsuranceContributionEmployeeGroupCodeContextElements the valid portion of code values of EmployeeSocialInsuranceContributionEmployeeGroupCode may be restricted according to an environment during use.

In certain implementations, GDT EmployeeSocialInsuranceContributionEmployeeGroupCodeContextElements may have the following structure:

| GDT | | Cat. | Object Class | Property | Representation/ Association | Type | Type Name | Card. |
|---|---|---|---|---|---|---|---|---|
| EmployeeSocialInsurance-Contribution-Employee-GroupCode-ContextElements | | | Employee-SocialInsuranceContribution-Employee-GroupCode Context Elements | | Details | | | |
| | CountryCode | E | Employee-SocialInsuranceContribution-Employee-GroupCode Context Elements | Country | Code | GDT | CountryCode | 0..1 |

The context category CountryCode can define the context country. It may determine the valid code values for a specific country.

EmployeeSocialInsuranceContributionEmployeeSubgroupCode

A EmployeeSocialInsuranceContributionEmployeeSubgroupCode is the coded representation of a subgroup of an Employee Social Insurance Contribution Employee Group, for whom the same Social Insurance Contribution rules applies. Each EmployeeSocialInsuranceContributionEmployeeSubgroupCode can belong to one EmployeeSocialInsuranceContributionEmployeeGroup Code. An example of EmployeeSocialInsuranceContributionEmployeeSubgroupCode is:

<EmployeeSocialInsuranceContributionEmployeeSubgroupCode>1</EmployeeSocialInsuranceContributionEmployeeSubgroupCode>

In certain implementations, EmployeeSocialInsuranceContributionEmployeeSubgroupCode may have the following structure:

| GDT | | Cat. | Object Class | Property | Representation/ Assocation | Type | Type Name | Len. | Card. | Remarks |
|---|---|---|---|---|---|---|---|---|---|---|
| EmployeeSocial-InsuranceContri-butionEmployee-SubgroupCode | | | Employee Social Insur-ance Contri-bution Subgroup | | Code | CDT | Code | 1..4 | | restricted |
| | listID | A | Code List | Identification | Identifier | xsd | token | | 0..1 | |
| | listAgency-ID | A | Code List Agency | Identification | Identifier | xsd | token | | 0..1 | |
| | listVersion-ID | A | Code List | Version | Identifier | xsd | token | | 0..1 | |
| | listAgency-SchemeID | A | Code List Agency | Scheme | Identifier | xsd | token | | 0..1 | |
| | listAgency-Scheme-AgencyID | A | Code List Agency | Scheme Agency | Identifier | xsd | token | | 0..1 | |

For GDT EmployeeSocialInsuranceContributionEmployeeSubgroupCode, several user-specific, country-specific code lists, which may be different at runtime, can be assigned to the code. A user of EmployeeSocialInsuranceContributionEmployeeSubgroupCode can determine the codes in the code list during configuration. A listID can be from the number range 51300-51399.

The EmployeeSocialInsuranceContributionEmployee SubgroupCode can be used in Payroll processing to fulfill the legal obligations with regards the Social Insurance Contributions. The Social Insurance Contribution Subgroup in combination with the Social Insurance Contribution, Social Insurance Contribution group, Social Insurance Contribution Industry, and the Regional Regulation Code may determine the contribution base and rate that will be used for the proper calculation of the Social Insurance Contribution.

The following are examples for customer-specific code semantics within the context of an EmployeeSocialInsuranceContributionGroupCode=‘1’ (i.e., day workers) and CountryCode=‘CN’: Week days workers (i.e., employees working on week days), Weekend days workers (i.e., employees working on weekends).

The following dictionary objects may be assigned to GDT EmployeeSocialInsuranceContributionEmployeeSubgroupCode in the systems: Data element (e.g., PCN_ICNLV).

The GDT EmployeeSocialInsuranceContributionEmployeeSubgroupCodeContextElements can define a dependency or an environment in which the EmployeeSocialInsuranceContributionEmployeeSubgroupCode appears. The environment may be described by context categories. Within the context categories in EmployeeSocialInsuranceContributionEmployeeSubgroupCodeContextElements the valid portion of code values of EmployeeSocialInsuranceContributionEmployeeSubgroupCode may be restricted according to an environment during use.

In certain implementations, GDT EmployeeSocialInsuranceContributionEmployeeSubgroupCodeContextElements may have the following structure:

| GDT | | Cat. | Object Class | Property | Representation/ Association | Type | Type Name | Card. |
|---|---|---|---|---|---|---|---|---|
| EmployeeSo-cialInsurance-Contribution-Employee-SubgroupCode-ContextElements | | | EmployeeSo-cialInsurance-Contribution-Employee-Subgroup-Code Context Elements | | Details | | | |
| | Employee-SocialIn-suranceCon-tribution-Employee-GroupCode | E | Employee-SocialIn-suranceCon-tribution-Employee-Subgroup-Code Context Elements | Employee-Group | Code | GDT | Employee-SocialIn-suranceCon-tribution-Employee-GroupCode | 0..1 |
| | CountryCode | E | EmployeeSo-cialInsurance-Contribution-EmployeeSub-groupCode Context Elements | Country | Code | GDT | CountryCode | 0..1 |

The context category EmployeeSocialInsuranceContributionEmployeeGroupCode can define the context Employee Social Insurance Contribution Employee Group. It may determine the valid code values for a specific Employee Social Insurance Contribution employee group. The context category CountryCode can define the context country. It may determine the valid code values for a specific country.

EmployeeSocialInsuranceContributionModelCode

A EmployeeSocialInsuranceContributionModelCode is a coded representation of a social insurance contribution model for an employee, where a social insurance contribution model is a list of social insurance contribution types. An example of EmployeeSocialInsuranceContributionModelCode is:

<EmployeeSocialInsuranceContributionModelCode>1</EmployeeSocialInsuranceContributionModelCode>

In certain implementations, EmployeeSocialInsuranceContributionModelCode may have the following structure:

| GDT | | Cat. | Object Class | Property | Representation/ Association | Type | Type Name | Len. | Card. | Remarks |
|---|---|---|---|---|---|---|---|---|---|---|
| EmployeeSocialInsurance-Contribution ModelCode | | | Employee Social Insurance Contribution Model | | Code | CDT | Code | 1..4 | | restricted |
| | listID | A | Code List | Identification | Identifier | xsd | token | | 0..1 | |
| | listAgencyID | A | Code List Agency | Identification | Identifier | xsd | token | | 0..1 | |
| | listVersionID | A | Code List | Version | Identifier | xsd | token | | 0..1 | |
| | listAgencySchemeID | A | Code List Agency | Scheme | Identifier | xsd | token | | 0..1 | |
| | listAgencySchemeAgencyID | A | Code List Agency | Scheme Agency | Identifier | xsd | token | | 0..1 | |

For GDT EmployeeSocialInsuranceContributionModelCode, several country-specific code lists, which are different at runtime, can be assigned to the code. A listID can be from the number range 51600-51699.

EmployeeSocialInsuranceContributionModelCode can be used to identify a set of social insurance contribution types in Personnel Administration to be paid to an entity by the employee.

In certain implementations, the GDT EmployeeSocialInsuranceContributionModelCode can be the CountryCode FR (France). In this case, the code can be used in Personnel Administration to allow the user the assignation of a list of social insurance contributions to be paid by an employee only by the assignation of this code. The following are examples of customer-specific code semantics for CountryCode FR: Non-executive personnel (i.e., list of the contribution types for the non-executive personnel), Executive personnel (i.e., list of the contribution types for the executive personnel), Temporary personnel (i.e., list of the contribution types for the temporary personnel), Apprentices (i.e., list of the contribution types for the apprentices personnel).

The following dictionary objects may be assigned to this GDT: Data element (e.g., R/3: REGNO).

The appendix can be supplemented in the future with code lists for other countries.

The GDT EmployeeSocialInsuranceContributionModelCodeContextElements can define a dependency or an environment in which the EmployeeSocialInsuranceContributionModelCode appears. The environment may be described by context categories. Within the context categories in EmployeeSocialInsuranceContributionModelCodeContextElements, the valid portion of code values of EmployeeSocialInsuranceContributionModelCode may be restricted according to an environment during use.

In certain implementations, CDT EmployeeSocialInsuranceContributionModelCodeContextElements may have the following structure:

| GDT | | Cat. | Object Class | Property | Representation/ Association | Type | Type Name | Card. |
|---|---|---|---|---|---|---|---|---|
| Employee-SocialInsurance-Contribution-ModelCode-ContextElements | | | Employee Social Insurance Contribution Model Code Context Elements | | Details | | | |
| | CountryCode | E | Employee Social Insurance Contribution Model Code Context Elements | Country | Code | GDT | CountryCode | 0..1 |

The context category CountryCode can define the context country. It can determine the valid code values for a specific country.

EmployeeSocialInsuranceContributionPayerTypeCode

A EmployeeSocialInsuranceContributionPayerTypeCode is the coded representation of the payer type for a Social Insurance Contribution of an employee. An example of EmployeeSocialInsuranceContributionPayerTypeCode is:

<EmployeeSocialInsuranceContributionPayerTypeCode>1</EmployeeSocialInsuranceContributionPayerTypeCode>

In certain implementations, EmployeeSocialInsuranceContributionPayerTypeCode may have the following structure:

The following dictionary objects may be assigned to this GDT for CountryCode CN: Domain (e.g., PCN_PBYER).

The appendix can be supplemented in the future with code lists for other countries.

As described previously, the GDT EmployeeSocialInsuranceContributionPayerTypeCode can be the country code CN. In this case, the GDT may use the following codes: Employer (i.e., Employer pays the contribution.), Employer and Employee (i.e., The employee and the employer pay the contribution), No one (i.e., no one).

The GDT EmployeeSocialInsuranceContributionPayerTypeCodeContextElements can define a dependency or an environment in which the EmployeeSocia-

| GDT | | Cat. | Object Class | Property | Represen-tation/As-sociation | Type | Type Name | Len. | Card. | Remarks |
|---|---|---|---|---|---|---|---|---|---|---|
| EmployeeSocial-InsuranceCon-tribution PayerTypeCode | | | Employee Social Insurance Contribution Payer | Type | Code | CDT | Code | 1..2 | | restricted |
| | listID | A | Code List | Identification | Identifier | xsd | token | | 0..1 | |
| | listAgencyID | A | Code List Agency | Identification | Identifier | xsd | token | | 0..1 | |
| | listVersionID | A | Code List | Version | Identifier | xsd | token | | 0..1 | |
| | listAgency-SchemeID | A | Code List Agency | Scheme | Identifier | xsd | token | | 0..1 | |
| | listAgency-SchemeAgencyID | A | Code List Agency | Scheme Agency | Identifier | xsd | token | | 0..1 | |

Several extensible, country-specific code lists, which are different at runtime, may be assigned to the GDT EmployeeSocialInsuranceContributionPayerTypeCode. A listAgencyID can be the ID of the customer (e.g., ID from DE 3055, if listed there). A listVersionID can be the version of the particular code list (e.g., assigned and managed by the customer). A listAgencySchemeID can be the ID of the scheme if the listAgencyID does not come from DE 3055. A listAgencySchemeAgencyID can be the ID of the organization from DE 3055 that manages the listAgencySchemeID scheme.

In certain implementations, the GDT EmployeeSocialInsuranceContributionPayerTypeCode can be the CountryCode CN. In this case, the EmployeeSocialInsuranceContributionPayerTypeCode can have the following attributes: listID="24501," listAgencyID="310," and the listVersionID can be a version of the particular code list The EmployeeSocialInsuranceContributionPayerTypeCode can be used in Payroll processing to fulfill the legal obligations with regards the Social Insurance Contributions. The code can determine who will pay the contributions to the social insurance authorities or if there is a need to pay at all.

lInsuranceContributionPayerTypeCode appears. The environment may be described by context categories. Within the context categories in EmployeeSocialInsuranceContributionPayerTypeCodeContextElements, the valid portion of code values of EmployeeSocialInsuranceContributionPayerTypeCode may be restricted according to an environment during use.

In certain implementations, GDT EmployeeSocialInsuranceContributionPayerTypeCodeContextElements may have the following structure:

| GDT | | Cat. | Object Class | Property | Represen-tation/As-sociation | Type | Type Name | Card. |
|---|---|---|---|---|---|---|---|---|
| EmployeeSocial-Insurance-Contribution-PayerTypeCode-ContextElements | | | Employee Social Insurance Contribution Payer Type Code Context Elements | | Details | | | |
| | CountryCode | E | Employee Social Insurance Contribution Payer Type Code Context Elements | Country | Code | GDT | CountryCode | 0..1 |

The context category CountryCode can define the context country. It can determine the valid code values for a specific country.

EmployeeSocialInsuranceContributionRuleCode

A EmployeeSocialInsuranceContributionRuleCode is a coded representation of a rule to calculate a social insurance contribution for an employee. An example of EmployeeSocialInsuranceContributionRuleCode is:

<EmployeeSocialInsuranceContributionRuleCode>1</EmployeeSocialInsuranceContributionRuleCode>

'In certain implementations, EmployeeSocialInsuranceContributionRuleCode may have the following structure:

| GDT | | Cat. | Object Class | Property | Representation/Association | Type | Type Name | Len. | Card. | Remarks |
|---|---|---|---|---|---|---|---|---|---|---|
| EmployeeSocial-Insurance-Contribution-RuleCode | | | Employee Social Insurance Contribution | Rule | Code | CDT | Code | 1...4 | | restricted |
| | listID | A | Code List | Identification | Identifier | xsd | token | | 0..1 | |
| | listAgencyID | A | Code List Agency | Identification | Identifier | xsd | token | | 0..1 | |
| | listVersionID | A | Code List | Version | Identifier | xsd | token | | 0..1 | |
| | listAgency-SchemeID | A | Code List Agency | Scheme | Identifier | xsd | token | | 0..1 | |
| | listAgency-Scheme-AgencyID | A | Code List Agency | Scheme Agency | Identifier | xsd | token | | 0..1 | |

For GDT EmployeeSocialInsuranceCo~tributionRuleCode, several country-specific code lists, which are different at runtime, can be assigned to the code. A listID can be from the number range 51400-51499.

EmployeeSocialInsuranceContributionRuleCode can record the information for each social insurance contribution in order to define how this contribution may be calculated.

In certain implementations, the CountryCode of GDT EmployeeSocialInsuranceContributionRuleCode can be FR. The following are examples of customer-specific code semantics for CountryCode FR: "Only paid this in the month 03 if the employee is active the 31 of March and pay the 0.8% of the brut" and "Work accident rate increased by 5%."

The GDT EmployeeSocialInsuranceContributionRuleCodeContextElements can define a dependency or an environment in which the EmployeeSocialInsuranceContributionRuleCode appears. The environment may be described by context categories. With the context categories in EmployeeSocialInsuranceContributionRuleCodeContextElements, the valid portion of code values of EmployeeSocialInsuranceContributionRuleCode may be restricted according to an environment during use.

In certain implementations, GDT EmployeeSocialInsuranceContributionRuleCodeContextElements may have the following structure:

| GDT | | Cat. | Object Class | Property | Representation/Association | Type | Type Name | Card. |
|---|---|---|---|---|---|---|---|---|
| EmployeeSocial-Insurance-Contribution-RuleCodeCon-textElements | | | Employee Social Insurance Contribution Rule Code Context Elements | | Details | | | |
| | CountryCode | E | Employee Social Insurance Contribution Rule Code Context Elements | Country | Code | GDT | CountryCode | 0..1 |

The context category CountryCode can define the context country. It can determine the valid code values for a specific country.

EmployeeSocialInsuranceContributionTypeCode

A EmployeeSocialInsuranceContributionTypeCode is a coded representation of a social insurance contribution type of an employee. An example of EmployeeSocialInsuranceContributionTypeCode is:

<EmployeeSocialInsuranceContributionTypeCode>
1<EmployeeSocialInsuranceContributionTypeCode>

In certain implementations, EmployeeSocialInsuranceContributionTypeCode may have the following structure:

| GDT | Cat. | Object Class | Property | Representation/Association | Type | Type Name | Len. | Card. | Remarks |
|---|---|---|---|---|---|---|---|---|---|
| EmployeeSocial-Insurance-Contribution-TypeCode | | Employee Social Insurance Contribution | Type | Code | CDT | Code | 1..4 | | restricted |

-continued

| GDT | | Cat. | Object Class | Property | Represen-tation/As-sociation | Type | Type Name | Len. | Card. | Remarks |
|---|---|---|---|---|---|---|---|---|---|---|
| | listID | A | Code List | Identification | Identifier | xsd | token | | 0..1 | |
| | listAgencyID | A | Code List Agency | Identification | Identifier | xsd | token | | 0..1 | |
| | listVersionID | A | Code List | Version | Identifier | xsd | token | | 0..1 | |
| | listAgency-SchemeID | A | Code List Agency | Scheme | Identifier | xsd | token | | 0..1 | |
| | listAgency-Scheme-AgencyID | A | Code List Agency | Scheme Agency | Identifier | xsd | token | | 0..1 | |

Several extensible, country-specific code lists, which are different at runtime, may be assigned to the GDT EmployeeSocialInsuranceContributionTypeCode. A listAgencyID can be the ID of the customer (e.g., ID from DE 3055, if listed there). A listVersionID can be the version of the particular code list (e.g., assigned and managed by the customer). A listAgencySchemeID can be the ID of the scheme if the listAgencyID does not come from DE 3055. A listAgencySchemeAgencyID can be the ID of the organization from DE 3055 that manages the listAgencySchemeID scheme.

In certain implementations, the GDT EmployeeSocialInsuranceContributionTypeCode can be the CountryCode CN. In this case, the EmployeeSocialInsuranceContributionTypeCode can have the following attributes: listID="10440," the listVersionID can be a version of the particular code list, listAgencySchemeID="CN," listAgencySchemeAgencyID="ISO 3166-1," listAgencySchemeAgencyID="5" (entry for ISO in DE3055).

The contribution type may be calculated on employee remuneration. Depending on employee/workagreement or placement, the contribution may vary.

In certain implementations, GDT EmployeeSocialInsuranceContributionTypeCode can be the CountryCode FR (France). In this case, the GDT can be used in Personnel Administration to indicate what social insurance contribution may be paid by the employee. The following are examples of customer-specific code semantics for CountryCode FR: Illness (i.e., illness contribution for Alsace), Unemployment (i.e., unemployment contribution for management), IRCANTEC (i.e., retirement for Public Sector contribution), RAFP (i.e., additional retirement for Public Function).

The following dictionary objects may be assigned to this GDT: Data element R/3 (e.g., COTIS).

As described previously, the GDT EmployeeSocialInsuranceContributionTypeCode can be the CountryCode CN. In this case, the GDT can be used in Personnel Administration to indicate what regulatory deduction may be paid by the employee. If the CountryCode is CN, the GDT EmployeeSocialInsuranceContributionTypeCode may use the following codes: pension insurance, unemployment insurance, medical care insurance, on-the-job injury insurance, maternity insurance (i.e., insurance for continued pay in case of maternity), public housing fund.

The EmployeeSocialInsuranceContributionTypeCodeContextElements can define a dependency or an environment in which the EmployeeSocialInsuranceContributionTypeCode appears. The environment may be described by context categories. Within the context categories in EmployeeSocialInsuranceContributionTypeCodeContextElements, the valid portion of code values of EmployeeSocialInsuranceContributionTypeCode may be restricted according to an environment during use.

In certain implementations, GDT EmployeeSocialInsuranceContributionTypeCodeContextElements may have the following structure:

| GDT | | Cat. | Object Class | Property | Represen-tation/As-sociation | Type | Type Name | Card. |
|---|---|---|---|---|---|---|---|---|
| EmployeeSocial-Insurance-Contribution-TypeCode-Context-Elements | | | EmployeeSocial-Insurance-Contribution-TypeCode Context Elements | | Details | | | |
| | CountryCode | E | EmployeeSocial-Insurance-Contribution-TypeCode-Context Elements | Country | Code | GDT | CountryCode | 0..1 |

The context category CountryCode can define the context country. It can determine the valid code values for a specific country.

EmployeeSocialInsuranceContributionIndustrialSectorCode

A EmployeeSocialInsuranceContributionIndustrialSectorCode is the coded representation of the industrial sector of a company for Social Insurance Contribution purposes. An example of EmployeeSocialInsuranceContributionIndustrialSectorCode is:

<EmployeeSocialInsuranceContributionIndustrialSectorCode>1</EmployeeSocialInsuranceContributionIndustrialSectorCode>

In certain implementations, EmployeeSocialInsuranceContributionIndustrialSectorCode may have the following structure:

| GDT | | Cat. | Object Class | Property | Representation/Association | Type | Type Name | Len. | Card. | Remarks |
|---|---|---|---|---|---|---|---|---|---|---|
| EmployeeSocial-Insurance-Contribution-Industrial-SectorCode | | | Employee Social Insurance Contribution Industrial Sector | | Code | CDT | Code | 1..2 | | restricted |
| | listID | A | Code List | Identification | Identifier | xsd | token | | 0..1 | |
| | listAgencyID | A | Code List Agency | Identification | Identifier | xsd | token | | 0..1 | |
| | listVersionID | A | Code List | Version | Identifier | xsd | token | | 0..1 | |
| | listAgency-SchemeID | A | Code List Agency | Scheme | Identifier | xsd | token | | 0..1 | |
| | listAgency-SchemeAgencyID | A | Code List Agency | Scheme Agency | Identifier | xsd | token | | 0..1 | |

For GDT EmployeeSocialInsuranceContributionIndustrialSectorCode, a customer-specific code list can be assigned to the code. A listID can be "10479." A listAgencyID can be the ID of the customer (e.g., ID from DE 3055, if listed there). A listVersionID can be the version of the particular code list (e.g., assigned and managed by the customer). A listAgencySchemeID can be the ID of the scheme if the listAgencyID does not come from DE 3055. A listAgencySchemeAgencyID can be the ID of the organization from DE 3055 that manages the listAgencySchemeID scheme.

The EmployeeSocialInsuranceContributionIndustrialSectorCode can be used in Payroll processing to fulfill the legal obligations with regards to the Social Insurance contributions. The Social Insurance Contribution Industry in combination with the Social Insurance Contribution Code, Social Insurance Contribution group, Social Insurance Contribution subgroup, and the Regional Regulation Code can determine the contribution base and rate that may be used for the proper calculation of the Social Insurance Contribution.

In some implementations, due to the high number of possible standard country and region specific code lists, code values may not be delivered.

The following are examples for user-specific code semantics within the context EmployeeSocialInsuranceContributionTypeCode='1' and EmployeeSocialInsuranceRegionalRegulationsCode='1': Chemistry (i.e., activities related to the composition, structure, properties, and reactions of matter), Industry (i.e., activities related to manufacturing), Others (i.e., all other industries not listed).

The following dictionary objects may be assigned to this GDT in the systems: Data element (e.g., PCN_CONTY).

The GDT EmployeeSocialInsuranceContributionIndustrialSectorCodeContextElements can define a dependency or an environment in which the EmployeeSocialInsuranceContributionIndustrialSector Code appears. The environment may be described by context categories.

Within the context categories in EmployeeSocialInsuranceContributionIndustrialSectorCodeContextElements the valid portion of code values of EmployeeSocialInsuranceContributionIndustrialSectorCode may be restricted according to an environment during use.

In certain implementations, GDT EmployeeSocialInsuranceContributionIndustrialSectorCodeContextElements may have the following structure:

| GDT | | Cat. | Object Class | Property | Representation/Association | Type | Type Name | Card. |
|---|---|---|---|---|---|---|---|---|
| EmployeeSocial-Insurance-Contribution-Industrial-SectorCode-ContextElements | | | Employee Social Insurance Contribution Industrial Sector Code Context Elements | | Details | | | |
| | Employee-Regional-Social-Insurance-Regulations-Code | E | Employee Social Insurance Contribution Industrial Sector Code Context Elements | Regional Social Insurance Regulations | Code | GDT | Employee-Regional-Social-Insurance-Regulations-Code | 0..1 |

-continued

| GDT | | Cat. | Object Class | Property | Represen-tation/As-sociation | Type | Type Name | Card. |
|---|---|---|---|---|---|---|---|---|
| | Employee-Social-Insurance-Contribution-TypeCode | E | Employee Social Insurance Contribution Industrial Sector Code Context Elements | Social Insurance Contribu-tion | Code | GDT | Employee-Social-Insurance-Contribution-TypeCode | 0..1 |

The context category EmployeeRegionalSocialInsuranceRegulationsCode can define the context Regional Social Insurance Regulations. It can determine the valid code values for a specific Regional Regulation. The context category EmployeeSocialInsuranceContributionTypeCode may define the context Social Insurance Contribution. It can determine the valid code values for a specific Social Insurance Contribution.

EmployeeSocialInsurancePaymentRecurrenceCode

A EmployeeSocialInsurancePaymentRecurrenceCode is a coded representation of a payment recurrence to pay contributions to the Social insurance fund. An example of EmployeeSocialInsurancePaymentRecurrenceCode is:

<EmployeeSocialInsurancePaymentRecurrenceCode>AAAA</EmployeeSocialInsurancePaymentRecurrenceCode>

In certain implementations, EmployeeSocialInsurancePaymentRecurrenceCode may have the following structure:

| GDT | | Cat. | Object Class | Property | Represen-tation/As-sociation | Type | Type Name | Len. | Card. | Remarks |
|---|---|---|---|---|---|---|---|---|---|---|
| Employee-Social-Insurance-Payment-Recurrence-Code | | | Employee Social Insurance Payment Recurrence | | Code | CDT | Code | 1..5 | | restricted |
| | listID | A | Code List | Identification | Identifier | xsd | token | | 0..1 | |
| | listAgencyID | A | Code List Agency | Identification | Identifier | xsd | token | | 0..1 | |
| | listVersionID | A | Code List | Version | Identifier | xsd | token | | 0..1 | |
| | listAgency-SchemeID | A | Code List Agency | Scheme | Identifier | xsd | token | | 0..1 | |
| | listAgency-Scheme-AgencyID | A | Code List Agency | Scheme Agency | Identifier | xsd | token | | 0..1 | |

For GDT EmployeeSocialInsurancePaymentRecurrenceCode, several customer-specific code lists can be assigned to the code. A listID can be from the number range 51800-51899.

The EmployeeSocialInsurancePaymentRecurrenceCode can record information for employees that may be relevant for Social insurance. This information can be used to determine the payment date. It can be periodic, but, in general, it is more complex. Social Insurance Funds may define different payment schedule models.

In certain implementations, GDT EmployeeSocialInsurancePaymentRecurrenceCode may be the CountryCode IT (e.g., Italy). In this case, the employee may be able to choose when the contribution will be paid. The following are examples of customer-specific code semantics for Italy: Monthly, Quarterly, Every first Friday of a month.

The following dictionary objects may be assigned to this GDT: Data element R/3 (e.g., P15_CDCAL (R/3 domain: P15_CDCAL)).

The GDT EmployeeSocialInsurancePaymentRecurrenceCodeContextElements can define a dependency or an environment in which the EmployeeSocialInsurancePaymentRecurrenceCode appears. The environment may be described by context categories. Within the context categories in EmployeeSocialInsurancePaymentRecurrenceCodeContextElements, the valid portion of code values of EmployeeSocialInsurancePaymentRecurrenceCode may be restricted according to an environment during use.

In certain implementations, GDT EmployeeSocialInsurancePaymentRecurrenceCodeContextElements may have the following structure:

| GDT | Cat. | Object Class | Property | Represen-tation/As-sociation | Type | Type Name | Card. |
|---|---|---|---|---|---|---|---|
| EmployeeSocial-InsurancePayment-RecurrenceCode-ContextElements | | EmployeeSocial-InsurancePayment-RecurrenceCode Context Elements | | Details | | | |

-continued

| GDT | | Cat. | Object Class | Property | Represen-tation/As-sociation | Type | Type Name | Card. |
|---|---|---|---|---|---|---|---|---|
| | CountryCode | E | EmployeeSocial-InsurancePayment-RecurrenceCode Context Elements | Country | Code | GDT | CountryCode | 0..1 |

The context category CountryCode can define the context country. It can determine the valid code values for a specific country.

EmployeeSocialInsuranceRegionalRegulationsCode

A EmployeeSocialInsuranceRegionalRegulationsCode is the coded representation of the regional regulations that determine the employee social insurance calculation. There can be different regional regulations within a county on how to calculate employee social insurance contributions. The same regulations may apply to more than one region; in this case a single code may represent the regulations for a set of regions. An example of EmployeeSocialInsuranceRegionalRegulationsCode is:

<EmployeeSocialInsuranceRegionalRegulationsCode>1</EmployeeSocialInsuranceRegionalRegulationsCode>

In certain implementations, EmployeeSocialInsuranceRegionalRegulationsCode may have the following structure:

| GDT | | Cat. | Object Class | Property | Represen-tation/As-sociation | Type | Type Name | Len. | Card. | Remarks |
|---|---|---|---|---|---|---|---|---|---|---|
| Employee-Regional-Social-Insurance-Regulations-Code | | | Employee Social Insurance Regional Regulations | | Code | CDT | Code | 1..2 | | restricted |
| | listID | A | Code List | Identification | Identifier | xsd | token | | 0..1 | |
| | listAgencyID | A | Code List Agency | Identification | Identifier | xsd | token | | 0..1 | |
| | listVersionID | A | Code List | Version | Identifier | xsd | token | | 0..1 | |
| | listAgency-SchemeID | A | Code List Agency | Scheme | Identifier | xsd | token | | 0..1 | |
| | listAgency-SchemeAgencyID | A | Code List Agency | Scheme Agency | Identifier | xsd | token | | 0..1 | |

Several extensible, country-specific code lists, which are different at runtime, may be assigned to the GDT EmployeeSocialInsuranceRegionalRegulationsCode. A listAgencyID can be the ID of the customer (e.g., ID from DE 3055, if listed there). A listVersionID can be the version of the particular code list (e.g., assigned and managed by the customer). A listAgencySchemeID can be the ID of the scheme if the listAgencyID does not come from DE 3055. A listAgencySchemeAgencyID can be the ID of the organization from DE 3055 that manages the listAgencySchemeID scheme.

The GDT EmployeeSocialInsuranceRegionalRegulationsCode can be an extensible code list. Lists may be delivered for some countries (e.g., China) that may not include certain regional regulation codes if they are out of the legal coverage scope. Customers can replace the code list with a customer code list.

The following dictionary objects may be assigned to this GDT in the systems: Data element (e.g., PCN_CONAR).

The appendix can be supplemented in the future with code lists for other countries.

In certain implementations, the EmployeeSocialInsuranceRegionalRegulationsCode can be the CountryCode CN. In this case, the EmployeeRegionalTaxRegulationsCode can have the following attributes: listID="22601," listAgencyID="310," and the listVersionID can be a version of the particular code list.

As described previously, the GDT EmployeeSocialInsuranceRegionalRegulationsCode can be the country code CN. In this case, the GDT may use the following codes for the EmployeeSocialInsuranceContributionTypeCode="1" (i.e., pension insurance): 1 (i.e., rest of China), 3 (i.e., Beijing area), 4 (i.e., Shanghai area), 5 (i.e., Tianjin area), 6 (i.e., Nei Mohgol area), 7 (i.e., Shanxi area), 8 (i.e., Hebei area), 9(i.e., Liaoning area), 10 (i.e., Gansu area), 11 (i.e., Shaanxi area).

As described previously, the GDT EmployeeSocialInsuranceRegionalRegulationsCode can be the country code CN. In this case, the GDT may use the following codes for the EmployeeSocialInsuranceContributionTypeCode="2" (i.e., unemployment insurance): 1 (i.e., rest of China), 3 (i.e., Beijing area), 4 (i.e., Shanghai area), 5 (i.e., Tianjin area), 6 (i.e., Nei Mongol area), 7 (i.e., Shanxi area).

As described previously, the GDT EmployeeSocialInsuranceRegionalRegulationsCode can be the country code CN. In this case, the GDT may use the following codes for the EmployeeSocialInsuranceContributionTypeCode="3" (i.e., medical care insurance): 1 (i.e., rest of China), 3 (i.e., Beijing area), 4 (i.e., Shanghai area), 5 (i.e., Tianjin area), 6 (i.e., Nei Mongol area), 7 (i.e., Shanxi area), 8 (i.e., Hebei area), 9(i.e., Liaoning area), 10 (i.e., Gansu area), 11 (i.e., Shaanxi area) 12 (i.e., Henan area), 13 (i.e., Xizang area).

As described previously, the GDT EmployeeSocialInsuranceRegionalRegulationsCode can be the country code CN. In this case, the GDT may use the following codes for the EmployeeSocialInsuranceContributionTypeCode="4" (i.e., on-the-job injury insurance): 1 (i.e., rest of China), 3 (i.e., Hebei area), 4 (i.e., Shanghai area), 5 (i.e., Tianjin area), 6 (i.e., Nei Mongol area), 7 (i.e., Shanxi area), 8 (i.e., Beijing area), 9(i.e., Liaoning area), 10 (i.e., Gansu area), 11 (i.e., Shaanxi area).

As described previously, the GDT EmployeeSocialInsuranceRegionalRegulationsCode can be the country code CN. In this case, the GDT may use the following codes for the EmployeeSocialInsuranceContributionTypeCode="5" (i.e., maternity insurance): 1 (i.e., rest of China), 3 (i.e., Beijing area), 4 (i.e., Shanghai area), 5 (i.e., Nei Mongol area), 6 (i.e., Tianjin area), 7 (i.e., Shanxi area), 8 (i.e., Hebei area).

As described previously, the GDT EmployeeSocialInsuranceRegionalRegulationsCode can be the country code CN. In this case, the GDT may use the following codes for the EmployeeSocialInsuranceContributionTypeCode="6" (i.e., public housing fund): 1 (i.e., rest of China), 3 (i.e., Beijing area), 4 (i.e., Shanghai area), 5 (i.e., Tianjin area), 6 (i.e., Nei Mongol area), 7 (i.e., Shanxi area), 8 (i.e., Hebei area), 9(i.e., Liaoning area), 10 (i.e., Gansu area), 11 (i.e., Shaanxi area).

The GDT EmployeeSocialInsuranceRegionalRegulationsCodeContextElements can define a dependency or an environment in which the EmployeeSocialInsuranceRegionalRegulationsCode appears. The environment may be described by context categories. With the context categories in EmployeeSocialInsuranceRegionalRegulationsCodeContextElements, the valid portion of code values of EmployeeSocialInsuranceRegionalRegulationsCode may be restricted according to an environment during use.

In certain implementations, GDT EmployeeSocialInsuranceRegionalRegulationsCodeContextElements may have the following structure:

| GDT | | Cat. | Object Class | Property | Representation/Association | Type | Type Name | Card. |
|---|---|---|---|---|---|---|---|---|
| Employee-Regional-Social-Insurance-Regulations-CodeContext-Elements | | | Employee-Social-Insurance-Regional-Regulations-Code Context Elements | | Details | | | |
| | CountryCode | E | Employee-Social-Insurance-Regional-Regulations-Code Context Elements | Country | Code | GDT | CountryCode | 0..1 |
| | Employee-Social-Insurance-Contribution-TypeCode | E | Employee-Social-Insurance-Regional-Regulations-Code Context Elements | Social Insurance Contribution Type | Code | GDT | Employee-Social-Insurance-Contribution-TypeCode | 0..1 |

-

The context category EmployeeSocialInsuranceContributionTypeCode can define the context Social Insurance Contribution Type. It can determine the valid code values for a specific Social Insurance Contribution Type. The context category CountryCode may define the context country. It can determine the valid code values for a specific country.

EmployeeTaxationBasisReductionTypeCode

A EmployeeTaxationBasisReductionTypeCode is the coded representation of the reduction type which will be applied to the tax basis of the employee. An example of EmployeeTaxationBasis ReductionTypeCode is:

<EmployeeTaxationBasisReductionTypeCodelistAgencyID="xxxxx" listVersionID="xxxxx">A</EmployeeTaxationBasisReductionTypeCode>

In certain implementations, EmployeeTaxationBasisReductionTypeCode may have the following structure:

| GDT | | Cat. | Object Class | Property | Representation/Association | Type | Type Name | Len. | Card. | Remarks |
|---|---|---|---|---|---|---|---|---|---|---|
| Employee-Taxation-BasisRe-duction-TypeCode | | | Employee Taxation Basis Reduction | | Code | CDT | Code | 1..5 | | restricted |
| | listID | A | Code List | Identification | Identifier | xsd | token | | 0..1 | |
| | listAgencyID | A | Code List Agency | Identification | Identifier | xsd | token | | 0..1 | |
| | listVersionID | A | Code List | Version | Identifier | xsd | token | | 0..1 | |

Several static, country-specific code lists, which are different at runtime, may be assigned to the GDT EmployeeTaxationBasisReductionTypeCode. In certain implementations, the EmployeeTaxationBasis ReductionTypeCode can be the CountryCode IT. In this case, the EmployeeRegionalTaxRegulationsCode can have the following attributes: listID="23401," listAgencyID="310," and the listVersionID can be a version of the particular code list.

The EmployeeTaxationBasisReductionTypeCode can be used to assign types of reductions of the tax basis to an employee.

As described previously, the GDT EmployeeTaxationBasisReductionTypeCode can be the country code IT. In this case, the GDT may use the following codes: A (i.e., only further reduction adjusted to employment duration), B (i.e., reduction waiver), C (i.e., only reduction settlement; no Tax Area adjusted to employment duration), D (i.e., only reduction settlement; last reduction adjusted to employment only).

The GDT EmployeeTaxationBasisReductionTypeCodeContextElements can define a dependency or an environment in which the EmployeeTaxationBasisReductionTypeCode appears. The environment may be described by context categories. Within the context categories in EmployeeTaxationBasisReductionTypeCodeContextElements, the valid portion of code values of EmployeeTaxationBasisReductionTypeCode may be restricted according to an environment during use.

In certain implementations, GDT EmployeeTaxationBasisReductionTypeCodeContextElements may have the following structure:

| GDT | | Cat. | Object Class | Property | Representation/Association | Type | Type Name | Card. |
|---|---|---|---|---|---|---|---|---|
| Employee-Taxation-BasisReduction-TypeCodeContext-Elements | | | EmployeeTaxation-BasisReductionType-Code Context Elements | | Details | | | |
| | CountryCode | E | EmployeeTaxation-BasisReductionType-Code Context Elements | Country | Code | GDT | CountryCode | 0..1 |

The context category CountryCode can define the context country. It can determine the valid code values for a specific country.

EmployeeTaxationBasisTypeCode

A EmployeeTaxationBasisTypeCode is a coded representation of how the taxation basis for the taxation is defined. An example of EmployeeTaxationBasisTypeCode is:

<EmployeeTaxationBasisTypeCodelistID="23301" listAgencyID="310" listVersionID="xxxxx">0</EmployeeTaxationBasisTypeCode>

In certain implementations, EmployeeTaxationBasisTypeCode may have the following structure:

| GDT | | Cat. | Object Class | Property | Representation/Association | Type | Type Name | Len. | Card. | Remarks |
|---|---|---|---|---|---|---|---|---|---|---|
| EmployeeTaxationBasisTypeCode | | | Employee Taxation Basis | Type | Code | CDT | Code | 1 | | restricted |
| | listID | A | Code List | Identification | Identifier | xsd | token | | 0..1 | |
| | listAgencyID | A | Code List Agency | Identification | Identifier | xsd | token | | 0..1 | |
| | listVersionID | A | Code List | Version | Identifier | xsd | token | | 0..1 | |
| | listAgency-SchemeID | A | Code List Agency | Scheme | Identifier | xsd | token | | 0..1 | |
| | listAgency-Scheme-AgencyID | A | Code List Agency | Scheme Agency | Identifier | xsd | token | | 0..1 | |

Several extensible, country-specific code lists, which are different at runtime, may be assigned to the GDT EmployeeTaxationBasisTypeCode. A listAgencyID can be the ID of the customer (e.g., ID from DE 3055, if listed there). A listVersionID can be the version of the particular code list (e.g., assigned and managed by the customer). A listAgencySchemeID can be the ID of the scheme if the listAgencyID does not come from DE 3055. A listAgencySchemeAgencyID can be the ID of the organization from DE 3055 that manages the listAgencySchemeID scheme.

In certain implementations, the EmployeeTaxationBasisTypeCode can be the CountryCode UK. In this case, the EmployeeRegionalTaxRegulationsCode can have the following attributes: listID="23301," listAgencyID="310," and the listVersionID can be a version of the particular code list.

The GDT EmployeeTaxationBasisTypeCode is an extensible code list. Lists may be delivered for some countries that may not include certain regional regulation codes if they are out of the legal coverage scope. Customers can replace the code list with a customer code list.

As described previously, the GDT EmployeeTaxationBasisTypeCode can be the country code UK. In this case, the GDT may use the following codes: cumulative (i.e., The basis for taxation is the cumulative income amount until the moment for the fiscal year.) and week/month (i.e., The basis for taxation is only the income amount of the week or month calculated at the moment).

The GDT EmployeeTaxationBasisTypeCodeContextElements can define a dependency or an environment in which the EmployeeTaxationBasisTypeCode appears. The environment may be described by context categories. Within the context categories in EmployeeTaxationBasisTypeCodeContextElements, the valid portion of code values of EmployeeTaxationBasisTypeCode may be restricted according to an environment during use.

In certain implementations, GDT EmployeeTaxationBasisTypeCodeContextElements may have the following structure:

| GDT | | Cat. | Object Class | Property | Representation/Association | Type | Type Name | Card. |
|---|---|---|---|---|---|---|---|---|
| EmployeeTaxationBasisTypeCodeContextElements | | | Employee-Taxation-BasisType Code Context | | Details | | | |
| | CountryCode | E | Employee Taxation-BasisType Code Context | Country | Code | GDT | CountryCode | 0..1 |

The context category CountryCode can define the context country. It can determine the valid code values for a specific country.

EmployeeTaxationExpatriateTypeCode

A EmployeeTaxationExpatriateTypeCode is a coded representation of the expatriate type of an employee for taxation and reporting purposes. Special employee tax calculation rules may be applied depending on the expatriate type of the employee. An example of EmployeeTaxationExpatriateTypeCode is:

<EmployeeTaxationExpatriateTypeCode>1</EmployeeTaxationExpatriateTypeCode>

In certain implementations, EmployeeTaxationExpatriateTypeCode may have the following structure:

| GDT | | Cat. | Object Class | Property | Representation/Association | Type | Type Name | Len. | Card. | Remarks |
|---|---|---|---|---|---|---|---|---|---|---|
| EmployeeTaxationExpatriateTypeCode | | | Employee Taxation Expatriate | Type | Code | CDT | Code | 1..2 | | restricted |
| | listID | A | Code List | Identification | Identifier | xsd | token | | 0..1 | |
| | listAgencyID | A | Code List Agency | Identification | Identifier | xsd | token | | 0..1 | |
| | listVersionID | A | Code List | Version | Identifier | xsd | token | | 0..1 | |
| | listAgencySchemeID | A | Code List Agency | Scheme | Identifier | xsd | token | | 0..1 | |

-continued

| GDT | | Cat. | Object Class | Property | Representation/ Association | Type | Type Name | Len. | Card. | Remarks |
|---|---|---|---|---|---|---|---|---|---|---|
| | listAgency-scheme-AgencyID | A | Code List Agency | Scheme Agency | Identifier | xsd | token | | 0..1 | |

Several static, country-specific code lists, which are different at runtime, may be assigned to the GDT EmployeeTaxationExpatriateTypeCode. In certain implementations, the EmployeeTaxationExpatriateTypeCode can be the CountryCode CN. In this case, the EmployeeRegionalTaxRegulationsCode can have the following attributes: listID="23401," listAgencyID="310," and the listVersionID can be a version of the particular code list. A listAgencySchemeID can be the ID of the scheme if the listAgencyID does not come from DE 3055. A listAgencySchemeAgencyID can be the ID of the organization from DE 3055 that manages the listAgencySchemeID scheme.

As described previously, the GDT EmployeeTaxationExpatriateTypeCode can be the country code CN. In this case, the GDT may use the following codes: 1 (i.e., Chinese working abroad), 2 (i.e., foreigner), 3 (i.e., foreigner in leading position).

The GDT EmployeeTaxationExpatriateTypeCodeContextElements can define a dependency or an environment in which the EmployeeTaxationExpatriateTypeCode appears. The environment may be described by context categories. Within the context categories in EmployeeTaxationExpatriateTypeCodeContextElements, the valid portion of code values of EmployeeTaxationExpatriateTypeCode may be restricted according to an environment during use.

In certain implementations, GDT EmployeeTaxationExpatriateTypeCodeContextElements may have the following structure:

| GDT | | Cat. | Object Class | Property | Representation/ Association | Type | Type Name | Card. |
|---|---|---|---|---|---|---|---|---|
| EmployeeTaxationExpatriateTypeCodeContextElements | | | Employee-Taxation-Expatriate-Type Code Context Elements | | Details | | | |
| | CountryCode | E | Employee Taxation Expatriate Status Code Context Elements | Country | Code | GDT | CountryCode | 0..1 |

The context category CountryCode can define the context country. It may determine the valid code values for a specific country.

EmployeeTaxationFamilyMemberTypeCode

A EmployeeTaxationFamilyMemberTypeCode is a coded representation of the type of the family members of an employee for taxation purposes. An example of EmployeeTaxationFamilyMemberTypeCode is:

<EmployeeTaxationFamilyMemberTypeCode listAgencyID="xxxxx" listVersionID="xxxxx">01</EmployeeTaxationFamilyMemberTypeCode>

In certain implementations, GDT EmployeeTaxationFamilyMemberTypeCode may have the following structure:

| GDT | Cat. | Object Class | Property | Representation/ Association | Type | Type Name | Len. | Card. | Remarks |
|---|---|---|---|---|---|---|---|---|---|
| EmployeeTaxationFamilyMemberTypeCode | | Employee Taxation Family Member | | Code | CDT | Code | 2 | | restricted |

-continued

| GDT | | Cat. | Object Class | Property | Representation/ Association | Type | Type Name | Len. | Card. | Remarks |
|---|---|---|---|---|---|---|---|---|---|---|
| | listID | A | Code List | Identification | Identifier | xsd | token | | 0..1 | |
| | listAgencyID | A | Code List Agency | Identification | Identifier | xsd | token | | 0..1 | |
| | listVersionID | A | Code List | Version | Identifier | xsd | token | | 0..1 | |
| | listAgency-SchemeID | A | Code List Agency | Scheme | Identifier | xsd | token | | 0..1 | |
| | listAgency-Scheme-AgencyID | A | Code List Agency | Scheme Agency | Identifier | xsd | token | | 0..1 | |

For GDT EmployeeTaxationFamilyMemberTypeCode, a customer-specific code list can be assigned to the code. A listID can be "24801." If the code list is unchanged, a listAgencyID can be "310." Otherwise, a listAgencyID can be the ID of the customer (e.g., ID from DE 3055, if listed there). A listVersionID can be the version of the particular code list (e.g., assigned and managed by the customer). A listAgencySchemeID can be the ID of the scheme if the listAgencyID does not come from DE 3055. A listAgencySchemeAgencyID can be the ID of the organization from DE 3055 that manages the listAgencySchemeID scheme.

The data type GDT EmployeeTaxationFamilyMemberTypeCode may use the following codes: 1 (i.e., spouse), 2 (i.e., children 3 or more years old), 3 (i.e., other family members), 4 (i.e., children less than 3 years old).

The GDT EmployeeTaxationFamilyMemberTypeCodeContextElements can define a dependency or an environment in which the EmployeeTaxationFamilyMemberTypeCode appears. The environment may be described by context categories. Within the context categories in EmployeeTaxationFamilyMemberTypeCodeContextElements the valid portion of code values of EmployeeTaxationFamilyMemberTypeCode may be restricted according to an environment during use.

In certain implementations, GDT EmployeeTaxationFamilyMemberTypeCodeContextElements may have the following structure:

| GDT | | Cat. | Object Class | Property | Representation/ Association | Type | Type Name | Card. |
|---|---|---|---|---|---|---|---|---|
| EmployeeTaxationFamily-MemberType-Code ContextElements | | | Employee-Taxation-Family-Member-TypeCode Context Elements | | Details | | | |
| | CountryCode | E | Employee-Taxation-Family-Member-TypeCode Context Elements | Country | Code | GDT | CountryCode | 0..1 |

The context category CountryCode can define the context country. It may determine the valid code values for a specific country.

EmployeeTaxationMaritalStatusCode

A EmployeeTaxationMaritalStatusCode is a coded representation of the marital status of a person for the purpose of employee taxation. The selection of the appropriate code value is typically defined by legal regulations. An example of EmployeeTaxationMaritalStatusCode is:

<EmployeeTaxationMaritalStatusCode listID="25101" listAgencyID="310" listVersionID="2006">1</EmployeeTaxationMaritalStatusCode>

In certain implementations, EmployeeTaxationMaritalStatusCode may have the following structure:

| GDT | | Cat. | Object Class | Property | Representation/Association | Type | Type Name | Len. | Card. | Remarks |
|---|---|---|---|---|---|---|---|---|---|---|
| Employee-Taxation-Marital-Status-Code | | | Employee Taxation Marital Status | | Code | CDT | Code | 1..2 | | restricted |
| | listID | A | Code List | Identification | Identifier | xsd | token | | 0..1 | |
| | listAgency ID | A | Code List Agency | Identification | Identifier | xsd | token | | 0..1 | |
| | listVersionID | A | Code List | Version | Identifier | xsd | token | | 0..1 | |
| | listAgency-Scheme-ID | A | Code List Agency | Scheme | Identifier | xsd | token | | 0..1 | |
| | listAgency-Scheme-Agency ID | A | Code List Agency | Scheme Agency | Identifier | xsd | token | | 0..1 | |

Several extensible, country-specific code lists, which are different at runtime, may be assigned to the GDT EmployeeTaxationMaritalStatusCode. A listAgencyID can be the ID of the customer (e.g., ID from DE 3055, if listed there). A listVersionID can be the version of the particular code list (e.g., assigned and managed by the customer). A listAgencySchemeID can be the ID of the scheme if the listAgencyID does not come from DE 3055. A listAgencySchemeAgencyID can be the ID of the organization from DE 3055 that manages the listAgencySchemeID scheme.

In certain implementations, the EmployeeTaxationMaritalStatusCode can be the CountryCode US (United States). In this case, the EmployeeTaxationMaritalStatusCode can have the following attributes: listID="25101," listAgencyID="310," and the listVersionID can be a version of the particular code list.

The GDT EmployeeTaxationMaritalStatusCode can be used as the filing status in many income tax withholding exemption forms in the United States (CountryCode US). Code values can be maintained separately by different tax authorities according legal regulations. For example, for the federal income tax withholding purpose, marital status is either single or married. Employees are considered single if they are not married or if they are unmarried heads of households, legally separated from their spouse under a divorce or separate maintenance decree, or if on any day in the calendar year the employee (or his or her spouse) was a nonresident alien. Generally, the employee's marital status on the last day of the year determines his/her tax filing status for the entire year. Different tax authorities may have their own list of possible filing status values.

As described previously, the GDT EmployeeTaxationMaritalStatusCode can be the country code US. In this case, the GDT may use the following codes: 1 (i.e., single), 2 (i.e., married), 3 (i.e., married with single rate), 4 (i.e., head of household), 5 (i.e., married filing jointly), 6 (i.e., married filing separately), 7 (i.e., married filing separately on same return), 8 (i.e., married with 2 incomes), 9 (i.e., married with 1 income), 10 (i.e., married-blind 1), 11 (i.e., married-blind 2), 12 (i.e., single—rate A), 13 (i.e., married—rate B), 14 (i.e., rate C), 15 (i.e., rate D), 16 (i.e., rate E), 17 (i.e., qualified widow/er), 18 (i.e., single or married not living with spouse claiming all), 19 (i.e., single or married not living with spouse claiming none), 20 (i.e., married claiming all), 21 (i.e., married claiming half), 22 (i.e., married claiming none), 23 (i.e., head of household claiming all), 24 (i.e., head of household claiming none), 25 (i.e., single or married with 2 or more incomes), 26 (i.e., married with 1 income), 27 (i.e., A—married filing separately)), 28 (i.e., B—head of household), 29 (i.e., C—married filing jointly 1 income), 30 (i.e., D—married filing jointly 2 incomes), 31 (i.e., E—exempt), 32 (i.e., F—single), 33 (i.e., A: single), 34 (i.e., B: married—2 incomes), 35 (i.e., C: married—1 income), 36 (i.e., D: married filing separately), 37 (i.e., E: head of household), 38 (i.e., single/head of household), 39 (i.e., married or single), 40 (i.e., married both spouses work), 41 (i.e., married with one spouse working), 42 (i.e., civil union), 43 (i.e., civil union, but withhold at the higher single rate), 44 (i.e., single, head of household or qualified widow/er), 45 (i.e., married filing jointly, with spouse filing another W-5), 46 (i.e., married filing jointly, without spouse filing another W-5).

As described previously, the GDT EmployeeTaxationMaritalStatusCode can be the country code US. In this case, the GDT may use the following codes for the EmployeeTaxWithholdingExemptionCertificateTypeCode=1 (i.e., Federal W-4): 1 (i.e., single), 2 (i.e., married), 3 (i.e., married with single rate).

The following codes may be used for GDT EmployeeTaxationMaritalStatusCode when the CountryCode=US and the EmployeeTaxWithholdingExemptionCertificateTypeCode=2 (i.e., Federal W-5): 44 (i.e., single, head of household or qualified widow/er), 45 (i.e., married filing jointly with spouse filing another W-5), 46 (i.e., married filing jointly without spouse filing another W-5).

The following codes may be used for GDT EmployeeTaxationMaritalStatusCode when the CountryCode is US and the RegionCode=AL (i.e., Alabama): 1 (i.e., single), 2 (i.e., married), 4 (i.e., head of household).

The following codes may be used for GDT EmployeeTaxationMaritalStatusCode when the CountryCode is US and the RegionCode=AR (i.e., Arkansas): 1 (i.e., single), 4 (i.e., head of household), 5 (i.e., married filing jointly).

The following codes may be used for GDT EmployeeTaxationMaritalStatusCode when the CountryCode is US and the RegionCode=CA (i.e., California): 4 (i.e., head of household), 25 (i.e., single or married with 2 or more incomes), 26 (i.e., married with 1 income).

The following codes may be used for GDT EmployeeTaxationMaritalStatusCode when the CountryCode is US and the RegionCode=CO (i.e., Colorado): 1 (i.e., single), 2 (i.e., married), 3 (i.e., married with single rate).

The following codes may be used for GDT EmployeeTaxationMaritalStatusCode when the CountryCode is US and the RegionCode=CT (i.e., Connecticut): 27 (i.e., A—married filing separately), 28 (i.e., B—head of household), 29 (i.e., C—married filing jointly 1 income), 30 (i.e., D—married filing jointly 2 incomes), 31 (i.e., E—exempt), 32 (i.e., F—single).

The following codes may be used for GDT EmployeeTaxationMaritalStatusCode when the CountryCode is US and the RegionCode=DE (i.e., Delaware): 1 (i.e., single), 2 (i.e., married), 5 (i.e., married filing jointly).

The following codes may be used for GDT EmployeeTaxationMaritalStatusCode when the CountryCode is US and the RegionCode=GA (i.e., Georgia): 33 (i.e., A: single), 34 (i.e., B: married—2 incomes), 35 (i.e., C: married—1 income), 36 (i.e., D: married filing separately), 37 (i.e., E: head of household).

The following codes may be used for GDT EmployeeTaxationMaritalStatusCode when the CountryCode is US and the RegionCode=HI (i.e., Hawaii): 1 (i.e., single) and 2 (i.e., married).

The following codes may be used for GDT EmployeeTaxationMaritalStatusCode when the CountryCode is US and the RegionCode=ID (i.e., Idaho): 2 (i.e., married) and 38 (i.e., single/head of household).

The following codes may be used for GDT EmployeeTaxationMaritalStatusCode when the CountryCode is US and the RegionCode=IA (i.e., Iowa): 1 (i.e., single) and 2 (i.e., married).

The following codes may be used for GDT EmployeeTaxationMaritalStatusCode when the CountryCode is US and the RegionCode=KS (i.e., Kansas): 1 (i.e., single) and 2 (i.e., married).

The following codes may be used for GDT EmployeeTaxationMaritalStatusCode when the CountryCode is US and the RegionCode=ME (i.e., Maine): 1 (i.e., single), 8 (i.e., married with 2 incomes), 9 (i.e., married with 1 income).

The following codes may be used for GDT EmployeeTaxationMaritalStatusCode when the CountryCode is US and the RegionCode=MA (i.e., Massachusetts): 4 (i.e., head of household), 10 (i.e., married—blind 1), 11 (i.e., married—blind 2), 38 (i.e., single/head of household).

The following codes may be used for GDT EmployeeTaxationMaritalStatusCode when the CountryCode is US and the RegionCode=MN (i.e., Minnesota): 1 (i.e., single) and 2 (i.e., married).

The following codes may be used for GDT EmployeeTaxationMaritalStatusCode when the CountryCode is US and the RegionCode=MS (i.e., Mississippi): 1 (i.e., single), 2 (i.e., married), 4 (i.e., head of household), 5 (i.e., married filing jointly).

The following codes may be used for GDT EmployeeTaxationMaritalStatusCode when the CountryCode is US and the RegionCode=MO (i.e., Missouri: 1 (i.e., single), 4 (i.e., head of household), 39 (i.e., married or single), 40 (i.e., married both spouses work).

The following codes may be used for GDT EmployeeTaxationMaritalStatusCode when the CountryCode is US and the RegionCode=MT (i.e., Montana): 1 (i.e., single) and 2 (i.e., married).

The following codes may be used for GDT EmployeeTaxationMaritalStatusCode when the CountryCode is US and the RegionCode=NE (i.e., Nebraska): 1 (i.e., single) and 2 (i.e., married).

The following codes may be used for GDT EmployeeTaxationMaritalStatusCode when the CountryCode is US and the RegionCode=NJ (i.e., New Jersey): 12 (i.e., single—rate A), 13 (i.e., married—rate B), 14 (i.e., rate C), 15 (i.e., rate D), 16 (i.e., rate E).

The following codes may be used for GDT EmployeeTaxationMaritalStatusCode when the CountryCode is US and the RegionCode=NM (i.e., New Mexico): 1 (i.e., single) and 2 (i.e., married).

The following codes may be used for GDT EmployeeTaxationMaritalStatusCode when the CountryCode is US and the RegionCode=NY (i.e., New York): 1 (i.e., single) and 2 (i.e., married).

The following codes may be used for GDT EmployeeTaxationMaritalStatusCode when the CountryCode is US and the RegionCode=NC (i.e., North Carolina): 1 (i.e., single), 2 (i.e., married), 4 (i.e., head of household).

The following codes may be used for GDT EmployeeTaxationMaritalStatusCode when the CountryCode is US and the RegionCode=ND (i.e., New Dakota): 1 (i.e., single), 2 (i.e., married), 4 (i.e., head of household).

The following codes may be used for GDT EmployeeTaxationMaritalStatusCode when the CountryCode is US and the RegionCode=OK (i.e., Oklahoma): 1 (i.e., single), 2 (i.e., married), 3 (i.e., married and single rate).

The following codes may be used for GDT EmployeeTaxationMaritalStatusCode when the CountryCode is US and the RegionCode=OR (i.e., Oregon): 1 (i.e., single), 2 (i.e., married), 3 (i.e., married with single rate).

The following codes may be used for GDT EmployeeTaxationMaritalStatusCode when the CountryCode is US and the RegionCode=RI (i.e., Rhode Island): 1 (i.e., single), 2 (i.e., married), 3 (i.e., married with single rate).

The following codes may be used for GDT EmployeeTaxationMaritalStatusCode when the CountryCode is US and the RegionCode=UT (i.e., Utah): 1 (i.e., single), 2 (i.e., married), 3 (i.e., married with single rate).

The following codes may be used for GDT EmployeeTaxationMaritalStatusCode when the CountryCode is US and the RegionCode=VT (i.e., Vermont): 1 (i.e., single), 2 (i.e., married), 3 (i.e., married with single rate), 42 (i.e., civil union), 43 (i.e., civil union, but withhold at the higher single rate).

The following codes may be used for GDT EmployeeTaxationMaritalStatusCode when the CountryCode is US and the RegionCode=WV (i.e., West Virginia): 1 (i.e., single) and 2 (i.e., married).

The following codes may be used for GDT EmployeeTaxationMaritalStatusCode when the CountryCode is US and the RegionCode=WI (i.e., Wisconsin): 1 (i.e., single), 2 (i.e., married), 3 (i.e., married with single rate).

The following codes may be used for GDT EmployeeTaxationMaritalStatusCode when the CountryCode is US and the RegionCode=DC (i.e., Washington D.C:): 1 (i.e., single), 4 (i.e., head of household), 5 (i.e., married filing jointly), 6 (i.e., married filing separately), 7 (i.e., married filing separately on same return).

The following codes may be used for GDT EmployeeTaxationMaritalStatusCode when the CountryCode is US and the RegionCode=PR (i.e., Puerto Rico): 18 (i.e., single or married not living with spouse claiming all), 19 (i.e., single or married not living with spouse claiming none), 20 (i.e., married claiming all), 21 (i.e., married claiming half), 22 (i.e., married claiming none), 23 (i.e., head of household claiming all), 24 (i.e., head of household claiming none).

The following codes may be used for GDT EmployeeTaxationMaritalStatusCode when the CountryCode is US and the RegionCode=AS (i.e., American Samoa): 1 (i.e., single), 2 (i.e., married), 4 (i.e., head of household).

The following codes may be used for GDT EmployeeTaxationMaritalStatusCode when the CountryCode is US and the RegionCode=GU (i.e., Guam): 1 (i.e., single), 2 (i.e., married), 4 (i.e., head of household).

The following codes may be used for GDT EmployeeTaxationMaritalStatusCode when the CountryCode is US and the RegionCode=VI (i.e., Virgin Island): 1 (i.e., single), 2 (i.e., married), 4 (i.e., head of household).

The following codes may be used for GDT EmployeeTaxationMaritalStatusCode when the CountryCode is US and the RegionCode=MP (i.e., N. Mariana Islands): 1 (i.e., single), 2 (i.e., married), 4 (i.e., head of household).

The GDT EmployeeTaxationMaritalStatusCodeContextElements can define a dependency or an environment in which the EmployeeTaxationMaritalStatusCode appears. The environment may be described by context categories. Within the context categories in EmployeeTaxationMaritalStatusCodeContextElements, the valid portion of code values of EmployeeTaxationMaritalStatusCode may be restricted according to an environment during use.

In certain implementations, GDT EmployeeTaxationMaritalStatusCodeContextElements may have the following structure:

| GDT | | Cat. | Object Class | Property | Representation/ Association | Type | Type Name | Card. |
|---|---|---|---|---|---|---|---|---|
| EmployeeTaxationMaritalStatusCodeContextElements | | | EmployeeTaxationMaritalStatus Code Context Elements | | Details | | | |
| | CountryCode | E | EmployeeTaxationMaritalStatus Code Context Elements | Country | Code | GDT | CountryCode | 0..1 |
| | RegionCode | E | EmployeeTaxationMaritalStatus Code Context Elements | Region | Code | GDT | RegionCode | 0..1 |
| | TaxAuthorityID | E | EmployeeTaxationMaritalStatus Code Context Elements | Indentification | Identifier | GDT | BusinessPartnerInternalID | 0..1 |
| | EmployeeTaxWithholdingExemptionCertificateTypeCode | E | EmployeeTaxMaritalStatus Code Context Elements | Indentification | Identifier | GDT | EmployeeTaxWithholdingExemptionCertificateTypeCode | 0..1 |

The context category CountryCode can define the context country. It can determine the valid code values for a specific country. The context category RegionCode may define the context region. It can determine the valid code values for a specific region. The context category TaxAuthorityID can define the context business partner. It may determine the valid code values for a specific tax authority. The context category EmployeeTaxWithholdingExemptionCertificateTypeCode can define the context employee tax withholding form code. It can determine the valid code values for a specific employee tax withholding exemption certificate type.

EmployeeTaxationMethodID

A GDT EmployeeTaxationMethodID is an identifier for the method of calculating the employee tax. This identifier can be issued and provided by tax authorities. An example of GDT EmployeeTaxationMethodID is:

<EmployeeTaxationMethodID>461L</EmployeeTaxationMethodID>

This is an example for a method in the United Kingdom. The Tax ID as 461L means personal allowances of £4615, and the letter L is added for an employee who is claiming the basic personal allowance.

In certain implementations, GDT EmployeeTaxationMethodID may have the following structure:

| GDT | | Cat. | Object Class | Property | Representation/Association | Type | Type Name | Len. | Card. | Remarks |
|---|---|---|---|---|---|---|---|---|---|---|
| EmployeeTaxationMethodID | | | Employee Taxation Method | Identification | Identifier | CDT | Identifier | 1..8 | | restricted |
| | schemeID | A | Identification Scheme | Identification | Identifier | xsd | token | 1..60 | 0..1 | |
| | schemeVersionID | A | Identification Scheme | Version | Identifier | xsd | token | 1..15 | 0..1 | |
| | schemeAgencyID | A | Identification Scheme Agency | Identification | Identifier | xsd | token | 1..60 | | |

Values may be assigned to the attributes of GDT EmployeeTaxationMethodID. A schemeID can be released and maintained by the responsible organization of the ID scheme. The GDT owner can retrieve the correct ID from the responsible organization. If there is no unique ID available, the name of the identifier or identifier type can be entered, which may be used in the corresponding standard, specification, or scheme of the responsible organization. A schemeVersionID can be the version of the ID scheme. It may be released and maintained by the organization, which is typically named in schemeAgencyID. The owner can retrieve the relevant version ID from the responsible organization. If there is no version for the ID scheme, the version of the standard, the specification, or the scheme can be used. A schemeAgencyID can be the ID of the organization maintaining the ID scheme (e.g. DUNS, EAN . . . ) from code list DE 3055.

In certain implementations, the GDT EmployeeTaxationMethodID can be the CountryCode UK. In this case, the EmployeeTaxationMethodID can have the following values: schemeAgencyID="UK," schemeAgencySchemeID="ISO 3166-1," schemeAgencySchemeAgencyID="5" (ISO).

As described previously, the GDT EmployeeTaxationMethodID can be the CountryCode UK. In this case, the information recorded by GDT EmployeeTaxationMethodID is for employees of the United Kingdom and relevant for the tax contribution calculation in that country. In principle, a British tax code is typically comprised of the following 3 elements: Scottish area indicator (S) if the tax code belongs to Scotland, Tax numbers indicating the tax allowance/extra tax recover for the tax calculation, Tax letter indicating the tax table to be used for the employee. Identifiers are issued by Her Majesty Customs and Revenue (e.g., BR, NT, OT, 453L, 458L, 519H, S519, etc.).

EmployeeTaxationMethodIdentificationOriginCode

A GDT EmployeeTaxationMethodIdentificationOriginCode is a coded representation of the origin of the taxation method identification, where the origin can be a paper-based form or an electronic file. An example of GDT EmployeeTaxationMethodIdentificationOriginCode is:

<EmployeeTaxationMethodIdentificationOriginCode listID="24701" listAgencyID="310" listVersionID="xxxxx">P45</EmployeeTaxationMethodIdentificationOrigin Code>

In certain implementations, GDT EmployeeTaxationMethodIdentificationOriginCode may have the following structure:

| GDT | | Cat. | Object Class | Property | Representation/Association | Type | Type Name | Len. | Card. | Remarks |
|---|---|---|---|---|---|---|---|---|---|---|
| EmployeeTaxationMethodIdentificationOriginCode | | | EmployeeTaxationMethodIdentification | Origin | Code | CDT | Code | 1..4 | | restricted |
| | listID | A | Code List | Identification | Identifier | xsd | token | | 0..1 | |
| | listAgencyID | A | Code List Agency | Identification | Identifier | xsd | token | | 0..1 | |
| | listVersionID | A | Code List | Version | Identifier | xsd | token | | 0..1 | |
| | listAgencySchemeID | A | Code List Agency | Scheme | Identifier | xsd | token | | 0..1 | |
| | listAgencySchemeAgencyID | A | Code List Agency | Scheme Agency | Identifier | xsd | token | | 0..1 | |

Several extensible, country-specific code lists, which are different at runtime, may be assigned to the GDT EmployeeTaxationMethodIdentificationOriginCode. A listAgencyID can be the ID of the customer (e.g., ID from DE 3055, if listed there). A listVersionID can be the version of the particular code list (e.g., assigned and managed by the customer). A listAgencySchemeID can be the ID of the scheme if the listAgencyID does not come from DE 3055. The listAgencySchemeAgencyID can be the ID of the organization from DE 3055 that manages the listAgencySchemeID scheme.

In certain implementations, the EmployeeTaxationMethodIdentificationOriginCode can be the CountryCode UK. In this case, the EmployeeTaxationMethodIdentificationOriginCode can have the following attributes: listID="24701," listAgencyID="310," and the listVersionID can be a version of the particular code list.

The GDT EmployeeTaxationMethodIdentificationOriginCode is an extensible code list. Lists may be delivered for some countries that will not contain certain regional regulation codes if they are out of the legal coverage scope. Customers can replace the code list with a customer code list.

code change beginning of the year.), P9 form (e-filling) (i.e., The taxation Method ID has been provided by an electronic P9 for tax code change beginning of the year.), P160 form (i.e. The taxation Method ID has been provided by a P160 form for retired person.).

The GDT EmployeeTaxationMethodIdentificationOriginCodeContextElements can define a dependency or an environment in which the EmployeeTaxationMethodIdentificationOriginCode appears. The environment may be described by context categories. Within the context categories in EmployeeTaxationMethodIdentificationOriginCodeContextElements, the valid portion of code values of EmployeeTaxationMethodIdentificationOriginCode may be restricted according to an environment during use.

In certain implementations, GDT EmployeeTaxationMethodIdentificationOriginCodeContextElements may have the following structure:

| GDT | | Cat. | Object Class | Property | Representation/ Association | Type | Type Name | Card. |
|---|---|---|---|---|---|---|---|---|
| EmployeeTaxationMethodIdentificationOriginCodeContextElements | | | EmployeeTaxationMethodIdentificationOrigin Code Context Elements | | Details | | | |
| | CountryCode | E | EmployeeTaxationMethodIdentificationOrigin Code Context Elements | Country | Code | GDT | CountryCode | 0..1 |

As described previously, the GDT EmployeeTaxationMethodIdentificationOriginCode can be the country code UK. In this case, the GDT may use the following codes: P38 form (i.e., The taxation Method ID has been provided by a P38 form for student.), P45 form (i.e., The taxation Method ID has been provided by a P45 form for leaver.), P46 form (i.e., The taxation Method ID has been provided by a P46 form for starter.), P6 form (i.e., The taxation Method ID has been provided by a P6 form for a tax code change.), P7 form (e-filling) (i.e., The taxation Method ID has been provided by an electronic P7 for a tax code change.), P9 form (i.e. The taxation Method ID has been provided by a P9 form for tax The context category CountryCode can define the context country. It can determine the valid code values for a specific country.

EmployeeTaxationRuleCode

A GDT EmployeeTaxationRuleCode is a coded representation of a taxation rule for an employee. An example of GDT EmployeeTaxationRuleCode is:

<EmployeeTaxationRuleCode listAgencyID="“xxxxx" listVersionID="xxxxx">NOCN</EmployeeTaxationRuleCode>

In certain implementations, GDT EmployeeTaxationRuleCode may have the following structure:

| GDT | | Cat. | Object Class | Property | Representation/ Association | Type | Type Name | Len. | Card. | Remarks |
|---|---|---|---|---|---|---|---|---|---|---|
| EmployeeTaxationRuleCode | | | Employee Taxation Rule | | Code | CDT | Code | 1..4 | | restricted |
| | listID | A | Code List | Identification | Identifier | xsd | token | | 0..1 | |

-continued

| GDT | | Cat. | Object Class | Property | Representation/ Association | Type | Type Name | Len. | Card. | Remarks |
|---|---|---|---|---|---|---|---|---|---|---|
| | listAgencyID | A | Code List Agency | Identification | Identifier | xsd | token | | 0..1 | |
| | listVersionID | A | Code List | Version | Identifier | xsd | token | | 0..1 | |
| | listAgencySchemeID | A | Code List Agency | Scheme | Identifier | xsd | token | | 0..1 | |
| | listAgencySchemeAgencyID | A | Code List Agency | Scheme Agency | Identifier | xsd | token | | 0..1 | |

Several extensible, country-specific code lists, which are different at runtime, may be assigned to the GDT EmployeeTaxationRuleCode. A listAgencyID can be the ID of the customer (e.g., ID from DE 3055, if listed there). A listVersionID can be the version of the particular code list (e.g., assigned and managed by the customer). A listAgencySchemeID can be the ID of the scheme if the listAgencyID does not come from DE 3055. The listAgencySchemeAgencyID can be the ID of the organization from DE 3055 that manages the listAgencySchemeID scheme.

In certain implementations, the GDT EmployeeTaxationRuleCode can be the CountryCode IT (Italy). In this case, the EmployeeTaxationRuleCode can have the following attributes: listID="23501," listAgencyID="IT," listAgencySchemeID="ISO 3166-1," listAgencySchemeAgencyID="5" (ISO).

The following codes are the official code values according to Italian regulations and may be used for GDT EmployeeTaxationRuleCode when the CountryCode is IT: CNCA (i.e., married—tax exempt spouse), CNMA (i.e., no spouse), CNNC (i.e., married—no tax exempt spouse), NOCN (i.e., not married).

The GDT EmployeeTaxationRuleCodeContextElements can define a dependency or an environment in which the EmployeeTaxationRuleCode appears. The environment may be described by context categories. Within the context categories in EmployeeTaxationRuleCodeContextElements, the valid portion of code values of EmployeeTaxationRuleCode may be restricted according to an environment during use.

In certain implementations, GDT EmployeeTaxationRuleCodeContextElements may have the following structure:

| GDT | | Cat. | Object Class | Property | Representation/ Association | Type | Type Name | Card. |
|---|---|---|---|---|---|---|---|---|
| EmployeeTaxationRuleCodeContextElements | | | Employee Taxation Rule Code Context Elements | | Details | | | |
| | CountryCode | E | Employee Taxation Rule Code Context Elements | Country | Code | GDT | CountryCode | 0..1 |

As described previously, the GDT EmployeeTaxationRuleCode can be the CountryCode IT. In this case, the information recorded by GDT EmployeeTaxationRuleCode is for employees in Italy and relevant for the tax calculation in that country. This code assignment may allow the definition of different types of tax deductions to which the employee is entitled. This code may take into account the FamilyMemberCategoryCode to define the different due deductions according to the number of family members.

The context category CountryCode can define the context country. It can determine the valid code values for a specific country.

EmployeeTaxationSchemeCode

A GDT EmployeeTaxationSchemeCode is a coded representation of a taxation scheme for an employee. An example of GDT EmployeeTaxationSchemeCode is:

<EmployeeTaxationSchemeCode>IRPEF</EmployeeTaxationSchemeCode>

In certain implementations, GDT EmployeeTaxationSchemeCode may have the following structure:

| GDT | | Cat. | Object Class | Property | Representation/ Association | Type | Type Name | Len. | Card. | Remarks |
|---|---|---|---|---|---|---|---|---|---|---|
| Employee-TaxationScheme-Code | | | Employee Taxation Scheme | | Code | CDT | Code | 1...5 | | restricted |
| | listID | A | Code List | Identification | Identifier | xsd | token | | 0..1 | |
| | listAgency-ID | A | Code List Agency | Identification | Identifier | xsd | token | | 0..1 | |
| | listVer-sionID | A | Code List | Version | Identifier | xsd | token | | 0..1 | |
| | listAgency-Scheme-ID | A | Code List Agency | Scheme | Identifier | xsd | token | | 0..1 | |
| | listAgency-Scheme-Agency-ID | A | Code List Agency | Scheme Agency | Identifier | xsd | token | | 0..1 | |

Several extensible, country-specific code lists, which are different at runtime, may be assigned to the GDT EmployeeTaxationSchemeCode. A listAgencyID can be the ID of the customer (e.g., ID from DE 3055, if listed there). A listVersionID can be the version of the particular code list (e.g., assigned and managed by the customer). A listAgencySchemeID can be the ID of the scheme if the listAgencyID does not come from DE 3055. The listAgencySchemeAgencyID can be the ID of the organization from DE 3055 that manages the listAgencySchemeID scheme.

In certain implementations, the EmployeeTaxationSchemeCode can be the CountryCode IT. In this case, the EmployeeTaxationSchemeCode can have the following attributes: listID="24901," listAgencyID="310," and the listVersionID can be a version of the particular code list.

This code can be used to identify a set of taxes in Personnel Administration to be paid to an entity by the employee. As described previously, the GDT EmployeeTaxationSchemeCode can be the country code IT. In this case, the code can be used in Personnel Administration to allow the user the assignation of a long list of taxes to be paid by an employee only by the assignation of this code.

As described previously, the GDT EmployeeTaxationSchemeCode can be the country code IT. In this case, the GDT may use the following codes: AAAA (i.e., all taxations), IRPEI (i.e., deceased), IRPEF (i.e., IRPEF taxation).

The GDT EmployeeTaxationSchemeCodeContextElements can define a dependency or an environment in which the EmployeeTaxationSchemeCode appears. The environment may be described by context categories. Within the context categories in EmployeeTaxationSchemeCodeContextElements, the valid portion of code values of EmployeeTaxationSchemeCode may be restricted according to an environment during use.

In certain implementations, GDT EmployeeTaxationSchemeCodeContextElements may have the following structure:

| GDT | | Cat. | Object Class | Property | Representation/ Association | Type | Type Name | Card. |
|---|---|---|---|---|---|---|---|---|
| Employee-TaxationScheme-CodeContextElements | | | EmployeeTaxation-SchemeCode Context Elements | | Details | | | |
| | Country-Code | E | EmployeeTaxation-SchemeCode Context Elements | Country | Code | GDT | CountryCode | 0..1 |

The context category CountryCode can define the context country. It can determine the valid code values for a specific country.

EmployeeTaxRefundWithholdingReasonCode

A GDT EmployeeTaxRefundWithholdingReasonCode is a coded representation of a reason why a tax refund has been withheld. An example of GDT EmployeeTaxRefundWithholdingReasonCode is:

<EmployeeTaxRefundWithholdingReasonCode>1 <EmployeeTaxRefundWithholdingReasonCode>

In certain implementations, GDT EmployeeTaxRefundWithholdingReasonCode may have the following structure:

| GDT | | Cat. | Object Class | Property | Represen-tation/As-sociation | Type | Type Name | Len. | Card. | Remarks |
|---|---|---|---|---|---|---|---|---|---|---|
| Employee-TaxRefund-Withholding-ReasonCode | | | Employee-TaxRefund-Withholding | Reason | Code | CDT | Code | 1..4 | | restricted |
| | listID | A | Code List | Identification | Identifier | xsd | token | | 0..1 | |
| | listAgencyID | A | Code List Agency | Identification | Identifier | xsd | token | | 0..1 | |
| | listVersionID | A | Code List | Version | Identifier | xsd | token | | 0..1 | |
| | listAgency-SchemeID | A | Code List Agency | Scheme | Identifier | xsd | token | | 0..1 | |
| | listAgency-SchemeAgencyID | A | Code List Agency | Scheme Agency | Identifier | xsd | token | | 0..1 | |

Several extensible, country-specific code lists, which are different at runtime, may be assigned to the GDT EmployeeTaxRefundWithholdingReasonCode. A listAgencyID can be the ID of the customer (e.g., ID from DE 3055, if listed there). A listVersionID can be the version of the particular code list (e.g., assigned and managed by the customer). A listAgencySchemeID can be the ID of the scheme if the listAgencyID does not come from DE 3055. The listAgencySchemeAgencyID can be the ID of the organization from DE 3055 that manages the listAgencySchemeID scheme.

In certain implementations, the EmployeeTaxRefundWithholdingReasonCode can be the CountryCode UK. In this case, the EmployeeTaxRefundWithholdingReasonCode can have the following attributes: listID="23601," listAgencyID="310," and the listVersionID can be a version of the particular code list.

As described previously, the GDT EmployeeTaxRefundWithholdingReasonCode can be the CountryCode UK. In this case, the information recorded by GDT EmployeeTaxRefundWithholdingReasonCode is for employees of the United Kingdom and relevant for the tax contribution calculation in that country.

The following codes may be used for GDT EmployeeTaxRefundWithholdingReasonCode when the CountryCode is UK: 1 (i.e., on strike) and 2 (i.e., on suspension).

The GDT EmployeeTaxRefundWithholdingReasonCodeContextElements can define a dependency or an environment in which the EmployeeTaxRefundWithholdingReasonCode appears. The environment may be described by context categories. With the context categories in EmployeeTaxRefundWithholdingReasonCodeContextElements, the valid portion of code values of EmployeeTaxRefundWithholdingReasonCode may be restricted according to an environment during use.

In certain implementations, GDT EmployeeTaxRefundWithholdingReasonCodeContextElements may have the following structure:

| GDT | | Cat. | Object Class | Property | Represen-tation/As-sociation | Type | Type Name | Card. |
|---|---|---|---|---|---|---|---|---|
| Employee-TaxRefund-Withholding-ReasonCode-Context-Elements | | | Employee-TaxRefund-Withholding-ReasonCode-Context Elements | | Details | | | |
| | CountryCode | E | Employee-TaxRefund-Withholding-ReasonCode-Context Elements | Country | Code | GDT | CountryCode | 0..1 |

The context category CountryCode can define the context country. It can determine the valid code values for a specific country.

EmployeeTimeAccountAccrualRuleCode

A GDT EmployeeTimeAccountAccrualRuleCode is the coded representation of a rule for accruing an employee time account. An accrual rule for an employee time account is a rule that determines when and how much can be posted to a time account. Time account accrual may imply an increase in the balance of a time account. An example of GDT EmployeeTimeAccountAccrualRuleCode is:

<EmployeeTimeAccountAccrualRuleCode>1</EmployeeTimeAccountAccrualRuleCode>

In certain implementations, GDT EmployeeTimeAccountAccrualRuleCode may have the following structure:

-

| GDT | | Cat. | Object Class | Property | Representation/Association | Type | Type Name | Len. | Card. | Remarks |
|---|---|---|---|---|---|---|---|---|---|---|
| Employee-TimeAccount-AccrualRule-Code | | | Employee Time Account Accrual Rule | | Code | CDT | Code | 1..6 | | Restricted |
| | listID | A | Code List | Identification | Identifier | xsd | token | | 0..1 | |
| | listAgencyID | A | Code List Agency | Identification | Identifier | xsd | token | | 0..1 | |
| | listVersionID | A | Code List | Version | Identifier | xsd | token | | 0..1 | |
| | listAgency-SchemeID | A | Code List Agency | Scheme | Identifier | xsd | token | | 0..1 | |
| | listAgency-SchemeAgencyID | A | Code List Agency | Scheme Agency | Identifier | xsd | token | | 0..1 | |

For GDT EmployeeTimeAccountAccrualRuleCode, a customer-specific code list can be assigned to the code. A listID can be "10207." If the code list is unchanged, a listAgencyID can be "310." Otherwise, a listAgencyID can be the ID of the customer (e.g., ID from DE 3055, if listed there). A listVersionID can be the version of the particular code list (e.g., assigned and managed by the customer). A listAgencySchemeID can be the ID of the scheme if the listAgencyID does not come from DE 3055. The listAgencySchemeAgencyID can be the ID of the organization from DE 3055 that manages the listAgencySchemeID scheme.

The EmployeeTimeAccountAccrualRuleCode can be used to specify an employee's absence entitlements (e.g., leave accounts).

The data type GDT EmployeeTimeAccountAccrualRuleCode may use the following example codes: Annual leave 30 days or 2 days.

EmployeeTimeAccountLineItemTypeCode

The GDT EmployeeTimeAccountLineItemTypeCode is the coded representation of the type of a line item of an employee time account according to criteria resulting from laws, agreements, company requirements, control tasks, etc. The line item may contain a quantitative change of an employee time account on a certain date. A line item can be characterized by a type. An example of GDT EmployeeTimeAccountLineItemTypeCode is:

<EmployeeTimeAccountLineItemTypeCode>1</EmployeeTimeAccountLineItemTypeCode>

In certain implementations, GDT EmployeeTimeAccountLineItemTypeCode may have the following structure:

| GDT | | Cat. | Object Class | Property | Representation/Association | Type | Type Name | Len. | Card. | Remarks |
|---|---|---|---|---|---|---|---|---|---|---|
| Employee-TimeAccount-LineItem-TypeCode | | | Employee Time Account Line Item | Type | Code | CDT | Code | 1..6 | | restricted |
| | listID | A | Code List | Identification | Identifier | xsd | token | 1..60 | 0..1 | |
| | listAgencyID | A | Code List Agency | Identification | Identifier | xsd | token | 1..60 | 0..1 | |
| | listVersionID | A | Code List | Version | Identifier | xsd | token | 1..15 | 0..1 | |
| | listAgency-SchemeID | A | Code List Agency | Scheme | Identifier | xsd | token | 1..60 | 0..1 | |
| | listAgency-SchemeAgencyID | A | Code List Agency | Scheme Agency | Identifier | xsd | token | 1..3 | 0..1 | |

For GDT EmployeeTimeAccountLineItemTypeCode, a customer-specific code list can be assigned to the code. A listID can be "10341." If the code list is unchanged, a listAgencyID can be "310." Otherwise, a listAgencyID can be the ID of the customer (e.g., ID from DE 3055, if listed there). A listVersionID can be the version of the particular code list (e.g., assigned and managed by the customer). A listAgencySchemeID can be the ID of the scheme if the listAgencyID does not come from DE 3055. The listAgencySchemeAgencyID can be the ID of the organization from DE 3055 that manages the listAgencySchemeID scheme.

As this is a proprietary code list, it is typically used in the message transfer (A2A, B2B) if both partners have access to the same business configuration.

The data type GDT EmployeeTimeAccountLineItemTypeCode may use the following code value examples: Deduction (e.g., a vacation) and Entitlement (e.g., the yearly entitlement for vacations).

The GDT EmployeeTimeAccountLineItemTypeCode can be used for capturing the semantic meaning of the line item in the employee time account. This type code may define the business usage of the corresponding data of the line item for other applications as well. For example, this data may be further used for reporting purposes, or for additional business processes (e.g., the payroll process).

EmployeeTimeAccountTypeCode

A GDT EmployeeTimeAccountTypeCode is the coded representation of the type of an employee time account according to criteria resulting from laws, agreements, company requirements, control tasks, etc. An employee time account is a summary of valuation results. The valuation results can be recorded in employee time accounts in the form of line items. An example of GDT EmployeeTimeAccountTypeCode is:

<EmployeeTimeAccountTypeCode>1</EmployeeTimeAccountTypeCode>

In certain implementations, GDT EmployeeTimeAccountTypeCode may have the following structure:

| GDT | | Cat. | Object Class | Property | Representation/Association | Type | Type Name | Len. | Card. | Remarks |
|---|---|---|---|---|---|---|---|---|---|---|
| EmployeeTimeAccountTypeCode | | | Employee Time Account | Type | Code | CDT | Code | 1..6 | | restricted |
| | listID | A | Code List | Identification | Identifier | xsd | token | 1..60 | 0..1 | |
| | listAgencyID | A | Code List Agency | Identification | Identifier | xsd | token | 1..60 | 0..1 | |
| | listVersionID | A | Code List | Version | Identifier | xsd | token | 1..15 | 0..1 | |
| | listAgencySchemeID | A | Code List Agency | Scheme | Identifier | xsd | token | 1..60 | 0..1 | |
| | listAgencySchemeAgencyID | A | Code List Agency | Scheme Agency | Identifier | xsd | token | 1..3 | 0..1 | |

For GDT EmployeeTimeAccountTypeCode, a customer-specific code list can be assigned to the code. A listID can be "10342." If the code list is unchanged, a listAgencyID can be "310."Otherwise, a listAgencyID can be the ID of the customer (e.g., ID from DE 3055, if listed there). A listVersionID can be the version of the particular code list (e.g., assigned and managed by the customer). A listAgencySchemeID can be the ID of the scheme if the listAgencyID does not come from DE 3055. The listAgencySchemeAgencyID can be the ID of the organization from DE 3055 that manages the listAgencySchemeID scheme.

As this is a proprietary code list, it can be used in the message transfer (A2A, B2B) if both partners have access to the same business configuration.

The following are example code values for GDT EmployeeTimeAccountTypeCode: Paid vacation account, Overtime account, Sick leave account.

EmployeeTimeDifferentPayment

A GDT EmployeeTimeDifferentPayment is payment for an employee time that differs from the rule. An example of GDT EmployeeTimeDifferentPayment is:

<EmployeeTimeDifferentPayment>
<Rate>
<DecimalValue>17.79</DecimalValue>
<CurrencyCode>EUR</CurrencyCode>
<BaseMeasureUnitCode>HUR</BaseMeasureUnitCode>
</Rate>
</EmployeeTimeDifferentPayment>

Note: The BaseMeasureUnitCode HUR may represent the unit Hour according to the UN/ECE Recommendation #20.

In certain implementations, GDT EmployeeTimeDifferentPayment may have the following structure:

| GDT | | Cat. | Object Class | Property | Rep./Ass. | Type | Type Name | Card. |
|---|---|---|---|---|---|---|---|---|
| EmployeeTimeDifferentPayment | | | Employee Time Different Payment | | Details | | | |
| | Rate | E | Employee Time Different Payment | Rate | Rate | CDT | Rate | 0..1 |

For the GDT EmployeeTimeDifferentPayment structure described above, Rate can be the details of a different payment specification as an amount per time unit (e.g., hourly rate). The numerator dimension of the element Rate can be a currency (e.g., dollars) and the denominator is typically a time unit (e.g., hour).

The data type GDT EmployeeTimeDifferentPayment may be used to describe different payment specifications for an employee time. These payment specifications may be used in the process component Payroll. The GDT EmployeeTimeDifferentPayment may currently contain the element Rate. Other elements can be added in the future (e.g., pay scale information) for describing different payments.

EmployeeTimeExternalServiceAcknowledgement

A GDT EmployeeTimeExternalServiceAcknowledgement is a specification relating to a time confirmation of services provided by an external employee. An example of GDT EmployeeTimeExternalServiceAcknowledgement is:

<EmployeeTimeExternalServiceAcknowledgement>
<EmployeeTimeConfirmationViewOnPurcahseOrderItemUUID>43d0cd54-c78d-145c-e100-00000a155371</EmployeeTimeConfirmationViewOnPurchaseOrderItemUUI D>
<ServiceProductUUID>43d0cd55-c78d-145c-e100-00000a155371</ServiceProductUUID>
</EmployeeTimeExternalServiceAcknowledgement>

In certain implementations, GDT EmployeeTimeExternalServiceAcknowledgement may have the following structure:

| GDT | | Cat. | Object Class | Property | Rep./ Ass. | Type | Type Name | Len. | Card. |
|---|---|---|---|---|---|---|---|---|---|
| Employee-TimeExternal-Service-Acknowl-edgement | | | Employee Time External Service Acknowl-edgement | | Details | | | | |
| | Employee-TimeConfir-mationView-OnPurchase-OrderItem-UUID | E | Employee Time External Service Acknowl-edgement | Confirmation View On Purchase Order Item | UUID | GDT | UUID | | 0..1 |
| | ServiceProd-uctUUID | E | Employee Time External Service Acknowl-edgement | Service Product | UUID | GDT | UUID | | 0..1 |

For the GDT EmployeeTimeExternalService-Acknowledgement structure described above, EmployeeTimeConfirmationViewOnPurchaseOrderItemUUID may contain a reference to the purchase order item to which all other details of the structure described refer. ServiceProductUUID may contain a reference to the ServiceProduct that was provided for a purchase order item. At least one element in the structure can include a value.

The data type GDT EmployeeTimeExternalService-Acknowledgement may be used to assign the confirmation of a service provided by an external employee to a purchase order item. This assignment can enable the checking of invoices from external service providers. Values such as date and amount can be specified by the employee time and are consequently not typically contained in this structure.

EmployeeTimeItemCategoryCode

A GDT EmployeeTimeItemCategoryCode is the coded representation of a classification of the times and activities of a document item of an employee. A document item of an employee time may display absence times, breaks, or availability times, in addition to planned and actual working times and activities. The EmployeeTimeItemCategoryCode can describe the division of the employee time into categories that carry the main information about the employee time according to company or statutory criteria. An example of GDT EmployeeTimeItemCategoryCode is:

<EmployeeTimeItemCategoryCode>1</EmployeeTimeItemCategoryCode>

In certain implementations, GDT EmployeeTimeItemCategoryCode may have the following structure:

| GDT | Object Class | Property | Represen-tation/As-sociation | Type | Type Name | Len. | Re-marks |
|---|---|---|---|---|---|---|---|
| Employee-TimeItem-Category-Code | Employee Time Item | Cate-gory | Code | CDT | Code | 1..2 | re-stricted |

For GDT EmployeeTimeItemCategoryCode listID can be "10194." If the code list is unchanged, a listAgencyID can be "310." A listVersionID can be the version of the particular code list.

Each type of an employee time may be assigned to an EmployeeTimeItemCategoryCode. Together with the EmployeeTimeItemTypeCode (see below), the EmployeeTimeItemCategoryCode can form a two-level classification of document items of an employee time or work schedule.

The EmployeeTimeItemCategoryCode may be used to roughly classify the type of an employee time according to its main meaning.

The data type GDT EmployeeTimeItemCategoryCode may use the following codes: 1 (i.e., Productive Time), 2 (i.e., Special Attendance), 3 (i.e., Leave), 4 (i.e., Break), 5 (i.e., Availability Duty), 6 (i.e., Bonus Time), 7 (i.e., Special Working Time Specifications).

EmployeeTimeItemDurationCalculationMethodCode

A GDT EmployeeTimeItemDurationCalculationMethodCode is the coded representation of a method for calculating the duration of a document item of an employee time. In time evaluation, time durations can be calculated from the data recorded in document items of employee times (e.g., clock times). This can be done in different ways (e.g., by including or excluding break times). The EmployeeTimeItemDurationCalculationMethodCode may represent the method used to determine a duration from the recorded data. An example of GDT EmployeeTimeItemDurationCalculationMethodCode is:

<EmployeeTimeItemDurationCalculationMethodCode>1</EmployeeTimeItemDurationCalculationMethodCode>

In certain implementations, GDT EmployeeTimeItemDurationCalculationMethodCode may have the following structure:

| GDT | Cat. | Object Class | Property | Represen-tation/As-sociation | Type | Type Name | Len. | Card. | Remarks |
|---|---|---|---|---|---|---|---|---|---|
| Employee-TimeItem-Duration- | | Employee Time Item | Duration Calculation Method | Code | CDT | Code | 1..4 | | restricted |

-continued

| GDT | | Cat. | Object Class | Property | Represen-tation/As-sociation | Type | Type Name | Len. | Card. | Remarks |
|---|---|---|---|---|---|---|---|---|---|---|
| Calcula-tionMeth-odCode | | | | | | | | | | |
| | listID | A | Code List | Identification | Identifier | xsd | token | | 0..1 | |
| | listAgencyID | A | Code List Agency | Identification | Identifier | xsd | token | | 0..1 | |
| | listVersionID | A | Code List | Version | Identifier | xsd | token | | 0..1 | |
| | listAgency-SchemeID | A | Code List Agency | Scheme | Identifier | xsd | token | | 0..1 | |
| | listAgency-Scheme-AgencyID | A | Code List Agency | Scheme Agency | Identifier | xsd | token | | 0..1 | |

For GDT EmployeeTimeItemDurationCalculationMethodCode, a customer-specific code list can be assigned to the code. A listID can be "10122." If the code list is unchanged, a listAgencyID can be "310." Otherwise, a listAgencyID can be the ID of the customer (e.g., ID from DE 3055, if listed there). A listVersionID can be the version of the particular code list (e.g., assigned and managed by the customer). A listAgencySchemeID can be the ID of the scheme if the listAgencyID does not come from DE 3055. The listAgencySchemeAgencyID can be the ID of the organization from DE 3055 that manages the listAgencySchemeID scheme.

Because the EmployeeTimeItemDurationCalculationMethodCode is a proprietary code, it can be used in A2A or B2B message transfer if both partners have access to the same business configuration.

The GDT EmployeeTimeItemDurationCalculationMethodCode may be used to describe the method that time evaluation uses to calculate a duration from recorded employee times. The EmployeeTimeItemDurationCalculationMethodCode may use the following value examples: Gross duration, Net duration without unpaid breaks, Net duration without paid and unpaid breaks.

The data type GDT EmployeeTimeItemDurationCalculationMethodCode may use the following codes: 1 (i.e., working days), 2 (i.e., calendar days), 3 (i.e., account-relevant days), 4 (i.e., account-relevant hours).

EmployeeTimeItemTaskTypeCode

A GDT EmployeeTimeItemTaskTypeCode is the coded representation of the task type of a document item of an employee time. The task type characterizes the task that an employee has carried out as part of a recorded working time. An example of GDT EmployeeTimeItemTaskTypeCode is:

<EmployeeTimeItemTaskTypeCode>1</EmployeeTimeItemTaskTypeCode>

In certain implementations, GDT EmployeeTimeItemTaskTypeCode may have the following structure:

| GDT | | Cat. | Object Class | Property | Represen-tation/As-sociation | Type | Type Name | Len. | Card. | Remarks |
|---|---|---|---|---|---|---|---|---|---|---|
| Employee-TimeItem-TaskType-Code | | | Employee Time Item | Task Type | Code | CDT | Code | 1..4 | | restricted |
| | listID | A | Code List | Identification | Identifier | xsd | token | | 0..1 | |
| | listAgencyID | A | Code List Agency | Identification | Identifier | xsd | token | | 0..1 | |
| | listVersionID | A | Code List | Version | Identifier | xsd | token | | 0..1 | |
| | listAgency-SchemeID | A | Code List Agency | Scheme | Identifier | xsd | token | | 0..1 | |
| | listAgency-Scheme-AgencyID | A | Code List Agency | Scheme Agency | Identifier | xsd | token | | 0..1 | |

For GDT EmployeeTimeItemTaskTypeCode, a customer-specific code list can be assigned to the code. A listID can be "10186." If the code list is unchanged, a listAgencyID can be "310." Otherwise, a listAgencyID can be the ID of the customer (e.g., ID from DE 3055, if listed there). A listVersionID can be the version of the particular code list (e.g., assigned and managed by the customer). A listAgencySchemeID can be the ID of the scheme if the listAgencyID does not come from DE 3055. The listAgencySchemeAgencyID can be the ID of the organization from DE 3055 that manages the listAgencySchemeID scheme.

Because the EmployeeTimeItemTaskTypeCode is a proprietary code, it can be used in A2A or B2B message transfer if both partners have access to the same business configuration.

The EmployeeTimeItemTaskTypeCode can be used for employee times that describe productive work to characterize the underlying task type. The EmployeeTimeItemTaskTypeCode can be used to enter default data in special fields for the target applications (e.g., the activity type), or to control the use of the permitted EmployeeTimeItemTypeCodes for the employee time. The EmployeeTimeItemTypeCodes that are permitted for an EmployeeTimeItemTaskTypeCode can be specified during configuration. The EmployeeTimeItemTaskTypeCode can be a recorded element of the document item of an employee time. The EmployeeTimeItemTaskTypeCode may use the following value examples: Service, Consulting, Development.

An advance delivery of a code list does not typically make sense, as company-specific requirements may vary.

EmployeeTimeItemTypeCode

A GDT EmployeeTimeItemTypeCode is the coded representation of the type of document item of an employee time. An example of GDT EmployeeTimeItemTypeCode is:

<EmployeeTimeItemTypeCode>1</EmployeeTimeItemTypeCode>

In certain implementations, GDT EmployeeTimeItemTypeCode may have the following structure:

| GDT | | Cat. | Object Class | Property | Representation/Association | Type | Type Name | Len. | Card. | Remarks |
|---|---|---|---|---|---|---|---|---|---|---|
| Employee-TimeItem TypeCode | | | Employee Time Item | Type | Code | CDT | Code | 1..6 | | restricted |
| | listID | A | Code List | Identification | Identifier | xsd | token | | 0..1 | |
| | listAgencyID | A | Code List Agency | Identification | Identifier | Xsd | token | | 0..1 | |
| | listVersionID | A | Code List | Version | Identifier | Xsd | token | | 0..1 | |
| | listAgency-SchemeID | A | Code List Agency | Scheme | Identifier | Xsd | token | | 0..1 | |
| | listAgency-Scheme-AgencyID | A | Code List Agency | Scheme Agency | Identifier | Xsd | token | | 0..1 | |

For GDT EmployeeTimeItemTypeCode, a customer-specific code list can be assigned to the code. A listID can be "10187." If the code list is unchanged, a listAgencyID can be "310." Otherwise, a listAgencyID can be the ID of the customer (e.g., ID from DE 3055, if listed there). A listVersionID can be the version of the particular code list (e.g., assigned and managed by the customer). A listAgencySchemeID can be the ID of the scheme if the listAgencyID does not come from DE 3055. The listAgencySchemeAgencyID can be the ID of the organization from DE 3055 that manages the listAgencySchemeID scheme.

Together with the EmployeeTimeItemCategoryCode, the EmployeeTimeItemTypeCode may form a two-level classification of document items of an employee time or work schedule. The EmployeeTimeItemTypeCode may describe the type of the document item of an employee time or a work schedule according to its company, collective-agreement, or statutory meaning (e.g., leave, overtime, illness with doctor's certificate, illness without doctor's certificate). It is a recorded element of the document item of an employee time.

The GDT EmployeeTimeItemTypeCode may include the following customer-specific codes: Productive hours (i.e., time of productive work), Overtime (i.e., times over and above the normal working time), Work's assembly (i.e., time spent attending work's assemblies), Educational leave (i.e., time for vocational education), Illness with certificate (i.e., time of illness-related absence documented by a doctor's certificate), Illness without certificate (i.e., time of illness-related absence not documented by a doctor's certificate), On-call availability (i.e., time during which the employee is not on work premises and can be called in to work), Paid break (i.e., a break during normal work time for which the employee is paid), Unpaid break (i.e., a break during normal work time for which the employee is not paid), Dirty work bonus time (i.e., time in which a particularly dirty job for which a bonus is paid is carried out).

An advance delivery of a code list does not typically make sense, since collective-agreement, statutory and, in particular, company-specific requirements may vary.

The data type GDT EmployeeTimeItemTypeCode may use the following codes: 1 (i.e., planned working time), 2 (i.e., unpaid break), 3 (i.e., paid break).

EmployeeTimePlanningCategoryCode

A GDT EmployeeTimePlanningCategoryCode is the coded representation of the planning category of an employee time. A planning category is a classification of employee times according to whether the employee time actually took place, or is planned for the short or long term. An example of GDT EmployeeTimePlanningCategoryCode is:

<EmployeeTimePlanningCategoryCode>1</EmployeeTimePlanningCategoryCode>

In certain implementations, GDT EmployeeTimePlanningCategoryCode may have the following structure:

| GDT | Object Class | Property | Representation/Association | Type | Type Name | Len. | Remarks |
|---|---|---|---|---|---|---|---|
| Employee-Time-Planning-Category-Code | Employee Time | Planning Category | Code | CDT | Code | 1..2 | Restricted |

The data type GDT EmployeeTimePlanningCategoryCode may assign one static code list to the code. The attributes may be assigned the following values: listID="10188" and listAgencyID="310."

The data type GDT EmployeeTimePlanningCategoryCode may be used to categorize employee times. It can influence how an employee time is evaluated with regard to leave counting, determination of availability, or overtime. In the case of overtime determination, for example, employee times of the planning category "actual" are compared with employee times of the planning category "long-term planned" and "short-term planned." For instance, if there is a planned working time recorded for a period but no actual working time, this period is interpreted as an absence. Conversely, if there is an actual working time recorded for a period but no planned working time in that period, the period could be interpreted as overtime.

The data type GDT EmployeeTimePlanningCategoryCode may use the following codes: 1 (i.e., actual), 2 (i.e., short-term planned), 3 (i.e., long-term planned).

EmployeeTimeProjectTaskConfirmation

A GDT EmployeeTimeServiceProvision is a specification in an employee time relating to the progress confirmation of a project task. An example of GDT EmployeeTimeServiceProvision is:

<EmployeeTimeProjectTaskConfirmation>
<EmployeeTimeConfirmationViewOnProjectTaskUUID>
438d546241b1-33d0-e100-00000a155371
</EmployeeTimeConfirmationViewOnProjectTaskUUID>
<ServiceProductUUID>438d5463-f1b1-33d0-e100-00000a155371</ServiceProductUUID>
</EmployeeTimeProjectTaskConfirmation>

In certain implementations, GDT EmployeeTimeServiceProvision may have the following structure:

For the GDT EmployeeTimeServiceProvision structure described above, LabourResourceUUID may refer to the resource performing the activity. LabourResourceID is a readable key of the resource performing the activity. ServiceProductUUID may describe the type of activity performed. ServiceProductID is a readable key of the type of activity performed. At least one field in the structure typically contains a value.

| GDT | | Cat. | Object Class | Property | Rep./ Ass. | Type | Type Name | Card. |
|---|---|---|---|---|---|---|---|---|
| EmployeeTime-ProjectTask-Confirmation | | | Employee Time Project Task Confirmation | | Details | | | |
| | EmployeeTime-Confirmation-ViewOnProject-TaskUUID | E | Employee Time Project Task Confirmation | Employee Time Confirmation View On Project Task | UUID | GDT | UUID | 0..1 |
| | ServiceProduct-UUID | E | Employee Time Project Task Confirmation | Service Product | UUID | GDT | UUID | 0..1 |

For the GDT EmployeeTimeProjectTaskConfirmation structure above, EmployeeTimeConfirmationViewOnProjectTaskUUID may contain a reference to the project tasks to which all other details of the structure described refer. ServiceProductUUID may contain a reference to the ServiceProduct that was provided for a project task. At least one element in the structure typically contains a value.

The data type EmployeeTime ProjectTaskConfirmation can be used to assign an employee time to a project task. This assignment may be evaluated at the process component "Project Processing." Values such as date and quantity may be specified by the employee time and consequently may not be contained in this structure.

EmployeeTimeServiceProvision

A GDT EmployeeTimeServiceProvision is a specification in an employee time relating to the provision of an internal service. An example of GDT EmployeeTimeServiceProvision is:

<EmployeeTimeServiceProvision>
<LabourResourceUUID>42F33A6E-4AC4-6AE2-E 100-00000A1552C2</LabourResourceUUID>
<LabourResourceID>SEM-0001</LabourResourceID>
<ServiceProductUUID>42F33A6F-4AC4-6AE2-E100-00000A1552C2</ServiceProductUUID>
<ServiceProductID>MC0001</ServiceProductID>
<EmployeeTimeServiceProvision>

In certain implementations, GDT EmployeeTimeServiceProvision may have the following structure:

The data type EmployeeTimeServiceProvision can be used to link an activity performed by a resource with a cost center (receiver). This assignment may be used in internal accounting for evaluating services provided. Values such as date and amount can be specified by the employee time or employee time calendar, and consequently may not be contained in this structure.

EmployeeTimeValidity

A GDT EmployeeTimeValidity may specify the validities of employee times. The validity of an employee time can be derived from the EmployeeTimeValidity as a set of day and time intervals. If specified, the intervals can also have durations specified. The employee time is then typically valid for the specified duration within the interval. An example of GDT EmployeeTimeValidity is:

<EmployeeTimeValidity>
<DatePeriod>
<StartDate>2005-07-01</StartDate>
<EndDate>2005-07-15</EndDate>
</DatePeriod>
<TimePeriod>
<StartTime>T08:00:00</StartTime>
<EndTime>T16:00:00</EndTime>
</TimePeriod>
</EmployeeTimeValidity>

Another example of GDT EmployeeTimeValidity is:

<EmployeeTimeValidity>
<DatePeriod>
<StartDate>2005-01-01</StartDate>
<EndDate>2005-01-15</EndDate>

| GDT | | Cat. | Object Class | Property | Rep./ Ass. | Type | Type Name | Card. |
|---|---|---|---|---|---|---|---|---|
| EmployeeTime-ServiceProvision | | | Employee Time Service Provision | | Details | | | |
| | LabourRe-sourceUUID | E | Employee Time Service Provision | Labour Resource | UUID | GDT | UUID | 0..1 |
| | LabourRe-sourceID | E | Employee Time Service Provision | Labour Resource | ID | GDT | ResourceID | 0..1 |
| | ServiceProd-uctUUID | E | Employee Time Service Provision | Service Product | UUID | GDT | UUID | 0..1 |
| | ServiceProd-uctID | E | Employee Time Service Provision | Service Product | ID | GDT | ProductID | 0..1 |

</DatePeriod>
<Duration>PT15H</Duration>
<CalendarUnitCode>2</CalendarUnitCode>
<WeekdaySelection>
<MondayIndicator>true</MondayIndicator>
<TuesdayIndicator>false</TuesdayIndicator>
<WednesdayIndicator>true</WednesdayIndicator>
<ThursdayIndicator>false</ThursdayIndicator>
<FridayIndicator>true</FridayIndicator>
<SaturdayIndicator>false</SaturdayIndicator>
<SundayIndicator>false</SundayIndicator>
</WeekdaySelection>
</EmployeeTimeValidity>

In certain implementations, GDT EmployeeTimeValidity may have the following structure:

| GDT | | Cat. | Object Class | Property | Rep./ Ass. | Type | Type Name | Card. |
|---|---|---|---|---|---|---|---|---|
| Employee-Time-Validity | | | Employee-Time-Validity | | Details | | | |
| | DatePeriod | E | Employee-Time-Validity | DatePeriod | Details | GDT | DatePeriod | 0..1 |
| | TimePeriod | E | Employee-Time-Validity | TimePeriod | Details | GDT | TimePeriod | 0..1 |
| | TimePoint-Period | E | Employee-Time-Validity | TimePoint-Period | Details | GDT | TimePoint-Period | 0..1 |
| | Duration | E | Employee-Time-Validity | Duration | Duration | GDT | Duration | 0..1 |
| | Calendar-UnitCode | E | Employee-Time-Validity | CalendarUnit | Code | GDT | Calendar-UnitCode | 0..1 |
| | Weekday-Selection | E | Employee-Time-Validity | Weekday-Selection | Details | GDT | Weekday-Selection | 0..1 |
| | DayOrdinal-Number-Value | E | Employee-Time-Validity | DayOrdinal-Number-Value | Value | GDT | Ordinal-Number-Value | 0..1 |
| | OffsetDay-Ordinal-Number-Value | E | Employee-Time-Validity | OffsetDay-Ordinal-Number-Value | Value | GDT | Ordinal-Number-Value | 0..1 |

EmployeeTimeValidity can include the following elements: DatePeriod is a Date interval (without time zone and duration), consisting of start and end date. A DatePeriod is specified when the validity of the employee time is defined to the exact day or when the validity range is specified by a day interval. In the latter case, the validity is specified in more detail by additional data. TimePeriod is an interval occurring on one or more days described by clock times. If the end time is before or the same as the start time, the end time may be on the following day. The TimePeriod is used when the validity of the employee time can be described by a recurring time interval on several days. The days on which the time interval occurs are defined in more detail by further data (e.g., DatePeriod, WeekdaySelection). TimePointPeriod is a Time interval defined by date and time specifications (without duration), either without time zone or as a time point (with time zone and DST indicator). This element determines a time interval lasting one or more days that occurs one time only. Duration specifies a duration in hours, minutes and seconds (not negative). This element is used when the validity of the employee time is defined by a capacity specification. Further details such as DatePeriod or TimePeriod then only serve to provide a framework for the validity. CalendarUnitCode specifies a calendar unit (e.g., day, week, or month) of the recurring reference time period of the duration within the validity of the EmployeeTimeValidity. If no specification is made, the duration refers to the entire validity period defined by the EmployeeTimeValidity. WeekdaySelection consists of indicators for each weekday, which can be set independent of one another. This element is used when the validity of the employee time recurs on a weekday basis. DayOrdinalNumberValue is a number used to identify a calendar day by counting from an assignment date. This element can be used to define the validity of employee times as part of a sequence of consecutive items (shifts), for example, "on 3rd day from 8:00-18:00." OffsetDayOrdinalNumberValue is a number used to determine the assignment date as of which calendar days are counted. This number specifies the number of days counted from the assignment date to determine the start date of the DatePeriod, that is, which shift is assigned to the start date. Thus, the assignment date is determined by counting backwards from the start date, whereby a shift sequence is fixed to specific calendar days.

The data type EmployeeTimeValidity is used to describe the validities of employee times and working time models. EmployeeTimeValidity can be used to describe the following time periods, for example: On 1 Sep. 2005, from 9:00 to 18:00 (for example, for normal working time). On 1 Sep. 2005, ½ hour between 10:00 and 11:00 (for example, for a break). Every Monday from 5 Sep. 2005 to 26 Sep. 2005, from 14:00 to 15:00 (for example, for a regular meeting). From 27 Sep. 2005 to 5 Oct. 2005 (for example, for vacation or illness). From 4 Sep. 2005, 22:00 to 8 Sep. 2005, 18:00 (for example, for availability duty). On 2 Sep. 2005, 2 hours (for example, for overtime), On the 3rd day (for example, to reference a day working time model such as "Early Shift," as an item in a period working time model, using the element "DayOrdinalNumberValue"). From 1 Jul. 2005 to 31 Dec. 2005, starting with day 5 (for example, to reference a period working time model, using the element "OffsetDayOrdinalNumberValue").

EmployeeTimeValuationStepCode

A GDT EmployeeTimeValuationStepCode is a step in the process of deriving the results of recorded employee times according to specific rules. The process can be divided into single steps, which together may form a network by virtue of their interdependency. By evaluating configurable rules, each individual step can determine partial results for the time evaluation, whereby the results of previous steps can be used. An example of GDT EmployeeTimeValuationStepCode is:

<EmployeeTimeValuationStepCode>1</EmployeeTimeValuationStepCode>

In certain implementations, GDT EmployeeTimeValuationStepCode may have the following structure:

| GDT | | Cat. | Object Class | Property | Representation/ Association | Type | Type Name | Len. | Card. | Remark |
|---|---|---|---|---|---|---|---|---|---|---|
| EmployeeTime-ValuationStepCode | | | EmployeeTime-Valuation-Step | | Code | CDT | Code | 1..4 | | Restricted |
| | listID | A | Code List | Identification | Identifier | xsd | token | | 0..1 | |
| | listAgencyID | A | Code List Agency | Identification | Identifier | xsd | token | | 0..1 | |
| | listVersion-ID | A | Code List | Version | Identifier | xsd | token | | 0..1 | |
| | ListAgency SchemeID | A | Code List Agency | Scheme | Identifier | xsd | token | | 0..1 | |
| | ListAgency-Scheme-AgencyID | A | Code List Agency | Scheme Agency | Identifier | xsd | token | | 0..1 | |

For GDT EmployeeTimeValuationStepCode, one customer-specific code list can be assigned to the code. A listID can be "10237." If the code list is unchanged, a listAgencyID can be "310." Otherwise, a listAgencyID can be the ID of the customer (e.g., ID from DE 3055, if listed there). A listVersionID can be the version of the particular code list (e.g., assigned and managed by the customer). A listAgencySchemeID can be the ID of the scheme if the listAgencyID does not come from DE 3055. The listAgencySchemeAgencyID can be the ID of the organization from DE 3055 that manages the listAgencySchemeID scheme.

The EmployeeTimeValuationStepCode can be used to classify evaluation results according to the evaluation step that creates them and, as such, it can form part of the evaluation results. Furthermore, it can be used as a key in the configuration to assign configured valuation specifications to the corresponding part of the evaluation.

The following are typical customer examples for values of GDT EmployeeTimeIValuationStepCode: Working time model resolution (i.e., resolution of working time models and recurring appointments, handling of exceptions and overlaps), Public holiday handling (i.e., elimination of certain employee times on public holidays), Day assignment to intervals (i.e., assignment of a calendar day to time intervals), Full-day collision (i.e., collision of employee times on one day), Multiday distribution (i.e., distribution of multiday intervals to individual calendar days), Absence counting (i.e., determination of absence durations relevant for time account deductions by comparing them with planned working times), Time account entitlement accrual (i.e., accrual of entitlements in time accounts), Transfer preparation (i.e., preparation of transfer to target applications).

The data type GDT EmployeeTimeValuationStepCode may use the following code: 1 (i.e., planned working time determination).

EmployeeTimeValuationTerms

A GDT EmployeeTimeValuationTerms is a description of conditions for employee time evaluation. An example of GDT EmployeeTimeValuationTerms is:

<EmployeeTimeValuationTerms>
<DeviatingDayRelativePeriodCode>1<DeviatingDayRelativePeriodCode>
</EmployeeTimeValuationTerms>

Another example of GDT EmployeeTimeValuationTerms is:

<EmployeeTimeValuationTerms>
<ReplaceIndicator>true</ReplaceIndicator>
</EmployeeTimeValuationTerms>.

In certain implementations, GDT EmployeeTimeValuationTerms may have the following structure:

| GDT | | Cat. | Object Class | Property | Rep./ Ass. | Type | Type Name | Card. |
|---|---|---|---|---|---|---|---|---|
| EmployeeTime-ValuationTerms | | | Employee-TimeValuation-Terms | | Details | | | |
| | Deviating-DayRelative-PeriodCode | E | Employee-TimeValuation-Terms | Deviating-DayRelative-Period | Code | GDT | Relative-Period-Code | 0..1 |
| | DayCut-OffTime | E | Employee-TimeValuation-Terms | DayCutOff | Time | CDT | Time | 0..1 |
| | Replace-Indicator | E | Employee-TimeValuation-Terms | Replace | Indicator | GDT | ReplaceIndicator | 0..1 |

For the GDT EmployeeTimeValuationTerms structure above, DeviatingDayRelativePeriodCode is the coded representation of a different day assignment of an employee time. Day- CutOffTime is the clock time that determines the cut-off point between day assignments for employee time evaluation. ReplaceIndicator is the information as to whether an employee time within employee time evaluation replaces another simultaneous employee time.

The DeviatingDayRelativePeriodCode or DayCutOffTime may have to be specified if employee time evaluation is to deviate from the preconfigured day-assignment rules. Either the DeviatingDayRelativePeriodCode or the DayCutOffTime may be specified. In the configuration of employee time evaluation, it may be specified whether the day assignment is decided by to the DeviatingDayRelativePeriodCode or the DayCutOffTime. For the DeviatingDayRelativePeriodCode, typically the Current Day, Previous Day, and Following Day codes are permitted.

The EmployeeTimeValuationTerms data type may be used to describe conditions of a document item of an employee time for employee time evaluation.

EmployeeWorkAccidentInsuranceContributionDiscountTypeCode

A GDT EmployeeWorkAccidentInsuranceContributionDiscountTypeCode is a coded representation of the discount type to a work accident insurance contribution of an employee. An example of GDT EmployeeWorkAccidentInsuranceContributionDiscountTypeCode is:

<EmployeeWorkAccidentInsuranceContributionDiscountTypeCodelistAgencyID="xxx"listVersionID="xxxxx">1</EmployeeWorkAccidentInsuranceContributionDiscountTypeCode>

In certain implementations, GDT EmployeeWorkAccidentInsuranceContributionDiscountTypeCode may have the following structure:

| GDT | | Cat. | Object Class | Property | Representation/ Association | Type | Type Name | Len. | Card. | Remark |
|---|---|---|---|---|---|---|---|---|---|---|
| EmployeeWork-AccidentInsur-anceContribu-tionDiscount-TypeCode | | | Employee Work Accident Insurance Contribution | | Code | CDT | Code | 1..4 | | restricted |
| | listID | A | Code List | Identifi-cation | Identifier | xsd | token | | 0..1 | |
| | listAgen-cyID | | Code List Agency | Identifi-cation | Identifier | xsd xsd | token | | 0..1 | |
| | listVer-sionID | A | Code List | Version | Identifier | xsd xsd | token | | 0..1 | |
| | lsitAgen-cySchemeID | A | Code List Agency | Scheme | Identifier | xsd | token | | 0..1 | |
| | listAgen-cyScheme-AgencyID | A | Code List Agency | Scheme Agency | Identifier | xsd | token | | 0..1 | |

Several extensible, country-specific code lists, which are different at runtime, may be assigned to the GDT EmployeeWorkAccidentInsuranceContributionDiscountTypeCode. A listAgencyID can be the ID of the customer (e.g., ID from DE 3055, if listed there). A listVersionID can be the version of the particular code list (e.g., assigned and managed by the customer). A listAgencySchemeID can be the ID of the scheme if the listAgencyID does not come from DE 3055. The listAgencySchemeAgencyID can be the ID of the organization from DE 3055 that manages the listAgencySchemeID scheme.

In certain implementations, the EmployeeWorkAccidentInsuranceContributionDiscountTypeCode can be the CountryCode IT. In this case, the EmployeeWorkAccidentInsuranceContributionDiscountTypeCode can have the following attributes: listID="23701," listAgencyID="310," and the listVersionID can be a version of the particular code list.

The grouping criteria is pre-compiled by the insurance organization. It typically corresponds to the pair WorkAccidentInsuranceEmployeeGroupCode and WorkAccidentRiskCategoryCode.

As described previously, the GDT EmployeeWorkAccidentInsuranceContributionDiscountTypeCode can be the country code IT. In this case, an example of EmployeeWorkAccidentInsuranceContributionDiscountTypeCode code is: 1 (i.e., employee type 1).

The following dictionary objects may be assigned to this GDT: Data element R/3 (e.g., P15_TPDIP).

The GDT EmployeeWorkAccidentInsuranceContributionDiscountTypeCodeContextElements can define a dependency or an environment in which the EmployeeWorkAccidentInsuranceContributionDiscountTypeCode appears. The environment may be described by context categories.

With the context categories in EmployeeWorkAccidentInsuranceContributionDiscountTypeCodeContextElements, the valid portion of code values of EmployeeWorkAccidentInsuranceContributionDiscountTypeCode may be restricted according to an environment during use.

In certain implementations, GDT EmployeeWorkAccidentInsuranceContributionDiscountTypeCodeContextElements may have the following structure:

| GDT | Cat. | Object Class | Property | Representation/ Association | Type | Type Name | Card. |
|---|---|---|---|---|---|---|---|
| EmployeeWork-AccidentInsur-anceContribu-tionDiscount-TypeCodeCon-textElements | | EmployeeWork-AccidentInsur-anceContribu-tionDiscount-TypeCodeCon-textElements | | Details | | | |

-continued

| GDT | | Cat. | Object Class | Property | Representation/ Association | Type | Type Name | Card. |
|---|---|---|---|---|---|---|---|---|
| | Country-Code | E | EmployeeWork-AccidentInsur-anceContribu-tionDiscount-TypeCodeCon-textElements | Country | Code | GDT | Country-Code | 0..1 |

The context category CountryCode typically defines the context country. It can determine the valid code values for a specific country.

EngineeringChangeOrderChangeGroupID

A GDT EngineeringChangeOrderChangeGroupID is a unique identifier for a change group in an engineering change order. An engineering change order is a set of instructions to make changes to a number of objects from the areas of engineering or production. The engineering change order can define the conditions under which these changes become effective and can specify the release status of these changes. A Change Group may group and manage the concrete changes to objects that are to be carried out using an engineering change order. An example of GDT EngineeringChangeOrderChangeGroupID is:

<EngineeringChangeOrderChangeGroupID>GROUP1</EngineeringChangeOrderChangeGroupID>

In certain implementations, GDT EngineeringChangeOrderChangeGroupID may have the following structure:

| GDT | Object Class | Property | Representation/ Association | Type | Type Name | Len. | Remarks |
|---|---|---|---|---|---|---|---|
| Engineering-ChangeOrder-ChangeGroupID | Engineering Change Order Change Group | Identifi-cation | Identifier | CDT | Identifier | 1..12 | Restricted |

Depending on the scenario, the EngineeringChangeOrderChangeGroupID may be assigned by the user or generated automatically.

EngineeringChangeOrderID

A GDT EngineeringChangeOrderID is a unique identifier for an engineering change order. An engineering change order is a set of instructions to make changes to a number of objects from the areas of engineering or production. The engineering change order may define the conditions under which these changes become effective and specifies the release status of these changes. An example of GDT EngineeringChangeOrderID is:

<EngineeringChangeOrderID
schemeID="EngineeringChangeOrderID"
schemeAgencyID="PLM_310">
50000001
</EngineeringChangeOrderID>

In certain implementations, GDT EngineeringChangeOrderID may have the following structure:

The GDT EngineeringChangeOrderID may have filled attributes. A schemeID may be filled as EngineeringChangeOrderID. A schemeAgencyID may be filled as the business system which issued the ID. This ID may correspond to the data element ECMNR in MDM and the data element AENNR.

Depending on the scenario, an EngineeringChangeOrderID may be assigned by the user or generated automatically.

EngineeringChangeOrderTypeCode

A GDT EngineeringChangeOrderTypeCode is the type of a set of instructions to make changes to a number of objects from the areas of engineering or production. It may define the conditions under which these changes become effective and may specify the release status of these changes. The type of an engineering change order can specify whether a change order is intended to be used to change business objects directly, or whether it is intended to be used to change and correct a

| GDT | | Cat. | Object Class | Property | Representation/ Association | Type | Type Name | Len. | Card. | Remark |
|---|---|---|---|---|---|---|---|---|---|---|
| Engineering-ChangeOrderID | | | Engineering Change Order | Identifi-cation | Identifier | CDT | Identifier | 1..12 | | Restricted |
| | scheme-AgencyID | A | Identification Scheme Agency | Identifi-cation | Identifier | XSD | token | 1..60 | 0..1 | |

preceding engineering change order (e.g., validities or changes). An example of GDT EngineeringChangeOrderTypeCode is:

<EngineeringChangeOrderTypeCode>1</EngineeringChangeOrderTypeCode>

In certain implementations, GDT EngineeringChangeOrderTypeCode may have the following structure:

| GDT | Object Class | Property | Representation/ Association | Type | Type Name | Len. | Remarks |
|---|---|---|---|---|---|---|---|
| Engineering-ChangeOrder-TypeCode | Engineering-ChangeOrder | Type | Code | CDT | Code | 1 | Restricted |

The data type GDT EngineeringChangeOrderTypeCode may assign one fixed code list to the code. The attributes may be assigned the following values: listID="10150" and listAgencyID="310."

This code may correspond to the data element ECMTYP in the system that already has a non-numerical form. To ensure uniformity, the code may have been changed to a numerical format here. This may have been implemented by mapping onto the existing format.

The data type GDT EngineeringChangeOrderTypeCode may use the following codes: 1 (i.e., standard order), 2 (i.e., validity order), 3 (i.e., correction order), 4 (i.e., easy mode change order).

EngineeringChangeProcessingObjectTypeCode

A GDT EngineeringChangeProcessingObjectTypeCode is the coded representation of the type of object in engineering change management (EngineeringChangeProcessing). An object in Engineering Change Management is an object for which the changes are managed using engineering change orders. These objects can be business objects (e.g., a material) or business object nodes (e.g., a BOM item). The engineering change order can define conditions (validities) under which the changes made to these objects with this engineering change order become effective. An example of GDT EngineeringChangeProcessingObjectTypeCode is:

<EngineeringChangeProcessingObjectTypeCode>1</EngineeringChangeProcessingObjectTypeCode>

In certain implementations, GDT EngineeringChangeProcessingObjectTypeCode may have the following structure:

For GDT EngineeringChangeProcessingObjectTypeCode, a customer-specific code list can be assigned to the code. A listID can be "10151." If the code list is unchanged, a listAgencyID can be "310." Otherwise, a listAgencyID can be the ID of the customer (e.g., ID from DE 3055, if listed there). A listVersionID can be the version of the particular code list (e.g., assigned and managed by the customer). A listAgencySchemeID can be the ID of the scheme if the listAgencyID does not come from DE 3055. The listAgencySchemeAgencyID can be the ID of the organization from DE 3055 that manages the listAgencySchemeID scheme.

The EngineeringChangeProcessingObjectTypeCode corresponds to the data element ECMOTYP from the system.

The data type GDT EngineeringChangeProcessingObjectTypeCode may use the following codes: 1 (i.e., ProductionBOMItem) and 2 (i.e., ProductionBOM).

EnterpriseAccommodationReimbursementExpenseReporterGroupCode

A GDT EnterpriseAccommodationReimbursementExpenseReporterGroupCode is the coded representation of a group of expense reporters to whom the same company-specific expense regulations apply regarding the reimbursement of accommodation expenses. An example of GDT EnterpriseAccommodationReimbursementExpenseReporterGroupCode is:

<EnterpriseAccommodationReimbursementExpenseReporterGroupCode>1</EnterpriseAccommodationReimbursementExpenseReporterGroupCode>

In certain implementations, GDT EnterpriseAccommodationReimbursementExpenseReporterGroupCode may have the following structure:

| GDT | | Cat. | Object Class | Property | Representation/ Association | Type | Type Name | Len. | Card. | Remark |
|---|---|---|---|---|---|---|---|---|---|---|
| Engineering ChangeProc-essingObject-Code | | | Engineering Change Processing Object | Type | Code | CDT | Code | 1..10 | | Restricted |
| | listID | A | Code List | Identifi-cation | Identifier | xsd | token | | 0..1 | |
| | listAgencyID | A | Code List Agency | Identifi-cation | Identifier | xsd | token | | 0..1 | |
| | listVersionID | A | Code List | Version | Identifier | xsd | token | | 0..1 | |
| | listAgency-SchemeID | A | Code List Agency | Scheme | Identifier | xsd | token | | 0..1 | |
| | listAgency-Scheme-AgencyID | A | Code List Agency | Scheme Agency | Identifier | xsd | token | | 0..1 | |

| GDT | Object Class | Representation/ Association | Type | Type Name | Len. | Remarks |
|---|---|---|---|---|---|---|
| EnterpriseAccommodation-ReimbursementExpense-ReporterGroupCode | Enterprise_ Accommodation Reimbursement_ Expense Reporter Group | Code | CDT | Code | 1..2 | restricted |

The value range of EnterpriseAccommodationReimbursementExpenseReporterGroupCode (listID="10267") may consist of a customer-specific code list.

EnterpriseAccommodationReimbursementExpenseReporterGroupCode is currently typically used in BOs.

The following are examples of EnterpriseAccommodationReimbursementExpenseReporterGroupCode codes: Extended Management Board (i.e., members of the extended management board), Senior Executives (i.e., senior executives), Salaried Employees (i.e., salaried employees).

For EnterpriseAccommodationReimbursementExpenseReporterGroupCode there may be a corresponding StatutoryAccommodationReimbursementExpenseReporterGroupCode, which may be the coded representation of a group of expense reporters to whom the same statutory or contractual expense regulations apply regarding the reimbursement of accommodation expenses.

EnterpriseMealsReimbursementExpenseReporterGroupCode

A GDT EnterpriseMealsReimbursementExpenseReporterGroupCode is the coded representation of a group of expense reporters to whom the same company provisions apply regarding reimbursement of expenses for meals. An example of GDT EnterpriseMealsReimbursementExpenseReporterGroupCode is:

<EnterpriseMealsReimbursementExpenseReporterGroupCode>1</EnterpriseMealsReimbursementExpenseReporterGroupCode>

In certain implementations, GDT EnterpriseMealsReimbursementExpenseReporterGroupCode may have the following structure:

| GDT | Property | Representation/ Association | Type | Type Name | Len. | Remarks |
|---|---|---|---|---|---|---|
| EnterpriseMeals-Reimbursement-ExpenseReporter-GroupCode | Enterprise_ Meals Reimbursement_ Expense Reporter Group | Code | CDT | Code | 1..2 | restricted |

For GDT EnterpriseMealsReimbursementExpenseReporterGroupCode, a customer-specific code list can be assigned to the code. A listID can be "10344." If the code list is unchanged, a listAgencyID can be "310." Otherwise, a listAgencyID can be the ID of the customer (e.g., ID from DE 3055, if listed there). A listVersionID can be the version of the particular code list (e.g., assigned and managed by the customer). A listAgencySchemeID can be the ID of the scheme if the listAgencyID does not come from DE 3055. The listAgencySchemeAgencyID can be the ID of the organization from DE 3055 that manages the listAgencySchemeID scheme.

An EnterpriseMealsReimbursementExpenseReporterGroupCode is currently typically used in BOs.

The following are examples of EnterpriseMealsReimbursementExpenseReporterGroupCode codes: Frequent traveler (i.e., business traveler who travel an average of 10 days per month or more) and Occasional traveler (i.e., business traveler who travel an average of less than 10 days per month).

For EnterpriseMealsReimbursementExpenseReporterGroupCode there may be a corresponding StatutoryMealsReimbursementExpenseReporterGroupCode, which may be a coded representation of a group of expense reporters to whom the same statutory or agreement-based provisions apply regarding reimbursement of expenses for meals.

EnterpriseMileageReimbursementExpenseReporterGroupCode

A GDT EnterpriseMileageReimbursementExpenseReporterGroupCode is the coded representation of a group of expense reporters to whom the same company provisions apply regarding reimbursement of travel costs. An example of GDT EnterpriseMileageReimbursementExpenseReporterGroupCode is:

<EnterpriseMileageReimbursementExpenseReporterGroupCode<1>/EnterpriseMileageReimbursementExpenseReporterGroupCode>

In certain implementations, GDT EnterpriseMileageReimbursementExpenseReporterGroupCode may have the following structure:

| GDT | Property | Representation/ Association | Type | Type Name | Len. | Remarks |
|---|---|---|---|---|---|---|
| EnterpriseMileage-Reimbursement-ExpenseReporter-GroupCode | Enterprise_ Mileage Reimbursement_ Expense Reporter Group | Code | CDT | Code | 1..2 | restricted |

For GDT EnterpriseMileageReimbursementExpenseReporterGroupCode, a customer-specific code list can be assigned to the code. A listID can be "10345." If the code list is unchanged, a listAgencyID can be "310." Otherwise, a listAgencyID can be the ID of the customer (e.g., ID from DE 3055, if listed there). A listVersionID can be the version of the particular code list (e.g., assigned and managed by the customer). A listAgencySchemeID can be the ID of the scheme if the listAgencyID does not come from DE 3055. The listAgencySchemeAgencyID can be the ID of the organization from DE 3055 that manages the listAgencySchemeID scheme.

An EnterpriseMileageReimbursementExpenseReporterGroupCode is currently typically used in BOs.

The following are examples of EnterpriseMileageReimbursementExpenseReporterGroupCodes: Office employees with private car (i.e., employees who are mainly office-based and use a private car) and Field employees with private car (i.e., employees who work mainly in the field and use a private car).

For EnterpriseMileageReimbursementExpenseReporterGroupCode there may be a corresponding StatutoryMileageReimbursementExpenseReporterGroupCode, which may be a coded representation of a group of expense reporters to whom the same statutory or agreement-based provisions apply regarding reimbursement of expenses for travel costs.

ExceptionCategoryCode

A GDT ExceptionCategoryCode is the coded representation of an exception category from a business viewpoint. An exception is a means of reporting problems or errors. An exception category may be used to group together exception types that belong together from a business viewpoint. The problem or error that caused the exception may be reflected in the exception type. An example of GDT ExceptionCategoryCode is:

<ExceptionCategoryCode>RECU</ExceptionCategoryCode>

In certain implementations, GDT ExceptionCategoryCode may have the following structure:

| GDT | Object Class | Property | Representation/ Association | Type | Type Name | Len. | Remarks |
|---|---|---|---|---|---|---|---|
| Exception-CategoryCode | Exception | Category | Code | CDT | Code | 4 | Restricted |

For GDT ExceptionCategoryCode, an extendable customer-specific code list can be assigned to the code. A listID can be "10184." If the code list is unchanged, a listAgencyID can be "310." Otherwise, a listAgencyID can be the ID of the customer (e.g., ID from DE 3055, if listed there). A listVersionID can be the version of the particular code list (e.g., assigned and managed by the customer). A listAgencySchemeID can be the ID of the scheme if the listAgencyID does not come from DE 3055. The listAgencySchemeAgencyID can be the ID of the organization from DE 3055 that manages the listAgencySchemeID scheme.

An example of an ExceptionCategoryCode is "Resource Utilization Exceptions," which groups together the exception types "Resource Overload," "Average Resource Overload," and "Average Resource Underload."

The data type GDT ExceptionCategoryCode may use the following codes: ISDM (i.e., InfeasibleSupplyAndDemandMatching), ORCV (i.e., OrderConstraintViolation), MDOE (i.e., MaterialDependentOrderException), MSCE (i.e., MaterialStockCoverageException), RCUE (i.e., ResourceCapacityUtilisationException), ATPC (i.e., ATPConfirmationException), GENE (i.e., GeneralException).

ExceptionFolderID

A GDT ExceptionFolderID is a folder for storing and grouping exceptions according to business criteria. The ExceptionFolderID may define the business criteria that an exception should meet in order to be stored in a particular folder. It also may contain information about the processors or users that are registered for the folder. Based on the assignment criteria defined in the exception folder, exceptions can be put into a folder (push) or collected using a folder (pull). Whether a folder is filled by pushing or by pulling exceptions may depend on the type of folder. An example of GDT ExceptionFolderID is:

<ExceptionFolderID>RCUE_IN__0001</ExceptionFolderID>

In certain implementations, GDT ExceptionFolderID may have the following structure:

| GDT | | Cat. | Object Class | Property | Representation/ Association | Type | Type Name | Len. | Card. | Remark |
|---|---|---|---|---|---|---|---|---|---|---|
| Exception-FolderID | | | Exception Folder | Identification | Identifier | CDT | Identifier | 1..4 | | Restricted |
| | scheme-AgencyID | A | Identification Scheme Agency | Identification | Identifier | xsd | token | 1..6 | 0..1 | |

The GDT ExceptionFolderID may have filled attributes. A schemeID may be filled as ExceptionFolderID. A schemeAgencyID may be filled as the business system which issued the ID.

The ID of an exception folder is typically the identifying description of an exception folder.

ExceptionKeyFigure

A GDT ExceptionKeyFigure is the key figure that describes the seriousness of an exception from a business viewpoint; an exception is a means of reporting problems or errors.

The key figure is the result of the calculation or measurement of a deviation from a target value, where this deviation from a target value is the cause of the exception. An example of GDT ExceptionKeyFigure is:

```
<ExceptionKeyFigure>
<Code>1</Code>
<Value>
<Percent>13.5</Percent>
</Value>
</ExceptionKeyFigure>
```

In certain implementations, GDT ExceptionKeyFigure may have the following structure:

| GDT | | Cat. | Object Class | Property | Representation/ Association | Type | Type Name | Card. |
|---|---|---|---|---|---|---|---|---|
| Exception-KeyFigure | | | Exception Key Figure | | Details | | | |
| | Code | E | Exception Key Figure | Code | Code | GDT | Exception-KeyFigure-Code | 1 |
| | Value | E | Exception Key Figure | Value | Value | GDT | Exception-KeyFigure-Code | 1 |

For the GDT ExceptionKeyFigure structure described above, Code is the coded representation of the key figure (e.g., deviation from target value). Value is the key figure value, which may represent the actual value of the key figure.

ExceptionKeyFigureCode

A GDT ExceptionKeyFigureCode is the coded representation of the key figure that describes the seriousness of an exception from a business viewpoint, where an exception is a means of reporting problems or errors. An example of GDT ExceptionKeyFigureCode is:

<ExceptionKeyFigureCode>1</ExceptionKeyFigure-Code>

In certain implementations, GDT ExceptionKeyFigureCode may have the following structure:

| GDT | Object Class | Property | Representation/ Association | Type | Type Name | Len. | Remarks |
|---|---|---|---|---|---|---|---|
| Exception-KeyFigureCode | Exception | Key Figure | Code | CDT | Code | 1..2 | Restricted |

The data type GDT ExceptionKeyFigureCode may assign one static code list to the code. The attributes may be assigned the following values: listID="10229," listAgencyID="310," and listVersionID can be a version of the relevant code list as assigned and managed by the system.

An example of a coded representation of an exception key figure is "Overload." The actual key figure of an exception of the type "Capacity Overload in Bucket" that uses this code would then be "Overload by 13%." This could, for example, be triggered by a resource overload of 13% on resource "XYZ."

The data type GDT ExceptionKeyFigureCode may use the following codes: 1 (i.e., deviation between actual quantity and target quantity), 2 (i.e., deviation from target stock), 3 (i.e., overload), 4 (i.e., underload), 5 (i.e., utilization), 6 (i.e., delay), 7 (i.e., earliness), 8 (i.e., deviation from a time interval), 9 (i.e., deviation from a days' supply).

ExceptionKeyFigureValue

A GDT ExceptionKeyFigureValue is the key figure value of an exception from a business viewpoint; an exception is a means of reporting problems or errors. The key figure value is the result of the calculation or measurement of a deviation from a target value, where this deviation from a target value is the cause of the exception. An example of GDT Exception-KeyFigureValue is:

<ExceptionKeyFigureValue>

<Percent>

13,5

</Percent>

</ExceptionKeyFigureValue>

In certain implementations, GDT ExceptionKeyFigureValue may have the following structure:

| GDT | | Cat. | Object Class | Property | Representation/ Association | Type | Type Name | Len. | Card. |
|---|---|---|---|---|---|---|---|---|---|
| Exception-KeyFigure-Value | | | Exception Key Figure Value | | Details | | | | |
| | Quantity | E | | Quantity | Quantity | GDT | Quantity | 13.6 | 0..1 |
| | Percent | E | | Percent | Percent | GDT | Percent | 10.6 | 0..1 |
| | Duration | E | | Duration | Duration | GDT | Duration | | 0..1 |

For the GDT ExceptionKeyFigureValue structure described above, Quantity is the absolute quantity used to describe the seriousness of an exception. Percent is the percentage used to describe the seriousness of an exception. Duration is the time-based deviation used to describe the seriousness of an exception. At least one element from the set that includes quantity, percentage, or duration is typically specified.

ExceptionTypeCode

A GDT ExceptionTypeCode is the coded representation of an exception type from a business viewpoint, where an exception is a means of reporting problems or errors. The problem or error that caused the exception may be reflected in the exception type. An example of GDT ExceptionTypeCode is:

<ExceptionTypeCode>ISDM21</ExceptionTypeCode>

In certain implementations, GDT ExceptionTypeCode may have the following structure:

| GDT | Object Class | Property | Representation/ Association | Type | Type Name | Len. | Remarks |
|---|---|---|---|---|---|---|---|
| ExceptionTypeCode | Exception | Type | Code | CDT | Code | 6 | Restricted |

For GDT ExceptionTypeCode, a customer-specific code list can be assigned to the code. A listID can be "10185." If the code list is unchanged, a listAgencyID can be "310." Otherwise, a listAgencyID can be the ID of the customer (e.g., ID from DE 3055, if listed there). A listVersionID can be the version of the particular code list (e.g., assigned and managed by the customer). A listAgencySchemeID can be the ID of the scheme if the listAgencyID does not come from DE 3055. The listAgencySchemeAgencyID can be the ID of the organization from DE 3055 that manages the listAgencySchemeID scheme.

The problem or error that caused the exception may be reflected in the exception type. An example of an exception type is a "safety stock shortage." An actual exception of this type would be a safety stock shortage for a specific material in a specific supply planning area.

The data type GDT ExceptionTypeCode may use the following codes: ISDM21 (i.e., order leads to excess stock), ISDM22 (i.e., order leads to stock shortage), ISDM25 (i.e., receipt too late), ISDM26 (i.e., receipt too early), ORCV42 (i.e., order outside validity period), MDOE02 (i.e., availability date in past), MDOE03 (i.e., start date in past), MSCE01 (i.e., safety stock violation), MSCE11 (i.e., shortfall in minimum days' supply), MSCE12 (i.e., shortfall in minimum receipt days' supply), RCUE50 (i.e., capacity overload in bucket), RCUE51 (i.e., capacity underload in bucket), ATPC01 (i.e., product availability check shortage), GENE 01 (i.e., general exception).

The GDT ExceptionTypeCodeContextElements may define a dependency or an environment in which the ExceptionTypeCode appears. The environment may be described by context categories. With the context categories in ExceptionTypeCodeContextElements, the valid portion of code values of ExceptionTypeCodeContextElements may be restricted according to an environment during use.

In certain implementations, GDT ExceptionTypeCodeContextElements may have the following structure:

| GDT | | Cat. | Object Class | Property | Representation/ Association | Type | Type Name | Len. | Card. | Remarks |
|---|---|---|---|---|---|---|---|---|---|---|
| ExceptionTypeCodeContextElements | | | ExceptionType Code Context Elements | | Details | | | | | |
| | BusinessObjectTypeCode | E | ExceptionType Code Context Elements | Business Object Type | Code | GDT | Business Object Type Code | 1..5 | 1 | restricted |

For the ExceptionTypeCodeContextElements structure described above, Exception BusinessObjectCode can define the context ExceptionObject. It may determine the valid code values for a specific projection of the Exception Template.

Exchange Rate

A GDT ExchangeRate is the representation of an exchange rate between two currencies (i.e., the relationship in which one currency can be exchanged for another currency). An example of GDT ExchangeRate is:

<ExchangeRate>
<UnitCurrency>EUR</UnitCurrency>
<QuotedCurrency>USD</QuotedCurrency>
<Rate>1.1234</Rate>
</ExchangeRate>

In certain implementations, GDT ExchangeRate may have the following structure:

| GDT | | Cat. | Object Class | Property | Representation/ Association | Type | Type Name | Card. |
|---|---|---|---|---|---|---|---|---|
| ExchangeRate | | | Exchange Rate | | Details | | | |
| | Unit-Currency | E | Exchange Rate | Unit Currency | Code | GDT | Currency-Code | 1 |
| | Quoted-Currency | E | Exchange Rate | Quoted Currency | Code | GDT | Currency-Code | 1 |
| | Rate | E | Exchange Rate | Rate | Rate | GDT | Exchange-RateRate | 1 |
| | Quota-tionDate-Time | E | Exchange Rate | Quotation Date Time | Date Time | CDT | GLOBAL_ DateTime | 0..1 |

For the GDT ExchangeRate structure described above, UnitCurrency is "leading currency" (see element Rate). QuotedCurrency is "following currency" (see element Rate). Rate is the exchange rate between these currencies. This may correspond to the price at which one unit of the currency UnitCurrency can be changed into the currency QuotedCurrency. QuotationDateTime is the exchange rate date (i.e., the rate and time when the exchange rate was defined). Specifying an exchange rate date is optional.

The following is an example of a scenario in which ExchangeRate can be used:

An incoming invoice was received with currency Dollar. A different currency is to be used for the payment. The exchange rate between invoice and payment currency should therefore be transmitted to the Payment System. Current exchange rates are transmitted to an ERP system daily from a provider such as Reuters.

The exchange rate can be calculated using the formula: 1 UnitCurrency=Rate*QuotedCurrency. Specification of exchange rate factors is typically not supported.

ExchangeRateCategoryCode

A GDT ExchangeRateCategoryCode is a coded representation of an exchange rate category. For a conversion between two currencies, there may be three different exchange rates with different exchange rate categories: bid, mid and ask. The exchange rate utilized may depend on the purpose of the currency conversion (e.g., buying or selling the quoted currency). Some examples of GDT ExchangeRateCategoryCode are:

<ExchangeRateCategoryCode>1</ExchangeRateCategoryCode>or

<ExchangeRateCategoryCode>2</ExchangeRateCategoryCode>or

<ExchangeRateCategoryCode>3</ExchangeRateCategoryCode>

In certain implementations, GDT ExchangeRateCategoryCode may have the following structure:

| GDT | Cat. | Object Class | Property | Representation/ Association | Type | Type Name | Len. | Card. | Remarks |
|---|---|---|---|---|---|---|---|---|---|
| Exchange-RateCategory-Code | | Exchange Rate | Category | Code | CDT | Code | 1 | | restricted |

The data type GDT ExchangeRateCategoryCode may assign one static code list to the code. The attributes may be assigned the following values: listID="10431" and listAgencyID="310."

ExchangeRateCategoryCode may be used for specifying the exchange rates.

The data type GDT ExchangeRateCategoryCode may use the following codes: 1 (i.e., bid), 2 (i.e., mid), 3 (i.e., ask).

ExchangeRateRate

A GDT ExchangeRateRate is the rate at which one unit of a currency can be changed into another currency. An example of GDT ExchangeRateRate is:

<ExchangeRate>
<UnitCurrency>EUR</UnitCurrency>
<QuotedCurrency>USD</QuotedCurrency>
<Rate>1.1234</Rate>
</ExchangeRate>

In certain implementations, GDT ExchangeRateRate may have the following structure:

| GDT | Object Class | Property | Rep./ Ass. | Type | Type Name | Len. | Remarks |
|---|---|---|---|---|---|---|---|
| Exchange-RateRate | Exchange Rate | Rate | Rate | CDT | Numeric | 14.14 | restricted |

ExchangeRateRate is typically used within GDT ExchangeRate. See GDT ExchangeRate (above) for further information.

ExchangeRateTypeCode

A GDT ExchangeRateTypeCode is a coded representation of the type of an exchange rate. The actual exchange rate between two currencies can depend on exchange rate type and currency conversion type. The exchange rate type may define characteristics of an exchange rate according to the currencies that get converted. An example of GDT ExchangeRateTypeCode is:

<ExchangeRateTypeCode>1001</ExchangeRateTypeCode>

In certain implementations, GDT ExchangeRateTypeCode may have the following structure:

| GDT | | Cat. | Object Class | Property | Representation/ Association | Type | Type Name | Len. | Card. | Remarks |
|---|---|---|---|---|---|---|---|---|---|---|
| Exchange-RateType-Code | | | Exchange Rate | Type | Code | CDT | Code | 1..4 | | restricted |
| | listAgencyID | A | Code List Agency | Identification | Identifier | xsd | token | | 0..1 | |
| | listVersionID | A | Code List | Version | Identifier | xsd | token | | 0..1 | |
| | listAgency-SchemeID | A | Code List Agency | Scheme | Identifier | xsd | token | | 0..1 | |
| | listAgency-Scheme-AgencyID | A | Code List Agency | Scheme Agency | Identifier | xsd | token | | 0..1 | |

For GDT ExchangeRateTypeCode, two alternative code lists can be assigned to the code. The primary code list may be the Exchange Rate Type code list of the International Monetary Fund; in certain implementations, alternative code lists are mapped to this. The attributes may be assigned the following values: listID="63" and listAgencyID="UNSTAT."

Alternatively, a customer-specific code list can be assigned to the code. A listID can be "10434." A listAgencyID can be the ID of the customer (e.g., ID from DE 3055, if listed there). A listVersionID can be the version of the particular code list (e.g., assigned and managed by the customer). A listAgency-SchemeID can be the ID of the scheme if the listAgencyID does not come from DE 3055. The listAgencySchemeAgencyID can be the ID of the organization from DE 3055 that manages the listAgencySchemeID scheme.

ExchangeRateTypeCode can be used for classifying an exchange rate. The following are examples of customer-specific codes: Current rate (i.e., current exchange rate), Average rate (i.e., average exchange rate), Historical rate (i.e., historical exchange rate).

The data type GDT ExchangeRateTypeCode may use the following codes: 7906 (i.e., market rate), 7907 (i.e., official rate), 7908 (i.e., principal rate).

ExpenseArrangementID

A GDT ExpenseArrangementID is an identifier for parameters defined by the company that are used for an expense report for an employee. ExpenseArrangement is a definition by the company of parameters for an employee that are needed for an expense report. It can contain parameters relevant for the determination of per diem amounts, the type of standard vehicle, and the standard cost distribution. An example of ExpenseArrangementID is:

<ExpenseArrangementID schemeAgencyID="ERM_001">8091973</ExpenseArrangementID>

In certain implementations, GDT ExpenseArrangementID may have the following structure:

| GDT | | Cat. | Object Class | Property | Representation/ Association | Type | Type Name | Len. | Card. | Remarks |
|---|---|---|---|---|---|---|---|---|---|---|
| Expense-Arrangement-ID | | | Expense Arrangement | Identification | Identifier | CDT | Identifier | 1..10 | | Restricted |
| | scheme-AgencyID | A | Scheme Agency | Identification | Identifier | XSD | token | 60 | 0..1 | Restricted |

The GDT ExpenseArrangementID may have filled attributes. A schemeId may be filled as ExpenseArrangementID. A schemeAgencyID may be filled as the business system which issued the ID.

The ExpenseArrangementID may be unique in the context of an expense reporter (e.g., an employee).

ExpenseClassificationFunctionalAreaCode

A GDT ExpenseClassificationFunctionalAreaCode is the coded representation of a functional area to which costs are assigned in the profit and loss statements using cost of sales accounting (i.e., "classification of expenses by function"). A functional area is a subtask involved in achieving the company goal, such as procurement, production, administration, or marketing, and typically does not represent an organizational unit.

In certain implementations, cost of sales accounting is used to portray the profit and loss statement in accordance with §275, sections 2 and 3, of the German Commercial Code, or with IAS 1, to name two examples.

An example of GDT ExpenseClassificationFunctionalAreaCode is:

<ExpenseClassificationFunctionalAreaCode>PROD</ExpenseClassificationFunctionalAreaCode>

In certain implementations, GDT ExpenseClassification-FunctionalAreaCode may have the following structure:

| GDT | | Cat. | Object Class | Property | Representation/ Association | Type | Type Name | Len. | Card. | Remarks |
|---|---|---|---|---|---|---|---|---|---|---|
| Expense-Classification-Functional-AreaCode | | | | Expense Classification_ Functional Area | Code | CDT | Code | 1..4 | | Restricted |
| | listID | A | Code List | Identification | Identifier | xsd | token | | 0..1 | |
| | listAgencyID | A | Code List Agency | Identification | Identifier | xsd | token | | 0..1 | |
| | listVersionID | A | Code List | Version | Identifier | xsd | token | | 0..1 | |
| | listAgency-SchemeID | A | Code List Agency | Scheme | Identifier | xsd | token | | 0..1 | |
| | listAgency-Scheme-AgencyID | A | Code List Agency | Scheme Agency | Identifier | xsd | token | | 0..1 | |

For GDT ExpenseClassificationFunctionalAreaCode, a customer-specific code list can be assigned to the code. A listID can be "10074." If the code list is unchanged, a listAgencyID can be "310." Otherwise, a listAgencyID can be the ID of the customer (e.g., ID from DE 3055, if listed there). A listVersionID can be the version of the particular code list (e.g., assigned and managed by the customer). A listAgency-SchemeID can be the ID of the scheme if the listAgencyID does not come from DE 3055. The listAgencySchemeAgencyID can be the ID of the organization from DE 3055 that manages the listAgencySchemeID scheme.

ExpenseClassificationFunctionalAreaCode is currently typically used in business objects or A2A messages. In the system, the ExpenseClassificationFunctionalAreaCode may correspond to data element FKBER.

The delivered code values can be used in cost of sales accounting to divide the profit and loss statement in accordance with §275, sections 2 and 3, of the German Commercial Code, for example.

The data type GDT ExpenseClassificationFunctionalAreaCode may use the following codes: 1 (i.e., production costs), 2 (i.e., sales costs), 3 (i.e., general administration costs).

ExpenseReportActivityStayTypeCode

A GDT ExpenseReportActivityStayTypeCode is the coded representation of an activity-specific stay type within an expense report. An activity-specific stay type may classifies stays within an expense report for a business trip based on the tasks of the expense reporter who submits the expense report. An example of GDT ExpenseReportActivityStay-TypeCode is:

<ExpenseReportActivityStayTypeCode>1</ExpenseReportActivityStayTypeCode>

In certain implementations, GDT ExpenseReportActivityStayTypeCode may have the following structure:

| GDT | | Cat. | Object Class | Property | Representation/ Association | Type | Type Name | Len. | Card. | Remarks |
|---|---|---|---|---|---|---|---|---|---|---|
| Expense-ReportActivity-StayTypeCode | | | Expense Report Activity_ Stay Type | | Code | CDT | Code | 1..2 | | restricted |
| | listID | A | Code List | Identification | Identifier | xsd | token | | 0..1 | |

For GDT ExpenseReportActivityStayTypeCode, several custom code lists can be assigned to the code, one of which may be selected by the system at runtime based on which ExpenseReportProvisionVariantCode is involved. A listID can be from the number range 51000-51099.

The following are examples of ExpenseReportActivityStayTypeCode codes: Customer visit (i.e., visit to a customer site), Seminar (i.e., attending a seminar), Trade fair (i.e., visit to a trade fair).

The GDT ExpenseReportActivityStay-TypeCodeContextElements may define a dependency or environment in which ExpenseReportActivityStayTypeCode appears. The environment can be described by context categories. The context categories in ExpenseReportActivityStayTypeCodeContextElements can restrict the allowed code values of ExpenseReportActivityStayTypeCode based on the environment.

In certain implementations, the GDT ExpenseReportActivityStayTypeCodeContextElements may have the following structure:

| GDT | | Cat. | Object Class | Property | Representation/ Association | Type | Type Name | Card. |
|---|---|---|---|---|---|---|---|---|
| Expense-Report-Activity-StayType-Code-Context-Elements | | | Expense-Report-Activity-StayType-Code Context Elements | | Details | | | |
| | Expense-Report-Provision-VariantCode | E | Expense-Report-Activity-StayType-Code Context Elements | Expense-Report-Provision-Variant | Code | GDT | Expense-Report-Provision-Variant Code | 1 |

The context category ExpenseReportProvisionVariantCode may specify the variant of the expense report regulations. This can determine the valid code values for a specific variant.

ExpenseReportEnterpriseStayTypeCode

A GDT ExpenseReportEnterpriseStayTypeCode is the coded representation of a company-specific stay type within an expense report, where a company-specific stay type is a classification of stays within an expense report for a business trip based on company criteria. An example of GDT ExpenseReportEnterpriseStayTypeCode is:

<ExpenseReportEnterpriseStayTypeCode>1</ExpenseReportEnterpriseStayTypeCode>

In certain implementations, GDT ExpenseReportEnterpriseStayTypeCode may have the following structure;

| GDT | | Cat. | Object Class | Property | Representation/ Association | Type | Type Name | Len. | Card. | Remarks |
|---|---|---|---|---|---|---|---|---|---|---|
| Expense-Report-Enterprise-StayType-Code | | | Expense Report Enterprise_ Stay Type | | Code | CDT | Code | 1..2 | | restricted |
| | listID | A | Code List | Identification | Identifier | xsd | token | | 0..1 | |

For GDT ExpenseReportEnterpriseStayTypeCode, several custom code lists can be assigned to the code, one of which may be selected by the system at runtime based on which ExpenseReportProvisionVariantCode is involved. A listID can be from the number range 51100-51199.

The following are examples of ExpenseReportEnterpriseStayTypeCode codes: Stay at a plant (trip between plants), Stay at a destination >100 km, Stay at a destination >50-100 km, Stay at a destination <50 km.

The GDT ExpenseReportEnterpriseStayTypeCodeContextElements can define a dependency or an environment in which ExpenseReportEnterpriseStayTypeCode appears. The environment may be described by context categories. The context categories in ExpenseReportEnterpriseStayTypeCodeContextElements may restrict the allowed code values of ExpenseReportEnterpriseStayTypeCode based on the environment.

In certain implementations, GDT ExpenseReportEnterpriseStayTypeCodeContextElements may have the following structure:

| GDT | | Cat. | Object Class | Property | Representation/ Association | Type | Type Name | Card. |
|---|---|---|---|---|---|---|---|---|
| Expense-Report-Enterprise-StayTypeCode-Context-Elements | | | Expense-Report-Enterprise-StayType-Code Context Elements | | Details | | | |
| | Expense-Report-Provision-VariantCode | E | Expense-Report-Enterprise-StayType-Code Context Elements | Expense-Report-Provision-Variant | Code | GDT | Expense Report-Provision Variant-Code | 1 |

The context category ExpenseReportProvisionVariantCode may specify the variant of the expense report regulations. This can determine the valid code values for a specific variant.

ExpenseReportExpenseCategoryCode

A GDT ExpenseReportExpenseCategoryCode is the coded representation of an expense category within an expense report, where an expense category is a collection of expense types based on commonalities in the settlement procedure, dialog behavior, or statistical evaluation. An example of GDT ExpenseReportExpenseCategoryCode is:

<ExpenseReportExpenseCategoryCode>2</ExpenseReportExpenseCategoryCode>

In certain implementations, GDT ExpenseReportExpenseCategoryCode may have the following structure:

| GDT | Object Class | Property | Representation/ Association | Type | Type Name | Len. | Remarks |
|---|---|---|---|---|---|---|---|
| ExpenseReport-ExpenseCategoryCode | Expense Report Expense | Category | Code | CDT | Code | 1 | restricted |

The data type GDT ExpenseReportExpenseCategoryCode may assign one fixed code list to the code. The attributes may be assigned the following values: listID="10083" and listAgencyID="310." Changes to the permitted values may involve changes to the interface.

An example of ExpenseReportExpenseCategoryCode use is the dialog check, which ensures that no meals receipts can be submitted with per diem settlement for meals.

The data type GDT ExpenseReportExpenseCategoryCode may use the following codes: 1 (i.e., accommodations), 2 (i.e., meals), 3 (i.e., expenses for private car), 4 (i.e., other), 5 (i.e., meals with maximum rates per diem).

ExpenseReportExpenseTypeCode

A GDT ExpenseReportExpenseTypeCode is the coded representation of an expense type within an expense report, where an expense type is a classification of the expenses of an expense reporter based on similarities in the accounting procedure, dialog, payment, settlement, or statistical evaluation. An example of GDT ExpenseReportExpenseTypeCode is:

<ExpenseReportExpenseTypeCode>HOTL</ExpenseReportExpenseTypeCode>

In certain implementations, GDT ExpenseReportExpenseTypeCode may have the following structure:

| GDT | | Cat. | Object Class | Property | Representation/ Association | Type | Type Name | Len. | Card. | Remarks |
|---|---|---|---|---|---|---|---|---|---|---|
| Expense-Report-Expense-TypeCode | | | Expense Report Expense | Type | Code | CDT | Code | 1..4 | | restricted |
| | listID | A | Code List | Identification | Identifier | xsd | token | | 0..1 | |

For GDT ExpenseReportExpenseTypeCode, several custom code lists can be assigned to the code, one of which may be selected by the system at runtime based on which ExpenseReportProvisionVariantCode is involved. A listID can be from the number range 50300-50399.

The following are examples of ExpenseReportExpenseTypeCode codes: Rail (i.e., train ticket), Fuel (i.e., gas receipt), Entertainment (i.e., entertainment receipt), Flight (i.e., airline ticket), Hotel (i.e., hotel receipt), Rental car (i.e., rental car receipt), Parking fee (i.e., parking fee), Postage (i.e., postage fee), Reimburse private expense (i.e., private expense to be reimbursed to the company), Other (i.e., other receipt), Taxi (i.e., taxi receipt), Telephone (i.e., telephone receipt), Tips (i.e., tips), Toll sticker (i.e., toll sticker), Visa (i.e., visa).

The GDT ExpenseReportExpenseTypeCodeContextElements can define a dependency or an environment in which ExpenseReportExpenseTypeCode appears. The environment may be described by context categories. The context categories in ExpenseReportExpenseTypeCodeContextElements may restrict the allowed code values of ExpenseReportExpenseTypeCode based on the environment.

In certain implementations, GDT ExpenseReportExpenseTypeCodeContextElements may have the following structure:

| GDT | | Cat. | Object Class | Property | Representation/ Association | Type | Type Name | Card. |
|---|---|---|---|---|---|---|---|---|
| ExpenseReport-ExpenseType-TypeCode-ContextElements | | | ExpenseReport-ReportExpense-Code Context Elements | | Details | | | |
| | ExpenseReport-ProvisionVariant-Code | E | ExpenseReport-ExpenseType-Code Context Elements | ExpenseReport-ProvisionVariant | Code | GDT | ExpenseReport-ProvisionVariant-Code | 1 |

The context category ExpenseReportProvisionVariantCode may specify the variant of the expense report regulations. This may determine the valid code values for a specific variant.

ExpenseReportID

A GDT ExpenseReportID is an identifier for an expense report of an expense reporter. An example of GDT ExpenseReportID is:

<ExpenseReportID>8021963</ExpenseReportID>

In certain implementations, GDT ExpenseReportID may have the following structure:

| GDT | Object Class | Property | Representation/ Association | Type | Type Name | Len. | Remarks |
|---|---|---|---|---|---|---|---|
| Expense-ReportID | Expense Report | Identification | Identifier | CDT | Identifier | 1..10 | restricted |

An ExpenseReportID is typically represented as a 10-digit number.

Since an expense report of an expense reporter can exist in different versions, the combination of ExpenseReportID and VersionID in the context of an expense reporter can uniquely identify an expense report.

ExpenseReportItinerarySegmentID

A GDT ExpenseReportItinerarySegmentID is a unique identifier for a segment of an itinerary within an expense report. A segment of an itinerary can specify the arrival time at a destination, or another time relevant to settlement, within a business trip of an expense reporter. An example of GDT ExpenseReportItinerarySegmentID is:

<ExpenseReportItinerarySegmentID>1</ExpenseReportItinerarySegmentID>

In certain implementations, GDT ExpenseReportItinerarySegmentID may have the following structure:

| GDT | Object Class | Property | Representation/ Association | Type | Type Name | Len. | Remarks |
|---|---|---|---|---|---|---|---|
| ExpenseReport-Itinerary-SegmentID | Expense Report Itinerary Segment | Identification | Identifier | CDT | Identifier | 1..3 | restricted |

An ExpenseReportItinerarySegmentID is typically represented as a 3-digit number and is unique within the context of an ExpenseReport.

ExpenseReportItinerarySegmentTypeCode

A GDT ExpenseReportItinerarySegmentTypeCode is the coded representation of a segment type of an itinerary within an expense report. A segment type of an itinerary is a classification of the segments of an itinerary based on statutory or business criteria. A segment of an itinerary can specify the arrival time at a destination, or another time relevant to settlement, within a business trip of an expense reporter. An example of GDT ExpenseReportItinerarySegmentTypeCode is:

<ExpenseReportItinerarySegmentTypeCode>1</ExpenseReportItinerarySegmentTypeCode>

In certain implementations, GDT ExpenseReportItinerarySegmentTypeCode may have the following structure:

| GDT | Object Class | Property | Representation/ Association | Type | Type Name | Len. | Remarks |
|---|---|---|---|---|---|---|---|
| ExpenseReport-ItinerarySegment-TypeCode | Expense Report Itinerary Segment | Type | Code | CDT | Code | 1..2 | restricted |

The data type GDT ExpenseReportItinerarySegmentTypeCode may assign one static code list to the code. The attributes may be assigned the following values: listID="10084" and listAgencyID="310." Changes to the permitted values may involve changes to the interface.

The following are examples of ExpenseReportSegments within an itinerary:

Segment type B start of trip: 06/01/2005 9:30 AM departure from Walldorf

Segment type M first destination: 06/01/2005 9:30 AM Darmstadt, Germany, visit company A, Schillerstrasse 3, 64297 Darmstadt Segment type N second destination: 06/03/2005 6:00 PM Mol, Belgium, visit company B, Vareselaan 126, 2400 Mol Segment type N third destination: 06/05/2005 1:00 PM Nancy, France, visit company C, Rue de l'Oratoire 34, 54000 Nancy Segment type R border crossing: 06/08/2005 4:00 PM return to domestic country Segment type E end of trip: 06/08/2005 6:30 PM arrival in Walldorf The data type GDT ExpenseReportItinerarySegmentTypeCode may use the following codes: 1 (i.e., start of trip), 2 (i.e., end of trip), 3 (i.e., border crossing from domestic country into foreign country), 4 (i.e., border crossing for return to domestic country), 5 (i.e., landing at first destination), 6 (i.e., start with return flight), 7 (i.e., first destination at start of trip), 8 (i.e., additional destination, or arrival at destination).

ExpenseReportLocationCategoryCode

A GDT ExpenseReportLocationCategoryCode is the coded representation of the category of a location based on its meaning in an expense report. An example of GDT ExpenseReportLocationCategoryCode is:

<ExpenseReportLocationCategoryCode>1</ExpenseReportLocationCategoryCode>

In certain implementations, GDT ExpenseReportLocationCategoryCode may have the following structure:

| GDT | | Cat. | Object Class | Property | Representation/ Association | Type | Type Name | Len. | Card. | Remarks |
|---|---|---|---|---|---|---|---|---|---|---|
| ExpenseReport-Location-CategoryCode | | | Expense Report Location | Category | Code | CDT | Code | 1..2 | | restricted |
| | listID | A | Code List | Identification | Identifier | xsd | token | | 0..1 | |

For GDT ExpenseReportLocationCategoryCode, several custom code lists can be assigned to the code, one of which may be selected by the system at runtime based on which ExpenseReportProvisionVariantCode is involved. A listID can be from the number range 50400-50499.

The following are examples of ExpenseReportLocationCategoryCode codes: Home (i.e., city of the residence of the expense reporter) and Work (i.e., city of the permanent work center of the expense reporter).

The GDT ExpenseReportLocationCategoryCodeContextElements may define a dependency or an environment in which ExpenseReportLocationCategoryCode appears. The environment can be described by context categories. The context categories in ExpenseReportLocationCategoryCodeContextElements may restrict the allowed code values of ExpenseReportLocationCategoryCode based on the environment.

In certain implementations, GDT ExpenseReportLocationCategoryCodeContextElements may have the following structure:

| GDT | | Cat. | Object Class | Property | Representation/ Association | Type | Type Name | Card. |
|---|---|---|---|---|---|---|---|---|
| ExpenseReport-Location-CategoryCode-ContextElements | | | ExpenseReport-Location-CategoryCode Context Elements | | Details | | | |
| | ExpenseReport-Provision-VariantCode | E | ExpenseReport-Location-CategoryCode Context Elements | ExpenseReport-Provision-Variant | Code | GDT | ExpenseReport-Provision-VariantCode | 1 |

The context category ExpenseReportProvisionVariantCode may specify the variant of the expense report regulations. This may determine the valid code values for a specific variant.

ExpenseReportMileageCumulationPeriodTypeCode

A GDT ExpenseReportMileageCumulationPeriodTypeCode is the coded representation of the type of a calendar-based period of time for which mileage accumulation takes place in a expense report. A mileage accumulation is the sum of the distances of the trip segments covered by an expense reporter for the purpose of determining a distance-scaled travel flat rate within a calendar-based period of time. An example of GDT ExpenseReportMileageCumulationPeriodTypeCode is:

<ExpenseReportMileageCumulationPeriodTypeCode>1</ExpenseReportMileageCumulationPeriodTypeCode>

In certain implementations, GDT ExpenseReportMileageCumulationPeriodTypeCode may have the following structure:

| GDT | | Cat. | Object Class | Property | Representation/ Association | Type | Type Name | Len. | Card. | Remarks |
|---|---|---|---|---|---|---|---|---|---|---|
| ExpenseReport-Mileage-Cumulation-PeriodType-Code | 1 | | Expense Report Mileage Cumulation Period | Type | Code | CDT | Code | 1 | 1 | restricted |
| | list-AgencyID | A | Code List Agency | Identification | Identifier | xsd | token | | 0..1 | |
| | list-VersionID | A | Code List | Version | Identifier | xsd | token | | 0..1 | |
| | list-Agency-SchemeID | A | Code List Agency | Scheme | Identifier | xsd | token | | 0..1 | |
| | list-Agency-Scheme-AgencyID | A | Code List Agency | Scheme Agency | Identifier | xsd | token | | 0..1 | |

For GDT ExpenseReportMileageCumulationPeriodTypeCode, a customer-specific code list can be assigned to the code. A listID can be "Assigned by the Coaching Team." If the code list is unchanged, a listAgencyID can be "310." Otherwise, a listAgencyID can be the ID of the customer (e.g., ID from DE 3055, if listed there). A listVersionID can be the version of the particular code list (e.g., assigned and managed by the customer). A listAgencySchemeID can be the ID of the scheme if the listAgencyID does not come from DE 3055. The listAgencySchemeAgencyID can be the ID of the organization from DE 3055 that manages the listAgencySchemeID scheme.

An ExpenseReportMileageCumulationPeriodTypeCode is currently typically used in BOs.

The following are examples of custom ExpenseReportMileageCumulationPeriodTypeCode codes: Biweekly (i.e., biweekly accumulation of mileage) and Triweekly (i.e., triweekly accumulation of mileage).

The data type GDT ExpenseReportMileageCumulationPeriodTypeCode may use the following codes: 1 (i.e., yearly), 2 (i.e., monthly), 3 (i.e., weekly).

ExpenseReportMileageID

A GDT ExpenseReportMileageID is a unique identifier for the mileage within an expense report. An example of GDT ExpenseReportMileageID is:

<ExpenseReportMileageID>1</ExpenseReportMileageID>

In certain implementations, GDT ExpenseReportMileageID may have the following structure:

| GDT | Object Class | Property | Representation/ Association | Type | Type Name | Len. | Remarks |
|---|---|---|---|---|---|---|---|
| ExpenseReport-MileageID | Expense Report Mileage | Identification | Identifier | CDT | Identifier | 1..3 | restricted |

An ExpenseReportMileageID may be represented as a 3-digit number, and is typically unique within the context of an ExpenseReport.

ExpenseReportProvisionVariantCode

A GDT ExpenseReportProvisionVariantCode is the coded representation of a variant of expense report provisions based on the territory or expense reporting method. An ExpenseReportProvisionVariantCode can be used as the rule for determining the reimbursement of expenses and their taxation. An example of GDT ExpenseReportProvisionVariantCode is:

<ExpenseReportProvisionVariant Code>1</ExpenseReportProvisionVariant Code>

In certain implementations, GDT ExpenseReportProvisionVariantCode may have the following structure:

| GDT | Object Class | Property | Representation/ Association | Type | Type Name | Len. | Remarks |
|---|---|---|---|---|---|---|---|
| ExpenseReport-ProvisionVariant-Code | Expense Report Provision Variant | Code | CDT | Code | 1..4 | restricted | |

-

The GDT ExpenseReportProvisionVariantCode can be a customer-specific codelist and it may include the following: listID can be "10349," If the code list is unchanged, a listAgencyID can be the ID of the customer (, ID from DE 305, if listed there). A listVersionID can be the version of the particular code list (, assigned and managed by the customer). A listAgencySchemeID can be the ID of the scheme if the listAgencyID does not come from DE 3055. The listAgencySchemeAgencyID can be the ID of the organization from DE 3055 that manages the listAgencySchemeID scheme.

ExpenseReportReceiptID

A GDT ExpenseReportReceiptID is an identifier for an expense receipt within an expense report. An ExpenseReportReceiptID can be used as a proof of an expense incurred for the company. An example of GDT ExpenseReportReceiptID code is:

<ExpenseReportReceiptID>1</ExpenseReportReceiptID>

In certain implementations, GDT ExpenseReportReceiptID may have the following structure:

| GDT | Object Class | Property | Representation/ Association | Type | Type Name | Len. | Remarks |
|---|---|---|---|---|---|---|---|
| ExpenseReport-ReceiptID | Expense Report Receipt | Identification | Identifier | CDT | Identifier | 1..3 | restricted |

The GDT ExpenseReportReceiptID, described above, can be a customer-specific code which can be assigned as a 3-digit number. An ExpenseReportReceiptID can be used within the context of an ExpenseReport.

ExpenseReportStatutoryStayTypeCode

A GDT ExpenseReportStatutoryStayTypeCode is the coded representation of a statutory stay type within an expense report. A statutory stay type is a classification of stays within an expense report for a business trip based on legal criteria. An example of GDT ExpenseReportStatutoryStayTypeCode is:

<ExpenseReportStatutoryStayTypeCode>1</ExpenseReportStatutoryStayTypeCode>

In certain implementations, GDT ExpenseReportStatutoryStayTypeCode may have the following structure:

| GDT | Object Class | Property | Representation/ Association | Type | Type Name | Len. | Card. | Remarks |
|---|---|---|---|---|---|---|---|---|
| ExpenseReport-StatutoryStay-TypeCode | Expense Report Statutory_ StayType | | Code | CDT | Code | 1..2 | | restricted |

The GDT ExpenseReportStatutoryStayTypeCode can be a codelist with given attributes and it may include the following values: a listID that can range from 50500-50599, and it can also be selected at runtime based on which ExpenseReportStatutoryStayTypeCode is involved.

The GDT ExpenseReportStatutoryStayTypeCode and its values may include: Business trip (i.e., Business trip-A business trip is an external stay for company reasons), and Private stay (i.e., Private stay-A private stay is during business trip, for which no per diems are reimbursed).

ExpenseReportStatutoryStayTypeCodeContextElements

A GDT ExpenseReportStatutoryStayTypeCodeContextElements may define a dependency or environment in which ExpenseReportStatutoryStayTypeCode appears. The environment can be described by context categories. The context categories in ExpenseReportStatutoryStayTypeCodeContextElements may restrict the allowed code values of ExpenseReportStatutoryStayTypeCode based on the environment.

In certain implementations, GDT ExpenseReportStatutoryStayTypeCodeContextElements may have the following structure:

| GDT | Cat. | Object Class | Property | Representation/ Association | Type | Type Name | Card. |
|---|---|---|---|---|---|---|---|
| ExpenseReport-StatutoryStay-TypeCode-ContextElements | | ExpenseReport StatutoryStay-TypeCode Context Elements | | Details | | | |
| | E | ExpenseReport-StatutoryStay-TypeCode Context Elements | ExpenseReport-ProvisionVariant | Code | GDT | ExpenseReport-Provision-VariantCode | 1 |

The GDT ExpenseReportStatutoryStayTypeCodeContextElements can be a codelist with given attributes and values. The ExpenseReportStatutoryStayTypeCodeContextElements may specify the variant of the expense report regulations. The ExpenseReportStatutoryStayTypeCodeContextElements may determine the valid code values for a specific variant.

ExpenseReportTypeCode

A GDT ExpenseReportTypeCode can be the coded representation of the type of an expense report. An expense report may be used as a collection of receipts for expenses incurred for company purposes that can be reimbursed to an expense reporter. In the case of a business trip, the expense report also may contain general information such as destinations, dates and times, and mileages. An GDT ExpenseReportTypeCode is:

<ExpenseReportTypeCode>1</ExpenseReportTypeCode>

In certain implementations, GDT ExpenseReportTypeCode may have the following structure:

| GDT | | Cat. | Representation/ Object Class | Property | Type Association | Type | Name | Len. | Card. | Remarks |
|---|---|---|---|---|---|---|---|---|---|---|
| ExpenseReport-TypeCode | | | Expense Report | Type | Code | CDT | Code | 1..2 | | restricted |
| | listID | A | Code List | Identification | Identifier | xsd | token | | 0..1 | |

The GDT ExpenseReportTypeCode can be a codelist with given attributes and it may include the following values: listID can range from 50600-50699, and it can also be selected at runtime based on which ExpenseReportTypeCode is involved.

The GDT ExpenseReportTypeCode and its values may include: Domestic business trip (i.e., Business trip—where the employee does not leave the domestic country), Foreign business trip (i.e., Foreign business trip—where the employee stays partially or only in a foreign country), and Expense report without business trip (i.e., Expense report without business trip-Expenses that are not connected to a business trip).

ExpenseReportTypeCodeContextElements

A GDT ExpenseReportTypeCodeContextElements can be define as a dependency or environment in which ExpenseReportTypeCode appears. The environment may be described by context categories. The context categories in ExpenseReportTypeCodeContextElements may restrict the allowed code values of ExpenseReportTypeCode based on the environment.

In certain implementations, GDT ExpenseReportTypeCodeContextElements may have the following structure:

| GDT | | Cat. | Object Class | Property | Representation/ Association | Type | Type Name | Card. |
|---|---|---|---|---|---|---|---|---|
| ExpenseReport-TypeCode-ContextElements | | | ExpenseReport-TypeCode Context Elements | | Details | | | |
| | ExpenseReport-Provision-VariantCode | E | ExpenseReport-TypeCode Context Elements | ExpenseReport-Provision-Variant | Code | GDT | ExpenseReport-Provision-VariantCode | 1 |

The GDT ExpenseReportTypeCodeContextElements, described above, can be a codelist with given attributes and value. The ExpenseReportProvisionVariantCode may be the context category that may specify the variant of the expense report regulations. The context category may determine the valid code values for a specific variant.

ExpenseReporterGroupCode

A GDT ExpenseReporterGroupCode can be the coded representation for a group of expense reporters for the purpose of expense reporting. An example of GDT ExpenseReporterGroupCode is:

<ExpenseReporterGroupCode>1</ExpenseReporterGroupCode>

In certain implementations, GDT ExpenseReporterGroupCode may have the following structure:

| GDT | Object Class | Representation/ Association | Type | Type Name | Len. | Remarks |
|---|---|---|---|---|---|---|
| ExpenseReporter-GroupCode | Expense Reporter Group | Code | CDT | Code | 1..4 | restricted |

The GDT ExpenseReporterGroupCode can be a codelist with given attributes and it may include the following values: listID can be "10352," if the code list is unchanged, a listAgencyID can be the ID of the customer, (ID from DE 3055, if listed there). A listVersionID can be the version of the particular code list (, assigned and managed by the customer). A listAgencySchemeID can be the ID of the scheme if the listAgencyID does not come from DE 3055. The listAgencySchemeAgencyID can be the ID of the organization from DE 3055 that manages the listAgencySchemeID scheme.

The listID, described above, can be used for clerk assignment or authorization checks. GDT ExpenseReporterGroupCode may define a group of expense reporters based on expense provisions regarding reimbursement of meals, accommodations, or travel costs. The following ExpenseReporterGroupCodes may be used: EnterpriseAccommodationReimbursementExpenseReporterGroupCode, EnterpriseMealsReimbursementExpenseReporterGroupCode, EnterpriseMileageReimbursementExpenseReporterGroupCode, StatutoryAccommodationReimbursementExpenseReporterGroupCode, StatutoryMealsReimbursementExpenseReporterGroupCode, StatutoryMileageReimbursementExpenseReporterGroupCode.

The GDT ExpenseReporterGroupCode and its values may include: Office employees (i.e., Office employees-who are mainly office-based), and Field employees (i.e., Field employees who work mainly in the field).

ExpenseTypeExpenseReporterGroupCode

A GDT ExpenseTypeExpenseReporterGroupCode can be the coded representation of a group of expense reporters, whereby the group based on the expense types allowed for the expense report. An example of GDT ExpenseTypeExpenseReporterGroupCode is:

<ExpenseTypeExpenseReporterGroupCode>1 <ExpenseTypeExpenseReporterGroupCode>

In certain implementations, GDT ExpenseReporterGroupCode may have the following structure:

| GDT | Object Class | Representation/ Association | Type | Type Name | Len. | Remarks |
|---|---|---|---|---|---|---|
| Expense-TypeEx-penseRe-porterGroup-Code | Expense Type_ Ex-pense Re-porter Group | Code | CDT | Code | 1 | restricted |

For GDT ExpenseTypeExpenseReporterGroupCode can be a codelist with given attributes and it may include the following values: listID can be "10282," if the code list is unchanged, a listAgencyID can be the ID of the customer (, ID from DE 3055, if listed there). A listVersionID can be the version of the particular code list (, assigned and managed by the customer). A listAgencySchemeID can be the ID of the scheme if the listAgencyID does not come from DE 3055. The listAgencySchemeAgencyID can be the ID of the organization from DE 3055 that manages the listAgencySchemeID scheme. The type of an expense report establishes basic attributes for recording and processing the expense report based on expense reporters group criteria.

The GDT ExpenseTypeExpenseReporterGroupCode and its values may include the following: Expense reporters (i.e., Expense reporters-who are not allowed to submit entertainment receipts), and Expense reporters (i.e., Expense reporters-who are allowed to submit receipts of all expense types).

ExponentialRepresentationTypeCode

A GDT ExponentialRepresentationTypeCode can be a coded representation for how a number is displayed in exponential form in base 10. An example of GDT ExponentialRepresentationTypeCode is:

<ExponentialRepresentationTypeCode>1</ExponentialRepresentationTypeCode>

In certain implementations, GDT ExponentialRepresentationTypeCode may have the following structure:

| GDT | Object Class | Representation/ Association | Type | Type Name | Len. | Remarks |
|---|---|---|---|---|---|---|
| Exponential-Represen-tation-Type-Code | Expo-nential Repre-senta-tion Type | Code | CDT | Code | 1 | Restricted |

The GDT ExponentialRepresentationTypeCode can be an exponential form in base 10 comprises the mantissa (as a real number with predecimal and decimal places) and a whole number exponent for base 10, where the mantissa and exponent are separated by "E-": (, 1.5E-5). The mantissa can be specified with a decimal point and a comma is used for thousands. The GDT ExponentialRepresentationTypeCode can be a codelist with given attributes and it may include following values: listID="10024," listAgencyID="310," listVersionID="tbd."

The GDT ExponentialRepresentationTypeCode may regulate the format of an exponential number (e.g., on a monitor or printout) but, in certain implementations, does not affect the technical representation when data is transferred or stored. The format may not be a function of the customer, but it can be the purpose (scientific environment), and consequently of the instance of the data type. The ExponentialRepresentationTypeCode may correspond to the coding for the exponential representation type in R/3 classification.

The GDT ExponentialRepresentationTypeCode codelist and its values may include the following: 1 (i.e., Standard), 2 (i.e., Predefined exponent), 3 (i.e., Scientific). In the case of code 2—predefined exponent—the GDT PropertyDataType may contain an additional attribute, which may contain the value of the exponent. When code 3 is used, there can be a maximum of three predecimal places. If the template is exceeded, the exponent can be increased by 3.

FamilyNamePrefixCode

A GDT FamilyNamePrefixCode can be the coded representation of one or more prefix words for the name of a person. An example of GDT FamilyNamePrefixCode is:

<FamilyNamePrefixCode listAgencyID=310>0001</FamilyNamePrefixCode>

In certain implementations, GDT FamilyNamePrefixCode may have the following structure:

| GDT | Cat. | Object Class | Property | Repre-sentation/ Asso-ciation | Type | Type Name | Len. | Card. |
|---|---|---|---|---|---|---|---|---|
| Family-Name-Prefix-Code | | | Family Name Prefix | Code | CDT | Code | 1..4 | |
| | A | Code List | Identi-fication | Identifier | xsd | token | | 0..1 |
| | A | Code List Agency | Identi-fication | Identifier | xsd | token | | 0..1 |
| | A | Code List | Version | Identifier | xsd | token | | 0..1 |
| | A | Code List Agency | Scheme | Identifier | xsd | token | | 0..1 |
| | A | Code List Agency | Scheme Agency | Identifier | xsd | token | | 0..1 |

For GDT FamilyNamePrefixCode cane be a customer-specific code list with attributes and it may include the following values: ListID can be "10163," if the code list is unchanged, listAgencyID can be "310," if the codelist was created during configuration then the list agency ID can be used (ID from DE 3055, if listed there). A listVersionID can be the version of the particular code list (, assigned and managed by the user). A listAgencySchemeID can be the ID of the scheme if the listAgencyID does not come from DE 3055. The listAgencySchemeAgencyID can be the ID of the organization from DE 3055 that manages the listAgencySchemeID scheme.

The GDT FamilyNamePrefixCode can be used as part of the name in the representation of the name of a person. A FamilyNamePrefixCode can represent a title such as "von." The values for FamilyNamePrefixCode can be located in table TSAD4.

The GDT FamilyNamePrefixCode and its values may include the following codes: 0001 (i.e., von), 0002 (i.e., von der), 0003 (i.e., van), 0004 (i.e., van der), 0005 (i.e., da) 0006 (i.e., de), 0007 (i.e., de la), 0008 (i.e., dos), 0009 (i.e., du).

FeasibilityStatusCode

A GDT FeasibilityStatusCode can be the coded representation of the feasibility. Feasibility usually depends on whether or not certain prerequisites are fulfilled. An example of GDT FeasibilityStatusCode is:

<FeasibilityStatusCode>1</FeasibilityStatusCode>

In certain implementations, GDT FeasibilityStatusCode may have the following structure:

| GDT | Property | Representation/ Association | Type | Type Name | Len. | Remarks |
|---|---|---|---|---|---|---|
| Feasibility-StatusCode | Feasibility Status | Code | CDT | Code | 1 | Restricted |

The GDT FeasibilityStatusCode can be a codelist with given attributes and it may include the following values: listID="10265," if the code list is unchanged, listAgencyID="310."

The GDT FeasibilityStatusCode and its values may include the following codes: Qualifier (i.e., Qualifier—may start feasibilityStatusCode), Definition (i.e., Definition—may start feasibility of something).

FindingID

A GDT FindingID can be an identifier for a finding. A finding is the result of an examination in the context of an inspection. The inspection can, for example, be a material inspection. An example of GDT FindingID code is:

<FindingID>123456789101</FindingID>

In certain implementations, GDT FindingID may have the following structure:

| GDT | Object Class | Property | Rep-resen-tation/ Asso-ciation | Type | Type Name | Len. | Card. | Re-marks |
|---|---|---|---|---|---|---|---|---|
| Find-ingID | Find-ing | Iden-tification | Iden-tifier | CDT | Iden-tifier | 1..12 | | Re-stricted |

The GDT FindingID, described above, can be used to identify a finding from a material inspection throughout the system. The listID can be represented in the GDT system as: Data element: (e.g., QIE_TV_FIND_NUMBER), Domain (e.g., QIE_FIND_NUMBER). The GDT FindingID does not provide further descriptions and attributes.

FindingTypeCode

A GDT FindingTypeCode can be a coded representation of the type of a finding. A finding is the result of an examination in the context of an inspection. The inspection can, for example, be a material inspection. An example of GDT FindingTypeCode is:

<FindingTypeCode>2</FindingTypeCode>

In certain implementations, GDT FindingTypeCode may have the following structure:

| GDT | Object Class | Property | Rep-resen-tation/ Asso-ciation | Type | Type Name | Len. | Re-marks |
|---|---|---|---|---|---|---|---|
| Find-ingType-Code | Find-ing | Type | Code | CDT | Code | 1..15 | re-stricted |

The GDT FindingTypeCode, described above, can be a codelist with given attributes and it may include the following value: listID="10162," and the listAgencyID, listVersionID, listAgencySchemeID, and listAgencySchemeAgencyID may be missing from the structure, as they were reserved for customer-specific values during the runtime.

The FindingTypeCode can be used for the definition and delimitation of a finding type. It may describe the properties used to record findings. These properties may include the assignment of a codelist or a number range assignment.

The GDT FindingTypeCode and its values may include the following: Goods receipt finding (i.e., Goods receipt finding-Finding for a goods receipt inspection for delivered materials), Invoice finding (i.e., Invoice finding-Finding for cases where there is a discrepancy in an invoice), Complaint finding (i.e., Complaint finding-Finding for a customer complaint due to a defect in a product).

FiscalYearID

A GDT FiscalYearID can be used as an Identifier for a fiscal year. A fiscal year (business year) can be a specific period of time designated by a numerical year value for which the profit and loss of a company is regularly accounted (inventory and balance sheet). An example of GDT FiscalYearID code is:

<FiscalYearID>2009</FiscalYearID>

In certain implementations, GDT FiscalYearID may have the following structure:

| GDT | Object Class | Property | Rep-resen-tation/ Asso-ciation | Type | Type Name | Len. | Re-marks |
|---|---|---|---|---|---|---|---|
| Fiscal-YearID | Fiscal Year | Iden-tification | Iden-tifier | CDT | Iden-tifier | 4 | Re-stricted |

The GDT FiscalYearID, described above, can be a listID, which can be assigned to a codelist and it also can be represented by a 4 digit positive number, which may be restricted by CCT Identifier. The GDT FiscalYear financial statement typically can be reported for a specific fiscal year. A fiscal year may contain a number of designated accounting periods. The GDT FiscalYear may not be identical with a calendar year, for example, the fiscal year "2005" of GDT may begin on Oct. 1, 2004 and end on Sep. 30, 2005. The GDT FiscalYearID can be used to assign transactions to accounting periods.

FiscalYearVariantCode

A GDT FiscalYearVariantCode can be a coded representation of a fiscal year variant. A fiscal year variant may define the first and last day of a fiscal year and its division into accounting periods. An example of GDT FiscalYearVariantCode is:

<FiscalYearVariantCode>K4</FiscalYearVariantCode>

In certain implementations, GDT FiscalYearVariantCode may have the following structure:

| GDT | Object Class | Rep-resen-tation/ Asso-ciation | Type | Type Name | Len. | Remarks |
|---|---|---|---|---|---|---|
| Fiscal-Year-Variant-Code | Fiscal Year Variant | Code | CDT | Code | 1..2 | Restricted |

The GDT FiscalYearVariantCode, described above, can be a codelist with given attributes and it may include the following values, for example: listID="10487." In certain implementations, the attributes of FiscalYearVariantCode may not be required because they can be assigned to constant values in a customer system at runtime.

The GDT FiscalYearVariantCode and its values may include: Calendar year (i.e., Calendar year—the fiscal year aligned to the calendar year and has 12 accounting periods aligned to calendar months).

FixedAssetCalculationPeriodID

A GDT FixedAssetCalculationPeriodID can be an ID for a calculation period in Asset Accounting within a fiscal year. The FixedAssetCalculationPeriodID can be used to divide the fiscal year into calculation periods for value calculation in Asset Accounting. The calculation periods can be different from the posting periods of Financial Accounting. An example of GDT FixedAssetCalculationPeriodID code is:

<FixedAssetCalculationPeriodID>123</FixedAssetCalculationPeriodID>

In certain implementations, GDT FixedAssetCalculationPeriodID may have the following structure:

| GDT | Object Class | Property | Representation/Association | Type | Type Name | Len. | Remarks |
|---|---|---|---|---|---|---|---|
| FixedAssetCalculationPeriodID | Fixed Asset Calculation Period | Identification | Identifier | CDT | Identifier | 1..3 | Restricted |

The GDT FixedAssetCalculationPeriodID, described above, can be a codelist, which can be assigned to a listID, which can be represented by a positive three-digit number. The FixedAssetCalculationPeriodID may contain a codelist ranging from 1 to 366.

FixedAssetClassCode

A GDT FixedAssetClassCode is the result of a fixed asset class. A fixed asset class can be identified as fixed assets (FixedAssets). The GDT FixedAssetClassCode main criterion can be located in the grouping of fixed assets with the respect of business criteria and legal requirements. An example of GDT FixedAssetClassCode is:

<FixedAssetClassCode>3000</FixedAssetClassCode>

In certain implementations, GDT FixedAssetClassCode may have the following structure:

| GDT | Object Class | Property | Representation/Association | Type | Type Name | Len. | Remarks |
|---|---|---|---|---|---|---|---|
| FixedAssetClassCode | Fixed Asset | Class | Code | CDT | Code | 1..8 | Restricted |

The GDT FixedAssetClassCode, described above, can be a codelist with given attributes and it may include the following value: listID="10142." In certain implementations, the attributes of FixedAssetValuationViewCode may not be required because they can be assigned to constant values in the customer system at runtime.

The GDT FixedAssetClassCode and its values may include the following: (i.e., buildings), (i.e., data processing/hardware), (i.e., machines with the declining-balance method of depreciation).

FixedAssetID

A GDT FixedAssetID can be used as an ID for a fixed asset. A fixed asset may be defined for the purposes of Financial Accounting, of one or more physical object, rights or other economic goods belonging to a company. These can be used in long-term use, are recognized in the financial statements at closing, and may be individually identifiable. It can also include the recording of the values for this view. An example of GDT FixedAssetID is:

<FixedAssetID>1</FixedAssetID>

In certain implementations, GDT FixedAssetID may have the following structure:

| GDT | Object Class | Property | Representation/Association | Type | Type Name | Len. | Remarks |
|---|---|---|---|---|---|---|---|
| FixedAssetID | Fixed Asset | Identification | Identifier | CDT | Identifier | 1..4 | Restricted |

The GDT FixedAssetID, described above, generally does not contain specified descriptions and values. The fixed asset may have a number, which has two parts, for example: a main part and a sub-part. The FixedAsset main-part can be identified as a MasterFixedAssetID and the sub-part can be identified as a FixedAssetID. The listID can be identified by the MasterFixedAssetID from one or several fixed assets in the context of the company (Company) and of a business unit.

The GDT FixedAssetID can be used the following ways: (to manage subsequent acquisitions for a fixed asset separately) and (to represent comprehensive complex fixed assets using sub-assets).

FixedAssetKeyFigureCode

A GDT FixedAssetKeyFigureCode can be a coded representation of a key figure of Asset Accounting. The key figures of Asset Accounting can be calculated values that represent the value changes of the asset balance. The individual value changes can be summarized according to different categories and displayed. The value "net book value" is an example of a FixedAssetKeyFigureCode. An example of GDT FixedAssetKeyFigureCode is:

<FixedAssetKeyFigureCode>33</FixedAssetKeyFigureCode>

In certain implementations, GDT FixedAssetKeyFigureCode may have the following structure:

| GDT | Object Class | Property | Representation/Association | Type | Type Name | Len. | Remarks |
|---|---|---|---|---|---|---|---|
| FixedAssetKeyFigureCode | Fixed Asset | Key Figure | Code | CDT | Code | 1..3 | Restricted |

The GDT FixedAssetKeyFigureCode, described above, can be a codelist with given attributes and it may include the following values: listID="10488" and listAgencyID="310." The FixedAssetKeyFigureCode can be used in reporting and in the value display of a fixed asset.

The GDT FixedAssetKeyFigureCode and its values may include the following codes: 1 (i.e., acquisition and production costs), 2 (i.e., down payments), 3 (i.e., investment support), 4 (i.e., reserves), 5 (i.e., revaluation of acquisition and production costs), 6 (i.e., ordinary depreciation), 7 (i.e., special depreciation), 8 (i.e., revaluation of depreciation), 9 (i.e., unplanned depreciation), 10 (i.e., write-ups), 21 (i.e., value adjustment of ordinary depreciation), 22 (i.e., value adjustment of special depreciation), 23 (i.e., value adjustment of unplanned depreciation), 24 (i.e., value adjustment of the revaluation depreciation), 25 (i.e., interest), 31 (i.e., acquisition value) 32 (i.e., value adjustment of depreciation), 33 (i.e., net book value), 104 (i.e., planned reserves), 105 (i.e., planned revaluations of acquisition and production costs), 106 (i.e., planned ordinary depreciation), 107 (i.e., planned special depreciation), 108 (i.e., planned revaluation of depreciation), 125 (i.e., planned interest), 131 (i.e., planned acquisition value), 132 (i.e., planned valued adjustment of depreciation), 133 (i.e., Planned net book value).

FixedAssetValuationViewCode

A GDT FixedAssetValuationViewCode can be a coded representation of a fixed asset valuation view. A fixed asset valuation view can be a legally stipulated or calculation for cost accounting view for the valuation of a part of fixed assets in a set of books. An example of GDT FixedAssetValuationViewCode is:

<FixedAssetValuationViewCode>1</FixedAssetValuationViewCode>

In certain implementations, GDT FixedAssetValuationViewCode may have the following structure:

| GDT | Object Class | Property | Representation/Association | Type | Type Name | Len. | Remarks |
|---|---|---|---|---|---|---|---|
| Fixed-Asset-Valuation-View-Code | Fixed Asset | Valuation View | Code | CDT | Code | 1..6 | Restricted |

The GDT FixedAssetValuationViewCode, described above, can be a codelist with given attributes and it may include the following value: listID="10143." In certain implementations, the attributes of FixedAssetValuationViewCode may not be required because they would be assigned to constant values in a customer system at runtime. The FixedAssetValuationViewCode normally can be used in the business object models and in configuration.

In some countries, in the local set of books, in addition to balance sheet-relevant reporting of fixed assets, another type of reporting may be used for tax purposes. This might be based on the same acquisition and production costs, however, there also can be different depreciation methods. As these are local requirements and the identification of the acquisition and production costs is necessary for the local financial statements, this data can be managed in the same set of books and can be distinguished by the fixed asset valuation view.

The GDT FixedAssetValuationViewCode and its values may include the following codes: (i.e., GCC-valuation view for fixed assets in accordance with the German Commercial Code), (i.e., GCC Tax—valuation view for fixed assets in accordance with the Germany Commercial Code) (i.e., GCC-taking account of the tax law), (i.e., GCC-Calc-calculation for cost accounting valuation view for internal Accounting), (i.e., IAS Group Valuation-valuation view for fixed assets in accordance with the International Accounting Standard (IAS) for parallel valuation).

FixingCode

A GDT FixingCode can be a coded representation of the fixation of something. The word "something" generally stands for an object or an attribute of an object. An example of GDT FixingCode is:

<FixingCode>1</FixingCode>

In certain implementations, GDT FixingCode may have the following structure:

| GDT | Cat. | Object Class | Property | Representation/Association | Type | Type Name | Len. | Card. | Remarks |
|---|---|---|---|---|---|---|---|---|---|
| Fixing-Code | | | Fixing | Code | CDT | Code | 1 | | restricted |

The GDT FixingCode, described above, can be a customer-specific code list with given attributes and it may include the following values: listID="10470" and listAgency="310." The FixingCode can be used for objects which can between being fixed or not fixed, for example, the object-planned-material-flow has a fixed flow quantity and a flow quantity. When both quantities are greater than zero, the total quantity can be partly fixed. The GDT FixedIndicator can be used for fixed or not fixed objects.

The GDT FixingCode and its values may include the following codes: 1 (i.e., not fixed), 2 (i.e., fixed), 3 (i.e., partly fixed).

FloatValue

A GDT FloatValue is a numeric value represented as a floating point number. Examples of GDT FloatValueType are the following codes:

<PropertyValue>

<FloatValue>6.02214E+23</FloatValue>

</PropertyValue>

In certain implementations, GDT FloatValue may have the following structure:

| GDT | Rep./Ass. Qualifier. | Representation/Association | Type | Type Name |
|---|---|---|---|---|
| FloatValue | Float | Value | xsd | float |

The GDT FixingCode, described above, can be a customer-specific code-list with given attributes and values. A FloatValue can be a qualified basic GDT based on the secondary representation term Value of the GDT Numeric. FloatValue can be used if the reference to the floating point representation of the element based on FloatValue is both meaningful and desired from a semantic perspective. This can be the case with mathematical and technical numeric values. The Float qualifier then becomes part of the element name. As a rule, numeric business values may not be defined using their floating point representation. Instead, this representation may typically derive from the semantics of the numeric value. An example of this can be Measure. FloatValue may not be used if this is the case.

FloorID

A GDT FloorID is an identifier of a floor within a building. An example of GDT FloorID code is:

<FloorID>3</FloorID>

In certain implementations, GDT FloorID may have the following structure:

| GDT | Object Class | Property | Representation/Association | Type | Type Name | Len. | Remarks |
|---|---|---|---|---|---|---|---|
| FloorID | Floor | Identification | Identifier | CDT | Identifier | 1..10 | Restricted |

The GDT FloorID, described above, can be a customer-specific codelist with given attributes and values. The FloorID can be used for address and business partner. The FloorID can be assigned to each building.

FollowUpBusinessTransactionDocumentRequirementCode

A GDT FollowUpBusinessTransactionDocumentRequirementCode can be a coded representation of the need for a follow-up document. An example of GDT FollowUpBusinessTransactionDocumentRequirementCode is:

<FollowUpInvoiceRequirementCode>01</FollowUpInvoiceRequirementCode>

In certain implementations, GDT FollowUpBusinessTransactionDocumentRequirementCode may have the following structure:

| GDT | Object Class Qual. | Object Class | Property | Representation/ Association | Type | Type Name | Len. | Remarks |
|---|---|---|---|---|---|---|---|---|
| FollowUpBusiness-TransactionDocu-mentRequirement-Code | Follow Up | Business Transaction Document | Requirement | Code | CDT | Code | 2 | Enumeration = „01 02 03 04 05" |

The GDT FollowUpBusinessTransactionDocumentRequirementCode, described above, can be a customer-specific code-list with attributes and it may include the following values: listID="10025," listAgencyID="310," listVersionID="tbd."

The FollowUpDocumentRequirementCode can be used to control the exchange of documents within a business process at runtime. It can be refer from the context in which it can be used to a follow-up document. When the GDT is used in a document, "BusinessTransactionDocument" can be replaced by the respective follow-up document, (e.g., Invoice). A default procedure may specified every time a "FollowUpBusinessTransactionRequirementCode" is used.

An example of GDT order confirmation process can be the following: "In an order process, the customer may use a FollowUpDocumentRequirementCode in the purchase order to specify if an order confirmation is "unexpected;" this means that the customer does not expect a confirmation as part of the business transaction but is technically able to receive and file a confirmation." The "FollowUpBusinessTransactionDocumentRequirementCode" can be a proprietary code list with fixed predefined values and changes to the permitted values may involve changes to the interface.

The GDT FollowUpBusinessTransactionDocumentRequirementCode may include the following codes: 01 (i.e., Required—The follow-up document is required in the subsequent process), 02 (i.e., Expected—The follow-up document can be expected in the subsequent process, but not absolutely necessary), 03 (i.e., Optional—The follow-up document can be optional), 04 (i.e., Not Expected—The follow-up document is not expected, but can be received and processed), 05 (i.e., Forbidden—The follow-up document can be forbidden; it may not be received or processed).

FollowUpMessageRequirementCode

A GDT FollowUpMessageRequirementCode can be a coded representation of the necessity of a follow-up message. An example of GDT FollowUpMessageRequirementCode is:

<FollowUpInvoiceRequestRequirementCode>01</FollowUpInvoiceRequestRequirementCode>

In certain implementations, GDT FollowUpMessageRequirementCode may have the following structure:

| GDT | Object Class Qual. | Object Class | Property | Rep./Ass. | Type | Type Name | Len. | Remarks |
|---|---|---|---|---|---|---|---|---|
| FollowUpMes-sageRequirement-Code | FollowUp | Message | Requirement | Code | CDT | Code | 2 | restricted |

The GDT FollowUpMessageRequirementCode, described above, can be a customer-specific codelist with given attributes and it may include the following values: listID="10026," listAgencyID="310" and listVersionID="tbd."

The FollowUpMessageRequirementCode can be used to control the exchange of messages within a business process at runtime. FollowUpMessageRequirementCode can refer to the context in which it is used to a follow-up message. When the GDT is used in a document, "Message" can be replaced by the respective follow-up message, for example, "InvoiceRequest." The follow-up message names that are permitted can be listed in the GDT MessageTypeCode. The GDT default procedure can be specified every time a FollowUpMessageRequirementCode is used.

An example of GDT FollowUpMessageRequirementCode order "unexpected" confirmation process can be the following: "In an order process, the buyer uses a FollowUpMessageRequirementCode in the purchase order to specify that an order confirmation is "unexpected;" this means that the buyer does not expect an confirmation as part of the business trans-action but is technically able to receive and file a confirmation." The "FollowUpMessageRequirementCode" can be a proprietary code-list with fixed predefined values and changes to the permitted values may involve changes to the interface.

The GDT FollowUpMessageRequirementCode and its values may include the following codes: 01 (i.e., required), 02 (i.e., expected), 03 (i.e., optional), 04 (i.e., unexpected), 05 (i.e., forbidden).

Additionally, the FollowUpBusinessTransactionDocumentRequirementCode, which may refer to follow-up documents, and FollowUpMessageRequirementCode, which refers to follow-up messages, may advise to perform a check to determine which of these GDTs should be used. Furthermore, GDT have not provided a valid general rule.

ForecastModelID

A GDT ForecastModelID can be an identifier for a Forecast Model. A forecast model can be used as a statistical model, which can calculate a forecast for future values from a time series containing historical data. An example of GDT ForecastModelID can be the following code:

<ForecastModelID>ALPHA__03</ForecastModelID>

In certain implementations, GDT ForecastModelID may have the following structure:

| GDT | Object Class | Property | Representation/ Association | Type | Type Name | Len. | Remarks |
|---|---|---|---|---|---|---|---|
| ForecastModelID | Forecast Model | Identification | Identifier | CDT | Identifier | 1...30 | restricted |

The GDT ForecastModelID, described above, can be an exceptional model in the usage context. GDT ForecastModelID does not include any further descriptions and attributes.

ForecastModelTypeCode

A GDT ForecastModelTypeCode can be coded representation of the type of the forecast model. A forecast model can be a statistical model with which to calculate a forecast for future values from a time series containing historical data. An example of GDT ForecastModelTypeCode is:

<ForecastModelTypeCode>11</ForecastModelTypeCode>

In certain implementations, GDT ForecastModelTypeCode may have the following structure:

| GDT | Object Class | Property | Representation/ Association | Type | Type Name | Len. | Remarks |
|---|---|---|---|---|---|---|---|
| Forecast-ModelTypeCode | Forecast Model | Type | Code | CDT | Code | 1..3 | Restricted |

The GDT ForecastModelTypeCode, described above, can be a customer-specific code list which can be assigned to the code. In certain implementations, the attributes of the GDT ForestModelTypeCode may not be required because constant values would be assigned to them in a customer system at runtime.

The GDT ForecastModelTypeCode may include the following codes: 11 (i.e., average), 12 (i.e., moving average), 13 (i.e., weighted moving average), 21 (i.e., linear regression), 25 (i.e., seasonal linear regression), 31 (i.e., simple exponential smoothing), 32 (i.e., simple exponential smoothing), 41 (i.e., linear exponential smoothing), 51 (i.e., seasonal exponential smoothing), 60 (i.e., transfer of historical data), 61 (i.e., seasonal trend exponential smoothing), 71 (i.e., croston procedure).

FormattedAddress

A GDT FormattedAddress is an address that is formatted. A formatted address is determined from the individual address components according to fixed rules. An example of GDT FormattedAddress code is:

</FormattedAddress>

In certain implementations, GDT FormattedAddress may have the following structure:

| GDT | | Cat. | Object Class Qualifier | Object Class | Property Qualifier | Property | Rep./Ass. | Type | Type Name | Len. | Card. | Remarks |
|---|---|---|---|---|---|---|---|---|---|---|---|---|
| Formatted-Address | | | | Formatted Address | | | Details | | | | | |
| | First-Line-Description | E | | Formatted Address | | First Line | Description | GDT | LANGUAGE-INDEPENDENT_MEDIUM_Description | | 1 | |

-continued

| GDT | | Cat. | Object Class Qualifier | Object Class | Property Qualifier | Property | Rep./Ass. | Type | Type Name | Len. | Card. | Remarks |
|---|---|---|---|---|---|---|---|---|---|---|---|---|
| | Second-Line-Description | E | | Formatted Address | | Second Line | Description | GDT | LANGUAGE-INDEPENDENT_MEDIUM_Description | | 0..1 | |
| | Third-Line-Description | E | | Formatted Address | | Third Line | Description | GDT | LANGUAGE-INDEPENDENT_MEDIUM_Description | | 0..1 | |
| | Fourth-Line-Description | E | | Formatted Address | | Fourth Line | Description | GDT | LANGUAGE-INDEPENDENT_MEDIUM_Description | | 0..1 | |

The GDT FormattedAddress, described above, can be a customer-specific code list which can be assigned to the code list. FirstLineDescription, SecondLineDescription, ThirdLineDescription and FourthLineDescription can be filled sequentially, for example, ThirdLineDescription may not be empty if FourthLineDescription is filled.

The data type GDT FormattedAddress may include the following sub-elements: FirstLineDescription (i.e., Contents of the first line of the formatted address), SecondLineDescription (i.e., Contents of the second line of the formatted address), ThirdLineDescription (i.e., Contents of the third line of the formatted address), FourthLineDescription (i.e., Contents of the second line of the formatted address).

FormattedPostalAddress

A GDT FormattedPostalAddress can be a postal address that is formatted. A formatted postal address can be determined from the individual address components according to fixed rules. Examples of GDT FormattedPostalAddress codes are:

<FormattedPostalAddress>

<FirstLineDescription>Dietmar-Hopp-Allee 16</FirstLineDescription>

<SecondLineDescription>69190 Walldorf</SecondLineDescription>

<ThirdLineDescription>Deutschland</ThirdLineDescription>

</FormattedPostalAddress>

In certain implementations, GDT FormattedPostalAddress may have the following structure:

| GDT | | Cat. | Object Class | Property | Rep./Ass. | Type | Type Name | Card. |
|---|---|---|---|---|---|---|---|---|
| FormattedPostal-Address | | | Formatted Postal Address | | Details | | | |
| | FirstLine-Description | E | Formatted Postal Address | First Line | Description | GDT | LANGUAGE-INDEPENDENT_MEDIUM_Description | 1 |
| | SecondLine-Description | E | Formatted Postal Address | Second Line | Description | GDT | LANGUAGE-INDEPENDENT_MEDIUM_Description | 0..1 |
| | ThirdLine-Description | E | Formatted Postal Address | Third Line | Description | GDT | LANGUAGE-INDEPENDENT_MEDIUM_Description | 0..1 |

The GDT FormattedPostalAddress, described above, can be a customer-specific code list which can be assigned to the code list. The GDT FormattedPostalAddress may require all the LineDescriptions to be filled sequentially, for example, the ThirdLineDescription can filled before FourthLineDescription is filled.

The data type GDT FormattedPostalAddress may include the following sub-elements: FirstLineDescription (i.e., Contents of the first line of the formatted postal address), SecondLineDescription (i.e., Contents of the second line of the formatted postal address), ThirdLineDescription (i.e., Contents of the third line of the formatted postal address).

FormOfAddressCode

A GDT FormOfAddressCode can be the coded representation of a form of address. An example of GDT FormOfAddressCode is:

<FormOfAddressCode listAgencyID=310>0001</FormOfAddressCode>

In certain implementations, GDT FormOfAddressCode may have the following structure:

| GDT | | Cat. | Object Class | Property | Representation/ Association | Type | Type Name | Len. | Card. |
|---|---|---|---|---|---|---|---|---|---|
| FormOfAddressCode | | | Person | Form Of Address | Code | CDT | Code | 1..4 | |
| | listID | A | Code List | Identification | Identifier | xsd | token | | 0..1 |
| | listAgencyID | A | Code List Agency | Identification | Identifier | xsd | token | | 0..1 |
| | listVersionID | A | Code List | Version | Identifier | xsd | token | | 0..1 |
| | listAgency-SchemeID | A | Code List Agency | Scheme | Identifier | xsd | token | | 0..1 |
| | listAgency Scheme-AgencyID | A | Code List Agency | Scheme Agency | Identifier | xsd | token | | 0..1 |

The GDT FormaOfAddressCode, described above, can be a customer-specific code list with given attributes and it may include the following values: listID="10120," if the listID remains unchanged in the code list, then a listAgencyID="310," otherwise a listAgencyID can be the ID of the customer (ID from DE 3055, if listed there). If a customer creates his code list during configuration, a list agency ID may be the ID of the customer (ID from DE 3055, if listed there). A listVersionID can be the version of the particular code list (assigned and managed by the customer). If a customer creates his code list during configuration, a list version ID may be the version of particular code list assigned and managed by the customer. A listAgencySchemeID can be the ID of the scheme if the listAgencyID does not come from DE 3055. If a customer creates his code list during configuration, listAgencySchemeAgencyID can be the ID of the organization from DE 3055 that manages the listAgencySchemeID scheme. The GDT FormOfAddressCode can be used for form of address of a person, organization or group in addresses and business partners.

The data type GDT FormOfAddressCode may include following codes: 0001 (i.e., Ms.), 0002 (i.e., Mr.), 0003 (i.e., Company), 0004 (i.e., Mr. and Mrs.). An extendable code list can be assigned to the GDT FormOfAddressCode where customers can change the code list.

The following dictionary objects can be assigned to the GDT FormOfAddressCode in the customer system: Data element (, AD_TITLE), Domain (, AD_TITLE). The possible values for GDT FormOfAddressCode may be maintained in table TSAD3.

GenderCode

A GDT GenderCode can be the coded representation of a person's gender. An example of GDT GenderCode is:

<GenderCode>1</GenderCode>

In certain implementations, GDT GenderCode may have the following structure:

| GDT | Property | Representation/ Association | Type | Type Name | Len. | Remarks |
|---|---|---|---|---|---|---|
| GenderCode | Gender | Code | CDT | Code | 1 | Restricted |

The GDT GenderCode, described above, can be a customer-specific codelist with given attributes and it may include the following values: listID can be "5218," if the listID remains unchanged in the code list, then a listAgencyID can be "5." The GenderCode can be assigned to one standard code list as per ISO code "5218."

The data type GDT GenderCode may include the following codes: 0 (i.e., Unknown.), 1 (i.e., Male), 2 (i.e., Female), 9 (i.e., not determined). The following dictionary objects can be assigned to the GDT FormOfAddressCode in the customer system: Data element (e.g., AD_SEX), Domain (e.g., AD_SEX).

GeneralLedgerAccountAliasCode

A GDT GeneralLedgerAccountAliasCode can be the coded representation of an alias for a G/L account. The alias can represent a G/L account independently of a chart of accounts. An example of GDT GeneralLedgerAccountAliasCode is:

<GeneralLedgerAccountCode>231100</GeneralLedgerAccountCode>

In certain implementations, GDT GeneralLedgerAccountAliasCode may have the following structure:

| GDT | | Cat. | Object Class | Property | Representation/ Association | Type | Type Name | Len. | Card. | Remarks |
|---|---|---|---|---|---|---|---|---|---|---|
| General-Ledger Account-AliasCode | | | General Ledger Account | Alias | Code | CDT | Code | 1..10 | | Restricted |
| | listID | A | Code List | Identification | Identifier | xsd | token | | 0..1 | |
| | listAgencyID | A | Code List Agency | Identification | Identifier | xsd | token | | 0..1 | |
| | listVersionID | A | Code List | Version | Identifier | xsd | token | | 0..1 | |
| | listAgency-SchemeID | A | Code List Agency | Scheme | Identifier | xsd | token | | 0..1 | |
| | listAgency-Scheme-AgencyID | A | Code List Agency | Scheme Agency | Identifier | xsd | token | | 0..1 | |

The GDT GeneralLedgerAccountAliasCode, described above, can be a customer-specific codelist with given attributes and it may include the following values: listID can be “10227,” if the listID remains unchanged in the code list, then a listAgencyID can be the ID of the customer (, ID from DE 3055, if listed there). A listVersionID can be the version of the particular code list (, assigned and managed by the customer). A listAgencySchemeID can be the ID of the scheme if the listAgencyID does not come from DE 3055. A listAgencySchemeAgencyID can be the ID of the organization from DE 3055 that manages the listAgencySchemeID scheme.

GDT GeneralLedgerAccountAliasCode alias-value may represent a G/L account in each chart of accounts in accounting. The alias for a G/L account can be used in applications that are external to Accounting and in which assignments can be made to a G/L account, for example, in the case of an invoice without order reference, it can be simplified entry because a chart of accounts may not need to be specified and any multiple charts of accounts outside of Accounting are not made visible. The assignment to a G/L account (GDT GeneralLedgerAccountReference) and the representation on accounts of other charts of accounts may not occur in Accounting until the posting is made.

The data type GDT GeneralLedgerAccountAliasCode may include the following codes: (i.e., Receivables from Goods and Services), (i.e., Cumulated deprecations on buildings), (i.e., Down payments received for orders).

GeneralLedgerAccountID

A GDT GeneralLedgerAccountID can be an identifier for a G/L account. A G/L account may be a structure for storing changes in value relating to assets, payables, stockholders' equity, revenues, or expenses of a company. A G/L account typically relates to one item in a chart of accounts. G/L accounts can be used essentially in the creation of financial statements. Examples of G/L accounts can be the following: Trade receivables or cumulated depreciation on buildings. An example of GDT GeneralLedgerAccountID code is:

<GeneralLedgerAccountID>400000</GeneralLedgerAccountID>

In certain implementations, GDT GeneralLedgerAccountID may have the following structure:

| GDT | Object Class | Property | Representation/ Association | Type | Type Name | Len. | Remarks |
|---|---|---|---|---|---|---|---|
| GeneralLedgerAccountID | General Ledger Account | Identification | Identifier | CDT | Identifier | 1..10 | restricted |

The GDT GeneralLedgerAccountID, described above, can be a customer-specific code-list with attributes and values. The GeneralLedgerAccountID can be a character string not exceeding ten characters. A G/L account typically can be identified by a ChartOfAccountsID and a GeneralLedgerAccountID. The GeneralLedgerAccountID can be in the context of the chart of accounts.

The GDT GeneralLedgerAccountReference may include two elements that can be used to identify a G/L account. If, however, the chart of accounts is known from the context (such as from a superordinate element), a G/L account can also be identified by specifying the GeneralLedgerAccountID on its own.

GeneralLedgerAccountReference

A GDT GeneralLedgerAccountReference can be a reference to a general ledger account. A general ledger account can be a structure for storing changes in value relating to assets, payables, stockholders' equity, revenues, or expenses of a company. A general ledger account typically relates to one item in a chart of accounts. General ledger accounts can be used in the creation of financial statements. General ledger accounts may include the following: (e.g., Trade receivables or cumulated depreciation on buildings). Examples of GDT GeneralLedgerAccountReference codes are:

<GeneralLedgerAccountReference>
<ID>0000400000</ID>
<ChartOfAccountsID schemeID="ChartOfAccountsID" schemeAgencyID="AEN_000">INT</ChartOfAccountsID>
</GeneralLedgerAccountReference>

In certain implementations, GDT GeneralLedgerAccountReference may have the following structure:

| GDT | Cat. | Object Class | Property | Representation/ Association | Type | Type Name | Len. | Card. |
|---|---|---|---|---|---|---|---|---|
| General-Ledger-Account-Reference | | General Ledger Account Reference | | Details | | | | |

-continued

| GDT | | Cat. | Object Class | Property | Representation/ Association | Type | Type Name | Len. | Card. |
|---|---|---|---|---|---|---|---|---|---|
| | ID | E | General Ledger Account Reference | Identification | Identifier | XSD | Token | 1..10 | 1 |
| | ChartOf-AccountsID | E | General Ledger Account Reference | Chart Of Accounts Identification | Identifier | GDT | ChartOf-AccountsID | | 0..1 |

The GDT GeneralLedgerAccountReference, described above, can be a customer-specific codelist with attributes and values. The GeneralLedgerAccountReference can be used in the GDT AccountingObjectSet, for example, to identify a general ledger account as an account assignment object. A general ledger account can be identified by ChartOfAccountsID and ID. The ID typically can be found in the context of the chart of accounts. The element ChartOfAccountsID can be optional because the chart of accounts can also be known from the context in which it is used; for example, when a leading chart of accounts is assigned to the company in which a business transaction occurs.

The data type GeneralLedgerAccountReference may include the following elements: ID (i.e., ID can be the identifier of the general ledger account) and ChartOfAccountsID (i.e., ChartOfAccountsID can be identifier of the chart of accounts for the general ledger account).

GeneralLedgerAccountTypeCode

A GDT GeneralLedgerAccountTypeCode can be the coded representation of the type of a G/L account. A G/L account can be a structure for storing changes in value relating to assets, payables, stockholders' equity, revenues, or expenses of a company. A G/L account typically relates to one item in a chart of accounts. G/L accounts can be used in the creation of financial statements. Examples of G/L accounts can be the following: Trade receivables or cumulated depreciation on buildings. An example of GDT GeneralLedgerAccountTypeCode code can be the following:

<GeneralLedgerAccountTypeCode>10</GeneralLedgerAccountTypeCode>

In certain implementations, GDT GeneralLedgerAccountTypeCode may have the following structure:

| GDT | Object Class | Property | Representation/ Association | Type | Type Name | Len. | Remarks |
|---|---|---|---|---|---|---|---|
| GeneralLedgerAccountTypeCode | General Ledger Account | Type | Code | CDT | Code | 1..6 | restricted |

The GDT GeneralLedgerAccountTypeCode, described above, can be a customer-specific codelist with given attributes and it may include the following values: listID can be "10110." The GeneralLedgerAccountTypeCode typically can be assigned to business objects. The GeneralLedgerAccountTypeCode can be used to subdivide the general ledger, such as into fixed asset accounts, accounts for material inventories, or accounts for overhead costs. The subdivision can be more refined than the division into balance sheet accounts and accounts for the profit and loss statement. A GeneralLedgerAccountTypeCode can be used to derive whether an account is an assets account or a liability account in the balance sheet or whether it is an expense account or a revenue account in the profit and loss statement.

The data GDT GeneralLedgerAccountTypeCode may include the following codes: Fixed Asset (i.e., Account for loans taken), Inventory (i.e., Account for material inventories), Loans taken (i.e., Account for loans taken), Overhead Costs (i.e., Account for overhead costs).

GeneralLedgerMovementTypeCode

A GDT GeneralLedgerMovementTypeCode can be the coded representation of the type of movement on a G/L account within GeneralLedger Accounting. An example of GDT GeneralLedgerMovementTypeCode is:

<GeneralLedgerMovementTypeCode>1</GeneralLedgerMovementTypeCode>

In certain implementations, GDT GeneralLedgerMovementTypeCode may have the following structure:

| GDT | | Cat. | Object Class | Property | Representation/ Association | Type | Type Name | Len. | Card. | Remarks |
|---|---|---|---|---|---|---|---|---|---|---|
| General-Ledger Movement-TypeCode | | | General Ledger | Movement Type | Code | CDT | Code | 1..5 | | restricted |
| | listID | A | Code List | Identification | Indentifier | xsd | token | | 0..1 | |
| | list-AgencyID | A | Code List Agency | Identification | Indentifier | xsd | token | | 0..1 | |
| | list-VersionID | A | Code List | Version | Indentifier | xsd | token | | 0..1 | |
| | listAgency - SchemeID | A | Code List Agency | Scheme | Indentifier | xsd | token | | 0..1 | |
| | listAgency-Scheme AgencyID | A | Code List Agency | Scheme Agency | Indentifier | xsd | token | | 0..1 | |

The GDT GeneralLedgerMovementTypeCode, described above, can be a customer-specific codelist with given attributes and it may include the following values: listID can be "10394," if the listID remains unchanged in the code list, then a listAgencyID can be the ID of the customer (ID from DE 3055, if listed there). A listVersionID can be the version of the particular code list (assigned and managed by the customer). A listAgencySchemeID can be the ID of the scheme if the listAgencyID does not come from DE 3055. A listAgencySchemeAgencyID can be the ID of the organization from DE 3055 that manages the listAgencySchemeID scheme.

The GDT GeneralLedgerMovementTypeCode typically can be used in business objects and A2A messages. GeneralLedgerMovementTypeCodes generally relate to DebitCreditTypeCodes (debit and credit) but are not subordinated to them hierarchically. Depending on the account to which the posting is made, increases/write-ups can generally be posted in credit or debit, and decreases/depreciation can be posted on the opposite side of the account. Furthermore, some legal requirements for specifying the DebitCreditTypeCodes may switch this relationship in some cases.

GDT GeneralLedgerMovementTypeCode reporting requirements may make it necessary for changes to the balance of certain G/L accounts to be represented at a greater level of refinement than as debit and credit. General ledger movement types can describe movements from and to a G/L account in greater detail. Such details can be used for the explanation of the difference between the opening balance and the closing balance of a given period. General ledger movement types normally relate to the movement of the individual item of a business transaction and can therefore differ from one item to another item.

The data GDT GeneralLedgerMovementTypeCode may include the following codes: Increase (i.e., Increase—The inventory value increases due to an operational business transaction), Decrease (i.e., Decrease—The inventory value decreases due to an operational business transaction), Write-up (i.e., Write-up—The inventory value increases due to a valuation in accounting), Depreciation (i.e., Depreciation—The inventory value decreases due to a valuation in accounting).

GeoCoordinate

GDT GeoCoordinates may contain the geographic data, in other words longitude and latitude that can be specified as per the WGS84 reference system, which enables you to determine a position on the globe. The unitCode "DD" may corresponds to the unit degree of an angle (UN/CEFACT Recommendation No. 20). Examples of GDT GeoCoordinates codes are the following:

<GeoCoordinates>

<LatitudeMeasure unitCode="DD">40.23232300000</LatitudeMeasure>

<LongitudeMeasure unitCode="DD">123.12121200000</LongitudeMeasure>

</GeoCoordinates>

In certain implementations, GDT GeoCoordinates may have the following structure:

| GDT | | Cat. | Object Class | Property | Representation/ Association | Type | Type Name | Card. |
|---|---|---|---|---|---|---|---|---|
| GeoCoordi-nates | | | Geo Coordinates | | Details | | | |
| | Latitude-Measure | E | Geo Coordinates | Latitude | Measure | CDT | Measure | 1 |
| | Longitude-Measure | E | Geo Coordinates | Longitude | Measure | CDT | Measure | 1 |

The GDT GeoCoordinates, described above, can be a codelist with attributes and it may include the following: LatitudeMeasure (i.e., Geographic latitude in degrees: The degrees unit of measurement can specified by the attribute "unitCode") and LongitudeMeasure (i.e., Geographic longitude in degrees: The degrees unit of measurement is specified by the attribute "unitCode").

The GDT GeoCoordinates may also include the following two conventions: (i.e., Southern latitudes are negative and northern latitudes are positive) and (i.e., Western longitudes are negative and eastern longitudes are positive). It may not be necessary to use the positive sign (+) for positive values. Negative values may have a negative sign (−) for a prefix. The specification of longitude and latitude can be corresponds to spherical coordinates. The definition range for LatitudeMeasure can be: [−90,+90] (Note: this is a closed interval where −90 and +90 are included in the definition range). The definition range for LongitudeMeasure is: [−180,+180[(Note: this is a half-closed interval where +180 is not included in the definition range). All specifications outside the definition range, +190 for longitude or −100 for latitude, may result in an error. GeoCoordinates can be used, in the field of transport planning.

The geodata can be determined from the address data of a customer to calculate the time required for transport, the distance to be covered, and the speed of the means of transport used. Another usage can be, to locate suitable garages in the case of an accident or breakdown in a specific area. The garages can be geo-coded using their addresses and are available for such an enquiry. Note: To ensure that all geodata can be universally valid, all data can be entered based on the WGS 84 (World Geodetic System) reference system. The World Geodetic System, a reference system can be the same as the GPS satellite navigation system.

HandlingUnit

A GDT HandlingUnit can be a physical unit of packaging materials (e.g., load carriers, additional packaging materials) and the packaged products (type “Material”). An example of GDT HandlingUnit code is:

```
<HandlingUnit>
  <ID>4711</ID>
  <LoadCarrier>
  <Product>
    <StandardID schemeAgencyID="16">123456789</
      StandardID>
  </Product>
  </LoadCarrier>
  <Load>
  <BusinessTransactionDocumentReference>
    <ItemID>LF800001</ItemID>
  </BusinessTransactionDocumentReference>
  <Quantity unitCode="CT">10</Quantity>
  </Load>
</HandlingUnit>
```

Another example of GDT HandlingUnit code is:

```
<HandlingUnit>
  <ID>4712</ID>
  <LoadCarrier>
  <Product> . . . </Product>
  </LoadCarrier>
  <LowerLevelHandlingUnit>
  <ID>4711</ID>
  </LowerLevelHandlingUnit>
</HandlingUnit>
```

In certain implementations, GDT HandlingUnit may have the following structure:

| GDT | | | Cat. | Object Class | Property Qualifier | Property Term | Representation | Type | Type Name | Length | Cardinality | Remark |
|---|---|---|---|---|---|---|---|---|---|---|---|---|
| HandlinUnit | | | | Handling Unit | | | Details | | | | | |
| | ID | | E | Handling Unit | | Identification | Identifier | CDT | Identifier | 1..20 | 1 | |
| | Load Carrier | | E | Handling Unit | | Load Carrier | Details | | | | 1 | |
| | | Product | E | Load Carrier | | Product | Details | GDT | Business-Transaction-Document-Product | | 1 | Restricted |
| | Height-Measure | | E | Handling Unit | Height | Measure | Measure | CDT | Measure | 19.6 | 0..1 | |
| | Length-Measure | | E | Handling Unit | Length | Measure | Measure | CDT | Measure | 19.6 | 0..1 | |
| | Width Measure | | E | Handling Unit | Width | Measure | Measure | CDT | Measure | 19.6 | 0..1 | |
| | Gross Volume Measure | | E | Handling Unit | Gross-Volume | Measure | Measure | CDT | Measure | 19.6 | 0..1 | |
| | Net-Volume Measure | | E | Handling Unit | Net-Volume | Measure | Measure | CDT | Measure | 19.6 | 0..1 | |
| | Gross Weight-Measure | | E | Handling Unit | Gross-Weight | Measure | Measure | CDT | Measure | 19.6 | 0..1 | |
| | Net-Weight Measure | | E | Handling Unit | Net-Weight | Measure | Measure | CDT | Measure | 19.6 | 0..1 | |
| | Additional Packaging | | E | Handling Unit | | Additional-Packaging | Details | GDT | | | 0..n | |
| | | Product | E | Additional Packaging | | Product | Details | GDT | Business Transaction Document Product | | 1 | Restricted |
| | | Quantity | E | Additional Packaging | | Quantity | Quantity | CDT | Quantity | 19.6 | 1 | |
| | Lower-Level Handling-Unit | | E | Handling Unit | | Lower-Level-Handling-Unit | Details | | | | 0..n | |
| | | ID | E | Lower Level Handling Unit | | Identification | Identifier | GDT | Handling UnitID | 1..20 | 1 | |

-continued

| GDT | | | Cat. | Object Class | Property Qualifier | Property Term | Represen-tation | Type | Type Name | Length | Cardi-nality | Re-mark |
|---|---|---|---|---|---|---|---|---|---|---|---|---|
| Load | | | E | Handling Unit | | Load | Details | | | | 0..n | |
| | Business-Transac-tionDocu-mentRefer-ence | | E | Load | | Business Transaction Document | Details | GDT | Business Transaction Document Reference | | 1 | Re-stricted |
| | | ID | E | Business Transaction Document | | Identification | Identifier | GDT | Business Transaction-Docu-ment ID | 1..35 | 0..1 | |
| | | ItemID | E | Business Transaction Document Item | | Identification | Identifier | GDT | Business-Transaction-Document-Item ID | 1..10 | 1 | |
| | Quantity | | E | Load | | Quantity | Quantity | CDT | Quantity | 19.6 | 1 | |
| | SerialID | | E | Load | | Serial-Identification | Identifier | GDT | SerialID | 1..20 | 0..n | |

The GDT HandlingUnit, described above, can be a customer-specific code list that can be assigned to the code. The attributes of GDT HandlingUnit may include the following: ID can be the identification of the handling unit; loadCarrier can be the device with which physical objects can be stored or transported, examples of load carriers include crates, nestings, containers, mesh box pallets, and pallets; LoadCarrierProduct can be the product ID of the load carrier; HeightMeasure can be the height of (entire) handling unit; LengthMeasure can b length of (entire) handling unit; WidthMeasure can be the width of (entire) handling unit; GrossVolumeMeasure can be the total gross volume of handling unit: For a closed load carrier (such as a container or mesh box pallet), the volume of the load carrier, for an open load carrier (such as a pallet), the sum of the volumes of packaging materials (load carrier and additional packaging materials) and packed contents (products and lower-level handling units); NetVolumeMeasure can be the total net volume of the handling unit: Sum of the volumes of the packed contents of the handling unit, for stackable contents, the stackability factor and the reduced volume of the stacked contents are also taken into account in the determination of the entire volume; GrossWeightMeasure can be the total gross weight of the handling unit: Sum of the weights of the packaging materials and the packed contents (products and lower-level handling units) of the handling unit; NetWeightMeasure cane be the total net weight of the handling unit: Sum of the weights of the packed contents of the handling unit; AdditionalPackaging can be the additional packaging materials, together with the load carrier used, these are intended for fulfilling the requirements of the materials to be packed with regard to fixing, securing, and filling, along with the load carrier, they form the packaging of a handling unit (for example, lid, intermediate layer, frames, shrinkwrap, padding material; AdditionalPackaging Product can be the product ID of a packaging material/additional packaging material; AdditionalPackaging Quantity can be the quantity of a packaging material/additional packaging material used in the specified handling unit; LowerLevelHandlingUnit can be a lower-level handling unit (to display a hierarchy of handling units); Load can be the load (quantity of a product) packed in the specified handling unit (without lower-level handling units); LoadBusinessTransactionDocumentReference can be the reference to the item in a business document that contains more specific details about the load packed in the handling unit; LoadQuantity can be the quantity of the load packed in the specified handling unit (without lower-level handling units); LoadSerialID can be the serial number of a single unit of a product packed in the given handling unit.

A handling unit can consist of an empty load carrier. It can be mandatory to specify the HandlingUnitID and the load carrier, whereas packed products (loads), lower-level handling units, packaging materials, and additional packaging materials are optional. The load in a handling unit can be characterized using the reference to the item in a business document that contains specifications about the type and quantity of a product. The product quantity in the referenced item may not, therefore, be smaller than the LoadQuantity specified in the HandlingUnit. If the business document referenced in the handling unit refers directly to the document in which the handling unit is used, the identification of the business document (but not of the item) can be left out. If serial numbers (SerialID) are given in a HandlingUnit, the related product ID may be specified in the referenced item of the business document. The HandlingUnit can map the packing or packing hierarchy of products. The HandlingUnit can simplify logistics processes, for example: First, it enables the production- or sales-controlled combination of various products or the same products with inconsistent pack sizes to physical storage units or delivery units. Second, the link with batch numbers and serial numbers enables an improved logistical check, which can be necessary for effective processing, for example, for queries from customers and callback activities. The structure of GDT HandlingUnit can be compatible with the "packing" in the DELVRY03 IDoc. A handling unit may include identification number that can be scanned and used to call data for the handling unit.

HouseID

A GDT HouseID can be an identifier of a building or building section within a street by means of a house number. An example of GDT HouseID code is:

<HouseID>16</HouseID>

In certain implementations, GDT HouseID may have the following structure:

| GDT | Cat. | Object Class | Property | Representation/ Association | Type | Type Name | Len. | Card. | Remarks |
|---|---|---|---|---|---|---|---|---|---|
| HouseID | | House | Identification | Identifier | CDT | Identifier | 1..10 | | Restricted |

The GDT HouseID, described above, can be a customer-specific codelist that can be assigned to the code. The HouseID can be used in the postal address. The HouseID can be assigned to the value list for each street. The street can be known from the context. The following dictionary objects can be assigned to the GDT HouseID in the customer system: Data element (e.g., BU_HSNM1), Domain (e.g., TEXT10).

IdentifiedLogisticUnitID

A GDT IdentifiedLogisticUnit can be a physical unit identifiable for logistic purposes. The IdentifiedLogisticUnit may describe the logistical and physical aspects of a product or a package. The SponsibleOrganisationalUnit-TypeCodeIdentifiedLogisticUnitID used to be an identifier for GDT IdentifiedLogisticUnit. An example of GDT IdentifiedLogisticUnit code is:

<IdentifiedLogisticUnitID schemeID="SSCC" schemeAgencyID="9">254222298765432106</IdentifiedLogisticUnitID>

In certain implementations, GDT IdentifiedLogisticUnit may contain the following structure:

used in the corresponding standard, specification, or scheme of the responsible organization. The SchemeAgencyID can be the ID of the organization maintaining the ID scheme. The SchemeAgency identification can be released by an organization contained in "DE 3055" (e.g., DUNS, EAN). The GDT owner may retrieve the correct ID from the responsible organization. If the organization is not contained in the "DE 3055," then the owner may refer to ("Data Type Catalog", 5.6.6.c) in order to proceed. The SchemeAgencySchemeID can be the identification of the schema, which may identify the organization named in schemeAgencyID. It can include a certain scheme ID of partners, companies, members, etc. (e.g. DUNS+4) of an organization named in schemeAgency-SchemeAgencyID (Bsp. EAN, DUNS, SWIFT, etc.). The SchemeAgencySchemeAgencyID can be the identification of the maintaining organization (e.g., DUNS, EAN, SWIFT, etc.), which can be responsible for the identification of the organization named in schemeAgencyID. Such organization can be contained in the DE 3055.

| GDT | | Cat. | Object Class | Property | Representation/ Association | Type | Type Name | Len. | Card. | Remarks |
|---|---|---|---|---|---|---|---|---|---|---|
| Identified-Logistic-UnitlID | | | Identified Logistic Unit | Identification | Identifier | CDT | Identifier | 1..40 | | Restricted |
| | schemeID | A | Identification Scheme | Identification | Identifier | xsd | token | 1..60 | 0..1 | |
| | scheme-AgencyID | A | Identification Scheme Agency | Identification | Identifier | xsd | token | 1..60 | 0..1 | |
| | scheme-Agency-SchemeID | A | Identification Scheme Agency | Procedure | Identifier | xsd | token | 1..60 | 0..1 | |
| | schemeAgencyScheme-AgencyID | A | Identification Scheme Agency | Scheme Agency | Identifier | xsd | token | 1..3 | 0..1 | |

The GDT IdentifiedLogisticUnit, described above, can be a customer-specific code list with given attributes and it may include the following values: schemeID="SSCC," which can be the standard used, schemeAgencyID="9." A SchemeID can be the ID of the scheme, which can be released and maintained by the responsible organization of the ID) scheme. The owner may retrieve the correct ID from the responsible organization. If there is no ID available, the name of the identifier or identifier type can be entered, which can be IdentifiedLogisticUnitIdentifierTypeCode A GDT IdentifiedLogisticUnitIdentifierTypeCode can be the coded representation of the type of an identifier of an IdentifiedLogisticUnit. An example of GDT IdentifiedLogisticUnitIdentifierTypeCode is:

<IdentifiedLogisticUnitIdentifierTypeCode>1</IdentifiedLogisticUnitIdentifierTypeCode>

In certain implementations, GDT IdentifiedLogisticUnitIdentifierTypeCode may contain the following structure:

| GDT | | Cat. | Object Class | Property | Representation/ Association | Type | Type Name | Len. | Card. | Remarks |
|---|---|---|---|---|---|---|---|---|---|---|
| Identified-Logistic-Unit-Identifier-Type-Code | | | Identified Logistic Unit | Identifier Type | Code | CDT | Code | 1..2 | | Restricted |
| | listAgencyID | A | Code List Agency | Identi-fication | Identifier | Xsd | token | | 0..1 | |
| | listVersionID | A | Code List | Version | Identifier | Xsd | token | | 0..1 | |
| | listAgency-SchemeID | A | Code List Agency | Scheme | Identifier | Xsd | token | | 0..1 | |
| | listAgency-Scheme-AgencyID | A | Code List Agency | Scheme Agency | Identifier | Xsd | token | | 0..1 | |

The GDT IdentifiedLogisticUnitIdentifierTypeCode, described above, can be a code-list with given attributes and it may include the following values: listID can be "10234," if the listID remains unchanged, then the listAgencyId can be "310." Otherwise, a listAgencyId can be the ID of the customer (ID from DE 3055, if listed there). A listVersionID can be the version of the particular code list assigned and managed by the customer. A listAgencySchemeID can be the ID of the scheme if the listAgencyID does not come from DE 3055. A listAgencySchemeAgencyID can be the ID of the organization from DE 3055 that manages the listAgencySchemeID scheme.

The instantiated value of the IdentifiedLogisticUnitIdentifierTypeCode can represent a standard identification schema, (e.g., UCC/EAN SSCC). The attributes of the IdentifiedLogisticUnitIdentifierTypeCode can be derived from the identification of the schema. The IdentifiedLogisticUnitIdentifierTypeCode may use a number generation procedure to generate a standard identifier.

The GDT IdentifiedLogisticUnitIdentifierTypeCode may include the following codes: 1 (i.e., UCC/EAN SSC—The identification uses the UCC/EAN SSCC code), 2 (i.e., UCC/EAN GRAI—The identification uses the UCC/EAN GRAI code).

IdentifiedLogisticUnitInternalID

A GDT IdentifiedLogisticUnitInternalID can be a proprietary identifier for an IdentifiedLogisticUnit. An IdentifiedLogisticUnit can be a physical unit existing once in the real world, which can be individually identifiable for logistic purposes. The IdentifiedLogisticUnit describes the logistical and physical aspects of a product or a package. An example of GDT IdentifiedLogisticUnitInternalID code is:

<IdentifiedLogisticUnitInternalID schemeID="IdentifiedLogisticUnitID" schemeAgencyID="MPL__002">01234567890123456789</IdentifiedLogisticUnitInternalID>

In certain implementations, GDT IdentifiedLogisticUnitInternalID may contain the following structure:

| GDT | | Cat. | Object Class | Property Qualifier | Property | Representation/ Association | Type | Type Name | Len. | Card. | Remarks |
|---|---|---|---|---|---|---|---|---|---|---|---|
| Identified-Logistic-UnitInter-nalID | | | Identified Logistic Unit | Internal | Identifica-tion | Identifier | GDT | Identifier | 1..40 | | Restricted |
| | schemeID | A | Identifica-tion Scheme | | Identifica-tion | Identifier | xsd | token | 1..60 | 0..1 | |
| | scheme-AgencyID | A | Identifica-tion Scheme Agency | | Identifica-tion | Identifier | xsd | token | 1..60 | 0..1 | |

The GDT IdentifiedLogisticUnitInternalID, described above, can be a code-list with given attributes and it may include the following values: schemeID can be ID of an IdentifiedLogisticUnit which can be used to identify the schema. The schemeAgencyID can be identified as the business system, for example: "MPL__002" which may specify that the schema was assigned by the business system "MPL__002."

IdentifiedLogisticUnitStandardID

A GDT IdentifiedLogisticUnitStandardID can be a standardized identifier for an IdentifiedLogisticUnit. An IdentifiedLogisticUnit can be a physical unit identifiable for logistic purposes. The IdentifiedLogisticUnit can describe the logistical and physical aspects of a product or a package. An example of GDT IdentifiedLogisticUnitStandardID code is:

<IdentifiedLogisticUnitStandardIDschemeID="SSCC"schemeAgencyID="9">254222298765432106</IdentifiedLogisticUnitStandardID>

In certain implementations, GDT IdentifiedLogisticUnitStandardID may contain the following structure:

| GDT | | Cat. | Object Class | Property Qualifier | Property | Representation/ Association | Type | Type Name | Len. | Card. | Remarks |
|---|---|---|---|---|---|---|---|---|---|---|---|
| Identified-Logistic-Unit-StandardlID | | | Identified Logistic Unit | Standard | Identifica-tion | Identifier | GDT | Identifier | 1..40 | | Restricted |
| | schemeID | A | Identifica-tion Scheme | | Identifica-tion | Identifier | xsd | token | 1..60 | 0..1 | |
| | scheme-AgencyID | A | Identifica-tion Scheme Agency | | Identifica-tion | Identifier | xsd | token | 1..60 | 0..1 | |

The GDT IdentifiedLogisticUnitStandardID, described above, can be a code-list with given attributes and it may include the following values: schemeID can be "SSCC," the Serial Shipping Container Code, which can range up to eighteen characters long. A schemeID can also be "GRAI," the Globat Returnable Asset Identifier, which can range up to thirty characters long. The schemeAgencyID can be "9 EAN.UCC", International Numbering Association. The scheme agency ID can be the ID of the agency that manages the identification scheme. As a default, the agencies from DE 3055 can be used, however, the roles defined in DE 3055 cannot be used. The "EAN.UCC," the International Numbering Association, does not have any identifier lists for the schemeID; so therefore, the internationally recognized abbreviations of the standards can be used.

IdentifiedStockID

A GDT IdentifiedStockID can be an identifier for an IdentifiedStock. An IdentifiedStock can be a homogenous subset of a material that is managed separately from other subsets of the same material. The IdentifiedStockID can be comprised of letters, numbers, and displayable special characters, with the exception of "*." The identifier may be uppercase. The IdentifiedStockID may not begin with blank characters or contain consecutive blank characters. An example of GDT IdentifiedStockID code is:

<IdentifiedStockID>CH20021015</IdentifiedStockID>

In certain implementations, GDT IdentifiedStockID may contain the following structure:

| GDT | | Cat. | Object Class | Property | Representation/ Association | Type | Type Name | Len. | Card. | Remarks |
|---|---|---|---|---|---|---|---|---|---|---|
| Identified-StockID | | | Identi-fied Stock | Identifi-cation | Identifier | CDT | Iden-tifier | 1..20 | | Restricted |
| | schemeID | A | Identifi-cation Scheme | Identifi-cation | Identifier | xsd | token | | 0..1 | |
| | scheme-VersionID | A | Identifi-cation Scheme | Version | Identifier | xsd | token | | 0..1 | |
| | scheme-AgencyID | A | Identifi-cation Scheme Agency | Identifi-cation | Identifier | xsd | token | | 0..1 | |
| | scheme-Agency-SchemeID | A | Identifi-cation Scheme Agency | Scheme | Identifier | xsd | token | | 0..1 | |
| | scheme-Agency-Scheme-AgencyID | A | Identifi-cation Scheme Agency | Scheme Agency | Identifier | xsd | token | | 0..1 | |

The GDT IdentifiedStockID, described above, can be a code-list with given attributes and it may include the following values: schemeID can be ID of the scheme, which can be released and maintained by the responsible organization of the ID scheme. The owner may retrieve the correct ID from the responsible organization. If there is no ID available, the name of the identifier or identifier type can be entered, which can be used in the corresponding standard, specification, or scheme of the responsible organization. The schemeVersionID can be the Version of the ID scheme, which can be released and maintained by the organization, which can be named in schemeAgencyID. The owner may retrieve the relevant version ID from the responsible organization. If there is no version for the ID scheme, the version of the standard, the specification, or the scheme can be used. The SchemeAgencyID can be the ID of the organization maintaining the ID scheme. The SchemeAgency identification can be released by an organization contained in "DE 3055" (e.g., DUNS, EAN). The GDT owner may retrieve the correct ID from the responsible organization. If the organization is not contained in the "DE 3055," then the owner may refer to ("Data Type Catalog", 5.6.6.c) in order to proceed. The SchemeAgencySchemeID can be the identification of the schema which may identify the organization named in schemeAgencyID. It can include a certain scheme ID of partners, companies, members, etc. (e.g. DUNS+4) of an organization named in schemeAgencySchemeAgencyID (Bsp. EAN, DUNS, SWIFT, etc.).

IdentifiedStockInventorySeparatingValues

A GDT IdentifiedStockInventorySeparatingValues can be the values of IdentifiedStock that separate inventory from other inventory. An IdentifiedStock can be a homogenous subset of a material that is managed separately from other subsets of the same material. The IdentifiedStockInventorySeparatingValues can separate the inventory by an IdentifiedStock and the expiration date and it can include the following codes:

<IdentifiedStockInventorySeparatingValues>
<IdentifiedStockUUID>32d3cfca-8796-57b0-e100-00000a42201a</IdentifiedStockUUID>
<StrategyRelevantDateTime timeZoneCode="CET" daylightSavingTimeIndicator="true"> 2005-10-30T02:30:00
</StrategyRelevantDateTime>
<StrategyRelevantBaseDateTimeRoleCode>34</StrategyRelevantBaseDateTimeRoleCode>
</IdentifiedStockInventorySeparatingValues>

In certain implementations, GDT IdentifiedStockInventorySeparatingValues may contain the following structure:

| GDT | | Cat. | Object Class Qualifier | Object Class | Property Qualifier | Property | Rep./ Ass. Qual. | Rep./ Ass. | Type | Type Name | Len. | Card. | Remarks |
|---|---|---|---|---|---|---|---|---|---|---|---|---|---|
| Identified-StockInventorySeparatingValues | | | | Identified Stock Inventory Separating Values | | | | Details | | | | | |
| | Identified-StockUUID | E | | Identified Stock Inventory Separating Values | | Identified Stock | Universally Unique | Identifier | GDT | UUID | | 0..1 | |
| | Identified-StockID | E | | Identified Stock Inventory Separating Values | | Identified Stock | | Identifier | GDT | Identified StockID | | 0..1 | |
| | StrategyRelevantDateTime | E | | Identified Stock Inventory Separating Values | | Strategy Relevant Date Time | | Date Time | GDT | GLOBAL_ DateTime | | 0..1 | |
| | StrategyRelevantBase-DateTime RoleCode | E | | Identified Stock Inventory Separating Values | | Strategy Relevant Base Date Time Role Code | | Role Code | GDT | Time Point Role Code | | 0..1 | |

The GDT IdentifiedStockInventorySeparatingValues, described above, can be a code-list with given attributes and it may include the following elements: IdentifiedStockUUID which can be a global identifier for an identified stock used to separate inventory. An identifiedStock can be a homogenous subset of a material that is managed separately from other subsets of the same material. An IdentifiedStockID can be an identifier for an identified stock used to separate inventory. An identifiedStock can be a homogenous subset of a material that is managed separately from other subsets of the same material. The StrategyRelevantDateTime can indicate a timepoint relevant for the logistics strategy. The StrategyRelevantBaseDateTimeRoleCode can indicate the base from which the DateTime is deviated, which can include: BestBeforeTimePoint (i.e., Indicates a date stamped or printed on the packaging of a perishable product, especially food, to indicate the day or month by which it should be used or consumed), ExpirationTimePoint (i.e., Indicates the item point on which a good expires), and GoodsReceiptTimePoint (i.e., Indicates the time point on which goods receipt in the logistic execution).

IdentifiedStockTypeCode

A GDT IdentifiedStockTypeCode can be the coded representation of the type of an Identified Stock. An IdentifiedStock can be a subset of a material that shares a set of common characteristics, which can be logistically handled separately from other subsets of the same material and it can be uniquely identified. An example of GDT IdentifiedStockTypeCode is:

<IdentifiedStockTypeCode>1</IdentifiedStockTypeCode>

In certain implementations, GDT IdentifiedStockTypeCode may contain the following structure:

| GDT | | Cat. | Object Class | Property | Representation/ Association | Type | Type Name | Len. | Card. | Remarks |
|---|---|---|---|---|---|---|---|---|---|---|
| Identified-Stock-TypeCode | | | Identified Stock | Type | Code | CDT | Code | 1..2 | | restricted |
| | listID | A | Code List | Identification | Identifier | xsd | token | | 0..1 | |
| | list-AgencyID | A | Code List Agency | Identification | Identifier | xsd | token | | 0..1 | |
| | list-VersionID | A | Code List | Version | Identifier | xsd | token | | 0..1 | |
| | list- | A | Code List | Scheme | Identifier | xsd | token | | 0..1 | |

-continued

| GDT | | Cat. | Object Class | Property | Representation/ Association | Type | Type Name | Len. | Card. | Remarks |
|---|---|---|---|---|---|---|---|---|---|---|
| | Agency-SchemeID | | Agency | | | | | | | |
| | list-Agency-Scheme AgencyID | A | Code List Agency | Scheme Agency | Identifier | xsd | token | | 0..1 | |

The GDT IdentifiedStockTypeCode, described above, can be an industry-specific code list with given attributes and it may include the following values: listID which can be "10493," if the listID remains unchanged, then the listAgencyId can be "310." Otherwise, a listAgencyId can be the ID of the customer (ID from DE 3055, if listed there). A listVersionID can be the version of the particular code list assigned and managed by the customer. A listAgencySchemeID can be the ID of the scheme if the listAgencyID does not come from DE 3055. A listAgencySchemeAgencyID can be the ID of the organization from DE 3055 that manages the listAgencySchemeID scheme. The GDT IdentifiedStockTypeCode can also be used to assign an industry-specific name to the IdentifiedStock.

The GDT IdentifiedStockTypeCode and its values may include the following codes: Coil (i.e., Coil can be a homogenous segment of cable that is managed separately from other subsets of the same cable, in the cable manufacturing industry). Batch (i.e., Batch can be identified subset of a material, which shares a set of common characteristics that are typically used in the chemical industry), Lot (i.e., Lot can be identified subset of a material, which shares a set of common characteristics that are typically used in the electronic industry).

IdentityID

A GDT IdentityID can be an identifier for an Identity. An Identity can be the combination of all user accounts of a person in a system landscape as well as of the settings used for system access and the associated user rights and restrictions. An IdentityID can be used for logging on to internet transactions and it can also be optional and valid across several systems. An example of GDT IdentityID code is:

<IdentityID>ACHIMMUELLER</IdentityID>

In certain implementations, GDT IdentityID may contain the following structure:

The GDT IdentifiedStockID, described above, can be a codelist with given attributes and it may include the following values: schemeID can be ID of the scheme, which can be released and maintained by the responsible organization of the ID scheme. The owner may retrieve the correct ID from the responsible organization. If there is no ID available, the name of the identifier or identifier type can be entered, which can be used in the corresponding standard, specification, or scheme of the responsible organization. The schemeVersionID can be the Version of the ID scheme, which can be released and maintained by the organization, which can be named in schemeAgencyID. The owner may retrieve the relevant version ID from the responsible organization. If there is no version for the ID scheme, the version of the standard, the specification, or the scheme can be used. The SchemeAgencyID can be the ID of the organization maintaining the ID scheme. The SchemeAgency identification can be released by an organization contained in "DE 3055" (e.g., DUNS, EAN). The GDT owner may retrieve the correct ID from the responsible organization. The SchemeAgencySchemeID can be the identification of the schema which may identify the organization named in schemeAgencyID. It can Include a certain scheme ID of partners, companies, members, etc. (e.g., DUNS+4) of an organization named in schemeAgency-SchemeAgencyID (Bsp. EAN, DUNS, SWIFT, etc.). The SchemeAgencySchemeAgencyID can be the identification of the maintaining organization (e.g., DUNS, EAN, SWIFT, etc.), which can be responsible for the identification of the organization named in schemeAgencyID. The organization can be located in DE 3055.

| GDT | | Cat. | Object Class | Property | Representation/ Association | Type | Type Name | Len. | Card. | Remarks |
|---|---|---|---|---|---|---|---|---|---|---|
| IdentityID | | | Identity | Identification | Identifier | CDT | Identifier | 1..40 | | restricted |
| | schemeID | A | Identification Scheme | Identification | Identifier | xsd | token | 1..60 | 0..1 | |
| | scheme-VersionID | A | Identification Scheme | Version | Identifier | xsd | token | 1..15 | 0..1 | |
| | scheme-AgencyID | A | Identification Scheme Agency | Identification | Identifier | xsd | token | 1..60 | 0..1 | |
| | scheme-Agency-SchemeID | A | Identification Scheme Agency | Scheme | Identifier | xsd | token | 1..60 | 0..1 | |
| | scheme-Agency-Scheme-AgencyID | A | Identification Scheme Agency | Scheme Agency | Identifier | xsd | token | 3 | 0..1 | |

InclusionExclusionCode

A GDT InclusionExclusionCode can be a coded representation of the inclusion of a set into a result set or the exclusion of it. An example of GDT InclusionExclusionCode is:

<InclusionExclusionCode>E</InclusionExclusionCode>

In certain implementations, GDT InclusionExclusionCode may contain the following structure:

| GDT | Object Class | Representation/ Association | Type | Type Name | Len. | Remarks |
|---|---|---|---|---|---|---|
| Inclusion-Exclusion-Code | Inclusion Exclusion | Code | CDT | Code | 1 | restricted |

The GDT InclusionExclusionCode, described above, can be an industry-specific code list with given attributes and it may include the following values: listID can be "ID of the particular code list, assigned by the Coaching Team," if the listID remains unchanged, then the listAgencyId can be "310." The listVersionID can be the version of the particular code list assigned and managed by the customer.

The InclusionExclusionCode can describe how a result set can be put together from a single given set. For example, sets of products that have been selected by means of interval conditions regarding their weight. Then the InclusionExclusionCode can be used to express which selected sets can be included into a result set and which sets can be excluded from the result set.

The GDT InclusionExclusionCode and its values may include the following codes: 1 (i.e., Inclusion-A set is included into a result set), and E (i.e., Exclusion-A set is excluded from a result set).

IncomeTaxWithholdingPercentCode

A GDT IncomeTaxWithholdingPercentCode can be a coded representation of the percent for the income tax withholding purpose. An example of GDT IncomeTaxWithholdingPercentCode is:

<IncomeTaxWithholdingPercentCode>2</IncomeTaxWithholdingPercentCode>

In certain implementations, GDT IncomeTaxWithholdingPercentCode may contain the following structure:

| GDT | | Cat. | Object Class | Property | Representation/ Association | Type | Type Name | Len. | Card. | Remarks |
|---|---|---|---|---|---|---|---|---|---|---|
| IncomeTax-Withholding-PercentCode | | | | | | | | | | |
| | | | Income Tax Withholding Percent | | Code | CT | Code | 1 | | restricted |
| | listID | A | Code List | Identification | Identifier | xsd | token | | 0..1 | |
| | listAgency ID | A | Code List Agency | Identification | Identifier | xsd | token | | 0..1 | |
| | listVer-sionID | A | Code List | Version | Identifier | xsd | token | | 0..1 | |
| | list-Agency-SchemeID | A | Code List Agency | Scheme | Identifier | xsd | token | | 0..1 | |
| | list-Agency-Scheme-AgencyID | A | Code List Agency | Scheme Agency | Identifier | xsd | token | | 0..1 | |

The GDT IncomeTaxWithholdingPercentCode, described above, can be a country-specific code list with given attributes and it may include the following values: listID can be "25100," and listAgencyId can be "310." If a customer creates his own code-list to replace the existing listID "25100" code list, then the values assigned to the attributes may change as follows: listAgencyID can be the ID of the customer (ID from DE 3055, if listed there). A listVersionID can be the version of the particular code list assigned and managed by the customer. A listAgencySchemeID can be the ID of the scheme if the listAgencyID does not come from DE 3055. A listAgencySchemeAgencyID can be the ID of the organization from DE 3055 that manages the listAgencySchemeID scheme.

The GDT IncomeTaxWithholdingPercentCode can be used when an US employee files a State Income Tax Withholding Allowance Certificate (e.g., Arizona Form A-4). The GDT IncomeTaxWithholdingPercentCode typically can be describe by two geographic codes: CountryCode (e.g., United States) and RegionCode (e.g., Arizona).

The GDT IncomeTaxWithholdingPercentCode and its values may include the following in some implementations: 1 (i.e., 0%), 2 (i.e., 10%), 3 (i.e., 19%), 4 (i.e., 23%), 5 (i.e., 25%), 6 (i.e., 31%).

IncomeTaxWithholdingPercentCodeContextElements

The GDT IncomeTaxWithholdingPercentCodeContextElements may define a dependency or an environment in which the IncomeTaxWithholdingPercentCode appears. The environment can be described by context categories. The context categories of the IncomeTaxWithholdingPercentCodeContextElements can be the valid portion of code values, which can be restricted according to an environment during use.

In certain implementations, GDT IncomeTaxWithholdingPercentCodeContextElements may contain the following structure:

| GDT | | Cat. | Object Class | Property | Representation/ Association | Type | Type Name | Len. | Card. | Remarks |
|---|---|---|---|---|---|---|---|---|---|---|
| IncomeTax-Withholding-PercentCode-Context-Elements | | | Income Tax With-holding-Percent Code Context Elements | | Details | | | | | |
| | CountryCode | E | Income Tax With-holding-Percent Code Context Elements | Country | Code | GDT | CountryCode | | 0..1 | |
| | RegionCode | E | Income Tax With-holding-Percent Code Context Elements | Region | Code | GDT | RegionCode | | 0..1 | |

The GDT IncomeTaxWithholdingPercentCodeContextElements, described above, can be a country-specific code list, and its values may include the following: CountryCode (i.e., CountryCode—This context category defines the context country and it may determine the valid code values for a specific country), RegionCode (i.e., RegionCode—This context category defines the context region and it may determine the valid code values for a specific region).

Incoterms

The GDT Incoterms can be a typical contract formulations for delivery conditions that correspond to the rules defined by the International Chamber of Commerce (ICC). An example of GDT Incoterms code is:

<Incoterms>
<ClassificationCode>FOB</ClassificationCode>
<TransferLocationName>Hamburg</TransferLocationName>
</Incoterms>

In certain implementations, GDT Incoterms may contain the following structure:

| GDT | | Cat. | Object Class | Property | Rep./ Ass. | Type | Type Name | Len. | Card. | Remarks |
|---|---|---|---|---|---|---|---|---|---|---|
| Incoterms | | | Incoterms | | Details | | | | | |
| | Classifica-tionCode | E | Incoterms | Classification | Code | GDT | IncotermsClassi-ficationCode | | 1 | restricted |
| | Transfer-Location-Name | E | Incoterms | Transfer-Location | Name | GDT | IncotermsTrans-ferLocation-Name | 1..28 | 0..1 | restricted |

The GDT Incoterms, described above, can be a country-specific code list, with given attributes and its values may include the following: ClassificationCode: (i.e., ClassificationCode-A coded representation of the internationally used abbreviation for characterizing delivery conditions), TransferLocationName: (i.e., TransferLocationName-A place (place, port of shipment, port of destination, place of destination) to which the above code refers, for example, the port of shipment in the case of FOB).

The GDT Incoterms can be used when a purchase order is transferred, in order to specify delivery conditions to which the business partners have agreed.

IncotermsClassificationCode

The GDT IncotermsClassificationCode can be the coded representation for the characterization of delivery conditions for Incoterms. The Incoterms can be a typical contract formulations for delivery conditions that correspond to the rules defined by the International Chamber of Commerce (ICC). An example of GDT IncotermsClassificationCode is:

<IncotermsClassificationCode>FOB</IncotermsClassificationCode>

In certain implementations, GDT IncotermsClassificationCode may contain the following structure:

| GDT | Object Class | Property | Representation/ Association | Type | Type Name | Len. | Card. | Remarks |
|---|---|---|---|---|---|---|---|---|
| IncotermsClassi-ficationCode | Incoterms | Classi-fication | Code | CDT | Code | 3 | 1 | Restricted |

The GDT IncotermsClassificationCode, described above, can be a country-specific code list, with given attributes and its values may include the following: listID can be "DE4053," and listAgencyID can be "6," one fixed standard code list can be assigned to the code.

The IncotermsClassificationCode can be a part of the Incoterms. Most codes, with the exception of 'EXW' and 'CPT', may always be used together with an IncotermsTransferLocation. IncotermsClassificationCode can be used during the determination of delivery conditions in Incoterms.

The GDT IncotermsClassificationCode and its values may include the following codes: EXW (i.e., Ex Works), FCA (i.e., Free Carrier), FAS (i.e., Free Alongside Ship), FOB (i.e., Free On Board), CFR (i.e., Cost and Freight), CIF (i.e., Cost, Insurance and Freight), CPT (i.e., Carriage Paid To), CIP (i.e., Carriage, and Insurance Paid To), DAF (i.e., Delivered At Frontier), DES (i.e., Delivered Ex Ship), DEQ (i.e., Delivered Ex Quay), DDU (i.e., Delivered Duty Unpaid), DDP (i.e., Delivered Duty Paid).

IncotermsTransferLocationName

The GDT IncotermsTransferLocationName can be the name of a transfer location for the delivery of goods for which the Incoterms apply. Incoterms can be a typical contract formulations for delivery conditions that correspond to the rules defined by the International Chamber of Commerce (ICC). The GDT IncotermsTransferLocationName may define a transfer location for the delivery of goods, for examples, a port of destination, a border location, or a place of destination. The GDT IncotermsClassificationCode may determine the characteristics of the Incoterms. An example of GDT IncotermsTransferLocationName code is:

```
<Incoterms>
<ClassificationCode>FOB</ClassificationCode >
<TransferLocationName>Hamburg</TransferLocation-
Name>
</Incoterms>
```

In certain implementations, GDT IncotermsTransferLocationName may contain the following structure:

| GDT | Object Class | Property | Rep./Ass. | Type | Type Name | Len. | Remarks |
|---|---|---|---|---|---|---|---|
| Incoterms-TransferLocationName | Incoterms | Transfer Location | Name | GDT | Name | 1..28 | Restricted |

The GDT IncotermsTransferLocationName, described above, can be a custom-specific code list, which can be used for the determination of delivery conditions in Incoterms. The descriptions and values of GDT IncotermsTransferLocationName are not listed.

IndexLetterText

The GDT IndexLetterText can be the character or character string that is used to sort an object within an index that is structured according to how the object name is spelled or pronounced. This type of index typically can be (for languages with an alphabet) an alphabetical directory of the objects. An example of GDT IndexLetterText code is:

```
<IndexLetterText>Sch</IndexLetterText>
```

In certain implementations, GDT IndexLetterText may contain the following structure:

| GDT | | Cat. | Object Class Qual. | Object Class | Property Qual. | Property | Rep./Ass. | Type | Type Name | Len. | Card. | Remarks |
|---|---|---|---|---|---|---|---|---|---|---|---|---|
| IndexLetter-Text | | | | | | Index-Letter | Text | GDT | Text | 1..20 | 1 | |
| | language-Code | A | | Index-Letter Text | | Language | Code | GDT | LanguageCode | | 0..1 | |

The GDT IndexLetterText can be used to sort objects with the same start of a name within an index. The simplest logic of GDT IndexLetterText, can be to group the objects according to the initial character of their names, this might not be sufficient in every case. The explicit input of the "Headers" or sorting within an Index may enable refinement (such as dividing ,S'into ,S', ,Sch' and ,St') and also it may allow you to use the index in languages in which using only the initial character results in unusable indexes (such as Japanese, or general languages with pictographic script or parallel use of multiple script systems). The descriptions and values of GDT IndexLetterText are not listed.

IndexSeriesCode

The GDT IndexSeriesCode can be the coded representation of an index series. The index series can be a time series of index figures. They can be used for calculating changes to the values of objects due to inflation or technical advances. An example of GDT IndexSeriesCode is:

<IndexSeriesCode indexClass="1">00010</IndexSeriesCode>

In certain implementations, GDT IndexSeriesCode may contain the following structure:

| GDT | | Cat. | Object Class | Property | Representation/ Association | Type | Type Name | Len. | Card. | Remarks |
|---|---|---|---|---|---|---|---|---|---|---|
| IndexSeries-Code | | | Index Series | | Code | CDT | Code | 1..5 | | Restricted |
| | listID | A | Code List | Identification | Identifier | xsd | token | | 0..1 | |
| | list-AgencyID | A | Code List Agency | Identification | Identifier | xsd | token | | 0..1 | |
| | list-VersionID | A | Code List | Version | Identifier | xsd | token | | 0..1 | |

The GDT IndexSeriesCode, described above, can be a custom-specific code list, with given attributes and its values may include the following: listID can be "ID of the particular code list assigned by the Coaching Team," listAgencyID can be "ID of the customer (ID from DE 3055, if listed there)," listVersionID can be "Version of the particular code list assigned and managed by the customer."

The GDT IndexSeriesCode and its values may include the following codes: 1 (i.e., Asset Accounting: Year-dependent, not an historic index), 2 (i.e., Asset Accounting: Age-dependent, not an historic index), 3 (i.e., Asset Accounting: Year-dependent, historic index), 4 (i.e., Asset Accounting: Age-dependent, historic index). In R/3, the IndexSeries can be defined by the DDIC data type WBIND.

Examples of possible GDT IndexSeriesCodes are: 00010 (i.e., Steel construction products), AU001 (i.e., Australian Capital Gains Tax Index).

Examples of GDT index series are: 2001 (i.e., 119,800), 2002 (i.e., 119,900), 2003 (i.e., 120,400), 2004 (i.e., 121, 000).

IndividualMaterialInventoryID

The GDT IndividualMaterialInventoryID can be a unique ID for an individual material that is stocked as physical inventory. Not all individual material has to be stocked as inventory and have an inventory number. An example of GDT IndividualMaterialInventoryID code is:

<IndividualMaterialInventoryID>669-MICK# 15</<IndividualMaterialInventoryID>

In certain implementations, GDT IndividualMaterialInventoryID may contain the following structure:

| GDT | Object Class | Property | Representation/ Association | Type | Type Name | Len. | Remarks |
|---|---|---|---|---|---|---|---|
| Individual-Material-InventoryID | Individual Material | Inventory Identification | Identifier | CDT | Identifier | 1..25 | Restricted |

The IndividualMaterialInventoryID, described above, can be a custom-specific code list assigned to the code. The attributes of the code are not specified because constant values would be assigned to them in the customer system at runtime. The IndividualMaterialInventoryID can be used only in Business Objects.

The IndividualMaterialInventoryID and its value may include the following: (i.e., The IndividualMaterialInventoryID is used in inventory to report on the current stock (amounts and values) of the inventory) and (i.e., The IndividualMaterialInventoryID is used in the Business Object Individual Material in addition to the ProductID as an alternative ID to show that it is stocked in the inventory).

The GDT IndividualMaterialInventoryID can be represented by the following dictionary objects: Data element (e.g., INVNR_ANLA), Domain (e.g., INVNR_ANLA).

IndividualProductGroupID

The GDT IndividualProductGroupID can be a unique identifier for a group of individual products. An individual product can be a single unit of a product. It can also be globally unique and its single unit can be identified by an identifier, such as a serial ID or a vehicle identification number (VIN). An example of GDT IndividualProductGroupID code is:

<IndividualProductGroupID>0601</IndividualProductGroupID>

In certain implementations, GDT IndividualProductGroupID may contain the following structure:

| GDT | Class | Property | Representation/ Association | Type | Type Name | Len. | Remarks |
|---|---|---|---|---|---|---|---|
| Individual-Product-GroupID | Individual Product Group | Identification | Identifier | CDT | Identifier | 1..4 | Restricted |

The GDT IndividualProductGroupID, can be a custom-specific code list assigned to the code. The IndividualProduct-GroupID can be an ID for group of individual products that can be used to separate single units of products, for example, in different processes such as vehicle management or plant maintenance. An individual product can be assigned to one group of individual products only.

Examples of GDT IndividualProductGroup can be the following: A group of individual products Refrigerators, whose single units are identified by their serial numbers, A group of individual products Vehicles, whose single units are identified by their vehicle identification numbers (VIN). The GDT IndividualProductGroupID can be represented by the data element (e.g., COMT_PRODUCT_OBJECT_FAMILY) in the product master.

IndustrialSectorCode

The GDT IndustrialSectorCode can be the coded description of an industry. An industry can be the classification of a company according to the main focus of its business activities. You can define retail, banking, services, industry, health service, public sector, media, and so on, as industries. According to ISIC Rev.3.1. 0., the code "9000," for example, stands for sewage and refuse disposal, sanitation and similar activities. An example of GDT IndustrialSectorOne code is:

<IndustrialSectorCode
listID="ISIC Rev.3.1"
listAgencyID="United Nations Statistics Division">9000
</IndustrialSectorCode>

In certain implementations, GDT IndustrialSectorCode may contain the following structure:

| GDT | | Cat. | Object Class | Property | Representation/ Association | Type | Type Name | Len. | Card. | Remarks |
|---|---|---|---|---|---|---|---|---|---|---|
| Industrial-Sector-Code | | | | Industrial Sector | Code | CDT | Code | 1..10 | | Restricted |
| | listID | A | Code List | Identification | Identifier | XSD | Token | | 0..1 | |
| | listAgencyID | A | Code List Agency | Identification | Identifier | XSD | Token | | 0..1 | |
| | listVersionID | A | Code List | Version | Identifier | XSD | Token | | 0..1 | |
| | listAgency-SchemeID | A | Code List Agency | Scheme | Identifier | XSD | Token | | 0..1 | |
| | listAgency-Scheme-AgencyID | A | Code List Agency | Scheme Agency | Identifier | XSD | Token | | 0..1 | |

The GDT IndustrialSectorCode, described above, can be several-fixed-alternative-standard code list, with attributes and its values may include the following: listID can be "30301" if the UNSTATS code list is used, or listID can be "30302," if the NACE code list is used. The listAgencyID can be "310" for both code lists (UNSTATS and NACE). The listVersionID can be the version of the particular code list assigned and managed by the customer. The listAgencySchemeID can be the ID of the scheme when the listAgencyID does not come from DE 3055. The listAgencySchemeAgencyID can be the ID of the organization from DE 3055 that manages the listAgencySchemeID scheme.

The GDT IndustrialSectorCode (industry) can be used in the context of the GDT IndustryClassificationSystemCode (industry system); the code value of the instance of the IndustryClassificationSystemCode may determine the attributes of the instance of IndustrialSectorCode.

The GDT IndustrialSectorCode and its values may include the following codes: Retail sector (i.e., Companies in this industry work primarily in the retail sector) Wholesale sector (i.e., Companies in this industry work primarily in the wholesale sector). The GDT dictionary objects can be the following: Data element (e.g., BU_IND_SECTOR), Domain (e.g., BU_IND_SECTOR).

IndustryClassificationSystemCode

The GDT IndustryClassificationSystemCode can be the coded description of an industry system. An industry system can be a list of industries that is organized systematically and/or hierarchically. An example of GDT IndustryClassificationSystemCode is:

<IndustryClassificationSystemCode>123</IndustryClassificationSystemCode>

In certain implementations, GDT IndustryClassificationSystemCode may contain the following structure:

| GDT | Cat. | Object Class | Property | Representation/ Association | Type | Type Name | Len. | Card. | Re-marks |
|---|---|---|---|---|---|---|---|---|---|
| Industry-Classification-SystemCode | | | Industry Classification System | Code | CDT | Code | 1..4 | | Re-stricted |

-continued

| GDT | | Cat. | Object Class | Property | Representation/ Association | Type | Type Name | Len. | Card. | Re-marks |
|---|---|---|---|---|---|---|---|---|---|---|
| | listID | A | Code List | Identification | Identifier | XSD | Token | | 0..1 | |
| | list-AgencyID | A | Code List Agency | Identification | Identifier | XSD | Token | | 0..1 | |
| | list-VersionID | A | Code List | Version | Identifier | XSD | Token | | 0..1 | |
| | listAgency-SchemeID | A | Code List Agency | Scheme | Identifier | XSD | Token | | 0..1 | |
| | listAgency-Scheme-AgencyID | A | Code List Agency | Scheme Agency | Identifier | XSD | Token | | 0..1 | |

The GDT IndustryClassificationSystemCode, described above, can be a customer-specific code list with given attributes and its values may include the following: listID can be "10353," if the listID is unchanged, then the listAgencyID can be the ID of the customer (ID from DE 3055, if listed there). The listVersionID can be the Version of the particular code list assigned and managed by the customer. The listAgencySchemeID can be the ID of the scheme if the listAgencyID does not come from DE 3055. The listAgency-SchemeAgencyID can be the ID of the organization from DE 3055 that manages the listAgencySchemeID scheme.

The GDT IndustrialSectorCode (industry) can be used in the context of the GDT IndustryClassificationSystemCode (industry system). The code value of the instance of the IndustryClassificationSystemCode may determine the attributes of the instance of IndustrialSectorCode. Different industry systems can be defined in a company, if they require the assignment of a business partner to an industry to be carried out with differing levels of detail, depending on the reason for the assignment. The GDT dictionary objects may include the following: Data element (e.g., BU_ISTYPE), Domain (e.g., BU_ISTYPE).

The GDT IndustryClassificationSystemCode and its values may include the following codes: Timber processing industries (i.e., This industry system includes the industries involved in using timber such as joinery, carpentry, furniture manufacturers, and so on.) and Agricultural industries (i.e., This industry system includes those industries that can be linked to agriculture in its broadest sense such as forestry enterprises, breeding establishments, garden nurseries and farms).

InformationSensitivityCode

The GDT InformationSensitivityCode can be the coded representation of the sensitivity of a piece of information. The classification of information regarding access authorization can be understood by sensitivity of information. An example of GDT InformationSensitivityCode is:

<InformationSensitivityCode listAgencyId="310">1</InformationSensitivityCode>

In certain implementations, GDT InformationSensitivity-Code may contain the following structure:

| GDT | | Cat. | Object Class | Property | Representation/ Association | Type | Type Name | Len. | Card. | Re-marks |
|---|---|---|---|---|---|---|---|---|---|---|
| Information-Sensitivity-Code | | | Information | Sensitivity | Code | CDT | Code | 1 | | |
| | listID | A | Code List | Identification | Identifier | xsd | token | | 0..1 | |

The GDT InformationSensitivityCode, described above, can be a custom-specific code list with given attributes and its values may include the following: listID can be the ID of the respective code list assigned and managed by the customer.

The GDT InformationSensitivityCode can be used for defining authorizations to access information; however, this has not been supported in the Application Platform. The InformationSensitivityCode typically can be one component within the security concept of a system. It may always be seen in connection with other components, such as user identification, user role, and so on, in some implementations. The code "Normal" is not supposed to imply that all users in a system can access this object, but it permits access to the object within the framework of the security concept mentioned. The InformationSensitivityCode merely contains the users intention as to the sensitivity with which information should be treated. The security concept overall may define the way information can be handled to which a defined InformationSensitivityCode may be assigned.

The GDT InformationSensitivityCode and its value may include the following codes: 1 (i.e., Normal), 2 (i.e., Personal), 3 (i.e., Private), 4 (i.e., Confidential).

InhouseMailID

The GDT InhouseMailID can be a unique identifier of a mail depot for postal shipping within the company. An example of GDT InhouseMailID code is:

<InhouseMailID>16</InhouseMailID>

In certain implementations, GDT InhouseMailID may contain the following structure:

| GDT | Cat. | Object Class | Property | Representation/ Association | Type | Type Name | Len. | Card. | Remarks |
|---|---|---|---|---|---|---|---|---|---|
| InhouseMailID | | Inhouse Mail | Identification | Identifier | CDT | Identifier | 1..10 | | Restricted |

The GDT InhouseMailID, described above, may be a unique in the usage context. The descriptions and values of GDT InhouseMailID are not listed. The GDT dictionary objects may include the following: Data element (e.g., AD_IH_MAIL), and Domain (e.g., TEXT10).

InspectionContainerTypeCode

The GDT InspectionContainerTypeCode is the coded representation of the container in which the inspection sample is transported and stored for inspection purposes. An example of GDT InspectionContainerTypeCode is:

<InspectionContainerTypeCode>1</InspectionContainerTypeCode>

In certain implementations, GDT InspectionContainerTypeCode may include the following structure:

| GDT | | Cat. | Object Class | Property | Representation/ Association | Type | Type Name | Len. | Card. | Remarks |
|---|---|---|---|---|---|---|---|---|---|---|
| Inspection-Container-TypeCode | | | Inspection Container | Type | Code | xsd | token | 1..15 | | Restricted |
| | listID | A | Code List | Identification | Identifier | xsd | token | | 0..1 | |
| | listAgencyID | A | Code List Agency | Identification | Identifier | xsd | token | | 0..1 | |
| | list-VersionID | A | Code List | Version | Identifier | xsd | token | | 0..1 | |
| | listAgency-SchemeID | A | Code List Agency | Scheme | Identifier | xsd | token | | 0..1 | |
| | listAgency-Scheme-AgencyID | A | Code List Agency | Scheme Agency | Identifier | xsd | token | | 0..1 | |

The GDT InspectionContainerTypeCode, described above, can be a customer-specific code list with given attributes and its values may include the following: listID can be "10402," if the listID is unchanged, then the listAgencyID can be the ID of the customer (ID from DE 3055, if listed there). The listVersion can be the Version of the particular code list assigned and managed by the customer. The listAgency-SchemeID can the ID of the scheme if the listAgencyID does not come from DE 3055. The listAgencySchemeAgencyID can be the ID of the organization from DE 3055 that manages the listAgencySchemeID scheme.

The InspectionContainerTypeCode can, for example, be used to describe transport containers for samples in the context of a material inspection. The InspectionContainerTypeCode can be represented by the following dictionary objects: Data element (e.g., QIE_TV_CONTAINER_ID).

InspectionDecisionCode

The GDT InspectionDecisionCode can be the coded representation of the decision that is made as part of an inspection regarding the acceptance or rejection of the inspected object. An example of GDT InspectionDecisionCode is:

<InspectionDecisionCode>1</InspectionDecisionCode>

In certain implementations, GDT InspectionDecisionCode may include the following structure:

| GDT | | Cat. | Object Class | Property | Representation/ Association | Type | Type Name | Len. | Card. | Remarks |
|---|---|---|---|---|---|---|---|---|---|---|
| Inspection-Decision-Code | | | Inspection Decision | | Code | xsd | Token | 1..15 | | Restricted |
| | listID | A | Code List | Identification | Identifier | xsd | token | | 0..1 | |
| | listAgencyID | A | Code List Agency | Identification | Identifier | xsd | token | | 0..1 | |
| | list-VersionID | A | Code List | Version | Identifier | xsd | token | | 0..1 | |
| | listAgency-SchemeID | A | Code List Agency | Scheme | Identifier | xsd | token | | 0..1 | |
| | listAgency-Scheme-AgencyID | A | Code List Agency | Scheme Agency | Identifier | xsd | token | | 0..1 | |

The GDT InspectionDecisionCode can be a customer-specific code list with given attributes and its values may include the following: listID can be "10403," if the listID is unchanged, then the listAgencyID can be the ID of the customer (DE 3055, if listed there). The listVersionID can be the Version of the particular code list assigned and managed by the customer. The listAgencySchemeID can be the ID of the scheme if the listAgencyID does not come from DE 3055. The listAgencySchemeAgencyID can be ID of the organization from DE 3055 that manages the listAgencySchemeID scheme.

The GDT InspectionDecisionCode can, for example, be used in the context of a material inspection. This code can be used to document the decision about whether the inspected material is accepted or rejected for the further production process.

The GDT InspectionDecisionCode and its values may include the following codes: OK (i.e., OK-Accepted), OK with Restrictions (i.e., OK with Restrictions-Accepted with restrictions), Not OK (i.e., Not OK-Rejected, material should not be used). The GDT InspectionDecisionCode can be represented by the dictionary object: Data element (e.g., QIE_TV_DECI_CODE_ID).

InspectionDecisionCodeListID

The GDT InspectionDecisionCodeListID can be an identifier for a list of codes that are used to valuate the inspection object. The GDT InspectionDecisionCodeList can be a list of codes that are valid for a decision in an inspection regarding the acceptance or rejection of the inspected object. An example of GDT InspectionDecisionCodeListID code is:

<InspectionDecisionCodeListID>123456789012345</InspectionDecisionCodeListID>

In certain implementations, GDT InspectionDecisionCodeListID may include the following structure:

| GDT | | Cat. | Object Class | Property | Representation/ Association | Type | Type Name | Len. | Card. | Remarks |
|---|---|---|---|---|---|---|---|---|---|---|
| Inspection-Decision-CodeListID | | | Inspection Decision Code List | Identification | Identifier | CDT | Identifier | 1..255 | | Restricted |
| | schemeID | A | Identification Scheme | Identification | Identifier | xsd | token | 1..60 | 0..1 | |
| | scheme-AgencyID | A | Identification Scheme Agency | Identification | Identifier | xsd | token | 1..60 | 0..1 | |

The GDT InspectionDecisionCodeListID, described above, can be a customer-specific code list with given attributes and its values may include the following: schemeID can be the InspectionDecisionCodeList<Qualifier>ID and the schemeAgencyID can be the Business System, which issued the ID.

The GDT InspectionDecisionCodeListID may identify a list of decision codes in a material inspection. The GDT InspectionDecisionCode can be represented by the dictionary object: Data element (e.g., QIE_TV_DCOD_BUND).

InspectionDynamicModificationCriterionCode

The GDT InspectionDynamicModificationCriterionCode can be the coded representation of a dynamic modification criterion used for the dynamic modification of an inspection. The dynamic modification criterion may determine the properties according to which inspections are dynamically modified. A dynamic modification criterion can, for example, define the properties color of a bottle and volume of a bottle that are used in the dynamic modification of the inspection. An example of GDT InspectionDynamicModificationCriterionCode is:

<InspectionDynamicModificationCriterionCode>DMODCRIT01</InspectionDynamicModificationCriterionCode>

In certain implementations, GDT InspectionDynamicModificationCriterionCode may include the following structure:

| GDT | Object Class | Representation/ Association | Type | Type Name | Len. | Remarks |
|---|---|---|---|---|---|---|
| InspectionDynamic-ModificationCriterionCode | Inspection Dynamic Modification Criterion | Code | CDT | Code | 1..15 | Restricted |

The GDT InspectionDynamicModificationCriterionCode, described above, can be a customer-specific code list with given attributes and its values may include the following: listID can be "10147," if the listID remains unchanged, then the listAgencyID can be the ID of the customer (ID from DE 3055, if listed there). The listVersionID can be the Version of the particular ID of the code list assigned and managed by the customer. The listAgencySchemeID can be the ID of the scheme if the listAgencyID does not come from DE 3055. The listAgencySchemeAgencyID can be the ID of the organization taken from DE 3055 that manages the scheme of the listAgencySchemeID.

Currently, the GDT InspectionDynamicModificationCriterionCode can only be used in business objects. The InspectionModificationCriterionCode can be used as a key for differentiating the quality level in the context of an inspection.

The GDT InspectionDynamicModificationCriterionCode and its values may include the following codes: DMODCRIT01 (i.e., Dynamic modification related to material), DMODCRIT02 (i.e., Dynamic modification related to material and vendor), DMODCRIT03 (i.e., Dynamic modification related to material and customer). The dynamic modification criterion can be represented by the dictionary object: data element (e.g., QIE_TV_DMOD_CRIT_ID).

InspectionDynamicModificationRuleCode

The GDT InspectionDynamicModificationRuleCode can be the coded representation of a dynamic modification rule. The dynamic modification rule contains the rules that regulate the dynamic modification of a particular inspection process. It contains all of the possible inspection stages for this process. Dynamic modification is used to reduce the scope of inspections and thereby reduce costs related to quality assurance.

<InspectionDynamicModificationRuleCode>3</InspectionDynamicModificationRuleCode>

In certain implementations, GDT InspectionDynamicModificationRuleCode may include the following structure:

| GDT | Object Class | Representation/ Association | Type | Type Name | Len. | Remarks |
|---|---|---|---|---|---|---|
| InspectionDynamic-ModificationRuleCode | Inspection Dynamic Modification Rule | Code | CDT | Code | 1..15 | Restricted |

The GDT InspectionDynamicModificationRuleCode, described above, can be a customer-specific code list with given attributes and its values may include the following: listID can be "10146," if the listID remains unchanged, then the listAgencyID can be the ID of the customer (ID from DE 3055 if listed there). The listVersionID can be the Version of the particular code list assigned and managed by the customer. The listAgencySchemeID can be the ID of the scheme if the listAgencyID does not come from DE 3055. The listAgencySchemeAgencyID can be ID of the organization from DE 3055 that manages the listAgencySchemeID scheme. When creating an inspection, the InspectionDynamicModificationRuleCode can be used to determine the inspection stage that is currently valid.

The GDT InspectionDynamicModificationRuleCode and its values may include the following codes: S__2859-1 (i.e., Inspection stage according to ISO 2859-1), S__2859-3 (i.e., Inspection stage according to ISO 2859-3), and S__2859-3_S (i.e., Skip-lot procedure according to ISO 2859-3).

In certain implementations, the following relationships are valid for a sampling inspection using a sampling scheme: the inspection level (i.e., InspectionLevelCode), the inspection severity (i.e., InspectionSeverityCode), the inspection stage (i.e., InspectionStageID), and the dynamic modification rule (i.e., InspectionDynamicModificationRuleCode).

A sample range can be determined in the sampling scheme based on the inbound parameters lot quantity and inspection level. The exact sample size can then be determined within the sample range based on the inspection severity. The inspection severity can correlate with the inspection stage in the dynamic modification rule.

InspectionLevelCode

The GDT InspectionLevelCode can be the coded representation of an inspection level. According to a sampling inspection using a sampling scheme in accordance with DIN ISO 2859, the inspection level can be a factor in the determination of the size based on the quantity that is to be inspected. For example, a low inspection level can usually give rise to the lower range, and a higher inspection level can also give rise to the higher range. An example of GDT InspectionLevelCode is:

<InspectionLevelCode>3</InspectionLevelCode>

In certain implementations, GDT InspectionLevelCode may include the following structure:

| GDT | Object Class | Property | Representation/ Association | Type | Type Name | Len. | Remarks |
|---|---|---|---|---|---|---|---|
| InspectionLevel-Code | Inspection | Level | Code | CDT | Code | 1 | Restricted |

The GDT InspectionLevelCode, described above, can be a custom-specific code list with given attributes and its values may include the following: listID can be "10098," if the listID remains unchanged, then listAgencyID can be "310." The listVersionID can be the Version of the relevant code list assigned and managed by the customer. The InspectionLevelCode typically consist of one fixed code list. The code list and its values can be based on the DIN ISO standard 2859.

The InspectionLevelCode can be used in the context of an inspection and provides information regarding the inspection level based on DIN ISO 2859. For inspection level S-1, the sample size tends to be the lowest and for inspection level III it tends to be the highest in some implementations. The dynamic modification criterion can be represented by the following dictionary objects: Data element (e.g., QIE_TV_INSP_LEVEL), and Domain (e.g., QIE_INSP_LEVEL).

The GDT DynamicModificationRuleCode and its values may include the following codes in some implementations: 1 (i.e., Inspection level S-1), 2 (i.e., Inspection level S-2), 3 (i.e., Inspection level S-3), 4 (i.e., Inspection level S-4), 5 (i.e., Inspection level I), 6 (i.e., Inspection II), 7 (i.e., Inspection III).

InspectionQualityLevelHistoryItemTypeCode

The GDT InspectionQualityLevelHistoryItemTypeCode can be the coded representation of a type of history item of a quality level. A quality level cab represent the current state of inspection effort reduction for inspections of the same type and may specify the inspection stage for the next inspection of the same type. Inspections of the same type are inspections that have, for example, the same combination of material and supplier for material deliveries. A history-item may describe an event that has affected the history of a quality level, and has led to a change in the quality level. An example of GDT InspectionQualityLevelHistoryItemTypeCode is:

<InspectionQualityLevelHistoryItemTypeCode>2</InspectionQualityLevelHistoryItemTypeCode>

In certain implementations, GDT InspectionQualityLevelHistoryItemTypeCode may include the following structure:

| GDT | Object Class | Property | Representation/Association | Type | Type Name | Len. | Remarks |
|---|---|---|---|---|---|---|---|
| InspectionQualityLevelHistoryItemTypeCode | Inspection Quality Level History Item | Type | Code | CDT | Code | 1 | Restricted |

The GDT InspectionQualityLevelHistoryItemTypeCode, described above, can be a custom-specific code list with given attributes and its values may include the following: listID can be "10387," if the listID remains unchanged, then the listAgencyID can be "310."

The GDT InspectionQualityLevelHistoryItemTypeCode may differentiate between three history item types that affect the progression of the quality level. The history may allow you to make projections regarding the future progression of the quality level, and to depict the process of inspection effort reduction. The InspectionQualityLevelHistoryItemTypeCode can be represented by the dictionary object: date element (e.g., QIE_HISTORY_ITEM_TYPE).

The GDT InspectionQualityLevelHistoryItemTypeCode and its values may include the following codes in some implementations: 1 (i.e., Intervention), 2 (i.e., Newly Created Inspection), 3 (i.e., Inspection Decision).

InspectionResultValuationTypeCode

The GDT InspectionResultValuationTypeCode can be the coded representation of a type of automatic valuation for an inspection result. The valuation type may define how an inspection result is valuated. The valuation can be performed based on nonconforming units or based on the number of defects. An example of GDT InspectionResultValuationTypeCode is:

<InspectionResultValuationTypeCode>1</InspectionResultValuationTypeCode>

In certain implementations, GDT InspectionResultValuationTypeCode may include the following structure:

| GDT | Object Class | Property | Representation/Association | Type | Type Name | Len. | Remarks |
|---|---|---|---|---|---|---|---|
| InspectionResultValuationTypeCode | Inspection | Result_Valuation Type | Code | CDT | Code | 1 | Restricted |

The GDT InspectionResultValuationTypeCode, described above, can be a customer-specific code list with given attributes and its values may include the following: listID can be "10097," if the listID remains unchanged, then the listAgencyID can be "310." The listVersionID can be the Version of the relevant code list assigned and managed by the customer. The InspectionResultValuationTypeCode may consist of one fixed code list in some implementations.

The InspectionResultValuationTypeCode can be used in the context of an inspection. It can provide information about the valuation type used during an automatic valuation of the inspection result. An automatic valuation based on nonconforming units could, for example, lead to a rejection of an inbound delivery if there are more than 3 nonconforming units.

The GDT InspectionResultValuationTypeCode can be represented by the following dictionary objects: Data element (e.g., QIE_TV_VALUATION_MODE), and Domain (e.g., QIE_VALUATION_MODE).

The GDT InspectionResultValuationTypeCode and its values may include the following codes: 1 (i.e., Valuation based on nonconforming units), and 2 (i.e., Valuation based on the number of defects).

InspectionRuleComponentCode

The GDT InspectionRuleComponentCode can be the coded representation of a component of an inspection rule. An inspection rule (business object inspection rule) may contain the specifications for the inspection. The inspection can be used to check whether an object or procedure meets predefined requirements. A component of the inspection rule can be one single specification in the inspection rule. An example of GDT InspectionRuleComponentCode is:

<InspectionRuleComponentCode>2</InspectionRuleComponentCode>

In certain implementations, GDT InspectionRuleComponentCode may include the following structure:

| GDT | | Cat. | Object Class | Property | Representation/Association | Type | Type Name | Len. | Card. | Remarks |
|---|---|---|---|---|---|---|---|---|---|---|
| InspectionRuleComponentCode | | | Inspection Rule Component | | Code | CDT | Code | 1..3 | | Restricted |
| | listAgencyID | A | Code List Agency | Identification | Identifier | xsd | token | | 0..1 | |
| | listVersionID | A | Code List | Version | Identifier | xsd | token | | 0..1 | |
| | listAgencySchemeID | A | Code List Agency | Scheme | Identifier | xsd | token | | 0..1 | |

-continued

| GDT | | Cat. | Object Class | Property | Represen-tation/As-sociation | Type | Type Name | Len. | Card. | Remarks |
|---|---|---|---|---|---|---|---|---|---|---|
| | listAgency-Scheme-AgencyID | A | Code List Agency | Scheme Agency | Identifier | xsd | token | | 0..1 | |

The GDT InspectionDecisionCode can be a customer-specific code list with given attributes and its values may include the following: listID can be "10164," if the listID remains unchanged, then the listAgencyID can be "310," if the code list remains unchanged, then the listVersionID can be the Version of the particular code list assigned and managed by the customer. The listAgencySchemeID can be the ID of the scheme if the listAgencyID does not come from DE 3055. The listAgencySchemeAgencyID can be ID of the organization from DE 3055 that manages the listAgencySchemeID scheme.

The InspectionRuleComponentCode can be used to identify the individual components of an inspection rule (business object inspection rule). InspectionRuleSampleDrawingTool which typically means a "tool for taking samples" can be an example customer-specific code of GDT InspectionRuleComponentCode. The GDT InspectionRuleComponentCode can be represented by the following dictionary objects: data structure (e.g., QIE_TS_IRULE_ARGS_ORIGIN).

The GDT InspectionRuleComponentCode and its values may include the following codes: 1 (i.e., InspectionRuleInspectionScopeCode), 2 (i.e., InspectionRuleInspectionDynamicModificationRuleCode), 3 (i.e., InspectionRuleInspectionDynamicModificationCriterion), 4 (i.e., InspectionRuleQualityInspectionDecisionCodeListID), 5 (i.e., InspectionRuleInspectionSampleSizeDeterminationCode), 6 (i.e., InspectionRuleSampleSizeNumberValue), 7 (i.e., InspectionRuleSampleSizePercent), 8 (i.e., InspectionRuleSampleQuantity), 9 (i.e., InspectionRuleSampleQuantityPercent), 10 (i.e., InspectionRuleMaximumAcceptedDefectsIntegerValue), 11 (i.e., InspectionRuleMaximumAcceptedDefectsPercent Maximum), 12 (i.e., InspectionRuleSamplingSchemeCode), 13 (i.e., InspectionRuleInspectionLevelCodeInspection level), 14 (i.e., InspectionRuleInspectionSeverityCode), 15 (i.e., InspectionRuleAcceptableQualityLevelNumeric), 16 (i.e., InspectionRuleSampleSizeQuantityCalculationRuleName), 17 (i.e., InspectionRuleInspectionResultValuationTypeCode), 18 (i.e., InspectionRuleSubsetQualityInspectionDecisionCodeListID), 19 (i.e., InspectionRuleQualityInspectionSampleTypeCode), 20 (i.e., InspectionRuleSampleDrawingProcedureUUID), 21 (i.e., InspectionRuleSampleDrawingUnitUUID), 22 (i.e., InspectionRuleSampleQualityInspectionDecisionCodeListID), 23 (i.e., InspectionRuleFindingTypeCode).

InspectionSampleSizeDeterminationTypeCode

The GDT InspectionSampleSizeDeterminationTypeCode can be the coded representation of a type of determination used to determine the sample size for an inspection. An example of GDT InspectionSampleSizeDeterminationTypeCode is:

<InspectionSampleSizeDeterminationTypeCode>2</InspectionSampleSizeDeterminationTypeCode>

In certain implementations, GDT InspectionSampleSizeDeterminationTypeCode may include the following structure:

| GDT | Object Class | Prop-erty | Represen-tation/As-sociation | Type | Type Name | Len. | Re-marks |
|---|---|---|---|---|---|---|---|
| Inspection-SampleSize-Determina-tionType-Code | Inspection Sample Size Determi-nation | Type | Code | CDT | Code | 1 | Re-stricted |

The GDT InspectionResultValuationTypeCode, described above, can be a customer-specific code list with given attributes and its values may include the following: listID can be "10096," if the listID remains unchanged, then the listAgencyID can be "310." The listVersionID can be the Version of the relevant code list assigned and managed by the customer.

The InspectionSampleSizeDeterminationTypeCode can be used in the context of an inspection and provides information about how the sample size is determined. The GDT InspectionSampleSizeDeterminationTypeCode can be represented by the following dictionary objects: Data element (e.g., QIE_TV_SAMPLE_TYPE), and Domain (e.g., QIE_SAMPLE_TYPE).

The GDT InspectionSampleSizeDeterminationTypeCode and its values may include the following codes: 1 (i.e., Fixed Sample Size), 2 (i.e., Percentage of Inspection Quantity), 3 (i.e., Use Sampling Scheme), and 4 (i.e., Individual Sampling Type).

InspectionSampleCategoryCode

The GDT InspectionSampleCategoryCode can be the coded representation of the category of a sample in the context of an inspection. An example of GDT InspectionSampleCategoryCode is:

<InspectionSampleCategoryCode>1</InspectionSampleCategoryCode>

In certain implementations, GDT InspectionSampleCategoryCode may include the following structure:

| GDT | | Cat. | Object Class | Property | Represen-tation/As-sociation | Type | Type Name | Len. | Card. | Remarks |
|---|---|---|---|---|---|---|---|---|---|---|
| InspectionSample-CategoryCode | | | Inspection Sample Category | | Code | xsd | Token | 1..3 | | Restricted |
| | listVersionID | A | Code List | Version | Identifier | xsd | token | | 0..1 | |

The GDT InspectionResultValuationTypeCode, described above, can be a customer-specific code list with given attributes and its values may include the following: listID can be "10404."

The listVersionID can be the Version of the relevant code list assigned and managed by the customer.

In the context of a material inspection, InspectionSampleCategoryCode can be define whether a sample is a primary sample, pooled sample, or reserve sample. The GDT InspectionSampleCategoryCode can be represented by the following dictionary objects: Data element (e.g., QIE_TV_ELEM_SUB_CATEGORY), and Domain (e.g., QIE_TV_ELEM_SUB_CATEGORY).

The GDT InspectionResultValuationTypeCode and its values may include the following codes: 1 (i.e., Primary Sample), 2 (i.e., Pooled), 3 (i.e., Reserve Sample).

InspectionSampleTypeCode

The GDT InspectionSampleTypeCode can be the coded representation of the type of a sample in the context of an inspection. An example of GDT InspectionSampleTypeCode is:

<InspectionSampleTypeCode>1</InspectionSampleTypeCode>

In certain implementations, GDT InspectionSampleTypeCode may include the following structure:

| GDT | | Cat. | Object Class | Property | Representation/Association | Type | Type Name | Len. | Card. | Remarks |
|---|---|---|---|---|---|---|---|---|---|---|
| Inspection-Sample-TypeCode | | | Inspection Sample | Type | Code | xsd | Token | 1..3 | | Restricted |
| | listID | A | Code List | Identification | Identifier | xsd | token | | 0..1 | |
| | listAgencyID | A | Code List Agency | Identification | Identifier | xsd | token | | 0..1 | |
| | listVersionID | A | Code List | Version | Identifier | xsd | token | | 0..1 | |
| | listAgency-SchemeID | A | Code List Agency | Scheme | Identifier | xsd | token | | 0..1 | |
| | listAgency-SchemeAgencyID | A | Code List Agency | Scheme Agency | Identifier | xsd | token | | 0..1 | |

The GDT InspectionDecisionCode can be a customer-specific code list with given attributes and its values may include the following: listID can be "10405," if the listID remains unchanged, then the listAgencyID can be "310.," if the code list remains unchanged, then the listVersionID can be the Version of the particular code list assigned and managed by the customer. The listAgencySchemeID can be the ID of the scheme if the listAgencyID does not come from DE 3055. The listAgencySchemeAgencyID can be ID of the organization from DE 3055 that manages the listAgencySchemeID scheme.

The InspectionSampleTypeCode can allocate in which process a sample for an object is to be inspected. For example, a particular sample type could represent samples that are taken from a delivered material in a goods receipt.

The GDT InspectionDecisionCode and its values may include the following codes: 1 (i.e., Goods Receipt Sample), 2 (i.e., Goods Issue Sample), 3 (i.e., Returns Sample).

InspectionScopeCode

The GDT InspectionScopeCode can be the coded description of an inspection scope. Initially, the inspection scope may define if an inspection is to take place or not. If an inspection is to be performed, the inspection scope may define whether it is a 100% inspection or a sampling inspection. An example of GDT InspectionScopeCode is:

<InspectionScopeCode>C</InspectionScopeCode>

In certain implementations, GDT InspectionScopeCode may include the following structure:

| GDT | Cat. | Object Class | Property | Representation/Association | Type | Type Name | Len. | Card. | Remarks |
|---|---|---|---|---|---|---|---|---|---|
| InspectionScopeCode | | Inspection Scope | | Code | CDT | Code | 1 | | Restricted |

The GDT InspectionResultValuationTypeCode, described above, can be a customer-specific code list with given attributes and its values may include the following: listID can be "10093," if the listID remains unchanged, then the listAgencyID can be "310." The listVersionID can be the Version of the relevant code list assigned and managed by the customer. The InspectionScopeCode may consist of one fixed code list.

The InspectionScopeCode can be used in the context of inspections. It may provide information as to whether and how an inspection is to be performed. The GDT InspectionScopeCode can be represented by the following dictionary objects: data element (e.g., QIE_TV_INSP_PROC), Domain (e.g., QIE_INSP_PROC).

The InspectionScopeCode and its values may include the following codes: N (i.e., No inspection), C (i.e., 100% inspection), and S (i.e., Sampling inspection).

InspectionSeverityCode

The GDT InspectionSeverityCode can be the coded description of an inspection severity. In a sampling inspection using a sampling scheme according to DIN ISO 2859, the sample size can be determined based on the inspection severity, the inspection level, and the quantity to be inspected (lot size). If the inspection is not a sampling inspection according to DIN ISO 2859, the sample size can be determined directly based on the inspection severity and the quantity to be inspected (lot size). In this case, the inspection level is not taken into consideration.

The inspection severity can be used to adjust the sample size. A reduced inspection severity may give rise to a smaller sample size, a tightened inspection severity gives rise to a larger sample size. An example of GDT InspectionSeverity-Code is:

<InspectionSeverityCode>2</InspectionSeverityCode>

In certain implementations, GDT InspectionSeverityCode may include the following structure:

| GDT | Object Class | Property | Represen-tation/As-sociation | Type | Type Name | Len. | Remarks |
|---|---|---|---|---|---|---|---|
| InspectionSeverityCode | Inspection | Severity | Code | CDT | Code | 1 | Restricted |

The GDT InspectionSeverityCode, described above, can be a customer-specific code list with given attributes and its values may include the following: listID can be "10099," if the listID remains unchanged, then the listAgencyID can be "310." The listVersionID can be the Version of the relevant code list assigned and managed by the customer. The values of this code list can be based on DIN ISO standard 2859. The standard may not contain a code list for this purpose. The InspectionSeverityCode may consist of one fixed code list.

The InspectionSeverityCode can be used in the context of inspections and provides information about the inspection severity based on DIN ISO 2859. The GDT InspectionSeverityCode can be represented by the following dictionary objects: Data element (e.g., QIE_TV_INSP_SEVERITY), and Domain (e.g., QIE_INSP_SEVERITY).

The InspectionSeverityCode and the DIN ISO 2859 may include the following codes: 1 (i.e., Normal), 2 (i.e., Tightened), and 3 (i.e., Reduced).

InspectionStageID

The GDT InspectionStageID can be an identifier for an inspection stage. Within a dynamic modification rule (see DynamicModificationRuleCode), the inspection stage typically defines whether an inspection is to be performed or skipped. The inspection stage may also define the inspection severity (see InspectionSeverityCode) with which the inspection is performed and contains the conditions for a change to another inspection stage. The inspection severity can only be relevant for inspections with a sampling scheme. A change of inspection stage usually brings about a reduction of the inspection scope. The dynamic modification rule may contain all inspection stages possible for a particular process of inspection scope reduction. An example of GDT InspectionStageID code is:

<InspectionStageID>3</InspectionStageID>

In certain implementations, GDT InspectionStageID may include the following structure:

| GDT | Object Class | Property | Represen-tation/As-sociation | Type | Type Name | Len. | Remarks |
|---|---|---|---|---|---|---|---|
| InspectionStageID | Inspection Stage | Identification | Identifier | CDT | Identifier | 1..15 | Restricted |

-

The GDT InspectionStageID, described above, can be a custom-specific code list, which can be used to identify the inspection stage. The InspectionStageID can be a unique within an inspection rule.

InspectionSubsetID

The GDT InspectionSubsetID can be the unique identification of a subset in the context of an inspection. An example of GDT InspectionSubsetID code is:

<InspectionSubsetID>Subset0001</InspectionSubsetID>

In certain implementations, GDT InspectionSubsetID may include the following structure:

| GDT | | Cat. | Object Class | Property | Represen-tation/As-sociation | Type | Type Name | Len. | Card. | Re-marks |
|---|---|---|---|---|---|---|---|---|---|---|
| Inspec-tionSub-setID | | | Inspection Subset | Identifi-cation | Identifier | xsd | token | 1..255 | | Restricted |
| | schemeID | A | Identifi-cation Scheme | Identifi-cation | Identifier | xsd | token | 1..60 | 0..1 | |
| | schemeAgencyID | A | Identifi-cation Scheme Agency | Identifi-cation | Identifier | xsd | token | 1..60 | 0..1 | |

The GDT InspectionSubsetID, described above, can be a customer-specific code list with given attributes and its values may include the following: schemeID can be the InspectionSubset<Qualifier>ID and the schemeAgencyID can be the Business System, which may issue the ID.

The GDT InspectionSampleID can be represented by the following dictionary objects: Data element (e.g., QIE_TV_ELEM_NUMBER), Domain (e.g., QIE_ELEM_NUMBER).

InspectionSubsetTypeCode

The GDT InspectionSubsetTypeCode can be the coded representation of the type of a subset in the context of an inspection. An example of GDT inspectionSubsetTypeCode is:

<InspectionSubsetTypeCode>1</InspectionSubsetTypeCode>

In certain implementations, GDT InspectionSubsetTypeCode may include the following structure:

| GDT | | Cat. | Object Class | Property | Representation/Association | Type | Type Name | Len. | Card. | Remarks |
|---|---|---|---|---|---|---|---|---|---|---|
| Inspection-SubsetType-Code | | | Inspection Subset | Type | Code | xsd | Token | 1..3 | | restricted |
| | listID | A | Code List | Identification | Identifier | xsd | token | | 0..1 | |
| | listAgencyID | A | Code List Agency | Identification | Identifier | xsd | token | | 0..1 | |
| | listVersionID | A | Code List | Version | Identifier | xsd | token | | 0..1 | |
| | listAgency-SchemeID | A | Code List Agency | Scheme | Identifier | xsd | token | | 0..1 | |
| | listAgency-SchemeAgencyID | A | Code List Agency | Scheme Agency | Identifier | xsd | token | | 0..1 | |

The GDT InspectionSubsetTypeCode can be a customer-specific code list with given attributes and its values may include the following: listID can be "10406," if the listID remains unchanged, then the listAgencyID can be "310.," if the code list remains unchanged, then the listVersionID can be the Version of the particular code list assigned and managed by the customer. The listAgencySchemeID can be the ID of the scheme if the listAgencyID does not come from DE 3055. The listAgencySchemeAgencyID can be ID of the organization from DE 3055 that manages the listAgencySchemeID scheme.

The InspectionSubsetTypeCode may describe the process in which the inspection quantity is to be divided into subsets and where this process takes place. In the context of a material inspection, for example, subsets may be formed in the goods receipt or goods issue processes.

The GDT InspectionDecisionCode and its values may include the following codes: 1 (i.e., Goods Receipt Sorting), 2 (i.e., Goods Issue Sorting).

InspectionTypeCode

The GDT InspectionTypeCode can be the coded representation of the type of an inspection. An example of GDT InspectionTypeCode is:

<InspectionTypeCode>1</InspectionTypeCode>

In certain implementations, GDT InspectionTypeCode may include the following structure:

| GDT | | Cat. | Object Class | Property | Representation/Association | Type | Type Name | Len. | Card. | Remarks |
|---|---|---|---|---|---|---|---|---|---|---|
| Inspection-TypeCode | | | Inspection | Type | Code | XSD | Token | 1..4 | | Restricted |
| | listAgencyID | A | Code List Agency | Identification | Identifier | xsd | token | | 0..1 | |
| | listVersionID | A | Code List | Version | Identifier | xsd | token | | 0..1 | |

-continued

| GDT | | Cat. | Object Class | Property | Represen-tation/As-sociation | Type | Type Name | Len. | Card. | Remarks |
|---|---|---|---|---|---|---|---|---|---|---|
| | listAgency-SchemeID | A | Code List Agency | Scheme | Identifier | xsd | token | | 0..1 | |
| | listAgency-SchemeAgencyID | A | Code List Agency | Scheme Agency | Identifier | xsd | token | | 0..1 | |

The GDT InspectionTypeCode can be a customer-specific code list with given attributes and its values may include the following: listID can be "10407," if the listID remains unchanged, then the listAgencyID can be "310," if the code list remains unchanged, then the listVersionID can be the Version of the particular code list assigned and managed by the customer. The listAgencySchemeID can be the ID of the scheme if the listAgencyID does not come from DE 3055. The listAgencySchemeAgencyID can be ID of the organization from DE 3055 that manages the listAgencySchemeID scheme.

The type of an inspection may define the process and the object for which inspection documents can be created. This type could, for example, describe a material inspection in the goods receipt process. It can be the central controlling element of the inspection. The GDT InspectionTypeCode and its values may include the following codes: 1 (i.e., Goods Receipt Inspection), 2 (i.e., Returns Inspection).

InstallationPointID

The GDT InstallationPointID can be a unique identifier for an installation point. An installation point can be the physical or logical location at which a business object, for example a material or software, is installed during a certain period of time. An installation point can have a multilevel structure. Two usage examples for physical or logical location include: A manufacturer offers customers services for its products; for this purpose, it manages an installed base for its delivered products. An installation point within this installed base describes the physical location of a given product at the customer's site and A software manufacturer manages the installed base of the software system it delivered to the customer. Since the software systems are complex, they are structured in multiple levels as modules within the installed base. An installation point, in this case, describes the logical assignment of a module within the overall software system. An example of GDT InstallationPointID code is:

<InstallationPointID>4711</InstallationPointID>

In certain implementations, GDT InstallationPointID may include the following structure:

| GDT | | Cat. | Object Class | Prop-erty | Represen-tation/As-sociation | Type | Type Name | Len. | Card. | Remarks |
|---|---|---|---|---|---|---|---|---|---|---|
| Installation-PointID | | | Installa-tion Point | Identifi-cation | Identifier | CDT | Identifier | 1..40 | | restricted |
| | schemeID | A | Identifica-tion Scheme | Identifi-cation | Identifier | xsd | token | 1..60 | 0..1 | |
| | scheme-AgencyID | A | Identifica-tion Scheme Agency | Identifi-cation | Identifier | xsd | token | 1..60 | 0..1 | |

-

The GDT InstallationPointID, described above, can be a customer-specific code list with given attributes and its values include the following: schemeID can be the ID of the scheme. The schemeID can represent the context that is used to identify an object. The SchemeID can only be unique within the agency that manages this identification scheme. The schemeAgencyID can be the ID of the agency that manages the identification scheme. The agencies from DE 3055 can be used as defaults, but the roles defined in DE 3055 may not be used.

The GDT InstallationPointID can be represented by the following dictionary objects: Data element (e.g., IB_INSTANCE), domain (e.g., IB_INSTANCE).

InstalledBaseCategoryCode

The GDT InstalledBaseCategoryCode can be the coded representation of the category of an installed base, differentiated according to customer-specific criteria. An installed base can be a functionally-structured arrangement of business objects at a logical or physical location. An example of GDT InstalledBaseCategoryCode is:

<InstalledBaseCategoryCode>1</InstalledBaseCategoryCode>

In certain implementations, GDT InstalledBaseCategory-Code may include the following structure:

| GDT | | Cat. | Object Class | Prop-erty | Represen-tation/As-sociation | Type | Type Name | Len. | Card. | Remarks |
|---|---|---|---|---|---|---|---|---|---|---|
| In-stalled-Base-Cate-gory-Code | | | In-stalled Base | Cate-gory | Code | CDT | Code | 1..2 | | restricted |
| | ListID | A | Code List | Identifi-cation | Identi-fier | xsd | token | | 0..1 | |
| | listAgencyID | A | Code-List-Agency | Identifi-cation | Identi-fier | xsd | Token | | 0..1 | |
| | listVersionID | A | Code-List | Version | Identi-fier | xsd | Token | | 0..1 | |
| | listAgency-SchemeID | A | Code-List-Agency | Scheme | Identi-fier | xsd | Token | | 0..1 | |
| | listAgency-SchemeAgencyID | A | Code-List-Agency | Scheme-Agency | Identi-fier | xsd | Token | | 0..1 | |

The GDT InstalledBaseCategoryCode can be a customer-specific code list with given attributes and its values may include the following: listID can be "10149," if the listID remains unchanged, then the listAgencyID can be "310.," if the code list remains unchanged, then the listVersionID can be the Version of the particular code list assigned and managed by the customer. The listAgencySchemeID can be the ID of the scheme if the listAgencyID does not come from DE 3055. The listAgencySchemeAgencyID can be ID of the organization from DE 3055 that manages the listAgency-SchemeID scheme.

The GDT InstalledBaseCategoryCode and its values may include the following codes: Building (i.e., Building-installed base includes buildings), Machine facilities (i.e., Machine facilities-installed base includes machines).

InstalledBaseID

The GDT InstalledBaseID can be a unique identifier for an installed base. An installed base can be a functionally-structured arrangement of business objects at a logical or physical location. An example of GDT InstalledBaseID code is:

<InstalledBaseID>471</InstalledBaseID>

In certain implementations, GDT InstalledBaseID may include the following structure:

The GDT InstalledBaseID, described above, can be a customer-specific code list, with given attributes and its values may include the following: schemeID can be the ID of the scheme. The schemeID can represent the context that is used to identify an object. The SchemeID can only be unique within the agency that manages this identification scheme. The schemeAgencyID can be the ID of the agency that manages the identification scheme. The agencies from DE 3055 can be used as defaults, but the roles defined in DE 3055 may not be used.

The GDT InstalledBaseID can be represented by the following dictionary objects: Data element (e.g., IB_IBASE), Domain (e.g., IB_INSTANCE).

InstalledObjectTypeCode

The GDT InstalledObjectTypeCode can be the coded representation of the type of an installed object. An example of GDT InstalledObjectTypeCode is:

<InstalledObjectTypeCode>2</InstalledObjectType-Code>

| GDT | | Cat. | Object Class | Property | Represen-tation/As-sociation | Type | Type Name | Len. | Card. | Remarks |
|---|---|---|---|---|---|---|---|---|---|---|
| Installed BaseID | | | Installed Base | Identification | Identifier | CDT | Identifier | 1..40 | | restricted |
| | schemeID | A | Identification Scheme | Identification | Identifier | xsd | token | 1..60 | 0..1 | |
| | scheme-AgencyID | A | Identification Scheme Agency | Identification | Identifier | xsd | token | 1..60 | 0..1 | |

In certain implementations, GDT InstalledObjectTypeCode may include the following structure:

| GDT | | Cat. | Object Class | Property | Represen-tation/As-sociation | Type | Type Name | Len. | Card. | Remarks |
|---|---|---|---|---|---|---|---|---|---|---|
| Installed-Object-TypeCode | | | Installed Object | Type | Code | CDT | Code | 1..4 | | Restricted |
| | listID | A | Code List | Identifi-cation | Identifier | xsd | token | | 0..1 | |
| | listAgencyID | A | Code List Agency | Identifi-cation | Identifier | xsd | token | | 0..1 | |
| | listVersionID | A | Code List | Version | Identifier | xsd | token | | 0..1 | |
| | listAgency-SchemeID | A | Code List Agency | Scheme | Identifier | xsd | token | | 0..1 | |
| | listAgency-SchemeAgencyID | A | Code List Agency | Scheme Agency | Identifier | xsd | token | | 0..1 | |

The GDT InstalledObjectTypeCode can be a customer-specific code list with given attributes and its values may include the following: listID can be "10148," if the listID remains unchanged, then the listAgencyID can be "310," if the code list remains unchanged, then the listVersionID can be the Version of the particular code list assigned and managed by the customer. The listAgencySchemeID can be the ID of the scheme if the listAgencyID does not come from DE 3055. The listAgencySchemeAgencyID can be ID of the organization from DE 3055 that manages the listAgencySchemeID scheme.

The GDT InstalledObjectTypeCode can be used in the BO Installation Point to determine the type of an installed object. An example of InstalledObjectTypeCode can be the following: Telephone connection (i.e., Telephone connection—the installed object is of the telephone connection type).

The GDT InstalledObjectTypeCode and its values may include the following codes: Code 1 (i.e., Material), Code 2 (i.e., IndividualMaterial).

IntegerValue

The GDT IntegerValue can be an integer. An integer can be regarded as a numerical decimal value without decimal places. An example of GDT IntegerValue code is:

```
<PropertyValue>
. . .
  <IntegerValue>42</IntegerValue>
. . .
</PropertyValue>
```

In certain implementations, GDT IntegerValue may include the following structure:

| GDT | Rep./Ass. Qualifier | Representation/ Association | Type | Type Name | Remarks |
|---|---|---|---|---|---|
| IntegerValue | Integer | Value | xsd | integer | |

The IntegerValue can be a qualified basic GDT based on the secondary representation term Value of the CDT Numeric. IntegerValue can be used when the explicit reference to the integer representation of the element based on IntegerValue is both meaningful and desired from a semantic perspective, for example, with rounded or estimated values. The Integer qualifier then may become part of the relevant element name.

As a general rule, numeric business values can not be defined using their integer representation. Instead, this representation can be derived implicitly from the semantics of the numeric value. Examples of this may include OrdinalNumberValue or DunningCounterValue InterfaceElementID The GDT InterfaceElementID can be a unique identifier for an element in an interface. An example of GDT InterfaceElementID code is:

```
<InterfaceElementID schemeID='Open Catalog Interface' schemeAgencyID='123456789' schemeAgencySchemeID='DUNS' schemeAgencySchemeAgencyID='016'>NEW_ITEM-DESCRIPTION</InterfaceElementID>
```

In certain implementations, GDT InterfaceElementID may include the following structure:

| GDT | | Cat. | Object Class | Property | Representation/ Association | Type | Type Name | Len. | Card. | Remarks |
|---|---|---|---|---|---|---|---|---|---|---|
| Inter-faceEle-mentID | | | Interface Element | | Identifier | CDT | Identifier | 1..40 | | restricted |
| | schemeID | A | Identification Scheme | | Identifier | XSD | Token | 1..60 | 0..1 | |
| | scheme-AgencyID | A | Identification Scheme Agency | | Identifier | XSD | Token | 1..60 | 0..1 | |
| | schemeAgency-SchemeID | A | Identification Scheme Agency | Scheme | Identifier | XSD | Token | 1..60 | 0..1 | |
| | schemeAgency-Scheme-AgencyID | A | Identification Scheme Agency | Scheme Agency | Identifier | XSD | Token | 1..3 | 0..1 | |

The GDT InterfaceElementID can be a customer-specific codelist with given attributes and it may include the following values: schemeID can be ID of the scheme, which can be released and maintained by the responsible organization of the ID scheme. The owner may retrieve the correct ID from the responsible organization. If there is no ID available, the name of the identifier or identifier type can be entered, which can be used in the corresponding standard, specification, or scheme of the responsible organization. The schemeVersionID can be the Version of the ID scheme, which can be released and maintained by the organization, which can be named in schemeAgencyID. The owner may retrieve the relevant version ID from the responsible organization. If there is no version for the ID scheme, the version of the standard, the specification, or the scheme can be used. The SchemeAgencyID can be the ID of the organization maintaining the ID scheme. The SchemeAgency identification can be released by an organization contained in "DE 3055" (e.g., DUNS, EAN). The GDT owner may retrieve the correct ID from the responsible organization. The SchemeAgencySchemeID can be the identification of the schema which may identify the organization named in schemeAgencyID. It can include a certain scheme ID of partners, companies, members, etc. (e.g. DUNS+4) of an organization named in schemeAgency-SchemeAgencyID (Bsp. EAN, DUNS, SWIFT, etc.). The permitted values depend on the corresponding interface and may be taken from its documentation. The attribute schemeID identifies the interface, schemeAgencyID identifies the issuer of the interface, which is usually only unique in the context of the attributes schemeAgencySchemeID and schemeAgencySchemeAgencyID.

The GDT InterfaceElementID may not be used to refer to elements of XML interfaces. If necessary, there may be an examination of how an element of an XML interface can be identified and how the attributes can be used in this case. InterfaceElementID can be used, for example, to assign references to interface elements of various e-procurement systems to characteristics within a catalog.

For example, The "Open Catalog Interface" can be used to link Web-based purchasing catalogs to an e-procurement system. A user calls up a catalog from the e-procurement system, searches for products in this catalog, and makes a selection. When this is transmitted to the virtual shopping cart of the e-procurement system (user purchase order), characteristics of the product are transmitted to the e-procurement using the above-mentioned interface. The InterfaceElementID contains the interface element identification of the calling e-procurement system for each characteristic and enables the characteristics to be assigned correctly to the elements of the e-procurement interface.

IntervalBoundaryTypeCode

The GDT IntervalBoundaryTypeCode can be a coded representation of an interval boundary type. An example of GDT IntervalBoundaryTypeCode is:

<IntervalBoundaryTypeCode>3</IntervalBoundaryTypeCode>

In certain implementations, GDT IntervalBoundaryTypeCode may include the following structure:

| GDT | Property | Representation/ Association | Type | Type Name | Len. | Remarks |
|---|---|---|---|---|---|---|
| IntervalBoundary-TypeCode | Interval Boundary Type | Code | CDT | Code | 1 | restricted |

The GDT IntervalBoundaryTypeCode, described above, can be a customer-specific codelist with given attributes and it may include the following values: listID can be "10028," listAgencyID can be "310," and listVersionID can be "tbd."

The meaning of scale values established by the IntervalBoundaryTypeCode can be used to describe intervals by their boundaries. The values that are expressed by the interval relationship may belong to the same ordinal scale. The IntervalBoundaryTypeCode can be a proprietary code list with fixed predefined values. Changes to the permitted values can involve changes to the interface.

The GDT IntervalBoundaryTypeCode and its values may include the following codes: Code 1 (i.e., Corresponds to a "single value"; =X), Code 2 (i.e., Corresponds to an interval with a closed lower interval boundary and an open upper interval boundary; [X,Y)), Code 3 (i.e., Corresponds to an interval with a closed upper and lower interval boundary; [X,Y]), Code 4 (i.e., Corresponds to an interval with an open upper and lower interval boundary; (X,Y)), Code 5 (i.e., Corresponds to an interval with an open lower interval boundary and a closed upper interval boundary; (X,Y]), 6 (i.e., Corresponds to an interval with an unlimited lower boundary and an open upper boundary; <X), 7 (i.e., Corresponds to an interval with an unlimited lower boundary and a closed upper boundary; <=x), 8 (i.e., Corresponds to an interval with an open lower boundary and an unlimited upper boundary; >X), (i.e., Corresponds to an interval with a closed lower boundary and an unlimited upper boundary; >=X).

InventoryAllocationTypeCode

The GDT InventoryAllocationTypeCode can be the coded representation of the type of inventory allocation. An Allocation can be the reservation of inventory or storage capacity for inventory for anticipated consumers. Allocation types can be built depending on the certainty that the expected outbound or inbound process occurs. An example of GDT InventoryAllocationTypeCode is:

<InventoryAllocationTypeCode>1</InventoryAllocationTypeCode>

In certain implementations, GDT InventoryAllocationTypeCode may include the following structure:

| GDT | Object Class | Property | Representation/ Association | Type | Type Name | Len. | Card. | Remarks |
|---|---|---|---|---|---|---|---|---|
| InventoryAllocationTypeCode | Inventory | Allocation_Type | Code | CDT | Code | 1 | 1 | Restricted |

The GDT InventoryAllocationTypeCode described above, can be a customer-specific codelist with given attributes and it may include the following values: listID can be "10100," listAgencyID can be "310."

There is a correlation between AllocationType and the AvailabilityCalculationType: Before creating an allocation, an availability calculation can be made based on the allocation type.

The GDT InventoryAllocationTypeCode and its values may include the following codes: Code 1 (i.e., Immediate Material Allocation), Code 2 (i.e., Expected Material Allocation), Code 3 (i.e., Immediate Capacity Allocation), Code 4 (i.e., Expected Capacity Allocation).

InventoryAvailabilityCheckScopeCode

The GDT InventoryAvailabilityCheckScopeCode can be the coded representation of the scope of an inventory availability check. The InventoryAvailabilityCheckScopeCode may define which Allocations are considered when an availability-check is performed. The availability calculation can be based on physical Inventory and different types of Allocation of Inventory or Allocation of Capacity for Inventory. An example of GDT InventoryAvailabilityCheckScopeCode is:

<InventoryAvailabilityCheckScopeCode>1</InventoryAvailabilityCheckScopeCode>

In certain implementations, GDT InventoryAvailabilityCheckScopeCode may include the following structure:

| GDT | Object Class | Property | Representation/ Association | Type | Type Name | Len. | Card. | Remarks |
|---|---|---|---|---|---|---|---|---|
| InventoryAvailabilityCheck-ScopeCode | Inventory | AvailabilityCheckScope | Code | CDT | Code | 1 | 1 | Restricted |

The GDT InventoryAvailabilityCheckScopeCode can be a customer-specific code list with given attributes and its values may include the following: listID can be "10101," if the listID remains unchanged, then the listAgencyID can be "310," if the code list remains unchanged, then the listVersionID can be the Version of the relevant code list assigned and managed by the customer.

An Inventory availability can be used internally in processes, such as Site Logistics Processing (SDD-Source and Destination Determination) or Production processing in order, to check availability of inventory in a location. There is a correlation between InventoryAvailabilityCheckScopeCode and InventoryAllocationTypeCode: Before creating an allocation from any type, an availability calculation is performed. For more information, refer to InventoryAllocationTypeCode GDT.

The GDT InventoryAvailabilityCheckScopeCode and its values may include the following codes: Code 1 (i.e., ImmediateMaterialAvailability), Code 2 (i.e., ExpectedMaterialAvailability), Code 3 (i.e., PhysicalMaterialAvailability), Code 4 (i.e., ImmediateCapacityAvailability), Code 5 (i.e., ExpectedCapacityAvailability).

InventoryCleanupConditionCode

The GDT InventoryCleanupConditionCode can be a coded representation of a condition that indicates whether an inventory cleanup is required. An example of GDT InventoryCleanupConditionCode is:

<InventoryCleanupConditionCode listAgencyID=6>1</InventoryCleanupConditionCode>

In certain implementations, GDT InventoryCleanupConditionCode may include the following structure:

| GDT | | Cat. | Object Class | Property | Representation/ Association | Type | Type Name | Len. | Card. | Remarks |
|---|---|---|---|---|---|---|---|---|---|---|
| Inventory-Cleanup-Condition-Code | | | Inventory Cleanup | Condition | Code | CDT | Code | 1..2 | | |
| | listAgencyID | A | Code List Agency | Identification | Identifier | xsd | token | | 0..1 | |
| | listVersionID | A | Code List | Version | Identifier | xsd | token | | 0..1 | |
| | listAgency-SchemeID | A | Code List Agency | Scheme | Identifier | xsd | token | | 0..1 | |
| | listAgency-Scheme-AgencyID | A | Code List Agency | Scheme Agency | Identifier | xsd | token | | 0..1 | |

The GDT InventoryCleanupConditionCode, described above, can be a customer-specific codelist, with given attributes and it may include the following values: listID that can be "assigned by the Coaching Team" if the codelist remains unchanged and then the listAgencyID can be "310" if the code list remains unchanged, then the listVersionID can be the Version of the particular code list assigned and managed by the customer, the listAgencySchemeID can be the ID of the scheme if the listAgencyID does not come from DE 3055. The listAgencySchemeAgencyID can be ID of the organization from DE 3055 that manages the listAgencySchemeID scheme.

InventoryCleanupConditionCode can be used to determine whether inventory cleanup is required by assigning the relevant inventory cleanup condition to a storage behaviour method. Storage behaviour method can be defined by a set of inventory level control rules. There are two kinds of inventory level control rules: replenishment rules and cleanup rules. A cleanup rule is made up of a set of inventory cleanup conditions and an execution method. A cleanup rule defines how inventory should be cleaned up when certain inventory cleanup conditions are met.

Examples of customer-specific codes can be the following: Current and ForseenOutbound Inventory Quantity (e.g., Current-CleanupLeadTime×ConsumptionRate>Threshold) (i.e., Physical Inventory quantity minus foreseen outbound inventory quantity is more than a given threshold).

The GDT InventoryCleanupConditionCode and its values may include the following codes: Code 1 (i.e., Current Inventory Quantity), (i.e., Current considering Outbound Inventory Quantity), (i.e., Expected Inventory Quantity).

InventoryDestinationLocationSearchMethodCode

The GDT InventoryDestinationLocationSearchMethodCode can be a coded representation of a search method for determining a destination location (e.g. Logistics area or a resource) for inventory placement. An example of GDT InventoryDestinationLocationSearchMethodCode is:

<SearchMethodCode listAgencyID=6>1</SearchMethodCode>

In certain implementations, GDT InventoryDestinationLocationSearchMethodCode may include the following structure:

The GDT InventoryCleanupConditionCode, described above, can be a customer-specific codelist, with given attributes and it may include the following values: listID can be "10214," if the codelist remains unchanged, then the listAgencyID can be "310," if the code list remains unchanged, then the listVersionID can be the Version of the particular code list assigned and managed by the customer. The listAgencySchemeID can be the ID of the scheme if the listAgencyID does not come from DE 3055. The listAgencySchemeAgencyID can be ID of the organization from DE 3055 that manages the listAgencySchemeID scheme.

The GDT InventoryDestinationLocationSearchMethodCode can be used to determine what search method will be used in order to find a destination location for inventory placement. For example, first available search method indicates that inventory should be placed in the first available destination location. Inventory destination location search methods can be assigned to a storage behaviour method, which is a set of rules that may define the manner in which a storage location is managed.

An example of customer-specific code can be the following: Addition to Existing Inventory (A search method according to which inventory is placed into a destination location that already contains the same kind of inventory).

The GDT InventoryDestinationLocationSearchMethodCode and its values may include the following codes: Code 1 (i.e., First Available), Code 2 (i.e., Fixed Bin).

InventoryLevelControlRequirementTypeCode

The GDT InventoryLevelControlRequirementTypeCode can be the coded representation of a requirement type for examining inventory quantities and controlling inventory shortages and surpluses. An InventoryLevelControlRequirementType may describe the essential nature of an inventory level control requirement according to the processes that have to be initiated to meet the requirement. An example of GDT InventoryLevelControlRequirementTypeCode is:

<InventoryLevelControlRequirementTypeCode>1 <InventoryLevelControlRequirementTypeCode>

| GDT | | Cat. | Object Class | Property | Representation/ Association | Type | Type Name | Len. | Card. | Remarks |
|---|---|---|---|---|---|---|---|---|---|---|
| Inventory Destination-Location SearchMethodCode | | | Inventory Destination Location | Search Method | Code | CDT | Code | 1..2 | | |
| | listID | A | Code List | Identification | Identifier | xsd | token | | 0..1 | |
| | listAgencyID | A | Code List Agency | Identification | Identifier | Xsd | token | | 0..1 | |
| | listVersionID | A | Code List | Version | Identifier | Xsd | token | | 0..1 | |
| | listAgency-SchemeID | A | Code List Agency | Scheme | Identifier | Xsd | token | | 0..1 | |
| | listAgency-Scheme-AgencyID | A | Code List Agency | Scheme Agency | Identifier | Xsd | token | | 0..1 | |

In certain implementations, GDT InventoryLevelControlRequirementTypeCode may include the following structure:

| GDT | Object Class | Property | Representation/ Association | Type | Type Name | Len. | Remarks |
|---|---|---|---|---|---|---|---|
| InventoryLevelControl-RequirementTypeCode | Inventory Level Control Requirement | Type | Code | CDT | Code | 1 | restricted |

The GDT InventoryAvailabilityCheckScopeCode can be a customer-specific code list with given attributes and its values may include the following: listID can be "10168," if the listID remains unchanged, then the listAgencyID can be "310," if the code list remains unchanged, then the listVersionID can be the Version of the particular code list assigned and managed by the customer.

When there is a request for a replenishment or cleanup process, the InventoryLevelControlRequirementTypeCode can be used by the system to determine which process should be triggered.

The GDT InventoryAvailabilityCheckScopeCode and its values may include the following codes: Code 1 (i.e., ReplenishmentRequirement), Code 2 (i.e., CleanupRequirement), Code 3 (i.e., LevelingRequirement).

InventoryLevelControlRuleExecutionMethodPriorityDeterminationMethodCode

The GDT InventoryLevelControlRuleExecutionMethodPriorityDeterminationMethodCode can be a coded representation of a method to determine the priority of a replenishment or cleanup process triggered during the execution of a InventoryLevelControlRuleExecutionMethod. An Inventory level control rule execution method may define the measures that have to be taken if replenishment or cleanup is required. An example of GDT InventoryLevelControlRuleExecutionMethodPriorityDeterminationMethodCode is:

<PriorityDeterminationMethodCode listAgencyID=6>1</PriorityDeterminationMethodCode>

In certain implementations, GDT InventoryLevelControlRuleExecutionMethodPriorityDeterminationMethodCode may include the following structure:

The GDT InventoryLevelControlRuleExecutionMethodPriorityDeterminationMethodCode, described above, can be a customer-specific codelist, with given attributes and it may include the following values: listID can be "10221," if the codelist remains unchanged, then the listAgencyID can be "310," if the code list remains unchanged, then the listVersionID can be the Version of the particular code list assigned and managed by the customer. The listAgencySchemeID can be the ID of the scheme if the listAgencyID does not come from DE 3055. The listAgencySchemeAgencyID can be ID of the organization from DE 3055 that manages the listAgencySchemeID scheme.

Prior to a replenishment or cleanup process, the InventoryLevelControlRuleExecutionMethodPriorityDeterminationMethodCode can determine the relevant method to determine the priority of the replenishment or cleanup process. The method for determining the priority can be part of the Inventory level control execution method.

An example of customer-specific code semantics: According to Request—Priority is determined according to the priority defined in the request.

The GDT InventoryLevelControlRuleExecutionMethodPriorityDeterminationMethodCode and its values may include the following codes: Code 1 (i.e., Requested Quantity in Relation to Available Quantity), Code 2 (i.e., Constant), Code 3 (i.e., According to Order).

InventoryLevelControlRuleTypeCode

An InventoryLevelControlRuleTypeCode is a coded representation of the type of an Inventory Level Control Rule. InventoryLevelControlRule can define how inventory replenishment and cleanup should be done when certain conditions are met. An example of GDT InventoryLevelControlRuleTypeCode is:

<InventoryLevelControlRuleTypeCode>1</InventoryLevelControlRuleTypeCode>

| GDT | | Cat. | Object Class | Property | Representation/ Association | Type | Type Name | Len. | Card. | Remarks |
|---|---|---|---|---|---|---|---|---|---|---|
| InventoryLevelControl RuleExecution-MethodPriorityDeter-minationMethodCode | | | Inventory Level Control Rule_ Execution Method | Priority Determination_ Method | Code | CDT | Code | 1..2 | | |
| | listAgencyID | A | Code List Agency | Identification | Identifier | xsd | token | | 0..1 | |
| | listVersionID | A | Code List | Version | Identifier | xsd | token | | 0..1 | |
| | listAgency-SchemeID | A | Code List Agency | Scheme | Identifier | xsd | token | | 0..1 | |
| | listAgency-Scheme-AgencyID | A | Code List Agency | Scheme Agency | Identifier | xsd | token | | 0..1 | |

In certain implementations, GDT InventoryLevelControlRuleType Code may have the following structure:

| GDT | Object Class | Property | Representation/ Association | Type | Type Name | Len. | Remarks |
|---|---|---|---|---|---|---|---|
| InventoryLevel-ControlRuleTypeCode | Inventory Level Control Rule | Type | Code | CDT | Code | 1 | restricted |

For GDT InventoryLevelControlRuleTypeCode, a customer-specific code list can be assigned to the code. A listID can be "10178." If the code list is unchanged, a listAgencyID can be "310." Otherwise, a listAgencyID can be the ID of the customer (e.g., ID from DE 3055, if listed there). A listVersionID can be the version of the particular code list (e.g., assigned and managed by the customer).

The InventoryLevelControlRuleTypeCode can be used to distinguish between the different types of inventory level control rules. These rules can be associated with a storage behavior method which can define the manner in which a storage location is managed.

The data type InventoryLevelControlRuleTypeCode may use the following codes: 1 (i.e., Replenishment Rule), 2 (i.e., Cleanup Rule).

InventoryMovementDirectionCode

An InventoryMovementDirectionCode is the coded representation of the direction of an inventory movement (receipt, issue). Inventory is the quantity of all the materials in a certain location including the material allocations at this location. An example of GDT InventoryMovementDirectionCode is:

<InventoryMovementDirectionCode>1</InventoryMovementDirectionCode>

In certain implementations, GDT InventoryMovementDirection Code may have the following structure:

| GDT | Object Class | Property | Representation/ Association | Type | Type Name | Len. | Remarks |
|---|---|---|---|---|---|---|---|
| InventoryMovement-DirectionCode | Inventory Movement | Direction | Code | CDT | Code | 1 | restricted |

The data type GDT InventoryMovementDirectionCode may assign a code list to the code. The value range of the attributes for InventoryMovementDirectionCode can correspond to the values of the code 4501 (i.e., "Inventory Movement Direction Code") of the EDIFACT code list D04B.

The data type GDT InventoryMovementDirectionCode may use the following codes: 1 (i.e., Inventory issue), 2 (i.e., Inventory receipt).

InventoryReplenishmentConditionCode

An InventoryReplenishmentConditionCode is a coded representation of a condition that indicates whether a inventory replenishment is required. An example of InventoryReplenishmentConditionCode is:

<InventoryReplenishmentConditionCode listAgencyID=6>1</InventoryReplenishmentConditionCode>

In certain implementations, GDT InventoryReplenishmentConditionCode may have the following structure:

| GDT | | Cat. | Object Class | Property | Representation/ Association | Type | Type Name | Len. | Card. |
|---|---|---|---|---|---|---|---|---|---|
| InventoryReplenishment-ConditionCode | | | Inventory Replenishment | Condition | Code | CDT | Code | 1..2 | |
| | listAgencyID | A | Code List Agency | Identification | Identifier | xsd | token | | 0..1 |
| | listVersionID | A | Code List | Version | Identifier | xsd | token | | 0..1 |
| | listAgency-SchemeID | A | Code List Agency | Scheme | Identifier | xsd | token | | 0..1 |
| | listAgency-Scheme-AgencyID | A | Code List Agency | Scheme Agency | Identifier | xsd | token | | 0..1 |

The data type GDT InventoryReplenishmentConditionCode may assign one static code list to the code. The attributes may be assigned the following values: listID="10220". The data type GDT InventoryReplenishmentConditionCode may use the following codes:

For GDT InventoryReplenishmentConditionCode, a customer-specific code list can be assigned to the code. A listID can be "10220." If the code list is unchanged, a listAgencyID can be "310." Otherwise, a listAgencyID can be the ID of the customer (e.g., ID from DE 3055, if listed there). A listVersionID can be the version of the particular code list (e.g., assigned and managed by the customer). A listAgencySchemeID can be the ID of the scheme if the listAgencyID does not come from DE 3055. The listAgencySchemeAgencyID can be the ID of the organization from DE 3055 that manages the listAgencySchemeID scheme. InventoryReplenishmentConditionCode can be used to determine whether inventory replenishment is required by assigning the relevant inventory replenishment condition to a storage behaviour method.

Storage behaviour method can be defined by a set of inventory level control rules. There are two kinds of inventory level control rules: replenishment rules and cleanup rules. A replenishment rule is made up of a set of inventory replenishment conditions and an execution method. A replenishment rule defines how inventory should be replenished when certain inventory replenishment conditions are met.

The GDT InventoryLevelControlRuleTypeCode can include the following semantic codes: ForseenOutbound Inventory Quantity (e.g., "CurrentReplenishmentLeadTime*ConsumptionRate<Threshold"), Physical inventory quantity minus foreseen outbound inventory quantity is less than a given threshold.

The data type InventoryLevelControlRuleTypeCode may use the following codes: 1 (i.e., Current Inventory Quantity), 2 (i.e., Expected Inventory Quantity).

InventoryResponsibleOrganisationalUnitTypeCode

A InventoryResponsibleOrganisationalUnitTypeCode is the coded representation of the type of an organizational unit that is responsible for an inventory. An inventory is the quantity of all materials at a location with their reservations for consumers. An example of GDT InventoryResponsibleOrganisationalUnitTypeCode is:

<InventoryResponsibleOrganisationalUnitTypeCode>1</InventoryResponsibleOrganisationalUnitTypeCode>

In certain implementations, GDT InventoryResponsibleOrganisationalUnitTypeCode may have the following structure:

| GDT | Object Class | Property | Representation/ Association | Type | Type Name | Len. | Card. | Remarks |
|---|---|---|---|---|---|---|---|---|
| InventoryResponsibleOrganisational-UnitTypeCode | Inventory | Responsible Organisational Unit Type | Code | CDT | Code | 1 | 1 | Restricted |

The data type GDT InventoryResponsibleOrganisationalUnitTypeCode may assign a code. The attributes may be assigned the following values: listID=10080 and listAgencyID=310. A listVersionID can be the version of the particular code list (e.g., assigned and managed by the customer).

The InventoryResponsibleOrganisationalUnitTypeCode is a code list. The attributes, listID, listAgencyID, listVersionID may be missing from the structure as they have constant values at the run time.

This code list is typically defined and delivered to a customer. In generally, customers do not change this code list. The InventoryResponsibleOrganisationalUnitTypeCode defines the organizational unit responsible for inventory management in more detail.

For the InventoryResponsibleOrganisationalUnitTypeCode, the Site is the highest level of the hierarchy. The Logistics Division can exist below a Site. The LogisticsArea can exist either below a LogisticsDivision or another LogisticsArea. The Resource can exist either below a Logistics Division or a Logistics Area.

The data type GDT InventoryResponsibleOrganisationalUnitTypeCode may use the following codes: 1 (i.e., Site), 2 (i.e., LogisticsDivision), 3 (i.e., LogisticsArea), 4 (i.e., Resource).

InventorySourceLocationSearchMethodCode

An InventorySourceLocationSearchMethodCode is a coded representation of a search method for determining a source location (e.g. Logistics area or a resource) for inventory retrieval. A GDT InventorySourceLocationSearchMethodCode can be used as an analytical method which can assign a specific level of importance to an object (e.g. customers, suppliers, products) with respect to a specific criteria (e.g., business, volume, profit, purchasing volume). An example of GDT InventorySourceLocationSearchMethodCode is:

<SearchMethodCode listAgencyID=6>1</SearchMethodCode>

In certain implementations, GDT InventorySourceLocation-SearchMethodCode may have the following structure:

| GDT | | Cat. | Object Class | Property | Representation/ Association | Type | Type Name | Len. | Card. |
|---|---|---|---|---|---|---|---|---|---|
| InventorySource LocationSearch-MethodCode | | | Inventory Source Location | Search Method | Code | CDT | Code | 1..2 | |
| | listID | A | Code List | Identification | Identifier | xsd | token | | 0..1 |
| | listAgencyID | A | Code List Agency | Identification | Identifier | xsd | token | | 0..1 |
| | listVersionID | A | Code List | Version | Identifier | xsd | token | | 0..1 |
| | listAgency-SchemeID | A | Code List Agency | Scheme | Identifier | xsd | token | | 0..1 |
| | listAgency-Scheme-AgencyID | A | Code List Agency | Scheme Agency | Identifier | xsd | token | | 0..1 |

For data type GDT InventorySourceLocation-SearchMethodCode, a customer-specific code list can be assigned to the code. A list ID can be "10213." If the code list is unchanged, a listAgencyID can be "310." Otherwise a listAgencyID can be the ID of the customer (e.g., ID from DE 3055, if listed there). A listVersionID can be the version of the particular code list (e.g., assigned and managed by the customer). A listAgencySchemeID can be the ID of the scheme if the listAgencyID does not come from DE 3055. The listAgencySchemeAgencyID can be the ID of the organization from DE 3055 that manages the listAgencySchemeID scheme.

InventoryTypeCode

An InventoryTypeCode is a coded representation of a type of an inventory. An Inventory is a quantity of all materials in a certain location including material reservations at this location. An example of GDT InventoryTypeCode is:

<InventoryTypeCode>1</InventoryTypeCode>

In certain implementations, GDT InventoryTypeCode may have the following structure:

| GDT | Object Class | Property | Representation/ Association | Type | Type Name | Len. | Card. | Remarks |
|---|---|---|---|---|---|---|---|---|
| InventoryTypeCode | Inventory | Type | Code | CDT | Code | 1 | 1 | Restricted |

The data type GDT InventoryTypeCode may assign one static code list to the code. The attributes may be assigned the following values: listID=10418 and listAgencyID=310. The data type GDT InventoryType Control may use the following codes: 1 (i.e., Location), 2 (i.e., LogisticsArea), and 3 (i.e., Resource).

InventoryUniformityCode

An InventoryUniformityCode is a coded representation of the uniformity of inventory. An example of GDT InventoryUniformityCode is:

<InventoryUniformityCode>1</InventoryUniformityCode>

In certain implementations, GDT InventoryUniformityCode may have the following structure:

| GDT | | Cat. | Object Class | Property | Representation/ Association | Type | Type Name | Len. | Card. | Remarks |
|---|---|---|---|---|---|---|---|---|---|---|
| Inventory Uniformity Code | | | Inventory | Uniform-ity | Code | CDT | Code | 1..2 | | restricted |
| | listID | A | Code List | Identific-ation | Identifier | xsd | token | | 0..1 | |
| | listAgencyID | A | Code List Agency | Identific-ation | Identifier | xsd | token | | 0..1 | |
| | listVersionID | A | Code List | Version | Identifier | xsd | token | | 0..1 | |
| | listAgency-SchemeID | A | Code List Agency | Scheme | Identifier | xsd | token | | 0..1 | |
| | listAgency-Scheme-AgencyID | A | Code List Agency | Scheme Agency | Identifier | xsd | token | | 0..1 | |

An extensible code list is assigned to the InventoryUniformityCode. A customer can change this code list.

For GDT InventoryUniformityCode, a customer-specific code list can be assigned to the code. A listID can be 10242. If the code list is unchanged, a listAgencyID can be "310." Otherwise a listAgencyID can be the ID of the customer (e.g., ID from DE 3055, if listed there). A listVersionID can be the version of the particular code list (e.g., assigned and managed by the customer). A listAgencySchemeID can be the ID of the scheme if the listAgencyID does not come from DE 3055. The listAgencySchemeID can be the ID of the organization from DE 3055 that manages the listAgencySchemeID scheme.

The inventory uniformity can be specified for a Storage Behaviour Method, which is a set of rules that defines the manner in which a storage location is managed. Storage Locations can be referenced via the Storage Control dependent object to a Storage Behaviour Method BO. The stock stored in those storage locations can be maintained according to the defined uniformity.

The InventoryUniformityCode can be used to define the degree of inventory uniformity that needs to be maintained when storing stock in a specific storage location. Inventory uniformity enforces the relative uniformity of inventory required in a storage location. Uniformity can be checked before storing stock and helps to prevent non-permitted mixing of inventory.

For example, the inventory uniformity "Material" indicates that the location can hold only one type of material and the inventory uniformity "CountryofOrigin" indicates that the location can only hold inventory from one Country of Origin.

The data type InventoryUniformityCode may use the following codes: 1 (i.e., Material), 2 (i.e., Batch), 3 (i.e., InventoryUsabilityStatus), 4, (i.e., Expiration Date), 5, (i.e., Logistics Unit), 6, (i.e., ProductCategory).

InventoryUsabilityCode

An InventoryUsabilityCode is a coded representation of the usability of a warehouse inventory for company-specific business processes. An example of GDT InventoryUsabilityCode is:

<InventoryUsabilityCode>1</InventoryUsabilityCode>

In certain implementations, GDT InventoryUsabilityCode may have the following structure:

| GDT | Object Class | Representation/ Association | Type | Type Name | Len. | Remarks |
|---|---|---|---|---|---|---|
| InventoryUsabilityCode | InventoryUsability | Code | CDT | Code | 2 | restricted |

The data type GDT InventoryUsabilityCode may assign a code list to the code. The attributes may be assigned the following list values: listID="10029," listAgencyID="310" and listVersionID can be the version of the particular code list.

The usage can be clarified using a concrete business process as an example: At a goods receipt for a purchase order, the InventoryUsabilityCode "quality inspection" can be assigned to the stock delivered since Quality Control may inspect the quality of the received stock. Depending on this inspection, parts of the stock can then be posted to the InventoryUsabilityCode "unrestricted use" or "blocked".

The InventoryUsabilityCode can be used for transmitting stock changes from Inventory Management to Accounting and to Logistics Planning. Different InventoryUsabilityCodes can cause a different stock valuation in Accounting and can be handled differently in planning.

The GDT is similar to the R/3 stock type. The GDT is equivalent to the LIME stock category. The InventoryUsabilityCode is a proprietary code list with fixed predefined values. Changes to the permitted values involve changes to the interface. In certain implementations, the UN/EDIFACT InventoryTypeCode (Element 7491) is not be used, because the meaning of the type codes does not correspond to the proper type codes.

The data type GDT InventoryUsabilityCode may use the following codes: 1, (i.e., unrestricted use), 2, (i.e., blocked), 3, (i.e., quality inspection).

InventoryValuationLevelCode

An InventoryValuationLevelCode is the coded representation of the valuation level of a material inventory. A valuation level for material inventories is a set of criteria based on which material inventories are differentiated for inventory valuation in Accounting. These criteria define the level of detail of inventory valuation, such as whether valuation takes place at the level of the production center (more detailed) or at the level of the permanent establishment (less detailed). An example of InventoryValuationLevelCode is:

<InventoryValuationLevelCode>1</InventoryValuation-LevelCode>

In certain implementations, GDT InventoryValuationLevelCode may have the following structure:

| GDT | Object Class | Representation/ Association | Type | Type Name | Len. | Remarks |
|---|---|---|---|---|---|---|
| InventoryValuation-LevelCode | Inventory-ValuationLevel | Code | CDT | Code | 1..3 | restricted |

The data type GDT InventoryValuationLevelCode may assign one static code list to the code.

The attributes may be assigned the following values: listID="10266", listAgencyID="310", and listVersionID can be the version of the relevant code list.

The data type GDT InventoryValuationLevel Code may use the code: 1 (i.e., Material/Permanent Establishment).

InventoryValuationProcedureCode

An InventoryValuationProcedureCode is the coded representation of a valuation procedure for an inventory. An inventory valuation procedure is a procedure that determines the monetary value of an inventory. This procedure describes the influence of a business transaction on the inventory value and consequently on the calculation of the inventory price. An example of a GDT InventoryValuationProcedureCode is:

<InventoryValuationProcedureCode>1</InventoryValuationProcedureCode>

In certain implementations, GDT InventoryValuationProcedureCode may have the following structure:

| GDT | Object Class | Representation/ Association | Type | Type Name | Len. |
|---|---|---|---|---|---|
| Inventory Valuation-ProcedureCode | Inventory Valuation-Procedure | Code | CDT | Code | 1..3 |

The data type GDT InventoryValuationProcedureCode may assign one static code list to the code. The attributes may be assigned the following values: listID="10054", listAgencyID="310", and listVersionID—Version of the code list.

The data type GDT InventoryValuationProcedureCode may use the following codes: 1, (i.e., Standard Price), and 2 (i.e., Moving Average Price).

InvoicingBlockingReasonCode

An InvoicingBlockingReasonCode is the coded representation of the reason for blocking an invoicing process. An invoicing process serves to create an invoice for a business transaction document, such as a sales order, for example. An example of GDT InvoicingBlockingReasonCode is:

<InvoicingBlockingReasonCode>1</InvoicingBlockingReasonCode>

In certain implementations, GDT InvoicingBlockingReasonCode may have the following structure:

| GDT | Object Class | Property | Representation/ Association | Type | Type Name | Len. | Remarks |
|---|---|---|---|---|---|---|---|
| Invoicing-Blocking-ReasonCode | Invoicing | Blocking Reason | Code | CDT | Code | 1..2 | Restricted |

For GDT InvoicingBlockingReasonCode, a customer-specific code list can be assigned to the code. A listID can be "10496". If the code list is unchanged, a listAgencyID can be "310." Otherwise, a listAgencyID can be the ID of the customer (e.g., ID from DE 3055, if listed there). A listVersionID can be the version of the particular code list (e.g., assigned and managed by the customer). A listAgencySchemeID can be the ID of the scheme if the listAgencyID does not come from DE 3055. The listAgencySchemeAgencyID can be the ID of the organization from DE 3055 that manages the listAgencySchemeID scheme.

In reference to the data type GDT InventoryBlockingReasonCode, a user-specific code list is assigned to the code. A user of the code determines the codes in the code list during configuration. InvoicingBlockingReasonCode is used, for example, in sales order processing in CRM in order to block and then explain the invoice blocking of a sales order. Examples of customer-specific code semantics can include pricing is missing, prices are incomplete, and check terms of payment.

IssueCategoryCatalogueTypeCode

An IssueCategoryCatalogueTypeCode is the coded representation for the type of issue category catalog that provides the semantic relationship for issue categories that are contained in the catalog. An issue category catalogue is a structured directory of issue categories that describe business cases from an objective or a subjective point of view. An example of GDT IssueCategoryCatalogueTypeCode is:

<IssueCategoryCatalogueTypeCode>A</IssueCategoryCatalogueTypeCode>

In certain implementations, GDT IssueCategoryCatalogueTypeCode may have the following structure:

| GDT | Object Class | Property | Representation/ Association | Type | Type Name | Len. | Remarks |
|---|---|---|---|---|---|---|---|
| IssueCategory-Catalogue-TypeCode | Issue Category Cata-logue | Type | Code | CDT | Code | 1 | restricted |

The data type GDT IssueCategoryCatalogueTypeCode may assign one static code list to the code. The attributes may be assigned the following values: listID="10227", listAgencyID="310", and listVersionID can be the version of the relevant code list.

Using the IssueCategoryCatalogueTypeCode a distinction is made as to whether the semantics of the categories is hierarchically structured, or structured according to attributes. A hierarchical semantics distinguishes itself by the fact that each category in itself already can completely describes an issue. Subordinate categories merely represent the context for each issue. In this way, each category has a maximum of one higher-level category. For example, the category Foodstuffs could have subordinate categories of food packaging and food flavor. The category Food Packaging could have categories of sturdy food packaging and non-sturdy food packaging. The category Food Flavor could have categories of flavorsome food and non-flavorsome food.

In the case of an attributive semantics, each category provides a characteristic of the issue, without which the issue description can be incomplete. The description of an issue results from a combination of several categories. Such a combination corresponds to a path in the category hierarchy. Common characteristics of different issues are depicted as semantically identical categories.

For example, the category Foodstuffs could have categories of Packaging and Taste. The category Packaging could have characteristics such as Praise, Complaint, and Environment-friendliness. The category Taste could have characteristics such as Praise, Complaint, and Change.

A hierarchical semantics can be understood as a specific case of an attributive semantics. The differentiation between hierarchical semantics and attributive semantics can occur in order to be able to provide the most efficient data-technical conversion.

The data type IssueCategoryCatalogueTypeCode may use the following codes: A (i.e., Hierarchical) and B, (i.e., Attributive). The IssueCategoryCatalogueTypeCode may be qualified as QualityIssueCategoryCatalogueTypeCode (i.e., type of an issue category catalog with categories that describe quality-related issues based on different quality aspects) and ServiceIssueCategoryCatalogueTypeCode (i.e., type of an issue category catalog with categories that describe business events in Customer Service from an objective or a subjective point of view).

KanbanCardID

A KanbanCardID is a unique identifier of a kanban card. A kanban card is a reusable card with which a production area requests material “just-in-time” from a supplying location in the context of production and material flow control. (Kanban is the Japanese word for “card”.) An example of CDT KanbanCardID is:

<KanbanCardID schemeAgencyID=“MPL__002”>4711</Kanban CardID>

In certain implementations, CDT KanbanCardID may have the following structure:

| CDT | | Cat. | Object Class | Property | Representation/ Association | Type | Type Name | Len. | Card. | Remarks |
|---|---|---|---|---|---|---|---|---|---|---|
| Kanban CardID | | | Kanban Card | Identi-fication | Identifier | CDT | Identi-fier | 1..10 | | restricted |
| | scheme-AgencyID | A | Identification Scheme Agency | | Identifier | xsd | Token | 1..60 | 0..1 | Optional |

KanbanCardID is an alphanumeric identifier (with no distinction between uppercase and lowercase) that is compliant with the rules defined for xsd:token.

The data type CDT KanbanCard ID may use the following codes: schemeAgencyID, (i.e., Business System, which issued the ID). KanbanCardIDs are used, for example, in purchase orders and forecast delivery schedules that have been generated within the context of kanban-based replenishment control.

KeyStoreEntryID

A KeyStoreEntryID is an identifier for an entry in a key store. A key store is a secure area to store security information such as private keys for digital signatures, public keys for encryption, and certificates of trusted certification authorities. These objects are referred to as key store entries. An example of GDT KeyStoreEntryID is:

<KeyStoreEntryID>SIG0001</KeyStoreEntryID>

In certain implementations, GDT KeyStoreEntryID may have the following structure:

| GDT | Object Class | Property | Representation/ Association | Type | Type Name | Len. | Remarks |
|---|---|---|---|---|---|---|---|
| KeyStoreEntryID | Key Store Entry | Identification | Identifier | CDT | Identifier | 1..255 | restricted |

KeyStoreEntryID is unique in the context of a key store only (see GDT KeyStoreID). A public or private key can be identified by the key store ID and the key store entry ID.

KeyStoreID

A KeyStoreID is an identifier for a key store. A key store is a secure area to store security information such as public and private keys for digital signatures and encryption or certificates of trusted certification authorities. An example of GDT KeyStoreID is:

<KeyStoreID schemeAgencyID=“SYS__0001”>COMP0001</KeyStoreID>

In certain implementations, GDT KeyStoreID may have the following structure:

| GDT | | Cat. | Object Class | Property | Representation/ Association | Type | Type Name | Len. | Card. | Remarks |
|---|---|---|---|---|---|---|---|---|---|---|
| Key-Store ID | | | Key Store | Identification | Identifier | CDT | Identifier | 1..255 | | restricted |
| | scheme-Agency-ID | A | Identification Scheme Agency | Identification | Identifier | xsd | token | 1..60 | 0..1 | |

The values of the attributes of KeyStoreID are assigned as follows: schemeID=KeyStoreID. The GDT KeyStoreID may use the following code: schemeAgencyID, Business System, which issued the ID.

A public or private key can be identified by the key store ID and the key store entry ID (e.g., see GDT KeyStoreEntryID). For example 1n a Netweaver System, a user can distinguish (logical) key stores as so called Keystore Views. These can be identified by GDT KeyStoreID.

KeyWordsText

A KeyWordsText is additional information that is stored for an object and is only used as an additional search criterion during the search for this object. An example of GDT KeyWordsText is:

<KeyWordsText>XYZ_ROT</KeyWordsText>

In certain implementations, GDT KeyWordsText may have the following structure:

| GDT | Property | Rep./ Ass. | Type | Type Name | Len. | Card. |
|---|---|---|---|---|---|---|
| KeyWordsText | Key Words | Text | GDT | Text | 1..20 | 1 |

The complete content of KeyWordsText may be written in capital letters. KeyWordsText is, for example, used in addresses and business partners for specifying additional information that is not maintained in any other field and that is only relevant in the search for the address or business partner.

The following dictionary objects may be assigned to this GDT: Data element (e.g., AD_SORT1), Domain (e.g., C4AR20).

KnowledgeBaseArticleID

A KnowledgeBaseArticleID is a unique identifier for a KnowledgeBaseArticle. A Knowledge Base Article is an entity with contents acquired from experts or accumulated from previous business practices/experiences. Knowledge Base Articles are contained in a Knowledge Base. A Knowledge Base is a special type of data base for Knowledge Management. An example of GDT KnowledgeBaseArticleID is:

<CustomerProblemAndSolutionID>10000012</CustomerProblemAndSolutionID>

In certain implementations, GDT KnowledgeBaseArticleID may have the following structure:

| GDT | | Cat. | Object Class | Property | Representation/ Association | Type | Type Name | Len. | Card. | Remarks |
|---|---|---|---|---|---|---|---|---|---|---|
| Knowledge-Base-ArticleID | | | Knowledge BaseArticle | Identification | Identifier | CDT | Identifier | 1..10 | | restricted |
| | schemeID | A | Identification Scheme | Identification | Identifier | xsd | token | 1..60 | 0..1 | |
| | scheme-Version-ID | A | Identification Scheme | Version | Identifier | xsd | token | 1..15 | 0..1 | |
| | scheme-Agency ID | A | Identification Scheme Agency | Identification | Identifier | xsd | token | 1..60 | 0..1 | |
| | scheme-Agency-Scheme-ID | A | Identification Scheme Agency | Scheme | Identifier | xsd | token | 1..60 | 0..1 | |
| | scheme-Agency-Scheme-Agency ID | A | Identification Scheme Agency | Scheme Agency | Identifier | xsd | token | 3 | 0..1 | |

SchemeID is the ID of the ID scheme. It is released and maintained by the responsible organization of the ID scheme. The GDT owner may retrieve the correct ID from the responsible organization. If there is no unique ID available, the name of the identifier or identifier type may be entered, which is used in the corresponding standard, specification, or scheme of the responsible organization.

SchemeVersionID is the Version of the ID scheme. It is released and maintained by the organization, which is named in schemeAgencyID. The owner may retrieve the relevant version ID from the responsible organization. If there is no version for the ID scheme, the version of the standard, the specification, or the scheme is used.

SchemeAgencyID is the ID of the organization maintaining the ID scheme. This identification is released by an organization contained in DE 3055 (e.g., DUNS, EAN . . . ). The GDT owner may retrieve the correct ID from the responsible organization. SchemeAgencySchemeID is the identification of the schema which identifies the organization named in schemeAgencyID. It's a certain scheme ID of partners, companies, members etc. (e.g., DUNS+4) of an organization named in schemeAgencySchemeAgencyID (Bsp. EAN, DUNS, SWIFT, etc.)

SchemeAgencySchemeAgencyID is the identification of the maintaining organization (e.g., DUNS, EAN, SWIFT, etc.) which is responsible for the identification of the organization named in schemeAgencyID. The organization may be contained in DE 3055.

KnowledgeBaseArticleProcessingTypeCode

A KnowledgeBaseArticleProcessingTypeCode is the coded representation of the way in which a Knowledge Base Article is processed. A Knowledge Base Article is an entity with contents acquired from experts or accumulated from previous business practices/experiences. The Knowledge Base Articles are contained in a Knowledge Base. A Knowledge Base is a special data base for Knowledge Management. An example of GDT KnowledgeBaseArticleProcessingTypeCode is:

<KnowledgeBaseArticleProcessingTypeCode>1 </KnowledgeBaseArticleProcessingTypeCode>

In certain implementations, GDT KnowledgeBaseArticleProcessingType Code may have the following structure:

A KnowledgeBaseArticleProcessingTypeCode can refer to a single KnowledgeBaseArticleTypeCode.

The KnowledgeBaseArticleProcessingTypeCode can be used to control the methods of processing and the internal behaviour of a Knowledge Base Article (whose type is given by the KnowledgeBaseArticleTypeCode). Dependent on the KnowledgeBaseArticleProcessingTypeCode for instance a partner profile, different text types, or whether an approval process is required or not can be specified by the customer. For example, ApprovalRequired KnowledgeBaseArticle requires the approval process and has the available approving persons specified in a partner profile and NoApprovalRequired KnowledgeBaseArticle requires no approval or translation and contains only a simple text type to enter one long text.

The GDT KnowledgeBaseArticleProcessingTypeCode has been defined analogously to the GDT BusinessTransactionDocumentProcessingTypeCode. There is also a GDT KnowledgeBaseArticleTypeCode analogously to the GDT BusinessTransactionDocumentTypeCode. The corresponding GDTs for knowledge base articles and business transaction documents are used for comparable business purposes. The same integrity condition which has been described in Section Integrity Conditions also exists between BusinessTransactionDocumentProcessingTypeCode and BusinessTransactionDocumentTypeCode. Although KnowledgeBaseArticles are master data, the processing is of the same quality as for the BusinessTransactionDocuments.

| GDT | | Cat. | Object Class | Property | Representation/ Association | Type | Type Name | Len. | Card. | Remarks |
|---|---|---|---|---|---|---|---|---|---|---|
| Knowledge-BaseArticle-Processing-Type-Code | | | Knowledge Base Article | Processing Type | Code | CDT | Code | 1..4 | | restricted |
| | listID | A | Code List | Identification | Identifier | xsd | token | | 0..1 | |
| | listAgency-ID | A | Code List Agency | Identification | Identifier | xsd | token | | 0..1 | |
| | listVersion-ID | A | Code List | Version | Identifier | xsd | token | | 0..1 | |
| | listAgency SchemeID | A | Code List Agency | Scheme | Identifier | xsd | token | | 0..1 | |
| | listAgency Scheme AgencyID | A | Code List Agency | Scheme Agency | Identifier | xsd | token | | 0..1 | |

For GDT KnowledgeBaseArticleProcessingTypeCode, a customer-specific code list can be assigned to the case. A listID can be "10268". If the code list is unchanged, a listAgencyID can be "310." Otherwise, a listAgencyID can be the ID of the customer (e.g., ID from DE 3055, if listed there). A listVersionID can be the version of the particular code list (e.g., assigned and managed by the customer). A listAgencySchemeID can be the ID of the scheme if the listAgencyID does not come from DE 3055. The listAgencySchemeAgencyID can be the ID of the organization from DE 3055 that manages the listAgencySchemeID scheme.

LabourDisputesCouncilElectionEmployeeGroupCode

A LabourDisputesCouncilElectionEmployeeGroupCode is a coded representation of a group of employees which are treated equally in an election of the Labor Disputes Council. An example of GDT LaborDisputesCouncilElectionEmployeeGroupCode is:

<LabourDisputesCouncilElectionEmployeeGroupCode> E</LabourDisputesCouncilElectionEmployeeGroupCode>

In certain implementations, GDT LabourDisputesCouncilElectionEmployeeGroupCode may have the following structure:

| GDT | Cat. | Object Class | Property | Representation/ Association | Type | Type Name | Len. | Card. | Remarks |
|---|---|---|---|---|---|---|---|---|---|
| LabourDisputesCouncilElection- | | Labour Disputes Council | | Code | CDT | Code | 1 | | Restricted |

-continued

| GDT | | Cat. | Object Class | Property | Representation/ Association | Type | Type Name | Len. | Card. | Remarks |
|---|---|---|---|---|---|---|---|---|---|---|
| Employee-GroupCode | | | Election Employee Group | | | | | | | |
| | listID | A | Code List | Identification | Identifier | Xsd | token | | 0..1 | |
| | list AgencyID | A | Code List Agency | Identification | Identifier | Xsd | token | | 0..1 | |
| | list VersionID | A | Code List | Version | Identifier | Xsd | token | | 0..1 | |
| | list Agency SchemeID | A | Code List Agency | Scheme | Identifier | Xsd | token | | 0..1 | |
| | list Agency-Scheme AgencyID | A | Code List Agency | Scheme Agency | Identifier | Xsd | token | | 0..1 | |

For GDT LabourDisputesCouncilElectionEmployeeGroupCode, a customer-specific code list can be assigned to the code. A listID can be "22801". If the code list is unchanged, a listAgencyID can be "310." Otherwise, a listAgencyID can be the ID of the customer (e.g., ID from DE 3055, if listed there). A listVersionID can be the version of the particular code list (e.g., assigned and managed by the customer). A listAgencySchemeID can be the ID of the scheme if the listAgencyID does not come from DE 3055. The listAgencySchemeAgencyID can be the ID of the organization from DE 3055 that manages the listAgencySchemeID scheme.

This code is used to determine the electoral group to which the employee belongs in the election of the labour disputes council in France. This code will determinate if the employee will be eligible as candidate in the group that will represent the employer or in the group that will represent the employees in this particular Election.

The data type GDT LabourDisputesCouncilElectionEmployeeGroupCode may use the following codes: E, (e.g., Employer, the group that represents the Employer in the Election of the Labor Disputes Council), and S, (e.g., the group that represents the Employees in the Election of the Labor Disputes Council).

LabourDisputesCouncilElectionEmployeeGroupCodeContextElements

The LabourDisputesCouncilElectionEmployeeGroupCodeContextElements can define a dependency or an environment in which the LabourDisputesCouncilElectionEmployeeGroupCode appears. The environment is described by context categories. With the context categories in LabourDisputesCouncilElectionEmployeeGroupCodeContextElements the valid portion of code values of LabourDisputesCouncilElectionEmployeeGroupCode is restricted according to an environment during use.

In certain implementations, GDT LabourDisputesCouncilElectionEmployeeGroupCode may have the following structure:

| GDT | | Cat. | Object Class | Property | Representation/ Association | Type | Type Name | Card. |
|---|---|---|---|---|---|---|---|---|
| LabourDisputesCouncilElection-Employee-GroupCode-ContextElements | | | Labour Disputes Council Election Employee Group Code Context Elements | | Details | | | |
| | Country Code | E | Labour Disputes Council Election Employee Group Code Context Elements | Country | Code | GDT | Country Code | 0..1 |

The CountryCode context category defines the context country. It determines the valid code values for a specific country.

LabourDisputesCouncilElectionEmployeeSubgroupCode

A LabourDisputesCouncilElectionEmployeeSubgroupCode is a coded representation of a subgroup of Labour Disputes Council Election Employee group, which are treated equally in an election of the Labor Disputes Council. An example of GDT LabourDisputesCouncilElectionEmployeeSubgroupCode is:

<LabourDisputesCouncilElectionEmployeeSubgroupCode>A</LabourDisputesCouncilElectionEmployeeSubgroupCode>

In certain implementations, GDT LabourDisputesCouncilElectionEmployeeSubgroupCode may have the following structure:

| GDT | | Cat. | Object Class | Property | Representaion/ Association | Type | Type Name | Len. | Card. | Remarks |
|---|---|---|---|---|---|---|---|---|---|---|
| Labour-Disputes-Council-Election-Employee-Subgroup Code | | | Labour Disputes Council Election Employee Subgroup | | Code | CDT | Code | 1 | | Restricted |
| | listID | A | Code List | Identification | Identifier | xsd | token | | 0..1 | |
| | listAgencyID | A | Code List Agency | Identification | Identifier | xsd | token | | 0..1 | |
| | listVersionID | A | Code List | Version | Identifier | xsd | token | | 0..1 | |
| | listAgency-SchemeID | A | Code List Agency | Scheme | Identifier | xsd | token | | 0..1 | |
| | listAgency-Scheme-AgeneyID | A | Code List Agency | Scheme Agency | Identifier | xsd | token | | 0..1 | |

For GDT LabourDisputesCouncilElectionEmployeeSubgroupCode, a customer-specific code list can be assigned to the code. A listID can be "22901". If the code list is unchanged, a listAgencyID can be "310." Otherwise, a listAgencyID can be the ID of the customer (e.g., ID from DE 3055, if listed there). A listVersionID can be the version of the particular code list (e.g., assigned and managed by the customer). A listAgencySchemeID can be the ID of the scheme if the listAgencyID does not come from DE 3055. The listAgencySchemeAgencyID can be the ID of the organization from DE 3055 that manages the listAgencySchemeID scheme. Several extensible, country-specific code lists, which are different at runtime, are assigned to the code. A user of this code can replace these code list with this one.

This code is used to determine the subgroup of the electoral group to which the employee belongs in the election of the labour disputes council in France. This code will determine in which subgroup the employee will be eligible as candidate in this particular Election.

The data type GDT LabourDisputesCouncilElectionEmployeeSubgroupCode Code List may use the following codes: A, (e.g., Agriculture, the subgroup of employees working in agriculture), D, (e.g., Other activities, the subgroup of employees working in other activities), C, (e.g., Commerce, the subgroup of employees working in commerce), 1, (e.g., Industry, the sub-group of employees working in industry), and E, (e.g., Management, the subgroup of employees working in management).

LabourDisputesCouncilElectionEmployeeSubgroupCodeContextElements

The LabourDisputesCouncilElectionEmployeeSubgroupCodeContextElements define a dependency or an environment in which the LabourDisputesCouncilElectionEmployeeSubgroupCode appears. The environment is described by context categories. With the context categories in LabourDisputesCouncilElectionEmployeeSubgroupCodeContextElements the valid portion of code values of LabourDisputesCouncilElectionEmployeeSubgroupCode is restricted according to an environment during use.

In certain implementations, GDT LabourDisputesCouncilElectionEmployeeSubgroupCodeContextElements may have the following structure:

| GDT | | Cat. | Object Class | Property | Representation/ Association | Type | Type Name | Card. |
|---|---|---|---|---|---|---|---|---|
| LabourDisputes-CouncilElection-EmployeeSub-groupCodeCon-textElements | | | Labour Disputes Council Election Employee Subgroup Code Context Elements | | Details | | | |
| | CountryCode | E | Labour Disputes Council Election Employee Sub-group Code Context Elements | Country | Code | GDT | CountryCode | 0..1 |

The CountryCode context category defines the context country. It determines the valid code values for a specific country.

LanguageCode

The LanguageCode is a coded representation for the language. An example of GDT LanguageCode is:

<OrderLanguageCode>de</OrderLanguageCode>

In certain implementations, GDT LanguageCode may have the following structure: "LanguageCode" is from the Core Component Type "Code".

| GDT | Object Class | Property Term | Representation | Type | Type Name | Length |
|---|---|---|---|---|---|---|
| Language-Code | Language | Identification | Code | xsd | language | 2..9 |

LanguageCode is based on the W3C "built-in" data type xsd:language. The language code of LanguageCode can be represented according to IETF RFC 3066. RFC 3066 includes two parts: a primary language code and a series of sub-codes.

The primary language code can be an ISO 639-1-compliant (ISO 639:1988) two-character code or an ISO 639-2-compliant (ISO 639:1998) three-character code. If the language code is to occur in both standards, the two-character language code (ISO 639-1) may be used.

The sub-codes can be used for differentiating the language according to special criteria or for different dialects within a single country. If the ISO 639-1 or 639-2-compliant codes are not sufficient, the ISO 3166-1-compliant two-character code is usually used as the first sub-code. Regional differences in a language within a single country can be defined by using the second ISO 3116-2-compliant two-character sub-code "Country Subdivision Code". A LanguageCode is represented as follows:

| | |
|---|---|
| aa | Example: en |
| anm | Example: enm |
| aa-CC | Example: en-US |
| aaa-CC | Example: enm-US |
| aa-CC-RR | Example: en-US-TX |
| aaa-CC-RR | Example: enm-US-TX |

The literals have the follow meaning: aa/aaa represents ISO 639-1 or ISO 639-2-compliant language code, CC represents ISO 3166-1-compliant country code, RR represents ISO 3166-2-compliant "Country Subdivision Code."

LanguageCode is used to identify the language for business documents or business partners. Furthermore, it enables a business partner to request a particular language (for example, Requested.LanguageCode).

RFC 3066 has been available since January 2001 and replaces RFC 1766. RFC 3066 completely covers all RFC 1766 conventions. RFC 3066 also provides the option of using the ISO 639-2-compliant three-character country code for special languages or for differentiating between languages.

RFC 3066 permits many more options. For example, use of IANA (Internal Assigned Numbers Authority [RFC 2860]) or differentiating between different dialects using sub-codes. However, in the case of business information, it is enough to differentiate between the languages and the possible language variations in the individual countries.

Furthermore, there is a difference between inbound and outbound in the implementation of "LanguageCode". For example, Outbound may include Mapping from the language key to the ISO 639-1-compliant two-character ISO language code always occurs without language differentiation. Inbound means most applications work internally with the language key. These applications only support the ISO 639-1-compliant two-character language code without a sub-code. All other language codes may be mapped to ISO 639-1 for these applications; otherwise an error can occur during inbound processing. For a conversion of the XML representation into the internal format methods are provided by the ABAP class CL_GDT_CONVERSION.

REGIONDEPENDEN_LanguageCode

A REGIONDEPENDENT_LanguageCode is a coded representation for the language with additional optional information about the country and the region (locale). An example of REGIONDEPENDENT_LanguageCode is:

<RegionLanguageCode>en-US-TX</RegionLanguage-Code>

In certain implementations, the GDT REGIONDEPENDENT_LanguageCode may have the following structure:

| GDT | Rep./Ass. Qual. | Rep./Ass. | Type | Type Name | Len. |
|---|---|---|---|---|---|
| REGION-DEPENDENT_LanguageCode | REGION-DEPENDENT_ | Language-Code | GDT | Language-Code | 2..9 |

_REGIONDEPENDENT_LanguageCode is based on the W3C "built-in" data type xsd:language.

The language code of _REGIONDEPENDENT_LanguageCode is represented according to IETF RFC 3066.

RFC 3066 includes two parts: a primary language code and a series of sub-codes. The primary language code can be an ISO 639-1-compliant (ISO 639:1988) two-character code or an ISO 639-2-compliant (ISO 639:1998) three-character code. If the language code is to occur in both standards, the two-character language code (ISO 639-1) may be used.

The sub-codes can be used for differentiating the language according to special criteria or for different dialects within a single country. If the ISO 639-1 or 639-2-compliant codes are not sufficient, the ISO 3166-1-compliant two-character code is usually used as the first sub-code. Regional differences in a language within a single country can be defined by using the second ISO 3116-2-compliant two-character sub-code "Country Subdivision Code".

A LanguageCode is represented as follows:

aa Example: en anm Example: enm aa-CC Example: en-US aaa-CC Example: enm-US aa-CC-RR Example: en-US-TX aaa-CC-RR Example: enm-US-TX The literals have the follow meaning: aa/aaa represents ISO 639-1 or ISO 639-2-compliant language code, CC represents ISO 3166-1-compliant country code, RR represents ISO 3166-2-compliant "Country Subdivision Code."

_REGIONDEPENDENT_LanguageCode allows different descriptions, names, etc. for different regions/countries basically using the same language. E.g. it allows a differentiation between American and British English (en-US/en-GB).

The GDT REGIONDEPENDENT_LanguageCode may have the following qualifiers: CatalogueLanguageCode (i.e., LanguageCode used in a catalog (e.g. to specify the currently selected language for editing)).

LeadGroupCode

A LeadGroupCode is the coded representation of a group of Leads. A Lead is a business transaction, that describes the potential or projected business interests of a business partner and the interactions based on this over a period of time. An example of GDT LeadGroupCode is:

<LeadGroupCode>1</LeadGroupCode>

In certain implementations, GDT LeadGroupCode may have the following structure:

| GDT | | Cat. | Object Class | Property | Representation/ Association | Type | Type Name | Len. | Card. |
|---|---|---|---|---|---|---|---|---|---|
| LeadGroupCode | | | Lead Group | | Code | CDT | Code | 1...4 | |
| | listID | A | Code List | Identification | Identifier | xsd | token | | 0..1 |

-continued

| GDT | | Cat. | Object Class | Property | Representation/ Association | Type | Type Name | Len. | Card. |
|---|---|---|---|---|---|---|---|---|---|
| | listAgencyID | A | Code List Agency | Identification | Identifier | xsd | token | | 0..1 |
| | listVersionID | A | Code List | Version | Identifier | xsd | token | | 0..1 |
| | listAgency-SchemeID | A | Code List Agency | Scheme | Identifier | xsd | token | | 0..1 |
| | listAgency-Scheme-AgencyID | A | Code List Agency | Scheme Agency | Identifier | xsd | token | | 0..1 |

For GDT LeadGroupCode, a customer-specific code list can be assigned to the code. A listID can be "10390". If the code list is unchanged, a listAgencyID can be "310." Otherwise, a listAgencyID can be the ID of the customer (e.g., ID from DE 3055, if listed there). A listVersionID can be the version of the particular code list (e.g., assigned and managed by the customer). A listAgencySchemeID can be the ID of the scheme if the listAgencyID does not come from DE 3055. The listAgencySchemeAgencyID can be the ID of the organization from DE 3055 that manages the listAgencySchemeID scheme.

The LeadGroupCode is mostly used for reporting purposes for grouping Leads in different Groups. This is especially relevant for Leads that have no reference to certain marketing campaigns.

The following dictionary objects may be assigned to this GDT: Dataelement: (e.g., CRMT_SOURCE,) Type (e.g., Char 03 Software component BBPCRM).

The data type GDT LeadGroupCode may use the following codes: 1, (e.g., new customers), 2, (e.g., VIP customers), and 3, (e.g., training).

LeadQualificationLevelCode

A LeadQualificationLevelCode is the coded representation of the qualification level of a Lead. A Lead is a business transaction that describes the potential or projected business interests of a business partner and the interactions based on this over a period of time. A qualification level is the result of the qualification process. The qualification process is the determination of the business partner's interest in a product, or the business partner's willingness to purchase a product; this takes place on the basis of collected information and different interactions with the business partner. An example of GDT LeadQualificationLevelCode is:

<LeadQualificationLevel>1</LeadQualificationLevel>

In certain implementations, GDT LeadQualificationLevelCode may have the following structure:

| GDT | Object Class | Property | Representation/Association | Type | Type Name | Len. | Remarks |
|---|---|---|---|---|---|---|---|
| Lead-Qualifica-tionLevel-Code | Lead | Quali-fica-tion Level | Code | CDT | Code | 1..2 | restricted |

The data type GDT LeadQualificationLevelCode may assign one static code list to the code. The attributes may be assigned the following values: listID="10297" and listAgencyID="310."

The data type GDT LeadQualificationLevel Code may use the following codes: 1, (e.g., cold, the customer has little potential interest), 2, (e.g., warm, the customer has a potential interest), and 3, (e.g., hot, the customer has a great potential interest).

LegalEntityTypeCode

A LegalEntityTypeCode represents, in the form of a code, a type of legal entity. A legal entity or legal person is a legal construct with rights and obligations, such as the possibility to sign a contract, and to sue or be sued. This construct is generally an organization, such as a company or a government, that is composed exclusively of natural persons and that is treated under certain circumstances as a person in the eyes of the law. This person does not, however, correspond to the persons of which it is composed. The legal personality of a legal person, including any rights, obligations, commitments and transactions, exists independently of every legal or natural person of which it is composed. Thus, the legal liability of a legal entity does not correspond to the legal liability of the natural persons involved. The following are examples of legal entities: Cooperatives, associations, banks, stock corporations, joint stock companies, corporations, government institutions, municipalities, states, political parties, trade unions, trust companies. An example of GDT LegalEntityTypeCode is:

<LegalEntityTypeCode>2</LegalEntityTypeCode>

In certain implementations, GDT LegalEntityTypeCode may have the following structure:

| GDT | | Cat. | Object Class | Property | Representation/ Association | Type | Type Name | Len. | Card. | Remarks |
|---|---|---|---|---|---|---|---|---|---|---|
| Legal-Entity-Type Code | | | | Legal Entity Type | Code | CDT | Code | 1..2 | | Restricted |
| | listID | A | Code List | Identification | Identifier | Xsd | token | | 0..1 | |
| | listAgencyID | A | Code List Agency | Identification fication | Identifier | Xsd | token | | 0..1 | |
| | listVersionID | A | Code List | Version | Identifier | Xsd | token | | 0..1 | |

-continued

| GDT | | Cat. | Object Class | Property | Representation/ Association | Type | Type Name | Len. | Card. | Remarks |
|---|---|---|---|---|---|---|---|---|---|---|
| | listAgency-SchemeID | A | Code List Agency | Scheme | Identifier | Xsd | token | | 0..1 | |
| | listAgency-Scheme-AgencyID | A | Code List Agency | Scheme Agency | Identifier | Xsd | token | | 0..1 | |

For GDT LegalEntityTypeCode, a customer-specific code list can be assigned to the code. A listID can be "10354". If the code list is unchanged, a listAgencyID can be "310." Otherwise, a listAgencyID can be the ID of the customer (e.g., ID from DE 3055, if listed there). A listVersionID can be the version of the particular code list (e.g., assigned and managed by the customer). A listAgencySchemeID can be the ID of the scheme if the listAgencyID does not come from DE 3055. The listAgencySchemeAgencyID can be the ID of the organization from DE 3055 that manages the listAgency-SchemeID scheme.

The GDT is essentially used to classify the legal entities of institutions, events, companies, archives, public authorities, natural parks, campaigns (e.g. Bread for the World), institutions, and so on.

One of its uses with regard to the Business Partner is in the context of statutory reporting by insurance companies in Germany to the Federal Financial Supervisory Authority (BaFin). Business partners or their legal entities are thereby classified according to BaFin guidelines.

The BaFin uses this information to analyze risk spreading. Examples of the possible semantics of the codes are: 1, (Central bank, e.g., the legal entity is a central bank), 2, (Association of local authorities, e.g., the legal entity is an association of local authorities), 3, (Society, e.g., the legal entity is a society), and 4, (Individual enterprise, e.g., the legal entity is an individual enterprise).

The following dictionary objects may be assigned to this GDT: Data element (e.g., BU_LEGAL_ORG), Domain (e.g., BU_LEGAL_ORG).

LegalEventTypeCode

The LegalEventTypeCode is the coded representation of a legal transaction or an official or legal event. An example of GDT LegalEventTypeCode is:

```
<LegalEvent>
  <TypeCode>01</TypeCode>
</LegalEvent>
```

In certain implementations, GDT LegalEventTypeCode may have the following structure:

| GDT | Object Class | Property | Representation/ Association | Type | Type Name | Len. |
|---|---|---|---|---|---|---|
| LegalEvent-TypeCode | Legal Event | Type | Code | CDT | Code | 2 |

The data type GDT LegalEventTypeCode may assign one static code list to the code. The attributes may be assigned the following values: listID=1195 and listAgency 116.

The data type GDT LegalEventTypeCode may use the following codes: 01, (Foreclosure, e.g., the legal process by which an owner's right to a property is terminated, usually due to default. Typically involves a forced sale of the property at public auction, with the proceeds being applied to the mortgage debt), 02, (Law suit, e.g., a legal action based on a complaint that the defendant failed to perform a legal duty, resulting in harm to the plaintiff), 03, (Outstanding Judgment, e.g., an outstanding judgment is a court's expected final determination of the rights and obligations of the parties to a case), 04, (Tax Lien, e.g, a legal right or interest filed by a government for the collection of taxes), 05, (Support Debt, e.g., A legal notice specifying payment schedule for support of children or family involved in a marital separation or divorce), 06, (Bankruptcy, e.g., bankruptcy is a federal law that allows individuals, married couples, and businesses to eliminate or restructure their debts when they have financial difficulties. Many different types, or chapters, of bankruptcy exist). 07, (Garnishment, e.g., a garnishment is a court procedure allowing someone to collect their judgment directly from the defendant's wages, bank account, or other source such as income tax refunds), 08, (Repossession, e.g., repossession is the process by which creditors can reclaim property from debtors), 09, (Collection, e.g., a debt has not been paid according to terms and has been turned over to an agency or attorney to collect the debt from the borrower), 10, (Divorce Decree, e.g., a legal decree that specifies the terms related to the dissolution of a marriage), 11, (Custody Agreement, e.g., an agreement has been made or approved by a court regarding custody of children of a separating or divorcing couple), 12, (Financing Statement (Secured Loan), e.g., a statement that contains information about a security interest in collateral used to secure a debt and that is filed to provide notice to other creditors of the security interest), 13, (Lien, e.g., a lien is a legal right or interest that a creditor has in another property that last until the obligation is paid or satisfied), 14, (Non-responsibility, e.g., a legal notice filed by a land owner to claim they are not responsible for construction, alteration or repair of buildings or other improvements located on their land), 15, (Financial Counseling, e.g., process where debtors make payments to creditors according to a plan arranged by a financial counseling agency), 16, (Fictitious Name, e.g., a legal notice announcing the name change of a business or entity), 17, (Notice of Default, e.g., a formal notice to a borrower declaring that a default has occurred and that legal action may be taken. A default is the failure to make required debt payments on a timely basis or to comply with other conditions of an obligation or agreement), 18, (Forcible Detainer, e.g., the keeping possession of what belongs to another; detention of what is another's, even though the original taking may have been lawful. Forcible detainer is indictable at common law), 19, (Unlawful Detainer, e.g., the act of unlawfully keeping goods or property. For example, a tenant wrongfully remaining in a residence after a valid eviction notice is guilty of an unlawful detainer), 20, (Other Public Record or Obligation Type, e.g., Other Public Record or Obligation Type) and ZZ, (Mutually Defined, e.g., Mutually Defined).

LegallyRequiredPhraseText

A LegallyRequiredPhraseText is a legally required phrase that is generally printed on the invoice. An example of GDT LegallyRequiredPhraseText is:

<LegallyRequiredPhraseText>eine Phrase </LegallyRequiredPhraseText>

In certain implementations, GDT LegallyRequiredPhraseTextCode may have the following structure:

| GDT | Rep./Ass. Qual. | Rep./ Ass. | Type | Type Name | Len. |
|---|---|---|---|---|---|
| LegallyRequired-PhraseText | Legally-Required-Phrase | Text | GDT | Text | 1..255 |

The data type GDT LegallyRequiredPhraseTextCode may assign one static code list to the code. The attributes may be assigned the following values: listID="Keine Angabe" and listAgencyID="310."

The GDT LegallyRequiredPhraseText may only be used within the GDT ProductTax.

LiquidityForecastProfileCode

A LiquidityForecastProfileCode is the coded representation of a liquidity forecast profile. A LiquidityForecast is the forecast of the medium- to long-term development of the liquidity situation of a company or a group of companies. A liquidity forecast profile is a combination of specifications (such as currencies, liquidity groups, liquidity categories, and the time interval) for which the liquidity forecast is created. An example of GDT LiquidityForecastProfileCode is:

<LiquidityForecastProfileCode>1</LiquidityForecastProfileCode>

In certain implementations, GDT LiquidityForecaseProfileCode may have the following structure:

| GDT | | Cat. | Object Class | Property | Representation/ Association | Type | Type Name | Len. | Card. |
|---|---|---|---|---|---|---|---|---|---|
| Liquidity-Forecast-ProfileCode | | | Liquidity Forecast Profile | | Code | CDT | Code | 1..3 | |
| | listID | A | Code List | Identification | Identifier | xsd | token | | 0..1 |
| | listAgencyID | A | Code List Agency | Identification | Identifier | xsd | token | | 0..1 |
| | listVersionID | A | Code List | Version | Identifier | xsd | token | | 0..1 |
| | listAgency-SchemeID | A | Code List Agency | Scheme | Identifier | xsd | token | | 0..1 |
| | listAgency-Scheme-AgencyID | A | Code List Agency | Scheme Agency | Identifier | xsd | token | | 0..1 |

For GDT LiquidityForecastProfileCode, a customer-specific code list can be assigned to the code. A listID can be 10287. If the code list is unchanged, a listAgencyID can be 310. Otherwise, a listAgencyID can be the ID of the customer (e.g., ID from DE 3055, if listed there). A listVersionID can be the version of the particular code list (e.g., assigned and managed by the customer). A listAgencySchemeID can be the ID of the scheme if the listAgencyID does not come from DE 3055. The listAgencySchemeAgencyID can be the ID of the organization from DE 3055 that manages the listAgencySchemeID scheme. An example of the possible semantics of the customer-specific codes are: EURO Forecast in which only cash flows with the transaction currency euro are taken into account.

The data type GDT LiquidityForecastProfileCode may use the following codes: 1, (No restriction, e.g., the liquidity forecast is not restricted).

LiquidityItemBusinessTransactionDocumentStatusCategoryCode

A LiquidityItemBusinessTransactionDocumentStatusCategoryCode is the coded representation of the category of a liquidity item depending on the status of the base document in a business transaction. Liquidity forecast items are realized or expected cash flows of a company on which one or more (aggregation) operational business processes are based. The LiquidityItemBusinessTransactionDocumentStatusCategory represents the classification of liquidity forecast items regarding the status of the base document in a business transaction. An example of GDT LiquidityItemBusinessTransactionDocumentStatusCategoryCode is:

<LiquidityItemBusinessTransactionDocumentStatusCategoryCode>1</LiquidityItemBusinessTransactionDocumentStatusCategoryCode>

In certain implementations, GDT LiquidityItemBusinessTransactionDocumentStatusCategoryCode may have the following structure:

| GDT | | Cat. | Object Class | Property | Representation/ Association | Type | Type Name | Len. | Card. | Remarks |
|---|---|---|---|---|---|---|---|---|---|---|
| Liquidity-ItemBusiness-Transaction-Document-Status-CategoryCode | | | Liquidity Item | Business Transaction Document Status_ Category | Code | CDT | Code | 1..3 | | restricted |
| | listID | A | Code List | Identification | Identifier | xsd | token | | 0..1 | |
| | listAgencyID | A | Code List Agency | Identification | Identifier | xsd | token | | 0..1 | |
| | listVersionID | A | Code List | Version | Identifier | xsd | token | | 0..1 | |
| | listAgency-SchemeID | A | Code List Agency | Scheme | Identifier | xsd | token | | 0..1 | |
| | listAgency-Scheme Agency | A | Code List Agency | Scheme Agency | Identifier | xsd | token | | 0..1 | |

For GDT LiquidityItemBusinessTransactionDocumentStatusCategoryCode, a customer-specific code list can be assigned to the code. A listID can be 10289. If the code list is unchanged, a listAgencyID can be 310. Otherwise, a listAgencyID can be the ID of the customer (e.g., ID from DE 3055, if listed there). A listVersionID can be the version of the particular code list (e.g., assigned and managed by the customer). A listAgencySchemeID can be the ID of the scheme if the listAgencyID does not come from DE 3055. The listAgencySchemeAgencyID can be the ID of the organization from DE 3055 that manages the listAgencySchemeID scheme.

The LiquidityItemBusinessTransactionDocumentStatusCategoryCode is used to classify liquidity forecast items using the status of the base business transaction document (business object).

A sales order has been blocked because of doubts about the creditworthiness of the customer. A vendor invoice has been blocked because a smaller quantity than agreed has been delivered. The status of both business transaction documents (business object) named can be classified in a LiquidityItemBusinessTransactionDocumentStatusCategoryCode.

Examples of customer-specific code semantics may include: unclear—Business transactions where it is unclear when and whether they will be continued in the value chain (such as a customer invoice with the status "dispute" or a purchase order where the credit card authorization failed).

The data type GDT LiquidityItemBusinessTransactionDocumentStatusCategoryCode may use the following codes: 1, (Standard, e.g., the base process object is in standard processing), 2, (Blocked, e.g., the base process object has been blocked [such as payment block]), 3, (To be released, e.g., the base process object is waiting to be released), 4, (Confirmed, e.g., the base process object has been confirmed finally), 5, (In Transfer, e.g., the base process object is waiting to be transferred [such as between presenting a bank transfer at the bank and debiting the bank account]), and 6, (Planned, e.g., the base process object has been planned).

LiquidityItemGroupCode

A LiquidityItemGroupCode is the coded representation of a group of liquidity items mapped according to business criteria. Liquidity items are realized or expected cash flows of a company on which one or more (aggregation) operational business processes are based. An example of GDT LiquidityItemGroupCode is:

<LiquidityItemGroupCode>1</LiquidityItemGroupCode>

In certain implementations, GDT LiquidityItemGroupCode may have the following structure:

| GDT | | Cat. | Object Class | Property | Representation/ Association | Type | Type Name | Len. | Card. | Remarks |
|---|---|---|---|---|---|---|---|---|---|---|
| Liquidity-ItemGroup Code | | | Liquidity Item Group | | Code | CDT | Code | 1..4 | | restricted |
| | listID | A | Code List | Identification | Identifier | xsd | token | | 0..1 | |
| | listAgencyID | A | Code List Agency | Identification | Identifier | xsd | token | | 0..1 | |
| | listVersionID | A | Code List | Version | Identifier | xsd | token | | 0..1 | |
| | listAgency-SchemeID | A | Code List Agency | Scheme | Identifier | xsd | token | | 0..1 | |
| | listAgency-Scheme AgencyID | A | Code List Agency | Scheme Agency | Identifier | xsd | token | | 0..1 | |

For GDT LiquidityItemGroupCode, a customer-specific code list can be assigned to the code. A listID can be "10290". If the code list is unchanged, a listAgencyID can be "310." Otherwise, a listAgencyID can be the ID of the customer (e.g., ID from DE 3055, if listed there). A listVersionID can be the version of the particular code list (e.g., assigned and managed by the customer). A listAgencySchemeID can be the ID of the scheme if the listAgencyID does not come from DE 3055. The listAgencySchemeAgencyID can be the ID of the organization from DE 3055 that manages the listAgencySchemeID scheme.

A LiquidityItem can be in one or more groups. The LiquidityItemGroupCode may be used to group liquidity items using relevant business criteria that the customer can define. Examples for customer-specific code semantics may include kerosene: The material kerosene is the most important item in the purchasing process for an airline. The time-based fluctuations in price are much greater than the differences between different vendors. For this reason, the category "kerosene" could be much more important for liquidity analyses than the categorization by vendors (such as domestic vendors, foreign vendors).

The data type GDT LiquidityItemGroupCode may use the following codes: 1, (Vendors, e.g., grouping of liquidity items by vendors), 2, (Domestic vendors, e.g., grouping of liquidity items by vendors with headquarters at home), 3, (Foreign vendors, e.g., grouping of liquidity items by vendors with headquarters abroad), 4, (Vendors: Affiliated Company, e.g., grouping of liquidity items by vendors that are affiliated with the company), 5, (Customers, e.g., grouping of liquidity items by customers), 6, (Domestic customers, e.g., grouping of liquidity items by domestic customers), 7, (Foreign customers, e.g., grouping of liquidity items by foreign customers), 8, (Customers: Affiliated Company, e.g., grouping of liquidity items by customers that are affiliated with the company), 9, (Domestic banks, e.g., grouping of liquidity items by banks with headquarters at home), and 10, (Foreign banks, e.g., grouping of liquidity items by banks with headquarters abroad).

LiquidityItemOperationalProcessProgressCategoryCode

A LiquidityItemOperationalProcessProgressCategoryCode is the coded representation of the category of a liquidity forecast item regarding the processing progress of the underlying operational business process. Liquidity forecast items are realized or expected cash flows of a company on which one or more (aggregation) operational business processes are based. A liquidity forecast item can have one LiquidityItemOperationalProcessProgressCategory. The progress of the underlying business process leads to the replacement by a new item in the liquidity forecast. An example of GDT LiquidityItemOperationalProcessProgressCategoryCode is:

<LiquidityItemOperationalProcessProgressCategoryCode>1</LiquidityItemOperationalProcessProgressCategoryCode>

In certain implementations, GDT LiquidityItemOperationalProcessProgressCategoryCode may have the following structure:

| GDT | | Cat. | Object Class | Property | Representation/ Association | Type | Type Name | Len. | Card. | Remarks |
|---|---|---|---|---|---|---|---|---|---|---|
| LiquidityItem-Operational-ProcessProgress-CategoryCode | | | LiquidityItem | | Code | CDT | Code | 1..3 | | restricted |
| | listID | A | Code List | Identification | Identifier | xsd | token | | 0..1 | |
| | listAgencyID | A | Code List Agency | Identification | Identifier | xsd | token | | 0..1 | |
| | listVersionID | A | Code List | Version | Identifier | xsd | token | | 0..1 | |
| | listAgency-SchemeID | A | Code List Agency | Scheme | Identifier | xsd | token | | 0..1 | |
| | listAgency-Scheme AgencyID | A | Code List Agency | Scheme Agency | Identifier | xsd | token | | 0..1 | |

For GDT LiquidityItemOperationalProcessProgressCategoryCode, a customer-specific code list can be assigned to the code. A listID can be 10289. If the code list is unchanged, a listAgencyID can be 310. Otherwise, a listAgencyID can be the ID of the customer (e.g., ID from DE 3055, if listed there). A listVersionID can be the version of the particular code list (e.g., assigned and managed by the customer). A listAgencySchemeID can be the ID of the scheme if the listAgencyID does not come from DE 3055. The listAgencySchemeAgencyID can be the ID of the organization from DE 3055 that manages the listAgencySchemeID scheme.

The LiquidityItemOperationalProcessProgressCategoryCode is used to group together process steps from different business processes. The purchasing process goes through the following steps: order—delivery—incoming invoice—outgoing payment. The sales process goes through the following steps: purchase order—delivery—outgoing invoice—incoming payment. The business transactions that have the same processing progress (order/purchase order—outgoing invoice/incoming invoice—outgoing payment/incoming payment) can be grouped together using the LiquidityItemOperationalProcessProgressCategoryCode. Examples of the possible semantics of the customer-specific codes include down payment requests, for specific customers whose business processes are closely linked to down payments (such as the construction industry), there could be a demand to analyze them in a separate categorization.

The data type GDT LiquidityItemOperationalProcessProgressCategoryCode may use the following codes: 1, (Contract, e.g., liquidity items from contracts between a company and a partner or another company [such as contract for services, work agreement, loan contract], 2, (Purchase order/order, e.g., liquidity items from purchase orders from or to a company [for example, sales order, vendor order]), 3, (Invoice/credit memo, e.g., liquidity items from invoices to or from a company [for example, vendor invoice, customer invoice, travel expenses, credit memo]), 4, (Receivable/payable, e.g., liquidity items from receivables/payables of a company [for example, from goods, from services, to employees, from rents, from loans]), and 5, (Payment, e.g., liquidity items from payments to or from a company [for example, cash payment, incoming check payment, outgoing bill of exchange payment]).

LoanAmortizementCondition

A LoanAmortizementCondition is a repayment condition for a loan. It regulates the conditions to which a loan is to be repaid. A loan can be repaid in the form of regular partial amounts or as a single amount. The following types of repayment are possible: Final repayment—The loan is repaid at the end of its term in one amount; Annuity repayment—Annuity comprises initial repayment and interest amount. Over time the repayment amount increases and the interest amount decreases; and Installment repayment—The loan is repaid in equal installments. An example of GDT LoanAmortizementConditionCode is:

```
<LoanAmortizementCondition>
  <CalculationDateRecurrence>
  <Period>
    <StartDate>2005-01-01</StartDate>
    <EndDate>2010-01-01</EndDate>
  </Period>
  <Duration>P1M</Duration>
  <DaysValue>31</DaysValue>
  </CalculationDateRecurrence>
  <DueDateRecurrence>
  <Duration>P1M</Duration>
  <Period>
  <StartDate>2005-01-01</StartDate>
  <EndDate>2010-01-01</EndDate>
  </Period>
  </DueDateRecurrence>
  <AnnuityRatePercent>3</AnnuityRatePercent>
</LoanAmortizementCondition>
```

In the above example, the repayment condition is valid for the period from Jan. 1, 2005-Jan. 1, 2010. An initial repayment of 3% has been agreed. The repayment is calculated at the end of the month. The first due date for repayment is Jan. 1, 2005. In certain implementations, GDT LoanAmortizementConditionCode may have the following structure:

In certain implementations, the user states one of the following optional elements: TotalAmortizementIndicator, AnnuityRatePercent, AnnuityRateAmount, InstallmentRatePercent, InstallmentRateAmount.

LoanFeeCondition

A LoanFeeCondition is the fee condition for a loan. Lenders charge fees for managing a loan account. The fees are either due as a single payment or in a payment cycle. For example, the LoanFeeCondition is used to specify the fee condition for a loan. An example of GDT LoanFeeCondition-Code is:

```
<LoanFeeCondition>
  <LoanFeeTypeCode>4711</LoanFeeTypeCode>
  <CalculationDateRecurrence>
  <Period>
  <StartDate>2005-01-01</StartDate>
  <EndDate>2010-01-01</EndDate>
  <Period>
  <Duration>P1Y</Duration>
  <OffsetDuration>P1Y</OffsetDuration>
  </CalculationDateRecurrence>
  <DueDateRecurrence>
  <Period>
  <StartDate>2005-01-01</StartDate>
```

| GDT | | Cat. | Object Class | Property | Representation/ Association | Type | Type Name | Card. |
|---|---|---|---|---|---|---|---|---|
| LoanAmortizement-Condition | | | Loan Amortizement Condition | | Details | | | |
| | Calculation-DateRecurrence | E | Loan Amortizement Condition | Calculation Date Recurrence | Details | GDT | Period-Duration-DayRecurrence | 0..1 |
| | DueDate-Recurrence | E | Loan Amortizement Condition | Due Date Recurrence | Details | GDT | Period-Duration-DayRecurrence | 0..1 |
| | TotalAmorizementIndicator | E | Loan Amortizement Condition | Total Amorizement | Indicator | GDT | TotalAmorizement-Indicator | 0..1 |
| | Annuity-RatePercent | E | Loan Amortizement Condition | Annuity Rate | Percent | CDT | Percent | 0..1 |
| | Annuity-RateAmount | E | Loan Amortizement Condition | Annuity Rate | Amount | CDT | Amount | 0..1 |
| | Instalment-RatePercent | E | Loan Amortizement Condition | Instalment Rate | Percent | CDT | Percent | 0..1 |
| | Instalment-RateAmount | E | Loan Amortizement Condition | Instalment Rate | Amount | CDT | Amount | 0..1 |

The AmortizementCondition may include the following elements: CalculationDateRecurrence—Indicates the regular reoccurring date when repayment is calculated, DueDateRecurrence—Indicates the regular recurring date for the due date for a repayment, TotalAmortizementIndicator—Indicator showing that the loan is repaid at the end of the term in a single amount, AnnuityRatePercent—Annuity repayment as a percentage, AnnuityRateAmount—Annuity repayment as an amount, InstallmentRatePercent—Installment repayment as a percentage, InstallmentRateAmount—Repayment amount when paying in installments.

```
  <EndDate>2010-01-01</EndDate>
  </Period>
  <Duration>P1Y<Duration>
  <OffsetDuration>P1Y</OffsetDuration>
  <DueDateRecurrence>
  <RateAmount currencyCode="EUR">5</RateAmount>
</LoanFeeCondition>
```

In the previous example, fee condition 4711 is valid for the period from Jan. 1, 2005-Jan. 1, 2010. It amounts to 5 Euro per year. The calculation will take place on Jan. 1, 2006 for the first time. The fee is due on Jan. 1, 2006 for the first time.

In certain implementations, GDT LoanFeeConditionCode may have the following structure:

| GDT | | Cat. | Object Class | Property | Representation/ Association | Type | Type Name | Card. |
|---|---|---|---|---|---|---|---|---|
| LoanFee-Condition | | | Loan Fee Condition | | Details | | | |
| | LoanFee-TypeCode | E | Loan Fee Condition | Loan Fee Type | Code | GDT | LoanFee-TypeCode | 1 |
| | Calculation-DateRecur-rence | E | Loan Fee Condition | Calculation Date Recurrence | Details | GDT | Period-Duration Day-Recurrence | 1 |
| | DueDate-Recurrence | E | Loan Fee Condition | D ue Date Recurrence | Details | GDT | Period-Duration Day-Recurrence | 0..1 |
| | RatePercent | E | Loan Fee Condition | Rate | Percent | CDT | Percent | 0..1 |
| | RateAmount | E | Loan Fee Condition | Rate | Amount | CDT | Amount | 0..1 |

The LoanFeeCondition can include the following elements: LoanFeeTypeCode—Specifies the type of fee, Calculation-DateRecurrence—Indicates the regular recurring date when the fee is to be calculated, DueDateRecurrence—Indicates the regular recurring date when the fee is due, RatePercent—Specifies a relative fee based on the loan amount, RateA-mount—Represents the absolute fee.

In certain implementations, the user can state one of the following optional elements: RatePercent, RateAmount LoanFeeTypeCode A LoanFeeTypeCode is the coded representation of the type of loan fee. An example of GDT LoanFeeTypeCode is:

<LoanFeeTypeCode>1101</LoanFeeTypeCode>

In certain implementations, GDT LoanFeeTypeCode may have the following structure:

| GDT | Object Class | Pro-perty | Represen-tation/As-sociation | Type | Type Name | Len. | Remarks |
|---|---|---|---|---|---|---|---|
| LoanFee-TypeCode | Loan Fee | Type | Code | CDT | Code | 1..10 | restricted |

For GDT LoanFeeTypeCode, a customer-specific code list can be assigned to the code. A listID can be "10355". If the code list is unchanged, a listAgencyID can be "310." Otherwise, a listAgencyID can be the ID of the customer (e.g., ID from DE 3055, if listed there). A listVersionID can be the version of the particular code list (e.g., assigned and managed by the customer). A listAgencySchemeID can be the ID of the scheme if the listAgency does not come from DE 3055. The listAgencySchemeAgencyID can be the ID of the organization from DE 3055 that manages the listAgencySchemeID scheme.

The following may be examples of types of loan fees: Account management fee, fees for subscribing to a magazine published by a building and loan association, fee for viewing the usage object, and contribution for credit life insurance In the ERP system the LoanFeeTypeCode is based on the data element/domain SKOART in the software component EA-FINSERV. The value range for the domain is defined by entries from an underlying Customizing table.

LoanInterestCondition

A LoanInterestCondition is a condition for calculating the interest on a loan. The interest calculation represents the price for the capital transferred. An example of GDT LoanInterest-ConditionCode is:

```
<LoanInterestCondition>
  <CalculationRecurrence>
  <Period>
  <StartDate>2005-01-01</StartDate>
  <EndDate>2010-01-01</EndDate>
  </Period>
  <Duration>P1M</Duration>
  <DaysValue>31</DaysValue>
  </CalculationRecurrence>
  <DueDateRecurrence>
  <Period>
  <StartDate>2005-01-01</StartDate>
  <EndDate>2010-01-01</EndDate>
  </Period>
  <Duration>P1M</Duration>
  <OffsetDuration>P1M</OffsetDuration>
  </DueDateRecurrence>
  <FixedInterestRatePercent>8</FixedInterestRatePer-
cent>
</LoanInterestCondition>
```

In the previous example, the interest condition is valid for the period from Jan. 1, 2005-Jan. 1, 2010. The interest rate amounts to 8% per year. Interest is calculated monthly. The interest is calculated for the first time on Jan. 31, 2005. Interest is due for the first time on Feb. 1, 2005. It is an interest payment in arrears.

In certain implementations, GDT LoanInterestCondition-Code may have the following structure:

| GDT | | Cat. | Object Class | Property | Representation/ Association | Type | Type Name | Card. |
|---|---|---|---|---|---|---|---|---|
| LoanInterest-Condition | | | Loan Interest Condition | | Details | | | |
| | Calculation-Date-Recurrence | E | Loan Interest Condition | Calculation Date Recurrence | Details | GDT | PeriodDuration-DayRecurrence | 1 |
| | DueDate-Recurrence | E | Loan Interest Condition | Due Date Recurrence | Details | GDT | PeriodDuration-DayRecurrence | 0..1 |
| | FixedInterest-RatePercent | E | Loan Interest Condition | Fixed Interest Rate | Percent | CDT | Percent | 0..1 |
| | Variable-InterestRate | E | Loan Interest Condition | Variable Interest Rate | Details | GDT | Variable-InterestRate | 0..1 |

The LoanInterestCondition can include the following elements: CalculationDateRecurrence Indicates the regular recurring date for calculating interest payments, DueDateRecurrence Indicates the regular recurring date when interest payments are due, FixedInterestRatePercent Defines a fixed interest rate, VariableInterestRate—Defines a variable interest rate.

In certain implementations, the user can state one of the following optional sub-elements: FixedInterestRatePercent, VariableInterestRate. A user can use the LoanInterestCondition to specify the interest conditions for the capital transferred (loan, for example).

LoanKeyFigureTypeCode

A LoanKeyFigureTypeCode is the coded representation of the type of key figures for a loan. An example of GDT LoanKeyFigureTypeCode is:

<LoanKeyFigureTypeCode>1</LoanKeyFigureTypeCode>

In certain implementations, GDT LoanKeyFigureTypeCode may have the following structure:

| GDT | Object Class | Property | Representation/Association | Type | Type Name | Len. | Remarks |
|---|---|---|---|---|---|---|---|
| LoanKey-Figure-Type-Code | Loan Key Figure | Type | Code | CDT | Code | 1..2 | restricted |

This is a code list that cannot be extended by customers. The following values are valid: 1, (i.e., Commitment capital, for example, describes the commitment capital for a loan), 2, (i.e., Term, for example, describes the term of a loan), 3, (i.e., Installment, for example, describes the installment for a loan), 4, (i.e., Effective interest rate, for example, describes the effective interest rate for a loan), and 5, (i.e., Payment schedule, for example, describes the payment schedule for a loan).

Loan figures are needed to create loan offers. The LoanKeyFigureTypeCode is used to request the calculation of concrete figures for a loan from a loan calculation service. The LoanKeyFigureTypeCode is a proprietary code list with predefined values. If you change permitted values then you also have to make changes to interfaces.

LoanPaymentPlanItem

A LoanPaymentPlanItem is a loan payment planned for a key date. An example of GDT LoanPaymentPlanItemCode is:

<LoanPaymentPlanItem>
<PaymentDate>2005-02-01</PaymentDate>
<InstalmentAmount currencyCode="EUR">3101.00</InstalmentAmount>
<InterestAmount currencyCode="EUR">2100.01</InterestAmount>
<RepaymentAmount currencyCode="EUR">1000.99</RepaymentAmount>
<FeeAmount currencyCode="EUR">0.00</FeeAmount>
<BalanceAmount currencyCode="EUR">122354.43</BalanceAmount>
</LoanPaymentPlanItem>

In certain implementations, GDT LoanPaymentPlanItem-Code may have the following structure:

| GDT | | Cat. | Object Class | Property | Representation/ Association | Type | Type Name | Card. |
|---|---|---|---|---|---|---|---|---|
| LoanPayment-PlanItem | | | Loan Payment Plan Item | | Details | | | |
| | Payment-Date | E | Loan Payment Plan Item | Payment | Date | GDT | Date | 1 |
| | Installment-Amount | E | Loan Payment Plan Item | Instalment | Amount | CDT | Amount | 0..1 |
| | Interest-Amoun | E | Loan Payment Plan Item | Interest | Amount | CDT | Amount | 0..1 |
| | Repayment-Amount | E | Loan Payment Plan Item | Repayment | Amount | CDT | Amount | 0..1 |
| | Fee-Amount | E Plan Item | Loan Payment | Fee | Amount | CDT | Amount | 0..1 |
| | Balance-Amount | E | Loan Payment Plan Item | Balance | Amount | CDT | Amount | 1 |

The LoanPaymentPlanItem can include the following elements: PaymentDate—Represents the payment date, InstallmentAmount—Represents the installment to be paid (total of interest and repayment), InterestAmount—Represents the interest amount to be paid, RepaymentAmount—Represents the repayment amount to be paid, FeeAmount—Represents the fees to be paid, BalanceAmount—Represents the remaining debt on the loan (balance amount).

LoanPurposeCode

A LoanPurposeCode is a coded representation of the purpose of a loan. An example of GDT LoanPurposeCode is:

<LoanPurposeCode>2</LoanPurposeCode>

In certain implementations, GDT LoanPurposeCode may have the following structure:

| GDT | Object Class | Property | Representation/ Association | Type | Type Name | Len. | Remarks |
|---|---|---|---|---|---|---|---|
| LoanPurposeCode | Loan | Purpose | Code | CDT | Code | 1..2 | restricted |

For GDT LoanPurposeCode, a customer-specific code list can be assigned to the code. A listID can be "10356". If the code list is unchanged, a listAgencyID can be "310." Otherwise, a listAgencyID can be the ID of the customer (e.g., ID from DE 3055, if listed there). A listVersionID can be the version of the particular code list (e.g., assigned and managed by the customer). A listAgencySchemeID can be the ID of the scheme if the listAgencyID does not come from DE 3055. The listAgencySchemeAgencyID can be the ID of the organization from DE 3055 that manages the listAgencySchemeID scheme.

The following are examples of loan purposes: Purchase of real estate—The loan is used to purchase real estate (house or condominium), Refinancing—The loan is used for refinancing, Home improvement—The loan is used to make improvements to real estate, Extension work The loan is used to make extensions to real estate.

In the ERP system the LoanPurposeCode is based on the data element/domain SVZWECK from the software component EA-FINSERV.

LocationID

A LocationID is a unique identifier for a location. A location is a logical or a physical place. An example of GDT LocationIDCode is:

<LocationID schemeID="myLocations"
schemeAgencyID="065055766"
schemeAgencySchemeID="DUNS"
schemeAgencySchemeAgencyID="16">
LOC_4711
</LocationID>

In the previous example, 065055766=DUNS number for Bosch and 16=DUN & Bradstreet Corporation from code list UN/EDIFACT DE 3055.

In certain implementations, GDT LocationIDCode may have the following structure:

| GDT | | Cat. | Object Class | Property | Representation/ Association | Type | Type Name | Len. | Card. | Remarks |
|---|---|---|---|---|---|---|---|---|---|---|
| LocationID | | | Location | Identification | Identifier | CDT | Identifier | 1..32 | | restricted |
| | schemeID | A | Identification Scheme | Identification | Identifier | XSD | Token | 0..60 | 0..1 | |
| | scheme-AgencyID | A | Identification Scheme Agency | Identification | Identifier | XSD | Token | 0..60 | 0..1 | |
| | scheme-Agency-SchemeID | A | Identification Scheme Agency | Scheme | Identifier | XSD | Token | 0..60 | 0..1 | |
| | scheme-Agency-Scheme-AgencyID | A | Identification Scheme Agency | Scheme Agency | Identifier | XSD | Token | 1..3 | 0..1 | |

SchemeID is the ID of the ID scheme. It is released and maintained by the responsible organization of the ID scheme. The GDT owner may retrieve the correct ID from the responsible organization. If there is no unique ID available, the name of the identifier or identifier type may be entered, which is used in the corresponding standard, specification, or scheme of the responsible organization.

SchemeAgencyID is the ID of the organization maintaining the ID scheme. This identification is released by an organization contained in DE 3055 (e.g. DUNS, EAN . . . ). The GDT owner may retrieve the correct ID from the responsible organization. If the organization is not contained in DE 3055, proceed like described in "Data Type Catalog", 5.6.6.c).

SchemeAgencySchemeID is the identification of the schema which identifies the organization named in schemeAgencyID. It's a certain scheme ID of partners, companies, members etc. (e.g. DUNS+4) of an organization named in schemeAgencySchemeAgencyID (Bsp. EAN, DUNS, SWIFT, etc.)

SchemeAgencySchemeAgencyID is the identification of the maintaining organization (e.g. DUNS, EAN, SWIFT, etc.) which is responsible for the identification of the organization named in schemeAgencyID. The organization may be contained in DE 3055. For standardized and proprietary LocationID, there is the CDT: LocationStandardID and CDT: LocationPartyID.

LocationInternalID

A LocationInternalID is a proprietary identifier for a location. A location is a logical or a physical place. An example of GDT LocationInternalIDCode is:

<LocationInternalID schemeID="LocationGUID" schemeAgencyID="MPL__002">1C743CEC501F6A4D8826C7EC5A8554B9</LocationInternalID> schemeID="LocationGUID" indicates that the scheme "LocationGUID" was used to identify the location.

schemeAgencyID="MPL__002" indicates that the scheme was assigned by the business system "MPL__002".

Another example of LocationInternalIDCode is:

<LocationInternalID schemeID="LocationID" schemeAgencyID="MPL__002">CU0000000001</LocationInternalID>

In certain implementations, GDT LocationInternalIDCode may have the following structure:

| GDT | | Cat. | Object Class | Property Qualifier | Property | Representation/ Association | Type | Type Name | Len. | Card. | Remarks |
|---|---|---|---|---|---|---|---|---|---|---|---|
| Location-InternalID | | | Location | Internal | Indentification | Identifier | GDT | LocationID | 1..32 | | restricted |
| | schemeID | A | Identification Scheme | | Identification | Identifier | XSD | Token | 1..60 | 0..1 | |
| | scheme-AgencyID | A | Identification Scheme Agency | | Identification | Identifier | XSD | Token | 1..60 | 0..1 | |

The following schemes are provided for: LocationGUID: Identifies a location using a Global Unique Identifier, LocationID: Identifies a location using an identifier, schemeAgencyID, Business System, which issued the ID.

The GDT LocationInternalID represents a projection of the GDT LocationID, in which only the attributes "schemeID" and "schemeAgencyID" are contained for describing an internally assigned ID. If an attribute is not explicitly assigned in the use of the CDT, it may be clearly specified through the context. The LocationInternalID is used when both sender and recipient can access shared master data, e.g., during internal communication.

LocationLogisticsUsageCode

A LocationLogisticsUsageCode is a coded representation of the logistics usage of a location. An example of GDT LocationLogisticsUsageCode is:

<LocationLogisticsUsageCode>1</LocationLogisticsUsageCode>

In certain implementations, GDT LocationLogisticsUsageCode may have the following structure:

| GDT | | Cat. | Object Class | Property | Representation/ Association | Type | Type Name | Len. | Card. | Remarks |
|---|---|---|---|---|---|---|---|---|---|---|
| Location-Logistics-UsageCode | | | Location | Logistics__ Usage | Code | CDT | Code | 1..2 | | restricted |
| | listID | A | Code List | Identification | Identifier | xsd | token | | 0..1 | |
| | listAgencyID | A | Code List Agency | Identification | Identifier | xsd | token | | 0..1 | |
| | list-VersionID | A | Code List | Version | Identifier | xsd | token | | 0..1 | |

-continued

| GDT | | Cat. | Object Class | Property | Representation/ Association | Type | Type Name | Len. | Card. | Remarks |
|---|---|---|---|---|---|---|---|---|---|---|
| | list-Agency-SchemeID | A | Code List Agency | Scheme | Identifier | xsd | token | | 0..1 | |
| | list-Agency-Scheme-AgencyID | A | Code List Agency | Scheme Agency | Identifier | xsd | token | | 0..1 | |

For GDT LocationLogisticsUsageCode, a customer-specific code list can be assigned to the code. A listID can be "10435". If the code list is unchanged, a listAgencyID can be "310." Otherwise, a listAgencyID can be the ID of the customer (e.g., ID from DE 3055, if listed there). A listVersionID can be the version of the particular code list (e.g., assigned and managed by the customer). A listAgencySchemeID can be the ID of the scheme if the listAgencyID does not come from DE 3055. The listAgencySchemeAgencyID can be the ID of the organization from DE 3055 that manages the listAgency-SchemeID scheme.

The LocationLogisticsUsageCode is used to distinguish between logistics usages of a location when searching for a location to use. For example bin and aisle are both used to store inventory meaning they both have a Storage usage.

The data type GDT LocationLogisticsUsageCode may use the following codes: 1, (All, e.g., all usages are allowed in the location), 2, (Storage, e.g., storage usage of a location (e.g., Bin, Aisle)), 3, (Staging, e.g., staging usage of a location (e.g., Staging Area)), 4, (Packing, e.g., packing usage of a location (e.g., Pack Station)), 5, (Intermediate Storage, e.g., Intermediate storage usage of a location. These locations are used as temporary places in a logistics movement operation (e.g., Pick and Drop)), 6, (Production Supply, e.g., production supply usage of a location), and 7, (Production Output, e.g., production output usage of a location).

LocationPartyID

A LocationPartyID is an identifier for a location assigned by a party. A location is a logical or a physical place. An example of GDT LocationPartyIDCode is:

<LocationBuyerID>4711</LocationBuyerID>

In certain implementations, GDT LocationPartyIDCode may have the following structure:

| GDT | Object Class | Property Qual. | Property | Rep./ Ass. | Type | Type Name | Len. | Remarks |
|---|---|---|---|---|---|---|---|---|
| LocationPartyID | Location | Party | Identification | Identifier | GDT | LocationID | 1..20 | restricted |

The PartyPartyID is the proprietary identifier assigned by a party. The party (in its role) that assigned this identifier may be derived from the context of the message that the Location-PartyID uses. The GDT LocationPartyID represents a projection of the GDT LocationID, which does not contain any attributes. In the XML instance, "Party" is replaced with "Partner Role Type" (e.g., LocationBuyerID, etc.). In contrast to LocationStandardID, the use of the LocationPartyID is role-dependent (e.g., as an ID assigned by the Buyer). The party is specified by its role. "Party" is replaced with the "partner role type" (for example, LocationBuyerID). SchemeID and VersionID are to be included as attributes as soon as there is a need to differentiate between several schemes.

LocationRoleCategoryCode

A LocationRoleCategoryCode is the coded representation of a LocationRoleCategory. A LocationRoleCategory is a division of LocationRoles according to process-controlling criteria. A LocationRole with the same name exists for each LocationRoleCategory. An example of GDT LocationRole-CategoryCode is:

<LocationRoleCategoryCode>1</LocationRoleCategory-Code>

In certain implementations, GDT LocationRoleCategory-Code may have the following structure:

| GDT | Object Class | Property | Representation/ Association | Type | Type Name | Len. |
|---|---|---|---|---|---|---|
| Location-Role-Category-Code | Location | Role | Code | CDT | Code | 1..3 |

The data type GDT LocationRoleCategoryCode may assign one static code list to the code. The attributes may be assigned to the following values: listID="10300" and listAgencyID="310."

The data type GDT LocationRoleCategoryCode may use the following codes: 1, (ShipToLocation, e.g., a ShipToLocation is a location to which the goods are to be delivered (in particular B2B communication)), 2, (ShipFromLocation, e.g., a ShipFromLocation is a location from which the goods are to be delivered (in particular B2B communication)), 3, (MeetingPlace, e.g., a MeetingPlace is a location that specifies a meeting point), 4, (ReceivingLocation, e.g., a ReceivingLocation is a location to which the goods are to be delivered (from a macro-logistic perspective)), 5, (SendingLocation, e.g., a SendingLocation is a location from which the goods are to be delivered (from a macro-logistic perspective)), and 8, (ServicePoint, e.g., a ServicePoint is a location at which a service is provided).

LocationRoleCode

A LocationRoleCode is the coded representation of a LocationRole. A LocationRole specifies the significance of the Location for a business object and corresponding processes. A LocationRole can be assigned to one LocationRole-Category and refines its semantics. An example of GDT LocationRoleCode is:

<LocationRoleCode>1</LocationRoleCode>

In certain implementations, GDT LocationRoleCode may have the following structure:

| GDT | | Cat. | Object Class | Property | Representation/ Association | Type | Type Name | Len. | Card. | Remarks |
|---|---|---|---|---|---|---|---|---|---|---|
| LocationRole-Code | | | Location | Role | Code | CDT | Code | 1..10 | | restricted |
| | listID | A | Code List | Identification | Identifier | xsd | token | | 0..1 | |
| | list-AgencyID | A | Code List Agency | Identification | Identifier | xsd | Token | | 0..1 | |
| | list-VersionID | A | Code List | Version | Identifier | xsd | Token | | 0..1 | |
| | list-Agency-SchemeID | A | Code List Agency | Scheme | Identifier | xsd | Token | | 0..1 | |
| | list-Agency-Scheme-AgencyID | A | Code List Agency | Scheme | Identifier | xsd | Token | | 0..1 | |

For GDT LocationRoleCode, a customer-specific code list can be assigned to the code. A listID can be "10301". If the code list is unchanged, a listAgencyID can be "310." Otherwise, a listAgencyID can be the ID of the customer (e.g., ID from DE 3055, if listed there). A listVersionID can be the version of the particular code list (e.g., assigned and managed by the customer). A listAgencySchemeID can be the ID of the scheme if the listAgencyID does not come from DE 3055. The listAgencySchemeAgencyID can be the ID of the organization from DE 3055 that manages the listAgencySchemeID scheme.

GDT LocationRoleCode is primarily the differentiation of a LocationRoleCategory in various processes. An example of customer-specific code semantics may be Conference room A conference room differentiates the LocationRoleCategory "MeetingPoint".

The data type GDT LocationRoleCategoryCode may use the following codes: 1, (ShipToLocation, e.g., a ShipToLocation is a location to which a good is to be delivered), 2, (ShipFromLocation, e.g., a ShipFromLocation is a location from which a good is to be delivered), 3, (MeetingPlace, e.g., a MeetingPlace is a location that specifies a meeting point), 4, (ReceivingLocation, e.g., a ReceivingLocation is a location to which the goods are to be delivered (from a macro-logistic perspective)), 5, (SendingLocation, e.g., a SendingLocation is a location from which the goods are to be delivered (from a macro-logistic perspective)), and 8, (ServicePoint, e.g., a ServicePoint is a location at which a service is provided).

LocationStandardID

A LocationStandardID is a standardized identifier for a location, whereby the identification scheme used is controlled by an agency from the code list DE 3055. A location is a logical or a physical place. An example of GDT LocationStandardIDCode is:

<LocationStandardID
  schemeAgencyID="9">
4012345678910
</LocationStandardID>

9=EAN.UCC (International Article Numbering association) from the code list UN/EDIFACT DE 3055

In certain implementations, GDT LocationStandardIDCode may have the following structure:

| GDT | | Cat. | Object Class | Property Qual. | Rep. Property | Ass. | Type Type | Name | Len. | Card. | Remarks |
|---|---|---|---|---|---|---|---|---|---|---|---|
| Location-StandardID | | | Location | Standard | Identification | Identifier | GDT | LocationID | 13 | | Restricted |
| | scheme-AgencyID | A | Identification Scheme Agency | | Identification | Identifier | XSD | Token | 1..3 | 1 | |

The "schemeAgencyID" identifies the agency that manages an identification scheme. The agencies from DE 3055 are used as the default, but the roles defined in DE 3055 cannot be used. Only the two codes listed are supported.

In certain implementations, schemeAgencyID is "9" (EAN.UCC) for the 13-character Global Location Number (GLN) or "116" (ANSI ASC X12) for the 13-character DUNS+4, an enhancement to DUNS (Data Universal Numbering System from Dun & Bradstreet) for location identification.

The GDT LocationStandardID represents a projection of the GDT LocationID, in which only the attribute "schemeAgencyID" is contained. This indicates the standardization organization (i.e., an organization registered in DE 3055) that assigned the ID. The attribute "schemeAgencyID" is a mandatory attribute. LocationStandardID as opposed to LocationPartyID (proprietary assigned ID). SchemeID and VersionID are to be included as attributes as soon as there is a need to differentiate between several schemes.

LockboxBatchID

A LockboxBatchID is a unique identifier for a partial quantity of checks in an externally managed storage (lockbox) for incoming checks. A partial quantity of checks (batch) is a summary of incoming checks that have the same origin or should be processed together. An example of GDT LockboxBatchIDCode is:

<LockboxBatchID>012</LockboxBatchID>

In certain implementations, GDT LockboxBatchIDCode may have the following structure:

| GDT | Object Class | Property | Representation/ Association | Type | Type Name | Len. |
|---|---|---|---|---|---|---|
| LockBoxBatchID | Lockbox Batch | Identification | Identifier | CDT | Identifier | 1..3 |

The LockboxBatchID is unique in the context of an external storage for incoming checks. LockboxBatchID is used when lockbox data is processed. The checks sent to the bank are entered by the bank for credit memo and the information entered is forwarded by file transfer to the payee. The record structure of the lockbox files may correspond to the standard format BAI. The BAI format knows partial quantities in the data file that are referred to as batch numbers. The LockboxBatchID represents this information. The lockbox file is imported using the Exchange Infrastructure (XI) and the LockboxBatchID is forwarded for further processing by message to the relevant component. LockboxBatchID is used in B2B messages. Lockboxes plan an important role in the United States. Here a house bank offers the service of managing and processing incoming checks.

LockboxBatchItemID

A LockboxBatchItemID is a unique identifier for a check within a partial quantity of checks in an externally managed storage (lockbox) for incoming checks. A partial quantity of checks (batch) is a summary of incoming checks that have the same origin or should be processed together. An example of GDT LockboxBatchItemIDCode is:

<LockboxBatchItemID>001</LockboxBatchItemID>

In certain implementations, GDT LockboxBatchItemIDCode may have the following structure:

| GDT | Object Class | Property | Representation/ Association | Type | Type Name | Len. |
|---|---|---|---|---|---|---|
| Lockbox-BatchItemID | Lockbox Batch Item | Identification | Identifier | CDT | Identifier | 1..3 |

The LockboxBatchItemID is unique in the context of an external storage for incoming checks and a partial quantity of checks. LockboxBatchItemID is used when lockbox data is processed. The checks sent to the bank are entered by the bank for credit memo and the information entered is forwarded by file transfer to the payee. The record structure of the lockbox files may correspond to the standard format BAI. The BAI format manages a batch item number for each individual check. The LockboxBatchItemID represents this information.

In certain implementations, LockboxBatchItemID is used in B2B messages. Lockboxes plan an important role in the United States. Here a house bank offers the service of managing and processing incoming checks.

LockDepthCode

A LockDepthCode is the coded representation of the depth of a lock. Locks protect data (as read locks or write locks) from parallel access by multiple users. The depth specifies which objects the lock applies to. A lock can be set for a single object or for the whole of its lower-level object hierarchy. An example of GDT LockDepthCode is:

<LockDepthCode>1</LockDepthCode>

In certain implementations, GDT LockDepthCode may have the following structure:

| GDT | Property | Representation/ Association | Type | Type Name | Len. | Remarks |
|---|---|---|---|---|---|---|
| LockDepthCode | Lock Depth | Code | CDT | Code | 1 | Restricted |

The data type GDT LockDepthCode may assign one static code list to the code. The attributes may be assigned the following values: listID="10144" and listAgencyID="310.

A LockDepthCode can be used, for example, to express that a lock applies to a single document or, in the case of a folder, for the whole of its lower-level folder hierarchy.

The data type GDT LockDepthCode may use the following codes: 1, (Shallow, e.g., Lock for the object only), and 2, (Deep, e.g., Lock for the whole object hierarchy).

LockModeCode

A LockModeCode is the coded representation of mode of an object lock. Locks protect data in different modes (as shared or exclusive locks) from simultaneous access by multiple users. An example of GDT LockModeCode is:

<LockModeCode>1</LockModeCode>

In certain implementations, GDT LockModeCode may have the following structure:

| GDT | Property | Representation/ Association | Type Type | Type Name | Len. | Remarks |
|---|---|---|---|---|---|---|
| LockModeCode | Lock Mode | Code | CDT | Code | 1 | Restricted |

The data type GDT LockModeCode may assign one static code list to the code. The attributes may be assigned the following values: listID="10243" and listAgencyID="310."The LockModeCode defines whether a lock is a shared or an exclusive lock. A shared lock allows other users to set additional shared locks but no concurrent exclusive locks for the locked data. An exclusive lock, by contrast, locks an object exclusively and thus prevents other users from setting additional shared or exclusive locks for the locked data.

The data type GDT LockModeCode may use the following codes: 1, (Shared, e.g., Shared lock A shared lock prevents other users from setting an exclusive lock to change the object for the duration of the shared lock. Additional shared locks, however, are allowed.), and 2, (Exclusive, e.g., Exclusive lock. An exclusive lock locks an object exclusively for one user. Other users can set neither shared nor exclusive locks for that object.).

Log

A Log is a sequence of messages that result when an application executes a task. An example of GDT LogCode is:

```
<Log>
  <MaximumLogItemSeverityCode>3</MaximumLog-
    ItemSeverityCode>
  <Item>
    <TypeID>001(/CCM/)</TypeID>
    <SeverityCode>3</SeverityCode>
    <Note>Catalog cameras could not be published</Note>
  </Item>
  <Item>
    <TypeID>002(/CCM/)</TypeID>
    <SeverityCode>1</SeverityCode>
    <Note>Catalog cell phones successfully published</
      Note>
  </Item>
</Log>
```

In certain implementations, GDT LogCode may have the following structure:

| GDT | | Cat. | Object Class | Property Qualifier | Property | Representation/ Association | Type | Type Name | Card. |
|---|---|---|---|---|---|---|---|---|---|
| Log | | | Log | | | Details | | | |
| | Business-Document-Processing-ResultCode | E | Log | Business-Document | Processing-Result | Code | GDT | Processing-Result-Code | 0..1 |
| | Maximum-LogItem-Code | E | Log | Maximum | LogItem Severity | Code | GDT | LogItem-Severity-Code | 0..1 |

In the above structure BusinessDocumentProcessingResultCode is the result of processing of a business document, MaximumLogItemSeverityCode is the coded representation of the maximum severity of a log message in a given log and Item is an individual log message (see GDT LogItem).

In certain implementations, at least one element may be given. If MaximumLogItemSeverityCode is set, the BusinessDocumentProcessingResultCode and/or LogItem(s) may be given. A Log can be used to transmit log messages with different levels of severity such as warnings and errors.

LogisticPackageContentTypeCode

LogisticPackageContentTypeCode is the coded representation of the type of the content of a logistic package. An example of GDT LogisticPackageContentTypeCode is:

```
<LogisticPackageContentTypeCode>1</LogisticPackage-
ContentTypeCode>
```

In certain implementations, GDT LogisticPackageContentTypeCode may have the following structure:

| GDT | Object Class | Property | Representation/ Association | Type | Type Name | Len. | Remarks |
|---|---|---|---|---|---|---|---|
| LogisticsPackage-ContentTypeCode | Logistics Package Content | Type | Code | CDT | Code | 1..2 | Restricted |

The data type GDT LogisticPackageContentTypeCode may assign one static code list to the code. The attributes may be assigned the following values: listID="10089", listAgencyID="310" and listVersionID="tbd."

The data type GDT LogisticPackageContentTypeCode may use the following codes: 1, (Material, e.g., the content of the logistic package is a material), and 2, (Logistic Unit, e.g., the content of the logistic package is a logistic unit).

LogisticPackageContentTypeCode can be used to differentiate between the kinds of items of content in a packing bill of material. The LogisticPackageTypeCode is a complete and structured list of components that defines the packing structure of logistic units.

The LogisticPackageIContentTypeCode corresponds to the R/3 detail item type of packing instructions (data element PL_DETAIL_ITEMTYPE). The GDT is defined with two digits in accordance to PL_DETAIL_ITEMTYPE.

LogisticsAreaID

A LogisticsAreaID is a unique identifier for a LogisticsArea. A LogisticsArea is an area with physical and operational features of locations in a company, used for storage and production, and groups these locations based on their logistical functions (e.g, Plant, Warehouse, Staging Area, Storage Area, etc). An example of GDT LogisticsAreaIDCode is:

<LogisticsAreaID schemeID="LogisticsAreaID" schemeAgencyID="XXX__002">Plant001</LogisticsAreaID>

In certain implementations, GDT LogisticsAreaIDCode may have the following structure:

| GDT | | Cat. | Object Class | Property | Representation/ Association | Type | Name | Len. | Card. |
|---|---|---|---|---|---|---|---|---|---|
| Logistics-AreaID | | | Logistics Area | Identification | Identifier | CDT | Identifier | 1..40 | |
| | schemeID | A | Identification Scheme | Identification | Identifier | xsd | token | 1..60 | 0..1 |
| | scheme-AgencyID | A | Identification Scheme Agency | Identification | Identifier | xsd | token | 1..60 | 0..1 |

-

The data type GDT LogisticsAreaIDCode may use the following codes 1, (schemeID, e.g., LogisticsAreaID: Identification of a LogisticsArea using an external identifier), and 2, (schemeAgencyID, e.g., Business System, which issued the ID).

LogisticsAreaLayoutGenerationSchemaCode

A LogisticsAreaLayoutGenerationSchemaCode is a coded representation of the schema used for generation of LogisticsAreaLayout. A LogisticsArea is an area with physical and operational features of locations in a company, used for storage and production, and groups these locations based on their logistical functions. LogisticsAreaLayout is a hierarchical arrangement of several logistics areas with their assigned resources in a company. Schema is a definition of the structure relationships and rules. An example of GDT LogisticsAreaLayoutGenerationSchemaCode is:

<LogisticsAreaLayoutGenerationSchemaCode>PL1</LogisticsAreaLayoutGenerationSchemaCode>

In certain implementations, GDT LogisticsAreaLayoutGenerationSchemaCode may have the following structure:

| GDT | | Cat. | Object Class | Property | Representation/ Association | Type | Name | Len. | Card. |
|---|---|---|---|---|---|---|---|---|---|
| Logistics-AreaLayout-Generation-SchemaCode | | | Logistics Area Layout Generation Schema | | Code | CDT | Code | 1..3 | |
| | list-AgencyID | A | Code List | Identification | Identifier | xsd | token | | 0..1 |
| | list-VersionID | A | Code List | Version | Identifier | xsd | token | | 0..1 |
| | list-Agency-SchemeID | A | Code List | Scheme | Identifier | xsd | token | | 0..1 |
| | list-Agency-Scheme-AgencyID | A | Code List | Scheme Agency | Identifier | xsd | token | | 0..1 |

For GDT LogisticsAreaLayoutGenerationSchemaCode, a customer-specific code list can be assigned to the code. A listID can be "10279". If the code list is unchanged, a listAgencyID can be "310." Otherwise, a listAgencyID can be the ID of the customer (e.g., ID from DE 3055, if listed there). A listVersion ID can be the version of the particular code list (e.g., assigned and managed by the customer). A listAgencySchemeID can be the ID of the scheme if the listAgencyID does not come from DE 3055. The listAgencySchemeAgencyID can be the ID of the organization from DE 3055 that manages the listAgencySchemeID scheme.

LogisticsAreaLayoutGenerationSchemaCode defines the structure for the generation of a logistics area layout by: Type of logistics areas (e.g. Warehouse, StorageArea, StagingArea etc), Relationships between the various types (e.g. StorageArea is a child of Warehouse; StagingArea is a child of StorageArea), Attribute values for each type of logistic area by means of LogisticsArea template assignments, By specifying a LogisticsAreaLayoutGenerationSchemaCode while maintaining a LogisticsArea enables the generation of the sub-ordinate layout for the LogisticsArea.

Some examples of possible code semantics may include WH1: Schema for generation of layout for Warehouse/Storage facility, and PL2: Schema for generation of layout for Production facility.

The data type GDT LogisticsAreaLayoutViewTypeCode may assign one static code list to the code. The attributes may be assigned the following values: listID=10230, and listAgencyID=310.

The data type GDT LogisticsAreaLayoutViewTypeCode may use the following codes: 1, (CompleteView, e.g., CompleteView is the complete hierarchical arrangement of several logistics areas with their assigned resources in a company), 2, (PlanningView, e.g., PlanningView is a view on the CompleteView that contains logistics areas and assigned resources that are relevant for planning purposes), 3, (StorageView, e.g., StorageView is a view on the CompleteView that contains logistics areas and assigned resources that are relevant for storage purposes), and 4, (WorkingAreaView, e.g., WorkingAreaView is a view on the CompleteView that contains logistics areas and assigned resources that are relevant from a functional perspective).

LogisticsAreaTypeCode

LogisticsAreaTypeCode is a coded representation of the type of logistics area within a logistics facility according to criteria resulting from its nature, properties and behaviour. An example of GDT LogisticsAreaTypeCode is:

<LogisticsAreaTypeCode>1</LogisticsAreaTypeCode>

In certain implementations, GDT LogisticsAreaTypeCode may have the following structure:

| GDT | | Cat. | Object Class | Property | Rep./ Ass. | Type | Name | Len. | Card. | Remarks |
|---|---|---|---|---|---|---|---|---|---|---|
| LogisticsArea-TypeCode | | | Logistics Area | Type | Code | CDT | Code | 1..3 | | restricted |
| | listID | A | Code List | Identification | Identifier | xsd | token | | 0..1 | |
| | list-AgencyID | A | Code List Agency | Identification | Identifier | xsd | token | | 0..1 | |
| | list-VersionID | A | Code List | Version | Identifier | xsd | token | | 0..1 | |
| | list-Agency-SchemeID | A | Code List Agency | Scheme | Identifier | xsd | token | | 0..1 | |
| | list-Agency-Scheme-AgencyID | A | Code List Agency | Scheme Agency | Identifier | xsd | token | | 0..1 | |

LogisticsAreaLayoutViewTypeCode

LogisticsAreaLayoutViewTypeCode is a coded representation of the type of a layout view on a logistics area layout. LogisticsAreaLayout is a hierarchical arrangement of several logistics areas with their assigned resources in a company. A LogisticsAreaLayoutView is a subset of the information contained in the LogisticsAreaLayout. An example of GDT LogisticsAreaLayoutViewTypeCode is:

<LogisticsAreaLayoutViewTypeCode>1</LogisticsAreaLayoutViewTypeCode>

In certain implementations, GDT LogisticsAreaLayoutViewTypeCode may have the following structure:

| GDT | Object Class | Property | Rep./ Ass. | Type | Name | Len. | Remarks |
|---|---|---|---|---|---|---|---|
| LogisticsArea-LayoutView-Type Code | Logistics Area_ Layout View | Type | Code | CDT | Code | 1..3 | restricted |

For GDT LogisticsAreaTypeCode, a customer-specific code list can be assigned to the code. A listID can be "10198". If the code list is unchanged, a listAgencyID can be "310." Otherwise, a listAgencyID can be the ID of the customer (e.g., ID from DE 3055, if listed there). A listVersionID can be the version of the particular code list (e.g., assigned and managed by the customer). A listAgencySchemeID can be the ID of the scheme if the listAgencyID does not come from DE 3055. The listAgencySchemeAgencyID can be the ID of the organization from DE 3055 that manages the listAgencySchemeID scheme.

Some examples of the custom codes include: Rack—Logistics Area that is a rack within a storage facility, and Section—Logistics area that is a section within a production/storage facility.

The data type GDT LogisticsAreaTypeCode may use the following codes: 1, (Plant, e.g., Logistics Area that is a plant or a production facility), 2, (Warehouse, e.g., Logistics Area that is a warehouse or a storage facility), 3, (Storage Area, e.g., Logistics Area that is a storage area within a logistics facility), 4, (Staging Area, e.g., Logistics Area that is a staging area within a logistics facility), 5, (Aisle, e.g., Logistics Area that is an aisle within a logistics facility), 6, (Bin, e.g., Logistics Area that is a storage bin within a logistics facility), and 7, (Door, e.g., Logistics Area that is a door (entry/exit point) within a logistics facility).

LogisticsBranchingID

A unique identifier of a branching in a process description in logistics. A branching is a way of structuring a process description in logistics that splits a process into several process paths. A processing path describes a directed material flow in logistics. In addition to a common starting point, the branched processing paths also have a common end point where the different paths join again. An example of GDT LogisticsBranchingIDCode is:
<LogisticsBranchingID>R2D2</LogisticsBranchingID>

In certain implementations, GDT LogisticsBranchingIDCode may have the following structure:

| GDT | Cat. | Object Class | Property | Representation/ Association | Type | Name | Len. | Remarks |
|---|---|---|---|---|---|---|---|---|
| Logistics-BranchingID | Logistics | Identification | Identifier | CDT | Identifier | 1..40 | restricted | |

-

The LogisticsBranchingID may be unique in the usage context.

LogisticsBranchingJoinID

A unique identifier of a joining of a branching in a process description in logistics. At a join, the alternative production and transportation paths that were split by a branching are reunited in one common path. An example of GDT LogisticsBranchingJoinIDCode is:
<LogisticsBranchingJoinID>C3PO</LogisticsBranchingJoinID>

In certain implementations, GDT LogisticsBranchingJoinIDCode may have the following structure:

| GDT | Object Class | Property | Representation/ Association | Type | Name | Len. | Remarks |
|---|---|---|---|---|---|---|---|
| LogisticsBranching-JoinID | Logistics Branching | Identification | Identifier | CDT | Identifier | 1..40 | Restricted |

In certain implementations, the LogisticsBranchingJoinID may be unique in the usage context.

LogisticsBranchingPathID

A unique identifier of a path of a branching in a process description in logistics. A path is a linear sequence of operations in a process description in logistics. An example of GDT LogisticsBranchingPathIDCode is:
<LogisticsBranchingPathID>F3335</LogisticsBranchingPathID>

In certain implementations, GDT LogisticsBranchingPathIDCode may have the following structure:

| GDT | Object Class | Property | Representation/ Association | Type | Name | Len. | Remarks |
|---|---|---|---|---|---|---|---|
| LogisticsBranching-PathID | Logistics Branching Path | Identification | Identifier | CDT | Identifier | 1..40 | Restricted |

In certain implementations, the LogisticsBranchingPathID may be unique in the usage context.

LogisticsConfirmationMethodCode

A LogisticsConfirmationMethodCode is the coded representation of the method used for confirmations in logistics. A logistic confirmation records the progress of a logistic process, for example, goods movement or component consumption. An example of GDT LogisticsConfirmationMethodCode is:

<LogisticsConfirmationMethodCode>1</LogisticsConfirmationMethodCode>

In certain implementations, GDT LogisticsConfirmationMethodCode may have the following structure:

| GDT | Object Class | Property | Representation/ Association | Type | Name | Len. | Remarks |
|---|---|---|---|---|---|---|---|
| LogisticsConfirmation-MethodCode | Logistics Confirmation | Method | Code | CDT | Code | 1..2 | Restricted |

The data type GDT LogisticsConfirmationMethodCode may assign one static code list to the code. The attributes may be assigned the following values: listID="10139" and listAgencyID="310."

The data type GDT LogisticsConfirmationMethodCode may use the following codes: 1, (Backflush, e.g., Quantities or durations are determined some time later, that is, they are calculated and reported depending on another value reported. Which value is used as the basis for calculating the quantities and durations depends on the context.), and 2, (Explicit, e.g., Quantities and durations may be confirmed explicitly).

This code is used to determine which procedure is to be used for logistic confirmations, such as material consumptions and receipts. The consumption of expensive materials or materials that cannot be procured easily will usually be confirmed explicitly, whereas cheaper materials will be reported later when the completion of an intermediate product quantity is reported (backflush).

LogisticsDeviationReasonCode

A LogisticsDeviationReasonCode is a coded representation of the reason for a deviation between the result of a logistics process and the expected result. An example of GDT LogisticsDeviationReasonCode is:

<LogisticsDeviationReasonCode>1</LogisticsDeviationReasonCode>

In certain implementations, GDT LogisticsDeviationReasonCode may have the following structure:

| GDT | | Cat. | Object Class | Property | Representation/ Association | Type | Name | Len. | Card. | Remarks |
|---|---|---|---|---|---|---|---|---|---|---|
| LogisticsDeviation-ReasonCode | | | Logistics Deviation | Reason | Code | CDT | Code | 1..4 | | restricted |
| | list-AgencyID | A | Code List Agency | Identification | Identifier | xsd | token | | 0..1 | |
| | list-VersionID | A | Code List | Version | Identifier | xsd | token | | 0..1 | |
| | listAgency-SchemeID | A | Code List Agency | Scheme | Identifier | xsd | token | | 0..1 | |
| | listAgency-Scheme-AgencyID | A | Code List Agency | Scheme Agency | Identifier | xsd | token | | 0..1 | |

For GDT LogisticsDeviationReasonCode, a customer-specific code list can be assigned to the code. A listID can be "10307". If the code list is unchanged, the listAgencyID can be "310." Otherwise, a listAgencyID can be the ID of the customer (e.g., ID from DE 3055, if listed there). A listVersionID can be the version of the particular code list (e.g., assigned and managed by the customer). A listAgencySchemeID can be the ID of the scheme if the listAgencyID does not come from DE 3055. The listAgencySchemeAgencyID can be the ID of the organization from DE 3055 that manages the listAgencySchemeID scheme.

GDT LogisticsDeviationReasonCode is used to document the reason for a difference between expected and actual data reported in a logistics process (for example, in a production or a site logistics process). The deviation reason may trigger a follow up action to resolve the problem that caused the deviation. Examples of a logistics deviation reason could be Blocked Bin—Deviation is caused by a bin that cannot be accessed, or Damaged Material—Deviation is caused by a damaged material.

LogisticsPackageTypeCode

A LogisticsPackageTypeCode is the coded representation of the type of a package as it is used in logistics for storing and shipping goods. An example of GDT LogisticsPackageTypeCode is:

<LogisticsPackageTypeCode>1</LogisticsPackageTypeCode>

In certain implementations, GDT LogisticsPackageTypeCode may have the following structure:

| GDT | Object Class | Property | Representation/ Association | Type | Name | Len. | Card. | Remarks |
|---|---|---|---|---|---|---|---|---|
| LogisticsPackage-TypeCode | LogisticsPackage | Type | Code | CDT | Code | 1 | 1 | Restricted |

The data type GDT LogisticsPackageTypeCode may assign one static code list to the code. The attributes may be assigned the following values list: listID="10071" and listAgencyID="310."

The data type GDT LogisticsPackageTypeCode may use the following codes: 1, (i.e., HandlingUnit, for example, is a LogisticsPackage that can be identified individually, such as a uniquely labeled container), and 2, (i.e., LogisticsUnit, for example, is a LogisticsPackage that cannot be identified individually, such as boxes in a certain storage bin).

In Logistics, the LogisticsPackageTypeCode defines the type of a packed unit in more detail.

LogisticsPlanningDetailLevelCode

A LogisticsPlanningDetailLevelCode is the coded representation of the level of detail for planning in logistics. An example of GDT LogisticsPlanningDetailLevelCode is:

<LogisticsPlanningDetailLevelCode>1</LogisticsPlanningDetailLevelCode>

In certain implementations, GDT LogisticsPlanningDetailLevelCode may have the following structure:

| GDT | Object Class | Property | Representation/ Association | Type | Name | Len. | Remarks |
|---|---|---|---|---|---|---|---|
| LogisticsPlanning-DetailLevel-Code | Logistics Planning | Detail Level | Code | CDT | Code | 1 | restricted |

The data type GDT LogisticsPlanningDetailLevelCode may assign one static code list to the code. The attributes may be assigned the following values: listID="10276" and listAgencyID "310."

The LogisticsPlanningDetailLevelCode determines the level of detail for planning with regard to production.

The data type GDT LogisticsPlanningDetailLevelCode may use the following codes: 1, (i.e., RoughCut, for example, low level of detail).

LogisticsSegmentExecutionPhaseCode

A LogisticsSegmentExecutionPhaseCode is the coded representation of a phase in the execution of a logistics segment. An example of GDT LogisticsSegmentExecutionPhaseCode is:
<LogisticsSegmentExecutionPhaseCode>1</LogisticsSegmentExecutionPhaseCode>
In certain implementations, GDT LogisticsSegmentExecutionPhaseCode may have the following structure:

| GDT | Object Class | Property | Representation/ Association | Type | Name | Len. | Remarks |
|---|---|---|---|---|---|---|---|
| LogisticsSegment-Execution-PhaseCode | Logistics Segment | Execution Phase | Code | CDT | Code | 1 | restricted |

The data type GDT LogisticsSegmentExecutionPhaseCode may assign one static code list to the code. The attributes may be assigned the following values: listID="10458" and listID="310."

LogisticsSegmentExecutionPhaseCode is used to distinguish between different phases in the execution of a logistics segment. For example, a progress notification message to supply chain control can be sent at the end of the execution of a logistics segment.

The data type GDT LogisticsSegmentExecutionPhaseCode may use the following codes: 1, (Start, e.g., start of logistics segment execution) and 2, (End, e.g., end of logistics segment execution).

LogisticsTaskFolderID

A LogisticsTaskFolderID is a unique identifier for a logistics task folder. A logistics task folder is a folder for storing and grouping of logistics tasks according to business criteria. It determines the business assignment criteria that a logistics task may meet to be stored in a specific folder and contains details about the processors that are registered at the folder. An example of GDT LogisticsTaskFolderIDCode is:
<LogisticsTaskFolderID>DRILLING_MACHINE__1</LogisticsTaskFolderID>
In certain implementations, the GDT LogisticsTaskFolderIDCode may have the following structure:

| GDT | | Cat. | Object Class | Property | Representation/ Association | Type | Name | Len. | Card. | Remarks |
|---|---|---|---|---|---|---|---|---|---|---|
| LogisticsTask-FolderID | | | Logistics Task Folder | Identification | Identifier | CDT | Identifier | 1..40 | | Restricted |
| | Scheme-AgencyID | A | Identification Scheme Agency | Identification | Identifier | xsd | token | 1..60 | 0..1 | |

In certain implementations, the attributes of LogisticsTaskFolderID may be populated as follows: SchemeID is “LogisticsTaskFolderID” and schemeAgencyID is the Business System which issued the ID.

The data type GDT LogisticsTaskFolderIDCode may use the following qualifiers: 1, (SenderLogisticsTaskFolderID, e.g., Logistics task folder from which a logistics task was sent).

LogisticsTaskFolderRegistrantTypeCode

A LogisticsTaskFolderRegistrantTypeCode is the coded representation of the type of object registered at a logistics task folder. A logistics task folder is a folder for storing and grouping of logistics tasks according to business criteria. It determines the business assignment criteria that a logistics task may meet to be stored in a specific folder and contains details about the processors that are registered at the folder. An example of GDT LogisticsTaskFolderRegistrantTypeCode is:

<LogisticsTaskFolderRegistrantTypeCode>1</LogisticsTaskFolderRegistrantTypeCode>

In certain implementations, GDT LogisticsTaskFolderRegistrantTypeCode may have the following structure:

| GDT | Object Class | Property | Representation/ Association | Type | Name | Len. | Remarks |
|---|---|---|---|---|---|---|---|
| LogisticsTask-FolderRegistrant-TypeCode | Logistics Task Folder Registrant | Type | Code | CDT | Code | 1..2 | Restricted |

The data type GDT LogisticsTaskFolderRegistrantTypeCode may assign one static code list to the code. The attributes may be assigned the following values: listID=“10155” and listAgencyID=“310.”.

The data type GDT LogisticsTaskFolderRegistrantTypeCode may use the following codes: 1, (User, e.g., the object registered is a user), and 2, (End-user device, e.g., the object registered is an end-user device).

LogisticsTaskFolderTypeCode

A LogisticsTaskFolderTypeCode is the coded representation of the type of the logistics task folder. A logistics task folder is a folder for storing and grouping of logistics tasks according to business criteria. It determines the business assignment criteria that a logistics task may meet to be stored in a specific folder and contains details about the processors that are registered at the folder. An example of GDT LogisticsTaskFolderTypeCode is:

<LogisticsTaskFolderTypeCode>1</LogisticsTaskFolderTypeCode>

In certain implementations, GDT LogisticsTaskFolderTypeCode may have the following structure:

| GDT | Object Class | Property | Representation/ Association | Type | Name | Len. | Remarks |
|---|---|---|---|---|---|---|---|
| LogisticsTask-Folder-TypeCode | Logistics Task Folder | Type | Code | CDT | Code | 1..2 | Restricted |

The data type GDT LogisticsTaskFolderTypeCode may assign one static code list to the code. The attributes may be assigned the following values: listID=10154 and listAgencyID=310.

The GDT is used to restrict what a logistics task folder is used for and how it behaves. The data type GDT LogisticsTaskFolderTypeCode may use the following codes: 1, (Standard, e.g., Folder for storing tasks that can be assigned), 2, (Exception, e.g., Folder for storing tasks that cannot be assigned initially), and 3, (Template, e.g., Template for creating new folders).

LogisticsTaskGenerationInstruction

A LogisticsTaskGenerationInstruction is the instruction that determines how a logistics task is created. A logistics task is a work instruction for a person or resource in logistics. In the instruction for logistics task generation, the generation method and the type of the referenced object are determined. An example of GDT LogisticsTaskGenerationInstructionCode is:

<LogisticsTaskGenerationInstruction>

<LogisticsTaskGenerationMethodCode>1</LogisticsTaskGenerationMethodCode>

<LogisticsTaskReferencedObjectTypeCode>1</LogisticsTaskReferencedObjectTypeCode>

</LogisticsTaskGenerationInstruction>

In certain implementations, GDT LogisticsTaskGenerationInstructionCode may have the following structure:

| GDT | | Cat. | Object Class | Property Qualifier | Property | Rep./ Ass. Qual. | Rep./ Ass. | Type | Type Name | Len. | Card. |
|---|---|---|---|---|---|---|---|---|---|---|---|
| LogisticsTask-Generation-Instruction | | | Logistics Task Generation Instruction | | | | Details | | | | |
| | LogisticsTask-Generation-MethodCode | E | Logistics Task Generation Instruction | Method | Code | | Code | GDT | LogisticsTask-Generation-MethodCode | 1..2 | 1 |
| | LogisticsTask-Reference-Target-TypeCode | E | Logistics Task Generation Instruction | Type | Code | | Code | GDT | LogisticsTask-Reference-Target-TypeCode | 1..2 | 1 |

-

LogisticsTaskGenerationMethodCode is the coded representation of the method for creating the logistics task. The method for creating a logistics task specifies whether creation is triggered manually by the user or automatically by the system when the logistics lot is released.

LogisticsTaskReferencedObjectTypeCode is the coded representation of the type of the referenced object of a logistics task. The referenced object of a logistics task represents the node of another business object to which the logistics task refers, for example, an operation of a production lot. The type of a referenced object restricts the type of nodes to which a logistics task may refer.

The GDT LogisticsTaskGenerationInstruction is used in master data in the bill of operations to determine the instruction for logistics task creation. In addition, the GDT is used in the logistics order to be able to overwrite the instruction defined in master data for a specific order.

LogisticsTaskGenerationMethodCode

A LogisticsTaskGenerationMethodCode is the coded representation of the method used for creating a logistics task. A logistics task is a work instruction for a person or resource in logistics. An example of GDT LogisticsTaskGenerationMethodCode is:

<LogisticsTaskGenerationMethodCode>1</LogisticsTaskGenerationMethodCode>

In certain implementations, GDT LogisticsTaskGenerationMethodCode may have the following structure:

| GDT | Object Class | Property | Representation/ Association | Type | Type Name | Len. | Remarks |
|---|---|---|---|---|---|---|---|
| LogisticsTask-Generation-MethodeCode | Logistics Task Generation | Method | Code | CDT | Code | 1..2 | Restricted |

The data type GDT LogisticsTaskGenerationMethodCode may assign one static code list to the code. The attributes may be assigned the following values: listID="10172" and listAgencyID "310."

The data type GDT LogisticsTaskGenerationMethodCode may use the following codes: 1, (Manual, e.g., the logistics task is created manually), and 2, (Operation Release, e.g., the logistics task is created automatically when a logistics operation is released).

LogisticsTaskGenerationStrategyCode

A LogisticsTaskGenerationStrategyCode is the coded representation of a strategy for creating logistics tasks. A logistics task is a task that a processor executes at a specific time at a predefined work step within a production or site logistics process. An example of GDT LogisticsTaskGenerationStrategyCode is:

<LogisticsTaskGenerationStrategyCode>1</LogisticsTaskGenerationStrategyCode>

In certain implementations, GDT LogisticsTaskGenerationStrategyCode may have the following structure:

| GDT | Object Class | Property | Representation/ Association | Type | Type Name | Len. | Remarks |
|---|---|---|---|---|---|---|---|
| LogisticsTask-Generation-StrategyCode | Logistics Task | Generation Strategy | Code | CDT | Code | 1..2 | restricted |

The data type GDT LogisticsTaskGenerationStrategyCode may assign one static code list to the code. The attributes may be assigned the following values: listID=10409 and listAgencyID=310.

The LogisticsTaskGenerationStrategy determines for which parts of a bill of operations or a logistics order logistics tasks are created and what its validity area is. The validity area of a logistics task is defined by the GDT_LogisticsTaskScope. The GDT LogisticsTaskGenerationStrategyCode is part of the GDT LogisticsTaskGenerationInstruction.

The data type GDT LogisticsTaskGenerationStrategyCode may use the following codes: 1, (Activity, e.g., Creation of logistics tasks per activity. The validity area of a logistics task consists of one activity), 2, (Operation, e.g., Creation of logistics tasks per operation. The validity area of a logistics task consists of one operation), 3, (Activity including Reporting Points, e.g., Creation of logistics tasks per activity. The validity area of the logistics task consists of one activity and the corresponding reporting points), 4, (Operation including Reporting Points, e.g., Creation of logistics tasks per operation. The validity area of the logistics task consists of one operation and the corresponding reporting points), 5, (Reporting Point including Operations and Activities, e.g. Creation of logistics tasks per reporting point. The validity area of the logistics task consists of the reporting point and the corresponding operations and activities that lie between the reporting point and the previous reporting point), 6, (Reporting Point and Operations, e.g., Creation of logistics tasks for one reporting point and one operation. The validity area of the logistics task consists of one reporting point or of one operation), and 7, (Reporting Point and Activities, e.g., Creation of logistics tasks for one reporting point and one activity. The validity area of the logistics task consists of one reporting point or of one activity).

LogisticsTaskProcessor

A LogisticsTaskProcessor is the processor of a logistics task. The processor of a logistics task may be either a person or a resource. A logistics task is a work instruction for this processor. An example of GDT LogisticsTaskProcessor code is:

<LogisticsTaskProcessor>
<UserAccountID></UserAccountID>
<ResourceUUID>Equipment001</ResourceUUID>
<LogisticsTaskProcessor>

In certain implementations, GDT LogisticsTaskProcessor Code may have the following structure:

| GDT | | Cat. | Object Class | Property Qualifier | Property | Rep./Ass. Qual. | Rep./ Ass. | Type | Type Name | Card. |
|---|---|---|---|---|---|---|---|---|---|---|
| LogisticsTask-Processor | | | Logistics Task Processor | | | | Details | | | |
| | User-AccountID | E | Logistics Task Processor | User Account | Identification | | Identifier | GDT | User-AccountID | 0..1 |
| | Resource-UUID | E | Logistics Task Processor | Resource | Identification | | Identifier | GDT | UUID | 0..1 |
| | Resource-TypeCode | E | Logistics Task Processor | Resource | Type | | Code | GDT | Resource-TypeCode | 0..1 |

In the above structure, UserAccountID is an identifier of the person who processes the task, ResourceUUID is an identifier of the resource that processes the task, ResourceTypeCode is a type of the resource that processes the task.

A LogisticsTaskProcessor may be either a person or a resource, this means that LogisticsTaskProcessorUserAccountID and LogisticsTaskProcessorResourceUUID cannot be specified together at the same time.

LogisticsTaskReferencedObjectTypeCode

A LogisticsTaskReferencedObjectTypeCode is the coded representation of the type of the referenced object of a logistics task. A logistics task is a work instruction for a person or resource in logistics. The referenced object of a logistics task represents the node of another business object to which the logistics task refers, for example, an operation of a production lot. The type of a referenced object restricts the type of nodes to which a logistics task may refer. An example of GDT LogisticsTaskReferencedObjectTypeCode is:

<LogisticsTaskReferencedObjectTypeCode>1</LogisticsTaskReferencedObjectTypeCode>

In certain implementations, GDT LogisticsDeviationReasonCode may have the following structure:

| GDT | | Cat. | Object Class | Property | Representation/ Association | Type | Type Name | Len. | Card. | Remarks |
|---|---|---|---|---|---|---|---|---|---|---|
| Logistics-Deviation-ReasonCode | | | Logistics Deviation | Reason | Code | CDT | Code | 1..4 | | restricted |
| | list-AgencyID | A | Code List Agency | Identification | Identifier | xsd | token | | 0..1 | |
| | list-VersionID | A | Code List | Version | Identifier | xsd | token | | 0..1 | |
| | listAgency-SchemeID | A | Code List Agency | Scheme | Identifier | xsd | token | | 0..1 | |
| | listAgency-Scheme-AgencyID | A | Code List Agency | Scheme Agency | Identifier | xsd | token | | 0..1 | |

For GDT LogisticsDeviationReasonCode, a customer-specific code list can be assigned to the code. A listID can be "10307". If the code list is unchanged, the listAgencyID can be "310." Otherwise, a listAgencyID can be the ID of the customer (e.g., ID from DE 3055, if listed there). A listVersionID can be the version of the particular code list (e.g., assigned and managed by the customer). A listAgencySchemeID can be the ID of the scheme if the listAgencyID does not come from DE 3055. The listAgencySchemeAgencyID can be the ID of the organization from DE 3055 that manages the listAgencySchemeID scheme.

GDT LogisticsDeviationReasonCode is used to document the reason for a difference between expected and actual data reported in a logistics process (for example, in a production or a site logistics process). The deviation reason may trigger a follow up action to resolve the problem that caused the deviation. Examples of a logistics deviation reason could be Blocked Bin—Deviation is caused by a bin that cannot be accessed, or Damaged Material—Deviation is caused by a damaged material.

LogisticsPackageTypeCode

A LogisticsPackageTypeCode is the coded representation of the type of a package as it is used in logistics for storing and shipping goods. An example of GDT LogisticsPackageTypeCode is:

<LogisticsPackageTypeCode>1</LogisticsPackageTypeCode>

In certain implementations, GDT LogisticsPackageTypeCode may have the following structure:

| GDT | Object Class | Property | Representation/ Association | Type | Type Name | Len. | Card. | Remarks |
|---|---|---|---|---|---|---|---|---|
| LogisticsPackage-TypeCode | Logistics-Package | Type | Code | CDT | Code | 1 | 1 | Restricted |

The data type GDT LogisticsPackageTypeCode may assign one static code list to the code. The attributes may be assigned the following values list: listID="10071" and listAgencyID="310."

The data type GDT LogisticsPackageTypeCode may use the following codes: 1, (i.e., HandlingUnit, for example, is a LogisticsPackage that can be identified individually, such as a uniquely labeled container), and 2, (i.e., LogisticsUnit, for example, is a LogisticsPackage that cannot be identified individually, such as boxes in a certain storage bin).

In Logistics, the LogisticsPackageTypeCode defines the type of a packed unit in more detail.

LogisticsPlanningDetailLevelCode

A LogisticsPlanningDetailLevelCode is the coded representation of the level of detail for planning in logistics. An example of GDT LogisticsPlanningDetailLevelCode is:

<LogisticsPlanningDetailLevelCode>1</LogisticsPlanningDetailLevelCode>

In certain implementations, GDT LogisticsPlanningDetailLevelCode may have the following structure:

| GDT | Object Class | Property | Representation/ Association | Type | Type Name | Len. | Remarks |
|---|---|---|---|---|---|---|---|
| LogisticsPlanning-Detail-LevelCode | Logistics Planning | Detail Level | Code | CDT | Code | 1 | restricted |

The data type GDT LogisticsPlanningDetailLevelCode may assign one static code list to the code. The attributes may be assigned the following values: listID="10276" and listAgencyID="310."

The LogisticsPlanningDetailLevelCode determines the level of detail for planning with regard to production.

The data type GDT LogisticsPlanningDetailLevelCode may use the following codes: 1, (i.e., RoughCut, for example, low level of detail).

LogisticsSegmentExecutionPhaseCode

A LogisticsSegmentExecutionPhaseCode is the coded representation of a phase in the execution of a logistics segment. An example of GDT LogisticsSegmentExecutionPhaseCode is:

<LogisticsSegmentExecutionPhaseCode>1</LogisticsSegmentExecutionPhaseCode>

In certain implementations, GDT LogisticsSegmentExecutionPhaseCode may have the following structure:

| GDT | Cat. | Object Class | Property | Representation/ Association | Type | Type Name | Len. | Card. | Remarks |
|---|---|---|---|---|---|---|---|---|---|
| LogisticsSegment-Execution-PhaseCode | | Logistics Segment | Execution Phase | Code | CDT | Code | 1 | | restricted |

The data type GDT LogisticsSegmentExecutionPhaseCode may assign one static code list to the code. The attributes may be assigned the following values: listID="10458" and listID="310."

LogisticsSegmentExecutionPhaseCode is used to distinguish between different phases in the execution of a logistics segment. For example, a progress notification message to supply chain control can be sent at the end of the execution of a logistics segment.

The data type GDT LogisticsSegmentExecutionPhaseCode may use the following codes: 1, (Start, e.g., start of logistics segment execution) and 2, (End, e.g., end of logistics segment execution).

LogisticsTaskFolderID

A LogisticsTaskFolderID is a unique identifier for a logistics task folder. A logistics task folder is a folder for storing and grouping of logistics tasks according to business criteria. It determines the business assignment criteria that a logistics task may meet to be stored in a specific folder and contains details about the processors that are registered at the folder. An example of GDT LogisticsTaskFolderIDCode is:

<LogisticsTaskFolderID>DRILLING_MACHINE__1</LogisticsTaskFolderID>

In certain implementations, the GDT LogisticsTaskFolderIDCode may have the following structure:

| GDT | | Cat. | Object Class | Property | Association | Representation/ Type | Type Name | Len. | Card. | Remarks |
|---|---|---|---|---|---|---|---|---|---|---|
| LogisticsTask-FolderID | | | Logistics Task Folder | Identification | Identifier | CDT | Identifier | 1..40 | | Restricted |
| | scheme-AgencyID | A | Identification Scheme Agency | Identification | Identifier | xsd | token | 1..60 | 0..1 | |

-

In certain implementations, the attributes of LogisticsTaskFolderID may be populated as follows: SchemeID is "LogisticsTaskFolderID" and schemeAgencyID is the Business System which issued the ID.

The data type GDT LogisticsTaskFolderIDCode may use the following qualifiers: 1, (SenderLogisticsTaskFolderID, e.g., Logistics task folder from which a logistics task was sent).

LogisticsTaskFolderRegistrantTypeCode

A LogisticsTaskFolderRegistrantTypeCode is the coded representation of the type of object registered at a logistics task folder. A logistics task folder is a folder for storing and grouping of logistics tasks according to business criteria. It determines the business assignment criteria that a logistics task may meet to be stored in a specific folder and contains details about the processors that are registered at the folder. An example of GDT LogisticsTaskFolderRegistrantTypeCode is:

<LogisticsTaskFolderRegistrantTypeCode>1</LogisticsTaskFolderRegistrantTypeCode>

In certain implementations, GDT LogisticsTaskFolderRegistrantTypeCode may have the following structure:

| GDT | Object Class | Property | Representation/ Association | Type | Type Name | Len. | Remarks |
|---|---|---|---|---|---|---|---|
| LogisticsTask-FolderRegistrant-Type Code | Logistics Task Folder Registrant | Type | Code | CDT | Code | 1..2 | Restricted |

The data type GDT LogisticsTaskFolderRegistrantTypeCode may assign one static code list to the code. The attributes may be assigned the following values: listID="10155" and listAgencyID="310.".

The data type GDT LogisticsTaskFolderRegistrantTypeCode may use the following codes: 1, (User, e.g., the object registered is a user), and 2, (End-user device, e.g., the object registered is an end-user device).

LogisticsTaskFolderTypeCode

A LogisticsTaskFolderTypeCode is the coded representation of the type of the logistics task folder. A logistics task folder is a folder for storing and grouping of logistics tasks according to business criteria. It determines the business assignment criteria that a logistics task may meet to be stored in a specific folder and contains details about the processors that are registered at the folder. An example of GDT LogisticsTaskFolderTypeCode is:

<LogisticsTaskFolderTypeCode>1</LogisticsTaskFolderTypeCode>

In certain implementations, GDT LogisticsTaskFolderTypeCode may have the following structure:

| GDT | Object Class | Property | Representation/ Association | Type | Type Name | Len. | Remarks |
|---|---|---|---|---|---|---|---|
| LogisticsTask-Folder-TypeCode | Logistics Task Folder | Type | Code | CDT | Code | 1..2 | Restricted |

The data type GDT LogisticsTaskFolderTypeCode may assign one static code list to the code. The attributes may be assigned the following values: listID=10154 and listAgencyID=310.

The GDT is used to restrict what a logistics task folder is used for and how it behaves. The data type GDT LogisticsTaskFolderTypeCode may use the following codes: 1, (Standard, e.g., Folder for storing tasks that can be assigned), 2, (Exception, e.g., Folder for storing tasks that cannot be assigned initially), and 3, (Template, e.g., Template for creating new folders).

LogisticsTaskGenerationInstruction

A LogisticsTaskGenerationInstruction is the instruction that determines how a logistics task is created. A logistics task is a work instruction for a person or resource in logistics. In the instruction for logistics task generation, the generation method and the type of the referenced object are determined. An example of GDT LogisticsTaskGenerationInstructionCode is:

<LogisticsTaskGenerationInstruction>
<LogisticsTaskGenerationMethodCode>1</LogisticsTaskGenerationMethodCode>
<LogisticsTaskReferencedObjectTypeCode>1</LogisticsTaskReferencedObjectTypeCode>
</LogisticsTaskGenerationInstruction>

In certain implementations, GDT LogisticsTaskGenerationInstructionCode may have the following structure:

| GDT | | Cat. | Object Class | Property Qualifier | Property | Rep./Ass. Quail. | Rep./ Ass. | Type | Type Name | Len. | Card. |
|---|---|---|---|---|---|---|---|---|---|---|---|
| LogisticsTask-Generation-Instruction | | | Logistics Task Generation Instruction | | | | Details | | | | |
| | LogisticsTask-Generation-MethodCode | E | Logistics Task Generation Instruction | Method | Code | | Code | GDT | LogisticsTask-Generation-MethodCode | 1..2 | 1 |
| | LogisticsTask-ReferenceTarget-TypeCode | E | Logistics Task Generation Instruction | Type | Code | | Code | GDT | LogisticsTask-ReferenceTarget-TypeCode | 1..2 | 1 |

LogisticsTaskGenerationMethodCode is the coded representation of the method for creating the logistics task. The method for creating a logistics task specifies whether creation is triggered manually by the user or automatically by the system when the logistics lot is released.

LogisticsTaskReferencedObjectTypeCode is the coded representation of the type of the referenced object of a logistics task. The referenced object of a logistics task represents the node of another business object to which the logistics task refers, for example, an operation of a production lot. The type of a referenced object restricts the type of nodes to which a logistics task may refer.

The GDT LogisticsTaskGenerationInstruction is used in master data in the bill of operations to determine the instruction for logistics task creation. In addition, the GDT is used in the logistics order to be able to overwrite the instruction defined in master data for a specific order.

LogisticsTaskGenerationMethodCode

A LogisticsTaskGenerationMethodCode is the coded representation of the method used for creating a logistics task. A logistics task is a work instruction for a person or resource in logistics. An example of GDT LogisticsTaskGenerationMethodCode is:

<LogisticsTaskGenerationMethodCode>1</LogisticsTaskGenerationMethodCode>

In certain implementations, GDT LogisticsTaskGenerationMethodCode may have the following structure:

| GDT | Object Class | Property | Representation/ Association | Type | Type Name | Len. | Remarks |
|---|---|---|---|---|---|---|---|
| LogisticsTask-Generation-MethodeCode | Logistics Task Generation | Method | Code | CDT | Code | 1..2 | Restricted |

The data type GDT LogisticsTaskGenerationMethodCode may assign one static code list to the code. The attributes may be assigned the following values: listID="10172" and listAgencyID="310."

The data type GDT LogisticsTaskGenerationMethodCode may use the following codes: 1, (Manual, e.g., the logistics task is created manually), and 2, (Operation Release, e.g., the logistics task is created automatically when a logistics operation is released).

LogisticsTaskGenerationStrategyCode

A LogisticsTaskGenerationStrategyCode is the coded representation of a strategy for creating logistics tasks. A logistics task is a task that a processor executes at a specific time at a predefined work step within a production or site logistics process. An example of GDT LogisticsTaskGenerationStrategyCode is:

<LogisticsTaskGenerationStrategyCode>1</LogisticsTaskGenerationStrategyCode>

In certain implementations, GDT LogisticsTaskGenerationStrategyCode may have the following structure:

| GDT | Object Class | Property | Representation/ Association | Type | Type Name | Len. | Remarks |
|---|---|---|---|---|---|---|---|
| LogisticsTask-Generation-StrategyCode | Logistics Task | Generation Strategy | Code | CDT | Code | 1..2 | restricted |

The data type GDT LogisticsTaskGenerationStrategyCode may assign one static code list to the code. The attributes may be assigned the following values: listID=10409 and listAgencyID=310.

The LogisticsTaskGenerationStrategy determines for which parts of a bill of operations or a logistics order logistics tasks are created and what its validity area is. The validity area of a logistics task is defined by the GDT_LogisticsTaskScope. The GDT LogisticsTaskGenerationStrategyCode is part of the GDT LogisticsTaskGenerationInstruction.

The data type GDT LogisticsTaskGenerationStrategyCode may use the following codes: 1, (Activity, e.g., Creation of logistics tasks per activity. The validity area of a logistics task consists of one activity), 2, (Operation, e.g., Creation of logistics tasks per operation. The validity area of a logistics task consists of one operation), 3, (Activity including Reporting Points, e.g., Creation of logistics tasks per activity. The validity area of the logistics task consists of one activity and the corresponding reporting points), 4, (Operation including Reporting Points, e.g., Creation of logistics tasks per operation. The validity area of the logistics task consists of one operation and the corresponding reporting points), 5, (Reporting Point including Operations and Activities, e.g. Creation of logistics tasks per reporting point. The validity area of the logistics task consists of the reporting point and the corresponding operations and activities that lie between the reporting point and the previous reporting point), 6, (Reporting Point and Operations, e.g., Creation of logistics tasks for one reporting point and one operation. The validity area of the logistics task consists of one reporting point or of one operation), and 7, (Reporting Point and Activities, e.g., Creation of logistics tasks for one reporting point and one activity. The validity area of the logistics task consists of one reporting point or of one activity).

LogisticsTaskProcessor

A LogisticsTaskProcessor is the processor of a logistics task. The processor of a logistics task may be either a person or a resource. A logistics task is a work instruction for this processor. An example of GDT LogisticsTaskProcessor code is:

<LogisticsTaskProcessor>

<UserAccountID></UserAccountID>

<ResourceUUID>Equipment001</ResourceUUID>

<LogisticsTaskProcessor>

In certain implementations, GDT LogisticsTaskProcessor Code may have the following structure:

| GDT | | Cat. | Object Class | Property Qualifier | Property | Rep./Ass. Quail. | Rep./ Ass. | Type | Type Name | Card. |
|---|---|---|---|---|---|---|---|---|---|---|
| LogisticsTask-Processor | | | Logistics Task Processor | | | | Details | | | |
| | User-AccountID | E | Logistics Task Processor | User-Account | Identification | | Identifier | GDT | User- | 0..1 |
| | Resource-UUID | E | Logistics Task Processor | Resource | Identification | | Identifier | GDT | UUID | 0..1 |
| | Resource-TypeCode | E | Logistics Task Processor | Resource | Type | | Code | GDT | Resource-TypeCode | 0..1 |

In the above structure, UserAccountID is an identifier of the person who processes the task, ResourceUUID is an identifier of the resource that processes the task, ResourceTypeCode is a type of the resource that processes the task.

A LogisticsTaskProcessor may be either a person or a resource, this means that LogisticsTaskProcessorUserAccountID and LogisticsTaskProcessorResourceUUID cannot be specified together at the same time.

LogisticsTaskReferencedObjectTypeCode

A LogisticsTaskReferencedObjectTypeCode is the coded representation of the type of the referenced object of a logistics task. A logistics task is a work instruction for a person or resource in logistics. The referenced object of a logistics task represents the node of another business object to which the logistics task refers, for example, an operation of a production lot. The type of a referenced object restricts the type of nodes to which a logistics task may refer. An example of GDT LogisticsTaskReferencedObjectTypeCode is:

<LogisticsTaskReferencedObjectTypeCode>1</LogisticsTaskReferencedObjectTypeCode>

In certain implementations, GDT LogisticsTaskReferencedObjectTypeCode may have the following structure:

| GDT | Object Class | Property | Representation/ Association | Type | Name | Len. | Remarks |
|---|---|---|---|---|---|---|---|
| LogisticsTaskReference-ObjectTypeCode | Logistics Task | Referenced_ Object Type | Code | CDT | Code | 1 . . . 2 | Restricted |

-

The data type GDT LogisticsTaskReferencedObjectTypeCode may assign one static code list to the code. The attributes may be assigned the following values: listID="10174" and listAgencyID="310."

The data type GDT LogisticsTaskReferencedObjectTypeCode may use the following codes: 1, (Operation, e.g., the referenced object is an operation), 2, (Activity, e.g., the referenced object is an activity), and 3, (Reporting Point, e.g., the referenced object is a reporting point).

LogisticsTaskScopeCode

A LogisticsTaskScopeCode is the coded representation of a validity area of a logistics task. The validity area of a logistics task is the grouping of structural elements such as the operations, activities, and reporting points of a process description that are executed or confirmed together. A logistics task is a task that a processor executes at a specific time at a predefined work step within a production or site logistics process. An example of GDT LogisticsTaskScopeCode is:

<LogisticsTaskTypeCode>1</LogisticsTaskTypeCode>

In certain implementations, GDT LogisticsTaskScopeCode may have the following structure:

| GDT | Object Class | Property | Representation/ Association | Type | Name | Len. | Remarks |
|---|---|---|---|---|---|---|---|
| LogisticsTaskScope-Code | LogisticsTask | Scope | Code | CDT | Code | 1 . . . 2 | restricted |

The data type GDT LogisticsTaskScopeCode may assign one static code list to the code. The attributes may be assigned the following values: listID=10421, and listAgencyID=310.

The data type GDT LogisticsTaskScopeCode may use the following codes: 1, (Reporting Point, e.g., The validity area of a logistics task consists of one reporting point), 2, (Operation, e.g., The validity area of a logistics task consists of one operation), 3, (Activity, e.g., The validity area of a logistics task consists of one activity), 4, (Reporting Point and preceding Operations, e.g., The validity area of a logistics task consists of one reporting point and all the operations that lie between the reporting point and its preceding reporting point), 5, (Operation and Reporting Points, e.g., The validity area of a logistics task consists of one operation and the start reporting point that lies directly before the operation and the end reporting point that lies directly after the operation), and 6, (Activity and Reporting Points, e.g., The validity area of a logistics task consists of an activity relevant to the material flow and the start reporting point that lies directly before the activity and the end reporting point that lies directly after the activity.).

LogisticsTaskTypeCode

A LogisticsTaskTypeCode is the coded representation of the type of a logistics task. A logistics task is a task that a processor executes at a specific time at a predefined work step within a production or site logistics process. An example of GDT LogisticsTaskTypeCode is:

<LogisticsTaskTypeCode>1</LogisticsTaskTypeCode>

In certain implementations, GDT LogisticsTaskTypeCode may have the following structure:

| GDT | Object Class | Property | Representation/ Association | Type | Name | Len. | Remarks |
|---|---|---|---|---|---|---|---|
| LogisticsTask-TypeCode | Logistics Task | Type | Code | CDT | Code | 1 . . . 2 | Restricted |

The data type GDT LogisticsTaskTypeCode may assign one static code list to the code. The attributes may be assigned the following values: listID="10153" and listAgencyID="310." The data type GDT LogisticsTaskTypeCode may use the following codes: 1, (Production Task, e.g., task used in production), and 2, (Site Logistics Task, e.g., task used in site logistics).

LogisticUnitContentTypeCode

A LogisticUnitContentTypeCode is a coded representation of the nature of the content of the logistic unit. A Logistic Unit is an item established for logistics operations, such as storage, movement, and packing. A Logistic Unit represents all physical units handled in the same manner during logistics operations, whether they are packed or unpacked goods, e.g., high pallet, liter milk carton. An example of GDT LogisticUnitContentTypeCode is:

<LogisticUnitContentTypeCode>1</LogisticUnitContentTypeCode>

In certain implementations, GDT LogisticUnitContentTypeCode may have the following structure:

| GDT | | Cat. | Object Class | Property | Representation/ Association | Type | Name | Len. | Remarks |
|---|---|---|---|---|---|---|---|---|---|
| LogisticUnit-ContentTypeCode | | | Logistic Unit Content | Type | Code | CDT | Code | 1 . . . 2 | |
| | listID | A | Code List | Identification | Identifier | xsd | token | | 0 . . . 1 |
| | listAgencyID | A | Code List Agency | Identification | Identifier | xsd | token | | 0 . . .1 |
| | listVersionID | A | Code List | Version | Identifier | xsd | token | | 0 . . . 1 |
| | listAgency-SchemeID | A | Code List Agency | Scheme | Identifier | xsd | token | | 0 . . . 1 |
| | listAgency-SchemeAgency ID | A | Code List Agency | Scheme Agency | Identifier | xsd | token | | 0 . . . 1 |

For GDT LogisticUnitContentTypeCode, a customer-specific code list can be assigned to the code. A listID can be "10238". If the code list is unchanged, a listAgencyID can be "310." Otherwise, a listAgencyID can be the ID of the customer (e.g., ID from DE 3055, if listed there.) A listVersionID can be the version of the particular code list (e.g., assigned and managed by the customer.) A listAgencySchemeID can be the ID of the scheme if the listAgencyID does not come from DE 3055. The listAgencySchemeAgencyID can be the ID of the organization from DE 3055 that manages the listAgencySchemeID scheme.

Examples for customer-specific code semantics may include Pet food and Human food. The pre-defined code list provides primary codes which the customer may wish to expand. For example, Dangerous goods could be expanded to include codes for the following separate cases Flammable, Explosive, Toxic, Radioactive, and Corrosive.

The data type GDT LogisticUnitContentTypeCode may use the following codes: 1, (Fragile, e.g., Content may break or damage easily; should be handled with care), 2, (Dangerous goods, e.g., Content may be flammable, explosive, toxic, radioactive, corrosive, etc.; should be handled with care), 3, (Temperature control, e.g., Content requires special-temperature or humidity control), and 4, (Security, e.g., Content requires special protection (i.e., placement in a safe, vault or cage) due to its high value (for example: drugs, medicine, precious metals and other valuable items).

LogisticUnitGroupID

A LogisticUnitGroupID is a unique identifier for a logistic unit group. A logistic unit group specifies for a LogisticUnitUsage a classification to which logistic units are assigned. The logistic units that are assigned to a group have similar attributes relevant for the purposes of the LogisticUnitUsage. A LogisticUnitUsage is a logistics purpose for which LogisticUnits are grouped. The LogisticUnitUsage can represent a process or an activity, such as conveying, packing, or storing. An example of GDT LogisticUnitGroupIDCode is:

<LogisticUnitGroupID>12345678901234567890</LogisticUnitGroupID>

<LogisticUnitGroupID>HIGH_PALLETS</LogisticUnitGroupID>

In certain implementations, GDT LogisticUnitGroupIDCode may have the following structure:

| GDT | | Cat. | Object Class | Property | Representation/ Association | Type | Name | Len. | Card. |
|---|---|---|---|---|---|---|---|---|---|
| Logistic-Unit-GroupID | | E | Logistic Unit Group | Identification | Identifier | CDT | Identifier | 1 . . . 40 | |
| | schemeID | A | Identification Scheme | Identification | Identifier | xsd | token | 1 . . . 60 | 0 . . . 1 |
| | schemeVersion-ID | A | Identification Scheme | Version | Identifier | xsd | token | 1 . . . 15 | 0 . . . 1 |
| | scheme-AgencyID | A | Identification Scheme Agency | Identification | Identifier | xsd | token | 1 . . . 60 | 0 . . . 1 |
| | schemeAgency-SchemeID | A | Identification Scheme Agency | Scheme | Identifier | xsd | token | 1 . . . 60 | 0 . . . 1 |
| | schemeAgency-Scheme-AgencyID | A | Identification Scheme Agency | Scheme Agency | Identifier | xsd | token | 1 . . . 3 | 0 . . . 1 |

SchemeID is the ID of the ID scheme. It is released and maintained by the responsible organization of the ID scheme. The GDT owner may retrieve the correct ID from the responsible organization. If there is no unique ID available, the name of the identifier or identifier type may be entered, which is used in the corresponding standard, specification, or scheme of the responsible organization.

SchemeVersionID is the Version of the ID scheme. It is released and maintained by the organization, which is named in schemeAgencyID. The owner may retrieve the relevant version ID from the responsible organization. If there is no version for the ID scheme, the version of the standard, the specification, or the scheme is used.

SchemeAgencyID is the ID of the organization maintaining the ID scheme. This identification is released by an organization contained in DE 3055 (e.g. DUNS, EAN . . . ). The GDT owner may retrieve the correct ID from the responsible organization. If the organization is not contained in DE 3055, proceed like described in “Data Type Catalog”, 5.6.6.c).

SchemeAgencySchemeID is the identification of the schema which identifies the organization named in schemeAgencyID. It’s a certain scheme ID of partners, companies, members etc. (e.g. DUNS+4) of an organization named in schemeAgencySchemeAgencyID (Bsp. EAN, DUNS, SWIFT, etc.)

SchemeAgencySchemeAgencyID is the identification of the maintaining organization (e.g. DUNS, EAN, SWIFT, etc.) which is responsible for the identification of the organization named in schemeAgencyID. The organization may be contained in DE 3055.]

LogisticUnitID

A LogisticUnitID is a unique identifier for a LogisticUnit. A LogisticUnit is an item established for logistics operations, such as storage, movement, and packing. A LogisticUnit represents all physical units handled in the same manner during logistic operations, whether they be packed or unpacked goods, e.g., high pallet, liter milk carton. An example of GDT LogisticUnitIDCode is:

<LogisticUnitID>12345678901234567890</LogisticUnitID>

<LogisticUnitID>2_METER_PALLET</LogisticUnitID>

In certain implementations, GDT LogisticUnitIDCode may have the following structure:

| GDT | | Cat. | Object Class | Property | Representation/ Association | Type | Name | Len. | Card. |
|---|---|---|---|---|---|---|---|---|---|
| Logistic-UnitID | | E | Logistic Unit | Identification | Identifier | CDT | Identifier | 1 . . . 40 | |
| | schemeID | A | Identification Scheme | Identification | Identifier | xsd | token | 1 . . . 60 | 0 . . . 1 |
| | schemeVersion-ID | A | Identification Scheme | Version | Identifier | xsd | token | 1 . . . 15 | 0 . . . 1 |
| | scheme-AgencyID | A | Identification Scheme Agency | Identification | Identifier | xsd | token | 1 . . . 60 | 0 . . . 1 |
| | schemeAgency-SchemeID | A | Identification Scheme Agency | Scheme | Identifier | xsd | token | 1 . . . 60 | 0 . . . 1 |
| | schemeAgency-Scheme-AgencyID | A | Identification Scheme Agency | Scheme Agency | Identifier | xsd | token | 1 . . . 3 | 0 . . . 1 |

SchemeID is the ID of the ID scheme. It is released and maintained by the responsible organization of the ID scheme. The GDT owner may retrieve the correct ID from the responsible organization. If there is no unique ID available, the name of the identifier or identifier type may be entered, which is used in the corresponding standard, specification, or scheme of the responsible organization.

SchemeVersionID is the Version of the ID scheme. It is released and maintained by the organization, which is named in schemeAgencyID. The owner may retrieve the relevant version ID from the responsible organization. If there is no version for the ID scheme, the version of the standard, the specification, or the scheme is used.

SchemeAgencyID is the ID of the organization maintaining the ID scheme. This identification is released by an organization contained in DE 3055 (e.g. DUNS, EAN . . . ). The GDT owner may retrieve the correct ID from the responsible organization. If the organization is not contained in DE 3055, proceed like described in "Data Type Catalog", 5.6.6.c).

SchemeAgencySchemeID is the identification of the schema which identifies the organization named in schemeAgencyID. It's a certain scheme ID of partners, companies, members etc. (e.g. DUNS+4) of an organization named in schemeAgencySchemeAgencyID (Bsp. EAN, DUNS, SWIFT, etc.)

SchemeAgencySchemeAgencyID is the identification of the maintaining organization (e.g. DUNS, EAN, SWIFT, etc.) which is responsible for the identification of the organization named in schemeAgencyID. The organization may be contained in DE 3055.

LogisticUnitShapeCode

A LogisticUnitShapeCode is a coded representation of the logistic unit's physical exterior shape, which may be used for handling purposes. A Logistic Unit is an item established for logistics operations, such as storage, movement, and packing. A Logistic Unit represents all physical units handled in the same manner during logistics operations, whether they are packed or unpacked goods, e.g., high pallet, liter milk carton. An example of GDT LogisticUnitShapeCode is:

<LogisticUnitShapeCode>1</LogisticUnitShapeCode>

In certain implantations, GDT LogisticUnitShapeCode may have the following structure:

For GDT LogisticUnitShapeCode, a customer-specific code list can be assigned to the code. A listID can be "10041". If the code list is unchanged, a listAgencyID can be "310." Otherwise, a listAgencyID can be the ID of the customer (e.g., ID from DE 3055, if listed there). A listVersionID can be the version of the particular code list (e.g., assigned and managed by the customer). A listAgencySchemeID can be the ID of the scheme if the listAgencyID does not come from DE 3055. The listAgencySchemeAgencyID can be the ID of the organization from DE 3055 that manages the listAgencySchemeID scheme.

The GDT LogisticUnitShapeCode is used by a logistic unit to specify its physical form. Examples for customer-specific code semantics can include: Box-shaped—Logistic Unit is box-shaped, Barrel-shaped—Logistic Unit is barrel-shaped, and Container-shaped—Logistic Unit is container-shaped.

LogisticUnitUsageID

A LogisticUnitUsageID is a unique identifier for a LogisticUnitUsage. A LogisticUnitUsage is a logistics purpose for which LogisticUnits are grouped. The LogisticUnitUsage can represent a process or an activity, such as conveying, packing, or storing. An example of GDT LogisticUnitUsageIDCode is:

<LogisticUnitUsageID>12345678901234567890</LogisticUnitUsageID>

<LogisticUnitUsageID>CONVEYING</LogisticUnitUsageID>

In certain implementations, GDT LogisticUnitUsageIDCode may have the following structure:

| GDT | | Cat. | Object Class | Property | Representation/ Association | Type | Name | Len. | Card. |
|---|---|---|---|---|---|---|---|---|---|
| Logistic-UnitShapeCode | | E | Logistic Unit | Shape | Code | CDT | Code | 1 . . . 2 | |
| | listID | A | Code List | Identification | Identifier | xsd | token | | 0 . . . 1 |
| | listAgency-ID | A | Code List Agency | Identification | Identifier | xsd | token | | 0 . . . 1 |
| | listVersion-ID | A | Code List | Version | Identifier | xsd | token | | 0 . . . 1 |
| | listAgency-Scheme ID | A | Code List Agency | Scheme | Identifier | xsd | token | | 0 . . . 1 |
| | listAgency-SchemeAgency-ID | A | Code List Agency | Scheme Agency | Identifier | xsd | token | | 0 . . . 1 |

| GDT | | Cat. | Object Class | Property | Representation/ Association | Type | Name | Len. | Card. |
|---|---|---|---|---|---|---|---|---|---|
| LogisticUnit-UsageID | | E | Logistic Unit Usage | Identification | Identifier | CDT | Identifier | 1 . . . 40 | |
| | schemeID | A | Identification Scheme | Identification | Identifier | xsd | token | 1 . . . 60 | 0 . . . 1 |
| | schemeVersion-ID | A | Identification Scheme | Version | Identifier | xsd | token | 1 . . . 15 | 0 . . . 1 |
| | schemeAgency-ID | A | Identification Scheme Agency | Identification | Identifier | xsd | token | 1 . . . 60 | 0 . . . 1 |
| | schemeAgency-SchemeID | A | Identification Scheme Agency | Scheme | Identifier | xsd | token | 1 . . . 60 | 0 . . . 1 |
| | schemeAgency-SchemeAgencyID | A | Identification Scheme Agency | Scheme Agency | Identifier | xsd | token | 1 . . . 3 | 0 . . . 1 |

SchemeID is the ID of the ID scheme. It is released and maintained by the responsible organization of the ID scheme. The GDT owner may retrieve the correct ID from the responsible organization. If there is no unique ID available, the name of the identifier or identifier type may be entered, which is used in the corresponding standard, specification, or scheme of the responsible organization.

SchemeVersionID is the Version of the ID scheme. It is released and maintained by the organization, which is named in schemeAgencyID. The owner may retrieve the relevant version ID from the responsible organization. If there is no version for the ID scheme, the version of the standard, the specification, or the scheme is used.

SchemeAgencyID is the ID of the organization maintaining the ID scheme. This identification is released by an organization contained in DE 3055 (e.g. DUNS, EAN . . . ). The GDT owner may retrieve the correct ID from the responsible organization. If the organization is not contained in DE 3055, proceed like described in “Data Type Catalog”, 5.6.6.c).

SchemeAgencySchemeID is the identification of the schema which identifies the organization named in schemeAgencyID. It’s a certain scheme ID of partners, companies, members etc. (e.g. DUNS+4) of an organization named in schemeAgencySchemeAgencyID (Bsp. EAN, DUNS, SWIFT, etc.)

SchemeAgencySchemeAgencyID is the identification of the maintaining organization (e.g. DUNS, EAN, SWIFT, etc.) which is responsible for the identification of the organization named in schemeAgencyID. The organization may be contained in DE 3055.

LogItem

A LogItem is a log message that is generated when an application is executed. An example of GDT LogItemCode is:

<LogItem>
<TypeID>001(/CCM/)</TypeID>
<SeverityCode>3</SeverityCode>
<Note>Catalog CAMERAS could not be published</Note>
<WebAddress>http://pgwdf0123.xyz.corp:12345/xyz/ccm/messagedetail&language=EN&id=001(/CCM/)¶m1=CAMERAS</WebAddress>
</LogItem>

In certain implementations, GDT LogItemCode may have the following structure:

| GDT | | Cat. | Object Class | Property | Representation/ Association | Type | Name | Len. | Card. | Remarks |
|---|---|---|---|---|---|---|---|---|---|---|
| LogItem | | | Log Item | | Details | | | | | |
| | TypeID | E | Log Item | Type Identification | Identifier | CDT | Identifier | | 0 . . . 1 | |
| | CategoryCode | E | Log Item | Category | Code | GDT | LogItem-Category-Code | | 0 . . . 1 | |
| | SeverityCode | E | Log Item | Severity | Code | GDT | LogItem-SeverityCode | | 0 . . . 1 | |
| | Note | E | Log Item | Note | Text | GDT | Note | 1 . . . 200 | 1 | Restricted |
| | WebAddress | E | Log Item | Web Address | Details | GDT | WebAddress | | 0 . . . 1 | |

In the above structure, TypeID is an identification of the type of a log entry (within the application that generates the log). For example, when a catalog is published, a log can be generated containing several items concerning the successful publication of a catalog item. Since these log entries are similar, they all have the same TypeID, although the respective catalog items are inserted dynamically in a text pattern that corresponds to the message type. CategoryCode is a category of a log item according to the characteristics of the log message. SeverityCode is the severity of the log message. Note is a short text for the log message. The LogItemNote restricts the length permitted in the GDT Note. WebAddress is The address for a document available on the Internet that contains more information about the log entry.

The only URI schemas permitted are “http” and “https.”

The use of the elements TypeID and WebAddress (with or without a specified language) is optional depending on the business context. It is not useful to use the SeverityCode for all types of log. The GDT LogItem can therefore be extended in the future by specifying an attack level, for instance, in the area of Internet security, or for user interaction in the area of e-learning.

In ABAP applications, the element TypeID corresponds to the combination of message class (also known as application area) and message number. These are to be listed consecutively in accordance with the pattern for the LogItemTypeID: <message number>(/<message class>/). Refer also to the above example.

LogItemCategoryCode

A LogItemCategoryCode is a coded representation of a category of a log item. A log item category is a division of log items according to the characteristics of the log message that is generated when an application is executed. An example of GDT LogItemCategoryCode is:

<LogItemCategoryCode>1</LogItemCategoryCode>

In certain implementations, GDT LogItemCategoryCode may have the following structure:

| GDT | | Cat. | Object Class | Property | Representation/ Association | Type | Name | Len. | Card. | Remarks |
|---|---|---|---|---|---|---|---|---|---|---|
| LogItem-CategoryCode | | | Log Item | Category | Code | CDT | Code | 1 . . . 15 | | restricted |
| | listID | A | Code List | Identification | Identifier | xsd | token | | 0 . . . 1 | |
| | listAgencyID | A | Code List Agency | Identification | Identifier | xsd | token | | 0 . . . 1 | |
| | listVersion-ID | A | Code List | Version | Identifier | xsd | token | | 0 . . . 1 | |
| | listAgency-SchemeID | A | Code List Agency | Scheme | Identifier | xsd | token | | 0 . . . 1 | |
| | listAgency-SchemeAgencyID | A | Code Agency | Scheme Agency | Identifier | xsd | token | | 0 . . . 1 | |

For GDT LogItemCategoryCode, a customer-specific code list can be assigned to the code. I listID can be "10078". If the code list is unchanged, a listAgencyID can be "310." Otherwise, a listAgencyID can be the ID of the customer (e.g., ID from DE 3055, if listed there). A listVersionID can be the version of the particular code list (e.g., assigned and managed by the customer). A listAgencySchemeID can be the ID of the scheme if the listAgencyID does not come from DE 3055. The listAgencySchemeAgencyID can be the ID of the organization from DE 3055 that manages the listAgency-SchemeID scheme.

The data type GDT LogItemCategoryCode may use the following proposed code list based on ESI Message Symptoms: 1, (i.e., 'FOE'), 2, (i.e., 'FOE.SVE'), 3, (i.e., 'FOE. FFE'), 4, (i.e., 'DCE'), 5, (i.e., 'DCE.IKT'), 6, (i.e., 'DCE.VME'), 7, (i.e., 'DCE.SME'), 8, (i.e., 'DCE.ITE'), 9, (i.e., 'DCE.KME'), 10, (i.e., 'DCE.ICE'), 11, (i.e., 'PRE'), 12, (i.e., 'PRE.IDE'), 13, (i.e., 'PRE.IDE.KEY'), 14, (i.e., 'PRE.IDE.DRE'), 15, (i.e., 'PRE.VAE'), 16, (i.e., 'PRE. VAE.FPV'), 17, (i.e., 'PRE.CAE'), 18, (i.e., 'PRE.TEE'), 19, (i.e., 'PRE.TEE.LRE'), 20, (i.e., 'PRE.TEE.LPE'), 21, (i.e., 'PRE.TEE.OBE'), 22, (i.e., 'PRE.AUE'), 23, (i.e., 'PRE. CVE'), 24, (i.e., 'CON'), 25, (i.e., 'CON.POC'), 26, (i.e., 'CON.LRC'), 27, (i.e., 'CON.DRC'), 28, (i.e., 'CON.CMC') E.G. delivery related billing), 29, (i.e., 'CON.ORC'), 30, (i.e., 'CON.URC'), and 31, (i.e., 'CON.OVC').

LogItemSeverityCode

The LogItemSeverityCode is the coded representation of the severity in a log message on the execution of an application. An example of GDT LogItemSeverityCode is:

<LogItemSeverityCode>2</LogItemSeverityCode>

In certain implementations, GDT LogItemSeverityCode may have the following structure:

| GDT | Object Class | Property | Representation/ Association | Type | Type Name | Len. |
|---|---|---|---|---|---|---|
| LogItem-Severity-Code | Log Item | Severity | Code | CDT | Code | 1 |

The data type GDT LogItemSeverityCode may assign one static code list to the code. The attributes may be assigned the following values: listID="10031", listAgencyID="310" and listVersionID="tbd".

The data type GDT LogItemSeverityCode may use the following codes: 1, (Information, e.g., Notification of the execution of an application or an application step if no errors or error possibilities have occurred), 2, (Warning, e.g., Warning of the possibility of an error or an error source in the execution of an application or an application step. The respective result is to be viewed with reservation), 3, (Error, e.g., Notification of the occurrence of an error during the execution of an application or an application step—usually with a more precise description of the type of error), and 4, (Abort, e.g., Notification of a premature or unforeseen termination of the execution of an application).

The values of the LogItemSeverityCode closely follow the UN/EDIFACT code list 0331 "Report function"; with regard to naming and additional values, this code list focuses on the dialog with a system. The following linear order applies for the severity: 1<2<3<4. During the execution of an application, log messages may be created that are classified by the severity of the LogItemSeverityCode (e.g., as error message).

The LogItemSeverityCode is a proprietary code list with fixed predefined values. Changes to the permitted values involve changes to the interface.

MailNonDeliveryReasonCode

A MailNonDeliveryReasonCode is the coded representation why a postal item could not be delivered. An example of GDT MailNonDeliveryReasonCode is:

<MailNonDeliveryReasonCode>0001</MailNonDelivery-ReasonCode>

In certain implementations, GDT MailNonDeliveryReason-Code may have the following structure:

| GDT | | Cat. | Object Class | Property | Representation/ Association | Type | Name | Len. | Card. | Remarks |
|---|---|---|---|---|---|---|---|---|---|---|
| MailNon-Delivery-Reason-Code | | | | Mail Non Delivery Reason | Code | CDT | Code | 1 . . . 4 | | Restricted |
| | listID | A | Code List | Identification | Identifier | xsd | token | | 0 . . . 1 | |
| | list-AgencyID | A | Code List Agency | Identification | Identifier | xsd | token | | 0 . . . 1 | |
| | list-VersionID | A | Code List | Version | Identifier | xsd | token | | 0 . . . 1 | |
| | listAgency-SchemeID | A | Code List Agency | Scheme | Identifier | xsd | token | | 0 . . . 1 | |
| | listAgency-Scheme-AgencyID | A | Code List Agency | Scheme Agency | Identifier | xsd | token | | 0 . . . 1 | |

For GDT MailNonDeliveryReasonCode, a customer-specific code list can be assigned to the code. A listID can be "10175". If the code list is unchanged, a listAgencyID can be "310." Otherwise, a listAgencyID can be the ID of the customer (e.g., ID from DE 3055, if listed there.) A listVersionID can be the version of the particular code list (e.g., assigned and managed by the customer). A listAgencySchemeID can be the ID of the scheme if the listAgencyID does not come from DE 3055. The listAgencySchemeAgencyID can be the ID of the organization from DE 3055 that manages the listAgency-SchemeID scheme.

MailNonDeliveryReasonCode is used to specify why a postal item could not be delivered to an address. The Mail-NonDeliveryReasonCode can be used for street addresses and PO Box addresses. The corresponding qualifiers are 1, (StreetAddressMailNonDeliveryReasonCode, e.g., Non delivery reason for a street address), and 2 (POBoxAddress-MailNonDeliveryReasonCode, e.g., Non delivery reason for a PO box address).

The following dictionary objects may be assigned to this GDT:

Data element: (e.g., AD_NO_USES), Domain: (e.g., AD_NO_USE)

The data type GDT MailNonDeliveryReasonCode may use the following codes: (0001, Unknown, e.g., The recipient is unknown), (0002, Address unknown, e.g., The recipient has moved away to an unknown address—a new address is not known), (0003, Address insufficient, e.g., The address is incomplete), (0004, Address unreadable, e.g., The address is unreadable), (0005, No mailbox, e.g., There is no mailbox), (0006, No PO box, e.g., The BO box is not available or locked), (0007, Refused, e.g., Acceptance was refused), (0008, Deceased, e.g., The recipient is deceased), and (0009, Company no longer exists, e.g., The recipient company no longer exists).

MainInventorySeparatingValues

MainInventorySeparatingValues are the main values that separate inventory from other inventory. An example of GDT MainInventorySeparatingValuesCode is:

<MainInventorySeparatingValues>
<MaterialUUID>42d3cfca-5996-57b0-e100-00000a44201b</MaterialUUID>
<OwnerPartyUUID>51d3cfca-1996-57b0-e100-00000a42201c</OwnerPartyUUID>
<SupplyPlanningAreaUUID>35d3cfca-3996-57b0-e100-00000a42201d</SupplyPlanningAreaUUID>
<InventoryUsabilityCode>1</InventoryUsabilityCode>
</MainInventorySeparatingValues>

In certain implementations, GDT MainInventorySeparatingValuesCode may have the following structure:

| GDT | | Cat. | Object Class | Property Qualifier | Property | Rep./ Ass. Qual. | Rep./ Ass. | Type | Type Name | Len. | Card. |
|---|---|---|---|---|---|---|---|---|---|---|---|
| MainInventory-Separating-Values | | | Main Inventory Separating Values | | | | Details | | | | |
| | MaterialUUID | E | Main Inventory Separating Values | | Material | Universally Unique | Identifier | GDT | UUID | | 0 . . . 1 |
| | MaterialID | E | Main Inventory Separating Values | | Material | | Identifier | GDT | ProductID | | 0 . . . 1 |
| | OwnerParty-UUID | E | Main Inventory Separating Values | | Owner Party | Universally Unique | Identifier | GDT | UUID | | 0 . . . 1 |
| | OwnerPartyID | E | Main Inventory Separating Values | | Owner Party | | Identifier | GDT | Business-Partner-InternalID | | 0 . . . 1 |
| | SupplyPlanning-AreaUUID | E | Main Inventory Separating Values | | Supply Planning | Universally Unique | Identifier | GDT | UUID | | 0 . . . 1 |
| | SupplyPlanning-AreaID | E | Main Inventory Separating Values | | Supply Planning | | Identifier | GDT | Supply-Planning-AreaID | | 0 . . . 1 |
| | Inventory-UsabilityCode | E | Main Inventory Separating Values | | Inventory Usability | | Code | GDT | Inventory-Code | | 0 . . . 1 |

MainInventorySeparatingValues may contain the following elements: 1, (MaterialUUID, e.g., Unique, global identifier for a material), 2, (MaterialID, e.g., Identifier for a material), 3, (OwnerPartyUUID, e.g., Unique, global identifier for the inventory owner), 4, (OwnerPartyID, e.g., Identifier for the inventory owner), 5, (SupplyPlanningAreaUUID, e.g., Unique, global identifier for an area in planning for which the availability of products on time is guaranteed), 6, (SupplyPlanningAreaID, e.g., Identifier for an area in planning for which the availability of products on time is guaranteed), and 7, (InventoryUsabilityCode, e.g., Coded information on the use of the inventory (such as locked for further business processes, or quality inspection)

If the elements MaterialUUID and MaterialID are set both, the same material has to be referenced. If the elements OwnerPartyUUID and OwnerPartyID are set both, the same business partner has to be referenced. If the elements SupplyPlanningAreaUUID and SupplyPlanningAreaID are set both, the same supply planning area has to be referenced.

MaritalStatusCode

A MaritalStatusCode is the coded description of marital status. An example of MaritalStatusCode is:

<MaritalStatusCode>2</MaritalStatusCode>

In certain implementations, GDT MaritalStatusCode may have the following structure:

| GDT | | Cat. | Object Class | Property | Representation/ Association | Type | Name | Type Len. | Card. | Remarks |
|---|---|---|---|---|---|---|---|---|---|---|
| Marital-StatusCode | | | | Marital Status | Code | CDT | Code | 1 | | Restricted |
| | listID | A | Code List | Identification | Identifier | XSD | Token | | 0 . . . 1 | |
| | listAgencyID | A | Code List Agency | Identification | Identifier | XSD | Token | | 0 . . . 1 | |
| | listVersion-ID | A | Code List | Version | Identifier | XSD | Token | | 0 . . . 1 | |
| | listAgency-SchemeID | A | Code List Agency | Scheme | Identifier | XSD | Token | | 0 . . . 1 | |
| | listAgency-Scheme-AgencyID | A | Code List Agency | Scheme Agency | Identifier | XSD | Token | | 0 . . . 1 | |

For GDT MaritalStatusCode, a customer-specific code list can be assigned to the code. A listID can be "10357". If the code list is unchanged, a listAgencyID can be "310." Otherwise, a listAgencyID can be the ID of the customer (e.g., ID from DE 3055, if listed there). A listVersionID can be the version of the particular code list (e.g., assigned and managed by the customer). A listAgencySchemeID can be the ID of the scheme if the listAgencyID does not come from DE 3055. The listAgencySchemeAgencyID can be the ID of the organization from DE 3055 that manages the listAgency-SchemeID scheme.

Examples of the possible semantics of the codes can be Married—The person is married and Single—The person is single.

The following dictionary objects may be assigned to this GDT: Data element (e.g., BU_MARST), Domain (e.g., BU_MARST).

MassDataRunObjectID

A MassDataRunObjectID is a unique identifier for a mass data run object. Mass Data Run is a conceptual description of an algorithm of a business logic which modifies/manages/processes a huge amount of data in multiple transactions (not necessarily with parallel processing). A Mass Data Run Object is a business object type with a special header node and is used to execute an algorithm for a certain mass data run. An example of MassDataRunObjectIDCode is:

<MassDataRunObjectID schemeID='MDRO.111' schemeAgencyID='SYS__010'>MRP__1</MassDataRunObjectID>

In certain implementations, GDT MassDataRunObjectIDCode may have the following structure:

| GDT | Cat. | Object Class | Property | Representation/ Association | Type | Name | Type Len. | Card. | Remarks |
|---|---|---|---|---|---|---|---|---|---|
| MassDataRun-ObjectID | | Mass Data Run Object | Identification | Identifier | CDT | Identifier | 1 . . . 35 | | restricted |

-continued

| GDT | | Cat. | Object Class | Property | Representation/ Association | Type | Name | Type Len. | Card. | Remarks |
|---|---|---|---|---|---|---|---|---|---|---|
| | schemeID | A | Identification Scheme | Identification | Identifier | xsd | token | 1 . . . 60 | 0 . . . 1 | |
| | scheme-AgencyID | A | Identification Scheme Agency | Identification | Identifier | xsd | token | 1 . . . 60 | 0 . . . 1 | |

In certain implementations, the values of the attributes of MassDataRunObjectID are assigned as: schemeID, MDRO.<MassDataRunObjectTypeCode>, schemeAgencyID, Business System, which issued the ID.

MassDataRunObjectTypeCode

A MassDataRunObjectTypeCode is a coded representation of a type of a Mass Data Run Object. Mass Data Run is a conceptual description of an algorithm of a business logic which modifies/manages/processes a huge amount of data in multiple transactions (not necessarily with parallel processing). A Mass Data Run Object is a business object type with a special header node and is used to execute an algorithm for a certain mass data run. An example of GDT MassDataRunObjectTypeCode is:

<MassDataRunObjectTypeCode>311</MassDataRunObjectTypeCode>

In certain implementations, GDT MassDataRunObjectTypeCode may have the following structure:

| GDT | Cat. | Object Class | Property | Representation/ Association | Type | Type Name | Len. | Remarks |
|---|---|---|---|---|---|---|---|---|
| MassDataRun-ObjectTypeCode | | Mass Data Run Object | Type | Code | CDT | Code | 1..5 | restricted |

The data type GDT MassDataRunObjectTypeCode may assign one static code list to the code. The attributes may be assigned the following values: listID="10481" and listAgencyID="310."

The data type GDT MassDataRunObjectTypeCode may use the following codes: 9, (i.e., Accounts Receivable Payable Ledger Account Discounting Run), 10, (i.e., Accounts Receivable Payable Ledger Account Foreign Currency Remeasurement Run), 11, (i.e., Accounts Receivable Payable Ledger Account Regrouping Run), 13, (i.e., Balance Carry Forward Run), 19, (i.e., Cash Ledger Account Foreign Currency Remeasurement Run), 52, (i.e., Fixed Asset Depreciation Run), 53, (i.e., GeneralLedger Account Assessment Run), 54, (i.e., General Ledger Account Distribution Run), 57, (i.e., Goods Receipt Invoice Receipt Clearing Run), 63, (i.e., Inventory Price Change Run), 76, (i.e., Overhead Cost Ledger Account Assessment Run), 77, (i.e., Overhead Cost Ledger Account Distribution Run), 78, Overhead Cost Ledger Account Overhead Cost Calculation Run), 95, (i.e., Production Ledger Account Overhead Cost Calculation Run), 112, (i.e., Sales Ledger Account Accruals Run), 113, (i.e., Sales Ledger Account Overhead Cost Calculation Run), 135, (i.e., Work In Process Clearing Run), 215, (i.e., Product Catalog Update Run), 217, (i.e., Product Catalogue Cleanup Run), 218, (i.e., Product Catalogue Duplication Run), 219, (i.e., Product Catalogue File Upload Run), 220, (i.e., Product Catalogue Publishing Sending Run), 237, (i.e., Published Product Catalogue Cleanup Run), 301, (i.e., Customer Invoicing Run), 302, (i.e., Direct Mail Run), 303, (i.e., Due Payment Run), 304, (i.e., Dunning Run), 305, (i.e., Overhead Cost Distribution Run), 306, (i.e., Overhead Cost Assessment Run), 308, (i.e., GeneralLedger Account Balance Distribution Run), 309, (i.e., Payment Card Payment Settlement Run), 310, (i.e., Payment Media Run), 311, Material Requirements Planning Run), 312, (i.e., Available To Promise Check Run), 313, (i.e., Product Catalogue Update Run), 314, (i.e., Published Product Catalogue Update Run), 315, (i.e., Evaluated Receipt Settlement Run), 337, (i.e., GeneralLedger Account Balance Assessment Run), 360, (i.e., Request Procurement Run), and 361, (i.e., Request Production Run).

MasterFixedAssetID

A MasterFixedAssetID identifies a business unit within a company from one or several fixed assets that are depreciated individually, but it may be possible to represent their values together and maintain their data together. The first fixed asset has a special role. The master data is maintained in it. This data can be copied to additional corresponding fixed assets. A fixed asset that is a view, defined for the purposes of Financial Accounting, of usually one or more physical object, rights or other economic goods belonging to a company. These are in long-term use, are recognized in the financial statements at closing, and may be individually identifiable. It also includes the recording of the values for this view. An example of GDT MasterFixedAssetIDCode is:

<MasterFixedAssetID>1</MasterFixedAssetID>

In certain implementations, GDT MasterFixedAssetIDCode may have the following structure:

| GDT | Object Class | Property | Representation/ Association | Type | Type Name | Len. | Remarks |
|---|---|---|---|---|---|---|---|
| MasterFixed-AssetID | Master Fixed Asset | Identification | Identifier | CDT | Identifier | 1..12 | Restricted |

The value range is connected to number range objects. They define the value range. The fixed asset has a unique number in a company (Company). This number has two parts—a main part and a sub-part (MasterFixedAssetID and FixedAssetID) The user can use these parts to group fixed assets semantically.

The following dictionary objects may be assigned to this GDT: Data element (e.g., ANLN1), Domain (e.g., ANLN1).

MaterialFlowElementTypeCode

A MaterialFlowElementTypeCode is the coded representation of the type of an element in the flow of materials. The material flow describes how materials are passed on in a logistical process. An example of GDT MaterialFlowElementTypeCode is:

<MaterialFlowElementTypeCode>1</MaterialFlowElementTypeCode>

In certain implementations, GDT MaterialFlowElementTypeCode may have the following structure:

| GDT | Object Class | Property | Representation/ Association | Type | Type Name | Len. | Remarks |
|---|---|---|---|---|---|---|---|
| MaterialFlow-ElementType-Code | Material Flow Element | Type | Code | CDT | Code | 1..2 | restricted |

The data type GDT MaterialFlowElementTypeCode may assign one static code list to the code. The attributes may be assigned the following valued: listID="10232" and listAgencyID=310. The data type GDT MaterialFlowElementTypeCode may use the following codes: 1, (Operation, e.g., Operation), 2, (Branching, e.g., Branching of a logistical process into several processing paths), 3, (Join, e.g., The rejoining of a previously branched logistical process back into one processing path), 4, (Stock item, e.g., Item of stock), 5, (External procurement schedule line, e.g., Schedule line of a planned external procurement order), 6, (Production material output, e.g., Material output of a planned production order), 7, (Supply planning schedule line, e.g., Schedule line of a supply planning requirement), 8, (Production material input, e.g., Material input of a planned production order), and 9, (Planned independent requirement, e.g., Planned independent requirement).

MaterialInputGroupID

MaterialInputGroupID is a unique ID for a group of interrelated material inputs. A material input is a quantitative input of a material used in the execution of a production activity in a manufacturing process. A group of material inputs originates within the context of an instance of a business object (for example a ProductionRequest) as a result of the common reference of all affected material inputs to a BOM item. An example of GDT MaterialInputGroupIDCode is:

<MaterialInputGroupID>4712</MaterialInputGroupID>

In certain implementations, GDT MaterialInputGroupIDCode may have the following structure:

| GDT | Object Class | Property | Representation/ Association | Type | Type Name | Len. | Remarks |
|---|---|---|---|---|---|---|---|
| MaterialInputGroupID | Material Input Group | Identification | Identifier | CDT | Identifier | 1..6 | Restricted |

MaterialInputGroupID is unique within the context of an instance of a business object.

MaterialInputID

A MaterialInputID is a unique identifier for a material input in logistics. A material input is a quantitative input of a material that is used for the execution of a logistic process. An example of GDT MaterialInputIDCode is:

<MaterialInputID>4711</MaterialInputID>

In certain implementations GDT MaterialInputIDCode may have the following structure:

| GDT | Object Class | Property | Representation/ Association | Type | Type Name | Len. | Remarks |
|---|---|---|---|---|---|---|---|
| Material-InputID | Material Input | Identification | Identifier | CDT | Identifier | 1..6 | Restricted |

A MaterialInputID is unique in the context of the business object to which it belongs.

MaterialOutputGroupID

A GDT MaterialOutputGroupID is a quantitative output of a material that represents the desired result of a manufacturing process. A group of material outputs can originate within the context of an instance of a business object (for example a ProductionRequest) as a result of the common reference of all affected material outputs to a BOM item. An example of GDT MaterialOutputGroupID is:

<MaterialOutputGroupID>4711</MaterialOutputGroupID>

In certain implementations, GDT MaterialOutputGroupID may have the following structure:

| GDT | Object Class | Property | Representation/ Association | Type | Type Name | Len. | Remarks |
|---|---|---|---|---|---|---|---|
| MaterialOutput-GroupID | Material Output Group | Identification | Identifier | CDT | Identifier | 1..6 | Restricted |

MaterialOutputGroupID can be used within the context of an instance of a business object.

MaterialOutputID

A GDT MaterialOutputID is a quantitative output of a material that is the planned result of a logistic process. A MaterialOutputID may be used for a material output in logistics. An example of GDT MaterialOutputID is:

<MaterialOutputID>4711</MaterialOutputID>

In certain implementations, GDT MaterialOutputID may have the following structure:

| GDT | Object Class | Property | Representation/ Association | Type | Type Name | Len. | Remarks |
|---|---|---|---|---|---|---|---|
| Material-OutputID | Material Output | Identification | Identifier | CDT | Identifier | 1..6 | Restricted |

A MaterialOutputID can be used in the context of the business object to which it belongs.

MaterialRoleCode

A GDT MaterialRoleCode is the code indicating the role of a material. An example of GDT MaterialRoleCode is:

<MaterialRoleCode>2</MaterialRoleCode>

In certain implementations, GDT MaterialRoleCode may have the following structure:

| GDT | Object Class | Property | Representation/ Association | Type | Type Name | Len. | Remarks |
|---|---|---|---|---|---|---|---|
| Material-RoleCode | Material | Role | Code | CDT | Code | 1..2 | Restricted |

A code list can be assigned to the MaterialRoleCode. The attributes may include the following values: listID="10158," listAgencyID="310." The MaterialRoleCode can be used to describe the role of a material in a process.

The data type GDT MaterialOutputMaterialRoleCode may include the following qualifiers: JointProductionMaterialRoleCode (i.e., role of the created material in a joint production process), MaterialInputMaterialRoleCode (i.e., Role of the incoming material an a production or packaging process), MaterialOutputGroupMaterialRoleCode (i.e., Role of all outgoing materials in a material output group in a production process). The joint production is the production of several materials in one manufacturing process.

The data type GDT MaterialOutputMaterialRoleCode may include the following codes: 1 (i.e., Main Product), 2 (i.e., Co-Product), 3 (i.e., By-Product), 4 (i.e., Packaging Material), 5 (i.e., Intermediate Product), 6 (i.e., Component).

MaterialSupplyAndDemandTypeCode

A GDT MaterialSupplyAndDemandTypeCode is the coded representation of the type of material demands and receipts. The type of material demands and receipts may describe the (business) nature of actual or planned material demands and receipts. An example of GDT MaterialSupplyAndDemandTypeCode is:

<MaterialSupplyAndDemandTypeCode>1</MaterialSupplyAndDemandTypeCode>

In certain implementations, GDT MaterialSupplyAndDemandTypeCode may have the following structure:

| GDT | Object Class | Property | Representation/ Association | Type | Type Name | Len. | Remarks |
|---|---|---|---|---|---|---|---|
| MaterialSupply-AndDemand-TypeCode | Material Supply And Demand | Type | Code | CDT | Code | 1..2 | restricted |

A code list may be assigned to the code. The attributes may include the following values: listID="10422," listAgencyID="310." Combinations of the MaterialSupplyAndDemandTypeCodes with material receipt character when specifying a BusinessTransactionDocumentType may include: 089 (i.e., 1, 2, 3, 4, 5), 092 (i.e., 6, 7, 9), 104 (i.e., 14, 15, 16). Combinations of the MaterialSupplyAndDemandTypeCodes with material demand character when specifying a BusinessTransactionDocumentType may include: 092 (i.e., 8, 10), 131 (i.e., 11, 12, 13), 090 (i.e., 17).

The MaterialSupplyAndDemandTypeCode may be used in material requirements planning to categorize the planning objects (material receipts, material demands, stock, and forecast). The MaterialSupplyAndDemandTypeCode may correspond to the MRP elements in R/3 on a less granular level. 1 (i.e., Material receipt from procurement planning order), 2 (i.e., Material receipt (fixed) from procurement planning order), 3 (i.e., Material receipt from purchase requisition), 4 (i.e., Material receipt from purchase order), 5 (i.e., Material receipt from advanced shipping notification), 6 (i.e., Material receipt from production planning order), 7 (i.e., Material receipt (fixed) from production planning order), 8 (i.e., Material demand as result of production planning order), 9 (i.e., Material receipt from production requisition), 10 (i.e., Material demand as result of production requisition reservation), 11 (i.e., Material demand as result of customer quote), 12 (i.e., Material demand as result of sales order), 13 (i.e., Material demand as result of site logistics requisition), 14 (i.e., Unrestricted-use stock), 15 (i.e., Blocked stock), 16 (i.e., Inspection stock), (i.e., Material demand as result of demand forecast).

MaternityProtectionDeliveryTypeCode

The GDT MaternityProtectionDeliveryTypeCode is the coded representation of the type of a delivery of a child according to maternity protection regulations. An example of GDT MaternityProtectionDeliveryTypeCode is:

<MaternityProtectionDeliveryTypeCode>1</MaternityProtectionDeliveryTypeCode>

In certain implementations, GDT MaternityProtectionDeliveryTypeCode may have the following structure:

| GDT | | Cat. | Object Class | Property | Representation/ Association | Type | Type Name | Len. | Card. | Remarks |
|---|---|---|---|---|---|---|---|---|---|---|
| Maternity-Protection-Delivery-Type-Code | | | Maternity Protection | Delivery Type | Code | CDT | Code | 1..2 | | restricted |
| | listID | A | Code List | Identification | Identifier | xsd | Token | | 0..1 | |
| | list-AgencyID | A | Code List Agency | Identification | Identifier | xsd | Token | | 0..1 | |
| | list-VersionID | A | Code List | Version | Identifier | xsd | Token | | 0..1 | |
| | listAgency-SchemeID | A | Code List Agency | Scheme | Identifier | xsd | Token | | 0..1 | |
| | listAgency Scheme AgencyID | A | Code List Agency | Scheme Agency | Identifier | xsd | Token | | 0..1 | |

Several fixed, country-specific code lists, which are different at runtime, may be assigned to the MaternityProtectionDeliveryTypeCode.

MaternityProtectionDeliveryTypeCode can be used, for example, in the calculation of the Maternity Protection period according to various delivery types. The Maternity Protection period can be calculated differently (e.g., as provided by the national law) for the various delivery types. MaternityProtectionDeliveryTypeCode for 'DE' (i.e., Germany) may include the following values: listID="10090," listAgencyID="310," 1 (i.e., Normal), 2 (i.e., Preterm delivery), 3 (i.e., Still Birth).

MeasureRoleCode

A GDT MeasureRoleCode is the coded representation of a role of a measure. The MeasureRoleCode may be used to describe the role of a measure in a dynamic manner. The MeasureRoleCodes may follow the static defined qualifier of Measure. Identical codes and qualifiers may have the same semantics. An example of GDT MeasureRoleCode is:

<MeasureRoleCode>1</MeasureRoleCode>

In certain implementations, GDT MeasureRoleCode may have the following structure:

| GDT | Object Class | Property | Representation/ Association | Type | Type Name | Len. | Remarks |
|---|---|---|---|---|---|---|---|
| Measure-RoleCode | Measure | Role | Code | GDT | MeasureRole-Code | 1..3 | restricted |

A static code list may be assigned to the code.

The MeasureRoleCode attributes may be assigned values as follows: listID="10073," listAgencyID="310," 1 (i.e., AverageHeightMeasure), 2 (i.e., AverageLengthMeasure), 3 (i.e., AverageVolumeMeasure), 4 (i.e., AverageWeightMeasure), 5 (i.e., AverageWidthMeasure), 6 (i.e., DistanceMeasure), 7 (i.e., FileSizeMeasure), 8 (i.e., GrossVolumeMeasure), 9 (i.e., GrossWeightMeasure), 10 (i.e., HeightMeasure), 11 (i.e., LengthMeasure), 12 (i.e., MaximumHeightMeasure), 13 (i.e., MaximumLengthMeasure), 14 (i.e., MaximumVolumeMeasure), 15 (i.e., MaximumWeightMeasure), 16 (i.e., MaximumWidthMeasure), 17 (i.e., NetVolumeMeasure), 18 (i.e., NetWeightMeasure), 19 (i.e., ResourceCapacityMeasure), 20 (i.e., TareWeightMeasure), 21 (i.e., TimeMeasure), 22 (i.e., VolumeMeasure), 23 (i.e., WidthMeasure).

MeasureUnitCode

The GDT MeasureUnitCode is the coded representation of a non-monetary unit of measurement. A unit of measurement may be a quantity that is either defined by a standard or established by conventions as a particular type of unit. This unit quantity may be the standard of comparison for determining and specifying other quantities of the same type. An example of GDT MeasureUnitCode is:

<MeasureUnitCode>BX</MeasureUnitCode>

In certain implementations, GDT MeasureUnitCode may have the following structure:

| GDT | Object Class | Property | Representation/ Association | Type | Type Name | Len. | Remarks |
|---|---|---|---|---|---|---|---|
| Measure-UnitCode | Measure Unit | | Code | xsd | token | 1..3 | |

Some values for GDT MeasureUnitCode may be the "Common Codes" specified in UN/CEFACT Recommendation #20. The Common Code is a sequence of a maximum of three alphanumerical characters: MTR (i.e., Meter), KGM (i.e., Kilogram), SEC (i.e., Second), MON (i.e., Month), NEW (i.e., Newton), GLI (i.e., Gallon (UK)), GLL (i.e., Gallon (US)), 4L (i.e., Megabyte), DZN (i.e., Dozen), C62 (i.e., Piece), BX (i.e., Box).

DAYWEEKMONTHYEAR_MeasureUnitCode

An example of DAYWEEKMONTHYEAR_MeasureUnitCode is:

<MeasureUnitCode>MON</MeasureUnitCode>

In certain implementations, Restricted GDT DAYWEEKMONTHYEAR_MeasureUnitCode may have the following structure:

| GDT | Object Class Qualifier | Object Class | Representation/Association | Data Type | Len. |
|---|---|---|---|---|---|
| DAYWEEK-MONTHYEAR_ MeasureUnitCode | DAYWEEK-MONTH-YEAR_ | Measure Unit | Code | xsd:token | 1..3 |

In certain implementations, DAYWEEKMONTHYEAR_MeasureUnitCode may be considered a restriction of the GDT MeasureUnitCode and may provide a restricted code list. Possible values for DAYWEEKMONTHYEAR_MeasureUnitCode may include: day (DAY), week (WK), month (MON) and year (A). DAYWEEKMONTHYEAR_MeasureUnitCode can contain the variable "DAYWEEKMONTHYEAR_" which may be replaced by one (or more) qualifiers.

HOURDAY_MeasureUnitCode

An example of HOURDAY_MeasureUnitCode is:

<MeasureUnitCode>HU R</MeasureUnitCode>

In certain implementations, HOURDAY_MeasureUnitCode may have the following structure:

| GDT | Object Class Qualifier | Object Class | Representation/Association | Data Type | Len. |
|---|---|---|---|---|---|
| DAYWEEK-MONTHYEAR_ MeasureUnitCode | DAYWEEK-MONTH-YEAR_ | Measure Unit | Code | xsd:token | 1..3 |

In certain implementations, HOURDAY_MeasureUnitCode may be considered a restriction of the GDT MeasureUnitCode and may provide a restricted code list. Values permitted for HOURDAY_MeasureUnitCode may include: hour (HUR) and day (DAY).

HOURDAY_MeasureUnitCode can contain the variable "HOURDAY_" which may be replaced by one (or more) qualifiers. Qualifiers permitted for Measure may be defined as roles in the GDT MeasureRoleCode. They may include: DimensionsMeasureUnitCode (i.e., Dimension measure unit (height, length, width)), OrderMeasureUnitCode (i.e., Specifies the unit of measure used for ordering the product), TimeMeasureUnitCode (i.e., Time measure unit), VolumeMeasureUnitCode (i.e., Volume measure unit), WeightMeasureUnitCode (i.e., Weight measure unit).

MeasureUnitMeaningCode

The MeasureUnitMeaningCode is a coded representation of the meaning of a physical unit of measurement. An example of GDT MeasureUnitMeaningCode is: <MeasureUnitMeaningCode>E17</MeasureUnitMeaningCode>

In certain implementations, GDT MeasureUnitMeaningCode may have the following structure:

| GDT | Object Class | Property | Representation/ Association | Type | Type Name | Len. | Remarks |
|---|---|---|---|---|---|---|---|
| MeasureUnit-MeaningCode | Measure Unit | Meaning | Code | CDT | Code | 3 | restricted |

The possible values can be taken from the IEC61360 standard. The unit kA/m, for example, can be derived in different ways and describes different properties, for example longitudinal currents (i.e., E16), magnetic field strength (i.e., E17), or magnetization (i.e., E28).

MessageTypeCode

MessageTypeCode is a coded representation of the (i.e., business) type of a message. A message type may describe the nature of (i.e., business) messages of the same kind. An example of GDT MessageTypeCode is:

<MessageTypeCode>0101</MessageTypeCode>

In certain implementations, GDT MessageTypeCode may have the following structure:

| GDT | Object Class | Property | Representation/ Association | Type | Type Name | Len. | Remarks |
|---|---|---|---|---|---|---|---|
| MessageTypeCode | Message | Type | Code | CDT | Code | 4 | restricted |

The MessageTypeCode may be a codelist with the given attributes listID="10032," listAgencyID="310," listVersionID="tbd." The code list and its values may include: 0060 (i.e., PurchaseContractLegalDocumentRequest), 0061 (i.e., PurchaseContractLegalDocumentNotification), 0062 (i.e., PurchaseContractUseRequest), 0063 (i.e., PurchaseContractUseConfirmation), 0064 (i.e., PurchaseContractReleaseNotification), 0077 (i.e., SourceOfSupplyNotification), 0080 (i.e., CatalogueUpdateNotification), 0081 (i.e., CataloguePublicationRequest), 0082 (i.e., CataloguePublicationTransmissionPackageNotification), 0083 (i.e., CataloguePublicationConfirmation), 0084 (i.e., CataloguePublicationTransmissionCancellationRequest), 0085 (i.e., CataloguePublicationTransmissionCancellationConfirmation), 0086 (i.e., CataloguePublicationTransmissionItemLockRequest), 0087 (i.e., CataloguePublicationTransmissionItemLockConfirmation), 0101 (i.e., PurchaseOrderRequest), 0102 (i.e., PurchaseOrderChangeRequest), 0103 (i.e., PurchaseOrderCancellationRequest), 0104 (i.e., PurchaseOrderConfirmation), 0120 (i.e., PurchaseOrderInformation), 0121 (i.e., PurchaseOrderPlanningNotification), 0130 (i.e., PurchaseRequirementRequest), 0131 (i.e., PurchaseRequirementConfirmation), 0140 (i.e., ProductDemandInfluencingEventNotification), 0141 (i.e., ProductForecastNotification), 0142 (i.e., ProductForecastRevisionNotification), 0145 (i.e., ProductActivityNotification), 0151 (i.e., RFQRequest), 0152 (i.e., RFQChangeRequest), 0153 (i.e., RFQCancellationRequest), 0154 (i.e., RFQResultNotification), 0155 (i.e., Quote Notification), 0160 (i.e., SalesOrderFulfillmentRequest), 0161 (i.e., SalesOrderFulfillmentConfirmation), 0185 (i.e., OrderIDAssignmentNotification), 0200 (i.e., DeliveryExecutionRequest), 0201 (i.e., DeliveryInformation), 0202 (i.e., DespatchedDeliveryNotification), 0203 (i.e., ReceivedDeliveryNotification), 0206 (i.e., ReturnDeliveryInstructionNotification), 0210 (i.e., DeliveryScheduleNotification), 0213 (i.e., VendorGeneratedOrderNotification), 0214 (i.e., VendorGeneratedOrderConfirmation), 0216 (i.e., Replenishment Order Notification), 0217 (i.e., ReplenishmentOrderConfirmation), 0146 (i.e., SupplyChainExceptionReportNotification), 0235 (i.e., CustomsVendorDeclarationCompleteRequest), 0236 (i.e., CustomsVendorDeclarationNotification), 0240 (i.e., ServiceAcknowledgementRequest), 0241 (i.e., ServiceAcknowledgementConfirmation), 0250 (i.e., InventoryChangeNotification), 0251 (i.e., InventoryChangeAccountingNotification), 0252 (i.e., InventoryChangeAccountingCancellationRequest), 0290 (i.e., BillingDueNotification), 0291 (i.e., InvoicingDueNotification), 0401 (i.e., InvoiceRequest), 0402 (i.e., InvoiceConfirmation), 0409 (i.e., SupplierInvoiceInformation), 0410 (i.e., InvoiceIssuedInformation), 0411 (i.e., InvoiceAccountingNotification), 0412 (i.e., InvoiceAccountingCancellationRequest), 0420 (i.e., TaxDueNotification), 0421 (i.e., VATDeclarationRequest), 0422 (i.e., VATDeclarationConfirmation), 0426 (i.e., SupplierInvoiceCancellationExecutionRequest), 0427 (i.e., SupplierInvoiceSettlementReleaseRequest), 0430 (i.e., PaymentDueNotification), 0450 (i.e., CreditAgencyReportQuery), 0451 (i.e., CreditAgencyReportResponse), 0452 (i.e., CreditWorthinessQuery), 0453 (i.e., CreditWorthinessResponse), 0454 (i.e., CreditWorthinessChangeInformation), 0455 (i.e., CreditCommitmentQuery), 0456 (i.e., CreditCommitmentResponse), 0457 (i.e., CreditCommitmentRecordNotification), 0458 (i.e., CreditWorthinessCriticalPartiesQuery), 0459 (i.e., CreditWorthinessCriticalPartiesResponse), 0460 (i.e., CreditPaymentBehaviourSummaryNotification), 0441 (i.e., CollectivePaymentOrderRequest), 0442 (i.e., PaymentAdviceNotification), 0470 (i.e., BankAccountStatementNotification), 0601 (i.e., PersonnelTimeSheetInformation).

MileageReimbursementVehicleClassCode

A MileageReimbursementVehicleClassCode is the coded representation of a vehicle class to which the same statutory, contractual, or company expense regulations apply regarding the reimbursement of travel costs. An example for the use of the MileageReimbursementVehicleClassCode can be the legal requirement in Great Britain involving the following four classes: Cars up to 1000 cc engine displacement, Cars from 1001 to 1500 cc engine displacement, Cars from 1501 to 2000 cc engine displacement, and Cars over 2000 cc engine displacement. An example of MileageReimbursementVehicleClassCode is:

<MileageReimbursementVehicleClassCode>1</MileageReimbursementVehicleClassCode>

In certain implementations, MileageReimbursementVehicleClassCode may have the following structure:

| GDT | | Cat. | Object Class | Property | Representation/ Association | Type | Type Name | Len. | Card. | Remarks |
|---|---|---|---|---|---|---|---|---|---|---|
| Mileage-Reimbursement-Vehicle-ClassCode | | | Mileage Reimbursement Vehicle | Class | Code | CDT | Code | 1..2 | | restricted |
| | listID | A | Code List | Identification | Identifier | Xsd | token | | 0..1 | |

Several custom code lists may be assigned to the MileageReimbursementVehicleClassCode, one of which may be selected at runtime based on which the ExpenseReportProvisionVariantCode may be involved.

A detailed description of attributes may include a listID, for example. The listID may include the ID of the custom code list.

MileageReimbursementVehicleClassCodeContextElements

MileageReimbursementVehicleClassCodeContextElements may define a dependency or environment in which MileageReimbursementVehicleClassCode appears. The environment may be described by context categories. The context categories in MileageReimbursementVehicleClassCodeContextElements can be the allowed code values of MileageReimbursementVehicleClassCode based on the environment.

In certain implementations, MileageReimbursementVehicleClassCodeContextElements may have the following structure:

| GDT | | Cat. | Object Class | Property | Representation/Association | Type | Type Name | Card. |
|---|---|---|---|---|---|---|---|---|
| MileageReimburdementVehicleClassCodeContextElements | | | MileageReimbursementVehicleClassCode Context Elements | | Details | | | |
| | ExpenseReport-Provision-VariantCode | E | MileageReimbursementVehicleClassCode Context Elements | ExpenseReport-Provision-Variant | Code | GDT | ExpenseReport-ProvisionVariantCode | 1 |

In the above structure, the ExpenseReportProvisionVariantCode may be a context category that may specify the variant of the expense report regulations. This may determine the valid code values for a specific variant.

MileageReimbursementVehicleTypeCode

The MileageReimbursementVehicleTypeCode is the coded representation of the vehicle type to which the same statutory, contractual, or company expense regulations apply regarding the reimbursement of travel costs. An example of the Mileage ReimbursementVehicleTypeCode is:

<MileageReimbursementVehicleTypeCode>1</MileageReimbursementVehicleTypeCode>

In certain implementations, MileageReimbursementVehicleTypeCode may have the following structure:

| GDT | | Cat. | Object Class | Property | Representation/Association | Type | Type Name | Len. | Card. | Remarks |
|---|---|---|---|---|---|---|---|---|---|---|
| MileageReimbursementVehicleTypeCode | | | Mileage Reimbursement Vehicle | Type | Code | CDT | Code | 1..2 | | restricted |
| | listID | A | Code List | Identification | Identifier | xsd | token | | 0..1 | |

Several custom code lists may be assigned to MileageReimbursementVehicleTypeCode, one of which may be selected at runtime based on which ExpenseReportProvisionVariantCode is involved. The listID may include the ID of the custom code list.

With most statutory expense regulations, the passenger motor vehicle type can be applicable. An example for the use of the MileageReimbursementVehicleTypeCode can be the Norwegian law, for example, that provides for the following types: Motor scooter, bicycle, on foot, Passenger motor vehicle, Large boat, Small boat, Motorcycle, Other land or water craft, or Snowmobile.

MileageReimbursementVehicleTypeCodeContextElements

The MileageReimbursementVehicleTypeCodeContextElements defines a dependency or environment in which MileageReimbursementVehicleTypeCode appears. The environment can be described by context categories. The context categories in MileageReimbursementVehicleTypeCodeContextElements may restrict the allowed of code values of MileageReimbursementVehicleTypeCode based on the environment.

In certain implementations, MileageReimbursementVehicleTypeCodeContextElements may have the following structure:

| GDT | | Cat. | Object Class | Property | Representation/Association | Type | Type Name | Card. |
|---|---|---|---|---|---|---|---|---|
| MileageReimbursementVehicleTypeCodeContextElements | | | MileageReimbursementVehicleType-Code Context Elements | | Details | | | |
| | ExpenseReport-Provision-Variant-Code | E | MileageReimbursementVehicleType-Code Context Elements | Expense-Report-Provision-Variant | Code | GDT | Expense-Report-Provision-Variant-Code | 1 |

The ExpenseReportProvisionVariantCode is a context category that may specify the variant of the expense report regulations. This may determine the valid code values for a specific variant. MIMECode MIMECode is the coded representation of the medium type (i.e., image, audio, video, application) of the binary content according the corresponding MIME type recommendations. An example of the MIMECODE type is:

<MIMECode>5</MIMECode>

In certain implementations, the MIMECODE may have the following structure:

| GDT | Object Class | Representation/Association | Type | Type Name | Len. | Remarks |
|---|---|---|---|---|---|---|
| MIMECode | MIME | Code | CDT | Code | 1..n | restricted |

A standard code list may be assigned to the MIMECode. Possible attributes values may be assigned as follows: listID=RFC 2045, listVersionID=2005-08-23, listAgencyID=IETF.

Name

Name is a word or combination of words used to name or define an object. An example of Name_Text may be:

<ProductName>NW Feezer SJ-450</ProductName>

In certain implementations, Name_Text may have the following structure:

| GDT | | Cat. | Object Class | Property | Representation/Association | Type | Type Name | Len. | Card. | Remarks |
|---|---|---|---|---|---|---|---|---|---|---|
| Name | | | Name | | Text | CDT | Text | | | |
| | language-Code | A | Name | language Code | Code | CDT | Language Code | 2..9 | 0..1 | |

Name can be a basic GDT that can be based on the secondary representation term Name of the CDT text.

Name could be used for object label texts that are usual in a natural language context. It could be the name of a person, location, service, or product, for example.

The Name can be language-dependent. If a language-dependent name is used, the attribute “languageCode” can be used to determine the language of the name in accordance with IETF RFC 1766 or IETF RFC 3066 (see explanation of GDT “LanguageCode”). There can be object names that are different in different languages: Bodensee (e.g., German) and Lake Constance (e.g., English) or Ostsee (e.g., German) and Baltic Sea (e.g., English). In this case, it can be necessary to specify the language using the attribute “languageCode.”

LANGUAGEINDEPENDENT_Name

An example of Restricted GDT LANGUAGEINDEPENDENT_Name is:

<DocumentPathName>//xyz123/Documents/Info.txt</DocumentPathName>

In previous example, “DocumentPath” may be a qualifier that might replace LANGUAGEINDEPENDENT_in a business entity (e.g., element name).

In certain implementations, LANGUAGEINDEPENDENT_Name can have the following structure:

| GDT | Object Class Qualifier | Object Class | Property | Type | Type Name | Len. |
|---|---|---|---|---|---|---|
| LANGUAGEINDEPENDENT_Name | LANGUAGEINDEPENDENT_ | Name | Type | CDT | Text | 1..10 |

Since LANGUAGEINDEPENDENT_Name may be language independent, the attribute languageCode of the CDT Text may be omitted. For language dependent names the GDT Name could be used. The GDT Name may have an attribute languageCode to specify the language.

SHORT_Name

An example of SHORT_Name is:

<DepartmentAbbreviatedName languageCode="EN">AP_ENG</DepartmentAbbreviatedName>

In this example, "DepartmentAbbreviated" is a qualifier, which may replace SHORT_in a business entity (e.g., element name).

In certain implementations, SHORT_Name may have the following structure:

| GDT | | Cat. | Object Class Qualifier | Object Class | Property | Representation/Association | Type | Type Name | Len. | Card. |
|---|---|---|---|---|---|---|---|---|---|---|
| SHORT_Name | | | SHORT_ | Name | Type | | CDT | Text | 1..10 | |
| | language-Code | A | SHORT_ | Name | Language | Code | CDT | Language-Code | 2..9 | 0..1 |

In certain implementations, SHORT_Name may be considered a restriction on GDT Name to specify a uniform length for short names. SHORT_Name can contain the variable "SHORT_," which may be replaced by one (or more) qualifier.

LANGUAGEINDEPENDENT_SHORT_Name

An example of Restricted GDT LANGUAGEINDEPENDENT_SHORT_Name is:

<DepartmentAbbreviatedName>AP_ENG</DepartmentAbbreviatedName>

In the previous example, "DepartmentAbbreviated" is a qualifier, which replaces LANGUAGEINDEPENDENT_SHORT_in a business entity (e.g., element name).

In certain implementations, LANGUAGEINDEPENDENT_SHORT_Name may have the following structure:

| GDT | Object Class Qualifier | Object Class | Property | Type | Type Name | Len. |
|---|---|---|---|---|---|---|
| LANGUAGEINDEPENDENT_SHORT_Name | LANGUAGEINDEPENDENT_SHORT_ | Name | Type | CDT | Text | 1..10 |

LANGUAGEINDEPENDENT_SHORT_Name may be language independent, so the attribute languageCode of the CDT Text may be omitted.

For language dependent short names the GDT SHORT_Name can be used. The GDT SHORT_Name may possess an attribute languageCode to specify the language.

MEDIUM_Name

An example of MEDIUM_Name is:

<LakeName languageCode="DE">Bodensee</LakeName>

In the previous example, "Lake" may be considered a qualifier, which replaces MEDIUM_in a business entity (e.g., element name).

In certain implementations, MEDIUM_Name can have the following structure:

| GDT | | Cat. | Object Class Qualifier | Object Class | Property | Representation/Association | Type | Type Name | Len. | Card. |
|---|---|---|---|---|---|---|---|---|---|---|
| MEDIUM_Name | | | MEDIUM_ | Name | Type | | CDT | Text | 1..40 | |
| | language-Code | A | MEDIUM_ | Name | Language | Code | CDT | Language Code | 2..9 | 0..1 |

In certain implementations, MEDIUM_Name may be considered a restriction on GDT Name to specify a uniform length for names of medium length. MEDIUM_Name can contain the variable "MEDIUM_," which may be replaced by one (or more) qualifier.

LANGUAGEINDEPENDENT_MEDIUM_Name

An example of Retricted LANGUAGEINDEPENDENT_MEDIUM_Name is:

<LakeNameName>Bodensee</LakeName>

In the above example, "DepartmentAbbreviated" is a qualifier, which may replace LANGUAGEINDEPENDENT_ MEDIUM_, a business entity (e.g., element name). In certain implementations, LANGUAGEINDEPENDENT_MEDIUM_Name may have the following structure:

| GDT | Object Class Qualifier | Object Class | Property | Type | Type Name | Len. |
|---|---|---|---|---|---|---|
| LANGUAGEINDEPENDENT_MEDIUM_Name | LANGUAGEINDEPENDENT_MEDIUM_ | Name | Type | CDT | Text | 1..40 |

LANGUAGEINDEPENDENT_MEDIUM_Name may be language independent, so the attribute languagecode of the CDT Text may be omitted.

For language dependent names of medium length, the GDT MEDIUM_Name could be used. The GDT MEDIUM_Name may possess an attribute languageCode to specify the language.

LONG_Name

An example of LONG_Name is:

<CompanyName languageCode="DE">Minnesota Mining and Manufacturing Incorporated</CompanyName>

In the previous example, "Company" may be considered a qualifier, which may replace LONG_in a business entity (e.g., element name).

In certain implementations, LONG_Name can have the following structure:

| GDT | | Cat. | Object Class Qualifier | Object Class | Property | Representation/Association | Type | Type Name | Len. | Card. |
|---|---|---|---|---|---|---|---|---|---|---|
| LONG_Name | | | LONG _ | Name | Type | | CDT | Text | 1..80 | |
| | language-Code | A | LONG_ | Name | Language | Code | CDT | Language-Code | 2..9 | 0..1 |

The LONG_Name may be considered a restriction on GDT Name and may specify a uniform length for long names. LONG_Name can contain the variable "LONG_," which may be replaced by one (or more) qualifier.

LANGUAGEINDEPENDENT_LONG_Name

An example of Restricted GDT LANGUAGEINDEPENDENT_LONG_Name is:

<CompanyName>Minnesota Mining and Manufacturing Incorporated

</CompanyName>

In the previous example, "DepartmentAbbreviated" may be considered a qualifier, which may replace LANGUAGE-INDEPENDENT_LONG_in a business entity (e.g., element name).

In certain implementations, LANGUAGEINDEPENDENT_LONG_Name may have the following structure:

| GDT | Object Class Qualifier | Object Class | Property | Type | Type Name | Len. |
|---|---|---|---|---|---|---|
| LANGUAGEINDEPENDENT_LONG_Name | LANGUAGEINDEPENDENT_LONG_ | Name | Type | CDT | Text | 1..80 |

LANGUAGEINDEPENDENT_LONG_Name may be considered language independent, so the attribute languageCode of the CDT Text may be omitted.

For language dependent long names, the GDT LONG_Name could be used. The GDT LONG_Name may be considered to have an attribute languageCode to specify the language.

EXTENDED_Name

An example of EXTENDED_Name is:

<CatalogueName languageCode="EN">ACME Industries Catalogue-2005/06</CatalogueName>

In the previous example, "Catalogue" may be considered a qualifier, which may replace EXTENDED_in a business entity (e.g., element name).

In certain implementations, EXTENDED_Name may have the following structure:

| GDT | | Cat. | Object Class Qualifier | Object Class | Property | Represen-tation/As-sociation | Type | Type Name | Len. | Card. |
|---|---|---|---|---|---|---|---|---|---|---|
| EXTENDED_Name | | | EXTENDED_ | Name | Type | | CDT | Text | 1..255 | |
| | language-Code | A | EXTENDED_ | Name | Language | Code | CDT | Language-Code | 2..9 | 0..1 |

The EXTENDED_Name may be considered a restriction on GDT Name and may specify a uniform length for names of extended length. EXTENDED_Name can contain the variable "EXTENDED_" which may be replaced by one (or more) qualifier. REGIONDEPENDENTLANGUAGE_EXTENDED_Name An example of REGIONDEPENDENTLANGUAGE_EXTENDED_Name is:

<CatalogueName languageCode="en-US">Name of this catalog in American English</CatalogueName>

In the previous example, "Catalogue" may be considered a qualifier, which may replace REGIONDEPENDENTLANGUAGE_EXTENDED_in a business entity (e.g., element name).

In certain implementations, REGIONDEPENDENTLANGAUGE_EXTENDED_Name may have the following structure:

| GDT | | Cat. | Object Class Qual. | Object Class | Property | Rep./Ass. | Type | Type Name | Len. | Card. |
|---|---|---|---|---|---|---|---|---|---|---|
| REGIONDEPENDENTLANGUAGE_EXTENDED_Name | | | REGIONDEPENDENTLANGUAGE_EXTENDED_ | Name | Type | | CDT | Text | 1..255 | |
| | language-Code | A | REGIONDEPENDENTLANGUAGE_EXTENDED_ | Name | Language | Code | CDT | REGIONDEPENDENT_LanguageCode | 2..9 | 0..1 |

The _REGIONDEPENDENTLANGUAGE_EXTENDED_Name may be considered region dependent, so the restricted GDT REGIONDEPENDENT_LanguageCode may be used as type for the attribute languagecode.

For language—but not country or region—dependent names of extended length may use the GDT EXTENDED_ame. The GDT EXTENDED_Name may use the unrestricted GDT LanguageCode for the attribute languagecode to specify the language.

LANGUAGEINDEPENDENT_EXTENDED_Name

An example of Restricted GDT LANGUAGEINDEPENDENT_EXTENDED_Name is:

<CatalogueName>ACME Industries Catalogue—2005/06</CatalogueName>

In the previous example, "Catalogue" may be considered a qualifier, which may replace LANGUAGEINDEPENDENT_EXTENDED_in a business entity (e.g., element name).

In certain implementations, LANGUAGEINDEPENDENT_EXTENDED_Name may have the following structure:

| GDT | Object Class Qualifier | Object Class | Prop-erty | Type | Type Name | Len. |
|---|---|---|---|---|---|---|
| LANGUAGEINDEPENDENT_EXTENDED_Name | LANGUAGEINDEPENDENT_EXTENDED_ | Name | Type | CDT | Text | 1..255 |

The LANGUAGEINDEPENDENT_EXTENDED_Name may be considered language independent, so the attribute languageCode of the CDT Text may be omitted.

For language dependent names of extended length the GDT EXTENDED_Name could be used. The GDT EXTENDED_Name may have an attribute languageCode to specify the language.

The list of qualifiers may include the following qualified GDT names and definitions: AcademicTitleName can represent an academic title of a person. AuthorityLocationName can represent a name of the location of an authority. BirthName can represent a birth name of a person. BirthPlaceName can represent a name for a person's place of birth. BusinessDocumentFlowBusinessTransactionDocumentPropertyName can represent a name of a property of a business document in a document flow. BusinessPartnerAdditionalName can represent an additional name for a business partner. A business partner can be a person, organization, or group of people/organizations in which a company has a business interest. The additional name for a business partner may be identical to the organization name, group name or person's first name. BusinessPartnerBankDetailsName is a word, or a combination of words, designating or describing the bank details of a business partner. In addition to specifying an account, the bank details of a business partner may also contain administrative information. BusinessPartnerFormattedName can represent a Complete, formatted name for a business partner. The BusinessPartnerFormattedName may be formed using individual name components according to certain rules, such as, "Marco van Baster" or "Mechanical Engineering Specialist Miller Ltd." BusinessPartnerGroupName can represent a Business- PartnerPartnerGroupName which is a word, or a combination of words, designating or describing a partner group. Party group may include persons or organizations that have merged. This merger can be the result of a common purpose or the occurrence of an event. Partner groups may be mapped as business partners of the category group. BusinessPartnerName can represent a Name for a business partner. A business partner can be a person, organization, or group of people/organizations in which a company has a business interest. The name for a business partner may be identical to the first component of the organization name or group name, or the person's last name. CareOfName can represent a Part of the address (e.g., c/o=care of), if the recipient deviates from the occupant and no relation can be established from the name (for example, for roomers). CatalogueName can represent a Name of a catalog. A catalog may be a structured directory of catalog items. CatalogueSchemaName can represent a Name of a catalog schema. A catalog schema may define a structural composition of the catalog content regarding a certain purpose. CatalogueSchemaSectionName can represent a Name of a catalog schema section. A catalog schema section may group catalog items according to a schema. CatalogueViewName can represent a Name of a catalog view. A catalog view may define a subset of a catalog by specifying sections, catalog items and item relationship types to be included and properties to be excluded. CityName can represent a Name of a city or locality. ClassificationSystemName can represent a ClassificationSystemName which may be a word, or a combination of words describing a classification system. CompensationComponentType-CatalogueName can represent a Name of a catalog of compensation component types. A compensation component type catalog may be a structured index of compensation component types.

CompensationComponentType-GroupName can represent a CompensationComponentTypeGroupName which may be a word, or a combination of words, designating or describing a compensation component type group. A compensation component type group may be a grouping of compensation component types that are subject to the same rules. CompensationComponentTypeName can represent a Name of a compensation component type. A CompensationComponentType may describe the employee compensation components in the context of Human Resources. CompensationStructureGradeName can represent a CompensationStructureGradeName which may be a word, or a combination of words, designating or describing a pay grade range of a compensation structure. A compensation structure may be an organized structure of pay grade ranges. A pay grade range reflects the value of tasks and activities in the company.

CompensationStructureName can represent a CompensationStructureName which may be a word, or a combination of words, designating or describing a compensation structure. A compensation structure may be an organized structure of pay grade ranges. A pay grade range reflects the value of tasks and activities in the company. CorrespondenceShortName can represent a Short name of correspondence. DemandHistoryName can represent a Name for demand history. A demand history may be the quantitative representation of sales or consumption of products within a historical period. This may include corrections of the sales quantities. DemandPlanningForecastName can represent a Name for demand planning forecast. A demand planning forecast may be a quantitative forecast of the product sales within a planning period that is generated according to requirements at product, brand or customer group level.

DemandPlanningForecast VersionName can represent a Name for a version of a demand planning forecast. A version of a demand planning forecast may be a version that is recorded separately and that is usually distinguished from the other versions in the forecast sales as well as the subselections and planning functions. DepartmentName can represent a Name of a department. DeviatingFullName can represent a Formatted name of the person if it deviates from the formatted name determined from name formatting. DistrictName can represent a Name of a quarter or district. DocumentAlternativeName can represent an alternative name of a document DocumentName can represent a Name of a document. The DocumentName is equivalent to the last part of the DocumentPathName. A name can contain all characters except in some implementations the separator "/." DocumentPathName can represent a Complete name of a document path. The DocumentPathName may be structured hierarchically and may be comprised of the complete name of the folder in which the document is stored and the name of the document itself, where the two components are separated by a "/." DocumentPropertyName can represent a Name of a document property. FamilyName can represent a Family name of a person. FormOfAddressName can represent a the salutation for the person. FunctionalTitleName can represent a Name of the function of a person in a company, for example, contact person within a company. GivenName can represent a Given name of a person. IdentifierIssuingAgencyName can represent an IdentifierIssuingAgencyName which may be a word, or a combination of words, designating or describing an agency that assigns an ID number (e.g., identifier). The agency can be an authority (e.g., such as the office for the registration of residents), a company (e.g., Dun & Bradstreet), or an organization (e.g., UN). InitialsName can represent an initials of a person. InstalledBaseName can represent a Name of an InstalledBase. An installed base may be a functionally-structured arrangement of business objects at a logical or physical location. InstallationPointName can represent a name of an InstallationPoint. An installation point may be the physical or logical location at which a business object, for example a material or software, is installed during a certain period of time. LocationName can represent a Name of a location. MessageFromName can represent a Name of an object that is assigned to the sender. MiddleName can represent a Second given name of a person. NamePrefixName can represent a Prefix for the name of a person, for example 'Van der'. NameSupplementName can represent a Name affix, for example, a title of nobility. NickName can represent a Nick name of a person. PartyFormattedName can represent a complete, formatted name for a party. The PartyFormattedName may be formed according to certain rules using individual name components, for example, "Marco van Baster" or "Mechanical Engineering Specialist Miller Ltd.". PaymentCardHolderName can represent a Name of the payment card holder. The payment card holder can be a person or a company. The first and last names are normally specified for persons. PaymentCardIssuerName can represent a name of the bank or organization that issues the payment card. PaymentCardNickName can represent a nick name for a payment card. The nick name may be agreed between the card user and the merchant. During a purchase, the nick name can be used to identify the payment card instead of the detailed card data. PersonFormattedName can represent a Complete, formatted name for a person. The PersonFormattedName may be formed according to certain rules using individual name components, for example, "Marco van Baster." PlanningLevelName can represent a Name for demand planning level. A planning level may be a view of the sales data on which the data can be changed interactively or by means of planning functions. PlanningLevelSubSelectionName can represent a name for a sub-selection of a planning level. A subselection is a restriction of the planning scope by characteristic values. PlanningLevelSubSelectionPlanning-FunctionName can represent a name for a planning function of a subselection of a planning level. A planning function in Demand Planning may be a mathematical function or a rule for calculating sales quantities. ProjectRoleName can represent a name for a role in a project. ProjectServiceSpecialisationName can represent a name of a service specialization in a project. A ProjectServiceSpecialisation specifies which specialization of the service is used in the project. ProjectTaskChecklistName can represent a name of a checklist for a task in a project. ProjectTaskName can represent a name for a task in a project. PropertyDataTypeComponentName can represent a name of a property data type component. A property data type component may define a component of a composite property data type. PropertyDataTypeName can represent a name of a property data type. PropertyDataTypeValueName can represent a name of a property data type value. A property data type value defines a data type value that is allowed in a valuation of the associated properties. PropertyName can represent a name of a property. RequirementSpecificationName can represent a name or title of a RequirementSpecification. RequirementSpecificationRequirementFolderRequirementName can represent a name or title of a requirement within a RequirementFolder of a RequirementSpecification. RequirementSpecificationSpecificationFolderSpecificationName can represent a name or title of a specification within a SpecificationFolder of a RequirementSpecification. SoftwareChangeActionLogEntryName can represent a name of a log record of each action performed by a user or the system during the implementation of the SoftwareChange. SoftwareChangeManualTaskName can represent a name of a manual task during implementation of Software Change. SoftwareChangeName can represent a name of a Software Change. A Software Change can be the notification on a recommended maintenance package (patch, update or continuous change package) for a dedicated system. It may contain information used to control the implementation process. SoftwareChangeOptionalUpdateComponentName can represent a Name of an optional update component in a Software Change. An OptionalUpdateComponent can for example be language or ISV specific software updates. ServiceIssueCategoryCatalogueName can represent a name for an issue category catalog in Customer Service. ServiceIssueCategoryName can represent a Name for an issue category in Customer Service. SourceAndDestinationDeterminationRuleName can represent a name of a Source and Destination DeterminationRule. Source and Destination DeterminationRule may be considered a rule for identifying the source storage location for stock retrieval or the destination storage location for stock placement, specifying the criteria for when the rule is to be applied.

StorageBehaviourMethodName can represent a name of a Storage Behaviour Method. Storage Behaviour Method may be a set of rules that defines the manner in which a storage location is managed. StreetPrefixName can represent an additional address field above the street. StreetSuffixName can represent a Additional address field below the street. TaskName can represent a name for a Task in the context of Business Task Management. VehicleMakeName can represent a Name of the manufacturer of a vehicle.

NameInterval

A GDT NameInterval is an interval of names defined by a lower and an upper boundary. An example of GDT NameInterval is:

<DocumentNameInterval>

<IntervalBoundaryTypeCode>3</IntervalBoundaryTypeCode>

<LowerBoundaryName languageCode="EN">a</LowerBoundaryName>

<UpperBoundaryName languageCode="EN">ZZZZZZZZZZZZZZZZZZZZ</UpperBoundaryName>

</DocumentNameInterval>

In certain implementations, GDT NameInterval may have the following structure:

| GDT | | Cat. | Object Class | Property Qualifier | Property | Representation/ Association | Type | Type Name | Card. |
|---|---|---|---|---|---|---|---|---|---|
| Name-Interval | | | Name Interval | | | Details | | | |
| | Interval-Boundary-TypeCode | E | Name Interval | | Interval Boundary Type | Code | GDT | Interval Boundary-TypeCode | 1 |
| | Lower-Boundary-Name | E | Name Interval | Lower | Boundary | Name | CDT | Name | 0..1 |
| | Upper-Boundary-Name | E | Name Interval | Upper | Boundary | Name | CDT | Name | 0..1 |

In the previously described structure, IntervalBoundaryTypeCode defines the type of interval (e.g., single value, open upper and lower interval boundaries . . . ). LowerBoundaryName is the lower boundary of the name interval. It may be used for name intervals that contain a value. UpperBoundaryName is the upper boundary of the name interval. LowerBoundaryName and UpperBoundaryName may both contain the same language code. The order underlying the NameInterval is the lexicographic order.

NameInterval can be used to restrict the output of a query operation. For all output items the values of the attribute linked to the NameInterval instance provided as query input may be located in the specified name interval.

SHORT_NameInterval

An example of SHORT_NameInterval is:

<ClassificationSystemNameInterval>

<IntervalBoundaryTypeCode>3</IntervalBoundaryTypeCode>

<LowerBoundaryName languageCode="EN">a</LowerBoundaryName>

<UpperBoundaryName languageCode="EN">ZZZZZZZZZZZZZZZZZZZZ

< UpperBoundaryName>

</ClassificationSystemNameInterval>

In the previous example, "ClassificationSystem" may be considered a qualifier, which may replace SHORT_in a business entity (e.g., element name).

In certain implementations, SHORT_NameInterval may have the following structure:

| GDT | | Cat. | Object Class | Property Qualifier | Property | Representation/ Association | Type | Type Name | Card. |
|---|---|---|---|---|---|---|---|---|---|
| SHORT_ NameInterval | | | SHORT_Name Interval | | | Details | | | |
| | Interval-Boundary-TypeCode | E | SHORT_Name Interval | | Interval Boundary Type | Code | GDT | Interval-Boundary-Type Code | 1 |
| | Lower-Bound-aryName | E | SHORT_Name Interval | Lower | Boundary | Name | GDT | SHORT_Name | 0..1 |
| | Upper-Bound-aryName | E | SHORT_Name Interval | Upper | Boundary | Name | GDT | SHORT_Name | 0..1 |

SHORT_NameInterval may be considered to be a restriction on GDT SHORT_Name. Thus the prefix "SHORT_" may contain a variable, which may be replaced by one (or more) qualifier.

MEDIUM_NameInterval

An example of MEDIUM_NameInterval is:

<LocationNameInterval>

<IntervalBoundaryTypeCode>3</IntervalBoundaryType-Code>

<LowerBoundaryName languageCode="EN">a</Lower-BoundaryName>

<UpperBoundaryName languageCode="EN">ZZZZZZZZZZZZZZZZZZZZ</Up-perBoundaryName>

</PersonNameInterval>

In the previous example, "Location" may be considered a qualifier, which may replace MEDIUM_in a business entity (e.g., element name).

In certain implementations, MEDIUM_NameInterval may have the following structure:

| GDT | | Cat. | Object Class | Property Qualifier | Property | Representation/ Association | Type | Type Name | Card. |
|---|---|---|---|---|---|---|---|---|---|
| MEDIUM_ NameInterval | | | MEDIUM_ Name Interval | | | Details | | | |
| | Interval-Boundary-TypeCode | E | MEDIUM_ Name Interval | | Interval Boundary Type | Code | GDT | Interval-Boundary-TypeCode | 1 |
| | Lower-Boundary-Name | E | MEDIUM_ Name Interval | Lower | Boundary | Name | GDT | MEDIUM_ Name | 0..1 |
| | Upper-Boundary-Name | E | MEDIUM_ Name Interval | Upper | Boundary | Name | GDT | MEDIUM _ Name | 0..1 |

MEDIUM_NameInterval may be considered a restriction of the GDT MEDIUM_Name. Thus the prefix "MEDIUM_" can be considered a variable, which may be replaced by one (or more) qualifier.

LONG_NameInterval

An example of LONG_NameInterval is:

<CompensationStructureNameInterval>

<IntervalBoundaryTypeCode>3</IntervalBoundaryType-Code>

<LowerBoundaryName languageCode="EN">a</Lower-BoundaryName>

<UpperBoundaryName languageCode="EN">ZZZZZZZZZZZZZZZZZZZZ <UpperBoundaryName>

</CompensationStructureNameInterval>

In the previous example, "CompensationStructure" may be considered a qualifier, which may replace LONG_in a business entity (e.g., element name).

In certain implementations, LONG_NameInterval may have the following structure:

| GDT | | Cat. | Object Class | Property Qualifier | Property | Representation/ Association | Type | Type Name | Card. |
|---|---|---|---|---|---|---|---|---|---|
| LONG_ NameInterval | | | LONG_ Name Interval | | | Details | | | |
| | Interval-Boundary-TypeCode | E | LONG_ Name Interval | | Interval Boundary Type | Code | GDT | Interval-Boundary-TypeCode | 1 |
| | Lower-BoundaryName | E | LONG_ Name Interval | Lower | Boundary | Name | GDT | LONG_Name | 0..1 |
| | Upper-BoundaryName | E | LONG_ Name Interval | Upper | Boundary | Name | GDT | LONG_Name | 0..1 |

LONG_NameInterval may be considered a restriction of GDT LONG_Name. Thus the prefix "LONG_" may contain a variable, which may be replaced by one (or more) qualifiers.

NamespaceURI

A NamespaceURI is a uniform resource identifier for a namespace. A namespace can be a collection of names that is identified by means of an identifier. A namespace may be used to assign an object in a specific context, in order to avoid name conflicts. An example of NamespaceURI is:

<NamespaceURI>http://xxx.com/xmlns/cm</NamespaceURI>

In certain implementations, NamespaceURI may have the following structure:

| GDT | Cat. | Object Class | Property Qual. | Property | Rep./ Ass. | Type | Type Name | Len. | Card. | Remarks |
|---|---|---|---|---|---|---|---|---|---|---|
| NamespaceURI | | Namespace | | | URI | CDT | URI | | | |

A namespace may be identified by means of a uniform resource identifier (URI).

NetworkPlanElementSuccessionTypeCode

A NetworkPlanElementSuccessionTypeCode is the coded representation of the type of the directed relationship between two successive elements in a network plan. A network plan can be an arrangement of activities and their relationships. A network element can be an activity in a network plan. The activity can describe any kind of action, and is not necessarily a supply chain management activity. An example of NetworkPlanElementSuccessionTypeCode is:

<NetworkPlanElementSuccessionTypeCode>1</NetworkPlanElementSuccessionTypeCode>

In certain implementations, NetworkPlanElementSuccessionTypeCode may have the following structure:

| GDT | Object Class | Property | Representation/ Association | Type | Type Name | Len. | Remarks |
|---|---|---|---|---|---|---|---|
| Network-PlanElementSuccessionType-Code | Network Plan Element | Succession Type | Code | CDT | Code | 1..2 | Restricted |

The attributes may have assigned values as follows: listID="10258," listAgencyID="310," listVersionID can be the ID of the particular code list. The code list and its values may include: Code 1 (i.e., Start-To-Start (SS) where the start of the successor can be dependent on the start of the predecessor), Code 2 (i.e., Finish-To-Start (FS) where the start of the successor may be dependent on the end of the predecessor), Code 3 (i.e., Finish-To-Finish (FF) where the end of the successor may be dependent on the end of the predecessor), and Code 4 (i.e., Start-ToFinish (SF) where the end of the successor may be dependent on the start of the predecessor).

NielsenRegionCode

A NielsenRegionCode is the coded representation of a Nielsen region. A Nielsen region is a part of a subdivision of a country into several regions by the American enterprise A.C. Nielsen. An example of the NielsenRegion Code is:

<NielsenRegionCode>1</NielsenRegionCode>

In certain implementations, the NielsenRegionCode may have the following structure:

| GDT | | Cat. | Object Class | Property | Representation/ Association | Type | Type Name | Len. | Card. | Remarks |
|---|---|---|---|---|---|---|---|---|---|---|
| Nielsen-Region-Code | | | Nielsen Region | | Code | CDT | Code | 1..2 | | Restricted |
| | listID | A | Code List | Identification | Identifier | xsd | token | | 0..1 | |
| | list-AgencyID | A | Code List Agency | Identification | Identifier | xsd | token | | 0..1 | |
| | list-VersionID | A | Code List | Version | Identifier | xsd | token | | 0..1 | |
| | list-Agency-SchemeID | A | Code List Agency | Scheme | Identifier | xsd | token | | 0..1 | |
| | listAgency-Scheme-AgencyID | A | Code List Agency | Scheme Agency | Identifier | xsd | token | | 0..1 | |

A customer-specific code list can be assigned to the NielsenRegionCode. The attributes of NielsenRegionCode may be assigned values as descripted under section "Detailed Description of Attributes."

The following attributes may be described as follows: listID (i.e., ID of the particular code list, i.e., 10208), listAgencySchemeID (i.e., ID of the scheme if the listAgencyID does not come from DE 3055), listAgencySchemeAgencyID (i.e., ID of the organization from DE 3055 that manages the listAgencySchemeID scheme).

Nielsen regions may provide the option to divide a region in which an industrial or commercial enterprise takes care of new customers, or wishes to win new ones. Using these subdivisions, information regarding these regions can be acquired from A.C. Nielsen, for example, for planning of sales promotions.

The purpose of subdivision may be continually checked by A.C. Nielsen, and if necessary, can be updated, during which political borders (i.e., federal states, districts, and so on) can be taken into account. Reasons for changing a region could be, for example, a strong growth in the economy of a region or a former Nielsen region, or the reunification of countries (i.e., German reunification).

Semantic examples of customer-specific or A.C. Nielsen codes may include: 3a where A.C.Nielsen region 3a; includes Hesse, Rhineland-Palatinate and the Saarland in Germany or 5 where A.C.Nielsen region 5 includes Berlin in Germany.

Note

A Note is a natural-language comment on a situation or subject. An example of Note is:

<DocumentNote>Order 4 Apr. 2002</DocumentNote>

In certain implementations, Note may have the following structure:

| GDT | | Cat. | Object Class | Property | Representation/ Association | Type | Type Name | Len. | Car. |
|---|---|---|---|---|---|---|---|---|---|
| Note | | | Note | | Text | xsd | String | ∞ | |
| | language Code | A | Note | Language Code | Code | GDT | Language-Code | 2..9 | 0..1 |

Note may be based on the CDT text. Note may contain a "languageCode" attribute for determining the particular language of the element.

Note can be used, for example, to provide notes on the handling of a product or delivery or to (i.e., informally) record a customer's satisfaction with a service.

NumberRangeIntervalBusinessPartnerGroupCode

A NumberRangeIntervalBusinessPartnerGroupCode is the coded representation of a group of business partners for whom the numbers are assigned from the same number range. A number range interval can be an interval of successive alphanumeric characters within a number range. There could be several non-overlapping number range intervals within a number range. An example of NumberRangeIntervalBusinessPartnerGroupCode is:

<NumberRangeIntervalBusinessPartnerGroupCode>1</NumberRangeIntervalBusinessPartnerGroupCode>

In certain implementations, NumberRangeIntervalBusinessPartnerGroupCode may have the following structure:

| GDT | Object Class Qualifer | Object Class | Representation/ Association | Type | Type Name | Len. | Remarks |
|---|---|---|---|---|---|---|---|
| Number-RangeInter-valBusiness-Partner-GroupCode | Number Range Interval | Business Partner Group | Code | CDT | Code | 1..4 | Restricted |

A customer-specific code list may be assigned to the code. The attributes of the code can be assigned the following values: listID="10360," listAgencySchemeID—ID of the scheme if the listAgencyID does not come from DE 3055, listAgencySchemeAgencyID—ID of the organization from DE 3055 that manages the listAgencySchemeID scheme.

Semantic examples of customer-specific codes may include: Major customers (i.e., Major customers with internal number assignment) or Legacy customers (i.e., Legacy customers with external number assignment).

NumberValue

NumberValue is a number. An example of NumberValue is:

<NumberValue>42</NumberValue>

In certain implementations, NumberValue may have the following structure:

| GDT | Rep./Ass. Qual. | Representation/ Association | Type | Type Name | Len. | Card. | Remarks |
|---|---|---|---|---|---|---|---|
| NumberValue | Number | Value | xsd | nonNegative-Integer | 9 | | |

Nonnegative integers that are less than one billion may be allowed (i.e., 0-999999999).

NumberValue can be used, for example, to specify the number of objects contained in a list. NumberValue may appear in a business role. In the element name, these roles can be given as qualifiers that are written as prefixes to the name "NumberValue."

The following roles may be allowed: BaseNumberValue (i.e., Number of something that may provide a basis for something), DayNumberValue (i.e., Number of days), DigitNumberValue (i.e., Number of digits in the representation of a real number or a whole number. For example, the total number of digits or the number of decimal places for decimal numbers, or the length of the mantissa for numbers with floating points), FlatRateNumberValue (i.e., Number of flat rates), MaximumNumberValue (i.e., Maximum number of elements in a quantity), MealNumberValue (i.e., Number of meals), ParticipantNumberValue (i.e., Number of participants), PassengerNumberValue (i.e., Number of passengers), ReceiptNumberValue (i.e., Number of receipts), TotalNumberValue (i.e., Number of elements of a total number), SampleSizeNumberValue (i.e., Sample size, it could describe the number of units to be taken in a sample test).

Combinations of the above-mentioned qualifiers can be allowed, but reasons could be provided for the specific usage.

The GDT NumberValue can be used for cardinal numbers. For ordinal numbers, the GDT OrdinalNumberValue can be used.

ObjectCategoryCode

FIG. 32-B illustrates an ObjectCategoryCode. An ObjectCategoryCode is a coded representation of a category of an object. An example of ObjectCategoryCode is:

<ObjectCategoryCode>4</ObjectCategoryCode>

In certain implementations, ObjectCategoryCode may have the following structure:

| GDT | Object Class | Property | Representation/ Association | Type | Type Name | Len. | Remarks |
|---|---|---|---|---|---|---|---|
| ObjectCategoryCode | Object | Category | Code | CDT | Code | 1..2 | restricted |

The attributes may be assigned values including: listID="10475" or listAgencyID="310."

The following codelist may be used: Code 1 (i.e., Business Object. A Business Object (BO) may represent a view on a well defined & outlined business content, and may be well known in the business world (for example, in an international standard or industry best practice), and is a self-contained (i.e., capsule), independent business concept), Code 2 (i.e., Master Data Object. A Master Data Object may be considered a business document, which business content is stable over time), Code 3 (i.e., Business Transaction Document. A Business Transaction Document may be considered a document that occurs in business transactions), Code 4 (i.e., Transformed Object. A Transformed Object (TO) may be considered a transformation of multiple Business Objects for a well defined business purpose. It may transform the structure of these BOs with respect to this purpose and contains nodes/attributes derived from the given BOs. It may allow new attributes only for derived information, e.g., summarization, and can implement new Business Logic. It can also contain transformation nodes, but it is not necessary. It may not define UI logic (e.g., the same applies to transformation nodes; UI logic covered by Controller Object)), Code 5 (i.e., Mass Data Run Object. A Mass Data Run Object may be considered a conceptual description of algorithms and their parameters, which modifies/manages/processes a huge amount of data in multiple transactions), Code 6 (i.e., Dependent Object. A Dependent Object ("DO") may be considered a Business Object used as a reuse part in another business object and represents a concept that cannot stand by itself from a business point of view. Instances of dependent objects can only occur in the context of a business objects), Code 7 (i.e., Technical Object. A Technical Object (i.e., TecO) may be considered an object supporting the technical infrastructure or IT Service and Application Management (ITSAM) of application platform. An example of objects for technical infrastructure (i.e., Netweaver) may include: Task, Incident Context).

ObjectID

An ObjectID is an identifier of an object or object node. An example of Object ID is:

<ObjectID>sifihbifdgdg54574d6fg5fgd6tg4e6fgd4er 8tdvgdfg6er5t4</ObjectID>

In certain implementations, ObjectID may have the following structure:

The values of the attributes of ObjectID may be assigned as described: schemeID (i.e., SchemeID may be the ID of the ID scheme. This can be released and maintained by the responsible organization of the ID scheme. The GDT owner may retrieve the correct ID from the responsible organization. If there is no ID available, the name of the identifier or identifier type can be entered, which can be used in the corresponding standard, specification, or scheme of the responsible organization), schemeVersionID (i.e., SchemeVersionID can be the Version of the ID scheme. This can be released and maintained by the organization, which can be named in

| GDT | | Cat. | Object Class | Property | Rep./Ass. | Type | Type Name | Len. | Card. |
|---|---|---|---|---|---|---|---|---|---|
| ObjectID | | | Object | Identification | Identifier | CDT | Identifier | 1..70 | |
| | schemeID | A | Identification Scheme | Identification | Identifier | xsd | token | | 0..1 |
| | schemeVersionID | A | Identification Scheme | Version | Identifier | xsd | token | | 0..1 |
| | scheme-AgencyID | A | Identification Scheme Agency | Identification | Identifier | xsd | token | | 0..1 |
| | scheme-Agency-SchemeID | A | Identification Scheme Agency | Scheme | Identifier | xsd | token | | 0..1 |
| | scheme-Agency-Scheme-AgencyID | A | Identification Scheme Agency | Scheme Agency | Identifier | xsd | token | | 0..1 |

schemeAgencyID. The owner may retrieve the relevant version ID from the responsible organization. If there is no version for the ID scheme, the version of the standard, the specification, or the scheme can be used), schemeAgencyID (i.e., SchemeAgencyID may be the ID of the organization maintaining the ID scheme. This identification can be released by an organization contained in DE 3055 (e.g., DUNS, EAN . . . ). The GDT owner can retrieve the correct ID from the responsible organization. If the organization is not contained in DE 3055, the procedure described in "Data Type Catalog," 5.6.6.c may be followed), schemeAgencySchemeID (SchemeAgencySchemeID may be the identification of the schema which identifies the organization named in schemeAgencyID. It can be a scheme ID of partners, companies, members etc. (e.g., DUNS+4) of an organization named in schemeAgencySchemeAgencyID (i.e., EAN, DUNS, SWIFT, etc.), schemeAgencySchemeAgencyID (i.e., SchemeAgencySchemeAgencyID may be the identification of the maintaining organization (e.g., DUNS, EAN, SWIFT, etc.) which could be responsible for the identification of the organization named in schemeAgencyID. The organization can be contained in DE 3055).

The ObjectID can be assigned values of existing ID element instances of the Business Object Model. The ObjectID can be used as a generic identifier in case the ID type of a foreign key is not known during design time.

ObjectNodeReference

An ObjectNodeReference is a reference to other objects' nodes that are important within the respective business process. An example of ObjectNodeReference is:

<ObjectNodeReference>

<UUID>f81d4fae-7dec-1d0-a765-00a0c91e6bf6</HostID>

<ObjectID>AAA650001</ObjectID>

<ObjectTypeCode>123</ObjectTypeCode>

<ObjectNodeTypeCode>1000</ObjectNodeTypeCode>

</ObjectNodeReference>

In certain implementations, ObjectNodeReference may have the following structure:

| GDT | | Cat. | Object Class | Property | Rep./Ass. | Type | Type Name | Card. |
|---|---|---|---|---|---|---|---|---|
| ObjectNode-Reference | | | Object Node Reference | | Details | | | |
| | UUID | E | Object Node Reference | Unversally Unique Idenification | Identifier | GDT | UUID | 0..1 |
| | ObjectID | E | Object Node Reference | Object Identification | Identifier | GDT | ObjectID | 0..1 |
| | ObjectType Code | E | Object Node Reference | Object Type | Code | GDT | Object-TypeCode | 1 |
| | Object-NodeType-Code | E | Object Node Reference | Object Node Type | Code | GDT | Object-NodeType Code | 1 |

In the previously described structure, the following may be identified as: UUID (i.e., Identifier of one of an object's nodes), ObjectID (i.e., Any ID of an object or object node, which is an element of the referenced node), ObjectTypeCode (i.e., Type of a hosting object), and ObjectNodeTypeCode (i.e., Type of node in a hosting object).

The types and the identifier could match. This may indicate the node type fits to the type of object and that the UUID or ObjectID may be contained in a node of the according type. Either the UUID or ObjectID can be given.

The ObjectNodeReference can be used for generic references in case the referenced targets can not be specified during design time.

ObjectNodeTypeCode

An ObjectNodeTypeCode is a coded representation of a node type of an object according to their essential characteristics. An example of the Object NodeTypeCode is:

<ObjectNodeTypeCode>4</ObjectNodeTypeCode>

In certain implementations, ObjectNodeTypeCode may have the following structure:

A user of this code can define his code list for additional object nodes. In the previous structure, the following attributes may be described as follows: listID (i.e., ID of the particular code list: 10462), listAgencyID (i.e., list agency ID may be "310" or if a user creates his code list

| GDT | | Cat. | Object Class | Property | Representation/ Association | Type | Type Name | Len. | Card. | Remarks |
|---|---|---|---|---|---|---|---|---|---|---|
| Object-NodeType Code | | | Object Node | Type | Code | CDT | Code | 1..5 | | Restricted |
| | listID | A | Code List | Identification | Identifier | xsd | Token | | 0..1 | |
| | list-AgencyID | A | Code List Agency | Identification | Identifier | xsd | Token | | 0..1 | |
| | list-VersionID | A | Code List | Version | Identifier | xsd | Token | | 0..1 | |
| | listAgency-SchemeID | A | Code List Agency | Scheme | Identifier | xsd | Token | | 0..1 | |
| | listAgency-Scheme-AgencyID | A | Code List Agency | Scheme Agency | Identifier | xsd | Token | | 0..1 | |

during configuration, list agency ID may be the ID of the code user (i.e., ID from DE 3055, if listed there)), listVersionID (i.e., If the code list remains unchanged, list version ID is the version of the particular code list assigned. If a user creates his code list during configuration, list version ID may be the version of particular code list assigned and managed by the code user), listAgencySchemeID (i.e., If a user of this code creates his code list during configuration, list agency scheme ID may be the ID of the scheme if the listAgencyID does not come from DE 3055), listAgencySchemeAgencyID (i.e., If a user of this code creates his code list during configuration, list agency scheme agency Id may be the ID of the organization from DE 3055 that manages the listAgencySchemeID scheme).

The Following Code list may be used: 001 (i.e., PurchaseOrderItem), 002 (i.e., InvoiceItem), 003 (i.e., CreditMemoItem), 004 (i.e., DeliveryCostItem), 005 (i.e., Subsequent Debit Item), 006 (i.e., SubsequentCreditItem), 1 (i.e., reserved), 2 (i.e., reserved), 3 (i.e., reserved), 4 (i.e., reserved), 5 (i.e., reserved), 6 (i.e., reserved), 7 (i.e., AccountingDocumentMaterialLedgerAccountItem), 8 (i.e., AccountingDocumentOtherDirectCostLedgerAccountItem), 9 (i.e., AccountingDocumentOverheadCostLedgerAccountItem), 10 (i.e., AccountingDocumentProductionLedgerAccountItem), 11 (i.e., . . . ). The previous were from an excerpt of download from ESR.

ObjectTypeCode

An ObjectTypeCode is a coded representation of a type of an object. An example of ObjectTypeCode is:

<ObjectTypeCode>4</ObjectTypeCode>

In certain compilations, ObjectTypeCode may have the following structure:

A user of this code may define his or her code list for additional objects.

The following attributes may be described as follows: listID (i.e., ID of the particular code list: 10463), listAgencyID (i.e., If the code list remains unchanged, list agency ID is "310." If a user creates his code list during configuration, list agency ID may be the ID of the code user (ID from DE 3055, if listed there)), listVersionID (i.e., If the code list remains unchanged, list version ID is the version of the particular code list assigned. If a user creates his code list during configuration, list version ID may be the version of particular code list assigned and managed by the code user), listAgencySchemeID (i.e., If a user of this code creates his or her code list during configuration, list agency scheme ID may be the ID of the scheme if the listAgencyID does not come from DE 3055), listAgencySchemeAgencyID (i.e., If a user of this code creates his code list during configuration, list agency scheme agency Id is the ID of the organization from DE 3055 that manages the listAgencySchemeID scheme).

The code list may include the following: Code 001 (i.e., Purchase Order, (please refer to documentation of the object)), Code 002 (i.e., Sales Contract, (please refer to documentation of the object)), Code 003 (i.e., Quote, (please refer to documentation of the object)), Code 004 (i.e., Invoice, (please refer to documentation of the object)), Code 005 (i.e., Credit Memo, (please refer to documentation of the object)), Code 1 (i.e. reserved), Code 2 (i.e. reserved), Code 3 (i.e. reserved), Code 4 (i.e. reserved), Code 5 (i.e. reserved), or Code 6 (i.e. reserved).

| GDT | | Cat. | Object Class | Property | Representation/ Association | Type | Type Name | Len. | Card. | Remarks |
|---|---|---|---|---|---|---|---|---|---|---|
| Object-TypeCode | | | Object | Type | Code | CDT | Code | 1..5 | | restricted |
| | listID | A | Code List | Identification | Identifier | xsd | token | | 0..1 | |
| | list-AgencyID | A | Code List Agency | Identification | Identifier | xsd | token | | 0..1 | |
| | list-VersionID | A | Code List | Version | Identifier | xsd | token | | 0..1 | |
| | listAgency-SchemeID | A | Code List Agency | Scheme | Identifier | xsd | token | | 0..1 | |
| | listAgency-Scheme-AgencyID | A | Code List Agency | Scheme Agency | Identifier | xsd | token | | 0..1 | |

ObjectTypeCodeContextElements

The ObjectTypeCodeContextElements may define a dependency or an environment in which the ObjectTypeCode appears. The environment may be described by context categories. With the context categories in ObjectTypeCodeContextElements, the valid portion of code values of ObjectTypeCode may be restricted according to an environment during use.

In certain implementations, ObjectTypeCodeContextElements may have the following structure:

| GDT | | Cat. | Object Class | Property | Representation/ Association | Type | Type Name | Card. |
|---|---|---|---|---|---|---|---|---|
| Object-Type-Code-Context-Elements | | | Object Type Code Context Elements | | Details | | | |
| | Object-Category-Code | E | Object Type Code Context Elements | Object Category | Code | GDT | Object-Category-Code | 0..1 |

The ObjectCategoryCodecontext category may define the context object category. It may determine the valid code values for a specific object category.

OccupationCode

An OccupationCode represents the occupation of a person in the form of a code. An OccupationCode example is:

<OccupationCode>1</OccupationCode>

In certain implementations, OccupationCode may have the following structure:

| GDT | | Cat. | Object Class | Property | Representation/ Association | Type | Type Name | Len. | Card. | Remarks |
|---|---|---|---|---|---|---|---|---|---|---|
| Occupation-Code | | | | Occupation | Code | CDT | Code | 1..4 | | Restricted |
| | listID | A | Code List | Identification | Identifier | xsd | token | | 0..1 | |
| | listAgencyID | A | Code List Agency | Identification | Identifier | xsd | token | | 0..1 | |
| | listVersionID | A | Code List | Version | Identifier | xsd | token | | 0..1 | |
| | listAgency-SchemeID | A | Code List Agency | Scheme | Identifier | xsd | token | | 0..1 | |
| | listAgency-Scheme-AgencyID | A | Code List Agency | Scheme Agency | Identifier | xsd | token | | 0..1 | |

A customer-specific code list may be assigned to the code.

Semantic examples of customer-specific codes may include: teacher (i.e., The person is a teacher) and Student (i.e., The person is a student).

The following attributes may be described as follows: listID (i.e., ID of the particular code list: 10362), listAgencyID (i.e., ID of the customer (e.g., ID from DE 3055, if listed there)), listVersionID (i.e., Version of the particular code list. Assigned and managed by the customer), listAgencySchemeID (i.e., ID of the scheme if the listAgencyID does not come from DE 3055), listAgencySchemeAgencyID (i.e., ID of the organization from DE 3055 that manages the listAgencySchemeID scheme).

OperationActivityCategoryCode

An OperationActivityCategoryCode is a coded representation of the category of an activity within an operation. An activity may be considered a processing or transportation section of a process description in logistics on a lower-level than the operation. The Categories may be built according to the basic purpose of these activities, e.g., there is a category for setup activities and another for teardown activities. An example of OperationActivityCategoryCode is:

<OperationActivityCategoryCode>1</OperationActivityCategoryCode>

In certain implementations, OperationActivityCategoryCode may have the following structure:

| GDT | Object Class | Property | Representation/Association | Type | Type Name | Len. | Remarks |
|---|---|---|---|---|---|---|---|
| Operation-Activity-Category-Code | Operation Activity | Category | Code | CDT | Code | 1..2 | Restricted |

The attributes may include the following: listID="10311," listAgencyID="310."

The code list and its values may include: Code 1 (i.e., Setup—Activity that may prepare the work center for the operations to be executed), Code 2 (i.e., Produce—Processing of a material at a work center. Setup and tear down are not considered a part of processing), Code 3, (i.e., Tear Down—Activity that returns the work center to its original state after processing the operations), Code 4 (i.e., Single Move—Single transport of materials or logistics units from one location to another target location), Code 5 (i.e., Collective Move—Collective transport of materials or logistics units from several locations to another target location), Code 6 (i.e., Distributed Move—Distributed transport of materials or logistics units from one location to several target locations), Code 7 (i.e., Pack—Packing of materials or logistics units in a logistics unit), Code 8 (i.e., Unpack—Unpacking of materials or logistics units from a logistics unit), and Code 9 (i.e., Homogenous Pack—Packing of a quantity of one material or one logistics unit into a logistics unit).

Together with the OperationActivityTypeCode this code may build up a two-level classification of operations. While the OperationActivityCategoryCode with its fixed code list may be considered to determine the business logic, the code list for the OperationActivityTypeCode may be considered extendable.

OperationActivityID

OperationActivityID is an identifier of an activity in an operation. An activity may be considered a processing or transportation section of a process description in logistics on a lower-level than the operation. An example of OperationActivityID is:

<OperationActivityID>ASSEMBLY__023</OperationActivityID>

In certain implementations, OperationActivityID may have the following structure:

| GDT | Object Class | Property | Representation/Association | Type | Type Name | Card. | Remarks |
|---|---|---|---|---|---|---|---|
| Operation-ActivityID | Operation Activity | Identification | Identifier | CDT | Identifier | 1..40 | Restricted |

An OperationActivityID may be explicit in the context of an operation.

OperationActivityInventoryTypeCode

An OperationActivityInventoryTypeCode is a coded representation of a type of inventory with respect to an operation activity. An OperationActivity may be an action carried out in order to fulfill the operation. The OperationActivityInventory may be considered the book inventory, the counted inventory, or the inventory to be approved or determined by an activity in a specific location. Inventory may be considered the content and quantity in a specific location. A location may be considered an entity in which the content is directly managed, such as bin, handling unit, or resource. An example of OperationActivityInventoryTypeCode is:

<OperationActivityInventoryTypeCode>1</OperationActivityInventoryTypeCode>

In certain implementations OperationActivityInventoryTypeCode may have the following structure:

| GDT | Object Class | Property | Representation/Association | Type | Type Name | Len. | Remarks |
|---|---|---|---|---|---|---|---|
| Operation-Activity-Inventory-Type-Code | Operation Activity Inventory | Type | Code | CDT | Code | 1 | restricted |

The attributes may include the following assigned values: listID="10256" or listAgencyID="310."

The code list and its values may include: Code 1 (i.e., Book Inventory—Book content and quantity that may be expected in a location and which is used in an operation activity), Code 2 (i.e., Counted Inventory—Counted content and quantity in a location which was counted in an operation activity), Code 3 (i.e., Approval Inventory—The content and quantity for approval in a location may result from a comparison of the book inventory and the counted inventory done in an operation activity).

An OperationActivityInventoryTypeCode may be used in a physical inventory count in the preparation, execution, and approval phases. The book inventory could be examined during the preparation phase. The counted inventory may be recorded during the count execution phase. Both the book inventory and the counted inventory may be used to determine an approval inventory that reflects quantity deviation information.

OperationActivityStepID

OperationActivityStepID is an identifier of a work step of an activity in an operation. A work step may be considered the description of a detailed work instruction of a process description in logistics. An example of OperationActivityStepID is:

<OperationActivityStepID>STEP__10</OperationActivityStepID>

In certain implementations, OperationActivityStepID may have the following structure:

| GDT | Object Class | Property | Representation/Association | Type | Type Name | Card. | Remarks |
|---|---|---|---|---|---|---|---|
| Operation-Activity-StepID | Operation Activity Step | Identification | Identifier | CDT | Identifier | 1..40 | Restricted |

An OperationActivityStepID may state the context of an activity in an operation.

OperationActivityTypeCode

An OperationActivityTypeCode is the coded representation of a categorization of activities in an operation. The type may categorize activities according to task. An activity may be considered a processing or transportation section of a process description in logistics on a lower-level than the operation. An example of OperationActivityTypeCode is:

<OperationActivityTypeCode>1</OperationActivityTypeCode>

In certain implementations, OperationActivityTypeCode may have the following structure:

| GDT | | Cat. | Object Class | Property | Representation/Association | Type | Type Name | Len. | Card. | Remarks |
|---|---|---|---|---|---|---|---|---|---|---|
| Operation-Activity-Type-Code | | | Operation Activity | Type | Code | CDT | Code | 1..4 | | restricted |
| | listID | A | Code List | Identification | Identifier | xsd | token | | 0..1 | |
| | listAgencyID | A | Code List Agency | Identification | Identifier | xsd | token | | 1 | |
| | listVersionID | A | Code List | Version | Identifier | xsd | token | | 1 | |
| | listAgency-Scheme-ID | A | Code List Agency | Scheme | Identifier | xsd | token | | 0..1 | |
| | list-Agency-Scheme-Agency-ID | A | Code List Agency | Scheme Agency | Identifier | xsd | token | | 0..1 | |

A description of the attributes may include the following: listID (i.e., ID of the particular code list: 10130), listAgencyID (i.e., If the code list remains unchanged, list agency ID is "310." If a user creates his code list during configuration, list agency ID is the ID of the code user (e.g., ID from DE 3055, if listed there)), listVersionID (i.e., If the code list remains unchanged, list version ID is the version of the particular code list assigned. If a user creates his code list during configuration, list version ID is the version of particular code list assigned and managed by the code user), listAgencySchemeID (i.e., If a user of this code creates his code list during configuration, list agency scheme ID is the ID of the scheme if the listAgencyID does not come from DE 3055), listAgencySchemeAgencyID (i.e., If a user of this code creates his code list during configuration, list agency scheme agency Id is the ID of the organization from DE 3055 that manages the listAgencySchemeID scheme).

Semantic examples of customer-specific codes may be extended by the customer. The customer could extend the code list, for example, to include the code "Clean."

The Code List may include the following: Code 1 (i.e., Setup—Activity that may prepare the work center for the operations to be executed), Code 2 (i.e., Produce—Processing of a material at a work center. Setup and tear down are not a part of processing), Code 3 (i.e., Tear Down—Activity that returns the work center to its original state after processing the operations), Code 4 (i.e., Single Move—Single transport of materials or logistics units from one location to another target location), Code 5 (i.e., Collective Move—Collective transport of materials or logistics units from several locations to another target location), Code 6 (i.e. Distributed Move—Distributed transport of materials or logistics units from one location to several target locations), Code 7 (i.e., Pack—Packing of materials or logistics units in a logistics unit), Code 8 (i.e., Unpack—Unpacking of materials or logistics units from a logistics unit), and Code 9 (i.e., Homogenous Pack—Packing of a quantity of one material or one logistics unit into a logistics unit).

OperationActivityTypeCodeContextElements

The OperationActivityTypeCodeContextElements define a dependency or an environment in which the OperationActivityTypeCode appears. The environment may be described by context categories. With the context categories in OperationActivityTypeCodeContextElements, the valid code values of the OperationActivityTypeCode may be restricted according to the actual values.

In certain implementations, OperationActivityTypeCodeContextElements may have the following structure:

| GDT | | Cat. | Object Class | Property | Representation/Association | Type | Type Name | Card. |
|---|---|---|---|---|---|---|---|---|
| Operation-Activity-Type-Code-Context-Elements | | | Operation Activity Type Code Context Elements | | Details | | | |
| | Task-Type-Code | E | Operation Activity Type Code Context Elements | Logistics Task Type | Code | GDT | Logistics-Task-Type-Code | 0..1 |

-continued

| GDT | | Cat. | Object Class | Property | Representation/Association | Type | Type Name | Card. |
|---|---|---|---|---|---|---|---|---|
| | Operation-Category-Code | E | Operation Activity Type Code Context Elements | Operation Category | Code | GDT | Operation-Category-Code | 0..1 |

In the previous structure, TaskTypeCode context category may be considered to define the context, task type. It may determine the valid code values for a specific task type. The OperationCategoryCode context category may define the context, operation category. It may determines the valid code values for the specific operation category.

OperationAlternativeID

An OperationAlternativeID is an identifier of an alternative operation in an operation. An alternative operation may define default values for an alternative execution of an operation. An example of OperationAlternativeID is:

<OperationAlternativeID>10</OperationAlternativeID>

In certain implementations, OperationAlternativeID may have the following structure:

| GDT | Object Class | Property | Representation/Association | Type | Type Name | Card. | Remarks |
|---|---|---|---|---|---|---|---|
| Operation-Alternative-ID | Operation Alternative | Identification | Identifier | CDT | Identifier | 1..5 | restricted |

An OperationAlternativeID may be explicit in the context of an operation.

OperationCategoryCode

An OperationCategoryCode is a coded representation of the category of operations. An operation may be considered a self-contained process section in a logistics process description that is executed on one or more resources that represent the main resources. The Categories may be built according to the basic purpose of operations, e.g., there is a category for producing operations and another for packing operations. An example of OperationCategoryCode is:

<OperationCategoryCode>1</OperationCategoryCode>

In certain implementations, OperationCategoryCode may have the following structure:

| GDT | Object Class | Property | Representation/Association | Type | Type Name | Len. | Remarks |
|---|---|---|---|---|---|---|---|
| Operation-Category-Code | Operation | Category | Code | CDT | Code | 1..2 | Restricted |

The attributes may include the following: listID="10310," listAgencyID="310."

The code list and its values may include: Code 1 (i.e., Make—Production operation), Code 2 (i.e., Pack—Packing operation that can mean packing or unpacking), Code 3 (i.e., Move—Transportation operation), Code 4 (i.e., MaterialCount—An operation for counting the material physical inventory. In a material count, the quantity of materials is recorded), Code 5 (i.e., LogisticUnitCount—An operation for counting the logistic unit physical inventory. In a logistic unit count, the quantity of logistic units is recorded), Code 6 (i.e., HandlingUnitCount—An operation for counting the handling unit physical inventory. In a handling unit count, the IDs of the handling units are recorded), Code 7 (i.e., CountApproval—An operation for approving the result of a count operation).

Together with the OperationTypeCode this code may build up a two-level classification of operations. While the OperationCategoryCode with its fixed code list may determine the business logic, the code list for the OperationTypeCode may be extendable.

OperationID

OperationID is an identifier of an operation. An operation may be considered a self-contained section of a process in a logistics process description that is executed on one or more resources that represent the main resources. An example of OperationID is:

<OperationID>OP42</OperationID>

In certain implementations, OperationID may have the following structure:

| GDT | Object Class | Property | Representation/Association | Type | Type Name | Len. | Remarks |
|---|---|---|---|---|---|---|---|
| Operation-ID | Operation | Identification | Identifier | CDT | Identifier | 1..40 | Restricted |

The OperationID may be in the usage context.

OperationLogisticUnitRoleCode

An OperationLogisticUnitRoleCode is a coded representation of a role of a logistic unit or a logistic unit group in an operation. An example of OperationLogisticUnitRoleCode is:

<OperationLogisticUnitRoleCode>1</OperationLogisticUnitRoleCode>

In certain implementations, OperationLogisticUnitRoleCode may have the following structure:

| GDT | Object Class | Property | Representation/Association | Type | Type Name | Len. | Remarks |
|---|---|---|---|---|---|---|---|
| Operation-Logistic-UnitRole-Code | Operation_ Logistic Unit | Role | Code | CDT | Code | 1..2 | Restricted |

The attributes may be assigned values as follows: listID="10231," listAgencyID="310."

The code list and its values may include: Code 1 (i.e., Input—The Logistic unit or logistic unit group to be processed within the operation) and Code 2 (i.e., Output—The Logistic unit or logistic unit group which is the outcome of the operation).

OperationLogisticUnitRoleCode may distinguish between different types of logistic unit or logistic unit group assignments according to the role a logistic unit or logistic unit group has in a logistic operation.

OperationTypeCode

An OperationTypeCode is a coded representation of the type of operations. The type may categorize operations according to task. An operation may be considered a self-contained process section in a logistics process description that is executed on one or more resources that represent the main resources. An example of OperationTypeCode is:

<OperationTypeCode>1</OperationTypeCode>

In certain implementations, OperationTypeCode may have the following structure:

A description of attributes

The Code List may include the following: Code 1 (i.e., Make—Production operation), Code 2 (i.e., Pack—Packing operation that can mean packing or unpacking), Code 3 (i.e., Move—Transportation operation), Code 4 (i.e., MaterialCount—An operation for counting the material physical inventory. In a material count, the quantity of materials is recorded), Code 5 (i.e., LogisticUnitCount—An operation for counting the logistic unit physical inventory. In a logistic unit count, the quantity of logistic units is recorded), Code 6 (i.e., HandlingUnitCount—An operation for counting the handling unit physical inventory. In a handling unit count, the IDs of the handling units are recorded), Code 7 (i.e., CountApproval—An operation for approving the result of a count operation).

OperationTypeCodeContextElements

The OperationTypeCodeContextElements define a dependency or an environment in which the OperationTypeCode appears. The environment may be described by context categories. With the context categories in OperationTypeCodeContextElements, the valid portion of code values of OperationTypeCode may be restricted according to an environment during use.

| GDT | | Cat. | Object Class | Property | Representation/ Association | Type | Type Name | Len. | Card. | Remarks |
|---|---|---|---|---|---|---|---|---|---|---|
| Operation-TypeCode | | | Operation | Type | Code | CDT | Code | 1..4 | | Restricted |
| | listID | A | Code List | Identification | Identifier | xsd | token | | 0..1 | |
| | listAgency-ID | A | Code List Agency | Identification | Identifier | xsd | token | | 1 | |
| | listVersion-ID | A | Code List | Version | Identifier | xsd | token | | 1 | |
| | listAgency-SchemeID | A | Code List Agency | Scheme | Identifier | xsd | token | | 0..1 | |
| | list-Agency-Scheme-Agency-ID | A | Code List Agency | Scheme Agency | Identifier | xsd | token | | 0..1 | |

may include the following: listID (i.e., ID of the particular code list: 10132), listAgencyID (i.e., If the code list remains unchanged, list agency ID is "310." If a user creates his code list during configuration, list agency ID is the ID of the code user (e.g., ID from DE 3055, if listed there)), listVersionID (i.e., If the code list remains unchanged, list version ID is the version of the particular code list assigned. If a user creates his code list during configuration, list version ID is the version of particular code list assigned and managed by the code user), listAgencySchemeID (i.e., If a user of this code creates his code list during configuration, list agency scheme ID is the ID of the scheme if the listAgencyID does not come from DE 3055), listAgencySchemeAgencyID (i.e., If a user of this code creates his code list during configuration, list agency scheme agency Id is the ID of the organization from DE 3055 that manages the listAgencySchemeID scheme).

The Operation Type Code may be assigned a Operation Category Code. Together with the OperationCategoryCode this code may build up a two-level classification of operations. While the OperationCategoryCode with its code list may determine the business logic, the code list for the OperationTypeCode may be extendable. The code can be extended by the customer. Semantic examples of customer-specific codes may include, for example: Load, A loading operation.

In certain implementations, OperationTypeCodeContextElements may have the following structure:

| GDT | | Cat. | Object Class | Property | Representation/ Association | Type | Type Name | Card. |
|---|---|---|---|---|---|---|---|---|
| Operation-Type-Code-Context-Elements | | | Operation Type Code Context Elements | | Details | | | |
| | Task-Type-Code | E | Operation Type Code Context Elements | Logistics Task Type | Code | GDT | Logistics-Task-Type-Code | 0..1 |

In the previous structure, the TaskTypeCode context category may define the context Task Type. It may determine the valid code values for a specific Task Type.

OpportunityGroupCode

An OpportunityGroupCode is the coded representation of a group of opportunities for sales displayed according to subjective criteria. A sales opportunity may be used in CRM in order to document recognized sales opportunities, and to support the professional sales person in converting this opportunity. An example of OpportunityGroupCode is:

<OpportunityGroupCode>1</OpportunityGroupCode>

In certain implementations, OpportunityGroupCode may have the following structure:

| GDT | | Cat. | Object Class | Property | Representation/ Association | Type | Type Name | Len. | Card. |
|---|---|---|---|---|---|---|---|---|---|
| Op-portunity-Group-Code | | | Op-portunity | Group | Code | CDT | Code | 1..4 | |
| | listID | A | Code List | Identification | Identifier | Xsd | token | | 0..1 |
| | list-AgencyID | A | Code List Agency | Identification | Identifier | Xsd | token | | 0..1 |
| | list-VersionID | A | Code List | Version | Identifier | Xsd | token | | 0..1 |
| | list-Agency-SchemeID | A | Code List Agency | Scheme | Identifier | Xsd | token | | 0..1 |
| | listAgency-Scheme-AgencyID | A | Code List Agency | Scheme Agency | Identifier | Xsd | token | | 0..1 |

Multiple code lists may be allowed for OpportunityGroup-Code. The customer can add other code lists.

The OpportunityGroupCode may be used in reporting. Customer-Specific Code Lists may include examples of possible semantics of the codes. An example of possible customer-specific code semantics include: Strategic Project (i.e., The OpportunityGroupCode groups sales opportunities according to strategic projects).

A description of attributes may include the following: listID (i.e., ID of the particular code list: 10055), listAgencyID (i.e., If the code list remains unchanged, list agency ID is "310." If a user creates his code list during configuration, list agency ID is the ID of the code user (e.g., ID from DE 3055, if listed there)), listVersionID (i.e., If the code list remains unchanged, list version ID is the version of the particular code list assigned. If a user creates his code list during configuration, list version ID is the version of particular code list assigned and managed by the code user), listAgency-SchemeID (i.e., If a user of this code creates his code list during configuration, list agency scheme ID is the ID of the scheme if the listAgencyID does not come from DE 3055), listAgencySchemeAgencyID (i.e., If a user of this code creates his code list during configuration, list agency scheme agency Id is the ID of the organization from DE 3055 that manages the listAgencySchemeID scheme).

The data element can be represented as follows: CRMT_SOURCE, Type: CHAR 03, Software component BBPCRM.

The Code List may include: Code 1 (i.e., Miscellaneous—Other), Code 2 (i.e., Customer Care—The sales opportunity serves to maintain existing customers), Code 3 (i.e., New Business—The sales opportunity serves to win new customers).

OrderFulfillmentPlanningUnitTypeCode

An OrderFulfillmentPlanningUnitTypeCode is the coded representation of a planning unit in a multi-level procurement chain within an order-fulfillment planning view and an order where-used list view. Here, the dates of the planning units may be of interest. Elements in a multi-level procurement chain can have a start and an end date/time, or a start date/time and end date/time that coincide. An example of OrderFulfillmentPlanningUnitTypeCode is:

<OrderFulfillmentPlanningUnitTypeCode>1</OrderFulfillmentPlanningUnitTypeCode>

In certain implementations, OrderFulfillmentPlanningUnit-TypeCode may have the following structure:

| GDT | Object Class | Property | Representation/ Association | Type | Type Name | Len. | Remarks |
|---|---|---|---|---|---|---|---|
| Order-Fulfillment-PlanningUnit-TypeCode | Order Fulfillment Planning Unit | Type | Code | CDT | Code | 1 | Restricted |

The attributes may be as follows: listID="10442," listAgencyID="310."

OrderFulfillmentPlanningUnitTypeCode may be used to differentiate between the type of planning elements that are being used to fulfill an order, or that are being used in an order where-used list. This differentiation may occur according to the code list.

The code list and its values may include: Code 1 (i.e., Start and end date/time of an operation in a ProductionPlanningOrder—Planning-relevant operation in a ProductionPlanningOrder with a start and end date/time, Code 2 (i.e., Start and end date/time of a ProcurementPlanningOrder—Start and end date/time of a ProcurementPlanningOrder. The start and end date/time of a ProcurementPlanningOrder may be calculated using the planned delivery time of the material. The planned delivery time may be the duration of the operation from the planned order time to the planned delivery time), Code 3 (i.e., PlanningViewOnInventory (without date/time)—PlanningViewOnInventory does not have any start or end dates/times that are relevant to business. If the element in the procurement chain is a PlanningViewOnInventoryUsed, this code may be used as a placeholder), Code 4 (i.e., Requirement date/time of a SupplyPlanningRequirement—Requirement date/time of a SupplyPlanningRequirement. In this case, the start and end date/time are the same), Code 5 (i.e., Requirement date/time of a PlannedIndependentRequirement—Requirement date/time of a PlannedIndependentRequirement. In this case, the start and end date/time are the same).

OrderFulfillmentPlanningViewTypeCode

An OrderFulfillmentPlanningViewTypeCode is the coded representation of the type of the OrderFulfillmentPlanningView. OrderFulfillmentPlanningView may be considered a single-level or multi-level planning view of receipts that are needed to fulfill a material requirement, or a single-level or multi-level planning view of requirements that use a material receipt.

A material requirement may be considered the quantity of a material that is needed by a requirement element. A material requirement can be a customer requirement, a planned independent requirement, or a material requirement from a planning order. A material receipt may be considered the quantity of a material provided by a receipt element. A material receipt can be a material receipt from an external procurement order or from a planning order.

Requirement R may be covered by receipt elements $S_i$, in other words, requirement R consumes the receipt elements $S_i$. This may result in single-level order fulfillment for requirement R. Multi-level order fulfillment for requirement R may be established by determining all receipt elements that are required to fulfill receipt elements $S_i$.

The single-level order where-used list for receipt S may be determined by requirement elements $R_i$, which consume receipt S. The multi-level order where-used list for receipt S may be established by determining all requirement elements that consume the related receipt elements for requirement elements $R_i$.

A type of order-fulfillment view and order where-used list may be formed from a single-level or multi-level view of receipts or requirements.

An example of a OrderFulfillmentPlanningViewTypeCode is:

<OrderFulfillmentPlanningViewTypeCode>1</OrderFulfillmentPlanningViewTypeCode>

In certain implementations, OrderFulfillmentPlanningViewTypeCode may have the following structure:

| GDT | Object Class | Property | Representation/ Association | Type | Type Name | Len. | Remarks |
|---|---|---|---|---|---|---|---|
| Order-Fulfillment-PlanningView-TypeCode | Order Fulfillment Planning Unit | Type | Code | CDT | Code | 1 | Restricted |

The attributes may include the following: listID="10443" and listAgencyID="310."

This GDT may be used to differentiate between the four different views that are possible in the TO OrderFulfillmentPlanningView. This differentiation may occur according to the code list.

The code list and its values may include: Code 1 (i.e., Single-level order where-used list—Single-level view of the order where-used list), Code 2 (i.e., Multi-level order where-used list—Multi-level view of the order where-used list), Code 3 (i.e., Single-level order fulfillment—Single-level view of the order fulfillment), Code 4 (i.e., Multi-level order fulfillment Multi-level view of the order fulfillment).

OrdinalNumberValue

An OrdinalNumberValue is a number that indicates the position of an element in a linearly ordered set that is ordered according to particular factors. An example of OrdinalNumberValue is:

<OrdinalNumberValue>4</OrdinalNumberValue>

In certain implementations, OrdinalNumberValue may have the following structure:

| GDT | Rep./Ass. Qual. | Representation/ Association | Type | Type Name | Len. |
|---|---|---|---|---|---|
| OrdinalNumber-Value | Ordinal Number | Value | xsd | positiveInteger | 9 |

Positive, whole numbers smaller than one billion are permitted (i.e., 1-999999999)

OrdinalNumberValue can be used, e.g., in a catalog to specify the order of characteristics in a list of characteristics.

A list of Qualified GDT OrdinalNumberValue qualifiers may include: LevelOrdinalNumberValue (i.e., Ordinal number of a position or stage on a scale of quantity, extent, rank, or quality), LowerBoundaryOrdinalNumberValue (i.e., Number indicating the lower boundary OrdinalNumberValue of an element in a list. LowerBoundaryOrdinalNumberValue could be used to restrict the number of elements in a list ("paging"); e.g. in a list of search results), UpperBoundaryOrdinalNumberValue (i.e., Number indicating the upper boundary OrdinalNumberValue of an element in a list. UpperBoundaryOrdinalNumberValue could be used to restrict the number of elements in a list ("paging"); e.g. in a list of search results).

OrganisationalCentreBusinessCharacterCode

An OrganisationalCentreBusinessCharacterCode is the coded representation of a business role of an organizational unit. An example of OrganisationalCentreBusinessCharacterCode is:

<OrganisationalCentreBusinessCharacterCode>1</OrganisationalCentreBusinessCharacterCode>

In certain implementations, OrganisationalCentreBusinessCharacterCode may have the following structure:

| GDT | Object Class | Property | Representation/ Association | Type | Type Name | Len. | Remarks |
|---|---|---|---|---|---|---|---|
| Organisational-CentreBusiness-CharacterCode | Organisational Centre | Business Character | Code | CDT | Code | 1..2 | restricted |

The OrganisationalCentreBusinessCharacterCode may be considered a fixed code list. The attributes listID="10056," listAgencyID="310," listVersionID=(to be defined) may be considered missing in the structure as they would be filled with constant values at run-time.

The values of the OrganisationalCentreBusiness-CharacterCode may include: Code 1 (i.e., Company—The business role "Company" is assigned to the organizational unit), Code 2 (i.e., Segment—The business role "Segment" is assigned to the organizational unit), Code 3 (i.e., Profit center—The business role "Profit center" is assigned to the organizational unit), Code 4 (i.e., Cost center—The business role "Cost center" is assigned to the organizational unit), Code 5 (i.e., Site—The business role "Site" is assigned to the organizational unit), Code 6 (i.e., Logistics division—The business role "Logistics division" is assigned to the organizational unit), Code 7 (i.e., Sales unit—The business role "Sales unit" is assigned to the organizational unit), Code 8 (i.e., Service unit—The business role "Service unit" is assigned to the organizational unit), Code 9 (i.e., Reporting line unit—The business role "Reporting line unit" is assigned to the organizational unit), Code 10 (i.e., Purchasing unit—The business role "Purchasing unit" is assigned to the organizational unit) Code 11 (i.e., Shipping point—The business role "Shipping point" is assigned to the organizational unit), and Code 12 (i.e., Program—The business role "Program" is assigned to the organizational unit).

The OrganisationalCentreBusinessCharacterCode may not be used in cross-enterprise communication.

OrganisationalCentreHierarchyTypeCode

An OrganisationalCentreHierarchyTypeCode is the coded representation of the nature of an organizational hierarchy. An example of OrganisationalCentreHierarchyTypeCode is:

<OrganisationalCentreHierarchyTypeCode>2</OrganisationalCentreHierarchyTypeCode>

In certain implementations, OrganisationalCentreHierarchyTypeCode may have the following structure:

| GDT | Object Class | Property | Representation/ Association | Type | Type Name | Len. | Remarks |
|---|---|---|---|---|---|---|---|
| Organisational-Centre-Hierarchy-TypeCode | Organisational Centre | Hierarchy Type | Code | CDT | Code | 1..4 | restricted |

A customer-specific code list may assigned to the code.

The attributes of the code may be assigned the following values: listID="10363," listAgencyID (i.e., ID of the customer (ID from DE 3055, if listed there)), listVersionID (i.e., version of the particular code list. Assigned and managed by the customer), listAgencySchemeID (i.e., ID of the scheme if the listAgencyID does not come from DE 3055), listAgency-SchemeAgencyID (i.e., ID of the organization from DE 3055 that manages the listAgencySchemeID scheme).

Examples of semantic examples of customer-specific codes include: Organizational structure (i.e., An organizational hierarchy is an organizational structure), Financial structure (i.e., An organizational hierarchy is a financial structure), Structure of a sales organization (i.e., An organizational hierarchy is a structure of a sales organization).

The OrganisationalCentreHierarchyTypeCode may not be used in cross-enterprise communication.

OrganisationalCentreID

An OrganisationalCentreID is an identifier of an organizational unit. An organizational unit may be a business unit of an organizational structure (for example, organizational structure, financial structure, local structure) of an enterprise. An organizational unit may take on one or several different business roles (for example, company, cost center, location, reporting line unit). As a rule, an organizational unit may be a business unit of the enterprise itself. However, it may also belong to a collaborative partner, if it is treated like an organizational unit of the enterprise itself in business processes. An example of OrganisationalCentreID is:

<OrganisationalCentreID schemeID="ID" schemeAgencyID="ABC__891">MC10000</OrganisationalCentreID>

In certain implementations, OrganisationalCentreID may have the following structure:

| GDT | | Cat. | Object Class | Property | Representation/ Association | Type | Type Name | Len. | Card. | Remarks |
|---|---|---|---|---|---|---|---|---|---|---|
| Organisational CentreID | | | Organisational Centre | Identification | Identifier | CDT | Identifier | 1..20 | | restricted |
| | scheme-AgencyID | A | Identification Scheme Agency | Identification | Identifier | XSD | Token | 1..60 | 0..1 | |

The schemeID may be assigned the following values: OrganisationalCentreID. The schemeAgencyID may indicate the Business System, Which issued the ID.

The OrganisationalCentreID may be used when sender and recipient access reconciled master data. The OrganisationalCentreID may be used to identify an OrganisationalCentre.

If a message does not clearly identify the business role “OrganizationCentre,” then “OrganizationalCentreBusinessCharacterCode” may be added to the message.

OrganisationalCentreTypeCode

An OrganisationalCentreTypeCode is the coded representation of the nature of an organizational unit. An example of OrganisationalCentreTypeCode is:

<OrganisationalCentreTypeCode>1</OrganisationalCentreTypeCode>

In certain implementations, OrganisationalCentreTypeCode may have the following structure:

| GDT | Object Class | Property | Representation/ Association | Type | Type Name | Len. | Remarks |
|---|---|---|---|---|---|---|---|
| Organisational-Centre-TypeCode | Organisational Centre | Type | Code | CDT | Code | 1..4 | restricted |

A customer-specific code list may assigned to the code.

The attributes of the code may be assigned the following values: listID=“10364,” listAgencyID (i.e., ID of the customer (ID from DE 3055, if listed there)), listVersionID (i.e., version of the particular code list. Assigned and managed by the customer), listAgencySchemeID (i.e., ID of the scheme if the listAgencyID does not come from DE 3055), listAgencySchemeAgencyID (i.e., ID of the organization from DE 3055 that manages the listAgencySchemeID scheme).

A customer may define its own types of organizational units. These types may contain the assignment of different business roles, and preset attribute values, for example. Semantic examples of customer-specific codes may include: Department (i.e., An organizational unit has the nature of a department), Store (i.e., An organizational unit has the nature of a store), Branch (i.e., An organizational unit has the nature of a branch).

The OrganisationalCentreTypeCode may not be used in cross-enterprise communication.

OrganisationName

An OrganisationName is the name of an organization in structured form, including the form of address. An example of OrganisationName is:

<OrganisationName>

<FirstLineName>XXX AG</FirstLineName>

<SecondLineName>Geschäftsstelle Berlin</SecondLineName>

</OrganisationName>

In certain implementations, OrganisationName may have the following structure:

| GDT | | Cat. | Object Class | Property | Rep./Ass. | Type | Type Name | Card. |
|---|---|---|---|---|---|---|---|---|
| Organisation-Name | | | Organisation Name | | Details | | | |
| | FormOf-AddressCode | E | Organisation Name | Form Of Address | Code | GDT | FormOf-AddressCode | 0..1 |
| | FirstLine-Name | E | Organisation Name | First Line | Name | GDT | MEDIUM_ Name | 0..1 |

-continued

| GDT | | Cat. | Object Class | Property | Rep./Ass. | Type | Type Name | Card. |
|---|---|---|---|---|---|---|---|---|
| | SecondLineName | E | Organisation Name | Second Line | Name | GDT | MEDIUM_Name | 0..1 |
| | ThirdLineName | E | Organisation Name | Third Line | Name | GDT | MEDIUM_Name | 0..1 |
| | FourthLineName | E | Organisation Name | Fourth Line | Name | GDT | MEDIUM_Name | 0..1 |

OrganisationName may consist of the following subelements: FormOfAddressCode (i.e., The form of address of the organization), FirstLineName (i.e., The name components of the organization that appear in the first name line in address formatting), SecondLineName (i.e., The name components of the organization that appear in the second name line in address formatting), ThirdLineName (i.e., The name components of the organization that appear in the third name line in address formatting), FourthLineName (i.e., The name components of the organization that appear in the fourth name line in address formatting).

GDT OrganisationName may be used in addresses and for business partners.

OverheadCostLedgerAccountTypeCode

An OverheadCostLedgerAccountTypeCode is the coded representation of the type of an overhead cost ledger account based on the cost object. An overhead cost ledger account (business object OverheadCostLedgerAccount) may be considered a record of the costs incurred by the provision of resources. An example of an OverheadCostLedgerAccountTypeCode is:

<OverheadCostLedgerAccountTypeCode>1</OverheadCostLedgerAccountTypeCode>

In certain implementations, OverheadCostLedgerAccountTypeCode may have the following structure:

| GDT | Object Class | Property | Representation/Association | Type | Type Name | Len. | Remarks |
|---|---|---|---|---|---|---|---|
| OverheadCostLedgerAccountTypeCode | Overhead Cost Ledger Account | Type | Code | CDT | Code | 1..2 | restricted |

The attributes may include the following: listID="10206," listAgencyID="310," listVersionID—Version of the relevant code list.

The code list and its values may include: Code 1 (i.e., CostCentreOverheadCostLedgerAccount—Overhead cost ledger account for a cost center), Code 2 (i.e., ResourceOverheadCostLedgerAccount—Overhead cost ledger account for a resource), Code 3 (i.e., ProjectOverheadCostLedgerAccount—Overhead cost ledger account for a project).

OverheadCostLedgerAccountTypeCode may be used to differentiate between different types of overhead cost ledger accounts. These accounts may be differentiated by the object that carries the overhead, such as a cost center or project.

OverheadCostSchemeCategoryCode

An OverheadCostSchemeCategoryCode is the coded representation of the category of an overhead cost scheme. The category indicates the business environment of the scheme. An example of OverheadCostSchemeCategoryCode is:

<OverheadCostSchemeCategoryCode>1</OverheadCostSchemeCategoryCode>

In certain implementations, OverheadCostSchemeCategoryCode may have the following structure:

| GDT | Object Class | Representation/Association | Type | Type Name | Len. |
|---|---|---|---|---|---|
| OverheadCostSchemeCategoryCode | Overhead Cost Scheme Category | Code | CDT | Code | 1..2 |

The attributes may be as follows: listID can be the ID of the relevant code list. Assigned by the Coaching Team, listAgencyID="310."

The code list and its values may include: Code 1 (i.e., Production—Overhead cost scheme for production), Code 2 (i.e., Sales—Overhead cost scheme for sales), Code 3 (i.e., Project—Overhead cost scheme for projects).

In the overhead cost scheme it may be specified which categories the scheme may be used in.

OverheadCostSchemeID

An OverheadCostSchemeID is an identifier for an overhead cost scheme. An overhead cost scheme may contain rules for the calculation of overhead costs to be allocated. The rules may define the base data to which the overhead is applied, and the application rates. An overhead cost scheme may consist of rows and columns. Each row may calculate one overhead amount based on the entries in the columns. An example of OverheadCostScheme is:

<OverheadCostSchemeID>OS11</OverheadCostSchemeID>

In certain implementations, OverheadCostSchemeID may have the following structure:

| GDT | Object Class | Property | Representation/Association | Type | Type Name | Len. | Remarks |
|---|---|---|---|---|---|---|---|
| OverheadCostSchemeID | Overhead Cost Scheme | Identification | Identifier | CDT | Identifier | 1..10 | restricted |

OverheadCostSchemeID may be used for example to identify the overhead cost scheme for a production ledger account.

OverheadCostSchemeLineBaseAmountCompositionCode

An OverheadCostSchemeLineBaseAmountCompositionCode is the coded representation of the composition of a base amount for calculation of an overhead rate in a line of the overhead cost scheme. An example of OverheadCostSchemeLineBaseAmountCompositionCode is:

<OverheadCostSchemeLineBaseAmountCompositionCode>1</OverheadCostSchemeLineBaseAmountCompositionCode>

In certain implementations, OverheadCostSchemeLineBaseAmountComposition Code may have the following structure:

| GDT | Object Class | Representation/Association | Type | Type Name | Len. |
|---|---|---|---|---|---|
| OverheadCost-SchemeLine-BaseAmount-CompositionCode | OverheadCost-SchemeLine-BaseAmount-Composition | Code | CDT | Code | 1..2 |

The attributes may include the following: listID can be the ID of the relevant code list. Assigned by the Coaching Team, listAgencyID="310."

The code list and its values may include the following: Code 1 (i.e., Direct Costs and Overhead—Direct costs and the calculated overhead), Code 2 (i.e., Direct Costs—Direct costs only), Code 3 (i.e., Overhead—Overhead only).

An overhead cost scheme may include line that calculate their values based on the values of other lines. The OverheadCostSchemeLineBaseAmountCompositionCode can be used in such lines to determine which values of the referenced line are used as the calculation basis in the current line.

OverheadCostSchemeLineGroupCode

An OverheadCostSchemeLineGroupCode is the coded representation of a group of lines in an overhead cost scheme based on the business meaning of the overhead calculated in the line. An example of OverheadCostSchemeLineGroupCode is:

<OverheadCostSchemeLineGroupCode>1</OverheadCostSchemeLineGroupCode>

In certain implementations, OverheadCostSchemeLineGroupCode may have the following structure:

| GDT | Object Class | Representation/Association | Type | Type Name | Len. | Remarks |
|---|---|---|---|---|---|---|
| OverheadCost-SchemeLine-GroupCode | Overhead Cost Scheme Line Group | Code | CDT | Code | 1..4 | restricted |

A customer-specific code list may be assigned to the code. A user of the code may define the codes of the code list during configuration.

In certain implementations, the attributes of the CDT Code may not be required because they would be assigned to constant values in a customer system at runtime. They can be implicitly assigned in the following way: listID="10446," listAgencyID (i.e., ID of the customer (ID from DE 3055 if listed there)), listVersionID (i.e., Assigned and managed by the customer), listAgencySchemeID (i.e., ID of the scheme if the listAgencyID is not taken from DE 3055), listAgencySchemeAgencyID (i.e., ID of the organization (taken from DE 3055) that manages the scheme of the listAgencySchemeID)).

Semantic examples of customer-specific codes may include: Labor (i.e., The overhead calculated in this line applies to labor costs), Material (i.e., The overhead calculated in this line applies to material costs), Storage (i.e., The overhead calculated in this line applies to storage costs), Transportation (i.e., The overhead calculated in this line applies to transportation costs), Sales (i.e., The overhead calculated in this line applies to sales costs).

The OverheadCostSchemeLineGroupCode may help to make the overhead cost scheme more manageable. Grouping the lines based on the overhead types calculated in them may allow the scheme to be structured based on its contents.

OverheadCostSchemeLineTypeCode

An OverheadCostSchemeLineTypeCode is the coded representation of the type of a line in an overhead cost scheme. The type may indicate how the overhead in the line is calculated. An example of OverheadCostSchemeLineTypeCode is:

<OverheadCostSchemeLineTypeCode>1</OverheadCostSchemeLineTypeCode>

In certain implementations, OverheadCostSchemeLineTypeCode may have the following structure:

| GDT | Object Class | Property | Representation/Association | Type | Type Name | Len. |
|---|---|---|---|---|---|---|
| OverheadCostScheme-LineTypeCode | Overhead Cost Scheme Line | Type | Code | CDT | Code | 1..2 |

A fixed code list may have been assigned to the code.

The attributes may include the following: listID=10438, listAgencyID="310."

The code list and its values may include the following: Code 1 (i.e., Subscheme—An overhead cost scheme is used as a subscheme), Code 2 (i.e., Amount-based—The overhead is calculated based on currency amounts), Code 3 (i.e., Quantity-based—The overhead is calculated based on quantities), Code 4 (i.e., Line-based—The overhead is calculated based on other lines in the scheme), Code 5 (i.e., Fixed amount—The overhead is defined as a fixed currency amount).

The type of a line in an overhead cost scheme may define what method is used to calculate the overhead.

OverheadCostSchemeRateRuleTypeCode

An OverheadCostSchemeRateRuleTypeCode is the coded representation of the type of a rate rule in an overhead cost scheme. The type of a rate rule may depend on the type of allocation base. An example of OverheadCostSchemeRateRuleTypeCode is:

<OverheadCostSchemeRateRuleTypeCode>1</OverheadCostSchemeRateRuleTypeCode>

In certain implementations, OverheadCostSchemeRateRuleTypeCode may have the following structure:

| GDT | Object Class | Property | Representation/ Association | Type | Type Name | Len. |
|---|---|---|---|---|---|---|
| OverheadCost-SchemeRateRule-TypeCode | Overhead Cost Scheme Rate Rule | Type | Code | CDT | Code | 1..2 |

A fixed code list may have been assigned to the code.

The attributes may include the following: listID="10445," listAgencyID="310."

The code list and its values may include the following: Code 1 (i.e., Amount Based The rate rule is based on currency amounts), Code 2 (i.e., Quantity-based, The rate rule is based on quantities).

In an overhead cost scheme, overhead charges can be calculated based on quantities or currency amounts. This may require a corresponding rate rule (currency amount per unit of measure or percentage).

PackagingMaterialTypeCode

PackagingMaterialTypeCode is the coded representation of the type of a packaging material. A packaging material may be considered a material that is destined to surround or contain materials that are to be packed. An example of PackagingMaterialTypeCode is:

<PackagingMaterialTypeCode>1</PackagingMaterialTypeCode>

In certain implementations, PackagingMaterialTypeCode may have the following structure:

| GDT | Object Class | Property | Representation/ Association | Type | Type Name | Len. | Remarks |
|---|---|---|---|---|---|---|---|
| Packaging-Material-TypeCode | Packaging Material | Type | Code | CDT | Code | 1 | Restricted |

The PackagingMaterialTypeCode is a codelist with the implicitly given attributes and may include the following values: listID="10081," listAgencyID="310," and listVersionID="tbd."

PackagingMaterialTypeCode can be used to differentiate between several categories of usage of packaging material items within the packaging operation. PackagingMaterialTypeCode can be used to differentiate the packaging materials in a packing bill of material where a packing bill of material is a list of components that defines the packing structure of logistic units.

The PackagingMaterialTypeCode may correspond to the handling unit relevancy indicator of Extended Warehouse Management packing instructions (data element /SCWM/DE_HURELEVANT). The GDT may be defined with one character in accordance to /SCWM/DE_HURELEVANT.

The packaging material type codes Load Carrier and Additional Packaging Material may correspond to the attributes of GDT HandlingUnit.

The code list and its values may include: Load Carrier (i.e., A Load Carrier is a packaging material in or on which all the content of a packing operation is finally placed), Additional Packaging Material (i.e., An Additional Packaging Material is a packaging material which is used to wrap or protect content of a packing operation).

PackingBillOfMaterialContentItemID

A PackingBillOfMaterialContentItemID is an identifier of a content item of a packing bill of material. A content item of a packing bill of material may be a quantity of content to be packed. An example of PackingBillOfMaterialContentItem is:

<PackingBillOfMaterialContentItemID>5</PackingBillOfMaterialContentItemID>

In certain implementations, PackingBillOfMaterialContentItemID may have the following structure:

| GDT | Object Class | Property | Representation/ Association | Type | Type Name | Len. | Remarks |
|---|---|---|---|---|---|---|---|
| PackingBillOf-MaterialContent-ItemID | Packing Bill Of Material Content Item | Identification | Identifier | CDT | Identifier | 1..8 | Restricted |

PackingBillOfMaterialContentItemID may be a sequence of numbers with a maximum length of eight characters. Leading zeros may not be significant.

The PackingBillOfMaterialContentItemID may be used to enumerate the several content items of a packing bill of material.

The GDT may be defined with a length of eight characters in accordance with the data element /SCWM/DE_PS_CONTENT_SEQ (i.e., CHAR8).

PackingBillOfMaterialID

A PackingBillOfMaterialID is an identifier of a packing bill of material. A packing bill of material may be a structured list of components that defines the packing structure of logistic units (LUs). An example of PackingBillOfMaterialID is:

<PackingBillOfMaterialID>12345678901234567890</PackingBillOfMaterialID>

In certain implementations, PackingBillOfMaterialID may have the following structure:

| GDT | | Cat. | Object Class | Property | Representation/ Association | Type | Type Name | Len. | Card. | Remarks |
|---|---|---|---|---|---|---|---|---|---|---|
| Packing-Bill-OfMaterial-ID | | | Packing Bill Of Material | Identification | Identifier | CDT | Identifier | 1..20 | | Restricted |
| | scheme-AgencyID | A | Identification Scheme Agency | Identification | Identifier | XSD | Token | 1..60 | 0..1 | |

The following attribute may be described as: schemeAgencyID (i.e. Business System, which issued the ID).

The GDT may be defined with a length of twenty characters in accordance with the /SCWM/DE_PSID (i.e., CHAR20).

PackingBillOfMaterialItemID

A PackingBillOfMaterialItemID is an identifier of an item of a packing bill of material. An item of a packing bill of material may be either a certain quantity of content to be packed or a packaging material that is used for packaging. An example of PackingBillOfMaterialItemID is:

<PackingBillOfMaterialItemID>5</PackingBillOfMaterialItemID>

In certain implementations, PackingBillOfMaterialItemID may have the following structure:

| GDT | Object Class | Property | Representation/ Association | Type | Type Name | Len. | Remarks |
|---|---|---|---|---|---|---|---|
| PackingBillOfMaterial-ItemID | Packing Bill Of Material Item | Identification | Identifier | CDT | Identifier | 1..8 | Restricted |

PackingBillOfMaterialItemID may be considered a sequence of numbers with a maximum length of eight characters. Leading zeros may not be significant.

The PackingBillOfMaterialItemID may be used to enumerate the several items of a packing bill of material.

The GDT may be defined with a length of eight characters in accordance with the data element /SCWM/DE_PS_CONTENT_SEQ (i.e., CHAR8).

PackingBillOfMaterialPackagingMaterialItemID

A PackingBillOfMaterialPackagingMaterialItemID is an identifier of a packaging material item of a packing bill of material. A packaging material of PackingBillOfMaterial may be a material which is used to pack logistic units and materials. An example of PackingBillOfMaterialPackagingMaterialItemID is:

<PackingBillOfMaterialPackagingMaterialItemID>5</PackingBillOfMaterialPackagingMaterialItemID>

In certain implementations, PackingBillOfMaterialPackagingMaterialItemID may have the following structure:

| GDT | Object Class | Property | Representation/ Association | Type | Type Name | Len. | Remarks |
|---|---|---|---|---|---|---|---|
| PackingBill-OfMaterial-Packaging-Material-ItemID | Packing Bill Of Material-Packaging-Material-Item | Identification | Identifier | CDT | Identifier | 1..8 | Restricted |

PackingBillOfMaterialPackagingMaterialItemID may be a sequence of numbers with a maximum length of eight characters. Leading zeros may not be significant.

The PackingBillOfMaterialPackagingMaterialItemID may be used to enumerate the several packaging material items of a packing bill of material.

The GDT may be defined with a length of eight characters in accordance with the data element /SCWM/DE_PS_CONTENT_SEQ (i.e., CHAR8).

PackingListID

A PackingListID is an identifier for a packing list. A packing list can be a list of packing data for the products from one or more delivery items. In particular, the packing list may contain data for the load carriers used to pack these products (such as crates or mesh box pallets), as well as for the weight, volume and quantity of the packed products. An example of PackingListID is:

<PackingListID>XYZ1234AZ5</PackingListID>

In certain implementations, PackingListID may have the following structure:

| GDT | Object Class | Property | Representation/ Association | Type | Type Name | Len. | Remarks |
|---|---|---|---|---|---|---|---|
| PackingListID | Packing List | Identification | Identifier | CDT | Identifier | 1..35 | restricted |

The vendor may create packing lists for the products of one or more delivery items. These lists may accompany the physical shipment but do not normally exist as independent documents in the application systems. The PackListID assigned by the vendor can be used to identify the packing lists that belong to a delivery.

In contrast to the HandlingUnit, which has data for packaging materials and a packing hierarchy, a packing list may contain simplified, but in practice often completely sufficient packing information for products from a delivery.

PackingMethodCode

A PackingMethodCode is the coded representation of a method for packing goods into a package. An example of PackingMethodCode is:

<PackingMethodCode>1</PackingMethodCode>

In certain implementations, PackingMethodCode may have the following structure:

| GDT | | Cat. | Object Class | Property | Representation/ Association | Type | Type Name | Len. | Card. | Remarks |
|---|---|---|---|---|---|---|---|---|---|---|
| Packing-Method-Code | | | Packing Method | Code | Code | CDT | Code | 1..2 | | Restricted |
| | listID | A | Code List | Identification | Identifier | xsd | token | | 1 | |
| | list-AgencyID | A | Code List Agency | Identification | Identifier | xsd | token | | 1 | |
| | list-VersionID | A | Code List | Version | Identifier | xsd | token | | 1 | |

The PackingMethodCode is a code list. Permitted code values include: listID=ID of the particular code list: 10256, listAgencyID=310, listVersionID=Version of the particular code list. Assigned.

When defining a pack operation and assigning a logistic unit as its allowed output, a PackingMethodCode can be used to specify the manner in which goods should be packed in the assigned logistic unit. For example, if the logistic unit needs to be packed in the standard manner, the PackingMethodCode should be Standard Packing.

The code list may include the following: Free Packing (i.e., There are no special requirements for how the goods should be packed), Standard Packing (i.e., The goods should be packed according to the standard for the product, based on quantity), Packing Bill Of Material driven (i.e., The goods should be packed according to the Packing Bill Of Material).

PartialDelivery

A PartialDelivery is the maximum number of partial deliveries that may/can be carried out to deliver the ordered quantity of an item. PartialDelivery may comprise the two child elements, Number from the "CDT: Numeric" and UnlimitedIndicator from the CDT: Indicator. An example of PartialDelivery is:

<PartialDelivery>
<MaximalNumber>
9
<\MaximalNumber>
>\PartialDelivery>

In certain implementations, PartialDelivery may have the following structure:

| GDT | | Cat. | Object Class | Property | Representation/ Association | Type | Type Name | Len. | Card. | Remarks |
|---|---|---|---|---|---|---|---|---|---|---|
| PartialDelivery | | | Partial Delivery | | Details | | | | | |
| | MaximalNumberIntegerValue | E | Partial Delivery | Maximal Number | Integer Value | GDT | IntegerValue | 1 | 0..1 | Zero not allowed |
| | UnlimitedIndicator | E | Partial Delivery | UnlimitedIndicator | Indicator | GDT | ValueUnlimitedIndicator | 1 | 0..1 | |

In the previously described structure, the MaximalNumber may have the following description: a length of 1 in this field may indicate that a maximum of up to 9 partial deliveries will be accepted to fulfill the ordered quantity. The specification may be made as a whole number without any plus/minus sign (i.e., 9); zero may not be allowed. If there is no entry in this field, this may mean: complete delivery may be wanted, no partial delivery might be allowed even if the UnlimitedIndicator is not set.

In the previously described structure, the UnlimitedIndicator may indicate the following:

an entry in this field (true or 1) may mean that no limitations regarding the number of partial deliveries are to be made. The UnlimitedIndicator can have the following values: 'true' or '1' (i.e., Any number of partial deliveries will be accepted), 'false' or '0' (i.e., Any number of partial deliveries will not be accepted).

The fields MaximalNumber and UnlimitedIndicator may be mutually exclusive, for example, entering "true" or "1" in the UnlimitedIndicator and simultaneously making an entry in Number may not be logical.

PartialDelivery may indicate the maximum number of partial deliveries (including the first delivery) that may/can be performed to deliver the ordered quantity of an item.

R/3: DEC 1.0 may indicate calculation or amount field with comma and plus/minus sign.

PartialDeliveryControlCode

A PartialDeliveryControlCode is the coded representation of the partial delivery control. The partial delivery control may specify whether and in which form a customer allows partial deliveries. An example of PartialDeliveryControlCode is:

<PartialDeliveryControlCode>1</PartialDeliveryControlCode>

In certain implementations, PartialDeliveryControlCode may have the following structure:

| GDT | Object Class | Property | Representation/ Association | Type | Type Name | Len. | Remarks |
|---|---|---|---|---|---|---|---|
| PartialDeliveryControlCode | Partial Delivery | Control | Code | CDT | Code | 1..2 | Restricted |

The PartialDeliveryControlCode may be a code list with the attributes including: listID="10095," listAgencyID="310," listVersionID—Version of the relevant code list. Assigned and managed.

This code list may be fixed and may not be changed by the customer. The code list may include the following elements: Partial delivery (i.e., Partial deliveries are allowed), One-time delivery on requested delivery date/time (i.e., One delivery on the requested delivery date/time is allowed), Complete delivery (i.e., Complete delivery (the entire quantity) is allowed.), Code Complete delivery of order (i.e., For the order a complete delivery (the entire quantity) is allowed), One-time delivery of order on requested delivery date/time (i.e., For the order one delivery on the requested delivery date/time is allowed), One-time delivery of item on requested delivery date/time (i.e., For the item one delivery on the requested delivery date/time is allowed. Partial deliveries for the order are allowed, Code Complete delivery item (i.e., For the item a complete delivery (the entire quantity) is allowed. Partial deliveries for the order are allowed).

The PartialDeliveryControlCode may be used concurrently in business objects and A2A messages. In the code list, a value for describing partial delivery agreements may be allowed.

The PartialDeliveryControlCode may be used, for example, in the sales order and in the customer master.

The individual characteristics of the partial delivery control may specify basic delivery agreements with reference to the maximum number of partial deliveries, date/time and quantity tolerances, and delivery groups that may be taken into consideration when deliveries are created.

PartyAddressDeterminationCode

A PartyAddressDeterminationCode is the coded representation of an address determination process for a party. An address determination process may determine, from a business point of view, the right address of a business object (for example, a business partner or an organizational unit), based on the address usages assigned to the addresses of the business object.

An example of PartyAddressDeterminationCode is:

<PartyAddressDeterminationCode>BBP000</PartyAddressDeterminationCode>

In certain implementations, PartyAddressDeterminationCode may have the following structure:

listVersionID (i.e., If the code list remains unchanged, list version ID is the version of the particular code list assigned. If a user creates his code list during configuration, list version ID is the version of particular code list assigned and managed by the code user), listAgencySchemeID (i.e., If a user of this code creates his code list during configuration, list agency scheme ID is the ID of the scheme if the listAgencyID does not come from DE 3055), listAgencySchemeAgencyID (i.e., If a user of this code creates his code list during configuration, list agency scheme agency Id is the ID of the organization from DE 3055 that manages the listAgencySchemeID scheme).

An address usage can be assigned to an address determination process. If no specific address usage is assigned to the address determination process, the address usage "Standard Address" may be assigned implicitly.

| GDT | | Cat. | Object Class | Property | Representation/ Association | Type | Type Name | Len. | Card. | Remarks |
|---|---|---|---|---|---|---|---|---|---|---|
| PartyAddress-Determination-Code | | | Party Address | Determination | Code | CDT | Code | 1..6 | | Restricted |
| | listID | A | Code List | Identification | Identifier | xsd | token | | 0..1 | |
| | listAgencyID | A | Code List Agency | Identification | Identifier | xsd | token | | 0..1 | |
| | listVersionID | A | Code List | Version | Identifier | xsd | token | | 0..1 | |
| | listAgency-SchemeID | A | Code List Agency | Scheme | Identifier | xsd | token | | 0..1 | |
| | listAgencyScheme-AgencyID | A | Code List Agency | Scheme Agency | Identifier | xsd | token | | 0..1 | |

An extendable code list may be assigned to the PartyAddressDeterminationCode. Customers can extend this code list.

The code list and its values may include the following: Code BBP000 (i.e., Address determination for purchase orders placed with vendor: Address determination for purchase orders placed with a vendor), Code BBP001 (i.e., Address determination for delivery of goods from vendor: Address determination for the delivery of goods from a vendor), Code BBP002 (i.e., Address determination for invoices from invoicing party: Address determination for invoices from an invoicing party), Code BBP003 (i.e., Address determination for goods dispatch: Address determination for the dispatch of goods), Code BBP004 (i.e., Address determination for invoices to invoice recipient: Address determination for invoices sent to invoice recipient), Code BBP005 (i.e., Address determination for goods distribution (in-house): Address determination for goods distribution (i.e., in-house)), Code HCM001 (i.e., Determine employee's private address for correspondence: Determine employee's private address for correspondence), Code HCM002 (i.e., Determine employee's workplace address for correspondence: Determine employee's workplace address for correspondence).

Semantic examples of customer-specific code semantics for address determination processes include: address determination for correspondence.

The attributes may be described as follows: listID (i.e., ID of the particular code list: 10428), listAgencyID (i.e., If the code list remains unchanged, list agency ID is "310." If a user creates his code list during configuration, list agency ID is the ID of the code user (ID from DE 3055, if listed there)), The GDTs PartyAddressDeterminationCode and AddressUsageCode (i.e., address usage) can be used to represent the fact that addresses used for an address determination process can be assigned to a specific address usage. For example, a small company does not need to specify different addresses for goods and invoice receipts. In such a case, the same (customer-specific) address usage "receipt address" can be assigned to both address determination processes "Address Determination for Goods Receipt from Vendor" and "Address Determination for Invoices from Invoicing Party."

PartyID

A PartyID is an identifier for a party. A party may be a natural person, organization, or group in which a company has a business or intra-enterprise interest. This could be a person, organization, or group within or outside of the company. An example of PartyIdentificationID is:

<PartyID schemeID="DUNS"
schemeAgencyID="16">
065055766
</PartyID>

065055766=Bosch at DUNS

In the previous example 16 is DUNS from Code List DE 3055.

Another example of PartyIdentificationID is:

<PartyID schemeID="PartyID"
schemeAgencyID="BPL__300">
schemeAgencySchemeAgencyID="ZZZ">
4711
</PartyID>

In the previous example, 4711 is a business partner in the system and ZZZ is a proprietary agency from Code List DE 3055.

In certain implementations, PartyID may have the following structure:

| GDT | Object Class | Property | Representation/Association | Type | Type Name | Len. | Remarks |
|---|---|---|---|---|---|---|---|
| PartyID | Party | Identification | Identifier | CDT | Identifier | 1..60 | restricted |
| | Identification Scheme | Identification | Identifier | XSD | Token | 1..60 | |
| | Identification Scheme Agency | Identification | Identifier | XSD | Token | 1..60 | |
| | Identification Scheme Agency | Scheme | Identifier | XSD | Token | 1..60 | |
| | Identification Scheme Agency | Scheme Agency | Identifier | XSD | Token | 1..3 | |

The definition of the GDT PartyID is based on a model of party that is hierarchically arranged such that party is logically related to person, organization, and party group. The name PartyID was intentionally chosen instead of Business-PartnerID in order to be able to use the GDT for parties in which there is no direct business interest (i.e., employees' partners or children). The GDT is intended to cover all roles which a party might assume.

The following attributes may be described as: schemeID (i.e., SchemeID is the ID of the ID scheme. Released and maintained by the responsible organization of the ID scheme. The GDT owner may retrieve the correct ID from the responsible organization. If there is no ID available, the name of the identifier or identifier type may be entered, which is used in the corresponding standard, specification, or scheme of the responsible organization), SchemeVersionID (i.e., Scheme-VersionID is the Version of the ID scheme. Released and maintained by the organization, which is named in schemeAgencyID. The owner may retrieve the relevant version ID from the responsible organization. If there is no version for the ID scheme, the version of the standard, the specification, or the scheme may be used), SchemeAgency-SchemeID (i.e., SchemeAgencySchemeID is the identification of the schema which may identify the organization named in schemeAgencyID. It may be a scheme ID of partners, companies, members etc. (i.e., DUNS+4) of an organization named in schemeAgencySchemeAgencyID (i.e., EAN, DUNS, SWIFT, etc.), SchemeAgencySchemeAgencyID (i.e., SchemeAgencySchemeAgencyID is the identification of the maintaining organization (i.e. DUNS, EAN, SWIFT, etc.) which is responsible for the identification of the organization named in schemeAgencyID. The organization may be contained in DE 3055).

IDs that identify a party may be permitted. IDs that identify a location may not be permitted.

PartyID can be used for software representation of a natural person, a legal person (i.e., organization), or any grouping of natural persons, legal persons, and their groupings (i.e., business partner group). The different roles of a party (i.e., Buyer, Vendor, Supplier) can be used in accordance with the UBL standard to enhance element names (i.e., BuyerPartyID).

PartyIdentifierCategoryCode

A PartyIdentifierCategoryCode is the code of a category for an identifier of a party. An example of PartyIdentifierCategoryCode is:

<PartyIdentifierCategoryCode>11</PartyIdentifierCategoryCode>

In certain implementations, PartyIdentifierCategoryCode may have the following structure:

| GDT | | Cat. | Object Class Qualifier | Object Class | Property | Representation/ Association | Type | Type Name | Len. | Card. | Remarks |
|---|---|---|---|---|---|---|---|---|---|---|---|
| Party-Identifier-Category-Code | | | Party | Identifier | Category | Code | CDT | Code | 1..6 | | Restricted |
| | listID | A | | Code List | Identification | Identifier | xsd | token | | 0..1 | |
| | listAgency-ID | A | | Code List Agency | Identification | Identifier | xsd | token | | 0..1 | |
| | listVersion-ID | A | | Code List | Version | Identifier | xsd | token | | 0..1 | |
| | listAgency-SchemeID | A | | Code List Agency | Scheme | Identifier | xsd | token | | 0..1 | |
| | listAgency-Scheme-Agency-ID | A | | Code List Agency | Scheme Agency | Identifier | xsd | token | | 0..1 | |

An extendable code list may be assigned to the PartyIdentifierCategoryCode. Customers may extend this code list.

The code list and its values may include the following: Code BUP001 (i.e., Dun & Bradstreet Number: Identification using Dun & Bradstreet number), Code BUP002 (i.e., Commercial Register Number: Identification using commercial register number), Code BUP003 (i.e., Register of Associations Number: Identification using register of associations number), Code BUP004 (i.e., Public Register of Cooperatives Number: Identification using public register of cooperatives number), Code BUP005 (i.e., Global Location Number: Identification using a Global Location Number (i.e., GLN)), Code BUP006 (i.e., Standard Carrier Alpha Code: Identification using a Standard Carrier Alpha Code), Code FS0001 (i.e., ID card: Identification using an ID card), Code FS0002 (i.e., Passport: Identification using a passport).

The following attributes may be described as: listID (i.e., ID of the particular code list: 10283), listAgencyID (i.e., If the code list remains unchanged, list agency ID is "310." If a user creates his code list during configuration, list agency ID is the ID of the code user (ID from DE 3055, if listed there)), listVersionID (i.e., If the code list remains unchanged, list version ID is the version of the particular code list assigned. If a user creates his code list during configuration, list version ID is the version of particular code list assigned and managed by the code user), listAgencySchemeID (i.e., If a user of this code creates his code list during configuration, list agency scheme ID is the ID of the scheme if the listAgencyID does not come from DE 3055), listAgencySchemeAgencyID (i.e., If a user of this code creates his code list during configuration, list agency scheme agency Id is the ID of the organization from DE 3055 that manages the listAgencySchemeID scheme).

One or more PartyIdentifierTypes can be assigned to a PartyIdentifierCategory. However, one PartyIdentifierCategory can be assigned to a PartyIdentifierType. The GDT PartyIdentifierCategoryCode can be used to determine with which category of identification papers a person can identify him- or herself.

Examples of the possible semantics of the codes are: Official document (i.e., Identification using official documents (such as passport, diplomatic passport or identity card), Photo identification (i.e., Identification using a photo ID).

The following dictionary objects may be assigned to this GDT in systems: Data element: BU_ID_CATEGORY, Domain: BU_ID_CATEGORY.

PartyIdentifierTypeCode

A PartyIdentifierTypeCode is the code for a type of party identifier. An example of Party IdentifierTypeCode is:

<PartyIdentifierTypeCode>11</PartyIdentifierTypeCode>

In certain implementations, PartyIdentifierTypeCode may have the following structure:

agency ID is "310." If a user creates his code list during configuration, list agency ID is the ID of the code user (i.e., ID from DE 3055, if listed there)), listVersionID (i.e., If the code list remains unchanged, list version ID is the version of the particular code list assigned. If a user creates his code list during configuration, list version ID is the version of particular code list assigned and managed by the code user), listAgencySchemeID (i.e., If a user of this code creates his code list during configuration, list agency scheme ID is the ID of the scheme if the listAgencyID does not come from DE 3055), listAgencySchemeAgencyID (i.e., If a user of this code creates his code list during configuration, list agency scheme agency Id is the ID of the organization from DE 3055 that manages the listAgencySchemeID scheme).

An extendable code list may be assigned to the PartyIdentifierTypeCode. Customers may change this code list.

The code list and its values may include: Code BUP001 (i.e., Dun & Bradstreet Number: Identification using Dun & Bradstreet number), Code BUP002 (i.e., Commercial Register Number: Identification using commercial register number), Code BUP003 (i.e., Register of Associations Number: Identification using register of associations number), Code BUP004 (i.e., Public Register of Cooperatives Number: Identification using public register of cooperatives number), Code BUP005 (i.e., Global Location Number: Identification using a Global Location Number (i.e., GLN)), Code BUP006 (i.e., Standard Carrier Alpha Code: Identification using a StandardCarrierAlphaCode), Code FS0001(i.e., ID card: Identification using an ID card), Code FS0002 (i.e., Passport: Identification using a passport).

If the instance value of the PartyIdentifierTypeCode represents a standardized identification scheme (such as DUNS), the SchemeAttributes can be derived for an instance of the GDT PartyID.

One or more PartyIdentifierTypes can be assigned to a PartyIdentifierCategory. However, one PartyIdentifierCategory can be assigned to a PartyIdentifierType.

The GDT PartyIdentifierTypeCode can be used to determine how a customer identifies his or herself. Examples of the possible semantics of the codes include: ID card (i.e., Identification using ID card), Driver's license (i.e., identification using a driver's license).

| GDT | | Cat. | Object Class Qualifier | Object Class | Property | Representation/ Association | Type | Type Name | Len. | Card. | Remarks |
|---|---|---|---|---|---|---|---|---|---|---|---|
| Party-Identifier-Type-Code | | | Party | Identifier | Type | Code | CDT | Code | 1..6 | | Restricted |
| | listID | A | | Code List | Identification | Identifier | xsd | token | | 0..1 | |
| | listAgency-ID | A | | Code List Agency | Identification | Identifier | xsd | token | | 0..1 | |
| | listVersion-ID | A | | Code List | Version | Identifier | xsd | token | | 0..1 | |
| | listAgency-Scheme-ID | A | | Code List Agency | Scheme | Identifier | xsd | token | | 0..1 | |
| | listAgency-Scheme-Agency-ID | A | | Code List Agency | Scheme Agency | Identifier | xsd | token | | 0..1 | |

In the previously described structure, the following may be identified as: listID (i.e., ID of the particular code list: 10118), listAgencyID (i.e., If the code list remains unchanged, list The following dictionary objects may be assigned to this GDT in the system: Data element: BU_ID_TYPE, Domain: BU_ID_TYPE.

PartyInternalID

A PartyInternalID is a proprietary identifier for a party. A party may be a natural person, organization, or group in which a company has a business or intra-enterprise interest. This could be a person, organization, or group within or outside of the company. An Example of PartyInternalID is:

<PartyInternalID schemeID="PartyGUID" schemeAgencyID="MPL__002">1C743CEC501F6A4D8826C7EC5A8554B9</PartyInternalID>

In the previous example, schemeID="PartyGUID" indicates that the scheme "PartyGUID" was used to identify the party and schemeAgencyID="MPL__002" indicates that the scheme was assigned by the business system "MPL__002."

Another example of PartyInternalID is:

<PartyInternalID schemeID="PartyID" schemeAgencyID="MPL__002">4711</PartyInternalID>

In certain implementations, PartyInternalID may have the following structure:

| CDT | | Cat. | Object Class | Property Qualifier | Property | Representation/ Association | Type | Type Name | Len. | Card. | Remarks |
|---|---|---|---|---|---|---|---|---|---|---|---|
| PartyInternal-ID | | | Party | Internal | Identification | Identifier | GDT | PartyID | 1..32 | | restricted |
| | scheme-ID | A | Identification Scheme | | Identification | Identifier | XSD | Token | 1..60 | 0..1 | |
| | scheme-Agency-ID | A | Identification-Scheme Agency | | Identification | Identifier | XSD | Token | 1..60 | 0..1 | |

In the previously described structure, the following may be identified as: schemeID (i.e., Currently, the following schemes are provided for: PartyGUID: Identifies a party via a Global Unique Identifier and PartyID: Identifies a party via an identification number), schemeAgencyID (i.e., Business System, which issued the ID).

The CDT "PartyInternalID" may represent a projection of the GDT "PartyID," in which the attributes "schemeID" and "schemeAgencyID" can be contained for describing an internally assigned ID. If an attribute is not explicitly assigned in the use of the CDT, it may be clearly determined through the context.

The PartyInternalID may be used when both sender and recipient can access shared master data, for example, during internal communication.

PartyPartyID

A PartyPartyID is an identifier for a party assigned by a party. A party may be a natural person, organization, or group in which a company has a business or intra-enterprise interest. This could be a person, organization, or group within or outside of the company. An example of PartyPartyID is:

<BuyerPartySellerID>ABC</BuyerPartySellerID>

Where the ID assigned by the seller for the Buyer.

In certain implementations, PartyPartyID may have the following structure:

| CDT | Object Class | Property Qual. | Property | Rep./ Ass. | Type | Type Name | Len. | Remarks |
|---|---|---|---|---|---|---|---|---|
| Party-Party-ID | Party | Party | Identi-fication | Identi-fier | GDT | Party-ID | 1..6 | restricted |

The PartyPartyID may be the proprietary identifier assigned by a party. The party (i.e., in its role) that assigned this identifier may derive from the context of the message that the PartyPartyID uses.

PartyPartyID may limit the general identifier PartyID. In contrast to PartyStandardID, the use of the PartyPartyID can be role-dependent (i.e., as an ID assigned by the Buyer).

The party that assigns the ID may be indicated by its role. "Party" may be replaced with the "partner role type" (i.e., PartySellerID).

SchemeID and schemeVersionID may be included as attributes as soon as there is a need to differentiate between several schemes.

PartyRoleCategoryCode

A PartyRoleCategoryCode is the coded representation of a PartyRoleCategory. A PartyRoleCategory may be a grouping of PartyRoles according to process-controlling criteria. A PartyRole with the same name may exist for each PartyRoleCategory. An example of PartyRoleCategoryCode may be:

<PartyRoleCategoryCode>12</PartyRoleCategoryCode>

In certain implementations, PartyRoleCategoryCode may have the following structure:

| GDT | Object Class | Property | Representation/ Association | Type | Type Name | Len. |
|---|---|---|---|---|---|---|
| PartyRole-CategoryCode | Party | Role Category | Code | CDT | Code | 2..3 |

A code list may be assigned to the PartyRoleCode. The attributes may be as follows: listID="10014," listAgencyID="310," listVersionID=Version of the relevant code list which can be assigned and managed.

The code list and its values may include: 1 (i.e., A BuyerParty is a party that buys goods or services), 2 (i.e., A SellerParty is a party that sells goods or services), 3 (i.e., A Creditor Party is a party that is authorized to require a service as a result of an obligation), 4 (i.e., A DebitorParty is a party that is required to provide a service as a result of an obligation), 5 (i.e., A ProductRecipientParty is a party to which goods are delivered or for whom services are provided), 6 (i.e., A Vendor Party is a party that delivers goods or provides services), 7 (i.e., A ManufacturerParty is a party that manufactures goods), 8 (i.e., A PayerParty is a party that pays for goods or services), 9 (i.e., A PayeeParty is a party that receives payment for goods or services provided), 10 (i.e., A BillToParty is a party to which the invoice for goods or services is sent), 11 (i.e., A BillFromParty is a party that issues an invoice for goods or services provided), 12 (i.e., A CarrierParty is a party that provides the transport goods), 13 (i.e., A Requestor Party is a party that requests the procurement of goods or services), 14 (i.e., A PortalProviderParty is a party that runs a portal that brings business partners together for a business transaction), 15 (i.e., A CatalogueProviderParty is a party that compiles a catalog), 16 (i.e., A BidderParty is a party that bids for goods or services), 17 (i.e., An OwnerParty is a party that owns tangible or intangible goods), 18 (i.e., A TaxPayerParty is a party that is subject to taxation), 19 (i.e., A TaxOperator Party is a party that takes care of tax issues for a TaxPayerParty), 20 (i.e., A ContractReleaseAuthorisedParty is a part that is authorized to release goods or services from a contract), 21 (i.e., A BorrowerParty is a party that takes out a loan), 22 (i.e., A LenderParty is a party that grants a loan), 23 (i.e., A BrokerParty is a party that is a facilitator in a business transaction), 24 (i.e., A BailsmanParty is a party that provides a debt guarantee for a loan), 25 (i.e., CopyMessageToParty is a party that receives a copy of a message), 26 (i.e., A BlindCopyMessageToParty is a party that receives a copy of a message, without other recipients being informed of this), 27 (i.e., A QualityInspectionProcessor Party is a party that carries out a quality check), 28 (i.e., A ServiceSupportTeamParty is a party that is responsible for the processing of service requests and customer complaints as well as the planning and preparation of service orders), 29 (i.e., A SalesPartnerParty is a party that initiates and implements business transactions for another company), 30 (i.e., A Competitor Party is a party that is a competitor in terms of business), 31 (i.e., A ProspectParty is a party that has a business interest or that is suspected of having a business interest).

BusinessPartnerRoleCategoryCodes and OrganisationalCentreBusinessCharacterCodes may be assigned to a PartyRoleCategoryCode. The party may have at least one corresponding business partner role types and/or OrganisationCentreBusinessCharacter. If "No integrity conditions available" is specified, the party may not have to reference a business party or OrganisationalCentre, (for example, if an address is available). For example, if the PartyRoleCategory is 16 BidderParty, the BusinessPartnerRoleCategory may be BBP000 (i.e., Vendor) and BBP001 (i.e., Bidder) and the organisationalcentreBusinessCharacter may have the value: No BusinessCharactersuffices. For example, if the PartyRoleCategory is 26 BlindCopyMessageToParty No integrity conditions may be available.

PartyRoleCode

A PartyRoleCode is the coded representation of a PartyRole. A PartyRole may specify which rights and obligations the Party has regarding the business object and corresponding processes. A PartyRole may be assigned to one PartyRoleCategory and may refine its semantics. An example of PartyRoleCode is:

<PartyRoleCode>14</PartyRoleCode>

In certain implementations, PartyRoleCode may have the following structure:

| GDT | Object Class | Property | Representation/ Association | Type | Type Name | Len. | Remarks |
|---|---|---|---|---|---|---|---|
| PartyRoleCode | Party | Role | Code | CDT | Code | 1..10 | Restricted |

An extendable code list may be assigned to the PartyRoleCode. Customers can change this code list. In its unchanged state, the code list may have the following attributes: listID="10034," listAgencyID="310," listVersionID=Version of the relevant code list which can be assigned and managed.

If a customer makes changes to the code list, the values assigned to the attributes may change as follows: listAgencyID—ID of the customer (ID from DE 3055 if listed there), listVersionID—Assigned and managed by the customer, listAgencySchemeID—ID of the scheme if the listAgencyID is not taken from DE 3055, listAgencySchemeAgencyID—ID of the organization (taken from DE 3055) that manages the scheme of the listAgencySchemeID.

The code list may have the following values: 1 (i.e., Buyer), 2 (i.e., Seller), 3 (i.e., Creditor), 4 (i.e., Debitor), 5 (i.e., Product Recipient), 6 (i.e., Vendor), 7 (i.e., Manufacturer), 8 (i.e., Payer), 9 (i.e., Payee), 10 (i.e., Bill-to party), 11 (i.e., Invoicer), 12 (i.e., Carrier), 13 (i.e., Requestor), 14 (i.e., Portal Provider), 15 (i.e., Catalog Provider), 16 (i.e., Bidder), 17 (i.e., Owner), 18 (i.e., Tax Payer), 19 (i.e., Tax Operator), 20 (i.e., Contract Releaser), 21 (i.e., Borrower), 22 (i.e., Lender), 23 (i.e., Broker), 24 (i.e., Bailsman), 25 (i.e., Copy Recipient (i.e., CC)), 26 (i.e., Blind Copy (i.e., BCC)), 27 (i.e., Quality Inspection Processor), 28 (i.e., Service and Support Group), 29 (i.e., Sales partner), 30 (i.e., Competitor), 31 (i.e., Prospect), 32 (i.e., Empfänger), 33 (i.e., Absender), 34 (i.e., Aktivitätspartner), 35 (i.e., Organizer), 36 (i.e., Teilnehmer), 39 (i.e., Zuständiger Mitarbeiter), 40 (i.e., Bearbeiter), 41 (i.e., Partner mit Bezug zur Aktivität), 42 (i.e., Ausführendes Serviceteam), 43 (i.e., Leistungserbringer), 44 (i.e., Vertriebseinheit/Verkaufseinheit), 45 (i.e., Kommunikationspartner), 46 (i.e., Vertriebsmitarbeiter), 47 (i.e., Spediteur), 48 (i.e., Verantwortliche Distributionsabteilung), 50 (i.e., Aktivitätseinheit), 51 (i.e., Abholer), 52 (i.e., Zuständige Einkaufsorganisation), 53 (i.e., Zuständige Einkäufergruppe), 54 (i.e., Clearing-Stelle), 55 (i.e., Hausbank), 56 (i.e., DispatcherParty).

Use can be the differentiation of a PartyRoleCategory in various processes. For example, the PartyRole "ServiceRecipient" can be used for the PartyRoleCategory "ProductRecipient" in a service process, and "GoodsRecipient" in a sales process.

PartyStandardID

A PartyStandardID is a standardized identifier for a party, and the identification scheme used can be controlled by an agency from the code list DE 3055. A party can be a natural person, organization, or business partner group in which a company has a business or intra-enterprise interest. This could be a person, organization, or group within or outside of the company. An example of PartyStandardIdentificationIdentifier is:

<BuyerParty>

. . .

<StandardID schemeAgencyID="16">123456789</PartyStandardID>

. . .

</BuyerParty>

In certain implementations, PartyStandardID may have the following structure:

| CDT | | Cat. | Object Class | Property Qual. | Property | Rep./ Ass. | Type | Type Name | Len. | Card. | Remarks |
|---|---|---|---|---|---|---|---|---|---|---|---|
| PartyStandardID | | | Party | Standard | Identification | Identifier | GDT | PartyID | 1..13 | | restricted |
| | schemeAgencyID | A | IdentificationSchemeAgency | | Identification | Identifier | XSD | Token | 1..3 | 1 | |

In the previously described structure, the following may be identified as: schemeAgencyID may contain values from the code list DE 3055. The codes supported include: 9 (i.e., EAN.UCC) for the 13-character Global Location Number (i.e., GLN), 16 (i.e., Dun&Bradstreet Corporation) for the 9-character DUNS (i.e., Data Universal Numbering System), 182 (i.e., US, Standard Carrier Alpha Code (i.e., Motor) Organization) for the 2-to-4-character SCAC (i.e., Standard Carrier Alpha Code).

PartyStandardID may limit the general identifier PartyID to standard identifiers, whose scheme was assigned by a standardization organization from code list DE 3055. IDs that may identify a party are permitted. IDs that identify a location may not be permitted.

In contrast to PartyPartyID, use of PartyStandardID may not be role dependent.

PartyTaxID

A PartyTaxID is an identifier for a taxpayer assigned by a tax authority. An example of PartyTaxID is:

<BuyerParty>

<TaxID schemeID="20112.0">DE118618422</TaxID>

</BuyerParty>

In certain implementations, PartyTaxID may have the following structure:

| GDT | | Cat. | Object Class | Property Qual. | Property | Representation/ Association | Type | Type Name | Len. | Card. | Remarks |
|---|---|---|---|---|---|---|---|---|---|---|---|
| Party-TaxID | | | Party | Tax | Identification | Identifier | CDT | Identifier | 1..20 | | Restricted |
| | schemeID | A | Identification Scheme | | Identification | Identifier | xsd | token | 1.. 60 | 1 | |

PartyTaxID may contain a tax number that is up to 20 characters long. In the previously described structure, schemeID attribute may specify what kind of tax number the tax number is. The schemeIDs may be defined by means of the entries in the GDT TaxIdentificationNumberTypeCode using the pattern "<listID>.<code>." For example, "20122.0" for a German VAT registration number.

Tax numbers may be used to identify taxpayers. A taxpayer may have more than one tax number since there are various types of tax numbers. In many countries, you may state the tax number not just when filing a tax return or remitting taxes, but you may also print them on invoices.

PaymentAdviceTypeCode

A PaymentAdviceTypeCode is the coded representation of the type of a payment advice note. An example of PaymentAdviceTypeCode is:

<PaymentAdviceTypeCode>1</PaymentAdviceTypeCode>

In certain implementations, PaymentAdviceTypeCode may have the following structure:

| GDT | Object Class | Property | Representation/ Association | Type | Type Name | Len. | Remarks |
|---|---|---|---|---|---|---|---|
| Payment-Advice-TypeCode | Payment Advice | Type | Code | CDT | Code | 1..2 | Restricted |

The PaymentAdviseTypeCode may be a code list with the implicitly given attributes: listID="10058," listAgencyID="310," and listVersionID="tbd."

The code list may have the following values: Code 1 (i.e., Business partner payment advice note: Payment advice note from the business partner), Code 2 (i.e., Debit payment advice note: Payment advice note from the house bank which notifies of a debit of the receiver's bank account), Code 3 (i.e., Credit memo payment advice note: Payment advice note from the house bank which notifies of a cash receipt to the receiver's bank account).

The PaymentAdviceTypeCode can be used to specify the type of a payment advice note. In the liquidity forecast, assumptions can be made about the time and probability of an incoming payment of the notified amount.

A payment advice note message with the PaymentAdviceTypeCode 1 may correspond to the IDoc message type REMADV. A payment advice note message with the PaymentAdviceTypeCode 2 may correspond to the IDoc message type DEBADV. A payment advice note message with the PaymentAdviceTypeCode 3 may correspond to the IDoc message type CREADV.

PaymentAllocationItemTypeCode

A PaymentAllocationItemTypeCode is the coded representation of the type of a PaymentAllocationItem. A PaymentAllocationItem can be the allocation of part of a payment register item (i.e., an Item of the business object PaymentRegister) to a payment reason on the basis of which part of the payment register item occurred. A payment register item (i.e., an Item of the business object PaymentRegister) may be considered a payment from a base payment business transaction that can consist of multiple parts with different payment reasons. An example of PaymentAllocationItemTypeCode:

<PaymentAllocationItemTypeCode>1</PaymentAllocationItemTypeCode>

In certain implementations, PaymentAllocationItemTypeCode may have the following structure:

| GDT | Object Class | Property | Representation/ Association | Type | Type Name | Len. | Remarks |
|---|---|---|---|---|---|---|---|
| Payment-Allocation-Type-Code | Payment-Allocation-Item | Type | Code | CDT | Code | 1..2 | restricted |

A fixed code list may be assigned to PaymentAllocationItemTypeCode. The attributes can include the following: listID="10299," listAgencyID="310."

The code list and its values may include: 1 (i.e., Allocation within Payment Processing to a notified payment item, a payment order, or a confirmed payment item), 2 (i.e., The allocation of a part of a payment register item to a business origin of the payment that is managed outside Payment Processing), 3 (i.e., Allocation to expense or revenue from fees), 4 (i.e., Allocation to expense or revenue from interest).

PaymentBaseBusinessTransactionTypeCode

A PaymentBaseBusinessTransactionTypeCode is the coded representation of the type of a business transaction that is based on a payment transaction from the view of Payment-Processing. An example of PaymentBaseBusinessTransactionTypeCode is:

<PaymentBaseBusinessTransactionTypeCode
listID=10216"
listAgencyID="310"
listVersionID="1">
1
</PaymentBaseBusinessTransactionTypeCode>

In certain implementations, PaymentBaseBusinessTransactionTypeCode may have the following structure:

| GDT | | Cat. | Object Class | Property | Representation/ Association | Type | Type Name | Len. | Card. | Remarks |
|---|---|---|---|---|---|---|---|---|---|---|
| PaymentBase-Business-Transaction-TypeCode | | | PaymentBase-Business-Transaction | | Code | CDT | Code | 1..2 | | restricted |
| | listAgency-ID | A | Code List Agency | Identification | Identifier | xsd | token | | 0..1 | |
| | listVersion-ID | A | Code List | Version | Identifier | xsd | token | | 0..1 | |
| | listAgency Scheme-ID | A | Code List Agency | Scheme | Identifier | xsd | token | | 0..1 | |
| | listAgency-Scheme-AgencyID | A | Code List Agency | Scheme Agency | Identifier | xsd | token | | 0..1 | |

In the previously described structure the following may be identified as: listAgencyID (i.e., If the code list remains unchanged, list agency ID is "310." If a user creates his code list during configuration, list agency ID is the ID of the code user (ID from DE 3055, if listed there)), listVersionID (i.e., If the code list remains unchanged, list version ID is the version of the particular code list assigned. If a user creates his code list during configuration, list version ID is the version of particular code list assigned and managed by the code user), listAgencySchemeID (i.e., If a user of this code creates his code list during configuration, list agency scheme ID is the ID of the scheme if the listAgencyID does not come from DE 3055), listAgencySchemeAgencyID (i.e., If a user of this code creates his code list during configuration, list agency scheme agency Id is the ID of the organization from DE 3055 that manages the listAgencySchemeID scheme).

An extendable code list may be assigned to the PaymentBaseBusinessTransactionTypeCode. Customers can change this code list. The attribute may have the following value: listID="10216."

The code list and its values may include the following: 1 (i.e., TradeReceivables Settlement), 2 (i.e., TradePayables Settlement), 3 (i.e., Travel Expense Settlement), 4 (i.e., Treasury Settlement), 5 (i.e., In-House Cash Settlement), 6 (i.e., HR Settlement), 7 (i.e., Loans Settlement), 8 (i.e., TaxReceivablesPayables Settlement), 9 (i.e., Bank Account Transfer).

The PaymentBaseBusinessTransactionTypeCode may be used when processing payment transactions in PaymentProcessing, for example, to form the note to payee for a payment medium. The PaymentBaseBusinessTransactionTypeCode may also used to determine the business transaction type when processing payments. The business transaction type may be responsible for processing the incoming payment.

The PaymentBaseBusinessTransactionTypeCode may correspond to the data type FIBL_ORIGIN in R/3.

PaymentBlock

A PaymentBlock specifies the reason and time for a business document block in payment transactions. An example of PaymentBlock is;

<PaymentBlock>
<BlockingReasonCode>1</BlockingReasonCode>
<ExpirationDateTime>2004-04-19T12:21Z</ExpirationDateTime>
<CreationUserAccountID>4711</CreationUserAccountID>
<CreationDateTime>2004-04-19T12:21Z</CreationDateTime>
</PaymentBlock>

In certain implementations PaymentBlock may have the following structure;

| GDT | | Cat. | Object Class | Property | Representation/ Association | Type | Type Name | Card. |
|---|---|---|---|---|---|---|---|---|
| PaymentBlock | | | Payment Block | | Details | | | |
| | Blocking-Reason-Code | E | Payment Block | Blocking Reason Code | Code | GDT | Blocking-Reason-Code | 0..1 |
| | Expiration-DateTime | E | Payment Block | Expiration Date Time | Date Time | CDT | DateTime | 1 |

-continued

| GDT | | Cat. | Object Class | Property | Representation/ Association | Type | Type Name | Card. |
|---|---|---|---|---|---|---|---|---|
| | Creation-User-AccountID | E | Payment Block | Creation User Account Identification | Identifier | GDT | User-Account-ID | 0..1 |
| | Creation-DateTime | E | Payment Block | Creation Date Time | Date Time | CDT | DateTime | 0..1 |

In the previously described structure, the following may be identified as: BlockingReasonCode—Specifies the reason for the PaymentBlock, ExpirationDateTime—Specifies the date and time until the block is valid, CreationUserAccountID—Specifies the user ID of the person who has set the PaymentBlock, CreationDateTime—Specifies the date and time when the PaymentBlock was set.

A time stamp 9999-12-31T23:59:59Z in ExpirationDateTime may indicate that the block is valid indefinitely.

The PaymentBlock can be used, for example, in invoices to block them for payment.

PaymentBlockingReasonCode

A PaymentBlockingReasonCode is a coded representation of a reason why the processing of a payment is blocked. An example of PaymentBlockingReasonCode is:

<PaymentBlockingReasonCode>1</PaymentBlockingReasonCode>

In certain implementations, PaymentBlockingReasonCode may have the following structure:

| GDT | | Cat. | Object Class | Property | Representation/ Association | Type | Type Name | Len. | Card. | Remarks |
|---|---|---|---|---|---|---|---|---|---|---|
| Payment-Blocking-Reason-Code | | | Payment | Blocking Reason | Code | CDT | Code | 1..2 | | restricted |
| | listID | A | Code List | Identification | Identifier | xsd | token | | 0..1 | |
| | listAgency-ID | A | Code List Agency | Identification | Identifier | xsd | token | | 0..1 | |
| | list-VersionID | A | Code List | Version | Identifier | xsd | token | | 0..1 | |
| | listAgency-SchemeID | A | Code List Agency | Scheme | Identifier | xsd | token | | 0..1 | |
| | listAgency-Scheme-AgencyID | A | Code List Agency | Scheme Agency | Identifier | xsd | token | | 0..1 | |

In the previously defined structure, the following may be identified as: listID—ID of the particular code list: Assigned by the Coaching Team, listAgencyID—If the code list remains unchanged, list agency ID is "310"; If a user creates his code list during configuration, list agency ID is the ID of the code user (ID from DE 3055, if listed there), listVersionID—If the code list remains unchanged, list version ID is the version of the particular code list which can be assigned and managed. For example, if a user creates his code list during configuration, list version ID is the version of particular code list assigned and managed by the code user, listAgencySchemeID—If a user of this code creates his code list during configuration, list agency scheme ID is the ID of the scheme if the listAgencyID does not come from DE 3055, listAgencySchemeAgencyID—If a user of this code creates his code list during configuration, list agency scheme agency Id is the ID of the organization from DE 3055 that manages the listAgencySchemeID scheme.

An extensible code list may be assigned to the code. A user of this code can replace this code list with his or hers. The code list may include the following: Code 1 Disputed—Further payment processing is blocked because of disputes with the Business Partner about invoices, credit memos, payments etc.

In messages, PaymentBlockingReasonCode may be used when both sender and recipient have access to shared or harmonized Business Configuration, for example during internal communication in an enterprise.

PaymentCard

PaymentCard is an identification card that authorizes the holder to settle invoices without cash with contract companies connected to the payment system. The PaymentCard may contain the data that a company knows from the payment card of its customer. An example of PaymentCard is:

<PaymentCard>

<ID>4111555522223333</ID>

<CategoryCode>1<CategoryCode>

<TypeCode>2</TypeCode>

<ExpirationDate>2006-12-31</ExpirationDate>

<Holder>Harry Hirsch</HolderName>

<NickName>Harrys Visa card</NickName>

</PaymentCard>

In certain implementations, PaymentCard may have the following structure:

| GDT | | Cat. | Object Class | Property | Representation/ Association | Type | Type Name | Len. | Card. | Remarks |
|---|---|---|---|---|---|---|---|---|---|---|
| Payment-Card | | | Payment Card | | Details | | | | | |
| | ID | E | Payment Card | Identification | Identifier | GDT | Payment-CardID | | 1 | |
| | Category-Code | E | Payment Card | Category Code | Code | GDT | Payment-Card-Category-Code | | 1 | |
| | Type-Code | E | Payment Card | Type Code | Code | GDT | Payment-Card-TypeCode | | 1 | |
| | Reference-ID | E | Payment Card | Reference Identification | Identifier | GDT | Payment-Card-Reference-ID | 1..25 | 0..1 | restricted |
| | Sequence-ID | E | Payment Card | Sequence Identification | Identifier | GDT | Payment-Card-Sequence-ID | 1..10 | 0..1 | restricted |
| | Holder | E | Payment Card | Holder | Name | GDT | MEDIUM_Name | | 1 | restricted |
| | Valid-From-Date | E | Payment Card | Valid From | Date | GDT | Date | | 0..1 | |
| | Expiration Date | E | Payment Card | Expiration Date | Date | GDT | Date | | 1 | |
| | Description | E | Payment Card | Description | Text | GDT | SMALL_Description | | 0..1 | |
| | Nick-Name | E | Payment Card | Nick Name | Name | GDT | MEDIUM_Name | | 0..1 | restricted |
| | Issuer-Name | E | Payment Card | Issuer | Name | GDT | MEDIUM_Name | | 0..1 | restricted |
| | Issue-Date | E | Payment Card | Issue-Date | Date Time | CDT | DateTime | | 0..1 | |

In certain implementations, a PaymentCard may be defined by fields ID, TypeCode, CategoryCode, ExpirationDate, and Holder.

In the previously described structure includes the following elements: ID which represents an identifier for the payment card, CategoryCode which represents a category of the PaymentCard (i.e., credit card, customer card, etc.), TypeCode which represents the type of the PaymentCard (i.e., VISA, MasterCard, etc.), ReferenceID which represents an additional reference number, that is required for certain credit cards or customer cards for security purposes to guarantee error-free processing, SequenceID which represents a sequence number of the payment card that specifies that the bank has issued more than one card for an account, and identifies which card is being used in this case, Holder which represents a name of the cardholder (i.e., name of a person or company), ValidFromDate which represents a start of the validity of the payment card, ExpirationDate which represents an end of the validity of the payment card, Description which represents a description of the card that is assigned by the cardholder, NickName which represents a short description of the card that is typically assigned by the cardholder, IssuerName which represents a name of the issuing bank/organization, and IssueDate which represents an issue date of the card.

In certain implementations, a payment card number (ID) is valid in connection with a TypeCode. Payment cards can be assigned to business partners.

PaymentCardAddressVerificationResultCode

A PaymentCardAddressVerificationResultCode is the coded representation of the verification result of a postal address of a payment card using an address verification system. An example of PaymentCardAddressVerificationResultCode is:

<PaymentCardAddressVerificationResultCode>1</PaymentCardAddressVerificationResultCode>

In certain implementations, PaymentCardAddressVerificationResultCode may have the following structure:

| GDT | Object Class | Property | Representation/ Association | Type | Type Name | Len. | Remarks |
|---|---|---|---|---|---|---|---|
| PaymentCardAddress-VerificationResultCode | Payment-Card_ Address Verification System Check | Result | Code | CDT | Code | 1..2 | restricted |

A fixed code list may be assigned to the code. The attributes can include the following: listID="10057," listAgencyID="310," listVersionID can be the version of the relevant code list which can be assigned and managed.

The code list and its values may include: 1 (i.e., Address and postal code check successful), 2 (i.e., Address check successful, postal code check unsuccessful), 3 (i.e., Address check unsuccessful, postal code check successful), 4 (i.e., Address and postal code check unsuccessful), 5 (i.e., Not determined).

The acceptance of a card payment may contain the check of the payment card data and payment data. The postal address can be among the checked data. The postal address data of the paying party may be checked against the address data of the institute that issues the card. PaymentCardAddressVerificationResultCode may specify the result of this check. It can be used for the secure authorization of card payments.

The GDT may correspond to the data element COMT_AUTH_RESP_RC_AR in CRM.

The following qualified GDT PaymentCardAddressVerificationResultCode may be defined as follows: AuthorisationPaymentCardAddressVerificationResultCode: Verification result of a postal address of a payment card during authorization of a card payment, SettlementPaymentCardAddressVerificationResultCode: Verification result of a postal address of a payment card during settlement of a card payment.

PaymentCardCategoryCode

A PaymentCardCategoryCode is the coded representation of the category of a payment card. Payment cards may be divided into a few categories according to the criteria acceptance and function, for example, in credit cards and customer cards. An example of PaymentCardCategoryCode is:

<PaymentCardCategoryCode>1</PaymentCardCategoryCode>

In certain implementations, PaymentCardCategoryCode may have the following structure:

| GDT | Object Class | Property | Representation/ Association | Type | Type Name | Len. | Remarks |
|---|---|---|---|---|---|---|---|
| PaymentCard-CategoryCode | PaymentCard | Category | Code | CDT | Code | 1..2 | restricted |

PaymentCardCategoryCode may be a code list. Possible Code list values include: 1 (i.e., The payment card is a credit card), 2 (i.e., The payment card is a payment card on the basis of sufficient funds), 3 (i.e., The payment card is a customer card with payment function).

The following attributes of the CDT Code may be identified as follows: listID="10059," listAgencyID="310," listVersionID can be the version of the code list which can be assigned and administered. PaymentCardCategoryCode may be used in the GDT PaymentCard (described above).

PaymentCardID

PaymentCardID is an identifier of a payment card that is assigned by the issuer of the payment card. A payment card may be an identification card that authorizes the holder to settle invoices without cash with contract companies connected to the payment system. An example of PaymentCardID is:

<PaymentCardID>4111555533336666</PaymentCardID>

In certain implementations, PaymentCardID may have the following structure:

| GDT | Object Class | Property | Representation/ Association | Type | Type Name | Len. | Remarks |
|---|---|---|---|---|---|---|---|
| PaymentCardID | PaymentCard | Identification | Identifier | CDT | Identifier | 1..25 | restricted |

A PaymentCardID may have up to 25 digits.

There can be special algorithms for check digit calculation for PaymentCardID. These may be dependent on the PaymentCardTypeCode, see the GDT PaymentCard. PaymentCardID may be used in the GDT PaymentCard (described above).

PaymentCardPaymentID

Until further notice, PaymentCardPaymentID may be restricted to usage in: Business Objects and A2A messages but not B2B messages. A PaymentCardPaymentID is an identifier for a card payment that is assigned by a clearing house for card payments. An example of PaymentCardPaymentID is:

<PaymentCardPaymentID schemeAgencyID="VV4__000">

0078238283

</PaymentCardPaymentID>

In certain implementations, PaymentCardPaymentID may have the following structure:

| GDT | | Cat. | Object Class | Property | Representation/ Association | Type | Type Name | Len. | Card. | Remarks |
|---|---|---|---|---|---|---|---|---|---|---|
| Payment-Card-PaymentID | | | Payment Card Payment | Identification | Identifier | CDT | Identifier | 1..32 | | Restricted |
| | scheme-Agency-ID | A | Identification Scheme Agency | Identification | Identifier | xsd | token | 1..60 | 0..1 | |

The attributes of PaymentCardPaymentID may be described as follows: SchemeID which represents the "PaymentCardPaymentID" and schemeAgencyID which represents a Business System (i.e., the Business System that issued the ID).

A PaymentCardPaymentID can be in the context of the assigning party. Once a company has transferred an incoming card payment for settlement to a clearing house for card payments, this may return data regarding the settlement in a confirmation message. This may include an identifier for a card payment. The GDT may correspond to the data element SETRA_CC in ERP.

PaymentCardPaymentSettlementBatchPartyID

A PaymentCardPaymentSettlementBatchPartyID is an identifier for a quantity of card payments submitted for settlement together. It may be assigned by a party. An example of PaymentCardPaymentSettlementBatchPartyID is:

<PaymentCardPaymentSettlementBatchPartyID>0463987648</PaymentCardPaymentSettlementBatchPartyID>

In certain implementations, PaymentCardPaymentSettlementBatchPartyID may have the following structure:

| GDT | Object Class | Property Qual. | Property | Representation/ Association | Type | Type Name | Len. | Remarks |
|---|---|---|---|---|---|---|---|---|
| PaymentCard-PaymentSettlement-BatchPartyID | Payment Card Payment__ Settlement Batch | Party | Identification | Identifier | CDT | Identifier | 1..15 | restricted |

A PaymentCardPaymentSettlementBatchPartyID may arise in the context of the assigning party.

The PaymentCardPaymentSettlementBatchPartyID may be assigned by a party for a quantity of card payments to be settled. The identifier may be used to reference a quantity of card payments. Once a company has accepted payments by payment card from business partners, the company may send a quantity of incoming card payments for settlement to a clearing house.

The GDT may correspond to the data element HOST-B_CC/CCBTC in ERP.

PaymentCardPaymentSettlementResultCode

A PaymentCardPaymentSettlementResultCode is the coded representation of the results of the card payment settlement. An example of PaymentCardPaymentSettlementResultCode is:

<PaymentCardPaymentSettlementResultCode>1</PaymentCardPaymentSettlementResultCode>

In certain implementations, PaymentCardPaymentSettlementResultCode may have the following structure:

| GDT | Object Class | Property | Representation/ Association | Type | Type Name | Len. | Remarks |
|---|---|---|---|---|---|---|---|
| PaymentCardPayment-SettlementResultCode | Payment Card Payment Settlement | Result | Code | CDT | Code | 1..2 | Restricted |

A code list may be assigned to the code. The attributes may have the following values: listID="10425," listAgencyID="310," listVersionID can be the version of the relevant code list which can be Assigned and managed.

The code list and its values may include: 1 (i.e., The settlement of a card payment was executed successfully and without errors), 2 (i.e., The settlement of a card payment was rejected), 3 (i.e., The check result could not be determined).

The settlement of an incoming card payment may contain the transfer of the card payment to a clearing house and the receipt of a confirmation from the clearing house. The confirmation may contain information about the success of the settlement. This information can be represented by the data type PaymentCardPaymentSettlementResultCode. Appropriate tasks can be initiated depending on the return value.

The GDT may correspond to the data element REACT_CC in ERP.

PaymentCardReferenceID

A PaymentCardReferenceID is an identifier for the reference number of a payment card. A payment card may be an ID card that authorizes the holder to settle invoices without cash at the companies connected to the payment system. For security reasons, some credit cards or customer cards may require a reference number in addition to the actual payment card number. This can be to enable processing without errors. An example of PaymentCardReferenceID is:

<PaymentCardReferenceID>824</PaymentCardReferenceID>

In certain implementations, PaymentCardReferenceID may have the following structure:

| GDT | Object Class | Property | Representation/ Association | Type | Type Name | Len. | Remarks |
|---|---|---|---|---|---|---|---|
| PaymentCard-ReferenceID | Payment Card Reference | Identification | Identifier | CDT | Identifier | 1..25 | restricted |

PaymentCardReferenceID may be a reference number that is used for the consistency check of the actual payment card number. PaymentCardReferenceID may be used in the GDT PaymentCard.

In a CRM, the GDT may correspond to the data element COMT_CARD_REF_NO.

PaymentCardSequenceID

A PaymentCardSequenceID is an identifier for the sequence number of a payment card. A payment card may be an ID card that authorizes the holder to settle invoices without cash at the companies connected to the payment system. The sequence number of a payment card may specify that the bank has issued more than one card for an account and identifies which card is concerned here. An example of PaymentCardSequenceID is:

<PaymentCardSequenceID>2</PaymentCardSequenceID>

In certain implementations, PaymentCardSequenceID may have the following structure:

| GDT | Object Class | Property | Representation/ Association | Type | Type Name | Len. | Remarks |
|---|---|---|---|---|---|---|---|
| PaymentCardSequenceID | Payment Card Sequence | Identification | Identifier | CDT | Identifier | 1..10 | restricted |

PaymentCardSequenceID may identify together with PaymentCardID a payment card if several payment cards were issued for a card account. PaymentCardSequenceID may be used in the GDT PaymentCard. In a CRM, the GDT may correspond to the data element COMT_CARD_SUFFIX.

PaymentCardTypeCode

A PaymentCardTypeCode is the coded representation of the type of payment card. An example of PaymentCardTypeCode is:

<PaymentCardTypeCode>3</PaymentCardTypeCode>

In certain implementations, PaymentCardTypeCode may have the following structure:

| GDT | Object Class | Property | Representation/ Association | Type | Type Name | Len. | Remarks |
|---|---|---|---|---|---|---|---|
| PaymentCardTypeCode | PaymentCard | PaymentCardType | Code | CDT | Code | 1..4 | restricted |

PaymentCardTypeCode may be considered a code list which can be extended by the customers. The code list and its values may include the following: 1 (i.e., American Express), 2 (i.e., VISA), 3 (i.e., Mastercard), 4 (i.e., Diners), 5 (i.e., maestro).

The attributes of the CDT Code may be identified as: listID="10060," listAgencyID="310," listVersionID can be the version of the code list which can be assigned and administered. PaymentCardTypeCode may be used in the GDT PaymentCard.

PaymentCardVerificationResultCode

A PaymentCardVerificationResultCode is the coded representation of the result of the verification of the data of a payment card. The acceptance of a card payment may contain a check of the payment card. The authenticity and validity of the payment card can be ensured here. An example of PaymentCardVerificationResultCode is:

<PaymentCardVerificationResultCode>1</PaymentCardVerificationResultCode>

In certain implementations, PaymentCardVerificationResultCode may have the following structure:

| GDT | Object Class | Property | Representation/ Association | Type | Type Name | Len. | Remarks |
|---|---|---|---|---|---|---|---|
| PaymentCardVerificationResultCode | Payment Card Check | Result | Code | CDT | Code | 1.. 4 | Restricted |

A code list may be assigned to the code.

The attributes may be identified as: listID="10308," listAgencyID="310," listVersionID is the version of the relevant code list which can be assigned and managed by.

The code list and its values may include: 1 (i.e., Card data check successful), 2 (i.e., Card rejected; card data blocked), 3 (i.e., Card rejected; call clearing house), 4 (i.e., Card rejected; confiscate card). The data type PaymentCardVerificationResultCode may be used for the authorization of card payments.

The GDT may correspond to the data element RCRSP_CC in ERP. The GDT PaymentCardVerificationResultCode qualifiers may be defined as follows: AuthorisationPaymentCardVerificationResultCode (i.e., Check result of a payment card during authorization of a card payment), SettlementPaymentCardVerificationResultCode (i.e., Check result of a payment card during settlement of a card payment).

PaymentCardVerificationValueAvailabilityCode

A PaymentCardVerificationValueAvailabilityCode is the coded representation of the availability of a verification code on a payment card. A verification code of a payment card may be a security feature and can be used for the authorization of payments with the payment card. An example of PaymentCardVerificationValueAvailabilityCode is:

<Global Data Types—Definitionen>9</Global Data Types—Definitionen>

In certain implementations, PaymentCardVerificationValueAvailabilityCode may have the following structure:

| GDT | | Cat. | Object Class | Property | Representation/ Association | Type | Type Name | Len. | Card. | Remarks |
|---|---|---|---|---|---|---|---|---|---|---|
| PaymentCardVerification-ValueAvailabilityCode | | | Payment Card Verification Value | Availability | Code | CDT | Code | 1 | | restricted |
| | listVersionID | A | Code List | Version | Identifier | xsd | token | | 0..1 | |

A fixed code list can be assigned to PaymentCardVerificationValueAvailabilityCode. The following may be described as: listID="10308," listVersionID can be the version of the particular code list.

The code list and its values may include: 0 (i.e., Unknown), 1 (i.e., Available), 2 (i.e., Not readable), 9 (i.e., Without).

The following dependency to PaymentCardVerificationValueText may exist: if PaymentCardVerificationValueText is filled, PaymentCardVerificationValueAvailabilityCode may have value 1, otherwise it may have one of the other values.

The data type may correspond to the CRM data element COMT_CARD_CVV_STATUS. The code values can be taken from the domains of the CRM data element.

PaymentCardVerificationValueText

PaymentCardVerificationValueText is the verification code of payment cards. A verification code of a payment card may be considered a security feature and can be used for the authorization of payments with the payment card. An example of PaymentCardVerificationValueText is:

<PaymentCardVerificationValueText>0521</PaymentCardVerificationValueText>

In certain implementations, PaymentCardVerificationValueText may have the following structure:

| GDT | Object Class Qual. | Object Class | Property Qual. | Property | Rep./ Ass. | Type | Type Name | Len. | Remarks |
|---|---|---|---|---|---|---|---|---|---|
| PaymentCardVerificationValueText | | Payment Card | | Verification Value | Text | CDT | Text | 3..4 | restricted |

The PaymentCardVerificationValueText can be sent to the clearing house during the authorization of payments with payment cards.

The GDT may correspond to the data element COMT_CARD_CVV in CRM.

PaymentCardVerificationValueVerificationResultCode

A GDT PaymentCardVerificationValueVerificationResultCode is the result of the check of the verification code of a payment card. An example of GDT PaymentCardVerificationValueVerificationResultCode is:

<PaymentCardVerificationValueVerificationResultCode>1<PaymentCardVerificationValueVerificationResultCode>

In certain implementations, a GDT PaymentCardVerificationValueVerificationResultCode may have the following structure:

| GDT | Object Class | Property | Representation/ Association | Type | Type Name | Len. | Remarks |
|---|---|---|---|---|---|---|---|
| PaymentCard-Verification-Value-VerificationResultCode | Payment Card Verification Value Verification | Result | Code | CDT | Code | 1..2 | Restricted |

The data type GDT PaymentCardVerificationValueVerificationResultCode may assign one static code list to the code. The attributes may be assigned the following values: listID="10424", listAgencyID="310" and listVersionID can be the version of the relevant code list.

The acceptance of a card payment can contain a check of the payment card data. The verification code can be among the checked data. The data type GDT PaymentCardVerificationValueVerificationResultCode is the coded representation of the result of the check of the verification code of a payment card. It can be used for the secure authorization of card payments. The GDT can correspond to the data element COMT_AUTH_RESP_RC_CVV in CRM.

The data type GDT PaymentCardVerificationValueVerificationResultCode may use the following codes: 1 (i.e., Successful), B (i.e., Unsuccessful), C (i.e., Not determined). The GDT PaymentCardVerificationValueVerificationResultCode list of qualifiers can include: AuthorisationPaymentCardVerificationValueVerificationResultCode. For example, an AccountDebitIndicator specifies whether or not an account movement is an account debit.

PaymentDifferenceExplanationItem

A GDT PaymentDifferenceExplanationItem is an item that explains the reason, the amount, and the origin of the differences between an actual payment and the originally expected payment amount. An example of GDT PaymentDifferenceExplanationItem is:

<PaymentDifferenceExplanationitem>
<Amount currencyCode="EUR">28.00</NetAmount>
<PaymentDifferenceReasonCode listAgency="6">32</PaymentDifferenceReasonCode>
<PaymentTransactionDestinatedInvoiceReference>
<ID>1800010187</ID>
<ItemID>7</ItemID>
</PaymentTransactionDestinatedInvoiceReference>
</PaymentDifferenceExplanationitem>

In certain implementations, GDT PaymentDifferenceExplanationItem may have the following structure:

| GDT | | Cat. | Object Class | Property | Representation/ Association | Type | Type Name | Card. |
|---|---|---|---|---|---|---|---|---|
| Payment-Difference-Explanation-Item | | | Payment Difference Explanation Item | | Details | | | |
| | Offsetting-Indicator | E | Payment Difference Explanation Item | Offsetting Indicator | Indicator | CDT | Indicator | 0..1 |
| | Amount | E | Payment Difference Explanation Item | Amount | Amount | CDT | Amount | 1 |
| | Payment-Difference-ReasonCode | E | Payment Difference Explanation Item | Payment Difference Reason Code | Code | GDT | Payment-Difference-ReasonCode | 0..1 |
| | Payment-Transaction-Initiator-Invoice-Reference | E | Payment Difference Explanation Item | Payment Transaction Initiator Invoice Reference | Details | GDT | Business-Transaction-Document Reference | 0..1 |
| | Payment-Transaction-Destinated-Invoice-Reference | E | Payment Difference Explanation Item | Payment Transaction Destinated Invoice Reference | Details | GDT | Business-Transaction-Document Reference | 0..1 |
| | Payment-Transaction-Initiator-Contract-Reference | E | Payment Difference Explanation Item | Payment Transaction Initiator Contract Reference | Details | GDT | Business-Transaction-Document Reference | 0..1 |
| | Payment-Transaction-Destinated-Contract-Reference | E | Payment Difference Explanation Item | Payment Transaction Destinated Contract Reference | Details | GDT | Business-Transaction-Document Reference | 0..1 |
| | Payment-Transaction-Initiator-PurchaseOrder-Reference | E | Payment Difference Explanation Item | Payment Transaction Initiator Purchase Order Reference | Details | GDT | Business-Transaction-Document Reference | 0..1 |
| | Payment-Transaction-Destinated-Purchase-OrderReference | E | Payment Difference Explanation Item | Payment Transaction Destinated Purchase Order Reference | Details | GDT | Business-Transaction-Document Reference | 0..1 |

As shown in the previous table, OffsettingIndicator can specify whether the difference amount is offset against other PaymentDifferenceExplanationItems on the same level or whether this amount is added to an amount at a higher level. Amount can be an amount of the adjustment of a payment (in payment currency). PaymentDifferenceReasonCode can be Code for the reason of the payment difference.

PaymentTransactionInitiatorInvoiceReference can be Reference to the invoice of the payment transaction initiator. PaymentTransactionDestinatedInvoiceReference can be Reference to the invoice of the payment transaction recipient. PaymentTransactionInitiatorContractReference can be Reference to the contract of the payment transaction initiator. PaymentTransactionDestinatedContractReference can be Reference to the contract of the payment transaction recipient.

PaymentTransactionInitiatorPurchaseOrderReference can be Reference to the purchase order of the payment transaction initiator. PaymentTransactionDestinatedPurchaseOrderReference can be Reference to the purchase order of the payment transaction recipient. The references refer to a business document or one of its items. GDT PaymentDifferenceExplanationItem is only used in PaymentExplanation. The use of the OffsettingIndicator is analog to the use in PaymentExplanation, see the notes there. A PaymentDifferenceReasonCode is the coded representation of the reason for a payment difference. A payment difference can be the amount-based difference between the expected payment and the actual payment. An example of GDT PaymentDifferenceExplanationItem is Reason for a payment difference, such as deduction of freight costs:
<PaymentDifferenceReasonCode>40</PaymentDifferenceReasonCode>
In certain implementations, GDT PaymentDifferenceExplanationItem may have the following structure:

| GDT | Object Class | Property | Representation/ Association | Type | Type Name | Len. | Remarks |
|---|---|---|---|---|---|---|---|
| Payment-Difference-ReasonCode | Payment Difference | Reason | Code | CDT | Code | 1..3 | Restricted |

The data GDT PaymentDifferenceExplanationItem may assign one static code list to the code: UN/EDIFACT 4465. The attributes may be assigned the following values: listID="4465", listAgencyID="6" and listVersionID can be the version of the relevant code list.

PaymentExplanationItem

A PaymentExplanationItem is an item that explains a payment, in particular, the reason for the payment (with reference to a business document), the extent of the payment (by different amounts, such as the cash discount amount), and the difference between the expected payment amount and the actual payment amount. For example, Company01 transfers € 30 to Company 02. This € 30 results from several invoice items and credit memo items and is explained by the following PaymentExplanationItems. Company01 is a customer of Company02, Company 02 sent the customer invoice 1800010187 of € 100 to Company01. Company01 paid the vendor invoice 1800010187, but € 20 was deducted. The difference of € 20 is explained as follows: The delivery to invoice item 7 (€ 28) was missing (ReasonCode 32, "goods not delivered"). Company02 made an error in invoice item 2, however, because of the good business relationships, Company01 pays the correct amount and thus € 8 extra. The set OffsettingIndicator indicates that the difference to be explained is reduced to € 20 (Reason code 9, "invoice error"). Referring to the example description, an example of PaymentExplanationItem is:

```
<PaymentExplanationItem>
  <ID>0000000001</ID>
<BusinessTransactionDocumentDate>2005-04-15</
BusinessTransactionDocumentDate><NetAmount
currencyCode="EUR">80.00</NetAmount>
<GrossAmount currencyCode="EUR">100.00</
GrossAmount><PaymentTransactionDestinatedInvoice
Reference><ID>1800010187</ID></PaymentTransaction-
DestinatedInvoiceReference>
  <PaymentDifferenceExplanationitem>
  <Amount currencyCode="EUR">28.00</NetAmount>
  <PaymentDifferenceReasonCodelistAgency="6">32</
    PaymentDifferenceReasonCode>
  <PaymentTransactionDestinatedInvoiceReference>
<ID>1800010187</ID>
  <ItemID>7</ItemID>
  </PaymentTransactionDestinatedInvoiceReference>
  </PaymentDifferenceExplanationItem>
  <PaymentDifferenceExplanationitem>
  <OffsettingIndicator>true</OffsettingIndicator>
  <Amount currencyCode="EUR">8.00</NetAmount>
  <PaymentDifferenceReasonCodelistAgency="6">9</
    PaymentDifferenceReasonCode>
  <PaymentTransactionDestinatedInvoiceReference>
<ID>1800010187</ID>
  <ItemID>2</ItemID>
  </PaymentTransactionDestinatedInvoiceReference>
  </PaymentDifferenceExplanationitem>
</PaymentExplanationitem>
```

In this example, Company02 also sent a notification about customer credit memo 1600000002 of € 50 to Company01. Company01 has offset a vendor credit memo 1600000002 of € 50 with the remaining € 80. The set OffsettingIndicator indicates the offsetting: The total amount of the bank transfer is reduced by this item from € 80 to € 30. Referring to the above example, another PaymentExplanationItem is:

```
<PaymentExplanationitem>
  <ID>0000000002</ID>
  <OffsettingIndicator>true<OffsettingIndicator>
<BusinessTransactionDocumentDate>2005-03-11</Busi-
nessTransactionDocumentDate>
<NetAmount currencyCode="EUR">50.00</NetAmount>
<PaymentTransactionDestinatedInvoiceReference>
<ID>1600000002</ID>
</PaymentTransactionDestinatedInvoiceReference>
</PaymentExplanationitem>
```

In certain implementations, a GDT PaymentExplanationItem may have the following structure:

| GDT | | Cat. | Object Class | Property | Representation/ Association | Type | Type Name | Len. | Card. | Remarks |
|---|---|---|---|---|---|---|---|---|---|---|
| Payment-Explanation-Item | | | Payment Explanation Item | | Details | | | | | |
| | ID | E | Payment Explanation Item | Identification | Identifier | GDT | Business-Transaction-Document-ItemID | | 0..1 | |
| | Offsetting-Indicator | E | Payment Explanation Item | Offsetting Indicator | Indicator | CDT | Indicator | | 0..1 | |
| | Business-Transaction-Document-Date | E | Payment Explanation Item | Business Transaction Document Date | Date | GDT | Date | | 0..1 | |
| | Net-Amount | E | Payment Explanation Item | Net Amount | Amount | CDT | Amount | | 0..1 | |
| | Gross-Amount | E | Payment Explanation Item | Gross Amount | Amount | CDT | Amount | | 0..1 | |
| | Transaction-Currency-Gross-Amount | E | Payment Explanation Item | Transaction Currency Gross Amount | Amount | CDT | Amount | | 0..1 | |
| | Cash Discount-Amount | E | Payment Explanation Item | Cash Discount Amount | Amount | CDT | Amount | | 0..1 | |

-continued

| GDT | | Cat. | Object Class | Property | Representation/ Association | Type | Type Name | Len. | Card. | Remarks |
|---|---|---|---|---|---|---|---|---|---|---|
| | Transaction-Currency-Cash-Discount-Amount | E | Payment Explanation Item | Transaction Currency Cash Discount Amount | Amount | CDT | Amount | | 0..1 | |
| | Withholding-Tax-Amount | E | Payment Explanation Item | Withholding Tax Amount | Amount | CDT | Amount | | 0..1 | |
| | Bank-Fee-Amount | E | Payment Explanation Item | Bank Fee Amount | Amount | CDT | Amount | | 0..1 | |
| | Scandinavian-Payment-Reference-ID | E | Payment Explanation Item | Scandinavian Payment Reference Identification | Identifier | CDT | Identifier | 1..30 | 0..1 | Restricted |
| | Swiss-Payment-Reference-ID | E | Payment Explanation Item | Swiss Payment Reference Identification | Identifier | CDT | Identifier | 1..27 | 0..1 | Restricted |
| | Note | E | Payment Explanation Item | Note | Note | GDT | Note | | 0..1 | |
| | Original Payment-Transaction-Initiator-Party | E | Payment Explanation Item | Origin Payment Transaction Initiator Party | Details | GDT | Business-Transaction-Document-Party | | 0..1 | |
| | Final-Payment-Transaction-Destinated-Party | E | Payment Explanation Item | Final Payment Transaction Destinated Party | Details | GDT | Business-Transaction-Document-Party | | 0..1 | |
| | Payment-Transaction-Initiator-Invoice-Reference | E | Payment Explanation Item | Payment-Transaction-Initiator Invoice Reference | Details | GDT | Business-Transaction-Document Reference | | 0..1 | |
| | Payment-Transaction-Destinated-Invoice-Reference | E | Payment Explanation Item | Payment-Transaction Destinated Invoice Reference | Details | GDT | Business-Transaction-Document Reference | | 0..1 | |
| | Payment-Transaction-Initiator-Contract-Reference | E | Payment Explanation Item | Payment-Transaction Initiator Contract Reference | Details | GDT | Business-Transaction-Document Reference | | 0..1 | |
| | Payment-Transaction-Destinated-Contract-Reference | E | Payment Explanation Item | Payment-Transation Destinated Contract Reference | Details | GDT | Business-Transaction-Document Reference | | 0..1 | |
| | Payment-Transaction-Initiator-Purchase-Order-Reference- | E | Payment Explanation Item | Payment-Transaction Initiator Order Reference | Details | GDT | Business-Transaction-Document Reference | | 0..1 | |
| | Payment-Transaction-Destinated-Purchase-Order-Reference- | E | Payment Explanation Item | Payment-Transaction Destinated Order Reference | Details | GDT | Business-Transaction-Document Reference | | 0..1 | |
| | Payment-Difference Explanation Item | E | Payment Explanation Item | Payment Difference Explanation Item | Details | GD T | Payment-Difference-Explanation-Item | | 0..n | |

ID can be identification of a PaymentExplanationItem in the context of a payment advice note or a payment. This ID uniquely identifies a PaymentExplanationItem together with a payment advice note ID or a payment ID. OffsettingIndicator can specify whether the amount of this PaymentExplanationItem is offset against other PaymentExplanationItems on the same level or whether this amount is added to a total amount at a higher level.BusinessTransactionDocumentDate can be date of the business document to which the PaymentExplanationItem refers. NetAmount can be the paid or collected amount. GrossAmount can be amount of the business document to which the PaymentExplanationItem refers, for example, invoiced amount or amount of the loan contract. TransactionCurrencyGrossAmount can be amount of the business document in transaction currency.

CashDiscountAmount can be the deducted cash discount. TransactionCurrencyCashDiscountAmount can be the cash discount amount in transaction currency. WithholdingTaxAmount can be the deducted withholding tax. BankFeeAmount can be the deducted bank charges. ScandinavianPaymentReferenceID can be payment reference used in Scandinavia (called KIDNO). SwissPaymentReferenceID can be payment reference used in Switzerland (called ESR-Referenz).

Note can be custom text that explains the payment and the deducted amounts. OriginalPaymentTransactionInitiator Party can be the party to which the receivable or payable belongs, and which originally initiated the payment or debit memo. FinalPaymentTransactionDestinatedParty can be the party for which the payment or credit memo is intended. PaymentTransactionInitiatorInvoiceReference can be reference to the invoice of the party which initiates the payment transaction. PaymentTransactionDestinatedInvoiceReference can be reference to the invoice of the party for which the payment transaction is intended.

PaymentTransactionInitiatorContractReference can be reference to the contract of the party which initiates the payment transaction. PaymentTransactionDestinatedContractReference can be reference to the contract of the party for which the payment transaction is intended. PaymentTransactionInitiatorPurchaseOrderReference can be reference to the purchase order of the party which initiates the payment transaction.

PaymentTransactionDestinatedPurchaseOrderReference can be reference to the purchase order of the party for which the payment transaction is intended. PaymentDifferenceExplanationItem can explain the difference between the expected payment amount and the actual payment amount. The references could refer to a business document not to one of its items. OriginalPaymentTransactionInitiator Party is only entered if this party differs from one of the payment transaction initiators (PaymentTransactionInitiator Party) known from the context. FinalPaymentTransactionDestinatedParty is only entered if this party differs from one of the payment transaction recipients (PaymentTransactionDestinatedParty) known from the context. PaymentExplanationItem is used in a payment advice note to explain the notified amount.

All amounts can be entered in payment currency. TransactionCurrencyGrossAmount and TransactionCurrencyCashDiscountAmount are exceptions. They could be entered in the currency of the business document to which the PaymentExplanationItem refers. A PaymentAdvice, PaymentOrder, or BankAccountStatement normally contains multiple PaymentExplanations, however, they mainly refer to vendor invoices. The OffsettingIndicator is not set for these PaymentExplanationItems since they are added to the payment amount. However, some PaymentExplanationItems can also reduce the payment amount, for example, subsequent credit memos due to incomplete delivery. These PaymentExplanationItems are then offset against the remaining items and the OffsettingIndicator is set (see "Example").

PaymentExplanationItemID

A GDT PaymentExplanationItemID is a unique identifier for an item of a payment explanation. An item of a payment explanation contains the payment amount and information used to identify a business document (such as, contract, invoice, credit memo, or sales order) that has initiated the payment transaction. An example of GDT PaymentExplanationItemID is:

<PaymentExplanationItemID>001</PaymentExplanationItemID>

In certain implementations, a GDT PaymentExplanationItemID may have the following structure:

| GDT | Object Class | Property | Representation/ Association | Type | Type Name | Len. | Remarks |
|---|---|---|---|---|---|---|---|
| PaymentExplanationItemID | PaymentExplanationItem | Identification | Identifier | CDT | Identifier | 1..3 | restricted |

A PaymentExplanationItemID uniquely identifies an item of a payment explanation together with the ID of the higher-level object (contract, invoice, credit memo, or sales order) or the payment ID.

PaymentFormCode

A GDT PaymentFormCode is the coded representation of the payment form. The payment form is the way in which a product or service is paid for. An example of GDT PaymentFormCode is:

<PaymentFormCode>01</PaymentFormCode>

In certain implementations, PaymentFormCode may have the following structure:

| GDT | Object Class | Property | Representation/ Association | Type | Type Name | Len. | Remarks |
|---|---|---|---|---|---|---|---|
| PaymentFormCode | Payment | Form | Code | CDT | Code | 2 | restricted |

The data type GDT PaymentFormCode may assign one static code list to the code. The attributes may be assigned the following values: listID="10035" and listAgencyID="310."

The PaymentFormCode is used to determine the payment form when goods or services are ordered. The "Invoice" code is used as the default value. The PaymentFormCode does not contain any additional information needed for payment processing such as the type and number of the credit card or the number of the bank account from which the payment could be debited. Some of this information is transmitted in other parts of the message, and some it transmitted in separate messages. The PaymentFormCode could not be confused with the PaymentMethod, which describes in detail how a payment is made from FI, HR, or Treasury: Domestic bank transfer, Foreign bank transfer, Post office bank transfer, Bank direct debit, Check, Order check, Bank check, Bill of exchange. Some parts of the UN/EDIFACT code list 4461 (Payment Means Code) (or ASC X12 107) can also be used for the PaymentMethodCode.

A suitable payment method is determined based on the payment form. These two terms cannot be placed together in one list, (i.e., PaymentFormCode and PaymentMethodCode), such that the values become: Invoice—BankTransfer and Check; PaymentCard—PaymentCard; CashOnDelivery—Check and Cash; BankCollection—DirectDebit. In certain implementations, only 3 values (PaymentCard, CashOnDelivery, Per Invoice) are used. If a payment is to be made by invoice, it is not necessary to specify a payment form. To use a new value, an implementation for the new code may be made; therefore, CRM currently does not accept any other values. The data type GDT PaymentFormCode may use the following codes: 01 (i.e., DirectPayer), 02 (i.e., PaymentCard), 03 (i.e., CashOnDelivery), 04 (i.e., BankCollection), 05 (i.e., BankTransfer), 06 (i.e., Cheque), 07 (i.e., BillOfExchange), 08 (i.e., NotePaymentRequest), 09 (i.e., Cash) and 10 (i.e., ChequeFinancing).

The PaymentFormCodeContextElements can define a dependency or an environment in which the PaymentFormCode appears. The environment is described by context categories. With the context categories in PaymentFormCodeContextElements, the valid portion of code values of PaymentFormCode is restricted according to an environment during use.

In certain implementations, a GDT PaymentFormCodeContextElements may have the following structure:

| GDT | | Cat. | Object Class | Property | Representation/ Association | Type | Type Name | Card. |
|---|---|---|---|---|---|---|---|---|
| Payment-Form-Code-Context-Elements | | | Payment Form Code Context Elements | | Details | | | |
| | Country-Code | E | Payment Form Code Context Elements | Country | Code | GDT | CountryCode | 0..1 |
| | Business-Process-Variant Type-Code | E | Payment Form Code Context Elements | Business-Process-Variant-Type | Code | GDT | Business Process Variant Type Code | 0..1 |

Country Code can be the context category that defines the context country and may determine the valid code values for a specific country. BusinessProcessVariantTypeCode can be the context category that defines the context type of business process variants and may determine the valid code values for specific business process variants.

PaymentInstruction

A GDT PaymentInstruction is an instruction about how a payment could be carried out or which additional activities could be carried out within a payment. An example of GDT PaymentInstruction is:

<PaymentInstruction>

<ID>1</ID>

<Code listID="MT103" listAgencyID="17">PHOB</Code>

<CodeDescription>Telephone notification to beneficiary</CodeDescription>

<Note>+49 6227 747474</Note>

</PaymentInstruction>

Another example of GDT PaymentInstruction is:

<PaymentInstruction>

<ID>2</ID>

<Code listID="MT103" listAgencyID="17">HOLD</Code>

<CodeDescription>Payment only after identification</CodeDescription>

</PaymentInstruction>

In certain implementations, a GDT PaymentInstruction may have the following structure:

| GDT | | Cat. | Object Class | Property | Representation/ Association | Type | Type Name | Len. | Card. |
|---|---|---|---|---|---|---|---|---|---|
| Payment-Instruction | | | Payment Instruction | | Details | | | | |
| | ID | E | Payment Instruction | Identification | Identifier | CDT | Identifier | 1 | 1 |
| | Code | E | Payment Instruction | | Code | GDT | Payment-InstructionCode | | 1 |
| | Code-Description | E | Payment Instruction | Code Description | Text | GDT | Description | | 0..1 |
| | Note | E | Payment Instruction | | Note | GDT | Note | | 0..1 |

ID can be an Identifier for an instruction (i.e., a position number). Up to four instructions are possible for a payment order in payment transactions. These instructions are identified by the position number. In some countries, the code of the instruction can only be interpreted together with the position number.

Code can be the type of instruction (see GDT PaymentInstructionCode). CodeDescription can be a Description of the type of instruction. Note can be an additional note with textual information that can be interpreted by an accounting clerk dependent on the PaymentInstructionCode. Instructions can be entered with a payment order to note that the recipient wants to be called by his bank as soon as the payment arrives or to note that the payment can only be carried out if the recipient can identify himself.

PaymentInstructionCode

A GDT PaymentInstructionCode is the coded representation of an instruction for a payment. An example of GDT PaymentInstructionCode is:

<PaymentInstructionCode>PHON</PaymentInstruction-Code>

In certain implementations, a GDT PaymentInstructionCode may have the following structure:

| GDT | | Cat. | Object Class | Property | Representation/ Association | Type | Type Name | Len. | Card. | Remarks |
|---|---|---|---|---|---|---|---|---|---|---|
| Payment-Instruction-Code | | | Payment Instruction | | Code | CDT | Code | 1..10 | | restricted |
| | listID | A | Code List | Identification | Identifier | xsd | token | 1..60 | 0..1 | |
| | listAgencyID | A | Code List Agency | Identification | Identifier | xsd | token | 1..60 | 0..1 | |
| | listAgency-Scheme-AgencyID | A | Code List Agency | Scheme Agency | Identifier | Xsd | token | 1..3 | 0..1 | |

(T.T.) (JP)), 26 (i.e., Payment to an account (JP)), 27 (i.e., Payment in Japanese yen (JP)), 28 (i.e., Payment following notification (JP)), Similarly, the following codes may be used: 29 (i.e., Payment from foreign exchange account (JP)), 30 (i.e., AutoGiro with notification (NO)), 31 (i.e., AutoGiro without notification (NO)), 32 (i.e., Generate bank check (post office bank, NO)), 33 (i.e., Payment internal to post office bank (NO)), 34 (i.e., Payment via Nordpay (post office bank, NO)), 35 (i.e., Rapid money transfer (post office bank, NO)), 36 (i.e., Notification to beneficiary's bank on best method (SWIFT: "TELE")), 37 (i.e., Notification to beneficiary on best method (SWIFT: "TELB")), 38 (i.e., Notification to intermediary bank on best method (SWIFT: "TELI")), 39 (i.e., Confirmation of time and day of payment was made (SWIFT: "CONFIRM")), 40 (i.e., Telephone notification to beneficiary's bank (SWIFT: "PHON")), 41 (i.e., Telephone notification to beneficiary (SWIFT: "PHOI")), 42 (i.e., Telephone notification to intermediary bank (SWIFT: "PHOB")), 43 (i.e., Payment to beneficiary only (SWIFT: "BONL")), The following code lists can be assigned to PaymentInstructionCode: Standard code lists, Country-specific code lists and a proprietary code list.

The attributes are filled as follows to identify standard code lists: listAgencyID=Entry of the organization that the code list assigns in DE3055 and listAgencySchemeAgencyID is not applicable. Supported code lists can include: listAgencyID="17" for the code lists according to S.W.I.F.T. guide and listID=<Name of the SWIFT message format for this instruction code>such as "MT103." The attributes can be filled as follows to identify country-specific code lists: listAgencyID=ISO code of the country according to ISO 3166-1 and listAgencySchemeAgencyID="5" (entry for ISO in DE3055). The attributes can be filled as follows to identify the proprietary code list: listID="10061", listAgencyID="310" and listAgencySchemeAgencyID is not applicable.

The attributes may be assigned the following values: listID, listAgencyID and listAgencySchemeAgencyID. Some country-specific instruction codes can only be interpreted together with the position number of the instruction, see GDT PaymentInstruction. In this case, the country-specific code lists contain the position number and instruction code. PaymentInstructionCode is only used in the GDT PaymentInstruction.

The data type GDT PaymentInstructionCode may use the following codes: 1 (i.e., Letter (AT)), 2 (i.e., Letter/airmail (AT)), 3 (i.e., Printed matter (AT)), 4 (i.e., Printed matter/airmail (AT)), 5 (i.e., Certified mail (AT)), 6 (i.e., Certified mail/airmail (AT)), 7 (i.e., Normal (AT)), 8 (i.e., Standard normal (AT)), 9 (i.e., Collection (BR)), 10 (i.e., Due date is changed (BR)), 11 (i.e., Field 'Seu numero' changed (BR)), 12 (i.e., Field 'Uso da empresa' changed (BR)), 13 (i.e., Rebate (abatimento) (BR)), 14 (i.e., Rebate is canceled (BR)), 15 (i.e., Carried out by notary (BR)), 16 (i.e., Cancellation (BR)), 17 (i.e., Regular payment order (FI)), 18 (i.e., S.W.I.F.T. check (FI)), 19 (i.e., Transfer to an account at the same bank (FI)), 20 (i.e., Mail transfer (M.T.) (JP)), 21 (i.e., Hedged exchange rate (JP)), 22 (i.e., Current rate of exchange (JP)), 23 (i.e., Current rate of exchange: Payment in JPY equivalent (JP)), 24 (i.e., Current rate of exchange: Payment in PYCUR equivalent (JP)), 25 (i.e., Telegraphic transfer Furthermore, the following codes may be used: 44 (i.e., Payment by check only (SWIFT: "CHQB")), 45 (i.e., Payment only after identification (SWIFT: "HOLD")), 46 (i.e., Payment in settlement of a trade (SWIFT: "CORT")), 47 (i.e., Payment between companies from the same group (SWIFT: "INTC")), 48 (i.e., Immediate payment/express payment order (SWIFT: "URGP")), 49 (i.e., Payment by agreed instruction (SWIFT: "OTHR")), 50 (i.e., Payment using gross settlement system (SWIFT: "RTGS")), 51 (i.e., Payment using net settlement system (SWIFT: "NETS")), 52 (i.e., Same day value date at the beneficiary (SWIFT: "SDVA")), 53 (i.e., Following instructions are for beneficiary's bank (SWIFT: "ACC")), 54 (i.e., Following instructions are for recipient's correspondent bank (SWIFT: "REC")), 55 (i.e., Following instructions are for intermediary bank (SWIFT: "INT")), 56 (i.e., Instructing institution (SWIFT: "INS")) and 57 (i.e., Information for the beneficiary (SWIFT: "BNF")). An additional "Position" column describes the position number of the instruction in which a code can be used, see GDT PaymentInstruction.

PaymentMediumFormatCode

A GDT PaymentMediumFormatCode is the coded representation of the format of a payment medium. A payment medium is a document or an electronic message that is exchanged during payment transactions between the initiator of a payment and a credit institution or the payee. An example of GDT PaymentMediumFormatCode is:

<PaymentMediumFormatCode>44</PaymentMedium-FormatCode>

In certain implementations, a GDT PaymentMediumFormat-Code may have the following structure:

| GDT | | Cat. | Object Class | Property | Representation/ Association | Type | Type Name | Len. | Card. | Remarks |
|---|---|---|---|---|---|---|---|---|---|---|
| Payment-Medium-FormatCode | | | Payment-Medium-FormatCode | | Code | CDT | Code | 1..3 | | restricted |
| | ListID | A | CodeList | Identification | Identifier | xsd | token | | 0..1 | |
| | ListAgencyID | A | Code-ListAgency | Identification | Identifier | xsd | token | | 0..1 | |
| | ListVersionID | A | CodeList | Version | Identifier | xsd | token | | 0..1 | |
| | listAgency-SchemeID | A | Code-ListAgency | Scheme | Identifier | xsd | token | | 0..1 | |
| | listAgency-Scheme-AgencyID | A | Code-ListAgency | Scheme-Agency | Identifier | xsd | token | | 0..1 | |

An extendable code list can be assigned to the GDT PaymentMediumFormatCode, where customers can change this code list. For GDT PaymentMediumFormatCode the attributes may be assigned the following values: listID="10204", listAgencyID="310", listVersionID, listAgencySchemeID and listAgencySchemeAgencyID.

The PaymentMediumFormatCode corresponds to the data type FORMI_FPM in R/3. The code names are commonly used in the countries within payment transactions.

The GDT PaymentMediumFormatCode may use the following codes: CA 005 (i.e., Domestic payment transactions Canada), ZA ACB (i.e., Domestic payment transactions South Africa) US ACH (i.e., Domestic payment transactions USA), US ACH_CTX (i.e., Domestic payment transactions USA: CTX, US ACH_CCD_PPD (i.e., Domestic payment transactions USA: CCD/PPD), CN AUTOPLAN1 (i.e., Domestic payment transactions Hong Kong), AU BECS (i.e., Domestic payment transactions Australia: without totals record), AU BECS_B (i.e., Domestic payment transactions Australia: with totals record), BE BEPDTA (i.e., Foreign payment transactions Belgium), BE DOM80 (i.e., Automatic debit procedure Belgium: Debit memos), BE PIBDTA (i.e., Domestic payment transactions Belgium), BOE (i.e., Bill of exchange (document-based)), BE BTL91 (i.e., Foreign payment transactions Belgium), CHECK (i.e., Check (document-based).)

Furthermore, the following codes may be used: US CHECK_FG_BULK (i.e., Domestic payment transactions check USA: Mass check—federal government), CHECK_PAYSLIP (i.e., Check and pay slip), CH DEBIT_DIRECT (i.e., Automatic debit procedure Switzerland: Direct debit), CH DTA (i.e., Payment transactions Switzerland: DME), CH DTA_CML (i.e., Payment transactions Switzerland: DME CML), CH EZAG (i.e., Domestic payment transactions Switzerland: Electronic payment order (EZAG)), CH LSV (i.e., Automatic debit procedure Switzerland: debit memos LSV), CH LSV_PLUS (i.e., Automatic debit procedure Switzerland: debit memos LSV PLUS), NL CLIEOP03 (i.e., Domestic payment transactions Netherlands: CLIEOP03), ES CSB19 (i.e., Payment transactions Spain: SCB19), CZ GEMINI (i.e., Domestic payment transactions Czech Republic: GEMINI), CZ GEMINI (i.e., Foreign payment transactions Czech Republic: GEMINI), DK PAYMUL (i.e., Domestic payment transactions Denmark), DE DTAUS0 (i.e., Domestic payment transactions Germany: DTAUS0), DE DTAZV (i.e., Foreign payment transactions Germany: DTAZV), US ECS_FG (i.e., Domestic payment transactions USA: SEZ—federal government.)

Similarly, the following codes may be used: BR FEBRABAN_P (i.e., Domestic payment transactions Brazil), FI AUTOGIRO (i.e., Automatic debit procedure Finland: Autogiro (debit memos)), FI LUM2 (i.e., Foreign payment transactions Finland: LUM2), FR ETEBAC_VRT_DOM (i.e., Domestic payment transactions France), FR ETEBAC_VRT_ETR (i.e., Foreign payment transactions France), UK BACS (i.e., Payment transactions/automatic debit procedure Great Britain: BACS), HU GIRO (i.e., Domestic payment transactions Hungary), IE AIB (i.e., Payment transactions Ireland: AIB), IE BOI (i.e., Payment transactions Ireland: BOI), FI LM03 (i.e., Domestic payment transactions Finland: LM03), LU VIR 2000 (i.e., Domestic payment transactions Luxembourg: VIR2000), INTERNATIONAL MT 100 (i.e., International: S.W.I.F.T. MT 100, customer single bank transfer), INTERNATIONAL MT 101 (i.e., International: S.W.I.F.T. MT 101, customer collective bank transfer), INTERNATIONAL MT 103 (i.e., International: S.W.I.F.T. MT 103, customer single bank transfer), INTERNATIONAL MT 104 (i.e., International: S.W.I.F.T. MT 104, automatic debit), INTERNATIONAL MT 200 (i.e., International: S.W.I.F.T. MT 200, balance carry forward of own bank accounts), INTERNATIONAL MT 202 (i.e., International: S.W.I.F.T. MT 202, general bank-to-bank transfers), INTERNATIONAL MT 210 (i.e., International: S.W.I.F.T. MT 210, bank advice note.)

In addition to the above, the following codes may be used: NO PAYMUL (i.e., Payment transactions Norway: Multiple payment order PAYMUL), NZ MTS (i.e., Domestic payment transactions: MTS), PT PS2 (i.e., Domestic payment transactions Portugal: PS2), IT SETIF (i.e., Payment transactions Italy: SETIF), SE AUTOGIRO (i.e., Automatic debit procedure Sweden: AUTOGIRO), SE BANKGIROT (i.e., Domestic payment transactions Sweden: BANKGIROT), SE POSTGIROT (i.e., Domestic payment transactions Sweden: POSTGIROT), SE UTLI/SISU_PAYMENTS (i.e., Foreign payment transactions Sweden), US SPS_FG (i.e., Payment transactions USA: SPS_FG), FI RECURRENT PAYMENTS (i.e., Payment transactions Finland: TS format for recurring payments), AT V3 (i.e., Foreign payment transactions Austria), DE DTAUS ZZV (i.e., Payment transactions Germany: Payment instructions for clearing), COLL PAYORDREQ (i.e., Collective Payment Order Request), INT DEBIT_XML (i.e., International: S.W.I.F.T. XML, Debit Initiation), INT CREDIT_XML (i.e., International: S.W.I.F.T. XML, Credit Initiation) and BANKCHECK (i.e., Bank check.)

PaymentMediumFormatSpecificFieldValue

A GDT PaymentMediumFormatSpecificFieldValue is the value of a payment medium format-specific field that is not contained in the scope of the fields provided by default for payment mediums. An example of GDT PaymentMediumFormatSpecificFieldValue is:

<PaymentMediumFormatSpecificFieldValue>

<Code>

SPRI

</Code>

</PaymentMediumFormatSpecificFieldValue>

In certain implementations, a GDT PaymentMediumFormatSpecificFieldValue may have the following structure:

| GDT | | Cat. | Object Class | Property | Representation/Association | Type | Type Name | Card. |
|---|---|---|---|---|---|---|---|---|
| PaymentMediumFormatSpecificFieldValue | | | Payment Medium Format Specific Field Value | | Details | | | |
| | Code | E | Payment Medium Format Specific Field Value | Code | Code | GDT | PaymentMediumFormatSpecificFieldValueCode | 0..1 |
| | ID | E | Payment Medium Format Specific Field Value | Identification | Identifier | GDT | PaymentMediumFormatSpecificFieldValueID | 0..1 |
| | Text | E | Payment Medium Format Specific Field Value | Text | Text | GDT | Text | 0..1 |
| | IntegerValue | E | Payment Medium Format Specific Field Value | Integer Value | Value | GDT | Integer Value | 0..1 |
| | Date | E | Payment Medium Format Specific Field Value | Date | Date | GDT | Date | 0..1 |
| | Time | E | Payment Medium Format Specific Field Value | Time | Time | GDT | Time | 0..1 |
| | Indicator | E | Payment Medium Format Specific Field Value | Indicator | Indicator | GDT | Indicator | 0..1 |
| | Amount | E | Payment Medium Format Specific Field Value | Amount | Amount | GDT | Amount | 0..1 |

Code can be Entry of a coded representation of an issue. ID can be Entry of an identification of an object. Text can be Text entry. IntegerValue can be Entry of an integral value. Date can be Entry of a calendar day. Time can be Entry of an exact time in seconds. Indicator can be Entry of a binary logical value. Amount can be Amount entry.

One element from the quantity Code, ID, Text, IntegerValue, Date, Time, Indicator, or Amount may be entered. PaymentMediumFormatSpecificFieldValue can be used together with PaymentMediumFormatSpecificFieldID (described below) to make one or more special entries necessary for creating a valid payment medium. This fills fields in the payment medium that are used depending on the respective data medium format and that have different semantics. In certain implementations, this implies that they cannot be standardized due to the number of different semantics.

PaymentMediumFormatSpecificFieldValueCode

A GDT PaymentMediumFormatSpecificFieldValueCode is the coded representation of any issue as a value of a payment medium format-specific field. An example of GDT PaymentMediumFormatSpecificFieldValueCode is:

<PaymentMediumFormatSpecificFieldValueCode>
SPRI
</PaymentMediumFormatSpecificFieldValueCode>

In certain implementations, a PaymentMediumFormatSpecificFieldValueCode may have the following structure:

| GDT | Object Class | Representation/Association | Type | Type Name | Len. | Remarks |
|---|---|---|---|---|---|---|
| PaymentMediumFormatSpecificFieldValueCode | Payment Medium Format Specific Field Value | Code | CDT | Code | 1..30 | restricted |

No code list is assigned to the PaymentMediumFormatSpecificFieldValueCode (see "Use"). GDT PaymentMediumFormatSpecificFieldValueCode may only be used in the GDT PaymentMediumFormatSpecificFieldValue.

GDT PaymentMediumFormatSpecificFieldValueCode is used to represent a coded issue that is used according to payment medium format specification to create a valid payment medium. However, in certain implementations, it is not contained in the default elements of the business object BankPaymentOrder.

PaymentMediumFormatSpecificFieldValueID

A GDT PaymentMediumFormatSpecificFieldValueID is a unique identifier for any issue as a value of a payment medium format-specific field. An example of PaymentMediumFormatSpecificFieldValueID is:

<PaymentMediumFormatSpecificFieldValueID>
COBADE01
</PaymentMediumFormatSpecificFieldValueID>

In certain implementations, a GDT PaymentMediumFormatSpecificFieldValueID may have the following structure:

| GDT | Object Class | Property | Representation/Association | Type | Type Name | Len. | Remarks |
|---|---|---|---|---|---|---|---|
| Payment-Medium-FormatSpecificField-ValueID | Payment Medium Format Specific Field Value | Identification | Identifier | CDT | Identifier | 1..35 | restricted |

GDT PaymentMediumFormatSpecificFieldValueID may only be used in the GDT PaymentMediumFormatSpecificFieldValue. PaymentMediumFormatSpecificFieldValueID is used to identify an issue that is used according to payment medium formation specification to create a valid payment medium. However, in certain implementations, it is not contained in the default elements of the business object BankPaymentOrder.

PaymentProcedureCode

A GDT PaymentProcedureCode is the coded representation of the payment procedure. A payment procedure is a technically oriented characteristic of a payment transaction (which is in turn a specialization of the payment form, see PaymentFormCode). An example of a GDT PaymentProcedureCode is:

<PaymentProcedureCode>1</PaymentProcedureCode>

In certain implementations, a GDT PaymentProcedureCode may have the following structure:

| GDT | Object Class | Property | Representation/Association | Type | Type Name | Len. | Remarks |
|---|---|---|---|---|---|---|---|
| Payment-Procedure-Code | Payment | Procedure | Code | CDT | Code | 1..5 | restricted |

The PaymentProcedureCode is a code list that can be extended by the customers with the implicitly given attributes listID="10062", listAgencyID="310" and listVersionID="tbd".

The PaymentProcedureCode can be used, for example, to inform a house bank about the specific formats and forms for payments. The GDT PaymentProcedureCode may use the following codes: Domestic bank transfer (i.e., Payment with bank transfer from one back account to another in the same country), Foreign bank transfer (i.e., Payment with bank transfer from one back account to another in different countries), EU internal transfer (i.e., Payment with bank transfer from one back account to another in the Euro zone), Bank check (i.e., Payment with check which is printed and sent by the bank. This is not to be confused with a check confirmed by the bank), Bank check for foreign payment (i.e., Foreign payment with check which is printed and sent by the bank. This is not to be confused with a check confirmed by the bank), Check printing (i.e., Payment with check where you do the printing yourself. The bank does not print the check here), Bank direct debit; Debit memo in which the payer's bank is authorized to carry out a direct debit for the paye. Automatic debit (i.e., Debit memo in which the payee has an automatic debit authorization of the payer).

PaymentReceivablesPayablesGroupID

A PaymentReceivablesPayablesGroupID is an identifier for a group of receivables or payables that are related to each other for the purpose of common payment receivables and payables that are related to each other are, for example, invoices and related down payments. An example of GDT PaymentReceivablesPayablesGroupID is:

<PaymentReceivablesPayablesGroupID>MRZ-14a</PaymentReceivablesPayablesGroupID>

In certain implementations, a GDT PaymentReceivablesPayablesGroupID may have the following structure:

| GDT | | Cat. | Object Class | Property | Representation/Association | Type | Type Name | Len. | Card. |
|---|---|---|---|---|---|---|---|---|---|
| PaymentReceivables-Payables-Payment-GroupID | | | Payment_Receivables Payables Group | Identification | Identifier | CDT | Identifier | 1..20 | |
| | scheme-AgencyID | A | Identification Scheme Agency | Identification | Identifier | xsd | token | 1..60 | 0..1 |

The attributes of GDT PaymentReceivablesPayablesGroupID can be filled as follows: schemeID="PaymentReceivablesPayablesGroupID." The attributes may be assigned the following values: schemeAgencyID="Business System." PaymentReceivablesPayablesGroupID is used to observe receivables or payables together. Receivables or payables with the same PaymentReceivablesPayablesGroupID then form a group for the purpose of common payment (this means, at the end one payment stands for such a group). Invoices and related down payments, for example, can be grouped so that the remaining amount can be paid by a single payment.

PaymentReferenceID

A GDT PaymentReferenceID is an identifier for a payment reference. Such payment references are currently only common in Switzerland (ISR reference) and in Scandinavia. An example of GDT PaymentReferenceID is:
<PaymentReferenceID>MRZ-14a</PaymentReferenceID>
In certain implementations, a GDT PaymentReferenceID may have the following structure:

| GDT | Object Class | Property | Representation/Association | Type | Type Name | Len. | Card. | Remarks |
|---|---|---|---|---|---|---|---|---|
| Payment-ReferenceID | Payment-Reference | Identification | Identifier | CDT | Identifier | 1..30 | | restricted |

A PaymentReferenceID can be assigned by a bank or a party to uniquely identify a transaction in the payment transaction. It is only unique in the context of the assigning bank or party and is only interpreted by them. The bank or party that has assigned the reference may be known in the context in which it is used. PaymentReferenceID is used to transfer a unique identification of the business transaction assigned by the bank in a bank statement that has resulted in revenue in the account (such as, a payment or a debit by account maintenance charges).

The PaymentReferenceID can be used to identify the business transaction in case of queries to the bank. PaymentReferenceID can have the following Qualifier roles: SwissPaymentReferenceID (i.e., Identifier for a payment reference common in Switzerland (ISR reference)), ScandinavianPaymentReferenceID (i.e., Identifier for a payment reference common in Scandinavia. There may not be a business document (BusinessTransactionDocument) on the business transaction which is referred to by a PaymentReferenceID).

PaymentRegisterGroupingCriterionCode

A GDT PaymentRegisterGroupingCriterionCode is the coded representation of a criterion for grouping payments. An example of GDT PaymentRegisterGroupingCriterionCode is:
<PaymentRegisterGroupingCriterionCode>1</PaymentRegisterGroupingCriterionCode>
In certain implementations, a GDT PaymentRegisterGroupingCriterionCode may have the following structure:

| GDT | | Cat. | Object Class | Property | Representation/Association | Type | Type Name | Len. | Card. | Remarks |
|---|---|---|---|---|---|---|---|---|---|---|
| Payment-Register-Grouping-Criterion-Code | | | Payment-Register | Grouping-Criterion | Code | CDT | Code | 1..2 | | restricted |
| | listAgencyID | A | Code List Agency | Identification | Identifier | xsd | token | | 0..1 | |
| | listVersionID | A | Code List | Version | Identifier | xsd | token | | 0..1 | |
| | listAgency-SchemeID | A | Code List Agency | Scheme | Identifier | xsd | token | | 0..1 | |
| | listAgency-SchemeAgencyID | A | Code List Agency | Scheme Agency | Identifier | xsd | token | | 0..1 | |

An extendable code list can be assigned to the PaymentRegisterGroupingCriterionCode. Customers can change this code list: listID="10251". Attributes can be given detailed descriptions: listAgencyID="310", listVersionID=ID of the code user (ID from DE 3055), listAgencySchemeID and listAgencySchemeAgencyID.

A PaymentRegisterGroupingCriterionCode can be used to define further grouping criteria in addition to the process-specific grouping criteria for payments. Only existing attributes of the business object PaymentRegister can be used. Process-specific grouping criteria are grouping criteria that may be considered within a business process for a grouping. Examples of process-specific grouping criteria for a payment are house bank account and payment procedure.

During the grouping of payments, payments that match in all grouping criteria are summarized. There can be a default PaymentRegisterGroupingCriterionCode in a company. An alternative PaymentRegisterGroupingCriterionCode can be entered for individual business partners (for example, a grouping by business origin of the payment at specific customers). The data type GDT PaymentRegisterGroupingCriterionCode may use the following code: 1 (i.e., ByOrigin.)

PaymentRegisterItemTypeCode

A GDT PaymentRegisterItemTypeCode is the coded representation of the type of a payment register item. A payment register item can be a payment from a base payment business transaction (for example, bank transfer or cash payment). An example of GDT PaymentRegisterItemTypeCode is:
<PaymentRegisterItemTypeCode>1</PaymentRegisterItemTypeCode>
In certain implementations, a GDT PaymentRegisterItemTypeCode may have the following structure:

| GDT | Object Class | Property | Representation/Association | Type | Type Name | Len. | Remarks |
|---|---|---|---|---|---|---|---|
| Payment-Register-ItemType-Code | Payment Register Item | Type | Code | CDT | Code | 1..2 | restricted |

One fixed code list can be assigned to the PaymentRegisterItemTypeCode. The attributes are as follows: listID="10217" and listAgencyID="310." The attributes may be assigned the following values: 1 (i.e., RequestPaymentRegisterItem), 2 (i.e., OrderPaymentRegisterItem), 3 (i.e., ConfirmationPaymentRegisterItem), 4 (i.e., AdvicePaymentRegisterItem), 5 (i.e., IncomingCheckPaymentRegisterItem).

PaymentTransactionReferenceID

A GDT PaymentTransactionReferenceID is a reference number for a transaction in payment transactions. An example of GDT PaymentTransactionReferenceID is:

<PaymentTransactionReferenceID>0000001405</PaymentTransactionReferenceID>

In certain implementations, a GDT PaymentTransactionReferenceID may have the following structure:

| GDT | Object Class | Property | Representation/Association | Type | Type Name | Len. |
|---|---|---|---|---|---|---|
| Payment-Transac-tionRefer-enceID | Payment Transac-tion | Reference | Identifier | CDT | Identifier | 1..35 |

GDT PaymentTransactionReferenceID is assigned by a bank or a party to uniquely identify a transaction in payment transactions. It can be only unique in the context of the bank or party and can also interpreted by them. For this reason and others, in certain implementations, the schemeID and schemeAgencyID attributes are not required.

The bank or party that has assigned the reference may be known in the context. PaymentTransactionReferenceID is used in a bank statement, for example, to convey a unique identification of the business transaction that was assigned by the bank. This has led to turnover on the account (for example, a payment or a debit by account maintenance charges). The PaymentTransactionReferenceID can be used to identify the business transaction in case of queries at the bank. There does not have to be a business document (BusinessTransactionDocument) for the business transaction which is referenced with the PaymentTransactionReferenceID.

PaymentTransactionTypeCode

A GDT PaymentTransactionTypeCode is the coded representation of the type of a payment transaction. An example of GDT PaymentTransactionTypeCode is:

<PaymentTransactionTypeCode listAgencyID="310">1</PaymentTransactionTypeCode>

In certain implementations, a GDT PaymentTransactionTypeCode may have the following structure:

| GDT | | Cat. | Object Class | Property | Representation/Association | Type | Type Name | Len. | Card. | Remarks |
|---|---|---|---|---|---|---|---|---|---|---|
| Payment-Transac-tionType-Code | | | Payment Transac-tion | Type | Code | CDT | Code | 1..4 | | restricted |
| | listAgencyID | A | Code List Agency | Identification | Identifier | Xsd | Token | 1..60 | optional | |
| | listAgency-SchemeAgencyID | A | Code List Agency | Scheme Agency-Identification | Identifier | Xsd | Token | 1..3 | optional | |

The following code lists are permitted for GDT PaymentTransactionTypeCode: Standard code lists, bank-specific code lists and proprietary code list. The attributes are filled as follows to identify standard code lists: listAgencyID=Entry of the organization that the code list assigns in DE3055. The code lists are supported can include: listAgencyID="17", listAgencyID="131" (e.g., for the code list of the central credit committee of the Bundesverband Deutscher Banken) (Association of German Banks), and listAgencyID="??" (e.g., for the code list of the Bankers Association of America), listAgencySchemeAgencyID is not applicable. The attributes are filled as follows to identify bank-specific code lists: listAgencyID=SWIFT Bank Identification Code (BIC) of the bank (see GDT BankStandardID) and listAgencySchemeAgencyID="17" (entry for S.W.I.F.T. in DE3055).

The attributes are filled as follows to identify the proprietary code list: listID="10042" (for documentation only), listAgencyID="310" (entry in DE3055) and listAgencySchemeAgencyID can not be applicable. The attributes may be assigned the following descriptive values: listAgencyID and listAgencySchemeAgencyID. The PaymentTransactionTypeCode can be used to specify the type of turnover for a bank statement item in a bank statement without going into (bank and country-specific) details. To give a user as much detailed information as possible about a bank statement, the original bank-specific codes for the type of a transaction are transferred. Information that could be useful for the user to understand the bank statement would possibly be lost when mapping to the code list.

The following values can be assigned to the Code List 1 (i.e., Bank transfer order), 2 (i.e., Bank transfer credit), 3 (i.e., Debit memo (direct debit)), 4 (i.e., Debit memo deposit), 5 (i.e., Cashed checks), 6 (i.e., Check encashment), 7 (i.e., Bill of exchange collection), 8 (i.e., Payment by bill of exchange), 9 (i.e., Card payment), 10 (i.e., Cash withdrawal), 11 (i.e., Cash deposit), 12 (i.e., Lockbox), 91 (i.e., Credit interest), 92 (i.e., Debit interest), 93 (i.e., Charges), 998 (i.e., Other incoming payments) and 999 (i.e., Other outgoing payments).

Percent

Figures 1, 100:
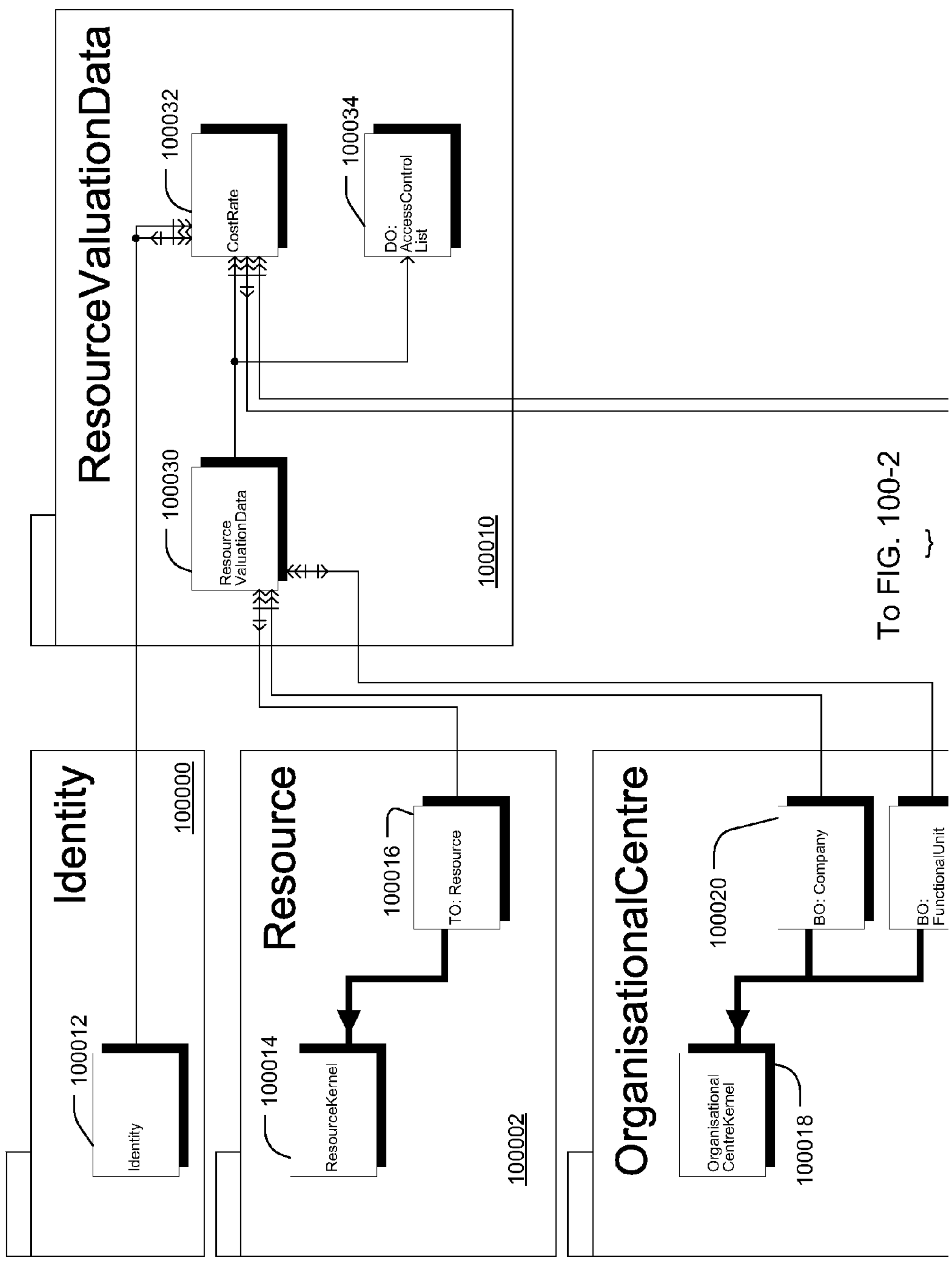
Figures 2, 100:
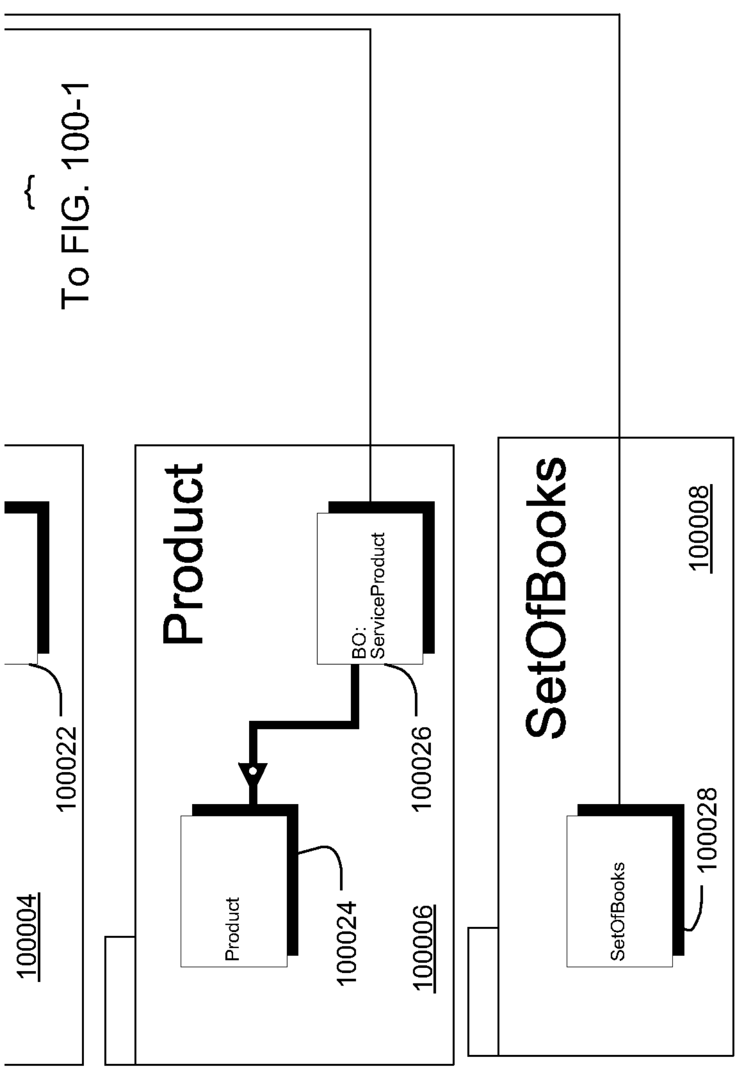

A GDT Percent is a number that relates to the comparison FIG. 100. An example of GDT Percent is:

<ProductTaxPercent>16</ProductTaxPercent>

In certain implementations, a GDT Percent may have the following structure:

| GDT | Object Class | Representation/Association | Type | Type Name | Len. |
|---|---|---|---|---|---|
| Percent | Percent | Type | xsd | decimal | 10.6 |

GDT Percent is given as a percent value. Positive and negative values can be used by using the built-in data type "xsd:decimal". Negative values may be prefixed with a negative sign ("−"). However, positive values do not require a positive sign "+" prefix.

In certain implementations, no measurements or currencies are specified in Percent. Percent can be used to represent a percentage that indicates how many hundredths of a basic value are to be calculated. The result of the calculation is the proportion in percent of, i.e., amounts, values, rates, discounts, and taxes. Further examples for the application of Percent are proportion and comparison information, such as dividends and earnings, or a percentage comparison of target and actual business results, or trade or amount margins. Information on measurements or currencies may be expressed in the basic value. An example of this expression is:

```
<Total>
<Amount currencyCode="EUR">777.95</Amount>
<ProductTaxPercent>16</ProductTaxPercent>
</Total>
```

In the previous example, the value added tax rate of 16 percent is specified for the basic value of 777.95 EUR.

Values assigned to the List of Qualifiers may include: AnnuityRatePercent, AssignmentPercent, CapPercent, CompletionPercent, DefaultPercent, DisagioPercent, EffectiveYieldPercent, EquityParticipationPercent, FixedInterestRatePercent, Floor Percent, InitialRatePercent, InstallmentRatePercent, LimitPercent, MarginPercent, NonDeductiblePercent, OverduePercent, OverPercent, PersonDisabilityPercent, ProbabilityPercent, RangeSpreadPercent, ScrapPercent, TaxPercent, ThresholdPercent, TransferredPercent and UnderPercent.

PercentInterval

A GDT PercentInterval is an interval of percents defined by a lower and an upper boundary. An example of GDT PercentInterval is:

```
<PercentInterval>
<IntervalBoundaryTypeCode>5</IntervalBoundaryTypeCode>
<LowerBoundaryPercent>10</LowerBoundaryPercent>
<UpperBoundaryPercent>20</UpperBoundaryPercent>
</PercentInterval>
```

In certain implementations, a GDT PercentInterval may have the following structure:

| GDT | | Cat. | Object Class | Property Qualifier | Property | Representation/Association | Type | Type Name | Card. |
|---|---|---|---|---|---|---|---|---|---|
| PercentInterval | | | Percent Interval | | | Details | | | |
| | IntervalBoundaryTypeCode | E | Percent Interval | | Interval Boundary Type | Code | GDT | IntervalBoundaryTypeCode | 1 |
| | LowerBoundaryPercent | E | Percent Interval | Lower | Boundary | Percent | CDT | Percent | 0..1 |
| | UpperBoundaryPercent | E | Percent Interval | Upper | Boundary | Percent | CDT | Percent | 0..1 |

IntervalBoundaryTypeCode is a coded representation of an interval boundary type. LowerBoundaryPercent is the lower boundary of the percent interval. It may be used also for percent intervals that contain a single value. UpperBoundaryPercent is the upper boundary of the percent interval. UpperBoundaryPercent may be greater than LowerBoundaryPercent. PercentInterval can be used to restrict the output of a query operation: For all output items the values of the attribute linked to the PercentInterval instance provided as query input are located in the specified percent interval.

PeriodDurationDayRecurrence

A GDT PeriodDurationDayRecurrence is a representation for the repeated occurrence of an event within a time period whereby the recurrence takes place at the end of a determined duration period or at a time specified in relation to the beginning of a period. The event is nonrecurring and excludes recurring time periods. The element "Period" describes the time period, "InteriorDuration" describes the time frames (duration period) within this time period, and, where applicable, "OffsetDuration" and "MonthDayValue" describe when the event is situated in time in relation to the beginning of the period. In certain implementations, the GDT PeriodDurationDayRecurrence is based on the GDT Recurrence_Template.

Example 1: "Weekly recurrences between Apr. 12, 2004 and Jun. 6, 2004"

Example 2: "Monthly recurrences at the end of each month between Feb. 15, 2005 and Feb. 14, 2010", that is on Feb. 28, 2005, Mar. 31, 2005, and Apr. 30, 2005, and so on.

EXAMPLE 1

```
<PeriodDurationDayRecurrence>
<Period>
<StartDate>2004-04-12</StartDate>
<EndDate>2004-04-06</EndDate>
</Period>
<InteriorDuration>P7T</InteriorDuration>
</PeriodDurationDayRecurrence>
```

Weekly recurrences between Apr. 12, 2004 and Jun. 6, 2004

EXAMPLE 2

```
<PeriodDurationDayRecurrence>
<Period>
<StartDate>2005-02-15</StartDate>
<EndDate>2010-02-14</EndDate>
</Period>
<InteriorDuration>P1M</InteriorDuration>
<MonthDayValue>31</MonthDayValue>
<PeriodDurationDayRecurrence>
```

In the above example, Monthly recurrences at the end of each month between Feb. 15, 2005 and Feb. 14, 2010", that is on Feb. 28, 2005, Mar. 31, 2005, and Apr. 30, 2005, and so on.

EXAMPLE 3

```
<PeriodDurationDayRecurrence>
<Period>
<StartDate>2005-01-01</StartDate>
<EndDate>2009-12-31</EndDate>
</Period>
<InteriorDuration>P1M<InteriorDuration>
<OffsetDuration>P2M</OffsetDuration>
<MonthDayValue>31</MonthDayValue>
</PeriodDurationDayRecurrence>
```

Event first occurs on: Mar. 31, 2005. The following events take place monthly on: Apr. 30, 2005, May 31, 2005, and so on.

In certain implementations, a GDT PeriodDurationDayRecurrence may have the following structure:

| GDT | | Cat. | Object Class | Property | Representation/Association | Type | Type Name | Card. |
|---|---|---|---|---|---|---|---|---|
| PeriodDurationDay-Recurrence | | | Period Duration Day Recurrence | | Details | | | |
| | Period | E | Period Duration Day Recurrence | Period | DatePeriod | GDT | DatePeriod | 1 |
| | Interior-Duration | E | Period Duration Day Recurrence | Interior | Duration | GDT | Duration | 1 |
| | Offset-Duration | E | Period Duration Day Recurrence | Offset | Duration | GDT | Duration | 0..1 |
| | Month-DayValue | E | Period Duration Day Recurrence | Month Day | Value | GDT | IntegerValue | 0..1 |

Period can Indicate the time period within which recurrences take place. InteriorDuration can Indicate the time frame after which, or in relation to the beginning of which, recurrences take place. OffsetDuration can Indicate the time frame in which an event takes place after a specified period has begun. MonthDayValue can Indicate the calendar day within a month on which the event takes place and contains the following attributes: Contains the element MonthDayValue; value 31 indicates the end of the month and The value range for the OffsetDuration is limited to the period of time defined in the GDT Duration. You cannot use time ranges. Combinatorics for OffsetDuration and MonthDayValue may have the following attributes: Neither OffsetDuration nor MonthDayValue is used (The first event occurs at the end of a period (given by element InteriorDuration)), Only OffsetDuration is used (The event takes place a certain length of time after the start of a period and this time frame is given by element OffsetDuration), Only MonthDayValue is used (A calendar month is fixed by the beginning of an InteriorDuration. The event takes place on the calendar day of the fixed month that is given by element MonthDayValue) and OffsetDuration and MonthDayValue are used (A calendar month is fixed by the beginning of an InteriorDuration plus the element OffsetDuration. The event takes place on the calendar day of the fixed month that is given by element MonthDayValue). A List of Qualifiers can have the following values: DeclarationPeriodDurationDayRecurrence, PaymentPeriodDurationDayRecurrence.

PeriodRoleCode

A GDT PeriodRoleCode is a coded representation of the business semantic of a period. An example of GDT PeriodRoleCode is:

<PeriodRoleCode>1</PeriodRoleCode>

In certain implementations, a GDT PeriodRoleCode may have the following structure:

An extensible GDT PeriodRoleCode code list can be assigned to the code. A customer can replace this code list with his own one, example being listID="10398". Attributes to be assigned include: listAgencyID, listVersionID, listAgencySchemeID and listAgencySchemeAgencyID. PeriodRoleCode may be used to specify the semantic of a period during runtime. Periods can be typed with one of the following types: DatePeriod, TimePeriod, GLOBAL_DateTimePeriod, LOCAL_DateTimePeriod, TIMEZONEINDEPENDENT_DateTimePeriod, LOCALOFFSET_DateTimePeriod and TimePointPeriod—and their specializations concerning half open intervals etc.

PeriodRoleCodes can cover all the business semantics of periods. As a result, the codes do also include all qualifiers of the GDTs listed in the previous section. The PeriodRoleCode may not include the type name; a restriction to a subset of the available periods types is not possible. Identical Qualifiers and PeriodRoleCodes may have the same business semantic.

Values that can be assigned include the following: 1 (i.e., AdvertisementPeriod), 2 (i.e., ArrivalPeriod), 3 (i.e., AvailabilityPeriod), 4 (i.e., BasePeriod), 5 (i.e., CarrierHandoverPeriod), 6 (i.e., ConfirmationPeriod), 7 (i.e., CopyPeriod), 8 (i.e., DeliveryPeriod), 9 (i.e., ExecutionPeriod), 10 (i.e., ForecastPeriod), 11 (i.e., IssuePeriod), 12 (i.e., LeavePeriod), 13 (i.e., LoadingPeriod).

Furthermore, the following codes may be used: 14 (i.e., OrderingPeriod), 15 (i.e., PackingPeriod), 16 (i.e., PickingPeriod), 17 (i.e., PickupPeriod), 18 (i.e., PlannedPeriod), 19 (i.e., PlanningPeriod), 20 (i.e., PositioningPeriod), 22 (i.e., ProductionAuthorisationPeriod), 23 (i.e., ProductionPeriod), 24 (i.e., PurchasingAuthorisationPeriod), 25 (i.e., Putaway), 26 (i.e., ReceiptPeriod), 27 (i.e., ReleasedPeriod), 28 (i.e., ReportingPeriod), 29 (i.e., ShippingPeriod), 30 (i.e., TotalPeriod), 31 (i.e., TransportPlanningPeriod), 32 (i.e., UnloadingPeriod), 33 (i.e., UnpackingPeriod), 34 (i.e., ValidityP-

| GDT | | Cat. | Object Class | Property | Representation/Association | Type | Type Name | Len. | Card. | Remarks |
|---|---|---|---|---|---|---|---|---|---|---|
| PeriodRoleCode | | | | Period Role | Code | CDT | Code | 1..3 | | restricted |
| | listAgencyID | A | Code List Agency | Identification | Identifier | xsd | token | | 0..1 | |
| | listVersionID | A | Code List | Version | Identifier | xsd | token | | 0..1 | |
| | listAgency-SchemeID | A | Code List Agency | Scheme | Identifier | xsd | token | | 0..1 | |
| | listAgency-SchemeAgencyID | A | Code List Agency | Scheme Agency | Identifier | xsd | token | | 0..1 | |

eriod), 35 (i.e., YardArrivalPeriod), 36 (i.e., YardDeparturePeriod), 37 (i.e., ActivePeriod), 38 (i.e., AssignmentPeriod), 39 (i.e., BreakdownPeriod), 40 (i.e., GlobalPeriod), 41 (i.e., InactivePeriod), 42 (i.e., ProcessingPeriod), 43 (i.e., RequestedFulfillmentPeriod), 44 (i.e., RequiredPeriod), 45 (i.e., ScheduledTimePointPeriod), 46 (i.e., AggregationPeriod) and 47 (i.e., EvaluationPeriod.)

PersonDisabilityCertificateID

A GDT PersonDisabilityCertificateID is a unique identifier for a certificate describing a person's disability. The GDT PersonDisabilityCertificate ID is assigned by the authority that created the certificate describing a person's disability. The ID is also called the reference number. An example of GDT PersonDisabilityCertificateID is:

<PersonDisabilityCertificateID>20003000xyz__ 01012005</PersonDisabilityCertificateID>

In certain implementations, a GDT PersonDisabilityCertificateID may have the following structure:

| GDT | Object Class | Property | Representation/Association | Type | Type Name | Len. | Remarks |
|---|---|---|---|---|---|---|---|
| Person-DisabilityCertificateID | Person Disability Certificate | Identification | Identifier | CDT | Identifier | 1..20 | restricted |

The ID may be unique within the used context. Therefore, no other attributes may be necessary. This data type can be used in Personnel Administration to identify the certificate submitted by an employee describing the employee's disability.

PersonMilitaryStatusCode

A GDT PersonMilitaryStatusCode is a coded representation of the military status of a person. An example of GDT PersonMilitaryStatusCode is:

<PersonMilitaryStatusCode>3</PersonMilitaryStatusCode>

In certain implementations, a GDT PersonMilitaryStatusCode may have the following structure:

| GDT | | Cat. | Object Class | Property | Representation/Association | Type | Type Name | Len. | Card. | Remarks |
|---|---|---|---|---|---|---|---|---|---|---|
| Person-Military-Status-Code | | | Person | Military Status | Code | CDT | Code | 1..2 | | restricted |
| | listID | A | Code List | Identification | Identifier | xsd | token | | 0..1 | |
| | listAgencyID | A | Code List Agency | Identification | Identifier | xsd | token | | 0..1 | |
| | listVersionID | A | Code List | Version | Identifier | xsd | token | | 0..1 | |
| | listAgency-SchemeID | A | Code List Agency | Scheme | Identifier | xsd | token | | 0..1 | |
| | listAgency-SchemeAgencyID | A | Code List Agency | Scheme Agency | Identifier | xsd | token | | 0..1 | |

Several static, country-specific code lists, which are different at runtime, are assigned to the code. In the United States, certain companies need to provide Military status for leave processing (paid/unpaid) and reporting purposes. The GDT PersonMilitaryStatusCode for US may be assigned the following values: listID=Assigned by the Coaching Team, listAgencyID=310, listVersionID—Version of the relevant code list. The data type GDT PersonMilitaryStatusCode may use the following codes: 1 (i.e., Inactive), 2(i.e., Inactive reserve), 3 (i.e., Inactive veteran), 4 (i.e., Reserve veteran), 5 (i.e., Vietnam veteran.)

The GDT PersonMilitaryStatusCodeContextElements defines a dependency or an environment in which the PersonMilitaryStatusCode appears. The environment is described by context categories. With the context categories in PersonMilitaryStatusCodeContextElements the valid portion of code values of PersonMilitaryStatusCode is restricted according to an environment during use.

In certain implementations, a GDT PersonMilitaryStatusCodeContextElements may have the following structure:

| GDT | | Cat. | Object Class | Property | Representation/Association | Type | Type Name | Card. |
|---|---|---|---|---|---|---|---|---|
| PersonMilitary-StatusCode-ContextElements | | | PersonMilitary-StatusCode-ContextElements | | Details | | | |
| | CountryCode | E | PersonMilitary-StatusCode-ContextElements | Country | Code | GDT | CountryCode | 0..1 |

CountryCode can be a context category that would define the context country. It can determine the valid code values for a specific country.

PersonName

A GDT PersonName contains the name components of a person. An example of GDT PersonName is:

<PersonName>

<FirstName>Hans</FirstName>

<LastName>Müller</LastName>

<AcademicTitleCode>0001</AcademicTitleCode>

</PersonName>

In certain implementations, a GDT PersonName may have the following structure:

| GDT | | Cat. | Object Class | Property | Rep./ Ass. | Type | Type Name | Card. |
|---|---|---|---|---|---|---|---|---|
| PersonName | | | Person | Name | Details | | | |
| | FormOf-AddressCode | E | PersonName | Form of Address | Code | GDT | FormOfAddress-Code | 0..1 |
| | FormOf-AddressName | E | PersonName | Form of Address | Name | GDT | LANGUAGE-INDEPNDENT_MEDIUM_Name | 0..1 |
| | GivenName | E | PersonName | GivenName | Name | GDT | LANGUAGE-INDEPNDENT_MEDIUM_Name | 0..1 |
| | MiddleName | E | PersonName | MiddleName | Name | GDT | LANGUAGE-INDEPNDENT_MEDIUM_Name | 0..1 |
| | FamilyName | E | PersonName | FamilyName | Name | GDT | LANGUAGE-INDEPNDENT_MEDIUM_Name | 0..1 |
| | Additional-FamilyName | E | PersonName | Additional-FamilyName | Name | GDT | LANGUAGE-INDEPNDENT_MEDIUM_Name | 0..1 |
| | BirthName | E | PersonName | BirthName | Name | GDT | LANGUAGE-INDEPNDENT_MEDIUM_Name | 0..1 |
| | NickName | E | PersonName | NickName | Name | GDT | LANGUAGE-INDEPNDENT_MEDIUM_Name | 0..1 |
| | InitialsName | E | PersonName | Initials | Name | GDT | LANGUAGE-INDEPNDENT_SHORT_Name | 0..1 |
| | Academic-TitleCode | E | PersonName | Academic-Title | Code | GDT | AcademicTitle-Code | 0..1 |
| | Academic-TitleName | E | PersonName | Academic-Title | Name | GDT | LANGUAGE-INDEPENDENT_MEDIUM_Name | 0..1 |
| | Additional-Academic-TitleCode | E | PersonName | Additional-Academic-Title | Code | GDT | AcademicTitle-Code | 0..1 |
| | Additional-Academic-TitleName | E | PersonName | Additional-Academic-Title | Name | GDT | LANGUAGE-INDEPENDENT_MEDIUM_Name | 0..1 |
| | NamePrefix-Code | E | PersonName | NamePrefix | Code | GDT | FamilyName-PrefixCode | 0..1 |
| | NamePrefix-Name | E | PersonName | NamePrefix | Name | GDT | LANGUAGE-INDEPENDENT_MEDIUM_Name | 0..1 |
| | Additional-NamePrefix-Code | E | PersonName | Additional-NamePrefix | Code | GDT | FamilyName-PrefixCode | 0..1 |
| | Additional-NamePrefix-Name | E | PersonName | Additional-NamePrefix | Name | GDT | LANGUAGE-INDEPENDENT_MEDIUM_Name | 0..1 |
| | NameSupple-mentCode | E | PersonName | Name-Supplement | Code | GDT | PersonName-SupplementCode | 0..1 |
| | NameSupple-mentName | E | PersonName | Name-Supplement | Name | GDT | LANGUAGE-INDEPENDENT_MEDIUM_Name | 0..1 |
| | Deviating-FullName | E | PersonName | Deviating-FullName | Name | GDT | LANGUAGE-INDEPNDENT_LONG_Name | 0..1 |
| | NameFormat-CountryCode | E | PersonName | NameFormat-Country | Code | GDT | CountryCode | 0..1 |
| | NameFormat-Code | E | PersonName | NameFormat | Code | GDT | PersonName-FormatCode | 0..1 |

PersonName can consist of the following sub-elements: FormOfAddressCode (The code of the salutation for the person), FormOfAddressName (The salutation for the person), GivenName (Given name of the person), MiddleName (Second given name or middle name (for example, in Russia) of the person), FamilyName (Family name of the person), AdditionalLastName (Second family name of the person), BirthName (Birth name of the person), NickName (Nick name of the person), InitialsName (Initials or middle initial of the person), AcademicTitleCode (The code for the academic title of the person), AcademicTitleName (Academic title of the person), AdditionalAcademicTitleCode (The code for the second academic title of the person), AdditionalAcademicTitleName (Second academic title of the person), NamePrefixCode (The code for the prefix for the name, for example 'Van der'), NamePrefixName (Prefix for the name, for example 'Van der'), AdditionalNamePrefixCode (The code for the second prefix for the name), AdditionalNamePrefixName (Second prefix for the name), NameSupplementCode (The code of the name affix, for example, a title of nobility), NameSupplementName (Name affix, for example, a title of nobility), DeviatingFullName (Formatted name of the person if this deviates from the formatted name determined from name formatting), NameFormatCountryCode (Country for which the name formatting rule has been defined) and NameFormatCode (Name formatting rule that is to be used for formatting the name).

One of the fields GivenName, FamilyName or DeviatingFullName may be filled. The name formatting rule in the NameFormatCode may be defined for the country stored in NameFormatCountryCode. If NameFormatCode is blank, the standard name formatting rule for the country stored in the NameFormatCountryCode can used for name formatting. If the NameFormatCode and NameFormatCountryCode are blank, proprietary standard rules can be used for name formatting. If, for the following code/name pairs, both the code and the name are filled, then the entry in name may be consistent with the entry in code: FormOfAddressCode/Name, AcademicTitleCode/Name, AdditionalAcademicTitleCode/Name, NamePrefixCode/Name, AdditionalNamePrefixCode/Name and NameSupplementCode/Name. GDT PersonName is used in person data maintenance. The following dictionary objects are assigned to this GDT: Structure (i.e., ADDRS_PERSON_NAME)

PersonNameFormatCode

A GDT PersonNameFormatCode is the coded representation of the rule used for formatting the complete name of a person using its name components. An example of GDT PersonNameFormatCode is:

<PersonNameFormatCode listAgencyID=310>01</PersonNameFormatCode>

In certain implementations, a GDT PersonNameFormatCode may have the following structure:

there); listVersionID—Assigned and managed by the customer; listAgencySchemeID—ID of the scheme if the listAgencyID is not taken from DE 3055 and listAgencySchemeAgencyID—ID of the organization (taken from DE 3055) that manages the scheme of the listAgencySchemeID The GDT PersonNameFormatCode attributes are assigned values as follows: listID, listAgencyID, listVersionID, listAgencySchemeID and listAgencySchemeAgencyID.

The data type GDT PersonNameFormatCode can be used when naming people. The following code values are assigned: PersonNameFormatCode for DE: listID="20901", listAgencyID="310" and listVersionID can be the version of the relevant code list. The following values are assigned to the GDT PersonNameFormatCode: 01 (i.e., Form of address, first name, additional name, last name) and 02 (i.e., Academic title, first name, name prefix, last name.)

The GDT PersonNameFormatCode for JP has the following values: listID="20902", listAgencyID="310" and listVersionID can be version of the relevant code list. The following values are assigned to the GDT PersonNameFormatCode: 01 (i.e., First name, last name.) PersonNameFormatCode for US has the following values: listID="20903", listAgencyID="310" and listVersionID can be the version of the relevant code list. The data type GDT PersonNameFormatCode may use the following codes: 01

| GDT | | Cat. | Object Class | Property | Representation/ Association | Type | Type Name | Len. | Card. |
|---|---|---|---|---|---|---|---|---|---|
| PersonName-FormatCode | | | | Person Name Format | Code | CDT | Code | 1..2 | |
| | listID | A | Code List | Identification | Identifier | xsd | token | | 0..1 |
| | listAgencyID | A | Code List Agency | Identification | Identifier | xsd | token | | 0..1 |
| | listVersionID | A | Code List | Version | Identifier | xsd | token | | 0..1 |
| | listAgency-SchemeID | A | Code List Agency | Scheme | Identifier | xsd | token | | 0..1 |
| | listAgency-SchemeAgencyID | A | Code List Agency | Scheme Agency | Identifier | xsd | token | | 0..1 |

Several extensible, country-specific code lists, which are distinguished at runtime, ca be assigned to the PersonNameFormatCode. Customers can change these code lists. Assigned Attribute Values for DE include: listID="20901" and listAgencyID="310." Assigned Attribute Values for JP include: listID="20902" and listAgencyID="310." Assigned Attribute Values for US include: listID="20903" and listAgencyID="310."

If a customer makes changes to one of the code lists, the values assigned to the attributes could change as follows: listAgencyID—ID of the customer (ID from DE 3055 if listed (i.e., Form of address, first name, initials, last name, academic title).

PersonNameSupplementCode

A GDT PersonNameSupplementCode is the coded representation of a name supplement. An example of GDT PersonNameSupplementCode is:

<PersonNameSupplementCode listAgencyID=310>0003</PersonNameSupplementCode>

In certain implementations, GDT PersonNameSupplementCode may have the following structure:

| GDT | | Cat. | Object Class | Property | Representation/ Association | Type | Type Name | Len. | Card. |
|---|---|---|---|---|---|---|---|---|---|
| PersonName-SupplementCode | | | | Person Name Supplement | Code | CDT | Code | 1..4 | |
| | listID | A | Code List | Identification | Identifier | xsd | token | | 0..1 |
| | listAgencyID | A | Code List Agency | Identification | Identifier | xsd | token | | 0..1 |
| | listVersionID | A | Code List | Version | Identifier | xsd | token | | 0..1 |
| | listAgency-SchemeID | A | Code List Agency | Scheme | Identifier | xsd | token | | 0..1 |
| | listAgency-Scheme-AgencyID | A | Code List Agency | Scheme Agency | Identifier | xsd | token | | 0..1 |

An extendable code list can be assigned to the PersonNameSupplementCode. Customers can change this code list. The attributes may be assigned the following values: listID="10119", listAgencyID="310", listVersionID, listAgencySchemeID, listAgencySchemeAgencyID. The data type GDT PersonNameSupplementCode can be used as part of the name in the representation of the name of a person. A NameSupplementCode can represent a title of nobility, such as 'Gräfin.'

The possible values for NameSupplementCode are maintained in table TSAD5. The data type GDT PersonNameSupplementCode may use the following codes: 0001 (i.e., Graf), 0002 (i.e., Grafin), 0003 (i.e., Freiherr), 0004 (i.e., Freifrau), 0005 (i.e., Earl), 0006 (i.e., Sir), 0007 (i.e., MdB (Member of the Bundestag)) and 0008 (i.e., MdL (Member of the Landtages).)

PersonRaceEthnicityCode

A GDT PersonRaceEthnicityCode is the code indicating the racial or ethnic background of a person. Definition according to the U.S. Office of Management and Budget and U.S. Bureau of Consensus. An example of GDT PersonRaceEthnicityCode is:

<PersonRaceEthnicityCode listID="1109" listAgencyID="116" listVersionID="X12.3">C</PersonRaceEthnicityCode>

In the previous example, the racial background of the person is Caucasian, according to ANSI X12.3.

In certain implementations, GDT PersonRaceEthnicityCode may have the following structure:

| GDT | | Cat. | Object Class | Property | Representation/ Association | Type | Type Name | Len. | Card | Remarks |
|---|---|---|---|---|---|---|---|---|---|---|
| Person-RaceEthnicity-Code | | | Person | Race Ethnicity | Code | CDT | Code | 1..2 | | Restricted |
| | listID | A | Code List | Identification | Identifier | xsd | Token | | 0..1 | |
| | listAgencyID | A | Code List Agency | Identification | Identifier | xsd | Token | | 0..1 | |
| | listVersionID | A | Code List | Version | Identifier | xsd | Token | | 0..1 | |

The GDT PersonRaceEthnicityCode attributes can be assigned the following values: listID—1109 (Race or Ethnicity Code), listAgencyID—116 (US ANSI X12) and listVersionID—X12.3. The PersonRaceEthnicityCode can be displayed in accordance with the ANSI X12.3—1109. The attributes may be assigned the following values: 7 (i.e., Not Provided), 8 (i.e., Not Applicable), A (i.e., Asian or Pacific Islander), B (i.e., Black), C (i.e., Caucasian), D (i.e., Subcontinent Asian American), E (i.e., Other Race or Ethnicity), F (i.e., Asian Pacific American), G (i.e., Native American), H (i.e., Hispanic), I (i.e., American Indian or Alaskan Native), J (i.e., Native Hawaiian), N (i.e., Black (Non-Hispanic), O (i.e., White (Non-Hispanic)), P (i.e., Pacific Islander), Q (i.e., Black or African American), R (i.e., Hispanic or Latino), S (i.e., White), T (i.e., American Indian or Alaska Native), U (i.e., Asian), V (i.e., Native Hawaiian or Other Pacific Islander), W (i.e., Not Hispanic or Latino) and Z (i.e., Mutually Defined.) This information is recorded for employees in the United States. The employer may then ensure that an employee is not discriminated against on the basis of his or her racial or ethnic background.

The GDT PersonRaceEthnicityCodeContextElements defines a dependency or an environment in which the PersonRaceEthnicityCode appears. The environment is described by context categories. With the context categories in PersonRaceEthnicityCodeContextElements the valid portion of code values of PersonRaceEthnicityCode is restricted according to an environment during use. In certain implementations, GDT PersonRaceEthnicityCodeContextElements may have the following structure:

| GDT | | Cat. | Object Class | Property | Representation/ Association | Type | Type Name | Card. |
|---|---|---|---|---|---|---|---|---|
| Person-RaceEthnicity-CodeContext-Elements | | | Person-RaceEthnicity-CodeContext-Elements | | Details | | | |
| | CountryCode | E | Person-RaceEthnicity-CodeContext-Elements | Country | Code | GDT | CountryCode | 0..1 |

CountryCode this context category can define the context country. It can determine the valid code values for a specific country.

PersonnelEventReasonCode

A GDT PersonnelEventReasonCode is the coded representation of the reason for a personnel event. A personnel event is an event in an employee's professional or private life that needs to be documented for the company (see GDT "PersonnelEventTypeCode"). You can assign a reason to personnel events that relate to the employee, the employment, or the work agreement. The reason depends on the requirements of the company and the country. For example, in the case of the event type "Notice", the reason could be "Better career opportunities". An example of GDT PersonnelEventReasonCode is:

<PersonnelEventReasonCode>1</PersonnelEventReasonCode>

In certain implementations, GDT PersonnelEventReasonCode may have the following structure:

| GDT | | Cat. | Object Class | Property | Representation/ Association | Type | Type Name | Len. | Card. | Remarks |
|---|---|---|---|---|---|---|---|---|---|---|
| PersonnelEvent-ReasonCode | | | Personnel Event | Reason | Code | CDT | Code | 1..4 | | Restricted |
| | listID | A | Code List | Identification | Identifier | xsd | token | | 0..1 | |
| | listAgency ID | A | Code List Agency | Identification | Identifier | xsd | token | | 0..1 | |
| | listVersion-ID | A | Code List | Version | Identifier | xsd | token | | 0..1 | |
| | listAgency-SchemeID | A | Code List Agency | Scheme | Identifier | xsd | token | | 0..1 | |
| | listAgency-Scheme-AgencyID | A | Code List Agency | Scheme Agency | Identifier | xsd | token | | 0..1 | |

A customer-specific code list can be assigned to the GDT PersonnelEventReasonCode. A customer can define the codes in the code list. Only alternative code lists exist that are differentiated at configuration and/or runtime." The data type PersonnelEventReasonCodeContextElements define a dependency or an environment in which the PersonnelEventReasonCode appears. The environment is described by context categories.

With the context categories in PersonnelEventReasonCodeContextElements the valid portion of code values of PersonnelEventReasonCode is restricted according to an environment during use.

In certain implementations, GDT PersonnelEventReasonCodeContextElements may have the following structure:

| GDT | | Cat. | Object Class | Property | Representation/ Association | Type | Type Name | Card. |
|---|---|---|---|---|---|---|---|---|
| PersonnelEvent-ReasonCode-ContextElements | | | PersonnelEvent-ReasonCode Context Elements | | Details | | | |
| | CountryCode | E | PersonnelEvent-ReasonCode Context Elements | Country | Code | GDT | Country-Code | 0..1 |
| | PersonnelEvent-TypeCode | E | PersonnelEvent-ReasonCode Context Elements | Personnel-EventType | Code | GDT | Personnel-Event-TypeCode | 1 |

GDT PersonnelEventReasonCode may use the following codes: listID="10104," listAgencyID, listVersionID, listAgencySchemeID and listAgencySchemeAgencyID.

The PersonnelEventReasonCode enables you to distinguish between different reasons for personnel events. Examples of the possible semantics of the codes are: Better career opportunities (The employee resigns because of better career opportunities elsewhere), Health reasons (The employee resigns for health reasons), Lacking qualification (The employer dismisses the employee due to a lack of qualification) and Reorganization (The employer dismisses the employee due to a reorganization within the company.) The CountryCode—This context category can define the context country. It can determine the valid code values for a specific country. PersonnelEventTypeCode—This context category can define the context Personnel Event. It can determine the valid code values for a specific Personnel Event.

PersonnelEventTypeCode

A GDT PersonnelEventTypeCode is a coded representation of the type of a personnel event. A personnel event is an event in an employee's professional or private life that needs to be documented for the company. The GDT PersonnelEventType is the classification of personnel events according to the type of change to the work relationship, the work agreement, or the employee-related data. An example of GDT PersonnelEventTypeCode is:

<PersonnelEventTypeCode listAgencyID='310' listVersionID='1.0'>1</PersonnelEventTypeCode>

In certain implementations, GDT PersonnelEventTypeCode may have the following structure:

| GDT | | Cat. | Object Class | Property | Representation/ Assocation | Type | Type Name | Len. | Card. |
|---|---|---|---|---|---|---|---|---|---|
| Personnel-EventType-Code | | | Personnel Event | Type | Code | CDT | Code | 1..4 | |
| | listAgencyID | A | Code List Agency | Identification | Identifier | xsd | token | | 0..1 |
| | listVersionID | A | Code List | Version | Identifier | xsd | token | | 0..1 |
| | listAgency-SchemeID | A | Code List Agency | Scheme | Identifier | xsd | token | | 0..1 |
| | listAgency-Scheme-AgencyID | A | Code List Agency | Scheme Agency | Identifier | xsd | token | | 0..1 |

Several country-specific code lists that are different at runtime can be assigned to the GDT PersonnelEventTypeCode. Customers can change these code lists. Assigned Attributes for the International Code List can include the following values: listID="21201" and listAgencyID="310." If a customer makes changes to the code lists, the values of the attributes could change as follows: listAgencyID—ID of the customer (ID from DE 3055 if listed there), listVersionID—Assigned and managed by the customer, listAgency-SchemeID—ID of the scheme if the listAgencyID is not taken from DE 3055 and listAgencySchemeAgencyID—ID of the organization (taken from DE 3055) that manages the scheme of the listAgencySchemeID.

The data type GDT PersonnelEventTypeCode may use the following codes: listAgencyID, listVersionID, listAgency-SchemeID and listAgencySchemeAgencyID. You can use the GDT PersonnelEventTypeCode to distinguish between different event types in personnel administration. We can deliver a code list with international event types. Customers and countries can modify the list. Examples of the possible semantics of the codes are: Hiring—This type can contain the information that the event is an "Employee Hiring", Resignation—This type can contain the information that the event is an "Employee Resignation" and Maternity Protection—This type contains the information that the event is an "Employee Maternity Protection".

The International Code List can have the following values: listID="21201", listAgencyID="310" and listVersionID can be a version of the particular code list. The data type GDT PersonnelEventType may use the following codes: 1 (i.e., Hiring), 2 (i.e., Transfer), 3 (i.e., Dismissal), 4 (i.e., Resignation), 5 (i.e., Sabbatical leave), 6 (i.e., Military service), 7 (i.e., Maternity protection) and 8 (i.e., Parental leave). The GDT PersonnelEventTypeCodeContextElements can define a dependency or an environment in which the PersonnelEventTypeCode appears. The environment can be described by context categories. With the context categories in PersonnelEventTypeCodeContextElements the valid portion of code values of PersonnelEventTypeCode can be restricted according to an environment during use.

In certain implementations, GDT PersonnelEventTypeCode-ContextElements may have the following structure:

| GDT | Object Class | Representation/ Association |
|---|---|---|
| PersonnelEvent-TypeCodeContext-Elements | PersonnelEvent-TypeCode Context Elements | Details |
| | PersonnelEvent-TypeCode Context Elements | Code |

CountryCode can be a context category that can define the context country. It can determine the valid code values for a specific country.

PersonnelTimeEventID

A GDT PersonnelTimeEventID is a unique ID for a personnel time event. A personnel time event can be a change in the execution of services of a personnel resource with which one personnel time ends and another personnel time begins. Such changes can include, i.e., the start of work, interruption of work or end of work. A personnel time event can be characterized by a type such as "clock-in entry", "clock-out entry", or "start of break". A personnel time event can include additional information (such as, reference to project, order, cost center) for different target applications (such as, project system or Controlling). An example is:

<PersonnelTimeEventID>1234567890123456</PersonnelTimeEventID>

In certain implementations, GDT PersonnelEventTypeCode-ContextElements may have the following structure:

| GDT | | Cat. | Object Class | Property | Representation/ Association | Type | Type Name | Len. | Card. | Remarks |
|---|---|---|---|---|---|---|---|---|---|---|
| Personnel-Time-EventID | | | Personnel Time Event | Identification | Identifier | GDT | Identifier | 1..40 | | restricted |
| | schemeID | A | Identification Scheme | Identification | Identifier | XSD | Token | 1..60 | 0..1 | |
| | scheme-AgencyID | A | Identification Scheme Agency | Identification | Identifier | XSD | Token | 1..60 | 0..1 | |

The data type GDT PersonnelEventTypeCodeContextElements may use the following codes: schemeID (PersonnelTimeEventGUID and PersonnelTimeTypeID) and schemeAgencyID. If "PersonnelTimeEventGUID" is used for schemeID, PersonnelTimeEventID may comprise 1-40 characters. If “PersonnelTimeEventID” is used, PersonnelTimeEventID may comprise 1-16 characters and may be alphanumeric. If schemeID and schemeAgencyID have not been specified, it may be possible to determine them from the context.

PersonnelTimeEventTypeID

A GDT PersonnelTimeEventTypeID is a unique ID for a personnel time event type. A personnel time event type is a classification of personnel time events according to personnel time management criteria. A typical criterion is whether the employee is at work or not. Examples can be “clock-in entry”, “clock-out entry” or “start of break”. An example is:

<PersonnelTimeEventTypeID>1234567890123456</PersonnelTimeEventTypeID>

In certain implementations, GDT PersonnelTimeEventTypeID may have the following structure:

| GDT | | Cat. | Object Class | Property | Representation/ Association | Type | Type Name | Len. | Card. | Remarks |
|---|---|---|---|---|---|---|---|---|---|---|
| Personnel-TimeEvent-TypeID | | | Personnel Time Event | Identification | Identifier | GDT | Identifier | 1..40 | | restricted |
| | schemeID | A | Identification Scheme | Identification | Identifier | XSD | Token | 1..60 | 0..1 | |
| | scheme-AgencyID | A | Identification Scheme Agency | Identification | Identifier | XSD | Token | 1..60 | 0..1 | |

The data type GDT PersonnelTimeEventTypeID may use the following codes: schemeID (PersonnelTimeEventTypeGUID and PersonnelTimeEventTypeID schemes) and schemeAgencyID. If “PersonnelTimeEventTypeGUID” is used for schemeID, PersonnelTimeEventTypeID may comprise 1-40 characters. If “PersonnelTimeEventTypeID” is used, PersonnelTimeEventTypeID may comprise 1-16 characters and may be alphanumeric. If schemeID or schemeAgencyID have not been specified, it may be possible to determine them from the context.

PersonnelTimeID

A GDT PersonnelTimeID is a unique ID for a personnel time. A personnel time is a period of a personnel resource that is characterized by business, pay scale, or legal criteria. The period can be entered as a duration (such as, 8 hours on 10 Nov. 2003) or as clock times (such as, from 8:10 to 17:30 on 10 Nov. 2003). The personnel time is characterized by a personnel time type (i.e., “working time”, “leave”, “overtime”, “availability for work” “illness” or “work break”). A personnel time can include additional information (such as, reference to project, order, cost center) for different target applications (such as, project system or Controlling). An example is:

<PersonnelTimeID>1234567890123456</PersonnelTimeID>

In certain implementations, GDT PersonnelTimeID may have the following structure:

| GDT | | Cat. | Object Class | Property | Representation/ Association | Type | Type Name | Len. | Card. | Remarks |
|---|---|---|---|---|---|---|---|---|---|---|
| Personnel-TimeID | | | Personnel Time | Identification | Identifier | GDT | Identifier | 1..40 | | restricted |
| | schemeID | A | Identification Scheme | Identification | Identifier | XSD | Token | 1..60 | 0..1 | |
| | scheme-AgencyID | A | Identification Scheme Agency | Identification | Identifier | XSD | Token | 1..60 | 0..1 | |

The data type GDT PersonnelTimeID may use the following codes: schemeID (PersonnelTimeEventTypeGUID and PersonnelTimeEventTypeID schemes) and schemeAgencyID. If “PersonnelTimeGUID” is used for schemeID, PersonnelTimeID may comprise 1-40 characters. If “PersonnelTimeID” is used, PersonnelTimeID may comprise 1-16 characters and may be alphanumeric. If schemeID or schemeAgencyID have not been specified, it may be possible to determine them from the context.

PersonnelTimeTypeID

A GDT PersonnelTimeType ID is a unique identifier for a personnel time type. PersonnelTimeType is a classification of personnel times according to business, pay scale, or legal criteria. Depending on whether the employee is at work or absent, the classification can be made according to payment-relevant or further personnel time management criteria. Examples include “working time”, “leave”, “overtime”, “availability for work”, “illness” or “work break”. An example is:

<PersonnelTimeTypeID>1234567890123456</Personnel-TimeTypeID>

In certain implementations, GDT PersonnelTimeTypeID may have the following structure:

| GDT | | Cat. | Object Class | Property | Representation/ Association | Type | Type Name | Len. | Card. | Remarks |
|---|---|---|---|---|---|---|---|---|---|---|
| Personnel-TimeTypeID | | | Personnel Time Type | Identification | Identifier | GDT | Identifier | 1..40 | | restricted |
| | schemeID | A | Identification Scheme | Identification | Identifier | XSD | Token | 1..60 | 0..1 | |
| | scheme-AgencyID | A | Identification Scheme Agency | Identification | Identifier | XSD | Token | 1..60 | 0..1 | |

The data type GDT PersonnelTimeTypeID may use the following codes: schemeID (PersonnelTimeEventTypeGUID and PersonnelTimeEventTypeID schemes) and schemeAgencyID. If “PersonnelTimeTypeGUID” is used for schemeID, PersonnelTimeTypeID may comprise 1-40 characters. If “PersonnelTimeTypeID” is used, PersonnelTimeTypeID may comprise 1-16 characters and may be alphanumeric. If schemeID or schemeAgencyID have not been specified, it may be possible to determine them from the context.

PersonRaceEthnicityCode

A GDT PersonRaceEthnicityCode is the code indicating the racial or ethnic background of a person. Definition according to the U.S. Office of Management and Budget and U.S. Bureau of Consensus. An example is:

<PersonRaceEthnicityCode listID=“1109” listAgencyID=“116” listVersionID=“X12.3”>C </PersonRaceEthnicityCode>

In the above example, this is the code identifying the racial background of the person as Caucasian, according to ANSI X12.3. In certain implementations, GDT PersonRaceEthnicityCode may have the following structure:

| GDT | | Cat. | Object Class | Property | Representation/ Association | Type | Type Name | Len. | Card. | Remarks |
|---|---|---|---|---|---|---|---|---|---|---|
| PersonRace-EthnicityCode | | | Person | Race Ethnicity | Code | CDT | Code | 1..2 | | Restricted |
| | listID | A | Code List | Identification | Identifier | xsd | token | | 0..1 | |
| | listAgencyID | A | Code List Agency | Identification | Identifier | xsd | token | | 0..1 | |
| | listVersionID | A | Code List | Version | Identifier | xsd | token | | 0..1 | |
| | listAgency-SchemeID | A | Code List Agency | Scheme | Identifier | xsd | token | | 0..1 | |
| | listAgency-SchemeAgencyID | A | Code List Agency | Scheme Agency | Identifier | xsd | token | | 0..1 | |

Several fixed, country-specific code lists, which are different at runtime, can be assigned to the code. Assigned Attribute Values for US can include the following: listID=“1109” (i.e., Race or Ethnicity Code), listAgencyID=“116” (i.e., US ANSI X12) and listVersionID=“X12.3”. Assigned Attribute Values for CN can include the following: listID=“GB/T 3304” (i.e., Race or Ethnicity Code), listAgencyID=“CN”, listVersionID=“1991”, listAgencySchemeID=ISO 3166-1 and listAgencySchemeAgencyID=“5” (ISO).

The data type GDT PersonRaceEthnicityCode may use the following codes: listID, listAgencyID, listVersionID, listAgencySchemeID and listAgencySchemeAgencyID. This information is recorded for employees in the United States. The employer may then ensure that an employee is not discriminated against on the basis of his or her racial or ethnic background. In the United States, there is a legal regulation stipulating that the racial background information may be entered separately from the ethnic background information. PersonRaceEthnicityCode for the country US according to ANSI X12.3-1109. The attributes can be as follows: listID=“1109” (Race or Ethnicity Code), listAgencyID=“116” (i.e., US ANSI X12) and listVersionID=“X12.3”. The GDT PersonRaceEthnicityCode is displayed in accordance with the ANSI X12.3-1109.

The data type GDT PersonRaceEthnicityCode may use the following codes: 7 (i.e., Not Provided), 8 (i.e., Not Applicable), A (i.e., Asian or Pacific Islander), B (i.e., Black), C (i.e., Caucasian), D (i.e., Subcontinent Asian American), E (i.e., Other Race or Ethnicity), F (i.e., Asian Pacific American), G (i.e., Native American), H (i.e., Hispanic), I (i.e., American Indian or Alaskan Native), J (i.e., Native Hawaiian), N (i.e., Black (Non-Hispanic), O (i.e., White (Non-Hispanic), P (i.e., Pacific Islander), Q (i.e., Black or African American), R (i.e., Hispanic or Latino), S (i.e., White), T (i.e., American Indian or Alaska Native), U (i.e., Asian), V (i.e., Native Hawaiian or Other Pacific Islander), W (i.e., Not Hispanic or Latino) and Z (i.e., Mutually Defined).

The data type GDT PersonRaceEthnicityCode may use the following codes: HA (i.e., Han ethnic group), MG (i.e., Mengol ethnic group), HU (i.e., Hui ethnic group), ZA (i.e., Tibetan ethnic group), UG (i.e., Uygur ethnic group), MH (i.e., Miao ethnic group), YI (i.e., Yi ethnic group), ZH (i.e., Zhuang ethnic group), BY (i.e., Bouyei ethnic group), CS (i.e., Korean ethnic group), MA (i.e., Manchu ethnic group), DO (i.e., Dong ethnic group), YA (i.e., Yao ethnic group), BA (i.e., Bai ethnic group), TJ (i.e., Tujia ethnic group), HN (i.e., Hani ethnic group), KZ (i.e., Kazak ethnic group), DA (i.e., Dai ethnic group), LI (i.e., Li ethnic group), LS (i.e., Lisu ethnic group), VA (i.e., Va ethnic group), SH (i.e., She ethnic group), GS (i.e., Gaoshan ethnic group), LH (i.e., Lahu ethnic group.)

In certain implementations, the data type may use the following codes: SU (i.e., Shui ethnic group), DX (i.e., Dongxiang ethnic group), NX (i.e., Naxi ethnic group), JP (i.e., Jingpo ethnic group), KG (i.e., Kirgiz ethnic group), TU (i.e., Tu ethnic group), DU (i.e., Daur ethnic group), ML (i.e., Mulam ethnic group), QI (i.e., Qiang ethnic group), BL (i.e., Blang ethnic group), SL (i.e., Salar ethnic group), MN (i.e., Maonan ethnic group), GL (i.e., Gelao ethnic group), XB (i.e., Xibe ethnic group), AC (i.e., Achang ethnic group), PM (i.e., Pumi ethnic group), TA (i.e., Tajik ethnic group), NU (i.e., Nu ethnic group), UZ (i.e., Ozbek ethnic group), RS (i.e., Russian ethnic group), EW (i.e., Ewenki ethnic group), DE (i.e., De'ang ethnic group), BN (i.e., Bonan ethnic group), YG (i.e., Yugur ethnic group), GI (i.e., Jing ethnic group), TT (i.e., Tatar ethnic group), DR (i.e., Drung ethnic group), OR (i.e., Oroqen ethnic group), HZ (i.e., Hezhen ethnic group), MB (i.e., Moinba ethnic group), LB (i.e., Lhoba ethnic group) and JN (i.e., Jino ethnic group).

The GDT PersonRaceEthnicityCodeContextElements can define a dependency or an environment in which the GDT PersonRaceEthnicityCode appears. The environment is described by context categories. With the context categories in PersonRaceEthnicityCodeContextElements the valid portion of code values of PersonRaceEthnicityCode is restricted according to an environment during use.

In certain implementations, GDT PersonRaceEthnicityCode may have the following structure:

| GDT | | Cat. | Object Class | Property | Representation/ Association | Type | Type Name | Card. |
|---|---|---|---|---|---|---|---|---|
| Person-RaceEthnicity-CodeContext-Elements | | | Person-RaceEthnicity-CodeContext-Elements | | Details | | | |
| | CountryCode | E | Person-RaceEthnicity-CodeContext-Elements | Country | Code | GDT | CountryCode | 0..1 |

CountryCode can be a context category that can define the context country. It determines the valid code values for a specific country.

PhoneNumber

A GDT PhoneNumber is a telephone number that comprises the international dialing code, regional area code, number, and extension. An example is:

<PhoneNumber>
<AreaID>6227</AreaID>
<SubscriberID>7</SubscriberID>
<ExtensionID>47474</ExtensionID>
<CountryCode>DE</CountryCode>
</PhoneNumber>

In certain implementations, GDT PhoneNumber may have the following structure:

| GDT | | Cat. | Object Class | Property | Representation/ Association | Type | Type Name | Len. | Card. | Remarks |
|---|---|---|---|---|---|---|---|---|---|---|
| PhoneNumber | | | Phone Number | | Details | | | | | |
| | AreaID | E | Phone Number | Phone Number Area | Identifier | CDT | Identifier | 1..10 | 0..1 | restricted |
| | SubscriberID | E | Phone Number | Phone Number Subscriber | Identifier | CDT | Identifier | 1..30 | 0..1 | restricted |
| | ExtensionID | E | Phone Number | Phone Number Extension | Identifier | CDT | Identifier | 1..10 | 0..1 | restricted |
| | CountryCode | E | Phone Number | Phone Number Country | Code | GDT | CountryCode | | 0..1 | |

PhoneNumber contains one telephone number. AreaID" can indicate the area code if known separately. It may be displayed in standardized format, that is, without a leading zero or the like. Alternatively, the area code can be displayed together with the telephone number in SubscriberID. When using a mobile phone number, AreaID contains the prefix for the mobile phone network (also without a leading zero or the like). Synonym: AreaCodeNumber.

"SubscriberID" can indicate the telephone number without the regional area code and without the international dialing code. Alternatively, SubscriberID can also contain the telephone number together with the regional area code, extension, or both. SubscriberID may be displayed in a standardized format that can only contain numbers or letters and cannot contain blanks or special characters. Synonym: SubscriberNumber.

"ExtensionID" can indicate the extension if the telephone number comprises a telephone number and an extension. Alternatively, the extension can be included in SubscriberID together with the telephone number. ExtensionID may remain empty if the telephone number is a cell phone number. Synonym: ExtensionTelephoneNumber "CountryCode" can identify the country code in accordance with ISO 3166-1. It is used to determine the international dialing code. If it is empty, the country can be derived from the address instead, provided the telephone number is given in the context of an address. The country entered in the address and the country for the telephone number can also be different if the telephone number is provided in the context of an address. The country code is more appropriate for determining the international dialing code than the standardize format (i.e., +49). The telephone number is divided into components based on the Microsoft TAPI specification and ITU guidelines (International Telecommunication Union).

PhoneNumber is used to describe the sequence of numbers that may be dialed to establish a connection. PhoneNumber is used for Telephone, MobilePhone, and Facsimile (fax), all of which have a similar structure.

PhysicalInventoryCountDetailLevelCode

A GDT PhysicalInventoryCountDetailLevelCode is a coded representation of the level of detail required for a physical inventory count. An example of GDT PhysicalInventoryCountDetailLevelCode is:

<PhysicalInventoryCountDetailLevelCode>1</PhysicalInventoryCountDetailLevelCode>

In certain implementations, GDT PhysicalInventoryCountDetailLevelCode may have the following structure:

| GDT | Cat. | Object Class | Property | Representation/ Association | Type | Type Name | Len. | Card. | Remarks |
|---|---|---|---|---|---|---|---|---|---|
| PhysicalInventoryCount-DetailLevelCode | | Physical Inventory Count | Detail Level | Code | CDT | Code | 1..2 | | restricted |

One fixed code list may be assigned to the PhysicalInventoryCountDetailLevelCode. The attributes are assigned values as follows: listID="10420" and listAgencyID="310."

The PhysicalInventoryCountDetailLevelCode can be specified during the count preparation stage. It can instruct the counter on the level of detail required for the count, and is used by the system to calculate the deviation between the counted inventory and the book inventory. The data type GDT PhysicalInventoryCountDetailLevelCode may use the following codes: 1 (i.e., Material Total), 2 (i.e., Material And Stock Separators), 3 (i.e., Outer Logistic Unit), 4 (i.e., Outer Handling Unit) and 5 (i.e., All Detail Levels.)

PhysicalInventoryCountScopeCode

A GDT PhysicalInventoryCountScopeCode is a coded representation of the scope of a physical inventory count, specifying what is to be counted. An example is:

<PhysicalInventoryCountScopeCode>1</PhysicalInventoryCountScopeCode>

In certain implementations, GDT PhysicalInventoryCountScopeCode may have the following structure:

| GDT | Cat. | Object Class | Property | Representation/ Association | Type | Type Name | Len. | Card. | Remarks |
|---|---|---|---|---|---|---|---|---|---|
| PhysicalInventoryCount-ScopeCode | | Physical Inventory Count | Scope | Code | CDT | Code | 1..2 | | restricted |

A single code list may be assigned to the GDT PhysicalInventoryCountScopeCode. The attributes are assigned values as follows: listID="0257" and listAgencyID="310." The scope of the physical inventory count may be specified during the count preparation stage. This defines for the counter what to count, and is used by the system to calculate the deviation between the counted inventory and the book inventory.

The data type GDT PhysicalInventoryCountScopeCode may use the following codes: 1 (i.e., All Materials In Location), 2 (i.e., All Logistic Units In Location), 3 (i.e., All Handling Units In Location), 4 (i.e., Specific Material), 5 (i.e., Specific Logistic Unit) and 6 (i.e., Specific Handling Unit.)

PhysicalInventoryCountInventoryItemDetailVisibilityCode

A GDT PhysicalInventoryCountInventoryItemDetailVisibilityCode is a coded representation of the detail of inventory item that is visible to a counter during a physical inventory count. An example is:

<PhysicalInventoryCountInventoryItemDetailVisibilityCode>1</PhysicalInventoryCountInventoryItemDetailVisibilityCode>

In certain implementations, GDT PhysicalInventoryCountInventoryItemDetailVisibilityCode may have the following structure:

| GDT | Cat. | Object Class | Property | Representation/ Association | Type | Type Name | Len. | Card. | Remarks |
|---|---|---|---|---|---|---|---|---|---|
| PhysicalInventoryCount-InventoryItemDetail-VisibilityCode | | Physical Inventory Count Inventory Item | Detail Visibility | Code | CDT | Code | 1..2 | | restricted |

One fixed code list may be assigned to the PhysicalInventoryCountInventoryItemDetailVisibilityCode. The attributes can be assigned values as follows: listID="10420" and listAgencyID="310." The PhysicalInventoryCountInventoryItemDetailVisibilityCode is specified during the count preparation stage. It determines the information provided to the counter when performing a count in a location, regarding the identity and quantity of the counted inventory. For example, a counter may be provided with a list of expected items in a location, or a list of both the expected items and their expected quantities in a location.

The data type GDT PhysicalInventoryCountInventoryItemDetailVisibilityCode may use the following codes: 1 (i.e., Material and Quantity), 2 (i.e., Material), 3 (i.e., Logistic Unit and Quantity), 4 (i.e., Logistic Unit), 5 (i.e., Handling Unit Number) and 6 (i.e., Masked Handling Unit.)

PlanActualCode

A PlanActualCode is the coded representation of the differentiation of something as actual or planned. For example, data can be differentiated as actual or planned. An example is:

<PlanActualCode>1</PlanActualCode>

In certain implementations, GDT PersonnelTimeID may have the following structure:

| GDT | Property | Representation/ Association | Type | Type Name | Len. | Remarks |
|---|---|---|---|---|---|---|
| PlanActualCode | Plan Actual | Code | CDT | Code | 1 | restricted |

A single fixed code list has been assigned to the code. The attributes are as follows: listID="10477" and listAgencyID="310." The PlanActualCode indicates whether data is actual or planned, for example. The data type GDT PlanActualCode may use the following codes: 1 (i.e., Context-dependent), 2 (i.e., Actual) and 3 (i.e., Plan). A List of Qualifiers that can be used include: AmountPlanActualCode, BasePlanActualCode and UsagePlanActualCode.

POBoxID

A GDT POBoxID is a unique identifier of a PO Box. An example of GDT POBoxID is:

<POBoxID>147 11</POBoxID>

In certain implementations, GDT POBoxID may have the following structure:

| GDT | Object Class | Property | Representation/ Association | Type | Type Name | Len. | Remarks |
|---|---|---|---|---|---|---|---|
| POBoxID | PO Box | Identification | Identifier | CDT | Identifier | 1..10 | restricted |

The POBoxID could be unique for every delivery area. The delivery area can be known from the context. PO Box number is used as part of the address. In this field the number of the PO Box could be entered. The text "PO Box" is determined language-specifically when the address is printed. The recipient language can be used for this purpose. When the address is printed, a distinction can be made between the categories "Street address" and "PO Box address". The print program specifies which category would take precedence if both values are maintained in one address record.

Besides the PO Box number, the following fields can be taken into consideration for the PO Box address: Postcode of the PO Box, if filled (otherwise the normal postcode); City of the PO Box, if filled (otherwise the normal city); Region of the PO Box, if filled (otherwise the normal region); Country of the PO Box, if filled (otherwise the normal country). If only the "PO Box" information (without number) applies in the address, then the "PO Box" field is not to be filled. Instead, the indicator "PO Box without number" can be selected. Instead of PO Box information, a company postcode can also be maintained in a special, separate field for organizational addresses.

PoliticalPartyAffiliationTypeCode

A GDT PoliticalPartyAffiliationTypeCode is a coded representation of the type of affiliation to a political party, according to country specific criteria. A political party affiliation is the affiliation of a person in a political party. Definition according to the Standardization Administration of China (SAC). An example of PoliticalPartyAffiliationTypeCode is:

<PoliticalPartyAffiliationType>1</PoliticalPartyAffiliationType>

In certain implementations, GDT PoliticalPartyAffiliationTypeCode may have the following structure:

| GDT | | Cat. | Object Class | Property | Representation/ Association | Type | Type Name | Len. | Card. | Remarks |
|---|---|---|---|---|---|---|---|---|---|---|
| PoliticalParty-Affiliation-TypeCode | | | Political Party Affiliation Type | | Code | CDT | Code | 1..2 | | restricted |
| | listID | A | Code List | Identification | Identifier | xsd | token | | 0..1 | |

-continued

| GDT | | Cat. | Object Class | Property | Representation/ Association | Type | Type Name | Len. | Card. | Remarks |
|---|---|---|---|---|---|---|---|---|---|---|
| | listAgencyID | A | Code List Agency | Identification | Identifier | xsd | token | | 0..1 | |
| | listVersionID | A | Code List | Version | Identifier | xsd | token | | 0..1 | |
| | listAgencySchemeID | A | Code List Agency | Scheme | Identifier | xsd | token | | 0..1 | |
| | listAgencySchemeAgencyID | A | Code List Agency | Scheme Agency | Identifier | xsd | token | | 0..1 | |

Several fixed, country-specific code lists, which are different at runtime, are assigned to the PoliticalPartyAffiliationTypeCode.

Assigned Attribute Values for Chinese national voluntary standard GB/T 4762 can include: listID=GB/T 4762, listAgencyID=CN, listVersionID=1984, listAgencySchemeID=ISO 3166-1 and listAgencySchemeAgencyID="5" (entry for ISO in DE3055).

The data type GDT PoliticalPartyAffiliationTypeCode may use the following codes: listID, listAgencyID, listVersionID, listAgencySchemeID and listAgencySchemeAgencyID. This GDT is used in Chinese employments to record the party affiliation of employees. Standard code list according to Chinese national voluntary standard GB/T 4762: listID=GB/T 4762, listAgencyID=CN, listVersionID=1984, listAgencySchemeID=ISO 3166-1 and listAgencySchemeAgencyID="5" (entry for ISO in DE3055). The data type GDT PoliticalPartyAffiliationTypeCode may use the following codes: 1 (i.e., Member of the Communist Party of the People's Republic of China), 2 (i.e., Preparatory member of the Communist Party of the People's Republic of China) and 3 (i.e., Member of the China Communist Youth League.)

For the PostalCode there may be a unique code list for each country. The information regarding the country in question can be known from the context. The data type PostalCode could be used to specify a postcode in an address. PostalCode can be used to represent different postcodes. There may be a unique code list for each country.

The qualifier may have the following values: StreetPostalCode (i.e., Street postcode), POBoxPostalCode (i.e., PO Box postcode) and CompanyPostalCode (i.e., Company postcode.) For each country there is a central authority that administers the list of all postcodes.

PowerOfAttorneyTypeCode

A GDT PowerOfAttorneyTypeCode represents, in the form of a code, the type of rights or power of attorney that someone has. An example of GDT PowerOfAttorneyTypeCode is:

<PowerOfAttorneyTypeCode>1</PowerOfAttorneyTypeCode>

In certain implementations, PowerOfAttorneyTypeCode may have the following structure:

| GDT | | Cat. | Object Class | Property | Representation/ Association | Type | Type Name | Len. | Card. | Remarks |
|---|---|---|---|---|---|---|---|---|---|---|
| PowerOfAttorneyTypeCode | | | | Power Of Attorney Type | Code | CDT | Code | 1 | | Restricted |
| | listID | A | Code List | Identification | Identifier | xsd | token | | 0..1 | |
| | listAgencyID | A | Code List Agency | Identification | Identifier | xsd | token | | 0..1 | |
| | listVersionID | A | Code List | Version | Identifier | xsd | token | | 0..1 | |
| | listAgencySchemeID | A | Code List Agency | Scheme | Identifier | xsd | token | | 0..1 | |
| | listAgencySchemeAgencyID | A | Code List Agency | Scheme Agency | Identifier | xsd | token | | 0..1 | |

PostalCode

A GDT PostalCode is a coded representation of a postcode. An example of GDT PostalCode is:

<PostalCode>69190</PostalCode>

In certain implementations, GDT PersonnelTimeID may have the following structure:

| GDT | Object Class | Representation/ Association | Type | Type Name | Len. | Remarks |
|---|---|---|---|---|---|---|
| PostalCode | Postal Code | Code | CDT | Code | 0..10 | restricted |

A customer-specific code list is assigned to the code. A customer determines the codes in the code list. The data type GDT PowerOfAttorneyTypeCode may use the following codes: listID="10365", listAgencyID=ID of the customer (ID from DE 3055, if listed there), listVersionID=Version of the particular code list. Assigned and managed by the customer, listAgencySchemeID=Version of the particular code list and listAgencySchemeAgencyID=ID of the organization from DE 3055 that manages the listAgencySchemeID scheme.

The GDT PowerOfAttorneyTypeCode can be used to express which power of attorney a person has in a company. Examples of the possible semantics of the codes are: General power of attorney—the power of attorney is a general power of attorney and General commercial power of attorney—the power of attorney is a general commercial power of attorney.

Price

A GDT Price is the exchange value, expressed in a monetary unit, of a product or a service in relation to a basic amount. An example of GDT Price is:

<NetPrice>
<Amount currencyCode="EUR">32.14</Amount>
<BaseQuantity unitCode="C62">1</BaseQuantity>
</NetPrice>

In certain implementations, GDT Price may have the following structure:

| GDT | | Cat. | Object Class | Property | Representation/Association | Type | Type Name | Card. |
|---|---|---|---|---|---|---|---|---|
| Price | | | Price | | Details | | | |
| | Amount | E | Price | Amount | Amount | CDT | Amount | 1 |
| | BaseQuantity | E | Price | Base | Quantity | CDT | Quantity | 1 |

Price can be used for the price of goods, products, and services, such as the following examples: Natural price, Market price, Unit price, Total price and Recommended price, among others.

PriceComponent

A GDT PriceComponent is a component of the calculated price. Calculated price is the result of the price calculation that is either calculated from manually entered or automatically determined price specifications, or cumulated from other price components in the same business transaction document. An example of GDT PriceComponent would be where:

For example, the first PriceComponent may be a quantity dependent price in the 1st position of the pricing procedure, which was automatically determined to be 10 EUR per 5 Pieces. With the sales quantity ordered for this item being 1 carton, which contains 50 pieces, the calculated PriceComponent Value will be € 10/5 pieces×50 Pieces=100 EUR.

The second PriceComponent is a percentage discount in the 2nd position of the pricing procedure, which was automatically determined to be −5%. The calculated PriceComponent Value will be 5% of 100 EUR=5 EUR.

<PriceComponent>
<TypeCode>000</TypeCode>
<MajorLevelOrdinalNumberValue>1</MajorLevelOrdinalNumberValue>
<MinorLevelOrdinalNumberValue>1</MinorLevelOrdinalNumberValue>
<Rate>
<DecimalValue>10.00</DecimalValue>
<CurrencyCode>EUR</CurrencyCode>
<BaseDecimalValue>5</BaseDecimalValue>
<BaseMeasureUnitCode>C62</BaseMeasureUnitCode>
</Rate>
<QuantityConversionRate>
<DecimalValue>1</DecimalValue>
<MeasureUnitCode>CT</MeasureUnitCode>
<BaseDecimalValue>50</BaseDecimalValue>
<BaseMeasureUnitCode>C62</BaseMeasureUnitCode>
</QuantityConversionRate>
<CalculationBasis>
<PriceSpecificationBaseCode>3</PriceSpecificationBaseCode>
<Quantity unitCode="C62">50</Quantity>
</CalculationBasis>
<CalculatedAmount currencyCode="EUR">100.00</CalculatedAmount>
<RoundingDifferenceAmount currencyCode="EUR">0.00</RoundingDifferenceAmount>
<EffectiveIndicator>false</EffectiveIndicator>
<ManuallyChangedIndicator>false</ManuallyChangedIndicator>
<GroupedIndicator>false</GroupedIndicator>
<OriginTypeCode>3</OriginTypeCode>
</PriceComponent>
<PriceComponent>
<TypeCode>2000</TypeCode>
<MajorLevelOrdinalNumberValue>2</MajorLevelOrdinalNumberValue>
<MinorLevelOrdinalNumberValue>1</MinorLevelOrdinalNumberValue>
<Rate>
<DecimalValue>−5.00</DecimalValue>
<MeasureUnitCode>P1</MeasureUnitCode>
</Rate>
<CalculationBasis>
<PriceSpecificationBaseCode>1</PriceSpecificationBaseCode>
<Amount currencyCode="EUR">100.00</Amount>
</CalculationBasis>
<CalculatedAmount currencyCode="EUR">95.00</CalculatedAmount>
<RoundingDifferenceAmount currencyCode="EUR">0.00<RoundingDifferenceAmount>
<EffectiveIndicator>false</EffectiveIndicator>
<ManuallyChangedIndicator>false<ManuallyChangedIndicator>
<GroupedIndicator>false</GroupedIndicator>
<OriginTypeCode>3</OriginTypeCode>
</PriceComponent>

In certain implementations, GDT PriceComponent may have the following structure:

| GDT | | Cat. | Object Class | Property | Representation/Association | Type | Type Name | Card. |
|---|---|---|---|---|---|---|---|---|
| PriceComponent | | | Price Component | | Details | | | |
| | TypeCode | E | Price Component | Price Specification Element Type | Code | GDT | PriceSpecificationElementTypeCode | 0..1 |
| | MajorLevelOrdinalNumberValue | E | Price Component | Major Level Ordinal Number | Value | GDT | OrdinalNumberValue | 1 |
| | MinorLevel- | E | Price | Minor Level | Value | GDT | OrdinalNum- | 1 |

-continued

| GDT | | Cat. | Object Class | Property | Representation/ Association | Type | Type Name | Card. |
|---|---|---|---|---|---|---|---|---|
| | OrdinalNumberValue | | Component | Ordinal Number | | | berValue | |
| | Rate | E | Price Component | Rate | Rate | CDT | Rate | 1 |
| | QuantityConversionRate | E | Price Component | Quantity Conversion | Rate | CDT | Rate | 0..1 |
| | CalculationBasis | E | Price Component | Calculation Basis | Details | GDT | PriceComponentCalculationBasis | 1 |
| | CalculatedAmount | E | Price Component | Calculated | Amount | CDT | Amount | 1 |
| | RoundingDifferenceAmount | E | Price Component | Rounding Difference | Amount | CDT | Amount | 1 |
| | ExchangeRate | E | Price | Exchange Component | Rate | GDT | ExchangeRate | 0..1 |
| | InactivityReasonCode | E | Price Component | Inactivity Reason | Code | GDT | PriceComponentInactivityReasonCode | 0..1 |
| | EffectiveIndicator | E | Price Component | Effective | Indicator | GDT | EffectiveIndicator | 1 |
| | ManuallyChangedIndicator | E | Price Component | Manually Changed | Indicator | GDT | ManuallyChangedIndicator | 1 |
| | GroupedIndicator | E | Price Component | Grouped | Indicator | GDT | GroupedIndicator | 1 |
| | ItemHierarchyEvaluationMethodCode | E | Price Component | Item Hierarchy Evaluation Method | Code | GDT | PriceComponentItemHierarchy EvaluationMethodCode | 0..1 |
| | OriginCode | E | Price Component | Origin | Code | GDT | PriceComponentOriginCode | 1 |
| | FixationCode | E | Price Component | Fixation | Code | GDT | PriceComponentFixationCode | 0..1 |
| | PriceSpecificationUUID | E | Price Component | Price Specification Universally Unique Identification | Identifier | GDT | PriceSpecificationUUID | 0..1 |
| | PriceSpecificationDeterminationDateTime | E | Price Component | Price Specification Determination | Date Time | CDT | DateTime | 0..1 |
| | ScaleAxisStepDeterminationBasis | E | Price Component | Scale Axis Step Determination Basis | Details | GDT | ScaleAxisStepDeterminationBasis | 0..1 |

GDT PriceComponent can contain the following Elements: TypeCode can be the coded representation of the type of a PriceComponent. see GDT: PriceSpecificationElementTypeCode. MajorLevelOrdinalNumberValue can be the major sequential order of the determined Price Component in the Price calculation process. That can be defined in the pricing procedure. MinorLevelOrdinalNumberValue can be the minor (subordinate) sequential number of all Price Components sharing the same MajorLevelOrdinalNumberValue. The sequential position of a price component within a sequentially sorted group of price components can have the same MajorLevelOrdinalNumberValue. Rate can be a monetary or a percentage rate of a PriceComponent representing a price, discount or a surcharge and it contains numerator and denominator information that make up the monetary amount or percentage.

QuantityConversionRate can be conversion rate in which the quantity unit of the business transaction document's Item can be converted into the BaseMeasureUnit of the Rate (the quantity unit of the denominator of the price component). CalculationBasis can be the basis upon which the Price Component amount is calculated. CalculatedAmount can be the amount which has been calculated during price calculation. RoundingDifferenceAmount can be the amount of the rounding difference when calculating the price components. ExchangeRate can be the exchange rate in which the currency of the Rate can be exchanged into the reference currency.

The reference currency is given by the context. InactivityReasonCode can be the coded representation of the reason why the price component is inactive. If the InactivityReasonCode is set, then the Price component is inactive. EffectiveIndicator can be the indicator to whether, if the price component could be effective in the price calculation, or not. ManuallyChangedIndicator can be the indicator whether the price component was manually processed or not. GroupedIndicator can be the indicator whether the price component could be grouped with the corresponding price component of the other items in the same business transaction document and therefore processed together, or not.

ItemHierarchyEvaluationMethodCode is the coded representation of the Evaluation Method of the Item's Hierarchy of the underlying business document for this Price Component. OriginCode can be the coded representation of the origin of the price component. FixationCode can be the coded representation of the fixation of the price component.

PriceSpecificationUUID can be a universally unique identifier of the price specification of a price, discount or surcharge used within the price component as an internal reference to the price specification Master Data. PriceSpecificationDeterminationDateTime can be the date and time at which the price specification of a price, discount or surcharge was determined for the price component. ScaleAxisStepDeterminationBasis can be the basis upon which the determination, of the scale line of the price specification of a price, discount or surcharge, is made.

belonging to items of a business transaction document; The time part of the element PriceSpecificationDeterminationDateTime will not be considered in the determination of the price specification.

The following sub elements of the GDT PriceComponent correspond to the following ERB system names: MajorLevelOrdinalNumberValue corresponds to Pricing Procedure Step Number STUNR; MinorLevelOrdinalNumberValue corresponds to condition counter; at Header level ZAEKO, and is at Item level ZAEHK.

PriceComponentCalculationBasis

A GDT PriceComponentCalculationBasis is the basis upon which a price component is calculated. The basis for the calculation of a price component mainly consists of a quantity or an amount for which the rate is to be applied in order to calculate the amount of the price component. An example of GDT PriceComponentCalculationBasis is:

<PriceComponentCalculationBasis>
<BaseCode>3</BaseCode>
<Quantity unitCode="C62">100 </Quantity>
<IntervalFactorValue>0.40</IntervalFactorValue>
</PriceComponentCalculationBasis>

In certain implementations, GDT PriceComponentCalculationBasis may have the following structure:

| GDT | | Cat. | Object Class | Property | Representation/ Association | Type | Type Name | Card. |
|---|---|---|---|---|---|---|---|---|
| PriceComponent-CalculationBasis | | | Price Component Calculation Basis | | Details | | | |
| | BaseCode | E | Price Component Calculation Basis | Base Code | Code | GDT | PriceSpecifiactionBaseCode | 1 |
| | Quantity | E | Price Component Calculation Basis | Quantity | Quantity | CDT | Quantity | 0..1 |
| | Amount | E | Price Component Calculation Basis | Amount | Amount | CDT | Amount | 0..1 |
| | AdaptationFactorDecimalValue | E | Price Component Calculation Basis | Adaptation Factor Decimal | Value | GDT | DecimalValue | 0..1 |

Integrity Conditions can include: The QuantityConversionRate may exist if the quantity unit of the business transaction document's Item differs from the BaseMeasureUnitCode of the element Rate. In such cases, the quantity unit of the business transaction document's item corresponds to the MeasureUnitCode of the element QuantityConversionRate, and the BaseMeasureUnitCode of the element Rate corresponds to the BaseMeasureUnitCode of the element QuantityConversionRate; The Element QuantityConversionRate is not allowed to contain the CurrencyCode and BaseCurrencyCode as sub elements since, in this context, the element handies exclusively MeasureUnitCodes; The element ExchangeRate may exist if the CurrencyCode value of the element Rate differs from the reference currency value given by the context. In such cases, the UnitCurrency of the element ExchangeRate corresponds to the reference currency, and the QuotedCurrency of the element ExchangeRate corresponds to the CurrencyCode of the element Rate; The element PriceSpecificationID will only exist for price components PriceComponentCalculationBasis can contain the following elements: BaseCode can be the coded representation of the base upon which the value of the price component is calculated; Quantity can be the value of the calculation basis as a quantity; Amount can be the value of the calculation basis as an amount; AdaptationFactorDecimalValue can be an adaptation factor for the quantity resp. amount from which the value of the price component is calculated. One of the elements Amount or Quantity may exist.

PriceComponentFixationCode

A GDT PriceComponentFixationCode is the coded representation of the fixation of a price component. The fixation specifies how elements of a price component are fixed when a price component is recalculated. An example of GDT PriceComponentFixationCode is:

<PriceComponentFixationCode>1</PriceComponentFixationCode>

In certain implementations, GDT PriceComponentFixationCode may have the following structure:

| GDT | Object Class | Property | Representation/ Association | Type | Type Name | Len. | Remarks |
|---|---|---|---|---|---|---|---|
| PriceComponenFixationCode | Price Component | Fixation | Code | CDT | Code | 1..2 | Restricted |

PriceSpecificationBaseCode can be a fixed code list. The attributes of PriceComponentFixationCode have the following values: listID="10126", listAgencyID="310", listVersionID=Version of the relevant code list. Fixation can be used, for example, when price components are copied. The data type GDT PriceComponentFixationCode may use the following codes: 1 (i.e., Basis), 2 (i.e., Value), 3 (i.e., Basis-Value), 4 (i.e., Rate-Basis Value) and 5 (i.e., All.)

PriceComponentInactivityReasonCode

A GDT PriceComponentInactivityReasonCode is the coded representation of the reason why a pricing element is inactive. A pricing element is inactive if it is not used to calculate sub-sequent pricing elements in a pricing rule in the context of price calculation. An example of a GDT PriceComponentInactivityReasonCode is:

<PriceComponentInactivityReasonCode>02</PriceComponentInactivityReasonCode>

In certain implementations, GDT PriceComponentInactivityReasonCode may have the following structure:

| GDT | Object Class | Property | Representation/ Association | Type | Type Name | Len. | Remarks |
|---|---|---|---|---|---|---|---|
| PriceComponentInactivityReasonCode | Price Component | Inactivity Reason | Code | CDT | Code | 1..2 | Restricted |

There can be one code list. PriceComponentInactivityReasonCode can be a fixed code list. The attributes of PriceComponentInactivityReasonCode can have the following values: listID=10125, listAgencyID=310, listVersionID=Version of the relevant code list. The data type GDT PriceComponentInactivityReasonCode may use the following codes: 1 (i.e., Error), 2 (i.e., Subsequent Price), 3 (i.e., Item Ignored), 4 (i.e., Exclusion), 5 (i.e., Manual) and 6 (i.e., Invalid Scale Level).

PriceComponentItemHierarchyEvaluationMethodCode

A GDT PriceComponentItemHierarchyEvaluationMethodCode is the coded representation of the method used to evaluate the hierarchy of items in the underlying business transaction document for this price component. One item of the underlying business transaction document can be assigned to a price component on item level. If this item has a hierarchical structure, then the method describes the influence that the relevant price component of the higher-level item or subitem has on the price component of the actual item, for the purpose of evaluating the item hierarchy. An example of GDT PriceComponentItemHierarchyEvaluationMethodCode is:

<PriceComponentItemHierarchyEvaluationMethodCode>1 <PriceComponentItemHierarchyEvaluationMethodCode>

In certain implementations, GDT PriceComponentItemHierarchyEvaluationMethodCode may have the following structure:

| GDT | Object Class | Property | Representation/Association | Type | Type Name | Len. | Remarks |
|---|---|---|---|---|---|---|---|
| PriceComponentItemHierarchyEvaluationMethodCode | Price Component | Item Hierarchy Evaluation Method | Code | CDT | Code | 1..2 | Restricted |

PriceComponentItemHierarchyEvaluationMethodCode can be a fixed Codelist. The attributes of PriceComponentItemHierarchyEvaluationMethodCode can have the following values: listID=10124, listAgencyID=310, listVersionID=Version of the relevant code list.

Subitems can be used in bills of material, for example. In this case, the bill of material header can form the main item. A discount (for example, 10%) that may be entered manually on the bill of material header could be copied to all subitems. Conversely, the net price can usually be cumulated from the subitems to the bill of material header. PriceComponentItemHierarchyEvaluationMethodCode is a proprietary code list that can have a fixed predefined values. Changes to the permitted values can involve changes to the interface. The data type GDT PriceComponentItemHierarchyEvaluationMethodCode may use the following codes: 1 (i.e., Duplication) and 2 (i.e., Cumulation).

PriceComponentOriginCode

A GDT PriceComponentOriginCode is the coded representation of the origin of the price component. A price component can be created manually or automatically; it can be created automatically from several data sources. An example of GDT PriceComponentOriginCode is:

<PriceComponentOriginCode>1</PriceComponentOriginCode>

In certain implementations, GDT PriceComponentOriginCode may have the following structure:

| GDT | Object Class | Property | Representation/Association | Type | Type Name | Len. | Remarks |
|---|---|---|---|---|---|---|---|
| PriceComponentOriginCode | Price Component | Origin | Code | CDT | Code | 1..2 | Restricted |

GDT PriceComponentOriginCode can be a fixed code list. The attributes of GDT PriceComponentOriginCode can have the following values: listID=10123, listAgencyID=310 and listVersionID can be the version of the relevant code list. PriceComponentOriginCode can be a proprietary code list with fixed predefined values. Changes to the permitted values may involve changes to the interface. The data type GDT PriceComponentOriginCode may use the following codes: 1 (i.e., From external source), 2 (i.e., Manually), 3 (i.e., From the item), 4 (i.e., From the business transaction), 5 (i.e., From another business transaction) and 6 (i.e., From the higher-level item).

PriceDetailLevelCode

A GDT PriceDetailLevelCode is a coded representation of the level of detail of a price. An example of GDT PriceDetailLevelCode is:

<PriceDetailLevelCode>1</PriceDetailLevelCode>

In certain implementations, GDT PriceDetailLevelCode may have the following structure:

| GDT | | Cat. | Object Class | Property | Representation/Association | Type | Type Name | Len. | Card. | Remarks |
|---|---|---|---|---|---|---|---|---|---|---|
| PriceDetailLevelCode | | | Price | Detail Level | Code | CDT | Code | 1..2 | | restricted |
| | listVersionID | A | Code List | Version | Identifier | xsd | token | | 0..1 | |

GDT PriceDetailLevelCode can be a code list with fixed predefined values. Changes to the permitted values can involve changes to the interface. The attributes may have the following values: listID="10102" and listAgencyID="310." The data type GDT PriceDetailLevelCode may use the following code: listVersionID. PriceDetailLevelCode is for example used in a bidding process to show business partners which level of detail is expected regarding the price information. The data type GDT PriceDetailLevelCode may use the following codes: 1 (i.e., Simple Price), 2 (i.e., Complex Price) and 3 (i.e., No Price).

PriceRecalculationTypeCode

A GDT PriceRecalculationTypeCode is the coded representation of the type of a price recalculation. An example of GDT PriceRecalculationTypeCode is:

<PriceRecalculationTypeCode>C</PriceRecalculationTypeCode>

In certain implementations, GDT PriceRecalculationTypeCode may have the following structure:

| GDT | | Cat. | Object Class | Property | Representation/Association | Type | Type Name | Len. | Card. | Remarks |
|---|---|---|---|---|---|---|---|---|---|---|
| PriceRecalculationTypeCode | | | Price Recalculation | Type | Code | CDT | Code | 1 | | restricted |
| | listVersionID | A | Code List | Version | Identifier | Xsd | token | | 0..1 | |

A single fixed code list can be assigned to the PriceRecalculationTypeCode: listID="10374" and listAgencyID="310." The data type GDT PriceRecalculationTypeCode may use the following code: listVersionID. For example when copying one business transaction document or item into another, or when a price calculation update is triggered, then GDT PriceRecalculationTypeCode may be used to specify the behavior of the price calculation. The data type GDT PriceRecalculationTypeCode may use the following codes: B (i.e., Redetermine All Rates), C (i.e., Keep Manually changed Rates), D (i.e., Keep All Rates) and G (i.e., Redetermine Taxes Rates).

PriceSpecificationBaseCode

A GDT PriceSpecificationBaseCode is the coded representation of the measurement on which the amount component of a price, discount, or surcharge specification is based. Examples of measurement characteristics are gross weight, net weight, or volume. An example of GDT PriceSpecificationBaseCode is:

<PriceSpecificationBaseCode>1</PriceSpecificationBaseCode>

In certain implementations, GDT PriceSpecificationBaseCode may have the following structure:

| GDT | Object Class | Property | Representation/Association | Type | Type Name | Len. | Card. | Remarks |
|---|---|---|---|---|---|---|---|---|
| PriceSpecificationBaseCode | Price Specification | Base | Code | CDT | Code | 1..2 | | Restricted |

There can be one code list. GDT PriceSpecificationBaseCode can be a fixed code list. Description of the attributes: listID="10082", listAgencyID=310 and listID—ID of the relevant code list, still to be specified. GDT PriceSpecificationBaseCode can be used for maintaining sales or purchasing price specifications. GDT PriceSpecificationBaseCode can influence the method of price calculation in a business transaction. The calculation of the price, discount, or surcharge can be done on the basis of the specification of the price, discount, or surcharge by means of the PriceSpecificationBaseCode, and on the basis of the document data provided by the calling system.

The data type GDT PriceSpecificationBaseCode may use the following codes: 1 (i.e., Percentage (of one hundred)), 2 (i.e., Fixed Amount), 3 (i.e., Quantity), 4 (i.e., Gross Weight), 5 (i.e., Net Weight), 6 (i.e., Volume), 7 (i.e., Formula), 8 (i.e., Percent (included in one hundred, or of one hundred)), 9 (i.e., Percentage (Travel Expenses)), 10 (i.e., Points), 11 (i.e., Quantity—Monthly Price), 12 (i.e., Quantity—Annual Price), 13 (i.e., Quantity—Daily Price), 14 (i.e., Quantity—Weekly Price), 15 (i.e., Distance)16, (i.e., Number of Shipping Units) and 17 (i.e., Percentage (Financing)).

PriceSpecificationContextObjectTypeCode

A GDTPriceSpecificationContextObjectTypeCode is the coded representation of the type of object within which the specification of prices, discounts and surcharges takes place. An example of GDT PriceSpecificationContextObjectTypeCode is:

<PriceSpecificationSpecificationContextCode>1/PriceSpecificationSpecificationContextCode>

In certain implementations, PriceSpecificationContextObjectTypeCode may have the following structure:

| GDT | Object Class | Property | Representation/Association | Type | Type Name | Len. | Remarks |
|---|---|---|---|---|---|---|---|
| PriceSpecification-ContextObject-TypeCode | Price Specification | Context Object Type | Code | CDT | Code | 1..2 | Restricted |

One fixed code list can be assigned to PriceSpecificationContextObjectTypeCode. The attributes could be as follows: listID="10161", listAgencyID="310", listVersionID can be the version of the relevant code list. The type of object would be relevant during checks or default values for elements of the specification for prices, discounts, or surcharges that are only valid within this object. In this way, for price specifications that are assigned to a purchasing contract item, the unit of currency may correspond as an element of the price specification with the unit of currency that is already specified in the purchasing contract item.

A further example of the usage of the type of object within the maintenance of prices, discounts, or surcharges in CRM is the maintenance of product price specifications in CRM product master for a selected product. Those elements of the price specification that refer to the selected product are filled in the dependent maintenance for product price specifications from the surrounding product master maintenance based on program logic, and therefore no longer need to be entered by the user.

The data type GDT PriceSpecificationContextObjectTypeCode may use the following codes: 1 (i.e., Purchase Contract), 2 (i.e., Sales Contract), 3 (i.e., General Maintenance of Price Specifications), 4 (i.e., Product Master) and 5 (i.e., Business Partner Master).

PriceSpecificationCustomerGroupCode

A GDT PriceSpecificationCustomerGroupCode is the coded representation of a group of customers for whom the same price determination applies. An example of GDT PriceSpecificationCustomerGroupCode is:

<PriceSpecificationCustomerGroupCode>1</PriceSpecificationCustomerGroupCode>

In certain implementations, GDT PriceSpecificationCustomerGroupCode may have the following structure:

| GDT | | Cat. | Object Class Qualifier | Object Class | Property | Representation/Association | Type | Type Name | Len. | Card. |
|---|---|---|---|---|---|---|---|---|---|---|
| PriceSpecification-Customer-Group-Code | | | Price Specification | Customer Group | | Code | CDT | Code | 1..2 | |
| | listID | A | | Code List | Identification | Identifier | xsd | token | | 0..1 |
| | list-AgencyID | A | | Code List Agency | Identification | Identifier | xsd | token | | 0..1 |
| | list-VersionID | A | | Code List | Version | Identifier | xsd | token | | 0..1 |
| | list-Agency-SchemeID | A | | Code List Agency | Scheme | Identifier | xsd | token | | 0..1 |
| | list-Agency-Scheme-AgencyID | A | | Code List Agency | Scheme Agency | Identifier | xsd | token | | 0..1 |

A customer-specific code list can be assigned to the code. A customer can determine the codes in the code list. The data type GDT PriceSpecificationCustomerGroupCode may use the following codes: listID="10366", listAgencyID, listVersionID, listAgencySchemeID and listAgencySchemeAgencyID.

The PriceSpecificationCustomerGroupCode may currently be used in business objects and A2A messages. The PriceSpecificationCustomerGroupCode can be used, for example, for price determination in sales orders, in order to determine prices that apply to the customer. Examples of the possible semantics of the codes are: Bulk buyers—customers who are granted a price for bulk buyers; Occasional buyers—customers who are not granted a discount; New customers: customers who are granted a discount for new customers.

PriceSpecificationElement

A GDT PriceSpecificationElement is the specification of a price, a discount, a surcharge, or a tax that depends on a combination of properties, and that is valid for a specific period of time. An example of GDT PriceSpecificationElement is:

<PriceSpecificationElement>
<TypeCode>PR01</TypeCode>
<CategoryCode>1</CategoryCode>
<PurposeCode>1010</PurposeCode>
<ValidityPeriod>

```
<IntervalBoundaryTypeCode>3</IntervalBoundaryTypeCode>
<StartTimePoint>
  <TypeCode>1</TypeCode>
  <Date>2006-01-01</Date>
</StartTimePoint>
<EndTimePoint>
  <TypeCode>1</TypeCode>
  <Date>2008-12-31</Date>
</EndTimePoint>
</ValidityPeriod>
<PropertyDefinitionClassCode>2</PropertyDefinitionClassCode>
<PropertyValuation>
<PriceSpecificationElementPropertyReference>
  <PriceSpecificationElementPropertyID>PRODUCT_ID</PriceSpecificationElementPropertyID>
</PriceSpecificationElementPropertyReference>
<PriceSpecificationElementPropertyValue>
  <ID>4711</ID>
</PriceSpecificationElementPropertyValue>
</PropertyValuation>
<Rate>
<Value>29.99</Value>
<CurrencyCode>EUR</CurrencyCode>
<BaseMeasureUnitCode>C62</BaseMeasureUnitCode>
</Rate>
</PriceSpecificationElement>
```

Specification of a discount for a product depending on the delivery location: A discount of 5% may be granted for the product that is represented by the identifier 4711 for delivery to Paris (represented by the location identifier F75). The discount is valid from 1.1.2006 until 31 Dec. 2008.

PurposeCode 1200 may represent a PriceSpecificationElement based on special properties for the master data used according to GDT PriceSpecificationElementPurposeCode; PropertyDefinitionClassCode 2 represents the property definition class of a PriceSpecificationElement for the business environment “Sales” according to the GDT PriceSpecificationElementPropertyDefinitionClassCode.)<

```
<PriceSpecificationElement>
<TypeCode>RA01</TypeCode>
<CategoryCode>2</CategoryCode>
<PurposeCode>1200</PurposeCode>
<ValidityPeriod>
<IntervalBoundaryTypeCode>3</IntervalBoundaryTypeCode>
<StartTimePoint>
  <TypeCode>1</TypeCode>
  <Date>2006-01-01</Date>
</StartTimePoint>
<EndTimePoint>
  <TypeCode>1</TypeCode>
  <Date>2008-12-31</Date>
</EndTimePoint>
</ValidityPeriod>
<PropertyDefinitionClassCode>2</PropertyDefinitionClassCode>
<PropertyValuation>
<PriceSpecificationElementPropertyReference>
  <PriceSpecificationElementPropertyID>PRODUCT_ID</PriceSpecificationElementPropertyID>
</PriceSpecificationElementPropertyReference>
<PriceSpecificationElementPropertyValue>
  <ID>4711</ID>
</PriceSpecificationElementPropertyValue>
</PropertyValuation>
<PropertyValuation>
<PriceSpecificationElementPropertyReference>
  <PriceSpecificationElementPropertyID>LOCATION_ID</PriceSpecificationElementPropertyID>
</PriceSpecificationElementPropertyReference>
<PriceSpecificationElementPropertyValue>
  <ID>F75</ID>
</PriceSpecificationElementPropertyValue>
</PropertyValuation>
<Percent>–5</Percent>
</PriceSpecificationElement>
```

As an alternative to

```
<Percent>–5</Percent>
```

it is also possible to use

```
<Rate>
<Value>–5</Value>
<MeasureUnitCode>P1</MeasureUnitCode>
</Rate>
```

as MeasureUnitCode P1 represents percent according to UN/ECE recommendation #20.

In certain implementations, GDT PersonnelTimeID may have the following structure:

| GDT | | Cat. | Object Class | Property | Representation/Association | Type | Type Name | Card. |
|---|---|---|---|---|---|---|---|---|
| PriceSpecificationElement | | | Price Specification Element | | Details | | | |
| | TypeCode | E | Price Specification Element | Type | Code | GDT | PriceSpecificationElementTypeCode | 1 |
| | CategoryCode | E | Price Specification Element | Category | Code | GDT | PriceSpecificationElementCategoryCode | 0..1 |
| | PurposeCode | E | Price Specification Element | Purpose | Code | GDT | PriceSpecificationElementPurposeGroupCode | 0..1 |
| | ValidityPeriod | E | Price Specification Element | Validity Period | Details | GDT | TimePointPeriod | 1 |
| | PropertyDefinitionClassCode | E | Price Specification Element | Property Definition Class | Code | GDT | PriceSpecificationElementPropertyDefinitionClassCode | 0..1 |

-continued

| GDT | | Cat. | Object Class | Property | Represen-tation/As-sociation | Type | Type Name | Card. |
|---|---|---|---|---|---|---|---|---|
| | Property-Valuation | E | Price Spec-ification Element | Property Valuation | Details | GDT | PriceSpecifica-tionElement-PropertyValua-tion | 1..n |
| | Rate | E | Price Spec-ification Element | Rate | Rate | CDT | Rate | 0..1 |
| | Percent | E | Price Spec-ification Element | Percent | Percent | CDT | Percent | 0..1 |
| | Fixed-Amount | E | Price Spec-ification Element | Fixed Amount | Amount | CDT | Amount | 0..1 |
| | ScaleLine | E | Price Spec-ification Element | Scale Line | Details | GDT | PriceSpecifica-tionElement-ScaleLine | 0..n |

GDT PriceSpecificationElement can have the following elements: TypeCode—Coded representation of the type of the PriceSpecificationElement; CategoryCode—Coded representation of the category of the PriceSpecificationElement; PurposeCode—Coded representation of the purpose of the PriceSpecificationElement; ValidityPeriod—Validity period of the PriceSpecificationElement; PropertyDefinitionClassCode—Coded representation of the property definition class of the PriceSpecificationElement; PropertyValuation—Property valuation from whose combination the PriceSpecificationElement depends. Permitted properties are specified by the property definition class; The property valuation can be identifying or characterizing for the PriceSpecificationElement. The combination of identifying property valuations is unique for the PriceSpecificationElement together with the type and the end of the validity period.

Similarly, Rate can be the Monetary rate for the PriceSpecificationElement (no scale). In principle, the rate can also be a percentage or a fixed amount; Percent—Percentage for the PriceSpecificationElement (no scale); FixedAmount—Fixed amount for the PriceSpecificationElement (no scale); ScaleLine—Scale line of the PriceSpecificationElement;

The time points of the ValidityPeriod element may be provided as a date (to the day), that is, ValidityPeriod/StartTimePoint/TypeCode and ValidityPeriod/EndTimePoint/TypeCode may have value “1”. Specifying a property definition class in the element PropertyDefinitionClassCode is optional if the business environment for the PriceSpecificationElement is known to the application that uses the GDT PriceSpecificationElement, or the corresponding property definition class is known. If this is not the case, the element may be specified.

Furthermore, a property definition class that is specified in the PropertyDefinitionClassCode element may have a higher priority than the one that is known from the application’s business environment. The PropertyValuation elements may contain value assignments for properties for which a property reference is defined with the known property definition class. None of these property references may be included in more than one PropertyValuation element. At least one PropertyValuation element may be identifying, that is, have the value “true” for PropertyValuation/IdentifyingIndicator.

Either one Rate, Percent or FixedAmount element can be specified, or there may be one or more ScaleLine elements. If one of the Rate, Percent or FixedAmount elements is specified, no ScaleLine element may exist. If at least one ScaleLine element is specified, none of the elements Rate, Percent or Fixed Amount may exist. The numerator of the Rate element may not be nondimensional. The numerator dimension may be a currency or percentage. If the Rate element represents a percentage or fixed amount, the elements Rate/BaseValue, Rate/BaseMeasureUnitCode and Rate/BaseCurrencyCode may not be specified for this. In all ScaleLine elements, the same type of scale value ScaleLine/Rate, ScaleLine/Percent or ScaleLine/FixedAmount may be specified. In all ScaleLine elements, the number of ScaleLine/AxisStep elements may be equal. In all ScaleLine elements, ScaleLine/AxisStep/IntervalBoundaryTypeCode may have to be equal for all ScaleLine/AxisStep with the same ScaleLine/Axis-Step/ScaleAxisBaseCode.

PriceSpecificationElementCategoryCode

A GDT PriceSpecificationElementCategoryCode is the coded representation for the category of PriceSpecificationElements. A PriceSpecificationElement is the specification of a price, a discount, a surcharge, or a tax. An example of PriceSpecificationElementCategoryCode is:

<PriceSpecificationElementCategoryCode>1</PriceSpecificationElementCategoryCode>

In certain implementations, GDT PriceSpecificationElementCategoryCode may have the following structure:

| GDT | Object Class | Represen-tation/As-sociation | Type | Type Name | Len. | Remarks |
|---|---|---|---|---|---|---|
| PriceSpec-ifiaction-Element-Category-Code | Price Speci-fication Element Category | Code | CDT | Code | 1 | Restricted |

There can be one code list. The GDT PriceSpecificationElementCategoryCode can be a fixed Codelist. The attributes of the GDT PriceSpecificationElementCategoryCode can be implicit and have the following values: listID=10314, listAgencyID=310, listVersionID=[Version of the relevant code list.] The GDT PriceSpecificationElementCategoryCode can be used to roughly classify a PriceSpecificationElement according to its basic economic relevance. The data type GDT PriceSpecificationElementCategoryCode may use the following codes: 1 (i.e., Price), 2 (i.e., Discount), 3 (i.e., Surcharge) and 4 (i.e., Tax).

PriceSpecificationElementPropertyDefinitionClassCode

A GDT PriceSpecificationElementPropertyDefinitionClassCode is the coded representation of a property definition class of a PriceSpecificationElement. A PriceSpecificationElement is the specification of a price, a discount, a surcharge, or a tax. The GDT PriceSpecificationElementPropertyDefinitionClass classifies a class for defining properties for which a PriceSpecificationElement is possible. It defines the business environment according to the functional unit in an organization in which the PriceSpecificationElement is used, and which (, regardless of the underlying organizational structure,) is responsible for the respective activities. The properties defined in the GDT PriceSpecificationElementPropertyDefinitionClass represent the characteristics of this business environment. An example of GDT PriceSpecificationElementPropertyDefinitionClassCode is:

<PriceSpecificationElementPropertyDefinitionClassCode>1</PriceSpecificationElementPropertyDefinitionClassCode>

In certain implementations, GDT PersonnelTimeID may have the following structure:

| GDT | Object Class | Representation/Association | Type | Type Name | Len. | Remarks |
|---|---|---|---|---|---|---|
| PriceSpecificationElementPropertyDefinitionClassCode | Price Specification Element Property Definition Class | Code | CDT | Code | 1..2 | restricted |

One fixed code list can be assigned to the code. The attributes would be assigned values as follows: listID="10459" and listAgencyID="310." The data type GDT PriceSpecificationElementPropertyDefinitionClassCode may use the following codes: 1 (i.e., Procurement) and 2 (i.e., Sales.)

PriceSpecificationElementPropertyID

A GDT PricingPriceSpecificationElementPropertyID is a unique identifier of a property for the specification of a price, discount or surcharge. Properties are determining elements on whose combination the agreement of a price, discount or surcharge is dependent. An example of GDT PriceSpecificationElementPropertyID is:

<PriceSpecificationElementPropertyID>
PRODUCT_ID
</PriceSpecificationElementPropertyID>

In certain implementations, GDT PriceSpecificationElementPropertyID may have the following structure:

| GDT | Object Class | Property | Representation/Association | Type | Type Name | Len. | Remarks |
|---|---|---|---|---|---|---|---|
| PriceSpecificationElementPropertyID | PriceSpecificationElementProperty | Identification | Identifier | CDT | Identifier | 1..30 | restricted |

The property that is described by the identifier may be unique within the PriceSpecificationElementPropertyDefinitionClass property definition class. The property can be assigned to several property definition classes.

PriceSpecificationElementPropertyReference

A GDT SpecificationElementPropertyReference is the unique reference of a property for the specification of a price, discount or surcharge within a property definition class. An example of GDT SpecificationElementPropertyReference is:

<PriceSpecificationElementPropertyReference>
<PriceSpecificationElementPropertyID>
PRODUCT_ID
</PriceSpecificationElementPropertyID>
<PriceSpecificationElementPropertyDefinitionClassID>
SALES
</PriceSpecificationElementPropertyDefinitionClassID>
</PriceSpecificationElementPropertyReference>

In certain implementations, GDT SpecificationElementPropertyReference may have the following structure:

| GDT | | Cat. | Object Class | Property | Representation/Association | Type | Type Name | Card. |
|---|---|---|---|---|---|---|---|---|
| PriceSpecificationElementPropertyReference | | | Price Specification Element Property Reference | | Details | | | |
| | PriceSpecificationElementPropertyID | E | Price Specification Element Property Reference | Price Specification Element Property Identification | Identifier | GDT | PriceSpecificationElementPropertyID | 1 |
| | PriceSpecificationElementPropertyDefinitionClassID | E | Price Specification Element Property Reference | Price Specification Element Property Definition ClassI dentification | Identifier | GDT | PriceSpecificationElementPropertyDefinitionClassID | 0..1 |

PriceSpecificationElementPropertyID—Identifier of a property for the specification of a price, discount or surcharge.

PriceSpecificationElementPropertyDefinitionClassID—Identifier of a property definition class for the specification of a price, discount or surcharge. The referenced property can be defined for a property definition class. Specification of the PriceSpecificationElementPropertyDefinitionClassID element is only optional, if the property definition class is known uniquely in the respective context.

PriceSpecificationElementPropertyValuation

A GDT PriceSpecificationElementPropertyValuation is the assignment of a value to a property for the specification of a price, discount or surcharge. A property valuation is carried out when specifying a price, discount or surcharge to determine the specification. The property valuation can identify or characterize the specification. The combination of properties with an identifying property valuation is unique together with the validity period and the type of specification. Examples of GDT PriceSpecificationElementPropertyValuation may include:

<PriceSpecificationElementPropertyValuation>
<PriceSpecificationElementPropertyReference>
<PriceSpecificationElementPropertyID>
PRODUCT_ID
</PriceSpecificationElementPropertyID>
<PriceSpecificationElementPropertyDefinitionClassID>
SALES
</PriceSpecificationElementPropertyDefinitionClassID>
</PriceSpecificationElementPropertyReference>
<PriceSpecificationElementPropertyValue>
<ID schemeID="Kühlschränke">4711</ID>
<PriceSpecificationElementPropertyValue>
</PriceSpecificationElementPropertyValuation>

In certain implementations, GDT PriceSpecificationElementPropertyValuation may have the following structure:

| GDT | | Cat. | Object Class | Property | Representation/Association | Type | Type Name | Card. |
|---|---|---|---|---|---|---|---|---|
| PriceSpecification-ElementProperty-Valuation | | | Price Specification Element Property Valuation | | Details | | | |
| | TypeIndicator | E | PriceSpecificationElement-Property-Valuation | IType | Indicator | CDT | Indicator | 0..1 |
| | PriceSpecificationElement-Property-Reference | E | PriceSpecificationElement-Property-Valuation | PriceSpecificationElement-Property Reference | Details | GDT | PriceSpecificationElementPropertyReference | 1 |
| | PriceSpecificationElement-PropertyValue | E | PriceSpecificationElement-Property-Valuation | PriceSpecificationElement-Property | Value | GDT | PriceSpecificationElementPropertyValue | 1 |

TypeIndicator: Indicator that may specify if the respective property valuation can identify or characterize the specification of the price, discount or surcharge. The permitted values can be: 1—identifying property valuation and 0—characterizing property valuation. The default value can be "1", if the element is not used.

PriceSpecificationElementPropertyReference: The reference to the underlying property for which the property valuation may be represented. PriceSpecificationElementPropertyValue Value of the referenced property.

PriceSpecificationElementPropertyValue

A GDT PriceSpecificationElementPropertyValue is a value that is assigned to a property within a property valuation of a PriceSpecificationElement. A PriceSpecificationElement is the specification of a price, a discount, a surcharge, or a tax. An example of GDT PriceSpecificationElementPropertyValue is:

<PriceSpecificationElementPropertyValue>
<IntegerValue>
1
</IntegerValue>
</PriceSpecificationElementPropertyValue>

In certain implementations, GDT PriceSpecificationElementPropertyValue may have the following structure:

| GDT | | Cat. | Object Class | Property | Rep./Ass. Qual. | Representation/Association | Type | Type Name | Card. |
|---|---|---|---|---|---|---|---|---|---|
| PriceSpecificationElementPropertyValue | | E | Price Specification Element Property Value | | | Details | | | |
| | Code | E | Price Specification Element Property Value | | | Code | GDT | PriceSpecificationElementPropertyValueCode | 0..1 |
| | ID | E | Price Specification Element Property Value | Identification | | Identifier | GDT | PriceSpecificationElementPropertyValueID | 0..1 |
| | Integer-Value | E | Price Specification Element | Integer Value | Integer | Value | GDT | Integer-Value | 0..1 |

-continued

| GDT | | Cat. | Object Class | Property | Rep./ Ass. Qual. | Represen-tation/As-sociation | Type | Type Name | Card. |
|---|---|---|---|---|---|---|---|---|---|
| | | | Property Value | | | | | | |
| | Date | E | Price Specification Element Property Value | Date | | Date | GDT | Date | 0..1 |
| | Time | E | Price Specification Element Property Value | Time | | Time | GDT | Time | 0..1 |
| | Indicator | E | Price Specification Element Property Value | Indicator | | Indicator | GDT | Indicator | 0..1 |

The structure of the GDT PriceSpecificationElementPropertyValue can describe the meta information of property values. The elements of the GDT PriceSpecificationElementPropertyValue can represent the types of the following tangible values: Code can be specification of the coded representation of something; ID can be specification of an identifier for something; Integer-value can be specification of a discrete, integer value; Date can be specification of a calendar day; Time can be specification of an exact time in seconds; Indicator can be specification of a binary logical value. One element from the quantity Code, ID, Text, IntegerValue, Date, Time, and Indicator may be entered. The element that is appropriate for the value may be used.

Code for example can be illustrated as specification of a color code, for example, for a car, red metallic (code 0042) (Colors can be used as properties within specifications for prices, discounts or surcharges: 1000 EUR surcharge for red metallic paint (code 0042).). ID for example can be illustrated as specification of an identifier for the location, for example, location of a company branch in Hamburg (ID 4711) or Paris (ID 4712) (Identifiers for locations can be used as properties within specifications for prices, discounts or surcharges: 5% discount for the delivery to a branch in Hamburg (ID 4711), 100 EUR surcharge for delivery to a branch in Paris (ID 4712).). IntegerValue for example can be illustrated as valuation of nondimensional, integer properties, such as codes, indexes, consecutive numbers. Date for example can be illustrated as Sell-by date, date of manufacture, date of filling, date of packing, date of release, cut off date, date of order, delivery date, and so on. Time for example can be illustrated as time stamp for specification of time of filling, production, checking, and so on to the second. Indicator for example can be illustrated as properties that can only adopt two characteristic values: yes/no, on/off, and so on.

PriceSpecificationElementPropertyValueCode

A GDT PriceSpecificationElementPropertyValueCode is the coded representation for something that represents a property value within a property valuation of a PriceSpecificationElement. A PriceSpecificationElement is the specification of a price, a discount, a surcharge, or a tax. Examples of GDT PriceSpecificationElementPropertyValueCode include:

<PriceSpecificationElementPropertyValueCode>
123
</PriceSpecificationElementPropertyValueCode>

In certain implementations, GDT PriceSpecificationElementPropertyValueCode may have the following structure:

| GDT | Object Class | Represen-tation/As-sociation | Type | Type Name |
|---|---|---|---|---|
| PriceSpecificationElementPropertyValueCode | Price Specification Element Property Value | Code | CDT | Code |

The entity to which the PriceSpecificationElementPropertyValueCode refers, can be defined in the property valuation by the respective property reference. The GDT PriceSpecificationElementPropertyValueCode may not have any static value lists. The GDT PriceSpecificationElementPropertyValueCode may be used within the GDT PriceSpecificationElementPropertyValue. The elements of the GDT PriceSpecificationElementPropertyValue can represent the types of the following permitted property values: If the property value is the coded representation for something, the element Code can be used with which the GDT PriceSpecificationElementPropertyValueCode is classified.

PriceSpecificationElementPropertyValueID

A GDT PriceSpecificationElementPropertyValueID is a unique identifier for something that represents a property value within a property valuation of a PriceSpecificationElement. A PriceSpecificationElement is the specification of a price, a discount, a surcharge, or a tax. An example of GDT PriceSpecificationElementPropertyValueID is:

<PriceSpecificationElementPropertyValueID>
PRD_4711
</PriceSpecificationElementPropertyValueID>

In certain implementations, GDT PriceSpecificationElementPropertyValueID may have the following structure:

| GDT | Object Class | Property | Represen-tation/As-sociation | Type | Type Name |
|---|---|---|---|---|---|
| PriceSpecificationElementPropertyValueID | Price Specification Element Property Value | Identification | Identifier | CDT | Identifier |

The entity to which the PriceSpecificationElementPropertyValueID would refer, can be defined in the property valuation by the corresponding property reference. The GDT PriceSpecificationElementPropertyValueID may be used within the GDT PriceSpecificationElementPropertyValue. The elements of the GDT PriceSpecificationElementPropertyValue represent the types of the following permitted property values: If the property value is the unique identifier for something, the element ID is used with which the GDT PriceSpecificationElementPropertyValueID is classified.

PriceSpecificationElementScaleLine

A GDT PriceSpecificationElementScaleLine can be a scale line of a PriceSpecificationElement. A PriceSpecificationElement can be the specification of a price, a discount, a surcharge, or a tax. To define a PriceSpecificationElement, you can use a one or two-dimensional scale. This scale can comprise scale lines that define a price, a discount, a surcharge or a tax as a scale value for each scale level. An example of GDT PriceSpecificationElementScaleLine is:

```
<PriceSpecificationElementScaleLine>
  <ScaleAxisStep>
  <ScaleAxisBaseCode>1</ScaleAxisBaseCode>
  <IntervalBoundaryTypeCode>1</IntervalBoundaryType-
    Code>
  <Quantity unitCode="C62">10</Quantity>
  </ScaleAxisStep>
  <Rate>
  <Value>29.99</Value>
  <CurrencyCode>EUR</CurrencyCode>
  <BaseMeasureUnitCode>C62</BaseMeasureUnitCode>
  </Rate>
</PriceSpecificationElementScaleLine>
```

In certain implementations, GDT PriceSpecificationElementScaleLine may have the following structure:

| GDT | | Cat. | Object Class | Property | Representation/Association | Type | Type Name | Card. |
|---|---|---|---|---|---|---|---|---|
| Price-Specification-Element-ScaleLine | | | Price Specification Element Scale Line | | Details | | | |
| | Scale-Axis-Step | E | Price Specification Element Scale Line | Scale Axis Step | Details | GDT | ScaleAxis-Step | 1..2 |
| | Rate | E | Price Specification Element Scale Line | Rate | Rate | CDT | Rate | 0..1 |
| | Percent | E | Price Specification Element Scale Line | Percent | Percent | CDT | Percent | 0..1 |
| | Fixed-Amount | E | Price Specification Element Scale Line | Fixed Amount | Amount | CDT | Amount | 0..1 |

GDT PriceSpecificationElementScaleLine may have the following elements: ScaleAxisStep can be defined as scale dimension value of a dimension of the scale level for which the scale line can be defined for the price, discount or surcharge specification; Rate can be the scale value as a monetary rate for prices, discounts or surcharges. In principle, the rate can also be a percentage or a fixed amount; Percent can be a scale value as a percentage for discounts or surcharges; FixedAmount can be a scale value as a fixed amount for discounts or surcharges.

The same ScaleAxisStep/ScaleAxisBaseCode may not be specified for different ScaleAxisStep elements. One of the elements Rate, Percent or FixedAmount may be available. The numerator of the Rate element may not be nondimensional. The numerator dimension may be a currency or a percentage. If the Rate element represents a percentage or a fixed amount, the elements Rate/BaseValue, Rate/BaseMeasureUnitCode and Rate/BaseCurrencyCode may not be specified for this. If an element that is typed by the GDT PriceSpecificationElementScaleLine has cardinality >1, the same type of scale value Rate, Percent or FixedAmount has to be specified in all instances. If an element that is typed by the GDT PriceSpecificationElementScaleLine has cardinality >1, the elements ScaleAxisStep have to be specified with the same number and the same values of ScaleAxisStep/ScaleAxisBaseCode in all instances.

PriceSpecificationElementPurposeCode

A GDT PriceSpecificationElementPurposeCode is the coded representation of the purpose of a PriceSpecificationElement. A PriceSpecificationElement is the specification of a price, a discount, a surcharge, or a tax. An example of GDT PriceSpecificationElementPurposeCode is:

```
<PriceSpecificationElementPurposeCode>1310</
PriceSpecificationElementPurposeCode>
```

In certain implementations, GDT PriceSpecificationElementPurposeCode may have the following structure:

| GDT | | Cat. | Object Class | Property | Representation/ Association | Type | Type Name | Len. | Card. | Remarks |
|---|---|---|---|---|---|---|---|---|---|---|
| Price-Specification-Element-Purpose-Code | | | Price Specification Element Purpose | | Code | CDT | Code | 1..4 | | Restricted |
| | list VersionID | A | Code List | Version | Identifier | xsd | token | | 0..1 | |

One fixed code list can be assigned to the code: listID="10460" and listAgencyID="310." The data type GDT PriceSpecificationElementPurposeCode may use the following code: listVersionID. Related standardized code lists, such as Price.Type.Code (UN/CEFACT 5375), or Price.Specification.Code (UN/CEFACT 5387) may not be used, since they have different semantics. In the first case, the categorization of prices according to specifications for the quantity of products, for example, takes up a lot of space, whereas in the second case, prices arise due to the business circumstances.

The data type GDT PriceSpecificationElementPurposeCode may use the following codes: 1000 (i.e., General), 1010 (i.e., Special), 1100 (i.e., Basis), 1110 (i.e., Recommendation), 1120 (i.e., Request), 1200 (i.e., Property), 1210 (i.e., Business Partner Classification), 1220 (i.e., Product Classification), 1230 (i.e., Product Configuration), 1300 (i.e., Promotion), 1310 (i.e., Event), 1320 (i.e., Recurring Promotion), 1340 (i.e., Coupon), 1400 (i.e., Business Process), 1410 (i.e., Processing), 1420 (i.e., Value Limit), 1430 (i.e., Quantity Limit), 1440 (i.e., Agreement), 3000 (i.e., Calculative Processing), 3010 (i.e., Free Goods), 3020 (i.e., Rounding Difference), 3100 (i.e., Term of Payment), 3110 (i.e., Cash Discount), 4000 (i.e., Costs), 4100 (i.e., Product Valuation), 4110 (i.e., Valuation Price), 4120 (i.e., Preliminary Order Cost Estimate), 4130 (i.e., Acquisition Price), 4200 (i.e., Transport Costs), 4210 (i.e., Packaging), 4220 (i.e., Freight), 5000 (i.e., Duty), 5100 (i.e., Tax) and 5200 (i.e., Customs Duty).

PriceSpecificationElementTypeCode

A GDT PriceSpecificationElementTypeCode is the coded representation of the type of a PriceSpecificationElement. A PriceSpecificationElement is the specification of a price, a discount, a surcharge, or a tax. An example of GDT PriceSpecificationElementTypeCode is: Specification of a percentage discount that can be changed manually:

<PriceSpecificationElementTypeCode>0RA1</PriceSpecificationElementTypeCode>

In certain implementations, GDT PriceSpecificationElementTypeCode may have the following structure:

Customer-specific code lists can be assigned to the code. A customer can determine the codes in the code lists during configuration. The code lists are set up in accordance with the related code values of the GDT PriceSpecificationElementPropertyDefinitionClassCode. The attributes of the code are assigned the following values: listID—ID of a code list. Assigned by a customer from the number Range 50200-50299; listAgencyID—ID of the customer (ID from DE 3055, if listed there); listVersionID—version of the particular code list.; listAgencySchemeID—ID of the scheme if the listAgencyID does not come from DE 3055; listAgencySchemeAgencyID—ID of the organization from DE 3055 that manages the listAgencySchemeID scheme. The data type GDT PriceSpecificationElementTypeCode may use the following codes: listID, listAgencyID, listVersionID, listAgencySchemeID, listAgencySchemeAgencyID. A PriceSpecificationElementCategoryCode is assigned to each PriceSpecificationElementTypeCode. A PriceSpecificationElementPurposeCode is assigned to each PriceSpecificationElementTypeCode.

The GDT PriceSpecificationElementTypeCode may not used in B2B interfaces. Examples for the semantics of customer-specific codes of the code list are: List Price—Price out of a price list; Discount can be quantity-dependent discount; Perc. Discount can be Percentage net discount; Abs. Discount can be Absolute discount; Perc. Header Discount can be Percentage header discount; Abs. Header Discount can be Absolute header discount; Precious Metal can be Surcharge for precious metals; Cash Discount can be Cash Discount; Express can be Surcharge on freight because of express delivery. Related standardized code lists, such as Price.Type.Code (UN/CEFACT 5375), or Price.Specification.Code (UN/CEFACT 5387) may not be used, since they have different semantics. In the first case, the categorization of prices according to specifications for the quantity of products, for example, takes up a lot of space, whereas in the second case, prices arise due to the business circumstances.

| GDT | | Cat. | Object Class | Property | Representation/ Association | Type | Type Name | Len. | Card. | Remarks |
|---|---|---|---|---|---|---|---|---|---|---|
| Price-Specification-Element-TypeCode | | | Price Specification Element Type | | Code | CDT | Code | 1..4 | | restricted |
| | listID | A | Code List | Identification | Identifier | xsd | token | | 0..1 | |
| | listAgencyID | A | Code List Agency | Identification | Identifier | xsd | token | | 0..1 | |
| | listVersionID | A | Code List | Version | Identifier | xsd | token | | 0..1 | |
| | listAgency-SchemeID | A | Code List Agency | Scheme | Identifier | xsd | token | | 0..1 | |
| | listAgency-Scheme-AgencyID | A | Code List Agency | Scheme Agency | Identifier | xsd | token | | 0..1 | |

The GDT PriceSpecificationElementTypeCodeContextElements can define a dependency or an environment in which the PriceSpecificationElementTypeCode appears. The environment is described by context categories. With the context categories in PriceSpecificationElementTypeCodeContextElements, the valid portion of code values of PriceSpecificationElementTypeCode is restricted according to an environment during use.

In certain implementations, GDT PriceSpecificationElementTypeCodeContextElements may have the following structure:

| GDT | | Cat. | Object Class | Property | Representation/ Association | Type | Type Name | Card. |
|---|---|---|---|---|---|---|---|---|
| Price-Specification-Element-Type-CodeContext-Elements | | | Price Specification Element Type Code Context Elements | | Details | | | |
| | Price-Specification-Element-Property-Definition-ClassCode | E | Price Specification Element Type Code Context Elements | Price Specification Element Property Definition Class | Code | GDT | Price-Specification-Element-Property-Definition-ClassCode | 1 |
| | Price-Specification-Element-Category-Code | E | Price Specification Element Type Code Context Elements | Price Specification Element Category | Code | GDT | Price-Specification-Element-Category-Code | 0..1 |
| | Price-Specification-Element-Purpose-Code | E | Price Specification Element Type Code Context Elements | Price Specification Element Purpose | Code | GDT | Price-Specification Element-Purpose-Code | 0..1 |
| | Pricing-Procedure-Code | E | Price Specification Element Type Code Context Elements | Pricing Procedure | Code | GDT | Pricing-Procedure-Code | 0..1 |
| | Header-Enabled-Indicator | E | Price Specification Element Type Code Context Elements | Header Enabled | Indicator | GDT | Indicator | 0..1 |
| | Item-Enabled-Indicator | E | Price Specification Element Type Code Context Elements | Item Enabled | Indicator | GDT | Indicator | 0..1 |

PriceSpecificationElementPropertyDefinitionClassCode—This context category can define the property definition class of a PriceSpecificationElement. This may determine the valid code values for this property definition class; PriceSpecificationElementCategoryCode—This context category can define the category of a PriceSpecificationElement. This may determine the valid code values for this category; PriceSpecificationElementPurposeCode—This context category can define the purpose of a PriceSpecificationElement. This may determine the valid code values for this purpose.; PricingProcedureCode—This context category can define the procedure used for the price calculation. This may determine the valid code values for this procedure; HeaderEnabledIndicator—This context category can define if a PriceSpecificationElementTypeCode is enabled for the header level of the underlying business transaction document, or not. This may determine the valid code values for it; ItemEnabledIndicator—This context category can define if a PriceSpecificationElementTypeCode is enabled for the item level of the underlying business transaction document, or not. This may determine the valid code values for it.

PriceSpecificationGroupCode

A GDT PriceSpecificationGroupCode is the coded representation of a group of price, discount or surcharge specifications. Criteria for grouping are the type of price, discount or surcharge specification (see GDT PriceSpecificationElementTypeCode), as well as the combination of properties on which the specification of a price, discount and surcharge depends. The possible properties are defined in a property definition class for the specification of a price, discount, and surcharge (see GDT PriceSpecificationPropertyDefinitionClassID). An example of GDT PriceSpecificationGroupCode is:

<PriceSpecificationGroupCode>1</PriceSpecificationGroupCode>

In certain implementations, GDT PriceSpecificationGroupCode may have the following structure:

| GDT | | Cat. | Object Class | Property | Representation/ Association | Type | Type Name | Len. | Card. | Remarks |
|---|---|---|---|---|---|---|---|---|---|---|
| Price-Specification-GroupCode | | | Price Specification | Group | Code | CDT | Code | 1..3 | | Restricted |
| | listID | A | Code List | Identification | Identifier | xsd | token | | 0..1 | |
| | list-Agency-ID | A | Code List Agency | Identification | Identifier | xsd | token | | 0..1 | |
| | list VersionID | A | Code List | Version | Identifier | xsd | token | | 0..1 | |
| | list-Agency-Scheme-ID | A | Code List Agency | Scheme | Identifier | xsd | token | | 0..1 | |
| | list-Agency-Scheme-AgencyID | A | Code List Agency | Scheme Agency | Identifier | xsd | token | | 0..1 | |

An extendable code list can be assigned to the PriceSpecificationGroupCode. Customers can change this code list. Semantic examples of customer-specific codes are provided in the "Use" section. The data type GDT PriceSpecificationGroupCode may use the following codes: listID="10160", listAgencyID="310", listVersionID, listAgencySchemeID and listAgencySchemeAgencyID.

The group price, discount, or surcharge specifications can be used as a view for the maintenance of this price, discount, or surcharge specifications. An example of possible customer-specific code semantics is: Color-dependent prices and discounts—all price and discount specifications that depend on a product, and the color of a product. The data type GDT PriceSpecificationGroupCode may use the following codes: 1 (i.e., Purchase Contract), 2 (i.e., Sales Contract), 3 (i.e., Service Contract), 4 (i.e., Business Partner-specific Prices) and 5 (i.e., Business Partner-specific Discounts).

PriceSpecificationProductGroupCode

A GDT PriceSpecificationProductGroupCode is the coded representation of a group of products for which the same price determination applies. An example of GDT PriceSpecificationProductGroupCode is:

<PriceSpecificationProductGroupCode>1</PriceSpecificationProductGroupCode>

In certain implementations, GDT PriceSpecificationProductGroupCode may have the following structure:

The data type GDT PriceSpecificationProductGroupCode may use the following attributes: listID, listAgencyID, listVersionID, listAgencySchemeID and listAgencySchemeAgencyID. The PriceSpecificationProductGroupCode may currently be used only in business objects and A2A messages. The PriceSpecificationProductGroupCode is used, for example, for price determination in sales orders, in order to determine prices that apply to the product. Examples of the possible semantics of the codes may include: Standard parts—products for which standard price determination could apply and Spare parts—products for which price determination for spare parts could apply.

PriceSpecificationPropertyGroupCode

A GDT PriceSpecificationPropertyGroupCode is the coded representation for a group of properties on which a specification of a price, discount of surcharge depends. The possible properties are defined in a property definition class for the specification of a price, discount, and surcharge (see GDT PriceSpecificationPropertyDefinitionClassID). An example of GDT PriceSpecificationPropertyGroupCode is:

<PriceSpecificationPropertyGroupCode>1</PriceSpecificationPropertyGroupCode>

In certain implementations, a GDT PriceSpecificationPropertyGroupCode may have the following structure:

| GDT | | Cat. | Object Class Qualifier | Object Class | Property | Representation/ Association | Type | Type Name | Len. | Card. |
|---|---|---|---|---|---|---|---|---|---|---|
| Price-Specification-Product-GroupCode | | | Price Specification | Product Group | | Code | CDT | Code | 1..2 | |
| | listID | A | | Code List | Identification | Identifier | xsd | token | | 0..1 |
| | listAgency-ID | A | | Code List Agency | Identification | Identifier | xsd | token | | 0..1 |
| | listVersion-ID | A | | Code List | Version | Identifier | xsd | token | | 0..1 |
| | listAgency-SchemeID | A | | Code List Agency | Scheme | Identifier | xsd | token | | 0..1 |
| | listAgency-Scheme-AgencyID | A | | Code List Agency | Scheme Agency | Identifier | xsd | token | | 0..1 |

| GDT | | Cat. | Object Class | Property | Representation/ Association | Type | Type Name | Len. | Card. | Remarks |
|---|---|---|---|---|---|---|---|---|---|---|
| Price-Specification-Property-GroupCode | | | Price Specification | Property Group | Code | CDT | Code | 1..5 | | Restricted |
| | listID | A | Code List | Identification | Identifier | xsd | token | | 0..1 | |
| | listAgencyID | A | Code List Agency | Identification | Identifier | xsd | token | | 0..1 | |
| | listVersionID | A | Code List | Version | Identifier | xsd | token | | 0..1 | |
| | listAgency-SchemeID | A | Code List Agency | Scheme | Identifier | xsd | token | | 0..1 | |
| | listAgency-Scheme-AgencyID | A | Code List Agency | Scheme Agency | Identifier | xsd | token | | 0..1 | |

An extendable code list can be assigned to the PriceSpecificationPropertyGroupCode. Customers can change this code list. The data type GDT PriceSpecificationPropertyGroupCode may use the following codes: listID="10145", listAgencyID="310", listVersionID, listAgencySchemeID and listAgencySchemeAgencyID.

GDT PriceSpecificationPropertyGroupCode can be used for maintaining the specifications of prices, discounts, or surcharges in purchasing or sales processes. GDT PriceSpecificationPropertyGroupCode can be used together with GDT PriceSpecificationElementTypeCode to identify the type of representation of a specification of a price, discount or surcharge for one group of properties. In certain implementations, the representation of the type of specification of a price, discount or surcharge may be provided by the GDT PriceSpecificationElementTypeCode. In certain implementations, it may not have specific properties and can therefore be used in the GDT PriceSpecificationElement for different groups of properties. Examples for PriceSpecificationPropertyGroupCode for specifying a price include Sales organization/distribution channel/sold-to party/product and Sales organization/distribution channel/product and Product.

Price specifications can be maintained for all the property combinations mentioned above. Depending on the relevant business requirement, a price specification is taken during price determination for one of the property combinations. The data type GDT PriceSpecificationPropertyGroupCode may use the following codes: 1 (i.e., Product), 2 (i.e., Sales organization, distribution channel, and product), 3 (i.e., Customer), 4 (i.e., Price group and product) and 5 (i.e., Customer group and product.)

PriceTimeSeries

A GDT PriceTimeSeries is time series information that consists of items that each contain a period with a start time and end time and a period-based price. An example of GDT PriceTimeSeries is:

```
<PriceTimeSeries>
<Item>
  <ValidityPeriod>
  <StartDateTime>2002-04-19T15:00:00Z</StartDateTime>
  <EndDateTime>2002-04-19T17:00:00Z</EndDateTime>
  </ValidityPeriod>
<Price>
  <Amount currencyCode="EUR">32.14</Amount>
  <BaseQuantity unitCode="C62">1</BaseQuantity>
  </Price>
</Item>
</PriceTimeSeries>
```

In certain implementations, a GDT PriceTimeSeries may have the following structure:

| GDT | | | Cat. | Object Class Qual. | Object Class | Property | Rep./ Ass. | Type | Type Name | Card. |
|---|---|---|---|---|---|---|---|---|---|---|
| PriceTime-Series | | | | Price | Time Series | | Details | | | |
| | Item | | E | Price | Time Series | Item | Details | | | 1..n |
| | | Validity-Period | E | Price | Time Series | Validity Period | Details | GDT | DateTime Period | 1 |
| | | Price | E | Price | Time Series | Price | Details | GDT | Price | 1 |
| | | Fixed-Indicator | E | Price | Time Series | Fixed Indicator | Indicator | GDT | Fixed Indicator | 0..1 |

PriceTimeSeriesItem can be an item in a time series and can be repeated as often as appropriate. ValidityPeriod can describe the validity period of the time series item with a start time stamp and an end time stamp. Price can describe the price connected to the time series item. FixedIndicator can describe whether the corresponding item for changes is blocked or not. PriceTimeSeries can be used as a generic data type that can have various specifications in one interface, depending on the context category being used.

PriceTypeCode

A GDT PriceTypeCode is the coded representation of a price type. The price type specifies the business relevance of a price. An example of GDT PriceTypeCode is:

```
<PriceTypeCode listAgencyID="310">1</PriceTypeCode>
```

In certain implementations, a GDT PriceTypeCode may have the following structure:

| GDT | | Cat. | Object Class | Property | Representation/ Association | Type | Type Name | Len. | Card. |
|---|---|---|---|---|---|---|---|---|---|
| PriceType Code | | | Price | Type | Code | CDT | Code | 1..3 | |
| | listID | A | Code List | Identification | Identifier | xsd | token | | 0..1 |
| | list-AgencyID | A | Code List Agency | Identification | Identifier | xsd | token | | 0..1 |
| | list-VersionID | A | Code List | Version | Identifier | xsd | token | | 0..1 |
| | list-Agency-SchemeID | A | Code List Agency | Scheme | Identifier | xsd | token | | 0..1 |
| | list-Agency-Scheme-AgencyID | A | Code List Agency | Scheme Agency | Identifier | xsd | token | | 0..1 |

Multiple code lists can be allowed for PriceTypeCode. The customer can add other code lists. The attributes are as follows: listID="10064", listAgencyID="310" and listVersionID can be version of the relevant code list.

Customer-Specific Code ListsIndustrialSectorCode. can be the attributes can be used as follows: listID can be ID of the relevant code list. It can be assigned and administered by a customer. The customer can be responsible for the values of the ID in question; listAgencyID can be the ID of the customer. An ID assigned by an organization listed in the DE 3055 may be used (such as the business IDs assigned by DUNS, EAN and SWIFT); listVersionID can be a version of the relevant code list. This can be assigned and administered by the customer listed in the listAgencyID; listAgencySchemeID can be the ID of the scheme by which the customer listed in the listAgencyID is identified. It can be a particular identification scheme for partners, businesses, and members (such as DUNS+4), and so on, of an administering organization (such as EAN, DUNS, and SWIFT) that may be listed in the listAgencySchemeAgencyID; listAgencySchemeAgencyID—ID of the administering organization (such as DUNS, EAN, or SWIFT) that may be responsible for identifying the organization listed in the listAgencyID. This may be listed in DE 3055.

Examples of custom codes include: Purchase price, which can be price at which a product is procured; Material price based on commercial code, which can be price at which a material is valuated based on the commercial code; Material price based on tax code, which can be price at which a material is valuated based on the tax code; Planned price, which can be planned price used to valuate an internal activity. Price type describes the business significance of a price, not how it was determined. For the type of determination of a price, use the GDT PriceSpecificationElementTypeCode. The data type GDT PriceTypeCode may use the following codes: 1 (i.e., Material Inventory Price) and 2 (i.e., Material Standard Price.)

PricingProcedureCode

A GDT PricingProcedureCode is the coded representation of the procedure used for the price calculation. The procedure is defined by a number of pricing element definitions arranged in sequence, and is used to control the price calculation. In general it is specified for the combination of business transaction type and business partner type. An example of GDT PricingProcedureCode is:

<PricingProcedureCode>1</PricingProcedureCode>

In certain implementations, a GDT PricingProcedureCode may have the following structure:

| GDT | | Cat. | Object Class | Property | Representation/ Association | Type | Type Name | Len. | Card. | Remarks |
|---|---|---|---|---|---|---|---|---|---|---|
| Pricing-Procedure-Code | | | Pricing-Procedure | | Code | CDT | Code | 1..6 | | Restricted |
| | listID | A | Code List | Identification | Identifier | xsd | token | | 0..1 | |
| | listAgencyID | A | Code List Agency | Identification | Identifier | xsd | token | | 0..1 | |
| | listVersionID | A | Code List | Version | Identifier | xsd | token | | 0..1 | |
| | listAgency-SchemeID | A | Code List Agency | Scheme | Identifier | xsd | token | | 0..1 | |
| | listAgency-Scheme-AgencyID | A | Code List Agency | Scheme Agency | Identifier | xsd | token | | 0..1 | |

A customer-specific code list can be assigned to the GDT PricingProcedureCode. A customer can define the codes in the code list. The data type GDT PricingProcedureCode may use the following codes: listID="10141", listAgencyID—ID of the customer, listVersionID—Version of the particular code list, listAgencySchemeID—ID of the scheme if the listAgencyID does not come from DE 3055, listAgencySchemeAgencyID—ID of the organization from DE 3055 that manages the listAgencySchemeID scheme.

Examples of the possible semantics of the codes can be: Internet Sales which can be calculation rule for business transactions in Internet Sales; Wholesale Trade which can be calculation rule for business transactions in wholesale trade and Wholesale Trade Export, which can be calculation rule for business transactions in wholesale trade for export. In the ERP system the GDT PricingProcedureCode is represented by the pricing procedure.

PricingProcedureDeterminationCode

A GDT PricingProcedureDeterminationCode is a coded representation of the determination of a pricing procedure. A pricing procedure describes the means, and, in particular, the sequence, by which price specifications are taken into consideration during price determination. An example of GDT PricingProcedureDeterminationCode is:

<PricingProcedureDeterminationCode>1</PricingProcedureDeterminationCode>

In certain implementations, a GDT PricingProcedureDeterminationCode may have the following structure:

| GDT | Object Class | Representation/Association | Type | Type Name | Len. |
|---|---|---|---|---|---|
| PricingProcedureDeterminationCode | Pricing Procedure Determination | Code | CDT | Code | 1 |

A customer-specific code list can be assigned to the code. The attributes of the code can be assigned the following values: listID="10368", listAgencyID—ID of the customer (ID from DE 3055, if listed there), listVersionID—version of the particular code list, listAgencySchemeID—ID of the scheme if the listAgencyID does not come from DE 3055, listAgencySchemeAgencyID—ID of the organization from DE 3055 that manages the listAgencySchemeID scheme.

In messages the GDT PricingProcedureDeterminationCode may be used when both sender and recipient have access to shared or harmonized Business Configuration, for example during internal communication in an enterprise. GDT PricingProcedureDeterminationCode can be used to determine a pricing procedure for a customer in a sales document. Examples for semantics of the code list are: Standard—standard pricing procedure applies and Standard incl. sales tax—standard pricing procedure including sales tax applies.

PricingSubtotalTypeCode

A GDT PricingSubtotalTypeCode is the coded representation of the type of a subtotal used for the price calculation. The price calculation can assign price components (see GDT PriceComponent) to a subtotal. The subtotal can cumulate the values of the assigned price components according to a selectable calculation method. An example of GDT PricingSubtotalTypeCode is:

<PricingSubtotalTypeCode>F1</PricingSubtotalTypeCode>

In certain implementations, a GDT PricingSubtotalTypeCode may have the following structure:

| GDT | | Cat. | Object Class | Property | Representation/Association | Type | Type Name | Len. | Card. | Remarks |
|---|---|---|---|---|---|---|---|---|---|---|
| PricingSubtotalTypeCode | | | Pricing Subtotal | Type | Code | CDT | Code | 2 | | Restricted |
| | listID | A | Code List | Identification | Identifier | xsd | token | | 0..1 | |
| | listAgencyID | A | Code List Agency | Identification | Identifier | xsd | token | | 0..1 | |
| | listVersionID | A | Code List | Version | Identifier | xsd | token | | 0..1 | |
| | listAgencySchemeID | A | Code List Agency | Scheme | Identifier | xsd | token | | 0..1 | |
| | listAgencySchemeAgencyID | A | Code List Agency | Scheme Agency | Identifier | xsd | token | | 0..1 | |

A customer-specific code list is assigned to the Code. A customer can define the codes in the code list. The data type GDT PricingSubtotalTypeCode may use the following codes: listID="110036", listAgencyID=ID of the customer, listVersionID—Version of the particular code list, listAgencySchemeID—ID of the scheme if the listAgencyID does not come from DE 3055 and listAgencySchemeAgencyID—ID of the organization from DE 3055 that manages the listAgencySchemeID scheme. The GDT PriceSubtotalTypeCode is not used in B2B interfaces. Examples of customer-specific code semantics can include: Shipping—Subtotal for values of price components for shipping; Packaging—Subtotal for values of price components for packaging and Costs—Subtotal for values of price components for costs The GDT PricingContextElements can define a dependency or an environment in which the PricingSubtotalTypeCode appears. The environment is described by context categories. With the context categories in PricingContextElements the valid portion of code values of PricingSubtotalTypeCode may be restricted according to an environment during use.

In certain implementations, a GDT PricingContextElements may have the following structure:

| GDT | | Cat. | Object Class | Property | Representation/Association | Type | Type Name | Card. |
|---|---|---|---|---|---|---|---|---|
| PricingContextElements | | | Pricing Context Elements | | Details | | | |
| | PriceSpecificationElement- | E | Pricing Context Elements | Price Specification Element | Code | GDT | PriceSpecificationElement- | 1 |

-continued

| GDT | | Cat. | Object Class | Property | Representation/ Association | Type | Type Name | Card. |
|---|---|---|---|---|---|---|---|---|
| | Property-Definition-ClassCode | | | Property Definition Class | | | Property-Definition-ClassCode | |

Detailed Description can include GDT PriceSpecificationElementPropertyDefinitionClassCode. This context category can provide the property definition class of a PriceSpecificationElement. This determines the valid code values for this property definition class for price calculation.

PriorityCode

A GDT PriorityCode is a coded representation of the (linear ordered) ranking of urgencies. An example of GDT PriorityCode is:

<PriorityCode>1</PriorityCode>

In certain implementations, a GDT PriorityCode may have the following structure:

| GDT | Property | Representation/ Association | Type | Type Name | Len. | Remarks |
|---|---|---|---|---|---|---|
| Priority-Code | Priority Code | Code | CDT | Code | 1 | restricted |

Things that are assigned a (semantically) higher priority can be more important, and may be required more urgently or have to be carried out first and are therefore considered first or are given preference during selection and processing. The GDT PriorityCode can be assigned a standard code list. The attributes are assigned the following values: listID: DE 4037 and listAgencyID: 6.

Priorities can be assigned in nearly all business areas, for example, to specify delivery priorities, the urgency of an e-mail, posting priorities, deduction priorities, urgency of a problem, etc. For example: The delivery of product ABC is of particular importance to customer 4711. Therefore orders/order items containing this product can be treated with preference and receive the delivery priority "immediate". Since information describing priorities can be communicated in many different areas (see above), the definition may be kept as general as possible. In particular, in certain circumstances, the context determines which standard and therefore with which code list the "PriorityCode" could be communicated (such as, "very high", "high", "medium", "low", or "A", . . . , "Z"). One option is proprietary code lists that were agreed upon by the communication partners individually.

Code list examples: In the area of R/3 shipping, a delivery priority of the type NUMC, length 2.0, may be used with the following code list-01 (i.e., High), 02 (i.e., Normal) and 03 (i.e., Low.) According to the UN/EDIFACT data element, the length is first defined at 3 places. Should this length no longer be sufficient for later requirements, it can be lengthened if necessary. The data type GDT PriorityCode may use the following codes: 1 (i.e., Immediate), 2 (i.e., Urgent), 3 (i.e., Normal) and 7 (i.e., Low).

PriorityValue

A GDT PriorityValue is the value-based specification of a priority. An example of GDT PriorityValue is:

<PriorityValue>1</PriorityValue>

In certain implementations, a GDT PriorityValue may have the following structure:

| GDT | Property | Rep./Ass. | Type | Type Name | Len. | Remarks |
|---|---|---|---|---|---|---|
| PriorityValue | Priority | Value | CDT | Numeric | 13.2 | Restricted |

The value range can contain all the non-negative decimal numbers with two decimal places. Value 1 could define the highest priority. The larger the value, the lower the priority. PriorityValue may be used if variable priorities have to be used. Otherwise the GDT PriorityCode is used. For example, in the business object, integrated Production Process Model, the PriorityValue can be used to define the priority with which a source of supply, created based on an integrated Production Process Model, is to be taken into account in procurement planning.

PrivateSectorSocialInsuranceEmployeeGroupCode

A GDT PrivateSectorSocialInsuranceEmployeeGroupCode is the coded representation of the classifications assigned by the Private Sector Social Insurance Organization to the employee. An example of GDT PrivateSectorSocialInsuranceEmployeeGroupCode is:

<PrivateSectorSocialInsuranceEmployeeGroupCode listAgencyID="xxx" listVersionID="xxxxx">1000000000</PrivateSectorSocialInsuranceEmployeeGroupCode>

In certain implementations, a GDT PrivateSectorSocialInsuranceEmployeeGroupCode may have the following structure:

| GDT | | Cat. | Object Class | Property | Representation/ Association | Type Name | Type | Len. | Card. | Remarks |
|---|---|---|---|---|---|---|---|---|---|---|
| Private-Sector-Social-Insurance-Employee-Group-Code | | | Private Sector Social Insurance Employee Group | | Code | CDT | Code | 1..4 | | Restricted |
| | listID | A | Code List | Identification | Identifier | xsd | token | | 0..1 | |
| | list-AgencyID | A | Code List Agency | Identification | Identifier | xsd | token | | 0..1 | |

-continued

| GDT | | Cat. | Object Class | Property | Representation/ Association | Type Name | Type | Len. | Card. | Remarks |
|---|---|---|---|---|---|---|---|---|---|---|
| | list-VersionID | A | Code List | Version | Identifier | xsd | token | | 0..1 | |
| | listAgency-SchemeID | A | Code List Agency | Scheme | Identifier | xsd | token | | 0..1 | |
| | listAgency-Scheme-AgencyID | A | Code List Agency | Scheme Agency | Identifier | xsd | token | | 0..1 | |

Several fixed, alternative standard code lists can be assigned to the code. The attributes of the code are assigned the following values: listID—"23801", listAgencyID="IT", listAgencySchemeID="ISO 3166-1" and listAgencySchemeAgencyID="5" (ISO). The data type GDT PrivateSectorSocialInsuranceEmployeeGroupCode may use the following codes: listID, listAgencyID, listVersionID, listAgencySchemeID and listAgencySchemeAgencyID.

For Italy this can be the INPS code of an employee group. Examples of customer-specific code semantics: AAAA—Code AAAA for Metalli Italia—ext.company (F24); BBBB Code BBBB for MeloinventoS.A; CODI—Code CODI for MeloinventoS.A; OLDR—Code OLDR for MeloinventoS.A. and OGRO—Code OGRO for Zontini S.p.A. Data element R/3: P15_INPSC(R/3 domain: P15_INPSC). The code list may be maintained by the customer according to the codes issued to him by the national insurance institution for the private sector.

The GDT PrivateSectorSocialInsuranceEmployeeGroupCode can define a dependency or an environment in which the PrivateSectorSocialInsuranceEmployeeGroupCode appears. The environment may be described by context categories. With the context categories in PrivateSectorSocialInsuranceEmployeeGroupCode ContextElements the valid portion of code values of PrivateSectorSocialInsuranceEmployeeGroupCode may be restricted according to an environment during use.

In certain implementations, a GDT "ABC Code" may have the following structure:

| GDT | | Cat. | Object Class | Property | Representation/ Association | Type | Type Name | Card. |
|---|---|---|---|---|---|---|---|---|
| Private-SectorSocial-Insurance-Employee-GroupCode Context-Elements | | | Private Sector Social Insurance Employee Group Code Context Elements | | Details | | | |
| | CountryCode | E | Private Sector Social Insurance Employee Group Code Context Elements | Country | Code | GDT | Country-Code | 0..1 |

A detailed description of CountryCode can be the context category, which may define the context country. It can determine the valid code values for a specific country.

ProcessBranchingTypeCode

A GDT ProcessBranchingTypeCode is the coded representation of the type of a process branching. Branching is a way of structuring a process description that splits a process into several process paths. In addition to a common starting point, the branched processing paths also have a common end point where the different paths join again. An example of GDT ProcessBranchingTypeCode is:

<ProcessBranchingTypeCode>1</ProcessBranchingTypeCode>

In certain implementations, a GDT ProcessBranchingTypeCode may have the following structure:

| GDT | Object Class | Property | Representation/ Association | Type | Type Name | Len. | Card. | Remarks |
|---|---|---|---|---|---|---|---|---|
| Process-BranchingType-Code | Process Branching | Type | Code | CDT | Code | 1..2 | | Restricted |

One fixed code list may be assigned to the GDT ProcessBranchingTypeCode. The attributes can be as follows: listID="10131", listAgencyID="310" and listVersionID=Version of the relevant code list. The ProcessBranchingTypeCode may be used to control how the quantity to be processed flows through the processing paths of the branching. In a production process, the processed quantity may be a production lot, in an authorization process, it may be the quantity of the requests to be authorized. The data type GDT "ABC Code" may use the following codes: 1 (i.e., Alternative), 2 (i.e., Exclusive Alternative) and 3 (i.e., Parallel.)

ProcessingResultCode

A GDT ProcessingResultCode is a coded representation of the result of processing of something. "Something" usually stands for a message or an object. A GDT ProcessingResultCode example is:

<ProcessingResultCode>1</ProcessingResultCode>

In certain implementations, a GDT ProcessingResultCode may have the following structure:

| GDT | Property | Representation/Association | Type | Type Name | Len. | Remarks |
|---|---|---|---|---|---|---|
| Processing-ResultCode | Processing Result | Code | CDT | Code | 1..2 | restricted |

One static code list may be assigned to the code. The attributes assigned values may be as follows: listID="10486" and listAgencyID="310." Code 4—"Partially successful" can be used in the context of mass operations only, when further ProcessingResultCodes (one per part) are available. The data type GDT ProcessingResultCode may use the following codes: 1 (i.e., Received), 2 (i.e., In process), 3 (i.e., Successful), 4 (i.e., Partially successful) and 5 (i.e., Failed.)

ProcurementCostUpperLimit

A GDT ProcurementCostUpperLimit is the cost upper limit for different types of procurement costs. An example of GDT ProcurementCostUpperLimit is:

<ProcurementCostUpperLimit>
<OverallLimit>
<Amount currencyCode="EUR">10000.00</Amount>
<AmountUnlimitedIndicator>false</AmountUnlimitedIndicator>
<ExpectedAmount currencyCode="EUR">7500.00</ExpectedAmount>
<OverallLimit>
<ContractPartialLimit>
<Amount currencyCode="EUR">0.00</Amount>
<AmountUnlimitedIndicator>true</AmountUnlimitedIndicator>
<ContractReference>
<ID>4000008599</ID>
<ItemID>148</ItemID>
</ContractReference>
</ContractPartialLimit>
<MiscellaneousPartialLimit>
<Amount currencyCode="EUR">500.00</Amount>
<AmountUnlimitedIndicator>false</AmountUnlimitedIndicator>
</MiscellaneousPartialLimit>
</ProcurementCostUpperLimit>

In certain implementations, a GDT ProcurementCostUpperLimit may have the following structure:

| GDT | | | Cat. | Object Class | Property | Representation/Association | Type | Type Name | Card. |
|---|---|---|---|---|---|---|---|---|---|
| Procurement-CostUpper-Limit | | | | Procurement Cost Upper Limit | | Details | | | |
| | Overall-Limit | | E | Procurement Cost Upper Limit | Overall Limit | Details | | | 1 |
| | | Amount | E | Overall Limit | Amount | Amount | CDT | Amount | 0..1 |
| | | Amount-Unlimited-Indicator | E | Overall Limit | Amount Unlimited Indicator | Indicator | GDT | Value-Unlimited-Indicator | 0..1 |
| | | Expected-Amount | E | Overall Limit | Expected Amount | Amount | CDT | Amount | 0..1 |
| | Contract-PartialLimit | | E | Procurement Cost Upper Limit | Contract Partial Limit | Details | | | 0..n |
| | | Amount | E | Contract Partial Limit | Amount | Amount | CDT | Amount | 0..1 |
| | | Amount-Unlimited-Indicator | E | Contract Partial Limit | Amount Unlimited Indicator | Indicator | GDT | Value-Unlimited-Indicator | 0..1 |
| | | Contract-Reference | E | Contract Partial Limit | Contract Reference | Details | GDT | Business Transaction Document Reference | 1 |
| | Miscellaneous-PartialLimit | | E | Procurement Cost Upper Limit | Miscellaneous PartialLimit | Details | | | 0..1 |
| | | Amount | E | Miscellaneous Partial Limit | Amount | Amount | CDT | Amount | 0..1 |
| | | Amount-Unlimited-Indicator | E | Miscellaneous Partial Limit | Amount Unlimited Indicator | Indicator | GDT | Value-Unlimited-Indicator | 0..1 |

OverallLimit can be the limit for the total costs in a procurement process. OverallLimit/Amount can be the cost upper limit that may not be exceeded in a procurement process. OverallLimit/AmountUnlimitedIndicator can indicate whether the amount in OverallLimit/Amount is unlimited. OverallLimit/ExpectedAmount can portray the costs that may actually be expected. The expected costs are usually less than the maximum permitted costs. ContractPartialLimit can be the partial limit for costs relating to a contract.

Furthermore, ContractPartialLimit/Amount can be the cost upper limit for a particular contract that may not be exceeded in a procurement process. ContractPartialLimit/AmountUnlimitedIndicator can indicate whether the amount in ContractLimit/Amount is unlimited. ContractPartialLimit/ContractReference can be the reference to a contract. ContractPartialLimit/ContractReference/ID can be the contract number. ContractPartialLimit/ContractReference/

ItemID can be an item within the contract. If no item number is specified, the partial limit applies for all the items in the contract.

In addition, MiscellaneousPartialLimit can be the partial limit for the overall limit for miscellaneous costs. MiscellaneousPartialLimit/Amount can be the cost upper limit for miscellaneous costs. MiscellaneousPartialLimit/AmountUnlimitedIndicator: can indicate whether the amount in MiscellaneousLimit/Amount is unlimited. Integrity Conditions can be the rules for the GDT AmountUnlimitedIndicator apply for Amount and AmountUnlimitedIndicator can be all currencies within a ProcurementCostUpperLimit which may be identical; The OverallLimit/Amount may be greater than or equal to the OverallLimit/ExpectedAmount. If no ExpectedAmount is specified, the Amount is used as the ExpectedAmount. If no ExpectedAmount is specified and the Amount is unlimited, an ExpectedAmount of 0.00 is assumed and The same contract/same contract item may not be referenced in different limits which refer to contracts.

A ProcurementCostUpperLimit is used to define the type and amount of costs that are permitted for limit items within an ordering process. Limit items are used as placeholders in purchase orders if the exact requirements are unknown at the time of ordering. This can be the case, i.e., for repairs, where the time and spare parts required are not known until the repair has been made. It is important to distinguish between the costs in a procurement process and the limits. The total of all the costs may not exceed the overall limit, though the total of all the partial limits may well exceed the overall limit. This can easily lead to mistakes, for example: Overall limit of EUR 10,000, Partial limit of EUR 8,000 for contract 4711 and Miscellaneous partial limit of EUR 4,000. In the example, the total of the partial limits is EUR 12,000, which is greater than the overall limit of EUR 10,000.

ProcurementTypeCode

A GDT ProcurementTypeCode is the coded representation of the procurement type. Procurement encompasses all activities of a plant that are executed to make available the resources required for the plant to fulfill its set goals. An example of GDT ProcurementTypeCode is:

<ProcurementTypeCode>1</ProcurementTypeCode>

In certain implementations, a GDT ProcurementTypeCode may have the following structure:

| GDT | Object Class | Property | Representation/ Association | Type | Type Name | Len. | Remarks |
|---|---|---|---|---|---|---|---|
| ProcurementTypeCode | Procurement | Type | Code | CDT | Code | 1 | Restricted |

One fixed code list may be assigned to GDT ProcurementTypeCode. The attributes can be as follows: listID="0291", listAgencyID="310" and listVersionID=Version of the relevant code list. A ProcurementTypeCode can be used to differentiate between sources of supply on the basis of their procurement type. The data type GDT ProcurementTypeCode may use the following codes: 1 (i.e., External procurement), 2 (i.e., Internal procurement) and 3 (i.e., Internal production.)

ProductAttributeGroupID

A GDT ProductAttributeGroupID is a unique identifier for a product attribute group. A product attribute group arranges product attributes together in a group to describe the characteristics of a product and enables attributes that are associated with each other to be maintained together. An example of GDT ProductAttributeGroupID is:

<ProductAttributeGroupID>SERVICEPLAN</ProductAttributeGroupID>

In certain implementations, a GDT ProductAttributeGroupID may have the following structure:

| GDT | Object Class | Property | Representation/ Association | Type | Type Name | Len. | Card. |
|---|---|---|---|---|---|---|---|
| ProductAttribute-GroupID | Product Attribute Group | Identification | Identifier | CDT | Identifier | 1..16 | |

An alphanumeric character string can be permitted. The GDT ProductAttributeGroupID may be used in business objects and/or their replication messages. Attributes stored in a product attribute group can be assigned to several products and can therefore be re-used. Product attributes may be grouped according to subjective business criteria. Examples can include: a product attribute group for administrative attributes such as Date and Created By and a product attribute group for units of measure and their conversion factors to the base unit of measure.

ProductCategoryHierarchyID

A GDT ProductCategoryHierarchyID is a unique identifier for a product category hierarchy. A product category hierarchy is a classification system for products. It describes a hierarchical order of product categories that exist on both higher and lower levels in relation to one another, and whose structure can be represented as a tree (also see ProductCategoryID). An example of GDT ProductCategoryHierarchyID is:

<ProductCategoryHierarchyID>BASE_FIN</ProductCategoryHierarchyID>

In certain implementations, a GDT "ABC Code" may have the following structure:

| GDT | Object Class | Property | Representation/ Association | Type | Type Name | Len. | Remarks |
|---|---|---|---|---|---|---|---|
| ProductCategoryHierarchyID | Product Category Hierarchy | Identification | Identifier | GDT | Identifier | 1..10 | Restricted |

The ProductCategoryHierarchyID may currently be used in business objects.

ProductCategoryHierarchyUsageCode

A GDT ProductCategoryHierarchyUsageCode represents, in the form of a code, the usage of a product category hierarchy. A product category hierarchy is a classification system for products. It describes a hierarchical ordering of product categories that exist on both higher and lower levels in relation to one another, and whose structure can be represented as a tree (for another example, see ProductCategoryID (described above)). An example of GDT ProductCategoryHierarchyUsageCode is:

<ProductCategoryHierarchyUsageCode>1</ProductCategoryHierarchyUsageCode>

In certain implementations, a GDT ProductCategoryHierarchyUsageCode may have the following structure:

DUNS+4) and so on, of an administering organization (such as EAN, DUNS and SWIFT) that can be listed in the ListAgencySchemeAgency ID; ListAgencySchemeAgencyID—the ID of the administering organization (such as DUNS, EAN or SWIFT) that can be responsible for identifying the organization listed in the ListAgencyID. It may be listed in DE 3055.

A ProductCategoryHierarchy can have one or more GDT ProductCategoryHierarchyUsageCodes. During product maintenance the number of maintainable product category hierarchies, and thus the number of product attributes, can be limited when you enter a ProductCategoryHierarchyUsageCode. The data type GDT ProductCategoryHierarchyUsageCode may use the following codes: 1 (i.e., Sales), 2 (i.e., Procurement) and 3 (i.e., Basic Data.)

| GDT | Object Class | Property | Representation/ Association | Type | Type Name | Len. | Remarks |
|---|---|---|---|---|---|---|---|
| ProductCategoryHierarchyUsageCode | Product Category Hierarchy | Usage | Code | CDT | Code | 1..20 | Restricted |

Several code lists can be allowed for the GDT ProductCategoryHierarchyUsageCode. A default code list and additional code lists that depend on the implemented applications can be delivered. The customer can add other code lists. The attributes have the following values: listID="10065", listAgencyID="310" and listVersionID—version of the relevant code list.

Customer-Specific Code Lists can be tIndustrialSectorCode. The attributes are used as follows: ListID can be ID of the relevant code list. It can be assigned and administered by a customer. The customer can be responsible for the values of ID in question; ListAgencyID can be The ID of the customer. An ID assigned by an organization listed in the DE 3055 may be used (such as the business IDs assigned by DUNS, EAN and SWIFT); ListVersionID can be version of the relevant code list. It can be assigned and administered by the customer listed in the ListAgencyID; ListAgencySchemeID can be the ID of the scheme by which the customer listed in the ListAgencyID is identified. It can be a particular identification scheme for partners, businesses, and members (such as ProductCategoryID A GDT ProductCategoryID is a unique identifier for a product category. A product category is a division of products according to objective business-specific criteria. An example of GDT ProductCategoryID is:

<ProductCategoryID schemeID="eClass" schemeAgencyID="ZZZ">AAA650001</ProductCategoryID>

Another example of GDT ProductCategoryID is:

<ProductCategoryID schemeID="UNSPSC" schemeVersionID="11.0" schemeAgencyID="257">10.10.15.17.00</ProductCategoryID>

Yet another example of GDT ProductCategoryID is:

<ProductCategoryID schemeID='ProductCategories' schemeAgencyID='123456789' schemeAgencySchemeAgencyID='16'>0006</ProductCategoryID>

In certain implementations, a GDT ProductCategoryID may have the following structure: "ProductCategoryID" is from the Core Component Type "Identifier".

| GDT | | Cat. | Object Class | Property | Representation/ Association | Type | Data Type | Len. | Card. | Remarks |
|---|---|---|---|---|---|---|---|---|---|---|
| ProductCategoryID | | | Product Category | Identification | Identifier | CDT | Identifier | 1..40 | | restricted |
| | schemeID | A | Identification Scheme | Identification | Identifier | xsd | token | 1..60 | 0..1 | |
| | scheme-VersionID | A | Identification Scheme | Version | Identifier | xsd | token | 1..15 | 0..1 | |
| | scheme-AgencyID | A | Identification Scheme Agency | Identification | Identifier | xsd | token | 1..60 | 0..1 | |

-continued

| GDT | | Cat. | Object Class | Property | Representation/ Association | Type | Data Type | Len. | Card. | Remarks |
|---|---|---|---|---|---|---|---|---|---|---|
| | scheme-Agency-SchemeID | A | Identification Scheme Agency | Scheme | Identifier | xsd | token | 1..60 | 0..1 | |
| | scheme-Agency-Scheme-AgencyID | A | Identification Scheme Agency | Scheme Agency | Identifier | xsd | token | 1..3 | 0..1 | |

The following classifications can be supported for standard IDs: schemeID: 'UNSPSC' schemeAgencyID: '257' and schemeID: 'eClass' schemeAgencyID: 'ZZZ'. The following classifications can be supported for version-dependent, hierarchical standard IDs: schemeID: 'UNSPSC' schemeVersionID: nn.m schemeAgencyID: '257' and schemeID: 'eClass' schemeVersionID: nn.m schemeAgencyID: 'ZZZ'

The data type GDT ProductCategoryID may use the following codes: schemeID—(i.e., SchemeID is the ID of the ID scheme which can be released and maintained by the responsible organization of the ID scheme. The GDT owner may retrieve the correct ID from the responsible organization. If there is no unique ID available, the name of the identifier or identifier type may be entered, which is used in the corresponding standard, specification, or scheme of the responsible organization); schemeVersionID (i.e., SchemeVersionID is the Version of the ID scheme, which can be released and maintained by the organization, which is named in schemeAgencyID. The owner may retrieve the relevant version ID from the responsible organization. If there is no version for the ID scheme, the version of the standard, the specification, or the scheme is used.)

The following codes may be used: schemeAgencyID (i.e., SchemeAgencyID is the ID of the organization maintaining the ID scheme. This identification is released by an organization contained in DE 3055 (i.e. DUNS, EAN . . . ). The GDT owner may retrieve the correct ID from the responsible organization. If the organization is not contained in DE 3055, proceed like described in "Data Type Catalog", 5.6.6.c); schemeAgencySchemeID (i.e., SchemeAgencySchemeID can be the identification of the schema which identifies the organization named in schemeAgencyID. It may be termed, a certain scheme ID of partners, companies, members etc. (i.e. DUNS+4) of an organization named in schemeAgency-SchemeAgencyID (Bsp. EAN, DUNS, SWIFT, etc.) and schemeAgencySchemeAgencyID (i.e., SchemeAgency-SchemeAgencyID would be the identification of the maintaining organization (i.e. DUNS, EAN, SWIFT, etc.) which is responsible for the identification of the organization named in schemeAgencyID. The organization may be contained in DE 3055.

CategoryID can be used in three ways: 1) For identifying a product category using a globally-unique, non-versioned, standardized ID. The ID generally may not be structured hierarchically, i.e., it references only one product category and does not contain any information about how this category is based on several other general categories. The attribute schemeID and schemeAgencyID may be used in the same way as planned in the CDT identifier for standard IDs. Other attributes are not specified. 2) For identifying a product category within a tree of product categories that build on one another and using a globally unique, standardized ID that contains information on the location of the category within the tree structure. The ID is generally version-dependent. The attribute schemeID and schemeVersionID and schemeAgencyID are used in the same way as planned in the CDT identifier for standard IDs. Other attributes are not specified. 3) For identifying a product category using a proprietary ID. The attributes schemeID, schemeAgencyID, schemeAgency-SchemeID and schemeAgencySchemeAgencyID can be used as planned for the CDT identifier in order to define the context for which a CategoryPartyID is guaranteed to be unique. Other attributes are not specified.

ProductCategoryInternalID

A ProductCategoryInternalID is a proprietary identifier for a product category. A product category is a division of products according to objective criteria. An example of GDT ProductCategoryInternalID is:

<ProductCategoryInternalID schemeID="ProductCategoryGUID" schemeAgencyID="MPL__002">1C743CEC501F6A4D8826C7EC5A8554B9</ProductCategoryInternalID>

In the above example, schemeID="ProductCategoryGUID" indicates that the scheme "ProductCategoryGUID" was used to identify the product category.

schemeAgencyID="MPL__002" indicates that the scheme was assigned by the business system "MPL__002".

Another example of ProductCategoryInternalID is:

<ProductCategoryInternalID schemeID="ProductCategoryID" schemeAgencyID="MPL__002">Private Car Vehicles MPLCNT002</ProductCategoryInternalID>

In certain implementations, a ProductCategoryInternalID may have the following structure:

| CDT | | Cat. | Object Class | Property | Representation/ Association | Type | Type Name | Len. | Card. | Remarks |
|---|---|---|---|---|---|---|---|---|---|---|
| ProductCate-goryInter-nalID | | | ProductCategory | Internal Identification | Identifier | GDT | Product-CategoryID | 1..40 | | restricted |
| | schemeID | A | Identification Scheme | Identification | Identifier | XSD | Token | 1..60 | 0..1 | |
| | scheme-AgencyID | A | Identification Scheme Agency | Identification | Identifier | XSD | Token | 1..60 | 0..1 | |

The attributes of a ProductCategoryInternalID can be filled as shown under section "Detailed Description of Attributes". The data type GDT ProductCategoryInternalID may use the following codes for a detailed description: schemeID and schemeAgencyID.

The ProductCategoryInternalID can represent a projection of the GDT ProductCategoryID, in which only the attributes "schemeID" and "schemeAgencyID" are contained for describing an internally assigned ID. If an attribute is not explicitly assigned in the use of the GDT, it may be clearly determined through the context. The ProductCategoryInternalID may be used when both sender and recipient can access shared master data, i.e., during internal communication. If the product category is identified using the ProductCategoryID scheme (schemeID), it could be noted that possibly the product category can only be uniquely identified using a combined key (i.e., the product category at an entity level can only be uniquely identified (semantically) using ProductCategoryID, ProductHierarchyID and the logical system).

ProductCategoryPartyID

A ProductCategoryPartyID is a division of products according to objective criteria. An example of ProductCategoryPartyID is:

<ProductCategorySellerID>0006</ProductCategorySellerID>

In certain implementations, GDT ProductCategoryPartyID may have the following structure:

| GDT | Object Class | Property Qual. | Property | Representation/ Association | Type | Type Name | Len. | Remarks |
|---|---|---|---|---|---|---|---|---|
| ProductCategory-PartyID | Product Category | Party | Identification | Identifier | GDT | ProductCategoryID | 1..40 | restricted |

The ProductCategoryPartyID can be the proprietary identifier assigned by a party. The party (in its role) that assigned this identifier may derive from the business context of the message that uses the ProductCategoryPartyID.

In contrast to ProductCategoryStandardID (described below), the use of the "ProductCategoryPartyID" may be role-dependent (i.e., as an ID assigned by the Buyer).

The party may be specified by its role. "Party" may be replaced with the "partner role type" (i.e., ProductCategory-SellerID).

SchemeID and SchemeVersionID may be included as attributes as soon as there is a need to differentiate between several schemes.

ProductCategoryStandardID

A ProductCategoryStandardID may be a standardized identifier for a product category, whereby the identification scheme used can be managed by an agency from the code list DE 3055.

A ProductCategoryStandardID may be a division of products according to objective criteria. An example of GDT ProductCategoryStandardID is:

<ProductCategoryStandardID schemeID="UNSPSC" schemeVersionID="11.0" schemeAgencyID="113">10.10.15.17</ProductCategoryStandardID>

In certain implementations, ProductCategoryStandardID may have the following structure:

| CDT | | Cat. | Object Class | Property Qual. | Property | Representation/ Association | Type | Type Name | Len. | Card. | Remarks |
|---|---|---|---|---|---|---|---|---|---|---|---|
| ProductCategoryStandardID | | | Product Category | Standard | Identification | Identifier | GDT | Product-CategoryID | 1..40 | | restricted |
| | schemeID | A | Identification Scheme | | Identification | Identifier | XSD | Token | 1..60 | 0..1 | |
| | scheme-VersionID | A | Identification Scheme | | Version | Identifier | XSD | Token | 1..15 | 0..1 | |
| | scheme-AgencyID | A | Identification Scheme Agency | | Identification | Identifier | XSD | Token | 1..3 | 1 | |

"SchemeAgencyID" may identify the agency that manages an identification scheme. The agencies from DE 3055 can be used as the default, but the roles defined in DE 3055 may not be used. The following code can be supported for a version-dependent hierarchical standard ID:

For ProductCategoryStandardID, "schemeAgencyID" can identify the agency that manages an identification scheme. The agencies from DE 3055 can be used as the default, but the roles defined in DE 3055 are not typically used. The following code can be supported for a version-dependant hierarchical standard ID: SchemeAgencyID can be "113" (i.e., UCC (i.e., Uniform Code Council)). The SchemeAgencyID can also include the following: SchemeID can be "UNSPSC" (i.e., United Nations Standard Product and Services Classification Code) and SchemeVersionID can be represented as a number (i.e., 11.0).

The ProductCategoryStandardID can represent a projection of the GDT ProductCategoryID, in which the attributes "schemeID", "schemeVersionID", and "schemeAgencyID" are contained for describing an ID assigned by a standardization organization (i.e., an organization registered in the DE 3055). In contrast to ProductCategoryPartyID, the use of ProductCategoryStandardID may not be role-dependent.

SchemeID: Another standardized identification scheme (i.e., for material classification and material groups) may be "eClass" (i.e., current release status 5.0).

For this identification scheme there may be no SchemeAgencyID in the code list DE 3055 that would have to be clarified. The version of eClass may be a 2-digit number.

Possible usage of the SchemeID include, SchemeAgencyID can be German Institute for Economics Cologne (i.e., not contained in DE 3055). The SchemeID can be "eClass." The SchemeVersionID can be a number (i.e., 42).

ProductChangeID

A ProductChangeID can be used as an identifier for a change to a product which leaves the product unchanged in terms of its properties that are relevant for the user.

Changes in terms of this definition may occur, (i.e., due to changed manufacturing processes or the use of other modules/component batches). An example of GDT ProductChangeID is:

<ProductChangeID>31337KSK/4711<ProductChangeID>

In certain implementations, GDT ProductChangeID may have the following structure:

| GDT | Cat. | Object Class | Property | Representation/ Association | Type | Type Name | Len. | Remarks |
|---|---|---|---|---|---|---|---|---|
| ProductChangeID | E | Product Change | Identification | Identifier | CDT | Identifier | 1..32 | restricted |

ProductChangeIDs can be important, (i.e., for a recall activity: Assuming the transistors installed in a product are replaced with other similar ones, then the features of the product may not be changed and it may still have the same ProductID.) However, if the transistors turn out to be faulty, it should be ensured that the serial numbers of the product affected are logged using ProductChangeIDs in case there is a resulting recall activity.

If a change is made using change management, the ProductChangeID may contain the ID of the relevant change order (i.e., ChangeOrderID).

In the R/3, ProductChangeID may be the change number that uniquely identifies a change master record for a product.

A change identified here may be neither a version nor a variant. For example, a yellow VW Golf C with leather seats may be "yellow with leather seats," a variant of version "C" of product "VW Golf".

ProductDemandInfluencingEventStatusCode

The ProductDemandInfluencingEventStatusCode can be a coded representation for the status of an event that might influence the demand for products. The event might be a promotional event. An example of GDT ProductDemandInfluencingEventStatusCode is:

<ProductDemandInfluencingEventStatusCode>
PLANNED</ProductDemandInfluencingEventStatusCode>

In certain implementations, GDT ProductDemandInfluencingEventStatusCode may have the following structure:

| GDT | Object Class | Property | Representation/ Association | Type | Type Name | Len. | Remarks |
|---|---|---|---|---|---|---|---|
| ProductDemandInfluencingEventStatusCode | Product Demand Influencing Event | Status | Code | CDT | Code | 1..35 | restricted |

The possible code values may be a subset of the "Retail Event Status Code List" of the "EAN.UCC XML Business Message Standards, Version 1.3 (July 2003)".

The possible code values may be; cancelled (i.e., cancelled), completed (i.e., completed), planned (i.e., planned), proposed (i.e., proposed), terminated (i.e., terminated early).

ProductDemandInfluencingEventTypeCode

The ProductDemandInfluencingEventTypeCode may be a coded representation for the type of an event that influences the demand for products. An example of ProductDemandInfluencingEventTypeCode is:

<ProductDemandInfluencingEventTypeCode>HOLIDAY
</ProductDemandInfluencingEventTypeCode>

In certain implementations, GDT ProductDemandInfluencingEventTypeCode may have the following structure:

| GDT | Object Class | Property | Representation/ Association | Type | Type Name | Len. | Remarks |
|---|---|---|---|---|---|---|---|
| ProductDemandInfluencingEventTypeCode | Product Demand Influencing Event | Type | Code | CDT | Code | 1..35 | restricted |

The GDT may group several partial quantities of standard code lists, whereby the supported partial quantities may be disjunctive (see section "Detailed Description and Value Ranges"). Therefore, attributes (supplementary components) may not be needed to identify the relevant standard code list.

The possible code values may be subsets of the union of the "Miscellaneous Event Type Code List" and "Promotional Event Type Code List" of the "EAN.UCC XML Business Message Standards, version 1.3 (July 2003)". These may be; assortment change (i.e., the set of items that the location carries for the category may change affecting one or more items), disaster (i.e., hurricane, tornado, accident, attack, or some other catastrophic unexpected event affecting supply or demand), Freight Flow Allocation, (i.e., item availability is restricted, due to unexpected demand, transportation issues, production problems, or some other reason), Inventory Policy Change, (i.e., the inventory policy at the store or retail distribution center is changing, resulting in changes to the estimated supply of the item), Labor, (i.e., a strike or other labor issue that may affect supply), LocationClosing, (i.e., one or more locations that carry the item are closing. No promotion may be associated with the item during closing.), Location Opening, (i.e., one or more new locations is opening that will carry the item. No promotion may be associated with the item during closing.), Packaging Labeling Change (i.e., the packaging or labeling of the item is changing, possibly affecting demand or distribution.), Price Decrease, (i.e., the price may decrease for the item at the retail locations), Price Increase, (i.e., the price is increasing for the item at the retail locations), Store Format or Planogram Change, (i.e., the store format or planogram is changing, affecting one- or more items.), Test Market, (i.e., selling a new item at a limited set of locations to gauge consumer interest, or testing an existing item in a new channel or location.), Weather, (i.e., a heat wave, cold front, snowstorm, or other weather phenomenon affecting supply or demand.)

Examples from the "Promotional Event Type Code List" may be: Community Events, (i.e., promotional activities timed to coincide with a local, regional, or national event.), Holiday (i.e., promotional activity timed to coincide with a national, regional, or religious holiday.), Seasonal Event, (i.e., promotional activity timed to coincide with a change in the season, or an annual cultural phenomenon (i.e. "back to school")), Store Closing, (i.e., promotional activity timed to coincide with the elimination of one or more store locations, (i.e. going-out-of-business sale)), Store Opening, (i.e., promotional activity timed to coincide with the opening of one or more store locations, (i.e., grand opening sale)), Trade Item Discontinuation, (i.e., promotional activity timed to coincide with the elimination or a product from a location or market (i.e., clearance sale)), Trade Item Introduction, (i.e., promotional activity timed to coincide with the introduction of a new product to a location or market).

ProductDimensions

ProductDimensions contain the dimensions of a product in length, width and height in one single unit of measurement. An example of ProductDimensions is:

<ProductDimensions measureUnitCode="CM"><LengthMeasure>100,3</LengthMeasure><WidthMeasure>51,6</WidthMeasure><HeightMeasure>22,7</HeightMeasure></ProductDimensions>

In certain implementations GDT ProductDimensions may have the following structure:

| GDT | | Cat. | Object Class | Property | Representation/ Association | Type | Type Name | Card. |
|---|---|---|---|---|---|---|---|---|
| Product-Dimensions | | | Product Dimensions | | Details | | | |
| | measureUnit-Code | A | Product Dimensions | Measure Unit | Code | GDT | Measure-UnitCode | 1 |
| | LengthMeasure | E | Product Dimension | Length | Measure | CDT | Measure | 0..1 |
| | WidthMeasure | E | Product Dimension | Width | Measure | CDT | Measure | 0..1 |
| | HeightMeasure | E | Product Dimension | Height | Measure | CDT | Measure | 0..1 |

Detailed Description and Value Ranges may include: MeasureUnitCode (see Above), (i.e., measurement unit), LengthMeasure, (i.e., length), WidthMeasure, (i.e., width), HeightMeasure, (i.e., Height).

At least one dimension may be specified depending on the character and use of the product, not all dimensions may be specified. The plausibility of the dimensions may be checked in the context of each application.

ProductID

A GDT ProductID is a unique identifier for a product. A product is either a tangible or intangible good, and is a part of the business activities of a company. It can be traded and contributes directly or indirectly to value added. An example of GDT ProductID is:

<ProductID schemeID="Domestic Appliances"
schemeAgencyID="065055766"
schemeAgencySchemeID="DUNS"
schemeAgencySchemeAgencyID="16">
B 1165 HS
</ProductID>

In the previous example, “065055766” is Bosch at DUNS and “16” is the DUNS from Code List DE 3055. In certain implementations GDT ProductID may have the following structure:

| GDT | | Cat. | Object Class | Property | Representation/ Association | Type | Type Name | Len. | Card. | Remarks |
|---|---|---|---|---|---|---|---|---|---|---|
| Product-ID | | | Product | Identification | Identifier | CDT | Identifier | 1..60 | | restricted |
| | schemeID | A | Identification Scheme | Identification | Identifier | XSD | Token | 1..60 | 0..1 | |
| | scheme-AgencyID | A | Identification Scheme Agency | Identification | Identifier | XSD | Token | 1..60 | 0..1 | |
| | scheme-Agency-SchemeID | A | Identification Scheme Agency | Scheme | Identifier | XSD | Token | 1..60 | 0..1 | |
| | scheme-Agency-Scheme-AgencyID | A | Identification Scheme Agency | Scheme Agency | Identifier | XSD | Token | 1..3 | 0..1 | |

For GDT ProductID described above, schemeID can be the ID of the ID scheme. Released and maintained by the responsible organization of the ID scheme. The GDT owner may retrieve the correct ID from the responsible organization. If there is no unique ID available, the name of the identifier or identifier type may be entered, which is used in the corresponding standard, specification, or scheme of the responsible organization. SchemeAgencyID can be the ID of the organization maintaining the ID scheme. This identification may be released by an organization contained in DE 3055 (i.e., DUNS, EAN . . . ) The GDT owner may retrieve the correct ID from the responsible organization. If the organization is not contained in DE 3055, the GDT owner may proceed as described in “Data Type Catalog”, 5.6.6.c). SchemeAgencySchemeID can be the identification of the schema which identifies the organization named in schemeAgencyID. It can be a certain schemeID of partners, companies, members etc. (i.e., DUNS+4) of an organization named in schemeAgencySchemeAgencyID (Bsp. EAN, DUNS, SWIFT, etc). SchemeAgencySchemeAgencyID can be the identification of the maintaining organization (i.e., DUNS, EAN, SWIFT, etc.) which is responsible for the identification of the organization named in schemAgencyID. The organization may be contained in DE 3055.).

ProductID can connote the type of product, not a concrete object. Thus, in the above example: B1165HS may mean a type of appliance, not necessarily an actual appliance with the serial number XY.

A product may contribute directly to the value creation if it is salable. A product may contribute indirectly to the value creation if it may be necessary for selling another product, it can support the salability of another product, it can occur in the business activity of a company and it may be in the company’s best interest that this product can add value.

ProductInternalID

A ProductInternalID is a proprietary identifier for a product. A product may be either a tangible or intangible good, and can be part of the business activities of a company. It can be traded and may contribute directly or indirectly to value added. An example of GDT ProductInternalID is:

<ProductInternalID schemeID=“ProductGUID” schemeAgencyID=“MPL__002”>1C743CEC501F6A4D8826C7EC5A8554B9</ProductInternalID>

In the previous example, schemeID=“PartyGUID” indicates that the scheme “ProductGUID” was used to identify the product, schemeAgencyID=“MPL__002” indicates that the scheme was assigned by the business system “MPL__002.”

Another example of GDT ProductInternalID is: <ProductInternalID schemeID=“ProductID” schemeAgencyID=“MPL__002”>VWPassat 01 0601 MPLCNT002 <ProductInternalID>

In certain implementation, ProductInternalID may have the following structure:

| CDT | | Cat. | Object Class | Property Qualifier | Property | Representation/ Association | Type | Type Name | Len. | Card. | Remarks |
|---|---|---|---|---|---|---|---|---|---|---|---|
| Product-InternalID | | | Product | Internal | Identification | Identifier | GDT | Product-ID | 1..60 | | restricted |
| | scheme-ID | A | Identification Scheme | | Identification | Identifier | XSD | Token | 1..60 | 0..1 | |
| | scheme-Agency ID | A | Identification Scheme Agency | | Identification | Identifier | XSD | Token | 1..60 | 0..1 | |

The Detailed Description of Attributes of the above GBT may be the schemeID can be ProductGUID which may identify a product category via a Globally Unique Identifier. A schemeAgencyID can be a business system which issued the ID.

The ProductInternalID represents a projection of the GDT ProductID, in which only the attributes “schemeID” and “schemeAgencyID” are contained for describing an internally assigned ID. If an attribute is not explicitly assigned in the use of the GDT, it may be clearly determined through the context.

The ProductInternalID may be used when both sender and recipient can access shared master data, (i.e., during internal communication). A product can contribute directly to the value creation if it can be salable. A product may contribute indirectly to the value creation if it may be necessary for selling another product, or it can support the salability of another product.

In case the product may be identified via the schema (schemeID described above), it should be noted that the product category may first be capable of being uniquely identified via a combined key (for example, the product category at an entity level can be uniquely identified (semantically) by using the ProductID (described above), the ProductTypeID (described above), the ObjectFamily and the logical system).

ProductionModelID

An ProductionModelID can identify for an production model. A ProductionModelID can be a Model of a production process in a production center that is specified by a network of ProductionSegments. An example of GDT ProductionModelID is:

<ProductionModelID>CPRD__1</ProductionModelID>

In certain implementations, GDT ProductionModelID may have the following structures:

| GDT | Object Class | Property | Representation/ Association | Type | Type Name | Len. | Card. | Remarks |
|---|---|---|---|---|---|---|---|---|
| Production-ModelID | Production Model | Identification | Identifier | CDT | Identifier | 1..40 | | Restricted |

ProductModelID

A ProductModelID the specific construction type of a material product that can also be produced or provided in another, related construction type. There may be several models for one product. An example of GDT ProductModelID is:

<ProductModelID>MAN-10003<ProductModelID>

In certain implementations, GDT ProductModelID may have the following structure:

| GDT | Property | Represen-tation/Asso-ciation | Type | Type Name | Len. | Remarks |
|---|---|---|---|---|---|---|
| ProductModelID | Identification | Identifier | CDT | Identifier | 1..40 | Restricted |

The ModelID can be used in the context of the manufacturer and a ProductID.

An example could be: a car manufacturer could specify his models by size, cubic capacity, engine type, body style.

The size may be represented by a letter, a number or a name, the cubic capacity by a number, the engine type by letters and the body style by a name. An example of this is: B22S Coupe, 435DI Caravan, 435S Coupe.

In certain implementations, the ProductModelID may be restricted. In certain implementations, one active VersionID may exist at any one time whereas several different ProductModelIDs may be active at the same time.

ProductPartyID

A ProductPartyID is an identifier for a product assigned by a party. A product can be either a tangible or intangible good, and can be a part of the business activities of a company. It can be traded and contributes directly or indirectly to value added. An example of GDT ProductPartyId is:

<ProductSellerID>B 1165 HS</ProductSellerID>

In certain implementations, ProductPartyID may have the following structure:

| CDT | Object Class | Property Qual. | Property | Representation/ Association | Type | Type Name | Len. | Remarks |
|---|---|---|---|---|---|---|---|---|
| Product-PartyID | Product | Party | Identifi-cation | Identifier | GDT | ProductID | 1..60 | restricted |

The ProductPartyID may be the proprietary identifier assigned by a business partner. The business partner (in its role) that assigned this identifier may derive from the business context of the message that the ProductPartyID uses.

The use of the ProductPartyID, unlike ProductStandardID, may be role-dependent (for example, as an ID assigned by the Buyer).

The party may be specified by its role. “Party” can be replaced with the “partner role type” (i.e., ProductSellerID).

SchemeID (described below) and schemeVersionID (described below) may be included as attributes as soon as there may be a need to differentiate between several schemes (i.e., see GDT ProductID described above).

ProductRelationshipTypeCode

A ProductRelationshipTypeCode may be the code for the nature of the product relationship with regard to the type and function of the objects involved. An example of GDT ProductRelationshipTypeCode is:

<ProductRelationshipTypeCode>ACCESS</ProductRelationshipTypeCode>

In certain implementations GDT ProductRelationshipTypeCode may have the following structure:

| GDT | | Cat. | Object Class | Property | Representation/ Association | Type | Type Name | Len. | Card. | Remarks |
|---|---|---|---|---|---|---|---|---|---|---|
| Product-Relationship-TypeCode | | | Product Relationship | Type | Code | CDT | Code | 1..6 | | Restricted |
| | listID | A | Code List | Identification | Identifier | xsd | token | | 0..1 | |
| | listAgency-ID | A | Code List Agency | Identification | Identifier | xds | token | | 0..1 | |
| | listVersion-ID | A | Code List | Version | Identifier | xds | token | | 0..1 | |
| | listAgency-Scheme-ID | A | Code List Agency | Scheme | Identifier | xds | token | | 0..1 | |
| | listAgency-Scheme-AgencyID | A | Code List Agency | Scheme Agency | Identifier | xds | token | | 0..1 | |

An extensible code list may be assigned to the ProductRelationshipTypeCode. Customers may be able to change this code list.

For the GDT ProductRelationshipTypeCode as described above, listID can be the ID of the particular code list: 10033. ListAgencyID may be "310" if the code remains unchanged. If a user creates his/her code list during configuration, list agency ID can be the ID of the code user (ID from DE 3055, if listed there). ListVersionID can be the version of the particular code list assigned; if a user creates his code list during configuration, list version ID may be the version of particular code list assigned and managed by the code user. ListAgencySchemeID can be the ID of the scheme if the listAgency does not come from DE3055. ListAgencySchemeAgencyId may be the ID of the organization from DE 3055 that manages the listAgencySchemeIDscheme.

The ProductRelationshipTypeCode may be used in the product master to represent the type of relationship between a product and other business entities. An example of customer-specific code semantics may be the relationship of a product with its competitors.

The data type ProductRelationshipTypeCode may use the following codes: ACCESS (i.e., Product Accessories), PRDCPN (i.e., Product Customer Product), PRDCTP (i.e., Product Content Provider), PRDMPN (i.e., Product Manufacturer), PRDVND (i.e., Product Vendor), PROREF (i.e., Product Reference Product), SERVI (i.e., Product Service), SPARE (i.e., Product Spare Part).

ProductsSpecificationDetailLevelCode

A ProductsSpecificationDetailLevelCode may be a coded representation of the level of detail of specifications for products. An example of GDT ProductsSpecificationDetailLevelCode is:

<ProductsSpecificationDetailLevelCode>1</ProductsSpecificationDetailLevelCode>

In certain implementations, GDT ProductsSpecificationDetailLevelCode may have the following structure:

| GDT | Object Class | Property | Representation/Association | Type | Type Name | Len. | Remarks |
|---|---|---|---|---|---|---|---|
| Products-Specification-DetailLevelCode | Products Specification | Detail Level | Code | CDT | Code | 1 | Restricted |

ProductsSpecificationDetailLevelCode may have the following attributes: listID may be "10273". ListangencyID may be "310." A SourceOfSupply (as described below) may be defined for a particular material, for all materials of a product category, or for all materials. The GDT ProductsSpecificationDetailLevelCode may be used to define this relationship.

The data type GDT may use the following codes: 1 (i.e., product), 2 (i.e., product category), 3 (i.e., all products).

ProductStandardID

A ProductStandardID is a standardized identifier for a product, and the identification scheme is managed by an agency from the code list DE 3055. A product is either a tangible or intangible good, and is a part of the business activities of a company. It can be traded and contributes directly or indirectly to value added. An example of GDT ProductStandardID is:

<ProductStandardID schemeAgencyID="9">B 1165 HS</ProductStandardID>

In certain implementations ProductStandardID may have the following Structure:

| CDT | | Cat. | Object Class | Property Qual. | Property | Representation/Association | Type | Type Name | Len. | Card. |
|---|---|---|---|---|---|---|---|---|---|---|
| Product-Standard-ID | | | Product | Standard | Identification | Identifier | GDT | ProductID | 1..14 | |
| | schemeID | A | Identification Scheme | | Identification | Identifier | XSD | token | 1..60 | 0..1 |
| | scheme-Agency ID | A | Identification Scheme Agency | | Identification | Identifier | XSD | Token | 1..3 | 1 |

"SchemeAgencyID" (as described below) may identify the agency that manages an identification scheme. The agencies from DE 3055 may be used as the default, but the roles defined in DE 3055 may not be used. The following codes may be supported: 9 (EAN.UCC, International Numbering Association) for the GTIN (Global Trade Item Number), which can have up to 14 characters. Also, 5 (ISO, International Organization for Standardization) for the 13-character ISBN (International Standard Book Number).

The GDT ProductStandardID may represent a projection of the GDT ProductID, in which only the attributes "schemeID" and "schemeAgencyID" may be contained for describing an ID assigned by a standardization organization (i.e., an organization registered in DE 3055). The attribute "schemeAgencyID" can be a mandatory attribute.

In certain implementations, the use of ProductStandardID may not be role dependent. Specifying a schemeID may not be necessary if only one scheme exists for an agency. Another standardized identification scheme can be the pharmaceutical central number. There may be no SchemeAgencyID for this in the code list DE 3055.

ProductTax

ProductTax may be a tax that can be incurred for product-related business transactions, such as purchasing, sales, or consumption. An example of GDT ProductTax is:

<ProductTax>
<CountryCode>DE</CountryCode>
<EventTypeCode listID="20001" listAgencyID="310">100</EventTypeCode>
<TypeCode listID="20301">002</TypeCode>
<RateTypeCode listID="20201"listAgencyID="310">001</RateTypeCode>
<Currency>EUR</Currency>
<BaseAmount currencyCode="EUR">100</BaseAmount>
<Percent>16</Percent>
<Amount currencyCode="EUR">16</Amount>
<BusinessTransactionDocumentItemGroupID>1</BusinessTransactionDocumentItemGroupID>
<DueCategoryCode>1</DueCategoryCode>
<ProductTax>

In certain implementations, GDT ProductTAX may have the following structure:

| GDT | | Cat. | Object Class | Property | Representation/Association | Type | Type Name | Len. | Card. |
|---|---|---|---|---|---|---|---|---|---|
| ProductTax | | | Product Tax | | Details | | | | |
| | CountryCode | E | Product Tax | Country | Code | GDT | CountryCode | | 0..1 |
| | RegionCode | E | Product Tax | Region | Code | GDT | RegionCode | | 0..1 |
| | JurisdictionCode | E | Product Tax | Tax Jurisdiction | Code | GDT | TaxJurisdictionCode | | 0..1 |
| | EventTypeCode | E | Product Tax | Event Type | Code | GDT | ProductTaxEventTypeCode | | 0..1 |
| | TypeCode | E | Product Tax | Type | Code | GDT | TaxTypeCode | | 0..1 |
| | RateTypeCode | E | Product Tax | Rate Type | Code | GDT | TaxRateTypeCode | | 0..1 |
| | CurrencyCode | E | Product Tax | Currency | Code | GDT | CurrencyCode | | 0..1 |
| | BaseAmount | E | Product Tax | Base Amount | Amount | CDT | Amount | | 0..1 |
| | Percent | E | Product Tax | Percent | Percent | CDT | Percent | | 0..1 |
| | BaseQuantity | E | Product Tax | Base Quantity | Quantity | CDT | Quantity | | 0..1 |
| | Rate | E | Product Tax | Rate | Rate | CDT | Rate | | 0..1 |
| | Amount | E | Product Tax | Amount | Amount | CDT | Amount | | 0..1 |
| | NonDeductiblePercent | E | Product Tax | Non Deductible Percent | Percent | CDT | Percent | | 0..1 |
| | NonDeductibleAmount | E | Product Tax | Non Deductible Amount | Amount | CDT | Amount | | 0..1 |

-continued

| GDT | | Cat. | Object Class | Property | Representation/Association | Type | Type Name | Len. | Card. |
|---|---|---|---|---|---|---|---|---|---|
| | BusinessTransactionDocument ItemGroupID | E | Product Tax | Business Transaction Document Item Group Identification | Identifier | GDT | BusinessTransaction DocumentItemGroupID | | 0..1 |
| | EuropeanCommunityVATTriangulationIndicator | E | Product Tax | European Community VAT Triangulation | Indicator | CDT | Indicator | | 0..1 |
| | DueCategoryCode | E | Product Tax | Due Category | Code | GDT | DueCategoryCode | | 0..1 |
| | DeferredIndicator | E | Product Tax | Tax Deferred | Indicator | CDT | Indicator | | 0..1 |
| | Exemption | E | Product Tax | Tax Exemption | Details | GDT | TaxExemption | | 0..1 |
| | LegallyRequiredPhrase | E | Product Tax | Legally Required Phrase | Text | CDT | Text | 1..256 | 0..1 |

The following elements may be used in ProductTax: CountryCode (i.e., specifying the country in which the tax may be incurred), RegionCode (i.e., coded representation of geographical or political regions that are logically or physically coherent, where the tax may be incurred), JurisdictionCode (i.e., code that may be used for many countries (particularly the US) for identifying the proper tax authority), EventTypeCode (i.e., coded representation of the type of taxable event that is connected with the purchase, sale, or consumption of products), TypeCode (i.e., tax type codes, see GDT TAXTYPECODE below), RateTypeCode (i.e., coded representation of the type of a percentage or quantity based tax rate), Currency (i.e., currency of the tax amount), BaseAmount (i.e., base amount for calculating percentage taxes (assessment basis)), Percent (i.e., tax rate for percentage taxes (tax level in percent), BaseQuantity (i.e., base quantity for calculating quantity dependant taxes), Rate (i.e., tax rate for quantity dependant taxes (amount in currency per quantity unit), Amount (i.e., tax amount that may apply to the base amount), NonDeductiblePercent (i.e., percentage of tax that may be non-deductible), NonDeductibleAmount (i.e., amount of tax that may be non-deductible), BusinessTransactionDocumentItemGroupID (i.e., may group items of a BusinessTransactionDocumentItemGroupID that are taxed in a similar way), EuropeanCommunityVATTriangulationIndicator (i.e., may specify whether or not a delivery involves an intracommunity triangulation trade in terms of the VAT law of a European Community member state), DueCategoryCode (i.e., may specify whether a tax payment may be deferred or not), Exemption (i.e., information on complete or partial exemption of a party from a certain product tax), LegallyRequiredPhrase (i.e., legally required phrase that may be printed on the invoice).

A ProductTax segment may be connected with an amount from which the base amount to be taxed may be derived. Rules that specify which taxes may be displayed in total or on item level may be derived from relevant legal requirements depending on the particular country. For example, for German VAT, the total for each tax rate may be displayed.

Taxes that may be non-deductible may be relevant for incoming invoices and incoming credit memos. If a tax rate or a tax amount can be supplied, then the tax type code may be supplied as well. The currencies of the Amount and BaseAmount elements may correspond. If the Currency element may be filled, then this can also contain the same currency.

If the currency of the invoice is different from the currency of the tax reported to the tax authority, then the tax is represented by two instances of the GDT ProductTax that differ in currency. When the GDT ProductTax may be used in a business object, the element Currency may be used as part of an alternative key and may be filled in this case. This key may also consist of the elements ProductTaxEventTypeCode (described below), CountryCode (described above), JurisdictionCode (described above), TypeCode (described below), and RateTypeCode (described below).

The elements BaseQuantity and Rate may refer to the same quantity unit. If a rate is provided, then a BaseQuantity may also be provided, and the other way round. The element Rate may contain a currency amount in the numerator, and a quantity in the denominator.

ProductTax may contain either a percentage-based tax or a quantity-based tax. However, excise duty in India can be a special case; in certain cases, this tax consists of the sum of a percentage-based and a quantity-based part. In this case, the elements Percent and BaseAmount as well as BaseQuantity and Rate are filled, and the element Amount may contain the total tax amount.

It can be seen in the BTDItemGroupID which individual items are taxed. If the items also display the tax rate and the tax amount, then the BTDItemGroupID can be superfluous. An example of an invoice with three items with German VAT is included in the following table:

| | Country | Type Code | Description | Base-Amount | Percent | Amount | Item-Group-ID |
|---|---|---|---|---|---|---|---|
| Pos 1 | | | | 100.00 EUR | | | A |
| Pos 2 | | | | 200.00 EUR | | | B |

-continued

| | Country | Type Code | Description | Base-Amount | Percent | Amount | Item-Group-ID |
|---|---|---|---|---|---|---|---|
| Pos 3 | | | | 300.00 EUR | | | A |
| Total A | DE | VAT | Sales Tax | 400.00 EUR | 16 | 64.00 EUR | A |
| Total B | DE | VAT | Sales Tax | 200.00 EUR | 7 | 14.00 EUR | B |

The GDT ProductTax may be used to display different tax components in the invoiced amounts, and to trigger tax declarations and payments of a company to the responsible tax authorities.

A tax may be a public levy that a community imposes by means of coercion, at a fixed level, and without providing any services from natural and legal persons in return (this is different from fees and contributions).

The jurisdiction code of a natural or legal person may be part of the address data. In some countries, for example, USA, Brazil, and so on, the tax calculation can be dependent on the jurisdiction code of the ship-from location and the ship-to location.

The DueCategoryCode (described above) may be interpreted in connection with sales taxes as follows: receivable means input tax, and payable means output tax.

ProductTaxationCharacteristicsCode

A ProductTaxationCharacteristicsCode may be the coded representation of the main characteristics that form the basis of a product taxation. Main characteristics can be the type of product tax (i.e., ProductTaxEventTypeCode (described below), and the type of tax rate (i.e., TaxRateTypeCode (described below)) for each type of tax (i.e., TaxTypeCode (described above)) related thereto, and, if applicable, the tax deductibility (i.e., TaxDeductibilityCode (described below)). An example of GDT ProductTaxationCharacteristicsCode is:

<ProductTaxationCharacteristicsCode listID=21801 listAgencyID=310>1</ProductTaxtationCharacteristicsCode>

In certain implementations, GDT ProductTaxationCharacteristicsCode may have the following structure:

Several extensible, country-specific code lists, which are distinguished at runtime, may be assigned to the code. Customers may replace lists with their own.

For GDT ProductTaxationCharacteristicsCode a customer-specific code list can be assigned to the code. A listID can be "21801". A listAgencyID can be "310."

If customers create their own code lists in order to replace them, the allocation of attributes may change as follows: listAgencyID can be the ID of the customer (ID from DE 3055 if listed there). ListVersionID can be assigned and managed by the customer. ListAgencySchemeID can be the ID of the scheme if the ListAgencyID may not taken from DE 3055) that may manage the scheme of the listAgencySchemeID.

An examples of customer-specific code semantics may be intra-community acquisition at a full rate of taxation and input tax deduction according to individual agreement with the tax authorities. Examples of this code may be: 1 (i.e., domestic supply at full tax rate), 2 (i.e., domestic supply at reduced tax rate), 3 (i.e., tax-exempt domestic supply), 4 (i.e., tax-exempt export to a non-EU country), 5 (i.e., tax-exempt intra-community supply), 6 (i.e., fully deductible domestic acquisition at full tax rate) 7 (fully deductible domestic acquisition at reduced tax rate) 8 (i.e., fully deductible tax-exempt domestic acquisition), 9 (i.e., fully deductible tax-exempt domestic acquisition) 10 (i.e., fully deductible import from a non-EU country at reduced tax rate (import VAT)), 11 (i.e., fully deductible tax-exempt import from a non-EU country (import VAT)), 12 (i.e., fully deductible intra-community acquisition at full tax rate), 13 (i.e., fully deductible intra-community acquisition at reduced tax rate), 14 (i.e., fully deductible tax-exempt intra-community acquisition).

ProductTaxationCharacteristicsCodeContextElements

The ProductTaxationCharacteristicsCodeContextElements may define a dependency or an environment in which the ProductTaxationCharacteristicsCode appears. The environment may be described by context categories. With the context categories in ProductTaxationCharacteristicsCodeContextElements, the valid portion of code values of ProductTaxationCharacteristicsCode may be restricted according to an environment during use. An example of GDT ProductTaxationCharacteristicsCodeContestElements is:

| GDT | | Cat. | Object Class | Property | Representation/Association | Type | Type Name | Len. | Card. | Remarks |
|---|---|---|---|---|---|---|---|---|---|---|
| ProductTaxation-Characteristics-Code | | | Product Taxation Characteristics | | Code | CDT | Code | 1..4 | | Restricted |
| | listID | A | Code List | Identification | Identifier | xsd | token | | 0..1 | |
| | list-Agency-ID | A | Code List Agency | Identification | Identifier | xsd | token | | 0..1 | |
| | listVersionID | A | Code List | Version | Identifier | xsd | token | | 0..1 | |
| | listAgencySchemeID | A | Code List Agency | Scheme | Identifier | xsd | token | | 0..1 | |
| | list-Agency-Scheme-AgencyID | A | Code List Agency | Scheme Agency | Identifier | xsd | token | | 0..1 | |

<ProductTaxationCharacteristicsCode listID=21801 listAgencyID=310>1<ProductTaxtationCharacteristicsCode>
In certain implementations, GDT ProductTaxationCharacteristicsCodeContextElements may have the following structure.

| GDT | | Cat. | Object Class | Property | Representation/Association | Type | Type Name | Len. | Card. |
|---|---|---|---|---|---|---|---|---|---|
| ProductTaxationCharacteristicsCodeContextElements | | | Product Taxation Characteristics Code Context Elements | | Details | | | | |
| | Country-Code | E | Product Taxation Characteristics Code Context Elements | Country | Code | GDT | Country-Code | | 0..1 |

Country Code—This context category defines the context country. This can determine the valid code values for a specific country.
ProductTaxEventTypeCode ProductTaxEventTypeCode can be a coded representation of the type of taxable event that may be connected with the purchase, sale, or consumption of products. A taxable event can be understood to be a combination of characteristics that constitute a tax liability, a tax concession, or a tax exemption of a specific type and at a specific level for the purpose of country-specific tax legislation. An example of GDT ProductTaxEventTypeCode is:

<ProductTaxEventTypeCode listID=20001 listAgencyID=310>100 <ProductTaxEventTypeCode>
In certain implementations GDT ProductTaxEventTypeCode may have the following structure:

| GDT | | Cat. | Object Class | Property | Representation/Association | Type | Type Name | Len. | Card. | Remarks |
|---|---|---|---|---|---|---|---|---|---|---|
| ProductTaxEvent TypeCode | | | Product Tax Event | Type | Code | CDT | Code | 1..3 | | Restricted |
| | listID | A | Code List | Identification | Identifier | xsd | token | 1..60 | 1 | |
| | listAgency-ID | A | Code List Agency | Identification | Identifier | xsd | token | 1..3 | 0..1 | |

Taxable event characteristics in the context of tax legislation can be the tax subject (legal party for which tax liability is relevant), the tax object (object, process, or status of taxation)

The type and number of taxable events to be taken into consideration for product taxes can result basically from the tax laws of a country. These laws or their requirements for execution normally may not specify any specific codes. The codes may therefore be specified individually by the appropriate software producers.

For code lists used by ProductTaxEventTypeCode, the listAgencyID="310" (according to DE3055) may be specified. Several extendible country-specific code lists that differ at runtime can be assigned to the ProductTaxEventCode. For the assigned attribute values for DE, listID can be "20001". ListAgencyID may be "310." The assigned attribute values for the US may be as follows: listID may be "20002", and listAgencyID may be "310."

The ProductTaxEventTypeCode may be used to determine the type and percentage rate of the tax to be considered when the tax is calculated. In addition, the tax register may decide on the basis of the ProductTaxEventTypeCode, how and when the tax shown can be reported and paid to the tax authorities.

ProductTaxEventTypeCode can be similar in meaning to "tax code". However, in contrast to the tax code, the ProductTaxEventTypeCode may not depend on the tax rates.

Examples of the ProductTaxEventTypeCode for DE where listID may be "20001" and listAgencyID may be "310" could be: 100 (i.e., non-taxable delivery), 101 (i.e., domestic delivery), 102 (i.e., intra-community delivery to recipient with a VAT registration number), 103 (i.e., intra-community delivery to recipient with a VAT registration number) 104 (i.e., intra-community delivery of new vehicles outside a company), 105 (i.e., tax exempt delivery according to §4 Nos. 2-7 of the VAT Code), 106 (i.e., Tax exempt delivery according to §4 Nos. 8-28 of the VAT Code) 107 (i.e., domestic delivery according to §3c(3) of the VAT Code ("mail order business") 110 (i.e., export (to third countries)) 151 (i.e., delivery by an agricultural and silvicultural business in the remaining community area to consumers with a VAT tax number) 152 (i.e., domestic delivery by an agricultural and silvicultural business according to §24(1)$_2$ of the VAT Code) 200 (i.e., non-taxable acquisition), 201 (i.e., domestic acquisition), 202 (i.e., tax-exempt intra-community acquisition according to §4b of the VAT Code) 203 (i.e., taxable intra-community acquisition of object) 204 (i.e., taxable intra-community acquisition of other services), 205 (i.e., taxable intra-community acquisition of new vehicles from suppliers without VAT registration number), 206 (i.e., taxable intra-community acquisition according to the delivery of the first consumer in an intra-community triangulation trade according to §25b(2)

of the VAT Code) 207 (i.e., Acquisition according §13b(2) of the VAT Code (the receiver of services owes taxes) 210 (i.e., import (from third countries)) 301 (i.e., additional tax on tax payments due to raised tax rates) 302 (i.e., adjustment of the input tax deduction according to §15a of the VAT Code).

Examples of the ProductTaxEventTypeCode for US when listID may be "20002" and listAgencyID may be "310" can be as follows: 100 (i.e., non-taxable domestic sale) 101 (i.e., taxable domestic sale), 110 (i.e., export (not taxable)) 200 (i.e., non-taxable domestic acquisition) 201 (i.e., domestic acquisition use tax) 202 (i.e., domestic acquisition sales tax), 210 (i.e., import (taxable)).

The GDT ProductTaxTypeCode may be used for entering taxes, (i.e., in invoices).

The relevant types of product taxes for Germany and the US may be, for example: VAT (i.e., Value added tax), STT (i.e., State/provincial sales tax), LOC (i.e., local sales tax).

ProductTypeCode

The ProductTypeCode is a coded representation of the product type. A product type can describe the nature of products and may establish the basic properties for products of this type. An example of GDT ProductTypeCode is:

<ProductTypeCode>1</ProductTypeCode>

In certain implementations GDT ProductTypeCode may have the following structures:

| GDT | Cat. | Object Class | Property | Representation/ Association | Type | Type Name | Len. | Remarks |
|---|---|---|---|---|---|---|---|---|
| ProductTypeCode | E | Product | Type | Code | CDT | Code | 1..2 | restricted |

ProductTaxEventTypeCodeContextElements

ProductTaxEventTypeCodeContextElements define a dependency or an environment in which the ProductTaxEventTypeCode appears. The environment can be described by context categories.

In certain implementations GDT ProductTaxEventTypeCodeContextElements may have the following implementations:

The attributes may be assigned values as follows: listID can be 10037, and listAgencyID can be 310.

The ProductTypeCode may determine the type of a product in more detail. It can be used in the context of a product instance or of a reference to a product instance in order to qualify this product instance, and can also be used in its own right.

| GDT | | Cat. | Object Class | Property | Representation/Association | Type | Type Name | Len. | Card. |
|---|---|---|---|---|---|---|---|---|---|
| ProductTaxEventTypeCodeContextElements | | | ProductTaxEventTypeCode Context Elements | | Details | | | | |
| | CountryCode | E | ProductTaxEventTypeCode Context Elements | Country | Code | GDT | CountryCode | | 0..1 |

The country code may be used to specify the valid code values for a country. This context category may specify the country context.

ProductTaxTypeCode

The ProductTaxTypeCode is a coded representation of the type of a tax that may be incurred during the sale, purchase, and consumption of products and possibly during other related business transactions. An example of GDT ProductTaxTypeCode is:

<ProductTaxTypeCode>VAT</ProductTaxTypeCode>

In certain implementations GDT ProductTaxTypeCode may have the following structure:

Examples of the GDT ProductTypeCode may be as follows: 1 (i.e., material), 2 (i.e., service), 3 (i.e., individual material), 4 (i.e., warranty).

ProductUsageCode

A GDT ProductUsageCode is the coded representation of the usage of a product in a process. An example of GDT ProductUsageCode is:

| GDT | Object Class | Property | Representation/ Association | Type | Type Name | Len. | Remarks |
|---|---|---|---|---|---|---|---|
| ProductTaxTypeCode | Product Tax Type | Code | Code | CDT | Code | 3 | restricted |

The complete UN/EDIFACT code list "Duty or tax or fee type name code" may be used for the values of the ProductTaxTypeCode.

<ProductUsageCode>1</ProductUsageCode>

In certain implementations GDT ProductUsageCode may have the following structure:

| GDT | | Cat. | Object Class | Property | Representation/ Association | Type | Type Name | Len. | Card. | Remarks |
|---|---|---|---|---|---|---|---|---|---|---|
| Product-Usage-Code | | | Product | Usage | Code | CDT | Code | 1..3 | | Restricted |
| | listID | A | Code List | Identification | Identifier | xsd | token | | 0..1 | |
| | listAgencyID | A | Code List Agency | Identification | Identifier | xsd | token | | 0..1 | |
| | listVersionID | A | Code List | Version | Identifier | xsd | token | | 0..1 | |
| | listAgency-SchemeID | A | Code List Agency | Scheme | Identifier | xsd | token | | 0..1 | |
| | listAgency-Scheme-AgencyID | A | Code List Agency | Scheme Agency | Identifier | xsd | token | | 0..1 | |

A customer-specific code list may assigned to the code. The attributes may be described as follows: listID may be the ID of the particular code list: 10369. ListAgencyID may be the ID of the customer (ID from DE 3055, if listed there). ListVersionId may be the version of the particular code list, assigned and managed by the customer. ListAgencySchemeID may be the ID of the scheme if the listAgencyID does not come from DE 3055. ListAgencySchemeAgencyId may be the ID of the organization from DE 3055 that manages the listAgencySchemeId.

The ProductUsageCode may currently be used in business objects and A2A messages. The ProductUsageCode is used, for example, in sales orders, to define the usage for which a product is sold. Examples of the possible semantics of the codes are: spare part (i.e., the product is used as a spare part), sample (i.e., the product is used as a sample), series product (i.e., the product is used for repetitive manufacturing).

ProductWeights

ProductWeights specifies the gross, net and tare weight of a product in a particular unit of measurement. An example of GDT ProductWeights is:

<ProductWeights measureUnitCode="KGM"> <GrossWeghtMeasure>10.3</GrossWeightMeasure> <NetWeightMeasure>10.1</NetWeightMeasure> <TareWeightMeasure>0.2</TareWeightMeasure> <ProductWeights>

| GDT | | Cat. | Object Class | Property | Representation/ Association | Type | Type Name | Len. | Card. |
|---|---|---|---|---|---|---|---|---|---|
| Product-Weights | | | Product Weights | | Details | | | | |
| | measure-UnitCode | A | Product Weights | Measure Unit | Code | GDT | Measure Unit Code | | 1 |
| | Gross Weight-Measure | E | Product Weights | Gross Weight | Measure | CDT | Measure | | 0..1 |
| | NetWeight-Measure | E | Product Weights | Net Weight | Measure | CDT | Measure | | 0..1 |
| | TareWeight-Measure | E | Product Weights | Tare Weight | Measure | CDT | Measure | | 0..1 |

A description of the measurements may be as follows: MeasureUnitCode (i.e., measurement unit), GrossWeightMeasure (i.e., gross weight=weight including packaging), NetWeightMeasure (i.e., net weight=weight excluding packaging), TareWeightMeasure (i.e., net weight=weight of packaging).

At least one weight may be specified. Depending on how ProductWeights is used, one of the weight details can be omitted since it can be calculated using the other two weights. If all weights are specified, then it can be measured according to the formula Gross Weight=Net Weight+Tare Weight. The plausibility of the weights can be checked in the context of each application.

ProductWeights can be used to calculate the total weight of several products. Examples of this may be: The gross weight is important for selecting the method of transport since goods are normally transported in their packaging. Or, the net weight is important for the maximum load bearing of a floor since the product is normally installed without its packaging. Or, the packaging weight can be specified instead of the gross weight, for example, to save weighing the product once it is packed; the gross weight can then be calculated.

ProfitCentreTypeCode

A ProfitCentreTypeCode is the coded representation of the nature of a profit center. An example of GDT ProfitCentreTypeCode is:

<ProfitCentreTypeCode>1</ProfitCentreTypeCode>

In certain implementations GDT ProfitCentreTypeCode may have the following structure:

| GDT | Object Class | Property | Representation/ Association | Type | Type Name | Len. | Remarks |
|---|---|---|---|---|---|---|---|
| ProfitCentre-TypeCode | Profit Centre | Type | Code | CDT | Code | 1..4 | restricted |

A customer-specific code list can be assigned to the code. A customer determines the codes in the code list. The attributes of the code can be assigned the following values: listID="10370". Also, listAgencyID can be the ID of the customer (ID from DE 3055, if listed there). ListversionId may be the version of the particular code list. It may be assigned and managed by the customer. The listAgencySchemeID may be the ID of the scheme if the listAgencyId does not come from DE3055. The listAgencySchemeAgencyID can be the ID of the organization from DE 3055 that may manage the listAgencySchemeIdscheme.

The ProfitCentreTypeCode makes it possible to define sets of profit centers on the basis of the value of the ProfitCentre-TypeCode. Reference may then be made to these sets in the assessment, overhead costing, or settlement, for example. Examples of possible code semantics include: Production: The profit center may have the nature of "Production". Sales and Distribution: The profit center may have the nature of "Sales and Distribution". Research and Development: The profit center may have the nature of "Research and Development".

ProjectElementAssignment

A ProjectElementAssignment is the assignment between two elements of a project. An example of GDT ProjectElementAssignment is:

<ProjectElementAssignment>
<FromProjectReference>
<ID>33FAEB7C03D0AF4CA09ECE33B3296C6D</ID>
<ElementID>548A8B7F39D8B618F40AB 8154015D306</ElementID>
<ElementTypeCode>2</ElementTypeCode>
</FromReference>
<ToProjectReference>
<ID>33FAEB7C03D0AF4CA09ECE33B3296C6D</ID>
<ElementID>57F39D8B618F40AB8154015D306FF33A</ElementID>
<ElementTypeCode>1</ElementTypeCode>
</ToProjectReference>
</ProjectElementAssignment>

In certain implementations GDT ProjectElementAssignment may have the following structure:

| GDT | | Cat. | Object Class | Property | Representation/ Association | Type | Type Name | Card. |
|---|---|---|---|---|---|---|---|---|
| ProjectElement-Assignment | | | Project Element Assignment | | Details | | | |
| | From-Project-Reference | E | Project Element Assignment | From Project Reference | Details | GDT | Project-Reference | 1 |
| | ToProject-Reference | E | Project Element Assignment | To Project Reference | Details | GDT | Project-Reference | 1 |

Examples of GDT ProjectElementAssignment may be FromProjectReference may be reference to the element in a project from which another element is to be assigned. ToProjectReference may be reference to the element in a project to which another element is to be assigned. Assignments between elements of projects are allowed, that is, FromProjectReference and ToProjectReference may contain references to elements in projects and not simply references to projects as a whole.

An example of a reference that may be allowed would be: FromProjectReference is a role and ToProjectReference is a task in the same project—the task may be assumed by the role (or more precisely, by a specific person who fills the role). A role may assume multiple tasks and a task can be performed by multiple roles. Further permitted assignments may be included as appropriate.

In certain implementations, a ProjectElementAssignment is used to assign two elements of the same project to each other. The significance of the assignment may be dependent on the type of the elements involved.

ProjectElementID

A ProjectElementID can be used to identify an element in a project. An element in a project may be a component of the project of a specific type, for example, a task or a role. An example of GDT ProjectElementID is:

<ProjectElementID>57F39D8B618F40AB8154015D306FF33A</ProjectElementID>

In certain implementations GDT ProjectElementID may have the following structure:

| GDT | | Cat. | Object Class | Property | Representation/ Association | Type | Type Name | Len. | Card. | Remarks |
|---|---|---|---|---|---|---|---|---|---|---|
| ProjectElementID | | | Project Element | Identification | Identifier | CDT | Identifier | 1..32 | | Restricted |
| | schemeID | A | Identification Scheme | Identification | Identifier | xsd | Token | 1..60 | 0..1 | |
| | schemeAgencyID | A | Identification Scheme Agency | Identification | Identifier | xsd | Token | 1..60 | 0..1 | |
| | schemeAgencySchemeAgencyID | A | Identification Scheme Agency | Scheme Agency | Identifier | xsd | Token | 1..3 | 0..1 | |

A ProjectElementID may consist of a character sequence with a maximum of 32 characters, taking into account the restrictions defined in xsd:token.

The ID in the context of these attribute values may be unique together with the related ProjectID. For example; schemeID may be the identification means of an identifier, or it may be the identification by means of a global unique identifier. SchemeAgencyID may be a business system in which the identifier has been assigned.

It is important to show from which project a ProjectElementId belongs from the use context. ProjectElementID may be used in order to uniquely identify an element in a project in a business process. In a first step—for example, on creation or first transfer of data on a business transaction—one partner uses a ProjectElementID to inform the other partner of his identification for an element in a project. The second partner can use this identifier in the follow-on process to reference the element.

ProjectElementTypeCode

A ProjectElementTypeCode is the coded representation of the type of an element in a project. The ProjectElementTypeCode can describe the nature of elements in projects according to their business significance. An example of GDT ProjectElementTypeCode is:

<ProjectElementTypeCode>1</ProjectElementTypeCode>

In certain implementations GDT ProjectElementTypeCode may have the following structure:

| GDT | Object Class | Property | Representation/ Association | Type | Type Name | Len. | Remarks |
|---|---|---|---|---|---|---|---|
| ProjectElementTypeCode | Project Element | Type | Code | CDT | Code | 1..3 | restricted |

The attributes are assigned values as follows: listID="10371", and listAgencyID="310."

In general a ProjectElementTypeCode may be used to describe the type of an element in a project that is identified by means of a ProjectElementID (As described above). The ProjectElementTypeCode is an code list with fixed predefined attributes. Changes to the permitted attributes can result in interface changes.

The GBT ProjectElementTypeCode may use the following codes: 1 (i.e., Task), 2 (i.e., role), 3 (i.e., checklist).

ProjectID

A ProjectID can be an identifier for a project. A project can be a business plan with a defined objective that may be achieved with predefined financial means, with the planned resources, at an agreed quality level, and by an agreed time. The project may be characterized by its uniqueness, its risk character, and its organizational significance. An example of GDT ProjectID is:

<ProjectID schemeID="ProjectGUID" schemeAgency ID="SYS_010" schemeAgencySchemeAgencyID="ZZZ">33FAEB7C03D0AF4CA09ECE33B3296C6D <ProjectID>

In certain implementations GDT ProjectId may have the following structure:

| GDT | | Cat. | Object Class | Property | Representation/ Association | Type | Type Name | Len. | Card. | Remarks |
|---|---|---|---|---|---|---|---|---|---|---|
| ProjectID | | | Project | Identification | Identifier | CCT | Identifier | 1..32 | | restricted |
| | schemeID | A | Identification Scheme | Identification | Identifier | xsd | token | 1..60 | 0..1 | |
| | scheme-AgencyID | A | Identification Scheme Agency | Identification | Identifier | xsd | token | 1..60 | 0..1 | |
| | scheme-Agency-Scheme-AgencyID | A | Identification Scheme Agency | Scheme Agency | Identifier | xsd | token | 1..3 | 0..1 | |

A ProjectID may consist of a character sequence with a maximum of 32 characters, taking into account the restrictions defined in xsd:token.

ProjectID may be used in order to uniquely identify a project in a business process. In a first step—for example, on creation or first transfer of data on a business transaction—one partner uses a ProjectID to inform the other partner of his identification for a project. The second partner can use this identifier in the follow-on process to reference the project.

ProjectReference

A ProjectReference can be a reference to a project or to an element within a project. An example of GDT ProjectReference is:

<ProjectReference><ProjectID>33FAEB7C03D0AF4C A09ECE33B3296C6D<ProjectID>

<ProjectElementID>57F39D8B618F40AB8154015D30 6FF33A<ProjectElementID><ProjectElementTypeCode>1 <ProjectElementTypeCode></ProjectReference>

In certain implementations GDT ProjectReference may have the following structure:

| GDT | | Cat. | Object Class | Property | Representation/ Association | Type | Type Name | Card. |
|---|---|---|---|---|---|---|---|---|
| Project-Reference | | | Project Reference | | Details | | | |
| | ProjectID | E | Project Reference | Project Identification | Identifier | GDT | ProjectID | 0..1 |
| | Project-ElementID | E | Project Reference | Project Element Identification | Identifier | GDT | Project-ElementID | 0..1 |
| | Project-Element-TypeCode | E | Project Reference | Project Element Type | Code | GDT | Project-Element-TypeCode | 0..1 |

A description of the attributes may be as follows: ProjectElementID may be the ID of an element within a referenced project. ProjectElementTypeCode (described above) may be the type of element that can be identified by ProjectElementID. For a reference to a project, a ProjectID may be provided.

For a reference to an element within a project, ProjectID, ProjectElementID and ProjectElementTypeCode may be provided unless ProjectElementID is unique without ProjectElementTypeCode. In this case it may be sufficient to provide only ProjectID and ProjectElementID. If ProjectElementID is unique without the corresponding project, it may be sufficient to provide only ProjectElementID (and ProjectElementTypeCode if necessary).

ProjectReference may be used for references to a project or to an element within a project.

ProjectSnapshotID

A ProjectSnapshotID is an identifier for a project snapshot. A project snapshot is a snapshot of a project that documents the state of the project at a certain point in time. An example of GDT ProjectSnapshotID is:

<ProjectSnapshotID>1001</ProjectSnapshotID>

In certain implementations GDT ProjectSnapshotID may have the following structure:

| GDT | Object Class | Property | Representation/ Association | Type | Type Name | Len. | Remarks |
|---|---|---|---|---|---|---|---|
| Project-SnapshotID | Project Snapshot | Identification | Identifier | CDT | Identifier | 1..24 | restricted |

ProjectTypeCode

A ProjectTypeCode is the coded representation of a project type. The key characteristics of a project type can be the process category, the scheduling type, permitted project tasks, and permitted check lists. An example of GDT ProjectTypeCode is:

<ProjectTypeCode>DEV_INTERNAL</ProjectTypeCode>

In certain implementations GDT ProjectTypeCode may have the following structure:

| GDT | | Cat. | Object Class | Property | Representation/ Association | Type | Type Name | Len. | Card. | Remarks |
|---|---|---|---|---|---|---|---|---|---|---|
| Project-TypeCode | | | Project | Type | Code | CDT | Code | 1..15 | | Restricted |
| | listID | A | Code List | Identification | Identifier | xsd | token | | 0..1 | |
| | list-AgencyID | A | Code List Agency | Identification | Identifier | xsd | token | | 0..1 | |
| | list-VersionID | A | Code List | Version | Identifier | xsd | token | | 0..1 | |
| | listAgency-SchemeID | A | Code List Agency | Scheme | Identifier | xsd | token | | 0..1 | |
| | listAgency-Scheme-AgencyID | A | Code List Agency | Scheme Agency | Identifier | xsd | token | | 0..1 | |

A customer-specific code list can be assigned to the ProjectTypeCode. A customer defines the codes in the code list.

Examples of customer-specific code semantics may be: research (i.e., research into a new product), investment project (i.e., construction of a dam), consultancy project (i.e., provision of support during the course of a larger project), organizational project (i.e., planning of major events), development project (i.e., development of a new software application), servicing project (i.e., maintenance of technical assets).

PromotionID

A PromotionID is a unique identifier for a promotion. A promotion may be a marketing activity between the consumer goods industry and retail over a limited timeframe to increase brand capital, name recognition, and market share, to boost sales volumes, or to position new products or product groups. An example of GDT PromotionID is:

<PromotionID>72318</PromotionID>

In certain implementations GDT PromotionID may have the following structure:

| GDT | | Cat. | Object Class | Property | Representation/ Association | Type | Type Name | Len. | Card. | Remarks |
|---|---|---|---|---|---|---|---|---|---|---|
| Promo-tionID | | | Promotion | Identification | Identifier | CDT | Identifier | 1..35 | | restricted |
| | scheme-Agency ID | A | Identification Scheme Agency | Identification | Identifier | XSD | Token | 1..60 | 0..1 | |

A promotion can have different objectives. For example to generate awareness of a new product, selectively increase demand for a certain brand, retain loyal customers, or fight competition, with various characteristics, (i.e., price reductions, retail promotion, promotional rebates). (VMI) and Collaborative Planning, Forecasting and Replenishment (CPFR)

PromotionID may be used in connection with cooperative business processes,to clearly identify a promotion between the business partners involved. Initially, one business partner, in particular Vendor Managed Inventory usually a retail company or a consumer goods manufacturer, may inform the other partner of his identification of the promotion with a PromotionID. This identification may then be used as a reference in the downstream message exchange between the business partners.

PromotionInternalID

PromotionInternalID is a proprietary identifier for a promotion. A promotion can be a marketing activity between the consumer goods industry and retail for a limited time period to increase brand equity, product awareness, and market share, to boost sales volumes, or to position new products or product groups. An example of GDT PromotionInternalID is:

<PromotionInternalID schemeAgencyID="MPL__002">1C743CEC501F6A4D<PromotionInternalID>

In certain implementations GDT PromotionInternalID may have the following structure:

| GDT | | Cat. | Object Class | Property Qualifier | Property | Representation/ Association | Type | Type Name | Len. | Card. | Remarks |
|---|---|---|---|---|---|---|---|---|---|---|---|
| Promotion-InternalID | | | Promotion | Internal | Identification | Identifier | GDT | PromotionID | 1..35 | | restricted |
| | Scheme-Agency ID | A | Identifica-tion Scheme Agency | | Identification | Identifier | XSD | Token | 1..60 | 0..1 | |

The GDT PromotionInternalID can be a projection of the GDT PromotionID that only contains the schemeAgencyID attribute for describing an internally assigned ID. If an attribute is not specified explicitly in the use of the GDT, it should be specified clearly through the context.

The PromotionInternalID may be used when both sender and recipient have access to shared master data; for example, during internal communication in an enterprise.

PromotionPartyID

A PromotionPartyID is an identifier for a promotion assigned by a party. A promotion can be a marketing activity between the consumer goods industry and retail for a limited time period to increase brand equity, product awareness, and market share, to boost sales volumes, or to position new products or product groups. An example of GDT PromotionPartyID is:

<PromotionVendorID>B232-6HS</PromotionVendorID>

In certain implementations, GDT PromotionPartyID may have the following structure:

| GDT | Object Class | Property Qual. | Property | Representation/ Association | Type | Type Name | Len. | Remarks |
|---|---|---|---|---|---|---|---|---|
| Promotion-PartyID | Promotion | Party | Identi-fication | Identifier | GDT | PromotionID | 1..35 | restricted |

The PromotionPartyID may be a proprietary identifier.

In the context of a message, the expression "Party" in PromotionPartyID can be replaced by the role of the party assigning the identifier; for example, PromotionSellerID if the identifier for the promotion is assigned by the SellerParty.

In case there is a need to distinguish between several schemes, schemeID and schemeVersionID may be included as attributes.

Property

A property is an object attribute. FIG. 32-C illustrates the relationships between Property, PropertyDefinitionClass, and PropertyDataType. In some implementations, a property definition class defines an area of validity for properties. The structure of the values and the value range of a property are defined by a property data type. A data type such as this can be used by several properties. Properties can be simple, or complex. A complex property is described by a complex data type.

The complex data type references the property definition class that describes the semantics of the data type and contains the component properties of such a complex property. An example of GDT Property is:

<Property> <ID schemeAgencyID="005">PROPERTY__1</ID>
<DefinitionClassReference> <ID schemeAgencyID="005">DEFCLASS__01</ID>
<VersionID>DEFCLASS__01</VersionID> </DefinitionClassReference>
<PreferredName languageCode="EN">My first property</PreferredName>
<PreferredName languageCode="DE">Mein erstes Merkmal</PreferredName>
<PropertyDataTypeReference>DATATYPE__5</PropertyDataTypeReference></Property>

In certain implementations, Property may have the following structure:

| GDT | | Cat. | Object Class | Property Qual. | Property | Rep./Ass. | Type | Type Name | Len. | Card. | Remarks |
|---|---|---|---|---|---|---|---|---|---|---|---|
| Property | | | Property | | | Details | | | | | |
| | actionCode | A | Property | | Action | Code | GDT | ActionCode | | 0..1 | |
| | ID | E | Property | | Identification | Identifier | GDT | PropertyID | | 1 | |
| | VersionID | E | Property | | Version Identification | Identifier | GDT | VersionID | | 0..1 | |
| | Definition-ClassReference | E | Property | | Definition Class Reference | Details | GDT | Property-Definition-Class-Reference | | 0..1 | |
| | RevisionID | E | Property | | Revision Identification | Identifier | CDT | Identifier | 1..10 | 0..1 | restricted |
| | Creation-DateTime | E | Property | | Creation | Date Time | CDT | DateTime | | 0..1 | |
| | Version-DateTime | E | Property | | Version | Date Time | CDT | DateTime | | 0..1 | |
| | Revision-DateTime | E | Property | | Revision | Date Time | CDT | DateTime | | 0..1 | |
| | Subject-AreaCode | E | Property | | Subject Area | Code | GDT | Subject-AreaCode | | 0..n | |
| | Preferred-Name | E | Property | Preferred | Name | Name | CDT | Name | | 1..n | |

-continued

| GDT | | Cat. | Object Class | Property Qual. | Property | Rep./Ass. | Type | Type Name | Len. | Card. | Remarks |
|---|---|---|---|---|---|---|---|---|---|---|---|
| | SynonymousName | E | Property | Synonymous | Name | Name | CDT | Name | | 0..n | |
| | AbbreviationName | E | Property | Abbreviation | Name | Name | CDT | Name | | 0..n | |
| | DefiningDescription | E | Property | Defining | Description | Text | GDT | Description | | 0..n | |
| | UsageDescription | E | Property | Usage | Description | Text | GDT | Description | | 0..n | |
| | PreferredSymbolNote | E | Property | Preferred | Symbol | Note | GDT | Note | | 0..n | |
| | SynonymousSymbolNote | E | Property | Synonymous | Symbol | Note | GDT | Note | | 0..n | |
| | DefinitionSourceDocumentWebAddress | E | Property | DefinitionSource | Document | WebAddress | GDT | WebAddress | | 0..1 | |
| | IconAttachment | E | Property | | Icon Attachment | Details | GDT | Attachment | | 0..1 | |
| | FigureAttachment | E | Property | | Figure Attachment | Details | GDT | Attachment | | 0..1 | |
| | PropertyDataType | E | Property | | Property Data Type | Details | GDT | PropertyDataType | | 0..1 | |
| | PropertyDataTypeReference | E | Property | | Property Data Type Reference | Details | GDT | PropertyDataTypeReference | | 0..1 | |
| | MeasureUnitMeaningCode | E | Property | | Measure Unit Meaning | Code | GDT | MeasureUnitMeaningCode | | 0..1 | |
| | DependingPropertyReference | E | Property | Depending | Property Reference | Details | GDT | PropertyReference | | 0..n | |
| | ConstrainingPropertyReference | E | Property | Constraining | Property Reference | Details | GDT | PropertyReference | | 0..n | |
| | ValueChangeAllowedIndicator | E | Property | | Value Change Allowed | Indicator | GDT | AllowedIndicator | | 0..1 | |
| | AspectID | E | Property | | Aspect Identification | Identifier | GDT | AspectID | | 0..n | only for catalog |
| | TargetInterfaceElementID | E | Property | | Target Interface Element Identification | Identifier | GDT | InterfaceElementID | | 0..n | only for catalog |
| | MultipleValueIndicator | E | Property | | Multiple Value | Indicator | GDT | PropertyMultipleValueIndicator | | 0..1 | only for catalog |
| | TextSearchableIndicator | E | Property | | Text Searchable | Indicator | GDT | TextSearchableIndicator | | 0..1 | only for catalog |
| | ParametricSearchableIndicator | E | Property | | Parametric Searchable | Indicator | GDT | PropertyParametric SearchableIndicator | | 0..1 | only for catalog |
| | ValuationRequiredIndicator | E | Property | | Valuation Required | Indicator | GDT | PropertyValuation RequiredIndicator | | 0..1 | only for catalog |
| | OrdinalNumberValue | E | Property | | Ordinal Number Value | Details | GDT | OrdinalNumberValue | | 0..1 | only for catalog |

In the above mentioned structure for GDT Property, an ActionCode is a coded representation of an instruction to the recipient of a message telling it how to process a transmitted business object. An ID is the unique identifier of the property. A VersionID is the uniqued identifier for a version of the property. A DefinitionClassReference is a reference to the definition class (or a version of the definition class) of the property; if a reference exists, the property is unique within the specified definition class only. A RevisionID is the revision number is a sequential number that is assigned when changes are made. CreationDateTime is the creation date/time. VersionDateTime is the creation date/time of this property version. RevisionDateTime is the date/time of the last change. SubjectAreaCode is the subject area in which the property can be used; see GDT SubjectAreaCode below. PreferredName is the name of the property, maximum one entry per language. SynonymousName is the synonomous names for the property. AbbreviationName is the abbreviated property name; maximum one entry per language. DefiningDescription is a unique definition of the property's meaning that enables the property to be distinguished uniquely from all other properties. Only one definition can be entered for each language. AdditionalDescription is an additional description for parts of the property and that aids the understanding of the property. UsageDescription is a free-text comment. It can be used to add an explanatory text or general/individual notes. In certain implementations, the comment may not be used to supplement the definition; the description can be used for this purpose. The comment is used to clarify particular aspect concerning the use of property. The PreferredSymbol is the symbol for the property, such as "d" for diameter. SynonymalSymbol is the synonymous symbols for the property. DefinitionSourceDocumentWebAddress is a reference to the original document from which the complete property definition or its meaning was taken. Icon is the preferred icon. A character (alphanumeric character, symbol, or combination thereof) that conforms to international standards and that, particularly in formulas, represents the property in place of the property name. Figure is a link to a figure. PropertyDataType is if the data type of the property is defined for this property only (local), the GDT is embedded here. In this case, GlobalPropertyDataType is not used. PropertyDataTypeReference is if the data type of the property is defined for this property only (local), the GDT is embedded here. In this case, GlobalPropertyDataType is not used. The MeasureUnitMeaningCode gives the meaning of a physical unit; see GDT MeasureUnitMeaningCode below. DependingPropertyReference is in the case of a dependent property, the reference to the dependent properties (for example, the "temperature" property, which affects the measurement of a length, contains the key for the "length" property here; in the evaluation, the "temperature" property contains the temperature at which the length is to be measured). ContainingPropertyReference is in the case of a dependant property, the reference to the constraining properties (for example, the "length" property, which is dependent on the temperature, contains the key for the "temperature" property here; in the evaluation, the "temperature" property contains the temperature at which the length is to be measured.) The ValueChangeAllowedIndicator specifies whether or not a property value change is permitted (for example, the value of a property may not be changed because it has been derived from other values.

The following elements can be used in the context of a catalogue: AspectID identifies an aspect for which the property is relevant. The TargetInterfaceElementId is a unique identifier of an interface to which the property can be assigned. MultipleValueIndicator indicates whether a property can contain a list of values or not. The TextSearchableIndicator indicates whether a property is feasible for a text search or not. The ParametricSearchableIndicator indicates whether a property is feasible for a parametric search or not. The ValuationRequiredIndicator indicates whether a property is feasible for a parametric search or not. The OrdinalNumberValue is the position of the property in a property list. It may be noted that this position is overwritten by any other OrdinalNumberValue for this property on a more granular level. The property can have a data type. The data type can either be embedded under PropertyDataType or specified as a reference under PropertyDataType. ISO13584/42 specifies that a property may not be dependent and constraining at the same time; this means that DependingPropertyReference and ConstrainingPropertyReference cannot both be filled. Properties can be used for classification, for example.

Some elements that are mandatory in ISO13584/42 are optional in this schema. This is intended to enable wider use of the schema; consequently, using the GDT does not necessarily ensure ISO compatibility.

The attribute AdditionalDescription may correspond to the attribute Note in ISO; the attribute UsageDescription may correspond to the attribute Remark in ISO.

ISO also contains an attribute which contains a formula describing the property; the GDT may not contain this attribute.

PropertyDataType

A PropertyDataType is the data type of a property. It may describe the syntax of the values and can contain a list of permitted values. An example of GDT PropertyDataType is:

<PropertyDataType>
<ID schemeAgencyID="005">MY_DATATYPE__01</ID>
<VersionID>5</VersionID>
<PreferredName languageCode='EN'>My first data type</PreferredName>
<Format>02</Format>
<MaximumTotalDigits>13</MaximumTotalDigits>
<LowerCaseAllowedIndicator>true</LowerCaseAllowedIndicator>
</PropertyDataType>

Another example of PropertyDataType is:

<PropertyDataType>
<ID schemeAgencyID="005">MY_DATATYPE__01</ID>
<VersionID>5</VersionID>
<PreferredName languageCode='EN'>My first data type</PreferredName>
<FormatCode>06</FormatCode>
<MaximumTotalDigitsNumeric>13</MaximumTotalDigitsNumeric>
<FractionalDigitsNumeric>5</FractionalDigitsNumeric>
<NegativeValuesAllowedIndicator>true</NegativeValuesAllowedIndicator>
<IntervalValuesAllowedIndicator>true</IntervalValuesAllowedIndicator>
</PropertyDataType>

In certain implementations, PropertyDataType may have the following structure:

| CDT | | Cat. | Object Class | Property Qual. | Property | Rep./ Ass. Qual. | Rep./ Ass. | Type | Type Name | Len. | Card. |
|---|---|---|---|---|---|---|---|---|---|---|---|
| Property-DataType | | | Property Data Type | | | | Details | | | | |
| | actionCode | A | Property Data Type | | Action | | Code | GDT | Action-Code | | 0..1 |
| | ID | E | Property Data Type | | Identifi-cation | | Identi-fier | GDT | Property-DataTypeID | | 0..1 |

| CDT | | Cat. | Object Class | Property Qual. | Property | Rep./ Ass. Qual. | Rep./ Ass. | Type | Type Name | Len. | Card. |
|---|---|---|---|---|---|---|---|---|---|---|---|
| | VersionID | E | Property Data Type | | Version Identification | | Identifier | GDT | VersionID | | 0..1 |
| | PreferredName | E | Property Data Type | Preferred | Name | | Name | CDT | Name | | 1..n |
| | Synonymous-Name | E | Property Data Type | Synonymous | Name | | Name | CDT | Name | | 0..n |
| | ShortName | E | Property Data Type | Short | Name | | Name | CDT | Name | | 0..n |
| | IconAttachment | E | Property Data Type | | Icon | | Attachment | CDT | Attachment | | 0..1 |
| | Description | E | Property Data Type | | Description | | Text | GDT | Description | | 0..n |
| | UsageDescription | E | Property Data Type | Usage | Description | | Text | GDT | Description | | 0..n |
| | FormatCode | E | Property Data Type | | Format | | Code | GDT | Property-DataType-Format-Code | | 1..1 |
| | LanguageDependencyIndicator | E | Property Data Type | | Language Dependency | | Indicator | GDT | Language-DependencyIndicator | | 0..1 |
| | MaximumTotal-DigitNumber-Value | E | Property Data Type | Maximum Total | Digit Number | Digit Number | Value | GDT | DigitNumberValue | | 0..1 |
| | FractionalDigit-NumberValue | E | Property Data Type | Fractional | Digit Number | Digit Number | Value | GDT | DigitNumberValue | | 0..1 |
| | LowerCase-Allowed-Indicator | E | Property Data Type | | Lower Case Allowed | | Indicator | GDT | Allowed-Indicator | | 0..1 |
| | NegativeValue-Allowed-Indicator | E | Property Data Type | | Negative Value Allowed | | Indicator | GDT | Allowed-Indicator | | 0..1 |
| | MeasureUnit-Code | E | Property Data Type | | Measure Unit | | Code | GDT | Measure-UnitCode | | 0..1 |
| | CurrencyCode | E | Property Data Type | | Currency | | Code | GDT | Currency-Code | | 0..1 |
| | Exponential-Representation TypeCode | E | Property Data Type | | ExponentialRepresentation Type | | Code | GDT | ExponentialRepresentation-TypeCode | | 0..1 |
| | ExponentIntegerValue | E | Property Data Type | | Exponent | Integer | Value | GDT | Integer-Value | | 0..1 |
| | IntervalValue-Allowed-Indicator | E | Property Data Type | Interval | Value Allowed | | Indicator | GDT | Allowed-Indicator | | 0..1 |
| | Fractional-DigitPresentationAccuracy-RequiredIndicator | E | Property Data Type | Fractional Digit | Presentation Accuracy-Required | | Indicator | GDT | Required-Indicator | | 0..1 |
| | Regular-Expression | E | Property Data Type | | Regular Expression | | Text | CDT | Note | | 0..1 |
| | SeparatorSign-RequiredIndicator | E | Property Data Type | | Separator Sign-Required | | Indicator | GDT | Required-Indicator | | 0..1 |
| | Tupel-LengthValue | E | Property Data Type | | Tupel Length | Tupel Length | Value | GDT | Tupel-LengthValue | | 0..1 |
| | Component-PropertyDefinitionClass-Reference | E | Property Data Type | Component | Property Definition Class Reference | | Details | GDT | Property-Definition Class-Reference | | 0..1 |

-continued

| CDT | | | Cat. | Object Class | Property Qual. | Property | Rep./ Ass. Qual. | Rep./ Ass. | Type | Type Name | Len. | Card. |
|---|---|---|---|---|---|---|---|---|---|---|---|---|
| | Component-Property | | E | Property Data Type | Component | Property Reference | | Details | GDT | Property-Reference | | 0..n |
| | | Reference | E | Component Property | | Property Reference | | Details | GDT | Property-Reference | | 1 |
| | | Ordinal-Number-Value | E | Component Property | | Ordinal Number | | Value | GDT | Ordinal-Number-Value | | 0..1 |
| | AllowedProper-tyValueElement | | E | Property Data Type | Allowed | Property-Value-Structure | | Details | | | | 0..n |
| | | Property-Value | E | Allowed Property Value Element | | Property-Value | | Details | GDT | Property-Value | | 1 |
| | | Value-Default-Indicator | E | Allowed Property Value Element | | Value-Default | | Indica-tor | CDT | Indicator | | 0..1 |
| | | NetEle-mentID | E | Allowed Property Value Element | | NetElement-Identifi-cation | | Identi-fier | CDT | Identifier | 5 | 0..1 |
| | | Preceed-ingNet-ElementID | E | Allowed Property Value Element | Preceding | Netelment-Identifi-cation | | Identi-fier | CDT | Identifier | 5 | 0..n |
| | AllowedProper-tyValuation | | E | Property Data Type | Allowed | Property Valuation | | Details | GDT | Property-Valuation | | 0..n |

In the above mentioned structure for GBT PropertyDataType, an ActionCode is an instruction to the recipient of a message telling it how to process a transmitted property data. An ID Is a unique identifier of the data type. A data type can either be embedded in a property or defined as a dependant object, in which case, no identifier or names are specified. If a data type is to be used for several properties, it may have its own key and have a name. VersionID is a unique identifier for a version of the data type. PreferredName is a name with a maximum of one entry per language. SynonymousName represents synonyms for the data type. Several synonyms can be specified for each language. ShortName represents the short name of the data type. One short name can be entered for each language. IconAttachment is a preferred icon. A character (alphanumeric character, symbol, or combination thereof) that conforms to international standards and that, particularly in formulas, represents the data type in place of the data type name.

Description represents additional description for any parts of the definition class and that aids the understanding of the definition class. The description can supplement the definition. UsageDescription is the description of special aspects concerning the usage of the property. This can be an explanatory text or general/individual notes. FormatCode is the format of the data type (see GDT PropertyDataTypeFormatCode). The LanguageDependancyIndicator value defines the neutrality. For example, the default value is "false" (i.e., values are language neutral). MaximumTotalDigitNumber is the total length, including decimal places. FractionalDigitNumber is the number of decimal places. LowerCaseAllowedIndicator indicates whether or not lowercase entries are allowed. The default value is "false" (i.e., lowercase values are not allowed). NegativeValueAllowedIndicator indicates whether or not negative values are allowed. The default value is "false" (i.e., negative values are not allowed). MeasureUnitCode is a coded representation of a non-monetary unit of measurement; see GDT MeasureUnitCode below). CurrencyCode represents currency of the data type; see GDT CurrencyCode below. ExponentialRepresentationTypeCode is a type of exponential representation; see GDT ExponentialRepresentationTypeCode below. ExponentIntegerValue is the exponent value for exponential representation with predefined exponents. IntervalValueAllowedIndicator indicates whether or not interval values are allowed (the interval is classed as one value in the value list.) The default value is "false" (i.e., interval values are not allowed). The entry is useful only for numeric formats. FractionalDigitPresentationAccuracyRequiredIndicator indicates whether or not the number of decimal places of numeric values follows the entry under FractionalDigitsNumeric or the actual user entry. Example: three decimal places, entry 2.40; if this switch is not set, the entry is formatted as 2.400, if the switch is set, the format remains as 2.40. The indicator is useful only for numeric formats. The default value is "false", i.e. FractionalDigitsNumeric is deciding. RegularExpression is a formula that describes the data type, i.e., for a data type for density, this could indicate that the density is the quotient of mass and volume. The entry is useful only for numeric formats. SeparatorSignRequiredIndicator indicates whether or not thousand separators are to be used in numeric formats. The default value is "true" (i.e., thousand separators are used). TupelLengthValue represents if the data type is used to record measured values, minimum, maximum, and average values, for example, need to be recorded, since a single value is generally not sufficient; all these values can have the same format. In this case, the TupelLengthValue can be used to specify that a value data set is used in an operation. In the example, a 3-tuple is used for specifying values. TupelLengthValue is typically used for numeric formats. If this attribute is not specified, the values are single values. ComponentPropertyDefinitionClassReference represents the case of complex data types, this is the reference to the definition class (or to a version of the definition class) that contains the subproperties of the complex data type. If a definition class is not used, the properties contained are specified under ComponentPropertyReference instead. ComponentProperty represents the case of complex data types, these are the properties that form the components of the complex data type and the attributes related to this assignment.

ComponentPropertyReference represents the identifiers of the properties that form the complex data type if a complex data type is modeled, but no definition class is used. A complex data type contains at least two properties. PropertyOrdinalNumberValue is the Position of a given property in the list of component properties. The sequence of this property list is specified by the display sequence of the properties. AllowedPropertyValueElement is the data type value that is allowed in an evaluation of the associated property. If no value is specified, there are no restrictions in terms of the values allowed in an evaluation (with the exception of the format specifications for the data type). AllowedPropertyValue is the value allowed. The ValueDefaultIndicator indicates whether or not the value or value interval is a standard value or standard value interval. The format and value range are defined by the GDT Indicator. The default value is “false,” (i.e., the value is not a standard value). The NetElementID identifies the current value or value interval in a value hierarchy. The ID is allocated sequentially in whole numbers in the value list. NetElementID is type CDT: Identifier. The PreceedingNetElementID identifies a preceding value or preceding value interval in the value hierarchy. There can be several preceding values or value intervals. PreceedingNetElementID is type CDT: Identifier. AllowedPropertyValuation represents if the data type is a complex data type, it cannot have a direct value list. The values allowed result from the valuation of the components of the complex data type; this valuation is specified in AllowedPropertyValuation.

There are a number of consistency conditions for the individual fields; the key consistency conditions are as follows: LanguageDependencyIndicator is for character format only. In certain implementations, the MaximumTotalDigitNumber is 1 for Boolean values and not set for character strings of unlimited length and complex data types. FractionalDigitsNumber are for decimal numbers and exponential numbers only; shorter than the total length. The LowerCaseAllowedIndicator is for character format only. The NegativeValueAllowedIndicator is for whole numbers, decimal numbers, exponential numbers, and currency format only. The ExponentialRepresentationTypeCode is for exponential format only. The ExponentInteger is for ExponentialRepresentationTypeCode=02 only. The IntervalValueAllowedIndicator is for whole numbers, decimal numbers, exponential numbers, and currency format only. The FactionalDigitsPresentationAccuracyRequiredIndicator is for decimal numbers and exponential numbers only. The SeparatorSignRequiredIndicator is for whole numbers, decimal numbers, exponential numbers, and currency format only. The TypelLengthNumber is typically used for integers, decimal numbers, and exponential numbers.

The AllowedPropertyValue can be filled for simple data types. The AllowedPropertyValuation can be filled for complex data types. If the data type contains a value list, the values contained in the list may satisfy the value syntax defined in the data type.

In the case of complex data types, either the identifier for the area of application (ComponentPropertyDefinitionClassReference) or the list of the components contained (ComponentPropertyReference) may be used; it may not be possible to use both at the same time.

The data type can be specified for a property in order to define its format and allowed values. If the data type does not contain a value list, any value that satisfies the format described in the data type may be allowed for the assigned property. A data type can be created explicitly with an external key. Such data types can be assigned to several properties. Alternatively, a data type can be created implicitly when a property is created; in this case, the data type can be used for this particular property only and that it can be changed only on the basis of this particular property.

The data type defined here is not to be confused with a DDIC data type. It may contains particular properties, may not cover all of the attributes of a DDIC data type, and can be, above all, linked to ISO13584/42. Some elements that are mandatory in ISO13584/42 are optional in this scheme (especially, the optional use of the definition class in the case of complex data types). This is intended to enable wider use of the scheme; consequently, using the GDT may not ensure ISO compatibility. The attribute Description can correspond to the attribute Note in ISO; the attribute UsageDescription can correspond to the attribute Remark in ISO. For NetElementID and PreceedingNetElementID: when the values allowed for the property are defined, they can be arranged in hierarchies in order to simplify navigation and value selection. There may be no set hierarchy; a value can have several predecessors. For example, the values of the property ‘country’ are to be arranged by continent. For obvious reasons, Great Britain is to be grouped under North America as well as under Europe. In our scheme, these values would appear as follows: 1 (i.e., Europe), 2 (i.e., North America) 3 (i.e., Germany), 4 (i.e., US), 5 (i.e., Great Britain).

PropertyDataTypeComponentID

A PropertyDataTypeComponentID is a unique identifier for a property data type component. A PropertyDataTypeComponentID may define a component of a composite property data type. A property data type may define the data type of properties. A composite property data type may be a structured property data type, which consists of sub objects (components). An example of GDT PropertyDataTypeComponentID is:

<PropertyDataTypeComponentID>ComponentOfMy DataType</PropertyDataTypeComponentID>

In certain implementations, GDT PropertyDataTypeComponentID may have the following structure:

| GDT | | Cat. | Object Class | Property | Representation/Association | Type | Type Name | Len. | Card. | Remarks |
|---|---|---|---|---|---|---|---|---|---|---|
| PropertyDataType-ComponentID | | | Property Data Type Component | Identification | Identifier | CDT | Identifier | 1..40 | | restricted |
| | schemeID | A | Identification | Identification | Identifier | xsd | token | 1..60 | 0..1 | |

-continued

| GDT | | Cat. | Object Class | Property | Representation/Association | Type | Type Name | Len. | Card. | Remarks |
|---|---|---|---|---|---|---|---|---|---|---|
| | scheme-VersionID | A | Scheme Identification Scheme | Version | Identifier | xsd | token | 1..15 | 0..1 | |
| | scheme-AgencyID | A | Identification Scheme Agency | Identification | Identifier | xsd | token | 1..60 | 0..1 | |
| | schemeAgency-SchemeID | A | Identification Scheme Agency | Scheme | Identifier | xsd | token | 1..60 | 0..1 | |
| | schemeAgency-SchemeAgency-ID | A | Identification Scheme Agency | Scheme Agency | Identifier | xsd | token | 3 | 0..1 | |

In certain implementations, PropertyDataTypeComponentID can be case insensitive while still allowing upper and lower case characters to be used.

For the GDT PropertyDataTypeComponentId structure described above the schemeId may be the ID of the ID scheme. This may be released and maintained by the responsible organization of the ID scheme. The GDT owner may retrieve the correct ID from the responsible organization. If there is not unique ID available, the name of the identifier or identifier type can be entered, which may be used in the corresponding standard, specification, or scheme of the responsible organization. The schemeVersionID can be the version of the ID scheme which can be released and maintained by the organization, which is named in schemeAgencyID. The owner can retrieve the relevant version ID from the responsible organization. SchemeAgencyId can be the ID of the organization maintaining the ID scheme. This identification may be released by an organization contained in DE 3055 (i.e., DUNS, EAN . . . ). The GDT owner may retrieve the correct ID from the responsible organization. If the organization is not contained in DE 3055, then the GDT owner may proceed like described in “Data Type Catalog”. SchemeagencySchemeID is the identification of the schema which identifies the organization named in schemeAgencyID. It’s a certain scheme ID of partners, companies, members etc. (i.e. DUNS+4) of an organization named in schemeAgency-SchemeAgencyID (Bsp. EAN, DUNS, SWIFT, etc.). SchemeAgencySchemeAgencyID is the identification of the maintaining organization (i.e. DUNS, EAN, SWIFT, etc.) which is responsible for the identification of the organization named in schemeAgencyID. The organization may be contained in DE 3055.

A PropertyDataTypeComponentID may be used in the context of the property data type to which the component belongs. A distinction may not be made between upper and lowercase characters.

PropertyDataTypeFormatCode

The PropertyDataTypeFormatCode is a coded representation of the format of a property data type. An example of GDT PropertyDataTypeFormatCode is:

<PropertyDataTypeFormatCode>date</PropertyDataTypeFormatCode>

In certain implementations, GDT PropertyDataTypeFormatCode may have the following structure:

| GDT | Object Class | Property | Representation/Association | Type | Type Name | Len. | Remarks |
|---|---|---|---|---|---|---|---|
| PropertyDataTypeFormatCode | Property Data Type | Format | Code | CDT | Code | 10 | restricted |

The data type GDT PropertyDataTypeFormatCode may use the following codes: boolean (i.e., boolean), complex (i.e., complex), date (i.e., date), decimal (i.e., decimal), float (i.e., float), integer (i.e., integer), string (i.e., string), time (i.e., time), dateTime (i.e., dateTime), anyURI (i.e., anyURI), binary (i.e., binary object).

The type may be used in the GDT PropertyDataType. The Code may establish which formats are possible for a data type entry and how associated values are transferred and stored. The valuations for the formats (i.e., the number of decimal places) can be specified in the GDT PropertyDataType.

PropertyDataTypeID

A PropertyDataTypeID is a unique identifier for a property data type. PropertyDataType may be the data type of a property. It can describes the syntax of the property values and can contain a list of permitted values. An example of GDT PropertyDataTypeID is:

<PropertyDataTypeID schemeAgencyID=‘005’>MY_DATATYPE__01</PropertyDataTypeID>

In certain implementations, GDT PropertyDataTypeID may have the following structure:

| GDT | | Cat. | Object Class | Property | Representation/Association | Type | Type Name | Len. | Remarks |
|---|---|---|---|---|---|---|---|---|---|
| Property-DataType-ID | | | Property Data Type | Identification | Identifier | CDT | Identifier | 1..50 | restricted |
| | schemeAgencyID | A | Identification Scheme Agency | Identification | Identifier | XSD | Token | 1..60 | |
| | schemeAgency-SchemeID | A | Identification Scheme Agency | Scheme | Identifier | XSD | Token | 1..60 | |
| | schemeAgency-SchemeAgencyID | A | Identification Scheme Agency | Scheme Agency | Identifier | XSD | Token | 1..3 | |

The GDT may be used to assign an independently defined data type to a property. The concept may defined in ISO13584/42. The GDT PropertyDataTypeReference may be used to reference a version of a property data type. Related GDTs may be: PropertyID (described above), Property (described above), DefinitionClassID (described above), DefinitionClass (described above), PropertyValues (described below), PropertyValuation (described below).

PropertyDataTypeReference

A PropertyDataTypeReference is a unique reference to a property data type or a version of a property data type. PropertyDataType can be the data type of a property. It can describes the syntax of the property values and can contain a list of permitted values. An example of GDT PropertyDataTypeReference is:

<PropertyDataTypeReference>
<ID schemeAgencyID="005">MY_DATATYPE__01</ID>
<VersionID>1</VersionID></PropertyDataTypeReference>

(005=ISO)

In certain implementations, GDT PropertyDataTypeReference may have the following structure:

| GDT | | Cat. | Object Class | Property | Representation/Association | Type | Type Name | Card. |
|---|---|---|---|---|---|---|---|---|
| Property-DataType-Reference | | | Property Data Type Reference | | Details | | | |
| | ID | E | Property Data Type Reference | Identification | Identifier | GDT | Property-DataTypeID | 1 |
| | VersionID | E | Property Data Type Reference | Version Identification | Identifier | GDT | VersionID | 0..1 |

In the structure above for GDT PropertyDataTypeReference ID is the identifier of the property data type. VersionID is the version of the property data type.

PropertyDefinitionClass

A PropertyDefinitionClass is a class for defining properties (e.g., in a classification system). FIG. 32-D illustrates a PropertyDefinitionClass. A PropertyDefinitionClass may define a subject area. The properties defined in a PropertyDefinitionClass may represent the attributes of this subject area.

In certain implementations, the PropertyDefinitionClass is not used directly for classifying objects. For this purpose, classes can be defined that use the properties defined in a PropertyDefinitionClass. PropertyValuation environment, relationships to other objects "Simple" properties are described first.

A property definition class can contain one or more properties. A property can have property valuations, each of which assigns one or more property values to a property.

A property is typed by a property data type, which specifies the possible property values for the property valuations. The values permitted by the property data type can be specified by listing the values in "PropertyValue". Complex properties can also be defined. A complex property data type can be used to define a complex property by referencing to a property definition class. The property definition class contains several properties that structure the complex property data type. The properties are then typed by property data types.

In some implementations, properties can also be defined without a property definition class. In this case, each property is defined globally, i.e., the "area of application" of the properties is not specified by the property definition class.

A PropertyValuation is used to valuate properties for any objects, or to assign values to properties. An example of GDT PropertyDefinitionClass is:

<PropertyDefinitionClass>
<ID schemeAgencyID="005">SCREW_PROPERTIES</ID>
<VersionID>1</VersionID>
<PreferredName languageCode='EN'>
'Properties for screw description'
</PreferredName>
<ShortName languageCode='EN'>
'Screws'
</ShortName>
<DefinedProperty>
<Reference>
<ID schemeAgencyID="005">LENGTH</ID>
<VersionID>1</VersionID>
<DefinitionClassReference>
<ID>SCREW_PROPERTIES</ID>
<VersionID>1</VersionID>
</DefinitionClassReference>
</Reference>
</DefinedProperty>
<DefinedProperty>
<Reference>
<ID schemeAgencyID="005">HEAD_TYPE</ID>

```
<VersionID>1</VersionID>
<DefinitionClassReference>
<ID>SCREW_PROPERTIES</ID>
<VersionID>1</VersionID>
</DefinitionClassReference>
</Reference>
```

```
<SubHierarchyDefinitionIndicator>true</SubHierarchyDefinitionIndicator>
</DefinedProperty>
</PropertyDefinitionClass>
```

In certain implementations GDT PropertyDefinitionClass may have the following structure:

| GDT | | | Cat. | Object Class | Property Qual. | Property | Representation/Association | Type | Type Name | Len. | Card. | Remarks |
|---|---|---|---|---|---|---|---|---|---|---|---|---|
| PropertyDefinitionClass | | | | Property Definition Class | | | Details | | | | | |
| | actionCode | | A | Property Definition Class | | Action | Code | GDT | ActionCode | | 0..1 | |
| | ID | | E | Property Definition Class | | Identification | PropertyDefinitionClassID | GDT | PropertyDefinitionClassID | | 1..1 | |
| | VersionID | | E | Property Definition Class | | Version Identification | Identifier | GDT | VersionID | | 0..1 | |
| | RevisionID | | E | Property Definition Class | | Revision Identification | Identifier | CDT | Identifier | 1..10 | 0..1 | restricted |
| | CreationDateTime | | E | Property Definition Class | | Creation Date Time | Date Time | CDT | DateTime | | 0..1 | |
| | VersionDateTime | | E | Property Definition Class | | Version Date Time | Date Time | CDT | DateTime | | 0..1 | |
| | RevisionDateTime | | E | Property Definition Class | | Revision Date Time | Date Time | CDT | DateTime | | 0..1 | |
| | PreferredName | | E | Property Definition Class | Preferred | Name | Name | CDT | Name | | 1..n | |
| | SynonymouslName | | E | Property Definition Class | Synonymous | Name | Name | CDT | Name | | 0..n | |
| | ShortName | | E | Property Definition Class | Short | Name | Name | CDT | Name | | 0..n | |
| | IconAttachment | | E | Property Definition Class | Icon | Attachment | Attachment | GDT | Attachment | | 0..1 | |
| | DefiningDescription | | E | Property Definition Class | Defining | Description | Text | GDT | Description | | 0..n | |
| | SourceDocumentWebAddress | | E | Property Definition Class | Source | Document | WebAddress | GDT | WebAddress | | 0..1 | |
| | AdditionalDescription | | E | Property Definition Class | Additional | Description | Text | GDT | Description | | 0..n | |
| | UsageDescription | | E | Property Definition Class | Usage | Description | Text | GDT | Description | | 0..n | |
| | TypeCode | | E | Property Definition Class | | Type | Code | GDT | PropertyDefinitionClassTypeCode | | 0..1 | |
| | SimplifiedGraphicAttachment | | E | Property Definition Class | Simplified-Graphic | Attachment | Attachment | GDT | Attachment | | 0..1 | |
| | SubjectAreaCode | | E | Property Definition Class | Topic | Subject-Area | Code | GDT | SubjectAreaCode | | 0..n | |
| | ParentPropertyDefinitionClassReference | | E | Property Definition Class | Parent | Definition Class Reference | Details | GDT | PropertyDefinitionClassReference | | 0..1 | |
| | DefinedProperty | | E | Property Definition Class | | Defined Property | Details | | | | 0..n | |
| | | Reference | E | Defined Property | | Reference | Details | GDT | PropertyReference | | 1..1 | |

-continued

| GDT | | | Cat. | Object Class | Property Qual. | Property | Representation/Association | Type | Type Name | Len. | Card. | Remarks |
|---|---|---|---|---|---|---|---|---|---|---|---|---|
| | | OrdinalNumberValue | E | Defined Property | | Ordinal Number | Value | GDT | OrdinalNumberValue | | 0..1 | |
| | | SubHierarchyDefinitionIndicator | E | Defined Property | | SubHierarchyDefinition | Indicator | GDT | SubHierarchyDefinitionIndicator | | 0..1 | |
| | | VisibleIndicator | E | Defined Property | | Visible | Indicator | GDT | VisibleIndicator | | 0..1 | |
| | HierarchyPropertyValuation | | E | Property Definition Class | Hierarchy | Property Valuation | Details | GDT | PropertyValuation | | 0..n | |

For the above listed structure GDT PropertyDefinitionClass the following data can be defined. An ActionCode is an instruction to the recipient of a message telling it how to process a transmitted business object. ID is a unique identifier of the definition class (see GDT PropertyDefinitionClassID below). VersionID is a unique identifier for a version of the definition class. RevisionID is a unique identifier for a revision of the definition class. The RevisionID is a sequential number that is assigned when changes are made. CreationDateTime is the creation date/time of the definition class. VersionDateTime is the creation date/time of the definition class version. RevisionDateTime is the date/time of the last change to the definition class that resulted in a RevisionID. PreferredName is the name of the definition class; maximum one entry per language. SynonymousName is the synonym for the definition class. Several synonyms can be can be specified for each language. ShortName is the short name for definition class. One short name can be entered for each language. IconAttachment is the preferred symbol or character (alphanumeric character, symbol, or combination thereof) for the definition class that represents the definition class in conformance with international standards, particularly as "symbols" in formulas.

DefiningDescription is a unique definition of the definition class's meaning makes it possible to uniquely distinguish the definition class from all other definition classes. Only one definition can be entered for each language. SourceDocumentWebAddress is the address of a document available on the Internet in which the complete definition of the definition class or its meaning can be found from the list of available URI schemes, "http" and "https" are permitted. AdditionalDescription is additional information about parts of the definition class; it aids the understanding of the definition class. The description can extend the definition. UsageDescription is a description of special aspect concerning the usage of the property. This can be explanatory text of general/individual notes. SimplifiedGraphicAttachment is a reference to a graphic that illustrates the meaning of the definition class. SubjectAreaCode is the subject area in accordance with the International Classification of Standards (i.e., see GDT SubjectAreaCode (described below)).

ParentPropertyDefinitionClassReference is an assignment to the parent property definition class. In the case of versioning, the version of this definition class is specified in the reference. DefinedProperty is property defined in this definition class. Reference is an assignment to the parent property definition class. In versioning, the version of this definition class is indicated in the reference. OrdinalNumberValue is a position of a property in the property list of a definition class. The sequence of the property list is given by the desired display sequence of the properties. SubHierachyDefinitionIndicator indicates whether the property creates hierarchies for the subordinate hierarchy level or not. VisibleIndicator indicates whether or not the property can be used at the current hierarchy level. HierarchyPropertyValuation is a value restriction for the properties indicated in the parent definition class as able to create hierarchies.

In particular with regard to the hierarchy, Integrity Conditions may be observed in accordance with ISO13584/42. This form of hierarchy creation may be used to formalize the creation rules and perhaps to store these rules in the form of properties and their values. This can prevent any information from becoming lost and may enable the hierarchies to be created both explicitly and transparently.

In certain implementations the following statements apply: the hierarchy may be strict (i.e., one predecessor only) and without cycles. If a definition class is to contain subordinate definition classes, at least one of the properties contained in the class may be indicated as able to create hierarchies. The data types for these properties may contain value ranges. Value ranges may be specified for all the properties that have been indicated in the parent definition class as able to create hierarchies. Value ranges of subordinate definition classes that are created in this way for such a property may represent a decomposition of the value range for the data type of the property that creates hierarchies. Properties can be created for a definition class, but should first be available at lower hierarchy levels. In this case, the VisibleIndicator is set just at the desired hierarchy level. Once the indicator has been set once for a given property, it cannot be reset at lower hierarchy levels. The ID of the definition class may be identical to the definition class ID of the properties contained in the class; this involves two different views for the same subject.

In certain implementations the follow may apply: The definition class is used to group together related business properties. Since the definition class belongs to the property key, the definition class 'AUTOLACKE' (car paint) and the definition class 'TEXTILFARBEN' (textile colors) can contain, i.e., the 'FARBE' (color) property, this then involves two different properties that can have different attributes. The definition class is also used as a technical aid to group together properties implicitly by business topic; i.e., the properties of a Knowledge Base in the Internet Pricing Configurator can each be mapped to one definition class. This prevents conflicts between data with the same name but from different Knowledge Bases. Another example of this would be different instances of a catalog that group together different properties with the same name in different definition classes. The definition class is the starting point for distributing properties. The properties of any definition class can be distributed.

In certain implementations, the definition class is optional in the GDTs for properties. This is intended to enable the GDTs to also be used in simple scenarios and to connect external users who are new to this data model. For example, some elements that are mandatory in ISO13584/42 are optional in this scheme. In certain implementations, the R/3 class can also group together the properties of a subject area.

PropertyDefinitionClassID

A PropertyDefinitionClassID is a unique identifier for a property definition class. A PropertyDefinitionClassID is a class for defining properties (in a classification system). A PropertyDefinitionClassID defines a subject area. The properties defined in a PropertyDefinitionClass represent the attributes of this subject area. An example of GDT PropertyDefinitionClassID is:

<PropertyDefinitionClassID schemeAgencyID="005">MY_DEF_CLASS__01</PropertyDefinitionClassID>

In the previous example, "005" is the ISO organization. In certain implementations, GDT PropertyDefinitionsClassID may have the following structure:

| GDT | | Cat. | Object Class | Property | Representation/Association | Type | Type Name | Len. | Card. | Remarks |
|---|---|---|---|---|---|---|---|---|---|---|
| Property-Definition-ClassID | | | Property Definition Class | Identification | Identifier | CDT | Identifier | 1..50 | | restricted |
| | scheme-AgencyID | A | Identification Scheme Agency | Identification | Identifier | XSD | Token | 1..60 | 1 | |
| | scheme-AgencySchemeID | A | Identification Scheme Agency | Scheme | Identifier | XSD | Token | 1..60 | 0..1 | |
| | schemeAgency-SchemeAgencyID | A | Identification Scheme Agency | Scheme Agency | Identifier | XSD | Token | 1..3 | 0..1 | |

In certain implementations if there are several schemes for an Agency (i.e., the organization "ISO," "DIN," or "Siemens"), the GDT can be extended to include the schemeID attribute.

PropertyDefinitionClassReference

A PropertyDefinitionClassReference is a unique reference to a property definition class or to a version of a property definition class. A PropertyDefinitionClassReference is a class for defining properties (in a classification system). A PropertyDefinitionClassReference may establish a subject area. The properties defined in a PropertyDefinitionClassReference may map the attributes of this subject area. An example of GDT PropertyDefinitionClassReference is:

<PropertyDefinitionClassReference>

<ID schemeAgencyID="005">SCREW_PROPERTIES</ID>

<VersionID>1</VersionID>

</PropertyDefinitionClassReference>

In the previous example, "005" is the ISO organization. In certain implementations, GDT PropertyDefinitionsClassReference may have the following structure:

| GDT | | Cat. | Object Class | Property | Representation/Association | Type | Type Name | Card. |
|---|---|---|---|---|---|---|---|---|
| Property-Definition-ClassReference | | | Property Definition Class Reference | | Details | | | |
| | ID | E | Property Definition Class Reference | Identification | Identifier | GDT | Property-Definition-ClassID | 1 |
| | VersionID | E | Property Definition Class Reference | Version Identification | Identifier | GDT | VersionID | 0..1 |

The attributes of the above structure may be assigned the following definitions: ID=The identifier for the property definition class. VersionID=The version for the property definition class.

PropertyDefinitionClassTypeCode

The DefinitionClassTypeCode is a coded representation of the nature of a definition class. This is determined based on its business purpose, from which the basic attributes are derived. An example of GDT PropertyDefinitionClassTypeCode is:

<DefinitionClassTypeCode>M</DefinitionClassTypeCode>

In certain implementations, GDT PropertyDefinitionClassTypeCode may have the following structure:

| GDT | Object Class | Representation/Association | Type | Type Name | Len. | Remarks |
|---|---|---|---|---|---|---|
| DefinitionClassTypeCode | Definition Class Type | Code | CDT | Code | 1 | restricted |

The data type GDT PropertyDefinitionClassTypeCode may assign one fixed standard code list is to be assigned to the code. The attributes may be assigned the following values: listID="13584-42" and listAgencyID=5 and listVersionID can be the version of the code list. Assigned by the standardization organization (if available).

In certain implementations the following code list may apply: 1 (i.e., item class), C (i.e., component class), M (i.e., material class), F (i.e., feature class).

PropertyID

A PropertyID is a unique identifier for a property. A property may be an object attribute. An example of GDT PropertyID is:

<PropertyID schemeAgencyID="005">LENGTH</PropertyID>

In the previous example, "005" is the ISO organization. In certain implementations, GDT PropertyID may have the following structure:

| GDT | | Cat. | Object Class | Property | Representation/Association | Type | Type Name | Len. | Card. | Remarks |
|---|---|---|---|---|---|---|---|---|---|---|
| PropertyID | | | Property | Identification | Identifier | CDT | Identifier | 1..50 | | restricted |
| | schemeAgencyID | A | Identification Scheme Agency | Identification | Identifier | XSD | Token | 1..60 | 1..1 | |
| | schemeAgency-SchemeID | A | Identification Scheme Agency | Scheme | Identifier | XSD | Token | 1..60 | 0..1 | |
| | schemeAgency-SchemeAgencyID | A | Identification Scheme Agency | Scheme Agency | Identifier | XSD | Token | 1..3 | 0..1 | |

If a definition class is used, the schemeAgency may be identical to the schemeAgency of the identifier for the property definition class in which the property was defined (see GDT PropertyDefinitionClassID). Related GDTs may include: Property (described above), PropertyDataTypeIdentification (described above), PropertyDataType (described above), DefinitionClassIdentification (described above), DefinitionClass (described above), PropertyValues (described below), PropertyValuation (described below)

PropertyMovementDirectionCode

A PropertyMovementDirectionCode is the coded representation of the direction of movement of a property (increase, decrease). You may possess goods, materials, shares, money, receivables, or payables. An example of GDT PropertyMovementDirectionCode is:

<PropertyMovementDirectionCode>1</PropertyMovementDirectionCode>

In certain implementations, GDT PropertyMovementDirectionCode may have the following structures:

| GDT | Object Class | Property | Representation/Association | Type | Type Name | Len. | Remarks |
|---|---|---|---|---|---|---|---|
| PropertyMovementDirectionCode | Property Movement | Direction | Code | CDT | Code | 1 | Restricted |

The data type GDT PropertyMovementDirectionCode may use the following codes: 1 (i.e., decrease) 2 (i.e., increase).

The direction of movement of a (quantity-based) inventory change may be expressed by the GDT InventoryMovementDirectionCode. But any changes in property, for example, in accounting may be expressed by the GDT PropertyMovementDirectionCode. In addition, directions of movement of property that are not inventors, for example, receivables or cash accounts are expressed with this GDT. Examples of increases may be and increase of cash at a cash desk, or increase of material at a warehouse stock. Examples of decreases may be a decrease of a share from the securities account of a private person, or a decrease of a receivable from the quantity of receivables of a company when a payment is received. Another decrease may be a decrease of a receivable from the quantity of receivables of a company when a payment is received.

There may be cases of negative increases, for example, the cancellation of a debit memo during a returned debit memo due to an uncovered account. Therefore, the category of a movement may not be described uniquely with the plus/minus sign of the amount or the quantity of a property value.

PropertyReference

A PropertyReference is a unique reference to a property or a version of a property. The referenced property can have been defined in a property definition class. An example of GDT PropertyReference is:

```
<PropertyReference>
<ID schemeAgencyID="005">LENGTH</ID>
<VersionID>1</VersionID>
<DefinitionClassReference>
  <ID
    schemeAgencyID="005">SCREW_PROPERTIES
    </ID>
</DefinitionClassReference>
</PropertyReference>
```

In certain implementations, GDT PropertyReference may have the following structure:

| GDT | | Cat. | Object Class | Property | Representation/ Association | Type | Type Name | Card. |
|---|---|---|---|---|---|---|---|---|
| PropertyReference | | | Property Reference | | Details | | | |
| | ID | E | Property-Reference | Identification | Identifier | GDT | PropertyID | 1..1 |
| | VerionID | E | Property-Reference | Version Identification | Identifier | GDT | VersionID | 0..1 |
| | Definition Class-Reference | E | Property-Reference | Definition Class Reference | Details | GDT | Definition-Class-Reference | 0..1 |

For the above structure the following attributes may apply: ID is the identifier for the property. VersionID is the version of the property. DefinitionClassReference is the reference to the definition class (or to a version of the definition class) of the property. If a reference exists, the property may be unique within the specified definition class only.

If a definition class is used, the property issuer may be identical to the issuer of the property definition class. The conceptual context of the PropertyReference may be defined in ISO13584/42. Related GDTs may be: Property, PropertyDataTypeIdentification (described above), PropertyDataType (described above), PropertyDefinitionClass (described above), PropertyDefinitionClassID (described above), PropertyValues (described below), and PropertyValuation (described below).

PropertyReference may correspond to the BOR object BUS1088 "Characteristic" and to the Characteristic Management Engine property (CME property) from the new classification.

PropertyValuation

A PropertyValuation is the assignment of one or more values to a simple or complex property. FIG. 32-E illustrates a PropertyValuation. The PropertyValuation may contain one or more ValueGroups. A ValueGroup can assign a property value to a simple property. A ValueGroup can assign several ValueGroups, and thus their values, to a complex property. ValueGroups can be used to model complex value assignments for complex properties. The hierarchically arrangement of ValueGroups may correspond to the nested structure of the complex property and by this structures the values of its components. A property valuation is carried out for an object as part of the classification procedure in order to describe its attributes. An example of valuation of a simple property may be: PropertyValuation, PropertyReference, Length, DefinitionClassReference, SCREW_PROPERTIES, ValueGroup, PropertyValue, MeasureSpecification, Measure unitCode, MeasureSpecification, PropertyValue. Examples of GDT PropertyValuation are:

Valuation of a simple property

<PropertyValuation>
<PropertyReference>
<ID>LENGTH</ID>
<DefinitionClassReference>
<ID>SCREW_PROPERTIES</ID>
<DefinitionClassReference>
<PropertyReference>
<ValueGroup>
<PropertyValue>
<MeasureSpecification>
<Measure unitCode="12">3</Measure>
</MeasureSpecification>
<PropertyValue>
</ValueGroup>
</PropertyValuation> unitCode="12" corresponds to centimeters in accordance with UN/CEFACT Recommendation No. 20 (Units of Measure)

Multiple valuation of a simple property

<PropertyValuation>
<PropertyReference>
<ID>PSEUDONYM</ID>
<DefinitionClassReference>
<ID>ALL_NAMES</ID>
<DefinitionClassReference>
<PropertyReference>
<ValueGroup>
<OrdinalNumberValue>1</OrdinalNumberValue>
<PropertyValue>
<NameSpecification>
<Name>James</Name>
</NameSpecification>
<PropertyValue>
</ValueGroup>
<ValueGroup>
<OrdinalNumberValue>2</OrdinalNumberValue>
<PropertyValue>
<NameSpecification>
<Name>Jim</Name>
</NameSpecification>
<PropertyValue>
</ValueGroup>
<PropertyValuation>

Valuation of a Complex Property

The 'CONSUMPTION PROFILE' property consists of the 'STREET TYPE' and 'CONSUMPTION' components. The data type of the 'CONSUMPTION PROFILE' property has a complex format and references the 'CARS' definition class that contains the component properties.

Complex property CONSUMPTION PROFILE:

<PropertyValuation>
<PropertyReference>
<ID>CONSUMPTION PROFILE</ID>
<DefinitionClassReference>
<ID>CARS</ID>
<DefinitionClassReference>
<PropertyReference>
<ValueGroup>
<ID>1<ID>
</ValueGroup>
</PropertyValuation>

STRASSENTYP (Street Type) Component:

<PropertyValuation>
<PropertyReference>
<ID>STREET TYPE</ID>

```
      <DefinitionClassReference>
        <ID>CONSUMPTION TYPE</ID>
      </DefinitionClassReference>
    </PropertyReference>
    <ValueGroup>
    <ParentID>1</ParentID>
    <PropertyValue>
      <NameSpecification>
        <Name>HIGH WAY</Name>
      </NameSpecification>
    </PropertyValue>
    </ValueGroup>
  </PropertyValuation>
  VERBRAUCH (Consumption) Component:
  <PropertyValuation>
    <PropertyReference>
      <ID>CONSUMPTION</ID>
      <DefinitionClassReference>
        <ID>CONSUMPTION TYPE</ID>
      </DefinitionClassReference>
    </PropertyReference>
    <ValueGroup>
    <ParentID>1</ParentID>
    <PropertyValue>
      <MeasureSpecification>
        <Measure unitCode "49">5</Measure>
      </MeasureSpecification>
    </PropertyValue>
    </ValueGroup>
  </PropertyValuation>
```

unitCode="49" corresponds to liters in accordance with UN/CEFACT Recommendation No. 20 (Units of Measure) In certain implementations GDT PropertyValuation may have the following structure:

| GDT | | | Cat. | Object Class | Property | Representation/Association | Type | Type Name | Len. | Card. |
|---|---|---|---|---|---|---|---|---|---|---|
| PropertyValuation | | | | Property Valuation | | Details | | | | |
| | actionCode | | A | Property Valuation | Action | Code | GDT | ActionCode | | 0..1 |
| | PropertyReference | | E | Property Valuation | Property Reference | Details | GDT | PropertyReference | | 1 |
| | ValueGroup | | E | Property Valuation | Value Group | Details | GDT | PropertyValuationValueGroup | | 1..n |
| | | ID | E | Value Group | Identification | Identifier | CDT | Identifier | 1..10 | 0..1 |
| | | ParentID | E | Value Group | Parent Identification | Identifier | CDT | Identifier | 1..10 | 0..1 |
| | | OrdinalNumberValue | E | Value Group | Ordinal Number | Value | GDT | OrdinalNumberValue | | 0..1 |
| | | PropertyValue | E | Value Group | Property Value | Details | GDT | PropertyValue | | 0..1 |

In certain implementations for the above listed structure ActionCode is an instruction to the recipient of a message telling it how to process a transmitted property valuation. PropertyReference is the reference to the underlying property for which the property valuation is to be mapped. ValueGroup is a simple or complex property value assignment that assigns a group of values to a property. ID is the Unique identifier of a ValueGroup. Not used for valuations of simple properties/components of complex properties. The ID may be specified if the component itself is a complex property. ParentID assigns to the ValueGroup of a component of a complex property a ValueGroup of the property. Not used for simple properties. OrdinalNumberValue is the position of a value in the list of property values. PropertyValue is the value of a simple property or component of a complex property. Not used for complex properties.

In certain implementations of GDT PropertyValuation the following conditions may apply: The valuations may correspond to the formats specified by the data type (i.e., see GDT PropertyDataType) of the valuated property (i.e., see GDT Property). If the data type contains a value list, valuations may be included in this value list. The number of property values in the valuation may correspond to the value assignment type defined in the property. This constraint applies only in the case of a final actual valuation and not in the case of specifications for a final valuation; in this case, the valuation restricts the permitted value range of the property. An example of this is the valuation of a batch material that merely specifies the valuation range for the actual batches. Several valuations can also be specified for single-value properties. A property with a complex data type cannot be valuated directly; however, the components of its data type can be. In this case, PropertyValue is empty. PropertyValue is filled for the relevant components and the ParentID contains the ID of the higher-level property.

In certain implementations the uses of PropertyValuation may include: PropertyValuation is used by classified objects such as the batch: a property valuation consists of the key of the property to be valuated and the associated values. For example, if the 'color' (property) of a batch is 'red' (value) or its 'weight' (property) is '5 kg' (value,) the combination of property and value constitutes the property valuation. PropertyValuation is also used for a formal description of the creation of definition class hierarchies (GDT PropertyDefinitionClass (described above)).

PropertyValue

PropertyValue describes a value that can be assigned to a property. The value can also be an interval. An example of GDT PropertyValue is:

<PropertyValue>
<IntegerSpecification>
<Value>1</Value>
</IntegerSpecification>
<PreferredName languageCode="DE">Eins</Prefered-Name>
<PreferredName languageCode="EN">one</Prefered-Name>
</PropertyValue>

In certain implementations, GDT PropertyValue may have the following structure:

| GDT | | | Cat. | Object Class | Property Qual | Property | Rep./Ass. Qual. | Representation/Association | Type | Type Name | Card. |
|---|---|---|---|---|---|---|---|---|---|---|---|
| Property Value | | | E | Property Value | | | | Details | | | |
| | Amount Specification | | E | Property Value | | Amount Specification | | Details | | | 0..1 |
| | | Amount | E | Amount Specification | | Amount | | Amount | GDT | Amount | 0..1 |
| | | Lower Amount | E | Amount Specification | Lower | Amount | | Amount | GDT | Amount | 0..1 |
| | | Upper-Amount | E | Amount Specification | Upper | Amount | | Amount | GDT | Amount | 0..1 |
| | Quantity-Specification | | E | Property Value | | Quantity Specification | | Details | | | 0..1 |
| | | Quantity | E | Quantity Specification | | Quantity | | Quantity | GDT | Quantity | 0..1 |
| | | Lower Quantity | E | Quantity Specification | Lower | Quantity | | Quantity | GDT | Quantity | 0..1 |
| | | Upper Quantity | E | Quantity Specification | Upper | Quantity | | Quantity | GDT | Quantity | 0..1 |
| | Decimal Specification | | E | Property Value | | Numeric Specification | | Details | | | 0..1 |
| | | Decimal Value | E | Decimal Specification | | Decimal Value | Decimal | Value | GDT | Decimal-Value | 0..1 |
| | | Lower Decimal Value | E | Decimal Specification | Lower | Decimal Value | Decimal | Value | GDT | Decimal-Value | 0..1 |
| | | Upper Decimal Value | E | Decimal Specification | Upper | Decimal Value | Decimal | Value | GDT | Decimal-Value | 0..1 |
| | Float-Specification | | E | Property Value | | Float Specification | | Details | | | 0..1 |
| | | Float-Value | E | Float Specification | | Float Value | Float | Value | GDT | Float Value | 0..1 |
| | | Lower Float-Value | E | Float Specification | Lower | Float Value | Float | Value | GDT | Float Value | 0..1 |
| | | Upper Float-Value | E | Float Specification | Upper | Float Value | Float | Value | GDT | Float Value | 0..1 |
| | Integer Specification | | E | Property Value | | Integer Specification | | Details | | | 0..1 |
| | | Integer-Value | E | Integer Specification | | Integer Value | Integer | Value | GDT | Integer-Value | 0..1 |
| | | Lower-Integer Value | E | Integer Specification | Lower | Integer Value | Integer | Value | GDT | Integer-Value | 0..1 |
| | | Upper-Integer Value | E | Integer Specification | Upper | Integer Value | Integer | Value | GDT | Integer-Value | 0..1 |

-continued

| GDT | | | Cat. | Object Class | Property Qual | Property | Rep./Ass. Qual. | Representation/Association | Type | Type Name | Card. |
|---|---|---|---|---|---|---|---|---|---|---|---|
| | DateSpecification | | E | Property Value | | Date Specification | | Details | | | 0..1 |
| | | Date | E | Date Specification | | | | Date | GDT | Date | 0..1 |
| | | StartDate | E | Date Specification | | Start | | Date | GDT | Date | 0..1 |
| | | EndDate | E | Date Specification | | End | | Date | GDT | Date | 0..1 |
| | TimeSpecification | | E | Property Value | | Time Specification | | Details | | | 0..1 |
| | | Time | E | Time Specification | | | | Time | GDT | Time | 0..1 |
| | | StartTime | E | Time Specification | | Start | | Time | GDT | Time | 0..1 |
| | | EndTime | E | Time Specification | | End | | Time | GDT | Time | 0..1 |
| | DateTimeSpecification | | E | Property Value | | Date Time Specification | | Details | | | 0..1 |
| | | DateTime | E | Date Time Specification | | | | Date Time | GDT | DateTime | 0..1 |
| | | StartDateTime | E | Date Time Specification | | Start | | Date Time | GDT | DateTime | 0..1 |
| | | EndDateTime | E | Date Time Specification | | End | | Date Time | GDT | DateTime | 0..1 |
| | NameSpecification | | E | Property Value | | Name Specification | | Details | | | 0..1 |
| | | Name | E | Name Specification | | Name | | Name | GDT | Name | 1 |
| | Indicator Specification | | E | Property Value | | Indicator Specification | | Details | | | 0..1 |
| | | Indicator | E | Indicator Specification | | Indicator | | Indicator | GDT | Indicator | 1 |
| | Interval BoundaryTypeCode | | E | Property Value | | Interval Boundary Type | | Code | GDT | Interval BoundaryTypeCode | 0..1 |
| | Preferred Name | | E | Property Value | | Preferred Name | | Name | GDT | Name | 0..n |
| | SynonymousName | | E | Property Value | | Synonymous Name | | Name | GDT | Name | 0..n |
| | Abbreviation Name | | E | Property Value | | Abbreviation Name | | Name | GDT | Name | 0..n |
| | IconAt tachment | | E | Property Value | | Icon | | Attachment | GDT | Attach ment | 0..1 |
| | AttachmentWebAddress | | E | Property Value | | Attachment | | Web Address | GDT | Web Address | 0..1 |

For the above listed structure the following descriptions may apply: AmountSpecification contains Contains the specification of currency-based values (i.e., amounts). Amount is Discrete, currency-based single value (i.e., amount). Amount can be of type GDT Amount. LowerAmount is the Lower limit in a currency-based value interval. LowerAmount can be of type GDT Amount. LowerAmount is the Lower limit in a currency-based value interval. LowerAmount can be of type GDT Amount. UpperAmount is the upper limit in a currency-based value interval. UpperAmount can be of type GDT Amount. QuantitySpecification contains the specification of quantities in a unit of measurement/measure. Quantity is an individual quantity in a unit of measurement. Quantity can be of type GDT Quantity. LowerQuantity is the lower limit in a quantity interval. LowerQuantity can be of type GDT Quantity. UpperQuantity is the upper limit in a quantity interval. UpperQuantity can be of type GDT Quantity. DecimalSpecification contains the specification of decimal numbers. DecimalValue is the discrete decimal value. Value can be of type GDT DecimalValue. LowerDecimalValue is the lower limit in a value interval of decimal values. LowerDecimalValue can be of type GDT DecimalValue. UpperDecimalValue is the upper limit in a value interval of decimal values. UpperDecimalValue can be of type GDT DecimalValue. FloatSpecification contains the specification of the floating point values. FloatValue is the discrete floating point value. Value can be of type GDT FloatValue. FloatSpecification contains the specification of the floating point values. FloatValue is the discrete floating point value. Value can be of type GDT FloatValue. LowerFloatValue lower limit in a value interval of floating point values. LowerFloatValue can be of type GDT FloatValue. UpperFloatValue is the upper limit in a value interval of floating point values. UpperFloatValue can be of type GDT FloatValue. IntegerSpecification contains the specification of integer values. IntegerValue is discrete integer value. Value can be of type GDT IntegerValue. LowerIntegerValue is the lower limit in a value interval of integer values. LowerIntegerValue can be of type GDT IntegerValue. UpperIntegerValue is the upper limit in a value interval of integer values. UpperIntegerValue can be of type GDT IntegerValue. DateSpecification contains the specification of calendar days or date intervals. Date is the calendar day. Date can be of type GDT Date.

StartDate is the date that defines the start of a daily time interval. StartDate can be of type GDT Date. EndDate is the date that defines the end of a daily time interval. EndDate can be of type GDT Date. TimeSpecification contains the specification, accurate to the second, of a particular time or time interval (time span). Time is the particular time, accurate to the second. Time can be of type GDT Time. StartTime is the time that defines the start of a particular time interval, accurate to the second. StartTime can be of type GDT Time. EndTime is the time that defines the end of a particular time interval, accurate to the second. EndTime can be of type GDT Time. DateTimeSpecification contains the specification of time stamps (date and time), accurate to the second, or the specification of a timeframe, accurate to the second. DateTime is the time stamp (date and time), accurate to the second. DateTime can be of type GDT DateTime. StartDateTime is the time stamp that defines the start of a time interval or timeframe. StartDateTime can be of type GDT DateTime. EndDateTime is the time stamp that defines the end of a time interval or timeframe. EndDateTime can be of type GDT DateTime. NameSpecification contains the specification of qualitative and human-readable values. Name is the individual qualitative and human-readable value. Name can be of type GDT Name. Indicator Specification contains the specification of binary logical values (i.e., yes/no). Indicator is the individual binary logical value. Indicator can be of type GDT Indicator IntervalBoundaryTypeCode is the coded representation for typing intervals. IntervalBoundaryTypeCode can be of type GDT IntervalBoundaryTypeCode. PreferredName is the name of the value or value interval, if one exists. PreferredName can be of type GDT Name. SynonymousName is the synonymous term for the PreferredName. SynonymousName can be of type GDT Name. AbbreviationName is the appropriate abbreviation of the PreferredName. AbbreviationName can be of type GDT Name. IconAttachment is the graphic that illustrates the meaning of the value or value interval. IconAttachment can be of type GDT Attachment. AttachmentWebAddress is the reference to any WebAddress on the basis of which the value was defined. This attachment could be an explanatory drawing or a colored pattern. AttachmentWebAddress can be of type GDT WebAddress.

When AmountSpecification, QuantitySpecification, DecimalSpecification, FloatSpecification, IntegerSpecification, DateSpecification, TimeSpecification, or DateTimeSpecification are used, single values may be specified by Amount, Measure, Quantity, Value, Date, Time, or DateTime. Single values and intervals cannot be specified at the same time. When LowerAmount or UpperAmount, LowerQuantity or UpperQuantity, LowerDecimal or UpperDecimal, LowerFloat or UpperFloat, LowerInteger or UpperInteger, StartDate or EndDate, StartTime or EndTime, or StartDateTime or EndDateTime are used, the respective complementary Upper or Lower field or Start or End field may be filled.

In the GDT PropertyValuation the PreferredName and AbbreviationName fields may be filled only once per language. IntervalBoundaryTypeCode can be specified when the value is an interval (also <, <=, etc.).

For the above GDT PropertyValuation structure the uses of the attributes may be as follows: AmountSpecification represents examples: defining a price interval (LowerAmount/UpperAmount) for a product. QuantitySpecification represents examples: valuating properties whose data types are in units, for example, 5 pieces, 7 kg.

DecimalSpecification/FloatSpecification represents examples: valuating nondimensional, numeric properties for example, ratios, calculation indexes, key figures, and so on. IntegerSpecification represents examples: valuating nondimensional, integer properties, for example, codes, indexes, and sequential numbers. DateSpecification represents examples: expiration date or best-before date, date of manufacture, filling date, packaging date, release date, lock date, order date, delivery date, storage period, etc.

TimeSpecification/DateTimeSpecification represents examples: time stamp (accurate to the second) for specifying a filling time, production time, inspection time, etc. NameSpecification represents examples: red, green, etc., for the color property. Indicator Specification Examples: properties that can have only one of two statuses as their valuation (i.e., yes/no, on/off).

PurchasingGroupID

A PurchasingGroupID is a unique identifier for a group of buyers who are responsible for certain purchasing activities. An example of GDT PurchasingGroupID is:

<PurchasingGroupID>1234567</PurchasingGroupID>

In certain implementations, PurchasingGroupID may have the following structure:

| CDT | Object Class | Property | Representation/ Association | Type | Type Name | Len. |
|---|---|---|---|---|---|---|
| PurchasingGroupID | Purchasing Group | Identification | Identifier | CDT | Identifier | 1..20 |

In-house, the purchasing group may be responsible for procuring a product or class of products; externally, the group can act as a contact for vendors. The PurchasingGroupID may be a maximum of 20 alphanumerical characters long. No value ranges may be given.

For the external representation, role-based IDs (i.e., BuyerPurchasingGroupID) based on the CDT: Identifier can be used without additional attributes; they can be in conjunction with the identification of the party described by the role (i.e., BuyerID).

The PurchasingGroupID may be used externally in cooperative business processes, in particular in the vendor-managed inventory (i.e., VMI) business process, to uniquely identify the purchasing group of the party involved. In this scenario, the buyer, generally a retail company, may send purchase order numbers to the vendor, together with its PurchasingGroupID (i.e., the "BuyerPurchasingGroupID," from the vendor's point of view) so that the purchase orders created by the vendor may be generated depending on the buyer's purchasing group identification.

PurchaseLedgerAccountTypeCode

A PurchaseLedgerAccountTypeCode is the coded representation of the type of a PurchaseLedgerAccount. A PurchaseLedgerAccounTypeCode can be a record of quantities and values that are relevant to valuation for business processes in which material goods or services are procured. This record may serve the purpose of proper financial reporting of the inventory or profit and loss statement of a company. An example of GDT PurchaseLedgerAccountTypeCode is:

<PurchaseLedgerAccountTypeCode>1</PurchaseLedgerAccountTypeCode>

In certain implementations, GDT PurchaseLedgerAccountTypeCode may have the following structure.

| GDT | Object Class | Property | Representation/ Association | Type | Type Name | Len. | Remarks |
|---|---|---|---|---|---|---|---|
| PurchaseLedger-Account-TypeCode | Purchase Ledger Account | Type | Code | CDT | Code | 1..2 | restricted |

The data type GDT PurchaseLedgerAccountTypeCode may assign one static code list to the code. The attributes may be assigned the following values: listID="10212" and listAgencyID "310" and listVersionID=Version of the respective code list.

The data type GDT PurchaseLedgerAccountTypeCode may use the following codes: 1 (i.e., PurchasingObject), 2 (i.e., PurchasingSegment).

QualityIssueCategoryCatalogueID

A QualityIssueCategoryCatalogueID is an identifier for a catalog of categories for quality-related issues. A QualityIssueCategoryCatalogue can be a structured catalog of categories that may classify quality-related issues for a particular quality aspect. An example of QualityIssueCategoryCatalogueID is:

<QualityIssueCategoryCatalogueID>DEFECT TYPE </QualityIssueCategoryCatalogueID>

In certain implementations, QualityIssueCategoryCatalogue may have the following structure:

| GDT | | Cat. | Object Class | Property | Representation/ Association | Type | Type Name | Len. | Card | Remarks |
|---|---|---|---|---|---|---|---|---|---|---|
| QualityIssueCategoryCatalogueID | | | Quality Issue Category Catalogue | Identification | Identifier | CDT | Identifier | 1..25 | | Restricted |
| | schemeAgencyID | A | Identification Scheme Agency | Identification | Identifier | xsd | token | 1..60 | 0..1 | |

The attributes of QualityIssueCategoryCatalogueID may include the following: schemeID=QualityIssueCategoryCatalogueID. The attribute schemeAgencyID may be defined as a business system in which the identifier was assigned.

Material inspections for goods receipts or goods issues can be examples of business events in which quality-related issues may have to be addressed. In the category catalogs for the aspects "damage" or "defect," the categories can, for example, be used to describe the deviations from a specification or the defects of the material that were detected during an inspection.

QualityIssueCategoryCatalogueUsageCode

A QualityIssueCategoryCatalogueUsageCode is the coded representation of the usage of a category catalog for quality-related issues. An example of QualityIssueCategoryCatalogueUsageCode is:

<QualityIssueCategoryCatalogueUsageCode> Material_Inspection<QualityIssue CategoryCatalogueUsageCode>

In certain implementations, QualityIssueCategoryCatalogueUsageCode may have the following structure:

| GDT | | Cat. | Object Class | Property | Representation/ Association | Type | Type Name | Len. | Card | Remarks |
|---|---|---|---|---|---|---|---|---|---|---|
| QualityIssueCategoryCatalogueUsage-Code | | | Quality Issue Category Catalogue | Usage | Code | CDT | Code | 1..4 | | Restricted |
| | listAgencyID | A | Code List Agency | Identification | Identifier | xsd | token | | 0..1 | |
| | listVersionID | A | Code List | Version | Identifier | xsd | token | | 0..1 | |
| | listAgencySchemeID | A | Code List Agency | Scheme | Identifier | xsd | token | | 0..1 | |
| | listAgencySchemeAgencyID | A | Code List Agency | Scheme Agency | Identifier | xsd | token | | 0..1 | |

An extendable code list can be assigned to QualityIssueCategoryCatalogueUsageCode. Customers can change this code list. Attribute listID may be defined as "10395."

In the previously described structure, the following elements may be defined. ListAgencyID may be "310," or may be the ID of the code user (e.g., ID from DE 3055, if listed there). ListVersionID may be the version of a particular code list (e.g., managed by the code user or an outside party). ListAgencySchemeID can be the ID of the scheme if the listAgencyID does not come from DE 3055 or listAgencySchemeAgencyID can be the ID of the organization from DE 3055 that manages the listAgencySchemeID scheme.

The code list and its values may include the following: Material Inspection (i.e., used for material inspections in the context of logistics execution), Material Inspection Sample (i.e., used for material inspection samples with or without reference to a material inspection in the context of logistics execution).

A QualityIssueCategoryCatalogueUsageCode can be used to determine the usage of a category catalog for quality-related issues. You could, for example, define that one particular catalog is to be used for material inspections and not for document checks. A category catalog for quality-related issues could, for example, be used to describe defects, causes, or improvement measures. Examples of customer-specific code semantics include: Material Visual Inspection which can represent a visual inspection of a material in the context of logistics execution.

QualityIssueCategoryID

A QualityIssueCategoryID is an identifier for a category of a quality-related issue. A category for quality-related issues can be used to classify business events during which quality-related issues arise based on objective or subjective aspects. A category can also be further refined using additional categories. An example of QualityIssueCategoryID is:

<QualityIssueCategoryID>DEFECTIVE_FUNCTION</QualityIssueCategoryID>

In certain implementations, QualityIssueCategoryID may have the following structure:

| GDT | Object Class | Property | Representation/ Association | Type | Type Name | Len. | Remarks |
|---|---|---|---|---|---|---|---|
| QualityIssue-CategoryID | Quality Issue Category | Identification | Identifier | CDT | Identifier | 1..25 | Restricted |

QualityIssueCategoryID can be used to identify categories in the context of the category catalog for quality-related issues (e.g., business object QualityIssueCategoryCatalogue).

Business events during which quality-related issues can arise include processes that can be run through to achieve a predefined material or service quality. Examples of such processes include goods receipt inspections or goods issue inspections. In the examples above, specific categories can be used to describe the deviations from the specification and the defects in the material that were determined during an inspection.

QualityIssueCategoryTypeCode

A QualityIssueCategoryTypeCode is the coded representation of the type of a category for quality-related issues. A category for quality-related issues can be used to classify business events during which quality-related issues arise based on objective or subjective aspects. A category can also be further refined using additional categories. An example of QualityIssueCategoryTypeCode is:

<QualityIssueCategoryTypeCode>1<QualityIssue CategoryTypeCode>

In certain implementations, QualityIssueCategoryTypeCode may have the following structure:

| GDT | | Cat. | Object Class | Property | Representation/ Association | Type | Type Name | Len. | Card. | Remarks |
|---|---|---|---|---|---|---|---|---|---|---|
| QualityIssue-Category-TypeCode | | | Quality Issue Category | Type | | CDT | Code | 1..2 | | Restricted |
| | listID | A | Code List | Identification | Identifier | xsd | token | | 0..1 | |
| | listAgency ID | A | Code List Agency | Identification | Identifier | xsd | token | | 0..1 | |
| | listVer-sionID | A | Code List | Version | Identifier | xsd | token | | 0..1 | |
| | listAgen-cySchemeID | A | Code List Agency | Scheme | Identifier | xsd | token | | 0..1 | |
| | listAgen-cyScheme-AgencyID | A | Code List Agency | Scheme Agency | Identifier | xsd | token | | 0..1 | |

-

An extendable code list can be assigned to the QualityIssueCategoryTypeCode. Customers can change this code list. The code list and its values may include the following: Defect Type (i.e., The issue category is of the type "Defect Type"), Defect Location (i.e., The issue category is of the type "Defect Location"), Cause (i.e., The issue category is of the type "Cause"), Code 4: Deviation Type (i.e., The issue category is of the type "Deviation Type").

In the previously described structure, the following attributes may be defined as follows: listID can be the ID of the particular code list (e.g., "10410"), listAgencyID may be "310" or it may be the ID of the code user (e.g., ID from DE 3055, if listed there), listVersionID may be the version of the particular code list that can be assigned and managed (e.g., by the code user a another party), listAgencySchemeID may be the ID of the scheme or it may be the ID of the organization from DE 3055 that manages the listAgencySchemeID scheme.

QuantityGroupCode

A QuantityGroupCode is a coded representation for a group of quantities. An example of QuantityGroupCode is:

<QuantityGroupCode>PAPER</QuantityGroupCode>

In certain implementations, QuantityGroupCode may have the following structure:

| GDT | | Cat. | Object Class | Property | Rep./ Ass. | Type | Type Name | Len. |
|---|---|---|---|---|---|---|---|---|
| QuantityGroup-Code | | | Quantity Group | | Code | xsd | Code | 1..10 |
| | listID | A | Code List | Identification | Identifier | xsd | token | |
| | listAgency ID | A | Code List Agency | Identification | Identifier | xsd | token | |
| | listVer-sionID | A | Code List | Version | Identifier | xsd | token | |

-continued

| GDT | | Cat. | Object Class | Property | Rep./ Ass. | Type | Type Name | Len. |
|---|---|---|---|---|---|---|---|---|
| | listAgencySchemeID | A | Code List Agency | Scheme | Identifier | xsd | token | |
| | listAgencySchemeAgency ID | A | Code List Agency | Scheme Agency | Identifier | xsd | token | |

A customer-specific code list can be assigned to the code. A customer may determine the codes in the code list.

In the previously described structure, the following attributes may be described as follows: listID may be an ID of the particular code list (e.g., "10437"), listAgencyID may be an ID of the customer (e.g., ID from DE 3055, if listed there), listVersionID may be a version of the particular code list which may be assigned and managed by the customer, listAgencySchemeID may be an ID of the scheme if the listAgencyID does not come from DE 3055 or may be an ID of the organization from DE 3055 that manages the listAgencySchemeID scheme.

Quantity Group can be a logical grouping of various quantities. A quantity group can describe quantities of similar kind that exhibit similar properties. A product (e.g., material or a service) can be assigned to a Quantity Group. An application performing Quantity Conversion can utilize the Quantity Group through the product.

The Quantity Group can also used to group quantities for the purpose of conversion. Examples of customer-specific code semantics include: PAPER (e.g., Different categories of paper A4, A3, A2, etc. can be grouped under one quantity group named "PAPER"), BEVERAGES (e.g., Beer and mineral water can be grouped under "BEVERAGES").

QuantityOriginCode

QuantityOriginCode is the coded representation for the origin of a quantity, i.e., if a quantity was entered by the user or calculated or interfaced from an external system. An example of QuantityOriginCode is:

<QuantityOriginCode>1</QuantityOriginCode>

In certain implementations, QuantityOriginCode may have the following structure:

| GDT | Object Class | Rep./ Ass. | Type | Type Name | Len. |
|---|---|---|---|---|---|
| QuantityOriginCode | Quantity Origin | Code | xsd | String | 1 |

A fixed code list can be assigned to the QuantityOriginCode. The attributes may be assigned values as follows: listID="10417," listAgencyID="310," listVersionID=ID of the particular code list.

The QuantityOriginCode of a quantity can be used to determine the origin of the quantities being processed. This may provide information whether the particular quantity was being calculated or defaulted or entered by the user or was taken from an external system.

The code list may contain the following codes and values: Calculated (i.e., Quantity calculated by the system), Default (i.e., Quantity filled with default value), User (i.e., Quantity entered by user), External (i.e., Quantity from external system).

QuantityRoleCode

A QuantityRoleCode is the coded representation of the role of a quantity. An example QuantityRoleCode is:

<QuantityRoleCode>1</QuantityRoleCode>

In certain implementations, QuantityRoleCode may have the following structure:

| GDT | Object Class | Property | Representation/ Association | Type | Type Name | Len. | Remarks |
|---|---|---|---|---|---|---|---|
| QuantityRoleCode | Quantity | Role | Code | GDT | QuantityRoleCode | 1..3 | Restricted |

A fixed code list can be assigned to the code. The attributes may include the following: listID 10392, listAgencyID="310."

The code list and its values may include the following: ActualQuantity, AllocatedQuantity, ApprovalQuantity, ApprovedQuantity, AvailableQuantity, BaseQuantity, BookInventoryQuantity, ClearingQuantity (i.e., Billing quantity), ComplaintQuantity (i.e., Customer complaint quantity), ConfirmedQuantity, ConfirmQuantity (i.e., Quantity to be confirmed), ContainerQuantity, ContractReleasedQuantity, ContractReleaseQuantity, CountedQuantity, CumulatedQuantity, DeliveredQuantity (i.e., Quantity entered), DeliveryQuantity, DesiredQuantity (i.e., The quantity required or desired), DeviatingQuantity, FixedQuantity, ForecastQuantity, ForecastConsumptionQuantity (i.e., The quantity with which the actual consumption is offset against the planned quantity of the forecast), ForwardedQuantity, FulfilledQuantity, InputQuantity, InventoryQuantity, InvoicedQuantity, InvoiceQuantity, IssuedQuantity, LogisticUnitQuantity, LotsizeQuantity (i.e., Lot Size), MaximumQuantity, MinimumQuantity, OpenQuantity, OrderQuantity, OrderedQuantity, Original quantity, Output quantity, PlannedQuantity, PlannedDeliveryQuantity, PortionQuantity, PropertyValueQuantity, PurchasingContractReleaseQuantity, ReceiptQuantity, ReferenceQuantity (i.e., Specifies a quantity to which a business transaction refers), RejectedQuantity, RequestedQuantity, RequirementQuantity, ResourceQuantity, SampleQuantity, ScrapQuantity, SendAheadQuantity, ServiceProductQuantity, SubsetQuantity, ThresholdQuantity, ToBeInvoicedQuantity (i.e., Quantity still to be invoiced), TotalCancelledQuantity, TotalQuantity, ValuationQuantity, VariableQuantity, WorkInProcessQuantity (i.e., Quantity of goods in process), WorkQuantity (i.e., Quantity of work that is executed).

The QuantityRoleCode can be used to describe the role of a quantity dynamically.

QuantityRoleCodes can orientate themselves to the static qualifiers of Quantity. Identical codes and qualifiers can describe the same semantics.

QualityManagementSystemStandardCode

A QualityManagementSystemStandardCode is the coded representation of a standard for the quality management system. A quality management system can be considered the summary of the technical and organizational means needed for the implementation of the quality management. Different standards may exist for the quality management system. An example of QualityManagementSystemStandardCode is:

<QualityManagementSystemStandardCode>1</QualityManagementSystemStandardCode>

In certain implementations, QualityManagementSystemStandardCode may have the following structure:

| GDT | | Cat. | Object Class | Property Qualifier | Property | Rep./ Ass. | Type | Type Name | Len. | Card. | Remarks |
|---|---|---|---|---|---|---|---|---|---|---|---|
| Quality-Management-System-StandardCode | | | | Quality Management System | Standard | Code | CDT | Code | 1..4 | | Restricted |
| | listID | A | Code List | | Identification | Identifier | xsd | token | | 0..1 | |
| | listAgencyID | A | Code List Agency | | Identification | Identifier | xsd | token | | 0..1 | |
| | listVersionID | A | Code List | | Version | Identifier | xsd | token | | 0..1 | |
| | listAgency-SchemeID | A | Code List Agency | | Scheme | Identifier | xsd | token | | 0..1 | |
| | listAgency-Scheme-AgencyID | A | Code List Agency | | Scheme Agency | Identifier | xsd | token | | 0..1 | |

A customer-specific code list can be assigned to the QualityManagementSystemStandardCode. A customer can define the codes in the code list.

In the previously described structure, the following attributes may be described as: listID may be an ID of the particular code list (e.g, "10157", listAgencyID may be an ID of the customer (e.g., ID from DE 3055, if listed there), listVersionID may be a version of the particular code list which may be assigned and managed by the customer, listAgencySchemeID may be an ID of the scheme if the listAgencyID does not come from DE 3055 or it may be an ID of the organization from DE 3055 that manages the listAgencySchemeID scheme.

Some companies, especially public authorities and large-scale companies, may require verification from the vendor that there is an appropriate quality management system described, implemented, and operative. Many companies may have earned relevant certificates from accredited Institutes. Type and area of the appropriate display of quality management systems can vary depending on each company.

Examples of customer-specific code semantics include: ISO certification: Certificate in accordance with ISO9001:2000, Technical Inspection Authority: Certificate "Tested Data Integrity."

In certain implementations within the RFQ process, certain goods can be accepted from specific vendors, who are assigned to a specific QualityManagementSystemStandardCode. This may mean the vendor can be certified for this standard or manufacture in accordance with this standard. The following dictionary objects can be assigned to this GDT in my systems: Data element: QSSYSFAM, Domain: QSSYSFAM.

QuantityDiscrepancyCode

The QuantityDiscrepancyCode is a coded representation of the cause of or reason for a quantity discrepancy. An example of QuantityDiscrepancyCode is:

<QuantityDiscrepancyCode>AE</QuantityDiscrepancyCode>

In certain implementations, QuantityDiscrepancyCode may have the following structure:

| GDT | Object Class | Property | Representation/ Association | Type | Type Name | Len. | Remarks |
|---|---|---|---|---|---|---|---|
| Quantity-DiscrepancyCode | Quantity | Discrepancy | Code | CDT | Code | 1..4 | restricted |

A fixed standard code list UN/EDIFACT 4221 (Discrepancy nature identification code) can be assigned to the code.

The attributes can have assigned values as follows: listID="4221," listAgencyID="6," listVersionID may be a version of the code list. Assigned by a standardization organization, if available.

The Code can describe the cause of a quantity discrepancy in a delivery that was established in the goods receipt process (e.g., generally with regard to a location product.) This coded information can be returned to the sender of the goods by means of a goods receipt notification.

The codes for indicating underdeliveries of goods and goods that are delivered too late could not be found in the current UN/EDIFACT code list. These two codes may still need to be requested and added as list values.

The code list and its values may include the following below. The application supports the following “QuantityDiscrepancyCode” values in the “goods receipt process”: AC: an overdelivery (i.e., on receipt of the goods, a surplus quantity was established in relation to the previously notified delivery), AE: goods delivered but not notified (i.e., on receipt of the goods, quantities of goods were established that were delivered without prior notification in the form of a shipping notification), AF: delivered goods are damaged (i.e., on receipt of the goods, damaged quantities were found), AG: goods delivered too late (i.e., on receipt of the goods, quantities of goods were established that were already notified in an earlier delivery).

QuantityInterval

QuantityInterval is an interval of quantities defined by a lower and an upper boundary. An example of QuantityInterval is:

<QuantityInterval>
<IntervalBoundaryTypeCode>5</IntervalBoundaryTypeCode>
<LowerBoundaryQuantity unitCode=“KG”>100</LowerBoundaryQuantity>
<UpperBoundaryQuantity unitCode=“KG”>1000</UpperBoundaryQuantity>
</QuantityInterval>

In certain implementations, QuantityInterval may have the following structure:

| GDT | | Cat. | Object Class | Property Qualifier | Property | Representation/ Association | Type | Type Name | Card. |
|---|---|---|---|---|---|---|---|---|---|
| QuantitytInterval | | | Quantity Interval | | | Details | | | |
| | Interval-Boundary-TypeCode | E | Quantity Interval | | Interval Boundary Type | Code | GDT | Interval-Boundary-TypeCode | 1 |
| | Lower-Boundary-Quantity | E | Quantity Interval | Lower | Boundary | Quantity | CDT | Quantity | 0..1 |
| | Upper-Boundary-Quantity | E | Quantity Interval | Upper | Boundary | Quantity | CDT | Quantity | 0..1 |

IntervalBoundaryTypeCode can be considered a coded representation of an interval boundary type. LowerBoundaryQuantity can be considered the lower boundary of the quantity interval. It may also be used for quantity intervals that contain a single value. UpperBoundaryQuantity can be considered the upper boundary of the quantity interval.

LowerBoundaryQuantity and UpperBoundaryQuantity could contain the same unit code. UpperBoundaryQuantity can be greater than LowerBoundaryQuantity.

QuantityInterval can be used to restrict the output of a query operation: For each output items the values of the attribute linked to the QuantityInterval instance can be provided as query input are located in the specified quantity interval.

QuantityTimeSeries

A QuantityTimeSeries is a time series information that consists of items that each contain a period with a start time and end time and a period-based quantity. An example of QuantityTimeSeries is:

<QuantityTimeSeries>
<Item>
<ValidityPeriod>
<StartDateTime>2002-04-19T15:00:00Z</StartDateTime>
<EndDateTime>2002-04-19T17:00:00Z</EndDateTime>
</ValidityPeriod>
<Quantity unitCode=“PC”>150</Quantity>
</Item>
</QuantityTimeSeries>

In certain implementations, QuantityTimeSeries may have the following structure:

| CDT | | Cat. | Object Class | Property | Rep./ Ass. | Type | Type Name | Card. |
|---|---|---|---|---|---|---|---|---|
| QuantityTimeSeries | | | Quantity Time Series | | Details | | | |
| | Item | E | Quantity Time Series | Item | Details | | | 1..n |

-continued

| CDT | | Cat. | Object Class | Property | Rep./ Ass. | Type | Type Name | Card. |
|---|---|---|---|---|---|---|---|---|
| | ValidityPeriod | E | Quantity Time Series | Validity Period | Details | GDT | DateTimePeriod | 1 |
| | Quantity | E | Quantity Time Series | Quantity | Quantity | CDT | Quantity | 1 |
| | FixedIndicator | E | Quantity Time Series | Fixed Indicator | Indicator | GDT | FixedIndicator | 0..1 |

QuantityTimeSeriesItem can be considered an item in a time series and can be repeated as often as is appropriate. ValidityPeriod can describe the validity period of the time series item with a start time stamp and an end time stamp. Quantity can describe the quantity connected with the time series item. FixedIndicator can describe whether the corresponding item is blocked for changes or not.

QuantityTimeSeries can be used as a generic data type that can have various specifications in an interface depending on the context category used, e.g., "Sales," to describe sales quantities; "Consumption," to describe consumption quantities, etc.

QuantityTypeCode

A QuantityTypeCode is a coded representation of a type of quantity that is based on the measurable characteristic of an object or physical phenomenon. An example of QuantityTypeCode is:

<QuantityTypeCode>1</QuantityTypeCode>

In certain implementations, QuantityTypeCode may have the following structure:

| GDT | | Cat. | Object Class | Property | Representation/ Association | Type | Type Name | Len. | Card. | Remarks |
|---|---|---|---|---|---|---|---|---|---|---|
| Quantity-Type-Code | | | Quantity Type | | Code | CDT | Code | 1..10 | | Restricted |
| | listID | A | Code List | Identification | Identifier | Xsd | token | | 0..1 | |
| | listAgencyID | A | Code List Agency | Identification | Identifier | Xsd | token | | 0..1 | |
| | list-VersionID | A | Code List | Version | Identifier | Xsd | token | | 0..1 | |
| | listAgency-SchemeID | A | Code List Agency | Scheme | Identifier | Xsd | token | | 0..1 | |
| | listAgency-SchemeAgency-ID | A | Code List Agency | Scheme Agency | Identifier | Xsd | token | | 0..1 | |

An extensible code list can be assigned to the code. A customer can replace this code list with his or her own one.

The code list and its values may include the following examples: Wavelength, Density, Elementary Charge, and Weight.

In the previously described structure, the attributes may be described as follows: listID may be ID of the particular code list (e.g., 10449), listAgencyID may be "310" or it may be the ID of the code user (e.g., ID from DE 3055, if listed there), listVersionID may be an ID of the particular code list (e.g., assigned and managed by a code user, or an outside party), listAgencySchemeID may be an ID of the scheme if the listAgencyID does not come from DE 3055 or an ID of the organization from DE 3055 that manages the listAgencySchemeID scheme.

The GDT QuantityTypeCode can be used to identify a quantity. A unit may not be sufficient to define the type of a quantity, because a unit can be used in multiple types. For example, unit 'kg' can be used in quantity types for gross weight or net weight. On the other hand, the multiple units can be valid for one quantity type. For example, the quantity type gross weight can be expressed with units 'kg 'or 'gram.' So the quantity type can be used in addition to the unit to define a quantity completely.

The GDT QuantityTypeCode can be used to define quantity equations which are used in Quantity Conversion service. For example, Mass=Density×Volume (i.e., Mass, Density and Volume are the Quantity Types which can be used in the Quantity Equation).

Examples for customer-specific code semantics include: 1256—Statistical Weight, 2146-Vacuum Electromagnetic Waves Velocity. Physical quantities can be grouped into mutually comparable categories. For example, length, width, diameter and wavelength can all be in the same category, that is, they are all quantities of the same kind.

One particular example of such a quantity can be chosen as a reference quantity, called the unit, and then all other quantities in the same category can be expressed in terms of this unit, multiplied by a number called the numerical value. For example, if we write the wavelength is $\lambda=6.982\times10-7$ m, then "λ" can be the symbol for the physical quantity (wavelength), "m" is the symbol for the unit (meter), and "6.982×10−7" is the numerical value of the wavelength in meters.

More generally, we can write: $A=\{A\}\cdot[A]$, where A is the symbol for the quantity and $\{A\}$ symbolizes the numerical value of A if it is expressed using the unit [A]. Both the numerical value and the unit symbol can be factors and their product is the quantity.

Due to the reasons of Unicode compliance (i.e., it can be difficult to represent Symbols in the system) we can use Quantity Type Code instead of Quantity Symbol. Examples include Quantity Elementry Charge with symbol e can have value=1.602×1019 and may use unit C. Quantity Doppler Velocity with vD can have a value=29.47 and may use a unit=cm/s.

QuantityTolerance

A QuantityTolerance is the tolerated difference between a requested and an actual quantity (e.g., a delivery quantity) as a percentage. QuantityTolerance may comprise the three elements OverPercent and UnderPercent from "CDT: Numeric" and OverPercentUnlimitedIndicator from the CDT: Indicator. An example of QuantityTolerance is:

<QuantityTolerance>
<OverPercent>33.0</OverPercent>
<UnderPercent>1.0</UnderPercent>
</QuantityTolerance>

In certain implementations, QuantityTolerance may have the following structure:

| GDT | | Cat. | Object Class | Property | Representation/ Association | Type | Type Name | Card. |
|---|---|---|---|---|---|---|---|---|
| Quantity-Tolerance | | | Quantity Tolerance | | Details | | | |
| | OverPercent | E | Quantity Tolerance | Over | Percent | CDT | Percent | 0..1 |
| | OverPercent-Unlimited-Indicator | E | Quantity Tolerance | Over Percent Unlimited | Indicator | GDT | Value-Unlimited-Indicator | 0..1 |
| | Under-Percent | E | Quantity Tolerance | Under | Percent | CDT | Percent | 0..1 |

In the previously described structure, OverPercent may be explained as follows: the specification of a value x in this field can mean that for an ordered quantity of Y, up to x % of Y are accepted additionally. Therefore, the specification in this field can be understood as a percentually relative specification. The specification can be made as a decimal with a total of 4 digits, including one position after the decimal point, without a plus/minus sign (e.g., 15.5). A specification of 0 in OverPercent may mean that the ordered quantity may not be exceeded. If the OverPercent and also the OverPercentUnlimitedIndicator are not specified, this may also mean that the ordered quantity may not be exceeded. For example: for an ordered quantity of 50 pieces and an OverPercent entry=10, up to 5 more pieces could be accepted, thus altogether a maximum quantity of 55 pieces.

In the previously described structure, OverPercentUnlimitedIndicator may be explained as follows: making an entry in this field may mean that limitations could not be made regarding the degree of fulfillment upwards. The OverPercentUnlimitedIndicator may apply to the upper limit. The OverPercent and the OverPercentUnlimitedIndicator may not be specified at the same time; however, the UnderPercent and the OverPercentUmlimitedIndicator can be set simultaneously. If no OverPercentUnlimitedIndicator is set, the "default value" can be "false." Specification can be made as Boolean entry (length 1). The following values can be assigned: 'true'=Any overrun is accepted, 'false'=Overruns are not accepted.

In the previously described structure, UnderPercent may be explained as follows: the entry of a value x in this field may mean that for an ordered quantity of Y, up to x % of Y less can be accepted. Therefore, the specification in this field can be understood as a percentually relative specification. The specification can be made as a decimal with a total of 4 digits, including one position after the decimal point, without plus/minus sign (e.g., 15.5). A specification of 0 in UnderPercent can mean that the ordered quantity may not be short. If the UnderPercent is not entered, this may also mean that the ordered quantity may not be short. For example: for an ordered quantity of 50 pieces and an UnderPercent entry=10, up to 5 pieces less could be accepted, so altogether at least 45 pieces.

Using a separate entry of OverPercent and UnderPercent, it can be possible, for example, to accept too high a quantity as this could perhaps be covered by a particular stock, but to reject the delivery of too small a quantity, for example, to avoid a production standstill.

The fields OverPercent and OverPercentUnlimitedIndicator can be mutually exclusive, for instance, entering "true" in the OverPercentUnlimitedIndicator and, at the same time, filling the OverPercent may not make sense.

The QuantityTolerance can specify (e.g., as a percentage) the difference that can be tolerated between a quantity and an actual quantity (e.g., a delivery quantity). The specification can be made separately for an overquantity or shortfall.

QuotaValue

A QuotaValue is a share. The reference value of a QuotaValue can be the sum of all QuotaValues that are related to one another. An example of QuotaValues is:

<QuotaValue>30.12</QuotaValue>

In certain implementations, QuotaValues may have the following structure:

| GDT | Rep./Ass. | Type | Type Name | Len. |
|---|---|---|---|---|
| QuotaValue | Quota_ Value | xsd | nonNegativeDecimal | 5.2 |

QuotaValues can be used to define quota arrangements. If a relationship can be set for a QuotaValue to another QuotaValue, then the ratio between these two QuotaValues may define the quota arrangement. Relationships can be set between any number of QuotaValues to define a quota arrangement. For example, a quota arrangement can define the distribution of material requirements to three sources of supply such as A, B, and C. It can assign a QuotaValue of 3 to source of supply A, a QuotaValue of 5 to source of supply B, and a QuotaValue of 12 to source of supply C. As a result, 15% can be taken from source of supply A, 25% from source of supply B, and 60% from source of supply C.

If a share is to be defined directly with a reference value, the GDT Rate could be used.

Rate

Rate is a fraction whose numerator and denominator are quantities, values, or dimensionless factors, independently from each other. An example of rate is:

<DiscountRate>
<DecimalValue>−29.99</DecimalValue>
<CurrencyCode>EUR</CurrencyCode>

<BaseMeasureUnitCode>C62</BaseMeasureUnitCode>
</DiscountRate>

In the previously described example, BaseMeasureUnitCode C62 may be considered to represent one piece according to UN/ECE Recommendation No. 20.

In certain implementations, rate may have the following structure:

| GDT | | Cat. | Object Class | Property | Representation/ Association | Type | Type Name | Len. | Card. | Remarks |
|---|---|---|---|---|---|---|---|---|---|---|
| Rate | | | Rate | | Details | | | | | |
| | Decimal-Value | E | Rate | Decimal Value | Value | GDT | Decimal-Value | | 1 | |
| | Measure-UnitCode | E | Rate | Measure Unit | Code | GDT | Measure-UnitCode | 1..3 | 0..1 | |
| | Currency-Code | E | Rate | Currency | Code | GDT | Currency-Code | 3 | 0..1 | |
| | Base Decimal Value | E | Rate | Base Decimal Value | Value | GDT | Decimal-Value | | 0..1 | Default = 1 |
| | Base-Measure-UnitCode | E | Rate | Base Measure Unit | Code | GDT | Measure-UnitCode | 1..3 | 0..1 | |
| | Base-Currency-Code | E | Rate | Base Currency | Code | GDT | Currency-Code | 3 | 0..1 | |

By using the GDT DecimalValue, input of positive and negative numbers can be possible. A minus sign "−" can precede a negative number. A plus sign "+" may precede a positive number.

The GDT Rate can have the following elements: DecimalValue (i.e., the numerical value of the rate, or the numerical value of the numerator of the rate), MeasureUnitCode (i.e., the coded representation of the unit of measure of the numerator according to the UN/ECE Recommendation No. 20), CurrencyCode (i.e., the coded representation of the currency unit of the numerator according to the triple-character code used in ISO 4217), BaseDecimalValue (i.e., the numerical value of the denominator of the rate. The default value can be "I" if the element is omitted), BaseMeasureUnitCode (i.e., the coded representation of the unit of measure of the denominator according to the UN/ECE Recommendation No. 20), BaseCurrencyCode (i.e., the coded representation of the currency unit of the denominator according to the triple-character code used in ISO 4217).

One of the elements MeasureUnitCode and CurrencyCode can be specified. One of the elements BaseMeasureUnitCode and BaseCurrencyCode may be specified. The element BaseDecimalValue can be specified if the value of the denominator is not equal to "1."

The GDT Rate may specify a rate between two factors with specific units of measure, for example, the daily turnover of a business.

Special cases of the GDT Rate could be depicted with the corresponding GDTs, for example: Percentages according to GDT Percent (described above), Amounts according to GDT Amount (described above), Quantities according to GDT Quantity 9 described above), Exchange rates according to GDT ExchangeRate. However, if the GDT Rate is used, there can be an appropriate business reason in the particular context.

For a purely numerical ratio where the numerator and the denominator can be used without units of measure, the GDT Ratio (described below) can be used in accordance with UN/CEFACT CCTS V.2.01.

GDT Rate Qualifiers may include the following: AverageRate, ConversionRate (i.e., Rate that is used to convert one quantity into another), CostsRate (i.e., Rate at which costs are calculated), DefaultRate (i.e., Rate that is used as default), MaximumRate (i.e., Rate that defines the maximum rate from a set of rates), MinimumRate (i.e., Rate that defines the minimum rate from a set of rates), PaymentRate (i.e., Rate that defines a salary or payment), PriceComponentRate (i.e., Rate that defines a price, discount, or surcharge of a price component), TargetRate (i.e., Rate to be strived for as target), TimeRate (i.e., Rate that defines a time-referenced quantity).

Ratio

A Ratio is a quotient of two figures ("numerator divided by denominator"). An example of ratio is:

<ExchangeRate>

. . .

<Ratio>1.1234</Ratio>

. . .

</ExchangeRate>

In certain implementations, ratio may have the following structure:

| GDT | Object Class | Representation/ Association | Type | Type Name | Len. |
|---|---|---|---|---|---|
| Ratio | Ratio | Type | xsd | decimal | 22.14 |

Ratio can be used for example if a figure is compared with another figure. For example, P/E ratio of a share.

RebateProductGroupCode

RebateProductGroupCode is the coded representation of a group of products for which a certain rebate applies. A rebate is paid out to the customer retroactively. An example of RebateProductGroupCode is:

<RebateProductGroupCode>1</RebateProductGroupCode>

In certain implementations, RebateProductGroupCode may have the following structure:

| GDT | | Cat. | Object Class | Property | Representation/ Association | Type | Type Name | Len. | Card. |
|---|---|---|---|---|---|---|---|---|---|
| Rebate-Product-GroupCode | | | Rebate Product Group | | Code | CDT | Code | 1..2 | |
| | listID | A | Code List | Identification | Identifier | xsd | token | | 0..1 |
| | listAgencyID | A | Code List Agency | Identification | Identifier | xsd | token | | 0..1 |
| | list-VersionID | A | Code List | Version | Identifier | xsd | token | | 0..1 |
| | listAgency-SchemeID | A | Code List Agency | Scheme | Identifier | xsd | token | | 0..1 |
| | listAgency-Scheme-AgencyID | A | Code List Agency | Scheme Agency | Identifier | xsd | token | | 0..1 |

A customer-specific code list can be assigned to the code. A customer can determine the codes in the code list.

In the previously described structure, the attributes may be defined as follows: listID may be an ID of the particular code list (e.g., "10372"), listAgencyID may be an ID of the customer (i.e., ID from DE 3055, if listed there), listVersionID may be a version of the particular code list which can be assigned and managed by the customer, listAgency-SchemeID may be an ID of the scheme if the listAgencyID does not come from DE 3055, listAgencySchemeAgencyID may be an ID of the organization from DE 3055 that manages the listAgencySchemeID scheme.

The RebateProductGroupCode may currently be used in business objects and A2A messages. The RebateProduct-GroupCode can be used, for example, in sales and billing documents, to group products and to determine prices that may apply in the rebate agreement. Examples of the possible code semantics include: Maximum rebate—products for which a maximum rebate applies, Minimum rebate—products for which a minimum rebate applies.

The following dictionary objects can be assigned to this GDT in my CRM: Data element: CRMT_REBATE_GROUP Domain: CRM_REBATE_GROUP.

ReceivedQuantityAccumulation

ReceivedQuantityAccumulation are values for cumulated received quantities. An example of ReceivedQuantityAccumulation is:

```
<ReceivedQuantityAccumulation>
  <ReferencePeriod>
    <StartDateTime>2004-01-01T00:00:00Z</StartDateTime>
    <EndDateTime>2004-12-31T23:59:59Z</EndDateTime>
  </ReferencePeriod>
  <Quantity unitCode="CT">10000</Quantity>
  <ReconciliationDateTime>2005-01-01T00:00:00Z</ReconciliationDateTime>
  <ReconciliationQuantity unitCode="CT">0</ReconciliationQuantity>
</ReceivedQuantityAccumulation>
```

In certain implementations, ReceivedQuantityAccumulation may have the following structure:

| GDT | | Cat. | Object Class | Property | Representation/ Association | Type | Type Name | Len. | Card. |
|---|---|---|---|---|---|---|---|---|---|
| Received-Quantity-Accumulation | | | Received Quantity Accumulation | | Details | | | | |
| | Reference-Period | E | Received Quantity Accumulation | Reference-Period | Details | GDT | DateTime-Period | | 0..1 |
| | Quantity | E | Received Quantity Accumulation | Quantity | Quantity | CDT | Quantity | 13, 6 | 1 |
| | Reconciliation-DateTime | E | Received Quantity Accumulation | Reconciliation | Date Time | CDT | DateTime | | 0..1 |
| | Reconciliation-Quantity | E | Received Quantity Accumulation | Reconciliation | Quantity | CDT | Quantity | | 0..1 |

In the previously described structure, the following may be defined as follows: Reference Period may be a reference period for the accumulation with GDT DateTimePeriod. Quantity may be a received quantity that has been cumulated in the specified reference period up until the time that comes from the use context of the GDT. In certain implementations, this quantity value can also be described as the "cumulative received quantity" in certain industries and may have GDT Quantity.

ReconciliationDateTime may be a time of completion of the accumulation, which can differ from the end date of the reference period. In certain implementations, this time value can also be described as the "reconciliation date" in certain industries. When the accumulation is completed for the ReconciliationDateTime, the accumulation quantity can be reset or set to zero. For example, several deliveries of goods can be arranged in a calendar year (e.g., period). The last delivery for this period takes place on December 22, however (e.g., ReconciliationDateTime). A further delivery, which may arrive December 30 (e.g., therefore, after the reconciliation date), can then be added to the following calendar year as a new accumulation period. The GDT can be a DateTime.

ReconciliationQuantity may be a cumulated received quantity at the end of the reference period in accordance with the time specified in the ReconciliationDateTime. This quantity, which may also be called "agreed cumulative quantity" in specific industries, can be used for the legally binding fixing of the received quantities at the sold-to party. The GDT can be Quantity.

If the ReferencePeriod is not specified explicitly, the reference period for the accumulation can come from the use context of the GDT. This can be set up, for example, using a reference to a contract item (such as SchedulingAgreementReference).

The ReconciliationDateTime can be used together with the ReconciliationQuantity. If the ReconciliationDateTime has not been specified, the ReconciliationQuantity may refer to the end time of the ReferencePeriod.

The ReceivedQuantityAccumulation can be used for information purposes and for the (legally binding) synchronization of the goods recipient's received goods and the vendor's shipped goods.

The transmission of cumulated quantity values can be used, in particular, in release orders or forecast delivery schedules (DeliveryScheduleNotification) in the high-tech and automotive industry. Additional values for the cumulated received quantities, for instance, for the affected products and parties, can be described in the use context of the GDT, as necessary.

Recurrence

A Recurrence is a template which can be used when making projections to derive GDTs representing different types of recurrence. A Recurrence is a representation for the repeated occurrence of an event within a time period or within a time frame. There are four types of recurrence:

A number of recurrences within a time period where the element "Period" (e.g., type "DatePeriod") can describe the time period and the element "Value" (e.g., type "IntegerValue") describes the number of recurrences.

The recurrences may take place after a determined period duration, or at a time specified in relation to the beginning of a period, within a time period where the element "Period" (e.g., type "DatePeriod") describes the time period, "InteriorDuration" (e.g., type "Duration") describes the period duration, and, where applicable, "OffsetDuration" (e.g., type "Duration") and "MonthDayValue" (e.g., type "IntegerValue") describe when the event is situated in time in relation to the beginning of the period A number of recurrences within a time frame where the element "Duration" (e.g., type "Duration") describes the time frame and the element "Value" (e.g., type "IntegerValue") describes the number of recurrences.

The recurrences each take place after a determined time frame (period duration) within an overall time frame where the element "Duration" (e.g., type "Duration") describes the overall time frame and "InteriorDuration" (e.g., type "Duration") describes the time frame within this time frame.

There can be a differentiation between time frame and time period. For example, a time frame (e.g., duration) can be a unit of time without reference to a specific starting point or end point. For example, "Day," "Week," or "Year." A time period, by contrast, can be a concrete unit of time in terms of a starting point and/or an end point. For example: "Jan. 10, 2003 to Jan. 20, 2003" or "40 days starting on Jan. 2, 2004."

The four cases listed in the definition differ in terms of the: type of basic range that the recurrences refer to (i.e., time period or time frame) and way in which the recurrences are specified (i.e., fixed number or specification of a period duration for which a recurrence occurs). Examples of the four previously mentioned cases include, case a: a fixed number time period (e.g., Four recurrences between Jul. 1, 2003 and Oct. 15, 2003), case b: a period duration time period (e.g., Weekly recurrences between Apr. 12, 2004 and Jun. 6, 2004), case c: a fixed number time frame (e.g., Two recurrences in one month and eight recurrences in 50 days), and case d: a period duration time frame (e.g., Weekly recurrences over one month and daily recurrences over 50 days). The time frame as an "abstract" unit of time should not be confused with the time period as a "concrete" unit of time.

The number of recurrences in a time frame is valid for each "occurrence" of this time frame (e.g., after one week, the same number of recurrences also takes place in the following week). As a time period is a concrete unit of time and does not occur more than once, the number of recurrences relates to this time period. In certain implementations, there are no further recurrences.

In certain implementations, a recurrence does not have to be regular (i.e., occur at a regular interval). Recurrence covers both regular and irregular recurrences. In certain implementations, Recurrence may have the following structure:

| GDT | | Cat. | Object Class | Property | Representation/ Association | Type | Type Name | Len. | Card. |
|---|---|---|---|---|---|---|---|---|---|
| Recurrence-Template | | | Recurrence Template | | Details | | | | |
| | Period | E | Recurrence Template | Period | Date Period | GDT | DatePeriod | | 0..1 |
| | Duration | E | Recurrence Template | Duration | Duration | GDT | Duration | | 0..1 |
| | Interior-Duration | E | Recurrence Template | Interior | Duration | CGDT | Duration | | 0..1 |
| | Value | E | Recurrence Template | Value | Value | GDT | Integer-Value | 3 | 0..1 |
| | Offset-Duration | E | Recurrence Template | Offset | Duration | GDT | Duration | | 0..1 |
| | Month Day-Value | E | Recurrence Template | Month Day | Value | GDT | Integer-Value | | 0..1 |

In the previously described structure, the following may be defined as follows: Period—can indicate the time period within which recurrences take place, Duration—can indicate in case c the time frame within which the specified number of recurrences takes place, InteriorDuration can indicate the time frame within an overall time frame or within a time period after which, or in relation to the beginning of which, recurrences take place, Value—The number of recurrences (e.g., in terms of the time frame), OffsetDuration—can indicate the time frame in which an event takes place after a specified period has begun, MonthDayValue—can indicate the calendar day within a month on which the event takes place.

When deriving GDTs from the template elements can be used with the following cardinality for implementing the types of recurrence described above:

| | | Type of Recurrence | | | |
|---|---|---|---|---|---|
| | | a | b | c | d |
| Elements | Period | 1 | 1 | | |
| | Duration | | | 1 | 1 |
| | InteriorDuration | | 1 | | 1 |
| | Value | 1 | | 1 | |
| | OffsetDuration | | 0..1 | | |
| | MonthDayValue | | 0..1 | | |

ReferenceInterestCurveCode

A ReferenceInterestCurveCode is the coded representation of the description of a reference interest curve. The reference interest curve serves as a guideline for the amount when determining which contractual interest rate is to be used for financial transactions. An example of ReferenceInterestCurveCode is:

<ReferenceInterestCurveCodelistID="221"listAgency ID="17">LIBO</ReferenceInterestCurveCode>

In certain implementations, ReferenceInterestCurveCode may have the following structure:

| GDT | | Cat. | Object Class | Property | Representation/ Association | Type | Type Name | Len. | Card. | Remarks |
|---|---|---|---|---|---|---|---|---|---|---|
| Reference-Interest-Curve-Code | | | Reference Interest Curve | | Code | CDT | Code | 1..10 | | restricted |
| | listID | A | Code List | Identification | Identifier | xsd | token | 1..60 | 0..1 | |
| | listVersionID | A | Code List | Version | Identifier | xsd | token | 1..15 | 0..1 | |
| | listAgencyID | A | Code List Agency | Identification | Identifier | xsd | token | 1..60 | 0..1 | |
| | listAgency-SchemeID | A | Code List Agency | Scheme | Identifier | xsd | token | 1..60 | 0..1 | |
| | listAgency-Scheme-AgencyID | A | Code List Agency | Scheme Agency | Identifier | xsd | token | 1..3 | 0..1 | |

In the previously described structure, the following may be defined as follows: listID may be an ID of the particular code list (e.g., "221"), listAgencyID may be 17, listVersionID may be a version of the particular code list which can be assigned and managed by the customer, listAgencySchemeID may be an ID of the scheme if the listAgencyID does not come from DE 3055, listAgencySchemeAgencyID may be an ID of the organization from DE 3055 that manages the listAgency-SchemeID scheme.

Loans with variable interest rates may use a reference interest rate to determine the interest.

The following can be examples of reference interest rates: LIBOR (i.e., London Interbank Offered Rate: Reference interest rate at which internationally active large banks conclude Euro money market transactions in London), FIBOR (i.e., Frankfurt Interbank Offered Rate: Reference interest rate at which internationally active banks conclude money market transactions in Frankfurt a. M).

The ReferenceInterestCurveCode can be based on the data element/domain SZSREF from EA-FINSERV. The value range for the domain can be defined by entries in an underlying Customizing table. Customizing is not supplied for this table.

RegionalStructureCityCode

RegionalStructureCityCode is the coded representation of a city in the regional structure. The regional structure can be a hierarchically structured directory of cities, city districts, streets and postcodes. An example of RegionalStructureCityCode is:

<RegionalStructureCityCode>000001544512</Regional-StructureCityCode>

In certain implementations, RegionalStructureCityCode may have the following structure:

| GDT | | Cat. | Object Class | Property | Representation/ Association | Type | Type Name | Len. | Card. | Remarks |
|---|---|---|---|---|---|---|---|---|---|---|
| Regional-Structure-CityCode | | | Regional Structure City | | Code | CDT | Code | 1..12 | | restricted |
| | listID | A | Code List | Identification | Identifier | xsd | token | | 0..1 | |
| | listAgencyID | A | Code List Agency | Identification | Identifier | xsd | Token | | 0..1 | |
| | listVersion-ID | A | Code List | Version | Identifier | xsd | Token | | 0..1 | |
| | listAgency-SchemeID | A | Code List Agency | Scheme | Identifier | xsd | Token | | 0..1 | |
| | listAgency-Scheme-AgencyID | A | Code List Agency | Scheme Agency | Identifier | xsd | Token | | 0..1 | |

A customer-specific code list can be assigned to the RegionalStructureCityCode. A customer can define the codes in the code list.

In the previously described structure, the following may be defined as: listID may be an ID of the particular code list (e.g., “10189”), listAgencyID may be an ID of the customer (e.g., ID from DE 3055, if listed there), listVersionID may be a version of the particular code list which can be assigned and managed by the customer, listAgencySchemeID may be an ID of the scheme if the listAgencyID does not come from DE 3055, listAgencySchemeAgencyID may be an ID of the organization from DE 3055 that manages the listAgencySchemeID scheme.

The data type RegionalStructureCityCode can be used in addresses in order to specify with which city in the regional structure the city of the address was identified. The Qualifier POBoxDeviatingRegionalStructureCityCode may be defined as: identification number of the deviating city of the postcode within the regional structure file.

In certain implementations, the following dictionary objects are assigned to this GDT: Data element: AD_CITY_NUM, Domain: CITY_CODE. The possible values for the RegionalStructureCityCode can be maintained in table ADRCITY.

RegionalStructureDistrictCode

RegionalStructureDistrictCode is the coded representation of a district in the regional structure. The regional structure is a hierarchically structured directory of cities, districts, streets and postcodes. An example of RegionalStructureDistrictCode is:

<RegionalStructureDistrictCode>00001244</RegionalStructureDistrictCode>

In certain implementations, RegionalStructureDistrictCode may have the following structure:

A customer-specific code list can be assigned to the RegionalStructureDistrictCode. A customer may define the codesin the code list. ListID may be defined as “10190.”

In the previously defined structure, the following may be defined as: listAgencyID may be an ID of the customer (e.g., ID from DE 3055, if listed there), listVersionID may be a version of the particular code list which can be assigned and managed by the customer, listAgencySchemeID may be an ID of the scheme if the listAgencyID does not come from DE 3055, listAgencySchemeAgencyID may be an ID of the organization from DE 3055 that manages the listAgencySchemeID scheme.

The data type RegionalStructureDistrictCode can be used in addresses in order to specify with which quarter, district or county in the regional structure city file the quarter, district or county of the address was identified.

In certain implementations, the following dictionary objects are assigned to this GDT: Data element: AD_CITYPNM, Domain: CITYP_CODE. The possible values for the RegionalStructureCityCode can be maintained in table ADRCITYPRT.

RegionalStructureStreetCode

RegionalStructureStreetCode is the coded representation of a street in the regional structure. The regional structure is a hierarchically structured directory of cities, districts, streets and postcodes. An example of RegionalStructureStreetCode is:

<RegionalStructureStreetCode>0212000012110</RegionalStructureStreetCode>

In certain implementations, RegionalStructureStreetCode may have the following structure:

| GDT | | Cat. | Object Class | Property | Representation/ Association | Type | Type Name | Len. | Card. | Remarks |
|---|---|---|---|---|---|---|---|---|---|---|
| Regional-Structure-District-Code | | | Regional Structure District | | Code | CDT | Code | 1..8 | | restricted |
| | listAgencyID | A | Code List Agency | Identification | Identifier | xsd | Token | | 0..1 | |
| | list-VersionID | A | Code List | Version | Identifier | xsd | Token | | 0..1 | |
| | listAgency-SchemeID | A | Code List Agency | Scheme | Identifier | xsd | Token | | 0..1 | |
| | listAgency-Scheme-AgencyID | A | Code List Agency | Scheme Agency | Identifier | xsd | Token | | 0..1 | |

| GDT | | Cat. | Object Class | Property | Representation/ Association | Type | Type Name | Len. | Card. | Remarks |
|---|---|---|---|---|---|---|---|---|---|---|
| Regional-Structure-Street-Code | | | Regional Structure Street | | Code | CDT | Code | 1..12 | | restricted |
| | listID | A | Code List | Identification | Identifier | xsd | token | | 0..1 | |
| | listAgency-ID | A | Code List Agency | Identification | Identifier | xsd | Token | | 0..1 | |
| | list-VersionID | A | Code List | Version | Identifier | xsd | Token | | 0..1 | |
| | listAgency-SchemeID | A | Code List Agency | Scheme | Identifier | xsd | Token | | 0..1 | |
| | listAgency-Scheme-AgencyID | A | Code List Agency | Scheme Agency | Identifier | xsd | Token | | 0..1 | |

A customer-specific code list can be assigned to the RegionalStructureStreetCode. A customer can define the codes in the code list.

In the previously described structure, the following may be defined as: listID—ID of the particular code list: 10191, listAgencyID may be an ID of the customer (e.g., ID from DE 3055, if listed there), listVersionID may be a version of the particular code list which can be assigned and managed by the customer, listAgencySchemeID may be an ID of the scheme if the listAgencyID does not come from DE 3055, listAgencySchemeAgencyID may be an ID of the organization from DE 3055 that manages the listAgencySchemeID scheme.

The data type RegionalStructureStreetCode can be used in addresses in order to specify 0.10 which street in the regional structure city file the street of the address could have been identified.

In certain implementations, the following dictionary objects are assigned to this GDT: Data element: AD_STRNUM, Domain: STRT_CODE. The possible values for the RegionalStructureStreetCode can be maintained in table ADRSTREET.

RegionCode

The RegionCode is a coded representation of logically or physically linked geographical or political regions that have one or more attributes in common. An example of RegionCode is:

<RegionCode>DE-BW</RegionCode>

In certain implementations, RegionCode may have the following structure:

| GDT | | Cat. | Object Class | Property Term | Representation/ Association | Type | Type Name | Len. | Card. |
|---|---|---|---|---|---|---|---|---|---|
| Region-Code | | | Region | | Code | CDT | Code | | |
| | listID | A | Code List | Identification | Identifier | xsd | token | 1..60 | 0..1 |
| | listVersionID | A | Code List | Version | Identifier | xsd | token | 1..15 | 0..1 |
| | listAgencyID | A | Code List Agency | Identification | Identifier | xsd | token | 1..60 | 0..1 |
| | listAgency-SchemeID | A | Code List Agency | Scheme | Identifier | xsd | token | 1..60 | 0..1 |
| | listAgency-SchemeAgencyID | A | Code List Agency | Scheme Agency | Identifier | xsd | token | 3 | 0..1 |

A fixed standard code list can be assigned to the code.

In the previously described structure, the following values may be defined as: listID may be an ID of the particular code list: 3166-2, listAgencyID may be 5, listVersionID may be a version of the particular code list which can be assigned and managed by the customer, listAgencySchemeID may be an ID of the scheme if the listAgencyID does not come from DE 3055, listAgencySchemeAgencyID may be an ID of the organization from DE 3055 that manages the listAgencySchemeID scheme.

Examples of RegionCode can include, structure regions (e.g., Munich metropolitan area); program regions (e.g., promotion programs), settlements, administrative regions (e.g., federal states), grid squares, economic regions, etc.

RegistrantRoleCode

A RegistrantRoleCode is the coded representation of the role of a person, device, or system that is registered for something. An example of RegistrantRoleCode is:

<RegistrantRoleCode>1</RegistrantRoleCode>

In certain implementations, RegistrantRoleCode may have the following structure:

| GDT | Object Class | Property | Representation/ Association | Type | Type Name | Len. | Remarks |
|---|---|---|---|---|---|---|---|
| Registrant-RoleCode | Registrant | Role | Code | CDT | Code | 1..2 | Restricted |

A fixed code list can been assigned to RegistrantRoleCode. The attributes may be defined as follows: listID=10156, listAgencyID=310, listVersionID may be a version of the relevant code list which can be assigned and managed.

The code list may include the following values: Responsible, Interested.

ReplenishmentQuantityDeterminationMethodCode

A ReplenishmentQuantityDeterminationMethodCode is a coded representation of a method to determine the quantity to be replenished a particular inventory level control rule execution method. An inventory level control rule execution method can define the measures that have to be taken if replenishment or cleanup is required. An example of ReplenishmentQuantityDeterminationMethodCode is:

<ReplenishmentQuantityDeterminationMethodCode listID=listAgencyID=310>1</ReplenishmentQuantityDeterminationMethodCode>

In certain implementations, ReplenishmentQuantityDeterminationMethodCode may have the following structure:

| GDT | | Cat. | Object Class | Property | Representation/ Association | Type | Type Name | Len. | Card. |
|---|---|---|---|---|---|---|---|---|---|
| Replenishment-Quantity-Determination-MethodCode | | | Replenishment Quantity Determination Method | | Code | CDT | Code | 1..2 | |
| | listID | A | Code List | Identification | Identifier | xsd | token | | 0..1 |
| | list-AgencyID | A | Code List Agency | Identification | Identifier | xsd | token | | 0..1 |
| | list-VersionID | A | Code List | Version | Identifier | xsd | token | | 0..1 |
| | listAgency-SchemeID | A | Code List Agency | Scheme | Identifier | xsd | token | | 0..1 |
| | listAgency-Scheme-AgencyID | A | Code List Agency | Scheme Agency | Identifier | xsd | token | | 0..1 |

An extensible code list can be assigned to the ReplenishmentQuantityDeterminationMethodCode. A customer can change this code list.

The code list and its values may include the following: Capacity Based (i.e., Quantity is calculated according to the predetermined maximum capacity of a location. The aim is to replenish the storage location to its full capacity), Constant (i.e., Quantity is a constant), Order Quantity (i.e., Quantity is determined according to the quantity defined in the site logistics or production order).

In the previously described structure, the following may be defined as: listID may be an ID of the particular code list (e.g., 10454), listAgencyID may be an ID of the code user (e.g., ID from DE 3055, if listed there), listVersionID may be a version of particular code list, listAgencySchemeID may be an ID of the scheme if the listAgencyID does not come from DE 3055 or may be an ID of the organization from DE 3055 that manages the listAgencySchemeID scheme.

Prior to a replenishment process, the ReplenishmentQuantityDeterminationMethodCode can specify the relevant method to be used for calculating the quantity to be replenished. The method for calculating the quantity can be part of the inventory level control rule execution method.

Examples of customer-specific code semantics include: Optimum Based (i.e., Quantity is calculated according to the predetermined optimal quantity level of a location).

RelativeOrdinalNumberValue

RelativeOrdinalNumberValue is a number that indicates the place at which an element can be found in a linearly ordered quantity in relation to a specific element in the quantity according to specific criteria. An example of RelativeOrdinalNumberValue is:

<RelativeOrdinalNumberValue>−1</RelativeOrdinalNumberValue>

In certain implementations, RelativeOrdinalNumberValue may have the following structure:

| GDT | Rep./Ass. Qual. | Rep./ Ass. | Type | Type Name | Len. |
|---|---|---|---|---|---|
| RelativeOrdinal-Number-Value | Relative Ordinal Number | Value | xsd | Integer | 1..9 |

The value zero may mean that this is an example of an element that represents the reference point for all elements of the linearly ordered quantity. A negative value can mean that the element can be found before the reference point in the linearly ordered quantity. A positive value may mean that the element can be found after the reference point in the linearly ordered quantity.

RelativePeriodCode

A RelativePeriodCode is a coded representation of a period relative to the current date.

An example of RelativePeriodCode is:

<RelativePeriodCode>1</RelativePeriodCode>

In certain implementations, RelativePeriodCode can have the following structure:

| GDT | Object Class | Representation/ Association | Type | Type Name | Len. | Remarks |
|---|---|---|---|---|---|---|
| RelativePeriodCode | Relative_Period | Code | CDT | Code | 1..2 | restricted |

A fixed code list can be assigned to the RelativePeriodCode. The attributes may be defined as follows: listID="10263," listAgencyID="310," listVersionID may be a version of the relevant code list. Assigned and managed by AG. This may be determined in future.

The code list and its characteristics may include the following: Current period (i.e., Current fiscal year period relative to the current date), Current quarter (i.e., current quarter relative to the current date), Year to date (i.e., all fiscal year periods of the current year up to the current period), Previous period (i.e., Previous fiscal year period relative to the current date), Previous quarter (i.e., Previous quarter relative to the current date), Year to date up to the previous period (i.e., All fiscal year periods of the current year up to the previous period), Previous day (i.e., Assignment to the day prior to the current day), Current day (i.e., Assignment to the current day), Following day (i.e., Assignment to the day following the current day), From today on (i.e., From today on sine die).

The RelativePeriodCode can be used, for example, to determine the evaluation period for a Budget Monitoring Rule.

ReleasedSiteLogisticsProcessModelID

A ReleasedSiteLogisticsProcessModelID is an identifier for a ReleasedSiteLogisticsProcessModel. A ReleasedSiteLogisticsProcessModel can be a released version of a SiteLogisticsProcessModel in a logistics division that can contain all details from the SiteLogisticsBillOfOperations necessary for the execution of a site logistics process. An example of ReleasedSiteLogisticsProcessModelID is:

<ReleasedSiteLogisticsProcessModelID>Standard_Inbound-1.2</ReleasedSiteLogisticsProcessModelID>

In certain implementations, ReleasedSiteLogisticsProcessModelID may have the following structure:

| GDT | Object Class | Property | Representation/ Association | Type | Type Name | Len. | Remarks |
|---|---|---|---|---|---|---|---|
| ReleasedSite-LogisticsProcess-ModelID | Released Site Logistics Process Model | Identification | Identifier | CDT | Identifier | 1..50 | restricted |

The ReleasedSiteLogisticsProcessModelID can be created by concatenating the ID and version values of the SiteLogisticsProcessModel which generated the ReleasedSiteLogisticsProcessModel. The concatenated values can be separated by '-.'

The ReleasedSiteLogisticsProcessModelID can be in the context of the SiteLogisticsProcessModel from which it was generated.

ReleasedSiteLogisticsProcessModelProcessSegmentID

A ReleasedSiteLogisticsProcessModelProcessSegmentID is an identifier for a ProcessSegment in a ReleasedSiteLogisticsProcessModel. A ReleaseSiteLogisticsProcessModel can be considered a released version of a SiteLogisticsProcessModel in a distribution center that can contain details from the SiteLogisticsBillOfOperations necessary for the execution of a site logistics process. A ProcessSegment may specify a set of operations for moving, packing or checking stock in a logistics division. An example of ProcessSegmentID is:

<ProcessSegmentID>Standard_Inbound</ProcessSegmentID>

In certain implementations, ProcessSegmentID may have the following structure:

| GDT | Object Class | Property | Representation/ Association | Type | Type Name | Len. | Remarks |
|---|---|---|---|---|---|---|---|
| ReleasedSiteLogistics-ProcessModelProcess-SegmentID | Released Site Logistics Process Model Process Segment | Identification | Identifier | CDT | Identifier | 1..40 | Restricted |

The ReleasedSiteLogisticsProcessModelProcessSegmentID can be in the context of a ReleasedSiteLogisticsProcess-Model.

ReportingPointID

An identifier of a reporting point in a process description. A reporting point can be a point in a process description at which data is recorded that can document the progress of production. An example of ReportingPointID is:

<ReportingPointID>RP4711</ReportingPointID>

In certain implementations, ReportingPointID may have the following structure:

| GDT | Object Class | Property | Representation/ Association | Type | Type Name | Len. | Remarks |
|---|---|---|---|---|---|---|---|
| Reporting-PointID | Reporting Point | Identification | Identifier | CDT | Identifier | 1..40 | Restricted |

The ReportingPointID can be in the usage context.

RequirementSpecificationID

A RequirementSpecificationID is an identifier of a RequirementSpecification. A RequirementSpecification can be a collection of requirements that exist for a business entity that can be used in a particular business context (for example sales order, prototype, development project). It can also include the specifications for fulfilling these requirements. An example of RequirementSpecificationID is:

<RequirementSpecificationID>SOR_Shutter__005</RequirementSpecificationID>

In certain implementations, RequirementSpecificationID may have the following structure:

| GDT | Object Class | Property | Representation/ Association | Type | Type Name | Len. | Remarks |
|---|---|---|---|---|---|---|---|
| Requirement-SpecificationID | Requirement Specification | Identification | Identifier | CDT | Identifier | 1..40 | Restricted |

RequirementSpecificationID can be used to identify a RequirementSpecification. For example, a sales representative can create a RequirementSpecification that can be related to a Customer Quote or a Sales Order. He or she can then communicate the RequirementSpecificationID to the subsequent process areas (for example construction, production, purchasing) so that those areas can provide further input or use the existing information for their purposes. Each process step may use this identifier in subsequent processing to refer to the RequirementSpecification.

RequirementSpecificationProcessingInformationFolderProcessingInformationID

A RequirementSpecificationProcessingInformationFolderProcessingInformationID is an identifier of a ProcessingInformation within a ProcessingInformationFolder of an instance of a RequirementSpecification. A ProcessingInformation can be any definition, information or instruction that is important for an optimized in-house processing for example in production, packaging or storing. The ProcessingInformationFolder can be the encapsulation of all ProcessingInformation. An example of RequirementSpecificationProcessingInformationFolderProcessingInformationID is:

<RequirementSpecificationProcessingInformationFolder ProcessingInformationID>REQ__005</RequirementSpecification-ProcessingInformationFolder-ProcessingInformationID>

In certain implementations, RequirementSpecificationProcessingInformationFolderProcessingInformationID may have the following structure:

| GDT | Object Class | Property | Representation/ Association | Type | Type Name | Len. | Remarks |
|---|---|---|---|---|---|---|---|
| Requirement-SpecificationProcessing-InformationFolder-Processing-InformationID | Requirement Specification Processing Information Folder Processing Information | Identification | Identifier | CDT | Identifier | 1..40 | Restricted |

A RequirementSpecificationProcessingInformationFolderProcessingInformationID can be in the context of an Instance of RequirementSpecification.

A RequirementSpecificationProcessingInformationFolderProcessingInformationID can be defined to refer to a piece of information within a RequirementSpecification. It can be used to assign different types of information that exist within a RequirementSpecification.

RequirementSpecificationRequirementFolderRequirementID

A RequirementSpecificationRequirementFolderRequirementID is an identifier of a Requirement within an RequirementFolder of an Instance of a RequirementSpecification. A Requirement can be a natural-language or property-based description of a direct need or expectation that a planned or existing business entity can fulfill (for example a piece of machinery, a technical Instrument, a tool or a software application). The RequirementFolder can be the encapsulation of all Requirements. An example of RequirementSpecificationRequirementFolderRequirementID is:

<RequirementSpecificationRequirementFolderRequirementID>REQ__005<RequirementSpecificationRequirementFolderRequirementID>

In certain implementations, RequirementSpecificationRequirementFolderRequirementID may have the following structure:

| GDT | Object Class | Property | Representation/ Association | Type | Type Name | Len. | Remarks |
|---|---|---|---|---|---|---|---|
| Requirement-Specification-RequirementFolder-RequirementID | Requirement Specification Requirement Folder Requirement | Identification | Identifier | CDT | Identifier | 1..40 | Restricted |

-

A RequirementSpecificationRequirementFolderRequirementID can be in the context of an Instance of RequirementSpecification.

A RequirementSpecificationRequirementFolderRequirementID can be defined to refer to a piece of information within a RequirementSpecification. It can be used to assign different types of information that may exist within a RequirementSpecification. For example, it can be used to assign one or more Specifications to a RequirementFolderRequirementID.

RequirementSpecificationSpecificationFolderSpecificationID

A RequirementSpecificationSpecificationFolderSpecificationID is an identifier of a specification within a SpecificationFolder of an instance of a RequirementSpecification. A SpecificationFolderSpecification (e.g., detail concept, feasibility concept) can be a precise definition of one or more features and how they fulfill one or more requirements of the business entity. The SpecificationFolder may encapsulate all Specifications. In contrast to a requirement the content of a specification can be precise, complete or measurable. It can combine technical, legal or other constraints. These constraints can define the usage, behavior and maintenance of a business entity. An example of RequirementSpecificationSpecificationFolderSpecificationID is:

<RequirementSpecificationSpecificationFolderSpecificationID>SPEC__005</RequirementSpecificationSpecificationFolderSpecificationID>

In certain implementations, RequirementSpecificationSpecificationFolderSpecificationID may have the following structure:

| GDT | Object Class | Property | Representation/ Association | Type | Type Name | Len. | Remarks |
|---|---|---|---|---|---|---|---|
| Requirement-Specification-SpecificationFolder-SpecificationID | Requirement Specification Specification Folder Specification | Identification | Identifier | CDT | Identifier | 1..40 | restricted |

RequirementSpecification-SpecificationFolderSpecificationID can be in the context of an Instance of a RequirementSpecification.

A RequirementSpecification-SpecificationFolderSpecificationID can be defined to refer to a piece of information within a RequirementSpecification. It can be used to assign different types of information that exist within a RequirementSpecification. For example, it can be used to assign one or more Requirements to a Specification-FolderSpecificationID.

ResourceCapacityPlanningConstraintTypeCode

A ResourceCapacityPlanningConstraintTypeCode is a coded representation of the type of a planning constraint with respect to resource capacities. A Resource can be a tangible and reusable factor that adds value to a material or service in its creation, production, or delivery. An example of Resource-CapacityPlanningTypeCode is:

<ResourceCapacityPlanningTypeCode>1</ResourceCapacityPlanningTypeCode>

In certain implementations, ResourceCapacityPlanning-TypeCode may have the following structure:

| GDT | Object Class | Property | Rep./ Ass. | Reason | Reason Name | Len. | Remarks |
|---|---|---|---|---|---|---|---|
| ResourceCapacity-PlanningConstraint-TypeCode | Resource Capacity Planning Constraint | Type | Code | CDT | Code | 1..2 | restricted |

A static code list can be assigned to this Code. The attributes may be assigned values as follows: listID="10461," listAgencyID="310."

The code list and its values may include the following: Infinite (i.e., Resource capacity load is not constraining planning), Bucket-Finite (i.e., Resource capacity load is constraining planning at bucket level. A bucket can be a fraction of time which is considered in capacity planning).

ResourceCapacityTimeBucketSizeCode

A ResourceCapacityTimeBucketSizeCode is a coded representation of the size of a time bucket for a resource capacity. A resource capacity time bucket can be a fraction of time which is considered in capacity planning, A Resource can be a tangible and reusable factor that adds value to a material or service in its creation, production, or delivery. An example of ResourceBucketSizeCode is:

<ResourceBucketSizeCode>1</ResourceBucketSizeCode>

In certain implementations, ResourceBucketSizeCode can have the following structure:

| GDT | Object Class | Property | Rep./ Ass. | Reason | Reason Name | Len. | Re-marks |
|---|---|---|---|---|---|---|---|
| Resource-Capacity-Bucket-SizeCode | Resource | Capacity Time Bucket Size | Code | CDT | Code | 1..2 | re-stricted |

A static code list can be assigned to this Code. The attributes can be assigned values as follows: listID="10473," listAgencyID="310."

The code list and its values may include the following: Day (i.e., Bucket size is one day), Week (i.e., Bucket size is one week), Month (i.e., Bucket size is one month).

ResourceCapacityTypeCode

ResourceCapacityTypeCode is a coded representation of the type of capacity that can be offered by a resource according to criteria resulting from the importance of the resource from a planning and scheduling point of view. An example of ResourceCapacityTypeCode is:

<ResourceCapacityTypeCode>1</ResourceCapacity-TypeCode>

In certain implementations, ResourceCapacityTypeCode may have the following structure:

| GDT | Object Class | Property | Rep./ Ass. | Type | Type Name | Len. | Re-marks |
|---|---|---|---|---|---|---|---|
| Resource-Capacity-Type-Code | Resource | Capaci-ty_Type | Code | CDT | Code | 1..3 | restricted |

A fixed code list can be assigned to this Code. The attributes can be assigned values as follows: listID="10201," listAgencyID="310," listVersionID may be an ID of the particular code list.

A resource can offer one type of capacity for planning/scheduling purposes. The code list may include the following values: Time-Continuous (i.e., Capacity type which indicates that the resource is offering time-continuous capacity. Time-continuous is a high granularity capacity which includes working times, break times, etc which contribute to the overall capacity calculation), Bucket (i.e., Capacity type which indicates that the resource is offering bucket based capacity. Bucket capacity is a low granularity capacity which can be in form of capacity available as daily, weekly, monthly buckets. The details of capacity like break times etc are not captured as a part of this capacity), Infinite (i.e., Capacity type which indicates that the resource has infinite capacity).

ResourceDowntimeReasonCode

ResourceDowntimeReasonCode is a coded representation of the reason for the downtime of the resource. An example of ResourceDowntimeReasonCode is:

<ResourceDowntimeReasonCode>1</ResourceDowntimeReasonCode>

In certain implementations, ResourceDowntimeReasonCode can have the following structure:

| GDT | | Cat. | Object Class | Property | Rep./ Ass. | Reason | Reason Name | Len. | Card. | Remarks |
|---|---|---|---|---|---|---|---|---|---|---|
| Resource-Downtime-ReasonCode | | | Resource | Downtime_Reason | Code | CDT | Code | 1..3 | | restricted |
| | listAgencyID | A | Code List Agency | Identification | Identifier | xsd | token | | 0..1 | |
| | listVersionID | A | Code List | Version | Identifier | xsd | token | | 0..1 | |
| | listAgency-SchemeID | A | Code List Agency | Scheme | Identifier | xsd | token | | 0..1 | |
| | listAgency-Scheme-AgencyID | A | Code List Agency | Scheme Agency | Identifier | xsd | token | | 0..1 | |

An extensible code list can be assigned to the ResourceDowntimeReasonCode. A customer can change this code list. ListID may be defined as "10200."

The code list with its values may include the following: Scheduled Maintenance (i.e., indicates that the resource is down for scheduled maintenance), Adhoc Maintenance (i.e., indicates that the resource is down for adhoc maintenance).

In the previously described structure, the following may be defined as: listAgencyID may be "310" or may be an ID of the code user (ID from DE 3055, if listed there), listVersionID may be a version of the particular code list which can be assigned and managed, listAgencySchemeID may be an ID of the scheme if the listAgencyID does not come from DE 3055 or it may be an ID of the organization from DE 3055 that manages the listAgencySchemeID scheme.

Examples for the custom code include: Power Outage (i.e., indicates that the resource is down due to power outage).

ResourceID

A ResourceID is an identifier for a resource. A resource can be an entity that offers capacity and services and can be used in planning or logistics process within a logistics facility. A resource could be individual equipments, workers, vehicles, storage bins or a grouping of these items. Resource identifier is internal to an enterprise. An example of ResourceID is:

<ResourceID schemeID="ResourceID" schemeAgencyID="XXX__002">Equipment001</ResourceID>

In certain implementations, ResourceID may have the following structure:

| GDT | | Cat. | Object Class | Property | Representation/ Association | Type | Type Name | Len. | Card. |
|---|---|---|---|---|---|---|---|---|---|
| ResourceID | | | Resource | Identification | Identifier | CDT | Identifier | 1..40 | |
| | schemeID | A | Identification Scheme | Identification | Identifier | xsd | token | 1..60 | 0..1 |
| | scheme-Agency ID | A | Identification Scheme Agency | Identification | Identifier | xsd | token | 1..60 | 0..1 |

The attributes may be described as follows: schemeID (i.e., ResourceID: Identification of a resource using an external identifier), schemeAgencyID (i.e., Business System, which issued the ID).

ResourceTypeCode

A GDT ResourceTypeCode is a tangible and reusable factor that adds value to a material or service in its creation, production, or delivery. An example of GDT ResourceTypeCode is:

<ResourceTypeCode>1</ResourceTypeCode>

In certain implementations, GDT ResourceTypeCode may have the following structure:

| GDT | Object Class | Property | Rep./ Ass. | Type | Type Name | Len. | Remarks |
|---|---|---|---|---|---|---|---|
| Resource-TypeCode | Resource | Type | Code | GDT | Code | 1..3 | restricted |

The data type GDT ResourceTypeCode may assign one static code list to the code. The attributes may be assigned the following values: listID="10203" and listAgencyID="310."

The data type GDT ResourceTypeCode may use the following codes: 1 (i.e., equipmentresource), 2 (i.e., vehicleresource), 3 (i.e., capacityaggregationgroup), 4 (i.e., resourcegroup), 5 (i.e., laborresource).

ResponsibilityTypeCode

A GDT ResponsibilityTypeCode defines the characteristic features of a particular responsibility, for example, surnames of employees, product categories, organizational centers etc. A responsibility can describe specific rights and duties of an acting agent responsible such as a person or an organizational centre etc. An example of GDT ResponsibilityTypeCode is:

<ResponsibilityType>ActingRLUForPayment</ResponsibilityType>

In certain implementations, GDT ResponsibilityTypeCode may have the following structure:

| GDT | | Cat. | Object Class | Property | Representation/ Association | Type | Type Name | Len. | Card. | Remarks |
|---|---|---|---|---|---|---|---|---|---|---|
| ResponsibilityTypeCode | | | Responsibility | Type | Code | CDT | Code | 1..5 | | restricted |
| | listID | A | Code List | Identification | Identifier | xsd | token | | 0..1 | |
| | listAgencyID | A | Code List Agency | Identification | Identifier | xsd | token | | 0..1 | |
| | listVersionID | A | Code List | Version | Identifier | xsd | token | | 0..1 | |
| | listAgency-SchemeID | A | Code List Agency | Scheme | Identifier | xsd | token | | 0..1 | |
| | listAgency-SchemeAgencyID | A | Code List Agency | Scheme Agency | Identifier | xsd | token | | 0..1 | |

An extendible code list can be assigned to the code. A customer can replace the list by his/her own list.

For GDT ResponsibilityTypeCode, a customer-specific code list can be assigned to the code. A listID can be "10244." If the code list is unchanged, a listAgencyID can be "310." Otherwise, a listAgencyID can be the ID of the customer (e.g., ID from DE 3055, if listed there). A listVersionID can be the version of the particular code list (e.g., assigned and managed by the customer). A listAgencySchemeID can be the ID of the scheme if the listAgencyID does not come from DE 3055. The listAgencySchemeAgencyID can be the ID of the organization from DE 3055 that manages the listAgency-SchemeID scheme.

The GDT ResponsibilityTypeCode can be used to determine acting agents responsible (e.g., in responsibility queries) in order to narrow down the responsibility that is to be found. For example, the agent responsible for the responsibility type "authorization of leave request" needs to be determined.

The data type GDT ResponsibilityTypeCode may use the following codes: 1 (i.e., vacationapprovalresponsibilitytype), 2 (i.e., purchaseorderapprovaltype) 3 (i.e., actingRLUForPayment).

ResponsibleAgent

A GDT ResponsibleAgent can be, for example, an employee or an Organizational Center. An example of GDT ResponsibleAgent is:

<ResponsibilityType>ActingRLUForPayment</ResponsibilityType>

In certain implementations, GDT ResponsibleAgent may have the following structure:

| GDT | | Cat. | Object Class | Property | Representation/Association | Type | Type Name | Card. |
|---|---|---|---|---|---|---|---|---|
| Respon-sible-Agent | | | Responsible Agent | | Details | | | |
| | UUID | E | Responsible Agent | Univeral_ Identification | Identifier | GDT | UUID | 1 |
| | Business-Object-TypeCode | E | Responsible Agent | Business Object Type | Code | GDT | Business-Object-TypeCode | 1 |

In the previously described structure the following may be identified as follows: UUID—Global identifier for acting agent responsibility.

The data type GDT ResponsibleAgent may include the following codes: 1001 (i.e., businesspartner), 1002 (i.e., customer), 1003 (i.e., supplier), 1004 (i.e., employee), 1005 (i.e., company), 1006 (i.e., costcenter), 1007 i.e., salesunit), 1008 (i.e., serviceunit), 1009 (i.e., purchasingunit), 1010 (i.e., reportinglineunit), 1011 (i.e., location), 1012 (i.e., distributioncenter).

One or more ResponsibleAgents can be the result of responsibility query.

The GDT ResponsibleAgent may also be used when maintaining responsibilities for example, a position, in order to show that the responsibilities being maintained currently refer to one person but may be transferred to a different person, if in future the position is filled by someone else.

ReturnMaterialAuthorisationID

A ReturnMaterialAuthorisationID is a unique identifier for authorizing the return of a product (of the type material). An example of GDT ReturnMaterialAuthorizationID is:

<ReturnMaterialAuthorisationID>XYZ1234AZ5</ReturnMaterialAuthorisationID>

A ReturnMaterialAuthorisationID is a unique identifier for authorizing the return of a product (of the type material).

In certain implementations, GDT ReturnMaterialAuthorisationID may have the following structure:

| GDT | Object Class | Property | Representation/Association | Type | Type Name | Len. |
|---|---|---|---|---|---|---|
| Return-Material-Authorisa-tionID | Return Material Authori-sation | Identifi-cation | Identifier | CDT | Iden-tifier | 1..20 |

The ReturnMaterialAuthorisationID can be assigned by the goods recipient—in the case of third-party deals, also by the original buyer or ordering party. The party performing the (return) delivery could use the ReturnMaterialAuthorisationID to prove authorization for the return of the material; for example, when a return delivery is announced via the DespatchedDeliveryNotification message.

RevisionQuantityTimeSeries

A RevisionQuantityTimeSeries is a revised time series that consists of items that contain a period with a start time and end time, a period-based quantity, and the reason for the changes. An example of GDT RevisionQuantityTimeSeries is:

<RevisionQuantityTimeSeries> <Item><ValidityPeriod><StartDateTime>2002-04-19T15:00:00Z</StartDateTime><EndDateTime>2002-04-19T17:00:00Z</EndDateTime><ValidityPeriod><Quantity unitCode="PC">150</Quantity><AdjustmentReasonCode> Cancelled_Promotion</AdjustmentReasonCode><Item></RevisionQuantity-TimeSeries>

In certain implementations, RevisionQuantityTimeSeries may have the following structure:

| CDT | | | | Cat. | Object Class Qual. | Object Class | Property | Rep./ Ass. | Type | Type Name | Card. |
|---|---|---|---|---|---|---|---|---|---|---|---|
| Revision-Quantity-TimeSeries | | | | | Revision Quantity | Time Series | | Details | | | |
| | Item | | | E | Revision Quantity | Time Series | Item | Details | | | 1..n |
| | | Validity-Period | | E | Revision Quantity | Time Series | Validity-Period | Details | GDT | DateTime-Period | 1 |
| | | | Start-Date-Time | E | Validity Period | Time Series | Validity-Peridiod-Start | Date Time | CDT | DateTime | 1 |
| | | | End-Date-Time | E | Validity Period | Time Series | Validity-Peridiod-End | Date Time | CDT | DateTime | 1 |
| | | Quan tity | | E | Revision Quantity | Time Series | Quantity | Quan-tity | CDT | Quantity | 1 |
| | | Fixed Indi-cator | | E | Revision Quantity | Time Series | FixedIndi-cator | Indica-tor | GDT | FixedIn-dicator | 0..1 |
| | | Adjust-ment-Reason-Code | | E | Revision Quantity | Time Series | Adjust-ment-Reason | Code | GDT | Adjust-ment-Reason-Code | 0..1 |
| | | Note | | E | Revision Quantity | Time Series | Note | Text | GDT | Note | 0..1 |

RevisionQuantityTimeSeriesItem can be an item in a time series and can be repeated as often as is appropriate.

ValidityPeriod may describe the validity period of the time series item. Quantity may describe the quantity connected with the time series item. FixedIndicator may indicate whether the corresponding item is blocked for changes or not. AdjustmentReasonCode may describe the reason for a change to the item, if there is one.

RevisionQuantityTimeSeries can be used for the revision of a QuantityTimeSeries or of a RevisionQuantityTimeSeries itself. In an interface, the data type can have various specifications, depending on the context category used, e.g., "Sales," to describe sales quantities; "Consumption," to describe consumption quantities, etc.

RoomID

A RoomID is an identifier of a room within a building or complex. An example of GDT RoomID is:

<RoomID>K2.01</RoomID>

In certain implementations, GDT RoomID may have the following structure:

| GDT | Object Class | Property | Represen-tation/As-sociation | Type | Type Name | Len. | Re-marks |
|---|---|---|---|---|---|---|---|
| RoomID | Room | Identifi-cation | Identifier | CDT | Iden-tifier | 1..10 | re-stricted |

There can be a value list for the RoomID within a building. The building can be known from the context. In certain implementations, RoomID can be used in addresses.

RoundingRuleCode

A GDT RoundingRuleCode is a coded representation for rounding rule. An example of GDT RoundingRuleCode is:

<RoundingRuleCode>1</RoundingRuleCode>

In certain implementations, GDT RoundingRuleCode may have the following structure:

| GDT | Object Class | Rep./ Ass. | Type | Type Name | Len. |
|---|---|---|---|---|---|
| RoundingRuleCode | Rounding Rule | Code | CDT | Code | 1 |

A fixed code list can be assigned to the RoundingRuleCode. The attributes may be assigned the following values: listID="10027" and listAgencyID="310."

A Rounding rule specifies the kind of rounding required for the approximation of quantity values. An example may be rounding an interval: 0.1 integral multiples: 12.1; 12.2; 12.3; 12.4: etc.

The data type RoundingRuleCode may use the following codes: 1 (i.e., up), 2 (i.e., down), 3 (i.e., round-half-up/commercial), 4 (i.e., round-half-down), 5 (i.e., round-half-even), 6 (i.e., ceiling), 7 (i.e., floor).

SalesCycleCode:

The SalesCycleCode of a product or a service starts with the recognition of an opportunity, that is with a potential sales opportunity, and ends with a customer's order or cancellation. The sales cycle for an opportunity can be made up of various phases, for example, project identification, qualification, quote, and so on. The duration of a sales cycle can be determined by the start and expected end date of an opportunity. An example of GDT SalesCycleCode is:

<SalesCycleCode listAgencyID=310>2</SalesCycleCode>

In certain implementations, GDT SalesCycleCode may have the following structure:

| GDT | | Cat. | Object Class | Property | Represen-tation/Association | Type | Type Name | Len. | Card. | Remarks |
|---|---|---|---|---|---|---|---|---|---|---|
| Sales-Cycle-Code | | | Sales Cycle | | Code | CDT | Code | 1..5 | | |
| | listID | A | Code List | Identification | Identifier | xsd | token | | 0..1 | At least document |
| | listAgencyID | A | Code List Agency | Identification | Identifier | xsd | token | | 0..1 | At least document |
| | listVersionID | A | Code List | Version | Identifier | xsd | token | | 0..1 | At least document |
| | listAgency-SchemeID | A | Code List Agency | Scheme | Identifier | xsd | token | | 0..1 | |
| | listAgency-Scheme-AgencyID | A | Code List Agency | Scheme Agency | Identifier | xsd | token | | 0..1 | |

Several code lists can be permitted for the SalesCycleCode.

The attributes may be assigned the following values: listID may be an ID of the respective code list, listAgencyID may be 310, listID may be an ID of the respective code list. ListAgencyID may be an ID of the administering organization of the code list, listVersionID may be a Version of the respective code list, listAgencySchemeID may be an identification of the scheme, according to which the organization that is listed in the listAgencyID has been identified, and listAgencySchemeAgencyID may be an identification of the administering organization, (for example, DUNS, EAN, SWIFT), that is responsible for the identification of the organization that is listed in the listAgencyID.

The GDT can be used for modeling business objects. It may define its own view of a sales process, and, for this reason, may not be used in an electronic message exchange with external parties.

The GDT can be used in Presales in order to assign an opportunity to the sales cycle. The individual phases of the cycle can be determined depending on the sales cycle.

The data type GDT SalesCycleCode may use the following codes: 1 (i.e., customer care), 2 (i.e., newbusiness).

SalesCyclePhaseCode

The coded representation of a sales cycle phase. A sales cycle phase is a section of the sales cycle in which specific activities are carried out, for example, preselection, initial contact, presentation, drawing up a quotation. An example of GDT SalesCyclePhaseCode is:

<SalesCyclePhaseCode listAgencyID=310>1</SalesCyclePhaseCode>

In certain implementations, GDT SalesCyclePhaseCode may have the following structure:

| GDT | | Cat. | Object Class | Property | Represen-tation/Association | Type | Type Name | Len. | Card. | Re-marks |
|---|---|---|---|---|---|---|---|---|---|---|
| SalesCycle-PhaseCode | | | Sales Cycle | Phase | Code | CDT | Code | 1..3 | | |
| | listID | A | Code List | Identification | Identifier | xsd | Token | | 0..1 | Record at least |
| | listAgencyID | A | Code List Agency | Identification | Identifier | xsd | Token | | 0..1 | Record at least |
| | listVersionID | A | Code List | Version | Identifier | xsd | Token | | 0..1 | Record at least |
| | listAgency-SchemeID | A | Code List Agency | Scheme | Identifier | xsd | Token | | 0..1 | |
| | listAgency-Scheme-AgencyID | A | Code List Agency | Scheme Agency | Identifier | xsd | Token | | 0..1 | |

Several code lists can be permitted for the SalesCyclePhaseCode. The attributes may be assigned the following values: listID may be an ID of corresponding code list, listAgencyID may be 310, listID may be a version of corresponding code list, listAgencyID may be an ID of the organization managing the code list, listAgencySchemeID may be a scheme ID used to identify the organization specified in the listAgencyID, listAgencySchemeAgencyID may be an ID of the managing organization (e.g., DUNS, EAN, SWIFT that is responsible for identifying the organization specified in the listAgencyID).

The SalesCyclePhaseCode can be used to model business objects. It may define a separate view of a sales process, and therefore may not be used in electronic message exchange with external parties.

In the configuration, phases can be assigned to one or more sales cycles. In other words, the validity of a phase can only be checked together with the sales cycle.

The SalesCyclePhaseCode can be used in Presales to describe the phases in a sales cycle used in a business transaction. Examples of the possible semantics of customer-specific code may be Business Alignment (e.g., coordination of strategy together with the quotation partners) and Competitor analysis (e.g., determination of the strengths and weaknesses of competitor products).

The data type GDT SalesCyclePhaseCode may use the following codes: 1 (i.e., Project identification), 2 (i.e., Qualification), 3 (i.e., Value selling), 4 (i.e., Quotation), 5 (i.e., Decision).

SalesCyclePhaseStepCode

The SalesCyclePhaseStepCode of a product or service begins with the recognition of an opportunity, that begins with the possible sales opportunity, and ends with an order or rejection by the customer. The sales cycle of an opportunity can be made up of different phases, for example, project identification, qualification, quote, and so on, and each phase is made up of different steps. A step can e a task that should be carried out in a sales cycle phase. An example of GDT SalesCyclePhaseStepCode is:

<SalesCyclePhaseStepCodelistAgencyID=310>1</SalesCyclePhaseStepCode>

In certain implementations, GDT SalesCyclePhaseCode may have the following structure:

| GDT | | Cat. | Object Class | Property | Representation/Association | Type | Type Name | Len. | Card. | Remarks |
|---|---|---|---|---|---|---|---|---|---|---|
| SalesCyclePhaseStepCode | | | Sales Cycle Phase | Step | Code | CDT | Code | 1..3 | | Restricted |
| | listID | A | Code List | Identification | Identifier | xsd | token | | 0..1 | |
| | listAgencyID | A | Code List Agency | Identification | Identifier | xsd | token | | 0..1 | |
| | listVersionID | A | Code List | Version | Identifier | xsd | token | | 0..1 | |
| | listAgencySchemeID | A | Code List Agency | Scheme | Identifier | xsd | token | | 0..1 | |
| | listAgencySchemeAgencyID | A | Code List Agency | Scheme Agency | Identifier | xsd | token | | 0..1 | |

The attributes may be assigned the following values: listID may be an ID of the particular code list: 10013. ListAgencyID=310. ListVersionID—if a user creates his code list during configuration, list version ID is the version of particular code list assigned and managed by the code user. ListAgencySchemeID—If a user of this code creates his code list during configuration, list agency scheme ID is the ID of the scheme if the listAgencyID does not come from DE 3055. ListAgencySchemeAgencyID—If a user of this code creates his code list during configuration, list agency scheme agency Id is the ID of the organization from DE 3055 that manages the listAgencySchemeID scheme.

The GDT SalesCyclePhaseStepCode can be used in Presales in order to describe individual steps within a sales cycle phase. Examples of customer-specific code semantics can include, Retrieve Advertised Biddings (e.g., this step is used to determine public biddings of a customer prospect).

The data type GDT SalesCyclePhaseStepCode may use the following codes: 1 (i.e., gather customer information), 2 (i.e., identify entry point), 3 (i.e., obtain and prepare visit), 4 (i.e., initial needs analysis), 5 (i.e., clarify feasibility), 6 (i.e., identify customer's time schedule), 7 (i.e., understand decision making process), 8 (i.e., define selling team), 9 (make go/no-go decision), 10 (i.e., define strategy and action plan), 11 (i.e., align selling team), 12 (i.e., establish relationship with all influential members), 13 (i.e., identify individual goals and decision criteria).

SalesPriceListID

SalesPriceListID is an identifier for a SalesPriceList. An example of GDT SalesPriceListID is:

<SalesPriceListID>4711</SalesPriceListID>

In certain implementations, GDT SalesPriceListID may have the following structure:

| GDT | Object Class | Property | Representation/Association | Type | Type Name | Len. | Remarks |
|---|---|---|---|---|---|---|---|
| SalesPriceListID | Sales Price List | Identification | Identifier | CDT | Identifier | 1..30 | Restricted |

SalesPriceSpecificationSetTypeCode

A GDT SalesPriceListTypeCode is the coded representation of the type of a SalesPriceList. An example of GDT SalesPriceSpecificationSetTypeCode is:

<SalesPriceListTypeCode>1</SalesPriceListTypeCode>

In certain implementations, GDT SalesPriceListTypeCode may have the following structure:

| GDT | Object Class | Property | Representation/Association | Type | Type Name | Len. | Remarks |
|---|---|---|---|---|---|---|---|
| SalesPriceListTypeCode | Sales Price List | Type | Code | CDT | Code | 1..4 | Restricted |

The data type GDT SalesPriceSpecificationSetTypeCode may assign one static code list to the code. The attributes may be assigned the following values: listID="10129," listAgencyID="310," and listIVersionID can be the version of the respective code list, which can be assigned and managed.

The PriceSpecification contained in a SalesPriceList may match in type (GDT PriceSpecificationElementTypeCode) to the type of the list (GDT SalesPriceListTypeCode). Combinations that are permitted can be defined in the configuration.

The SalesPriceListTypeCode can be used, for example, within maintenance of combinations of sales price specifications. The data type GDT SalesPriceListTypeCode may use the following codes: 1 (i.e., price list), 2 (i.e., discount list).

SalutationText

A GDT SalutationText is the courteous greeting on meeting another person. With this greeting the person offering the greeting may demonstrate his view of the relationship with the greeted person. The salutations may depend on culture, time and fashion. The salutations may represent personal or non-personal (e.g., phone call, letter, telegram) contact. An example of GDT SalutationText is:

<SalesPriceListTypeCode>1</SalesPriceListTypeCode>

In certain implementations, GDT SalutationText may have the following structure:

| GDT | | Cat. | Property | Rep./ Ass. | Type | Type Name | Len. | Card. | Remarks |
|---|---|---|---|---|---|---|---|---|---|
| SalutationText | | | Salutation | Text | GDT | Text | 0..50 | 1 | Restricted |
| | LanguageCode | A | Language | Code | xsd | Language | 2..9 | 0..1 | Optional |

SalutationText can be used to store, for example, an individual salutation that is used instead of a generated salutation, if required.

SampleDrawingProcedureID

A GDT SampleDrawingProcedureID defines how samples are to be taken. It can contain data for the sample-drawing frequency, sample size, and sample quantity. An example of GDT SampleDrawingProcedureID is:

<SampleDrawingProcedureID>123456789012345</SampleDrawingProcedureID>

In certain implementations, GDT SampleDrawingProcedureID may use the following structure:

| GDT | Object Class | Property | Represen-tation/Association | Type | Type Name | Len. |
|---|---|---|---|---|---|---|
| Sample-Drawing-ProcedureID | Sample Drawing Procedure | Identification | Identifier | CDT | Identifier | 1..15 |

A SampleDrawingProcedureID can be used to identify a sample-drawing procedure in the system, for example, in the context of a material inspection.

SampleDrawingTypeCode

The GDT SampleDrawingTypeCode defines how samples can be drawn. They can be drawn based on a time interval or quantity interval, depending on the container used, or based on customer-specific rules. An example of GDT SampleDrawingTypeCode is:

<SampleDrawingType>2</SampleDrawingTypeCode>

In certain implementations, GDT SampleDrawingTypeCode may use the following structure:

| GDT | Object Class | Property | Represen-tation/Association | Type | Type Name | Len. | Remarks |
|---|---|---|---|---|---|---|---|
| Sample-Drawing-TypeCode | Sample-Drawing | Type | Code | CDT | Code | 1 | Restricted |

The data type GDT SampleDrawingTypeCode may assign a code list. The attributes may be assigned the following values: listID="10111," listAgencyID="310," and listVersionID can be the version of the relevant code list.

A sample-drawing type can be used to define whether samples are taken from a material based on time (for example, every two hours), based on quantity (for example, every 3rd unit), based on the container (for example, every tank of a tanker), or based on customer-specific rules.

The data type GDT SampleDrawingTypeCode may use the following codes: 1 (i.e., time), 2 (i.e., quantity), 3 (i.e., container), 4 (i.e., individual).

SamplingSchemeCode

A GDT SamplingSchemeCode is a collection of sampling plans. The sampling plan may define the sample size and the acceptance and rejection numbers. In doing so, it takes the total quantity to be inspected, the inspection severity (e.g., InspectionSeverityCode), and the Acceptable Quality Level (AQL) into consideration. The inspection level (e.g., InspectionLevelCode) can also be taken into consideration for sampling inspections with sampling schemes according to DIN ISO 2859. An example of GDT SamplingSchemeCode is:

<SamplingSchemeCode>S_PLAN01__2859-1</SamplingSchemeCode>

In certain implementations, GDT SamplingSchemeCode may have the following structure:

| GDT | | Cat. | Object Class | Property | Represen-tation/Association | Type | Type Name | Len. | Card. | Remarks |
|---|---|---|---|---|---|---|---|---|---|---|
| Sampling-SchemeCode | | | Sampling Scheme | | Code | CDT | Code | 1..15 | | Restricted |
| | listID | A | Code List | Identification | Identifier | xsd | token | | 0..1 | |
| | listAgencyID | A | Code List Agency | Identification | Identifier | xsd | token | | 0..1 | |
| | listVersionID | A | Code List | Version | Identifier | xsd | token | | 0..1 | |
| | listAgency-SchemeID | A | Code List Agency | Scheme | Identifier | xsd | token | | 0..1 | |
| | listAgency-SchemeAgencyID | A | Code List Agency | Scheme Agency | Identifier | xsd | token | | 0..1 | |

A customer-specific code list can be assigned to the SamplingSchemeCode. A customer may define the codes in the code list.

The attributes may be assigned the following values: listID may be an ID of the particular code list (e.g., 10165), listAgencyID may be an ID of the customer (e.g., ID from DE 3055, if listed there), listVersionID may be a version of the particular code list which can be assigned and managed by the customer, listAgencySchemeID may be an ID of the scheme if the listAgencyID does not come from DE3055, listAgencySchemeAgencyID may be an ID of the organization from DE 3055 that manages the listAgencySchemeID scheme.

For a sampling inspection using a sampling scheme, SamplingSchemeCode may contain the sampling scheme that is to be used.

SoftwareChangeOptionalUpdateComponentTypeCode

A SoftwareChangeOptionalUpdateComponentTypeCode is a coded representation of the type of Optional Component of a Software Change. An OptionalUpdateComponent is an optional part of the software change which can be chosen to be included in the maintenance package. An OptionalUpdateComponent can for example be language or ISV specific software updates. A Software Change is the notification on a recommended maintenance package (patch, update or continuous change package) for a dedicated system. An example of GDT SoftwareChangeOptionalUpdateComponentTypeCode is:

<SoftwareChangeOptionalUpdateComponentTypeCode>1</SoftwareChangeOptionalUpdateComponentTypeCode>

In certain implementations, GDT SoftwareChangeOptionalComponentTypeCode may use the following structure:

| GDT | Object Class | Property | Representation/ Association | Type | Type Name | Len. | Remarks |
|---|---|---|---|---|---|---|---|
| SoftwareChangeOptional-UpdateComponent-TypeCode | Software Change | Optional Update-Component-Type | Code | CDT | Code | 1..2 | restricted |

The data type GDT SoftwareChangeOptionalUpdateComponentTypeCode may assign one static code list to the code. The attributes may be assigned the following values: listID="10489" and listAgencyID="310."

The Software Change Optional Update Component Type may indicate a type of an optional part of the software change which can be chosen to be included in the maintenance package. An OptionalUpdateComponent can be language or ISV specific software updates.

The data type GDT SoftwareChangeOptionalComponentTypeCode may use the following codes: 1 (i.e., ISV update), 2 (i.e., language update), 3 (i.e., Note).

ScaleAxisBaseCode

A GDT ScaleAxisBaseCode is the coded representation of the scale base type for a scale axis. An example of ScaleAxisBaseCode is:

<BaseCode>3</BaseCode>

In the following implementations, GDT ScaleAxisBaseCode may have the following structure:

| GDT | Object Class | Prop-erty | Representation/ Association | Type | Type Name | Len. | Remarks |
|---|---|---|---|---|---|---|---|
| Scale-Axis-Base-Code | Scale Axis | Base | Code | CDT | Code | 1..3 | restricted |

A fixed code list can be assigned to the code. The attributes may be assigned the following valuates: listID="10373," listAgencyID="310," listVersionID=version of the particular code list.

The data type GDT ScaleAxisBaseCode may use the following codes: 1 (i.e., quantity), 2 (i.e., shipping quantity), 3 (i.e., net value), 4 (i.e., gross weight), 5 (i.e., net weight), 6 (i.e., volume), 7 (i.e., number of points), 8 (i.e., distance), 9 (i.e., time stamp), 10 (i.e., year), 11 (i.e., month), 12 (i.e., week) 13 (i.e., day).

ScaleAxisStep

A dimension of the definition area of a scale is known as a ScaleAxisStep. It may be defined as a scale dimension, that is, it can be defined via the completeness of the specified (discrete) scale dimension values as steps. The combination of one step of each scale axis makes up the scale step. An example of ScaleAxisStep is:

```
<ScaleAxisStep>
  <ScaleAxisBaseCode>1</ScaleAxisBaseCode>
  <IntervalBoundaryTypeCode>1</IntervalBoundary-
    TypeCode>
  <Quantity unitCode="C62">10</Quantity>
</ScaleAxisStep>
```

In the above example, ScaleAxisBaseCode of "1" represents a quantity according to GDT ScaleAxisBaseCode (described above). IntervalBoundaryTypeCode of "1" represents the lower limit of an interval (e.g., from the scale dimension value under consideration to the next highest scale dimension value, but excluding the next highest scale dimension value) according to the GDT ScaleAxisStepIntervalBoundaryTypeCode (described below). In certain implementations, GDT ScaleAxisStep may have the following structure:

| GDT | | Cat. | Object Class | Property | Representation/ Association | Type | Type Name | Len. | Card. |
|---|---|---|---|---|---|---|---|---|---|
| ScaleAxisStep | | | Scale Axis Step | | Details | | | | |
| | ScaleAxisBase-Code | E | Scale Axis Step | ScaleAxis-Base | Code | GDT | ScaleAxis-BaseCode | | 1 |
| | IntervalBound-aryTypeCode | E | Scale Axis Step | Interval Boundary Type | Code | GDT | ScaleAxis-StepInter-valBound-aryType-Code | | 1 |
| | Amount | E | Scale Axis Step | Amount | Amount | CDT | Amount | | 0..1 |
| | Quantity | E | Scale Axis Step | Quantity | Quantity | CDT | Quantity | | 0..1 |
| | DecimalValue | E | Scale Axis Step | Decimal Value | Details | GDT | Decimal-Value | | 0..1 |
| | IntegerValue | E | Scale Axis Step | Integer Value | Details | GDT | IntegerValue | | 0..1 |

ScaleAxisStep may have the following elements: ScaleAxisBaseCode, IntervalBoundaryTypeCode, Amount, Quantity, Decimal Value, and Integer Value.

ScaleAxisStep can contain one of the Amount, Quantity, DecimalValue or IntegerValue elements. The element appropriate for the scale dimension value can be used. In certain implementations, ScaleAxisBaseCode can correspond to the same scale axis for all axis steps.

ScaleAxisStepDeterminationBasis

ScaleAxisStepDeterminationBasis is the basis for determining a scale axis step. The basis for determining a scale axis step (e.g., see GDT ScaleAxisStep (described above)) may consist of a quantity, an amount, or a value of the scale base type with which the scale axis is defined. An example of ScaleAxisStepDeterminationBasis is:

```
<ScaleAxisStepDeterminationBasis>
  <ScaleAxisBaseCode>1</ScaleAxisBaseCode>
  <Quantity unitCode="C62">100</Quantity>
</ScaleAxisStepDeterminationBasis>
```

In certain implementations, GDT ScaleAxisStepDeterminationBasis may have the following structure:

| GDT | | Cat. | Object Class | Property | Representation/ Association | Type | Type Name | Len. | Card. |
|---|---|---|---|---|---|---|---|---|---|
| ScaleAxisStep-Determination-Basis | | | Scale Axis Step Determination Basis | | Details | | | | |
| | ScaleAxis-BaseCode | E | Scale Axis Step Determination Basis | Scale Axis Base | Code | GDT | ScaleAxis-BaseCode | | 1 |
| | Quantity | E | Scale Axis Step Determination Basis | Quantity | Quantity | CDT | Quantity | | 0..1 |
| | Amount | E | Scale Axis Step Determination Basis | Amount | Amount | CDT | Amount | | 0..1 |
| | Decimal-Value | E | Scale Axis Step Determination Basis | Decimal Value | Details | GDT | Decimal-Value | | 0..1 |
| | IntegerValue | E | Scale Axis Step Determination Basis | Integer Value | Details | GDT | Integer-Value | | 0..1 |

GDT ScaleAxisStepDeterminationBasis may have the following elements: ScaleAxisBaseCode, Quantity, Amount, Decimal Value, and Integer Value.

One of the elements Quantity, Amount, DecimalValue or IntegerValue can be provided. The element that is appropriate for the scale axis can be used.

ScaleAxisStepIntervalBoundaryTypeCode

A GDT ScaleAxisStepIntervalBoundaryTypeCode is the coded representation of the typing of an interval boundary that is defined for a scale axis step. Scale axis steps can be represented by discrete scale dimension values (see GDT: ScaleAxisStep). An example of GDT ScaleAxisStepIntervalBoundaryTypeCode is:

```
<ScaleAxisStepIntervalBoundaryTypeCode>2</ScaleAxisStepIntervalBoundaryTypeCode>
```

In certain implementations, ScaleAxisStepIntervalBoundaryTypeCode may have the following structure:

| GDT | Object Class | Property | Representation/ Association | Type | Type Name | Len. | Remarks |
|---|---|---|---|---|---|---|---|
| ScaleAxisStepInterval-BoundaryTypeCode | Scale Axis Step | Interval Boundary Type | Code | CDT | Code | 1 | Restricted |

An element of the ScaleAxisStepIntervalBoundaryTypeCode type can have the following characteristic values: 1 (i.e., represents the "lover limit of an interval"), 2 (i.e., represents the "upper limit of an interval").

In certain implementations, the scale dimension values of a scale dimension can be linear. ScaleAxisStepIntervalBoundaryCode can be described within the context of pricing scales as a "scale dimension type," although additional constraints may apply so that scale dimension values have the same ScaleAxisStepIntervalBoundaryTypeCode.

It can be used in this context as follows: A scale dimension can be used to determine the "domain" of a (one-dimensional) pricing scale. In this context, the values of scale dimensions can be described as scale steps. The pricing scale may define a scale rate (for example, net price, discount, and so on) for each scale step. Consequently, a pricing scale may comprise the scale levels as "input values" and the scale rates defined for the steps as "output values." The "output values" of a pricing scale can be accessed using the scale step(s) to determine conditions in the context of pricing, depending on values, such as the order quantity.

A scale level and scale dimension type can determine for which interval the scale rate applies: From the current scale step, or To the current scale step.

In the first case, the pricing scale can be known as the "from" pricing scale, in the second case, it is known as the "to" pricing scale. From pricing scales can have a minimal pricing scale. To pricing scales can have a maximum pricing scale.

The scale steps of a pricing scale can be defined in terms of a pricing scale base type. The scale steps for the scale base may include: types, quantity, gross value, and number are scale quantity with scale quantity unit, scale rate with scale currency and scale quantity without unit respectively.

The scale steps can be divided into the scale dimensions for a pricing scale (or the dimension of the pricing scale represented by it). The scale dimension type can be valid for all scale steps of a pricing scale, that is the different scale steps of a (one-dimensional) pricing scale can be interpreted in the same way as interval boundaries. For example, the scale steps of a pricing scale can include 10 pieces, 100 pieces, 1,000 pieces, and 10,000 pieces.

The scale steps of a pricing scale may imply disconnected and consuming intervals. For every characteristic value of the input value, one scale step (and therefore the interval implied) can be relevant for determining the scale rate when using scale dimension types "lower boundary" and "upper boundary."

For example, at the 10 piece scale step, the pieces may cost 10 e per piece. At the 100 piece scale step, the pieces may cost 9 e per piece. At the 1,000 and 10,000 scale steps, the pieces may cost 8 e per piece. The following is an example of a one-dimensional pricing scale of scale type "2" (upper boundary) with scale base type quantity.

When determining a pricing condition for an order quantity of 150 pieces, for example, the third scale level can be used and the price (150 PC×8 €/1 pc)=1200 e is determined base on the scale type "upper boundary."

ScheduleActivityEndDateTimeConstraintTypeCode

A GDT ScheduleActivityEndDateTimeConstraintTypeCode is a coded representation of the constraint for the end date/time of an activity. An activity is a task in a network or an operation in a bill of operations. It can have a defined start and a defined end. Types can be allocated according to the way in which a reference date/time restricts the end date/time. An example of GDT ScheduleActivityEndDateTimeConstraintTypeCode is:

<ScheduleActivityEndDateTimeConstraintTypeCode>1</ScheduleActivityEndDateTimeConstraintTypeCode>

In certain implementations, GDT ScheduleActivityEndDateTimeConstraintTypeCode may have the following structure:

| GDT | Object Class | Property | Representation/ Association | Type | Type Name | Len. | Remarks |
|---|---|---|---|---|---|---|---|
| ScheduleActivity-EndDateTime-ConstraintTypeCode | Schedule Activity | End Date Time Constraint Type | Code | CDT | Code | 1 | Restricted |

The value range of ScheduleActivityEndDateTimeConstraintTypeCode can be a code list with fixed predefined values.

The attributes of the GDT code can be filled with the following values: listID="10286," listAgencyID=310, and listVersionID may be a version of the relevant code list.

The data type GDT Schedule ActivityEndDateTimeConstraintTypeCode may use the following codes: 1 (i.e., latest possible), 2 (i.e., must end on/at), 3 (i.e., not earlier than), 4 (i.e., not later than).

ScheduleActivityStartDateTimeConstraintTypeCode

A GDT ScheduleActivityStartDateTimeConstraintTypeCode is a coded representation of the type of constraint for the start date/time of an activity. An activity is a task in a network or an operation in a bill of operations. It can have a defined start and a defined end. Types can be allocated according to the way in which a reference date/time restricts the start date/time. An example of GDT ScheduleActivityStartDateTimeConstraintTypeCode is:

<ScheduleActivityStartDateTimeConstraintTypeCode>1</ScheduleActivityStartDateTimeConstraintTypeCode>

In certain implementations, ScheduleActivityStartDateTimeConstraintTypeCode may have the following structure:

| GDT | Object Class | Property | Representation/ Association | Type | Type Name | Len. | Remarks |
|---|---|---|---|---|---|---|---|
| ScheduleActivityStart-DateTimeConstraintType-Code | Schedule Activity | Start Date Time Constraint Type | Code | CDT | Code | 1 | Restricted |

The value range of ScheduleActivityStartDateTimeConstraintTypeCode can be a code list with fixed predefined values.

The attributes of the CDT code can be filled implicitly with the following values: listID "10285," listAgencyID=310, listVersionID may be a version of the relevant code list.

The data type GDT ScheduleActivityStartDateTimeConstraintTypeCode may use the following codes: 1 (i.e., earliest possible), 2 (i.e., must start on/at), 3 (i.e., not earlier than), 4 (i.e., not later than).

ScheduleLineCommitmentCode

A GDT ScheduleLineCommitmentCode is a coded representation that describes the planning-related meaning of the schedule line information for a purchase order, generally a delivery schedule, and thus may determine the (legal) binding nature for the ordered quantity and specified delivery dates for a material/product. An example of GDT ScheduleLineCommitmentCode is:

<ScheduleLineCommitmentCode>AE</ScheduleLineCommitmentCode>

In certain implementations, GDT ScheduleLineCommitmentCode may have the following structure:

| GDT | Object Class | Property | Representation/ Association | Type | Type Name | Len. | Remarks |
|---|---|---|---|---|---|---|---|
| ScheduleLine-CommitmentCode | Schedule Line | Commitment | Code | CDT | Code | 1..3 | restricted |

The ScheduleLineCommitmentCode can be a codelist that can be given attributes including the following: listID="10038," listAgencyID="310," listVersionID="tbd." It may have the following values that are supported by the application in the framework of "scheduling-agreement-based release order": Fixed dates and quantities (e.g., indicates that the schedule line information regarding the specified product quantities and dates is fixed), Production and material go-ahead (e.g., authorizes the vendor to start manufacturing the required products), Material go-ahead (e.g., authorizes the vendor to order required material for the products to be delivered), Forecast/preview (e.g., non-binding forecast of future purchase orders that currently depend on planned requirements), Shortfall quantity/backlog (e.g., product quantity that has already been ordered but did not arrive by the planned delivery date and therefore may be delivered subsequently), Immediate requirement (e.g., immediately required product quantity that may be included immediately in the next delivery).

The ScheduleLineCommitmentCode may refer to the representation UN/EDIFACT 4017: Delivery plan commitment level code. The ScheduleLineCommitmentCode can be used to inform a vendor about the binding nature and the exact meaning of the schedule line information of a release order/forecast delivery schedule. It can be used in the automotive industry.

ScoreCardID

A GDT ScoreCardID is a procedure for assessing a party or subject using different characteristics. An example of GDT ScoreCardID is:

<ScoreCardID>A</ScoreCardID>

In certain implementations, GDT ScoreCardID may have the following structure:

| GDT | Object Class | Property | Representation/Association | Type | Type Name | Len. | Remarks |
|---|---|---|---|---|---|---|---|
| ScoreCardID | Score Card | Identification | Identifier | CDT | Identifier | 1..20 | restricted |

Scorecards can be internal to a company and confidential. The company may specify the scorecard assigns and ID. ScoreCardID can exist in the context of the company that may specify the scorecard. Scorecards can be used by credit agencies to rate companies. In this case, the credit agency may assign the IDs; ScoreCardID can also exist in the context of a credit agency. Another possible use is by the company for internal identification of a scorecard that can be created as part of the "Balanced Scorecard" concept for determining business performance.

ScrapReasonCode

A GDT ScrapReasonCode is the coded representation of the reason why production scrap occurred. Production scrap may mean a defective subset of the production quantity that cannot be used to produce the planned finished product due to errors that occurred during production. An example of GDT ScrapReasonCode is:

<ScrapReasonCode>1</ScrapReasonCode>

In certain implementations, GDT ScrapReasonCode may have the following structure:

| GDT | | Cat. | Object Class | Property | Representation/Association | Type | Type Name | Len. | Card. | Remarks |
|---|---|---|---|---|---|---|---|---|---|---|
| ScrapReasonCode | | | Scrap | Reason | Code | CDT | Code | 1..2 | | Restricted |
| | listID | A | Code List | Identification | Identifier | xsd | token | | 0..1 | |
| | listAgencyID | A | Code List Agency | Identification | Identifier | xsd | token | | 0..1 | |
| | listVersionID | A | Code List | Version | Identifier | xsd | token | | 0..1 | |
| | listAgency-SchemeID | A | Code List Agency | Scheme | Identifier | xsd | token | | 0..1 | |
| | listAgency-SchemeAgencyID | A | Code List Agency | Scheme Agency | Identifier | xsd | token | | 0..1 | |

An extendable code list can be assigned to the ScrapReasonCode. Customers can change this code list.

The attributes may be assigned the following values: listID—ID of the particular list: 10240, listAgencyID may be "310" or may be an ID of the code user (ID from DE 3055, if listed there). ListVersionID—If the code list remains unchanged, list version ID is the version of the particular code list assigned and managed; if a user creates his code list during configuration, list version ID is the version of particular code list assigned and managed by the code user. ListAgencySchemeID—If a user of this code creates his code list during configuration, list agency scheme ID is the ID of the scheme if the listAgencyID does not come from DE 3055. ListAgencySchemeAgencyID—If a user of this code creates his code list during configuration, list agency scheme agency ID is the ID of the organization from DE 3055 that manages the listAgencySchemeID scheme.

Examples of the possible semantics of the customer-specific codes are: Calibration issue (e.g., scrap occurred due to wrong calibration of a resource), Bad quality of input material (e.g., scrap occurred due to insufficient quality of an input material).

The data type GDT, ScrapReasonCode may use the following codes: 1 (i.e., resource defective), 2 (i.e., tool defective), 3 (i.e., missing material).

SearchMethodCode

A SearchMethodCode is a coded representation of the method of search to be used for searching. An example of GDT SearchMethodCode is:

<SearchMethodCode>1</SearchMethodCode>

In certain implementations, GDT SearchMethodCode may have the following structure:

| GDT | Object Class | Representation/Association | Type | Type Name | Len. | Remarks |
|---|---|---|---|---|---|---|
| SearchMethodCode | Search Method | Code | CDT | Code | 1 | restricted |

A code list can be assigned to the SearchMethodCode. The attributes may be assigned values as follows: listID="10292" and listAgencyID="310." The data type GDT SearchMethod- Code may use the following codes: 1 (i.e., exact search), 2 (i.e., fuzzy search), 3 (i.e., linguistic).

SearchText

A GDT SearchText is a text that is searched for within a particular data content. An example of GDT SearchText is:

<SearchText>Peter Müller</SearchText>

In certain implementations, GDT SearchText may have the following structure:

| GDT | Rep./Ass. Qualifier | Representation/ Association | Type | Type Name |
|---|---|---|---|---|
| SearchText | Search | Text | xsd | String |

The length of the SearchText is not limited.

The SearchText can be used to look for instances of a given business object. For example, the SearchText "Peter Müller" can be used to find all the invoices made from a company to the customer "Peter Müller." The data content in this case may consist of attributes of the invoice object and attributes of the associated customer object.

SerialID

A GDT SerialID (e.g., serial number) is an identifier for an individual item that is assigned in the context of production. The "individual item" can be the instance of a product. The identifier of a product instance can exist in the context of a product or a product category. For that reason, the SerialID might be the same for instances of different products. An example of GDT SerialID is:

<SerialID>WVWZZZ1JZYP1749179</SerialID>

In certain implementations, GDT SerialID may have the following structure:

| GDT | Property | Representation/ Association | Type | Type Name | Len. | Remarks |
|---|---|---|---|---|---|---|
| SerialID | Serial Identification | Identifier | CDT | Identifier | 1..30 | restricted |

A SerialID may be considered an alphanumeric identifier (with no distinction between uppercase and lowercase) that can be assigned to a product instance for its entire lifetime. For that reason, it may not be assigned again to another instance of the same product during the (anticipated) lifetime of the product instance.

The SerialID can be specified in connection with the related product identification ("product number" or "product category"). A SerialID can be used in addition to the product identification if individual items of the product are to be identified or may be identified.

Serial numbers can be used for industry and consumer products but also, for example, for banknotes. In contrast to the equipment or asset number, the serial number may be assigned and transmitted in the context of production.

ServiceIssueCategoryCatalogueID

A ServiceIssueCategoryCatalogueID is a structured directory of categories that describe an issue in a business process in customer service. The hierarchical structure can be used to depict dependencies between the categories. Depending on how detailed the description of the issues, additional, more specific categories can be defined underneath the main categories. The number of hierarchy levels in the structure is not limited. An example of GDT ServiceIssueCategoryCatalogueID is:

<ServiceIssueCategoryCatalogueID>

SOFTWARE_COMPONENTS</ServiceIssueCategory-CatalogueID>

In certain implementations, GDT ServiceIssueCategoryCatalogueID may have the following structure:

| GDT | Object Class | Property | Representation/ Association | Type | Type Name | Len. | Card. | Remarks |
|---|---|---|---|---|---|---|---|---|
| ServiceIssueCategory-CatalogueID | Service Issue Category Catalogue | Identification | Identifier | GDT | Identifier | 1..25 | | Restricted |

The ServiceIssueCategoryCatalogueID may not have any identifying attributes, since (multiple) identification schemes are not supported.

A catalogue of issue categories can be used in customer service to provide a collection of categories for controlling business processes and for classifying relevant business documents. These business documents can be service transactions (service requests, service orders, service confirmations).

ServiceIssueCategoryCatalogueTypeCode

A GDT ServiceIssueCategoryCatalogueTypeCode is the coded representation for the type of issue category catalog that provides the semantic relationship for issue categories that are contained in the catalog. A service category catalogue can be a structured directory of issue categories that describe business cases in Customer Service from an objective or a subjective point of view. An example of GDT ServiceIssue-CategoryCatalogueTypeCode is:

<ServiceIssueCategoryCatalogueTypeCode>A</Service-IssueCategoryCatalogueTypeCode>

In certain implementations, GDT ServiceCategoryCatalogueTypeCode may have the following structure:

| GDT | Object Class | Property | Representation/ Association | Type | Type Name | Len. | Remarks |
|---|---|---|---|---|---|---|---|
| ServiceIssueCategoryCatalogue-TypeCode | Service Issue Category Catalogue | Type | Code | CDT | Code | 1 | Restricted |

A fixed code list can be assigned to ServiceIssueCategory-CatalogueTypeCode.

The attributes may be assigned the following values: listID="10227" and listAgencyID "310."

When using the ServiceIssueCategoryCatalogueTypeCode, a distinction can be made as to whether the semantics of the categories is hierarchically structured or structured according to attributes.

A hierarchical semantic may distinguish itself by the fact that each category in and of itself may describe a service issue. Subordinate categories may represent the context for each issue. In this way, each category may have a maximum of one higher-level category. Examples may include, Foodstuffs, Food Packaging (e.g., sturdy food packaging or non-sturdy food packaging), Food Flavor (e.g., flavorsome food or non-flavorsome food).

In the case of attributive semantics, each category may provide a characteristic of the issue without which the issue description is incomplete. The description of an issue may result from a combination of several categories. Such a combination may correspond to a path in the category hierarchy. Common characteristics of different issues can be depicted as semantically identical categories. Examples may include: Foodstuffs, Packaging (e.g., praise, complaint, and environmental-friendliness), Taste (e.g., praise, complaint and change).

An hierarchical semantics can be understood as a case of an attributive semantics. The differentiation between hierarchical semantics and attributive semantics may occur in order to be able to provide the most efficient data-technical conversion.

The data type GDT ServiceIssueCategoryCatalogueTypeCode may use the following codes: A (i.e., hierarchial), B (i.e., attributive).

ServiceIssueCategoryCatalogueUsageCode

A GDT ServiceIssueCategoryCatalogueUsageCode is the specification of an application that uses issue category catalogs in Customer Service. An example of GDT ServiceIssueCategoryCatalogueUsageCode is:

<ServiceIssueCategoryCatalogueUsageCode>
SERVICE_REQUEST</ServiceIssueCategoryCatalogueUsageCode>

In certain implementations, GDT ServiceIssueCategoryCatalogueUsageCode may have the following structure:

The data type GDT ServiceIssueCategoryCatalogueUsageCode may assign one static code list to the code. The attributes may be assigned the following values: listID may be an ID of the particular code list 10228. ListAgency ID may be "310," if a user creates his code list during configuration, list agency ID is the ID of the code user (ID from DE 3055, if listed there). ListVersionID=the version of the particular code list assigned and managed; if a user creates a code list during configuration, list version ID is the version of particular code list assigned and managed by the code user. ListAgencySchemeID=If a user of this code creates a code list during configuration, list agency scheme ID is the ID of the scheme if the listAgencyID does not come from DE 3055. ListAgencySchemeAgencyID=If a user of this code creates a code list during configuration, list agency scheme agency Id is the ID of the organization from DE 3055 that manages the listAgencySchemeID scheme.

ServiceIssueCategoryCatalogueUsageCode can be used to assign issue category catalogs to the applications. Such an assignment can be defined using the application (GDT ServiceIssueCategoryCatalogueUsageCode) or an application specific parameter that specifies the context of the application. For example, for the applications Service Request, Service Order, Service Confirmation, the application specific parameter can be the transaction type (GDT BusinessTransactionDocumentProcessingTypeCode).

The data type GDT ServiceIssueCategoryCatalogueUsageCode may use the following codes: SERVICE_REQUEST (i.e., BO Service Request), SERVICE_ORDER (i.e., BO Service Order), SERVICE_CONFIRMATION (i.e., BO Service Confirmation), SERVICE_SOLUTION (i.e., BO Customer Problem And Solution).

ServiceIssueCategoryID

A GDT ServiceIssueCategoryID is an identifier for an issue category in customer service. An issue category can be a classification of issues in a business process in customer service, according to objective or subjective criteria. An example of GDT ServiceIssueCategoryID is:

<ServiceIssueCategoryID>CRM-CIC</ServiceIssueCategoryID>

In certain implementations, GDT ServiceIssueCategoryID may have the following structure:

| GDT | | Cat. | Object Class | Property | Representation/ Association | Type | Type Name | Len. | Card. | Remarks |
|---|---|---|---|---|---|---|---|---|---|---|
| ServiceIssue-Category-Catalogue-UsageCode | | | Service Issue Category Catalogue | Usage | Code | CDT | Code | 1..40 | | Restricted |
| | listID | A | Code List | Identification | Identifier | Xsd | token | | 0..1 | |
| | list-AgencyID | A | Code List Agency | Identification | Identifier | Xsd | token | | 0..1 | |
| | list-VersionID | A | Code List | Version | Identifier | Xsd | token | | 0..1 | |
| | listAgency-SchemeID | A | Code List Agency | Scheme | Identifier | Xsd | token | | 0..1 | |
| | listAgency-Scheme-AgencyID | A | Code List Agency | Scheme Agency | Identifier | Xsd | token | | 0..1 | |

| GDT | Object Class | Property | Representation/ Association | Type | Type Name | Len. | Remarks |
|---|---|---|---|---|---|---|---|
| ServiceIssue-CategoryID | Service Issue Category | Identification | Identifier | GDT | Identifier | 1..25 | Restricted |

The data type GDT ServiceIssueCategoryID might not have any identifying attributes since (multiple) identification schemes are not supported. The ServiceIssueCategoryID can currently not be used in A2A- or B2B Messages.

Issue categories can be used, for example, for processing service requests, in order to allocate the type of request, problem, or cause. Depending on the individual categorization of the service request, solutions that are linked to the category can be proposed automatically. In addition, once again depending on the categorization, follow-up actions can be automated, for example, forwarding a service request to a single expert or a group of experts. Two other examples are checking the entitlements of a customer, for example the existence of a valid warranty or proposing a special e-mail template to answer the customer inquiry.

ServiceIssueCategoryTypeCode

A GDT ServiceIssueCategoryTypeCode is the coded representation of the type of an issue category in customer service. An issue category in customer service can be a characteristic of a specific issue that categorizes a business transaction document according to an objective or a subjective point of view. An example of GDT ServiceIssueCategoryTypeCode is:

<ServiceIssueCategoryTypeCode>1<ServiceIssue CategoryTypeCode>

In certain implementations, GDT ServiceIssueCategoryTypeCode may have the following structure:

| GDT | | Cat. | Object Class | Property | Representation/ Association | Type | Type Name | Len. | Card. | Remarks |
|---|---|---|---|---|---|---|---|---|---|---|
| ServiceIssue-CategoryType-Code | | | Service Issue Category | Type | Code | CDT | Code | 1..2 | | Restricted |
| | listID | A | Code List | Identification | Identifier | xsd | token | | 0..1 | |
| | listAgency-ID | A | Code List Agency | Identification | Identifier | xsd | token | | 0..1 | |
| | listVersion-ID | A | Code List | Version | Identifier | xsd | token | | 0..1 | |
| | listAgency-SchemeID | A | Code List Agency | Scheme | Identifier | xsd | token | | 0..1 | |
| | listAgency-Scheme-AgencyID | A | Code List Agency | Scheme Agency | Identifier | xsd | token | | 0..1 | |

The attributes may be assigned the following values: listID=ID of the particular code list 10226, listAgency ID="310," if a user creates his code list during configuration, list agency ID is the ID of the code user (ID from DE 3055, if listed there), listVersionID=the version of the particular code list assigned and managed; if a user creates his code list during configuration, list version ID is the version of particular code list assigned and managed by the code user, listAgencySchemeID=If a user of this code creates his code list during configuration, list agency scheme ID is the ID of the scheme if the listAgencyID does not come from DE 3055, listAgencySchemeAgencyID=If a user of this code creates his code list during configuration, list agency scheme agency Id is the ID of the organization from DE 3055 that manages the listAgencySchemeID scheme.

The data type GDT ServiceIssueCategoryTypeCode may use the following codes: 1 (i.e., Activity/operation), 2 (i.e., Incident).

ServiceLevelObjectiveID

A GDT ServiceLevelObjectiveID is an identifier for a service level objective. In certain implementations, the use of ServiceLevelObjectiveID may be restricted to Business Objects or A2A-Messages.

A service level objective can be a measurable objective that may specify one or more conditions for fulfilling a service. This objective can be defined temporally, quantitatively, or as a percentage. A temporal objective can be the response time, for example "First Reaction Time." An example of GDT ServiceLevelObjectiveID is:

<ServiceLevelObjectiveID>GOLD</ServiceLevelObjectiveID>

In certain implementations, GDT ServiceLevelObjectiveID may have the following structure:

| GDT | Object Class | Property | Representation/ Association | Type | Type Name | Len. | Remarks |
|---|---|---|---|---|---|---|---|
| Service-Level-ObjectiveID | Service Level Objective | Identification | Identifier | CDT | Identifier | 1..40 | restricted |

The ServiceLevelObjectiveID can be used in service management and incorporates the objectives that are defined for a specific fulfillment quality of services. Service providers can monitor their own service quality with these objectives, and service recipients can use them to check whether the services are being fulfilled as agreed.

ServiceValuationCode

The GDT ServiceValuationCode is the coded representation of a service valuation. A service can be evaluated in different ways. For example: according to qualifications (for example, master craftsman, specialist, apprentice, etc.) or according to valuation records (for example, billing records for consultants: L1-L6). An example of GDT ServiceValuationCode is:

<ServiceValuationCode>1</ServiceValuationCode>

In certain implementations, GDT ServiceValuationCode may have the following structure:

| GDT | | Cat. | Object Class | Property | Representation/ Association | Type | Type Name | Len. | Card. | Remarks |
|---|---|---|---|---|---|---|---|---|---|---|
| Service-Valuation-Code | | | Service | Valuation | Code | CDT | Code | 1..6 | | Restricted |
| | listID | A | Code List | Identification | Identifier | xsd | Token | | 0..1 | |
| | listAgency-ID | A | Code List Agency | Identification | Identifier | xsd | Token | | 0..1 | |
| | list-VersionID | A | Code List | Version | Identifier | xsd | Token | | 0..1 | |
| | listAgency-SchemeID | A | Code List Agency | Scheme | Identifier | xsd | Token | | 0..1 | |
| | listAgency-Scheme-AgencyID | A | Code List Agency | Scheme Agency | Identifier | xsd | Token | | 0..1 | |

The data type GDT ServiceIssueCategoryTypeCode may assign one static code list to the code. The attributes may be assigned the following values: listID=ID of the particular code list. ListAgency ID="310," if a user creates his code list during configuration, list agency ID is the ID of the code user (ID from DE 3055, if listed there). ListVersionID=the version of the particular code list assigned and managed; if a user creates his code list during configuration, list version ID is the version of particular code list assigned and managed by the code user. ListAgencySchemeID=If a user of this code creates his code list during configuration, list agency scheme ID is the ID of the scheme if the listAgencyID does not come from DE 3055. ListAgencySchemeAgencyID=If a user of this code creates his code list during configuration, list agency scheme agency Id is the ID of the organization from DE 3055 that manages the listAgencySchemeID scheme.

Alternative code lists may differ at configuration and/or runtime. The ServiceValuationCode can be a customer-specific code list. The ServiceValuationCode can be used for pricing, in order to calculate surcharges or discounts for the customer. The surcharges and discounts can be an absolute or a percentage value. For example, if a service with a base price of 100 Euro has to be carried out by a specialist, a surcharge of 50% can be defined for this service. In this case, a total price of 150 Euro can be charged to the customer. Two examples of this can be a master craftsman or an apprentice, the service may be carried out or has been carried out by a master craftsman/apprentice, respectively.

ServiceWorkingConditionsCode

A GDT ServiceWorkingConditionsCode is the coded representation of working conditions under which a service is carried out. A service can be carried out under the following working conditions, at certain working times (for example, at weekends, during public holidays, at night, etc.) or under difficult circumstances (for example, bonus for dirty work). An example of GDT ServiceWorkingConditionsCode is:

<ServiceWorkingConditionsCode>1</ServiceWorkingConditionsCode>

In certain implementations, GDT ServiceWorkingConditionsCode may have the following structure:

| GDT | | Cat. | Object Class | Property | Representation/ Association | Type | Type Name | Len. | Card. | Remarks |
|---|---|---|---|---|---|---|---|---|---|---|
| Service-Working-ConditionsCode | | | Service | Working Conditions | Code | CDT | Code | 1..4 | | Restricted |
| | listID | A | Code List | Identification | Identifier | xsd | token | | 0..1 | |
| | listAgency ID | A | Code List Agency | Identification | Identifier | xsd | token | | 0..1 | |
| | list-VersionID | A | Code List | Version | Identifier | xsd | token | | 0..1 | |
| | listAgency-SchemeID | A | Code List Agency | Scheme | Identifier | xsd | token | | 0..1 | |
| | listAgency-Scheme-Agency ID | A | Code List Agency | Scheme Agency | Identifier | xsd | token | | 0..1 | |

The attributes may be assigned the following values: listID=ID of the particular code list 10137. ListAgency ID=The list agency ID is the ID of the code user (ID from DE 3055, if listed there), listVersionID=The list version ID is the version of particular code list assigned and managed by the code user, listAgencySchemeID=The list agency scheme ID is the ID of the scheme if the listAgencyID does not come from DE 3055, listAgencySchemeAgencyID=The list agency scheme agency Id is the ID of the organization from DE 3055 that manages the listAgencySchemeID scheme.

Alternative code lists may differ at configuration and/or runtime. The ServiceValuationCode can be a customer-specific code list. The ServiceWorkingConditionsCode can be used for pricing, in order to calculate surcharges or discounts for the customer. The surcharges and discounts can be an absolute or a percentage value. For example, if a service with a base price of 100 Euro has to be carried out on a public holiday, a surcharge of 50% can be defined for this service. In this case, a total price of 150 Euro can be charged to the customer. Two examples would be on a weekend or Public Holiday, the service should be carried out or has already been carried out on the weekend/public holiday, respectively.

ShiftCalendarDeterminationRuleCode

A GDT ShiftCalendarDeterminationRuleCode is the coded representation of a rule based on which a shift calendar is determined. A shift calendar can contain information on machine runtimes, non-production times, and shift durations. An example of GDT ShiftCalendarDeterminationRuleCode is:

<ShiftCalendarDeterminationRuleCode>1</ShiftCalendarDeterminationRuleCode>

In certain implementations, GDT ShiftCalendarDeterminationRuleCode may have the following structure:

| GDT | Object Class | Property | Representation/ Association | Type | Type Name | Len. | Remarks |
|---|---|---|---|---|---|---|---|
| ShiftCalendar-Determination-RuleCode | Shift Calendar | Determination_ Rule | Code | CDT | Code | 1 | Restricted |

The data type GDT ShiftCalendarDeterminationRuleCode may assign one static type code list to the code. The attributes may be assigned the following values: listID="10108," listAgencyID="310" and listVersionID=Version of the relevant code list.

The GDT ShiftCalendarDeterminationRuleCode can be used in production to define how the relevant shift calendar is found.

The GDT ShiftCalendarDeterminationRuleCode may use the following codes: 1 (i.e., UseNoShiftCalendar), 2 (i.e., UseLogisticsDivisionShiftCalendar).

ShippedQuantityAccumulation

GDT ShippedQuantityAccumulation are values for cumulated shipped quantities. An example of GDT ShippedQuantityAccumulation is:

<ShippedQuantityAccumulation>

<ReferencePeriod>

<StartDateTime>2004-01-01T00:00:00Z</StartDateTime> <EndDateTime>2004-12-31T23:59:59Z</EndDateTime> </ReferencePeriod>

<Quantity unitCode="CT">10000</Quantity>

</ShippedQuantityAccumulation>

In certain implementations, GDT ShippedQuantityAccumulation may have the following structure:

| GDT | | Cat. | Object Class | Property | Representation/ Association | Type | Type Name | Len. | Card. |
|---|---|---|---|---|---|---|---|---|---|
| Shipped-Quantity-Accumulation | | | Shipped Quantity Accumulation | | Details | | | | |
| | Reference-Period | E | Shipped Quantity Accumulation | Reference Period | Details | GDT | Date-Time-Period | | 0..1 |
| | Quantity | E | Shipped Quantity Accumulation | Quantity | Quantity | CDT | Quantity | 13,6 | 1 |

For the above GDT ShippedQuantityAccumulation the following descriptions may apply: ReferencePeriod is Reference period for the accumulation (e.g., GDT DateTimePeriod). Quantity can be the shipped quantity that has been cumulated in the specified reference period up until the time that comes from the use context of the GDT. This quantity value can also be described as the “cumulative delivered quantity” in certain industries (e.g., GDT Quantity).

If the ReferencePeriod cannot be specified explicitly, the reference period for the accumulation may come from the use context of the GDT. This can be set up, for example, using a reference to a contract item (such as a schedulingAgreementReference).

The ShippedQuantityAccumulation can be used for information purposes and for the (legally binding) synchronization of the goods recipient’s received goods and the vendor’s shipped goods.

The transmission of cumulated quantity values can be used, in particular, in advanced shipping notifications (DespatchedDeliveryNotification) in the high-tech and automotive industry. Additional values for the cumulated shipped goods, for instance, for the affected products and parties, can be described in the use context of the GDT, as necessary.

SicknessContinuedPayRuleCode

A GDT SicknessContinuedPayRuleCode is a coded representation of a Sickness Continued Pay Rule. The Sickness Continued Pay Rule can be a pay rule that may be followed in calculation of employee pay while the employee is sick and is unable to attend work. The continued pay could be mandated by legal requirements in some countries. An example of GDT SicknessContinuedPayRuleCode is:

<SicknessContinuedPayRulecode>1</Sicknesscontin-uedPayRulecode>

In certain implementations, GDT SicknessContinued-PayRuleCode may have the following structure:

The data type GDT SicknessContinuedPayRuleCode may have several fixed, country-specific code lists, which are different at runtime, and may be assigned to the SicknessContinuedPayRuleCode. The attributes may be assigned the following values: listID=“30300,” listAgencyID=“310” and listVersionID=version of the particular code list.

The SicknessContinuedPayRuleCode can denote the mandatory pay rule (as per the legal requirement) that may be used in the calculation of the employee pay while he is sick and is unable to attend work. The details of the sickness period and corresponding amounts paid can be defined as rules. This can be used for the purpose of payroll calculation.

The data type GDT SicknessContinuedPayRuleCode may use the following code: 1 (i.e., 6 Weeks Continued Pay).

SicknessContinuedPayRuleCodeContextElements

The GDT SicknessContinuedPayRuleCode-ContextElements defines a dependency or an environment in which the SicknessContinuedPayRuleCode appears. The environment can be described by context categories. With the context categories in SicknessContinuedPayRuleCode-ContextElements the valid portion of code values of SicknessContinuedPayRuleCode may be restricted according to an environment during use. An example of GDT Sickness-ContinuedPayRuleCodeContextElements is:

<SicknessContinuedPayRuleCode>1</SicknessContin-uedPayRuleCode>

In certain implementations, GDT SicknessContinued-PayRuleCodeContextElements may have the following structure:

| GDT | | Cat. | Object Class | Property | Representation/ Association | Type | Type Name | Len. | Card. | Remarks |
|---|---|---|---|---|---|---|---|---|---|---|
| Sickness-ContinuedPay-RuleCode | | | Sickness Continued Pay Rule | | Code | CDT | Code | 1..2 | | restricted |
| | listID | A | Code List | Identification | Identifier | xsd | token | | 0..1 | |
| | list-AgencyID | A | Code List Agency | Identification | Identifier | xsd | token | | 0..1 | |
| | list-VersionID | A | Code List | Version | Identifier | xsd | token | | 0..1 | |

| GDT | | Cat. | Object Class | Property | Representation/ Association | Type | Type Name | Card. |
|---|---|---|---|---|---|---|---|---|
| Sickness-Continued-PayRuleCode-Context-Elements | | | Sickness-Continued-PayRuleCode-Context-Elements | | Details | | | |
| | Country-Code | E | Sickness-Continued-PayRuleCode-Context-Elements | Country | Code | GDT | Country-Code | 0..1 |

For the above CDT SicknessContinuedPayRuleCode-ContextElements the following descriptions may apply: CountryCode is the context category defining the context country. It can determine the valid code values for a specific country.

SiteLogisticsProcessModelID

The GDT SiteLogisticsProcessModelID is the identifier for a SiteLogisticsProcessModel. A SiteLogisticsProcess-Model can be a model that defines a logistic process managed by a logistics division, by specifying a sequence of process segments. An example of GDT SiteLogisticsProcessModelID is:

<SiteLogisticsProcessModelID>STANDARD_RECEIVING</SiteLogisticsProcessModelID>

In certain implementations, GDT SiteLogisticsProcessModelID may have the following structure:

| GDT | Object Class | Property | Representation/ Association | Type | Type Name | Len. | Remarks |
|---|---|---|---|---|---|---|---|
| SiteLogisticsProcessModelID | Site Logistics Process Model | Identification | Identifier | CDT | Identifier | 1 ..40 | restricted |

SiteLogisticsProcessModelProcessSegmentID

The GDT SiteLogisticsProcessModelProcessSegmentID is the identifier for a SiteLogisticsProcessModel-ProcessSegment. ProcessSegment can specify a segment of a site logistics process, which may describe operations for moving, packing or checking stock in a distribution center. An example of GDT SiteLogisticsProcessModel-ProcessSegmentID is:

<SiteLogisticsProcessModelProcessSegmentID>
PICKING_1</SiteLogisticsProcessModel-ProcessSegmentID>

In certain implementations, GDT SiteLogisticsProcessModelProcessSegmentID may have the following structure:

| GDT | Object Class | Property | Representation/ Association | Type | Type Name | Len. | Remarks |
|---|---|---|---|---|---|---|---|
| SiteLogisticsProcess-ModelProcess-SegmentID | Site Logistics Process Model Process Segment | Identification | Identifier | CDT | Identifier | 1..40 | restricted |

A SiteLogisticsProcessModelProcessSegmentID can exist within an instance of a SiteLogisticsProcessModel.

SiteLogisticsProcessModelProcessSegmentID can be used to identify a ProcessSegment within the SiteLogisticsProcessModel that the ProcessSegment is assigned to.

SiteLogisticsProcessModelTypeCode

A GDT SiteLogisticsProcessModelTypeCode is a coded representation of a type of a process model in site logistics. A SiteLogisticsProcessModel can be a model of a site logistics process in a distribution center that may be specified by a sequence of SiteLogisticsProcessSegments. It may contain information about the type of the process (e.g. standard receiving, standard shipping) represented by the model, as well as the distribution center which can be the organizational unit responsible for the process. An example of GDT SiteLogisticsProcessModelTypeCode is:

<SiteLogisticsProcessModelTypeCode>1</SiteLogisticsProcessModelTypeCode>

In certain implementations, GDT SiteLogisticsProcessModelTypeCode may have the following structure:

| GDT | | Cat. | Object Class | Property | Representation/ Association | Type | Type Name | Len. | Card. | Remarks |
|---|---|---|---|---|---|---|---|---|---|---|
| Site-Logistics-Process-Model-TypeCode | | | Site Logistics Process Model | Type | Code | CDT | Code | 1..2 | | Restricted |
| | listAgencyID | A | Code List Agency | Identification | Identifier | xsd | token | | 0..1 | |
| | list-VersionID | A | Code List | Version | Identifier | xsd | token | | 0..1 | |
| | listAgency-SchemeID | A | Code List Agency | Scheme | Identifier | xsd | token | | 0..1 | |
| | listAgency-Scheme-AgencyID | A | Code List Agency | Scheme Agency | Identifier | xsd | token | | 0..1 | |

The data type GDT SiteLogisticsProcessModelTypeCode may assign an extensible code list to the code. The attributes may be assigned the following values: listID="10294," listAgencyID="310," listVersionID=code list remains unchanged, list version ID is the version of the particular code list assigned and managed, listAgencySchemeID=If a user of this code creates his code list during configuration, list agency scheme ID is the ID of the scheme if the listAgencyID does not come from DE 3055, listAgencySchemeAgencyID=If a user of this code creates his code list during configuration, list agency scheme agency Id is the ID of the organization from DE 3055 that manages the listAgencySchemeID scheme.

When processing a site logistics request, the SiteLogisticsProcessModelTypeCode can be used for determining the appropriate ReleasedSiteLogisticsProcessModel. The ReleasedSiteLogisticsProcessModel may contain the information for processing the request.

The data type GDT SiteLogisticsProcessModelTypeCode may use the following codes: 1 (i.e., Standard receiving), 2 (i.e., Goods return receiving), 3 (i.e., Standard shipping), 4 (i.e., Goods return shipping), 5 (i.e., Replenishment), 6 (i.e., Cleanup).

SiteLogisticsProcessSegmentID

A GDT SiteLogisticsProcessSegmentID is an identifier for a SiteLogisticsProcessSegment. A SiteLogisticsProcessSegment can be a set of operations for moving, packing or checking stock in a logistics division, which can be used by different site logistics processes. An example of GDT SiteLogisticsProcessSegmentID is:

<SiteLogisticsProcessSegmentID>Standard_Inbound</SiteLogisticsProcessSegmentID>

In certain implementations, GDT SiteLogisticsProcessSegmentID may have the following structure:

| GDT | Object Class | Property | Representation/ Association | Type | Type Name | Len. | Remarks |
|---|---|---|---|---|---|---|---|
| SiteLogistics-ProcessSegmentID | Site Logistics Process Segment | Identification | Identifier | CDT | Identifier | 1..40 | restricted |

SiteLogisticsProcessSegmentID can be used in order to identify a site logistic process segment in the system.

SiteLogisticsProcessTypeCode

A GDT SiteLogisticsProcessTypeCode is a coded representation of the type of site logistics process. An example of GDT SiteLogisticsProcessTypeCode is:

<SiteLogisticsProcessTypeCode>1</SiteLogisticsProcessTypeCode>

In certain implementations, GDT SiteLogisticsProcessSegmentID may have the following structure:

| GDT | Object Class | Property | Representation/ Association | Type | Type Name | Len. | Remarks |
|---|---|---|---|---|---|---|---|
| SiteLogistics-ProcessTypeCode | Site Logistics Process | Type | Code | CDT | Code | 1..2 | restricted |

The data type GDT SiteLogisticsProcessSegmentID may assign a code list to the code. The attributes may be assigned the following values: listID="10236" and listAgencyID="310."

A SiteLogisticsProcessTypeCode can be used along with the business transaction document item type code to determine the appropriate process model for the site logistics process that is to be carried out. (For example, the process model for goods return receiving or standard receiving).

The data type GDT SiteLogisticsProcessSegmentID may use the following codes: 1 (i.e., Inbound site logistics process), 2 (i.e., Outbound site logistics process), 3 (i.e., In-house site logistics process).

SiteLogisticsRequestSegmentID

A GDT SiteLogisticsRequestSegmentID is an identifier for a segment in a Site Logistics Request. A SiteLogisticsRequestSegment may specify for a SiteLogisticsRequest a part of a site logistics process which can be performed in order to fulfill a Site Logistics Request. An example of GDT SiteLogisticsRequestSegmentID is:

<SiteLogisticsRequestSegmentID>Standard_Outbound</SiteLogisticsRequestSegmentID>

In certain implementations, GDT SiteLogisticsRequestSegmentID may have the following structure:

| GDT | Object Class | Property | Representation/Association | Type | Type Name | Len. | Remarks |
|---|---|---|---|---|---|---|---|
| SiteLogisticsRequest-SegmentID | Site Logistics Request Segment | Identification | Identifier | CDT | Identifier | 1..40 | Restricted |

A SiteLogisticsRequestSegmentID can be within an instance of a site logistics request.

SiteLogisticsRequestSegmentID can be used in a site logistics request to identify a segment, for example in queries.

SocialInsuranceOccupationCategoryCode

A GDT SocialInsuranceOccupationCategoryCode is a coded representation of the occupation category according to the Social Insurance Organization. An example of GDT SocialInsuranceOccupationCategoryCode is:

<SiteLogisticsRequestSegmentID>Standard_Outbound</SiteLogisticsRequestSegmentID>

In certain implementations, GDT SocialInsuranceOccupationCategoryCode may have the following structure:

| GDT | Cat. | Object Class | Property | Representation/Association | Type | Type Name | Len. | Card. | Remarks |
|---|---|---|---|---|---|---|---|---|---|
| SocialInsuranceOccupation-Category-Code | | Social Insurance Occupation Category | | Code | CDT | Code | 2 | | restricted |

-continued

| GDT | | Cat. | Object Class | Property | Representation/Association | Type | Type Name | Len. | Card. | Remarks |
|---|---|---|---|---|---|---|---|---|---|---|
| | listID | A | Code List | Identification | Identifier | xsd | token | | 0..1 | |
| | listAgencyID | A | Code List Agency | Identification | Identifier | xsd | token | | 0..1 | |
| | listVersionID | A | Code List | Version | Identifier | xsd | token | | 0..1 | |
| | listAgencySchemeID | A | Code List Agency | Scheme | Identifier | xsd | token | | 0..1 | |
| | listAgencyAgencySchemeAgencyID | A | Code List Agency | Scheme Agency | Identifier | xsd | token | | 0..1 | |

The data type SocialInsuranceOccupationCategoryCode may have extensible, country-specific code lists, which can be different at runtime, can be assigned to the SocialInsuranceOccupationCategoryCode. The attributes can be assigned the following values: listID="24001," listAgencyID="IT," listAgencySchemeID=ISO 3166-1, listAgencySchemeAgencyID=5 (ISO).

If a customer creates his own code list to replace an existing code list, the values assigned to the attributes can change as follows: listAgencyID can be the ID of the customer (e.g., ID from DE 3055, if listed there), listVersionID can be the version of the particular code list, which can be assigned and managed by the customer, listAgencySchemeID can be the ID of the scheme if the listAgencyID does not come from DE 3055, listAgencySchemeAgencyID can be the ID of the organization from DE 3055 that manages the listAgencySchemeID scheme.

Semantic examples of customer-specific codes include the following: information recorded to employees for reporting. For Italy these codes can be prescribed by INPS. In certain elements the data element R/3 can be used (e.g., P15_CODATT (R/3 domain: P15_CODATT)).

assistance), 13 (i.e., Public opinion surveys, marketing & telem., advert., stat.researches, and market), 14 (i.e., Transports and shipping), 15 (i.e., Tourism, entertainment, exhibitions, town markets), 16 (i.e., House to house selling), 17 (i.e., Others), 18 (i.e., PhD course).

SocialInsuranceOccupationCategoryCode

The GDT SocialInsuranceOccupationCategoryCode ContextElements defines a dependency or an environment in which the SocialInsuranceOccupationCategoryCode appears. The environment can be described by context categories. With the context categories in SocialInsuranceOccupationCategoryCode ContextElements the valid portion of code values of SocialInsuranceOccupationCategoryCode can be restricted according to an environment during use. An example of GDT SocialInsuranceOccupationCategoryCode is:

<SocialInsuranceOccupationCategoryCode>11</SocialInsuranceOccupationCategoryCode>

In certain implementations, GDT SocialInsuranceOccupationCategoryCode may have the following structure:

| GDT | | Cat. | Object Class | Property | Representation/Association | Type | Type Name | Card. |
|---|---|---|---|---|---|---|---|---|
| SocialInsuranceOccupationCategoryCodeContextElements | | | Social Insurance Occupation Category Code Context Elements | | Details | | | |
| | CountryCode | E | Social Insurance Occupation Category Code Context Elements | Country | Code | GDT | Country Code | 0..1 |

The data type SocialInsuranceOccupationCategoryCode may use the following codes: 1 (i.e., Administrator, auditor, company auditor, association auditor, etc.), 2 (i.e., Condominium administration), 3 (i.e., Filing, translations, administrative and accounting services), 4 (i.e., Technical assistance, machinery, installations, tests, quality certification), 5 (i.e., Cooperation on newspapers, magazines, encyclopedias, and means of communication), 6 (i.e., Company, fiscal, administrative, accounting, computer consultancy, etc.), 7 (i.e., Beauty, hygiene in general), 8 (i.e., Education, instruction, training), 9 (i.e., Brokerage, credit collection, document notification, etc.), 10 (i.e., Fashion, art, sport, entertainment), 11 (i.e., Participants in boards and committees), 12 (i.e., Health, The CountryCode can be this context category defining the context country. It may determine the valid code values for a specific country.

SocialInsuranceTypeCode

A GDT SocialInsuranceTypeCode is a coded representation of the type of a social insurance. An example of GDT SocialInsuranceTypeCode is:

<SocialInsuranceTypeCode>106</SocialInsuranceTypeCode>

In certain implementations, GDT SocialInsuranceTypeCode may have the following structure:

| GDT | | Cat. | Object Class | Property | Representation/Association | Type | Type Name | Len. | Card. | Remarks |
|---|---|---|---|---|---|---|---|---|---|---|
| SocialInsurance-Type-Code | | | Social Insurance | Type | Code | CDT | Code | 1..3 | | restricted |
| | listID | A | Code List | Identification | Identifier | xsd | token | | 0..1 | |
| | listAgency-ID | A | Code List Agency | Identification | Identifier | xsd | token | | 0..1 | |
| | listVersionID | A | Code List | Version | Identifier | xsd | token | | 0..1 | |
| | listAgency-SchemeID | A | Code List Agency | Scheme | Identifier | xsd | token | | 0..1 | |
| | listAgency-Scheme-AgencyID | A | Code List Agency | Scheme Agency | Identifier | xsd | token | | 0..1 | |

The data type SocialInsuranceTypeCode may have country-specific code lists, which can be different at runtime, can be assigned to the code. A user of this code can replace these code list with his one.

The attributes may be assigned the following values: listID—"24301," listAgencyID="IT," listAgencySchemeID="ISO 3166-1," listAgencySchemeAgencyID="5" (i.e., ISO). If a user creates his code list to replace an existing code list, the values assigned to the attributes can change as follows: listAgencyID can be the ID of the customer (ID from DE 3055, if listed there), listVersionID can be the version of the particular code list, listAgencySchemeID can be the ID of the scheme if the listAgencyID does not come from DE 3055, listAgencySchemeAgencyID can be the ID of the organization from DE 3055 that manages the listAgencySchemeID scheme.

Semantic examples of user-specific codes include the following: information recorded to employees for reporting. For Italy these insurance codes can be prescribed by INPS. In certain elements the data element R/3 can be used (e.g. P15_CODALTR (R/3 domain: P15_CODALTR)).

The data type SocialInsuranceTypeCode may use the following codes: 001 (i.e. Insurer for pensioners of all compulsory pension institutions), 101 (i.e. Pension fund for employees), 102 (i.e. Insurer for handicraftsmen), 103 (ie. Insurer for dealers), 104 (i.e. CD—CM contributions), 105 (i.e. Voluntary contributions), 106 (i.e. Notional contributions), 201 (i.e. Insurer for employees from local institutions and from government administrations), 301 (i.e. Insurer for public accountants), 302 (i.e. Insurer for accountants), 303 (i.e. Insurer for engineers and architects), 304 (i.e. Insurer for surveyors), 305 (ie. Insurer for lawyers), 306 (i.e. Insurer for work consultants), 307 (i.e. Insurer for notaries), 308 (i.e. Insurer for medical doctors), 309 (i.e. Insurer for pharmacists), 310 (i.e. Insurer for veterinarians), 311 (i.e. Insurer for chemists), 312 (i.e. Insurer for agronomists), 313 (i.e. Insurer for geologists), 314 (i.e. Insurer for actuaries), 315 (i.e. Insurer for state registered nurses, nurses, childminders), 316 (i.e. Insurer for psychologists), 317 (i.e. Insurer for biologists), 318 (i.e. Insurer for industrial experts), 319 (ie. Insurer for agriculture technicians, agriculturalists), 320 (i.e. Insurer for journalists), 321(ie. Insurer for forwarding agents (until 31 Dec. 1998)).

SocialInsuranceTypeCode

The GDT SocialInsuranceTypeCode ContextElements defines a dependency or an environment in which the SocialInsuranceTypeCode appears. The environment can be described by context categories. With the context categories in SocialInsuranceTypeCode ContextElements, the valid portion of code values of SocialInsuranceTypeCode can be restricted according to an environment during use. An example of GDT SocialInsuranceTypeCode is:

<SocialInsuranceTypeCode>106</SocialInsuranceTypeCode>

In certain implementations, GDT SocialInsuranceTypeCode may have the following structure:

| GDT | | Cat. | Object Class | Property | Representation/Association | Type | Type Name | Card. |
|---|---|---|---|---|---|---|---|---|
| SocialInsurance-TypeCode ContextElements | | | SocialInsurance-TypeCode Context Elements | | Details | | | |
| | Country-Code | E | SocialInsurance-TypeCode Context Elements | Country | Code | GDT | CountryCode | 0..1 |

The CountryCode can be the context category defining the context country. It may determine the valid code values for a specific country.

SocialSurveyEmployeeQualificationEmployeeGroupCode

A GDT SocialSurveyEmployeeQualificationEmployeeGroupCode is a coded representation of a group of employees according to criteria for social surveys. An example of SocialSurveyEmployeeQualificationEmployeeGroupCode is:

<SocialSurveyEmployeeQualificationEmployeeGroupCode>1</SocialSurveyEmployeeQualificationEmployeeGroupCode>

In certain implementations, GDT SocialSurveyEmployeeQualificationEmployeeGroupCode may have the following structure:

| GDT | | Cat. | Object Class | Property | Representation/ Association | Type | Type Name | Len. | Card. | Remarks |
|---|---|---|---|---|---|---|---|---|---|---|
| SocialSurveyEmployeeQualification-EmployeeGroup Code | | | Social Survey Employee Qualification Employee Group | | Code | CDT | Code | 1..4 | | restricted |
| | listID | A | Code List | Identification | Identifier | xsd | token | | 0..1 | |

The data type SocialSurveyEmployeeQualificationEmployeeGroupCode may have several user-specific, country-specific code lists, which can be different at runtime, can be assigned to the code. A user of this code may determine the codes in the code list during configuration.

The attributes may be assigned the following values: listID=ID of the relevant country-specific code list, assigned by the customer from the number range 51500-51599, listAgencyID ID of the customer (e.g., ID from DE 3055, if listed there), listVersionID=version of the code list, assigned and managed by the customer, listAgencySchemeID=ID of the scheme if the listAgencyID does not come from DE 3055, listAgencySchemeAgencyID=ID of the organization from DE 3055 that manages the listAgencySchemeID scheme.

This code can be used by the Social Survey report; it may be a legal requirement for French employees. This can be needed for the "social survey" (e.g., bilan social) in France. By law, this report may be produced every year. It may present a wide range of employee statistics, shown by professional category and possibly by sex. The set of professional categories cannot be prescribed by law but may depend on company practice, which takes into account any collective or company-wide agreements. In the simplest case, the same set of categories can be used throughout the company. Customers may choose to use a classification that depends on the company unit.

Semantic examples for customer-specific code semantics for CountryCode FR include: MANAGERS for the Manager for Social Survey, DIRECTOR for Director for Social Survey, INSPECTOR for the Inspector for Social Survey, and the EMPLOYEE for the Employee for Social Survey In certain elements the data element R/3 can be used (e.g., P06_BSCAT).

SocialSurveyEmployeeQualificationEmployeeGroupCode

The GDT SocialSurveyEmployeeQualificationEmployeeGroupCode define a dependency or an environment in which the SocialSurveyEmployeeQualificationEmployeeGroupCode appears. The environment can be described by context categories. With the context categories in SocialSurveyEmployeeQualificationEmployeeGroupCode ContextElements the valid portion of code values of SocialSurveyEmployeeQualificationEmployeeGroupCode can be restricted according to an environment during use. An example of GDT SocialSurveyEmployeeQualificationEmployeeGroupCode is:

<SocialSurveyEmployeeQualificationEmployee GroupCode>1<SocialSurveyEmployeeQualification EmployeeGroupCode>

In certain implementations, GDT SocialSurveyEmployeeQualificationEmployeeGroupCode may have the following structure:

| GDT | | Cat. | Object Class | Property | Representation/Association | Type | Type Name | Card. |
|---|---|---|---|---|---|---|---|---|
| SocialSurveyEmployeeQualificationEmployeeGroupCodeContextElements | | | Social Survey Employee Qualification Employee Group Code Context Elements | | Details | | | |
| | CountryCode | E | Social Survey Employee Qualification Employee Group Code Context Elements | Country | Code | GDT | CountryCode | 0..1 |

The CountryCode may be considered the context category defining the context country. It may determine the valid code values for a specific country.

SoftwareUpdateManualTaskID

A GDT SoftwareUpdateManualTaskID is an identifier of a manual task in Software Life Cycle Management. A Manual Task can be a manual action to be performed by the system administrator during the implementation of a Maintenance Package. It may contain the description and the detailed guideline for the actions to be performed. An example of SoftwareUpdateManualTaskID is:

<SoftwareUpdateManualTaskID>1234567890</SoftwareUpdateManualTaskID>

In certain implementations, GDT SoftwareUpdateManualTaskID may have the following structure:

| GDT | Object Class | Property | Representa-tion/Associa-tion | Type | Type Name | Len. |
|---|---|---|---|---|---|---|
| SoftwareUpdate-ManualTaskID | Software Update Manual Task | Identification | Identifier | CDT | Identifier | 1..35 |

Most manual actions can be generated from Netweaver Software Livecycle Manager as missing prerequisites/problems or missing automation of update actins. Before the update can proceed, these manual actions can be confirmed from the customer. These conformations can be forwarded using SoftwareUpdateManualTaskID to Netweaver Software Live-Cycle Manager.

SoftwareUpdateManualTaskID can be used as reference in communication between Netweaver Software Life Cycle Management and Update Process Control.

SoftwareUpdatePlanID

A GDT SoftwareUpdatePlanID is an identifier of a plan for a software update in Software Life Cycle Management. Based on the target vector containing component/release information contained in the TargetComponentReleaseNote, Software Life Cycle Manager may create a plan that may specify which software archive should be implemented on every component of the system. An example of SoftwareUpdatePlanID is:

<SoftwareUpdatePlanID>1234567890</SoftwareUpdatePlanID>

In certain implementations, GDT SoftwareUpdatePlanID may have the following structure:

| GDT | Object Class | Property | Representation/Association | Type | Type Name | Len. |
|---|---|---|---|---|---|---|
| SoftwareUpdatePlanID | Software Update Plan | Identification | Identifier | CDT | Identifier | 1..35 |

The SoftwareUpdatePlanID can be used as reference in communication between Netweaver Software Life Cycle Management and Update Process Control.

SoftwareUpdateRecommendationID

A SoftwareUpdateRecommendationID is an identifier of an Update Recommendation for a customer. This ID can be assigned in the Business Backbone. An example of SoftwareUpdateRecommendationID is:

<SoftwareUpdateRecommendationID>1234567890</SoftwareUpdateRecommendationID>

In certain implementations, SoftwareUpdateRecommendationID may have the following structure:

| GDT | Object Class | Property | Representation/Association | Type | Type Name | Len. |
|---|---|---|---|---|---|---|
| SoftwareUpdateRecommendationID | Software Update Recommendation | Identification | Identifier | CDT | Identifier | 1..35 |

SoftwareUpdateRecommendationID can be used as reference between a Software Update implemented at the customer and Update Recommendation created by and send from the Backbone.

SortSequenceCode

A SortSequenceCode is the coded representation of a sort sequence. An example of SortSequenceCode is:

<SortSequenceCode>1</SortSequenceCode>

In certain implementations, SortSequenceCode may have the following structure:

| GDT | Object Class | Representation/ Association | Type | Type Name | Len. | Remarks |
|---|---|---|---|---|---|---|
| SortSequence-Code | Sort Sequence | Code | CDT | Code | 1 | Restricted |

A code list can be assigned to SortSequenceCode. The attributes may be defined as follows: listID="10303," listAgencyID="310."

The GDT SortSequenceCode can be used to define whether it is to be sorted in ascending or descending order. The code list may have the following values: 1 (i.e., Ascending (i.e., Sort in ascending order), 2 (i.e., Descending (i.e., Sort in descending order).

SourceAndDestinationDeterminationRequestMethodCode

A GDT SourceAndDestinationDeterminationRequestMethodCode is a coded representation of the method for requesting source and destination determination. An example of SourceAndDestinationDetermination RequestMethodCode is:

<SourceAndDestinationDeterminationRequestMethodCode>1</SourceAndDestinationDeterminationRequestMethodCode>

In certain implementations, SourceAndDestinationDeterminationRequestMethodCode may have the following structure:

| GDT | Object Class | Property | Representation/ Association | Type | Type Name | Len. | Remarks |
|---|---|---|---|---|---|---|---|
| SourceAnd-Destination-Determination-RequestMethod-Code | Source And Destination Determination Request | Method | Code | CDT | Code | 1..2 | restricted |

A fixed code list can be assigned to the code. The attributes may have assigned values as follows: listID="10448," listAgencyID="310."

The code list and its values may include the following: 1 (i.e., Order creation (i.e., Source and destination determination is requested on order creation), 2 (i.e., Operation release (i.e., Source and destination determination is requested on operation release).

SourceAndDestinationDeterminationRequestMethodCode can be used to specify the method for requesting source and destination locations in a logistics process. For example, when receiving unpredictable logistics units, the destination location in which goods shall be placed, can be determined during the execution, when the relevant operation is released.

SourceAndDestinationDeterminationRequestPurposeCode

A SourceAndDestinationDeterminationRequestPurposeCode is a coded representation of the purpose for which a source or destination determination was requested. An example of SourceAndDestinationDeterminationRequestPurposeCode is:

<SourceAndDestinationDeterminationRequestPurposeCode>1</SourceAndDestinationDeterminationRequestPurposeCode>

In certain implementations, SourceAndDestinationDeterminationRequestPurposeCode may have the following structure:

| GDT | Object Class | Property | Representation/ Association | Type | Type Name | Len. | Remarks |
|---|---|---|---|---|---|---|---|
| SourceAndDestination-Determination-Request-Purpose-Code | Source And Destination Determination Request | Purpose | Code | CDT | Code | 1 | restricted |

A fixed code list can be assigned to the code. The attributes can be assigned values as follows: listID="10389," listAgencyID="310."

The code list and its values may include the following: 1 (i.e., Planning (i.e., The request for source or destination is for short term or long term scheduling (rough plan) of site logistics processes), 2 (i.e., Execution (i.e., The request for source or destination is for immediate execution of site logistics processes).

The SourceAndDestinationDeterminationRequestPurposeCode may allow the source and destination determination process to behave differently according to the purpose for which the request was made. For example, site logistics order can use SourceAndDestinationDeterminationRequestPurposeCode to specify that the source is requested for immediate execution. The source and destination determination process can act accordingly, and will provide a source which can be used immediately.

SourceAndDestinationDeterminationRequestTypeCode

A SourceAndDestinationDeterminationRequestTypeCode is a coded representation of the type of determination request when searching for source or destination object. An example of SourceAndDestinationDeterminationRequestTypeCode is:

<SourceAndDestinationDeterminationRequestTypeCode>1</SourceAndDestinationDeterminationRequestTypeCode>

In certain implementations, SourceAndDestinationDeterminationRequestTypeCode may have the following structure:

| GDT | Object Class | Property | Representation/Association | Type | Type Name | Len. | Remarks |
|---|---|---|---|---|---|---|---|
| SourceAndDestinationDeterminationRequestTypeCode | Source And Destination Determination Request | Type | Code | CDT | Code | 1 | restricted |

A fixed code list (listID=10254) can be assigned to the SourceAndDestinationDeterminationRequestTypeCode. The attributes: listID, listAgencyID, listVersionID can be missing from the structure as they have constant values during runtime.

The code list and its permitted values may include the following: 1 (i.e., Source), 2 (i.e., Destination).

The SourceAndDestinationDeterminationRequestTypeCode can be used to distinguish between different requirements when requesting determination of a source for retrieval of stock or destination for placement of stock.

SourceAndDestinationDeterminationRuleID

A GDT SourceAndDestinationDeterminationRuleID is an identifier for a Source and Destination DeterminationRule. A Source and Destination DeterminationRule is a rule for identifying the source storage location for stock retrieval or the destination storage location for stock placement, specifying the criteria for when the rule is to be applied. An example of SourceAndDestinationDeterminationRuleID is:

<SourceAndDestinationDeterminationRuleID>1234567890</SourceAndDestinationDeterminationRuleID>

Another example of GDT SourceAndDestinationDeterminationRuleID is:

<SourceAndDestinationDeterminationRuleID>DestinationForOutboundOfHazardous</SourceAndDestinationDeterminationRuleID>

In certain implementations, SourceAndDestinationDeterminationRuleID may have the following structure:

| GDT | Object Class | Property | Representation/Association | Type | Type Name | Len. | Remarks |
|---|---|---|---|---|---|---|---|
| SourceAndDestinationDeterminationRuleID | Source And Destination Determination Rule | Identification | Identifier | CDT | Identifier | 1..40 | restricted |

SourceAndDestinationDeterminationRuleID can be used to identify a specific Source and Destination Determination-Rule.

SourceAndDestinationDeterminationRuleTypeCode

A SourceAndDestinationDeterminationRuleTypeCode is a coded representation of the type of Source and Destination Determination Rule. A Source and Destination Determination Rule is a rule for identifying the source storage location for stock retrieval or the destination storage location for stock placement, specifying the criteria for when the rule is to be applied. An example of SourceAndDestinationDeterminationRuleTypeCode:

<SourceAndDestinationDeterminationRuleTypeCode>1</SourceAndDestinationDeterminationRuleTypeCode>

In certain implementations SourceAndDestinationDeterminationRuleTypeCode may have the following structures:

| GDT | Object Class | Property | Representation/Association | Type | Type Name | Len. | Remarks |
|---|---|---|---|---|---|---|---|
| SourceAndDestinationDeterminationRuleTypeCode | Source And Destination Determination Rule | Type | Code | CDT | Code | 1 | restricted |

A fixed code list (listID=10255) can be assigned to the SourceAndDestinationDeterminationRuleTypeCode. ListID, listAgencyID, listVersionID can be missing from the structure as they have constant values during runtime.

The code list and its values may include the following: 1 (i.e., Primary Rule (i.e., A primary rule for identifying the source storage location for stock retrieval or the destination storage location for stock placement, specifying the criteria for when the rule is to be applied), 2 (i.e., Refinement Rule (i.e., A rule for identifying the prioritization of the Primary rule's results).

The SourceAndDestinationDeterminationRuleTypeCode can be used to distinguish between the different types of Source and Destination Determination Rule. The results of a Primary Source and Destination Determination Rule can be refined by using a Refined Source and Destination Determination Rule when there is a preference in the returned results.

SourceAndDestinationDeterminationSearchSequenceItemTypeCode

A GDT SourceAndDestinationDeterminationSearchSequenceItemTypeCode is a coded representation of the type of item in the search sequence. A search sequence can be a list of places to search when trying to determine a source for retrieval of stock or a destination for placement of stock in a logistics operation. For example, a search sequence can be a specific logistics area which could be searched, or it can be a StorageBehaviourMethod, which refers to all the logistics areas or resources which should be searched. An example of SourceAndDestinationDeterminationSearchSequenceItemTypeCode is:

<SourceAndDestinationDeterminationSearchSequenceItemTypeCode>1<SourceAndDestinationDetermination-SearchSequenceItemTypeCode>

In certain implementations, SourceAndDestinationDeterminationSearchSequenceItemTypeCode may have the following structure:

| GDT | Object Class | Property | Representation/Association | Type | Type Name | Len. | Remarks |
|---|---|---|---|---|---|---|---|
| SourceAndDestination-DeterminationSearch-SequenceItemTypeCode | Source And Destination Determination_Search Sequence Item | Type | Code | CDT | Code | 1 | restricted |

A fixed code list (listID=10253) can be assigned to the SourceAndDestinationDeterminationSearchSequenceItemTypeCode.

The attributes listID, listAgencyID, listVersionID can be missing from the structure as they have constant values during runtime. The code list values may include the following: 1 (i.e., LogisticsArea (i.e., A Logistics Area that needs to be searched in order to find a source for the retrieval of stock or a destination for the placement of stock), 2 (i.e., StorageBehaviourMethod (i.e., A Storage behavior method identifying several Logistics Areas that need to be searched in order to find a source for the retrieval of stock or a destination for the placement of stock. A Storage behavior method can be utilized by a group of Logistics Areas. The entire group can be searched when the Storage Behavior Method is specified as a Search Sequence Item).

The SourceAndDestinationDeterminationSearchSequenceItemTypeCode can be used to distinguish between different types of search sequence items of the Source and Destination Determination Rule.

SourceOfSupplyBaseObjectTypeCode

A SourceOfSupplyBaseObjectTypeCode is the coded representation of the object a SourceOfSupply is based on. A SourceOfSupply can be based on a business object or the part of a business object that can be considered as source of supply in source of supply determination. The SourceOfSupply may copy the information that could be relevant for source of supply determination from the business object or from the part of the business object that it is based on. An example of SourceOfSupplyBaseObjectTypeCode is:

<SourceOfSupplyBaseObjectTypeCode>1</SourceOfSupplyBaseObjectTypeCode>

In certain implementations, SourceOfSupplyBaseObjectTypeCode may have the following structure:

| GDT | Object Class | Property | Representation/Association | Type | Type Name | Len. | Remarks |
|---|---|---|---|---|---|---|---|
| SourceOf-Supply-BaseObject-TypeCode | Source Of Supply_Base Object | Type | Code | CDT | Code | 1..2 | Restricted |

A fixed code list may have been assigned to the code. The attributes may be defined as follows: listID="10401," listAgencyID="310," listVersionID can be the version of the relevant code list.

The code list and its values may have the following values: 1 (i.e., TransportationLaneValidMaterials (i.e., The source of supply is based on the valid materials of a transportation lane), 2 (i.e., PurchasingContractItem (i.e., The source of supply is based on an item of a purchasing contract), 3 (i.e., PurchasingContract (i.e., The source of supply is based on a purchasing contract), 4 (i.e., ProductionModel (i.e., The source of supply is based on a production model), 5 (i.e., ReleasedPlanningProductionModel (i.e., The source of supply is based on a released planning production model).

The SourceOfSupplyBaseObjectTypeCode can be used to define on which object a SourceOfSupply is based on.

SourceOfSupplyPriorityRuleCode

A SourceOfSupplyPriorityRuleCode is the coded representation of a priority rule for the sources of supply that are determined in source of supply determination. A Priority rule can define the way sources of supply are sorted. An example of SourceOfSupplyPriorityRuleCode is:

<SourceOfSupplyPriorityRuleCode>1</SourceOfSupplyPriorityRuleCode>

In certain implementations, SourceOfSupplyPriorityRuleCode may have the following structure:

| GDT | | Cat. | Object Class | Property | Representation/Association | Type | Type Name | Len. | Card. | Remarks |
|---|---|---|---|---|---|---|---|---|---|---|
| SourceOfSupplyPriorityRule-Code | | | Source Of Supply_Priority | Rule | Code | CDT | Code | 1..3 | | Restricted |
| | listAgencyID | A | Code List Agency | Identification | Identifier | xsd | token | | 0..1 | |

-continued

| GDT | | Cat. | Object Class | Property | Representation/Association | Type | Type Name | Len. | Card. | Remarks |
|---|---|---|---|---|---|---|---|---|---|---|
| | listVersionID | A | Code List | Version | Identifier | xsd | token | | 0..1 | |
| | listAgency-SchemeID | A | Code List Agency | Scheme | Identifier | xsd | token | | 0..1 | |
| | listAgency-SchemeAgency ID | A | Code List Agency | Scheme Agency | Identifier | xsd | token | | 0..1 | |

An extendable code list can be assigned to the SourceOfSupplyPriorityRuleCode. Customers may replace this list with their own. The attributes may have the value: listID="10441."

In the previously described structure, the following may be defined: listAgencyID=if the code list remains unchanged, list agency ID is "310"; if a user creates his code list during configuration, list agency ID is the ID of the code user (e.g., ID from DE 3055, if listed there, listVersionID=If the code list remains unchanged, list version ID is the version of the particular code list assigned; if a user creates his code list during configuration, list version ID is the version of particular code list assigned and managed by the code user, listAgencySchemeID=If a user of this code creates his code list during configuration, list agency scheme ID is the ID of the scheme if the listAgencyID does not come from DE 3055, listAgencySchemeAgencyID=If a user of this code creates his code list during configuration, list agency scheme agency Id is the ID of the organization from DE 3055 that manages the listAgencySchemeID scheme.

Examples of customer-specific code semantics include: 1: BestPrice (i.e., Priority rule, that sorts sources of supply according to lowest price, priority and degree of fulfillment of the guaranteed minimum value), 2: FastAvailability (i.e., Priority rule, that sorts sources of supply according to earliest possible availability and priority).

Source of supply determination may return a sorted list of sources of supply. The sorting can be based on priority rules. The SourceOfSupplyPriorityRuleCode can be used for a coded representation of priority rules that can be defined in Business Configuration.

SourceOfSupplyReference

A SourceOfSupplyReference is a reference to a source of supply or to a LogisticRelationship within a source of supply. A source of supply can be a means of procuring materials and is used to cover requirements. An example of SourceOfSupplyReference is:

<SourceOfSupplyReference>

<SourceOfSupplyUUID>33DFBC56-734C-5A67-6956-CA6B65FAAC7</SourceOfSupplyUUID>

<SourceOfSupplyLogisticRelationshipUUID> 63D04556-7B4T-5A67-6956-EA6C65F2CA17<Source OfSupplyLogisticRelationshipUUID>

</SourceOfSupplyReference>

In certain implementations, SourceOfSupplyReference may have the following structure:

| GDT | | Cat. | Object Class | Property | Rep./Ass. | Type | Type Name | Len. | Card. |
|---|---|---|---|---|---|---|---|---|---|
| SourceOfSupplyReference | | | Source Of Supply Reference | | Details | | | | |
| | SourceOfSupplyUUID | E | Source Of Supply Reference | Source Of Supply_Universally_Identification | Identifier | GDT | UUID | 36 | 0..1 |
| | SourceOfSupplyLogisticRelationshipUUID | E | Source Of Supply Reference | Source Of Supply Logistic Relationship_Universally Unique_Identification | Identifier | GDT | UUID | 36 | 0..1 |

The source of supply may consist of a general part, as well as one or more logistical relationships. The general part may be relevant for the applications that do not observe any logistical steps, for example, SRM. The detailed logistical level may be used by applications that include logistical processes. Therefore, SourceOfSupplyReference contains two identifiers: SourceOfSupplyUUID (i.e., Universally identifier of a source of supply) and SourceOfSupplyLogisticRelationshipUUID (i.e., identifier of a logistical relationship of a source of supply).

The use of SourceOfSupplyUUID and SourceOfSupplyLogisticRelationshipUUID can be optional. If both identifiers can be specified, the SourceOfSupplyLogisticRelationshipUUID can be assigned to the superordinate SourceOfSupplyUUID.

The data type could be used when the relevant object is being exchanged between a logistical application (such as SCM) and an application that is based solely on business relationships (such as SRM). In this case, the link between the used general part of the source of supply and the logistical relationship can be preserved. If a source of supply can be determined by SRM, only the SourceOfSupplyUUID can be entered in the relevant object. If the source of supply is then transferred to SCM, the SourceOfSupplyLogisticRelationshipUUID can be determined using a source of supply determination based on the SourceOfSupplyUUID. Conversely, if a logistical relationship of a source of supply can be determined by SCM, the superordinate general source of supply can be identified for SRM.

SourcesOfSupplySpecificationDetailLevelCode

A SourcesOfSupplySpecificationDetailLevelCode is a coded representation of the level of detail of data for sources of supply. Whether a certain source of supply or a group of sources of supply can be specified may depend on the level of detail. An example of SourcesOfSupplySpecificationDetailLevelCode is:

<SourcesOfSupplySpecificationDetailLevelCode>1</SourcesOfSupplySpecificationDetailLevelCode>

In certain implementations SourcesOfSupplySpecificationDetailLevelCode may have the following structure:

| GDT | Object Class | Property | Representation/Association | Type | Type Name | Len. | Remarks |
|---|---|---|---|---|---|---|---|
| SourcesOfSupplySpecificationDetailLevelCode | Sources Of Supply Specification | Detail Level | Code | CDT | Code | 1 | Restricted |

A fixed code list can be assigned to SourcesOfSupplySpecificationDetailLevelCode. The attributes may have the following values: listID="10399," listAgencyID="310," listVersionID can be the version of the particular code list.

The code list and its values may include the following: 1 (i.e., Logistical relationship of a source of supply (i.e., A logistical relationship of a source of supply can be specified. A logistical relationship is a relationship between two locations that is used to procure and produce products. It defines logistical characteristics), 2 (i.e., Source of supply (i.e., A particular source of supply is specified), 3 (i.e., Sources of Supply of a Location (i.e., All sources of supply are specified based on a location), 4 (i.e., Sources of Supply of a Party (i.e., All sources of supply are specified based on a party).

A SupplyQuotaArrangement can be defined for a logistical relationship of a source of supply, for a specific source of supply, for all sources of supply that belong to a particular location or for all sources of supply that belong to a particular party. The SourcesOfSupplySpecificationLevelCode can for example be used to define this relationship.

SourcingContextCode

A SourcingContextCode is a coded representation of the context in which source of supply determination takes place. An example of SourcingContextCode is:

<SourcingContextCode>123</SourcingContextCode>

In certain implementations, SourcingContextCode may have the following structure:

| GDT | Object Class | Property | Representation/Association | Type | Type Name | Len. | Remarks |
|---|---|---|---|---|---|---|---|
| SourcingContextCode | Sourcing | Context | Code | CDT | Code | 1..3 | Restricted |

A fixed code list may have been assigned to SourcingContextCode. The attributes of the CDT code may be as follows: listID="10439," listAgencyID="310."

The code list and its values may include the following: 1 (i.e., ATP-SubstitutionService (i.e., Source of Supply Determination for the ATP substitution service), 2 (i.e., PlanDrivenProcurement (i.e., Source of Supply Determination for Plan-Driven Procurement).

For example, the context can be relevant in source of supply determination, where it can be used to define the standard control parameter profile and the standard sorting rule.

SpecialStockInventorySeparatingValues

SpecialStockInventorySeparatingValues are the values that separate inventory from other inventory. Special Stock can be a material that can be managed separately for reasons of logistics processes. An example can be a project stock. An example of SpecialStockInventorySeparatingValues is:

<SpecialStockInventorySeparatingValues>

<ProjectUUID>35d3cfca-3996-57b0-e100-00000a42201d</ProjectUUID>

</SpecialStockInventorySeparatingValues>

The previous example separates the inventory by a project (e.g., a ProjectUUID). In certain implementation, SpecialStockInventorySeparatingValues may have the following structure:

| GDT | | Cat. | Object Class | Property | Rep./Ass. Qual. | Rep./Ass. | Type | Type Name | Card. |
|---|---|---|---|---|---|---|---|---|---|
| SpecialStockInventorySeparatingValues | | | Special Stock Inventory Separating Values | | | Details | | | |
| | ProjectUUID | E | Special Stock Inventory Separating Values | Project | Universally Unique | Identifier | GDT | UUID | 0..1 |
| | ProjectID | E | Special Stock Inventory Separating Values | Project | | Identifier | GDT | ProjectID | 0..1 |
| | OutboundDeliveryItemUUID | E | Special Stock Inventory Separating Values | Outbound Delivery | Universally Unique | Identifier | GDT | UUID | 0..1 |
| | OutboundDeliveryReference | E | Special Stock Inventory Separating Values | Outbound Delivery Reference | | Details | GDT | BusinessTransactionDocumentReference | 0..1 |
| | InboundDeliveryItemUUID | E | Special Stock Inventory Separating Values | Inbound Delivery Item | Universally Unique | Identifier | GDT | UUID | 0..1 |

-continued

| GDT | | Cat. | Object Class | Property | Rep./Ass. Qual. | Rep./ Ass. | Type | Type Name | Card. |
|---|---|---|---|---|---|---|---|---|---|
| | Inbound-Delivery-Reference | E | Special Stock Inventory Separating Values | Inbound Delivery Reference | | Details | GDT | Business-Transac-tionDocu-mentRefer-ence | 0..1 |
| | Material-Inspection-UUID | E | Special Stock Inventory Separating Values | Material Inspection | Universally Unique | Identifier | GDT | UUID | 0..1 |
| | Material-Inspection-ID | E | Special Stock Inventory Separating Values | Material Inspection Identifi-cation | | Identifier | GDT | Business-Transac-tionDocu-mentID | 0..1 |

SpecialStockInventorySeparatingValues may contain the following elements: ProjectUUID (i.e., global identifier for a project used to separate inventory. A project can be a business plan with a goal that can be attained in a specified time frame), ProjectID (i.e., Identifier for a project used to separate inventory. A project can be a business plan with a goal that can be attained in a specified time frame), OutboundDeliveryItemUUID (i.e., global identifier for an item of an outbound delivery used to separate inventory. An outbound delivery can be considered a grouping of goods that are provided for shipping), OutboundDeliveryReference (i.e., Identifier for an outbound delivery and delivery item used to separate inventory. An outbound delivery can be considered a grouping of goods that can be provided for shipping), InboundDeliveryItemUUID (i.e., global identifier for an inbound delivery item used to separate inventory. An inbound delivery can be a grouping of goods that can be used for a different business purpose after shipping), InboundDeliveryReference (i.e., Identifier for an inbound delivery and delivery item used to separate inventory. An inbound delivery can be a grouping of goods that are used for a different business purpose after shipping), MaterialInspectionUUID (i.e., global identifier for a material inspection used to separate inventory. A material inspection can be the designation given to the execution and documentation of the inspection for a particular material), MaterialInspectionID (i.e., identifier for a material inspection used to separate inventory. A material inspection can be the designation given to the execution and documentation of the inspection for a particular material).

If the elements ProjectUUID and ProjectID can both be set, the same project can be referenced. If the elements OutboundDeliveryItemUUID and OutboundDeliveryReference can both be set, the same outbound delivery project can be referenced. If the elements InboundDeliveryItemUUID and InboundDeliveryReference can both be set, the same inbound delivery project can be referenced. If the elements MaterialInspectionUUID and MaterialInspectionID can both be set, the same project can be referenced. The outbound delivery and inbound delivery elements cannot be set together.

The SpecialStockInventorySeparatingValues can be an optional inventory separating attributes. They can be used to separate inventory that is assigned a process or document and cannot be used for other logistics processes.

StartEndCode

The coded representation for the start or the end of something. In logistics, for example, "something" can stand for a process segment. An example of StartEndCode is:

<StartEndCode>1</StartEndCode>

In certain implementations, StartEndCode may have the following structure:

| GDT | Object Class | Represen-tation/As-sociation | Type | Type Name | Len. | Re-marks |
|---|---|---|---|---|---|---|
| StartendCode | Start End | Code | CDT | Code | 1..2 | Restricted |

A fixed code list can be assigned to the StartEndCode. The attributes can be as follows: listID="10133," listAgencyID="310," listVersionID=Version of the relevant code list.

The code list and its values may include the following: 1 (i.e., Start), 2 (i.e., finish). The StartEndCode is used, for example, in the bill of operations to indicate the start and the end of a processing path.

StatisticalErrorMeasurementCode

A StatisticalErrorMeasurementCode represents, in the form of a code, the error measurement method of a forecast. In the statistic, a forecast can be rated using precisely defined error measurement methods. An example of StatisticalErrorMeasurementCode is:

<StatisticalErrorMeasurementCode>1</StatisticalErrorMeasurementCode>

In certain implementations, StatisticalErrorMeasurementCode may have the following structure:

| GDT | Object Class | Represen-tation/As-sociation | Type | Type Name | Len. | Remarks |
|---|---|---|---|---|---|---|
| Statisti-calError-Measure-mentCode | Statisti-calError-Measure-ment | Code | CDT | Code | 1..2 | Restricted |

A fixed code list can be assigned to the code. The StatisticalErrorMeasurementCode may currently be used in Business Objects.

The GDT StatisticalErrorMeasurementCode can be used to compare different forecast models in order to get the model with the highest grade.

The StatisticalErrorMeasurementCode can be mapped in my SCM through the DDIC data element /APO/FLG__56 "Error Measure" with domain /APO/FLG__56.

The code list may have the following values: 1 (i.e., MAD (i.e., Mean absolute deviation)), 2 (i.e., ET (i.e., Error total)), 3 (i.e., MAPE (i.e., Mean absolute percentage error)), 4 (i.e., MSE (i.e., Mean square error)), 5 (i.e., RMSE (i.e., Root of the mean square error)), 6 (i.e., MPE (i.e., Mean percentage error)).

StatisticalOutlierCorrectionMethodCode

A StatisticalOutlierCorrectionMethodCode is the coded representation of the procedure to correct statistical outliers. A statistical outlier can be an historical value in a time series that lies outside the expected range of values. Statistical outliers may lead to incorrect forecast results. An example of StatisticalOutlierCorrectionMethodCode is:

<StatisticalOutlierCorrectionMethodCode>1</StatisticalOutlierCorrectionMethodCode>

In certain implementations, StatisticalOutlierCorrectionMethodCode may have the following structure:

A fixed code list can be assigned to the code. The StatisticalOutlierCorrectionMethodCode may currently be used in BOs. The GDT StatisticalOutlierCorrectionMethodCode can be used

| GDT | Object Class | Representation/Association | Type | Type Name | Len. | Remarks |
|---|---|---|---|---|---|---|
| Statistical-OutlierCorrectionMethodCode | Statistical Outlier Correction Method | Code | CDT | Code | 1..2 | Restricted |

to get the method for outlier correction in a forecast.

The StatisticalOutlierCorrectionMethodCode can be mapped in my SCM through the DDIC data element /APO/FLGEXC "Outlier Correction "with domain /APO/FLGEXC.

The code list may include the following values: 1 (i.e., None (i.e., Outlier correction is not used), 2 (i.e., Median (i.e., The median method is used for outlier correction), 3 (i.e., ExPost (i.e., The ex-post method is used for outlier correction).

StatisticalOutlierCorrectionSigmaValue

A StatisticalOutlierCorrectionSigmaValue is a number that specifies the scope of a tolerance range in which values contained in a time series are not corrected as outliers. With statistical forecasts, future values can be calculated from a time series using historical values. By correcting statistical outliers in historical values, the quality of the forecast can be increased. An example of StatisticalOutlierCorrectionSigmaValue is:

<StatisticalOutlierCorrectionSigmaValue>2.0</StatisticalOutlierCorrectionSigmaValue>

In certain implementations, StatisticalOutlierCorrectionSigmaValue may have the following structure:

| GDT | Object Class | Property | Rep./Ass. | Type | Type Name | Len. |
|---|---|---|---|---|---|---|
| Statistical-Outlier-Correction-SigmaValue | Statistical Outlier Correction | Sigma | Value | GDT | Numeric | 1.2 |

The StatisticalOutlierCorrectionSigmaValue can be a non-negative decimal numeral.

StatisticalSmoothing

StatisticalSmoothing is smoothing in a statistical forecast model. Forecast models with smoothing may improve the accuracy of forecasts by not taking into account extreme changes in historical data. An example of StatisticalSmoothing is:

<StatisticalSmoothing>
<FactorValue>0.4</FactorValue>
<FactorUpperBoundaryValue>0.7</FactorUpperBoundaryValue>
<FactorLowerBoundaryValue>0.3</FactorLowerBoundaryValue>
<FactorIncrementValue>0.1</FactorIncrementValue>
</StatisticalSmoothing>

In certain implementations, StatisticalSmoothing may have the following structure:

| GDT | | Cat. | Object Class | Property | Rep./Ass. | Type | Type Name | Card. |
|---|---|---|---|---|---|---|---|---|
| Statistical-Smoothing | | | Statistical-Smoothing | | | | | |
| | Factor-Value | E | Statistical-Smoothing | Factor | Value | GDT | Statistical-Smoothing-FactorValue | 1 |
| | FactorUpper-Boundary-Value | E | Statistical-Smoothing | Factor-Upper-Boundary | Value | GDT | Statistical-Smoothing-FactorUpper-BoundaryValue | 0..1 |
| | FactorLower-Boundary-Value | E | Statistical-Smoothing | Factor Lower Boundary | Value | GDT | Statistical-Smoothing-FactorLower-BoundaryValue | 0..1 |
| | FactorIncrement-Value | E | Statistical-Smoothing | Factor-Increment | Value | GDT | Statistical-Smoothing-FactorIncrement-Value | 0..1 |

The GDT StatisticalSmoothing may contain the following elements: FactorValue (i.e., the value that defines the smoothing), FactorUpperBoundaryValue (i.e., the upper boundary of the value range for the SmoothingFactor), FactorLowerBoundaryValue (i.e., the lower boundary of the value range for the SmoothingFactor), FactorIncrementValue (i.e., the increment within the value range for the SmoothingFactor). All four elements can be non-negative decimal numerals within a closed range [0;1].

FactorUpperBoundaryValue, FactorLowerBoundaryValue and FactorIncrementValue may be specified when fixing a value range for FactorValue. The value of FactorUpperBoundaryValue can be greater than the value for FactorLowerBoundaryValue.

FactorValue may be used as described: Smoothing factor for basic value in the constant model with exponential smoothing first order, for example 0.4. FactorUpperBoundaryValue may be used as described: Upper boundary for FactorValue, for example 0.7. FactorLowerBoundaryValue may be used as described: Lower boundary for FactorValue, for example 0.3. FactorIncrementValue may be used as described: Increment for FactorValue, for example 0.1

The following decimal values are specified for the FactorValue: 0.3, 0.4, 0.5, 0.6, 0.7

StatisticalSmoothingFactorIncrementValue

A StatisticalSmoothingFactorIncrementValue is a number that specifies the increment for the smoothing factor in a statistical forecast model. Forecast models with smoothing may improve the accuracy of forecasts by not taking into account extreme changes in historical data. An example of StatisticalSmoothingFactorIncrementValue is:

<StatisticalSmoothingFactorIncrementValue>0.1</StatisticalSmoothingFactorIncrementValue>

In certain implementations, StatisticalSmoothingFactorIncrementValue may have the following structure:

| GDT | Object Class | Property | Rep./Ass. Qual. | Rep./ Ass. | Type | Type Name | Len. | Card. |
|---|---|---|---|---|---|---|---|---|
| StatisticalSmoothing-FactorIncrementValue | Statistical Smoothing | Factor Increment | | Value | GDT | Numeric | 1.2 | 1 |

StatisticalSmoothingFactorIncrementValue can be a non-negative decimal numeral within a closed range [0.1].

StatisticalSmoothingFactorLowerBoundaryValue

A StatisticalSmoothingFactorLowerBoundaryValue is a number that specifies the lower boundary value for the smoothing factor in a statistical forecast model. Forecast models with smoothing may improve the accuracy of forecasts by not taking into account extreme changes in historical data. An example of StatisticalSmoothingFactorLowerBoundaryValue is:

<StatisticalSmoothingFactorLowerBoundaryValue>0.3</StatisticalSmoothingFactorLowerBoundaryValue>

In certain implementations, StatisticalSmoothingFactorLowerBoundaryValue may have the following structure:

| GDT | Object Class | Property | Rep./ Ass. | Type | Type Name | Len. | Card. |
|---|---|---|---|---|---|---|---|
| Statistical-Smoothing-FactorLow-erBoundary-Value | Statistical Smooth-ing | Factor Lower Boundary. | Value | GDT | Numeric | 1.2 | 1 |

StatisticalSmoothingFactorLowerBoundaryValue can be a non-negative decimal number within a closed range [0.1].

StatisticalSmoothingFactorUpperBoundaryValue

A StatisticalSmoothingFactorUpperBoundaryValue is a number that specifies the upper boundary value for the smoothing factor in a statistical forecast model. Forecast models with smoothing may improve the accuracy of forecasts by not taking into account extreme changes in historical data. An example of StatisticalSmoothingFactorUpperBoundaryValue is:

<StatisticalSmoothingFactorUpperBoundaryValue>0.3</StatisticalSmoothingFactorUpperBoundaryValue>

In certain implementations, StatisticalSmoothingFactorUpperBoundaryValue may have the following structure:

| GDT | Object Class | Property | Rep./ Ass. | Type | Type Name | Len. | Card. |
|---|---|---|---|---|---|---|---|
| StatisticalSmoothingFactorUpper-BoundaryValue | Statistical Smoothing | Factor Upper Bound-ary. | Value | GDT | Numeric | 1.2 | 1 |

StatisticalSmoothingFactorUpperBoundaryValue can be a non-negative decimal numeral within a closed range [0,1].

StatisticalSmoothingFactorValue

A StatisticalSmoothingFactorValue is a number that specifies the smoothing factor in a statistical forecast model. Forecast models with smoothing may improve the accuracy of forecasts by not taking into account extreme changes in historical data. An example of StatisticalSmoothingFactorValue is:

<StatisticalSmoothingFactorValue>0.3</StatisticalSmoothingFactorValue>

In certain implementations StatisticalSmoothingFactorValue may have the following structure:

| GDT | Object Class | Property | Rep./ Ass. | Type | Type Name | Len. | Card. |
|---|---|---|---|---|---|---|---|
| StatisticalSmoothingFactorValue | Statistical Smoothing | Factor | Value | GDT | Numeric | 1.2 | 1 |

StatisticalSmoothingFactorValue can be a non-negative decimal numeral within a closed range [0.1].

StatisticalTrendDampeningValue

A StatisticalTrendDampeningValue is a number that specifies the extent to which a statistical trend is dampened. With statistical forecasts, future values can be calculated from a time series using historical values. These forecasted values may demonstrate a trend, which can be diminished by specifying a dampening value. An example of StatisticalTrendDampeningValue is:

<StatisticalTrendDampeningValue>2.0</StatisticalTrendDampeningValue>

In certain implementations, StatisticalTrendDampeningValue may have the following structure:

| GDT | Cat. | Property | Rep./ Ass. | Type | Type Name | Len. | Card. |
|---|---|---|---|---|---|---|---|
| StatisticalTrendDampeningValue | E | Statistical Trend Dampening | Value | GDT | Numeric | 1.2 | 1 |

StatisticalTrendDampeningValue can be a non-negative decimal numeral.

StatutoryAccommodationReimbursementExpenseReporterGroupCode

A StatutoryAccommodationReimbursementExpenseReporterGroupCode is the coded representation of a group of expense reporters to whom the same statutory or contractual expense regulations apply regarding the reimbursement of accommodation expenses. An example of StatutoryAccommodationReimbursementExpenseReporterGroupCode is:

<StatutoryAccommodationReimbursementExpenseReporterGroupCode>1</StatutoryAccommodationReimbursementExpenseReporterGroupCode>

In certain implementations, StatutoryAccommodationReimbursementExpenseReporterGroupCode may have the following structure:

| GDT | Object Class | Representation/ Association | Type | Type Name | Len. | Remarks |
|---|---|---|---|---|---|---|
| StatutoryAccommodationReimbursementExpenseReporterGroupCode | Statutory_ Accommodation Reimbursement_ Expense Reporter Group | Code | CDT | Code | 1..2 | restricted |

The value range of StatutoryAccommodationReimbursementExpenseReporterGroupCode may consist of a customer-specific code list.

StatutoryAccommodationReimbursementExpenseReporterGroupCode can currently be used in BOs. Examples of possible semantics of the codes for StatutoryAccommodationReimbursementExpenseReporterGroupCodes may include the four employee groups of the Italian banking collective agreement with a per diem that varies according to the employee hierarchy level: 1: area professionale (i.e., Employee hierarchy level 1), 2: area professionals 1. e 2. Livello retributive (i.e., Employee hierarchy level 2), 3: area professionale e 2. area professionals 3. Livello retributive (i.e., Employee hierarchy level 3), 4: Quadri Direttivi 1.-4. Livello (i.e., Employee hierarchy level 4).

For StatutoryAccommodationReimbursementExpenseReporterGroupCode there can be a corresponding EnterpriseAccommodationReimbursementExpenseReporterGroupCode as the coded representation of a group of expense reporters to whom the same company-specific expense regulations apply regarding the reimbursement of accommodation expenses.

StatutoryMealsReimbursementExpenseReporterGroupCode

A StatutoryMealsReimbursementExpenseReporterGroupCode is the coded representation of a group of expense reporters to whom the same statutory or contractual expense regulations apply regarding the reimbursement of meal expenses. An example of StatutoryMealsReimbursementExpenseReporterGroupCode is:

<StatutoryMealsReimbursementExpenseReporterGroupCode>1</StatutoryMealsReimbursementExpenseReporterGroupCode>

In certain implementations, StatutoryMealsReimbursementExpenseReporterGroupCode may have the following structure:

| GDT | Object Class | Representation/Association | Type | Type Name | Len. | Remarks |
|---|---|---|---|---|---|---|
| StatutoryMealsReimbursementExpenseReporterGroupCode | Statutory_ Meals Reimbursement_ Expense Reporter Group | Code | CDT | Code | 1..2 | restricted |

-

The value range of StatutoryMealsReimbursementExpenseReporterGroupCode may consist of a customer-specific code list.

StatutoryMealsReimbursementExpenseReporterGroupCode can currently be used in BOs.

Examples of StatutoryAccommodationReimbursementExpenseReporterGroupCodes code semantics include the four employee groups of the Italian banking collective agreement with a per diem that varies according to the employee hierarchy level: 1: area professionale (i.e., Employee hierarchy level 1), 2: area professionals 1. e 2. Livello retributive (i.e., Employee hierarchy level 2), 3: area professionale e 2. area professionals 3. Livello retributive (i.e., Employee hierarchy level 3), Quadri Direttivi 1.-4. Livello (i.e., Employee hierarchy level 4).

For StatutoryMealsReimbursementExpenseReporterGroupCode there can be a corresponding EnterpriseMealsReimbursementExpenseReporterGroupCode as the coded representation of a group of expense reporters to whom the same company-specific expense regulations apply regarding the reimbursement of meal expenses.

StatutoryMileageReimbursementExpenseReporterGroupCode

A StatutoryMileageReimbursementExpenseReporterGroupCode is the coded representation of a group of expense reporters to whom the same statutory or contractual expense regulations apply regarding the reimbursement of travel costs. An example of StatutoryMileageReimbursementExpenseReporterGroupCode is:

<StatutoryMileageReimbursementExpenseReporterGroupCode>1</StatutoryMileageReimbursementExpenseReporterGroupCode>

In certain implementations, StatutoryMileageReimbursementExpenseReporterGroupCode may have the following structure:

| GDT | Object Class | Representation/Association | Type | Type Name | Len. | Remarks |
|---|---|---|---|---|---|---|
| StatutoryMileageReimbursementExpenseReporterGroupCode | Statutory_ Mileage Reimbursement_ Expense Reporter Group | Code | CDT | Code | 1..2 | restricted |

The value range of StatutoryMileageReimbursementExpenseReporterGroupCode may consist of a customer-specific code list.

StatutoryMileageReimbursementExpenseReporterGroupCode can currently be used in BOs.

Examples of the possible semantics of the codes include the two employee groups of the Italian banking collective agreement: Group of employees who are allowed to use a private automobile and Group of employees who are not allowed to use a private automobile (e.g., no reimbursement of travel costs).

For StatutoryMileageReimbursementExpenseReporterGroupCode there can be a corresponding EnterpriseMileageReimbursementExpenseReporterGroupCode as the coded representation of a group of expense reporters to whom the same company-specific expense regulations apply regarding the reimbursement of travel costs.

StorageBehaviourMethodID

A StorageBehaviourMethodID is an identifier in the system for a Storage Behaviour Method. Storage Behaviour Method can be a set of rules that defines the manner in which a storage location is managed. In certain implementations, StorageBehaviorMethodID may be restricted to include Business Objects but not A2A-Messages or B2B-Messages An example of StorageBehaviourMethodID is:

<StorageBehaviourMethodID>1234567890</StorageBehaviourMethodID>

Another example of StorageBehaviourMethodID is:

<StorageBehaviourMethodID>BulkForElectronics</StorageBehaviourMethodID>

In certain implementations, StorageBehaviourMethodID may have the following structure:

| GDT | Object Class | Property | Representation/ Association | Type | Type Name | Len. | Remarks |
|---|---|---|---|---|---|---|---|
| StorageBehaviourMethodID | StorageBehaviourMethod | Identification | Identifier | CDT | Identifier | 1..40 | restricted |

StorageLocationBlockingStatusCode

A StorageLocationBlockingStatusCode is a coded representation of the blocking status of a storage location. A storage location can be a resource or a logistics area. An example of StorageLocationBlockingStatusCode is:

<StorageLocationBlockingStatusCode>1</StorageLocationBlockingStatusCode>

In certain implementations, StorageLocationBlockingStatusCode may have the following structure:

| GDT | | Cat. | Object Class | Property | Representation/ Association | Type | Type Name | Len. | Card. | Remarks |
|---|---|---|---|---|---|---|---|---|---|---|
| StorageLocationBlockingStatusCode | | | Storage Location | Blocking Status | Code | CDT | Code | 1..2 | | restricted |
| | listID | A | Code List | Identification | Identifier | xsd | token | | 0..1 | |
| | listAgencyID | A | Code List Agency | Identification | Identifier | xsd | Token | | 0..1 | |
| | listVersionID | A | Code List | Version | Identifier | xsd | Token | | 0..1 | |
| | listAgency-SchemeID | A | Code List Agency | Scheme | Identifier | xsd | Token | | 0..1 | |
| | listAgency-Scheme AgencyID | A | Code List Agency | Scheme Agency | Identifier | xsd | Token | | 0..1 | |

An extensible code list can be assigned to the StorageLocationBlockingStatusCode. A customer can change this code list.

The code list and its values may include the following: 1 (i.e., Not Blocked (i.e., The storage location is not blocked and can be used), 2 (i.e., Blocked (i.e., The storage location is blocked and cannot be used for any purpose), 3 (i.e., Blocked for Picking (i.e., The storage location is blocked for picking and cannot be used for picking purposes), 4 (i.e., Blocked for Putaway (i.e., The storage location is blocked for putaway and cannot be used for putaway purposes).

In the previously described structure, the attributes may be defined as follows: listID=ID of the particular code list (e.g., 10385), listAgencyID=If the code list remains unchanged, list agency ID is "310"; if a user creates his code list during configuration, list agency ID is the ID of the code user (i.e., ID from DE 3055, if listed there), listVersionID=If the code list remains unchanged, list version ID is the version of the particular code list can be assigned; if a user creates his code list during configuration, list version ID is the version of particular code list assigned and managed by the code user, listAgencySchemeID=If a user of this code creates his code list during configuration, list agency scheme ID is the ID of the scheme if the listAgencyID does not come from DE 3055, listAgencySchemeAgencyID=If a user of this code creates his code list during configuration, list agency scheme agency Id is the ID of the organization from DE 3055 that manages the listAgencySchemeID scheme.

StorageLocationBlockingStatusCode can be used by the StorageControl DO to indicate the status of a storage location in order to restrict or allow access to the storage location. It may assist in carrying out tasks efficiently.

Examples for customer-specific code semantics include: Blocked for Inventory Count (i.e., The storage location is blocked for inventory count and cannot be used for inventory counting purposes).

StorageLocationInventoryItemAssignmentMethodCode

A StorageLocationInventoryItemAssignmentMethodCode is a coded representation of an assignment method of an inventory item to a storage location. An inventory item can be a material or a logistic unit, or a group of materials or logistic units. A storage location can be a resource or a logistics area. An example of StorageLocationInventoryItemAssignmentMethodCode is:

<StorageLocationInventoryItemAssignmentMethodCode listAgencyID=310>1</StorageLocationInventoryItemAssignmentMethodCode>

In certain implementations, StorageLocationInventoryItemAssignmentMethodCode may have the following structure:

| GDT | | Cat. | Object Class | Property | Representation/Association | Type | Type Name | Len. | Card. |
|---|---|---|---|---|---|---|---|---|---|
| StorageLocationInventoryItemAssignmentMethodCode | | | Storage Location Inventory Item | Assignment Method | Code | CDT | Code | 1..2 | |
| | listID | A | Code List | Identification | Identifier | xsd | token | | 0..1 |
| | listAgencyID | A | Code List Agency | Identification | Identifier | xsd | token | | 0..1 |
| | listVersionID | A | Code List | Version | Identifier | xsd | token | | 0..1 |
| | listAgencySchemeID | A | Code List Agency | Scheme | Identifier | xsd | token | | 0..1 |
| | listAgencySchemeAgencyID | A | Code List Agency | Scheme Agency | Identifier | xsd | token | | 0..1 |

An extensible code list can be assigned to the StorageLocationInventoryItemAssignmentMethodCode. A customer can change this code list.

The code list and its values may include the following: 1 (i.e., Fixed Assignment (i.e., The storage location method may assign the first inventory item put in the storage location to the storage location)), 2 (i.e., Dynamic Assignment (i.e., The storage location method may assign inventory item to the storage location. The Inventory Item should be assigned to the storage location dynamically. Every time an inventory item is put in an empty storage location the inventory item can be assigned to the storage location)), 3 (i.e., Arbitrary (i.e., The storage location method does not assign any item to the storage location)).

In the previously described structure, the following may be defined as: listID=ID of the particular code list (e.g., 10436), listAgencyID=If the code list remains unchanged, list agency ID is "310"; if a user creates his code list during configuration, list agency ID is the ID of the code user (e.g., ID from DE 3055, if listed there), listVersionID=If the code list remains unchanged, list version ID is the version of the particular code list assigned; if a user creates his code list during configuration, list version ID is the version of particular code list assigned and managed by the code user), listAgencySchemeID=If a user of this code creates his code list during configuration, list agency scheme ID is the ID of the scheme if the listAgencyID does not come from DE 3055, listAgencySchemeAgencyID=If a user of this code creates his code list during configuration, list agency scheme agency Id is the ID of the organization from DE 3055 that manages the listAgencySchemeID scheme.

StorageLocationInventoryItemAssignmentMethodCode can be used by the storage control in order to determine when an inventory item is to be designated (may be stored) for a storage location. A storage control may specify for a storage location a StorageBehaviourMethod and requirements for actions (i.e. replenishment, cleanup) on this storage location. Additionally it can be specified which materials and logistic units may be stored in the storage location.

Examples for customer-specific code semantics include: Dynamic Double Assignment (i.e., The Inventory Item should be assigned to the storage location dynamically. Every time an inventory item is put in a storage location the inventory item is assigned to the storage location. No more than two types of inventory items can be assigned to one storage location concurrently.).

StreetName

A StreetName is a word or combination of words that describe(s) a street name. An example of StreetName is:

<StreetName>Dietmar-Hopp-Allee</StreetName>

In certain implementations, StreetName may have the following structure:

| GDT | Property | Representation / Association | Type | Type Name | Len. | Card. | Remarks |
|---|---|---|---|---|---|---|---|
| StreetName | Street | Name | GDT | Name | 1..60 | 0..1 | restricted |

StreetName may not be language dependent. The data type StreetName can be used in postal addresses.

In certain implementations, the following dictionary objects can be assigned to this GDT: Data element: AD_STREET, Domain: TEXT60.

SubjectAreaCode

The SubjectAreaCode is a coded representation of a subject area. An example of Sub-jectAreaCode is:

<SubjectAreaCode>25.040.40</SubjectAreaCode>

In the previous example, 25.040.40 stands for 'Industrial process measurement and control'; this classifies ISO13584/42, for example, where the property is defined.

In certain implementations, SubjectAreaCode may have the following structure:

| GDT | Object Class | Representation/ Association | Type | Type Name | Len. | Remarks |
|---|---|---|---|---|---|---|
| SubjectArea Code | Subject Area | Code | CDT | Code | 9 | restricted |

The possible values for the GDT SubjectAreaCode can be found in the 'International Classification for Standards' (ICS). These standards may have been created under the overall control of ISO.

GDT SubjectAreaCode can be used for: Classifying normative documents and standardized objects and Classifying an object, e.g., a property, into subject areas.

SubledgerAccountChargeTypeCode

A SubledgerAccountChargeTypeCode is the coded representation of the type of debit or credit of a subledger account. An example of SubledgerAccountChargeTypeCode is:

<SubledgerAccountChargeTypeCode>1</SubledgerAccountChargeTypeCode>

In certain implementations, SubledgerAccountChargeTypeCode may have the following structure:

| GDT | Object Class | Property | Representation/ Association | Type | Type Name | Len. | Remarks |
|---|---|---|---|---|---|---|---|
| SubledgerAccountChargeTypeCode | Subledger Account | Charge_ Type | Code | CDT | Code | 1..3 | restricted |

The SubledgerAccountChargeTypeCode can be a fixed code list. The attributes may be defined as follows: listID="10112," listAgencyID="310," listVersionID can be the version of the relevant code list.

The code list and its values may include the following: 1 (i.e., Credit (i.e., A credit on the subledger account that is not one of the types described by the other codes), 2 (i.e., Debit (i.e., A debit on the subledger account), 3 (i.e., Credit from Goods Receipt (i.e., A credit on the subledger account that resulted from a goods receipt), 4 (i.e., Credit from Clearing (i.e., A credit on the subledger account that resulted from a clearing run).

SubledgerAccountChargeTypeCode can be used to describe the type of debit or credit in different subledger accounts. SubledgerAccountChargeTypeCode may correspond to the fixed values for domain FIN_CHARGEIND in my ERP.

SubledgerAccountGranularityCode

A SubledgerAccountGranularityCode is the coded representation of a granularity of a subledger account. A granularity of a subledger account can establish additional criteria besides the company that serve to differentiate the SubledgerAccounts (such as material and batch for a MaterialSubledgerAccount). An example of SubledgerAccountGranularityCode is:

<SubledgerAccountGranularityCode>1</SubledgerAccountGranularityCode>

In certain implementations, SubledgerAccountGranularityCode may have the following structure:

| GDT | Object Class | Representation/ Association | Type | Type Name | Len. |
|---|---|---|---|---|---|
| SubledgerAccountGranularityCode | Subledger Account Granularity | Code | CDT | Code | 1..3 |

A code list can be allowed for a SubledgerAccountGranularityCode. This code list can be supplied and may not be changed by the customer.

The attributes of the CDT identifier can be defined as follows: listID="10068," listAgencyID="310," listVersionID can be the version of the code list.

The code list may include the following: 1 (i.e., Material/LogisticsDivision (The subledger granularity Material/LogisticsDivision establishes the criteria Company, Material, and LogisticsDivision to differentiate SubledgerAccounts).

In the root node of the business object MaterialSubledgerAccount, the element GranularityCode of type SubledgerAccountGranularityCode may indicate which elements of the root node form the semantic key of a business object instance.

SubledgerAccountLineItemTypeCode

A SubledgerAccountLineItemTypeCode is the coded representation of the type of line item of a subledger account. The line items of the subledger accounts can be generated during the posting of business transactions. An example of SubledgerAccountLineItemTypeCode is:

<SubledgerAccountLineItemTypeCode>5001</SubledgerAccountLineItemTypeCode>

In certain implementations, SubledgerAccountLineItemTypeCode may have the following structure:

| GDT | Object Class | Property | Representation/ Association | Type | Type Name | Len. | Remarks |
|---|---|---|---|---|---|---|---|
| SubledgerAccountLineItemTypeCode | Subledger Account Line Item | Type | Code | CDT | Code | 4..5 | restricted |

SubledgerAccountLineItemTypeCode can be a fixed code list. The attributes of the CDT identifier can have the following values: listID="10069," listAgencyID="310," listVersionID=Version of the relevant code list. Assigned and managed by AG.

The code list and its values may include the following: AccountsReceivableLineItem (i.e., A customer line item is the representation of a change in value regarding a business partner who is in an accounts receivable relationship to your company), AccountsPayableLineItem (i.e., A vendor line item is the representation of a change in value regarding a business partner who is in an accounts payable relationship to your company).

The semantics for grouping code list entries might not be fixed. Applications may not use the semantics in their program logic.

SubledgerAccountLineItemTypeCode can be used, for example, to categorize the line items in the business object AccountsReceivablePayableSubledgerAccount. In certain implementations, each SubledgerAccountLineItemTypeCode can be assigned to one SubledgerAccount.

SubledgerAccountTypeCode

A SubledgerAccountTypeCode is the coded representation of the type of subledger. A subledger can be a disjoint subdivision of Financial Accounting. An example of SubledgerAccountTypeCode is:

<SubledgerAccountTypeCode>1</SubledgerAccountTypeCode>

In certain implementations, SubledgerAccountTypeCode may have the following structure:

| GDT | Object Class | Property | Representation/ Association | Type | Type Name | Len. | Remarks |
|---|---|---|---|---|---|---|---|
| SubledgerAccountTypeCode | Subledger Account | Type | Code | CDT | Code | 1..2 | restricted |

SubledgerAccountTypeCode can be a fixed code list.

The code list and its values may include the following: 1 (i.e., Fixed Asset (i.e., Subledger account for tangible assets and intangible assets), 2 (i.e., Material Subledger Account (i.e., Subledger account for materials), 3 (i.e., Work in Process Subledger Account (i.e., Subledger account for work in process), 4 (i.e., Purchasing in Process Subledger Account (i.e., Subledger account for purchase orders), 5 (i.e., Accounts Receivable Payable Subledger Account (i.e., Subledger account for customers and vendors), 6 (i.e., Tax Subledger Account (i.e., Subledger account for taxes), Sales-in-Process Subledger Account (i.e., Subledger account for sales processes), Overhead Costs (i.e., Subledger account for overhead costs).

The attributes of the CDT code can be filled with the following values: listID="10070," listAgencyID="310," listVersionID=Version of the relevant code list. Assigned and managed by AG.

SupervisoryBoardElectionEmployeeGroupCode

A SupervisoryBoardElectionEmployeeGroupCode is a coded representation of a group of employees which are treated equally in an election of the supervisory board. An example of SupervisoryBoardElectionEmployeeGroupCode is:

<SupervisoryBoardElectionEmployeeGroupCode listAgencyID="310">B</SupervisoryBoardElectionEmployeeGroupCode>

In certain implementations, SupervisoryBoardElectionEmployeeGroupCode may have the following structure:

| GDT | | Cat. | Object Class | Property | Representation/ Association | Type | Type Name | Len. | Card. | Remarks |
|---|---|---|---|---|---|---|---|---|---|---|
| Supervisory-BoardElection-Employee-GroupCode | | | Supervisory Board Election Employee Group | | Code | CDT | Code | 1 | | restricted |
| | listID | A | Code List | Identification | Identifier | xsd | token | | 0..1 | |
| | listAgencyID | A | Code List Agency | Identification | Identifier | xsd | token | | 0..1 | |
| | listVersionID | A | Code List | Version | Identifier | xsd | token | | 0..1 | |
| | listAgency-SchemeID | A | Code List Agency | Scheme | Identifier | xsd | token | | 0..1 | |
| | listAgency-SchemeAgencyID | A | Code List Agency | Scheme Agency | Identifier | xsd | token | | 0..1 | |

Several extensible, country-specific code lists, which can be different at runtime, can be assigned to the code. A user of this code can replace the code list with his or her one.

The individual code lists and the values and attributes may include the following: Code List for Country "FR" (listID="24201"): listID="24201," listAgencyID="FR," listAgencySchemeID="ISO 3166-1," listAgency-SchemeAgencyID="5" (ISO).

The code list may include the following values: Code A: (i.e., Workers), Code B: (i.e., Qualified workers), Code C: (i.e., Managers).

If a user creates his code list to replace an existing code list, the values assigned to the attributes can change as follows: listAgencyID=ID of the customer (i.e., ID from DE 3055, if listed there), listVersionID=version of the particular code list. Assigned and managed by the customer, listAgencySchemeID=ID of the scheme if the listAgencyID does not come from DE 3055, listAgencySchemeAgencyID may be an ID of the organization from DE 3055 that manages the listAgencySchemeID scheme.

The attributes may be defined as follows: listID (i.e., Please refer to section "Detailed Description and Value Ranges"), listAgencyID (i.e., Please refer to section "Detailed Description and Value Ranges"), listVersionID (i.e., Please refer to section "Detailed Description and Value Ranges"), listAgencySchemeID (i.e., Please refer to section "Detailed Description and Value Ranges"), listAgencySchemeAgencyID (i.e., Please refer to section "Detailed Description and Value Ranges").

Semantic examples of user-specific codes include using the code to determine the electoral group to which the employee belongs in the election of the supervisory board in France.

Data element R/3 may have the following value: P06_COLCE.

The SupervisoryBoardElectionEmployeeGroupCode may define a dependency or an environment in which the SupervisoryBoardElectionEmployeeGroupCode appears.

The environment can be described by context categories. With the context categories in SupervisoryBoardElection-EmployeeGroupCode ContextElements the valid portion of code values of SupervisoryBoardElectionEmployeeGroupCode can be restricted according to an environment during use. In certain implementations, Supervisory-BoardElectionEmployeeGroupCodeContextElements may have the following structure:

| GDT | Object Class | Representation/ Association |
|---|---|---|
| SupervisoryBoard-ElectionEmployee-GroupCode-ContextElements | Supervisory Board Election Employee Group Code Context Elements | Details |
| | Supervisory Board Election Employee Group Code Context Elements | Code |

The CountryCode context code may define the context country. It may determine the valid code values for a specific country.

SupplementarySickPayRuleCode

A SupplementarySickPayRuleCode is a coded representation of a Supplementary Sick Pay Rule. Supplementary Sick Pay Rule can be considered a rule that an employer follows for the calculation of supplementary employee pay, while he is sick and unable to attend work. It is not mandatory (not a legal requirement) and it can be company specific. The supplementary pay supplements the pay the employee receives from his/her health insurance. An example of SupplementarySickPayRuleCode is:

<SupplementarySickPayRuleCode>1</SupplementarySickPayRuleCode>

In certain implementations, SupplementarySickPayRuleCode may have the following structure:

| GDT | Cat. | Object Class | Property | Representation/ Association | Type | Type Name | Len. | Card. | Remarks |
|---|---|---|---|---|---|---|---|---|---|
| Supplementary-SickPay-RuleCode | | Supplementary Sick Pay Rule | | Code | CDT | Code | 1..2 | | restricted |

-continued

| GDT | | Cat. | Object Class | Property | Representation/ Association | Type | Type Name | Len. | Card. | Remarks |
|---|---|---|---|---|---|---|---|---|---|---|
| | listAgencyID | A | Code List Agency | Identification | Identifier | xsd | token | | 0..1 | |
| | listVersionID | A | Code List | Version | Identifier | xsd | token | | 0..1 | |
| | listAgency-SchemeID | A | Code List Agency | Scheme | Identifier | xsd | token | | 0..1 | |
| | listAgency-SchemeAgencyID | A | Code List Agency | Scheme Agency | Identifier | xsd | token | | 0..1 | |

A customer-specific code list can be assigned to the code. A customer can determine the codes in the code list. Apart from being customer-specific, it could also be county specific.

The attributes of the code can be assigned the following values: listID—ID of a country specific code list; assigned by a customer from the number Range 50100-50199, listAgencyID=ID of the customer (i.e., ID from DE 3055, if listed there), listVersionID=version of the particular code list, assigned and managed by the customer, listAgencySchemeID=ID of the scheme if the listAgencyID does not come from DE 3055, listAgencySchemeAgencyID may be an ID of the organization from DE 3055 that manages the listAgencySchemeID scheme.

The attributes may include the following: listID, listAgencyID, listVersionID, listAgencySchemeID, listAgencySchemeAgencyID. The Customer could specify country-specific pay rules for calculation of their employee pay while they are sick and unable to attend work. Semantic examples of customer-specific codes for different countries include the following: Six Months 80%—The pay rule defines that the employee is eligible to get paid, 80% of his salary if he is sick for six months and is unable to attend work.

SupplementarySickPayRuleCodeContextElements

The SupplementarySickPayRuleCodeContextElements defines a dependency or an environment in which the SupplementarySickPayRuleCode appears. The environment is described by context categories. With the context categories in SupplementarySickPayRuleCodeContextElements, the valid portion of code values of SupplementarySickPayRuleCode can be defined by the customer and may be restricted according to an environment during use. An example of GDT SupplementarySickPayRuleCodeContextElements is:

<SupplementarySickPayRuleCode>1</SupplementarySickPayRuleCode>

In certain implementations SupplementarySickPayRuleCodeContextElements may have the following structure:

| GDT | | Cat. | Object Class | Property | Representation/ Association | Type | Type Name | Card. |
|---|---|---|---|---|---|---|---|---|
| Supplementary-Sick-PayRule CodeContext-Elements | | | Supplementary-Sick-PayRule-CodeContext-Elements | | Details | | | |
| | Country-Code | E | Supplementary-Sick-PayRule-CodeContext-Elements | Country | Code | GDT | Country-Code | 0..1 |

The CountryCode context category may define the context country. It can determine the customer-specific valid code values for a specific country.

SupplierInvoiceGroupingCriterionCode

A SupplierInvoiceGroupingCriterionCode is the coded representation of a criterion to group supplier invoices. A Supplier Invoice may state the recipient's (usually the purchaser's) obligation to pay the supplier for goods received or services rendered. An example of SupplierInvoiceGroupingCriterionCode is:

<SupplierInvoiceGroupingCriterionCode>1</SupplierInvoiceGroupingCriterionCode>

In certain implementations, SupplierInvoiceGroupingCriterionCode may have the following structure:

| GDT | Object Class | Property | Representation/ Association | Type | Type Name | Len. | Remarks |
|---|---|---|---|---|---|---|---|
| Supplier-Invoice-Grouping-Criterion-Code | Supplier Invoice | Grouping Criterion | Code | CDT | Code | 1..2 | restricted |

A fixed code list can be assigned to the SupplierInvoiceGroupingCriterionCode. The attributes may have assigned values as follows: listID="10490," listAgencyID="310," listVersionID can be the version of the particular code list, which can be assigned and managed.

The code list and its values may include the following: 1 (i.e., BySupplier (i.e., Grouping by supplier)), 2 (i.e., ByPurchaseOrder (i.e., Grouping by purchase order)).

A SupplierInvoiceGroupingCriterionCode can be used to define further grouping criteria in addition to the process-specific grouping criteria for invoice items. Process-specific grouping criteria can be considered grouping criteria that can be considered within a business process for a grouping. Example of process-specific grouping criteria within an invoice item is the buyer party.

SupplyChainExceptionStatusCode

A GDT SupplyChainExceptionStatusCode is a coded representation for the status of an exception that occurs in the supply chain during logistics planning or logistics execution. An example of GDT SupplyChainExceptionStatusCode is:

<SupplyChainException>

<StatusCode>RESOLVED</StatusCode>

</SupplyChainException>

In certain implementations, GDT SupplyChainException-StatusCode may have the following structure:

| GDT | Object Class | Property | Representation/ Association | Type | Type Name | Len. | Remarks |
|---|---|---|---|---|---|---|---|
| SupplyChainException-StatusCode | Supply Chain Exception | Status | Code | CDT | Code | 1..15 | Restricted |

If multiple code lists are supported by GDT SupplyChain-ExceptionStatusCode, attribute values for schemeAgencyID may be specified to identify each individual code list. These may include, for example: schemeAgencyID="9" (EAN, International Article Numbering Association), or schemeAgencyID="113" (e.g., UCC, Uniform Code Council) International Numbering Association) from DE 3055.

GDT SupplyChainExceptionStatusCode may use the following codes: Acknowledged (i.e., the exception has been acknowledged), New (i.e., the exception is new), Resolved (i.e., the problem indicated by the exception has been resolved), Superseded (i.e., the original exception has been replaced by a modified exception), Unresolvable (i.e., the problem indicated by the exception cannot be resolved).

GDT SupplyChainExceptionStatusCode may be set to "NEW" in the initial transmission of an exception. The other possible code values may be transmitted for the status of an exception when subsequent changes are made. For example, if an exception with the status code "NEW" occurs for "production standstill" and this problem is then resolved, the status code of the exception is "RESOLVED" in a subsequent message.

SupplyChainExceptionTypeID

A GDT SupplyChainExceptionTypeID is an identifier for the various exception types that may occur in the supply chain during logistics planning and logistics execution. A type of supply chain exception may describe the (business) nature and basic features of the exception; the type definition may be based upon generally-accepted logistic key figures as well as industry-specific or proprietary business-specific criteria. Examples are "forecast deviation," "product shortage," "production standstill" or "delivery delay." A specific example of GDT SupplyChainExceptionTypeID is:

<SupplyChainException>

. . .

<TypeID schemeAgencyID="SCM_001">4711</TypeID>

. . .

</SupplyChainException>

In certain implementations, GDT SupplyChainException-TypeID may have the following structure:

GDT SupplyChainExceptionTypeID may use the following attributes: schemeAgencyID (i.e., business system which issued the ID). If the schemeAgencyID has not been specified, it may be necessary to determine it from the context. In certain implementations, if more than one identification scheme for GDT SupplyChainExceptionTypeID is supported, the attribute schemeID may be required.

In RosettaNet PIP 4A6 "NotifyOfForecastingException" the following code lists exists for different categories of SupplyChainExceptions: "ComparisonExceptionTypeCode," "IncidentExceptionTypeCode," "InformationException-TypeCode," and "ThresholdExceptionTypeCode." With the appropriate mapping, GDT SupplyChainExceptionTypeID may also cover these codes. However, since there are a great number of industry-specific or business-specific requirements for the occurring SupplyChainExceptions, GDT SupplyChainExceptionTypeID may use the identification concept and not the code list concept.

GDT SupplyChainExceptionTypeID may be used to describe the various exception types that can occur in the supply chain during logistics planning and logistics execution.

The EAN.UCC "Exception Notification" may be restricted to a general categorization of SupplyChainExceptions and does not use standardized code lists.

SupplyPlanningAreaID

A GDT SupplyPlanningAreaID is an identifier of a SupplyPlanningArea. A SupplyPlanningArea is an area in which planning is executed separately to guarantee the availability of products on time. To achieve this, the SupplyPlanningArea groups requirements, stocks, and further requirement coverage elements of a Location for consumption in the net requirements calculation in material requirements planning. An example of GDT SupplyPlanningAreaID is:

<SupplyPlanningAreaID>Hamburg</SupplyPlanningAreaID>

<SupplyPlanningAreaID>spare parts</SupplyPlanningAreaID>

In certain implementations, GDT SupplyPlanningAreaID may have the following structure:

| GDT | | Cat. | Object Class | Property | Representation/ Association | Type | Type Name | Len. | Card. | Remarks |
|---|---|---|---|---|---|---|---|---|---|---|
| SupplyChain-Exception-TypeID | | | SupplyChain-Exception | Type | Identifier Identification | CDT | Identifier | 1..4 | | Restricted |
| | scheme-AgencyID | A | Identification Scheme Agency | Identification- | Identifier | XS1D | Token | 1..60 | 0 ..1 | |

| GDT | Object Class | Property | Representation/ Association | Type | Type Name | Len. | Remarks |
|---|---|---|---|---|---|---|---|
| SupplyPlanning-AreaID | Supply Planning Area | Identification- | Identifier | CDT | Identifier | 1..20 | restricted- |

SupplyPlanningCostFunctionCode

A GDT SupplyPlanningCostFunctionCode is the coded representation of a cost function in procurement planning. The business cost function in procurement planning groups abstract costs for a particular quantity of a product. An example of GDT SupplyPlanningCostFunctionCode is:

<SupplyPlanningCostFunctionCode>1</SupplyPlanningCostFunctionCode>

In certain implementations, GDT SupplyPlanningCostFunctionCode may have the following structure:

| GDT | | Cat. | Object Class | Property | Representation Association | Type | Type Name | Len. | Card. | Remarks |
|---|---|---|---|---|---|---|---|---|---|---|
| Supply-Plannning-CostFunction-Code | | | Supply Planning_Cost Function | | Code | CDT | Code | 1..2 | | Restricted |
| | listAgencyID | A | Code List Agency | Identification | Identifier | xsd | Token | | 0..1 | |
| | listVersionID | A | Code List | Version | Identifier | xsd | Token | | 0..1 | |
| | listAgency-SchemeID | A | Code List Agency | Scheme | Identifier | xsd | Token | | 0..1 | |
| | listAgency-Scheme-AgencyID | A | Code List Agency | Scheme Agency | Identifier | xsd | Token | | 0..1 | |

GDT SupplyPlanningCostFunctionCode may be assigned a user-defined, customer-specific, code list. Attributes of the code may be as follows: listID may be 10303; listAgencyID may be the ID of the code user (e.g., ID from DE 3055 if listed there); listVersionID may be the Version of the particular code list assigned and managed by the customer; listAgency-SchemeID may be the ID of the scheme if the listAgencyID does not come from DE 3055; listAgencySchemeAgencyID may be the ID of the organization from DE 3055 that manages the listAgencySchemeID scheme.

A semantic example of a customer-specific code may be: TransportMaterial (i.e., cost function for the transport of material A). Note that such costs may be costs in an abstract sense and not from financial accounting or controlling.

In procurement planning, abstract costs may be assigned to sources of supply in order to weight these sources of supply. During source of supply determination, sources of supply may be selected on the basis of these costs. For example, in the business configuration settings, cost function may be defined for the materials that are to be procured. GDT SupplyPlanningCostFunctionCode may be used to identify cost functions of this type.

SupplyQuotaArrangementID

A GDT SupplyQuotaArrangementID is an identifier for a quota arrangement. A SupplyQuotaArrangement may define the distribution of material requirements or material issues to different sources of supply, business partners, or internal organizational units. An example of GDT SupplyQuotaArrangementID is:

<SupplyQuotaArrangementID>1</SupplyQuotaArrangementID>

In certain implementations, GDT SupplyQuotaArrangementID may have the following structure:

| GDT | Object Class | Property | Representation/ Association | Type | Type Name | Len. | Remarks |
|---|---|---|---|---|---|---|---|
| SupplyQuota-ArrangementID | Supply Quota Arrangement | Identification | Identifier | CDT | Identifier | 1..2 | Restricted |

GDT SupplyQuotaArrangementID, in combination with Company, Material, ProductCategory, SupplyQuotaArrangementDirectionTypeCode, and ValidityPeriod, may be an identifier of a quota arrangement.

SupplyQuotaDirectionCode

A GDT SupplyQuotaDirectionCode is the coded representation of the direction of a quota arrangement. An example of GDT SupplyQuotaDirectionCode is:

<SupplyQuotaDirectionCode>1</SupplyQuotaDirectionCode>

In certain implementations, GDT SupplyQuotaDirectionCode may have the following structure:

| GDT | Object Class | Representation/ Association | Type | Type Name | Len. | Re-marks |
|---|---|---|---|---|---|---|
| Supply-Quota-Direction-Code | Supply Quota Direction | Code | CDT | Code | 1 | Re-stricted |

In certain implementations, the attributes of GDT SupplyQuotaDirectionCode are not required because constant values would be assigned to them in a customer system at runtime. They are implicitly assigned in the following way: listID="10280," listAgencyID="310," listVersionID=assigned and managed by the user of the code.

The following code values may be assigned to GDT SupplyQuotaDirectionCode: 1 (i.e., incoming), 2 (i.e., outgoing). GDT SupplyQuotaDirectionCode may be used to specify the direction of a quota arrangement.

SystemAdministrativeData

A GDT SystemAdministrativeData is administrative data that is stored in a system. This data may include system users and changes in date/time for individual files. The point in time at which a change takes place may be the point in time at which the changed data is stored. An example of GDT SystemAdministrativeData is:

```
<SystemAdministrativeData>
<CreationDateTime>2004-04-19T11:11Z+01:00</CreationDateTime>
<CreationUserAccountID>Bach</CreationUserAccountID>
<LastChangeDateTime>2004-04-19T12:21Z+01:00</LastChangeDateTime>
<LastChangeUserAccountID>Bach</LastChangeUserAccountID>
</SystemAdministrativeData>
```

In certain implementations, GDT SystemAdministrativeData may have the following structure:

GDT SystemAdministrativeData may contain the following attributes: CreationDateTime (i.e., date and time stamp), CreationIdentityUUID (i.e., ID of the creator), CreationUserAccountID (i.e., Creator), LastChangeDateTime (i.e., date and time stamp of last change), LastChangeUserAccountID (i.e., person who did the last change), LastChangeIdentityUUID (i.e., ID of the person who did the last change).

GDT SystemAdministrativeData may be used in Business Objects, Business Document Objects, or in any of their parts.

In certain implementations when using GDT SystemAdministrativeData, a description may be required specifying which administrative information reference is used. This may be expressed by using a prefix, e.g., PurchaseOrder.

TaxAuthorityParty

A GDT TaxAuthorityParty is a party that collects and manages taxes. An example of GDT TaxAuthorityParty is:

```
<VATDeclaration>
. . .
<TaxAuthorityParty>
  <ID>2832</ID>
  <CountryCode>DE</CountryCode>
  <Address>
    <OrganisationFormattedName>Finanzamt Heidelberg</OrganisationFormattedName>
    . . .
  </Address>
</TaxAuthorityParty>
. . .
</VATDeclaration>
```

In certain implementations, GDT TaxAuthorityParty may have the following structure:

| GDT | | Cat. | Object Class | Property | Representation/ Association | Type | Type Name | Card. |
|---|---|---|---|---|---|---|---|---|
| SystemAdministrative-Data | | | System Administrative Data | | Details | | | |
| | Creation-DateTime | E | System Administrative Data | Creation Date Time | Date Time | GDT | Date-Time | 1..1 |
| | Creation-Identity UUID | E | System Administrative Data | Creation-Identity | Identifier | GDT | UUID | 0..1 |
| | Creation-UserAccountID | E | System Administrative Data | Creation User Account ID | Identifier | GDT | UserAccountID | 0..1 |
| | LastChange-DateTime | E | System Administrative Data | Last Change Date Time | Date Time | GDT | Date-Time | 0 ..1 |
| | Creation-Identity-UUID | E | System Administrative Data | Creation-Identity | Identifier | GDT | UUID | 0 ..1 |
| | Last-ChangeUser AccountID | E | System Administrative Data | Last Change User Account ID | Identifier | GDT | UserAccountID | 0 ..1 |

| GDT | | Cat. | Object Class | Property | Representation/ Association | Type | Type Name | Len. | Card. | Remarks |
|---|---|---|---|---|---|---|---|---|---|---|
| TaxAuthority-Party | | | Tax Authority Party | | Details | | | | | |
| | ID | E | Tax Authority Party | Identification | Identifier | CDT | Identifier | 20 | 0..1 | Restricted |
| | CountryCode | E | Tax Authority Party | Country | Code | GDT | Country-Code | | 1 | |
| | RegionCode | E | Tax Authority Party | Region | Code | GDT | Region-Code | | 0..1 | |
| | Address | E | Tax Authority Party | Address | Address | GDT | Address | | 0..1 | Restricted |

The attributes of GDT TaxAuthorityParty may be assigned as follows: ID (i.e., Identifier of tax authority or tax authority number), CountryCode (i.e., country of tax authority), RegionCode (i.e., region of tax authority), Address (i.e., company address).

As a possible integrity condition, the identification of a tax authority may vary from country to country. In many countries, a tax authority number is used for identification, that is, the “ID” element (in Germany it is called the “Finanzamtsnummer”). “ID” can be used in the context of the country of the tax authority (in the “CountryCode” element). In some countries, the region and/or company address may be used for identification, that is, the “RegionCode” and “Address” elements. In the United States, for example, the IRS (Internal Revenue Service) in Washington D.C. is identified as the federal tax authority by “Address,” whereas for the tax authorities in other locations, “RegionCode” and “Address” are generally required. One example of this is CA BOE (California State Board of Equalization). Therefore, depending on the country, either the “ID” or a combination of “RegionCode” and “Address” may have to be specified.

GDT TaxAuthorityParty may contain information about a tax authority which is used in A2A or B2B messages, for example, in the electronic tax return for tax on sales/purchases (e.g., VATDeclaration) to a tax authority.

TaxDeclarationCategoryCode

A GDT TaxDeclarationCategoryCode is a coded representation of the category of a tax declaration. An example of GDT TaxDeclarationCategoryCode is:

<TaxDeclarationCategoryCode>1</TaxDeclarationCategoryCode>

In certain implementations, GDT TaxDeclarationCategoryCode may have the following structure:

| GDT | Object Class | Property | Representation/ Association | Type | Type Name | Len. | Remarks |
|---|---|---|---|---|---|---|---|
| Tax-Declaration-Category-Code | Tax Declaration | Category | Code | CDT | Code | 1 | restricted |

The attributes of GDT TaxDeclarationCategoryCode are not required because constant values would be assigned to them in a customer system at runtime. They are implicitly assigned in the following way: listID=“10447” and listAgencyID=“310.”

GDT TaxDeclarationCategoryCode may use the following codes: 1 (i.e., normal), 2 (i.e., correction), 3 (i.e., internal use).

GDT TaxDeclarationCategoryCode may be used in the business object template TaxDeclaration to distinguish between the different categories of tax declarations.

TaxDeclarationKeyNumberListCode

A GDT TaxDeclarationKeyNumberListCode is the coded representation of a key number list for tax declarations. A tax key number is an identification of the type of an entry in a tax return that is prescribed by tax authorities. An example of GDT TaxDeclarationKeyNumberListCode is:

<TaxDeclarationKeyNumberListCode ListID=“20xyz”>1</TaxDeclarationKeyNumberListCode>

In certain implementations, GDT TaxDeclarationKeyNumberListCode may have the following structure:

| GDT | | Cat. | Object Class | Property | Representation/ Association | Type | Type Name | Len. | Card. | Remarks |
|---|---|---|---|---|---|---|---|---|---|---|
| TaxDeclarationKey-NumberListCode | | | Tax Declaration | Key Number List | Code | CDT | Code | 1..2 | | restricted |
| | listID | A | Code List | Identification | Identifier | xsd | token | 1..60 | 1 | |

GDT TaxDeclarationKeyNumberListCode may be assigned a fixed, country-specific code list. Tax key numbers may be prescribed by the tax authorities of a country. For example, there can be different key number code lists for different tax types. TaxDeclarationKeyNumberListCode may take an official name used in the respective country (or an official transcription of the name).

Attributes of GDT TaxDeclarationKeyNumberListCode may use the following values: listID=ID of the relevant code list, listAgencyID="310" (i.e., implicit, the attribute is not required at the moment).

As an example, the following attributes may be assigned to "TaxDeclarationKeyNumberListCode for DE" (i.e., Germany), listID="20xyz," listAgencyID="310": 1 (i.e., key numbers for the electronic return for tax on sales/purchases), 2 (i.e., key numbers for previous employer data from the tax card).

GDT TaxDeclarationKeyNumberListCode may be used to specify the type of code list for tax key numbers in TaxDeclarationKeyNumberTypeCode (see following GDT).

TaxDeclarationKeyNumberTypeCode

A GDT TaxDeclarationKeyNumberTypeCode is the coded representation (character string) of the type of a tax key number. A tax key number is an identification of the type of an entry in a tax return that may be prescribed by the tax authorities of a country (see Note at end of this GDT). There can typically be yearly or even mid-year changes to the code list. An example of GDT TaxDeclarationKeyNumberTypeCode is:

<TaxDeclarationKeyNumberTypeCode listID="20xyz.1" listVersionID="200401">61</TaxDeclarationKeyNumberTypeCode>

In certain implementations, GDT TaxDeclarationKeyNumberTypeCode may have the following structure:

| GDT | | Cat. | Object Class | Property | Representation/ Association | Type | Type Name | Len. | Card. | Remarks |
|---|---|---|---|---|---|---|---|---|---|---|
| TaxDeclaration-KeyNumber-TypeCode | | E | Tax Declaration | Key Number Type | Code | CDT | Code | 1..10 | | restricted |
| | listID | A | Code List | Identification | Identifier | xsd | Token | 3..4 | 0..1 | |
| | listVersionID | A | Code List | Version | Identifier | xsd | Token | 1..6 | 0..1 | |

The attributes of GDT TaxDeclarationKeyNumberTypeCode may not assigned as follows: listID (i.e., can be an identifier for a code list of tax key numbers, e.g., entries from the GDT TaxDeclarationKeyNumberListCode; listID may be formed according to the format "<listID>.<code>," for example, "20xyz.1" for the code list of tax key numbers for the electronic return for tax on sales/purchases in Germany); listVersionID (i.e., can be an identifier for the version of a code list of tax key numbers, e.g., the format CCYYnn is common in Germany with CC for the century, YY for the year and nn for a possible mid-year sequential two-character number).

As an example, "TaxDeclarationKeyNumberListCode for DE" [Germany], listID="20xyz.1," listVersionID="200401," describes the code list of tax key numbers for the electronic return for tax on sales/purchases in version 200401 (2004 is the year and 01 is a sequential number).

As a possible integrity condition, the attributes "listID" and "listVersionID" may not have to be specified if the valid code list of the tax key numbers is clear from the context of the tax return, for example, from the relevant tax legislation and the reporting period.

The fields of a form for tax return may often be provided with a number ("ID"), the meaning of which is described separately. For example, typical tax key numbers in the German electronic return for tax on sales/purchases are 51 and 61. The tax key number 51 describes the taxable revenue at the tax rate of 16% and the tax key number 61 describes the deductible input tax amount from intra-company acquisition of objects (Section 15, Paragraph, 1 No. 3 of the German tax law). In this context, "intra-company" means within the European Union.

TaxDeclarationTypeCode

A GDT TaxDeclarationTypeCode is the coded representation of the type of a tax declaration. A tax declaration is the declaration to a tax authority of tax payables and tax receivables of a company. An example of GDT TaxDeclarationTypeCode is:

<TaxDeclarationTypeCode listID=21401>

1

</TaxDeclarationTypeCode>

In certain implementations, GDT TaxDeclarationTypeCode may have the following structure:

| GDT | | Cat. | Object Class | Property | Representation/ Association | Type | Type Name | Len. | Card. | Remarks |
|---|---|---|---|---|---|---|---|---|---|---|
| TaxDe-claration-TypeCode | | | Tax Declaration | Type | Code | CDT | Code | 1..3 | | restricted |
| | listID | A | Code List | Identification | Identifier | xsd | Token | | 0..1 | |

GDT TaxDeclarationTypeCode may be assigned a customer-specific code list based on country. The country code (according to ISO-3166-1) may be used in the code list name, and the listAgencyID="310" (according to DE 3055) may be specified.

Based on "TaxDeclarationTypeCode for DE," listID="21401" and listAgencyID="310," the code list may use the following values: 1 (i.e., VAT Return), 2 (i.e., VAT Declaration), 3 (i.e., Summary Declaration), 4 (i.e., Withholding Tax for the Building Industry).

Based on "TaxDeclarationTypeCode for US," listID="21402" and listAgencyID="310," the code list may use the following values: 1 (i.e., Sales and Use Tax Return), 2 (i.e., Miscellaneous Income/1099 Misc), 3 (i.e., Foreign Person's U.S. Source Income/1042S), 4 (i.e., Interest Income/10991NT), 5 (i.e., Certain Government Payments/1099G).

The TaxDeclarationTypeCode may specify the type of tax declaration, and in this way may define which information is required and is reported to the tax authority.

GDT TaxDeclarationTypeCodeContextElements defines a dependency or an environment in which the TaxDeclarationTypeCode appears. The environment may be described by context categories. With the context categories in TaxDeclarationTypeCodeContext the valid set of code values of TaxDeclarationTypeCode may be restricted according to an environment during use.

In certain implementations, GDT TaxDeclarationTypeCodeContextElements may have the following structure:

GDT TaxDeductibilityCode may be assigned a customer code list based on country. Attributes can be assigned in the following way: schemeAgencyID (i.e., ID of the organization maintaining the ID scheme, from DE 3055 if listed there), schemeAgencySchemeID (i.e., the identification of the schema which identifies the organization named in schemeAgencyID), schemeAgencySchemeAgencyID (i.e., the identification of the maintaining organization listed in DE 3055, either a tax authority or one's own company, which is responsible for the identification of the organization named in schemeAgencyID).

For example, with "GDT TaxDeductibilityCode for EN," listID="21701," listAgencyID="310," listVersionID=Version of the relevant code list assigned and managed by data user, GDT TaxDeductibilityCode may use the following code list: 1 (i.e., VAT fully deductible), 2 (i.e., VAT not deductible), 3 (i.e., VAT partly deductible for travel expenses).

An example of customer-specific code semantics is: Input tax deduction according to individual agreement with tax authorities.

The classification of deductibility may permit the formulation of legal texts and tax assignments regardless of actual,

| GDT | | Cat. | Object Class | Property | Representation/ Association | Type | Type Name | Card. |
|---|---|---|---|---|---|---|---|---|
| TaxDeclaration-TypeCodeCon-textElements | | | Tax Declaration Type Code Context Elements | | Details | | | |
| | CountryCode | E | Tax Declaration Type Code Context Elements | Country | Code | GDT | CountryCode | 0..1 |
| | TaxTypeCode | E | Tax Declaration Type Code Context Elements | Tax Type | Code | GDT | TaxTypeCode | 0..1 |

The CountryCode context category may define the context country and may determine the valid code values for a specific country. The TaxTypeCode context category may define the context tax type and may determine the valid code values for a specific tax type.

TaxDeductibilityCode

A GDT TaxDeductibilityCode is the coded representation of the tax deductibility. Tax deductibility specifies the portion of VAT that can be deducted from purchases. An example of GDT TaxDeductibilityCode is:

<TaxDeductibilityCode listID=21701 listAgencyID=310>1</TaxDeductibilityCode>

In certain implementations, GDT TaxDeductibilityCode may have the following structure:

variable current percentage rates. In other words, if a percentage rate is increased or decreased as of a specific date, the corresponding TaxDeductibilityCode may or may not change. If additional new percentage rates are introduced for deductibility, these may also lead to new TaxDeductibilityCodes.

Non-deductibility may be regulated individually between company and tax authority.

A GDT TaxDeductibilityCodeContextElements defines a dependency or an environment in which the TaxDeductibilityCode appears. The environment may be described by context categories. With the context categories in TaxDeductibilityCodeContextElements the valid number of code values of TaxDeductibilityCode may be restricted according to an environment during use.

| GDT | | Cat. | Object Class | Property | Representation/ Association | Type | Type Name | Len. | Card. | Remarks |
|---|---|---|---|---|---|---|---|---|---|---|
| TaxDe-ductibilityCode | | | Tax De-ductibility | | Code | CDT | Code | 1..4 | | Restricted |
| | listID | A | Code List | Identifi-cation | Identifier | xsd | Token | | 0..1 | |
| | listAgencyID | A | Code List Agency | Identifi-cation | Identifier | xsd | Token | | 0..1 | |
| | listVersionID | A | Code List | Version | Identifier | xsd | Token | | 0..1 | |
| | listAgencySchemeID | A | Code List Agency | Scheme | Identifier | xsd | Token | | 0..1 | |
| | listAgencySchemeAgencyID | A | Code List Agency | Scheme Agency | Identifier | xsd | Token | | 0..1 | |

In certain implementations, GDT TaxDeductibilityCodeContextElements may have the following structure:

| GDT | | Cat. | Object Class | Property | Representation/ Association | Type | Type Name | Card. |
|---|---|---|---|---|---|---|---|---|
| TaxDeductibilityCodeContextElements | | | Tax Deductibility Code Context Elements | | Details | | | |
| | CountryCode | E | Tax Deductibility Code Context Elements | Country | Code | GDT | CountryCode | 0..1 |

The CountryCode context category may define the context country and determine the valid code values for a specific country.

TaxExemption

A GDT TaxExemption is a party's complete or partial exemption from a tax. An example of GDT TaxExemption is:

<TaxExemption>
<CertificateID>49314159123</CertificateID>
<ValidityPeriod>
<StartDate>2005-01-01</StartDate>
<EndDate>2005-12-31</EndDate>
</ValidityPeriod>
</TaxExemption>

In certain implementations, GDT TaxExemption may have the following structure:

| GDT | | Cat. | Object Class | Property Qual. | Property | Rep./ Ass. | Type | Type Name | Card. |
|---|---|---|---|---|---|---|---|---|---|
| TaxExemption | | | Tax Exemption | | | Details | | | |
| | CertificateID | E | Tax Exemption | Certificate | Identification | Identifier | GDT | TaxExemptionCertificateID | 1 |
| | ValidityPeriod | E | Tax Exemption | Validity | Period | Date Time Period | GDT | DateTimePeriod | 0..1 |
| | Percent | E | Tax Exemption | | Exempt Amount | Percent | CDT | Percent | 0..1 |
| | Amount | E | Tax Exemption | | Exempt | Amount | CDT | Amount | 0..1 |

GDT TaxExemption may use the following attributes: CertificateID (i.e., identifier of the tax exemption certificate provided by the tax authority), ValidityPeriod (i.e., validity period of the tax exemption), Percent (i.e., portion of the tax base rate that is exempt from tax), Amount (i.e., portion of the tax base rate that is exempt from tax).

As a possible integrity condition, since exemption may be based on a certain tax type, the tax type may result from the context in which GDT TaxExemption is used.

GDT TaxExemption may be used to report a tax exemption that may exist after tax determination. It may also be used for a business partner tax exemption.

TaxExemptionCertificateID

A GDT TaxExemptionCertificateID is a unique identifier for a tax exemption certificate. A tax exemption certificate is a certificate that a tax authority issues to a certain party in order to grant the party a tax exemption. (See Note at end of this GDT.) An example of GDT TaxExemptionCertificateID is:

<TaxExemptionCertificateID>49314159123</TaxExemptionCertificateID>

In certain implementations, GDT TaxExemptionCertificateID may have the following structure:

| GDT | Cat. | Object Class Qual. | Object Class | Property Qual. | Property | Rep./ Ass. | Type | Type Name | Len. | Card. | Remarks |
|---|---|---|---|---|---|---|---|---|---|---|---|
| TaxExemptionCertificateID | | | Tax Exemption Certificate | | Identification | Identifier | CDT | Identifier | 1..30 | | |

-continued

| GDT | | Cat. | Object Class Qual. | Object Class | Property Qual. | Property | Rep./ Ass. | Type | Type Name | Len. | Card. | Remarks |
|---|---|---|---|---|---|---|---|---|---|---|---|---|
| | scheme-AgencyID | A | | Identification-Scheme-Agency | | Identification | Identifier | xsd | token | 1..60 | 0..1 | |
| | scheme-Agency-SchemeID | A | | Identification-Scheme-Agency | | Scheme | Identifier | xsd | token | 1..60 | 0..1 | |
| | schemeAgencySchemeAgencyID | A | | Identification-Scheme-Agency | | SchemeAgency | Identifier | xsd | token | 3 | 0..1 | |

For GDT TaxExemptionCertificateID, a customer code list is assigned to the code. The attributes can be assigned in the following way: schemeAgencyID (i.e., ID of the organization maintaining the ID scheme, from DE 3055 if listed there); schemeAgencySchemeID (i.e., the identification of the schema which identifies the organization named in schemeAgencyID), schemeAgencySchemeAgencyID (i.e., the identification of the maintaining organization listed in DE 3055, either a tax authority or one's own company, which is responsible for the identification of the organization named in schemeAgencyID).

As a possible integrity condition, GDT TaxExemptionCertificateID may be unique for a particular tax type within a specific country. The country and the tax type may be derived from the context in which the GDT is used.

A company that is exempted from tax may send the tax exemption certificate to its suppliers, who may then take this tax exemption into consideration when they invoice the company. In some countries the TaxExemptionCertificateID may be printed on invoices with tax exemption.

TaxExemptionCertificateTypeCode

A GDT TaxExemptionCertificateTypeCode is a coded representation of the type of tax exemption certificate. An example of GDT TaxExemptionCertificateTypeCode is:

<TaxExemptionCertificateTypeCode listID="25301" listAgencyID="310">1</TaxExemptionCertificateTypeCode>

In certain implementations, GDT TaxExemptionCertificateTypeCode may have the following structure:

GDT TaxExemptionCertificateTypeCode may be assigned a fixed, country-specific code list. For example, with "TaxExemptionCertificateTypeCode for FR" (i.e., France), listID="25301," listAgencyID="310," the following codes may be assigned: 1 (i.e., VAT exemption for a single sales order), 2 (i.e., VAT exemption of invoices up to a certain amount and within a certain time period).

With TaxExemptionCertificateTypeCode for IT" (i.e., Italy), listID="25302," listAgencyID="310," the following codes may be assigned: 1 (i.e., VAT exemption for a single sales order), 2 (i.e., VAT exemption of invoices within a specified calendar year and up to a certain amount), 3 (i.e., VAT exemption of invoices within a specified calendar year and within a certain period of time).

GDT TaxExemptionCertificateTypeCode may be used to specify the type of given certificate regarding an ordered tax exemption of customer invoices. It may influence the visualizing of fields in UIs and printouts. The text of the code list may be written in the country's native language.

A GDT TaxExemptionCertificateTypeCodeContextElements defines a dependency or an environment in which the TaxExemptionCertificateTypeCode appears. The environment may be described by context categories. With the context categories in TaxExemptionCertificateTypeCodeContextElements the valid portion of code values of TaxExemptionCertificateTypeCode may be restricted according to an environment during use.

In certain implementations, GDT TaxExemptionCertificateTypeCodeContextElements may have the following structure:

| GDT | | Cat. | Object Class | Property | Representation/ Association | Type | Type Name | Len. | Card. | Remarks |
|---|---|---|---|---|---|---|---|---|---|---|
| TaxExemption-CertificateType-Code | | | Tax Exemption Certificate | Type | Code | CDT | Code | 1..3 | | restricted |
| | listID | A | Code List | Identification | Identifier | Xsd | token | | 0..1 | |
| | listAgencyID | A | Code List Agency | Identification | Identifier | Xsd | token | | 0..1 | |

| GDT | | Cat. | Object Class | Property | Representation/ Association | Type | Type Name | Card. |
|---|---|---|---|---|---|---|---|---|
| TaxExemptionCertificateTypeCodeContextElements | | | Tax Exemption Certificate Type Code Context Elements | | Details | | | |
| | CountryCode | E | Tax Exemption Certificate Type Code Context Elements | Country | Code | GDT | CountryCode | 0..1 |

The CountryCode context category may define the context country and determine the valid code values for a specific country.

TaxExemptionReasonCode

A GDT TaxExemptionReasonCode is a coded representation of the reason for a tax exemption. An example of GDT TaxExemptionReasonCode is:

<TaxExemptionReason listID="21501" listAgencyID="310">01</TaxExemptionReason>

In certain implementations, GDT TaxExemptionReasonCode may have the following structure:

| GDT | | Cat. | Object Class | Property | Representation/ Association | Type | Type Name | Len. | Card. | Remarks |
|---|---|---|---|---|---|---|---|---|---|---|
| TaxExemption-Reason-Code | | | Tax Exemption | Reason | Code | CDT | Code | 1..3 | | restricted |
| | listID | A | Code List | Identification | Identifier | xsd | token | 1..40 | 1 | |
| | listAgencyID | A | Code List Agency | Identification | Identifier | xsd | token | 1..3 | 0..1 | |

GDT TaxExemptionReasonCode may be assigned a fixed, country-specific code list. The code lists can contain official, legally specified codes and codes defined by the customer.

For example, using code list "PartyTaxExemptionCode for US" with listID="21501," listAgencyID="310," the following code list based on IRS requirements may be assigned: 01 (i.e., income effectively connected with a U.S. trade or business), 02 (i.e., exempt under an Internal Revenue Code section; income other than portfolio interest), 03 (i.e., income is not from U.S. sources), 04 (i.e., exempt under tax treaty), 05 (i.e., portfolio interest exempt under an Internal Revenue Code section), 06 (i.e., qualified intermediary that assumes primary withholding responsibility), 07 (i.e., withholding foreign partnership or withholding foreign trust), 08 (i.e., U.S. branch treated as a U.S. person), 09 (i.e., qualified intermediary represents income is exempt), 99 (i.e., special [99]), 00 (i.e., special [00]).

Information on the reason for the tax exemption may be needed for certain legally required tax declarations, for example.

TaxIdentificationNumberTypeCode

A GDT TaxIdentificationNumberTypeCode is a coded representation of the type of a tax number. The name of the TaxIdentificationNumberTypeCode is the official name used in the country in question (or its transcription). There may be different codes for different regions, different taxes or groups of taxes, or different types of taxpayers. An example of GDT TaxIdentificationNumberTypeCode is:

<TaxIdentificationNumberTypeCode listID="20112" listAgencyID="310">1</TaxIdentificationNumberTypeCode>

In certain implementations, GDT TaxIdentificationNumberTypeCode may have the following structure:

| GDT | | Cat. | Object Class | Property | Representation/ Association | Type | Type Name | Len. | Card. | Remarks |
|---|---|---|---|---|---|---|---|---|---|---|
| TaxIdentificationNumberType-Code | | | Tax Identification Number | Type | Code | CDT | Code | 1..2 | | restricted |
| | listID | A | Code List | Identification | Identifier | xsd | token | 1..60 | 1 | |
| | listAgencyID | A | Code List Agency | Identification | Identifier | xsd | token | 1..3 | 0..1 | |

GDT TaxIdentificationNumberTypeCode may be assigned a customer code list based on country.

The following examples utilize attribute listAgencyID="310."

"TaxIdentificationNumberTypeCode for AR" (i.e., Argentina), listID="20101" may use the following code list: 1 (i.e., VAT registration number for companies/CUIT), 2 (i.e., VAT registration number for natural persons/CUIL), 3 (i.e., tax number for income tax), 4 (i.e., regional tax number). "TaxIdentificationNumberTypeCode for AT" (i.e., Austria), listID="20102" may use the following code list: 1 (i.e., VAT Registration Number). "TaxIdentificationNumberTypeCode for AU" (i.e., Australia), listID="20103" may use the following code list: 1 (i.e., Australian Business Number/ABN). "TaxIdentificationNumberTypeCode for BE" (i.e., Belgium), listID="20104" may use the following code list: 1 (i.e., VAT Registration Number), 3 (i.e., Company Number), 2 (i.e., BTW/Tax Number). "TaxIdentificationNumberTypeCode for BG" [Bulgaria], listID="20105" may use the following code list: 1 (i.e., Single ID Code/BULSTAT), 2 (i.e., Personal ID), 3 (i.e., Social Security Number). "TaxIdentificationNumberTypeCode for BR" (i.e., Brazil), listID="20106" may use the following code list: 1 (i.e., VAT registration number for companies/CNPJ), 2 (i.e., VAT registration number for natural persons/CPF), 3 (i.e., tax number given by the relevant state), 4 (i.e., tax number given by the relevant town or city). "TaxIdentificationNumberTypeCode for CH" (i.e., Switzerland), listID="20107" may use the following code list: 1 (i.e., Tax Number). "TaxIdentificationNumberTypeCode for CL" (i.e., Chile), listID="20108" may use the following code list: 1 (i.e., RUT Number). "TaxIdentificationNumberTypeCode for CN" [China], listID="20109" may use the following code list: 1 (i.e., Tax Number). "TaxIdentificationNumberTypeCode for CO" (i.e., Colombia), listID="20110" may use the following code list: 1 (i.e., NIT). "TaxIdentificationNumberTypeCode for CZ" (i.e., Czech Republic), listID="20111" may use the following code list: 1 (i.e., VAT Registration Number), 2 (i.e., Tax Number DIC), 3 (i.e., Tax Number ICO). "TaxIdentificationNumberTypeCode for DE" (i.e., Germany), listID="20112" may use the following code list: 1 (i.e., VAT Registration Number), 2 (i.e., Income Tax Number/§48), 3 (i.e., Turnover tax no./Credit proc. §14), 4 (i.e., Tax number for electronic Tax declaration), 5 (i.e., Tax Number). "TaxIdentificationNumberTypeCode for DK" (i.e., Denmark), listID="20113" may use the following code list: 1 (i.e., VAT Registration Number). "TaxIdentificationNumberTypeCode for EE" (i.e., Estonia), listID="20114" may use the following code list: 1 (i.e., VAT Registration Number). "TaxIdentificationNumberTypeCode for ES" (i.e., Spain), listID="20115" may use the following code list: 1 (i.e., VAT Registration Number), 2 (i.e., NIF), 3 (i.e., DNI). "TaxIdentificationNumberTypeCode for FI" (i.e., Finland), listID="20117" may use the following code list: 1 (i.e., VAT Registration Number). "TaxIdentificationNumberTypeCode for FR" (i.e., France), listID="20118" may use the following code list: 1 (i.e., VAT Registration Number), 2 (i.e., Ministry of finance registration number SIRET), 3 (i.e., Ministry of finance registration number SIREN). "TaxIdentificationNumberTypeCode for GB" (i.e., United Kingdom), listID="20120" may use the following code list: 1 (i.e., VAT Registration Number), 2 (i.e., National Insurance Number). "TaxIdentificationNumberTypeCode for GR" (i.e., Greece), listID="20121" may use the following code list: 1 (i.e., Greece: VAT Registration Number), 2 (i.e., Personal Identification Number), 3 (i.e., Tax number for domestic customers/AFM number). "TaxIdentificationNumberTypeCode for HR" (i.e., Croatia), listID="20123" may use the following code list: 1 (i.e., JMBG Number). "TaxIdentificationNumberTypeCode for HU" (i.e., Hungary), listID="20124" may use the following code list: 1 (i.e., VAT Registration Number), 2 (i.e., Tax Number). "TaxIdentificationNumberTypeCode for ID" (i.e., Indonesia), listID="20126" may use the following code list: 1 (i.e., Tax-payer Registration Number/NPWP), 2 (i.e., Taxable Entrepreneur Confirmation Number/NPPKP). "TaxIdentificationNumberTypeCode for IE" (i.e., Ireland), listID="20127" may use the following code list: 1 (i.e., VAT Registration Number). "TaxIdentificationNumberTypeCode for IT" (i.e., Italy), listID="20128" may use the following code list: 1 (i.e., VAT Registration Number), 2 (i.e., Fiscal Code), 3 (i.e., IVA Code). "TaxIdentificationNumberTypeCode for KR" (i.e., South Korea), listID="20129" may use the following code list: 1 (i.e., Representative's ID number), 2 (i.e., Business partner's VAT number). "TaxIdentificationNumberTypeCode for KZ" (i.e., Kazakhstan), listID="20130" may use the following code list: 1 (i.e., PHH Number). "TaxIdentificationNumberTypeCode for LT" (i.e., Lithuania), listID="20125" may use the following code list: 1 (i.e., VAT Registration Number). "TaxIdentificationNumberTypeCode for LU" (i.e., Luxemburg), listID="20131" may use the following code list: 1 (i.e., VAT Registration Number). "TaxIdentificationNumberTypeCode for LV" (i.e., Latvia), listID="2012" may use the following code list: 1 (i.e., VAT Registration Number). "TaxIdentificationNumberTypeCode for MC" (i.e., Monaco), listID="20133" may use the following code list: 1 (i.e., VAT Registration Number). "TaxIdentificationNumberTypeCode for MT" (i.e., Malta), listID="20134" may use the following code list: 1 (i.e., VAT Registration Number). "TaxIdentificationNumberTypeCode for MX" (i.e., Mexico), listID="20135" may use the following code list: 1 (i.e., RFC Number), 2 (i.e., VAT Liability), 3 (i.e., CURP Number). "TaxIdentificationNumberTypeCode for NL" (i.e., Netherlands), listID="20136" may use the following code list: 1 (i.e., VAT Registration Number). "TaxIdentificationNumberTypeCode for NO" (i.e., Norway), listID="20137" may use the following code list: 1 (i.e., Tax Number). "TaxIdentificationNumberTypeCode for PE" (i.e., Peru), listID="20138" may use the following code list: 1 (i.e., RUC Number). "TaxIdentificationNumberTypeCode for PH" (i.e., Philippines), listID="20139" may use the following code list: 1 (i.e., Taxpayer Identification Number). "TaxIdentificationNumberTypeCode for PL" [Poland], listID="20140" may use the following code list: 1 (i.e., VAT Registration Number), 2 (i.e., NIP). "TaxIdentificationNumberTypeCode for PT" (i.e., Portugal), listID="20141" may use the following code list: 1 (i.e., VAT Registration Number). "TaxIdentificationNumberTypeCode for RO" (i.e., Romania), listID="20142" may use the following code list: 1 (i.e., Tax Number. "TaxIdentificationNumberTypeCode for RU" (i.e., Russia), listID="20143" may use the following code list: 1 (i.e., Tax Number INN), 2 (i.e., Tax Number OKPO), 3 (i.e., Tax Number KPP), 4 (i.e., Tax Number OFK). "TaxIdentificationNumberTypeCode for SE" (i.e., Sweden), listID="20144" may use the following code list: 1 (i.e., VAT Registration Number), 2 (i.e., Organization Registration Number). "TaxIdentificationNumberTypeCode for SG" (i.e., Sing apore), listID="20145" may use the following code list: 1 (i.e., Goods and Services Tax Registration Number). "TaxIdentificationNumberTypeCode for SI" (i.e., Slovenia), listID="20146" may use the following code list: 1 (i.e., VAT Registration Number), 2 (i.e., Company Identification Number). "TaxIdentificationNumberTypeCode for SK" (i.e., Slovakia), listID="20147" may use the following code list: 1 (i.e., VAT Registration Number), 2 (i.e., Tax Number DIC), 3 (i.e., Tax Number ICO). "TaxIdentificationNumberType- Code for TH" (i.e., Thailand), listID="20148" may use the following code list: 1 (i.e., Personal ID), 2 (i.e., Registered Tax ID). "TaxIdentificationNumberTypeCode for TR" (i.e., Turkey), listID="20149" may use the following code list: 1 (i.e., Tax Office), 2 (i.e., Tax Number). "TaxIdentificationNumberTypeCode for TW" (i.e., Taiwan), listID="20150" may use the following code list: 1 (i.e., GUI Registration Number), 2 (i.e., Tax Registration Number). "TaxIdentificationNumberTypeCode for UA" (i.e., Ukraine), listID="20151" may use the following code list: 1 (i.e., Taxpayer Identification Number), 2 (i.e., Identification code of the payer according to USRE), 3 (i.e., Identification number of the payer for joint venture), 4 (i.e., Ukraine: Registration number of the payer for joint venture). "TaxIdentificationNumberTypeCode for US" (i.e., United States), listID="20152" may use the following code list: 1 (i.e., Social Security Number), 2 (i.e., Employer Identification Number). "TaxIdentificationNumberTypeCode for VE" (i.e., Venezuela), listID="20153" may use the following code list: 1 (i.e., RIF), 2 (i.e., NIT).

GDT TaxIdentificationNumberTypeCode may be used in conjunction with the tax number (see GDT PartyTaxID) to specify its type.

A GDT TaxIdentificationNumberTypeCodeContextElements defines a dependency or an environment in which the TaxIdentificationNumberTypeCode appears. The environment may be described by context categories. With the context categories in GDT TaxIdentificationNumberTypeCodeContextElements the valid number of code values of TaxIdentificationNumberTypeCode may be restricted according to an environment during use.

In certain implementations, GDT TaxIdentificationNumberTypeCodeContextElements may have the following structure:

| GDT | | Cat. | Object Class | Property | Representation/ Association | Type | Type Name | Card. |
|---|---|---|---|---|---|---|---|---|
| TaxIdentificationNumberTypeCodeContextElements | | | Tax Identification Number Type Code Context Elements | | Details | | | |
| | CountryCode | E | Tax Identification Number Type Code Context Elements | Country | Code | GDT | CountryCode | 0..1 |

The CountryCode context category may define the context country and determine the valid code values for a specific country.

TaxJurisdictionCode

A GDT TaxJurisdictionCode is the tax jurisdiction code part of the address. This code is used in various countries and can normally be derived uniquely from the address, and it may depend on the code list of the provider. A country can have multiple code-list providers. An example of GDT TaxJurisdictionCode is:

<TaxJurisdictionCode listID="VeraZip System," listVersionID=,"" listAgencyID=="Taxware," listAgencySchemeID=,"" listAgencySchemeAgencyID="">PA1914101</TaxJurisdictionCode>

In certain implementations, GDT TaxJurisdictionCode may have the following structure:

| GDT | | Cat. | Object Class | Property | Representation/ Association | Type | Type Name | Len. | Card. | Remarks |
|---|---|---|---|---|---|---|---|---|---|---|
| TaxJurisdictionCode | | E | TaxJurisdictionCode | TaxJurisdictionCode | Code | CDT | Code | 1..15 | | |
| | listID | A | Code List | Identification | Indentifer | xsd | token | 1..60 | 0..1 | Optional |
| | listVersionID | A | Code List | Version | Indentifer | xsd | token | 1..15 | 0..1 | Optional |
| | listAgencyID | A | Code List Agency | Identification | Indentifer | xsd | token | 1..60 | 0..1 | Optional |
| | listAgencySchemeID | A | Code List Agency | Scheme | Indentifer | xsd | token | 1..60 | 0..1 | Optional |
| | listAgencySchemeAgencyID | A | Code List Agency | Scheme Agency | Indentifer | xsd | token | 3 | 0..1 | Optional |

For GDT TaxJurisdictionCode, a customer-specific code list can be assigned to the code. The attribute listID can be "10378." The listAgencyID can be the ID of the customer (e.g., from DE 3055 if listed there). The listVersionID can be the version of the particular code list assigned and managed by the customer. The listAgencySchemeID can be the ID of the scheme if the listAgencyID does not come from DE 3055. The listAgencySchemeAgencyID can be the ID of the organization from DE 3055 that manages the listAgencySchemeID scheme.

GDT TaxJurisdictionCode may specify the tax jurisdiction code for a physical address.

TaxRateTypeCode

A GDT TaxRateTypeCode is a code that represents the type of tax rate as defined by the law for the classification of tax rates. GDT TaxRateTypeCode is a customer-proprietary code list determined by national tax legislation; at present the TaxRateTypeCodes code lists for Germany (Umsatzsteuer) and the USA (Sales Tax) are available. An example of GDT TaxRateTypeCode is:

<TaxRateTypeCode listID=20201 listAgencyID=310>001</TaxRateTypeCode>

In certain implementations, GDT TaxRateTypeCode may have the following structure:

| GDT tion | | Cat. | Object Class | Property | Representation/ Association | Type | Type Name | Len. | Card. | Remarks |
|---|---|---|---|---|---|---|---|---|---|---|
| TaxRate Type-Code | | | Tax Rate | Type | Code | CDT | Code | 5 | | restricted |
| | listID | A | Code List | Identification | Identifier | xsd | token | 1..40 | 1 | |
| | listAgencyID | A | Code List Agency | Identification | Identifier | xsd | token | 1..3 | 0..1 | |

In customer code lists for GDT TaxRateTypeCode, a constant attribute value of listAgencyID="310" is assigned based on DE 3055. The name of the code list uses the two-character country code as per ISO-3166-1.

For example, using TaxRateTypeCode for DE" (i.e., Germany), listID="20201," listAgencyID="310," the following code list may be assigned: 001 (i.e., standard sales tax rate), 002 (i.e., reduced sales tax rate), 003 (i.e., sales tax-exempt). Using "TaxRateTypeCode for US" (i.e., United States), listID="20202," listAgencyID="310," the following code list may be assigned: 001 (i.e., standard sales tax rate), 002 (i.e., zero sales tax rate).

For certain taxes such as VAT, there may be one or more tax rates within its spatial and temporal scope of application. A concrete tax rate may be derived from the TaxRateTypeCode in connection with a scope of application.

The typing of tax rates may make it possible to formulate the texts of laws and regulations pertaining to taxes independently of the concrete tax rates, which can change over time. In other words: If a tax rate is raised or lowered at some point in time, the corresponding TaxRateTypeCode may or may not change. If additional new tax rates are introduced, new TaxRateTypeCodes may also be introduced. The TaxRateTypeCode may be used in the GDT ProductTax (described above) in connection with the tax rate specified there.

In most countries, tax codes can be determined with the TaxRateTypeCode and a key date. For example, the standard rate for VAT in Germany (TaxRateTypeCode DE001) is 16% valid from Apr. 1, 1998. In some countries, however, additional information may be required, for example the tax jurisdiction code for sales tax in the USA or the harmonized tariff code (Nomenclatura Comum do Mercosul) for some taxes in Brazil. The standard US sales tax rate (TaxRateType

| GDT | | Cat. | Object Class | Property | Representation/ Association | Type | Type Name | Card. |
|---|---|---|---|---|---|---|---|---|
| TaxRateType-CodeContextElements | | | Tax Rate Type Code Context Elements | | Details | | | |
| | CountryCode | E | Tax Rate Type Code Context Elements | Country | Code | GDT | Country-Code | 0..1 |

-continued

| GDT | | Cat. | Object Class | Property | Representation/ Association | Type | Type Name | Card. |
|---|---|---|---|---|---|---|---|---|
| | TaxType-Code | E | Tax Rate Type Code Context Elements | TaxType | Code | GDT | TaxType-Code | 0..1 |

The CountryCode context category may define the context country and determine the valid code values for a specific country. The TaxTypeCode context category may define the context type of tax and determine the valid code values for a specific type of tax.

TaxReceivablesPayablesRegisterItemProductTaxSplitItemID

A GDT TaxReceivablesPayablesRegisterItemProductTaxSplitItemID is an identifier of a TaxReceivablesPayablesRegisterItemProductTaxSplitItem A TaxReceivablesPayablesRegisterItemProductTaxSplitItem is a mutually exclusive part of an tax receivables/payables register item which contains product taxes and is split on the basis of tax splitting criteria. An example of GDT TaxReceivablesPayablesRegisterItemProductTaxSplitItemID is:

<TaxReceivablesPayablesRegisterItemProductTaxSplitItemID>10</TaxReceivablesPayablesRegisterItemProductTaxSplitItemID>

In certain implementations, GDT TaxReceivablesPayablesRegisterItemProductTaxSplitItemID may have the following structure:

| GDT | Object Class | Property | Representation/ Association | Type | Type Name | Len. | Remarks |
|---|---|---|---|---|---|---|---|
| TaxReceivables-PayablesRegisterItemProductTaxSplit-ItemID | Tax Receivables Payables Register Item Product Tax Split Item | Identification | Identifier | CDT | Identifier | 1..40 | Restricted |

As a possible integrity condition, GDT TaxReceivablesPayablesRegisterItemProductTaxSplitItemID may be unique in the context of a TaxReceivablesPayablesRegisterItem.

TaxReceivablesPayablesRegisterItemProductTaxSplitItemTaxDeclarationAssignmentID

A GDT TaxReceivablesPayablesRegisterItemProductTaxSplitItemTaxDeclarationAssignmentID is a unique identifier of a TaxDeclarationAssignment in a ProductTaxSplitItem of a TaxReceivablesPayablesRegisterItem. A TaxDeclarationAssignment is the reference to the TaxDeclaration in which the corresponding ProductTaxSplitItem was declared to the tax authorities. A ProductTaxSplitItem is a mutually exclusive part of an item of a TaxReceivablesPayablesRegister which contains product taxes and is split on the basis of tax splitting criteria. A TaxReceivablesPayablesRegister is the tax receivables and payables of a company from/to the relevant tax authorities. An example of TaxReceivablesPayablesRegisterItemProductTaxSplitItemTaxDeclarationAssignmentID is:

< TaxReceivablesPayablesRegisterItemProductTaxSplitItemTaxDeclarationAssignmentID>10 >/ TaxReceivablesPayablesRegisterItemProductTaxSplitItemTaxDeclarationAssignmentID>

In certain implementations, GDT TaxReceivablesPayablesRegisterItemProductTaxSplitItemTaxDeclarationAssignmentID may have the following structure:

| GDT | Object Class | Property | Representation/ Association | Type | Type Name | Len. | Card. | Remarks |
|---|---|---|---|---|---|---|---|---|
| TaxReceivablesPayablesRegisterItem-ProductTaxSplitItemTaxDeclarationAssignmentID | Tax Receivables Payables Register Item Product Tax Split Item Tax Declaration Assignment | Identification | Identifier | CDT | Identifier | 1..40 | | Restricted |

As a possible integrity condition, GDT TaxReceivablesPayablesRegisterItemProductTaxSplitItemTaxDeclarationAssignmentID may be unique in the context of a TaxReceivablesPayablesRegisterItemProductTaxSplitItem.

TaxReceivablesPayablesRegisterItemWithholdingTaxSplitItemID

A GDT TaxReceivablesPayablesRegisterItemWithholdingTaxSplitItemID is an identifier of a TaxReceivablesPayablesRegisterItemWithholdingTaxSplitItem. An ItemWitholdingTaxItem is a mutually exclusive part of an item which contains withholding taxes and is split on the basis of tax splitting criteria. An example of GDT TaxReceivablesPayablesRegisterItemWithholdingTaxSplitItemID is:

<TaxReceivablesPayablesRegisterItemWithholdingTaxSplitItemID>10</TaxReceivablesPayablesRegisterItemWithholdingTaxSplitItemID>

In certain implementations, GDT TaxReceivablesPayablesRegisterItemWithholdingTaxSplitItemID may have the following structure:

| GDT | Object Class | Property | Representation/ Association | Type | Type Name | Len. | Re-marks |
|---|---|---|---|---|---|---|---|
| TaxReceivables-PayablesRegister-ItemWithholding-TaxSplitItemID | TaxReceivables Payables Register Item Withholding Tax Split Item ID | Identification | Identifier | CDT | Identifier | 1..40 | Re-stricted |

-

As a possible integrity condition, GDT TaxReceivablesPayablesRegisterItemWithholdingTaxSplitItemID may be unique in the context of a TaxReceivablesPayablesRegistrationItem.

TaxReceivablesPayablesRegisterItemWithholdingTaxSplitItemTaxDeclarationAssignmentID A GTD TaxReceivablesPayablesRegisterItemWithholdingTaxSplitItemTaxDeclarationAssignmentID is a unique identifier of a TaxDeclarationAssignment in a WithholdingTaxSplitItem of a TaxReceivablesPayablesRegisterItem. A TaxDeclarationAssignment is the information about the TaxDeclaration in which the corresponding WithholdingTaxSplitItem was declared to the tax authorities. A WitholdingTaxSplitItem is a mutually exclusive part of an item of a TaxReceivablesPayablesRegister which contains withholding taxes and is split on the basis of tax splitting criteria. A TaxReceivablesPayablesRegister is the tax receivables and payables of a company from/to the relevant tax authorities. An example of GDT TaxReceivablesPayablesRegisterItemWithholdingTaxSplitItemTaxDeclarationAssignmentID is:

<
TaxReceivablesPayablesRegisterItemWithholdingTaxSplitItemTaxDeclarationAssignmentID>
10
</
TaxReceivablesPayablesRegisterItemWithholdingTaxSplitItemTaxDeclarationAssignmentID>

In certain implementations, GDT TaxReceivablesPayablesRegisterItemWithholdingTaxSplitItemID may have the following structure:

| GDT | Object Class | Prop-erty | Representation/ Association | Type | Type Name | Len. | Re-marks |
|---|---|---|---|---|---|---|---|
| TaxReceivablesPayablesRegisterItem-WithholdingTaxSplitItem-TaxDeclarationAssignmentID | Tax Receivables Payables Register Item Withholding Tax Split Item Tax Declaration Assignment | Identi-fication | Identifier | CDT | Iden-tifier | 1..40 | Re-stricted |

As a possible integrity condition, TaxReceivablesPayablesRegisterItemWithholdingTaxSplitItemTaxDeclaration AssignmentID may be unique in the context of a TaxReceivablesPayablesRegisterItemWithholdingTaxSplitItem.

TaxTypeCode

A GDT TaxTypeCode is a coded representation of the type of a tax. GDT TaxTypeCode may replace GDT ProductTaxTypeCode. An example of GDT TaxTypeCode is:

<TaxTypeCode listID="20301" listAgencyID="310">001</TaxTypeCode>

In certain implementations, GDT TaxTypeCode may have the following structure:

| GDT | | Cat. | Object Class | Property | Representation/ Association | Type | Type Name | Len. | Card. | Remarks |
|---|---|---|---|---|---|---|---|---|---|---|
| TaxType-Code | | | Tax | Type Code | Code | CDT | Code | 3 | | re-stricted |
| | listID | A | Code List | Identifi-cation | Identifier | xsd | token | 1..40 | 1 | |
| | listAgencyID | A | Code List Agency | Identifi-cation | Identifier | xsd | token | 1..3 | 0..1 | |

Based on national tax legislation, code lists for DE (i.e., Germany) and US (i.e., United States) are available for GDT TaxRateTypeCode. In customer code lists, a constant attribute value of listAgencyID="310" is assigned based on DE 3055.

For example, with "TaxTypeCode for DE," listID="20301," listAgencyID="310," the following code list may be assigned: 001 (i.e., VAT), 002 (i.e., construction withholding tax). With "TaxTypeCode for US," listID="20302," listAgencyID="310," the following code list may be assigned: 001 (i.e., state/provincial sales tax), 002 (i.e., local sales tax).

A GDT TaxTypeCode may be used where taxes are shown, on invoices for example.

The UN/EDIFACT code list DE 5153 "Duty or tax or fee type name code" contains codes that are similar to TaxTypeCode; however, the codes there are not country-specific and are incomplete. Those code lists are therefore not as authoritative as TaxTypeCode.

A GDT TaxTypeCodeContextElements defines a dependency or an environment in which the TaxTypeCode appears. The environment may be described by context categories. With the context categories in TaxTypeCodeContextElements the valid portion of code values of TaxTypeCode is restricted according to an environment during use.

In certain implementations, GDT TaxTypeCodeContextElements may have the following structure:

| GDT | | Cat. | Object Class | Property | Representation/ Association | Type | Type Name | Card. |
|---|---|---|---|---|---|---|---|---|
| TaxTypeCodeContextElements | | | Tax Type Code Context Elements | | Details | | | |
| | CountryCode | E | Tax Type Code Context Elements | Country | Code | GDT | Country-Code | 0..1 |

CountryCode—This context category may define the context country and may determine the valid code values for a specific country.

TextCollection

A GDT TextCollection is the collection of all text descriptions of a business object or a part of a business object. An example of GDT TextCollection is:

<TextCollection actionCode="01">

<Text actionCode="01">

<TypeCode>10</TypeCode>

<CreationDateTime>2002-04-19T15:30:00Z<CreationDateTime>

<ContentText languageCode="DE">Lorem ipsum dolor sit amet, consectetuer adipiscing elit. Vivamus luctus mollis ligula. Nunc sed diam id tortor bibendum lobortis. Fusce ornare mauris dictum neque. Etiam</ContentText>

</Text>

</TextCollection>

In certain implementations, GDT TextCollection may have the following structure:

| GDT | | Cat. | Object Class | Property | Rep./ Ass. | Type | Type Name | Card. |
|---|---|---|---|---|---|---|---|---|
| TextCollection | | | Text Collection | | Details | | | |
| | actionCode | A | Text Collection | Action | Code | GDT | ActionCode | 0..1 |
| | Text | E | Text Collection | Text | Details | GDT | TextCollectionText | 0..n |

GDT TextCollection may use the following attributes: actionCode (i.e., an instruction to the recipient of a message as to how it should handle a submitted property), Text (i.e., unstructured, readable information that contains additional formatting information within GDT TextCollection; a text may be recorded in a specific language and may be characterized by its text type).

A GDT TextCollection may be used to integrate the dependent object TextCollection in other objects' messages.

TextCollectionConfigurationProfileCode

A GDT TextCollectionConfigurationProfileCode is the coded representation of the configuration profile for the dependent object Text Collection. A configuration profile is a group of configuration settings that control the behavior of the configured object. An example of GDT TextCollectionConfigurationProfileCode is:

<TextCollectionConfigurationProfileCode>1<Text CollectionConfigurationProfileCode>

In certain implementations, GDT TextCollectionConfigurationProfileCode may have the following structure:

| GDT | | Cat. | Object Class | Property | Representation/ Association | Type | Type Name | Len. | Card. |
|---|---|---|---|---|---|---|---|---|---|
| TextCollectionConfigurationProfile-Code | | | Text Collection_ Configuration Profile | | Code | CDT | Code | 1..10 | |
| | listID | A | Code List | Identification | Identifier | xsd | token | | 0..1 |
| | listAgencyID | A | Code List Agency | Identification | Identifier | xsd | token | | 0..1 |
| | listVersionID | A | Code List | Version | Identifier | xsd | token | | 0..1 |
| | listAgency-SchemeID | A | Code List Agency | Scheme | Identifier | xsd | token | | 0..1 |
| | listAgency-SchemeAgencyID | A | Code List Agency | Scheme Agency | Identifier | xsd | token | | 0..1 |

GDT TextCollectionConfigurationProfileCode may be assigned a customer-specific code list. With regards to attributes, ListID can be 10429. If the Customer code list remains unchanged, listAgency ID can be "310." Otherwise listAgencyID can be the ID of the customer (e.g., ID from DE 3055 if listed there). ListVersionID can be the version of the particular code list (e.g., assigned and managed by the customer). ListAgencySchemeID can be the ID of the scheme if the listAgencyID does not come from DE 3055. ListAgencySchemeAgencyID can be the ID of the organization from DE 3055 that manages the listAgencySchemeID scheme.

A semantic example of a customer-specific code is: Purchase order—Configuration of the texts for Purchasing.

TextCollectionText

A GDT TextCollectionTextID is a unique identifier for a text within the dependent object "Text Collection." A text is unstructured, readable information that contains additional formatting information. A text may be recorded in a specific language and may be characterized by its text type. Individual texts may be managed within the dependent object "Text Collection." An example of GDT TextCollectionTextID is:

<TextCollectionTextID>16265525252525</TextCollectionTextID>

In certain implementations, GDT TextCollectionTextID may have the following structure:

| GDT | | Cat. | Object Class | Property | Representation/ Association | Type | Type Name | Len. | Card. | Remarks |
|---|---|---|---|---|---|---|---|---|---|---|
| TextCollectionTextID | | | Text Collection | Text_ Identification | Identifier | CDT | Identifier | 1..70 | | restricted |
| | schemeAgencyID | A | Identification-Scheme-Agency | Identification | Identifier | xsd | Token | 1..60 | 0..1 | |

The attributes of TextCollectionTextID may be assigned as follows: schemeID="TextCollectionTextID," schemeAgencyID can be the business system which issued the ID. TextCollectionTextID A GDT TextCollectionTextID is a unique identifier for a text within the dependent object "Text Collection." A text is unstructured, readable information that contains additional formatting information. A text may be recorded in a specific language and may be characterized by its text type. Individual texts may be managed within the dependent object "Text Collection." An example of GDT TextCollectionTextID is:

<TextCollectionTextID>16265525252525</TextCollectionTextID>

In certain implementations, GDT TextCollectionTextID may have the following structure:

| GDT | | Cat. | Object Class | Property | Representation/ Association | Type | Type Name | Len. | Card. | Remarks |
|---|---|---|---|---|---|---|---|---|---|---|
| TextCollectionTextID | | | Text Collection | Text_ Identification | Identifier | CDT | Identifier | 1..70 | | restricted |
| | schemeAgencyID | A | Identification Scheme Agency | Identification | Identifier | xsd | token | 1..60 | 0..1 | |

The attributes of TextCollectionTextID may be assigned as follows: schemeID="TextCollectionTextID," schemeAgencyID can be the business system which issued the ID.

TextCollectionTextTypeCode

A GDT TextCollectionTextTypeCode is the coded representation of the text type of a text within the dependent object "Text Collection." GDT TextCollectionTextTypeCode GDT TextCollectionTextTypeCode may describe the business aspect of texts and specify the basic properties for texts of this type. Individual texts may be managed within the dependent object "Text Collection". An example of GDT TextCollectionTextTypeCode is:

<TextCollectionTextTypeCode>1</TextCollectionTextTypeCode>

In certain implementations, GDT TextCollectionTextTypeCode may have the following structure:

| GDT | | Cat. | Object Class | Property | Representation/ Association | Type | Type Name | Len. | Card. |
|---|---|---|---|---|---|---|---|---|---|
| TextCollectionTextTypeCode | | | Text Collection | Text_ Type | Code | CDT | Code | 1..5 | |
| | listID | A | Code List | Identification | Identifier | xsd | token | | 0..1 |
| | listAgencyID | A | Code List Agency | Identification | Identifier | xsd | token | | 0..1 |
| | listVersionID | A | Code List | Version | Identifier | xsd | token | | 0..1 |
| | listAgencySchemeID | A | Code List Agency | Scheme | Identifier | xsd | token | | 0..1 |
| | listAgencySchemeAgencyID | A | Code List Agency | Scheme Agency | Identifier | xsd | token | | 0..1 |

GDT TextCollectionTextTypeCode may be assigned a customer-specific code list. With regards to attributes, ListID can be 10430. If the Customer code list remains unchanged, listAgency ID can be "310." Otherwise listAgencyID can be the ID of the customer (e.g., ID from DE 3055 if listed there). ListVersionID can be the version of the particular code list (e.g., assigned and managed by the customer). ListAgencySchemeID can be the ID of the scheme if the listAgencyID does not come from DE 3055. ListAgencySchemeAgencyID can be the ID of the organization from DE 3055 that manages the listAgencySchemeID scheme.

Semantic examples of customer-specific codes are: Vendor text (i.e., notification for vendors containing additional information for a purchase order, e.g., which means of transport is used or which warehouse receipt the goods are delivered to), Internal note (i.e., note for internal use, for example, name of the requester for a purchaser), Approval note (i.e., message for the approver), E-mail (i.e., text of an e-mail).

A GDT TextCollectionTextTypeCode may be used to specify more precisely the type of a text. It may qualify a text instance within the dependent object TextCollection and define central settings for this.

Time

A GDT Time is the elapsed time since the beginning of a 24 hour day. An example of GDT Time is:

<WakeUpTime>T06:00:00</WakeUpTime>

<OpeningTime>T08:00:00</OpeningTime>

In certain implementations, GDT Time may have the following structure:

| GDT | Object Class | Representation/ Association | Type | Type Name | Remarks |
|---|---|---|---|---|---|
| Time | Time | Type | xsd | time | restricted |

GDT Time may use the W3C "built-in data type" xsd:time, which may be structured according to the extended representation of ISO 8601. The representation for GDT Time may be the left truncated lexical representation for DateTime without optional following time zone indicator.

The extended representation of GDT Time may be as follows: hh:mm:ss(.sss). 15:30:00, for example. The extended representation may use the following literals: hh=for hours 00-23; mm=for minutes 00-59; ss=for seconds 00-59; sss=one or more characters after the decimal point represent fractions of a second (this representation may be limited to a maximum of three decimal places, that is, it may be possible to be accurate up to one hundredth of a second), there may be a colon (i.e., ":") between the hours, minutes, and seconds.

The following value ranges may be defined for GDT Time: Time, which represents 24 hours (0-23); Minutes, which represents 60 minutes (0-59); Seconds, which represents 60 seconds (0-59).

Allowed qualifiers of GDT Time may be roles defined at TimePointRoleCode. In an element name "TimePoint" may be replaced by "Time," example is "ApprovalTimePoint->ApprovalTime".

A GDT Time may be used to represent a time on any day. Examples are daily wake-up times, or the start/end times of a time period such as the work day or lunch hour.

The representation 24:00:00 (midnight) may not be supported. Input and display of 24:00:00 may be possible in the context of an interval end time-point. Technically this may be represented as 00:00:00 the following day.

TimePeriod

A GDT TimePeriod is a period of time that is defined by two points in time which are expressed by a time of day in hours, minutes, and seconds. This time period may be determined by a start time and an end time, a start time with a duration, or a duration with an end time. In certain implementations, whether the interval includes or excludes the given time-points may not be specified.

In certain implementations, GDT UPPEROPEN_TimePeriod can be used instead of GDT TimePeriod. The reason is that TimePeriod typically does not explicitly specify whether the given times for start and end are included or excluded. An example of GDT TimePeriod is:

```
<OpeningTimePeriod>
  <StartTime>08:00:00</StartTime>
  <EndTime>18:00:00</EndTime>
</OpeningTimePeriod>
<OpeningTimePeriod>
  <StartTime>08:00:00</StartTime>
  <Duration>10:00:00</Duration>
</OpeningTimePeriod>
```

In certain implementations, GDT TimePeriod may have the following structure:

| GDT | | Cat. | Object Class | Property | Representation/ Association | Type | Type Name | Card. |
|---|---|---|---|---|---|---|---|---|
| TimePeriod | | | Time Period | | Details | | | |
| | StartTime | E | Time Period | Start Time | Time | CDT | Time | 0..1 |
| | EndTime | E | Time Period | End Time | Time | CDT | Time | 0..1 |
| | Duration | E | Time Period | Duration | Duration | GDT | Duration | 0..1 |

GDT TimePeriod is an aggregation and may include the following attributes: StartTime (e.g., in the time period according to the extended representation of ISO 8601), EndTime (e.g., in the time period according to the extended representation of ISO 8601), Duration (i.e., relative duration, for example, according to the ISO 8601 convention using the time conventions hours (nH), minutes (nM) and seconds (n.nnnS)). An example of the Duration attribute is: <Duration>P12H10M13.3S</Duration>

As a possible integrity condition, the sub-elements of GDT TimePeriod may be set to optional and the representation may comprise one of the following data sets: StartTime and EndTime, StartTime and Duration, or EndTime and Duration. The end time-point may be larger than or equal to the start time-point (both accurate to the second). StartTime and EndTime are not more than 24 hours apart. In a case when EndTime is a number less than or equal to StartTime, the EndTime may occur the next day; for example, if StartTime is "18:00" and EndTime "06:00," then the value in EndTime may automatically refer to the next day. The period of time represented by Duration can be more than 24 hours, and multiple days can be expressed in terms of hours; an example of this is: <Duration>P76H</Duration>. In this example, P76H corresponds to duration of 3 days and 4 hours.

A GDT TimePeriod can be used to express periods of time in hours, minutes, and seconds. For example, it can define the daily start time and end time for the working day or the start time and duration of a transport.

For the definition of time-points of type Time, refer to GDT Time.

In certain implementations, the term Time in Object Class Term can be obsolete in the GDTs. Therefore, in such implementations, this term includes Period. This is because the term Time is given by the sub-elements using Property Term. As a result, the semantics of these GDTs may be unique.

For the possible roles of TimePeriod (like ArrivalPeriod, ValidityPeriod, etc.) see GDT PeriodRoleCode (described above).

GDT UPPEROPEN_TimePeriod

A GDT UPPEROPEN_TimePeriod is a period that is defined by two points in time. These points in time may be expressed by a time of day. UPPEROPEN_TimePeriod may include the start time-point and exclude the end time-point. An example of GDT UPPEROPEN_TimePeriod is:

```
<OpeningTimePeriod>
   <StartTime>08:00:00</StartTime>
   <EndTime>16:00:00</EndTime>
</OpeningTimePeriod>
```

In certain implementations, GDT UPPEROPEN_TimePeriod may have the following structure:

| GDT | | Cat. | Object Class | Property | Representation/ Association | Type | Type Name | Card. |
|---|---|---|---|---|---|---|---|---|
| UPPEROPEN_TimePeriod | | | UPPEROPEN_ Time Period | Details | | | | |
| | Start-Time | E | Time Period | Start Time | Time | GDT | Time | 0..1 |
| | EndTime | E | Time Period | End Time | Time | GDT | Time | 0..1 |

For the possible qualifiers of GDT UPPEROPEN_TimePeriod refer to GDT PeriodRoleCode. Allowed qualifiers of GDT TimePeriod are also defined at GDT PeriodRoleCode, for example, ActivePeriod GDT UPPEROPEN_TimePeriod may be a restriction on GDT TimePeriod. GDT UPPEROPEN_TimePeriod contains the variable "UPPEROPEN_," which may be replaced by one (or more) qualifiers.

TimePoint

A GDT TimePoint is a unique point in time in a given time reference frame. The granularity can be time, date, or date time with and without time zone context. An alternative English term is "point-in-time." An example of GDT TimePoint is:

```
<!--_LOCAL_DateTime-->
<AccidentTimePoint>
   <TypeCode>6</TypeCode>
   <DateTime timeZoneCode="CET"
      daylightSavingTimeIndicator="true">2005-10-
      30T02:30:30</Date>
</AccidentTimePoint>
<!--Date-->
<ContractStartTimePoint>
   <TypeCode>1</TypeCode>
   <Date>2005-11-01</Date>
</ContractStartTimePoint>
<!--Time-->
<OpeningTimePoint>
   <TypeCode>2</TypeCode>
   <Date>T08:30:00</Date>
</OpeningTimePoint>
```

In certain implementations, GDT TimePoint may have the following structure:

| GDT | | Cat. | Object Class | Property | Rep./ Ass. | Type | Type Name | Card. |
|---|---|---|---|---|---|---|---|---|
| TimePoint | | | Time Point | | Details | | | |
| | TypeCode | E | Time Point | Type | Code | GDT | TimePointTypeCode | 1 |
| | Date | E | Time Point | Date | Date | GDT | Date | 0..1 |

-continued

| GDT | | Cat. | Object Class | Property | Rep./ Ass. | Type | Type Name | Card. |
|---|---|---|---|---|---|---|---|---|
| | Time | E | Time Point | Time | Time | CDT | Time | 0..1 |
| | DateTime | E | Time Point | Date Time | Date Time | CDT | DateTime | 0..1 |

GDT TimePoint is an aggregation and its attributes may include the following: TypeCode (i.e., gives the type of the represented time-point; depending on this type one on the other elements may be provided), Date (i.e., represents the date if the TimePoint Type is 1—Date), Time (i.e., represents the time if the TimePoint Type is 2—Time), DateTime (i.e., represents the date & time if the TimePoint Type is not 1 or 2).

GDT TimePoint can support multiple time reference frames in which a point in time can be specified; for example, the reference frame “Time of a day” where a time-point is handled by the type Time (Code=2).

As a possible integrity condition, one of the elements Date, Time or DateTime is filled. The following list of type codes includes possible combinations depending on the given TimePointTypeCode: 1 (e.g., Date), 2 (e.g., Time), 3 (e.g., _TIMEZONEINDEPENDENT_DateTime; i.e., DateTime without suffix), 4 (e.g., _GLOBAL_DateTime; i.e., DateTime with ‘Z’), 5 (e.g., _LOCALNORMALIZED_DateTime; i.e., DateTime with ‘Z’/DateTime@TimeZoneCode), 6 (i.e., _LOCAL_DateTime; i.e., DateTime without suffix/DateTime@TimeZoneCode/DateTime@DaylightSavingTimeIndicator), 7 (i.e., _LOCALOFFSET_DateTime, i.e., DateTime with +Offset).

Allowed qualifiers of TimePoint may be roles defined at GDT TimePointRoleCode. An example of a qualifier is: ApprovalTimePoint Time Points may be used when the type of time point is variable, such as with an application that allows a user to enter multiple time-points of different types (birth dates as Dates and calling time-points as Local DateTime).

Time Points are a generic concept. They can be used if the application needs to support a generic approach. An example would be an application that has to handle a simple date in the same way as a globally unique time-point expressed as date & time in UTC (Global DateTime).

TimePointPeriod

A GDT TimePointPeriod is a period that is defined by two points in time of the same type. The time period may be determined by a start time-point and an end time-point, duration and a start time point, or duration with an end time point. An example of GDT TimePointPeriod is:

```
<ContractValidityPeriod>
  <PeriodBoundaryTypeCode>2</PeriodBoundaryTypeCode> <!--upper open period-->
  <StartTimePoint>
    <TypeCode>6</TypeCode> <!--Local DateTime-->
    <DateTime timeZoneCode="CET" daylightSavingTimeIndicator="true">2005-10-30T02:30:30</Date>
  </StartTimePoint>
  <EndTimePoint>
    <TypeCode>6</TypeCode>
    <DateTime timeZoneCode="CET" daylightSavingTimeIndicator="false">2006-10-30T02:30:30</Date>
</EndTimePoint>
</ContractValidityPeriod>
```

In certain implementations, GDT TimePointPeriod may have the following structure:

| GDT | | Cat. | Object Class | Property | Representation/ Association | Type | Type Name | Card. |
|---|---|---|---|---|---|---|---|---|
| Time-PointPeriod | | | Time Point Period | | Details | | | |
| | Interval-Bound-aryType-Code | E | Time Point Period | Interval Bound-ary Type Code | Code | GDT | IntervalBoundaryType-Code | 1 |
| | StartTime Point | E | Time Point Period | Start Time Point | Details | GDT | TimePoint | 0..1 |
| | End-TimePoint | E | Time Point Period | End Time Point | Details | GDT | TimePoint | 0..1 |
| | Duration | E | Time Point Period | Duration | Duration | CDT | Duration | 0..1 |

TimePointPeriod is an aggregation and its attributes may include the following: IntervalBoundaryTypeCode (i.e., specifies if the time-points are included in the period), StartTimePoint (i.e., time point specifying the start of the period), EndTimePoint (i.e., time point specifying the end of the period), Duration (i.e., relative duration in accordance with convention ISO 8601; representation conventions for year (nY), month (nM), and day (nD) can be used).

As a possible integrity condition, the attributes for start, end and duration may be set to optional. The representation may comprise a data set such as the following: StartDateTime & EndDateTime, StartDateTime & Duration, or EndDateTime & Duration. The TimePointTypeCode of StartTimePoint and EndTimePoint may be identical; for the time-points, the same constraints may apply as specified in GDT TimePoint. Allowed qualifiers of TimePeriodPeriod may be roles defined at PeriodRoleCode. For example, ActivePeriod GDT TimePoint can be used to specify a time period that can be expressed by means of two general time-points. The user may specify the time-point type which allows, for example, the handling of Date-Only-Based periods or date and time periods given in a time zone. In addition, PeriodBoundaryTypeCode may allow these time-points to specify boundaries for selections.

In contrast to other date and time periods, GDT TimePointPeriod may be specified as to whether the start- and end time-points are included or not.

TimePoints are a generic concept. They may be used if the application needs to support a generic approach. An example would be an application that has to handle a simple date in the same way as a globally unique time-point expressed as date and time in UTC (Global DateTime). The same applies to GDT TimePointPeriod—use primarily if flexibility is needed. In other cases it may be appropriate to use DatePeriod, TimePeriod or DateTimePeriod with all their specializations.

The term DateTime in Object Class Term is obsolete in GDTs. Therefore, this term only comprises Period. This is because the term DateTime is given by the sub-elements using Property Term. As a result, the semantic of these GDTs is unique.

TimePointRoleCode

A GDT TimePointRoleCode is a coded representation of the business role of a timepoint. An example of GDT TimePointRoleCode is:

<TimePointRoleCode>1</TimePointRoleCode>

In certain implementations, GDT TimePointRoleCode may have the following structure:

| GDT | | Object Class | Property | Representation/ Association | Type | Type Name | Len. | Card. | Remarks |
|---|---|---|---|---|---|---|---|---|---|
| TimePoint RoleCode | | | Time Point Role | Code | CDT | Code | 1..3 | | Restricted |
| | listID | Code List | Identification | Identifier | xsd | token | | 0..1 | |
| | listAgencyID | Code List Agency | Identification | Identifier | xsd | token | | 0..1 | |
| | listVersionID | Code List | Version | Identifier | xsd | token | | 0..1 | |
| | listAgency SchemeID | Code List Agency | Scheme | Identifier | xsd | token | | 0..1 | |
| | listAgency SchemeAgencyID | Code List Agency | Scheme Agency | Identifier | xsd | token | | 0..1 | |

GDT TimePointRoleCode may be assigned an extendable, changeable customer code list. With regards to attributes, ListID can be 10397. If the Customer code list remains unchanged, the listAgency ID can be "310," otherwise listAgencyID can be the ID of the customer (e.g., ID from DE 3055 if listed there). ListVersionID can be the version of the particular code list (e.g., assigned and managed by the customer). ListAgencySchemeID can be the ID of the scheme if the listAgencyID does not come from DE 3055. ListAgencySchemeAgencyID can be the ID of the organization from DE 3055 that manages the listAgencySchemeID scheme.

Time points may be composed of one of the following types: Date, Time, GLOBAL_DateTime, LOCAL_DateTime, TIMEZONEINDEPENDENT_DateTime, LOCALOFFSET_DateTime and TimePoint.

A code list for GDT TimePointRoleCode may be assigned in the following manner: 1 (i.e., AccountingTransactionTimePoint), 2 (i.e., AdvertisementTimePoint), 3 (i.e., ArrivalTimePoint), 4 (i.e., AuthorisationTimePoint), 5 (i.e., AvailabilityTimePoint), 6 (i.e., BaselineTimePoint), 7 (i.e., BidderApplicationTimePoint), 8 (i.e., BirthTimePoint), 9 (i.e., BusinessTransactionDocumentTimePoint), 10 (i.e., CancellationTimePoint), 11 (i.e., CarrierHandoverTimePoint), 12 (i.e., CategorizationTimePoint), 13 (i.e., ChangeTimePoint), 14 (i.e., ChequeCashingTimePoint), 15 (i.e., ClearingTimePoint), 16 (i.e., CompletionTimePoint), 17 (i.e., CopyTimePoint), 18 (i.e., CreationTimePoint), 19 (i.e., CurrencyConversionTimePoint), 20 (i.e., DayDivideTimePoint), 21 (i.e., DeathTimePoint), 22 (i.e., DecisionTimePoint), 23 (i.e., DeductionTimePoint), 24 (i.e., DeliveryTimePoint), 25 (i.e., DepositTimePoint), 26 (i.e., DeterminationTimePoint), 27 (i.e., DueTimePoint), 28 (i.e., DunningTimePoint), 29 (i.e., EndTimePoint), 30 (i.e., EntryTimePoint), 31 (i.e., EvaluationTimePoint), 32 (i.e., EventTimePoint), 33 (i.e., ExecutionTimePoint), 34 (i.e., ExpirationTimePoint), 35 (i.e., ExplosionTimePoint), 36 (i.e., FlatRateTimePoint), 37 (i.e., FollowUpTimePoint), 38 (i.e., FoundationTimePoint), 39 (i.e., FullfillmentTimePoint), 40 (i.e., InspectionTimePoint), 41 (i.e., InvoicingTimePoint), 42 (i.e., IssueTimePoint), 43 (i.e., LiquidationTimePoint), 44 (i.e., LoadingTimePoint), 45 (i.e., MileageTimePoint), 46 (i.e., MoveTimePoint), 47 (i.e., NotificationTimePoint), 48 (i.e., OrderingTimePoint), 49 (i.e., PackingTimePoint), 50 (i.e., PaymentTimePoint), 51 (i.e., PickingTimePoint), 52 (i.e., PickupTimePoint), 53 (i.e., PlannedTimePoint), 54 (i.e., PositioningTimePoint), 55 (i.e., PostingTimePoint), 56 (i.e., ProductionTimePoint), 57 (i.e., PurchaseTimePoint), 58 (i.e., PurchasingContractReleaseTimePoint), 59 (i.e., PutawayTimePoint), 60 (i.e., ReceiptTimePoint), 61 (i.e., RequestTimePoint), 62 (i.e., ResetTimePoint), 63 (i.e., RollTimePoint), 64 (i.e., StartTimePoint), 65 (i.e., SubstituteTimePoint), 66 (i.e., SupplierQuoteBindingTimePoint), 67 (i.e., SupplierQuoteOpeningTimePoint), 68 (i.e., TransactionTimePoint), 69 (i.e., UnloadingTimePoint), 70 (i.e., UnpackingTimePoint), 71 (i.e., ValidityTimePoint), 72 (i.e., ValidityEndTimePoint), 73 (i.e., ValidityStartTimePoint), 74 (i.e., ValuationTimePoint), 75 (i.e., ValueTimePoint), 76 (i.e., VoidingTimePoint), 77 (i.e., YardArrivalTimePoint), 78 (i.e., YardDepartureTimePoint), 79 (i.e., CapitalizationTimePoint), 80 (i.e., CompletionDueTimePoint), 81 (i.e., DeactivationTimePoint), 82 (i.e., DeletionTimePoint), 83 (i.e., FirstAcquisitionTimePoint), 84 (i.e., FirstReactionDueTimePoint), 85 (i.e., ForecastEndTimePoint), 86 (i.e., InterestStartTimePoint), 87 (i.e., KeyTimePoint), 88 (i.e., LastConfirmedTimePoint), 89 (i.e., LastLoginTimePoint), 90 (i.e., LastPromisedTimePoint), 91 (i.e., LastRetirementTimePoint), 92 (i.e., OpeningTimePoint), 93 (i.e., ProvisionTimePoint), 94 (i.e., ReleaseTimePoint), 95 (i.e., RequestClosedAtTimePoint), 96 (i.e., RequestCompletionByProviderDueTimePoint), 97 (i.e., RequestFinishedAtTimePoint), 98 (i.e., RequestInitialReceiptTimePoint), 99 (i.e., RequestInProcessAtTimePoint), 100 (i.e., RequestReceiptTimePoint), 101 (i.e., RequestFromProviderReceiptAtTimePoint), 102 (i.e., RequestToProviderSentTimePoint), 103 (i.e., RequirementTimePoint), 104 (i.e., SentTimePoint), 105 (i.e., SettlementTimePoint).

GDT TimePointRoleCode may be used to specify the semantic of a time-point during runtime. Time-points may be typed with one of the following types: Date, Time, GLOBAL_DateTime, LOCAL_DateTime, TIMEZONEINDEPENDENT_DateTime, LOCALOFFSET_DateTime and TimePoint.

TimePointRoleCodes cover the business semantics of time-points. In certain implementations, identical Qualifiers and RoleCodes can use the same business semantic. As a result, the codes may include GDT qualifiers which are listed in TimePointPeriod (described above).

TimePointTypeCode

A GDT TimePointTypeCode is the coded representation of the type of a time-point. A time-point type may describe the granularity of a time-point and specify the reference frame, in which this time-point is given. An example of GDT TimePointTypeCode is:

<TimePointTypeCode>1</TimePointTypeCode>
<ContractStartTimePoint>
<TypeCode>1</TypeCode>
<Date>2005-11-01</Date>
</ContractStartTimePoint>

In certain implementations, GDT TimePointTypeCode may have the following structure:

| GDT | Cat. | Object Class | Property | Representation/ Association | Type | Type Name | Len. | Remarks |
|---|---|---|---|---|---|---|---|---|
| TimePointTypeCode | | Time Point | Type | Code | CDT | Code | 1 | restricted |

GDT TimePointTypeCode may be assigned a customer code list. The attributes of the code are not required because constant values are assigned to them in a customer system at runtime; they are implicitly assigned in the following way: ListID="10408," listAgencyID="310," listVersionID=assigned and managed by customer.

GDT TimePointTypeCode may use the following codes: 1 (i.e., Date), 2 (i.e., Time), 3 (i.e., Timezone Independent DateTime), 4 (i.e., Global DateTime), 5 (i.e., Local DateTime), 6 (i.e., LocalOffset DateTime), 7 (i.e., Local Normalised DateTime)

GDT TimePointTypeCode may be used to specify the time-point concept used in GDT TimePoint.

Even though Local Normalized DateTime is not modelled as a separate GDT, it resides in the list of TimePoint Type Codes. In concept, the codes for Local Normalized DateTime and Local DateTime are similar but not equal. Both codes can specify a unique local time point with date, time and time zone. Local Normalized DateTime stores the value of date and time in time zone UTC, while Local DateTime stores the value as a local value. Local Normalized DateTime is designed to be more technical and it can be used with systems that do not support the specified time zone. Local DateTime is designed such that user input does not have to be converted into UTC (this may be especially important in legal applications). It is possible to do a conversion between Local Normalized DateTime and Local DateTime in both directions (i.e., convert from Local Normalized DateTime to Local DateTime and covert from Local DateTime to Local Normalized DateTime).

TimeSeries

A GDT TimeSeries is time series information that includes of items that each contain a period with a start time and an end time, and a period-based quantity or price. An example of GDT TimeSeries is:

<TimeSeries>
<Item>
<ValidityPeriod>
<StartDateTime>2002-04-19T15:00:00Z</StartDateTime>
<EndDateTime>2002-04-19T17:00:00Z</EndDateTime>
</ValidityPeriod>
<Quantity unitCode="PC">150</Quantity>
</Item>
</TimeSeries>

In certain implementations, GDT TimeSeries may have the following structure:

| GDT | | | Cat. | Object Class | Property | Representation/ Association | Type | Type Name | Card. |
|---|---|---|---|---|---|---|---|---|---|
| TimeSeries | | | | Time Series | | Details | | | |
| | Item | | E | Time Series | Item | Details | | | 1..n |
| | | ValidityPeriod | E | Time Series | Validity Period | Details | GDT | DateTimePeriod | 1 |
| | | Quantity | E | Time Series | Quantity | Quantity | CDT | Quantity | 0..1 |
| | | Price | E | Time Series | Price | Details | GDT | Price | 0..1 |
| | | FixedIndicator | E | Time Series | Fixed Indicator | Indicator | GDT | FixedIndicator | 0..1 |
| | | AdjustmentReasonCode | E | Time Series | Adjustment Reason | Code | GDT | AdjustmentReasonCode | 0..1 |
| | | Note | E | Time Series | Note | Text | GDT | Note | 0..1 |

The attributes of GDT TimeSeries may include the following: TimeSeriesItem (i.e., an item in a time series which can be repeated as often as required), ValidityPeriod (i.e., describes the validity period of the time series item with a start time stamp and an end time stamp), Quantity (is type GDT: Quantity and describes the quantity connected with the time series item), Price (i.e., describes the price connected with the time series item), FixedIndicator (i.e., describes whether the corresponding item is blocked for changes or not), AdjustmentReasonCode (i.e., describes the reason for a change that has been made), note (i.e., a short note for the time series item; this can be a note for the entire time series item or a note for a part of the time series item, such as a more detailed explanation of an AdjustmentReasonCode).

As a possible integrity condition, one of the elements Quantity or Price is entered.

GDT TimeSeries may be used as a generic data type that may have various specifications in an interface depending on the context category used; for example, “Sales” to describe sales quantities or “Consumption” to describe consumption quantities, etc.

TimeTolerance

A GDT TimeTolerance is the allowed time difference between two points of time, expressed in the form of a duration. An example of GDT TimeTolerance is:

<TimeTolerance>
<UpperVarianceDuration>P2D</UpperVarianceDuration>
<LowerVarianceDuration>P2D</LowerVarianceDuration>
</TimeTolerance>

In certain implementations, GDT TimeTolerance may have the following structure:

| GDT | | Cat. | Object Class | Property | Rep./ Ass. | Type | Type Name | Card. |
|---|---|---|---|---|---|---|---|---|
| TimeTolerance | | | Time Tolerance | | Details | | | |
| | UpperVariance-DurationUnlim-itedIndicator | E | Time Tolerance | Upper Variance Duration Unlimited | | CDT | Indicator | 0..1 |
| | UpperVariance-Duration | E | Time Tolerance | Upper Variance Duration | | GDT | Duration | 0..1 |
| | LowerVari-anceDuration | E | Time Tolerance | Lower Variance Duration | | GDT | Duration | 0..1 |

The attributes of GDT TimeTolerance may include the following UpperVarianceDuration, UpperVarianceDurationUnlimitedIndicator, and LowerVarianceDuration.

For UpperVarianceDuration, if a value x is specified in this field, a deadline Y may be delayed by up to x weeks, days, hours, etc. If 0 is specified for UpperVarianceDuration it means that the deadline cannot be postponed. For example, if the requested delivery date is Oct. 10, 2006 and UpperVarianceDuration=3 days, delivery may be delayed by up to 3 days. Delivery should take place by Oct. 13, 2006 at the latest.

UpperVarianceDurationUnlimitedIndicator specifies whether a delay of arbitrary time is allowed. The UpperVarianceDurationUnlimitedIndicator is relevant only for the upper boundary.

The following combinations may be allowed: ‘True’ or ‘1’ (i.e., a delay of arbitrary time is allowed), ‘False’ or ‘0’ (i.e., no delay of arbitrary time is allowed). If UpperVarianceDurationUnlimitedIndicator is not specified, this can means that no delay of arbitrary time is allowed.

For LowerVarianceDuration, if a value x is specified in this field, a deadline Y may be brought forward by up to x weeks, days, hours, etc. If 0 is specified for UpperVarianceDuration, it means that the deadline cannot be brought forward. If LowerVarianceDuration is not specified, this also means that the deadline cannot be brought forward. Example: If the requested delivery date is Oct. 10, 2006, and LowerVarianceDuration=3 days, delivery may be brought forward by up to 3 days, at the earliest on Oct. 7, 2006.

As a possible integrity condition, the attribute fields UpperVarianceDuration and UpperVarianceDurationUnlimitedIndicator may be mutually exclusive. In addition, it may be necessary to specify at least one element.

GDT TimeTolerance can specify which difference can be tolerated between a requested date and the actual date (e.g., delivery date). This duration may be specified separately according to whether the deadline is postponed or brought forward.

TimeZoneDifferenceValue

A GDT TimeZoneDifferenceValue is the difference (in hours) between the local time zone and UTC (Coordinated Universal Time), which is given as a point of reference. An example of GDT TimeZoneDifferenceValue is:

<TimeZoneDifferenceValue>4.5</TimeZoneDifferenceValue>?

In certain implementations, GDT TimeZoneDifferenceValue may have the following structure:

| GDT | Object Class | Property | Representation/ Association | Type | Type Name | Len. | Remarks |
|---|---|---|---|---|---|---|---|
| TimeZoneDifferenceValue | | Time Zone Difference | Value | GDT | Decimal-Value | 2.2 | Max. Value 12 Min. Value 12 |

Since the W3C built-in data type “xsd:decimal” may be used for TimeZoneDifference, the hours may precede the comma and the minutes follow it. Negative values may be prefixed with a negative sign (−).

The minutes after the comma may be expressed in hundredths of a minute; for example, the value “0.5” corresponds to 30 minutes. Minutes may also be displayed in the time difference, because some countries or regions are divided into half-hour or three-quarters of an hour time zones. For example, Afghanistan (4.5), northern Australia (9.5), southern Australian (10.5), India (5.5), Nepal (5.75), etc.

A facet “xsd:enumeration” may be created for each valid time zone value.

TimeZoneDifferenceValue may be used to determine the local time zone of the relevant business partner or to determine the current time zone.

TradeReceivablesPayablesRegisterGroupingCriterionCode

A GDT TradeReceivablesPayablesRegisterGroupingCriterionCode is the coded representation of a criterion to group trade receivables and payables from goods and services. An example of GDT TradeReceivablesPayablesRegisterGroupingCriterionCode is:

<TradeReceivablesPayablesRegisterGroupingCriterionCode>1</TradeReceivablesPayablesRegisterGroupingCriterionCode>

In certain implementations, GDT TradeReceivablesPayablesRegisterGroupingCriterionCode may have the following structure:

| GDT | | Cat. | Object Class | Property | Representation/ Association | Type | Type Name | Len. | Card. | Remarks |
|---|---|---|---|---|---|---|---|---|---|---|
| TradeReceivablesPayablesRegisterGroupingCriterionCode | | | Trade Receivables Payables Register | Grouping Criterion | Code | CDT | Code | 1..2 | | restricted |
| | listID | A | Code List | Identification | Identifier | Xsd | token | | 0..1 | |
| | listAgencyID | A | Code List Agency | Identification | Identifier | Xsd | token | | 0..1 | |
| | listVersionID | A | Code List | Version | Identifier | Xsd | token | | 0..1 | |
| | listAgencySchemeID | A | Code List Agency | Scheme | Identifier | Xsd | token | | 0..1 | |
| | listAgencySchemeAgencyID | A | Code List Agency | Scheme Agency | Identifier | Xsd | token | | 0..1 | |

GDT may be assigned a customer-specific code list. With regards to attributes, ListID can be 10252. If the Customer code list remains unchanged, listAgency ID can be "310." Otherwise listAgencyID can be the ID of the customer (e.g., ID from DE 3055 if listed there). ListVersionID can be the version of the particular code list (e.g., assigned and managed by the customer). ListAgencySchemeID can be the ID of the scheme if the listAgencyID does not come from DE 3055: ListAgencySchemeAgencyID can be the ID of the organization from DE 3055 that manages the listAgencySchemeID scheme.

A TradeReceivablesPayablesRegisterGroupingCriterion Code may be assigned a code list in the following manner: 1 (i.e., by contract).

GDT TradeReceivablesPayablesRegisterGrouping CriterionCode may be used to define further grouping criteria in addition to the process-specific grouping criteria for open items. It may use existing attributes of the business object TradeReceivablesPayablesRegister.

Process-specific grouping criteria are grouping criteria that may be considered within a business process for a grouping. Examples of process-specific grouping criteria with an open item are payment recipient and payment sender. During the grouping of open items, open items that match in all grouping criteria may be summarized.

There can be a default TradeReceivablesPayablesRegisterGroupingCriterionCode in a company. An alternative TradeReceivablesPayablesRegisterGroupingCriterionCode can be entered for individual business partners (for example, a grouping by contracts at specific customers).

TradeReceivablesPayablesRegisterItemTypeCode

A GDT TradeReceivablesPayablesRegisterItemTypeCode is the coded representation of the type of a receivable or payable from goods and services. A TradeReceivablesPayablesRegister is the trade receivables/payables from goods and services of a company from/to its business partners. A TradeReceivablesPayablesRegisterItem is a receivable or payable from an underlying business transaction. The type of this receivable or payable may be derived from the underlying business transaction. An example of GDT TradeReceivablesPayablesRegisterItemTypeCode is:

<TradeReceivablesPayablesRegisterItemTypeCode>1</TradeReceivablesPayablesRegisterItemTypeCode>

In certain implementations, GDT TradeReceivablesPayablesRegisterItemTypeCode may have the following structure:

| GDT | Cat. | Object Class | Property | Representation/ Association | Type | Type Name | Len. | Remarks |
|---|---|---|---|---|---|---|---|---|
| TradeReceivablesPayablesRegisterItemTypeCode | | Trade Receivables Payables Register Item | Type | Code | CDT | Code | 1..2 | restricted |

For GDT TradeReceivablesPayablesRegisterItemTypeCode, a customer code list is assigned to the code. The attributes of the code are not required because constant values would be assigned to them in a customer system at runtime; they are implicitly assigned in the following way: ListID="10302," listAgencyID="310," listVersionID=assigned and managed by customer.

GDT TradeReceivablesPayablesRegisterItemTypeCode may use the following codes: 1 (i.e., Invoice), 2 (i.e., Credit Memo), 3 (i.e., Down payment request), 4 (i.e., Down payment), 5 (i.e., payment).

TransmissionID

A GDT TransmissionID is a unique identifier for a transmission. Transmission is the transfer of information that belongs together by a sequence of (sub) messages. The sequence can comprise a single message. An example of GDT TransmissionID is:

<TransmissionID>4/7_CatalogXYZ</TransmissionID>

In certain implementations, GDT TransmissionID may have the following structure:

| GDT | Object Class | Property | Representation/ Association | Type | Type Name | Len. | Remarks |
|---|---|---|---|---|---|---|---|
| TransmissionID | Transmission | Identification | Identifier | CDT | Identifier | 1..40 | restricted |

GDT TransmissionID is a character string. The following list includes possible values: upper case letters from A to Z (without German umlauts), digits from 0 to 9, – (minus sign), _ (underscore), / (forward slash), \ (back slash), . (period).

As a possible integrity condition, the sender and receiver use the same TransmissionID once during a communication.

TransmissionID may be used to transfer objects that can only be divided up and sent in multiple messages due to their large size. TransmissionID may be used in message context such as the following: in submessages, which actually transmit the object, to uniquely identify a sequence of submessages that belong together; in messages that confirm the receipt and processing of individual submessages; in messages that confirm the receipt and processing of the complete sequence of submessages and therefore of the complete object; in messages that display the cancellation of the transmission.

TransportationLaneID

A GDT TransportationLaneID is a unique identifier for a transportation lane. A TransportationLane is a transport relationship between two locations (optionally with planning areas) within supply planning. An example of GDT TransportationLaneID is:

<TransportationLaneID>JW_SNP_SCM50</TransportationLaneID>

In certain implementations, GDT TransportationLaneID may have the following structure:

| GDT | Object Class | Property | Representation/ Association | Type | Type Name | Len. | Remarks |
|---|---|---|---|---|---|---|---|
| TransportationLaneID | Transportation Lane | Identification | Identifier | CDT | Identifier | 1..22 | Restricted |

-

As a possible integrity condition, GDT TransportationLaneID may be unique within a combination of the start and target locations.

TransportationTerms

A GDT TransportationTerms is a collection of the conditions and agreements that apply when transporting the ordered goods and providing the necessary services and activities for this. An example of GDT TransportationTerms is:

<TransportationTerms>
<TransportServiceLevelCode listID="DE 4219" listVersionID="D.02B" listAgencyID="6">1</TransportServiceLevelCode>
<TransportModeCode listID="DE 8067" listVersionID="D.02B" listAgencyID="6">1</TransportModeCode>
<TransportMeans>
<ID>HD AA-123</ID>
<MeansDescriptionCode listID="DE 8179" listVersionID="D.02B" listAgencyID="6">4</MeansDescriptionCode>
</TransportMeans>
<Description langCode="de">
This is a German description text.
</Description>
<TransportationTerms>

Notes to above example:

ListAgencyID="6" "shows UN/ECE"

listVersionID="D.02B" shows UN/EDIFACT standard directory year 2002, version B listID="DE 4219" shows UN/EDIFACT "Transport Service Priority Code"

listID="DE 8067" shows UN/EDIFACT "Transport Mode Name Code"

listID="DE 8179" shows UN/EDIFACT "Transport Means Description Code"

In certain implementations, GDT TransportationTerms may have the following structure:

| GDT | | Cat. | Object Class | Property | Representation/ Association | Type | Type Name | Card. |
|---|---|---|---|---|---|---|---|---|
| Transportation-Terms | | | Transportation Terms | | Details | | | |
| | Transport-ServiceLevel-Code | E | Transportation Terms | Transport_ Service Level | Code | GDT | Transport-ServiceLevel-Code | 0..1 |
| | Transport-ModeCode | E | Transportation Terms | Transport Mode | Code | GDT | Transport-ModeCode | 0..1 |
| | Transport-Means | E | Transportation Terms | Transport Means | Details | GDT | Transport-Means | 0..1 |
| | Description | E | Transportation Terms | Description | Text | GDT | LONG _ Description | 0..1 |

GDT TransportationTerms may contain detailed specifications on the agreed means of transportation (such as shipping/transport type and means of transport to be used). Moreover, additional information may also be specified in the form of free text.

The specific attributes of GDT TransportationTerms may include the following: Trans-portServiceLevelCode (i.e., regarding the delivery of goods, agreed/predefined services concerning the speed of the delivery as part of the ordered service), TransportModeCode (i.e., how the delivery is to be made and the transport route to be taken without, however, specifying a concrete route or means of transport), TransportMeans (i.e., the description of a means of transport, can also contain information to identify it more closely), Description (i.e., natural language text for defining additional information).

As a possible integrity condition, the specification of each structural element may be optional. The specifications for TransportModeCode and TransportMeansDescriptionCode should follow business integrity; for example, ModeCode="Maritime Transport" und MeansDescriptionCode="Train with 20 or more wagons").

With the information in GDT TransportationTerms, the involved business partners (purchaser and seller) may agree on the conditions regarding the transportation of the ordered products/goods in the form of orders or purchase orders. They may determine and influence the flow of the subsequent logistical processes (e.g., influence the selection of the transportation service providers and the conditions to be negotiated with them, selection of a logistical organizational unit for the delivery, and so on).

A similar segment can be found in the UN/EDIFACT standard with segment ToD ("Terms of Delivery or Transport"). A similar structure can be found in the RosettaNet standard in cluster 3 ("Order Management"), segment 3A ("Quote and Order Entry") in PIP 3A4 "Request Purchase Order" with the business data entity "OrderShippingInformation." Similar information can be found in X12 standard version V4010 under message 850 ("Purchase Order") with segments 230 to 260 (TD124, TD525, TD326, TD427, "Carrier Details").

TransportationZoneID

A GDT TransportationZoneID is an unique identifier for a TransportationZone. A TransportationZone is a zone containing geographical locations that may be considered collectively for modelling or planning transportation routes or transportations. An example of GDT TransportationZoneID is:

<TransportationZoneID>DE-POSTAL3-691 XX</TransportationZoneID>

In certain implementations, GDT TransportationZoneID may have the following structure:

| GDT | Object Class | Property | Representation/ Association | Type | Type Name | Len. | Remarks |
|---|---|---|---|---|---|---|---|
| TransportationZoneID | Transportation Zone | Identification | Identifier | CDT | Identifier | 1..20 | Restricted |

TransportationZoneStructureTypeCode

A GDT TransportationZoneStructureTypeCode is a coded representation of the type of the structure of a transportation zone. A TransportationZone is a zone containing geographical locations that may be considered collectively for modelling or planning transportation routes or transportations. An example of GDT TransportationZoneStructureTypeCode is:

<TransportationZoneStructureTypeCode>1</TransportationZoneStructureTypeCode>

In certain implementations, GDT TransportationZoneStructureTypeCode may have the following structure:

| GDT | Object Class | Property | Representation/ Association | Type | Type Name | Len. | Remarks |
|---|---|---|---|---|---|---|---|
| TransportationZoneStructureTypeCode | Transportation Zone | Structure_ Type | Code | CDT | Code | 1..2 | restricted |

GDT TransportationZoneStructureTypeCode is assigned a customer code list. The attributes of the code are not required because constant values are assigned to them in a customer system at runtime; they may be implicitly assigned in the following way: ListID="10465," listAgencyID "310," listVersionID=assigned and managed by customer.

GDT TransportationZoneStructureTypeCode may use the following codes: 1 (i.e., set of locations), 2 (i.e., set of regions), 3 (i.e., set of postal code intervals), 4 (i.e., mixed).

TransportDistanceDurationDeterminationMethodCode

A GDT TransportDistanceDurationDeterminationMethodCode is the coded representation of the method used to determine a distance or duration of a transport. The distance or duration can either be calculated by the system on the basis of the straight-line distance or it can be set manually. An example of GDT TransportDistanceDurationDeterminationMethodCode is:

<TransportDistanceDurationDeterminationMethodCode>1</TransportDistanceDurationDeterminationMethodCode>

In certain implementations, GDT TransportDistanceDurationDeterminationMethodCode may have the following structure:

GDT TransportMeans may use the following attributes: TransportMeansID (i.e., may be used to identify the means of transport, e.g., this may be a license number for a truck or the identification number of a container), TransportMeansDescriptionCode (i.e., a coded representation of the transport means description, see also GDT TransportMeansDescriptionCode).

As a possible integrity condition, TransportMeansID may take into account string length restrictions defined in the xsd:token and TransportMeansID may refer to the transport means description specified using the "TransportMeansDescriptionCode".

| GDT | Object Class | Property | Representation/ Association | Type | Type Name | Len. | Remarks |
|---|---|---|---|---|---|---|---|
| TransportDistance-DurationDetermination-MethodCode | Transport Distance Duration | Determination Method | Code | CDT | Code | 1..3 | Restricted |

GDT TransportDistanceDurationDeterminationMethodCode is assigned a customer code list. The attributes of the code is not required because constant values are assigned to them in a customer system at runtime; they are implicitly assigned in the following way: ListID="10313," listAgencyID="310," listVersionID=assigned and managed by customer.

GDT TransportDistanceDurationDeterminationMethodCode may use the following codes: 1 (i.e., straight-line distance), 2 (i.e., manually set).

GDT TransportDistanceDurationDeterminationMethodCode may be used in the TransportationLane, for example, to record how distances or durations were calculated.

TransportMeans

A GDT TransportMeans is the description of a means of transport and can also include information for a more detailed identification. TransportMeans is composed of the two subelements "TransportMeansID" and "TransportMeansDescriptionCode" from the Global Data Type "TransportMeansDescriptionCode." An example of GDT TransportMeans is:

<TransportMeans>

<ID>HD-ES 1234</ID>

<DescriptionCode>31</DescriptionCode>

</TransportMeans>

In certain implementations, GDT TransportMeans may have the following structure:

GDT TransportMeans may be used within the shipping notification to provide a goods recipient the description and exact identification of the means of transport with which the goods are delivered.

"TransportMeansID" may correspond to the "Means of transport ID" (TRAID) used in the R/3 in the IDOC DELVRY03. "TransportMeansDescriptionCode" may correspond with the "Means of Transport Type" (TRATY) used in the R/3 in the IDOC DELVRY03.

TransportMeansDescriptionCode

A GDT TransportMeansDescriptionCode is a coded representation of the transport means type with which goods or persons are to be transported (e.g., road tanker, barge, airplane, refrigerated road tanker, . . . ). An example of GDT TransportMeansDescriptionCode is:

<TransportMeansDescriptionCode>

1

<TransportMeansDescriptionCode>

Transportation per barge with equipment for loading and transportation of liquid chemicals In certain implementations, GDT TransportMeansDescriptionCode may have the following structure:

| GDT | | Cat. | Object Class | Property | Representation/ Association | Type | Type Name | Len. | Card. | Remarks |
|---|---|---|---|---|---|---|---|---|---|---|
| TransportMeans | | | Transport Means | | Details | | | | | |
| | ID | E | Transport Means | Identification | Identifier | CDT | Identifier | 1..20 | 0..1 | restricted |
| | Descrip-tionCode | E | Transport Means | Description | Code | GDT | TransportMeansDe-scriptionCode | | 1 | |

| GDT | Object Class | Property | Representation/ Association | Type | Type Name | Len. | Remarks |
|---|---|---|---|---|---|---|---|
| TransportMeansDescriptionCode | Transport Means | Description | Code | CDT | Code | 1..4 | restricted |

GDT TransportMeansDescriptionCode is assigned a customer code list. The attributes of the code are not required because constant values are assigned to them in a customer system at runtime; they may be assigned in the following way: ListID="8179," listAgencyID="6," listVersionID=assigned by standardization organization, if available.

GDT TransportMeansDescriptionCode may use the following codes which are based on UN/EDIFACT Data Element 8179 "Transport means description code": 1 (i.e., barge chemical tanker), 2 (i.e., coaster chemical tanker), 3 (i.e., dry bulk carrier), 4 (i.e., deep sea chemical tanker), 5 (i.e., gas tanker), 6 (i.e., aircraft), 7 (i.e., car with caravan), 8 (i.e., container ship), 9 (i.e., exceptional transport), 10 (i.e., bus), 11 (i.e., ship), 12 (i.e., ship tanker), 13 (i.e., ocean vessel), 14 (i.e., flatbed trailer), 15 (i.e., taxi), 16 (i.e., barge), 17 (i.e., customer determined means of transport), 18 (i.e., seller determined means of transport), 19 (i.e., tip-up truck), 20 (i.e., furniture truck), 21 (i.e., rail tanker), 22 (i.e., rail silo tanker), 23 (i.e., rail bulk car), 24 (i.e., customer rail tanker), 25 (i.e., rail express), 26 (i.e., tip-up articulated truck), 27 (i.e., rigid truck with tank), 28 (i.e., refrigerated truck and trailer), 29 (i.e., freezer truck and trailer), 30 (i.e., tautliner 25 ton, combined with 90 cubic meter trailer with removable roof), 31 (i.e., truck), 32 (i.e., road tanker), 33 (i.e., road silo tanker), 34 (i.e., tautliner truck), 35 (i.e., truck/trailer with tilt), 36 (i.e., pipeline), 37 (i.e., hydrant cart), 38 (i.e., car), 39 (i.e., tautliner truck with removable roof), 40 (i.e., truck with opening floor), 41 (i.e., freezer truck), 42 (i.e., isothermic truck), 43 (i.e., refrigerated truck), 44 (i.e., freezer van), 45 (i.e., isothermic van), 46 (i.e., refrigerated van), 47 (i.e., bulk truck), 48 (i.e., van), 49 (i.e., roadrailer), 50 (i.e., passenger vessel), 51 (i.e., cargo and passenger vessel), 52 (i.e., general cargo vessel), 53 (i.e., crude oil tanker), 54 (i.e., liquefied petroleum gas (Ipg) carrier), 55 (i.e., liquefied natural gas (1 ng) carrier), 56 (i.e., grain carrier), 57 (i.e., timber or log carrier), 58 (i.e., wood chip carrier), 59 (i.e., steel products vessel), 60 (i.e., gravel vessel), 61 (i.e., cement vessel), 62 (i.e., coal vessel), 63 (i.e., ore carrier), 64 (i.e., car carrier), 65 (i.e., container only vessel), 66 (i.e., roll on—roll off vessel), 67 (i.e., ferry), 68 (i.e., fishing vessel), 69 (i.e., work vessel), 70 (i.e., patrol vessel), 71 (i.e., tug and/or push boat), 72 (i.e., train with one wagon), 73 (i.e., train with more than one and less than 20 wagons), 74 (i.e., train with 20 or more wagons), 75 (i.e., oil products tanker), 76 (i.e., training vessel), 77 (i.e., freezer truck and isothermic trailer), 78 (i.e., isothermic truck and isothermic trailer), 79 (i.e., refrigerated truck and isothermic trailer), 80 (i.e., freezer truck and refrigerated trailer), 81 (i.e., isothermic truck and refrigerated trailer), 82 (i.e., rigid truck with tank and tank trailer), 83 (i.e., bulk truck and tank trailer), 84 (i.e., rigid truck with tank and bulk trailer), 85 (i.e., bulk truck and bulk trailer), 86 (i.e., tautliner truck and extendable trailer), 87 (i.e., tautliner truck with removable roof and extendable trailer), 88 (i.e., truck with opening floor and extendable trailer), 89 (i.e., bulk truck and extendable trailer), 90 (i.e., isothermic truck and freezer trailer), 91 (i.e., refrigerated truck and freezer trailer), 92 (i.e., tip-up truck and gondola trailer), 93 (i.e., tautliner truck and gondola trailer), 94 (i.e., tautliner truck with removable roof and gondola trailer), 95 (i.e., truck with opening floor and gondola trailer), 96 (i.e., bulk truck and gondola trailer), 97 (i.e., tip-up truck and extendable gondola trailer), 98 (i.e., tautliner truck and extendable gondola trailer), 99 (i.e., tautliner truck with removable roof and extendable gondolatrailer), 100 (i.e., truck with opening floor and extendable gondola trailer), 101 (i.e., bulk truck and extendable gondola trailer), 102 (i.e., tip-up truck and trailer with opening floor), 103 (i.e., tautliner truck and trailer with opening floor), 104 (i.e., tautliner truck with removable roof and trailer with opening floor), 105 (i.e., truck and trailer with opening floor), 106 (i.e., bulk truck and trailer with opening floor), 107 (i.e., removal truck and trailer), 108 (i.e., tautliner truck and removal trailer), 109 (i.e., tautliner truck with removable roof and removal trailer), 110 (i.e., vessel, temperature controlled cargo).

TransportMeansDescriptionCode may be used to determine solid means of transportation.

R/3: Means-of-Transport Type: CHAR 4

TransportMeansID

A GDT TransportMeansID is a unique identifier for a means of transport. An example of GDT TransportMeansID is:

<TransportMeansID>HD—ES 1234</TransportMeansID>

In certain implementations, GDT TransportMeansID may have the following structure:

| GDT | Object Class | Property | Representation/ Association | Type | Type Name | Len. | Remarks |
|---|---|---|---|---|---|---|---|
| TransportMeansID | Transport Means | Identification | Identifier | CDT | Identifier | 1..20 | Restricted |

GDT TransportationLane may be used to configure means of transport (business configuration), and GDT TransportMeansID may be used to refer to those means of transport. For example, a TransportMeansID can be the license plate of a truck or the identification number of a container.

TransportMeansID may correspond to Means-of-transport ID" (TRAID) that is used in the R/3-IDOC DELVRY03.

TransportMeansSpecificationDetailLevelCode

A GDT TransportMeansSpecificationDetailLevelCode is a coded representation of the level of detail of specifications of means of transport. An example of GDT TransportMeansSpecificationDetailLevelCode is:

<TransportMeansSpecificationDetailLevelCode>1</TransportMeansSpecificationDetailLevelCode>

In certain implementations, GDT TransportMeansSpecificationDetailLevelCode may have the following structure:

| GDT | Object Class | Property | Representation/ Association | Type | Type Name | Len. | Remarks |
|---|---|---|---|---|---|---|---|
| TransportMeansSpecification-DetailLevelCode | Transport Means Specification | Detail Level | Code | CDT | Code | 1 | Restricted |

GDT TransportMeansSpecificationDetailLevelCode is assigned a customer code list. The attributes of the code are not required because constant values are assigned to them in a customer system at runtime; they may be assigned in the following way: ListID="10272," listAgencyID="310," listVersionID=assigned and managed by customer.

DT TransportMeansSpecificationDetailLevelCode may use the following codes: 1 (i.e., specific means of transport), 2 (i.e., any means of transport).

A TransportationLane may be defined for one specific means of transport or for any means of transport. GDT TransportMeansSpecificationDetailLevelCode may be used to determine if the transportation lane has been defined for a specific means of transport or for any means of transport.

TransportMeansTypeCode

A GDT TransportMeansTypeCode is a coded representation of a Means of Transport. GDT An example of GDT TransportMeansTypeCode is:

<TransportMeansTypeCode>1</TransportMeansTypeCode>

In certain implementations, GDT TransportMeansTypeCode may have the following structure:

| GDT | | Cat. | Object Class | Property | Representation/ Association | Type | Type Name | Len. | Card. | Remarks |
|---|---|---|---|---|---|---|---|---|---|---|
| TransportMeans TypeCode | | | Transport Means | Type | Code | CDT | Code | 1..4 | | restricted |
| | listID | A | Code List | Identification | Identifier | xsd | token | | 0..1 | |
| | listAgencyID | A | Code List Agency | Identification | Identifier | xsd | token | | 0..1 | |
| | listVersionID | A | Code List | Version | Identifier | xsd | token | | 0..1 | |
| | listAgencySchemeID | A | Code List Agency | Scheme | Identifier | xsd | token | | 0..1 | |
| | listAgencySchemeAgencyID | A | Code List Agency | Scheme Agency | Identifier | xsd | token | | 0..1 | |

GDT TransportMeansTypeCode may be assigned a customer-specific code list. With regards to attributes, ListID can be 10480. ListAgencyID can be the ID of the customer (e.g., ID from DE 3055 if listed there). ListVersionID can be the version of the particular code list (e.g., assigned and managed by the customer). ListAgencySchemeID can be the ID of the scheme if the listAgencyID does not come from DE 3055. ListAgencySchemeAgencyID can be the ID of the organization from DE 3055 that manages the listAgencySchemeID scheme.

Possible examples of customer-specific code semantics are: Truck 40 tons 2 axle; Truck 40 tons 3 axle.

TransportMeansTypeCode may be used to determine solid means of transportation including vehicle attributes and may be defined in the Business Configuration.

The TransportMeansTypeCode may determine the detailed type of a means of transport (for example 'Truck 40 tons 2 axle') which is represented by the TransportMeansDescriptionCode (for example 031—truck).

TransportModeCode

A GDT TransportModeCode is a coded representation of the mode of transportation used for delivery. An example of GDT TransportModeCode is:

<TransportModeCode>

1

<\TransportModeCode>

Conveyance per transportation by sea

In certain implementations, GDT TransportModeCode may have the following structure:

| GDT | Cat. | Object Class | Representation/ Association | Type | Type Name | Len. | Remarks |
|---|---|---|---|---|---|---|---|
| Transport-ModeCode | | Transport Mode | Code | CDT | Code | 1..2 | restricted |

GDT TransportModeCode may be assigned a customer code list. The attributes of the code are not required because constant values are assigned to them in a customer system at runtime; they may be assigned in the following way: ListID="8067," listAgencyID="6," listVersionID=assigned by standardization organization if available.

GDT TransportModeCode may use the following codes: 0 (i.e., transport mode not specified), 1 (i.e., maritime transport), 2 (i.e., rail transport), 3 (i.e., road transport), 4 (i.e., air transport), 5 (i.e., mail), 6 (i.e., multimodal transport), 7 (i.e., fixed transport installation), 8 (i.e., inland water transport), 9 (i.e., transport mode not applicable).

With the specification of the TransportMode, other conditions may be linked in the general business conditions that may be implicitly agreed upon/defined by specifying a TransportMode (e.g., price, time during which delivery can be made, any service agent, and the like). GDT TransportModeCode may act for the executing partner/vendor as a criterion for grouping deliveries into transports and for route determination in R/3, for example. Furthermore, it may be the basis for determining concrete transportation routes, means of transport, and responsible organization units (e.g., materials planning point). The TransportMode "MaritimeTransport"

implies a sea route and the necessity of customs/port procedures, for example. These specifications may also be required for contractual reasons. In many countries, they are required for customs clearance and statistical purposes.

If GDT TransportModeCode is included in the ordered service it may or may not define any concrete route or means of transportation.

May correspond to R/3: Shipping Type: CHAR 2

TransportServiceLevelCode

A GDT TransportServiceLevelCode is a coded representation of the agreed/defined services in terms of the delivery of goods with respect to the speed of the delivery (as part of the ordered service). An example of GDT TransportServiceLevelCode is:

<TransportServiceLevelCode>01<\TransportService LevelCode>

Customer wants express transportation and accepts the associated increased cost of transport. Delivery made in 24 hours by the latest . . . .

In certain implementations, GDT TransportServiceLevelCode may have the following structure:

| GDT | Object Class | Property | Representation/ Association | Type | Type Name | Length | Remarks |
|---|---|---|---|---|---|---|---|
| TransportServiceLevelCode | Transport | Service Level | Code | CDT | Code | 1..2 | restricted |

GDT TransportServiceLevelCode is assigned a customer code list. The attributes of the code are not required because constant values are assigned to them in a customer system at runtime; they may be assigned in the following way: ListID="4219," listAgencyID="6," listVersionID=assigned by standardization organization if available.

GDT TransportMeansDescriptionCode may use the following codes based on UN/EDIFACT Data Element 4219 "Transport service priority code": 1 (i.e., express), 2 (i.e., high speed), 3 (i.e., normal speed), 4 (i.e., post service).

With the specification of the TransportServiceLevelCode, other conditions are usually linked in the general business conditions that may be implicitly agreed on/defined by specifying a TransportServiceLevel (e.g., price, guaranteed time during which delivery may be made, any agent, entitlements in case of non-compliance). The buyer and seller/service agent may use the TransportServiceLevelCode to agree on the modalities to be used for delivery and the buyer may then accept the corresponding conditions. Using this specification, the seller may determine (depending on the business process) the internal shipping point to be used for this delivery, which service agent is to be used under what conditions, etc. In the framework of this agreement, the service agent/seller may guarantee the customer a maximum period (e.g., 24 hours) within which delivery is to be made, etc. If these conditions are breached, liability claims against the seller may arise.

In R/3, a TransportServiceLevelCode may be assigned either to a sales document type or to a sold-to party. Depending on the specified TransportServiceLevelCode (along with loading group and plant), a suitable shipping point may be determined that is responsible for the corresponding process. Along with the country and the geographic zone of the shipping point, the ship-to party and the transportation group, a suitable route may be determined. (The same may apply to deliveries—the geography of the seller and the goods receiving point may determine the transportation group and shipping conditions.)

May correspond to R/3: Shipping Condition: CHAR 2

Situational variation between PriorityCode and TransportServiceLevelCode. Using the PriorityCode an urgency (from the buyer's perspective) may be assigned to an object (e.g., an item) in terms of delivery, e.g., from which a ServiceLevel may be derived within the business process at the seller. By specifying a TransportServiceLevel, a business agreement with the partner may occur. Example: Buyer gives his seller a priority. Seller agrees on a Service Level with his transportation service provider according to buyer's priority.

TransportTracking

A GDT TransportTracking contains transport-related information that can be used for tracking deliveries, for example, in the framework of goods deliveries. An example of GDT TransportTracking is:

<TransportTracking>

<ID>4711</ID>

<WebAddress>http://www.musterexpressdienst.com/TrackingHomePage.htm</WebAddress>

</TransportTracking>

In certain implementations, GDT TransportTracking may have the following structure:

| GDT | | Cat. | Object Class | Property | Representation/ Association | Type | Type Name | Len. | Card | Remarks |
|---|---|---|---|---|---|---|---|---|---|---|
| Transport-Tracking | | | Transport Tracking | | Details | | | | | |
| | ID | E | Transport Tracking | Identification | Identifier | CDT | Identifier | 1..35 | 1 | restricted |
| | Web-Address | E | Transport Tracking | Web Address | Electronic Address | GDT | WebAddress | | 0..1 | |

GDT TransportTracking may use the following attributes: TransportTrackingID (i.e., a unique identifier of a shipment; e.g., a package or a container; if a courier, express, and package service provider is responsible for the goods delivery it will often determine the format of the TransportTrackingID); TransportTrackingWebAddress (i.e., an address in the World Wide Web that can be used to track delivery with TransportTrackingID, e.g., the homepage of the supplier of the delivery tracking service).

As a possible integrity condition, TransportTrackingID may take into account the restrictions defined in the xsd: token. TransportTrackingID may be unique in connection with the business partner providing the delivery tracking service. The identification of the business partner may be carried out as context information in the message (or with TransportTrackingWebAddress). TransportTrackingWebAddress is a string value that may include every URI (see also GDT WebAddress). Identification of the business partner may also take place with TransportTrackingWebAddress.

GDT TransportTracking may be used in the framework of the shipping notification to provide a goods recipient an identification and an Internet address for the online delivery tracking of the current delivered goods.

TransshipmentMethodCode

A GDT TransshipmentMethodCode is a coded representation of the logistics procedure for goods transfer. In this context, "goods transfer" may cover goods receipt, intermediate storage, and merchandise distribution. An example of GDT TransshipmentMethodCode is:

<TransshipmentMethodCode>1</TransshipmentMethodCode>

In certain implementations, GDT TransshipmentMethodCode may have the following structure:

| GDT | Object Class | Representation/ Association | Type | Len. |
|---|---|---|---|---|
| Transshipment-MethodCode | Transshipment Method | Code | CDT:Code | 1..2 |

GDT TransshipmentMethodCode may be assigned a customer code list which may use the following codes: 1 (i.e., putaway), 2 (i.e., planned one-step cross-docking), 3 (i.e., unplanned one-step cross-docking), 4 (i.e., planned two-step cross-docking). Cross-docking is the movement of goods through central or regional warehouses or distribution centers.

GDT TransshipmentMethodCode may be used to specify the procedure used to deal with goods delivered to a warehouse or distribution center.

A retail example of GDT TransshipmentMethodCode would be as follows: If intermediate storage of goods in a storage location or distribution center is very costly or if goods have a very short shelf life, putaway is not performed. Instead, the goods are prepared for distribution immediately and then sent to the final point of sale.

TripServiceProviderCode

A GDT TripServiceProviderCode is the coded representation of the provider of a service for a trip. If usage of GDT TripServiceProviderCode is supported in the context of a business partner, it should be noted that the coded representation of the provider may be used with statistical analyses of expense reports and may or may not be unique. An example of GDT TripServiceProviderCode is:

<TripServiceProviderCode>MC</TripServiceProviderCode>

In certain implementations, GDT TripServiceProviderCode may have the following structure:

| GDT | | Cat. | Object Class | Property | Representation/ Association | Type | Type Name | Len. | Card. | Remarks |
|---|---|---|---|---|---|---|---|---|---|---|
| TripServiceProvider-Code | | | Trip Service Provider | | Code | CDT | Code | 1..2 | | Restricted |
| | listID | A | Code List | Identification | Identifier | xsd | token | | 0..1 | |

A customer-specific code lists may be assigned to GDT TripServiceProviderCode which may be selected at runtime based on which IndustrialSectorCode is involved. GDT TripServiceProviderCode may use the following attribute: listID (i.e., ID of the customer code list, e.g., may be assigned by the customer from the number range 50900-50999).

Examples of GDT TripServiceProviderCode may include: rental car industry (e.g., Alamo), hotel industry (e.g., Marriott).

GDT TripServiceProviderCodeContextElements defines a dependency or environment in which TripServiceProviderCode appears. The environment may be described by context categories. The context categories in TripServiceProviderCodeContextElements may restrict the allowed code values of TripServiceProviderCode based on the environment.

In certain implementations, GDT TripServiceProviderCodeContextElements may have the following structure:

| GDT | | Cat. | Object Class | Property | Representation/ Association | Type | Type Name | Card. |
|---|---|---|---|---|---|---|---|---|
| TripServiceProviderCode-ContextElements | | | TripService-ProviderCode Context Elements | | Details | | | |
| | Industrial-SectorCode | E | TripService-ProviderCode Context Elements | IndustrialSector | Code | GDT | Industrial-SectorCode | 1 |

The IndustrialSectorCode attribute may specify the industry and establish the allowed code values for a specific industry.

TupleLengthValue

A GDT TupleLengthValue is the number of entries in a tuple. A tuple is a linear set with a fixed number of elements. The elements of a tuple may also be referred to as entries and may be of different types. An example of GDT TupleLengthValue is:

<TupleLengthValue>7</TupleLengthValue>

In certain implementations, GDT TupleLengthValue may have the following structure:

| GDT | Rep./Ass. Qual. | Representation/ Association | Type | Type Name | Len. |
|---|---|---|---|---|---|
| TupleLengthValue | Tuple Length | Value | xsd | nonNegative-Integer | 2 |

GDT TupleLengthValue is a GDT which may of a qualified basic nature based on the secondary representation term Value of the CDT Numeric and a restriction of xsd:decimal. Nonnegative whole numbers less than one hundred may be permitted.

The attribute TupleLength may indicate whether a tuple is, for example, a pair (length=2), triple (length=3), quadruple (length=4), quintuple (length=5), etc. Tuple lengths greater than 3 are usually referred to as 4-tuples, 5-tuples, and so on (or generally as n-tuples).

A "list" may differ from a tuple in that a tuple's length is flexible. An array may differ from a tuple in that an array's elements can be indexed and can have a higher dimension (2-dimensional arrays, 3-dimensional arrays, etc.). Furthermore, the entries in a list and the elements in an array are usually of the same type. A vector is a special instance of a one-dimensional array that is subject to additional mathematical rules (e.g., vector addition).

UnemploymentInsuranceWorksiteCode

A GDT UnemploymentInsuranceWorksiteCode is a coded representation of a worksite for the unemployment insurance. This code is used for the US Multiple Worksite Report (MWR). An example of GDT UnemploymentInsuranceWorksiteCode is:

Company ABC has three work establishments in California: San Francisco, Los Angles and Palo Alto. Each work establishment has more than 10 employees. The San Francisco work establishment is assigned with the UnemploymentInsuranceWorksiteCode CA101.

<UnemploymentInsuranceWorksiteCode>CA101</UnemploymentInsuranceWorksiteCode>

In certain implementations, GDT UnemploymentInsuranceWorksiteCode may have the following structure:

GDT UnemploymentInsuranceWorksiteCode may be assigned a customer-specific code list. With regards to attributes, ListID may be 10483. ListAgencyID may be the ID of the customer (e.g., ID from DE 3055 if listed there). ListVersionID may be the version of the particular code list (e.g., assigned and managed by the customer). ListAgencySchemeID may be the ID of the scheme if the listAgencyID does not come from DE 3055. ListAgencySchemeAgencyID may be the ID of the organization from DE 3055 that manages the listAgencySchemeID scheme.

Employers having more than one establishment under the same unemployment insurance account number within the state may have to fill out an MWR if the sum of the employment in all of their secondary establishments is 10 or greater (calculated each year). The primary worksite may be defined as the establishment with the largest number of employees (full- and part-time).

Each customer can set up its state Unemployment Insurance Worksites. For example, customer ABC has 3 locations in different counties (San Francisco, Los Angles and Palo Alto) in California and there are more than 10 employees located in each location. California requires Multiple Worksite Report (MWR) for Unemployment Insurance reporting. In this case, the customer needs to create 3 worksites and each employee needs to be assigned to a worksite.

UnplannedItemPermissionCode

A GDT UnplannedItemPermissionCode is a coded representation of the permission to enter additional, unplanned items in a business follow-up document. An example of GDT UnplannedItemPermissionCode is:

<UnplannedItemPermissionCode>01<UnplannedItem PermissionCode>

In certain implementations, GDT UnplannedItemPermissionCode may have the following structure:

| GDT | | Cat. | Object Class | Property | Representation/ Association | Type | Type Name | Len. | Card. | Remarks |
|---|---|---|---|---|---|---|---|---|---|---|
| UnemploymentInsurance-WorksiteCode | | | Unemployment Insurance Worksite | | Code | CDT | Code | 1..5 | | restricted |
| | listID | A | Code List | Identification | Identifier | xsd | token | | 0..1 | |
| | listAgencyID | A | Code List Agency | Identification | Identifier | xsd | token | | 0..1 | |
| | listVersionID | A | Code List | Version | Identifier | xsd | token | | 0..1 | |
| | listAgency-SchemeID | A | Code List Agency | Scheme | Identifier | xsd | token | | 0..1 | |
| | listAgency-SchemeAgencyID | A | Code List Agency | Scheme Agency | Identifier | xsd | token | | 0..1 | |

| GDT | Object Class | Property | Representation/ Association | Type | Type Name | Len. | Remarks |
|---|---|---|---|---|---|---|---|
| UnplannedItemPermissionCode | Unplanned Item | Permission | Code | CDT | Code | 2 | restricted |

GDT UnplannedItemPermissionCode may be assigned a customer-proprietary code list with fixed predefined values, and changes to the permitted values may involve changes to the interface. The attributes of the code are not required because constant values are assigned to them in a customer system at runtime; they may be assigned in the following way: ListID "10040," listAgencyID="310," listVersionID="tbd".

GDT UnplannedItemPermissionCode may use the following codes: 01 (i.e., NotAllowed), 02 (i.e., WithContractReferenceOnly), 03 (i.e., Allowed).

GDT UnplannedItemPermissionCode may be used to show business partners whether or not they are allowed to enter additional items for an item in a document in a subsequent process. A specific use example of GDT UnplannedItemPermissionCode is: In a purchase order, the buyer informs the seller whether or not it can specify additional unplanned items for a purchase order item in the invoice. This is useful if the exact requirements are unknown at the time of ordering. This can be the case for repairs, where the spare parts required are not known until the repair has been made.

URI

A GDT URI is a unique digital address that is represented by the Unified Resource Identifier (URI). An example of GDT URI is:

Representation of an http address:

<URI> http://www.xyz.com/InterfaceRepository/ElectronicAddresses/description.htm

</URI>

Representation of an X.400 address:

<EMailURI schemeID="XF"> mailto:c=DE;a=XYZ;p=XYZ;o=EXCHANGE; s=STUHEC;g=GUNTHER

</EMailURI>

In certain implementations, URI may have the following structure:

GDT URI may therefore generally be constructed as follows: <scheme>:<scheme-specific part>

The following is an example of a URL with typical partial expression types:

<scheme>://<user>:<password>@<host>:<port>/<path>?<query>;

<argument>=<value>&<argument>=<value>#<fragment>

With regards to the GDT URI schemeID attribute, the following URI schemes may be available: ftp (i.e., File Transfer Protocol), http (i.e., Hypertext Transfer Protocol), gopher* (i.e., The Gopher Protocol), mailto (i.e., Electronic mail address), news* (i.e., Usenet news), nntp* (i.e., Usenet news using NNTP access), telnet* (i.e., Reference to interactive sessions), wais* (i.e., Wide Area Information Servers), file (i.e., Host-specific file names), prospero* (i.e., Prospero Directory Service), z39.50s* (i.e., Z39.50 Session), z39.50r* (i.e., Z39.50 Retrieval), cid (i.e., content identifier), mid (i.e., message identifier), vemmi* (i.e., versatile multimedia interface), service* (i.e., service location), imap* (i.e., internet message access protocol), nfs (i.e., network file system protocol), acap* (i.e., application configuration access protocol), rtsp* (i.e., real time streaming protocol), tip* (i.e., Transaction Internet Protocol), pop* (i.e., Post Office Protocol v3), data* (i.e., Data), dav* (i.e., Dav), opaquelocktoken* (i.e., opaquelocktoken), sip* (i.e., session initiation protocol), tel* (i.e., Telephone), fax* (i.e., Fax), modem* (i.e., Modem), Idap* (i.e., Lightweight Directory Access Protocol), https (i.e., Hypertext Transfer Protocol Secure), soap.beep* (i.e., soap.beep), soap.beeps* (i.e., soap.beeps), urn* (i.e., Uniform Resource Names), go* (i.e., Go), afs* (i.e., Andrew File System global file names), tn3270* (i.e., Interactive 3270 emulation sessions), mailserver* (i.e., Access to data available from mail servers), uuid (i.e., Universal Unique Identifier).

In the above listing "*" indicates that the scheme may no longer be currently required, in certain implementations.

| CDT | Attributes | Category | Obect Class Qualifier | Object Class Term | Property Term | Representation Term | Based Type | Length | Cardinality | Remarks |
|---|---|---|---|---|---|---|---|---|---|---|
| URI | | | Uniform Resource | Identifier | | Type | xsd:anyURI | | | |
| | schemeID | A | Uniform Resource | Identifier | Scheme | Identifier | xsd:normalizedString | 1..60 | 0..1 | Optional |
| | languageCode | A | Uniform Resource | Identifier | Language | Code | xsd:language | 2..9 | 0..1 | see also: LanguageCode |

The following syntax of GDT URI is based on the IETF RFC 2396 recommendation. GDT URI may consist of the scheme (in other words, how to access a resource), followed by a colon and the scheme-specific part. The scheme-specific part may be relevant for the service that is connected to the particular scheme. A resource may have multiple URIs, one reason being that a resource may exist physically at multiple locations due to mirroring, or a resource may be addressed using different protocols which are specified by the scheme name. For example, a file can be referenced using http and ftp protocols.

If the above-listed URI schemes are not sufficient to determine the address protocol, you can either apply for another URI scheme in accordance with the guidelines of IETF RFC 2717, or define the corresponding protocol type more precisely by specifying the GDT URI schemeID attribute as well, for example. Codes from the UN/EDIFACT DE 3155 "Communication Address Code Qualifier" list may be used, including the following: AB (i.e., communications number assigned by Societe Internationale de Telecommunications Aeronautiques/SITA); AD (i.e., AT&T mailbox—AT&T mailbox identifier); AF (i.e., U.S. Defense Switched Network—The switched telecommunications network of the United States Department of Defense); AN (i.e., O.F.T.P./ODETTE File Transfer Protocol); AO (i.e., Uniform Resource Location/URL—Identification of the Uniform Resource Location/URL Synonym: World wide web address); EM (i.e., Electronic Mail Exchange of mail by electronic means/SMTP); EI (i.e., EDI transmission—Number identifying the service and service user); FT (i.e., FTAM File transfer access method according to ISO) GM (i.e., GEIS/General Electric Information Service mailbox—The communication number identifies a GEIS mailbox); IM (i.e., Internal mail—Internal mail address/number) SW (i.e., S.W.I.F.T.—Communications address assigned by Society for Worldwide Interbank Financial Telecommunications s.c.); XF (i.e., X.400 address—The X.400 address).

No codings exist for the following protocols (the respective coding proposals are to be submitted to the UN/CEFACT Forum for standardization): ms (i.e., Microsoft Mail, e.g., MM); ccmail (i.e., CC Mail, e.g., CC)

With regards to the GDT URI languageCode attribute, if the referenced is a document or text, this attribute can be used to represent the language of the attachment in accordance with IETF RFC 1766 or IETF RFC 3066.

In certain implementations, GDT URI is not used as a reference component for binary data that is sent as an additional MIME attachment. In such implementations, CDT BinaryObject is available for this purpose.

UserAccountID

A GDT UserAccountID is a unique identifier for a system's user account. An example of GDT UserAccountID is:

<UserAccountID>smith</UserAccountID>

In certain implementations, GDT UserAccountID may have the following structure:

| GDT | | Cat. | Object Class | Property | Representation/ Association | Type | Type Name | Len. | Card. |
|---|---|---|---|---|---|---|---|---|---|
| UserAccountID | | | User Account | Identification | Identifier | CDT | Identifier | 1..255 | |
| | schemeAgencyID | A | Identification Scheme Agency | Identification | Identifier | xsd | token | 1..60 | 0..1 |
| | schemeAgencyScheme-AgencyID | A | Identification Scheme Agency | Scheme Agency | Identifier | xsd | token | 3 | 0..1 |

GDT UserAccountID may include the following attributes: schemeAgencyID (i.e., identifies the system that defined the identifier), schemeAgencySchemeAgencyID (i.e., ZZZ).

Depending on the use of GDT UserAccountID, the element name may be prefixed with a qualifier. Possible qualifiers are: SenderUserAccountID (i.e., user account of the user that is sending something), LockingUserAccountID (i.e., user account of the user that is locking something)

UUID

A GDT UUID is a globally unique identifier for an object. "Globally unique" means that no two objects have the same identifier in all probability. GDT UUID may be used to identify a business object or a node of a business object. An example of GDT UUID is:

<ProductUUID>f81d4fae-7dec-1d0-a765-00a0c91e6bf6</ProductUUID>

In certain implementations, GDT UUID may have the following structure:

| GDT | Property Qualifier | Property | Representation/Association | Type | Type Name | Len. | Remarks |
|---|---|---|---|---|---|---|---|
| UUID | Universally Unique | Identification | Identifier | CDT | Identifier | 36 | Restricted |

GDT UUID is a number in hexadecimal notation which may be "mathematically guaranteed" unique due to its generation algorithm.

GDT UUID may be represented according to the following schema: Groups of 8, 4, 4, 4, and 12 characters (0-9, a-f) with hyphens between the groups: dddddddd-dddd-dddd-dddddddddddddddd. This representation corresponds to ISO 11578:1996 and IETF RFC 4122.

GDT UUID may be used to identify a business object or a node of a business object. The type of object may be expressed using a prefix that corresponds to the business object or the node name, such as ProductUUID to identify a product. If the object occurs in a specific business role, it may be added as an additional prefix.

In a customer system the UUID may correspond to the data element SYSGUID. For converting the XML representation to customer format, methods may be available in ABAP class CL_GDT_CONVERSION. The conversion to RAW16 may be required in an applied application.

ValuePrecisionCode

A GDT ValuePrecisionCode is a coded representation for the correctness of a calculated value. An example of GDT ValuePrecisionCode is:

<ValuePrecisionCode>1</ValuePrecisionCode>

In certain implementations, GDT ValuePrecisionCode may have the following structure:

| GDT | Object Class | Rep./ Ass. | Type | Type Name | Len. | Remarks |
|---|---|---|---|---|---|---|
| ValuePrecisionCode | Value Precision | Code | CDT | Code | 1 | restricted |

GDT ValuePrecisionCode is assigned a customer code list. The attributes of the code are not required because constant values are assigned to them in a customer system at runtime; they may be assigned in the following way: ListID="10167," listAgencyID="310." GDT ValuePrecisionCode may use the following codes: 1 (i.e., approximate), 2 (i.e., exact).

GDT ValuePrecisionCode may be used to determine the correctness of the calculated value and may also act as a check for tolerance.

VariabilityCode

A GDT VariabilityCode is the coded representation of the variability of something. Amounts, for example, can be categorized into fixed amounts or variable amounts. An example of GDT VariabilityCode is:

<VariabilityCode>1</VariabilityCode>

In certain implementations, GDT VariabilityCode may have the following structure:

| GDT | Property | Representation/ Association | Type | Type Name | Len. | Remarks |
|---|---|---|---|---|---|---|
| VariabilityCode | Variability | Code | CCT | Code | 1 | restricted |

GDT VariabilityCode is assigned a customer code list. The attributes of the code are not required because constant values are assigned to them in a customer system at runtime; they may be assigned in the following way: ListID=ID of the relevant code list assigned by a team, listAgencyID="310," listVersionID=assigned and managed by customer.

GDT VariabilityCode may use the following codes: 1 (i.e., fixed), 2 (i.e., variable).

The following qualifiers may be assigned to GDT VariabilityCode: AmountVariabilityCode; BaseVariabilityCode.

CDT VariabilityCode may be used, to characterize assessment and distribution rules with regard to the type of values to be allocated, or with regard to the type of allocation bases used for the calculations.

VariableInterestRate

A GDT VariableInterestRate is an interest rate that changes. "Variable" in this sense means that the concrete interest rate is determined depending on a reference interest rate curve. Unlike a fixed interest rate, a variable interest rate may be based upon a reference interest rate that continually changes over time. Variable interest rates may be agreed upon for loans; upper and lower levels of interest rates (caps and floors) may also be agreed upon. An example of GDT VariableInterestRate is:

<VariableInterestRate>
<ReferenceInterestCurveCode listID="221" listAgencyID="17">LIBO</ReferenceInterestCurveCode>
<AdjustmentRecurrence>
<Period>
<StartDate>2005-01-01</StartDate>
<EndDate>2010-01-01</EndDate>
</Period>
<Duration>P1M</Duration>
</AdjustmentRecurrence>
<MarginPercent>0.1</ MarginPercent>
<FluctuationMarginPercent>0.2</FluctuationMarginPercent>
<CapPercent>8.75</CapPercent>
<FloorPercent>6.35</FloorPercent>
</VariableInterestRate>

In certain implementations, GDT VariableInterestRate may have the following structure:

| GDT | | Cat. | Object Class | Property | Rep. / Ass. Qual. | Representation/ Association | Type | Type Name | Card. |
|---|---|---|---|---|---|---|---|---|---|
| VariableInterestRate | | | Variable Interest Rate | | | Details | | | |
| | ReferenceInterestCurveCode | E | Variable Interest Rate | Reference Interest Curve | | Code | GDT | ReferenceInterestCurveCode | 1 |
| | AdjustmentRecurrence | E | Variable Interest Rate | Adjustment Recurrence | | Details | GDT | PeriodDurationDayRecurrence | 0..1 |
| | BeforeAdjustmentIDaysValue | E | Variable Interest Rate | Before Adjustment | Days | Value | GDT | IntegerValue | 0..1 |
| | InitialRatePercent | E | Variable Interest Rate | Initial Rate | | Percent | CDT | Percent | 0..1 |
| | MarginPercent | E | Variable Interest Rate | Margin | | Percent | CDT | Percent | 0..1 |
| | FluctuationMarginPercent | E | Variable Interest Rate | Fluctuation Margin | | Percent | CDT | Percent | 1 |
| | CapPercent | E | Variable Interest Rate | Cap | | Percent | CDT | Percent | 0..1 |
| | FloorPercent | E | Variable Interest Rate | Floor | | Percent | CDT | Percent | 0..1 |

GDT VariableInterestRate may include the following attributes: ReferenceInterestCurveCode (i.e., coded representation of the reference interest rate), AdjustmentRecurrence (i.e., defines the recurring date for adjusting a variable interest rate), BeforeAdjustmentDaysValue (i.e., defines how many days before the determination you have to ascertain the new interest rate), InitialRatePercent (i.e., describes the initial interest rate), MarginPercent (i.e., describes the reduction or increase compared to the market interest rate as a percentage), FluctuationMarginPercent (i.e., the FluctuationMargin determines the maximum amount by which the rate can differ from the current rate as a percentage), CapPercent (i.e., represents the upper level of interest rate that is permitted), Floor Percent (i.e., represents the lower level of interest rate that is permitted).

Loans with a variable interest rate may use a reference interest rate (LIBOR, for example) to determine their rate of interest. They may be adjusted periodically within the upper and lower levels of interest rate. Development of the underlying reference interest rate may be a critical factor when making this adjustment.

VersionID

A GDT VersionID is a unique identifier for a version. A version is a differentiation of objects of an object type in accordance with the sequence in which they were created. An example of GDT VersionID is:

<VersionID>1.1.5</VersionID>

In certain implementations, GDT VersionID may have the following structure:

| GDT | Cat. | Object Class | Property | Representation/ Association | Type | Type Name | Len. | Remarks |
|---|---|---|---|---|---|---|---|---|
| VersionID | E | Version | Identification | Identifier | CDT | Identifier | 1..32 | restricted |

The following attributes may be assigned to GDT VersionID: CatalogueEditableVersionID; CataloguePublishedVersionID; CatalogueToBePublishedVersionID.

As a possible integrity condition, versions can be differentiated using the criteria "before-after". Versions are sorted "in turn."

A version can be directly referenced externally by specifying the object and its GDT VersionID. A version has the following characteristics: it describes different characteristics of an object for external users; it represents a significant change compared to other versions from a user perspective; it is independent and self-contained (i.e., changes to one version do not affect any other versions); versions can be developed further in parallel.

The format of a version depends on the application in which the object is located. Examples are X.Y.Z or a time stamp.

A variant is the differentiation of objects of an object type at the same point in time.

VeteranCategoryCode

A GDT VeteranCategoryCode is the code indicating the category of a veteran. A veteran may be categorized according to country-specific criteria, for example, the campaigns or expeditions in which the veteran participated. An example of GDT VeteranCategoryCode is:

<VeteranCategoryCode listID=4711 listAgencyID=310>3</VeteranCategoryCode>

This is the code for a person in the United States who is a Vietnam-era veteran.

In certain implementations, GDT VeteranCategoryCode may have the following structure:

GDT VeteranCategoryCode GDT may be assigned a customer-specific code list based on country. The two-character country code (according to ISO-3166-1) may be used in the code list name, and the listAgencyID="310" (according to DE 3055) may be specified. The listVersionID may be the version of the relevant code list assigned by customer.

For example, with "VeteranCategoryCode for US" (i.e., United States), listID="21601," listAgencyID="310," the following code list may be assigned: 001 (i.e., non-veteran), 002 (i.e., special disabled veteran), 3 (i.e., Vietnam-era veteran), 4 (i.e., other protected veteran), 5 (i.e., newly separated veteran).

Veteran status may be recorded for employees in certain countries (for example, United States). For example, in the United States, there is a legal regulation stipulating that certain companies must submit an annual report on the number of employees and new hires broken down according to veteran category.

GDT VeteranCategoryCodeContextElements defines a dependency or an environment in which the VeteranCategoryCode appears. The environment may be described by context categories. With the context categories in VeteranCategoryCodeContextElements the valid portion of code values of VeteranCategoryCode is restricted according to an environment during use.

In certain implementations, GDT VeteranCategoryCodeContextElements may have the following structure:

| GDT | | Cat. | Object Class | Property | Representation/ Association | Type | Type Name | Len. | Card. | Remarks |
|---|---|---|---|---|---|---|---|---|---|---|
| VeteranCategoryCode | | | Veteran Category | | Code | CDT | Code | 1..2 | | Restricted |
| | listID | A | Code List | Identification | Identifier | xsd | token | | 0..1 | |
| | listAgencyID | A | Code List Agency | Identification | Identifier | xsd | token | | 0..1 | |
| | listVersionID | A | Code List | Version | Identifier | xsd | token | | 0..1 | |
| | listAgency-SchemeID | A | Code List Agency | Scheme | Identifier | xsd | token | | 0..1 | |
| | listAgency-Scheme-AgencyID | A | Code List Agency | Scheme Agency | Identifier | xsd | token | | 0..1 | |

| GDT | | Cat. | Object Class | Property | Representation/ Associaion | Type | Type Name | Card. |
|---|---|---|---|---|---|---|---|---|
| VeteranCategoryCode-ContextElements | | | VeteranCategoryCode-ContextElements | | Details | | | |
| | Country-Code | E | VeteranCategoryCode-ContextElements | Country | Code | GDT | Country-Code | 0..1 |

The CountryCode context category may define the context country and may determine the valid code values for a specific country.

VIPReasonCode

A GDT VIPReasonCode is a explanation of the VIP characteristics of a person; this explanation is represented by a code. VIP is the abbreviation for 'Very Important Person'. An example of GDT VIPReasonCode is:

<VIPReasonCode>1<NIPReasonCode>

In certain implementations, GDT VIPReasonCode may have the following structure:

| GDT | | Cat. | Object Class | Property | Representation/ Association | Type | Type Name | Len. | Card. | Remarks |
|---|---|---|---|---|---|---|---|---|---|---|
| VIPReason-Code | | | | VIP Reason | Code | CDT | Code | 1 | | Restricted |
| | listID | A | Code List | Identification | Identifier | XSD | Token | | 0..1 | |
| | listAgencyID | A | Code List Agency | Identification | Identifier | XSD | Token | | 0..1 | |
| | listVersionID | A | Code List | Version | Identifier | XSD | Token | | 0..1 | |
| | listAgency-SchemeID | A | Code List Agency | Scheme | Identifier | XSD | Token | | 0..1 | |
| | listAgency-Scheme-AgencyID | A | Code List Agency | Scheme Agency | Identifier | XSD | Token | | 0..1 | |

GDT VIPReasonCode may be assigned a customer-specific code list. Attributes may be assigned as follows: ListID can be 10381. ListAgencyID can be the ID of the customer (e.g., ID from DE 3055 if listed there). ListVersionID can be the version of the particular code list (e.g., assigned and managed by the customer). ListAgencySchemeID can be the ID of the scheme if the listAgencyID does not come from DE 3055. ListAgencySchemeAgencyID can be the ID of the organization from DE 3055 that manages the listAgencySchemeID scheme.

Examples of possible customer semantics for code list entry are: Managing director (i.e., this person is a VIP because (s)he is the managing director), Company partner (i.e., this person is a VIP because (s)he is a partner in the company).

Dictionary objects such as the following may be assigned to GDT VIPReasonCode in customer systems: Data element (e.g., BU_PAVIP), Domain (e.g., BU_PAVIP).

WarrantyDependencyTypeCode

A GDT WarrantyDependencyTypeCode is the coded representation of the type of warranty dependency. A warranty dependency may define which criterion specifies the validity of a warranty. An example of GDT WarrantyDependencyTypeCode is:

<WarrantyDependencyTypeCode>1</WarrantyDependencyTypeCode>

In certain implementations, GDT WarrantyDependencyTypeCode may have the following structure:

| GDT | Object Class | Property | Representation/ Association | Type | Type Name | Len. | Remarks |
|---|---|---|---|---|---|---|---|
| WarrantyDependencyTypeCode | Warranty | Dependency Type | Code | CDT | Code | 1 | Restricted |

For GDT WarrantyDependencyTypeCode, a customer code list is assigned to the code. The attributes of the code are not required because constant values would be assigned to them in a customer system at runtime; they may be assigned in the following way: listID="10105," listAgencyID="310," listVersionID=Version of the relevant code list assigned and managed by the customer.

A code list for GDT WarrantyDependencyTypeCode may be assigned in the following manner: 1 (i.e., time-based), 2 (i.e., counter-based), 3 (i.e., time/counter-based).

Semantic use examples of WarrantyDependencyTypeCode are: for a warranty with reference to time, two-year warranty from purchase date; for a warranty with reference to counter, free-of-charge spare engine parts for the first 1000 miles; for a warranty with reference to time and odometer, three-year warranty and 100,000 miles.

Data types such as the following may be assigned to GDT WarrantyDependencyTypeCode in customer systems: CRMT_WTY_REFERENCE.

WarrantyGoodwillCode

A GDT WarrantyGoodwillCode is the coded representation stating to what extent something is seen as a case for warranty or goodwill. The word "something" usually stands for provision of a service or a material. An example of GDT WarrantyGoodwillCode is:

<WarrantyGoodwillCode>1</WarrantyGoodwillCode>
In the above example, "I" stands "100% goodwill." In certain implementations, GDT WarrantyGoodwillCode may have the following structure:

| GDT | | Cat. | Object Class | Property | Representation/ Association | Type | Type Name | Len. | Card. | Remarks |
|---|---|---|---|---|---|---|---|---|---|---|
| Warranty-GoodwillCode | | | | Warranty Goodwill | Code | CDT | Code | 1..2 | | restricted |
| | listID | A | Code List | Identification | Identifier | xsd | token | | 0..1 | |
| | listAgencyID | A | Code List Agency | Identification | Identifier | xsd | token | | 0..1 | |
| | listVersionID | A | Code List | Version | Identifier | xsd | token | | 0..1 | |
| | listAgency-SchemeID | A | Code List Agency | Scheme | Identifier | xsd | token | | 0..1 | |
| | listAgency-Scheme-AgencyID | A | Code List Agency | Scheme Agency | Identifier | xsd | token | | 0..1 | |

The attributes of GDT WarrantyGoodwillCode may be assigned as follows. ListID may be the ID of the relevant code list assigned and managed by the customer. ListAgencyID may be the ID of the code user (e.g., ID from DE 3055 if listed there). ListVersionID may be the Version of the particular code list assigned and managed by the customer. ListAgencySchemeID may be the ID of the scheme if the listAgencyID does not come from DE 3055. ListAgencySchemeAgencyID may be the ID of the organization from DE 3055 that manages the listAgencySchemeID scheme.

For GDT WarrantyGoodwillCode, alternative customer-specific code lists may be assigned to the code. These lists may differ at configuration and/or runtime. Examples of possible customer semantics for code list entry are: Warranty (i.e., the services or spare parts are completely covered by the warranty), 100% goodwill (i.e., the services or spare parts are not covered by the warranty, but the customer is extended goodwill in the form of a price discount of 100%), 50% goodwill (i.e., the services or spare parts are not covered by the warranty, but the customer is extended goodwill in the form of a price discount of 50%).

To further illustrate setting, GDT WarrantyGoodwillCode can be used in situations such as the following: for service orders or confirmation items—to specify whether they are covered by a warranty or to what extent they are covered by goodwill; in financial accounting—to separate the declaration of costs incurred and revenue obtained according to warranty or goodwill; when calculating prices—to determine discounts.

In customer systems, the WarrantyGoodwillCode may correspond to the accounting indicator.

WebURI

A GDT WebURI is a unique digital address for a document that is available on the World Wide Web. The document contains information required by the user and is based on hypertext technology. An example of GDT WebURI is:

<WebURI>
http://www.xyz.com/GlobalDataTypes.htm
</WebURI>
In certain implementations, GDT WebURI may have the following structure:

| GDT | | Cat. | Object Class | Property | Representation/ Association | Type | Type Name | Length | Card. | Remarks |
|---|---|---|---|---|---|---|---|---|---|---|
| WebURI | | | WebURI | URI | URI | | URI | | | restricted |
| | language Code | A | WebURI | Language Code | Code | XSD | Language | 2..9 | 0..1 | |

The syntax of the built-in data type “xsd:anyURI” is based on the IETF RFC 2396 recommendation. For more details, see company specifications related to core component types.

The following schemes may be selected from the list of available GDT WebURI schemes: ftp (i.e., File Transfer Protocol), http (i.e., Hypertext Transfer Protocol), Gopher (i.e., Gopher Protocol), News (i.e., Usenet news), nntp (i.e., Usenet news using NNTP access), wais (i.e., Wide Area Information Servers), File (i.e., Host-specific file names), prospero (i.e., Prospero Directory Service), service (i.e., service location), nfs (i.e., network file system protocol), https (i.e., Hypertext Transfer Protocol Secure).

The following attribute can be assigned to GDT WebURI: languageCode (i.e., may define the language of the hypertext contents in accordance with the RFC 3066 recommendation; the language code may also be included if a translation service is to be automatically triggered at the receiver).

The following qualifiers may apply to GDT WebURI: BaseWebURI (i.e., the base web address relative to which all relative web addresses in a given context apply), ExternalLinkWebURI (i.e., WebURI which is a link to an externally stored object, an object being a folder or file).

In certain implementations, GDT WebURI may be restricted to 255 characters. In such implementations, the restricted data type is ESI_WebURI.

GDT WebURI may be used in most cases for linking to further information for the user, such as when the information is be detailed, hypertext-based information about a product, organization, or company.

The hypertext documents linked to by means of WebURI are generally not used for further process-dependent processing and are for information purposes only.

WeekdaySelection

A GDT Weekday Selection is a selection of weekdays. An example of GDT WeekdaySelection is:

```
<WeekdaySelection>
  <Monday>true</Monday>
  <Tuesday>true</Tuesday>
  <Wednesday>false</Wednesday>
  <Thursday>true</Thursday>
  <Friday>true</Friday>
  <Saturday>false</Saturday>
  <Sunday>false</Sunday>
</WeekdaySelection>
```

In certain implementations, GDT WeekdaySelection may have the following structure:

| GDT | | Cat. | Object Class | Property | Rep./Ass. | Type | Type Name | Card. |
|---|---|---|---|---|---|---|---|---|
| WeekdaySelection | | | Weekday Selection | | Details | | | |
| | MondayIndicator | E | Weekday Selection | Monday | Indicator | CDT | Indicator | 0..1 |
| | TuesdayIndicator | E | Weekday Selection | Tuesday | Indicator | CDT | Indicator | 0..1 |
| | WednesdayIndicator | E | Weekday Selection | Wednesday | Indicator | CDT | Indicator | 0..1 |
| | ThursdayIndicator | E | Weekday Selection | Thursday | Indicator | CDT | Indicator | 0..1 |
| | FridayIndicator | E | Weekday Selection | Friday | Indicator | CDT | Indicator | 0..1 |
| | SaturdayIndicator | E | Weekday Selection | Saturday | Indicator | CDT | Indicator | 0..1 |
| | SundayIndicator | E | Weekday Selection | Sunday | Indicator | CDT | Indicator | 0..1 |

The structure of GDT WeekdaySelection may be comprised of a list of indicator attributes for each weekday that allows weekdays to be selected separately. Due to the fact that all fields may not be mandatory, the default value may be set to “false.”

As a possible integrity condition, at least one of the indicators is generally set to “true.”

GDT WeekdaySelection may be used to describe events that recur on a weekly frequency. The indicator selection specifies the weekday on which the event shall occur.

The semantics and content of GDT WeekdaySelection are based on the type “bywday-list” of the iCalendar standard (RFC 2445), but the representation is different.

WeightingFactorValue

A GDT WeightingFactorValue is an absolute value that establishes the weight with which an allocation base is used in a calculation or valuation. An example of GDT WeightingFactorValue is:

```
<WeightingFactorValue>1.5</WeightingFactorValue>
```

In certain implementations, GDT WeightingFactorValue may have the following structure:

| GDT | Object Class | Rep./Ass. | Type | Type Name | Len. | Remarks |
|---|---|---|---|---|---|---|
| Weighting-Factor | Weighting Factor | Value | xsd | Decimal | 10.6 | restricted |

GDT WeightingFactorValue is generally a non-negative number.

The following qualifier (i.e., QualifiedWeightingValueFactor) may apply to GDT WebURI: ReceiverWeightingFactorValue GDT WeightingFactorValue may be used to weight amounts, quantities, or prices for a calculation.

WithholdingTax

A GDT WithholdingTax is a tax that a paying party pays directly instead of the payee. Withholding taxes may be withheld by the payer of remuneration and paid directly to the responsible tax authority. They may be advance payments on taxes owed by the payee or they may satisfy a tax liability of the payee. An example of GDT WithholdingTax is:

Used, for example, in the TaxDueNotification Message

```
<WithholdingTax>
  <CountryCode>DE</CountryCode>
  <TypeCode listID="20301">002</TypeCode>
  <BaseAmount currencyCode="EUR">100</BaseAmount>
  <Rate>15</Rate>
  <Amount currencyCode="EUR">15</Amount>
</WithholdingTax>
```

In certain implementations, GDT WithholdingTax may have the following structure:

| GDT | | Cat. | Object Class | Property | Representation/ Association | Type | Type Name | Card. |
|---|---|---|---|---|---|---|---|---|
| Withholding-Tax | | | Withholding Tax | | Details | | | |
| | Country-Code | E | Withholding Tax | Country | Code | GDT | Country-Code | 0..1 |
| | TypeCode | E | Withholding Tax | Type | Code | GDT | TaxType-Code | 0..1 |
| | BaseAmount | E | Withholding Tax | | Amount | CDT | Amount | 1 |
| | Percent | E | Withholding Tax | | Percent | CDT | Percent | 0..1 |
| | Amount | E | Withholding Tax | | Amount | CDT | Amount | 0..1 |

The following attributes may be assigned to GDT WithholdingTax: CountryCode (i.e., ISO 3166-1, specifies the country in which the tax is levied.), TypeCode (i.e., tax type code, see GDT TaxTypeCode.), BaseAmount (i.e., base amount on which the tax is calculated.), Percent (i.e., tax rate in percent.), Amount (i.e., tax amount due on the underlying base amount).

As a possible integrity condition, CountryCode and TypeCode may not have to be specified on the item level of a business document or message if they can be derived from GDT WithholdingTax on a superordinate level.

Code), and the type of tax rate (e.g., TaxRateTypeCode) for each type of tax (e.g., TaxTypeCode) related thereto. An example of GDT WithholdingTaxationCharacteristicsCode is:

<WithholdingTaxationCharacteristicsCode listID=21901listAgencyID=310>1</WithholdingTaxtation-CharacteristicsCode>

In certain implementations, GDT WithholdingTaxationCharacteristicsCode may have the following structure:

| GDT | | Cat. | Object Class | Property | Representation/ Association | Type | Type Name | Len. | Card. | Remarks |
|---|---|---|---|---|---|---|---|---|---|---|
| WithholdingTaxation-CharacteristicsCode | | | With-holding Taxa-tion Charac-teristics | | Code | CDT | Code | 1..4 | | Restricted |
| | listID | A | Code List | Identification | Identifier | xsd | Token | | 0..1 | |
| | listAgencyID | A | Code List Agency | Identification | Identifier | xsd | Token | | 0..1 | |
| | listVersionID | A | Code List | Version | Identifier | xsd | Token | | 0..1 | |
| | listAgency-SchemeID | A | Code List Agency | Scheme | Identifier | xsd | Token | | 0..1 | |
| | listAgency-SchemeAgencyID | A | Code List Agency | Scheme Agency | Identifier | xsd | Token | | 0..1 | |

As a possible integrity condition, precise rules as to which withholding taxes can be shown as totals and which have to be itemized may be determined on a county-by-country basis in accordance with the applicable laws. If the tax rate or tax amount are shown, the tax type (i.e., GDT TypeCode) may also be specified.

GDT WithholdingTax may be used to show the different withholding taxes in the payment of remunerations or to initiate tax returns or tax payments by a company to the relevant tax authorities.

WithholdingTaxationCharacteristicsCode

A GDT WithholdingTaxationCharacteristicsCode is the coded representation of the main characteristics that form the basis of a withholding taxation. Its main characteristics are the type of product tax (e.g., WithholdingTaxEventType- GDT WithholdingTaxationCharacteristicsCode may be assigned a customer-specific code list based on country. With regards to attributes, listAgencyID may be the ID of the customer (e.g., ID from DE 3055 if listed there). ListVersionID may be the version of the particular code list (e.g., assigned and managed by the customer). ListAgencySchemeID may be the ID of the scheme if the listAgencyID does not come from DE 3055. ListAgencySchemeAgencyID may be the ID of the organization from DE 3055 that manages the listAgencySchemeID scheme.

For example, with "WithholdingTaxationCharacteristicsCode for EN," listID="21901" and listAgencyID="310," the following code list may be assigned: 1 (i.e., construction work subject to withholding tax at the full tax rate), 2 (i.e., construction work exempt from withholding tax).

GDT WithholdingTax is generally not used in messages. Although company code lists may include all combinations of WithholdingTaxEventTypeCode and TaxRateTypeCode, further enhancement of code lists will provide users the option of using in-house codes.

A GDT WithholdingTaxationCharacteristicsCodeContextElements defines a dependency or an environment in which the WithholdingTaxationCharacteristicsCode appears. The environment may be described by context categories. With the context categories in WithholdingTaxationCharacteristicsCodeContextElements, the valid portion of code values of WithholdingTaxationCharacteristicsCode may be restricted according to an environment during use.

In certain implementations, GDT WithholdingTaxationCharacteristicsCodeContextElements may have the following structure:

| GDT | | Cat. | Object Class | Property | Representation/ Association | Type | Type Name | Card. |
|---|---|---|---|---|---|---|---|---|
| WithholdingTaxation-CharacteristicsContext-Elements | | | Withholding Taxation Characteristics Code Context Elements | | Details | | | |
| | Country-Code | E | Withholding Taxation Characteristics Code Context Elements | Country | Code | GDT | CountryCode | 0..1 |

The CountryCode context category may define the context country and determine the valid code values for a specific country.

WithholdingTaxCertificateID

A GDT WithholdingTaxCertificateID is a unique identifier for a withholding tax certificate. A withholding tax certificate reports the tax withheld by a company from a business partner. An example of GDT WithholdingTaxCertificateID is:

<WithholdingTaxCertificateID>1900000294</WithholdingTaxCertificateID>

In certain implementations, GDT WithholdingTaxCertificateID may have the following structure:

| GDT | Object Class | Property | Representation/ Association | Type | Type Name | Len. | Remarks |
|---|---|---|---|---|---|---|---|
| WithholdingTaxCertificateID | Withholding Tax Certificate | Identification | Identifier | CDT | Identifier | 1..20 | Restricted |

As a possible integrity condition, GDT WithholdingTaxCertificateID may be unique in the context of an issuer.

In some countries, it may be legally required to report the WithholdingTaxCertificateID to the tax authorities and to the business partner for each certificate.

WithholdingTaxEventTypeCode

A GDT WithholdingTaxEventTypeCode is a coded representation of the type of taxable income which is connected with the withholding tax in the payment of remunerations. Taxable income may refer to an event in which a combination of properties is the basis for a tax liability, tax reduction or tax exemption of a particular type and amount according to the tax laws of a particular country. An example of GDT WithholdingTaxEventTypeCode is:

<WithholdingTaxEventTypeCode listID=21001>
100
</WithholdingTaxEventTypeCode>

In certain implementations, GDT WithholdingTaxEventTypeCode may have the following structure:

| GDT | | Cat. | Object Class | Property | Representation/ Association | Type | Type Name | Len. | Remarks |
|---|---|---|---|---|---|---|---|---|---|
| Withholding-TaxEventTypeCode | | | Withholding Tax Event | Type | Code | CDT | Code | 1..3 | restricted |
| | listID | A | Code List | Identification | Identifier | xsd | token | 1..40 | |

GDT WithholdingTaxEventTypeCode may be assigned a customer-specific code list based on country. With regards to attributes, listAgencyID may be the ID of the customer (e.g., ID from DE 3055 if listed there). Based on "WithholdingTaxEventTypeCode for DE" (i.e., Germany), listID="21001" and listAgencyID="310," the following code list may be assigned: 1 (i.e., withholding tax-liable construction work), 2 (i.e., construction work exempted from the withholding tax liability).

GDT WithholdingTaxEventTypeCode may be used in the calculation of taxes for the determination of type and rate of the respective tax. Furthermore, the tax registry may decide on the basis of the WithholdingTaxEventTypeCodes how and when taxes are to be reported and paid to the tax authorities.

"Taxable Income Properties" in the sense of tax law is the taxable unit (legal entity liable to pay the tax) and the taxable object (object, activity or status on which a tax is levied). The type and number of Taxable Income Properties to be considered for particular business transactions may be determined by the tax laws of a country. These laws or their enforcement provisions generally do not prescribe specific codes. Therefore, the codes may be set by the respective software manufacturers.

GDT WithholdingTaxEventTypeCode may be semantically similar to "Withholding Tax Code" types of GDT. However, WithholdingTaxEventTypeCode is independent of tax rates.

GDT WithholdingTaxEventTypeCodeContextElements defines a dependency or an environment in which the WithholdingTaxEventTypeCode appears. The environment may be described by context categories. With the context categories in WithholdingTaxEventTypeCodeContextElements the valid portion of code values of WithholdingTaxEventTypeCode is restricted according to an environment during use. In certain implementations, GDT WithholdingTaxEventTypeCodeContextElements may have the following structure:

| GDT | | Cat. | Object Class | Property | Representation/ Association | Type | Type Name | Card. |
|---|---|---|---|---|---|---|---|---|
| WithholdingTaxEventTypeCodeContextElements | | | Withholding Tax Event Type Code Context Elements | | Details | | | |
| | CountryCode | E | Withholding Tax Event Type Code Context Elements | Country | Code | GDT | CountryCode | 0..1 |

The CountryCode context category may define the context country and may determine the valid code values for a specific country.

WorkAccidentInsuranceEmployeeGroupCode

A GDT WorkAccidentInsuranceEmployeeGroupCode is the coded representation of a group of employees for work accident insurance purposes. An example of GDT WorkAccidentInsuranceEmployeeGroupCode is:

<WorkAccidentInsuranceEmployeeGroupCode listAgencyID="xxx" listVersionID="xxxxx">1234567890</WorkAccidentInsuranceEmployeeGroupCode>

In certain implementations, GDT WorkAccidentInsuranceEmployeeGroupCode may have the following structure:

| GDT | | Cat. | Object Class | Property | Representation/ Association | Type | Type Name | Len. | Card. | Remarks |
|---|---|---|---|---|---|---|---|---|---|---|
| WorkAccidentInsuranceEmployeeGroupCode | | | Work Accident Insurance Employee Group | | Code | CDT | Code | 1..10 | | Restricted |
| | listID | A | Code List | Identification | Identifier | xsd | token | | 0..1 | |
| | listAgencyID | A | Code List Agency | Identification | Identifier | xsd | token | | 0..1 | |
| | listVersionID | A | Code List | Version | Identifier | xsd | token | | 0..1 | |
| | listAgencySchemeID | A | Code List Agency | Scheme | Identifier | xsd | token | | 0..1 | |
| | listAgencySchemeAgencyID | A | Code List Agency | Scheme Agency | Identifier | xsd | token | | 0..1 | |

GDT WorkAccidentInsuranceEmployeeGroupCode may be assigned a fixed, alternative standard code list based on country. Using Italy as an example: "WorkAccidentInsuranceEmployeeGroupCode for IT," listID="23001," listAgencyID="IT," listAgencySchemeID="ISO 3166-1" and "listAgencySchemeAgencyID="5 (ISO)." The code list may be maintained by the customer according to the codes issued by their respective national work accident insurance institution.

As a possible integrity condition, GDT WorkAccidentInsuranceEmployeeGroupCode for Italy may be a 10 character numeric field.

In Italy, values are sent to the company by the national work accident insurance institution.

GDT WorkAccidentInsuranceEmployeeGroupCodeContextElements defines a dependency or an environment in which the WorkAccidentInsuranceEmployeeGroupCode appears. The environment may be described by context categories. With the context categories in WorkAccidentInsuranceEmployeeGroupCode ContextElements the valid portion of code values of WorkAccidentInsuranceEmployeeGroupCode may be restricted according to an environment during use.

In certain implementations, GDT WorkAccidentInsuranceEmployeeGroupCodeContextElements may have the following structure:

| GDT | | Cat. | Object Class | Property | Representation/ Association | Type | Type Name | Card. |
|---|---|---|---|---|---|---|---|---|
| WorkAccidentInsuranceEmployeeGroupCode ContextElements | | | Work Accident Insurance Employee Group Code Context Elements | | Details | | | |
| | CountryCode | E | Work Accident Insurance Employee Group Code Context Elements | Country | Code | GDT | CountryCode | 0..1 |

The CountryCode context category may define the context country and may determine the valid code values for a specific country.

WorkAccidentRiskCategoryCode

A GDT WorkAccidentRiskCategoryCode is the coded representation of a risk category for a work accident. An example of GDT WorkAccidentRiskCategoryCode is:

<WorkAccidentRiskCategoryCode>1000</WorkAccidentRiskCategoryCode>

In certain implementations, GDT WorkAccidentRiskCategoryCode may have the following structure:

| GDT | | Cat. | Object Class | Property | Representation/ Association | Type | Type Name | Len. | Card. | Remarks |
|---|---|---|---|---|---|---|---|---|---|---|
| WorkAccident-RiskCategory-Code | | | Work Accident Risk Category | | Code | CDT | Code | 1..4 | | Restricted |
| | listID | A | Code List | Identification | Identifier | xsd | token | | 0..1 | |
| | listAgencyID | A | Code List Agency | Identification | Identifier | xsd | token | | 0..1 | |
| | listVersionID | A | Code List | Version | Identifier | xsd | token | | 0..1 | |
| | listAgencySchemeID | A | Code List Agency | Scheme | Identifier | xsd | token | | 0..1 | |
| | listAgencySchemeAgencyID | A | Code List Agency | Scheme Agency | Identifier | xsd | token | | 0..1 | |

GDT WorkAccidentRiskCategoryCode may be assigned a fixed, alternative standard code list based on country. The code list may be maintained by the customer according to the codes issued by their respective national work accident insurance institution, such as the Italian work accident insurance INAIL. Using Italy as an example: "WorkAccidentRiskCategoryCode for IT," listID="23101," listAgencyID="IT," listAgencySchemeID="ISO 3166-1" and "listAgency-SchemeAgencyID="5 (ISO)."

An example of customer-specific code semantics for Italy is: Risk category 1100—Mechanical agricultural work, index of incapacity 10.84. This information is requested by Social Insurance Funds and INAIL.

Data element R/3: P15_VTINA

GDT WorkAccidentRiskCategoryCodeContextElements defines a dependency or an environment in which the WorkAccidentRiskCategoryCode appears. The environment may be described by context categories. With the context categories in WorkAccidentRiskCategoryCode ContextElements the valid portion of code values of WorkAccidentRiskCategoryCode is restricted according to an environment during use.

In certain implementations, GDT WorkAccidentRiskCategoryCodeContextElements may have the following structure:

| GDT | | Cat. | Object Class | Property | Representation/ Association | Type | Type Name | Card. |
|---|---|---|---|---|---|---|---|---|
| WorkAccidentRisk-Category-Code ContextElements | | | Work Accident Risk Category Code Context Elements | | Details | | | |
| | CountryCode | E | Work Accident Risk Category Code Context Elements | Country | Code | GDT | CountryCode | 0..1 |

CountryCode may define the context country and may determine the valid code values for a specific country.

WorkAgreementAdministrativeCategoryCode

A GDT WorkAgreementAdministrativeCategoryCode is the coded representation of the administrative category of a work agreement. A WorkAgreementAdministrativeCategory is a classification of work agreements according to country-specific personnel administration criteria. The classification may be based on the type of work performed and is generally classified into physical, mental, office or executive; or it may be based on the type of payment, such as hourly wage, monthly salary or salary exempt. An example of GDT WorkAgreementAdministrativeCategoryCode is:

<WorkAgreementAdministrativeCategoryCode listID=10105 listAgencyID=310>2</WorkAgreementAdministrative-CategoryCode>

For the country Germany, the above example is the code for the category Salaried Employee.

In certain implementations, GDT WorkAgreementAdministrativeCategoryCode may have the following structure:

| GDT | | Cat. | Object Class | Property | Representation/ Association | Type | Type Name | Len. | Card. | Remarks |
|---|---|---|---|---|---|---|---|---|---|---|
| WorkAgreementAdministrativeCategoryCode | | | Work Agreement | Administrative_ Category | Code | CDT | Code | 1..2 | | Restricted |
| | listID | A | Code List | Identification | Identifier | xsd | Token | | 0..1 | |
| | listAgencyID | A | Code List Agency | Identification | Identifier | xsd | Token | | 0..1 | |
| | listVersionID | A | Code List | Version | Identifier | xsd | token | | 0..1 | |
| | listAgencySchemeID | A | Code List Agency | Scheme | Identifier | xsd | token | | 0..1 | |
| | listAgencySchemeAgencyID | A | Code List Agency | Scheme Agency | Identifier | xsd | token | | 0..1 | |

GDT WorkAgreementAdministrativeCategoryCode may be assigned a changeable, customer-specific code list based on country. With regards to attributes, listAgency ID can be the ID of the customer (e.g., from DE 3055 if listed there). ListVersionID can be the version of the particular code list (e.g., assigned and managed by the customer). ListAgencySchemeID can be the ID of the scheme if the listAgencyID does not come from DE 3055. ListAgencySchemeAgencyID can be the ID of the organization from DE 3055 that manages the listAgencySchemeID scheme.

For "WorkAgreementAdministrativeCategoryCode for DE" (i.e., Germany), listID="20801," listAgencyID="310," the following code list may be assigned: 1 (i.e., Industrial Worker), 2 (i.e., Salaried Employee), 3 (i.e., Senior Executive). For "WorkAgreementAdministrativeCategoryCode for US" (i.e., United States), listID="20802," listAgencyID="310," the following code list may be assigned: 1 (i.e., Hourly), 2 (i.e., Salaried non-exempt), 3 (i.e., Salaried exempt).

As a possible integrity condition, not every combination of WorkAgreementAdministrativeCategoryCode and WorkAgreementTypeCode may be allowed for a work agreement. The customer may specify in the business configuration which combinations are allowed for which employer in which time periods.

GDT WorkAgreementAdministrativeCategoryCodeContextElements defines a dependency or an environment in which the WorkAgreementAdministrativeCategoryCode appears. The environment may be described by context categories. With the context categories in WorkAgreementAdministrativeCategoryCodeContextElements the valid portion of code values of WorkAgreementAdministrativeCategoryCode is restricted according to an environment during use.

In certain implementations, GDT WorkAgreementAdministrativeCategoryCodeContextElements may have the following structure:

| GDT | | Cat. | Object Class | Property | Representation/Association | Type | Type Name | Card. |
|---|---|---|---|---|---|---|---|---|
| WorkAgreementAdministrativeCategoryCodeContextElements | | | WorkAgreement-Administrative-Category Code Context Elements | | Details | | | |
| | Country-Code | E | WorkAgreement-Administrative-Category Code Context Elements | Country | Code | GDT | Country-Code | 0..1 |
| | Work-Agreement-TypeCode | E | WorkAgreement-Administrative-Category Code Context Elements | Region | Code | GDT | Work-Agreement-TypeCode | 1 |

The CountryCode context category may define the context country and may determine the valid code values for a specific country. The WorkAgreementTypeCode context category may define the context type of work agreement and may define the valid code values for a type of work agreement.

WorkAgreementID

A GDT WorkAgreementID is a unique ID for a work agreement. A work agreement is an agreement between an employee and an employer. The employee may agree to perform work and the employer may agree to provide remuneration for the work performed. A work agreement may comprise numerous other obligations in addition to the main obligation (remuneration for work), such as obligations in terms of loyalty, reporting, and benefits. Examples of work agreements include employment contracts, placement contracts, traineeships, and training contracts. A specific example of GDT WorkAgreementID is:

<WorkAgreementID>1234567890123456</WorkAgreementID>

In certain implementations, GDT WorkAgreementID may have the following structure:

| GDT | | Cat. | Object Class | Property | Representation/Association | Type | Type Name | Len. | Card. | Remarks |
|---|---|---|---|---|---|---|---|---|---|---|
| WorkAgreementID | | | Work Agreement | Identification | Identifier | GDT | Identifier | 1..40 | | restricted |
| | schemeID | A | Identification Scheme | Identification | Identifier | XSD | Token | 1..60 | 0..1 | |

-continued

| GDT | | Cat. | Object Class | Property | Representation/ Association | Type | Type Name | Len. | Card. | Remarks |
|---|---|---|---|---|---|---|---|---|---|---|
| | scheme-AgencyID | A | Identification Scheme Agency | Identification | Identifier | XSD | Token | 1..60 | 0..1 | |

GDT WorkAgreementID attributes may be assigned as follows: schemeID (Currently, the following schemes may be supported: WorkAgreementGUID, which may identify the work agreement using a Global Unique Identifier; WorkAgreementID, which may identify the work agreement using an internal identifier of the schemeAgency); schemeAgencyID (i.e., the business system which issued the ID).

As a possible integrity condition, if the “WorkAgreementGUID” is used for the schemeID, the WorkAgreementID may comprise 1 to 40 places. If the “WorkAgreementID” is used, the WorkAgreementID may comprise 1 to 16 places and may be alphanumeric.

As a possible integrity condition, if the schemeID or schemeAgencyID have not been specified, it may be necessary to determine them from the context.

Notes: GDT WorkAgreementID may be used in the same way as the personnel number types of GDT.

WorkAgreementNoticePeriodCode

A GDT WorkAgreementNoticePeriodCode is the code indicating the notice period of a work agreement. Its values may be taken from legal, pay scale or business agreements. An example of GDT WorkAgreementNoticePeriodCode is:

<WorkAgreementNoticePeriodCode>1</WorkAgreementNoticePeriodCode>

In certain implementations, GDT WorkAgreementNoticePeriodCode may have the following structure:

GDT WorkAgreementNoticePeriodCode may be assigned an changeable customer code list. One code list may be permitted for each administrative organization (agency). With regards to attributes, if the customer code list remains unchanged, listAgency ID can be “310.” Otherwise listAgencyID can be the ID of the customer (e.g., ID from DE 3055 if listed there). ListVersionID can be the version of the particular code list (e.g., assigned and managed by the customer). ListAgencySchemeID can be the ID of the scheme if the listAgencyID does not come from DE 3055. ListAgencySchemeAgencyID can be the ID of the organization from DE 3055 that manages the listAgencySchemeID scheme.

GDT WorkAgreementNoticePeriodCode is a customizable code list. Some examples of possible user semantics are: 3 months as of weekend (i.e., notice period is three months and starts immediately after a weekend), 3 months as of end of month, 6 months as of end of quarter.

WorkAgreementOccupationCategoryCode

A GDT WorkAgreementOccupationCategoryCode is a coded representation of the occupation category of the work agreement. An occupation category of the work agreement may describe the job designated by the work agreement which is assigned to an employee within the company. GDT WorkAgreementOccupationCategoryCode is based on national legal requirements. An example of GDT WorkAgreementOccupationCategoryCode is:

<WorkAgreementOccupationCategoryCode listID=“PCS-ESE” listAgencyID=“107” listVersionID=“2003”>100X</WorkAgreementOccupationCategoryCode>

In certain implementations, GDT WorkAgreementOccupationCategoryCode may have the following structure:

| GDT | | Cat. | Object Class | Property | Representation/ Association | Type | Type Name | Len. | Card. | Remarks |
|---|---|---|---|---|---|---|---|---|---|---|
| Work-Agreement-Notice-PeriodCode | | | Work Agreement | Notice Period | Code | CDT | Code | 1..2 | | restricted |
| | listID | A | Code List | Identification | Identifier | xsd | token | | 0..1 | |
| | listAgency ID | A | Code List Agency | Identification | Identifier | xsd | token | | 0..1 | |
| | listVer-sionID | A | Code List | Version | Identifier | xsd | token | | 0..1 | |
| | listAgen-cyScheme-ID | A | Code List Agency | Scheme | Identifier | xsd | token | | 0..1 | |
| | listAgen-cyScheme-Agency ID | A | Code List Agency | Scheme Agency | Identifier | xsd | token | | 0..1 | |

| GDT | | Cat. | Object Class | Property | Representation/ Association | Type | Type Name | Len. | Card. | Remarks |
|---|---|---|---|---|---|---|---|---|---|---|
| Work-Agreement-Occupation-CategoryCode | | | Work Agreement Ocupation Category | | Code | CDT | Code | 4 | | restricted |
| | listID | A | Code List | Identification | Identifier | xsd | token | | 0..1 | |
| | listAgency ID | A | Code List Agency | Identification | Identifier | xsd | token | | 0..1 | |
| | listVersion ID | A | Code List | Version | Identifier | xsd | token | | 0..1 | |
| | listAgency SchemeID | A | Code List Agency | Scheme | Identifier | xsd | token | | 0..1 | |
| | listAgency Scheme-AgencyID | A | Code List Agency | Scheme Agency | Identifier | xsd | token | | 0..1 | |

GDT WorkAgreementOccupationCategoryCode may be assigned a static, country-specific code list. For example, "WorkAgreementOccupationCategoryCode for FR" [France], listID="PCS-ESE," listAgencyID="107 (FR, INSEE/Institut National de la Statistique et des Etudes Economiques': National Institute for Statistics and Economic Studies)," listVersionID="2003."

GDT WorkAgreementOccupationCategoryCode is based on national legal requirements. For example, the above example of a WorkAgreementOccupationCategoryCode is defined in accordance with the INSEE—PCS-ESE.

The data is recorded for all French employees and may be used for statistical evaluations on a national level. In addition to the pay slip, it may be used in legal reports concerning social security including the unified social security declaration (DADS-U). Some categories are considered as requiring special abilities and are needed in the "Declaration of Employment of Handicapped Employees."

WorkAgreementTypeCode

A GDT WorkAgreementTypeCode is the coded representation of the type of a work agreement, differentiated by the rights and obligations of the employer and the employee. An example of GDT WorkAgreementTypeCode is:

<WorkAgreementTypeCode>5</WorkAgreementTypeCode>

In certain implementations, GDT WorkAgreementTypeCode may have the following structure:

| GDT | Object Class | Property | Representation/ Association | Type | Type Name | Len. | Remarks |
|---|---|---|---|---|---|---|---|
| WorkAgreementType-Code | Work Agree-ment | Type | Code | CDT | Code | 1..4 | Restricted |

-

GDT WorkAgreementTypeCode is assigned a fixed, predefined customer code list. The attributes of the code are not required because constant values would be assigned to them in a customer system at runtime. They are implicitly assigned in the following way: listID="10091," listAgencyID="310," listVersionID=assigned and managed by the user of the code.

The following code values may be assigned to GDT WorkAgreementTypeCode: 1 (i.e., permanent), 2 (i.e., temporary), 3 (i.e., executive), 4 (i.e., trainee), 5 (i.e., working student), 6 (i.e., retiree).

The classification of work agreements into work agreement types may be required in situations such as a headcount recording.

WorkingDayCalendarCode

A GDT WorkingDayCalendarCode is a coded representation of a working day calendar. A working day calendar specifies the working and non-working days in a region or country. It takes into account public holidays and general working days in a week. An example of GDT WorkingDayCalendarCode is:

<WorkingDayCalendarCode>1</WorkingDayCalendarCode>

In certain implementations, GDT WorkingDayCalendarCode may have the following structure:

| GDT | | Cat. | Object Class | Property | Representation/ Association | Type | Type Name | Len. | Card. | Remarks |
|---|---|---|---|---|---|---|---|---|---|---|
| Working-DayCalendar-Code | | | Working Day Calendar | | Code | CDT | Code | 1..6 | | restricted |
| | listID | A | Code List | Identification | Identifier | xsd | token | | 0..1 | |
| | listAgencyID | A | Code List Agency | Identification | Identifier | xsd | token | | 0..1 | |
| | listVersionID | A | Code List | Version | Identifier | xsd | token | | 0..1 | |
| | listAgency-SchemeID | A | Code List Agency | Scheme | Identifier | xsd | token | | 0..1 | |
| | listAgency-Scheme-AgencyID | A | Code List Agency | Scheme Agency | Identifier | xsd | token | | 0..1 | |

GDT WorkingDayCalendarCode may be assigned an extendable, changeable customer code list. With regards to attributes, ListID can be 10312. If the Customer code list remains unchanged, listAgency ID can be "310." Otherwise listAgencyID can be the ID of the customer (e.g., ID from DE 3055 if listed there). ListVersionID can be the version of the particular code list (e.g., assigned and managed by the customer). ListAgencySchemeID can be the ID of the scheme if the listAgencyID does not come from DE 3055. ListAgencySchemeAgencyID can be the ID of the organization from DE 3055 that manages the listAgencySchemeID scheme.

WorkingTimeModelTypeCode

A GDT WorkingTimeModelTypeCode is the coded representation of the type of a working time model. The working time model type may describe the essential nature of a working time model according to its temporal structure and the type of the contained items. An example of GDT WorkingTimeModelTypeCode is:

<WorkingTimeModelTypeCode listAgencyID='310'>1</WorkingTimeModelTypeCode>

In certain implementations, GDT WorkingTimeModelTypeCode may have the following structure:

| GDT | Object Class | Property | Representation/ Association | Type | Type Name | Len. | Remarks |
|---|---|---|---|---|---|---|---|
| WorkingTimeModelType-Code | Working Time Model | Type | Code | CDT | Code | 1..4 | restricted |

A semantic example of a customer-specific code titled "US" is: USA—Working days are Monday through Friday unless a public holiday.

GDT WorkingDayCalendarCode may be used when the handling of working and non-working days is needed.

The WorkingDayCalendarCode may be used to identify the definition of a working day calendar as well as the runtime object that allows performing calculations. In some systems the working day calendar may identify a factory calendar.

WorkingTimeModelID

A GDT WorkingTimeModelID is a unique identifier for a WorkingTimeModel. A WorkingTimeModel is a structured description of working times. In addition to working hours, it may also describe absence times, break times, and availability times. An example of GDT WorkingTimeModelID is:

<WorkingTimeModelID>DM1</WorkingTimeModelID>

In certain implementations, GDT WorkingTimeModelID may have the following structure:

| GDT | Object Class | Property | Representation/ Association | Type | Type Name | Len. | Remarks |
|---|---|---|---|---|---|---|---|
| WorkingTime-ModelID | Working Time Model | Identification | Identifier | CDT | Identifier | 1..10 | restricted |

GDT WorkingTimeModelTypeCode is assigned a fixed, predefined customer code list. The attributes of the code are not required because constant values would be assigned to them in a customer system at runtime. They are implicity assigned in the following way: listID="10195," listAgencyID="310," listVersionID=assigned and managed by the user of the code.

The following code values may be assigned to GDT WorkingTimeModelTypeCode: 1 (i.e., daily model), 2 (i.e., period model), 3 (i.e., schedule model).

WorksCouncilElectionEmployeeGroupCode

A GDT WorksCouncilElectionEmployeeGroupCode is a coded representation of a group of employees who are treated equally in an election of the works council. An example of GDT WorksCouncilElectionEmployeeGroupCode is:

<WorksCouncilElectionEmployeeGroupCode>A</WorksCouncilElectionEmployeeGroupCode>

In certain implementations, GDT WorksCouncilElectionEmployeeGroupCode may have the following structure:

| GDT | | Cat. | Object Class | Property | Representation/ Association | Type | Type Name | Len. | Card. | Remarks |
|---|---|---|---|---|---|---|---|---|---|---|
| WorksCouncil-Election-Employee-GroupCode | | | Works Council Election Employee Group | | Code | CDT | Code | 1 | | restricted |
| | listID | A | Code List | Identification | Identifier | xsd | token | | 0..1 | |
| | list-AgencyID | A | Code List Agency | Identification | Identifier | xsd | token | | 0..1 | |
| | list-VersionID | A | Code List | Version | Identifier | xsd | token | | 0..1 | |
| | listAgency-SchemeID | A | Code List Agency | Scheme | Identifier | xsd | token | | 0..1 | |
| | listAgency-Scheme-AgencyID | A | Code List Agency | Scheme Agency | Identifier | xsd | token | | 0..1 | |

GDT WorksCouncilElectionEmployeeGroupCode may be assigned an extensible, customer-specific code list based on country. With regards to attributes, listAgency ID can be the ID of the customer (e.g., from DE 3055 if listed there). List-VersionID can be the version of the particular code list (e.g., assigned and managed by the customer). ListAgency-SchemeID can be the ID of the scheme if the listAgencyID does not come from DE 3055. ListAgencySchemeAgencyID can be the ID of the organization from DE 3055 that manages the listAgencySchemeID scheme.

For example, with "WorksCouncilElectionEmployee-GroupCode for FR" (i.e., France), listID="23201," listAgencyID="FR," listAgencySchemeID="ISO 3166-1," listAgencySchemeAgencyID="5 (ISO)," the following code list may be assigned: A (i.e., workers), B (i.e., qualified workers), C (i.e., managers). These are the official code values according to French regulations.

GDT WorksCouncilElectionEmployeeGroupCode may be used to determine the electoral group to which the employee belongs in the election of the work council.

In certain implementations, GDT WorksCouncilElection-EmployeeGroupCode may use data element R/3 with a value of P06_COLDP.

GDT WorksCouncilElectionEmployee-GroupCodeContextElements defines a dependency or an environment in which the WorksCouncilElectionEmployee-GroupCode appears. The environment may be described by context categories. With the context categories in WorksCouncilElectionEmployeeGroupCodeContextElements, the valid portion of code values of WorksCouncilElection-EmployeeGroupCode can be restricted according to an environment during use.

In certain implementations, GDT WorksCouncilElection-EmployeeGroupCodeContextElements may have the following structure:

The CountryCode context category may define the context country and may determine the valid code values for a specific country.

Deployment Units

Turning to the specific deployment units, the enterprise service infrastructure may include (or be based on) Customer Invoicing, Customer Relationship Management, Due Item Management, Financial Accounting, Foundation, Human Capital Management, Payment, Production and Site Logistics Execution, Project Management, Purchasing, Requisitioning, RFQ Processing, Supplier Invoicing, Supply Chain Control, as well as others. Each of these deployment units can include one or more of the following example business objects.

Business Object CustomerInvoiceRequest

FIGS. 33-1 through 33-6 illustrate an example CustomerInvoiceRequest business object model 33000. Specifically, this model depicts interactions among various hierarchical components of the CustomerInvoiceRequest, as well as external components that interact with the CustomerInvoiceRequest (shown here as 33002 through 33018 and 33072 through 33112).

A business object CustomerInvoiceRequest can be a request to create one or several CustomerInvoices, or take account of the data for the underlying business document when creating a CustomerInvoice. The Business Object CustomerInvoiceRequest can be part of the Process Component Customer Invoice Processing, and in turn a component of Deployment Unit Customer Invoicing. In some implementations, a CustomerInvoiceRequest is made up of two key structures: The CustomerInvoiceRequest with dependent data such as the parties involved, status, and references, which are valid for the entire document, and The CustomerInvoiceRequest items with item information and the dependent data such as product information, the parties involved, status, and references.

| GDT | | Cat. | Object Class | Property | Representation/ Association | Type | Type Name | Card. |
|---|---|---|---|---|---|---|---|---|
| WorksCouncilElectionEmployee-GroupCodeContextElements | | | Works Council Election Employee Group Code Context Elements | | Details | | | |
| | Country-Code | E | Works Council Election Employee Group Code Context Elements | Country | Code | GDT | Country-Code | 0..1 |

CustomerInvoiceRequest is represented by the node CustomerInvoiceRequest 33020.

Service Interface Request Invoicing In may have the technical name: CustomerInvoiceProcessingRequestInvoicingIn.

In some implementations, the Request Invoicing In service interface is part of the following process integration models: Sales Order Processing_Customer Invoice Processing, Service Order Processing_Customer Invoice Processing, Service Confirmation Processing_Customer Invoice Processing, Service Request Processing_Customer Invoice Processing, Service Contract Processing_Customer Invoice Processing, Customer Return Processing_Customer Invoice Processing, Outbound Delivery Processing_Customer Invoice Processing, Supplier Invoice Processing_Customer Invoice Processing.

The Request Invoicing In service interface can group the operations for requesting the settlement of business transactions related to goods and services via CustomerInvoices.

MaintainCustomerInvoiceRequest may have the technical name: CustomerInvoiceProcessingRequestInvoicingIn. MaintainCustomerInvoiceRequest.

The MaintainCustomerInvoiceRequest operation can create or change CustomerInvoiceRequest business objects in order request invoicing for a business document. The operation can be based on the CustomerInvoiceRequestRequest message type (MDT: CustomerInvoiceRequestMessage) that is derived from the CustomerInvoiceRequest business object.

Node Structure of Business Object CustomerInvoiceRequest

A node structure of business object CustomerInvoiceRequest can include a request to create one or more customer invoices for the underlying business document, or take the data into account when creating a CustomerInvoice. The CustomerInvoiceRequest can contain identifying characteristics, and includes parties, locations, and details relevant to billing this business transaction.

In some implementations, the elements directly located on the CustomerInvoiceRequest node are defined by the data type CustomerInvoiceRequestElements. These elements are: UUID, BaseBusinessTransactionDocumentID, BaseBusinessTransactionDocumentUUID, BaseBusinessTransactionDocumentTypeCode, ReceivablesPropertyMovementDirectionCode, ProposedInvoiceDate, ProposedCustomerInvoiceProcessingTypeCode, TotalNetAmount, TotalGrossAmount, TotalTaxAmount, SystemAdministrativeData, ItemListProcessingOverviewStatusCode, Status.

In some implementations, UUID internally assigned universally unique identifier of a CustomerInvoiceRequest on which other business objects can define foreign keys. UUID may be based on GDT UUID. BaseBusinessTransactionDocumentID can be an identifier, which may be unique, for a business document that is used as a basis for a CustomerInvoiceRequest. BaseBusinessTransactionDocumentID may be based on GDT BusinessTransactionDocumentID Qualifier: Base. BaseBusinessTransactionDocumentUUID can be a universal identifier, which may be unique, for a business document that is used as a basis for a CustomerInvoiceRequest, and is optional. BaseBusinessTransactionDocumentUUID may be based on GDT UUID Qualifier: BusinessTransactionDocument. BaseBusinessTransactionDocumentTypeCode can be a coded representation of the business document type used as a basis for a CustomerInvoiceRequest. BaseBusinessTransactionDocumentTypeCode may be based on GDT BusinessTransactionDocumentTypeCode Qualifier: Base Restricted Values: SalesOrder, ServiceConformation, ServiceContract, ServiceOrder, ServiceRequest, OutboundDelivery, CustomerReturn. ReceivablesPropertyMovementDirectionCode can be a coded representation of whether a CustomerInvoice based on this request would increase or decrease receivables. ReceivablesPropertyMovementDirectionCode may be based on GDT PropertyMovementDirectionCode Qualifier: Receivables. ProposedInvoiceDate can be a proposal for the invoice date of CustomerInvoice to be created for this CustomerInvoiceRequest, and is optional. ProposedInvoiceDate may be based on GDT Date Qualifier: ProposedInvoice. ProposedCustomerInvoiceProcessingTypeCode is the aggregation of proposals for the processing type of a CustomerInvoice of all Items in the CustomerInvoiceRequest, and is optional. ProposedCustomerInvoiceProcessingTypeCode may be based on GDT BusinessTransactionDocumentProcessingTypeCode. TotalNetAmount can be the net value of CustomerInvoiceRequest, and is optional. TotalNetAmount may be based on GDT Amount Qualifier: TotalNet. TotalGrossAmount is the gross value of CustomerInvoiceRequest, and is optional. TotalGrossAmount may be based on GDT Amount Qualifier: TotalGross.

In some implementations, TotalTaxAmount is the sum of all tax values accruing on this CustomerInvoiceRequest, and is optional. TotalTaxAmount may be based on GDT Amount Qualifier: TotalTax. SystemAdministrativeData can be administrative data recorded by the system, and is optional. The SystemAdministrativeData can include system user and times changes are made. SystemAdministrativeData may be based on GDT SystemAdministrativeData. ItemListProcessingOverviewStatusCode can be the coded representation of the overview status of the process-relevant aspects of all items of the CustomerInvoiceRequest derived from all status variables in element Status. ItemListProcessingOverviewStatusCode may be based on GDT CustomerInvoiceRequestItemListProcessingOverviewStatusCode. Status is the current step in the life cycle of CustomerInvoiceRequest. Status may be based on GDT CustomerInvoiceRequestStatus. ItemListInvoicingBlockingStatusCode is the aggregated status of BlockingStatus of all items of the CustomerInvoiceRequest. ItemListInvoicingBlockingStatusCode may be based on GDT BlockingStatusCode. ItemListInvoicingFeasibilityStatusCode can be the aggregated status of InvoicingFeasibilityStatus of all items of the CustomerInvoiceRequest. ItemListInvoicingFeasibilityStatusCode may be based on GDT FeasibilityStatusCode. ItemListCancellationStatusCode can be the aggregated status of CancellationStatus of all items of the CustomerInvoiceRequest. ItemListCancellationStatusCode may be based on GDT CancellationStatusCode Restricted Values: 1, 4, 5. In some implementations, ConsistencyStatusCode describes whether the node CustomerInvoiceRequest and all associated nodes except Item are consistent or not. ConsistencyStatusCode may be based on GDT INCONSISTENTCONSISTENT_ConsistencyStatusCode. ItemListConsistencyStatusCode can be the aggregated status of ConsistencyStatus of all items of the CustomerInvoiceRequest. ItemListConsistencyStatusCode may be based on GDT INCONSISTENTCONSISTENT_ConsistencyStatusCode.

In some implementations the following composition relationships to subordinate nodes exist: BusinessProcessVariantType 33068 has a cardinality of 1:n, Party 33026 has a cardinality of 1:cn, Location 33034 has a cardinality of 1:cn, SalesAndServiceBusinessArea 33042 has a cardinality of 1:c, DeliveryTerms 33044 has a cardinality of 1:c, PricingTerms 33048 has a cardinality of 1:1, Dependent Object PriceAndTaxCalculation 33052 has a cardinality of 1:c, Dependent Object CashDiscountTerms 33056 has a cardinality of 1:c, Dependent Object AttachmentFolder 33060 has a cardinality of 1:c, Dependent Object TextCollection 33064 has a cardinality of 1:c, Item 33022 has a cardinality of 1:cn.

There may be a number of Inbound Aggregation Relationships including: 1) from business object Identity CreationIdentity may be a cardinality relationship of 1:cn. The CreationIdentity can be the identity of the user that created the CustomerInvoiceRequest. 2) from business object Identity LastChangeIdentity may be a cardinality of c:cn. The LastChangeIdentity can be the identity of the user that last changed the CustomerInvoiceRequest. 3) to node Party BillToParty may be the cardinality relationship of c:c. The BillToParty can be an association to a Party that occurs in the specialization BillToParty. 4) to node Party BillFromParty may be the cardinality relationship of c:c. The BillFromParty can be an association to a Party that occurs in the specialization BillFromParty. 5) to node Party PayerParty may be cardinality relationship of c:c. The PayerParty can be an association to a Party that occurs in the specialization PayerParty. 6) to node Party BuyerParty may be cardinality relationship of c:c. The BuyerParty can be an association to a Party that occurs in the specialization BuyerParty. 7) to node Party SellerParty may be cardinality relationship of c:c. The SellerParty can be an association to a Party that occurs in the specialization SellerParty. 8) to node Party Vendor Party may be cardinality relationship of c:c. The Vendor Party can be an association to a Party that occurs in the specialization Vendor Party. 9) to node Party ProductRecipientParty may be cardinality relationship of c:c. The ProductRecipientParty can be an association to a Party that occurs in the specialization ProductRecipientParty. 10) to node Party EmployeeResponsibleParty may be cardinality relationship of c:c. The EmployeeResponsibleParty can be an association to a Party that occurs in the specialization EmployeeResponsibleParty. 11) to node Location ShipFromLocation may be cardinality relationship of c:c. The Ship from location can be an association to a Location that occurs in the specialization ShipFromLocation. 12) to node Location ShipToLocation may be cardinality relationship of c:c. The ShipToLocation can be an association to a Location that occurs in the specialization ShipToLocation. 13) to node Location ServicePointLocation may be cardinality relationship of c:c. The ServicePointLocation can be an association to a Location that occurs in the specialization ServicePointLocation. 14) to node BusinessProcessVariantType MainBusinessProcessVariantType may be cardinality relationship of 1:1. The MainBusinessProcessVariantType can be an association to the main BusinessProcessVariantType.

There can be Integrity. In some implementations, the elements TotalNetAmount, TotalGrossAmount, and TotalTaxAmount describe the total of the values NetAmount, GrossAmount, and TaxAmount across all items, and cannot be set explicitly. The currency in the elements TotalNetAmount, TotalGrossAmount, and TotalTaxAmount can correspond with the value of the CurrencyCode element in the PricingTerms node.

In some implementations, if element ProposedCustomerInvoiceProcessingTypeCode shows the same value for all Items of the CustomerInvoiceRequest the element ProposedCustomerInvoiceProcessingTypeCode is set to this value in node CustomerInvoiceRequest or stays empty otherwise.

There can be Enterprise-Service-Infrastructure actions. In some implementations, CreateCustomerInvoices (service and application management action) creates CustomerInvoices for all item using action CreateCustomerInvoices at node Item where the preconditions are met. The action elements can be defined by the data type: CustomerInvoiceRequestCreateCustomerInvoicesActionElements. These elements are: CustomerInvoiceDate can be optional, and can have a GDT of Date and a qualifier of CustomerInvoice. AutomaticReleaseAllowedIndicator can have a GDT of Indicator and a qualifier of Allowed. SalesOrderBasedCustomerInvoiceSeparationRequiredIndicator can have a GDT of Indicator and a qualifier of Required. ServiceOrderBasedCustomerInvoiceSeparationRequiredIndicator can have a GDT of Indicator and a qualifier of Required. ServiceContractBasedCustomerInvoiceSeparationRequiredIndicator can have a GDT of Indicator and a qualifier of Required. OutboundDeliveryBasedBasedCustomerInvoiceSeparationRequiredIndicator can have a GDT of Indicator and a qualifier of Required. ProvisionDateBasedCustomerInvoiceSeparationRequiredIndicator can have a GDT of Indicator and a qualifier of Required.

In some implementations, SubmitForCancellation (service and application management action) marks all items of the CustomerInvoiceRequest for cancellation using action SubmitForCancellation at node Item. CheckConsistency (service and application management action) can check whether node CustomerInvoiceRequest and all nodes directly attached (except Item) are consistent.

In some implementations, QueryByElements returns those CustomerInvoiceRequests which contain values in the given elements of the CustomerInvoiceRequest nodes that correspond with the Query elements. The Query elements are defined by the type Data Type: CustomerInvoiceRequestElementsQueryElements. CustomerInvoiceRequestElementsQueryElements can contain the following: 1) PredecessorBusinessTransactionDocumentID can be optional. PredecessorBusinessTransactionDocumentID can select CustomerInvoiceRequests based on business transaction documents which are directly relevant for invoicing or deliver invoicing relevant data as part of the process chain (elements BaseBusinessTransactionDocumentID or ItemBusinessTransactionDocumentReference. PredecessorBusinessTransactionDocumentID can have a reference of ID and a GDT of BusinessTransactionDocumentID. 2) PredecessorBusinessTransactionDocumentTypeCode can be optional. PredecessorBusinessTransactionDocumentTypeCode can select CustomerInvoiceRequests based on the type of business transaction documents which are directly relevant for invoicing or deliver invoicing relevant data as part of the process chain (BaseBusinessTransactionDocumentTypeCode or ItemBusinessTransactionDocumentReference. Reference. TypeCode). Relevant business transaction documents are SalesOrder, ServiceOrder, ServiceRequest, ServiceConfirmation, ServiceContract, CustomerComplaint and OutboundDelivery. PredecessorBusinessTransactionDocumentTypeCode can have a GDT of BusinessTransactionDocumentTypeCode. 3) ProposedInvoiceDate can be optional and have a GDT of Date. 4) ItemProposedCustomerInvoiceProcessingTypeCode can be optional and have a GDT of BusinessTransactionDocumentProcessingTypeCode. 4) PartyBillFromPartyID can be optional. PartyBillFromPartyID can select CustomerInvoiceRequests where this party is involved in role BillFromParty (Party. PartyID or ItemParty. PartyID) and have a GDT of PartyID. 5) PartyBuyerPartyID can be optional. PartyBuyerPartyID can select CustomerInvoiceRequests where this party is involved in role BuyerParty (Party. PartyID or ItemParty. PartyID) and have a GDT of PartyID. 6) PartySellerPartyID can be optional. PartySellerPartyID can select CustomerInvoiceRequests where this party is involved in role SellerParty (Party. PartyID or ItemParty. PartyID) and have a GDT of PartyID. 7) ConsistencyStatusCode can be optional and have a GDT of ConsistencyStatusCode. 8) ItemListConsistencyStatusCode can be optional and have a GDT of ItemConsistencyStatusCode. 9) ItemListInvoicingBlockingStatusCode can be optional, can have a GDT of BlockingStatusCode, and a qualifier of Invoicing. 10) ItemListInvoicingFeasibilityStatusCode can be optional and have a GDT of FeasibilityStatusCode. 11) ItemListCancellationStatusCode can be optional and have a GDT of CancellationStatusCode.

BusinessProcessVariantType

In some implementations, BusinessProcessVariantType defines the character of a business process variant of the CustomerInvoiceRequest. It represents a typical way of processing of a CustomerInvoiceRequest within the process component from a business point of view. The elements located directly at the node BusinessProcessVariantType can be defined by the data type CustomerInvoiceRequestBusinessProcessVariantTypeElements, derived from BusinessProcessVariantTypeElements. These elements are: BusinessProcessVariantTypeCode, and MainIndicator. BusinessProcessVariantTypeCode can be the coded representation of a business process variant type of a CustomerInvoiceRequest. BusinessProcessVariantTypeCode may be based on GDT BusinessProcessVariantTypeCode. MainIndicator specifies whether the current BusinessProcessVariantTypeCode is the main one or not. MainIndicator may be based on GDT Indicator qualifier of Main. This node can contain exactly one BusinessProcessVariantType. This type is regarded as the main BusinessProcessVariantType and MainIndicator is can be set to 'true'. Allowed value for BusinessProcessVariantTypeCode of 1 (Customer Invoice Processing—Standard).

Party

In some implementations, a Party can be a natural or legal person, organization, organizational unit or group that is involved in a CustomerInvoiceRequest in a PartyRole. A PartyRole specifies which rights and obligations the Party has regarding the CustomerInvoiceRequest and the processes that belong to it. A Party may: keep a reference to a business partner or one of its specializations (for example, Customer, Supplier, Employee), and keep a reference to one of the following specializations of an organizational unit: Company, CostCentre, ReportingLineUnit, FunctionalUnit.

In some implementations, a Party can occur in the following disjunct specializations: 1) BillToParty, a party (Customer) that receives the invoice for goods or services. 2) BillFromParty, a party (Company) that carries out the billing process. 3) PayerParty, a party (Customer) that is requested to pay the payables from the delivery of goods or the provision of services or that is the recipient of a credit memo. 4) BuyerParty, a party (Customer) that purchases a good or a service. 5) SellerParty, a party (Company) that sells a good or a service. 5) ProductRecipientParty, a party (Customer) that receives a good or a service. 6) Vendor Party, a party (Company, Supplier) that delivers a good or provides a service. 7) EmployeeResponsibleParty, a party (Employee) that is responsible for the underlying business document.

In some implementations, the elements directly located on the Party node are defined by the data type CustomerInvoiceRequestPartyElements, which is derived from the data type BusinessTransactionDocumentPartyElements. These elements are: PartyID, PartyUUID, PartyTypeCode, RoleCategoryCode, RoleCode, AddressReference, MainIndicator.

PartyID is an identifier, which may be unique, for a party. PartyID may be based on GDT PartyId. PartyUUID can be a universal identifier, which may be unique, for a referencing a business partner or organizational unit. PartyUUID may be based on GDT UUID. PartyTypeCode may be a coded representation of the type of Business Object representing the Party. PartyTypeCode may be based on GDT BusinessObjectTypeCode. RoleCategoryCode can be a coded representation of a grouping of partner roles by process-controlling criteria. RoleCategoryCode may be based on GDT PartyRoleCategoryCode. RoleCode may be a coded representation of a partner role. RoleCode may be based on GDT PartyRoleCode. AddressReference can be a reference to the address of the Party. AddressReference may be based on GDT PartyAddressReference. AddressHostUUID can be an identifier, which may be unique, for the address of the business partner, the organizational unit, or their specializations, and is optional. AddressHostUUID may be based on GDT UUID Qualifier: AddressHost. AddressHostTypeCode is a coded representation of the type of address of the Party in the CustomerInvoiceRequest, and is optional. AddressHostTypeCode may be based on GDT AddressHostTypeCode. MainIndicator may be an indicator whether a Party has the predominant position towards other parties of the same role. MainIndicator may be based on GDT Indicator qualifier of Main.

The following composition relationships to subordinate nodes may exist: 1) Dependent Object Address can have a cardinality relationship of 1:c. 2) from business object Party can have an Inbound Aggregation Relationship cardinality relationship of c:cn. Party can be a customer to whom the invoice will be sent, who is requested to pay for the goods and services to be invoiced or is otherwise involved in the sales and service processes that caused the CustomerInvoiceRequest or a vendor that was involved in the sales and service processes on which the CustomerInvoiceRequest is based or company for which the receivables or liabilities described by this request arose or which is responsible for the invoicing process. 3) to business object UsedAddress can have an Associations for Navigation cardinality relationship of cn:c. UsedAddress can be master data or document specific address used for a Party. It can be possible to determine which of the two applies by means of the AddressHostTypeCode element. The instance of the TO UsedAddress represents this address. In the former case the node ID of the node in the master data object is determined via PartyTypeCode, AddressHostUUID and AddressHostTypeCode elements. In case changes to the TO UsedAddress take place, the master data address is copied by the TO UsedAddress, the changes take place to the copy, and a corresponding DO Address is created at the Party via the PartyAddress composition relationship. In the later case, the TO UsedAddress represents the DO Address used at the Party via the PartyAddress composition relationship.

In some implementations, there can be Integrity Conditions such that if the PartyUUID is specified, the PartyTypeCode can also be present. The same is true for combination AddressHostUUID and AddressHostTypeCode. There can be at most one Party with MainIndicator 'true' per distinct value of element RoleCode.

In some implementations, there can be a DO PartyAddress 33028. The dependent object Address includes the data necessary to describe the postal or communication address of the party. The Dependent Object can be integrated into the CustomerInvoiceRequest business object by means of the PartyAddress prefix.

Location

In some implementations, Location is a physical or logical location that is involved in a CustomerInvoiceRequest in a LocationRole. A physical place can be determined using spatial coordinates (for example an address containing the street and house number). A logical place can not be determined using spatial coordinates (for example a PO box or an email address). It is not necessary to know the physical location of a logical location. Location may be a reference to the Business Object Location or a reference to the address of the Transformed Object Party (representative of a business partner and an organizational unit) or a reference to the address of the Business Object InstallationPoint. Location can occur in the following disjointed specializations: 1) ShipFromLocation, a Location from which goods were/will be delivered. 2) ShipToLocation, a Location to which goods were/will be delivered. 3) ServicePointLocation, a Location where a service has been or will be performed.

In some implementations, the elements located on the Location node can be defined by the data type CustomerInvoiceRequestLocationElements, which is derived from the data type BusinessTransactionDocumentLocationElements. These elements are: LocationID, LocationUUID, AddressReference, AddressHostUUID, AddressHostTypeCode, BusinessObjectTypeCode, PartyID, InstallationPointID, RoleCode, RoleCode.

In some implementations, LocationID can be an identifier, which may be unique, for a location, and is optional. LocationID may be based on GDT LocationID. LocationUUID can be an universal identifier, which may be unique, for referencing a BO Location. LocationUUID may be based on GDT UUID. AddressReference can be a reference to the address of the Location. AddressReference may be based on GDT LocationAddressReference. AddressHostUUID can be an identifier, which may be unique, for the address of the business partner, the organizational unit, or their specializations. AddressHostUUID may be based on GDT Qualifier: AddressHost. AddressHostTypeCode can be a coded representation of the type of address of the Party in the CustomerInvoiceRequest. AddressHostTypeCode may be based on GDT.AddressHostTypeCode. BusinessObjectTypeCode can be a coded representation of the type of business object that includes the referenced address. BusinessObjectTypeCode may be based on GDT BusinessObjectTypeCode. PartyID can be an identifier for a Party (a representative of a business partner or an organizational unit) that includes the referenced address, and is optional. PartyID may be based on GDT PartyId. InstallationPointID can be an identifier of an InstallationPoint that includes the referenced address, and is optional. InstallationPointID may be based on GDT InstallationPointID. RoleCode is a coded representation of a location role. RoleCode may be based on GDT LocationRoleCode. RoleCode can be a coded representation of a grouping of location roles by process-controlling criteria, and is optional. RoleCode may be based on GDT LocationRoleCategoryCode.

In some implementations, the following composition relationships to subordinate nodes can exist: 1) Dependent Object Address can have a cardinality relationship of 1:c. 2) from the business object Location can have an Incoming Aggregation Relationship cardinality relationship of c:cn. Location can be a location from which or to which invoiced goods were/will be delivered. 3) from business object Party or node AddressInformation PartyAddressInformation can have an Incoming Aggregation Relationship cardinality relationship of c:cn. PartyAddressInformation can be address information of a representative of a business partner or organizational centre corresponding to the Location. 4) from business object InstallationPoint or node AddressInformation InstallationPointAddressInformation can have Incoming Aggregation Relationship cardinality relationship of c:cn. InstallationPointAddressInformation can be address information of an installation point corresponding to the Location. 5) to business object UsedAddress can have an Association for Navigation cardinality relationship of cn:c. UsedAddress can be master data or document specific address used for a Location. It is possible to determine which of the two applies by means of the AddressHostTypeCode element. The instance of the TO UsedAddress represents this address. In the former case the node ID of the node in the master data object can be determined via BusinessObjectTypeCode, AddressHostUUID and AddressHostTypeCode elements. In case changes to the TO UsedAddress take place, the master data address can be copied by the TO UsedAddress, the changes take place to the copy, and a corresponding DO Address is created at the Location via the LocationAddress composition relationship. In the latter case the TO UsedAddress represents the DO Address used at the Location via the LocationAddress composition relationship.

There can be Integrity Conditions. In some implementations, there may only be one aggregation or one composition relationship to the Dependent Object Address. If an aggregation relationship to the Business Object Location exists, the LocationID element can be filled with the ID of the Business Object Location. Element PartyID remains empty. If an aggregation relationship to the address of a party (representative of a business partner or OrganizationalCentre) exists, the PartyID attribute can be filled with the ID of the party. LocationID and InstallationPointID remain empty. If there is an aggregation relationship to the address of an InstallationPoint, the InstallationPointID attribute can be filled with the ID of the InstallationPoint. LocationID and PartyID remain empty.

In some implementations, there can be a DO LocationAddress 33036. The dependent object Address can include the data necessary to describe a physical or logical location. The Dependent Object is integrated into the CustomerInvoiceRequest business object by means of the LocationAddress prefix.

SalesAndServiceBusinessArea

In some implementations, SalesAndServiceBusinessArea can be the business or service specific area within an enterprise that is valid for an underlying sales or service business transaction document of this CustomerInvoiceRequest, such as, for example, sales organization, service organization, distribution channel.

The elements directly attached to the SalesAndServiceBusinessArea node can be defined by datatype CustomerInvoiceRequestSalesAndServiceBusinessAreaElements, which can be derived from datatype BusinessTransactionDocumentSalesAndServiceBusinessAreaElements. These elements can include: SalesOrganisationID, SalesGroupID, SalesOfficeID, DistributionChannelCode, DistributionChannelCode. SalesOrganisationID can be an identifier for the sales organization that is responsible for the underlying business transaction document. SalesOrganisationID may be based on GDT OrganisationalCentreID. SalesGroupID can be an identifier for the sales group that is responsible for the underlying business transaction document, and is optional. SalesGroupID may be based on GDT OrganisationalCentreID. SalesOfficeID can be an identifier for the sales office that is responsible for the underlying business transaction document, and is optional. SalesOfficeID may be based on GDT OrganisationalCentreID. DistributionChannelCode can be a coded representation of the distribution channel by which goods and services reach customers, and is optional. DistributionChannelCode may be based on GDT DistributionChannelCode. ServiceOrganisationID can be an identifier for the service organization that is responsible for the underlying business transaction document, and is optional. ServiceOrganisationID may be based on GDT OrganisationalCentreID. SalesOrganisationUUID can be an universal identifier, which is unique, for the sales organization. SalesOrganisationUUID may be based on GDT UUID. SalesGroupUUID can be an universal identifier, which may be unique, for the sales group. SalesGroupUUID may be based on GDT UUID. SalesOfficeUUID can be a universal identifier, which may be unique, for the sales office, and is optional. SalesOfficeUUID may be based on GDT UUID. ServiceOrganisationUUID can be an universal identifier, which may be unique, for the service organization, and is optional. ServiceOrganisationUUID may be based on GDT UUID.

There may be a number of Inbound Aggregation Relationships including: 1) from business object FunctionalUnit SalesOrganisation may be a cardinality relationship of c:cn. FunctionalUnit can be in the specialization SalesOrganisation. 2) SalesGroup may be a cardinality relationship of c:cn. FunctionalUnit can be in the specialization SalesGroup. 3) SalesOffice may be a cardinality relationship of c:cn. FunctionalUnit can be in the specialization SalesOffice. 4) ServiceOrganisation may be a cardinality relationship of c:cn. FunctionalUnit can be in the specialization ServiceOrganisation;

There may be an Integrity Condition if the node is not filled or evaluated if the underlying business transaction document of the CustomerInvoiceRequest is an OutboundDelivery.

DeliveryTerms

DeliveryTerms can be agreements that apply for the delivery of goods and services to be invoiced. The elements located directly at the node DeliveryTerms can be defined by the data type CustomerInvoiceRequestDeliveryTermsElements derived from data type BusinessTransactionDocumentDeliveryTermsElements. The element can be: Incoterms which is the conventional contract formulations for the delivery terms. Incoterms may be based on GDT Incoterms.

PricingTerms

PricingTerms can be agreements in the sales or service process, which are needed exclusively to determine the net value of the CustomerInvoiceRequest. The elements located at the node PricingTerms can be defined by the data type CustomerInvoiceRequestPricingTermsElements derived from data type BusinessTransactionDocumentPricingTermsElements. These elements can include: CurrencyCode, PriceDateTime, PricingProcedureCode.

In some implementations, CurrencyCode can be a coded representation of the currency in which the invoice is issued (invoice currency). CurrencyCode may be based on GDT CurrencyCode. PriceDateTime can be the date (and time) used to determine the price components for this CustomerInvoiceRequest, and is optional. PriceDateTime may be based on GDT LOCALNORMALISED_DateTime qualifier of Price. PricingProcedureCode can be a coded representation of the procedure how price components are supposed to be calculated in the CustomerInvoiceRequest, and is optional. PricingProcedureCode may be based on GDT PricingProcedureCode.

In some implementations, PriceAndTaxCalculation is the summary of the price and taxation components identified for the CustomerInvoiceRequest. The Dependent Object can be integrated into the CustomerInvoiceRequest business object by means of the PriceAndTaxCalculation prefix.

In some implementations, CashDiscountTerms is a conditions agreed between business partners regarding payment periods for goods delivered or services performed, including cash discounts granted for punctual payment. The Dependent Object can be integrated into the CustomerInvoiceRequest business object by means of the CashDiscountTerms prefix.

In some implementations, an AttachmentFolder is a collection of documents that are assigned to the CustomerInvoiceRequest. The Dependent Object can be integrated into the CustomerInvoiceRequest business object by means of the AttachmentFolder prefix In some implementations, a TextCollection is a set of all multilingual textual descriptions including formatting information for a CustomerInvoiceRequest. The Dependent Object can be integrated into the CustomerInvoiceRequest business object by means of the TextCollection prefix.

Item

In some implementations, an Item is a request to bill for goods and services that have been ordered or delivered, or the value to be invoiced or credited. It can contain details on elements such as the involved parties, locations, terms and conditions regarding delivery and payment, and other business documents to be taken into account during billing. It can also contain information on invoices to be created.

In some implementations, the elements located on the Item node are defined by the data type CustomerInvoiceRequestItemElements. These elements can include: UUID, BaseBusinessTransactionDocumentItemID, BaseBusinessTransactionDocumentItemUUID, BaseBusinessTransactionDocumentItemTypeCode, ProcessingTypeCode, ReceivablesPropertyMovementDirectionCode, Description, HierarchyRelationship, ParentItemID, TypeCode, ProposedInvoiceDate, ProposedCustomerInvoiceProcessingTypeCode, BaseInvoicingBlockingReasonCode, CancellationReasonCode, Quantity, QuantityTypeCode, Amount, ToBeInvoicedQuantity, ToBeInvoicedQuantityTypeCode, ToBeInvoicedAmount, NetAmount, GrossAmount, TaxAmount, NetWeightMeasure, NetWeightMeasureTypeCode, GrossWeightMeasure, GrossWeightMeasureTypeCode, VolumeMeasure, VolumeMeasureTypeCode, SystemAdministrativeData, HeaderConsistencyStatusCode, ConsistencyStatusCode, InvoicingBlockingStatusCode, InvoicingStatusCode, CancellationStatusCode, InvoicingFeasibilityStatusCode, BaseBusinessTransactionDocumentItemKey.

In some implementations, UUID can be internally assigned universally unique identifier of a CustomerInvoiceRequest item on which other business objects can define foreign keys. UUID may be based on GDT UUID. BaseBusinessTransactionDocumentItemID can be an identifier, which may be unique, for the item in the underlying business document that is identified using the BaseBusinessTransactionDocumentID in the CustomerInvoiceRequest node. BaseBusinessTransactionDocumentItemID may be based on GDT BusinessTransactionDocumentItemID Qualifier: Base. BaseBusinessTransactionDocumentItemUUID can be a universal identifier, which may be unique, for the item in the underlying business document that is identified using the BaseBusinessTransactionDocumentUUID in the CustomerInvoiceRequest node, and is optional. BaseBusinessTransactionDocumentItemUUID may be based on GDT UUID qualifier of BusinessTransactionDocumentItem. BaseBusinessTransactionDocumentItemTypeCode can be a coded representation of the type of item in the underlying business document, and is optional. BaseBusinessTransactionDocumentItemTypeCode may be based on GDT BusinessTransactionDocumentItemTypeCode qualifier of Base. ProcessingTypeCode can be a coded representation of the processing type for this CustomerInvoiceRequest item. ProcessingTypeCode may be based on GDT BusinessTransactionDocumentProcessingTypeCode. ReceivablesPropertyMovementDirectionCode can be a coded representation of whether a CustomerInvoice based on this Item would increase or decrease receivables. ReceivablesPropertyMovementDirectionCode may be based on GDT PropertyMovementDirectionCode qualifier of Receivables. Description can be the description of the item, and is optional. ReceivablesPropertyMovementDirectionCode may be based on GDT SHORT_Description. HierarchyRelationship may be based on GDT CustomerInvoiceHierarchyRelationship. ParentItemID can be the BaseID of the higher-level item in the item hierarchy of a CustomerInvoiceRequest, and is optional. ParentItemID may be based on GDT BusinessTransactionDocumentItemID. TypeCode can be a coded display for the relationship type for a lower-level item and a higher-level item. TypeCode may be based on GDT BusinessTransactionDocumentItemHierarchyRelationshipTypeCode.

In some implementations, ProposedInvoiceDate can be the proposal for the invoice date of CustomerInvoice to be created for this item of the CustomerInvoiceRequest, and is optional. ProposedInvoiceDate may be based on GDT Date qualifier of ProposedInvoice. ProposedCustomerInvoiceProcessingTypeCode can be the proposal for the processing type of a CustomerInvoice, and is optional. ProposedCustomerInvoiceProcessingTypeCode may be based on GDT BusinessTransactionDocumentProcessingTypeCode. BaseInvoicingBlockingReasonCode can be a coded representation of the reason why invoicing has been blocked by the underlying business document, and is optional. BaseInvoicingBlockingReasonCode may be based on GDT InvoicingBlockingReasonCode. CancellationReasonCode can be a coded representation of the reason why the Item has been cancelled, and is optional. CancellationReasonCode may be based on GDT CancellationReasonCode. Quantity can be the total quantity of goods or services to be invoiced, and is optional. Quantity may be based on GDT Quantity. QuantityTypeCode can be a coded representation of the type of the quantity, and is optional. QuantityTypeCode may be based on GDT QuantityTypeCode. Amount can be the total value to be invoiced, and is optional. Amount may be based on GDT Amount. ToBeInvoicedQuantity can be the quantity of goods or services still to be invoiced, and is optional. ToBeInvoicedQuantity may be based on GDT Quantity qualifier of ToBeInvoiced. ToBeInvoicedQuantityTypeCode can be a coded representation of the type of the quantity still to be invoiced, and is optional. ToBeInvoicedQuantityTypeCode may be based on GDT QuantityTypeCode. ToBeInvoicedAmount can be a value still to be invoiced, and is optional. ToBeInvoicedAmount may be based on GDT Amount qualifier of ToBeInvoiced. NetAmount can be the net value of invoice item, and is optional. NetAmount may be based on GDT Amount qualifier of Net. GrossAmount can be the gross value of request invoice item, and is optional. GrossAmount may be based on GDT Amount qualifier of Gross. TaxAmount can be the sum of all tax values accruing on this request item, and is optional. TaxAmount may be based on GDT Amount qualifier of Tax. NetWeightMeasure can be the net weight of goods to be invoiced, and is optional. NetWeightMeasure may be based on GDT Measure qualifier of NetWeight. NetWeightMeasureTypeCode can be a coded representation of the type of net weight measure, and is optional. NetWeightMeasureTypeCode may be based on GDT MeasureTypeCode qualifier of NetWeight. GrossWeightMeasure can be the gross weight of goods to be invoiced, and is optional. GrossWeightMeasure may be based on GDT Measure qualifier of GrossWeight. GrossWeightMeasureTypeCode can be a coded representation of the type of gross weight measure, and is optional. GrossWeightMeasureTypeCode may be based on GDT MeasureTypeCode qualifier of GrossWeight. VolumeMeasure can be a volume of goods to be invoiced, and is optional. VolumeMeasure may be based on GDT Measure qualifier of Volume. VolumeMeasureTypeCode can be a coded representation of the type of volume measure, and is optional. VolumeMeasureTypeCode may be based on GDT MeasureTypeCode qualifier of Volume. BaseBusinessTransactionDocumentItemKey can be a complete identification of an Item based on the identification of the underlying business transaction document, and is optional. BaseBusinessTransactionDocumentItemKey may be based on GDT CustomerInvoiceRequestItemBaseBusinessTransactionDocumentItemKey. BaseBusinessTransactionDocumentItemKey may also include BaseBusinessTransactionDocumentID. BaseBusinessTransactionDocumentID may be based on GDT BusinessTransactionDocumentID.

In some implementations, SystemAdministrativeData can be the administrative data stored by the system. This includes system user and any times changes that were made. SystemAdministrativeData may be based on GDT SystemAdministrativeData. SystemAdministrativeData may also include the following: HeaderConsistencyStatusCode, ConsistencyStatusCode, InvoicingBlockingStatusCode, InvoicingStatusCode, CancellationStatusCode, InvoicingFeasibilityStatusCode.

In some implementations, HeaderConsistencyStatusCode describes whether the node CustomerInvoiceRequest and all associated nodes except Item are consistent or not. HeaderConsistencyStatusCode may be based on GDT INCONSISTENTCONSISTENT_ConsistencyStatusCode. ConsistencyStatusCode can describe whether the node Item and all associated nodes are consistent or not. ConsistencyStatusCode may be based on GDT INCONSISTENTCONSISTENT_ConsistencyStatusCode. InvoicingBlockingStatusCode can describe if the underlying Business Transaction Document has requested to block the invoicing process for this item. InvoicingBlockingStatusCode may be based on GDT NOTBLOCKEDBLOCKED_BlockingStatusCode qualifier of Invoicing. InvoicingStatusCode can be a step in the lifecycle of this CustomerInvoiceRequest item with respect to the creation of CustomerInvoices. InvoicingStatusCode may be based on GDT InvoicingStatusCode Restricted values of 1, 2, 3. CancellationStatusCode can describe if the CustomerInvoiceRequest item has been cancelled. CancellationStatusCode may be based on GDT CancellationStatusCode Restricted values of 1, 2, 4. InvoicingFeasibilityStatusCode can be an aggregated status of all other status variables to derive if it is feasible to invoice the Item. InvoicingFeasibilityStatusCode may be based on GDT InvoicingFeasibilityStatusCode.

There may be a number of composition relationships to subordinate nodes including: 1) ItemBusinessProcessVariantType 33070 may be a cardinality relationship of 1:cn. 2) ItemParty 33030 may be a cardinality relationship of 1:cn. 3) ItemLocation 33038 may be a cardinality relationship of 1:cn. 4) ItemProduct 33024 may be a cardinality relationship of 1:c. 5) ItemDeliveryTerms 33046 may be a cardinality relationship of 1:c. 6) ItemPricingTerms 33050 may be a cardinality relationship of 1:c. 7) ItemCustomerInvoiceItem 33054 may be a cardinality relationship of 1:cn. 8) ItemBusinessTransactionDocumentReference 33058 may be a cardinality relationship of 1:cn. 9) Dependent Object AttachmentFolder 33062 may be a cardinality relationship of 1:c. 10) Dependent Object TextCollection 33066 may be a cardinality relationship of 1:c.

There may be a number of Inbound Aggregation Relationships from business object Identity node including: 1) CreationIdentity may be a cardinality relationship of 1:cn. CreationIdentity can be the identity of the user that created the CustomerInvoiceRequest item. 2) LastChangeIdentity may be a cardinality relationship of c:cn. LastChangeIdentity can be the identity of the user that last changed the CustomerInvoiceRequest item.

There may be a number of Associations for Navigation including: 1) BillToItemParty to node ItemParty may be a cardinality relationship of c:c. BillToItemParty can be an association to an ItemParty that occurs in the specialization BillToItemParty. 2) BillFromItemParty to node ItemParty may be a cardinality relationship of c:c. BillFromItemParty can be an association to an ItemParty that occurs in the specialization BillFromItemParty. 3) PayerItemParty to node ItemParty may be a cardinality relationship of c:c. PayerItemParty can be an association to an ItemParty that occurs in the specialization PayerItemParty. 4) BuyerItemParty to node ItemParty may be a cardinality relationship of c:c. BuyerItemParty can be an association to an ItemParty that occurs in the specialization BuyerItemParty. 5) SellerItemParty to node ItemParty may be a cardinality relationship of c:c. SellerItemParty can be an association to an ItemParty that occurs in the specialization SellerItemParty. 6) VendorItemParty to node ItemParty may be a cardinality relationship of c:c. VendorItemParty can be an association to an ItemParty that occurs in the specialization VendorItemParty. 7) ProductRecipientItemParty to node ItemParty may be a cardinality relationship of c:c. ProductRecipientItemParty can be an association to an ItemParty that occurs in the specialization ProductRecipientItemParty. 8) ShipFromItemLocation to node ItemLocation may be a cardinality relationship of c:c. ShipFromItemLocation can be an association to an ItemLocation that occurs in the specialization ShipFromItemLocation. 9) ShipToItemLocation to node ItemLocation may be a cardinality relationship of c:c. ShipToItemLocation can be an association to an ItemLocation that occurs in the specialization ShipToItemLocation. 10) ServicePointItemLocation to node ItemLocation may be a cardinality relationship of c:c. ServicePointItemLocation can be an association to an ItemLocation that occurs in the specialization ServicePointItemLocation. 11) ItemSalesOrderItemReference to node ItemBusinessTransactionDocumentReference may be a cardinality relationship of c:c. ItemSalesOrderItemReference can be an association to an ItemBusinessTransactionDocumentReference that occurs in the specialization ItemSalesOrderItemReference. 12) ItemServiceOrderItemReference to node ItemBusinessTransactionDocumentReference may be a cardinality relationship of c:c. ItemServiceOrderItemReference can be an association to an ItemBusinessTransactionDocumentReference that occurs in the specialization ItemServiceOrderItemReference. 13) ItemServiceContractItemReference to node ItemBusinessTransactionDocumentReference may be a cardinality relationship of c:c. ItemServiceContractItemReference can be an association to an ItemBusinessTransactionDocumentReference that occurs in the specialization ItemServiceContractItemReference. 14) ItemPurchaseOrderReference to node ItemBusinessTransactionDocumentReference may be a cardinality relationship of c:c. ItemPurchaseOrderReference can be an association to an ItemBusinessTransactionDocumentReference that occurs in the specialization ItemPurchaseOrderReference. 15) PriceAndTaxCalculationItem to DO PriceAndTaxCalculation or node Item may be a cardinality relationship of 1:c. PriceAndTaxCalculationItem can be the price and tax information assigned to the item. 16) PriceAndTaxCalculationItemProductTaxDetails to DO PriceAndTaxCalculation or node Item may be a cardinality relationship of 1:cn. PriceAndTaxCalculationItemProductTaxDetails can be the product tax details assigned to the item. 17) PriceAndTaxCalculationItemWithholdingTaxDetails to DO PriceAndTaxCalculation or node Item may be a cardinality relationship of 1:cn. PriceAndTaxCalculationItemWithholdingTaxDetails can be the withholding tax details assigned to the item. 18) ParentItem to node Item may be a cardinality relationship of 1:c. ParentItem can be the parent item in an item hierarchy.

In some implementations, the elements NetAmount, GrossAmount, and TaxAmount can describe the results of price determination and cannot be set explicitly. The currency in the elements NetAmount, GrossAmount, and TaxAmount can correspond with the value of the CurrencyCode element in the PricingTerms node.

TypeCode in HierarchyRelationship can be restricted to values 1 (bill of material) and 2 (item group). In some implementations, if a quantity or a measure is set, the corresponding quantity or measure type needs to be filled.

In some implementations, a default logic applies to the elements PlannedInvoicingDate and ProposedInvoiceDate. If they are not specified in the Item node, the corresponding value from the CustomerInvoiceRequest node can be used. If they are not specified in any of the nodes, the local system date can appear as the default value.

Enterprise-Service-Infrastructure actions can include CreateCustomerInvoices, BlockInvoicing, NotifyOfInvoiceCancellation, and SubmitForCancellation. CreateCustomerInvoices (service and application management action) can create one or more CustomerInvoices out of a number of Items in the CustomerInvoiceRequest based on an internal algorithm. CreateCustomerInvoices can have preconditions including: CustomerInvoiceRequest and Item are consistent and the Item is not cancelled, not blocked and not yet fully invoiced, that is, it is feasible to invoice the Item. CreateCustomerInvoices can change the status variable Invoicing to 'Invoiced'. Changes within the object can include a new instance of node ItemCustomerInvoiceItem is created to store the reference to a newly created Item in a CustomerInvoice. Changes to other objects can include a new CustomerInvoice is created or an Item is added to a CustomerInvoice currently created out of this action. The action elements can be defined by the data type CustomerInvoiceRequestItemCreateCustomerInvoicesActionElements. The elements can include: 1) CustomerInvoiceDate can be optional, have a GDT of Date, and a qualifier of CustomerInvoice. 2) CustomerInvoicingRunExecutionUUID can be optional, and have a GDT of UUID. 3) AutomaticReleaseAllowedIndicator can have a GDT of Indicator, and a qualifier of Allowed. 4) SalesOrderBasedCustomerInvoiceSeparationRequiredIndicator can have a GDT of Indicator, and a qualifier of Required. 5) ServiceOrderBasedCustomerInvoiceSeparationRequiredIndicator can have a GDT of Indicator, and a qualifier of Required. 6) ServiceContractBasedCustomerInvoiceSeparationRequiredIndicator can have a GDT of Indicator, and a qualifier of Required. 7) OutboundDeliveryBasedCustomerInvoiceSeparationRequiredIndicator can have a GDT of Indicator, and a qualifier of Required. 8) ProvisionDateBasedCustomerInvoiceSeparationRequiredIndicator can have a GDT of Indicator, and a qualifier of Required.

In some implementations, BlockInvoicing (service and application management action) blocks the Item to prevent the creation of a CustomerInvoice. Changes to the status may include status variable InvoicingBlocking being set to 'Blocked'. The action can be triggered from the Inbound Process Agent based on the element SettlementBlockedIndicator in message type CustomerInvoiceRequestRequest. UnblockInvoicing (service and application management action) can revoke the blocking of the Item. Changes to the status can include status variable InvoicingBlocking being set to 'Not Blocked'. The action can be triggered from the Inbound Process Agent based on the element SettlementBlockedIndicator in message type CustomerInvoiceRequestRequest. NotifyOfInvoiceCreation (service and application management action) can notify the Item that a CustomerInvoice has been created for this Item. Preconditions can include the Item being partially or not invoiced. Changes to the status may include status variable Invoicing being set to 'Partly Invoiced' or 'Invoiced' depending on the ToBeInvoicedQuantity and ToBeInvoicedAmount. Changes to the object can include a new instance of node ItemCustomerInvoiceItem being created to store the reference to an Item in a CustomerInvoice. NotifyOfInvoiceCreation action can be called from the invoicing business logic implemented in business object CustomerInvoice. The action elements can be defined by the data type CustomerInvoiceRequestItemNotifyOfInvoiceCancellationActionElements. The elements can include: 1) CustomerInvoiceItemUUID may have a GDT of UUID. 2) InvoicedQuantity may be optional, have a GDT of Quantity, and a qualifier of Invoiced. 3) InvoicedQuantityTypeCode may be optional, have a GDT of QuantityTypeCode, and a qualifier of Invoiced. 4) InvoicedAmount may be optional, have a GDT of Amount, and a qualifier of Invoiced.

In some implementations, NotifyOfInvoiceCancellation (service and application management action) notifies the Item that a CustomerInvoice has been cancelled which has been created for this Item. Preconditions can include the Item being partially or fully invoiced. Changes to the status can include status variable InvoicingStatus being set to 'Partly Invoiced' or 'Not Invoiced' depending on the ToBeInvoicedQuantity and ToBeInvoicedAmount. Changes to the object can include a new instance of node ItemCustomerInvoiceItem being created to store the reference to an Item in a CustomerInvoice which cancels a CustomerInvoice for this Item. NotifyOfInvoiceCancellation action can be called from the invoicing business logic implemented in business object CustomerInvoice. The action elements can be defined by the data type: CustomerInvoiceRequestItemNotifyOfInvoiceCancellationActionElements. The elements can include: 1) CustomerInvoiceItemUUID can and have a GDT of UUID. 2) InvoicedQuantity can be optional, have a GDT of Quantity, and a qualifier of Invoiced. 3) InvoicedQuantityTypeCode can be optional, have a GDT of QuantityTypeCode, and a qualifier of Invoiced. 4) InvoicedAmount can be optional, have a GDT of Amount, and a qualifier of Invoiced.

In some implementations, SubmitForCancellation (service and application management action)

marks the item of the CustomerInvoiceRequest for cancellation such that no CustomerInvoice will be created or an existing CustomerInvoice either needs to be reversed or credited. Changes to the status can include if the Item is not invoiced the status variable Cancellation being set to 'Cancelled' and if the Item has been invoiced the status variable Cancellation being set to 'In Cancellation'. RevokeCancellation (service and application management action) can revoke the cancellation of the Item to allow the creation of CustomerInvoices again. Changes to the status can include the status variable Cancellation being set to 'Not Cancelled'. ConcludeCancellation (service and application management action) can conclude the cancellation of the Item which has been submitted for cancellation to finish off the cancellation process. Changes to the status can include the status variable Cancellation being set to 'Cancelled'. CheckConsistency (service and application management action) can check whether node Item and all nodes directly attached are consistent.

In some implementations, QueryByInvoicingFeasibleStatusAndReferenceAndPartyAndDate can return those Items which contain values in the given elements of the CustomerInvoiceRequest nodes that correspond with the query elements and where the status InvoicingFeasible has the value 'Feasible'. The Query elements can be defined by the type Data Type: CustomerInvoiceRequestItemInvoicing FeasibleStatusAndReferenceAndPartyAndDateQuery Elements. CustomerInvoiceRequestItemInvoicingFeasible StatusAndReferenceAndPartyAndDateQueryElements can include: 1) PredecessorBusinessTransactionDocumentID may be optional. PredecessorBusinessTransactionDocumentID can select CustomerInvoiceRequests based on business transaction documents which are directly relevant for invoicing or deliver invoicing relevant data as part of the process chain (elements BaseBusinessTransactionDocumentID or ItemBusinessTransactionDocumentReference reference ID). PredecessorBusinessTransactionDocumentID can have a GDT of BusinessTransactionDocumentID. 2) PredecessorBusinessTransactionDocumentTypeCode may be optional. PredecessorBusinessTransactionDocumentTypeCode can select CustomerInvoiceRequests based on the type of business transaction documents which are directly relevant for invoicing or deliver invoicing relevant data as part of the process chain (BaseBusinessTransactionDocumentTypeCode or ItemBusinessTransactionDocumentReference reference TypeCode). Relevant business transaction documents are SalesOrder, ServiceOrder, ServiceRequest, ServiceConfirmation, ServiceContract, CustomerComplaint and OutboundDelivery. PredecessorBusinessTransactionDocumentTypeCode can have a GDT of BusinessTransactionDocumentTypeCode. 3) ItemProposedInvoiceDate may be optional, and have a GDT of Date. 4) ItemProposedCustomerInvoiceProcessingTypeCode may be optional, and have a GDT of BusinessTransactionDocumentProcessingTypeCode. 5) PartyBuyerPartyID may be optional. PartyBuyerPartyID can select Items where this party is involved in role BuyerParty (Party PartyID or ItemParty PartyID). PartyBuyerPartyID can have a GDT of PartyID. 6) PartySellerPartyID may be optional. PartySellerPartyID can select Items where this party is involved in role SellerParty (Party PartyID or ItemParty PartyID). PartySellerPartyID can have a GDT of PartyID.

In some implementations, ItemBusinessProcessVariantType defines the character of a business process variant of an Item in the CustomerInvoiceRequest. It can represent a typical way of processing of an Item within the process component from a business point of view. The elements located at the node ItemBusinessProcessVariantType can be defined by the data type CustomerInvoiceRequestItemBusinessProcessVariantTypeElements, derived from BusinessProcessVariantTypeElements. These elements can include: BusinessProcessVariantTypeCode, and MainIndicator. BusinessProcessVariantTypeCode can be a coded representation of a business process variant type of a CustomerInvoiceRequest. BusinessProcessVariantTypeCode may be based on GDT BusinessProcessVariantTypeCode. MainIndicator can specify whether the current BusinessProcessVariantTypeCode is the main one or not. MainIndicator may be based on GDT Indicator Qualifier of Main. Node ItemBusinessProcessVariantType can hold additional BusinessProcessVariantTypes only, that is, MainIndicator needs to be 'false' in all cases. Allowed value for BusinessProcessVariantTypeCode can include: 4 (Customer Invoice Processing—Triggered by Outb. Delivery based on Sales Order)

ItemParty

In some implementations, An ItemParty is a natural or legal person, organization, organizational unit or group that is involved in a CustomerInvoiceRequest item in a PartyRole. A PartyRole can specify which rights and obligations the Party has regarding the CustomerInvoiceRequest and the processes that belong to it. A ItemParty may keep a reference to a business partner or one of its specializations, for example, Customer, Supplier, Employee. A ItemParty can Keep a reference to one of the following specializations of an organizational units: Company, CostCentre, ReportingLineUnit, FunctionalUnit. An ItemParty can occur in the following disjunct specializations: 1) BillToItemParty, a party (Customer) that receives the invoice for goods or services. 2) BillFromItemParty, a party (Company) that carries out the billing process. 3) PayerItemParty, a party (Customer) that is requested to pay the payables from the delivery of goods or the provision of services or that is the recipient of a credit memo. 4) BuyerItemParty, a party (Customer) that purchases a good or a service. 5) SellerItemParty, a party (Company) that sells a good or a service. 6) ProductRecipientItemParty, a party (Customer) that receives a good or a service. 7) VendorItemParty, a party (Company, Supplier) that delivers a good or provides a service.

In some implementations, the elements located on the ItemParty node are defined by the data type CustomerInvoiceRequestItemPartyElements, which is derived from the data type BusinessTransactionDocumentPartyElements. These elements can include: PartyID, PartyUUID, PartyTypeCode, RoleCategoryCode, RoleCode, AddressReference, AddressHostUUID, AddressHostTypeCode, MainIndicator.

PartyID can be an unique identifier for a party. PartyID may be based on GDT PartyID. PartyUUID can be a universal identifier, which may unique, for referencing a business partner or organizational unit. PartyUUID may be based on GDT UUID. PartyTypeCode can be a coded representation of the type of Business Object representing the Party. PartyTypeCode may be based on GDT BusinessObjectTypeCode. RoleCategoryCode can be a coded representation of a grouping of partner roles by process-controlling criteria. RoleCategoryCode may be based on GDT PartyRoleCategoryCode. RoleCode can be a coded representation of a partner role. RoleCode may be based on GDT PartyRoleCode. AddressReference can be a reference to the address of the Party. AddressReference may be based on GDT PartyAddressReference. AddressHostUUID can be an identifier, which may be unique, for the address of the business partner, the organizational unit, or their specializations. AddressHostUUID may be based on GDT UUID Qualifier of AddressHost. AddressHostTypeCode can be a coded representation of the type of address of the Party in the CustomerInvoiceRequest, and is optional. AddressHostTypeCode may be based on GDT AddressHostTypeCode. MainIndicator can be an indicator whether a Party has the predominant position towards other parties of the same role. MainIndicator may be based on GDT Indicator Qualifier of Main.

There may be a number of composition relationships to subordinate nodes including: 1) Dependent Object Address may be a cardinality relationship of 1:c. 2) from business object Party can have an Inbound Aggregation Relationship cardinality relationship of c:cn. Party can be a customer to whom the invoice will be sent, who is requested to pay for the goods and services to be invoiced or is otherwise involved in the sales and service processes that caused the CustomerInvoiceRequest item or a vendor that was involved in the sales and service processes on which the CustomerInvoiceRequest item is based or company for which the receivables or liabilities described by this request arose or which is responsible for the invoicing process. 3) to business object UsedAddress can have an Associations for Navigation cardinality relationship of cn:c. UsedAddress can be master data or document specific address used for a ItemParty. It can be possible to determine which of the two applies by means of the AddressHostTypeCode element. The instance of the TO UsedAddress represents this address. In the former case the node ID of the node in the master data object can be determined via PartyTypeCode, AddressHostUUID and AddressHostTypeCode elements. In case changes to the TO UsedAddress take place, the master data address can be copied by the TO UsedAddress, the changes take place to the copy, and a corresponding DO Address is created at the ItemParty via the ItemPartyAddress composition relationship. In the latter case the TO UsedAddress can represent the DO Address used at the ItemParty via the ItemPartyAddress composition relationship.

In some implementations, if the PartyUUID is specified, the PartyTypeCode can also be present. The same can be true for combination AddressHostUUID and AddressHostTypeCode. There can be at most one Party with MainIndicator 'true' per distinct value of element RoleCode. Per PartyRoleCode node ItemParty can describe parties which are not available in node Party or which are different from those.

In some implementations, there can be a DO ItemPartyAddress 33032. The dependent object Address can include the data necessary to describe the postal or communication address of the party. The Dependent Object can be integrated into the CustomerInvoiceRequest business object by means of the ItemPartyAddress prefix.

ItemLocation

In some implementations, ItemLocation can be a physical or logical location that is involved in an Item of a CustomerInvoiceRequest in a LocationRole. A physical place can be determined using spatial coordinates (for example an address containing the street and house number). A logical place can not be determined using spatial coordinates (for example a PO box or an email address). It may not be necessary to know the physical location of a logical location.

In some implementations, ItemLocation can include: a reference to the Business Object Location, or a reference to the address of the Transformed Object Party (representative of a business partner and an organizational unit), or a reference to the address of the Business Object InstallationPoint.

ItemLocation can occur in the following disjointed specializations: ShipFromItemLocation, which can be an ItemLocation from which goods were/will be delivered; ShipToItemLocation can be an ItemLocation to which goods were/will be delivered; ServicePointItemLocation which is an ItemLocation where a service has been or will be performed.

The elements located on the ItemLocation node are defined by the data type CustomerInvoiceRequestItemLocationElements, which can be derived from the data type BusinessTransactionDocumentItemLocationElements.

These elements can include: LocationID, LocationUUID, AddressReference, AddressHostUUID, AddressHostType- Code, BusinessObjectTypeCode, PartyID, InstallationPointID, RoleCode, and RoleCategoryCode.

LocationID can be an identifier, which can be unique, for a location, and is optional. Location may be based on GDT LocationID. LocationUUID can be an universal identifier, which may be unique for referencing a BO Location, and is optional. LocationUUID may be based on GDT UUID. AddressReference is a reference to the address of the ItemLocation, and is optional. AddressReference may be based on GDT LocationAddressReference. AddressHostUUID can be an identifier, which may be unique, for the address of the business partner, the organizational unit, or their specializations, and is optional. AddressHostUUID may be based on GDT UUID Qualifier of AddressHost. AddressHostTypeCode can be a coded representation of the type of address of the Party in the CustomerInvoiceRequest, and is optional. AddressHostTypeCode may be based on GDT AddressHostTypeCode. BusinessObjectTypeCode can be a coded representation of the type of business object that includes the referenced address, and is optional. BusinessObjectTypeCode may be based on GDT BusinessObjectTypeCode. PartyID can be an identifier for a Party (a representative of a business partner or an organizational unit) that includes the referenced address, and is optional. PartyID may be based on GDT PartyID. InstallationPointID can be an identifier of an InstallationPoint that includes the referenced address, and is optional. InstallationPointID may be based on GDT InstallationPointID. RoleCode can be a coded representation of a location role, and is optional. RoleCode may be based on GDT LocationRoleCode. RoleCategoryCode can be a coded representation of a grouping of location roles by process-controlling criteria, and is optional. RoleCategoryCode may be based on GDT LocationRoleCategoryCode.

There may be a number of composition relationships to subordinate nodes including: 1) Dependent Object Address may be a cardinality relationship of 1:c. 2) from the business object Location can have Inbound Aggregation Relationships cardinality relationship of c:cn. Location can be a location from which or to which invoiced goods were/will be delivered. 3) from business object Party or node AddressInformation PartyAddressInformation can have Inbound Aggregation Relationships cardinality relationship of c:cn. PartyAddressInformation can be address information of a representative of a business partner or organizational centre corresponding to the ItemLocation. 4) from business object InstallationPoint or node AddressInformation InstallationPointAddressInformation can have Inbound Aggregation Relationships cardinality relationship of c:cn. InstallationPointAddressInformation can be address information of an installation point corresponding to the ItemLocation. 5) to (transformed) business object UsedAddress can have an Associations for Navigation cardinality relationship of cn:c. UsedAddress can be master data or document specific address used for a ItemLocation. It can be possible to determine which of the two applies by means of the AddressHostTypeCode element. The instance of the TO UsedAddress can represent this address. In the former case the node ID of the node in the master data object can be determined via BusinessObjectTypeCode, AddressHostUUID and AddressHostTypeCode elements. In case changes to the TO UsedAddress take place, the master data address can be copied by the TO UsedAddress, the changes take place to the copy, and a corresponding DO Address is created at the ItemLocation via the ItemLocationAddress composition relationship. In the latter case the TO UsedAddress can represent the DO Address used at the ItemLocation via the ItemLocationAddress composition relationship.

There may only be one aggregation or one composition relationship to the Dependent Object Address. If an aggregation relationship to the Business Object Location exists, the LocationID element can be filled with the ID of the Business Object Location. Element PartyID can remain empty. If an aggregation relationship to the address of a party (representative of a business partner or OrganizationalCentre) exists, the PartyID attribute can be filled with the ID of the party. LocationID and InstallationPointID can remain empty. If there is an aggregation relationship to the address of an InstallationPoint, the InstallationPointID attribute can be filled with the ID of the InstallationPoint. LocationID and PartyID can remain empty.

In some implementations, there can be a DO ItemLocationAddress 33040. The dependent object Address can include the data necessary to describe a physical or logical location. The Dependent Object can be integrated into the CustomerInvoiceRequest business object by means of the ItemLocationAddress prefix.

ItemProduct

ItemProduct can identify, describe, and classify a product in an item of the CustomerInvoiceRequest. The elements located at the node ItemProduct can be defined by the data type CustomerInvoiceRequestItemProductElements derived from data type BusinessTransactionDocumentProductElements. Elements may include: ProductUUID, ProductID, ProductBuyerID, ProductBuyerID, ProductTypeCode, and CashDiscountDeductibleIndicator.

ProductUUID can be a universal identification, which may be unique of a product, and is optional. ProductUUID may be based on GDT UUID. ProductID can be the identification of the product, and is optional. ProductId may be based on GDT ProductID. ProductBuyerID can be an identifier of the product assigned by the buyer, and is optional. ProductBuyerID may be based on GDT ProductPartyID. ProductTypeCode can be a coded representation of the technical product type, and is optional. ProductTypeCode may be based on GDT ProductTypeCode. CashDiscountDeductibleIndicator can be an indicator that cash discount may be deducted for this product. CashDiscountDeductibleIndicator may be based on GDT Indicator Qualifier of CashDiscountDeductable.

There may be a number of Inbound aggregation relationships including: 1) from Business Object Material may be a cardinality relationship of c:cn. Material can be a material to be invoiced. 2) from Business Object ServiceProduct may be a cardinality relationship of c:cn. ServiceProduct can be a service to be invoiced.

ItemDeliveryTerms can be agreements that apply for the delivery of goods and services to be invoiced. The elements located at the node ItemDeliveryTerms can be defined by the data type CustomerInvoiceRequestItemDeliveryTermsElements derived from data type BusinessTransactionDocumentDeliveryTermsElements. The elements can include Incoterms. Incoterms can be the conventional contract formulations for the delivery terms. Incoterms may be based on GDT Incoterms. In some implementations, if no ItemProduct node exists for an item in the CustomerInvoiceRequest or if the ProductTypeCode element in the ItemProduct node does not refer to the value 1, ItemDeliveryTerms may not be specified or the node will be ignored. If no ItemDeliveryTerms are specified for an item, the values in the element of the DeliveryTerms node can be evaluated.

ItemPricingTerms can be agreements in the sales or service process that are exclusively required to determine the value of the CustomerInvoiceRequest item. The elements located at the node ItemPricingTerms can be defined by the data type CustomerInvoiceRequestItemPricingTermsElements derived from data type BusinessTransactionDocument-PricingTermsElements. These elements can include: PriceDateTime, PriceRecalculationTypeCode. PriceDateTime can be the date (and/or time) used to determine the price components for this item of the CustomerInvoiceRequest, and is optional. PriceDateTime may be based on GDT LOCAL-NORMALISED_DateTime Qualifier of Price. PriceRecalculationTypeCode can be the coded representation of the type of price re-calculation which is executed when the CustomerInvoiceRequest item is being invoiced, and is optional. PriceRecalculationTypeCode is GDT PriceRecalculationTypeCode.

ItemCustomerInvoiceItem

ItemCustomerInvoiceItem can specify the invoice item and quantity/value used to bill a CustomerInvoiceRequest item. The elements located at the node ItemCustomerInvoiceItem can be defined by the data type CustomerInvoiceRequest-ItemCustomerInvoiceItemElements. These elements can include: UUID, CustomerInvoiceID, ID, InvoicedQuantity, InvoicedQuantityTypeCode, InvoicedAmount, ReceivablesPropertyMovementDirectionCode, In some implementations, UUID can be a universal identifier, which may be unique, of a CustomerInvoice item which has been created for this request item. CustomerInvoiceID can be an identifier, which may be unique, for the CustomerInvoice that contains the referenced Item, and is optional. CustomerInvoiceID may be based on GDT BusinessTransactionDocumentID. ID can be an identifier, which can be unique, for an item in the previously referenced CustomerInvoice. ID may be based on GDT BusinessTransactionDocumentItemID. InvoicedQuantity can be the quantity used to invoice the referenced item in the CustomerInvoice, and is optional. InvoicedQuantity may be based on GDT Quantity Qualifier: Invoiced. InvoicedQuantityTypeCode can be a coded representation of the type of the invoiced quantity, and is optional. InvoicedQuantityTypeCode may be based on GDT QuantityTypeCode Qualifier of Invoiced. InvoicedAmount can be a value used to invoice the referenced item in the CustomerInvoice, and is optional. InvoicedAmount may be based on GDT Amount Qualifier of Invoiced. ReceivablesPropertyMovementDirectionCode can be a coded representation of the direction of the receivables change quantified by element InvoicedAmount, and is optional. ReceivablesPropertyMovementDirectionCode may be based on GDT PropertyMovementDirectionCode Qualifier of Receivables.

There may be a number of Incoming Aggregation Relationships including: 1) from business object CustomerInvoice may be a cardinality relationship of 1:cn. CustomerInvoice can be an invoice item created for the CustomerInvoiceRequest item.

In some implementations, if the InvoicedQuantity element is not specified, the InvoicedAmount can be specified. If InvoicedAmount is specified, ReceivablesPropertyMovementDirectionCode can be specified.

ItemBusinessTransactionDocumentReference

In some implementations, ItemBusinessTransactionDocumentReference refers to a business document item that is relevant for billing in the sales or service process. An ItemBusinessTransactionDocumentReference can occur in the following disjointed specializations: ItemSalesOrderItemReference, ItemServiceOrderItemReference, ItemServiceContractItemReference, ItemPurchaseOrderReference.

ItemSalesOrderItemReference can be a reference to a SalesOrder item which has been the basis for a business transaction document to be invoiced. ItemServiceOrderItemReference can be a reference to a ServiceOrder item which has been the basis for a business transaction document to be invoiced. ItemServiceContractItemReference can be a reference to a ServiceContract item which has been the basis for a business transaction document to be invoiced. ItemPurchaseOrderReference can be a reference to a PurchaseOrder which has been the basis for a business transaction document to be invoiced.

The elements located at the node ItemBusinessTransactionDocumentReference can be defined by the data type CustomerInvoiceRequestItemBusinessTransactionDocumentReferenceElements derived from data type BusinessTransactionDocumentReferenceElements. The elements may include: BusinessTransactionDocumentReference can be an identification, which may be unique, of a referenced business document (item) related to this CustomerInvoiceRequest item. BusinessTransactionDocumentReference may be based on GDT BusinessTransactionDocumentReference.

There may be a number of Inbound association relationships including: 1) from business object SalesOrder SalesOrderItemReference may be a cardinality relationship of c:cn. SalesOrderItemReference can be a sales order item for which the invoice item was created. 2) from business object ServiceOrder ServiceOrderItemReference may be a cardinality relationship of c:cn. ServiceOrderItemReference can be a service order item for which the invoice item was created. 3) from business object PurchaseOrder PurchaseOrderReference may be a cardinality relationship of c:cn. PurchaseOrderReference can be a purchase order or purchase order item on which the invoiced sales process is based. 4) from business object ServiceContract ServiceContractItemReference may be a cardinality relationship of c:cn. ServiceContractItemReference can be a service contract item for which the invoice item was created.

For the Reference element, ItemID may be specified in GDT: BusinessTransactionDocumentReference except for an PurchaseOrderReference. The references to business documents on which the CustomerInvoiceRequest is based may not be specified in the ItemBusinessTransactionDocumentReference, as this information may already exists in the form of the BaseBusinessTransactionDocumentID and BaseBusinessTransactionDocumentItemID elements of the CustomerInvoiceRequest and Item nodes.

There can be a DO ItemAttachmentFolder. AttachmentFolder can be a collection of documents that are assigned to the CustomerInvoiceRequest item. The Dependent Object can be integrated into the CustomerInvoiceRequest business object by means of the ItemAttachmentFolder prefix There can be a DO ItemTextCollection. A TextCollection can be a set of all multilingual textual descriptions including formatting information for a CustomerInvoiceRequest item. The Dependent Object can be integrated into the CustomerInvoiceRequest business object by means of the ItemTextCollection prefix.

Business Object CustomerInvoiceRequest

A business object CustomerInvoiceRequest can be a request to create one or several CustomerInvoices, or take account of the data for the underlying business document when creating a CustomerInvoice. The Business Object CustomerInvoiceRequest can be part of the Process Component Customer Invoice Processing, and in turn a component of Deployment Unit Customer Invoicing. In some implementations, a CustomerInvoiceRequest is made up of two key structures: The CustomerInvoiceRequest with dependent data such as the parties involved, status, and references, which are valid for the entire document, and The CustomerInvoiceRequest items with item information and the dependent data such as product information, the parties involved, status, and references.

CustomerInvoiceRequest is represented by the node CustomerInvoiceRequest 33020.

Service Interface Request Invoicing In may have the technical name: CustomerInvoiceProcessingRequestInvoicingIn.

In some implementations, the Request Invoicing In service interface is part of the following process integration models: Sales Order Processing_Customer Invoice Processing, Service Order Processing_Customer Invoice Processing, Service Confirmation Processing_Customer Invoice Processing, Service Request Processing_Customer Invoice Processing, Service Contract Processing_Customer Invoice Processing, Customer Return Processing_Customer Invoice Processing, Outbound Delivery Processing_Customer Invoice Processing, Supplier Invoice Processing_Customer Invoice Processing.

The Request Invoicing In service interface can group the operations for requesting the settlement of business transactions related to goods and services via CustomerInvoices.

MaintainCustomerInvoiceRequest may have the technical name: CustomerInvoiceProcessingRequestInvoicingIn. MaintainCustomerInvoiceRequest.

The MaintainCustomerInvoiceRequest operation can create or change CustomerInvoiceRequest business objects in order request invoicing for a business document. The operation can be based on the CustomerInvoiceRequestRequest message type (MDT: CustomerInvoiceRequestMessage) that is derived from the CustomerInvoiceRequest business object.

Node Structure of Business Object CustomerInvoiceRequest

A node structure of business object CustomerInvoiceRequest can include a request to create one or more customer invoices for the underlying business document, or take the data into account when creating a CustomerInvoice. The CustomerInvoiceRequest can contain identifying characteristics, and includes parties, locations, and details relevant to billing this business transaction.

In some implementations, the elements directly located on the CustomerInvoiceRequest node are defined by the data type CustomerInvoiceRequestElements. These elements are: UUID, BaseBusinessTransactionDocumentID, BaseBusinessTransactionDocumentUUID, BaseBusinessTransactionDocumentTypeCode, ReceivablesPropertyMovementDirectionCode, ProposedInvoiceDate, ProposedCustomerInvoiceProcessingTypeCode, TotalNetAmount, TotalGrossAmount, TotalTaxAmount, SystemAdministrativeData, ItemListProcessingOverviewStatusCode, Status.

In some implementations, UUID internally assigned universally unique identifier of a CustomerInvoiceRequest on which other business objects can define foreign keys. UUID may be based on GDT UUID. BaseBusinessTransactionDocumentID can be an identifier, which may be unique, for a business document that is used as a basis for a CustomerInvoiceRequest. BaseBusinessTransactionDocumentID may be based on GDT BusinessTransactionDocumentID Qualifier: Base. BaseBusinessTransactionDocumentUUID can be a universal identifier, which may be unique, for a business document that is used as a basis for a CustomerInvoiceRequest, and is optional. BaseBusinessTransactionDocumentUUID may be based on GDT UUID Qualifier: BusinessTransactionDocument. BaseBusinessTransactionDocumentTypeCode mandatory can be a coded representation of the business document type used as a basis for a CustomerInvoiceRequest. BaseBusinessTransactionDocumentTypeCode may be based on GDT BusinessTransactionDocumentTypeCode Qualifier: Base Restricted Values: SalesOrder, ServiceConformation, ServiceContract, ServiceOrder, ServiceRequest, OutboundDelivery, CustomerReturn. ReceivablesPropertyMovementDirectionCode can be a coded representation of whether a CustomerInvoice based on this request would increases or decreases receivables. ReceivablesPropertyMovementDirectionCode may be based on GDT PropertyMovementDirectionCode Qualifier: Receivables. ProposedInvoiceDate can be a proposal for the invoice date of CustomerInvoice to be created for this CustomerInvoiceRequest, and is optional. ProposedInvoiceDate may be based on GDT Date Qualifier: ProposedInvoice. ProposedCustomerInvoiceProcessingTypeCode is the aggregation of proposals for the processing type of a CustomerInvoice of all Items in the CustomerInvoiceRequest, and is optional. ProposedCustomerInvoiceProcessingTypeCode may be based on GDT BusinessTransactionDocumentProcessingTypeCode. TotalNetAmount can be the net value of CustomerInvoiceRequest, and is optional. TotalNetAmount may be based on GDT Amount Qualifier: TotalNet. TotalGrossAmount is the gross value of CustomerInvoiceRequest, and is optional. TotalGrossAmount may be based on GDT Amount Qualifier: TotalGross.

In some implementations, TotalTaxAmount is the sum of all tax values accruing on this CustomerInvoiceRequest, and is optional. TotalTaxAmount may be based on GDT Amount Qualifier: TotalTax. SystemAdministrativeData can be administrative data recorded by the system, and is optional. The SystemAdministrativeData can include system user and times changes are made. SystemAdministrativeData may be based on GDT SystemAdministrativeData. ItemListProcessingOverviewStatusCode can be the coded representation of the overview status of the process-relevant aspects of all items of the CustomerInvoiceRequest derived from all status variables in element Status. ItemListProcessingOverviewStatusCode may be based on GDT CustomerInvoiceRequestItemListProcessingOverviewStatusCode. Status is the current step in the life cycle of CustomerInvoiceRequest. Status may be based on GDT CustomerInvoiceRequestStatus. ItemListInvoicingBlockingStatusCode is the aggregated status of BlockingStatus of all items of the CustomerInvoiceRequest. ItemListInvoicingBlockingStatusCode may be based on GDT BlockingStatusCode. ItemListInvoicingFeasibilityStatusCode can be the aggregated status of InvoicingFeasibilityStatus of all items of the CustomerInvoiceRequest. ItemListInvoicingFeasibilityStatusCode may be based on GDT FeasibilityStatusCode. ItemListCancellationStatusCode can be the aggregated status of CancellationStatus of all items of the CustomerInvoiceRequest. ItemListCancellationStatusCode may be based on GDT CancellationStatusCode Restricted Values: 1, 4, 5. In some implementations, ConsistencyStatusCode describes whether the node CustomerInvoiceRequest and all associated nodes except Item are consistent or not. ConsistencyStatusCode may be based on GDT INCONSISTENTCONSISTENT_ConsistencyStatusCode. ItemListConsistencyStatusCode can be the aggregated status of ConsistencyStatus of all items of the CustomerInvoiceRequest. ItemListConsistencyStatusCode may be based on GDT INCONSISTENTCONSISTENT_ConsistencyStatusCode.

In some implementations the following composition relationships to subordinate nodes exist: BusinessProcessVariantType 33068 has a cardinality of 1:n, Party 33026 has a cardinality of 1:cn, Location 33034 has a cardinality of 1:cn, SalesAndServiceBusinessArea 33042 has a cardinality of 1:c, DeliveryTerms 33044 has a cardinality of 1:c, PricingTerms 33048 has a cardinality of 1:1, Dependent Object PriceAndTaxCalculation 33052 has a cardinality of 1:c, Dependent Object CashDiscountTerms 33056 has a cardinality of 1:c, Dependent Object AttachmentFolder 33060 has a cardinality of 1:c, Dependent Object TextCollection 33064 has a cardinality of 1:c, Item 33022 has a cardinality of 1:cn.

There may be a number of Inbound Aggregation Relationships including: 1) from business object Identity CreationIdentity may be a cardinality relationship of 1:cn. The CreationIdentity can be the identity of the user that created the CustomerInvoiceRequest. 2) from business object Identity LastChangeIdentity may be a cardinality of c:cn. The LastChangeIdentity can be the identity of the user that last changed the CustomerInvoiceRequest. 3) to node Party BillToParty may be the cardinality relationship of c:c. The BillToParty can be an association to a Party that occurs in the specialization BillToParty. 4) to node Party BillFromParty may be the cardinality relationship of c:c. The BillFromParty can be an association to a Party that occurs in the specialization BillFromParty. 5) to node Party PayerParty may be cardinality relationship of c:c. The PayerParty can be an association to a Party that occurs in the specialization PayerParty. 6) to node Party BuyerParty may be cardinality relationship of c:c. The BuyerParty can be an association to a Party that occurs in the specialization BuyerParty. 7) to node Party SellerParty may be cardinality relationship of c:c. The SellerParty can be an association to a Party that occurs in the specialization SellerParty. 8) to node Party Vendor Party may be cardinality relationship of c:c. The Vendor Party can be an association to a Party that occurs in the specialization Vendor Party. 9) to node Party ProductRecipientParty may be cardinality relationship of c:c. The ProductRecipientParty can be an association to a Party that occurs in the specialization ProductRecipientParty. 10) to node Party EmployeeResponsibleParty may be cardinality relationship of c:c. The EmployeeResponsibleParty can be an association to a Party that occurs in the specialization EmployeeResponsibleParty. 11) to node Location ShipFromLocation may be cardinality relationship of c:c. The Ship from location can be an association to a Location that occurs in the specialization ShipFromLocation. 12) to node Location ShipToLocation may be cardinality relationship of c:c. The ShipToLocation can be an association to a Location that occurs in the specialization ShipToLocation. 13) to node Location ServicePointLocation may be cardinality relationship of c:c. The ServicePointLocation can be an association to a Location that occurs in the specialization ServicePointLocation. 14) to node BusinessProcessVariantType MainBusinessProcessVariantType may be cardinality relationship of 1:1. The MainBusinessProcessVariantType can be an association to the main BusinessProcessVariantType.

There can be Integrity. In some implementations, the elements TotalNetAmount, TotalGrossAmount, and TotalTaxAmount describe the total of the values NetAmount, GrossAmount, and TaxAmount across all items, and cannot be set explicitly. The currency in the elements TotalNetAmount, TotalGrossAmount, and TotalTaxAmount can correspond with the value of the CurrencyCode element in the PricingTerms node.

In some implementations, if element ProposedCustomerInvoiceProcessingTypeCode shows the same value for all Items of the CustomerInvoiceRequest the element ProposedCustomerInvoiceProcessingTypeCode is set to this value in node CustomerInvoiceRequest or stays empty otherwise.

There can be Enterprise-Service-Infrastructure actions. In some implementations, CreateCustomerInvoices (service and application management action) creates CustomerInvoices for all item using action CreateCustomerInvoices at node Item where the preconditions are met. The action elements can be defined by the data type: CustomerInvoiceRequestCreateCustomerInvoicesActionElements. These elements are: CustomerInvoiceDate can be optional, and can have a GDT of Date and a qualifier of CustomerInvoice. AutomaticReleaseAllowedIndicator can have a GDT of Indicator and a qualifier of Allowed. SalesOrderBasedCustomerInvoiceSeparationRequiredIndicator can have a GDT of Indicator and a qualifier of Required. ServiceOrderBasedCustomerInvoiceSeparationRequiredIndicator can have a GDT of Indicator and a qualifier of Required. ServiceContractBasedCustomerInvoiceSeparationRequiredIndicator can have a GDT of Indicator and a qualifier of Required. OutboundDeliveryBasedBasedCustomerInvoiceSeparationRequiredIndicator can have a GDT of Indicator and a qualifier of Required. ProvisionDateBasedCustomerInvoiceSeparationRequiredIndicator can have a GDT of Indicator and a qualifier of Required.

In some implementations, SubmitForCancellation (service and application management action) marks all items of the CustomerInvoiceRequest for cancellation using action SubmitForCancellation at node Item. CheckConsistency (service and application management action) can check whether node CustomerInvoiceRequest and all nodes directly attached (except Item) are consistent.

In some implementations, QueryByElements returns those CustomerInvoiceRequests which contain values in the given elements of the CustomerInvoiceRequest nodes that correspond with the Query elements. The Query elements are defined by the type Data Type: CustomerInvoiceRequestElementsQueryElements. CustomerInvoiceRequestElementsQueryElements can contain the following: 1) PredecessorBusinessTransactionDocumentID can be optional. PredecessorBusinessTransactionDocumentID can select CustomerInvoiceRequests based on business transaction documents which are directly relevant for invoicing or deliver invoicing relevant data as part of the process chain (elements BaseBusinessTransactionDocumentID or ItemBusinessTransactionDocumentReference. PredecessorBusinessTransactionDocumentID can have a reference of ID and a GDT of BusinessTransactionDocumentID. 2) PredecessorBusinessTransactionDocumentTypeCode can be optional. PredecessorBusinessTransactionDocumentTypeCode can select CustomerInvoiceRequests based on the type of business transaction documents which are directly relevant for invoicing or deliver invoicing relevant data as part of the process chain (BaseBusinessTransactionDocumentTypeCode or ItemBusinessTransactionDocumentReference. Reference. TypeCode). Relevant business transaction documents are SalesOrder, ServiceOrder, ServiceRequest, ServiceConfirmation, ServiceContract, CustomerComplaint and OutboundDelivery. PredecessorBusinessTransactionDocumentTypeCode can have a GDT of BusinessTransactionDocumentTypeCode. 3) ProposedInvoiceDate can be optional and have a GDT of Date. 4) ItemProposedCustomerInvoiceProcessingTypeCode can be optional and have a GDT of BusinessTransactionDocumentProcessingTypeCode. 4) PartyBillFromPartyID can be optional. PartyBillFromPartyID can select CustomerInvoiceRequests where this party is involved in role BillFromParty (Party. PartyID or ItemParty. PartyID) and have a GDT of PartyID. 5) PartyBuyerPartyID can be optional. PartyBuyerPartyID can select CustomerInvoiceRequests where this party is involved in role BuyerParty (Party. PartyID or ItemParty. PartyID) and have a GDT of PartyID. 6) PartySellerPartyID can be optional. PartySellerPartyID can select CustomerInvoiceRequests where this party is involved in role SellerParty (Party. PartyID or ItemParty. PartyID) and have a GDT of PartyID. 7) ConsistencyStatusCode can be optional and have a GDT of ConsistencyStatusCode. 8) ItemListConsistencyStatusCode can be optional and have a GDT of ItemConsistencyStatusCode. 9) ItemListInvoicingBlockingStatusCode can be optional, can have a GDT of BlockingStatusCode, and a qualifier of Invoicing. 10) ItemListInvoicingFeasibilityStatusCode can be optional and have a GDT of FeasibilityStatusCode. 11) ItemListCancellationStatusCode can be optional and have a GDT of CancellationStatusCode.

BusinessProcessVariantType

In some implementations, BusinessProcessVariantType defines the character of a business process variant of the CustomerInvoiceRequest. It represents a typical way of processing of a CustomerInvoiceRequest within the process component from a business point of view. The elements located directly at the node BusinessProcessVariantType can be defined by the data type CustomerInvoiceRequestBusinessProcessVariantTypeElements, derived from BusinessProcessVariantTypeElements. These elements are: BusinessProcessVariantTypeCode, and MainIndicator. BusinessProcessVariantTypeCode can be the coded representation of a business process variant type of a CustomerInvoiceRequest. BusinessProcessVariantTypeCode may be based on GDT BusinessProcessVariantTypeCode. MainIndicator specifies whether the current BusinessProcessVariantTypeCode is the main one or not. MainIndicator may be based on CDT Indicator qualifier of Main. This node can contain exactly one BusinessProcessVariantType. This type is regarded as the main BusinessProcessVariantType and MainIndicator is can be set to 'true'. Allowed value for BusinessProcessVariantTypeCode of 1 (Customer Invoice Processing—Standard).

Party

In some implementations, a Party can be a natural or legal person, organization, organizational unit or group that is involved in a CustomerInvoiceRequest in a PartyRole. A PartyRole specifies which rights and obligations the Party has regarding the CustomerInvoiceRequest and the processes that belong to it. A Party may: keep a reference to a business partner or one of its specializations (for example, Customer, Supplier, Employee), and keep a reference to one of the following specializations of an organizational unit: Company, CostCentre, ReportingLineUnit, FunctionalUnit.

In some implementations, a Party can occur in the following disjunct specializations: 1) BillToParty, a party (Customer) that receives the invoice for goods or services. 2) BillFromParty, a party (Company) that carries out the billing process. 3) PayerParty, a party (Customer) that is requested to pay the payables from the delivery of goods or the provision of services or that is the recipient of a credit memo. 4) BuyerParty, a party (Customer) that purchases a good or a service. 5) SellerParty, a party (Company) that sells a good or a service. 5) ProductRecipientParty, a party (Customer) that receives a good or a service. 6) Vendor Party, a party (Company, Supplier) that delivers a good or provides a service. 7) EmployeeResponsibleParty, a party (Employee) that is responsible for the underlying business document.

In some implementations, the elements directly located on the Party node are defined by the data type CustomerInvoiceRequestPartyElements, which is derived from the data type BusinessTransactionDocumentPartyElements. These elements are: PartyID, PartyUUID, PartyTypeCode, RoleCategoryCode, RoleCode, AddressReference, MainIndicator.

PartyID is an identifier, which may be unique, for a party. PartyID may be based on GDT PartyId. PartyUUID can be a universal identifier, which may be unique, for a referencing a business partner or organizational unit. PartyUUID may be based on GDT UUID. PartyTypeCode may be a coded representation of the type of Business Object representing the Party. PartyTypeCode may be based on GDT BusinessObjectTypeCode. RoleCategoryCode can be a coded representation of a grouping of partner roles by process-controlling criteria. RoleCategoryCode may be based on GDT PartyRoleCategoryCode. RoleCode may be a coded representation of a partner role. RoleCode may be based on GDT PartyRoleCode. AddressReference can be a reference to the address of the Party. AddressReference may be based on GDT PartyAddressReference. AddressHostUUID can be an identifier, which may be unique, for the address of the business partner, the organizational unit, or their specializations, and is optional. AddressHostUUID may be based on GDT UUID Qualifier: AddressHost. AddressHostTypeCode is a coded representation of the type of address of the Party in the CustomerInvoiceRequest, and is optional. AddressHostTypeCode may be based on GDT AddressHostTypeCode. MainIndicator may be an indicator whether a Party has the predominant position towards other parties of the same role. MainIndicator may be based on GDT Indicator qualifier of Main.

The following composition relationships to subordinate nodes may exist: 1) Dependent Object Address can have a cardinality relationship of 1:c. 2) from business object Party can have an Inbound Aggregation Relationship cardinality relationship of c:cn. Party can be a customer to whom the invoice will be sent, who is requested to pay for the goods and services to be invoiced or is otherwise involved in the sales and service processes that caused the CustomerInvoiceRequest or a vendor that was involved in the sales and service processes on which the CustomerInvoiceRequest is based or company for which the receivables or liabilities described by this request arose or which is responsible for the invoicing process. 3) to business object UsedAddress can have an Associations for Navigation cardinality relationship of cn:c. UsedAddress can be master data or document specific address used for a Party. It can be possible to determine which of the two applies by means of the AddressHostTypeCode element. The instance of the TO UsedAddress represents this address. In the former case the node ID of the node in the master data object is determined via PartyTypeCode, AddressHostUUID and AddressHostTypeCode elements. In case changes to the TO UsedAddress take place, the master data address is copied by the TO UsedAddress, the changes take place to the copy, and a corresponding DO Address is created at the Party via the PartyAddress composition relationship. In the later case, the TO UsedAddress represents the DO Address used at the Party via the PartyAddress composition relationship.

In some implementations, there can be Integrity Conditions, such that if the PartyUUID is specified, the PartyTypeCode can also be present. The same is true for combination AddressHostUUID and AddressHostTypeCode. There can be at most one Party with MainIndicator 'true' per distinct value of element RoleCode.

In some implementations, there can be a DO PartyAddress 33028. The dependent object Address includes the data necessary to describe the postal or communication address of the party. The Dependent Object can be integrated into the CustomerInvoiceRequest business object by means of the PartyAddress prefix.

Location

In some implementations, Location is a physical or logical location that is involved in a CustomerInvoiceRequest in a LocationRole. A physical place can be determined using spatial coordinates (for example an address containing the street and house number). A logical place can not be determined using spatial coordinates (for example a PO box or an email address). It is not necessary to know the physical location of a logical location. Location may be a reference to the Business Object Location or a reference to the address of the Transformed Object Party (representative of a business partner and an organizational unit) or a reference to the address of the Business Object InstallationPoint. Location can occur in the following disjointed specializations: 1) ShipFromLocation, a Location from which goods were/will be delivered. 2) ShipToLocation, a Location to which goods were/will be delivered. 3) ServicePointLocation, a Location where a service has been or will be performed.

In some implementations, the elements located on the Location node can be defined by the data type CustomerInvoiceRequestLocationElements, which is derived from the data type BusinessTransactionDocumentLocationElements. These elements are: LocationID, LocationUUID, AddressReference, AddressHostUUID, AddressHostTypeCode, BusinessObjectTypeCode, PartyID, InstallationPointID, RoleCode, RoleCode.

In some implementations, LocationID can be an identifier, which may be unique, for a location, and is optional. LocationID may be based on GDT LocationID. LocationUUID can be an universal identifier, which may be unique, for referencing a BO Location. LocationUUID may be based on GDT UUID. AddressReference can be a reference to the address of the Location. AddressReference may be based on GDT LocationAddressReference. AddressHostUUID can be an identifier, which may be unique, for the address of the business partner, the organizational unit, or their specializations. AddressHostUUID may be based on GDT Qualifier: AddressHost. AddressHostTypeCode can be a coded representation of the type of address of the Party in the CustomerInvoiceRequest. AddressHostTypeCode may be based on GDT AddressHostTypeCode. BusinessObjectTypeCode can be a coded representation of the type of business object that includes the referenced address. BusinessObjectTypeCode may be based on GDT BusinessObjectTypeCode. PartyID can be an identifier for a Party (a representative of a business partner or an organizational unit) that includes the referenced address, and is optional. PartyID may be based on GDT PartyId. InstallationPointID can be an identifier of an InstallationPoint that includes the referenced address, and is optional. InstallationPointID may be based on GDT InstallationPointID. RoleCode is a coded representation of a location role. RoleCode may be based on GDT LocationRoleCode. RoleCode can be a coded representation of a grouping of location roles by process-controlling criteria, and is optional. RoleCode may be based on GDT LocationRoleCategoryCode.

In some implementations, the following composition relationships to subordinate nodes can exist: 1) Dependent Object Address can have a cardinality relationship of 1:c. 2) from the business object Location can have an Incoming Aggregation Relationship cardinality relationship of c:cn. Location can be a location from which or to which invoiced goods were/will be delivered. 3) from business object Party or node AddressInformation PartyAddressInformation can have an Incoming Aggregation Relationship cardinality relationship of c:cn. PartyAddressInformation can be address information of a representative of a business partner or organizational centre corresponding to the Location. 4) from business object InstallationPoint or node AddressInformation InstallationPointAddressInformation can have Incoming Aggregation Relationship cardinality relationship of c:cn. InstallationPointAddressInformation can be address information of an installation point corresponding to the Location. 5) to business object UsedAddress can have an Association for Navigation cardinality relationship of cn:c. UsedAddress can be master data or document specific address used for a Location. It is possible to determine which of the two applies by means of the AddressHostTypeCode element. The instance of the TO UsedAddress represents this address. In the former case the node ID of the node in the master data object can be determined via BusinessObjectTypeCode, AddressHostUUID and AddressHostTypeCode elements. In case changes to the TO UsedAddress take place, the master data address can be copied by the TO UsedAddress, the changes take place to the copy, and a corresponding DO Address is created at the Location via the LocationAddress composition relationship. In the latter case the TO UsedAddress represents the DO Address used at the Location via the LocationAddress composition relationship.

There can be Integrity Conditions. In some implementations, there may only be one aggregation or one composition relationship to the Dependent Object Address. If an aggregation relationship to the Business Object Location exists, the LocationID element can be filled with the ID of the Business Object Location. Element PartyID remains empty. If an aggregation relationship to the address of a party (representative of a business partner or OrganizationalCentre) exists, the PartyID attribute can be filled with the ID of the party. LocationID and InstallationPointID remain empty. If there is an aggregation relationship to the address of an InstallationPoint, the InstallationPointID attribute can be filled with the ID of the InstallationPoint. LocationID and PartyID remain empty.

In some implementations, there can be a DO LocationAddress 33036. The dependent object Address can include the data necessary to describe a physical or logical location. The Dependent Object is integrated into the CustomerInvoiceRequest business object by means of the LocationAddress prefix.

SalesAndServiceBusinessArea

In some implementations, SalesAndServiceBusinessArea can be the business or service specific area within an enterprise that is valid for an underlying sales or service business transaction document of this CustomerInvoiceRequest, such as, for example, sales organization, service organization, distribution channel.

The elements directly attached to the SalesAndServiceBusinessArea node can be defined by datatype CustomerInvoiceRequestSalesAndServiceBusinessAreaElements, which can be derived from datatype BusinessTransactionDocumentSalesAndServiceBusinessAreaElements. These elements can include: SalesOrganisationID, SalesGroupID, SalesOfficeID, DistributionChannelCode, DistributionChannelCode. SalesOrganisationID can be an identifier for the sales organization that is responsible for the underlying business transaction document. SalesOrganisationID may be based on GDT OrganisationalCentreID. SalesGroupID can be an identifier for the sales group that is responsible for the underlying business transaction document, and is optional. SalesGroupID may be based on GDT OrganisationalCentreID. SalesOfficeID can be an identifier for the sales office that is responsible for the underlying business transaction document, and is optional. SalesOfficeID may be based on GDT OrganisationalCentreID. DistributionChannelCode can be a coded representation of the distribution channel by which goods and services reach customers, and is optional. DistributionChannelCode may be based on GDT DistributionChannelCode. ServiceOrganisationID can be an identifier for the service organization that is responsible for the underlying business transaction document, and is optional. ServiceOrganisationID may be based on GDT OrganisationalCentreID. SalesOrganisationUUID can be an universal identifier, which is unique, for the sales organization. SalesOrganisationUUID may be based on GDT UUID. SalesGroupUUID can be an universal identifier, which may be unique, for the sales group. SalesGroupUUID may be based on GDT UUID. SalesOfficeUUID can be a universal identifier, which may be unique, for the sales office, and is optional. SalesOfficeUUID may be based on GDT UUID. ServiceOrganisationUUID can be an universal identifier, which may be unique, for the service organization, and is optional. ServiceOrganisationUUID may be based on GDT UUID.

There may be a number of Inbound Aggregation Relationships including: 1) from business object FunctionalUnit SalesOrganisation may be a cardinality relationship of c:cn. FunctionalUnit can be in the specialization SalesOrganisation. 2) SalesGroup may be a cardinality relationship of c:cn. FunctionalUnit can be in the specialization SalesGroup. 3) SalesOffice may be a cardinality relationship of c:cn. FunctionalUnit can be in the specialization SalesOffice. 4) ServiceOrganisation may be a cardinality relationship of c:cn. FunctionalUnit can be in the specialization ServiceOrganisation;

There may be an Integrity Condition if the node is not filled or evaluated if the underlying business transaction document of the CustomerInvoiceRequest is an OutboundDelivery.

DeliveryTerms

DeliveryTerms can be agreements that apply for the delivery of goods and services to be invoiced. The elements located directly at the node DeliveryTerms can be defined by the data type CustomerInvoiceRequestDeliveryTermsElements derived from data type BusinessTransactionDocumentDeliveryTermsElements. The element can be: Incoterms which is the conventional contract formulations for the delivery terms. Incoterms may be based on GDT Incoterms.

PricingTerms

PricingTerms can be agreements in the sales or service process, which are needed exclusively to determine the net value of the CustomerInvoiceRequest. The elements located at the node PricingTerms can be defined by the data type CustomerInvoiceRequestPricingTermsElements derived from data type BusinessTransactionDocumentPricingTermsElements. These elements can include: CurrencyCode, PriceDateTime, PricingProcedureCode.

In some implementations, CurrencyCode can be a coded representation of the currency in which the invoice is issued (invoice currency). CurrencyCode may be based on GDT CurrencyCode. PriceDateTime can be the date (and time) used to determine the price components for this CustomerInvoiceRequest, and is optional. PriceDateTime may be based on GDT LOCALNORMALISED_DateTime qualifier of Price. PricingProcedureCode can be a coded representation of the procedure how price components are supposed to be calculated in the CustomerInvoiceRequest, and is optional. PricingProcedureCode may be based on GDT PricingProcedureCode.

In some implementations, PriceAndTaxCalculation is the summary of the price and taxation components identified for the CustomerInvoiceRequest. The Dependent Object can be integrated into the CustomerInvoiceRequest business object by means of the PriceAndTaxCalculation prefix.

In some implementations, CashDiscountTerms is a conditions agreed between business partners regarding payment periods for goods delivered or services performed, including cash discounts granted for punctual payment. The Dependent Object can be integrated into the CustomerInvoiceRequest business object by means of the CashDiscountTerms prefix.

In some implementations, an AttachmentFolder is a collection of documents that are assigned to the CustomerInvoiceRequest. The Dependent Object can be integrated into the CustomerInvoiceRequest business object by means of the AttachmentFolder prefix In some implementations, a TextCollection is a set of all multilingual textual descriptions including formatting information for a CustomerInvoiceRequest. The Dependent Object can be integrated into the CustomerInvoiceRequest business object by means of the TextCollection prefix.

Item

In some implementations, an Item is a request to bill for goods and services that have been ordered or delivered, or the value to be invoiced or credited. It can contain details on elements such as the involved parties, locations, terms and conditions regarding delivery and payment, and other business documents to be taken into account during billing. It can also contain information on invoices to be created.

In some implementations, the elements located on the Item node are defined by the data type CustomerInvoiceRequestItemElements. These elements can include: UUID, BaseBusinessTransactionDocumentItemID, BaseBusinessTransactionDocumentItemUUID, BaseBusinessTransactionDocumentItemTypeCode, ProcessingTypeCode, ReceivablesPropertyMovementDirectionCode, Description, HierarchyRelationship, ParentItemID, TypeCode, ProposedInvoiceDate, ProposedCustomerInvoiceProcessingTypeCode, BaseInvoicingBlockingReasonCode, CancellationReasonCode, Quantity, QuantityTypeCode, Amount, ToBeInvoicedQuantity, ToBeInvoicedQuantityTypeCode, ToBeInvoicedAmount, NetAmount, GrossAmount, TaxAmount, NetWeightMeasure, NetWeightMeasureTypeCode, GrossWeightMeasure, GrossWeightMeasureTypeCode, VolumeMeasure, VolumeMeasureTypeCode, SystemAdministrativeData, HeaderConsistencyStatusCode, ConsistencyStatusCode, InvoicingBlockingStatusCode, InvoicingStatusCode, CancellationStatusCode, InvoicingFeasibilityStatusCode, BaseBusinessTransactionDocumentItemKey.

In some implementations, UUID can be internally assigned universally unique identifier of a CustomerInvoiceRequest item on which other business objects can define foreign keys. UUID may be based on GDT UUID. BaseBusinessTransactionDocumentItemID can be an identifier, which may be unique, for the item in the underlying business document that is identified using the BaseBusinessTransactionDocumentID in the CustomerInvoiceRequest node. BaseBusinessTransactionDocumentItemID may be based on GDT BusinessTransactionDocumentItemID Qualifier: Base. BaseBusinessTransactionDocumentItemUUID can be a universal identifier, which may be unique, for the item in the underlying business document that is identified using the BaseBusinessTransactionDocumentUUID in the CustomerInvoiceRequest node, and is optional. BaseBusinessTransactionDocumentItemUUID may be based on GDT UUID qualifier of BusinessTransactionDocumentItem. BaseBusinessTransactionDocumentItemTypeCode can be a coded representation of the type of item in the underlying business document, and is optional. BaseBusinessTransactionDocumentItemTypeCode may be based on GDT BusinessTransactionDocumentItemTypeCode qualifier of Base. ProcessingTypeCode can be a coded representation of the processing type for this CustomerInvoiceRequest item. ProcessingTypeCode may be based on GDT BusinessTransactionDocumentProcessingTypeCode. ReceivablesPropertyMovementDirectionCode can be a coded representation of whether a CustomerInvoice based on this Item would increase or decrease receivables. ReceivablesPropertyMovementDirectionCode may be based on GDT PropertyMovementDirectionCode qualifier of Receivables. Description can be the description of the item, and is optional. ReceivablesPropertyMovementDirectionCode may be based on GDT SHORT_Description. HierarchyRelationship may be based on GDT CustomerInvoiceHierarchyRelationship. ParentItemID can be the BaseID of the higher-level item in the item hierarchy of a CustomerInvoiceRequest, and is optional. ParentItemID may be based on GDT BusinessTransactionDocumentItemID. TypeCode can be a coded display for the relationship type for a lower-level item and a higher-level item. TypeCode may be based on GDT BusinessTransactionDocumentItemHierarchyRelationshipTypeCode.

In some implementations, ProposedInvoiceDate can be the proposal for the invoice date of CustomerInvoice to be created for this item of the CustomerInvoiceRequest, and is optional. ProposedInvoiceDate may be based on GDT Date qualifier of ProposedInvoice. ProposedCustomerInvoiceProcessingTypeCode can be the proposal for the processing type of a CustomerInvoice, and is optional. ProposedCustomerInvoiceProcessingTypeCode may be based on GDT BusinessTransactionDocumentProcessingTypeCode. BaseInvoicingBlockingReasonCode can be a coded representation of the reason why invoicing has been blocked by the underlying business document, and is optional. BaseInvoicingBlockingReasonCode may be based on GDT InvoicingBlockingReasonCode. CancellationReasonCode can be a coded representation of the reason why the Item has been cancelled, and is optional. CancellationReasonCode may be based on GDT CancellationReasonCode. Quantity can be the total quantity of goods or services to be invoiced, and is optional. Quantity may be based on GDT Quantity. QuantityTypeCode can be a coded representation of the type of the quantity, and is optional. QuantityTypeCode may be based on GDT QuantityTypeCode. Amount can be the total value to be invoiced, and is optional. Amount may be based on GDT Amount. ToBeInvoicedQuantity can be the quantity of goods or services still to be invoiced, and is optional. ToBeInvoicedQuantity may be based on GDT Quantity qualifier of ToBeInvoiced. ToBeInvoicedQuantityTypeCode can be a coded representation of the type of the quantity still to be invoiced, and is optional. ToBeInvoicedQuantityTypeCode may be based on GDT QuantityTypeCode. ToBeInvoicedAmount can be a value still to be invoiced, and is optional. ToBeInvoicedAmount may be based on GDT Amount qualifier of ToBeInvoiced. NetAmount can be the net value of invoice item, and is optional. NetAmount may be based on GDT Amount qualifier of Net. GrossAmount can be the gross value of request invoice item, and is optional. GrossAmount may be based on GDT Amount qualifier of Gross. TaxAmount can be the sum of all tax values accruing on this request item, and is optional. TaxAmount may be based on GDT Amount qualifier of Tax. NetWeightMeasure can be the net weight of goods to be invoiced, and is optional. NetWeightMeasure may be based on GDT Measure qualifier of NetWeight. NetWeightMeasureTypeCode can be a coded representation of the type of net weight measure, and is optional. NetWeightMeasureTypeCode may be based on GDT MeasureTypeCode qualifier of NetWeight. GrossWeightMeasure can be the gross weight of goods to be invoiced, and is optional. GrossWeightMeasure may be based on GDT Measure qualifier of GrossWeight. GrossWeightMeasureTypeCode can be a coded representation of the type of gross weight measure, and is optional. GrossWeightMeasureTypeCode may be based on GDT MeasureTypeCode qualifier of GrossWeight. VolumeMeasure can be a volume of goods to be invoiced, and is optional. VolumeMeasure may be based on GDT Measure qualifier of Volume. VolumeMeasureTypeCode can be a coded representation of the type of volume measure, and is optional. VolumeMeasureTypeCode may be based on GDT MeasureTypeCode qualifier of Volume. BaseBusinessTransactionDocumentItemKey can be a complete identification of an Item based on the identification of the underlying business transaction document, and is optional. BaseBusinessTransactionDocumentItemKey may be based on GDT CustomerInvoiceRequestItemBaseBusinessTransactionDocumentItemKey. BaseBusinessTransactionDocumentItemKey may also include BaseBusinessTransactionDocumentID. BaseBusinessTransactionDocumentID may be based on GDT BusinessTransactionDocumentID.

In some implementations, SystemAdministrativeData can be the administrative data stored by the system. This includes system user and any times changes that were made. SystemAdministrativeData may be based on GDT SystemAdministrativeData. SystemAdministrativeData may also include the following: HeaderConsistencyStatusCode, ConsistencyStatusCode, InvoicingBlockingStatusCode, InvoicingStatusCode, CancellationStatusCode, InvoicingFeasibilityStatusCode.

In some implementations, HeaderConsistencyStatusCode describes whether the node CustomerInvoiceRequest and all associated nodes except Item are consistent or not. HeaderConsistencyStatusCode may be based on GDT INCONSISTENTCONSISTENT_ConsistencyStatusCode. ConsistencyStatusCode can describe whether the node Item and all associated nodes are consistent or not. ConsistencyStatusCode may be based on GDT INCONSISTENTCONSISTENT_ConsistencyStatusCode. InvoicingBlockingStatusCode can describe if the underlying Business Transaction Document has requested to block the invoicing process for this item. InvoicingBlockingStatusCode may be based on GDT NOTBLOCKEDBLOCKED BlockingStatusCode qualifier of Invoicing. InvoicingStatusCode can be a step in the lifecycle of this CustomerInvoiceRequest item with respect to the creation of CustomerInvoices. InvoicingStatusCode may be based on GDT InvoicingStatusCode Restricted values of 1, 2, 3. CancellationStatusCode can describe if the CustomerInvoiceRequest item has been cancelled. CancellationStatusCode may be based on GDT CancellationStatusCode Restricted values of 1, 2, 4. InvoicingFeasibilityStatusCode can be an aggregated status of all other status variables to derive if it is feasible to invoice the Item. InvoicingFeasibilityStatusCode may be based on GDT InvoicingFeasibilityStatusCode.

There may be a number of composition relationships to subordinate nodes including: 1) ItemBusinessProcessVariantType 33070 may be a cardinality relationship of 1:cn. 2) ItemParty 33030 may be a cardinality relationship of 1:cn. 3) ItemLocation 33038 may be a cardinality relationship of 1:cn. 4) ItemProduct 33024 may be a cardinality relationship of 1:c. 5) ItemDeliveryTerms 33046 may be a cardinality relationship of 1:c. 6) ItemPricingTerms 33050 may be a cardinality relationship of 1:c. 7) ItemCustomerInvoiceItem 33054 may be a cardinality relationship of 1:cn. 8) ItemBusinessTransactionDocumentReference 33058 may be a cardinality relationship of 1:cn. 9) Dependent Object AttachmentFolder 33062 may be a cardinality relationship of 1:c. 10) Dependent Object TextCollection 33066 may be a cardinality relationship of 1:c.

There may be a number of Inbound Aggregation Relationships from business object Identity node including: 1) CreationIdentity may be a cardinality relationship of 1:cn. CreationIdentity can be the identity of the user that created the CustomerInvoiceRequest item. 2) LastChangeIdentity may be a cardinality relationship of c:cn. LastChangeIdentity can be the identity of the user that last changed the CustomerInvoiceRequest item.

There may be a number of Associations for Navigation including: 1) BillToItemParty to node ItemParty may be a cardinality relationship of c:c. BillToItemParty can be an association to an ItemParty that occurs in the specialization BillToItemParty. 2) BillFromItemParty to node ItemParty may be a cardinality relationship of c:c. BillFromItemParty can be an association to an ItemParty that occurs in the specialization BillFromItemParty. 3) PayerItemParty to node ItemParty may be a cardinality relationship of c:c. PayerItemParty can be an association to an ItemParty that occurs in the specialization PayerItemParty. 4) BuyerItemParty to node ItemParty may be a cardinality relationship of c:c. BuyerItemParty can be an association to an ItemParty that occurs in the specialization BuyerItemParty. 5) SellerItemParty to node ItemParty may be a cardinality relationship of c:c. SellerItemParty can be an association to an ItemParty that occurs in the specialization SellerItemParty. 6) VendorItemParty to node ItemParty may be a cardinality relationship of c:c. VendorItemParty can be an association to an ItemParty that occurs in the specialization VendorItemParty. 7) ProductRecipientItemParty to node ItemParty may be a cardinality relationship of c:c. ProductRecipientItemParty can be an association to an ItemParty that occurs in the specialization ProductRecipientItemParty. 8) ShipFromItemLocation to node ItemLocation may be a cardinality relationship of c:c. ShipFromItemLocation can be an association to an ItemLocation that occurs in the specialization ShipFromItemLocation. 9) ShipToItemLocation to node ItemLocation may be a cardinality relationship of c:c. ShipToItemLocation can be an association to an ItemLocation that occurs in the specialization ShipToItemLocation. 10) ServicePointItemLocation to node ItemLocation may be a cardinality relationship of c:c. ServicePointItemLocation can be an association to an ItemLocation that occurs in the specialization ServicePointItemLocation. 11) ItemSalesOrderItemReference to node ItemBusinessTransactionDocumentReference may be a cardinality relationship of c:c. ItemSalesOrderItemReference can be an association to an ItemBusinessTransactionDocumentReference that occurs in the specialization ItemSalesOrderItemReference. 12) ItemServiceOrderItemReference to node ItemBusinessTransactionDocumentReference may be a cardinality relationship of c:c. ItemServiceOrderItemReference can be an association to an ItemBusinessTransactionDocumentReference that occurs in the specialization ItemServiceOrderItemReference. 13) ItemServiceContractItemReference to node ItemBusinessTransactionDocumentReference may be a cardinality relationship of c:c. ItemServiceContractItemReference can be an association to an ItemBusinessTransactionDocumentReference that occurs in the specialization ItemServiceContractItemReference. 14) ItemPurchaseOrderReference to node ItemBusinessTransactionDocumentReference may be a cardinality relationship of c:c. ItemPurchaseOrderReference can be an association to an ItemBusinessTransactionDocumentReference that occurs in the specialization ItemPurchaseOrderReference. 15) PriceAndTaxCalculationItem to DO PriceAndTaxCalculation or node Item may be a cardinality relationship of 1:c. PriceAndTaxCalculationItem can be the price and tax information assigned to the item. 16) PriceAndTaxCalculationItemProductTaxDetails to DO PriceAndTaxCalculation or node Item may be a cardinality relationship of 1:cn. PriceAndTaxCalculationItemProductTaxDetails can be the product tax details assigned to the item. 17) PriceAndTaxCalculationItemWithholdingTaxDetails to DO PriceAndTaxCalculation or node Item may be a cardinality relationship of 1:cn. PriceAndTaxCalculationItemWithholdingTaxDetails can be the withholding tax details assigned to the item. 18) ParentItem to node Item may be a cardinality relationship of 1:c. ParentItem can be the parent item in an item hierarchy.

In some implementations, the elements NetAmount, GrossAmount, and TaxAmount can describe the results of price determination and cannot be set explicitly. The currency in the elements NetAmount, GrossAmount, and TaxAmount can correspond with the value of the CurrencyCode element in the PricingTerms node.

TypeCode in HierarchyRelationship can be restricted to values 1 (bill of material) and 2 (item group). In some implementations, if a quantity or a measure is set, the corresponding quantity or measure type needs to be filled.

In some implementations, a default logic applies to the elements PlannedInvoicingDate and ProposedInvoiceDate. If they are not specified in the Item node, the corresponding value from the CustomerInvoiceRequest node can be used. If they are not specified in any of the nodes, the local system date can appear as the default value.

Enterprise-Service-Infrastructure actions can include CreateCustomerInvoices, BlockInvoicing, NotifyOfInvoiceCancellation, and SubmitForCancellation. CreateCustomerInvoices (service and application management action) can create one or more CustomerInvoices out of a number of Items in the CustomerInvoiceRequest based on an internal algorithm. CreateCustomerInvoices can have preconditions including: CustomerInvoiceRequest and Item are consistent and the Item is not cancelled, not blocked and not yet fully invoiced, that is, it is feasible to invoice the Item. CreateCustomerInvoices can change the status variable Invoicing to 'Invoiced'. Changes within the object can include a new instance of node ItemCustomerInvoiceItem is created to store the reference to a newly created Item in a CustomerInvoice. Changes to other objects can include a new CustomerInvoice is created or an Item is added to a CustomerInvoice currently created out of this action. The action elements can be defined by the data type CustomerInvoiceRequestItemCreateCustomerInvoicesActionElements. The elements can include: 1) CustomerInvoiceDate can be optional, have a GDT of Date, and a qualifier of CustomerInvoice. 2) CustomerInvoicingRunExecutionUUID can be optional, and have a GDT of UUID. 3) AutomaticReleaseAllowedIndicator can have a GDT of Indicator, and a qualifier of Allowed. 4) SalesOrderBasedCustomerInvoiceSeparationRequiredIndicator can have a GDT of Indicator, and a qualifier of Required. 5) ServiceOrderBasedCustomerInvoiceSeparationRequiredIndicator can have a GDT of Indicator, and a qualifier of Required. 6) ServiceContractBasedCustomerInvoiceSeparationRequiredIndicator can have a GDT of Indicator, and a qualifier of Required. 7) OutboundDeliveryBasedCustomerInvoiceSeparationRequiredIndicator can have a GDT of Indicator, and a qualifier of Required. 8) ProvisionDateBasedCustomerInvoiceSeparationRequiredIndicator can have a GDT of Indicator, and a qualifier of Required.

In some implementations, BlockInvoicing (service and application management action) blocks the Item to prevent the creation of a CustomerInvoice. Changes to the status may include status variable InvoicingBlocking being set to 'Blocked'. The action can be triggered from the Inbound Process Agent based on the element SettlementBlockedIndicator in message type CustomerInvoiceRequestRequest. UnblockInvoicing (service and application management action) can revoke the blocking of the Item. Changes to the status can include status variable InvoicingBlocking being set to 'Not Blocked'. The action can be triggered from the Inbound Process Agent based on the element SettlementBlockedIndicator in message type CustomerInvoiceRequestRequest. NotifyOfInvoiceCreation (service and application management action) can notify the Item that a CustomerInvoice has been created for this Item. Preconditions can include the Item being partially or not invoiced. Changes to the status may include status variable Invoicing being set to 'Partly Invoiced' or 'Invoiced' depending on the ToBeInvoicedQuantity and ToBeInvoicedAmount. Changes to the object can include a new instance of node ItemCustomerInvoiceItem being created to store the reference to an Item in a CustomerInvoice. NotifyOfInvoiceCreation action can be called from the invoicing business logic implemented in business object CustomerInvoice. The action elements can be defined by the data type CustomerInvoiceRequestItemNotifyOfInvoiceCancellationActionElements. The elements can include: 1) CustomerInvoiceItemUUID may have a GDT of UUID. 2) InvoicedQuantity may be optional, have a GDT of Quantity, and a qualifier of Invoiced. 3) InvoicedQuantityTypeCode may be optional, have a GDT of QuantityTypeCode, and a qualifier of Invoiced. 4) InvoicedAmount may be optional, have a GDT of Amount, and a qualifier of Invoiced.

In some implementations, NotifyOfInvoiceCancellation (service and application management action) notifies the Item that a CustomerInvoice has been cancelled which has been created for this Item. Preconditions can include the Item being partially or fully invoiced. Changes to the status can include status variable InvoicingStatus being set to 'Partly Invoiced' or 'Not Invoiced' depending on the ToBeInvoicedQuantity and ToBeInvoicedAmount. Changes to the object can include a new instance of node ItemCustomerInvoiceItem being created to store the reference to an Item in a CustomerInvoice which cancels a CustomerInvoice for this Item. NotifyOfInvoiceCancellation action can be called from the invoicing business logic implemented in business object CustomerInvoice. The action elements can be defined by the data type: CustomerInvoiceRequestItemNotifyOfInvoiceCancellationActionElements. The elements can include: 1) CustomerInvoiceItemUUID can have a GDT of UUID. 2) InvoicedQuantity can be optional, have a GDT of Quantity, and a qualifier of Invoiced. 3) InvoicedQuantityTypeCode can be optional, have a GDT of QuantityTypeCode, and a qualifier of Invoiced. 4) InvoicedAmount can be optional, have a GDT of Amount, and a qualifier of Invoiced.

In some implementations, SubmitForCancellation (service and application management action) marks the item of the CustomerInvoiceRequest for cancellation such that no CustomerInvoice will be created or an existing CustomerInvoice either needs to be reversed or credited. Changes to the status can include if the Item is not invoiced the status variable Cancellation being set to 'Cancelled' and if the Item has been invoiced the status variable Cancellation being set to 'In Cancellation'. RevokeCancellation (service and application management action) can revoke the cancellation of the Item to allow the creation of CustomerInvoices again. Changes to the status can include the status variable Cancellation being set to 'Not Cancelled'. ConcludeCancellation (service and application management action) can conclude the cancellation of the Item which has been submitted for cancellation to finish off the cancellation process. Changes to the status can include the status variable Cancellation being set to 'Cancelled'. CheckConsistency (service and application management action) can check whether node Item and all nodes directly attached are consistent.

In some implementations, QueryByInvoicingFeasibleStatusAndReferenceAndPartyAndDate can return those Items which contain values in the given elements of the CustomerInvoiceRequest nodes that correspond with the query elements and where the status InvoicingFeasible has the value 'Feasible'. The Query elements can be defined by the type Data Type: CustomerInvoiceRequestItemInvoicingFeasibleStatusAndReferenceAndPartyAndDate QueryElements. CustomerInvoiceRequestItemInvoicingFeasibleStatusAndReferenceAndPartyAndDateQueryElements can include: 1) PredecessorBusinessTransactionDocumentID may be optional. PredecessorBusinessTransactionDocumentID can select CustomerInvoiceRequests based on business transaction documents which are directly relevant for invoicing or deliver invoicing relevant data as part of the process chain (elements BaseBusinessTransactionDocumentID or ItemBusinessTransactionDocumentReference reference ID). PredecessorBusinessTransactionDocumentID can have a GDT of BusinessTransactionDocumentID. 2) PredecessorBusinessTransactionDocumentTypeCode may be optional. PredecessorBusinessTransactionDocumentTypeCode can select CustomerInvoiceRequests based on the type of business transaction documents which are directly relevant for invoicing or deliver invoicing relevant data as part of the process chain (BaseBusinessTransactionDocumentTypeCode or ItemBusinessTransactionDocumentReference reference TypeCode). Relevant business transaction documents are SalesOrder, ServiceOrder, ServiceRequest, ServiceConfirmation, ServiceContract, CustomerComplaint and OutboundDelivery. PredecessorBusinessTransactionDocumentTypeCode can have a GDT of BusinessTransactionDocumentTypeCode. 3) ItemProposedInvoiceDate may be optional, and have a GDT of Date. 4) ItemProposedCustomerInvoiceProcessingTypeCode may be optional, and have a GDT of BusinessTransactionDocumentProcessingTypeCode. 5) PartyBuyerPartyID may be optional. PartyBuyerPartyID can select Items where this party is involved in role BuyerParty (Party PartyID or ItemParty PartyID). PartyBuyerPartyID can have a GDT of PartyID. 6) PartySellerPartyID may be optional. PartySellerPartyID can select Items where this party is involved in role SellerParty (Party PartyID or ItemParty PartyID). PartySellerPartyID can have a GDT of PartyID.

In some implementations, ItemBusinessProcessVariantType defines the character of a business process variant of an Item in the CustomerInvoiceRequest. It can represent a typical way of processing of an Item within the process component from a business point of view. The elements located at the node ItemBusinessProcessVariantType can be defined by the data type CustomerInvoiceRequestItemBusinessProcessVariantTypeElements, derived from BusinessProcessVariantTypeElements. These elements can include: BusinessProcessVariantTypeCode, and MainIndicator. BusinessProcessVariantTypeCode can be a coded representation of a business process variant type of a CustomerInvoiceRequest. BusinessProcessVariantTypeCode may be based on GDT BusinessProcessVariantTypeCode. MainIndicator can specify whether the current BusinessProcessVariantTypeCode is the main one or not. MainIndicator may be based on GDT Indicator Qualifier of Main. Node ItemBusinessProcessVariantType can hold additional BusinessProcessVariantTypes only, that is, MainIndicator needs to be 'false' in all cases. Allowed value for BusinessProcessVariantTypeCode can include: 4 (Customer Invoice Processing—Triggered by Outb. Delivery based on Sales Order)

ItemParty

In some implementations, An ItemParty is a natural or legal person, organization, organizational unit or group that is involved in a CustomerInvoiceRequest item in a PartyRole. A PartyRole can specify which rights and obligations the Party has regarding the CustomerInvoiceRequest and the processes that belong to it. A ItemParty may keep a reference to a business partner or one of its specializations, for example, Customer, Supplier, Employee. A ItemParty can Keep a reference to one of the following specializations of an organizational units: Company, CostCentre, ReportingLineUnit, FunctionalUnit. An ItemParty can occur in the following disjunct specializations: 1) BillToItemParty, a party (Customer) that receives the invoice for goods or services. 2) BillFromItemParty, a party (Company) that carries out the billing process. 3) PayerItemParty, a party (Customer) that is requested to pay the payables from the delivery of goods or the provision of services or that is the recipient of a credit memo. 4) BuyerItemParty, a party (Customer) that purchases a good or a service. 5) SellerItemParty, a party (Company) that sells a good or a service. 6) ProductRecipientItemParty, a party (Customer) that receives a good or a service. 7) VendorItemParty, a party (Company, Supplier) that delivers a good or provides a service.

In some implementations, the elements located on the ItemParty node are defined by the data type CustomerInvoiceRequestItemPartyElements, which is derived from the data type BusinessTransactionDocumentPartyElements. These elements can include: PartyID, PartyUUID, PartyTypeCode, RoleCategoryCode, RoleCode, AddressReference, AddressHostUUID, AddressHostTypeCode, MainIndicator.

PartyID can be an unique identifier for a party. PartyID may be based on GDT PartyID. PartyUUID can be a universal identifier, which may unique, for referencing a business partner or organizational unit. PartyUUID may be based on GDT UUID. PartyTypeCode can be a coded representation of the type of Business Object representing the Party. PartyTypeCode may be based on GDT BusinessObjectTypeCode. RoleCategoryCode can be a coded representation of a grouping of partner roles by process-controlling criteria. RoleCategoryCode may be based on GDT PartyRoleCategoryCode. RoleCode can be a coded representation of a partner role. RoleCode may be based on GDT PartyRoleCode. AddressReference can be a reference to the address of the Party. AddressReference may be based on GDT PartyAddressReference. AddressHostUUID can be an identifier, which may be unique, for the address of the business partner, the organizational unit, or their specializations. AddressHostUUID may be based on GDT UUID Qualifier of AddressHost. AddressHostTypeCode can be a coded representation of the type of address of the Party in the CustomerInvoiceRequest, and is optional. AddressHostTypeCode may be based on GDT AddressHostTypeCode. MainIndicator can be an indicator whether a Party has the predominant position towards other parties of the same role. MainIndicator may be based on GDT Indicator Qualifier of Main.

There may be a number of composition relationships to subordinate nodes including: 1) Dependent Object Address may be a cardinality relationship of 1:c. 2) from business object Party can have an Inbound Aggregation Relationship cardinality relationship of c:cn. Party can be a customer to whom the invoice will be sent, who is requested to pay for the goods and services to be invoiced or is otherwise involved in the sales and service processes that caused the CustomerInvoiceRequest item or a vendor that was involved in the sales and service processes on which the CustomerInvoiceRequest item is based or company for which the receivables or liabilities described by this request arose or which is responsible for the invoicing process. 3) to business object UsedAddress can have an Associations for Navigation cardinality relationship of cn:c. UsedAddress can be master data or document specific address used for a ItemParty. It can be possible to determine which of the two applies by means of the AddressHostTypeCode element. The instance of the TO UsedAddress represents this address. In the former case the node ID of the node in the master data object can be determined via PartyTypeCode, AddressHostUUID and AddressHostTypeCode elements. In case changes to the TO UsedAddress take place, the master data address can be copied by the TO UsedAddress, the changes take place to the copy, and a corresponding DO Address is created at the ItemParty via the ItemPartyAddress composition relationship. In the latter case the TO UsedAddress can represent the DO Address used at the ItemParty via the ItemPartyAddress composition relationship.

In some implementations, if the PartyUUID is specified, the PartyTypeCode can also be present. The same can be true for combination AddressHostUUID and AddressHostTypeCode. There can be at most one Party with MainIndicator 'true' per distinct value of element RoleCode. Per PartyRoleCode node ItemParty can describe parties which are not available in node Party or which are different from those.

In some implementations, there can be a DO ItemPartyAddress 33032. The dependent object Address can include the data necessary to describe the postal or communication address of the party. The Dependent Object can be integrated into the CustomerInvoiceRequest business object by means of the ItemPartyAddress prefix.

ItemLocation

In some implementations, ItemLocation can be a physical or logical location that is involved in an Item of a CustomerInvoiceRequest in a LocationRole. A physical place can be determined using spatial coordinates (for example an address containing the street and house number). A logical place can not be determined using spatial coordinates (for example a PO box or an email address). It may not be necessary to know the physical location of a logical location.

In some implementations, ItemLocation can include: a reference to the Business Object Location, or a reference to the address of the Transformed Object Party (representative of a business partner and an organizational unit), or a reference to the address of the Business Object InstallationPoint.

ItemLocation can occur in the following disjointed specializations: ShipFromItemLocation, which can be an ItemLocation from which goods were/will be delivered; ShipToItemLocation can be an ItemLocation to which goods were/will be delivered; ServicePointItemLocation which is an ItemLocation where a service has been or will be performed.

The elements located on the ItemLocation node are defined by the data type CustomerInvoiceRequestItemLocationElements, which can be derived from the data type BusinessTransactionDocumentItemLocationElements.

These elements can include: LocationID, LocationUUID, AddressReference, AddressHostUUID, AddressHostType- Code, BusinessObjectTypeCode, PartyID, InstallationPointID, RoleCode, and RoleCategoryCode.

LocationID can be an identifier, which can be unique, for a location, and is optional. Location may be based on GDT LocationID. LocationUUID can be an universal identifier, which may be unique for referencing a BO Location, and is optional. LocationUUID may be based on GDT UUID. AddressReference is a reference to the address of the ItemLocation, and is optional. AddressReference may be based on GDT LocationAddressReference. AddressHostUUID can be an identifier, which may be unique, for the address of the business partner, the organizational unit, or their specializations, and is optional. AddressHostUUID may be based on GDT UUID Qualifier of AddressHost. AddressHostTypeCode can be a coded representation of the type of address of the Party in the CustomerInvoiceRequest, and is optional. AddressHostTypeCode may be based on GDT AddressHostTypeCode. BusinessObjectTypeCode can be a coded representation of the type of business object that includes the referenced address, and is optional. BusinessObjectTypeCode may be based on GDT BusinessObjectTypeCode. PartyID can be an identifier for a Party (a representative of a business partner or an organizational unit) that includes the referenced address, and is optional. PartyID may be based on GDT PartyID. InstallationPointID can be an identifier of an InstallationPoint that includes the referenced address, and is optional. InstallationPointID may be based on GDT InstallationPointID. RoleCode can be a coded representation of a location role, and is optional. RoleCode may be based on GDT LocationRoleCode. RoleCategoryCode can be a coded representation of a grouping of location roles by process-controlling criteria, and is optional. RoleCategoryCode may be based on GDT LocationRoleCategoryCode.

There may be a number of composition relationships to subordinate nodes including: 1) Dependent Object Address may be a cardinality relationship of 1:c. 2) from the business object Location can have Inbound Aggregation Relationships cardinality relationship of c:cn. Location can be a location from which or to which invoiced goods were/will be delivered. 3) from business object Party or node AddressInformation PartyAddressInformation can have Inbound Aggregation Relationships cardinality relationship of c:cn. PartyAddressInformation can be address information of a representative of a business partner or organizational centre corresponding to the ItemLocation. 4) from business object InstallationPoint or node AddressInformation InstallationPointAddressInformation can have Inbound Aggregation Relationships cardinality relationship of c:cn. InstallationPointAddressInformation can be address information of an installation point corresponding to the ItemLocation. 5) to (transformed) business object UsedAddress can have an Associations for Navigation cardinality relationship of cn:c. UsedAddress can be master data or document specific address used for a ItemLocation. It can be possible to determine which of the two applies by means of the AddressHostTypeCode element. The instance of the TO UsedAddress can represent this address. In the former case the node ID of the node in the master data object can be determined via BusinessObjectTypeCode, AddressHostUUID and AddressHostTypeCode elements. In case changes to the TO UsedAddress take place, the master data address can be copied by the TO UsedAddress, the changes take place to the copy, and a corresponding DO Address is created at the ItemLocation via the ItemLocationAddress composition relationship. In the latter case the TO UsedAddress can represent the DO Address used at the ItemLocation via the ItemLocationAddress composition relationship.

There may only be one aggregation or one composition relationship to the Dependent Object Address. If an aggregation relationship to the Business Object Location exists, the LocationID element can be filled with the ID of the Business Object Location. Element PartyID can remain empty. If an aggregation relationship to the address of a party (representative of a business partner or OrganizationalCentre) exists, the PartyID attribute can be filled with the ID of the party. LocationID and InstallationPointID can remain empty. If there is an aggregation relationship to the address of an InstallationPoint, the InstallationPointID attribute can be filled with the ID of the InstallationPoint. LocationID and PartyID can remain empty.

In some implementations, there can be a DO ItemLocationAddress 33040. The dependent object Address can include the data necessary to describe a physical or logical location. The Dependent Object can be integrated into the CustomerInvoiceRequest business object by means of the ItemLocationAddress prefix.

ItemProduct

ItemProduct can identify, describe, and classify a product in an item of the CustomerInvoiceRequest. The elements located at the node ItemProduct can be defined by the data type CustomerInvoiceRequestItemProductElements derived from data type BusinessTransactionDocumentProductElements. Elements may include: ProductUUID, ProductID, ProductBuyerID, ProductBuyerID, ProductTypeCode, and CashDiscountDeductibleIndicator.

ProductUUID can be a universal identification, which may be unique of a product, and is optional. ProductUUID may be based on GDT UUID. ProductID can be the identification of the product, and is optional. ProductId may be based on GDT ProductID. ProductBuyerID can be an identifier of the product assigned by the buyer, and is optional. ProductBuyerID may be based on GDT ProductPartyID. ProductTypeCode can be a coded representation of the technical product type, and is optional. ProductTypeCode may be based on GDT ProductTypeCode. CashDiscountDeductibleIndicator can be an indicator that cash discount may be deducted for this product. CashDiscountDeductibleIndicator may be based on GDT Indicator Qualifier of CashDiscountDeductable.

There may be a number of Inbound aggregation relationships including: 1) from Business Object Material may be a cardinality relationship of c:cn. Material can be a material to be invoiced. 2) from Business Object ServiceProduct may be a cardinality relationship of c:cn. ServiceProduct can be a service to be invoiced.

ItemDeliveryTerms can be agreements that apply for the delivery of goods and services to be invoiced. The elements located at the node ItemDeliveryTerms can be defined by the data type CustomerInvoiceRequestItemDeliveryTermsElements derived from data type BusinessTransactionDocumentDeliveryTermsElements. The elements can include Incoterms. Incoterms can be the conventional contract formulations for the delivery terms. Incoterms may be based on GDT Incoterms. In some implementations, if no ItemProduct node exists for an item in the CustomerInvoiceRequest or if the ProductTypeCode element in the ItemProduct node does not refer to the value 1, ItemDeliveryTerms may not be specified or the node will be ignored. If no ItemDeliveryTerms are specified for an item, the values in the element of the DeliveryTerms node can be evaluated.

ItemPricingTerms can be agreements in the sales or service process that are exclusively required to determine the value of the CustomerInvoiceRequest item. The elements located at the node ItemPricingTerms can be defined by the data type CustomerInvoiceRequestItemPricingTermsElements derived from data type BusinessTransactionDocumentPricingTermsElements. These elements can include: PriceDateTime, PriceRecalculationTypeCode. PriceDateTime can be the date (and/or time) used to determine the price components for this item of the CustomerInvoiceRequest, and is optional. PriceDateTime may be based on GDT LOCALNORMALISED_DateTime Qualifier of Price. PriceRecalculationTypeCode can be the coded representation of the type of price re-calculation which is executed when the CustomerInvoiceRequest item is being invoiced, and is optional. PriceRecalculationTypeCode is GDT PriceRecalculationTypeCode.

ItemCustomerInvoiceItem

ItemCustomerInvoiceItem can specify the invoice item and quantity/value used to bill a CustomerInvoiceRequest item. The elements located at the node ItemCustomerInvoiceItem can be defined by the data type CustomerInvoiceRequestItemCustomerInvoiceItemElements. These elements can include: UUID, CustomerInvoiceID, ID, InvoicedQuantity, InvoicedQuantityTypeCode, InvoicedAmount, ReceivablesPropertyMovementDirectionCode, In some implementations, UUID can be a universal identifier, which may be unique, of a CustomerInvoice item which has been created for this request item. CustomerInvoiceID can be an identifier, which may be unique, for the CustomerInvoice that contains the referenced Item, and is optional. CustomerInvoiceID may be based on GDT BusinessTransactionDocumentID. ID can be an identifier, which can be unique, for an item in the previously referenced CustomerInvoice. ID may be based on GDT BusinessTransactionDocumentItemID. InvoicedQuantity can be the quantity used to invoice the referenced item in the CustomerInvoice, and is optional. InvoicedQuantity may be based on GDT Quantity Qualifier: Invoiced. InvoicedQuantityTypeCode can be a coded representation of the type of the invoiced quantity, and is optional. InvoicedQuantityTypeCode may be based on GDT QuantityTypeCode Qualifier of Invoiced. InvoicedAmount can be a value used to invoice the referenced item in the CustomerInvoice, and is optional. InvoicedAmount may be based on GDT Amount Qualifier of Invoiced. ReceivablesPropertyMovementDirectionCode can be a coded representation of the direction of the receivables change quantified by element InvoicedAmount, and is optional. ReceivablesPropertyMovementDirectionCode may be based on GDT PropertyMovementDirectionCode Qualifier of Receivables.

There may be a number of Incoming Aggregation Relationships including: 1) from business object CustomerInvoice may be a cardinality relationship of 1:cn. CustomerInvoice can be an invoice item created for the CustomerInvoiceRequest item.

In some implementations, if the InvoicedQuantity element is not specified, the InvoicedAmount can be specified. If InvoicedAmount is specified, ReceivablesPropertyMovementDirectionCode can be specified.

ItemBusinessTransactionDocumentReference

In some implementations, ItemBusinessTransactionDocumentReference refers to a business document item that is relevant for billing in the sales or service process. An ItemBusinessTransactionDocumentReference can occur in the following disjointed specializations: ItemSalesOrderItemReference, ItemServiceOrderItemReference, ItemServiceContractItemReference, ItemPurchaseOrderReference.

ItemSalesOrderItemReference can be a reference to a SalesOrder item which has been the basis for a business transaction document to be invoiced. ItemServiceOrderItemReference can be a reference to a ServiceOrder item which has been the basis for a business transaction document to be invoiced. ItemServiceContractItemReference can be a reference to a ServiceContract item which has been the basis for a business transaction document to be invoiced. ItemPurchaseOrderReference can be a reference to a PurchaseOrder which has been the basis for a business transaction document to be invoiced.

The elements located at the node ItemBusinessTransactionDocumentReference can be defined by the data type CustomerInvoiceRequestItemBusinessTransactionDocumentReferenceElements derived from data type BusinessTransactionDocumentReferenceElements. The elements may include: BusinessTransactionDocumentReference can be an identification, which may be unique, of a referenced business document (item) related to this CustomerInvoiceRequest item. BusinessTransactionDocumentReference may be based on GDT BusinessTransactionDocumentReference.

There may be a number of Inbound association relationships including: 1) from business object SalesOrder SalesOrderItemReference may be a cardinality relationship of c:cn. SalesOrderItemReference can be a sales order item for which the invoice item was created. 2) from business object ServiceOrder ServiceOrderItemReference may be a cardinality relationship of c:cn. ServiceOrderItemReference can be a service order item for which the invoice item was created. 3) from business object PurchaseOrder PurchaseOrderReference may be a cardinality relationship of c:cn. PurchaseOrderReference can be a purchase order or purchase order item on which the invoiced sales process is based. 4) from business object ServiceContract ServiceContractItemReference may be a cardinality relationship of c:cn. ServiceContractItemReference can be a service contract item for which the invoice item was created.

For the Reference element, ItemID may be specified in GDT: BusinessTransactionDocumentReference except for an PurchaseOrderReference. The references to business documents on which the CustomerInvoiceRequest is based may not be specified in the ItemBusinessTransactionDocumentReference, as this information may already exists in the form of the BaseBusinessTransactionDocumentID and BaseBusinessTransactionDocumentItemID elements of the CustomerInvoiceRequest and Item nodes.

There can be a DO ItemAttachmentFolder. AttachmentFolder can be a collection of documents that are assigned to the CustomerInvoiceRequest item. The Dependent Object can be integrated into the CustomerInvoiceRequest business object by means of the ItemAttachmentFolder prefix There can be a DO ItemTextCollection. A TextCollection can be a set of all multilingual textual descriptions including formatting information for a CustomerInvoiceRequest item. The Dependent Object can be integrated into the CustomerInvoiceRequest business object by means of the ItemTextCollection prefix.

Message Types and their Signature

Figures 1, 34:
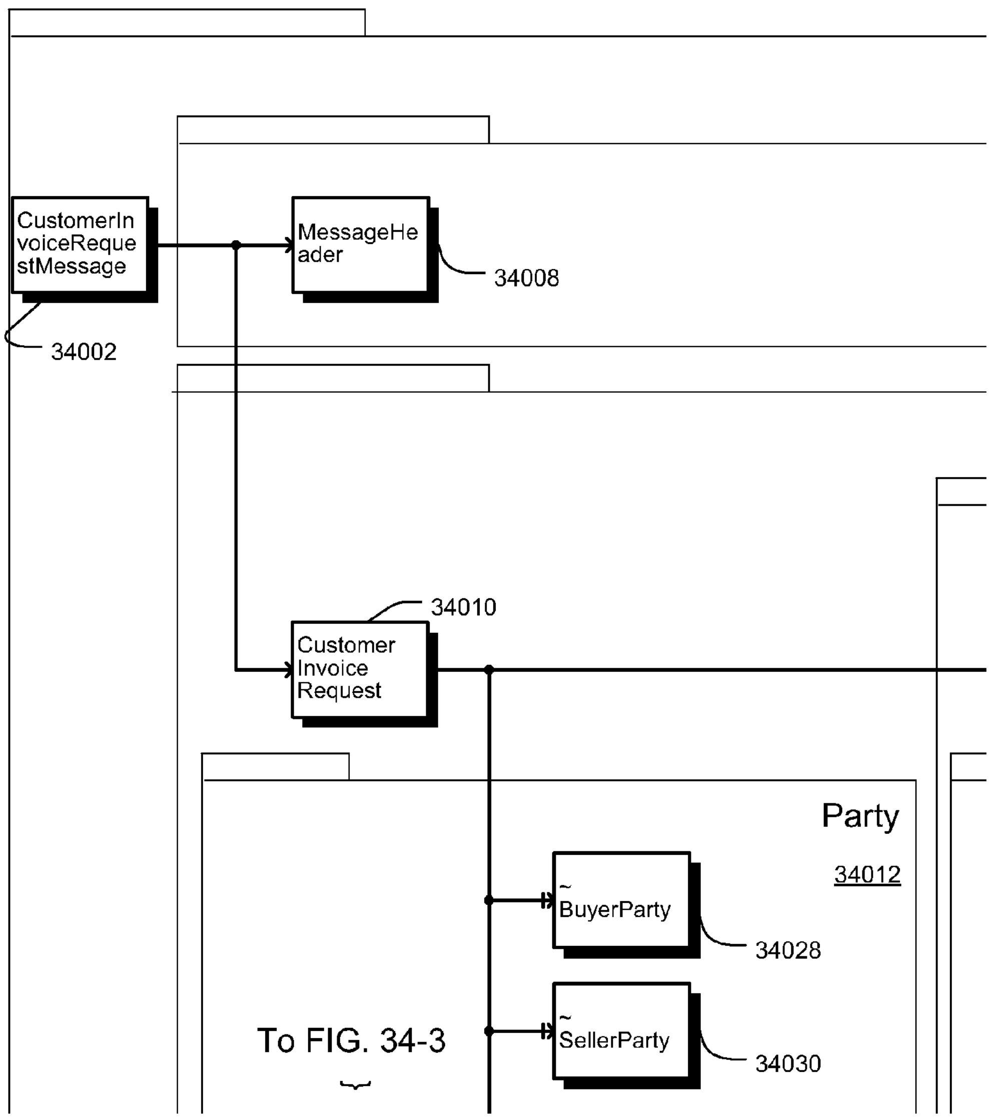
Figures 2, 34:
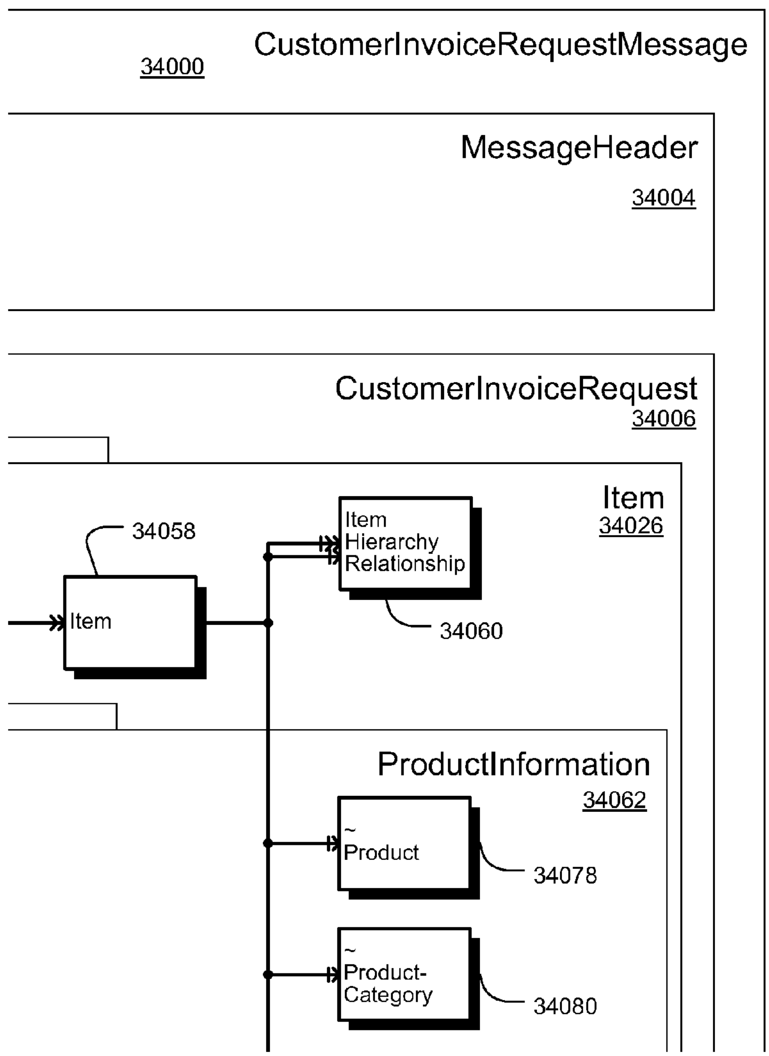
Figures 3, 34:
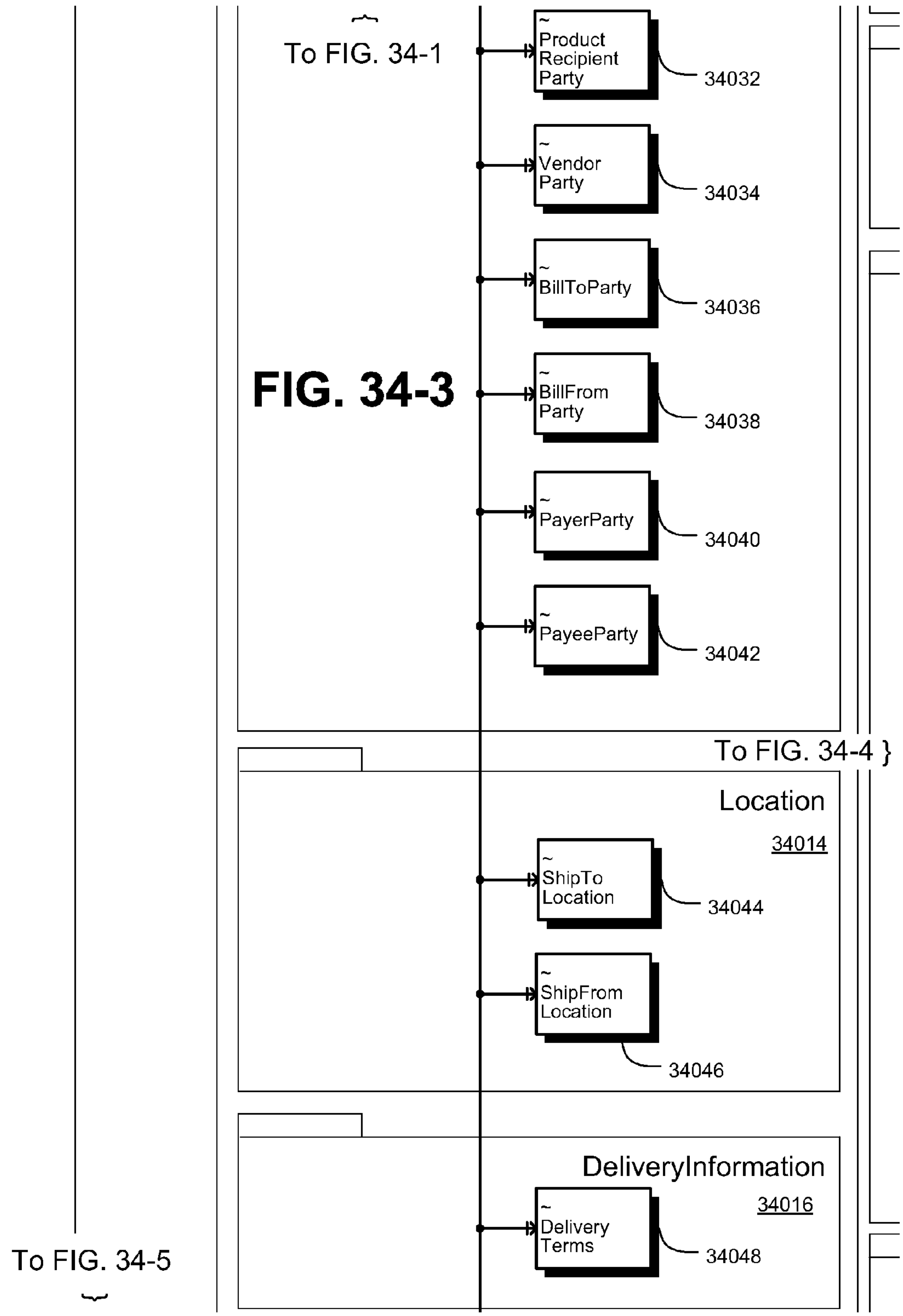
Figures 4, 34:
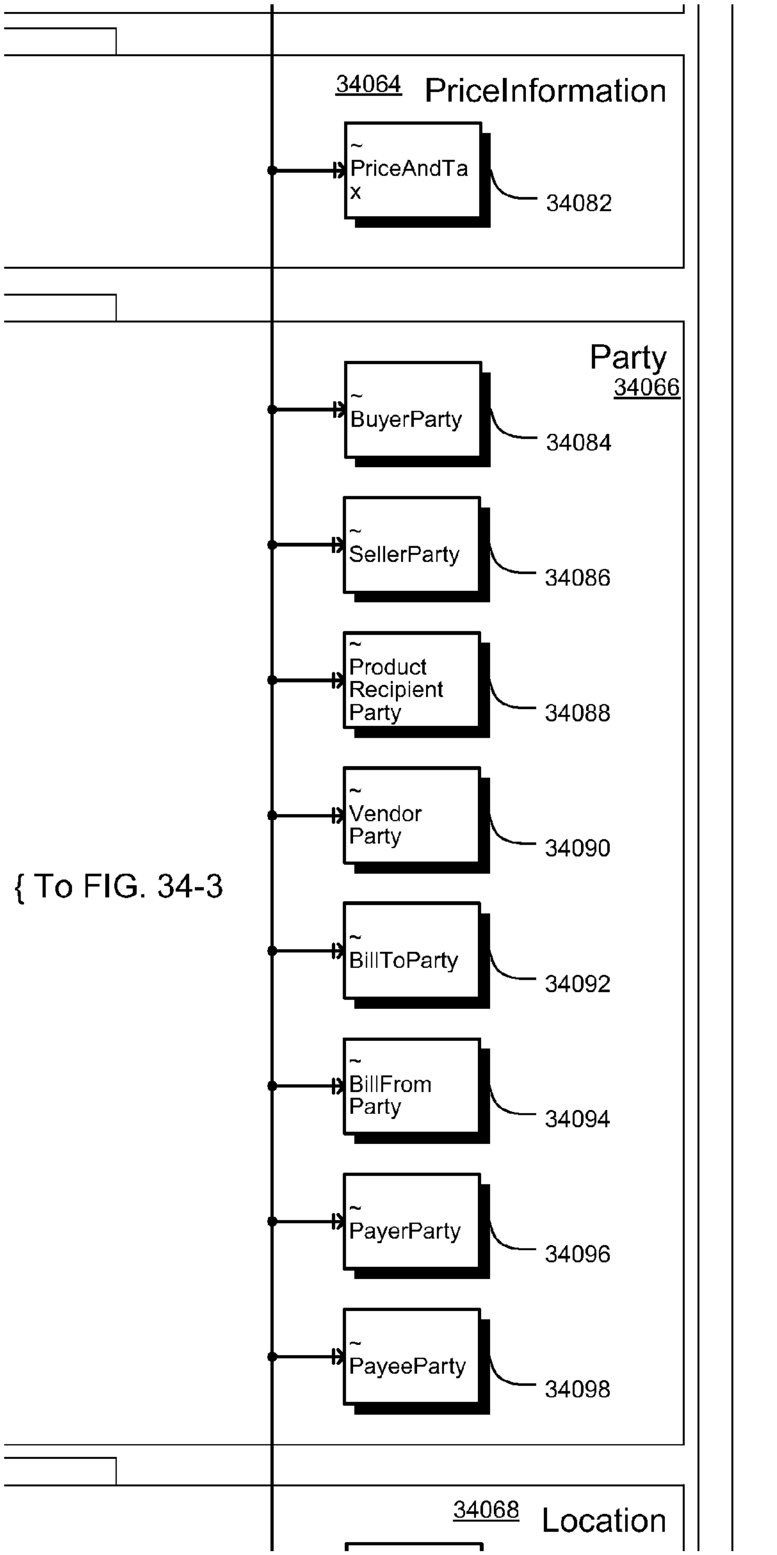
Figures 5, 34:
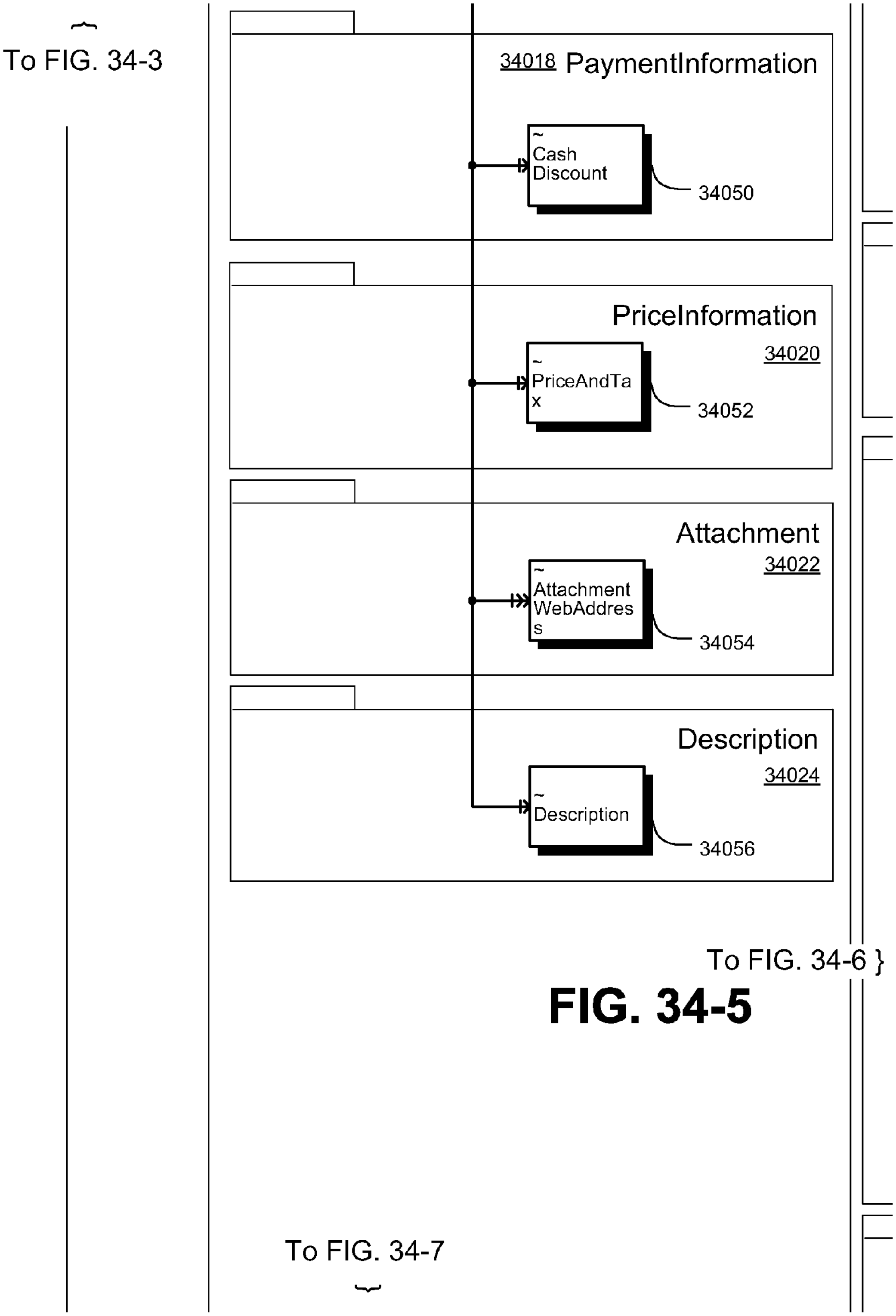
Figures 6, 34:
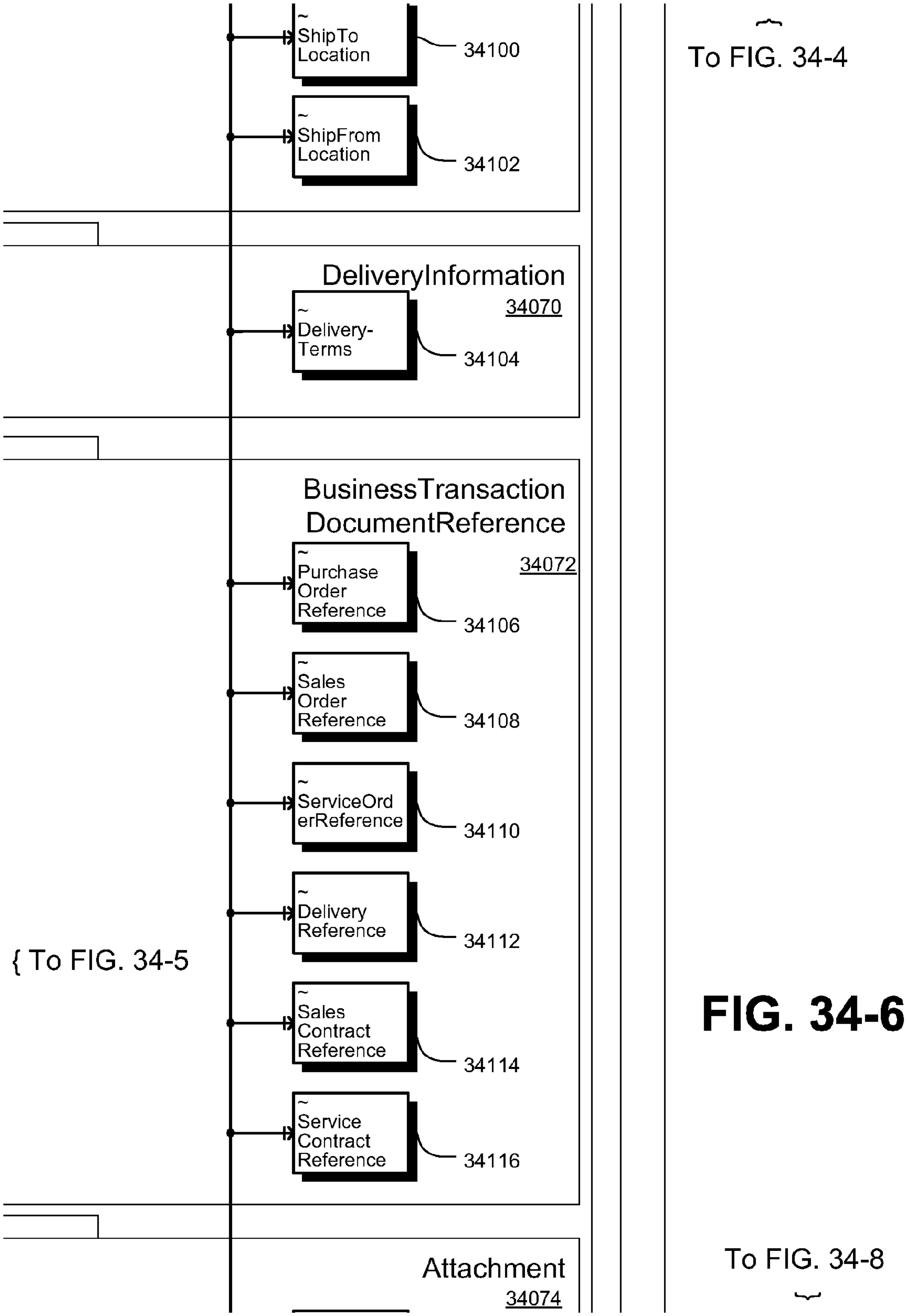
Figures 7, 34:
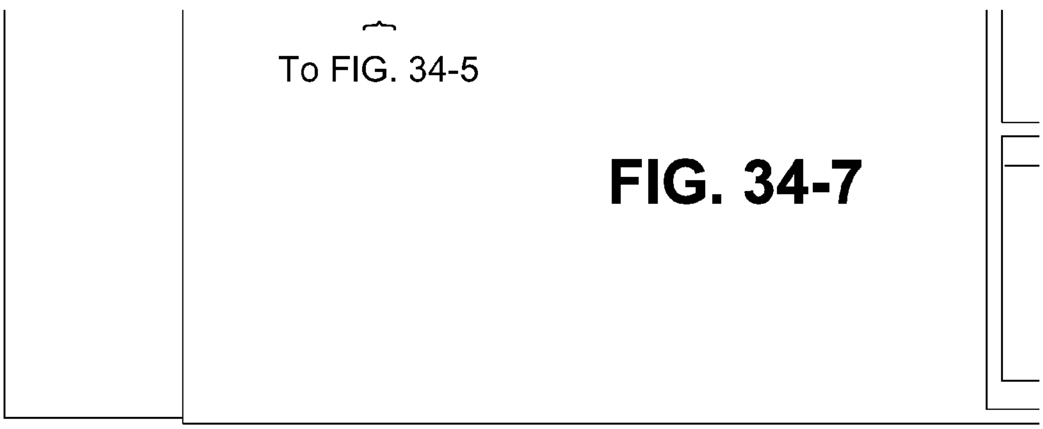
Figures 8, 34:
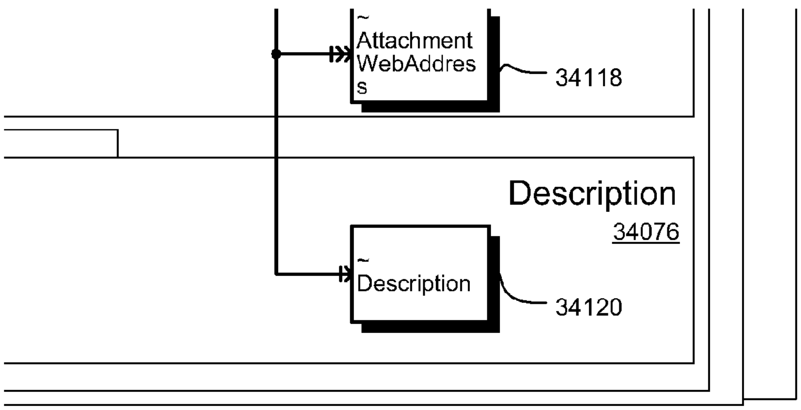

FIG. 34-1 through 34-5 illustrates one example logical configuration of CustomerInvoiceRequestMessage message 34000. Specifically, this figure depicts the arrangement and hierarchy of various components such as one or more levels of packages, entities, and datatypes, shown here as 34000 though 34120. As described above, packages may be used to represent hierarchy levels. Entities are discrete business elements that are used during a business transaction. Data types are used to type object entities and interfaces with a structure. For example, CustomerInvoiceRequestMessage message 34000 includes, among other things, CustomerInvoiceRequest 34006. Accordingly, heterogeneous applications may communicate using this consistent message configured as such.

Figures 35, 55:
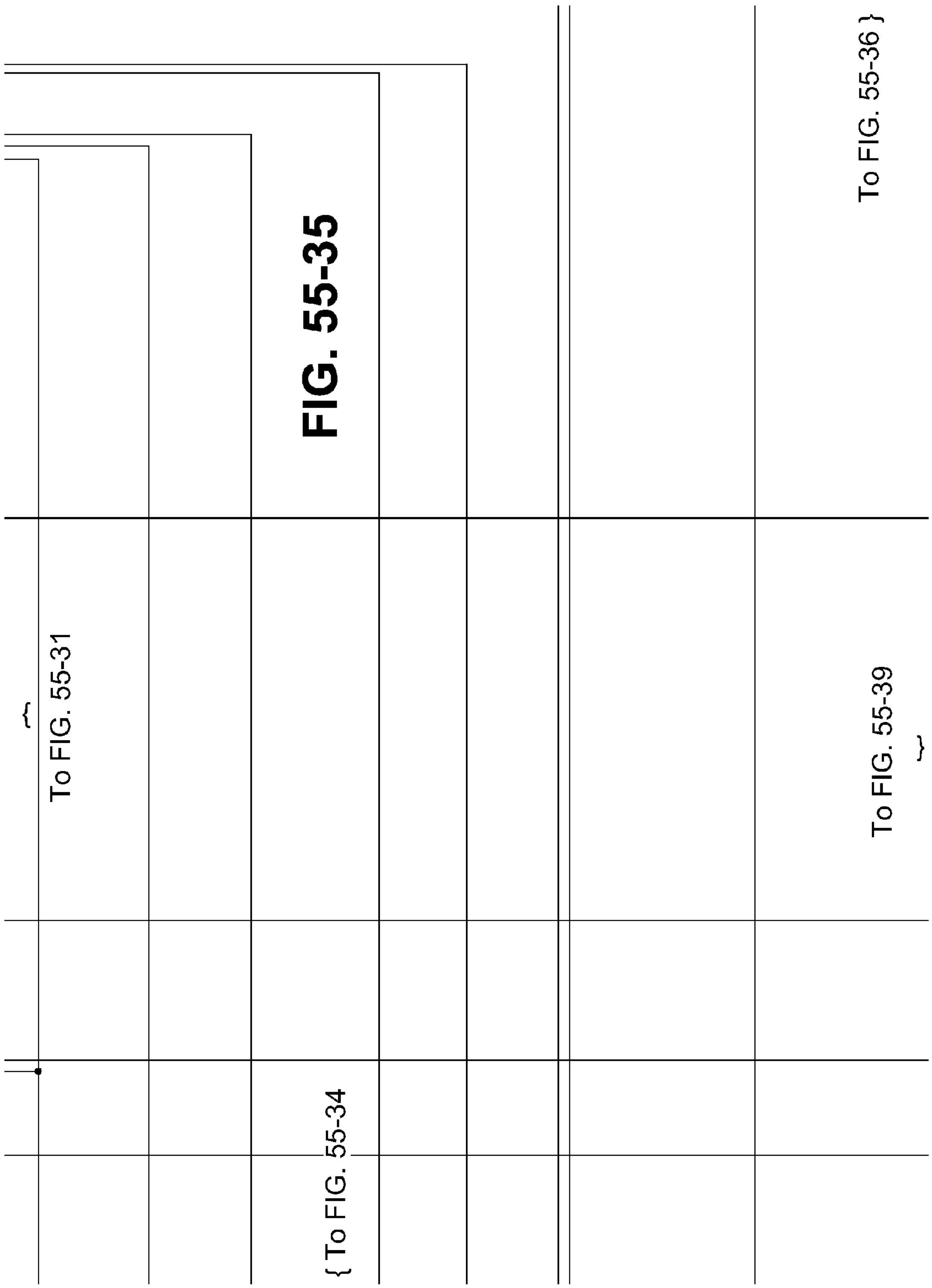
Figures 36, 55:
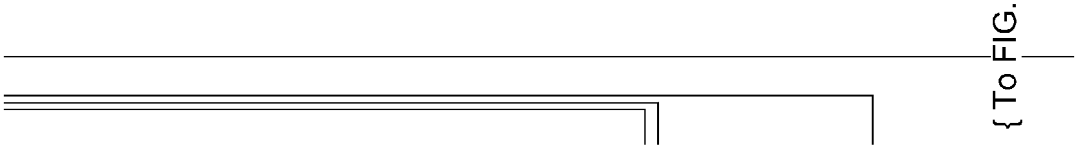

FIG. 35-1 through 35-29 illustrates one example logical configuration of CustomerInvoiceRequestMessage message 35000. Specifically, this figure depicts the arrangement and hierarchy of various components such as one or more levels of packages, entities, and datatypes, shown here as 35000 through 35802. As described above, packages may be used to represent hierarchy levels. Entities are discrete business elements that are used during a business transaction. Data types are used to type object entities and interfaces with a structure. For example, CustomerInvoiceRequestMessage message 35000 includes, among other things, CustomerInvoiceRequest 35014. Accordingly, heterogeneous applications may communicate using this consistent message configured as such.

The following document describes the message type CustomerInvoiceRequest which is derived from the operations of the business object and its signatures. The message type CustomerInvoiceRequestRequest is an interface, that transmits information about a business transaction to be settled to the process component CustomerInvoiceProcessing (invoice document creation). In this document, the term "settlement" refers to the creation of invoice documents (outgoing invoices and credit and debit memos). The message data type defines the structure of the message type CustomerInvoiceRequestRequest.

Motivating Business Scenario

The message type CustomerInvoiceRequestRequest is motivated among others by the business scenarios SellFromStock (SFS) and ServiceRequestAndOrderManagement. After a sales order has been created in the process component SalesOrderProcessing (DU CRM) or a service order in the process component ServiceOrderProcessing (DU CRM) respectively, the elements of the contract that are relevant for invoicing are transmitted to the process component CustomerInvoiceProcessing (DU CustomerInvoicing). This enables contract-related creation of customer invoices to be carried out. After the appropriate deliveries have been made and the relevant goods issues have been posted, the logistics data (with reference to the order) are transmitted from the process component OutboundDeliveryProcessing (DU LogisticsExecution) to the process component CustomerInvoiceProcessing (DU CustomerInvoicing). Then delivery-related creation of customer invoices can be carried out for the order.

The message type CustomerInvoiceRequestRequest represents the mandatory request to an application, to perform the further customer invoice process by means of the transmitted settlement relevant data. The message type CustomerInvoiceRequestRequest is based on the message data type The message type CustomerInvoiceRequestRequest is used in the following operations of service interfaces: SalesOrderProcessingRequestInvoicingOut, OutboundDeliveryProcessingRequestInvoicingOut, ServiceOrderProcessingRequestInvoicingOut, ServiceRequestProcessingRequestInvoicingOut, ServiceConfirmationProcessingRequestInvoicingOut, ServiceContractProcessingRequestInvoicingOut, CustomerComplaintProcessingRequestInvoicingOut, CustomerReturnProcessingRequestInvoicingOut.

It is used for the following business transactions: Invoice creation based on contract data (e.g., credit memo requests debit memo requests, etc.), Invoice creation of delivery data with reference to contract data (e.g., a standard order with order items relevant for delivery), Invoice creation of delivery data without reference to contract data, Invoice creation of contract data (such as a standard order) in accordance with the delivery quantities (general delivery data).

The message data type CustomerInvoiceRequestMessage contains: the object CustomerInvoiceRequest contained in the business document, the business information that is relevant for sending a business document in a message. It contains the packages MessageHeader Package and CustomerInvoiceRequest Package. The message data type CustomerInvoiceRequestMessage provides the structure for the message type CustomerInvoiceRequestRequest and the interfaces based on it.

A MessageHeader Package groups the business information, which is relevant for sending the business document in a message. It contains the entity: MessageHeader.

Grouping of business information from the view of the application may include: Identification of the business document in a message, Information about the sender, Information about the recipient (optional). The MessageHeader is of the type GDT: BusinessDocumentMessageHeader The CustomerInvoiceRequest package groups all information that is required for a settlement (creation of invoice documents). It contains the packages: BusinessProcessVariantPackage, Party Package, Location Package, SalesAndServiceBusinessArea Package, DeliveryInformation Package, CashDiscountInformation Package, PriceInformation Package, AttachmentFolder Package, TextCollection Package, Item Package.

A CustomerInvoiceRequest summarizes all details about a business transaction that are relevant for settling this business transaction, where settling means the creation of invoice documents. The CustomerInvoiceRequest consists of CustomerInvoiceRequestItems, which represent items in the base business document for the future settlement. A CustomerInvoiceRequestItem usually consists of information about the quantity of a product that has been ordered or delivered, as well as the business partners, locations, terms of delivery and payment involved and the other business documents to be taken into account when the product is settled.

Data that applies to (almost) all CustomerInvoiceRequestItems can also be entered directly at header level.

A CustomerInvoiceRequest is characterized by the following attributes: reconciliationPeriodCounterValue—Counter for a reconciliation period (A reconciliation period is the time between two consecutive reconciliation messages in the same sequence context), It is of GDT type CounterValue and, in some implementations, can have a Qualifier of ReconciliationPeriod. ActionCode is a Coded representation of an instruction to the recipient of a message of type CustomerInvoiceRequestRequest telling whether to save or remove the CustomerInvoiceRequestRequest. It is of GDT type ActionCode; ItemListCompleteTransmissionIndicator specifies whether all the items in the base business document for the CustomerInvoiceRequest are to be transmitted (items that are not transmitted are implicitly classed as canceled) or whether only new items or items that have been changed since the last transmission are to be transmitted. ItemListCompleteTransmissionIndicator may be based on GDT Indicator and, in some implementations, can have a Qualifier of CompleteTransmission.

It also contains the following elements: BaseBusinessTransactionDocumentID—Unique identifier for a base business document for the CustomerInvoiceRequest. BaseBusinessTransactionDocumentID may be based on GDT BusinessTransactionDocumentID. BaseBusinessTransactionDocumentUUID is internally assigned, universally unique identifier for a base business document for the CustomerInvoiceRequest. BaseBusinessTransactionDocumentID may be based on GDT UUID. BaseBusinessTransactionDocumentTypeCode is a coded representation of the type of the base business document for the CustomerInvoiceRequest. The types sales order, service order, service request, service confirmation and (outgoing) delivery are currently relevant for the message type CustomerInvoiceRequestRequest. BaseBusinessTransactionDocumentTypeCode may be based on GDT BusinessTransactionDocumentTypeCode. SettlementBlockedIndicator specifies whether the settlement for the transmitted data of the business transaction is blocked. SettlementBlockedIndicator may be based on GDT Indicator and, in some implementations, can have a Qualifier of SettlementBlocked. BaseInvoicingBlockingReasonCode is a coded representation of the reason why invoicing has been blocked for the underlying business document. BaseInvoicingBlockingReasonCode may be based on GDT InvoicingBlockingReasonCode. CancellationReasonCode is a coded representation of the rejection reason for a business transaction. CancellationReasonCode may be based on GDT CancellationReasonCode. SettlementPriorityCode is a coded representation of the urgency of a settlement. SettlementPriorityCode may be based on GDT BusinessTransactionPriorityCode. ProposedInvoiceDate is the date for the business document (invoice, credit memo, debit memo, etc.). ProposedInvoiceDate may be based on GDT Date and, in some implementations, can have a Qualifier of ProposedInvoice.

In order to ensure a complete data transmission as well a transmission of change data, only the value "false" is allowed for the attribute itemListCompleteTransmissionIndicator. Exception: If the value of the attribute reconciliationIndicator of the package MessageHeader is "true", a complete data transmission is processed per se. In this specific context situation, the value of the attribute itemListCompleteTransmissionIndicator is ignored.

The smooth semantic is used for the interpretation of the attribute actionCode (values "04"/"05"), since the receiving process components persist the transmitted data of items, which are relevant for settlement. The attribute actionCode follows a default logic. actionCode "04" (SAVE) is interpreted by the receiving application as a change statement for the items to be transmitted, provided that they have already been transmitted by a previous message. If this is not the case, the transmitted items are created. actionCode "05" (REMOVE) signalizes to the receiving application that item transmitted previously for a business transaction (and cancelled now) are not relevant for settlement any more.

The attribute actionCode follows a default logic: The actionCode on CustomerInvoiceRequest-level holds for all corresponding actionCodes on CustomerInvoiceRequestItem-level, for which no values have been transmitted. If no actionCode has been transmitted on CustomerInvoiceRequest-level, the actionCode "04" (SAVE) is supposed.

In case of an actionCode "05" the receiving application has to decide, whether data already transmitted for a business transaction is disregarded with respect to further settlement or—in case of a settlement already done—revoked using a cancellation or credit memo.

If the element SettlementPriority is used, the highest level of priority (Code '1') denotes immediate or direct creation of customer invoices. All other levels of priority denote background/online creation of invoices rather than immediate billing creation.

Usually the base business transaction for an CustomerInvoiceRequestMessage is an order or a delivery.

The BusinessProcessVariant package defines the way of processing of a CustomerInvoiceRequest within the process component from a business point of view. It contains the following entity: BusinessProcessVariantType.

The entity BusinessProcessVariantType defines the character of a business process variant of the CustomerInvoiceRequest. It contains the elements: BusinessProcessVariantTypeCode, MainIndicator. BusinessProcessVariantTypeCode is a coded representation of a business process variant type of a CustomerInvoiceRequest. BusinessProcessVariantTypeCode may be based on GDT BusinessProcessVariantTypeCode. MainIndicator specifies whether the current BusinessProcessVariantTypeCode is the main one or not. MainIndicator may be based on GDT Indicator and, in some implementations, can have a Qualifier of Main.

The Party package groups all business partners that might be involved in a settlement.

It contains the entities: BuyerParty, SellerParty, ProductRecipientParty, Vendor Party, BillToParty, BillFromParty, PayerParty, PayeeParty, EmployeeResponsibleParty.

Default logic is used for all business partners: business partners that are specified at CustomerInvoiceRequest level are used for all the items for which a corresponding partner is not explicitly transmitted. The default logic applies for the partner as a whole, including the contact person. Parts of a partner cannot be specified in more detail at item level. The default logic is only a simplified version of the transmitted message. In terms of logic, partners at CustomerInvoiceRequest level behave as if they have been explicitly transmitted for all the items of the message.

A BuyerParty is a company or person that purchases goods or services. BuyerParty is of type It is of GDT type BusinessTransactionDocumentParty, where only the "InternalID" is used. BuyerParty can be entered for a settlement and can therefore be specified at InvoiceDue or InvoiceDueItem level in the message if the BusinessTransactionDocumentTypeCode element refers to a business transaction of type order or purchase order. BuyerParty can also fulfill the functions of the ProductRecipientParty, BillToParty or PayerParty. A SellerParty is a company or person that sells goods or services. SellerParty is of type It is of GDT type BusinessTransactionDocumentParty, where only the "InternalID" is used. SellerParty can also fulfill the functions of Vendor Party, BillFromParty or PayeeParty. SellerParty can be entered for a settlement and can therefore be specified at CustomerInvoiceRequest or CustomerInvoiceRequestItem level in the message if the BusinessTransactionDocumentTypeCode element refers to a business transaction of type order or purchase order. A ProductRecipientParty is a company or person to whom goods are delivered or for whom services are provided. ProductRecipientParty is of type It is of GDT type BusinessTransactionDocumentParty, where only the "InternalID" is used. If no ShipToLocation is explicitly specified, the ProductRecipientParty address is the delivery address. If no ProductRecipientParty is explicitly specified, the BuyerParty acts as ProductRecipientParty. A Vendor Party is a company or person that delivers goods or provides services. Vendor Party is of type It is of GDT type BusinessTransactionDocumentParty, where only the "InternalID" is used. If no ShipFromLocation is explicitly specified, the Vendor Party address is the ship-from address. If no Vendor Party is explicitly specified, SellerParty is also Vendor Party (A Vendor Party is not the company or person that is solely responsible for transporting the goods). A BillToParty is a company or person to which the invoice for goods or services is sent. BillToParty is of type It is of GDT type BusinessTransactionDocumentParty, where only the "InternalID" is used. If no BillToParty is explicitly specified, the BuyerParty acts as BillToParty. A BillFromParty is a company or person that draws up the invoice for goods or services. BillFromParty is of type It is of GDT type BusinessTransaction- DocumentParty, where only the "InternalID" is used. If no BillFromParty is explicitly specified, the SellerParty acts as BillFromParty. A PayerParty is a company or person that pays for goods or services. PayerParty is of type It is of GDT type BusinessTransactionDocumentParty, where only the "InternalID" is used. If no PayerParty is explicitly specified, the BillToParty acts as PayerParty. A PayeeParty is a company or person that receives payment for goods or services. PayeeParty is of type It is of GDT type BusinessTransactionDocumentParty, where only the "InternalID" is used. If no PayeeParty is explicitly specified, the BillFromParty acts as PayeeParty. A EmployeeResponsibleParty is a person (employee) that is responsible for the underlying business document. EmployeeResponsibleParty is of type It is of GDT type BusinessTransactionDocumentParty.

The Location package groups all locations that can occur in a settlement. It contains the following entities: ShipToLocation, ShipFromLocation, ServicePointLocation. Default logic is used for all locations: locations that are specified at CustomerInvoiceRequest level are used for all items for which corresponding locations are not explicitly transmitted. ShipToLocation, ShipFromLocation and ServicePointLocation can be used to provide a detailed description of the flow of goods (between the ship-to location and the ship-from location). In specific countries, this detailed information is required for calculating taxes (e.g., United States).

A ShipToLocation is the place to which goods are shipped. ShipToLocation is of type It is of GDT type BusinessTransactionDocumentLocation. A sold-to party (BuyerParty) headquartered in California in the US orders steel beams for a building. The construction site (ShipToLocation) for the building is located in Arizona. The tax amount is calculated using the tax rates that apply in Arizona. ShipFromLocation A ShipFromLocation is the place from which goods are shipped. ShipFromLocation is of type It is of GDT type BusinessTransactionDocumentLocation. ServicePointLocation A ServicePointLocation is the place where services are or have been provided. ServicePointLocation is of type It is of GDT type BusinessTransactionDocumentLocation.

The SalesAndServiceBusinessArea package groups information about the business or service specific area within an enterprise that is valid for an underlying sales or service business transaction document of this CustomerInvoiceRequest. This information comprises, for example, sales organization, service organization, sales office. It contains the following entities: Sales Organisation, Sales Group, Sales Office, Distribution Channel, Service Organisation.

A Sales Organisation is an organisational centre that structures the company according to its sales requirements. A sales organization is responsible for selling materials and services. It contains the elements: SalesOrganisationID is an identifier for the sales organization that is responsible for the underlying business transaction document. SalesOrganisationID may be based on GDT OrganisationalCentreID. SalesOrganisationUUID is an universal identifier, which may be unique, for the sales organization. It is of GDT type UUID.

A sales group is an organizational centre that performs and is responsible for sales transactions. It contains the elements: SalesGroupID is an identifier for the sales group that is responsible for the underlying business transaction document. SalesGroupID may be based on GDT OrganisationalCentreID. SalesGroupUUID is an universal identifier, which may be unique, for the sales group. SalesGroupID may be based on GDT UUID.

A sales office is an organizational center in a geographical area of a sales organization. A sales office establishes contact between the firm and the regional market. It contains the elements: SalesOfficeID, and SalesOfficeUUID. SalesOfficeID is an identifier for the sales office that is responsible for the underlying business transaction document. SalesOfficeID may be based on GDT OrganisationalCentreID. SalesOfficeUUID is an universal identifier, which may be unique, for the sales office. SalesOfficeUUID may be based on GDT UUID.

A Distribution Channel describes through which saleable materials or services reach customers. It contains the element: DistributionChannelCode. DistributionChannelCode is a coded representation of the distribution channel by which goods and services reach customers. DistributionChannelCode may be based on GDT DistributionChannelCode.

A Service Organisation is an organizational centre where services are planned and prepared. The service organization is responsible for the commercial success within an existing organizational structure. It contains the elements: ServiceOrganisationID, and ServiceOrganisationUUID.

ServiceOrganisationID is an identifier for the service organization that is responsible for the underlying business transaction document. ServiceOrganisationID may be based on GDT OrganisationalCentre. ServiceOrganisationUUID is an universal identifier, which may be unique, for the service organization. ServiceOrganisationUUID may be based on GDT UUID.

The DeliveryInformation package groups all information for a required delivery in the settlement.

It contains the entity: DeliveryTerms. The default logic used for DeliveryTerms is similar to that used for Parties.

DeliveryTerms are the conditions and agreements that are valid for executing the delivery and transporting the ordered goods and for the necessary services and activities. DeliveryTerms are type It is of GDT type DeliveryTerms. Of the DeliveryTerms, Incoterms and transport can be used for material items only. The default logic takes Incoterms and transport into account for material items only. For all other items, Incoterms and transport are ignored.

The PaymentInformation package groups due and payment information in the settlement.

It contains the entity: CashDiscount.

The CashDiscountTerms are the terms of payment (cash discount rates and payment deadlines). It contains the elements: CashDiscountTerms, and CashDiscountLevel. CashDiscountTerms describes the Ad-Hoc-terms of payment. CashDiscountTerms may be based on GDT CashDiscountTerms. CashDiscountLevel indicates the selected period allowed for payment (Maximum discount, normal discount or net payment). CashDiscountLevel may be based on GDT CashDiscountLevel. If neither the component CashDiscountTermsCode nor other components of the element CashDiscountTerms are filled, a payment has to be effective until the PaymentBaseLineDate (fixed at the time of invoice creation) without deductions. If terms of payment are valid, which are different from a CashDiscountTermsCode, all other components of the element CashDiscountTerms have to be filled explicitly. In that case, a transmitted value of the element CashDiscountTermsCode is not evaluated.

The PriceInformation package summarizes all the information about the total amount to be settled for products and services and details all the tax price components.

It contains the entity: PriceAndTax, PricingTerms, TaxationTerms.

The PriceAndTax contains the total amount to be settled for products and services, including tax and net portions, and groups information for copying the price components of a business transaction and a price recalculation. PriceAndTax contains the elements: GrossAmount, NetAmount, TaxAmount. GrossAmount is the invoice amount; net amount plus tax amount. Gross It is of GDT type Amount. NetAmount is the net invoice amount. NetAmount may be based on GDT Amount. TaxAmount is the tax amount of an invoice. TaxAmount may be based on GDT Amount. The gross, net and tax amounts can be specified in the same currency.

PricingTerms are agreements in the sales or service process, which are needed exclusively to determine the net value of a CustomerInvoiceRequest. PricingTerms contains the elements: PricingProcedureCode, and PricingDateTime.

PricingProcedureCode is a coded representation of the procedure for the price recalculation of a business transaction. PricingProcedureCode may be based on GDT PricingProcedureCode. PricingDateTime is a date (and time) used to determine the price components for this CustomerInvoiceRequest. PricingDateTime may be based on GDT LOCALNORMALISED_DateTime. If a following currency is specified in the ExchangeRate element, the following currency can be the same as the currency in the gross/net/tax amount of the entity PriceAndTax.

In some implementations, If the ExchangeRate element is not specified at all, the currency of the gross/net amount is set as the following and leading currency (in this case, the exchange rate would be set to the uniform rate). Specifying currencies at header level is optional. If they are specified, they can be the same as the currencies specified at item level. Currencies (following and leading currency) for a settlement do not have to be specified unless the entities SalesOrderReference, ServiceOrderReference, ServiceRequestReference or ServiceConfirmationReference are not specified (filled with values) at CustomerInvoiceRequestItem level in the BusinessTransactionDocumentReference package.

TaxationTerms are agreements that are required exclusively for the taxation of the invoiced goods and services. TaxationTerms contains the elements: SellerTaxID, SellerTaxIdentificationNumberTypeCode, BuyerTaxID, BuyerTaxIdentificationNumberTypeCode, EuropeanCommunityVATTriangulationIndicator, ProvisionDate, TaxDueDate. SellerTaxID is the seller's identifier assigned by the tax authorities. SellerTaxID may be based on GDT PartyTaxID. SellerTaxIdentificationNumberTypeCode is a coded representation of the type of SellerTaxID. SellerTaxIdentificationNumberTypeCode may be based on GDT TaxIdentificationNumberTypeCode. BuyerTaxID is the buyer's identifier assigned by the tax authorities. BuyerTaxID may be based on GDT PartyTaxID. BuyerTaxIdentificationNumberTypeCode is a coded representation of the type of BuyerTaxID. BuyerTaxIdentificationNumberTypeCode may be based on GDT TaxIdentificationNumberTypeCode. EuropeanCommunityVATTriangulationIndicator is an indicator for whether the underlying business transaction is an EU triangulation. EuropeanCommunityVATTriangulationIndicator may be based on GDT Indicator and, in some implementations, can have a Qualifier of EuropeanCommunityVATTriangulation. ProvisionDate is a specific point in time where invoiced goods or services have been provided from a taxation point of view. ProvisionDate may be based on GDT Date and, in some implementations, can have a Qualifier of Provision. TaxDueDate is the date where taxes are supposed to be due based on legal requirements. TaxDueDate may be based on GDT Date and, in some implementations, can have a Qualifier of TaxDue.

The AttachmentFolder package groups all attachment information regarding the settlement process. It contains the entity: AttachmentWebURI.

The AttachmentWebURI is a web address for a document of any type that relates to a settlement. AttachmentWebURI is of type It is of GDT type AttachmentWebURI.

The TextCollection package groups all text information regarding the entire settlement process.

It contains the entity: TextCollection.

The TextCollection is collection of all textual descriptions provided by and valid for the entire business transaction to be settled. TextCollection is of type It is of GDT type TextCollection.

The CustomerInvoiceRequestItem package groups item information from the basic business document for the future settlement. It contains the packages: BusinessProcessVariant Package, ProductInformation Package, PriceInformation Package, Party Package, Location Package, DeliveryInformation Package, BusinessTransactionDocumentReference Package, AttachmentFolder Package, TextCollection Package.

A CustomerInvoiceRequestItem summarizes all information from a business document item that is to be taken into account in the future settlement. The CustomerInvoiceRequestItem typically consists of information about the quantity of a product that has been ordered or delivered, as well as business partners, locations, terms of delivery and payment conditions and the other business documents to be taken into account when the product is settled. A CustomerInvoiceRequestItem is characterized by the attribute: ActionCode which is a coded representation of an instruction to the recipient of a message of type CustomerInvoiceRequestRequest telling whether to save or remove the CustomerInvoiceRequestItem. ActionCode may be based on GDT ActionCode. A CustomerInvoiceRequestItem may contain the following elements: BaseBusinessTransactionDocumentItemID, BaseBusinessTransactionDocumentItemTypeCode, BaseBusinessTransactionDocumentItemUUID, SettlementBlockedIndicator, BaseItemInvoicingBlockingReasonCode, CancellationReasonCode, ReceivablesPropertyMovementDirectionCode, ProposedCustomerInvoiceProcessingTypeCode, PricingRelevanceIndicator, CashDiscountDeductibleIndicator, ProposedInvoiceDate. BaseBusinessTransactionDocumentItemID is an identifier, which may be unique, for the item in the base business document for the CustomerInvoiceRequest. BaseBusinessTransactionDocumentItemID may be based on GDT BusinessTransactionDocumentItemID. BaseBusinessTransactionDocumentItemTypeCode is a coded representation of the type of the item in which the base business document for the CustomerInvoiceRequest is stored. Currently, the types sales order item, service order item, service request item, service confirmation item and delivery item are relevant for the message type CustomerInvoiceRequestRequest. BaseBusinessTransactionDocumentItemTypeCode GDT BusinessTransactionDocumentItemTypeCode.

BaseBusinessTransactionDocumentItemUUID is internally assigned, universally unique identifier for the item in the base business document for the CustomerInvoiceRequest. BaseBusinessTransactionDocumentItemUUID may be based on GDT UUID. SettlementBlockedIndicator specifies whether the settlement for the transmitted data is blocked. SettlementBlockedIndicator may be based on GDT Indicator and, in some implementations, can have a Qualifier of SettlementBlocked. BaseItemInvoicingBlockingReasonCode is a coded representation of the reason why invoicing has been blocked for the item of the underlying business document. BaseItemInvoicingBlockingReasonCode may be based on GDT InvoicingBlockingReasonCode. CancellationReasonCode is a coded representation of a rejection reason for the item of a business transaction. CancellationReasonCode may be based on GDT CancellationReasonCode. ReceivablesProperty- MovementDirectionCode specifies whether an item of a CustomerInvoice document based on this CustomerInvoiceRequestItem would increase or decrease receivables. ReceivablesPropertyMovementDirectionCode may be based on GDT PropertyMovementDirectionCode and, in some implementations, can have a Qualifier of Receivables. ProposedCustomerInvoiceProcessingTypeCode is a proposal for the processing type of a CustomerInvoice. TheCustomerInvoiceItem, based on this CustomerInvoiceRequestItem, shall be part of the CustomerInvoice. ProposedCustomerInvoiceProcessingTypeCode may be based on GDT BusinessTransactionDocumentProcessingTypeCode. PricingRelevanceIndicator indicates, whether a price recalculation shall be done for the item. PricingRelevanceIndicator may be based on GDT Indicator and, in some implementations, can have a Qualifier of PricingRelevance. CashDiscountDeductibleIndicator indicates whether a discount can be deducted from the corresponding product tax. CashDiscountDeductibleIndicator may be based on GDT Indicator and, in some implementations, can have a Qualifier of CashDiscountDeductible. ProposedInvoiceDate is the date for the business document (invoice, credit memo, debit memo, etc.). ProposedInvoiceDate may be based on GDT Date and, in some implementations, can have a Qualifier of ProposedInvoice.

In some implementations, the elements BaseBusinessTransactionDocumentItemID, BaseBusinessTransactionDocumentItemTypeCode and SettlementRelevanceIndicator can always be specified (except in the case of group hierarchy items). The soft semantic (ActionCodes “04”/“05”) is used for the ActionCode, since the applications receiving the data contain the data subject to settlement from the transmitted item. ActionCode “04” (SAVE) is interpreted by the receiving statement as a change statement for the item to be transmitted, provided that this has already been transmitted by a previous message. If this is not the case, the transmitted item is created. The ActionCode “05” (REMOVE) signalizes to the receiving application that item transmitted previously for a business transaction (and cancelled now) are not relevant for settlement any more. Default logic is used for the elements SettlementBlockedIndicator and ActionCode. If values are not transmitted at CustomerInvoiceRequestItem level, the values from the CustomerInvoiceRequest level are used. If values were not transmitted at CustomerInvoiceRequest and CustomerInvoiceRequestItem level, the relevant elements are NOT set.

From a semantic perspective, CustomerInvoiceRequestItems can contain other items. This enables item hierarchies to be mapped. The hierarchies are mapped using a ParentItemID and an ItemHierarchy-TypeCode. There are various types of item, which are governed by a variety of integrity conditions. The following are the types of integrity conditions: 1. Standard Items, 2. Hierarchy Items, 3. Subitems. Standard items are items that are neither above nor below any other items in the hierarchy. Hierarchy items are items that are above other items in the hierarchy. Subitems are items that are below other items in the hierarchy. The type of subitem and the way it is used is indicated using the ItemHierarchyRelationTypeCode.

CustomerInvoiceRequestItemBusinessProcessVariant Package is Similar to BusinessProcessVariant Package on CustomerInvoiceRequest level.

The CustomerInvoiceRequestItemProductInformation package groups all information required for identifying, describing, and classifying a product for which an invoice is due. It contains the element: Quantity and QuantityTypeCode.Quantity is the quantity of the product to be settled. Quantity may be based on GDT Quantity. QuantityTypeCode is a coded representation of the quantity of the product to be settled. QuantityTypeCode may be based on GDT QuantityTypeCode.

Quantity may also contain the entities: Product, and ProductCategory.

The Product identifies, describes, and classifies a product for which an invoice is due. Product is of type It is of GDT type Product. A product can be specified when the line item instance is not a grouping or unplanned delivery costs.

The ProductCategory is the product category of the product/service that is being invoiced. ProductCategory is of type It is of GDT type ProductCategory. The product category derives directly from the product and can vary if the buyer and seller have assigned the same product to different categories. This is allowed and should be tolerated by the systems involved.

The CustomerInvoiceRequesItemPriceInformation package summarizes all the information about the amount to be settled for a product or a service, including all price components. It contains the entities: PriceAndTax, ProductTaxDetails, PricingTerms, TaxationTerms.

The PriceAndTax is the gross amount (including tax and net amount) to be settled for a product or service, including price components. PriceAndTax contains the elements: GrossAmount, NetAmount, TaxAmount, PriceComponent. GrossAmount is the gross invoice amount; net amount plus tax amount. GrossAmount may be based on GDT Amount. NetAmount is the net invoice amount. NetAmount may be based on GDT Amount. TaxAmount is the tax amount of an invoice. TaxAmount may be based on GDT Amount. PriceComponent is a component of a price. PriceComponent may be based on GDT PriceComponent. The elements NetAmount, GrossAmount, and TaxAmount can be specified when the specified line item instance is not an item used simply for grouping purposes. The gross and net amounts for an item can be in the same currency. Currencies specified at header/item level can be the same.

The entity ProductTaxDetails contains the details determined for a specific type of product tax for the entire business document item. Product taxes are taxes that are incurred for product-related business cases, such as purchasing, sales or consumption. The entity ProductTaxDetails contains the elements: ProductTaxationCharacteristicsCode, ProductTax, TransactionCurrencyProductTax. ProductTaxationCharacteristicsCode is a coded representation of basic characteristics upon which the taxation of products is based. ProductTaxationCharacteristicsCode may be based on GDT ProductTaxationCharacteristicsCode. ProductTax represents the parts of the determined product tax in an arbitrary currency. ProductTax may be represented by GDT ProductTax. TransactionCurrencyProductTax represents the parts of the product tax determined in document currency. TransactionCurrencyProductTax may be based on GDT ProductTax.

PricingTerms are agreements in the sales or service process, which are needed exclusively to determine the net value of a CustomerInvoiceRequest item. PricingTerms contains the elements: PricingDateTime is the date (and time) used to determine the price components for this CustomerInvoiceRequest item. PricingDateTime may be based on GDT LOCAL-NORMALISED_DateTime. PriceRecalculationTypeCode is the coded representation of the type of price re-calculation which is executed when the CustomerInvoiceRequest item is being invoice, and is optional. PriceRecalculationTypeCode may be based on GDT PriceRecalculationTypeCode.

In some implementations, If a following currency is specified in the ExchangeRate element, the following currency can be the same as the currency in the gross/net/tax amount of the entity PriceAndTax. If the ExchangeRate element is not specified at all, the currency of the gross/net amount is set as the following and leading currency (in this case, the exchange rate would be set to the uniform rate). Specifying currencies at header level is optional. If they are specified, they can be the same as the currencies specified at item level.

CustomerInvoiceRequestItemParty Package is similar to Party Package on CustomerInvoiceRequest level.

In some implementations, the only exception is that the entity ResponsibleEmployeeParty is only part of the Package Party (associated to the package CustomerInvoiceRequest), since an employee is responsible for entire CustomerInvoiceRequest business documents.

CustomerInvoiceRequestItemLocation Package is similar to Location Package on CustomerInvoiceRequest level.

CustomerInvoiceRequestItemDeliveryInformation Package is similar to DeliveryInformation Package on CustomerInvoiceRequest level.

The CustomerInvoiceRequestItemBusinessTransactionDocumentReference package groups all references to business documents that could be relevant for settling an CustomerInvoiceRequestItem.

It contains the entities: PurchaseOrderReference, SalesOrderReference, ServiceOrderReference, DeliveryReference, SalesContractReference, ServiceContractReference.

A PurchaseOrderReference is the reference to a purchase order or to an item within a purchase order: PurchaseOrderReference is of type It is of GDT type BusinessTransactionDocumentReference. The PurchaseOrderReference can be transmitted in the message instance CustomerInvoiceRequest from the process component SalesOrderProcessing to CustomerInvoiceProcessing so that it can be output together with the invoice. PurchaseOrderReference contains the purchase order number assigned by the buyer.

A SalesOrderReference is the reference to an order or an item within an order. SalesOrderReference is of type It is of GDT type BusinessTransactionDocumentReference. SalesOrderReference contains the order number assigned by the seller.

ServiceOrderReference is the reference to a service order or an item within a service order. ServiceOrderReference is of type GDT: BusinessTransactionDocumentReference.

A DeliveryReference is the reference to a delivery (delivery note number) or an item within a delivery. DeliveryReference is of type It is of GDT type BusinessTransactionDocumentReference. DeliveryReference contains the delivery note number assigned by the seller.

A SalesContractReference is the reference to a sales contract or to an item within a sales contract. SalesContractReference is of type It is of GDT type BusinessTransactionDocumentReference.

A ServiceContractReference is the reference to a service contract or to an item within a service contract. ServiceContractReference is of type It is of GDT type BusinessTransactionDocumentReference.

CustomerInvoiceRequestItemAttachmentFolder Package is similar to AttachmentFolder Package on CustomerInvoiceRequest level.

CustomerInvoiceRequestItemTextCollectopm Package is similar to TextCollection Package on CustomerInvoiceRequest level.

Business Object Template: CustomerTransactionDocument-Template

Figures 1, 36:
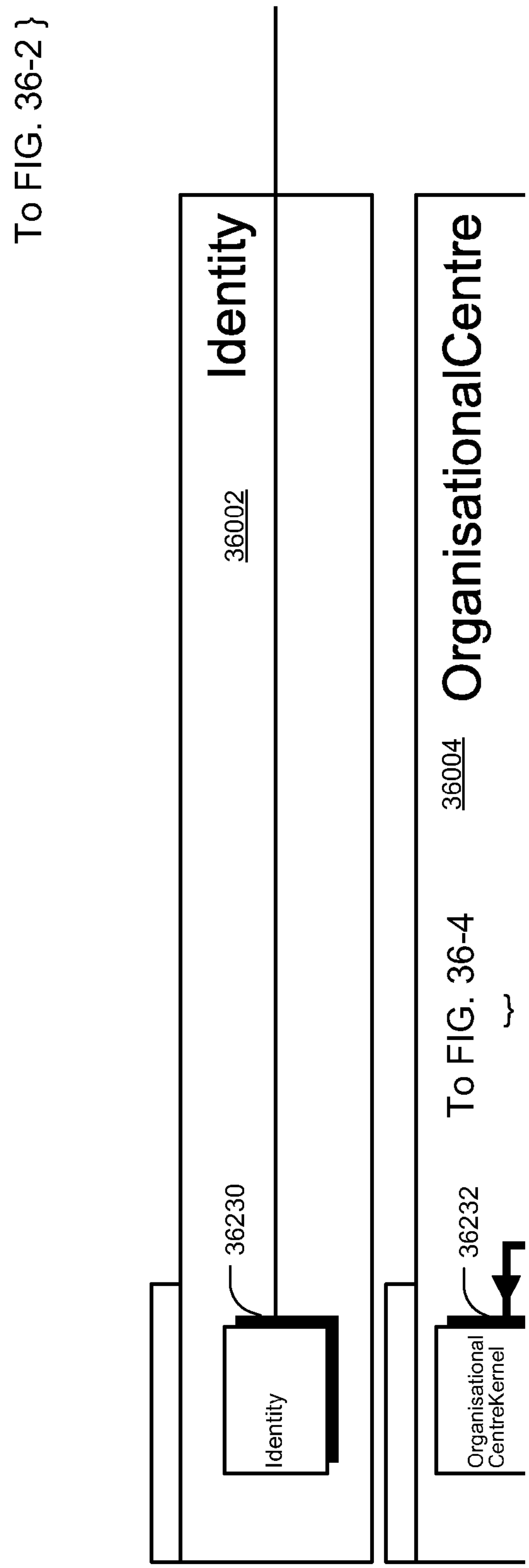
Figures 2, 36:
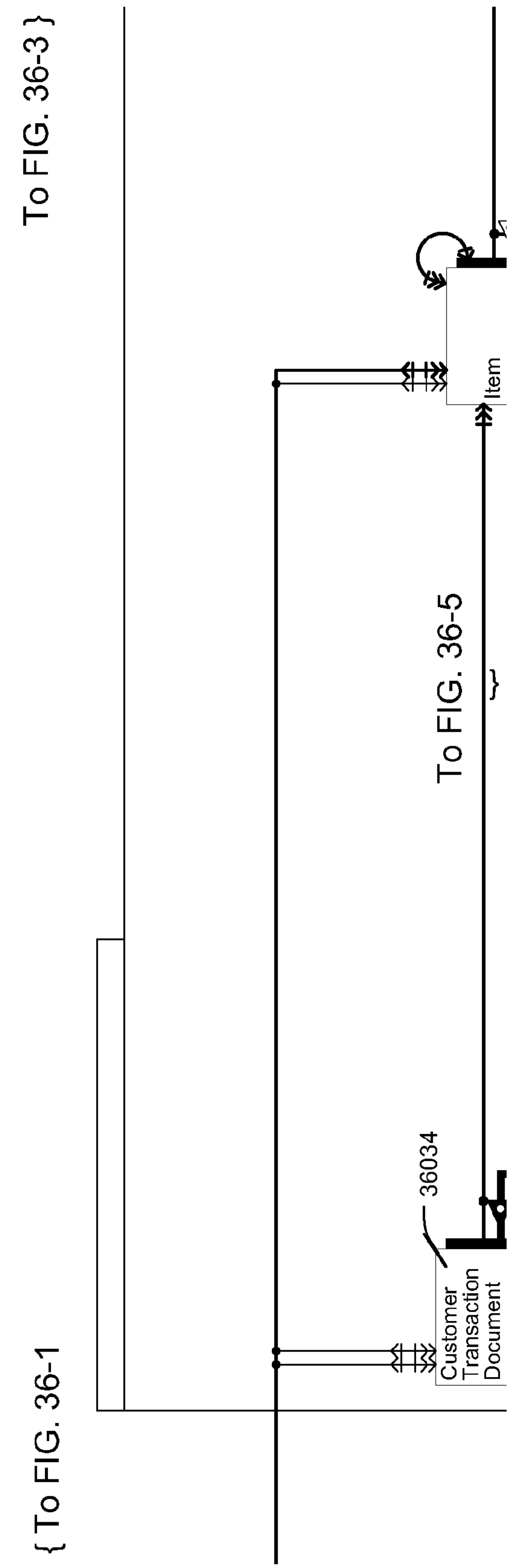
Figures 3, 36:
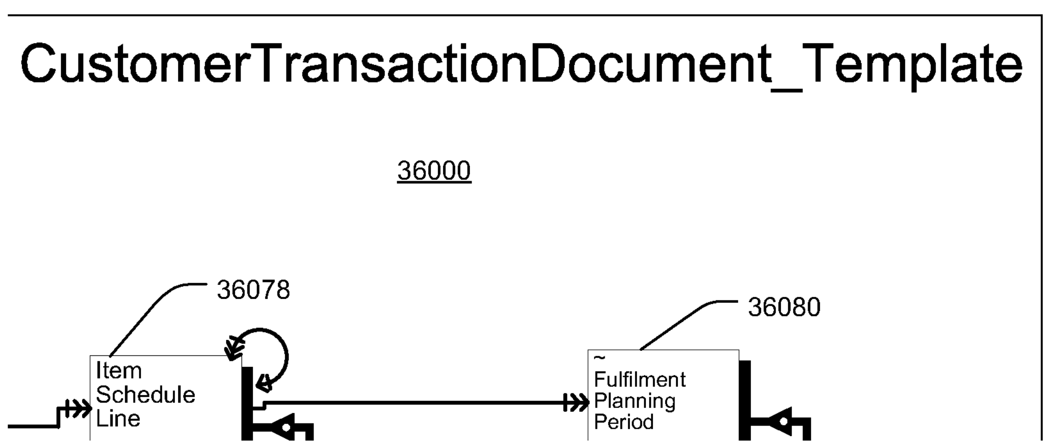
Figures 4, 36:
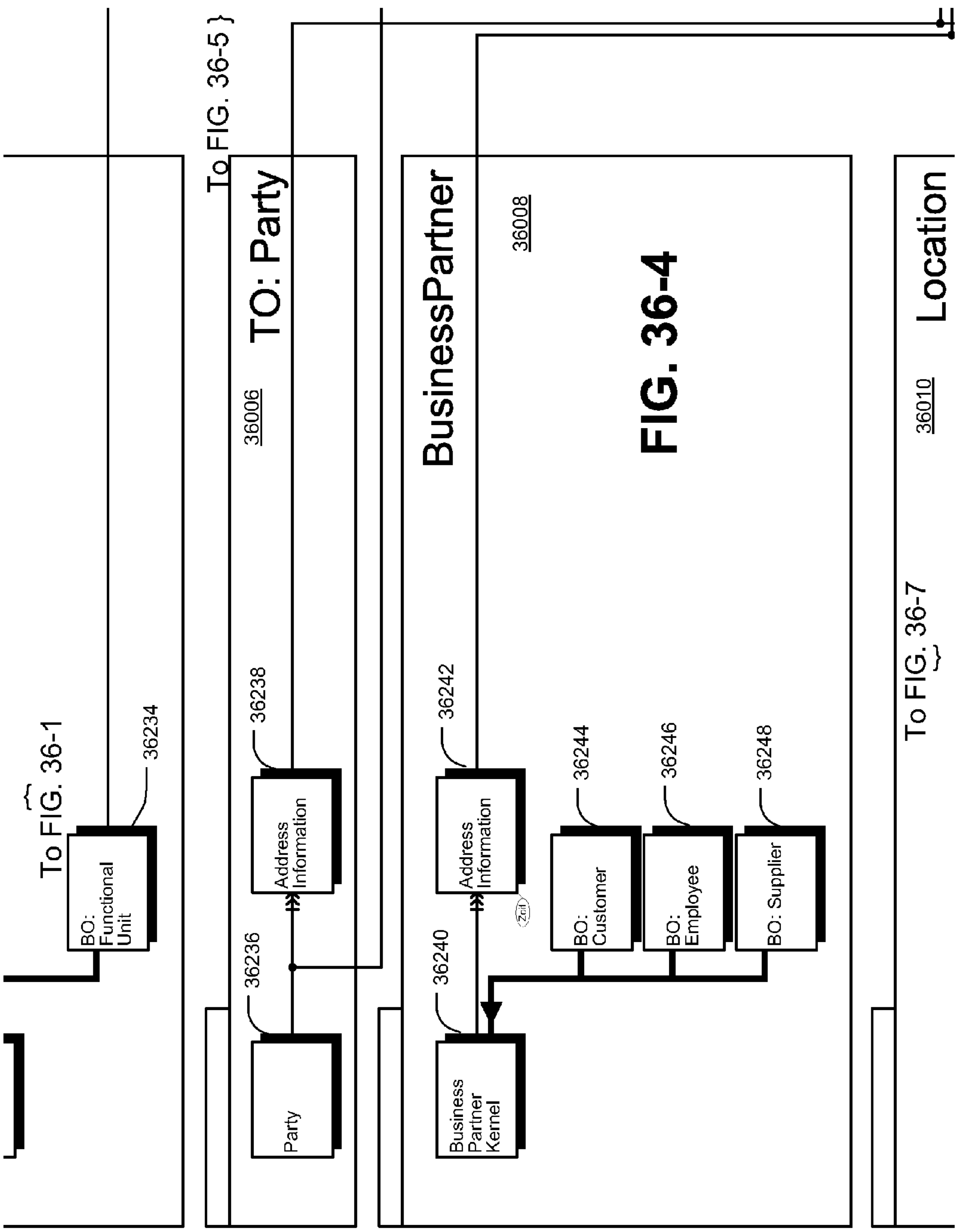
Figures 5, 36:
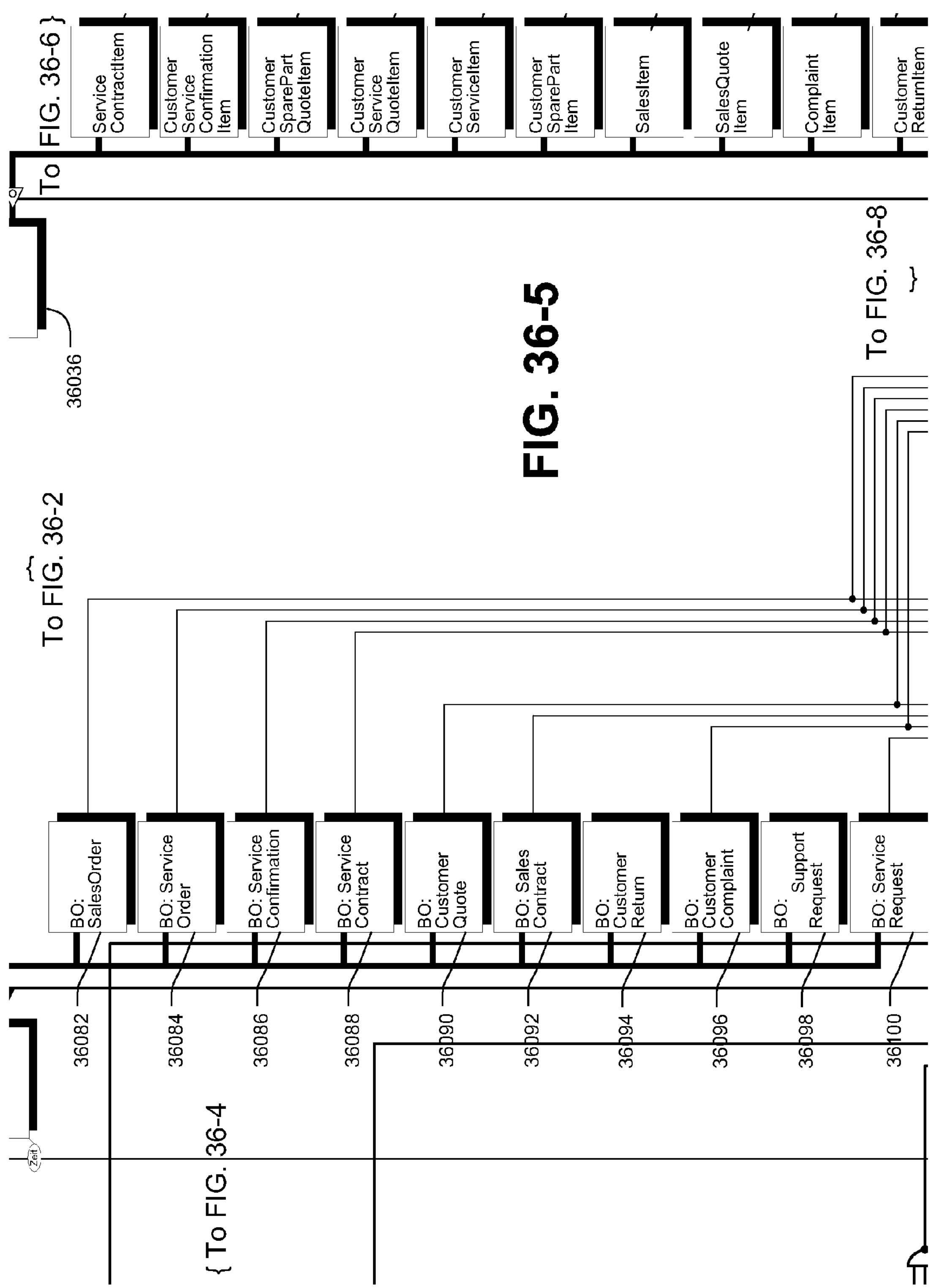
Figures 6, 36:
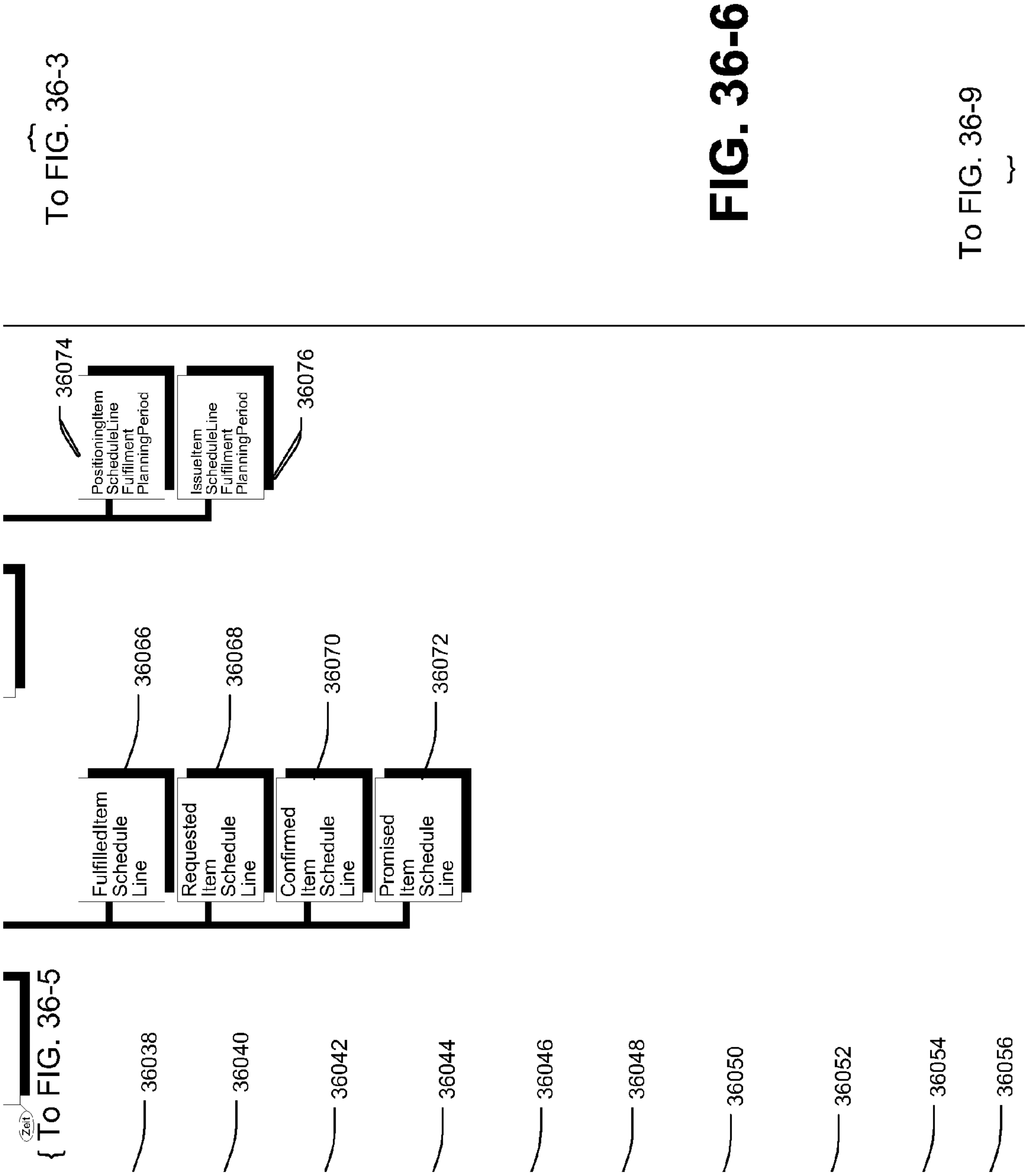
Figures 7, 36:
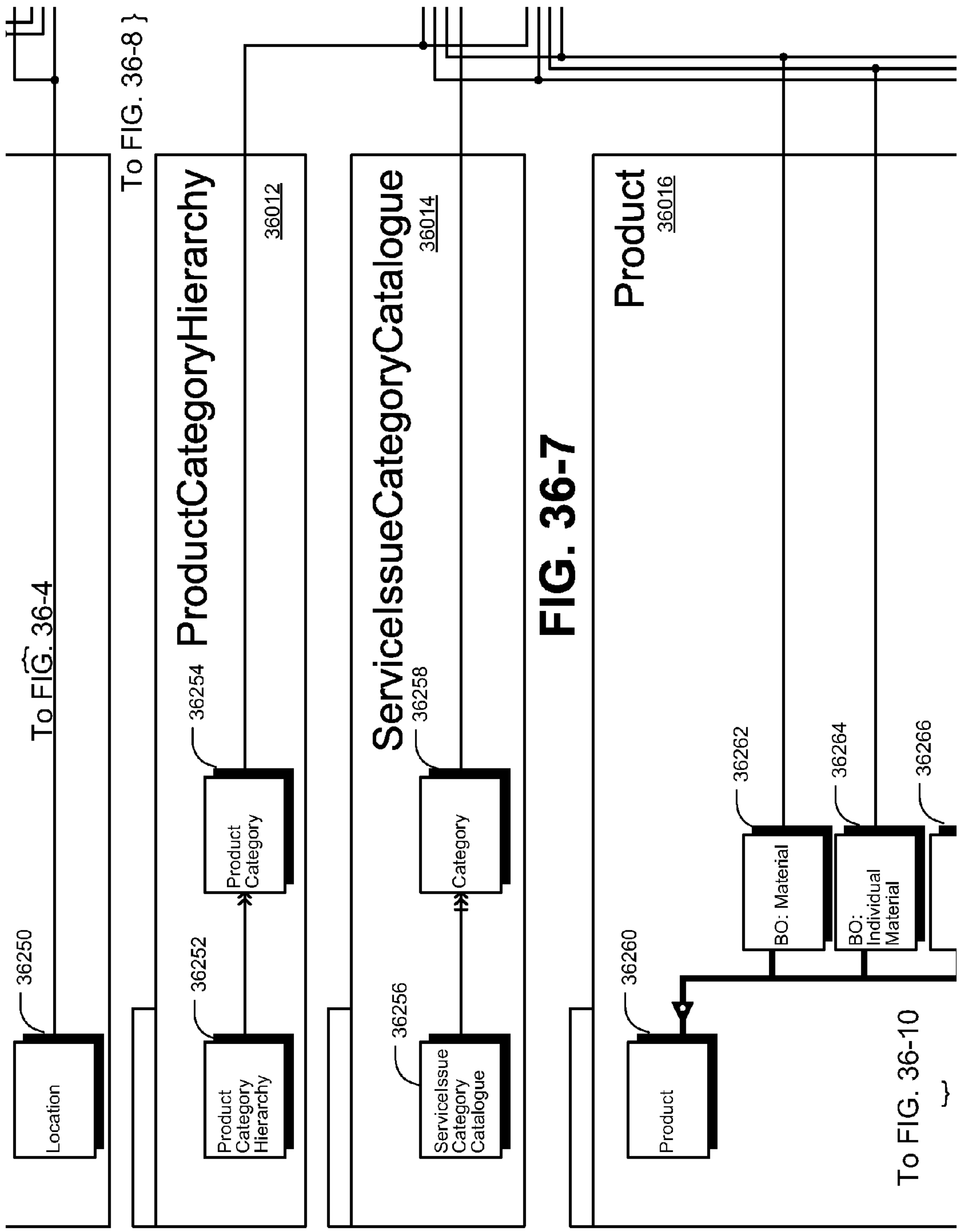
Figures 8, 36:
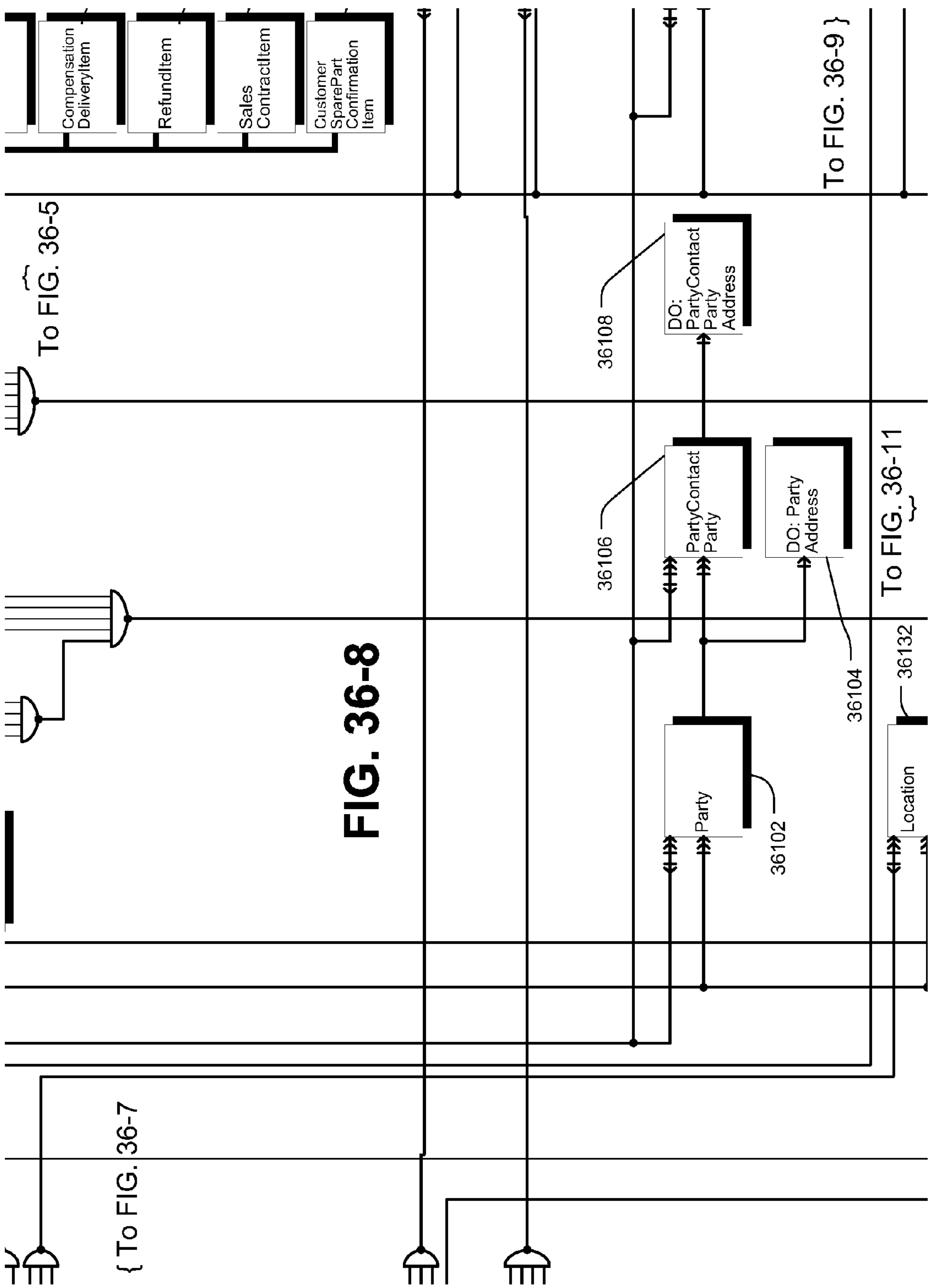
Figures 9, 36:
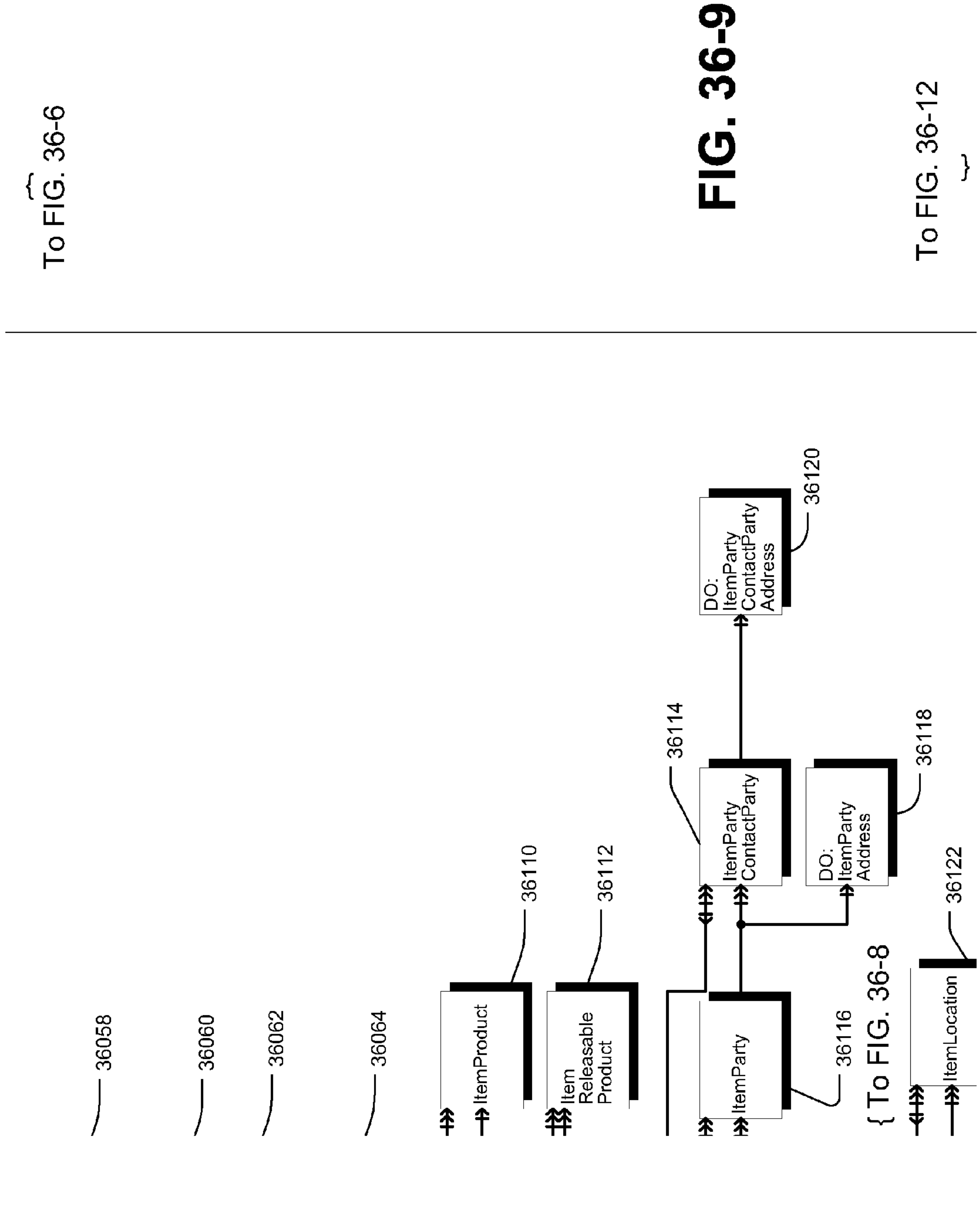
Figures 10, 36:
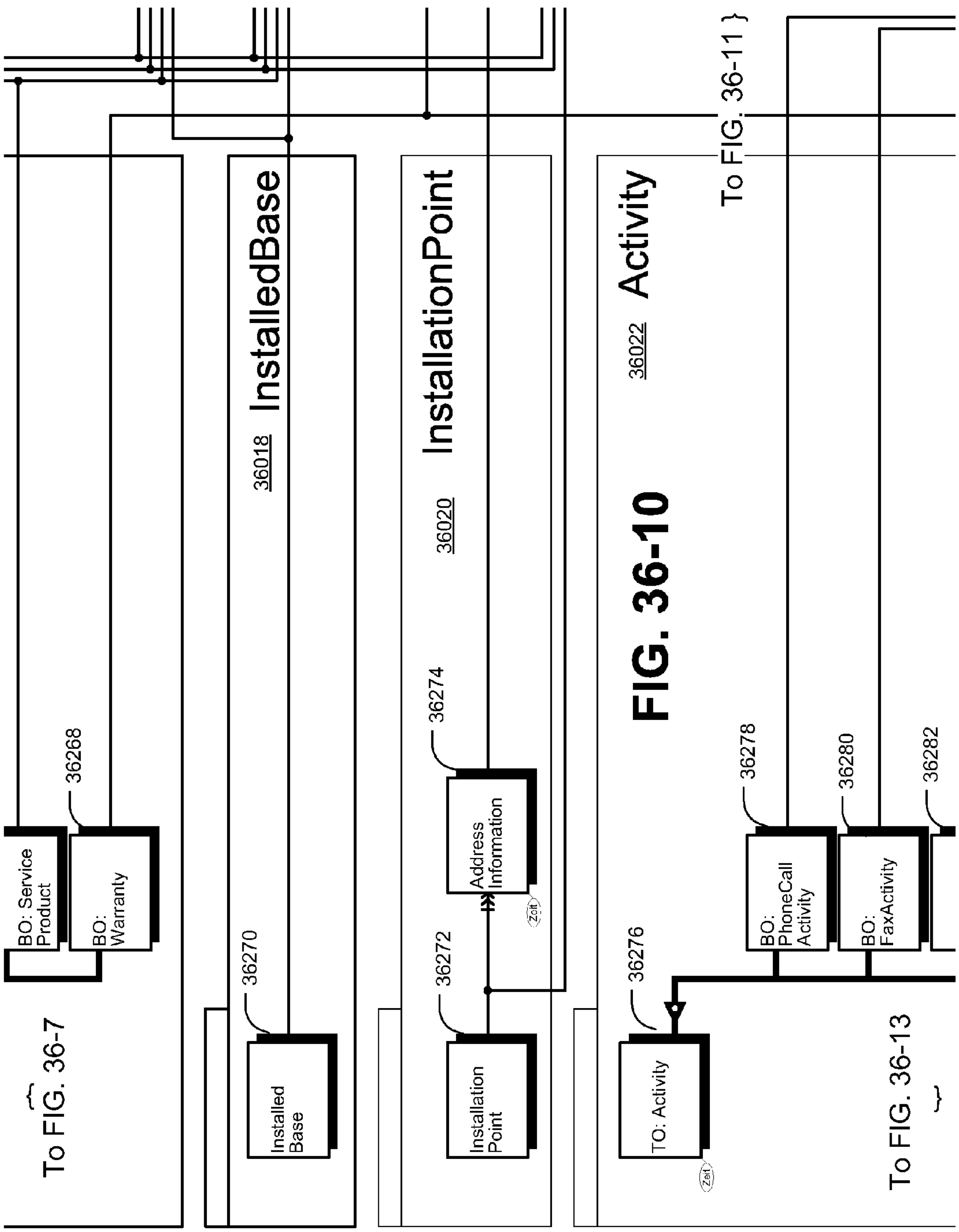
Figures 11, 36:
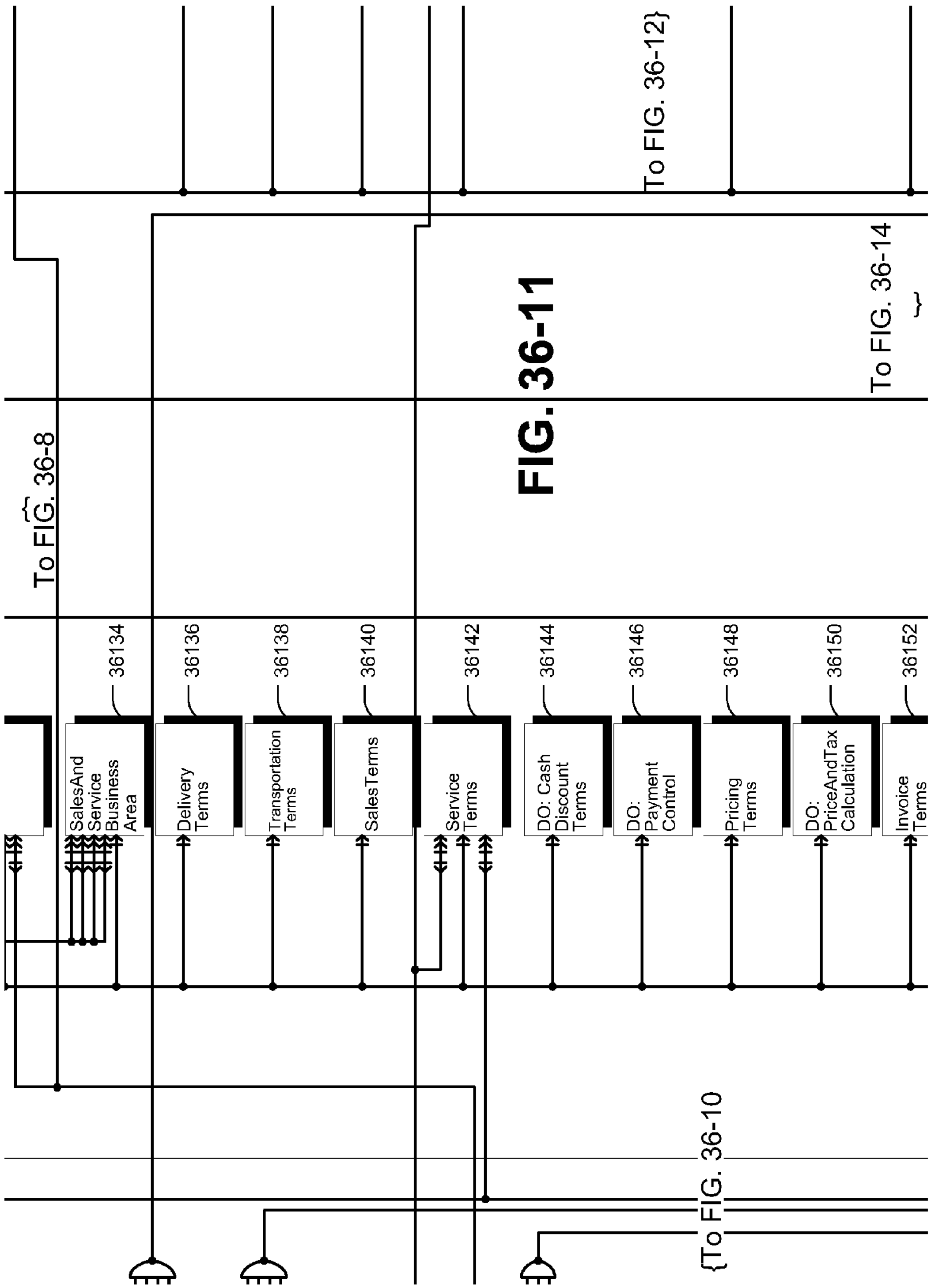
Figures 12, 36:
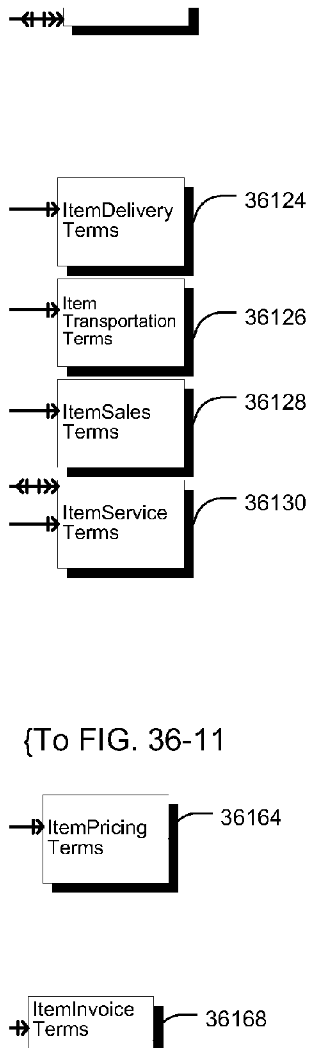
Figures 13, 36:
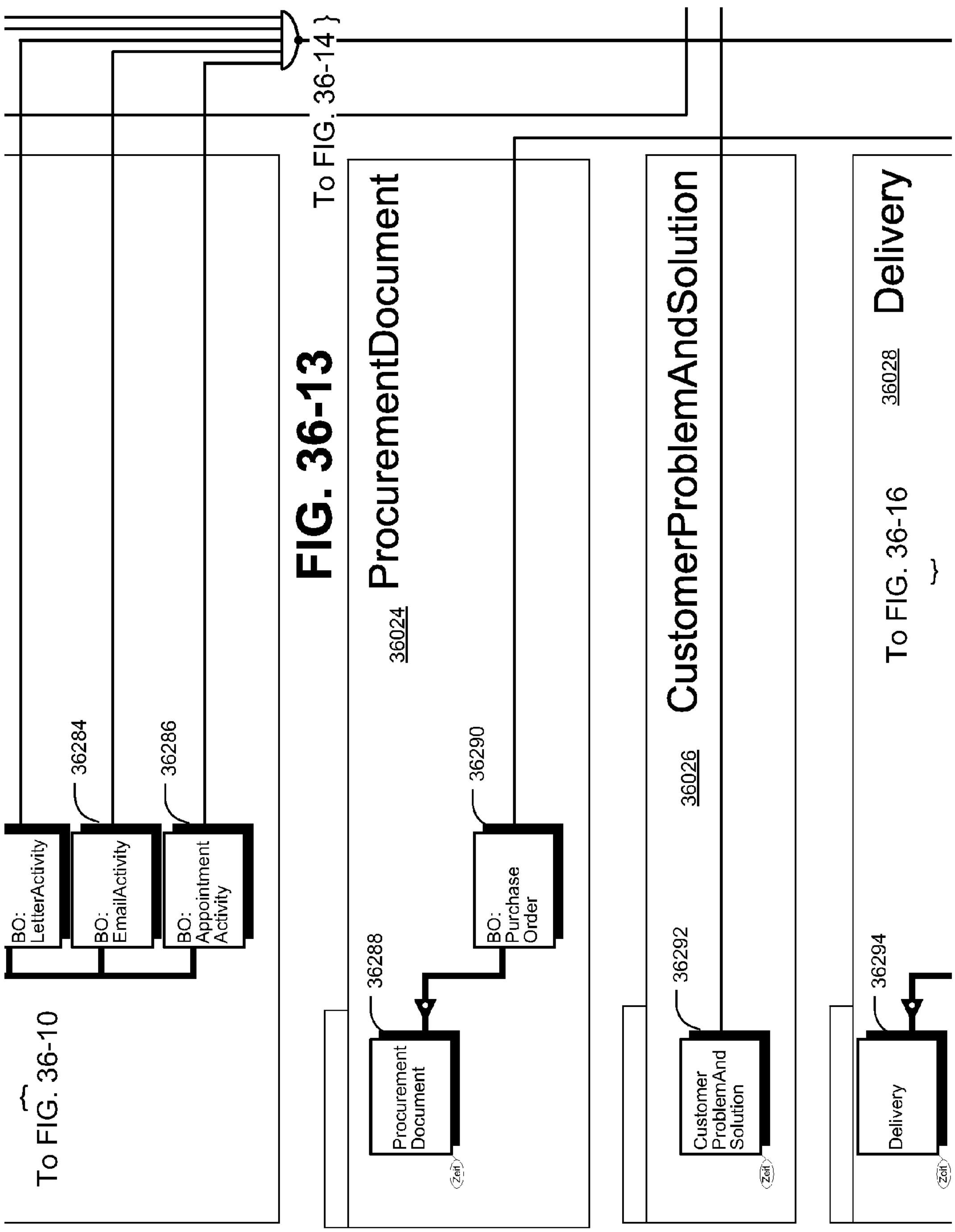
Figures 14, 36:
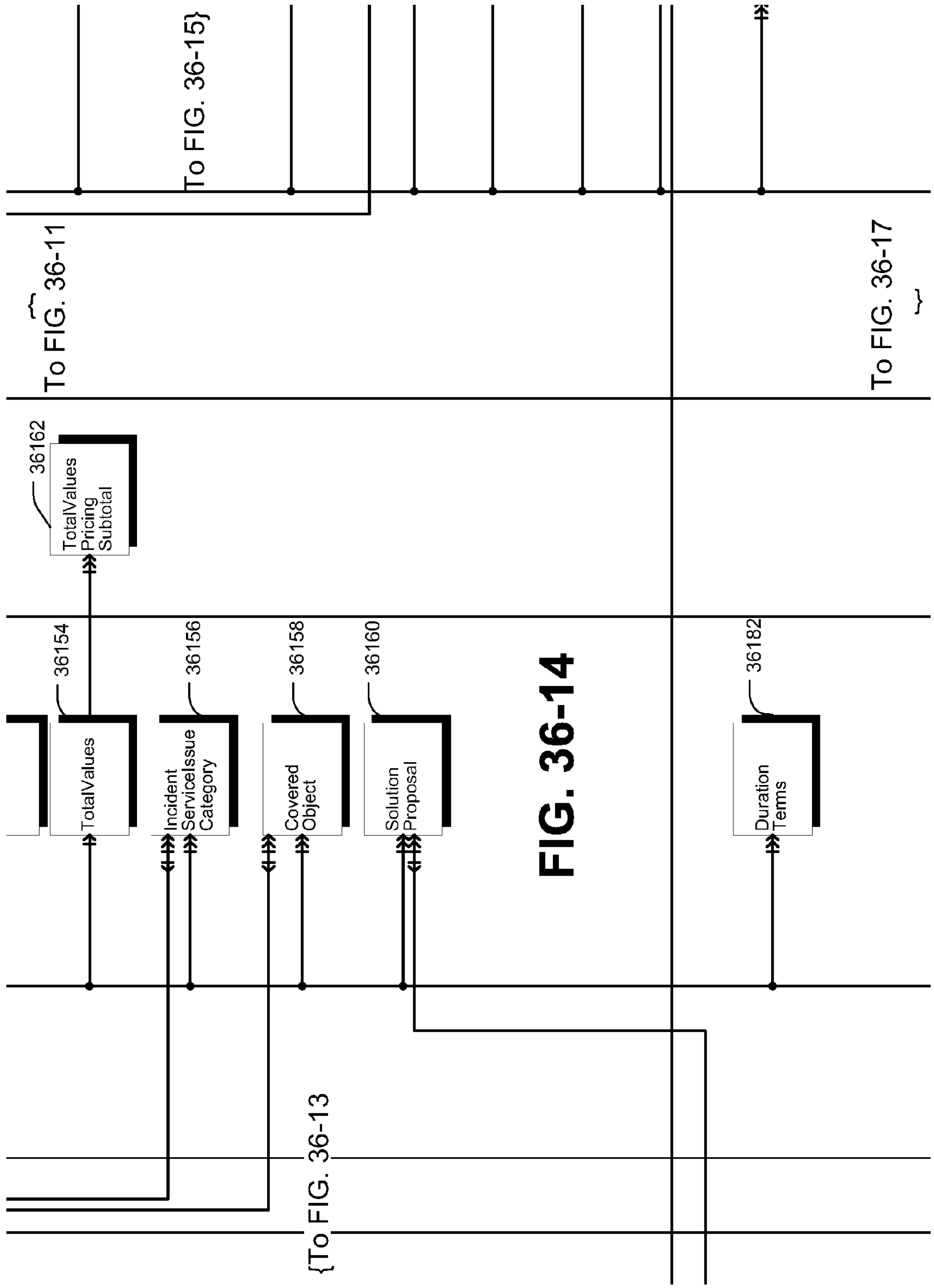
Figures 15, 36:
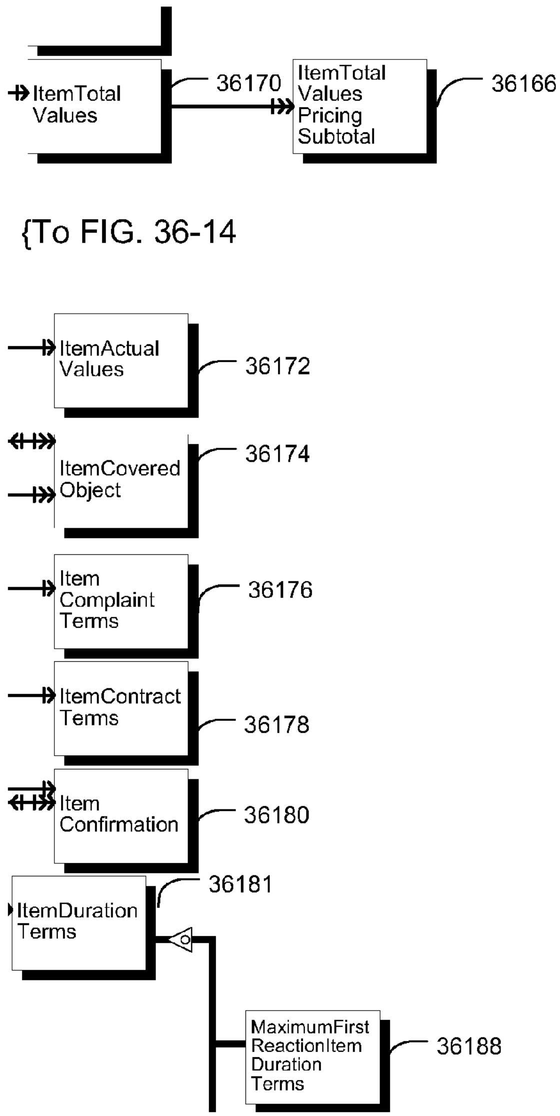
Figures 16, 36:
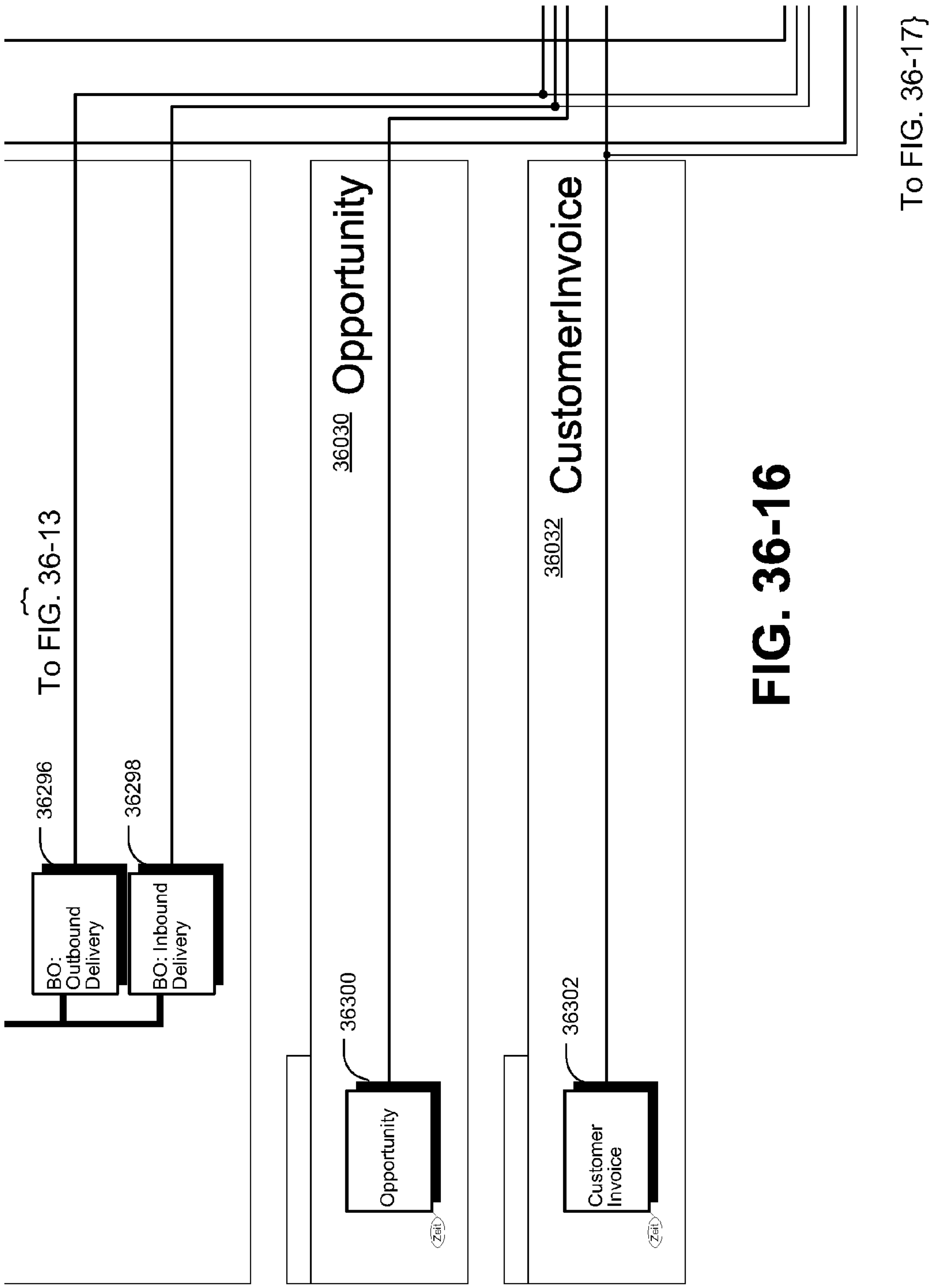
Figures 17, 36:
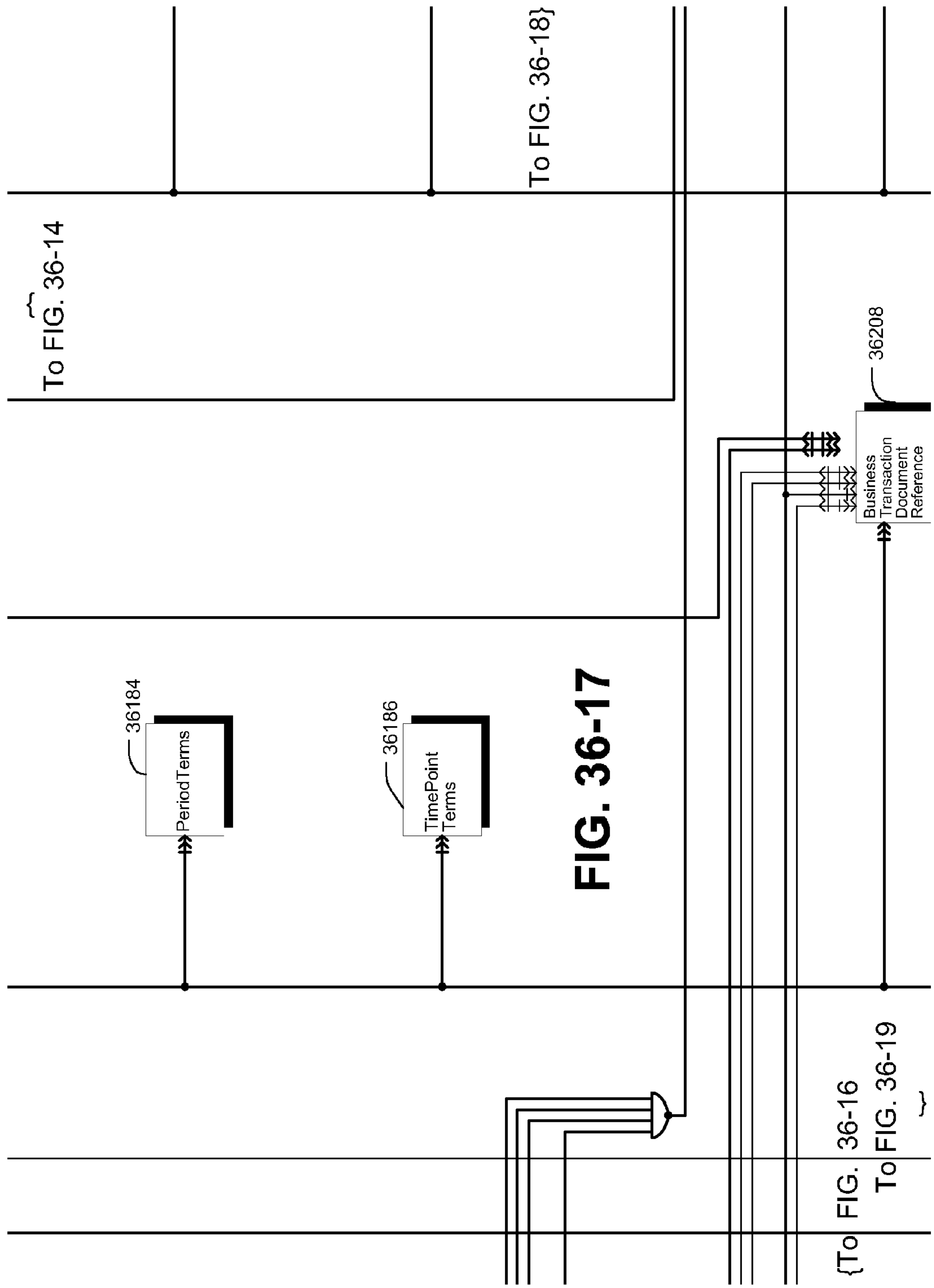
Figures 18, 36:
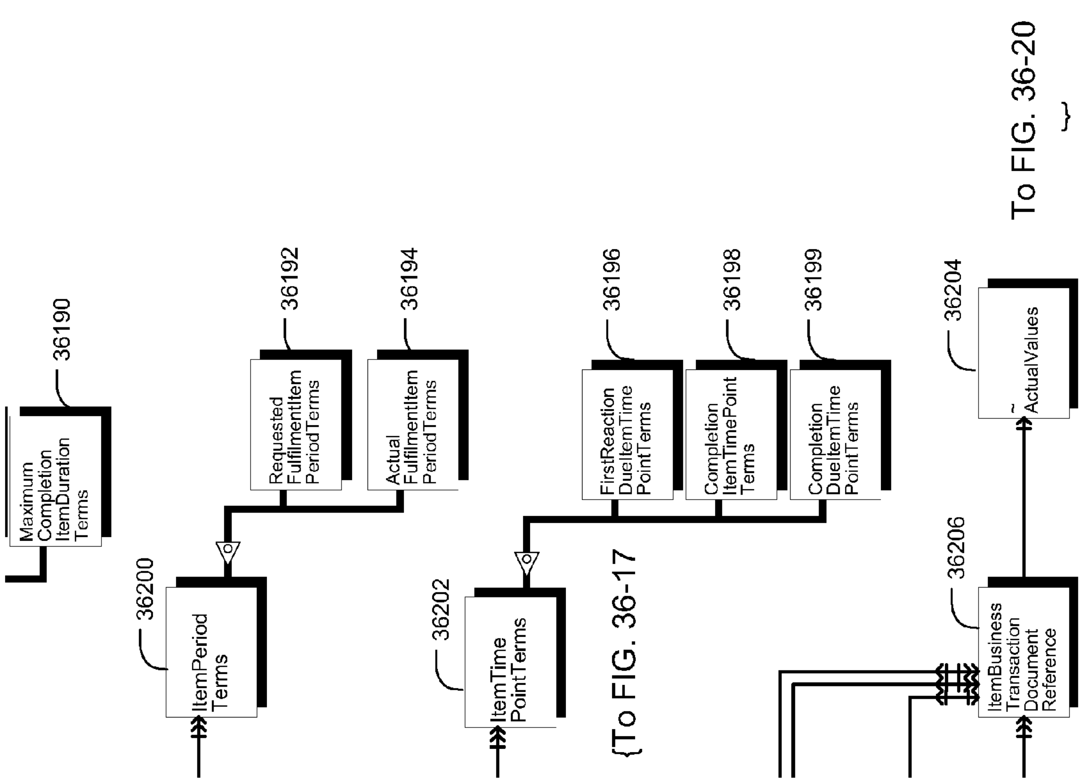
Figures 19, 36:
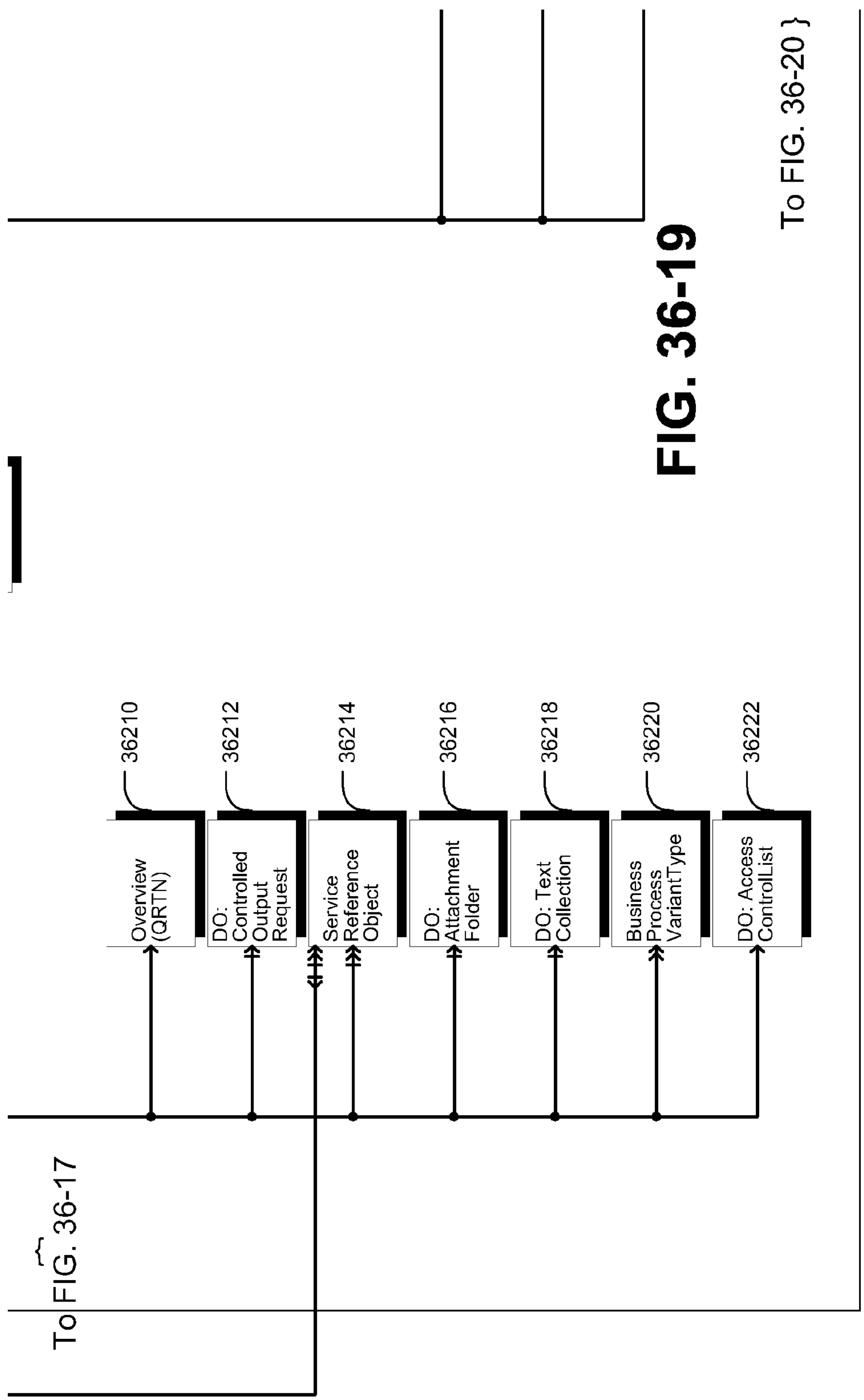
Figures 20, 36:
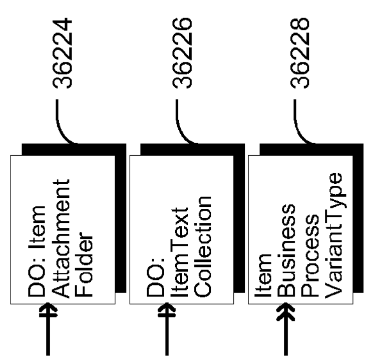

FIG. 36-1 through 36-21 illustrate an example CustomerTransactionDocument_Template business object model 36000. Specifically, this model depicts interactions among various hierarchical components of the CustomerTransactionDocument_Template, as well as external components that interact with the CustomerTransactionDocument_Template (shown here as 36002 through 36032 and 36230 through 36050).

The CustomerTransactionDocument Template is a template for those customer specific business transactions, where the focus is on the delivery of goods or the provision of services, the prices, and the preparation of invoicing. The Customer Transaction Document Template itself is not a business object in a business sense. That is, it is not included in the business object map and is not used in any process component as a business object. In particular, it can not be instantiated. It is used to ensure the consistency, integrity, and reusability of the business objects that are derived from the Customer Transaction Document Template.

The business objects that are derived from the template can be derived as specializations from the following generalizations Business Transaction Document, Customer Transaction Document, Sales And Customer Service Transaction Document, Sales Order 36082, Service Order 36084, Service Request 36100, Support Request 36098, Service Confirmation 36086, Service Contract 36088, Customer Quote 36090, Sales Contract 36092, Customer Return 36094, Presales Transaction Document, Lead, and Opportunity.

Customer Transaction Document 36034 is a customer specific business transaction document.

Sales And Customer Service Transaction Document is a customer specific business transaction document, where the focus is on the delivery of goods or the provision of services, the prices, and the preparation of invoicing. Presales Transaction Document is a customer specific business transaction document, where the focus is on the presales phase. The business objects Lead and Opportunity are not derived from the CustomerTransactionDocument Template.

A business object template cannot be instantiated and is therefore not part of a process component. In the following chapters the business objects that are derived from the Customer Transaction Document Template are listed and defined. The derived business objects and their structure are described in separate documents.

A Business Object SalesOrder 36082 is an agreement between a seller and a customer concerning the sale and delivery of goods, as well as any services that are associated with these processes, on a specific date, for a specific quantity, and for a specific price. The business object SalesOrder is part of the process component SalesOrderProcessing.

A SalesOrder comprises the following 3 main components: information that applies to the entire SalesOrder such as the parties involved, the sales/delivery/invoicing-specific agreements, status and references, the SalesOrder items with the item information and dependent data such as the product information, the parties involved, the sales/delivery/invoicing-specific agreements, status and references, and schedule lines for an item that specify when and in which quantity products should be made available.

Business Object ServiceOrder

The Business Object ServiceOrder 36084 is an agreement between a service provider and a customer about the execution of services at a specific time and for a specific price. In addition, the service order contains planning for personnel, spare parts, and other expenses that are necessary for providing the services. The business object ServiceOrder is part of the process component ServiceOrderProcessing.

Business Object ServiceRequest

The Business Object ServiceRequest 36100 is a request from a customer to a service provider to solve an issue that the customer has with regard to a product. In addition to the description and the categorization of the issue, the Service Request contains the documentation and the results of the resolution, as well as the expenses incurred. The business object ServiceRequest is part of the process component ServiceRequestProcessing.

Business Object SupportRequest

The Business Object SupportRequest 36098 is a request by a user of a system or of the system itself to a service provider (IT Service Desk) to clarify and correct an error in an IT solution It documents the error, the solution process, and the solutions found. The Support Request permits an appropriate reaction, prioritization, and sequence in error processing. The Support Request contains information on the user or the system, and on the nature and the context of the error. It can also contain a description of the symptom as well as classification of the error, problem, cause, meaning, and so on. The business object ServiceRequest is part of the process component SupportRequestProcessing.

Business Object ServiceConfirmation

The Business Object ServiceConfirmation 36086 is a record of services and spare parts that a service technician reports back after performing a service for a customer. A service confirmation is used to document actual working times spent and spare parts used for the service. These particulars are used as a basis for processing customer invoices, updating stock levels for spare parts, carrying out cost accounting, and keeping track of working times. The business object ServiceConfirmation is part of the process component ServiceConfirmationProcessing.

Business Object ServiceContract

The Business Object ServiceContract 36088 is an agreement between a service provider and a customer, specifying the type and scope of services that are provided to the customer, as well as particular service levels. It is valid for a specific time period. A service contract is used as a basis for processing service requests and service orders. The agreements that have been made in the service contract can be invoiced to the customer. The business object ServiceContract is part of the process component ServiceContractProcessing. A ServiceContract consists of the following two main parts: information that is relevant for the entire ServiceContract, such as the participating parties, the sales, service, and billing specific agreements, status, and references, items in the ServiceContract with item information and dependent data, such as product information, parties involved, sales, service, and billing specific agreements, status, and references.

Business Object CustomerQuote

The Business Object CustomerQuote 36090 is an offer by a seller to a customer for the delivery of goods or services according to fixed terms. The offer is legally binding for the seller for a specific period of time. A CustomerQuote has a validity period. Within this validity period, the customer can issue a SalesOrder or a ServiceOrder on the basis of the CustomerQuote, at the agreed prices, for the agreed quantities, and at the agreed time. The business object CustomerQuote is part of the process component CustomerQuoteProcessing. A CustomerQuote consists of the following three main parts: information that is relevant for the entire CustomerQuote, such as the participating parties, the sales, delivery, and billing specific agreements, status, and references, items in the CustomerQuote with item information and dependent data, such as product information, parties involved, sales, delivery, and billing specific agreements, status, and references, and schedule lines for an item that specify when and in which quantity products should be made available.

Business Object CustomerComplaint

The Business Object CustomerComplaint 36096 is a recorded objection by a customer, typically related to an experience the customer has had with a seller or a service provider. The business object CustomerComplaint is part of the process component CustomerComplaintProcessing. A Customer Complaint can deal with the following issues:

1) Complaint about defective goods or services for which the customer expects reimbursement or replacement from the seller.

2) Customer feedback on delivered goods or services. (CF without a claim for compensation)

3) Request for an invoice adjustment.

A Customer Complaint can include the following corrective measures:

1) Refund, potentially with the expectation of a returned product.

2) Substitute delivery of a replacement product, potentially with a return of the original item.

3) Rework of delivered goods or services

4) Invoice adjustment

Business Object CustomerReturn

The Business Object CustomerReturn 36094 is a request made by the customer for the seller to take back goods that have been delivered, and to cancel the sale. The business object CustomerReturn is part of the process component CustomerReturnProcessing. The business object CustomerTransactionDocumentTemplate is involved in the following process component interaction models:

PurchaseOrderProcessing_CustomerTransactionDocumentTemplateProcessing

SoftwareProblemReporting_CustomerTransactionDocumentTemplate Processing

Service Request Processing at Requester_CustomerTransactionDocumentTemplate Processing CustomerTransactionDocumentTemplate Processing_Service Request Processing at Provider InboundDeliveryProcessing_CustomerTransactionDocumentTemplateProcessing CustomerTransactionDocumentTemplate Processing_Accounting CustomerTransactionDocumentTemplate Processing_Customer Invoice Processing CustomerTransactionDocumentTemplate Processing_Customer Invoice Read CustomerTransactionDocumentTemplate Processing_Customer Requirement Processing CustomerTransactionDocumentTemplate Processing_Product Valuation Accounting CustomerTransactionDocumentTemplate Processing_Inventory Processing Service Interface Ordering In Service Interface Ordering In has the technical name "CustomerTransactionDocumentTemplateProcessingOrderingIn." The service interface Ordering In is part of the following process component interaction model:

PurchaseOrderProcessing_CustomerTransactionDocumentTemplateProcessing. The service interface Ordering In groups the operations that are required to receive the requirements from the buyer to the seller concerning the goods to be delivered or the services to be provided, and to create, change, or reject the resulting CustomerTransactionDocumentTemplate documents.

Operation CreateCustomerTransactionDocumentTemplate

Operation CreateCustomerTransactionDocumentTemplate (B2B) has the technical name CustomerTransactionDocumentTemplateProcessing OrderingIn.CreateCustomerTransaction DocumentTemplate. The CreateCustomerTransactionDocumentTemplate operation uses the PurchaseOrderRequest (the request from the buyer to the seller concerning goods to be delivered or services to be provided) to create the CustomerTransactionDocumentTemplate document. The inbound data from the message will be enhanced with additional master data and Customizing data. The operation is based on the PurchaseOrderRequest message type (MT), which is, in turn, based on the PurchaseOrderMessage message data type (MDT) (derived from the PurchaseOrder business object).

Operation ChangeCustomerTransactionDocumentTemplate

Operation ChangeCustomerTransactionDocumentTemplate (B2B) has the technical name CustomerTransactionDocumentTemplateProcessingOrderingIn.ChangeCustomerTransaction DocumentTemplate. The ChangeCustomerTransactionDocumentTemplate operation changes the existing CustomerTransactionDocumentTemplate document using the PurchaseOrderChangeRequest (the change of the buyer's request to the seller concerning goods to be delivered or services to be provided). The operation is based on the PurchaseOrderChangeRequest message type, which is, in turn, based on the PurchaseOrderMessage message data type (derived from the PurchaseOrder business object).

Operation CancelCustomerTransactionDocumentTemplate (B2B)

The technical name is CustomerTransactionDocumentTemplateProcessingOrderingIn.CancelCustomerTransactionDocumentTemplate The CancelCustomerTransactionDocumentTemplate operation cancels the CustomerTransactionDocumentTemplate document specified in the PurchaseOrderCancellationRequest (the cancellation of the buyer's request to the seller concerning goods to be delivered or services to be provided). The operation is based on the PurchaseOrderCancellationRequest message type, which is, in turn, based on the PurchaseOrderCancellationMessage message data type (derived from the PurchaseOrder business object).

Service Interface Request Customer Return Execution In

The technical name is

CustomerTransactionDocumentTemplateProcessingRequestCustomerReturnExecutionIn. The service interface Request Customer Return Execution In is part of the following process component interaction model:

InboundDeliveryProcessing_CustomerTransactionDocumentTemplateProcessing.

The service interface Request Customer Return Execution In groups the operations that are required to receive the customer return execution request from the Inbound Delivery processing to the Customer Return processing concerning the goods that have been returned, and to create, change, or reject the resulting CustomerTransactionDocumentTemplate documents.

Operation Maintain CustomerTransactionDocumentTemplate based on Inbound Delivery (A2A)

Technical Name

CustomerTransactionDocumentTemplateProcessing RequestCustomerReturnExecutionIn.MaintainCustomerTransactionDocumentTemplateBasesOnInboundDelivery Definition The MaintainCustomerTransactionDocumentTemplate operation uses the CustomerReturnExecutionRequest (the request from the Inbound Delivery processing to the customer return processing concerning goods to have been returned) in order to create, update or cancel the CustomerTransactionDocumentTemplate document. In the case of creation the inbound data from the message will be enhanced with additional master data and Customizing data.

The operation is based on the CustomerReturnExecutionRequest message type (MT), which is, in turn, based on the CustomerReturnExecutionMessage message data type (MDT) (derived from the CustomerReturn object).

Service Interface Manage Customer Invoice Out

The technical name is CustomerTransactionDocumentTemplateProcessingManageCustomerInvoiceOut. The Manage Customer Invoice Out service interface is part of the process component interaction model CustomerTransactionDocumentTemplate Processing_Customer Invoice Read. The Manage Customer Invoice out service interface contains operations for read a Customer Invoice as a basis for pricing and invoicing of items in a CustomerTransactionDocumentTemplate document.

Operation Read Customer Invoice from CustomerTransactionDocumentTemplate to Customer Invoice has the technical name CustomerTransactionDocumentTemplateProcessingManageCustomerInvoiceOut.ReadCustomerInvoice FromCustomerTransactionDocumentTemplateToCustomerInvoice. The Sync request Read Customer Invoice from CustomerTransactionDocumentTemplate to Customer Invoice operation reads information of a Customer Invoice which includes above all price and tax calculation details as a basis for pricing and invoicing of items in a CustomerTransactionDocumentTemplate document.

The operation is based on the message type (MT) CustomerInvoiceByIDQuery and CustomerInvoiceByIDResponse, that, in turn, are based on the message data types (MDT) CustomerInvoiceQueryMessage and CustomerInvoiceResponseMessage (derived from the business object CustomerInvoice). Since the CustomerTransactionDocumentTemplate and the CustomerInvoice BO are harmonized with one another, the mapping describes those deviations that occur explicitly.

Service Interface Ordering Out has the technical Name CustomerTransactionDocumentTemplateProcessingOrderingOut. The service interface Ordering Out is part of the following process component interaction model: PurchaseOrderProcessing_CustomerTransactionDocumentTemplateProcessing.

CustomerTransactionDocumentTemplate Processing_ Service Order Confirmation Processing at Customer The Ordering Out service interface groups the operations that will be required to send a confirmation, a partial confirmation or a change made by the seller to the buyer, concerning the delivery of goods or the provision of services that have been requested or cancelled.

Operation ConfirmCustomerTransactionDocumentTemplate (B2B/Form Output) has the technical Name CustomerTransactionDocumentTemplateProcessingOrderingOut.ConfirmCustomerTransactionDocumentTemplate. The ConfirmCustomerTransactionDocumentTemplate operation confirms a CustomerTransactionDocumentTemplate to the buyer. This confirmation is sent either as a direct response to a PurchaseOrderRequest, a PurchaseOrderChangeRequest, or a PurchaseOrderCancellationRequest, or as a message notifying a change to the CustomerTransactionDocumentTemplate document. The confirmation can be sent either as an XML-message or as output form. The confirmation is sent as an output form. The operation is based on the PurchaseOrderConfirmation message type (MT), which is, in turn, based on the PurchaseOrderMessage message data type (MDT) (derived from the PurchaseOrder business object).

The operation for form output is based on the FormPurchaseOrderConfirmation message type (MT), which is, in turn, based on the FormPurchaseOrderMessage message data type (MDT) (derived from the PurchaseOrder business object).

Service Interface Quote Processing Out has the technical Name CustomerTransactionDocumentTemplateProcessingOut. The Quote Processing Out service interface groups the operations that will be required to send CustomerTransactionDocumentTemplate notification to the buyer concerning quantities, prices and delivery conditions of the quoted products.

Operation NotifyOfCustomerTransactionDocumentTemplate has the technical Name

CustomerTransactionDocumentTemplateProcessingOut.NotifyOfCustomerTransactionDocumentTemplate. The NotifyOfCustomerTransactionDocumentTemplate operation notifies the buyer about a CustomerTransactionDocumentTemplate. The notification is sent as an output form.

The operation for form is based on the FormQuoteNotification message type (MT), which is, in turn, based on the message data type FormQuoteMessage (MDT) derived from the CustomerTransactionDocumentTemplate business object).

Service Interface Sales And Purchasing Accounting Out has the technical Name

CustomerTransactionDocumentTemplateProcessingSalesAndPurchasingAccountingOut

The service interface Sales And Purchasing Accounting Out is part of the following process component interaction model: CustomerTransactionDocumentTemplate Processing_Accounting The service interface Sales And Purchasing Accounting Out contains operations for notifying accounting about creating/changing/deleting a CustomerTransactionDocumentTemplate document. Operation Notify Of CustomerTransactionDocumentTemplate (A2A) has the technical Name CustomerTransactionDocumentTemplateProcessingSalesAndPurchasingAccountingOut.NotifyOfCustomerTransactionDocumentTemplate. The operation is based on the Sales And Purchasing Accounting Notification message type (MT), which is, in turn, based on the SalesAndPurchasingAccountingNotificationMessage message data type (MDT) (derived from the AccountingNotification business object).

Service Interface Service Provision Accounting Out has the technical Name CustomerTransactionDocumentTemplateProcessingServiceProvisionAccountingOut. The service interface Service Provision Accounting Out is part of the following process component interaction model: CustomerTransactionDocumentTemplate Processing_Accounting. The Service Provision Accounting Out service interface contains operations for notifying Accounting about actual services provided and actual values for the times that were required to perform these services, as well as the confirmation of those services provided that were deleted. Operation Notify Of Service Provision has the technical Name CustomerTransactionDocumentTemplateProcessingServiceProvisionAccountingOut.NotifyOfServiceProvision. The operation Notify of Service Provision notifies Accounting about the actual services provided and actual values for the times that were required to perform these services. The operation is based on the Service Provision Accounting Notification message type (MT), which is, in turn, based on the ServiceProvisionMessage message data type (MDT) (derived from the AccountingNotification business object).

Operation Notify Of Service Provision Cancellation has the technical Name

CustomerTransactionDocumentTemplateProcessingServiceProvisionAccountingOut.NotifyOfServiceProvisionCancellation. The Notify Of Service Provision Cancellation notifies Accounting about canceled confirmations of actual services provided. The operation is based on the Service Provision Cancellation Accounting Notification message type (MT), which is, in turn, based on the CancellationAccountingNotificationMessage message data type (MDT) (derived from the AccountingNotification business object).

Service Interface SoftwareProblemReporting In has the technical Name CustomerTransactionDocumentTemplateProcessingSoftwareProblemReportingIn. The SoftwareProblemReporting In service interface is part of the following process component interaction model: SoftwareProblemReporting_CustomerTransactionDocumentTemplate Processing. The SoftwareProblemReporting In service interface contains the operation for creating/changing a CustomerTransactionDocumentTemplate on the basis of a service request that is entered via the Software Problem Reporting process component.

Operation Maintain CustomerTransactionDocumentTemplate has the technical Name

CustomerTransactionDocumentTemplateProcessingSoftwareProblemReportingIn.MaintainCustomerTransactionDocumentTemplate. The operation Maintain Support Request based on Provider's Confirmation updates a Support Request document on the basis of a message received from an external provider system, to confirm the creation/change, or to transfer a processing progress. The operation is based on the Service Request message type (MT), which is, in turn, based on the ServiceRequestMessage message data type (MDT) (derived from the ServiceRequest business object).

Service Interface SoftwareProblemReporting Out has the technical Name

CustomerTransactionDocumentTemplateProcessingSoftwareProblemReportingOut. The SoftwareProblemReporting Out service interface is part of the following process component interaction model: SoftwareProblemReporting_CustomerTransactionDocumentTemplate Processing. The SoftwareProblemReporting Out service interface contains the operation for confirming the creating/change as well as the processing progress of a CustomerTransactionDocumentTemplate document to Software Problem Report Processing.

Operation Confirm CustomerTransactionDocumentTemplate has the technical Name

CustomerTransactionDocumentTemplateProcessingSoftwareProblemReportingOut.Confirm CustomerTransactionDocumentTemplate. The Confirm CustomerTransactionDocumentTemplate operation confirms the creation/change as well as the processing progress of a CustomerTransactionDocumentTemplate document to Software Problem Reporting The operation is based on the ServiceRequestConfirmation message type (MT), which is, in turn, based on the ServiceRequestMessage message data type (MDT) (derived from the ServiceRequest business object).

Service Interface External Providing In has the technical Name.

CustomerTransactionDocumentTemplateProcessingExternalProvidingIn. The External Providing In service interface is part of the following process component interaction model:

CustomerTransactionDocumentTemplate Processing at Requester_CustomerTransactionDocumentTemplate Processing. The External Providing In service interface contains operations for creating/changing a CustomerTransactionDocumentTemplate on the basis of a service request received from a Requester.

Operation Maintain CustomerTransactionDocumentTemplate has the Technical Name

CustomerTransactionDocumentTemplateProcessingExternalProvidingIn.MaintainCustomerTransactionDocumentTemplate. The Maintain CustomerTransactionDocumentTemplate operation creates/changes a CustomerTransactionDocumentTemplate document on the basis of a service request received from a Requester. The operation is based on the Service Request message type (MT), which is, in turn, based on the ServiceRequestMessage message data type (MDT) (derived from the ServiceRequest business object).

Service Interface External Providing Out has the technical Name

CustomerTransactionDocumentTemplateProcessingExternalProvidingOut. The External Providing Out service interface is part of the following process component interaction model:

- CustomerTransactionDocumentTemplate Processing at Requester_CustomerTransactionDocumentTemplate Processing. The External Providing Out service interface contains the operation for the confirmation of creation/change as well as the processing progress of a CustomerTransactionDocumentTemplate document at a Requester Operation Confirm CustomerTransactionDocumentTemplate has the technical Name CustomerTransactionDocumentTemplateProcessingExternalProvidingOut.ConfirmCustomer TransactionDocumentTemplate. The Confirm CustomerTransactionDocumentTemplate operation confirms creation/change as well as the processing progress of a CustomerTransactionDocumentTemplate document to the Requester. The operation for form output is based on the FormServiceRequestConfirmation message type (MT), which is, in turn, based on the FormServiceRequestMessage message data type (MDT) (derived from the ServiceRequest business object).

Service Interface External Requesting Out has the technical Name

CustomerTransactionDocumentTemplateProcessingExternalRequestingOut. The External Requesting Out service interface is part of the following process component interaction model: CustomerTransactionDocumentTemplate Processing_CustomerTransactionDocumentTemplate Processing at Provider. The External Requesting Out service interface contains the operation for requesting the creation/change of a CustomerTransactionDocumentTemplate document at the provider.

Operation Request Service has the Technical Name CustomerTransactionDocumentTemplateProcessingExternalRequestingOut.RequestService The operation Request Service requests the create/change of a CustomerTransactionDocumentTemplate document at the provider. The operation is based on the Service Request message type (MT), which is, in turn, based on the ServiceRequestMessage message data type (MDT) (derived from the ServiceRequest business object).

Service Interface External Requesting In has the Technical Name

CustomerTransactionDocumentTemplateProcessingExternalRequestingIn

The External Requesting In service interface is part of the process component interaction model.

CustomerTransactionDocumentTemplate Processing_CustomerTransactionDocumentTemplate Processing at Provider. The External Requesting In service interface contains the operation for updating a CustomerTransactionDocumentTemplate document on the basis of a message received from a provider to confirm the creation/change, or to transfer a processing progress.

Operation Change CustomerTransactionDocumentTemplate based on Provider's Confirmation has the technical Name. CustomerTransactionDocumentTemplateProcessingExternalRequestingIn.ChangeServiceRequestBasedOnProvidersConfirmation The operation Change CustomerTransactionDocumentTemplate based on Provider's Confirmation updates a CustomerTransactionDocumentTemplate document on the basis of a message received from a provider, to confirm the creation/change, or to transfer a processing progress.

The operation is based on the ServiceRequestConfirmation message type (MT), which is, in turn, based on the ServiceRequestMessage message data type (MDT) (derived from the ServiceRequest business object).

Service Interface Request Invoicing Out has the technical Name

CustomerTransactionDocumentTemplateProcessingRequestInvoicingOut. The Request Invoicing Out service interface is part of the process component interaction model.

CustomerTransactionDocumentTemplate Processing_Customer Invoice Processing. The Request Invoicing Out service interface includes the operations for requesting an invoice or a credit memo for a CustomerTransactionDocumentTemplate document.

Operation Request Invoicing has the technical Name

CustomerTransactionDocumentTemplateProcessingRequestInvoicingOut.RequestInvoicing The Request Invoicing operation requests invoicing for a CustomerTransactionDocumentTemplate document The operation is based on the CustomerInvoiceRequestRequest message type (MT), which is, in turn, based on the InvoiceDueMessage message data type (MDT) (derived from the CustomerInvoiceRequest business object).

Service Interface Request Invoicing In has the technical Name

CustomerTransactionDocumentTemplateProcessingRequestInvoicingIn. The Request Invoicing In service interface is part of the process component interaction model: CustomerTransactionDocumentTemplate Processing_Customer Invoice Processing. The Request Invoicing In service interface contains the operation for documenting invoices and credit memos issued to the customer in the CustomerTransactionDocumentTemplate document.

Operation Change CustomerTransactionDocumentTemplate based on Customer Invoice has the technical Name CustomerTransactionDocumentTemplateProcessingRequestInvoicingIn.ChangeCustomerTransactionDocumentTemplateBasedOnCustomerInvoice. The Change CustomerTransactionDocumentTemplate based on Customer Invoice operation updates a CustomerTransactionDocumentTemplate document for documenting invoices and credit memos issued to the customer in the CustomerTransactionDocumentTemplate document. The operation is based on the CustomerInvoiceIssuedConfirmation message type (MT), which is, in turn, based on the InvoiceIssuedMessage message data type (MDT) (derived from the CustomerInvoice business object).

Service Interface Fulfilment Out has the technical Name CustomerTransactionDocumentTemplateProcessingFulfilmentOut. The Fulfilment Out service interface is part of the process component interaction model: CustomerTransactionDocumentTemplate Processing_Customer Requirement Processing. The Fulfilment Out service interface contains operations for requesting availability information, provision planning and execution for spare part items in a CustomerTransactionDocumentTemplate document. The Fulfilment Out service interface contains operations for requesting availability information, provision planning and execution for compensation delivery items in a CustomerTransactionDocumentTemplate document.

The Fulfilment Out service interface contains operations for requesting availability information, provision planning and execution for sales items in a CustomerTransactionDocumentTemplate document. Operation Request Product Availability Info and provisional Reservation of Customer Requirement has the Technical Name CustomerTransactionDocumentTemplateProcessingFufilmentOut.RequestProductAvailabilityInfoAndProvisionalReservationOfCustomerReq. The Sync Request Customer Requirement Availability Information and Provisional Reservation operation requests availability information which includes a provisional reservation for compensation delivery items in a CustomerTransactionDocumentTemplate document.

The operation RequestProductAvailabilityInfoAndProvisionalReservationOfCustomerReq requests information on the availability of a product, including a provisional reservation for sales items and spare part items in a CustomerTransactionDocumentTemplate document.

The operation is based on the message type (MT) ProductAvailableToPromiseCheckRequest and ProductAvailableToPromiseCheckConfirmation, that, in turn, are based on the message data types (MDT) CustomerRequirementFulfilmentRequestMessage and CustomerRequirementFulfilmentConfirmationMessage (derived from the business object CustomerRequirement). Since the CustomerTransactionDocument template and the CustomerRequirement BO are harmonized with one another, the mapping describes those deviations that occur explicitly.

Operation Request Product Customer Requirement Reservation and Fulfilment has the technical Name CustomerTransactionDocumentTemplateProcessingFulfilmentOut.RequestProductCustomerRequirementReservationAndFulfilment. The Request Product Customer Requirement Reservation and Fulfilment operation requests the logistical planning and execution of sales items and spare part items in a CustomerTransactionDocumentTemplate document. The Request Customer Requirement Reservation and Fulfillment operation requests the logistical planning and execution of compensation delivery items in a CustomerTransactionDocumentTemplate document. The operation is based on the CustomerRequirementFulfillmentRequest message type (MT), which is, in turn, based on the CustomerRequirementFulfillmentRequestMessage message data type (MDT) (derived from the CustomerRequirement business object). Since the CustomerTransactionDocument template and the CustomerRequirement BO are harmonized with one another, the mapping describes those deviations that occur explicitly.

Operation Register Product Customer Requirement Deletion Notification has the Technical Name CustomerTransactionDocumentTemplateProcessingFulfilmentOut.Register ProductCustomerRequirementDeletionNotification. The Register Product Customer Requirement Deletion Notification operation flags a provisional reservation for a compensation delivery item to be deleted, and deletes the reservation if there is a system failure or the transaction is cancelled. The Register Product Customer Requirement Deletion Notification operation flags a provisional reservation for a sales item or a spare part item to be deleted, and deletes the reservation if there is a system failure or the transaction is cancelled. The operation is based on the Provisional Customer Requirement Deletion Notification message type (MT), which is, in turn, based on the ProvisionalCustomerRequirementDeleteNotificationMessage message data type (MDT).

Service Interface Fulfilment In has the Technical Name CustomerTransactionDocumentTemplateProcessingFulfilmentIn. The Fulfilment In service interface is part of the process component interaction model: CustomerTransactionDocumentTemplate Processing_Customer Requirement Processing. The Fulfillment In service interface contains the operations for updating the sales items of a CustomerTransactionDocumentTemplate document. They are updated on the basis of a message (received by an internal planning system) confirming the creation/change of a requirements reservation or confirming an actual execution (own delivery, delivery by a third-party). The Fulfillment In service interface contains the operations for updating a CustomerTransactionDocumentTemplate document on the basis of availability confirmations, reservation confirmations, and delivery confirmations of compensation delivery items. The Fulfillment In service interface contains the operations for updating a CustomerTransactionDocumentTemplate document on the basis of availability confirmations and reservation confirmations for compensation delivery items as well as confirmations concerning the pick-up of spare parts by a technician or the delivery of spare parts.

Operation Change CustomerTransactionDocumentTemplate based on Product Available to Promise Update has the Technical Name CustomerTransactionDocumentTemplateProcessingFulfilmentIn.ChangeCustomerTransactionDocumentTemplateBasedOn ProductAvailableToPromiseUpdate. The operation Change CustomerTransactionDocumentTemplate based on Product Available to Promise Update updates the CustomerTransactionDocumentTemplate document: partner data, location data, product data, creation of subitems, schedule line data and dates for execution planning from the ProductAvailableToPromiseUpdateNotification (planning information to the seller regarding the current planning status of availability execution). The inbound data from the message is enhanced with additional data from the master and Customizing data. The operation is based on the Product Available To Promise Update Notification message type (MT), which is, in turn, based on the CustomerRequirementFulfillmentConfirmationMessage message data type (MDT) (derived from the CustomerRequirement business object). Since the CustomerTransactionDocument template and the CustomerRequirement BO are harmonized with one another, the mapping describes those deviations that occur explicitly.

Operation Change CustomerTransactionDocumentTemplate based on Product Customer Requirement Fulfilment Confirmation has the Technical Name CustomerTransactionDocumentTemplateProcessingFulfilmentIn.ChangeCustomerTransactionDocumentTemplateBasedOn ProductCustomerRequirementFulfilmentConfirmation. The Change CustomerTransactionDocumentTemplate based on Product Customer Requirement Fulfilment Confirmation operation updates the CustomerTransactionDocumentTemplate document: the cumulated data of a CustomerTransactionDocumentTemplate item that is derived from the fulfilment process from the Customer Requirement Fulfilment Confirmation (information of logistics execution to the seller about the actual material availability execution). The Change CustomerTransactionDocumentTemplate based on Spare Part Fulfillment Confirmation operation updates a CustomerTransactionDocumentTemplate document on the basis of an execution confirmation concerning the delivery of a compensation delivery item. The Change CustomerTransactionDocumentTemplate based on Product Customer Requirement Fulfillment Confirmation operation updates a CustomerTransactionDocumentTemplate document on the basis of an execution confirmation concerning the delivery of a compensation delivery item. The operation is based on the Customer Requirement Fulfillment Confirmation message type (MT), which is, in turn, based on the CustomerRequirementConfirmationMessage message data type (MDT) (derived from the CustomerRequirement business object). Since the CustomerTransactionDocument template and the CustomerRequirement BO are harmonized with one another, the mapping describes those deviations that occur explicitly.

Service Interface Product and Resource Valuation Out has the technical name CustomerTransactionDocumentTemplateProcessingProductAndResourceValuationOut. The Product and Resource Valuation Out service interface is part of the process component interaction model. The Product and Resource Valuation Out service interface contains operations for requesting valuation of products in a CustomerTransactionDocumentTemplate document.

Operation Request Product Valuation

Technical name is CustomerTransactionDocumentTemplateProcessingProductAndResourceValuationOut.RequestProductValuation. The Request Product Valuation operation requests valuation of products in a CustomerTransactionDocumentTemplate document. The operation is based on the ProductAndResourceValuationRequest and ProductAndResourceValuationResponse message type (MT), which is, in turn, based on the message data type (MDT) ProductAndResourceValuationMessage (derived from the ProductAndResourceValuation business object).

Service Interface Inventory Changing Out has the Technical name CustomerTransactionDocumentTemplateProcessingInventoryChangingOut. The Inventory Changing Out service interface is part of the process component interaction model: CustomerTransactionDocumentTemplate Processing_Inventory Processing. The Inventory Changing Out service interface contains operations for notifying Inventory Processing about consumption of spare parts as well as the cancelled confirmation of those consumed spare parts provided.

Operation Notify of Spare Part Consumption has the Technical name

CustomerTransactionDocumentTemplateProcessingInventoryChangingOut.NotifyOfSparePartConsumption. The operation Notify of Spare Part Consumption notifies Inventory Processing about consumption of spare parts. The operation is based on the Goods And Activity Confirmation Inventory Change Notification message type (MT), which is, based on the GoodsAndActivityConfirmation message data type (MDT) (derived from the Goods And Activity Confirmation business object).

Node Structure of Business Object CustomerTransactionDocumentTemplate

The CustomerTransactionDocument is a customer-specific business transaction that focuses on the delivery of goods or provision of services, the prices, and the preparation for invoicing.

CustomerTransactionDocument occurs in the following complete and disjoint specializations:

A SalesOrder is an agreement regarding the sale of goods or services.

A ServiceOrder is an agreement between a service provider and a customer concerning the provision of services. A ServiceRequest is a request made by a customer asking for clarification of an issue concerning a product. In addition to the description and categorization of the issue, the ServiceRequest contains the documentation and results of the clarification, as well as the expenses incurred.

A ServiceRequest contains the parties involved in this request and their entitlements as well as the product for which the request has been made. Moreover, the ServiceRequest contains items for confirming the resulting cost of processing. The ServiceRequest itself contains identifying and administrative information. A ServiceConfirmation is the confirmation of working hours and spare parts that a service technician needed to carry out a service for a customer.

The ServiceConfirmation contains the parties involved in the execution of the service, such as the service engineer and the customer, the items, and agreements concerning the service and invoicing. The ServiceConfirmation itself contains identifying and administrative information.

A CustomerQuote is a quote by a seller to a customer regarding the delivery of goods, or the provision of services at a specific price, quantity and date. A CustomerComplaint is a complaint from a customer. It contains the issue of the complaint, the requirements of the customer, and the appropriate actions to satisfy the customer. CustomerComplaint contains parties involved in this complaint, such as the customer, items, as well as sales, service and invoicing-specific information, its status, as well as references; CustomerComplaint itself contains identifying and administrative information.

A CustomerReturn is a request from the customer to the seller to take back goods that have been delivered. A ServiceContract is an agreement that is made between a service provider and a customer for a specific time period, and is used as a basis for processing service requests and service orders. In the service contract it is possible to specify the type and scope of services that are provided to the customer, as well as particular service levels. The agreements that have been made in the service contract can be invoiced to the customer. A ServiceContract contains details of the parties involved in this agreement (for example, the service provider and the customer), the items, the sales/delivery/service/billing-specific information, as well as its status and references. The ServiceContract itself contains identifying as well as administrative information.

A CustomerTransactionDocumentTemplate contains details of the parties involved in this agreement (for example, the seller and the customer), the items, the sales/delivery/service/invoicing-specific information, as well as its status and references. The CustomerTransactionDocumentTemplate itself contains identifying as well as administrative information. A SupportRequest is a request to eliminate an error in an IT solution. The request is either triggered by a user, or by the system itself. It documents the error, the solution process, and the solutions found. The SupportRequest contains data on the requester, the nature and context of the error. It can also contain a description of the symptom, attributes for classification of errors, problem, cause, meaning and so on. It permits an appropriate reaction, prioritization and sequence in processing.

Elements

The elements located directly at the CustomerTransactionDocumentTemplate node are defined by the type GDT: CustomerTransactionDocumentElements. These elements are ID—The unique identifier assigned by the seller for a CustomerTransactionDocumentTemplate. It is type GDT: BusinessTransactionDocumentID.

ProcessingTypeCode—Encoded representation of CustomerTransactionDocumentTemplate processing within the process component. It is type GDT: BusinessTransactionDocumentProcessingTypeCode. The ProcessingTypeCode ("transaction type") includes standard orders, for example.

TypeCode is an encoded representation of the type of CustomerTransactionDocumentTemplate.

It is type GDT: BusinessTransactionDocumentTypeCode. This is set internally and contains the fixed value CustomerTransactionDocumentTemplate. It is used to display the type in crossbusiness object lists, for example.

DateTime is the creation date time of a CustomerTransactionDocumentTemplate, from a business perspective. It is type GDT: GLOBAL_DateTime Qualifier: Posting.

Name is the name of a CustomerTransactionDocumentTemplate. It is type GDT: _MEDIUM_Name.

Buyer ID is a Unique identifier for a CustomerTransactionDocumentTemplate assigned by the buyer. It is type GDT: BusinessTransactionDocumentID.

BuyerDateTime is a Date time assigned by the buyer for a CustomerTransactionDocumentTemplate. It is type GDT: GLOBAL_DateTime and Qualifier: BuyerPosting.

BuyerName is a Short text description for a CustomerTransactionDocumentTemplate assigned by the buyer. It is type GDT: _MEDIUM_Name.

DataOriginTypeCode is a Type of the source of a CustomerTransactionDocumentTemplate.

It is type GDT: CustomerTransactionDocumentDataOriginTypeCode.

SystemAdministrativeData is Administrative data stored in a system. This data includes system users and change dates/times. It is type GDT: SystemAdministrativeData.

UUID is the universally unique CustomerTransactionDocumentTemplate identifier assigned internally. It is type GDT: UUID. UUID serves as an alternate key, with which other business objects can define foreign keys.

FulfilmentBlockingReasonCode specifies why the CustomerTransactionDocumentTemplate document is blocked for the delivery of goods or the provision of services. It is type GDT: CustomerTransactionDocumentFulfilmentBlockingReasonCode. MigratedDataAdaptationTypeCode is a coded representation of the type of data adaptation performed during migration of CustomerTransactionDocumentTemplate. It is type GDT: MigratedDataAdaptationTypeCode. When migrating data from a source system to a target system this data may be adapted, for example, a business object or business document may be taken over completely or partially. The MigratedDataAdaptationTypeCode is used, when a CustomerTransactionDocumentTemplate is migrated. The CustomerTransactionDocumentStatus element describes all statuses of the CustomerTransactionDocumentTemplate.

AggregatedCustomerOrderLifeCycleStatusCode aggregates the life cycle status of the items.

It is type GDT: CustomerOrderLifecycleStatusCode Qualifier Aggregated.

AggregatedCancellationStatusCode aggregates the cancellation status of the items. It is type GDT: CancellationStatusCode.

AggregatedFulfilmentProcessingStatusCode aggregates the fulfillment status of the items. It is type GDT: ProcessingStatusCode and Qualifier AggregatedFulfilment.

GeneralDataCompletenessStatusCode status represents that all or part of the general business data is missing. It is type GDT: DataCompletenessStatusCode (Qualifier General).

AggregatedInvoicingBlockingStatusCode status represents a block of the invoicing process of the items in an aggregated form. In case of returns, this is set to Unblocked after the Invoice Block status is set to Unblocked for all the items. It is type GDT: BlockingStatusCode and Qualifier Invoicing.

InvoicingBlockingStatusCode status represents a block of the invoicing process. It is type GDT: BlockingStatusCode and Qualifier: Invoicing.

AggregatedInvoicingProcessingStatusCode status represents an aggregated representation of all InvoicingStatus of the items. It is type GDT: ProcessingStatusCode and Qualifier AggregatedInvoicing.

ConsistencyStatusCode: The status describes a status consisting of errors, where business data is not consistent, or data contains errors. It is type GDT: ConsistencyStatusCode.

AggregatedCustomerQuoteLifeCycleStatusCode: The status represents the CustomerQuoteLifeCycleStatus of the items in an aggregated form. It is type GDT CustomerQuoteLifeCycleStatusCode Qualifier Aggregated.

ApprovalStatusCode: The status describes whether an approval by the creator of the quote has taken place. It is type GDT: ApprovalStatusCode.

AggregatedPlanningReleaseStatusCode: The status represents the PlanningReleaseStatusCode of the items in an aggregated form. It is type GDT: ReleaseStatusCode and Qualifier: AggregatedPlanning.

AggregatedExecutionReleaseStatusCode: The status represents the ExecutionReleaseStatusCode of the items in an aggregated form. It is type GDT: ReleaseStatusCode and Qualifier: AggregatedExecution.

AggregatedFulfilmentBlockingStatusCode: The status represents a block of the delivery of goods or the provision of services. It is GDT: BlockingStatusCode and Qualifier AggregatedFulfilment.

ServiceRequestLifeCycleStatusCode: The status represents the essential progress of the CustomerTransactionDocumentTemplate document. It is type GDT ServiceRequestLifecycleStatusCode.

RequestAssignmentStatusCode: The status represents from which of the participants an action is expected. It is type GDT: RequestAssignmentStatusCode.

SolutionStatusCode: The status represents the essential processing progress of the solution in a document. It is type GDT: SolutionStatusCode.

ProductAvailabilityConfirmationStatusCode is the status that provides the result of an availability check. It is type GDT: ProductAvailabilityConfirmationStatusCode.

ConfirmationIssuingStatusCode is the status that represents the state of the issuing process of a confirmation. Issuing can be printed or output via xml or by any other output method. It is type GDT: IssuingStatusCode and Qualifier: Confirmation.

Composition Relationships include Overview 36210 may have a cardinality of 1:1, BusinessProcessVariantType 36220 may have a cardinality of 1:n, Party 36102 may have a cardinality of 1:cn, SalesAndServiceBusinessArea 36134 may have a cardinality of 1:c, Location 36132 may have a cardinality of 1:cn, SalesTerms 36140 may have a cardinality of 1:c, DeliveryTerms 36136 may have a cardinality of 1:c, InvoiceTerms 36152 may have a cardinality of 1:c, PricingTerms 36148 may have a cardinality of 1:c, PriceAndTaxCalculation 36150 may have a cardinality of 1:c, TransportationTerms 36138 may have a cardinality of 1:c, CashDiscountTerms 36144 may have a cardinality of 1:c, TimePointTerms 36186 may have a cardinality of 1:cn, PeriodTerms 36184 may have a cardinality of 1:cn, DurationTerms 36182 may have a cardinality of 1:cn, TotalValues 36154 may have a cardinality of 1:c, PaymentControl 36146 may have a cardinality of 1:c, BusinessTransactionDocumentReference 36208 may have a cardinality of 1:cn, TextCollection 36218 may have a cardinality of 1:c, ServiceTerms 36142 may have a cardinality of 1:c, IncidentServiceIssueCategory 36156 may have a cardinality of 1:cn, ServiceReferenceObject 36214 may have a cardinality of 1:cn, CoveredObject 36158 may have a cardinality of 1:cn, AttachmentFolder 36216 may have a cardinality of 1:c, SolutionProposal 36116 may have a cardinality of 1:cn, AccessControlList 36222 may have a cardinality of 1:1, and ControlledOutputRequest 36212 may have a cardinality of 1:c.

Inbound Association Relationships

From business object BusinessDocumentFlow (TO)/node Root include BusinessDocumentFlow may have a cardinality of c:c Association from BusinessDocumentFlow which is a view on the set of all preceding and succeeding business (transaction) documents for the current CustomerTransactionDocumentTemplate document From business object Identity/node Root CreationIdentity may have a cardinality of c:cn foreign key association to BO Identity LastChangeIdentity may have a cardinality of c:cn foreign key association to BO Identity Specialization Associations for Navigation To node BusinessProcessVariantType:

MainBusinessProcessVariantType may have a cardinality of c:c Association to the BusinessProcessVariantType that is the main one To node Party:

BuyerParty may have a cardinality of c:c Association to the Party that occurs in the BuyerParty specialization.

SellerParty may have a cardinality of c:c Association to the Party that occurs in the SellerParty specialization.

ProductRecipientParty may have a cardinality of c:c Association to the Party that occurs in the ProductRecipientParty specialization.

Vendor Party may have a cardinality of c:c Association to the Party that occurs in the Vendor Party specialization.

BillToParty may have a cardinality of c:c Association to the Party that occurs in the BillToParty specialization.

PayerParty may have a cardinality of c:c Association to the Party that occurs in the PayerParty specialization SalesUnitParty may have a cardinality of c:c Association to the Party that occurs in the SalesUnit specialization.

ServiceSupportTeamParty may have a cardinality of c:c Association to the Party that occurs in the ServiceSupportTeam specialization.

ServiceExecutionTeamParty may have a cardinality of c:c Association to the Party that occurs in the ServiceExecutionTeam specialization.

EmployeeResponsibleParty may have a cardinality of c:c Association to the Party that occurs in the EmployeeResponsible specialization.

Processor Party may have a cardinality of c:c Association to the Party that occurs in the Processor specialization ServicePerformerParty may have a cardinality of c:c Association to the Party that occurs in the ServicePerformer specialization.

ContractReleaseAuthorisedParty may have a cardinality of c:c Association to the Party that occurs in the ContractReleaseAuthorisedParty specialization.

FreightForwarderParty may have a cardinality of c:c Association to the Party that occurs in the FreightForwarderParty specialization.

To node Location:

ShipToLocation may have a cardinality of c:c Association to the Location that occurs in the ShipToLocation specialization.

ShipFromLocation may have a cardinality of c:c Association to the Location that occurs in the ShipFromLocation specialization.

ServicePointLocation may have a cardinality of c:c Location that occurs in the ServicePointLocation specialization.

To node TimePointTerms:

FirstReactionDueTimePoint may have a cardinality of c:c association to a TimePointTerms that occurs in the FirstReactionDueTimePoint specialization.

CompletionDueTimePoint may have a cardinality of c:c association to a TimePointTerns that occurs in the CompletionDueTimePoint specialization.

RequestInitialReceiptTimePoint may have a cardinality of c:c association to a TimePointTerms that occurs in the RequestInitialReceiptTimePoint specialization.

RequestReceiptTimePoint may have a cardinality of c:c association to a TimePointTerms that occurs in the RequestReceiptTimePoint specialization.

RequestInProcessAtTimePoint may have a cardinality of c:c association to a TimePointTerms that occurs in the RequestInProcessAtTimePoint specialization.

RequestFinishedAtTimePoint may have a cardinality of c:c association to a TimePointTerms that occurs in the RequestFinishedAtTimePoint specialization.

RequestClosedAtTimePoint may have a cardinality of c:c association to a TimePointTerms that occurs in the RequestClosedAtTimePoint specialization.

RequestSentToProviderAtTimePoint may have a cardinality of c:c association to a TimePointTerms that occurs in the RequestSentToProviderAtTimePoint specialization.

RequestCompletionByProviderDueTimePoint may have a cardinality of c:c association to a TimePointTerms that occurs in the RequestCompletionByProviderDueTimePoint specialization.

RequestReceivedFromProviderAtTimePoint may have a cardinality of c:c association to a TimePointTerms that occurs in the RequestReceivedFromProviderAtTimePoint specialization.

CompletionTimePoint may have a cardinality of c:c association to a TimePointTerms that occurs in the CompletionTimePoint specialization.

To node PeriodTerms:

RequestedFulfilmentPeriod may have a cardinality of c:c association to a PeriodTerms that occurs in the RequestedFulfilmentPeriod specialization.

ValidityPeriod may have a cardinality of c:c association to a PeriodTerms that occurs in the ValidityPeriod specialization.

To node DurationTerms:

MaximumFirstReactionDuration may have a cardinality of c:c association to a DurationTerms that occurs in the MaximumFirstReactionDuration specialization.

MaximumCompletionDuration may have a cardinality of c:c association to a DurationTerms that occurs in the MaximumCompletionDuration specialization.

RequestMaximumProviderCompletionDuration may have a cardinality of c:c association to a DurationTerms that occurs in the RequestMaximumProviderCompletionDuration specialization.

RequestTotalInitialReactionDuration may have a cardinality of c:c association to a DurationTerms that occurs in the RequestTotalInitialReactionDuration specialization.

RequestTotalProcessingDuration may have a cardinality of c:c association to a DurationTerms that occurs in the RequestTotalProcessingDuration specialization.

RequestTotalRequestorDuration may have a cardinality of c:c association to a DurationTerms that occurs in the RequestTotalRequestorDuration specialization.

RequestTotalProviderProcessingDuration may have a cardinality of c:c association to a DurationTerms that occurs in the RequestTotalProviderProcessingDuration specialization.

To node BusinessTransactionDocumentReference:

BaseCustomerQuoteReference may have a cardinality of c:cn association to a reference that occurs in the CustomerQuoteReference specialization, and is used as a basis.

PurchaseOrderReference may have a cardinality of c:c association to a reference that occurs in the PurchaseOrderReference specialization.

SalesOrderReference may have a cardinality of c:cn association to a BTDReference that occurs in the SalesOrderReference specialization.

OutboundDeliveryReference may have a cardinality of c:cn association to a reference that occurs in the OutboundDeliveryReference specialization.

CustomerInvoiceReference may have a cardinality of c:cn association to a reference that occurs in the InvoiceReference specialization.

BaseBusinessTransactionDocumentReference may have a cardinality of c:c association to a reference that occurs in the any specialization, and is used as a basis. In the use case of returns, the BaseBusinessTransactionDocumentReference is either a sales order or a customer invoice.

ServiceRequestReference may have a cardinality of c:c association to a reference that occurs in the ServiceRequestReference specialization.

ServiceContractReference may have a cardinality of c:cn association to a reference that occurs in the ServiceOrderReference specialization.

ServiceConfirmationReference may have a cardinality of c:cn association to a reference that occurs in the ServiceConfirmationReference specialization.

BaseServiceOrderReference may have a cardinality of c:c association to a reference that occurs in the ServiceOrderReference specialization, and is used as a basis.

CustomerComplaintReference may have a cardinality of c:cn association to a reference that occurs in the CustomerComplaintReference specialization.

EmailActivityReference may have a cardinality of c:cn association to a reference that occurs in the EmailActivityReference specialization.

PhoneCallActivityReference may have a cardinality of c:cn association to a reference that occurs in the PhoneCallActivityReference specialization.

LetterActivityReference may have a cardinality of c:cn association to a reference that occurs in the LetterActivityReference specialization.

FaxActivityReference may have a cardinality of c:cn association to a reference that occurs in the FaxActivityReference specialization.

AppointmentActivityReference may have a cardinality of c:cn association to a reference that occurs in the AppointmentActivityReference specialization.

OpportunityReference may have a cardinality of c:cn association to a reference that occurs in the OpportunityReference specialization.

SelectedDocumentReference may have a cardinality of c:cn association for navigation to selected business document references that are important for the business document flow ActivityReference may have a cardinality of c:cn association to a reference that occurs in the ActivityReference specialization.

To Node IncidentServiceIssueCategory:

MainIncidentServiceIssueCategory may have a cardinality of c:c association to an IncidentServiceIssueCategory, representing the main issue category of the individual issue.

To node ServiceReferenceObject:

MainServiceReferenceObject may have a cardinality of c:c association to the main object to which the service refers.

To Node Item 36036:

SalesItem 36050 may have a cardinality of c:cn association to an Item that occurs in the SalesItem specialization. CustomerServiceItem 36046 may have a cardinality of c:cn association to an item that occurs in the CustomerServiceItem specialization. CustomerSparePartItem 36048 may have a cardinality of c:cn association to an item that occurs in the CustomerSparePartItem specialization. CustomerServiceConfirmationItem 36040 may have a cardinality of c:cn association to an item that occurs in the CustomerServiceConfirmationItem specialization. CustomerSparePartConfirmationItem 36064 may have a cardinality of c:cn association to an item that occurs in the CustomerSparePartConfirmationItem specialization. ComplaintItem 36054 may have a cardinality of c:cn association to an item that occurs in the ComplaintItem specialization. CustomerReturnItem 36056 may have a cardinality of c:cn association to an item that occurs in the CustomerReturnItem specialization. CompensationDeliveryItem 36058 may have a cardinality of c:cn association to an item that occurs in the CompensationDeliveryItem specialization. RefundItem 36060 may have a cardinality of c:cn association to an item that occurs in the RefundItem specialization. ServiceContractItem 36038 may have a cardinality of c:cn association to an item that occurs in the ServiceContractItem specialization. SalesQuoteItem 36052 may have a cardinality of c:cn association to an item that occurs in the SalesQuoteItem specialization. CustomerSparePartQuoteItem 36042 may have a cardinality of c:cn. CustomerServiceQuoteItem 36044 may have a cardinality of c:cn. SalesContractItem 36062 may have a cardinality of c:cn.

TypeCode and ProcessingTypeCode cannot be changed after they have been created.

DateTime and BuyerDateTime cannot be changed after they have been created. The SystemAdministrativeData is set internally by the system. Data cannot be assigned or changed externally. Once a CustomerTransactionDocumentTemplate has been created, the document may be deleted if no subsequent processes have been started (mapped via statuses that forbid the delete action). In this case, the document can be canceled.

Enterprise Service Infrastructure Actions

CheckPaymentCardAndAuthorize (S&AM Action): This action checks the validity of the customer's PaymentCard and authorizes the amount to be invoiced. There are no preconditions. Resulting changes in status: This action causes the PaymentCardStatus to be set either to 'ok' or 'not ok'.

BlockFulfilment (S&AM): This action blocks the item for delivery by setting a delivery block.

This action may be valid for the items relevant to delivery. It may bring about changes in the status: The action sets the status variable 'FulfilmentBlocking' to 'blocked'. The action elements are defined by the data type CustomerTransactionDocumentBlockDeliveryActionElements. These elements are: CustomerTransactionDocumentFulfilmentBlockingReasonCode specifies why delivery processing for the business transaction item is blocked. It is type GDT: BlockingReasonCode.

UnblockFulfilment (S&AM Aktion): This action resets the delivery block. This action may be applicable for delivery relevant items on which a delivery block has been placed. Resulting changes in the status: The action changes the 'FulfilmentBlocking' status variable from 'blocked' to 'not blocked'.

RequestConfirmationIssue (S&AM action): The action represents the request to issue an confirmation. Resulting changes in the status: The action changes the 'ConfirmationIssuing' status variable from 'NotIssued' to 'IssueRequested'.

NotifyOfConfirmationIssue (S&AM action): The action notifies the successful issuing of the confirmation, it sets the ConfirmationIssuingStatusCode from IssueRequested to Issued. Resulting changes in the status: The action changes the 'ConfirmationIssuing' status variable from 'IssueRequested' to 'Issued.'

InitializeConfirmationIssuing (S&AM action): Initializes the issuing of the confirmation. Resulting changes in the status: The action changes the 'ConfirmationIssuing' status variable from 'Issued' to 'NotIssued'.

AddReferenceWithDataProvision

This action adds a BusinessTransactionDocumentReference and provides relevant data from the referenced document to a CustomerTransactionDocumentTemplate document. The action elements that are used to identify the referenced document are defined by the data type CustomerTransactionDocumentAddReferenceWithDataProvisionActionElements. These elements are: ID, TypeCode, CreateWithReference, and CreateFromBusinessPartner. ID is type GDT: BusinessTransactionDocumentID. TypeCode is type GDT: BusinessTransactionDocumentTypeCode. CreateWithReference is an action that creates a CustomerTransactionDocumentTemplate document with reference to an existing document, from which relevant data is transferred.

CreateFromBusinessPartner

This action creates a CustomerTransactionDocumentTemplate document with the provided Business Partner as the buyer party.

TakeOverForProcessing: This action replaces the Processor Party of the CustomerTransactionDocumentTemplate document with the Employee derived from the system user. In this way, the Employee becomes the processor for the CustomerTransactionDocumentTemplate document. Changes to the object: This action replaces the Processor Party of the CustomerTransactionDocumentTemplate document with the Employee derived from the system user. The action can be called by a user interface.

StartProcessing (S&AM Action): This action sets the life cycle status of the CustomerTransactionDocumentTemplate document to "In Process." This action sets the life cycle status of the CustomerTransactionDocumentTemplate document to "In Process."

Close (S&AM Action): This action sets the life cycle status of the CustomerTransactionDocumentTemplate document to "Closed." This action is relevant for those CustomerTransactionDocumentTemplate documents that have the status "Finished."

This action sets the life cycle status of the CustomerTransactionDocumentTemplate document to "Closed."

ProposeSolution (S&AM Action): This action sets the RequestAssignmentStatus of the CustomerTransactionDocumentTemplate document to "RequestorAction." This action is relevant for those CustomerTransactionDocumentTemplate documents that have life cycle status "In Process."This action sets the RequestAssignmentStatus.

AcceptSolution (S&AM Action): This action sets the Solutionstatus of the CustomerTransactionDocumentTemplate document to "Solution accepted." This action is relevant for those CustomerTransactionDocumentTemplate documents that have the life cycle status "InProcess" and the Solutionstatus "Solution proposed." This action sets the life cycle status to "Closed" and the Solutionstatus to "Solution proposed."

RejectSolution (S&AM Action): This action sets the Solutionstatus of the CustomerTransactionDocumentTemplate document to "Solution rejected." This action is relevant for those CustomerTransactionDocumentTemplate documents that have the life cycle status "InProcess" and the Solutionstatus "Solution proposed." This action sets the Solutionstatus and the RequestAssignmentStatus.

RequestRequestorAction (S&AM Action): This action sets the RequestAssignmentStatus of the CustomerTransactionDocumentTemplate document to "RequestorAction." This action is relevant for those CustomerTransactionDocumentTemplate documents that have life cycle status "In Process." This action sets the RequestAssignmentStatus.

RequestProviderAction (S&AM Action): This action sets the RequestAssignmentStatus of the CustomerTransactionDocumentTemplate document to "Provider Action." This action is relevant for those CustomerTransactionDocumentTemplate documents that have life cycle status "In Process." This action sets the RequestAssignmentStatus.

RequestProcessorAction (S&AM Action): This action sets the RequestAssignmentStatus of the CustomerTransactionDocumentTemplate document to "Processor Action." This action is relevant for those CustomerTransactionDocumentTemplate documents that have life cycle status "In Process." This action sets the RequestAssignmentStatus.

Finish (S&AM Action): This action sets the life cycle status of the CustomerTransactionDocumentTemplate document to "Finished." This action is relevant for those CustomerTransactionDocumentTemplate documents that have the status "In Process."

This action sets the life cycle status of the CustomerTransactionDocumentTemplate document to "Finished."

BlockInvoicing (S&AM Action): This action locks the CustomerTransactionDocumentTemplate documents for invoicing by setting the invoicing block. This action is valid for invoice relevant CustomerTransactionDocumentTemplate documents. This action sets the status variable 'InvoicingBlocking' to 'blocked'. The action elements are defined by the data type CustomerTransactionDocumentBlockInvoicingActionElements. These elements are:

InvoicingBlockingReasonCode specifies why processing of invoicing documents is blocked for the business transaction item. It is type GDT: InvoicingBlockingReasonCode, UnblockInvoicing (S&AM Action): This action removes the invoice block. This action is valid for invoice relevant CustomerTransactionDocumentTemplate documents with an invoice block. This action changes the InvoiceBlock status from 'blocked' to 'not blocked'.

CheckGeneralDataCompleteness (S&AM Action): This action checks for general data completeness.

CheckConsistency (S&AM Action): This action checks the CustomerTransactionDocumentTemplate for errors.

SubmitForApproval (S&AM Action): The actions sets either the value 'ApprovalNotNecessary' or 'InApproval' of the ApprovalStatus.

Approve (S&AM Action): The action sets the value 'Approved' of the ApprovalStatus.

Reject (S&AM Action): The action sets the value 'Rejected' of the ApprovalStatus.

Withdraw (S&AM Action): The action sets the value 'Withdrawn' of the ApprovalStatus.

SendBackForRevision (S&AM Action): The action sets the value 'InRevision' of the ApprovalStatus.

Queries

QueryByElements

Returns a list of all CustomerTransactionDocumentTemplate documents containing the specified selection criteria. The selection criteria are specified by a logical 'AND' combination of query elements.

The query elements are defined by the data type: CustomerTransactionDocumentElementsQueryElements. These elements are:

ID is the unique identifier assigned by the seller for a CustomerTransactionDocumentTemplate. It is type GDT: BusinessTransactionDocumentID.

TypeCode is Encoded representation of the type of CustomerTransactionDocumentTemplate.

It is type GDT: BusinessTransactionDocumentTypeCode.

DateTime is the creation time (posting time) of a CustomerTransactionDocumentTemplate, from a business perspective.

It is type GDT: GLOBAL_DateTime and Qualifier: Posting.

Name is the name of a CustomerTransactionDocumentTemplate. It is type GDT: _MEDIUM_Name.

BuyerID is a unique identifier for a CustomerTransactionDocumentTemplate assigned by the buyer. It is type GDT: BusinessTransactionDocumentID.

BuyerName is Shorttext description for a CustomerTransactionDocumentTemplate assigned by the buyer. It is type GDT: _MEDIUM_Name.

SystemAdministrativeData is Administrative data stored in a system. This data includes system users and change dates/times. It is type GDT: SystemAdministrativeData.

CreationBusinessPartnerCommonPersonNameGivenName Administrative data stored in a system. This data includes system users and change dates/times. It is type GDT: Medium_Name.

CreationBusinessPartnerCommonPersonNameFamilyName Administrative data stored in a system. This data includes system users and change dates/times. It is type GDT: Medium_Name.

LastChangeBusinessPartnerCommonPersonNameGivenName Administrative data stored in a system. This data includes system users and change dates/times. It is type GDT: Medium_Name.

LastChangeBusinessPartnerCommonPersonNameFamilyName Administrative data stored in a system. This data includes system users and change dates/times.

It is type GDT: Medium_Name.

All statuses of the CustomerTransactionDocumentTemplate on root nodes SalesAndServiceBusinessAreaSalesOrganisationID is Identifier for the sales organization that is responsible for the CustomerTransactionDocumentTemplate. It is type GDT: OrganisationalCentreID.

SalesAndServiceBusinessAreaSalesGroupID is Identifier for the sales group that is responsible for the CustomerTransactionDocumentTemplate. It is type GDT: OrganisationalCentreID.

SalesAndServiceBusinessAreaSalesOfficeID is Identifier for the sales office that is responsible for the CustomerTransactionDocumentTemplate. It is type GDT: OrganisationalCentreID.

SalesAndServiceBusinessAreaDistributionChannelCode is coded representation of the distribution channel by which goods and services reach customers. It is type GDT: DistributionChannelCode.

SalesAndServiceBusinessAreaServiceOrganisationID is Identifier for the service organization It is type GDT: OrganisationalCentreID.

PartyBuyerPartyID is an identifier for the BuyerParty. It is type GDT: PartyID (without additional components, such as schemeAgencyID).

PartyEmployeeResponsiblePartyID is an identifier of the responsible employee. It is type GDT: PartyID (without additional components, such as schemeAgencyID).

PartyProcessor PartyID is an identifier of the processor of the CustomerTransactionDocumentTemplate document. It is type GDT: PartyID (without additional components, such as schemeAgencyID).

PartyServicePerformerPartyID is Identifier of the service performer. It is type GDT: PartyID (without additional components, such as schemeAgencyID).

PartyPartyID is an identifier for a Party or ItemParty within the business document. It is type GDT: PartyID (without additional components, such as schemeAgencyID).

The PartyPartyID or the ItemPartyPartyID corresponds with the query element PartyPartyID.

PartyRoleCode is the party role for a Party or ItemParty in the business document. It is type GDT: PartyRoleCode. The PartyPartyRoleCode or the ItemPartyPartyRoleCode corresponds with the query element PartyRoleCode.

ItemProductProductID is the identifier specified for the product. It is type GDT: ProductID.

ItemProductProductSellerID is the unique identifier for the product assigned by the seller. It is type GDT: ProductPartyID.

ItemProductProductBuyerID is the unique identifier for the product assigned by the buyer. It is type GDT: ProductPartyID.

ItemProductProductTypeCode is the Type of item product. It is type GDT: ProductTypeCode.

ServiceTermsServicePriorityCode is the Priority with which a service request or a service order is to be processed. It is type GDT: PriorityCode.

ServiceTermsServiceIssueCategoryID is an identifier for the service issue category that is used to categorize an individual incident within a service process. It is type GDT: ServiceIssueCategoryID.

SolutionProposalCustomerProblemAndSolutionID is an identifier for a solution. It is type GDT: KnowledgeBaseArticleID.

ServiceReferenceObjectMainMaterialID is a material to which the service primarily refers.

It is type GDT: ProductID (without additional components, such as schemeAgencyID).

ServiceReferenceObjectMainIndividualMaterialID is an individual material, to which the service primarily refers. It is type GDT: ProductID.

IncidentServiceIssueCategory-MainServiceIssueCategoryID is a main issue of a CustomerTransactionDocumentTemplate. It is type GDT: ServiceIssueCategoryID.

ValidityDate is the time period during which the CustomerTransactionDocumentTemplate document is valid. All those CustomerTransactionDocumentTemplate documents should be taken into account where the ValidityDate lies within the ValidityPeriod. It is type GDT: Date.

ValidityDatePeriod: A ValidityDatePeriod is the time during which a CustomerTransactionDocumentTemplate document is valid. It is type GDT: DatePeriod.

BusinessTransactionDocumentReferenceBusinessTransactionDocumentReferenceID: identifier of a referenced business document.

The BusinessTransactionDocumentReferenceBusinessTransactionDocumentReferenceID or the ItemBusinessTransactionDocumentReferenceBusinessTransactionDocumentReferenceID corresponds with the query element. BusinessTransactionDocumentReferenceBusinessTransactionDocumentReferenceID. It is type GDT: BusinessTransactionDocumentID.

BusinessTransactionDocumentReferenceBusinessTransactionDocumentReferenceTypeCode: Type of the referenced business transaction document. The BusinessTransactionDocumentReferenceBusinessTransactionDocumentReferenceTypeCode or the ItemBusinessTransactionDocumentReferenceBusinessTransaction DocumentReferenceTypeCode corresponds with the query element BusinessTransactionDocumentReferenceBusinessTransactionDocumentReferenceTypeCode. It is type GDT: BusinessTransactionDocumentTypeCode.

TimePointTermsFirstReactionDueDate The pointintime by which a response to a newly RECEIVED service request or service order is required. It is type GDT: Date.

TimePointTermsCompletionDueDate The pointintime by which a service request or service order can be fully processed. It is type GDT: Date.

ItemTimePointTermsCompletionDueDate The pointintime by which a service request or service order can be fully processed. It is type GDT: Date.

QueryByPartyAndItemReleasableProduct

Returns a list of all CustomerTransactionDocumentTemplate documents that contain the specified party or the specified product in the releasable products. The query elements are defined by the data type CustomerTransactionDocumentPartyAndItemReleasableProductQueryElements. These elements are: ItemPartyRoleCode: The party role of the party in the business document. It is type GDT: PartyRoleCode, ItemPartyID: Identifier for the party in the business document. It is type GDT: PartyID (without additional components, such as schemeAgencyID), PartyRoleCode: The party role of the party in the business document. It is type GDT: PartyRoleCode, PartyID: Identifier for the party in the business document. It is type GDT: PartyID (without additional components, such as schemeAgencyID), ItemReleasableProductID is the identifier specified for the releasable product. It is type GDT: ProductID, ItemReleasableProductCategoryID is the identifier specified for the product category. It is type GDT: ProductCategoryID. CustomerContractStatusCode is the lifecycle status of the contract. It is type GDT: CustomerContractStatusCode, and CreationDateTime is the creation time of a CustomerTransactionDocumentTemplate. It is type GDT: DateTime.

QueryByPartyAndItemCoveredObject

Returns a list of all CustomerTransactionDocumentTemplate documents that contain the specified party or the specified product in the covered objects. The query elements are defined by the data type CustomerTransactionDocumentPartyAndItemCoveredObjectQueryElements. These elements are: ItemPartyRoleCode: the party role of the party in the business document. It is type GDT: PartyRoleCode; ItemPartyID: Identifier for the party in the business document. It is type GDT: PartyID (without additional components, such as schemeAgencyID); PartyRoleCode: The party role of the party in the business document. It is type GDT: PartyRoleCode; PartyID: Identifier for the party in the business document. It is type GDT: PartyID (without additional components, such as schemeAgencyID); ItemCoveredObjectProductID is the identifier specified for the covered product. It is type GDT: ProductID; ItemInstalledBaseID is the identifier specified for the installation. It is type GDT: InstalledBaseID; CustomerContractStatusCode: Lifecycle status of the contract. It is type GDT: CustomerContractStatusCode, and CreationDateTime is the creation time of a CustomerTransactionDocumentTemplate. It is type GDT: DateTime.

Overview (Query Response Transformation Node)

An Overview is an general view on the CustomerTransactionDocumentTemplate. Overview provides the essential information of the CustomerTransactionDocumentTemplate at a first glance. The elements located directly at the node Overview are defined by the data type: CustomerTransactionDocumentOverviewElements. These elements are: CustomerTransactionDocumentID: The unique identifier assigned by the seller for a CustomerTransactionDocumentTemplate. It corresponds with the element ID on the Root node.

It is type GDT: BusinessTransactionDocumentID; CustomerTransactionDocumentUUID is the universally unique CustomerTransactionDocumentTemplate identifier assigned internally. It corresponds with the element UUID on the Root node. It is type GDT: UUID; CustomerTransactionDocumentName: Name of the CustomerTransactionDocumentTemplate. It corresponds with the element Name on the Root node. It is type GDT: Medium_Name;

DateTime

The date time of a CustomerTransactionDocumentTemplate, from a business perspective. It corresponds with the element DateTime on the Root node. It is type GDT: GLOBAL_DateTime CreationDateTime Creation date time of the CustomerTransactionDocumentTemplate. It corresponds with the same element SystemAdministrativeDate on the Root node. It is type GDT: GLOBAL_DateTime BuyerID is the identifier of the CustomerTransactionDocumentTemplate issued by the Buyer Party. It corresponds with the same element on the Root node. It is type GDT: BusinessTransactionDocumentID. Statuses of the CustomerTransactionDocumentTemplate. It corresponds with the same elements on the Root node.

IDT: CustomerTransactionDocumentStatus

AggregatedCustomerOrderLifeCycleStatusCode: Aggregates the life cycle status of the items. GDT: CustomerOrderLifecycleStatusCode Qualifier Aggregated AggregatedFulfilmentBlockingStatusCode: The status represents a block of the delivery of goods or the provision of services.

GDT: BlockingStatusCode (Qualifier: AggregatedFulfilment)

AggregatedCustomerReturnLifeCycleStatusCode Aggregates the life cycle status of the items. GDT: CustomerReturnLifecycleStatusCode Qualifier Aggregated AggregatedCustomerQuoteLifeCycleStatusCode: The status represents the CustomerQuoteLifeCycleStatus of the items in an aggregated form. GDT CustomerQuoteLifeCycleStatusCode Qualifier Aggregated AggregatedFulfilmentProcessingStatusCode: Aggregates the fulfillment status of the items. GDT: ProcessingStatusCode, Qualifier AggregatedFulfilment.

ServiceRequestLifeCycleStatusCode: The status represents the essential progress of the CustomerTransactionDocumentTemplate.

GDT: ServiceRequestLifecycleStatusCode

InvoicingBlockingStatusCode: The status represents a block of the invoicing process.

GDT: BlockingStatusCode (Qualifier: Invoicing)

AggregatedInvoicingProcessingStatusCode: The status represents an aggregated representation of all InvoicingStatus of the items. GDT: ProcessingStatusCode (Qualifier AggregatedInvoicing)

DeliveryPriorityCode is a coded representation of priority/urgency of delivery. It corresponds with the same elements on the DeliveryTerms node.

It is type GDT: PriorityCode.

ProbabilityPercent is the probability of a sales order or contract arising from the quote. It corresponds with the same element on the SalesTerms node.

It is type GDT: Percent. and Qualifier: Probability.

DataOriginTypeCode is Type of the source of a CustomerTransactionDocumentTemplate. It corresponds with the same element on the Root node.

It is type GDT: CustomerTransactionDocumentDataOriginTypeCode.

BuyerPartyID is Identifier for the BuyerParty. BuyerParty is the specialization association on the Root node.

It is type GDT: PartyID

BuyerPartyUUID is Unique identifier for the BuyerParty. BuyerParty is the specialization association on the Root node.

It is type GDT: UUID

BuyerPartyTypeCode is Type of the Buyer party referenced by element PartyUUID. BuyerParty is the specialization association on the Root node.

It is type GDT: BusinessObjectTypeCode.

BuyerPartyFormattedName is Formatted Name of the BuyerParty. BuyerParty is the specialization association on the Root node.

It is type GDT: LANGUAGEINDEPENDENT_LONG_Name

BuyerPartyFormattedPostalAddressDescription is Formatted postal address description of the BuyerParty. BuyerParty is the specialization association on the Root node.

It is type GDT: LANGUAGEINDEPENDENT_MEDIUM_Description

Processor PartyID is Identifier for the Processor Party. Processor Party is the specialization association on the Root node.

It is type GDT: PartyID

Processor PartyUUID is Unique identifier for the Processor Party. Processor Party is the specialization association on the Root node.

It is type GDT: UUID

Processor PartyTypeCode is Type of the Processor Party referenced by element PartyUUID (required for OBN). Processor Party is the specialization association on the Root node.

It is type GDT: BusinessObjectTypeCode.

Processor PartyFormattedName is Formatted Name of the Processor Party. Processor Party is the specialization association on the Root node.

It is type GDT: LANGUAGEINDEPENDENT_LONG_Name

Processor PartyFormattedPostalAddressDescription is Formatted postal address of the Processor Party. Processor Party is the specialization association on the Root node.

It is type GDT: LANGUAGEINDEPENDENT_MEDIUM_Description ServicePerformerPartyID is Identifier for the ServicePerformerParty. ServicePerformerParty is the specialization association on the Root node.

It is type GDT: PartyID

ServicePerformerPartyUUID is Unique identifier for the ServicePerformerParty. ServicePerformerParty is the specialization association on the Root node.

It is type GDT: UUID

ServicePerformerPartyTypeCode is Type of the ServicePerformerParty referenced by element PartyUUID (required for OBN). ServicePerformerParty is the specialization association on the Root node.

It is type GDT: BusinessObjectTypeCode.

ServicePerformerPartyFormattedName is Formatted Name of the ServicePerformerParty. ServicePerformerParty is the specialization association on the Root node.

It is type GDT: LANGUAGEINDEPENDENT_LONG_Name

ServicePerformerPartyFormattedPostalAddressDescription is Formatted postal address of the ServicePerformerParty. ServicePerformerParty is the specialization association on the Root node.

It is type GDT: LANGUAGEINDEPENDENT_MEDIUM_Description

ServiceSupportTeamPartyID is Identifier for the ServiceSupportTeamParty. ServiceSupportTeamParty is the specialization association on the Root node.

It is type GDT: PartyID

ServiceSupportTeamPartyUUID is Unique identifier for the ServiceSupportTeamParty. ServiceSupportTeamParty is the specialization association on the Root node.

It is type GDT: UUID

ServiceSupportTeamPartyTypeCode is Type of the ServiceSupportTeamParty referenced by element PartyUUID (required for OBN). ServiceSupportTeamParty is the specialization association on the Root node.

It is type GDT: BusinessObjectTypeCode.

ServiceSupportTeamPartyFormattedName is Formatted Name of the ServiceSupportTeamParty. ServiceSupportTeamParty is the specialization association on the Root node.

It is type GDT: LANGUAGEINDEPENDENT_LONG_Name

ServiceSupportTeamPartyFormattedPostalAddressDescription is Formatted postal address of the ServiceSupportTeamParty. ServiceSupportTeamParty is the specialization association on the Root node.

It is type GDT: LANGUAGEINDEPENDENT_MEDIUM_Description

EmployeeResponsiblePartyID is Identifier for the ResponsibleEmployeeParty. EmployeeResponsibleParty is the specialization association on the Root node.

It is type GDT: PartyID

EmployeeResponsiblePartyUUID is Unique identifier for the EmployeeResponsibleParty. EmployeeResponsibleParty is the specialization association on the Root node.

It is type GDT: UUID

EmployeeResponsiblePartyTypeCode is Type of the EmployeeResponsibleParty referenced by element PartyUUID (required for OBN). EmployeeResponsibleParty is the specialization association on the Root node.

It is type GDT: BusinessObjectTypeCode.

EmployeeResponsiblePartyFormattedName is Formatted Name of the MainResponsibleEmployeeParty. EmployeeResponsibleParty is the specialization association on the Root node.

It is type GDT: LANGUAGEINDEPENDENT LONG_Name

EmployeeResponsiblePartyFormattedPostalAddressDescription is Formatted postal address of the ResponsibleEmployeeParty. EmployeeResponsibleParty is the specialization association on the Root node.

It is type GDT: LANGUAGEINDEPENDENT_MEDIUM_Description

BuyerPartyMainPartyContactPartyCurrentNameFormattedName is Formatted Current Name of the BuyerPartyMainPartyContactParty. It originates from the main PartyContactParty 36106 for the BuyerParty. BuyerParty is the specialization association of the Root node.

It is type GDT: LANGUAGEINDEPENDENT_LONG_Name

BaseServiceOrderID

Identifier for the BaseServiceOrderReference. The BaseServiceOrderReference is a specialization association on the Root node.

It is type GDT: BusinessTransactionDocumentID

MainIncidentServiceIssueCategoryName

Main incident service issue category name. It originates from the specialization association MainIncidentServiceIssueCategory on the Root node.

It is type GDT: Medium_Name.

TotalGrossAmount is The total gross amount in the CustomerTransactionDocumentTemplate. It corresponds with the element GrossAmount on the TotalValues node.

It is type GDT: Amount and Qualifier: Gross.

TotalNetAmount is The total net amount in the CustomerTransactionDocumentTemplate. It corresponds with the element NetAmount on the TotalValues node.

It is type GDT: Amount and Qualifier: Net.

TotalTaxAmount is The total tax amount in the CustomerTransactionDocumentTemplate. It corresponds with the element TaxAmount on the TotalValues node.

It is type GDT: Amount and Qualifier: Tax.

TotalFreightChargeAmount is The total freight charges in the CustomerTransactionDocumentTemplate. It corresponds with the element FreightChargeAmount on the TotalValues node.

It is type GDT: Amount, and Qualifier: FreightCharge.

TotalNetWithoutFreightChargeAmount is The total net amount excluding freight charges. It corresponds with the element NetWithoutFreightChargeAmount on the TotalValues node.

It is type GDT: Amount, and Qualifier: NetWithoutFreightCharge.

RequestedFulfilmentPeriod is The period in which the delivery of goods or the provision of services is requested. It corresponds with the same specialization association on the Root node.

It is type GDT: TimePointPeriod.

InvoicingBlockingReasonCode is Specifies why processing of invoicing documents is blocked for CustomerTransactionDocumentTemplate. It corresponds with the same element on the InvoiceTerms node.

It is type GDT: InvoicingBlockingReasonCode.

ServicePriorityCode is Priority with which a service request or service order is to be processed.

It is type GDT: PriorityCode

InstallationPointFormattedPostalAddressDescription is Formatted postal address of the Installation Point location. It originates from the specialization association MainServiceReferenceObject on the Root node.

It is type GDT: LANGUAGEINDEPENDENT_MEDIUM_Description

CompletionDueTimePoint is The pointintime by which a CustomerTransactionDocumentTemplate can be fully processed. It corresponds with the same specialization association on the Root node.

It is type GDT: TimePoint.

Queries

QueryByElements

The query parameters are defined by data type CustomerTransactionDocumentOverviewElementsQueryElements which contains the same elements as data type CustomerTransactionDocumentElementsQueryElements.

BusinessProcessVariantType

Definition

A BusinessProcessVariantType defines the character of a business process variant of the CustomerTransactionDocumentTemplate. It represents a typical way of processing of a CustomerTransactionDocumentTemplate within a process component from a business point of view. The elements located directly at the node BusinessProcessVariantType are defined by the data type: CustomerTransactionDocumentBusinessProcessVariantTypeElements, derived from BusinessProcessVariantTypeElements (Template). These elements are:

BusinessProcessVariantTypeCode

A BusinessProcessVariantTypeCode is a coded representation of a business process variant type of a CustomerTransactionDocumentTemplate.

It is type GDT: BusinessProcessVariantTypeCode

MainIndicator

Indicator that specifies whether the current BusinessProcessVariantTypeCode is the main one or not.

It is type GDT: Indicator, and Qualifier: Main Integrity Condition: Exactly one of the instances of the BusinessProcessVariantType is allowed to be indicated as main.

SalesAndServiceBusinessArea

A SalesAndServiceBusinessArea is the business or service specific area within an enterprise that is valid for a CustomerTransactionDocumentTemplate, such as, for example, sales organization, service organization, distribution channel, division. These elements are derived from the organizational unit Sales Unit or Service Unit (see Party) responsible for the CustomerTransactionDocumentTemplate, and can be overwritten manually. The elements directly attached to the SalesAndServiceBusinessArea node are defined by the type GDT: CustomerTransactionDocumentSalesAndServiceBusinessAreaElements, which is derived from. It is type GDT: BusinessTransactionDocument-SalesAndServiceBusinessAreaElements.

SalesOrganisationID is an identifier for the sales organization that is responsible for the CustomerTransactionDocumentTemplate. It is type GDT: OrganisationalCentreID SalesGroupID is Identifier for the sales group that is responsible for the CustomerTransactionDocument-Template. It is type GDT: OrganisationalCentreID SalesOfficeID is an identifier for the sales office that is responsible for the CustomerTransactionDocument-Template. It is type GDT: OrganisationalCentreID DistributionChannelCode is Coded representation of the distribution channel by which goods and services reach customers. It is type GDT: DistributionChannelCode ServiceOrganisationID is Identifier for the service organization. It is type GDT: OrganisationalCentreID SalesOrganisationUUID Universally unique identifier for the sales organization. It is type GDT: UUID SalesGroupUUID Universally unique identifier for the sales group. It is type GDT: UUID SalesOfficeUUID Universally unique identifier for the sales office.

It is type GDT: UUID.

ServiceOrganisationUUID Universally unique identifier for the service organization. It is type GDT: UUID Inbound Aggregation Relationships From business object FunctionalUnit/node Root SalesOffice may have a cardinality of c:cn FunctionalUnit with the specializations SalesOffice From business object FunctionalUnit/node Root SalesGroup may have a cardinality of c:cn FunctionalUnit with the specializations SalesGroup From business object FunctionalUnit/node Root SalesOrganisation may have a cardinality of c:cn FunctionalUnit with the specializations SalesOrganisation From business object FunctionalUnit/node Root ServiceOrganisation may have a cardinality of c:cn FunctionalUnit with the specializations ServiceOrganisation Party A Party is a natural or legal person, organization, organizational unit or group that is involved in a CustomerTransactionDocumentTemplate in a PartyRole. A Party can be a reference to a business partner or one of its specializations (such as Customer, Supplier, Employee); a reference to one of the following specializations of an organizational unit: Company, FunctionalUnit, or ReportingLineUnit. Party occurs in the following incomplete and disjoint specializations:

BuyerParty: A BuyerParty is a party (Customer) that purchases a product or service. It occurs in the role of the buyer or ordering party with whom the contractual agreement is concluded.

SellerParty: A SellerParty is a party that sells goods or services. It represents the selling company that has a contractual agreement with the BuyerParty.

ProductRecipientParty: A ProductRecipientParty is a party (Customer, Supplier, Company) to whom goods are delivered or services are provided. It fulfills the role of the customer who receives the goods or, in case of returns, the vendor or supplying company.

Vendor Party: A Vendor Party is a party (Company, Customer or Supplier) who delivers goods or provides services. It performs the role of the delivering enterprise or of the external vendor or, in the case of returns, the customer.

BillToParty: A BillToParty is a party (Customer) to whom the invoice for goods or services is sent.

PayerParty: A PayerParty is a party (Customer) that pays for a product or a service.

SalesUnitParty: A SalesUnitParty is a party (Sales Unit), that is responsible for the sales of goods and services.

ServiceSupportTeamParty: A ServiceSupportTeamParty is a party (Service Unit) that is responsible for the processing of service requests and customer complaints as well as the planning and preparation of services.

ResponsibleEmployeeParty: A ResponsibleEmployeeParty is a party (Employee), that is responsible for the processing of sales or services.

ServiceExecutionTeamParty: A ServiceExecutionTeamParty is a party (Service Unit) that is responsible for executing the service orders.

ServicePerformerParty: A ServicePerformerParty is a party (Employee) that provides services for a company.

Processor Party: A Processor Party is a party (Employee) that processes the CustomerTransactionDocumentTemplate document.

A ContractReleaseAuthorisedParty: A ContractRelease-AuthorisedParty is a party that is authorized to release goods or services from a contract.

FreightForwarderParty: A Freight ForwarderParty is a party (Business Partner) that supplements their own service by subcontracting transportation and other associated services. The elements directly attached to the Party node are defined by the type GDT: CustomerTransactionDocumentPartyElements, which is derived from It is type GDT: BusinessTransactionDocumentPartyElements.

PartyID

Identifier for the party in this PartyRole within the business document.

If a business partner or organizational unit are referenced, the attribute contains their identifiers. If an unidentified identifier is entered, for example by the user, the attribute contains this identifier.

It is type GDT: PartyID (without additional components, such as schemeAgencyID).

PartyUUID

The unique identifier for the business partner, organizational unit or their specializations.

It is type GDT: UUID.

PartyTypeCode the business object type codes of the business objects described in the inbound aggregation relationships may be used.

It is type GDT: BusinessObjectTypeCode.

RoleCategoryCode

The Party Role Category of the party in the business document.

It is type GDT: PartyRoleCategoryCode.

RoleCode

The Party Role of the party in the business document.

It is type GDT: PartyRoleCode.

AddressReference (It is Type Gdt: PartyAddressReference)

The information to reference the address of a Party.

AddressHostUUID

Unique identifier for the address of the business partner, the organizational unit, or their specializations.

AddressHostTypeCode.

Coded representation of the Addresshosttype.

DeterminationMethodCode

Coded representation of the PartyDeterminationMethod

It is type GDT: PartyDeterminationMethod

MainIndicator

The MainIndicator specifies whether a <BONode>party is emphasized with the same PartyRole in a number of parties or not.

It is type GDT: PartyMainIndicator.

Composition Relationships include PartyContactParty may have a cardinality of 1:cn and PartyAddress 36104 may have a cardinality of 1:c.

Inbound Aggregation Relationships include from BusinessObject Party/Node Root

Party may have a cardinality of c:cn.

Associations for Navigation

From the Business Object UsedAddress/Node Root

UsedAddress may have a cardinality of c:cn

For the address used for the Party. This can be:

1) A referenced address of the master data object, or

2) The PartyAddress used via the composition relationship.

It is possible to determine which of the two applies by means of the PartyAddressHostTypeCode element The instance of the TO UsedAddress represents this address. The association is implemented.

In case 1) The node ID of the node in the master data object is determined via the PartyTypeCode, AddressHostUUID and AddressHostTypeCode elements that has the composition relationship to the DO address that is to be represented by the TO UsedAddress. Additionally, the TO UsedAddress in the implemented association is provided with the following information:

That this is an example of a master data address

BusinessObjectTypeCode, BusinessObjectNodeTypeCode and Node ID of its own

<BONode>Party node. These are required in case changes to the TO UsedAddress take place. In this case, the master data address is copied by the TO UsedAddress, the changes take place to the copy, and a corresponding DO Address is created at the <BONode>Party via the PartyAddress composition relationship.

In case 2) The TO UsedAddress is informed of the BusinessObjectTypeCode, BusinessObjectNodeTypeCode and Node ID of its own <BONode>Party. Additionally, information is provided that this is not an example of a referenced address. In this case, the TO UsedAddress represents the DO address used at the <BONode>Party via the PartyAddress composition relationship.

The following inbound associations are not modelled in ESR:

From the Partner business object and its specializations:

AddressInformation node

EmployeeWorkplaceAddressInformation node

RelationshipContactPerson-WorkplaceAddressInformation node

RelationshipServicePerformer-WorkplaceAddressInformation node

Root (Reference to DO CommunicationData) Node

From the Organisational Centre business object and its specializations:

AddressInformation node

Specialization Associations for Navigation:

On the PartyContact node:

MainPartyContact may have a cardinality of c:c association to a PartyContact that occurs in the MainPartyContact specialization.

Integrity

The BuyerParty cannot be changed after the document has been created.

The PayerParty cannot be changed once it has been created.

There may be one aggregation relationship to the business partner, the organizational unit, or their specializations.

If the PartyUUID exists, the PartyTypeCode can also exist. Parties may be referenced via the Transformed Object Party, that represent at least one of the following business objects: Company, SalesUnit, ServiceUnit, ReportingLineUnit, Supplier, Customer, Employee, BusinessPartner.

Queries

PartyAddress (DO)

The dependent object Address contains a document specific address for the party. The data is mapped using the dependent object Address.

PartyContactParty

A PartyContactParty is a natural person or an organizational unit that can be contacted for the respective party. The contact can be a contact person or a secretariat, for example. Normally, communication data is available for the contact.

PartyID

If a business partner or organizational unit are referenced, the attribute contains their identifiers.

It is type GDT: PartyID (without additional components, such as schemeAgencyID).

PartyUUID

The unique identifier for the business partner, organizational unit or their specializations.

It is type GDT: UUID.

PartyTypeCode

Type of the business partner, organizational unit or their specializations referenced by element PartyUUID The business object type codes of the business objects described in the inbound aggregation relationships may be used.

It is type GDT: BusinessObjectTypeCode.

AddressReference (It is Type Gdt: Partyaddressreference)

The information to reference the address of a Party.

AddressHostUUID

Unique identifier for the address of the business partner, the organizational unit, or their specializations.

AddressHostTypeCode.

Coded representation of the Addresshosttype.

DeterminationMethodCode

Coded representation of the PartyDeterminationMethod. It is type GDT:

PartyDeterminationMethod

MainIndicator

The MainIndicator specifies whether a PartyContactParty is emphasized in a number of contacts with the same PartyRole or not.

It is type GDT: PartyMainIndicator.

Composition Relationships:

PartyContactPartyAddress 36108 may have a cardinality of 1:c (Composition relationship to the Dependent Object Address.)

Inbound Aggregation Relationships:

From BusinessObject Party/Node Root

Party may have a cardinality of c:cn

Referenced Party in Master Data

Associations for Navigation

From the Business Object UsedAddress/Node Root

UsedAddress may have a cardinality of c:cn

For the address used for the Party. This can be:

1) A referenced address of the master data object, or

2) The PartyAddress used via the composition relationship.

It is possible to determine which of the two applies by means of the PartyAddressHostTypeCode element The instance of the TO UsedAddress represents this address. The association is implemented.

In case 1) The node ID of the node in the master data object is determined via the PartyTypeCode, PartyAddressUUID and PartyAddressHostTypeCode elements that has the composition relationship to the DO address that is to be represented by the TO UsedAddress. Additionally, the TO UsedAddress in the implemented association is provided with the following information:

That this is an example of a master data address

BusinessObjectTypeCode, BusinessObjectNodeTypeCode and Node ID of its own <BONode>Party node. These are required in case changes to the TO UsedAddress take place. In this case, the master data address is copied by the TO UsedAddress, the changes take place to the copy, and a corresponding DO Address is created at the <BONode>Party via the PartyAddress composition relationship.

In case 2) The TO UsedAddress is informed of the BusinessObjectTypeCode, BusinessObjectNodeTypeCode and Node ID of its own <BONode>Party. Additionally, information is provided that this is not an example of a referenced address. In this case, the TO UsedAddress represents the DO address used at the <BONode>Party via the PartyAddress composition relationship.

The following inbound associations are not modelled in ESR:

From the Business Partner business object and its specializations:

AddressInformation node

EmployeeWorkplaceAddressInformation node

RelationshipContactPerson-WorkplaceAddressInformation node RelationshipServicePerformerWorkplaceAddressInformation node Root (Reference to DO CommunicationData) Node From the Organisational Centre business object and its specializations:

AddressInformation node

PartyContacPartyAddress (DO)

The dependent object Address contains a document specific address for the party contact party.

The data is mapped using the dependent object Address and defined in the dependent object address.

Location

Location is a place to which and from which goods are delivered or services are provided/procured. A Location can occur in the following disjoint specializations (not complete):

ShipToLocation: A ShipToLocation is the place to which goods are delivered or at which a service is provided.

ShipFromLocation: A ShipFromLocation is a place from which goods are delivered.

ServicePoint Location: A ServicePoint is the location at which the service is performed.

The elements directly attached to the Location node are defined by the type GDT: CustomerTransactionDocumentLocationElements, which is derived from It is type GDT: BusinessTransactionDocumentLocationElements.

LocationID is Identifier of the BO Location. It is type GDT: LocationID.

LocationUUID is Universally unique identifier of the BO Location. It is type GDT: UUID.

AddressReference

The information to reference the address of a Business Object. It is type GDT: LocationAddressReference.

PartyID

RoleCode is Coded representation of the role of the Node Location in the CustomerTransactionDocumentTemplate document. It is type GDT: LocationRoleCode.

RoleCategoryCode is Coded representation of the Role Category of the Node Location in the CustomerTransactionDocumentTemplate document. It is type GDT: LocationRoleCategoryCode.

DeterminationMethodCode

Coded representation of the LocationDeterminationMethod. It is type GDT:

LocationDeterminationMethod

Inbound Aggregation Relationships:

From business object Location/node root: location may have a cardinality of c:cn location to which or at which goods are delivered or a service is provided, in the roles ShipFromLocation, ShipToLocation (Returns) and ServicePoint From business object InstallationPoint/node AddressInformation InstallationPointAddress may have a cardinality of c:cn installation point address to which or at which goods are delivered or a service is provided, in the roles ShipFromLocation, ShipToLocation (Returns) and ServicePoint From business object Party/node AddressInformation PartyAddressInformation may have a cardinality of c:cn AddressInformation of a representative of a Business Partner or Organizational Centre corresponding to the <BONode>Location Associations for Navigation From the Business Object UsedAddress/Node Root UsedAddress may have a cardinality of c:cn For the address used for the Location. This can be:

1) A referenced address of the master data object, or

In case 1) The node ID of the node in the master data object is determined via the PartyTypeCode, AddressHostUUID and AddressHostTypeCode elements that has the composition relationship to the DO address that is to be represented by the TO UsedAddress. Additionally, the TO UsedAddress in the implemented association is provided with the following information:

That this is an example of a master data address BusinessObjectTypeCode, BusinessObjectNodeTypeCode and Node ID of its own CustomerTransactionDocumentTemplateLocation node.

Integrity

The following integrity conditions are checked:

There can be either just one aggregation or composition relationship to the dependent object.

If there is an aggregation relationship to the BO Location, the LocationID attribute is filled with the ID of BO Location. All other ID fields (PartyID, InstalledBaseID and InstallationPointID) remain blank.

If the address of a party is referenced (representative of a BusinessPartners or an OrganisationalCentre), the PartyID attribute is filled with the ID of the Party. All other ID fields (LocationID, InstalledBaseID and InstallationPointID) remain blank. The reference is kept in the AddressUUID attribute.

If there is an aggregation relationship to the address of an InstalledBase, the InstalledBaseID attribute is filled with the ID of the InstalledBase. All other ID fields (LocationID, PartyID and InstallationPointID) remain blank. The reference is kept in the AddressUUID InstalledBaseAddressInformationUUID attribute.

If there is an aggregation relationship to the address of an InstallationPoint, the InstallationPointID attribute is filled with the ID of the InstallationPoint. All other ID fields (LocationID, PartyID and InstalledBaseID) remain blank. The reference is kept in the AddressUUID attribute.

If an address is referenced via the element AddressUUID, then elements AddressBusinessObjectTypeCode and AddressHostTypeCode can also be filled.

SalesTerms

SalesTerms are the agreements and conditions applicable for the sale of goods and services in the CustomerTransactionDocumentTemplate document. The elements directly attached to the SalesTerms node are defined by the type GDT: CustomerTransactionDocumentSalesTermsElements, which is derived from GDT: BusinessTransactionDocument-SalesTermsElements. These elements are:

RegionCode: Geographic or political area (state, federal state, province, county), assigned to the buyer (ordering party). RegionCodes are used in evaluations. It is type GDT: RegionCode.

IndustrialSectorCode is an industrial sector assigned to the buyer (ordering party). An industrial sector is a division of enterprises according to the focus of their business activities.

It is type GDT: IndustrialSectorCode.

IndustryClassificationSystemCode is Industry system assigned to the buyer (ordering party). An industry system (or industry classification system) is a systematically structured (hierarchical, as the case may be) directory of industrial sectors.

It is type GDT: IndustryClassificationSystemCode.

ReasonCode is Code that specifies the reason for the materialization of the CustomerTransactionDocumentTemplate.

It is type GDT: CustomerTransactionDocumentReasonCode.

ProductUsageCode defines what the buyer (ordering party) uses the product for in the current process. It is type GDT: ProductUsageCode.

CancellationReasonCode is Reason for canceling a sales transaction. Can be set by both the buyer and seller. It is type GDT: CancellationReasonCode.

ProbabilityPercent is the probability of a sales order or contract arising from the quote.

It is type GDT: Percent. and Qualifier: Probability.

ServiceTerms

ServiceTerms are the conditions and agreements that apply for the execution of a service activity in a CustomerTransactionDocumentTemplate document and which control the processing.

The elements that are located directly in the ServiceTerms node are defined by the type GDT: CustomerTransactionDocumentServiceTermsElements These elements are:

ServicePriorityCode is Priority with which a service request or service order is to be processed.

It is type GDT: PriorityCode.

ServiceIssueCategoryCatalogueCategoryKey Key structure to identify the category that schedules the service business transaction.

IDT: ServiceIssueCategoryCatalogueCategoryKey

ServiceIssueCategoryID is Identifier for the category that schedules the service business transaction.

It is type GDT: ServiceIssueCategoryID.

ServiceIssueCategoryCatalogueVersionUUID is Identifier for the version of the category catalog in which the category is contained.

It is type GDT: UUID.

ServiceIssueCategoryCatalogueID is Identifier for the category catalog in which the category is contained.

It is type GDT: ServiceIssueCategoryCatalogueID.

ServiceIssueCategoryUUID is Universally unique identifier for the category that schedules the service business transaction.

ServiceIssueCategoryUUID is used as a foreign key for the relationship to ServiceIssueCategory.

It is type GDT: UUID,

WarrantyID is Identifier for the warranty that covers this CustomerTransactionDocumentTemplate document.

It is type GDT: ProductID.

WarrantyUUID is Universally unique identifier for the warranty.

WarrantyUUID is used as an alternate key for the relationship to the warranty.

It is type GDT: UUID.

WarrantyValidityPeriod is Period specifying the warranty validity.

It is type GDT: CLOSED_DatePeriod. and Qualifier: Validity.

ProcessingCyclesNumberValue is Number of questionanswer cycles between customer and processor.

It is type GDT: NumberValue and Qualifier: Processing-Cycles ProviderCyclesNumberValue is Number of questionanswer cycles between processor and external service provider.

It is type GDT: NumberValue and Qualifier: Provider-Cycles Inbound Aggregation Relationships:

From business object Warranty/node Root.

Warranty may have a cardinality of c:cn Warranty, which covers the CustomerTransactionDocumentTemplate document From business object ServiceIssueCategoryCatalogue/node ServiceIssueCategory.

ServiceIssueCategory may have a cardinality of c:cn ServiceIssueCategory, which schedules the service business transaction.

ServiceReferenceObject

The ServiceReferenceObject is an object that a service refers to in a CustomerTransactionDocumentTemplate document.

A ServiceReferenceObject can be either a material, an individual material or a service product. For example, a service can refer to a specific photocopier and some of its component parts.

The elements located directly at the ServiceReferenceObject node are defined by the type GDT: CustomerTransactionDocumentServiceReferenceObjectElements. These elements are: MainIndicator that specifies whether this is the main service reference object or not.

It is type GDT MainIndicator. MaterialID is the identifier specified for the material to which the service refers. It is type GDT: ProductID.

IndividualMaterialID is the identifier specified for the IndividualMaterial to which the service refers. It is type GDT: ProductID.

MaterialUUID is universally unique identifier for a material. It is type GDT: UUID.

IndividualMaterialUUID is Universally unique identifier for an IndividualMaterial. It is type GDT: UUID.

InstallationPointUUID is Universally unique identifier of the installation point of the individual material. It is type GDT: UUID.

Inbound aggregation relationships:

From business object Material/node Root

Material may have a cardinality of c:cn Material to which the service refers.

From business object IndividualMaterial/node Root IndividualMaterial may have a cardinality of c:cn Individual Material to which the service refers.

InstallationPoint may have a cardinality of c:cn InstallationPoint at which the individual material is installed.

There can ever be one main service reference object at any one time.

The service reference object entered initially is flagged automatically as the main service reference object.

At least the MaterialID or the IndividualMaterialID can be specified.

The InstallationPointUUID is determined internally and cannot be set externally.

IncidentServiceIssueCategory

IncidentServiceIssueCategory is the categorization of an individual incident or aspect in a CustomerTransactionDocumentTemplate document.

The elements that are located directly in the IncidentServiceIssueCategory node are defined by the type. It is type GDT: CustomerTransactionDocumentIncidentServiceIssueCategoryElements.

These elements are:

ServiceIssueCategoryCatalogueCategoryKey Key structure to identify the category that is used to categorize an individual incident within a service process.

IDT: ServiceIssueCategoryCatalogueCategoryKey ServiceIssueCategoryID is Identifier for the service issue category that is used to categorize an individual incident within a service process.

It is type GDT: ServiceIssueCategoryID.

ServiceIssueCategoryCatalogueVersionUUID is Identifier for the version of the category catalog in which the category is contained. It is type GDT: UUID.

ServiceIssueCategoryCatalogueID is Identifier for the category catalogue containing the service issue category. It is type GDT: ServiceIssueCategoryCatalogueID.

MainIndicator is Specifies whether this is the main issue or not. It is type GDT: MainIndicator.

ServiceIssueCategoryUUID is Globally unique identifier for a business subject category that is used to categorize an individual incident in a service process. It is type GDT: UUID.

Inbound aggregation relationships:

From business object ServiceIssueCategoryCatalogue/node ServiceIssueCategory

ServiceIssueCategory may have a cardinality of c:cn ServiceIssueCategory that categories the individual incident.

One issue category can be flagged as the main issue category at any one time.

CoveredObject

CoveredObject is an object that is covered by the CustomerTransactionDocumentTemplate document. A CoveredObject can be either a material, an individual material, or a service product. The elements located directly at the CoveredObject node are defined by the type GDT: CustomerTransactionDocumentCoveredObjectElements. These elements are:

ProductID is the identifier specified for the product that is covered in the CustomerTransactionDocumentTemplate document.

It is type GDT: ProductID. ProductUUID is the universally unique identifier for the product.

ProductUUID is used as an alternate key for the relationship to Material and ServiceProduct.

It is type GDT: UUID.

ProductTypeCode is Coded representation of the product type that describes the nature and basic properties of products, such as materials or service products.

It is type GDT: ProductTypeCode.

Restriction: ProductTypeCode 1 (Material) and 2 (ServiceProduct) are allowed.

InstalledBaseID is The identifier specified for the installation that is covered in the CustomerTransactionDocumentTemplate document.

It is type GDT: InstalledBaseID. (GDT will be applied for as part of the BO InstalledBase)

InstalledBaseUUID is Universally unique identifier for the installation.

InstalledBaseUUID is used as an alternate key for the relationship to the InstalledBase.

It is type GDT: UUID.

Inbound Aggregation Relationships:

From business object Material/node Root

Material may have a cardinality of c:cn association to material

From business object ServiceProduct/node Root

ServiceProduct may have a cardinality of c:cn association to ServiceProduct

From business object IndividualMaterial/node Root

IndividualMaterial may have a cardinality of c:cn association to Individual Material From business object InstalledBase/node Root InstalledBase may have a cardinality of c:cn association from InstalledBase Either a product or an installation can be specified. However, not both at the same time.

TimePointTerms

TimePointTerms is the pointintime related agreement for goods and services that can occur in a CustomerTransactionDocumentTemplate document.

TimePointTerms can occur in the following disjoint specializations (incomplete) with reference to the role of the pointintime (TimePointRoleCode):

FirstReactionDueTimePoint: The FirstReactionDueTimePoint is a pointintime by which a response to a newlyreceived service request or service order is required.

CompletionDueTimePoint: The CompletionDueTimePoint is the pointintime by which a service request or service order can be fully processed.

RequestInitialReceiptTimePoint: RequestInitialReceiptTimePoint is the pointintime when a request is first received.

RequestReceiptTimePoint: RequestReceiptTimePoint is the pointintime when a request is received or updated.

RequestInProcessAtTimePoint: RequestInProcessAtTimePoint is the pointintime when a request is put in process.

RequestFinishedAtTimePoint: RequestFinishedAtTimePoint is The pointintime when The processing of a request is finished.

RequestClosedAtTimePoint: RequestClosedAtTimePoint is the pointintime when a request considered as being finally closed.

RequestSentToProviderAtTimePoint: RequestSentToProviderAtTimePoint is the pointintime when a request is forwarded to a provider.

RequestCompletionByProviderDueTimePoint: RequestCompletionByProviderDueTimePoint is the pointintime by which a provider can complete the processing of a request.

RequestReceivedFromProviderAtTimePoint: RequestReceivedFromProviderAtTimePoint is the pointintime by which a provider has completed the processing of a request.

pointintime of status change "In process" (coming from partner)

CompletionTimePoint: The CompletionTimePoint is the pointintime by which a CustomerTransactionDocumentTemplate document is completed.

The elements directly located at the TimePointTerms node are defined by the type GDT: CustomerTransactionDocumentTimePointTermsElements, which is derived from the GDT: TimePointElements.

These elements are: TimePointRoleCode is a role of the pointintime specified.

It is type GDT: TimePointRoleCode. TimePoint is Specification of the pointintime. The business role of the pointintime is specified by the TimePointRoleCode.

It is type GDT: TimePoint.

DateCalculationFunctionReference is Reference to the function with which the pointintime is calculated. It is type GDT: DateCalculationFunctionReference.

PeriodTerms

PeriodTerms is the period related agreement for goods and services that can occur in a CustomerTransactionDocumentTemplate document.

PeriodTerms can occur in the following disjoint specializations (incomplete) with reference to the role of the period (PeriodRoleCode):

RequestedFulfilmentPeriod: RequestedFulfilmentPeriod is the period in which the delivery of goods or the provision of services is requested.

ValidityPeriod: ValidityPeriod is the period during which the CustomerTransactionDocumentTemplate document is valid.

The elements directly attached to the PeriodTerms node are defined by the type GDT: CustomerTransactionDocumentPeriodTermsElements, which is derived from It is type GDT: PeriodElements.

These elements are:

PeriodRoleCode is Role of the specified period.

It is type GDT: PeriodRoleCode.

TimePointPeriod is Specification of the period. The business role of the period is specified by the PeriodRoleCode.

It is type GDT: TimePointPeriod.

StartTimePointDateCalculationFunctionReference is Reference to the function with which the start pointintime of the period is calculated.

It is type GDT: DateCalculationFunctionReference.

EndTimePointDateCalculationFunctionReference is Reference to the function with which the end pointintime of the period is calculated.

It is type GDT: DateCalculationFunctionReference.

DurationTerms

DurationTerms is the duration related agreement for goods and services that can occur in a CustomerTransactionDocumentTemplate document. DurationTerms can occur in the following disjoint specializations (incomplete) with reference to the role of the duration (DurationRoleCode):

MaximumFirstReactionDuration: The MaximumFirstReactionDuration is a duration before the expiration of which a reaction to a newly received service request, or a newly received service order has to occur This duration is calculated from the Service Level Objective (SLO), and cannot be changed on the UI.

MaximumCompletionDuration: MaximumCompletionDuration is a duration before the expiration of which a service request, or service order have can been completed.

This duration period is calculated from the Service Level Objective (SLO), and cannot be changed on the UI.

RequestMaximumProviderCompletionDuration: RequestMaximumProviderCompletionDuration is the duration before the expiration of which a provider can complete the request.

This duration period is calculated from the Service Level Objective (SLO), and cannot be changed on the UI.

RequestTotalInitialReactionDuration: RequestTotalInitialReactionDuration is the total duration that elapses before a request is accessed for processing.

This duration is calculated using status changes of the document, and cannot be changed on the UI (="In Process since" is "Opened At"+TotalInitialReactionDuration(old)").

RequestTotalProcessingDuration: RequestTotalProcessingDuration is the total duration of the processing of a request.

This duration is calculated using status changes of the document, and cannot be changed on the UI (="Finished At" is "Opened At"+"TotalProcessingDuration (old)").

RequestTotalRequestorDuration: RequestTotalRequestorDuration is the total duration that the requester needs for processing a request.

This duration is calculated using status changes of the document, and cannot be changed on the UI (=Finished At is Opened At +TotalRequestorDuration (old)).

RequestTotalProviderProcessingDuration: RequestTotalProviderProcessingDuration is the total duration that the provider needs for processing a request.

This duration is calculated using status changes of the document, and cannot be changed on the UI (=Received from Provider At Sent to Provider At +TotalProviderProcessingDuration (old)).

The elements directly located on the DurationTerms node are defined by the type GDT: CustomerTransactionDocumentDurationTermsElements, which is derived from It is type GDT: DurationElements.

These elements are: DurationRoleCode is Role of the specified duration.

It is type GDT: DurationRoleCode. Duration is Specification of the duration. The business role of the duration is specified by the DurationRoleCode. It is type GDT: Duration. DateCalculationFunctionReference is Reference to the function with which the duration is calculated. It is type GDT: DateCalculationFunctionReference.

PricingTerms

PricingTerms are the characteristics used for pricing and valuation of goods and services in the CustomerTransactionDocumentTemplate document. The elements directly located to the PricingTerms node are defined by the type GDT: CustomerTransactionDocumentPricingTermsElements, which is derived from It is type GDT: BusinessTransactionDocumentPricingTermsElements. These elements are:

CurrencyCode is Currency for the valuation of the goods and services ordered (document currency). It is type GDT: CurrencyCode.

CustomerPricingProcedureDeterminationCode is Customer scheme for determining a pricing procedure (proposed by the buyer or the ordering party).

It is type GDT: CustomerPricingProcedureDeterminationCode.

PriceDateTime is Price date at which price specifications are determined using a rule for automatic scheduling.

It is type GDT: LOCALNORMALIZED_DateTime Qualifier Price.

PriceDateTimeDateCalculationFunctionReference is Date rule for determining the price date.

It is type GDT: DateCalculationFunctionReference Qualifier PriceDateTime.

PriceSpecificationCustomerGroupCode is Group of customers for whom the same price specifications apply (suggested by the buyer or ordering party).

It is type GDT: PriceSpecificationCustomerGroupCode.

CustomerPriceListTypeCode is The customer price list type (proposed by the buyer or ordering party).

It is type GDT: CustomerPriceListTypeCode.

CustomerGroupCode is Group of customers (for general purposes, such as pricing and statistics, proposed by the buyer or ordering party).

It is type GDT: CustomerGroupCode.

WarrantyGoodwillCode is Specifies the extent to which the provision of services or materials are not or partially invoiced to the customer in the case of a warranty or compensation.

It is type GDT: WarrantyGoodwillCode.

The exchange rate elements (ExchangeRate) can be set together.

PriceAndTaxCalculation (DO)

PriceAndTaxCalculation are the price and tax components determined by price and tax determination/valuation that are valid for the CustomerTransactionDocumentTemplate document.

DeliveryTerms

DeliveryTerms are agreements that apply for the delivery of goods and provision of services in the CustomerTransactionDocumentTemplate document.

The elements directly located at the DeliveryTerms node are defined by the type GDT: CustomerTransactionDocumentDeliveryTermsElements, which is derived from GDT: BusinessTransactionDocumentDeliveryTermsElements. These elements are:

Incoterms is the conventional contract formulations for the delivery terms.

It is type GDT: Incoterms.

PartialDeliveryControlCode Coded representation of partial delivery control.

The PartialDeliveryControlCode specifies whether a customer permits partial deliveries and in what form.

It is type GDT: PartialDeliveryControlCode.

QuantityTolerance is The tolerated difference between a requested and actual delivery quantity in percentage form.

It is type GDT: QuantityTolerance.

DeliveryPriorityCode Coded representation of priority/urgency of delivery.

It is type GDT: BusinessTransactionPriorityCode.

DeliveryCombinationAllowedIndicator is Specifies whether different sales transactions may be combined when creating deliveries.

It is type GDT: CombinationAllowedIndicator.

MaximumLeadTimeDuration is Maximum lead time from pointintime of order entry until delivery. This duration can be specified in a quote, or negotiated in a contract, and forms the basis for calculating the latest possible delivery date for a given order entry date.

It is type GDT: Duration., and Qualifier: MaximumLeadTime.

The DeliveryControlCode field value ‘Complete delivery’ and the QuantityTolerances field are mutually exclusive. It is therefore not recommended to maintain quantity tolerances and set complete delivery at the same time.

TransportationTerms

TransportationTerms are agreements that apply for transport of the goods to be delivered.

The elements directly attached to the TransportationTerms node are defined by the type GDT: CustomerTransactionDocumentTransportationTermsElements, which is derived from It is type GDT: BusinessTransactionDocumentTransportationTermsElements. These elements are:

TransportServiceLevelCode is Agreed services with respect to speed of delivery.

It is type GDT: TransportServiceLevelCode.

TransportModeCode is Method of transport used for the delivery.

It is type GDT: TransportModeCode.

InvoiceTerms

InvoiceTerms are the agreements that apply for invoicing goods and services in the CustomerTransactionDocumentTemplate document.

The elements directly attached to the InvoiceTerms node are defined by the type GDT: CustomerTransactionDocumentInvoiceTermsElements, which is derived from It is type GDT: BusinessTransactionDocumentInvoiceTermsElements. These elements are:

ProposedInvoiceDate is Date on which the invoice is proposed to be created, with a rule for automatic scheduling.

It is type GDT: Date, Qualifier Invoice.

ProposedInvoiceDateDateCalculationFunctionReference is Date rule for determining the proposed price date.

It is type GDT: DateCalculationFunctionReference Qualifier ProposedInvoiceDate.

InvoicingBlockingReasonCode is Specifies why processing of invoicing documents is blocked for the business transaction item.

It is type GDT: InvoicingBlockingReasonCode.

CashDiscountTerms (DO)

CashDiscountTerms are the data required for a CustomerTransactionDocumentTemplate document for handling payments.

PaymentControl (DO)

PaymentControl contains the data necessary for making payments by credit card.

TextCollection (DO)

TextCollection is a collection of natural language text that refers to the CustomerTransactionDocumentTemplate document.

The elements located directly at the node TextCollection are defined by the type GDT: TextCollectionElements.

AttachmentFolder (DO)

An AttachmentContainer is a collection of all the documents attached for a CustomerTransactionDocumentTemplate document.

The elements located directly at the node AttachmentFolder are defined by the type GDT: AttachmentFolderElements.

SolutionProposal

SolutionProposal is a solution to a customer problem which has been proposed to the customer as a solution to his or her query as part of CustomerTransactionDocumentTemplate document processing.

The elements located directly at the SoltionProposal node are defined by the type GDT: CustomerTransactionDocumentSolutionProposalElements. These elements are:

CustomerProblemAndSolutionVersionUUID is Identifier of the version of a CustomerProblemAndSolution, which is proposed as solution to the customer.

It is type GDT: UUID.

CustomerProblemAndSolutionKey

Key structure of a CustomerProblemAndSolution that combines the ID of the CustomerProblemAndSolution with the corresponding VersionID.

IDT: CustomerProblemAndSolutionKey.

ID

It is type GDT: KnowledgeBaseArticleID

VersionID

It is type GDT: VersionID.

ExternalKnowledgeBaseArticleID is Unique identifier for the KnowledgeBaseArticle of an external service provider.

It is type GDT: KnowledgeBaseArticleID.

ExternalKnowledgeBaseArticleDescription is Description of the KnowledgeBaseArticle of an external service provider.

It is type GDT: _MEDIUM_Description. Qualifier KnowledgeBaseArticle.

ExternalKnowledgeBaseCode is Coded representation of the type of the knowledge base article identifier.

It is type GDT: ExternalKnowledgeBaseCode.

ExternalKnowledgeBaseArticleWebURI is WebAddress is the unique digital address of the Solution within the World Wide Web.

It is type GDT: WebURI and Qualifier: KnowledgeBaseArticle.

It is type GDT: Note. (Restriction: The length of the comment is restricted to a maximum of 80)

Inbound aggregation relationships:

From business object CustomerProblemAndSolution/node Root CustomerProblemAndSolution may have a cardinality of c:cn CustomerProblemAndSolution that is proposed to the customer. Either the CustomerProblemAndSolutionID or ExternalKnowledgeBaseArticleID can be filled.

TotalValues

TotalValues are the cumulated total values that occur in a CustomerTransactionDocumentTemplate, for example, the total gross and net weight, volume, gross and net amount, tax amount, and freight costs.

Quantities, weights, volumes and values are calculated by cumulation, dates by special logic (the first, the last, and so on).

The elements located directly at the TotalValues node are defined by the type GDT: CustomerTransactionDocumentValuesElements. These elements are:

GrossWeightMeasure is The total gross weight in the CustomerTransactionDocumentTemplate document. It is type GDT: Measure, and Qualifier: GrossWeight.

GrossWeightMeasureTypeCode is The type code of the total gross weight in the CustomerTransactionDocumentTemplate document.

It is type GDT: MeasureTypeCode., and Qualifier: GrossWeight.

NetWeightMeasure is The total net weight in the CustomerTransactionDocumentTemplate document.

It is type GDT: Measure and Qualifier: NetWeight.

NetWeightMeasureTypeCode is The type code of the total net weight in the CustomerTransactionDocumentTemplate document.

It is type GDT: MeasureTypeCode and Qualifier: NetWeight.

GrossVolumeMeasure is the total gross volume in the CustomerTransactionDocumentTemplate document.

It is type GDT: Measure and Qualifier: GrossVolume.

GrossVolumeMeasureTypeCode is the type code of the total gross volume in the CustomerTransactionDocumentTemplate document.

It is type GDT: MeasureTypeCode., and Qualifier: GrossVolume.

GrossAmount is The total gross amount in the CustomerTransactionDocumentTemplate document.

It is type GDT: Amount, and Qualifier: Gross.

NetAmount is The total net amount in the CustomerTransactionDocumentTemplate document.

It is type GDT: Amount, and Qualifier: Net.

TaxAmount is The total tax amount in the CustomerTransactionDocumentTemplate document.

It is type GDT: Amount, and Qualifier: Tax.

FreightChargeAmount is The total freight charges in the CustomerTransactionDocumentTemplate document.

It is type GDT: Amount, and Qualifier: FreightCharge.

NetWithoutFreightChargeAmount is The total net amount excluding freight charges.

It is type GDT: Amount, and Qualifier: NetWithoutFreightCharge.

LastConfirmedDateTime is Last confirmed date in the CustomerTransactionDocumentTemplate document.

It is type GDT: LOCALNORMALIZED_DateTime. and Qualifier: LastConfirmed.

LastPromisedDateTime is Last promised date in the CustomerTransactionDocumentTemplate document.

It is type GDT: LOCALNORMALIZED_DateTime. and Qualifier: LastPromised.

Composition Relationships:

TotalValuesPricingSubtotal 36162 may have a cardinality of 1:c6

Integrity

TotalValues cannot be changed externally.

TotalValuesPricingSubtotal

TotalValuesPricingSubtotal is the condition subtotal of a specific type in the total value of all items in a CustomerTransactionDocumentTemplate, that result from Pricing.

The condition subtotals are freely defined in configuration for Pricing, and are transferred together with the code from Pricing.

The elements located directly at the node TotalValuesPricingSubtotal are defined by the type GDT: CustomerTransactionDocumentTotalValuesPricingSubtotalElements. These elements are:

TypeCode is Coded representation of the subtotal in a price calculation.

It is type GDT: PricingSubtotalTypeCode.

Amount is Value of a condition subtotal.

It is type GDT: Amount.

BusinessTransactionDocumentReference

A BusinessTransactionDocumentReference is a unique reference between the CustomerTransactionDocumentTemplate and another business document or another business document item. All references result in the business documents or business document items that are linked directly to the CustomerTransactionDocumentTemplate.

BusinessTransactionDocumentReference occurs in the following incomplete and disjoint specializations: PurchaseOrderReference, CustomerQuoteReference, SalesOrderReference, OutboundDeliveryReference, InboundDeliveryReference, CustomerInvoiceReference, ServiceRequestReference, ServiceContractReference, ServiceConfirmationReference, ServiceOrderReference, CustomerComplaintReference, EmailActivityReference, PhoneCallActivityReference, LetterActivityReference, FaxActivityReference, AppointmentActivityReference, OpportunityReference, and ActivityReference.

The elements directly attached to the BusinessTransactionDocumentReference node are defined by the type GDT: CustomerTransactionDocument-BusinessTransactionDocumentReferenceElements, which is derived from It is type GDT: BusinessTransactionDocumentReferenceElements.

It consists of the following elements:

BusinessTransactionDocumentReference The BusinessTransactionDocumentReference contains the unique reference to a different business document or to an item of a different business document.

It is type GDT: BusinessTransactionDocumentReference.

BusinessTransactionDocumentRelationshipRoleCode.

A BusinessTransactionDocumentRelationshipRoleCode is the coded representation of the role that a referenced business document or item of a referenced business document adopts in the reference relationship.

It is type GDT: BusinessTransactionDocumentRelationshipRoleCode.

BusinessTransactionDocumentDataProviderIndicator

The BusinessTransactionDocumentDataProviderIndicator specifies whether a business document provides data for the referenced business document or not.

It is type GDT: DataProviderIndicator

Inbound Association Relationships:

From business object PurchaseOrder/node Root

PurchaseOrder may have a cardinality of c:c PurchaseOrder that is referenced through specialisation PurchaseOrderReference (cross DU)

From business object CustomerQuote/node Root

CustomerQuote may have a cardinality of c:cn CustomerQuote that is referenced through specialisation CustomerQuoteReference From business object SalesOrder/node Root SalesOrder may have a cardinality of c:cn SalesOrder that is referenced through specialisation SalesOrderReference From business object Inbound Delivery/node Root InboundDelivery may have a cardinality of c:cn Inbound Delivery that is referenced through specialisation Inbound Delivery (cross DU)

From business object OutboundDelivery/node Root.

OutboundDelivery may have a cardinality of c:cn Outbound Delivery that is referenced through specialisation OutboundDelivery (cross DU)

From business object CustomerInvoice/node Root.

CustomerInvoice may have a cardinality of c:cn CustomerInvoice that is referenced through specialisation CustomerInvoiceReference (Cross DU)

From business object ServiceOrder/node Root

ServiceOrder may have a cardinality of c:cn ServiceOrder that is referenced through specialisation ServiceOrderReference From business object ServiceRequest/node Root.

ServiceRequest may have a cardinality of c:cn ServiceRequest that is referenced through specialisation ServiceRequestReference From business object ServiceConfirmation/node Root ServiceConfirmation may have a cardinality of c:cn ServiceConfirmation that is referenced through specialisation ServiceConfirmationReference From business object ServiceContract/node Root ServiceContract may have a cardinality of c:cn Service Contract that is referenced through specialisation ServiceContractReference From business object CustomerComplaint/node Root CustomerComplaint may have a cardinality of c:cn CustomerComplaint that is referenced through specialisation CustomerComplaintReference From business object EmailActivity/node Root EmailActivity may have a cardinality of c:cn EmailActivity that is referenced through specialisation EmailActivityReference.

From business object LetterActivity/node Root

LetterActivity may have a cardinality of c:cn LetterActivity that is referenced through specialisation LetterActivity.

From business object FaxActivity/node Root

FaxActivity may have a cardinality of c:cn FaxActivity that is referenced through specialisation FaxActivity From business object PhoneCallActivity/node Root PhoneCallActivity may have a cardinality of c:cn PhoneCallActivity that is referenced through specialisation PhoneCallActivity From business object AppointmentActivity/node Root AppointmentActivity may have a cardinality of c:cn AppointmentActivity that is referenced through specialisation AppointmentActivityReference.

Integrity

BusinessTransactionDocumentReference contains the immediate neighbors of the CustomerTransactionDocumentTemplate document.

AccessControlList (DO)

The AccessControlList is a list of access groups that have access to a CustomerTransactionDocumentTemplate document.

ControlledOutputRequest (DO)

ControlledOutputRequest is a controller of output requests and processed output requests related to the CustomerTransactionDocumentTemplate document.

Node PeriodTerms: Qualifier for Start and EndTimePointDateCalculationFunctionReference need to be clarified.

Node ItemProduct 36110: Element and GDT QuantityRatio need to be clarified in connection with QuantityTypeCode.

Renaming, if possible or necessary (UI on new StyleGuide, central conversion to DateTime, . . . ): PriceDate>PricingDate, PostingDate>Date, BuyerGroupCode>CustomerGroupCode etc.

Item

Item is the item of a customer-specific business transaction that focuses on delivering goods or providing a service, on the prices and on preparing the invoice. Item is the identifying and administrative item information in a CustomerTransactionDocumentTemplate which, in addition to the schedule lines, contains all the data that applies to the item, for example, the product information, the parties involved, the sales/delivery/Customer Invoicing specific agreements, status and references, and so on.

Item occurs in the following complete and disjoint specializations:

SalesItem: A SalesItem is an item that describes the agreement between a seller and a customer regarding the sale and delivery of a material at a certain time, for a certain quantity and at a certain price.

CustomerServiceItem: A CustomerServiceItem is an item that describes an agreement between a service provider and a customer concerning the provision of a service and includes further business, planning and execution relevant information.

CustomerSparePartItem: A CustomerSparePartItem is an item in a customer quote document which describes a planned spare part or service material that is required to carry out a planned service activity for a customer. CustomerSparePartItem also contains business and planning and execution relevant information.

SalesQuoteItem: A SalesQuoteItem is an item of a customer quote document describing the agreement between a seller and a customer concerning the sale and delivery of a material, for a specific date, a specific quantity and a specific price.

CustomerServiceConfirmationItem: A CustomerServiceConfirmationItem is an item used to confirm the provision of services (normally in the context of a service process).

CustomerSparePartConfirmationItem: A CustomerSparePartConfirmationItem is an item used to confirm the spare parts used during a service for a customer.

ComplaintItem: A ComplaintItem is an item for recording goods or services that have resulted in a customer complaint.

CompensationDeliveryItem: A CompensationDeliveryItem is an item for recording goods sent to a customer in compensation for a complaint.

RefundItem: A RefundItem is an item used to determine reimbursement amounts to be sent to a customer in compensation for a complaint or a return.

CustomerReturnItem: A CustomerReturnItem is an item requested by the customer to the seller to take back a specific quantity of a material that have already been delivered.

ServiceContractItem: A ServiceContractItem is an item that contains the agreements regarding the type and extent of services agreed upon (SLA, services covered, objects covered) between a customer and service provider The elements located directly at the node Item are defined by the type GDT: CustomerTransactionDocumentItemElements. These elements are:

ID is the unique identifier for an item of CustomerTransactionDocumentTemplate assigned by the seller within a CustomerTransactionDocumentTemplate document.

It is type GDT: BusinessTransactionDocumentItemID.

ProcessingTypeCode is Coded representation of item processing of the CustomerTransactionDocumentTemplate within the process component.

It is type GDT: BusinessTransactionDocumentItemProcessingTypeCode.

ProcessingTypeCode ("Item type" or "item category") includes standard order items, for example.

TypeCode is Coded representation of the type of a CustomerTransactionDocumentTemplate item.

It is type GDT: BusinessTransactionDocumentItemTypeCode. Is set internally from the ProcessingTypeCode and contains one of the permissible item specializations of the CustomerTransactionDocumentTemplate.

An example of a TypeCode would be a SalesItem.

DateTime is the creation time (posting time) of a CustomerTransactionDocumentTemplate item from a business perspective.

It is type GDT: GLOBAL_DateTime.

Description is a short description of a CustomerTransactionDocumentTemplate item.

It is type GDT: _SHORT_Description.

Buyer ID is Unique identifier for a CustomerTransactionDocumentTemplate item assigned by the buyer.

It is type GDT: BusinessTransactionDocumentItemID.

BuyerDateTime is the Date time assigned by the buyer for a CustomerTransactionDocumentTemplate item.

It is type GDT: GLOBAL_DateTime and Qualifier: Buyer.

BuyerName is the name of the item assigned by the buyer (Your reference).

It is type GDT: _MEDIUM_Name.

SystemAdministrativeData is The administrative data stored in a system. This data includes system users and change dates/times.

It is type GDT: SystemAdministrativeData.

UUID is The identifier for a CustomerTransactionDocumentTemplate item assigned internally.

It is type GDT: UUID or BusinessTransactionDocumentItemID.

UUID serves as an alternate key, with which other business objects can define foreign keys.

ParentItemUUID: UUID of the higherlevel item in an item hierarchy of a CustomerTransactionDocumentTemplate.

It is type GDT: UUID.

ParentItemID is ID of the higherlevel item in an item hierarchy of a CustomerTransactionDocumentTemplate.

It is type GDT: BusinessTransactionDocumentItemID.

HierarchyRelationshipTypeCode is Coded representation of the type of relationship of the subitem to its hierarchically higher parent item (ParentItemUUID).

It is type GDT: BusinessTransactionDocumentItemHierarchyRelationshipTypeCode. BusinessTransactionDocumentItemHierarchyRelationshipTypeCode 1 (BOM) is allowed.

BusinessTransactionDocumentItemHierarchyRelationshipTypeCode 2 (Group) is allowed.

Following codes are valid: 1 BOM

MigratedDataAdaptationTypeCode Coded representation of the type of data adaption performed during migration of CustomerTransactionDocumentTemplate item.

It is type GDT: MigratedDataAdaptationTypeCode.

when migrating data from a source system to a target system this data may be adapted, for example, a business object or business document may be taken over completely or partially.

The MigratedDataAdaptationTypeCode is used, when a CustomerTransactionDocumentTemplate item is migrated.

Status: CustomerTransactionDocumentItemStatus: This element describes all statuses of the CustomerTransactionDocumentTemplate on item level.

FulfilmentDataCompletenessStatusCode is The status describes whether data has been completely entered in the area Fulfillment. GDT: DataCompletenessStatusCode (Qualifier Fulfilment)

InvoicingDataCompletenessStatusCode The status describes whether data has been completely entered in the area Invoicing. GDT: DataCompletenessStatusCode (Qualifier Invoicing)

PricingDataCompletenessStatusCode The status describes whether data has been completely entered in the area Pricing. GDT: DataCompletenessStatusCode (Qualifier: Pricing)

GeneralDataCompletenessStatusCode The status describes whether general data has been completely entered. GDT: DataCompletenessStatusCode (Qualifier: General)

FulfilmentProcessingStatusCode is The status describes the processing progress regarding the delivery or provision of a service. GDT: ProcessingStatusCode, Qualifier Fulfilment.

InvoiceProcessingStatusCode is The status describes the processing progress during invoicing. GDT: ProcessingStatusCode, Qualifier Invoicing.

CustomerReturnLifeCycleStatusCode is The status represents the basic processing progress on the item of the CustomerTransactionDocumentTemplate. It is type GDT: CustomerReturnLifecycleStatusCode CustomerOrderLifeCycleStatusCode is The status represents the basic processing progress on the item of the CustomerTransactionDocumentTemplate. It is type GDT: CustomerOrderLifecycleStatusCode CancellationStatusCode is The status indicates whether a cancellation for the CustomerTransactionDocumentTemplate exists or not. It is type GDT: CancellationStatusCode ProductAvailabilityConfirmationStatusCode is The status provides the result of an availability check. GDT: ProductAvailabilityConfirmationStatusCode.

CustomerQuoteItemLifeCycleStatusCode is The status displays the basic processing progress of the Customer Quote in an aggregated form. GDT: CustomerQuoteLifecycleStatusCode OrderProcessingStatusCode is The status indicates whether an order assigned to the item of a quote has been created. GDT: ProcessingStatusCode PlanningReleaseStatusCode is The status represents the planning progress of the item.

GDT: ReleaseStatusCode and Qualifier: Planning

ExecutionReleaseStatusCode is The status represents the execution progress of the item.

GDT: ReleaseStatusCode and Qualifier: Execution.

InvoicingBlockingStatusCode: The status represents a block of the invoicing process.

GDT: BlockingStatus (Qualifier: Invoicing)

FulfilmentBlockingStatusCode: The status represents a block of the fulfilment process GDT: BlockingStatusCode (Qualifier: Fulfilment)

ConsistencyStatusCode: The status denotes if the CustomerTransactionDocumentTemplate has errors. GDT: ConsistencyStatusCode ApprovalStatusCode The status describes whether an approval by the creator of the quote has taken place. It is type GDT: ApprovalStatusCode Composition Relationships: ItemBusinessProcessVariantType 36228 may have a cardinality of 1:n, ItemScheduleLine 36078 may have a cardinality of 1:cn, ItemProduct 36110 may have a cardinality of 1:c, ItemParty 36116 may have a cardinality of 1:cn, ItemLocation 36122 may have a cardinality of 1:cn, ItemSalesTerms 36128 may have a cardinality of 1:c, ItemDeliveryTerms 36124 may have a cardinality of 1:c, ItemTransportationTerms 36126 may have a cardinality of 1:c, ItemInvoiceTerms 36168 may have a cardinality of 1:c, ItemPricingTerms 36164 may have a cardinality of 1:c, ItemTimePointTerms 36202 may have a cardinality of 1:cn, ItemPeriodTerms 36200 may have a cardinality of 1:cn, ItemDurationTerms 36181 may have a cardinality of 1:cn, ItemTotalValues 36170 may have a cardinality of 1:c, ItemActualValues 36172 may have a cardinality of 1:c, ItemTextCollection 36226 may have a cardinality of 1:c, ItemAttachmentFolder 36224 may have a cardinality of 1:c, ItemCoveredObject 36174 may have a cardinality of 1:cn, ItemReleasableProduct 36112 may have a cardinality of 1:cn, ItemServiceTerms 36130 may have a cardinality of 1:c, ItemConfirmation 36180 may have a cardinality of 1:c, ItemBusinessTransactionDocumentReference 36206 may have a cardinality of 1:cn, ItemComplaintTerms 36176 may have a cardinality of 1:c, and ItemContractTerms 36178 may have a cardinality of 1:c.

Inbound Aggregation Relationships

From business object CustomerTransactionDocumentTemplate/node Item:

ParentItem may have a cardinality of c:cn association to the CustomerTransactionDocumentTemplateItem node itself.

Semantically speaking, the Item can contain other items. This is how item hierarchies are mapped. Items that are a part of an item hierarchy and do not have any further higherlevel items are called main items (root nodes of the hierarchy). All other items are called subitems.

The following types of hierarchy relationships are existing:

Bill of Material

A product with a bill of materials is mapped in the CustomerTransactionDocumentTemplate as an item hierarchy. The product itself is mapped as the main item and the components of the bill of materials as the subitems.

Free Goods

If free goods are granted for an item, an item hierarchy is generated with subitems which contain the free goods information.

Sourcing

If the product required by the customer cannot be procured, an item hierarchy is generated for this item with subitems which contain the information on the substituted products.

Inbound Association Relationships: None

From business object Identity/node Root:

CreationIdentity may have a cardinality of c:cn foreign key association to BO Identity LastChangeIdentity may have a cardinality of c:cn foreign key association to BO Identity Association Relationships for Navigation PriceAndTaxCalculationItem within the CustomerTransactionDocumentTemplate. Association to an item in the results of price and tax calculation.

Specialization Associations for Navigation

To node BusinessProcessVariantType:

ItemMainBusinessProcessVariantType may have a cardinality of c:c association to an ItemBusinessProcessVariantType that is the main one To Node ItemParty:

BuyerItemParty may have a cardinality of c:c association to a Party that occurs in the BuyerItemParty specialization SellerItemParty may have a cardinality of c:c association to a Party that occurs in the SellerItemParty specialization.

ProductRecipientItemParty may have a cardinality of c:c association to a Party that occurs in the ProductRecipientItemParty specialization.

VendorItemParty may have a cardinality of c:c association to a Party that occurs in the VendorItemParty.

BillToItemParty may have a cardinality of c:c association to a Party that occurs in the BillToItemParty specialization.

PayerItemParty may have a cardinality of c:c association to a Party that occurs in the PayerItemParty specialization SalesUnitItemParty may have a cardinality of c:c Association to a Party that occurs in the SalesUnitItemParty specialization.

ServiceSupportTeamItemParty may have a cardinality of c:c Association to a Party that occurs in the ServiceSupportTeamItemParty specialization.

ServiceExecutionTeamItemParty may have a cardinality of c:c Association to a Party that occurs in the specialization ServiceExecutionTeamItemParty.

EmployeeResponsibleItemParty may have a cardinality of c:c Association to a party that occurs in the EmployeeResponsibleItemParty specialization.

ServicePerformerItemParty may have a cardinality of c:c Association to a Party that occurs in the ServicePerformerItemParty specialization.

ContractReleaseAuthorizedItemParty may have a cardinality of c:c Association to a Party that occurs in the ContractReleaseAuthorizedItemParty specialization.

To Node ItemLocation:

ShipToItemLocation may have a cardinality of c:c Association to a party that occurs in the ShipToItemLocation specialization.

ShipFromItemLocation may have a cardinality of c:c Association to a Party that occurs in the ShipFromItemLocation specialization.

ServicePointItemLocation may have a cardinality of c:c Association to a party that occurs in the ServicePointItemLocation specialization To Node ItemTimePointTerms:

CompletionItemTimePoint may have a cardinality of c:c Association to an ItemTimePointTerms that occurs in the CompletionItemTimePoint specialization.

To Node ItemPeriodTerms:

RequestedFulfilmentItemPeriodTerms 36192 may have a cardinality of c:c Association to a ItemPeriodTerms that occurs in the RequestedFulfilmentItemPeriodTerms specialization.

ActualFulfilmentItemPeriodTerms 36194 may have a cardinality of c:c Association to a ItemPeriodTerms that occurs in the ActualFulfilmentItemPeriodTerms specialization.

To Node ItemDurationTerms:

MaximumFirstReactionItemDurationTerms 36188 may have a cardinality of c:c Association to an ItemDurationTerms that occurs in the MaximumFirstReactionItemDurationTerms specialization.

MaximumCompletionItemDuration 36190 may have a cardinality of c:c Association to an ItemDurationTerms that occurs in the MaximumCompletionItemDuration specialization.

To Node ItemBusinessTransactionDocumentReference:

BaseItemCustomerQuoteItemReference: may have a cardinality of c:c Association to a reference that occurs in the ItemCustomerQuoteItemReference specialization, and is used as a basis.

ItemPurchaseOrderItemReference may have a cardinality of c:c Association to a reference that occurs in the ItemPurchaseOrderItemReference specialization.

ItemSalesOrderItemReference may have a cardinality of c:cn Association to a reference that occurs in the ItemSalesOrderItemReference specialization.

ItemOutboundDeliveryItemReference may have a cardinality of c:cn Association to a reference that occurs in the ItemOutboundDeliveryItemReference specialization.

ItemCustomerInvoiceItemReference may have a cardinality of c:cn Association to a reference that occurs in the ItemCustomerInvoiceItemReference specialization.

ItemServiceOrderReference may have a cardinality of c:c Association to a reference that occurs in the ServiceOrderReference specialization.

ItemServiceContractItemReference may have a cardinality of c:c Association to a reference that occurs in the ItemServiceContractItemReference specialization.

ItemServiceConfirmationItemReference may have a cardinality of c:cn Association to a reference that occurs in the ItemServiceConfirmationItemReference specialization.

ItemCustomerComplaintItemReference may have a cardinality of c:c Association to a reference that occurs in the ItemCustomerComplaintItemReference specialization.

ItemInboundDeliveryItemReference may have a cardinality of c:cn Association to a reference that occurs in the ItemInboundDeliveryItemReference specialization.

BasePrecedingItemServiceOrderItemReference may have a cardinality of c:c Association to the reference of the item of the preceding Service Order that is used as a basis.

BaseItemBusinessTransactionDocumentItemReference may have a cardinality of c:c association to a reference that occurs in the any specialization, and is used as a basis. In the use case of returns, the BaseItemBusinessTransactionDocumentItemReference is either a sales order item or a customer invoice item.

To Node ItemScheduleLine:

RequestedItemScheduleLine may have a cardinality of c:cn Association to a ItemScheduleLine that occurs in the RequestedItemScheduleLine specialization.

ConfirmedItemScheduleLine may have a cardinality of c:cn Association to a Schedule Line that occurs in the ConfirmedItemScheduleLine specialization.

PromisedItemScheduleLine may have a cardinality of c:cn Association to a ScheduleLine that occurs in the PromisedItemScheduleLine specialization.

FirstRequestedItemScheduleLine may have a cardinality of c:c Association to the ScheduleLine that occurs in the RequestedItemScheduleLine specialization.

FirstPromisedItemScheduleLine may have a cardinality of c:c Association to the first ScheduleLine that occurs in the PromisedItemScheduleLine specialization.

FirstFulfiledItemScheduleLine may have a cardinality of c:c Association to the first ItemScheduleLine that occurs in the FulfiledItemScheduleLine specialization.

ConfirmationRelevantItemScheduleLine may have a cardinality of c:cn Association to an item schedule line relevant to order confirmation. Confirmation relevant schedule lines occur in the ConfirmedItemScheduleLine or PromisedItemScheduleLine specialization.

Integrity

The BuyerID and the ID cannot be changed after the item has been created.

The ParentItemID and the HierarchyRelationshipTypeCode cannot be changed after the item has been created.

The PostingDateTime cannot be changed after the item has been created.

The SystemAdministrativeData is set internally by the system. This data cannot be assigned or changed externally.

The ParentItemID cannot be changed after an item has been created.

The HierarchyRelationshipTypeCode cannot be changed after an item has been created.

The ParentItemID, ParentItemUUID and HierarchyRelationshipTypeCode can be set together.

Enterprise Service Infrastructure Actions

AddReferenceWithDataProvision

This action adds an ItemBusinessTransactionDocumentReference and provides relevant data from the referenced item a CustomerTransactionDocumentTemplate item.

The action elements that are used to identify the referenced document are defined by the data type CustomerTransactionDocumentItemAddReferenceWithDataProvisionActionElements. These elements are:

BusinessTransactionDocumentItemKey Key of an item of BusinessTransactionDocument IDT: BusinessTransactionDocumentItemKey BusinessTransactionDocumentItemID ID of BusinessTransactionDocumentItem It is type GDT: BusinessTransactionDocumentItemID.

BusinessTransactionDocumentID ID of BusinessTransactionDocument

It is type GDT: BusinessTransactionDocumentID.

NotifyOfProductAvailabilityConfirmationUpdate (S&AM Action): Changes the sales order with availability and reservation information based on changes in fulfilment planning.

CheckProductAvailabilityAndConfirm (S&SAM Action): This action carries out a new availability check (ATP, AvailableToPromise) and transfers the confirmed dates, quantities and products from the result.

This action may be valid for the items that are relevant to the logistical process.

Resulting changes in the object: The confirmed quantities from the results of the availability check are placed into schedule lines. In the case of product substitution due to planning aspects (availability, discontinued parts, and so on), subitems are also created with the replaced products. Sourcing called during the availability check also returns the ShipFromLocation.

Resulting changes in status: The action influences the ATP Confirmation Status

RequestCancellation (S&AM Action): This action cancels items by setting a cancellation reason.

The action may be permitted if the item has not been cancelled or completed.

Resulting changes in the status: The action sets the status variable ‘CancellationStatus’ to ‘Cancelled’.

Parameters: The actions elements are defined by the data type CustomerTransactionDocumentRequestCancellationActionElements. These elements are:

CancellationReasonCode is Reason for canceling a sales transaction.

It is type GDT: CancellationReasonCode.

RevokeCancellation (S&AM action): This action undoes the action Cancel.

This action can be carried out with items that have been cancelled.

The action changes the ‘CancellationStatus’ status variable from ‘cancelled’ to ‘not cancelled’.

NotifyOfCustomerRequirementFulfilment (S&AM Action): This action receives the external status determined by the logistics system, and sets the ‘FulfilmentStatus’ in the item.

Resulting changes in the status: The action sets the ‘FulfilmentStatus’ according to the transferred value.

Parameter: The actions elements are defined by the data type:

<BO Name>ItemConfirmProductCustomerRequirementFulfilmentActionElements. That is:

FulfilmentProcessedStatus. It is type GDT: ProcessedStatusCode, Qualifier Fulfilment ConfirmCustomerInvoiceIssue (S&AM Action): This action updates the invoice quantity and sets the ‘InvoicingStatus’ according to the update in the Customer Invoice Processing System.

Always allowed as the action is carried out from inside the agent.

Resulting changes in status: The action sets the ‘InvoiceStatus’ according to the update in the Customer Invoice Processing System.

Create CompensationDeliverItem: Creates a compensation delivery item as a subitem of the main item Create RefundItem: Creates a refund item as a subitem of the main item Release (S&AM): This action releases the item in the CustomerTransactionDocumentTemplate document for the processing of subsequent processes.

ReleaseToPlan (S&AM Action): This action releases the item of the CustomerTransactionDocumentTemplate document for planning.

Prerequisite: This action may be valid for items that have the PlanningReleaseStatus “NOT RELEASED”

Effect: Change in Status: This action sets the PlanningReleaseStatus to “RELEASED.”

ReleaseToExecute (S&AM Action): This action releases the item of the CustomerTransactionDocumentTemplate document for execution.

Prerequisite: This action may be valid for items that have the ExecutionReleaseStatus “NOT RELEASED”

Effect: Change in Status: This action sets the ExecutionReleaseStatus to “RELEASED.”

CancelPlanningRelease (S&AM Action): This action cancels the planning release of the item of the CustomerTransactionDocumentTemplate document.

Prerequisite: This action may be valid for items that have the PlanningReleaseStatus “RELEASED”

Effect: Change in Status: This action sets the PlanningReleaseStatus to “NOT RELEASED.”

Complete (S&AM Action): This action completes the item of the CustomerTransactionDocumentTemplate document.

Prerequisite: This action may be valid for items that have the status “Open, InPlanning, or InExecution”

Effect: Change in Status: This action sets the CompletedStatus.

StartProcessing (S&AM Action): This action sets the status of the item of the CustomerTransactionDocumentTemplate document to “In Process.”

Prerequisite: This action may be valid for items that have the status “Open”

Effect: Change in Status: This action sets the InProcessStatus

ConfirmExecution: Used in the CustomerTransactionDocumentTemplate to confirm that the referenced Service Order Item is executed. This action calls the S&AM Action ‘FinishFulfillment’ in the Service Order Item, which sets the FullfillmentStatus of the Service Order Item to ‘finished’.

Prerequisite: The CustomerTransactionDocumentTemplate have a service order item as predecessor. The FullfillmentStatus of the referenced service order item is ‘InProcess’.

Effect: Change in Status of referenced service order item: This action sets the Fulfillment Status.

StartFulfilmentProcessing (S&AM Action): This action sets the FulfilmentProcessingStatus of the item of the CustomerTransactionDocumentTemplate document to “In Process.”

Prerequisite: This action may be valid for items that have the FulfillmentProcessingStatus “Open.”

Effect: Change in Status: This action sets the FulfillmentProcessingStatus to “In Process.”

FinishFulfilmentProcessing (S&AM Action): This action sets the FulfilmentProcessingStatus of the item of the CustomerTransactionDocumentTemplate document to “Finished.”

Prerequisite: This action may be valid for items that have the FulfillmentProcessingStatus “In Process.”

Effect: Change in Status: This action sets the FulfillmentProcessingStatus to “Finished.”

NotifyOfSalesOrder (S&AM Action) Used when another document references the CustomerTransactionDocumentTemplate. This action sets the OrderingProcessingStatusCode.

Prerequisite: Either the approval process is not used and the approval status has the value ‘Approval Not Necessary’ or the approval status has the value ‘Approved’.

Queries

QueryByReleasableProducts

Provides a list of all items from which the release of products is permitted.

The query elements are defined by the data type: CustomerTransactionDocumentReleasableQueryElements. These elements are:

TypeCode. It is type GDT: BusinessTransactionDocumentItemTypeCode

ReleasingPartyID is type GDT: PartyID

A party that has been defined in the CustomerTransactionDocumentTemplate document item as authorized to release, and that corresponds with the QueryElementReleasingParty.

Authorized to release are:

PartyPartyID in the specialization Buyer

ReleasingPartyUUID is type GDT: UUID

A party that has been defined in the CustomerTransactionDocumentTemplate document item as authorized to release, and that corresponds with the QueryElementReleasingParty.

Authorized to release are: PartyPartyID in the specialization Buyer and ReleaseDate. It is type GDT: DateTime and Qualifier: ContractRelease The QueryElement ReleaseDate lies within the validity period of the CustomerTransactionDocumentTemplate document (ValidityPeriod).

SalesAndServiceBusinessAreaSalesOrganisationID

SalesAndServiceBusinessAreaSalesOrganisationUUID is type GDT: OrganisationalCentreID.

SalesAndServiceBusinessAreaSalesOrganisationUUID

SalesAndServiceBusinessAreaSalesOrganisationUUID is type GDT: UUID.

SalesAndServiceBusinessAreaServiceOrganisationID

It is type GDT: OrganisationalCentreID.

SalesAndServiceBusinessAreaServiceOrganisationUUID

It is type GDT: UUID.

SalesAndServiceBusinessAreaDistributionChannelCode is type GDT:

DistributionChannelCode

ProductID is type GDT: ProductID. The ProductProductID or a ReleasableProductProductID corresponds with the QueryElement ProductID.

ProductUUID is type GDT: UUID.

The QueryElement ProductUUID is used for internal Query Calls.

The ProductProductID or a ReleasableProductProductID corresponds with the QueryElement ProductID.

ReleasableProductProductID is type GDT: ProductID.

ReleasableProductProductUUID is type GDT: UUID.

CoveredObjectProductID is type GDT: ProductID.

CoveredObjectProductUUID is type GDT: UUID.

ItemBusinessProcessVariantType

ItemBusinessProcessVariantType defines the character of a business process variant of the item of the CustomerTransactionDocumentTemplate. It represents a typical way of processing of an item of a CustomerTransactionDocumentTemplate within a process component from a business point of view. The elements located directly at the node ItemBusinessProcessVariantType are defined by the data type: CustomerTransactionDocumentItem-BusinessProcessVariantTypeElements, derived from BusinessProcessVariantTypeElements (Template). These elements are:

BusinessProcessVariantTypeCode 0

A BusinessProcessVariantTypeCode is a coded representation of a business process variant type of an item of a CustomerTransactionDocumentTemplate. It is type GDT: BusinessProcessVariantTypeCode.

MainIndicator

Indicator that specifies whether the current BusinessProcessVariantTypeCode is the main one or not.

It is type GDT: Indicator and Qualifier: Main

ItemProduct

ItemProduct is the identification, description and classification of the product (material or ServiceProduct) in the CustomerTransactionDocumentTemplate item.

The elements directly attached to the SalesTerms node are defined by the type GDT: CustomerTransactionDocumentSalesTermsElements, which is derived from It is type GDT: BusinessTransactionDocumentItemProductElements. These elements are:

ProductID is the identifier specified for the product. It is type GDT: ProductID.

ProductSellerID is a unique identifier for the product assigned by the seller. It is type GDT: ProductPartyID.

ProductTypeCode is Coded representation of the product type that describes the nature and basic properties of products, such as materials or service products. It is type GDT: ProductTypeCode.

ProductTypeCode 2 (ServiceProduct) is allowed.

ProductTypeCode 1 (Material) is allowed.

QuantityMeasureUnitCode is Unit of measure in which quantities are used for the product in the CustomerTransactionDocumentTemplate.

It is type GDT: MeasureUnitCode and Qualifier: Quantity

QuantityTypeCode is Type code in which quantities are used for the product in the CustomerTransactionDocumentTemplate. t is type GDT: QuantityTypeCode.

ProductBuyerID is unique identifier for the product assigned by the buyer. It is type GDT: ProductPartyID.

ProductStandardID is Standard ID for the product. It is type GDT: ProductStandardID.

ProductCategoryInternalID is Unique identifier a product category assigned to the product. It is type GDT: ProductCategoryInternalID.

PriceSpecificationProductGroupCode is Coded representation of a product group to which the product is assigned, for which specific price specifications apply. It is type GDT: PriceSpecificationProductGroupCode.

CommissionProductGroupCode is Coded representation of a product group to which the product is assigned, for which a specific commission is granted. It is type GDT: CommissionProductGroupCode.

RebateProductGroupCode is Coded representation of a product group to which the product is assigned, for which a specific bonus is granted. It is type GDT: RebateProductGroupCode.

CashDiscountDeductibleIndicator is Specifies if a discount can be granted for the product. It is type GDT: CashDiscountDeductibleIndicator.

ProductUUID is UUID of the product. It is type GDT: ProductUUID.

PricingProductID is The unique identifier of a product that is used for Pricing. It is type GDT: ProductID.

PricingProductUUID is UUID of a product that is used for Pricing. It is type GDT: ProductUUID.

Inbound aggregation relationships:

From business object ServiceProduct/node Root

ServiceProduct may have a cardinality of c:cn ServiceProduct

From business object Material/node Root

Material may have a cardinality of c:cn Material

From business object ProductCategoryHierarchy/node ProductCategory

ProductCategory: may have a cardinality of c:cn ProductCategory of the material or the service product.

The ProductTypeCode is determined internally and therefore cannot be changed.

The elements of the ItemProduct are taken as defaults from the Material or the ServiceProduct and can be changed.

ItemParty

An ItemParty is a natural or legal person, organization, organizational unit or group that is involved in a CustomerTransactionDocumentTemplate in a PartyRole. ItemParty occurs in the same specialization as those in the node Party, with the following exceptions:

Missing specializations are: Vendor Party.

The elements directly attached to the ItemParty node are defined by the type GDT: CustomerTransactionDocumentItemPartyElements, which is derived from It is type GDT: BusinessTransactionDocumentPartyElements.

The elements of the ItemParty consist of the elements of the Party node, but they do not refer to the whole business transaction, to the Item.

Composition Relationships include ItemPartyContactParty 36114 may have a cardinality of 1:cn and ItemPartyAddress 36118 may have a cardinality of 1:c.

ItemBuyerParty and its ContactParty may not deviate in the party node from the BuyerParty.

ItemPayerParty and its ContactParty may not deviate in the party node from the PayerParty.

ItemSalesUnitParty may not deviate in the party node from the SalesUnitParty.

ItemPartyAddress (DO)

The Address Dependent Object contains a document specific address for the party.

The data is mapped using the dependent object Address.

Structure

Defines address in the DO.

ItemPartyContactParty

An ItemPartyContactParty is a natural person or organizational unit that can be contacted for the respective ItemParty.

The contact can be a contact person or a secretariat, for example. Normally, communication data is available for the contact.

The elements of the ItemPartyContact are the same as those of the PartyContact node but they refer to the item rather than the business transaction as a whole.

Composition Relationships:

ItemPartyContactPartyAddress 36120 may have a cardinality of 1:c (Composition relationship to the Dependent Object Address.)

ItemPartyContacPartyAddress (DO)

The dependent object Address contains a document specific address for the item party contact party.

The data is mapped using the dependent object Address.

ItemLocation

An ItemLocation is a place to which and from which goods are delivered/supplied or a service is provided.

ItemLocation occurs in the same specializations (not complete) as for Location.

Structure

Elements

The elements directly attached to the ItemLocation node are defined by the type GDT: CustomerTransactionDocumentItemLocationElements, which is derived from It is type GDT: BusinessTransactionDocumentLocationElements.

The elements of the ItemLocation consist of the elements of the Location node, but they do not refer to the whole business transaction, to the Item.

Inbound aggregation relationships:

Same as for node Location

Associations for Navigation

Same as for node Location

Integrity

Same as for node Location

ItemSalesTerms

ItemSalesTerms are item specific agreements and conditions that apply for selling goods and services in the CustomerTransactionDocumentTemplate document.

Structure

Elements

The elements directly located at the ItemSalesTerms node are defined by the type GDT: CustomerTransactionDocumentSalesTermsElements, which is derived from the It is type GDT: BusinessTransactionDocumentSalesTermsElements.

The elements of the ItemSalesTerms consist (apart from the following exceptions) of the elements of the SalesTerms node, but they do not refer to the whole business transaction, to the Item.

The elements of the ItemSalesTerms are identical to the SalesTerms node, but they do not refer to the whole business transaction, to the Item.

Integrity

ItemSalesTerms are set as defaults from the SalesTerms and can be changed.

The following elements cannot be overwritten on the item: RegionCode, IndustrialSectorCode, IndustryClassificationSystemCode and ProductUsageCode.

ConfirmationFixeIndicator is always set.

ItemTimePointTerms

ItemTimePointTerms is the period related agreement for goods and services that can occur at item level in a CustomerTransactionDocumentTemplate document.

ItemTimePointTerms can occur in the following disjoint specializations (incomplete) with reference to the role of the period (TimePointRoleCode):

FirstReactionDueItemTimePointTerms 36196: The FirstReactionDueItemTimePointTerms is a point in time by which a reaction to a newlyreceived service request or service order is required.

CompletionDueItemTimePointTerms 36199: The CompletionDueItemTimePointTerms is the point in time by which a service request or service order can be fully processed.

CompletionItemTimPointTerms 36198: The CompletionItemTimPointTerms is a point in time, when the item of the CustomerTransactionDocumentTemplate is completed.

Structure

Elements

The elements directly located at the ItemTimePointTerms node are defined by the type GDT: CustomerTransactionDocumentItemTimePointTermsElements, which is derived from the It is type GDT: TimePointElements.

The elements of the ItemTimePointTerms are identical to the TimePointTerms node, but they do not refer to the whole business transaction, to the Item.

ItemPeriodTerms

ItemPeriodTerms is the period related agreement for goods and services that can occur at item level in a CustomerTransactionDocumentTemplate document.

ItemPeriodTerms can occur in the following disjoint specializations (incomplete) with reference to the role of the period (PeriodRoleCode):

RequestedFulfilmentItemPeriodTerms: RequestedFulfilmentItemPeriodTerms is the period in which the delivery of goods or the provision of services is requested.

ActualFulfilmentItemPeriodTerms: ActualFulfilmentItemPeriodTerns is the period in which the provision of services actually occurred.

Structure

Elements

The elements located at the ItemPeriodTerms node are defined by the type GDT: CustomerTransactionDocumentItemPeriodTermsElements, which is derived from It is type GDT: PeriodElements.

The elements of the ItemPeriodTerms are identical to the PeriodTerms node, but they do not refer to the whole business transaction, to the Item.

ItemDurationTerms

ItemDurationTerms is the duration related agreement for goods and services that can occur at item level in a CustomerTransactionDocumentTemplate document.

ItemDurationTerms can occur in the following disjoint specializations (incomplete) with reference to the role of the duration (DurationRoleCode):

MaximumFirstReactionItemDurationTerms: The MaximumFirstReactionItemDurationTerms is a duration by which a reaction to a newly received service request, or a newly received service order has to occur This duration is calculated from the Service Level Objective (SLO), and cannot be changed on the UI.

MaximumCompletionItemDurationTerms 36190: The MaximumCompletionItemDurationTerms is a duration period before the expiration of which a service request, or service order have can been completed.

This duration period is calculated from the Service Level Objective (SLO), and cannot be changed on the UI.

Structure

Elements

The elements directly located on the ItemDurationTerms node are defined by the type GDT: CustomerTransactionDocumentItemDurationTermsElements, which is derived from It is type GDT: DurationElements.

The elements of the ItemDurationTerms are identical to the DurationTerms node, but they do not refer to the whole business transaction, to the Item.

ItemPricingTerms

ItemPricingTerms are the item specific characteristics used for pricing and value dating goods and services in the CustomerTransactionDocumentTemplate document.

Structure

Elements

The elements directly attached to the ItemPricingTerms node are defined by the type GDT: CustomerTransactionDocumentItemPricingTermsElements, which is derived from It is type GDT: BusinessTransactionDocumentPricingTermsElements.

The elements of the ItemPricingTerms consist of the elements of the PricingTerms node, but they do not refer to the whole business transaction, to the item.

Additional elements include:

PriceSpecificationLabourResourceGroupCode is Group of LabourResources, for which the same price specifications are valid.

It is type GDT: PriceSpecificationLabourResourceGroupCode.

Integrity

The currency and the associated elements for currency conversion cannot be changed at item level. The same is true for the calculation procedure.

ItemPricingTerms are set as defaults from the PricingTerms and can be changed.

ItemDeliveryTerms

ItemDeliveryTerms are item specific agreements that apply for the delivery of goods and provision of services in the CustomerTransactionDocumentTemplate document.

Structure

Elements

The elements directly located at the ItemDeliveryTerms node are defined by the type GDT: CustomerTransactionDocumentItemDeliveryTermsElements, which is derived from It is type GDT: BusinessTransactionDocumentDeliveryTermsElements.

The elements of the ItemDeliveryTerms are, other than the following exceptions, the same as those on the DeliveryTerms node, but they refer to the item rather than the whole business transaction.

Additional elements include:

PartialDeliveryMaximumNumberValue is Specifies the maximum number of partial deliveries that can or may be carried out in order to supply the amount of an item ordered.

It is type GDT: NumberValue. and Qualifier: Maximum.

DeliveryItemGroupID is Unique identifier for a DeliveryGroup, into which one or more items are combined for joint delivery.

It is type GDT: BusinessTransactionDocumentItemGroupID.

PickUpIndicator is Specifies whether the item should be collected or not.

It is type GDT: Indicator. and Qualifier: PickUp.

Integrity

ItemDeliveryTerms are set as defaults from the DeliveryTerms and can be changed.

The DeliveryControlCode field values 'full delivery' 'and 'oneoff delivery on required delivery date' result in the PartialDeliveryNumber field being set to the value 1.

The DeliveryControlCode field values 'full delivery' 'and 'oneoff delivery' at document level (header) result in all items being part of a joint delivery group.

The DeliveryControlCode field value 'Complete delivery' and the QuantityTolerances field are mutually exclusive. It is therefore not recommended that quantity tolerances be maintained at the same time complete delivery is set.

With the DeliveryControlCode field value 'partial delivery', you can use the PartialDeliveryNumber attribute to further restrict the number of partial deliveries.

ItemTransportationTerms

ItemTransportationTerms are item specific agreements that apply for the transport of goods to be delivered.

Structure

Elements

The elements directly attached to the ItemTransportationTerms node are defined by the type GDT: CustomerTransactionDocumentTransportationTermsElements, which is derived from It is type GDT: BusinessTransactionDocumentTransportationTermsElements.

The elements of the ItemTransportationTerms are the same as those of the TransportationTerms node, but they refer to the item rather than the whole business transaction.

Integrity

ItemTransportationTerms are set as defaults from the TransportationTerms and can be changed.

ItemInvoiceTerms

ItemInvoiceTerms are the item specific agreements that apply for invoicing goods and services in the CustomerTransactionDocumentTemplate document.

Structure

The elements directly located at the ItemInvoicingTerms node are defined by the type GDT: CustomerTransactionDocumentItemInvoiceTermsElements, which is derived from It is type GDT: BusinessTransactionDocumentInvoiceTermsElements.

With the exception of the following, the elements of the ItemInvoiceTerms are those of the InvoiceTerms node; they refer to the item, however, and not to the entire business transaction.

Additional elements include:

ToBeInvoicedQuantity is Quantity of the product to be invoiced.

It is type GDT: Quantity. and Qualifier: ToBeInvoiced

ToBeInvoicedQuantityTypeCode is Qualifies the type of the to be invoiced quantity It is type GDT: QuantityTypeCode. and Qualifier: ToBe-Invoiced.

Missing elements are:

InvoicingBlockingReasonCode

Integrity

ItemInvoiceTerms are proposed from the InvoiceTerms and can be changed.

ItemTextCollection (DO)

ItemTextCollection is a collection of natural language texts that refer to an item in a CustomerTransactionDocument-Template document.

Structure

See dependent object TextCollection

ItemAttachmentFolder (DO)

An ItemAttachmentContainer is a collection of all the documents attached for the item of the CustomerTransaction-DocumentTemplate document.

Structure

See dependent object AttachmentFolder

ItemCoveredObject

ItemCoveredObject is an object that is covered by the CustomerTransactionDocumentTemplate document item.

A CoveredObject can be either an installation, a material, an individual material, or a service product.

Structure

Elements

The elements located directly at the ItemCoveredObject node are defined by the type GDT: CustomerTransaction-DocumentCoveredObjectElements. These elements are:

The elements of ItemCoveredObject are the same for the CoveredObject node, but they do not refer to the whole business transaction, to the Item.

Composition relationships: None.

Inbound aggregation relationships:

From business object Material/node Root

Material may have a cardinality of c:cn Material that is covered.

From business object ServiceProduct/node Root

ServiceProduct may have a cardinality of c:cn Service-Product that is covered

From business object IndividualMaterial/node Root

IndividualMaterial may have a cardinality of c:cn Individual Material that is covered From business object InstalledBase/node Root InstalledBase may have a cardinality of c:cn InstalledBase that is covered.

ItemCoveredObject is proposed from the CoveredObject and can be changed.

Either a product or an installation can be specified. However, not both at the same time.

ItemReleasableProduct

ItemReleasableProduct is a product (material, service product) that can be released by a subsequent document from the CustomerTransactionDocumentTemplate document item.

The elements located directly at the ItemReleasableProduct node are defined by the type GDT: CustomerTransaction-DocumentItemReleasableProductElements. These elements are:

ProductID is the identifier specified for the product that can be released.

It is type GDT: ProductID.

ProductUUID is The product's unique identifier.

ProductUUID is used as an alternate key for the relationship to Material and ServiceProduct.

It is type GDT: UUID.

ProductTypeCode is Coded representation of the product type that describes the nature and basic properties of products, such as materials or service products.

It is type GDT: ProductTypeCode.

ProductCategoryID is The specified identifier of the product category, the products of which can be released.

It is type GDT: ProductCategoryID.

ProductCategoryUUID is The unique identifier of the product category.

ProductCategoryUUID is used as an alternative key for the relationship to ProductCategory.

It is type GDT: UUID.

Inbound aggregation relationships:

From business object Material/node Root

Material may have a cardinality of c:cn Material that can be released.

From business object ServiceProduct/node Root

ServiceProduct may have a cardinality of c:cn Service-Product that can be released.

From business object IndividualMaterial/node Root

IndividualMaterial may have a cardinality of c:cn Individual Material that can be released.

From business object ProductCategoryHierarchy/node ProducCategory

ProductCategory: may have a cardinality of c:cn Product-Category of the products, which can be released.

Either a product or a product category can be specified.

ItemServiceTerms

ItemServiceTerms are the item specific conditions and agreements that apply for the execution of a service.

The elements located directly at the ItemServiceTerms node are defined by the type GDT: CustomerTransaction-DocumentItemServiceTermsElements. These elements are:

ConfirmationRelevanceIndicator is Indicates whether this item is relevant for confirmation or not.

It is type GDT: ConfirmationRelevanceIndicator.

ServiceWorkingConditionsCode is The working conditions under which a service is to be provided.

It is type GDT: ServiceWorkingConditionsCode.

ServicePlannedDuration is Planned duration of service.

It is type GDT: Duration. and Qualifier: ServicePlanned.

WarrantyID is an identifier for the warranty that is to cover the service. The Warranty is inherited from ServiceTerms and cannot be changed on item level.

It is type GDT: ProductID.

WarrantyUUID is The warranty's unique identifier.

It is type GDT: UUID.

WarrantyValidityPeriod is Period specifying the warranty validity.

It is type GDT: CLOSED_DatePeriod. and Qualifier: Validity/Read

Inbound aggregation relationships:

From business object Warranty/node Root.

Warranty may have a cardinality of c:cn Warranty that covers the service

The Elements WarrantyID, WarrantyUUID and Warranty-ValidityDatePeriod are inherited from node ServiceTerms and are not changeable.

ItemContractTerms

ItemContractTerms are the item specific contract terms between a customer and provider for which an item is entered in a CustomerTransactionDocumentTemplate document.

The elements located directly at the ItemContractTerms node are defined by the type GDT: CustomerTransactionDocumentItemContractTermsElements.

These elements are:

TargetQuantity Quantity of CustomerTransactionDocumentTemplate document item that should be released.

It is type GDT: Quantity and Qualifier: Target.

TargetQuantityTypeCode is Qualifies the type of the target quantity

It is type GDT: QuantityTypeCode. and Qualifier: Target.

TargetAmount Value of CustomerTransactionDocumentTemplate document item that should be released.

It is type GDT: Amount and Qualifier: Target

ItemComplaintTerms

ItemComplaintTerms contain item specific complaint information regarding quantities and control of corrective actions used in a complaint.

The elements that are located directly at the ItemComplaintTerns node are defined by the type GDT: CustomerTransactionDocumentItemComplaintTermsElements. These elements are:

ComplaintQuantity The quantity that the customer is querying in the complaint item.

It is type GDT: Quantity and Qualifier: Complaint

ComplaintQuantityTypeCode is Qualifies the type of the complaint quantity

It is type GDT: QuantityTypeCode and Qualifier: Complaint.

ApprovedQuantity The quantity in the complaint item that will be recognized as justified.

It is type GDT: Quantity. and Qualifier: Approved

ApprovedQuantityTypeCode is Qualifies the type of the approved quantity

It is type GDT: QuantityTypeCode and Qualifier: Approved.

RequestedCorrectiveActionCode Corrective action requested by the customer to restore their satisfaction. It is type GDT: CustomerComplaintCorrectiveActionCode and Qualifier: Requested Composition relationships: None.

ItemConfirmation

ItemConfirmation consists of item specific confirmation information relating to a service provided, or a spare part used.

The elements located directly at the ItemConfirmation node are defined by the type GDT: CustomerTransactionDocumentItemConfirmationElements. These elements are:

ConfirmedDuration is The duration of a service, as confirmed in a confirmation. This is proposed from the product master of the service confirmed, and can be overwritten.

It is type GDT: Quantity. and Qualifier: Confirmed.

ConfirmedServiceWorkingConditionsCode is The working conditions under which a service was provided.

It is type GDT: ServiceWorkingConditionsCode.

WarrantyID is Identifier for the warranty covering a service or a spare part.

The Warranty is inherited from ServiceTerms and cannot be changed on item level.

It is type GDT: ProductID.

WarrantyUUID is The warranty's unique identifier.

WarrantyUUID is used as an alternate key for the relationship to the warranty.

It is type GDT: UUID.

WarrantyValidityPeriod is Period specifying the warranty validity.

It is type GDT: CLOSED_DatePeriod. and Qualifier: Validity/Read

Composition relationships: None.

Inbound aggregation relationships:

Warranty may have a cardinality of c:cn association to Warranty

Inbound Association Relationships: None

Spezialization Associations for Navigation: none available.

The Elements WarrantyID, WarrantyUUID and WarrantyValidityDatePeriod are inherited from node ServiceTerms and are not changeable.

ItemTotalValues

ItemTotalValues are the total values for an item resulting from the Item's dependent nodes. Examples are: the total desired delivery quantity or the confirmed quantity of the ItemScheduleLine, item specific gross and net weight, the volume, the gross and net value and tax amount, or the shipment costs. Quantities, weights, volumes and values are calculated by cumulation, dates by special logic (the first, the last, and so on). The elements located directly at the ItemTotalValues node are defined by the type GDT: CustomerTransactionDocumentItemTotalValuesElements. These elements are:

RequestedQuantity is Total quantity requested of an item in a CustomerTransactionDocumentTemplate item.

It is type GDT: Quantity, and Qualifier: Requested.

RequestedQuantityTypeCode is Qualifies the type of the requested quantity

It is type GDT: QuantityTypeCode. and Qualifier: Requested.

ConfirmedQuantity is Total confirmed quantity of an item in a CustomerTransactionDocumentTemplate.

It is type GDT: Quantity. and Qualifier: Confirmed.

ConfirmedQuantityTypeCode is Qualifies the type of the confirmed quantity

LastConfirmedDateTime is Last confirmed date for an item in a CustomerTransactionDocumentTemplate item.

It is type GDT: LOCALNORMALIZED_DateTime. and Qualifier: LastConfirmed.

GrossWeightMeasure is Total gross weight of the product in an item of a CustomerTransactionDocumentTemplate.

It is type GDT: Date, Qualifier Invoice.

NetWeightMeasure is Total net weight of the product in an item of a CustomerTransactionDocumentTemplate.

It is type GDT: Measure. and Qualifier: NetWeight

VolumeMeasure is Total volume of the product in an item of a CustomerTransactionDocumentTemplate.

It is type GDT: Measure and Qualifier: Volume.

NetAmount is Net amount of a CustomerTransactionDocumentTemplate item.

It is type GDT: Amount. and Qualifier: Net.

NetPrice is The product's net price in relation to a base quantity.

It is type GDT: Price. and Qualifier: Net.

TaxAmount is Tax amount of a CustomerTransactionDocumentTemplate item.

It is type GDT: Amount. and Qualifier: Tax.

FreightChargeAmount is The freight charge for an item in the CustomerTransactionDocumentTemplate.

It is type GDT: Amount. and Qualifier: FreightCharge.

GrossAmount is Gross amount of a CustomerTransactionDocumentTemplate item.

It is type GDT: Amount. and Qualifier: Gross.

NetWithoutFreightChargeAmount is the net value of an item in the CustomerTransactionDocumentTemplate item excluding freight charge.

It is type GDT: Amount. and Qualifier: NetWithoutFreightCharge.

NetWithoutFreightChargePrice is the net price of an item in the CustomerTransactionDocumentTemplate item excluding freight charge.

It is type GDT: Price. and Qualifier: NetWithoutFreightCharge.

Composition Relationships

ItemTotalValuesPricingSubtotal 36166 may have a cardinality of 1:c6

The ItemTotalValues cannot be changed.

ItemTotalValuesPricingSubtotal

TotalValuesPricingSubtotal is the condition subtotal of a specific type in the total value of all items, that result from Pricing.

The condition subtotals are freely defined in configuration for Pricing, and are transferred together with the code from Pricing.

The elements located directly at the node ItemTotalValuesTotalValuesPricingSubtotal are defined by the type GDT: CustomerTransactionDocument-ItemTotalValuePricingSubtotalElements. These elements are:

TypeCode is Coded representation of the subtotal in a price calculation.

It is type GDT: PricingSubtotalTypeCode.

Amount is Value of a condition subtotal.

It is type GDT: Amount.

The ItemTotalValuesPriceSubtotal cannot be changed.

ItemBusinessTransactionDocumentReference

An ItemBusinessTransactionDocumentReference is a unique reference between an item in the CustomerTransactionDocumentTemplate and another business document or another business document item. All references result in the business documents or business document items that are linked directly to the item of the CustomerTransactionDocumentTemplate.

CRUD services are available for the BTDItemReference.

ItemBusinessTransactionDocumentReference occurs in the following incomplete and disjoint specializations:

ItemPurchaseOrderItemReference

ItemCustomerQuoteItemReference

ItemSalesOrderItemReference

ItemOutboundDeliveryItemReference

ItemInboundDeliveryItemReference

ItemCustomerInvoiceItemReference

ItemSalesContractItemReference

ItemServiceContractItemReference

ItemServiceConfirmationItemReference

ItemServiceOrderItemReference

ItemCustomerComplaintItemReference

ItemOpportunityItemReference

The elements directly located at the ItemBusinessTransactionDocumentReference node are defined by the type GDT: CustomerTransactionDocumentReferenceElements, which is derived from It is type GDT: BusinessTransactionDocumentReferenceElements.

It consists of the following elements:

BusinessTransactionDocumentReference The BusinessTransactionDocumentReference contains the unique reference to a different business document or to an item of a different business document.

It is type GDT: BusinessTransactionDocumentReference

BusinessTransactionDocumentRelationshipRoleCode A BusinessTransactionDocumentRelationshipRoleCode is the coded representation of the role that a referenced business document or item of a referenced business document adopts in the reference relationship.

It is type GDT: BusinessTransactionDocumentRelationshipRoleCode

BusinessTransactionDocumentDataProviderIndicator

The BusinessTransactionDocumentDataProviderIndicator specifies whether a business document provides data for the referenced business document or not.

It is type GDT: DataProviderIndicator Qualifier DataProvider

Inbound Association Relationships:

From business object Purchase Order/node Root:

PurchaseOrder may have a cardinality of c:c PurchaseOrder that is referenced through specialisation ItemPurchaseOrderItemReference (Cross DU)

From business object CustomerQuote/node Root:

CustomerQuote may have a cardinality of c:cn CustomerQuote that is referenced through specialisation ItemCustomerQuoteItemReference From business object SalesOrder/node Root:

SalesOrder may have a cardinality of c:cn SalesOrder that is referenced through specialisation ItemSalesOrderItemReference From business object OutboundDelivery/node Root:

OutboundDelivery may have a cardinality of c:cn OutboundDelivery that is referenced through specialisation OutboundDeliveryItem (Cross DU)

From business object InboundDelivery/node Root:

InboundDelivery may have a cardinality of c:cn InboundDelivery that is referenced through specialisation ItemInboundDeliveryItemReference (Cross DU)

From business object CustomerInvoice/node Root:

CustomerInvoice may have a cardinality of c:cn CustomerInvoice that is referenced through specialisation ItemCustomerInvoiceItemReference (Cross DU)

From business object ServiceOrder/node Root:

ServiceOrder may have a cardinality of c:cn ServiceOrder that is referenced through specialisation ItemServiceOrderItemReference From business object ServiceConfirmation/node Root ServiceConfirmation may have a cardinality of c:cn ServiceConfirmation that is referenced through specialisation ItemServiceConfirmationItemReference From business object ServiceContract/node Root ServiceContract may have a cardinality of c:cn Service Contract that is referenced through specialisation ItemServiceContractItemReference From business object CustomerComplaint/node Root CustomerComplaint may have a cardinality of c:cn CustomerComplaint that is referenced through specialisation ItemCustomerComplaintItemReference From business object Opportunity/node Root:

Opportunity may have a cardinality of c:cn Opportunity that is referenced through specialisation ItemOpportunityItemReference Composition Relationships:

ItemBusinessTransactionDocumentReferenceActualValues 36204 may have a cardinality of 1:c The ItemBusinessTransactionDocumentReference contains the CustomerTransactionDocument's direct neighbors.

ItemBusinessTransactionDocumentReferenceActualValues

An ItemBusinessTransactionDocumentReferenceActualValues is data (quantities and values) of a reference of a CustomerTransactionDocumentTemplate document to a different document that is replicated from the referenced document.

QuantityRoleCode A QuantityRoleCode is the coded representation of the role of a quantity.

It is type GDT: QuantityRoleCode

Quantity Quantity is the nonmonetary numeral specification of a quantity in a unit of measure.

It is type GDT: Quantity.

QuantityTypeCode A QuantityTypeCode is the coded representation of the type of a quantity.

It is type GDT: QuantityTypeCode

AmountRoleCode An AmountRoleCode is the coded representation of the role of an amount.

It is type GDT: AmountRoleCode

Amount is An Amount is an amount with the corresponding currency unit.

GDT Amount

TimePointRoleCode The TimePointRoleCode is the coded representation of the role of a time.

It is type GDT: TimePointRoleCode.

TimePoint

TimePoint is a unique time point in a specific time context. The time point defines by means of a time and date value, as well as a time zone.

It is type GDT: TimePoint

The DateTime representation is used.

ItemActualValues

ItemActualValues are the cumulated data (quantities or values) of an item in a CustomerTransactionDocumentTemplate document that is derived from a particular business process or a reference document. The elements that are located directly at the CustomerTransactionDocumentTemplateItemActualValues node are defined by the type GDT: CustomerTransactionDocumentItemActualValuesElements. These elements are:

FulfilledQuantity is Cumulated, fulfilled quantity in an item in a CustomerTransactionDocumentTemplate document. It is used in context of order and returns.

It is type GDT: Quantity. and Qualifier: Fulfilled.

FulfilledQuantityTypeCode is Qualifies the type of the fulfilled quantity

It is type GDT: QuantityTypeCode. and Qualifier: Fulfilled.

AcceptedFulfilledQuantity is Cumulated, accepted fulfilled quantity in an item in a CustomerTransactionDocumentTemplate document. It is used in context of returns.

It is type GDT: Quantity. and Qualifier: Fulfilled.

AcceptedFulfilledQuantityTypeCode is Qualifies the type of the accepted fulfilled quantity It is type GDT: QuantityTypeCode. and Qualifier: Fulfilled.

RejectedFulfilledQuantity is Cumulated, rejected fulfilled quantity in an item in a CustomerTransactionDocumentTemplate document. It is used in context of returns.

It is type GDT: Quantity. and Qualifier: Fulfilled.

RejectedFulfilledQuantityTypeCode is Qualifies the type of the rejected fulfilled quantity It is type GDT: QuantityTypeCode. and Qualifier: Fulfilled.

InvoicedQuantity is Cumulated, invoiced quantity in an item in a SalesOrder document.

It is type GDT: Quantity. and Qualifier: Invoiced.

InvoicedQuantityTypeCode is Qualifies the type of the invoiced quantity

It is type GDT: QuantityTypeCode. and Qualifier: Invoiced.

InvoicedAmount is Cumulated, invoiced amount in an item in a CustomerTransactionDocumentTemplate document.

It is type GDT: Amount and Qualifier: Invoiced.

OrderedQuantity is Cumulated, ordered quantity for an item in a CustomerTransactionDocumentTemplate document. It is used in context of quotes and contracts.

It is type GDT: Quantity. and Qualifier: Accepted.

OrderedQuantityTypeCode is Qualifies the type of the ordered quantity

It is type CDT: QuantityTypeCode. and Qualifier: Ordered.

ItemScheduleLine

An ItemScheduleLine is an agreement regarding when products of an item are requested or provided and in what amount. An ItemScheduleLine can occur (complete) in the following disjoint specializations, based on the ScheduleLineTypeCode:

RequestedItemScheduleLine 36068: (Desired) amount and date (delivery, pick up or provision) requested by customer in context of orders and returns.

ConfirmedItemScheduleLine 36070: (Desired) amount and date (delivery, pick up or provision) confirmed by planning.

FulfilledItemScheduleLine 36066: Fulfiled quantity and date of provided service or used spare part.

PromisedItemScheduleLine 36072: Quantity and Latest delivery date promised by seller.

The elements located directly at the ItemScheduleLine node are defined by the type GDT: CustomerTransactionDocumentItemScheduleLineElements. These elements are:

ID is Unique identifier for an ItemScheduleLine assigned by the seller.

It is type GDT: BusinessTransactionDocumentItemScheduleLineID.

Buyer ID is Unique identifier for an ItemScheduleLine assigned by the buyer.

It is type GDT: BusinessTransactionDocumentItemScheduleLineID.

TypeCode is Coded representation of the type of an ItemScheduleLine such as RequestedScheduleLine.

It is type GDT: BusinessTransactionDocumentItemScheduleLineTypeCode.

Restriction: For ServiceProductItem, BusinessTransactionDocumentItemScheduleLineTypeCode 1

Restriction: For SparePartItem, the BusinessTransactionDocumentItemScheduleLineTypeCodes “1” (Requested), “2” (Confirmed) and “3” (Promised) are allowed.

Restriction: BusinessTransactionDocumentItemScheduleLineTypeCode “4”

(Fulfilled) is allowed.

Quantity is Quantity with reference to TypeCode.

It is type GDT: Quantity.

QuantityTypeCode is Qualifies the type of the quantity

It is type GDT: QuantityTypeCode.

DateTimePeriod is Time period with reference to TypeCode.

It is type GDT: UPPEROPEN_LOCALNORMALISED_DateTimePeriod.

ProductAvailibilityConfirmationCommitmentCode Defines the binding character of the confirmed quantity and delivery period.

It is type GDT: ProductAvailabilityConfirmationCommitmentCode. UUID UUID of scheduling line.

It is type GDT: UUID.

RelatedUUID UUID of the corresponding schedule line that stands in relation to the current schedule line.

It is type GDT: UUID.

RelatedID ID of the corresponding schedule line that stands in relation to the current schedule line.

It is type GDT: BusinessTransactionDocumentScheduleLineID.

Composition Relationships:

ItemScheduleLineFulfilmentPlanningDate may have a cardinality of 1:cn Inbound Aggregation Relationships From business object CustomerTransactionDocumentTemplate/node ItemScheduleLine:

RelatedItemScheduleLine is c..cn Association to the ItemScheduleLine node itself. CustomerTransactionDocumentTemplateItemScheduleLine can be given as schedule line to itself. Relationships exist, for example, it is possible that several confirmed schedule lines exist for a requested schedule line.

Specialization Associations for Navigation:

PositioningItemScheduleLineFulfilmentPlanningPeriod 36074 may have a cardinality of c:c association to an ItemScheduleLineFulfillmentPlanningDate that occurs in the PositioningPeriod specialization.

IssueItemScheduleLineFulfilmentPlanningPeriod 36076 may have a cardinality of c:c association to an ItemScheduleLineFulfillmentPlanningDate that occurs in the IssuePeriod specialization.

The time period for the requested schedule line is proposed from the RequestedFulfilmentPeriod, and can be changed.

In service product items, one RequestedScheduleLine is allowed.

All ItemScheduleLines for an item can use the same unit of measure.

ItemScheduleLineFulfilmentPlanningPeriod 36080

Dates for frontend process steps for delivery of goods or provision of services

An ItemScheduleLineFulfilmentPlanningPeriod can occur (complete) in the following disjoint specializations, based on the PeriodRoleCode:

PositioningItemScheduleLineFulfilmentPlanningPeriod: Period in which goods are staged for packaging and picking.

IssueItemScheduleLineFulfilmentPlanningPeriod: Period in which something is issued.

The elements located directly at the node ItemScheduleLineFulfilmentPlanningDate are defined by the type GDT: CustomerTransactionDocument-ItemScheduleLineFulfilmentPlanningDateElements. These elements are:

PeriodRoleCode is Coded representation of the semantics of an ItemScheduleLineFulfillmentPlanningDateTimePeriod, for example ConfirmedProductAvailabilityDateTimePeriod It is type GDT: PeriodRoleCode, DateTimePeriod is Time period with reference to PeriodRoleCode.

It is type GDT: UPPEROPEN_LOCALNORMALISED_DateTimePeriod.

Message Types and their Signature

Figures 37, 55:
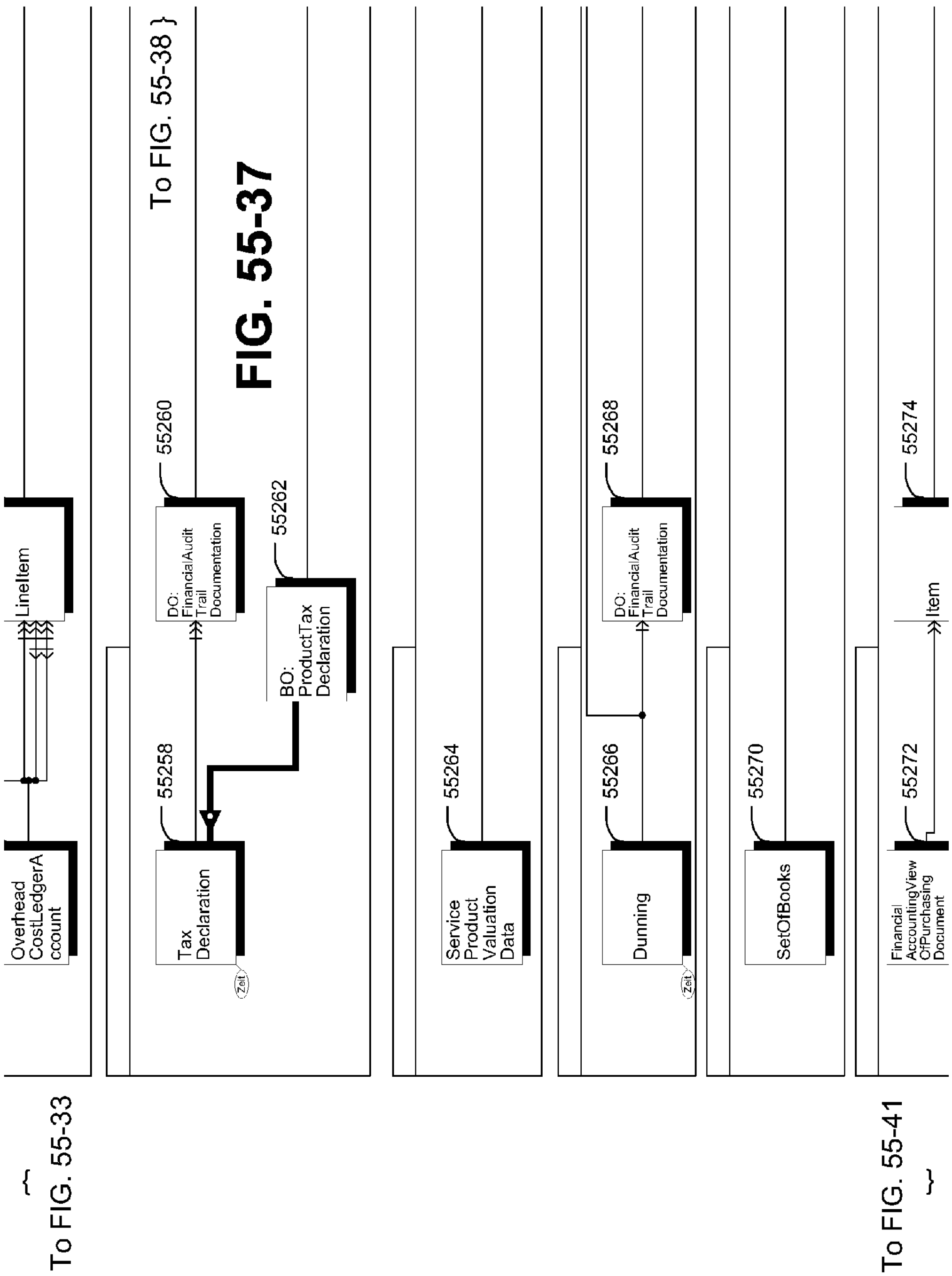

FIG. 37-1 through 37-13 illustrates one example logical configuration of CustomerReturnExecu-tionMessage message 37000. Specifically, this figure depicts the arrangement and hierarchy of various components such as one or more levels of packages, entities, and datatypes, shown here as 37000 through 37344. As described above, packages may be used to represent hierarchy levels. Entities are discrete business elements that are used during a business transaction. Data types are used to type object entities and interfaces with a structure. For example, CustomerReturnExecu-tionMessage message 37000 includes, among other things, CustomerReturn 37014. Accordingly, heterogeneous applications may communicate using this consistent message configured as such.

The following document describes the message type CustomerReturnExecutionRequest which is derived from the operations of the business object CustomerReturn and its signatures. The message type CustomerReturnExecutionRequest is an interface that transmits information from an inbound delivery processing to a customer return processing about goods that have been returned from a customer to a seller. The message data type defines the structure of the message type CustomerReturnExecutionRequest.

Motivating Business Scenario

The message type CustomerReturnExecutionRequest is motivated among others by the business scenarios CustomerReturnsHandling (CRH). After an inbound delivery has been created in the process component InboundDeliveryProcessing (DU LEX) for returned goods of a customer, the elements that are relevant for customer return handling from a sales perspective are transmitted to the process component CustomerReturnProcessing (DU CRM). This enables the customer return processing to create a CustomerReturn, in order to handle pricing, invoicing, and further business related commercial processes.

The Message Type is CustomerReturnExecutionRequest. The message type CustomerReturnExecutionRequest represents the request to a customer return processing, to execute the customer return handling on the seller side. The message type CustomerReturnExecutionRequest is based on the message data type CustomerReturnExecutionMessage. The message type CustomerReturnExecutionRequest is used in the following operations of the service interface Service Interface Request Customer Return Execution In. It is used for the following business transactions:

create, update and cancel of a CustomerReturn.

CustomerReturnExecutionMessage

CustomerReturnExecutionMessage is the message data type CustomerReturnExecutionMessage contains the object CustomerReturn contained in the business document. The business information that is relevant for sending a business document in a message. It contains the packages: MessageHeader Package. and CustomerReturn Package. The message data type CustomerReturnExecutionMessage provides the structure for the message type CustomerReturnExecutionRequest and the interfaces based on it.

MessageHeader Package

A MessageHeader Package groups the business information, which is relevant for sending the business document in a message. It contains the entity MessageHeader. MessageHeader is a grouping of business information from the view of the application and the identification of the business document in a message including information about the sender and the recipient. The MessageHeader is of the type GDT BusinessDocumentMessageHeader.

CustomerReturn Package

The CustomerReturn package groups information that is required for creating, updating or canceling a customer return. It contains the packages Party Package, Location Package, DeliveryInformation Package, Attachment Package, Description Package, Item Package, ProductInformation, Package, Party Package, Location Package, DeliveryInformation Package, ActualValues Package, BusinessTransactionDocumentReference Package, Attachment Package, Description Package, and ScheduleLine Package.

CustomerReturn

A CustomerReturn summarizes details about the execution of the customer return handling on seller side, in order to create, update or cancel a Business Object CustomerReturn. The CustomerReturn consists of CustomerReturnItems, which represent items that are returned by the customer to the seller. A CustomerReturnItem usually consists of information about the quantity of a product that has been returned, as well as the business partners, locations, terms of delivery, actual values. and other business documents to be taken into account when the product is returned, especially the Inbound Delivery that receives the returned goods. CustomerReturn contains the following elements: ActionCode—Coded representation of an instruction to the recipient of a message of type CustomerReturnExecutionRequest telling whether to save or remove the CustomerReturnExecutionRequest. It is type GDT ActionCode.

ItemListCompleteTransmissionIndicator specifies whether all the items in the base business document for the CustomerReturn are to be transmitted (items that are not transmitted are implicitly classed as canceled) or whether new items or items that have been changed since the last transmission are to be transmitted. It is type GDT Indicator with a Qualifier of CompleteTransmission.

ReconciliationPeriodCounterValue is a counter for a reconciliation period. A reconciliation period is the time between two consecutive reconciliation messages in the same sequence context. It is type GDT CounterValue with a Qualifier of ReconciliationPeriod. The integrity requirements may include: In order to ensure a complete data transmission as well a transmission of change data, the value "false" is allowed for the element ItemListCompleteTransmissionIndicator. On exception may be if the value of the element ReconciliationIndicator of the package MessageHeader is "true", a complete data transmission is processed per se. In this specific context situation, the value of the element ItemListCompleteTransmissionIndicator is ignored. The smooth semantic is used for the interpretation of the element ActionCode (04 and 05) since the receiving process components persist the transmitted data of items, which are relevant for return. The element ActionCode follows a default logic. ActionCode "04" (SAVE) is interpreted by the receiving application as a change statement for the items to be transmitted, provided that they have already been transmitted by a previous message. If this is not the case, the transmitted items are created. ActionCode "05" (REMOVE) signalizes to the receiving application that item transmitted previously for a business transaction (and cancelled now) are not relevant for return any more. The element ActionCode follows a default logic: The ActionCode on CustomerReturn-level holds for corresponding ActionCodes on CustomerReturnItem level, for which no values have been transmitted. If no ActionCode has been transmitted on CustomerReturn level, the ActionCode "04" (SAVE) is supposed.

Party Package

The Party package groups business partners that might be involved in a return.

It contains the entities: BuyerParty, SellerParty, ProductRecipientParty, Vendor Party, BillToParty, BillFromParty, PayerParty, and PayeeParty. Default logic is used for all business partners: business partners that are specified at CustomerReturn level are used for all the items for which a corresponding partner is not explicitly transmitted. The default logic applies for the partner as a whole, including the contact person. Parts of a partner cannot be specified in more detail at item level. The default logic is a simplified version of the transmitted message. In terms of logic, partners at CustomerReturn level behave as if they have been explicitly transmitted for all the items of the message.

BuyerParty

BuyerParty is a company or person that purchases or returns goods or services. BuyerParty is of type GDT: BusinessTransactionDocumentParty, where the "InternalID" is used. BuyerParty can also fulfill the functions of the ProductRecipientParty, BillToParty or PayerParty.

SellerParty

A SellerParty is a company or person that sells or receives goods or services as returns. SellerParty is of type GDT: BusinessTransactionDocumentParty, where the "InternalID" is used. SellerParty can also fulfill the functions of Vendor Party, BillFromParty or PayeeParty.

ProductRecipientParty

A ProductRecipientParty is a company or person to whom goods are delivered or for whom services are provided. ProductRecipientParty is of type GDT: BusinessTransactionDocumentParty, where the "InternalID" is used. If no ShipToLocation is explicitly specified, the ProductRecipientParty address is the delivery address. If no ProductRecipientParty is explicitly specified, the BuyerParty acts as ProductRecipientParty.

Vendor Party

A Vendor Party is a company or person that delivers goods or provides services. Vendor Party is of type GDT: BusinessTransactionDocumentParty, where the "InternalID" is used. If no ShipFromLocation is explicitly specified, the Vendor Party address is the ship-from address. If no Vendor Party is explicitly specified, SellerParty is also Vendor Party (A Vendor Party is not the company or person that is solely responsible for transporting the goods).

BillToParty

A BillToParty is a company or person to which the invoice for goods or services is sent. BillToParty is of type GDT: BusinessTransactionDocumentParty, where the "InternalID" is used. If no BillToParty is explicitly specified, the BuyerParty acts as BillToParty.

BillFromParty

A BillFromParty is a company or person that draws up the invoice for goods or services. BillFromParty is of type GDT: BusinessTransactionDocumentParty, where the "InternalID" is used. If no BillFromParty is explicitly specified, the SellerParty acts as BillFromParty.

PayerParty

A PayerParty is a company or person that pays for goods or services. PayerParty is of type GDT: BusinessTransactionDocumentParty, where the "InternalID" is used. If no PayerParty is explicitly specified, the BillToParty acts as PayerParty.

PayeeParty

A PayeeParty is a company or person that receives payment for goods or services. PayeeParty is of type GDT: BusinessTransactionDocumentParty, where the "InternalID" is used. If no PayeeParty is explicitly specified, the BillFromParty acts as PayeeParty.

Location Package

The Location package groups all locations that can occur in a return.

It contains the following entities: ShipToLocation and ShipFromLocation. Default logic is used for all locations: locations that are specified at CustomerReturn level are used for all items for which corresponding locations are not explicitly transmitted. ShipToLocation and ShipFromLocation can be used to provide a detailed description of the flow of goods (between the ship-to location and the ship-from location).

ShipToLocation

A ShipToLocation is the place to which goods are shipped or where services are provided. ShipToLocation is of type GDT: BusinessTransactionDocumentLocation.

ShipFromLocation

A ShipFromLocation is the place from which goods are shipped. ShipFromLocation is of type GDT: BusinessTransactionDocumentLocation.

DeliveryInformation Package

The DeliveryInformation package groups all information for a required delivery in the return. It contains the entity DeliveryTerms. The default logic used for DeliveryTerms is similar to that used for Parties.

DeliveryTerms

DeliveryTerms are the conditions and agreements that are valid for executing the delivery and transporting the ordered goods and for the necessary services and activities. DeliveryTerms are type GDT: DeliveryTerms.

AttachmentFolder Package

An AttachmentFolder package contains the attachment information with respect to the return process. It contains the entity: AttachmentFolder.

AttachmentFolder

The AttachmentFolder contains attached information with respect to the return process. The AttachmentFolder is of type GDT: AttachmentFolder.

TextCollection Package

The TextCollection package groups together all texts with respect to the return process. It contains the entity: TextCollection (GDT: TextCollection).

TextCollection

The TextCollection is a collection of texts with respect to the return process. The TextCollection is of type GDT: TextCollection.

CustomerReturnItem Package

The CustomerReturnItem package groups item information about the returned product. It contains the packages: ProductInformation Package, Party Package, Location Package, DeliveryInformation Package, ActualValues Package, BusinessTransactionDocumentReference Package, Attachment Package, Description Package, and ScheduleLinePackage.

CustomerReturnItem

A CustomerReturnItem summarizes information about a returned item. The CustomerReturnItem typically consists of information about the product that has been returned, as well as business partners, locations, terms of delivery, actual values and the other business documents to be taken into account when the product is settled, especially the inbound delivery that has received the goods. CustomerReturnItem contains the following elements: ActionCode—Coded representation of an instruction to the recipient of a message of type CustomerReturnExecutionRequest telling whether to save or remove the CustomerReturnExecutionRequestItem. It is type GDT: ActionCode. The soft semantic (ActionCodes “04”/“05”) is used for the ActionCode, since the applications receiving the data contain the data subject to return from the transmitted item. ActionCode “04” (SAVE) is interpreted by the receiving statement as a change statement for the item to be transmitted, provided that this has already been transmitted by a previous message. If this is not the case, the transmitted item is created. The ActionCode “05” (REMOVE) signalizes to the receiving application that item transmitted previously for a business transaction (and cancelled now) are not relevant for return any more. Default logic is used for the ActionCode. If values are not transmitted at CustomerReturnItem level, the values from the CustomerReturn level are used. If values were not transmitted at CustomerReturn and CustomerReturnItem level, the relevant elements are NOT set.

ProductInformation Package.

The ProductInformationPackage groups information required for identifying, describing, and classifying a product in a return item. It contains the entity Product. The Product identifies, describes, and classifies a product in a return item. Product is of type GDT: Product.

ActualValues Package

The ActualValues package groups all quantities that occur actual (in opposite to planned or requested) in the return handling cumulated on item level of a CustomerReturn derived from the inbound delivery processing.

ActualValues contains the following elements: FulfilledQuantity—A FulfilledQuantity is the actual returned quantity (“inbound delivered”, “counted”) of the inbound delivery cumulated on item level that fulfils the requested quantity that is announced and requested by the customer who returns the goods (see package ScheduleLine), FulfilledQuantityTypeCode—TypeCode of fulfilled quantity GDT: QuantityTypeCode.

AcceptedFulfilledQuantity—An AcceptedFulfilledQuantity is the accepted part by the inspection of the fulfilled quantity of the inbound delivery and AcceptedFulfilledQuantityTypeCode—TypeCode of accepted fulfilled quantity of GDT: QuantityTypeCode.

BusinessTransactionDocumentReference Package

The BusinessTransactionDocumentReference package groups all references to business documents that could be relevant for treating a CustomerReturnItem. It contains the entities InboundDeliveryItemReference, InboundDeliveryItemReferenceActualValues, SalesOrderItemReference, OutboundDeliveryItemReference, and CustomerInvoiceItemReference. Either the SalesOrderItemReference or OutboundDeliveryItemReference or CustomerInvoiceItemReference can be given, in order to point to the original sale.

InboundDeliveryItemReference

An InboundDeliveryItemReference is the reference to an item within an inbound delivery, that has received the returned goods. InboundDeliveryItemReference is of type GDT: BusinessTransactionDocumentReference. The InboundDeliveryItemReference can be transmitted in the message instance CustomerReturn from the process component InboundDeliveryProcessing to CustomerReturnProcessing.

InboundDeliveryItemReferenceActualValues

An InboundDeliveryItemReferenceActualValues is the quantity that occur actual (in opposite to planned or requested) in the return handling on inbound delivery item level, that has received the returned goods.

An AcceptedFulfilledQuantity is the accepted part by the inspection of the fulfilled quantity of the inbound delivery. InboundDeliveryItemReferenceActualValues contains the following elements: Quantity—Quantity GDT: Quantity, QuantityRoleCode—RoleCode of quantity: An AcceptedFulfilledQuantity is the accepted part by the inspection of the fulfilled quantity of the inbound delivery type GDT: QuantityRoleCode, and QuantityTypeCode—TypeCode of quantity type GDT: QuantityTypeCode.

SalesOrderItemItem Reference

A SalesOrderItemReference is the reference to an item within an order that has treated the original sales. SalesOrderItemReference is of type GDT: BusinessTransactionDocumentReference. SalesOrderItemReference contains the order number assigned by the seller.

OutboundDeliveryItemReference

An OutboundDeliveryItemReference is the reference to an item within a delivery that shipped in context of the original sales. OutboundDeliveryItemReference is of type GDT:

BusinessTransactionDocumentReference. OutboundDeliveryItemReference contains the delivery note number assigned by the seller.

CustomerInvoiceItemReference

A CustomerInvoiceItemReference is the reference to an item within a customer invoice that invoiced in context of the original sales. CustomerInvoiceItemReference is of type GDT: BusinessTransactionDocumentReference. CustomerInvoiceItemReference contains the customer invoice number assigned by the seller.

ScheduleLine Package

The ScheduleLine package keeps the information about quantities that is requested or announced by the customer in the return handling. It contains the entity RequestedScheduleLine. The RequestedScheduleLine keeps the information about the quantity that is requested or announced ("planned", "Delivery quantity") by the customer in the return handling. RequestedScheduleLine contains the following elements: ID, Quantity—Quantity of GDT: Quantity, QuantityTypeCode—TypeCode of quantity and GDT: QuantityTypeCode, DateTimePeriod.

Figures 38, 55:
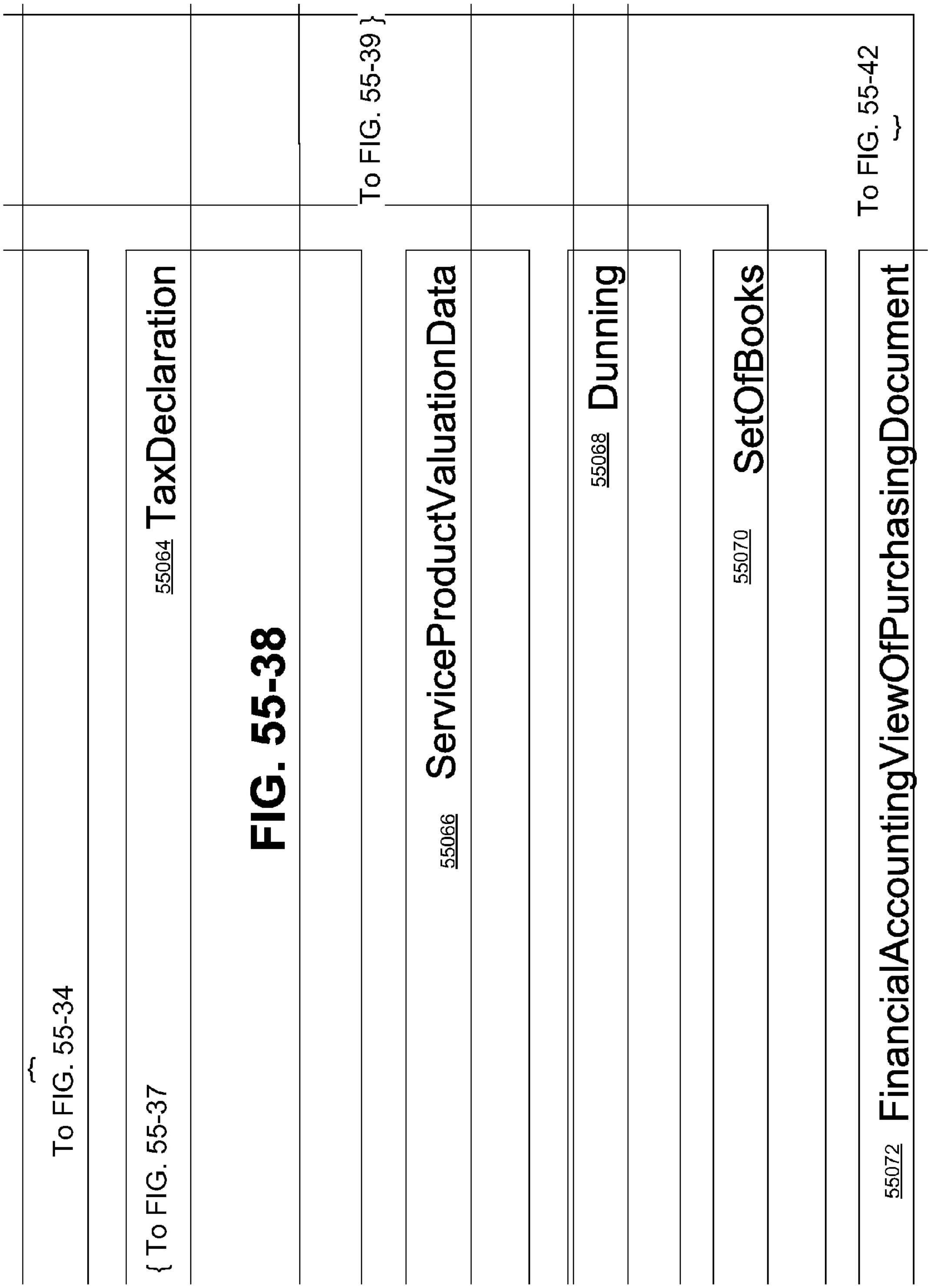

FIG. 38-1 through 38-20 illustrates one example logical configuration of FormPurchaseOrderMessage message 38000. Specifically, this figure depicts the arrangement and hierarchy of various components such as one or more levels of packages, entities, and datatypes, shown here as 38000 through 38548. As de-scribed above, packages may be used to represent hierarchy levels. Entities are discrete business elements that are used during a business transaction. Data types are used to type object entities and interfaces with a structure. For example, FormPurchaseOrderMessage message 38000 includes, among other things, Sale-sOrder 38006. Accordingly, heterogeneous applications may communicate using this consistent message configured as such.

FormPurchaseOrderConfirmation is the message type which is required by the form output used by the seller for confirming a sales order to the buyer. The message data type which determines the structure of the FormPurchaseOrderConfirmation is the FormPurchaseOrderMessage. This section describes the message type FormPurchaseOrderConfirmation and his signatures that are derived from the operations of the busi-ness object SalesOrder.

Motivating Business Scenarios

Fax and mailing are normally used as standard methods for a seller to confirm the sales order to a buyer, especially in ordering process which is not based on electronic communication between procurement system and sales system. For order confirmation based on the fax or mailing, a printing form is used. To provide the order information and printing parameters required for the printing, a form interface is to be defined.

FormPurchaseOrderConfirmation

FormPurchaseOrderConfirmation is a form based order confirmation sent from the seller to the buyer con-cerning the quantities, prices and the delivery conditions of the ordered products. The structure of this mes-sage type is determined by the message data type FormPurchaseOrderMessage.

Conditions

For details of constraints on the structure and integrity conditions of FormPurchaseOrderConfirmation that are imposed by message data type FormPurchaseOrderMessage. The FormPurchaseOrderConfirmation is the message that a seller uses for the form based output of a sales order confirmation to the buyer. This message type is used in the following operations of business objects: SalesOrder, ConfirmSalesOrder. In B2B order scenario, order confirmation is sent based on the B2B Purchase Order Confirmation message. The form based order confirmation is normally not required, or is used as an alternative.

Message Data Type FormPurchaseOrderMessage

The message data type FormPurchaseOrderMessage contains the object Sales Order which is contained in the business document. The business information that is relevant for sending a business document in a message. It contains the packages: MessageHeader package and SalesOrder package. This message data type provides the structure for the following message types and the operations that are based on it: FormPurchaseOrderConfirmation.

SalesOrder Package

The SalesOrderPackage is the grouping of SalesOrder with its packages: Party package, DeliveryInforma-tion package, PaymentInformation package, BusinessTransactionDocumentReference.package, Description package, and Item package. The message data type FormPurchaseOrderMessage is used by the form inter-face PurchaseOrderConfirmation for form based output and thus contains 'read-only' information of the sales order.

SalesOrder

The SalesOrder is an agreement between a seller and a buyer concerning the sale and delivery of products on a specific date, for a specific quantity, and for a specific price. SalesOrder is of the type IDT: FormSale-sOrder. SalesOrder contains the elements: ID—the unique identifier assigned by the seller for the sales order with cardinality: 1:1 GDT: BusinessTransactionDocumentID BuyerID—the unique identifier assigned by the buyer for the purchase order corresponding to the sales order. Cardinality: 0:1

GDT: BusinessTransactionDocumentID Date—the creation date of the sales order by the seller. Cardinality: 0:1 GDT: Date. PrintingDate—the date when the sales order data is given for printing. Cardinality: 0:1 GDT: Date. Name—name of the sales order. Cardinality: 0:1 GDT: Medium_name. LastPromisedDate—Last con-firmed date in the sales order GDT: Date. LastConfirmedDate—Last promised date in the sales order GDT: Date.

SalesOrderParty Package

A Party package groups together the business parties involved in the SalesOrder. It contains the following entities: BuyerParty, SellerParty, ProductRecipientParty, and EmployeeResponsibleParty BuyerParty A BuyerParty is a party that buys products. The BuyerParty is of type IDT: FormBusinessTransactionDocu-mentParty. The sales order items have always the same BuyerParty.

SellerParty

A SellerParty is a party who sells Products. The SellerParty is of type IDT: FormBusinessTransactionDocu-mentParty. The sales order items have always the same SellerParty.

ProductRecipientParty

A ProductRecipientParty is a party to whom products are delivered. The BuyerParty is of type IDT: Form-BusinessTransactionDocumentParty. The ProductRecipientParty is to be used when he is different from the BuyerParty.

EmployeeResponsibleParty

A ResponsibleEmployeeParty is a party (Employee) that is responsible for the sales order processing. The SellerParty is of type IDT: FormBusinessTransactionDocumentParty (without ContactPerson).

SalesOrderDeliveryInformation Package

A DeliveryInformation package groups together the information for a delivery required for a sales order. It contains the entity: DeliveryTerms.

DeliveryTerms

DeliveryTerms are the conditions and agreements that apply when delivering and transporting the ordered goods and providing the necessary services and activities for this. The DeliveryTerms are of type GDT: De-liveryTerms.

SalesOrderPaymentInformation Package

A PaymentInformation package groups together the payment information for the sales order. It contains the following entities: CashDiscountTerms and CashDiscountTerms. CashDiscountTerms are the terms of pay-ment in a sales order process. The CashDiscountTerms are of type GDT: CashDiscountTerms.

SalesOrderPriceInformation Package

A PriceInformation package groups together the price and tax information in a sales order.

It contains the following entity: PriceAndTax. A PriceAndTax is price information including taxes, discounts which are valid for the sales order. The Price is of type IDT: FormPriceAndTax. PriceAndTax contains the elements:

NetAmount—the total net amount in the sales order. Cardinality: 1:1

GDT: Amount

TaxAmount—the total tax amount in the sales order. Cardinality: 0:1

GDT: Amount

GrossAmount—the total gross amount in the sales order. Cardinality: 1:1

GDT: Amount

PriceComponent—price components in the sales order. Cardinality: 0:n

GDT: FormPriceComponent

The NetAmount on the Header level can equal the sum of the NetAmount of all items.

SalesOrderBusinessTransactionDocumentReference Package

A BusinessTransactionDocumentReference package groups together the references to business documents that are linked directly to the SalesOrder. It contains the following entities: CustomerQuoteReference and PurchaseOrderReference.

CustomerQuoteReference

A CustomerQuoteReference is a reference to a customer quote from which the sales order is derived. The QuoteReference is of type GDT: BusinessTransactionDocumentReference.

PurchaseOrderReference

A PurchaseOrderReference is a reference to a purchase order from which the sales order is derived.

The PurchaseOrderReference is of type GDT: BusinessTransactionDocumentReference.

SalesOrderDescription Package

A Description package groups together texts regarding the sales order. It contains a TextCollection entity. TextCollection is a collection of natural-language text that refers to the sales order. The TextCollection is of type GDT: TextCollection. The TextCollection is used here for seller texts, as textual information of the seller for the buyer.

SalesOrderItem Package

A SalesOrderItem package groups together the SalesOrderItem with its packages. It contains the packages: ProductInformation package, PriceInformation package, Party package, DeliveryInformation package, BusinessTransactionDocumentReference package, and Description package.

SalesOrderItem

A SalesOrderItem is an item that describes the agreement between a seller and a buyer regarding the sale and delivery of a product at a certain time, for a certain quantity and at a certain price. The SalesOrderItem contains detailed information about the ordered product (see ProductInformation package) and its price (see PriceInformation package). In the SalesOrderItem, item special information which deviates from the informa-tion of the SalesOrder header is defined in the corresponding packages (see Party package, PriceInforma-tion package, DeliveryInformation package). The SalesOrderItem can contain references to other business documents that are relevant for the item (see BusinessTransactionDocumentReference package). Item spe-cial texts can also be specified for the item (see Description package).

The SalesOrderItem is of type IDT: FormSalesOrderItem. The SalesOrderItem contains the following ele-ments: ID—the unique identifier assigned by the seller for the sales order item. Cardinality: 1:1

GDT: BusinessTransactionDocumentItemID and Quantity-total confirmed quantity of an item. Cardinality: 0:1 GDT: Quantity.

SalesOrderItemProductInformation.package

A ProductInformation package groups together all the information for identifying, describing, and classifying a product in a sales order process. It contains the Product entity. A Product contains the details for identifica-tion of the product in the SalesOrder item. The Product is of type IDT: FormBusinessTransactionDocument-Product. The SellerID and BuyerID of the Product are used.

SalesOrderItemPriceInformation Package

A PriceInformation package groups together all the price information in a sales order item. It contains the following entity: PriceAndTax. The PriceAndTax is price information including taxes, discounts which are valid for the sales order item. The Price is of type IDT: FormItemPriceAndTax. PriceAndTax contains the elements:

NetAmount—the total net amount in the sales order item. Cardinality: 1:1

GDT: Amount

TaxAmount—the total tax amount in the sales order item. Cardinality: 0:1

GDT: Amount

GrossAmount—the total gross amount in the sales order item. Cardinality: 1:1

GDT: Amount

PriceComponent—price components in the sales order item. Cardinality: 0:n

GDT: FormPriceComponent

SalesOrderItemParty Package

A SalesOrderItemParty Package package groups together the business parties in the SalesOrder Item which can deviate from the parties in the SalesOrder header. It contains the following entity:

ProductRecipientParty. The ProductRecipientParty is generally to be used when he is different from the Pro-ductRecipientParty on header level.

SalesOrderItemBusinessTransactionDocumentReference Package

A BusinessTransactionDocumentReference package groups together all the references to business docu-ments that are linked directly to the SalesOrderItem. It contains the following entities:

CustomerQuoteReference and PurchaseOrderReference. CustomerQuoteReference is a reference to a customer quote or a customer quote item from which the sales order item is derived. The QuoteReference is of type GDT: BusinessTransactionDocumentReference. PurchaseOrderReference is a reference to a pur-chase order from which the sales order item is derived. The PurchaseOrderReference is of type GDT: Busi-nessTransactionDocumentReference.

SalesOrderItemDescription Package

A Description package groups together all the texts regarding the sales order item. It contains the following entities: TextCollection and Description. Description is a natural-language text regarding a sales order item, which is visible to business parties. The Description is of type GDT: Description. TextCollection is a collec-tion of natural-language text that refers to the sales order item. The TextCollection is of type GDT: TextCol-lection. The TextCollection is used here for seller texts, as textual information of the seller for the buyer.

A List of Data Types Used (GDTs) includes Amount, BusinessDocumentMessageHeader, BusinessDocu-mentMessageHeaderParty, BusinessDocumentMessageID, BusinessTransactionDocumentID, Business-TransactionDocumentItemID, BusinessTransactionDocumentReference, CashDiscount, CashDiscountTerms, ContactPersonPartyID, Date, DatePeriod, Description, FormattedAddress, FormBusinessTransactionDocu-mentParty, FormBusinessTransactionDocumentProduct, FormDeliveryTerms, FormIncoterms, FormPriceAndTax, FormItemPriceAndTax, FormPriceComponent, FormSalesOrder, Form-SalesOrderItem, FormSalesOrderMessage, PartyPartyID, PaymentFormCode, Percent, Price, Product-PartyID, Quantity, and TextCollection.

Message Types and their Signatures

Figures 39, 55:
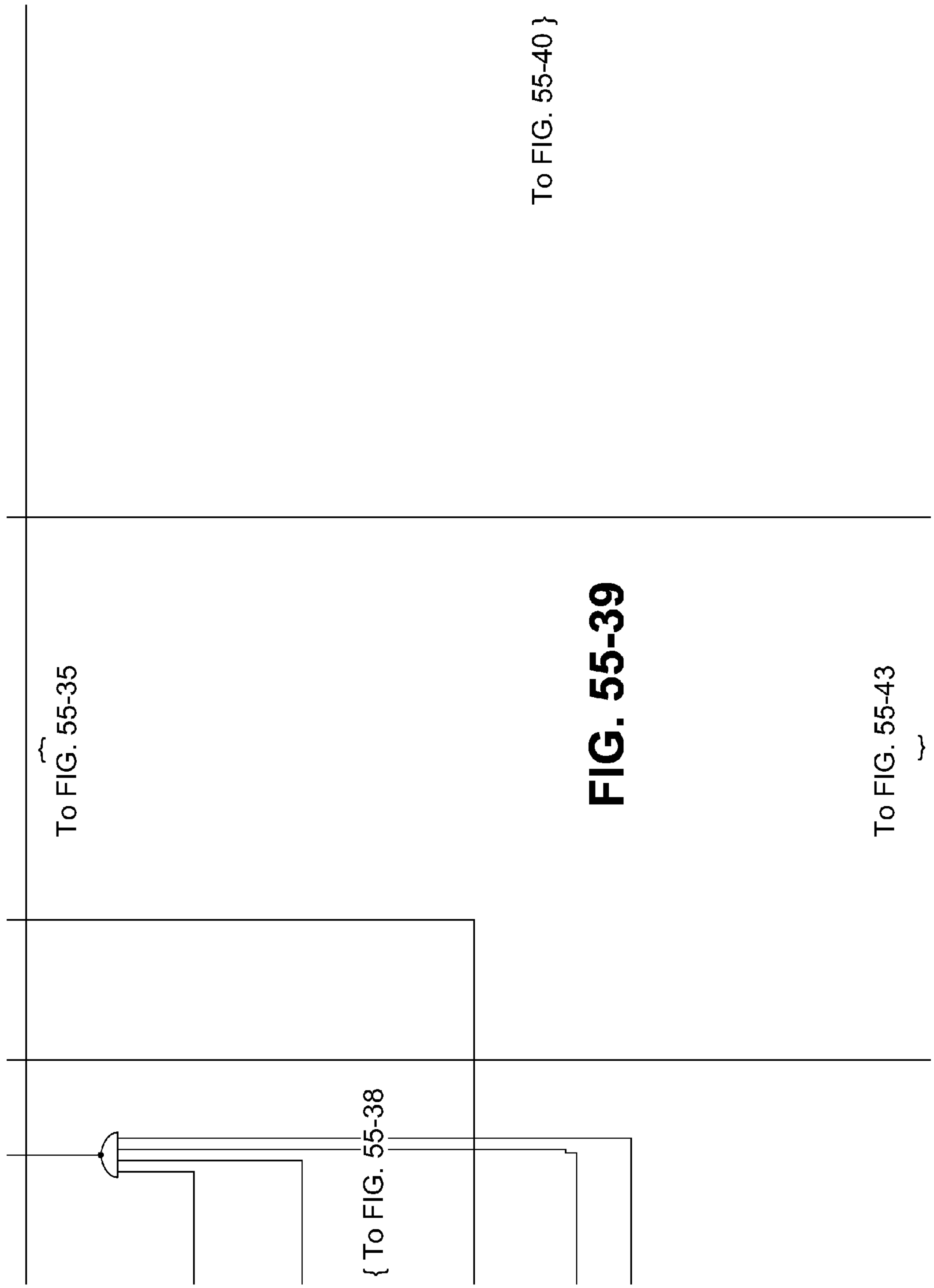

FIG. 39-1 through 39-16 illustrates one example logical configuration of FormQuoteMessage 39000. Specifically, this figure depicts the arrangement and hierarchy of various components such as one or more levels of packages, entities, and datatypes, shown here as 39000 through 39478. As described above, pack-ages may be used to represent hierarchy levels. Entities are discrete business elements that are used during a business transaction. Data types are used to type object entities and interfaces with a structure. For ex-ample, FormQuoteMessage message 39000 includes, among other things, Customer-Quote 39006. Accordingly, heterogeneous applications may communicate using this consistent message configured as such.

FormQuoteNotification is the message type which is required by the form output used by the seller for con-firming a sales order to the buyer. The message data type which determines the structure of the FormQuoteNotification is the FormQuoteNotificationMessage.

This section describes the message type FormQuoteNotification and his signatures that are derived from the operations of the business object CustomerQuote.

Motivating Business Scenarios

Fax and mailing are normally used as standard methods, for a seller to confirm the sales order to a buyer, especially in ordering process which is not based on electronic communication between procurement system and sales system.

For order confirmation based on the fax or mailing, a printing form is used. To provide the order information and printing parameters required for the printing, a form interface is to be defined.

FormQuoteNotification

A FormQuoteNotification is a form based order confirmation sent from the seller to the buyer concerning the quantities, prices and the delivery conditions of the quoted products. The structure of this message type is determined by the message data type FormQuoteMessage. The FormQuoteNotification is the message that a seller uses for the form based output of a sales order confirmation to the buyer. This message type is used in the following operations of business objects: CustomerQuote and NotifyOfCustomerQuote. In B2B order scenario, order confirmation is sent based on the B2B Purchase Order Confirmation message. The form based order confirmation is normally not required, or only be used as an alternative.

Message Data Type FormQuoteNotificationMessage

The message data type FormQuoteNotificationMessage contains the object Customer Quote which is con-tained in the business document and the business information that is relevant for sending a business docu-ment in a message. This message data type provides the structure for the following message types and the operations that are based on it FormQuoteNotification.

CustomerQuote Package

The grouping of CustomerQuote with its packages: Party package, DeliveryInformation package, PaymentIn-formation package, Description package, and Item package.

Message Data Type

The message data type FormCustomerQuoteMessage is used by the form interface CustomerQuoteNotifica-tion for form based output and thus contains only 'read-only' information of the sales order.

CustomerQuote

CustomerQuote is an offer by a seller to a customer for the delivery of products according to fixed terms. The offer is legally binding for the seller for a specific period of time. Within this validity period, the customer can issue a SalesOrder on the basis of the CustomerQuote, at the agreed prices, for the agreed quantities, and at the agreed time. CustomerQuote is of the type IDT: FormQuote. CustomerQuote contains the elements:

ID—the unique identifier assigned by the seller for the sales order. Cardinality: 1:1

GDT: BusinessTransactionDocumentID BuyerID—the unique identifier assigned by the buyer for the purchase order corresponding to the sales order. Cardinality: 0:1

GDT: BusinessTransactionDocumentID

Date—the creation date of the sales order by the seller. Cardinality: 0:1

GDT: Date.

PrintingDate—the date when the sales order data is given for printing. Cardinality: 0:1

GDT: Date.

Name—name of the sales order. Cardinality: 0:1

GDT: Medium_name.

LastPromisedDate—Last confirmed date in the sales order

GDT: Date.

LastConfirmedDate—Last promised date in the sales order

GDT: Date.

ValidityDatePeriod—Date period during which the Customer Quote is valid

GDT: DatePeriod.

CustomerQuoteParty Package

Party Package

A Party package groups together all the business parties involved in the CustomerQuote. It contains the following entities: BuyerParty, SellerParty, ProductRecipientParty, and EmployeeResponsibleParty. The BuyerParty is a party that buys products. The BuyerParty is of type IDT: FormBusinessTransactionDocu-mentParty. The sales order items have always the same BuyerParty. The SellerParty is a party who sells Products. The SellerParty is of type IDT: FormBusinessTransactionDocumentParty. The sales order items have always the same SellerParty. The ProductRecipientParty is a party to whom products are delivered. The BuyerParty is of type IDT: FormBusinessTransactionDocumentParty. The ProductRecipientParty is only to be used when he is different from the BuyerParty. The EmployeeResponsibleParty is a party (Employee) that is responsible for the sales order processing. The SellerParty is of type IDT: FormBusinessTransaction-DocumentParty (without ContactPerson).

CustomerQuoteDeliveryInformation Package

A DeliveryInformation package groups together all the information for a delivery required for a sales order. It contains the entity: DeliveryTerms. DeliveryTerms, DeliveryTerms are the conditions and agreements that apply when delivering and transporting the quoted goods and providing the necessary services and activities for this. The DeliveryTerms are of type GDT: DeliveryTerms.

CustomerQuotePaymentInformation Package

A PaymentInformation package groups together all the payment information for the sales order. It contains the following entities: CashDiscountTerms. CashDiscountTerms are the terms of payment in a sales order process. The CashDiscountTerms are of type GDT: CashDiscountTerms.

CustomerQuotePriceInformation Package

A PriceInformation package groups together all the price information in a sales order. It contains the following entity: PriceAndTax. The PriceAnd Tax is a PriceAndTax is price information including taxes, discounts which are valid for the sales order. The Price is of type IDT: FormPriceAndTax. PriceAndTax contains the elements: NetAmount—the total net amount in the customer quote. Cardinality: 1:1 GDT: Amount. The Tax-Amount—the total tax amount in the customer quote with Cardinality: 0:1 GDT: Amount GrossAmount—the total gross amount in the customer quote. Cardinality: 1:1

GDT: Amount

PriceComponent—price components in the customer quote. Cardinality: 0:n

GDT: FormPriceComponent

The NetAmount on the Header level is generally equal to the sum of the NetAmount of all items.

CustomerQuoteDescription Package

A Description package groups together all the texts regarding the sales order. It contains the following enti-ties: TextCollection. TextCollection is a collection of natural-language text that refers to the sales order. The TextCollection is of type GDT: TextCollection. The TextCollection is used here for seller texts, as textual information of the seller for the buyer.

CustomerQuoteItem Package

A CustomerQuoteItem package groups together the CustomerQuoteItem with its packages. It contains the packages: ProductInformation package, PriceInformation package, Party package, DeliveryInformation package, Description package, and CustomerQuoteItem.

The CustomerQuoteItem contains detailed information about the quoted product (see ProductInformation package) and its price (see PriceInformation package). In the CustomerQuoteItem, item special information which deviates from the information of the CustomerQuote header is defined in the corresponding packages (see Party package, PriceInformation package, DeliveryInformation package). Item special texts can also be specified for the item (see Description package). The CustomerQuoteItem is of type IDT: FormCustomerQuoteItem. The CustomerQuoteItem contains the following elements:

ID—the unique identifier assigned by the seller for the sales order item. Cardinality: 1:1

GDT: BusinessTransactionDocumentItemID

Quantity—total confirmed quantity of an item. Cardinality: 0:1

GDT: Quantity

SalesOrderItemProductInformation.package

A ProductInformation package groups together all the information for identifying, describing, and classifying a product in a sales order process. It contains the Product entity. A Product contains the details for identifica-tion of the product in the CustomerQuote item. The Product is of type IDT: FormBusinessTransactionDocu-mentProduct. The SellerID and BuyerID of the Product are used.

CustomerQuoteItemPriceInformation Package

A PriceInformation package groups together all the price information in a CustomerQuote item.

It contains the following entity: PriceAndTax. The PriceAndTax is price information including taxes, dis-counts which are valid for the customer quote item. The Price is of type IDT:

FormItemPriceAndTax

PriceAndTax contains the elements:

NetAmount—the total net amount in the customer quote item. Cardinality: 1:1

GDT: Amount

TaxAmount—the total tax amount in the customer quote item. Cardinality: 0:1

GDT: Amount

GrossAmount—the total gross amount in the customer quote item. Cardinality: 1:1

GDT: Amount

PriceComponent—price components in the customer quote item. Cardinality: 0:n

GDT: FormPriceComponent

CustomerQuoteItemParty Package

A Party package groups together only the business parties in the CustomerQuote Item which can deviate from the parties in the CustomerQuote header. It contains the following entities: ProductRecipientParty.

The ProductRecipientParty is only to be used when he is different from the ProductRecipientParty on header level.

CustomerQuoteItemDescription Package

A Description package groups together all the texts regarding the sales order item. It contains the following entities: Description and TextCollection. A Description is a natural-language text regarding a sales order item, which is visible to business parties. The Description is of type GDT: Description. TextCollection is a collection of natural-language text that refers to the sales order item. The TextCollection is of type GDT: TextCollection. The TextCollection is used here only for seller texts, as textual information of the seller for the buyer.

A List of Data Types Used (GDTs) includes: Amount, BusinessDocumentMessageHeader, BusinessDocu-ment-MessageHeaderParty, BusinessDocumentMessageID, BusinessTransactionDocumentID, Business-TransactionDocu-mentItemID, BusinessTransactionDocumentReference, CashDiscount, CashDiscountTerms, ContactPersonPartyID, Date, DatePeriod, Description, FormattedAddress, FormBusinessTransactionDocu-ment-Party, FormBusinessTransactionDocumentProduct, Form-DeliveryTerms, FormIncoterms, Form-PriceAndTax, FormItemPriceAndTax, FormPriceComponent, FormCustomerQuote, Form Customer-QuoteItem, Form-CustomerQuoteMessage, PartyPartyID, PaymentFormCode, Percent, Price, Product-PartyID, Quantity, and TextCollection.

Message Types and their Signatures

FIG. 40-1 through 40-21 illustrates one example logical configuration of FormServiceRequestMessage message 40000. Specifically, this figure depicts the arrangement and hierarchy of various components such as one or more levels of packages, entities, and datatypes, shown here as 40000 through 40554. As de-scribed above, packages may be used to represent hierarchy levels. Entities are discrete business elements that are used during a business transaction. Data types are used to type object entities and interfaces with a structure. For example, FormServiceRequestMessage message 40000 includes, among other things, Ser-viceRequest 40008. Accordingly, heterogeneous applications may communicate using this consistent mes-sage configured as such.

Figures 41, 55:
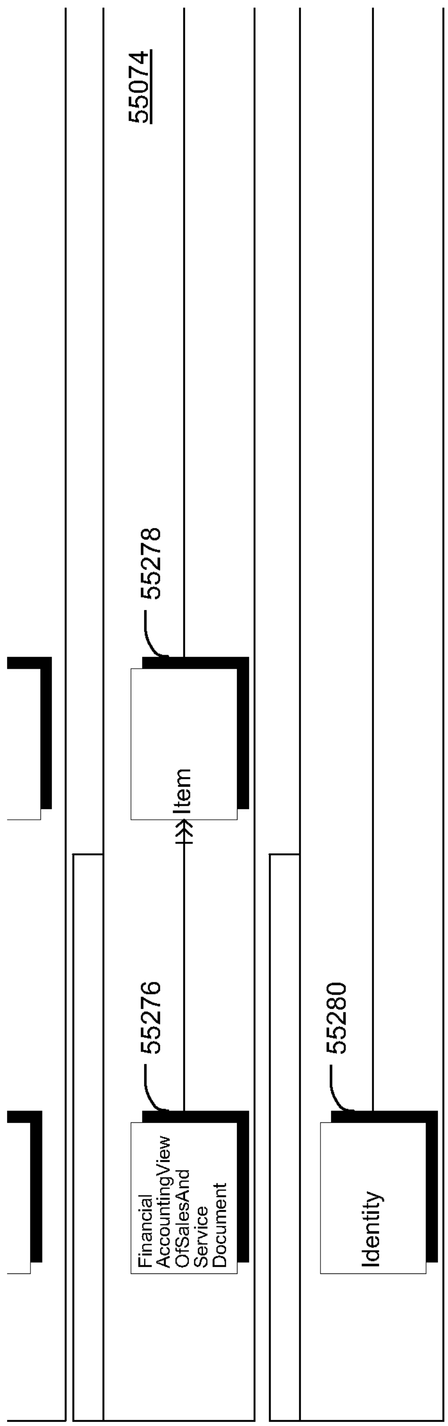
Figures 42, 55:
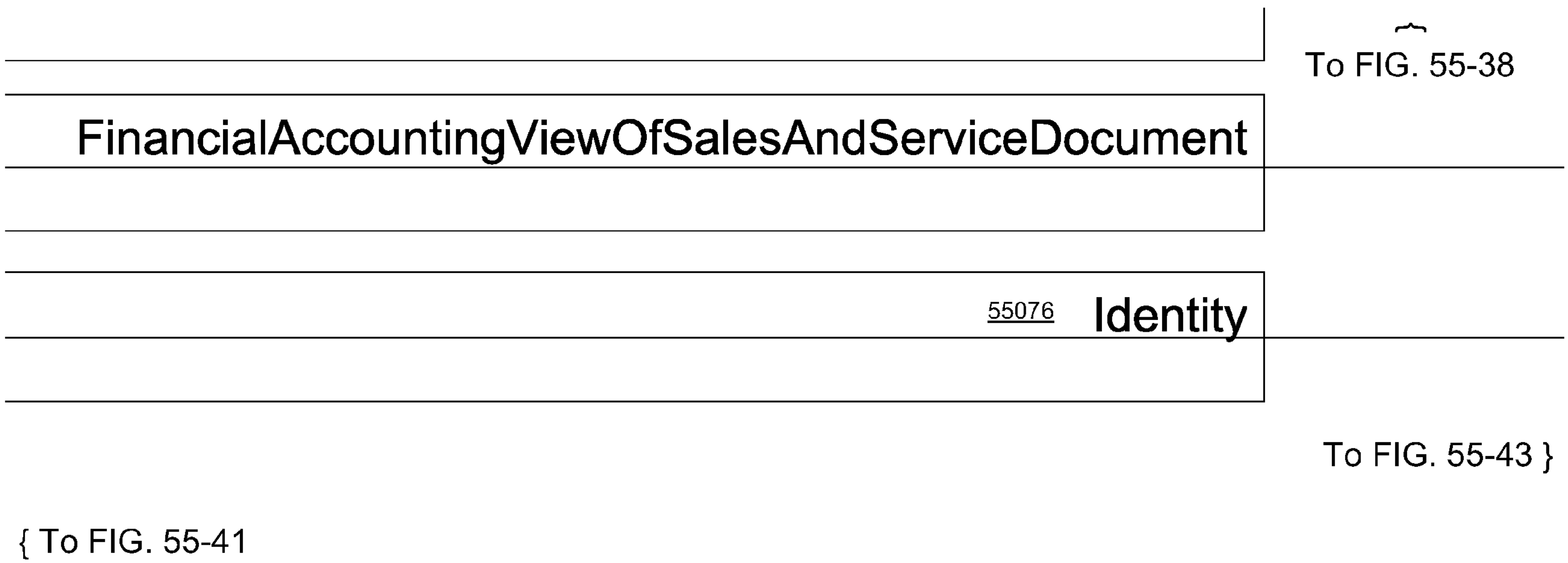
Figures 43, 55:
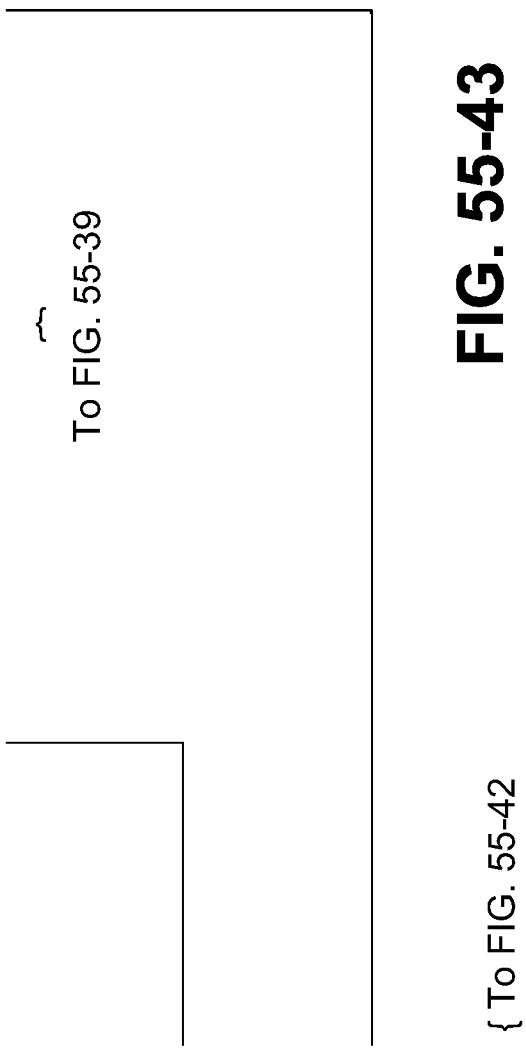

FIG. 41-1 through 41-12 illustrates one example logical configuration of ServiceRequestMessage mes-sage 41000. Specifically, this figure depicts the arrangement and hierarchy of various components such as one or more levels of packages, entities, and datatypes, shown here as 41000 through 41392. As described above, packages may be used to represent hierarchy levels. Entities are discrete business elements that are used during a business transaction. Data types are used to type object entities and interfaces with a struc-ture. For example, ServiceRequestMessage message 41000 includes, among other things, ServiceRequest 41090. Accordingly, heterogeneous applications may communicate using this consistent message configured as such.

Message Types and their Signatures

ServiceRequest messages are the messages used to exchange incidents and solutions between different service desk organizations in a B2B service desk process.

Motivating Business Scenarios

In the classic service desk process, the user contacts the service desk using telephone, fax or e-mail. Often, the information provided at first contact is not sufficient to solve the problem. During the processing of the problem, it often turns out that they can not be solved within the organization that received the incident in the first place. In the classic scenario this means, that other organizations, often outside the company, have to be contacted, and the problem description, service level agreements etc. have to be re-entered manually. In this scenario it is difficult to track the status and relationship of the various providers that are involved in the solving of the problem. By electronic communication between the requestor and provider of a service in a multi-leveled hierarchy these inefficiencies can be addressed successfully.

Message Type(s)

A total of 3 message types exist for mapping a cascaded service desk process:

The message type ServiceRequest is sent from requestor to the provider, and is used to start the incident management process in the provider's service desk system. Changes from the requester (e.g. cancellation, additional information) to the provider will also be transferred with this message type.

The message type ServiceRequestConfirmation is sent from the provider to the requester, and is used to confirm the creation of the message. Changes by the provider will also be transferred to the requester using this message type, including providing the solutions.

These two message types are based on one structure: the message data types ServiceRequestMessage. The parts of the structure, which are used by the message, differ depending on the message. Within the de-scription of the Messages, it is described which part of the structure is used within which message type.

ServiceRequest

A ServiceRequest is a message from the requestor to the provider, where he requests a service or notifies it about an incident. It is also used to transport changes. This can occur both starting from any application sys-tem (not necessarily a service desk system), or—within a distributed multilevel service desk scenario—from a remote service desk system. In each of the cases, the direction of the request is always from the request to the provider. The structure of this message type is determined by the message data type ServiceRequest-Message. Constraints on the structure and integrity of ServiceRequest that are imposed by message data type ServiceRequest-Message. The ServiceRequest is the message by which a service requestor or service desk can create or synchronize a service request within another service desk application. A service request in the remote (providers) system can also be closed or re-called, by sending a corresponding status from the requestor (BuyerParty) to the provider (SellerParty).

ServiceRequestConfirmation

With the ServiceRequestConfirmation the receiving system confirms the receipt and acceptance or rejection of the service request. Also it informs the requestor about the progress of the request processing. as well as the resolution to the request can be sent from the provider to the requester.

Structure

The structure of the message type ServiceRequestConfirmation is specified by the message data type Ser-viceRequestMessage. For details of constraints on the structure and integrity of ServiceRe-questConfirmation that are imposed by message data type ServiceRequestMessage. A ServiceRequestCon-firmation is the message, by which the successful creation or change of a service request is confirmed to the requester. At the same time the requestor receives the necessary information which are resulting from the creation, such as the ExternalServiceProviderID the unique number under which the service request has been created.

FormServiceRequestConfirmation

A FormServiceRequestConfirmation is a confirmation to the requester including a solution proposal for the requesters issue. It is used for form based output. The structure of this message type is determined by the message data type Form-ServiceRequestMessage. For details of constraints on the structure and integrity conditions of FormServiceRequest-Confirmation that are imposed by message data type Form-ServiceRe-questMessage, refer to the relevant subsection. The FormServiceRequestConfirmation is used for form based output. This message type is used in the following operations of business objects: ServiceRequest and Confirm Service Request.

Message Data Type ServiceRequestMessage

The message data type ServiceRequestMessage contains the ServiceRequest Object included in the busi-ness document and the business information that is relevant for sending a business document in a message.

It contains the packages: MessageHeader package and ServiceRequest package. This message data type, therefore, provides the structure for the following message types and the operations that are based on them:

ServiceRequest and ServiceRequestConformation.

MessageHeader Package

Package refers to a grouping of business information that is relevant for sending a business document in a message. It contains the entity: MessageHeader. MessageHeader is a grouping of business information from the perspective of the sending application: information to identify the business document in a message, information about the sender, and information about the recipient (optional)

The MessageHeader contains: SenderParty and RecipientParty. It is of the type GDT: BusinessDocument-Message-Header, and the following elements of the GDT are used: ID, ReferenceID, CreationDateTime, SenderParty, RecipientParty. MessageID is set by the sending application. ReferenceID is used to put the reference to the previous document in the actual one. MessageHeader information is not being mapped to the business object, but saved in PIP using the PIP methods.

SenderParty

The SenderParty is the Party, which is responsible for sending a business document at business application level. SenderParty can be filled by the sending application in order to define the contact person in the case of problems with the message at the sending side. This is especially helpful, if an additional infrastructure (e.g. Marketplace) between Sender and Receiver exists. The SenderParty is of the type GDT: BusinessDocumentMessageHeaderParty, and the following elements of the GDT are used: InternalID, StandardID, and ContactPerson. The InternalID may be used for internal identification. The StandardID may be used for Standard Identification.

RecipientParty

The RecipientParty is the Party, which is responsible for receiving a business document at business applica-tion level. RecipientParty can be filled by the sending application in order to define the contact person in the case of problems with the message at the receiving side. This is especially helpful, if an additional infrastruc-ture (e.g. Marketplace) between Sender and Receiver exists. The RecipientParty is of the type GDT: BusinessDocumentMessageHeaderParty, and the following elements of the GDT are used: InternalID, StandardID, and ContactPerson.

ServiceRequest Package

The ServiceRequest package groups the ServiceRequest object with its packages. It contains the pack-ages: Party, TextCollection, Attachment, SolutionProposal, and ServiceReferenceObject. The ServiceRe-quest contains detailed information about the issue of a customer or a defect of a machine. In addition to the description of the issue, a ServiceRequest contains the parties involved in this request. Furthermore the product for which the request has been made can be specified. Besides the information of the issue, the ServiceRequest can have Solutions attached, which are proposed in order to resolve the issue. ServiceRequest contains the elements: ID—the ID is the unique identifier of the service request. It is assigned by the sending system.

(GDT: BusinessTransactionDocumentID).

SellerID—Identification of the Service Request, given by the ExternalServiceProvider Party.

(GDT: BusinessTransactionDocumentID)

ServicePriorityCode—Priority of the Service Request (GDT: BusinessTransactionPriorityCode)

PriorityCode is used in both type of messages, as in ServiceRequest (priority set by a ServiceRequestor) as in ServiceRequestConfirmation (if a priority has been changed by a ServiceRequest Processor). ServiceRe-quest can be retrieved from the node ServiceTerms.ServicePriorityCode ActionCode (GDT: ActionCode)—is a coded representation of an instruction to the message recipient telling it how to process the transmitted element. In Service Request Processing we use only 2 action codes: 01—Create and 02—Change SolutionStatusCode—Coded representation of the service request solution status in the system. (Possible solution statuses are:

Unassigned—solution status undefined

Solution proposed, —a solution for a problem was proposed

Solution accepted—proposed solution was accepted by a customer

Solution rejected—proposed solution was rejected by a customer (GDT: ServiceRequestSolutionStatusCode)

FinishIndicator—

Indicates a request for closure when used in a ServiceRequest message.

When used in a confirmation, is used for notifying the requester that the IncidentProcessing is finished.

0—no closure request

1—closure request/closure notification

RequestAssignmentStatusCode—Contains the information where the request is currently assigned to in the sender's system (possible values from the S&AM schema are: Provider Action, Requestor Action, Processor Action, Not assigned.

BuyerDateTime—the BuyerDateTime is the posting date/time, given by the buyer, of service request in the sending system. (GDT: GLOBAL_DateTime)

Name—Title of the service request.

(GDT: Name)

Service request contains the information about:

all the business parties involved in the service request. —for details see Party package long text of the service request—for details see TextCollection package Incident Context and Attachments—for details see AttachmentFolders package Solution proposed—for details see SolutionProposal package ServiceReferenceObjects—see ServiceReferenceObjects package (NOT IN BASE SCOPE)

Constraints:

The ID is not generally changed once a service request has been created.

The BuyerDateTime is not generally changed once a service request has been created.

Party Package

A Party package groups together all the business parties involved in the service request.

It contains the entities BuyerParty, ProductRecipientParty, and ExternalServiceProviderParty.

BuyerParty

A buyer party is a party that requests service from a service provider. The BuyerParty is of type GDT: Busi-nessTransactionDocumentParty, used in both types of messages, as in ServiceRequest as in ServiceRe-questConfirmation.

BuyerParty contains the following elements:

InternalID—internal identifier for business party.

(GDT: PartyInternalID).

StandardID—standard identifier for a business party, assigned by DUNS.

(GDT: PartyStandardID)

ExternalServiceProviderID—identifier for a ExternalServiceProvider party (GDT: PartyPartyID).

Address—address of the Service Requestor (GDT: Address)

ContactPerson—Buyer contact person (GDT: ContactPerson)

Constraints (Regarding the Message Data Type)

The BuyerParty may not be changed once a service request has been created. (if a service request is being forwarded to external provider)

ProductRecipientParty

A ProductRecipientParty is a party for whom services are provided. ProductRecipientParty is used in Ser-viceRequest message only. The ProductRecipientParty is of type GDT:

BusinessTransactionDocumentParty and contains the following elements:

BuyerID—ID of the Service Requestor (GDT: PartyPartyID).

Address—Address of the Service Requestor (GDT: Address)

ContactPerson—Service Requestor Contact Person (GDT: ContactPerson)

SellerParty

A SellerParty is the party, that provides the clarification for the service request. The SellerParty is of type GDT: BusinessTransactionDocumentParty and contains the following elements:

StandardID—standard identifier for a business party, assigned by DUNS (GDT: PartyPartyID)

BuyerID—identifier for a BuyerParty (known to a vendor party)

(GDT: PartyPartyID)

Address—ExternalServiceProvider Party address (GDT: Address)

ContactPerson—ExternalServiceProvider Party contact person

The SellerParty is not generally changed once a service request has been created.

In operation, the SellerParty is specified.

TextCollection Package

The TextCollection package groups together all texts of a service request. It contains the entity:

TextCollection (GDT: TextCollection).

TextCollection

The TextCollection is a collection of texts, among which is the problem description as well as texts that are exchanged between requestor and providers (e.g. natural language questions and answers, and solution proposals). The TextCollection is of type GDT: TextCollection AttachmentFolder Package An AttachmentFolder package contains the attachment information with respect to the service request. It contains the entity: AttachmentFolder. The AttachmentFolder contains attached information with respect to the Service Request. Incident Context information is stored as multiple Documents (within the Attachment-Folder) with a special document type "IncidentContext" The AttachmentFolder is of type GDT: Attachment-Folder:

SolutionProposal Package

SolutionProposal package contains the solution information with respect to the service request. It contains the entities: SolutionProposal. The SolutionProposal is a document or a link that contains a solution or workaround for the service request and which is proposed to the customer. The SolutionProposal is of type GDT: ServiceRequestSolution. The SolutionProposal contains the elements:

ExternalKnowledgeBaseArticleID—is an unique ID of a CustomerProblemAndSolution in the knowledge da-tabase of an ExternalServiceProvider (GDT: KnowledgeBaseArticleID) ExternalKnowledgeBaseArticleDescription (GDT: MEDIUM_Description)—is a short text (subject or title) of the external knowledge base article.

ExternalKnowledgeBaseCode—is a code (based on an extensible code list) that identifies the external knowl-edge base from which the solution proposal comes Either a CustomerProblemAndSolutionID or an ExternalServiceProviderCustomerProblemAndSolutionID is provided, in case a SolutionProposal is sent.

A List of Data Types Used (GDTS) includes BusinessDocumentMessageHeader (restricted), ServiceRequest, BusinessTransactionDocumentID, DateTime, BusinessTransactionDocumentItemID, PriorityCode, Ser-viceRequestSolutionStatusCode, Name, BusinessTransactionDocumentParty, BusinessTransactionDocu-mentProduct, Description, Attachment, KnowledgeBaseArticleID, ServiceRequestSolutionProposal, and ServiceRequestServiceReferenceObject Message Data Type FormServiceRequestMessage The message data type FormServiceRequestMessage has the same semantic as the message data type ServiceRequestMessage. It is used to render forms e.g. for printing, mail, fax, interactive documents. The differences between the message data type ServiceRequestMessage and FormServiceRequestMessage are described in the following chapters.

The Message-data type FormServiceRequestMessage contains formatted addresses in addition to the nor-mal addresses and the name for every code value and IDs ServiceRequest Package The ServiceRequest package groups the ServiceRequest object with its packages. In addition to the pack-ages, which are grouped by ServiceRequest, the followings are included in the FormCustomerDocument-TransactionServiceRequestMessage: ServiceTerms ServiceRequest The ServiceRequest corresponds to the ServiceRequest of the message data type ServiceRequestConfir-mation except the following element.

Additional elements include DateTime and removed elements include ServicePriorityCode and Buyer-DateTime.

Structure

The ServiceTerms contains detailed information conditions and agreements that apply for the execution of a service activity in a Service Request and which control the processing.

The ServiceTerms is of type IDT: FormCustomerDocumentTransactionServiceTerms.

The ServiceTerms contains the following elements:

ServiceIssueCategoryID—Identifier for the category that schedules the service business transaction.

(GDT: ServiceIssueCategoryID).

ServiceIssueCategoryName—Name of a service issue category.

(GDT: _MEDIUM_Name)

Party

In addition to the parties of the Party package of the message data type ServiceRequestConfirmation the following parties are included.

Processor Party

A processor party is a party that is processing the request. The Processor Party is of type GDT: FormBusi-nessTransactionDocumentParty. The Processor Party contains the following elements:

InternalID—Identifier for the Processor Party (GDT: PartyInternalID)

StandardID—standard identifier for a business party (GDT: PartyStandardID)

BuyerID—Identifier for the BuyerParty (GDT: PartyPartyID)

SellerID—Identifier for the SellerParty (GDT: PartyPartyID)

Address—Processor Party address (GDT: Address)

ContactPerson Processor Party contact person (GDT: ContactPerson)

ServiceSupportTeamParty

A ServiceSupportTeamParty is a party that is responsible for the processing of service requests. The Ser-viceSupportTeamParty is of type GDT: FormBusinessTransactionDocumentParty. The ServiceSupport-TeamParty contains the following elements:

InternalID—Identifier for the ServiceSupportTeamParty (GDT: PartyInternalID)

StandardID—standard identifier for a business party (GDT: PartyStandardID)

BuyerID—Identifier for the BuyerParty (GDT: PartyPartyID)

SellerID—Identifier for the SellerParty (GDT: PartyPartyID)

Address—ServiceSupportTeamParty address (GDT: Address)

ContactPerson—ServiceSupportTeamParty contact person (GDT: ContactPerson)

IncidentServiceIssueCategory

The IncidentServiceIssueCategory categorizes the individual occurrence or aspect in a service request.

The IncidentServiceIssueCategory is of type IDT: FormCustomerDocumentTransactionIncidentServiceIssue-Category. The IncidentServiceIssueCategory contains the following elements:

MainIndicator—Indicates the main service issue (GDT: Indicator)

IncidentServiceIssueCategoryID—identifies the category of the service issue in a service process (GDT: ServiceIssueCategoryID)

IncidentServiceIssueCategoryName—name of the service issue category (GDT: _MEDIUM_Name)

ServiceReferenceObject

The ServiceReferenceObject is the object on which the service issue of the ServiceRequest is related. It can be a material, an individual material or a service product. The ServiceReferenceObject is of type GDT: FormCustomerDocumentTransactionServiceReferenceObject. The IncidentServiceIssueCategory contains the following elements:

MainIndicator—Indicates the main service reference object (GDT: Indicator)

ServiceReferenceObjectMaterialID—Identifies the product on which the service request depends (GDT: Pro-ductID)

ServiceReferenceObjectMaterialDescription—describes the service reference object material (GDT: _SHORT_Description)

ServiceReferenceObjectIndividualMaterialSerialID—indicates the service reference object individual material (GDT: SerialID)

ServiceReferenceObjectIndividualMaterialDescription—describes the service reference object individual ma-terial (GDT: _SHORT_Description)

InstallationPointAddress—Address where the service reference object is installed (GDT: Address).

InstallationPointFormattedAddress—FormattedAddress where the service reference object is installed (GDT: Address).

SolutionProposal

The SolutionProposal contains the solution proposal to solve an issue, that a customer (service requestor) has. The SolutionProposal is a type IDT FormCustomerDocumentTransactionSolutionProposal The Solution Proposal contains the following elements:

CustomerProblemAndSolutionID—Identifier for the CPAS article (GDT: KnowledgeBaseArticleID).

CustomerProblemAndSolutionDescription—Description of the CPAS article (GDT: MEDIUM_Description).

CustomerProblemAndSolutionValidityPeriod—Contains the valid from date of the CPAS article. (GDT: UPPEROPEN_GLOBAL_DateTimePeriod).

CustomerProblemAndSolution-SystemAdministrativeData—Provides the last modified date of the CPAS arti-cle (GDT: SystemAdministrativeData).

TextCollection—Contains the CPAS article (GDT: TextCollection)

A List of Data Types Used (GDTs) include ActionCode, Address, AttachmentFolder, BusinessTransaction-DocumentID, ContactPerson, Extended_Name, FormattedAddress, FormBusinessTransactionDocument-Party, FormIncidentServiceIssueCategory, FormServiceReferenceObject, FormServiceRequest, FormSer-viceRequestMessage, FormServiceTerms, FormSolutionProposal, GLOBAL_DateTime, Indicator, KnowledgeBaseArticleID, MEDIUM_Description, PartyInternalID, PartyPartyID, PartyStandardID, ProductID, Re-questAssignmentStatusCode, SerialID, ServiceIssueCategoryID, SolutionProposalStatusCode, SystemAd-ministrativeData, TextCollection, and UPPEROPEN_GLOBAL_DateTimePeriod.

Business Object Opportunity

Figures 1, 42:
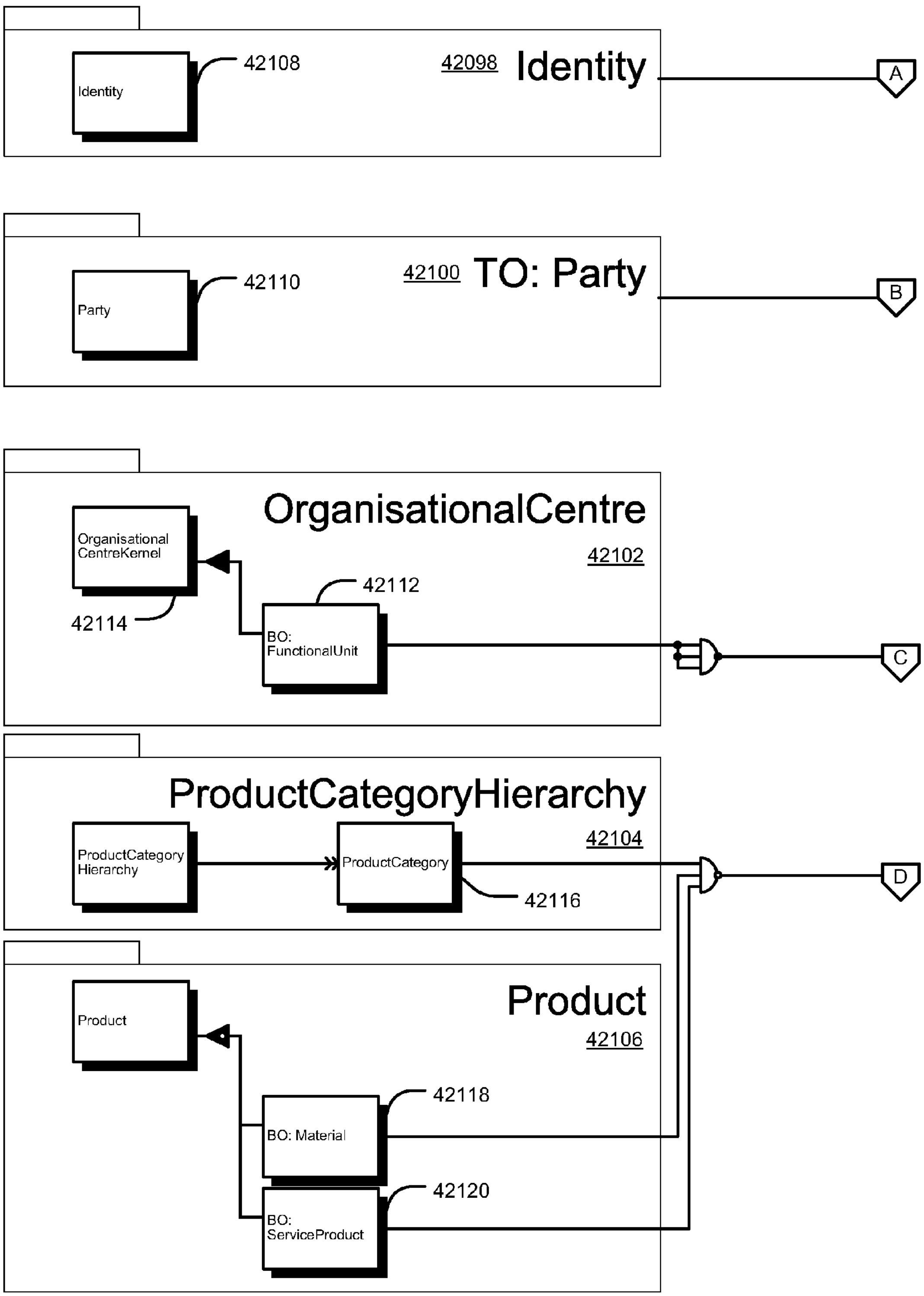
Figures 2, 42:
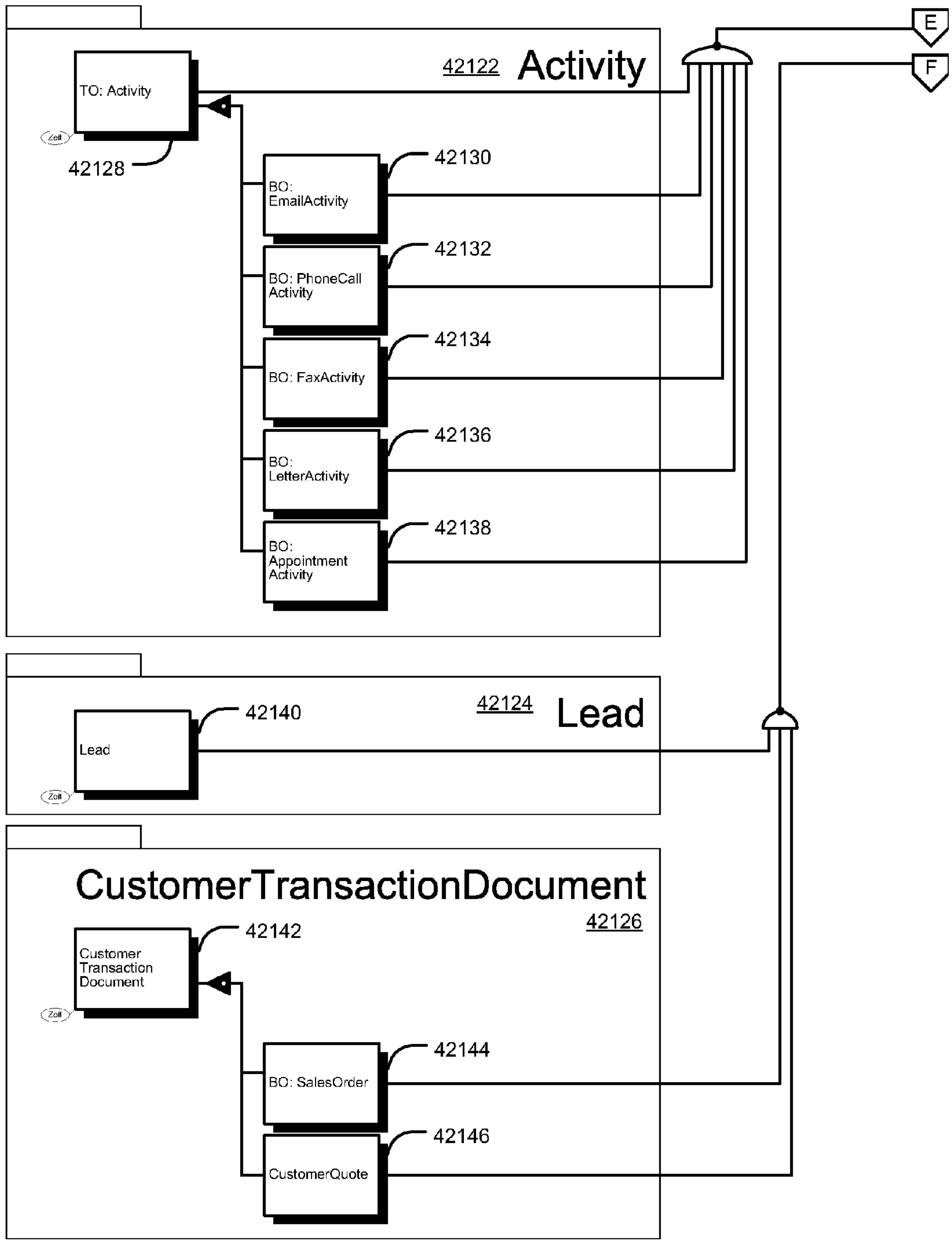
Figures 3, 42:
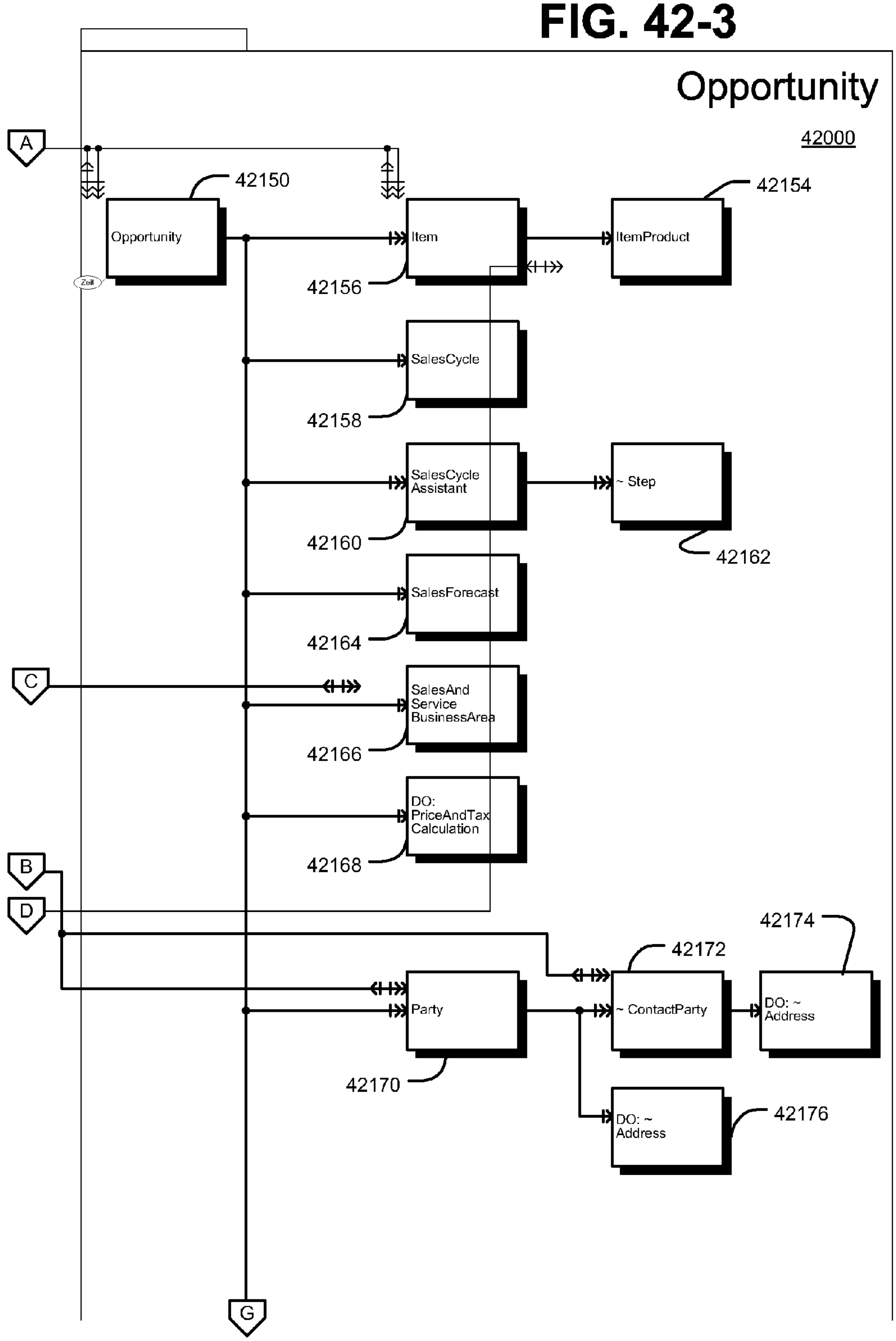
Figures 4, 42:
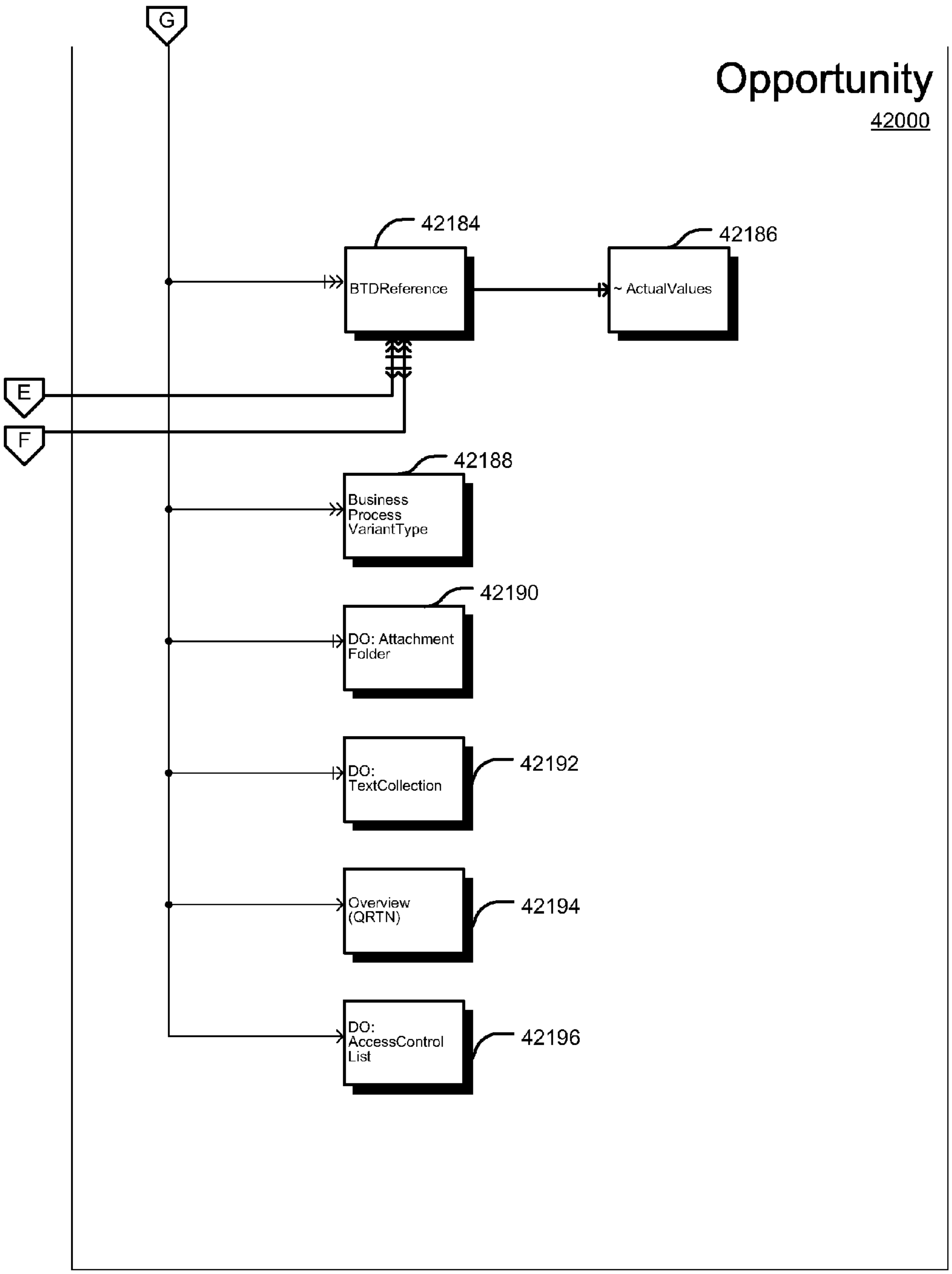

FIG. 42 illustrates one example of an Opportunity business object model 42000. Specifically, this figure depicts interactions among various hierarchical components of the Opportunity, as well as external components that interact with the Opportunity (shown here as 42098 through 42146). Opportunity is a recognized possibility for sales of products or services. An Opportunity may result from a trade fair, sales promotion or a public bid invitation. It contains various types of business information such as anticipated sales revenue or net value of a business deal. An Opportunity can be used as a basis for a sales order.

Process Component

The business object Opportunity is part of the process component Opportunity Processing.

An Opportunity consists of the following entities: The root node and dependent data such as the parties involved; sales forecast for anticipated revenue, a sales cycle and its phase, status, references and so on that apply for the object as a whole. The Opportunity items, with item relevant information such as the quantity, quantity unit, values, unit of currency and so on plus dependent data for product information.

Business Object Opportunity Node Structure

The Opportunity root node 42150 contains information that uniquely identifies it, and business-specific data such as the priority, origin and group of an Opportunity. It also specifies the party to which the Opportunity refers, as well as the parties involved in implementing the Opportunity. It contains information on anticipated revenue and sales cycle with their phase, and references to business documents that are created with reference to an Opportunity, such as customer quotes and sales orders.

The Root Node is defined by the GDT OpportunityElements, which may include the following elements:

ID, UUID, SystemAdministrativeData, TypeCode, ProcessingTypeCode, Name, Groupcode, OrigintypeCode, PriorityCode, ResultReasonCode, ResultReasonCode, CustomerTransactionDocumentResultReasonCode, ProcessStatusValidSinceDate, LifeCycleStatusCode PhaseProgressEvaluationStatusCode, ConsistencyStatusCode, GeneralDataCompletenessStatusCode. An ID is a GDT of the type BusinessTransactionDocumentID and contains an a unique identifier assigned by the system automatically. The UUID is a GDT of the type UUID and is the internally assigned UUID of which other business objects can define foreign keys. The SystemAdministrativeData is a GDT of the type SystemAdministrativeData and contains administrative data recorded by the system which includes users and change date/times. The TypeCode is a GDT of the type BusinessTransactionDocumentTypeCode and is the coded representation of the type of opportunity. Constraints: the code that stands for the business object opportunity is permitted. A ProcessingTypeCode is a GDT of the type BusinessTransactionDocumentProcessingTypeCode and is the coded representation of the processing of a opportunity within the process component. A Name is a GDT of the type MediumName and is the short description for an opportunity. A GroupCode is a GDT of the type OpportunityGroupCode and is the assignment of an opportunity to a group. OrigintypeCode is a GDT of the type CustomerTransactionDocument-OrigintypeCode and is the coded representation of the origin. The PrioritytypeCode is a GDT of the type PriorityCode and is the coded representation of a priority. The ResultReasonCode is a GDT of the type CustomerTransactionDocumentResultReasonCode and is the coded representation of a reason for the opportunity result. The ProcessStatusValidSinceDate is a GDT of the type Date Qualifier ValidSince and it provides a date since which a current status is valid. The LifeCycleStatusCode is a GDT of the type LifeCycleStatusCode and it represents the life cycle of an opportunity. The PhaseProgressEvaluationStatusCode is a GDT of a type OpportunityPhaseProgressEvaluationStatusCode and is the coded presentation for the evaluation status of the phase progress. The ConsistencyStatusCode is a GDT of the type ConsistencyStatusCode and describes whether the data of an opportunity is consistant or not. The GeneralDatacompletnessStatusCode is a GDT of the type DataCompletenessStatusCode Qualifier: General and it specifies whether all relevant opportunity data is available.

The following composition relationships to subordinate nodes exist:

SalesForecast 42164 may have a cardinality of 1:c.

SalesCycle 42158 may have a cardinality of 1:c.

SalesCycleAssistant 42160 may have a cardinality of 1:cn.

Party 42170 may have a cardinality of 1:cn.

SalesAndServiceBusinessArea 42166 may have a cardinality of 1:c.

PriceAndTaxCalculation 42168 may have a cardinality of 1:c.

Item 42156 may have a cardinality of 1:cn.

BusinessTransactionDocumentReference 42184 may have a cardinality of 1:cn.

Attachment Folder 42190 may have a cardinality of 1:c.

Text Collection 42192 may have a cardinality of 1:c.

BusinessProcessVariantType 42188 may have a cardinality of 1:n.

Overview 42194 may have a cardinality of 1:1.

AccessControlList 42196 may have a cardinality of 1:1.

There may be a number of Inbound Association Relationships including:

From business object Identity: CreationIdentity may have a cardinality relationship of 1:cn and contains an Identity that has created an Opportunity. LastChangedIdentity may have a cardinality of c:cn and contains an identity that has changed an Opportunity.

Specialization Associations for Navigation:

On the BusinessProcessVariantType node, MainBusinessProcessVariantType has a cardinality of 1:1 and specifies the main BusinessProcessVariantType.

On the Party node: SalesTeamParty may have a cardinality of 1:cn and specifies a party working on an Opportunity as part of a sales team. Competitor Party may have cardinality of 1:cn and specifies a party regarded as being a competitor. MainCompetitor Party may have a cardinality of 1:c and specifies a party regarded as being the main competitor. ProspectParty may have a cardinality of C:C and specifies a party that has a business interest or that is suspected of having a commercial interest in an Opportunity.

MainEmployeeResponsibleParty may have a cardinality of 1:c and specifies an employee from the sales team that is chiefly responsible for the processing of an Opportunity. SalesUnitParty may have a cardinality of 1:c and specifies a party that represents the sales organization responsible for selling a product or service. ExternalParty may have a cardinality of 1:cn and specifies a party that does not work within the organization.

The following are all parties that may not occur in the following specialization: SalesTeamParty, Competitor Party, MainCompetitor Party, MainEmployeeResponsibleParty or SalesUnitParty.

At the BusinessTransactionDocumentReference node ActivitySuccessorBusinessTransactionDocumentReference may have a cardinality of 1:cn. It provides a reference to the business objects AppointmentActivity, EmailActivity, LetterActivity, FaxActivity and PhoneCallActivity that are direct successors of the opportunity. At the SalesCycleAssistantStep node 42162

AllSalesCycleAssistantStep may have a cardinality of 1:cn and is a SalesCycleAssistantStep that contains all steps of an opportunity regardless of the phase.

Associations for Navigation

From business object BusinessDocumentFlow/node root node BusinessDocumentFlow has a cardinality of c:cn and specifies an association relationship to all business objects that use an opportunity in a business process.

Integrity Conditions

The ID cannot be changed once it has been created. The UUID is assigned internally and cannot be changed. The SystemAdministrativeData is set internally by the system. Data cannot be assigned or changed externally. The TypeCode is determined by the system and cannot be set using an interface.

The ProcessingTypeCode cannot be changed once it has been created. After it has been created, an Opportunity may be deleted if no subsequent processes have been started.

Enterprise Service Infrastructure Actions

CreateWithReference creates a reference to an existing document, from which the relevant data is transferred. AddReferenceWithDataProvision creates a BusinessTransactionDocumentReference provides the opportunity with data from the referenced document.

Prerequisites:

The ESI action can be executed at all times.

Changes to the object: The ESI action generates a new Opportunity.

Parameters: The action elements may be defined by the data type: OpportunityAddReferenceWithDataProvisionActionElements. These elements may include: ID TypeCode and Use. ID is a GDT of the type BusinessTransactionDocumentID and CreateFromBusinessPartner. The TypeCode is a GDT of the type BusinessTransactionDocumentTypeCode. Use of the EIS action is not subject to constraints. CreateFromBusinessPartner creates an opportunity with the provided Business Partner as the prospect party.

Prerequisites:

The ESI action can be executed at all times.

Changes to the object: The ESI action generates a new Opportunity and passes the provided Business Partner as the prospect party.

Use: The action is used to create a new Opportunity and is marked as a “CreateWithReference” action.

Reopen (S&AM Action) sets the LifeCycleStatus of an Opportunity back to the initial status.

Process (S&AM Action) sets the LifeCycleStatus to "In Process." The Opportunity can be processed afterwards.

Win (S&AM Action) sets the LifeCycleStatus of an Opportunity to won.

Lose (S&AM Action) sets the LifeCycleStatus of an Opportunity to "Lost".

Stop (S&AM Action sets the LifeCycleStatus of an Opportunity to "Stop".

EvaluatePhaseProgress (S&AM Action) evaluates the PhaseProgressEvaluationStatus of an opportunity.

Prerequisites:

The ESI action is executed by a batch job periodically.

CheckConsistency (S&AM Action) checks the ConsistencyStatus of an opportunity.

CheckGeneralDataCompleteness (S&AM Action) checks the GeneralDataCompletenessStatus of an opportunity.

Queries

SelectAll: Returns a list of all opportunities for the Fast Search Infrastructure (FSI) initial load.

No data type is required for this query.

QueryByElements: Returns a list of all opportunities (root node) found for an ID, a name, a start date, an expected processing date, a success probability, an expected sales volume, a sales cycle, a phase, a party, a party in the specialization EmployeeResponsibleParty, a party in the specialization ProspectParty and a status.

Query elements are defined by the data type OpportunityElementsQueryElements. These elements any include: ID, SystemAdministrativeData, CreationBusinessPartner_CommonPersonNameGivenName, CreationBusinessPartner_CommonPersonFamilyName, LastChangeBusinessPartner_CommonPersonNameGivenName, LastChangeBusinessPartner_CommonPersonNameFamilyName, ProcessingTypeCode, Name, PriorityCode, GroupCode, OriginTypeCode, ResultReasonCode, Status, ConsistencyStatusCode, GeneralDataCompletenessStatus Code, SalesForecastProbabilityPercent, SalesForecastExpectedRevenueAmount, SalesRevenueForecastRelevanceIndicator, SalesForecastExpectedProcessing, SalesCycleSalesCycleCode, SalesCycleSalesCyclePhaseCode, PartyRoleCode, PartyPartyID, PartyEmployeeResponsiblePartyID, PartyProspectPartyID, SalesAndServiceBusinessAreaSaleOrganisationID. The ID is a GDT with a type of BusinessTransactionDocumentID. The SystemAdministrativeDate is a GDT with a type of SystemAdministrativeDate. The CreationBusinessPartner_CommonPersonNameGivenName is a GDT with a type of MediumName and contains the first name of the person who has created the opportunity. The CreationBusinessPartner_CommonPersonNameFamilyName is a GDT with a type of MediumName and contains the last name of the person who has created the opportunity. The LastChangeBusinessPartner_CommonPersonNameGivenName is a GDT with a type of MediumName and is the first name of the person who has changed the opportunity. The LastChangeBusinessPartner_CommonPersonNameFamilyName is a GDT with a type of MediumName and is the last name of the person who has changed the opportunity. The ProcessingTypeCode is a GDT with a type of BusinessTransactionDocumentProcessingTypeCode. The Name is a GDT with a type of MediumName. PriorityCode is a GDT with a type of MediumName. The GroupCode is a GDT with a type of OpportunityGroupCode. The OriginalTypeCode is a GDT with a type of CustomerTransactionDocumentOriginTypeCode. The ResultReasonCode is GDT with a type of CustomerTransactionDocumentResultReasonCode. The Status contains the LifeCycleStatusCode, ResultStatusCode, PhaseDurationEvaluationCode, ConsistencyStatusCode and GeneralDataCompletenessStatusCode. The SalesForecastProbabilityForecast is a GDT with a type of Percent, Qualifier: Probability. The SalesForecastExpectedRevenueAmount is a GDT with a type of Amount, QualifierRevenue. The SalesRevenueForecastRelevanceIndicator is a GDT with a type of Indicator, Qualifier: Relevance. The SalesForecastExpectedProcessingDatePeriod is a GDT with a type of ClosedDatePeriod, Qualifier: Processing and contains a time period in which the opportunity will probably be processed. All opportunities that fall within this period are found. The SalesCycleSalesCycleCode is a GDT with a type of SalesCycleCode. The SaleCycleSalesCyclePhaseCode is a GDT with a type of SalesCyclePhaseCode. The PartyRoleCode is a GDT with a type of PartyRoleCode and contains the role of a party the occurs in an opportunity. PartyRoleID is a GDT with a type of PartyID and is the identification of a party that occurs in an opportunity. The PartyEmployeeResponsiblePartyID is a GDT with a type of PartyID and is the party responsible for processing the opportunity.

The PartyProspectPartyID is a GDT with a type of OrganisationalCentreIID and contains a party which has a business interesting to the opportunity. The SalesAndServiceBusinessAreaSalesOrganisationID is a GDT with a type of ProductID.

A SalesForecast is a forecast of future sales. It contains the likelihood of success, the expected revenue and the estimated budget of the interested party.

The structure of the SalesForecast node is defined by the GDT OpportunitySalesForecastElements, which may contain the following elements: ProbabilityPercent, ExpectedRevenueAmount, SalesRevenueForecastRelevanceIndicator, TotalExpectednetAmount, WeightedExpectedNetAmount, ProspectBudgetAmount, ExpectedProcessingDatePeriod. The ProbabilityPercent is a GDT with a type of Percent, Qualifier: Probability and is the probability of success for an opportunity expressed as a percentage. The ExpectedRevenueAmount is a GDT with a type of Amount GDT, Qualifier: Revenue) and is the anticipated sales volume for an opportunity. The SalesRevenueForecaseRelevanceIndicator is a GDT with a type of Indicator, Qualifier: Relevance and specifies whether the opportunity should be included in the turnover forecast or not. The TotalExpectedNetAmount is a GDT with a type of Amount GDT, Qualifier: Net and contains the expected sales volume for an opportunity, calculated from the total of the item values. The WeightedExpectedNet Amount is a GDT with a type of Amount GDT, Qualifier Net and is the weighted expected sales volume for an opportunity and it is an opportunity. The ProspectBudgetAmount is a GDT with a type of Amount GDT, Qualifier Budget and is the budget that is available to the customer for investment in the context of this opportunity. The ExpectedProcessingDatePeriod is a GDT with a type of ClosedDatePeriod, Qualifier: Processing and is a period in which the opportunity will probably be processed.

Integrity Conditions

The ProbabilityPercent is generally expressed in integers and cannot contain any negative values.

The TotalExpectedNetAmount and WeightedExpectedNetAmount cannot be changed via the interface.

The currency for the budget of the interested party is determined from the ExpectedRevenueAmount currency.

A SalesCycle is a sales cycle in which the opportunity exists. In addition to the sales cycle and phase, this includes the date at which the phase became active.

The SalesCycle node is defined by the OpportunitySalesCycleElements GDT, and may contain the following elements: SalesCycleCode, SalesCyclePhaseCode, PhaseProcessingPeriod. The SalesCycleCode is a GDT with a type of SalesCycleCode and contains the coded representation of the sales cycle in which opportunity exists. The SalesCyclePhaseCode is a GDT with a type of SalesCyclePhaseCode and is the coded representation of a phase within a sales cycle in which an opportunity exists and it is optional. The PhaseProcessingPeriod is a GDT with a type of DatePeriod, Qualifier: Processing and is the time period for which an opportunity exists in a phase. The SalesCycleCode can be changed as long as the Opportunity has not been saved.

A SalesCycleAssistant is an assistant that supports the planning of the next phases and steps of a sales cycle. It contains the phase of a sales cycle and the sequence of the phase.

The SalesCycleAssistant node is defined by the GDT OpportunitySalesCycleAssistantElements, which may contain the following elements: OrdinalNumberValue, SalesCycleCode, SalesCyclePhaseCode, SalesCyclePhaseCode. The OrdinalnumberValue is a GDT with a type of OrdinalNumberValue and it specifies the sequence of the SalesCyclePhaseAssistant. The SalesCycleCode is a GDT with a type of SalesCycleCode and is the coded representation of a sales cycle in which an opportunity exists. The SalesCyclePhaseCode is a GDt with a type of SalesCyclePhase Code and is the coded representation of a phase within a sales cycle in which an opportunity exists.

The following composition relationships to subordinate nodes exist: SalesCycleAssistantStep may have a cardinality of 1:cn.

A SalesCycleStep is step within a sales cycle phase, and has to be carried out by a user. It contains the description and sequence for the individual steps.

The SalesCycleStep node is defined by the GDT OpportunitySalesCycleAssistantStepElements, which may contain the following elements: OrdinalNumberValue, SalesCyclePhaseStepCode, ActiveIndicator, RequiredIndicator, Description. The OrdinalNumberValue is a GDT with a type of OrdinalNumberValue and it specified the sequence of the SalesCycleStep node. The SalesCyclePhaseStepCode is a GDT with a type of SalesCyclePhaseSetCode and is the coded representation of a step with the sales cycle. The ActiveIndicator is a GDT with a type of Indicator, Qualifier: Active and specifies whether the teop is active or not. The RequiredIndicator is a GDT with a type of Indicator, Qualifier: Specifies whether the step is executed or whether it can be omitted. The Description is a GDT with a type of Description, Qualifier: SalesCycleAssistantStep and it describes a SalesCycleAssistantStep.

Integrity Conditions

The elements OrdinalNumberValue, SalesCyclePhaseStepCode, ActiveIndicator, RequiredIndicator and Description are set by the business object and cannot be changed via a service interface.

Enterprise Service Infrastructure Actions

The ESI action activates a SalesCycleAssistantStep in which the assigned business document is created.

Prerequisites:

The ESI action are to be carried out if the SalesCycleAssistantStep node has not yet been activated, and if a business object has been assigned to the node.

Changes to the object: The ESI action does not change the SalesCycleAssistantStep node.

Changes to other objects: The ESI action generates a business document and a BusinessTransactionDocumentReference node.

Changes to status: The ESI action does not change the status.

Parameters: The ESI action does not require any parameters.

Use: Use of the ESI action is not subject to constraints.

Party (Using Party Template)

A Party is a party that is involved in an Opportunity.

A party involved in an Opportunity can be: A business partner, a business partner in the specialized business objects Customer, Supplier, and Employee, an organizational center in the specialized business objects FunctionalUnit, an address (master data address of a party; or of a party without business partner master data) or a CasualParty if neither master data nor addresses exist.

An Opportunity Party node may be used in the following incomplete and non-disjoint specializations:

SalesTeamParty: A party that is involved in the sales team for processing the Opportunity.

Competitor Party: A party that is a competitor in terms of business.

ProspectParty: A party that has a business interest or that is suspected of having a business interest.

MainEmployeeResponsibleParty: An employee from the sales team that is chiefly responsible for the processing of an Opportunity.

SalesUnitParty: A party that represents the sales organization responsible for selling goods or services.

ExternalParty: A party that does not work within an own enterprise.

The Party node is defined by the OpportunityPartyElements data type, which may contain the following elements: PartyID, PartyUUID, PartyTypeCode, RoleCategoryCode, RoleCode, AddressReference, DeterminationMethodCode, MainIndicator. The PartyID is a GDT with a type of PartyID and is the identifier for the business partner, the organizational unit or their specializations. The PartyUUID is a GDT with a type of UUID and is the unique identifier for the business partner the organizational unit or their specializations. The PartyTypeCode is a GDT with a type of PartyTypeCode and is the type of party referenced by the attribute PartyUUID. The RoleCategoryCode is a GDT with a TypePartyroleCategoryCode and is the category of the PartyRole in an opportunity. The AddressReference is a GDT with a type of PartyAddressReference and is the unique reference to an address of a party. The DeterminationMethodCode is a GDT with a type of PartyDeterminationMethodCode and is the coded representation of the party determination method. The MainIndicator is a GDT with a type of Indicator, Qualifier: PartyMainIndicates whether or not a party is emphasized in a group of parties with the same PartyRole.

The following composition relationships to subordinate nodes exist:

PartyContactParty 42172 may have a cardinality of 1:cn.

PartyAddress (DO) 42176 may have a cardinality of 1:c.

There may be a number of Inbound aggregation relationships including:

From business object Party: Party (TO) may have a cardinality of c:cn and is a party that is involved in an Opportunity.

Specialization Associations for Navigation:

At the PartyContactParty node: MainPartyContactParty may have a cardinality of C:C and contains an association to the main contact person.

From business object UsedAddress: UsedAddress may have a cardinality of c:cn and contains the address of a Party that is involved in an Opportunity.

Integrity Conditions

There may be one aggregation relationship to the business partner, the functional unit, or their specializations. If the PartyUUID exists, the PartyTypeCode can exist as well. One association can exist for the address. This address is a master data address of the business partner, organizational unit, or their specializations referenced by PartyUUID.

PartyContactParty

A PartyContactParty is a natural person or an organizational unit that can be contacted for the respective party. Communication data is generally available for the contact.

Structure

The PartyContact node is defined by the OpportunityPartyContactPartyElements data type, which contains the following elements: PartyID, PartyUUID, PartyTypeCode, AddressReference, DeterminationMethodCode, and MainIndicator.

The following composition relationships to subordinate nodes exist:

PartyContactPartyAddress (DO) 42174 has a cardinality of 1:c.

There may be a number of Inbound Aggregation Relationships Including:

From business object Party: Party (TO) has a cardinality of c:cn and is a Party that is involved in an Opportunity.

Specialization Associations for Navigation:

From business object UsedAddress: UsedAddress has a cardinality of c:cn and contains the address of a Party that is involved in an Opportunity.

Integrity

One association can exist for the address. This address is a master data address of the business partner, organizational unit, or their specializations referenced by PartyUUID.

PartyContactPartyAddress (DO): A PartyContactPartyAddress contains the document specific address of a PartyContactParty.

Structure

The node PartyContactPartyAddress is defined by the DO Address. A PartyAddress contains the document-specific address of a Party. The node PartyAddress is defined by the DO Address.

SalesAndServiceBusinessArea

A SalesAndServiceBusinessArea is the business or service specific area within an enterprise that is valid for an Opportunity, for example, sales organization, service organization, distribution channel, division. These elements are derived from the sales unit organizational unit responsible for the opportunity, and can be overwritten manually.

Structure

The SalesAndServiceBusinessArea node is defined by the OpportunitySalesAndServiceBusinessAreaElements data type, which may contain the following elements:

SalesGroupID, SalesOfficeID, SalesOrganisationID, DistributionChannelCode, SalesGroupUUID, SalesOfficeUUID, SalesOrganisationUUID. The SalesGroupID is a GDT with a type of OrganisationalCentreID and is the identifier for the sales group that is responsible for the opportunity. The SalesOfficeID is a GDT with a type of organisationalCentreID and is the identifier for the sales office that is responsible for the opportunity. The SalesOrganisationID is a GDT with a type of organizationalCentreID and is the identifier for the sales or organization that is responsible for the opportunity. The DistributionChannelCode is a GDT with a type of DistributionChannelCode and is the coded representation of the distribution channel by which goods and services reach customers. The SalesGroupUUID is a GDT with a type of UUID and is the global unique identifier of the sales group. The SalesOfficeUUID is a GDT with a type of UUID and is the global unique identifier of a sales office. The SalesOrganisationUUID is a GDT with a type of UUID and is the global identifier of a sales organization.

There may be a number of Inbound Aggregation Relationships including:

From business object FunctionalUnit:

SalesOffice may have a cardinality of c:cn FunctionalUnit in the specialization SalesOffice SalesGroup may have a cardinality of c:cn FunctionalUnit in the specialization SalesGroup.

SalesOrganization may have a cardinality of c:cn FunctionalUnit in the specialization SalesOrganization.

PriceAndTaxCalculation (DO) are the price and tax components determined by price and tax determination/valuation that are valid for the opportunity. The node PriceAndTaxCalculation is defined by the DO PriceAndTaxCalculation.

An Item is a possibility of selling a quantity of a product or service. It contains product information, quantity and values. An Item also contains both identifying and administrative information.

Structure

The Item node is defined by the GDT OpportunityItemElements, which may contain the following elements: UUID, ID, SystemAdministrativeData, TypeCode, ProcessingTypeCode, ProcessingtypeCode, Description, Quantity, QuantityTypeCode, NetAmount, ExpectedNetAmount. The UUID is a GDT of the type UUID and contains the UUID is the internally-assigned UUID for an Opportunity item, for which other business objects can define foreign keys. The ID is a GDT of a type BusinessTransactionDocumentItem and contains an ID is the unique identifier for an item within the Opportunity assigned by the user. The SystemAdministrativeData is a GDT of the type SystemAdministrativeData and contains the administrative data recorded by the system. This data includes system users and change dates/times. The TypeCode is a GDT of a type BusinessTransactionDocumentItemTypeCode, restriction: the OpportunityItem code is permitted and it contains a coded representation for the type of an item in an Opportunity. The ProcessingTypeCode is a GDT of a type: BusinessTransactionDocumentItemProcessingTypeCode and contains a coded presentation for processing an item in an opportunity. The Description is a GDT of a type ShortDescription and contains a description in the short description for an item in an Opportunity. The Quantity is a GDT of the type Quantity and contains a Quantity of an item in an Opportunity. QuantityType Code is a GDT of a type QuantityTypeCode and is the coded representation of the type in which quantities are used for the product in the Opportunity. The NetAmount is a GDT of a type Amount, Qualifier net and is the net value of an item in an Opportunity. ExpectedNewAmount is a GDT of a type Amount, Qualifier Net and is the expected net value of an item in an Opportunity.

The following composition relationships to subordinate nodes exist: ItemProduct 42154 may have a cardinality of 1:c.

There may be a number of Inbound Association Relationships including:

From business object Identity: CreationIdentity may have a cardinality of 1:cn

Identity that has created an Activity. LastChangedIdentity may have a cardinality of c:cn Identity that has changed an Activity.

Associations for Navigation

At the PriceAndTaxCalculationItem node

PriceAndTaxCalculationItem has a cardinality of 1:cn

Association to price and tax elements that are valid for the opportunity item.

Integrity Conditions

The ID cannot be changed once the item has been created.

The SystemAdministrativeData is set internally by the system. This data cannot be assigned or changed externally.

ItemProduct

An ItemProduct is the identification, description and classification of the product (Material or ServiceProduct) in the item of an Opportunity.

Structure

The Item node is defined by the GDT OpportunityItemProductElements, which may contain the following elements: ProductID, ProductUUID, ProductStandardID, ProductCategoryInternalID, ProductTypeCode. The ProductID is a GDT of the type ProductID and contains the ID entered for a product. The ProductUUID is a GDG of a type UUID and contains the UUID for a product. The ProductStandardID is a GDT of a type ProductStandardID and contains the StandardID of a product. ProductCategoryInternalID is a GDT of a type ProductCategoryInternalID and contains s unique identifier for a product category to which a product is assigned. ProductTypeCode is a GDT of a type ProductTypeCode and contains the coded representation for the product type that describes the nature and essential characteristics of products such as Material, ServiceProduct.

There are a number of Inbound Aggregation Relationships including:

From business object material: Material may have a cardinality of c:cn

Product used in the Opportunity.

From business object Service Product: ServiceProduct may have a cardinality of c:cn Product used in the Opportunity.

From the business object ProductCategoryHierarchy: ProductCategory may have a cardinality of c:cn Product category used in the Opportunity if a product category has been assigned to a product, or if the product category is known.

Integrity Conditions:

The ProductTypeCode cannot be changed once the item has been created.

BusinessTransactionDocumentReference

A Reference is a reference to a business document related to the Opportunity via a process.

A Reference node can be used in the following incomplete and disjoint specializations:

AppointmentActivityReference: An AppointmentActivityReference is a reference to an Appointment Activity that is created with reference to an Opportunity.

EmailActivityReference: An EmailActivityReference is a reference to an Email Activity that is created with reference to an Opportunity.

LetterActivityReference: An LetterActivityReference is a reference to a Letter Activity that is created with reference to an Opportunity.

FaxActivityReference: An FaxActivityReference is a reference to a Fax Activity that is created with reference to an Opportunity.

PhoneCallActivityReference: An PhoneCallActivityReference is a reference to a Phone Call Activity that is created with reference to an Opportunity.

ActivityTaskReference: An ActivityTaskReference is a reference to an Activity Task that is created with reference to an Opportunity.

LeadReference: A LeadReference is a reference to an Opportunity that is created with reference to a Lead.

SalesOrderReference: A SalesOrderReference is a reference to the SalesOrder business document created with reference to an Opportunity.

CustomerQuoteReference: A CustomerQuoteReference is a reference to the CustomerQuote business document created with reference to an Opportunity.

Structure

The BusinessTransactionDocumentReference node is defined by the GDT type OpportunityBusinessTransactionDocumentReferenceElements, which is derived from the GDT BusinessTransactionDocumentReferenceElements.

BusinessTransactionDocumentReference is a GDT of the type BusinessTransactionDocumentReference and Contains the unique reference to a business document, or to an item in a business document.

BusinessTransactionDocumentRelationshipRoleCode is a GDT of the type BusinessTransactionDocumentRelationshipRoleCode and is the role that an Opportunity adopts within the relationship to another business document or business document item.

DataProviderIndicator is a GDT of a type Indicator, Qualifier: DataProvider and contains an Indicator that specifies whether or not an opportunity stores additional data in a relationship to a business document.

The following composition relationships to subordinate nodes exist:

BusinessTransactionDocumentReferenceActualValues 42186 may have a cardinality of 1:c.

There may be a number of Inbound Association Relationships including:

Activities:

AppointmentActivity may have a cardinality of c:cn

An Opportunity has been created with reference to an AppointmentActivity.

EmailActivity may have a cardinality of c:cn

An Opportunity has been created with reference to an EmailActivity.

LetterActivity may have a cardinality of c:cn

An Opportunity has been created with reference to a LetterActivity.

FaxActivity may have a cardinality of c:cn

An Opportunity has been created with reference to a FaxActivity.

PhoneCallActivity may have a cardinality of c:cn

An Opportunity has been created with reference to a PhoneCallActivity.

ActivityTask may have a cardinality of c:cn

An Opportunity has been created with reference to an ActivityTask.

CRM Business Documents

Lead may have a cardinality of c:cn

An Opportunity has been created with reference to a Lead.

Specialization Associations for Navigation:

To business object Activity: Activity may have a cardinality relationship of c:cn.

An Activity (TO) has a reference to an opportunity

To business object SalesOrder: Sales Order may have a cardinality relationship of c:cn.

A sales order has been created with reference to an opportunity.

To business object CustomerQuote: Customer Quote may have a cardinality relationship of c:cn.

A customer quote has been created with reference to an opportunity.

BusinessTransactionDocumentReferenceActualValues

A BusinessTransactionDocumentReferenceActualValues are the actual values of a relationship the opportunity has to a business transaction.

Structure

The BusinessTransactionDocumentReferenceActualValues node is defined by the GDT OpportunityBusinessTransactionDocumentReferenceActualValuesElements, which may contain the following elements: SalesCycleCode, SalesCyclePhaseCode, SalesCyclePhaseStepCode. The SalesCycleCode is a GDT of a type SalesCycleCode and is the coded representation of a sales cycle in which an opportunity exists. The SalesCyclePhaseCode is a GDT of a type SalesCyclePhaseCode and is the coded representation of a phase within a sales cycle in which an opportunity exists. The SalesCyclePhaseStepCode is a GDT of a type SalesCyclePhaseStepCode and is the coded representation of a step within the sale cycle.

Attachment Folder (DO)

An Attachment is an electronic document of any type, the content of which relates to the Opportunity in question.

Structure

The Attachment node is defined by the dependent object Attachment.

Text Collection (DO)

A Text is a collection of texts in natural language with reference to an Opportunity.

Structure

The Text node is defined by the dependent object TextCollection.

BusinessProcessVariantType: A BusinessProcessVariantType defines the character of a business process variant of an Opportunity. It represents a typical process of an Opportunity within a process component from a business point of view.

Structure

The node BusinessProcessVariantType is defined by the GDT type OpportunityBusinessProcessVariantTypeElements, that is derived from BusinessProcessVariantTypeElements (Template), and that may contain the following elements:

BusinessProcessVariantTypeCode, MainIndicator. The BusinessProcessVariantTypeCode is a GDT of a type BusinessProcessVariantTypeCode and is the coded representation of a business process variant of a opportunity. The MainIndicator is a GDT of a type Indicator, Qualifier: Main and contains an Indicator that specifies whether the current BusinessProcessVariantTypeCode is the main variant or not.

The Opportunity uses the following BPVTs:

Standard (Main PVT)

With Sales Assistant (additional)

Integrity Conditions

The following integrity conditions are checked:

One instance of the BusinessProcessVariantType may be flagged as the main

BusinessProcessVariantType

Overview (Query Response Transformation Node)

An Overview is a general view on the Opportunity. Overview provides the information of the Opportunity at a first glance.

Structure

The Overview node is defined by the GDT OpportunityOverviewElements, which may include the following elements: UUID, ID, Name, GroupCode, OriginTypeCode, PriorityCode, LifeCycleStatusCode, PhaseDurationEvaluationStatusCode, ProspectPartyUUID, ProspectPartyID, ProspectPartyPartyFormattedName, ProspectPartyFormattedPostalAddressDescription, MainEmployeeResponsiblePartyUUID, MainemployeeResponsiblePartyID, MainEmployeeResponsiblePartyPartyTypeCode, MainEmployeeResponsibleParty-FormattedName, MainEmployeeResponsibleParty-FormattedPostalAddressDescription, SalesCyclePhaseCode, ExpectedProcessingDatePeriod, ProbabilityPercent, SalesRevenueForecastRelevanceIndicator, ExpectedRevenueAmount. TotalExpectedNetAmount, WeightedExpectedNetAmount, ProspectBudgetAmount. The UUID is a GDT of a type UUID and is the internally assigned UUID for an Opportunity. The ID is a GDT of a type BusinessTransactionDocumentID and is the unique identifier of an Opportunity. The Name is a GDT of a type MediumName and is the short description for an Opportunity. The GroupCode is a GDT of a type OpportunityGroupCode and is the assignment of an Opportunity to a group. From node Root, element GroupCode. The OriginTypeCode is a GDT of a type CustomerTransactionDocumentOriginTypeCode and is the coded representation of an Opportunity's origin. From node Root element OriginTypeCode. PriorityCode is a GDT of a type PriorityCode and is the coded representation of an Opportunity's priority. From node Root, elementPriorityCode. The LifeCycleStatusCode is a GDT of a type OpportunityLifeCycleStatusCode and is the coded representation for the evaluation status of the Opportunity phase duration. From node root, element PhaseDurationEvaluationStatusCode. The ProspectPartyUUID is a GDT of a type UUID and is the unique identifier for a party which has a business interesting the Opportunity. From node Party, element Party UUID. ProspectPartyID is a GDT of a type PartyID and is the identifier for a party which has a business interesting the Opportunity. From node Party, Element PartyID. The ProspectPartyPartytypeCode is a GDT of a type BusinessObjectTypeCode and is the type of party referenced by the attributed ProspectPartyUUID. From node Party, element PartyTypeCode. ProspectPartyFormattedName is a GDT of a type LANGUAGEINDEPENDENT_LongName and is the formatted name for a party which has a business interesting the Opportunity. The ProspectPartyFormattedPostalAddressDescription is a GDT of a type LANGUAGEINDEPENDENT_MEDIUM DESCRIPTION and is the formatted name for a person which has a business interesting the Opportunity. From TO UsedAddress, node FormattedAddress, element Formatted name. The MainEmployeeResponsiblePartyUUID is a GDT of a type UUID and is the unique identifier for an employee which is responsible for the opportunity. From node Party, element PartyUUID. MainEmployeeresponsiblePartyID is a GDT of a type PartyID and is the identifier for an employee which is responsible for the Opportunity. From node Party, element PartyID. The MainEmployeeResponsiblePartyPartytypeCode is a GDT of a type BusinessObjecttypeCode and contains the type of party referenced by the attribute ProspectPartyUUID. From node Party, element PartytypeCode. The MainEmployeeResponsiblePartyFormatted Name is a GDT of a type LANGUAGEINDEPENDENT_LongName and is the formatted name for a party which is responsible for the Opportunity. From TO Party, node Name, element FormattedName. The MainEmployeeResponsiblePartyFormattedPostalAddressDescription is a GDT of a type LANGUAGEINDEPENDENT_MEDIUM_DESCRIPTION and is the formatted name of a person which is responsible for the Opportunity. From TO UsedAddress, node FormattedAddress, element FormattedName. The SalesCyclePhaseCode is a GDT of a type SalesCyclePhaseCode and is the coded representation of a phase with a sales cycle in which an opportunity exists. From node Salescycle, elementSalesCyclePhaseCode. The ExpectedProcessingDatePeriodCode is a GDT of a type SalesCyclePhaseCode and is the coded representation of a phase within a sales cycle in which an opportunity exists. From node SalesCycle, element SalesCyclePhaseCode. The ExpectedProcessingDatePeriod is a GDT of a type ClosedDatePeriod and contains a period in which the Opportunity will probably be processed. From node SalesForecast, element ExpectedProcessingPeriod. The ProbabilityPercent is a GDT of a type Percent, Qualifier: probability and contains the probability of success for an Opportunity expressed as a percentage. From node SalesForecast, element ProbabilityPercent. The SalesRevenueForecastRelevanceIndicator is a GDT of a type Indicator, Qualifier: Relevance and it specifies whether the Opportunity should be included in the turnover forecast or not. From node SalesForecast, element SalesRevenueForecastRelevanceIndicator. The ExpectedRevenueAmount is a GDT of a type Amount GDT, Qualifier: Revenue and contains the anticipated sales volume for an Opportunity. From node SalesForecast, element ExpectedRevenueAmount. The ExpectedNetAmount is a GDT of a type Amount GDT, Qualifier: Net and contains the expected sales volume for an Opportunity, calculated from the total of the item values. From node SalesForecast, element TotalExpectedRevenueAmount. The WeightedExpectedNetAmount is a GDT of a type Amount GDT, Qualifier: Net and contains the weighted expected sales volume for an Opportunity. From node SalesForecast, element WeightedExpectedNetAmount. The ProspectBudgetAmount is a GDT of a type Amount GDT, Qualifier Budget and contains the budget that is available to the customer for investment in the context of this opportunity. From node, SalesForecast, element ProspectBudgetAmount.

Queries

QueryByElements:

Returns a list of all opportunities (root node) found for an ID, a name, a start date, an expected processing date, a success probability, an expected sales volume, a sales cycle, a phase, a party, a party in the specialization EmployeeResponsibleParty, a party in the specialization ProspectParty and a status.

Query elements may be defined by the data type OpportunityOverviewElementsQueryElements. These elements may include: ID, SystemAdministrativeData, CreationBusinessPartner_CommonPersonNameGivenName, CreationBusinessPartner_CommonPersonNameFamilyName, LastChangeBusinessPartner_CommonPersonNameGivenName, LastChangeBusinessPartner_CommonPersonFamilyName, ProcessingTypeCode, PriorityCode, GroupCode, ResultReasonCode, OrigintypeCode, ResultReasonCode, Status, SalesForecastProbabilityPercent, SalesForecastExpectedRevenueAmount, SalesRevenueRelevanceIndicator, SalesForecastExpectedProcessingDatePeriod, SalesCycleSalesCycleCode, SalesCycleSalesCyclePhaseCode, PartyRoleCode, PartyPartyID, PartyEmployeeResponsibleID, PartyProspectPartyID, SalesAndServiceBusinessAreaSalesOrganisationID, ItemProductProductID. The ID is a GDT of a type SystemAdministrativeData. The SystemAdministrativeData is a GDT of the type SystemAdministrativeData. CreationBusinessPartner_CommonPersonNameGivenname is a GDT of a type MediumName and is the first name of the person who has created the Opportunity. The CreationBusinessPartner_CommonPersonName FamilyName is a GDT of a type MediumName and is the last name of the person who has created the Opportunity. The LastChangeBusinessPartner_CommonPersonNameGivenName is a GDT of a type MediumName and contains the first name of the person who has changed the Opportunity. The LastChangeBusinessPartner_CommonPersonNameFamilyName is a GDT of a type Mediumname and contains the last name of the person who has changed the Opportunity. The ProcessingTypeCode is a GDT of a type BusinessTransactionDocumentProcessingtypeCode. The Name is a GDT of a type MediumName. The PriorityCode is a GDT of a type PriorityCode. The GroupCode is a GDT of a type OpportunityGroupCode. The ResultReasonCode is a GDT of a type CustomerTransactionDocumentResultReasonCode. The Status is a GDT of a type Percent, Qualifier: Probability and contains the LifecycleStatusCode, ResultStatusCode, PhaseDurationEvaluationCode, ConsistencyStatusCode and GeneralDateCompletenessStatusCode. SalesForecastProbabilityPercent is a GDT of a type Percent, Qualifier: Probability. SalesForecastExpectedRevenueAmount is a GDT of a type Amount, Qualifier: Revenue. Sales RevenueForecastRelevanceIndicator is a GDT of a type Indicator, Qualifier: Relevance. The SalesForecastExpectedProcessingDatePeriod is a GDT of a type ClosedDatePeriod, Qualifier: Processing. SalesCycleSalesCycleCode is a GDT of a type SaleCycleCode. The SalesCycleSalesCyclePhaseCode is a GDT of a type SalesCyclePhaseCode. The PartyRoleCode is a GDT of a type PartyRoleCode and contains the role of a party that occurs in an opportunity. The PartyPartyID is a GDT of a type PartyID and contains the identification of a party the occurs in an opportunity. The PartyEmployeeResponsiblePartyID is a GDT of a type PartyID. The PartyProspectPartyID is a GDT of a type PartyID and is a party which has a business interesting the Opportunity. The SalesandServiceBusinessAreaSalesOrganisationID is a GDT of a type OrganisationCentreIID. The ItemProductProductID is a GDT of a type ProductID.

AccessControlList (DO)

The AccessControlList is a list of access groups that have access to an Opportunity.

Structure

The AccessControlList node is defined by the dependent object AccessControlList.

DueClearing Business Object

Figures 1, 43:
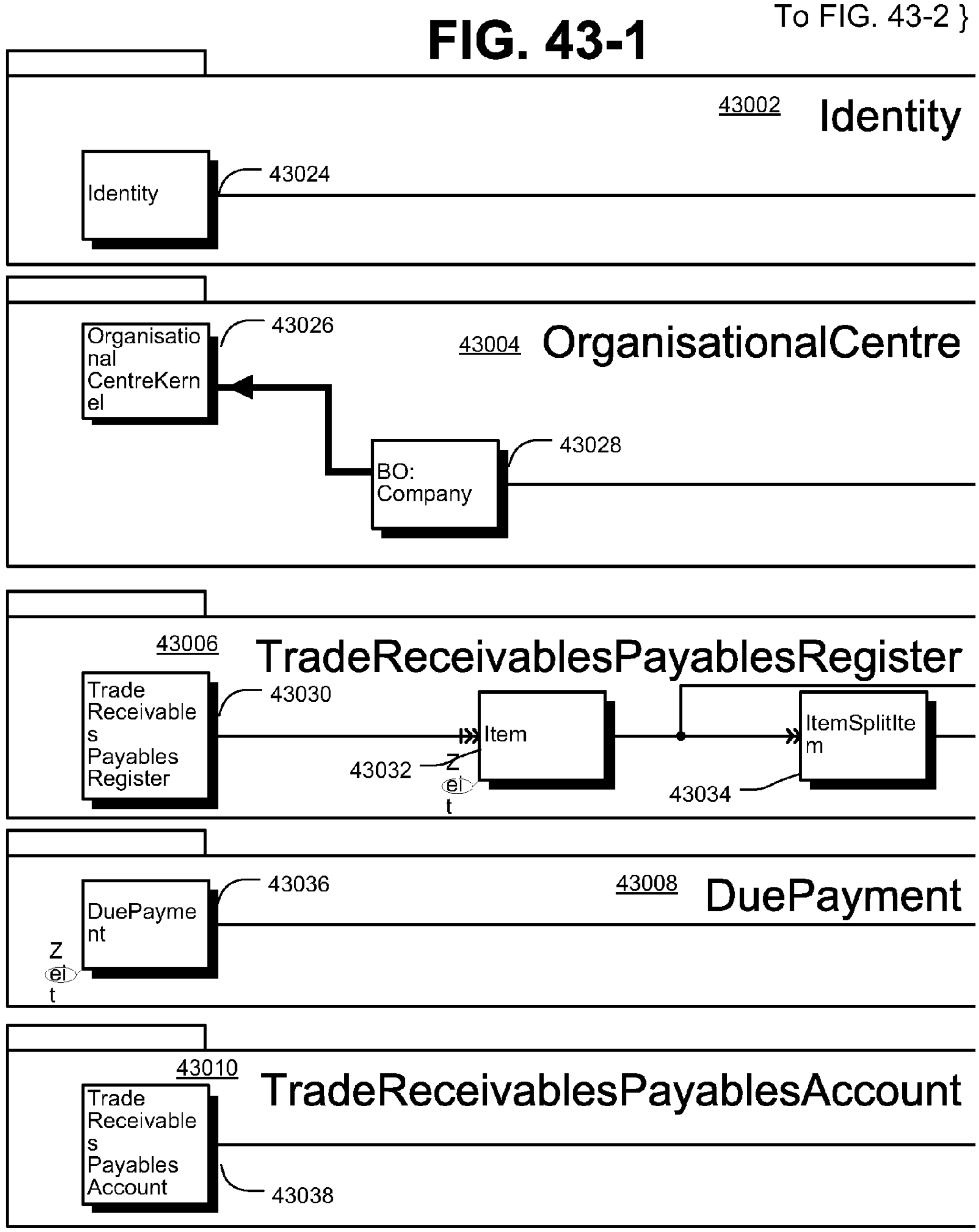
Figures 2, 43:
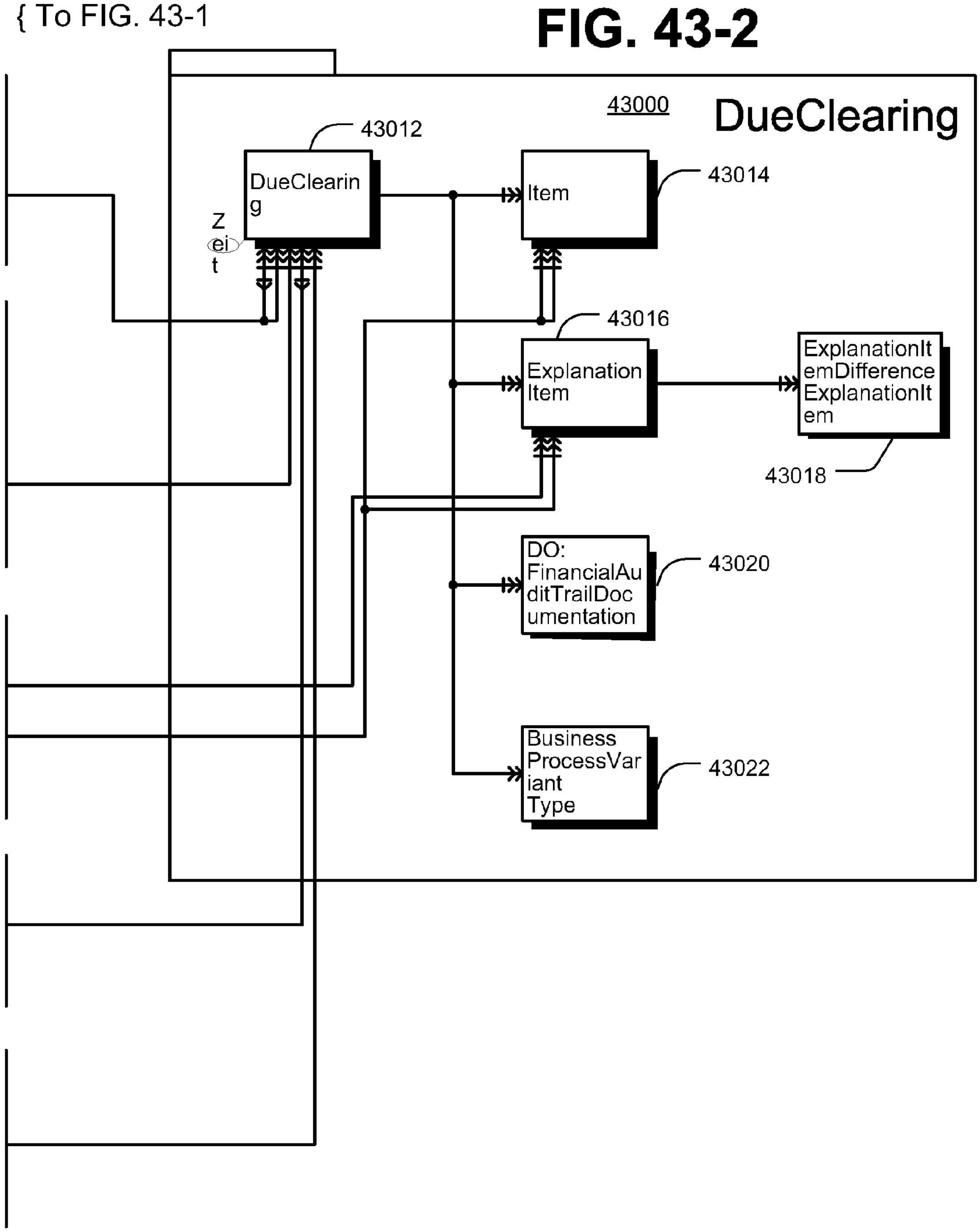

FIGS. 43-1 through 43-2 illustrate one example of an DueClearing business object model 43000. Specifically, this model depicts interactions among various hierarchical components of the DueClearing, as well as external components that interact with the DueClearing (shown here as 43002 through 43010 and 43024 through 43038).

DueClearing is a group of receivables and payables for clearing. The DueClearing business object is part of the Due Item Processing process component. "Clearing" means that the amount of the receivables and payables of a group balance is zero, taking cash discounts and other deductions into account. The "group" is typically payments and invoices that belong together but it can also be credit memos and invoices, or customer and vendor invoices. A group results uniquely from the invoice reference information of a payment. A DueClearing can include, information about the time and execution of clearing, reference to receivables and payables, explanation of all deductions, and documentation of the business transaction for the purpose of auditability of postings in Financial Accounting. DueClearing is represented by the DueClearing node 43012.

Service Interfaces

The DueClearing business object is involved in Process Integration Models that includes: Due Item Processing_Accounting, Customer Invoice Processing_Due Item Processing, Expense and Reimbursement Processing_Due Item Processing, and Supplier Invoice Processing_Due Item Processing.

Service Interface Receivables Payables In

DueItemProcessingReceivablesPayablesIn can determine if the Receivables Payables In service interface is part of the following Process Integration Models that includes: Customer Invoice Processing_Due Item Processing, Expense and Reimbursement Processing_Due Item Processing, and Supplier Invoice Processing_Due Item Processing. The Receivables Payables In service interface is used for the generation and cancellation of receivables and payables.

Create Receivables Payables can be determined by an invoice-related credit memo that can be generated by this operation (TradeReceivablesPayablesRegisterItem or Tax Receivables Payables Register Item) that will be cleared directly by the Due Clearing object if the reference information belongs uniquely to one invoice. The operation is based on the message type Receivables Payables Notification (derived from the TradeReceivablesPayablesRegister and Tax Receivables Payables Register business objects).

Cancel Receivables Payables can be determined by a previously generated receivable or payable that is canceled (Trade Receivables Payables or TaxReceivablesPayables). If a receivable or payable has already been cleared, the clearing may also be canceled before the receivable or payable can be canceled. This is achieved by calling the action "Cancel" at the root node of DueClearing. The operation is based on the message type Cancellation Receivables Payables Notification (derived from the business objects TradeReceivablesPayablesRegister and Tax Receivables Payables Register).

Due Item Processing Payment Accounting Out can be determined by the Payment Accounting Out service interface that is part of the following Process Integration Models that includes, Due Item Processing Accounting. The Payment Accounting Out service interface is used to forward the clearing information between the receivables and payables and tax adjustments to Accounting.

Due Item Processing Payment Accounting Out. Notify Of Payment can be determined by clearing information that is forwarded to Financial Accounting by this operation. The operation is based on message type Payment Accounting Notification (derived from the Accounting Notification business object). The data for this message is obtained directly from the FinancialAccountingAuditTrailDocumentation dependent object that is set within the action Clear.

DueItemProcessingPaymentAccountingOut.RequestPaymentCancellation can be determined by a movement of receivables and payables forwarded by the operation Notify of Payment to Financial Accounting is canceled. The operation is based on message type PaymentCancellationAccountingNotification (derived from the Accounting Notification business object).

Node Structure of DueClearing Business Object

DueClearing (Root Node of DueClearing Business Object)

A group of receivables and payables for clearing. It can include the explanation of a receivables or payables clearing with details about the clearing of two receivables/payables parts.

The elements located directly at the node DueClearing are defined by the IDT type DueClearingElements. In certain implementations these elements include: ID, BaseBusinessTransactionDocumentUUID, BaseBusinessTransactionDocumentReference, TradeReceivablesPayablesAccountUUID, ResponsibleCompanyID, ResponsibleCompanyUUID, CancellationBusinessTransactionDocumentReference, SystemAdministrativeData, BusinessProcessVariantTypeCode, BaseBusinessTransactionDocumentDate, TransactionCurrencyCode, TotalGrossAmount, TotalNetAmount, TotalClearedAmount, TotalCashDiscountAmount, TotalDeductionAmount, TotalWithholdingTaxAmount, TotalBalanceAmount, Status, and UUID.

ID is a unique identifier of DueClearing. ID may be based on GDT BusinessTransactionDocumentID. BaseBusinessTransactionDocumentUUID is universally a unique identifier of DueClearing that is generated by the base business transaction document. Usually a reference to DuePayment and not relevant for manual clearing transactions and may be optional. BaseBusinessTransactionDocumentUUID may be based on GDT UUID.

BaseBusinessTransactionDocumentReference can determine the reference of DueClearing that is generated by the base business transaction document. Usually a reference to DuePayment and not relevant for manual clearing transactions and may be optional. BaseBusinessTransactionDocumentReference may be based on GDT BusinessTransactionDocumentReference.

TradeReceivablesPayablesAccountUUID is universally a unique identifier of the TradeReceivablePayable account for which clearing takes place. TradeReceivablesPayablesAccountUUID may be based on GDT UUID.

ResponsibleCompanyID is an Identifier of the company that is responsible for the clearing transaction. ResponsibleCompanyID may be based on GDT OrganisationalCentreID.

ResponsibleCompanyUUID is universally a unique identifier of the company responsible for the clearing transaction. ResponsibleCompanyUUID may be based on GDT UUID.

CancellationBusinessTransactionDocumentReference can determine the reference to the business transaction or business transaction document that cancels the clearing of receivables and payables and may be optional. CancellationBusinessTransactionDocumentReference may be based on GDT BusinessTransactionDocumentReference.

SystemAdministrativeData can determine administrative data that is stored in a system. This data can include system users and change dates/times. SystemAdministrativeData may be based on GDT SystemAdministrativeData.

BusinessProcessVariantTypeCode is a coded representation of the business process variant. That specializes the possible business trend. BusinessProcessVariantTypeCode and may be based on GDT BusinessProcessVariantTypeCode.

BaseBusinessTransactionDocumentDate can determine the document date for the business transaction document clearing receivables and payables. The document date can between the current date of the clearing document release and the document date of the base business transaction document, which is referenced by Base Business Transaction Document Reference. BaseBusinessTransactionDocumentDate may be based on GDT Date.

TransactionCurrencyCode can determine the currency with the business transaction clearing of receivables and payables that is processed. It normally corresponds to the payment currency, meaning the currency in which the payment of receivables or payables is made. TransactionCurrencyCode may be based on GDT CurrencyCode. All of the following amount totals occur in transaction currency. The currencies of all amounts in transaction currency are always derived from the currency field TransactionCurrencyCode and cannot be changed at the amount itself.

TotalGrossAmount can determine the total of all invoiced amounts in transaction currency. TotalGrossAmount may be based on GDT Amount and may have a Qualifier of Gross.

TotalNetAmount can determine the total of all clearing amounts corrected by the total of all deductions (corresponds to the payment amount in a payment transaction) in transaction currency. TotalNetAmount may be based on GDT Amount and may have a Qualifier of Net.

TotalClearedAmount can determine the total of all clearing amounts in transaction currency. TotalClearedAmount may be based on GDT Amount and may have a Qualifier of Cleared.

TotalCashDiscountAmount can determine the total of all deductions due to cash discount in transaction currency. TotalCashDiscountAmount may be based on GDT Amount and may have a Qualifier of CashDiscount.

TotalDeductionAmount can determine the total of all other deductions in transaction currency. TotalDeductionAmount may be based on GDT Amount and may have a Qualifier of Deduction.

TotalWithholdingTaxAmount can determine the total of all withholding tax amounts in transaction currency. TotalWithholdingTaxAmount may be based on GDT Amount and may have a Qualifier of WithholdingTax.

TotalBalanceAmount can determine the balance of all totals in transaction currency. TotalBalanceAmount may be based on GDT Amount and may have a Qualifier of Balance.

Status controls whether actions can be performed at the root nodes. The element and status values are described in a separate document. Status may be based on IDT DueClearingStatus.

UUID is universally a unique identifier of the DueClearing root node and an alternative key. UUID may be based on GDT UUID.

The following composition relationships to subordinate nodes exist. ExplanationItem 43016 has a cardinality relationship of 1:cn. Item 43014 has a cardinality relationship of 1:cn. DO FinancialAuditTrailDocumentation 43020 has a cardinality relationship of 1:cn. BusinessProcessVariantType 43022 has a cardinality relationship of 1:n.

There may be a number of aggregation relationships. From the business object Identity/node Root to the CreationIdentity business object (or node) there may be a cardinality relationship of 1:cn. CreationIdentity is the identity that created the DueClearing. From the business object Identity/node Root to the LastChangeIdentity business object (or node) there may be a cardinality relationship of c:cn. LastChangeIdentity is the identity that changed the DueClearing in the last time.

There may be a number of aggregation relationships. From the business object Company/node Company business object (or node) to the Company business object (or node) there may be a cardinality relationship of 1:cn. Company Specifies the company that accounts for the business transaction.

There may be a number of inbound aggregation relationships. From the business object TradeReceivablesPayablesAccount/root node business object (or node) to the TradeReceivablesPayablesAccount business object (or node) there may be a cardinality relationship of 1:cn. TradeReceivablesPayablesAccount specifies the Trade Receivables Payables account for which clearing takes place. The TradeReceivablesPayablesAccount is used also for access control to a DueClearing.

There may be a number of inbound aggregation relationships. From the business object DuePayment/root node business object (or node) to the DuePayment business object (or node) there may be a cardinality relationship of c:cn. DuePayment specifies the DuePayment that triggered the generation of the DueClearing. A DueClearing can also be created manually without DuePayment.

There may be a number of inbound aggregation relationships. From the business object BusinessDocumentFlow/Root node to the BusinessDocumentFlow business object (or node) there may be a cardinality relationship of c:cn. BusinessDocumentFlow is a Due Clearing can be a member of a BusinessDocumentFlow.

There may be a number of specialization associations for navigation. From the business object Tax Receivables Payables Register/node Item business object (or node) to the Tax Receivables Payables Register Item business object (or node) there may be a cardinality relationship of 1:cn. TaxReceivablesPayablesRegisterItem is a Due Clearing would create one or more tax receivables payables register Item.

There may be a number of inbound aggregation relationships. From the MainBusinessProcessVariantType business object (or node) to the MainBusinessProcessVariantType business object (or node) there may be a cardinality relationship of 1:1. MainBusinessProcessVariantType is the association to the main Business Process Variant Type.

Void (S&AM action) is an instance of the DueClearing business object that is declared as void by this action. The instance is not deleted for documentation purposes. Once this action has been performed, no other actions can change the business contents of the instance. This action includes, Preconditions and Changes to the status.

Preconditions can include, for example, results from Status & Action Management: that the status variable "Due Clearing Status" has the value "Proposed". Changes to the status, for example, can include the change that sets the status variable Due Clearing Status to "Voided". This action can be performed by all service consumers.

CreateExplanationItemByTradeReceivablesPayablesSplitItemReference (S&AM action) is a new ExplanationItem that is generated on the basis of a receivable and payable that already exists in the system. The generated ExplanationItem references the existing receivable or payable. This action includes, Preconditions, Changes to the object, and Parameters.

Preconditions can include, for example, that a receivable or payable (Trade Receivable Payable Split Item) may already exist. Resulting from the Status & Action Management: The status variable "Due Clearing Status" that has the value "Proposed." Parameters for example, is the action that is performed at one node instance. The action elements are defined by the data type, DueClearing Root AddTradeReceivablesPayablesSplitItemByRef ActionElements. In certain implementations these elements include, AddTRPSplitItemReference.

AddTRPSplitItemReference may be based on GDT TradeReceivablesPayablesSplitItemReference. This action can be performed by all service consumers.

ClearTradeReceivablesPayablesSplitItems (S&AM action) is the referenced TradeReceivablesPayables that is cleared by the action "Clear". SplitItem is generated for a partial clearing. Tax adjustments (due to a cash discount) are generated in TaxReceivablesPayables.

Before the change of status to be completed, which triggers the transfer of clearing information to Accounting, the FinancialAuditTrailDocumentation dependent object is filled with values. The dependent object is maintained due to the obligation to produce supporting documents and can be used as the only source to the structure of the PaymentAccountingNotification message type. This action can include, Preconditions, Changes to the object, Changes to other objects, and Changes to the status.

Preconditions can include, for example, results from Status & Action Management: that the status variable "Due Clearing Status" has the value "Proposed". In addition, the status variable DueClearingError Status may have the value "No Errors" and the status variable Clearing Explanation Errors the value "No errors in all items". Changes to the object for example, can generate DueClearingItems and FinancialAuditTrailDocumentation.

Changes to other objects for example, can be the referenced TradeReceivablesPayables business object that is cleared. A SplitItem is generated during a partial clearing. If there are tax adjustments due to a cash discount, these are forwarded to the business object TaxReceivablesPayables. The information about the clearing is forwarded to Accounting using the outbound agent.

Changes to the status, can include the change that sets the status variable Due Clearing Status to "Completed". This action can be performed by all service consumers.

Cancel (S&AM action) results in the previously performed action "Clear", canceled. The outbound agent for transferring information to Accounting is called, tax adjustments are canceled (BO TaxReceivablesPayables), and if necessary, a SplitItem that is generated by "Clear" is deleted. This action can include, Preconditions, Changes to other objects, and Changes to the status.

Preconditions can include, for example, results from Status & Action Management: that the status variable Due Clearing Status has the value "Completed". This means that the action "Clear" may have been performed earlier.

Changes to other objects for example, can include the change that clears the referenced business object TradeReceivablesPayables that is canceled. If a SplitItem was generated due to a partial clearing, this is deleted. If tax adjustments were carried out due to a cash discount, these are canceled. (The cancellation is forwarded to the TaxReceivablesPayables business object). Information about the cancellation of clearing is forwarded to the Accounting using the outbound agent.

Changes to the status, can include the change that sets the status variable Due Clearing Status to "Canceled". This action can be performed by all service consumers.

ApplyClearingStrategy (S&AM action) minimizes the TotalBalanceAmount at the root node by distributing possible small differences to receivables or payables. The configured clearing strategy is used for this. This action can include, Preconditions and Changes to the object. Preconditions can include, for example, that the DueClearing has the status "Proposed." Changes to the object, depending on the clearing strategy, can include the change that distributes the individual ClearingExplanationItems. One ClearingExplanationItemDifferentExplanationItem is generated for each ClearingExplanationItem that leads to the minimization of the TotalBalanceAmount. This action can be performed by all service consumers.

DistributePaymentDifferenceExplanationAmount (S&AM action) distributes a predefined deduction amount to the individual ClearingExplanationItems of a DueClearing. The type of distribution is based on the same distribution strategy as that of small differences. (see also ApplyClearingStrategy). This action can include, Preconditions, Changes to the object, and Parameters. Preconditions can include, for example, that the DueClearing has the status "Proposed."Changes to the object for example, can include the change in which the DeductionAmount predefined in the action is distributed to the individual ExplanationItems according to the DueClearing distribution strategy. One new ExplanationItemDifferenceExplanationItem is generated for each ClearingExplanationItem. The PaymentDifferenceReasonCode transferred in the input parameter is adopted at all new ExplanationItemDifferenceExplanationItem.

Parameters are the action elements that are defined by the data type, DueClearingDistributeDeductionAmountActionElements. In certain implementations these elements include: Amount and PaymentDifferenceReasonCode.

Amount can determine the deduction amount that is to be distributed. Amount may be based on GDT Amount. PaymentDifferenceReasonCode is a code for the reason of the deduction. PaymentDifferenceReasonCode may be based on GDT PaymentDifferenceReasonCode. This action can be performed by all service consumers.

CreateByReferenceForWriteOff, can create a Due Clearing root and Clearing Explanation Items. The explanation items refer to the open Trade Receivable Payable Split Items for the given TRP-Account, to clear the amount for which no payment is expected. This action can include, Preconditions, Changes to the object, Preconditions can include, for example, that open receivable or payables (Trade Receivable Payable Split Item) may exist for the given TRP-Account. No precondition from S&AM. Changes to the object for example, can include the change that a new Clearing Object that is created with ExplanationItem node for each Trade Receivable Payable Split Item to be cleared partially or fully. Changes to other objects for example, can include the change that trade Receivable Payable Split Item that would be cleared and new Trade Receivable Payable Split Item would be created. Parameters are the action elements that are defined by the data type DueClearing CreateByReferenceForWriteOff ActionElements. In certain implementations these elements include: ExpectedPaymentAmount, ExpectedPaymentPercent, TradeReceivablesPayablesAccountReference, and PaymentDifferenceReasonCode.

ExpectedPaymentAmount can determine the part of the Open Amount on the TRP Account expected to be paid. ExpectedPaymentAmount may be based on GDT Amount.

ExpectedPaymentPercent can determine the percentage of the Open Amount on the TRP Account expected to be paid. ExpectedPaymentPercent may be based on GDT Percent.

TradeReceivablesPayablesAccountReference can determine which write off is to be done. TradeReceivablesPayablesAccountReference may be based on GDT BusinessTransactionDocumentReference.

PaymentDifferenceReasonCode is a code for the reason of the Writeoff. PaymentDifferenceReasonCode may be based on GDT PaymentDifferenceReasonCode).

CreateByReferenceFromCancelledDueClearing creates a new Due Clearing Object. The new due clearing object consists of the items of an existing clearing object which has been cancelled but needs to be corrected. This action can include Preconditions, Changes to the object, and Parameters. Preconditions can include, for example, that the referenced DueClearing may be cancelled. Changes to the object for example, can include the change that a new DueClearing is created with the status 'Open.' Parameters are the action elements can be defined by the data type, DueClearing CreateByReferenceFromCancelledDueClearing ActionElements. In certain implementations these elements include CancelledDueClearingReference.

CancelledDueClearingReference can be the reference to the cancelled Due Clearing object which needs to be cloned. CancelledDueClearingReference may be based on GDT BusinessTransactionDocumentReference. This action can be performed by all service consumers.

CreateWithReference creates a new Due Clearing root and explanation items. The explanation item refer to open Trade ReceivablePayableRegisterItem or Trade ReceivablePayableRegisterItemSplit items list that is given. This action can include, Preconditions, Changes to the object, and Parameters. Preconditions can include, for example, that the TradeReceivablePayableRegisterItemSplit items should have the clearing status as 'Open'. Their original document currency or their payment currency is equal to the TransactionCurrencyCode in the parameters. Changes to the object for example, can include the change that a new Due Clearing is created with the LifeCycle status 'Open'. Parameters are the action elements that are defined by the data type, DueClearing CreateWithReferenceForTRPSPClearingActionElements. In certain implementations these elements include: TransactionCurrencyCode and TradeReceivablesPayablesAccountBusinessKey.

TransactionCurrencyCode can determine the currency in which clearing has to take place. TransactionCurrencyCode may be based on GDT CurrencyCode.

TradeReceivablesPayablesAccountBusinessKey can assign an alternative key for accessing TradeReceivablesPayablesAccount using CompanyID and BusinessPartnerInternalID. TradeReceivablesPayablesAccount can include, CompanyID and BusinessPartnerID.

CompanyID may be based on GDT OrganisationalCentreID. BusinessPartnerID may be based on GDT BusinessPartnerInternalID. This action can be performed by all service consumers.

Queries

QueryByElements provides a list of all DueClearing that meet the selection criteria specified by the query elements. The query elements are defined by the data type, DueClearingElementsQueryElements. In certain implementations these elements include: ID, ResponsibleCompanyID, BaseBusinessTransactionDocumentReference, BusinessProcessVariantTypeCode, BaseBusinessTransactionDocumentDate, CancellationBusinessTransactionDocumentReference, and Status ID may be based on GDT BusinessTransactionDocumentID and may be optional. ResponsibleCompanyID may be based on GDT OrganisationalCentreID and may be optional. BaseBusinessTransactionDocumentReference may be based on GDT BusinessTransactionDocumentReference and may be optional. BusinessProcessVariantTypeCode may be based on GDT BusinessProcessVariantTypeCode and may be optional.

BaseBusinessTransactionDocumentDate may be based on GDT Date. CancellationBusinessTransactionDocumentReference may be based on GDT BusinessTransactionDocumentReference and may be optional. Status may be based on IDT DueClearingStatus and may be optional.

QueryByReconciliationElements provides a list of all DueClearings which uses the specified Company and AccountingTransactionDate on the associated FinancialAuditTrailDocumentations. This query can be used for reconciliation with Process Component Financial Accounting. The query elements are defined by the type IDT: DueClearingReconciliationElementsQueryElements. In certain implementations these elements include: FinancialAuditTrailDocumentationCompanyID and FinancialAuditTrailDocumentationAccountingTransactionDate.

FinancialAuditTrailDocumentationCompanyID may be based on GDT: OrganisationalCentreID and may be optional. FinancialAuditTrailDocumentationAccountingTransactionDate and may based on GDT Date and may have a Qualifier of AccountingTransaction and may be optional.

ExplanationItem

The explanation about the receivable or payable clearing amounts regarding the business transaction that generates an item due for payment, for example, the incoming invoice or the payment. An ExplanationItem contains the clearing amount and the deficits accepted and established within clearing for each business transaction. The elements located directly at the node ExplanationItem are defined by the type, IDT: DueClearingExplanationItemElements. In certain implementations these elements include: ID, ClearedTradeReceivablesPayablesRegisterItemReference, ClearedTradeReceivablesPayablesRegisterItemPropertyMovementDirectionCode, ClearedTradeReceivablesPayablesRegisterItemDueCategoryCode, ClearedTradeReceivablesPayablesRegisterItemSplitItemOverdueDuration, ClearedTradeReceivablesPayablesRegisterItemSplitItemLastCashDiscountOverdueDuration, ClearedTradeReceivablesPayablesRegisterItemSplitItemMaximumCash DiscountOverdueDuration, ClearedTradeReceivablesPayablesRegisterItemTypeCode, TransactionCurrencyCode, OriginalDocumentCurrencyCode, OriginalDocumentCurrencyGrossAmount, GrossAmount, OriginalDocumentCurrencyNetAmount, NetAmount, CashDiscountAmount, OriginalDocumentCurrencyCashDiscountAmount, ClearedTradeReceivablesPayablesRegisterItemSplitItemLastCashDiscountAmount, ClearedTradeReceivablesPayablesRegisterItemSplitItemCashDiscountAmount, ClearedTradeReceivablesPayablesRegisterItemSplitItemMaximumCashDiscountAmount, ClearedTradeReceivablesPayablesRegisterItemSplitItemLastCashDiscountPercent, ClearedTradeReceivablesPayablesRegisterItemSplitItemCashDiscountPercent, ClearedTradeReceivablesPayablesRegisterItemSplitItemMaximumCashDiscountPercent, OriginalDocumentCurrencyClearingAmount, ClearingAmount, TotalDeductedAmount, OriginalDocumentCurrency TotalDeductedAmount, WithholdingTaxAmount, OriginalDocumentCurrency, WithholdingTaxAmount, CashDiscountDeterminationDate, Status, and UUID ID is a unique identifier of ExplanationItem. ID may based on GDT BusinessTransactionDocumentItemID.

ClearedTradeReceivablesPayablesRegisterItemReference can be the reference to the receivable or payable to which the clearing explanation refers. ClearedTradeReceivablesPayablesRegisterItemReference may be based on GDT BusinessTransactionDocumentReference.

ClearedTradeReceivablesPayablesRegisterItemPropertyMovementDirectionCode can specify whether the referenced TradeReceivablesPayablesItem is an increase or decrease of receivables or payables and is Mandatroy. ClearedTradeReceivablesPayablesRegisterItemPropertyMovementDirectionCode may be based on GDT PropertyMovementDirectionCode. Saved redundant and corresponds to the PropertyMovementDirectionCode of the referenced TRPItem.

ClearedTradeReceivablesPayablesRegisterItemDueCategoryCode can specify whether the referenced TradeReceivablesPayablesRegisterItem is a receivable or a payable. ClearedTradeReceivablesPayablesRegisterItemDueCategoryCode may be based on GDT DueCategoryCode. Saved redundant. Corresponds to the DueCategoryCode of the referenced TRPItem.

ClearedTradeReceivablesPayablesRegisterItemSplitItemOverdueDuration can determine the number of days in arrears, this means, the difference between the document date of the clearing and the due date of the receivable or payable taking account of cash discount days and tolerance days and may be optional. Unit of measurement: Days. ClearedTradeReceivablesPayablesRegisterItemSplitItemOverdueDuration may be based on GDT DAY_Duration and may have a Qualifier of Overdue.

ClearedTradeReceivablesPayablesRegisterItemSplitItem-LastCashDiscountOverdueDuration can determine number of days in arrears since the last cash discount period has passed. This means, the difference between the execution date of the payment (PaymentExecutionDate) and the date of the last cash discount period of the receivable or payable and may be optional. ClearedTradeReceivablesPayablesRegisterItemSplitItem-LastCashDiscountOverdueDuration may be based on GDT DAY_Duration, and may have a Qualifier of Overdue.

ClearedTradeReceivablesPayablesRegisterItemSplitItem-MaximumCashDiscountOverdueDuration can determine the number of delay days since applying the discount payment period for the maximum discount payment, i.e. the difference between the remark date of the payment (PaymentExecutionDate) and the date of the discount payment period for the maximum discount payment of the demand and/or commitment and may be optional. ClearedTradeReceivablesPayablesRegisterItemSplitItem-MaximumCashDiscountOverdueDuration may be based on GDT DAY_Duration and may have a Qualifier of Overdue.

ClearedTradeReceivablesPayablesRegisterItemTypeCode can determine the type of the TradeReceivablesPayablesRegisterItem. ClearedTradeReceivablesPayablesRegisterItemTypeCode may be based on GDT TradeReceivablesPayablesRegisterItemTypeCode.

TransactionCurrencyCode can determine the currency with which the business transaction clearing of receivables and payables is processed. It normally corresponds to the payment currency, meaning the currency in which the payment of receivables or payables is made. It can be identical to the TransactionCurrencyCode of the root node. TransactionCurrencyCode may be based on GDT CurrencyCode. The TransactionCurrencyCode may match the TransactionCurrencyCode entered at the root node. Currencies of all amounts in transaction currency are always derived from the currency field TransactionCurrencyCode and cannot be changed at the amount itself.

OriginalDocumentCurrencyCode can determine the currency of the original document, for example, the document currency of the invoice to which clearing refers to. It can differ from the clearing currency and can be different at each ExplanationItem. OriginalDocumentCurrencyCode may be based on GDT CurrencyCode.

OriginalDocumentCurrencyGrossAmount can determine the amount that is to be cleared or cleared amount in the currency of the base business document. This can be an invoice, credit memo, number, or a payment. OriginalDocumentCurrencyGrossAmount may be based on GDT Amount and may have a Qualifier of Gross.

GrossAmount can determine the amount that is to be cleared or cleared amount in transaction currency. GrossAmount may be based on GDT Amount and may have a Qualifier of Gross.

OriginalDocumentCurrencyNetAmount can determine the net amount that is to be cleared or cleared net amount in the currency of the base business document corrected by the deductions: OriginalDocumentCurrencyNetAmount may be based on GDT Amount and may have a Qualifier of Net.

NetAmount can determine the amount that is to be cleared or cleared amount in transaction currency corrected by the deductions. NetAmount may be based on GDT Amount and may have a Qualifier of Net.

CashDiscountAmount can claim cash discount amount or cash discount amount to be claimed in transaction currency. CashDiscountAmount may be based on GDT Amount and may have a Qualifier of CashDiscount.

OriginalDocumentCurrencyCashDiscountAmount can claim cash discount amount or amount to be claimed in the currency of the base business document. This can be an invoice or a credit memo. OriginalDocumentCurrencyCashDiscountAmount may be based on GDT Amount, and may have a Qualifier of CashDiscount.

ClearedTradeReceivablesPayablesRegisterItemSplitItemLastCashDiscountAmount can specify the last drawn discount payment period in transaction currency and may be optional. ClearedTradeReceivablesPayablesRegisterItemSplitItemLastCashDiscountAmount may be based on GDT Amount and may have a Qualifier of CashDiscount.

ClearedTradeReceivablesPayablesRegisterItemSplitItemCashDiscountAmount which could be drawn in transaction currency and may be optional. ClearedTradeReceivablesPayablesRegisterItemSplitItemCashDiscountAmount may be based on GDT Amount and may have a Qualifier of CashDiscount.

ClearedTradeReceivablesPayablesRegisterItemSplitItemMaximumCashDiscountAmount can determine the maximum payment discount amount in Transaction Currency, which would ever have been possible and may be optional. ClearedTradeReceivablesPayablesRegisterItemSplitItemMaximumCashDiscountAmount may be based on GDT Amount and may have a Qualifier of CashDiscount.

ClearedTradeReceivablesPayablesRegisterItemSplitItemLastCashDiscountPercent can represent the cash discount amount, which could have been drawn in the last discount payment period, in percent of the GrossAmount and may be optional. ClearedTradeReceivablesPayablesRegisterItem-SplitItemLastCashDiscountPercent may be based on GDT Percent and may have a Qualifier of CashDiscount.

ClearedTradeReceivablesPayablesRegisterItemSplitItemCashDiscountPercent can represent the payment discount amount, which could be drawn, in percent of the GrossAmount and may be optional. ClearedTradeReceivablesPayablesRegisterItemSplitItemCashDiscountPercent may be based on GDT Percent and may have a Qualifier of CashDiscount.

ClearedTradeReceivablesPayablesRegisterItemSplitItemMaximumCashDiscountPercent can determine the maximum payment discount amount in TransactionCurrency, which would ever have been possible, in percent of the GrossAmount and may be optional. ClearedTradeReceivablesPayablesRegisterItemSplitItemMaximumCashDiscountPercent may be based on GDT Percent and may have a Qualifier of CashDiscount.

OriginalDocumentCurrencyClearingAmount can determine the amount to be cleared or cleared amount in the currency of the base business document. OriginalDocumentCurrencyClearingAmount may be based on GDT Amount.

ClearingAmount can determine the amount to be cleared or cleared amount in TransactionCurrency. ClearingAmount may be based on GDT Amount.

TotalDeductedAmount can determine the total of all other non-cash discount deductions in transaction currency. TotalDeductedAmount may be based on GDT Amount and may have a Qualifier of Deducted.

OriginalDocumentCurrency TotalDeductedAmount can determine the total of all other non-cash discount deductions in the currency of the base business document. OriginalDocumentCurrency TotalDeductedAmount may be based on GDT Amount and may have a Qualifier of Deduction.

WithholdingTaxAmount can determine the withholding tax amount in transaction currency. WithholdingTaxAmount may be based on GDT Amount and may have a Qualifier of WithholdingTax.

OriginalDocumentCurrencyWithholdingTaxAmount can determine the withholding tax amount in the currency of the base business document. OriginalDocumentCurrencyWithholdingTaxAmount may be based on GDT Amount and may have a Qualifier of WithholdingTax.

CashDiscountDeterminationDate can determine the date on which the referenced TradeReceivablesPayablesRegisterItemSplitItem has been paid. It is also the keydate for the cash discount amount calculation. CashDiscountDeterminationDate may be based on GDT Date.

Status can determine whether actions can be performed at the root nodes. Elements and status values are described in a separate document. Status may be based on IDT DueClearingExplanationItemStatus.

UUID is universally a unique identifier of the ExplanationItem and an alternative key. UUID may be based on GDT UUID.

The following composition relationships to subordinate nodes exist. ExplanationItemDifferenceExplanationItems 43018 has a cardinality relationship of 1:cn.

There may be a number of inbound aggregation relationships. From the business object TradeReceivablesPayablesRegister/node to the ClearedTradeReceivablePayableSplitItem business object (or node) there may be a cardinality relationship of 1:cn. ClearedTradeReceivablePayableSplitItem is a reference to exactly one receivable or payable that should be cleared.

There may be a number of inbound aggregation relationships. From the business object TradeReceivablesPayablesRegister/node TradeReceivablesPayablesRegisterItem to the ClearedTradeReceivablePayableItem business object (or node) there may be a cardinality relationship of 1:cn. ClearedTradeReceivablePayableItem is a reference to exactly one receivable or payable that should be cleared.

ExplanationItemDifferenceExplanation Item

The explanation of a deficit between the amount expected from an invoice, corrected by the active cash discount and the cleared receivable or payable.

The elements located directly at the ExplanationItemDifferenceExplanationItem node are defined by the type, IDT: DueClearingExplanationItem-DifferenceExplanationItemElements. In certain implementations these elements include: ID, Amount, OriginalDocumentCurrencyAmount, PaymentDifferenceReasonCode, and UUID.

ID is a unique identifier of ExplanationItemDifferenceExplanationItem. ID may be based on GDT BusinessTransactionDocumentItemID.

Amount may be based on the amount of the adjustment of a payment in payment currency. Amount may be based on GDT Amount.

OriginalDocumentCurrencyAmount can determine the amount of the adjustment of a payment in original document currency. OriginalDocumentCurrencyAmount may be based on GDT Amount.

PaymentDifferenceReasonCode is a Coding for the reason of the payment difference and may be optional. PaymentDifferenceReasonCode may be based on GDT PaymentDifferenceReasonCode.

UUID is universally a unique identifier of the ExplanationItemDifferenceExplanationItem and an alternative key. UUID may be based on GDT UUID.

Item

A clearing item that assigns the receivable part to be cleared to the respective payable part. ExplanationItem and Item are connected equally to the root node and explains on which basis the different receivables and payables grouped in DueClearing are paired and cleared in the Item. The elements located directly at the node Item are defined by the type, IDT: DueClearingItemElements. In certain implementations these elements include: ID and TransactionCurrencyCode.

ID is a unique identifier of Item. ID may be based on GDT BusinessTransactionDocumentItemID. TransactionCurrencyCode can specify the currency in which the business transaction is processed. TransactionCurrencyCode may be based on GDT CurrencyCode.

The TransactionCurrencyCode may match the TransactionCurrencyCode entered at the root node. In certain implementations these elements include: ClearedTradeReceivablesPayablesRegisterItemBaseBusinessTransaction DocumentReference, ClearedTradeReceivablesPayablesRegisterItemSplitItemUUID, ClearedTradeReceivablesPayablesRegisterItemSplitItemID, ClearedPropertyMovementDirectionCode, ClearedDueCategoryCode, ClearedTradeReceivablesPayablesRegisterItemTypeCode, ClearedGrossAmount, ClearedOriginalDocumentCurrencyGrossAmount, ClearedCashDiscountAmount, ClearedOriginalDocumentCurrencyCashDiscountAmount, ClearedTotalDeductionAmount, ClearedOriginalDocumentCurrencyTotalDeductionAmount, ClearedWithholdingTaxAmount, ClearedOriginalDocumentCurrencyWithholdingTaxAmount, ClearedByTradeReceivablesPayablesRegisterItemBaseBusinessTransactionDocumentReference, ClearedByTradeReceivablesPayablesRegisterItemSplitItemUUID, ClearedByTradeReceivablesPayablesRegisterItemSplitItemID, ClearedByPropertyMovementDirectionCode, ClearedByDueCategoryCode, ClearedByTradeReceivablesPayablesRegisterItemTypeCode, ClearedByGrossAmount, ClearedByOriginalDocumentCurrencyGrossAmount, ClearedByCashDiscountAmount, ClearedByOriginalDocumentCurrencyCashDiscountAmount, ClearedByTotalDeductionAmount, ClearedByOriginalDocumentCurrencyTotalDeductionAmount, ClearedByWithholdingTaxAmount, ClearedByOriginalDocumentCurrencyWithholdingTaxAmount, and UUID.

ClearedTradeReceivablesPayablesRegisterItemBaseBusinessTransactionDocumentReference can be the reference to the receivable or payable to be cleared or the base business document, which has generated the receivable or payable, to which the item refers to. ClearedTradeReceivablesPayablesRegisterItemBaseBusinessTransactionDocumentReference may be based on GDT BusinessTransactionDocumentReference.

ClearedTradeReceivablesPayablesRegisterItemSplitItemUUID is universally a unique identifier of a separated part of a receivable or payable to be cleared to which the item refers. ClearedTradeReceivablesPayablesRegisterItemSplitItemUUID may be based on GDT UUID.

ClearedTradeReceivablesPayablesRegisterItemSplitItemID is a unique identifier of a separated part of a cleared receivable or payable to which the item refers. ClearedTradeReceivablesPayablesRegisterItemSplitItemID may be based on GDT BusinessTransactionDocumentSplitItemItemID.

ClearedPropertyMovementDirectionCode can specify whether the referenced TradeReceivablesPayablesSplitItem is an increase or decrease of a receivable or a payable part. ClearedPropertyMovementDirectionCode may be based on GDT PropertyMovementDirectionCode. Saved redundant and corresponds to the PropertyMovementDirectionCode of the referenced TRPItem.

ClearedDueCategoryCode can specify the due category of the item: Receivable or payable. ClearedDueCategoryCode may be based on GDT DueCategoryCode. Saved redundant and corresponds to the MovementDirectionCode of the referenced TRPItem.

ClearedTradeReceivablesPayablesRegisterItemTypeCode can determine the type of the TradeReceivablesPayablesRegisterItem. ClearedTradeReceivablesPayablesRegisterItemTypeCode may be based on GDT TradeReceivablesPayablesRegisterItemTypeCode.

ClearedGrossAmount can determine the clearing amount in transaction currency. ClearedGrossAmount may be based on GDT Amount and may have a Qualifier of Gross.

ClearedOriginalDocumentCurrencyGrossAmount can determine the clearing amount in the currency of the original business transaction. ClearedOriginalDocumentCurrencyGrossAmount may be based on GDT Amount and may have a Qualifier of Gross.

ClearedCashDiscountAmount can determine the cash discount amount in transaction currency. ClearedCashDiscountAmount may be based on GDT Amount and may have a Qualifier of CashDiscount.

ClearedOriginalDocumentCurrencyCashDiscountAmount can determine the cash discount amount in the currency of the original business transaction. ClearedOriginalDocumentCurrencyCashDiscountAmount may be based on GDT Amount and may have a Qualifier of CashDiscount.

ClearedTotalDeductionAmount can determine the total deductions when clearing the business document. ClearedTotalDeductionAmount may be based on GDT Amount and may have a Qualifier of Deduction.

ClearedOriginalDocumentCurrencyTotalDeductionAmount can determine the total deduction amount in the currency of the original business transaction. ClearedOriginalDocumentCurrencyTotalDeductionAmount may be based on GDT Amount and any have a Qualifier of Deduction.

ClearedWithholdingTaxAmount can determine the withholding tax amount. ClearedWithholdingTaxAmount may be based on GDT Amount and may have a Qualifier of WithholdingTax.

ClearedOriginalDocumentCurrencyWithholdingTaxAmount can determine the withholding tax amount in the currency of the original business transaction. ClearedOriginalDocumentCurrencyWithholdingTaxAmount may be based on GDT Amount and may have a Qualifier of WithholdingTax).

ClearedByTradeReceivablesPayablesRegisterItemBaseBusinessTransactionDocumentReference can be the reference to the clearing receivable or payable or the base business document, which has generated the receivable or payable, to which the item refers. ClearedByTradeReceivablesPayablesRegisterItemBaseBusinessTransactionDocumentReference may be based on GDT BusinessTransactionDocumentReference.

ClearedByTradeReceivablesPayablesRegisterItemSplitItemUUID is universally a unique identifier of a separated part of a clearing receivable or payable to which the item refers.

ClearedByTradeReceivablesPayablesRegisterItemSplitItemUUID may be based on GDT UUID. ClearedByTradeReceivablesPayablesRegisterItemSplitItemID is a unique identifier of a separated part of a clearing receivable or payable to which the item refers.

ClearedByTradeReceivablesPayablesRegisterItemSplitItemID may be based on GDT BusinessTransactionDocumentItemSplitItemID.

ClearedByPropertyMovementDirectionCode can specify whether the referenced TradeReceivablesPayablesSplitItem is an increase or decrease of a receivable or a payable part. ClearedByPropertyMovementDirectionCode may be based on GDT PropertyMovementDirectionCode. Saved redundant and corresponds to the PropertyMovementDirectionCode of the referenced TRPItem.

ClearedByDueCategoryCode can specify the due category of the item: Receivable or payable. ClearedByDueCategoryCode may be based on GDT DueCategoryCode.

ClearedByTradeReceivablesPayablesRegisterItemTypeCode can determine the type of the TradeReceivablesPayablesRegisterItem.

ClearedByTradeReceivablesPayablesRegisterItemTypeCode may be based on GDT TradeReceivablesPayablesRegisterItemTypeCode.

ClearedByGrossAmount can determine the clearing amount in transaction currency. ClearedByGrossAmount may be based on GDT Amount and may have a Qualifier of Gross.

ClearedByOriginalDocumentCurrencyGrossAmount can determine the clearing amount in the currency of the original business document. ClearedByOriginalDocumentCurrencyGrossAmount may be based on GDT Amount and may have Qualifier of Gross.

ClearedByCashDiscountAmount can determine the cash discount amount in transaction currency. ClearedByCashDiscountAmount may be based on GDT Amount and may have a Qualifier of CashDiscount.

ClearedByOriginalDocumentCurrencyCashDiscountAmount can determine the cash discount amount in the currency of the original business transaction. ClearedByOriginalDocumentCurrencyCashDiscountAmount may be based on GDT Amount, and may have a Qualifier of CashDiscount.

ClearedByTotalDeductionAmount can determine the total deductions when clearing the business document. ClearedByTotalDeductionAmount may be based on GDT Amount and may have a Qualifier of Deduction.

ClearedByOriginalDocumentCurrencyTotalDeductionAmount can determine the total deduction amount in the currency of the original business transaction. ClearedByOriginalDocumentCurrencyTotalDeductionAmount may be based on GDT Amount and may have a Qualifier of Deduction.

ClearedByWithholdingTaxAmount can determine the withholding tax amount.

ClearedByWithholdingTaxAmount may be based on GDT Amount and may have a Qualifier of WithholdingTax.

ClearedByOriginalDocumentCurrencyWithholdingTaxAmount can determine the withholding tax amount in the currency of the original business transaction. ClearedByOriginalDocumentCurrencyWithholdingTaxAmount may be based on GDT Amount and may have a Qualifier of WithholdingTax.

UUID is universally a unique identifier of the item and an alternative key. UUID may be based on GDT UUID.

There may be a number of inbound aggregation relationships. From the business object TradeReceivablePayablesRegister/node TradeReceivablesPayablesRegisterItemSplitItem to the ClearedByTradeReceivablesPayablesRegisterItemSplitItem business object (or node) there may be a cardinality relationship of 1:cn. ClearedByTradeReceivablesPayablesRegisterItemSplitItem is a reference to exactly one TradeReceivablesPayablesRegisterItemSplitItem. The part of a receivable or payable that is used to clear another part. From the business object TradeReceivablePayablesRegister/node TradeReceivablesPayablesRegisterItemSplitItem to the ClearedTradeReceivablesPayablesRegisterItemSplitItem business object (or node) there may be a cardinality relationship of 1:cn. ClearedTradeReceivablesPayablesRegisterItemSplitItem is a reference to exactly one TradeReceivablesPayablesRegisterItemSplitItem. The part of a receivable or payable that is cleared by another part.

The connection of two receivable/payable parts takes place in the form that taking account of the proportional cash discount and other deductions, all amounts balance to zero.

BusinessProcessVariantType

A BusinessProcessVariantType defines the character of a business process variant of the Due Clearing. It represents a typical way of processing of a DueClearing within the process component from a business point of view.

It is the configuration of a Process Component that belongs exactly to one process component. A process component is a software package that realizes a business process and exposes its functionality as services. The functionality contains business transactions. A process component contains one or more semantically related business objects and the business project belonging to exactly one process component.

The elements located directly at the node BusinessProcessVariantType are defined by the data type, BusinessProcessVariantTypeElements, derived from BusinessProcessVariantTypeElements (Template). In certain implementations these elements include: BusinessProcessVariantTypeCode and MainIndicator. Only one of the instances of the BusinessProcessVariantType is allowed to be indicated as main.

BusinessProcessVariantTypeCode is a coded representation of a business process variant type of a BusinessProcessVariantType. BusinessProcessVariantTypeCode may be based on GDT BusinessProcessVariantTypeCode.

MainIndicator can determine the indicator that specifies whether or not the current BusinessProcessVariantTypeCode is the main one. MainIndicator may be based on GDT Indicator and may have a Qualifier of Main.

DO FinancialAuditTrailDocumentation

Uniform documentation of business transactions for the purpose of auditability of postings in Financial Accounting, realizes technically as a dependent object and described in a separate document.

DuePayment Business Object

Figures 1, 44:
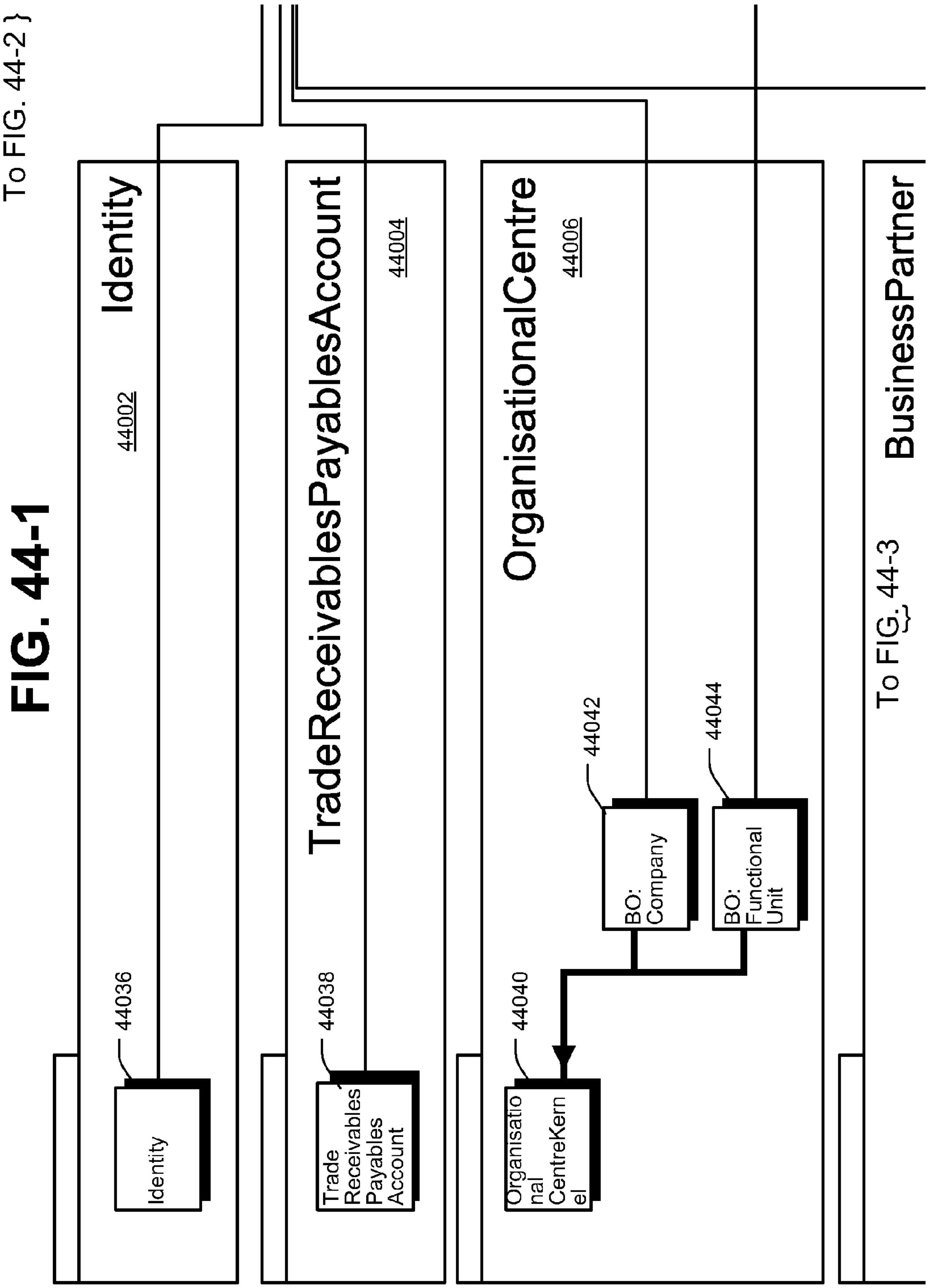
Figures 2, 44:
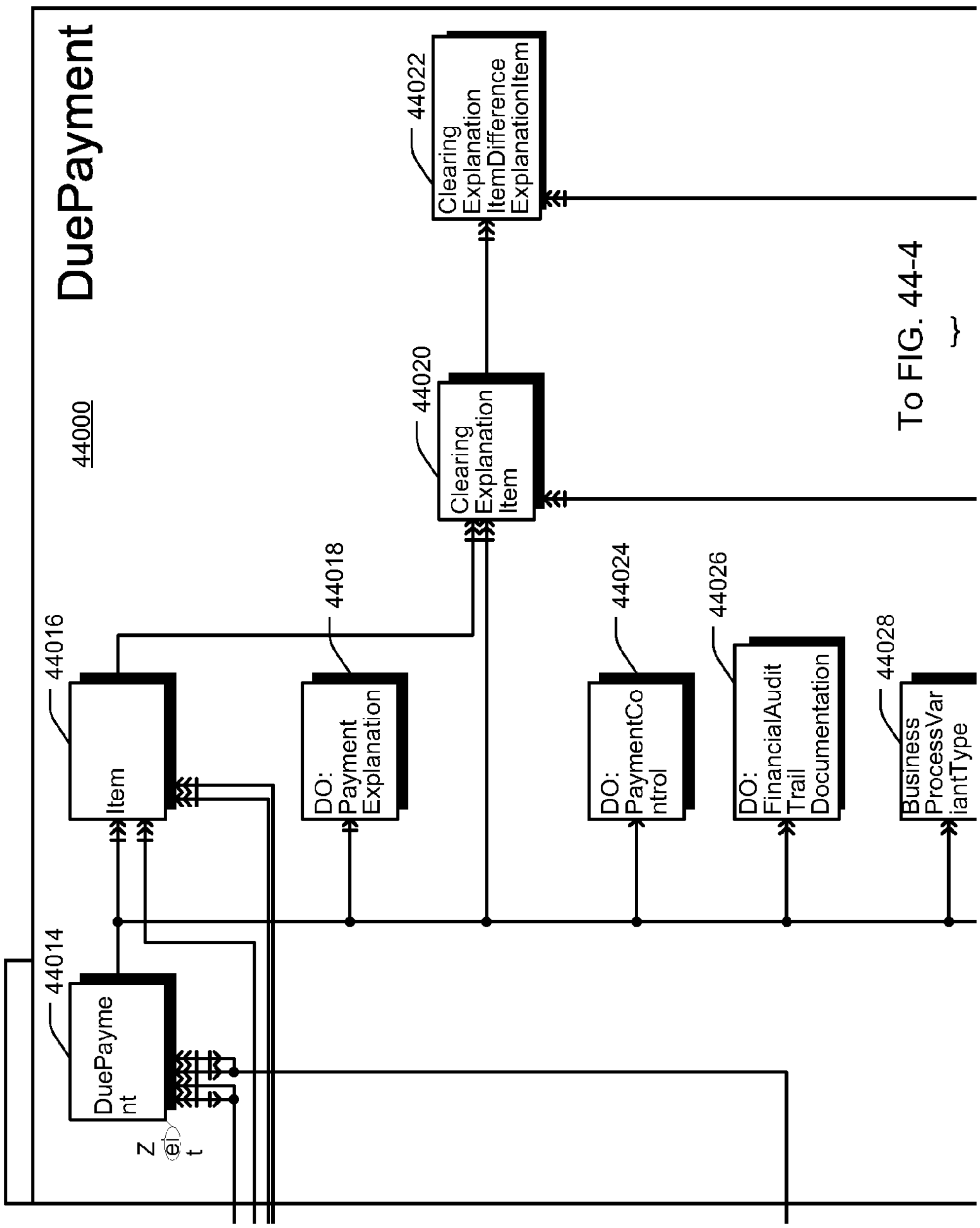
Figures 3, 44:
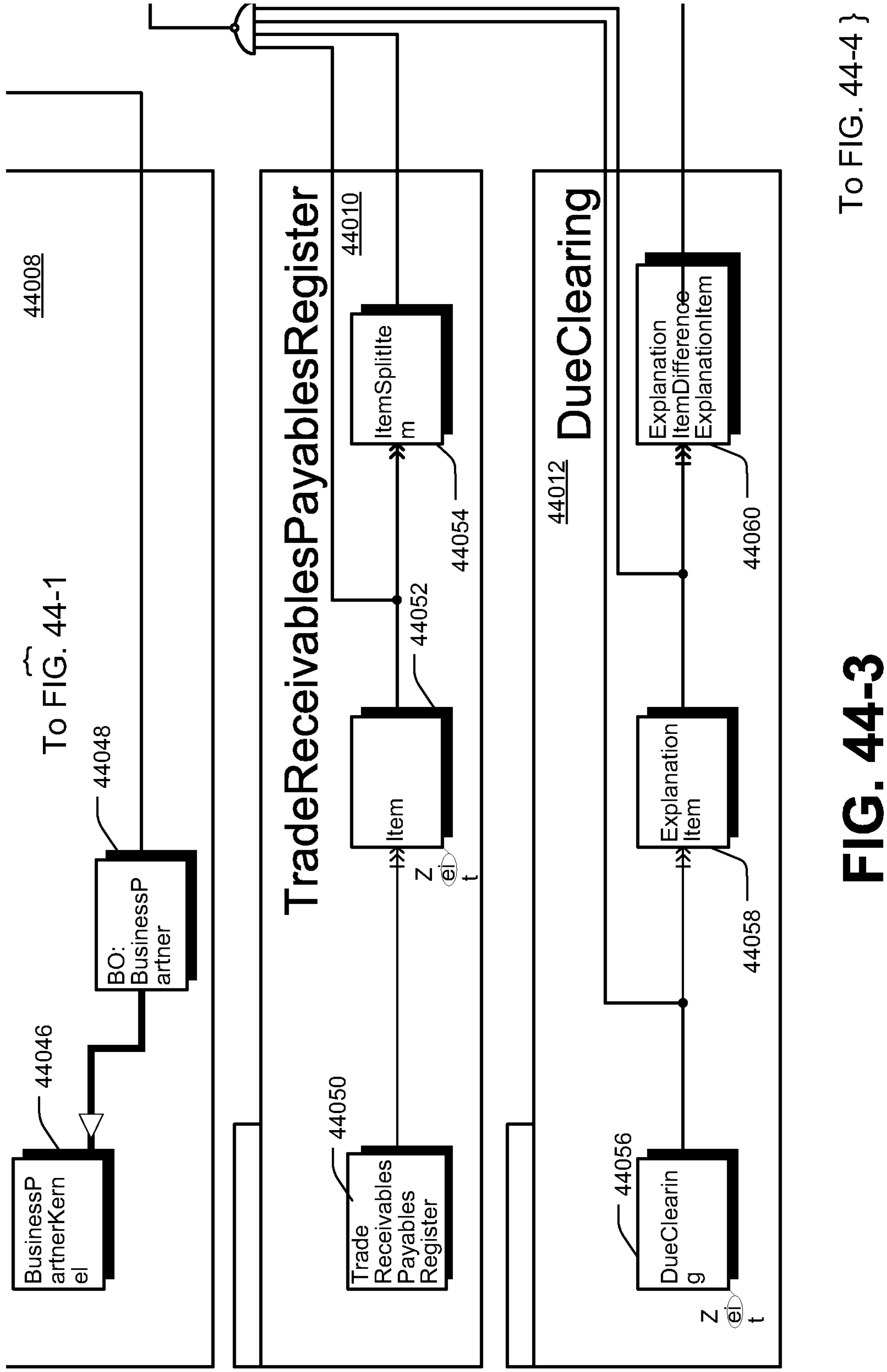
Figures 4, 44:
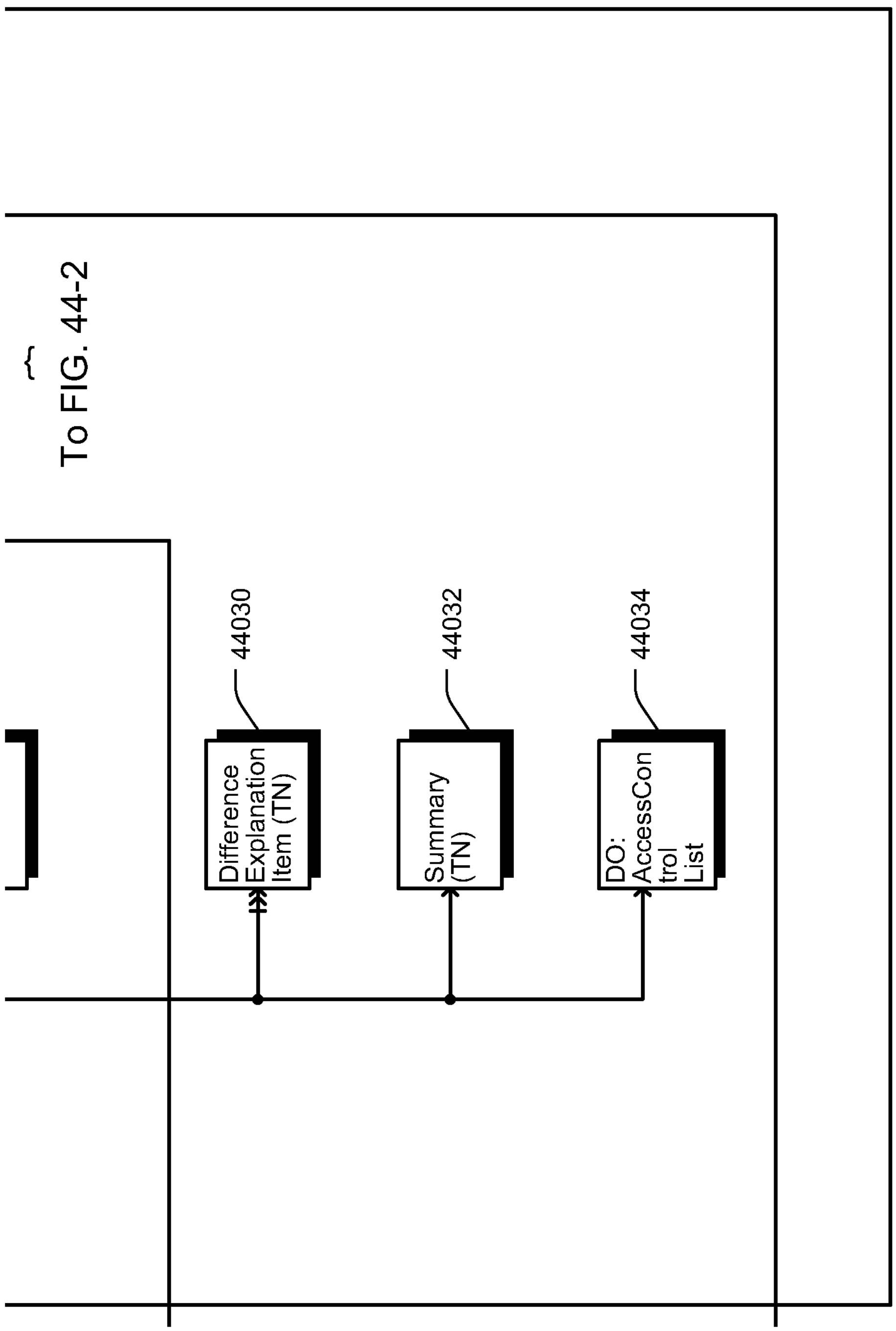

FIGS. 44-1 through 44-4 illustrate one example of an DuePayment business object model 44000. Specifically, this model depicts interactions among various hierarchical components of the DuePayment, as well as external components that interact with the DuePayment (shown here as 44002 through 44012 and 44036 through 44060).

A DuePayment is a payment request or payment confirmation with regards to due receivables and payables from goods and services. The DuePayment business object is part of the Due Item Processing process component. A DuePayment contains Information about required payment processing or payment processing that has been carried out. The allocation of the payment to business accounts (Trade Receivable Payable Accounts). Information about which receivables and payables (Trade Receivable Payables) should be paid or were paid and which amount. An explanation about the difference between the payment amount and invoice amount (less cash discount), if required. External references to receivables and payables to be paid or paid receivables and payables including explanations of possible differences Information to be transferred to Financial Accounting. DuePayment is represented by the Root node.

Service Interfaces

The DuePayment 44014 business object, DuePayment is involved in the following Process Integration Models that includes Due Item Processing_Accounting, Due Item Processing_Payment Processing, and Payment Processing_DueItemProcessing Service Interface Clearing In DueItemProcessingClearing In is the Clearing In service interface is part of the following Process Integration Models and Payment Processing Due—Item Processing. DueItemProcessingClearing groups the operations that inform Due Item Processing about business partner initiated payment transactions from Payment Processing. These payment transactions only refer to trade receivables and payables.

Create Clearing (A2A)

DueItemProcessingClearingIn is known as the technical name of CreateClearing, and can create a Clearing for BusinessPartner initiated payments. The operation is based on the Clearing Request message type (derived from the Payment Allocation business object).

Cancel Clearing (A2A)

DueItemProcessingClearingIn is known as the technical name of CancelClearing, and can cancel a previously sent Clearing Request by reference. The operation is based on the Clearing Cancellation Request message type (derived from the Payment Allocation business object).

Service Interface Clearing Out

DueItemProcessingClearingOut is known as the technical name of Clearing Out service interface, that is part of the following Process Integration Models and Payment Processing_Due Item Processing. DueItemProcessingClearingOut groups the operations that inform Payment Processing about business partner initiated payment transactions from Due Item Processing. These payment transactions only refer to trade receivables and payables.

Confirm Clearing (A2A)

DueItemProcessingClearingIn is known as the technical name of Confirm Clearing. A confirmation is needed to process a payment for a clearing request. The operation is based on the Clearing Confirmation message type (derived from the Payment Allocation business object). The Confirm Clearing operation is the answer to the Create Clearing operation.

Service Interface Payment Request In

DueItemProcessingPaymentRequestIn is the Payment Request In service interface is part of the following Process Integration Models and Due Item, Processing Payment Processing. DueItemProcessingPaymentRequestIn groups the operations that inform DueItemProcessing about company initiated payment transactions from Payment Processing. These payment transactions only refer to trade receivables and payables.

Change Payment based on Payment Request Confirmation (A2A)

DueItemProcessingPaymentRequestIn.ChangePaymentBasedOnPaymentRequestConfirmation Confirm the receipt of a PaymentRequest. The operation is based on PaymentOrderRequest Confirmation message type (derived from the PaymentOrder business object). The Change Payment operation based on Payment Request Confirmation is the answer to the Request Payment operation.

Service Interface Payment Request Out

DueItemProcessingPaymentRequestOutThe Payment Request Out service interface is part of the following Process Integration Models and Due Item Processing Payment Processin. DueItemProcessingPaymentRequestOutThe groups the operations that inform PaymentProcessing about company initiated payment transactions from DueItemProcessing. These payment transactions may refer to trade receivables and payables.

Request Payment (A2A)

DueItemProcessingPaymentRequestOut is known as the technical name of RequestPayment. This sends a request for payment to PaymentProcessing also confirms a provisional payment made before the operation is based on the PaymentOrderRequest message type (derived from the PaymentOrder business object).

Request Payment Cancellation (A2A)

DueItemProcessingPaymentRequestOut is known as the technical name of RequestPaymentCancellation. It may cancel provisional, requested or ordered payment that is the operation based on the PaymentOrderCancellationRequest message type (derived from the PaymentOrder business object).

Request Payment Information and Provisional Payment Reservation (A2A)

DueItemProcessingPaymentRequestOut is known as the technical name of RequestPaymentInformationAndProvisionalPayment. Request payment information with a provisional reservation of money in payment processing is the operation based on the PaymentOrderReservationRequest message type (derived from the PaymentOrder business object).

Request Payment Information and Provisional Payment Reservation Change (A2A)

DueItemProcessingPaymentRequestOut is known as the technical name of RequestPaymentInformationAndProvisionalPaymentReservationChange. Requests of payment information with a change of provisional reservation of money in payment processing is the operation based on the PaymentReservationChangeRequest message type (derived from the PaymentOrder business object).

Notify of Provisional Payment Reservation Change Cancellation (A2A)

DueItemProcessingPaymentRequestOut is known as the technical name of NotifyOfProvisionalPaymentReservationChangeCancellation. It may register the change of a provisional payment to the last transactional/saved state is the operation based on the PaymentOrderReservationChangeCancellationNotification message type (derived from the PaymentOrder business object).

Service Interface Payment Accounting Out

DueItemProcessingPaymentAccountingOut is the PaymentRequest Out service interface is part of the following Process Integration Models and Due Item Processing_Accounting. DueItemProcessingPaymentAccountingOut groups the operations that inform Financial Accounting about changes to trade receivables and payables from DueItemProcessing.

Notify of Payment (A2A)

DueItemProcessingPaymentAccountingOut is known as the technical name of NotifyOfPayment. It may notify Financial Accounting about inward or outward movements of trade or tax receivables or payables. The operation is based on the PaymentAccountingNotification message type (derived from the AccountingNotification business object).

Notify of Payment Cancellation (A2A)

DueItemProcessingPaymentAccountingOut is known as the technical name of NotifyOfPaymentCancellation. It may cancel an inward or outward movement of trade or tax receivables or payables in Financial Accounting. The operation is based on the PaymentCancellationAccountingNotification message type (derived from the AccountingNotification business object DuePayment).

Node Structure of the DuePayment Business Object

DuePayment (Root Node)

DuePayment is a payment request or payment confirmation for receivables and payables. It may include a payment request or payment confirmation for each business account. The elements located directly at the node DuePayment can determine the type GDT: DuePaymentElements. In certain Implementations these elements include: ID, UUID, ReceivablesFunctionalUnitUUID, PayablesFunctionalUnitUUID, SystemAdministrativeData Administrative, BusinessProcessVariantTypeCode, BusinessTransactionDate, TransactionCurrencyCode, TotalGrossAmount, TotalNetAmount, TotalClearingAmount, TotalCashDiscountAmount, TotalPossibleCashDiscountAmount, TotalLastCashDiscountAmount, TotalMaximumCashDiscountAmount, TotalDeductionAmount, TotalWithholdingTaxAmount, TotalPaymentAmount, TotalOnAccountPaymentAmount, AllocatedPaymentAmount, TotalBalanceAmount, TotalBalanceClearingAmount, BalanceAllocatedPaymentAmount, TotalBalancePaymentAmount, BankChargeAmount, ProposalExpirationDate, PaymentAdviceReference, PaymentAdviceDate, PaymentAllocationForPaymentAdviceReference, PaymentAllocationForPaymentAdviceDate, PaymentReceivingBusinessTransactionDocumentReference, PaymentReceivingBusinessTransactionDocumentDate, PaymentAllocationForPaymentReceivingBusinessTransaction DocumentReference, PaymentAllocationForPaymentReceivingBusinessTransactionDocumentDate, PrecedingDuePaymentReference, PrecedingDuePaymentDate is the transaction date, PaymentExecutionDateis the execution date, PaymentAmountFixedIndicator, PaymentProcedureCode, OverallClearedTradeReceivablesPayablesRegisterItem-BusinessPartnerRoleCategoryCode, PaymentTransactionSupplementCategoryCode ID is a universal identifier, which can be unique, of BusinessTransactionDocumentID. The ID may be based on GDT UUID. UUID is a universal identification, which can be unique, of Accounting Document Report. The UUID may be based on GDT UUID.

ReceivablesFunctionalUnitUUID is a Universal identifier, which can be unique, of the FunctionalUnit working on the DuePayment and is optional. The FunctionalUnit referenced may be to able to execute the organizational function Receivables, i.e. the element OrganisationalFunctionCode in one of the instances of the node FunctionalUnitAttributes in the FunctionalUnit references may have the value “23” for Receivables. The ReceivablesFunctionalUnitUUID may be based on GDT UUID.

PayablesFunctionalUnitUUID is an Universal identifier, which can be unique, of the FunctionalUnit working on the DuePayment and is optional. The FunctionalUnit referenced may be to able to execute the organizational function Payables, i.e. the element OrganisationalFunctionCode in one of the instances of the node FunctionalUnitAttributed in the Functional Unit references may have the value “21” for payables. The PayableFunctionalUnitUUID may be based on GDT UUID.

SystemAdministrativeData Administrative is data recorded by the system. This data includes system users and change dates/times and may be based on GDT SystemAdministrativeData.

BusinessProcessVariantTypeCode is a coded representation of the business process variant. The business process variant specializes the possible business trend and may be based on GDT BusinessProcessVariantTypeCode.

BusinessTransactionDate Document is part of the DuePayment. The local date when the payment transaction is released may be based on GDT Date.

TransactionCurrencyCode is a coded representation of the currency. The payment of the receivables or payables is made referred to as “payment currency” in the rest of the document and may be based on GDT CurrencyCode. Integrity conditions can include the currencies of all following amounts may not differ from the payment currency specified.

TotalGrossAmount can determine the total of the original amounts of all receivables and payables cleared with DuePayment in payment currency and is optional. The TotalGrossAmount may be based on GDT Amount and may have a Qualifier of gross.

TotalNetAmount can determine the total of the payment amounts of all receivables and payables cleared with DuePayment in payment currency and is optional. The TotalNetAmount may be based on GDT Amount and may have a Qualifier of gross.

TotalClearingAmount can determine the total of the clearing amounts of all receivables and payables cleared with DuePayment in payment currency and is optional. The TotalClearingAmount may be based on GDT Amount and may have a Qualifier of clearing.

TotalCashDiscountAmount can determine the total of the deductions as a result of cash discounts of all receivables and payables cleared with DuePayment in payment currency and is optional. The TotalCashDiscountAmount may be based on GDT Amount and may have a Qualifier of CashDiscount.

TotalPossibleCashDiscountAmount can determine the total of the ClearedTradeReceivablesPayablesRegisterItemSplitItemCashDiscountAmounts of DuePaymentClearingExplanationItems in TransactionCurrency and is optional. The TotalPossibleCashDiscountAmount may be based on the Qualifier of CashDiscount.

TotalLastCashDiscountAmount can determine the total of the ClearedTradeReceivablesPayablesRegisterItemSplitItemLastCashDiscountAmounts of DuePaymentClearingExplanationItems in payment currency and is optional. The TotalLastCashDiscountAmount may be based on GDT Amount and may have a Qualifier of CashDiscount.

TotalMaximumCashDiscountAmount can determine the total of the ClearedTradeReceivablesPayablesRegisterItemSplitItem-MaximumCashDiscountAmounts of DuePaymentClearingExplanationItems in payment currency and is optional. The TotalMaximumCashDiscountAmount is based on GDT Amount and may have a Qualifier of CashDiscount.

TotalDeductionAmount can determine the total of all other deductions of all receivables and payables cleared with DuePayment in payment currency and is optional. The TotalDeductionAmount may be based on GDT Amount and may have a Qualifier of deduction.

TotalWithholdingTaxAmount can determine the total of the withholding tax amounts of all receivables and payables cleared with DuePayment in payment currency and is optional. The TotalWithholdingTaxAmount may be based on GDT Amount and may have a Qualifier WithholdingTax.

TotalPaymentAmount can determine the sum of the payment amounts, which are already assigned to a TradeReceivablesPayablesAccount, in payment currency and is optional. The TotalPaymentAmount may be based on GDT Amount and may have a Qualifier of payment.

TotalOnAccountPaymentAmount can determine the part of the payment amount that is accepted without explanation by the assignment to receivables or payables in the form of payments on account and is optional. The TotalOnAccountPaymentAmount may be based on GDT Amount and may have a Qualifier of payment.

AllocatedPaymentAmount can determine the amount that is allocated in the Payment Processing component for the execution of a company that initiated payment in payment currency and is optional. The AllocatedPaymentAmount may be based on GDT Amount and may have a Qualifier of payment.

TotalBalanceAmount can determine the PaymentAmount (on the Payment Control dependent object, Header node)—TotalNetAmount—OnAccountPaymentAmount and is optional. From the TotalBalanceAmount it can be determined whether the payment amount has been completely explained by the assignment to receivables and payables, or by the explicit acceptance of payments on account, and which remaining amount may still be explained. The TotalBalanceAmount may be based on GDT Amount and may have a Qualifier of balance.

TotalBalanceClearingAmount can determine the difference between TotalGrossAmount and TotalClearingAmount and is optional. From the TotalBalanceClearingAmount it can be determined whether the receivables and payables that are paid by the DuePayment are paid completely or incompletely. The TotalBalanceClearingAmount may be based on GDT Amount and may have a Qualifier of clearing.

TotalBalancePaymentAmount can determine the difference between PaymentAmount (DO Payment Contoll, Node Header) and TotalPaymentAmount and is optional. From the TotalBalancePaymentAmount it can be determined which part of the payment is not yet assigned to a TradeReceivables- PayablesAccount. The TotalBalancePaymentAmount may be based on GDT Amount and may have a Qualifier of Payment.

BalanceAllocatedPaymentAmount can determine the Difference between the payment amount and the allocated payment amount and is optional. The BalanceAllocatedPaymentAmount may be based on GDT Amount and may have a Qualifier of Payment.

BankChargeAmount can determine the bank charges that have been calculated for DuePayment and is optional. The BankChargeAmount maybe based on GDT Amount.

ProposalExpirationDate can determine the time from which a proposed DuePayment is automatically deleted when a new DuePayment is created for one of the receivables and payables involved. The ProposalExpirationDate may be based on the date.

PaymentAdviceReference can determine the reference to the incoming payment advice that led to the generation or enhancement of the existing DuePayment and is optional. The PaymentAdviceReference may be based on GDT BusinessTransactionDocumentReference.

PaymentAdviceDate can determine the transaction date of the incoming payment advice that led to the generation or enhancement of the existing DuePayment and is optional. The PaymentAdviceDate may be based on GDT date.

PaymentAllocationForPaymentAdviceReference can determine the reference to the PaymentAllocation that has been created due to an incoming payment advice and is optional. PaymentAllocationForPaymentAdviceReference may be based on GDT BusinessTransactionDocumentReference.

PaymentAllocationForPaymentAdviceDate can determine the transaction date of the PaymentAllocation that has been created due to an incoming payment advice and is optional. The PaymentAllocationForPaymentAdviceDate may be based on GDT Date.

PaymentReceivingBusinessTransactionDocumentReference can determine the reference to the business object that has received an incoming payment in Payment Processing and is optional. The PaymentReceivingBusinessTransactionDocumentReference may be based on GDT BusinessTransactionDocumentReference.

PaymentReceivingBusinessTransactionDocumentDate can determine the transaction date of the business object that has received an incoming payment in Payment Processing and is optional. The PaymentReceivingBusinessTransactionDocumentDate may be based on GDT Date.

PaymentAllocationForPaymentReceivingBusinessTransactionDocumentReference can determine the reference to the PaymentAllocation that communicates an incoming payment to DuePayment and is optional. The PaymentAllocationForPaymentReceivingBusinessTransactionDocumentReference may be based on GDT BusinessTransactionDocumentReference.

PaymentAllocationForPaymentReceivingBusinessTransactionDocumentDate can determine the transaction date of the PaymentAllocation that communicates an incoming payment to DuePayment and is optional. The PaymentAllocationForPaymentReceivingBusinessTransactionDocumentDate may be based on GDT Date.

PrecedingDuePaymentReference can determine the reference to the preceding DuePayment and is optional. This reference is—for example—filled when a return of a Due Payment occurs. The PrecedingDuePaymentReference may be based on GDT BusinessTransactionDocumentReference.

PrecedingDuePaymentDate is the transaction date of the preceding DuePayment and is optional. The PrecedingDuePaymentDate may be based on GDT Date.

PaymentExecutionDate can determine the execution date of DuePayment. The PaymentExecutionDate may be based on GDT Date and may have a Qualifier of execution.

PaymentAmountFixedIndicator can determine the PaymentAmount calculated in the company initiated payment processes as the total of PaymentAmounts in the Item node and is optional. The PaymentAmountFixedIndicator suppresses this calculation for business partner initiated payment transactions. The PaymentAmountFixedIndicator may be based on GDT Indicator.

PaymentProcedureCode is the coded representation of the execution type of a payment, such as domestic transfer, EU internal transfer, and foreign bank transfer and is optional. The PaymentProcedureCode may be based on GDT PaymentProcedureCode.

OverallClearedTradeReceivablesPayablesRegisterItemBusinessPartnerRoleCategoryCode reflects the BusinessPartnerRoleCategoryCode of the TradeReceivablesPayablesRegisterItem that is referenced by the DuePaymentClearingExplanationItem and is optional. If all of these TradeReceivablesPayablesRegisterItems have the same BusinessPartnerRoleCategoryCode, it can be used here; if they have different ones, the field remains empty. The OverallClearedTradeReceivablesPayablesRegisterItemBusinessPartnerRoleCategoryCode may be based on the PartyRoleCategoryCode.

PaymentTransactionSupplementCategoryCode can determine the category of the supplemental information of a payment transaction and is optional. Here it can be used to store the information from the house bank about the execution of a formerly sent payment request. The PaymentTransactionSupplementCategoryCode may be based on GDT PaymentTransactionSupplementCategoryCode. Note can determine the user-defined text that explains the payment and is optional. Note may be based on GDT Note.

Status can determine the status of DuePayment. Status may be based on IDT DuePaymentStatus. In certain implementations, the IDT DuePaymentStatus can include fields of the following: ReleaseStatusCode, BlockingStatusCode, ClearingStatusCode, ConsistencyStatusCode, LiquidityAllocationStatusCode, PaymentExecutionStatusCode, PaymentOrderCancellationStatusCode, and ApprovalStatusCode.

ReleaseStatusCode can determine the current status of the release of changes in trade receivables and payables provided by DuePayment (TradeReceivablesPayablesRegister). BlockingStatusCode can specify whether or not the processing of a proposed DuePayment has currently been blocked.

ClearingStatusCode can specify which part of the payment has already been explained by the assignment to invoices. ConsistencyStatusCode can determine the current consistency status of DuePayment. LiquidityAllocationStatusCode can specify the status of the liquid assets assigned to this DuePayment. PaymentExecutionStatusCode can determine the current execution status of a company initiated payment in the DU Payment Processing. PaymentOrderCancellationStatusCode can determine the current status of the attempt to cancel a company initiated payment in the DU Payment Processing. ApprovalStatusCode can specify the status of the approval process for DuePayment.

The following composition relationships to subordinate nodes exist. Item 44016 has a cardinality relationship of 1:cn. ClearingExplanationItem 44020 has a cardinality relationship of 1:cn. BusinessProcessVariantType 44028 has a cardinality relationship of 1:n. DifferenceExplanationItem 44030 (Transformation Node) has a cardinality relationship of 1:cn. Summary 44032 (Transformation Node) has a cardinality relationship of 1:1. DO PaymentExplanation 44018 can have a cardinality relationship of 1:c. DO PaymentControl 44024 can have a cardinality relationship of 1:1. DO FinancialAuditTrailDocumentation 44026 has a cardinality relationship of 1:cn. DO AccessControlList 44034 has a cardinality relationship of 1:1.

Inbound Aggregation Relationships

There may be a number of inbound aggregation relationships. From the Identity business object (or node) to the CreationIdentity business object (or node) there may be a cardinality relationship of 1:cn. Is Identity is the identity that created the DuePayment. From the LastChangeIdentity business object (or node) to the CreationIdentity business object (or node) there may be a cardinality relationship of c:cn. LastChangeIdentity is the identity that changed the DuePayment in the last time.

Inbound Association Relationships

There may be a number of inbound aggregation relationships. From the FunctionalUnit business object (or node) to the ReceivablesFunctionalUnit business object (or node) there may be a cardinality relationship of c:cn. ReceivablesFunctionalUnit identifies the Functional Unit which is working on the DuePayment. From the FunctionalUnit business object (or node) to the PayablesFunctionalUnit business object (or node) there may be a cardinality relationship of c:cn. PayablesFunctionalUnit identifies the functional unit which is working on the DuePayment.

Specialization Associations for Navigation

There may be a number of specialization associations for navigation. From the FunctionalUnit business object (or node) to the node BusinessProcessVariantType, MainBusinessProcessVariantType there may be a cardinality relationship of 1:1, and association to the main BusinessProcessVariantType;

Enterprise Service Infrastructure Actions

CreateWithReference can create a DuePayment from references to TradeReceivablesPayablesRegisterItems or TradeReceivablesPayablesRegisterItemSplitItems and changes to the object and other objects. A DuePayment is generated. If TradeReceivablesPayablesRegisterItemSplitItems are referenced, associated DueClearings are created. The referenced TradeReceivablesPayablesRegisterItemSplitItems are locked for use in other payment transactions. Changes to the status can be such that all status variables set to their initial values. Parameters are the action elements that are defined by the DuePaymentDuePaymentCreateWithReferenceActionElements data type. In certain implementations elements include: PaymentExecutionDate and PaymentProcedureCodeDeterminationRequiredIndicator.

PaymentExecutionDate can determine the execution date of the payment and is optional. The PaymentExecutionDate may be based on GDT Date and may have a Qualifier of execution. PaymentProcedureCodeDeterminationRequiredIndicator determines whether or not the PaymentProcedure should already be determined by sending a synchronous message to the Payment Processing DU and is optional. The PaymentProcedureCodeDeterminationRequiredIndicator may be based on GDT Indicator and may have a Qualifier of required.

AutomaticallyGeneratedIndicator can determine whether or not the DuePayment to be generated is generated using an automatic process (for example, using the mass data run object DuePaymentRun) and is optional. The AutomaticallyGeneratedIndicator may be based on GDT Qualifier of AutomaticallyGenerated. This action may only be performed by the UI, inbound agents, or the DuePayment business objects itself. Block (S&AM action) selects the Due Payment as blocked for further processing. Blocks can include preconditions, changes to the subject, and changes to the status. Preconditions can include, for example, a precondition that a proposed Due Payment exists with ReleaseStatus “Not released” and BlockingStatus “Not Blocked.” Changes to the object can include changes such that, depending on the termination of the processing DuePayment, all actions except for unblock and Allocate/DellocateLiquidity are stopped. Changes can include changes to the status such as, depending on the BlockingStatus, setting the value “Blocked.” This action may only be performed by the UI or by DuePayment.

Unblock (S&AM action) undoes the blocking of processing a DuePayment. Unblock can include preconditions, changes to the subject and changes to the status. Preconditions can include, for example, a precondition that a proposed Due Payment exists with BlockingStatus “Blocked.”Changes to the object can include changes such that, depending on the actions at Due Payment that were impossible due to blocking, the actions are now are possible. Changes can include changes to the status such as, depending on the blocking status, setting the vale to “Not Blocked.” This action may only be performed by the UI or by DuePayment.

Postpone stops the processing of Due Payment and releases the reserved liquid assets. Postpone can include preconditions, changes to the object, and changes to the status. Preconditions can include, for example, a precondition that a proposed Due Payment exists with the ReleaseStatus “Not released” and Blocking Status “Not blocked.” Changes can include changes to the object, such as depending on when the actions “Stop” and “Deallocate Liquidity” are performed, other actions are performed. Changes can include changes to the status such as based on the results from the status change of the actions performed. The action may be performed by the UI or the business object itself.

Reset Postponement undoes the stopping of processing of the DuePayment and attempts to reserve new liquid assets for Due Payment. Reset Postponement can include, preconditions, changes to the object, changes to other objects, and changes to the status. a Due Payment that exists with BlockingStatus “Blocked.” Changes can include changes to the object depending on the actions “Unblock” and “Allocate Liquidity” that are performed one after the other. Changes to other objects depend on the result from the changes of actions performed. This action has no additional input parameters. The action may be performed by the UI or the business object itself.

DeleteDuePayment (S&AM action) deletes a DuePayment. DeleteDuePayments can include preconditions, changes to the object, and changes to other objects. Preconditions can include, for example, a precondition that a Due Payment exists with the ReleaseStatus “Not released.” Changes can include changes to the object, and the DuePayment may be deleted. Changes to other objects depend on the corresponding DueClearings that are deleted. TradeReceivablesPayablesRegisterItemSplitItems that were locked when creating the Due Payment for use in other Due Payments are released again. This action may only be performed by the UI or by DuePayment.

DiscardRelease (S&AM action) declares a proposed DuePayment as release discarded. It is no longer possible to change or release the DuePayment. Unlike the action “Delete”, the DuePayment stays in the system for documentation purposes. DiscardRelease can also include, preconditions, changes to the object, changes to other objects, and changes to the status. Preconditions can include, for example, a precondition that a due payment exists with the ReleaseStatus "Not released." Changes to objects can include a change such that the object is locked against all changes and only deleting and archiving are possible. Changes can include changes to other objects, such as depending on action "Void" at the associated DueClearing, such as for tradeReceivablesPayablesRegisterItemSplitItems that were locked when creating the Due Payment for use in other Due Payments are released again. Changes can include changes to the status depending on the ReleaseStatus, such as setting the value "Release discarded." The transition to this status value means that the ClearingConfirmation is sent for business partner initiated DuePayments. This action may only be performed by the UI, inbound agents, and the business object itself.

Check Consistency (S&AM action) checks the correctness and completeness of the total DuePayment. Check Consistency can include, preconditions, changes to the object, and changes to the status. Preconditions can include, for example, a precondition that a Due Payment can still be changed. Changes can include changes to the object, and the consistency of the object is checked. Changes can include changes to the status, depending on the result of check such as setting to "Consistent" or "Inconsistent" according to check results. This action may be performed by every service consumer.

AllocateLiquidity (S&AM action) attempts to reserve liquid assets for the execution of a company initiated payment transaction. Depending on the BusinessTransactionTypeCode of the DuePayment, this action checks the liquidity either using a budget that is predefined externally or by sending a synchronous PaymentReservationMessage to the PaymentOrder business object. In the latter case, it is defined exactly how the payment should take place (house bank, partner bank, PaymentFormCode, . . . ) and the liquid assets required for this are reserved. AllocatedLiquidity can include Preconditions, changes to other objects, changes to the status, parameters, and constraints. Preconditions can be, for example, a company initiated DuePayment that exists with PaymentExecutionStatus "New." Changes can include changes to the status, such as depending on the result of the check such as setting the value "Allocated" or "Not allocated." The action can be performed by the UI or the business object itself.

DeallocateLiquidity (S&AM action) releases reserved liquid assets for the execution of a company initiated payment transaction. DeallocateLiquidity can include Preconditions, changes to other objects, changes to the status, parameters, and constraints. Preconditions for example, a company initiated DuePayment exists with LiquidityAllocationStatus "New." Changes can include changes to the status, such as depending on the result of the check such as setting the value "Allocated" or "Not allocated." Changes can include changes to other objects, such as cancellation of the reservation in either the Payment Order or increase of the available budget. The action can be performed by the UI or the business object itself.

DeclareLiquidityAllocationAsNotRequired (S&AM action) declares the reservation of liquid assets as not required. This allows a PaymentRequest to be sent to the Payment Order business object although there are no liquid assets available to perform this request. DeclareLiquidityAllocationAsNotRequired can include, Preconditions, changes to other objects, changes to the status, parameters, and constraints. Preconditions can include, for example, a precondition that a company initiated Due Payment exists with LiquidityAllocationStatus "Not allocated." LiquidityAllocationStatus changes the value from "Not allocated to "Allocation not required." This action may only be performed by the UI.

ForwardToPayment (S&AM action) creates a payment request and forwards this to the PaymentOrder business object. ForwardToPayment can include, preconditions, changes to the object, and changes to the status. Preconditions can include, for example, a precondition that a proposed consistent DuePayment exists. In order for execution, it was checked whether there was sufficient liquidity or not. Results of this check was either positive or was deliberately classified as to be ignored. An approval of the Due Payment is either not required or has been already granted. Changes to the object can be such that generates and fills an instance of the Payment Explanation dependent object. Changes can include changes to the status, depending on the PaymentExecutionStatus, such as setting the value "Requested" or "Ordered." This action is only performed by the action "Release" of DuePayment.

Release (S&AM action) posts the payment transaction in trade receivables and payables. Release can include, preconditions, changes to the object, changes to other objects, and changes to the status. Preconditions can include, for example, a precondition that a consistent Due Payment exists with the ReleaseStatus "Not released." The PaymentExecutionStatus has the value "Confirmed" for business partner initiating payment transactions. This means the business partner initiating payment transaction has actually already led to a change of the liquid assets in the Payment Processing process component and has not just been notified. The action "Forward to Payment" may already have been performed for company initiating payment transactions. An approval of the Due Payment is either not required or has already been granted. The TotalBalanceAmount at the DuePaymentHeader is zero. Changes can include changes to the object, creation of an instance of the FinancialAuditTrailDocument dependent object. Changes can include changes to other objects depending on TradeReceivablesPayablesRegisterItem creates a corresponding TradeReceivablePayablesRegisterItemSplitItem. By changing its PaymentStatus, TradeReceivablesPayablesRegisterItemSplitItem will be blocked against the usage in other Business Objects. Changes can include changes to the status, depending on the ReleaseStatus, such as setting the value "Released." This action may be performed by inbound agents (interface ClearingIn) and the business object itself (see action "Release").

CheckClearingProcess (S&AM action) calculates the current clearing status of the total DuePayment. CheckClearingProcess can include changes to the object and changes to the status. Changes can include changes to the object, such as clearing status values of all DuePaymentClearingExplanationItems belonging to the current DuePayment that are read and calculated together with the current TotalBalanceAmount at DuePayment header level to the current ClearingStatus. Changes can include changes to the status, depending on check results, such as setting the clearing status "Open," "Partially Cleared." or "Cleared." This action may be performed by every service consumer.

ClearAll Performs the action "Clear" at all ClearingExplanationItem nodes that have not yet been cleared. ClearAll can include preconditions, changes to the object, and changes to other objects. Preconditions can include, for example, a precondition that a Due Payment has already made postings in trade receivables and payables and thus has the ReleaseStatus "Released."Changes can include changes to the object, performing the action "Clear" at all ClearingExplanationItem nodes. Changes can include changes to other objects depending on ClearingExplanationItem, and can set the action "Clear" or "Clear" at the associated DueClearing. This action may only be performed by the UI, inbound agents, and the business objects itself.

ResetAllClearings performs the action "ResetClearing" at all ClearingExplanationItem nodes that have already been cleared. ResetAllClearings can include, preconditions, changes to the object, and changes to other objects. Preconditions can include, for example, a precondition that a Due Payment has already made postings in trade receivables and payables and thus has the ReleaseStatus "Released." Changes can include changes to the object at all ClearingExplanationItem nodes, and performing the action "ResetClearing." Changes can include changes to other objects depending on ClearingExplanationItem, setting the action "ResetClearing" or the action "Cancel" at the associated DueCleaning. This action may only be performed by the UI, inbound agents, and the business object itself.

ExecutePayment performs all activities that are necessary to execute of a company initiated, proposed DuePayment in the Payment Processing component. ExecutePayment can include, preconditions, changes to the object, changes to other objects, and changes to the status. Preconditions can include, for example, a precondition that a company initiated Due Payment exists with the ReleaseStatus "Not released" and PaymentExecutionStatus "New." Changes can include changes to the object, using the account of the country of the PaymentProcessingDepartment (see PaymentControl dependent object) to perform the actions Forward to Payment, Release (country-specific) and ClearAll (country-specific) one after the other. Changes can include changes to other objects resulting from the changes of actions performed. Changes can include changes to the status results from the status changes of actions performed. The action may be performed by the UI or the business object itself.

ProcessPaymentConfirmation (S&AM action) evaluates messages from the Payment Processing process component about the status of a payment transaction. ProcessPaymentConfirmation can include, preconditions, changes to the object, changes to the status, and parameters. Preconditions can include, for example, a precondition that a Due Payment exists that whose PaymentExecutionStatus has one of the values "Requested", "Ordered", or "In Transfer." Changes can include changes to the object, whereby the corresponding fields are filled at the DuePaymentHeader, for business partner initiated payments. Changes can include changes to the status, whereby the PaymentExecutionStatus is set according to the input parameters. It is taken from the input ParameterExecution StatusCode, for company initiated payments and for business partner initiated payments, it is calculated from the other fields. Parameters for example can be the action elements that are defined by the DuePaymentProcessPaymentConfirmationActionElements data type.

In certain implementations Parameters can include, PaymentExecutionStatusCode, PaymentReceivingBusinessTransactionDocumentReference, PaymentReceivingBusinessTransactionDocumentDate, PaymentAllocationForPaymentReceivingBusinessTransactionDocumentReference, and PaymentAllocationForPaymentReceivingBusinessTransactionDocumentDate. PaymentExecutionStatusCode can specify the report by the PaymentOrder using the PaymentConfirmation to Due Payment for company initiated payments and is optional.

PaymentReceivingBusinessTransactionDocumentReference can determine the reference to business object that has received an incoming payment in Payment Processing and is optional.

PaymentReceivingBusinessTransactionDocumentReference may be based on GDT BusinessTransactionDocumentReference.

PaymentReceivingBusinessTransactionDocumentDate can determine the transaction date of the business object that has received an incoming payment in Payment Processing and is optional. PaymentReceivingBusinessTransactionDocumentDate may be based on GDT Date.

PaymentAllocationForPaymentReceivingBusinessTransactionDocumentReference can determine the reference to the PaymentAlloction that communicates an incoming payment to Due Payment and is optional.

PaymentAllocationForPaymentReceivingBusinessTransactionDocumentReference may be based on GDT BusinessTransactionDocumentReference.

PaymentAllocationForPaymentReceivingBusinessTransactionDocumentDate can determine the transaction date of the PaymentAllocation that communicates an incoming payment to DuePayment and is optional.

PaymentAllocationForPaymentReceivingBusinessTransactionDocumentDate may be based on GDT Date. This action is only called by inbound agents of DuePayment.

RequestPaymentOrderCancellation (S&AM action) sends the request to cancel a payment request to the PaymentOrder business object. RequestPaymentOrderCancellation can include, preconditions, changes to other object, and changes to status. Preconditions can include, for example, a precondition that a Due Payment exists with the PaymentExecutionStatus "Requested" or "Ordered." Changes can include changes to other objects such as results in successful cancellation of the corresponding payment order or in a rejection of the cancellation. Changes can include changes to the status such as, depending on the PaymentOrderCancellationStatus, changing the default value "Not Cancelled" to the value "In Cancellation." This action may only be performed by the business object itself.

ProcessResponseOnPaymentOrderCancellationRequest (S&AM action) evaluates the reply of the PaymentOrder business object to the request to cancel a payment request (see action RequestPaymentOrderCancellation). ProcessResponseOnPaymentOrderCancellationRequest can include preconditions, change to the status and parameters. Precondition is the action RequestPaymentOrderCancellation that performs, so a DuePayment exists with PaymentOrderCancellationStatus "In Cancellation." Parameters for example can be the action elements that are defined by the DuePayment ProcessPaymentOrderCancellationRequestResponseActionElements data type. Parameters can include PaymentOrderCancellationStatusCode. PaymentOrderCancellationStatusCode is reported by the PaymentOrder to DuePayment for company initiated payments. This action is called by inbound agents of DuePayment.

Cancel Release (S&AM action) cancels a DuePayment after it has either already sent a payment request to the payment order (company initiated payment transaction) or posted a clearing request (business partner initiated payment transaction). Cancel Release can include preconditions, changes to the object, changes to other objects, and changes to the status. Preconditions can include, for example, a precondition that a Due Payment exists without errors with the ReleaseStatus "Released." It is possible to cancel payment requests that have already been sent in the Payment Processing component in the company initiated payment transaction and all assigned and already completed DueClearings could be canceled. Changes to the object can include creation of a new instance of FinancialAuditTrailDocumentation dependent object to document the changes in trade receivables and payables and the data transferred to Financial Accounting. Changes can include changes to other objects such as whereby actions "Cancel" is called in the assigned DueClearings, and the corresponding TradeReceivablePayablesRegisterItemSplitItems. Changes can include changes to the status on the ReleaseStatus, such as setting the value "Release cancelled." This action may be performed by the UI, inbound agents, and other business objects.

ProposeExplanation creates a proposal for business partner initiated payments for the derivation of ClearingExplanationItems from the information of the PaymentExplanation. ProposeExplanation can include, preconditions, changes to the object, and changes to other objects. Preconditions can include, for example, a precondition that a Due Payment exists that whose ClearingExplanationItem nodes can still be changed. Changes can include changes to the object, for example, deleting ClearingExplanationItems from older proposals provided that these still have ClearingStatus "Open" and were not created manually. The information in the PaymentExplanation dependent object can generate new ClearingExplanationItems. Delete/modify/create DuePaymentItems provide the DuePayment still has the ReleaseStatus "Not released." Changes to other objects are transferred to associated DueClearing from the changes of ClearingExplanationItem nodes. This action may be performed by the UI or inbound agents (interface ClearingIn).

AddExplanation adds new ClearingExplanationItems to a DuePayment. AddExplanation can include, preconditions, changes to the object, changes to other objects, and parameters. Preconditions can include, for example, a precondition that a Due Payment exists, that whose ClearingExplanationItem Nodes can still be changed. In addition, ClearingExplanationItem can only be added for those TradeReceivablesPayablesRegisterItemSplitItems that have not yet been cleared. Changes can include changes to the object, for example, a new node ClearingExplanationItem can be added to DuePayment. If only the TradeReceivablesPayablesRegisterItemID or the TradeReceivablesPayablesRegisterItemUUID are entered, ClearingExplanationItems are added for each open TradeReceivablesPayablesRegisterItemSplitItem. The creation of new ClearingExplanationItems means that payment amounts at higher nodes may be changed. Changes to other objects can include, for example, company initiated payments, whereby the TradeReceivablesPayablesRegisterItemSplitItems referenced by the new nodes ClearingExplanationItem are locked for use in other payment transactions. The generation of ClearingExplanationItem is transferred to the associated DueClearing. Parameters for example can be the action elements that are defined by the DuePaymentAddExplanationActionElements data type. In certain implementations, parameters can include TradeReceivablesPayablesRegisterItemBaseBusinessTransactionDocumentReference and TradeReceivablesPayablesRegisterItemReference.

TradeReceivablesPayablesRegisterItemBaseBusinessTransactionDocumentReference can determine the reference to the business document on which the TradeReceivablesPayablesRegisterItem is based or its items (such as reference to supplier Invoice) and is optional. TradeReceivablesPayablesRegisterItemBaseBusinessTransactionDocumentReference may be based on GDT BusinessTransactionDocumentReference.

TradeReceivablesPayablesRegisterItemReference is the unique identifier of the TradeReceivableRegisterItem or TradeReceivablesPayablesRegisterItemSplitItem from which one or more new ClearingExplanationItems should be generated and is optional. TradeReceivablesPayablesRegisterItemReference may be based on GDT BusinessTransactionDocumentReference. This action may only be performed by the UI, inbound agents, the business object itself, or other business objects.

Merge merges two or more DuePayments into one. Merge can include, preconditions, changes to the object, changes to other objects, and changes to the status. Preconditions can include, for example, a precondition that at least two company initiated Due Payments exist with ReleaseStatus "Not released" and PaymentExecutionStatus "New." Changes to the object can include, for example, the change by which the TradeReceivablesPayablesRegisterItemSplitItems of the previous DuePayments are transferred into a new DuePayment. Here the grouping rules that are usually observed for TradeReceivablesPayablesRegisterItemSplitItems are ignored with exception of the affiliation to TradeReceivablesPayablesAccount. The previous DuePayments are deleted. If assets were already reserved for the previous DuePayments in PaymentProcessing, these are released and at the same time assets are requested for the new DuePayment. Changes to other objects can include the change by which the DueClearings referenced by the old DuePayments are deleted, and a new DueClearing is generated. Changes can include changes to the status; the old ones are deleted and the new DuePayment gets the ReleaseStatus "Not released. This action may only be performed by the UI.

AssignPaymentAmountToAccount explicitly assigns a partial amount of a payment to a TradeReceivablesPayablesAccount as a receivable or payable. AssignPaymentAmountToAccount can include preconditions, changes to the object, and parameters. Preconditions for example can be the Due Payment that has not yet made any postings in trade receivables and payable and thus has the ReleaseStatus "Not released." Changes to the object can include the change by which, for example, the amount entered is added to the TradeReceivablesPayablesAccount. If a DuePaymentItem already exists with an association to this TradeReceivablesPayablesAccount, its payment amount is increased by this amount, otherwise a new DuePaymentItem is generated. The PaymentAmountFixedIndicator is set to "True" at the DuePaymentItem if the PaymentAmount at the DuePaymentItem is not zero. Parameters are the action elements that are defined by the DuePaymentAssignPaymentAmountToAccountActionElements data type. These elements include, AssignedPaymentAmount, ResponsibleCompanyID, ResponsibleCompanyUUID, ResponsibleBusinessPartnerInternalID, ResponsibleBusinessPartnerInternalUUID, TradeReceivablesPayablesAccountUUID, and TradeReceivablesPayablesRegisterDueCategoryCode.

AssignedPaymentAmount can determine the payment amount to be assigned and is optional. AssignedPaymentAmount may be based on GDT Amount and may have a Qualifier of the AssignedPayment.

ResponsibleCompanyID can determine the unique identifier of the company responsible for the payment and is optional. ResponsibleCompanyID may be based on GDT OrganisationalCentreID.

ResponsibleCompanyUUID is universally a unique identifier of the company responsible for the payment and is optional. ResponsibleCompanyUUID may be based on GDT UUID.

ResponsibleBusinessPartnerInternalID is the unique identifier of the business partner that participates in the payment and is optional. ResponsibleBusinessPartnerInternalID may be based on GDT BusinessPartnerInternalID.

ResponsibleBusinessPartnerInternalUUID is the unique identifier of the business partner that participates in the payment and is optional. ResponsibleBusinessPartnerInternalUUID is based on GDT UUID.

TradeReceivablesPayablesAccountUUID is the unique identifier of the business account to which part of the payment is assigned and is optional. TradeReceivablePayablesAccountUUID may be based on GDT UUID.

TradeReceivablesPayablesRegisterDueCategoryCode is a coded representation of the receivable or payable to which the DuePaymentItem on the business account leads and is optional. TradeReceivablesPayablesRegisterDueCategoryCode may be based on GDT DueCategoryCode.

This action may only be performed by the UI, inbound agents, and the business object itself.

DeletePaymentAmountAssignmentToAccount deletes the assignment of a partial amount of a payment to a TradeReceivablesPayablesAccount. DeletePaymentAmountAssignmentToAccount can include, preconditions, changes to the object, and parameters. Preconditions can include, for example, a precondition that the Due Payment has not yet made any postings in trade receivables and payables and thus has the ReleaseStatus "Not released." Changes to the object can include, for example, the change by which the DuePayment identified by the input parameters is deleted.

Parameters are the action elements that are defined by the DuePaymentDeletePaymentAmountAssignmentToAccountActionElements data type. These elements include, ResponsibleCompanyID, ResponsibleCompanyUUID, ResponsibleBusinessPartnerInternalID, ResponsibleBusinessPartnerInternalUUID, TradeReceivablesPayablesAccountUUID, TradeReceivablesPayablesRegisterDueCategoryCode.

ResponsibleCompanyID is the unique identifier of the company responsible for the payment and is optional. ResponsibleCompanyID may be based on GDT OrganisationalCentrID.

ResponsibleCompanyUUID is universally a unique identifier of the company that is responsible for the payment and is optional. ResponsibleCompanyUUID may be based on GDT UUID.

ResponsibleBusinessPartnerInternalID is a unique identifier of the business partner that participates in the payment and is optional. ResponsibleBusinessPartnerInternalID may be based on GDT BusinessPartnerInternalID.

ResponsibleBusinessPartnerInternalUUID is universally unique identifier of the business partner that participates in the payment and is optional. ResponsibleBusinessPartnerInternalUUID may be based on GDT UUID.

TradeReceivablesPayablesAccountUUID is universally a unique identifier of the business account to which part of the payment is assigned and is optional. TradeReceivablesPayablesAccountUUID may be based on GDT UUID.

TradeReceivablesPayablesRegisterDueCategoryCode is a coded representation of the receivable or payable to which the DuePaymentItem on the business account leads and is optional. TradeReceivablesPayablesRegisterDueCategoryCode may be based on GDT DueCategoryCode.

The action may be performed by the UI and the business object itself.

TransferPaymentAmountToAnotherAccount posts a partial amount of a payment from a TradeReceivablesPayablesAccount to another account. TransferPaymentAmountToAnotherAccount can include, preconditions, changes to the object, changes to other objects and parameters. Preconditions can include, for example, a precondition that the DuePaymentItem, which is identified by the input parameters, is not used in Clearing. Changes to the object can include, for example, the change by which the DuePaymentItem (A), which is referenced by the entry "TransferFrom" is identified and reduced by the TransferredPaymentAmount. The corresponding TradeReceivablesPayablesRegisterItem (B) is identified. A TradeReceivablesPayablesRegisterItem (C) is generated for the value of the TransferredPaymentAmount but with reversed plus/minus sign at the TransferFromDuePayment and cleared with (B). The relevant information is stored in the FinancialAuditTrailDocuments and transferred to FinancialAccounting. The DuePaymentItem (D), which is referenced by the entry "TransferTo . . . ", is identified. If it does not exist, it is generated for the value of the TransferredPaymentAmount, otherwise it is increased by this amount. The TradeReceivablesPayablesRegisterItem (E), which belongs to (D), is identified. If it does not exist, it is generated for the value of the TransferredPaymentAmount, otherwise it is increased by this amount. The relevant information is stored in the FinancialAuditTrailDocuments and transferred to FinancialAccounting. TradeReceivablesPayablesRegisterItem (C) and TradeReceivablesPayablesRegisterItem (E), do not if the DuePayment has not yet been posted.

Changes to other objects can include, for example, the change by which the information from the listed above is transferred to DueCleaning and the TradeReceivablesPayablesRegister. Parameters are the action elements that are defined by the DuePaymentTransferPaymentAmountToAnotherAccountActionElements data type DuePayment. In certain implementations these elements included, TransferredPaymentAmount, TransferFromResponsibleCompanyID, TransferFromResponsibleCompanyUUID, TransferFromResponsibleBusinessPartnerInternalID, TransferFromResponsibleBusinessPartnerInternalUUID, TransferFromTradeReceivablesPayablesAccountUUID, TransferFromTradeReceivablesPayablesRegisterDueCategoryCode, TransferToResponsibleCompanyID, TransferToResponsibleCompanyUUID, TransferToResponsibleBusinessPartnerInternalID, and TransferToResponsibleBusinessPartnerInternalUUID.

TransferredPaymentAmount can determine the payment amount to be transferred and is optional. TransferredPaymentAmount may be based on GDT Amount and may have a Qualifier of TransferredPayment.

TransferFromResponsibleCompanyID is a unique identifier of the company responsible for the payment and is optional. TransferFromResponsibleCompanyID may be based on GDT OrganisationalCentreID.

TransferFromResponsibleCompanyUUID is universally a unique identifier of the company responsible for the payment and is optional. TransferFromResponsibleCompanyUUID may be based on GDT UUID.

TransferFromResponsibleBusinessPartnerInternal is a unique identifier of the business partner that participates in the payment and is optional. TransferFromResponsibleBusinessPartnerInternal may be based on GDT BusinessPartnerInternalID.

TransferFromTradeReceivablesPayablesAccountUUID is universally a unique identifier of the business account to which part of the payment is assigned and is optional. TransferFromTradeReceivables-PayablesAccountUUID may be based on GDT UUID.

TransferFromTradeReceivables-PayablesRegisterDueCategoryCode is a coded representation of the receivable or payable to which the DuePaymentItem on the business account leads and is optional. TransferFromTradeReceivables-PayablesRegisterDueCategoryCode may be based on GDT DueCategoryCode.

TransferToResponsibleCompanyID is a unique identifier of the company responsible for the payment and is optional. TransferToResponsibleCompanyID may be based on GDT OrganisationalCentrID.

TransferToResponsibleCompanyUUID is a universal unique identifier of the company responsible for the payment and is optional. TransferToResponsibleCompanyUUID may be based on GDT UUID.

TransferToResponsibleBusinessPartnerInternalID is a unique identifier of the business partner that participates in the payment and is optional. TransferToResponsibleBusinessPartnerInternalID may be based on GDT BusinessPartnerInternalID.

TransferToResponsibleBusinessPartnerInternalUUID is universally a unique identifier of the business partner that participates in the payment and is optional. TransferToResponsibleBusinessPartnerInternalUUID may be based on GDT UUID.

TransferToTradeReceivablesPayabledAccountUUID is universally a unique identifier of the business account to which part of the payment is assigned and is optional. TransferToTradeReceivablesPayabledAccountUUID may be based on GDT UUID.

TransferToTradeReceivables-PayablesRegisterDueCategoryCode is a coded representation of the receivable or payable to which the DuePaymentItem on the business account leads. TransferToTradeReceivables-PayablesRegisterDueCategoryCode may be based on GDT DueCategoryCode. The action may be performed by the UI and the business object itself.

AcceptBalanceAsOnAccountPayment displays the amount of each DuePaymentItem, which has not yet been explained by assignment to receivables and payables, as a payment on account. AcceptBalanceAsOnAccount payment can include, preconditions, change to the object, changes to other objects, and changes to the status. Preconditions can include, for example, a precondition that the Due Payment has the ReleaseStatus "Released" and all available DuePaymentClearingExplanationItems that are already cleared. Changes to the object can include, for example, the change by which the current TotalBalanceAmount at the OnAccountPaymentAmount is transferred to all DuePaymentItem nodes. Thus, the TotalBalanceAmount at all DuePaymentItems and at the DuePaymentHeader is zero. Changes to other objects can include, for example, the change by which the blocking of the open TradeReceivablesPayablesRegisterItemSplitItem created by the DuePayment against the usage in other BusinessObjects (see action Release) is removed by changing its PaymentStatus back to its initial value. Change to the status for example, can be due to the preconditions and the logic of the clearing process the clearing status changes to 'Cleared' due to this action. The action may be performed by the UI and the business object itself.

ResetAcceptionOfBalanceAsOnAccountPayment resets the action AcceptBalanceAsOnAccountPayment. ResetAcceptionOfBalanceAsOnAccountPayment can include, precondition, changes of the object, and changes of other objects. Preconditions can include, for example, a precondition that the DuePayment has displayed an amount as a payment on account. Its clearing status has the value 'Cleared'. Changes to the object can include, for example, the change by which the current OnAccountPaymentAmount at the TotalBalanceAmount at all DuePaymentItems and at the DuePaymentHeader is not Zero. Changes to other objects can include, for example, the change by which the open TradeReceivablesPayablesRegisterItemSplitItem created by the Due Payment is blocked again against the usage in other BusinessObjects (see action Release), if possible. The action may be performed by the UI and the business object itself.

ApplyClearingStrategy minimizes the TotalBalanceAmount at the header nodes of a business partner initiated DuePayment. The configured clearing strategy is used for this. ApplyClearingStrategy can include, preconditions, changes to the object, and changes to other objects. Preconditions can include, for example, a precondition that the Due Payment can still be changed. Changes to the object can include, for example, a change to the clearing strategy. This can include tolerable small differences that are distributed to the individual DuePaymentClearingExplanationItems, and one DuePaymentClearingExplanationDifferenceExplanationItem is generated for each DuePaymentClearingExplanation. Payment amounts in the DuePaymentClearingExplanationItems are reduced so that it results in partial payments. Changes to other objects can include, for example, the change by which the object that is propagated to the associated DueClearing. This action may only be performed by the UI, inbound agents, or the business object itself.

ApplyAllCurrentCashDiscountAmounts sets at all DuePaymentClearingExplanationItems the CashDiscountAmount to the value ClearedTradeReceivablesPayablesRegisterItemSplitItemCashDiscountAmount. ApplyAllCurrentCashDiscountAmounts includes, preconditions, changes to the object, and changes to other objects. Preconditions can include, for example, a precondition that the DuePayment can still be changed. Changes to the object can include, for example, the change by which, in all DuePaymentClearingExplanationItems, the CashDiscountAmount is set to the value of the ClearedTradeReceivablesPayablesRegisterItemSplitItemCashDiscountAmount. Changes to other objects can include, for example, the change by which the objects are propagated to the associated DueClearing. This action may only be performed by the UI, inbound agents, and the business object itself.

ApplyAllLastCashDiscountAmounts sets at all DuePaymentClearingExplanationItems the CashDiscountAmount to the value ClearedTradeReceivablesPayablesRegisterItemSplitItemLastCashDiscountAmount. ApplyAllLastCashDiscountAmounts can include, preconditions, changes to the object, and changes to other objects. Preconditions can include, for example, a precondition that the DuePayment can still be changed. Changes to the object can include, for example, the change by which, in all DuePaymentClearingExplanationItems, the CashDiscountAmount is set to the value of the ClearedTradeReceivablesPayablesRegisterItemSplitItemLastCashDiscountAmount. Changes to other objects for example can include, for example, the change by which the object is propagated to the associated DueClearing. The action may be performed by the UI and the business object itself.

DistributePaymentDifferenceExplanationAmount distributes a predefined deduction amount to the individual DuePaymentClearingExplanationItems of a business partner initiated DuePayment. The type of distribution complies with the clearing strategy configured in the TradeReceivablesPayablesAccount. DistributePaymentDifferenceExplanationAmount includes, preconditions, changes to the object, changes to other objects, and parameters. Preconditions for example, can include the DuePayment that can still be changed. Changes to the object can include, for example, a change in the deduction amount, predefined in the action that is distributed to the individual DuePaymentClearingExplanationItems according to the clearing strategy. One DuePaymentClearingExplanationItemDifferenceExplanationItem is generated for each DuePaymentClearingExplanationItem. Changes to other objects can include, for example, the change by which the object is propagated to the associated DueClearing. Parameters are the action elements that are defined by the DuePaymentDistributePaymentDifferenceExplanationAmountActionElements data type. The elements include Amount and PaymentDifferenceReasonCode.

Amount can determine the deduction amount to be distributed. Amount may be based on GDT Amount.

PaymentDifferenceReasonCode is a code for the reason of deduction. PaymentDifferenceReasonCode may be based on GDT PaymentDifferenceReasonCode. This action may only be performed by the UI, inbound agents, or the business object itself.

DeletePaymentDifferenceReason deletes all DuePaymentClearingExplanationItemDifferenceExplanationItems with the predefined PaymentDifferenceReasonCode. DeletePaymentDifferenceReason can include, preconditions, changes to the object, changes to other objects, and parameters. Preconditions can include, for example, a precondition that the Due Payment can still be changed. Changes to the object can include, for example, the change that deletes all DuePaymentClearingExplanationItemDifferenceExplanationItems with the predefined PaymentDifferenceReasonCode. Changes to other objects can include, for example, the change by which the object is propagated to the associated DueClearing. Parameters are the action elements that are defined by the DuePaymentDeletePaymentDifferenceReasonActionElements data type. The element included is, PaymentDifferenceReasonCode. PaymentDifferenceReasonCode may be based on GDT PaymentDifferenceReasonCode. The action may be performed by the UI or the business object itself.

SubmitForApproval (S&AM action) checks whether or not an approval process may be started. An approval process is started in the first case. SubmitForApproval can include, preconditions, change to the subject, and changes to the status. Preconditions can include, for example, a precondition that the processing of the Due Payment has been completed logically since no changes are possible during the approval process. The Release Status has the value "Not released", the Payment Execution Status has the value "New". Changes to the object can include, for example, the change by which, if an approval is necessary, an appropriate task is generated. Changes to the status can include, for example, the change by which the Approval Status gets the value "In approval" if an approval process is necessary and "Approval not necessary" if this is not the case. This action may only be performed by the UI, inbound agents, or the business object itself.

Approve (S&AM action) this action approves the DuePayment and completes the approval process. Approve can include, preconditions, changes to the object, and changes to the status. Preconditions can include, for example, a precondition that Approval Status is "In approval."Changes to the object can include, for example, the change by which the approval task is deleted. Changes to the status can include, for example, the change by which the DuePayment gets the ApprovalStatus "Approved." This action may be performed by the UI.

SendBackForRevision (S&AM action) this action completes the approval process and returns the business object to the person who requested the approval to include comments from the approver in the business object. SendBackForRevision can include preconditions, changes to the object, and changes to status. Preconditions can include, for example, a precondition that Approval Status is "In approval." Changes to the object can include, for example, the change by which the approval task is deleted. Changes to the status can include, for example, the change by which the DuePayment gets the ApprovalStatus "In revision." This action may be performed by the UI.

WithdrawFromApproval (S&AM action) this action completes the approval process without result. WithdrawFromApproval can include preconditions, changes to the object, and change to the status. Preconditions can include, for example, a precondition that Approval Status is "In approval" or "In revision." Changes to the object can include, for example, the change by which the approval task is deleted. Changes to the status can include, for example, the change by which the DuePayment gets the ApprovalStatus "Withdrawn." This action may be performed by the UI.

Queries

QueryByElements provides a list of all DuePayments according to the restriction to fields in the DuePaymentHeader or in the PaymentControl Header. The query elements are defined by the DuePaymentElementsQueryElements data type. In certain implementations these elements include: ID, SystemAdministrativeData, BusinessProcessVariantTypeCode, BusinessTransactionDate, TransactionCurrencyCode, ProposalExpirationDate, PaymentOrderReference, PaymentOrderDate, PaymentReceivingBusinessTransactionDocumentReference, PaymentReceivingBusinessTransactionDocumentDate, PaymentAllocationForPaymentReceivingBusinessTransactionDocumentReference, PaymentAllocationForPaymentReceivingBusinessTransactionDocumentDate, OverallClearedTradeReceivablesPayablesRegisterItemBusinessPartnerRoleCategoryCode, PaymentExecutionDate, PaymentProcedureCodeStatus, PaymentControlPaymentProcessingCompanyUUID, PaymentControlPaymentProcessingCompanyID, PaymentControlActingReportingLineUnitUUID, PaymentControlPaymentProcessingBusinessPartnerUUID, PaymentControlPaymentProcessingBusinessPartnerInternalID, PaymentControlResponsibleEmployeeUUID, PaymentControlResponsibleEmployeeID, PaymentControlPropertyMovementDirectionCode, PaymentControlPaymentFormCode-PaymentControlPaymentBlock, PaymentControlFirstPaymentInstructionCode, PaymentControlSecondPaymentInstructionCode, PaymentControlThirdPaymentInstructionCode, PaymentControlFourthPaymentInstructionCode, PaymentControlBankChargeBearerCode, PaymentControlPaymentPriorityCode, PaymentControlSinglePaymentIndicator, PaymentControlDebitValueDate, PaymentControlCreditValueDate, and PaymentControlPaymentReceivablesPayablesGroupID ID may be based on GDT BusinessTransactionDocumentID. SystemAdministrativeData is a universal identifier may be based on GDT SystemAdministrativeData. BusinessProcessVariantTypeCode may be based on GDT BusinessProcessVariantTypeCode. BusinessTransactionDate may be based on GDT DATE. TransactionCurrencyCode may be based on GDT CurrencyCode and may have a Qualifier of Transaction. ProposalExpirationDate may be based on GDT Date and may have a Qualifier of Expiration. PaymentOrderReference may be based on GDT BusinessTransactionDocumentReference. PaymentOrderDate may be based on GDT Date. PaymentReceivingBusinessTransactionDocumentReference may be based on GDT BusinessTransactionDocumentReference. PaymentReceivingBusinessTransactionDocumentDate may be based on GDT Date. PaymentAllocationForPaymentReceivingBusinessTransactionDocumentReference may be based on GDT BusinessTransactionDocumentReference PaymentAllocationForPaymentReceivingBusinessTransactionDocumentDate may be based on GDT Date.

OverallClearedTradeReceivablesPayablesRegisterItemBusinessPartnerRoleCategoryCode may be based on GDT PartyRoleCategoryCode. PaymentExecutionDate may be based on GDT Date. PaymentProcedureCode and may be based on GDT PaymentProcedureCode. Status may be based on IDT DuePaymentStatus. PaymentControlPaymentProcessingCompanyUUID is a company that is involved in the payment. PaymentControlPaymentProcessingCompanyUUID may be based on GDT UUID. PaymentControlPaymentProcessingCompanyID is a company that is involved in the payment. PaymentControlPaymentProcessingCompanyID may be based on GDT OrganisationalCentrID. PaymentControlActingReportingLineUnitUUID can determine the reporting line unit that is involved in the payment. PaymentControlActingReportingLineUnitUUID may be based on GDT UUID. PaymentControlPaymentProcessingBusinessPartnerUUID can determine the business partner that is involved in the payment. PaymentControlPaymentProcessingBusinessPartnerUUID may be based on GDT UUID. PaymentControlPaymentProcessingBusinessPartnerInternalID can determine the business partner that is involved in the payment. PaymentControlPaymentProcessingBusinessPartnerInternalID may be based on GDT BusinessPartnerInternalID. PaymentControlResponsibleEmployeeUUID can specify the contact person for questions about payment in the company that initiated the payment. PaymentControlResponsibleEmployeeUUID may be based on GDT UUID. PaymentControlResponsibleEmployeeID can determine the contact person for questions about payment in the company that initiated the payment. PaymentControlResponsibleEmployeeID may be based on GDT BusinessPartnerInternalID. PaymentControlPropertyMovementDirectionCode is a coded representation of the increase or decrease of receivables or payables on the business account. PaymentControlPropertyMovementDirectionCode may be based on GDT PropertyMovementDirectionCode.

PaymentControlPaymentFormCode is a coded representation of the payment form. The payment form is the way a product or service is paid for. PaymentControlPaymentFormCode may be based on GDT PaymentFormCode. PaymentControlPaymentBlock can determine the information about a payment block. PaymentControlPaymentBlock may be based on GDT PaymentBlock. PaymentControlFirstPaymentInstructionCode is the first instruction key used for instructions for a payment. PaymentControlFirstPaymentInstructionCode may be based on GDT PaymentInstructionCode.

PaymentControlSecondPaymentInstructionCode is the second instruction key used for instructions for a payment. PaymentControlSecondPaymentInstructionCode may be based on GDT PaymentInstructionCode. PaymentControlThirdPaymentInstructionCode is the third instruction key used for instructions for a payment. PaymentControlThirdPaymentInstructionCode may be based on GDT PaymentInstructionCode. PaymentControlFourthPaymentInstructionCode is the fourth instruction key used for instructions for a payment. PaymentControlFourthPaymentInstructionCode may be based on GDT PaymentInstructionCode.

PaymentControlBankChargeBearerCode can specify the bearer of the charges incurred during payment (such as charges at the expense of the payer). PaymentControlBankChargeBearerCode may be based on GDT BankChargeBearerCode.

PaymentControlPaymentPriorityCode can specify that bank transactions of this business partner have priority. PaymentControlPaymentPriorityCode may be based on GDT BusinessTransactionPriorityCode. The possible values for the PaymentPriorityCode are restricted to 2 (urgent) and 3 (normal).

PaymentControlSinglePaymentIndicator can determine the Indicator payment request can be grouped together with another payment request. PaymentControlSinglePaymentIndicator may be based on GDT Indicator and may have a Qualifier of SinglePayment.

PaymentControlDebitValueDate can determine the due date of the payment amount in the bank account of the party that initiated the payment. PaymentControlDebitValueDate may be based on GDT Date and may have a Qualifier of Value. PaymentControlCreditValueDate can determine the due date of the payment amount in the bank account of the party that received the payment. PaymentControlCreditValueDate may be based on GDT Date and may have a Qualifier of Value. PaymentControlPaymentReceivablesPayablesGroupID can determine the affiliation to a group of receivables or payables that are in relationship with each other for the purpose of common payment. PaymentControlCreditValueDate may be based on GDT PaymentReceivablesPayablesGroupID. QueryByBusinessPartnerInitiatedPayments can determine the query that provides a list of all DuePayments that were generated by a business partner initiated payment transaction.

In certain implementations the query elements include: DuePaymentBusinessPartnerInitiatedPaymentsQueryElements data type and these elements are: ID, PaymentControlPaymentProcessingCompanyID, PaymentControlPaymentProcessingBusinessPartnerInternalID, BusinessTransactionDate, DuePaymentStatus, OverallClearedTradeReceivablesPayablesRegisterItemBusinessPartnerRoleCategoryCode ID may be based on GDT BusinessTransactionDocumentID and is optional. PaymentControlPaymentProcessingCompanyID may be based on GDT OrganisationalCentreID and is optional. PaymentControlPaymentProcessingBusinessPartnerInternalID may be based on GDT BusinessPartnerInternalID and is optional. BusinessTransactionDate may be based on GDT Date and is optional. DuePaymentStatus may be based on IDT DuePaymentStatusElements and is optional. OverallClearedTradeReceivablesPayablesRegisterItem-BusinessPartnerRoleCategoryCode may be based on GDT PartRoleCategoryCode.

QueryByCompanyInitiatedPayments can determine the query that provides a list of all DuePayments that were generated by a company initiated payment transaction. The query elements are defined by the DuePaymentCompanyInitiatedPaymentsQueryElements data type. In certain implementations these elements include: ID, PaymentControlPaymentProcessingCompanyID, PaymentControlPaymentProcessingBusinessPartnerInternalID, PaymentExecutionDate BusinessTransactionDate, DuePaymentStatus, OverallClearedTradeReceivablesPayablesRegisterItemBusiness PartnerRoleCategoryCode.

ID may be based on GDT BusinessTransactionDocumentID and is optional. PaymentControlPaymentProcessingCompanyID may be based on GDT OrganisationalCentreID and is optional. PaymentControlPaymentProcessingBusinessPartnerInternalID may be based on GDT BusinessPartnerInternalID and is optional. BusinessTransactionDate may be based on GDT Date and is optional. DuePaymentStatus may be based on IDT DuePaymentStatusElements and is optional. OverallClearedTradeReceivablesPayablesRegisterItem-BusinessPartnerRoleCategoryCode may be based on GDT PartRoleCategoryCode.

QueryByClearedTradeReceivablesPayables can determine the query that provides a list of all DuePayments with at least one DuePaymentClearingExplanationItem node that refers to a predefined, cleared TradeReceivablesPayablesRegisterItem or TradeReceivablesPayablesRegisterItemSplitItem. These elements are defined by the DuePaymentClearedTradeReceivablesPayablesQueryElements data type. In certain implementations these elements include ClearedTradeReceivablesPayablesRegisterItemBaseBusinessTransactionDocumentReference and ClearedTradeReceivablesPayablesRegisterItemReference.

ClearedTradeReceivablesPayablesRegisterItemBaseBusinessTransactionDocumentReference may be based on GDT BusinessTransactionDocumentReference and is optional. ClearedTradeReceivablesPayablesRegisterItemReference may be based on GDT BusinessTransactionDocumentReference and is optional.

QueryByReconciliationElements can specify a list that Provides all DuePayments which uses the specified Company and AccountingTransactionDate on the associated FinancialAuditTrailDocumentations. This query is to be used for reconciliation with Process Component Financial Accounting. The query elements are defined by the type IDT: DuePaymentReconciliationElementsQueryElements. In certain implementations the elements included are FinancialAuditTrailDocumentationCompanyID and FinancialAuditTrailDocumentationAccountingTransactionDate.

FinancialAuditTrailDocumentationCompanyID may be based on GDT OrganisationalCentreID and is optional. FinancialAuditTrailDocumentationAccountingTransactionDate may be based on GDT Date and may have a qualifier of AccountingTransaction and is optional.

Item

Item is the share of the total payment amount of the DuePayment that is assigned to exactly one business account (TradeReceivablePayableAccounts). The elements located directly at the node DuePaymentItem can be determined by the type GDT: DuePaymentItemElements. In certain implementations the elements include: ID, UUID, ResponsibleCompanyID, ResponsibleCompanyUUID, ResponsibleBusinessPartnerInternalID, ResponsibleBusinessPartnerUUID, PaymentAmountFixedIndicator, TradeReceivablesPayablesRegisterItemReference, TotalBalanceClearingAmount, TotalBalanceAmount, OnAccountPaymentAmount, TotalWithholdingTaxAmount, TotalDeductionAmount, TotalMaximumCashDiscountAmount, TotalLastCashDiscountAmount, TotalPossibleCashDiscountAmount, TotalCashDiscountAmount, TotalClearingAmount, TotalNetAmount, TotalGrossAmount, PaymentAmount, TransactionCurrencyCode, TradeReceivablesPayablesRegisterDueCategoryCode, TradeReceivablesPayablesRegisterPropertyMovementDirectionCode, TradeReceivablesPayablesAccountUUID, and ResponsibleBusinessPartnerRoleCategoryCode.

ID is a unique identifier of the Item. ID may be based on GDT BusinessTransactionDocumentItemID. UUID is universally a unique identifier of the item. UUID may be based on GDT UUID.

ResponsibleCompanyID is a unique identifier of the company that is responsible for the payment. ResponsibleCompanyID may be based on GDT OrganisationalCentreID. ResponsibleCompanyUUID is universally a unique identifier of the business partner that participates in the payment. ResponsibleCompanyUUID may be based on GDT UUID.

ResponsibleBusinessPartnerInternalID is a unique identifier of the business partner that participates in the payment. ResponsibleBusinessPartnerInternalID may be based on GDT BusinessPartnerInternalID.

ResponsibleBusinessPartnerUUID is universally a unique identifier of the business partner that participates in the payment. ResponsibleBusinessPartnerUUID may be based on GDT UUID.

ResponsibleBusinessPartnerRoleCategoryCode can specify the role in which the company is involved in the payment (customer or vendor). ResponsibleBusinessPartnerRoleCategoryCode may be based on GDT PartyRoleCategoryCode.

TradeReceivablesPayablesAccountUUI is universally a unique identifier of the business account to which part of the payment is assigned. TradeReceivablesPayablesAccountUUI may be based on GDT UUID.

TradeReceivablesPayablesRegisterPropertyMovementDirectionCode can specify a coded representation of the increase and decrease of receivables or payables on the business account by the DuePaymentItem. TradeReceivablesPayablesRegisterPropertyMovementDirectionCode may be based on GDT PropertyMovementDirectionCode.

TradeReceivablesPayablesRegisterDueCategoryCode can specify a coded representation of the receivable or payable to which the DuePaymentItem on the business account leads. TradeReceivablesPayablesRegisterDueCategoryCode may be based on GDT DueCategoryCode.

TransactionCurrencyCode can specify a coded representation of the currency in which the payment of the receivables or payables is made. TransactionCurrencyCode may be based on GDT CurrencyCode. Integrity conditions can include currencies of all following amounts and may not differ from the TransactionCurrency specified.

PaymentAmount can determine part of the payment amount that is assigned to the business account in TransactionCurrency. PaymentAmount may be based on GDT Amount and may have a Qualifier of Payment.

TotalGrossAmount can determine the total of the original amounts of all receivables and payables, which refer to the DuePaymentItem, cleared with DuePayment in TransactionCurrency and is Optional. TotalGrossAmount may be based on GDT Amount and may have a Qualifier of Gross.

TotalNetAmount can determine the total of the payment amounts of all receivables and payables, which refer to the DuePaymentItem, cleared with DuePayment in TransactionCurrency and is Optional. TotalNetAmount may be based on GDT Amount and may have a Qualifier Net.

TotalClearingAmount can determine the total of the clearing amounts of all receivables and payables, which refer to the DuePaymentItem, cleared with DuePayment in TransactionCurrency and is Optional. TotalClearingAmount may be based on GDT Amount and may have a Qualifier of Clearing.

TotalCashDiscountAmount can determine the total of the deductions as a result of cash discounts of all receivables and payables, which refer to the DuePaymentItem, cleared with DuePayment in TransactionCurrency and is Optional. TotalCashDiscountAmount may be based on GDT Amount and may have a Qualifier of CashDiscount.

TotalPossibleCashDiscountAmount can determine the total of the ClearedTradeReceivablesPayablesRegisterItemSplitItemCashDiscountAmounts of the DuePaymentClearingExplanationItems, which refer to the DuePaymentItem, in TransactionCurrency and is Optional. TotalPossibleCashDiscountAmount may be based on GDT Amount and may have a Qualifier of CashDiscount.

TotalLastCashDiscountAmount can determine the total of the ClearedTradeReceivablesPayablesRegisterItemSplitItemLastCashDiscountAmounts of the DuePaymentClearingExplanationItems, which refer to the DuePaymentItem, in TransactionCurrency and is Optional. TotalLastCashDiscountAmount may be based on GDT Amount and may have a Qualifier of CashDiscount.

TotalMaximumCashDiscountAmount can determine the total of the ClearedTradeReceivablesPayablesRegisterItemSplitItem-MaximumCashDiscountAmounts of the DuePaymentClearingExplanationItems, which refer to the DuePaymentItem, in TransactionCurrency and is Optional. TotalMaximumCashDiscountAmount may be based on GDT Amount and may have a Qualifier of CashDiscount.

TotalDeductionAmount can determine the total of all other deductions of all receivables and payables, which refer to the DuePaymentItem, cleared with DuePayment in TransactionCurrency and is Optional. TotalDeductionAmount may be based on GDT Amount and may have a Qualifier Deduction.

TotalWithholdingTaxAmount can determine the total of the withholding tax amounts of all receivables and payables, which refer to the DuePaymentItem, cleared with DuePayment in TransactionCurrency and is Optional. TotalWithholdingTaxAmount may be based on GDT Amount and may have a Qualifier WitholdingTax.

OnAccountPaymentAmount can assign the part of the payment amount on the business account that is accepted without explanation by the assignment to receivables or payables as a payment on account and is Optional. OnAccountPaymentAmount may be based on GDT Amount and may have a Qualifier of Payment.

TotalBalanceAmount can determine the PaymentAmount—TotalNetAmount—OnAccountPaymentAmount. From the TotalBalanceAmount it can be determined whether the payment amount has been completely explained by the assignment to receivables and payables, or by the explicit acceptance as a payment on account, and which remaining amount may still be explained and is Optional. TotalBalanceAmount may be based on GDT Amount and may have a Qualifier of Balance.

TotalBalanceClearingAmount can determine the difference between TotalGrossAmount and TotalClearingAmount. From the TotalBalanceClearingAmount it can be determined whether the receivables and payables that are paid by the DuePayment are paid completely or incompletely. TotalBalanceClearingAmount may be based on GDT Amount and may have a Qualifier of Clearing.

TradeReceivablesPayablesRegisterItemReference can determine the reference to the receivable or payable generated from the DuePaymentItem that is stored in a TradeReceivablesPayablesRegisterItem and is Optional. TradeReceivablesPayablesRegisterItemReference may be based on GDT BusinessTransactionDocumentReference.

PaymentAmountFixedIndicator can determine the PaymentAmount and is normally calculated as the total of NetAmounts in the DuePaymentClearingExplanationItem node that can have relationships to the item. The PaymentAmountFixedIndicator suppresses this calculation and is Optional. PaymentAmountFixedIndicator may be based on GDT Indicator and may have a Qualifier Fixed.

Inbound aggregation relationships can exist between business object (or node) TradeReceivablesPayablesAccount/node Root and business object (or node) BusinessPartner. TradeReceivablesPayablesAccount specifies the business account to which part of the payment amount is assigned. In certain implementations, BusinessPartner is the BusinessPartner that due to an obligation is either authorized to claim a service, or obliged to provide a service. In certain implementations, Business object BusinessPartner is a company to which an obligation is either authorized to claim a service, or obliged to provide a service.

(Specialization) Associations for Navigation

Business object TradeReceivablesPayablesRegister node Item associates to the TradeReceivablesPayablesRegisterItem, which is created out of the DuePaymentItem at action ‘Release’.

ClearingExplanationItem

ClearingExplanationItem is the explanation, which part of the payment amount of the DuePayment can be cleared with which receivable or payable and which amount. The elements located directly at the node ClearingExplanationItem can be determined by the type GDT:

DuePaymentClearingExplanationItemElements. In certain Implementations the elements included are: ID, UUID, ClearedTradeReceivablesPayablesRegisterItemReference, ClearedTradeReceivablesPayablesRegisterItemPropertyMovementDirectionCode, ClearedTradeReceivablesPayablesRegisterItemDueCategoryCode, ClearedTradeReceivablesPayablesRegisterItemTypeCode, TransactionCurrencyCode, OriginalDocumentCurrencyGrossAmount, GrossAmount, OriginalDocumentCurrencyNetAmount, NetAmount, OriginalDocumentCurrencyClearingAmount, ClearingAmount, OriginalDocumentCurrencyCashDiscountAmount, CashDiscountAmount, ClearedTradeReceivablesPayablesRegister-ItemSplitItemCashDiscountAmount, ClearedTradeReceivablesPayablesRegisterItemSplitItemLastCashDiscountAmount, ClearedTradeReceivablesPayablesRegisterItemSplitItem-MaximumCashDiscountAmount, ClearedTradeReceivablesPayablesRegisterItemSplitItemCashDiscountPercent, ClearedTradeReceivablesPayablesRegisterItemSplitItemLastCashDiscountPercent, ClearedTradeReceivablesPayablesRegisterItemSplitItemMaximumCashDiscountPercent, ClearedTradeReceivablesPayablesRegisterItemSplitItemOverdueDuration, ClearedTradeReceivablesPayablesRegisterItemSplitItemLastCashDiscountOverdueDuration, ClearedTradeReceivablesPayablesRegisterItemSplitItemMaximumCashDiscountOverdueDuration, OriginalDocumentCurrencyTotalDeductionAmount, TotalDeductionAmount, OriginalDocumentCurrencyWithholdingTaxAmount, WithholdingTaxAmount, DuePaymentItemID, DuePaymentItemUUID, DuePaymentPaymentExplanationItemReference, TradeReceivablesPayablesAccountUUID, DueClearingReference, Note, and Status.

ID is a unique identifier of ClearingExplanationItem. ID may be based on GDT BusinessTransactionDocumentItemID. UUID is universally a unique identifier of ClearingExplanationItem. UUID may be based on GDT UUID.

ClearedTradeReceivablesPayablesRegisterItemReference can determine the reference to the receivable or payable that is cleared by the DuePayment—at least partially. ClearedTradeReceivablesPayablesRegisterItemReference may be based on GDT BusinessTransactionDocumentReference.

ClearedTradeReceivablesPayablesRegisterItemPropertyMovementDirectionCode can specify a coded representation of the increase or decrease of receivables or payables on the business account by the DuePaymentItem. ClearedTradeReceivablesPayablesRegisterItemPropertyMovementDirectionCode may be based on GDT PropertyMovementDirectionCode.

ClearedTradeReceivablesPayablesRegisterItemDueCategoryCode can specify a coded representation of the receivable or payable to which the DuePaymentItem on the business account leads. ClearedTradeReceivablesPayablesRegisterItemDueCategoryCode may be based on GDT DueCategoryCode.

ClearedTradeReceivablesPayablesRegisterItemTypeCode can determine the type of TradeReceivablesPayablesRegisterItem. ClearedTradeReceivablesPayablesRegisterItemTypeCode may be based on GDT TradeReceivablesPayablesRegisterItemTypeCode.

TransactionCurrencyCode can determine the currency in which the payment transaction of receivables and payables is processed. TransactionCurrencyCode may be based on GDT CurrencyCode. Integrity Conditions are the TransactionCurrencyCode that has to match the TransactionCurrencyCode of the referenced DuePaymentItem. The Currencies of all following amounts may match the TransactionCurrency if the name of the field does not imply anything else.

OriginalDocumentCurrencyGrossAmount can determine the total gross amount to be cleared in the currency of the base business document. This can be an invoice, credit memo, number, or a payment. OriginalDocumentCurrencyGrossAmount may be based on GDT Amount.

GrossAmount can determine the total gross amount to be cleared in TransactionCurrency. GrossAmount is based on GDT Amount and may have a Qualifier of Gross.

OriginalDocumentCurrencyNetAmount can determine the Amount to be cleared or cleared amount in the currency of the base business document corrected by the deductions. OriginalDocumentCurrencyNetAmount may be based on GDT Amount and may have a Qualifier Net.

NetAmount can determine the amount to be cleared or cleared amount in TransactionCurrency corrected by the deductions. NetAmount may be based on GDT Amount and may have a Qualifier Net.

OriginalDocumentCurrencyClearingAmount can determine the amount to be cleared or cleared amount in the currency of the base business document. OriginalDocumentCurrencyClearingAmount may be based on GDT Amount and may have a Qualifier of Clearing.

ClearingAmount can determine the amount to be cleared or cleared amount in TransactionCurrency. ClearingAmount may be based on GDT Amount and may have a Qualifier of Clearing.

OriginalDocumentCurrencyCashDiscountAmount can determine the claimed cash discount amount or amount to be claimed in the currency of the base business document. This can be an invoice or a credit memo and is Optional. OriginalDocumentCurrencyCashDiscountAmount may be based on GDT Amount and may have a Qualifier CashDiscount.

CashDiscountAmount can determine the claimed cash discount amount or cash discount amount to be claimed in TransactionCurrency and is Optional. CashDiscountAmount may be based on GDT Amount and may have a Qualifier Cash Discount.

ClearedTradeReceivablesPayablesRegisterItemSplitItemCashDiscountAmount can determine the cash discount amount in TransactionCurrency that could be claimed and is Optional. ClearedTradeReceivablesPayablesRegisterItemSplitItemCashDiscountAmount may be based on GDT Amount and may have a Qualifier CashDiscount. ClearedTradeReceivablesPayablesRegisterItemSplitItemCashDiscountAmount may be based on GDT Amount and have a Qualifier of CashDiscount.

ClearedTradeReceivablesPayablesRegisterItemSplitItemLastCashDiscountAmount can determine the cash discount amount in TransactionCurrency that could have been claimed up to the last cash discount period and is Optional. ClearedTradeReceivablesPayablesRegisterItemSplitItemLastCashDiscountAmount may be based on GDT Amount and may have a Qualifier CashDiscount.

ClearedTradeReceivablesPayablesRegisterItemSplitItemMaximumCashDiscountAmount can determine the maximum cash discount amount in TransactionCurrency which would ever have been possible and is Optional. ClearedTradeReceivablesPayablesRegisterItemSplitItemMaximumCashDiscountAmount may be based on GDT Amount and may have a Qualifier CashDiscount.

ClearedTradeReceivablesPayablesRegisterItemSplitItemCashDiscountPercent can specify the representation of the cash discount amount that could be claimed as percentage of the GrossAmount and is Optional. ClearedTradeReceivablesPayablesRegisterItemSplitItemCashDiscountPercent may be based on GDT Percent and may have a Qualifier of CashDiscount.

ClearedTradeReceivablesPayablesRegisterItemSplitItemLastCashDiscountPercent can specify the representation of the cash discount amount which could have been claimed at the last cash discount period as percentage of the GrossAmount and is Optional. ClearedTradeReceivablesPayablesRegisterItemSplitItemLastCashDiscountPercent may be based on GDT Percent and may have a Qualifier of CashDiscount.

ClearedTradeReceivablesPayablesRegisterItemSplitItemMaximumCashDiscountPercent can determine the maximum cash discount amount in TransactionCurrency which would ever have been possible as percentage of the GrossAmount and is Optional. ClearedTradeReceivablesPayablesRegisterItemSplitItemMaximumCashDiscountPercent may be based on GDT Percent and may have a Qualifier of CashDiscount.

ClearedTradeReceivablesPayablesRegisterItemSplitItemOverdueDuration can determine the number of days in arrears, meaning the difference between the execution date of the payment (PaymentExecutionDate) and the due date of the receivable or payable taking account of cash discount days and tolerance days and is Optional. ClearedTradeReceivablesPayablesRegisterItemSplitItemOverdueDuration may be based on GDT Day_Duration and may have a Qualifier of Overdue.

ClearedTradeReceivablesPayablesRegisterItemSplitItem-LastCashDiscountOverdueDuration can determine the number of days in arrears since the last cash discount period has passed, meaning the difference between the execution date of the payment (PaymentExecutionDate) and the date of the last cash discount period of the receivable or payable and is Optional. ClearedTradeReceivablesPayablesRegisterItemSplitItem-LastCashDiscountOverdueDuration may be based on GDT Day_Duration and may have a Qualifier of Overdue.

ClearedTradeReceivablesPayablesRegisterItemSplitItem-MaximumCashDiscountOverdueDuration can determine the number of days in arrears since the cash discount period for the maximum cash discount, meaning the difference between the execution date of the payment (PaymentExecutionDate) and the date of the cash discount period for the maximum cash discount of the receivable or payable and is Optional. ClearedTradeReceivablesPayablesRegisterItemSplitItem-MaximumCashDiscountOverdueDuration may be based on GDT Day_Duration and may have a Qualifier of Overdue.

OriginalDocumentCurrencyTotalDeductionAmount can determine the total of all non-cash discount deductions in the currency of the base business document and is Optional. OriginalDocumentCurrencyTotalDeductionAmount may be based on GDT Amount and may have a Qualifier of Deduction.

TotalDeductionAmount can determine the total of all non-cash discount deductions in TransactionCurrency and is Optional. TotalDeductionAmount may be based on GDT Amount and may have a Qualifier of Deduction.

OriginalDocumentCurrencyWithholdingTaxAmount can determine the withholding tax amount in the currency of the base business document and is Optional. OriginalDocumentCurrencyWithholdingTaxAmount may be based on GDT Amount and may have a Qualifier of WithholdingTax.

WithholdingTaxAmount can determine the withholding tax amount in TransactionCurrency and is Optional. WithholdingTaxAmount may be based on GDT Amount and may have a Qualifier of WithholdingTax.

DuePaymentItemID is a unique identifier of the DuePaymentItem that belongs to the same business account as the receivable or payable to be cleared and is Optional. DuePaymentItemID may be based on GDT BusinessTransactionDocumentID.

DuePaymentItemUUID is universally a unique identifier of the DuePaymentItem that belongs to the same business account as the receivable or payable to be cleared and is Optional. DuePaymentItemUUID may be based on GDT UUID.

DuePaymentPaymentExplanationItemReference can determine the reference to the PaymentExplanationItem in the PaymentExplanation that contains references to the receivable or payable to be cleared that is transferred by the business partner for business partner initiated payment transactions and is Optional. DuePaymentPaymentExplanationItemReference may be based on GDT BusinessTransactionDocumentReference.

TradeReceivablesPayablesAccountUUID is universally a unique identifier of the business account to which the receivable or payable referenced in ClearedTradeReceivablesPayablesRegisterItemReference is assigned. TradeReceivablesPayablesAccountUUID may be based on GDT UUID.

DueClearingReference can determine the reference to DueClearing that takes on the clearing between the position change generated by DuePaymentItem on the business account (TradeReceivablesPayablesAccount) and the receivable or payable referenced in ClearedTradeReceivablesPayablesRegisterItemReference. DueClearingReference may be based on GDT BusinessTransactionDocumentReference. BusinessTransactionDocumentReference-ItemID is filled with the DueClearingExplanationItemID.

Note can determine the user-defined text that explains the payment and the deducted amounts, may be based on GDT Note, and is Optional.

Status can determine status of the DuePaymentClearingExplanationItem. Status may be based on IDT DuePaymentClearingExplanationItemStatus. In some implementations, the IDT DuePaymentClearingExplanationItemStatus can include the following fields: ReleaseStatusCode, ConsistencyStatusCode, ClearingStatusCode, and ApprovalStatusCode.

ReleaseStatusCode can determine the population of the current ReleaseStatus from the DuePaymentHeader. ReleaseStatusCode may be based on GDT ReleaseStatusCode.

ConsistencyStatusCode can determine the population of the current consistency status from the DuePaymentHeader. ConsistencyStatusCode may be based on GDT ConsistencyStatusCode.

ClearingStatusCode can determine the current clearing status of the associated TradeReceivablesPayablesRegisterItemSplitItem. ClearingStatusCode may be based on GDT ClearingStatusCode.

ApprovalStatusCode can determine the population of the current ApprovalStatus from the DuePaymentHeader. ApprovalStatusCode may be based on GDT ApprovalStatusCode.

In the following composition, relationships exist with subordinate nodes ClearingExplanationItemDifferenceExplanationItem. Inbound Aggregation Relationships from business object DuePayment/node Item DuePaymentItem. DuePayment can specify the amount of the DuePayment node Item which is cleared by a receivable or payable.

Inbound Association Relationships from business object TradeReceivablesPayables/node Item ClearedTradeReceivablesPayablesRegisterItem can specify the amount of the TradeReceivablesPayables node Item which is cleared by DuePaymentClearingExplanationItem. From business object TradeReceivablesPayables/node SplitItem ClearedTradeReceivablesPayablesRegisterItemSplitItem, can specify the amount of the TradeReceivablesPayables node ItemSplitItem which is cleared by DuePaymentClearingExplanationItemSplitItem.

(Specialization) Associations for Navigation can specify business object DueClearing node Root and DueClearingRoot association to the DueClearing, which stores the clearing data belonging to the DuePayment. Business object DueClearing node ExplanationItem can determine DueClearingExplanationItem associated with DueClearingExplanationItem, which stores the clearing data belonging to the DuePayment.

Enterprise Service Infrastructure Actions

Clear (S&AM action) triggers the clearing of the TradeReceivablesPayablesRegisterItemSplitItems referenced in ClearingExplanationItem with the TradeReceivablesPayablesRegisterItemSplitItem can include, preconditions, changes to other objects and changes to the Status. Preconditions for example can include already posted DuePayment that exists and ClearingExplanationItem that has not yet been cleared. Changes to other objects can include, for example, the change by which the action "Clear" which is called at the DueClearing business object. Changes to the status depending on ClearingStatus can set the value "Cleared." This action may only be performed by the UI, inbound agents, and the business object itself.

DeleteClearingExplanationItem (S&AM action) deletes the ClearingExplanationItem and can include, preconditions, changes to the object, and changes to other objects. Preconditions for example can include a DuePayment that exists with ReleaseStatus that is not "Release cancelled" or "Release discarded" and ClearingExplanationItem has the ClearingStatus "Open." Changes to the object can include, for example, the change by which the ClearingExplanationItem is deleted. Changes to other objects can include, for example, the change by which the deletion of the ClearingExplanationItem which is transferred to the associated DueClearing business object and locks that prevent the associated TradeReceivablesPayablesRegisterItemSplitItem business object against use in other payment transactions may be removed. The action may be performed by the UI and the business object itself.

ResetClearing (S&AM action) triggers the cancellation of a clearing that has previously been carried out and can include preconditions, changes to other objects, and changes to the status. Preconditions for example can include an already posted DuePayment and the ClearingExplanationItem that has the ClearingStatus "Cleared." Changes to the status depending on the ClearingStatus can set the value "Open." This action may only be performed by the UI, inbound agents, and the business object itself.

ClearingExplanationItemDifferenceExplanationItem

ClearingExplanationItemDifferenceExplanationItem 44022 is an explanation of the difference between the payment amount and the amount of the receivable or payable to be cleared less cash discount in the ClearingExplanationItem. The elements located directly at the node ClearingExplanationItemDifferenceExplanationItem can be determined by the type GDT: DuePaymentClearingExplanationItemDifferenceExplanationItemElements. In certain implementations these elements can include: ID, UUID, Amount, OriginalDocumentCurrencyAmount, PaymentDifferenceReasonCode, DuePaymentPaymentExplanationItemPaymentDifferenceExplanationReference, and DueClearingExplanationItemDifferenceExplanationItemReference.

ID is a Unique identifier of ClearingExplanationItemDifferenceExplanationItem. ID may be based on GDT BusinessTransactionDocumentItemID. UUID is Universally a unique identifier of ClearingExplanationItemDifferenceExplanationItem. UUID may be based on GDT UUID.

Amount can determine the amount of the adjustment of a payment in TransactionCurrency of the ClearingExplanationItem node. Amount may be based on the GDT Amount and may have a Qualifier of Deduction.

OriginalDocumentCurrencyAmount can determine the amount of the adjustment of a payment in original document currency of the ClearingExplanationItem node. OriginalDocumentCurrencyAmount may be based on GDT Amount and have a Qualifier of Deduction.

PaymentDifferenceReasonCode can determine coding for the reason of the payment difference and is Optional. PaymentDifferenceReasonCode may be based on GDT PaymentDifferenceReasonCode.

DuePaymentPaymentExplanationItemPaymentDifferenceExplanationReference can determine the reference to the PaymentExplanationItemPaymentDifferenceExplanation in the PaymentExplanation, which contains a payment difference for the payment of a payable or receivable in business partner initiated payment and is Optional. DuePaymentPaymentExplanationItemPaymentDifferenceExplanationReference may be based on GDT BusinessTransactionDocumentReference.

DueClearingExplanationItemDifferenceExplanationItemReference can determine the reference to the ExplanationItemDifferenceExplanationItem of DueClearing that takes on the clearing between the position changes generated by DuePaymentItem on the business account (TradeReceivablesPayablesAccount) and the receivable or payable referenced in ClearedTradeReceivablesPayablesRegisterItemReference. DueClearingExplanationItemDifferenceExplanationItemReference may be based on GDT BusinessTransactionDocumentReference. BusinessTransactionDocumentReference-ID can be filled with the DueClearingRootID.

Specialization associations for navigation can exist for the business object DueClearing node ExplanationItemDifferenceExplanationItem. DueClearingExplanationItemDifferenceExplanationItem can be associated to the DueClearing ExplanationItemDifferenceExplanationItem, which stores the clearing data belonging to the DuePayment. Integrity Conditions may apply if a receivable or payable (except the deduction of cash discount and without other deductions) is paid.

BusinessProcessVariantType

BusinessProcessVariantType can specify the character of a business process variant of a Due Payment. The elements located directly at the node BusinessProcessVariantType can determine the data type BusinessProcessVariantTypeElements. In certain implementations elements can include: BusinessProcessVariantTypeCode and MainIndicator.

BusinessProcessVariantTypeCode is a coded representation of a business process variant type of a DuePayment. BusinessProcessVariantTypeCode may be based on GDT BusinessProcessVariantTypeCode.

MainIndicator can specify whether the current BusinessProcessVariantTypeCode is the main one or not. MainIndicator may be based on GDT Indicator and may have a Qualifier of Main.

DifferenceExplanationItem (Transformation Node)

DifferenceExplanationItem is total of all ClearingExplanationItemDifferenceExplanationItems of the DuePayment per PaymentDifferenceReasonCode. The elements located directly at the DifferenceExplanationItem node can be determined by the type GDT: DuePaymentDifferenceExplanationItemElements. In certain implementations elements can include: TotalAmount and PaymentDifferenceReasonCode.

TotalAmount can determine the amount of the adjustment of a payment in TransactionCurrency of the ClearingExplanationItem node and is Optional. TotalAmount may be based on GDT Amount and may have a Qualifier of Total.

PaymentDifferenceReasonCode can determine the coding for the reason of the payment difference and is Optional. PaymentDifferenceReasonCode may be based on GDT PaymentDifferenceReasonCode.

Summary (Transformation Node)

The elements located directly at the Summary node can determine the type GDT: DuePaymentSummaryElements. In certain implementations elements can include: PaymentExecutionPreparationStatusCode and DuePaymentClearingExplanationItemTotalNumberValue.

PaymentExecutionPreparationStatusCode can determine the status the preparation of the payment execution of a company initiated DuePayment. PaymentExecutionPreparationStatusCode may be based on DuePaymentPaymentExecutionPreparationStatusCode.

DuePaymentClearingExplanationItemTotalNumberValue can determine the number of ClearingExplanationItems at DuePayment. DuePaymentClearingExplanationItemTotalNumberValue may be based on GDT NumberValue and may have a Qualifier of Total.

DO PaymentExplanation

PaymentExplanation is an explanation of the payment amount of DuePayment with reference to business transactions that generate receivables or payables or to the documents that document these business transactions.

DO PaymentControl

PaymentControl is the agreement about the payment processing of DuePayment.

DO FinancialAuditTrailDocumentation

FinancialAuditTrailDocumentation is Documentation of the changes to receivables and payables (TradeReceivablesPayables) can generate from DuePayment and the information transferred to Financial Accounting.

DO: AccessControlList

The AccessControlList can specify a list of access groups that have access to a DuePayment during a validity period.

Business Object Dunning

Figure 45:
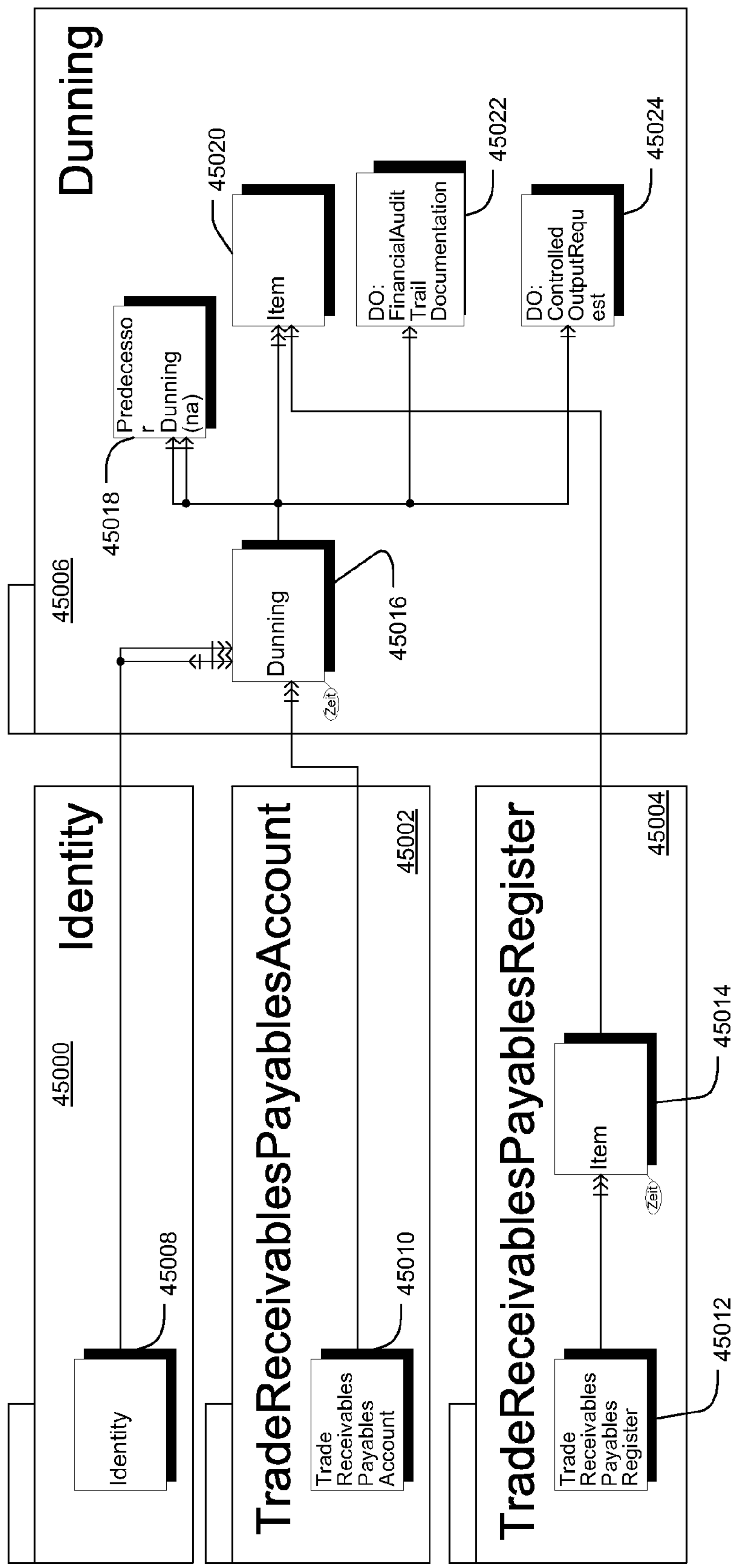
FIG. 45 shows an exemplary Dunning object model.

FIG. 45 illustrates one example of an Dunning business object model 45006. Specifically, this figure depicts interactions among various hierarchical components of the Dunning, as well as external components that interact with the Dunning (shown here as 45000 through 45004 and 45008 through 45014).

Business Object Dunning is a company's (e.g., the creditor's) demand upon a business partner (the debtor) for payment. A Dunning relates to receivable items in a TradeReceivablesPayablesAccount for which payment will be demanded at a particular point in time. The Dunning serves as the basis for creating and sending reminders or demands for payment, it can control and document the dunning process, and it may include the calculation of dunning fees. The business object Dunning is part of the process component Due Item Management. A Dunning often contain as many Items as overdue receivable items in the corresponding TradeReceivablesPayablesAccount were waiting to be dunned when the Dunning was created, as an Item is created for each of these receivable items. A Dunning can include a FinancialAuditTrailDocumentation that often contain all information required by accounting. Dunning is represented by the node Dunning.

Service Interfaces

The Business Object is involved in the following Process Integration Models: DueItemProcessingDunningInvoice_Accounting and DueItem Processing Dunning_Due Item Processing At Business Partner. Service Interface Dunning Invoice Accounting Out (e.g., DueItemProcessingDunningInvoiceAccountingOut) is part of the following Process Integration Models: DueItemProcessingDunningInvoice_Accounting. Service Interface Dunning Invoice Accounting Out groups the operations, which inform accounting of changes of dunning fees. Notify of Dunning Invoice (A2A) (e.g., DueItemProcessingNotify of Dunning Invoice) notifies Accounting of dunning fees.

The operation is based on message type Invoice Accounting Notification (e.g., derived from the business object AccountingNotification). Notify of Dunning Invoice Cancellation (A2A) (e.g., DueItemProcessing Notify of Dunning Invoice Cancellation) notifies Accounting of the cancellation of dunning fees.

The operation is based on message type Invoice Cancellation Accounting Notification (derived from the business object AccountingNotification). Service Interface Dunning Out (e.g., DueItemProcessingDunningOut) is part of the following Process Integration Models: DueItem Processing Dunning and Due Item Processing At Business Partner. Service interface Dunning Out groups the operations, which create reminders or demands for payment. Notify of Dunning (B2B) (e.g., DueItemProcessingDunningOut.NotifyOfDunning) notifies business partner of a reminder or demand for payment. The operation is based on message type FormDunningNotification (e.g., derived from the business object Dunning).

Node Structure of Business Object Dunning (Root Node)

Dunning 45016 is general information (e.g., such as when and how the Dunning was created, and its current status) and accumulated data (for example, highest dunning level and total amount of all dunned items). The elements located directly at the node Dunning are defined by the type GDT: DunningElements. In certain implementations, these elements include: UUID, ID, TradeReceivablesPayablesAccountUUID, CompanyUUID, CompanyID, BusinessPartnerUUID, BusinessPartnerInternalID, PredecessorUUID, DunningProcedureCode, SystemAdministrativeData, ReleaseDocumentDate, GracePeriodDuration, RelevantItemsTotalNumberValue, ExcludedItemsTotalNumberValue, BlockedItemsTotalNumberValue, ItemsTotalNumberValue, RelevantTotalAmount, ExcludedTotalAmount, BlockedTotalAmount, TotalAmount, MaximumDunningLevelValue, MaximumDaysOverdueTotalNumberValue, DunningNoticeLegallyEffectiveIndicator, CommunicationMediumTypeCode, DunningFeeAmount, DunningProposalReleasabilityCode.

UUID is an universal identifier, which can be unique, of dunning. UUID may be based upon GDT UUID. ID is an Identifier of the dunning. ID may be based on GDT BusinessTransactionDocumentID.

TradeReceivablesPayablesAccountUUID is the TradeReceivablesPayablesAccount for which the dunning was created. TradeReceivablesPayablesAccountUUID may be based on GDT UUID.

CompanyUUID is the company of the TradeReceivablesPayables Account. CompanyUUID may be based on GDT UUID.

CompanyID is the company of the TradeReceivablesPayablesAccount, semantic key. CompanyID may be based upon GDT OrganisationalCentreID.

BusinessPartnerUUID is an identifier of the business partner of the TradeReceivablesPayables Account and is of type GDT: UUID. BusinessPartnerInternalID is an identifier of the business partner of the TradeReceivablesPayablesAccount, semantickey. BusinessPartnerInternalID may be based on GDT BusinessPartnerInternalID.

PredecessorUUID is the Link to the previous dunning and can be optional. PredecessorUUID may be based on GDT UUID. DunningProcedureCode is a coded representation of the type of dunning procedure. DunningProcedureCode may be based on GDT DunningProcedureCode.

SystemAdministrativeData is administrative data including when and by whom the dunning was created and last changed SystemAdministrativeData may be based on GDT SystemAdministrativeData.

ReleaseDocumentDate is a date when the dunning was released (e.g., relevant for action "release"). ReleaseDocumentDate may be based on GDT Date, with Qualifier "Document."

GracePeriodDuration is the grace period after the release of a dunning, by the end of which the dunned amount can be paid and can be optional. GracePeriodDuration may be based on Restricted CDT DAY_Duration, with Qualifier DunningGracePeriod.

RelevantItemsTotalNumberValue is a number of DunningItems for which the business partner will actually be dunned. RelevantItemsTotalNumberValue may be based on GDT NumberValue, with Qualifier Total.

ExcludedItemsTotalNumberValue is a number of DunningItems which are excluded from dunning but not blocked. Excluded DunningItems is a temporary exclusion from the Dunning document which will be created when the Dunning is released. If a DunningItem is blocked, a Dunning Block is also set on the associated TradeReceivablesPayablesRegisterItem and an expiration date can be maintained to prevent the automatic inclusion in Dunnings in the future. ExcludedItemsTotalNumberValue may be based on GDT NumberValue, with Qualifier Total.

BlockedItemsTotalNumberValue is a number of DunningItems that cannot be dunned because they are blocked for dunning. BlockedItemsTotalNumberValue may be based on GDT NumberValue, with Qualifier Total.

ItemsTotalNumberValue is a number of all DunningItems, irrespective of their status. The number can equal the sum of the three numbers above. ItemsTotalNumberValue can be based on GDT TotalNumberValue.

RelevantTotalAmount is a total amount of all relevant DunningItems (e.g., compare RelevantItemsTotalNumberValue), that is the amount for which the business partner will be dunned. Currency is according to dunning procedure. RelevantTotalAmount can be based on GDT Amount, with Qualifier Total.

ExcludedTotalAmount is a total amount of all DunningItems excluded but not blocked (e.g., compare ExcludedItems-TotalNumberValue). The Currency is according to the dunning procedure. ExcludedTotalAmount can be based on GDT Amount, with Qualifier Total.

BlockedTotalAmount is a total amount of all blocked DunningItems. Currency according to dunning procedure. BlockedTotalAmount can be based on GDT Amount, with Qualifier Total.

TotalAmount is a total amount of all DunningItems including those that cannot be dunned. Currency according to dunning procedure. TotalAmount can be based on GDT Amount, with Qualifier Total.

MaximumDunningLevelValue is highest dunning level of all relevant DunningItems.

MaximumDunningLevelValue can be based on GDT DunningLevelValue.

MaximumDaysOverdueTotalNumberValue maximum number of days the DunningItems have been overdue. MaximumDaysOverdueTotalNumberValue can be based on GDT TotalNumberValue.

DunningNoticeLegallyEffectiveIndicator indicates whether the communication to the debtor will be legally effective and can be optional. DunningNoticeLegallyEffectiveIndicator may be based on GDT EffectiveIndicator.

CommunicationMediumTypeCode is the medium to be used for communicating the information to the debtor. CommunicationMediumTypeCode can be based on GDT CommunicationMediumTypeCode.

DunningFeeAmount is the Dunning fee for this dunning, dependent on the maximum dunning level and given by the procedure. Currency according to dunning procedure.

DunningFeeAmount can be based on GDT Amount, with Qualifier Fee.

DunningProposalReleasabilityCode classifies a dunning proposal by the possibility to release it and, in case it cannot be released, by the reason for that and can be optional. DunningProposalReleasabilityCode may be based on GDT DunningProposalReleasabilityCode. This element summarizes information contained in several elements and status variables. As the derivation is not reversible the element can not be changed directly. Its value is only meaningful while the LifeCycle status is "open".

The following composition relationships to subordinate nodes exist. Item 45020 has a cardinality relationship of 1:cn. FinancialAuditTrailDocumentation 45022 has a cardinality relationship of 1:c. DO ControlledOutputRequest 45024 has a cardinality relationship of 1:c.

Inbound Aggregation Relationships:

There may be a number of inbound aggregation relationships. From the business object TradeReceivablesPayablesAccount/node TradeReceivablesPayablesAccount to the TradeReceivablesPayablesAccount business object (or node) there may be a cardinality relationship of 1:cn. TradeReceivablesPayablesAccount denotes the TradeReceivablesPayablesAccount for which the dunning was created, thus determining the business partner to be dunned and the dunning company. The TradeReceivablesPayablesAccount is used also for access control to a Dunning.

From the business object Dunning/node Root to the PredecessorDunning 45018 business object (or node) there may be a cardinality relationship of c:c. PredecessorDunning denotes the last dunning of the same TradeReceivablesPayablesAccount. From the business object Identity/node Root to the CreationIdentity business object (or node) there may be a cardinality relationship of 1:cn. CreationIdentity is the identity that created the Dunning. From the business object Identity/node Root to the LastChangeIdentity business object (or node) there may be a cardinality relationship of c:cn. LastChangeIdentity is the identity that changed the Dunning in the last time.

Enterprise Service Infrastructure Actions

The Propose action creates a dunning proposal for a given TradeReceivablesPayablesAccount, that is a Dunning with initial LifeCycle status, with DunningItems for all overdue open receivables of the company against one business partner. This action may be the only way to create a Dunning. Changes to the object can include a new object, including new items. Changes to other objects can include the change by which Dunning information is updated in TradeReceivablesPayablesAccount (UUID and date of the last dunning). Changes to the status can include the status change by which the initial LifeCycle Status of the business object is “open”. Items are created with InclusionStatus ‘relevant’ or “blocked” (if the TradeReceivablesPayablesRegisterItem is blocked). If no relevant items exist Root DunningRelevance is set to “irrelevant”, otherwise to “relevant”. Parameters can include the following elements. The action elements are defined by the data type DunningProposeActionElements. These elements can include TradeReceivablesPayablesAccountUUID. TradeReceivablesPayablesAccountUUID is the UUID of the TradeReceivablesPayablesAccount for which the dunning shall be created, is of type GDT: UUID.

The Release action (S&AM action) triggers the creation and sending out of a dunning document. Preconditions can include the condition that the Dunning can have the LifeCycle status “open”. Changes to the object can include the change by which the ReleaseDocumentDate is set to the current date. Changes to other objects can include the change by which, if a dunning fee is charged, then Accounting is informed by an InvoiceAccountingNotification message and a dependent object FinancialAuditTrailDocumentation is created. Dunning information is updated in TradeReceivablesPayablesRegisterItem (UUID, date and level). Changes to the status can include the status change by which the LifeCycle status of the business object changes to “released”. In some implementations, every dunning has to be checked by a person before it is released. Consequently, this action should only be performed by the UI.

The Cancel action reverses a previously released dunning. Preconditions can include the condition that the Dunning can have the LifeCycle status “released”. Changes to other objects can include the change by which if the dunning was Accounting-relevant, then the reversal is too, and a message can be sent. Dunning information is updated in TradeReceivablesPayablesRegisterItem (UUID, date and level). Changes to the status can include the status change by which the LifeCycle status is irreversibly changed to “cancelled”. In some implementations, this action can only be performed by the UI.

The Reject action Dismisses a dunning to prevent the creation of a Dunning document. Further processing of this Dunning will not be possible. This action can also be triggered when a new dunning proposal is created for the same TradeReceivablesPayables Account. Preconditions can include the condition that the Dunning can have the status “open”. Changes to the status can include the status change by which the status of the object is set to “rejected”. This action can be performed both explicitly by the UI and implicitly by the action “Propose.”

The CheckDunningRelevance action checks if the dunning can be released, which means that at least one Dunning Item will be dunned and the amount is worth dunning. The action can be triggered automatically whenever an item changes. Preconditions can include the condition that Life Cycle Status can be “open”. Changes to the status can include the status change by which: if the TotalAmount is zero or lower than the minimum amount defined in the dunning procedure schema, the DunningRelevanceStatus is set to “irrelevant”, otherwise to “relevant.”

The Block action protects the business partner against any dunning for a specified time period. Preconditions can include the condition that Life Cycle status can be “open” and BusinessPartnerDunningBlocking status can be “Not blocked”. Changes to the object can include the change by which ReleasabilityDunningProposalGroup is adjusted to status changes. Changes to other objects can include the change by which a dunning block is set on the TradeReceivablesPayablesAccount. Changes to the status can include the status change by which the BusinessPartnerDunningBlockingStatus is set to “blocked”. Parameters can include action elements that are defined by the data type DunningBlockActionElements. These elements are: DunningBlockingReasonCode, BlockingExpirationDateTime and BlockingNote. DunningBlockingReasonCode is a coded representation of the cause for blocking, and is of type GDT: DunningBlockingReasonCode). BlockingExpirationDateTime is the end of blocking period, and is of type GDT: Date. BlockingNote is free text for additional information regarding the block, and is of type GDT: Note.

The Unblock action (S&AM action) lifts the dunning block from the TradeReceivablesPayablesItem and re-includes the item in the current dunning. Preconditions can include the condition that Life Cycle status can be “open” and BusinessPartnerDunningBlocking status can be “blocked”. Changes to the object can include the change by which ReleasabilityDunningProposalGroup is adjusted to status changes. Changes to other objects can include the change by which the dunning block is lifted from the TradeReceivablesPayablesAccount. Changes to the status can include the status change by which the BusinessPartnerDunningBlockingStatus is set to “Not blocked”.

The CheckBusinessPartnerDunningBlock action (S&AM action) checks if the Business Partner to which the dunning would be sent is currently protected against dunning by a dunning block, and sets the status accordingly. The action can also be triggered when a new dunning proposal is created. Preconditions can include the condition that Life Cycle Status can be “open”. Changes to the status can include the status change by which, depending on whether a dunning block is maintained for the Business Partners in the TradeReceivablesPayablesAccount, the BusinessPartnerDunningBlockingStatus is set to “not blocked” or blocked”. This action can be performed both explicitly by the UI and implicitly by the action “Propose.”

The Exclude action protects the business partner once against dunning. Unlike Block, this action may only affect the current dunning proposal and has no effect on future proposals. The Include action removes the one-time protection of the business partner against dunning.

Queries

QueryByTradeReceivablesPayablesAccount provides a list of all Dunnings whose TradeReceivablesPayablesAccount and Status fit the selection criteria. The query elements are defined by the data type DunningTradeReceivablesPayablesAccountQueryElements. These elements can include: TradeReceivablesPayablesAccountUUID and DunningStatus. TradeReceivablesPayablesAccountUUID is of type GDT: UUID, and can be optional. DunningStatus is of type GDT: DunningStatus, and can be optional.

QueryByBusinessPartner provides a list of all Dunnings by a Company, against a BusinessPartner and with a Status that fit the selection criteria. Outside the business object TradeReceivablesPayablesAccount it is more natural to think in terms of company and business partner, hence this additional query. The query elements are defined by the data type: DunningBusinessPartnerQueryElements. These elements can include: CompanyUUID, BusinessPartnerUUID and DunningStatus. CompanyUUID is of type GDT: UUID, and can be optional. BusinessPartnerUUID is of type GDT: UUID, and can be optional. DunningStatus is of type GDT: DunningStatus, and can be optional.

QueryByReconciliationElements provides a list of all Dunnings which use the specified Company and AccountingTransactionDate on the associated FinancialAuditTrailDocumentations. This query is to be used for reconciliation with Process Component Financial Accounting. The query elements are defined by the type IDT: DunningReconciliationElementsQueryElements. The elements can include: FinancialAuditTrailDocumentationCompanyUUID and FinancialAuditTrailDocumentationAccountingTransactionDate. FinancialAuditTrailDocumentationCompanyUUID is of type GDT: UUID, and can be optional. FinancialAuditTrailDocumentationAccountingTransactionDate is of type GDT: Date, with Qualifier AccountingTransaction, and can be optional.

DO FinancialAuditTrailDocumentation

DO FinancialAuditTrailDocumentation includes the structured documentation and basis data for the financial accounting posting in case that Dunning aspects (e.g., like fees) become relevant for Accounting. The dependent object FinancialAuditTrailDocumentation will serve as an interface for submitting the necessary information. Elements structure is described in the dependent object's documentation.

Item is representative of a TradeReceivablesPayables Item for which the debtor can be dunned. It carries all the receivable-specific information relevant for dunning. This comprises information about the receivable itself (such as its amount or due date) as well as information owned by the dunning process (such as dunning level, time overdue or status).

The elements located directly at the node DunningItem are defined by the type GDT: DunningItemElements. In certain implementations, these elements include: TradeReceivablesPayablesItemUUID, BaseBusinessTransactionDocumentReference, DueItemTypeCode, DunningLevelValue, PreviousDunningLevelValue, OpenItemAmount, TransactionCurrencyAmount, ProcedureStepOrdinalNumberValue, DunningNoticeLegallyEffectiveIndicator, DunningBlockingReasonCode, BlockingExpirationDate, BlockingNote, DueDate, DaysOverdueTotalNumberValue, TradeReceivablesPayablesItemUUID is reference to corresponding overdue TradeReceivablesPayablesItem.

TradeReceivablesPayablesItemUUID may be based on GDT UUID. BaseBusinessTransactionDocumentReference is the identifier of the document underlying the TradeReceivablesPayablesItem. BaseBusinessTransactionDocumentReference may be based on GDT BusinessTransactionDocumentReference.

DueItemTypeCode is the type of the due item. DueItemTypeCode may be based on GDT TradeReceivablesPayablesRegisterItemTypeCode.

DunningLevelValue is the current dunning level. DunningLevelValue may be based on GDT DunningLevelValue.

PreviousDunningLevelValue is the Dunning level after the previous dunning and can be optional.

PreviousDunningLevelValue may be based on GDT DunningLevelValue.

OpenItemAmount is the amount to be dunned for. Currency according to dunning procedure.

OpenItemAmount may be based on GDT Amount, with Qualifier OpenItem.

TransactionCurrencyAmount is like the OpenItemAmount, but in transactional currency.

TransactionCurrencyAmount may be based on GDT Amount, with Qualifier TransactionCurrency.

ProcedureStepOrdinalNumberValue is the step according to dunning procedure which triggered the creation of this DunningItem. ProcedureStepOrdinalNumberValue may be based on GDT OrdinalNumberValue.

DunningNoticeLegallyEffectiveIndicator indicates whether the debtor will be legally effectively dunned for this DunningItem and can be optional. DunningNoticeLegallyEffectiveIndicator may be based on GDT EffectiveIndicator.

DunningBlockingReasonCode is the information why the TradeReceivablesPayablesItem is blocked for dunning and can be optional. DunningBlockingReasonCode may be based on GDT DunningBlockingReasonCode.

BlockingExpirationDate is the point in time when the blocking expires and can be optional. BlockingExpirationDate may be based on GDT Date, with Qualifier Expiration.

BlockingNote is the note to capture additional information why this DunningItem was blocked. BlockingNote may be based on GDT Note, with Qualifier Blocking.

DueDate is the due date of the TradeReceivablesPayablesItem. DueDate may be based on GDT Date, with Qualifier Due.

DaysOverdueTotalNumberValue is the number of days the DunningItem has been overdue. DaysOverdueTotalNumberValue may be based on GDT TotalNumberValue.

There may be a number of inbound aggregation relationships. From the business object TradeReceivablesPayables/node Item to the TradeReceivablesPayablesItem business object (or node) there may be a cardinality relationship of 1:c. TradeReceivablesPayablesItem denotes the TradeReceivablesPayables Item which has to be dunned for.

In certain implementations, integrity conditions may include the condition that any TradeReceivablesPayables Item can only be referred to by one Item of a given Dunning because naturally a customer can not be dunned for the same debt twice at a time. OpenItemAmount can be in the same currency as RequestedAmount and TotalAmount of the root node. This currency is defined in the dunning procedure.

Enterprise Service Infrastructure Actions

Exclude (S&AM action)

The Exclude action (S&AM action) excludes an item from the current dunning only. Preconditions can include the condition that Life Cycle Status can be "open" and Inclusion Status can be "included". Changes to the object can include the change by which Totals on header level can be recalculated. Changes to the status can include the status change by which Inclusion Status is set to "Excluded".

Include (S&AM action)

The Include action (S&AM action) re-admits a formerly excluded item, or in a sense, undoes Exclude. Preconditions can include the condition that Life Cycle Status is "open", Inclusion Status "excluded". Changes to the object can include the change by which Totals on header level can be recalculated. Changes to the status can include the status change by which Inclusion Status is set to "Included".

The Block action (S&AM action) excludes the item from any dunning for a specified time period. Preconditions can include the condition that Life Cycle Status can be "open" and TradeReceivablesPayablesItem Dunning Blocking Status can be "Not blocked". Changes to the object can include the change by which Totals on header level can be recalculated. Changes to other objects can include the change by which a dunning block is set on the corresponding Trade Receivables Payables Register Item. Changes to the status can include the status change by which TradeReceivablesPayablesItem Dunning Blocking Status is set to "Blocked", Inclusion Status is set to "Excluded". Parameters can include action elements that are defined by the data type DunningBlockItemActionElements. These elements are: DunningBlockingReasonCode, BlockingExpirationDateTime and BlockingNote. DunningBlockingReasonCode is a coded representation of the cause for blocking, and can be of type GDT: DunningBlockingReasonCode. BlockingExpirationDateTime is the end of blocking period, is of type GDT: Date. BlockingNote is free text for additional information regarding the block, is of type GDT: Note.

The Unblock action (S&AM action) lifts the dunning block from the TradeReceivablesPayablesItem and re-includes the item in the current dunning. Preconditions can include the condition that Life Cycle Status can be "open" and TradeReceivablesPayablesItem Dunning Blocking Status can be "Blocked". Changes to the object can include the change by which Totals on header level can be recalculated. Changes to other objects can include the change by which the dunning block is lifted from the corresponding Trade Receivables Payables Register Item. Changes to the status can include the status change by which TradeReceivablesPayables Item Dunning Blocking Status is set to "Not blocked", Inclusion Status is set to "Included".

The CheckTradeReceivablesPayablesRegisterItemDunningBlock action checks whether the TradeReceivablesPayablesRegisterItem is blocked for dunning and sets the TradeReceivablesPayablesRegisterItemDunningBlockingStatus accordingly. The action can also be carried out when a dunning item is created. Preconditions can include the condition that LifeCycle Status can be "open". Changes to the object can include the change by which Totals on header level can be recalculated. Changes to the status can include the status change by which Depending on the TradeReceivablesPayablesRegisterItem blocking state found, the TradeReceivablesPayablesItemDunningBlockingStatus is set to "not blocked" or "blocked", which enforces InclusionStatus="included" or "excluded", respectively.

Queries

QueryByBusinessTransactionDocumentReference provides a list of all DunningItems which correspond to a TradeReceivablesPayablesItem whose underlying BusinessTransactionDocument matches the selection criteria by Reference and Type. This query can allow direct access to the dunning information and history of a given document (typically an invoice), without retrieving the corresponding TradeReceivablesPayablesItems. The query elements are defined by the data type: DunningItemBusinessTransactionDocumentReferenceQueryElements. These elements can include: BaseBusinessTransactionDocumentReference and DueItemTypeCode. BaseBusinessTransactionDocumentReference is of type GDT: BusinessTransactionDocumentReference, and can be optional. DueItemTypeCode is of type GDT: DueItemTypeCode, and can be optional.

DO ControlledOutputRequest

DO ControlledOutputRequest is a controller of output requests output history entries related to the Dunning. The structure can be defined in the dependent object Controlled Output Request.

Dunning Message Types and Their Signature

FIG. 46-1 through 46-4 illustrates one example logical configuration of FormDunningNotification message 46000. Specifically, this figure depicts the arrangement and hierarchy of various components such as one or more levels of packages, entities, and datatypes, shown here as 46000 through 46130. As described above, packages may be used to represent hierarchy levels. Entities are discrete business elements that are used during a business transaction. Data types are used to type object entities and interfaces with a structure. For example, FormDunningNotification message 46000 includes, among other things, Dunning 46038. Accordingly, heterogeneous applications may communicate using this consistent message configured as such.

This section describes the message types and their signatures that are derived from the operations of the business object Dunning. In a signature, the business object is contained as a "leading" business object. The message data type determines the structure of the following message types. The Dunning serves as the basis for creating and sending reminders or demands for payment. These demands for payment are printed on a form template using Output Management.

Dunning Message Type(s)

FormDunningNotification can be used to send a dunning letter or Reminder. The structure of this message type is determined by the message data type FormDunningMessage. This message type is used in the fol-lowing operations of business objects: Dunning (e.g., NotifyOfDunning).

FormDunningMessage

FormDunningMessage is a message data type that contains: The object Dunning which is contained in the business document and The business information that is relevant for sending a business document in a mes-sage. It may include the following packages: MessageHeader package and DunningPackage. This message data type, therefore, provides the structure for the following message types and the operations that are based on them: FormDunningMessage.

MessageHeader Package

MessageHeader Package is a grouping of business information that is relevant for sending a business docu-ment in a message. It may include the following entity: MessageHeader. MessageHeader is a grouping of business information from the perspective of the sending application: Information to identify the business document in a message, Information about the sender and optionally Information about the recipient. The MessageHeader contains: SenderParty and RecipientParty. MessageHeader is of the type GDT: BusinessDocumentMessageHeader, and the following elements of the GDT are used: ID and Referen-ceID.

SenderParty is the partner responsible for sending a business document at business application level. The SenderParty is of the type GDT: BusinessDocumentMessageHeaderParty. RecipientParty is the partner re-sponsible for receiving a business document at business application level. The RecipientParty is of the type GDT: BusinessDocumentMessageHeaderParty.

Dunning Package

Dunning Package is the grouping of Dunning with its packages: DunningItem. FormDunning message con-tains the elements: CompanyFormattedAddress, BusinessPartnerFormattedAddress, DocumentDate and BusinessPartnerInternalID.

CompanyFormattedAddress has a cardinality relationship of 1, and is of type GDT: FormattedAddress). BusinessPartnerFormattedAddress has a cardinality relationship of 1, and is of type GDT: FormattedAddress. DocumentDate has a cardinality relationship of 1, and is of type GDT: Date, Qualifier: BusinessTransaction-Document. BusinessPartnerInternalID has a cardinality relationship of 1, and is of type GDT: BusinessPart-nerInternalID.

DunningItem Package contains the entity DunningItem. A DunningItem entity is a representative of a Trade-ReceivablesPayablesItem for which the debtor can be dunned. A DunningItem contains the elements: Base-BusinessTransactionDocumentReference, BaseBusinessTransactionDocumentDate, DueItemTypeCode, DunningLevelValue, BaseBusinessTransactionDocumentAmount, OpenItemAmount, DunningNoticeLegallyEffectiveIndicator, DueDate and DaysOverdueTotalNumberValue.

BaseBusinessTransactionDocumentReference has a cardinality relationship of 1, and is of type GDT: Busi-nessTransactionDocumentReference. BaseBusinessTransactionDocumentDate has a cardinality relation-ship of 1, and is of type GDT: Date, Qualifier: BusinessTransactionDocument. DueItemTypeCode has a car-dinality relationship of 1, and is of type GDT: TradeReceivablesPayablesRegisterItemTypeCode. Dun-ningLevelValue has a cardinality relationship of 1, and is of type GDT: DunningLevelValue. BaseBusinessTransactionDocumentAmount has a cardinality relationship of 1, and is of type GDT: Amount, Qualifier: Busi-nessTransactionDocument. OpenItemAmount has a cardinality relationship of 1, and is of type GDT: Amount, Qualifier: OpenItem. DunningNoticeLegallyEffectiveIndicator has a cardinality relationship of 1, and is of type GDT: Indicator. DueDate has a cardinality relationship of 1, and is of type GDT: Date, Qualifier: Due. DaysOverdueTotalNumberValue has a cardinality relationship of 1, and is of type GDT: NumberValue, Qualifier: Total.

Business Object TaxReceivablesPayablesRegister

Figures 1, 47:
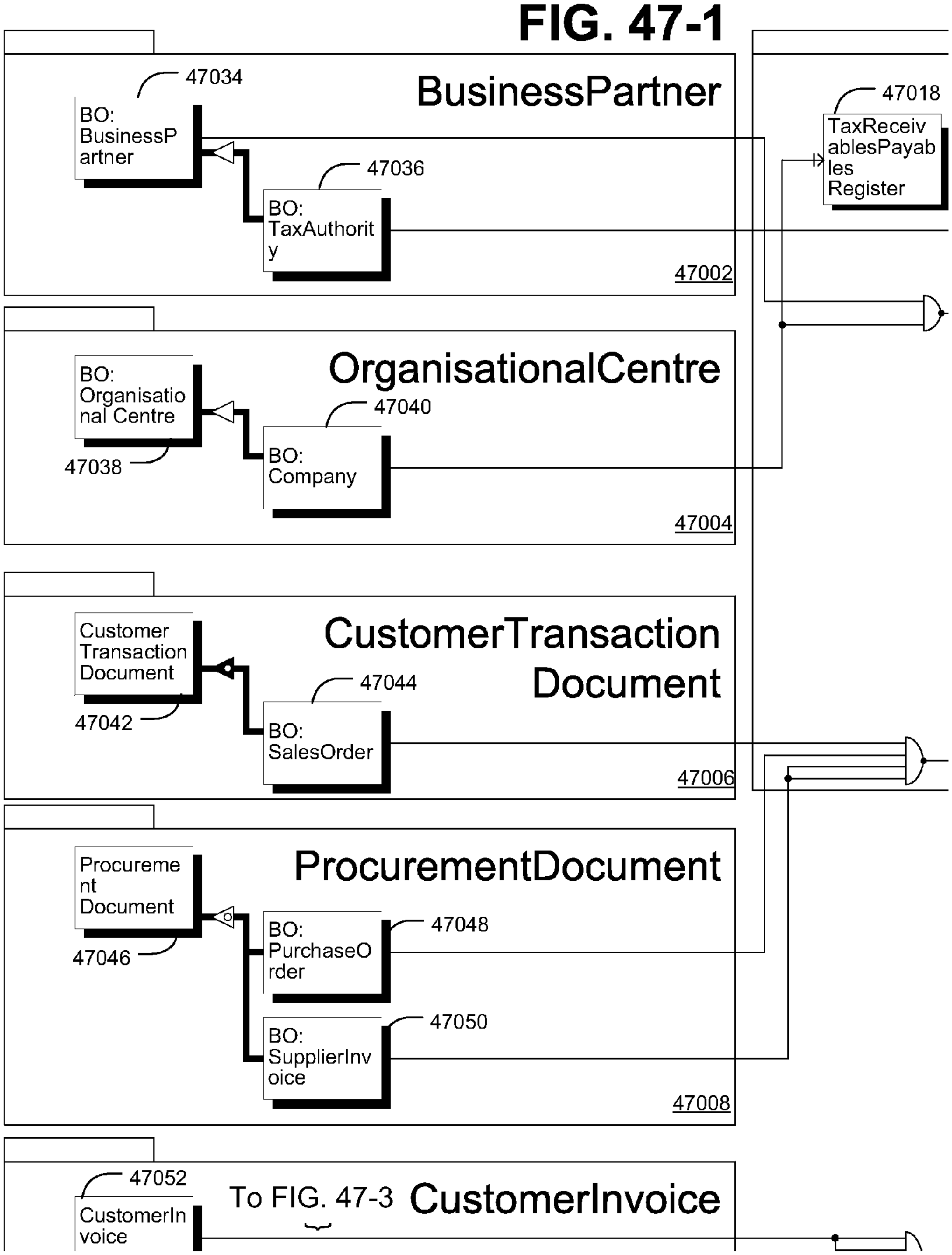
Figures 2, 47:
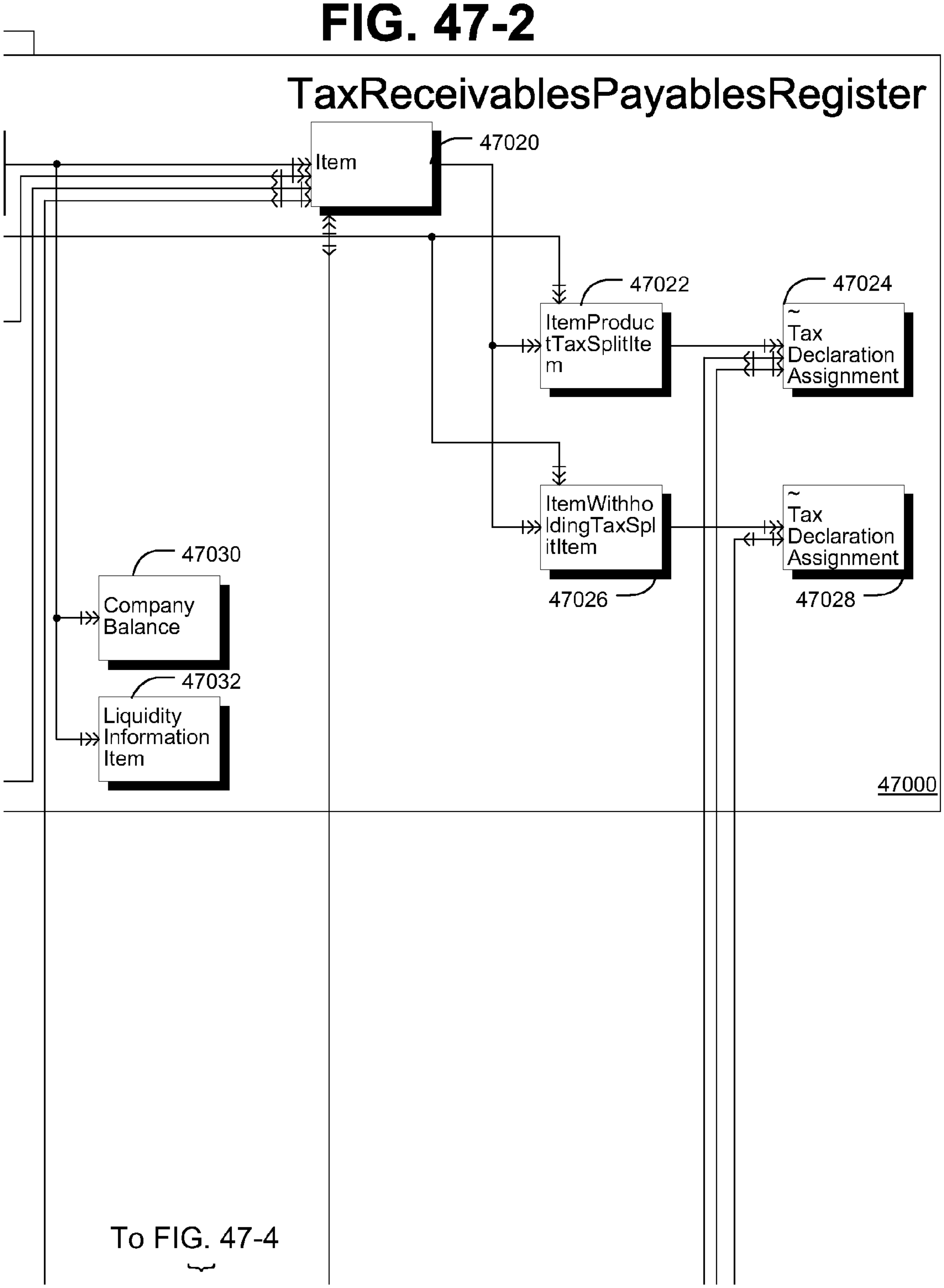
Figures 3, 47:
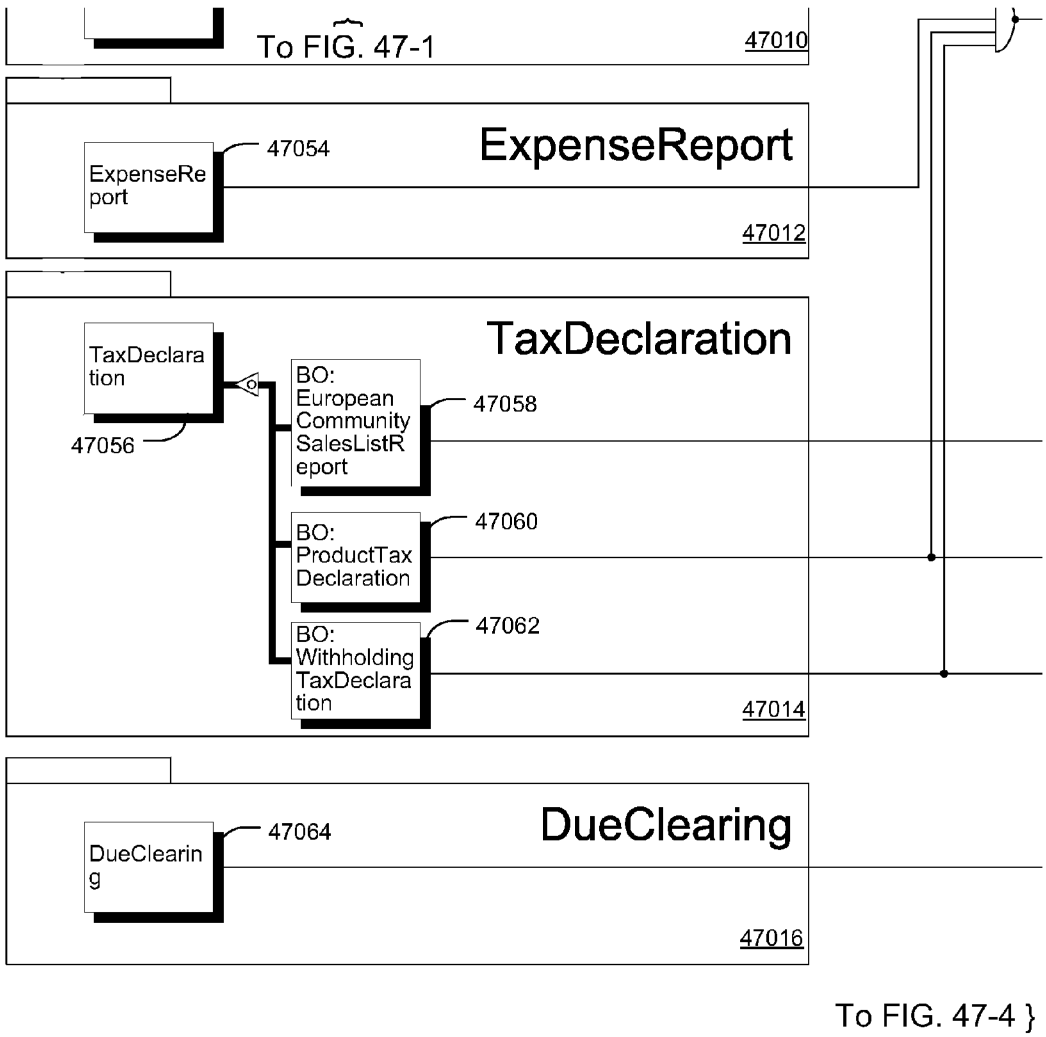
Figures 4, 47:
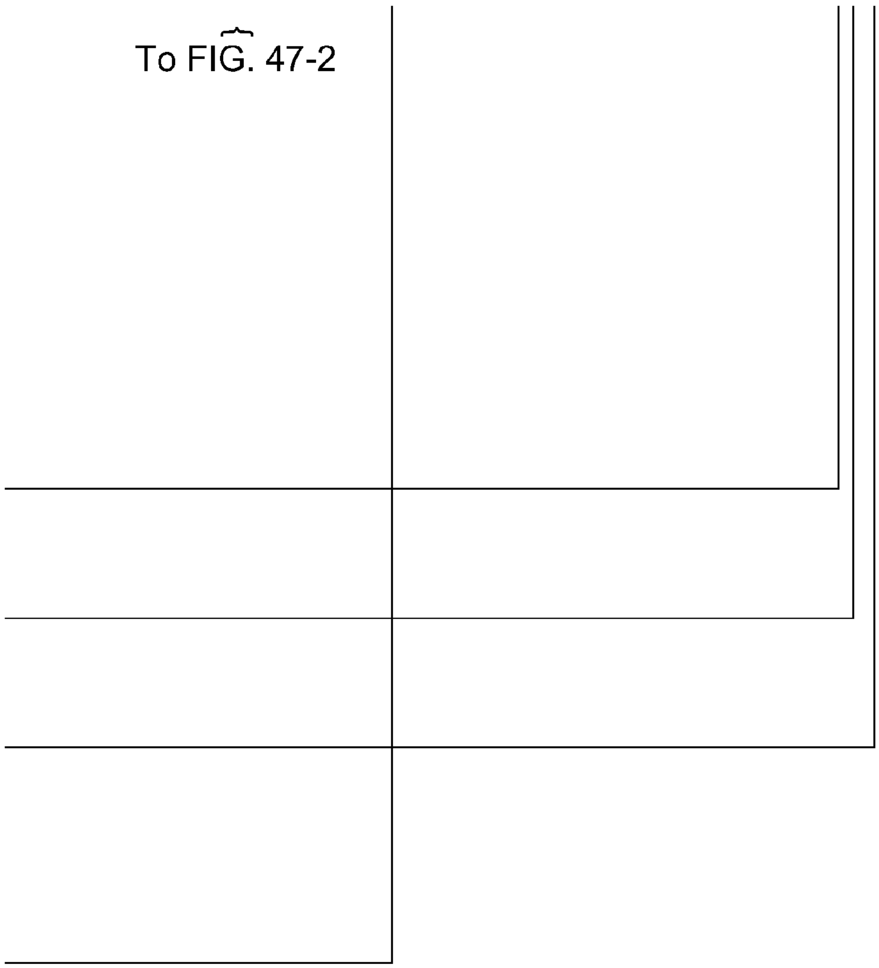

FIG. 47-1 through 47-8 illustrate an example TaxReceivablesPayablesRegister business object model 47000. Specifically, this model depicts interactions among various hierarchical components of the TaxReceivablesPayablesRegister, as well as external components that interact with the TaxReceivablesPayablesRegister (shown here as 47002 through 47016 and 47034 through 47066).

A TaxReceivablesPayablesRegister is the detail information about tax a company's receivables and/or payables that are due for delivered goods and rendered services between buyers and sellers, that are due for the consumption of goods, that are due for the transfer of goods, and/or that are withheld from payments to sellers. In TaxReceivablesPayablesRegister buyer and seller parties take on the roles of debtor and creditor, respectively. The business object TaxReceivablesPayablesRegister is part of the process component Due Item Processing. TaxReceivablesPayablesRegister includes the tax receivables/payables of a company for a business transaction document and/or the totals for the tax receivables/payables per company. TaxReceivablesPayablesRegister may be represented by the root node TaxReceivablesPayablesRegister.

The Business Object TaxReceivablesPayablesRegister 47018 may be involved in Process Integration Models, such as CustomerInvoiceProcessing_DueItemProcessing, SupplierInvoiceProcessing_DueItemProcessing, ExpenseReimbursement_DueItemProcessing, and/or Cash Management_ Due Item Processing.

The Service Interface ReceivablesPayables In may be part of Process Integration Models, such as CustomerInvoice Processing_DueItemProcessing, SupplierInvoiceInvoiceProcessing_DueItemProcessing, and/or ExpenseAndReimbursementMan-agement_DueItemProcessing. The Service Interface ReceivablesPayables In groups the operations, which informs the DueItemProcessing from the SupplierInvoiceProcessing, CustomerInvoiceProcessing and/or ExpenseAndReimbursementManagement about receivables and/or payables from deliveries and procurements from/to the business partners and the tax authority.

Create ReceivablesPayables

According to the ARIS model, Create ReceivablesPayables (e.g., Create ReceiveDueItemProcessingReceivablesPayablesIn.CreateReceivablesPayables) create a Receivables or Payables from Sales and Services. The Operation is based on the Message Type ReceivablesPayablesNotification (e.g., operating on the Business-Objects TradeReceivablesPayablesRegister und TaxReceivablesPayablesRegister).

Cancel ReceivablesPayables

According to the ARIS model, the Cancel ReceivablesPayables (e.g., DueItemProcessingReceivablesPayablesIn.CancelReceivablesPayables) cancels a trade and/or tax receivable or payable. The Operation is based on the Message Type ReceivablesPayablesCancellationRequest (e.g., operating on the Business-Objects TradeReceivablesPayablesRegister and TaxReceivablesPayablesRegister).

Service Interface Liquidity Information In

The Service Interface Liquidity Information In is component of Process Integration Models including Cash Management_Due Item Processing. The Service Interface Liquidity Information In is an interface for request and reception of data for the liquidity preview.

Operation Get Liquidity Information

The Operation Get Liquidity Information (e.g., DueItemProcessingLiquidityInforma-tionIn.GetLiquidityInformation) allows synchronous operation to send the Query and acceptance of the liquidity information, which is provided byDueItemManagement. The operation is based on the message types Liquidity Information Query and Liquidity Information Response (e.g., derived from Business-Object LiquidityForecast). Asynchronous communication may also be allowed.

TaxReceivablesPayablesRegister

TaxReceivablesPayablesRegister (e.g., a root node) is the tax receivables and payables of a company from/to the relevant tax authorities. The TaxReceivablesPayablesRegister includes the increases and decreases to the tax receivables and payables and/or their totals. The TaxReceivablesPayablesRegister includes elements, such as CompanyID and CompanyUUID. The CompanyID may be a unique identifier of the company with which the tax receivable/payable is associated. The CompanyID is a GDT of type OrganisationalCentreID. The CompanyUUID may be a universally unique identifier of the company to which this tax receivable/payable belongs. The CompanyUUID is a GDT of type UUID.

The following composition relationships to subordinate nodes may exist: Items may have a cardinality of 1:cn; CompanyBalance 47030 may have a cardinality of 1:cn; and/or LiquidityInformationItem 47032 may have a cardinality of 1:cn. They may be a number of Inbound Aggregation Relationships, such as from business object Company/node Company, the OwningCompany may have a cardinality of 1:c. The OwningCompany may be the company with which the tax receivable/payable is associated.

Actions may include AddTaxReceivablePayableSummarySplitItemFromProductTaxDeclaration, AddTaxReceivablePayablePaymentSplitItemFromProductTaxDeclaration, and/or AddTaxReceivablePayablePre-PaymentSplitItemFromProductTaxDeclaration. The Add-TaxReceivablePayableSummaryS-plitItemFromProductTaxDeclaration action adds a TaxReceivablePayableSummarySplitItem, created from the information in the ProductTaxDeclaration, to the tax receivables payables register. Preconditions of the TaxReceivablePayableSummarySplitItem may include that the TaxDeclaration is declared to the TaxAuthority by the Business Objects ProductTaxDeclaration. Changes to the object may include that the node Item 47020, the node ItemProductTaxSplitItem 47022, and/or the node ItemProductTaxSplitItemTaxDeclarationAssignment 47024 has an entry created.

Changes to the status may include that the node ItemProductTaxSplitItem, for which a summary split item is created, may have status "cleared". Parameters for the AddTaxReceivablePayableSummarySplitItemFromProductTaxDeclaration action may include that the action elements are defined by the data type TaxReceivablePayableRegisterAddTaxReceivablePayableSummarySplitItemFromProductTaxDeclarationActionElements. These elements may include ProductTaxDeclarationCompanyID, ProductTaxDeclarationCompanyUUID, ProductTaxDeclarationTaxAuthorityCountryCode, ProductTaxDeclarationRegionCode, ProductTaxDeclarationID, ProductTaxDeclarationUUID, ProductTaxDeclarationTypeCode, ProductTaxDeclarationTaxAuthorityID, ProductTaxDeclarationSentDate, ProductTaxDeclarationDeclarationTotalAmount, ProductTaxDeclarationCompanyID, ProductTaxDeclarationCompanyUUID, and/or ProductTaxDeclarationTaxAuthorityCountryCode. In some implementations, elements may include ProductTaxDeclarationCompanyID, ProductTaxDeclarationTaxAuthorityCountryCode, ProductTaxDeclarationID, ProductTaxDeclarationUUID, ProductTaxDeclarationTypeCode, ProductTaxDeclarationTaxAuthorityID, ProductTaxDeclarationSentDate, ProductTaxDeclarationDeclarationTotalAmount, ProductTaxDeclarationCompanyID, ProductTaxDeclarationCompanyUUID, and ProductTaxDeclarationTaxAuthorityCountryCode and some elements, such as ProductTaxDeclarationCompanyUUID and ProductTaxDeclarationRegionCode, may be optional.

The ProductTaxDeclarationCompanyID may be the unique identifier of the company to which this TaxDeclaration belongs. The ProductTaxDeclarationCompanyID may be a GDT of type OrganisationalCentreID. The ProductTaxDeclarationCompanyUUID may be a universally unique identifier of the company to which this TaxDeclaration belongs. The ProductTaxDeclarationCompanyUUID may be a GDT of type UUID. The ProductTaxDeclarationTaxAuthorityCountryCode may be the country for which the tax declaration is made. The ProductTaxDeclarationTaxAuthorityCountryCode may be a GDT of type CountryCode. The ProductTaxDeclarationRegionCode is the region in the country for which the tax declaration is made (e.g., States in USA). The ProductTaxDeclarationRegionCode is a GDT of type RegionCode. The ProductTaxDeclarationID is the identifier of the Tax Declaration. The ProductTaxDeclarationID is a GDT of type BusinessTransactionDocumentID. The ProductTaxDeclarationUUID may be a Universally Unique Identifier of the Tax Declaration. The ProductTaxDeclarationUUID is a GDT of type UUID. The ProductTaxDeclarationTypeCode may be the type of TaxDeclaration. The ProductTaxDeclarationTypeCode is a GDT of type TaxDeclarationTypeCode. The ProductTaxDeclarationTaxAuthorityID is the Tax Authority to which the TaxDeclaration is declared. The ProductTaxDeclarationTaxAuthorityID is a GDT of type BusinessPartnerID. The ProductTaxDeclarationSentDate is the date on which the TaxDeclaration is sent to the Tax Authorities. The ProductTaxDeclarationSentDate is a GDT of type Date and/or may have a Sent qualifier. The ProductTaxDeclarationDeclarationTotalAmount is the tax amount which is declared to the tax Authority using this Tax Declaration. The ProductTaxDeclarationDeclarationTotalAmount is a GDT of type Amount and/or may include a Total qualifier. In some implementations, this action may be executed by the BusinessObject ProductTaxDeclaration.

The AddTaxReceivablePayablePaymentSplitItemFromProductTaxDeclaration action adds a TaxReceivablePayablePaymentSplitItem created from the information contained in the ProductTaxDeclaration to the tax receivables payables register. In some implementations, preconditions of the action may include that the TaxDeclaration is declared to the TaxAuthority by the Business Object ProductTaxDeclaration and/or that the Payment Request for the same has been sent. Changes to the object may include that the node Item, the node ItemProductTaxSplitItem, and/or the node ItemProductTaxSplitItemTaxDeclarationAssignment has an entry created. Changes to the status may include that the node ItemProductTaxSplitItem, for which the payment split item is created, has a status of "cleared". Parameters of the action may include that action elements are defined by the data type TaxReceivablesPayablesRegisterAddTaxReceivablePayablePaymentSplitItemFromProductTaxDeclarationActionElements. These elements may include ProductTaxDeclarationCompanyID, ProductTaxDeclarationCompanyUUID, ProductTaxDeclarationTaxAuthorityCountryCode, ProductTaxDeclarationRegionCode, ProductTaxDeclarationID, ProductTaxDeclarationUUID, ProductTaxDeclarationTypeCode, ProductTaxDeclarationTaxAuthorityID, ProductTaxDeclarationSentDate, and/or ProductTaxDeclarationDeclarationTotalAmount. In some implementations, elements may include ProductTaxDeclarationCompanyID, ProductTaxDeclarationTaxAuthorityCountryCode, ProductTaxDeclarationID, ProductTaxDeclarationUUID, ProductTaxDeclarationTypeCode, ProductTaxDeclarationTaxAuthorityID, ProductTaxDeclarationSentDate, and ProductTaxDeclarationDeclarationTotalAmount and some elements, such as ProductTaxDeclarationCompanyUUID and/or ProductTaxDeclarationRegionCode, may be optional.

The ProductTaxDeclarationCompanyID is a unique identifier of the company to which the TaxDeclaration belongs. The ProductTaxDeclarationCompanyID is a GDT of type OrganisationalCentreID.

The ProductTaxDeclarationCompanyUUID is a universally unique identifier of the company to which the TaxDeclaration belongs. The ProductTaxDeclarationCompanyUUID is a GDT of type UUID. The ProductTaxDeclarationTaxAuthorityCountryCode is the country for which the tax declaration is made. The ProductTaxDeclarationTaxAuthorityCountryCode is a GDT of type CountryCode. The ProductTaxDeclarationRegionCode is the region in the country for which the tax declaration is made (e.g., States in USA). The ProductTaxDeclarationRegionCode is a GDT of type RegionCode. The ProductTaxDeclarationID is the Identifier of the Tax Declaration. The ProductTaxDeclarationID is a GDT of type BusinessTransactionDocumentID. The ProductTaxDeclarationUUID is a Universally Unique Identifier of the Tax Declaration. The ProductTaxDeclarationUUID is a GDT of type UUID. The ProductTaxDeclarationTypeCode is the type of TaxDeclaration. The ProductTaxDeclarationTypeCode is a GDT of type TaxDeclarationTypeCode. The ProductTaxDeclarationTaxAuthorityID is the Tax Authority to which the TaxDeclaration is declared. The ProductTaxDeclarationTaxAuthorityID is a GDT of type BusinessPartnerID. The ProductTaxDeclarationSentDate is the date on which the TaxDeclaration is sent to the Tax Authorities. The ProductTaxDeclarationSentDate is a GDT of type Date. In some implementations, the ProductTaxDeclarationSentDate has a Sent qualifier. The ProductTaxDeclarationDeclarationTotalAmount is the Tax Amount which is declared to the tax Authority using this Tax Declaration. The ProductTaxDeclarationDeclarationTotalAmount is a GDT of type Amount. In some implementations, ProductTaxDeclarationDeclarationTotalAmount has a Total qualifier. This action can only be executed by the BusinessObject ProductTaxDeclaration.

The AddTaxReceivablePayablePrePaymentSplitItemFromProductTaxDeclaration action adds a TaxReceivablePayablePrePaymentSplitItem created from the information contained in the PrePayment ProductTaxDeclaration to the tax receivables payables register. In some implementations, preconditions of the action may include that the PrePaymentTaxDeclaration is declared to the TaxAuthority by the Business Object ProductTaxDeclaration and/or the Payment Request for the same has been sent. This is a prepayment made to the Tax Authorities. Changes to the object may include the node Item, the node ItemProductTaxSplitItem, and/or the node ItemProductTaxSplitItemTaxDeclarationAssignment has an entry created. Changes to the status may include that the created node ItemProductTaxSplitItem has a Clearing Status of "open". Parameters of the AddTaxReceivablePayablePrePaymentSplitItemFromProductTaxDeclaration action may include that the elements are defined by the data type TaxReceivablesPayablesRegisterAddTaxReceivablePayablePaymentSplitItemFromProductTaxDeclarationActionElements. These elements may include ProductTaxDeclarationCompanyID, ProductTaxDeclarationCompanyUUID, ProductTaxDeclarationTaxAuthorityCountryCode, ProductTaxDeclarationRegionCode, ProductTaxDeclaration ID, ProductTaxDeclarationUUID, ProductTaxDeclarationTypeCode, ProductTaxDeclarationTaxAuthorityID, ProductTaxDeclarationSentDate, ProductTaxDeclarationItemTaxDueDate, and ProductTaxDeclarationPaymentAmount. In some implementations, the elements may include ProductTaxDeclarationCompanyID, Pro-ductTaxDeclarationTaxAuthorityCountryCode, ProductTaxDeclara-tionID, ProductTaxDeclarationUUID, ProductTaxDeclarationTypeCode, ProductTaxDeclarationTaxAu-thorityID, ProductTaxDeclarationSentDate, ProductTaxDeclarationItemTaxDueDate, and ProductTaxDeclarationPaymentAmount, and elements, such as ProductTaxDeclarationCompanyUUID and ProductTaxDeclarationRegionCode may be optional.

The ProductTaxDeclarationCompanyID is a unique identifier of the company to which this TaxDeclaration belongs. The ProductTaxDeclarationCompanyID is a GDT of type OrganisationalCentreID.

The ProductTaxDeclarationCompanyUUID is a universally unique identifier of the company to which this TaxDeclaration belongs. The ProductTaxDeclarationCompanyUUID is a GDT of type UUID. The ProductTaxDeclarationTaxAuthorityCountryCode is the country for which the tax declaration is made.

The ProductTaxDeclarationTaxAuthorityCountryCode is a GDT of type CountryCode. The ProductTaxDeclarationRegionCode is the region in the country for which the tax declaration is made (e.g., States in USA). The ProductTaxDeclarationRegionCode is a GDT of type RegionCode. The ProductTaxDeclarationID is the Identifier of the Tax Declaration. The ProductTaxDeclarationID is a GDT of type BusinessTransactionDocumentID. The ProductTaxDeclarationUUID is a Universally Unique Identifier of the Tax Declaration. The ProductTaxDeclarationUUID is a GDT of type UUID. The ProductTaxDeclarationTypeCode is the type of TaxDeclaration. The ProductTaxDeclarationTypeCode is a GDT of type TaxDeclarationTypeCode. The ProductTaxDeclarationTaxAuthorityID is the Tax Authority to which the TaxDeclaration is declared. The ProductTaxDeclarationTaxAuthorityID is a GDT of type BusinessPartnerID. The ProductTaxDeclarationSentDate is the date on which the TaxDeclaration is sent to the Tax Authorities. The ProductTaxDeclarationSentDate is a GDT of type Date and/or may have a Sent qualifier. The ProductTaxDeclarationItemTaxDueDate is the date on which the TaxDeclaration is sent to the Tax Authorities. The ProductTaxDeclarationItemTaxDueDate is a GDT of type date and/or may have a Due qualifier. The ProductTaxDeclarationPaymentAmount is the Tax Amount which is declared to the tax Authority using this Tax Declaration. The ProductTaxDeclarationPaymentAmount is a GDT of type Amount and/or may have a Total qualifier. This action can only be executed by the Business Object ProductTaxDeclaration.

Queries may be performed, such as a QueryByCompany, which provides a list of TaxReceivablesPayablesRegister for the specified Companies. The Query Elements may be defined by the datatype TaxReceivablesPayablesRegisterCompanyQueryElements. These elements may include CompanyID and/or CompanyUUID. The CompanyID is a GDT of type OrganisationalCentreID. The CompanyUUID is a GDT of type UUID. In some implementations, at least one of the parameters CompanyID and CompanyUUID may be specified.

Item

An Item is a tax receivable/payable resulting from an underlying business transaction document. An Item contains the information that is common for taxes that are due in an individual business transaction document.

The Item Elements which are directly located at the node TaxReceivablesPayablesRegister are defined by the data type TaxReceivablesPayablesRegisterItemElements. These elements include UUID, BaseBusinessTransactionDocumentReference, PartnerBaseBusinessTransactionDocumentReference, CancellationBusinessTransactionDocumentReference, DueClearingBusinessTransactionDocumentReference, CompanyID, CompanyUUID, BusinessPartnerID, BusinessPartnerUUID, PartyRoleCategoryCode, BusinessPartnerTaxID, OriginInvoiceBusinessTransactionDocumentReference, OriginOrderBusinessTransactionDocumentReference, OriginContractBusinessTransactionDocumentReference, BaseBusinessTransactionDocumentDate, BaseBusinessTransactionDocumentTaxDeclarationCurrencyGrossAmount, BaseBusinessTransactionDocumentTransactionCurrencyGrossAmount, BaseBusinessTransactionDocumentReceiptDate, and/or SystemAdministrativeDataBusinessProcessVariantTypeCode. In some implementations, the elements may include UUID, BaseBusinessTransactionDocumentReference, CompanyID, CompanyUUID, BusinessPartnerID, BusinessPartnerUUID, PartyRoleCategoryCode, BusinessPartnerTaxID, BaseBusinessTransactionDocumentDate, and SystemAdministrativeDataBusinessProcessVariantTypeCode and elements such as PartnerBaseBusinessTransactionDocumentReference, CancellationBusinessTransactionDocumentReference, DueClearingBusinessTransactionDocumentRef-erence, OriginInvoiceBusinessTransactionDocumentReference, OriginOrderBusinessTransactionDocumentReference, OriginContractBusinessTransactionDocumentRef-erence, BaseBusinessTransactionDocumentTaxDeclarationCurrencyGrossAmount, BaseBusinessTransaction-DocumentTransactionCurrency- GrossAmount, and BaseBusinessTransactionDocumentReceiptDate may be optional.

The UUID is a universally unique identifier of the item. The UUID is a GDT of type UUID.

The BaseBusinessTransactionDocumentReference is the reference to the business document on which this item is based (e.g., reference to Supplier Invoice). The BaseBusinessTransactionDocumentReference is a GDT of type BusinessTransactionDocumentReference. In some implementations, the BaseBusinessTransactionDocumentReference may be an alternative key. The PartnerBaseBusinessTransactionDocumentReference is the reference to the business document assigned by the business partner on which this item is based (e.g., the reference to the Supplier Invoice assigned by the Supplier). The PartnerBaseBusinessTransactionDocumentReference is a GDT of type BusinessTransactionDocumentReference. The CancellationBusinessTransactionDocumentReference is the reference to the document which cancels this document. The CancellationBusinessTransactionDocumentReference is a GDT of type BusinessTransactionDocumentReference. The DueClearingBusinessTransactionDocumentReference is the reference to the DueClearing document which changed this item. This can happen when the payment of an invoice or a downpayment Request makes the deferred splitItems undeterred or relevant for payment. The DueClearingBusinessTransactionDocumentReference is a GDT of type BusinessTransactionDocumentReference. The CompanyID is the unique identifier for the company which owns this receivable/payable. The CompanyID is a GDT of type OrganisationalCentreID. The CompanyUUID is a unique global identifier for the company which owns this receivable/payable.

The CompanyUUID is a GDT of type UUID. The BusinessPartnerID is a unique identifier for the business partner which owns this receivable/payable. The BusinessPartnerID is a GDT of type BusinessPartnerID. The BusinessPartnerUUID is a unique global identifier for the business partner which owns this Receivable/payable. The BusinessPartnerUUID is a GDT of type UUID. The PartyRoleCategoryCode can be the role of the business partner in this receivable/payable. The PartyRoleCategoryCode is a GDT of type PartyRoleCategoryCode and/or may include limitations such as 3=Creditor Party and/or 4=Debtor Party. The BusinessPartnerTaxID is the BusinessPartnerTaxID is the Tax ID for the business partner which owns this receivable/payable. This is only filled when the PartyRoleCategoryCode indicates Debtor Party. The BusinessPartnerTaxID is a GDT of type PartyTaxID. The OriginInvoiceBusinessTransactionDocumentReference is the reference to a possibly available SupplierInvoice or CustomerInvoice, to which the business document, or source document, based on the current trade receivable/payable is a follow-on document. The OriginInvoiceBusinessTransactionDocumentReference is a GDT of type BusinessTransactionDocumentReference. In some implementations, an attribute TypeCode of the OriginInvoiceBusinessTransactionDocumentReference is SupplierInvoice (143) or CustomerInvoice (028). The OriginOrderBusinessTransactionDocumentReference is the reference to a Sales Order or Purchase Order, which is a preceding document to the current Document (e.g., downpayment request) on which this item is based. The OriginOrderBusinessTransactionDocumentReference is a GDT of type BusinessTransactionDocumentReference. In some implementations, the attribute TypeCode of the OriginOrderBusinessTransactionDocumentReference is SalesOrder (127) or PurchaseOrder (001). The OriginContractBusinessTransactionDocumentReference is a reference to an existing. SalesContract or PurchasingContract to which the business document, or source document on which the current tax receivable/payable is based, is a follow-on document. The OriginContractBusinessTransactionDocumentReference is a GDT of type BusinessTransactionDocumentReference. In some implementations, the attribute TypeCode of the OriginContractBusinessTransactionDocumentReference is SalesContract (002) or PurchasingContract (120).

The BaseBusinessTransactionDocumentDate is the date of validity of the business transaction on which this item is based (e.g., document date). The BaseBusinessTransactionDocumentDate is a GDT of the Date and/or may have a BusinessTransactionDocument qualifier. The BaseBusinessTransactionDocumentTaxDeclarationCurrencyGross Amount is the gross amount of the BaseBusinessTransactionDocument (e.g., Invoice Gross Amount) in TaxDeclarationCurrency. The BaseBusinessTransactionDocumentTaxDeclarationCurrencyGrossAmount is a GDT of type Amount and/or may include a Gross Qualifier. The BaseBusinessTransactionDocumentTransactionCurrencyGrossAmount is the gross amount of the BaseBusinessTransactionDocument (e.g., Invoice Gross Amount) in TransactionCurrency. The BaseBusinessTransactionDocumentTransactionCurrencyGrossAmount is a GDT of type Amount and/or may have a Gross Qualifier. The BaseBusinessTransactionDocumentReceiptDate is the date of receipt of the business transaction on which this item is based (e.g., the invoice receipt date stamped on the invoice). The BaseBusinessTransactionDocumentReceiptDate is a GDT of type Date and/or the BaseBusinessTransactionDocumentReceiptDate has a Receipt qualifier.

The SystemAdministrativeData is the administrative data stored in a system. This data includes the system users and change times of the item. The SystemAdministrativeData is a GDT of type SystemAdministrativeData. The BusinessProcessVariantTypeCode is the type of the business process on which the item is based. The BusinessProcessVariantTypeCode is a GDT of type BusinessProcessVariantTypeCode.

The attributes of the Item may be derived from the base business document and/or may not be filled until the Item has been created, in some implementations. Attributes may include BaseBusinessTransactionDocumentReference, BaseBusinessTransactionDocumentUUID, BaseBusinessTransactionDocumentDateTime, BaseBusinessTransactionDocumentTypeCode, BaseBusinessTransactionTypeCode, and/or BaseBusinessTransactionCancelledIndicator. In some implementations, changes to the attributes may be inhibited (e.g., the attributes may be read-only). If the base business document has been canceled, the attribute BaseBusinessTransactionCancelledIndicator may be set. During the creation of an Item attributes such as, SystemAdministrativeData and/or ItemStatus, may be derived and later changed, as desired.

Composition relationships to subordinate nodes may exist. For example, the ItemProductTaxSplitItem may have a cardinality of 1:cn. The ItemWithholdingTaxSplitItem 47026 may have a cardinality of 1:cn.

There also may be a number of Inbound Aggregation Relationships. For example, from business object SupplierInvoice (or node SupplierInvoice), the BaseSupplierInvoice may have a cardinality relationship of c:c. The BaseSupplierInvoice may be the SupplierInvoice from which the tax receivable/payable result. As another example, from business object CustomerInvoice (or nodeCustomerInvoice), the BaseCustomerInvoice may have a cardinality relationship of c:c. The BaseCustomerInvoice may be the CustomerInvoice that the tax receivable/payable results from. In addition, from business object ExpenseReport (or node ExpenseReport), the BaseExpenseReport may have a cardinality relationship of c:c. The BaseExpenseReport may be the eExpenseReport that the tax receivable/payable results from. From business object ProductTaxDeclaration (or node TaxDeclaration), the ProductTaxDeclaration may have a cardinality relationship of c:c. The ProductTaxDeclaration may be ProductTaxDeclaration which reported the tax receivable/payable. As another example, from business object WithholdingTaxDeclaration (or node TaxDeclaration) the WithholdingTaxDeclaration may have a cardinality of c:c. The WithholdingTaxDeclaration may be the WithholdingTaxDeclaration which reported the tax receivable/payable. As another example, from business object CustomerInvoice (or node CustomerInvoice), the OriginInvoice may have a cardinality relationship of c:c. The OriginInvoice may be the CustomerInvoice which is referred to by the base business transaction document and from which the tax receivable/payable results. The base business transaction document may be a credit memo. As another example, from business object SupplierInvoice (or node SupplierInvoice), the OriginInvoice may have a cardinality of c:c. The OriginInvoice may be the SupplierInvoice which is referred to by the base business transaction document from which the tax receivable/payable results and/or the base business transaction document may be a credit memo. From business object SalesOrder (or node SalesOrder), the OriginOrder may have a cardinality of c:c. The OriginOrder may be a SalesOrder which is referred to by the base business transaction document and from which the tax receivable/payable results. The base business transaction document is a downpayment request. As another example, from business object PurchaseOrder (or node PurchaseOrder), the OriginOrder may have a cardinality of c:c. The OriginOrder may be the PurchaseOrder which is referred to by the base business transaction document and from which the tax receivable/payable results. The base business transaction document is a downpayment request. From Business-Object OrganisationalCentre (or node Company), the Company may have a cardinality of 1:cn. The Company may behave in the role of Debtor or Creditor. From Business-Object BusinessPartner (or node BusinessPartner), the BusinessPartner may have a cardinality of 1:cn. The business partner may behaves in the role of Debtor or Creditor. As another example, from business object Identity (or node Root), the CreationIdentity may have a cardinality of 1:cn and/or the LastChangeIdentity may have a cardinality of c:cn. The CreationIdentity may have created the Tax Receivables Payables Register Item. The LastChangeIdentity may have changed the Tax Receivables Payables Register Item the last time.

In some implementations, one of the above relationships (e.g., BaseSupplierInvoice, BaseCustomerInvoice, BaseExpenseReport, ProductTaxDeclaration, WithholdingTaxDeclaration) may exist (e.g., either from the business objects SupplierInvoice or the CustomerInvoice or BaseExpenseReport or WithholdingTaxDeclaration or ProductTaxDeclaration). For the relationships, ProductTaxDeclaration and WithholdingTaxDeclaration, there may be a logical dependency and/or there may not be a navigation or a dependency on the UI. TaxDeclarationID is a common name for the ID generated by the three Business Objects (e.g., ProductTaxDeclaration, WithholdingTaxDeclaration and EuropeanCommunitySalesListReport). In addition, the ID of the BaseBusinessTransactionDocumentReference is the BaseBusinessTransactionDocumentID and this may be filled. The ItemID of the BaseBusinessTransactionDocumentReference refers to the ItemID in the BaseBusinessTransactionDocument and this may not be filled in the TaxReceivablePayablesRegister.

There may be a number of Inbound association relationships, such as from business object DueClearing (or node DueClearing), the DueClearing may have a cardinality of c:cn. The DueClearing may have created or changed this item.

Actions may include, for example, AddTaxReceivablePayableFromDeduction, NotifyOfPayment and/or Cancel. The AddTaxReceivablePayableFromDeduction action calculates cash discount tax corrections for an existing tax receivable payable and/or creates a new Item and/or ItemProductTaxSplitItems. Preconditions to the AddTaxReceivablePayableFromDeduction action may include that a cash discount has been taken during payment and/or the tax amount is included in the base amount for calculating cash discount. Changes to the object may include that the node Item and/or the node ItemProductTaxSplitItem has an entry created. Changes to the status may include that the newly created entries have status of 'open'. Parameters of the action may include that the action elements are defined by the data type, TaxReceivablesPayablesRegisterAddTaxReceivablePayableFromDeductionActionElements. These elements include CompanyID, CompanyUUID, TradeReceivablesPayablesRegisterItemBaseBusinessTransactionDocumentReference, DueClearingBusinessTransactionDocumentReference, TradeReceivablesPayablesRegisterSplitItemBaseBusinessTransactionDocumentCurrencyDeductionAmount, TradeReceivablesPayablesRegisterSplitItemBaseBusinessTransactionDueClearingCurrencyDeductionAmount, TradeReceivablesPayablesRegisterItemPartialDueClearingIndicator, TradeReceivablesPayablesRegisterItemSplitItemBaseBusinessTransactionDocumentCurrencyCleared Amount, TradeReceivablesPayablesRegisterItemSplitItemBaseBusinessTransactionDueClearingCurrencyClearedAmount, ExpenseAndIncomeCategoryCode, and/or DueClearingPaymentDate. In some implementations, elements may include CompanyID, TradeReceivablesPayablesRegisterItemBaseBusinessTransactionDocumentReference, DueClearingBusinessTransactionDocumentReference, TradeReceivablesPayablesRegisterSplitItemBaseBusinessTransactionDocumentCurrencyDeduction Amount, TradeReceivablesPayablesRegisterSplitItemBaseBusinessTransactionDueClearingCurrencyDeductionAmount, TradeReceivablesPayablesRegisterItemPartialDueClearingIndicator, ExpenseAndIncomeCategoryCode, and DueClearingPaymentDate, and elements, such as CompanyUUID, TradeReceivablesPayablesRegisterItemSplitItemBaseBusinessTransactionDocumentCurrencyClearedAmount, and TradeReceivablesPayablesRegisterItemSplitItemBaseBusinessTransactionDueClearingCurrencyClearedAmount may be optional.

The CompanyID is a unique identifier of the company to which the below BaseBusinessTransactionDocumentReference belongs. The CompanyID is a GDT of type OrganisationalCentreID.

The CompanyUUID is a universally unique identifier of the company to which the below BaseBusinessTransactionDocumentReference belongs. The CompanyUUID is a GDT of type UUID.

The TradeReceivablesPayablesRegisterItemBaseBusinessTransactionDocumentReference is the reference to the TradeReceivablePayableBusinessTransactionDocument on which the cash discount has been applied. The TradeReceivablesPayablesRegisterItemBaseBusinessTransactionDocumentReference is a GDT of type BusinessTransactionDocumentReference. The DueClearingBusinessTransactionDocumentReference is the reference to the DueClearingBusinessTransactionDocument which initiates the deduction tax correction. The DueClearingBusinessTransactionDocumentReference is a GDT of type BusinessTransactionDocumentReference. The TradeReceivablesPayablesRegisterSplitItemBaseBusinessTransactionDocumentCurrencyDeduction Amount is the amount of deduction that is applied to the TradeReceivablePayableBusinessTransactionDocument in the BaseBusinessTransactionDocumentCurrency. The TradeReceivablesPayablesRegisterSplitItemBaseBusinessTransactionDocumentCurrency Deduction Amount is a GDT of type Amount and/or may include a Deduction Qualifier. The TradeReceivablesPayablesRegisterSplitItemBaseBusinessTransactionDueClearingCurrencyDeductionAmount is the amount of cash discount that is applied to the TradeReceivablePayableBusinessTransactionDocument in the DueClearingCurrency. This is may be the amount in the payment (e.g., transaction) currency. The TradeReceivablesPayablesRegisterSplitItemBaseBusinessTransactionDueClearingCurrencyDeductionAmount is a GDT of type Amount and/or may be a Deduction Qualifier. The TradeReceivablesPayablesRegisterItemPartialDueClearingIndicator indicates if partial payment is made. The TradeReceivablesPayablesRegisterItemPartialDueClearingIndicator is a GDT of type Indicator and/or may have a DueCleaning qualifier. The TradeReceivablesPayablesRegisterItemSplitItemBaseBusinessTransactionDocumentCurrencyClearedAmount is the gross amount, including tax, of the TradeReceivablePayableBusinessTransactionDocument that has been partially paid in the BaseBusinessTransactionDocumentCurrency. The TradeReceivablesPayablesRegisterItemSplitItemBaseBusinessTransactionDocumentCurrencyClearedAmount is a GDT of type Amount and/or may have a ClearedAmount qualifier. The TradeReceivablesPayablesRegisterItemSplitItemBaseBusinessTransactionDueClearingCurrencyClearedAmount is the gross amount, including tax, of the TradeReceivablePayableBusinessTransactionDocument that has been at least partially paid in the DueClearingCurrency. This may be the amount in the payment (e.g., transaction) currency. The TradeReceivablesPayablesRegisterItemSplitItemBaseBusinessTransactionDueClearingCurrencyClearedAmount is a GDT of type Amount and/or may have a ClearedAmount qualifier. The ExpenseAndIncomeCategoryCode is the category of the Expense or Income. The ExpenseAndIncomeCategoryCode is a GDT of type ExpenseAndIncomeCategoryCode. The DueClearingPaymentDate is the date of payment. DueClearingPaymentDate is a GDT of type Date and/or may have a Payment qualifier. This action may be executed by the BusinessObject Due_Clearing.

In the NotifyOfPayment action, if there are deferred ItemProductTaxSplitItems and ItemWithholdingTaxSplitItems for a full payment, the deferred split items are set to NotDeferred and for a partial payment, the deferred split items are split into undeferred and deferred split items. Preconditions of the NotifyOfPayment action may include that the ItemProductTaxSplitItem below the selected item has the deferred indicator set. Changes to the object may include that if ProductTax is involved, the node ItemProductTaxSplitItem has the deferred indicator unset if there is full payment and/or new entries created with appropriate deferred indictors if there is a partial payment. Changes to the status may include that for a full payment, the 'Deferred' indicator is unset and the status remains 'NotReplaced'. For a partial payment, newly created entries have the deferred indicator set and unset and status 'NotReplaced' and the original entry has the status 'Replaced'. Parameters of the NotifyOfPayment action include that the action elements are defined by the data type TaxReceivablesPayablesRegisterNotifyOfPaymentActionElements. These elements include CompanyID, CompanyUUID, TradeReceivablesPayablesRegisterItemBaseBusinessTransactionDocumentReference, DueClearingBusinessTransactionDocumentReference, TradeReceivablesPayablesRegisterItemPartialDueClearingIndicator, TradeReceivablesPayablesRegisterItemSplitItemBaseBusinessTransactionDocumentCurrencyCleared Amount, TradeReceivablesPayablesRegisterItemSplitItemBaseBusinessTransactionDueClearingCurrencyClearedAmount, and/or DueClearingPaymentDate. In some implementations, elements include CompanyID, TradeReceivablesPayablesRegisterItemBaseBusinessTransactionDocumentReference, DueClearingBusinessTransactionDocumentReference, TradeReceivablesPayablesRegisterItemPar-tialDueClearingIndicator and DueClearingPaymentDate, and other elements may be optional, such as CompanyUUID, TradeReceivablesPayablesRegisterItemSplitItemBaseBusiness TransactionDocumentCurrencyClearedAmount, and TradeReceivablesPayablesRegisterItemSplitItemBaseBusinessTransactionDueClearingCurrencyClearedAmount.

The CompanyID is a unique identifier of the company to which the below BaseBusinessTransactionDocumentReference belongs. The CompanyID is a GDT of type OrganisationalCentreID.

The CompanyUUID is a universally unique identifier of the company to which the below BaseBusinessTransactionDocumentReference belongs. The CompanyUUID is a GDT of type UUID. The TradeReceivablesPayablesRegisterItemBaseBusinessTransactionDocumentReference is the reference to the TradeReceivablePayableBusinessTransactionDocument which has been partially paid. The TradeReceivablesPayablesRegisterItemBaseBusinessTransactionDocumentReference is a GDT of type BusinessTransactionDocumentReference. The DueClearingBusinessTransactionDocumentReference is the reference to the DueClearingBusinessTransactionDocument which initiates the splitting of itemProductTaxSplitItems items based on partial payment. The DueClearingBusinessTransactionDocumentReference is a GDT of type BusinessTransactionDocumentReference. The TradeReceivablesPayablesRegisterItemPartialDueClearingIndicator indicates if partial payment is made. The TradeReceivables-PayablesRegisterItemPartialDueClearingIndicator is a GDT of type Indicator and/or may include a DueClearning qualifier. The TradeReceivablesPayablesRegisterItemSplitItemBaseBusinessTransactionDocumentCurrencyClearedAmount is the gross amount, including tax, of the TradeReceivablePayableBusinessTransactionDocument that has been partially paid in the BaseBusinessTransactionDocumentCurrency. The TradeReceivablesPayablesRegisterItemSplitItemBaseBusinessTransactionDocumentCurrencyClearedAmount is a GDT of type Amount and/or may include a ClearedAmount qualifier. The TradeReceivablesPayablesRegisterItemSplitItemBaseBusinessTransactionDueClearingCurrencyClearedAmount is the gross amount, including tax, of the TradeReceivablePayableBusinessTransactionDocument that has been partially paid in the DueClearingCurrency. This is actually the amount in the payment (e.g., transaction) currency. The TradeReceivablesPayablesRegisterItemSplitItemBaseBusinessTransactionDocumentCurrencyClearedAmount is a GDT of type Amount and/or may include a ClearedAmount qualifier. The DueClearingPaymentDate is the date of payment. The DueClearingPaymentDate is a GDT of type Date and/or may include a Payment qualifier. This action may be executed by the BusinessObject Due_Clearing.

The Cancel action cancels the item, such as when an invoice or downpayment request is cancelled. This action may be called when the business object DueClearing cancels its clearing. Preconditions of the Cancel action may include that the base business transaction is cancelled. Parameters of the Cancel action may be that the action elements are defined by the data type TaxReceivablesPayablesRegisterItemCancelActionElements. These elements include CompanyID, CompanyUUID, BaseBusinessTransactionDocumentReference, and/or CancelledBusinessTransactionDocumentReference. In some implementations, elements may include CompanyID, BaseBusinessTransactionDocumentReference, and CancelledBusinessTransactionDocumentReference, and the CompanyUUID may be an optional element.

The CompanyID is a unique identifier of the company to which the below BaseBusinessTransactionDocumentReference belongs. The CompanyID is a GDT of type OrganisationalCentreID.

The CompanyUUID is a universally unique identifier of the company to which the below BaseBusinessTransactionDocumentReference belongs. The CompanyUUID is a GDT of type UUID. The BaseBusinessTransactionDocumentReference is the reference to the document of the cancellation document. The BaseBusinessTransactionDocumentReference is a GDT of type BusinessTransactionDocumentReference. The CancelledBusinessTransactionDocumentReference is the reference to the document that is being cancelled. The CancelledBusinessTransactionDocumentReference is a GDT of type BusinessTransactionDocumentReference. In some implementations, this action may be performed by the business object that created the item or by the inbound agent for the XI message ReceivablesPayablesCancellationRequestNotification.

Queries may include, a QueryByCompanyAndBaseBusinessTransactionDocumentReference, which provides a list of Items which have the supplied BaseBusinessTransactionDocumentID. The Query-Elements may be defined by the datatype TaxReceivablesPayablesRegisterBaseCompanyBusinessTransactionDocumentIDQueryElements.

These elements include CompanyID, CompanyUUID, and/or BaseBusinessTransactionDocumentReference. In some implementations, the elements may include CompanyID and BaseBusinessTransactionDocumentReference, and CompanyUUID may be optional. The CompanyID is a GDT of type OrganizationalCentreID. The CompanyUUID is a GDT of type UUID. The BaseBusinessTransactionDocumentReference is a GDT of type BaseBusinessTransactionDocumentReference.

ItemProductTaxSplitItem

A ItemProductTaxSplitItem is a mutually exclusive part of an Item which includes product taxes and is split on the basis of tax splitting criteria. An ItemProductTaxSplitItem is the splitting of the Item into several parts to assign different status values (e.g., "open" or "cleared") and/or different values of other attributes (e.g., a different due date, tax event, tax type) to these parts. ItemProductTaxSplitItem elements which are directly located at the node TaxReceivablesPayablesRegisterItemProductTaxSplitItem may be defined by the data type TaxReceivablesPayablesRegisterItemProductTaxSplitItemElements. These elements include ID, UUID, OriginID, LastChangeBusinessTransactionDocumentReference, LastChangeBusinessTransactionDocumentUUID, LastChangeBusinessTransactionDocumentTypeCode, BaseBusinessTransactionDocumentItemTypeCode, TypeCode, SystemAdministrativeData, ashDiscountDeductibleIndicator, ProductTax, TransactionCurrencyProductTax, DueClearingCurrencyBaseAmount, DueClearingCurrencyAmount, PropertyMovementDirectionCode, CancellationDocumentIndicator, DeliveryDate, AccountingTransactionDate, TaxDueDate, MigratedDataAdaptationTypeCode, and/or Status. In some implementations, elements may include ID, UUID, LastChangeBusinessTransactionDocumentReference, LastChangeBusinessTransactionDocumentUUID, LastChangeBusinessTransactionDocumentTypeCode, BaseBusinessTransactionDocumentItemTypeCode, TypeCode, SystemAdministrativeData, ashDiscountDeductibleIndicator, ProductTax, TransactionCurrencyProductTax, DueClearingCurrencyBaseA-mount, DueClearingCurrencyAmount, PropertyMovementDirectionCode, CancellationDocumentIndicator, and TaxDueDate and other elements may be optional, such as OriginID, TransactionCurrencyProductTax, DueClearingCurrencyBaseAmount, and/or DueClearingCurrencyAmount, DeliveryDate, AccountingTransactionDate, MigratedDataAdaptationTypeCode, and Status.

The ID may be within the item and/or may be a unique identifier of the split item. The ID is a GDT of type TaxReceivablesPayablesRegisterItemProductTaxSplitItemID. The UUID is a universally unique identifier of the split item. The UUID is a GDT of type UUID. In some implementations, the UUID may be an alternative key. The OriginID is the ID of the original split item that was split to get this split item. The OriginID is a GDT of type TaxReceivablesPayablesRegisterItemProductTaxSplitItemID. The LastChangeBusinessTransactionDocumentReference is the reference to the business document on which the last change of this split item is based. The LastChangeBusinessTransactionDocumentReference is a GDT of type BusinessTransactionDocumentReference. The LastChangeBusinessTransactionDocumentUUID is a universally unique identifier of this business document on which the last change of this split item is based. The LastChangeBusinessTransactionDocumentUUID is a GDT of type UUID.

The LastChangeBusinessTransactionDocumentTypeCode is the type of the business transaction document which forms the basis of the last change of this split item. The LastChangeBusinessTransactionDocumentTypeCode is a GDT of type BusinessTransactionDocumentTypeCode. The BaseBusinessTransactionDocumentItemTypeCode is the type of item specified in the business document on which this split item is based (e.g., a reference to a credit memo in a Customer Invoice). The BaseBusinessTransactionDocumentItemTypeCode is a GDT of type BusinessTransactionDocumentItemTypeCode. The TypeCode is the type of the splitItem based on the business document on which this split item is based (e.g., invoice or credit memo in a Customer Invoice or TaxDeclarationSummaryLine or TaxDeclarationPaymentLine). The TypeCode is a GDT of type TaxReceivablesPayablesRegisterItemSplitItemTypeCode.

The SystemAdministrativeData is the administrative data stored in a system. This data includes the system users and change times of the split item. The SystemAdministrativeData is a GDT of type SystemAdministrativeData. The CashDiscountDeductibleIndicator indicates if this split item is relevant for cash discount. The CashDiscountDeductibleIndicator is a GDT of type Indicator Qualifier: CashDiscountDeductible. The ProductTax is a tax that is incurred when products are purchased, sold, and consumed. The amounts within are in TaxDeclarationCurrency. The ProductTax is a GDT of type ProductTax. The TransactionCurrencyProductTax is a tax that is incurred when products are purchased, sold, and consumed. The amounts within are in TransactionCurrency. The TransactionCurrencyProductTax is a GDT of type ProductTax and/or may include a TransactionCurrency qualifier. The DueClearingCurrencyBaseAmount is the base amount in DueClearingCurrency. The DueClearingCurrencyBaseAmount is a GDT of type Amount and/or may include a Base qualifier. The DueClearingCurrencyAmount is the tax amount in DueClearingCurrency. The DueClearingCurrencyAmount is a GDT of type Amount and/or may include a DueClearingCurrency qualifier. The PropertyMovementDirectionCode is a property change type of the item, which increases or decreases a receivable or a payable. The PropertyMovementDirectionCode is a GDT of type PropertyMovementDirectionCode. The CancellationDocumentIndicator indicates if this splitItem belongs to a CancellationDocument. The CancellationDocumentIndicator is a GDT of type Indicator and/or may include a CancellationDocument qualifier. The DeliveryDate is the date of delivery of material goods or fulfilment of services. The DeliveryDate is a GDT of type Date and/or may include a Delivery qualifier. The AccountingTransactionDate is the proposed date on the basis of which the posting date in Financial Accounting is determined. The AccountingTransactionDate is a GDT of type Date and/or may include a Transaction qualifier. The TaxDueDate is the date as of which this tax entry is due to be reported to the tax authority. The TaxDueDate is a GDT of type Date and/or may include a Due qualifier. The MigratedDataAdaptationTypeCode is a GDT of type MigratedDataAdaptationTypeCode.

The Status is the status of this SplitItem. The Status is a IDT of type TaxReceivablesPayablesRegisterItemProductTaxSplitItemStatus. The IDT TaxReceivablesPayablesRegisterItemProductTaxSplitItemStatus includes elements, such as ClearingStatusCode and/or ReplacementStatusCode. The ClearingStatusCode specifies whether a ItemProductTaxSplitItem is open or cleared. The ClearingStatusCode is a GDT of type ClearingStatusCode. The ReplacementStatusCode specifies whether a ItemProductTaxSplitItem is Replaced or NotReplaced. The ReplacementStatusCode is a GDT of type ReplacementStatusCode.

The attributes of the action may be derived from the base business document and/or may not filled until this item has been created. Attributes include BaseBusinessTransactionDocumentItemTypeCode, CashDiscountDeductibleIndicator, ProductTax, DeliveryDate, and/or TransactionDate. In some implementations, changes to the attributes may be inhibited (e.g., attributes may be read-only). If the reporting currency is different from the transaction currency, the attribute TransactionCurrencyProductTax may be set. If supplied in the base business document, the attribute TaxDueDate may be derived from the base business document. In some implementations, a some of the attributes are derived during the creation of this item and later changes may be inhibited (e.g., attributes may be read-only), for example, attributes, such as PropertyMovementDirectionCode, and TaxDueDate. The TaxDueDate may be set later (e.g., not during creation), if taxes are deferred (e.g., based on TaxDeferredIndicator inside the Product Tax.). In some implementations, attributes, such as ItemProductTaxSplitItemStatus, are derived during the creation of this item and/or later changes may be inhibited.

ItemProductTaxSplitItem may have composition relationships to subordinate nodes, such as the ItemProductTaxSplitItemTaxDeclarationAssignment has a cardinality of 1:cn.

Actions may include AddSplitItemTaxDeclarationAssignment, Replace, Clear, and/or Reopen. The AddSplitItemTaxDeclarationAssignment action identifies all ItemProductTaxSplitItems with the supplied identifiers (e.g., UUIDs) and may add corresponding TaxDeclarationAssignments data. This happens when a Tax Declaration is created and saved in the BusinessObject ProductTaxDeclaration or EuropeanCommunitySalesListReport. Preconditions of the AddSplitItemTaxDeclarationAssignment may include that a ProductTaxDeclaration or EuropeanCommunitySalesListReport is created and/or saved. Changes to the business object may include that the node ItemProductTaxSplitItemTaxDeclarationAssignment has entries created. Changes to the status may include that the ItemProductTaxSplitItemTaxDeclarationAssignments has a status of "open". Parameters of the AddSplitItemTaxDeclarationAssignment action may include that the action elements are defined by the data type TaxReceivablesPayableRegisterItemProductTaxSplitItemAddSplitItemTaxDeclarationAssignmentActionElements. These elements include: ProductTaxDeclarationID, ProductTaxDeclarationUUID, and/or ProductTaxDeclarationTypeCode.

The ProductTaxDeclarationID is the Identifier of the Tax Declaration which was created using the ItemProductTaxSplitItems. The ProductTaxDeclarationID is a GDT of type BusinessTransactionDocumentID. The ProductTaxDeclarationUUID is a universally unique identifier of the Tax Declaration which was created using the ItemProductTaxSplitItems. The ProductTaxDeclarationUUID is a GDT of type UUID. The ProductTaxDeclarationTypeCode is the type of TaxDeclaration. The ProductTaxDeclarationTypeCode is a GDT of type TaxDeclarationTypeCode. In some implementations, the AddSplitItemTaxDeclarationAssignment action may be executed by the BusinessObject ProductTaxDeclaration and EuropeanCommunitySalesListReport.

The Replace action replaces the split Item. The Replacement indicates that the Basic split item that originates from invoices or credit memos or other business transaction documents from outside Due Item Processing can no longer be included in a tax declaration. There may be other split items created out of this split item that can replace this split item in a tax declaration. Preconditions of the Replace action may include that the SplitItem has not been cleared and/or is not replaced. Changes to the object may include that the status of the splitItem is set from 'NotReplaced' to 'Replaced'. The Replace action may be called by the action NotifyOfPayment of the BO TaxReceivablesPayablesRegister when a partial payment of an invoice is made.

The Clear Action clears split items, such as basic split items and summary split items. Basic split items originate from invoices or credit memos or other business transaction documents from outside Due Item Processing. The Clear Action indicates that the basic split items are included in a tax declaration. The basic split items are cleared by a summary split item that is created by a tax declaration. The Summary split item originates from a tax declaration. The Clear Action indicates that the tax declaration which created the summary split item is paid. The summary split item is cleared by a payment split item which is created by the same tax declaration.

Preconditions of the Clear Action may include that the SplitItem has not been cleared. Changes to the object may include that the status of the splitItem is set from 'Open' to 'Cleared'. The Clear Action may be called by the action AddTaxReceivablePayableFromProductTaxDeclaration of the BO TaxReceivablesPayablesRegister when a ProductTaxDeclaration or a Payment Request is sent to the Tax Authorities.

The Reopen action reopens the split Items. The Reopening indicates that the Basic split items that originate from invoices or credit memos or other business transaction documents from outside Due Item Processing are no longer included in a tax declaration. The Basic split items may be again included in a new tax declaration. Preconditions of the Reopen action may include that the Split Item has a status of 'Cleared'. Changes in the object may include that the ItemProductTaxSplitItemClearingStatus will be changed from 'Cleared' to 'Open'. The Reopen action may be called by the action Cancel of the BO TaxReceivablesPayablesRegister when a ProductTaxDeclaration that has been sent to the Tax Authorities is cancelled.

Queries include QueryByProductTax, QueryByDeferredTax, and/or QueryByProductTaxDeclaration. QueryByProductTax provides a list of ItemProductTaxSplitItems whose attributes satisfy the selection condition. The Query-Elements are defined by the datatype TaxReceivablesPayablesRegisterProductTaxQueryElements. These elements include TaxReceivablesPayablesRegisterItemCompanyID, TaxReceivablesPayablesRegisterItemCompanyUUID, TypeCode, ProductTaxCountryCode, ProductTaxRegionCode, ProductTaxJurisdictionCode, ProductTaxTypeCode, TaxDueDate, ProductTaxEventTypeCode, ClearingStatusCode, and/or ReplacementStatusCode. In some implementations, elements may include TaxReceivablesPayablesRegisterItemCompanyID, TypeCode, ProductTaxCountryCode, ProductTaxTypeCode, TaxDueDate, and ProductTaxEventTypeCode and other elements such as TaxReceivablesPayablesRegisterItemCompanyUUID, ProductTaxRegionCode, ProductTaxJurisdictionCode, ClearingStatusCode, and/or ReplacementStatusCode may be optional.

The TaxReceivablesPayablesRegisterItemCompanyID is a GDT of type OrganizationalCentreID.

The TaxReceivablesPayablesRegisterItemCompanyUUID is a GDT of type UUID. The TypeCode is a GDT of type TaxReceivablesPayablesRegisterItemSplitItemTypeCode. The ProductTaxCountryCode is from element ProductTax. The ProductTaxCountryCode is a GDT of type CountryCode. The ProductTaxRegionCode is from element ProductTax. The ProductTaxRegionCode is a GDT of type RegionCode. The ProductTaxJurisdictionCode is from element ProductTax. The ProductTaxJurisdictionCode is a GDT of type TaxJurisdictionCode. The ProductTaxTypeCode is from element ProductTax. The ProductTaxTypeCode is a GDT of type TaxTypeCode. The TaxDueDate is a GDT of type Date and/or may include a TaxDeclaration qualifier. The ProductTaxEventTypeCode is from element ProductTax. The ProductTaxEventTypeCode is a GDT of type ProductTaxEventTypeCode. The ClearingStatusCode is a GDT of type ClearingStatusCode. The ReplacementStatusCode is a GDT of type ReplacementStatusCode.

The QueryByDeferredTax provides a list of ItemProductTaxSplitItems whose attributes satisfy the selection condition. The Query-Elements may be defined by the datatype TaxReceivablesPayablesRegisterDeferredTaxQueryElements. These elements include TaxReceivablesPayablesRegisterItemCompanyID, TaxReceivablesPayablesRegisterItemCompanyUUID, TypeCode, ProductTaxCountryCode, ProductTaxRegionCode, ProductTaxTypeCode, AccountingTransactionDate, ProductTaxEventTypeCode, ClearingStatusCode, and/or ReplacementStatusCode. In some implementations, elements may include TaxReceivablesPayablesRegisterItemCompanyID, TypeCode, ProductTaxCountryCode, ProductTaxTypeCode, and AccountingTransactionDate and some elements may be optional, such as TaxReceivablesPayablesRegisterItemCompanyUUID, ProductTaxRegionCode, ProductTaxEventTypeCode, ClearingStatusCode, and/or ReplacementStatusCode.

The TaxReceivablesPayablesRegisterItemCompanyID is a GDT of type OrganizationalCentreID. The TaxReceivablesPayablesRegisterItemCompanyUUID is a GDT of type UUID. The TypeCode is a GDT of type TaxReceivablesPayablesRegisterItemSplitItemTypeCode. The ProductTaxCountryCode is from element ProductTax. The ProductTaxCountryCode is the country for which the tax declaration is made. The ProductTaxCountryCode is a GDT of type CountryCode. The ProductTaxRegionCode is the region in the country for which the tax declaration is made (e.g., States in USA) and/or from element ProductTax. The ProductTaxRegionCode is a GDT of type RegionCode. The ProductTaxTypeCode is from element ProductTax. The ProductTaxTypeCode is a GDT of type TaxTypeCode. The AccountingTransactionDate is a GDT of type Date and/or may include a Transaction qualifier. The ProductTaxEventTypeCode is from element ProductTax. The ProductTaxEventTypeCode is a GDT of type ProductTaxEventTypeCode. The ClearingStatusCode is a GDT of type ClearingStatusCode. The ReplacementStatusCode is a GDT of type ReplacementStatusCode.

The QueryByProductTaxDeclaration provides a list of ItemProductTaxSplitItems whose attributes satisfy the selection condition. The Query-Elements are defined by the datatype TaxReceivablesPayablesRegisterProductTaxDeclarationQueryElements. These elements include TaxReceivablesPayablesRegisterItemCompanyID, TaxReceivablesPayablesRegisterItemCompanyUUID, ItemProductTaxSplitItemTaxDeclarationAssignmentTaxDeclarationID, ItemProductTaxSplitItemTaxDeclarationAssignmentTaxDeclarationUUID, and/or ItemProductTaxSplitItemTaxDeclarationAssignmentTaxDeclarationTypeCode. In some implementations, elements include TaxReceivablesPayablesRegisterItemCompanyID and ItemProductTaxSplitItemTaxDeclarationAssignmentTaxDeclarationTypeCode and other elements are optional such as, TaxReceivablesPayablesRegisterItemCompanyUUID, ItemProductTaxSplitItemTaxDeclarationAssignmentTaxDeclarationID, and ItemProductTaxSplitItemTaxDeclarationAssignmentTaxDeclaration UUID.

The TaxReceivablesPayablesRegisterItemCompanyID is a GDT of type OrganizationalCentreID. The TaxReceivablesPayablesRegisterItemCompanyUUID is a GDT of type UUID. The ItemProductTaxSplitItemTaxDeclarationAssignmentTaxDeclarationID is a GDT of type BusinessTransactionDocumentID. The ItemProductTaxSplitItemTaxDeclarationAssignmentTaxDeclarationUUID is a GDT of type UUID. The ItemProductTaxSplitItemTaxDeclarationAssignmentTaxDeclarationTypeCode is a GDT of type TaxDeclarationTypeCode. To maintain integrity, parameters, such as ItemProductTaxSplitItemTaxDeclarationAssignmentTaxDeclarationID, and/or ItemProductTaxSplitItemTaxDeclarationAssignmentTaxDeclarationUUID, may be specified.

ItemProductTaxSplitItemTaxDeclarationAssignment An ItemProductTaxSplitItemTaxDeclarationAssignment is the reference to the TaxDeclaration in which the corresponding ItemProductTaxSplitItem was declared to the tax authorities. Elements which are directly located at the node ItemProductTaxSplitItemTaxDeclarationAssignment are defined by data type ItemProductTaxSplitItemTaxDeclarationAssignmentElements. These elements include: ID, UUID, TaxDeclarationID, TaxDeclarationUUID, TaxDeclarationTypeCode, and/or SystemAdministrativeData.

The ID is within the SplitItem and/or a unique identifier of the TaxDeclarationAssignment. The ID is a GDT of type TaxReceivablesPayablesRegisterItemProductTaxSplitItemID. The UUID is a universally unique identifier of the TaxDeclarationAssignment. The UUID is a GDT of type UUID. The TaxDeclarationID is the identifier of the tax declaration which reported the corresponding split item. The TaxDeclarationID is a GDT of type BusinessTransactionDocumentID. The TaxDeclarationUUID is a universally unique identifier of the tax declaration which reported the corresponding split item. The TaxDeclarationUUID is a GDT of type UUID. The TaxDeclarationTypeCode is the type of TaxDeclaration. The TaxDeclarationTypeCode is a GDT of type TaxDeclarationTypeCode. The SystemAdministrativeData is the administrative data stored in a system. This administrative data includes the system users and change times of the TaxDeclarationAssignment. The SystemAdministrativeData is a GDT of type SystemAdministrativeData.

There may be a number of Inbound Aggregation Relationships. For example, from business object ProductTaxDeclaration (or node TaxDeclaration), the ProductTaxDeclaration may have a cardinality of c:c. The ProductTaxDeclaration which reported the tax receivable/payable. From business object EuropeanCommunitySalesListReport (or node TaxDeclaration), the EuropeanCommunitySalesListReport may have a cardinality of c:c. The EuropeanCommunitySalesListReport which reported the tax receivable/payable. The Constraints may be a logical dependency and there is no navigation or dependency on the UI yet.

ItemWithholdingTaxSplitItem.

An ItemWitholdingTaxItem is a mutually exclusive part of an item which contains withholding taxes and/or is split on the basis of tax splitting criteria. An ItemWithholdingTaxSplitItem is the splitting of the Item into several parts to assign different status values (e.g., "open" or "cleared") or different values of other attributes (e.g., a different due date, tax event, tax type) to these parts. Elements which are directly located at the node ItemWithholdingTaxSplitItem are defined by the data type ItemWithholdingTaxSplitItemElements. These elements include ID, UUID, OriginID, LastChangeBusinessTransactionDocumentReference, LastChangeBusinessTransactionDocumentUUID, BusinessTransactionDocumentItemTypeCode, TypeCode, LastChangeBusinessTransactionDocumentTypeCode, SystemAdministrativeData, CashDiscountDeductibleIndicator, WithholdingTax, TransactionCurrencyWithholdingTax, PropertyMovementDirectionCode, CancellationDocumentIndicator, AccountingTransactionDate, TaxDueDate, and/or Status. In some implementations, elements may include ID, UUID, LastChangeBusinessTransactionDocumentReference, LastChangeBusinessTransactionDocumentUUID, TypeCode, LastChangeBusinessTransactionDocumentTypeCode, SystemAdministrativeData, CashDiscountDeductibleIndicator, WithholdingTax, PropertyMove-mentDirectionCode, CancellationDocumentIndicator, and TaxDueDate and some elements may be optional, such as OriginID, BusinessTransactionDocumentItemTypeCode, TransactionCurrencyWithholdingTax, AccountingTransactionDate, and Status.

The ID is within the item and/or is a unique identifier of the split item. The ID is a GDT of type TaxReceivablesPayablesRegisterItemWithholdingTaxSplitItemID. The UUID is a universally unique identifier of this split item. The UUID is a GDT of type UUID. The OriginID is the ID of the original split item that was split to get this split item. The OriginID is a GDT of typeTaxReceivablesPayablesRegisterItemWithholdingTaxSplitItemID. The LastChangeBusinessTransactionDocumentReference is a reference to the business document on which the last change of this split item is based. The LastChangeBusinessTransactionDocumentReference is a GDT of type BusinessTransactionDocumentReference. The LastChangeBusinessTransactionDocumentUUID is a universally unique identifier of this business document on which the last change of this split item is based. The LastChangeBusinessTransactionDocumentUUID is a GDT of type UUID. The BusinessTransactionDocumentItemTypeCode is the type of item specified in the business document. The BusinessTransactionDocumentItemTypeCode is a GDT of type BusinessTransactionDocumentItemTypeCode. The TypeCode is the type of the splitItem based on the business document on which this split item is based (e.g., invoice or credit memo in a Customer Invoice, TaxDeclarationSummaryLine, or TaxDeclarationPaymentLine). The TypeCode is a GDT of type TaxReceivablesPayablesRegisterItemSplitItemTypeCode. The LastChangeBusinessTransactionDocumentTypeCode is the type of the business document on which the last change of this split item is based. The LastChangeBusinessTransactionDocumentTypeCode is a GDT of type BusinessTransactionDocumentTypeCode. The SystemAdministrativeData is the administrative data stored in a system. This data includes the system users and change times of the split item. The SystemAdministrativeData is a GDT of type SystemAdministrativeData. The CashDiscountDeductibleIndicator indicates if this split item is relevant for cash discount. The CashDiscountDeductibleIndicator is a GDT of type Indicator and/or may include a CashDiscountDeductible qualifier. The WithholdingTax is a tax where the paying party pays the tax directly to the tax authority instead of the recipient of payment. The amounts within are in TaxDeclarationCurrency. The WithholdingTax is a GDT of type WithholdingTax. The TransactionCurrencyWithholdingTax is a tax where the paying party pays the tax directly to the tax office instead of the recipient of payment. The TransactionCurrencyWithholdingTax is a GDT of type WithholdingTax and/or includes a TransactionCurrency qualifier. The PropertyMovementDirectionCode is the property change type of the item, such as increase or decrease of a receivable or a payable. The PropertyMovementDirectionCode is a GDT of type PropertyMovementDirectionCode. The CancellationDocumentIndicator indicates if this splitItem belongs to a CancellationDocument. The CancellationDocumentIndicator is a GDT to type Indicator and/or may include a CancellationDocument qualifier. The AccountingTransactionDate is the proposed date on the basis of which the posting date in Financial Accounting is determined. The AccountingTransactionDate is a GDT of type Date and/or a Transaction qualifier. The TaxDueDate is the date as of which this tax entry is due to be reported to the tax authority. The TaxDueDate is a GDT of type Date and/or may include a Due qualifier.

The Status is the status of this SplitItem. The Status is IDT of type TaxReceivablesPayablesRegisterItemWithholdingTaxSplitItemStatus. The IDT TaxReceivablesPayablesRegisterItemWithholdingTaxSplitItemStatus includes elements, such as ClearingStatusCode and/or ReplacementStatusCode. The ClearingStatusCode specifies whether a ItemProductTaxSplitItem is open or cleared. The ClearingStatusCode is a GDT of type ClearingStatusCode. The ReplacementStatusCode specifies whether a ItemProductTaxSplitItem is Replaced or NotReplaced. The ReplacementStatusCode is a GDT of type ReplacementStatusCode.

Attributes may be derived from the base business document and may not filled, in some implementations, until this item has been created. Attributes may include BaseBusinessTransactionDocumentItemTypeCode, CashDiscountDeductibleIndicator, WithholdingTax, and/or TransactionDate. In some implementations, changes to attributes may be inhibited (e.g., attributes may be read-only). If the reporting currency is different from the transaction currency, the attribute TransactionCurrencyWithholdingTax may be set. The attribute TaxDueDate may be derived from the base business document if supplied in the base business document. Attributes, such as PropertyMovementDirectionCode and TaxDueDate, may be derived during the creation of this item and/or later changes may be inhibited (e.g., attributes may be read-only). The TaxDueDate may be set later (e.g., not during creation), if withholding taxes are calculated at payment time. This may be based on the configuration. Attributes, such as ItemWithholdingTaxSplitItemStatus, may be derived during the creation of this item and may be changed later.

There may be a number Inbound Association Relationships, such as from the business object BusinessPartner (or node TaxAuthority), the BusinessPartner may have a cardinality of 1:cn. The business partner may be the Tax Authority. Composition relationships to subordinate nodes may including the ItemWitholdingTaxSplitItemTaxDeclarationAssignment having a cardinality of 1:cn.

The AddSplitItemTaxDeclarationAssignment action identifies all ItemWithholdingTaxSplitItems with the supplied identifiers (e.g., UUIDs) and/or may add corresponding TaxDeclarationAssignments data. For example, the node ItemWithholdingTaxSplitItemTaxDeclarationAssignment 47028 has entries created and the action elements are defined by the data type TaxReceivablesPayableRegisterItemWithholdingTaxSplitItemAddSplitItemTaxDeclarationAssignmentActionElements. These elements include WithholdingTaxDeclarationID, WithholdingTaxDeclarationUUID, and/or WithholdingTaxDeclarationTypeCode. The WithholdingTaxDeclarationID is the identifier of the Tax Declaration which was created using the ItemWithholdingductTaxSplitItems. The WithholdingTaxDeclarationID is a GDT of type BusinessTransactionDocumentID. The WithholdingTaxDeclarationUUID is a universally Unique Identifier of the Tax Declaration which was created using the ItemWithholdingTaxSplitItems. The WithholdingTaxDeclarationUUID is a GDT of type UUID. The WithholdingTaxDeclarationTypeCode is the type of TaxDeclaration. The WithholdingTaxDeclarationTypeCode is a GDT of typeTaxDeclarationTypeCode. In some implementations, this action may be executed by the BusinessObject WithholdingTaxDeclaration.

Queries may include QueryByWithholdingTax and/or QueryByWithholdingTaxDeclaration. The QueryByWithholdingTax provides a list of ItemWithholdingTaxSplitItems whose attributes satisfy the selection condition. The QueryElements are defined by the datatype TaxReceivablesPayablesRegisterWithholdingTaxQueryElements. These elements include TaxReceivablesPayablesRegisterItemCompanyID, TaxReceivablesPayablesRegisterItemCompanyUUID, TypeCode, WithholdingTaxCountryCode, WithholdingTaxRegionCode, WithholdingTaxTypeCode, TaxDueDate, WithholdingTaxEventTypeCode, TaxReceivablesPayablesRegisterItemBusinessPartnerID, TaxReceivablesPayablesRegisterItemOriginContractBusinessTransactionDocumentReference, ClearingStatusCode, and/or ReplacementStatusCode. In some implementations, the elements include TaxReceivablesPayablesRegisterItemCompanyID, TypeCode, WithholdingTaxCountryCode, WithholdingTaxTypeCode, TaxDueDate, and WithholdingTaxEventTypeCode and some elements may be optional, such as TaxReceivablesPayablesRegisterItemCompanyUUID, WithholdingTaxRegionCode, TaxReceivablesPayablesRegisterItemBusinessPartnerID, TaxReceivablesPayablesRegisterItemOriginContractBusinessTransactionDocumentReference, Clearing-StatusCode, and ReplacementStatusCode.

The TaxReceivablesPayablesRegisterItemCompanyID is a GDT of type OrganizationalCentreID.

The TaxReceivablesPayablesRegisterItemCompanyUUID is GDT of type UUID. The TypeCode is a GDT of type TaxReceivablesPayablesRegisterItemSplitItemTypeCode. The WithholdingTaxCountryCode is from Element WithholdingTax. The WithholdingTaxCountryCode is a GDT of type CountryCode.

The WithholdingTaxRegionCode is from element WithholdingTax. The WithholdingTaxRegionCode is a GDT of type RegionCode. The WithholdingTaxTypeCode is from Element WithholdingTax. The WithholdingTaxTypeCode is a GDT of typeTaxTypeCode. The TaxDueDate is a GDT of type Date.

The WithholdingTaxEventTypeCode is from Element Withholding Tax. The WithholdingTaxEventTypeCode is a GDT of type WithholdingTaxEventTypeCode. The TaxReceivablesPayablesRegisterItemBusinessPartnerID is a GDT of type BusinessPartnerID. The TaxReceivablesPayablesRegisterItemOriginContractBusinessTransactionDocumentReference is a GDT of type BusinessTransactionDocumentReference. The ClearingStatusCode is a GDT of type ClearingStatusCode. The ReplacementStatusCode is a GDT of type ReplacementStatusCode.

The QueryByWithholdingTaxDeclaration provides a list of ItemWithholdingTaxDeclarationSplitItems whose attributes satisfy the selection condition. The Query-Elements are defined by the datatypeTaxReceivablesPayablesRegisterWithholdingTaxDeclarationQueryElements.

These elements include TaxReceivablesPayablesRegisterItemCompanyID, TaxReceivablesPayablesRegisterItemCompanyUUID, ItemWitholdingTaxSplitItemTaxDeclarationAssignmentTaxDeclarationID, ItemWitholdingTaxSplitItemTaxDeclarationAssignmentTaxDeclarationTypeCode, and/or the type of TaxDeclaration. In some implementations, elements may include TaxReceivablesPayablesRegisterItemCompanyID and the type of TaxDeclaration and elements, such as TaxReceivablesPayablesRegisterItemCompanyUUID, ItemWitholdingTaxSplitItemTaxDeclarationAssignmentTaxDeclarationID, and ItemWitholdingTaxSplitItemTaxDeclarationAssignmentTaxDeclarationTypeCode, may be optional.

The TaxReceivablesPayablesRegisterItemCompanyID is a GDT of type OrganizationalCentreID.

The TaxReceivablesPayablesRegisterItemCompanyUUID is a GDT of type UUID. The ItemWitholdingTaxSplitItemTaxDeclarationAssignmentTaxDeclarationID is a GDT of type BusinessTransactionDocumentID. The ItemWitholdingTaxSplitItemTaxDeclarationAssignmentTaxDeclarationUUID is a GDT of type UUID. The ItemWitholdingTaxSplitItemTaxDeclarationAssignmentTaxDeclarationTypeCode is the type of TaxDeclaration. The ItemWitholdingTaxSplitItemTaxDeclarationAssignmentTaxDeclarationTypeCode is a GDT of type TaxDeclarationTypeCode. To maintain integrity, parameters such as ItemWitholdingTaxSplitItemTaxDeclarationAssignmentTaxDeclarationID and/or ItemWitholdingTaxSplitItemTaxDeclarationAssignmentTaxDeclarationUUID may be specified.

ItemWithholdingTaxSplitItemTaxDeclarationAssignment

A ItemWithholdingTaxSplitItemTaxDeclarationAssignment is the information about the TaxDeclaration in which the corresponding ItemWithholdingTaxSplitItem was declared to the tax authorities. Elements which are directly located at the node ItemWithholdingTaxSplitItemTaxDeclarationAssignment are defined by data type ItemWithholdingTaxSplitItemTaxDeclarationAssignmentElements. These elements include ID, UUID, TaxDeclarationID, TaxDeclaration UUID, TaxDeclarationTypeCode, and/or SystemAdministrativeData.

The ID is within the SplitItem and/or a unique identifier of the TaxDeclarationAssignment. The ID is a GDT of type TaxReceivablesPayablesRegisterItemProductTaxSplitItemID. The UUID is a universally unique identifier of the TaxDeclarationAssignment. The UUID is a GDT of type UUID. The TaxDeclarationID is the identifier of the tax declaration which reported the corresponding split item. The TaxDeclarationID is a GDT of type BusinessTransactionDocumentID. The TaxDeclarationUUID is a universally unique identifier of the tax declaration which reported the corresponding split item. The TaxDeclarationUUID is a GDT of type UUID. The TaxDeclarationTypeCode is the type of TaxDeclaration. The TaxDeclarationTypeCode is a GDT of type TaxDeclarationTypeCode. The SystemAdministrativeData is the administrative data stored in a system. This administrative data includes the system users and change times of the TaxDeclarationAssignment. The SystemAdministrativeData is a GDT of type SystemAdministrativeData.

Inbound Aggregation Relationships include, for example, from business object TaxDeclaration (or node WithholdingTaxDeclaration), the WithholdingTaxDeclaration may have a cardinality relationship of c:c. The WithholdingTaxDeclaration may report the tax receivable and/or payable.

CompanyBalance

A CompanyBalance is the date-based total of amounts of the tax receivables/payables of the company. Elements which are directly located at TaxReceivablesPayablesRegisterCompanyBalance are defined by the data type TaxReceivablesPayablesRegisterCompanyBalanceElements. These elements include CompanyID, TaxCountryCode, TaxRegionCode, TaxTypeCode, DueCategoryCode, TaxDeferredIndicator, AccountingTransactionDate, TransactionCurrencyCode, TransactionCurrencyAmount, and/or NonDeductibleTaxDeclarationCurrencyAmount. In some implementations, the TaxRegionCode element may be optional.

The CompanyID is the ID of the company of the items included in this total (e.g., from Root-CompanyID). The CompanyID is a GDT of type OrganizationalCentreID. The TaxCountryCode is the country where the tax is due. The TaxCountryCode is a GDT of type CountryCode. The TaxRegionCode is the region where the tax is due (e.g., a state within a country). The TaxRegionCode is a GDT of type RegionCode and/or may be a Tax qualifier. The TaxTypeCode is the tax type for which the tax is due. The TaxTypeCode is a GDT of type TaxTypeCode. The DueCategoryCode is the due category (e.g. receivable or payable) of the items included in this total (e.g., from Item-DueCategoryCode). The DueCategoryCode is a GDT of type DueCategoryCode. The TaxDeferredIndicator is the indicator which indicates if the tax is deferred to payment. The TaxDeferredIndicator is a GDT of type Indicator and/or may include a TaxDeferred qualifier. The AccountingTransactionDate is the proposed date for the determination of the accounting period. The AccountingTransactionDate is a GDT of type Date and/or may include a Transaction qualifier. The TransactionCurrencyCode is the currency of the amount of the items included in this balance. The TransactionCurrencyCode is a GDT of type CurrencyCode and/or may include a Transaction qualifier. The TransactionCurrencyAmount is the deductible balance in transaction currency. The TransactionCurrencyAmount is a GDT of type Amount and/or may include a TransactionCurrency Qualifier.

The NonDeductibleTransactionCurrencyAmount is the nondeductiblebalance in transaction currency. The NonDeductibleTransactionCurrencyAmount is a GDT of type Amount. In some implementations, the NonDeductibleTransactionCurrencyAmount has a TransactionCurrency qualifier.

The TaxDeclarationCurrencyCode is the currency of the amount of the items included in this balance. The TaxDeclarationCurrencyCode is a GDT of type CurrencyCode. In some implementations, the TaxDeclarationCurrencyCode has a TaxDeclaration qualifier.

The TaxDeclarationCurrencyAmount is the deductible balance in Tax Declaration currency. The TaxDeclarationCurrencyAmount is a GDT of type Amount.

The NonDeductibleTaxDeclarationCurrencyAmount is the nondeductiblebalance in Tax Declaration currency. The NonDeductibleTaxDeclarationCurrencyAmount is a GDT of type Amount.

Queries may include a QueryByBalances, which provides a list of CompanyBalances whose attributes satisfy the selection condition. The Query-Elements are defined by the datatype TaxReceivablesPayablesRegisterCompanyBalanceQueryElements. These elements include CompanyID, TaxCountryCode, TaxRegionCode, TaxTypeCode, DueCategoryCode, and/or TaxDeferredIndicaAccountingTransactionDate. In some implementations, the TaxRegionCode may be optional.

The CompanyID is a GDT of type OrganizationalCentreID. The TaxCountryCode is a GDT of type CountryCode. The TaxRegionCode is a GDT of type RegionCode. The TaxTypeCode is a GDT of type TaxTypeCode. The DueCategoryCode is a GDT of type DueCategoryCode. The TaxDeferredIndicator is a GDT of type Indicator and/or may include a TaxDeferred qualifier. The AccountingTransactionDate is a GDT of type Date and/or may include a Transaction qualifier.

LiquidityInformationItem

The LiquidityInformationItem is the information about executed or expected cash income and outcome (e.g., Liquidity) from tax receivables and payables. The elements which are directly located at the node TaxReceivablesPayablesRegisterLiquidityInformationItem are defined by the data type TaxReceivablesPayablesRegisterLiquidityInformationItemElements. These elements include BaseBusinessTransactionDocumentReference, CompanyUUID, CompanyID, LiquidityItemGroupCode, LiquidityItemOperationalProcessProgressCategoryCode, LiquidityItemBusinessTransactionDocumentStatusCategoryCode, PaymentFormCode, HouseBankAccountUUID, CashStorageUUID, LiquidityItemDescription, TransactionCurrencyAmount, and/or ValueDateTime. In some implementation, elements may include CompanyUUID, CompanyID, LiquidityItemGroupCode, LiquidityItemOperationalProcessProgressCategoryCode, LiquidityItemBusinessTransactionDocumentStatusCategoryCode, TransactionCurrencyAmount, and ValueDateTime and some elements, such as BaseBusinessTransactionDocumentReference, PaymentFormCode, HouseBankAccountUUID, CashStorageUUID, and LiquidityItemDescription may be optional.

The BaseBusinessTransactionDocumentReference is reference to business document, which forms the basis of this Item. In some implementations, if an aggregation of business events forms the basis of the item, then the BaseBusinessTransactionDocumentReference may not be filled. The BaseBusinessTransactionDocumentReference is a GDT of type BusinessTransactionDocumentReference. The CompanyUUID is a unique Identifier of the company which provides the liquidity information. The CompanyUUID is a GDT of type UUID. The CompanyID is the internal Identifier of the company which provides the liquidity information. The CompanyID is a GDT of type OrganisationalCentreID.

The LiquidityItemGroupCode may be a coded representation of the group, to which the items belongs. The grouping is made by business characteristics of the business process, which forms the basis of the item. The LiquidityItemGroupCode is a GDT of type LiquidityItemGroupCode. The LiquidityItemOperationalProcessProgressCategoryCode may be a coded representation of the Process Progress of the business process, which forms the basis. The LiquidityItemOperationalProcessProgressCategoryCode is a GDT of type LiquidityItemOperationalProcessProgressCategoryCode. The LiquidityItemBusinessTransactionDocumentStatusCategoryCode is the coded representation of the status of the business process, which forms the basis of the item. The LiquidityItemBusinessTransactionDocumentStatusCategoryCode is a GDT of type LiquidityItemBusinessTransactionDocumentStatusCategoryCode. The PaymentFormCode is the coded representation of the payment form of the business process, which forms the basis of the item. The PaymentFormCode is a GDT of type PaymentFormCode. The HouseBankAccountUUID is a Housebankaccount on which the increase or decrease of liquidity is or will be realized. The HouseBankAccountUUID is a GDT of type UUID. The CashStorageUUID is the storage location for cash money, on which the increase or decrease of liquidity is or will be realized. The CashStorageUUID is a GDT of type UUID. The LiquidityItemDescription includes a description of the item. The LiquidityItemDescription is a GDT of type _MEDIUM_Description. The TransactionCurrencyAmount includes the amount of the item in transaction currency. The TransactionCurrencyAmount is a GDT of type Amount and/or may have a TransactionCurrency qualifier. The ValueDateTime is the realized or expected value date of the item. The ValueDateTime is a GDT of type Datetime and/or may include a Value qualifier.

The CreateForLiquidityForecastProfile action creates LiquidityInformationItems for a given LiquidityForecastProfile. The LiquidityForecastProfile is a combination of specifications (e.g. currencies, liquidity groups, liquidity categories, and/or time interval). The LiquidityInformationItems may be created according to the given LiquidityForecastProfile. The CreateForLiquidityForecastProfile action elements may be defined by the data type TaxReceivablesPayablesRegisterLiquidityInformationItemCreateForLiquidityForecastProfileAction Elements. These elements include, for example, LiquidityForecastProfileCode. The LiquidityForecastProfileCode is the coded representation of the liquidity forecast profile. The LiquidityForecastProfileCode is a GDT of type LiquidityForecastProfileCode. In some implementations, this action may be called by the inbound agent for the Query Liquidity Information operation.

Business Object TaxReceivablesPayablesRegister

A TaxReceivablesPayablesRegister is the detail information about tax receivables and payables of a company that are due for delivered goods and rendered services between buyers and sellers that are due for the consumption of goods, that are due for the transfer of goods, and that are withheld from payments to sellers In a TaxReceivablesPayablesRegister buyer and seller parties take on the roles of debtor and creditor, respectively. The business object TaxReceivablesPayablesRegister is part of the process component Due Item Processing. The TaxReceivablesPayablesRegister contains the tax receivables/payables of a company for a business transaction document, and the totals for the tax receivables/payables per company. The Business Object TaxReceivablesPayablesRegister is involved in following Process Integration Models: SupplierInvoiceProcessing_DueItemProcessing, CustomerInvoiceProcessing_DueItemProcessing, ExpenseReimbursement_DueItemProcessing, and Cash Management_Due Item Processing.

The Service Interface DueItemProcessingReceivablesPayablesNotificationIn consisting of the message type ReceivablesPayablesNotification is enhanced with data type enhancement structure TaxReceivablesPayablesRegisterMessageCNEnhancementExtensionElements consisting of the field TransportModeCode (GDT: TransportModeCode), GoIdenTaxInvoiceLegallyRequiredID (GDT: InvoiceLegallyRequiredID), and GoIdenTaxTaxInvoiceTypeCode (GDT: TaxInvoiceTypeCode, Qualifier: GoIden- Tax). These fields will be added to subnode ProductTaxSplitItem of node TaxReceivablesPayablesRegisterItem of node ReceivablesPayables of message ReceivablesPayablesNotification.

Node Structure of Business Object TaxReceivablesPayablesRegister. All the nodes of the Business object TaxReceivablesPayablesRegister remain the same.

The Item node is extended with three additional fields and is defined by the data type enhancement structure: The TaxReceivablesPayablesRegisterItemCNEnhancementExtensionElements. These element include: TransportModeCode, GoIdenTaxInvoiceLegallyRequiredID, and GoIdenTaxTaxInvoiceTypeCode.

The TransportModeCode is a coded representation of the mode of transportation used for delivery.

The TransportModeCode is a GDT f type TransportModeCode, and is optional.

The GoIdenTaxInvoiceLegallyRequiredID is a legally required id assigned to customer invoice by GoIden Tax System. The GoIdenTaxInvoiceLegallyRequiredID is a GDT of type InvoiceLegallyRequiredID, and is optional.

The GoIdenTaxTaxInvoiceTypeCode is a coded representation of the type of invoice which is returned from GoIden Tax System. The GoIdenTaxTaxInvoiceTypeCode is a GDT of type TaxInvoiceTypeCode, In some implementations, the GoIdenTaxTaxInvoiceTypeCode has a GoIdenTax qualifier and is optional. The GoIden Tax system is an authentication system used by Chinese tax authorities for the authentication of invoices.

Business Object TradeReceivablesPayablesAccount

FIG. 48 illustrates one example of an TradeReceivablesPayablesAccount business object model 48002. Specifically, this figure depicts interactions among various hierarchical components of the TradeReceivablesPayablesAccount, as well as external components that interact with the TradeReceivablesPayablesAccount (shown here as 48000 and 48004 through 48014).

In some examples, a TradeReceivablesPayablesAccount can be a structure element of Due Item Processing for data entry and reporting of trade receivables or trade payables of a company from or to a business partner. The TradeReceivablesPayablesAccount can include guidelines and agreements with regards to a business partner concerning the payments and dunning for receivables and payables. In conjunction with a TradeReceivablesPayablesAccount, the effects of business transactions on the balances of trade receivables and trade payables are continually recorded in business object TradeReceivablesPayables. The business object itself does not include individual transactions or totals. The business object TradeReceivablesPayablesAccount is part of the process component Due Item Processing. In some implementations, an example of a company-internal guideline is the procedure for how a company duns its business partner. In some examples, whether receivables and payables can offset each other depends on an agreement between the company and the business partner. The TradeReceivablesPayablesAccount is represented by a Root node 48016.

The Structure element of Due Item Processing for data entry and reporting of trade receivables or trade payables of a company from or to a business partner. It includes the company's internal guidelines and agreements with regards to a business partner concerning the payments and dunning for receivables and payables. Some elements located at the node TradeReceivablesPayablesAccount are defined by a GDT of type TradeReceivablesPayablesAccountElements. These elements can include: UUID, CompanyID, CompanyUUID, BusinessPartnerInternalID, BusinessPartnerUUID, ReceivablesFunctionalUnitUUID, PayablesFunctionalUnitUUID, PartyRoleCategoryCode, LastDunningUUID, LastDunningDate, LastDunningLevelValue, DunningBlockedIndicator, DunningBlockingReasonCode, DunningBlockingExpirationDate, DunningProcedureCode, TradeReceivablesPayablesRegisterGroupingCriterionCode, DuePaymentStrategyCode, DueClearingStrategyCode, LastPaymentDate, LastBalanceConfirmationCreationDate, LastBalanceConfirmationKeyDate, BalanceConfirmationReturnLetterDueDate, OffsettingIndicator, DebtorDoubtfulIndicator, ExpectedPaymentAmount, ExpectedPaymentPercent, ExpectedPaymentLastCreationDate, PaymentDifferenceReasonCode, DebtorDoubtfulIndicatorLastChangeDate, WriteOffDeductionIndicator, TradeReceivablesPayablesAccountBusinessKey, and TradeReceivablesPayablesAccountTechnicalKey.

The UUID can be the universally unique identifier of TradeReceivablesPayablesAccount. The UUID can be a GDT of type UUID. In some Implementations, the UUID can be an alternative key. The CompanyID can be the identifier of the company. The CompanyID can be a GDT of type OrganisationalCentreID. The CompanyUUID can be the universally unique identifier of the company. The CompanyUUID can be a GDT of type UUID. The BusinessPartnerInternalID can be the unique identifier of the business partner involved. The BusinessPartnerInternalID can be a GDT of type BusinessPartnerInternalID. The BusinessPartnerUUID can be the universally unique identifier of the business partner involved. The BusinessPartnerUUID can be a GDT of type UUID. The ReceivablesFunctionalUnitUUID can be the universally unique identifier of the FunctionalUnit working on the TradeReceivablesPayablesAccount. In some implementations, the FunctionalUnit referenced may be able to execute the organizational function Receivables, e.g. the element OrganisationalFunctionCode in one of the instances of the node FunctionalUnitAttributes in the FunctionalUnit references can have the value "23" for Receivables. The TradeReceivablesPayablesAccount can be a GDT of type UUID, and can be optional. The PayablesFunctionalUnitUUID can be the universally unique identifier of the FunctionalUnit working on the TradeReceivablesPayablesAccount. In some implementations, the FunctionalUnit referenced has to be able to execute the organizational function Payables, e.g. the element OrganisationalFunctionCode in one of the instances of the node FunctionalUnitAttributes in the FunctionalUnit references can have the value "21" for Payables. The PayablesFunctionalUnitUUID can be a GDT of type UUID, and can be optional. The PartyRoleCategoryCode can be the role of the business partner involved. The PartyRoleCategoryCode can be an optional GDT of type PartyRoleCategoryCode with possible constraints that 3=Creditor Party, 4=Debtor Party.

The LastDunningUUID can be the universally unique identifier of the last dunning for this TradeReceivablesPayablesAccount. The LastDunningUUID can be a GDT of type UUID, and can be optional. The LastDunningDate can be the date of last dunning run. The LastDunningDate can be a GDT of type Date. The LastDunningDate can have a Dunning qualifier, and can be optional. The LastDunningLevelValue can be the Dunning level of last dunning run. The LastDunningLevelValue can be a GDT of type DunningLevelValue, and can be optional. The DunningBlockedIndicator can be the indicator whether for this account dunning can be blocked or not. The DunningBlockedIndicator can be a GDT of type BusinessTransactionBlockedIndicator, and can be optional. The DunningBlockingReasonCode can be the reason for the dunning block. The DunningBlockingReasonCode can be a GDT of type DunningBlockingReasonCode, and can be optional. The DunningBlockingExpirationDate can be the validity end date of the dunning block. The DunningBlockingExpirationDate can be a GDT of type Date. In some implementations, the DunningBlockingExpirationDate has a Expiration qualifier, and can be optional. The DunningProcedureCode can be the Dunning procedure for this TradeReceivablesPayablesAccount.

The DunningProcedureCode can be a GDT of type DunningProcedureCode, and can be optional. The TradeReceivablesPayablesRegisterGroupingCriterionCode can be the coded representation of a criterion to group receivables and payables on this TradeReceivablesPayablesAccount. The TradeReceivablesPayablesRegisterGroupingCriterionCode can be a GDT of type TradeReceivablesPayablesRegisterGroupingCriterionCode, and can be optional. The DuePaymentStrategyCode can be the DuePayment strategy for this TradeReceivablesPayablesAccount. The DuePaymentStrategyCode can be a GDT of type DuePaymentStrategyCode, and can be optional. The DueClearingStrategyCode can be the DueClearing strategy for this TradeReceivablesPayablesAccount. The DueClearingStrategyCode can be a GDT of type DueClearingStrategyCode, and can be optional. The LastPaymentDate can be the date of last payment. The LastPaymentDate can be a GDT of type Date. In some implementations, the LastPaymentDate has a Payment qualifier, and can be optional. The LastBalanceConfirmationCreationDate can be the date when the last balance confirmation was created.

The LastBalanceConfirmationCreationDate can be a GDT of type Date. In some implementations, the LastBalanceConfirmationCreationDate has a Creation qualifier, and can be optional. The LastBalanceConfirmationKeyDate can be the key date of the last balance confirmation. The LastBalanceConfirmationKeyDate can be a GDT of type Date. In some implementations, the LastBalanceConfirmationKeyDate has a Key qualifier Key, and can be optional. The BalanceConfirmationReturnLetterDueDate can be the date when the return letter for the balance confirmation can be due. The BalanceConfirmationReturnLetterDueDate can be a GDT of type Date. In some implementations, the BalanceConfirmationReturnLetterDueDate has a Due qualifier, and can be optional. The OffsettingIndicator can be the indicator whether the offsetting of receivables with payables can be allowed or not. The OffsettingIndicator can be a GDT of type Indicator. In some implementations, the OffsettingIndicator has a Offsetting qualifier, and can be optional. The DebtorDoubtfulIndicator can be the indicator whether the Business Partner can be a doubtful debtor or not. The DebtorDoubtfulIndicator can be a GDT of type Indicator. In some implementations, the DebtorDoubtfulIndicator has a Doubtful qualifier, and can be optional. The ExpectedPaymentAmount can be the payment amount expected from the doubtful business partner. The ExpectedPaymentAmount can be a GDT of type Amount. In some implementations, the ExpectedPaymentAmount has a Payment qualifier, and can be optional. The ExpectedPaymentPercent can be the payment percentage expected from the doubtful business partner. The ExpectedPaymentPercent can be a GDT of type Percent. In some implementations, the ExpectedPaymentPercent has a Payment qualifier, and can be optional. The ExpectedPaymentLastCreationDate can be the date when the last expected payment was created. The ExpectedPaymentLastCreationDate can be a GDT of type Date. In some implementations, the ExpectedPaymentLastCreationDate has a Creation qualifier, and can be optional. The PaymentDifferenceReasonCode can be the Code for the reason of a payment difference. The PaymentDifferenceReasonCode can be a GDT of type: PaymentDifferenceReasonCode, and can be optional. The DebtorDoubtfulIndicatorLastChangeDate can be the date when the DebtorDoubtfulIndicator was last changed. The DebtorDoubtfulIndicatorLastChangeDate can be a GDT of type Date. In some implementations the DebtorDoubtfulIndicatorLastChangeDate has a Change qualifier, and can be optional. The WriteOffDeductionIndicator can be the indicator whether there can be a deduction due to write off or not. The WriteOffDeductionIndicator can be a GDT of type Indicator. In some implementations, the WriteOffDeductionIndicator has a Deduction qualifier, and can be optional. The TradeReceivablesPayablesAccountBusinessKey can be the alternative key for access using CompanyID and BusinessPartnerInternalID. The TradeReceivablesPayablesAccountBusinessKey can include the following elements: CompanyID, BusinessPartnerID, TradeReceivablesPayablesAccountTechnicalKey, CompanyUUID, and BusinessPartnerUUID.

The CompanyID is a GDT of type OrganisationalCentreID. The BusinessPartnerID is a GDT of type BusinessPartnerInternalID. The TradeReceivablesPayablesAccountTechnicalKey is the alternative key for access using CompanyUUID and BusinessPartnerUUID. The TradeReceivablesPayablesAccountTechnicalKey some elements, such as CompanyID, and BusinessPartnerUUID. The CompanyUUID is a GDT of type UUID. The BusinessPartnerUUID is a GDT of type UUID.

Some composition relationships from the TradeReceivablesPayablesAccount to subordinate nodes can include a DO AccessControlList 48018 that can have a cardinality of 1:1. There may be a number of Inbound Aggregation Relationships can include From business object Company (or node Company) the Company may have a cardinality relationship of 1:cn. The Company specifies the company that has defined the agreement.

From business object Business Partner (or node Business Partner) the BusinessPartner may have a cardinality relationship of 1:cn. The BusinessPartner specifies the business partner for whom the TradeReceivablesPayablesAccount is defined.

There may be a number of Inbound Association Relationships including:

From the business object FunctionalUnit (or node FunctionalUnit) the ReceivablesFunctionalUnit may have a cardinality of c:cn. The ReceivablesFunctionalUnit identifies the Functional Unit which is working on the TradeReceivablesPayablesAccount.

The PayablesFunctionalUnit may have a cardinality of c:cn. The PayablesFunctionalUnit identifies the Functional Unit which is working on the TradeReceivablesPayablesAccount The Associations for Navigation to the business object TradeReceivablesPayablesRegister or node TradeReceivablesPayablesRegisterItem. The TradeReceivablesPayablesRegisterItem may have a cardinality of c:cn. The TradeReceivablesPayablesRegisterItems that belong to the TradeReceivablesPayablesAccount. The filter elements are defined by the data type TradeReceivablesPayablesRegisterItemByTradeReceivablesPayablesAccountFilterElements. These elements may include: PartyRoleCategoryCode.

The PartyRoleCategoryCode is an optional GDT of type PartyRoleCategoryCode with possible constraints that 3=Creditor Party, 4=Debtor Party. The Associations for Navigation to the business object TradeReceivablesPayablesRegister or node TradeReceivablesPayablesRegisterAccountBalance. The TradeReceivablesPayablesRegisterAccountBalance may have a cardinality of c:cn. The TradeReceivablesPayablesRegisterAccountBalance that belong to the TradeReceivablesPayablesAccount. The filter elements are defined by the data type: TradeReceivablesPayablesRegisterAccountBalanceByTradeReceivablesPayablesAccountFilterElements. These elements may include: PartyRoleCategoryCode.

The PartyRoleCategoryCode is an optional GDT of type PartyRoleCategoryCode with possible constraints that 3=Creditor Party, 4=Debtor Party.

The CreateBalanceConfirmation action enables the user to create and print balance confirmation. In some implementations, the BalanceConfirmationKeyDate and BalanceConfirmationReturnLetterDueDate are entered. It also generates and fills an instance of the dependent object ControlledOutputRequest. The action elements are defined by the data type TradeReceivablesPayablesAccountCreateBalanceConfirmationActionElements. These elements include: BalanceConfirmationProcedureCode, BalanceConfirmationKeyDate, BalanceConfirmationReturnLetterDueDate, and PartyRoleCategoryCode.

The BalanceConfirmationProcedureCode can be a GDT of type TradeReceivablesPayablesAccountBalanceConfirmationProcedureCode, and can be optional. The BalanceConfirmationKeyDate can be a GDT of type Date. In some implementations, the BalanceConfirmationKeyDate has a Key qualifier, and can be optional. The BalanceConfirmationReturnLetterDueDate can be a GDT of type Date. In some implementations, the BalanceConfirmationReturnLetterDueDate has a Due qualifier, and can be optional. The PartyRoleCategoryCode can be an optional GDT of type PartyRoleCategoryCode with possible constraints that 3=Creditor Party, 4=Debtor Party. In some implementations, this action may be performed by the UI or a mass data object.

The QueryByBusinessKey can provide a list of TradeReceivablesPayablesAccounts that belong to the selected companies or to the selected business partners. Company and BusinessPartner are identified by the semantic key. The Query elements are defined by the data type TradeReceivablesPayablesAccountQueryByBusinessKeyElements. These elements can include: CompanyID, BusinessPartnerInternalID, and PartyRoleCategoryCode.

In some implementations, the CompanyID is a GDT of type OrganisationalCentreID, and is optional. The BusinessPartnerInternalID is a GDT of type BusinessPartnerInternalID, and is optional. The PartyRoleCategoryCode is a optional GDT of type PartyRoleCategoryCode (e.g., with 3=Creditor Party, 4=Debtor Party).

In some implementations, the QueryByTechnicalKey: provides a list of TradeReceivablesPayablesAccounts that belong to the selected companies or to the selected business partners. Company and BusinessPartner are identified by the technical key. The Query elements are defined by the data type TradeReceivablesPayablesAccountQueryByTechnicalKeyElements. These elements include: CompanyUUID, BusinessPartnerUUID, and PartyRoleCategoryCode.

The CompanyUUID can be a GDT of type UUID, and can be optional. The BusinessPartnerUUID can be a GDT of type UUID, and can be optional. The PartyRoleCategoryCode can be an optional GDT of type PartyRoleCategoryCode with possible constraints that 3=Creditor Party, 4=Debtor Party.

In some implementations, the QueryByElements can provide a list of TradeReceivablesPayablesAccounts for specified elements. Some query parameters are optional. The Query elements are defined by the data type TradeReceivablesPayablesAccountElementsQueryElements. These elements include: UUID, CompanyID, BusinessPartnerInternalID, BusinessPartnerUUID, PartyRoleCategoryCode, LastDunningUUID, LastDunningDate, LastDunningLevelValue, DunningBlockedIndicator, DunningBlockingReasonCode, DunningBlockingExpirationDate, DunningProcedureCode, TradeReceivablesPayablesRegisterGroupingCriterionCode, DuePaymentStrategyCode, DueClearingStrategyCode, LastPaymentDate, LastBalanceConfirmationCreationDate, LastBalanceConfirmationKeyDate, BalanceConfirmationReturnLetterDueDate, OffsettingIndicator, DebtorDoubtfulIndicator, ExpectedPaymentAmount, ExpectedPaymentPercent ExpectedPaymentLastCreationDate, PaymentDifferenceReasonCode, DebtorDoubtfulIndicatorLastChangeDate, and WriteOffDeductionIndicator. The UUID can be a GDT of type UUID. The CompanyID can be a GDT of type OrganisationalCentreID. The CompanyUUID can be a GDT of type UUID. The BusinessPartnerInternalID can be a GDT of type BusinessPartnerInternalID. The BusinessPartnerUUID can be a GDT of type UUID. The PartyRoleCategoryCode can be a GDT of type PartyRoleCategoryCode with possible constraints that 3=Creditor Party, 4=Debtor Party. The LastDunningUUID can be a GDT of type UUID. The LastDunningDate can be a GDT of type Date. In some implementations, the LastDunningDate has a Dunning qualifier. The LastDunningLevelValue can be a GDT of type DunningLevelValue. The DunningBlockedIndicator can be a GDT of type BusinessTransactionBlockedIndicator. The DunningBlockingReasonCode can be a GDT of type DunningBlockingReasonCode. The DunningBlockingExpirationDate can be a GDT of type Date. In some implementations, the DunningBlockingExpirationDate has an Expiration qualifier. The DunningProcedureCode can be a GDT of type DunningProcedureCode. The TradeReceivablesPayablesRegisterGroupingCriterionCode can be a GDT of type TradeReceivablesPayablesRegisterGroupingCriterionCode. The DuePaymentStrategyCode can be a GDT of type DuePaymentStrategyCode. The DueClearingStrategyCode can be a GDT of type DueClearingStrategyCode. The LastPaymentDate can be a GDT of type Date. In some implementations, the LastPaymentDate has a Payment qualifier. The LastBalanceConfirmationCreationDate can be a GDT of type Date. In some implementations, the LastBalanceConfirmationCreationDate has a Creation qualifier. The LastBalanceConfirmationKeyDate can be a GDT of type Date. In some implementations, the LastBalanceConfirmationKeyDate has a Key qualifier. The BalanceConfirmationReturnLetterDueDate can be a GDT of type Date. In some implementations, the BalanceConfirmationReturnLetterDueDate has a Due qualifier. The OffsettingIndicator can be a GDT of type Indicator. In some implementations, the OffsettingIndicator has an Offsetting qualifier. The DebtorDoubtfulIndicator can be a GDT of type Indicator. In some implementations, the DebtorDoubtfulIndicator has a Doubtful qualifier. The ExpectedPaymentAmount can be a GDT of type Amount. In some implementations, the ExpectedPaymentAmount has a Payment qualifier. The ExpectedPaymentPercent can be a GDT of type Percent. In some implementations, the ExpectedPaymentPercent has a Payment qualifier. The ExpectedPaymentLastCreationDate can be a GDT of type Date. In some implementations, the ExpectedPaymentLastCreationDate has a Creation qualifier. The PaymentDifferenceReasonCode can be a GDT of type PaymentDifferenceReasonCode. The DebtorDoubtfulIndicatorLastChangeDate can be a GDT of type Date. In some implementations, the DebtorDoubtfulIndicatorLastChangeDate has a Change qualifier. The WriteOffDeductionIndicator can be a GDT of type Indicator. In some implementations, the WriteOffDeductionIndicator has a Deduction qualifier. The AccessControlList can be a list of access groups that have access to a TradeReceivablesPayablesAccount during a validity period.

TradeReceivablesPayablesAccountStatement Business Object

FIG. 49 illustrates one example of an TradeReceivablesPayablesAccountStatement business object model 49000. Specifically, this figure depicts interactions among various hierarchical components of the TradeReceivablesPayablesAccountStatement, as well as external components that interact with the TradeReceivablesPayablesAccountStatement (shown here as 49002 through 49014 and 49024 through 49034).

A list of the increases or decreases to trade receivables or payables of a company from or to a business partner within a certain time period. The TradeReceivablesPayablesAccountStatement business object is part of the DueItemProcessing process component. The list can be output as a formatted form. The TradeReceivablesPayablesAccountStatement contains trade receivables or payables of a company from or to a business partner for each business transaction and the opening balances and totals for each currency.

TradeReceivablesPayablesAccountStatement is represented by the TradeReceivablesPayablesAccountStatement node 49016.

Service Interfaces

The TradeReceivablesPayablesAccountStatement business object is involved in the following process component interaction models: Due Item Processing_Due Item Processing At Business Partner.

Service Interface Trade Receivables Payables Account Statement Out. The Trade Receivables Payables Account Statement Out service interface is part of the following process component integration models: Due Item Processing_ Due Item Processing At Business Partner. The Trade Receivables Payables Account Statement Out service interface contains the operation that sends the list to the business partner.

The NotifyOfTadeReceivablesPayablesAccountStatement operation sends the list to the business partner. The operation is based on the FormTradeReceivablesPayablesAccountStatementNotification message type (i.e., derived from the TradeReceivablesPayablesAccountStatement business object).

Node Structure of the TradeReceivablesPayablesAccountStatement Business Object

TradeReceivablesPayablesAccountStatement is a list of the increases or decreases to trade receivables or payables of a company from or to a business partner within a certain time period. The elements located directly at the TradeReceivablesPayablesAccountStatement node are defined by the TradeReceivablesPayablesAccountStatementElements data type. In certain implementations, these elements include: UUID, SystemAdministrativeData, TradeReceivablesPayablesAccountStatementCreationRunExecutionUUID, CompanyID, CompanyUUID, BusinessPartnerInternalID, BusinessPartnerUUID, TradeReceivablesPayablesAccountUUID, ReportingDatePeriod, KeyDate, ReturnLetterDueDate, DocumentDate, ReturnLetterBusinessPartnerInternalId, CompanyContactPersonPartyID, ReleasedIndicator, PrintRequiredIndicator, and TradeReceivablesPayablesAccountBalanceConfirmationProcedureCode.

UUID is an universal identifier, which can be unique, of the list of increases and decreases of trade receivables or payables of a company from or to a business partner. The UUID may be based on GDT UUID.

SystemAdministrativeData is Administrative data that is stored in a system. This data includes system users and change dates/times. The SystemAdministrativeData may be based on GDT SystemAdministrativeData.

TradeReceivablesPayablesAccountStatementCreationRunExecutionUUID is universal identifier, which an be unique, of the execution of the MDRO that has generated this business object, and is optional. The TradeReceivablesPayablesAccountStatementCreationRunExecutionUUID may be based on GDT UUID.

CompanyID is an identifier, which can be unique, of the company to which these trade receivables/payables belong, and is optional. CompanyID may be based on GDT OrganisationalCentreID.

CompanyUUID is an universal identifier, which can be unique, of the company to which these trade receivables/payables belong, and is optional. The CompanyUUID may be based on GDT UUID.

BusinessPartnerInternalID is an identifier, which can be unique, of the business partner to which these trade receivables/payables belong, and is optional. The BusinessPartnerInternalID may be based on GDT BusinessPartnerInternalID.

BusinessPartnerUUID is an universal identifier, which can be unique, of the business partner to which these trade receivables/payables belong, and is optional. The BusinessPartnerUUID may be based on GDT UUID.

TradeReceivablesPayablesAccountUUID is an universal identifier, which can be unique, of the business account. The TradeReceivablesPayablesAccountUUID may be based on GDT UUID.

ReportingDatePeriod is the time period in which the increases/decreases of receivables or payables were generated, and is optional. The ReportingDatePeriod may be based on GDT DatePeriod, Qualifier Reporting.

KeyDate is the Key date for which the list is created. It contains the items that were not yet created on the key date, and is optional. The KeyDate may be based on GDT Date, Qualifier Key.

ReturnLetterDueDate is the due date of the business partner's reply who has received the list, and is optional. The ReturnLetterDueDate may be based on GDT Date, Qualifier Due.

DocumentDate is the date on which the TradeReceivablesPayablesAccountStatement is created, and is optional. The DocumentDate may be based on GDT Date, Qualifier Document.

ReturnLetterBusinessPartnerInternalId is an identifier, which can be unique, of the business partner to whom the reply should be addressed, and is optional. The ReturnLetterBusinessPartnerInternalId may be based on GDT BusinessPartnerInternalID.

CompanyContactPersonPartyID is an identifier, which can be unique, of the contact person for the list, and is optional. The CompanyContactPersonPartyID may be based on GDT ContactPersonPartyID.

ReleasedIndicator is the indicator that can specify whether the list was released, and is optional. The ReleasedIndicator may be based on GDT Indicator, Qualifier Released.

PrintRequiredIndicator is the indicator that can specify whether the print should be performed, and is optional. The PrintRequiredIndicator may be based on GDT Indicator, Qualifier Required.

TradeReceivablesPayablesAccountBalanceConfirmationProcedureCode is the coded representation of the procedure that confirms the list. The TradeReceivablesPayablesAccountBalanceConfirmationProcedureCode may be based on GDT TradeReceivablesPayablesAccountBalanceConfirmationProcedureCode.

The following composition relationships with subordinate nodes are available:

ControlledOutputRequest 49022 has a cardinality relationship of 1:c.

StartEndBalancePerCurrency 49018 has a cardinality relationship of 1:cn.

Inbound Aggregation Relationships include:

From business object TradeReceivablesPayablesAccount/node TradeReceivablesPayablesAccount TradeReceivablesPayablesAccount has a cardinality relationship of 1:cn. The TradeReceivablesPayablesAccount for which the due receivables/payables listed in the statement exist. The TradeReceivablesPayablesAccount is used also for access control to a TradeReceivablesPayablesAccountStatement.

From business object Company/node Company:

Company has a cardinality relationship of 1:cn, and is the company to which the due receivables/payables listed in the statement belong.

From business object BusinessPartner/node BusinessPartner:

BusinessPartner has a cardinality relationship of 1:cn, and is the business partner for which the due receivables/payables listed in the statement exist.

From business object TradeReceivablesPayablesAccountStatementCreationRun/node Execution:

TradeReceivablesPayablesAccountStatementCreationRunExecution has a cardinality relationship of c:cn, and is the execution of the TradeReceivablesPayablesAccountStatementCreationRun MDRO that has generated this business object.

From business object Identity/node Root:

CreationIdentity has a cardinality relationship of 1:cn, and is the identity that created the Trade Receivables Payables Account Statement.

LastChangeIdentity has a cardinality relationship of c:cn, and is the identity that changed the Trade Receivables Payables Statement in the last time.

Propose reads the increases and decreases of trade receivables or payables of the company from or to the business partners from the TradeReceivablesPayablesRegister business object and can generate the entries of the list of receivables and payables from it. This action can include: Changes to the object: The business object is filled with parameters according to increases/decreases of receivables and payables.

Release releases the TradeReceivablesPayablesAccountStatement for use and prints it. This action can include: Changes to the object: ReleasedIndicator and PrintRequiredIndicator are filled with "true".

CreateWithReference can generate TradeReceivablesPayablesAccountStatements and then calls the actions Propose and Release. This action can include: Changes to the object: New business objects filled with the parameters according to increases/decreases of receivables and payables and Parameters: The action elements are defined by the data type: TradeReceivablesPayablesAccountStatementCreateWithReferenceActionElements. In certain implementations, these elements include: CompanyID, CompanyUUID, BusinessPartnerInternalID, BusinessPartnerUUID, TradeReceivablesPayablesAccountUUID, DatePeriod, KeyDate, ReturnLetterDueDate, ReturnLetterBusinessPartnerInternalId, CompanyContactPersonPartyID, ReleasedIndicator, PrintRequiredIndicator, and TradeReceivablesPayablesAccountBalanceConfirmationProcedureCode.

CompanyID is optional and may be based on GDT OrganisationalCentreID. CompanyUUID is optional and may be based on GDT UUID. BusinessPartnerInternalID is optional and may be based on GDT BusinessPartnerInternalID. BusinessPartnerUUID is optional and may be based on GDT UUID. TradeReceivablesPayablesAccountUUID may be based on GDT UUID. DatePeriod is optional and may be based on GDT DatePeriod. KeyDate is optional and may be based on GDT Date, Qualifier Key. ReturnLetterDueDate is optional and may be based on GDT Date, Qualifier Due. ReturnLetterBusinessPartnerInternalId is optional and may be based on GDT BusinessPartnerInternalID. CompanyContactPersonPartyID is optional and may be based on GDT ContactPersonPartyID. ReleasedIndicator is optional and may be based on GDT Indicator, Qualifier Released. PrintRequiredIndicator is optional and may be based on GDT Indicator, Qualifier Required. TradeReceivablesPayablesAccountBalanceConfirmationProcedureCode may be based on GDT TradeReceivablesPayablesAccountBalanceConfirmationProcedureCode. This action may be performed by the UI and the TradeReceivablesPayablesAccountStatementRun business object.

QueryByElements provides a list of the TradeReceivablesPayablesAccountStatements that correspond to different ones of its attributes. All attributes may be optional. The query elements are defined by the TradeReceivablesPayablesAccountStatementElementsQueryElements data type. These elements include CompanyID, CompanyUUID, BusinessPartnerInternalID, BusinessPartnerUUID, TradeReceivablesPayablesAccountUUID, and TradeReceivablesPayablesAccountBalanceConfirmationProcedureCode. CompanyID is of GDT type OrganisationalCentreID, and is optional. CompanyUUID is of GDT type UUID, and is optional. BusinessPartnerInternalID is of GDT type BusinessPartnerInternalID, and is optional. BusinessPartnerUUID is of GDT type UUID, and is optional. TradeReceivablesPayablesAccountUUID is of GDT type UUID, and is optional. TradeReceivablesPayablesAccountBalanceConfirmationProcedureCode is of GDT type TradeReceivablesPayablesAccountBalanceConfirmationProcedureCode, and is optional.

DO: ControlledOutputRequest

Controller of output requests and output history entries related to the TradeReceivablesPayablesAccountStatement and is defined in the dependent object Controlled Output Request.

StartEndBalancePerCurrency

Is the opening and closing balance of receivables and payables of the period in one currency. The elements located directly at the StartEndBalancePerCurrency node are defined by the TradeReceivablesPayablesAccountStatementStartEndBalancePerCurrencyElements data type. In certain implementations, these elements include: TransactionCurrencyCode, StartTransactionCurrencyAmount, and EndTransactionCurrencyAmount.

TransactionCurrencyCode is the currency of the due receivable/payable (i.e., original currency of the underlying business document). The TransactionCurrencyCode may be based on GDT CurrencyCode, Qualifier: Transaction. Integrity condition: The currencies of all following amounts can not differ from the transaction currency specified.

StartTransactionCurrencyAmount is the total amount of the receivables and payables at the beginning of the time period on which the TradeReceivablesPayablesAccountStatement is based, is an optional. The StartTransactionCurrencyAmount may be based GDT Amount, Qualifier: TransactionCurrency.

EndTransactionCurrencyAmount is the total amount of the receivables and payables at the end of the time period on which the TradeReceivablesPayablesAccountStatement is based, and is optional.

The EndTransactionCurrencyAmount may be based on GDT Amount, Qualifier: TransactionCurrency.

Integrity condition: This is the total from TransactionCurrencyStartAmount and the amounts of the Items.

The following composition relationship with subordinate nodes is available: Item 49020, which has a cardinality relationship of 1:cn.

Trade receivables and payables from or to a business partner. The elements located directly at the StartEndBalancePerCurrencyItem node are defined by the TradeReceivablesPayablesAccountStatementStartEndBalancePerCurrencyItem Elements data type. In certain implementations, these elements include: TransactionCurrencyCode, TransactionCurrencyAmount, BaseBusinessTransactionDocumentReference, PartnerBaseBusinessTransactionDocumentReference, TradeReceivablesPayablesRegisterItemClearingStatusCode, BaseBusinessTransactionDocumentDate, TradeReceivablesPayablesRegisterItemTypeCode, TransactionCurrencyOpenItemAmount, TransactionCurrencyCashDiscountAmount, TransactionCurrencyDeductionAmount, and FullPaymentEndDate.

TransactionCurrencyCode is the currency of the due receivable/payable (i.e., original currency of the underlying business document). The TransactionCurrencyCode can be based on GDT CurrencyCode, Qualifier Transaction.

TransactionCurrencyAmount is the amount of this due trade receivable/payable. The TransactionCurrencyAmount may be based on GDT Amount, Qualifier TransactionCurrency. The currencies of TransactionCurrencyAmount may not differ from the transaction currency specified.

BaseBusinessTransactionDocumentReference is the reference to the business document on which this Business Item is based or its items (such as reference to Supplier Invoice). The BaseBusinessTransactionDocumentReference may be based on GDT BusinessTransactionDocumentReference.

PartnerBaseBusinessTransactionDocumentReference is the reference to the business document assigned by the business partner on which the item is based. For example, the identifier for the SupplierInvoice assigned by the Supplier), and is optional. The PartnerBaseBusinessTransactionDocumentReference may be based on GDT BusinessTransactionDocumentReference.

TradeReceivablesPayablesRegisterItemClearingStatusCode can specify whether the increases/decreases of receivables or payables have been completely or partially cleared or have not been cleared. The TradeReceivablesPayablesRegisterItemClearingStatusCode may be based on GDT ClearingStatusCode.

BaseBusinessTransactionDocumentDate An Issue date of the business document on which the item is based. The BaseBusinessTransactionDocumentDate may be based on GDT Date, Qualifier: BusinessTransactionDocument.

TradeReceivablesPayablesRegisterItemTypeCode is a coded representation of the type of receivable or payable. The TradeReceivablesPayablesRegisterItemTypeCode may be based on GDT TradeReceivablesPayablesRegisterItemTypeCode.

TransactionCurrencyOpenItemAmount is the amount of the not cleared part of the trade receivable/payable. The TransactionCurrencyOpenItemAmount may be based on GDT Amount, Qualifier OpenItem.

TransactionCurrencyCashDiscountAmount is the claimed cash discount amount when paying the trade receivable/payable, and is optional. The TransactionCurrencyCashDiscountAmount may be based on GDT Amount, Qualifier CashDiscount.

TransactionCurrencyDeductionAmount is the claimed-Claimed deduction amount when paying the trade receivable/payable, and is optional. The TransactionCurrencyDeductionAmount may be based on GDT Amount, Qualifier Deduction.

FullPaymentEndDate is the end date on which the full payment can be made at the latest, and is optional. The FullPaymentEndDate may be based on GDT Date, Qualifier End.

Inbound Aggregation Relationships from business object TradeReceivablesPayablesRegister/node Item:

TradeReceivablesPayablesRegisterItem has a cardinality relationship of 1:cn, and is the base TradeReceivablesPayablesRegisterItem.

Message Types and their Signatures

FIG. 50-1 through 50-14 illustrates one example logical configuration of FormTradeReceivablesPay-ablesAccountStatementNotification message 50000. Specifically, this figure depicts the arrangement and hierarchy of various components such as one or more levels of packages, entities, and datatypes, shown here as 50000 through 50264. As described above, packages may be used to represent hierarchy levels. Entities are discrete business elements that are used during a business transaction. Data types are used to type object entities and interfaces with a structure. For example, FormTradeReceivable-sPayablesAccountStatementNotification message 50000 includes, among other things, TradesReceivablesPayablesAccountStatement 50014. Accordingly, heterogeneous applications may communicate using this consistent message configured as such.

This section describes the message types and their signatures that are derived from the operations of the business object TradeReceivablesPayablesAccountStatement. In a signature, the business object is con-tained as a “leading” business object. The message data type can determine the structure of the following message types.

Motivating Business Scenarios

A company has to deliver an account statement regularly containing trade receivables/payables from goods and services of the company from and to a business partner. The printout may be formatted ac-cording to the company’s needs and legal requirements.

Message Type(s)

The FormTradeReceivablesPayablesAccountStatementNotification is a request to print out an account statement. The structure of this message type is determined by the message data type FormTradeRe-ceivablesPayablesAccountStatementMessage. This message type is used in the following operations of business objects: TradeReceivablesPayablesAccountStatement, and NotifyOfTradeReceivablesPayablesAccountStatement FormTradeReceivablesPayablesAccountStatementMessage In certain implementations, the FormTradeReceivablesPayablesAccountStatementMessage may contain the following: The object FormTradeReceivablesPayablesAccountStatementNotification that is contained in the business document, and the business information that is relevant for sending a business document in a message. It may also contain the following packages: MessageHeader package, and FormTradeReceivablesPayablesAccountStatementPackage. It may also provide the structure for the following mes-sage types and the operations that they are based on. This message may be based on FormTradeReceivablesPayablesAccountStatementNotification.

MessageHeader Package

The MessageHeader Package is a grouping of business information that is relevant for sending a busi-ness document in a message. It may also contain the following entity:

MessageHeader

The MessageHeader is a grouping of business information from the perspective of the sending applica-tion. It may contain the following applications: Information to identify the business document in a mes-sage, Information about the sender, and Information about the recipient, and is optional. The Message-Header may also contain the following: SenderParty, and RecipientParty. The MessageHeader may be based on GDT: BusinessDocumentMessageHeader. In certain implementations, the following elements of the GDT are used: ID and ReferenceID.

The SenderParty is the partner responsible for sending a business document at business application level. SenderParty may be based on GDT BusinessDocumentMessageHeaderParty.

The RecipientParty is the partner responsible for receiving a business document at business application level. The RecipientParty may be based on GDT: BusinessDocumentMessageHeaderParty.

The TradeReceivablesPayablesAccountStatement Package is a grouping of TradeReceivablesPayable-sAccountStatement. It may also contain the following package: StartEndBalancePerCurrency The FormTradeReceivablesPayablesAccountStatement may be based on TradeReceivablesPayablesAc-countStatement, node Root.

FormTradeReceivablesPayablesAccountStatement contains the elements:

CompanyID has a cardinality relationship of 0..1 and is the identifier of the company and may be based on GDT: OrganisationalCentreID. CompanyFormattedAddress has a cardinality relationship of 0..1, may be the formatted address of the company, and may be based upon GDT: FormattedAddress. Company-ContactPersonPartyID has a cardinality relationship of 0..1, may be the unique identifier of the company contact person, and may be based upon GDT: ContactPersonPartyID. CompanyContactPersonFormat-tedAddress has a cardinality relationship of 0..1, may be the formatted address of the company contact person, and may be based on GDT: FormattedAddress. has a cardinality relationship of 0..1, may be the email address of the company contact person, and may be based on GDT: EMailURI. BusinessPartner-InternalID has a cardinality relationship of 0..1, may be the unique identifier of the business partner in-volved, and may be based on GDT: BusinessPartnerInternalID. BusinessPartnerFormattedAddress has a cardinality relationship of 0..1, may be the formatted address of the business partner, and may be based on GDT: FormattedAddress. ReportingDatePeriod has a cardinality relationship of 0..1, may be the date period of the account statements, and may be GDT: DatePeriod. KeyDate has a cardinality relationship of 0..1, may be the key date of the account statement, and may be based on GDT: Date, Qualifier: Key. ReturnLetterDueDate has a cardinality relationship of 0..1, may be the date when the return letter from the business partner who will be receiving the statement is due, and may be based on GDT: Date, Quali-fier: Due. DocumentDate has a cardinality relationship of 0..1, may be the date to be displayed on the account statement, and may be based on GDT: Date. ReturnLetterBusinessPartnerInternalID has a car-dinality relationship of 0..1, may be the ID of the Business Partner to whom the return letter is to be ad-dressed (i.e., this business partner might be an auditor), and may be based on GDT: BusinessPartner-InternalID. ReturnLetterBusinessPartnerFormattedAddress has a cardinality relationship of 0..1, may be the formatted address of the Business Partner to whom the return letter is to be addressed (i.e., this business partner might be an auditor), and may be based on GDT: FormattedAddress. TradeReceivablesPayablesAccountBalanceConfirmationProcedureCode has a cardinality relationship of 1, may be the coded representation of the confirmation procedure used for this statement, and may be based on GDT: TradeReceivablesPayablesAccountBalanceConfirmationProcedureCode. TradeReceivablesPayablesAc-countBalanceConfirmationProcedureName has a cardinality relationship of 0..1, may be the name of the coded representation of the confirmation procedure used for this statement, and may be based on GDT: Name.

The StartEndBalancePerCurrency Package is a grouping of StartEndBalancePerCurrency. It may also contain the StartEndBalancePerCurrencyItemPackage package. The inventory of receivables and pay-ables at the beginning and the end of the period in a currency.

A StartEndBalancePerCurrency contains the elements: TransactionCurrencyCode has a cardinality rela-tionship of 1, may be the currency of the amount of the items included in this balance, and may be based on GDT: CurrencyCode, Qualifier: Transaction. StartTransactionCurrencyAmount has a cardinality rela-tionship of 0..1, may be the starting balance amount of the items, and may be based on GDT: Amount, Qualifier: Currency. EndTransactionCurrencyAmount has a cardinality relationship of 0..1, may be the ending balance amount of the items, and may be based on GDT: Amount, Qualifier: Currency.

A StartEndBalancePerCurrencyItem is a trade receivable or payable from an underlying business trans-action. A StartEndBalancePerCurrency contains the elements:

BaseBusinessTransactionDocumentReference has a cardinality relationship of 1, may be the reference to the business document on which this balance item is based or its items (i.e., such as reference to Sup-plier Invoice), and may be based on GDT: BusinessTransactionDocumentReference. BaseBusinessTransactionDocumentReferenceTypeCodeName has a cardinality relationship of 0..1, may be the name of the type of the referenced business document on which this balance item is based or its items (i.e., such as reference to Supplier Invoice), and may be based on GDT: Name. PartnerBaseBusinessTrans-actionDocumentReference has a cardinality relationship of 0..1, may be the reference to the business document assigned by the business partner on which this balance item is based, and may be based on GDT: BusinessTransactionDocumentReference. OriginInvoiceBusinessTransactionDocumentReference has a cardinality relationship of 0..1, may be the reference to an existing SupplierInvoice or CustomerIn-voice to which the business document (or source document) based on the current item is a follow-on document, and may be based on GDT: BusinessTransactionDocumentReference. In some implementations, only the SupplierInvoice and CustomerInvoice TypeCodes may be used in the Type Code attribute. OriginOrderBusinessTransactionDocumentReference has a cardinality relationship of 0..1, may be the reference to an existing SalesOrder or PurchaseOrder to which the business document (or source docu-ment) based on the current item is a follow-on document, and may be based on GDT: BusinessTransac-tionDocumentReference. In some implementations, only the SalesOrder and PurchaseOrder TypeCodes are used in the Type Code attribute. OriginContractBusinessTransactionDocumentReference has a car-dinality relationship of 0..1, may be the reference to an existing SalesContract or PurchasingContract to which the business document (or source document) based on the current item is a follow-on document, and may be based on GDT: BusinessTransactionDocumentReference. In some implementations, only the SalesContract and PurchasingContract codes may be used in the Type Code attribute.

BaseBusinessTransactionDocumentDate has a cardinality relationship of 1, may be the issue date of the business document on which the item is based, and may be based on GDT: Date, Qualifier: Business-TransactionDocument. TradeReceivablesPayablesRegisterItemClearingStatusCode has a cardinality relationship of 1, may be the coded representation of the clearing status of the TradeReceivablesPay-ablesRegisterItem that specifies whether it has been completely or partially cleared, and may be based on GDT: ClearingStatusCode. TradeReceivablesPayablesRegisterItemClearingStatusCodeName has a cardinality relationship of 0..1, may be the name of the coded representation of the clearing status of the TradeReceivablesPayablesRegisterItem that specifies whether it has been completely or partially cleared, and may be based on GDT: Name. TradeReceivablesPayablesRegisterItemTypeCode has a cardinality relationship of 1, may be the coded representation of the type of the item, and may be based on GDT: TradeReceivablesPayablesRegisterItemTypeCode. TradeReceivablesPayablesRegisterItemTypeCode-Name has a cardinality relationship of 0..1, may be the name of the coded representation of the type of the item, and may be based on GDT: Name. DunningLevelValue has a cardinality relationship of 0..1, may be the current dunning level of the item, and may be based on GDT: DunningLevelValue. LastDun-ningDate has a cardinality relationship of 0..1, may be the date of the last dunning for this item, and may be based on GDT: Date, Qualifier: Dunning. FullPaymentEndDate has a cardinality relationship of 0..1, may be the end date on which the full payment can be made at the latest, and may be based on GDT: Date, Qualifier: End. CashDiscountTerms has a cardinality relationship of 0..1, may be the modality agreed for the payment of this item regarding scaled payment deadlines and the cash discount deductions allowed if this item is paid on the requested date, and may be based on GDT: CashDiscountTerms. TransactionCurrencyCode has a cardinality relationship of 1, may be the currency of this item, and may be based on GDT: CurrencyCode, Qualifier: Transaction. TransactionCurrencyAmount has a cardinality relationship of 1, and may be the amount of this item, and may be based on GDT: Amount, Qualifier: TransactionCurrency. TransactionCurrencyOpenItemAmount has a cardinality relationship of 1, may be the amount of the not cleared part of the item in transaction currency, and may be based on GDT: Amount, Qualifier: OpenItem. TransactionCurrencyCashDiscountAmount has a cardinality relationship of 0..1, may be the claimed cash discount amount when paying the item, and may be based on GDT: Amount, Qualifier: CashDiscount. TransactionCurrencyDeductionAmount has a cardinality relationship of 0..1, may be the claimed deduction amount when paying the item, and may be based on GDT: Amount, Qualifier: Deduction.

TradeReceivablesPayablesRegister Business Object

Figures 1, 51:
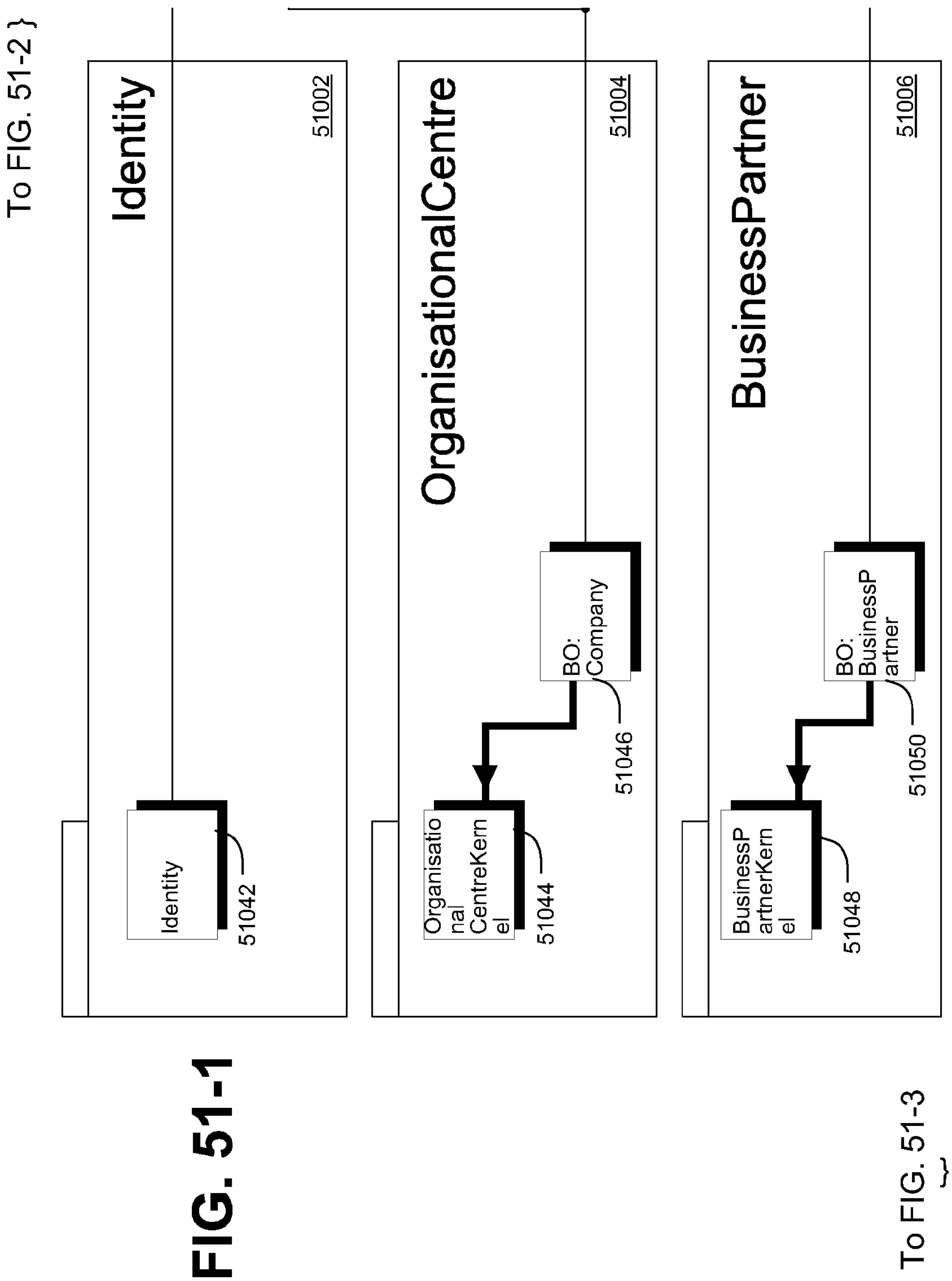
Figures 2, 51:
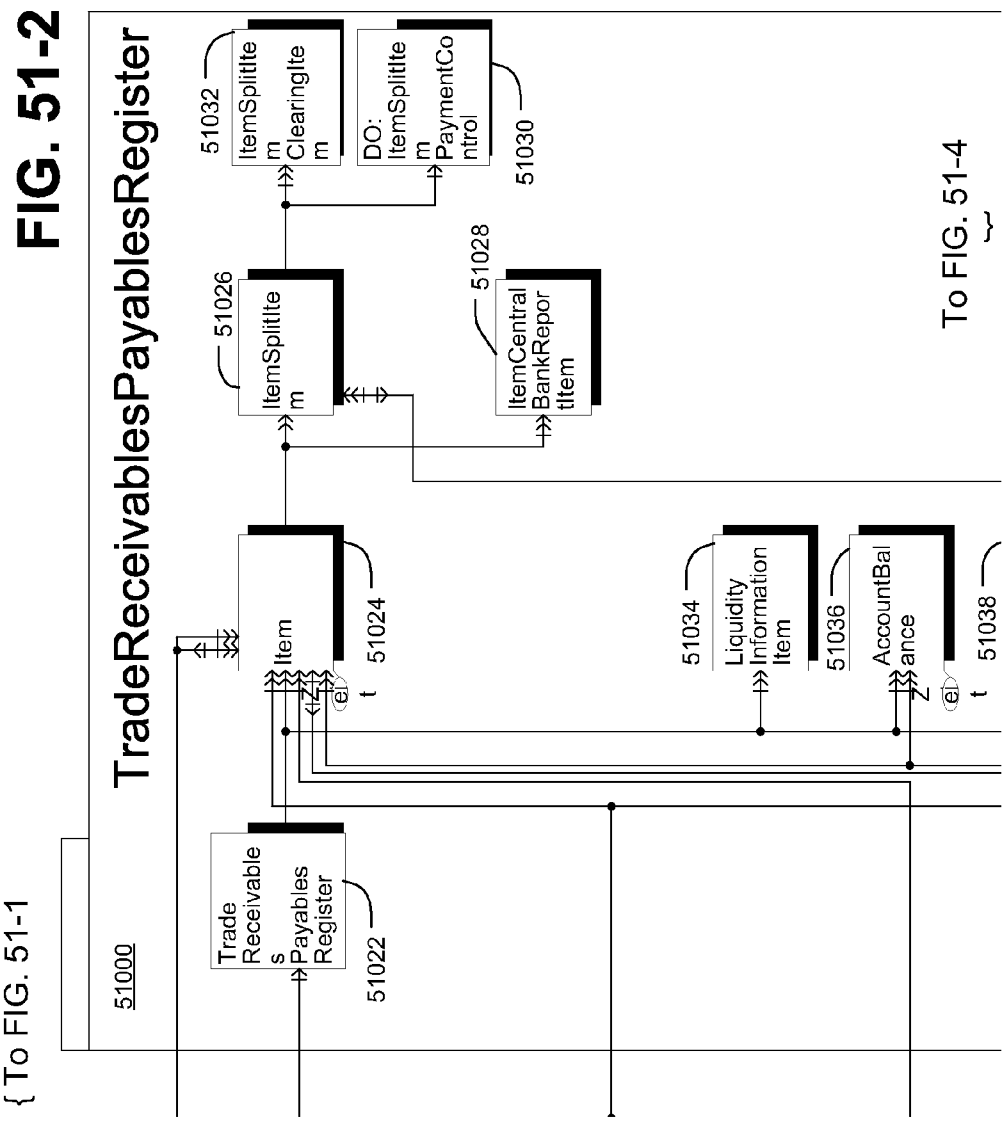
Figures 3, 51:
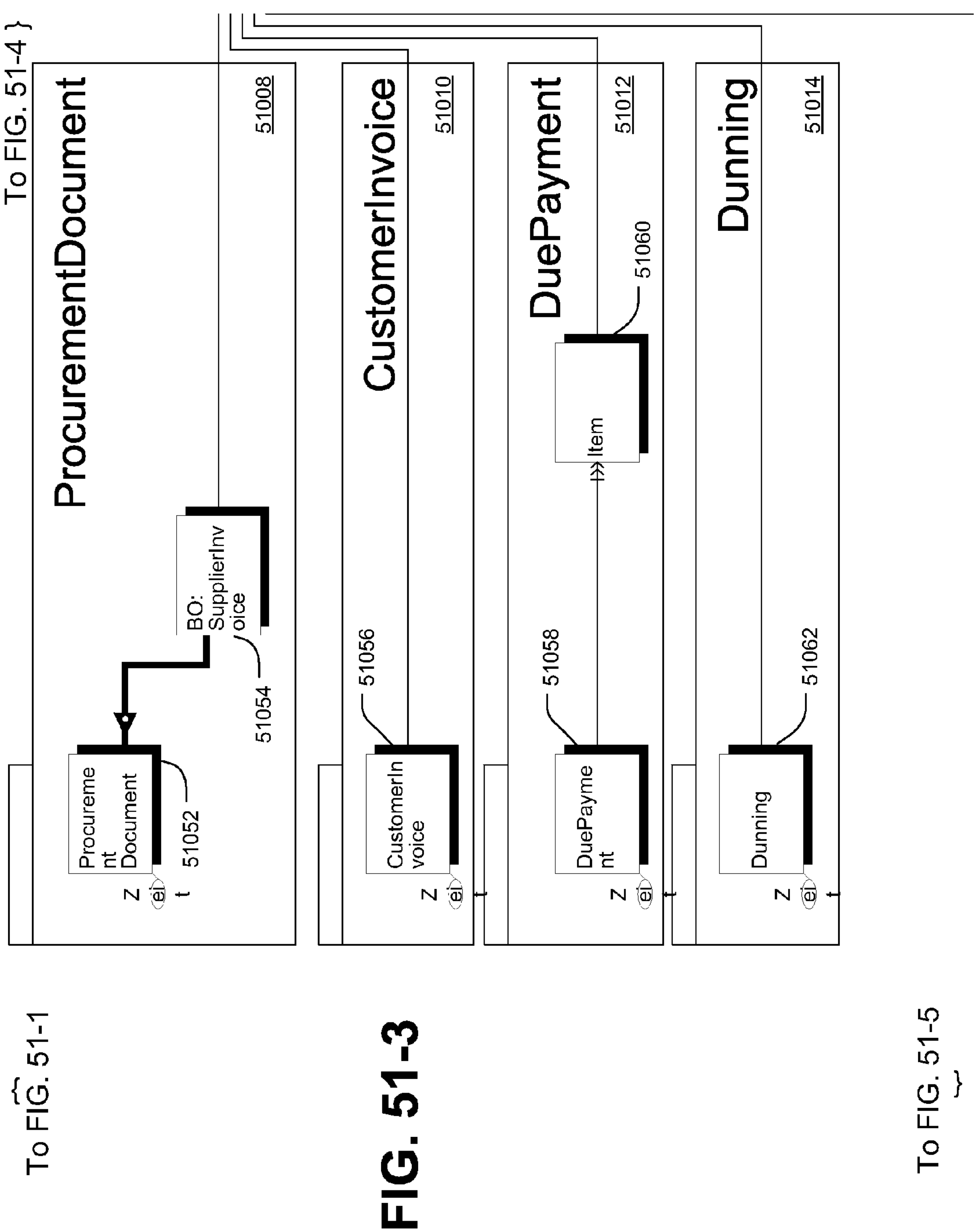
Figures 4, 51:
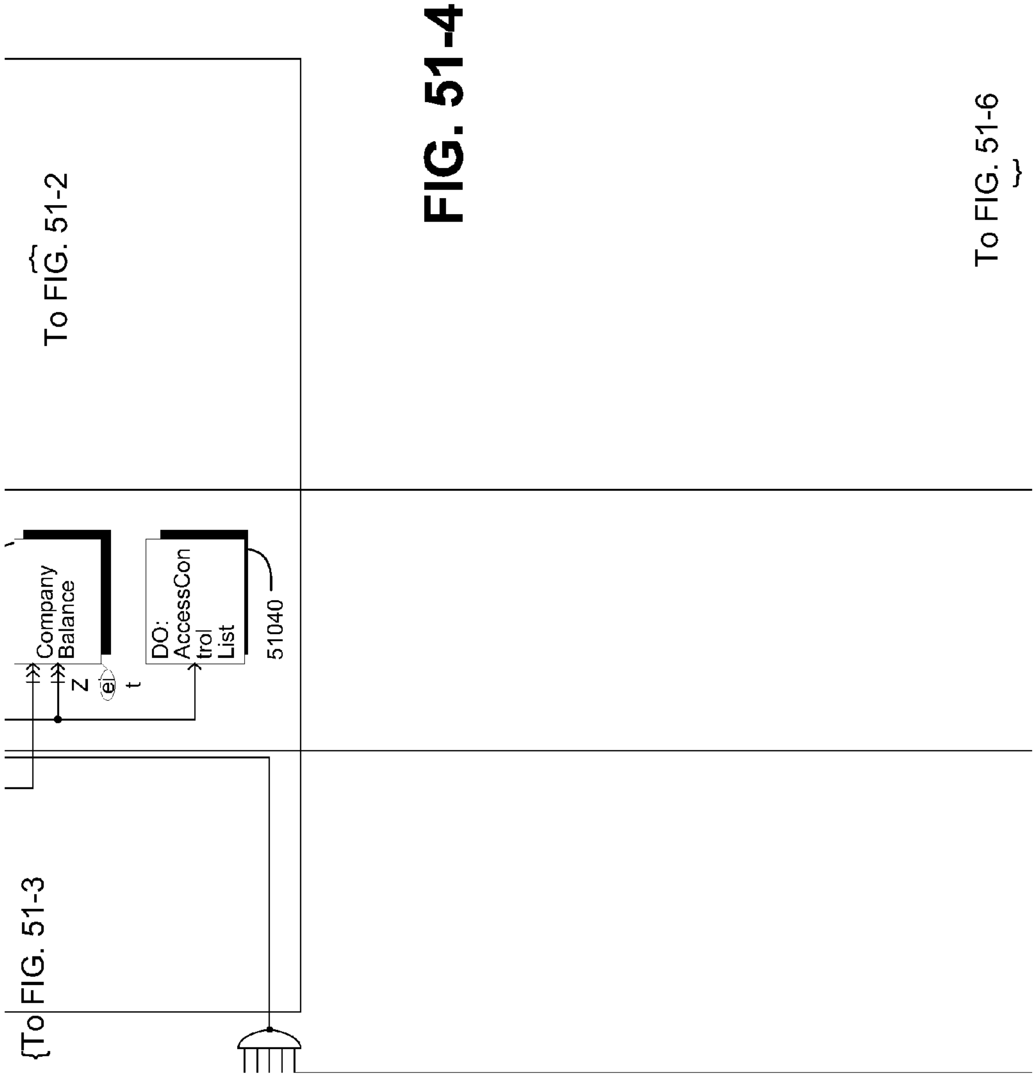
Figures 5, 51:
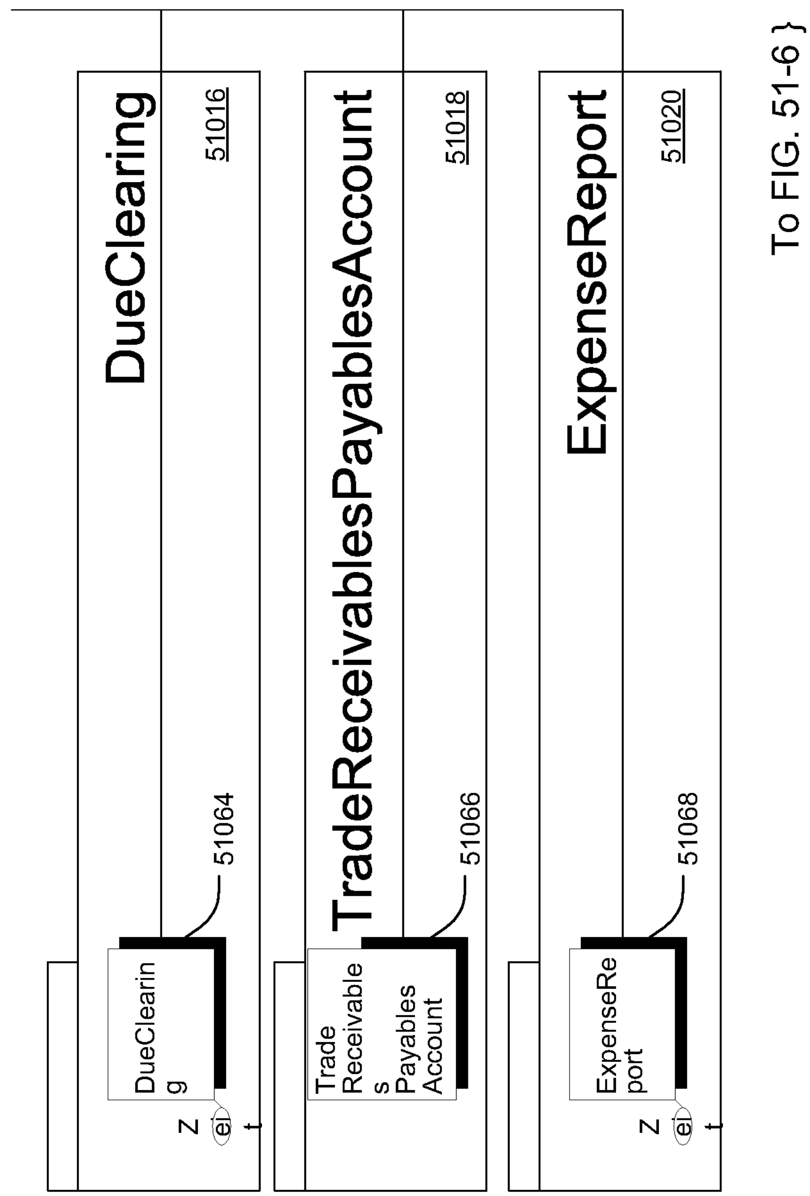
Figures 6, 51:
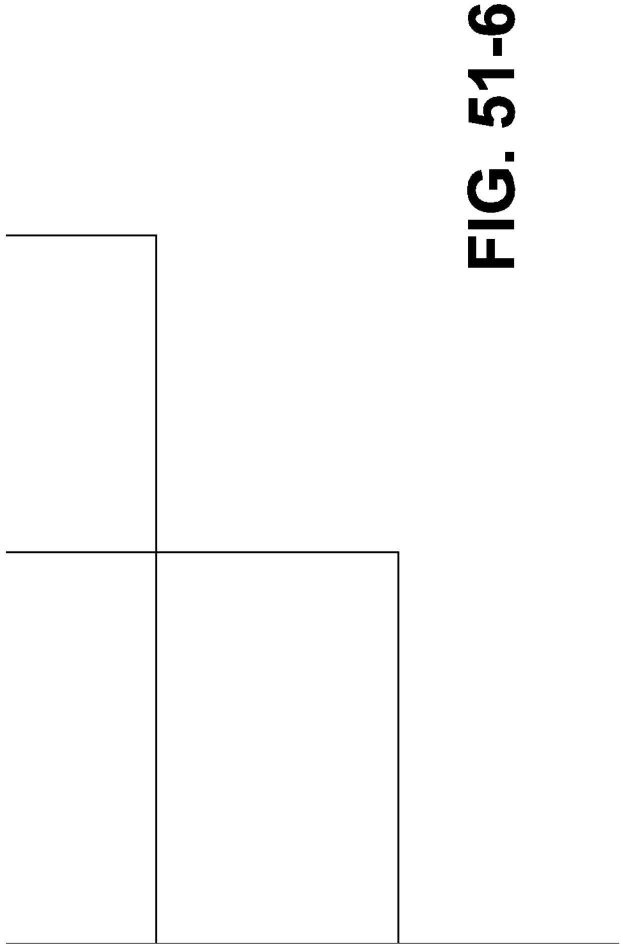

FIGS. 51-1 through 51-5 illustrate an example TradeReceivablesPayablesRegister business object model 51000. Specifically, this model depicts interactions among various hierarchical components of the TradeReceivablesPayablesRegister, as well as external components that interact with the TradeReceivablesPayablesRegister (shown here as 51002 through 51020 and 51042 through 51068).

The Business Object TradeReceivablesPayablesRegister represents trade receivables/payables from goods and services of a company from/to its business partners. In the following, trade receivables/payables from goods and services will be referred to as trade receivables/payables. The TradeReceivablesPayablesRegister business object is part of the Due Item Processing process component. The TradeReceivablesPayablesRegister contains the trade receivables and payables of a company for each business transaction and the totals for trade receivables and payables per company and business partner.

The TradeReceivablesPayablesRegister business object 51022 is involved in the following Process Integration Models: Customer Invoice Processing_Due Item Processing, Supplier Invoice Processing_Due Item Processing, Expense and Reimbursement Processing_Due Item Processing, and Cash Management_Due Item Processing.

The DueItemProcessingReceivablesPayablesIn is the Receivables Payables In service interface and is part of the following Process Integration Models: Customer Invoice Processing_Due Item Processing, Supplier Invoice Processing_Due Item Processing, and Expense and Reimbursement Management_Due Item Processing The DueItemProcessingReceivablesPayablesIn groups the operations that inform DueItemProcessing about trade receivables or payables of a company from or to a business partner due to a service received or provided within a contract or from or to a tax office due to an event defined by law. The information comes from SupplierInvoiceProcessing, CustomerInvoiceProcessing and ExpenseAndReimbursementManagement.

The DueItemProcessingReceivablesPayablesIn.CreateReceivablesPayables create a trade and/or tax receivables or payables register item. The operation is based on the ReceivablesPayablesNotification message type derived from the TradeReceivablesPayablesRegister and TaxReceivablesPayablesRegister business objects.

The DueItemProcessingReceivablesPayablesIn.CancelReceivablesPayables cancel a trade and/or tax receivables or payables register item. The operation is based on the CancellationReceivablesPayablesNotification message type derived from the TradeReceivablesPayablesRegister and TaxReceivablesPayablesRegister business objects.

The DueItemProcessingLiquidityInformationIn is the Liquidity Information In service interface is part of the following Process Integration Models: Cash Management_Due Item Processing. The DueItemProcessingLiquidityInformationIn interface to request and receive data for the liquidity forecast.

The DueItemProcessingLiquidityInformationIn.QueryLiquidityInformation is the synchronous operation to send the query and accept the liquidity items delivered by DueItemManagement. The operation is based on the LiquidityInformationQuery and LiquidityInformationResponse message types (derived from the LiquidityForecast TradeReceivablesPayablesRegisterbusiness object).

The TradeReceivablesPayablesRegister includes the increases or decreases to trade receivables and payables and their totals. The elements located at the node TradeReceivablesPayablesRegister are defined by the type IDT TradeReceivablesPayablesRegisterElements. These elements may include CompanyID, and Company UUID. The CompanyID is the unique identifier of the company to which this trade receivable/payable belongs. The CompanyID is a GDT of type OrganisationalCentreID. In some implementations, the CompanyID can be an alternative key. The CompanyUUID is the universally unique identifier of the company to which this trade receivable/payable belongs. The CompanyUUID is a GDT of type UUID. In some implementations, the CompanyUUID can be an alternative key.

The following composition relationships to subordinate nodes may exist: Item 51024 (cardinality of 1:cn), AccountBalance 51036 (cardinality of 1:cn), CompanyBalance 51038 (cardinality of 1:cn), LiquidityInformationItem 51034 (cardinality of 1:cn), and DO: AccessControlList 51040 (cardinality of 1:1).

A TradeReceivablesPayablesAccount is an element of the operative structure of the trade receivables/payables according to companies and business partners. The TradeReceivablesPayablesAccount is a business foundation object that contains configuration data such as control of whether trade receivables and payables can be offset.

There may be a number of Inbound aggregation relationships including a relationship from the business object OrganisationalUnit (or node Company) called the OwningCompany, which may have a cardinality relationship of 1:c. The OwningCompany is the company to which the trade receivable/payable belongs The QueryByCompany provides a list of TradeReceivablesPayablesRegister using the specified company. The Query elements are defined by the data type TradeReceivablesPayablesRegisterCompanyQueryElements. These elements may include: CompanyID, and CompanyUUID. The CompanyID is a GDT of type OrganisationalCentreID, and is optional. The CompanyUUID is a GDT of type UUID, and is optional.

The Item is the trade receivable or payable from an underlying business transaction. For example, increases to receivables are based on incoming invoices. Decreases to payables are based on incoming credit memos. The elements found directly at the node TradeReceivablesPayablesRegisterItem are defined by the data type TradeReceivablesPayablesRegisterItemElements. These elements may include: UUID, BaseBusinessTransactionDocumentReference, PartnerBaseBusinessTransactionDocumentReference, CancellationBusinessTransactionDocumentReference, TradeReceivablesPayablesAccountUUID, CompanyID, CompanyUUID, BusinessPartnerInternalID, BusinessPartnerUUID, PartyRoleCategoryCode, LastDunningID, LastDunningUUID, OriginInvoiceBusinessTransactionDocumentReference, OriginOrderBusinessTransactionDocumentReference, OriginContractBusinessTransactionDocumentReference, BaseBusinessTransactionDocumentDate, AccountingTransactionDate, SystemAdministrativeData, BaseBusinessTransactionDocumentBusinessProcessVariantTypeCode, DueCategoryCodeMandatory, TypeCode, PropertyMovementDirectionCode, DueClearingIndicator, DueClearingDate, LastDunningDate, DunningBlockedIndicator, DunningBlockingReasonCode, DunningBlockingExpirationDate, DunningBlockingNote, DunningLevelValue, DunningProcedureStepOrdinalNumberValue, TransactionCurrencyCode, TransactionCurrencyAmount, OpenItemAmount, CashDiscountAmount, DeductionAmount, WithholdingTaxAmount, ClearedAmount, CashDiscountDeductibleNetAmount, CashDiscountDeductibleGrossAmount, MaximumCashDiscountEndDate, NormalCashDiscountEndDate, FullPaymentEndDate, LastCentralBankReportDate, Status, ClearingStatusCode, and ConsistencyStatusCode, The UUID is the universally unique identifier of the Item. The UUID is a GDT of type: UUID. In some implementations, the UUID can be an alternative key.

The BaseBusinessTransactionDocumentReference is the reference to the business document on which this item is based or its items (such as reference to Supplier Invoice). The BaseBusinessTransactionDocumentReference is a GDT of type BusinessTransactionDocumentReference). In some implementations, the BaseBusinessTransactionDocumentReference can be an alternative key.

The PartnerBaseBusinessTransactionDocumentReference is the reference to the business document assigned by the business partner on which the item is based (i.e., the identifier for the SupplierInvoice assigned by the Supplier). The PartnerBaseBusinessTransactionDocumentReference is a GDT of type BusinessTransactionDocumentReference, and is optional.

The CancellationBusinessTransactionDocumentReference is the reference to the business document that has canceled this Item. The CancellationBusinessTransactionDocumentReference is a GDT of type BusinessTransactionDocumentReference, and is optional. The TradeReceivablesPayablesAccountUUID is the universally unique identifier of the business account of the Item. The TradeReceivablesPayablesAccountUUID is a GDT of type UUID.

The CompanyID is the unique identifier of the company to which this trade receivable/payable belongs. The CompanyID is a GDT of type OrganisationalCentreID. The CompanyUUID is the universally unique identifier of the company to which this trade receivable/payable belongs. The CompanyUUID is a GDT of type UUID.

The BusinessPartnerInternalID is the unique identifier of the business partner to which this trade receivable/payable belongs. The BusinessPartnerInternalID is a GDT of type BusinessPartnerInternalID. The BusinessPartnerUUID is the universally unique identifier of the business partner to which this trade receivable/payable belongs. The BusinessPartnerUUID is a GDT of type UUID.

The PartyRoleCategoryCode is the role of the business partner in this trade receivable/payable. The PartyRoleCategoryCode is a GDT of type PartyRoleCategoryCode with possible constraints of 3 (=Creditor Party) and 4 (=Debtor Party).

The LastDunningID is the unique identifier of the last dunning (BPO Dunning) with which this item was dunned. The LastDunningID is a GDT of type BusinessTransactionDocumentID, and is optional. The LastDunningUUID is the universally unique identifier of the last dunning (BPO Dunning) with which this item was dunned. The LastDunningUUID is a GDT of type UUID, and is optional.

The OriginInvoiceBusinessTransactionDocumentReference is the reference to an existing SupplierInvoice or CustomerInvoice to which the business document (or source document) based on the current trade receivable/payable is a follow-on document. The OriginInvoiceBusinessTransactionDocumentReference is an optional GDT of type BusinessTransactionDocumentReference, and the SupplierInvoice and CustomerInvoice TypeCodes are used in the Type Code attribute.

The OriginOrderBusinessTransactionDocumentReference is the reference to an existing SalesOrder or PurchaseOrder to which the business document (or source document) based on the current trade receivable/payable is a follow-on document. The OriginOrder is an IDT with the following elements: (GDT: BusinessTransactionDocumentReference, and the SalesOrder and PurchaseOrder TypeCodes are used in the Type Code attribute, and is optional.

The OriginContractBusinessTransactionDocumentReference is the reference to an existing SalesContract or PurchasingContract to which the business document (or source document) based on the current trade receivable/payable is a follow-on document. The OriginContractBusinessTransactionDocumentReference is an optional GDT of type BusinessTransactionDocumentReference, and the SalesContract and PurchasingContract codes are used in the Type Code attribute.

The BaseBusinessTransactionDocumentDate is the issue date of the business document on which the item is based. The BaseBusinessTransactionDocumentDate is a GDT of type Date. In some implementations, the BaseBusinessTransactionDocumentDate. In some implementations, the BaseBusinessTransactionDocumentDate has a Document qualifier.

The AccountingTransactionDate is the date on the basis of which the posting date in Financial Accounting is determined. The AccountingTransactionDate is a GDT of type Date. In some implementations, the AccountingTransactionDate has a Transaction qualifier.

The SystemAdministrativeData is the administrative data retained by a system that includes the system users and the change dates/times of the Item. The SystemAdministrativeData is a GDT SystemAdministrativeData.

The BaseBusinessTransactionDocumentBusinessProcessVariantTypeCode is the coded representation of the business process variant of the business document on which the item is based. The BaseBusinessTransactionDocumentBusinessProcessVariantTypeCode is a GDT of type BusinessProcessVariantTypeCode, and is optional.

The DueCategoryCodeMandatory is the due category of the item: Trade receivable or payable. The DueCategoryCodeMandatory is a GDT of type DueCategoryCode.

The TypeCode is the coded representation of the type of the item. The TypeCode is a GDT of type TradeReceivablesPayablesRegisterItemTypeCode.

The PropertyMovementDirectionCode is the property change type of the item: Increase or decrease of a trade receivable or payable. The PropertyMovementDirectionCode is a GDT of type PropertyMovementDirectionCode.

The DueClearingIndicator is the indicator whether or not the item has been cleared. The DueClearingIndicator is a GDT of type Indicator. In some implementations, DueClearingIndicator, has a DueClearing qualifier. The integrity condition may exist such that the item has been cleared when all ItemSplitItems have been cleared.

The DueClearingDate is the time at which the Item is cleared. The DueClearingDate is a GDT of type Date. In some implementations, the DueClearingDate has a Clearing qualifier, and is optional.

The LastDunningDate is the date and time of the last dunning for this item. The LastDunningDate is a GDT of type Date. In some implementations, the LastDunningDate has a Dunning qualifier, and is optional.

The DunningBlockedIndicator is the indicator whether this item cannot be dunned (e.g. dunning block). The DunningBlockedIndicator is a GDT of type BusinessTransactionBlockedIndicator, and is optional.

The DunningBlockingReasonCode is the reason for the dunning block. The DunningBlockingReasonCode is a GDT of type DunningBlockingReasonCode, and is optional.

The DunningBlockingExpirationDate is the time at which the validity of the dunning block expires. The DunningBlockingExpirationDate is a GDT of type Date. The DunningBlockingExpirationDate has a Expiration qualifier, and is optional.

The DunningBlockingNote is the note for additional information for the reason for the dunning block. The DunningBlockingNote is a GDT of type Note, and is optional.

The DunningLevelValue is the current dunning level of the item. The DunningLevelValue is a GDT of type DunningLevelValue, and is optional.

The DunningProcedureStepOrdinalNumberValue is the current dunning procedure step of this item. The DunningProcedureStepOrdinalNumberValue is a GDT of type OrdinalNumberValue, and is optional.

The TransactionCurrencyCode is the currency of the trade receivable/payable (original currency of the underlying business document). The TransactionCurrencyCode is a GDT of type CurrencyCode. In some instances, the integrity condition may exist, such that the currencies of all following amounts may not differ from the transaction currency specified.

The TransactionCurrencyAmount is the amount of this trade receivable/payable. The TransactionCurrencyAmount is a GDT of type Amount. In some implementations, the TransactionCurrencyAmount has a TransactionCurrency qualifier. In some implementations, the integrity condition may exist, such that this is the total of all amounts (Amount) of the ItemSplitItem.

The OpenItemAmount is the amount of the not cleared part of the trade receivable/payable. The OpenItemAmount is a GDT of type Amount. The OpenItemAmount has a Open Item qualifier. The integrity condition may exist, such that this is the total of all amounts of the ItemSplitItem that are open (e.g. DueClearingIndicator=open).

The CashDiscountAmount is the claimed cash discount amount when paying the trade receivable/payable. The CashDiscountAmount is a GDT of type Amount. In some implementations, the CashDiscountAmount has a CashDiscount qualifier, and is optional. The integrity condition may exist, such that this is the total of all CashDiscountAmounts of the ItemSplitItem.

The DeductionAmount is the claimed deduction amount when paying the trade receivable/payable. The DeductionAmount is a GDT of type Amount. In some implementations, the DeductionAmount has a Deduction qualifier, and is optional. In those implementations, the integrity condition may exist, such that this is the total of all DeductionAmounts of the ItemSplitItem.

The WithholdingTaxAmount is the withholding tax amount when paying the trade receivable/payable, is a GDT of type Amount. In some implementions, the WithholdingTaxAmount, has a WithholdingTax Qualifier, and is optional. In some implementations, The integrity condition may exist, such that this is the total of all WithholdingCashDiscountAmounts of the ItemSplitItem.

The ClearedAmount is the amount of the cleared part of the trade receivable/payable. The ClearedAmount is a GDT of type Amount. In some implementations, the ClearedAmount has a Cleared qualifier, and is optional. There, the integrity condition may exist, such that this is the total of all amounts of the ItemSplitItem that are cleared The CashDiscountDeductibleNetAmount is the net amount qualifying for cash discount. The CashDiscountDeductibleNetAmount is a GDT of type Amount. The CashDiscountDeductibleNetAmount has a Net qualifier, and is optional.

The CashDiscountDeductibleGrossAmount is the gross amount qualifying for cash discount. The CashDiscountDeductibleGrossAmount is a GDT of type Amount. In some implementations, the CashDiscountDeductibleGrossAmount has a Gross qualifier, and is optional.

The MaximumCashDiscountEndDate is the date on which the authorization to receive the maximum cash discount ends. The MaximumCashDiscountEndDate is a GDT of type Date. In some implementations, the MaximumCashDiscountEndDate has a End qualifier, and is optional. In some implementations, the integrity condition may exist, such that this date is equal to the smallest MaximumCashDiscountEndDate of the ItemSplitItem.

The NormalCashDiscountEndDate is the date on which the authorization to receive the normal cash discount ends. The NormalCashDiscountEndDate is a GDT of type Date. In some implementations, the NormalCashDiscountEndDate has a End qualifier, and is optional. There, the integrity condition may exist, such that this date is equal to the smallest NormalCashDiscountEndDate of the ItemSplitItem.

The FullPaymentEndDate is the end date on which the full payment may be made at the latest. The FullPaymentEndDate is a GDT of type Date. In some implementations, the FullPaymentEndDate has a End qualifier, and is optional. In those implementations, the integrity condition may exist, such that this date is equal to the smallest FullPaymentEndDate of the ItemSplitItem.

The CentralBankReportTotalAmount is the total amount that was reported to the central bank for this Item in accordance with German foreign trade regulations. The CentralBankReportTotalAmount is a GDT of type Amount. In some implementations, the CentralBankReportTotalAmount has a Total qualifier, and is optional.

The LastCentralBankReportDate is the date of the last report to the central bank in accordance with German foreign trade regulations for this Item. The LastCentralBankReportDate is a GDT of type Date. In some implementations, the LastCentralBankReportDate has a BusinessTransactionDocument qualifier, and is optional.

The Status is the status of the Item. The Status is a IDT of type TradeReceivablesPayablesRegisterItemStatus. The IDT TradeReceivablesPayablesRegisterItemStatus consists of the following elements: ClearingStatusCode, ConsistencyStatusCode, and BaseBusinessTransactionDocumentCancellationStatusCode.

The ClearingStatusCode specifies whether or not an Item has been completely or partially cleared. The ClearingStatusCode is a GDT of type ClearingStatusCode.

The ConsistencyStatusCode is the current consistency status of Item. The ConsistencyStatusCode is a GDT of type ConsistencyStatusCode.

The BaseBusinessTransactionDocumentCancellationStatusCode is the cancellation status of the business document on which the item is based. The BaseBusinessTransactionDocumentCancellationStatusCode is a GDT of type CancellationStatusCode.

The following composition relationships to subordinate nodes exist: ItemSplitItem 51026 (which has a cardinality of 1:n), and ItemCentralBankReportItem 51028 (which has a cardinality of 1:cn).

There may be a number of Inbound aggregation relationships including: from business object SupplierInvoice (or node SupplierInvoice) the BaseSupplierInvoice (which may have a cardinality of c:c, wherein the BaseSupplierInvoice is the SupplierInvoice that the trade receivable/payable is based on), from business object CustomerInvoice (or node CustomerInvoice) the BaseCustomerInvoice (which may have a cardinality of c:c, wherein the BaseCustomerInvoice is the CustomerInvoice that the trade receivable/payable is based on), from business object ExpenseReport (or node ExpenseReport) the BaseExpenseReport (which may have a cardinality of c:c, wherein the BaseExpenseReport is the expense report that the trade receivable/payable is based on), from business object DuePayment (or node DuePaymentItem) the BaseDuePaymentItem (which may have a cardinality of c:c, wherein the BaseDuePaymentItem is the payment that the trade receivable/payable is based on), from business object Dunning (or node Root) the BaseDunning (which may have a cardinality of c:c, wherein the BaseDunning is the Dunning that the trade receivable/payable is based on), from business object TradeReceivablesPayablesAccount (or node TradeReceivablesPayablesAccount) the Account (which may have a cardinality of 1:cn, wherein the Account is the TradeReceivablesPayablesAccount that belongs to the total), from business object OrganisationalUnit (or node Company) the Company (which may have a cardinality of 1:cn, wherein the Company is the company that occurs in the role Debtor or Creditor), from business object BusinessPartner (or node BusinessPartner) the BusinessPartner (which may have a cardinality of 1:cn, wherein the BusinessPartner is the business partner that occurs in the role Debtor or Creditor), from business object Identity (or node Root) the CreationIdentity (which may have a cardinality of 1:cn, wherein CreationIdentity is the Identity that created the Trade Receivables Payables Register), and the LastChangeIdentity (which may have a cardinality of c:cn, wherein LastChangeIdentity is the identity that changed the Trade Receivables Payables Register in the last time). To business object TradeReceivablesPayablesRegister (or node ItemSplitItem), the OpenOrClearedItemSplitItem may have a cardinality of 1:cn. The OpenOrClearedItemSplitItem is the ItemSplitItems of this item that is ClearingStatus is open or cleared. The filter elements are defined by the data type: TradeReceivablesPayablesRegisterItemSplitItemByClearingStatusCodeFilterElements. These elements may include ClearingStatusCode. The ClearingStatusCode specifies whether a SplitItem is open or cleared. The ClearingStatusCode is a GDT of type ClearingStatusCode, and is optional.

The NotifyOfBaseBusinessTransactionDocumentCancellation (S&AM action) action notifies the item that its base business transaction document was cancelled. In some implementations, preconditions may be that the business document based on the item is canceled. In those implementations, no SplitItem under the Item is notified, paid or cleared. Changes to the object may include that the Item amounts are deducted from the CompanyBalance and AccountBalance. Parameters may be that the action elements are defined by the data type TradeReceivablesPayablesRegisterItemNotifyOfBaseBusinessTransactionCancellationActionElements. These elements may include CancellationBusinessTransactionDocumentReference The CancellationBusinessTransactionDocumentReference is the reference to the cancellation document. The CancellationBusinessTransactionDocumentReference is a GDT of type BusinessTransactionDocumentReference. In some implementations, this action may only be performed by the base business object if it is in the Due Item Management DU or the agent of ReceivablesPayablesCancellationRequest.

The CheckConsistency (S&AM action): action checks consistency and correctness when a new Item is created or when the data of an existing Item is changed. In some implementations, preconditions may be that an Item was recreated or the data of an existing Item was changed. Changes to the object may include whether the object is consistent and correct, and whether it can be activated so that the Item can be used in business processes. Changes to the status may include the status of the object is consistent if the check was successful. In some implementations, this action is performed by the UI or by the business object itself.

The QueryByBaseBusinessTransaction provides a list of the Items using the business transaction based on the Item. The query elements are defined by the type IDT: TradeReceivablesPayablesRegister-ItemBaseBusinessTransactionQueryElement. These elements may include: BaseBusinessTransactionDocumentReference, PartnerBaseBusinessTransactionDocumentReference, BaseBusinessTransactionDocumentDate, and Status. The BaseBusinessTransactionDocumentReference is a GDT of type BusinessTransactionDocumentReference, and is optional. The PartnerBaseBusinessTransactionDocumentReference is a (GDT of type BusinessTransactionDocumentReference, and is optional. The BaseBusinessTransactionDocumentDate is a GDT of type Date. In some implementations, the, BaseBusinessTransactionDocumentDate has a Document qualifier, and is optional. The Status is a IDT of type TradeReceivablesPayablesRegisterItemStatus.

The QueryByAccount provides a list of the Items using their assigned TradeReceivablesPayablesAccount. The Query elements are defined by the data type TradeReceivablesPayablesRegisterItemAccountQueryElements. These elements may include: TradeReceivablesPayablesAccountUUID, and Status. The TradeReceivablesPayablesAccountUUID is a GDT of the UUID, and is optional. The Status is a IDT of the TradeReceivablesPayablesRegisterItemStatus.

The QueryByCompanyAndBusinessPartner provides a list of the Items using the corresponding company and the corresponding BusinessPartner. The query elements are defined by the type IDT: TradeReceivablesPayablesRegisterItemCompanyAndBusinessPartnerQueryElement. These elements may include: CompanyID, CompanyUUID, BusinessPartnerInternalID, BusinessPartnerUUID, and Status. The CompanyID is a GDT of type OrganisationalCentreID, and is optional. The CompanyUUID is a GDT of type UUID, and is optional. The BusinessPartnerInternalID is a GDT of type BusinessPartnerInternalID, and is optional. The BusinessPartnerUUID is a GDT of type UUID, and is optional. The PartyRoleCategoryCode is an optional GDT of type PartyRoleCategoryCode with possible Constraints of 3 (=Creditor Party) and 4 (=Debtor Party). The Status is a IDT of type TradeReceivablesPayablesRegisterItemStatus.

The QueryByElements: provides a list of the Items that correspond to different ones of its attributes. All attributes are optional. Query elements are defined by the data type TradeReceivablesPayablesRegister-ItemElementsQueryElements. These elements may include: UUID, BaseBusinessTransactionDocumentReference, PartnerBaseBusinessTransactionDocumentReference, CancellationBusinessTransactionDocumentReference, TradeReceivablesPayablesAccountUUID, CompanyID, CompanyUUID, BusinessPartnerInternalID, BusinessPartnerUUID, PartyRoleCategoryCode, LastDunningID, LastDunningUUID, OriginInvoiceBusinessTransactionDocumentReference, OriginOrderBusinessTransactionDocumentReference, OriginContractBusinessTransactionDocumentReference, BaseBusinessTransactionDocumentDate, AccountingTransactionDate, SystemAdministrativeData, BaseBusinessTransactionDocumentBusinessProcessVariantTypeCode, DueCategoryCode, TypeCode, PropertyMovementDirectionCode, DueClearingIndicator, DueClearingDate, LastDunningDate, DunningBlockedIndicator, DunningBlockingReasonCode, DunningBlockingExpirationDate, DunningLevelValue, DunningProcedureStepOrdinalNumberValue, TransactionCurrencyCode, TransactionCurrencyAmount, CashDiscountDeductibleNetAmount, CashDiscountDeductibleGrossAmount, MaximumCashDiscountEndDate, NormalCashDiscountEndDate, FullPaymentEndDate, CentralBankReportTotalAmount, LastCentralBankReportDate, and Status.

The UUID is a GDT of type UUID. The BaseBusinessTransactionDocumentReference is a GDT of type BusinessTransactionDocumentReference. The PartnerBaseBusinessTransactionDocumentReference is a GDT of type BusinessTransactionDocumentReference. The CancellationBusinessTransactionDocumentReference is a GDT of type BusinessTransactionDocumentReference. The TradeReceivablesPayablesAccountUUID is a GDT of type UUID. The CompanyID is a GDT of type OrganisationalCentreID. The CompanyUUID is a GDT of type UUID. The BusinessPartnerInternalID is a GDT of type BusinessPartnerInternalID. The BusinessPartnerUUID is a GDT of type UUID. The PartyRoleCategoryCode is a GDT of type PartyRoleCategoryCode. The LastDunningID is a GDT of type BusinessTransactionDocumentID. The LastDunningUUID is a GDT of type UUID. The OriginInvoiceBusinessTransactionDocumentReference is a GDT of type BusinessTransactionDocumentReference, and the SupplierInvoice and CustomerInvoice TypeCodes are used in the Type Code attribute. The OriginOrderBusinessTransactionDocumentReference is a GDT of type BusinessTransactionDocumentReference, and the SalesOrder and PurchaseOrder TypeCodes are used in the Type Code attribute. The OriginContractBusinessTransactionDocumentReference is a GDT of type BusinessTransactionDocumentReference, and the SalesContract and PurchasingContract codes are used in the Type Code attribute. The BaseBusinessTransactionDocumentDate is a GDT of type Date. In some implementations, the BaseBusinessTransactionDocumentDate has a Document qualifier. The AccountingTransactionDate is a GDT of type Date. In some implementations, the AccountingTransactionDate has a Transaction qualifier. The SystemAdministrativeData is a GDT of type SystemAdministrativeData. The BaseBusinessTransactionDocumentBusinessProcessVariantTypeCode is a GDT of type BusinessProcessVariantTypeCode. The DueCategoryCode is a GDT of type DueCategoryCode. The TypeCode is a GDT of type-TradeReceivablesPayablesRegisterItemTypeCode.

The PropertyMovementDirectionCode is a GDT of type PropertyMovementDirectionCode. The DueClearingIndicator is a GDT of type Indicator. In some implementations the DueClearingIndicator has a DueClearing qualifier. The DueClearingDate is a GDT of type Date. In some implementations, the DueClearingDate has a Clearing qualifier. The LastDunningDate is a GDT of type Date. In some implementations, the LastDunningDate has a Dunning qualifier. The DunningBlockedIndicator is a GDT of type BusinessTransactionBlockedIndicator. The DunningBlockingReasonCode is a GDT of type DunningBlockingReasonCode. The DunningBlockingExpirationDate is a GDT of type Date. In some implementations the DunningBlockingExpirationDate has a Expiration qualifier. The DunningLevelValue is a GDT of type DunningLevelValue. The DunningProcedureStepOrdinalNumberValue is a GDT of type OrdinalNumberValue. The TransactionCurrencyCode is a GDT of type CurrencyCode. The TransactionCurrencyAmount is a GDT of type Amount. In some implementations, the TransactionCurrencyAmount has a TransactionCurrency qualifier. The CashDiscountDeductibleNetAmount is a GDT of type Amount. In some implementations, the CashDiscountDeductibleNetAmount has a Net qualifier. The CashDiscountDeductibleGrossAmount is a GDT of type Amount. In some implementations, the CashDiscountDeductibleGrossAmount has a Gross qualifier. The MaximumCashDiscountEndDate is a GDT of type Date. In some implementations, the MaximumCashDiscountEndDate has a End qualifier. The NormalCashDiscountEndDate is a GDT of type Date. The NormalCashDiscountEndDate has a End qualifier. The FullPaymentEndDate is a GDT of type Date. The FullPaymentEndDate has a End qualifier. The CentralBankReportTotalAmount is a GDT of type Amount. In some implementations, the CentralBankReportTotalAmount has a Total qualifier. The LastCentralBankReportDate is a GDT of type Date. In some implementations, the LastCentralBankReportDate has a CentralBankReport qualifier. The Status is a IDT TradeReceivablesPayablesRegisterItemStatus.

The ItemSplitItem is the part of a disjunctive split of an item due to a trade receivables/payables split. In some implementations, disjunctive split means that the amount of the item is completely explained by the amounts of its ItemSplitItem. A trade receivables/payables split is the splitting of the trade receivables/payables into several parts to assign different status values (such as “open”, “cleared”) or different values of other attributes (such as a different due date). The elements found at the node TradeReceivablesPayablesRegisterItemSplitItem are defined by the data type TradeReceivablesPayablesRegisterItemSplitItemElements. These elements may include: ID, UUID, OriginSplitItemID, DueClearingID, DueClearingUUID, PaymentAdviceID, PaymentAdviceUUID, PaymentControlUUID, LastChangeBusinessTransactionDocumentReference, SystemAdministrativeData, DueClearingDate, DueClearingIndicator, TransactionCurrencyCode, TransactionCurrencyAmount, ClearedAmount, CashDiscountAmount, KeyDateCashDiscountAmount, MaximumCashDiscountAmount, NormalCashDiscountAmount, DeductionAmount, WithholdingTaxAmount, PaymentCurrencyCode, PaymentAmount, CashDiscountTerms, CashDiscountLevelCode, OverdueDuration, PaymentDifferenceReasonCode, ExchangeRate, Note, and Status.

The ID is within the item, and is the unique identifier of the SplitItem. The ID is a GDT of type BusinessTransactionDocumentItemSplitItemID. The UUID is the universally unique identifier of this split item. The UUID is a GDT of type UUID. In some implementations, the UUID can be an alternative key. The OriginSplitItemID is the identifier of the original split item that was split to get this split item. The OriginSplitItemID is a GDT of type BusinessTransactionDocumentItemSplitItemID. The DueClearingID is the identifier of the clearing transaction that cleared this split item (ID of BPO DueClearing). The DueClearingID is a GDT of type BusinessTransactionDocumentID, and is optional. The DueClearingUUID is the universally unique identifier of the clearing transaction (UUID of BPO DueClearing). The DueClearingUUID is a GDT of type UUID, and is optional. ThePaymentAdviceID is the identifier of a payment advice note that informs about a payment for this split item (ID of BPO PaymentAdvice). The PaymentAdviceID is a GDT of type BusinessTransactionDocumentID, and is optional. The PaymentAdviceUUID is the universally unique identifier of the payment advice note (UUID of BPO PaymentAdvice). The PaymentAdviceUUID is a GDT of type UUID, and is optional. The PaymentControlUUID is the universally unique identifier of the payment control (UUID of DO PaymentControl). The PaymentcontrolUUID is a GDT of type UUID, and is optional. The LastChangeBusinessTransactionDocumentReference is the reference to the business document on which the last change of this split item is based. The LastChangeBusinessTransactionDocumentReference is a GDT of type BusinessTransactionDocumentReference. The SystemAdministrativeData is the administrative data retained by a system that includes the system users and the change dates/times of the split item. The SystemAdministrativeData is a GDT of type SystemAdministrativeData. The DueClearingDate is the time of the clearing of the split item. The DueClearingDate is a GDT of type Date. In some implementations, the DueClearingDate has a Clearing qualifier, and is optional. The DueClearingIndicator is the indicator whether or not the split item has been cleared. The DueClearingIndicator is a GDT of type Indicator. In some implementations, the DueClearingIndicator has a DueClearing qualifier. The TransactionCurrencyCode is the transaction currency of the trade receivable/payable (original currency of the underlying business document). The TransactionCurrencyCode is a GDT of type CurrencyCode. The TransactionCurrencyAmount is the amount of the split item. The TransactionCurrencyAmount is a GDT of type Amount. In some implementations, the TransactionCurrencyAmount has a TransactionCurrency qualifier. The ClearedAmount is the amount that is cleared. The ClearedAmount is a (GDT of type Amount. In some implementations, the ClearedAmount has a Cleared qualifier, and is optional. The CashDiscountAmount is the claimed cash discount amount when paying the split item. The CashDiscountAmount is a GDT of type Amount. In some implementations, the CashDiscountAmount has a CashDiscount qualifier, and is optional. The KeyDateCashDiscountAmount is the calculated cash discount amount for this split item that can be claimed for a predefined key date. The KeyDateCashDiscountAmount is a GDT of type Amount. In some implementations, the KeyDateCashDiscountAmount has a CashDiscount qualifier, and is optional. The MaximumCashDiscountAmount is the amount for the maximum cash discount. The MaximumCashDiscountAmount is a GDT of type Amount. The MaximumCashDiscountAmount has a CashDiscount qualifier, and is optional. The NormalCashDiscountAmount is the amount for the normal cash discount. The NormalCashDiscountAmount is a GDT of type Amount. In some implementations, the NormalCashDiscountAmount has a CashDiscount qualifier, and is optional. The DeductionAmount is the amount of the claimed non-cash discount deductions when paying this split item. The DeductionAmount is a GDT of type Amount. In some implementations, the DeductionAmount has a Deduction qualifier, and is optional. The WithholdingTaxAmount is the withholding tax amount when paying the split item. The WithholdingTaxAmount is a GDT of type Amount. In some implementations, the WithholdingTaxAmount has a WithholdingTax qualifier, and is optional. The PaymentCurrencyCode is the currency in which the payment of the SplitItem is made. The PaymentCurrencyCode is a GDT of type CurrencyCode. In some implementations, the PaymentCurrencyCode has a Payment qualifier, and is optional. The PaymentAmount is the payment amount of the split item in payment currency. The PaymentAmount is a GDT of type Amount. In some implementations, the PaymentAmount has a Payment qualifier, and is optional. The integrity condition may exist, such that If CurrencyCode is filled, CurrencyCode and PaymentAmount.CurrencyCode may correspond with each other. The CashDiscountTerms is the modality agreed for the payment of the trade receivable payable item regarding scaled payment deadlines and the cash discount deductions allowed if this split item is paid on the requested date. The CashDiscountTerms is a GDT of type CashDiscountTerms, and is optional. The CashDiscountLevelCode specifies which payment period (maximum cash discount, normal cash discount or net payment) was chosen. The CashDiscountLevelCode is a GDT of type CashDiscountLevelCode, and is optional. The OverdueDuration is the duration from the FullPaymentEndDate up to the current date for open items or up to the clearing date for cleared split items. The Duration is specified in days. The OverdueDuration is a GDT of type DAY_Duration. In some implementations, the OverdueDuration has a Overdue qualifier, and is optional. The PaymentDifferenceReasonCode is the code for the reason of a payment difference for this item. The PaymentDifferenceReasonCode is a GDT of type PaymentDifferenceReasonCode, and is optional. The ExchangeRate is the predefined exchange rate for alternative payment currency. The ExchangeRate is a GDT of type ExchangeRate, and is optional. The Note is the note to this split item. The Note is a GDT of type Note, and is optional. The Status is the status of the SplitItem. The Status is a IDT of type TradeReceivablesPayablesRegisterItemSplitItemStatus. The IDT TradeReceivablesPayablesRegisterItemSplitItemStatus consists of the following elements: ClearingStatusCode, ConsistencyStatusCode, BaseBusinessTransactionDocumentCancellationStatusCode, and PaymentExecutionStatusCode.

The ClearingStatusCode specifies whether a SplitItem is open or cleared. The ClearingStatusCode is a GDT of type ClearingStatusCode. The ConsistencyStatusCode is the current consistency status of SplitItem. The ConsistencyStatusCode is a GDT of type ConsistencyStatusCode.)

The BaseBusinessTransactionDocumentCancellationStatusCode is the cancellation status of the base business document. The BaseBusinessTransactionDocumentCancellationStatusCode is a GDT of type CancellationStatusCode. The PaymentExecutionStatusCode is the current execution status of the payment of SplitItem. The PaymentExecutionStatusCode is a GDT of type PaymentExecutionStatusCode.

The following composition relationships to subordinate nodes exist: DO PaymentControl 51030 (which has a cardinality of 1:c) and ItemSplitItemClearingItem 51032 (which has a cardinality of 1:cn).

There may be a number of Inbound association relationships may include from business object DueClearing (or node DueClearing) the DueClearing (which may have a cardinality of c:cn, wherein the DueClearing is the DueClearing that cleared this splititem).

The NotifyOfPaymentExecutionStatus (S&AM action) sets the payment execution status of SplitItem. In some implementations, preconditions may be that the SplitItem has not yet been cleared. Changes to the object may include that the payment status of SplitItem is set to one of its values (payment advised, payment in preparation, Parameters may be that the action elements are defined by the data type: TradeReceivablesPayablesRegisterItemNotifyOfPaymentExecutionStatusActionElements. These elements may include PaymentExecutionStatusCode. The PaymentExecutionStatusCode is a GDT of type PaymentExecutionStatusCode. In some implementations, this action may only be performed by the Create_Payment action or by the DuePayment business object.

The Clear (S&AM action) action clears the SplitItem. In some implementations, preconditions may be that the SplitItem has not been cleared. Changes to the object may include that the ID of the clearing transaction, the clearing date, and the clearing indicator are entered (ItemSplitItem-DueClearingID, ItemSplitItem-DueClearingUUID, DueClearingDate, DueClearingIndicator). Parameters may be that the action elements are defined by the data type: TradeReceivablesPayablesRegisterItemSplitItemClearActionElements. These elements may include: DueClearingID, DueClearingUUID, and DueClearingDate. The DueClearingID is a GDT of type BusinessTransactionDocumentID. The DueClearingUUID is a GDT of type UUID. The DueClearingDate is a GDT of type Date. In some implementations, the DueClearingDate has a Cleaning qualifier. This action may be performed by the DueClearing business object.

The ResetClearing (S&AM action) resets the clearing of the SplitItem. In some implementations, the preconditions may be that the SplitItem has been cleared. Changes to the object may include the ID of the clearing transaction, the clearing date, and the clearing indicator are deleted (ItemSplitItem-DueClearingID, ItemSplitItem-DueClearingUUID, DueClearingDate, DueClearingIndicator). This action may be performed by the DueClearing business object.

The CreatePayment action generates a payment for the selected SplitItems and calls the action NotifyOfPaymentExecutionStatus. In some implementations, preconditions may be that the SplitItem is not reserved for a payment and has not been cleared. Changes to other objects may include that a DuePayment is generated. The action may be performed by the UI or a mass data object for the generation of DuePayment.

The CheckConsistency (S&AM action) checks consistency and correctness when a new SplitItem is created or when the data of an existing Item is changed. In some implementations, preconditions may be that A SplitItem was recreated or the data of an existing Item was changed. Changes to the object may indicate whether the object is consistent and correct, and whether it can be activated so that the Item can be used in business processes. The status may include that the object is consistent if the check was successful. This action is performed by the UI or by the business object itself.

The AdvisePayment action advises a payment for the SplitItem. In some implementations, preconditions may include a payment advice note exists that notifies this SplitItem. Changes to the object may include that the payment advice note number is entered (ItemSplitItemPaymentAdviceID and ItemSplitItem-PaymentAdviceUUID). Parameters may be that the action elements are defined by the data type TradeReceivablesPayablesRegisterAdvisePaymentActionElements. These elements include: PaymentAdviceID, and PaymentAdviceUUID. The PaymentAdviceID is a GDT of type BusinessTransactionDocumentID. The PaymentAdviceUUID is a GDT of type UUID, and is optional. In some implementations, this action may only be performed by the UI or by the business objects DueClearing and DuePayment.

The QueryByElementsAndItemElements provides a list of SplitItems that fulfill the selection conditions. Attributes of the SplitItem and attributes of the corresponding Items can both be selected. All attributes are optional. The Query elements are defined by the data type: TradeReceivablesPayablesRegisterItemSplitItemElementsAndItemElementsQueryElement. These elements may include: TradeReceivablesPayablesRegisterItemUUID, TradeReceivablesPayablesRegisterItemBaseBusinessTransactionDocumentReference, TradeReceivablesPayablesRegisterItemPartnerBaseBusinessTransactionDocumentReference, TradeReceivablesPayablesRegisterItemCancellationBusinessTransactionDocument Reference, TradeReceivablesPayablesRegisterItemTradeReceivablesPayablesAccountUUID, TradeReceivablesPayablesRegisterItemCompanyID, TradeReceivablesPayablesRegisterItemCompanyUUID, TradeReceivablesPayablesRegisterItemBusinessPartnerInternalID, TradeReceivablesPayablesRegisterItemBusinessPartnerUUID, TradeReceivablesPayablesRegisterItemPartyRoleCategoryCode, TradeReceivablesPayablesRegisterItemLastDunningID, TradeReceivablesPayablesRegisterItemLastDunningUUID, TradeReceivablesPayablesRegisterItemOriginInvoiceBusinessTransactionDocumentReference, TradeReceivablesPayablesRegisterItemOriginOrderBusinessTransactionDocumentReference, TradeReceivablesPayablesRegisterItemOriginContractBusinessTransactionDocumentReference, TradeReceivablesPayablesRegisterItemBaseBusinessTransactionDocumentDate, TradeReceivablesPayablesRegisterItemAccountingTransactionDate, TradeReceivablesPayablesRegisterItemSystemAdministrativeData, TradeReceivablesPayablesRegisterBaseBusinessTransactionDocumentBusinessProcessVariantType Code, TradeReceivablesPayablesRegisterItemDueCategoryCode, TradeReceivablesPayablesRegisterItemTypeCode, TradeReceivablesPayablesRegisterItemPropertyMovementDirectionCode, TradeReceivablesPayablesRegisterItemDueClearingIndicator, TradeReceivablesPayablesRegisterItemDueClearingDate, TradeReceivablesPayablesRegisterItemLastDunningDate, TradeReceivablesPayablesRegisterItemDunningBlockedIndicator, TradeReceivablesPayablesRegisterItemDunningBlockingReasonCode, TradeReceivablesPayablesRegisterItemDunningLevelValue, TradeReceivablesPayablesRegisterItemDunningBlockingExpirationDate, TradeReceivablesPayablesRegisterItemDunningProcedureStepOrdinalNumberValue, TradeReceivablesPayablesRegisterItemTransactionCurrencyCode, TradeReceivablesPayablesRegisterItemTransactionCurrencyAmount, TradeReceivablesPayablesRegisterItemCashDiscountDeductible NetAmount, TradeReceivablesPayablesRegisterItemCashDiscountDeductibleGrossAmount, TradeReceivablesPayablesRegisterItemMaximumCashDiscountEndDate, TradeReceivablesPayablesRegisterItemNormalCashDiscountEndDate, TradeReceivablesPayablesRegisterItemFullPaymentEndDate, TradeReceivablesPayablesRegisterItemCentralBankReportTotalAmount, TradeReceivablesPayablesRegisterItemLastCentralBankReportDate, TradeReceivablesPayablesRegisterItemStatus, ID, UUID, OriginSplitItemID, DueClearingID, DueClearingUUID, PaymentAdviceID, PaymentAdviceUUID, LastChangeBusinessTransactionDocumentReference, SystemAdministrativeData, DueClearingDate, DueClearingIndicator, TransactionCurrencyAmount, ClearedAmount, CashDiscountAmount, MaximumCashDiscountAmount, NormalCashDiscountAmount, DeductionAmount, CashDiscountTerms, WithholdingTaxAmount, PaymentCurrencyCode, PaymentAmount, CashDiscountLevelCode, PaymentDifferenceReasonCode, ExchangeRate, Note, Status, PaymentControlUUID, PaymentControlPaymentProcessingCompanyID, PaymentControlPaymentProcessingCompanyUUID, PaymentControlPaymentProcessingBusinessPartnerUUID, PaymentControlPaymentProcessingBusinessPartnerInternalID, PaymentControlResponsibleEmployeeUUID, PaymentControlResponsibleEmployeeID, PaymentControlPropertyMovementDirectionCode, PaymentControlPaymentFormCode, PaymentControlPaymentAmount, PaymentControlExchangeRate, PaymentControlPaymentBlock, PaymentControlFirstPaymentInstructionCode, PaymentControlSecondPaymentInstructionCode, PaymentControlThirdPaymentInstructionCode, PaymentControlFourthPaymentInstructionCode, PaymentControlBankChargeBearerCode, PaymentControlPaymentPriorityCode, PaymentControlSinglePaymentIndicator, PaymentControlDebitValueDate, PaymentControlCreditValueDate, PaymentControlPaymentReceivablesPayablesGroupID, PaymentControlScandinavianPaymentReferenceID, PaymentControlSwissPaymentReferenceID, PaymentControlBankTransferHouseBankAccountUUID, PaymentControlBankTransferHouseBankAccountInternalID, PaymentControlBankTransferBusinessPartnerBankDetailsID, PaymentControlChequePaymentHouseBankAccountUUID, PaymentControlChequePaymentHouseBankAccountInternalID, PaymentControlCreditCardPaymentPaymentCardID, PaymentControlCreditCardPaymentPaymentCardTypeCode, PaymentControlCreditCardPaymentBusinessPartnerPaymentCardDetailsID, PaymentControlCreditCardPaymentPaymentCardDataOriginTypeCode, PaymentControlCreditCardPaymentPaymentCardVerificationValueText, PaymentControlCreditCardPaymentPaymentCardVerificationValueAvailabilityCode, PaymentControlCreditCardPaymentPaymentCardVerificationValueCheckRequiredIndicator, PaymentControlCashPaymentCashStorageUUID, and PaymentControlCashPaymentCashStorageID.

TradeReceivablesPayablesRegisterItemUUID is a GDT of type UUID.

TradeReceivablesPayablesRegisterItemBaseBusinessTransactionDocumentReference is a GDT of type BusinessTransactionDocumentReference.

TradeReceivablesPayablesRegisterItemPartnerBaseBusinessTransactionDocumentReference is a GDT of type BusinessTransactionDocumentReference.

TradeReceivablesPayablesRegisterItemCancellationBusinessTransactionDocumentReference is a GDT of type BusinessTransactionDocumentReference.

The TradeReceivablesPayablesRegisterItemTradeReceivablesPayablesAccountUUID is a GDT of type UUID.

TradeReceivablesPayablesRegisterItemCompanyID is a GDT of type OrganisationalCentreID.

TradeReceivablesPayablesRegisterItemCompanyUUID is a GDT of type UUID.

TradeReceivablesPayablesRegisterItemBusinessPartnerInternalID is a GDT of type BusinessPartnerInternalID.

TradeReceivablesPayablesRegisterItemBusinessPartnerUUID is a GDT of type UUID.

TradeReceivablesPayablesRegisterItemPartyRoleCategoryCode is a GDT of type PartyRoleCategoryCode.

TradeReceivablesPayablesRegisterItemLastDunningID is a GDT of type BusinessTransactionDocumentID.

TradeReceivablesPayablesRegisterItemLastDunningUUID is a GDT of type UUID.

TradeReceivablesPayablesRegisterItemOriginInvoiceBusinessTransactionDocumentReference is a GDT of type BusinessTransactionDocumentReference, the SupplierInvoice and CustomerInvoice TypeCodes are used in the Type Code attribute.

TradeReceivablesPayablesRegisterItemOriginOrderBusinessTransactionDocumentReference is a GDT of type BusinessTransactionDocumentReference, the SalesOrder and PurchaseOrder TypeCodes are used in the Type Code attribute.

TradeReceivablesPayablesRegisterItemOriginContractBusinessTransactionDocumentReference Is a (GDT: BusinessTransactionDocumentReference, the SalesContract and PurchasingContract codes are used in the Type Code attribute.)

TradeReceivablesPayablesRegisterItemBaseBusinessTransactionDocumentDate is a GDT of type Date. In some implementations, the TradeReceivablesPayablesRegisterItemBaseBusinessTransactionDocumentDate has a Document qualifier.

TradeReceivablesPayablesRegisterItemAccountingTransactionDate is a GDT of type Date. In some implementations, the TradeReceivablesPayablesRegisterItemAccountingTransactionDate has a Transaction qualifier.

TradeReceivablesPayablesRegisterItemSystemAdministrativeData is a GDT of type SystemAdministrativeData.

TradeReceivablesPayablesRegisterBaseBusinessTransactionDocumentBusinessProcessVariantTypeCode is a GDT of type BusinessProcessVariantTypeCode.

TradeReceivablesPayablesRegisterItemDueCategoryCode is a GDT of type DueCategoryCode.

TradeReceivablesPayablesRegisterItemTypeCode is a GDT of type TradeReceivablesPayablesRegisterItemTypeCode.

TradeReceivablesPayablesRegisterItemPropertyMovementDirectionCode is a GDT of type PropertyMovementDirectionCode.

TradeReceivablesPayablesRegisterItemDueClearingIndicator is a GDT of type Indicator. In some implementations, theTradeReceivablesPayablesRegisterItemDueClearingIndicator has a DueClearing qualifier.

TradeReceivablesPayablesRegisterItemDueClearingDate is a GDT of type Date. In some implementations, the TradeReceivablesPayablesRegisterItemDueClearingDate has a Clearing qualifier. TradeReceivablesPayablesRegisterItemLastDunningDate is a GDT of type Date. The TradeReceivablesPayablesRegisterItemLastDunningDate has a Dunning qualifier.

TradeReceivablesPayablesRegisterItemDunningBlockedIndicator is a GDT of type BusinessTransactionBlockedIndicator.

TradeReceivablesPayablesRegisterItemDunningBlockingReasonCode is a GDT of type DunningBlockingReasonCode.

TradeReceivablesPayablesRegisterItemDunningLevelValue is a GDT of type DunningLevelValue.

TradeReceivablesPayablesRegisterItemDunningBlockingExpirationDate is a GDT of type Date. The TradeReceivablesPayablesRegisterItemDunningBlockingExpirationDate has a Expiration qualifier.

TradeReceivablesPayablesRegisterItemDunningProcedureStepOrdinalNumberValue is a GDT of type OrdinalNumberValue.

TradeReceivablesPayablesRegisterItemTransactionCurrencyCode is a GDT of type CurrencyCode.

TradeReceivablesPayablesRegisterItemTransactionCurrencyAmount is a GDT of type Amount. In some implementations, the TradeReceivablesPayablesRegisterItemTransactionCurrencyAmount has a TransactionCurrency qualifier.

TradeReceivablesPayablesRegisterItemCashDiscountDeductibleNetAmount is a GDT type of Amount. In some implementations, the TradeReceivablesPayablesRegisterItemCashDiscountDeductibleNetAmount has a Net qualifier.

TradeReceivablesPayablesRegisterItemCashDiscountDeductibleGrossAmount is a GDT of type Amount. In some implementations, the TradeReceivablesPayablesRegisterItemCashDiscountDeductibleGrossAmount has a Gross qualifier. The TradeReceivablesPayablesRegisterItemMaximumCashDiscountEndDate is a GDT of type Date.

In some implementations, the TradeReceivablesPayablesRegisterItemMaximumCashDiscountEndDate has a Due qualifier.

TradeReceivablesPayablesRegisterItemNormalCashDiscountEndDate is a GDT of type Date. In some implementations, the TradeReceivablesPayablesRegisterItemNormalCashDiscountEndDate has a Due qualifier.

TradeReceivablesPayablesRegisterItemFullPaymentEndDate is a GDT of type Date. In some implementations, the TradeReceivablesPayablesRegisterItemFullPaymentEndDate has a End qualifier.

TradeReceivablesPayablesRegisterItemCentralBankReportTotalAmount is a GDT of type Amount. In some implementations, the TradeReceivablesPayablesRegisterItemCentralBankReportTotalAmount has a Total qualifier.

TradeReceivablesPayablesRegisterItemLastCentralBankReportDate is a GDT of type Date. In some implementations, the TradeReceivablesPayablesRegisterItemLastCentralBankReportDate has a CentralBankReport qualifier.

TradeReceivablesPayablesRegisterItemStatus is a IDT of type TradeReceivablesPayablesRegisterItemStatus.

ID is a GDT of type BusinessTransactionDocumentItemSplitItemID.

UUID is a GDT of type UUID.

OriginSplitItemID is a GDT of type BusinessTransactionDocumentItemID.

DueClearingID is a GDT of type BusinessTransactionDocumentID.

DueClearingUUID is a GDT of type UUID,

PaymentAdviceID is a GDT of type BusinessTransactionDocumentID.

PaymentAdviceUUID is a GDT of type UUID.

LastChangeBusinessTransactionDocumentReference is a GDT of type BusinessTransactionDocumentReference.

SystemAdministrativeData is a GDT of type SystemAdministrativeData.

DueClearingDate is a GDT of type Date. In some implementations, the DueClearingDate has a Clearing qualifier.

DueClearingIndicator is a GDT of type Indicator. In some implementations, the DueClearingIndicator has a DueClearing qualifier.

TransactionCurrencyAmount is a GDT of type Amount. In some implementations, the TransactionCurrencyAmount has a TransactionCurrency qualifier.

ClearedAmount is a GDT of type Amount. In some implementations, the ClearedAmount has a Cleared qualifier.

CashDiscountAmount is a GDT of type Amount. In some implementations, the CashDiscountAmount has a CashDiscount Qualifier.

MaximumCashDiscountAmount is a GDT of type Amount. In some implementations, the MaximumCashDiscountAmount has a CashDiscount qualifier.

NormalCashDiscountAmount is a GDT of type Amount. In some implementations, the NormalCashDiscountAmount has a CashDiscount qualifier.

DeductionAmount is a GDT of type Amount. In some implementations, the DeductionAmount has a Deduction qualifier.

CashDiscountTerms is a GDT of type CashDiscountTerms.

WithholdingTaxAmount is a GDT of type Amount. In some implementations, the WithholdingTaxAmount has a WithholdingTax qualifier.

PaymentCurrencyCode is a GDT of type CurrencyCode. In some implementations, the PaymentCurrencyCode has a Payment qualifier.

PaymentAmount is a GDT of type Amount. In some implementations, the PaymentAmount has a Payment qualifier.

CashDiscountLevelCode is a GDT of type CashDiscountLevelCode.

PaymentDifferenceReasonCode is a GDT of type PaymentDifferenceReasonCode.

ExchangeRate is a GDT of type ExchangeRate.

Note is a GDT of type Note.

Status is a IDT of type TradeReceivablesPayablesRegisterItemSplitItemStatus.

PaymentControlUUID is a GDT of type UUID.

PaymentControlPaymentProcessingCompanyID is a GDT of type OrganisationalCentreID.

PaymentControlPaymentProcessingCompanyUUID is a GDT of type UUID.

PaymentControlPaymentProcessingBusinessPartnerUUID is a GDT of type UUID.

PaymentControlPaymentProcessingBusinessPartnerInternalID is a GDT of type BusinessPartnerInternalID.

PaymentControlResponsibleEmployeeUUID is a GDT of type UUID.

PaymentControlResponsibleEmployeeID is a GDT of type UUID.

PaymentControlPropertyMovementDirectionCode is a GDT of type PropertyMovementDirectionCode.

PaymentControlPaymentFormCode is a GDT of type PaymentFormCode.

PaymentControlPaymentAmount is a GDT of type Amount. In some implementations, the PaymentControlPayment Amount has a Payment qualifier.

PaymentControlExchangeRate is a GDT of type ExchangeRate.

PaymentControlPaymentBlock is a GDT of type PaymentBlock.

PaymentControlFirstPaymentInstructionCode is a GDT of type PaymentInstructionCode.

PaymentControlSecondPaymentInstructionCode is a GDT of type PaymentInstructionCode.

PaymentControlThirdPaymentInstructionCode is a GDT of type PaymentInstructionCode.

PaymentControlFourthPaymentInstructionCode is a GDT of type PaymentInstructionCode.

PaymentControlBankChargeBearerCode is a GDT of type BankChargeBearerCode.

PaymentControlPaymentPriorityCode is a GDT of type BusinessTransactionPriorityCode PaymentControlSinglePaymentIndicator is a GDT of type Indicator. In some implementations, the PaymentControlSinglePaymentIndicator has a SinglePayment qualifier.

PaymentControlDebitValueDate is a GDT of type Date. In some implementations, the PaymentControlDebitValueDate has a Value qualifier.

PaymentControlCreditValueDate is a GDT of type Date. In some implementations, the PaymentControlCreditValueDate has a Value qualifier.

PaymentControlPaymentReceivablesPayablesGroupID is a GDT of type PaymentReceivablesPayablesGroupID.

PaymentControlScandinavianPaymentReferenceID is a GDT of type PaymentReferenceID.

PaymentControlSwissPaymentReferenceID is a GDT of type PaymentReferenceID.

PaymentControlBankTransferHouseBankAccountUUID is a GDT of type UUID.

PaymentControlBankTransferHouseBankAccountInternalID is a GDT of type BankAccountInternalID.

PaymentControlBankTransferBusinessPartnerBankDetailsID is a GDT of type BusinessPartnerBankDetai lID.

PaymentControlChequePaymentHouseBankAccountUUID is a GDT of type UUID.

PaymentControlChequePaymentHouseBankAccountInternalID is a GDT of type BankAccountInternalID.

PaymentControlCreditCardPaymentPaymentCardID is a GDT of type PaymentCardID.

PaymentControlCreditCardPaymentPaymentCardTypeCode is a GDT of type PaymentCardTypeCode.

PaymentControlCreditCardPaymentBusinessPartnerPaymentCardDetailsID is a GDT of type BusinessPartnerPaymentCardDetailsID.

PaymentControlCreditCardPaymentPaymentCardDataOriginTypeCode is a GDT of type DataOriginTypeCode.

PaymentControlCreditCardPaymentPaymentCardVerificationValueText is a GDT of type PaymentCardVerificationValueText.

PaymentControlCreditCardPaymentPaymentCardVerificationValueAvailabilityCode is a GDT of type PaymentCardVerificationValueAvailabilityCode.

PaymentControlCreditCardPaymentPaymentCardVerification-

ValueCheckRequiredIndicator is a GDT of type Indicator. In some implementations, the PaymentControlCreditCardPaymentPaymentCardVerification-ValueCheckRequiredIndicator has a Required qualifier.

PaymentControlCashPaymentCashStorageUUID is a GDT of type UUID.

PaymentControlCashPaymentCashStorageID is a GDT of type CashStorageID.

The DO PaymentControl is the agreement between the company and the business partner (Payer/Payee of the trade receivable/payable) regarding payment processing for trade receivable/payable items. The DO PaymentControl is described in the PIC document for the DO.

The ItemSplitItemClearingItem is the clearing item that documents the clearing of the SplitItem. The elements located at the TradeReceivablesPayablesRegisterItemSplitItemClearingItem node These elements may include: UUID, DueClearingItemID, DueClearingItemUUID, TransactionCurrencyCode, DunningLevelValue, TransactionCurrencyAmount, CashDiscountAmount, DeductionAmount, WithholdingTaxAmount, ClearedByTradeReceivablesPayables-RegisterItemBaseBusinessTransactionDocumentReference, ClearedByTradeReceivablesPayablesRegisterItemSplitItemUUID, ClearedByTradeReceivablesPayablesRegisterItemSplitItemID, ClearedByTradeReceivablesPayablesRegisterItemTypeCode, and ClearedByTransactionCurrencyAmount.

The UUID is the universally unique identifier of this clearing item. The UUID is a GDT of type UUID. In some implementations, the UUID can be an alternative key.

The DueClearingItemID is the identifier of the corresponding DueClearingItem. The DueClearingItemID is a GDT of type BusinessTransactionDocumentItemID.

The DueClearingItemUUID is the universally unique identifier of the corresponding DueClearingItem. The DueClearingItemUUID is a GDT of type UUID.

The TransactionCurrencyCode is the currency of the trade receivable/payable (original currency of the underlying business document). The TransactionCurrencyCode is a GDT of type CurrencyCode.

The DunningLevelValue is the current dunning level. The DunningLevelValue is the GDT of type DunningLevelValue, and is optional.

The TransactionCurrencyAmount is the partial amount of the SplitItem in this clearing. The TransactionCurrencyAmount is a GDT of type Amount. In some implementations, the TransactionCurrencyAmount has a TransactionCurrency qualifier.

The CashDiscountAmount is the Claimed cash discount amount deducted at the SplitItem during clearing. The CashDiscountAmount is a GDT of type Amount. In some implementations, the CashDiscountAmount has a CashDiscount qualifier, and is optional.

The DeductionAmount is the amount deducted at the SplitItem during clearing. The Deduction Amount is a GDT of type Amount. In some implementations, the DeductionAmount has a Deduction qualifier, and is optional.

The WithholdingTaxAmount is the withholding tax amount deducted at the SplitItem during clearing.

The WithholdingTaxAmount is a GDT of type Amount. In some implementations, the WithholdingTaxAmount has a WithholdingTax qualifier, and is optional.

ClearedByTradeReceivablesPayablesRegisterItemBaseBusinessTransactionDocumentReference is the reference to the business document on which the item is based that cleared the SplitItem. The ClearedByTradeReceivablesPayablesRegisterItemBaseBusinessTransactionDocumentReference is a GDT of type BusinessTransactionDocumentReference.

The ClearedByTradeReceivablesPayablesRegisterItemSplitItemUUID is the universally unique identifier of the other SplitItem that cleared the SplitItem. The ClearedByTradeReceivablesPayablesRegisterItemSplitItemUUID is a GDT of type UUID.

ClearedByTradeReceivablesPayablesRegisterItemSplitItemID is the identifier of the other SplitItem that cleared the SplitItem. The ClearedByTradeReceivablesPayablesRegisterItemSplitItemID is a GDT of type BusinessTransactionDocumentItemSplitItemID.

ClearedByTradeReceivablesPayablesRegisterItemTypeCode is the type of the Item that cleared the SplitItem. The ClearedByTradeReceivablesPayablesRegisterItemTypeCode is a GDT of type TradeReceivablesPayablesRegisterItemTypeCode.

ClearedByTransactionCurrencyAmount is the partial amount of the other SplitItem in transaction currency that cleared the SplitItem. The ClearedByTransactionCurrencyAmount is a GDT of type TradeReceivablesPayablesRegisterItemTypeCode.

To node ItemSplitItemClearingItem, ClearedByClearingItem has a cardinality of c:c. and is the ClearingItem of the other SplitItem that cleared the SplitItem.

The ItemCentralBankReportItem is the information that is required for reporting to the central bank in accordance with German foreign trade regulations for the foreign payment of a trade receivable or payable. The elements located directly at the TradeReceivablesPayablesRegisterItemCentralBankReportItem node are defined by the TradeReceivablesPayablesRegisterItemCentralBankReportItem Elements data type. These elements may include CentralBankReportItem. The CentralBankReportItem is the reporting information for the central bank. The CentralBankReportItem is a GDT of type CentralBankReportItem. The integrity conditions may exist, such that there can be multiple CentralBankReportItems for an item because an invoice can contain multiple CentralBankReportItems.

The AccountBalance is the Period-based totals of amounts of the item in a TradeReceivablesPayablesAccount. (Period is understood here as an operative period (not an accounting period). A "natural" interval is chosen (this will probably always be a month)). The elements found directly at the TradeReceivablesPayablesRegisterAccountBalance node are defined by the data type: TradeReceivablesPayablesRegisterAccountBalanceElements. These elements include: TradeReceivablesPayablesAccountUUID, CompanyID, BusinessPartnerInternalID, DatePeriod, DueCategoryCode, PartyRoleCategoryCode, TransactionCurrencyCode, TransactionCurrencyAmount, CashDiscountAmount, DeductionAmount, WithholdingTaxAmount, Status, ClearingStatusCode, and BaseBusinessTransactionDocumentCancellationStatusCode.

The TradeReceivablesPayablesAccountUUID is the identifier of the business account of the items included in this total (from Item TradeReceivablesPayablesAccountID).

The CompanyID is the unique Identifier of the company of the items included in this total (from Root-CompanyID). The CompanyID is a GDT of type OrganisationalCentreID.

The BusinessPartnerInternalID is the unique Identifier of the business partner of the items included in this total (from Item-BusinessPartnerInternalID). The BusinessPartnerInternalID is a GDT of type BusinessPartnerInternalID.

The DatePeriod is the time period of the items included in this total (all items whose ItemBaseBusinessTransactionDate is within the period are included in the total). The DatePeriod is a GDT of type DatePeriod.

The DueCategoryCode is the due category of the item: Trade receivable or payable. The DueCategoryCode is a GDT: DueCategoryCode.

The PartyRoleCategoryCode is the PartyRoleCategoryCode of the items included in this total (from item-PartyRoleCategoryCode). The PartyRoleCategoryCode is a GDT of type PartyRoleCategoryCode with possible constraints that 3=Creditor Party, 4=Debtor Party.

The TransactionCurrencyCode is the currency of the amount of the items included in this total (from Item-TransactionCurrencyCode). The TransactionCurrencyCode is a GDT of type CurrencyCode.

The TransactionCurrencyAmount is the total of the amounts (from ItemTransactionCurrencyAmount).

The TransactionCurrencyAmount is a GDT of type Amount. In some implementations, the TransactionCurrencyAmount has a TransactionCurrency qualifier.

The CashDiscountAmount is the total of claimed cash discount amounts (from ItemCashDiscountAmount). The CashDiscountAmount is a GDT of type Amount. In some implementations, the CashDiscountAmount has a CashDiscount qualifier.

The DeductionAmount is the total of claimed non-cash discount deductions (from ItemDeductionAmount). The DeductionAmount is a GDT of type Amount. In some implementations, the DeductionAmount has a Deduction qualifier.

The WithholdingTaxAmount is the total of the withholding tax amounts (from ItemWithholdingTaxAmount). The WithholdingTaxAmount is a GDT of type Amount. In some implementations, the WithholdingTaxAmount has a WithholdingTax qualifier.

The Status is the status of the balance. The Status is a IDT of type TradeReceivablesPayablesRegisterAccountBalanceStatus. The IDT TradeReceivablesPayablesRegisterAccountBalanceStatus consists of the following elements: ClearingStatusCode, and BaseBusinessTransactionDocumentCancellationStatusCode.

The ClearingStatusCode is the clearing status of the items that are included in this total. The ClearingStatusCode is a GDT of type ClearingStatusCode.

The BaseBusinessTransactionDocumentCancellationStatusCode is the cancellation status of the business documents on which this item is based that are included in this total. The BaseBusinessTransactionDocumentCancellationStatusCode is a GDT of type CancellationStatusCode.

There may be a number of Inbound aggregation relationships including from business object TradeReceivablesPayablesAccount (or node TradeReceivablePayableAccount) the Account (which may have a cardinality of 1:cn, wherein the Account is the TradeReceivablesPayablesAccount that belongs to the total.

The QueryByElements provides a list of totals items for different characteristics. The Query elements are defined by the data type TradeReceivablesPayablesRegisterAccountBalanceElementsQueryElements. These elements may include: TradeReceivablesPayablesAccountUUID, DatePeriod, DueCategoryCode, PartyRoleCategoryCode, and Status. The TradeReceivablesPayablesAccountUUID is a GDT of type UUID, and is optional. The DatePeriod is a GDT of type DatePeriod, and is optional. The DueCategoryCode is a GDT of type DueCategoryCode. The PartyRoleCategoryCode is an optional (GDT of type PartyRoleCategoryCode) with possible constraints that 3=Creditor Party, 4=Debtor Party.

The TransactionCurrencyCode is a GDT of type CurrencyCode, and is optional. The Status is a IDT of type TradeReceivablesPayablesRegisterAccountBalanceStatus, and is optional.

The CompanyBalance is the Period-based total of amounts of the item of the company. The elements found at the node TradeReceivablesPayablesRegisterCompanyBalance are defined by the data type: TradeReceivablesPayablesRegisterCompanyBalanceElements. These elements include: CompanyUUID, CompanyID, DatePeriod, DueCategoryCode, PartyRoleCategoryCode, TransactionCurrencyCode, TransactionCurrencyAmount, CashDiscountAmount, DeductionAmountMandatory, WithholdingTaxAmount, Status, ClearingStatusCode, and BaseBusinessTransactionDocumentCancellationStatusCode.

The CompanyUUID is the universally unique identifier of the company of the items included in this total (from Root-CompanyUUID). The Company UUID is a GDT of type UUID.

The CompanyID is the unique Identifier of the company of the items included in this total (from Root-CompanyID) The CompanyID is a GDT of type OrganisationalCentreID.

The DatePeriod is the time period of the items included in this total (all items whose ItemBaseBusinessTransactionDate is within the period are included in the total). The DatePeriod is a GDT of type DatePeriod.

The DueCategoryCode is the due category (receivable or payable) of the items included in this total (from Item-DueCategoryCode) The DueCategoryCode is a GDT of type DueCategoryCode.

The PartyRoleCategoryCode is the PartyRoleCategoryCode of the items included in this total (from item-PartyRoleCategoryCode). The PartyRoleCategoryCode is a GDT: PartyRoleCategoryCode with possible constraints that 3=Creditor Party, 4=Debtor Party.

TheTransactionCurrencyCode is the currency of the amount of the items included in this total (from Item-TransactionCurrencyCode). The TransactionCurrencyCode is a GDT of type CurrencyCode.

The TransactionCurrencyAmount is the total of the amounts (from ItemTransactionCurrencyAmount). The TransactionCurrencyAmount is a GDT of type Amount. In some implementations, the TransactionCurrencyAmount has a TransactionCurrency qualifier.

The CashDiscountAmount is the total of claimed cash discount amounts (from ItemCashDiscountAmount). The CashDiscountAmount is a GDT of type Amount. In some implementations, the CashDiscountAmount has a CashDiscount qualifier.

The DeductionAmount is the total of claimed non-cash discount deductions (from ItemDeductionAmount). The DeductionAmount is a GDT of type Amount. In some implementations, the DeductionAmount has a Deduction qualifier.

The WithholdingTaxAmount is the total of the withholding tax amounts (from ItemWithholdingTaxAmount). The WithholdingTaxAmount is a GDT of type Amount. In some implementations, the WithholdingTaxAmount has a WithholdingTax qualifier.

The Status is the status of the balance. The Status is a IDT of type TradeReceivablesPayablesRegisterCompanyBalanceStatus). The IDT TradeReceivablesPayablesRegisterCompanyBalanceStatus consists of the following elements: ClearingStatusCode, and BaseBusinessTransactionDocumentCancellationStatus Code.

The ClearingStatusCode is the clearing status of the items that are included in this total. The ClearingStatusCode is a GDT of type ClearingStatusCode.

The BaseBusinessTransactionDocumentCancellationStatusCode is the cancellation status of the business documents on which this item is based that are included in this total. The BaseBusinessTransactionDocumentCancellationStatusCode is a GDT of type CancellationStatusCode.

There may be a number of Inbound Aggregation Relationships including from business object Company (or node Company) the Company (which may have a cardinality relationship of 1:cn, wherein Company is the company that belongs to the total.

The QueryByElements provides a list of totals items for different characteristics. The Query elements are defined by the data type TradeReceivablesPayablesRegisterCompanyBalanceElementsQueryElements. These elements include: CompanyUUID, DatePeriod, DueCategoryCode, PartyRoleCategoryCode, TransactionCurrencyCode, and Status. The CompanyUUID is a GDT of type UUID, and is optional. The DatePeriod is a GDT of type DatePeriod, and is optional. The DueCategoryCode is a GDT of type DueCategoryCode, and is optional. The PartyRoleCategoryCode is an optional GDT of type PartyRoleCategoryCode with possible constraints with 3=Creditor Party, 4=Debtor Party. The TransactionCurrencyCode is a GDT of type CurrencyCode, and is optional. The Status is a IDT type of TradeReceivablesPayablesRegisterCompanyBalance Status, and is optional.

The LiquidityInformationItem is the information about realized or expected cash receipts and cash disbursements (liquidity) from receivables and payables. The elements located at the TradeReceivablesPayablesRegisterLiquidityInformationItem node are defined by the TradeReceivablesPayablesRegister-LiquidityInformationItemElements data type. These elements may include: BaseBusinessTransactionDocumentReference, CompanyUUID, CompanyID, LiquidityItemGroupCode, LiquidityItemOperationalProcessProgressCategoryCode, LiquidityItemBusinessTransactionDocumentStatusCategoryCode, PaymentFormCode, HouseBankAccountUUID, CashStorageUUID, LiquidityItemDescription, TransactionCurrencyAmount, and ValueDateTime.

The BaseBusinessTransactionDocumentReference is the reference to the business document on which this item is based. If the item is based on an aggregation of business transactions, the BaseBusinessTransactionDocumentReference is not filled. The BaseBusinessTransactionDocumentReference is a GDT of type BusinessTransactionDocumentReference, and is optional.

The CompanyUUID is the universally unique identifier of the company to which the item belongs. The CompanyUUID is a GDT of type UUID.

The CompanyID is the internal identifier of the company to which the itemTradeReceivablesPayablesRegister belongs. The CompanyID is a GDT of type OrganisationalCentreID.

The LiquidityItemGroupCode is the coded representation of the group to which the item belongs. The grouping takes place using business characteristics from the base business process. The LiquidityItemGroupCode is a GDT of type LiquidityItemGroupCode.

The LiquidityItemOperationalProcessProgressCategoryCode is the coded representation of the type of the processing progress of the base business process. The LiquidityItemOperationalProcessProgressCategoryCode is a GDT of type LiquidityItemOperationalProcessProgressCategoryCode.

The LiquidityItemBusinessTransactionDocumentStatusCategoryCode is the coded representation of the status of the base business process. The LiquidityItemBusinessTransactionDocumentStatusCategoryCode is a GDT of type LiquidityItemBusinessTransactionDocumentStatusCategoryCode)

The PaymentFormCode is the coded representation of the payment form of the business process based on the Item. The PaymentFormCode is a GDT of type PaymentFormCode, and is optional.

The HouseBankAccountUUID is the House bank account at which the inflow or outflow of liquidity took place or will take place. The HouseBankAccountUUID is a GDT of type UUID, and is optional.

TheCashStorageUUID is the storage location for cash in which the inflow or outflow of liquidity took place or will take place. The CashStorageUUID is a GDT of type UUID, and is optional.

The LiquidityItemDescription contains a description of the item. The LiquidityItemDescription is a GDT of type LiquidityItemDescription, and is optional.

The TransactionCurrencyAmount contains the amount of the item in transaction currency. The TransactionCurrencyAmount is a GDT of type Amount. In some implementations, the TransactionCurrencyAmount has a TransactionCurrencyAmount qualifier.

The ValueDateTime is realized or expected value date of the item. The ValueDateTime is a GDT of type Datetime. In some implementations, the TransactionCurrencyAmount has a ValueDateTime qualifier.

The CreateForLiquidityForecastProfile action creates LiquidityInformationItems for a given LiquidityForecastProfile. The LiquidityForecastProfile is a combination of specifications (such as currencies, liquidity groups, liquidity categories, and the time interval). In some implementations, Changes to the object can occur, such that LiquidityInformationItems will be created according to the given LiquidityForecastProfile. Parameters may be that the action elements are defined by the data type: TradeReceivablesPayablesRegisterLiquidityInformation-ItemCreateForLiquidityForecastProfileActionElements. These elements may include LiquidityForecastProfileCode.

The LiquidityForecastProfileCode is coded representation of the liquidity forecast profile. The LiquidityForecastProfileCode is a GDT of type LiquidityForecastProfileCode In some implementations, this action will be called by the inbound agent for the Query Liquidity Information operation The DO: AccessControlList is a list of access groups that have access to a Trade Receivables Payables Register during a validity period.

Business Object TradeReceivablesPayablesRegister

The Business Object TradeReceivablesPayablesRegister represents the trade receivables/payables from goods and services of a company from/to its business partners. In the following, trade receivables/payables from goods and services will be referred to as trade receivables/payables.

The business object TradeReceivablesPayablesRegister is part of the process component Due Item Processing.

The TradeReceivablesPayablesRegister contains the trade receivables and payables of a company for each business transaction and the totals for trade receivables and payables per company and business partner. The extension of TradeReceivablesPayablesRegister captures additional information regarding the legally required document number on the Customer/Supplier Invoice which, in some implementations, may be sequential, chronological and without gaps. In some implementations, this number is required for reporting to the authorities (e.g. tax authority).

Business Object TradeReceivablesPayablesRegister may include service interfaces to SupplierInvoiceProcessing_DueItemProcessing, CustomerInvoiceProcessing_DueItemProcessing, and ExpenseReimbursement_DueItemProcessing.

The root node of TradeReceivablesPayablesRegister is extended with additional fields and are defined by the data type enhancement structure TradeReceivablesPayablesRegisterODNEnhancementExtensionElements. These elements may include: LegallyRequiredInvoiceID, and LegallyRequiredInvoiceDateTime. The LegallyRequiredInvoiceID is a unique identifier for an Invoice which meets the requirements of legal authorities. The requirements for the procedure of generating a legal identifier depends on the country legislation. The LegallyRequiredInvoiceID contains a number that company has to maintain because of country-specific legal requirements. This legal number is typically sequential, chronological and without gaps. The LegallyRequiredInvoiceID is a GDT of type BusinessTransactionDocumentID. The LegallyRequiredInvoiceDateTime is the Date and time when the LegallyRequiredInvoiceID for a customer Invoice was generated. The LegallyRequiredInvoiceDateTime is used for maintaining legal requirements. The LegallyRequiredInvoiceDateTime is a GDT of type DateTime.

The DueItemProcessingReceivablesPayablesIn is the service interface consisting of the message type ReceivablesPayablesNotification enhanced with field LegallyRequiredInvoiceID (a GDT of type BusinessTransactionDocumentID) and LegallyRequiredInvoiceDateTime (a GDT of type DateTime).

The MaintainTradeandTaxReceivablesPayables is the extension of the Inbound Process agent. The MaintainTradeandTaxReceivablesPayables is enhanced with field LegallyRequiredInvoiceID (a GDT of type BusinessTransactionDocumentID) and LegallyRequiredInvoiceDateTime (a GDT of type DateTime).

Figure 52:
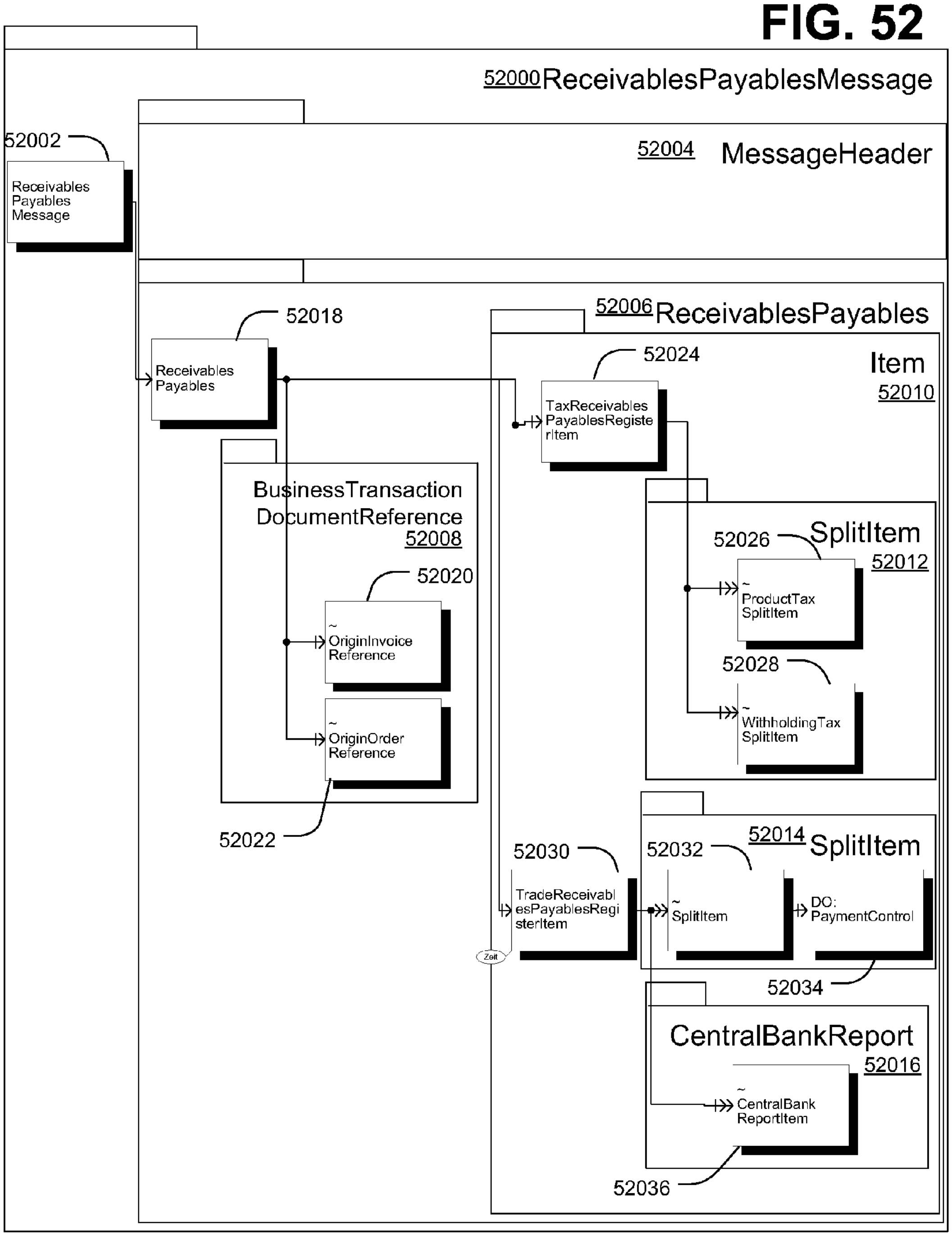
FIG. 52 shows an exemplary ReceivablesPayables_ReceivablesPayablesMessage Message Data Type.

FIG. 52 illustrates one example logical configuration of ReceivablesPayablesMessage message 52000. Specifically, this figure depicts the arrangement and hierarchy of various components such as one or more levels of packages, entities, and datatypes, shown here as 52000 through 52036. As described above, packages may be used to represent hierarchy levels. Entities are discrete business elements that are used during a business transaction. Data types are used to type object entities and interfaces with a structure. For example, ReceivablesPayablesMessage message 52000 includes, among other things, ReceivablesPayables 52006. Accordingly, heterogeneous applications may communicate using this consistent message configured as such.

FIG. 53-1 through 53-27 illustrates one example logical configuration of ReceivablesPayablesNotification message 53000. Specifically, this figure depicts the arrangement and hierarchy of various components such as one or more levels of packages, entities, and datatypes, shown here as 53000 through 53437. As described above, packages may be used to represent hierarchy levels. Entities are discrete business elements that are used during a business transaction. Data types are used to type object entities and interfaces with a structure. For example, ReceivablesPayablesNotification message 53000 includes, among other things, ReceivablesPayables 53016. Accordingly, heterogeneous applications may communicate using this consistent message configured as such.

Message Types and their Signatures

This section describes the message types and their signatures that are derived from the operations of the ReceivablesPayablesNotificationReceivablesPayables object. ReceivablesPayables contains the TradeReceivablesPayablesRegister and TaxReceivablesPayablesRegister business objects as specializations so that these can be used both individually and together for the signatures of the message types. The message data type defines the structure of the following message types.

Motivating Business Scenarios. The message ReceivablesPayablesNotification is motivated by the business scenarios Procure to Stock, Sell from Stock and Expense and Reimbursement Management.

After checking an incoming invoice in the process component SupplierInvoicing, creating an outgoing invoice in the process component CustomerInvoicing, or creating an expense report in the process component Expense and Reimbursement Management, a message is transferred to the process component DueItemProcessing to generate open receivables/payables items to and from the business partners and open tax receivables and payables to and from the tax office and thus triggers the follow-on processes of payment and tax reporting.

The ReceivablesPayablesNotification is the notification of receivables or payables of a company from or to a business partner or tax office for a business transaction within goods and services. The receivables or payables from or to the business partner and tax office are usually transferred with an invoice to DueItemProcessing for the operative further processing. For legal reasons, however, alternative events such as the delivery can be relevant for tax. The ReceivablesPayablesNotification message type is based on the ReceivablesPayablesMessage message data type. In some implementations, this message type is used in the following operations of business objects: CustomerInvoiceProcessing, NotifyOfInvoice, SupplierInvoiceProcessing, NotifyOfInvoice, ExpenseAndReimbursementManagement, NotifyOfSettlementResult, TradeReceivablesPayablesRegister, CreateReceivablesPayables, TaxReceivablesPayablesRegister, and CreateReceivablesPayables The ReceivablesPayablesNotification is used in the following business transactions: to check an incoming invoice, to create an outgoing invoice, to check an incoming credit memo, and to create an outgoing credit memo, and to create an expense report (ExpenseAndReimbursementManagement).

When a trade receivable or payable is received in TradeReceivablesPayablesRegister, one or more open trade receivables/payables items are generated. These open items are the basis for process steps such as clearing receivables and payables of a business partner, payment instruction to a bank, payment collection, assignment of an incoming payment (bank statement) to a receivable, dunning notice, and dispute Management (e.g. clarifying disputed payments)

The ReceivablesPayablesCancellationNotification is the Request to DueItemProcessing to cancel a previously sent ReceivablesPayablesNotification. The structure of this message type is determined by the ReceivablesPayablesMessage message data type. This message type is used in the following operations of business objects: CustomerInvoiceProcessing, NotifyOfInvoiceCancellation, SupplierInvoiceProcessing, NotifyOfInvoiceCancellation, ExpenseAndReimbursementManagement, NotifyOfSettlementResultCancellation, TradeReceivablesPayablesRegister, CancelReceivablesPayables, TaxReceivablesPayablesRegister, and CancelReceivablesPayables. The object to be cancelled is identified by a reference to the creating object.

The ReceivablesPayablesMessage contains a ReceivablesPayables object contained in the business document. It represents the business information that is relevant for sending a business document in a message. The ReceivablesPayablesMessage contains the following packages: MessageHeaderPackage and ReceivablesPayablesPackage. The message data type, therefore, provides the structure for the following message types and the operations that are based on them: ReceivablesPayablesNotification and ReceivablesPayablesCancellationNotification The MessageHeaderPackage is the grouping of business information that is relevant for sending a business document in a message. The MessageHeaderPackage contains the following entities: MessageHeader, and MessageHead. Furthermore, the MessageHeaderPackage is a grouping of business information from the perspective of the sending application, and may include identification of the business document in a message, information about the sender, and information about the recipient. MessageHeaderPackage is optional.

The MessageHeader is of the type GDT BusinessDocumentMessageHeader, whereby the following elements of the GDT are used: ID, and ReferenceID.

The ReceivablesPayables Package is the grouping of the ReceivablesPayables with its packages: BusinessTransactionDocumentReferencePackage and ItemPackage.

The Integrity Conditions may exist such that all attributes should be specified for the ReceivablesPayablesNotification message type. Furthermore, in some implementations the ReceivablesPayablesCancellationNotification message type may only contain the ReceivablesPayables entity and therein only the BaseBusinessTransactionDocumentID element and no other packages.

The ReceivablesPayables is the representation of a business transaction document in DueItemProcessing that contains receivables or payables of a company from or to a business partner or tax office. These elements may include one or more of the following: BaseBusinessTransactionDocumentReference, CancelledBusinessTransactionDocumentReference, BaseBusinessTransactionDocumentDate, BaseBusinessTransactionDocumentReceiptDate, AccountingTransactionDate, CompanyID, and Party Package. The BaseBusinessTransactionDocumentReference is the Reference to the base business transaction document or its document (e.g. Prima Nota). The BaseBusinessTransactionDocumentReference is a GDT of type BusinessTransactionDocumentReference. The CancelledBusinessTransactionDocumentReference is the reference to the business transaction document to be canceled or its document (e.g. Prima Nota). The CancelledBusinessTransactionDocumentReference is a GDT of type BusinessTransactionDocumentReference. The BaseBusinessTransactionDocumentDate is the issue date of the base business transaction document. The BaseBusinessTransactionDocumentReceiptDate is the receipt date of the base business transaction document. The AccountingTransactionDate is the date on the basis of which the posting date in Financial Accounting is determined. The AccountingTransactionDate is a GDT of type Date. In some implementations, the AccountingTransactionDate has a Transaction qualifier. The CompanyID is a unique identifier of the company that is responsible for the business transaction. The CompanyID is a GDT of type OrganisationalCentreID. The Party Package is the grouping of all business partners that might be involved in a due payment. In some implementations, the Party Package may contain the following entities: Debtor Party and Creditor Party In some instances, the Integrity Conditions may exist such that a default logic is used for all business partners, the default logic being that business partners that are specified at header level are used for all items for which corresponding partners are not explicitly transmitted.

The Debtor Party is the owner of the payable. The Debtor Party is of the type GDT BusinessTransactionDocumentParty, and may contain the elements InternalID and TaxID. In some implementations, additional elements are not needed because the master data may be available in the sender and receiver systems to enable operational work. Additionally, the Integrity Conditions may exist such that the Debtor Party may be specified. In some implementations, TaxID may only be filled if the Debtor Party has multiple TaxIDs and the TaxID is relevant for a tax declaration.

The Creditor Party is the owner of the receivable. The Creditor Party is of the type GDT BusinessTransactionDocumentParty, but contains the element InternalID. In some implementations, additional elements are not needed because the master data may be available in the sender and receiver systems to enable operational work. Additionally, The Integrity conditions may exist such that the Creditor Party may be specified.

The ReceivablesPayablesBusinessTransactionDocumentReference Package is the grouping of all references to business documents based on the receivables and payables. The ReceivablesPayablesBusinessTransactionDocumentReference Package may contain the following entities: PartnerBaseBusinessTransactionDocumentReference, OriginInvoiceBusinessTransactionDocumentReference, OriginOrderBusinessTransactionDocumentReference, and OriginContractBusinessTransactionDocumentReference. The PartnerBaseBusinessTransactionDocumentReference is the reference to the business transaction document assigned by the business partner (e.g. such as the identifier for the SupplierInvoice assigned by the Supplier). PartnerBaseBusinessTransactionDocumentReference is of the type GDT BusinessTransactionDocumentReference. The OriginInvoiceBusinessTransactionDocumentReference is the reference to an existing SupplierInvoice or CustomerInvoice to which the business document (or source document) based on the current trade receivable/payable is a follow-on document. The OriginInvoiceBusinessTransactionDocumentReference is of the type GDT BusinessTransactionDocumentReference, and the SupplierInvoice and CustomerInvoice codes are used in the TypeCode attribute. The OriginOrderBusinessTransactionDocumentReference is the reference to an existing SalesOrder or PurchaseOrder to which the business document or source document based on the current trade receivable/payable is a follow-on document. The OriginOrderBusinessTransactionDocumentReference is of the type GDT BusinessTransactionDocumentReference, and the SalesOrder and PurchaseOrder codes are used in the TypeCode attribute.

The OriginContractBusinessTransactionDocumentReference is the reference to an existing SalesContract or PurchaseContract to which the business document (or source document) based on the current trade receivable/payable is a follow-on document. The OriginContractBusinessTransactionDocumentReference is of the type GDT BusinessTransactionDocumentReference, and the SalesContract and PurchasingContract codes are used in the TypeCode attribute.

The ReceivablesPayablesItem Package is the grouping of all receivables and payables of a company to or from a business partner or tax office from the base business document. The ReceivablesPayablesItem Package contains the entities TaxReceivablesPayablesRegisterItem, TradeReceivablesPayablesRegisterItem, and the subordinate packages. The TaxReceivablesPayablesRegisterItem is a tax receivable or payable from the base business document from or to a tax office.

The ReceivablesPayablesTaxReceivablesPayablesRegisterItemSplitItem Package is the grouping of product taxes and withholding taxes. The ReceivablesPayablesTaxReceivablesPayablesRegisterItemSplitItem Package contains the following entities: ProductTaxSplitItem, and WithholdingTaxSplitItem. The ProductTaxSplitItem is the aggregation of the elements of a specific type of product tax. These elements may include: BaseBusinessTransactionDocumentItemTypeCode, TypeCode, DeliveryDate, TaxDueDate, CashDiscountDeductibleIndicator, and ProductTax. The BaseBusinessTransactionDocumentItemTypeCode is the coded representation of the type of an item within a document that occurs in business transactions. The BaseBusinessTransactionDocumentItemTypeCode is a GDT of type BusinessTransactionDocumentItemTypeCode. The TypeCode is the coded representation of the type of the ProductTaxSplitItem. The TypeCode is a GDT of type TaxReceivablesPayablesRegisterItemSplitItemTypeCode. The DeliveryDate is the Delivery date. The DeliveryDate is a GDT of type Date. In some implementations, the DeliveryDate has a Delivery qualifier. The TaxDueDate is the date on which the tax is due. The TaxDueDate is a GDT of type Date. In some implementations, the TaxDueDate has a Due qualifier.

The CashDiscountDeductibleIndicator is the indicator whether or not the product tax qualifies for a cash discount. The CashDiscountDeductibleIndicator is a GDT of type CashDiscountDeductibleIndicator.

The ProductTax is the tax that is incurred for product-related business transactions, such as purchasing, sales or consumption. The ProductTax is a GDT of type ProductTax. The TransactionCurrencyProductTax is the tax that is incurred for product-related business transactions, such as purchasing, sales or consumption. All elements are specified with currency amounts in the currency of the business document. The TransactionCurrencyProductTax is a GDT of type ProductTax.

In certain implementations, the Integrity Conditions may exist such that If the ProductTaxSplitItem exists, the elements CashDiscountDeductibleIndicator and ProductTax may also exist. The following elements may be filled with ProductTax: CountryCode, EventTypeCode, TypeCode, RateTypeCode, AmountDue, and CategoryCode. If the elements DeferredIndicator and EuropeanCommunityVATTriangulationIndicator are filled within ProductTax, false is taken as the default value.

A WithholdingTaxSplitItem is the aggregation of the elements of a specific type of withholding tax. These elements may include: BaseBusinessTransactionDocumentItemTypeCode, TypeCode, TaxDueDate, CashDiscountDeductibleIndicator, WithholdingTax, and TransactionCurrencyWithholding Tax. The BaseBusinessTransactionDocumentItemTypeCode is the coded representation of the type of an item within a document that occurs in business transactions. The BaseBusinessTransactionDocumentItemTypeCode is a GDT of type BusinessTransactionDocumentItemTypeCode). The TypeCode is a coded representation of the type of the WithholdingTaxSplitItem. The TypeCode is a GDT of type TaxReceivablesPayablesRegisterItemSplitItemTypeCode. The TaxDueDate is the date on which the tax is due. The TaxDueDate is a GDT of type Date. In some implementations, the TaxDueDate has a Due qualifier. The CashDiscountDeductibleIndicator is the indicator whether or not the withholding tax qualifies for a cash discount. The CashDiscountDeductibleIndicator is a GDT of type CashDiscountDeductibleIndicator. The WithholdingTax is the tax that a paying party pays for directly instead of the payment recipient. The WithholdingTax is a GDT of type WithholdingTax. The TransactionCurrencyWithholdingTax is the tax that a paying party pays for directly instead of the payment recipient. All elements are specified with currency amounts in the currency of the business document. The TransactionCurrencyWithholdingTax is a GDT of type WithholdingTax.

In some implementations, the Integrity Conditions may exist such that If the WithholdingTaxSplitItem exists, the CashDiscountDeductibleIndicator and WithholdingTax elements may also exist. In some implementations, the following elements may be filled with WithholdingTax: CountryCode, EventTypeCode, TypeCode, RateTypeCode, and BaseAmount.

The TradeReceivablesPayablesRegisterItem is a trade receivable or payable from a base business transaction. The TradeReceivablesPayablesRegisterItem groups the following packages: CentralBankReport Package and SplitItem Package. For a given invoice or expense report that is uniquely identified as the base business document, TradeReceivablesPayablesRegisterItem contains one or more trade receivables/payables items (e.g. SplitItems) with entries about the type and amount of the due payment, the method of payment, and the business partner involved. These elements may include: TypeCode, TransactionCurrencyCode, TransactionCurrencyAmount, CashDiscountDeductibleGrossAmount, and CashDiscountDeductibleNetAmount. The TypeCode is the coded representation of the type of the item. The TypeCode is a GDT of type TradeReceivablesPayablesRegisterItemTypeCode. The TransactionCurrencyCode is the currency of the receivable and payable (e.g. transaction currency of the base business document). The currencies of all following amounts can not differ from the transaction currency specified. The TransactionCurrencyCode is a GDT of type CurrencyCode. In some implementations, the TransactionCurrencyCode has a Transaction qualifier. The TransactionCurrencyAmount is the amount of the receivable and payable in transaction currency. The TransactionCurrencyAmount is a GDT of type Amount. In some implementations, the TransactionCurrencyAmount has a TransactionCurrency qualifier. This is the total of all amounts (TransactionCurrencyAmount) of the ItemSplitItem. The CashDiscountDeductibleGrossAmount is the gross amount qualifying for cash discount including taxes. The CashDiscountDeductibleGrossAmount is a GDT of type Amount. In some implementations, the CashDiscountDeductibleGrossAmount has a Gross qualifier. The CashDiscountDeductibleNetAmount is the net amount qualifying for cash discount without taxes. The CashDiscountDeductibleNetAmount is a GDT of type Amount. The CashDiscountDeductibleNetAmount has a Net qualifier.

In certain implementations, the Integrity Conditions may exist such that the following attributes may be specified: TransactionCurrencyCode and TransactionCurrencyAmount.

The ReceivablesPayablesTradeReceivablesPayablesRegisterItemCentralBankReport Package contains the entity CentralBankReportItem. The CentralBankReportItem is information that is required for reporting to the central bank in accordance with German foreign trade regulations for the foreign payment of a trade receivable or payable. These elements may include CentralBankReportItem. The CentralBankReportItem is the reporting information for the central bank. The CentralBankReportItem is a GDT of type CentralBankReportItem. There can be multiple CentralBankReportItems for an item because an invoice can contain multiple CentralBankReportItems.

The ReceivablesPayablesTradeReceivablesPayablesRegisterItemSplitItem Package contains part of disjunctive split of an item and its payment agreement: SplitItem and PaymentControl.

In some implementations, the Integrity Conditions may exist such that if the items are to be handled with different payment instructions (different PaymentControls) or with different CashDiscountTerms, a separate SplitItem may be declared for each required combination. In those implementations, if payment plans are represented, a SplitItem may be declared for each installment.

A SplitItem is part of a disjunctive split of an item due to a trade receivables/payables split. The SplitItem contains the elements: TransactionCurrencyAmount, CashDiscountTerms, CashDiscountLevel, and PaymentControl. The TransactionCurrencyAmount is the amount of the split item in transaction currency. The TransactionCurrencyAmount is a GDT of type Amount. In some implementations, the TransactionCurrencyAmount has a TransactionCurrency qualifier. The CashDiscountTerms is the ad hoc payment terms, if a CashDiscountTermsCode was not entered. The CashDiscountTerms is a GDT of type CashDiscountTerms. The CashDiscountLevel specifies which payment period (maximum cash discount, normal cash discount or net payment) was chosen. The CashDiscountLevel is a GDT of type CashDiscountLevel. The PaymentControl is the agreement between a company and a business partner on processing payments for an individual business transaction. The PaymentControl is a GDT of type PaymentControl.

In some implementations, the Integrity Conditions may exist such that the element CashDiscountTerms can be specified. The attribute PaymentBaseLineDate can be specified in it. If the other attributes in the element CashDiscountTerms are not filled, this may mean that the payment at the PaymentBaseLineDate can take place without deductions. If other cash discount terms apply, the attributes can be explicitly filled in the element CashDiscountTerms. In some implementations, the CashDiscountTerms code is not evaluated at the recipient side, and it is only used for display purposes. Within the element PaymentControl at most, one of the entities BankTransfer, ChequePayment, ChequePayment or CreditCardPayment, may be specified.

Disjunctive split means that the amount of the item is completely explained by the amounts of its SplitItem. A trade receivables/payables split is the splitting of the trade receivables/payables into several parts to assign different entries about the type and amount of the due payment, methods of payment, and business partner involved.

Dependent Object AccountingClearingObjectHistory

Figure 54:
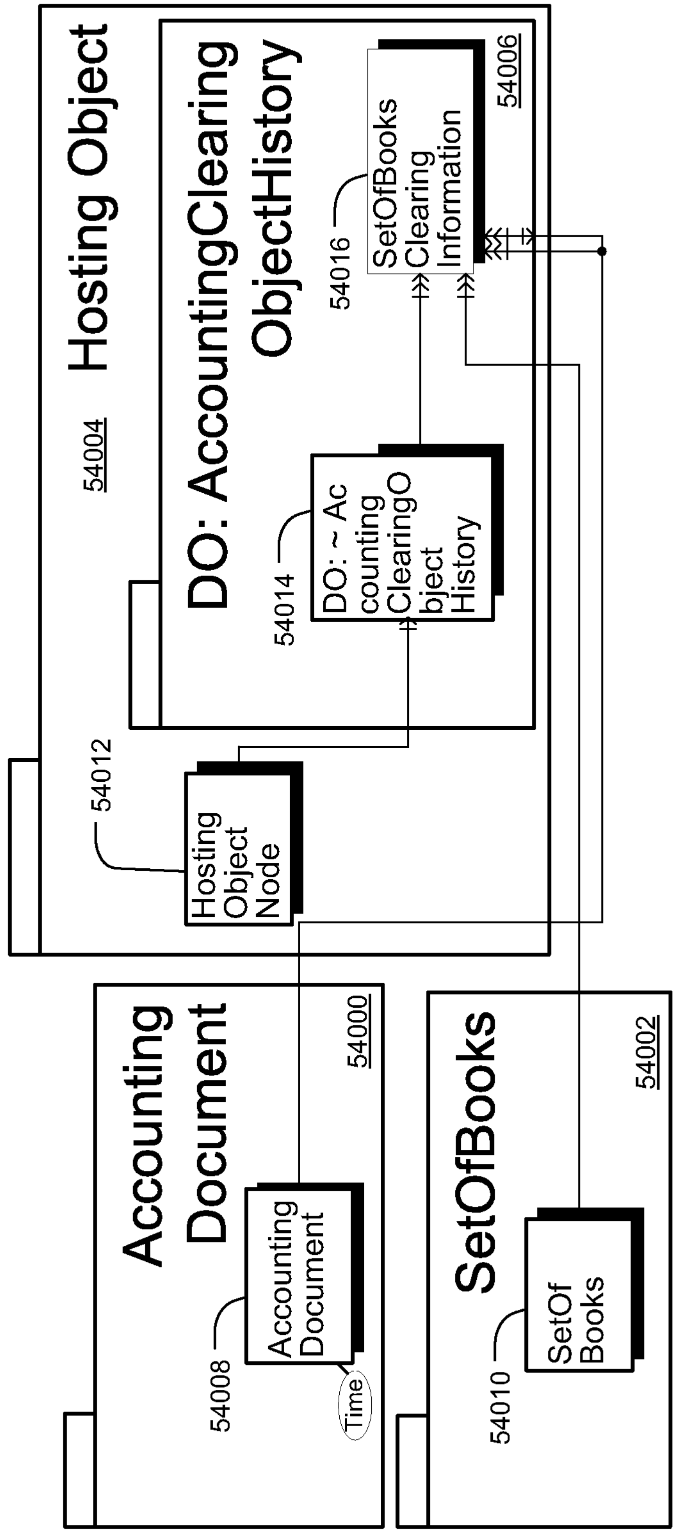
FIG. 54 shows an exemplary AccountingClearingObjectHistory object model.

FIG. 54 illustrates one example of an AccountingClearingObjectHistory dependent object model 54006. Specifically, this model depicts interactions among various hierarchical components of the AccountingClearingObjectHistory, as well as external components that interact with the AccountingClearingObjectHistory (shown here as 54000 through 54002 and 54006 through 54016). An AccountingClearingObjectHistory is a chronological record of creation and clearing information relating to a clearing object in accounting. A clearing object in accounting is an object with a life cycle that groups together line items of a ledger account for settlement purposes (i.e., for the purposes of clearing credit and debit entries). The line items assigned to the clearing object in accounting contain incoming and outgoing, value-related and potentially quantity-related movements as a result of business transactions that relate in content to the clearing object in accounting. At the end of the life cycle of the clearing object in accounting, the debit side and the credit side produce a balance of zero.

One example of a clearing object in accounting is an invoice represented in the due item of an AccountsPayableReceivableLedgerAccount. It can be generated by the invoice document. It groups together movements that relate to the invoice, such as subsequent debits, subsequent credits, credit memos, or partial payments, and final settlements. After the final settlement, the line items grouped together in this way produce a balance of zero. Another example of a clearing object in accounting is a cash transfer represented in the cash in transit of a CashLedgerAccount. It can be generated by the cash transfer order and can be cleared by the account statement confirming the transfer, which means that the line items grouped together in this way then produce a balance of zero. Additional examples of clearing objects in accounting include deferred tax in a TaxLedgerAccount, clearing in a PurchaseLedgerAccount, and a ProductionLedgerAccount.

In some implementations, dependent object AccountingClearingObjectHistory is part of the process component Accounting and is used by LedgerAccount business objects in Accounting, including business objects AccountsReceivablePayableLedgerAccount, CashLedgerAccount, and TaxLedgerAccount.

An AccountingClearingObjectHistory comprises the creation and clearing information for a set of books. A set of books is a body of accounting records, wherein postings and relevant information for items in the financial statements are contained in the set of books, wherein no external reference to other posted information in accounting is needed to explain the content of the set of books, and wherein the posted data in the set of books is comparable both structurally (e.g., fiscal year variant, currency, chart of accounts) and semantically (i.e., according to a set of accounting rules, other rules, or assumptions). A set of books can support the integration of the general ledger with the subledgers. It can also support cost accounting and profitability analysis. The subledgers, cost accounting, and profitability analysis may be known to the set of books, and all documents may be assigned to a single set of books.

An AccountingClearingObjectHistory is represented by the node AccountingClearingObjectHistory 54014. In some implementations, dependent object AccountingClearingObjectHistory is not involved in any process integration model.

In some implementations, elements located at node AccountingClearingObjectHistory are defined by the type GDT: AccountingClearingObjectHistoryElements and include SubledgerAccountUUID, a global unique identifier of the subledger account to which the clearing object in accounting belongs; SubledgerAccountCompanyUUID, a global unique identifier of the company to which the subledger account is assigned; AccountingClearingObjectUUID, a global unique identifier of the clearing object in accounting; and SubledgerAccountTypeCode, a coded representation of the subledger account type to which the clearing object in accounting belongs. In such implementations, node AccountingClearingObjectHistory has a 1:cn cardinality composition relationship with SetOfBooksClearingInformation 54016 subordinate nodes.

A QueryBySubledgerAccountAndKeyPostingDate can deliver all instances that are open in a specified set of books on a specified date. Elements of such query are defined by the data type AccountingClearingObjectHistorySubledgerAccountAndKeyPostingDateQueryElements and include SubledgerAccountTypeCode, SetOfBooksClearingInformationSetOfBooksID, and SetOfBooksClearingInformationKeyPostingDate. In some implementations, only one SetOfBooksClearingInformationKeyPostingDate is specified, SetOfBooksClearingInformation.OriginPostingDate has to be equal or lower than SetOfBooksClearingInformationKeyPostingDate, and SetOfBooksClearingInformation.ClearingPostingDate has to be empty or greater than SetOfBooksClearingInformationKeyPostingDate. If it is desirable to know which accounting clearing objects are open at a specified date, query element SetOfBooksClearingInformationKeyPostingDate offers the possibility to call this query with the key date only. It hides the selection of the two necessary node elements from calling hosting objects 54004. This service increases quality of solution because this logic is implemented once only.

Optional elements of such query include SubledgerAccountUUID, SubledgerAccountCompanyUUID, and SetOtfBooksClearingInformationSubledgerAccountLineItemTypeCode.

A QueryBySubledgerAccountAndClearingPostingDate can deliver all instances that were cleared in a specified set of books on a specified date. Elements of such query are defined by the data type AccountingClearingObjectHistorySubledgerAccountAndClearingPostingDateQueryElements and include SubledgerAccountTypeCode, SetOfBooksClearingInformationSetOfBooksID, and SetOfBooksClearingInformationClearingPostingDate. Optional elements of such query include SubledgerAccountUUID, SubledgerAccountCompanyUUID, and SetOfBooksClearingInformationSubledgerAccountLineItemTypeCode.

In some implementations, elements located at node SetOfBooksClearingInformation are defined by the type GDT: AccountingClearingObjectHistorySetOfBooksClearingInformationElements and include SetOfBooksID, a unique identifier for a set of books to which SetOfBooksClearingInformation relates; OriginAccountingDocumentUUID, which specifies the accounting document that was posted in the corresponding set of books when the clearing object in accounting originated; and OriginPostingDate, which specifies the posting date on which the clearing object in accounting originated in the corresponding set of books. Optional elements of such node include ClearingAccountingDocumentUUID, which specifies the accounting document that was posted in the corresponding set of books when the clearing object in accounting was cleared; SubledgerAccountLineItemTypeCode, a coded representation of the type of the line item to which the SetOfBooksClearingInformation relates; and ClearingPostingDate, which specifies the posting date on which the clearing object in accounting originated in the corresponding set of books.

In such implementations, from business object SetOfBooks 54002/node SetOfBooks 54010, node SetOfBooksClearingInformation has a 1:cn cardinality inbound aggregation relationship with SetOfBooks, which specifies the set of books to which the SetOfBooksClearingInformation relates.

From business object AccountingDocument 54000/node AccountingDocument 54068, node SetOfBooksClearingInformation has a 1:cn cardinality inbound association relationship with OriginAccountingDocument, which specifies the accounting document that was posted in the corresponding set of books when the clearing object in accounting originated, and a c:cn cardinality inbound association relationship with ClearingAccountingDocument, which specifies the accounting document that was posted in the corresponding set of books when the clearing object in accounting was cleared.

Business Object AccountingDocument

FIG. 55 illustrates one example of an AccountingDocument business object model 55032. Specifically, this figure depicts interactions among various hierarchical components of the AccountingDocument, as well as external components that interact with the AccountingDocument (shown here as 55000 through 55030 and 55034 through 55280). AccountingDocument is a representation of changes to values of general ledger and subledger accounts resulting from a business transaction and relating to a company and a set of books. A business object AccountingDocument can be a part of process component Accounting Processing. In some implementations, business object AccountingDocument comprises root node AccountingDocument 55282, which can contain header information for the document; and node Items 55284, which are line items that can contain value-based changes and quantity changes as well as their assignment to concepts in GeneralLedger Accounting. By the assignment of a subledger account to a subnode of an item, that item can be enhanced by information specific to that subledger. In some implementations, AccountingDocument is represented by the root node AccountingDocument.

Root node AccountingDocument of business object AccountingDocument can be a representation of changes to values of general ledger and subledger accounts resulting from a business transaction and relating to a company and a set of books. It can contain information for identifying the accounting document, comprising the fiscal year, set of books, company, and document number, as well as information valid for all line items (i.e., information that is unique for the entire document).

An OffsettingSubledgerAccount is a SubledgerAccount that contains, with reference to the same Accounting Document, the inverse representation of the business transaction stated in a SubledgerAccountLineItem. The inverse representation is required by the double entry bookkeeping principle. The compliance with this principle leads to a zero balance of the AccountingDocument that completely represents the Business transaction. An example for offsetting is an InventoryChangeItem of a ProductionLotConfirmation is represented as a debit LineItem of a ProductionLedgerAccount and as an inverse credit LineItem of a MaterialLedgerAccount.

An Original Entry Document is a document for auditing purposes and verifies that the value stated in the LineItem of a ledger account is booked on the base of a real business transaction. An Original Entry Document, such as FinancialAuditTrailDocumentation, LogSection, SettlementResultAccounting, or PeriodItem, can be contained in another Object, the Original Entry DocumentContainingObject. For example, FinancialAuditTrailDocumentation can be contained in a Host object such as DuePayment, DueClearing, Dunning, and PaymentAllocation from Operative Financials; LogSection can be contained in all AccountingAdjustmentRun-MDROs 55162 (e.g. InventoryPriceChangeRun 55170, GeneralLedgerAccountBalanceDistributionRun, FixedAssetDepreciationRun 55192, WorkInProcessClearingRun); SettlementResultAccounting can be contained in an ExpenseReport; and PeriodItem can be contained in an EmployeeTimeCalendar.

In some implementations, elements located directly at node AccountingDocument are defined by GDT AccountingDocumentElements, and include UUID, ID, OriginalEntryDocumentContainingObjectReference, OriginalEntryDocumentReference, CompanyUUID, SystemAdministrativeData, TypeCode, Note, SetOfBooksID, AccountingBusinessTransactionDate, PostingDate, FiscalYearVariantCode, FiscalYearID, AccountingPeriodID, and Key and optionally include OriginalEntryDataBaseTransactionUUID, OriginalEntryDocumentPartnerID, AccountingNotificationUUID, GeneralLedgerFunctionalUnitUUID, CancellationDocumentIndicator, OriginalEntryDocumentDate, CurrenyConversionDate, and AccountingClosingStepCode.

In some implementations, UUID is based on GDT UUID and is a universally unique identification of AccountingDocument; ID is based on GDT BusinessTransactionDocumentID and contains a human readable, numerical identifier of AccountingDocument which is unique within the company, set of books, and fiscal year; OriginalEntryDocumentContainingObjectReference is based on GDT ObjectNodeReference and is a reference to the object that contains the Original Entry Document of the business transaction which caused the accounting document; OriginalEntryDocumentReference is based on GDT ObjectNodeReference and is a reference to the Original Entry Document of the business transaction which caused the accounting document; OriginalEntryDataBaseTransactionUUID is based on GDT UUID and is an identifier of the transaction during which the Original Entry Document was created or changed; OriginalEntryDocumentPartnerID is based on GDT BusinessTransactionDocumentID and is an identification of the original entry document as assigned by the business partner (e.g., the ID of the Supplier Invoice assigned by the Supplier); AccountingNotificationUUID is based on GDT UUID and is a universally unique identification of the notification sent to Financial Accounting about the business transaction stated in the AccountingDocument; CompanyUUID is based on GDT UUID and is a universally unique identification of the Company for which the AccountDocument is posted; GeneralLedgerFunctionalUnitUUID is based on GDT UUID and is a universally unique identifier of the FunctionalUnit working on the AccountingDocument, wherein the FunctionalUnit referenced is able to execute the organizational function GeneralLedger Accounting (i.e., element OrganisationalFunctionCode in one of the instances of node FunctionalUnitAttributes in the FunctionalUnit references has the value, '19' (i.e., GeneralLedger)); SystemAdministrativeData is based on GDT SystemAdministrativeData and contains administrative data (e.g., timestamp of creation); TypeCode is based on GDT AccountingDocumentTypeCode and is a coded representation of the type of Accounting document; CancellationDocumentIndicator is based on GDT Indicator with Qualifier CancellationDocument, and specifies whether the accounting documents refer to a cancellation document for a business transaction; Note is based on GDT SHORT_Note and contains explanations or notes on the document; SetOfBooksID is based on GDT SetOfBooksID is a unique identification of the SetOfBooks according to whose specifications the Accounting Document was posted; OriginalEntryDocumentDate is based on GDT Date with Qualifier OriginalEntryDocument and is the issue date of the Original Entry Document; AccountingBusinessTransactionDate is based on GDT Date with Qualifier AccountingTransaction and is the date at which the business transaction took place applying the criteria of Accounting; PostingDate is based on GDT Date with Qualifier Posting and is the date with which the business transaction is recorded in Accounting, wherein period totals and balances in accounting are updated with this date; CurrenyConversionDate is based on GDT Date with Qualifier CurrencyConversion and is the date used for the currency translation applied to amounts in the accounting document; FiscalYearVariantCode is based on GDT FiscalYearVariantCode and is a coded representation of the FiscalYearVariant according to whose fiscal year definition (i.e., begin, end, period definition) the FiscalYearID and the AccountingPeriodID are derived; FiscalYearID is based on GDT FiscalYearID and is an identification of the fiscal year in which the Accounting Document was posted; AccountingPeriodID is based on GDT AccountingPeriodID and is an identification of the posting period of the accounting document within the fiscal year; AccountingClosingStepCode is based on GDT AccountingClosingStepCode and is a coded representation of the closing step of the accounting document; and Key is based on IDT AccountingDocumentKey and is a structured business key of the accounting document. AccountingDocumentKey includes elements ID, wherein ID is based on GDT AccountingDocumentID and contains a human readable, numerical identifier of AccountingDocument, which is unique within the company, set of books, and fiscal year; CompanyUUID, wherein CompanyUUID is based on GDT UUID and is a universally unique identification of the Company for which AccountDocument is posted; SetOfBooksID, wherein SetOfBooksID is based on GDT SetOfBooksID and is a unique identification of the SetOfBooks according to whose specifications the Accounting Document is posted; and FiscalYearID, wherein FiscalYearID is based on GDT FiscalYearID and is the fiscal year in which the Accounting Document was posted.

AccountingDocument 55282 can have a 1:n cardinality composition relationship to subordinate node Item 55284, a 1:1 cardinality composition relationship to subordinate node TextCollection 55292, and a 1:1 cardinality composition relationship to subordinate node AccessControlList 55294. From business object Company/Root 55080, AccountingDocument can have a 1:cn cardinality inbound aggregation relationship to Company, a Company to which the representation of the business transaction can relate. From business object SetofBooks 55206/Root, AccountingDocument can have a 1:cn cardinality inbound aggregation relationship to SetOfBooks, a set of based on whose principles the Accounting Document was posted. From business object AccountingDocument/Item, AccountingDocument can have a c:1 cardinality inbound association relationship to CancelledAccountingDocumentItem, an Accounting Document Item which was cancelled by this AccountingDocument. From business object BusinessDocumentFlow/Root, AccountingDocument can have a c:cn cardinality inbound association relationship to BusinessDocumentFlow, wherein an AccountingDocument can be a member of a BusinessDocumentFlow. From business object Identity/node Identity 55280, AccountingDocument can have a 1:cn cardinality inbound association relationship to CreationIdentity, which can specify the identity of the one who created the accounting document, and a 1:cn cardinality inbound association relationship to LastChangeIdentity, which can specify the identity of the one who did the last change of the accounting document (i.e., reversed the accounting document). From business object FunctionalUnit/node FunctionalUnit, AccountingDocument can have a c:cn cardinality inbound association relationship to FunctionalUnit, which can specify the Functional Unit working on the AccountingDocument.

In some implementations, AccountingDocument can have exactly one of the following relationships: (1) from business object Accounting Entry/Root 55154, a c:cn cardinality association relationship with AccountingEntry, wherein AccountingDocument can originate as a result of a business transaction that was entered in an AccountingEntry original entry document; (2) from business object AccountingNotification/Root 55156, a c:cn cardinality association relationship with AccountingNotification, wherein AccountingDocument can originate as a result of a business transaction that was represented as unvaluated in an AccountingNotification; (3) from business object WorkInProcessClearingRun/LogSection, a c:cn cardinality association relationship with WorkInProcessClearingRun, wherein AccountingDocument can originate as a result of a business transaction that was created by a WorkInProcessClearingRun (original entry document); (4) from business object CashLedgerAccountForeignCurrencyRemeasurementRun 55200/LogSection, a c:cn cardinality association relationship with CashLedgerAccountForeignCurrencyRemeasurementRun, wherein AccountingDocument can originate as a result of a business transaction that was created by a CashLedgerAccountForeignCurrencyRemeasurementRun (original entry document); (5) from business object AccountsReceivablePayableLedgerAccountForeignCurrencyRemeasurementRun/LogSection, a c:cn cardinality association relationship with AccountsReceivablePayableLedgerAccountForeignCurrencyRemeasurementRun, wherein AccountingDocument can originate as a result of a business transaction that was created by a AccountsReceivablePayableLedgerAccountForeignCurrencyRemeasurementRun (original entry document); (6) from business object AccountsReceivablePayableLedgerAccountDiscountingRun 55196/LogSection, a c:cn cardinality association relationship with AccountsReceivablePayableLedgerAccountDiscountingRun, wherein AccountingDocument can originate as a result of a business transaction that was created by a AccountsReceivablePayableLedgerAccountDiscountingRun; (7) from business object AccountsReceivablePayableLedgerAccountRegroupingRun 55194/LogSection, a c:cn cardinality association relationship with AccountsReceivablePayableLedgerAccountRegroupingRun, wherein AccountingDocument can originate as a result of a business transaction that was created by a AccountsReceivablePayableLedgerAccountRegroupingRun (original entry document); (8) from business object FixedAssetDepreciationRun/LogSection, a c:cn cardinality association relationship with FixedAssetDepreciationRun, wherein AccountingDocument can originate as a result of a business transaction that was created by a FixedAssetDepreciationRun (original entry document); (9) from business object ProductionLedgerAccountOverheadCostCalculationRun 55190/LogSection, a c:cn cardinality association relationship with ProductionLedgerAccountOverheadCostCalculationRun, wherein AccountingDocument can originate as a result of a business transaction that was created by a ProductionLedgerAccountOverheadCostCalculationRun (original entry document); (10) from business object OverheadCostLedgerAccountOverheadCostCalculationRun 55188/LogSection, a c:cn cardinality association relationship with OverheadCostLedgerAccountOverheadCostCalculationRun, wherein AccountingDocument can originate as a result of a business transaction that was created by a OverheadCostLedgerAccountOverheadCostCalculationRun (original entry document); (11) from business object OtherDirectCostLedgerAccountOverheadCostCalculationRun 55168/LogSection, a c:cn cardinality association relationship with OtherDirectCostLedgerAccountOverheadCostCalculationRun, wherein AccountingDocument can originate as a result of a business transaction that was created by a OtherDirectCostLedgerAccountOverheadCostCalculationRun (original entry document); (12) from business object SalesLedgerAccountOverheadCostCalculationRun 55186/LogSection, a c:cn cardinality association relationship with SalesLedgerAccountOverheadCostCalculationRun, wherein AccountingDocument can originate as a result of a business transaction that was created by a SalesLedgerAccountOverheadCostCalculationRun (original entry document); (13) from business object SalesLedgerAccountAccrualsRun 55184/LogSection, a c:cn cardinality association relationship with SalesLedgerAccountAccrualsRun, wherein AccountingDocument can originate as a result of a business transaction that was created by a SalesLedgerAccountAccrualsRun (original entry document); (14) from the business object GoodsReceiptInvoiceReceiptClearingRun 55182/LogSection, a c:cn cardinality association relationship with GoodsReceiptInvoiceReceiptClearingRun, wherein AccountingDocument can originate as a result of a business transaction that was created by a GoodsReceiptInvoiceReceiptClearingRun (original entry document); (15) from the business object BalanceCarryForwardRun 55180/LogSection, a c:cn cardinality association relationship with BalanceCarryForwardRun, wherein AccountingDocument can originate as a result of a business transaction that was created by a BalanceCarryForwardRun (original entry document); (16) from the business object GeneralLedgerAccountBalanceAssessmentRun/LogSection, a c:cn cardinality association relationship with GeneralLedgerAccountBalanceAssessmentRun, wherein AccountingDocument can originate as a result of a business transaction that was created by a GeneralLedgerAccountBalanceAssessmentRun (original entry document); (17) from the business object OverheadCostAssessmentRun 55176/LogSection, a c:cn cardinality association relationship with OverheadCostAssessmentRun, wherein AccountingDocument can originate as a result of a business transaction that was created by a OverheadCostAssessmentRun (original entry document); (18) from the business object GeneralLedgerAccountBalanceDistributionRun/LogSection, a c:cn cardinality association relationship with GeneralLedgerAccountBalanceDistributionRun, wherein AccountingDocument can originate as a result of a business transaction that was created by a GeneralLedgerAccountBalanceDistributionRun (original entry document); (19) from the business object OverheadCostDistributionRun 55172/LogSection, a c:cn cardinality association relationship with OverheadCostDistributionRun, wherein AccountingDocument can originate as a result of a business transaction that was created by a OverheadCostDistributionRun (original entry document); and (20) from the business object InventoryPriceChangeRun/LogSection, a c:cn cardinality association relationship with InventoryPriceChangeRun, wherein AccountingDocument can originate as a result of a business transaction that was created by a InventoryPriceChangeRun (original entry document).

In some implementations, AccountingDocument can have only one of the following relationships: (1) from business object GoodsAndServiceAcknowledgement/node GoodsAndServiceAcknowledgement 55098, a c:cn (Cross DU) cardinality relationship with GoodsAndServiceAcknowledgement, wherein, with reference to the business transaction document, AccountingDocument can be generated by a business transaction that was originally recorded in a GoodsAndServiceAcknowledgement; (2) from business object GoodsAndActivityConfirmation/node GoodsAndActivityConfirmation, a c:cn (Cross DU) cardinality relationship with GoodsAndActivityConfirmation, wherein, with reference to the business transaction document, AccountingDocument can be generated by a business transaction that was originally recorded in a GoodsAndActivityConfirmation; (3) from business object ProductionConfirmation/node ProductionConfirmation 55104, a c:cn (Cross DU) cardinality relationship with ProductionConfirmation, wherein, with reference to the business transaction document, AccountingDocument can be generated by a business transaction that was originally recorded in a ProductionConfirmation; (4) from business object ServiceConfirmation/node ServiceConfirmation 55094, a c:cn (Cross DU) cardinality relationship with ServiceConfirmation, wherein, with reference to the business transaction document, AccountingDocument can be generated by a business transaction that was originally recorded in a ServiceConfirmation; (5) from business object EmployeeTimeCalendar/node EmployeeTimeCalendar 55108, a c:cn cardinality relationship with EmployeeTimeCalendar, referencing the EmployeeTimeCalendar that contains the Original Entry Document; (6) from business object EmployeeTimeCalendar/node PeriodItem 55112, a c:cn cardinality relationship with EmployeeTimeCalendarPeriodItem, wherein, with reference to the Original Entry Document, AccountingNotification can be generated by a business transaction that was originally recorded in a PeriodItem contained in a EmployeeTimeCalendar; (7) from business object SupplierInvoice/node SupplierInvoice 55100, a c:cn (Cross DU) cardinality relationship with SupplierInvoice, wherein, with reference to the business transaction document, AccountingDocument can be generated by a business transaction that was originally recorded in a SupplierInvoice; (8) from business object SiteLogisticsConfirmation/node SiteLogisticsConfirmation 55106, a c:cn (Cross DU) cardinality relationship with SiteLogisticsConfirmation, wherein, with reference to the business transaction document, AccountingDocument can be generated by a business transaction that was originally recorded in a SiteLogisticsConfirmation; (9) from business object CustomerInvoice/node CustomerInvoice 551630, a c:cn (Cross DU) cardinality relationship with CustomerInvoice, wherein, with reference to the business transaction document, AccountingDocument can be generated by a business transaction that was originally recorded in a CustomerInvoice; (10) from business object PaymentAllocation/node PaymentAllocation 55126, a c:cn cardinality relationship with PaymentAllocation, referencing the PaymentAllocation that can include the Original Entry Document; (11) from business object PaymentAllocation/node FinancialAuditTrailDocumentation 55128, a c:cn cardinality relationship with PaymentAllocationFinancialAuditTrailDocumentation, wherein, with reference to the Original Entry Document, AccountingNotification can be generated by a business transaction that was originally recorded in a FinancialAuditTrailDocumentation contained in a PaymentAllocation; (12) from business object HouseBankStatement/node HouseBankStatement 55122, a c:cn cardinality relationship with HouseBankStatement, referencing the HouseBankStatement that can include the Original Entry Document; (13) from business object HouseBankStatement/node FinancialAuditTrailDocumentation 55124, a c:cn cardinality relationship with HouseBankStatementFinancialAuditTrailDocumentation, wherein, with reference to the Original Entry Document, an AccountingNotification can be generated by a business transaction that was originally recorded in a FinancialAuditTrailDocumentation contained in a HouseBankStatement; (14) from business object PaymentOrder/node PaymentOrder 55118, a c:cn cardinality relationship with PaymentOrder, referencing the PaymentOrder that can include the Original Entry Document; (15) from business object PaymentOrder/node FinancialAuditTrailDocumentation 55120, a c:cn cardinality relationship with PaymentOrderFinancialAuditTrailDocumentation, wherein, with reference to the Original Entry Document, AccountingNotification can be generated by a business transaction that was originally recorded in a FinancialAuditTrailDocumentation contained in a PaymentOrder; (16) from business object IncomingCheque/node IncomingCheque 55114, a c:cn cardinality relationship with IncomingCheque, referencing the IncomingCheque that can include the Original Entry Document; (17) from business object IncomingCheque/node FinancialAuditTrailDocumentation 55116, a c:cn cardinality relationship with IncomingChequeFinancialAuditTrailDocumentation, wherein, with reference to the Original Entry Document, an AccountingNotification can be generated by a business transaction that was originally recorded in a FinancialAuditTrailDocumentation contained in an IncomingCheque; (18) from business object CashPayment/node CashPayment 55144, a c:cn cardinality relationship with CashPayment, referencing the CashPayment that can include the Original Entry Document; (19) from business object CashPayment/node FinancialAuditTrailDocumentation 55146, a c:cn cardinality relationship with CashPaymentFinancialAuditTrailDocumentation, wherein, with reference to the Original Entry Document, AccountingNotification can be generated by a business transaction that was originally recorded in a FinancialAuditTrailDocumentation contained in a CashPayment; (20) from business object ChequeDeposit/node ChequeDeposit 55140, a c:cn cardinality relationship with ChequeDeposit, referencing the ChequeDeposit that can include the Original Entry Document; (21) from business object ChequeDeposit/node FinancialAuditTrailDocumentation 55142, a c:cn cardinality relationship with ChequeDepositFinancialAuditTrailDocumentation, wherein, with reference to the Original Entry Document, AccountingNotification can be generated by a business transaction that was originally recorded in a FinancialAuditTrailDocumentation contained in a ChequeDeposit; (22) from business object ProductTaxDeclaration 55262/node ProductTaxDeclaration 55258, a c:cn cardinality relationship with ProductTaxDeclaration, referencing the ProductTaxDeclaration that can include the Original Entry Document; (23) from business object ProductTaxDeclaration/node FinancialAuditTrailDocumentation 55260, a c:cn cardinality relationship with ProductTaxDeclarationFinancialAuditTrailDocumentation, wherein, with reference to the Original Entry Document, AccountingNotification can be generated by a business transaction that was originally recorded in a FinancialAuditTrailDocumentation contained in a ProductTaxDeclaration; (24) from business object DueClearing/node DueClearing 55136, a c:cn cardinality relationship with DueClearing, referencing, the DueClearing that can include the Original Entry Document; (25) from business object DueClearing/node FinancialAuditTrailDocumentation 55138, a c:cn cardinality relationship with DueClearingFinancialAuditTrailDocumentation, wherein, with reference to the Original Entry Document, AccountingNotification can be generated by a business transaction that was originally recorded in a FinancialAuditTrailDocumentation contained in a DueClearing; (26) from business object DuePayment/node DuePayment 55132, a c:cn cardinality relationship with DuePayment, referencing the DuePayment that can include the Original Entry Document; (27) from business object DuePayment/node FinancialAuditTrailDocumentation 55134, a c:cn cardinality relationship with DuePaymentFinancialAuditTrailDocumentation, wherein, with reference to the Original Entry Document, AccountingNotification can be generated by a business transaction that was originally recorded in a FinancialAuditTrailDocumentation contained in a DuePayment; (28) from business object Dunning/node Dunning 55266, a c:cn cardinality relationship with Dunning, referencing the Dunning that can include the Original Entry Document; (29) from business object Dunning/node FinancialAuditTrailDocumentation 55268, a c:cn cardinality relationship with DunningFinancialAuditTrailDocumentation, wherein, with reference to the Original Entry Document, AccountingNotification can be generated by a business transaction that was originally recorded in a FinancialAuditTrailDocumentation contained in a Dunning; (30) from business object ExpenseReport/node ExpenseReport 55150, a c:cn (Cross DU) cardinality relationship with ExpenseReport, referencing the Expense Report that can include the Original Entry Document; and (31) from business object ExpenseReport/node ExpenseReportSettlementResultPostingTransaction 55152, a c:cn (Cross DU) cardinality relationship with ExpenseReportSettlementResultPostingTransaction, wherein, with reference to the business transaction document, AccountingDocument can be generated by a business transaction that was originally recorded in an ExpenseReportSettlementResultAccounting contained in an Expense Report.

In some implementations, from business object AccountingDocument/Root, AccountingDocument has a cn:1 cardinality inbound association relationship for navigation to AssociatedAccountingDocumentInParallelSetOfBooks, the AccountingDocuments of other set of books, caused by the same Original Entry Document; and AccountingDocument contains at least two items (credit and debit side); and there are no enterprise infrastructure actions for AccountingDocument.

A QueryByID can deliver a list of AccountingDocuments that has a semantic key agreeing with the query parameters. In some implementations, query elements are defined by GDT AccountingDocumentIDQueryElements and optionally include ID based on GDT AccountingDocumentID, CompanyUUID based on GDT UUID, CompanyID based on GDT OrganisationalCentreID, FiscalYearID based on GDT FiscalYearID, and SetOfBooksID, based on GDT SetOfBooksID.

A QueryByOriginalEntryDocumentID can deliver a list of AccountingDocuments that was posted in Accounting as a result of the business transaction that was documented in the operational component with this original document. In some implementations, query elements are defined by GDT AccountingDocumentRootOriginalEntryDocumentIDQueryElements and optionally include OriginalEntryDocumentReference based on GDT ObjectNodeReference, OriginalEntryDatabaseTransactionUUID base on GDT UUID, and SetOfBooksID based on GDT SetOfBooksID.

A QueryByElements can deliver a list of AccountingDocuments that were posted with these selection parameters. In some implementations, query elements are defined by GDT AccountingDocumentRootElementsQueryElements and optionally include UUID based on GDT UUID, ID based on GDT AccountingDocumentID, CompanyUUID based on GDT UUID, CompanyID based on GDT OrganisationalCentreID, SetOfBooksID based on GDT SetOfBooksID, TypeCode based on GDT AccountingDocumentTypeCode, Note based on GDT Note, PostingDate based on GDT Date with QUALIFIER Posting, OriginalEntryDocumentDate based on GDT Date with QUALIFIER Document, AccountingTransactionDate based on GDT Date with QUALIFIER Transaction, CurrencyConversionDate based on GDT Date with QUALIFIER CurrencyConversion, FiscalYearVariantCode based on GDT FiscalYearVariantCode, FiscalYearID based on GDT FiscalYearID, AccountingPeriodID based on GDT AccountingPeriodID, AccountingClosingStepCode based on GDT AccountingClosingStepCode, OriginalEntryDocumentContainingObjectReference based on GDT ObjectNodeReference, OriginalEntryDocumentReference based on GDT ObjectNodeReference, OriginalEntryDatabaseTransactionUUID based on GDT UUID, OriginalEntryDocumentPartnerID based on GDT BusinessTransactionDocumentID, CancellationDocumentIndicator based on GDT Indicator, SystemAdministrativeData based on GDT SystemAdministrativeData, and SearchText based on GDT SearchText.

An item can be a value-based change within an accounting document relating to the combination of a G/L account, a debit/credit indicator, a segment, a profit center, a functional area, and/or other concepts specific to the subledger, such as material. An item can occur in the specializations FixedAssetItem 55286, MaterialLedgerAccountItem 55306, ProductionLedgerAccountItem 55288, PurchaseLedgerAccountItem 55290, SalesLedgerAccountItem 55296, AccountsReceivablePayableLedgerAccountItem 55298, TaxLedgerAccountItem 55300, CashLedgerAccountItem 55302, OverheadCostLedgerAccountItem 55304, and OtherDirectCostLedgerAccountItem 55308.

In some implementations, elements located directly at node Item are defined by the type GDT AccountingDocumentItemElements and include UUID, ID, GeneralLedgerAccountLineItemUUID, GeneralLedgerAccountLineItemGroupID, AccountingGroupID, AccountingBusinessTransactionTypeCode, SubledgerAccountTypeCode, SubledgerAccountLineItemTypeCode, ChartOfAccountsCode, ChartOfAccountsItemCode, DebitCreditCode, and LocalCurrencyAmount and optionally include OriginalEntryDocumentItemReference, OriginalEntryDocumentItemTypeCode, AccountingNotificationItemGroupItemUUID, SegmentUUID, ProfitCentreUUID, PartnerCompanyUUID, PartnerSegmentUUID, PartnerProfitCentreUUID, CancelledIndicator, CancellationOriginalEntryDocumentContainingBusinessObjectReference, CancellationOriginalEntryDocumentTransactionUUID, CancellationOriginalEntryDocumentReference, Note, ExpenseClassificationFunctionalAreaCode, GeneralLedgerMovementTypeCode, BusinessTransactionCurrencyAmount, LineItemCurrencyAmount, SetOfBooksCurrencyAmount, HardCurrencyAmount, IndexBasedCurrencyAmount, ValuationQuantity, and ValuationQuantityTypeCode.

In some implementations, UUID is based on GDT UUID and is a universally unique identification of the Accounting Document Item; ID is based on GDT BusinessTransactionDocumentItemID and identifies the line item; OriginalEntryDocumentItemReference is based on GDT ObjectNodeReference and is a reference to the item in the Original Entry Document that caused a change in quantity or value, or that was created new or changed; OriginalEntryDocumentItemTypeCode is based on GDT BusinessTransactionDocumentItemTypeCode and is a type of the item in the Original Entry Document to which the Item refers (e.g., if the referenced Original Entry Document item is a Supplier Invoice Item, the item type can be Invoice Item or Credit Memo Item); AccountingNotificationItemGroupItemUUID is based on GDT UUID and is a universally unique identification of the Accounting Notification Item Group It em, which triggered the posting of this Accounting Document Item; GeneralLedgerAccountLineItemUUID is based on GDT UUID and is a universally unique identification of a LineItem of a GeneralLedgerAccount that records the value change of the Item in the GeneralLedger; GeneralLedgerAccountLineItemGroupID is based on GDT BusinessTransactionDocumentItemGroupID and is the identifier for the group of all line items that are summarized together with the current line item in a GeneralLedgerAccountLineItem; SegmentUUID is based on GDT UUID and is a universally unique identification of the Segment to which the value and quantity of the Item can be allocated; ProfitCentreUUID is based on GDT UUID and is a universally unique identification of the ProfitCentre to which the value and quantity of the Item can be allocated; PartnerCompanyUUID is based on GDT UUID and is a universally unique identification of a Company that acts in the business transaction stated in the LineItem as an intra corporate partner; PartnerSegmentUUID is based on GDT UUID and is a universally unique identification of a Segment that acts in the business transaction stated in the Item as an intra corporate partner; PartnerProfitCentreUUID is based on GDT UUID and is a universally unique identification of a ProfitCentre that acts in the business transaction stated in the LineItem as an intra corporate partner; AccountingGroupID is based on GDT BusinessTransactionDocumentItemGroupID, is a unique identification of a group of Items belonging together applying the criteria of Accounting, and is used to indicate the items of an AccountingDocument that belong together (e.g., in partial zero-balance checking within the Accounting Document); AccountingBusinessTransactionTypeCode is based on GDT AccountingBusinessTransactionTypeCode, is a coded representation of the type of business transaction stated in the SubledgerAccount LineItem, and classifies the business transaction according to Accounting criteria; SubledgerAccountTypeCode is based on GDT SubledgerAccountTypeCode and is a coded representation of the type of ledger or subledger to which the item relates; SubledgerAccountLineItemTypeCode is based on GDT SubledgerAccountLineItemTypeCode and is a coded representation of the type of LineItem to which the item relates; CancelledIndicator is based on GDT Indicator with Qualifier Cancelled and indicates if the line item has been cancelled; CancellationOriginalEntryDocumentContainingBusinessObjectReference is based on GDT ObjectNodeReference with Qualifier CancellationOriginalEntryDocumentContaining and is a reference to the Business Object containing the OriginalEntryDocument that cancelled this Item; CancellationOriginalEntryDocumentTransactionUUID is based on GDT UUID and is a universally unique identifier of the transaction during which the CancellationOriginalEntryDocument was created or changed; CancellationOriginalEntryDocumentReference is based on GDT ObjectNodeReference with Qualifier OriginalEntryDocument and is a reference to the OriginalEntryDocument that cancelled this Item; Note is based on GDT SHORT_Note and contains explanations or notes related to the item; ChartOfAccountsCode is based on GDT ChartOfAccountsCode and is a coded representation of the ChartOfAccounts containing the ChartOfAccountsItem that classifies for general ledger accounting purposes the value stated in the Item; ChartOfAccountsItemCode is based on GDT ChartOfAccountsItemCode and is a coded representation of a ChartOfAccountsItem that classifies for general ledger accounting purposes the value stated in the LineItem; ExpenseClassificationFunctionalAreaCode is based on GDT ExpenseClassificationFunctionalAreaCode and specifies the functional area to which the item relates; GeneralLedgerMovementTypeCode is based on GDT GeneralLedgerMovementTypeCode and specifies the type of movement on the G/L account within GeneralLedger Accounting; DebitCreditCode is based on GDT DebitCreditCode and is a coded representation of debit or credit that specifies whether the line item is assigned to the debit or credit side of the GeneralLedger account; BusinessTransactionCurrencyAmount is based on GDT Amount with Qualifier BusinessTransactionCurrency and is the value of the Item in business transaction currency, wherein business transaction currency is the currency agreed on by two business partners for their business relationship; LineItemCurrencyAmount is based on GDT Amount with Qualifier LineItem and is the value of the Item in LineItem currency; LocalCurrencyAmount is based on GDT Amount with Qualifier LocalCurrency and is the value of the Item in the local currency of the Company carrying the account, wherein the local currency is the currency in which the local books are kept; SetOfBooksCurrencyAmount is based on GDT Amount with Qualifier SetOfBooksCurrency and is the value of the Item in the currency selected for the set of books; HardCurrencyAmount is based on GDT Amount with Qualifier HardCurrency and is the value of the Item, in the hard currency of the country of the Company carrying the account wherein the hard currency is a stable, country-specific currency that is used in high-inflation countries; IndexBasedCurrencyAmount is based on GDT Amount with Qualifier IndexedBasedCurrency and is the value of the Item in the index-based currency of the country of the Company carrying the account, wherein the index-based currency is a fictitious, country-specific currency that is used in high-inflation countries as a comparison currency for reporting; ValuationQuantity is based on GDT Quantity with Qualifier Valuation and specifies quantity as a result of the business transaction represented in the item which is the basis for the valuation; and ValuationQuantityTypeCode is based on GDT QuantityTypeCode with Qualifier Valuation and specifies the type of the valuation quantity.

From business object AccountingNotification/ItemGroupItem 55160, Item can have a c:cn cardinality inbound aggregation relationship with AccountingNotificationItemGroupItem, wherein an AccountingDocumentItem can originate as a result of a business transaction that was represented as unvaluated ItemGroupItem in an AccountingNotification. From business object GeneralLedgerAccount 55212/LineItem 55214, Item can have a 1:n cardinality inbound aggregation relationship with GeneralLedgerAccount, wherein a line item is a value-based change concerning one line item in GeneralLedger Accounting. From business object Company/Root, Item can have a c:cn cardinality inbound aggregation relationship with PartnerCompany, wherein the value-based change can be assigned to a partner company. From business object Segment/Root 55084, Item can have a c:cn cardinality inbound aggregation relationship with Segment, wherein the value-based change can be assigned to a segment, and Item can have a c:cn cardinality inbound aggregation relationship with PartnerSegment, wherein the value-based change can be assigned to a partner segment. From business object ProfitCentre/Root 55086, Item can have a c:cn-cardinality inbound aggregation relationship with ProfitCentre, wherein the value-based change can be assigned to a profit center, and Item can have a c:cn cardinality inbound aggregation relationship with PartnerProfitCentre, wherein the value-based change can be assigned to a partner profit center. From the business object AccountingDocument/Root, Item can have a c:cn cardinality inbound association relationship with CancellationAccountingDocument, the Accounting Document that cancelled this Item. In some implementations, there are no association relationships for navigation nor enterprise service infrastructure actions for Item.

A QueryByElements can deliver a list of AccountingDocumentItems that were posted with these selection parameters. In some implementations, query elements are defined by GDT AccountingDocumentItemElementsQueryElements and optionally include AccountingDocumentUUID based on GDT UUID, AccountingDocumentID based on GDT AccountingDocumentID, AccountingDocumentCompanyID based on GDT OrganisationalCentreID, AccountingDocumentCompanyUUID based on GDT UUID, AccountingDocumentSetOfBooksIDbased on GDT SetOfBooksID, AccountingDocumentFiscalYearID based on GDT FiscalYearID, AccountingDocumentTypeCode based on GDT AccountingDocumentTypeCode, AccountingDocumentNote based on GDT Note, AccountingDocumentPostingDate based on GDT Date with QUALIFIER Posting, AccountingDocumentOriginalEntryDocumentDate based on GDT Date with QUALIFIER Document, AccountingDocumentAccountingTransactionDate based on GDT Date with QUALIFIER Transaction, AccountingDocumentCurrenyConversionDate based on GDT Date with QUALIFIER CurrencyConversion, FiscalYearVariantCode based on GDT FiscalYearVariantCode, AccountingDocumentAccountingPeriodID based on GDT AccountingPeriodID, AccountingDocumentAccountingClosingStepCode based on GDT AccountingClosingStepCode, AccountingDocumentOriginalEntryBusinessObjectReference based on GDT ObjectNodeReference, AccountingDocumentOriginalEntryDocumentReference based on GDT ObjectNodeReference, OriginalEntryTransactionID based on GDT UUID, AccountingDocument OriginalEntryDocumentPartnerID based on GDT BusinessTransactionDocumentID, AccountingDocumentAccountingNotificationUUID based on UUID, AccountingDocumentCancellationDocumentIndicator based on GDT Indicator with QUALIFIER CancellationDocument, AccountingDocumentSystemAdministrativeData based on GDT SystemAdministrativeData, ID based on GDT BusinessTransactionDocumentItemID, OriginalEntryDocumentItemReference based on GDT ObjectNodeReference, AccountingNotificationItemGroupItemUUID based on GDT UUID, GeneralLedgerAccountLineItemUUID based on GDT UUID, GeneralLedgerAccountingLineItemGroupID based on GDT BusinessTransactionDocumentItemGroupID, CancelledIndicator based on GDT Indicator, CancellationOriginalEntryDocumentContainingReference based on GDT ObjectNodeReference, CancellationOriginalEntryTransactionUUIDce based on GDT UUID, CancellationOriginalEntryDocumentReference based on GDT ObjectNodeReference, DebitCreditCode base GDT DebitCreditCode, AccountingGroupID based on GDT BusinessTransactionDocumentItemGroupID, AccountingBusinessTransactionTypeCode based on GDT AccountingBusinessTransactionTypeCode, ChartOfAccountsCode based on GDT ChartOfAccountsCode, ChartOfAccountsItemCode based on GDT ChartOfAccountsItemCode, ExpenseClassificationFunctionalAreaCode based on GDT ExpenseClassificationFunctionalAreaCode, Note based on GDT Note, SubledgerAccountLineItemTypeCode based on GDT SubledgerAccountLineItemTypeCode, SubledgerAccountTypeCode based on GDT SubledgerAccountTypeCode, GeneralLedgerMovementTypeCode based on GDT GeneralLedgerMovementTypeCode, SegmentUUID based on GDT UUID, SegmentID based on GDT OrganisationalCentreID, ProfitCentreUUID based on GDT UUID, ProfitCentreID based on GDT OrganisationalCentreID, PartnerCompanyUUID based on GDT UUID, PartnerCompanyID based on GDT OrganisationalCentreID, PartnerSegmentUUID based on GDT UUID, PartnerSegmentID based on GDT OrganisationalCentreID, PartnerProfitCentreUUID based on GDT UUID, PartnerProfitCentreID based on GDT OrganisationalCentreID, and SearchText based on GDT SearchText.

FixedAssetItem is a line item that can describe a value-based change to fixed assets. In some implementations, the elements located on the FixedAssetItemAccountingDocument node are defined by the GDT AccountingDocumentFixedAssetItemElements, and include FixedAssetLineItemUUID, FixedAssetUUID, SetOfBooksAssetValuationViewUUID, MovementClassificationCode, OffsettingSubledgerAccountTypeCode, and ValueCalculationReferenceDate, and optionally include IndividualMaterialUUID, OffsettingIndividualMaterialUUID, OffsettingSubledgerAccountUUID, CashDiscountDeductibleIndicator, ProductTaxGroupID, ProductTaxCountryCode, ProductTaxTypeCode, ProductTaxDueCategoryCode, ProductTaxEventTypeCode, ProductTaxRateTypeCode, WithholdingTaxCountryCode, WithholdingTaxTypeCode, WithholdingTaxEventTypeCode, WithholdingTaxRateTypeCode, and OriginalValueCalculationReferenceDate.

In some implementations, FixedAssetLineItemUUID is based on GDT UUID and contains a universally unique identifier of the asset line item which represents the posting; FixedAssetUUID is based on GDT UUID and contains the universally unique identifier of the asset to which the posting was made; SetOfBooksAssetValuationViewUUID is based on GDT UUID and specifies the SetOfBooksAssetValuationView used for valuation of the fixed asset; MovementClassificationCode is based on GDT FixedAssetMovementClassificationCode and classifies the movement on the fixed asset the item represents; IndividualMaterialUUID is based on GDT UUID and specifies the universally valid identifier of an individual material that is moved by a business transaction, and which triggers a value change in fixed assets; OffsettingIndividualMaterialUUID is based on GDT UUID and is a universally unique identifier of an individual material that is moved by a business transaction and that can trigger a value change in fixed assets; OffsettingSubledgerAccountUUID is based on GDT UUID and is a universally unique identifier of an offsetting Subledger Account to which the posting is made within the business transaction at hand; OffsettingSubledgerAccountTypeCode is based on GDT SubledgerAccountTypeCode, specifies the type of offsetting subledger account to which the line item relates, and is restricted to code value 1 (Fixed Asset); CashDiscountDeductibleIndicator is based on GDT Indicator with qualifier CashDiscountDeductible and indicates whether the line item posted with an outgoing invoice qualifies for a cash discount; ProductTaxGroupID is based on GDT BusinessTransactionDocumentItemGroupID and is the identifier for the group of all items of an AccountingDocument that are tax relevant or tax items and have the same taxation; ProductTaxCountryCode is based on GDT CountryCode and is the country to whose tax authority the product tax data has been or will be reported; ProductTaxTypeCode is based on GDT TaxTypeCode and denotes the product tax type to which the recorded data relates; ProductTaxDueCategoryCode is based on GDT DueCategoryCode and denotes the category (receivable or payable) of a tax due to which the recorded data relates; ProductTaxEventTypeCode is based on GDT ProductTaxEventTypeCode and denotes the product tax event to which the recorded data relates; ProductTaxRateTypeCode is based on GDT TaxRateTypeCode and denotes the type of product tax rate to which the recorded data relates; WithholdingTaxCountryCode is based on GDT CountryCode and is the country to whose tax authority the withholding tax data has been or will be reported; WithholdingTaxTypeCode is based on GDT TaxTypeCode and denotes the withholding tax type to which the recorded data relates; WithholdingTaxEventTypeCode is based on GDT WithholdingTaxEventTypeCode and denotes the witholding tax event to which the recorded data relates; WithholdingTaxRateTypeCode is based on GDT TaxRateTypeCode and denotes the type of withholding tax rate to which the recorded data relates; ValueCalculationReferenceDate is based on GDT Date with qualifier ValueCalculationReference and specifies the reference date for the asset value calculation; and OriginalValueCalculationReferenceDate is based on GDT Date with qualifier ValueCalculationReference and specifies the original reference date for the asset value calculation.

From business object FixedAsset/node SetOfBooksValuationViewLineItem 55210, FixedAssetItem can have a 1:c cardinality inbound aggregation relationship with Fixed Asset line item, wherein a FixedAssetItem within an accounting document is a value-based change concerning one line item for fixed assets. To business object FixedAsset/Root, FixedAssetItem can have a 1:cn cardinality association relationship for navigation with Fixed Asset, wherein FixedAssetItem within an accounting document is a value-based change concerning one fixed asset, and FixedAssetItem can have a c:cn cardinality association relationship for navigation with OffsettingFixedAsset, wherein LineItem can relate to a partner FixedAsset to which the item is to be assigned. To business object IndividualMaterial/Root 55090, FixedAssetItem can have a 1:c cardinality association relationship for navigation with IndividualMaterial, wherein FixedAssetItem within an accounting document is a value-based change concerning one Individual Material, and FixedAssetItem can have a c:cn cardinality association relationship for navigation with OffsettingIndividualMaterial, which specifies the individual material associated to the partner fixed asset, wherein the business transaction relates to this individual material.

MaterialLedgerAccountItem is a line item that can describe a change to the valuated material stock. In some implementations, the elements located on the MaterialLedgerAccountItemAccountingDocument node are defined by the GDT AccountingDocumentMaterialLedgerAccountItemElements and include MaterialLedgerAccountLineItemUUID, MaterialLedgerAccountUUID, OffsettingSubledgerAccountUUID, OffsettingSubledgerAccountTypeCode, and optionally include PropertyMovementDirectionCode, ReferenceQuantity, and ReferenceQuantityTypeCode. In some implementations, MaterialLedgerAccountLineItemUUID is based on GDT UUID and contains the universally unique identifier of the material ledger account line item which represents the posting; MaterialLedgerAccountUUID is based on GDT UUID and contains the universally unique identifier of the material ledger account to which the posting is made; OffsettingSubledgerAccountUUID is based on GDT UUID and specifies the offsetting subledger account to which the line item relates; OffsettingSubledgerAccountTypeCode is based on GDT SubledgerAccountTypeCode, specifies the type of offsetting subledger account to which the line item relates, and is restricted to code values 2 (MaterialLedgerAccount), 3 (ProductionLedgerAccount), 4 (Purchase in Process Ledger Account), 8 (Sales Ledger Account), 9 (Overhead Cost Ledger Account) and 11 (Other Direct Cost Ledger Account); PropertyMovementDirectionCode is based on GDT PropertyMovementDirectionCode and specifies whether the item increases or decreases the inventory; ReferenceQuantity is based on GDT Quantity with qualifier Reference and specifies in the valuation unit of measure for the material a quantity to which the business transaction represented in the line item relates but which typically does not cause a change to the inventory quantity; and ReferenceQuantityTypeCode is based on GDT QuantityTypeCode and qualifier Reference and specifies the type of the reference quantity.

From business object MaterialLedgerAccount 55216/LineItem 55218, MaterialLedgerAccountItem can have a 1:c cardinality inbound aggregation relationship with Material ledger line item, wherein MaterialLedgerAccountItem is a value-based change concerning one line item in the valuated material stock. To business object MaterialLedgerAccount/Root, MaterialLedgerAccountItem can have a 1:cn cardinality association relationship for navigation with MaterialLedgerAccount, wherein a MaterialLedgerAccountItem within an accounting document is a value-based change concerning one material ledger account.

In some implementations, MaterialLedgerAccountItem may have exactly one of the following relationships: (1) from business object MaterialLedgerAccount/Root, a c:cn cardinality inbound association relationship with OffsettingMaterialLedgerAccount, which specifies the MaterialLedgerAccount as the OffsettingSubledgerAccount to which the item refers; (2) from business object PurchaseLedgerAccount/Root 55224, a c:cn cardinality inbound association relationship with OffsettingPurchaseLedgerAccount, which specifies the PurchaseLedgerAccount as the OffsettingSubledgerAccount to which the item refers; (3) from business object ProductionLedgerAccount/Root 55220, a c:cn cardinality inbound association relationship with OffsettingProductionLedgerAccount which specifies the ProductionLedgerAccount as the OffsettingSubledgerAccount to which line item refers; (4) from business object SalesLedgerAccount/Root, a c:cn cardinality inbound association relationship with OffsettingSalesLedgerAccount, which specifies the SalesLedgerAccount as the OffsettingSubledgerAccount to which the item refers; (5) from business object OverheadCostLedgerAccount/Root, a c:cn cardinality inbound association relationship with OffsettingOverheadCostLedgerAccount, which specifies the OverheadCostLedgerAccount as the OffsettingSubledgerAccount to which the item refers, and (6) from business object OtherDirectCostLedgerAccount/Root, a c:cn cardinality inbound association relationship with OffsettingOtherDirectCostLedgerAccount, which specifies the OtherDirectCostLedgerAccount as the OffsettingSubledgerAccount to which the item refers.

ProductionLedgerAccountItem is a line item that can describe a valuated stock change to work in process. In some implementations, the elements located on the ProductionLedgerAccountItemAccountingDocument node are defined by the GDT AccountingDocumentProductionLedgerAccountItemElements, and include ProductionLedgerItemUUID, ProductionLedgerUUID, OffsettingSubledgerAccountUUID, OffsettingSubledgerAccountTypeCode, CostRevenueElementCode, and SubledgerAccountChargeTypeCode, and optionally include OriginalOffsettingSubledgerAccountUUID and OriginalOffsettingSubledger- AccountTypeCode. In some implementations, ProductionLedgerItemUUID is based on GDT UUID and contains a universally unique identifier of the production ledger account which represents the posting; ProductionLedgerUUID is based on GDT UUID and includes the universally unique identifier of the production subledger line item to which the posting was made; OffsettingSubledgerAccountUUID is based on GDT UUID and specifies the offsetting subledger account to which the line item relates; OffsettingSubledgerAccountTypeCode is based on GDT SubledgerAccountTypeCode, specifies the type of offsetting subledger account to which the line item relates, and is restricted to code values 2 (MaterialLedgerAccount), and 9 (OverheadCostLedgerAccount); OriginalOffsettingSubledgerAccountUUID is based on GDT UUID and specifies the origin subledger account to which the line item relates; OriginalOffsettingSubledgerAccountTypeCode is based on GDT SubledgerAccountTypeCode, specifies the type of origin subledger account to which the line item relates, and is restricted to code values 2 (MaterialLedgerAccount) and 9 (OverheadCostLedgerAccount); CostRevenueElementCode is based on GDT CostRevenueElementCode and denotes the value component that classifies the value that flowed from the OffsettingSubLedgerAccount to the ProductionLedgerAccount or vice-versa; and SubledgerAccountChargeTypeCode is based on GDT SubledgerAccountChargeTypeCode and specifies the credit or debit type to which the item relates.

From the business object ProductionLedgerAccount/LineItem, ProductionLedgerAccountItem can have a 1:c cardinality inbound aggregation relationship with Production Ledger Account Line Item, wherein ProductionLedgerAccountItem is a value-based change concerning a line item for the valuated stock to work in process. To business object ProductionLedgerAccount/Root, ProductionLedgerAccountItem can have a 1:cn cardinality association relationship for navigation with ProductionLedgerAccount, wherein ProductionLedgerAccountItem within an accounting document is a value-based change concerning one production ledger account.

In some implementations, ProductionLedgerAccountItem may have exactly one of the following relationships: (1) from business object MaterialLedgerAccount/Root, a c:cn cardinality inbound association relationship with OffsettingMaterialLedgerAccount, which specifies MaterialLedgerAccount as the OffsettingSubledgerAccount to which the item refers; and (2) from business object OverheadCostLedgerAccount/Root, a c:cn cardinality inbound association relationship with OffsettingOverheadCostLedgerAccount, which specifies the OverheadCostLedgerAccount as the OffsettingSubledgerAccount to which the item refers.

In some implementations, ProductionLedgerAccountItem may have exactly one of the following relationships: (1) from business object MaterialLedgerAccount/Root, a c:cn cardinality inbound association relationship with OriginalOffsettingMaterialLedgerAccount, which specifies the MaterialLedgerAccount as the OriginSubledgerAccount to which the item refers, and (2) from business object OverheadCostLedgerAccount/Root, a c:cn cardinality inbound association relationship with OriginalOffsettingOverheadCostLedgerAccount, which specifies the OverheadCostLedgerAccount as the OriginSubledgerAccount to which the item refers.

PurchaseLedgerAccountItem is a statement for a PurchaseLedgerAccount for a set of books on the value of an inventory change based on a single business transaction. A line item can contain detailed information representing the business transaction from the accounting viewpoint (e.g., as a posting date and a OriginalEntryDocument reference). It can reference either a PurchasingObject or a PurchasingSegment. If it references a PurchasingObject, the reference can be further specified through the item of the business transaction document of Purchasing. In some implementations, the elements located at the PurchaseLedgerAccountItem node are defined by the type GDT AccountingDocumentPurchaseLedgerAccountItemElements, and include PurchaseLedgerAccountLineItemUUID and PurchaseLedgerAccountUUID, and optionally include FinancialAccountingViewOfPurchasingDocumentItemUUID, PermanentEstablishmentUUID, ClearingUUID, OffsettingSubledgerAccountUUID, OffsettingSubledgerAccountTypeCode, ProductUUID, ProductTypeCode, CashDiscountDeductibleIndicator, ProductTaxGroupID, ProductTaxCountryCode, ProductTaxTypeCode, ProductTaxDueCategoryCode, ProductTaxEventTypeCode, ProductTaxRateTypeCode, WithholdingTaxCountryCode, WithholdingTaxTypeCode, WithholdingTaxEventTypeCode, WithholdingTaxRateTypeCode, and ClearingQuantity.

In some implementations, PurchaseLedgerAccountLineItemUUID is based on GDT UUID and contains a universally unique identifier of the goods/invoices received account line item which represents the posting; PurchaseLedgerAccountUUID is based on GDT UUID and contains a universally unique identifier of the goods/invoices received account to which the posting is made; FinancialAccountingViewOfPurchasingDocumentItemUUID is based on GDT UUID and denotes a FinancialAccountingViewOfPurchasingDocumentItem for which the item was generated; PermanentEstablishmentUUID is based on GDT UUID and denotes the PermanentEstablishment to which the recorded data relates; ClearingUUID is based on GDT UUID and contains a universally unique identifier of the goods/invoices received account clearing which represents the posting; OffsettingSubledgerAccountUUID is based on GDT UUID and denotes a LedgerAccount (e.g., MaterialLedgerAccount) from which the PurchaseLedgerAccount received values or to which it can output values; OffsettingSubledgerAccountTypeCode is based on GDT SubledgerAccountTypeCode, specifies the type of offsetting subledger account to which the line item relates; and is restricted to code values 1 (Fixed Asset), 2 (Material Ledger Account), 5 (Accounts Receivable Payable Ledger Account), 9 (Overhead Costs Ledger Account) and 11 (OtherDirectCostLedgerAccount); ProductUUID is based on GDT UUID and is the product (e.g., the material) of the item of the business transaction document of Purchasing; ProductTypeCode is based on GDT ProductTypeCode, is the type of the product of the item of the business transaction document of Purchasing, and is restricted to code values 1 (Material), 2 (Service product) and 3 (Individual material); CashDiscountDeductibleIndicator is based on GDT Indicator with qualifier CashDiscountDeductible and indicates whether the line item posted with an outgoing invoice qualifies for a cash discount; ProductTaxGroupID is based on GDT BusinessTransactionDocumentItemGroupID and is the identifier for the group of all items of an AccountingDocument that are tax relevant or tax items and have the same taxation; ProductTaxCountryCode is based on GDT CountryCode and is the country to whose tax authority the product tax data has been or will be reported; ProductTaxTypeCode is based on GDT TaxTypeCode and denotes the product tax type to which the recorded data relates; ProductTaxDueCategoryCode is based on GDT DueCategoryCode and denotes the category (receivable or payable) of a tax due to which the recorded data relates; ProductTaxEventType- Code is based on GDT ProductTaxEventTypeCode and denotes the product tax event to which the recorded data relates; ProductTaxRateTypeCode is based on GDT TaxRateTypeCode and denotes the type of product tax rate to which the recorded data relates; WithholdingTaxCountryCode is based on GDT CountryCode and is the country to whose tax authority the withholding tax data has been or will be reported; WithholdingTaxTypeCode is based on GDT TaxTypeCode and denotes the withholding tax type to which the recorded data relates; WithholdingTaxEventTypeCode is based on GDT WithholdingTaxEventTypeCode and denotes the withholding tax event to which the recorded data relates; WithholdingTaxRateTypeCode is based on GDT TaxRateTypeCode and denotes the type of withholding tax rate to which the recorded data relates; ClearingQuantity is based on GDT Quantity with qualifier Clearing, denotes the quantity of the business transaction represented in the line item that is used in goods receipt/invoice receipt clearing to distribute the variances or for which the price variances were calculated and cleared in goods receipt/invoice receipt clearing; ClearingQuantityTypeCode is based on GDT QuantityTypeCode with qualifier Clearing and specifies the type of the clearing quantity; ReferenceQuantity is based on GDT Quantity with qualifier Reference, and specifies, in the order unit, a quantity to which the business transaction stated in the line item refers but which does not result in a change to the clearing quantity; and ReferenceQuantityTypeCode is based on GDT QuantityTypeCode with qualifier Reference, is the coded representation of the type of reference quantity.

From the business object PurchaseLedgerAccount/LineItem 55228, PurchaseLedgerAccountItem can have a 1:c cardinality inbound aggregation relationship with Purchase ledger account line item, wherein PurchaseLedgerAccountItem is a value-based change concerning a line item in the Purchase Subledger. From business object FinancialAccountingViewOfPurchasingDocument 55272/node Item 55274, PurchaseLedgerAccountItem can have a c:cn cardinality inbound association relationship with FinancialAccountingViewOfPurchasingDocumentItem, wherein an Item can reference an item of a FinancialAccountingViewOfPurchasingDocument. From business object PurchaseLedgerAccount/node Clearing 55226, PurchaseLedgerAccountItem can have a c:cn cardinality inbound association relationship with PurchaseLedgerAccountClearing, wherein an Item can relate to a Clearing of the same PurchaseLedgerAccount that can group LineItems for goods receipt/invoice receipt clearing.

From business object PermanentEstablishment/node PermanentEstablishment 55082, PurchaseLedgerAccountItem can have a c:cn cardinality inbound aggregation relationship with PermanentEstablishment, wherein an Item can relate to a PermanentEstablishment to which the item is to be assigned. To business object PurchaseLedgerAccount/Root, PurchaseLedgerAccountItem can have a 1:cn cardinality association relationship for navigation with PurchaseLedgerAccount, wherein a PurchaseLedgerAccountItem within an accounting document is a value-based change concerning one purchase ledger account.

In some implementations, PurchaseLedgerAccountItem can have only one of the following relationships: (1) from business object FixedAsset/node FixedAsset, a c:cn cardinality inbound association relationship with OffsettingFixedAsset, which denotes the FixedAsset to which the Item relates as the OffsettingSubLedgerAccount; (2) from business object MaterialLedgerAccount/node MaterialLedgerAccount, a c:cn cardinality inbound association relationship with OffsettingMaterialLedgerAccount, which denotes the MaterialLedgerAccount to which the Item relates as the OffsettingSubLedgerAccount; (3) from business object PurchaseLedgerAccount/node PurchaseLedgerAccount, a c:cn cardinality inbound association relationship with OffsettingPurchaseLedgerAccount, which denotes the PurchaseLedgerAccount to which the Item relates as the OffsettingSubLedgerAccount; (4) from business object OverheadCostLedgerAccount/node OverheadCostLedgerAccount, a c:cn cardinality inbound association relationship with OffsettingOverheadCostLedgerAccount, which denotes the OverheadCostLedgerAccount to which the Item related as the OffsettingSubLedgerAccount; and (5) from business object OtherDirectCostLedgerAccount/node OtherDirectCostLedgerAccount, a c:cn cardinality inbound association relationship with OffsettingOtherDirectCostLedgerAccount, which denotes the OtherDirectCostLedgerAccount to which the Item relates as the OffsettingSubledgerAccount.

SalesLedgerAccountItem is a line item that can describe a change in revenues, cost of sales or to the valuated goods issue/invoice issue stock. Revenues and cost of goods sold form a financial accounting view of the sales transactions affecting net income. The view provides a granularity appropriate for analyses and reports on revenues and cost of goods sold by market segment. In some implementations, the elements located on the SalesLedgerAccountItemAccountingDocument node are defined by the GDT AccountingDocumentSalesLedgerAccountItemElements, and include SalesLedgerAccountLineItemUUID, SalesLedgerAccountUUID, FinancialAccountingViewOfSalesAndServiceDocumentItemUUID, OffsettingSubledgerAccountUUID, OffsettingSubledgerAccountTypeCode, and CostRevenueElementCode, and optionally include SubledgerAccountChargeTypeCode, PriceSpecificationElementPurposeCode, PriceSpecificationElementCategoryCode, CashDiscountDeductibleIndicator, ProductTaxGroupID, ProductTaxCountryCode, ProductTaxTypeCode, ProductTaxDueCategoryCode, ProductTaxEventTypeCode, ProductTaxRateTypeCode, WithholdingTaxCountryCode, WithholdingTaxTypeCode, WithholdingTaxEventTypeCode, WithholdingTaxRateTypeCode, OrderQuantity, and OrderQuantityTypeCode.

In some implementations, SalesLedgerAccountLineItemUUID is based on GDT UUID and contains a universally unique identifier of the sales ledger account line item which represents the posting; SalesLedgerAccountUUID is based on GDT UUID and contains a universally unique identifier of the sales ledger account to which the posting is made; FinancialAccountingViewOfSalesAndServiceDocumentItemUUID is based on GDT UUID and denotes a FinancialAccountingViewOfSalesAndServiceDocumentItem for which the item was generated; OffsettingSubledgerAccountUUID is based on GDT UUID and specifies the offsetting subledger account to which the line item relates; OffsettingSubledgerAccountTypeCode is based on GDT SubledgerAccountTypeCode, specifies the type of offsetting subledger account to which the line item relates, and is restricted to code values 2 (Material Ledger Account) and 9 (Overhead Costs Ledger Account); SubledgerAccountChargeTypeCode is based on GDT SubledgerAccountChargeTypeCode and specifies the credit or debit type to which the item relates; CostRevenueElementCode is based on GDT CostRevenueElementCode and denotes the coded representation of a cost or revenue element in Financial Accounting; PriceSpecificationElementPurposeCode is based on GDT PriceSpecificationElementPurposeCode and is the coded representation of the purpose of a PriceSpecificationElement, wherein a PriceSpecificationElement is the specification of a price, discount, surcharge, or tax; PriceSpecificationElementCategoryCode is based on GDT PriceSpecificationElementCategoryCode and is the coded representation of the category of a PriceSpecificationElement; CashDiscountDeductibleIndicator is based on GDT Indicator with qualifier CashDiscountDeductible and indicates whether the line item posted with an outgoing invoice qualifies for a cash discount; ProductTaxGroupID is based on GDT BusinessTransactionDocumentItemGroupID and is the identifier for the group of all items of an AccountingDocument that are tax relevant or tax items and have the same taxation; ProductTaxCountryCode is based on GDT CountryCode and is the country to whose tax authority the product tax data has been or will be reported; ProductTaxTypeCode is based on GDT TaxTypeCode and denotes the product tax type to which the recorded data relates; ProductTaxDueCategoryCode is based on GDT DueCategoryCode and denotes the category (receivable or payable) of a tax due to which the recorded data relates; ProductTaxEventTypeCode is based on GDT ProductTaxEventTypeCode and denotes the product tax event to which the recorded data relates; ProductTaxRateTypeCode is based on GDT TaxRateTypeCode and denotes the type of product tax rate to which the recorded data relates; WithholdingTaxCountryCode is based on GDT CountryCode and is the country to whose tax authority the withholding tax data has been or will be reported; WithholdingTaxTypeCode is based on GDT TaxTypeCode and denotes the withholding tax type to which the recorded data relates; WithholdingTaxEventTypeCode is based on GDT WithholdingTaxEventTypeCode and denotes the witholding tax event to which the recorded data relates; WithholdingTaxRateTypeCode is based on GDT TaxRateTypeCode and denotes the type of withholding tax rate to which the recorded data relates; OrderQuantity is based on GDT Quantity and specifies the quantity assigned to the line item in the order unit, wherein this can differ from the valuation unit under certain conditions; and OrderQuantityTypeCode is based on GDT QuantityTypeCode with qualifier Order and specifies the type of the order quantity.

From the business object SalesLedgerAccount 55234/LineItem 55236, SalesLedgerAccountItem can have a 1:c cardinality inbound aggregation relationship with SalesLedgerAccountLineItem, wherein SalesLedgerAccountItem is a value-based change concerning a line item in the sales ledger account. To business object SalesLedgerAccount/Root, SalesLedgerAccountItem can have a 1:cn cardinality association relationship for navigation with SalesLedgerAccount, wherein SalesLedgerAccountItem within an accounting document is a value based change concerning a sales ledger account. From business object FinancialAccountingViewOfSalesAndServiceDocument 55276/node Item 55278, SalesLedgerAccountItem can have a c:cn cardinality inbound association relationship with FinancialAccountingViewOfSalesAndServiceDocumentItem, wherein Item can reference an item of a FinancialAccountingViewOfSalesAndServiceDocument.

In some implementations, SalesLedgerAccountItem can have only one of the following relationships: (1) from business object AccountingDocument/node AccountingDocument, a c:cn cardinality inbound association relationship with OffsettingAccountingDocument, which denotes the AccountingDocument that occurs in the LineItem in the Offsetting LedgerAccount role (see below); (2) from business object MaterialLedgerAccount/node MaterialLedgerAccount, a c:cn cardinality inbound association relationship with OffsettingMaterialLedgerAccount, which denotes theAccountingDocument MaterialLedgerAccount that occurs in the LineItem in the Offsetting LedgerAccount role (see below); (3) from business object AccountsReceivablePayableLedgerAccount/node AccountsReceivablePayableLedgerAccount, a c:cn cardinality inbound association relationship with OffsettingAccountsReceivablePayableLedgerAccount, which denotes the AccountingDocument AccountsReceivablePayableLedgerAccount that occurs in LineItem in the Offsetting LedgerAccount role (see below); and (4) from business object OverheadCostLedgerAccount/node OverheadCostLedgerAccount, a c:cn cardinality inbound association relationship with Offsetting OverheadCostLedgerAccount, which denotes theAccountingDocument OverheadCostLedgerAccount that occurs in LineItem in the Offsetting LedgerAccount role (see below).

AccountsReceivablePayableLedgerAccountItem is a line item that can describe a change in the valuated stock to payables or receivables from deliveries and services. In some implementations, the elements located on the AccountsReceivablePayableLedgerAccountItemAccountingDocument node are defined by the GDT AccountingDocument AccountsReceivablePayableLedgerAccountItemElements, and include AccountsReceivablePayableLedgerAccountLineItemUUID, AccountsReceivablePayableLedgerAccountUUID, AccountsReceivablePayableLedgerAccountDueItemUUID, PropertyMovementDirectionCode, NetLineItemCurrencyAmount, and NetLocalCurrencyAmount, and optionally include AccountsReceivableDueItemTypeCode, AccountsPayableDueItemTypeCode, ProductTaxCountryCode, ProductTaxTypeCode, ProductTaxDueCategoryCode, ProductTaxEventTypeCode, ProductTaxRateTypeCode, WithholdingTaxCountryCode, WithholdingTaxTypeCode, WithholdingTaxEventTypeCode, WithholdingTaxRateTypeCode, NetTransactionCurrencyAmount, NetSetOfBooksCurrencyAmount, NetHardCurrencyAmount, and NetIndexBasedCurrencyAmount.

In some implementations, AccountsReceivablePayableLedgerAccountLineItemUUID is based on GDT UUID and contains a universally unique identifier of the receivable and payable ledger account line item which represents the posting; AccountsReceivablePayableLedgerAccountUUID is based on GDT UUID and contains a universally unique identifier of the receivable and payable ledger account to which the posting is made; AccountsReceivablePayableLedgerAccountDueItemUUID is based on GDT UUID and globally and uniquely identifies the due to which the line item relates; AccountsReceivableDueItemTypeCode is based on GDT AccountsReceivableDueItemTypeCode and is a coded representation of the type of due of an accounts receivable; AccountsPayableDueItemTypeCode is based on GDT AccountsPayableDueItemTypeCode and is a coded representation of the type of due of an accounts payable; PropertyMovementDirectionCode is based on GDT PropertyMovementDirectionCode and specifies whether the Due relates to an inflow or outflow; ProductTaxCountryCode is based on GDT CountryCode and is the country to whose tax authority the product tax data has been or will be reported; ProductTaxTypeCode is based on GDT TaxTypeCode and denotes the product tax type to which the recorded data relates; ProductTaxDueCategoryCode is based on GDT DueCategoryCode and denotes the category (receivable or payable) of a tax due to which the recorded data relates; ProductTaxEventTypeCode is based on GDT ProductTaxEventTypeCode and denotes the product tax event to which the recorded data relates; ProductTaxRateTypeCode is based on GDT TaxRateTypeCode and denotes the type of product tax rate to which the recorded data relates; WithholdingTaxCountryCode is based on GDT CountryCode and is the country to whose tax authority the withholding tax data has been or will be reported; WithholdingTaxTypeCode is based on GDT TaxTypeCode and denotes the withholding tax type to which the recorded data relates; WithholdingTaxEventTypeCode is based on GDT WithholdingTaxEventTypeCode and denotes the witholding tax event to which the recorded data relates; WithholdingTaxRateTypeCode is based on GDT TaxRateTypeCode and denotes the type of withholding tax rate to which the recorded data relates; NetLineItemCurrencyAmount is based on GDT Amount with qualifier LineItemCurrency and specifies in the currency of the due the net value of the business transaction represented in the line item; NetTransactionCurrencyAmount is based on GDT Amount with qualifier TransactionCurrency and specifies in the transaction currency of the business transaction the net value of the business transaction represented in the line item; NetLocalCurrencyAmount is based on GDT Amount with qualifier LocalCurrency and specifies in the local currency of the company the net value of the business transaction represented in the line item; NetSetOfBooksCurrencyAmount is based on GDT Amount with qualifier SetOfBooksCurrency and specifies in the additional currency selected for the set of books the net value of the business transaction represented in the line item; NetHardCurrencyAmount is based on GDT Amount with qualifier HardCurrency and specifies in the hard currency of the country of the company the net value of the business transaction represented in the line item; and NetIndexBasedCurrencyAmount is based on GDT Amount with qualifier IndexBasedCurrency and specifies in the index currency of the country of the company the net value of the business transaction represented in the line item.

From business object AccountsReceivablePayableLedgerAccount 55238/LineItem 55242, AccountsReceivablePayableLedgerAccountItem can have a 1:c cardinality inbound aggregation relationship with AccountsReceivablePayableLedgerAccountItem, wherein AccountsReceivablePayableLedgerAccountItem is a value-based change concerning a line item for the valuated stock to payables or receivables from deliveries and services. From business object AccountsReceivablePayableLedgerAccount/DueItem 55240, AccountsReceivablePayableLedgerAccountItem can have a 1:c cardinality inbound association relationship with AccountsReceivablePayableLedgerAccountDueItem, wherein AccountsReceivablePayableLedgerAccountItem refers to a due item within AccountsReceivablePayableLedgerAccount. To business object AccountsReceivablePayableLedgerAccount/Root. AccountsReceivablePayableLedgerAccountItem can have a 1:cn cardinality association relationship for navigation with AccountsReceivablePayableLedgerAccount, wherein AccountsReceivablePayableLedgerAccountItem within an accounting document is a value-based change concerning an accounts receivable payable ledger account.

TaxLedgerAccountItem is a line item that can describe a valuated stock change to payables or receivables relating to a tax authority (tax owing or tax rebate). In some implementations, the elements located on the TaxLedgerAccountItemAccountingDocument node are defined by the GDT AccountingDocumentTaxLedgerAccountItem Elements, and include TaxLedgerAccountLineItemUUID, TaxLedgerAccountUUID, and PropertyMovementDirectionCode, and optionally include TaxLedgerAccountDeferredTaxUUID and ProductTaxGroupID. In some implementations, TaxLedgerAccountLineItemUUID is based on GDT UUID and contains the universally unique identifier of the tax ledger account line item which represents the posting; TaxLedgerAccountUUID is based on GDT UUID and contains the universally unique identifier of the tax ledger account to which the posting is made; TaxLedgerAccountDeferredTaxUUID is based on GDT UUID and globally and uniquely identifies DeferredTaxItemInformation; ProductTaxGroupID is based on GDT BusinessTransactionDocumentItemGroupID and is the identifier for the group of all items of an AccountingDocument that are tax relevant or tax items and have the same taxation; and PropertyMovementDirectionCode is based on GDT PropertyMovementDirectionCode and specifies whether the Tax relates to an inflow or outflow.

From business object TaxLedgerAccount 55248/LineItem 55252, TaxLedgerAccountItem can have a 1:c cardinality inbound aggregation relationship with Tax ledger line item, wherein TaxLedgerAccountItem is a value-based change concerning a line item for the valuated stock to payables or receivables reported to a tax authority. From the business object TaxLedgerAccount/DeferredTaxItem 55250, TaxLedgerAccountItem can have a 1:c cardinality inbound association relationship with Deferred Tax item, wherein TaxLedgerAccountItem can have a relation to a deferred tax item within Tax Ledger Account. To business object TaxLedgerAccount/Root, TaxLedgerAccountItem can have a 1:cn cardinality association relationship for navigation with TaxLedgerAccount, wherein TaxLedgerAccountItem within an accounting document is a value based change concerning a tax ledger account.

CashLedgerAccountItem is a line item that can describe a change to the liquid funds stock. In some implementations, the elements located at the CashLedgerAccountItem node are defined by the type GDT AccountingDocument CashLedgerAccountItemElements, and include CashLedgerAccountLineItemUUID, CashLedgerAccountUUID, PaymentRegisterItemTypeCode, PaymentFormCode, and PropertyMovementDirectionCode, and optionally include CashLedgerAccountCashInTransitUUID. In some implementations, CashLedgerAccountLineItemUUID is based on GDT UUID and contains the universally unique identifier of the cash ledger account line item which represents the posting; CashLedgerAccountUUID is based on GDT UUID and contains the universally unique identifier of the cash ledger account to which the posting is made; CashLedgerAccountCashInTransitUUID is based on GDT UUID and globally and uniquely identifies the cash in transit node of Cash Ledger Account that the item relates to; PaymentRegisterItemTypeCode is based on GDT PaymentRegisterItemTypeCode and is the coded representation of the type of payment register item, transferred from the payment process to document the transaction in the Item; PaymentFormCode is based on GDT PaymentFormCode and is the coded representation of the form of payment, transferred from the payment process to document the transaction in the Item; and PropertyMovementDirectionCode is based on GDT PropertyMovementDirectionCode and specifies whether the cash relates to an inflow or outflow.

From the business object CashLedgerAccount 55244/LineItem 55246, CashLedgerAccountItem can have a 1:c cardinality inbound aggregation relationship with Cash subledger line item, wherein CashLedgerAccountItem is a value-based change concerning a line item for the liquid funds stock. From business object CashLedgerAccount/CashInTransit, CashLedgerAccountItem can have a 1:c cardinality inbound association relationship with CashLedgerAccount, wherein CashLedgerAccountItem within an accounting document is a value based change concerning a cash ledger account. To business object CashLedgerAccount/Root, CashLedgerAccountItem can have a 1:cn cardinality association relationship for navigation with CashLedgerAccount, wherein CashLedgerAccountItem within an accounting document is a value based change concerning a cash ledger account.

OverheadCostLedgerAccountItem is a line item that can describe a change to overhead costs. Overhead costs are periodic costs for the provision of resources deployed in the value added process that typically cannot be assigned directly to market segments or balance sheet accounts and that can be combined as overhead in the profit and loss statement. In some implementations, the elements located at the OverheadCostLedgerAccountItem node are defined by the type GDT AccountingDocumentOverheadCostLedgerAccountItemElements, and include OverheadCostLedgerAccountLineItemUUID, OverheadCostLedgerAccountUUID, CostRevenueElementCode, and SubledgerAccountChargeTypeCode, and optionally include OffsettingSubLedgerAccountUUID, OffsettingSubLedgerAccountTypeCode, OriginOverheadCostLedgerAccountUUID, ServiceProductValuationDataUUID, ServiceProductBasedValuationIndicator, CashDiscountDeductibleIndicator, ProductTaxGroupID, ProductTaxCountryCode, ProductTaxTypeCode, ProductTaxDueCategoryCode, ProductTaxEventTypeCode, ProductTaxRateTypeCode, WithholdingTaxCountryCode, WithholdingTaxTypeCode, WithholdingTaxEventTypeCode, WithholdingTaxRateTypeCode, ResourceQuantity, ResourceQuantityTypeCode, ServiceProductQuantity, and ServiceProductQuantityTypeCode.

In some implementations, OverheadCostLedgerAccountLineItemUUID is based on GDT UUID and contains the universally unique identifier of the overhead cost ledger account line item which represents the posting; OverheadCostLedgerAccountUUID is based on GDT UUID and contains a universally unique identifier of the overhead cost ledger account to which the posting is made; OffsettingSubLedgerAccountUUID is based on GDT UUID, is the LedgerAccount (e.g., a ProductionLedgerAccount) from which the OverheadCostLedgerAccount received values or to which it output values, and is filled with secondary allocations (e.g., assessments, overhead, settlements) and with activity confirmations; OffsettingSubLedgerAccountTypeCode is based on GDT SubledgerAccountTypeCode, is the type of the OffsettingSubLedgerAccount to which the item relates, is restricted to code values 3 (Production Ledger Account), 7 (Sales Ledger Account), 9 (Overhead Cost Ledger Account), and 11 (Other Direct Cost Ledger Account), and is filled if the element OffsettingSubLedgerAccountUUID is filled; OriginOverheadCostLedgerAccountUUID is based on GDT UUID and is the OverheadCostLedgerAccount from which a value flow originally started; ServiceProductValuationDataUUID is based on GDT UUID, is the ServiceProduct that was exchanged between the OverheadCostLedgerAccount and the OffsettingObject, and may be filled if the element AccountingBusinessTransactionTypeCode has the value 'Internal Service Provision'; CostRevenueElementCode is based on GDT CostRevenueElementCode and is the cost and revenue element of the item; SubledgerAccountChargeTypeCode is based on GDT SubledgerAccountChargeTypeCode and indicates whether the line item represents a debit or credit of the OverheadCostLedgerAccount; ServiceProductBasedValuationIndicator is based on GDT ServiceProductBasedValuationIndicator and specifies that the values of the line item are a result of valuation of the service product quantity (ServiceProductQuantity element), wherein if the indicator is not set, this indicates that the values of the line item arose through valuation of the resource consumption quantity (ResourceQuantity element); CashDiscountDeductibleIndicator is based on GDT Indicator with qualifier CashDiscountDeductible and indicates whether the line item posted with an outgoing invoice qualifies for a cash discount; ProductTaxGroupID is based on GDT BusinessTransactionDocumentItemGroupID and is the identifier for the group of all items of an AccountingDocument that are tax relevant or tax items and have the same taxation; ProductTaxCountryCode is based on GDT CountryCode and is the country to whose tax authority the product tax data has been or will be reported; ProductTaxTypeCode is based on GDT TaxTypeCode and denotes the product tax type to which the recorded data relates; ProductTaxDueCategoryCode is based on GDT DueCategoryCode and denotes the category (receivable or payable) of a tax due to which the recorded data relates; ProductTaxEventTypeCode is based on GDT ProductTaxEventTypeCode and denotes the product tax event to which the recorded data relates; ProductTaxRateTypeCode is based on GDT TaxRateTypeCode and denotes the type of product tax rate to which the recorded data relates; WithholdingTaxCountryCode is based on GDT CountryCode and is the country to whose tax authority the withholding tax data has been or will be reported; WithholdingTaxTypeCode is based on GDT TaxTypeCode and denotes the withholding tax type to which the recorded data relates; WithholdingTaxEventTypeCode is based on GDT WithholdingTaxEventTypeCode and denotes the witholding tax event to which the recorded data relates; WithholdingTaxRateTypeCode is based on GDT TaxRateTypeCode and denotes the type of withholding tax rate to which the recorded data relates; ResourceQuantity is based on GDT Quantity with qualifier Resource and denotes the quantity of the resource consumption of that part of the business transaction represented in the line item in the unit of the resource; ResourceQuantityTypeCode is based on GDT QuantityTypeCode with qualifier Resource and specifies the type of the resource quantity; ServiceProductQuantity is based on GDT Quantity with qualifier ServiceProduct and is, for the line item, the quantity of the service product of that part of the business transaction represented in the line item in the unit of the service product; and ServiceProductQuantityTypeCode is based on GDT QuantityTypeCode with qualifier ServiceProduct and specifies the type of the serviceproduct valuation quantity.

From the business object OverheadCostLedgerAccount 55254/LineItem 55256, OverheadCostLedgerAccountItem can have a 1:c cardinality inbound aggregation relationship with Overhead cost line item, wherein OverheadCostLedgerAccountItem is a value-based change concerning a line item for overhead costs. To business object OverheadCostLegerAccount/Root, OverheadCostLedgerAccountItem can have a 1:cn cardinality association relationship for navigation with OverheadLedgerAccount, wherein OverheadLedgerAccountItem within an accounting document is a value-based change concerning exactly one overhead ledger account. In some implementations, from business object ServiceProductValuationData/node ServiceProductValuationData 55264, OverheadCostLedgerAccountItem may have a c:cn cardinality inbound association relationship with ServiceProductValuationData, the ServiceProduct that was exchanged between the OverheadCostLedgerAccount and the OffsettingObject, if the element AccountingBusinessTransactionTypeCode has the value 'Internal Service Provision'. From business object OverheadCostLedgerAccount/node OverheadCostLedgerAccount, OverheadCostLedgerAccountItem may have a c:cn cardinality inbound association relationship with OriginOverheadCostLedgerAccount, which denotes the OriginOverheadCostLedgerAccount which the item relates to.

In some implementations, OverheadCostLedgerAccountItem can have only one of the following relationships: (1) from business object PurchaseAccountingDocument/node PAccountingDocument, a c:cn cardinality inbound association relationship with Offsetting PurchaseAccountingDocument, which denotes the AccountingDocument that occurs in the Item in the Offsetting LedgerAccount role; (2) from business object AccountingDocument/node AccountingDocument, a c:cn cardinality inbound association relationship with Offsetting AccountingDocument, which denotes the AccountingDocument that occurs in the Item in the Offsetting LedgerAccount role; (3) from business object OverheadCostLedgerAccount/node OverheadCostLedgerAccount, a c:cn cardinality inbound association relationship with Offsetting OverheadCostLedgerAccount, which denotes theAccountingDocument OverheadCostLedgerAccount that occurs in the Item in the Offsetting LedgerAccount role; and from business object OtherDirectCostLedgerAccount/node OtherDirectCostLedgerAccount, a c:cn cardinality inbound association relationship with Offsetting OtherDirectCostLedgerAccount, which denotes theAccountingDocument OtherDirectCostLedgerAccount that occurs in the Item in the Offsetting LedgerAccount role.

OtherDirectCostLedgerAccountItem is a line item that can describe a change to other direct costs. In some implementations, the elements located at the OtherDirectCostLedgerAccountItem node are defined by the type GDT AccountingDocumentOtherDirectCostLedgerAccountItemElements, and include OtherDirectCostLedgerAccountLineItemUUID, OtherDirectCostLedgerAccountUUID, CostRevenueElementCode, and SubledgerAccountChargeTypeCode, and optionally include OffsettingSubLedgerAccountUUID, OffsettingSubLedgerAccountTypeCode, CashDiscountDeductibleIndicator, ProductTaxGroupID, ProductTaxCountryCode, ProductTaxTypeCode, ProductTaxDueCategoryCode, ProductTaxEventTypeCode, ProductTaxRateTypeCode, WithholdingTaxCountryCode, WithholdingTaxTypeCode, WithholdingTaxEventTypeCode, and WithholdingTaxRateTypeCode.

In some implementations, OtherDirectCostLedgerAccountLineItemUUID is based on GDT UUID and contains the universally unique identifier of the other direct cost ledger account line item which represents the posting; OtherDirectCostLedgerAccountUUID is based on GDT UUID and contains a universally unique identifier of the other direct cost ledger account to which the posting is made; OffsettingSubLedgerAccountUUID is based on GDT UUID, is a universally unique identifier of the LedgerAccount, such as MaterialLedgerAccount, from which the AccountingDocument received values or to which it output values, and is filled with secondary allocations (e.g., assessments, overhead, settlements) and activity confirmations; OffsettingSubLedgerAccountTypeCode is based on GDT SubledgerAccountTypeCode, is the type of the OffsettingSubLedgerAccount to which the item relates, and is restricted to code values 2 (MaterialLedgerAccount), 4 (Purchase in Process Ledger Account), and 9 (Overhead Costs Ledger Account); CostRevenueElementCode is based on GDT CostRevenueElementCode and is the cost and revenue element of the item; SubledgerAccountChargeTypeCode is based on GDT SubledgerAccountChargeTypeCode and indicates whether the line item represents a debit or credit of the OtherDirectCostLedgerAccount; CashDiscountDeductibleIndicator is based on GDT Indicator with qualifier CashDiscountDeductible and indicates whether the line item posted with an outgoing invoice qualifies for a cash discount; ProductTaxGroupID is based on GDT BusinessTransactionDocumentItemGroupID and is the identifier for the group of all items of an AccountingDocument that are tax relevant or tax items and have the same taxation; ProductTaxCountryCode is based on GDT CountryCode and is the country to whose tax authority the product tax data has been or will be reported; ProductTaxTypeCode is based on GDT TaxTypeCode and denotes the product tax type to which the recorded data relates; ProductTaxDueCategoryCode is based on GDT DueCategoryCode and denotes the category (receivable or payable) of a tax due to which the recorded data relates; ProductTaxEventTypeCode is based on GDT ProductTaxEventTypeCode and denotes the product tax event to which the recorded data relates; ProductTaxRateTypeCode is based on GDT TaxRateTypeCode and denotes the type of product tax rate to which the recorded data relates; WithholdingTaxCountryCode is based on GDT CountryCode and is the country to whose tax authority the withholding tax data has been or will be reported; WithholdingTaxTypeCode is based on GDT TaxTypeCode and denotes the withholding tax type to which the recorded data relates; WithholdingTaxEventTypeCode is based on GDT WithholdingTaxEventTypeCode and denotes the witholding tax event to which the recorded data relates; and WithholdingTaxRateTypeCode is based on GDT TaxRateTypeCode and denotes the type of withholding tax rate to which the recorded data relates.

From the business object OtherDirectCostLedgerAccount 55230/LineItem 55232, OtherDirectCostLedgerAccountItem can have a 1:c cardinality inbound aggregation relationship with Other Direct cost line item, wherein OtherDirectCostLedgerAccountItem is a value-based change concerning a line item for other direct costs. To business object OtherDirectLegerAccount/Root, OtherDirectCostLedgerAccountItem can have a 1:c cardinality association relationship for navigation with OtherDirectLedgerAccount, wherein OtherDirectLedgerAccountItem within an accounting document is a value-based change concerning a direct ledger account.

In some implementations, OtherDirectCostLedgerAccountItem can have only one of the following relationships: (1) to business object OverheadCostLedgerAccount/node OverheadCostLedgerAccount, a c:cn cardinality inbound association relationship with Offsetting OverheadCostLedgerAccount, which denotes the OverheadCostsLedgerAccount that occurs in the Item in the Offsetting LedgerAccount role; (2) to business object MaterialLedgerAccount/node MaterialLedgerAccount, a c:cn cardinality inbound association relationship with Offsetting MaterialLedgerAccount, which denotes the MaterialLedgerAccount that occurs in the Item in the Offsetting LedgerAccount role; and (3) to business object PurchaseLedgerAccount/node PurchaseLedgerAccount, a c:cn cardinality inbound association relationship with Offsetting PurchaseLedgerAccount, which denotes the PurchaseLedgerAccount that occurs in the Item in the Offsetting LedgerAccount role.

Dependent object TextCollection can be a Collection of natural-language text linked to the AccountingDocument. The TextCollection node can be represented by DependentObject TextCollection.

Dependent object AccessControlList can be a list of access groups that have access to an Accounting Document.

The data type enhancements can be part of Globalisation layer. The extension of AccountingDocument can capture additional information regarding a legally required ID of a supplier or customer invoice. According to French, Italian and Chinese law, this LegallyRequiredInvoiceID may be created by the company that can send or receive a customer or supplier invoice, respectively, in a gapless sequential and chronological manner. In addition, it can be a legal requirement in Italy that this number shall be reset to 1 with a new calendar year. This number can be generated in SupplierInvoicing and CustomerInvoicing and may be transferred to Financial Accounting as it may be displayed in the document journal report. In order to prove the chronology of the numbering, the date at which the number may be generated is transferred as well. The enhancement can be done in the Globalization Layer.

The SupplierInvoiceID typically does not fulfill this purpose because it is an identifier for the supplier invoice which can be generated upon entry into the system. When a supplier invoice is created, the next available number can be drawn and used even if the invoice is typically not saved. Therefore the ID typically cannot fulfill the requirement for a gapless numbering. Further, the SupplierInvoiceID is typically not reset to 1 with the beginning of the calendar year. The LegallyRequiredInvoiceID can be an identifier to the Supplier Invoice which is generated when the document is saved. It therefore can be gapless in SupplierInvoicing. (From the perspective of FinancialAccounting, it can still contain gaps when parked supplier invoices (i.e., supplier invoices which are not yet transferred to Accounting are typically cancelled). This is acceptable as long as these gaps can be explained by referring to SupplierInvoicing.) The term "LegallyRequiredInvoiceID" has been used for the extensions in SupplierInvoicing and DueItemManagement and can therefore be used in Financial Accounting as well. In A1S, the number can be referred to as "Sequential Document Number".

In some implementations, AccountingDocument includes AccountingDocument, which contains the header information for the document, and Items, wherein the line items contain the value-based changes and quantity changes as well as their assignment to concepts in GeneralLedger Accounting. By the assignment of a subledger account to a subnode of an item, that item can be enhanced by information specific to that subledger.

The root node can be extended with an additional element regarding the legally required document number and date which are required in order to fulfill legal regulatory compliance of China, France and Italy.

In some implementations, elements located at the node AccountingDocument are defined by the data type AccountingDocumentElements, and the AccountingDocument enhancement is defined by the data type AccountingDocumentLegalIDExtensionElements, and optionally include LegallyRequiredInvoiceID and LegallyRequiredInvoiceDate.

In some implementations, LegallyRequiredInvoiceID is based on GDT InvoiceLegallyRequiredID and is a unique identifier for a supplier or customer invoice which meets the requirements of legal authorities. It is generated when the customer invoice is released for payment requests or when the supplier invoice is approved by the invoice verification for further processing. The requirements for the procedure of generating a legal identifier depends on the country legislation.

In some implementations, LegallyRequiredInvoiceDate is based on GDT Date and is a date when the LegallyRequiredInvoiceID of an Invoice was generated.

Business Object AccountingDocumentReport

Figure 56:
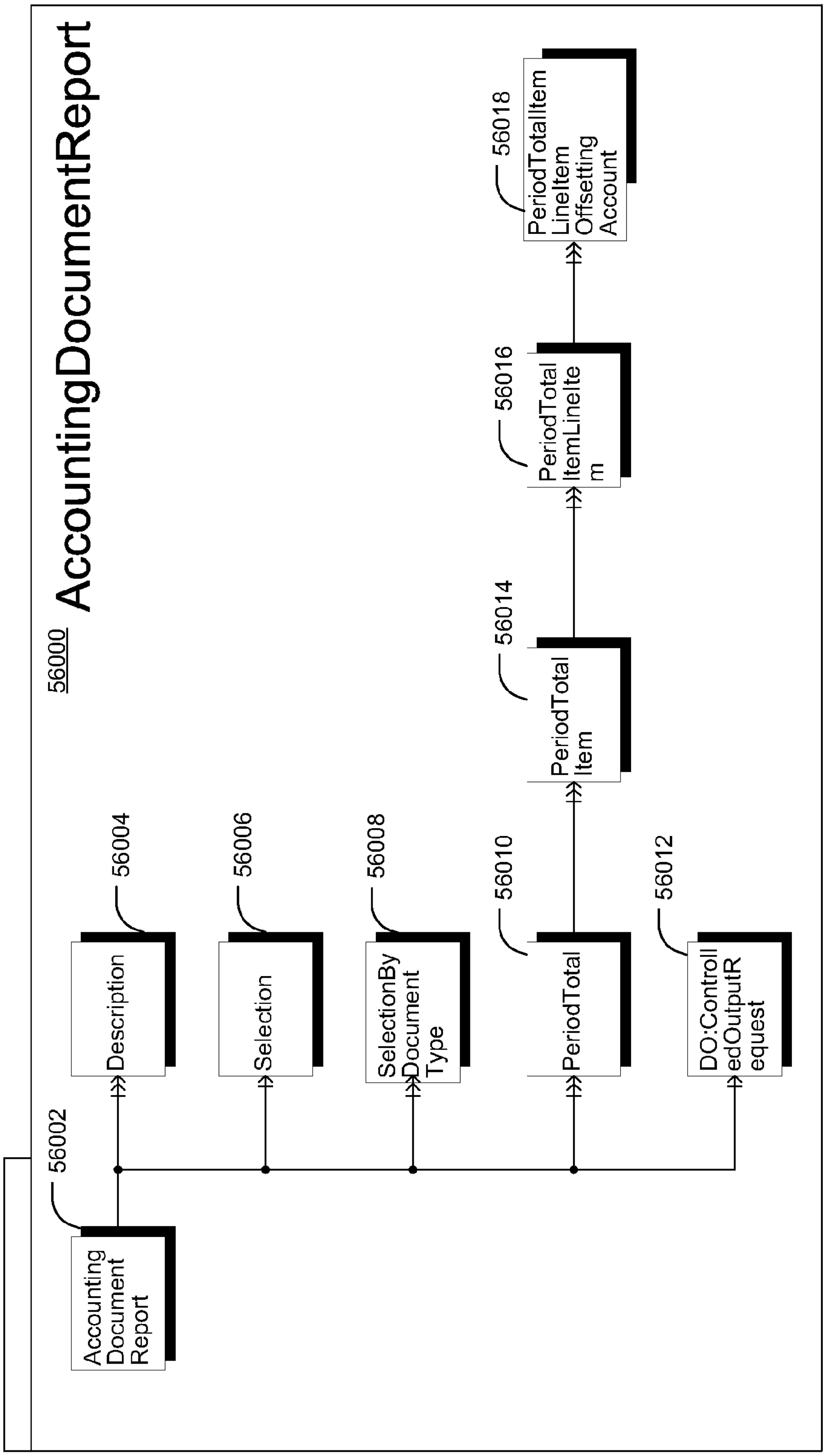
FIG. 56 shows an exemplary AccountingDocumentReport object model.

FIG. 56 illustrates an example AccountingDocumentReport business object model 56000. Specifically, this model depicts interactions among various hierarchical components of the AccountingDocumentReport.

A business object AccountingDocumentReport is a record of accounting documents grouped by period and formatted as stipulated by the legal authorities. The AccountingDocumentReport can list accounting documents. Data from the document header and line items from specific posting periods, companies and set of books are grouped, sorted, summarized and displayed together. The created and printed report list can serve the purposes of a company's proper financial reporting in accordance with a set of books, which can be delivered according specific formatting requirements. This Business Object can be a part of the globalization layer process component Financial Accounting.

In some implementations, Business Object AccountingDocumentReport is involved in the Accounting_OutputManagement Process Integration Model and its service interface Accounting Document Report Request is part of the Accounting_OutputManagement Process Integration Model. The Interface Accounting Document Report Request contains the operation which sends the Report to the printer. The operation Print Accounting Document Report can send the Report to the printer. The operation is based on the message type FormAccountingDocumentReportRequest derived from the business object Accounting Document Report.

AccountingDocumentReport can be a record of postings in the context of accounting documents and displays the most important data from the document header and line items together. In some implementations, the elements located at node AccountingDocumentReport are defined by the data type AccountingDocumentReportRootElements, and include UUID, RunDescription, CompanyUUID, CompanyID, ReportingCountryCode, OutputFormatCode, SystemAdministrativeData, and Status, and optionally includes GeneralLedgerFunctionalUnitUUID.

In some implementations, UUID is based on GDT UUID and is a universal unique identification of Accounting Document Report; RunDescription is based on GDT UUID and is a short description of an Accounting Document Report; CompanyUUID is based on GDT UUID and is a universally unique identification of the company for which the Report is created; CompanyID is based on GDT OrganisationalCentreID and is an identifier of the company for which the report is created; ReportingCountryCode is based on GDT CountryCode and is an identifier of the country for which the report is created; OutputFormatCode is based on GDT AccountingDocumentReportOutputFormatCode and is a coded representation of the output format of accounting document report; GeneralLedgerFunctionalUnitUUID is based on GDT UUID and is a universally unique identifier of the FunctionalUnit working on the AccountingDocumentReport, wherein the FunctionalUnit referenced is able to execute the organizational function GeneralLedger Accounting, i.e. the element OrganisationalFunctionCode in one of the instances of the node FunctionalUnitAttributes in the FunctionalUnit references may have the value, '19' (GeneralLedger); SystemAdministrativeData is based on GDT SystemAdministrativeData and is administrative data of the AccountingDocumentReport as recorded by the system; and Status, based on IDT AccountingDocumentReportStatus, includes ReleaseStatusCode, which is based on GDT ReleaseStatusCode and is a coded representation of the status of the release of an object.

From business object FunctionalUnit/node FunctionalUnit, AccountingDocumentReport can have a c:cn cardinality inbound association relationship with FunctionalUnit, which specifies the Functional Unit which is working on the AccountingDocumentReport. From business object Company/node Root, AccountingDocumentReport can have a 1:1 cardinality association for navigation with Company, which is all companies whose identification is used in the selection condition.

AccountingDocumentReport 560002 can have a 1:cn cardinality composition relationship to subordinate node Description 560004, a 1:c cardinality composition relationship to subordinate node Selection 560006, a 1:cn cardinality composition relationship to subordinate node SelectionByDocumentType 560008, a 1:cn cardinality composition relationship to subordinate node PeriodTotal 560010, a 1:c cardinality composition relationship to subordinate node ControlledOutputRequest 560012, and a 1:1 cardinality composition relationship to subordinate node DO: AccessControlList.

Propose is an Enterprise Service Infrastructure Action that can collect the accounting documents according to the selection parameters and create a preview. In some implementations, Selection node may be filled as a precondition, new nodes of the business object are created and will be filled with data according to the selection parameters, and the action is performed by the user on the UI or by the MDRO AccountingDocumentReportRun.

Release is an Enterprise Service Infrastructure Action that can release the previously proposed Accounting Document Report preview and print it for submitting to legal authorities. In some implementations, the action is only allowed when the status variable ReleaseStatusCode' value is 'Not Released', the Selection node and PeriodTotal node may be filled as a precondition, the value of status variable 'ReleaseStatusCode' will be set to 'Released', and the action is performed by the user on the UI or by the MDRO AccountingDocumentReportRun.

CreateWithReference is an Enterprise Service Infrastructure Action that can create a new Accounting Document Report which is based on the parameters of an existing Accounting Document Report. In some implementations, a new instance of an Accounting Document Report is created and the action is performed by the user on the UI.

A QueryByElements query can provide a list of all AccountingDocumentReport for which the values of the specified elements correspond to the values of the query elements. In some implementations, the data type AccountingDocumentReportElementsQueryElements defines the query elements, which optionally include UUID based on GDT UUID, RunDescription based on GDT SHORT_Description, SystemAdministrativeData based on GDT SystemAdministrativeData, OutputFormatCode based on GDT AccountingDocumentReportOutputFormatCode, and Status based on IDT AccountingDocumentReportStatus.

Subordinate node Description can be a natural language comment for the AccountingDocumentReport. In some implementations, the elements located at the node Description are defined by the data type AccountingDocumentReportDescriptionElements, and include Description, which is based on GDT LONG Description and is natural language text that represents a language-dependent comment for the accounting document report.

Subordinate node Selection can be selection parameters for creating an AccountingDocumentReport. In some implementations, the elements located at the node Selection are defined by the data type AccountingDocumentReportSelectionElements and include SetOfBooksID and FiscalYearID, and optionally include ChartOfAccountsCode, CurrencyCode, LowerBoundaryChartOfAccountsItemCode, UpperBoundaryChartOfAccountsItemCode, LowerBoundaryAccountingPeriodID, UpperBoundaryAccountingPeriodID, LowerBoundaryPostingDate, UpperBoundaryPostingDate, LowerBoundaryAccountingDocumentID, UpperBoundaryAccountingDocumentID, PostedUserAccountID, AcceptedUserAccountID, ReportTitle, StartPageCounterValue, StartBusinessTransactionDocumentNumberValue, CarryForwardDebitTotalAmount, and CarryForwardCreditTotalAmount.

In some implementations, SetOfBooksID is based on GDT SetOfBooksID and is a unique Identification of the SetOfBooks for which the report is created; ChartOfAccountsCode is based on GDT ChartOfAccountsCode and is a coded representation of Chart Of Account used for which the report is created; CurrencyCode is based on GDT CurrencyCode and is a currency code used to select accounting documents from account document; FiscalYearID is based on GDT FiscalYearID and is a fiscal year for which the report is created; LowerBoundaryChartOfAccountsItemCode is based on GDT ChartOfAccountsItemCode and is a starting Identifier for an item in the chart of accounts for which the report is created; UpperBoundaryChartOfAccountsItemCode is based on GDT ChartOfAccountsItemCode and is an ending Identifier for an item in the chart of accounts for which the report is created; LowerBoundaryAccountingPeriodID is based on GDT AccountingPeriodID and is a starting accounting period for which the report is created, wherein the value is all periods within fiscal year if not specified; UpperBoundaryAccountingPeriodID is based on GDT AccountingPeriodID and is an ending accounting period for which the report is created; LowerBoundaryPostingDate is based on GDT Date with Qualifier Posting and is a starting date with which the business transaction is effectively recorded in Accounting; UpperBoundaryPostingDate is based on GDT Date with Qualifier Posting and is an ending date with which the business transaction is effectively recorded in Accounting; LowerBoundaryAccountingDocumentID is based on GDT BusinessTransactionDocumentID and is a starting numerical identifier of accounting document which is unique within the company, set of books and fiscal year; UpperBoundaryAccountingDocumentID is based on GDT BusinessTransactionDocumentID and is an ending numerical identifier of accounting document which is unique within the company, set of books and fiscal year; PostedUserAccountID is based on GDT UserAccountID with Qualifier Responsible, is an account ID of user who has posted the accounting document, and is printed on the form; AcceptedUserAccountID is based on GDT UserAccountID with Qualifier Responsible, is an account ID of user who has accepted the accounting document, and is printed on the form; ReportTitle is based on GDT Long_Note and is natural language text provided to the report; StartPageCounterValue is based on GDT CounterValue with Qualifier Page and is a starting page number to be printed on the report; StartBusinessTransactionDocumentNumberValue is based on GDT NumberValue with Qualifier BusinessTransactionDocument and is a starting number used for sequentially numbering the accounting documents; CarryForwardDebitTotalAmount is based on GDT Amount with Qualifier Total and contains starting debit total amount for a period; and CarryForwardCreditTotalAmount is based on GDT Amount with Qualifier Total and contains starting credit total amount for a period.

In some implementations, if only one ChartOfAccountsItemCode is available, its identification is assigned to the field LowerBoundaryChartOfAccountsItemCode; if only one AccountingPeriodID is available, its identification is assigned to the field LowerBoundaryAccountingPeriodID; if only one PostingDate is available, its identification is assigned to the field LowerBoundaryPostingDate; and if only one AccountingDocumentID is available, its identification is assigned to the field LowerBoundaryAccountingDocumentID.

Subordinate node SelectionByDocumentType can be parameters for selection of accounting documents based on the accounting document type. In some implementations, the elements located at the node SelectionByDocumentType are defined by the data type AccountingDocumentReportSelectionByDocumentTypeElements, and optionally include InclusionExclusionCode, IntervalBoundaryTypeCode, LowerBoundaryDocumentTypeCode, and UpperBoundaryDocumentTypeCode. In some implementations, InclusionExclusionCode is based on GDT InclusionExclusionCode and is a code to determine whether the result set of the interval selection below is included into the entire result set or excluded from it; IntervalBoundaryTypeCode is based on GDT IntervalBoundaryTypeCode and is a coded representation of the boundary type of an interval used for selection of objects; LowerBoundaryDocumentTypeCode is based on GDT AccountingDocumentTypeCode and is a document type serving as a lower boundary of an interval condition for the selection of objects; and UpperBoundaryDocumentTypeCode is based on GDT AccountingDocumentTypeCode and is a document type serving as an upper boundary of an interval condition for the selection of objects.

In some implementations, if only one DocumentType is available, its identification is assigned to the field LowerBoundaryDocumentType.

Subordinate node PeriodTotal can be a period-specific record calculated from accounting documents about value changes for a set of books. In some implementations, the elements located at the node PeriodTotal are defined by the data type AccountingDocumentReportPeriodTotalElements and include AccountingPeriodID, LocalCurrencyStartBalanceAmount, LocalCurrencyDebitTotalAmount, LocalCurrencyCreditTotalAmount, and LocalCurrencyEndBalanceAmount, and optionally include BusinessTransactionDocumentGroupID, LineItemCurrencyStartBalanceAmount, LineItemCurrencyDebitTotalAmount, LineItemCurrencyCreditTotalAmount, LineItemCurrencyEndBalanceAmount, EndBusinessTransactionDocumentNumberValue, CarryForwardDebitTotalAmount, CarryForwardCreditTotalAmount, and EndPageCounterValue.

In some implementations, AccountingPeriodID is based on GDT AccountingPeriodID and is an identification of the accounting period for which PeriodTotal are created; BusinessTransactionDocumentGroupID is based on GDT BusinessTransactionDocumentGroupID and uniquely identifies a group of accounting documents that are to be considered as one group within a accounting document report; LineItemCurrencyStartBalanceAmount is based on GDT Amount with Qualifier Balance and is a start balance amount for a period in line item currency; LineItemCurrencyDebitTotalAmount is based on GDT Amount with Qualifier Total and is a total debit amount for a period in line item currency; LineItemCurrencyCreditTotalAmount is based on GDT Amount with Qualifier Total and is a total credit amount for a period in line item currency; LineItemCurrencyEndBalanceAmount is based on GDT Amount with Qualifier Balance and is the end balance amount for a period in line item currency; LocalCurrencyStartBalanceAmount is based on GDT Amount with Qualifier Balance and is a start balance amount for a period in local currency; LocalCurrencyDebitTotalAmount is based on GDT Amount with Qualifier Total and is a total debit amount for a period in local currency; LocalCurrencyCreditTotalAmount is based on GDT Amount with Qualifier Total and is a total credit amount for a period in local currency; LocalCurrencyEndBalanceAmount is based on GDT Amount with Qualifier Balance and is an end balance amount for a period in local currency; EndBusinessTransactionDocumentNumberValue is based on GDT NumberValue with Qualifier BusinessTransactionDocument and is the last number of previous report run used for sequentially numbering the accounting documents; CarryForwardDebitTotalAmount is based on GDT Amount with Qualifier Total and contains starting debit total amount for a period; CarryForwardCreditTotalAmount is based on GDT Amount with Qualifier Total and contains starting credit total amount for a period; and EndPageCounterValue is based on GDT CounterValue with Qualifier Page and is the last page number to be printed on the report.

PeriodTotal can have a 1:cn cardinality composition relationship to subordinate node PeriodTotalItem 560014. PeriodTotalItem can be a representation of a change to values of general ledger and subledger accounts resulting from a business transaction and relating to a company and a set of books. A PeriodTotalItem can be used to calculate the PeriodTotal for a given accounting period. In some implementations, the elements located at node PeriodTotalItem are defined by the data type AccountingDocumentReportPeriodTotalItemElements, and include AccountingDocumentID, AccountingDocumentPostingDate, AccountingBusinessTransactionTypeCode, and AccountingDocumentTypeCode, and optionally include PartnerOriginalEntryDocumentID, InvoiceLegallyRequiredID, BusinessTransactionDocumentNumberValue, ExchangeRate, AccountingDocumentNote, and CreationUserAccountID.

In some implementations, AccountingDocumentID is based on GDT BusinessTransactionDocumentID and is a numerical identifier of Accounting Document which is unique within the company, set of books and fiscal year; PartnerOriginalEntryDocumentID is based on GDT BusinessTransactionDocumentID and is an identification of the original entry document as assigned by the business partner (e.g., the ID of the Supplier Invoice assigned by the Supplier); InvoiceLegallyRequiredID is based on GDT InvoiceLegallyRequiredID and is a legally required identifier for a supplier invoice or a customer invoice; BusinessTransactionDocumentNumberValue is based on GDT NumberValue with Qualifier BusinessTransactionDocument and is a sequential number of accounting document given by the report; AccountingDocumentPostingDate is based on GDT Date and is the date with which the business transaction is effectively recorded in Accounting; AccountingBusinessTransactionTypeCode is based on GDT AccountingBusinessTransactionTypeCode, is a coded representation of the type of the business transactions for which the PeriodTotal is calculated, and classifies the business transactions according to accounting criteria; AccountingDocumentTypeCode is based on GDT AccountingDocumentTypeCode and is a coded representation of the type of the AccountingDocument to which the PeriodTotalItem refers by the AccountingDocumentReference; ExchangeRate is based on GDT ExchangeRate and is a representation of an exchange rate between two currencies, i.e., the relationship in which one currency can be exchanged for another currency; AccountingDocumentNote is based on GDT SHORT_Note and is a natural-language comment pertaining to the accounting document in the PeriodTotalItem; and CreationUserAccountID is based on GDT UserAccountID with Qualifier Responsible and is an account ID of user who has created the accounting document.

PeriodTotalItem can have a 1:cn cardinality composition relationship to subordinate node PeriodTotalItemLineItem 560016. A PeriodTotalItemLineItem can be a value-based change within an accounting document relating to the combination of a G/L account and a debit/credit indicator. In some implementations, the elements located at node PeriodTotalItemLineItem are defined by the data type AccountingDocumentReportPeriodTotalItemLineItemElements and include ChartOfAccountsCode, ChartOfAccountsItemCode, ItemID, LineItemCurrencyAmount, and LocalCurrencyAmount, and optionally include ChartOfAccountsItemCodeDescription, ExchangeRate, and AccountingDocumentItemNote.

In some implementations, ChartOfAccountsCode is based on GDT ChartOfAccountsCode and is a ChartOfAccounts of the field ChartOfAccountsItemCode; ChartOfAccountsItemCode is based on GDT ChartOfAccountsItemCode and is an item of ChartOfAccounts for which the data is recorded; ChartOfAccountsItemCodeDescription is based on GDT LONG_Description and contains description of GL account in the field GeneralLedgerAccount; ExchangeRate is based on GDT ExchangeRate and is a representation of an exchange rate between two currencies, i.e., the relationship in which one currency can be exchanged for another currency; AccountingDocumentItemNote is based on GDT: SHORT_Note and is a natural-language comment pertaining to accounting document item; ItemID is based on GDT BusinessTransactionDocumentItemID and is the line number of the accounting document; LineItemCurrencyAmount is based on GDT Amount with Qualifier LineItemCurrency and is the value of the item of an accounting document in the line item currency; and LocalCurrencyAmount is based on GDT Amount with Qualifier LocalCurrency and is the value of the item of an accounting document in the local currency of the Company carrying the account, wherein the local currency is the currency in which the local books are kept.

PeriodTotalItemLineItem can have a 1:cn cardinality composition relationship to subordinate node PeriodTotalItemLineItemOffsettingAccount 56018. PeriodTotalItemLineItemOffsettingAccount can be an account that contains the opposite side postings with reference to the accounting document in the AccountingDocumentReportPeriodTotalItemLineItemElements. Opposite side postings in this context means, for example, all credit accounts of a particular accounting document if the DebitCreditCode=debit and all debit accounts if DebitCreditCode=credit. In some implementations, the elements located at the node PeriodTotalItemLineItemOffsettingAccount are defined by the data type AccountingDocumentReportPeriodTotalItemLineItemOffsettingAccountElements and include CompanyUUID, ChartOfAccountsCode, and OffsettingChartOfAccountsItemCode.

In some implementations, CompanyUUID is based on GDT UUID and is a universally unique identification of the company to which the offsetting account of the line item of the accounting document is related; ChartOfAccountsCode is based on GDT ChartOfAccountsCode and is a chart of accounts to which the line item of the accounting document is related; and OffsettingChartOfAccountsItemCode is based on GDT ChartOfAccountsItemCode and is an offsetting account to which the line item of the accounting document is related.

Dependent Object ControlledOutputRequest can be a controller of output requests and output history entries related to the accounting document report and is defined in the dependent object Controlled Output Request.

Dependent Object AccessControlList can be a list of access groups that have access to an AccountingDocumentReport and is defined in the dependent object AccessControlList.

FIGS. 57-1 through 57-20 illustrate one example logical configuration of AccountingDocumentReportMessage message 57000. Specifically, this figure depicts the arrangement and hierarchy of various components such as one or more levels of packages, entities, and datatypes, shown here as 57000 though 57440. As described above, packages may be used to represent hierarchy levels. Entities are discrete business elements that are used during a business transaction. Data types are used to type object entities and interfaces with a structure. For example, AccountingDocumentReportMessage message 57000 includes, among other things, FormAccountingDocumentReport 57026. Accordingly, heterogeneous applications may communicate using this consistent message configured as such.

AccountingDocumentReport Message Types and Signatures

Message type FormAccountingDocumentReportRequest and its signature can be derived from the operations of the AccountingDocumentReport business object. In a signature, the business object can be contained as a "leading" business object. The message data type can define the structure of message type FormAccountingDocumentReport. One use of the AccountingDocumentReport is at the end of an accounting period, a company has to deliver account list of accounting documents for auditing purposes. The printout can be formatted according to legal requirements.

Message type FormAccountingDocumentReportRequest can be a record of an accounting document report as defined by legal requirements. In some implementations, the structure of FormAccountingDocumentReportRequest is determined by the message data type FormAccountingDocumentReportMessage, and FormAccountingDocumentReportRequest is used in the AccountingDocumentReportRequest PrintAccountingDocumentReport operation of Service Interface.

Message data type AccountingDocumentReportMessage can contain the object FormAccountingDocumentReport contained in the business document and the business information that can be relevant for sending a business document in a message. In some implementations, AccountingDocumentReportMessage contains the MessageHeader package and the AccountingDocumentReport package. This message data type can provide the structure for the FormAccountingDocumentReport message type and the operations that can be based on it.

MessageHeader Package can be a grouping of business information that is relevant for sending a business document in a message. In some implementations, MessageHeader Package contains the MessageHeader entity. MessageHeader can be a grouping of business information from the perspective of the sending application, including identification of the business document in a message; information about the sender; and optionally information about the recipient. In some implementations, MessageHeader contains SenderParty and RecipientParty, and MessageHeader is of the type GDT BusinessDocumentMessageHeader, whereby the ID and ReferenceID elements of the GDT are used. SenderParty can be the partner responsible for sending a business document at business application level. In some implementations, SenderParty is of the type GDT BusinessDocumentMessageHeaderParty. RecipientParty can be the partner responsible for receiving a business document at business application level. In some implementations, RecipientParty is of the type GDT BusinessDocumentMessageHeaderParty.

AccountingDocumentReport Package can be a grouping of AccountingDocumentReport with its packages. In some implementations, AccountingDocumentReport Package contains a Selection package, a Description package, and a PeriodTotal package.

AccountingDocumentReport can be a statement of accounting documents of a company. The statement can be given at the end of an accounting period, and can be given in the legally required form. The elements contained can be used for printout. In some implementations, a FormAccountingDocumentReport contains the elements OutputFormatCode, CompanyID, and OrganizationName, wherein OutputFormatCode has cardinality 1:1 and is based on GDT AccountingDocumentReportOutputFormatCode, CompanyID has cardinality 1:1 and is based on GDT OrganisationalCentreID, and OrganizationName has cardinality 1:1 and is based on GDT OrganizationName.

Selection Package can be a grouping of accounting document report selections. A Selection can be selection parameters for creating an AccountingDocumentReport. In some implementations, Selection contains the elements SetOfBooksID, ChartOfAccountsCode, CurrencyCode, FiscalYearID, LowerBoundaryChartOfAccountsItemCode, UpperBoundaryChartOfAccountsItemCode, LowerBoundaryAccountingPeriodID, UpperBoundaryAccountingPeriodID, LowerBoundaryPostingDate, UpperBoundaryPostingDate, LowerBoundaryAccountingDocumentID, UpperBoundaryAccountingDocumentID, PostedUserAccountID, PostedUserName, AcceptedUserAccountID, AcceptedUserName, ReportTitle, StartPageCounterValue, StartBusinessTransactionDocumentNumberValue, CarryForwardDebitTotalAmount, and CarryForwardCreditTotalAmount, wherein SetOfBooksID has cardinality 1:1 and is based on GDT SetOfBooksID, ChartOfAccountsCode has Cardinality 0:1 and is based on GDT ChartOfAccountsCode, CurrencyCode has Cardinality 0:1 and is based on GDT CurrencyCode, FiscalYearID has Cardinality 1:1 and is based on GDT FiscalYearID, LowerBoundaryChartOfAccountsItemCode has Cardinality 0:1 and is based on GDT ChartOfAccountsItemCode, UpperBoundaryChartOfAccountsItemCode has Cardinality 0:1 and is based on GDT ChartOfAccountsItemCode, LowerBoundaryAccountingPeriodID has Cardinality 0:1 and is based on GDT AccountingPeriodID, UpperBoundaryAccountingPeriodID has Cardinality 0:1 and is based on GDT AccountingPeriodID, LowerBoundaryPostingDate has Cardinality 0:1 and is based on GDT Date, UpperBoundaryPostingDate has Cardinality 0:1 and is based on GDT Date, LowerBoundaryAccountingDocumentID has Cardinality 0:1 and is based on GDT BusinessTransactionDocumentID, UpperBoundaryAccountingDocumentID has Cardinality 0:1 and is based on GDT BusinessTransactionDocumentID, PostedUserAccountID has Cardinality 0:1 and is based on GDT UserAccountID, PostedUserName has Cardinality 0:1 and is based on GDT MEDIUM_Name, AcceptedUserAccountID has Cardinality 0:1 and is based on GDT UserAccountID, AcceptedUserName has Cardinality 0:1 and is based on GDT MEDIUM_Name, ReportTitle has Cardinality 0:1 and is based on GDT Long_Note, StartPageCounterValue has Cardinality 0:1 and is based on GDT CounterValue, StartBusinessTransactionDocumentNumberValue has Cardinality 0:1 and is based on GDT NumberValue, CarryForwardDebitTotalAmount has Cardinality 0:1 and is based on GDT Amount, and CarryForwardCreditTotalAmount has Cardinality 0:1 and is based on GDT Amount.

Description Package can be a grouping of accounting document report descriptions. A Description can be a natural language comment for an AccountingDocumentReport. In some implementations, Description contains the element Description, wherein Description has Cardinality 0:1 and is based on GDT LONG_Description.

PeriodTotal Package can be a grouping of PeriodTotal with its package PeriodTotalItem.

PeriodTotal can be a record of period totals calculated from accounting documents. In some implementations PeriodTotal contains the elements AccountingPeriodID, BusinessTransactionDocumentGroupID, LineItemCurrencyStartBalanceAmount, LineItemCurrencyDebitTotalAmount, LineItemCurrencyCreditTotalAmount, LineItemCurrencyEndBalanceAmount, LocalCurrencyStartBalanceAmount, LocalCurrencyDebitTotalAmount, LocalCurrencyCreditTotalAmount, LocalCurrencyEndBalanceAmount, EndBusinessTransactionDocumentNumberValue, CarryForwardDebitTotalAmount, and CarryForwardCreditTotalAmount, wherein AccountingPeriodID has Cardinality 1:1 and is based on GDT AccountingPeriodID, BusinessTransactionDocumentGroupID has Cardinality 0:1 and is based on GDT BusinessTransactionDocumentGroupID, LineItemCurrencyStartBalanceAmount has Cardinality 0:1 and is based on GDT Amount, LineItemCurrencyDebitTotalAmount has Cardinality 0:1 and is based on GDT Amount, LineItemCurrencyCreditTotalAmount has Cardinality 0:1 and is based on GDT Amount, LineItemCurrencyEndBalanceAmount has Cardinality 0:1 and is based on GDT Amount, LocalCurrencyStartBalanceAmount has Cardinality 1:1 and is based on GDT Amount, LocalCurrencyDebitTotalAmount has Cardinality 1:1 and is based on GDT Amount, LocalCurrencyCreditTotalAmount has Cardinality 1:1 and is based on GDT Amount, LocalCurrencyEndBalanceAmount has Cardinality 1:1 and is based on GDT Amount, EndBusinessTransactionDocumentNumberValue has Cardinality 0:1 and is based on GDT NumberValue, CarryForwardDebitTotalAmount has Cardinality 0:1 and is based on GDT Amount, and CarryForwardCreditTotalAmount has Cardinality 0:1 and is based on GDT Amount.

PeriodTotalItem Package can be a grouping of the PeriodTotalItem with its PeriodTotalItemLineItem package. PeriodTotalItem can be a data record contained in or derived from accounting documents which can be used to calculate the period totals for a given accounting period. In some implementations, PeriodTotalItem contains the elements AccountingDocumentID, PartnerOriginalEntryDocumentID, InvoiceLegallyRequiredID, BusinessTransactionDocumentNumberValue, AccountingDocumentPostingDate, AccountingBusinessTransactionTypeCode, AccountingDocumentTypeCode, ExchangeRate, AccountingDocumentNote, CreationUserAccountID, and CreationUserName, wherein AccountingDocumentID has Cardinality 1:1 and is based on GDT BusinessTransactionDocumentID, PartnerOriginalEntryDocumentID has Cardinality 0:1 and is based on GDT BusinessTransactionDocumentID, InvoiceLegallyRequiredID has Cardinality 0:1 and is based on GDT InvoiceLegallyRequiredID, BusinessTransactionDocumentNumberValue has Cardinality 0:1 and is based on GDT NumberValue, AccountingDocumentPostingDate has Cardinality 1:1 and is based on GDT Date, AccountingBusinessTransactionTypeCode has Cardinality 1:1 and is based on GDT AccountingBusinessTransactionTypeCode, AccountingDocumentTypeCode has Cardinality 1:1 and is based on GDT AccountingDocumentTypeCode, ExchangeRate has Cardinality of 0:1 and is based on GDT ExchangeRate, AccountingDocumentNote has Cardinality 0:1 and is based on GDT SHORT_Note, CreationUserAccountID has Cardinality 0:1 and is based on GDT UserAccountID, and CreationUserName has Cardinality 1:1 and is based on GDT MEDIUM_Name.

PeriodTotalItemLineItem Package can be a grouping of PeriodTotalItemLineItem with its PeriodTotalItemLineItemOffsettingAccount package. PeriodTotalItemLineItem can be a data record contained in or derived from accounting documents which are used to calculate the period totals for a given accounting period. In some implementations, PeriodTotalItemLineItem contains the elements ChartOfAccountsCode, ChartOfAccountsItemCode, ChartOfAccountsItemCodeDescription, ExchangeRate, AccountingDocumentItemNote, ItemID, LineItemCurrencyAmount, and LocalCurrencyAmount, wherein ChartOfAccountsCode has Cardinality 1:1 and is based on GDT ChartOfAccountsCode, ChartOfAccountsItemCode has Cardinality 1:1 and is based on GDT ChartOfAccountsItemCode, ChartOfAccountsItemCodeDescription has Cardinality 0:1 and is based on GDT LONG Description, ExchangeRate has Cardinality 0:1 and is based on GDT ExchangeRate, AccountingDocumentItemNote has Cardinality 0:1 and is based on GDT SHORT_Note, ItemID has Cardinality 1:1 and is based on GDT BusinessTransactionDocumentItemID, LineItemCurrencyAmount has Cardinality 1:1 and is based on GDT Amount, and LocalCurrencyAmount has Cardinality 1:1 and is based on GDT Amount.

PeriodTotalItemLineItemOffsettingAccount Package can be the grouping of offsetting accounts. PeriodTotalItemLineItemOffsettingAccount can be the offsetting account which is on the opposite side compared to the credit or debit side of the account stored in the line item of the accounting document.

In some implementations a PeriodTotalItemLineItemOffsettingAccount contains the elements CompanyUUID, ChartOfAccountsCode, and OffsettingChartOfAccountsItemCode, wherein CompanyUUID has Cardinality 1:1 and is based on GDT UUID, ChartOfAccountsCode has Cardinality 1:1 and is based on GDT ChartOfAccountsCode, and OffsettingChartOfAccountsItemCode has Cardinality 1:1 and is based on GDT ChartOfAccountsItemCode.

Message data type AccountingDocumentReportMessage can use data types AccountingBusinessTransactionTypeCode, AccountingDocumentReportOutputFormatCode, AccountingDocumentTypeCode, AccountingPeriodID, Amount, BusinessDocumentMessageHeader, BusinessDocumentMessageID, BusinessTransactionDocumentGroupID, BusinessTransactionDocumentID, BusinessTransactionDocumentItemID, ChartOfAccountsCode, ChartOfAccountsItemCode, CounterValue, CurrencyCode, Date, ExchangeRate, FiscalYearID, InvoiceLegallyRequiredID, LONG Description, Long_Note, MEDIUM_Name, NumberValue, OrganisationalCentreID, OrganizationName, SetOfBooksID, SHORT_Note, UserAccountID, and UUID.

Figures 1, 58:
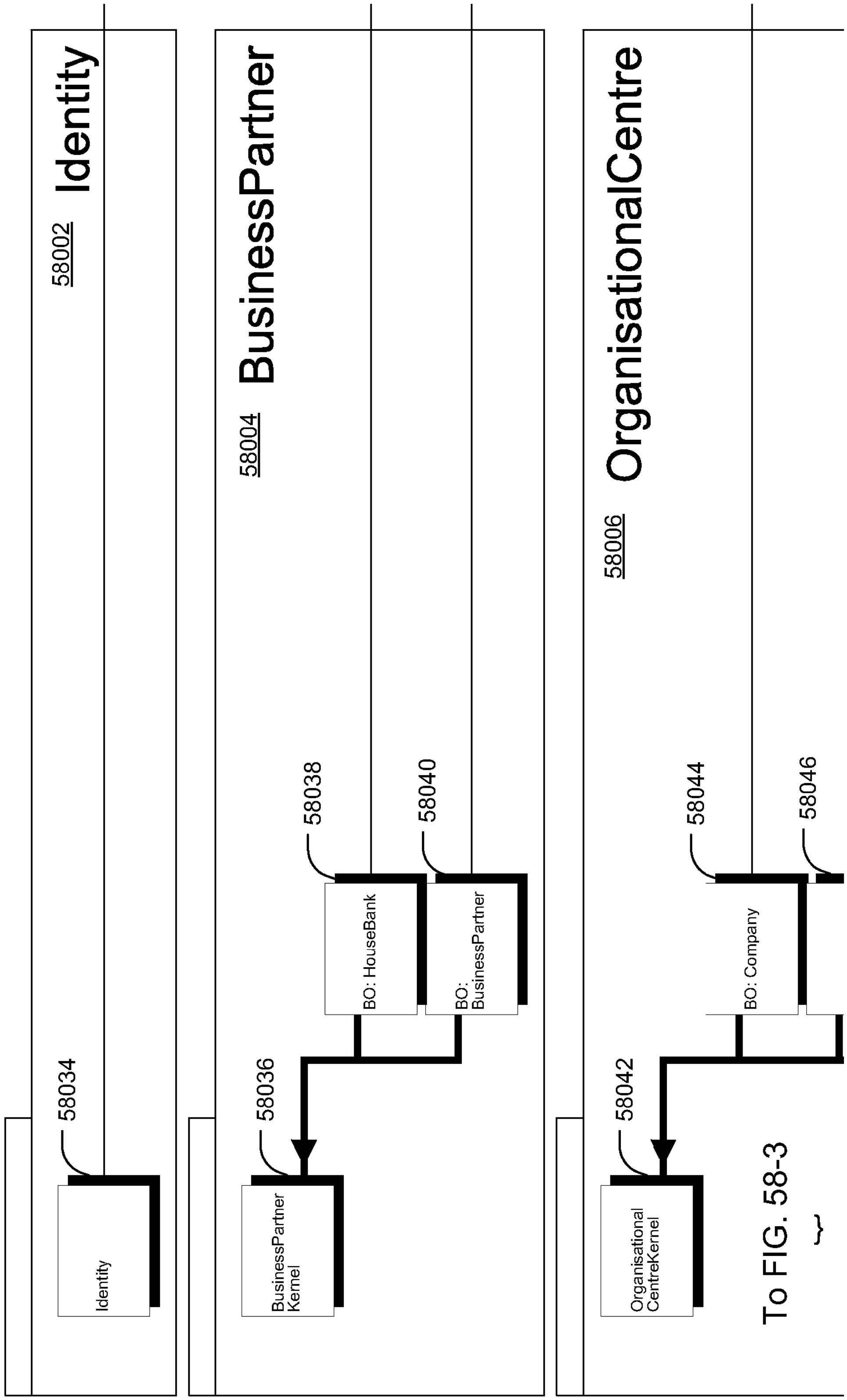
Figures 2, 58:
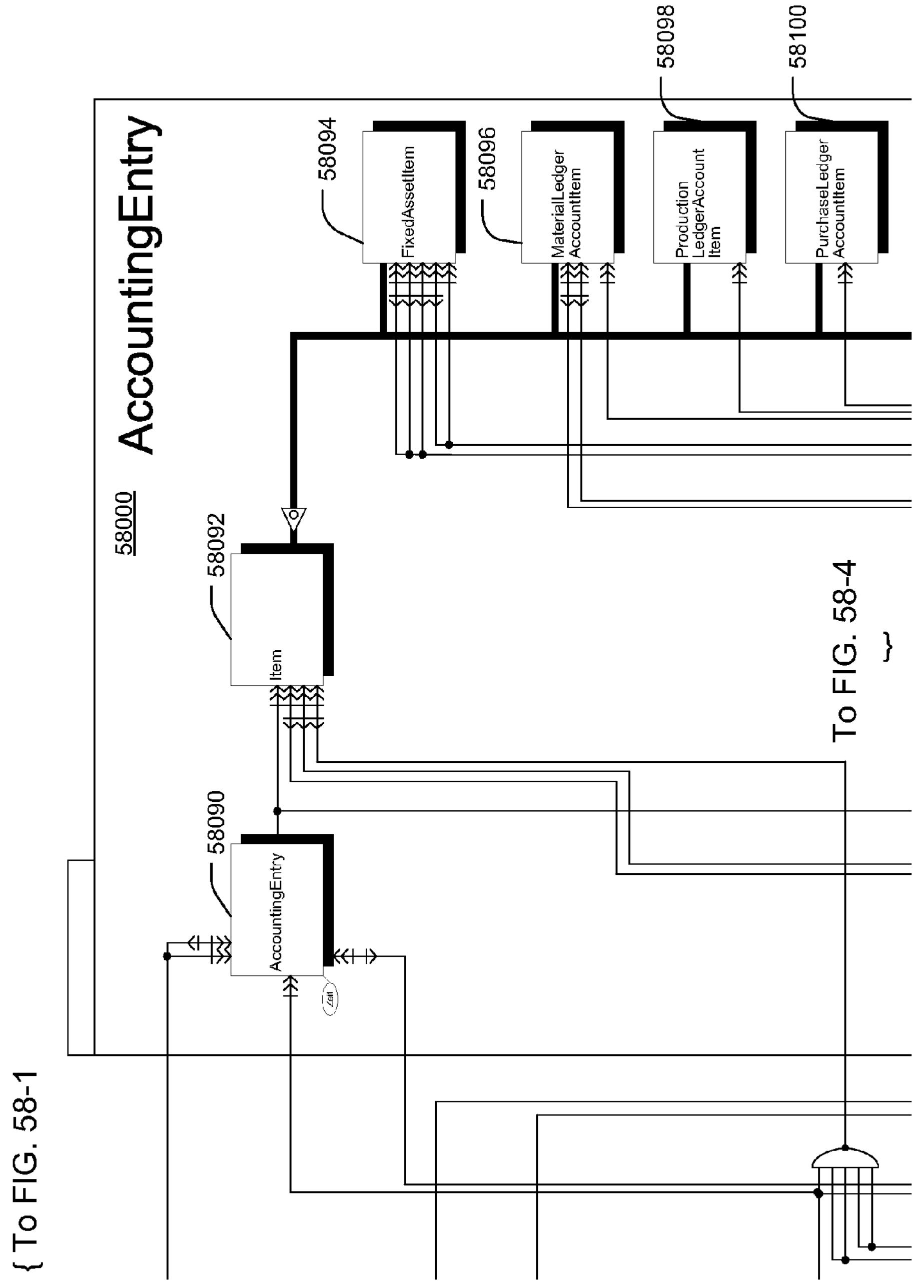
Figures 3, 58:
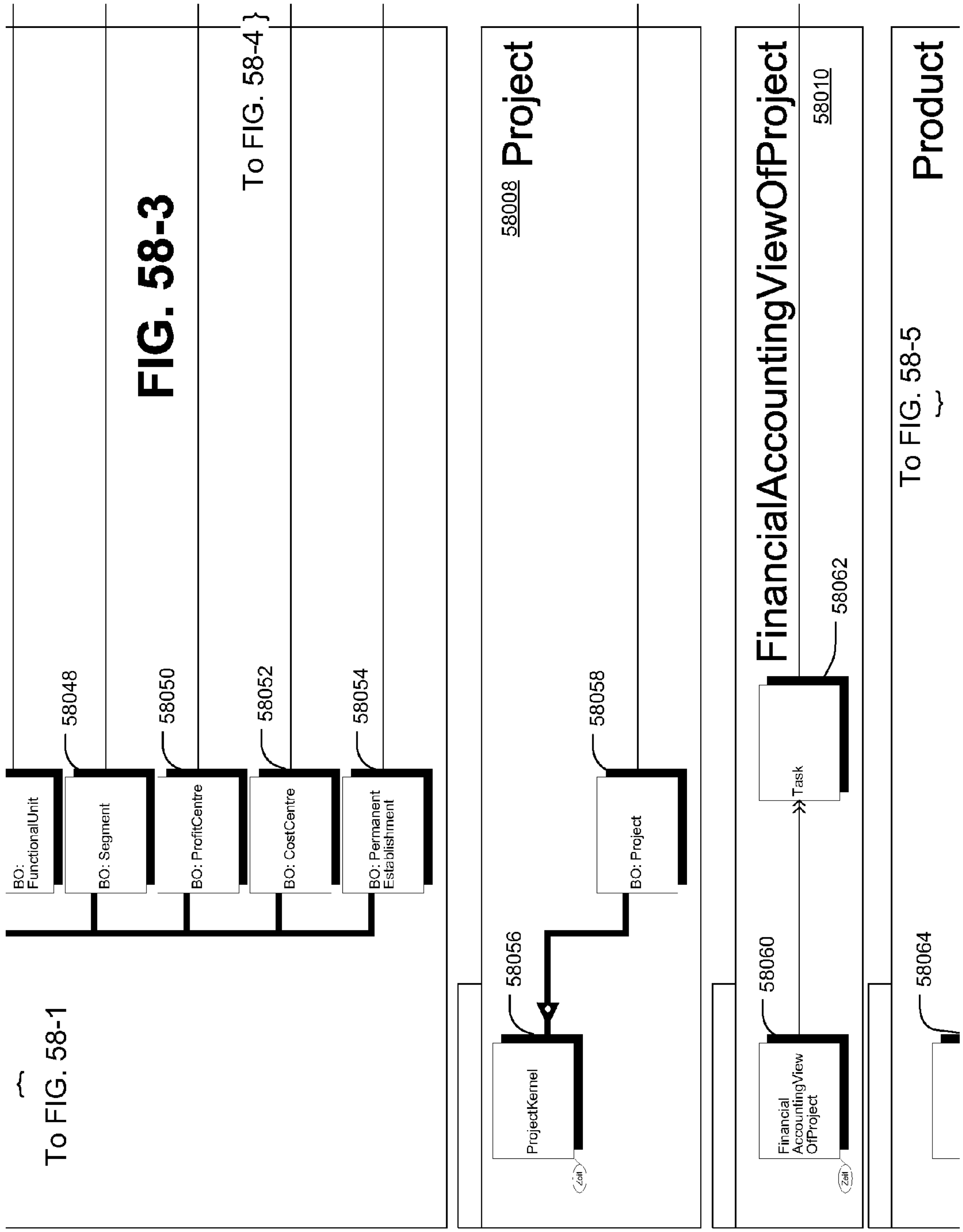
Figures 4, 58:
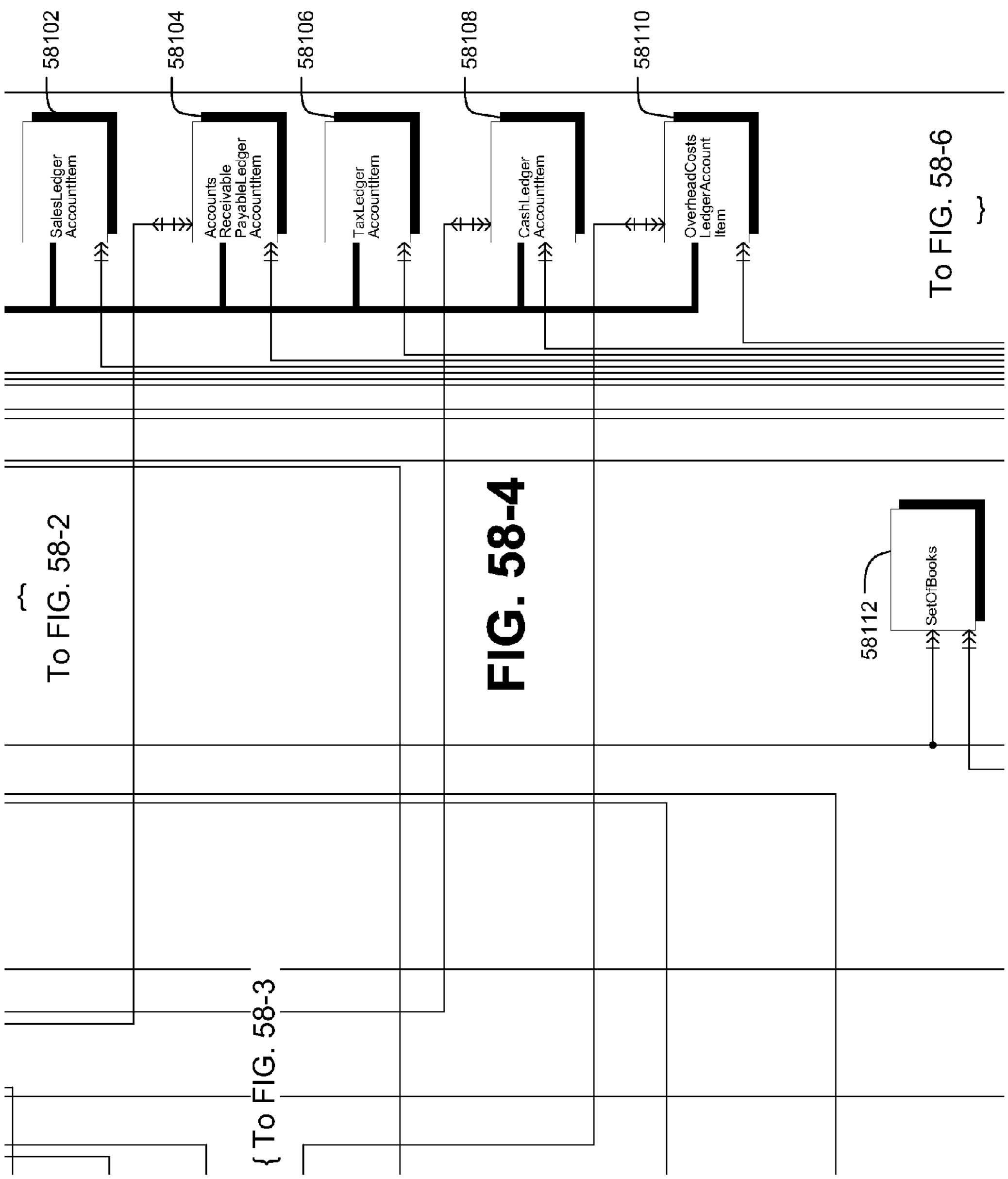
Figures 5, 58:
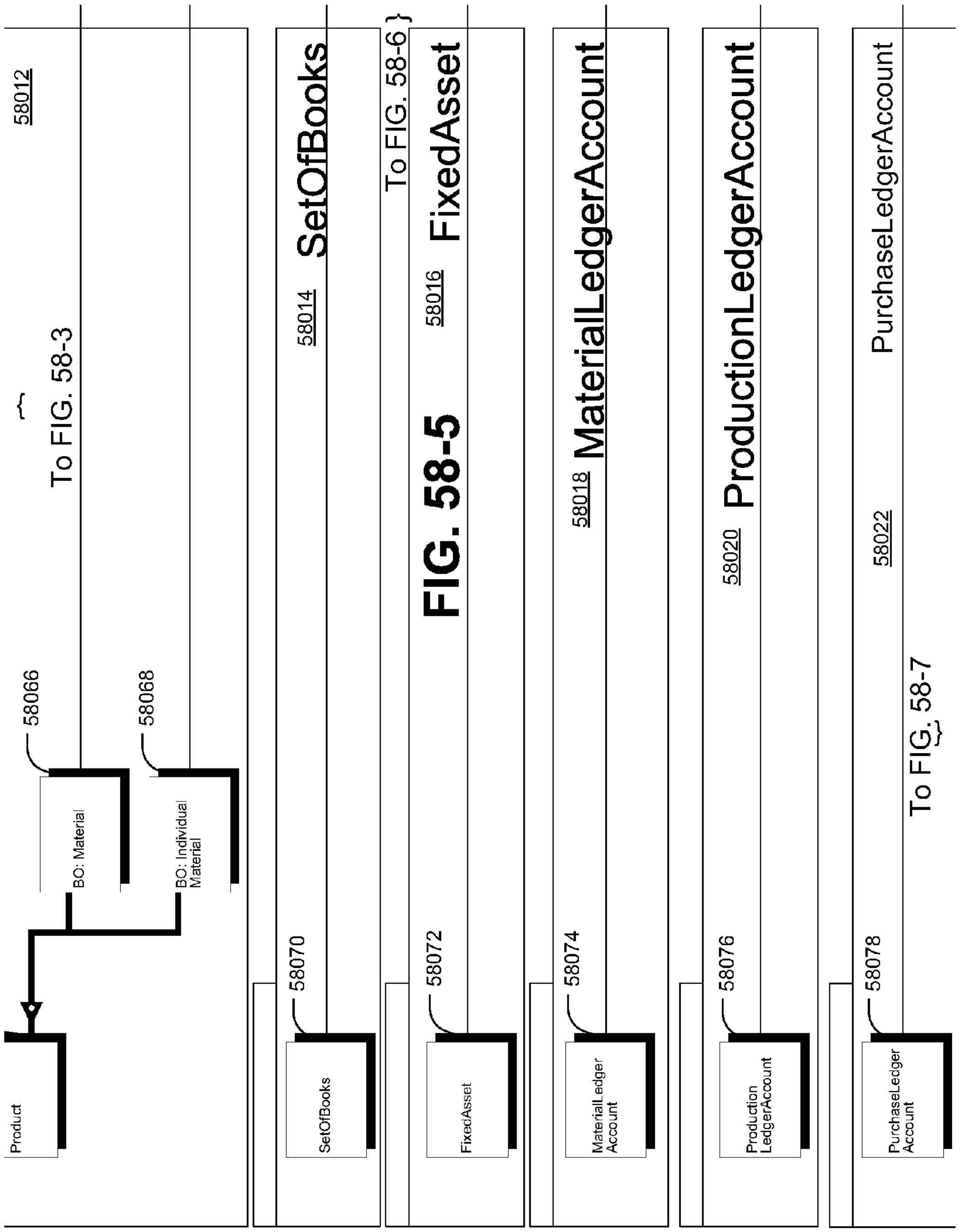
Figures 6, 58:
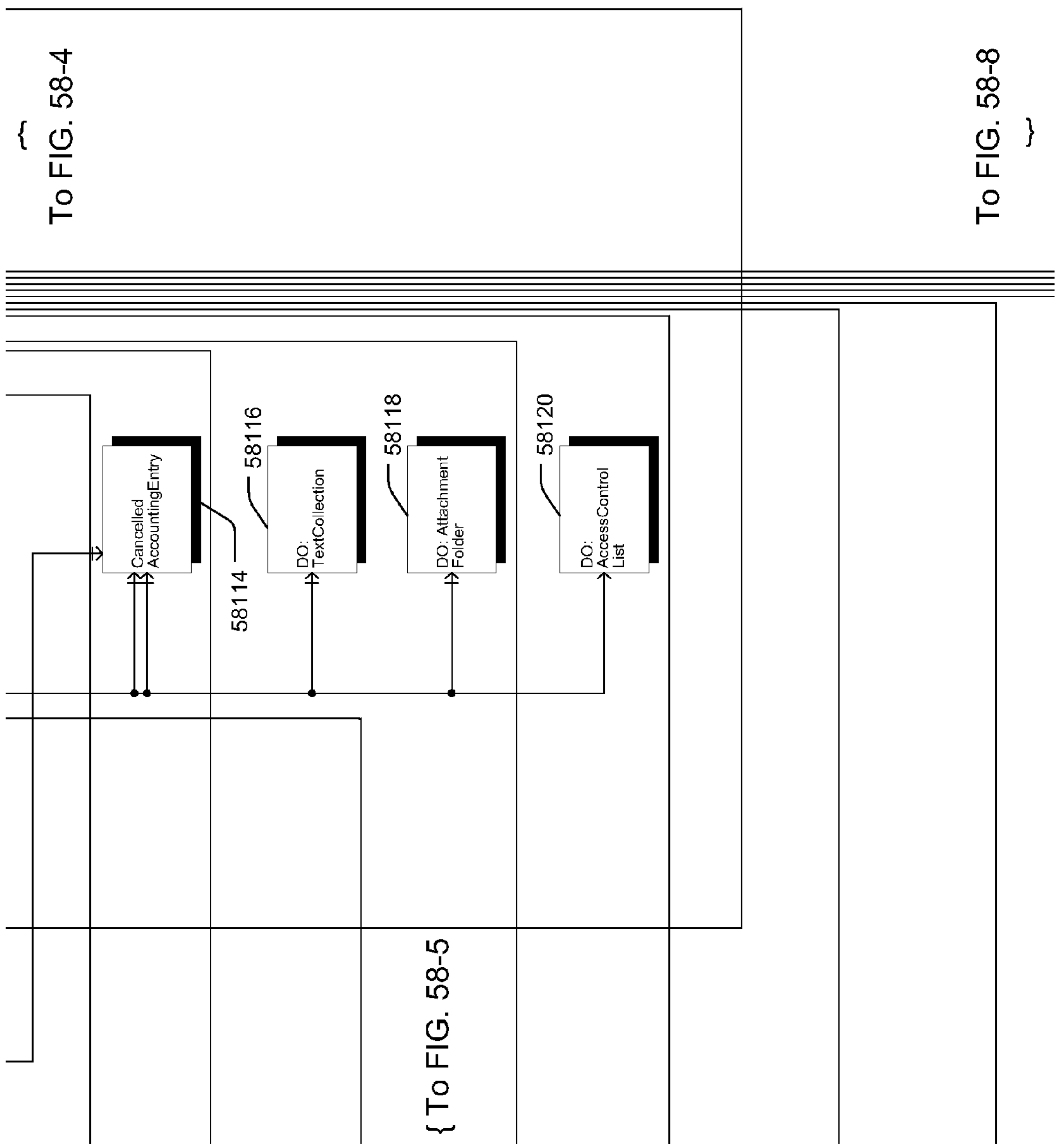
Figures 7, 58:
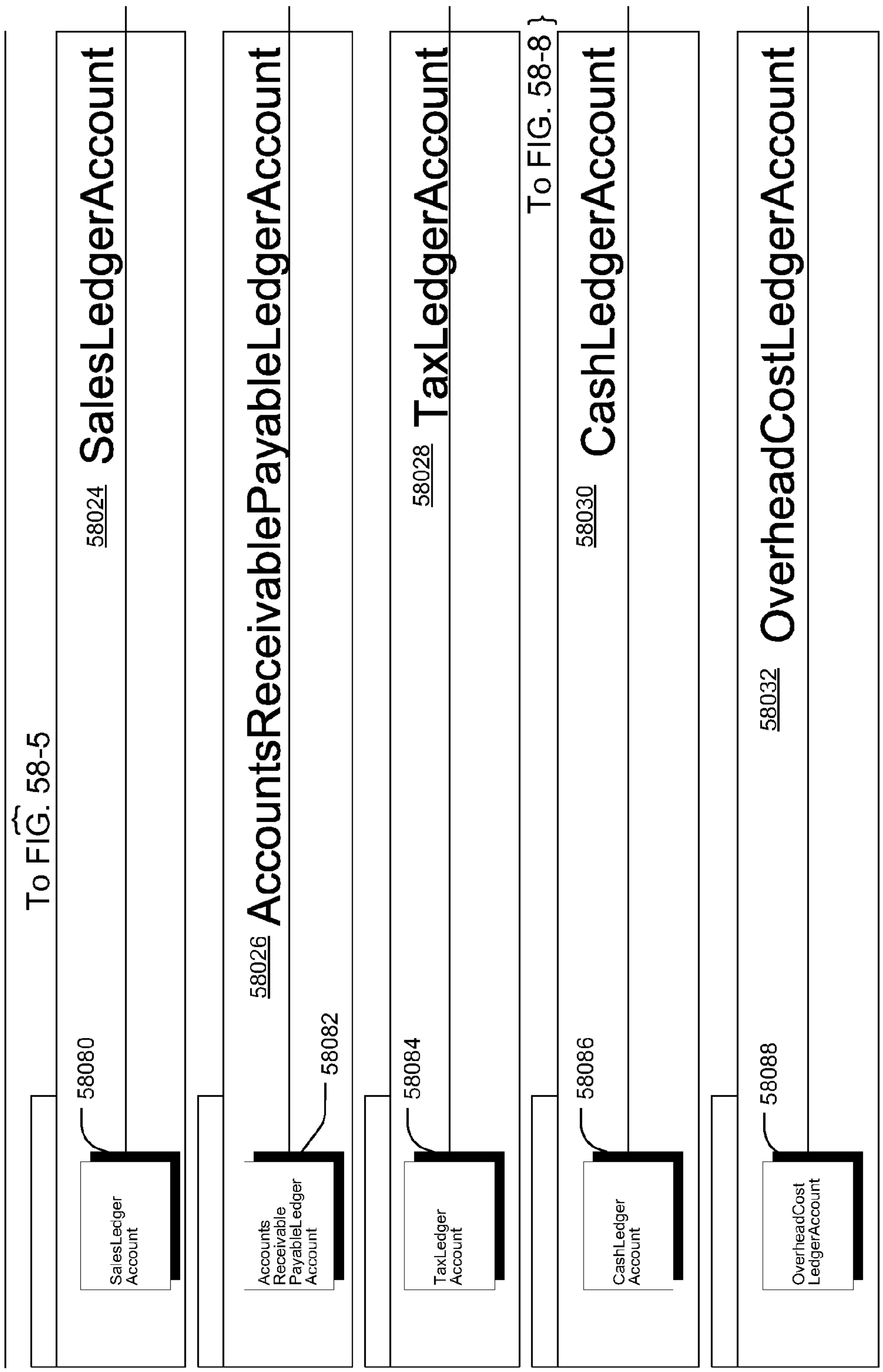
Figures 8, 58:
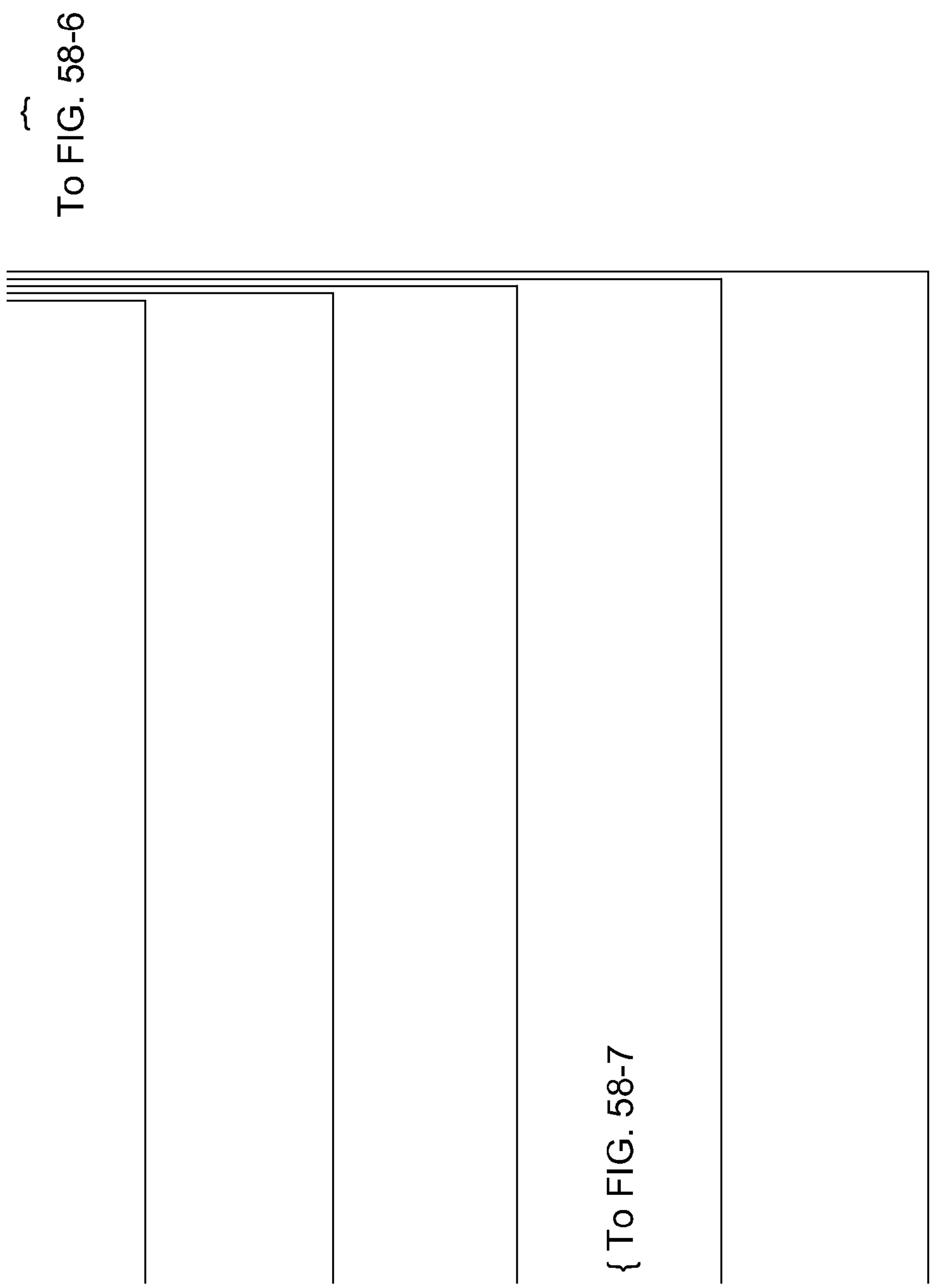

FIGS. 58-1 through 58-9 illustrate an example AccountingEntry business object model 58000. Specifically, this model depicts interactions among various hierarchical components of the AccountingEntry, as well as external components that interact with the AccountingEntry (shown here as 58000 through 58088).

Business Object AccountingEntry

An AccountingEntry can be a captured business transaction concerning a value change in the asset and equity structure of a company. The entry can be made in relation to the accounts of the general ledger and of the subledgers, applying the rules of one or more sets of books. The business object AccountingEntry can be part of the process component Accounting Processing. An AccountingEntry may consists of AccountingEntry 58090, Items 58092, Cancellation, SetOfBooks 58112, TextCollection 58116, and Attachment 58118. AccountingEntry may contain the header information of the business transaction to be entered. Items may contain the changes to values in the accounts and their assignment to coding terms in GeneralLedger Accounting. Where necessary, each Item 58092 can be supplemented with subledger-specific information in a subnode. Cancellation may contain the cancellation reference information for the cancellation of entered AccountingEntry instances. In reference to SetOfBooks, an AccountingEntry can relate to more than one set of books. The specifications of the accounting principles applied are represented in their own separate nodes. TextCollection can be the natural-language text for the business transaction entered. Attachment can be the attachment of other Business Documents, e.g. Office Documents. The business object Accounting Entry may have the service interface Account Balance Migration In, which can be used to transfer legacy data to Financial Accounting.

The Service Interface Account Balance Migration In (i.e. AccountBalanceMigrationIn) can group the operations that inform Accounting about balances of a GeneralLedger which are to be migrated from a legacy system to a new ERP system. The AccountBalanceMigrationIn.MigrateAccountBalance can convert information about balances of a GeneralLedger which are to be migrated from a legacy system to a new ERP system into AccountingEntry. The operation can be based on message type Accounting Account Balance Migrate Request Message (derived from business object AccountingEntry).

Node Structure of Business Object AccountingEntry AccountingEntry

An AccountingEntry (root) can be the capture of a value change in the asset and equity structure of a company following a business transaction. It may contain information for identifying the AccountingEntry, consisting of the company and the entry document number, as well as information valid for all items (that is, unique for the entire document), such as the posting date and the document date. The elements directly located on the AccountingEntry node can be defined by the GDT AccountingEntryElements. These elements include: UUID which can be an universally unique identifier of an AccountingEntry and can be of type GDT: UUID, ID which can be an Unique identifier of an AccountingEntry and can be of type GDT: BusinessTransactionDocumentID, CompanyUUID which can be an universally unique identifier of the company for which an accounting transaction is entered and can be of type GDT: UUID, CompanyID which can be an unique identifier of the company for which an accounting transaction is entered and can be of type GDT: OrganisationalCentreID, Note which can contain a text with more detailed information on the AccountingEntry entered and can be of type GDT: ShortNote, GeneralLedgerFunctionalUnitUUID which can be an universally unique identifier of the FunctionalUnit working on the AccountingEntry and can be of type GDT: UUID (integrity of the FunctionalUnit referenced can execute the organizational function GeneralLedger Accounting, i.e. the element OrganisationalFunctionCode in one of the instances of the node FunctionalUnitAttributes in the FunctionalUnit references can have the value '19' (GeneralLedger)), AccountingDocumentTypeCode can classify the document using customer-specific classification and can be of type GDT: AccountingDocumentTypeCode, EntryDate may contain the date of the relevant original document that caused the accounting transaction to be entered and be of type GDT: Date and of type QUALIFIER: Entry, PostingDate may contain the date with which the accounting document is entered in accounting and from which the fiscal year and the accounting period are derived and can be of type GDT: Date and of type QUALIFIER: Posting, AccountingClosingStepCode can be the coded representation of a step during closing in accounting (Closing in accounting describes a consolidated status on the key date in the books in accounting. Closing is divided into steps that are processed in a logical order from the business view. Once closing is complete, it may not possible to make postings to closed periods and can be of type GDT: AccountingClosingStepCode, BusinessTransactionTypeCode can classify the entered accounting transaction according to the type of business transaction it relates to and can be of type GDT: BusinessTransactionTypeCode, TransactionCurrencyCode can specify the currency in which the valuated accounting transaction is entered and can be of type GDT: CurrencyCode, CancellationDocumentIndicator can specify whether the accounting entry is a cancellation document and can be of type GDT: Indicator and of type QUALIFIER: CancellationDocument, CancellationAccountingEntryUUID can be an universally unique identifier of the AccountingEntry which cancels this AccountingEntry and can be of type GDT: UUID, SystemAdministrativeData can contain administrative data (e.g. timestamp of creation and can be of type GDT: SystemAdministrativeData, Status can contain PostingStatusCode, ApprovalStatusCode, LifeCycleStatusCode and can be of type IDT: AccountingEntryStatus, and Key can be an unique semantic key for the AccountingEntry and can be of type IDT: AccountingEntryKey (the AccountingEntryKey may contain the elements ID and Company). Furthermore, PostingStatusCode can specify the posting status of the Accounting Entry, that is, the status of the Accounting Entry with regard to document processing in Financial Accounting and can be of type GDT: PostingStatusCode. The ApprovalStatusCode can specify the authorization status of the Accounting Entry, that is, the status with regard to the principle of dual control and can be of type GDT: ApprovalStatusCode. LifeCycleStatusCode can specify the overall status of the Accounting Entry, that is, the status of the Accounting Entry with regard to document processing in Financial Accounting and approval status code and can be of type GDT: AccountingEntryLifeCycleStatusCode.

The following composition relationships to subordinate nodes exist: Item has a cardinality of 1:cn, SetOfBooks has a cardinality of 1:cn, CancelledAccountingEntry has a cardinality of 1:c, TextCollection has a cardinality of 1:c, Attachment has a cardinality of 1:c, and AccessControlList 58120 has a cardinality of 1:1. There may be a number of inbound aggregation relationships including from business object Company/Root in which Company may be a cardinality relationship of 1:cn and to which the representation of the business transaction can relate. There may be a number of inbound association relationships including from business object Identity/node Identity. Such as CreationIdentity which may be a cardinality relationship of 1:cn and specifies the identity of the one who created the accounting document. And such as LastChangeIdentity which may be a cardinality relationship of c:cn and which specifies the identity oft the one who did the last change of the accounting document, i.e. reversed the accounting document. There may be a number of inbound association relationships including from business object FunctionalUnit/node FunctionalUnit in which FunctionalUnit may be a cardinality relationship of c:cn and specifies the FunctionalUnit which is working on the AccountingEntry. Furthermore, there may be a number of association relationships for navigation including to business object AccountingDocument/Root in which AccountingDocument may be a cardinality relationship of 1:cn and AccountingEntry in the status "posted" can refer to at least one or more AccountingDocument instances.

In some implementations the Enterprise Service Infrastructure Actions may include Simulate, Post, cancel, revoke cancellation, void, submit for posting, approve, and reject. With the simulate action, data enhancements and derivations can be tested during document processing in Financial Accounting. For the simulation action, the preconditions can exist in which the instance of the Accounting Entry does not contain errors. The preconditions which can result from Status & Action Management can include: the status variable LifeCycleStatusCode which can have a value In Process. Other preconditions need not be considered as well as changes to the object, changes to the status and parameters (the action can be performed on one or multiple node instances). In the case of a change to other objects, instances of the business object Accounting Document can be created The usage of simulate can be such that this action can be performed by all service consumers.

Referring to the Post action, data enhancements and derivations can be processed during document processing in Financial Accounting, and the resulting accounting documents can be posted. The instance of the Accounting Entry may not contain any errors and the preconditions that can result from Status & Action Management include the status variable Life Cycle Status which can have the value In Process. The status variable Approval Status can have the value Approved or the value Not necessary. Other preconditions need not be considered as well as changes to the object, and parameters (the action can be performed on one or multiple node instances). Should changes to other objects occur, instances of the business object Accounting Document can be created. Should changes to the status occur, the status variable Accounting Entry Posting Status may contain the value Posted. This action can be performed by all service consumers.

Referring to the Cancel action, a posted Accounting Entry can be cancelled along with its follow-on documents in Financial Accounting. As a precondition, the instance of the Accounting Entry can be posted. Preconditions that result from Status & Action Management may include the status variable Accounting Entry Posting Status which can have the value Posted. Further can include the status variable Approval Status which can have the value Approved or the value Not necessary. Other preconditions need not be considered as well as parameters (the action is performed on one or multiple node instances). Should there be changes to the object, a new instance of the business object Accounting Entry can be generated and marked as a cancellation document. This new instance can contain the reference data of the Accounting Entry to be cancelled. Should there be changes to other objects, the related instances of the business object Accounting Document can be cancelled. Should there be changes to the status, the status variable Accounting Entry Posting Status can contain the value Cancelled. And the status variable Accounting Entry Posting Status of the cancellation document can contain the value Posted. This action can be performed by all service consumers.

Referring to the RevokeCancellation action, the cancellation of an Accounting Entry in Financial Accounting can be revoked. The instance of the Accounting Entry can be created as a cancellation document of another Accounting Entry. Preconditions that can result from Status & Action Management can include the status variable Life Cycle Status which can have the value Cancelled and can include the status variable Approval Status Code which can have the value Approved or the value Not necessary. Other preconditions need not be considered as well as parameters (the action can be performed on one or multiple node instances). Should their be changes to the object, a new instance of the business object Accounting Entry can be generated and marked as a cancellation document. This new instance can contain the reference data of the Accounting Entry to be cancelled. Should there be changes to other objects, the related instances of the business object Accounting Document can be cancelled. Should there be changes to the status, the status variable Life Cycle Status can obtain the value Cancelled and the status variable Life Cycle Status of the cancellation document can obtain the value Posted. This action can be performed by all service consumers.

Referring to the Void action, an instance of the business object Accounting Entry that has not yet been posted can be marked as obsolete and can be deactivated for follow-on actions. For example, it may not be possible to post a deactivated instance of the Accounting Entry. The instance of the Accounting Entry may not yet have been posted. The preconditions which can result from Status & Action Management can include the status variable Accounting Entry Posting Status which can have the value In Process. Other preconditions need not be considered as well as changes to the object, and parameters (the action is performed on one or multiple node instances. Should there be changes to the object, the object may no longer acquire the status Posted. Should there be changes to the status, the status variable Accounting Entry Posting Status can contain the value Deactivated. This action can be performed by all service consumers.

Referring to the SubmitForPosting, an instance of the business object Accounting Entry can be released for the posting processing in financial accounting (to create accounting documents) and the relevance for approval of the entered AccountingEntry can be checked in accordance with the dual control principle. The preconditions which may exist can include the instance of the Accounting Entry having undergone all checks and no errors being found. The preconditions which can result from Status & Action Management may include the status variable Accounting Entry Posting Status which can have the value In Process. Other preconditions need not be considered as well as changes to other objects, and parameters (the action can be performed on one or multiple node instances). Should changes to the object occur, the status variable Accounting Entry Posting Status may in some case not be changed before the status variable Accounting Entry Approval Status has been set by another user to the value Approved or Rejected. Should changes to the status occur, the status variable Approval Status may contain the value In Approval. This action can be performed by all service consumers.

Referring to the Approve action, an instance of the business object Accounting Entry can be authorized in accordance with the dual control principle and in this way released for posting. In this way, the corresponding instances of the business object Accounting Document can be generated in Financial Accounting. The preconditions of the instance of the Accounting Entry has undergone all checks and no errors were found may exist. The preconditions that result from Status & Action Management may include the status variable Approval Status which can have the value In Approval. Other preconditions need not be considered as well as changes to the object and parameters (the action can be performed on one or multiple node instances). Should changes to other objects occur, instances of the business object Accounting Document can be created. Should changes to the status occur, the status variable Accounting Entry Approval Status may contain the value Approved and the status variable Accounting Entry Posting Status may contain the value Posted. This action can be performed by all service consumers.

Referring to the Reject action, an instance of the business object Accounting Entry can be rejected as part of the dual control principle. Preconditions may exist such as the instance of the Accounting Entry has undergone all checks and no errors were found. Preconditions which can result from Status & Action Management may include the status variable Approval Status which can have the value In Approval. Other preconditions need not be considered as well as changes to the object, changes to other objects, and parameters (the can be performed on one or multiple node instances). Should changes to the status exist, the status variable Accounting Entry Approval Status can contain the value Rejected and the status variable Accounting Entry Posting Status can contain the value In Process. This action can be performed by all service consumers.

The query QueryByAccountingEntryKey can provide a list of all Accounting Entries that match the unique identifiers used as search criteria. The documents searched for can be defined by a table with selection options for the query element key. The query elements which can be defined by the data type AccountingEntryAccountingEntryKeyQueryElements can include ID which can be of type GDT: BusinessTransactionDocumentID and Company (Optional) which can be of type GDT: UUID. QueryByElements can be a query which may provide a list of all Accounting Entries on the basis of the transferred selection options. The query elements that can be defined by the data type AccountingEntryElementsQueryElements.

These elements can include, UUID which can be of type GDT: UUID, ID which can be of type GDT: BusinessTransactionDocumentID, CompanyUUID which can be of type GDT: UUID, CompanyID which can be of type GDT: OrganisationalCentreID, Note which can be of type GDT: Note, AccountingDocumentTypeCode which can be of type GDT: AccountingDocumentTypeCode, EntryDate which can be of type GDT: Date and which can be of type QUALIFIER: Entry, PostingDate which can be of type GDT: Date and which can be of type QUALIFIER: Posting, AccountingClosingStepCode which can be of type GDT: AccountingClosingStepCode, BusinessTransactionTypeCode which can be of type GDT: BusinessTransactionTypeCode, TransactionCurrencyCode which can be of type GDT CurrencyCode, CancellationAccountingEntryIndicator which can be of type GDT: Indicator and which can be of type QUALIFIER CancellationAccountingEntry, CancellationAccountingEntryUUID which can be of type GDT: UUID, Status, and Key. Furthermore, Status may contain LifeCycleStatusCode which can be of type GDT: LifeCycleStatusCode, ApprovalStatusCode which can be of typeGDT: ApprovalStatusCode, and PostingStatusCode which can be of type GDT PostingStatusCode. Furthermore, Key can be data type AccountingEntryKey which may contain the subordinate elements AccountingEntryID which can be of type GDT: BusinessTransactionDocumentID and Company which can be of type GDT: UUID.

A SetOfBooks can assign an AccountingEntry to one or more accounting principles. The elements can be directly located on the SetOfBooks node can be defined by the GDT AccountingEntrySetOfBooksElements. These elements can consist of SetOfBooksID which can be an unique identifier of the set of books and can be of type GDT: SetOfBooksID. There may be a number of inbound aggregation relationships including from the business object (or node) SetOfBooks and may be a cardinality of 1:cn and to which the representation of the business transaction relates.

CancelledAccountingEntry can be defined as an AccountingEntry which can be cancelled by this AccountingEntry. The elements can be located directly at the Cancellation node and can be defined by the type GDT: CancelledAccountingEntryElements These elements may include, UUID which can be an universally unique identifier of the AccountingEntry to be cancelled and can be of type GDT: UUID, ID which can be a manually interpretable identifier of the AccountingEntry to be cancelled and can be of type GDT: BusinessTransactionDocumentID, CompanyUUID which can be an universally unique identifier of the company of the AccountingEntry to be cancelled and can be of type GDT: UUID, and CompanyID which may be a manually interpretable identifier of the company of the AccountingEntry to be cancelled and can be of type GDT: OrganisationalCentreID. There may be a number of inbound aggregation relationships including from the business object (or node) AccountingEntry and may be a cardinality of 1:c. and the AccountEntry can also be canceled. There may be a number of inbound aggregation relationships including from the business object (or node) Company and may be a cardinality of 1:cn and the company to which the representation of the business transaction relates.

The DO: TextCollection can be defined as the collection of natural-language texts for an AccountingEntry. The TextCollection node can be defined by the dependent object TextCollection. The DO: AttachmentFolder can be defined as an attachment of other documents to an AccountingEntry object instance. The AttachmentFolder node can be defined by the dependent object Attachment. It can also be used to link an AccountingEntry to different types of documents, for example MS Excel spreadsheets or MS Word documents. The DO: AccessControlList can be defined as AccessControlList which can be a list of access groups that have access to an AccountingEntry.

The Item can be definated as the capture of a change in value regarding the combination of an account, a credit/debit indicator, and a transaction type as well as any other required coding terms in GeneralLedger Accounting. Item can occur in the following complete and disjoint specializations: Fixed Asset Item 58094, MaterialLedgerAccountItem 58096, ProductionLedgerAccountItem 58098, PurchaseLedgerAccountItem 58100, SalesLedgerAccountItem 58102, CashLedgerAccountItem, AccountsReceivablePayableLedgerAccountItem 58104, TaxLedgerAccountItem 58106, and OverheadCostsLedgerAccountItem 58110. The elements directly located on the Item node can be defined by the GDT AccountingEntryItemElements. These elements can include: ID which can be an unique identifier of a line item of an AccountingEntry and can be of type GDT: BusinessTransactionDocumentItemID, ItemGroupID (optional) which can enables AccountingEntry line items that belong together to be grouped together logically, such as for the purpose of highlighting sender/receiver relationships for transfer postings between account assignment objects (profit centers, segments, or resources) and can be of type GDT: BusinessTransactionDocumentItemGroupID, DebitCreditCode (optional) which can specifies whether the line item is assigned to the debit or credit side of the G/L account and can be of type GDT: DebitCreditCode, ChartOfAccountsCode which can be the Coded representation of the ChartOfAccounts containing the ChartOfAccountsItem that classifies—for general ledger accounting purposes—the value stated in the item and can be of type GDT: ChartOfAccountsCode, ChartOfAccountsItemCode which can be the coded representation of the ChartOfAccountsItem that classifies—for general ledger accounting purposes—the value stated in the item and can be of type GDT: ChartOfAccountsItemCode, Note (optional) which can contains a comment on the line item in clear text and can be of type GDT: ShortNote, SubledgerAccountLineItemTypeCode (optional) and ca be the coded representation for the item category of the subledgers that the line item relates to and can be of type GDT: SubledgerAccountLineItemTypeCode, SubledgerAccountTypeCode (optional) and can be the coded representation for the type of subledger that the line item relates to and can be of type GDT: SubledgerAccountTypeCode, GeneralLedgerMovementTypeCode (optional)

Specifies the type of movement on the G/L account within GeneralLedger Accounting and can be of type GDT: GeneralLedgerMovementTypeCode, SegmentUUID (optional) which can be an universally unique identifier of the segment that undergoes a change in assets or capital, or of the segment whose income statement is changed, as a result of the entered line item (a segment is an organizational unit of a company to which a separate section of the company balance sheet is assigned, with its own assets and capital as well as its own income statement) and can be of type GDT: UUID, SegmentID (optional) which can be a legible, unique identifier of the segment that undergoes a change in assets or capital, or of the segment whose income statement is changed, as a result of the entered line item and can be of type GDT: OrganisationalCentreID, ProfitCentreUUID (optional) and can be an universally unique identifier of the profit center that undergoes a change in assets or capital, or of the profit center whose income statement is changed, as a result of the entered line item and can be of type GDT: UUID, ProfitCentreID (optional) which can be a legible, unique identifier of the profit center that undergoes a change in assets or capital, or of the profit center whose income statement is changed, as a result of the entered line item and can be of type GDT: OrganisationalCentreID, FinancialAccountingViewOfProjectReference (optional)

which can be a reference to a project in role of a coding term to which the capture of a change in value that is stated in the AccountingEntryItem 58092 is assigned (the relevant elements and characteristics of the project are stored in FinancialAccountingViewOfProject) which can be of type GDT: ObjectNodeReference (for Object type code: the code value '231' (Project) may be used), FinancialAccountingViewOfProjectTaskReference (optional) which can be a reference to a task in role of a coding term to which the capture of a change in value that is staed in the AccountingEntryItem is assigned (the relevant elements and characteristics of the project task are stored in FinancialAccountingViewOfProject) which can be of type GDT: ObjectNodeReference (for Object type code: the code value '231' (Project) can be used), ExpenseClassificationFunctionalAreaCode (optional)

which can specify the functional area that the line item relates to and can be of type GDT: ExpenseClassificationFunctionalAreaCode, PartnerCompanyUUID (optional) which can be an universally unique identifier of an affiliated company (this information can be used in the elimination of IU sales performed between affiliated companies of a corporate group for consolidation purposes) and can be of type GDT: UUID, PartnerCompanyID (optional) which can be a legible, unique identifier of an affiliated company and can be of type GDT: OrganisationalCentreID, PartnerSegmentUUID (optional) which can be an universally unique identifier of a partner segment connected to the segment with regard to this line item (within a line item of an AccountingEntry, "partner segment" can designate the segment of another line item that represents the offsetting item for the entered line item) and can be of type GDT: UUID, PartnerSegmentID (optional) and can be a legible, unique identifier of a partner segment connected to the segment with regard to this line item and can be of type GDT: OrganisationalCentreID, PartnerProfitCentreUUID (optional) which can be a universally unique identifier of a partner profit center connected to the profit center with regard to this line item (within a line item of an AccountingEntry, “partner profit center” can designate the profit center of another line item that represents the offsetting item for the entered line item) and can be of type GDT: UUID, PartnerProfitCentreID (optional) which can be a legible, unique identifier of a partner profit center connected to the profit center with regard to this line item and can be of type GDT: OrganisationalCentreID, TransactionCurrencyAmount which can specify the value of the business transaction represented in the line item, in the transaction currency of the business transaction and can be of type GDT: Amount, LocalCurrencyAmount (optional) which can specify the value of the business transaction represented in the line item, in the local currency of the company. The local currency is the national currency in which the local books are kept and can be of type GDT: Amount, SetOfBooksCurrencyAmount (optional) which can specify the value of the business transaction represented in the line item, in the currency selected as the general currency in a set of books and can be of type GDT: Amount, HardCurrencyAmount (optional) which can specify the value of the business transaction represented in the line item, in the hard currency of the country of the company (the hard currency is a stable, country-specific currency that is used in high-inflation countries) and can be of type GDT: Amount, IndexBasedCurrencyAmount (optional) which can specify the value of the business transaction represented in the line item, in the index currency of the country of the company (the index-based currency is a fictitious, country-specific currency that is used in high-inflation countries as a comparison currency for reporting) and can be of type GDT: Amount, LineItemCurrencyAmount (optional) which can specify the value of the business transaction represented in the line item, in the line item currency which can be of type GDT: Amount, Quantity (optional) which can specify the quantity of the business transaction represented in the line item which can be of type GDT: Quantity, and QuantityTypeCode (optional) which can be the coded representation of the type of the Quantity and can be of type GDT: QuantityTypeCode. The element QuantityTypeCode can be filled if the element Quantity is filled. Furthermore, LineItemCurrencyAmount in most cases, the currency of the line item can be the same as the transaction currency of the business transaction. In some cases, however, the line item currency might not be derived from the current transaction and instead be determined externally. Example: When an invoice is paid in a currency different to the invoice currency, the line item currency of the payment line item corresponds to the line item currency of the invoice line item. There may be a number of inbound aggregation relationships including:

1) from the business object PartnerCompany/Root may be a cardinality of c:cn and the value-based change can be assigned to a partner company.

2) from business object Segment Root may be a cardinality of c:cn and the value-related change can be assigned to a segment. The PartnerSegment may be a cardinality of c:cn and the value-based change can be assigned to a partner segment.

3) from business object ProfitCentre Root may be a cardinality of c:cn and the value-related change can be assigned to a profit center. The PartnerProfitCentre may be a cardinality of c:cn and the value-based change can be assigned to a partner profit center.

4) from business object (node) FinancialAccountingViewOfProject/Root may be a cardinality of c:cn and reference to a project occurring in the role of a coding term to which the capture of a change in value that is stated in the AccountingEntryItem is assigned.

5) from business object (node) FinancialAccountingViewOfProject/Task may be a cardinality of c:cn and reference to a task occurring in the role of a coding term to which the capture of a change in value that is stated in the AccountingEntryItem is assigned.

A FixedAssetItem 58094 can be defined as an item that describes a value-related change to fixed assets. The elements directly located on the FixedAssetItem node can be defined by the GDT AccountingEntryFixedAssetItemElements. These elements can include: FixedAssetUUID which can be an universally unique identifier of the asset to which the posting is made and can be of type GDT: UUID, PartnerFixedAssetUUID (optional) which can be an universally unique identifier of a partner asset of the asset to which the posting is made within the business transaction at hand and can be of type GDT: UUID, IndividualMaterialUUID (optional) which can be an universally unique identifier of an individual material that is moved by a business transaction and that triggers a value change in fixed assets and can be of type GDT: UUID, IndividualMaterialID (optional) and can be an unique identification of the individual material that is moved by a business transaction and that triggers a value change in fixed assets and can be of type GDT: ProductID, PartnerIndividualMaterialUUID (optional) and can be an universally unique identifier of an individual material that is moved by a business transaction and that triggers a value change in fixed assets and can be of type GDT: UUID, PartnerIndividualMaterialID (optional) and can be an unique identification of the of the individual material that is moved by a business transaction and that triggers a value change in fixed assets and can be of type GDT: ProductID, HostIndividualMaterialUUID (optional) and can be an universally unique identifier of an individual material to which value changes from a business transaction are assigned as part of fixed assets and can be of type GDT: UUID, FixedAssetKey (optional) which can group the elements CompanyID, MasterFixedAssetID, and ID for an alternative key of an asset and can be of type Key Data type: FixedAssetKey, PartnerFixedAssetKey (optional) which can group the elements CompanyID, MasterFixedAssetID, and ID for an alternative key of an asset and can be of type Key Data type: FixedAssetKey, FixedAssetValuationViewUUID (optional) which can specify the fixed asset valuation view used to determine the asset value and can be of type GDT: UUID, FixedAssetValuationViewID (optional) which can specify the fixed asset valuation view used to determine the asset value and can be of type GDT: SetOfBooksAssetValuationViewID, OriginalValueCalculationReferenceDate (optional) which can specify the original asset value data in the case of a post-capitalization to fixed asset for the depreciation calculation and can be of type GDT: Date, ValueCalculationReferenceDate (optional) which can specify the value date for the depreciation calculation and can be of type GDT: Date, and FixedAssetMovementCategoryCode which can be a category of the movement on the fixed asset the line item represents and can be of type GDT: FixedAssetMovementCategoryCode. There may be a number of inbound aggregation relationships including:

1) from business object FixedAsset such as the FixedAsset Root which can have a cardinality of 1:cn. A FixedAssetItem (within an accounting entry) can be a value-related change concerning one exact FixedAssetSubledgerAccount. Furthermore, a PartnerFixedAsset can have a cadinality of c:cn.

A LineItem can relate to a partner FixedAsset to which the item can be assigned to.

2) from business object IndividualMaterial/Root such as IndividualMaterial which can have a cardinality of c:cn. A FixedAssetItem (within an accounting entry) is a value-based change concerning exactly one Individual Material. Furthermore, PartnerIndividualMaterial which can have a cardinality of c:cn and which can specify the individual material associated to the partner fixed asset. The business transaction can relate to this individual material. Furthermore, HostIndividualMaterial can have a cardinality of c:cn and Individual material to which value changes from a business transaction can be assigned as part of fixed assets.

A MaterialLedgerAccountItem can be defined as an item that describes a change to the valuated material stock. The elements directly located on the MaterialItem node can be defined by the GDT AccountingEntryMaterialLedgerAccountItemElements. These elements can include: MaterialLedgerAccountUUID which can be an universally unique identifier of the material ledger account to which the posting is made in the line item and can be of type GDT: UUID, MaterialUUID (optional) and can be universally unique identifier of the material to which the posting is made in the line item and can be of type GDT: UUID, MaterialID (optional) which can be a legible, unique identifier of the material to which the posting is made in the line item and can be of type GDT: ProductID, PermanentEstablishmentUUID (optional) which can specify the permanent establishment for which quantities, values, and prices are updated in the MaterialLedgerAccount and can be of type GDT: UUID, PermanentEstablishmentID (optional) which can be the natural-language identifier of the permanent establishment for which quantities, values, and prices are updated in the MaterialLedgerAccount. And can be of type GDT: OrganisationalCentreID, ValuationQuantity (optional) which can specify the change to the inventory quantity as a result of the business transaction represented in the line item, in the valuation unit of measure for the material and can be of type GDT: Quantity, ValuationQuantityTypeCode (optional)

which can be the coded representation of the type of the Quantity and can be of type GDT: QuantityTypeCode (the element QuantityTypeCode can be filled if the element ValuationQuantity is filled), ReferenceQuantity (optional) which can specify in the valuation unit of measure for the material a quantity to which the business transaction represented in the line item refers but which does not cause a change to the inventory quantity and can be of type GDT: Quantity, and ReferenceQuantityTypeCode (optional) coded representation of the type of the Quantity and can be of type GDT: QuantityTypeCode (the element QuantityTypeCode can be filled if the element ReferenceQuantity is filled). There may be a number of inbound aggregation relationships including from business object MaterialLedgerAccount such as MaterialLedgerAccount Root which can have a cardinality of 1:cn and an MaterialLedgerAccountItem can be a change in value relating to one MaterialLedgerAccount. There may be a number of inbound association relationships including from business object Material/Root. For example, Material may be a cardinality of c:cn and material to which the posting can be made in the line item. There may be a number of inbound associations relationships including PermanentEstablishment/Root which can be a cardinality of c:cn and permanent establishment for which quantities, values, and prices can be updated in the MaterialLedgerAccount.

A ProductionLedgerAccountItem can be an item that describes a valuated stock change to work in process. The elements directly located on the ProductionLedgerAccountItem node can be defined by the GDT AccountingEntryProductionLedgerAccountItemElements. These elements can include: ProductionLedgerAccountUUID which can be an universally unique identifier of the production ledger account to which the posting is made in the line item and can be of type GDT: UUID and OperationalDocumentReference which can be a reference to an operational document out of the area of Production in role of a coding term to which the capture of a change in value that is stated in the AccountingEntryItem is assigned (the relevant elements and characteristics of the ProductionDocument (currently only Production Lot) are stored in FinancialAccountingViewOfProductionDocument) and can be of type GDT: ObjectNodeReference (for Object type code: the code value 96 (Production Lot) can be used). There may be a number of inbound aggregation relationships including:

1) from business object ProductionLedgerAccount may be a cardinality of 1:cn and a ProductionLedgerAccountItem can be a change in value relating to a ProductionLedgerAccount.

2) from business object FinancialAccountingViewOfProductionDocument may be a cardinality of c:cn and reference to an Operational Document out of the area of production (currently Production Lot) which can occur in the AccountingEntryItem in the role of a coding term to which the capture of a change in value is assigned.

A PurchaseLedgerAccountItem can be defined as an item that describes a change relating to a valuated GR/IR stock. The elements located at the PurchaseLedgerAccountItem node can be defined by the type GDT AccountingEntryPurchaseLedgerAccountItemElements. These elements can include: PurchaseLedgerAccountUUID which can be an universally unique identifier of the GR/IR account to which the posting is made in the line item and can be of type GDT: UUID, OperationalDocumentReference which can reference to an Operational Document out of the area of Purchasing in role of a coding term to which the capture of a change in value that is stated in the AccountingEntryItem is assigned (the relevant elements and characteristics of the PurchasingDocument (currently only Purchase Order) are stored in the FinancialAccountingViewOfPurchasingDocument) and can be of type GDT: ObjectNodeReference (for Object type code: the code value 001 (Purchase Order) can be used), PurchasingSegmentProductUUID (optional) which can specify the product for which quantities and values are updated in PurchaseLedgerAccount and can be of type GDT: UUID PurchasingSegmentProductCategoryUUID (optional) which can specify the product category for which quantities and values are updated in PurchaseLedgerAccount and can be of type GDT: UUID, PurchasingSegmentSellerPartyUUID (optional) which can specify the supplier for which quantities and values are updated in PurchaseLedgerAccount and can be of type GDT: UUID, ValuationQuantity (optional) which can specify the quantity on which the line item values are based, in the valuation unit of measure for the material and can be of type GDT: Quantity, ValuationQuantityTypeCode (optional)

which can be a coded representation of the type of the Quantity and can be of type GDT: QuantityTypeCode (the element QuantityTypeCode can be filled if the element ValuationQuantity is filled), ReferenceValuationQuantity (optional) which can specify the base quantity on which the line item values are based, in the valuation unit of measure for the material which can be of type GDT: Quantity, ReferenceValuationQuantityTypeCode (optional) which can be a coded representation of the type of the Quantity and can be of type GDT: QuantityTypeCode (the element QuantityTypeCode can be filled if the element ReferenceValuationQuantity is filled), ClearingQuantity (optional) which can specify the quantity of the business transaction represented in the line item that is used in goods receipt/invoice receipt clearing to distribute the variances or for which the price variances were calculated and cleared in goods receipt/invoice receipt clearing which can be of type GDT: Quantity and of type Qualifier: Clearing, and ClearingQuantityTypeCode (optional) which can be the coded representation of the type of the Quantity, and can be of type GDT: QuantityTypeCode (the element QuantityTypeCode can be filled if the element ClearingQuantity is filled). There may be a number of inbound aggregation relationships including:

1) from business object PurchaseLedgerAccount may be a cardinality of 1:cn and a PurchaseLedgerAccountItem can be a change in value relating to a PurchaseLedgerAccount.

2) from business object (node) FinancialAccountingViewOfPurchasingDocument may be a cardinality of c:cn and reference to an Operational Document out of the area of Purchasing (currently Purchase Order) which can occur in the AccountingEntryItem in role of a coding term to which the capture of a change in value is assigned.

A SalesLedgerAccountItem can be defined as an item that describes a change to the valuated GR/IR stock. The elements directly located on the SalesLedgerAccountItem node can be defined by the GDT AccountingEntrySalesLedgerAccountItemElements. These elements can include: SalesLedgerAccountUUID which can be an universally unique identifier of the sales ledger account to which the posting is made in the line item and can be of type GDT: UUID, OperationalDocumentReference which can be a reference to an Operational Document out of the area of Sales and Service in role of a coding term to which the capture of a change in value that is stated in the AccountingEntryItem is assigned (the relevant elements and characteristics of the SalesAndServiceDocument (e.g. SalesOrder) are stored in FinancialAccountingViewOfSalesAndServiceDocument) and can be of type GDT: ObjectNodeReference (referring to the Object Type Code: the code values 114 (Sales Order), 117 (Service Order), 116 (Service Contract), 118 (Service Request), 115 (Service Confirmation) and 032 (Customer Return) can be used), PriceSpecificationElementPurposeGroupCode (optional) can be the coded representation of a group of PriceSpecificationElements based on its purpose and can be of type GDT: PriceSpecificationElementPurposeGroupCode, ValuationQuantity (optional) which can specify the quantity on which the line item values are based, in the valuation unit of measure for the material and can be of type GDT: Quantity, ValuationQuantityTypeCode (Optional) which can be a coded representation of the type of the Quantity and can be of type GDT: QuantityTypeCode (the element QuantityTypeCode can be filled if the element ValuationQuantity is filled), OrderQuantity (optional) which can specify the quantity assigned to the line item in the order unit (this can differ from the valuation unit under certain conditions) and can be of type GDT: Quantity, and OrderQuantityTypeCode (optional) which can be a coded representation of the type of the Quantity and can be of type GDT: QuantityTypeCode (the element QuantityTypeCode can be filled if the element OrderQuantity is filled). There may be a number of inbound aggregation relationships including:

1) from business object SalesLedgerAccount may be a cardinality relationship of 1:cn and the SalesLedgerAccountItem can be a change in value relating to a SalesLedgerAccount.

2) from business object FinancialAccountingViewOfSalesAndServiceDocument may be a cardinality relationship of c:cn and reference to an Operational Document out of the area of Sales and Service (e.g. Sales Order) can occur in the AccountingEntryItem in the role of a coding term to which the capture of a change in value is assigned.

An AccountsReceivablePayableLedgerAccountItem can be defined as an item that describes a change in the valuated stock to payables and receivables from deliveries and services. The elements located on the AccountsReceivablePayableLedgerAccountItem node can be defined by the GDT AccountingEntryAccountsReceivablePayableLedgerAccountItemElements. These elements can include: AccountsReceivablePayableLedgerAccountUUID which can be a universally unique identifier of the AccountsReceivablePayableLedgerAccount to which the posting is made in the line item and can be of type GDT: UUID, BusinessPartnerUUID (optional) which can globally and uniquely identify the business partner that the entered business transaction relates to and can be of type GDT: UUID, BusinessPartnerID (optional) which can be a legible identifier of the business partner that the entered business transaction relates to and can be of type GDT: BusinessPartnerID, BusinessTransactionDocumentReference (optional) which can be a reference to a business transaction for which a valuation is entered in a AccountsPayableReceivableLedgerAccount and can be of type GDT: BusinessTransactionDocumentReference, PartyRoleCategoryCode (optional) which can specify the role of the business partner (the values “3 Creditor Party” and “4 Debtor Party” can be possible and can be type GDT: PartyRoleCategoryCode, AccountsReceivablePayableLedgerAccountDueUUID (optional) which can be the universally unique identifier of the due item, that is to say, of the payables/receivables for which a valuation needs to be entered and can be of type GDT: UUID), and DueTypeCode (optional) which can specify the type of due item that the line item relates to and can be of type GDT: DueTypeCode. There may be a number of inbound aggregation relationships including from a business object AccountsReceivablePayableLedgerAccount which may be a cardinality relationship1:cn and an AccountsReceivablePayableLedgerAccountItem can be a change in value relating to an AccountsPayablesReceivablesLedgerAccount. There may be a number of Inbound Association Relationships including from business object BusinessPartner/Root which may be a cardinality relationship c:cn and business partner that the entered business transaction can relate to.

The TaxLedgerAccountItem can be defined as an item that describes a valuated stock change to payables or receivables relating to a tax authority (tax owing or tax rebate). The elements directly located on the TaxLedgerAccountItem node can be defined by the GDT AccountingEntryTaxLedgerAccountItemElements. These elements can include: TaxLedgerAccountUUID which can be a universally unique identifier of the TaxLedgerAccount to which the posting can be made in the line item and can be of type GDT: UUID, TaxCountryCode (optional) which can specify the country in which the tax can be charged and can be of type GDT: CountryCode, TaxRegionCode (optional) which can specify the region in which the tax can be charged and can be of type GDT: RegionCode, ProductTaxEventTypeCode (optional) which can specify the type of tax event and can be of type GDT: ProductTaxEventTypeCode, WithholdingTaxEventTypeCode (optional) which can specify the withholding tax event to which the AccountingEntry can relate and can be of type GDT: WithholdingTaxEventTypeCode, TaxDueCategoryCode (optional) which can specify the type of due item and can be of type GDT: DueCategoryCode, TaxDeferredIndicator (optional) which can indicate whether deferred taxes are involved and can be of type GDT: TaxDeferredIndicator, ProductTaxationCharacteristicsCode (optional) which can be a coded representation of basic characteristics upon which the taxation of products can be based and can be of type GDT: ProductTaxationCharacteristicsCode, WithholdingTaxationCharacteristicsCode (optional) which can be a coded representation of basic characteristics upon which the determination of withholding taxation is based and can be of type GDT: WithholdingTaxationCharacteristicsCode, and TaxRateTypeCode (optional) which can specify the type of tax rate to which the entered business transaction can relate and can be of type GDT: TaxRateTypeCode. There may be a number of inbound aggregation relationships which can include from business object TaxLedgerAccount which may be a cardinality relationship of 1:cn and a TaxLedgerAccountItem can be a change in value relating to a TaxLedgerAccount.

A CashLedgerAccountItem can be defined as an item that describes a change to liquid funds. The elements that can be located at the node CashLedgerAccountItem can be defined by the type GDT AccountingEntryCashLedgerAccountItemElements. These elements can include: CashLedgerAccountUUID which can be a universally unique identifier of the CashLedgerAccount to which the posting can be made in the line item and can be of type GDT: UUID, HouseBankUUID (optional) which can globally and uniquely identify the house bank that the entry of the business transaction can relates to and can be of type GDT: UUID, and HouseBankID (optional) which can uniquely identify the house bank that the entry of the business transaction can relate to and can be of type GDT: BusinessPartnerID. There may be a number of inbound aggregation relationships for example from business object CashLedgerAccount which may be a cardinality relationship of 1:cn and a CashLedgerAccountItem can be a change in value relating to a CashLedgerAccount. There may be a number of inbound association relationships which may include from business object HouseBank which may be a cardinality of c:cn and the house bank entry to which the record relates to.

An OverheadCostsLedgerAccount Item can be defined as an item that describes a change to overhead. Overhead costs can be periodic costs for the provision of resources deployed in the value added process that cannot be assigned directly to market segments or balance sheet accounts and that are combined as overhead in the profit and loss statement. The elements located directly at the OverheadCostsLedgerAccountItem node can be defined by the type GDT AccountingEntryOverheadCostsLedgerAccountItemElements. These elements may consist of: OverheadCostsLedgerAccountUUID which can be the universally unique identifier of the OverheadCostsLedgerAccount to which the posting can be made in the line item and can be of type GDT: UUID, OverheadCostLedgerAccountTypeCode which can specify the subtype of the OverheadCostLedgerAccount: CostCentre, Resource, or Project and can be of type GDT: OverheadCostLedgerAccountTypeCode, CostCentreUUID (optional) which can uniquely identify the cost center to which the entered business transaction can relate (the element CostCentreUUID can be filled if the element OverheadCostLedgerAccountTypeCode has the value CostCentreOverheadCostLedgerAccount) and can be of type GDT: UUID, CostCentreID (optional) which can uniquely and legibly identify the cost center to which the entered business transaction can relate and can be of type GDT: OrganisationalCentreID, TransactionQuantity (optional) which can specify the quantity in the unit of measure in which the data can be entered and can be of type GDT: Quantity, and TransactionQuantityTypeCode (optional) which can be a coded representation of the type of the Quantity and can be of type GDT: QuantityTypeCode (the element QuantityTypeCode can be filled if the element TransactionQuantity is filled). There may be a number of inbound Aggregation Relationships including from business object OverheadCostsLedgerAccount in which OverheadCosts Root may be a cardinality relationship of 1:cn and an OverheadCostsLedgerAccountItem can be a change in value relating to an OverheadCostsLedgerAccount. There may be a number of Inbound Association Relationships including from business object CostCentre/Root in which CostCentre may be a cardinality of c:cn and cost centre that the entry of the business transaction can relate to.

FIG. 59-1 through 59-7 illustrates one example logical configuration of AccountingAccountBalanceMi-grateRequestMessage message 59000. Specifically, this figure depicts the arrangement and hierarchy of vari-ous components such as one or more levels of packages, entities, and datatypes, shown here as 59000 through 59184. As described above, packages may be used to represent hierarchy levels. Entities are discrete business elements that are used during a business transaction. Data types are used to type object entities and interfaces with a structure. For example AccountingAccountBalanceMigrateRequestMessage message 59000 includes, among other things AccountingAccountBalanceMigrateRequest 59014. Accordingly, heterogeneous applications may communicate using this consistent message configured as such.

Message Types and their Signatures

This section describes the message types and their signatures that can be derived from the operations of the business object AccountingEntry. In a signature, the business object can be contained as a "leading" business object. The message data type may determine the structure of the following message types. Bal-ances of a GeneralLedger of a company can be migrated from a legacy system to a new ERP system. The elements located at the node AccountingAccountBalanceMigrateRequest are defined by the request to migrate the balances of a GeneralLedger of a company. The structure of this message type can be determined by the message data type AccountingAccountBalanceMigrateRequestMessage. This message type can be used in the following operations of business objects, AccountingEntry, Migrate Account Balance, to name two exam-ples.

AccountingAccountBalanceMigrateRequestMessage

The message data type, AccountingAccountBalanceMigrateRequestMessage, may contain the object AccountingAccountBalanceMigrateRequest which is contained in the business document and the business information that is relevant for sending a business document in a message It can contain the packages, Mes-sageHeader and AccountingAccountBalanceMigrateRequest package. This message data type, therefore, can provide the structure for the message type and the operations that are based on it for AccountingAccountBal-anceMigrateRequest. The MessageHeader Package can be a grouping of business information that is relevant for sending a business document in a message. It can contain the node MessageHeader. The MessageHeader can be defined as a grouping of business information from the perspective of the sending application. Which can include information to identify the business document in a message, the information about the sender, and the information about the recipient, to name a few examples. The MessageHeader can contain SenderParty and RecipientParty. It can be of the type GDT: BusinessDocumentMessageHeader, and the following elements of the GDT can be used: ID and ReferenceID. The SenderParty can be defined as the partner responsible for sending a business document at business application level.

The SenderParty can be of type GDT: BusinessDocumentMessageHeaderParty. The RecipientParty can be defined as the partner responsible for receiving a business document at business application level. The RecipientParty can be of the type GDT: BusinessDocumentMessageHeaderParty.

AccountingAccountBalanceMigrateRequest Package

The AccountingAccountBalanceMigrateRequest Package can be defined as the grouping of AccountingAccountBalanceMigrateRequest with its package of Item. Furthermore, a list of balances of a GeneralLedger of a company which are to be migrated from a legacy system to a new ERP system. AccountingAc-countBalanceMigrateRequest can be of type IDT: AccountingAccountBalanceMigrateRequest, and can contain the elements: CompanyID, AccountingDocumentTypeCode, SetOfBooksID, EntryDate, PostingDate, AccountingClosingStepCode, and Note. CompanyID can be of GDT OrganisationalCentreID and can have a cardinality of 1. AccountingDocumentTypeCode can be of GDT AccountingDocumentTypeCode and can have a cardinal-ity of 0..1. SetOfBooksID can be of GDT SetOfBooksID and can have a cardinality of 0..1. EntryDate can be of GDT Date and Qualifier Entry and can have a cardinality of 0..1. PostingDate can be of GDT Date and Qualifier Posting and can have a cardinality of 1. AccountingClosingStepCode can be of GDT AccountingClosingStep-Code and can have a cardinality of 0..1. Note can be of GDT SHORT_Note and can have a cardinality of 0..1. If no Set Of Books is provided, the migrate request is done for all to the company assigned set of books with precondition that the used chart of accounts is the same in all set of books for the SetOfBooksID. If SetOf-BooksID is provided, it can be assigned to the Company. Code Value “OpeningBalance” can be used for the first period of an fiscal year in AccountingClosingStepCode. Code Value “ClosingBalance” can be used for the last period of an fiscal year in AccountingClosingStepCode.

AccountingAccountBalanceMigrateRequestItem Package can contain the entity of Item. The Item can refer to a balance of a GeneralLedger of a company which is to be migrated from a legacy system to a new ERP system. AccountingAccountBalanceMigrateRequestItem is of IDT AccountingAccountBalanceMigrateRe-questItem, it contains the elements: ChartOfAccountsItemCode with a cardinality of 1 of type GDT: ChartO-fAccountsItemCode, GeneralLedgerMovementTypeCode with a cardinality of 0..1 of type GDT: GeneralLedgerMovementTypeCode, SegmentID with a cardinality of 0..1 of type GDT: OrganisationalCentreID, ProfitCentreID with a cardinality of 0..1 of type GDT: OrganisationalCentreID, ProjectReference with a cardinality of 0..1 of typeGDT: ObjectNodeReference, ProjectTaskReference with a cardinality of 0..1 of typeGDT: ObjectNodeReference, CostCentreID with a cardinality of 0..1 of type GDT: OrganisationalCentreID, Expense-ClassificationFunctionalAreaCode with a cardinality of 0..1 of type GDT: ExpenseClassificationFunc-tionalAreaCode, PartnerCompanyID with a cardinality of 0..1 of type GDT: OrganisationalCentreID, Part-nerSegmentID with a cardinality of 0..1 of type GDT: OrganisationalCentreID, PartnerProfitCentreID with a cardinality of 0..1 of type GDT: OrganisationalCentreID, Note with a cardinality of 0..1 of type GDT: SHORT_Note, LocalCurrencyAmount with a cardinality of 1 of type GDT: Amount, Qualifier and LocalCurrency, SetOfBooksCurrencyAmount with a cardinality of 0..1 of type GDT: Amount, Qualifier and SetOfBooksCur-rency, HardCurrencyAmount with a cardinality of 0..1 of type GDT: Amount, Qualifier and HardCurrency, LineItemCurrencyAmount with a cardinality of 0..1 of type GDT: Amount, Qualifier and LineItemCurrency, In-dexBasedCurrencyAmount with a cardinality of 0..1 of type GDT: Amount, Qualifier and IndexBasedCurrency, Quantity with a cardinality of 0..1 of type GDT: Quantity, and QuantityTypeCode with a cardinality of 0..1 of typeGDT: QuantityTypeCode.

If provided, SegmentID, ProfitCentreID, and CostCentreID can be assigned to the CompanyID. Bal-ances that should be migrated can be provided to LocalCurrencyAmount. For the replication or migration of Material Ledger Account, Production Ledger Account or Fixed Assets Balances the line item currency amount should not be filled. Quantity/QuantityTypeCode can be used for a balance migration of accounts that do not have a quantity (e.g. in tax ledger account, cash ledger account, accounts payable and accounts receivable, fixed asset), these fields should not be filled. The items within an AccountingAccountBalanceMigrateRequest can have a zero balance. The following GDTs can be used: BusinessDocumentMessageHeader, Organisa-tionalCentreID, AccountingDocumentTypeCode, SetOfBooksID, Date, AccountingClosingStepCode, SHORT_Note, ChartOfAccountsItemCode, GeneralLedgerMovementTypeCode, ObjectNodeReference, ExpenseClassificationFunctionalAreaCode, Amount, Quantity, and QuantityTypeCode.

Business Object: AccountingNotification

Figures 1, 60:
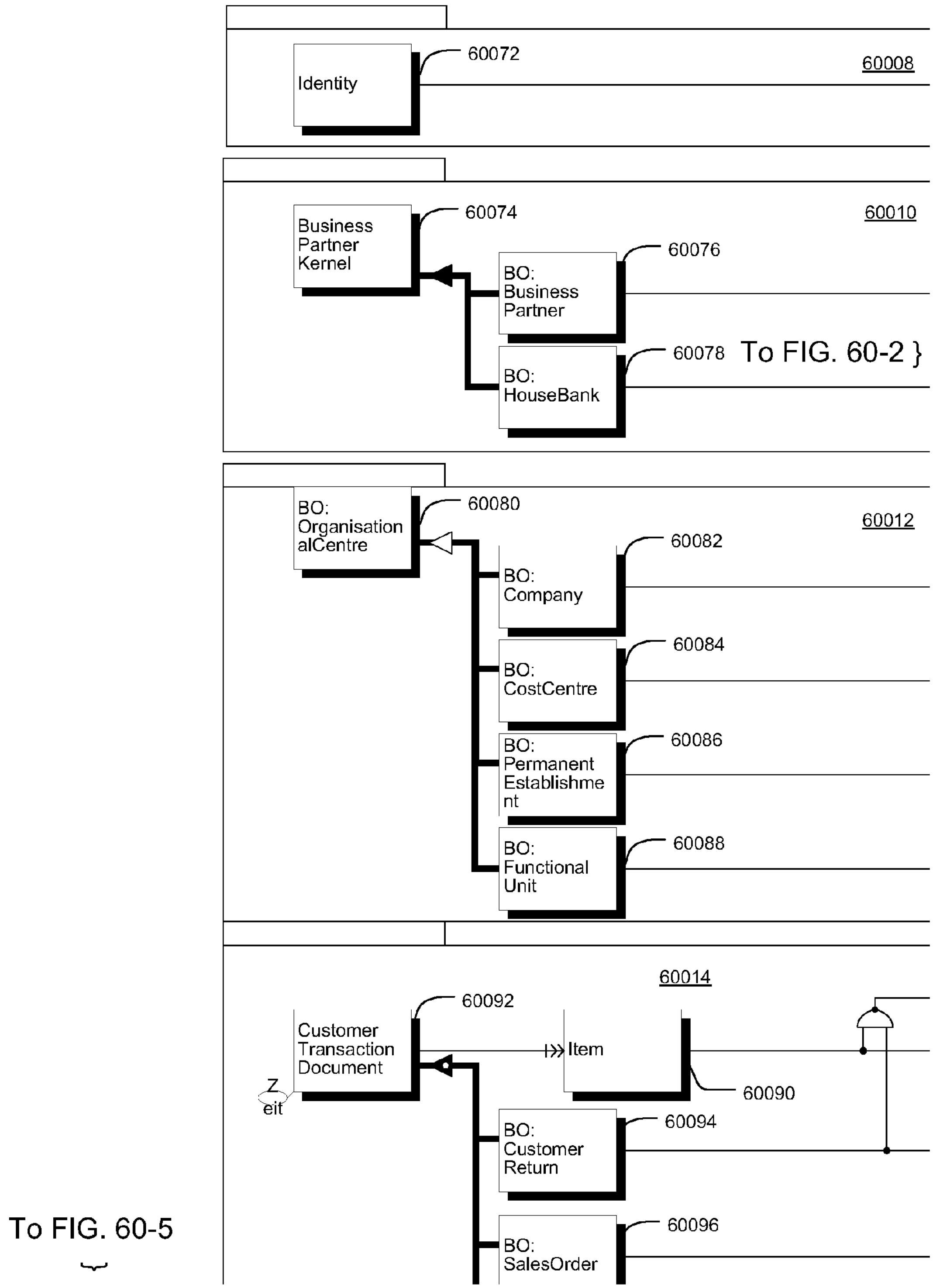
Figures 2, 60:
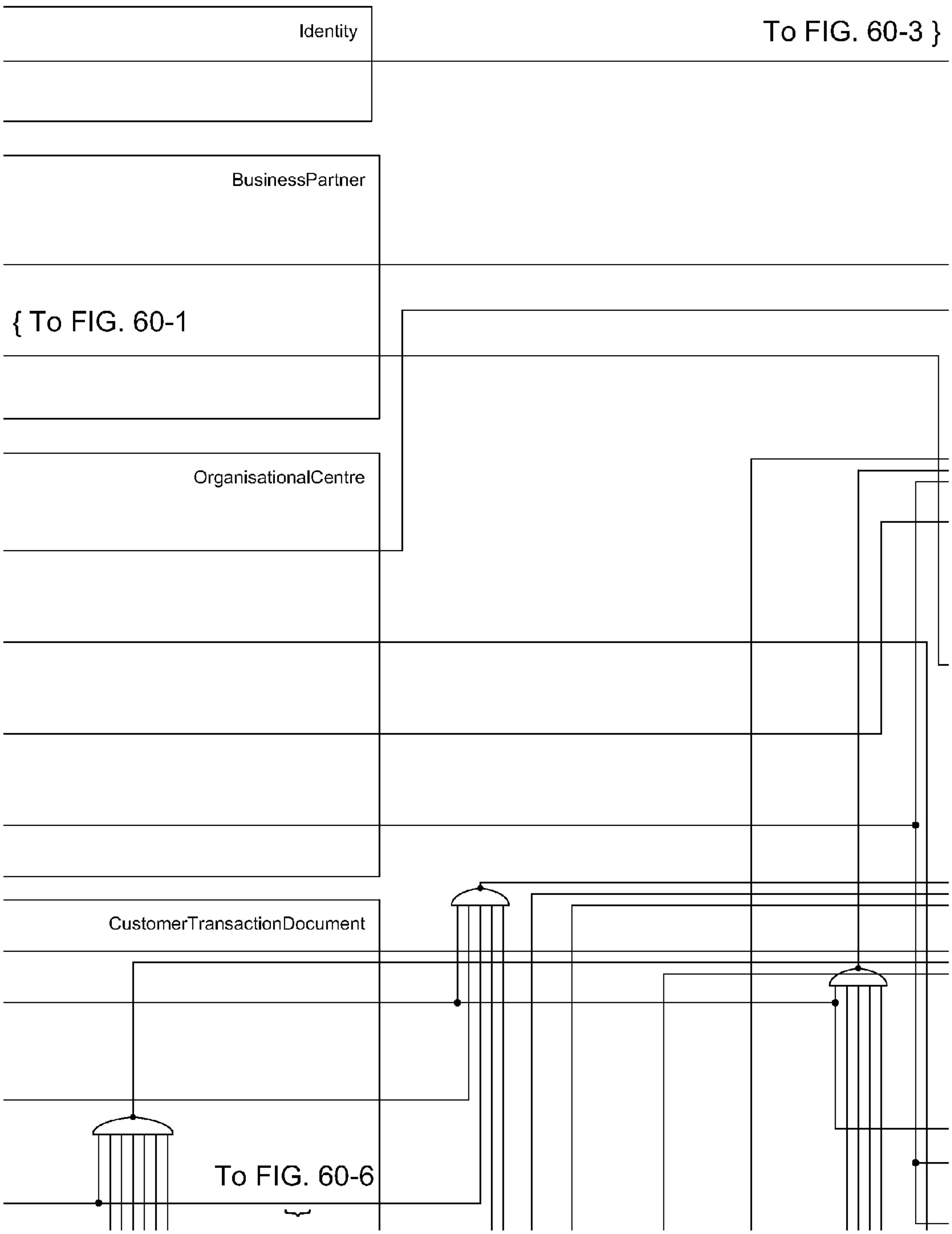
Figures 3, 60:
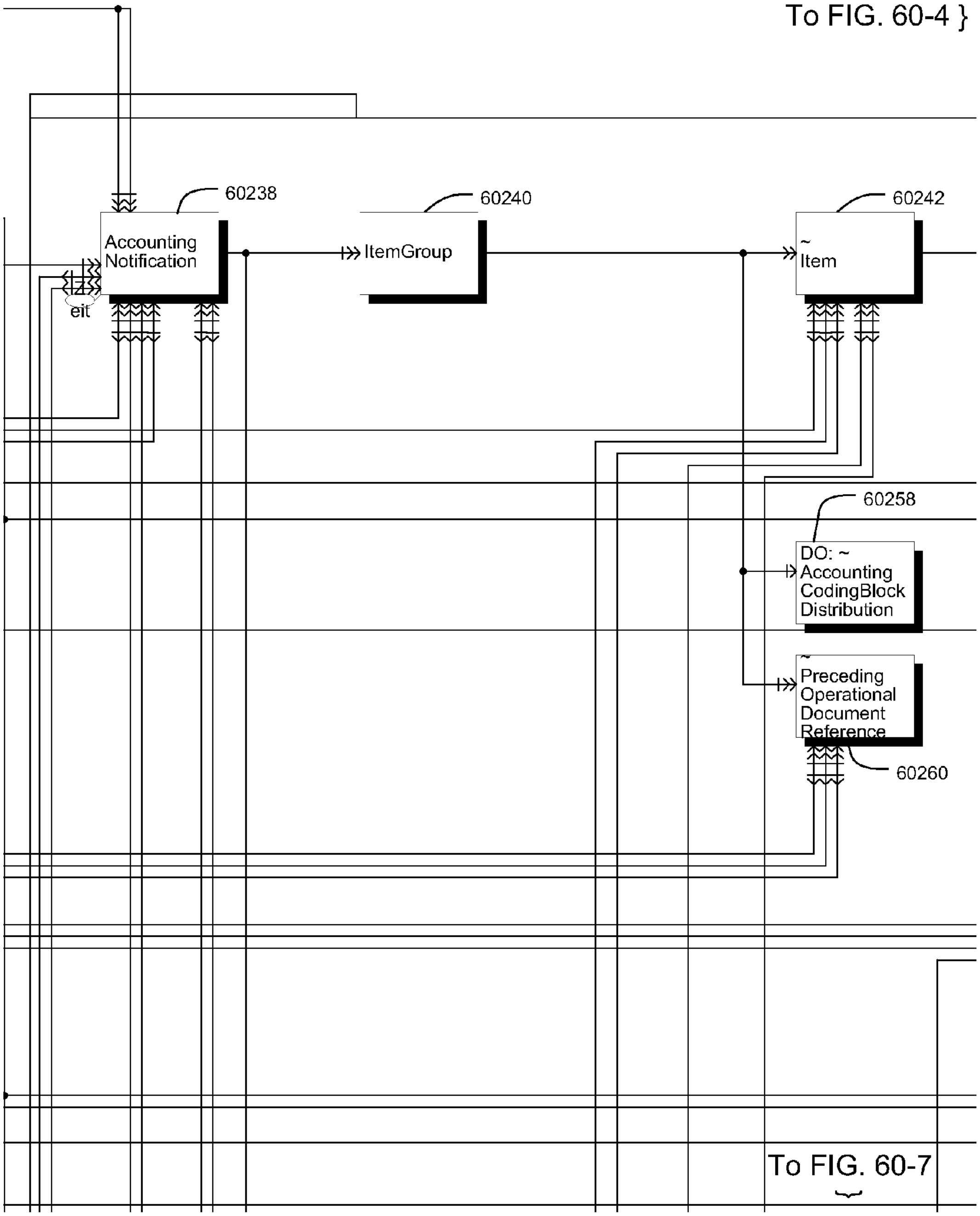
Figures 4, 60:
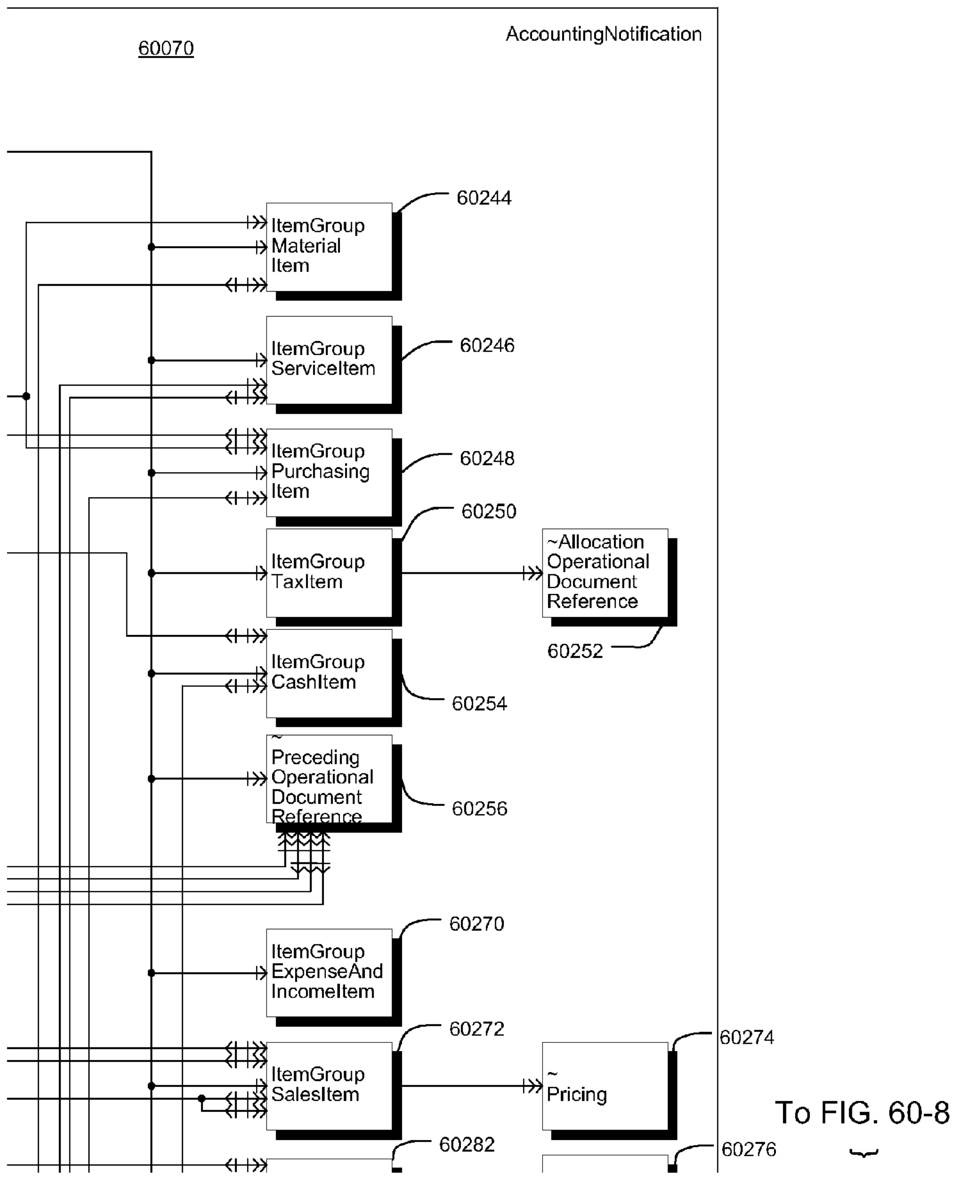
Figures 5, 60:
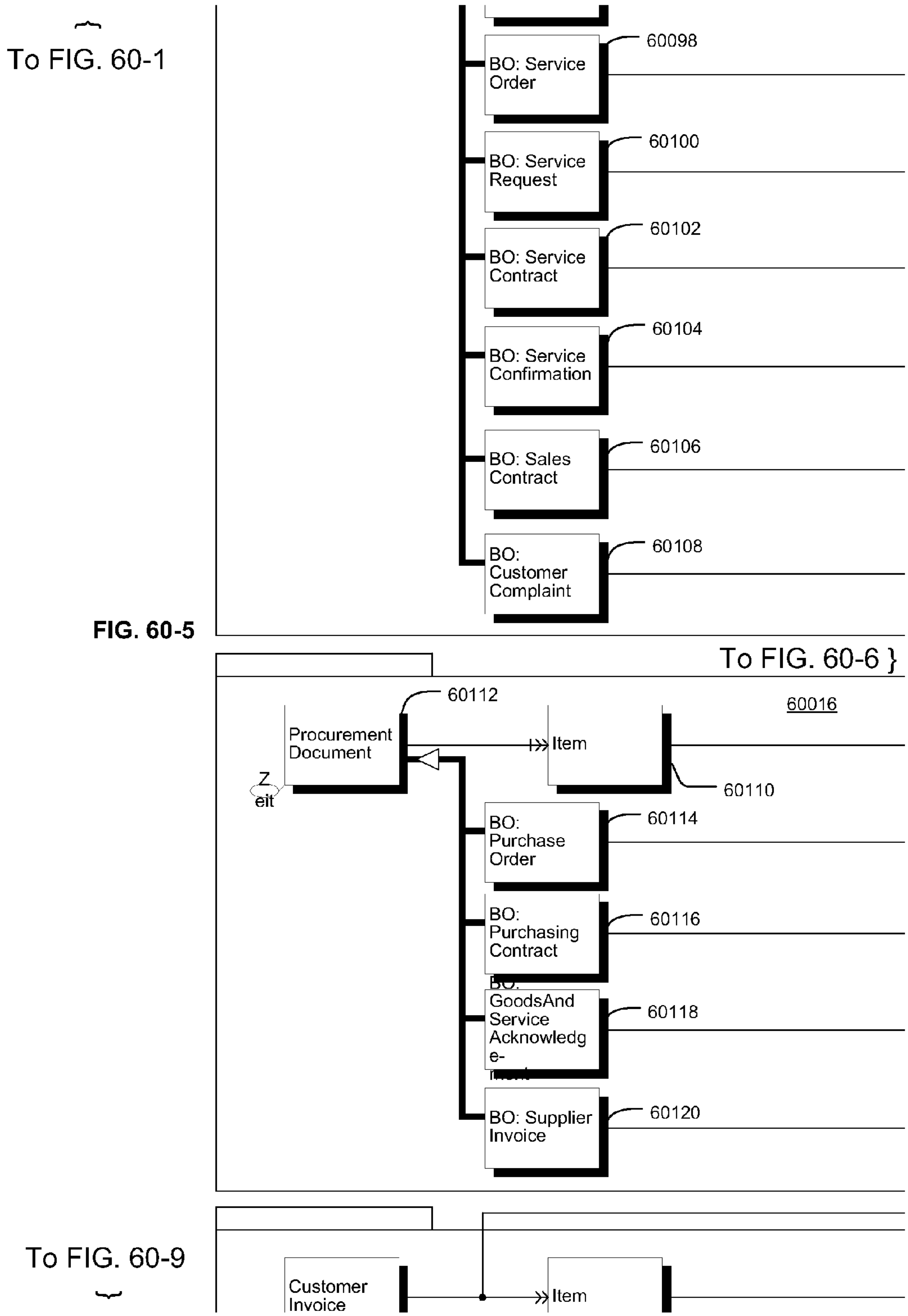
Figures 6, 60:
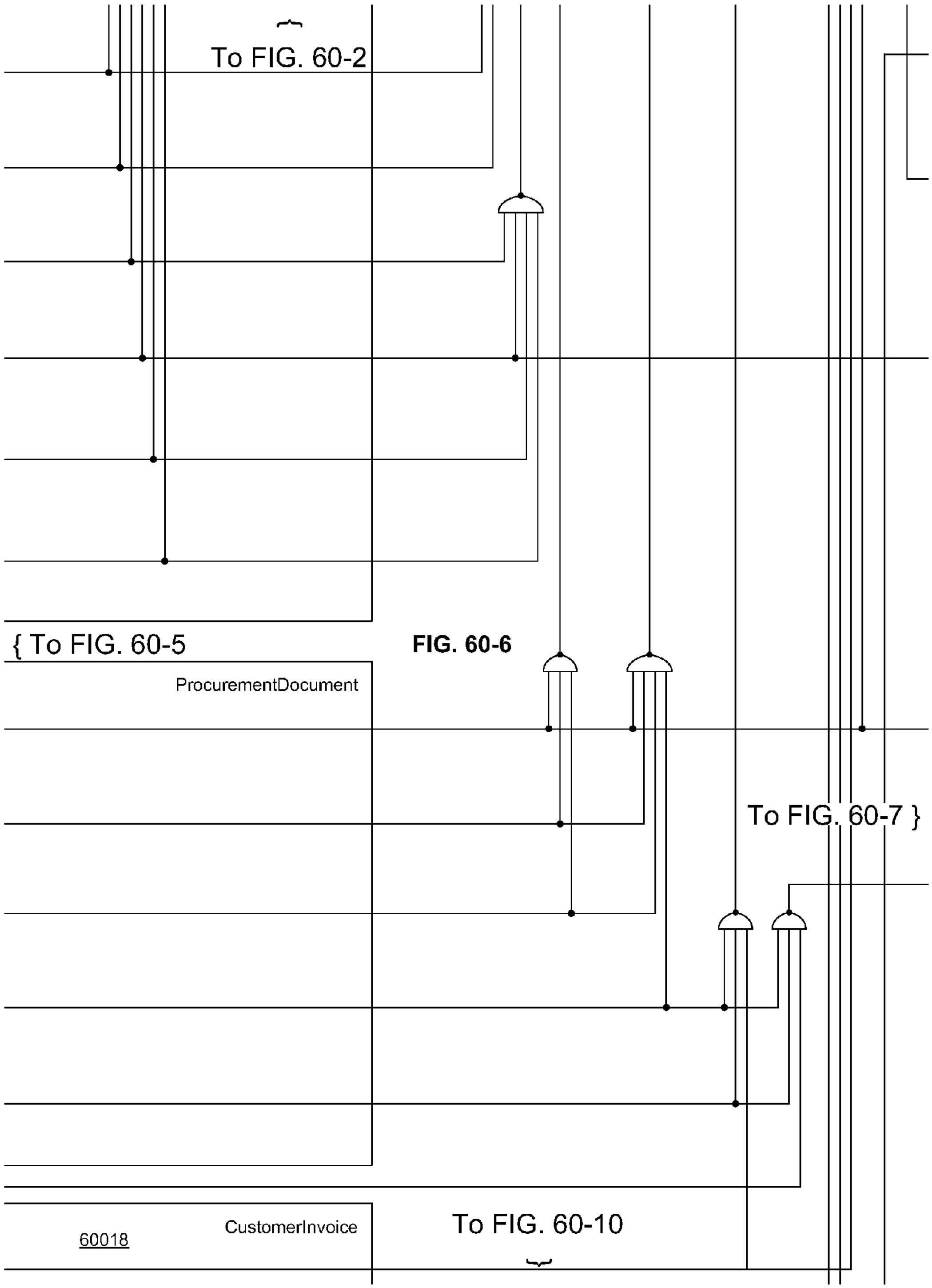
Figures 7, 60:
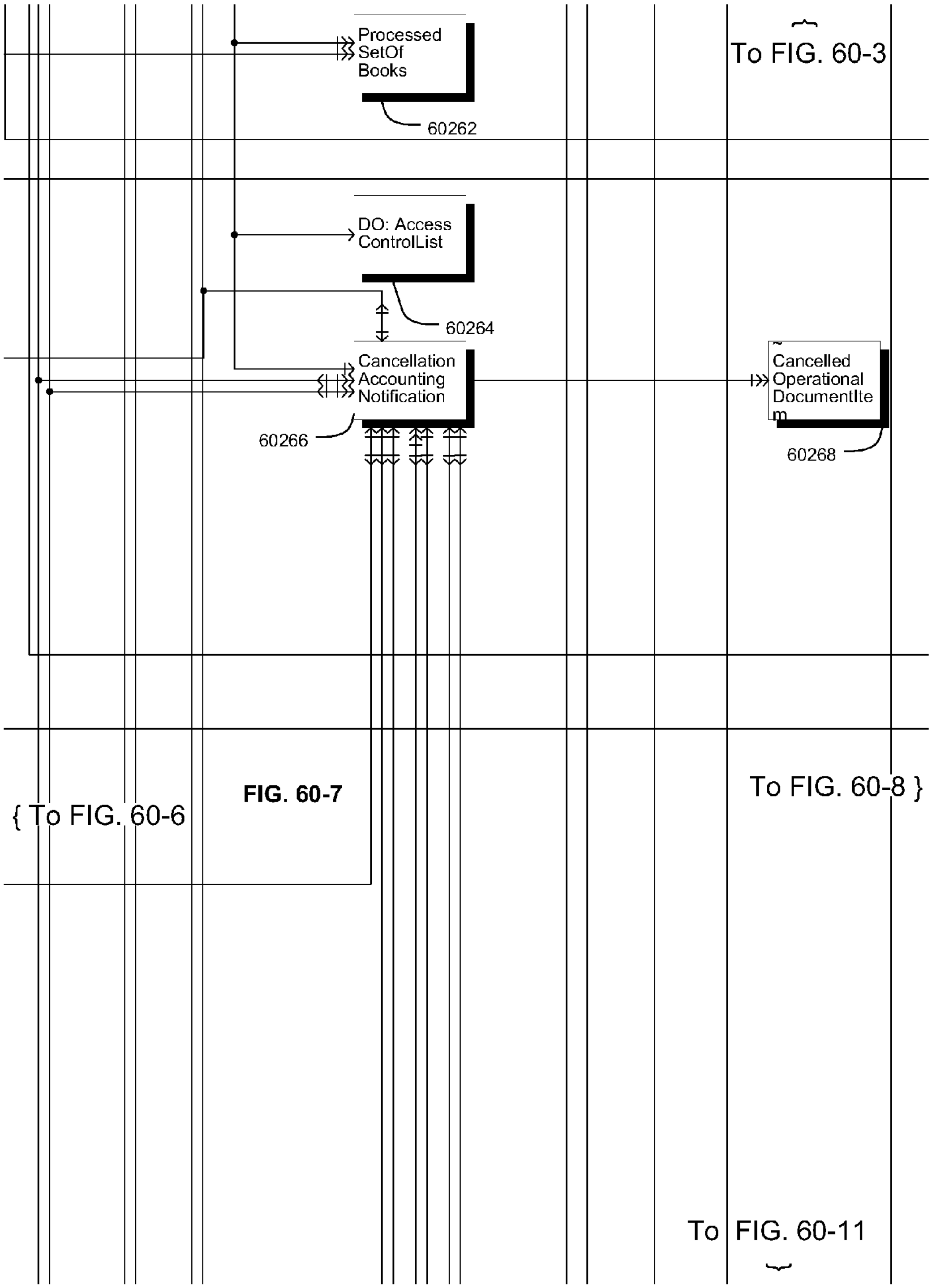
Figures 8, 60:
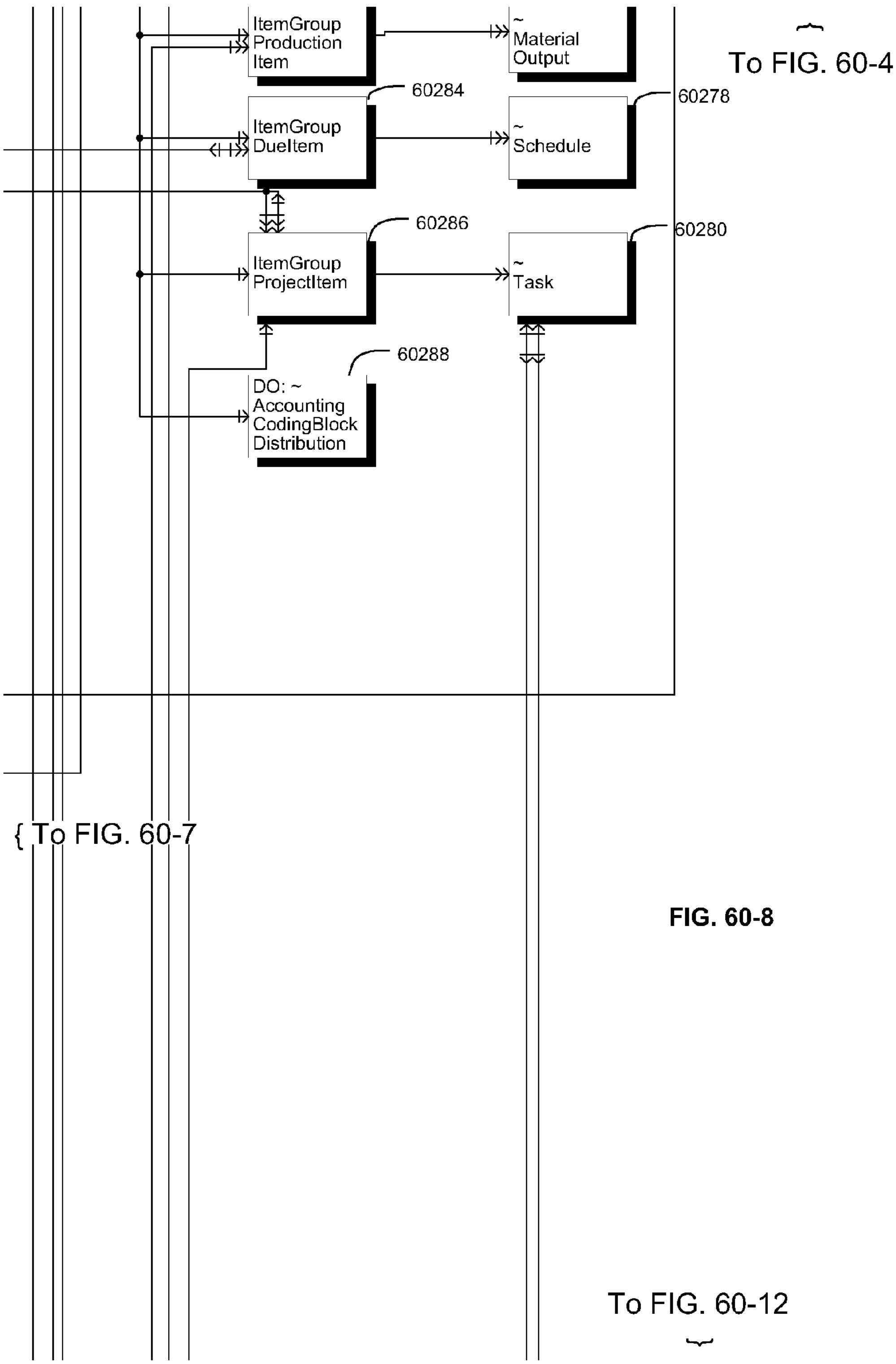
Figures 9, 60:
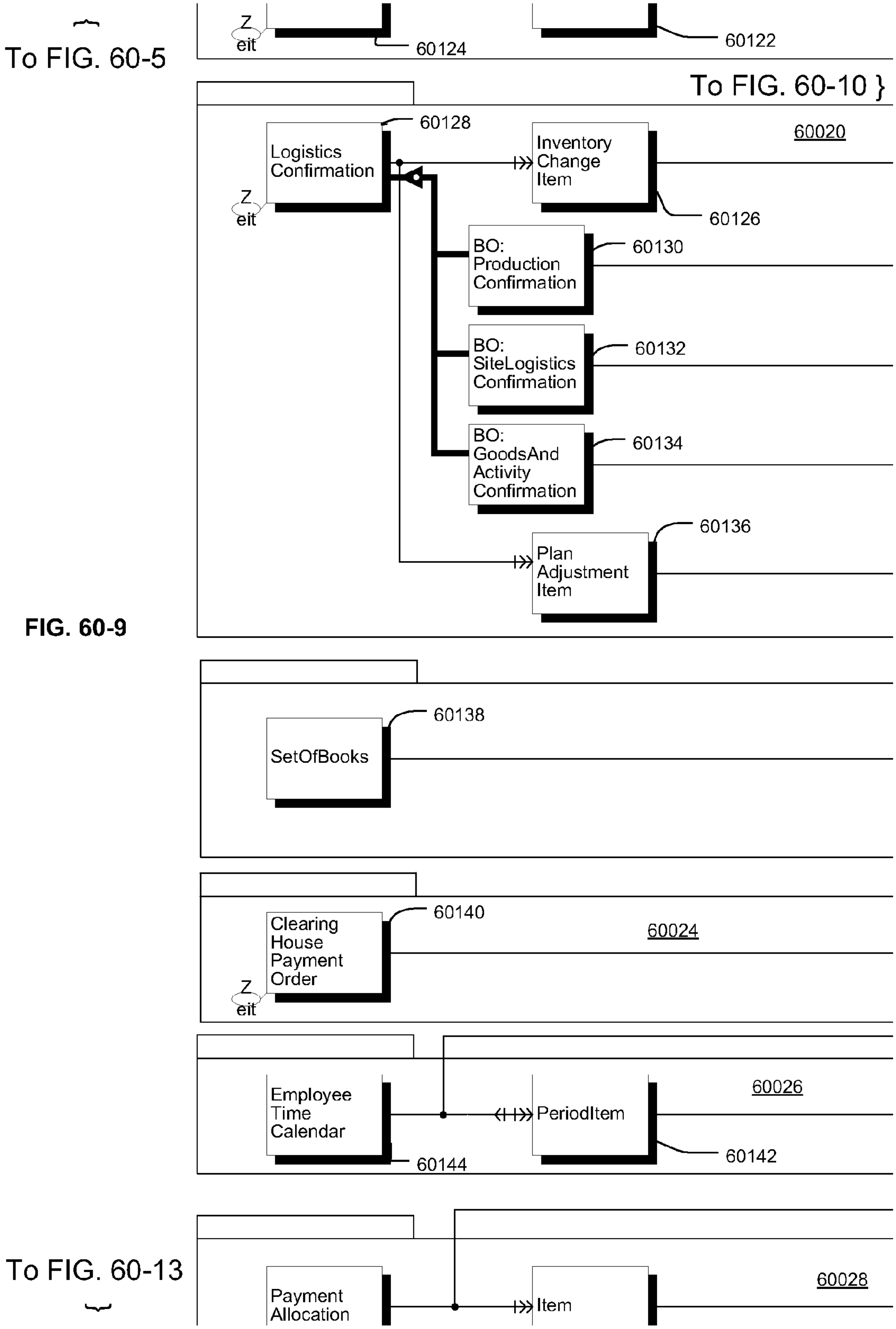
Figures 10, 60:
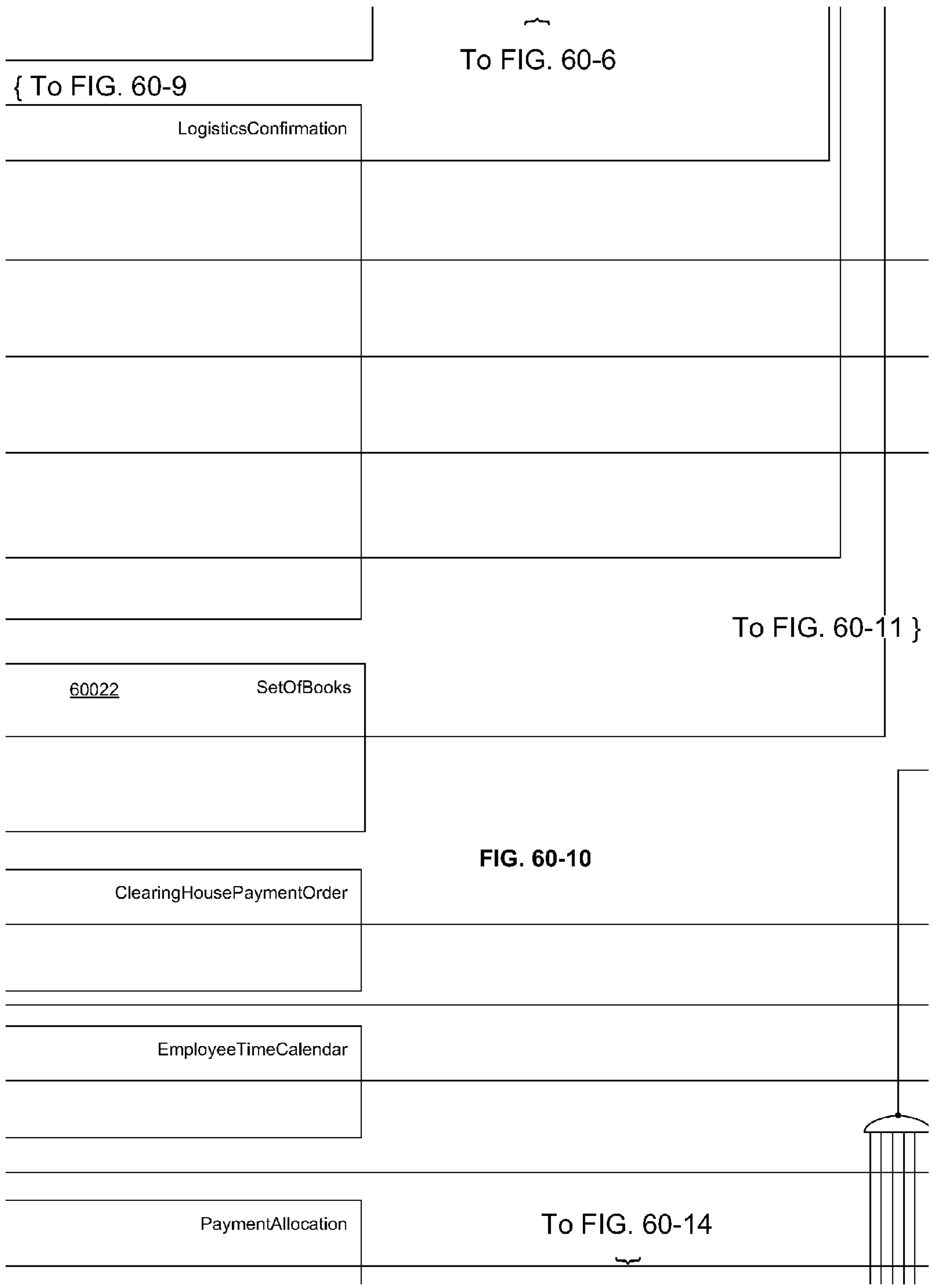
Figures 11, 60:
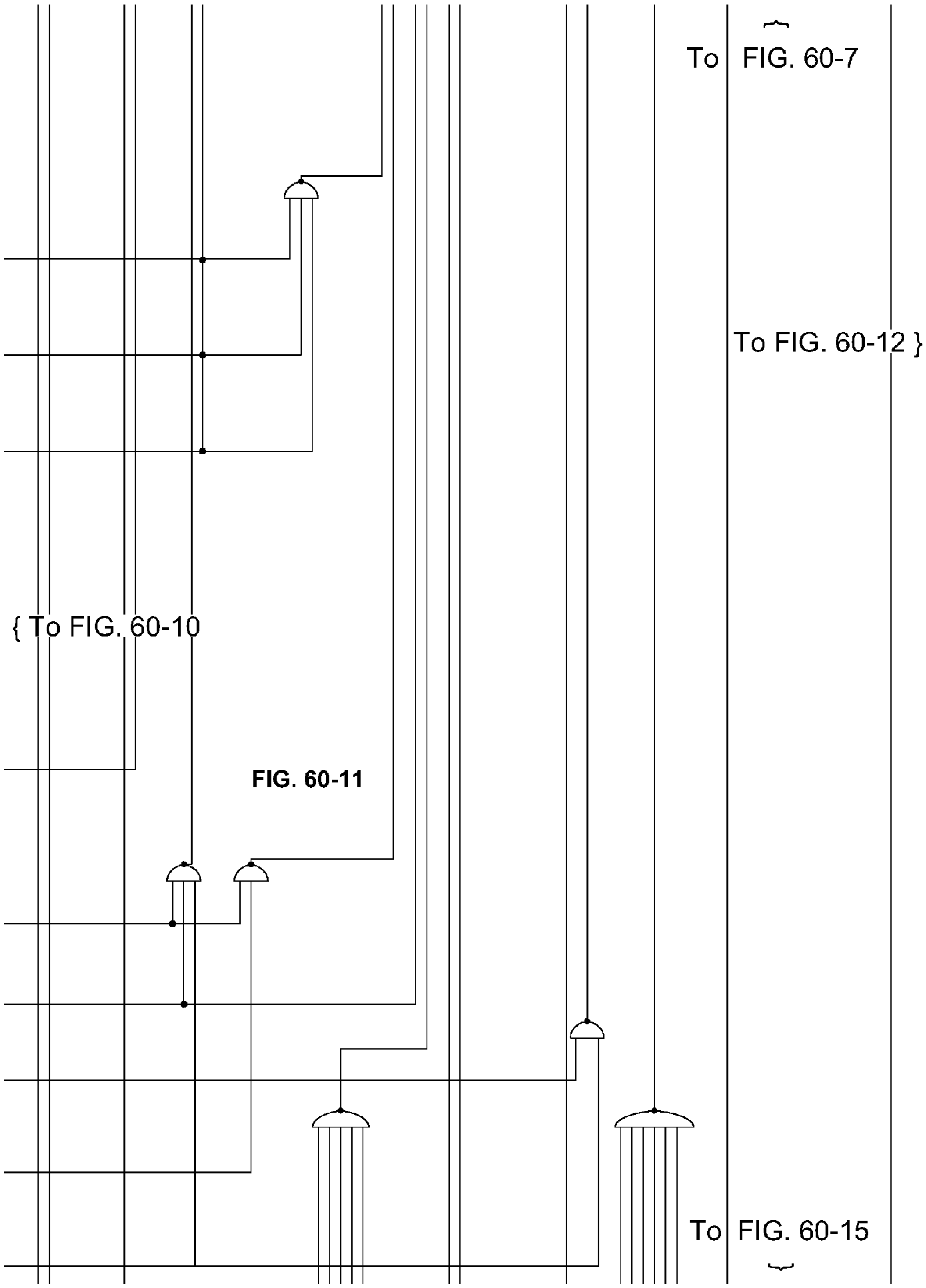
Figures 12, 60:
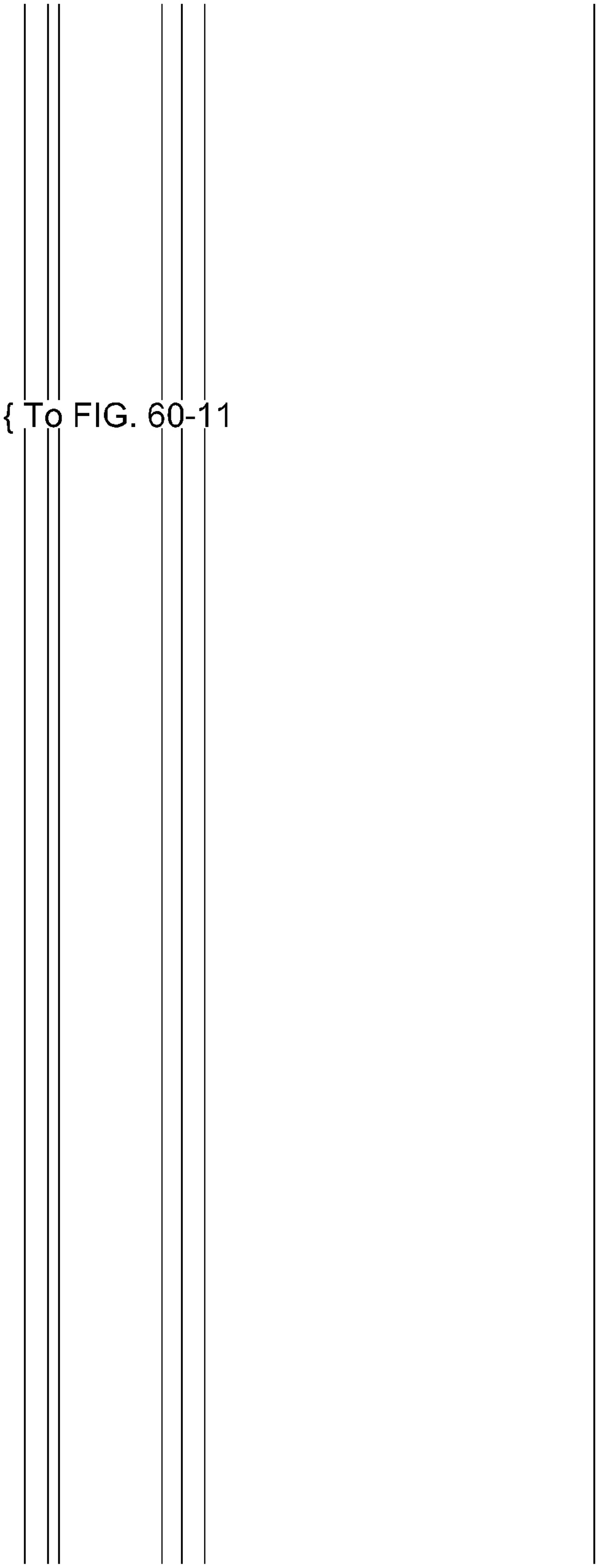
Figures 13, 60:
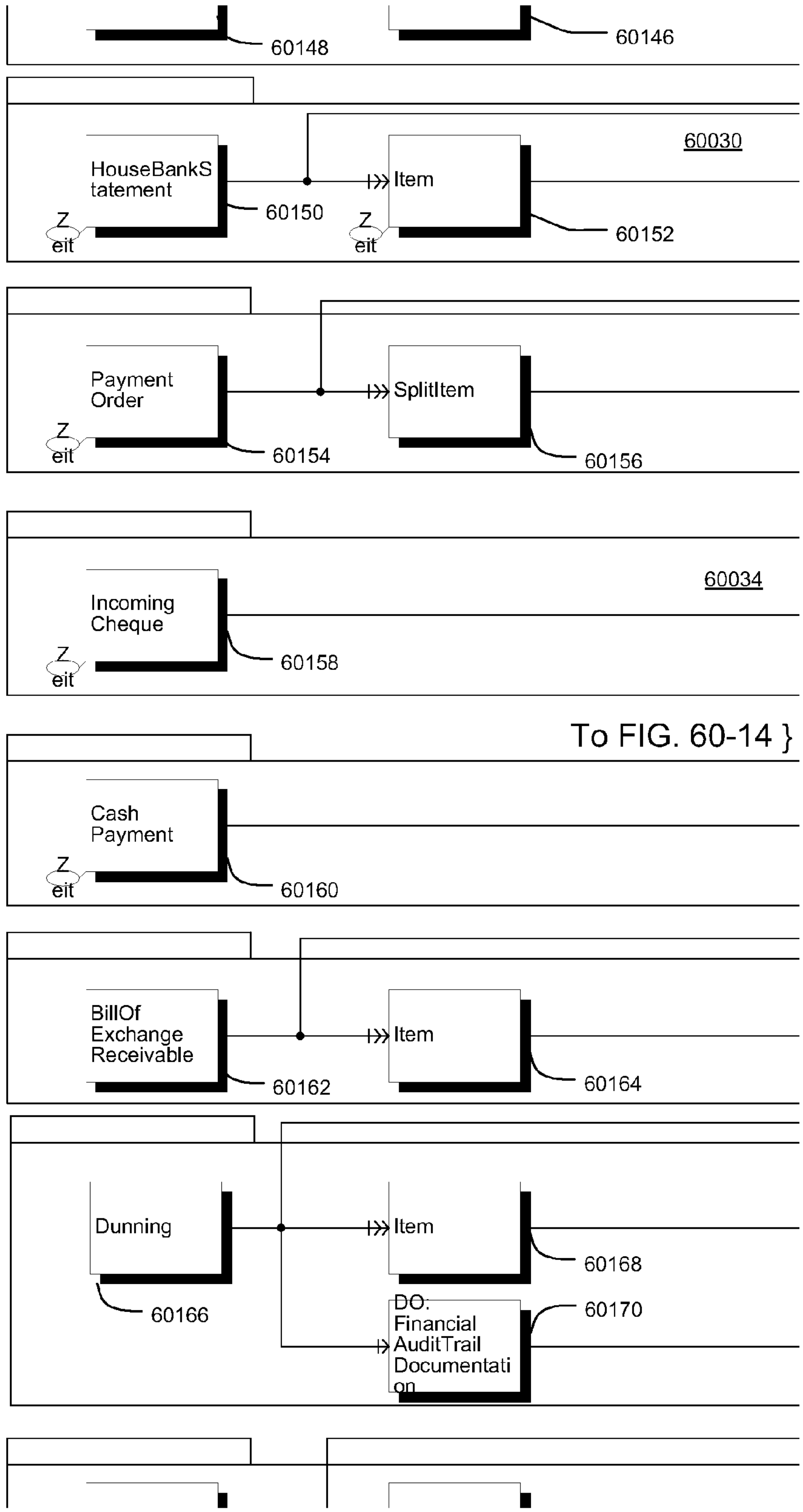
Figures 14, 60:
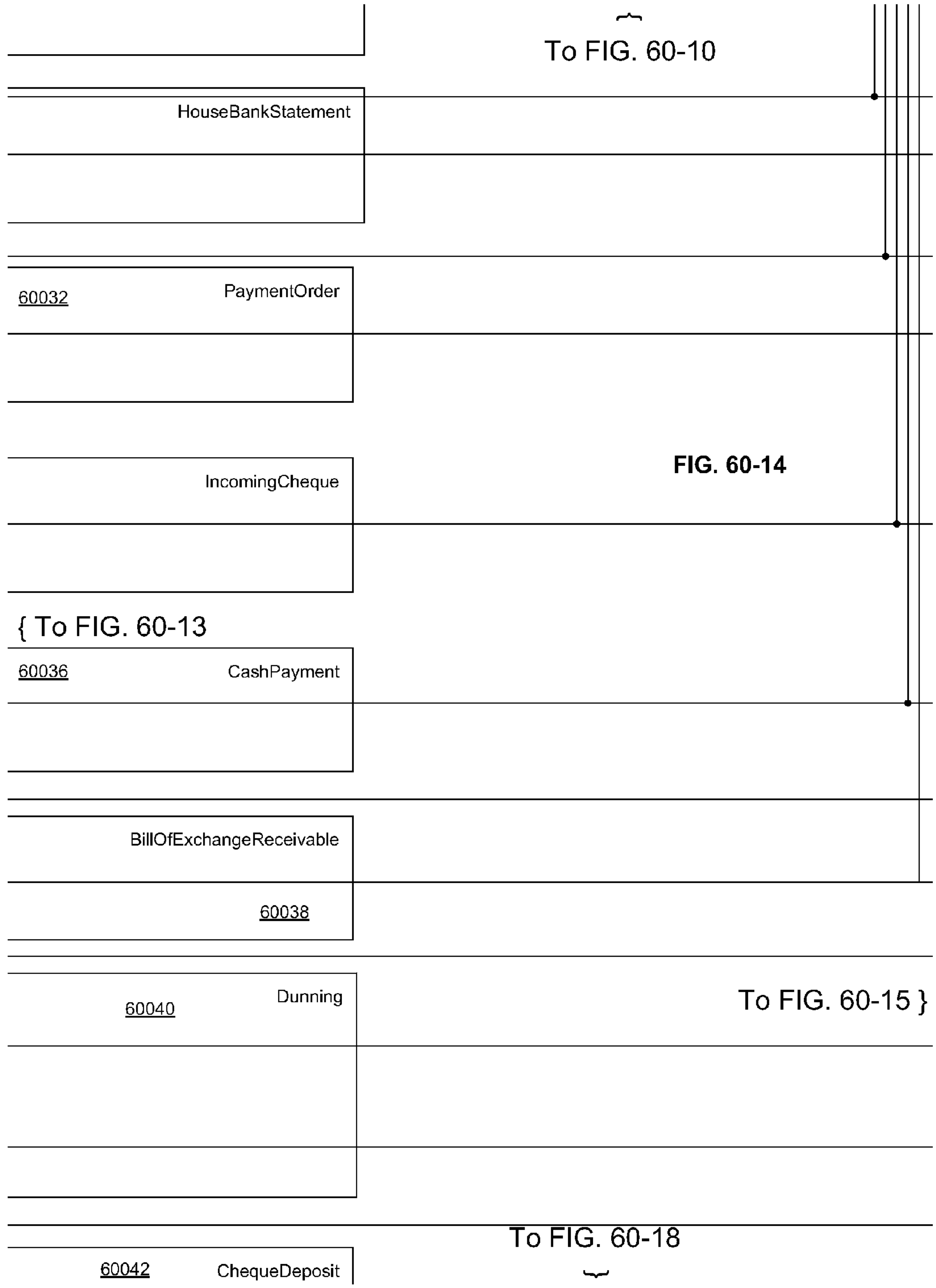
Figures 15, 60:
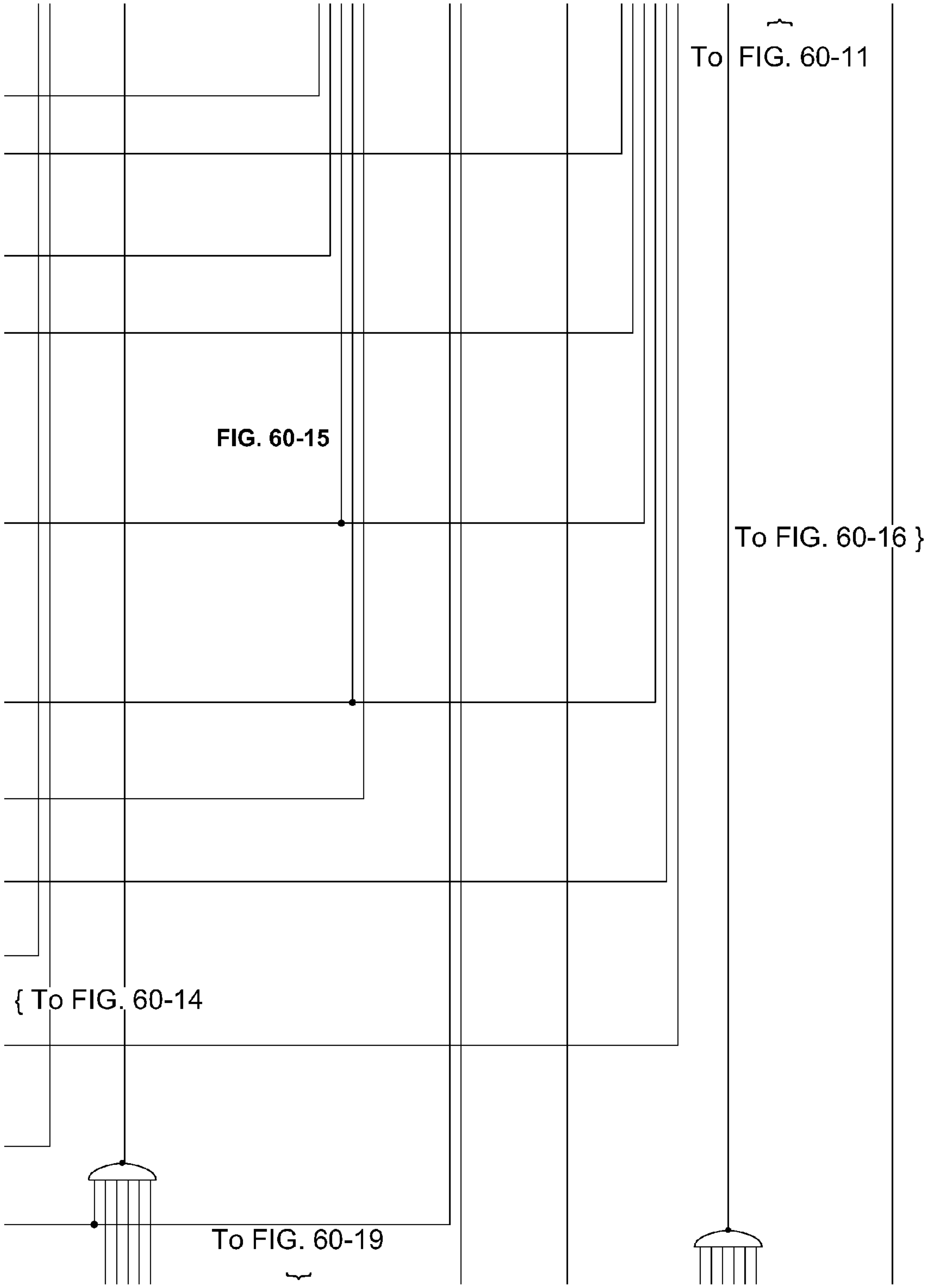
Figures 16, 60:
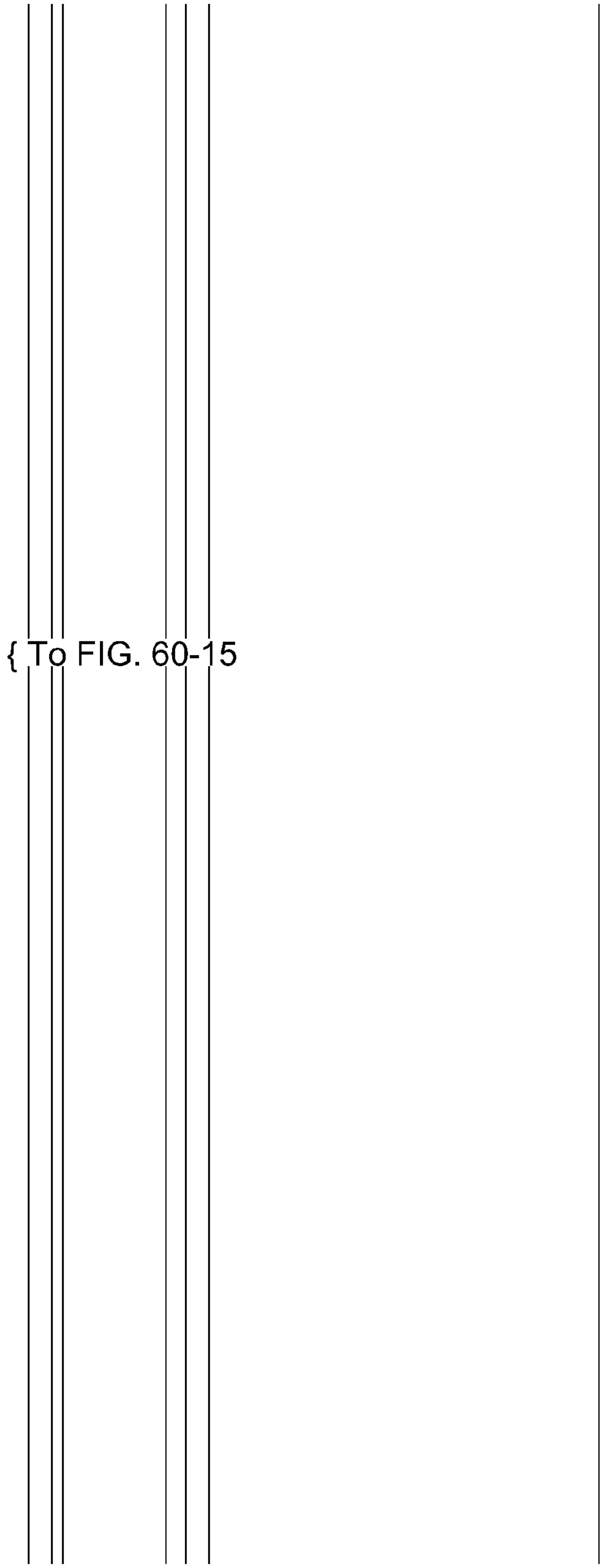
Figures 17, 60:
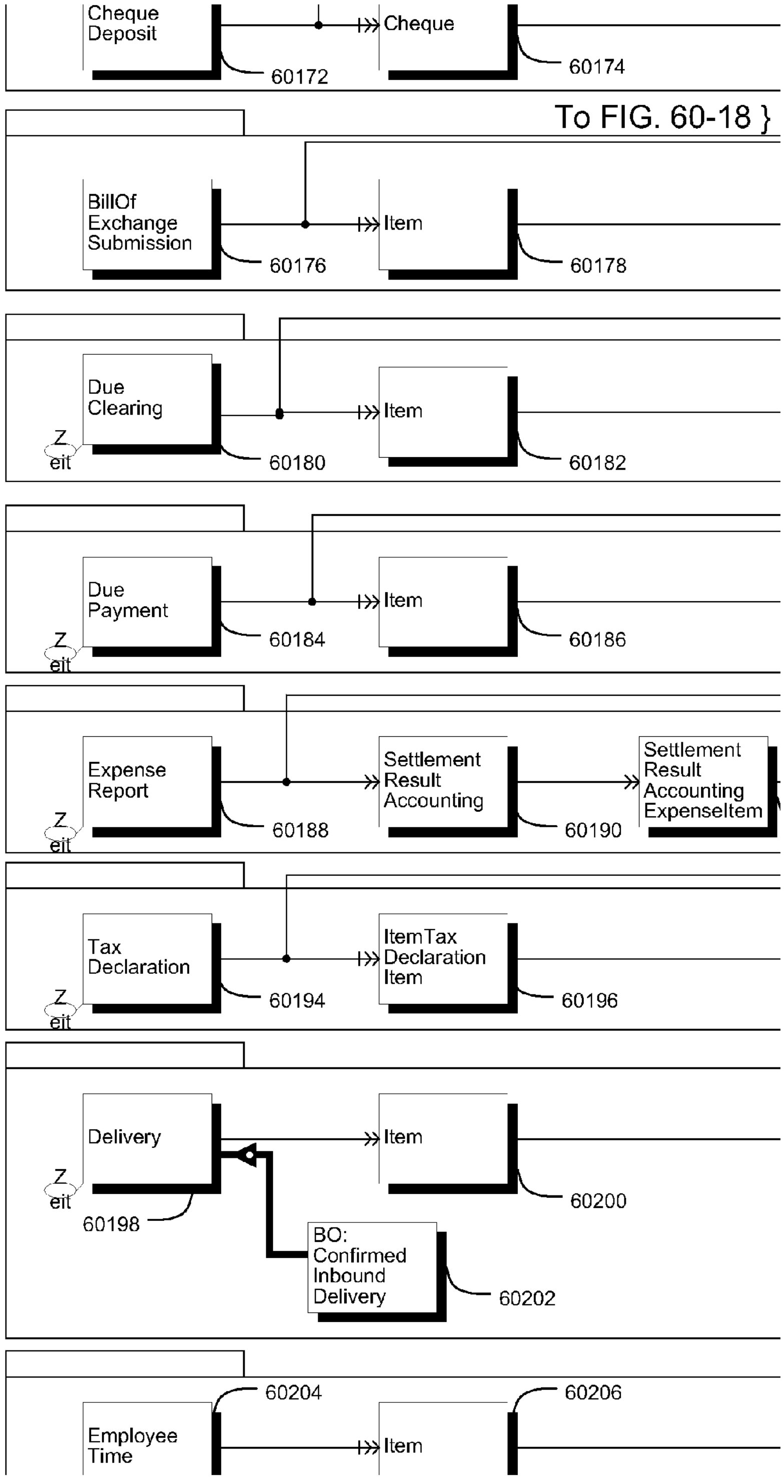
Figures 18, 60:
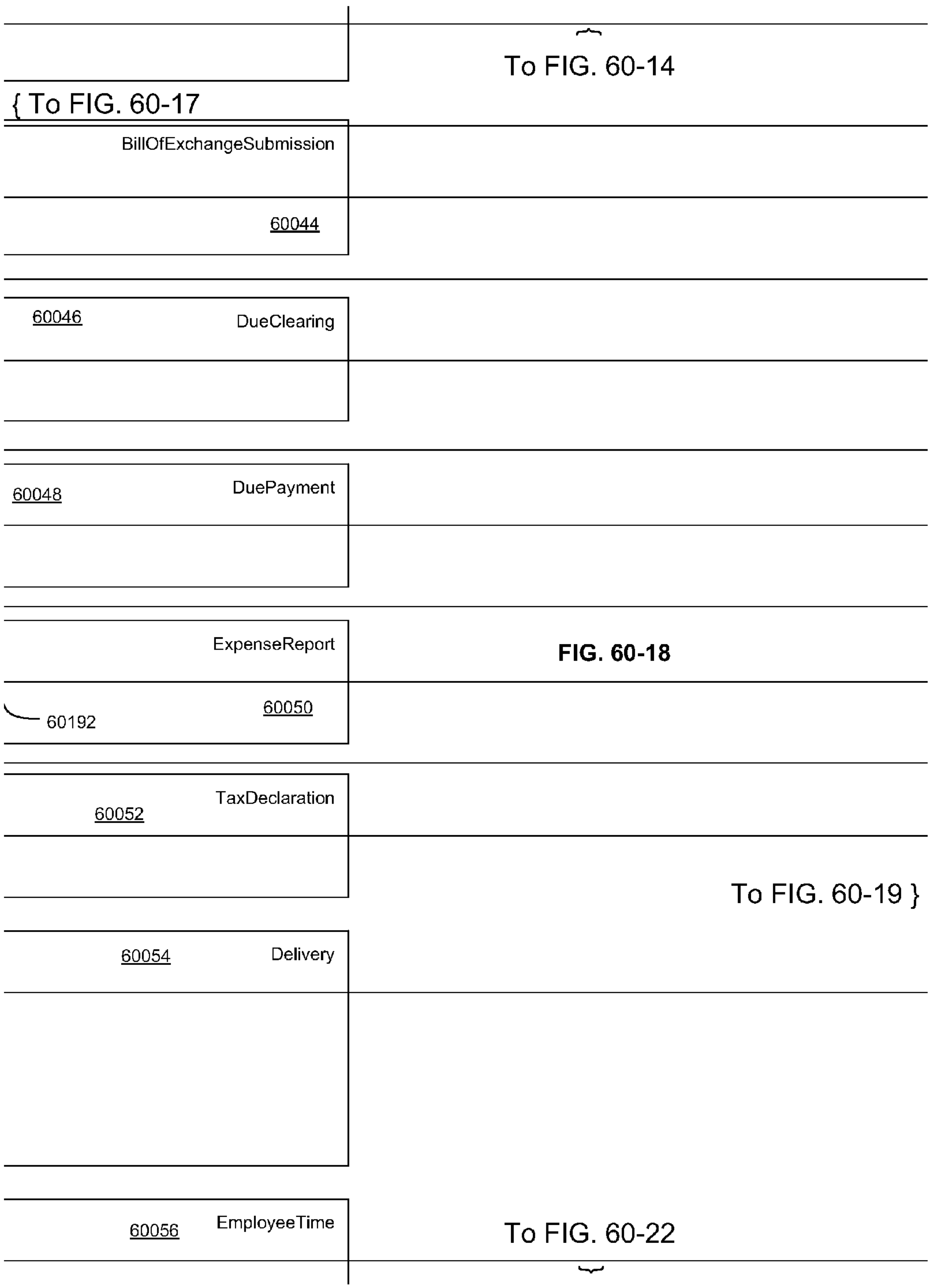
Figures 19, 60:
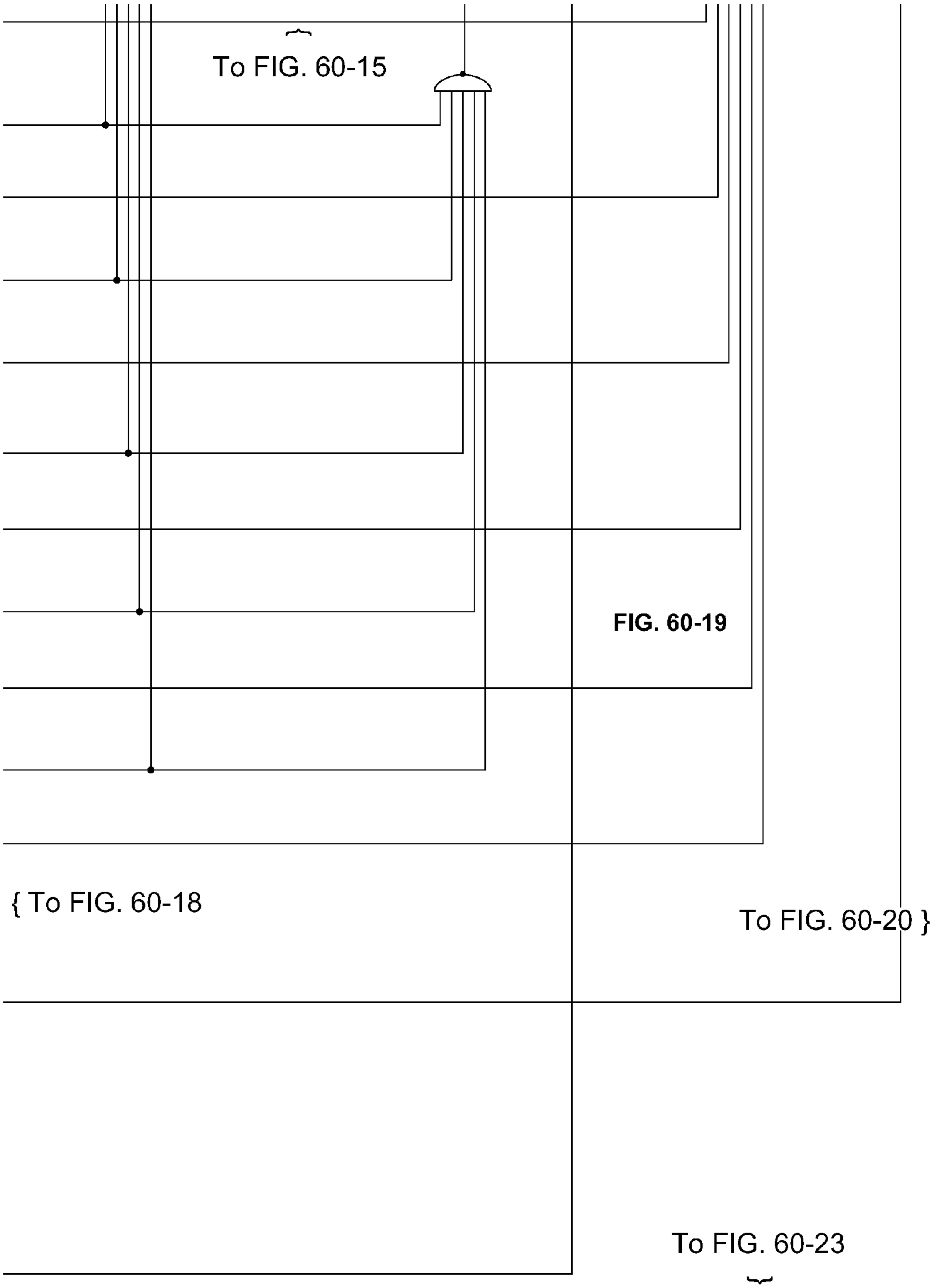
Figures 20, 60:
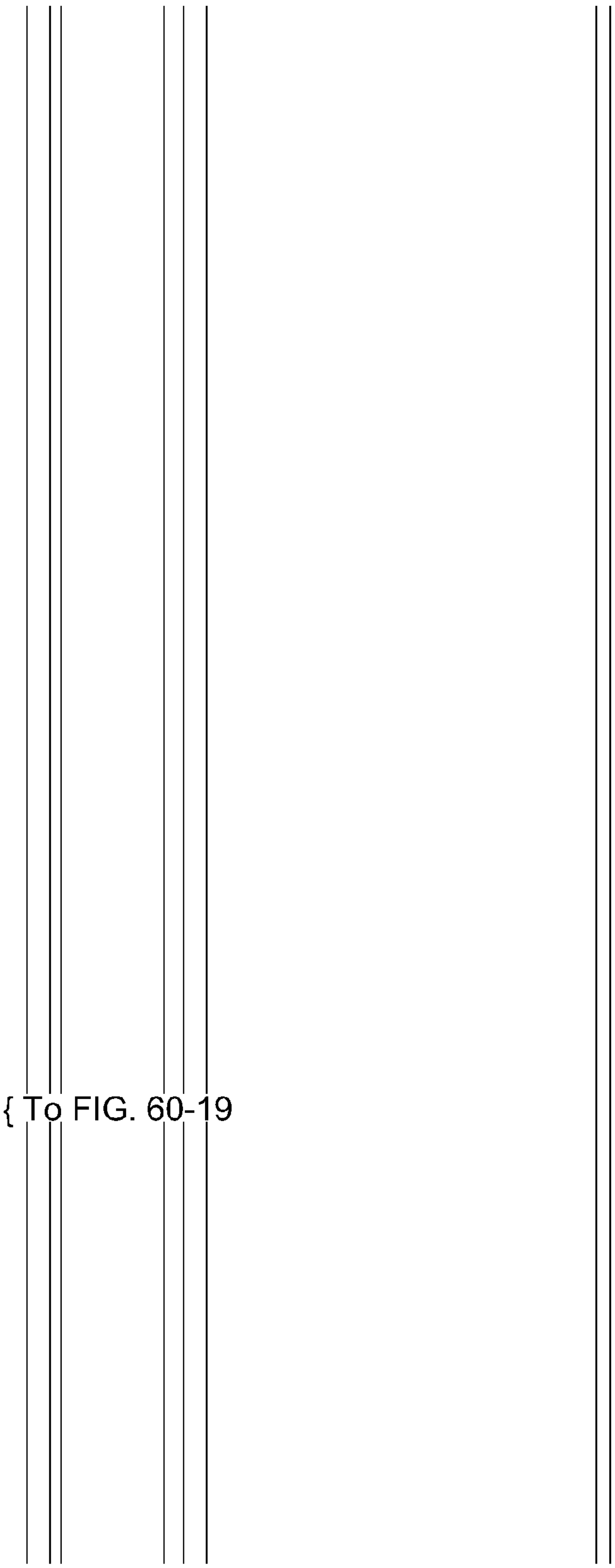
Figures 21, 60:
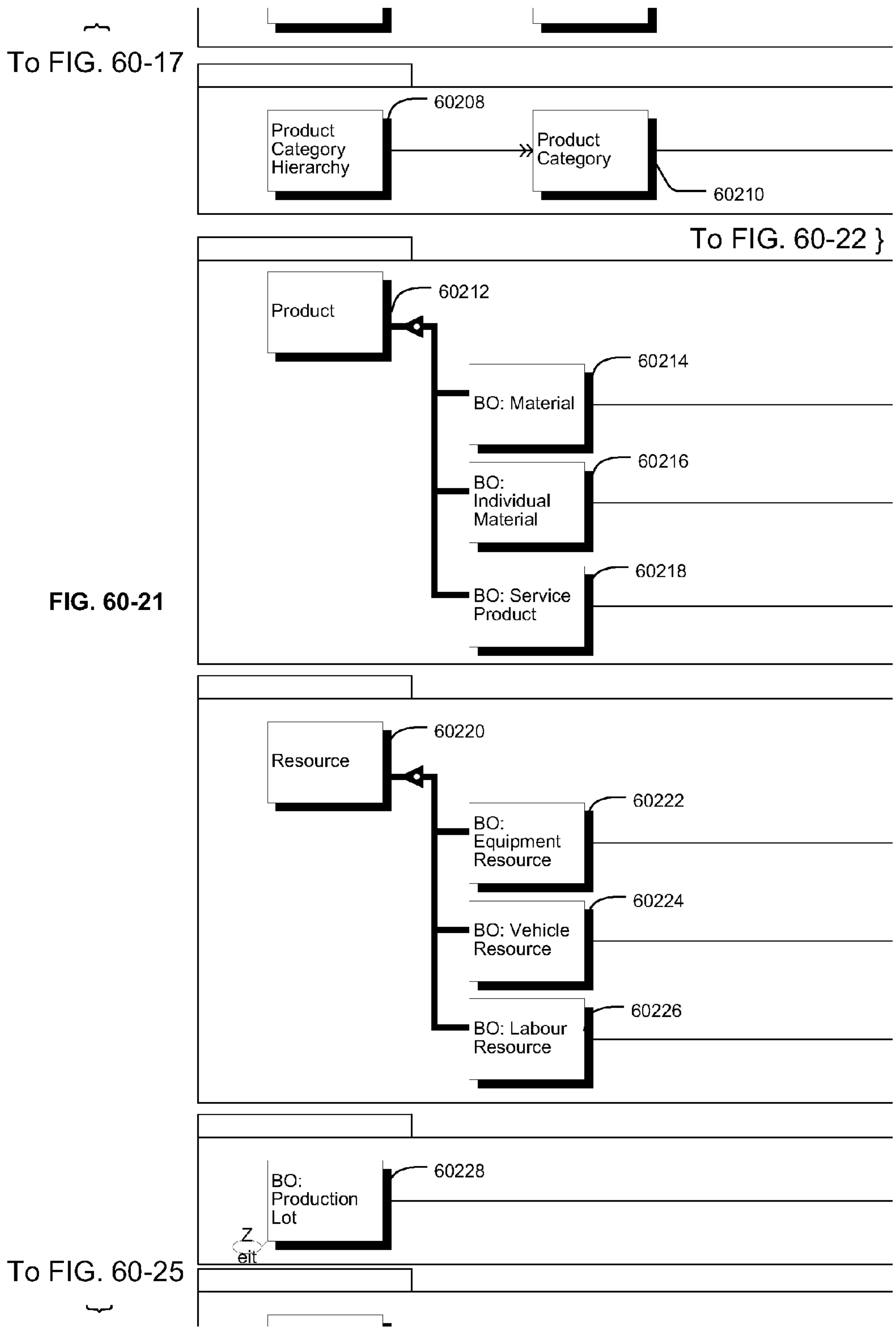
Figures 22, 60:
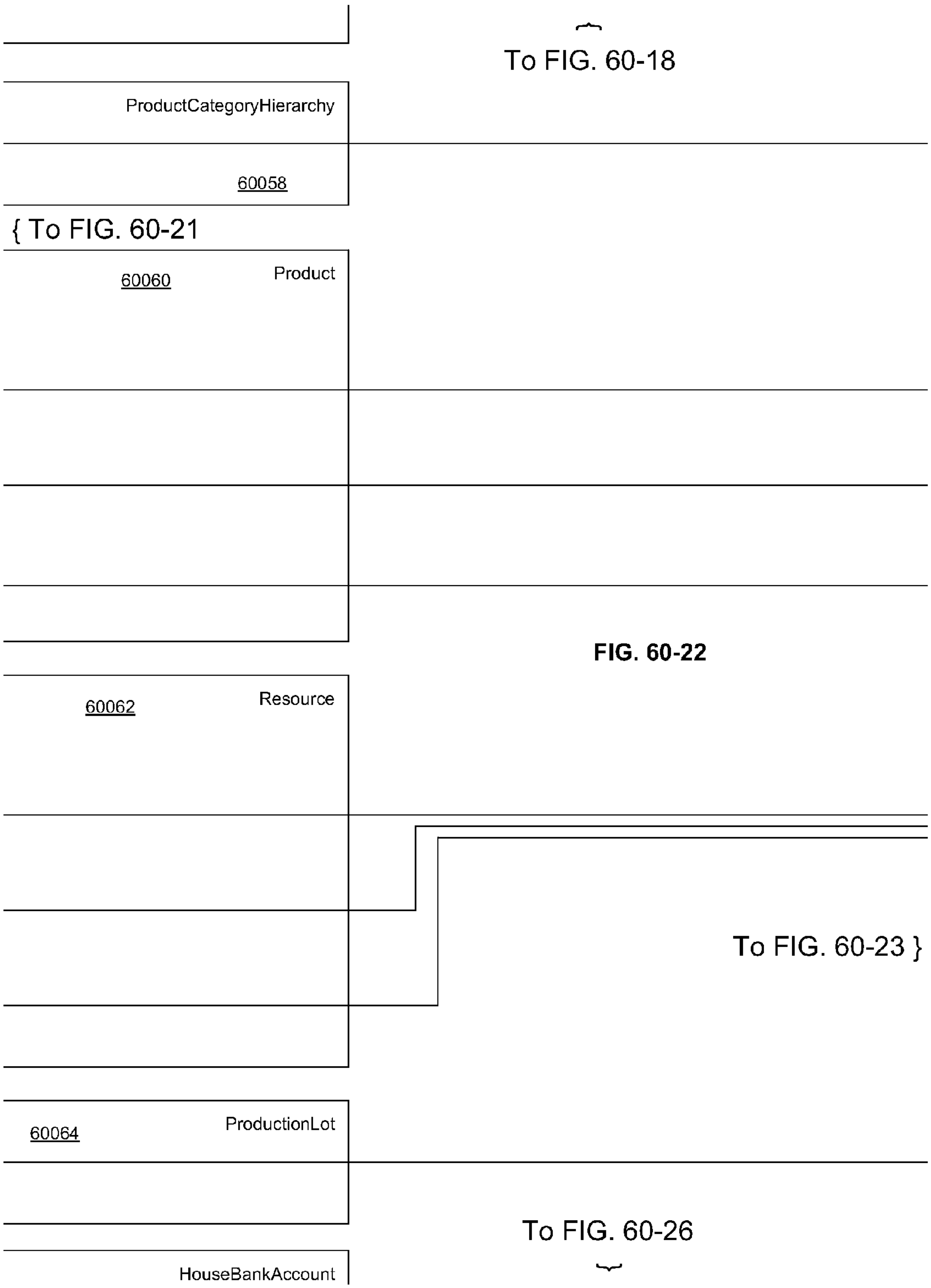
Figures 24, 60:
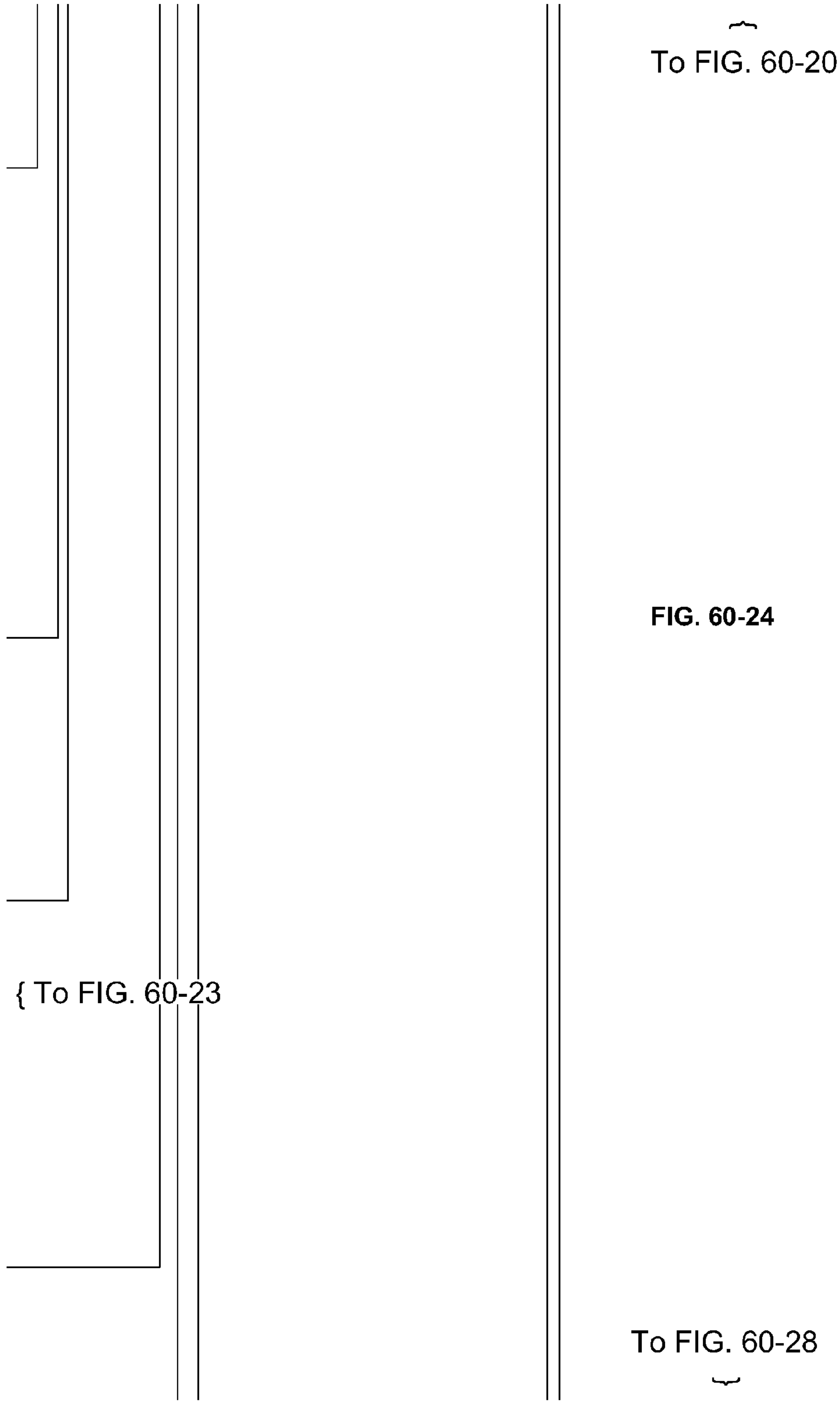
Figures 25, 60:
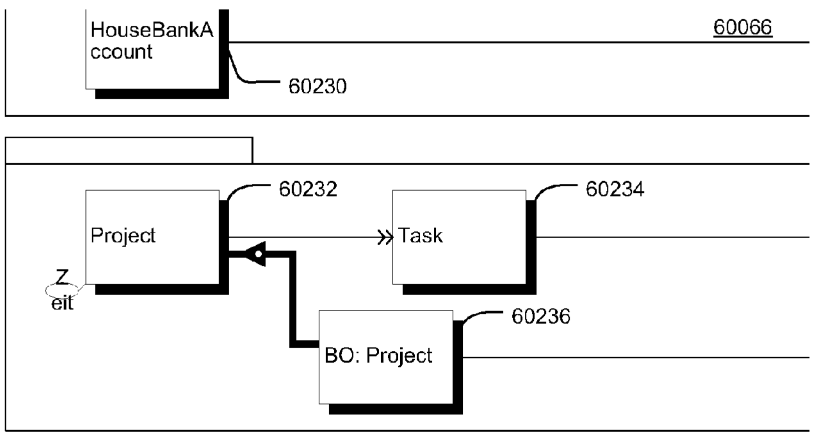
Figures 26, 60:
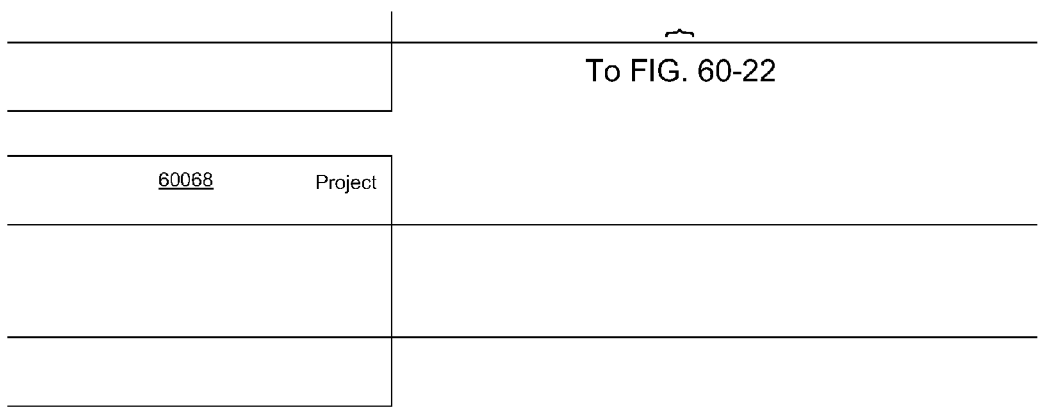
Figures 28, 60:
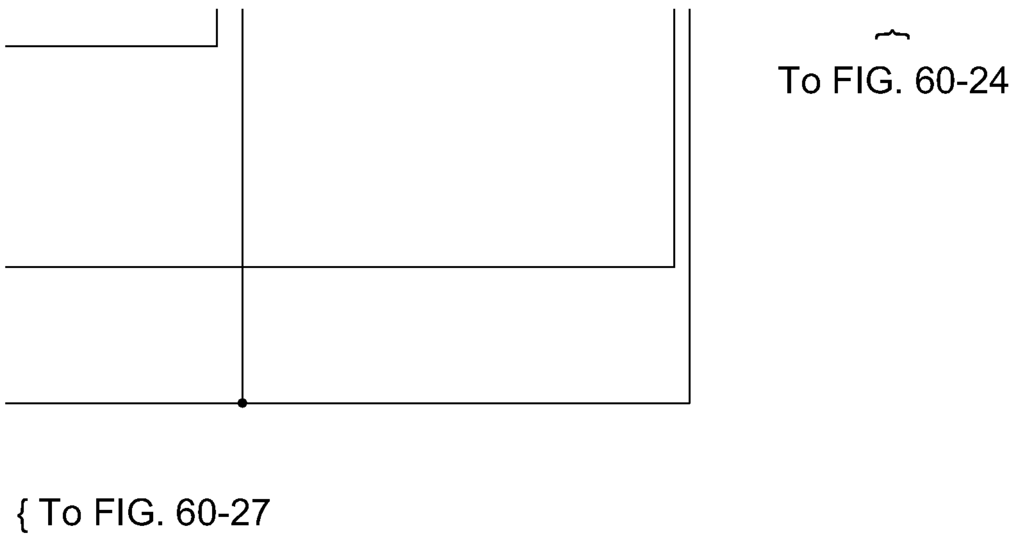

FIGS. 60-1 through 60-24 illustrate an example AccountingNotification business object model 60070. Specifically, this model depicts interactions among various hierarchical components of the AccountingNotification, as well as external components that interact with the AccountingNotification (shown here as 60000 through 60068 and 60072 through 60236).

An AccountingNotification can be a notification sent to Financial Accounting about one or more business transactions documented in an operational document. An operational document can be a document about a business transaction that takes place in an operational business area outside Financial Accounting. From the Financial Accounting point of view operational documents can be assigned to the categories “Contract”, “Order” and “Confirmation”.

A Contract can describe legally-enforceable obligations of both parties (Legal Entities or natural persons that are allowed to engage contracts) for a specific performance including fulfillment conditions for those obligations. Examples of a contract can include a Sales Contract, a Service Contract, a Purchase Order, and a Service Order.

An Order can be a demand on the functional organization for the rendering of services or the delivery of goods at specified time points. An order may translate a contract into action or—for split or merge purposes—it may substitute or refine one or several other orders. Examples of an order can include a Project, a Purchase Order, a Sales Order, a Service Order, a Production Lot, and a Payment Order.

A Confirmation can be an assurance of a specific performance, of the rendering of services or of the delivery of goods by the functional organization or by a business partner.

The assurance may contain references to one or several orders or to a contract that has been fully or partially fulfilled. In an implementation where it refers to a contract, it can cause an obligation for a consideration of the received specific performance by the receiving party. Examples of a confirmation can include a Supplier Invoice, a Goods and Service Acknowledgement, a Production Confirmation, a Goods and Activity Confirmation, a Production Confirmation, a Site Logistics Confirmation, an Employee Time Calendar, and an Expense Report.

The Notification of an Operational Document to Accounting can result in postings (at least all confirmations are posted) and can lead to the creation of Accounting Documents and of LineItems in LedgerAccounts. The reference to the operational document in the Accounting Document and in the LineItems can have a specific semantic and is called an Original Entry Document reference. An Original Entry Document can be a document that is necessary for auditing purposes and verifies that the value stated in the LineItem of a ledger account has been booked on the base of a real business transaction.

Subsequently a generic approach for referencing Operational Documents can be used. An Operational Document may be contained in another Business Object, the Operational DocumentContaining Business Object. In this case, beside the reference to the Operational Document an additional reference to the Business Object may be required for reconciliation and understandability purposes. Typical constellations can include a FinancialAuditTrailDocumentation, a SettlementResultPostingTransaction in an ExpenseReport, and a PeriodItem in an EmployeeTimeCalendar. The FinancialAuditTrailDocumentation can be included in a Host object like DuePayment, DueClearing, Dunning, and PaymentAllocation from Operative Financials.

At the item level, the Operational Document can be referred to by an OperationalDocumentItemReference. The operational document can document more than one business transaction (for example, a confirmation in production involves a goods movement and a service provision).

The AccountingNotification can represent these business transactions in a form that is suitable for the purposes of Financial Accounting and that is identical for all operational documents. The Accounting Notification can include the data necessary for valuation of the business transaction. The AccountingNotification can be the basis for creating a record that conforms with the accounting principles applicable to the Company and that are needed to ensure traceability of the record.

In some implementations, a critical task of the process component Accounting can be in recording business transactions in the operational components, such as Customer Relationship Management (for example, Service Confirmation), Customer Invoicing (for example, Customer Invoice), or Logistics Execution (for example, Inbound Delivery or Production Confirmation).

To enable automatic recording of these business transactions in Accounting, the operational documents that can be transferred to Accounting are given a uniform structure that is suitable for the purposes of Accounting. This uniform structure of the notification of a business transaction can be the AccountingNotification.

Rules for recording the business transactions for each SetOfBooks can be specified based on the structure of the AccountingNotification. In some implementations, if the rules of the set of books require that the business transaction be documented in the form of postings, processing the AccountingNotification updates the relevant accounts in Accounting for that set of books, and an AccountingDocument is generated for that set of books (if more than one set of books is supported in Accounting, more than one AccountingDocument is generated). In some implementations, if the business transaction cannot be posted in any of the supported sets of books (this is usually the case in the Private Sector, such as when creating or changing a PurchaseOrder, SalesOrder, or ProductionLot), it is only provided for informational purposes in the business objects of Accounting, and no accounting document is generated. The AccountingNotification can be the unvaluated Accounting view of the operational business transactions, while the AccountingDocument can represent the valuated view or views ("accounting views") of the operational business transaction. To ensure traceability of the AccountingDocument, it can point to the AccountingNotification and the operational document. To support multiple sets of books (parallel valuation), more than one AccountingDocument can point to a given AccountingNotification.

The AccountingNotification business object can be part of the Accounting process component. The AccountingNotification can include ItemGroups 60240, ItemGroupItems 60242, specializations of the ItemGroupItem, ProcessedSetOfBooks 60262, and CancellationAccountingNotification 60266. ItemGroups can be a collection of ItemGroupItems based on the criteria of Accounting. ItemGroupItems can include structured information from an item of a operational document based on the classification criteria of Accounting. Specializations of the ItemGroupItem can be based on the area where the quantity or value change originates and the type of quantity or value change (MaterialItem, ServiceItem, ProductionItem, PurchasingItem, SalesItem, DueItem, TaxItem, CashItem, ExpenseAndIncomeItem, and ProjectItem). ProcessedSetOfBooks can indicate the SetOfBooks in which the AccountingNotification was processed. An AccountingNotification can be a CancellationAccountingNotification that records the cancellation of a an operational document or the cancellation of items in an operational document.

Service Interfaces

The AccountingNotification business object can be involved in the following Process Integration Models: ConfirmationAndInventory_Accounting, CustomerInvoiceProcessing_Accounting, CustomerComplaintProcessing_Accounting, DueItemProcessing_Accounting, ExpenseAndReimbursementManagement_Accounting, Production_Accounting, ProjectProcessing_Accounting, PurchaseOrderProcessing_Accounting, SalesOrderProcessing_Accounting, SalesOrderProcessing_ProductValuationAccounting, ServiceConfirmationProcessing_Accounting, ServiceOrderProcessing_Accounting, ServiceRequestProcessing_Accounting, SiteLogisticsProcessing_Accounting, SupplierInvoiceProcessing_Accounting, TimeAndLabourManagement_Accounting, PaymentProcessing_Accounting, and GoodsAndServiceAcknowledgement_Accounting.

Service Interfaces

A Production Accounting In Service Interface can be referred to as an AccountingProductionAccountingIn. The Production Order Accounting In service interface can be part of the Process Integration Model Production_Accounting. The Production Accounting In service interface can group the operations that inform Accounting about accounting-relevant data from Production regarding production lots.

A Create Accounting Notification Operation (A2A) can also be referred to as an AccountingProductionAccountingIn.CreateAccountingNotification. The AccountingProductionAccountingIn.CreateAccountingNotification can convert an operational document transferred from Production to Accounting into an AccountingNotification, can update a ProductionLedgerAccount, can check whether postings in the affected sets of books are necessary, and can generate any required AccountingDocuments for those sets of books.

The operation can be based on the ProductionLotAccountingNotification message type (derived from the AccountingNotification business object).

Sales And Purchasing Accounting In Service Interface can also be referred to as an AccountingSalesAndPurchasingAccountingIn. The Order Accounting In service interface can be part of the following Process Integration Models: CustomerComplaintProcessing_Accounting, PurchaseOrderProcessing_Accounting, SalesOrderProcessing_Accounting, ServiceConfirmationProcessing_Accounting, ServiceOrderProcessing_Accounting, ServiceRequestProcessing_Accounting, and GoodsAndServiceAcknowledgement_Accounting.

The Sales And Purchasing Accounting In service interface can group the operations that inform Accounting about accounting-relevant data regarding purchase orders, customer contracts, sales orders, service contracts, service orders, service confirmations, and service requests from Customer Complaint Processing, Purchase Order Processing, Sales Order Processing, Service Confirmation Processing, Service Order Processing, Service Request Processing, or Goods And Service Acknowledgement.

A Create Accounting Notification Operation (A2A) can also be referred to as an AccountingSalesAndPurchasingAccountingIn.CreateAccountingNotification. The AccountingSalesAndPurchasingAccountingIn.CreateAccountingNotification can convert an operational document transferred from Customer Complaint Processing, Purchase Order Processing, Sales Order Processing, Service Confirmation Processing, Service Order Processing, Service Request Processing, or Goods And Service Acknowledgement into an AccountingNotification, can update the affected accounts in Accounting, can check whether postings in the affected sets of books are necessary, and can generate any required AccountingDocuments for those sets of books. The operation can be based on the SalesAndPurchasingAccountingNotification message type (derived from the AccountingNotification business object).

A Project Accounting In Service Interface can also be referred to as an AccountingProjectAccountingIn. The Project Accounting In service interface can be part of the ProjectProcessing_Accounting Process Integration Model. The Project Accounting In service interface can group the operations that inform Accounting about accounting-relevant data from Project Processing regarding projects.

A CreateAccountingNotification Operation (A2A) can also be referred to as an AccountingProjectAccountingIn.CreateAccountingNotification. The AccountingProjectAccountingIn.CreateAccountingNotification can convert an operational document transferred from Project Processing to Accounting into an AccountingNotification, updates an AccountingViewOnProject, can check whether accounts in Accounting need to be updated and whether postings for the affected sets of books are necessary, and can generate any required AccountingDocuments for those sets of books. The operation can be based on the ProjectAccountingNotification message type (derived from the AccountingNotification business object).

A Goods And Service Accounting In Service Interface can also be referred to as an AccountingGoodsAndServiceAccountingIn. The Goods And Service Accounting In service interface can be part of the GoodsAndServiceAcknowledgement_Accounting Process Integration Models. The Goods And Service Accounting In service interface can group the operations that inform Accounting from Goods And Service Acknowledgement regarding the delivery of goods or services, or their cancellation, by the supplier or other requesters.

An Operation Create Accounting Document (A2A) can also be referred to as an AccountingGoodsAndServiceAccountingIn.CreateAccountingDocument. The AccountingGoodsAndServiceAccountingIn.CreateAccountingDocument can convert into an AccountingNotification an operational document that was transferred to Accounting from Goods And Service Acknowledgment, can check whether postings for the affected sets of books are required, can update the affected accounts in Accounting for the relevant sets of books, and can generate AccountingDocuments for those sets of books. The operation can be based on the message type GoodsAndServiceAcknowledgementAccountingNotification (derived from the business object AccountingNotification).

A Cancel Accounting Document Operation (A2A) can also be referred to as an AccountingGoodsAndServiceAccountingIn.CancelAccountingDocument. The AccountingGoodsAndServiceAccountingIn.CancelAccountingDocument can convert into an AccountingNotification the cancellation of an operational document that was transferred to Accounting from Goods And Service Acknowledgment, can check whether postings for the affected sets of books are required, can adjust the affected accounts in Accounting for the relevant sets of books, and can generate AccountingDocuments for those sets of books as cancellations of the original AccountingDocuments. The operation can be based on the message type GoodsAndServiceAcknowledgementCancellationAccountingNotification (derived from the business object AccountingNotification).

An Inventory And Activity Accounting In Service Interface can also be referred to as an AccountingInventoryAndActivityAccountingIn. The Inventory And Activity Accounting In service interface can be part of the following Process Integration Models: ConfirmationAndInventory_Accounting, Production_Accounting, and SiteLogisticsProcessing_Accounting. The Inventory And Activity Accounting In service interface can group the operations that inform Accounting from Confirmation And Inventory, Production, or Site Logistics Processing regarding inventory changes and inventory differences in inventory management, and regarding material consumption or service provision (such as with confirmations), or their cancellation.

An Operation Create Accounting Document (A2A) can also be referred to as an AccountingInventoryAndActivityAccountingIn.CreateAccountingDocument. The AccountingInventoryAndActivityAccountingIn.CreateAccountingDocument can convert into an AccountingNotification an operational document that was transferred to Accounting from Confirmation And Inventory, Site Logistics Processing, or Production, can check whether postings for the affected sets of books are required, can update the affected accounts in Accounting for the relevant sets of books, and can generate AccountingDocuments for those sets of books. The operation can be based on the InventoryChangeAndActivityConfirmationAccountingNotification message type (derived from the AccountingNotification business object).

A Cancel Accounting Document Operation (A2A) can also be referred to as an AccountingInventoryAndActivityAccountingIn.CancelAccountingDocument. The AccountingInventoryAndActivityAccountingIn.CancelAccountingDocument can convert into an AccountingNotification the cancellation of an operational document that was transferred to Accounting from Confirmation And Inventory, Site Logistics Processing, or Production, can check whether postings for the affected sets of books are required, can adjust the affected accounts in Accounting for the relevant sets of books, and can generate AccountingDocuments for those sets of books as cancellations of the original AccountingDocuments. The operation can be based on the InventoryChangeAndActivityConfirmationCancellationAccountingNotification message type (derived from the AccountingNotification business object).

A Service Provision Accounting In Service Interface can also be referred to as an AccountingServiceProvisionAccountingIn. The Service Provision Accounting In service interface can be part of the following Process Integration Models: ServiceConfirmationProcessing_Accounting, ServiceRequestProcessing_Accounting, and TimeAndLabourManagement_Accounting. The Service Provision Accounting In service interface can group the operations that inform Accounting from Service Request Processing, Service Confirmation Processing, or Time And Labour Management regarding the provision of internal services or their cancellation.

A Create Accounting Document Operation (A2A) can also be referred to as an

AccountingServiceProvisionAccountingIn.CreateAccountingDocument. The AccountingServiceProvisionAccountingIn.CreateAccountingDocument can convert into an AccountingNotification an operational document that was transferred to Accounting from Service Request Processing, Service Confirmation Processing, or Time And Labour Management, can check whether postings are required for the affected sets of books, can update the affected accounts of Accounting for the relevant sets of books, and can generate AccountingDocuments for those sets of books. The operation can be based on the ServiceProvisionAccountingNotification message type (derived from the AccountingNotification business object).

A Cancel Accounting Document Operation (A2A) can also be referred to as an

AccountingServiceProvisionAccountingIn.CancelAccountingDocument. The AccountingServiceProvisionAccountingIn.CancelAccountingDocument can convert into an AccountingNotification the cancellation of an operational document that was transferred to Accounting from Service Request Processing, Service Confirmation Processing, or Time And Labour Management, can check whether postings for the affected sets of books are required, adjusts the affected accounts in Accounting for the relevant sets of books, and can generate AccountingDocuments for those sets of books as cancellations of the original AccountingDocuments. The operation is based on the ServiceProvisionCancellationAccountingNotification message type (derived from the AccountingNotification business object).

Invoice Accounting In Service Interface can also be referred to as an

AccountingInvoiceAccountingIn. The Invoice Accounting In service interface can be part of the following Process Integration Models: CustomerInvoiceProcessing_Accounting, and SupplierInvoiceProcessing_Accounting. The Invoice Accounting In service interface can group the operations that inform Accounting about the generation or cancellation of outgoing invoices from Customer Invoice Processing or incoming invoices from Supplier Invoice Processing.

A Create Accounting Document Operation (A2A) can also be referred to as an AccountingInvoiceAccountingIn.CreateAccountingDocument. The AccountingInvoiceAccountingIn.CreateAccountingDocument can convers into an AccountingNotification an operational document that was transferred to Accounting from Customer Invoice Processing or Supplier Invoice Processing, can check whether postings for the affected sets of books are required, can update the affected accounts in Accounting for the relevant sets of books, and can generate AccountingDocuments for those sets of books.

The operation can be based on the InvoiceAccountingNotification message type (derived from the AccountingNotification business object).

A Cancel Accounting Document Operation (A2A) can also be referred to as an AccountingInvoiceAccountingIn.CancelAccountingDocument. The AccountingInvoiceAccountingIn.CancelAccountingDocument can convert into an AccountingNotification the cancellation of an operational document that was transferred to Accounting from Customer Invoice Processing or Supplier Invoice Processing, can check whether postings for the affected sets of books are required, can adjust the affected accounts in Accounting for the relevant sets of books, and can generate AccountingDocuments for those sets of books as cancellations of the original AccountingDocuments. The operation can be based on the InvoiceCancellationAccountingNotification message type (derived from the AccountingNotification business object).

A Payment Accounting In Service Interface can also be referred to as an AccountingPaymentAccountingIn. The Payment Accounting In service interface can be part of the following Process Integration Models: DueItemProcessing_Accounting, and PaymentProcessing_Accounting The Payment Accounting In service interface groups the operations that inform Accounting about incoming or outgoing payments, or the cancellation thereof, from Payment Processing or Due Item Processing.

A Create Accounting Document Operation (A2A) can also be referred to as an AccountingPaymentAccountingIn.CreateAccountingDocument. The AccountingPaymentAccountingIn.CreateAccountingDocument can convert into an AccountingNotification an operational document that was transferred to Accounting from Payment Processing or Due Item Processing, can check whether postings for the affected sets of books are required, can update the affected accounts in Accounting for the relevant sets of books, and can generate AccountingDocuments for those sets of books. The operation can be based on the PaymentAccountingNotification message type (derived from the AccountingNotification business object).

A Cancel Accounting Document Operation (A2A) can also be referred to as an

AccountingPaymentAccountingIn.CancelAccountingDocument. The AccountingPaymentAccountingIn.CancelAccountingDocument can convert into an AccountingNotification the cancellation of an operational document that was transferred to Accounting from Payment Processing or Due Item Processing, can check whether postings for the affected sets of books are required, can adjust the affected accounts in Accounting for the relevant sets of books, and can generate AccountingDocuments for those sets of books as cancellations of the original AccountingDocuments. The operation can be based on the PaymentCancellationAccountingNotification message type (derived from the AccountingNotification business object).

An Expense Accounting In Service Interface can also be referred to as an

AccountingExpenseAccountingIn. The Expense Accounting In service interface can be part of the ExpenseAndReimbursementManagement_Accounting Process Integration Model. The Expense Accounting In service interface can group the operations that inform Accounting about reimbursements of expenses to employees, or the cancellation thereof, from Expense And Reimbursement Management.

A Create Accounting Document Operation (A2A) can also be referred to as an AccountingExpenseAccountingIn.CreateAccountingDocument. The AccountingExpenseAccountingIn.CreateAccountingDocument can convert, into an AccountingNotification, an operational document that was transferred to Accounting from Expense And Reimbursement Management, can check whether postings for the affected sets of books are required, can update the affected accounts in Accounting for the relevant sets of books, and can generate AccountingDocuments for those sets of books. The operation can be based on the ExpenseReportAccountingNotification message type (derived from the AccountingNotification business object).

A Cancel Accounting Document Operation (A2A) can also be referred to as an AccountingExpenseAccountingIn.CancelAccountingDocument. The AccountingExpenseAccountingIn.CancelAccountingDocument can convert, into an AccountingNotification, the cancellation of an operational document that was transferred to Accounting from Expense And Reimbursement Management, can check whether postings for the affected sets of books are required, can adjust the affected accounts in Accounting for the relevant sets of books, and can generate AccountingDocuments for those sets of books as cancellations of the original AccountingDocuments. The operation can be based on the ExpenseReportCancellationAccountingNotification message type (derived from the AccountingNotification business object).

An Open Item Accounting In Service Interface can also be referred to as an AccountingOpenItemAccountingIn. The Open Item Accounting In service interface can be part of the DataMigrationProcessing Accounting Process Integration Models. The Open Item Accounting In service interface can group the operations that inform Accounting from Data Migration Processing regarding the open items.

A Create Accounting Document Operation (A2A) can also be referred to as an AccountingOpenItemAccountingIn.CreateAccountingDocument. The AccountingOpenItemAccountingIn.CreateAccountingDocument can convert, into an AccountingNotification, an operational document that was transferred to Accounting from Data Migration Processing, can check whether postings are required for the affected sets of books, updates the affected accounts of Accounting for the relevant sets of books, and can generate AccountingDocuments for those sets of books. The operation can be based on the OpenItemAccountingNotification message type (derived from the AccountingNotification business object).

Node Structure of the AccountingNotification Business Object

AccountingNotification 60238 can be a Root Node of the AccountingNotification Business Object. AccountingNotification can be a notification regarding a business transaction that is sent to Accounting from an operational business area outside Financial Accounting. It can represent this operational business transaction in a standardized form for all operational documents and may contain the data needed to valuate the business transaction. The AccountingNotification can relate to a company in which the business transaction occurred and may include a reference to the document in which the business transaction was originally recorded for the company (from the point of view of the valuated record in Accounting, this is called the Operational Document). The AccountingNotification can include ItemGroups that represent part of the business transaction classified by a business process variant and possibly a business transaction category. Each ItemGroup can include multiple ItemGroupItems. The ItemGroupItems can include the changes to quantities and values due to the business transaction or the changes to the data of the business transaction.

The AccountingNotification can be the basis for creating a record that conforms with the accounting principles applicable to the Company and that may be needed to ensure traceability of the record. An AccountingNotification can occur in the CancellationAccountingNotification incomplete/disjoint specialization. An AccountingNotification can be a CancellationAccountingNotification that records the cancellation of a business transaction or the cancellation of items in a business transaction.

The elements located directly at the AccountingNotification node can be defined by the AccountingNotificationElements data type. These elements can include an UUID, a CancellationIndicator, a CompanyUUID, an OperationalDocumentContainingBusinessObjectReference, an OperationalDocumentReference, an OperationalDocumentTransactionUUID, an OperationalDocumentTransactionCounterValue, an OperationalDocumentPartnerID, an OperationalDocumentDate, an AccountingBusinessTransactionDateTime, an AccountingBusinessTransactionDate, a Note, a SystemAdministrativeData, a ProcessingStatusCode, a GeneralLedgerFunctionalUnitUUID, a Key, and an OperationalDocumentReference.

The UUID can be a universally unique identifier of an AccountingNotification. The UUID can be a GDT of type UUID. The CancellationIndicator can indicate whether an AccountingNotification is a CancellationAccountingNotification or not. The CancellationIndicator can be a GDT of type CancellationIndicator. The CompanyUUID can be a universally unique identifier of the company in which the business transaction occurred to which the notification refers. The CompanyUUID can be a GDT of type UUID. The OperationalDocumentContainingBusinessObjectReference can be a reference to a Business Object in an operational business area outside Financial Accounting that includes the Operational Document of which Accounting is notified by the AccountingNotification. The OperationalDocumentContainingBusinessObjectReference can be a GDT of type ObjectNodeReference. The OperationalDocumentReference can be a reference to the Operational Document of which Accounting is notified by the AccountingNotification. The OperationalDocumentReference can be a GDT of type ObjectNodeReference. In some implementations, if the Operational Object is identical to the Operational Document, only the OperationalDocumentReference needs to be supplied in the Accounting Notification messages and the OperationalDocumentContainingBusinessObjectReference can be derived from the OperationalDocumentReference. The OperationalDocumentTransactionUUID can be a universally unique Identifier of the transaction during which the Operational Document was created or changed. The OperationalDocumentTransactionUUID can be a GDT of type UUID, and in some implementations, can be optional. The OperationalDocumentTransactionCounterValue can be a sequential counter of the transaction during which the Operational Document was created or changed. This element may be unique for instances belonging to the same Operational Document. The OperationalDocumentTransactionCounterValue can be a GDT of type CounterValue. The OperationalDocumentPartnerID can be an identification of the Operational Document as assigned by the business partner. For example, the OperationalDocumentPartnerID can be the ID of the Supplier Invoice assigned by the Supplier. The OperationalDocumentPartnerID can be a GDT of type BusinessTransactionDocumentID, and in some implementations, can be optional. In some implementations, this element can be used only if the Operational Document is a Business Transaction Document and if the Operational Document is identical to the Operational Document Containing Business Object. The OperationalDocumentDate can be the date of the original document. The OperationalDocumentDate can be a GDT of type Date, can have a Qualifier of OperationalDocument, and in some implementations, can be optional. In some implementations, if the Operational Document has a document date, OperationalDocumentDate may be filled even if the original document date is the same as the AccountingBusinessTransactionDate. The AccountingBusinessTransactionDateTime can be the date and time of the business transaction, used to derive the posting date in Accounting. The AccountingBusinessTransactionDateTime can be a GDT of type DateTime, can have a Qualifier of Transaction, and in some implementations, can be optional. The AccountingBusinessTransactionDate can be the date of the business transaction, used to derive the posting date in Accounting. The AccountingBusinessTransactionDate can be a GDT of type Date, can have a Qualifier of Transaction, and in some implementations, can be optional. In some implementations, if the AccountingNotification is a CancellationAccountingNotification, either the AccountingBusinessTransactionDate element or the AccountingBusinessTransactionDateTime element may be filled (or neither), but not both. Otherwise, either AccountingBusinessTransactionDate or AccountingBusinessTransactionDateTime may be filled. In some implementations, if none of these elements are filled when the CancellationAccountingNotification is processed, the AccountingBusinessTransactionDate can be read. The default is the AccountingBusinessTransactionDate of the canceled operational document. The Note can be natural-language explanations or notes regarding the business transaction to which the notification refers. The Note can be a GDT of type SHORT_Note, and in some implementations, can be optional. The SystemAdministrativeData can indicate when and by whom the Accounting Notification was created. The SystemAdministrativeData can be a GDT of type SystemAdministrativeData, can have a Restriction of only CreationIdentityUUID, CreationDateTime, LastChangeIdentityUUID, and LastChangeDateTime. In some implementations, the SystemAdministrativeData can be optional. The ProcessingStatusCode can indicate the processing status of the Accounting Notification. The ProcessingStatusCode can be a GDT of type ProcessingStatusCode, and in some implementations, can be optional. The GeneralLedgerFunctionalUnitUUID can be a universally unique identification of a Functional Unit that is responsible for processing the Accounting Notification. The GeneralLedgerFunctionalUnitUUID can be a GDT of type UUID, and in some implementations, can be optional. In some implementations, the referenced Functional Unit can be responsible for the Organisational Function ‘GeneralLedger’, i.e. the OrganisationalFunctionCode on one of the FunctionalUnitAttributes nodes of the FunctionalUnit may have the value ‘19’ (GeneralLedger). The Key can be a structured business key of the AccountingNotification. The Key can be an IDT of type AccountingNotificationKey. The AccountingNotificationKey can include the following elements: OperationalDocumentReference, and OperationalDocumentTransactionUUID.

The following composition relationships to subordinate nodes can exist. AccessControlList 60264 has a cardinality relationship of 1:1. ProcessedSetOfBooks has a cardinality relationship of 1:cn. ItemGroup has a cardinality relationship of 1:cn. CancellationAccountingNotification has a cardinality relationship of 1:c. In some implementations, an AccountingNotification can have at least one ItemGroup unless it is a CancellationAccountingNotification, which has no ItemGroup.

The following Inbound Aggregation Relationships from business object Company/node Company may exist. Company has a cardinality relationship of 1:cn, and can be the company in which the business transaction occurred.

The following. Inbound Association Relationships from business object Identity/node Identity may exist. CreationIdentity has a cardinality relationship of 1:cn, and can be the system user Identity who created the Accounting Notification. LastChangeIdentity has a cardinality relationship of 1:cn, and can be the system user Identity who last changed the Accounting Notification.

The following Inbound Association Relationships from business object FunctionalUnit/node FunctionalUnit may exist. GeneralLedgerFunctionalUnit has a cardinality relationship of c:cn, and can be the Functional Unit that is responsible for processing the Accounting Notification.

The following Inbound Aggregation Relationships (cross DU) from business object GoodsAndServiceAcknowledgement/node GoodsAndServiceAcknowledgement may exist.

GoodsAndServiceAcknowledgement has a cardinality relationship of c:cn. In reference to the Original Entry Document, an AccountingNotification can be generated by a business transaction that was originally recorded in a GoodsAndServiceAcknowledgement.

The following Inbound Aggregation Relationships (cross DU) from business object GoodsAndActivityConfirmation/node GoodsAndActivityConfirmation may exist. GoodsAndActivityConfirmation has a cardinality relationship of c:cn. In reference to the Original Entry Document, an AccountingNotification can be generated by a business transaction that was originally recorded in a GoodsAndActivityConfirmation.

The following Inbound Aggregation Relationships (cross DU) from business object ProductionConfirmation/node ProductionConfirmation may exist. ProductionConfirmation has a cardinality relationship of c:cn. In reference to the Original Entry Document, an AccountingNotification can be generated by a business transaction that was originally recorded in a ProductionConfirmation.

The following Inbound Aggregation Relationships (cross DU) from business object ServiceConfirmation/node ServiceConfirmation may exist. ServiceConfirmation has a cardinality relationship of c:cn. In reference to the Original Entry Document, an AccountingNotification can be generated by a business transaction that was originally recorded in a ServiceConfirmation.

The following Inbound Aggregation Relationships (cross DU) from business object EmployeeTimeCalendar/node EmployeeTimeCalendar may exist. EmployeeTimeCalendar GeneralLedgerFunctionalUnitUUID has a cardinality relationship of c:cn. The EmployeeTimeCalendar can include the Operational Document.

The following Inbound Aggregation Relationships (cross DU) from business object EmployeeTimeCalendar/node PeriodItem may exist. EmployeeTimeCalendarPeriodItem has a cardinality relationship of c:cn. The EmployeeTimeCalendarPeriodItem can be a reference to a PeriodItem that serves as Operational Document for a business transaction in an EmployeeTimeCalendar.

The following Inbound Aggregation Relationships (cross DU) from business object SupplierInvoice/node SupplierInvoice may exist. SupplierInvoice has a cardinality relationship of c:cn. In reference to the Original Entry Document, an AccountingNotification can be generated by a business transaction that was originally recorded in a SupplierInvoice.

The following Inbound Aggregation Relationships (cross DU) from business object SiteLogisticsConfirmation/node SiteLogisticsConfirmation may exist. SiteLogisticsConfirmation has a cardinality relationship of c:cn. In reference to the Original Entry Document, an AccountingNotification can be generated by a business transaction that was originally recorded in a SiteLogisticsConfirmation.

The following Inbound Aggregation Relationships (cross DU) from business object CustomerInvoice/node CustomerInvoice may exist. CustomerInvoice has a cardinality relationship of c:cn. In reference to the Original Entry Document, an AccountingNotification can be generated by a business transaction that was originally recorded in a CustomerInvoice.

The following Inbound Aggregation Relationships (cross DU) from business object PaymentAllocation/node PaymentAllocation may exist. PaymentAllocation has a cardinality relationship of c:cn. The PaymentAllocation can be a reference to the PaymentAllocation that includes the Operational Document.

The following Inbound Aggregation Relationships (cross DU) from business object PaymentAllocation/node FinancialAuditTrailDocumentation may exist. PaymentAllocationFinancialAuditTrailDocumentation has a cardinality relationship of c:cn. The PaymentAllocationFinancialAuditTrailDocumentation can be a reference to a FinancialAuditTrailDocumentation that serves as Operational Document for a business transaction in a PaymentAllocation.

The following Inbound Aggregation Relationships (cross DU) from business object HouseBankStatement/node HouseBankStatement may exist. HouseBankStatement has a cardinality relationship of c:cn. The HouseBankStatement can be a reference to the HouseBankStatement that includes the Operational Document.

The following Inbound Aggregation Relationships (cross DU) from business object HouseBankStatement/node FinancialAuditTrailDocumentation may exist.

HouseBankStatementFinancialAuditTrailDocumentation has a cardinality relationship of c:cn. The HouseBankStatementFinancialAuditTrailDocumentation can be a reference to a FinancialAuditTrailDocumentation that serves as Operational Document for a business transaction in a HouseBankStatement.

The following Inbound Aggregation Relationships (cross DU) from business object PaymentOrder/node PaymentOrder may exist. PaymentOrder has a cardinality relationship of c:cn. The PaymentOrder can be a reference to the PaymentOrder that contains the Operational Document.

The following Inbound Aggregation Relationships (cross DU) from business object PaymentOrder/node FinancialAuditTrailDocumentation may exist. PaymentOrderFinancialAuditTrailDocumentation has a cardinality relationship of c:cn. The PaymentOrderFinancialAuditTrailDocumentation can be a reference to a FinancialAuditTrailDocumentation that serves as Operational Document for a business transaction in a PaymentOrder.

The following Inbound Aggregation Relationships (cross DU) from business object IncomingCheque/node IncomingCheque may exist. IncomingCheque has a cardinality relationship of c:cn. The IncomingCheque can be a reference to the IncomingCheque that includes the Operational Document.

The following Inbound Aggregation Relationships (cross DU) from business object IncomingCheque/node FinancialAuditTrailDocumentation may exist. IncomingChequeFinancialAuditTrailDocumentation as a cardinality relationship of c:cn. The IncomingChequeFinancialAuditTrailDocumentation can be a reference to a FinancialAuditTrailDocumentation that serves as Operational Document for a business transaction in an IncomingCheque.

The following Inbound Aggregation Relationships (cross DU) from business object CashPayment/node CashPayment may exist. CashPayment has a cardinality relationship of c:cn. The CashPayment can be a reference to the CashPayment that includes the Operational Document.

The following Inbound Aggregation Relationships (cross DU) from business object CashPayment/node FinancialAuditTrailDocumentation may exist. CashPaymentFinancialAuditTrailDocumentation has a cardinality relationship of c:cn. The CashPaymentFinancialAuditTrailDocumentation can be a reference to a FinancialAuditTrailDocumentation that serves as Operational Document for a business transaction in a CashPayment.

The following Inbound Aggregation Relationships (cross DU) from business object ChequeDeposit/node ChequeDeposit may exist. ChequeDeposit has a cardinality relationship of c:cn. The ChequeDeposit can be a reference to the ChequeDeposit that includes the Operational Document.

The following Inbound Aggregation Relationships (cross DU) from business object ChequeDeposit/node FinancialAuditTrailDocumentation may exist. ChequeDepositFinancialAuditTrailDocumentation has a cardinality relationship of c:cn. The ChequeDepositFinancialAuditTrailDocumentation can be a reference to a FinancialAuditTrailDocumentation that serves as Operational Document for a business transaction in a ChequeDeposit.

The following Inbound Aggregation Relationships (cross DU) from business object ProductTaxDeclaration/node ProductTaxDeclaration may exist. ProductTaxDeclaration has a cardinality relationship of c:cn. The ProductTaxDeclaration can be a reference to the ProductTaxDeclaration that includes the Operational Document.

The following Inbound Aggregation Relationships (cross DU) from business object ProductTaxDeclaration/node FinancialAuditTrailDocumentation may exist. ProductTaxDeclarationFinancialAuditTrailDocumentation has a cardinality relationship of c:cn. The ProductTaxDeclarationFinancialAuditTrailDocumentation can be a reference to a FinancialAuditTrailDocumentation that serves as Operational Document for a business transaction in a ProductTaxDeclaration.

The following Inbound Aggregation Relationships (cross DU) from business object DueClearing/node DueClearing may exist. DueClearing has a cardinality relationship of c:cn. The DueClearing can be a reference to the DueClearing that includes the Operational Document.

The following Inbound Aggregation Relationships (cross DU) from business object DueClearing/node FinancialAuditTrailDocumentation may exist. DueClearingFinancialAuditTrailDocumentation has a cardinality relationship of c:cn. The DueClearingFinancialAuditTrailDocumentation can be a reference to a FinancialAuditTrailDocumentation that serves as Operational Document for a business transaction in a DueClearing.

The following Inbound Aggregation Relationships (cross DU) from business object DuePayment/node DuePayment may exist. DuePayment has a cardinality relationship of c:cn. The DuePayment can be a reference to the DuePayment that includes the Operational Document.

The following Inbound Aggregation Relationships (cross DU) from business object DuePayment/node FinancialAuditTrailDocumentation may exist. DuePaymentFinancialAuditTrailDocumentation has a cardinality relationship of c:cn. The DuePaymentFinancialAuditTrailDocumentation can be a reference to a FinancialAuditTrailDocumentation that serves as Operational Document for a business transaction in a DuePayment.

The following Inbound Aggregation Relationships (cross DU) from business object Dunning/node Dunning may exist. Dunning has a cardinality relationship of c:cn. The Dunning can be a reference to the Dunning that includes the Operational Document.

The following Inbound Aggregation Relationships (cross DU) from business object Dunning/node FinancialAuditTrailDocumentation may exist. DunningFinancialAuditTrailDocumentation has a cardinality relationship of c:cn. The DunningFinancialAuditTrailDocumentation can be a reference to a FinancialAuditTrailDocumentation that serves as Operational Document for a business transaction in a Dunning.

The following Inbound Aggregation Relationships (cross DU) from business object ExpenseReport/node ExpenseReport may exist. ExpenseReport has a cardinality relationship of c:cn. The ExpenseReport can be a reference to the ExpenseReport that includes the Operational Document.

The following Inbound Aggregation Relationships (cross DU) from business object ExpenseReport/node SettlementResultPostingTransaction may exist. ExpenseReportSettlementResultPostingTransaction has a cardinality relationship of c:cn. The ExpenseReportSettlementResultPostingTransaction can be a reference to a ExpenseReportSettlementResultPostingTransaction that serves as Operational Document for a business transaction in a ExpenseReport. In some implementations, only one of the above relationships to an Operational Document can exist. If the Operational Document included in a Business Object is different from the Operational Document then the corresponding relationship to this Business Object can exist, also.

Actions for the AccountingNotification Business Object can include a Process, a ReprocessPending, a ProcessForNewSetOfBooks, and a MarkAsNotRelevant. The Process action can begin the processing of an AccountingNotification. As a precondition for the Process action, the ProcessingStatusCode can have the value Not Started. The Process can result in changes in the object, where the sets of books which are encountered during processing of the AccountingNotification can be added to the ProcessedSetOfBooks node. ItemGroupItem nodes may be added to the Accounting Notification. The Accounting Notification may be enriched with further data relevant for processing. The Process can result in changes in other objects. For example, if according to the relevant accounting principles, the business transaction represented in the AccountingNotification can be documented in Accounting, then AccountingDocuments can be generated. In this example line items (LineItem node) can be generated in the affected LedgerAccount BOs and any existing period total record (PeriodTotal node) and/or period balance record (PeriodBalance node) can be adjusted or a new one created. Relevant changes to process objects (e.g., Sales Order, Service Order, or Production Lot) can be reflected in the corresponding LedgerAccount BOs. The Process can result in changes in the status. For example, if the AccountingNotification is processed completely, the ProcessingStatusCode can be set to Finished, otherwise it can be set to In Process. The action elements for the Process can be defined by the data type: AccountingNotificationProcessActionElements. These elements can include a TaskRequiredIndicator. The TaskRequiredIndicator can indicate whether the creation of a BTM task may be required in case the AccountingNotification cannot be processed completely or not. The TaskRequiredIndicator can be a GDT of type Indicator, and can have a Qualifier of Required. The Process action can be used to trigger the processing of the business transaction represented in the AccountingNotification in order to create Accounting Documents and/or to create or update master data of process objects in Accounting.

The ReprocessPending action can restart the processing of a pending AccountingNotification that was not processed completely due to errors. As a precondition for the ReprocessPending action, the ProcessingStatusCode can have the value In Process. The ReprocessPending can result in changes in the object, where the Accounting Notification may be enriched with further data relevant for processing. The ReprocessPending can result in changes in other objects. For example, if, according to the relevant accounting principles, the business transaction represented in the AccountingNotification is to be documented in Accounting then AccountingDocuments are generated. In this example, line items (LineItem node) can be generated in the affected LedgerAccount BOs and any existing period total record (PeriodTotal node) and/or period balance record (PeriodBalance node) can be adjusted or a new one created. Relevant changes to process objects (e.g., Sales Order, Service Order, or Production Lot) can be reflected in the corresponding LedgerAccount BOs. The ReprocessPending can result in changes in the status. For example, if the AccountingNotification is processed completely, the ProcessingStatusCode can be set to Finished. The ReprocessPending action can be used to reprocess an AccountingNotification after correcting errors that prevented complete processing The action ProcessForNewSetOfBooks can start the processing of the AccountingNotification for a new set of books for which the AccountingNotification has not yet been processed. As a precondition for the ReprocessPending action, the ProcessingStatusCode has the value Finished. The ProcessForNewSetOfBooks can result in changes in the object, where, if a set of books is encountered during processing of the AccountingNotification that does not exist in the ProcessedSetOfBooks node, the new set of books can be added to that node. The ProcessForNewSetOfBooks can result in changes in other objects. For example, if a set of books is encountered during processing of the AccountingNotification that does not exist in the ProcessedSetOfBooks node, and the AccountingNotification can be processed successfully, the action generates AccountingDocuments. Line items (LineItem node) can be generated in the affected LedgerAccount BOs and any existing period total record (PeriodTotal node) and/or period balance record (PeriodBalance node) can be adjusted or a new one created. The ProcessForNewSetOfBooks can result in changes in the status. For example, if the AccountingNotification is processed completely, the ProcessingStatusCode can be set to Finished, otherwise it can be set to In Process. The ProcessForNewSetOfBooks action can be used to reprocess an AccountingNotification for a new set of books after that set of books is added.

The action MarkAsNotRelevant can mark an Accounting Notification as not relevant for processing in Accounting. As a precondition for the MarkAsNotRelevant action, the ProcessingStatusCode can have the value In Process. The MarkAsNotRelevant can result in changes in the status. For example, the status can be set to Not Relevant. The MarkAsNotRelevant action can be used if the information concerning an operational business transaction about which Accounting is notified by an Accounting Notification has become obsolete and if that Accounting Notification has not yet been processed completely in Accounting. This can be the case, for example, if the operational business transaction is cancelled, or if a reconciliation message concerning this operational business transaction is sent.

Queries can include a QueryByOperationalDocument, a QueryByProcessingStatus, and a QueryByOperationalObjectTypeAndDate. The QueryByOperationalDocument can get the AccountingNotification(s) generated from the operational document(s) specified by the parameters. The query elements for the QueryByOperationalDocument can be defined by the data type: AccountingNotificationOperationalDocumentQueryElements. These elements can include an OperationalDocumentUUID, an OperationalDocumentID, an OperationalDocumentFormattedID, an OperationalDocumentObjectTypeCode, an OperationalDocumentObjectNodeTypeCode, an OperationalDocumentTransactionUUID, an OperationalDocumentTransactionCounterValue, an ProcessingStatusCode, The OperationalDocumentUUID can be a GDT of type UUID, and in some implementations, can be optional. The OperationalDocumentID can be a GDT of type ObjectID, and in some implementations, can be optional. The OperationalDocumentFormattedID can be a GDT of type ObjectNodeFormattedID, and in some implementations, can be optional. The OperationalDocumentObjectTypeCode can be a GDT of type ObjectTypeCode, and in some implementations, can be optional. The OperationalDocumentObjectNodeTypeCode can be a GDT of type ObjectNodeTypeCode, and in some implementations, can be optional. The OperationalDocumentTransactionUUID can be a GDT of type UUID, and in some implementations, can be optional. The OperationalDocumentTransactionCounterValue can be a GDT of type CounterValue, and in some implementations, can be optional. The ProcessingStatusCode can be a GDT of type ProcessingStatusCode, and in some implementations, can be optional. In some implementations, one of the parameters OperationalDocumentUUID, OperationalDocumentID, and OperationalDocumentFormattedID may be supplied.

QueryByProcessingStatus can obtain a list of AccountingNotifications based on their ProcessingStatusCode. The query elements for the QueryByProcessingStatus can be defined by the data type of type AccountingNotification ProcessingStatusQueryElements. These elements can include a ProcessingStatusCode which can be a GDT of type ProcessingStatusCode.

QueryByOperationalObjectTypeAndDate can obtain a list of AccountingNotifications generated at the given date from Operational Documents of the given type within a company.

The QueryByOperationalObjectTypeAndDate query can be used by the Data Flow Verification function in order to select AccountingNotifications for the comparison with the corresponding operational objects. The query elements can be defined by the data type: AccountingNotificationOperationalDocumentTypeAndDateQueryElements. These elements can include a CompanyUUID, a CompanyID, an OperationalObjectTypeCode, and an AccountingBusinessTransactionDate. The CompanyUUID can be a GDT of type UUID, and in some implementations, can be optional. The CompanyID can be a GDT of type OrganisationalCentreID, and in some implementations, can be optional. The OperationalObjectTypeCode can be a GDT of type ObjectTypeCode. The AccountingBusinessTransactionDate can be a GDT of type Date, and can have a Qualifier of Transaction. In some implementations, one of the two parameters CompanyUUID and CompanyID can be supplied.

A DO: AccessControlList can be a list of access groups that have access to an Accounting Notification.

A ProcessedSetOfBooks can be a set of books for which the AccountingNotification was processed. In some implementations, when the AccountingNotification is processed, the system first determines the sets of books in which the business transaction is to be documented by AccountingDocuments. Regardless of whether it was possible to successfully create AccountingDocuments for these sets of books, the sets of books determined at the time of processing are recorded in the ProcessedSetOfBooks. This supports reprocessing of the AccountingNotification in cases where new sets of books are added later in which the business transaction is to be documented by AccountingDocuments. The elements located directly at the ProcessedSetOfBooks node AccountingNotification are can be defined by the AccountingNotificationProcessedSetOfBooksElements data type. These elements can include a SetOfBooksID, and a ProcessingCompletedIndicator. The SetOfBooksID can be a set of books for which the AccountingNotification was processed. The SetOfBooksID can be a GDT of type SetOfBooksID. The ProcessingCompletedIndicator can indicate whether the processing of the AccountingNotification is completed for the set of books or not. The ProcessingCompletedIndicator can be a GDT of type Indicator, and can have a Qualifier of Completed.

The following Inbound Aggregation Relationships from business object SetOfBooks/node SetOfBooks may exist. SetOfBooks can be the set of books for which the AccountingNotification was processed. SetOfBooksID has a cardinality relationship of 1:cn.

An ItemGroup can be a group of ItemGroupItems in an AccountingNotification based on the criteria of Accounting. In some implementations, the grouping can be based on the following characteristics common to the ItemGroupItems: type of business transaction represented by the ItemGroupItems, assignment of an Accounting Coding Block Distribution, and assignment of Preceding Operational Document References. The elements located directly at the ItemGroup node can be defined by the AccountingNotificationItemGroupElements data type. These elements can include an UUID, an AccountingBusinessTransactionTypeCode, a BusinessProcessVariantTypeCode, and a BusinessTransactionCurrencyCode. The UUID can be a universally unique identification of an Item Group. The UUID can be a GDT of type UUID. The AccountingBusinessTransactionTypeCode can be a coded representation of the type of business transaction represented by the ItemGroupItems. The AccountingBusinessTransactionTypeCode can be a GDT of type AccountingBusinessTransactionTypeCode, and in some implementations, can be optional.

The BusinessProcessVariantTypeCode can be a process variant of the process component that transmitted the business transaction to Accounting. The BusinessProcessVariantTypeCode can be a GDT of type BusinessProcessVariantTypeCode, and in some implementations, can be optional. The BusinessTransactionCurrencyCode can be a coded representation of the transaction currency of the business transaction represented by the ItemGroupItems. The BusinessTransactionCurrencyCode can be a GDT of type CurrencyCode, can have a Qualifier of Transaction, and in some implementations, can be optional.

The following composition relationships to subordinate nodes may exist. ItemGroupItem has a cardinality relationship of 1:n. ItemGroupAccountingCodingBlockDistribution

60258 has a cardinality relationship of 1:c. ItemGroupPrecedingOperationalDocumentReference 60260 has a cardinality relationship of 1:cn.

ItemGroupAccountingCodingBlockDistribution (DO) can be, for an ItemGroup, an ItemGroupAccountingCodingBlockDistribution that can determine which business objects (such as cost centers or sales orders) to assign the costs or revenues to that result from quantity and value changes in the ItemGroupItems in the ItemGroup. In some implementations, if an ItemGroupAccountingCodingBlockDistribution exists, an ItemGroupItemAccountingCodingBlockDistribution may not exist at the item level at the same time. In some implementations, the ItemGroupAccountingCodingBlockDistribution node can be represented by the Dependent Object AccountingCodingBlockDistribution.

An ItemGroupPrecedingOperationalDocumentReference can be a reference to an operational document, or an item in an operational document, which precedes the items belonging to the ItemGroup and that can include information necessary for the processing of those ItemGroupItems in Accounting. The elements located directly at the ItemGroupPrecedingOperationalDocumentReference node can be defined by the AccountingNotificationItemGroupPrecedingOperationalDocumentReferenceElements data type. These elements can include a PrecedingOperationalDocumentContainingBusinessObjectReference, a PrecedingOperationalDocumentReference, and a PrecedingOperationalDocumentItemReference. The PrecedingOperationalDocumentContainingBusinessObjectReference can be a reference to a Business Object in an operational business area outside Financial Accounting including the Operational Document which precedes the items belonging to the ItemGroup. The PrecedingOperationalDocumentContainingBusinessObjectReference can be a GDT of type ObjectNodeReference. The PrecedingOperationalDocumentReference can be a reference to the Operational Document which precedes the items belonging to the ItemGroup. The PrecedingOperationalDocumentReference can be a GDT of type ObjectNodeReference. In some implementations, if the preceding Operational Business Object is identical to the preceding Operational Document, only the PrecedingOperationalDocumentReference needs to be supplied in the Accounting Notification messages and the PrecedingOperationalDocumentContainingBusinessObjectReference can be derived from the PrecedingOperationalDocumentReference. The PrecedingOperationalDocumentItemReference can be a reference to an item in the Preceding Operational Document which precedes the items belonging to the ItemGroup. The PrecedingOperationalDocumentItemReference can be a GDT of type ObjectNodeReference, and in some implementations, can be optional.

The following Inbound Aggregation Relationships (cross DU) from business object PurchaseOrder/node Item may exist. PurchaseOrderItem has a cardinality relationship of c:cn.

The PurchaseOrderItem can include the information needed to update the AccountingNotification.

The following Inbound Aggregation Relationships (cross DU) from business object PurchaseOrder/node PurchaseOrder may exist. PurchaseOrder has a cardinality relationship of c:cn. The PurchaseOrder can include the information needed to update the AccountingNotification.

The following Inbound Aggregation Relationships (cross DU) from business object PurchasingContract/node Item may exist. PurchasingContractItem has a cardinality relationship of c:cn. The PurchasingContractItem can include the information needed to update the AccountingNotification.

The following Inbound Aggregation Relationships (cross DU) from business object PurchasingContract/node PurchasingContract may exist. PurchasingContract has a cardinality relationship of c:cn. The PurchasingContract can include the information needed to update the AccountingNotification.

The following Inbound Aggregation Relationships (cross DU) from business object SalesOrder/node Item may exist. SalesOrderItem has a cardinality relationship of c:cn. The SalesOrderItem can include the information needed to update the AccountingNotification.

The following Inbound Aggregation Relationships (cross DU) from business object SalesOrder/node SalesOrder may exist. SalesOrder has a cardinality relationship of c:cn. The SalesOrder can include the information needed to update the AccountingNotification.

The following Inbound Aggregation Relationships (cross DU) from business object SalesContract/node Item may exist. SalesContractItem has a cardinality relationship of c:cn. The SalesContractItem can include the information needed to update the AccountingNotification.

The following Inbound Aggregation Relationships (cross DU) from business object SalesContract/node SalesContract may exist. SalesContract has a cardinality relationship of c:cn. The SalesContract can include the information needed to update the AccountingNotification.

The following Inbound Aggregation Relationships (cross DU) from business object ServiceOrder/node Item may exist. ServiceOrderItem has a cardinality relationship of c:cn. The ServiceOrderItem can include the information needed to update the AccountingNotification.

The following Inbound Aggregation Relationships (cross DU) from business object ServiceOrder/node ServiceOrder may exist. ServiceOrder has a cardinality relationship of c:cn. The ServiceOrder can include the information needed to update the AccountingNotification.

The following Inbound Aggregation Relationships (cross DU) from business object ServiceContract/node Item may exist. ServiceContractItem has a cardinality relationship of c:cn. The ServiceContractItem can include the information needed to update the AccountingNotification.

The following Inbound Aggregation Relationships (cross DU) from business object ServiceContract/node ServiceContract may exist. ServiceContract has a cardinality relationship of c:cn. The ServiceContract can include the information needed to update the AccountingNotification.

The following Inbound Aggregation Relationships (cross DU) from business object ServiceRequest/node Item may exist. ServiceRequestItem has a cardinality relationship of c:cn. The ServiceRequestItem can include the information needed to update the AccountingNotification.

The following Inbound Aggregation Relationships (cross DU) from business object ServiceRequest/node ServiceRequest may exist. ServiceRequest has a cardinality relationship of c:cn. The ServiceRequest can include the information needed to update the AccountingNotification.

The following Inbound Aggregation Relationships (cross DU) from business object ServiceConfirmation/node CustomerSparePartConfirmationItem may exist. ServiceConfirmationCustomerSparePartConfirmationItem has a cardinality relationship of c:cn. The ServiceConfirmationCustomerSparePartConfirmationItem can include the information needed to update the AccountingNotification.

The following Inbound Aggregation Relationships (cross DU) from business object ServiceConfirmation/node CustomerService ConfirmationItem may exist. ServiceConfirmationCustomerService ConfirmationItem has a cardinality relationship of c:cn. The ServiceConfirmationCustomerService ConfirmationItem can include the information needed to update the AccountingNotification.

The following Inbound Aggregation Relationships (cross DU) from business object ServiceConfirmation/node ServiceConfirmation may exist. ServiceConfirmation has a cardinality relationship of c:cn. The ServiceConfirmation can include the information needed to update the AccountingNotification.

The following Inbound Aggregation Relationships (cross DU) from business object CustomerComplaint/node Item may exist. CustomerComplaintItem has a cardinality relationship of c:cn. The CustomerComplaintItem can include the information needed to update the AccountingNotification.

The following Inbound Aggregation Relationships (cross DU) from business object CustomerComplaint/node CustomerComplaint may exist.CustomerComplaint has a cardinality relationship of c:cn. The CustomerComplaint can include the information needed to update the AccountingNotification.

The following Inbound Aggregation Relationships (cross DU) from business object GoodsAndServiceAcknowledgement/node Item may exist. GoodsAndServiceAcknowledgementItem has a cardinality relationship of c:cn. The GoodsAndServiceAcknowledgementItem can include the information needed to update the AccountingNotification.

The following Inbound Aggregation Relationships (cross DU) from business object ConfirmedInboundDelivery/node Item may exist. ConfirmedInboundDelivery Item has a cardinality relationship of c:cn. The ConfirmedInboundDeliveryItem can include the information needed to update the AccountingNotification.

The following Inbound Aggregation Relationships (cross DU) from business object InboundDelivery/node ReturnItem may exist. InboundDeliveryReturnItem has a cardinality relationship of c:cn. The InboundDeliveryReturnItem can include the information needed to update the AccountingNotification. In some implementations, a maximum of one of the above relationships may exist.

An ItemGroupItem can be structured information in an ItemGroup that can be based on the classification criteria of Accounting and that originates from an item in the operational document. An ItemGroupItem can occur in the following complete/disjoint specializations: ItemGroupMaterialItem 60244, ItemGroupServiceItem 60246, ItemGroupProductionItem 60282, ItemGroupPurchasingItem 60248, ItemGroupSalesItem 60272, ItemGroupDueItem 60284, ItemGroupTaxItem 60250, ItemGroupCashItem 60254, ItemGroupExpenseAndIncomeItem 60270, and ItemGroupProjectItem 60286.

The ItemGroupItem can represent a receipt or issue of materials (including individual materials). The ItemGroupItem can represent the provision of a service. The ItemGroupItem can refer to the production process. The ItemGroupItem can refer to the purchasing process. The ItemGroupItem can refer to the sales process. The ItemGroupItem can represent the increase or decrease of an individual payable or receivable due to or from a business partner and for which a complete itemization is required in accounting. The ItemGroupItem can represent the increase or decrease of a receivable or payable from purchase tax and/or sales tax. The ItemGroupItem can represent the inflow or outflow of cash. The ItemGroupItem can represent an expense or income item. The ItemGroupItem can represent the creation of or change to a project.

The elements located directly at the ItemGroupItem node-AccountingNotification can be defined by the AccountingNotificationItemGroupItemElements data type. These elements can include an UUID, an OperationalDocumentItemReference, a TypeCode, an OperationalDocumentItemTypeCode, an OrderItemReference, a Note, a ParentOperationalDocumentItemUUID, a MainIndicator, a PropertyMovementDirectionCode, a ValuationQuantity, a ValuationQuantityTypeCode, an EntryQuantity, an EntryQuantityTypeCode, a BusinessTransactionCurrencyAmount, a LocalCurrencyAmount, a SetOfBooksCurrencyAmount, a HardCurrencyAmount, and an IndexBasedCurrencyAmount. The UUID can be a universally unique identification of an Item Group Item. The UUID can be a GDT of type UUID. The OperationalDocumentItemReference can be a reference to the item in the operational document that caused a change in quantity or value, or that was created new or changed. The OperationalDocumentItemReference can be a GDT of type ObjectNodeReference, and in some implementations, can be optional. The TypeCode can be the type of an ItemGroupItem. The TypeCode can be a GDT of type ObjectNodeTypeCode, can have Restrictions of only the values representing the specializations of the node ItemGroupItem (shown above) may occur. The OperationalDocumentItemTypeCode can be the type of the item in the operational document to which the ItemGroupItem refers. For example, if the referenced operational document item is a Supplier Invoice Item, the item type can be Invoice Item or Credit Memo Item. The OperationalDocumentItemTypeCode can be a GDT of type BusinessTransactionDocumentItemTypeCode, and in some implementations, can be optional. In some implementations, this element can be used only if the Operational Document is a Business Transaction Document. The OrderItemReference can be a reference to an item in the Operational Document that is classified—from the Financial Accounting point of view—as an Order. The OrderItemReference can be a GDT of type ObjectNodeReference, can have a Qualifier of OrderItem, and in some implementations, can be optional. In some implementations, this reference may be required only if the OperationalDocumentContainingBusinessObject originates in DueManagement and in Payment that use Financial AuditTrailDocumentations. In this implementations, the reference to the item of the FinancialAuditTrailDocumentation can be represented by the OperationalDocumentItemReference. An additional reference to an item of the BusinessObject that is—from the Financial Accounting point of view—classified as an order to that confirmations will follow can be required (e.g DuePaymentItem). The Note can be a natural-language explanations or notes on the line item of the original document to which the ItemGroupItem refers. The Note can be a GDT of type SHORT_Note, and in some implementations, can be optional. The ParentOperationalDocumentItemUUID can be a universally unique identification of the item with which the current item stands in a parent-child relationship. The ParentOperationalDocumentItemUUID can be a GDT of type UUID, and in some implementations, can be optional. The MainIndicator can indicate the ItemGroupItem that can be regarded as the main item and therefore as the offsetting item for all other ItemGroupItems within the ItemGroup. The MainIndicator can be a GDT of type Indicator, can have a Qualifier of Main, and in some implementations, can be optional. In some implementations, the MainIndicator can be set on only one of the ItemGroupItems in each ItemGroup. The PropertyMovementDirectionCode can be a coded representation of the direction of movement of a property if the ItemGroupItem describes a property movement. The PropertyMovementDirectionCode can be a GDT of type PropertyMovementDirectionCode, and in some implementations, can be optional. The ValuationQuantity can be a quantity, in the valuation unit, of the change represented by the ItemGroupItem. The ValuationQuantity can be a GDT of type Quantity, can have a Qualifier of Valuation, and in some implementations, can be optional. The ValuationQuantityTypeCode can be a coded representation of the type of the valuation quantity. The ValuationQuantityTypeCode can be a GDT of type QuantityTypeCode, and in some implementations, can be optional. In some implementations, the element can be filled if the element ValuationQuantity is filled. The EntryQuantity can be a quantity, in the unit which was entered or given, of the change represented by the ItemGroupItem. In some implementations, this quantity is not a result of a quantity conversion. The EntryQuantity can be a GDT of type Quantity, can have a Qualifier of Entry, and in some implementations, can be optional. The EntryQuantityTypeCode can be a coded representation of the type of the entry quantity. The EntryQuantityTypeCode can be a GDT of type QuantityTypeCode, and in some implementations, can be optional. In some implementations, the element can be filled if the element EntryQuantity is filled. The BusinessTransactionCurrencyAmount can be a value in business transaction currency of the change represented by the ItemGroupItem. The BusinessTransactionCurrencyAmount can be a GDT of type Amount, can have a Qualifier of TransactionCurrency, and in some implementations, can be optional.

In some implementations, the following elements are used only if legacy data from a system is imported. In this implementation, the element LocalCurrencyAmount is filled. LocalCurrencyAmount can specify, in the local currency of the company, the value represented by the ItemGroupItem. The LocalCurrencyAmount can be a GDT of type Amount, can have a Qualifier of LocalCurrency, and in some implementations, can be optional. SetOfBooksCurrencyAmount can specify, in the additional currency selected for the set of books, the value represented by the ItemGroupItem. The SetOfBooksCurrencyAmount can be a GDT of type Amount, can have aQualifier of SetOfBooksCurrency, and in some implementations, can be optional. HardCurrencyAmount can specify, in the hard currency of the country of the company, the value represented by the ItemGroupItem. The HardCurrencyAmount can be a GDT of type Amount, can have a Qualifier of HardCurrency, and in some implementations, can be optional. IndexBasedCurrencyAmount can specify, in the index currency of the country of the company, the value represented by the ItemGroupItem. The IndexBasedCurrencyAmount can be a GDT of type Amount, can have a Qualifier of IndexBasedCurrency, and in some implementations, can be optional.

The following composition relationships to subordinate nodes may exist. ItemGroupMaterialItem has a cardinality relationship of 1:c. ItemGroupServiceItem has a cardinality relationship of 1:c. ItemGroupProductionItem has a cardinality relationship of 1:c. ItemGroupCashItem has a cardinality relationship of 1:c. ItemGroupTaxItem has a cardinality relationship of 1:c. ItemGroupPurchasingItem has a cardinality relationship of 1:c. ItemGroupSalesItem has a cardinality relationship of 1:c. ItemGroupDueItem has a cardinality relationship of 1:c. ItemGroupProjectItem has a cardinality relationship of 1:c. ItemGroupExpenseAndIncomeItem has a cardinality relationship of 1:c. ItemGroupItemAccountingCodingBlockDistribution has a cardinality relationship of 1:c. ItemGroupItemPrecedingOperationalDocumentReference 60256 has a cardinality relationship of 1:cn.

The following Inbound Aggregation Relationships (cross DU) from business object GoodsAndServiceAcknowledgement/node Item may exist. GoodsAndServiceAcknowledgementItem has a cardinality relationship of c:cn. In reference to the item of the Operational Document, an AccountingNotification can be generated by a business transaction that was originally recorded in a GoodsAndServiceAcknowledgementItem.

The following Inbound Aggregation Relationships (cross DU) from business object GoodsAndActivityConfirmation/node InventoryChangeItem may exist. GoodsAndActivityConfirmationInventoryChangeItem has a cardinality relationship of c:cn. In reference to the item of the Operational Document, an AccountingNotification can be generated by a business transaction that was originally recorded in a GoodsAndActivityConfirmationInventoryChangeItem.

The following Inbound Aggregation Relationships (cross DU) from business object ProductionConfirmation/node InventoryChangeItem may exist. ProductionConfirmationInventoryChangeItem has a cardinality relationship of c:cn. In reference to the item of the Operational Document, an AccountingNotification can be generated by a business transaction that was originally recorded in a ProductionConfirmationInventoryChangeItem.

The following Inbound Aggregation Relationships (cross DU) from business object ProductionConfirmation/node ResourceUtilisationItem may exist. ProductionConfirmation ResourceUtilisationItem has a cardinality relationship of c:cn. In reference to the item of the Operational Document, an AccountingNotification can be generated by a business transaction that was originally recorded in a ProductionConfirmation ResourceUtilisationItem.

The following Inbound Aggregation Relationships (cross DU) from business object ServiceConfirmation/node CustomerSparePartConfirmationItem may exist. ServiceConfirmationCustomerSparePartConfirmationItem has a cardinality relationship of c:cn. In reference to the item of the Operational Document, an AccountingNotification can be generated by a business transaction that was originally recorded in a ServiceConfirmationCustomerSparePartConfirmationItem.

The following Inbound Aggregation Relationships (cross DU) from business object ServiceConfirmation/node CustomerServiceConfirmationItem may exist. ServiceConfirmationCustomerService ConfirmationItem has a cardinality relationship of c:cn. In reference to the item of the Operational Document, an AccountingNotification can be generated by a business transaction that was originally recorded in a ServiceConfirmationCustomerService ConfirmationItem.

The following Inbound Aggregation Relationships (cross DU) from business object SupplierInvoice/node Item may exist. SupplierInvoiceItem has a cardinality relationship of c:cn. In reference to the item of the Operational Document, an AccountingNotification can be generated by a business transaction that was originally recorded in a SupplierInvoiceItem.

The following Inbound Aggregation Relationships (cross DU) from business object SiteLogisticsConfirmation/node InventoryChangeItem may exist. SiteLogisticsConfirmationInventoryChangeItem has a cardinality relationship of c:cn. In reference to the item of the Operational Document, an AccountingNotification can be generated by a business transaction that was originally recorded in a SiteLogisticsConfirmationInventoryChangeItem.

The following Inbound Aggregation Relationships (cross DU) from business object CustomerInvoice/node Item may exist. CustomerInvoiceItem has a cardinality relationship of c:cn. In reference to the item of the Operational Document, an AccountingNotification can be generated by a business transaction that was originally recorded in a CustomerInvoiceItem.

The following Inbound Aggregation Relationships (cross DU) from business object ExpenseReport/node SettlementResultPostingTransactionExpenseItem may exist. ExpenseReportSettlementResultPostingTransactionExpenseItem has a cardinality relationship of c:cn. In reference to the item of the Operational Document, an AccountingNotification can be generated by a business transaction that was originally recorded in an ExpenseReportSettlementResultPostingTransactionExpenseItem. In some implementations, only one of the above relationships may exist.

The following Inbound Association Relationships (cross DU) from business object DueClearing/node Item may exist. DueClearingItem has a cardinality relationship of c:cn. DueClearingItem can be a reference to an item of DueClearing which acts—from the Financial Accounting point of view—as an order item.

The following Inbound Association Relationships (cross DU) from business object DuePayment/node Item may exist. DuePaymentItem has a cardinality relationship of c:cn. The DuePaymentItem can be a reference to an item of DuePayment which acts—from the Financial Accounting point of view—as an order item.

The following Inbound Association Relationships (cross DU) from business object HouseBankStatement/node Item may exist. HouseBankStatementItem has a cardinality relationship of c:cn. The HouseBankStatementItem can be a reference to an item of HouseBankStatement which acts—from the Financial Accounting point of view—as an order item.

The following Inbound Association Relationships (cross DU) from business object PaymentOrder/node SplitItem may exist. PaymentOrderSplitItem has a cardinality relationship of c:cn. The PaymentOrderSplitItem can be a reference to an item of PaymentOrder which acts—from the Financial Accounting point of view—as an order item.

The following Inbound Association Relationships (cross DU) from business object PaymentAllocation/node Item may exist. PaymentAllocationItem has a cardinality relationship of c:cn. The PaymentAllocationItem can be a reference to an item of PaymentAllocation which acts from the Financial Accounting point of view—as an order item.

The following Inbound Association Relationships (cross DU) from business object ChequeDeposit/node Cheque may exist. ChequeDepositCheque has a cardinality relationship of c:cn. The ChequeDepositCheque can be a reference to an item of ChequeDeposit which acts—from the Financial Accounting point of view—as an order item.

The following Inbound Association Relationships (cross DU) from business object ProductTaxDeclaration/node Item may exist. ProductTaxDeclarationItem has a cardinality relationship of c:cn. The ProductTaxDeclarationItem can be a reference to an item of ProductTaxDeclaration which acts—from the Financial Accounting point of view—as an order item.

The following Inbound Association Relationships (cross DU) from business object Dunning/node Item may exist. DunningItem has a cardinality relationship of c:cn. The DunningItem can be a reference to an item of Dunning which acts—from the Financial Accounting point of view—as an order item. In some implementations, only one of the above relationships may exist.

Associations for navigation from business object AccountingDocument/node Item may include an AccountingDocumentItem. The AccountingDocumentItem has a cardinality relationship of cn:c. The AccountingDocumentItem can be a reference to the Items in an Accounting Document in which the ItemGroupItem is recorded in Accounting.

For an ItemGroupItem, an ItemGroupItemAccountingCodingBlockDistribution (DO) 60288 can determine which business objects (e.g., cost centers or sales orders) to assign the costs or revenues to that result from quantity and value changes in the ItemGroupItem. In some implementations, if an ItemGroupAccountingCodingBlockDistribution exists, an ItemGroupItemAccountingCodingBlockDistribution may not exist at the same time.

In some implementations, the ItemGroupItemAccountingCodingBlockDistribution node can be represented by the Dependent Object AccountingCodingBlockDistribution.

An ItemGroupItemPrecedingOperationalDocumentReference can be a reference to an Operational Document, or an item in an Operational Document, that preceded the ItemGroupItem and that contains the information necessary for the processing of the ItemGroupItem. The elements located directly at the ItemGroupItemPrecedingOperationalDocumentReference node can be defined by the AccountingNotificationItemGroupItemPrecedingOperationalDocumentReferenceElements data type. These elements can include a PrecedingOperationalDocumentContainingBusinessObjectReference, a PrecedingOperationalDocumentReference, and a PrecedingOperationalDocumentItemReference. The PrecedingOperationalDocumentContainingBusinessObjectReference can be a reference to a Business Object in an operational business area outside Financial Accounting containing the Operational Document which precedes the ItemGroupItem. The PrecedingOperationalDocumentContainingBusinessObjectReference can be a GDT of type ObjectNodeReference. The PrecedingOperationalDocumentReference can be a reference to the Operational Document which precedes the ItemGroupItem. The PrecedingOperationalDocumentReference can be a GDT of type ObjectNodeReference. In some implementations, if the preceding Operational Business Object is identical to the preceding Operational Document, only the PrecedingOperationalDocumentReference may be supplied in the Accounting Notification messages and the PrecedingOperationalDocumentContainingBusinessObjectReference can be derived from the PrecedingOperationalDocumentReference. The PrecedingOperationalDocumentItemReference can be a reference to an item in the Preceding Operational Document which precedes the ItemGroupItem. The PrecedingOperationalDocumentItemReference can be a GDT of type ObjectNodeReference, and in some implementations, can be optional.

The following Inbound Aggregation Relationships (cross DU) from business object PurchaseOrder/node Item may exist. PurchaseOrderItem has a cardinality relationship of c:cn.

The PurchaseOrderItem can include the information needed to update the AccountingNotification.

The following Inbound Aggregation Relationships (cross DU) from business object PurchaseOrder/node PurchaseOrder may exist. PurchaseOrder has a cardinality relationship of c:cn. The PurchaseOrder can include the information needed to update the AccountingNotification.

The following Inbound Aggregation Relationships (cross DU) from business object PurchasingContract/node Item may exist. PurchasingContractItem has a cardinality relationship of c:cn. The PurchasingContractItem can include the information needed to update the AccountingNotification.

The following Inbound Aggregation Relationships (cross DU) from business object PurchasingContract/node PurchasingContract may exist. PurchasingContract has a cardinality relationship of c:cn. The PurchasingContract can include the information needed to update the AccountingNotification.

The following Inbound Aggregation Relationships (cross DU) from business object SalesOrder/node Item may exist. SalesOrderItem has a cardinality relationship of c:cn. The SalesOrderItem can include the information needed to update the AccountingNotification.

The following Inbound Aggregation Relationships (cross DU) from business object SalesOrder/node SalesOrder may exist. SalesOrder has a cardinality relationship of c:cn. The SalesOrder can include the information needed to update the AccountingNotification.

The following Inbound Aggregation Relationships (cross DU) from business object SalesContract/node Item may exist. SalesContractItem has a cardinality relationship of c:cn. The SalesContractItem can include the information needed to update the AccountingNotification.

The following Inbound Aggregation Relationships (cross DU) from business object SalesContract/node SalesContract may exist. SalesContract has a cardinality relationship of c:cn. The SalesContract can include the information needed to update the AccountingNotification.

The following Inbound Aggregation Relationships (cross DU) from business object ServiceOrder/node Item may exist. ServiceOrderItem has a cardinality relationship of c:cn. The ServiceOrderItem can include the information needed to update the AccountingNotification.

The following Inbound Aggregation Relationships (cross DU) from business object ServiceOrder/node ServiceOrder may exist. ServiceOrder has a cardinality relationship of c:cn. The ServiceOrder can include the information needed to update the AccountingNotification.

The following Inbound Aggregation Relationships (cross DU) from business object ServiceContract/node Item may exist. ServiceContractItem has a cardinality relationship of c:cn. The ServiceContractItem can include the information needed to update the AccountingNotification.

The following Inbound Aggregation Relationships (cross DU) from business object ServiceContract/node ServiceContract may exist. ServiceContract has a cardinality relationship of c:cn. The ServiceContract can include the information needed to update the AccountingNotification.

The following Inbound Aggregation Relationships (cross DU) from business object ServiceRequest/node Item may exist. ServiceRequestItem has a cardinality relationship of c:cn. The ServiceRequestItem can include the information needed to update the AccountingNotification.

The following Inbound Aggregation Relationships (cross DU) from business object ServiceRequest/node ServiceRequest may exist. ServiceRequest has a cardinality relationship of c:cn. The ServiceRequest can include the information needed to update the AccountingNotification.

The following Inbound Aggregation Relationships (cross DU) from business object ServiceConfirmation/node CustomerSparePartConfirmationItem may exist. ServiceConfirmationCustomerSparePartConfirmationItem has a cardinality relationship of c:cn. The ServiceConfirmationCustomerSparePartConfirmationItem can include the information needed to update the AccountingNotification.

The following Inbound Aggregation Relationships (cross DU) from business object ServiceConfirmation/node CustomerService ConfirmationItem may exist. ServiceConfirmationCustomerService ConfirmationItem has a cardinality relationship of c:cn. The ServiceConfirmationCustomerService ConfirmationItem can include the information needed to update the AccountingNotification.

The following Inbound Aggregation Relationships (cross DU) from business object ServiceConfirmation/node ServiceConfirmation may exist. ServiceConfirmation has a cardinality relationship of c:cn. The ServiceConfirmation can include the information needed to update the AccountingNotification.

The following Inbound Aggregation Relationships (cross DU) from business object CustomerComplaint/node Item may exist. CustomerComplaintItem has a cardinality relationship of c:cn. The CustomerComplaintItem can include the information needed to update the AccountingNotification.

The following Inbound Aggregation Relationships (cross DU) from business object CustomerComplaint/node CustomerComplaint may exist.CustomerComplaint has a cardinality relationship of c:cn. The CustomerComplaint can include the information needed to update the AccountingNotification.

The following Inbound Aggregation Relationships (cross DU) from business object GoodsAndServiceAcknowledgement/node Item may exist. GoodsAndServiceAcknowledgementItem has a cardinality relationship of c:cn. The GoodsAndServiceAcknowledgementItem can include the information needed to update the AccountingNotification.

The following Inbound Aggregation Relationships (cross DU) from business object ConfirmedInboundDelivery/node Item may exist. ConfirmedInboundDelivery Item has a cardinality relationship of c:cn. The ConfirmedInboundDeliveryItem can include the information needed to update the AccountingNotification.

The following Inbound Aggregation Relationships (cross DU) from business object InboundDelivery/node ReturnItem may exist. InboundDeliveryReturnItem has a cardinality relationship of c:cn. The InboundDeliveryReturnItem can include the information needed to update the AccountingNotification. In some implementations, a maximum of one of the above relationships may exist.

An ItemGroupMaterialItem can be an ItemGroupItem that represents one receipt or issue of materials (including individual materials). The elements located directly at the ItemGroupMaterialItem nodeAccountingNotification can be defined by the AccountingNotificationItemGroupMaterialItemElements data type. These elements can include a PermanentEstablishmentUUID, a MaterialUUID, an IndividualMaterialUUID, a MaterialCategoryUUID, and an InventoryChangeReasonCode. The PermanentEstablishmentUUID can be an universally unique identifier of the permanent establishment at which the material was issued or received. The PermanentEstablishmentUUID can be a GDT of type UUID, and in some implementations, can be optional. The MaterialUUID can be an universally unique identifier of the material that was issued or received. The MaterialUUID can be a GDT of type UUID, and in some implementations, can be optional.

The IndividualMaterialUUID can be an universally unique identifier of the IndividualMaterial that was issued or received. The IndividualMaterialUUID can be a GDT of type UUID, and in some implementations, can be optional. The MaterialCategoryUUID can be an universally unique identifier of the MaterialCategory to which the material that was issued or received belongs. The MaterialCategoryUUID can be a GDT of type UUID, and in some implementations, can be optional. The InventoryChangeReasonCode can be a coded representation of the reason for an inventory change. The InventoryChangeReasonCode can be a GDT of type InventoryChangeReasonCode, and in some implementations, can be optional. In some implementations, only one of the elements MaterialUUID and IndividualMaterialUUID may be filled. In that implementation, the element PermanentEstablishmentUUID may be filled. Otherwise, if none of the two is filled, the element MaterialCategoryUUID may be filled.

The following Inbound Aggregation Relationships from business object PermanentEstablishment/node PermanentEstablishment may exist. PermanentEstablishment has a cardinality relationship of c:cn. The PermanentEstablishment can indicate the permanent establishment at which the material was issued or received.

The following Inbound Aggregation Relationships from business object ProductCategoryHierarchy/node ProductCategory may exist. ProductCategoryHierarchyProductCategory has a cardinality relationship of c:cn. The ProductCategoryHierarchyProductCategory can denote the ProductCategory to which the ItemGroupMaterialItem refers.

The following Inbound Aggregation Relationships from business object Material/node Material may exist. Material has a cardinality relationship of c:cn. The Material can be the material to which the business transaction relates.

The following Inbound Aggregation Relationships from business object IndividualMaterial/node IndividualMaterial may exist. IndividualMaterial has a cardinality relationship of c:cn. The IndividualMaterial can denote the IndividualMaterial to which the business transaction refers. In some implementations, only one of the associations to the business objects Material and IndividualMaterial may exist. In that implementation, the association to the business object PermanentEstablishment may exist. Otherwise, if none of the two exists, the association to the BO ProductCategoryHierarchy may exist.

An ItemGroupServiceItem can be an ItemGroupItem that represents a change in quantity or value that is directly connected with the provision of an internal or external service. The elements located directly at the ItemGroupServiceItem node can be defined by the AccountingNotificationItemGroupServiceItemElements data type. These elements can include a ServiceProductUUID, a ServiceProductCategoryUUID, a ResourceUUID, a ServiceWorkingConditionsCode, a ServiceProductQuantity, a ServiceProductQuantityTypeCode, a ResourceQuantity, and a ResourceQuantityTypeCode. ServiceProductUUID can be a universally unique identifier of the service (ServiceProduct) that was provided. The ServiceProductUUID can be a GDT of type UUID, and in some implementations, can be optional. ServiceProductCategoryUUID can be a universally unique identifier of the MaterialCategory to which the material that was issued or received belongs. The ServiceProductCategoryUUID can be a GDT of type ProductCategoryUUID, and in some implementations, can be optional. ResourceUUID can be a universally unique identifier of the Resource that provided the service. The ResourceUUID can be a GDT of type UUID, and in some implementations, can be optional. ServiceWorkingConditionsCode can indicate the working conditions under which the service was provided. The ServiceWorkingConditionsCode can be a GDT of type ServiceWorkingConditionsCode, and in some implementations, can be optional. The ServiceProductQuantity can be a quantity of the ServiceProduct in the unit of the ServiceProduct provided. The ServiceProductQuantity can be a GDT of type Quantity, can have a Qualifier of Service, and in some implementations, can be optional. ServiceProductQuantityTypeCode can be a coded representation of the type of the service product quantity. The ServiceProductQuantityTypeCode can be a GDT of type QuantityTypeCode, and in some implementations, can be optional. In some implementations, the element may be filled if the element ServiceProductQuantity is filled. ResourceQuantity can be a quantity of the resource consumed, in the unit of the resource, that was required to provide the service (ServiceProduct). The ResourceQuantity can be a GDT of type Quantity, can have a Qualifier of Resource, and in some implementations, can be optional. ResourceQuantityTypeCode can be a coded representation of the type of the resource quantity. The ResourceQuantityTypeCode can be a GDT of type QuantityTypeCode, and in some implementations, can be optional. In some implementations, the element may be filled if the element ResourceQuantity is filled.

In some implementations, in the case of an internal service provision, all elements with the exception of the elements ServiceProductCategoryUUID and ServiceWorkingConditionsCode are mandatory.

The following Inbound Aggregation Relationships from business object ServiceProduct/node ServiceProduct may exist. ServiceProduct has a cardinality relationship of c:cn. The ServiceProduct can denote the ServiceProduct to which the business transaction refers.

The following Inbound Aggregation Relationships from business object ProductCategoryHierarchy/node ProductCategory may exist. ProductCategoryHierarchyProductCategory has a cardinality relationship of c:cn. The ProductCategoryHierarchyProductCategory can denote the ProductCategory to which the business transaction refers. In some implementations, in the case of an internal service provision, the following Inbound Aggregation Relationships from business object Resource/node Resource may exist. Resource has a cardinality relationship of c:cn. The Resource can denote the Resource that provided the service.

An ItemGroupProductionItem can be an ItemGroupItem that shows that a logistical process in production was executed, or that an operation was confirmed, or a ProductionLot was created or changed. The elements located directly at the AccountingNotificationItemGroupProductionItem node can be defined by the AccountingNotificationItemGroupProductionItemElements data type. These elements can include a LogisticsExecutionFunctionalUnitUUID, a LifeCycleStatusCode, and a LifeCycleStatusChangeDate. LogisticsExecutionFunctionalUnitUUID can be the logistics execution functional unit to which the business transaction is assigned. The LogisticsExecutionFunctionalUnitUUID can be a GDT of type UUID, and in some implementations, can be optional. LifeCycleStatusCode can be the status of the Production Lot (initial, released, started, finished, closed). The LifeCycleStatusCode can be a GDT of type LifeCycleStatusCode, and in some implementations, can be optional. LifeCycleStatusChangeDate can be a date on which the status was changed. The LifeCycleStatusChangeDate can be a GDT of type Date, and in some implementations, can be optional.

The following composition relationships to subordinate nodes may exist. ItemGroupProductionItemMaterialOutput 60276 can have a cardinality relationship of 1:cn.

The following Inbound Aggregation Relationships from business object FunctionalUnit/node FunctionalUnit may exist. LogisticsExecutionFunctionalUnit has a cardinality relationship of c:cn. The LogisticsExecutionFunctionalUnit can be the logistics execution functional unit to which the business transaction is assigned. In some implementations, the FunctionalUnitTypeCode element in the FunctionalUnitAttributes node of the referenced FunctionalUnit may have the value "13" (LogisticsExecution).

An ItemGroupProductionItemMaterialOutput can establish, for an ItemGroupProductionItem, which materials are manufactured in the ProductionLot. The elements located directly at the ItemGroupProductionItemMaterialOutput node can be defined by the AccountingNotificationItemGroupProductionItemMaterialOutputElements data type. These elements can include a PermanentEstablishmentUUID, a MaterialUUID, a MaterialRoleCode, an ExpectedQuantity, and an ExpectedQuantityTypeCode. PermanentEstablishmentUUID can be an universally unique identifier of the permanent establishment at which the material is manufactured. The PermanentEstablishmentUUID can be a GDT of type UUID. MaterialUUID can be an universally unique identifier of the material manufactured in the ProductionLot. The MaterialUUID can be a GDT of type UUID. MaterialRoleCode can be the code indicating the role of a material. It can provide information such as whether the material is a by-product or a joint product. The MaterialRoleCode can be a GDT of MaterialRoleCode, and in some implementations, can be optional. ExpectedQuantity can be the expected quantity of the material manufactured in the ProductionLot. The ExpectedQuantity can be a GDT of type Quantity, and can have a Qualifier of Expected. ExpectedQuantityTypeCode can be a coded representation of the type of the expected quantity. The ExpectedQuantityTypeCode can be a GDT of type QuantityTypeCode.

The following Inbound Aggregation Relationships from business object PermanentEstablishment/node PermanentEstablishment may exist. PermanentEstablishment has a cardinality relationship of 1:cn. The PermanentEstablishment can be the permanent establishment at which the material is manufactured.

The following Inbound Aggregation Relationships from business object Material/node Material may exist. Material has a cardinality relationship of 1:cn. The Material can be the material to which the business transaction relates.

An ItemGroupPurchasingItem can be an ItemGroupItem that indicates that a purchasing process was executed, or that a quantity or value change that is directly connected with a purchasing process took place. The elements located directly at the ItemGroupPurchasingItem node can be defined by the AccountingNotificationItemGroupPurchasingItemElements data type. These elements can include a ProductUUID, a ProductTypeCode, a PermanentEstablishmentUUID, a ProductCategoryUUID, a SellerPartyUUID, a FollowUpDeliveryRequirementCode, a FollowUpInvoiceAccountingRequirementCode, a DeliveryCompletedIndicator, a SupplierInvoiceCompletedIndicator, a CancelledIndicator, a NetUnitPrice, a CashDiscountDeductibleIndicator, an OrderQuantity, an OrderQuantityTypeCode, a ReferenceOrderQuantity, a ReferenceOrderQuantityTypeCode, and a TaxAccountingNotificationtItemGroupID. ProductUUID can be a universally unique identifier of the material or ServiceProduct in the item of the operational document (original document). For example, with an incoming invoice for a purchase order, this can be the Material, IndividualMaterial, or ServiceProduct purchased. The ProductUUID can be a GDT of type UUID, and in some implementations, can be optional. ProductTypeCode can be a coded representation for a product type (such as material or service). The ProductTypeCode can be a GDT of type ProductTypeCode, can have Restrictions of the only allowed code values are 1 (material), 2 (service product), and 3 (individual material), and in some implementations, can be optional. PermanentEstablishmentUUID can be an universally unique identifier of the permanent establishment at which the material was issued or received. The PermanentEstablishmentUUID can be a GDT of type UUID, and in some implementations, can be optional. ProductCategoryUUID can be an universally unique identifier of the ProductCategory of the material or ServiceProduct. The ProductCategoryUUID can be a GDT of type UUID, and in some implementations, can be optional. SellerPartyUUID can be an universally unique identifier of the supplier of the Material or ServiceProduct. The SellerPartyUUID can be a GDT of type UUID, and in some implementations, can be optional. FollowUpDeliveryRequirementCode can be a coded representation of whether follow-up documents such as GoodsAndServiceAcknowledgment or InboundDelivery are expected for an item of the operational document of Purchasing. The FollowUpDeliveryRequirementCode can be a GDT of type FollowUpBusinessTransactionDocumentRequirementCode, can have a Restriction of the only allowed code values are 02 (expected) and 04 (not expected), and in some implementations, can be optional. FollowUpInvoiceAccountingRequirementCode can be a coded representation of whether the follow-up document InvoiceAccounting is expected for an item of the operational document of Purchasing. The FollowUpInvoiceAccountingRequirementCode can be a GDT of type FollowUpBusinessTransactionDocumentRequirementCode, can have a Restriction of the only allowed code values are 02 (expected) and 04 (not expected), and in some implementations, can be optional. DeliveryCompletedIndicator can indicate that no further GoodsAndServiceAcknowledgment or InboundDelivery is expected for an item of the operational document of Purchasing. The DeliveryCompletedIndicator can be a GDT of type Indicator, can have a Qualifier of Completed, and in some implementations, can be optional.

SupplierInvoiceCompletedIndicator can indicate that no further SupplierInvoice is expected for an item of the operational document of Purchasing. The SupplierInvoiceCompletedIndicator can be a GDT of type Indicator, can have a Qualifier of Completed, and in some implementations, can be optional. CancelledIndicator can indicate whether the item of the operational document of Purchasing is canceled. The CancelledIndicator can be a GDT of type Indicator, can have a Qualifier of Cancelled, and in some implementations, can be optional. NetUnitPrice can be the Net price of the ordered or delivered product. It can be used to valuate the business transaction. The NetUnitPrice can be a GDT of type Price, can have a Qualifier of NetUnit, and in some implementations, can be optional. CashDiscountDeductibleIndicator can indicate whether any cash discount applied to the payment is related to this ItemGroupPurchasingItem. The CashDiscountDeductibleIndicator can be a GDT of type Indicator, can have a Qualifier of CashDiscountDeductible, and in some implementations, can be optional. OrderQuantity can be a quantity of the product in the order unit to which the ItemGroupPurchasingItem relates. The OrderQuantity can be a GDT of type Quantity, can have a Qualifier of Order, and in some implementations, can be optional. OrderQuantityTypeCode can be a coded representation of the type of the order quantity. The OrderQuantityTypeCode can be a GDT of type QuantityTypeCode, and in some implementations, can be optional. In some implementations, the element may be filled if the element OrderQuantity is filled. ReferenceOrderQuantity can be a quantity of the product in the order unit to which the ItemGroupPurchasingItem relates but which does not result in a change to the inventory quantity. The ReferenceOrderQuantity can be a GDT of type Quantity, can have a Qualifier of Order, and in some implementations, can be optional. ReferenceOrderQuantityTypeCode can be a coded representation of the type of the reference order quantity. The ReferenceOrderQuantityTypeCode can be a GDT of type QuantityTypeCode, and in some implementations, can be optional. In some implementations, the element may be filled if the element ReferenceOrderQuantity is filled. TaxAccountingNotificationtItemGroupID can group the ItemGroupItems that incur tax to the resulting ItemGroupTaxItems. The TaxAccountingNotificationtItemGroupID can be a GDT of type BusinessTransactionDocumentItemGroupID, and in some implementations, can be optional.

The following Inbound Aggregation Relationships from business object ProductCategoryHierarchy/node ProductCategory may exist. ProductCategoryHierarchyProductCategory has a cardinality relationship of c:cn. The ProductCategoryHierarchyProductCategory can denote the ProductCategory to which the ItemGroupPurchasingItem refers.

The following Inbound Aggregation Relationships from business object BusinessPartner/node BusinessPartner may exist. SellerParty has a cardinality relationship of c:cn. The SellerParty can be a supplier of the Material, IndividualMaterial, or ServiceProduct.

The following Inbound Aggregation Relationships from business object PermanentEstablishment/node PermanentEstablishment may exist. PermanentEstablishment has a cardinality relationship of c:cn. The PermanentEstablishment can be a permanent establishment at which the material was issued or received. In some implementations, a maximum of one of the following relationships may exist. The relationship from business object Material/node Material may exist. Material has a cardinality relationship of c:cn. The Material can be the material to which the business transaction relates. The relationship from business object IndividualMaterial/node IndividualMaterial may exist. IndividualMaterial has a cardinality relationship of c:cn. The IndividualMaterial can denote the IndividualMaterial to which the business transaction refers. The relationship from business object ServiceProduct/node ServiceProduct may exist. ServiceProduct has a cardinality relationship of c:cn. The ServiceProduct can be the ServiceProduct to which the business transaction refers.

An ItemGroupSalesItem can be an ItemGroupItem that indicates that a sales process was executed, or that a quantity or value change that is directly connected with a sales process took place. The elements located directly at the ItemGroupSalesItem node can be defined by the AccountingNotificationItemGroupSalesItemElements data type. These elements can include a ProductUUID, a ProductTypeCode, a PermanentEstablishmentUUID, an OrderQuantity, an OrderQuantityTypeCode, a BuyerPartyUUID, a BuyerPartyTypeCode, a TaxAccountingNotificationtItemGroupID, SalesOrganisationUUID, a CustomerServiceOrganisationUUID, a CompletedIndicator, a CancelledIndicator, a CashDiscountDeductibleIndicator, and a TaxAccountingNotificationtItemGroupID. ProductUUID can be an universally unique identifier of the Material or ServiceProduct in the item of the operational document. In some implementations, the ProductUUID can be included with an outgoing invoice for a sales order this is the material sold. In some implementations, the ProductUUID can be included with an outgoing invoice for a service order it is the service product sold. The ProductUUID can be a GDT of type UUID, and in some implementations, can be optional. ProductTypeCode can be a coded representation for a product type (such as material or service). The ProductTypeCode can be a GDT of type ProductTypeCode, can have Restrictions of the only allowed code values are 1 (material) and 2 (service), and in some implementations, can be optional. PermanentEstablishmentUUID can be an organizational centre that bears responsibility on a value basic for the stock of an owner (e.g. a company) in a logistic location. The PermanentEstablishmentUUID can be a GDT of type UUID, and in some implementations, can be optional. OrderQuantity can be the quantity in the item of the operational document of Sales. In some implementations, with a sales order, the OrderQuantity can be the quantity of the material ordered by the customer, In some implementations, with a service confirmation, the OrderQuantity can be the number of hours worked by the service technician. The OrderQuantity can be a GDT of type Quantity, can have a Qualifier of Order, and in some implementations, can be optional. OrderQuantityTypeCode can be a coded representation of the type of the order quantity. The OrderQuantityTypeCode can be a GDT of type QuantityTypeCode, and in some implementations, can be optional. In some implementations, the element may be filled if the element OrderQuantity is filled. BuyerPartyUUID can be the party in the sales process that purchases a good or service. For example, the party for a sales order is the customer. The BuyerPartyUUID can be a GDT of type UUID, and in some implementations, can be optional. BuyerPartyTypeCode can be a type of the business partner, organizational unit, or their specializations referenced by the attribute BuyerPartyUUID. The BuyerPartyTypeCode can be a GDT of type BusinessObjectTypeCode, and in some implementations, can be optional. In some implementations, the business object type codes of the business objects described in the inbound aggregation relationships may be used. SalesOrganisationUUID can be a functional unit in the sales process that takes on the role of the sales organization. The SalesOrganisationUUID can be a GDT of type UUID, and in some implementations, can be optional. CustomerServiceOrganisationUUID can be a functional unit in the service process that takes on the role of the service organization. The CustomerServiceOrganisationUUID can be a GDT of type UUID, and in some implementations, can be optional. CompletedIndicator can specify whether the item of the operational document of Sales is completed. The CompletedIndicator can be a GDT of type Indicator, can have a Qualifier of Completed, and in some implementations, can be optional. CancelledIndicator can indicate whether the item of the operational document of Sales is canceled. The CancelledIndicator can be a GDT of type Indicator, can have a Qualifier of Cancelled, and in some implementations, can be optional. CashDiscountDeductibleIndicator can indicate whether the line item posted with an outgoing invoice qualifies for a cash discount. The CashDiscountDeductibleIndicator can be a GDT of type Indicator, can have a Qualifier of CashDiscountDeductible, and in some implementations, can be optional. In some implementations, this information can be needed for backdated sales tax calculation when a cash discount is applied in the payment for an outgoing invoice. TaxAccountingNotificationtItemGroupID can group the ItemGroupItems that incur tax to the resulting ItemGroupTaxItems. The TaxAccountingNotificationtItemGroupID can be a GDT of type BusinessTransactionDocumentItemGroupID, and in some implementations, can be optional.

The following composition relationships to subordinate nodes may exist. ItemGroupSalesItemPricing 60274 has a cardinality relationship of 1:cn.

The following Inbound Aggregation Relationships from business object BusinessPartner/node BusinessPartner may exist. BuyerParty has a cardinality relationship of c:cn. The BuyerParty can be the party that purchases a product or service.

The following Inbound Aggregation Relationships from business object PermanentEstablishment/node PermanentEstablishment may exist. PermanentEstablishment has a cardinality relationship of c:cn. The PermanentEstablishment can be an organizational centre that bears responsibility on a value basic for the stock of an owner (e.g. a company) in a logistic location.

The following Inbound Aggregation Relationships from business object FunctionalUnit/node FunctionalUnit may exist. SalesOrganisation has a cardinality relationship of c:cn. The SalesOrganisation can be the functional unit in the Sales Organisation role to which the business transaction relates. In some implementations, the FunctionalUnitTypeCode may have the value "4" (Sales) and the FunctionalUnitRoleCode "1" (Organisation). CustomerServiceOrganisation has a cardinality relationship of c:cn. The CustomerServiceOrganisation can be the functional unit in the Customer Service Organisation role to which the business transaction relates.

In some implementations, the FunctionalUnitTypeCode may have the value "5" (CustomerService) and the FunctionalUnitRoleCode "1" (Organisation). In some implementations, a maximum of one of the following relationships may exist.

The relationship from business object Material/node Material may exist. Material has a cardinality relationship of c:cn. The Material can be the material to which the business transaction relates. The relationship from business object ServiceProduct/node ServiceProduct may exist. ServiceProduct has a cardinality relationship of c:cn. The ServiceProduct can be the ServiceProduct to which the business transaction refers.

An ItemGroupSalesItemPricing can be a price agreement of the operational document. For example, with an outgoing invoice it is possible to have different pricing elements (base price, discounts, surcharges). The elements located directly at the ItemGroupSalesItemPricing nodeAccountingNotification can be defined by the AccountingNotificationItemGroupSalesItemPricingElements data type. The elements can include a PriceSpecificationElementPurposeCode, a PriceSpecificationElementCategoryCode, and a CalculatedAmount. PriceSpecificationElementPurposeCode can be a coded representation of the purpose of a PriceSpecificationElement. A PriceSpecificationElement can be the specification of a price, a discount, a surcharge, or a tax. The PriceSpecificationElementPurposeCode can be a GDT of type PriceSpecificationElementPurposeCode. PriceSpecificationElementCategoryCode can be a coded representation of the category of Price SpecificationElement. The PriceSpecificationElementCategoryCode can be a GDT of type PriceSpecificationElementCategoryCode. CalculatedAmount can be the value of the pricing element in the currency of the operational document, such as the outgoing invoice. The CalculatedAmount can be a GDT of type Amount, and can have a Qualifier of Calculated. ItemGroupDueItem can be an ItemGroupItem that represents an individual increase or decrease of a payable or receivable due to or from a business partner and for which a complete itemization is required in Accounting. The elements located directly at the ItemGroupDueItem node can be defined by the AccountingNotificationItemGroupDueItemElements data type. These elements can include a TradeReceivablesPayablesRegisterItemTypeCode, a DueTransactionDate, a LineItemCurrencyAmount, a PartyRoleCategoryCode, and a BusinessPartnerUUID. TradeReceivablesPayablesRegisterItemTypeCode can be a coded representation of the type of item in the payables register. The TradeReceivablesPayablesRegisterItemTypeCode can be a GDT of type TradeReceivablesPayablesRegisterItemTypeCode, and in some implementations, can be optional. DueTransactionDate can be a date on which payment of the item is due net (i.e. without cash discount). The DueTransactionDate can be a GDT of type Date, can have a Qualifier of Transaction, and in some implementations, can be optional. LineItemCurrencyAmount can be a value of the receivable or payable in the currency in which the receivable or payable arose. The LineItemCurrencyAmount can be a GDT of type Amount, can have a Qualifier of LineItemCurrency, and in some implementations, can be optional. PartyRoleCategoryCode can be a coded representation of the role of the business partner, and in some implementations, can be optional. In some implementations, the possible values can be Debtor Party and Creditor Party. BusinessPartnerUUID can be an universally unique identifier of the business partner to or from which the amount is due. The BusinessPartnerUUID can be a GDT of type UUID, and in some implementations, can be optional. In some implementations, the element may be filled if there is no reference to a predecessor operational document in the ItemGroupItemPrecedingOperationalDocumentReference node of the parent ItemGroupItem node.

The following composition relationships to subordinate nodes may exist. ItemGroupDueItemSchedule 60278 has a cardinality relationship of 1:cn.

The following Inbound Aggregation Relationships from business object BusinessPartner/node BusinessPartner may exist. BusinessPartner has a cardinality relationship of c:cn. The BusinessPartner can be the business partner to which the ItemGroupDueItem refers.

An ItemGroupDueItemSchedule can be a due schedule that describes what portion of the due item is contractually due for payment at a particular point in time. In some implementations, an ItemGroupDueItemSchedule may only be required if multiple due time points have been agreed. The elements located directly at the ItemGroupDueItemSchedule node can be defined by the AccountingNotificationItemGroupDueItemScheduleElements data type. These elements can include a DueTransactionDate, and a LineItemCurrencyAmount. DueTransactionDate can be a date on which the portion of the item is due for payment net (i.e. without cash discount). The DueTransactionDate can be a GDT of type Date, and can have a Qualifier of Transaction. LineItemCurrencyAmount can be a value of the portion of the due item in the currency in which the item arose. The LineItemCurrencyAmount can be a GDT of type Amount, and can have a Qualifier of LineItemCurrency.

An ItemGroupTaxItem is an ItemGroupItem that can represent the increase or decrease of a receivable or payable from purchase tax and/or sales tax. The elements located directly at the ItemGroupTaxItem node can be defined by the AccountingNotificationItemGroupTaxItemElements data type. These elements can include a TaxReceivablesPayablesRegisterItemSplitItemTypeCode, a ProductTax, a WithholdingTax, a TaxDeclarationTaxAmount, and a TaxDeclarationNonDeductibleAmount. TaxReceivablesPayablesRegisterItemSplitItemTypeCode can be a coded representation of the type of a SplitItem of a TaxReceivablesPayablesRegisterItem based on the operational document on which this split item is based (such as invoice or credit memo in a Customer Invoice or TaxDeclarationSummaryLine or TaxDeclarationPaymentLine). The TaxReceivablesPayablesRegisterItemSplitItemTypeCode can be a GDT of type TaxReceivablesPayablesRegisterItemSplitItemTypeCode, and in some implementations, can be optional. ProductTax can be the sales tax to which the ItemGroupTaxItem relates. The ProductTax can be a GDT of type ProductTax, can have Restrictions of only elements CountryCode, EventTypeCode, TypeCode, RateTypeCode, NonDeductibleAmount, BusinessTransactionDocumentItemGroupID, DueCategory- Code, DeferredIndicator, RegionCode, and in some implementations, can be optional. In some implementations, the elements CountryCode, TypeCode, RateTypeCode, EventTypeCode, and DueCategoryCode may be filled. WithholdingTax can be the withholding tax which the ItemGroupTaxItem relates. The WithholdingTax can be a GDT of type WithholdingTax, can have Restrictions of only elements CountryCode, EventTypeCode, TypeCode, RateTypeCode, RegionCode, and in some implementations, can be optional. In some implementations, the elements CountryCode, TypeCode, EventTypeCode, and RateTypeCode may be filled. TaxDeclarationTaxAmount can be an amount of the tax in the tax declaration currency if the tax declaration currency is not the same as the transaction currency. The TaxDeclarationTaxAmount can be a GDT of type Amount, can have a Qualifier of Tax, and in some implementations, can be optional. TaxDeclarationNonDeductibleAmount can be a nondeductible amount of the tax in the tax declaration currency if the tax declaration currency is not the same as the transaction currency. The TaxDeclarationNonDeductibleAmount can be a GDT of type Amount, can have a Qualifier of NonDeductibleAmount, and in some implementations, can be optional. In some implementations, either the ProductTax element or the WithholdingTax element may be filled, but not both.

The following composition relationships to subordinate nodes may exist. ItemGroupTaxItemAllocationOperationalDocumentReference 60252 has a cardinality relationship of 1:cn. In some implementations, this composition relationship can exist only if the Operational Document of the AccountingNotification is a tax declaration or a document that converts deferred tax into non-deferred tax. In this implementation, the TaxDeclarationTaxAmount may match the total of the TaxDeclarationTaxAmounts on the associated ItemGroupTaxItemAllocationOperationalDocumentReferences.

An ItemGroupTaxItemAllocationOperationalDocumentReference can allocate a portion of the increase or decrease of a tax receivable or payable represented by the ItemGrouptaxItem to an OperationalDocument which contributes to this increase or decrease. The elements located directly at the ItemGroupTaxItemAllocationOperationalDocumentReference node can be defined by the AccountingNotificationItemGroupTaxItemAllocationOperationalDocumentReferenceElements data type. These elements can include a TaxDeclarationTaxAmount, an AllocationOperationalDocumentContainingBusinessObjectReference, an AllocationOperationalDocumentReference, and an AllocationOperationalDocumentItemReference. TaxDeclarationTaxAmount can be an amount of the allocated tax in the tax declaration currency. The TaxDeclarationTaxAmount can be a GDT of type Amount, and can have a Qualifier of Tax. AllocationOperationalDocumentContainingBusinessObjectReference can be a reference to a Business Object in an operational business area outside Financial Accounting that includes the Allocation Operational Document. The AllocationOperationalDocumentContainingBusinessObjectReference can be a GDT of type ObjectNodeReference. AllocationOperationalDocumentReference can be a reference to the Allocation Operational Document. The AllocationOperationalDocumentReference can be a GDT of type ObjectNodeReference. In some implementations, if the Allocation Operational Business Object is identical to the Allocation Operational Document, only the AllocationOperationalDocumentReference may need to be supplied in the Accounting Notification messages and the AllocationOperationalDocumentContainingBusinessObjectReference can be derived from the AllocationOperationalDocumentReference. AllocationOperationalDocumentItemReference can be a reference to an item in the Allocation Operational Document. The AllocationOperationalDocumentItemReference can be a GDT of type ObjectNodeReference, and in some implementations, can be optional.

An ItemGroupCashItem can be an ItemGroupItem that can represent an inflow or outflow of cash. The elements located directly at the ItemGroupCashItem node can be defined by the AccountingNotificationItemGroupCashItemElements data type. These elements can include a HouseBankUUID, a PaymentRegisterItemTypeCode, a PaymentFormCode, and a LineItemCurrencyAmount. HouseBankUUID can be an universally unique identifier of the house bank at which the cash was received or paid out. The HouseBankUUID can be a GDT of type UUID, and in some implementations, can be optional. PaymentRegisterItemTypeCode can be a coded representation of the type of a payment register item, transferred from the payment process to document the transaction. The PaymentRegisterItemTypeCode can be a GDT of type PaymentRegisterItemTypeCode, and in some implementations, can be optional. PaymentFormCode can be a coded representation of the form of payment of the inflow or outflow of cash. The PaymentFormCode can be a GDT of type PaymentFormCode, and in some implementations, can be optional. LineItemCurrencyAmount can be a value of the cash movement in the currency in which it is carried on the bank account. The LineItemCurrencyAmount can be a GDT of type Amount, can have a Qualifier of LineItem, and in some implementations, can be optional.

The following Inbound Aggregation Relationships from business object BusinessPartner/node HouseBank may exist. HouseBank has a cardinality relationship of c:cn. The HouseBank can denote the house bank to which the business transaction refers.

An ItemGroupExpenseAndIncomeItem can be an ItemGroupItem that represents an expense or income that cannot directly be attributed to the procurement or sale of a product.

Examples of such expenses or income can be cash discounts applied or granted, and expenses to be reimbursed to an employee or other person associated with the company. The elements located directly at the ItemGroupExpenseAndIncomeItem node can be defined by the AccountingNotificationItemGroupExpenseAndIncomeItemElements data type. These elements can include an AccountDeterminationExpenseGroupCode, a TaxAccountingNotificationtItemGroupID, and an ExpenseAndIncomeCategoryCode. AccountDeterminationExpenseGroupCode can be a coded representation of the group of expenses. The AccountDeterminationExpenseGroupCode can be a GDT of type AccountDeterminationExpenseGroupCode. TaxAccountingNotificationtItemGroupID can group the ItemGroupItems that incur tax to the resulting ItemGroupTaxItems. The TaxAccountingNotificationtItemGroupID can be a GDT of type BusinessTransactionDocumentItemGroupID, and in some implementations, can be optional. ExpenseAndIncomeCategoryCode can be a coded representation of the category of an expense or income item. The ExpenseAndIncomeCategoryCode can be a GDT of type ExpenseAndIncomeCategoryCode, and in some implementations, can be optional.

An ItemGroupProjectItem can be an ItemGroupItem that represents the creation of a new project or a change to an existing project. The elements located directly at the ItemGroupProjectItem node can be defined by the AccountingNotificationItemGroupProjectItemElements data type. These elements can include a TaskListCompleteTransmissionIndicator, a RequestingCostCentreUUID, a ResponsibleCostCentreUUID, and an ActionCode. TaskListCompleteTransmissionIndicator can indicate whether the message contains the project with all associated tasks or only the tasks that have been changed. The TaskListCompleteTransmissionIndicator can be a GDT of type CompleteTransmissionIndicator. RequestingCostCentreUUID can be an universally unique identifier of the cost center that commissioned the project. The RequestingCostCentreUUID can be a GDT of type UUID, and in some implementations, can be optional. ResponsibleCostCentreUUID can be an universally unique identifier of the cost center responsible for the project. The ResponsibleCostCentreUUID can be a GDT of type UUID. ActionCode can indicate whether the project is created, changed, or deleted. The ActionCode can be a GDT of type ActionCode. In some implementations, if the project is an overhead cost project the RequestingCostCentreUUID element may be filled.

The following composition relationships to subordinate nodes may exist. ItemGroupProjectItemTask 60280 has a cardinality relationship of 1:n.

The following Inbound Associations Relationships from business object CostCentre/node CostCentre may exist. RequestingCostCentre has a cardinality relationship of c:cn. The RequestingCostCentre can be the cost center that commissioned the project. ResponsibleCostCentre has a cardinality relationship of 1:cn. ResponsibleCostCentre can be the cost center responsible for the project.

An ItemGroupProjectItemTask can represent a task within the hierarchical structure of a project. The elements located directly at the ItemGroupProjectItemTask node can be defined by the AccountingNotificationItemGroupProjectItemTaskElements data type. These elements can include a ProjectTaskReference, and an ActionCode. ProjectTaskReference can be a reference to the project task. The ProjectTaskReference can be a GDT of type ObjectNodeReference. ActionCode can indicate whether the project task is created, changed, or deleted. The ActionCode can be a GDT of type ActionCode.

The following Inbound Aggregation Relationships from business object Project/node Task may exist. ProjectTask has a cardinality relationship of 1:cn. The ProjectTask can be the ProjectTask represented in the ItemGroupProjectItem.

CancellationAccountingNotification

A CancellationAccountingNotification can be an AccountingNotification that informs Accounting about the cancellation of a business transaction or the cancellation of items in a business transaction. The CancellationAccountingNotification can include a reference to the operational document that records the business transaction cancellation (operational document of the AccountingNotification) and references to the cancelled operational document and the cancelled items. The elements located directly at the CancellationAccountingNotification node can be defined by the AccountingNotificationCancellationAccountingNotificationElements data type. These elements can include a CancelledOperationalDocumentContainingBusinessObjectReference, a CancelledOperationalDocumentReference, and a CancelledOperationalDocumentTransactionUUID. CancelledOperationalDocumentContainingBusinessObjectReference can be a reference to the Business Object that contains the operational document that was cancelled or that contains the cancelled items. The CancelledOperationalDocumentContainingBusinessObjectReference can be a GDT of type ObjectNodeReference, and can have a Qualifier of Cancelled. CancelledOperationalDocumentReference can be a reference to the operational document that was cancelled or that contains the cancelled items. The CancelledOperationalDocumentReference can be a GDT of type ObjectNodeReference, and can have a Qualifier of Cancelled. In some implementations, if the cancelled operational document is identical to an object, the cancelled Operational Document Reference only is sent and the CancelledOperationalDocumentContainingBusinessObject Reference can be derived from the cancelled OperationalDocumentReference. CancelledOperationalDocumentTransactionUUID can be an universally unique identifier of the transaction during which the cancelled Operational Document was created or changed. The CancelledOperationalDocumentTransactionUUID can be a GDT of type UUID, and in some implementations, can be optional.

The following composition relationships to subordinate nodes may exist. CancelledOperationalDocumentItem 60268 has a cardinality relationship of 1:cn.

The following Inbound Aggregation Relationships (cross DU) from business object GoodsAndServiceAcknowledgement/node GoodsAndServiceAcknowledgement may exist. GoodsAndServiceAcknowledgement has a cardinality relationship of c:cn. The GoodsAndServiceAcknowledgement can be a reference to the cancelled Operational Document. A CancellationAccountingNotification can cancel a business transaction, or items in a business transaction, that was originally recorded in a GoodsAndServiceAcknowledgement.

The following Inbound Aggregation Relationships (cross DU) from business object GoodsAndActivityConfirmation/node GoodsAndActivityConfirmation may exist.

GoodsAndActivityConfirmation has a cardinality relationship of c:cn. The GoodsAndActivityConfirmation can be a reference to the cancelled Operational Document. A CancellationAccountingNotification can cancel a business transaction, or items in a business transaction, that was originally recorded in a GoodsAndActivityConfirmation.

The following Inbound Aggregation Relationships (cross DU) from business object ProductionConfirmation/node ProductionConfirmation may exist. ProductionConfirmation has a cardinality relationship of c:cn. The ProductionConfirmation can be a reference to the cancelled Operational Document. A CancellationAccountingNotification can cancel a business transaction, or items in a business transaction, that was originally recorded in a ProductionConfirmation.

The following Inbound Aggregation Relationships (cross DU) from business object ServiceConfirmation/node ServiceConfirmation may exist. ServiceConfirmation has a cardinality relationship of c:cn. The ServiceConfirmation can be a reference to the cancelled Operational Document. A CancellationAccountingNotification can cancel a business transaction, or items in a business transaction, that was originally recorded in a ServiceConfirmation.

The following Inbound Aggregation Relationships (cross DU) from business object EmployeeTimeCalendar/node EmployeeTimeCalendar may exist. EmployeeTimeCalendar has a cardinality relationship of c:cn. The EmployeeTimeCalendar can be a reference to the EmployeeTimeCalendar that contains the cancelled Operational Document.

The following Inbound Aggregation Relationships (cross DU) from business object EmployeeTimeCalendar/node PeriodItem may exist. EmployeeTimeCalendarPeriodItem has a cardinality relationship of c:cn. The EmployeeTimeCalendarPeriodItem can be a reference to the cancelled Original Entry Document. A CancellationAccountingNotification can cancel a business transaction, or items in a business transaction, that was originally recorded in an EmployeeTimeCalendarPeriod Item.

The following Inbound Aggregation Relationships (cross DU) from business object SupplierInvoice/node SupplierInvoice may exist. SupplierInvoice has a cardinality relationship of c:cn. The SupplierInvoice can be a reference to the cancelled Operational Document. A CancellationAccountingNotification can cancel a business transaction, or items in a business transaction, that was originally recorded in a SupplierInvoice.

The following Inbound Aggregation Relationships (cross DU) from business object SiteLogisticsConfirmation/node SiteLogisticsConfirmation may exist. SiteLogisticsConfirmation has a cardinality relationship of c:cn. The SiteLogisticsConfirmation can be a reference to the cancelled Operational Document. A CancellationAccountingNotification can cancel a business transaction, or items in a business transaction, that was originally recorded in a SiteLogisticsConfirmation.

The following Inbound Aggregation Relationships (cross DU) from business object CustomerInvoice/node CustomerInvoice may exist. CustomerInvoice has a cardinality relationship of c:cn. The CustomerInvoice can be a reference to the cancelled Operational Document. A CancellationAccountingNotification can cancel a business transaction, or items in a business transaction, that was originally recorded in a CustomerInvoice.

The following Inbound Aggregation Relationships (cross DU) from business object PaymentAllocation/node PaymentAllocation may exist. PaymentAllocation has a cardinality relationship of c:cn. The PaymentAllocation can be a reference to the PaymentAllocation that contains the cancelled Operational Document.

The following Inbound Aggregation Relationships (cross DU) from business object PaymentAllocation/node FinancialAuditTrailDocumentation may exist. PaymentAllocationFinancialAuditTrailDocumentation has a cardinality relationship of c:cn. The PaymentAllocationFinancialAuditTrailDocumentation can be a reference to the cancelled Operational Document. A CancellationAccountingNotification can cancel a business transaction, or items in a business transaction, that was originally recorded in a PaymentAllocationFinancialAuditTrailDocumentation.

The following Inbound Aggregation Relationships (cross DU) from business object HouseBankStatement/node HouseBankStatement may exist. HouseBankStatement has a cardinality relationship of c:cn. The HouseBankStatement can be a reference to the HouseBankStatement that contains the cancelled Operational Document.

The following Inbound Aggregation Relationships (cross DU) from business object HouseBankStatement/node FinancialAuditTrailDocumentation may exist. HouseBankStatementFinancialAuditTrailDocumentation has a cardinality relationship c:cn. The HouseBankStatementFinancialAuditTrailDocumentation can be a reference to the cancelled Operational Document. A CancellationAccountingNotification can cancel a business transaction, or items in a business transaction, that was originally recorded in a HouseBankStatementFinancialAuditTrailDocumentation.

The following Inbound Aggregation Relationships (cross DU) from business object PaymentOrder/node PaymentOrder may exist. PaymentOrder has a cardinality relationship c:cn. The PaymentOrder can be a reference to the PaymentOrder that contains the cancelled Operational Document.

The following Inbound Aggregation Relationships (cross DU) from business object PaymentOrder/node FinancialAuditTrailDocumentation may exist. PaymentOrderFinancialAuditTrailDocumentation has a cardinality relationship c:cn. The PaymentOrderFinancialAuditTrailDocumentation can be a reference to the cancelled Operational Document. A CancellationAccountingNotification can cancel a business transaction, or items in a business transaction, that was originally recorded in a PaymentOrderFinancialAuditTrailDocumentation.

The following Inbound Aggregation Relationships (cross DU) from business object IncomingCheque/node IncomingCheque may exist. IncomingCheque has a cardinality relationship c:cn. The IncomingCheque can be a reference to the IncomingCheque that contains the cancelled Operational Document.

The following Inbound Aggregation Relationships (cross DU) from business object IncomingCheque/node FinancialAuditTrailDocumentation may exist. IncomingChequeFinancialAuditTrailDocumentation has a cardinality relationship c:cn. The IncomingChequeFinancialAuditTrailDocumentation can be a reference to the cancelled Operational Document. A CancellationAccountingNotification can cancel a business transaction, or items in a business transaction, that was originally recorded in an IncomingChequeFinancialAuditTrailDocumentation.

The following Inbound Aggregation Relationships (cross DU) from business object CashPayment/node CashPayment may exist. CashPayment has a cardinality relationship c:cn. The CashPayment can be a reference to the CashPayment that contains the cancelled Operational Document.

The following Inbound Aggregation Relationships (cross DU) from business object CashPayment/node FinancialAuditTrailDocumentation may exist. CashPaymentFinancialAuditTrailDocumentation has a cardinality relationship c:cn. The CashPaymentFinancialAuditTrailDocumentation can be a reference to the cancelled Operational Document. A CancellationAccountingNotification can cancel a business transaction, or items in a business transaction, that was originally recorded in a CashPaymentFinancialAuditTrailDocumentation.

The following Inbound Aggregation Relationships (cross DU) from business object ChequeDeposit/node ChequeDeposit may exist. ChequeDeposit has a cardinality relationship c:cn. The ChequeDeposit can be a reference to the ChequeDeposit that contains the cancelled Operational Document.

The following Inbound Aggregation Relationships (cross DU) from business object ChequeDeposit/node FinancialAuditTrailDocumentation may exist. ChequeDepositFinancialAuditTrailDocumentation has a cardinality relationship of c:cn. The ChequeDepositFinancialAuditTrailDocumentation can be a reference to the cancelled Operational Document. A CancellationAccountingNotification can cancel a business transaction, or items in a business transaction, that was originally recorded in a ChequeDepositFinancialAuditTrailDocumentation.

The following Inbound Aggregation Relationships (cross DU) from business object ProductTaxDeclaration/node ProductTaxDeclaration may exist. ProductTaxDeclaration has a cardinality relationship c:cn. The ProductTaxDeclaration can be a reference to the ProductTaxDeclaration that contains the cancelled Operational Document.

The following Inbound Aggregation Relationships (cross DU) from business object ProductTaxDeclaration/node FinancialAuditTrailDocumentation may exist. ProductTax- DeclarationFinancialAuditTrailDocumentation has a cardinality relationship c:cn. The ProductTaxDeclarationFinancialAuditTrailDocumentation can be a reference to the cancelled Operational Document. A CancellationAccountingNotification can cancel a business transaction, or items in a business transaction, that was originally recorded in a ProductTaxDeclarationFinancialAuditTrailDocumentation.

The following Inbound Aggregation Relationships (cross DU) from business object DueClearing/node DueClearing may exist. DueClearing has a cardinality relationship c:cn. The DueClearing can be a reference to the DueClearing that contains the cancelled Operational Document.

The following Inbound Aggregation Relationships (cross DU) from business object DueClearing/node FinancialAuditTrailDocumentation may exist. DueClearingFinancialAuditTrailDocumentation has a cardinality relationship c:cn. The DueClearingFinancialAuditTrailDocumentation can be a reference to the cancelled Operational Document. A CancellationAccountingNotification can cancel a business transaction, or items in a business transaction, that was originally recorded in a DueClearingFinancialAuditTrailDocumentation.

The following Inbound Aggregation Relationships (cross DU) from business object DuePayment/node DuePayment may exist. DuePayment has a cardinality relationship c:cn. The DuePayment can be a reference to the DuePayment that contains the cancelled Operational Document.

The following Inbound Aggregation Relationships (cross DU) from business object DuePayment/node FinancialAuditTrailDocumentation may exist. DuePaymentFinancialAuditTrailDocumentation has a cardinality relationship c:cn. The DuePaymentFinancialAuditTrailDocumentation can be a reference to the cancelled Operational Document. A CancellationAccountingNotification can cancel a business transaction, or items in a business transaction, that was originally recorded in a DuePaymentFinancialAuditTrailDocumentation.

The following Inbound Aggregation Relationships (cross DU) from business object Dunning/node Dunning may exist. Dunning has a cardinality relationship c:cn. The Dunning can be a reference to the Dunning that contains the cancelled Operational Document.

The following Inbound Aggregation Relationships (cross DU) from business object Dunning/node FinancialAuditTrailDocumentation may exist. DunningFinancialAuditTrailDocumentation has a cardinality relationship c:cn. The DunningFinancialAuditTrailDocumentation can be a reference to the cancelled Operational Document. A CancellationAccountingNotification can cancel a business transaction, or items in a business transaction, that was originally recorded in a DunningFinancialAuditTrailDocumentation.

The following Inbound Aggregation Relationships (cross DU) from business object ExpenseReport/node ExpenseReport may exist. ExpenseReport has a cardinality relationship of c:cn. The ExpenseReport can be a reference to the ExpenseReport that contains the cancelled Operational Document.

The following Inbound Aggregation Relationships (cross DU) from business object ExpenseReport/node SettlementResultPostingTransaction may exist. ExpenseReportSettlementResultPostingTransaction has a cardinality relationship of c:cn. The ExpenseReportSettlementResultPostingTransaction can be a reference to the cancelled Operational Document. A CancellationAccountingNotification can cancel a business transaction, or items in a business transaction that was originally recorded in a ExpenseReportSettlementResultPostingTransaction.

In some implementations, only one of the above relationships to a cancelled Operational Document may exist. If the cancelled Operational Document is included in a Business Object different from the cancelled Operational Document then the corresponding relationship to this Business Object may exist, also.

A CancellationAccountingNotificationCancelledOperationalDocumentItem can specify the operational document item that was cancelled. In some implementations, not all operational documents support item cancellation. Only the ones that do are listed below as inbound aggregation relationships. The elements located directly at the CancelledOperationalDocumentItem node can be defined by the AccountingNotificationCancellationAccountingNotification-CancelledOperationalDocumentItemElements data type. These elements can include a Reference. Reference can be a reference to the item in the operational document that was cancelled. The Reference can be a GDT of type ObjectNodeReference, and can have a Qualifier of OperationalDocument.

The following Inbound Aggregation Relationships (cross DU) from business object GoodsAndServiceAcknowledgement/node Item may exist. GoodsAndServiceAcknowledgementItem has a cardinality relationship of c:cn. The GoodsAndServiceAcknowledgementItem can be a reference to the cancelled item of the Operational Document. A CancellationAccountingNotification can cancel an operational document item that was originally recorded in a GoodsAndServiceAcknowledgementItem.

The following Inbound Aggregation Relationships (cross DU) from business object GoodsAndActivityConfirmation/node InventoryChangeItem may exist. GoodsAndActivityConfirmationInventoryChangeItem has a cardinality relationship of c:cn. The GoodsAndActivityConfirmationInventoryChangeItem can be a reference to the cancelled item of the Operational Document. A CancellationAccountingNotification can cancel an operational document item that was originally recorded in a GoodsAndActivityConfirmationInventoryChangeItem.

The following Inbound Aggregation Relationships (cross DU) from business object ProductionConfirmation/node InventoryChangeItem may exist. ProductionConfirmationInventoryChangeItem has a cardinality relationship of c:cn. The ProductionConfirmationInventoryChangeItem can be a reference to the cancelled item of the Operational Document. A CancellationAccountingNotification can cancel an operational document item that was originally recorded in a ProductionConfirmationInventoryChangeItem. The following Inbound Aggregation Relationships (cross DU) from business object ProductionConfirmation/node ResourceUtilisationItem may exist. ProductionConfirmationResourceUtilisationItem has a cardinality relationship of c:cn. The ProductionConfirmationResourceUtilisationItem can be a reference to the cancelled item of the Operational Document. A CancellationAccountingNotification can cancel an operational document item that was originally recorded in a ProductionConfirmationResourceUtilisationItem.

The following Inbound Aggregation Relationships (cross DU) from business object ServiceConfirmation/node CustomerSparePartConfirmationItem may exist. ServiceConfirmationCustomerSparePartConfirmationItem has a cardinality relationship of c:cn. The ServiceConfirmationCustomerSparePartConfirmationItem can be a reference to the cancelled item of the Operational Document. A CancellationAccountingNotification can cancel an operational document item that was originally recorded in a ServiceConfirmationCustomer-SparePartConfirmationItem.

The following Inbound Aggregation Relationships (cross DU) from business object ServiceConfirmation/node CustomerServiceConfirmationItem may exist. ServiceConfirmationCustomerServiceConfirmationItem has a cardinality relationship of c:cn. The ServiceConfirmationCustomer-ServiceConfirmationItem can be a reference to the cancelled item of the Operational Document. A CancellationAccountingNotification can cancel an operational document item that was originally recorded in a ServiceConfirmationCustomer-ServiceConfirmationItem.

The following Inbound Aggregation Relationships (cross DU) from business object EmployeeTimeCalendar/node PeriodItem may exist. EmployeeTimeCalendarPeriodItem has a cardinality relationship of c:cn. The EmployeeTimeCalendarPeriodItem can be a reference to the cancelled item of the Operational Document. A CancellationAccountingNotification can cancel an operational document item that was originally recorded in an EmployeeTimeCalendarPeriodItem.

The following Inbound Aggregation Relationships (cross DU) from business object SupplierInvoice/node Item may exist. SupplierInvoiceItem has a cardinality relationship of c:cn. The SupplierInvoiceItem can be a reference to the cancelled item of the Operational Document. A CancellationAccountingNotification can cancel an operational document item that was originally recorded in a SupplierInvoiceItem.

The following Inbound Aggregation Relationships (cross DU) from business object SiteLogisticsConfirmation/node InventoryChangeItem may exist. SiteLogisticsConfirmation-InventoryChangeItem has a cardinality relationship of c:cn. The SiteLogisticsConfirmationInventoryChangeItem can be a reference to the cancelled item of the Operational Document. A CancellationAccountingNotification can cancel an operational document item that was originally recorded in a SiteLogisticsConfirmationInventoryChangeItem.

The following Inbound Aggregation Relationships (cross DU) from business object CustomerInvoice/node Item may exist. CustomerInvoiceItem has a cardinality relationship of c:cn. The CustomerInvoiceItem can be a reference to the cancelled item of the Operational Document. A Cancellation-AccountingNotification can cancel an operational document item that was originally recorded in a CustomerInvoiceItem.

The following Inbound Aggregation Relationships (cross DU) from business object ExpenseReport/node SettlementResultPostingTransactionExpenseItem may exist. ExpenseReportSettlementResultPostingTransactionExpenseItem has a cardinality relationship of c:cn. The ExpenseReportSettlementResultPostingTransactionExpenseItem can be a reference to the cancelled item of the Operational Document. A CancellationAccountingNotification can cancel an operational document item that was originally recorded in an ExpenseReportSettlementResultPostingTransactionExpenseItem.

In some implementations, only one of the above relationships may exist.

Business Object Accounting Notification

The AccountingNotification can be a notification sent to Financial Accounting about one or more business transactions documented in a business transaction document. The business transaction document on which the AccountingNotification is based can be a document more than one business transaction, for example, a confirmation in production involves a goods movement and a service provision. The AccountingNotification can represent these business transactions in a form that is suitable for the purposes of Financial Accounting and that can be identical for all business transaction documents. The Accounting Notification may contain the data necessary for valuation of the business transaction. The AccountingNotification can be the basis for creating a record that conforms with the accounting principles applicable to the Company and that are needed to ensure traceability of the record. The extension of AccountingNotification may capture an additional information regarding a legally required ID of a supplier or customer invoice. According to French, Italian and Chinese law, this LegallyRequiredInvoiceID may be created by the company that sends or receives a customer or supplier invoice, respectively, in a gapless sequential and chronological manner. In addition, it can be a legal requirement in Italy that this number shall be reset to 1 with a new calendar year. This number can be generated in SupplierInvoicing and CustomerInvoicing and may be transferred to Financial Accounting as it may be displayed in the document journal report. In order to prove the chronology of the numbering, the number can be generated and transferred on the same date. The enhancement can be done in the Globalization Layer.

The SupplierInvoiceID can be an identifier for the supplier invoice which can be generated upon entry into the system. When a supplier invoice is created, the next available number can be drawn and used even if the invoice is not saved. Therefore, the ID may not fulfill the requirement for a gapless numbering. Furthermore, the SupplierInvoiceID may be reset to 1 with the beginning of the calendar year. The LegallyRequiredInvoiceID can be an identifier to the Supplier Invoice which is generated when the document is saved. Therefore, it may be a gapless in SupplierInvoicing. (From the perspective of FinancialAccounting, it can still contain gaps when parked supplier invoices, i.e., supplier invoices which may not yet be transferred to Accounting and may be cancelled. This can be acceptable as long as these gaps can be explained by referring to SupplierInvoicing. The term "LegallyRequiredInvoiceID" has been used for the extensions in SupplierInvoicing and DueItemManagement, therefore, it can be used in Financial Accounting.

In certain implementations, the AccountingNotification may include the following structure:

ItemGroups as a collection of ItemGroupItems based on the criteria of Accounting;

ItemGroupItems that contain structured information from an item of a business transaction document based on the classification criteria of Accounting; Specializations of the ItemGroupItem based on the area where the quantity or value change originates and the type of quantity or value change (MaterialItem, ServiceItem, ProductionItem, PurchasingItem, SalesItem, DueItem, TaxItem, CashItem, ExpenseAndIncomeItem, and ProjectItem); ProcessedSetOfBooks, which indicates the SetOfBooks in which the AccountingNotification was processed.

AccountingNotification can be a CancellationAccountingNotification that records the cancellation of a business transaction or the cancellation of items in a business transaction. The Business Object AccountingNotification can be a part of the Process Component Accounting in the Deployment Unit Financial Accounting. The data type enhancements can be a part of Globalization Layer. The Service Interface Invoice Accounting can be a part of the following Process Integration Models: CustomerInvoiceProcessing_Accounting and SupplierInvoiceProcessing_Accounting.

The Interface Invoice Accounting may group the operations that can inform Accounting about the generation or cancellation of outgoing invoices from Customer Invoice Processing or incoming invoices from Supplier Invoice Processing. The Operation AccountingInvoiceAccountingInCreateAccountingDocument can be converted into an AccountingNotification, a business transaction document that can be transferred to Accounting from Customer Invoice Processing or Supplier Invoice Processing, which may check whether postings for the affected sets of books can be required, may update the affected accounts in Accounting for the relevant sets of books, and can generate AccountingDocuments for those sets of books. The operation can be based on the InvoiceAccountingNotification message type derived from the business object AccountingNotification. The extension of the operation can be done by extension of operation NotifyOfInvoice which can be based on the same message type InvoiceAccountingNotification.

Node Structure of Business Object Accounting Notification Enhancement

Root Node of Business Object AccountingNotification

The AccountingNotification can be regarded as a business transaction that can be sent to Accounting from an operational component. It may represent this operational business transaction in a standardized form for all business transaction documents and may include the data needed to valuate the business transaction. The AccountingNotification can relate to a company in which the business transaction arose and contains a reference to the document in which the business transaction was originally recorded for the company, typically known as "the original document or PrimaNota."The AccountingNotification may consist of ItemGroups that each can represent a part of the business transaction classified by a business process variant and possibly a business transaction category. Each ItemGroup may include multiple ItemGroupItems. The ItemGroupItems may contain the changes to quantities and values due to the business transaction or the changes to the data of the business transaction document. The AccountingNotification can be the basis for creating a record that conforms with the accounting principles applicable to the Company and that are needed to ensure traceability of the record. An AccountingNotification can occur in the following incomplete/disjoint specialization: CancellationAccountingNotification may record the cancellation of a business transaction or the cancellation of items in a business transaction. The root node can be extended with an additional element regarding the legally required document number and date which are required in order to fulfill legal regulatory compliance of China, France and Italy.

The elements located directly at the node AccountingNotification can be defined by the data type: AccountingNotificationElements. The AccountingNotification enhancement can be defined by the data type: AccountingNotificationLegalIDExtensionElements. These elements can include LegallyRequiredInvoiceID, LegallyRequiredInvoiceDate, LegallyRequiredInvoiceID can be a unique identifier for a supplier or customer invoice which meets the requirements of legal authorities, and is optional. It can be generated when the customer invoice is released for payment requests or when the supplier invoice is approved by the invoice verification for further processing. The requirements for the procedure of generating a legal identifier can depend on the country legislation. LegallyRequiredInvoiceID can be of data type InvoiceLegallyRequiredID.

LegallyRequiredInvoiceDate can be the date when the LegallyRequiredInvoiceID of an Invoice was generated, and is optional. This may be based on GDT: Date.

Figure 61:
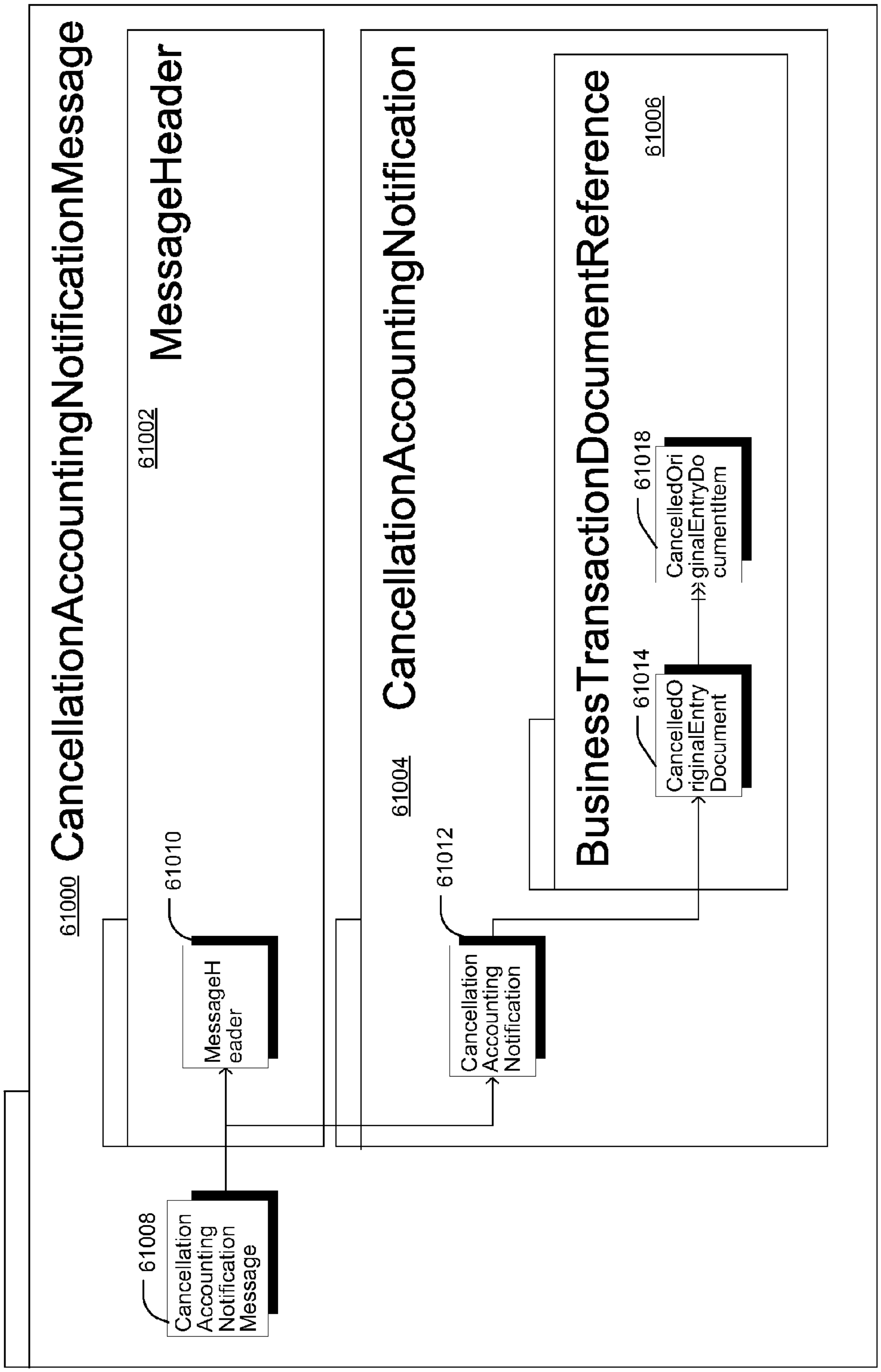
FIG. 61 shows an exemplary CancellationAccountingNotificationMessage Message Data Type.

FIG. 61 illustrates one example logical configuration of CancellationAccountingNotificationMessage message 61000. Specifically, this figure depicts the arrangement and hierarchy of various components such as one or more levels of packages, entities, and datatypes, shown here as 61000 though 61018. As described above, packages may be used to represent hierarchy levels. Entities are discrete business elements that are used during a business transaction. Data types are used to type object entities and interfaces with a structure. For example, CancellationAccountingNotificationMessage message 61000 includes, among other things, CancellationAccountingNotification 61004. Accordingly, heterogeneous applications may communicate using this consistent message configured as such.

Figures 1, 62:
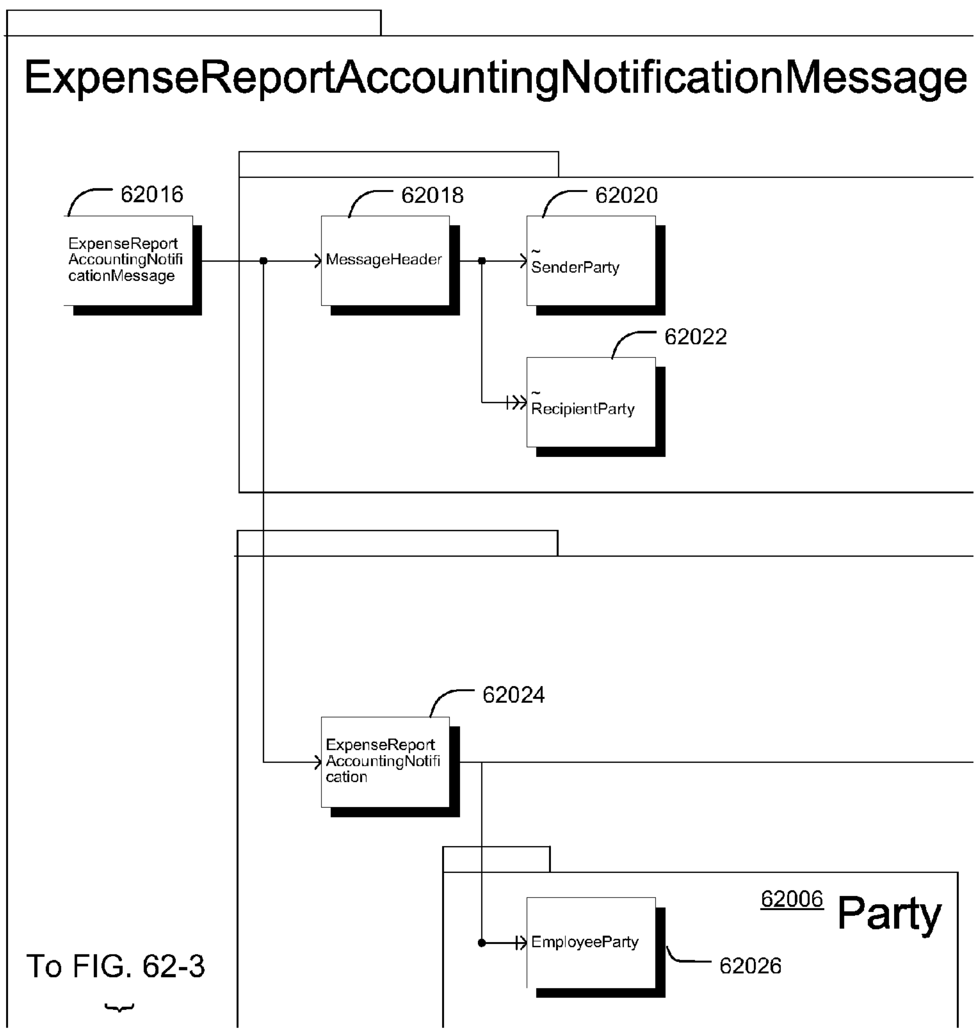
Figures 2, 62:
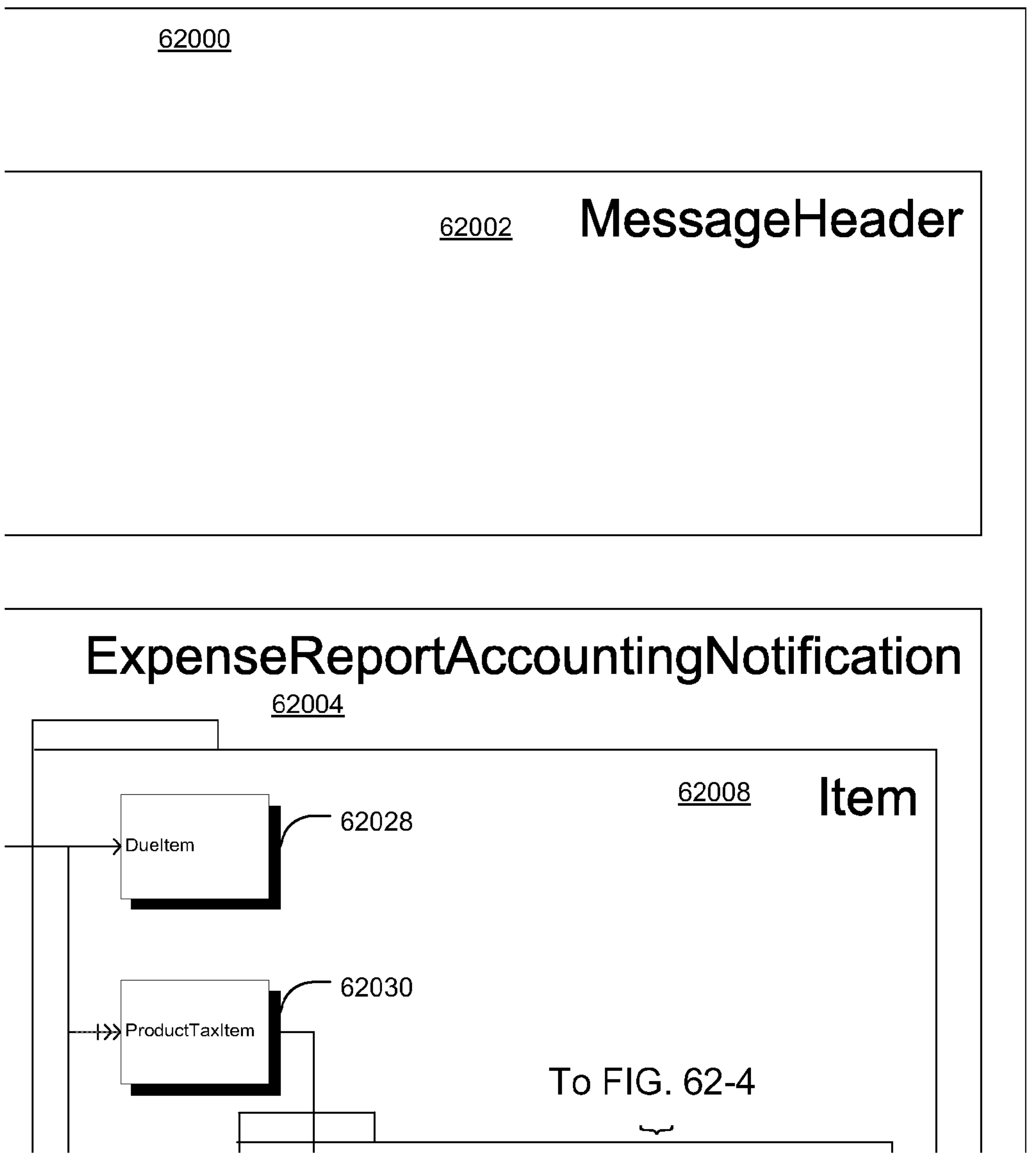
Figures 3, 62:
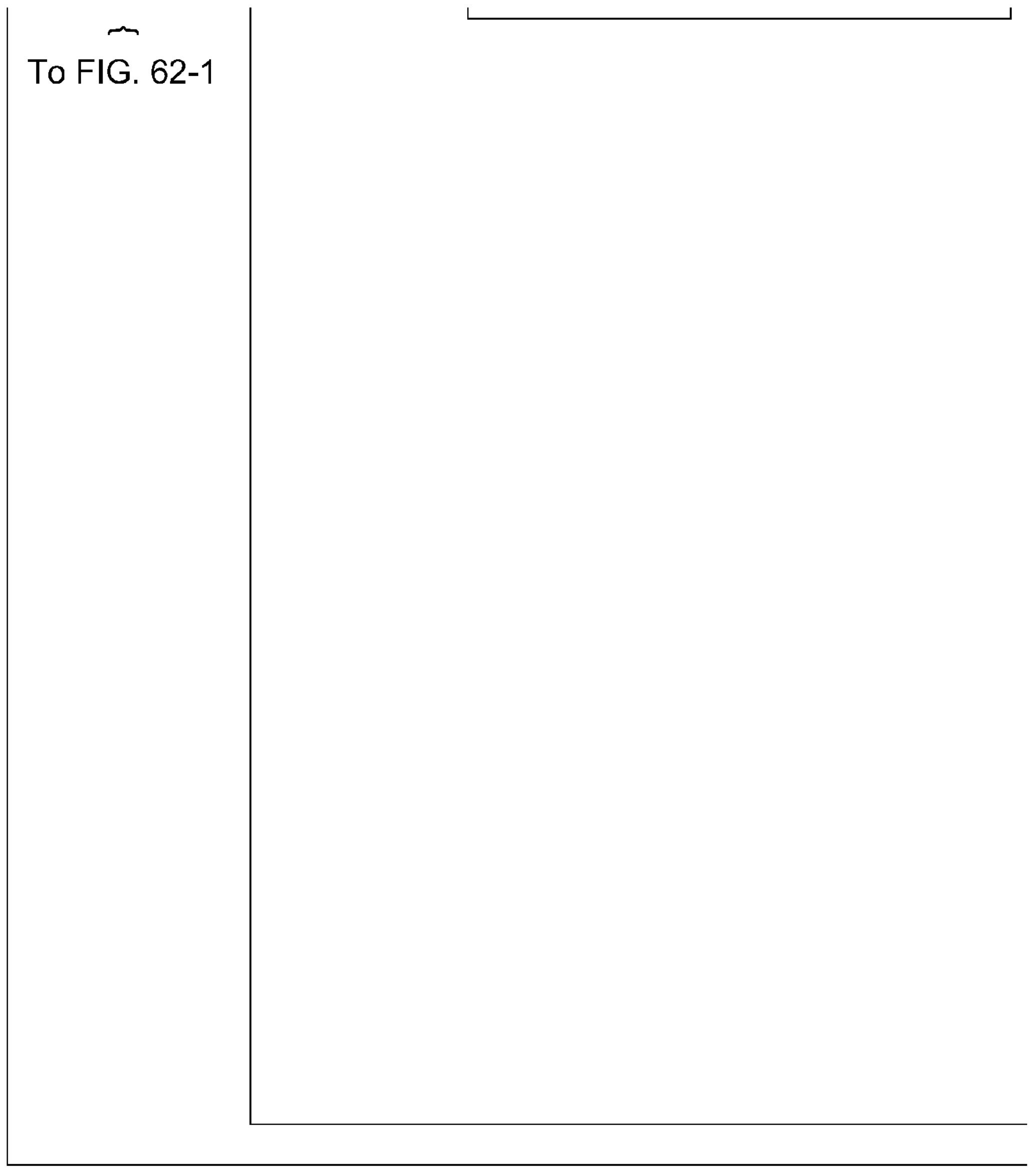
Figures 4, 62:
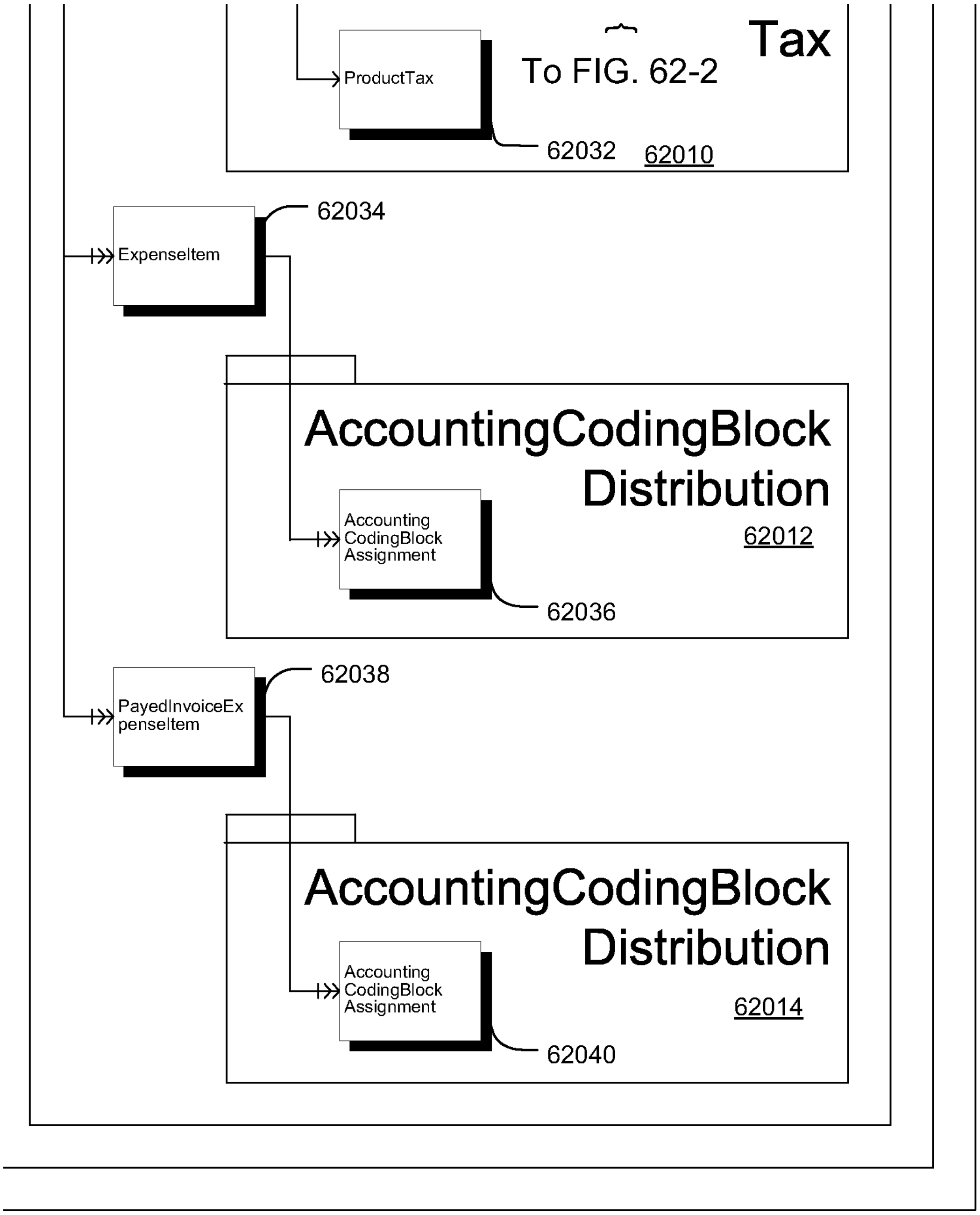

FIG. 62-1 through 62-4 illustrates one example logical configuration of ExpenseReportAccountingNotificationMessage message 62000. Specifically, this figure depicts the arrangement and hierarchy of various components such as one or more levels of packages, entities, and datatypes, shown here as 62000 though 62040. As described above, packages may be used to represent hierarchy levels. Entities are discrete business elements that are used during a business transaction. Data types are used to type object entities and interfaces with a structure. For example, ExpenseReportAccountingNotificationMessage message 62000 includes, among other things, ExpenseReportAccountingNotification 62004. Accordingly, heterogeneous applications may communicate using this consistent message configured as such.

Figures 1, 63:
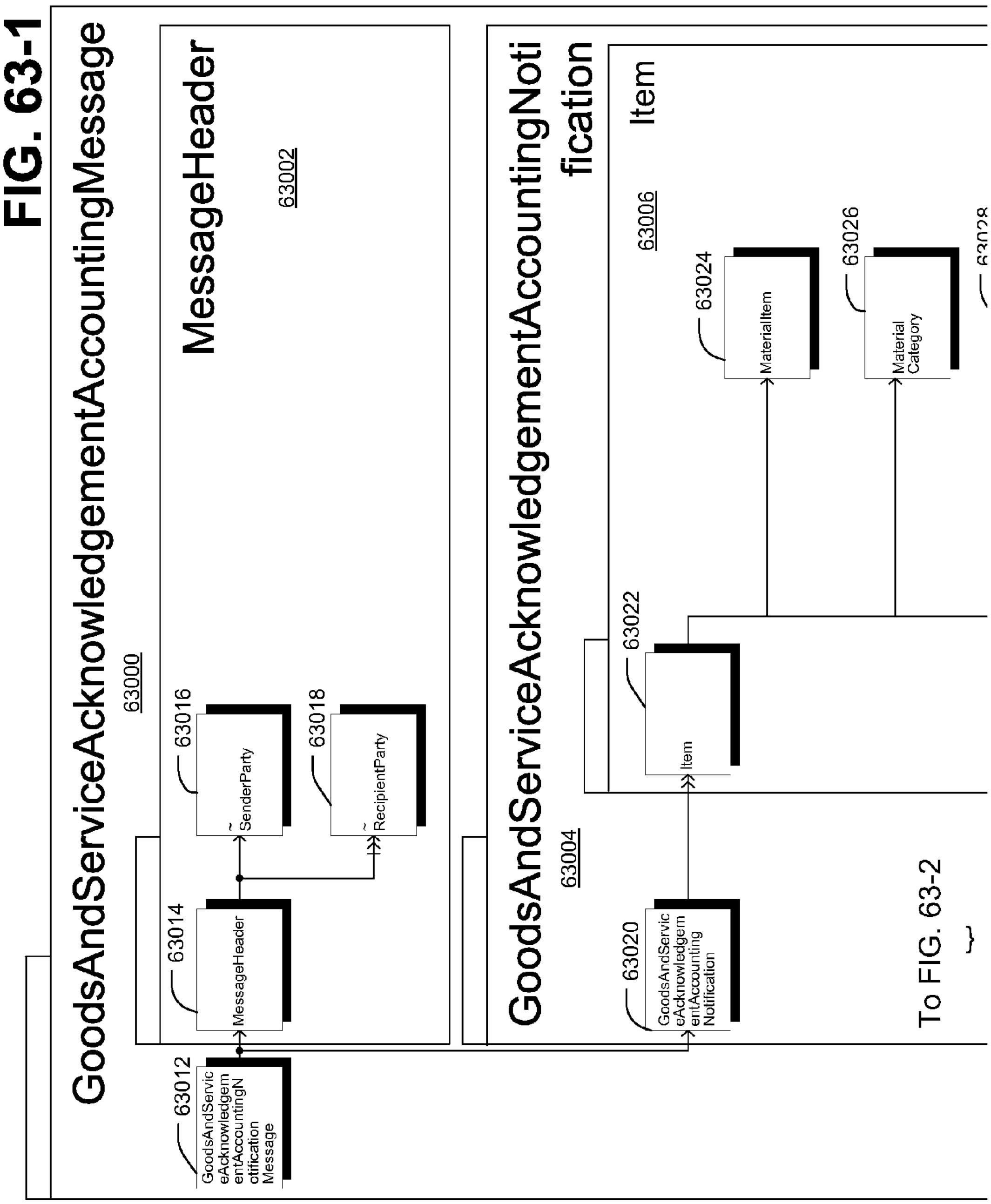
Figures 2, 63:
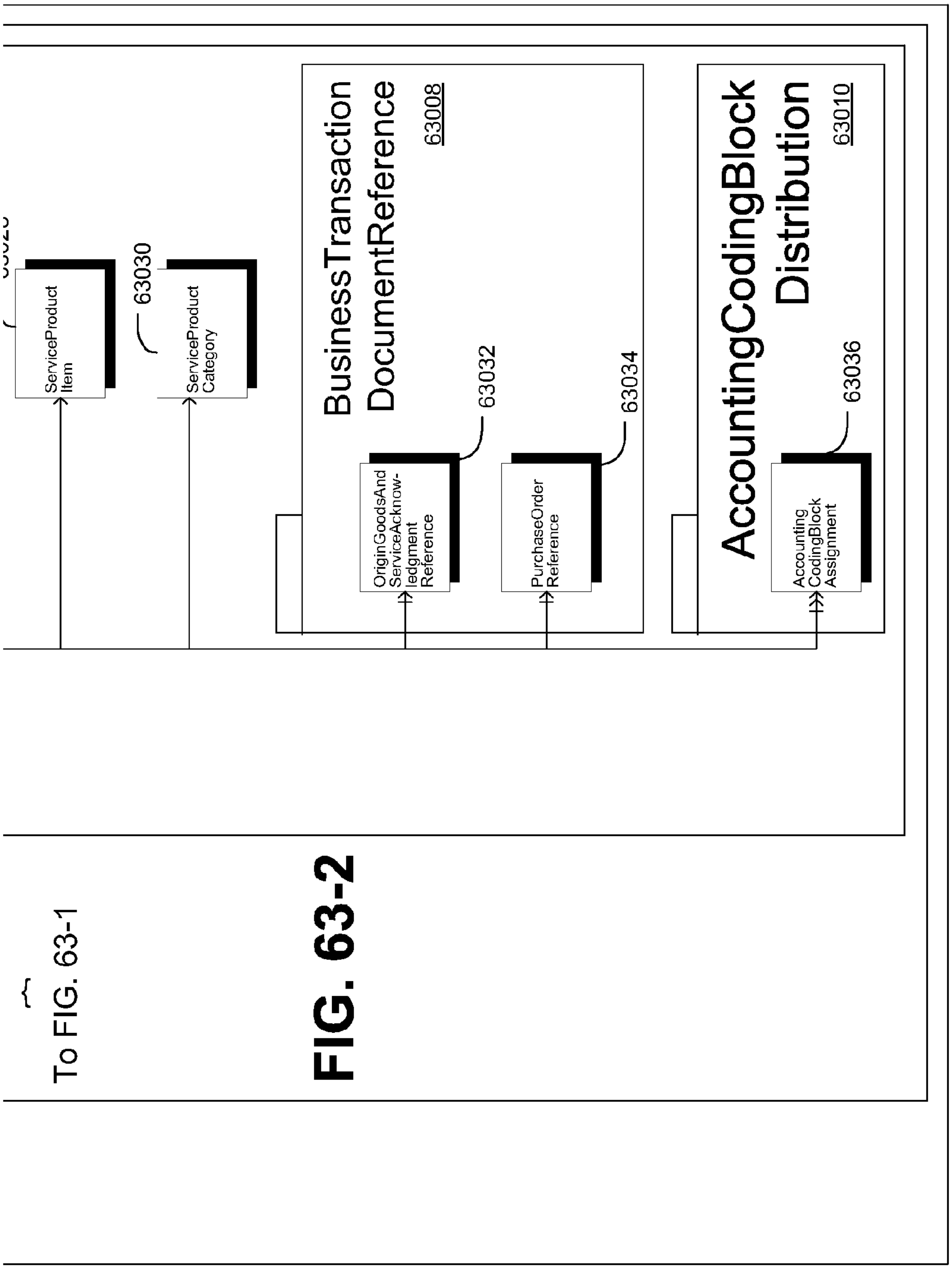

FIG. 63-1 through 63-3 illustrates one example logical configuration of GoodsAndServiceAcknowledgementAccountingMessage message 63000. Specifically, this figure depicts the arrangement and hierarchy of various components such as one or more levels of packages, entities, and datatypes, shown here as 63000 though 63036. As described above, packages may be used to represent hierarchy levels. Entities are discrete business elements that are used during a business transaction. Data types are used to type object entities and interfaces with a structure. For example, GoodsAndServiceAcknowledgementAccountingMessage message 63000 includes, among other things, GoodsAndServiceAcknowledgementAccounting 63004. Accordingly, heterogeneous applications may communicate using this consistent message configured as such.

Figures 1, 64:
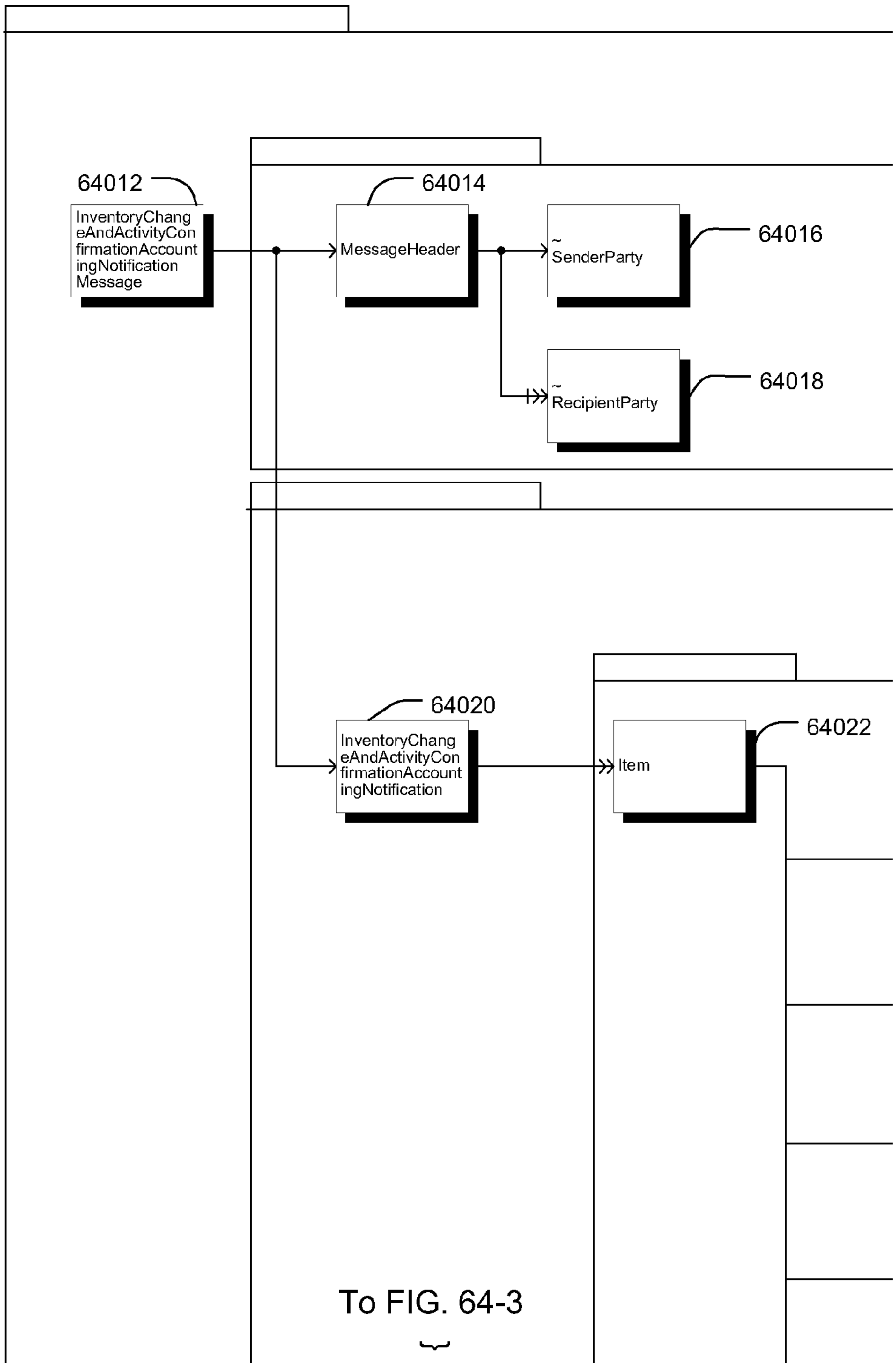
Figures 2, 64:
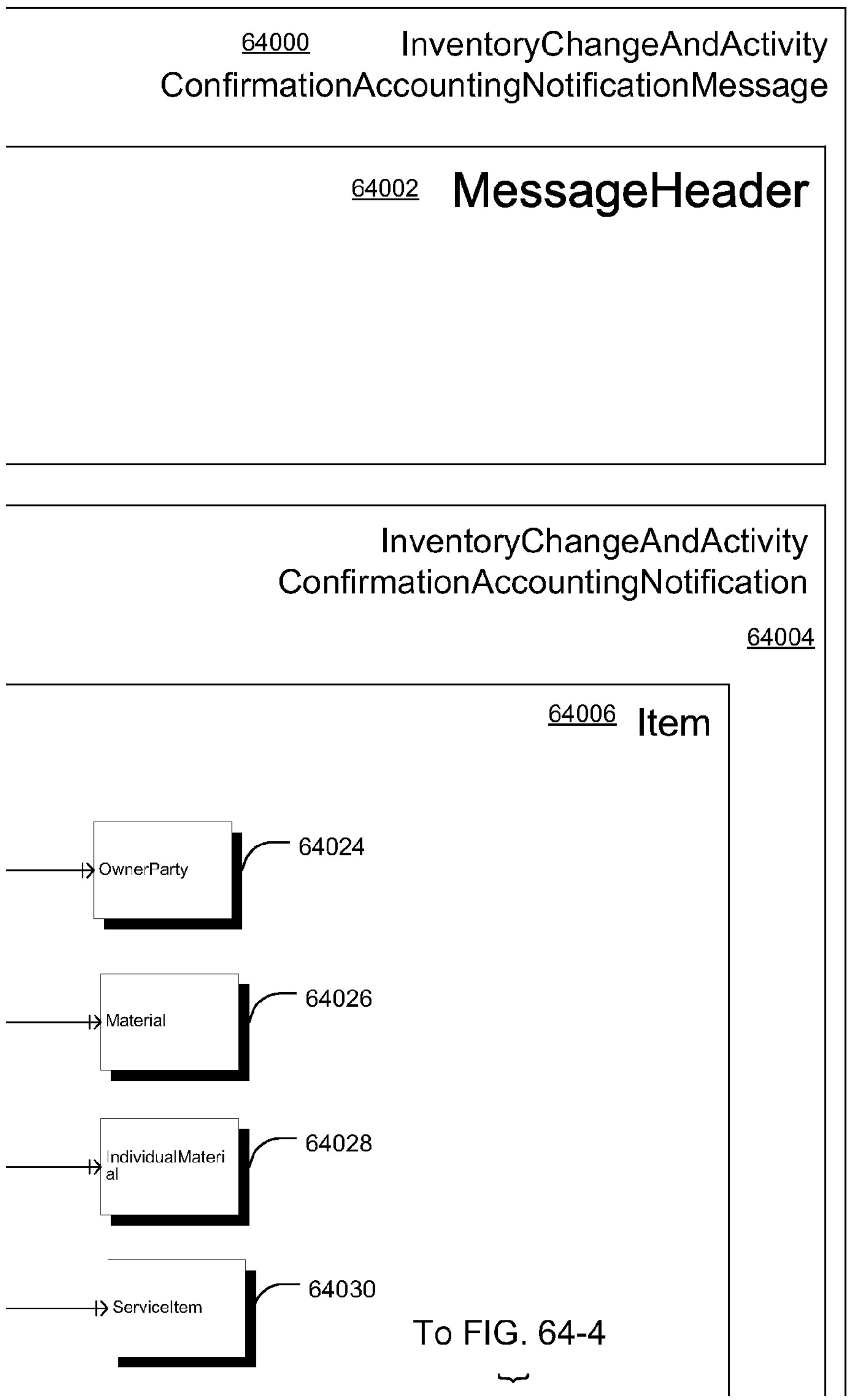
Figures 3, 64:
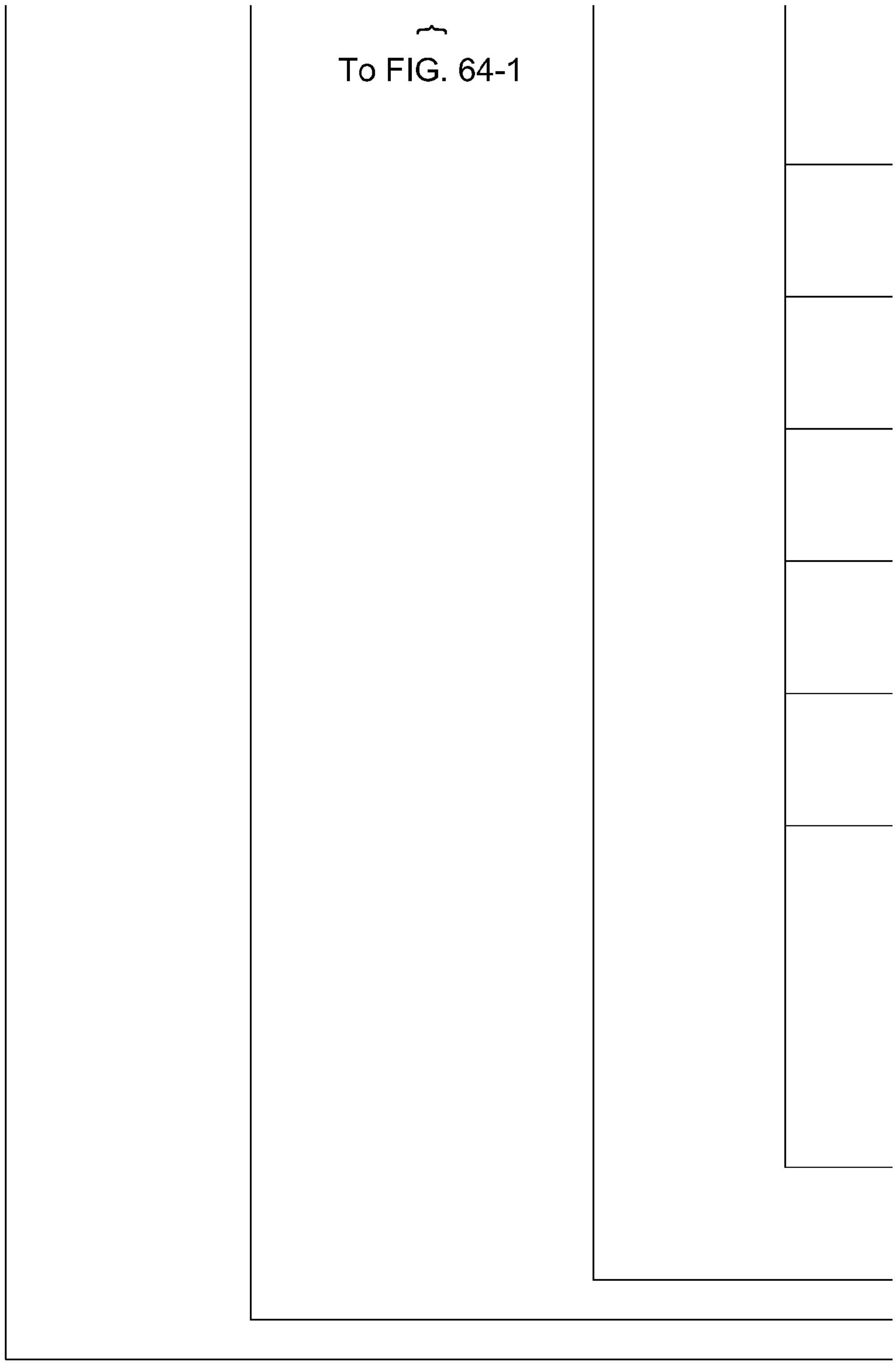
Figures 4, 64:
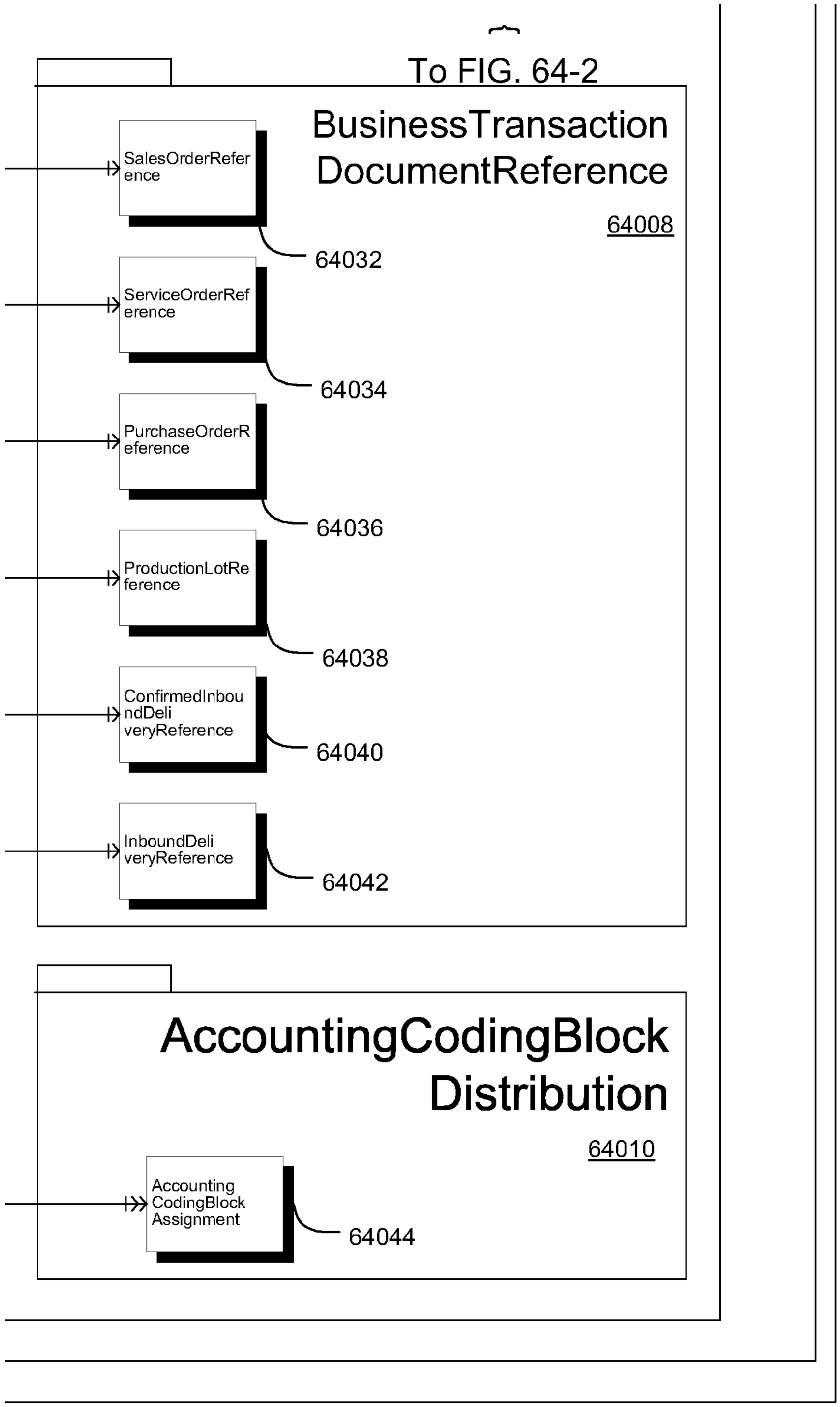

FIG. 64-1 through 64-3 illustrates one example logical configuration of InventoryChangeAndActivityConfirmationAccountingNotificationMessage message 64000. Specifically, this figure depicts the arrangement and hierarchy of various components such as one or more levels of packages, entities, and datatypes, shown here as 64000 though 64044. As described above, packages may be used to represent hierarchy levels. Entities are discrete business elements that are used during a business transaction. Data types are used to type object entities and interfaces with a structure. For example, InventoryChangeAndActivityConfirmationAccountingNotificationMessage message 64000 includes, among other things, InventoryChangeAndActivityConfirmationAccountingNotification 64004. Accordingly, heterogeneous applications may communicate using this consistent message configured as such.

Figures 1, 65:
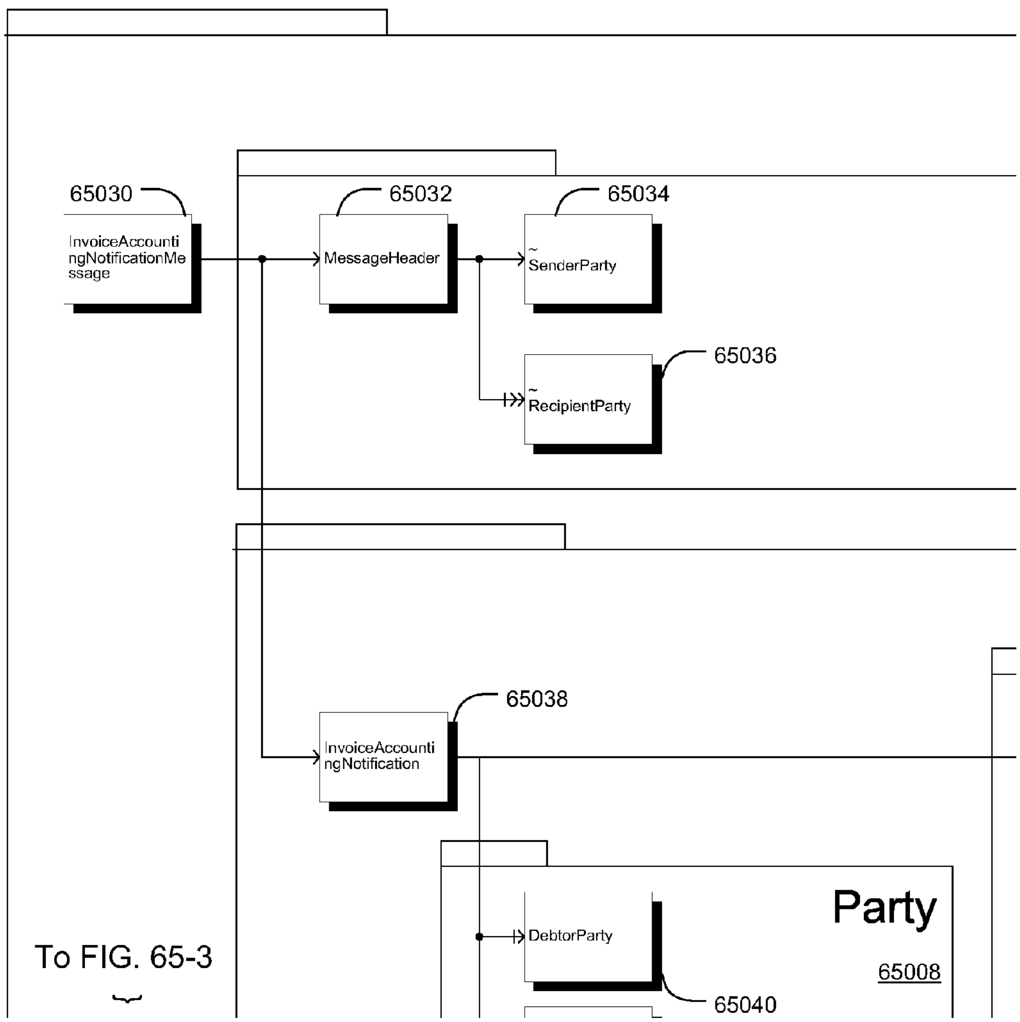
Figures 2, 65:
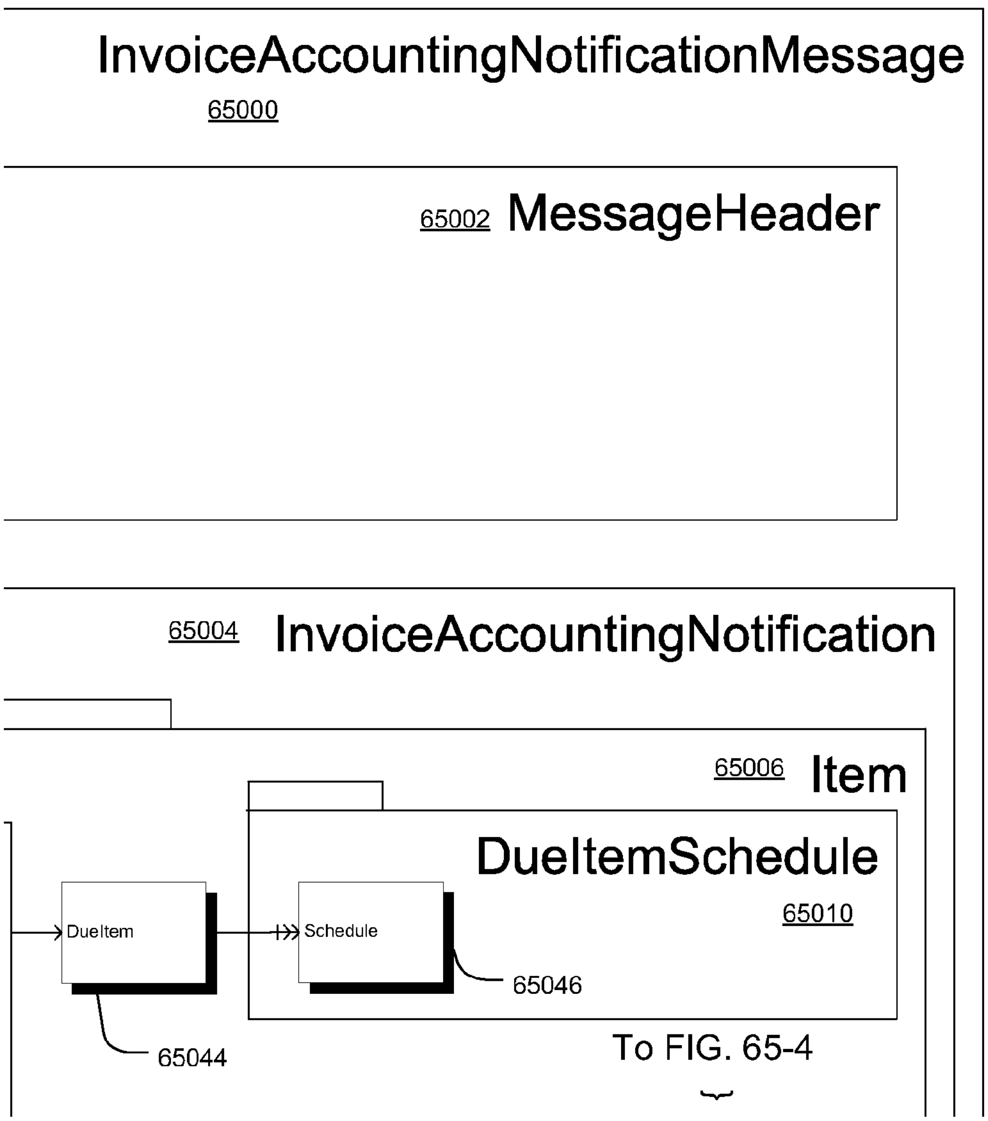
Figures 3, 65:
Figures 4, 65:
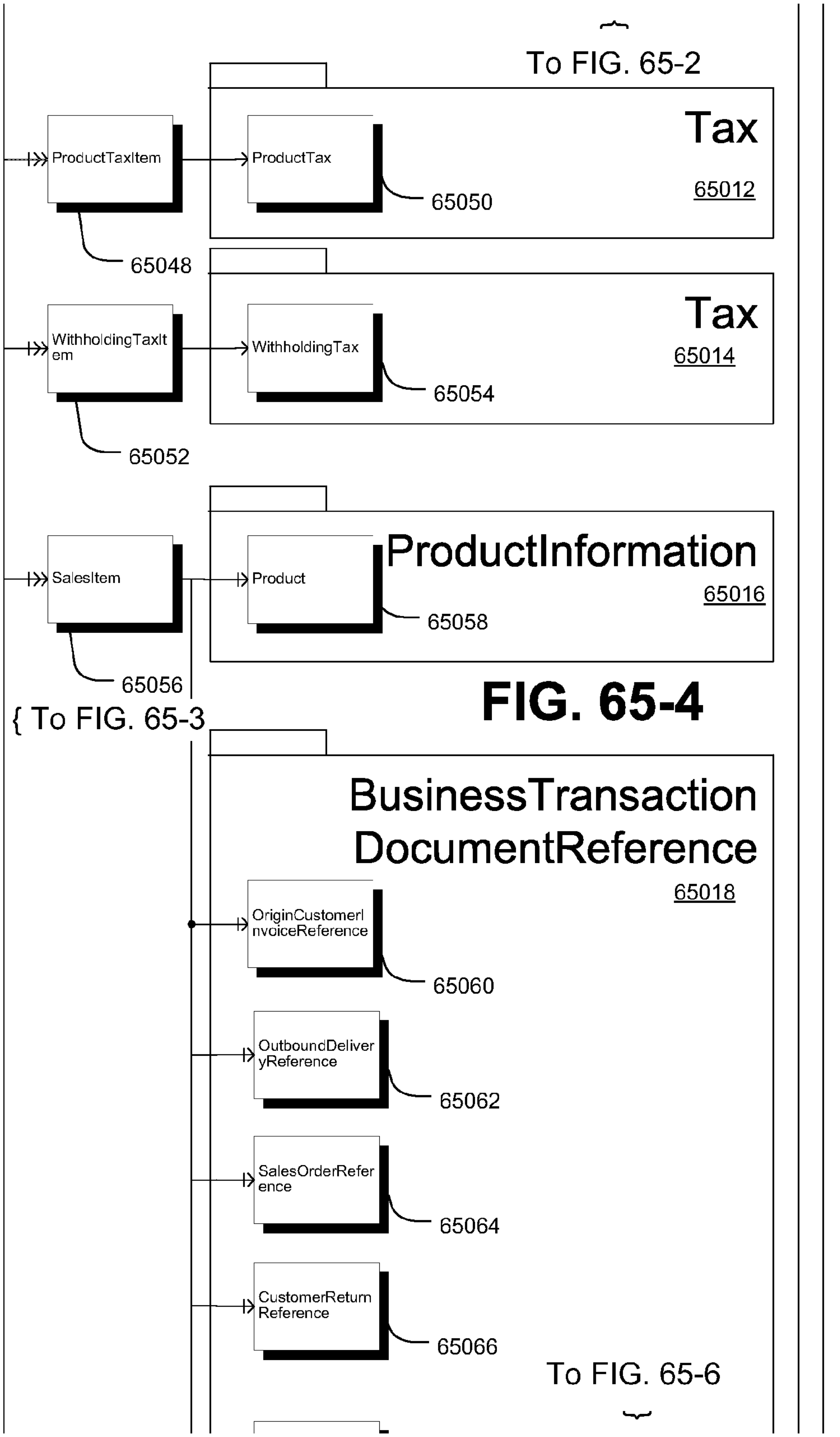
Figures 6, 65:
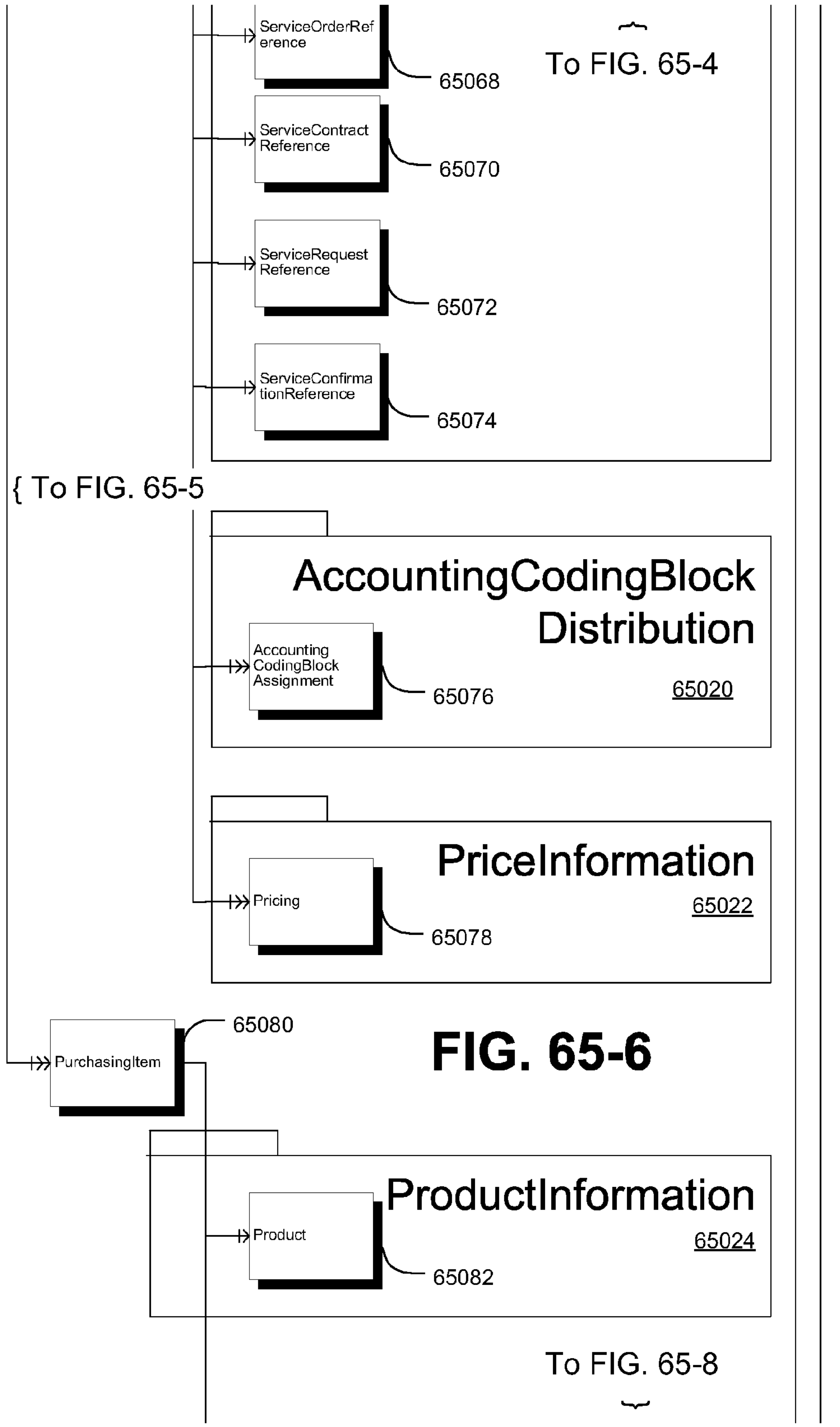
Figures 7, 65:
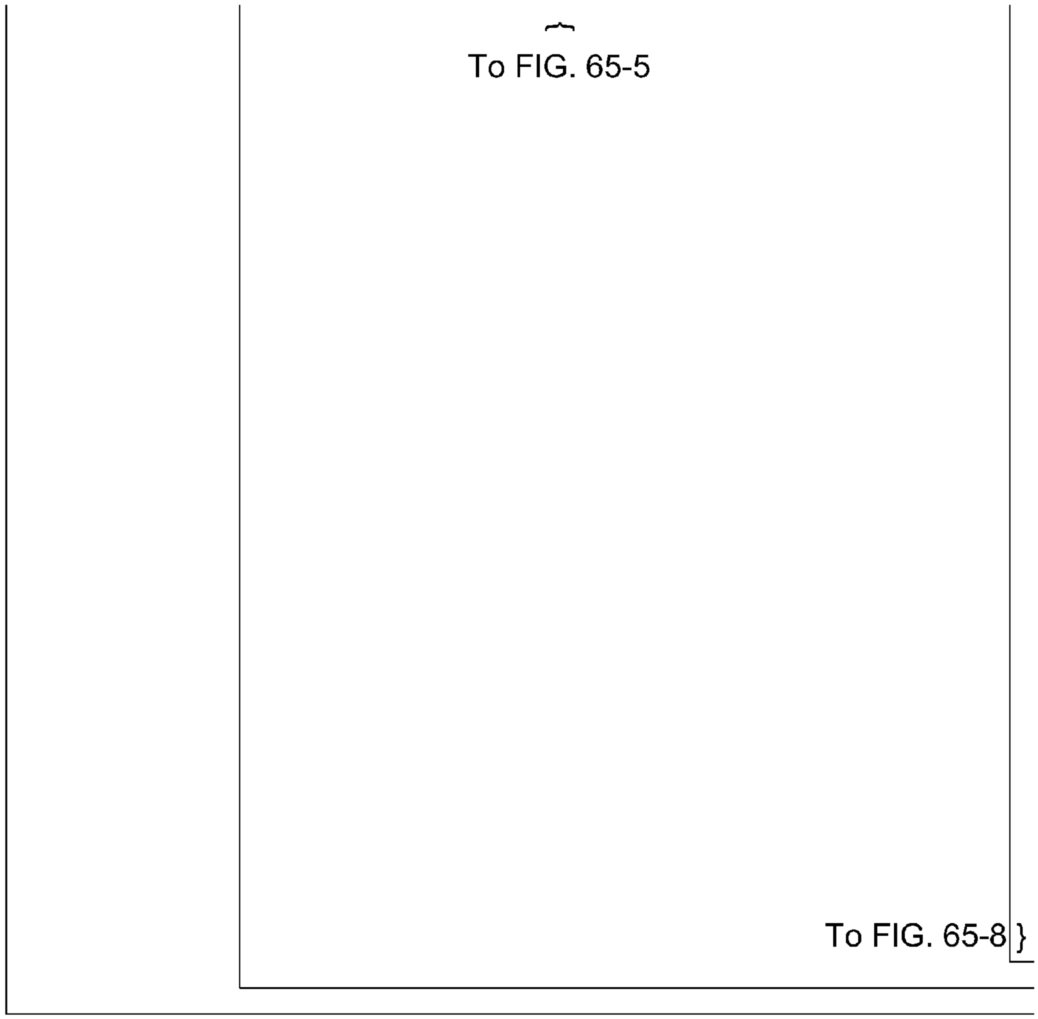
Figures 8, 65:
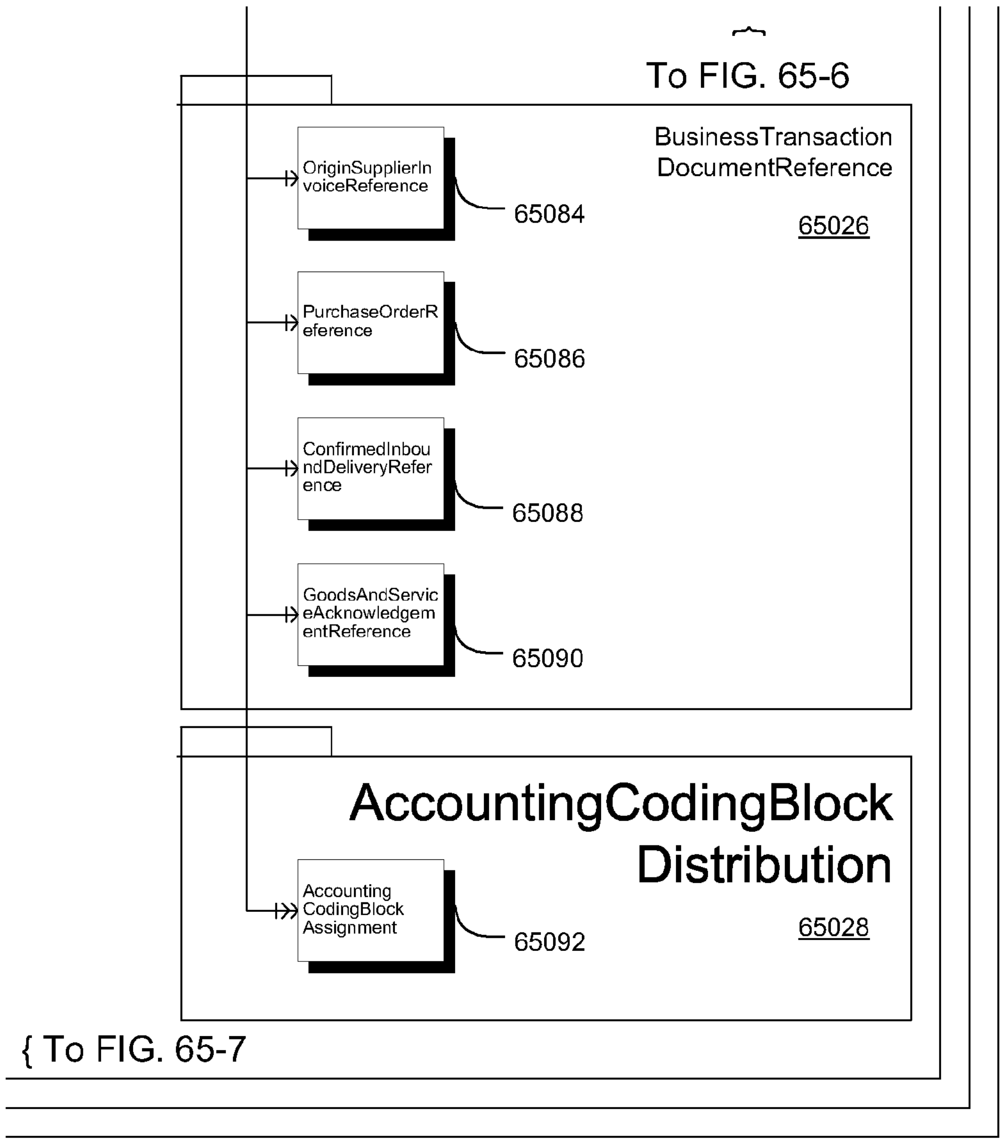

FIG. 65-1 through 65-8 illustrates one example logical configuration of InvoiceAccountingNotificationMessage message 65000. Specifically, this figure depicts the arrangement and hierarchy of various components such as one or more levels of packages, entities, and datatypes, shown here as 65000 though 65092. As described above, packages may be used to represent hierarchy levels. Entities are discrete business elements that are used during a business transaction. Data types are used to type object entities and interfaces with a structure. For example, InvoiceAccountingNotificationMessage message 65000 includes, among other things, InvoiceAccountingNotification 65004. Accordingly, heterogeneous applications may communicate using this consistent message configured as such.

Figures 1, 66:
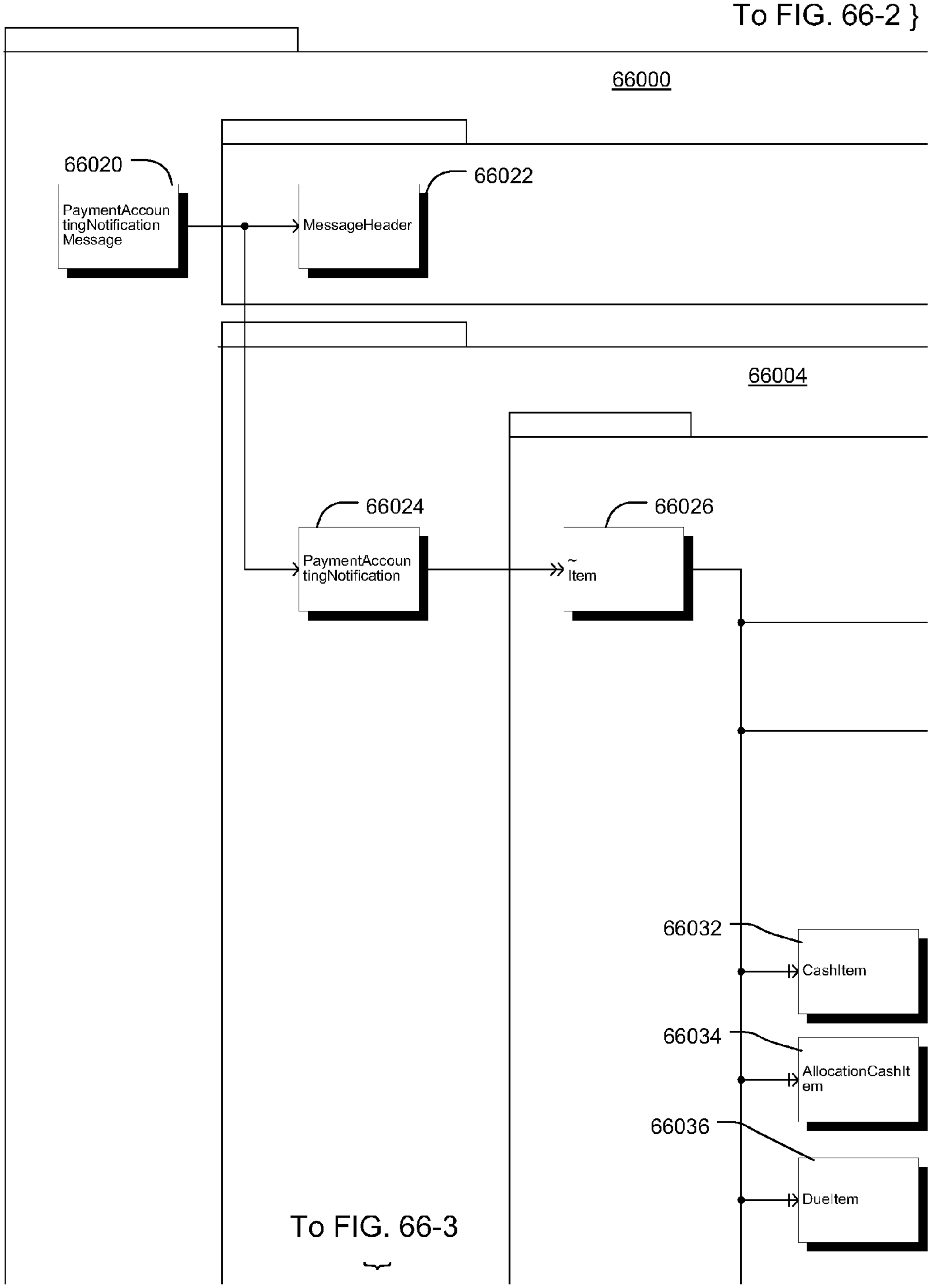
Figures 2, 66:
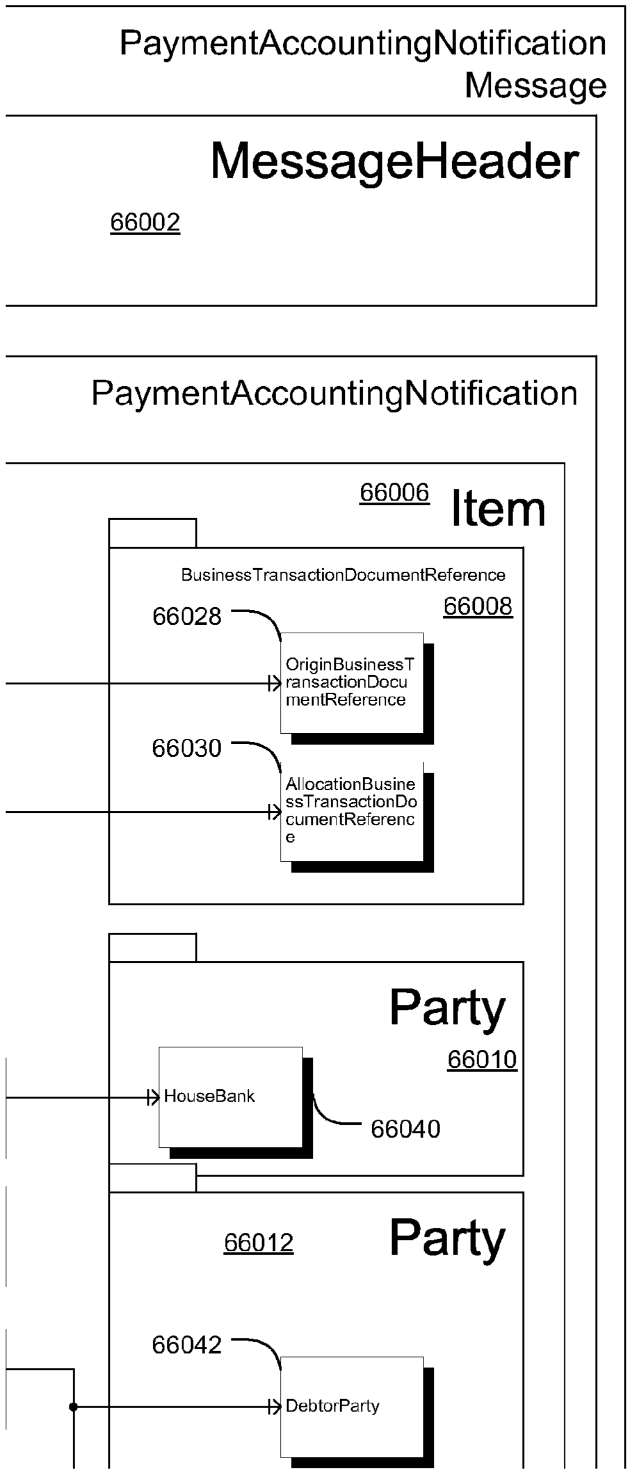
Figures 3, 66:
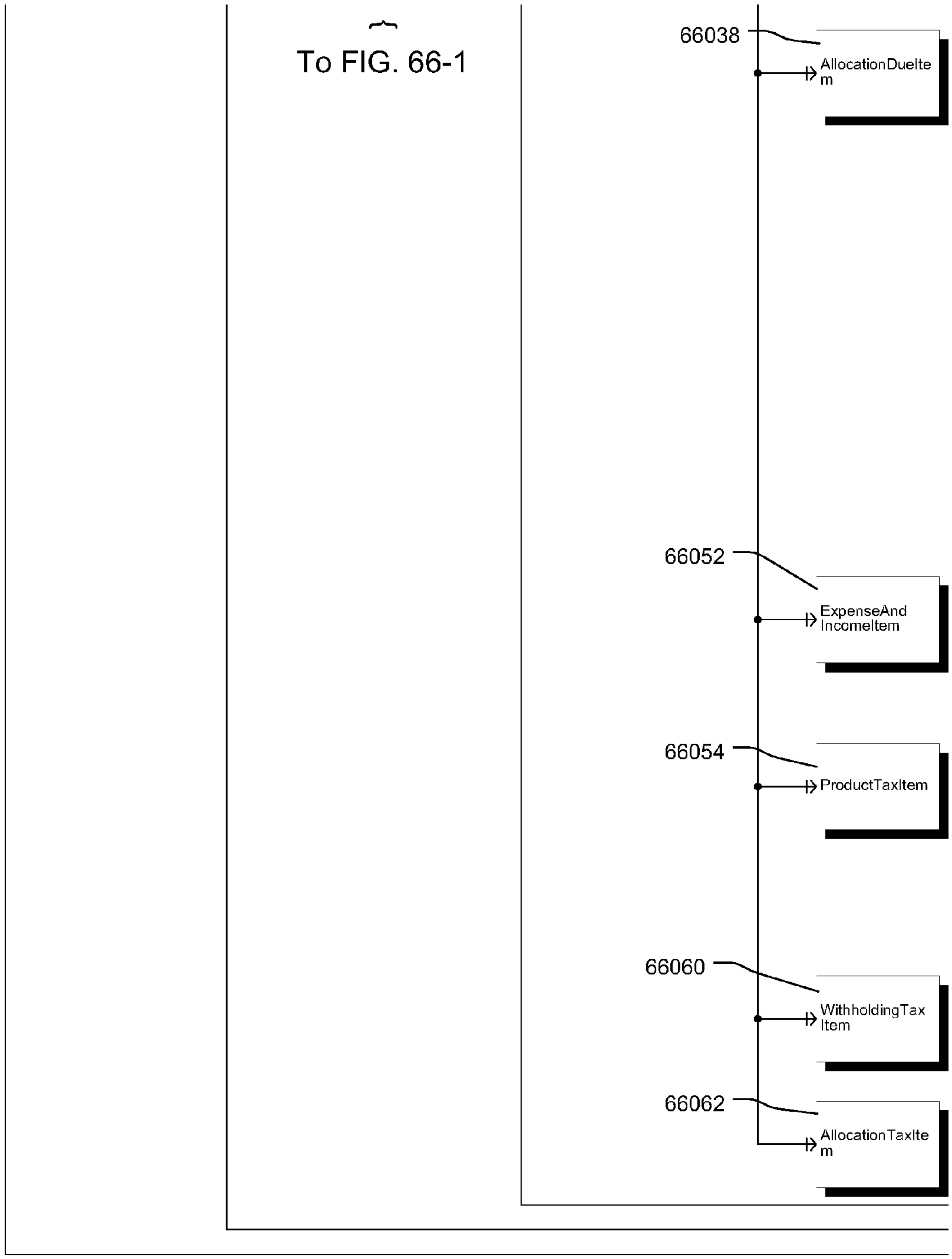
Figures 4, 66:
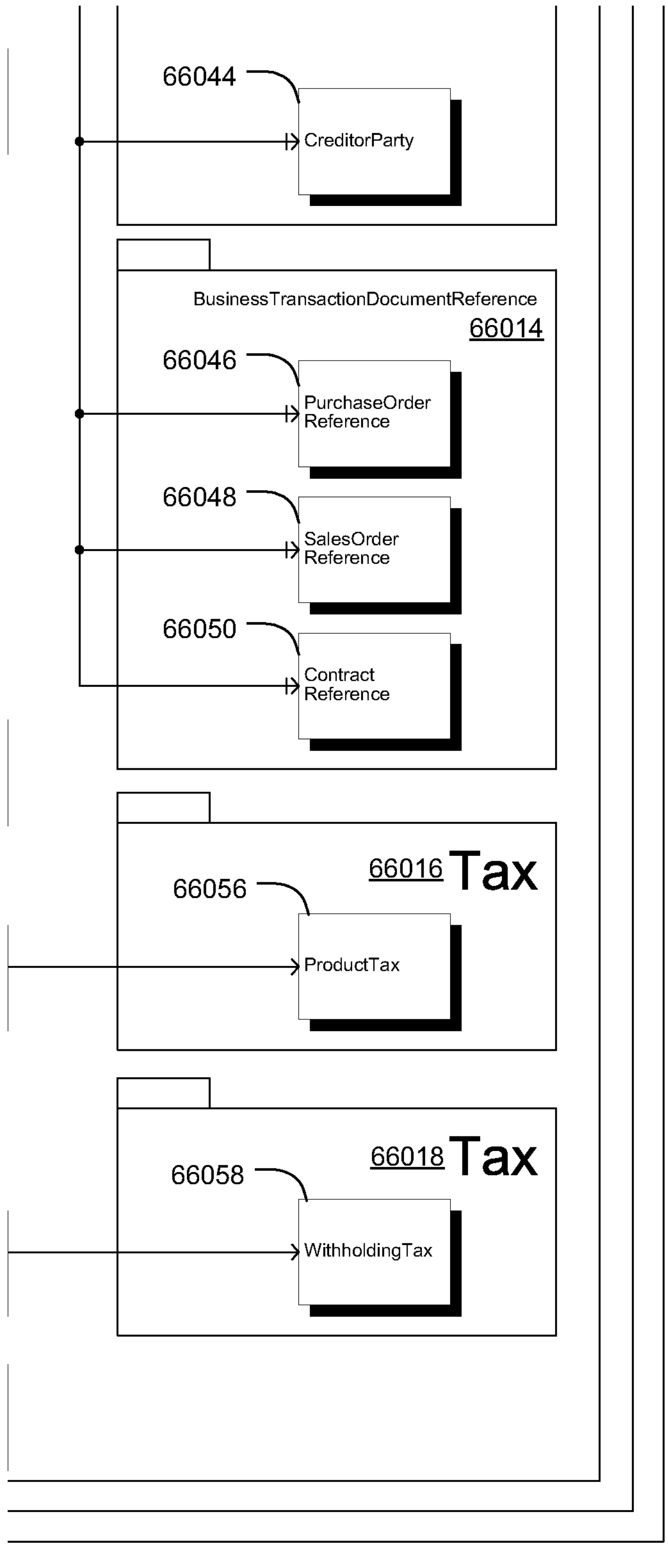

FIG. 66-1 through 66-4 illustrates one example logical configuration of PaymentAccountingNotificationMessage message 66000. Specifically, this figure depicts the arrangement and hierarchy of various components such as one or more levels of packages, entities, and datatypes, shown here as 66000 though 66062. As described above, packages may be used to represent hierarchy levels. Entities are discrete business elements that are used during a business transaction. Data types are used to type object entities and interfaces with a structure. For example, PaymentAccountingNotificationMessage message 66000 includes, among other things, PaymentAccountingNotification 66004. Accordingly, heterogeneous applications may communicate using this consistent message configured as such.

Figure 67:
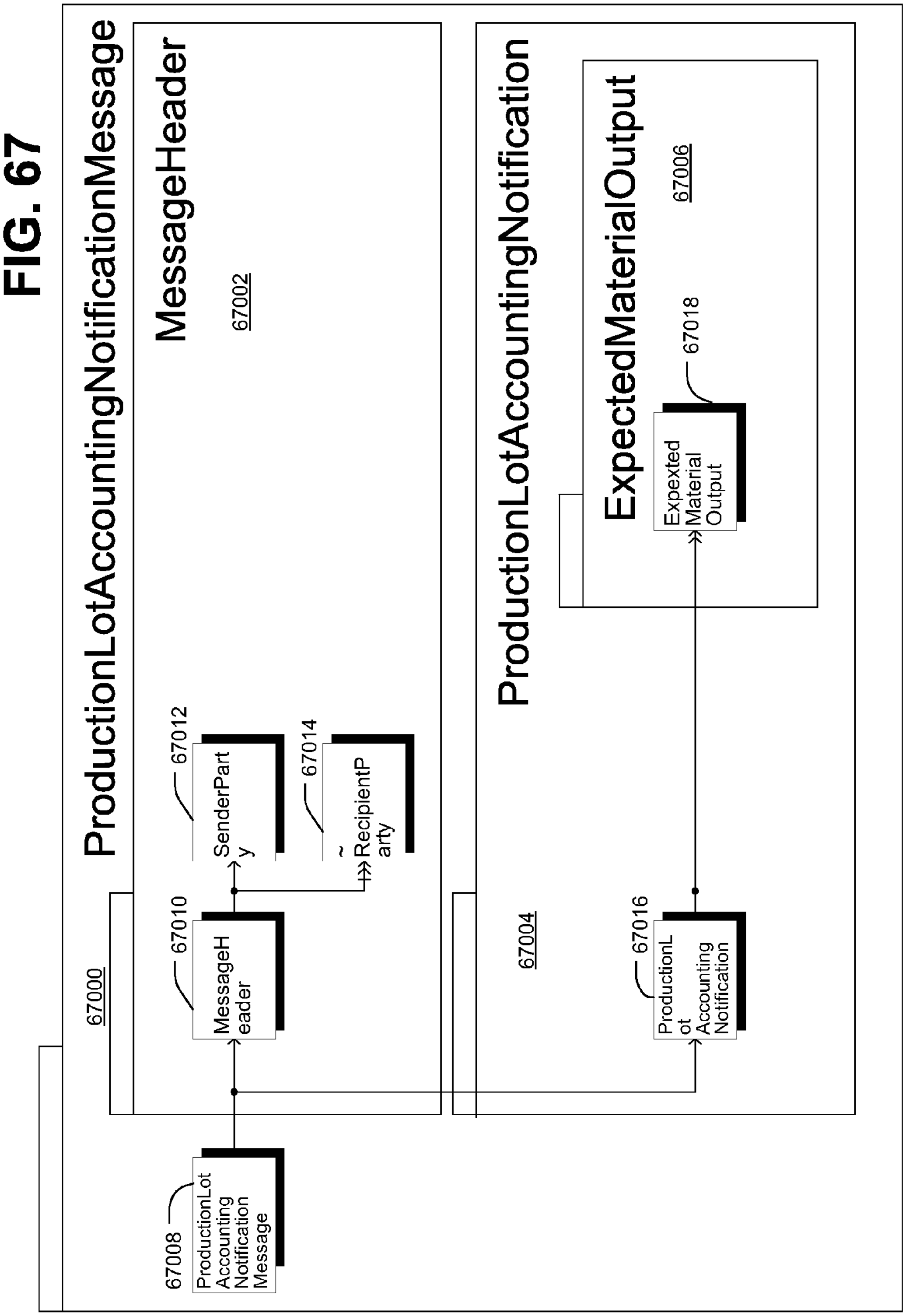
FIG. 67 shows an exemplary ProductionLotAccountingNotificationMessage Message Data Type.

FIG. 67 illustrates one example logical configuration of ProductionLotAccountingNotificationMessage message 67000. Specifically, this figure depicts the arrangement and hierarchy of various components such as one or more levels of packages, entities, and datatypes, shown here as 67000 though 67018. As described above, packages may be used to represent hierarchy levels. Entities are discrete business elements that are used during a business transaction. Data types are used to type object entities and interfaces with a structure. For example, ProductionLotAccountingNotificationMessage message 67000 includes, among other things, ProductionLotAccountingNotification 67004. Accordingly, heterogeneous applications may communicate using this consistent message configured as such.

Figure 68:
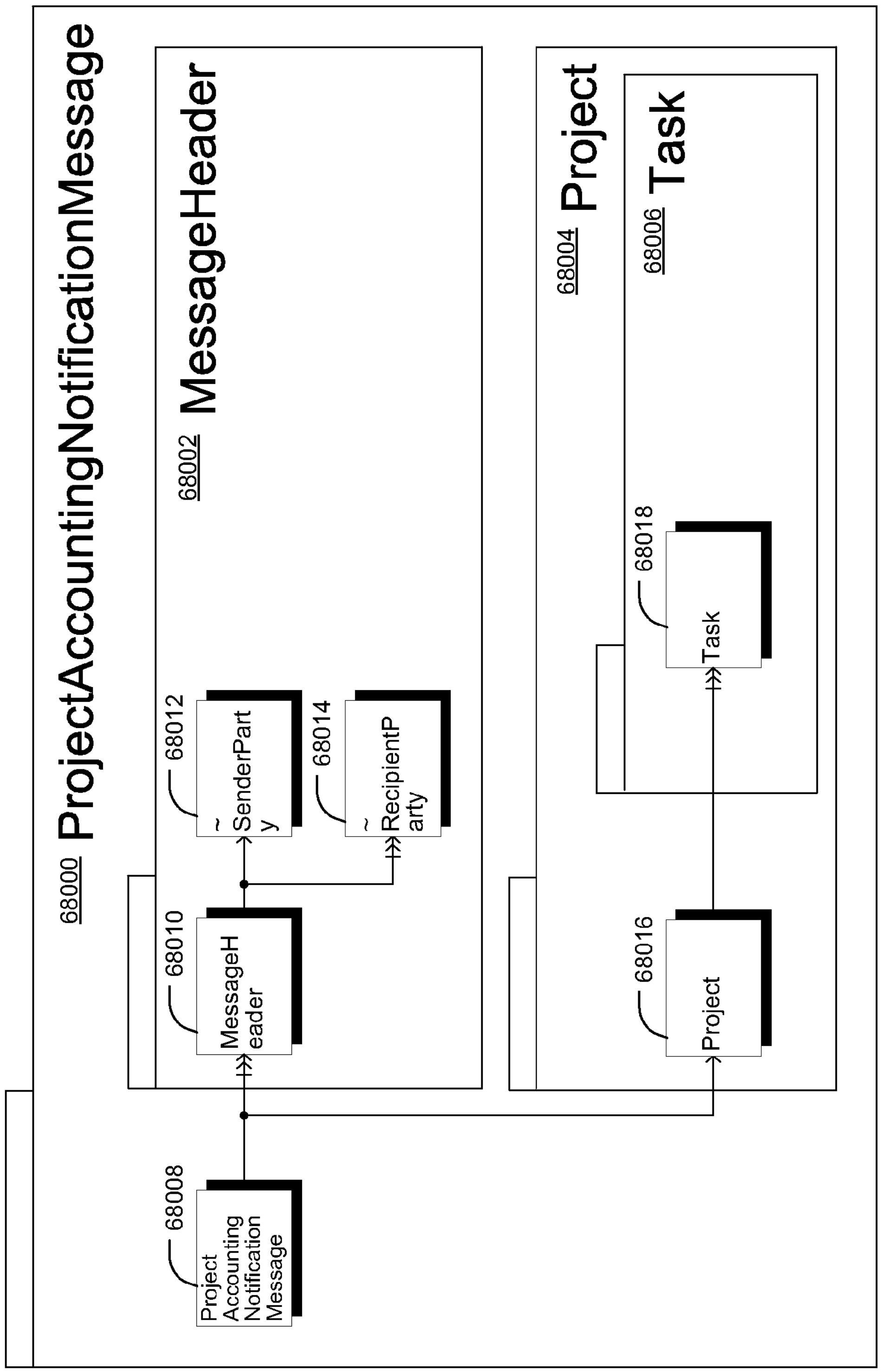
FIG. 68 shows an exemplary ProjectAccountingNotificationMessage Message Data Type.

FIG. 68 illustrates one example logical configuration of ProjectAccountingNotificationMessage message 68000. Specifically, this figure depicts the arrangement and hierarchy of various components such as one or more levels of packages, entities, and datatypes, shown here as 68000 though 68018. As described above, packages may be used to represent hierarchy levels. Entities are discrete business elements that are used during a business transaction. Data types are used to type object entities and interfaces with a structure. For example, ProjectAccountingNotificationMessage message 68000 includes, among other things, Project 68004. Accordingly, heterogeneous applications may communicate using this consistent message configured as such.

Figures 1, 69:
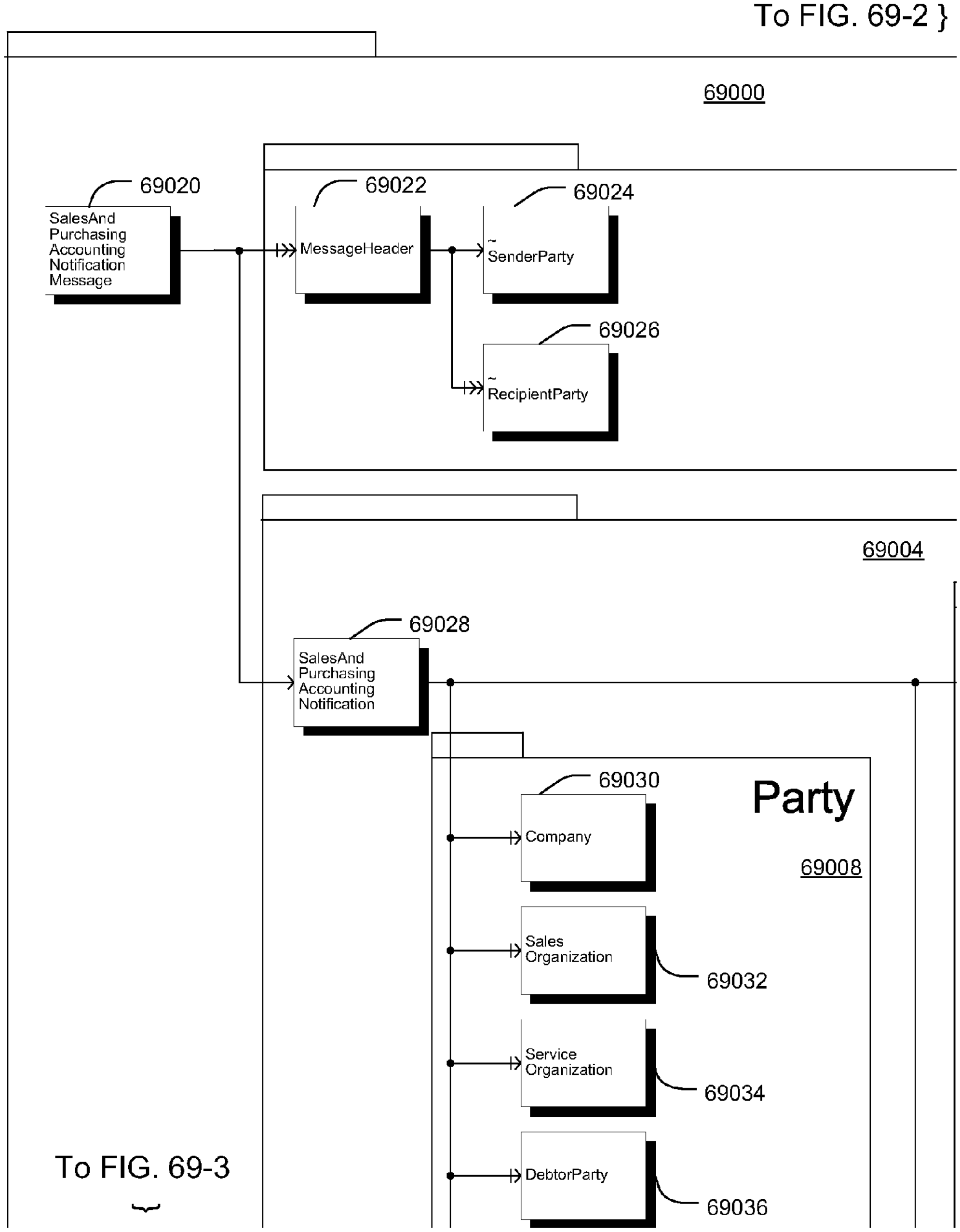
Figures 2, 69:
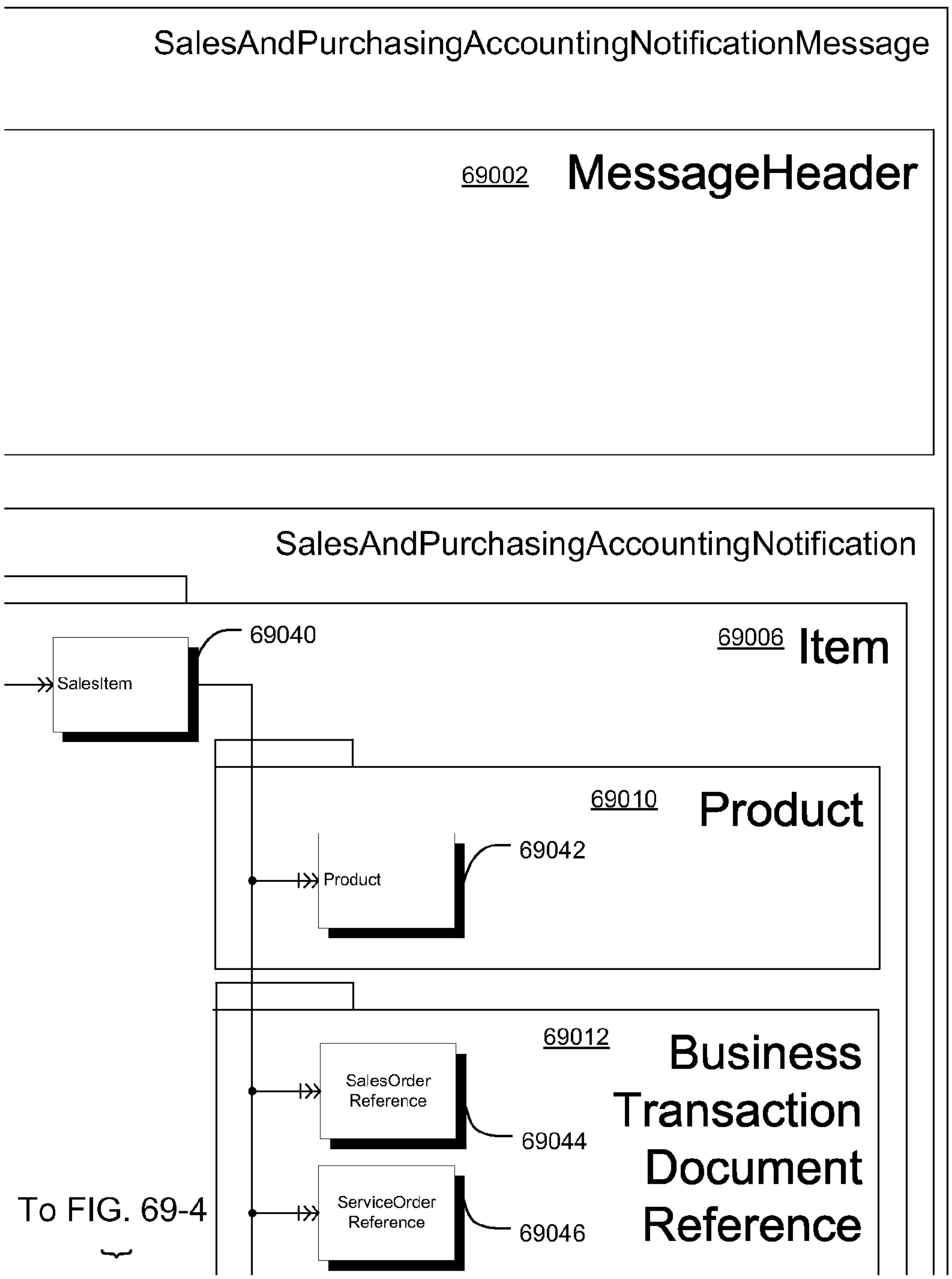
Figures 3, 69:
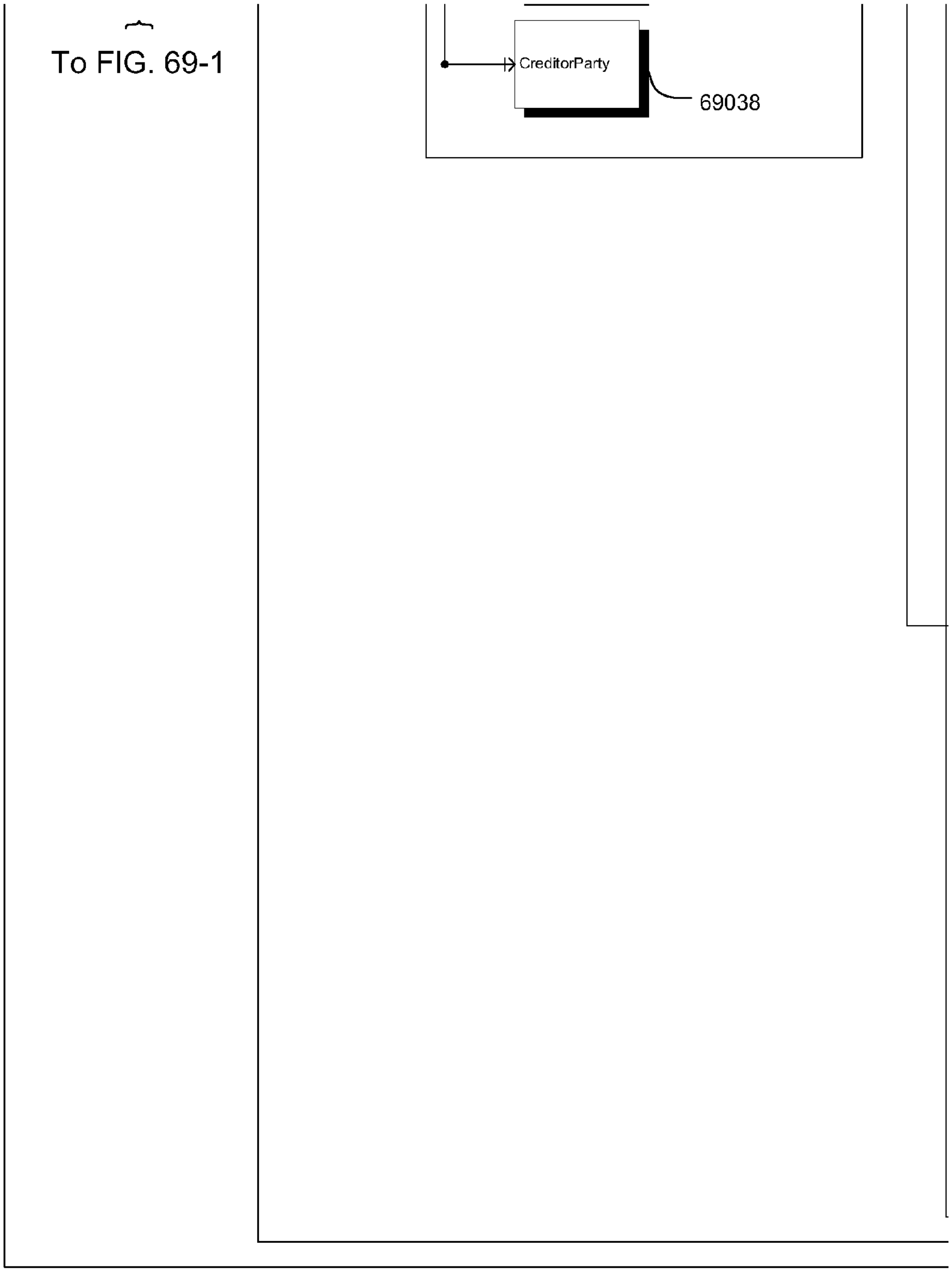
Figures 4, 69:
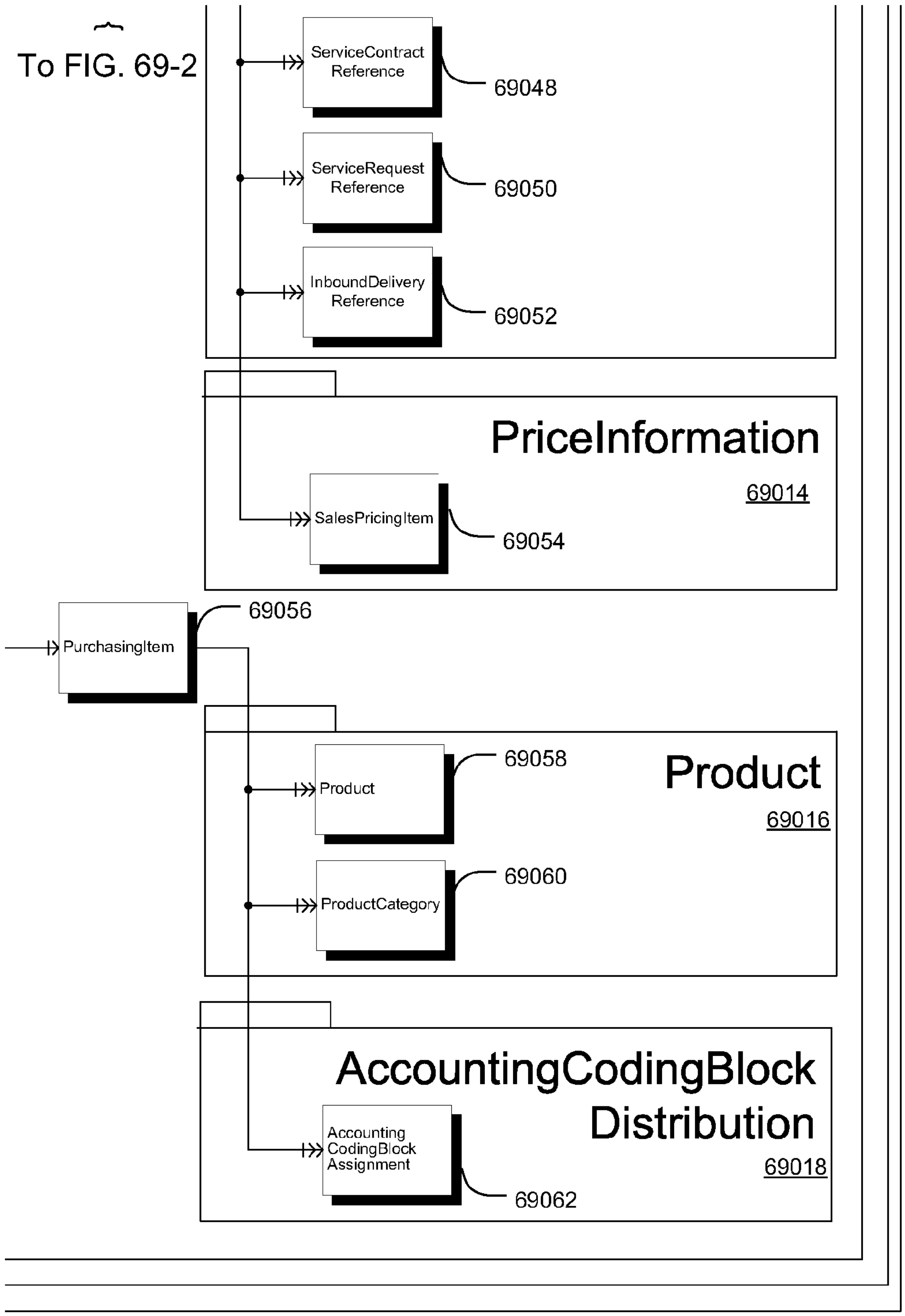

FIG. 69-1 through 69-4 illustrates one example logical configuration of SalesAndPurchasingAccountingNotificationMessage message 69000. Specifically, this figure depicts the arrangement and hierarchy of various components such as one or more levels of packages, entities, and datatypes, shown here as 69000 though 69062. As described above, packages may be used to represent hierarchy levels. Entities are discrete business elements that are used during a business transaction. Data types are used to type object entities and interfaces with a structure. For example, SalesAndPurchasingAccountingNotificationMessage message 69000 includes, among other things, SalesAndPurchasingAccountingNotification 69004. Accordingly, heterogeneous applications may communicate using this consistent message configured as such.

Figure 70:
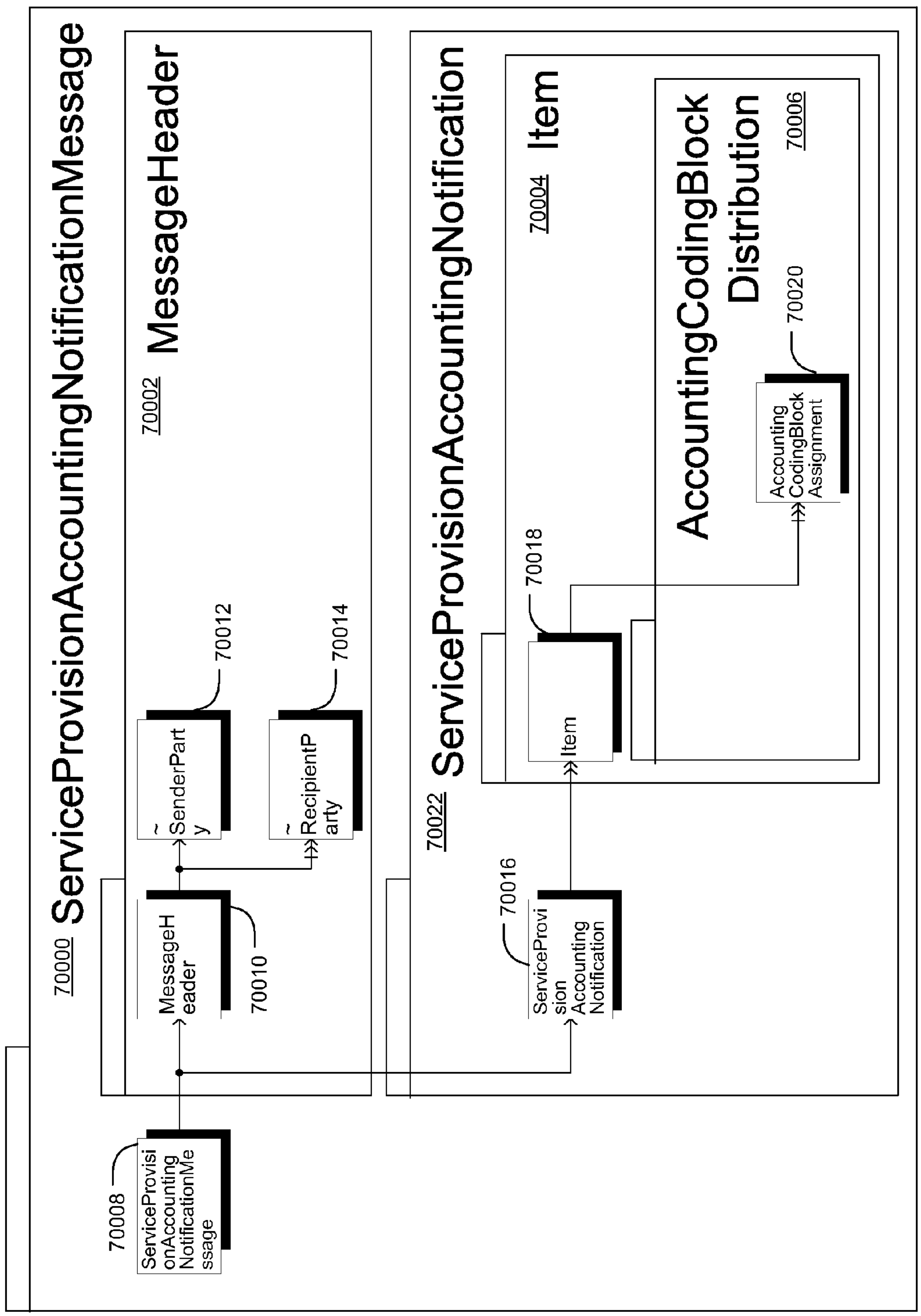
FIG. 70 shows an exemplary ServiceProvisionAccountingNotificationMessage Message Data Type.

FIG. 70 illustrates one example logical configuration of ServiceProvisionAccountingNotificationMessage message 70000. Specifically, this figure depicts the arrangement and hierarchy of various components such as one or more levels of packages, entities, and datatypes, shown here as 70000 though 70022. As described above, packages may be used to represent hierarchy levels. Entities are discrete business elements that are used during a business transaction. Data types are used to type object entities and interfaces with a structure. For example, ServiceProvisionAccountingNotificationMessage message 70000 includes, among other things, ServiceProvisionAccountingNotification 70022. Accordingly, heterogeneous applications may communicate using this consistent message configured as such.

FIG. 71-1 through 71-11 illustrates one example logical configuration of ExpenseReportAccountingNotificationMessage message 71000. Specifically, this figure depicts the arrangement and hierarchy of various components such as one or more levels of packages, entities, and datatypes, shown here as 71000 through 71270. As described above, packages may be used to represent hierarchy levels. Entities are discrete business elements that are used during a business transaction. Data types are used to type object entities and interfaces with a structure. For example, ExpenseReportAccountingNotificationMessage message 71000 includes, among other things, ExpenseReportAccountingNotification 71032. Accordingly, heterogeneous applications may communicate using this consistent message configured as such.

FIG. 72-1 through 72-14 illustrates one example logical configuration of GoodsAndServiceAcknowledgementAccountingMessage message 72000. Specifically, this figure depicts the arrangement and hierarchy of various components such as one or more levels of packages, entities, and datatypes, shown here as 72000 through 72194. As described above, packages may be used to represent hierarchy levels. Entities are discrete business elements that are used during a business transaction. Data types are used to type object entities and interfaces with a structure. For example, GoodsAndServiceAcknowledgementAccountingMessage message 72000 includes, among other things, GoodsAndServiceAcknowledgement 72038. Accordingly, heterogeneous applications may communicate using this consistent message configured as such.

FIG. 73-1 through 73-14 illustrates one example logical configuration of InventoryChangeAndActivityConfirmationAccountingMessage message 73000. Specifically, this figure depicts the arrangement and hierarchy of various components such as one or more levels of packages, entities, and datatypes, shown here as 73000 through 73248. As described above, packages may be used to represent hierarchy levels. Entities are discrete business elements that are used during a business transaction. Data types are used to type object entities and interfaces with a structure. For example, InventoryChangeAndActivityConfirmationAccountingMessage message 73000 includes, among other things, InventoryChangeAndActivityConfirmation 73038. Accordingly, heterogeneous applications may communicate using this consistent message configured as such.

FIG. 74-1 through 74-19 illustrates one example logical configuration of InvoiceAccountingNotificationMessage message 74000. Specifically, this figure depicts the arrangement and hierarchy of various components such as one or more levels of packages, entities, and datatypes, shown here as 74000 through 74544. As described above, packages may be used to represent hierarchy levels. Entities are discrete business elements that are used during a business transaction. Data types are used to type object entities and interfaces with a structure. For example, InvoiceAccountingNotificationMessage message 74000 includes, among other things, InvoiceAccountingNotification 74032. Accordingly, heterogeneous applications may communicate using this consistent message configured as such.

FIG. 75-1 through 75-4 illustrates one example logical configuration of CancellationAccountingMessage message 75000. Specifically, this figure depicts the arrangement and hierarchy of various components such as one or more levels of packages, entities, and datatypes, shown here as 75000 through 75084. As described above, packages may be used to represent hierarchy levels. Entities are discrete business elements that are used during a business transaction. Data types are used to type object entities and interfaces with a structure. For example, CancellationAccountingMessage message 75000 includes, among other things, CancellationAccountingNotification 75016. Accordingly, heterogeneous applications may communicate using this consistent message configured as such.

FIG. 76-1 through 76-12 illustrates one example logical configuration of OpenItemAccountingNotificationMessage message 76000. Specifically, this figure depicts the arrangement and hierarchy of various components such as one or more levels of packages, entities, and datatypes, shown here as 76000 through 76340. As described above, packages may be used to represent hierarchy levels. Entities are discrete business elements that are used during a business transaction. Data types are used to type object entities and interfaces with a structure. For example, OpenItemAccountingNotificationMessage message 76000 includes, among other things, OpenItemAccountingNotification 76032. Accordingly, heterogeneous applications may communicate using this consistent message configured as such.

FIG. 77-1 through 77-26 illustrates one example logical configuration of PaymentAccountingNotificationMessage message 77000. Specifically, this figure depicts the arrangement and hierarchy of various components such as one or more levels of packages, entities, and datatypes, shown here as 77000 through 77536. As described above, packages may be used to represent hierarchy levels. Entities are discrete business elements that are used during a business transaction. Data types are used to type object entities and interfaces with a structure. For example, PaymentAccountingNotificationMessage message 77000 includes, among other things, PaymentAccountingNotification 77032. Accordingly, heterogeneous applications may communicate using this consistent message configured as such.

FIG. 78-1 through 78-3 illustrates one example logical configuration of ProductionLotAccountingNotification message 78000. Specifically, this figure depicts the arrangement and hierarchy of various components such as one or more levels of packages, entities, and datatypes, shown here as 78000 through 78106. As described above, packages may be used to represent hierarchy levels. Entities are discrete business elements that are used during a business transaction. Data types are used to type object entities and interfaces with a structure. For example, ProductionLotAccountingNotification message 78000 includes, among other things, ProductionLotAccountingNotification 78038. Accordingly, heterogeneous applications may communicate using this consistent message configured as such.

FIG. 79-1 through 79-3 illustrates one example logical configuration of ProjectAccountingNotificationMessage message 79000. Specifically, this figure depicts the arrangement and hierarchy of various components such as one or more levels of packages, entities, and datatypes, shown here as 79000 through 79096. As described above, packages may be used to represent hierarchy levels. Entities are discrete business elements that are used during a business transaction. Data types are used to type object entities and interfaces with a structure. For example, ProjectAccountingNotificationMessage message 79000 includes, among other things, Project 79016. Accordingly, heterogeneous applications may communicate using this consistent message configured as such.

FIG. 80-1 through 80-12 illustrates one example logical configuration of SalesAndPurchasingAccountingNotificationMessage message 80000. Specifically, this figure depicts the arrangement and hierarchy of various components such as one or more levels of packages, entities, and datatypes, shown here as 80000 through 80324. As described above, packages may be used to represent hierarchy levels. Entities are discrete business elements that are used during a business transaction. Data types are used to type object entities and interfaces with a structure. For example, SalesAndPurchasingAccountingNotificationMessage message 80000 includes, among other things, SalesAndPurchasingAccountingNotification 80034. Accordingly, heterogeneous applications may communicate using this consistent message configured as such.

FIG. 81-1 through 81-5 illustrates one example logical configuration of ServiceProvisionAccountingNotificationMessage message 81000. Specifically, this figure depicts the arrangement and hierarchy of various components such as one or more levels of packages, entities, and datatypes, shown here as 81000 through 81138. As described above, packages may be used to represent hierarchy levels. Entities are discrete business elements that are used during a business transaction. Data types are used to type object entities and interfaces with a structure. For example, ServiceProvisionAccountingNotificationMessage message 81000 includes, among other things, ServiceProvisionAccountingNotification 81036. Accordingly, heterogeneous applications may communicate using this consistent message configured as such.

Message Types and their Signatures

This section describes the message types and their signatures that are derived from the operations of the AccountingNotification business object. In a signature, the business object is contained as a "leading" business object. The message data type defines the structure of the following message types. The ProductionLotAccountingNotification message type is motivated by the Make to Stock and Make to Order business scenarios. After the production lot is created in Logistics, a message is sent to Financial Accounting to create the associated ProductionLedgerAccount. Changes to the ProductionLot are likewise communicated in the message so that the changes can be reflected in the ProductionLedgerAccount. The SalesAndPurchasingAccountingNotification message type is motivated by the Procure to Stock, Sell from Stock, Service Management, and Service Request Management business scenarios. For the Plan Driven Procurement business scenario, after the purchase order is created in Purchasing, a message is transmitted to Financial Accounting with information on the order so that the goods can be properly valuated at the time of the goods receipt or invoice receipt, for example. This order information has to be stored because the incoming invoice may not necessarily have arrived at the time the goods are received. Without the order information it would not be possible to correctly valuate the goods receipt in such cases, particularly with products that use a moving average price.

For the Sell from Stock, Service Management, and Service Request Management business scenarios, after the customer contract or sales order this message can be transmitted to Financial Accounting with information on the revenues, sales deductions, and so on. Additional data needed in Accounting is derived from the transmitted sales and purchasing data (such as the overhead structure). The ProjectAccountingNotification message type is motivated by the Internal Projects business scenario.

After a project is created or changed in Project Management, a message is sent to Financial Accounting to capture financials-related information on the project for this business scenario. This can be necessary in order for the business transactions associated with the project to be reflected in Accounting. The GoodsAndServiceAcknowledgementAccountingNotification message type is motivated by the Service Procurement and Self-Service Procurement business scenarios. The GoodsAndServiceAcknowledgmentAccountingNotification message type is motivated by business transactions where the consumption of externally procured materials or the use of external services is recorded in the Purchasing DU and communicated to the Accounting DU. Processing the data transferred across this interface in the AccountingProcessing process component can result in postings of actual costs. The InventoryChangeAndActivityConfirmationAccountingNotification message type is motivated by the Make to Stock and Make to Order business scenarios. The InventoryChangeAndActivityConfirmationAccountingNotification message type is motivated by the business transactions that capture goods movements and/or the usage of internal activities in the LEX DU that could be relevant to the AccountingProcessing DU.

Business transactions such as inventory changes, inventory differences, and confirmations of activity consumption in production are captured and processed in SCM in three process components: SiteLogisticsConfirmation, ProductionConfirmation, and GoodsAndActivityConfirmation. The documents can be persisted in specially designed business objects (such as SiteLogisticsConfirmation, ProductionConfirmation, and GoodsAndActivityConfirmation) and can generate follow-on documents for other process components in Logistics (Material Requirements Planning) or Accounting (Financial Accounting). The InventoryChangeAndActivityConfirmationAccountingNotification interface is designed for the latter. Processing such a message generates documents in Accounting that represent the value flow and that can meet the statutory requirements for proper bookkeeping. Process-Integration modeling can ensure that no further process component (such as the GoodsAndServiceAcknowledgement PC in SRM) sends a message on the same business transaction to the AccountingProcessing DU. The message type provides for asynchronous communication between the logistical process components and the AccountingProcessing DU. (Real-time processing of the business transactions in the AccountingProcessing DU may therefore not be necessary per se.) In some implementations, for the InventoryChangeAndActivityConfirmationAccountingNotification message type there may only be one InventoryChangeAndActivityConfirmationCancellationAccountingNotification message type with which a document can be cancelled. The structure of the message for the document cancellation is based on the general principle that reference is made to a prima nota or to one or more items. The InventoryChangeAndActivityConfirmationAccountingNotification message therefore also defines the units that can be cancelled. As a consequence, limitations can result regarding the presummarization of inventory changes or activity consumption in Logistics.

The ServiceProvisionAccountingNotification message type is motivated by the Time Recording and Service Request and Order Management business scenarios. In these scenarios, Time And Labour Management, Service Confirmation Processing, and Service Request Processing transfer business transactions for service provisions to Accounting. An employee records his or her working time in a time sheet or confirmation. The employee also records the service (ServiceProduct) and the requester of the service within the company (cost center, project, service order, etc.). In cost accounting, employees are considered resources that incur costs. Such costs should be allocated to the users of the services based on the underlying drivers of the costs. This should make it possible to track the costs for the provision of resources either to the products of the company or (if that is not possible) to the final internal cost object (such as an administration cost center). This supports the full computation of product costs and optimizes internal processes. The consumption of resources is valuated and posted in internal accounting along with information on the service and the requester of the service.

The InvoiceAccountingNotification message type is motivated by the Procure To Stock and Sell From Stock business scenarios. After the incoming invoice is checked in the SupplierInvoicing DU, a message is transmitted to the FinancialAccounting DU where the payables to suppliers, the receivables from taxes, and the expenses are posted. Just as is the case when an outgoing invoice is sent in the CustomerInvoicing DU, a message can be transmitted to the FinancialAccounting DU where the receivables from deliveries, the payables from taxes, and the income are posted. The process is similar when incoming and outgoing credit memos are posted. The PaymentAccountingNotification message type is motivated by the Sell From Stock and Plan Driven Procurement business scenarios. The Payment Processing process component executes self-initiated payments at the request of other process components, and forwards externally-initiated payments to these process components for processing. For example, in the Procure to Stock scenario, a payment order for a liability is generated in the Due Item Processing process component and forwarded to the Payment Processing process component. In the reverse situation in the Sell from Stock scenario, payment is received in the Payment Processing process component and the Due Item Processing process component clears the receivables. Regardless of what the payment is for, general payment processing may take place in the Payment Processing process component. This component specializes in processing payments with respect to different means of payment, not with respect to the purpose of the payment. The special processing of payments regarding their purpose takes place in other process components. For example, in Due Item Processing the payment is applied to particular receivables or payables. Payment processing, then, can involve several process components. The different process or processing steps in different prima notae can be documented and associated with each other by means of references. The common aspect of these prima notae is the payment aspect. To maintain proper bookkeeping records, these processing steps can be forwarded to Accounting for posting. In the Sell From Stock business scenario, Accounting is notified about a goods or invoice issue by means of the InvoiceAccountingNotification and InventoryChangeAccountingNotification messages. If the goods receipt or invoice is then cancelled, Accounting can be informed of this event so that it can cancel the original accounting document for the goods or invoice issue. A key feature of this cancellation message is that it can contain the reference to the original business transaction and may contain no additional posting information. In some implementations, the notification about the cancellation cannot be rejected by Accounting.

The ExpenseReportAccountingNotification interface is motivated by the ExpenseReimbursement business scenario. After the expense report is checked in the ExpenseAndReimbursementManagement DU, a message is transmitted to the FinancialAccounting DU where the payables to the expense reporter, the receivables from taxes, and the expenses are posted. The process is similar when changes to an expense report are posted. The OpenItemAccountingNotification message type is motivated by Data Migration Processing. In Data Migration Processing, information about open items is transferred from a legacy system to a new ERP system.

Message Types

A ProductionLotAccountingNotification is a notification that informs Accounting that a ProductionLot has been created or changed. The structure of this message type is determined by the ProductionLotAccountingNotificationMessage message data type. This message type can be used in the following operations of the following business objects: in AccountingNotification, ProductionAccountingIn.CreateAccountingNotification; in ProductionLot, ProductionAccountingOut.NotifyOfProductionLotStatusChange.

A SalesAndPurchasingAccountingNotification is a notification about a business transaction (such as a purchase order or sales order) sent to Financial Accounting from Purchasing, Sales, or Service. The SalesAndPurchasingAccountingNotification message type is based on the SalesAndPurchasingAccountingNotificationMessage message data type. This message type is used in the following operations of business objects: in AccountingNotification, SalesAndPurchasingAccountingIn.CreateAccountingNotification; in ServiceRequest, SalesAndPurchasingAccountingOut.NotifyOfServiceRequest; in ServiceOrder, SalesAndPurchasingAccountingOut.NotifyOfServiceOrder; in ServiceConfirmation, SalesAndPurchasingAccountingOut.NotifyOfServiceConfirmation in SalesOrder, SalesAndPurchasingAccountingOut.NotifyOfSalesOrder in PurchaseOrder, SalesAndPurchasingAccountingOut.NotifyOfPurchaseOrder; and in CustomerReturn, SalesAndPurchasingAccountingOut.NotifyAccountingAboutCustomerReturn. It may be possible to fulfill the accounting requirements with the information in the message. This includes mainly: 1) Creation of an accounting document in the corresponding legal unit based on Generally Accepted Accounting Principles (GAAP) if necessary, and 2) Interlinkage of the business transactions to ensure auditability.

A ProjectAccountingNotification is a notification that informs Accounting that a project has been created or changed. The structure of this message type is determined by the ProjectAccountingNotificationMessage message data type. This message type is used in the following operations of business objects: in AccountingNotification, ProjectAccountingIn.CreateAccountingNotification and in Project, ProjectAccountingOut.NotifyOfProject. It may be possible to fulfill the accounting requirements with the information in the message. This includes mainly: 1) Creation of an accounting document in the corresponding legal unit based on Generally Accepted Accounting Principles (GAAP) if necessary; and 2) Interlinkage of the business transactions to ensure auditability.

A GoodsAndServiceAcknowledgementAccountingNotification is a notification sent to Accounting concerning the confirmation of the delivery of goods or services by a supplier or requester. The structure of this message type is determined by the GoodsAndServiceAcknowledgementAccountingNotificationMessage message data type. This message type is used in the following operations of business objects: in AccountingNotification, GoodsAndServiceAccountingIn.CreateAccountingDocument; and in GoodsAndServiceAcknowledgement, GoodsAndServiceAccountingOut.NotifyOfGoodsAndServiceAcknowledgement. It may be possible to fulfill the accounting requirements with the information in the message. This includes mainly: 1) Creation of an accounting document in the corresponding legal unit based on Generally Accepted Accounting Principles (GAAP); 2) Account coding of primary expenses and income in accordance with the requirements of cost and revenue accounting; and 3) Interlinkage of the business transactions to ensure auditability.

An InventoryChangeAndActivityConfirmationAccountingNotification is a notification sent to Accounting concerning inventory changes and inventory differences in inventory holding, or concerning material consumption and activity output (such as with confirmations). The structure of this message type is determined by the InventoryChangeAndActivityConfirmAccountingNotificationMessage message data type. This message type is used in the following operations of business objects: in AccountingNotification, AccountingInventoryAndActivityAccountingIn.CreateAccountingDocument; in GoodsAndActivityConfirmation, InventoryAndActivityAccountingOut.NotifyOfInventoryChangeAndActivityProvision; in SiteLogisticsConfirmation, InventoryAndActivityAccountingOut.NotifyOfInventoryChangeAndActivityProvision; and in ProductionConfirmation, InventoryAndActivityAccountingOut.NotifyOfInventoryChangeAndActivityProvision. It may be possible to fulfill the accounting requirements with the information in the message. This includes mainly: 1) Creation of an accounting document in the corresponding legal unit based on Generally Accepted Accounting Principles (GAAP); 2) Account coding of primary expenses and income in accordance with the requirements of cost and revenue accounting; and 3) Interlinkage of the business transactions to ensure auditability.

A ServiceProvisionAccountingNotification is a notification sent to Accounting concerning the provision of a service where both the provider and the user of the service are within the company. The structure of this message type is determined by the message data type ServiceProvisionAccountingNotificationMessage. This message type is used in the following operations of business objects: in AccountingNotification, ServiceProvisionAccountingIn.CreateAccountingDocument; in ServiceRequest, ServiceProvisionAccountingOut.NotifyOfServiceProvision; in ServiceConfirmation, ServiceProvisionAccountingOut.NotifyOfServiceProvision; and in EmployeeTimeCalendar, ServiceProvisionAccountingOut.NotifyOfServiceProvision. It may be possible to fulfill the accounting requirements with the information in the message. This includes mainly: 1) Creation of an accounting document in the corresponding legal unit based on Generally Accepted Accounting Principles (GAAP); 2) Account coding of primary expenses and income in accordance with the requirements of cost and revenue accounting; and 3) Interlinkage of the business transactions to ensure auditability.

InvoiceAccountingNotification is a notification sent to Accounting about an incoming or outgoing invoice or credit memo. The structure of this message type is determined by the InvoiceAccountingNotificationMessage message data type. This message type is used in the following operations of business objects: in AccountingNotification, InvoiceAccountingIn.CreateAccountingDocument; in CustomerInvoice, InvoiceAccountingOut.NotifyOfInvoice; in SupplierInvoice, InvoiceAccountingOut.RequestSupplierInvoices. It may be possible to fulfill the accounting requirements with the information in the message. This includes mainly: 1) Creation of an accounting document in the corresponding legal unit based on Generally Accepted Accounting Principles (GAAP); 2) Account coding of primary expenses and income in accordance with the requirements of cost and revenue accounting; and 3) Linkage between the business transactions (purchase order/sales order with invoice) so that factors such as auditability are ensured but also so that for example variances between the purchase order value and the invoice value can be determined and transferred to Cost Object Controlling and Profitability Analysis.

A PaymentAccountingNotification is a notification sent to Accounting about an incoming or outgoing payment. The structure of this message type is determined by the PaymentAccountingNotificationMessage message data type. This message type is used in the following operations of business objects: in AccountingNotification, PaymentAccountingIn. CreateAccountingDocument; in DuePayment, PaymentAccountingOut.NotifyOfPayment; in DueClearing, PaymentAccountingOut.NotifyOfPayment; in ProductTaxDeclaration, PaymentAccountingOut.NotifyOfPayment; in PaymentOrder, PaymentAccountingOut.NotifyOfPayment; in PaymentAllocation, PaymentAccountingOut. NotifyOfPayment; in BankStatement, PaymentAccountingOut.NotifyOfPayment; in BillOfExchangeSubmission, PaymentAccountingOut.NotifyOfPayment; in IncomingCheque, PaymentAccountingOut.NotifyOfPayment; in ChequeDeposit, PaymentAccountingOut.NotifyOfPayment; in BillOfExchangeReceivable, PaymentAccountingOut.NotifyOfPayment; in CashTransfer, PaymentAccountingOut. NotifyOfPayment; and in CashPayment, PaymentAccountingOut.NotifyOfPayment. It may be possible to fulfill the accounting requirements with the information in the message. This includes mainly: 1) Creation of an accounting document in the corresponding legal unit based on Generally Accepted Accounting Principles (GAAP); and 2) Linkage of the business transactions (such as invoice with payment) to ensure auditability, for example, but also to be able to determine exchange rate differences between the original receivable and the payment.

For each message type used for a posting in Accounting there is a correspondingly named message type for cancellation of the posting. All cancellation messages concerning AccountingInformation messages have the same structure, since they are all based on the same message data type (CancellationAccountingNotificationMessage).

An ExpenseReportAccountingNotification is a notification sent to Accounting about an incoming expense report for the company. The structure of this message type is determined by the ExpenseReportAccountingNotificationMessage message data type. This message type is used in the following operations of business objects: AccountingNotification, ExpenseAccountingIn.CreateAccountingDocument; and in ExpenseReport, ExpenseAccountingOut.NotifyOfSettlementResult. It may be possible to fulfill the accounting requirements with the information in the message. This includes mainly: 1) Creation of an accounting document in the corresponding legal unit based on Generally Accepted Accounting Principles (GAAP); 2) Account coding of primary expenses in accordance with the requirements of cost and revenue accounting; and 3) Interlinkage of the business transactions to ensure auditability.

A GoodsAndServiceAcknowledgementCancellationAccountingNotification is a notification sent to Accounting concerning the cancellation of an acknowledgement of the delivery of goods or services by a supplier or requester, or concerning the cancellation of an item in such a transaction. The message type GoodsAndServiceAcknowledgementCancellationAccountingNotification is based on the message data type CancellationAccountingNotificationMessage.

An InventoryChangeAndActivityConfirmationCancellationAccountingNotification is a notification sent to Accounting concerning the cancellation of an inventory change or inventory difference in inventory holding, the cancellation of a material consumption or activity output (such as with confirmations), or the cancellation of an item in such a business transaction. The InventoryChangeAndActivityConfirmationCancellationAccountingNotification message type is based on the CancellationAccountingNotificationMessage message data type.

A ServiceProvisionCancellationAccountingNotification is a notification sent to Accounting concerning the cancellation of a service provision within a company, or concerning the cancellation of an item in such a business transaction. The message type ServiceProvisionCancellationAccountingNotification is based on the message data type CancellationAccountingNotificationMessage.

An InvoiceCancellationAccountingNotification is a notification sent to Accounting concerning the cancellation of an incoming or outgoing invoice or credit memo, or of an item in such a business transaction. The message type InvoiceCancellationAccountingNotification is based on the message data type CancellationAccountingNotificationMessage.

A PaymentCancellationAccountingNotification is a notification sent to Accounting concerning the cancellation of an incoming or outgoing payment, or of an item in such a business transaction. The message type PaymentCancellationAccountingNotification is based on the message data type CancellationAccountingNotificationMessage.

An ExpenseReportCancellationAccountingNotification is a notification sent to Accounting concerning the cancellation of an expense report, or of an item in such a business transaction. The ExpenseReportCancellationAccountingNotification message type is based on the CancellationAccountingNotificationMessage message data type.

An OpenItemAccountingNotification is a notification sent to Accounting concerning a request to migrate an open item of a company from a legacy system to a new ERP system. The structure of this message type is determined by the message data type OpenItemAccountingNotificationMessage. This message type is used in the following operations of business objects: in AccountingNotification, OpenItemAccountingIn. CreateAccountingDocument; in ReceivablePayablesMigrationList, OpenItemAccountingOut.NotifyOfOpenItem; and in PaymentMigrationList, OpenItemAccountingOut.NotifyOfOpenItem. It may be possible to fulfill the accounting requirements with the information in the message.

ProductionLotAccountingNotificationMessage Message Data Type

The ProductionLotAccountingNotificationMessage message data type contains: 1) The ProductionLotAccountingNotification object included in the business document and 2) Business information that is relevant for sending a business document in a message. It contains the MessageHeader and ProductionLotAccountingNotification packages. The ProductionLotAccountingNotificationMessage message data type thus provides the structure for the SupplierInvoiceRequest message type and the interfaces that are based on it.

MessageHeader Package

A MessageHeader package groups business information relevant for sending a business document in a message. It contains the MessageHeader entity. A MessageHeader groups the business information from the perspective of the sending application including information to identify the business document in a message, Information about the sender, and optionally information about the recipient. MessageHeader contains SenderParty and RecipientParty. MessageHeader is of the type GDT: BusinessDocumentMessageHeader whereby the ID and ReferenceID elements of the GDT are used. A SenderParty is the party that is responsible for sending a business document at business application level. SenderParty can be of the type GDT: BusinessDocumentMessageHeaderParty. A RecipientParty is the party that is responsible for receiving a business document at business application level. The RecipientParty can be of the type GDT: BusinessDocumentMessageHeaderParty. A MessageHeader package can be included in a number of different message data types.

ProductionLotAccountingNotification Package

The ProductionLotAccountingNotification package groups ProductionlotAccountingNotification along with its ProductionLotAccountingNotificationExpectedMaterialOutput package. ProductionLotAccountingNotification is the view of a notification sent by Logistics to Financial Accounting concerning a production lot that was created or changed. ProductionLotAccountingNotification contains information on the status of a given production lot that is uniquely identified by the production lot ID and the company. ProductionLotAccountingNotification can include the following elements: OperationalDocumentReference, OperationalDocumentTransactionUUID, LifeCycleStatusCode, CompanyID, and LogisticsExecutionFunctionalUnitID. OperationalDocumentReference, may have a cardinality of 1, is a Reference to the document in which the Production Lot creation or change business transaction was entered and about which Financial Accounting is notified in the ProductionLotAccountingNotification, and may be of type GDT: ObjectNodeReference. In some implementations, an integrity condition can exist such that the element FormattedID may be filled.

OperationalDocumentTransactionUUID may have a cardinality of 1, is a universally unique identifier of the transaction during which the Production Lot was created or changed, and may be based on GDT: UUID. LifeCycleStatusCode may have a cardinality of 1 and may be based on GDT: LogisticsLifeCycleStatusCode. StatusChangeDateTime may have a cardinality of 1 and may be based on GDT: GLOBAL_DateTime. CompanyID may have a cardinality of 1, is the company which can be legally assigned to the business transaction, and may be based on GDT: OrganisationalCentreID. LogisticsExecutionFunctionalUnitID may have a cardinality of 1, is the logistics execution functional unit to which the business transaction is assigned, and may be based on GDT: OrganisationalCentreID. (reconciliationPeriodCounterValue may have a cardinality of 1 and may be based on GDT: CounterValue. In some implementations, the ProductionLotAccountingNotificationExpectedMaterialOutput package may contain at least one entry.

ProductionLotAccountingNotificationExpectedMaterialOutput contains information on the products planned to be manufactured. ProductionLotAccountingNotificationExpectedMaterialOutput is of the type GDT: ExpectedMaterialOutput. ProductionLotAccountingNotificationExpectedMaterialOutput contains the elements: MaterialRoleCode, PermanentEstablishmentID, Material, ExpectedQuantity, and ExpectedQuantityTypeCode. MaterialRoleCode may have a cardinality of 1, is the code indicating the role of a material, provides information such as whether the material is a by-product or a joint product, and may be based on GDT: MaterialRoleCode. PermanentEstablishmentID may have a cardinality of 1, in the context of this message is the organizational unit responsible for the value of the inventory of a particular owner (such as a company) at a logistical location, and may be based on GDT: OrganisationalCentreID. Material may have a cardinality of 1, is an identification of the material planned to be manufactured, and may be based on GDT: BusinessTransactionDocumentProduct. ExpectedQuantity may have a cardinality of 1, is a planned quantity of the material planned to be manufactured, and may be based on GDT: Quantity. ExpectedQuantityTypeCode may have a cardinality of 1, is a coded representation of the type of the planned quantity, and may be based on GDT: QuantityTypeCode.

SalesAndPurchasingAccountingNotificationMessage Message Data Type

The SalesAndPurchasingAccountingNotificationMessage message data type contains the SalesAndPurchasingAccountingNotification object contained in the business document and business information that is relevant for sending a business document in a message. It contains the MessageHeader package and the SalesAndPurchasingAccountingNotification package. The message data type SalesAndPurchasingAccountingNotificationMessage thus provides the structure for the message type SalesAndPurchasingAccountingNotification and the interfaces based thereon. The SalesAndPurchasingAccountingNotification package groups SalesAndPurchasingAccountingNotification along with its packages. It contains the Party and Item packages. SalesAndPurchasingAccountingNotification is the view of a notification sent to Financial Accounting from Purchasing, Sales, or Service regarding a business transaction. For a given order that is uniquely identified as the underlying business document, SalesAndPurchasingAccountingNotification contains item information regarding expenses and revenues. It is also specified here whether the order was created or changed. SalesAndPurchasingAccountingNotification can include the following elements: OperationalDocumentReference, OperationalDocumentTransactionUUID, BusinessProcessVariantTypeCode, AccountingBusinessTransactionDate, and @reconciliationPeriodCounterValue. OperationalDocumentReference may have a cardinality of 1, is a reference to the document in which the Purchasing, Sales, or Service business transaction was entered and about which Financial Accounting is notified in the SalesAndPurchasingAccountingNotification, and may be based on GDT: ObjectNodeReference. In some implementations, an integrity condition can exist such that the element FormattedID may be filled. OperationalDocumentTransactionUUID may have a cardinality of 1, is a universally unique identifier of the transaction during which the Purchasing, Sales, or Service document was created or changed, and may be based on GDT: UUID. BusinessProcessVariantTypeCode may have a cardinality of 1, is a process variant type, may be relevant for SRM, CRM Sales, and CRM Service, and may be based on GDT: BusinessProcessVariantTypeCode. AccountingBusinessTransactionDate may have a cardinality of 1, is a date on which the order was created or changed, is relevant for SRM, CRM Sales, and CRM Service, and may be based on GDT: Date. The element @reconciliationPeriodCounterValue may have a cardinality of 1 and may be based on (GDT: CounterValue).

SalesAndPurchasingAccountingNotificationParty Package

The SalesAndPurchasingAccountingNotificationParty package is a grouping of all organizational information and business partners with an Order in the header that are relevant for Accounting.

It can include OrganisationalCentreID, SalesOrganizationID, CustomerServiceOrganisationID, Debtor Party, and Creditor Party. In some implementations, there may be integrity conditions that exist such that 1) The entity SalesOrganisationID may be present in CRM Sales processes, 2) The entity CustomerServiceOrganisationID may be present in CRM Service processes, 3) The entity Debtor Party may be present in CRM processes and 4) The entity Creditor Party may be present in SRM processes.

CompanyID is one's own company. CompanyID is of the type GDT: OrganisationalCentreID. CompanyID is relevant for SRM, CRM Sales, and CRM Service. SalesOrganizationID is a company's organizational unit that handles sales processes. SalesOrganizationID is of the type GDT: OrganisationalCentreID. SalesOrganizationID is relevant for CRM Sales. CustomerServiceOrganisationID is a company's organizational unit that handles service processes. CustomerServiceOrganisationID is of the type GDT: OrganisationalCentreID. CustomerServiceOrganisationID is relevant for CRM Service. Debtor Party is the owner of the payable derived from the order. Debtor Party is of the type GDT: BusinessTransactionDocumentParty, but may contain only the element InternalID. Additional elements may not be needed because the master data can be available in the sender and receiver systems to enable operational work. This enables access, for example, in the business scenarios Sell from Stock in Financial Accounting to CountryCode and RegionCode of the customer for the evaluation. For a customer contract, sales order, service contract, service order, service confirmation, service request, etc., this business partner role represents the sold-to party. Debtor Party is relevant for CRM Sales and CRM Service. Creditor Party is the owner of the receivable derived from the order. Creditor Party is of the type GDT: BusinessTransactionDocumentParty, and may contain the element InternalID. Additional elements may not be needed because the master data may be available in the sender and receiver systems to enable operational work. For a purchase order, this business partner role represents the supplier. Creditor Party is relevant for SRM.

The SalesAndPurchasingAccountingNotificationItem package contains the necessary information on creating the items of the accounting document. These items are expenses or revenue (SalesAndPurchasingAccountingNotificationSalesPricingItem) and additional item information. It contains the SalesItem and PurchasingItem entities, the SalesAndPurchasingAccountingNotificationSalesItemProduct package, the SalesAndPurchasingAccountingNotificationSalesItemPrecedingOperationalDocumentReference package, the SalesAndPurchasingAccountingNotificationSalesItemPriceInformation package, the SalesAndPurchasingAccountingNotificationPurchasingItemProduct package, and the SalesAndPurchasingAccountingNotificationPurchasingItemAccountingCodingBlockAssignment package. SalesItem is the preparation of one and only one order item for Accounting purposes. SalesItem contains item information that is needed by Financial Accounting. SalesItem contains the following elements: OperationalDocumentItemReference, ParentOperationalDocumentItemUUID, OperationalDocumentItemTypeCode, OrderQuantity, OrderQuantityTypeCode, OrderItemCompletedIndicator, and OrderItemCancelledIndicator. OperationalDocumentItemReference may have a cardinality of 1, is a reference to the document item in which the Sales, or Service business transaction was entered, and may be based on GDT: ObjectNodeReference. In some implementations, an integrity condition can exist such that the element FormattedID may be filled. ParentOperationalDocumentItemUUID may have a cardinality of 1, is a universally unique identification of the superordinate Operational Document item of the current item (OperationalDocumentItemReference), is relevant for CRM Service and may be based on GDT: UUID. OperationalDocumentItemTypeCode may have a cardinality of 1, is a coded representation of the type of the Sales Item, is relevant for CRM Sales and CRM Service, and may be based on GDT: BusinessTransactionDocumentItemTypeCode. OrderQuantity may have a cardinality of 1, is an order quantity in the order unit of measure that refers to the entire order item, is relevant for CRM Sales and CRM Service, and may be based on GDT: Quantity. OrderQuantityTypeCode may have a cardinality of 1, is a coded representation of the type of the order quantity, and may be based on GDT: QuantityTypeCode. OrderItemCompletedIndicator may have a cardinality of 1, indicates whether the item is completed (Financial Accounting may be informed that there may be no further goods movements or outgoing invoices for a completed order item), is relevant for CRM Sales and CRM Service, and may be based on GDT: Indicator and Qualifier: Completed.

OrderItemCancelledIndicator may have a cardinality of 1, indicates whether the item is cancelled (Financial Accounting can be informed that an order item was cancelled), is relevant for CRM Sales and CRM Service, and may be based on GDT: Indicator and Qualifier: Cancelled. In some implementations, an integrity condition can exist such that the element BaseOrderItemID may be unique in the message. SalesItem is relevant for CRM Sales and CRM Service.

The SalesAndPurchasingAccountingNotificationSalesItemProduct package contains all accounting-relevant information from the given item regarding the product. It contains the Product entity. In some implementations, the entity Product may be present. Product identifies the good or service to which the item relates. Product is of the type GDT: BusinessTransactionDocumentProduct, and can include the InternalID and TypeCode elements. InternalID may have a cardinality of 1, is a proprietary identifier for a product, and may be based on GDT: ProductInternalID. TypeCode may have a cardinality of 1, is a type of a product, and may be based on GDT: ProductTypeCode. Additional elements may not be needed because the master data can be available in the sender and receiver systems to enable operational work. Product is relevant for CRM Sales and CRM Service.

The SalesAndPurchasingAccountingNotificationSalesItemPrecedingOperationalDocumentReference package contains all references to operational documents, or items in operational documents, which preceed the Sales item and that contain information necessary for the processing of this Sales item in Accounting. It contains the PrecedingSalesOrderReference, PrecedingServiceOrderReference, and PrecedingInboundDeliveryReference entities. PrecedingSalesOrderReference is a reference to an item in a Sales Order, which preceeds the Sales item and that contains information necessary for the processing of this Sales item in Accounting. PrecedingSalesOrderReference can include the PrecedingSalesOrderReference and PrecedingSalesOrderItemReference elements. PrecedingSalesOrderReference may have a cardinality of 1, and may be based on GDT: ObjectNodeReference. In some implementations, an integrity condition can exist such that the element FormattedID may be filled. PrecedingSalesOrderItemReference may have a cardinality of 1, and may be based on GDT: ObjectNodeReference. In some implementations, an integrity condition can exist such that the element FormattedID may be filled. PrecedingSalesOrderReference is relevant for CRM Sales.

PrecedingServiceOrderReference is a reference to an item in a Service Order, which preceeds the Sales item and that contains information necessary for the processing of this Sales item in Accounting. PrecedingServiceOrderReference can include the PrecedingServiceOrderReference and PrecedingServiceOrderItemReference elements. PrecedingServiceOrderReference may have a cardinality of 1, and may be based on GDT: ObjectNodeReference. In some implementations, an integrity condition can exist such that the element FormattedID may be filled. PrecedingServiceOrderItemReference may have a cardinality of 1, and may be based on GDT: ObjectNodeReference. In some implementations, an integrity condition can exist such that the element FormattedID may be filled. PrecedingServiceOrderReference reads characteristics from the service order, such as account coding information that no longer exists within the service confirmation.

PrecedingServiceOrderReference is relevant for CRM Service.

PrecedingInboundDeliveryReference is a reference to an item in a Inbound Delivery, which preceeds the Sales item and that contains information necessary for the processing of this Sales item in Accounting. PrecedingInboundDeliveryReference contains the PrecedingInboundDeliveryReference and PrecedingInboundDeliveryItemReference elements. PrecedingInboundDeliveryReference may have a cardinality of 1, and may be based on GDT: ObjectNodeReference. In some implementations, an integrity condition can exist such that the element FormattedID may be filled. PrecedingInboundDeliveryItemReference may have a cardinality of 1, and may be based on GDT: ObjectNodeReference. In some implementations, an integrity condition can exist such that the element FormattedID may be filled. PrecedingInboundDeliveryReference is relevant for CRM Sales and CRM Service.

The SalesAndPurchasingAccountingNotificationSalesItemPriceInformation package contains all planned expenses or revenues that were listed in the order. It contains the SalesPricingItem entity. SalesPricingItem is an expense or revenue that was listed in the order.

SalesPricingItem can include the PriceSpecificationElementPurposeGroupCode, PriceSpecificationElementCategoryCode and Amount elements. PriceSpecificationElementPurposeGroupCode may have a cardinality of 1, is a typing of the amount, such as base price, freight costs, discounts, customs fees, and may be based on GDT: PriceSpecificationElementPurposeGroupCode. PriceSpecificationElementCategoryCode may have a cardinality of 1, is a coded representation of the category of a Price SpecificationElement, and may be based on GDT: PriceSpecificationElementCategoryCode. Amount may have a cardinality of 1, is an amount in order currency (for a customer contract, sales order, service contract, service order, service confirmation, service request, etc., this amount represents revenue. That is, a positive amount is an increase in revenues, while a negative amount is a decrease in revenues), and may be based on GDT: Amount. SalesPricingItem is relevant for CRM Sales and CRM Service. PurchasingItem is the preparation of one and only one order item for Accounting purposes. PurchasingItem contains item information that is needed by Financial Accounting.

PurchasingItem can include the following elements: OperationalDocumentItemReference, OperationalDocumentItemTypeCode, OrderQuantity, OrderQuantityTypeCode, FollowUpDeliveryRequirementCode, FollowUpInvoiceAccountingRequirementCode, DeliveryCompletedIndicator, SupplierInvoiceCompletedIndicator, OrderItemCancelledIndicator, and NetUnitPrice. OperationalDocumentItemReference may have a cardinality of 1, is a reference to the document item in which the Purchasing business transaction was entered, and may be based on GDT: ObjectNodeReference. In some implementations, an integrity condition can exist such that the element FormattedID may be filled. OperationalDocumentItemTypeCode may have a cardinality of 1, is a coded representation of the type of the Purchasing Item, and may be based on GDT: BusinessTransactionDocumentItemTypeCode. OrderQuantity may have a cardinality of 1, is a quantity ordered that refers to the entire order item, and may be based on GDT: Quantity. OrderQuantityTypeCode may have a cardinality of 1, is a coded representation of the type of the order quantity, and may be based on GDT: QuantityTypeCode. FollowUpDeliveryRequirementCode may have a cardinality of 0..1, indicates whether follow-up documents such as GoodsAndServiceAcknowledgment or InboundDelivery are expected for an item of the business transaction document (possible code values are 02 (expected) and 04 (not expected)), and may be based on GDT: FollowUpBusinessTransactionDocumentRequirementCode. FollowUpInvoiceAccountingRequirementCode may have a cardinality of 0..1 and is an expected invoice (message InvoiceAccountingNotification expected, financial Accounting can be informed that with a service order, for example, an outgoing invoice for a service order item is expected. Possible code values are 02 (expected) and 04 (not expected). FollowUpInvoiceAccountingRequirementCode may be based on GDT: FollowUpBusinessTransactionDocumentRequirementCode. DeliveryCompletedIndicator may have a cardinality of 0..1, indicates that no further GoodsAndServiceAcknowledgment or InboundDelivery is expected for an item of the business transaction document of Purchasing, and may be based on GDT: Indicator and Qualifier: Completed. SupplierInvoiceCompletedIndicator may have a cardinality of 0..1, indicates that no further SupplierInvoice is expected for an item of the business transaction document of Purchasing, and may be based on GDT: Indicator and Qualifier: Completed. OrderItemCancelledIndicator may have a cardinality of 0..1, indicates whether the item is cancelled. (Financial Accounting can be informed that an order item was cancelled), and may be based on GDT: Indicator and Qualifier: Cancelled. NetUnitPrice may have a cardinality of 1, is a et price of the product ordered (it can be used to valuate the goods receipt and the net price includes any discounts and surcharges), and may be based on GDT: Price and Qualifier: NetUnit. In some implementations, an integrity condition can exist such that the element BaseOrderItemID may be unique in the message. PurchasingItem is relevant for SRM.

The SalesAndPurchasingAccountingNotificationPurchasingItemProduct package contains all accounting-relevant information from the given item regarding the product. It contains the Product and ProductCategoryID entities. Product identifies the good or service to which the item relates. Product is of the type GDT: BusinessTransactionDocumentProduct, and can include the InternalID and TypeCode elements. InternalID may have a cardinality of 1, is a proprietary identifier for a product, and may be based on GDT: ProductInternalID. TypeCode may have a cardinality of 1, is a type of a product, and may be based on GDT:

ProductTypeCode. Additional elements may not be needed because the master data may be available in the sender and receiver systems to enable operational work. In some implementations, an integrity condition can exist such that either a Product or an Accounting Coding Block Assignment (SalesAndPurchasingAccountingNotificationPurchasingItemAccountingCodingBlockAssignment) may be supplied. Product is relevant for SRM. ProductCategory identifies the product category of the good or service to which the item relates. ProductCategory is of the type GDT: BusinessTransactionDocumentProductCategory, and can include the following InternalID element. InternalID may have a cardinality of 1, is a proprietary identifier for a product category, and may be based on GDT: ProductCategoryInternalID. Additional elements may not be needed because the master data may be available in the sender and receiver systems to enable operational work. In some implementations, an integrity condition can exist such that ProductCategory is mandatory. ProductCategory is relevant for SRM.

The SalesAndPurchasingAccountingNotificationPurchasingItemAccountingCodingBlockAssignment package contains all accounting information regarding an item. It contains the AccountingCodingBlockAssignment entity.

AccountingCodingBlockAssignment contains the accounting objects to which the expenses or revenues of an item are assigned. AccountingCodingBlockAssignment is of the type GDT: AccountingCodingBlockAssignment. AccountingCodingBlockAssignment is optional. In some implementations, an integrity condition can exist such that if there is one AccountingCodingBlockAssignment for each order item, 100 percent may be entered and either a Product (SalesAndPurchasingAccountingNotificationPurchasingItemProduct package) or an Accounting Coding Block Assignment may be supplied. In some implementations there is only one AccountingCodingBlockAssignment for each OrderItem, and 100 percent may be entered.

ProjectAccountingNotificationMessage Message Data Type This message data type contains the Project object in the business document and the business information that is relevant for sending a business document in a message. It contains the MessageHeader package and ProjectAccountingNotificationProject package. This message data type, therefore, provides the structure for the ProjectAccountingNotification message type and the operations that are based on it.

ProjectAccountingNotificationProject Package

A ProjectAccountingNotificationProject package groups the project with its package. It contains the Project entity and the ProjectAccountingNotificationProjectTask package. A Project is the representation of a project and its structure with elements and characteristics that are exclusively accounting-related. The Project contains the following elements: OperationalDocumentReference, OperationalDocumentTransactionUUID, @taskListCompleteTransmissionIndicator, BusinessProcessVariantTypeCode, CompanyID, RequestingCostCentreID, ResponsibleCostCentreID, @actionCode, and @reconciliationPeriodCounterValue. OperationalDocumentReference may have a cardinality of 1, is a reference to the document in which the project creation or change business transaction was entered and about which Financial Accounting is notified in the ProjectAccountingNotification, and may be based on GDT: ObjectNodeReference. In some implementations, an integrity condition can exist such that the element FormattedID may be filled.

OperationalDocumentTransactionUUID may have a cardinality of 1, is a universally unique identifier of the transaction during which the Project was created or changed, and may be based on GDT: UUID.

@taskListCompleteTransmissionIndicator may have a cardinality of 1, indicates whether the message contains the project with all associated tasks or only the tasks that have been changed, and may be based on GDT: CompleteTransmissionIndicator. BusinessProcessVariantTypeCode may have a cardinality of 1, is a coded representation of the type of a business process variant and specifies the type of a project, such as overhead cost project or direct cost project, and may be based on GDT: BusinessProcessVariantTypeCode. CompanyID may have a cardinality of 1, is an identifier of the company for which the project is managed, and may be based on GDT: OrganisationalCentreID.

RequestingCostCentreID may have a cardinality of 0..1, is a cost center that commissioned the project, and may be based on GDT: OrganisationalCentreID. ResponsibleCostCentreID may have a cardinality of 0..1, is a cost center responsible for executing the project, and may be based on GDT: OrganisationalCentreID. @actionCode may have a cardinality of 1, is a code for controlling actions (ActionCode is the coded representation of the actions that control creating, changing, and deleting the task at the receiver of a message), and may be based on GDT: ActionCode. @reconciliationPeriodCounterValue may have a cardinality of 1, and may be based on GDT: CounterValue. In some implementations, an integrity condition can exist such that if the project is an overhead cost project the element RequestingCostCentre may be filled.

The ProjectAccountingNotificationProjectTask package is a grouping of all tasks belonging to a project.

It contains the Task entity. A task is an element in a hierarchical project structure. The hierarchical structure of tasks defines the required work in a project. The Task can include the ProjectTaskReference and @actionCode elements. ProjectTaskReference may have a cardinality of 1, is a reference to the project task, and may be based on GDT: ObjectNodeReference. @actionCode may have a cardinality of 1, is a code for controlling actions (ActionCode is the coded representation of the actions that control creating, changing, and deleting the task at the receiver of a message), and may be based on GDT: ActionCode. In some implementations, an integrity condition can exist such that a project always has at least one task and if the whole project is deleted (ActionCode at Project entity) the ProjectAccountingNotificationProjectTask package may be omitted.

GoodsAndServiceAcknowledgementAccountingNotificationMessage Message Data Type

The GoodsAndServiceAcknowledgmentAccountingMessage message data type contains the GoodsAndServiceAcknowledgment object contained in the business document and business information relevant for sending a business document in a message. It contains the MessageHeader package and the GoodsAndServiceAcknowledgmentAccountingNotification package. The message data type thus provides the structure for the GoodsAndServiceAcknowledgmentAccountingNotification message type and the interfaces that are based on it. The GoodsAndServiceAcknowledgmentAccountingNotification package groups the GoodsAndServiceAcknowledgmentAccountingNotification together with its GoodsAndServiceAcknowledgmentAccountingNotificationItem package. GoodsAndServiceAcknowledgmentAccountingNotification is an entity that contains information on material consumed and/or services used for AccountingProcessing. "Consumption" does not necessarily mean the actual physical consumption of a product. It can also mean simply recording the product in a decentral inbound delivery (i.e. without the involvement of the InboundDelivery process component of the LogisticsExecution DU). In AccountingProcessing, this transaction is already regarded as a cost event.

GoodsAndServiceAcknowledgmentAccountingNotification contains the OperationalDocumentReference, DocumentDate, AccountingBusinessTransactionDate, CompanyID, and @reconciliationPeriodCounterValue elements. OperationalDocumentReference may have a cardinality of 1, is a reference to the document in which the Goods And Service Acknowledgement business transaction was entered and about which Financial Accounting is notified in the GoodsAndServiceAcknowledgmentAccountingNotification, and may be based on GDT: ObjectNodeReference. In some implementations, an integrity condition can exist such that the element FormattedID may be filled. DocumentDate may have a cardinality of 1, is a date on which the prima nota was recorded, and may be based on GDT: Date. AccountingBusinessTransactionDate may have a cardinality of 1, is a Date when the business transaction occurred. It is used to derive the posting date, and may be based on GDT: Date. CompanyID may have a cardinality of 1, is a Company for which the business transaction is recorded, can be specified on the purchase order referenced by the inbound delivery, and may be based on GDT: OrganisationalCentreID. @reconciliationPeriodCounterValue may have a cardinality of 1, and may be based on GDT: CounterValue. In some implementations, an integrity condition can exist such that the DocumentDate may not be later than the CreationDateTime of the MessageHeader.

GoodsAndServiceAcknowledgmentAccountingNotificationItem Package

The GoodsAndServiceAcknowledgmentAccountingNotificationItem package contains all information needed to record one consumption of a material or service in the Accounting DU. It contains the GoodsAndServiceAcknowledgmentAccountingNotificationItemMaterial, GoodsAndServiceAcknowledgmentAccountingNotificationItemService, GoodsAndServiceAcknowledgmentAccountingNotificationItem-PrecedingOperationalDocumentReference, and GoodsAndServiceAcknowledgmentAccountingNotificationItem AccountingCodingBlockAssignment packages. In some implementations, an integrity condition can exist such that either GoodsAndServiceAcknowledgmentAccountingNotificationItemMaterial or GoodsAndServiceAcknowledgmentAccountingNotificationItemService may exist.

Item

Item is an entity that describes the consumption of a single material or service, including references to preceding documents and accounting information. It contains the OperationalDocumentItemReference, Note and Price elements. OperationalDocumentItemReference may have a cardinality of 1, is a reference to the document item in which the material or service consumption business transaction was entered, and may be based on GDT: ObjectNodeReference. In some implementations, an integrity condition can exist such that the element FormattedID may be filled. Note may have a cardinality of 0..1, is a text field that can be used to describe the consumed (=delivered) product, and may be based on GDT: SHORT_Note. Price may have a cardinality of 1, is a price of the consumed (=delivered) product, is used to valuate the business transaction, and may be based on GDT: Price. In some implementations, an integrity condition can exist such that if neither in the MaterialItem the Material-InternalID element nor in the ServiceItem the ServiceProduct-InternalID is filled, then the element Note may be filled.

GoodsAndServiceAcknowledgmentAccountingNotificationItemMaterial Package

The GoodsAndServiceAcknowledgmentAccountingNotificationItemMaterial package contains specific information on the consumption (=delivery) of a material. It contains the MaterialItem entity. MaterialItem is an entity that identifies and categorizes the material recorded for consumption and that contains the quantity consumed. It can include the following elements: Material, PermanentEstablishmentID, OrderQuantity, OrderQuantityTypeCode, and MaterialCategory. Material may have a cardinality of 0..1, is the consumed (=delivered) material, and may be based on GDT: BusinessTransactionDocumentProduct. PermanentEstablishmentID may have a cardinality of 0..1, is an ID of the permanent establishment at which the material was received, and may be based on GDT: OrganisationalCentreID. OrderQuantity may have a cardinality of 1, is a quantity of the consumed (=delivered) material in the unit of measure of the order item, and may be based on GDT: Quantity. OrderQuantityTypeCode may have a cardinality of 1, is a coded representation of the type of the order quantity, and may be based on GDT: QuantityTypeCode. MaterialCategory may have a cardinality of 0..1, is the product category of the consumed (=delivered) material, and may be based on GDT: BusinessTransactionDocumentProductCategory. In some implementations, an integrity condition can exist such that either Material or MaterialCategory may be filled, and if Material is filled PermanentEstablishmentID may be filled, too.

GoodsAndServiceAcknowledgmentAccountingNotificationItemServiceProduct Package

The GoodsAndServiceAcknowledgmentAccountingNotificationItemServiceProduct package contains specific information on the consumption or confirmation of a service product. It contains the ServiceProductItem entity. ServiceProductItem is an entity that identifies and categorizes the service product and that contains the quantity consumed. It can include the following elements: ServiceProduct, OrderQuantity, OrderQuantityTypeCode, and ServiceProductCategory. ServiceProduct may have a cardinality of 1, is the consumed (=confirmed) service product, and may be based on GDT: BusinessTransactionDocumentProduct. OrderQuantity may have a cardinality of 1, is a quantity of the consumed (=confirmed) service product in the unit of measure of the order item, and may be based on GDT: Quantity. OrderQuantityTypeCode may have a cardinality of 1, is a coded representation of the type of the order quantity, and may be based on GDT: QuantityTypeCode. ServiceProductCategory may have a cardinality of 0..1, is the product category of the consumed (=confirmed) service product, and may be based on GDT: BusinessTransactionDocumentProductCategory. In some implementations, an integrity condition can exist such that either ServiceProduct or ServiceProductCategory may be filled.

GoodsAndServiceAcknowledgmentAccountingNotificationItem-PrecedingOperationalDocumentReference Package The GoodsAndServiceAcknowledgmentAccountingNotificationItem-PrecedingOperationalDocumentReference package contains all references to operational documents, or items in operational documents, which preceed the Goods And Service Acknowledgment item and that contain information necessary for the processing of this Goods And Service Acknowledgment item in Accounting. It contains the PrecedingGoodsAndServiceAcknowledgmentReference and PrecedingPurchaseOrderReference entities.

PrecedingGoodsAndServiceAcknowledgmentReference

PrecedingGoodsAndServiceAcknowledgmentReference is a reference to an item in a Goods And Service Acknowledgment, which preceeds this Goods And Service Acknowledgment item and that contains information necessary for the processing of this Goods And Service Acknowledgment item in Accounting. It can include the PrecedingGoodsAndServiceAcknowledgmentReference and PrecedingGoodsAndServiceAcknowledgmentItemReference elements. PrecedingGoodsAndServiceAcknowledgmentReference may have a cardinality of 1, and may be based on GDT: ObjectNodeReference. In some implementations, an integrity condition can exist such that the element FormattedID may be filled. PrecedingGoodsAndServiceAcknowledgmentItemReference may have a cardinality of 1, and may be based on GDT: ObjectNodeReference. In some implementations, an integrity condition can exist such that the element FormattedID may be filled.

PrecedingPurchaseOrderReference

PrecedingPurchaseOrderReference is a reference to an item in a Purchase Order, which preceeds this Goods And Service Acknowledgment item and that contains information necessary for the processing of this Goods And Service Acknowledgment item in Accounting. It can include the PrecedingPurchaseOrderReference and PrecedingPurchaseOrderItemReference elements. PrecedingPurchaseOrderReference may have a cardinality of 1, and may be based on GDT: ObjectNodeReference. In some implementations, an integrity condition can exist such that the element FormattedID may be filled. PrecedingPurchaseOrderItemReference may have a cardinality of 1, and may be based on GDT: ObjectNodeReference. In some implementations, an integrity condition can exist such that the element FormattedID may be filled.

GoodsAndServiceAcknowledgmentAccountingNotificationAccountingCodingBlockAssignment Package The GoodsAndServiceAcknowledgmentAccountingNotificationAccountingCodingBlockAssignment package contains all account coding information for a GoodsAndServiceAcknowledgmentAccountingNotificationItem. It contains the AccountingCodingBlockAssignment entity. AccountingCodingBlockAssignment contains the accounting objects to which the expenses or revenues of a GoodsAndServiceAcknowledgmentAccountingNotificationItem are assigned. The AccountingCodingBlockAssignment has the structure GDT: AccountingCodingBlockAssignment. In some implementations, an integrity condition can exist such that AccountingCodingBlockAssignment is optional.

InventoryChangeAndActivityConfirmationAccountingNotificationMessage Message Data Type The InventoryChangeAndActivityConfirmationAccountingNotificationMessage message data type contains the InventoryChangeAndActivityConfirmation object included in the business document and business information relevant for sending a business document in a message. It contains the MessageHeader package and InventoryChangeAndActivityConfirmationAccountingNotification package. The message data type makes the structure available for the message type InventoryChangeAndActivityConfirmationAccountingNotification and the interface on which it is based.

InventoryChangeAndActivityConfirmationAccountingNotification Package

The InventoryChangeAndActivityConfirmationAccountingNotification package contains business data that notifies Accounting about inventory changes, inventory differences, and confirmations of materials or service products (activity consumption) in inventory management and production. It contains the package InventoryChangeAndActivityConfirmationAccountingNotificationItem.

InventoryChangeAndActivityConfirmationAccountingNotification

The InventoryChangeAndActivityConfirmation package contains business data that notifies Accounting about inventory changes, inventory differences, and confirmations of materials or service products (activity consumption) in inventory management and production. It can include the elements: OperationalDocumentReference, AccountingBusinessTransactionDateTime, CompanyID, and @reconciliationPeriodCounterValue. OperationalDocumentReference may have a cardinality of 1, is a reference to the document in which the inventory change, inventory difference, or confirmation of materials or service products (activity consumption) business transaction was entered and about which Financial Accounting is notified in the InventoryChangeAndActivityConfirmationAccountingNotification, and may be based on GDT: ObjectNodeReference. In some implementations, an integrity condition can exist such that the element FormattedID may be filled. AccountingBusinessTransactionDateTime may have a cardinality of 1, indicates when the business transaction occurred (the posting date is derived from this UTC time stamp), and may be based on GDT: GLOBAL_DateTime. CompanyID may have a cardinality of 1, is the company to which the business transaction is legally assigned, and may be based on GDT: OrganisationalCentreID. (reconciliationPeriodCounterValue may have a cardinality of 1, and may be based on GDT: CounterValue.

InventoryChangeAndActivityConfirmationAccountingNotificationItem Package

InventoryChangeAndActivityConfirmationAccountingNotificationItem describes a single warehouse inventory change, the recording or movement of an individual material, or the consumption of a service product, including references to preceding documents and any account coding information. It contains the InventoryChangeAndActivityConfirmationAccountingNotificationItemMaterial, InventoryChangeAndActivityConfirmationAccountingNotificationItemService, InventoryChangeAndActivityConfirmationAccountingNotificationItemBusinessTransactionDocumentReference, and InventoryChangeAndActivityConfirmationAccountingNotificationItemAccountingCodingBlockAssignment packages. In some implementations, an integrity condition can exist such that it may contain either a package InventoryChangeAndActivityConfirmationAccountingNotificationItemMaterial or a package InventoryChangeAndActivityConfirmationAccountingNotification ItemService.

Item describes a single inventory change, the recording or movement of an individual material, or the consumption of a service product, including references to preceding documents and any account coding information. InventoryChangeAndActivityConfirmationItem can include the following elements: OperationalDocumentItemReference, GroupID, PropertyMovementDirectionCode, and Note. OperationalDocumentItemReference may have a cardinality of 1, is a reference to the document item in which the inventory change, individual material movement, or service provision business transaction was entered, and may be based on GDT: ObjectNodeReference. In some implementations, an integrity condition can exist such that the element FormattedID may be filled. GroupID may have a cardinality of 1, identifies the group containing multiple mutually dependent lines of InventoryChangeAndActivityConfirmationItem (the lines in a message grouped this way may not be able to be processed independently without losing the context of the business transaction), and may be based on GDT: BusinessTransactionDocumentItemGroupID. PropertyMovementDirectionCode may have a cardinality of 1, is a coded representation of the direction of an inventory movement (that is, it indicates whether the movement is a goods receipt or a goods issue), and may be based on GDT: PropertyMovementDirectionCode. Note may have a cardinality of 0..1, is explanatory text (for example, regarding activity output), and may be based on GDT: SHORT_Note. In some implementations, an integrity condition can exist such that if neither in the MaterialItem the Material-InternalID element nor in the ServiceItem the ServiceProduct-InternalID is filled the element Note may be filled.

InventoryChangeAndActivityConfirmationAccountingNotificationItemMaterial Package An InventoryChangeAndActivityConfirmationAccountingNotificationItemMaterial package describes material inventory changes or material movements.

It contains the MaterialItem entity. MaterialItem is an InventoryChange package describes material inventory changes or material movements. It can include the elements: Material, IndividualMaterial, ValuationQuantity, ValuationQuantityTypeCode, EntryQuantity, EntryQuantityTypeCode, PermanentEstablishmentID, OwnerParty, and InventoryChangeReasonCode. Material may have a cardinality of 0..1, is an identification of the material posted as consumption or to/from inventory, and may be based on GDT: BusinessTransactionDocumentProduct. IndividualMaterial may have a cardinality of 0..1, is an identification of the individual material posted as consumption or to/from inventory, and may be based on GDT: BusinessTransactionDocumentProduct. ValuationQuantity may have a cardinality of 1, change in the inventory quantity or the consumed quantity of a material, expressed in its valuation unit, and may be based on GDT: Quantity. ValuationQuantityTypeCode may have a cardinality of 1, is a coded representation of the type of the valuation quantity, and may be based on GDT: QuantityTypeCode. EntryQuantity may have a cardinality of 1, is a change in the inventory quantity or the consumed quantity of a material, expressed in its unit of entry, and may be based on GDT: Quantity. EntryQuantityTypeCode may have a cardinality of 1, is a coded representation of the type of the entry quantity, and may be based on GDT: QuantityTypeCode. PermanentEstablishmentID may have a cardinality of 0..1, in the context of this message is the organizational unit responsible for the value of the inventory of a particular owner (such as a company), and may be based on GDT: OrganisationalCentreID. OwnerParty may have a cardinality of 1, in this context, the OwnerParty is the owner of the material, and may be based on GDT: BusinessTransactionDocumentParty. InventoryChangeReasonCode may have a cardinality of 1, is a coded representation of the reason for the inventory change, and may be based on GDT: InventoryChangeReasonCode. In some implementations, an integrity condition can exist such that within an InventoryChangeAndActivityConfirmationAccountingNotificationItem package, it cannot be used together with the InventoryChangeAndActivityConfirmationAccountingNotificationItemService package (one of the elements Material and IndividualMaterial may be filled. If the element Material is filled the element PermanentEstablishmentID may be filled, too).

In inventory management, inventory refers to a certain quantity of a material at a certain location. This inventory is usually identified more exactly by means of additional attributes. The recorded inventory can differ from the physical warehouse inventory. Such differences can be detected and corrected by physical inventory taking. There are two general types of inventory changes external inventory changes (goods receipts and goods issues) and Internal inventory changes (physical inventory, stock transfer, and reposting). An inventory change is the difference between the (internal) inventory before the change and the (internal) inventory after the change. From the internal perspective of inventory management, each inventory change consists of an issue (outbound movement) and/or a receipt (inbound movement). A goods receipt involves only an inbound movement, while a goods issue involves only an outbound movement. All other internal inventory changes can involve both an inbound and an outbound movement. An inventory change is transferred to logistics planning as an item in an InventoryChangeNotification and to Accounting as an item in an InventoryChangeAccountingNotification.

InventoryChangeAndActivityConfirmationAccountingNotificationItemService Package

An InventoryChangeAndActivityConfirmationAccountingNotificationItemService package contains accounting information regarding a confirmed activity and the resource used. It contains the ServiceItem entity. ServiceItem contains accounting information regarding a confirmed activity and the resource used.

ActivityConfirmationItem can include ServiceProduct, ServiceProductQuantity, ServiceProductQuantityTypeCode, ResourceID, ResourceQuantity, and ResourceQuantityTypeCode. ServiceProduct may have a cardinality of 1, is an identification of the service product provided, and may be based on GDT: BusinessTransactionDocumentProduct. ServiceProductQuantity may have a cardinality of 1, is a quantity of the service product provided, and may be based on GDT: Quantity. ServiceProductQuantityTypeCode may have a cardinality of 1, is a coded representation of the type of the service product quantity, and may be based on GDT: QuantityTypeCode. ResourceID may have a cardinality of 1, is an identification of the resource that provided the service product, and may be based on GDT: ResourceID. ResourceQuantity may have a cardinality of 1, is a quantity (usually duration) of the resource utilization, and may be based on GDT: Quantity. ResourceQuantityTypeCode may have a cardinality of 1, is a coded representation of the type of the resource quantity, and may be based on GDT: QuantityTypeCode.

InventoryChangeAndActivityConfirmationAccountingNotificationItemPrecedingOperational DocumentReference Package An InventoryChangeAndActivityConfirmationAccountingNotificationItemPrecedingOperationalDocumentReference contains all references to operational documents, or items in operational documents, which preceed the Inventory Change And Activity Confirmation item and that contain information necessary for the processing of this Inventory Change And Activity Confirmation item in Accounting. It contains the PrecedingSalesOrderReference, PrecedingPurchaseOrderReference, PrecedingProductionLotReference, PrecedingServiceConfirmationReference, PrecedingConfirmedInboundDeliveryReference, and PrecedingInboundDeliveryReference packages. A PrecedingSalesOrderReference is a reference to an item in a Sales Order, which preceeds the Inventory Change And Activity Confirmation item and that contains information necessary for the processing of this Inventory Change And Activity Confirmation item in Accounting. It contains the PrecedingSalesOrderReference and PrecedingSalesOrderItemReference elements. PrecedingSalesOrderReference may have a cardinality of 1, and may be based on GDT: ObjectNodeReference. In some implementations, an integrity condition can exist such that the element FormattedID may be filled. PrecedingSalesOrderItemReference may have a cardinality of 1, and may be based on GDT: ObjectNodeReference. In some implementations, an integrity condition can exist such that the element FormattedID may be filled.

PrecedingPurchaseOrderReference

A PrecedingPurchaseOrderReference is a reference to an item in a Purchase Order, which preceeds the Inventory Change And Activity Confirmation item and that contains information necessary for the processing of this Inventory Change And Activity Confirmation item in Accounting. It contains the PrecedingPurchaseOrderReference and PrecedingPurchaseOrderItemReference elements. PrecedingPurchaseOrderReference may have a cardinality of 1, and may be based on GDT: ObjectNodeReference. In some implementations, an integrity condition can exist such that the element FormattedID may be filled. PrecedingPurchaseOrderItemReference may have a cardinality of 1, and may be based on GDT: ObjectNodeReference. In some implementations, an integrity condition can exist such that the element FormattedID may be filled.

PrecedingProductionLotReference

A PrecedingProductionLotReference is a reference to a Production Lot, which preceeds the Inventory Change And Activity Confirmation item and that contains information necessary for the processing of this Inventory Change And Activity Confirmation item in Accounting. It can include PrecedingProductionLotReference which may have a cardinality of 1, and may be based on GDT: ObjectNodeReference. In some implementations, an integrity condition can exist such that the element FormattedID may be filled.

PrecedingServiceConfirmationReference

A PrecedingServiceConfirmationReference is a reference to an item in a Service Confirmation, which preceeds the Inventory Change And Activity Confirmation item and that contains information necessary for the processing of this Inventory Change And Activity Confirmation item in Accounting. It can include the PrecedingServiceConfirmationReference and PrecedingServiceConfirmationItemReference elements. PrecedingServiceConfirmationReference may have a cardinality of 1, and may be based on GDT: ObjectNodeReference. In some implementations, an integrity condition can exist such that the element FormattedID may be filled. PrecedingServiceConfirmationItemReference may have a cardinality of 1, and may be based on GDT: ObjectNodeReference. In some implementations, an integrity condition can exist such that the element FormattedID may be filled.

PrecedingConfirmedInboundDeliveryReference

A PrecedingConfirmedInboundDeliveryReference is a reference to an item in a Confirmed Inbound Delivery, which preceeds the Inventory Change And Activity Confirmation item and that contains information necessary for the processing of this Inventory Change And Activity Confirmation item in Accounting. It can include the PrecedingConfirmedInboundDeliveryReference and PrecedingConfirmedInboundDeliveryItemReference elements. PrecedingConfirmedInboundDeliveryReference may have a cardinality of 1, and may be based on GDT: ObjectNodeReference. In some implementations, an integrity condition can exist such that the element FormattedID may be filled. PrecedingConfirmedInboundDeliveryItemReference may have a cardinality of 1, and may be based on GDT: ObjectNodeReference. In some implementations, an integrity condition can exist such that the element FormattedID may be filled.

PrecedingInboundDeliveryReference

A PrecedingInboundDeliveryReference is a reference to an item in an Inbound Delivery, which preceeds the Inventory Change And Activity Confirmation item and that contains information necessary for the processing of this Inventory Change And Activity Confirmation item in Accounting. It can include PrecedingInboundDeliveryReference and PrecedingInboundDeliveryItemReference. PrecedingInboundDeliveryReference may have a cardinality of 1, and may be based on GDT: ObjectNodeReference. In some implementations, an integrity condition can exist such that the element FormattedID may be filled. PrecedingInboundDeliveryItemReference may have a cardinality of 1, and may be based on GDT: ObjectNodeReference. In some implementations, an integrity condition can exist such that the element FormattedID may be filled.

InventoryChangeAndActivityConfirmationAccountingNotificationItemAccountingCodingBlockAssignment Package The InventoryChangeAndActivityConfirmationAccountingNotificationItemAccountingCodingBlockAssignment package contains all account coding information for an InventoryChangeAndActivityConfirmationAccountingNotificationItem. It contains the AccountingCodingBlockAssignment entity. AccountingCodingBlockAssignment contains the accounting objects to which the expenses or revenues of an InventoryChangeAndActivityConfirmationAccountingNotificationItem are assigned. The AccountingCodingBlockAssignment has the structure GDT: AccountingCodingBlockAssignment. In some implementations, an integrity condition can exist such that AccountingCodingBlockAssignment is optional.

ServiceProvisionAccountingNotificationMessage Message Data Type

This message data type contains the ServiceProvisionAccountingNotification object contained in the business document and the business information that is relevant for sending a business document in a message. It can include the MessageHeader package and ServiceProvisionAccountingNotification package. This message data type therefore provides the structure for the ServiceProvisionAccountingNotification message type and the operations based on it.

ServiceProvisionAccountingNotification Package

The ServiceProvisionAccountingNotification package is a collection of service provisions within a company. It groups ServiceProvisionAccountingNotification with its Item package. ServiceProvisionAccountingNotification is a view of the AccountingNotification that in some implementations can be required for the purposes of preparing internal service provisions for Accounting. ServiceProvisionAccountingNotification contains accounting information regarding a provision of services within a company, where the provision is uniquely identified as the underlying business document.

ServiceProvisionAccountingNotification can include OperationalDocumentContainingBusinessObjectReference, OperationalDocumentReference, OperationalDocumentTransactionUUID, BusinessProcessVariantTypeCode, AccountingBusinessTransactionDate, AccountingBusinessTransactionDateTime, OperationalDocumentDate, Note, CompanyID, and @reconciliationPeriodCounterValue. OperationalDocumentContainingBusinessObjectReference may have a cardinality of 0..1, is a reference to the business object which contains the document in which the service provision business transaction was entered, and may be based on GDT: ObjectNodeReference. In some implementations, an integrity condition can exist such that the element FormattedID may be filled. OperationalDocumentReference may have a cardinality of 1, is a reference to the document in which the internal service provision business transaction was entered and about which Financial Accounting is notified in the ServiceProvisionAccountingNotification, and may be based on GDT: ObjectNodeReference. In some implementations, an integrity condition can exist such that the element FormattedID may be filled. OperationalDocumentTransactionUUID may have a cardinality of 0..1, is a universally unique identifier of the transaction during which the service provision was entered or cancelled, and may be based on GDT: UUID. In some implementations, an integrity condition can exist such that this element may be filled if the cancellation of a service provision Operational Document is not documented in a separate Operational Document but for example, only by a status on the cancelled Operational Document. BusinessProcessVariantTypeCode may have a cardinality of 0..1, is a type of the business process variant, and may be based on GDT: BusinessProcessVariantTypeCode. AccountingBusinessTransactionDate may have a cardinality of 0..1, is a date on which the service provision is relevant for accounting, and may be based on GDT: Date. AccountingBusinessTransactionDateTime may have a cardinality of 0..1, is a date on which the service provision is relevant for accounting, and may be based on GDT: Date. OperationalDocumentDate may have a cardinality of 0..1, is a document date of the service provision, and may be based on GDT: Date. Note may have a cardinality of 0..1, is a document header text of the service provision, and may be based on GDT: SHORT_Note. CompanyID may have a cardinality of 0..1, is an identifier of the company in which the service was provided, and may be based on GDT: OrganisationalCentreID. @reconciliationPeriodCounterValue may have a cardinality of 1, and may be based on GDT: CounterValue. In some implementations, an integrity condition can exist such that either AccountingBusinessTransactionDate or AccountingBusinessTransactionDateTime may be filled and that AccountingBusinessTransactionDate should be filled only if the sender knows the date of the service provision that is relevant for Accounting and that it should particularly not be converted from a time stamp by the sender.

ServiceProvisionAccountingNotificationItem Package

The ServiceProvisionAccountingNotificationItem package contains accounting information regarding a service provided, the resource utilized, the requester (accounting objects) of the service, and the circumstances of the provision. It can group ServiceProvisionAccountingNotificationItem with its AccountingCodingBlockAssignment package.

Item

An item contains accounting information regarding a service provided, the resource utilized, the requester (accounting objects) of the service, and the circumstances of the provision. Item can include OperationalDocumentItemReference, ServiceProductID, ServiceProductQuantity, ServiceProductQuantityTypeCode, ResourceID, ResourceQuantity, ResourceQuantityTypeCode, ServiceWorkingConditionsCode, and Note. OperationalDocumentItemReference may have a cardinality of 1, is a reference to the document item in which the service provision business transaction was entered, and may be based on GDT: ObjectNodeReference. In some implementations, an integrity condition can exist such that the element FormattedID may be filled. ServiceProductID may have a cardinality of 1, is an identification of the service product provided, and may be based on GDT: ProductID. ServiceProductQuantity may have a cardinality of 1, is a quantity of the service product provided, and may be based on GDT: Quantity. ServiceProductQuantityTypeCode may have a cardinality of 1, is a coded representation of the type of the service product quantity, and may be based on GDT: QuantityTypeCode. ResourceID may have a cardinality of 1, is an identification of the resource that provided the service product, and may be based on GDT: ResourceID. ResourceQuantity may have a cardinality of 1, is a quantity (usually duration) of the resource utilization, and may be based on GDT: Quantity. ResourceQuantityTypeCode may have a cardinality of 1, is a coded representation of the type of the resource quantity, and may be based on GDT: QuantityTypeCode. ServiceWorkingConditionsCode may have a cardinality of 1, is a coded representation of the working conditions under which the service product was provided, and may be based on GDT: ServiceWorkingConditionsCode. Note may have a cardinality of 1, is explanatory text regarding the service, and may be based on GDT: SHORT_Note.

ServiceProvisionAccountingNotificationItemAccountingCodingBlockAssignment Package The ServiceProvisionAccountingNotificationItemAccountingCodingBlockAssignment package contains the requesters of the service product provided and the percentage or quantity-based apportionment of the resource utilization to those requesters. It contains the AccountingCodingBlockAssignment entity. An AccountingCodingBlockAssignment contains the requesters of the service product provided and the percentage or quantity-based apportionment of the resource utilization to those requesters. AccountingCodingBlockAssignment is of the type GDT: AccountingCodingBlockAssignment. In some implementations, an integrity condition can exist such that AccountingCodingBlockAssignment is optional and contains the cost objects if they differ from the object specified as the BaseBusinessTransactionDocument. In some implementations, only percentage or quantity-based apportionment is allowed. In some implementations, amount-based apportionment is not supported. Since it is possible to distribute resource utilization costs to more than one cost object, there can be more than one AccountingObjectsSetAssignments for each Item. In some implementations, this assignment may, however, be made before the sending applications.

InvoiceAccountingNotificationMessage Message Data Type

This message data type contains the object InvoiceAccountingNotification contained in the business document and business information that is relevant for sending a business document in a message. It contains the MessageHeader package and the InvoiceAccountingNotification package. This message data type therefore provides the structure for the InvoiceAccountingNotification message type and the operations based on it.

InvoiceAccountingNotification Package

The InvoiceAccountingNotification package contains all information regarding an invoice that is relevant to Accounting.

It groups InvoiceAccountingNotification with its Party and Item packages. InvoiceAccountingNotification is a view of the AccountingNotification that is required for the purposes of formatting an invoice for Accounting. For a given invoice that is uniquely identified as the basic business document, InvoiceAccountingNotification contains (item) information on receivables and payables from deliveries and activities and sales taxes, as well as expenses and income. It also names the business partners involved.

InvoiceAccountingNotification can include OperationalDocumentReference, AccountingBusinessTransactionDate, OperationalDocumentDate, Note, CompanyID, and @reconciliationPeriodCounterValue. OperationalDocumentReference may have a cardinality of 1, is a reference to the document in which the invoice business transaction was entered and about which Financial Accounting is notified in the InvoiceAccountingNotification, and may be based on GDT: ObjectNodeReference. In some implementations, an integrity condition can exist such that the element FormattedID may be filled and for element ObjectTypeCode only the values 127 SupplierInvoice and 28 CustomerInvoice are permitted. AccountingBusinessTransactionDate may have a cardinality of 1, is a date for which the incoming or outgoing invoice is relevant for Accounting, and may be based on GDT: Date. OperationalDocumentDate may have a cardinality of 1, is a document date of the invoice, and may be based on GDT: Date. Note may have a cardinality of 0..1, is a document header text of the invoice, and may be based on GDT: SHORT_Note. CompanyID may have a cardinality of 1, and is the own company. In some implementations, with an incoming invoice (ObjectTypeCode 127 SupplierInvoice), the CompanyID can represent the purchasing company (OrderingParty) that is the owner of the payable. With an outgoing invoice (ObjectTypeCode 28 CustomerInvoice), the CompanyID represents the billing unit that is the owner of the receivable. CompanyID may be based on GDT: OrganisationalCentreID. @reconciliationPeriodCounterValue may have a cardinality of 1, and may be based on (GDT: CounterValue). In some implementations, an integrity condition can exist such that the currency of all subsequent amounts may match and the fields TaxDeclarationAmount and TaxDeclarationNonDeductibleAmount in the ProductTaxItem or WithholdingTaxItem are an exception, since the tax declaration currency can differ from the invoice currency.

InvoiceAccountingNotificationParty Package

The InvoiceAccountingNotificationParty package groups all business partners affected by the incoming or outgoing invoice or credit memo.

It contains the Debtor Party and Creditor Party entities. Debtor Party is the owner of the payable. Debtor Party is of the type GDT: BusinessTransactionDocumentParty, and can include the element InternalID. Additional elements may not be needed because the master data can be available in the sender and receiver systems to enable operational work. In some implementations, an integrity condition can exist such that Debtor Party is optional and only filled in the case of an outgoing invoice (ObjectTypeCode 28 CustomerInvoice). With an outgoing invoice, the sold-to party can be represented in this business partner role. Creditor Party is the owner of the receivable. Creditor Party is of the type GDT: BusinessTransactionDocumentParty, and can include the element InternalID. Additional elements may not be needed because the master data can be available in the sender and receiver systems to enable operational work. In some implementations, an integrity condition can exist such that Creditor Party is optional and only filled in the case of an incoming invoice (ObjectTypeCode 127 SupplierInvoice). With an incoming invoice, the supplier can be represented in this business partner role.

InvoiceAccountingNotificationItem Package

The InvoiceAccountingNotificationItem package contains all of the trade receivables or payables, receivables or payables from sales taxes, payables from withholding tax that were listed in an invoice, income from the items of an outgoing invoice (which can be ObjectTypeCode 28 CustomerInvoice), and expenses from the items of an incoming invoice (which can be ObjectTypeCode 127 SupplierInvoice). The InvoiceAccountingNotificationItem package groups the following with their subordinate packages: DueItem, ProductTaxItem, WithholdingTaxItem, SalesItem, and PurchasingItem. DueItem is a receivable or payable from deliveries and activities that were listed in an invoice. DueItem can include DueDate and GrossAmount. DueDate may have a cardinality of 1, is a date on which payment of the item is due net (without cash discount) in accordance with the terms of payment, and may be based on GDT: Date. GrossAmount may have a cardinality of 1, and is a gross amount of the receivable or payable in the currency of the invoice. Incoming invoices (which can be ObjectTypeCode 127 SupplierInvoice) are payables. That is, a positive amount is an increase in payables, while a negative amount is a decrease in payables. Outgoing invoices (which can be ObjectTypeCode 28 CustomerInvoice) are receivables. That is, a positive amount is an increase in receivables, while a negative amount is a decrease in receivables. GrossAmount can be based on GDT: Amount. In some implementations, an integrity condition can exist such that there is one and only one DueItem, which contains the due date for net payment and the gross amount of the receivable or payable of the invoice.

InvoiceAccountingNotificationDueItemSchedule Package

The InvoiceAccountingNotificationDueItemSchedule package distributes a receivable or payable from deliveries and activities from an invoice across multiple due dates. It contains the Schedule entity. Schedule contains the due dates based on the terms of payment, along with the gross amounts of a given receivable or payable due on those dates. Schedule can include DueDate and GrossAmount. DueDate may have a cardinality of 1, and is a calendar date on which the item is due, and may be based on GDT: Date. GrossAmount may have a cardinality of 1, is a gross amount due in the currency of the invoice, and may be based on GDT: Amount. In some implementations, an integrity condition can exist such that Schedule is optional, since a receivable or payable is usually due on just one date and there is only one amount due. Therefore, Schedule may only be transferred if the receivable or payable has multiple due dates.

ProductTaxItem

ProductTaxItem is a receivable or payable from sales taxes that were listed in an invoice. This is a tax applied to product-related business transactions such as purchasing, sales, or consumption. ProductTaxItem can include TaxDeclarationTaxAmount and TaxDeclarationNonDeductibleAmount. TaxDeclarationTaxAmount may have a cardinality of 1, is an amount of tax in tax declaration currency. Incoming invoices (which can be ObjectTypeCode 127 SupplierInvoice) are receivables vis-à-vis the tax authorities. That is, a positive amount is an increase in receivables, while a negative amount is a decrease in receivables. Outgoing invoices (which can be ObjectTypeCode 28 CustomerInvoice) are payables vis-à-vis the tax authorities. That is, a positive amount is an increase in payables, while a negative amount is a decrease in payables. TaxDeclarationTaxAmount may be based on GDT: Amount. TaxDeclarationNonDeductibleAmount may have a cardinality of 0..1, is an amount of tax, in tax declaration currency, that is nondeductible, and may be based on GDT: Amount. In some implementations, an integrity condition can exist such that ProductTaxItem is not mandatory, such as when the business transaction is not tax-relevant. However, multiple ProductTaxItems may be needed if there are multiple sales tax types or rates. This is the case in the United States where city, county, and state taxes apply. At least one separate ProductTaxItem may be needed for each of these levels.

InvoiceAccountingNotificationProductTaxItemTax Package

The InvoiceAccountingNotificationProductTaxItemTax package contains accounting relevant information on a given receivable or payable from sales taxes. It contains the ProductTax entity.

ProductTax

ProductTax contains accounting-relevant information on a given receivable or payable from sales taxes. ProductTax is of the type GDT: ProductTax, and can include CountryCode, EventTypeCode, TypeCode, RateTypeCode, Amount, NonDeductibleAmount, BusinessTransactionDocumentItemGroupID, DueCategoryCode, DeferredIndicator, and RegionCode. CountryCode may have a cardinality of 1, is a Country code (based on ISO 3166-1) specifying the country in which the tax is incurred, and may be based on GDT: CountryCode. EventTypeCode may have a cardinality of 1, is a tax event characterizing the conditions of the purchase, sale, or consumption of a product, and may be based on GDT: ProductTaxEventTypeCode. TypeCode may have a cardinality of 1, is a tax type code that determines which type of tax (such as sales tax, construction withholding tax, state/provincial sales tax, or local sales tax) is involved based on CountryCode and RegionCode, and may be based on GDT: TaxTypeCode. RateTypeCode may have a cardinality of 1, is a tax rate type code as used in legislation to classify tax rates, encodes the tax rate based on CountryCode and RegionCode, and may be based on GDT: TaxRateTypeCode. Amount may have a cardinality of 1, and is an amount of tax in the currency of the invoice. Incoming invoices (ObjectTypeCode 127 SupplierInvoice) are receivables vis-à-vis the tax authorities. That is, a positive amount is an increase in receivables, while a negative amount is a decrease in receivables. Outgoing invoices (ObjectTypeCode 28 CustomerInvoice) are payables vis-à-vis the tax authorities. That is, a positive amount is an increase in payables, while a negative amount is a decrease in payables. Amount may be based on GDT: Amount. NonDeductibleAmount may have a cardinality of 1, is an amount of tax, in invoice currency, that is non-deductible, and may be based on GDT: Amount. BusinessTransactionDocumentItemGroupID may have a cardinality of 0..1, assigns each ProductTaxItem to a group of SalesItems or PurchasingItems that are taxed the same. Any values can be used as long as they are used consistently within a document. BusinessTransactionDocumentItemGroupID may be based on GDT: BusinessTransactionDocumentItemGroupID. DueCategoryCode may have a cardinality of 1, is a due category code that determines whether the item is a tax receivable or a tax payable, and may be based on GDT: DueCategoryCode. DeferredIndicator may have a cardinality of 1, and indicates whether the tax is deferred. The default value of the DeferredIndicator is False. That is, unless the indicator is explicitly set, the tax of the corresponding ProductTaxItem is not deferred tax. DeferredIndicator may be based on GDT: TaxDeferredIndicator. RegionCode may have a cardinality of 1, is a region code (based on ISO 3166-2) specifying the region in which the tax is charged, and may be based on GDT: RegionCode. In some implementations, an integrity condition can exist such that the entity ProductTax exists once and only once for each ProductTaxItem and that BusinessTransactionDocumentItemGroupID is to be filled if and only if it is also transferred in the SalesItems or PurchasingItems.

WithholdingTaxItem

WithholdingTaxItem is a payable from withholding tax that was listed in an invoice. This is a tax that a payer remits directly on behalf of the payee. WithholdingTaxItem can include TaxDeclarationTaxAmount, which may have a cardinality of 1, and is an amount of tax in tax declaration currency. A positive amount is an increase in payables, while a negative amount is a decrease in payables. TaxDeclarationAmount may be based on GDT: Amount. In some implementations, an integrity condition can exist such that WithholdingTaxItem is not required when the business transaction is not tax-relevant or that is possible to have multiple WithholdingTaxItems.

InvoiceAccountingNotificationWithholdingTaxItemTax Package

The InvoiceAccountingNotificationWithholdingTaxItemTax package contains all accounting-relevant information on a given payable from withholding taxes. It contains the WithholdingTax entity. WithholdingTax contains all accounting-relevant information on a given payable from withholding taxes. WithholdingTax is of the type GDT: WithholdingTax, and can include CountryCode, EventTypeCode, TypeCode, RateTypeCode, Amount, and RegionCode. CountryCode may have a cardinality of 1, is a country code (based on ISO 3166-1) specifying the country in which the tax is incurred, and may be based on GDT: CountryCode. EventTypeCode may have a cardinality of 1, is a tax event associated with the tax deduction for the payment of remuneration, and may be based on GDT: WithholdingTaxEventTypeCode. TypeCode may have a cardinality of 1, is a tax type code defining the type of tax, based on the CountryCode and RegionCode, and may be based on GDT: TaxTypeCode. RateTypeCode may have a cardinality of 1, is a tax rate type code as used in legislation to classify tax rates, encodes the tax rate based on CountryCode and RegionCode, and may be based on GDT: TaxRateTypeCode. Amount may have a cardinality of 1, is an amount of tax in the currency of the invoice. A positive amount is an increase in payables, while a negative amount is a decrease in payables. Amount may be based on GDT: Amount. RegionCode may have a cardinality of 0..1, is a region code (based on ISO 3166-2) specifying the region in which the tax is charged, and may be based on GDT: RegionCode. In some implementations, an integrity condition can exist such that the entity WithholdingTax exists once and only once for each WithholdingTaxItem.

SalesItem

SalesItem contains all revenue from a given outgoing invoice item item (ObjectTypeCode 28 CustomerInvoice). SalesItem can include OperationalDocumentItemReference, NetAmount, OrderQuantity, OrderQuantityTypeCode, CashDiscountDeductibleIndicator, and BusinessTransactionDocumentItemGroupID. OperationalDocumentItemReference may have a cardinality of 1, is a reference to the document item in which the outgoing invoice business transaction was entered, and may be based on GDT: ObjectNodeReference. In some implementations, an integrity condition can exist such that the element FormattedID may be filled. NetAmount may have a cardinality of 1, and is a total net amount of the outgoing invoice item in the currency of the invoice. This amount represents revenue. That is, a positive amount is an increase in revenues, while a negative amount is a decrease in revenues. NetAmount may be based on GDT: Amount. OrderQuantity may have a cardinality of 0..1, is a total quantity of the outgoing invoice item in order unit of measure. A positive quantity indicates a decrease while a negative quantity indicates an increase of the inventory quantity. OrderQuantity may be based on GDT: Quantity. OrderQuantityTypeCode may have a cardinality of 0..1, and is a coded representation of the type of the invoice quantity. In some implementations, an integrity condition can exist such that this element. may be filled if the element OrderQuantity is filled. OrderQuantityTypeCode may be based on GDT: QuantityTypeCode. CashDiscountDeductibleIndicator may have a cardinality of 0..1, and indicates whether the outgoing invoice item qualifies for a cash discount. CashDiscountDeductibleIndicator is used for backdated tax calculation of the cash discount when a payment (or partial payment) is posted for an outgoing invoice. The default value of CashDiscountDeductibleIndicator is True. That is, unless the indicator is explicitly set, the SalesItem can qualify for a cash discount. CashDiscountDeductibleIndicator may be based on GDT: CashDiscountDeductibleIndicator. BusinessTransactionDocumentItemGroupID may have a cardinality of 0..1, and groups the SalesItems that are taxed the same and assigns them to the corresponding ProductTaxItem. Any values can be used as long as they are used consistently within a document. BusinessTransactionDocumentItemGroupID may be based on GDT: BusinessTransactionDocumentItemGroupID. In some implementations, an integrity condition can exist such that with an outgoing invoice (ObjectTypeCode 28 CustomerInvoice), at least one SalesItem may exist because an outgoing invoice without items cannot be posted in Accounting, no SalesItem may be transferred for an incoming invoice (ObjectTypeCode 127 SupplierInvoice).

and BusinessTransactionDocumentItemGroupID is to be filled if and only if it is also transferred in the ProductTaxItems.

InvoiceAccountingNotificationSalesItemProductInformation Package

The InvoiceAccountingNotificationSalesItemProductInformation package contains all accounting-relevant information about the product or service from a given outgoing invoice item. It contains the Product entity. Product identifies the good or service to which the given outgoing invoice item relates. Product is of the type GDT: BusinessTransactionDocumentProduct, and can include the InternalID and TypeCode elements. InternalID may have a cardinality of 1, is a proprietary identifier for a product, and may be based on GDT: ProductInternalID. TypeCode may have a cardinality of 1, is a type of a product, and may be based on GDT: ProductTypeCode.

Additional elements may not be needed because the master data can be available in the sender and receiver systems to enable operational work. In some implementations, an integrity condition can exist such that Product is optional.

InvoiceAccountingNotificationSalesItemPrecedingOperationalDocumentReference Package The InvoiceAccountingNotificationSalesItemPrecedingOperationalDocumentReference package contains all references to operational documents, or items in operational documents, which preceed the outgoing invoice item and that contain information necessary for the processing of this outgoing invoice item in Accounting. It contains the PrecedingCustomerInvoiceReference, PrecedingOutboundDeliveryReference, PrecedingSalesOrderReference, PrecedingCustomerReturnReference, PrecedingServiceOrderReference, PrecedingServiceContractReference, PrecedingServiceRequestReference, and PrecedingServiceConfirmationReference.

PrecedingCustomerInvoiceReference

PrecedingCustomerInvoiceReference is a reference to an item in a Customer Invoice, which preceeds the outgoing invoice item and that contains information necessary for the processing of this outgoing invoice item in Accounting. PrecedingCustomerInvoiceReference can include PrecedingCustomerInvoiceReference and PrecedingCustomerInvoiceItemReference. PrecedingCustomerInvoiceReference may have a cardinality of 1, and may be based on GDT: ObjectNodeReference. In some implementations, an integrity condition can exist such that the element FormattedID may be filled. PrecedingCustomerInvoiceItemReference may have a cardinality of 1, and may be based on GDT: ObjectNodeReference. In some implementations, integrity conditions can exist such that the element FormattedID may be filled, and PrecedingCustomerInvoiceReference is optional and only filled if the current invoice item is a successor document item for a preceding outgoing invoice item. PrecedingCustomerInvoiceReference can be, for example, the original outgoing invoice item number for the current credit memo item.

PrecedingOutboundDeliveryReference

PrecedingOutboundDeliveryReference is a reference to an item in a Outbound Delivery, which preceeds the outgoing invoice item and that contains information necessary for the processing of this outgoing invoice item in Accounting. PrecedingOutboundDeliveryReference can include PrecedingOutboundDeliveryReference may have a cardinality of 1, and may be based on GDT: ObjectNodeReference. In some implementations, integrity conditions can exist such that the element FormattedID may be filled. PrecedingOutboundDeliveryItemReference may have a cardinality of 1, and may be based on GDT: ObjectNodeReference. In some implementations, integrity conditions can exist such that the element FormattedID may be filled and/or that PrecedingOutboundDeliveryReference is optional. PrecedingOutboundDeliveryReference can serve to assign the invoice issue to the outbound delivery to enable accrual accounting or overhead costing.

PrecedingSalesOrderReference

PrecedingSalesOrderReference is a reference to an item in a Sales Order, which preceeds the outgoing invoice item and that contains information necessary for the processing of this outgoing invoice item in Accounting. PrecedingSalesOrderReference can include PrecedingSalesOrderReference and PrecedingSalesOrderItemReference. PrecedingSalesOrderReference may have a cardinality of 1, and may be based on GDT: ObjectNodeReference. In some implementations, integrity conditions can exist such that the element FormattedID may be filled. PrecedingSalesOrderItemReference may have a cardinality of 1, and may be based on GDT: ObjectNodeReference. In some implementations, integrity conditions can exist such that the element FormattedID may be filled, and/or that PrecedingSalesOrderReference is optional. PrecedingSalesOrderReference serves to assign the invoice issue to the sales order to enable accrual accounting or overhead costing.

PrecedingCustomerReturnReference

PrecedingCustomerReturnReference is a reference to an item in a Customer Return, which preceeds the outgoing invoice item and that contains information necessary for the processing of this outgoing invoice item in Accounting. PrecedingCustomerReturnReference can include PrecedingCustomerReturnReference and PrecedingCustomerReturnItem- Reference. PrecedingCustomerReturnReference may have a cardinality of 1, and may be based on GDT: ObjectNodeReference. In some implementations, integrity conditions can exist such that the element FormattedID may be filled. PrecedingCustomerReturnItemReference may have a cardinality of 1, and may be based on GDT: ObjectNodeReference. In some implementations, integrity conditions can exist such that the element FormattedID may be filled, and/or that PrecedingCustomerReturnReference is optional. PrecedingCustomerReturnReference serves to assign the credit memo issue to the customer return to enable accrual accounting or overhead costing.

PrecedingServiceOrderReference

PrecedingServiceOrderReference is a reference to an item in a Service Order, which preceeds the outgoing invoice item and that contains information necessary for the processing of this outgoing invoice item in Accounting.

See the business object AccountingNotification/node ItemGroupItemPrecedingOperationalDocumentReference. PrecedingServiceOrderReference can include PrecedingServiceOrderReference and PrecedingServiceOrderItemReference. PrecedingServiceOrderReference may have a cardinality of 1, and may be based on GDT: ObjectNodeReference. In some implementations, integrity conditions can exist such that the element FormattedID may be filled. PrecedingServiceOrderItemReference may have a cardinality of 1, and may be based on GDT: ObjectNodeReference. In some implementations, integrity conditions can exist such that the element FormattedID may be filled and/or that PrecedingServiceOrderReference is optional. PrecedingServiceOrderReference serves to assign the invoice issue to the service order to enable accrual accounting or overhead costing.

PrecedingServiceContractReference

PrecedingServiceContractReference is a reference to an item in a Service Contract, which preceeds the outgoing invoice item and that contains information necessary for the processing of this outgoing invoice item in Accounting. PrecedingServiceContractReference can contain PrecedingServiceContractReference and PrecedingServiceContractItemReference. PrecedingServiceContractReference may have a cardinality of 1, and may be based on GDT: ObjectNodeReference. In some implementations, integrity conditions can exist such that the element FormattedID may be filled. PrecedingServiceContractItemReference may have a cardinality of 1, and may be based on GDT: ObjectNodeReference. In some implementations, integrity conditions can exist such that the element FormattedID may be filled and/or that PrecedingServiceContractReference is optional. PrecedingServiceContractReference serves to assign the invoice issue to the service contract to enable accrual accounting or overhead costing.

PrecedingServiceRequestReference

PrecedingServiceRequestReference is a reference to an item in a Service Request, which preceeds the outgoing invoice item and that contains information necessary for the processing of this outgoing invoice item in Accounting. PrecedingServiceRequestReference can include PrecedingServiceRequestReference and PrecedingServiceRequestItemReference. PrecedingServiceRequestReference may have a cardinality of 1, and may be based on GDT: ObjectNodeReference. In some implementations, integrity conditions can exist such that the element FormattedID may be filled. PrecedingServiceRequestItemReference may have a cardinality of 1, and may be based on GDT: ObjectNodeReference. In some implementations, integrity conditions can exist such that the element FormattedID may be filled and/or that PrecedingServiceRequestReference is optional. PrecedingServiceRequestReference serves to assign the invoice issue to the service request to enable accrual accounting or overhead costing.

PrecedingServiceConfirmationReference

PrecedingServiceConfirmationReference is a reference to an item in a Service Confirmation, which preceeds the outgoing invoice item and that contains information necessary for the processing of this outgoing invoice item in Accounting. PrecedingServiceConfirmationReference can include PrecedingServiceConfirmationReference and PrecedingServiceConfirmationItemReference. PrecedingServiceConfirmationReference may have a cardinality of 1, and may be based on GDT: ObjectNodeReference. In some implementations, integrity conditions can exist such that the element FormattedID may be filled. PrecedingServiceConfirmationItemReference may have a cardinality of 1, and may be based on GDT: ObjectNodeReference. In some implementations, integrity conditions can exist such that the element FormattedID may be filled and/or PrecedingServiceConfirmationReference is optional. PrecedingServiceConfirmationReference serves to assign the invoice issue to the service confirmation to enable accrual accounting or overhead costing.

InvoiceAccountingNotificationSalesItemAccountingCodingBlockAssignment Package

The InvoiceAccountingNotificationSalesItemAccountingCodingBlockAssignment package contains all account coding information for a given outgoing invoice item. It contains the AccountingCodingBlockAssignment entity.

AccountingCodingBlockAssignment

AccountingCodingBlockAssignment contains the accounting objects to which the revenues of a given outgoing invoice item are assigned. AccountingCodingBlockAssignment is of the type GDT: AccountingCodingBlockAssignment. In some implementations, integrity conditions can exist such that AccountingCodingBlockAssignment is optional. Since it is possible to distribute the revenues of an outgoing invoice item to more than one cost object (multiple account assignment), there can be more than one AccountingCodingBlockAssignments for each SalesItem. In some implementations, this assignment may, however, be made by the sending applications. If there is more than one AccountingCodingBlockAssignment in a SalesItem, the distribution applies to all Pricings that belong to that SalesItem. For example, 50% of the revenues of an outgoing invoice item could be assigned to one profit center and 50% to another. If a percentage or quantity-based distribution of the account assignment objects was performed in the sending applications, but amount-based apportionment is possible for the sending applications, the corresponding amounts can be transferred instead of the percentages or quantities. This prevents rounding differences between the sending applications and Accounting. In this case the sum of the amounts may match the NetAmount of the SalesItem.

If a quantity-based distribution of the account assignment objects was performed in the sending applications the sum of the quantities may match the OrderQuantity of the SalesItem. Positive quantities indicate a decrease while negative quantities indicate an increase of the inventory quantity.

InvoiceAccountingNotificationSalesItemPriceInformation Package

The InvoiceAccountingNotificationSalesItemPriceInformation package contains all revenues listed in a given outgoing invoice item. It contains the Pricing entity. Pricing is an entry that was listed in a given outgoing invoice item. Pricing can include Amount, PriceSpecificationElementPurposeCode, and PriceSpecificationElementCategoryCode. Amount may have a cardinality of 1, is a net amount of the revenue in the currency of the invoice (a positive amount is an increase in revenues, while a negative amount is a decrease in revenues), and may be based on GDT: Amount. PriceSpecificationElementPurposeCode may have a cardinality of 1, is a coded representation of a group of PriceSpecificationElements (such as prices, discounts, or surcharges) based on their purpose, and may be based on GDT: PriceSpecificationElementPurposeCode. PriceSpecificationElementCategoryCode may have a cardinality of 1, is a coded representation for the category of PriceSpecificationElements, and may be based on GDT: PriceSpecificationElementCategoryCode. In some implementations, integrity conditions can exist such that no Pricing needs to exist if the outgoing invoice item contains only a total net amount that is not broken down further. In this case the total net amount of the outgoing invoice item is transferred in the NetAmount element of the SalesItem. If the revenues of the outgoing invoice item are broken down further (such as into prices, discounts, or surcharges), these can be transferred as separate Pricings. In this case the sum of the amounts of all Pricings in a SalesItem can match the NetAmount of the SalesItem.

PurchasingItem

PurchasingItem contains all expenses from a given incoming invoice item (ObjectTypeCode 127 SupplierInvoice). PurchasingItem can include OperationalDocumentItemReference, OperationalDocumentItemTypeCode, Note, PermanentEstablishmentID, NetAmount, Quantity, QuantityTypeCode, OrderQuantity, OrderQuantityTypeCode, ReferenceOrderQuantity, ReferenceOrderQuantityTypeCode, CashDiscountDeductibleIndicator, and BusinessTransactionDocumentItemGroupID. OperationalDocumentItemReference may have a cardinality of 1, is a reference to the document item in which the incoming invoice business transaction was entered, and may be based on GDT: ObjectNodeReference. In some implementations, integrity conditions can exist such that the element FormattedID may be filled. OperationalDocumentItemTypeCode may have a cardinality of 0..1, is a type of the document item in which the incoming invoice business transaction was entered. Possible codes are 002 Invoice Item for an incoming invoice item, 003 Credit Memo Item for an incoming credit memo item, 005 Subsequent Debit Item for a subsequent debit item, 006 Subsequent Credit Item for a subsequent credit item, 5448 Customs Duty Debit Item for a custom's duty debit item, 5449 Customs Duty Credit Item for a custom's duty credit item, 5450 Product Tax On Import Debit Item for a product tax on import debit item and 5451 Product Tax On Import Credit Item for a product tax on import credit item. OperationalDocumentItemTypeCode may be based on GDT: BusinessTransactionDocumentItemTypeCode. Note may have a cardinality of 0..1, is document item text of the incoming invoice, and may be based on GDT: SHORT_Note. PermanentEstablishmentID is an identification of the permanent establishment at which the invoice item is received, and may be based on GDT: OrganisationalCentreID. NetAmount may have a cardinality of 1, and is a total net amount of the incoming invoice item in the currency of the invoice. This amount represents expense. That is, a positive amount is an increase in expenses, while a negative amount is a decrease in expenses. NetAmount may be based on GDT: Amount. Quantity may have a cardinality of 0..1, is a total quantity of the incoming invoice item in the unit of entry, and may be based on GDT: Quantity. QuantityTypeCode is a coded representation of the type of the invoice quantity. In some implementations, integrity conditions can exist such that this element may be filled if the element Quantity is filled. QuantityTypeCode may be based on GDT: QuantityTypeCode. OrderQuantity may have a cardinality of 0..1, and is a total quantity of the incoming invoice item in order unit of measure. A positive quantity indicates an increase while a negative quantity indicates a decrease of the inventory quantity. OrderQuantity may be based on GDT: Quantity. OrderQuantityTypeCode may have a cardinality of 0..1, is a coded representation of the type of the order quantity. In some implementations, integrity conditions can exist such that this element may be filled if the element OrderQuantity is filled. OrderQuantityTypeCode may be based on GDT: QuantityTypeCode.

ReferenceOrderQuantity may have a cardinality of 0..1, and is a total quantity of the incoming invoice item in order unit of measure if no change to the inventory quantity was involved. In some implementations, integrity conditions can exist such that the ReferenceOrderQuantity always has a positive sign. ReferenceOrderQuantity may be based on GDT: Quantity. ReferenceOrderQuantityTypeCode may have a cardinality of 0..1, and is a coded representation of the type of the reference order quantity. In some implementations, integrity conditions can exist such that this element may be filled if the element ReferenceOrderQuantity is filled. ReferenceOrderQuantityTypeCode may be based on GDT: QuantityTypeCode. CashDiscountDeductibleIndicator may have a cardinality of 0..1, indicates whether the incoming invoice item qualifies for a cash discount. CashDiscountDeductibleIndicator can be used for backdated tax calculation of the cash discount when a payment (or partial payment) is posted for an incoming invoice.

The default value of the CashDiscountDeductibleIndicator can be True. That is, unless the indicator is explicitly set, the PurchasingItem may qualify for a cash discount. CashDiscountDeductibleIndicator may be based on GDT: CashDiscountDeductibleIndicator. BusinessTransactionDocumentItemGroupID may have a cardinality of 0..1, and groups the PurchasingItems that are taxed the same and assigns them to the corresponding ProductTaxItem. Any values can be used as long as they are used consistently within a document. BusinessTransactionDocumentItemGroupID may be based on GDT: BusinessTransactionDocumentItemGroupID.

In some implementations, integrity conditions can exist such that 1) With an incoming invoice (ObjectTypeCode 127 SupplierInvoice), at least one PurchasingItem may exist because an incoming invoice without items cannot be posted in Accounting; 2) No PurchasingItem may be transferred for an outgoing invoice (ObjectTypeCode 28 CustomerInvoice); 3) BusinessTransactionDocumentItemGroupID is to be filled if and only if it is also transferred in the ProductTaxItems; 4) Either the OrderQuantity or the ReferenceOrderQuantity may be filled but not both; 5) OrderQuantity or ReferenceOrderQuantity is to be filled if and only if Quantity is transferred and a purchase order reference exists in PurchaseOrderReference; and 6) In case of a PurchasingItem with a Product of TypeCode 1 Material, the PermanentEstablishmentID is mandatory.

InvoiceAccountingNotificationPurchasingItemProductInformation Package

The InvoiceAccountingNotificationPurchasingItemProductInformation package contains all accounting-relevant information about the product or service from a given incoming invoice item. It can include Product and ProductCategory. Product identifies the good or service to which the given incoming invoice item relates. Product is of the type GDT: BusinessTransactionDocumentProduct, and can include InternalID and TypeCode. InternalID may have a cardinality of 0..1, is a proprietary identifier for a product, and may be based on GDT: ProductInternalID. TypeCode may have a cardinality of 1, is a type of a product, and may be based on GDT: ProductTypeCode. Additional elements may not be needed because the master data can be available in the sender and receiver systems to enable operational work. In some implementations, integrity conditions can exist such that Product is optional and if the ProductCategory is not filled then the InternalID is obligatory. ProductCategory identifies the product category to which the given incoming invoice item relates. ProductCategory is of the type GDT: BusinessTransactionDocumentProductCategory, and can include InternalID, which may have a cardinality of 1, is a proprietary identifier for a product category, and may be based on GDT: ProductCategoryInternalID. Additional elements may not be needed because the master data can be available in the sender and receiver systems to enable operational work. In some implementations, integrity conditions can exist such that ProductCategory is optional and if the InternalID is filled then the TypeCode of the Product may be as well. ProductCategory is relevant for SRM.

InvoiceAccountingNotificationPurchasingItemPrecedingOperationalDocumentReference Package The InvoiceAccountingNotificationPurchasingItemPrecedingOperationalDocumentReference package contains all references to operational documents, or items in operational documents, which preceed the incoming invoice item and that contain information necessary for the processing of this incoming invoice item in Accounting. It can include the PrecedingSupplierInvoiceReference, PrecedingPurchaseOrderReference, PrecedingConfirmedInboundDeliveryReference, and PrecedingGoodsAndServiceAcknowledgementReference entities.

PrecedingSupplierInvoiceReference is a reference to an item in a Supplier Invoice, which preceeds the incoming invoice item and that contains information necessary for the processing of this incoming invoice item in Accounting. PrecedingSupplierInvoiceReference can include PrecedingSupplierInvoiceReference and PrecedingSupplierInvoiceItemReference. PrecedingSupplierInvoiceReference may have a cardinality of 1, and may be based on GDT: ObjectNodeReference. In some implementations, integrity conditions can exist such that the element FormattedID may be filled. PrecedingSupplierInvoiceItemReference may have a cardinality of 1, and may be based on GDT: ObjectNodeReference. In some implementations, integrity conditions can exist such that the element FormattedID may be filled and that PrecedingSupplierInvoiceReference can be optional and only filled if the current invoice item is a successor document item for a preceding incoming invoice item. PrecedingSupplierInvoiceReference can be, for example, the original incoming invoice item number for the current credit memo item.

PrecedingPurchaseOrderReference

PrecedingPurchaseOrderReference is a reference to an item in a Purchase Order, which preceeds the incoming invoice item and that contains information necessary for the processing of this incoming invoice item in Accounting. PrecedingPurchaseOrderReference can include PrecedingPurchaseOrderReference and PrecedingPurchaseOrderItemReference. PrecedingPurchaseOrderReference may have a cardinality of 1, and may be based on GDT: ObjectNodeReference. In some implementations, integrity conditions can exist such that the element FormattedID may be filled. PrecedingPurchaseOrderItemReference may have a cardinality of 1, and may be based on GDT: ObjectNodeReference. In some implementations, integrity conditions can exist such that the element FormattedID may be filled and/or that PrecedingPurchaseOrderReference is optional. PrecedingPurchaseOrderReference serves to assign the incoming invoice to the goods receipt in GR/IR clearing.

PrecedingConfirmedInboundDeliveryReference

PrecedingConfirmedInboundDeliveryReference is a reference to an item in a Confirmed Inbound Delivery, which preceeds the incoming invoice item and that contains information necessary for the processing of this incoming invoice item in Accounting. PrecedingConfirmedInboundDeliveryReference can include PrecedingConfirmedInboundDeliveryReference and PrecedingConfirmedInboundDeliveryItemReference. PrecedingConfirmedInboundDeliveryReference may have a cardinality of 1, and may be based on GDT: ObjectNodeReference. In some implementations, integrity conditions can exist such that the element FormattedID may be filled. PrecedingConfirmedInboundDeliveryItemReference may have a cardinality of 1, and may be based on GDT: ObjectNodeReference. In some implementations, integrity conditions can exist such that the element FormattedID may be filled and/or that PrecedingConfirmedInboundDeliveryReference is optional. With goods-receipt-based invoice verification, PrecedingConfirmedInboundDeliveryReference can serve to assign the incoming invoice to the goods receipt in GR/IR clearing.

PrecedingGoodsAndServiceAcknowledgementReference

PrecedingGoodsAndServiceAcknowledgementReference is a reference to an item in a Goods And Service Acknowledgement, which preceeds the incoming invoice item and that contains information necessary for the processing of this incoming invoice item in Accounting. PrecedingGoodsAndServiceAcknowledgementReference can include PrecedingGoodsAndServiceAcknowledgementReference and PrecedingGoodsAndServiceAcknowledgementItemReference. PrecedingGoodsAndServiceAcknowledgementReference may have a cardinality of 1, and may be based on GDT: ObjectNodeReference. In some implementations, integrity conditions can exist such that the element FormattedID may be filled. PrecedingGoodsAndServiceAcknowledgementItemReference may have a cardinality of 1, and may be based on GDT: ObjectNodeReference. In some implementations, integrity conditions can exist such that the element FormattedID may be filled and/or that PrecedingGoodsAndServiceAcknowledgementReference is optional. With goods-receipt based invoice verification, PrecedingGoodsAndServiceAcknowledgementReference serves to assign the incoming invoice to the goods receipt in GR/IR clearing.

InvoiceAccountingNotificationPurchasingItemAccountingCodingBlockAssignment Package The InvoiceAccountingNotificationPurchasingItemAccountingCodingBlockAssignment package contains account coding information for a given incoming invoice item. It contains the AccountingCodingBlockAssignment entity. AccountingCodingBlockAssignment contains the accounting objects to which the expenses of a given incoming invoice item are assigned. AccountingCodingBlockAssignment is of the type GDT: AccountingCodingBlockAssignment.

In some implementations, AccountingCodingBlockAssignment is optional. Since it is possible to distribute the expenses of an incoming invoice item to more than one cost object (multiple account assignment), in some implementations there can be more than one AccountingCodingBlock-Assignments for each PurchasingItem (this assignment may, however, be made by the sending applications). For example, 50% of the freight charges in an incoming invoice item could be assigned to one cost center and 50% to another. In some implementations, if a percentage or quantity-based distribution of the account assignment objects was performed in the sending applications, but amount-based apportionment is possible for the sending applications, the corresponding amounts are always transferred instead of the percentages or quantities. This prevents rounding differences between the sending applications and Accounting. In this case the sum of the amounts may match the NetAmount of the PurchasingItem.

In some implementations, if a quantity-based distribution of the account assignment objects was performed in the sending applications the sum of the quantities may match the OrderQuantity of the PurchasingItem. Positive quantities can indicate an increase while negative quantities indicate a decrease of the inventory quantity. In some implementations, in the case of incoming invoices for which a PrecedingPurchaseOrderReference, PrecedingConfirmedInboundDeliveryReference, or PrecedingGoodsAndServiceAcknowledgementReference is transferred, a maximum of one AccountingCodingBlockAssignment is allowed for each PurchasingItem.

PaymentAccountingNotificationMessage Message Data Type

This message data type contains the object PaymentAccountingNotification contained in the business document and the business information that is relevant for sending a business document in a message. It contains the MessageHeader and PaymentAccounting packages. This message data type, therefore, provides the structure for the PaymentAccountingNotification message type and the operations that are based on it.

PaymentAccountingNotification Package

PaymentAccountingNotification contains all information from a payment that is relevant for Accounting. It contains the PaymentAccountingNotification and Item entities. PaymentAccountingNotification is a view of the AccountingNotification that is required for the purposes of preparing a payment for Accounting. PaymentAccountingNotification can include OperationalDocumentContainingBusinessObjectReference, OperationalDocumentReference, BusinessProcessVariantTypeCode, AccountingBusinessTransactionDate, OperationalDocumentDate, CompanyID, BusinessTransactionCurrencyCode, Note, and @reconciliationPeriodCounterValue.

OperationalDocumentContainingBusinessObjectReference may have a cardinality of 1, is a reference to the business object which contains the document in which the payment business transaction was entered, and may be based on GDT: ObjectNodeReference. In some implementations, integrity conditions can exist such that the element FormattedID may be filled. OperationalDocumentReference may have a cardinality of 1, is a reference to the document in which the payment business transaction was entered and about which Financial Accounting is notified in the PaymentAccountingNotification, and may be based on GDT: ObjectNodeReference. In some implementations, integrity conditions can exist such that the element FormattedID may be filled. BusinessProcessVariantTypeCode may have a cardinality of 0..1, is a type of the business process variant, and may be based on GDT: BusinessProcessVariantTypeCode. AccountingBusinessTransactionDate may have a cardinality of 1, is a date on which the payment is relevant for accounting, and may be based on GDT: Date. OperationalDocumentDate may have a cardinality of 1, is a document date of the payment, and may be based on GDT: Date. CompanyID may have a cardinality of 1, is the "own" company, and may be based on GDT: OrganisationalCentreID. BusinessTransactionCurrencyCode may have a cardinality of 1, is a currency key of the payment transaction currency, and may be based on GDT: CurrencyCode and Qualifier: Transaction. Note may have a cardinality of 0..1, is a document header text of the payment, and may be based on GDT: SHORT Note. @reconciliationPeriodCounterValue may have a cardinality of 1, and may be based on GDT: CounterValue.

PaymentAccountingNotificationItem Package

PaymentAccountingNotificationItem contains items listed in a payment, such as changes in cash on hand, changes in trade receivables or trade payables, expenses and revenues, receivables or payables from sales taxes, and payables from withholding tax. It groups the following with their subordinate packages: Item, CashItem, AllocationCashItem, DueItem, ClearingDueItem, ExpenseAndIncomeItem, ProductTaxItem, and WithholdingTaxItem. Each Item occurs in one and only one of the specializations listed.

Item Package

The Item Package groups all information concerning a single change in value within the payment document resulting from the business transaction. It contains the Item and BusinessTransactionDocumentReference entities. Item is the representation of a single change in value within the payment document resulting from the business transaction. Item can include OperationalDocumentItemReference, OrderOperationalDocumentItemReference, and BusinessTransactionCurrencyAmount. OperationalDocumentItemReference may have a cardinality of 0..1, is a reference to the Operational Document item in which the payment business transaction was entered, and may be based on GDT: ObjectNodeReference. In some implementations, integrity conditions can exist such that the element FormattedID may be filled. OrderOperationalDocumentItemReference may have a cardinality of 0..1, is a reference to an item in the Operational Document acting, from the Financial Accounting point of view, as an Order Item, and may be based on GDT: ObjectNodeReference. In some implementations, integrity conditions can exist such that this reference is required if the Operational Document, from the Financial Accounting point of view, is classified as a confirmation but also has the aspect of an order and if the order item reference is different from the confirmation item reference (represented by the OperationalDocumentItemReference). BusinessTransactionCurrencyAmount may have a cardinality of 1, is an amount of the item in transaction currency, and may be based on GDT: Amount and Qualifier Transaction. In some implementations, integrity conditions can exist such that the currency of the element TransactionCurrencyAmount may match the currency listed in the element PaymentAccountingNotification.TransactionCurrencyCode, and that each Item occurs in one and only one of the specializations indicated above.

AllocationPrecedingOperationalDocumentReference Package

The AllocationPrecedingOperationalDocumentReference package groups all references to Operational Documents which precede the item and to which a contribution to the item's change in value within the payment document is allocated. It can optionally AllocationPrecedingOperationalDocumentReference. PrecedingOperationalDocumentReference is a reference to a preceding Operational Document which precedes the item and to which a contribution to the item's change in value within the payment document is allocated. AllocationPrecedingOperationalDocumentReference can include AllocationPrecedingOperationalDocumentReference and AllocationPrecedingOperationalDocumentItemReference. AllocationPrecedingOperationalDocumentReference may have a cardinality of 1, and may be based on GDT: ObjectNodeReference. In some implementations, integrity conditions can exist such that the element FormattedID may be filled. AllocationPrecedingOperationalDocumentItemReference may have a cardinality of 0..1, and may be based on GDT: ObjectNodeReference. In some implementations, integrity conditions can exist such that the element FormattedID may be filled.

CashItem

CashItem groups all information concerning the inflow and outflow of cash. It contains the CashItem and Party packages. CashItem is restricted to items that are not allocations. CashItem can include PaymentRegisterItemTypeCode and PaymentFormCode. PaymentRegisterItemTypeCode may have a cardinality of 1, is a type of the item in the payment register, and may be based on GDT: PaymentRegisterItemTypeCode. PaymentFormCode may have a cardinality of 0..1, is a format of the payment medium, and may be based on GDT: PaymentFormCode. In some implementations, integrity conditions can exist such that a PaymentAccountingNotificationMessage contains a maximum of one Cash Item and that Entity Item.AllocationBusinessTransactionDocumentReference may not be filled.

Party Package

Party Package groups the business partner house bank. It can include the HouseBank element, which is the House bank at which the payment is processed. HouseBank is of the type GDT: BusinessTransactionDocumentParty, and can include the element InternalID. Additional elements may not be needed because the master data may be available in the sender and receiver systems to enable operational work. In some implementations, AllocationCashItem can be restricted to items that are allocations. AllocationCashItem can include OpenItemAmount, which may have a cardinality of 0..1, is an amount of the payment allocation in the currency of the open item and in some implementations should only be filled if the currency of the open item differs from the payment currency. OpenItemAmount can be based on GDT: Amount. In some implementations, integrity conditions can exist such that Entity Item.OriginBusinessTransactionDocumentReference may not be filled and Entity Item.AllocationBusinessTransactionDocumentReference may be filled.

DueItem

DueItem is a trade receivable or payable vis-à-vis a business partner from a payment. It contains the DueItem entity, Party package, and BusinessTransactionDocumentReference package. In some implementations, integrity conditions can exist such that the receivable or payable from a payment can reference a purchase order or sales order, that Entity Item.OriginBusinessTransactionDocumentReference may be filled, and that Entity Item.AllocationBusinessTransactionDocumentReference may not be filled. DueItem is a receivable or payable from down payments (Item.TypeCode=004) or from other payments (Item.TypeCode=005). The DueItem can include TradeReceivablesPayablesRegisterItemTypeCode and DueDate. TradeReceivablesPayablesRegisterItemTypeCode may have a cardinality of 1, is a type of a trade receivable or payable, and may be based on GDT: TradeReceivablesPayablesRegisterItemTypeCode. DueDate may have a cardinality of 1, is a due date for net payment of the receivable or payable, and may be based on GDT: Date and Qualifier Due.

The Party package is a grouping of the business partners to which the receivable or payable belongs. It contains the Debtor Party and Creditor Party entities. In some implementations, integrity conditions can exist such that one and only one of the entities Debtor Party/Creditor Party may be filled. A Debtor Party is a business partner to whom a payable belongs. Debtor Party is of the type GDT: BusinessTransactionDocumentParty, but contains only the element InternalID. Additional elements are not needed because the master data may be available in the sender and receiver systems to enable operational work. In some implementations, integrity conditions can exist such that Debtor Party is optional and only filled for debit-side payment transactions. In some implementations, for payment transactions without reference information, the sending application may decide, based on the business history, whether the payment is a debit-side or credit-side transaction. That is, for an incoming payment the sending application may decide whether the payment applies to a yet-to-be-identified billing document or whether it is the payout of a yet-to-be-identified supplier credit memo. If the former, the Debtor Party may be filled. If the latter, the Creditor Party may be filled.

Creditor Party is the owner of the receivable. Creditor Party is of the type GDT: BusinessTransactionDocumentParty, and can include the element InternalID. Additional elements may not be needed because the master data can be available in the sender and receiver systems to enable operational work. In some implementations, integrity conditions can exist such that Creditor Party is optional and only for credit-side payment transactions.

PrecedingOperationalDocumentReference Package

The PrecedingOperationalDocumentReference package groups all references to operational documents, or items in operational documents, which preceed the down payment item and that contain information necessary for the processing of this down payment item in Accounting. It contains the PrecedingPurchaseOrderReference and PrecedingSalesOrderReference entities. In some implementations, integrity conditions can exist such that the PrecedingOperationalDocumentReference package is only needed for a down payment (Item.TypeCode=004) and can include a maximum of one reference.

PrecedingPurchaseOrderReference

A PrecedingPurchaseOrderReference is a reference to an item in a Purchase Order, which preceeds the down payment item and for which the down payment was made and that contains information necessary for the processing of this down payment item in Accounting. PrecedingPurchaseOrderReference can include PrecedingPurchaseOrderReference and PrecedingPurchaseOrderItemReference. PrecedingPurchaseOrderReference may have a cardinality of 1, and may be based on GDT: ObjectNodeReference. In some implementations, integrity conditions can exist such that the element FormattedID may be filled. PrecedingPurchaseOrderItemReference may have a cardinality of 1, and may be based on GDT: ObjectNodeReference. In some implementations, integrity conditions can exist such that the element FormattedID may be filled and/or that PrecedingPurchaseOrderReference is optional and only filled for down payments made.

PrecedingSalesOrderReference

A PrecedingSalesOrderReference is a reference to an item in a Sales Order, which preceeds the down payment item and for which the down payment was made and that contains information necessary for the processing of this down payment item in Accounting. PrecedingSalesOrderReference can include PrecedingSalesOrderReference and PrecedingSalesOrderItemReference. PrecedingSalesOrderReference may have a cardinality of 1, and may be based on GDT: ObjectNodeReference. In some implementations, integrity conditions can exist such that the element FormattedID may be filled. PrecedingSalesOrderItemReference may have a cardinality of 1, and may be based on GDT: ObjectNodeReference. In some implementations, integrity conditions can exist such that the element FormattedID may be filled and/or that PrecedingSalesOrderReference is optional and only filled for down payments received.

AllocationDueItem

AllocationDueItem is an allocation of a receivable or payable with reference to an item in a business document. A clearing can relate to an item in an upstream business document or to an item within the transmitted payment. For example, An incoming payment creates a liability vis-à-vis the business partner, which is later cleared against the billing document. When the clearing is transmitted, the message contains two items: one with reference to the payment and one with reference to the billing document. If clearing takes place at the same time as the payment (such as with an incoming payment for an invoice), the two clearing items can be included when the payment is sent. AllocationDueItem can include OpenItemAmount and PartyRoleCategoryCode. OpenItemAmount may have a cardinality of 0..1, and is an amount in the currency of the open receivable or payable item that is being cleared. In some implementations, this element should only be filled if the currency of the open item differs from the payment currency. OpenItemAmount may be based on GDT: Amount. PartyRoleCategoryCode may have a cardinality of 1, and is a role of the business partner of the AllocationPrecedingOperationalDocument that is being cleared. Possible values are '3' (Creditor Party) and '4' (Debtor Party). PartyRoleCategoryCode may be based on GDT: PartyRoleCategoryCode. In some implementations, integrity conditions can exist such that Entity Item.OriginBusinessTransactionDocumentReference may not be filled or that Entity Item.AllocationBusinessTransactionDocumentReference may be filled.

ExpenseAndIncomeItem

ExpenseAndIncomeItem is an expense or income resulting from a payment. ExpenseAndIncomeItem can include ExpenseAndIncomeCategoryCode and ProductTaxBusinessTransactionDocumentItemGroupID. ExpenseAndIncomeCategoryCode may have a cardinality of 1, is a coded representation of the category of the expense or income, and may be based on GDT: ExpenseAndIncomeCategoryCode. ProductTaxBusinessTransactionDocumentItemGroupID may have a cardinality of 0..1, groups items that are taxed in a similar way, and may be based on GDT: BusinessTransactionDocumentItemGroupID. Possible values for ExpenseAndIncomeCategoryCode can include BankAccountInterest, BankAccountMaintananceFees, BankAccountTransactionFees, CashDiscount, ChargeOffDifference, InsolvencyWriteOff, and PaymentDifferenceForAlternativeCurrency. In some implementations, integrity conditions can exist such that Entity Item.AllocationBusinessTransactionDocumentReference may be filled for the following ExpenseAndIncomeCategoryCodes: CashDiscount, ChargeOffDifference, InsolvencyWriteOff, and PaymentDifferenceForAlternativeCurrency.

ProductTaxItem

ProductTaxItem is a receivable or payable from purchase tax and/or sales tax listed in a payment due to fees, interest, or deductions. It contains the ProductTaxItem and Tax package entities. ProductTaxItem is a receivable or payable from purchase tax and/or sales tax within a payment. ProductTaxItem can include TaxDeclarationTaxAmount, TaxDeclarationNonDeductibleAmount, TaxAllocationAccountingNotificationItemGroupID, and TaxReceivablesPayablesRegisterItemSplitItemTypeCode. TaxDeclarationTaxAmount may have a cardinality of 1, is an amount of tax in tax declaration currency, and may be based on GDT: Amount, and Qualifier Tax. TaxDeclarationNonDeductibleAmount may have a cardinality of 0..1, is an mount of tax, in tax declaration currency, that is non-deductible, and may be based on GDT: Amount and Qualifier Tax. TaxAllocationAccountingNotificationItemGroupID may have a cardinality of 0..1, is a grouping of TaxAllocationItems, may need to be filled if the ProductTaxItem arose from an allocation of taxes (tax declaration, breakdown of deferred tax), and may be based on GDT: BusinessTransactionDocumentItemGroupID. TaxReceivablesPayablesRegisterItemSplitItemTypeCode may have a cardinality of 0..1, and is a type of the TaxReceivablesPayablesRegisterItemSplitItem based on the preceding operational document. In some implementations, this element is filled only by a Product Tax Declaration. Possible values are TaxDeclarationSummaryLine or TaxDeclarationPaymentLine. TaxReceivablesPayablesRegisterItemSplitItemTypeCode may be based on GDT: TaxReceivablesPayablesRegisterItemSplitItemTypeCode.

Integrity Conditions

Message Type

The amounts in declaration currency only need to be included in the message if the declaration currency is not the same as the transaction currency.

Entity Item.AllocationBusinessTransactionDocumentReference may be filled if ProductTaxItem relates to an ExpenseAndIncomeItem which reflects a deduction from AllocationDue.

Tax Package

The Tax Package is a receivable or payable from purchase tax and/or sales tax in transaction currency in the context of a payment. In some implementations, the Tax Package can include CountryCode, EventTypeCode, TypeCode, RateTypeCode, NonDeductibleAmount, BusinessTransactionDocumentItemGroupID, DueCategoryCode, DeferredIndicator, and RegionCode.

CountryCode may have a cardinality of 1, is a country code (which can be based on ISO 3166-1) specifying the country in which the tax is incurred, and may be based on GDT: CountryCode. EventTypeCode may have a cardinality of 1, is a coded representation of the type of taxable event that is connected with the purchase, sale, or consumption of products, and may be based on GDT: ProductTaxEventTypeCode. TypeCode may have a cardinality of 1, is a tax type code, and may be based on GDT TaxTypeCode. RateTypeCode may have a cardinality of 1, is a coded representation of the type of a percentage or quantity based tax rate, and may be based on GDT: TaxRateTypeCode. NonDeductibleAmount may have a cardinality of 0..1, is an amount of tax that is non-deductible, and may be based on GDT: Amount. BusinessTransactionDocumentItemGroupID may have a cardinality of 0..1, and groups items within a payment that are taxed the same way. In some implementations, this element may be omitted if the taxation is uniform. BusinessTransactionDocumentItemGroupID may be based on GDT: BusinessTransactionDocumentItemGroupID. DueCategoryCode may have a cardinality of 1, specifies whether the product tax represents a receivable or a payable to the tax authority, and may be based on GDT: DueCategoryCode. DeferredIndicator may have a cardinality of 0..1, specifies whether a tax payment is deferred or not, and may be based on GDT: TaxDeferredIndicator. RegionCode may have a cardinality of 0..1, is a coded representation of geographical or political regions that are logically or physically coherent, where the tax is incurred, and may be based on GDT: RegionCode. In some implementations, integrity conditions can exist such that the Group ID may be unique within a paid business transaction and that the paid business transaction is identified by the PaymentAccountingNotificationItemID of the ProductTaxItem.

WithholdingTaxItem

WithholdingTaxItem is a receivable or payable from the withholding tax that the paying party deducted from the payment and sent to the tax authority. It contains the WithholdingTaxItem and Tax entities. WithholdingTaxItem is a receivable or payable from the withholding tax that the paying party deducted from the payment and sent to the tax authority. WithholdingTaxItem can include TaxDeclarationTaxAmount and TaxAllocationAccountingNotificationItemGroupID. TaxDeclarationTaxAmount may have a cardinality of 0..1, is an amount of tax in tax declaration currency, and may be based on GDT: Amount and Qualifier Tax. TaxAllocationAccountingNotificationItemGroupID may have a cardinality of 0..1, and is a grouping of TaxAllocationItems. In some implementations, this element only needs to be filled if the WithholdingTaxItem arose from an allocation of taxes (tax declaration). TaxAllocationAccountingNotificationItemGroupID may be based on GDT: BusinessTransactionDocumentItemGroupID.

The Tax Package can include CountryCode, EventTypeCode, TypeCode, RateTypeCode, and RegionCode. CountryCode may have a cardinality of 1, is a country code (which can be based on ISO 3166-1) specifying the country in which the tax is incurred, and may be based on GDT: CountryCode. EventTypeCode may have a cardinality of 1, is a coded representation of the type of taxable event that is connected with the withholding of taxes for payments, and may be based on GDT: WithholdingTaxEventTypeCode. TypeCode may have a cardinality of 1, is a tax type code, and may be based on GDT: TaxTypeCode. RateTypeCode may have a cardinality of 1, is a coded representation of the type of a percentage or quantity based tax rate, and may be based on GDT: TaxRateTypeCode. RegionCode may have a cardinality of 0..1, is a coded representation of geographical or political regions that are logically or physically coherent, where the tax is incurred, and may be based on GDT: RegionCode.

AllocationTaxItem

AllocationTaxItem is an allocation of a receivable or payable from purchase tax and/or sales tax or withholding tax. AllocationTaxItem can include TaxDeclarationTaxAmount and TaxAllocationAccountingNotificationItemGroupID. TaxDeclarationTaxAmount may have a cardinality of 0..1, and is an amount of tax in tax declaration currency. In some implementations, this element only needs to be filled if the tax declaration currency is not the same as the transaction currency. TaxDeclarationTaxAmount may be based on GDT: Amount and Qualifier Tax. TaxAllocationAccountingNotificationItemGroupID may have a cardinality of 1, is a grouping of TaxAllocationItems, and may be based on GDT: BusinessTransactionDocumentItemGroupID. In some implementations, integrity conditions can exist such that allocations with the same TaxAllocationItemGroupID refer to receivables or payables from purchase tax and/or sales tax or withholding tax with identical tax characteristics and that the sum of the allocations and the associated ProductTaxItem or WithholdingTaxItem may equal zero in the transaction currency.

ExpenseReportAccountingNotificationMessage Message Data Type

The ExpenseReportAccountingNotificationMessage Message Data Type can include the ExpenseReportAccountingNotification object in the business document and business information that is relevant for sending a business document in a message. It can include the MessageHeader package and the ExpenseReportAccountingNotification package. This message data type therefore provides the structure for the ExpenseReportAccountingNotification message type and the operations based on it.

ExpenseReportAccountingNotification Package

The ExpenseReportAccountingNotification package contains all information regarding an expense report that is relevant to Accounting. It can group ExpenseReportAccountingNotification with its Party and Item packages. ExpenseReportAccountingNotification is a view of the AccountingNotification that can be required for the purposes of preparing an expense report for Accounting. For a given expense report that is uniquely identified as the basic business document, ExpenseReportAccountingNotification can contain itemized information concerning payables due to the expense reporter, receivables due from sales taxes, and expenses. It can also name the business partners involved. ExpenseReportAccountingNotification can include OperationalDocumentContainingBusinessObjectReference, OperationalDocumentReference, OperationalDocumentTransactionUUID, AccountingBusinessTransactionDate, DocumentDate, Note, CompanyID, and PreconciliationPeriodCounterValue. OperationalDocumentContainingBusinessObjectReference may have a cardinality of 1, is a reference to the business object which contains the document in which the expense report business transaction was entered, and may be based on GDT: ObjectNodeReference. In some implementations, integrity conditions can exist such that the element FormattedID may be filled. OperationalDocumentReference may have a cardinality of 1, is a reference to the document in which the expense report business transaction was entered and about which Financial Accounting is notified in the ExpenseReportAccountingNotification, and may be based on GDT: ObjectNodeReference. In some implementations, integrity conditions can exist such that the element FormattedID may be filled. OperationalDocumentTransactionUUID may have a cardinality of 1, is a universally unique identifier of the transaction during which the Expense Report was created or cancelled, and may be based on GDT: UUID. AccountingBusinessTransactionDate may have a cardinality of 1, is a date on which the expense report is relevant for accounting, and may be based on GDT: Date. DocumentDate may have a cardinality of 1, is a document date of the expense report, and may be based on GDT: Date. Note may have a cardinality of 0..1, is a document header text of the expense report, and may be based on GDT: SHORT_Note. CompanyID may have a cardinality of 1, is the "own" company, and may be based on GDT: OrganisationalCentreID. @reconciliationPeriodCounterValue may have a cardinality of 1, and may be based on GDT: CounterValue. In some implementations, integrity conditions can exist such that the currency of all subsequent amounts may match (however, the TaxDeclarationAmount and TaxDeclarationNonDeductibleAmount fields in the ProductTaxItem can be an exception, since the tax declaration currency can differ from the expense report currency).

ExpenseReportAccountingNotificationParty Package

The ExpenseReportAccountingNotificationParty package contains all business partners that are affected by the expense report. It contains the EmployeeParty entity. EmployeeParty is the owner of the payable. EmployeeParty is of the type GDT: BusinessTransactionDocumentParty, and can include the element InternalID. Additional elements may not be needed because the master data can be available in the sender and receiver systems to enable operational work.

ExpenseReportAccountingNotificationItem Package

The ExpenseReportAccountingNotificationItem package contains all of the payables due to the expense reporter, the receivables from sales taxes that were listed in an expense report, and all expenses from the items of an expense report (which can be document type 127 SupplierExpenseReport). It groups the following with their subordinate packages: DueItem, ProductTaxItem, ExpenseItem, and PaidInvoiceExpenseItem.

DueItem

DueItem is a payable listed in an expense report and due to the expense reporter. DueItem can include DueDate and GrossAmount. DueDate may have a cardinality of 1, is a calendar date on which the payable is due net (without cash discount) in accordance with the terms of payment, and may be based on GDT: Date. GrossAmount may have a cardinality of 1, is a gross amount of the payable in expense report currency (a positive amount is an increase in payables, while a negative amount is a decrease in payables), and may be based on GDT: Amount. In some implementations, integrity conditions can exist such that DueItem exists only once and contains the due date (without cash discount) and the total gross amount of the payable in the expense report.

ProductTaxItem

ProductTaxItem is a receivable from sales tax that was listed in an expense report. This is a tax that can be applied to product-related business transactions such as purchasing, sales, or consumption. ProductTaxItem can include TaxDeclarationTaxAmount and TaxDeclarationNonDeductibleAmount.

TaxDeclarationTaxAmount may have a cardinality of 1, is an amount of tax in tax declaration currency (a positive amount is an increase in receivables, while a negative amount is a decrease in receivables), and may be based on GDT: Amount. TaxDeclarationNonDeductibleAmount may have a cardinality of 0..1, is an amount of tax, in tax declaration currency, that is non-deductible, and may be based on GDT: Amount. In some implementations, integrity conditions can exist such that ProductTaxItem is not mandatory, such as when the business transaction is not tax-relevant. However, multiple ProductTaxItems can be needed if there are multiple sales tax types or rates. This is the case in the United States where city, county, and state taxes apply. In some implementations, at least one separate ProductTaxItem is then needed for each of these levels.

ExpenseReportAccountingNotificationProductTaxItemTax Package

The ExpenseReportAccountingNotificationProductTaxItemTax package contains all accounting-relevant information on a given receivable due from sales taxes. It can include the ProductTax entity. ProductTax contains all accounting-relevant information on a given receivable or payable due from sales taxes. ProductTax is of the type GDT: ProductTax, and can include CountryCode, EventTypeCode, TypeCode, RateTypeCode, Amount, NonDeductibleAmount, BusinessTransactionDocumentItemGroupID, DueCategoryCode, DeferredIndicator, and RegionCode. CountryCode may have a cardinality of 1, is a country code (which may be based on ISO 3166-1) specifying the country in which the tax is incurred, and may be based on GDT: CountryCode. EventTypeCode may have a cardinality of 1, is a tax event characterizing the conditions of the purchase, sale, or consumption of a product, and may be based on GDT: ProductTaxEventTypeCode. TypeCode may have a cardinality of 1, is a tax type code that determines which type of tax (such as sales tax, state/provincial sales tax, or local sales tax) is involved based on CountryCode and RegionCode, and may be based on GDT: TaxTypeCode. RateTypeCode may have a cardinality of 1, is a tax rate type code as used in legislation to classify tax rates, encodes the tax rate based on CountryCode and RegionCode, and may be based on GDT: TaxRateTypeCode. Amount may have a cardinality of 1, is an amount of tax in expense report currency (a positive amount is an increase in receivables, while a negative amount is a decrease in receivables), and may be based on GDT: Amount. NonDeductibleAmount may have a cardinality of 0..1, is an amount of tax in expense report currency that is non-deductible, and may be based on GDT: Amount. BusinessTransactionDocumentItemGroupID may have a cardinality of 0..1, assigns each ProductTaxItem to a group of ExpenseItems that are taxed the same (in some implementations, any values can be used as long as they are used consistently within a document), and may be based on GDT: BusinessTransactionDocumentItemGroupID. DueCategoryCode may have a cardinality of 1, is a due category code that determines whether the item is a tax receivable or a tax payable, and may be based on GDT: DueCategoryCode. DeferredIndicator may have a cardinality of 0..1, and indicates whether the tax is deferred. The default value of the DeferredIndicator is False. That is, unless the indicator is explicitly set, the tax of the corresponding ProductTaxItem may not be deferred tax. DeferredIndicator may be based on GDT: TaxDeferredIndicator. RegionCode may have a cardinality of 0..1, is a region code (which may be based on ISO 3166-2) specifying the region in which the tax is charged, and may be based on GDT: RegionCode. In some implementations, integrity conditions can exist such that the entity ProductTax exists once and only once for each ProductTaxItem and that BusinessTransactionDocumentItemGroupID is to be filled if and only if it is also transferred in the ExpenseItems.

ExpenseItem

ExpenseItem contains all expenses in a given expense report item. ExpenseItem can include OperationalDocumentItemReference, NetAmount, AccountDeterminationExpenseGroupCode, Note, and BusinessTransactionDocumentItemGroupID. OperationalDocumentItemReference may have a cardinality of 1, is a reference to the document item in which the expense report business transaction was entered, and may be based on GDT: ObjectNodeReference. In some implementations, integrity conditions can exist such that the element FormattedID may be filled. NetAmount may have a cardinality of 1, and is a total net amount of the expense report item in expense report currency. This amount represents expense. That is, a positive amount is an increase in expenses, while a negative amount is a decrease in expenses. NetAmount may be based on GDT: Amount. AccountDeterminationExpenseGroupCode may have a cardinality of 1, indicates how the expenses are grouped from the perspective of G/L account determination, and may be based on GDT: AccountDeterminationExpenseGroupCode. Note may have a cardinality of 0..1, is item text of the expense report, and may be based on GDT: SHORT_Note. BusinessTransactionDocumentItemGroupID may have a cardinality of 0..1, and can group the ExpenseItems that are taxed the same and assigns them to the corresponding ProductTaxItem. In some implementations, any values can be used as long as they are used consistently within a document. BusinessTransactionDocumentItemGroupID may be based on GDT: BusinessTransactionDocumentItemGroupID. In some implementations, integrity conditions can exist such that at least one ExpenseItem may exist and that BusinessTransactionDocumentItemGroupID is to be filled if and only if it is also transferred in the ProductTaxItems.

ExpenseReportAccountingNotificationExpenseItemAccountingCodingBlockAssignment Package The ExpenseReportAccountingNotificationExpenseItemAccountingCodingBlockAssignment package contains all account coding information for a given expense report item. It contains the AccountingCodingBlockAssignment entity. AccountingCodingBlockAssignment contains the accounting objects to which the expenses of a given expense report item are assigned. AccountingCodingBlockAssignment is of the type GDT: AccountingCodingBlockAssignment. In some implementations, AccountingCodingBlockAssignment is optional. Since it is possible to distribute the expenses of an expense report item to more than one cost object, there can be more than one AccountingObjectsSetAssignment for each ExpenseItem. This assignment can be made before the sending applications. The sending applications can ensure that any percentage or quantity based distribution is converted into amount-based distribution so that the corresponding amounts are transferred instead of percentages or quantities. This prevents rounding differences between the sending applications and Accounting. In some implementations, the sum of the amounts may equal the NetAmount of the ExpenseItems.

PaidInvoiceExpenseItem

PaidInvoiceExpenseItem contains all expenses in a paid invoice that are to be reported using a given expense report item. These are expenses that were paid by the company and not by the expense reporter (such as a flight ticket that the travel agency billed directly to the company) and which the expense reporter wants to transfer to a different accounting object (such as a sales order). PaidInvoiceExpenseItem can include BaseBusinessTransactionDocumentItemID, NetAmount, and AccountDeterminationExpenseGroupCode. BaseBusinessTransactionDocumentItemID may have a cardinality of 1, is an identification of the expense report item, and may be based on GDT: BusinessTransactionDocumentItemID. NetAmount may have a cardinality of 1, and is a total net amount of the expense report item in expense report currency. This amount can represent expense. That is, a positive amount is an increase in expenses, while a negative amount is a decrease in expenses.

Except for the special case of correcting a preceding expense report, a PaidInvoiceExpenseItem can represent a decrease in the originally posted expense, so the amount is normally negative. NetAmount can be based on GDT: Amount. AccountDeterminationExpenseGroupCode may have a cardinality of 1, indicates how the expenses are grouped from the perspective of G/L account determination, and may be based on GDT: AccountDeterminationExpenseGroupCode. In some implementations, integrity conditions can exist such that for each PaidInvoiceExpenseItem, there may be an ExpenseItem with an identical BaseBusinessTransactionDocumentItemID.

PaidInvoiceExpenseReportAccountingNotificationExpenseItemAccountingCodingBlockAssignment Package The PaidInvoiceExpenseReportAccountingNotificationExpenseItemAccountingCodingBlockAssignment package contains all account coding information concerning the expenses in a paid invoice that are to be reported using a given expense report item. It contains the AccountingCodingBlockAssignment entity. AccountingCodingBlockAssignment contains the accounting objects to which the expenses of a given expense report item paid through an invoice are assigned. AccountingCodingBlockAssignment is of the type GDT: AccountingCodingBlockAssignment. In some implementations, assignment to multiple accounting objects is not supported. In some implementations, there can only be one AccountingObjectsSetAssignment for each PaidInvoiceExpenseItem.

CancellationAccountingNotificationMessage Message Data Type

The message data type CancellationAccountingNotificationMessage can contain the CancellationAccountingNotification object contained in the business document and business information that is relevant for sending a business document in a message. It contains the MessageHeader package and the CancellationAccountingNotification package. The message data type CancellationAccountingNotificationMessage thus provides the structure for the message type CancellationAccountingNotification and the interfaces based thereon.

CancellationAccountingNotification Package

The CancellationAccountingNotification package contains all accounting information regarding the cancellation of an Operational Document or the cancellation of items in an Operational Document. It contains the CancelledOperationalDocument package. CancellationAccountingNotification is a view of the AccountingNotification that is required for the cancellation of a posted Operational Document. CancellationAccountingNotification can include OperationalDocumentContainingBusinessObjectReference, OperationalDocumentReference, OperationalDocumentTransactionUUID, AccountingBusinessTransactionDate, AccountingBusinessTransactionDateTime, Note, CompanyID, and @reconciliationPeriodCounterValue.

OperationalDocumentContainingBusinessObjectReference may have a cardinality of 0..1, is a reference to the business object which contains the Operational Document in which the cancellation was entered, and may be based on GDT: ObjectNodeReference. In some implementations, integrity conditions can exist such that the element FormattedID may be filled. OperationalDocumentReference may have a cardinality of 1, is a reference to the Operational Document in which the cancellation was entered and about which Financial Accounting is notified in the CancellationAccountingNotification, and may be based on GDT: ObjectNodeReference. In some implementations, integrity conditions can exist such that the element FormattedID may be filled. OperationalDocumentTransactionUUID may have a cardinality of 0..1, is a universally unique identifier of the transaction during which the Operational Document was cancelled, and may be based on GDT: UUID. In some implementations, integrity conditions can exist such that the element may be filled if the cancellation Operational Document is the same as the cancelled Operational Document. AccountingBusinessTransactionDate may have a cardinality of 0..1, Date on which the cancellation is relevant for accounting, and may be based on GDT: Date. AccountingBusinessTransactionDateTime may have a cardinality of 0..1, is a date and time when the cancellation is relevant for accounting, and may be based on GDT: GLOBAL_DateTime. Note may have a cardinality of 0..1, is a short note on the cancellation (e.g., the reason for the cancellation), and may be based on GDT: SHORT_Note. CompanyID may have a cardinality of 1, is the company in which the cancellation takes place, and may be based on GDT: OrganisationalCentreID. @reconciliationPeriodCounterValue may have a cardinality of 1, and may be based on GDT: CounterValue. In some implementations, it may not be possible to specify both AccountingBusinessTransactionDate and AccountingBusinessTransactionDateTime. If neither of these two elements is specified, the AccountingBusinessTransactionDate element of the cancelled business transaction can be used. The selected format (Date or DateTime) can match the format in the message that notified Accounting about the original business transaction (such as AccountingBusinessTransactionDate in the message InvoiceAccountingNotification). The type of the Operational Document of the cancellation can match that of the cancelled business transaction document.

CancelledOperationalDocumentReference Package

The CancelledOperationalDocumentReference package contains all references to the Operational Document and the items being cancelled. The CancelledOperationalDocumentReference package contains the CancelledOperationalDocument and CancelledOperationalDocumentItem entities.

CancelledOperationalDocument

CancelledOperationalDocument is the reference to the Operational Document whose cancellation Accounting is notified about. CancelledOperationalDocument can include ContainingBusinessObjectReference, Reference, and TransactionUUID. ContainingBusinessObjectReference may have a cardinality of 0..1, is a reference to the business object which contains the cancelled Operational Document or the Operational Document which contains cancelled the items, and may be based on GDT: ObjectNodeReference. In some implementations, integrity conditions can exist such that the element FormattedID may be filled. Reference may have a cardinality of 1, is a reference to the cancelled Operational Document or the Operational Document which contains the cancelled items about whose cancellation Financial Accounting is notified in the CancellationAccountingNotification, and may be based on GDT: ObjectNodeReference. In some implementations, integrity conditions can exist such that the element FormattedID may be filled. TransactionUUID may have a cardinality of 0..1, is a universally unique identifier of the transaction during which the cancelled Operational Document was created or changed, and may be based on GDT: UUID.

In some implementations, integrity conditions can exist such that the element may be filled if the cancellation Operational Document is the same as the cancelled Operational Document, and that the CancelledOperationalDocument-ContainingBusinessObjectReference may be omitted if and only if the CancelledOperationalDocument-ContainingBusinessObject is identical to the CancelledOperationalDocument (for example, reference to the document for an invoice, credit memo, or payment, but also to the document for an inventory change).

CancelledOperationalDocumentItem

CancelledOperationalDocumentItem is the reference to an item of the Operational Document about whose cancellation Accounting is notified. CancelledOperationalDocumentItem can include Reference, which may have a cardinality of 1, is a reference to the cancelled Operational Document item, and may be based on GDT: ObjectNodeReference. In some implementations, integrity conditions can exist such that the element FormattedID may be filled.

OpenItemAccountingNotificationMessage

The OpenItemAccountingNotificationMessage message data type contains the OpenItemAccountingNotification object contained in the business document and the business information that is relevant for sending a business document in a message. It contains the MessageHeader package and the OpenItemAccountingNotification package. In some implementations, OpenItemAccountingNotification may be used for migration only and it might not be used to notify directly about open items resulting from an operational business transaction The OpenItemAccountingNotification Package is the grouping of OpenItemAccountingNotification with its Item package. OpenItemAccountingNotification is a notification to Accounting regarding open items for a company which are to be migrated from a legacy system to a new ERP system. OpenItemAccountingNotification is of IDT: OpenItemAccountingNotification, and can include OperationalDocumentReference, AccountingBusinessTransactionDate, OperationalDocumentDate, CompanyID, and Note. OperationalDocumentReference may have a cardinality of 1, and may be based on GDT: ObjectNodeReference. AccountingBusinessTransactionDate may have a cardinality of 1, and may be based on GDT: Date. OperationalDocumentDate may have a cardinality of 1, and may be based on GDT: Date. CompanyID may have a cardinality of 1, and may be based on GDT: OrganisationalCentreID. Note may have a cardinality of 0..1, and may be based on GDT: SHORT_Note.

OpenItemAccountingNotificationItem Package

The OpenItemAccountingNotificationItem Package is the grouping of OpenItemAccountingNotificationItem with the following entities and their subordinate packages DueItem, ProductTaxItem, WithholdingTaxItem, and CashItem. An OpenItemAccountingNotificationItem corresponds to an open item which is to be migrated from a legacy system to a new ERP system. OpenItemAccountingNotificationItem is of IDT: OpenItemAccountingNotificationItem, and can include TransactionCurrencyAmount, LocalCurrencyAmount, SetOfBooksCurrencyAmount, HardCurrencyAmount, IndexBasedCurrencyAmount, AccountingCodingBlockAssignment, and ItemNote.

TransactionCurrencyAmount may have a cardinality of 1, and may be based on GDT: Amount. LocalCurrencyAmount may have a cardinality of 1, and may be based on GDT: Amount. SetOfBooksCurrencyAmount may have a cardinality of 0..1, and may be based on GDT: Amount. HardCurrencyAmount may have a cardinality of 0..1, and may be based on GDT: Amount. IndexBasedCurrencyAmount may have a cardinality of 0..1, and may be based on GDT: Amount. AccountingCodingBlockAssignment may have a cardinality of 0..n, and may be based on GDT: AccountingCodingBlockAssignment. ItemNote may have a cardinality of 0..1, and may be based on GDT: SHORT_Note. In some implementations, integrity conditions can exist such that each Item occurs in one and only one of the specializations DueItem, ProductTaxItem, WithholdingTaxItem, CashItem.

AccountingCodingBlockAssignment Package

The AccountingCodingBlockAssignment Package groups the AccountingCodingBlocksAssignments assigned to an item. It contains the AccountingCodingBlockAssignment entity. For an Item, an AccountingCodingBlockDistribution determines which business objects (such as profit centers) to assign the amounts in the Item. The AccountingCodingBlockAssignment is of GDT: AccountingCodingBlockAssignment.

DueItem

The DueItem contains information relevant for the item it is assigned to in the case that the specification of this item is DueItem. It contains information concerning receivables or payables. The OpenItemAccountingNotificationItemDueItem is of IDT: OpenItemAccountingNotificationDueItem, which can include Debtor Party, Creditor Party, TradeReceivablesPayablesRegisterItemTypeCode, AccountsReceivableDueItemTypeCode, AccountsPayableDueItemTypeCode, and DueDate. Debtor Party may have a cardinality of 0..1, and may be based on GDT: BusinessTransactionDocumentParty. Creditor Party may have a cardinality of 0..1, and may be based on GDT: BusinessTransactionDocumentParty. TradeReceivablesPayablesRegisterItemTypeCode may have a cardinality of 0..1, and may be based on GDT: TradeReceivablesPayablesRegisterItemTypeCode. AccountsReceivableDueItemTypeCode may have a cardinality of 0..1, and may be based on GDT: AccountsReceivableDueItemTypeCode. AccountsPayableDueItemTypeCode may have a cardinality of 0..1, and may be based on GDT: AccountsPayableDueItemTypeCode. DueDate may have a cardinality of 0..1, and may be based on GDT: Date. In some implementations, integrity conditions can exist such that one and only one of the elements Debtor Party and Creditor Party has to be filled and that if DueDate is filled, Schedule is not allowed, and if DueDate is not filled, at least one Schedule has to exist.

The OpenItemAccountingNotificationItemDueItemParty Package groups the entities OpenItemAccountingNotificationItemDueItemDebtor Party and OpenItemAccountingNotificationItemDueItemCreditor Party. The OpenItemAccountingNotificationItemDueItemDueSchedule Package is a grouping of the DueSchedules belonging to an OpenItemAccountingNotificationItemDueItem. OpenItemAccountingNotificationItemDueItemDueSchedule specifies which due dates are assigned parts of the amount specified in the item, in the case that not the whole amount is due at the same date.

ProductTaxItem

The ProductTaxItem contains information relevant for the item it is assigned to in the case that the specification of this item is ProductTaxItem. It contains information concerning product tax. The ProductTaxItem is of IDT: OpenItemAccountingNotificationProductTaxItem, which can include TaxDeclarationTaxAmount, ProductTax, CountryCode, EventTypeCode, TypeCode, RateTypeCode, DueCategoryCode, DeferredIndicator, and RegionCode. TaxDeclarationTaxAmount may have a cardinality of 0..1, and may be based on GDT: Amount. ProductTax may have a cardinality of 1, and may be based on GDT: ProductTax. CountryCode may have a cardinality of 1, and may be based on GDT: CountryCode. EventTypeCode may have a cardinality of 1, and may be based on GDT: ProductTaxEventTypeCode. TypeCode may have a cardinality of 1, and may be based on GDT: TaxTypeCode. RateTypeCode may have a cardinality of 1, and may be based on GDT: TaxRateTypeCode. DueCategoryCode may have a cardinality of 1, and may be based on GDT: DueCategoryCode. DeferredIndicator may have a cardinality of 0..1, and may be based on GDT: Indicator. RegionCode may have a cardinality of 0..1, and may be based on GDT: RegionCode. In some implementations, integrity conditions can exist such that if TaxDeclarationCurrencyCode differs from LocalCurrencyCode, TaxDeclarationTaxAmount has to be filled.

OpenItemAccountingNotificationItemProductTaxItemTax Package contains the OpenItemAccountingNotificationItemProductTaxItemProductTax entity.

WithholdingTaxItem

The WithholdingTaxItem contains information relevant for the item it is assigned to in the case that the specification of this item is WithholdingTaxItem. It contains information concerning withholding tax. The WithholdingTaxItem is of IDT: OpenItemAccountingNotificationWithholdingTaxItem, which can include TaxDeclarationTaxAmount, WithholdingTax, CountryCode, EventTypeCode, TypeCode, RateTypeCode, and RegionCode. TaxDeclarationTaxAmount may have a cardinality of 0..1, and may be based on GDT: Amount. WithholdingTax may have a cardinality of 1, and may be based on GDT: WithholdingTax. CountryCode may have a cardinality of 1, and may be based on GDT: CountryCode. EventTypeCode may have a cardinality of 1, and may be based on GDT: WithholdingTaxEventTypeCode. TypeCode may have a cardinality of 1, and may be based on GDT: TaxTypeCode. RateTypeCode may have a cardinality of 1, and may be based on GDT: TaxRateTypeCode. RegionCode may have a cardinality of 0..1, and may be based on GDT: RegionCode.

OpenItemAccountingNotificationItemWithholdingTaxItemTax Package can include the OpenItemAccountingNotificationItemWithholdingTaxItemWithholdingTax entity. The OpenItemAccountingNotificationItemCashItemParty Package can contains the OpenItemAccountingNotificationItemCashItemHouseBank entity.

CashItem

The CashItem contains information relevant for the item it is assigned to in the case that the specification of this item is CashItem. It contains information concerning the inflow or outflow of cash. CashItem can include HouseBank, PaymentRegistrationTypeCode, and PaymentFormCode. HouseBank may have a cardinality of 0..1, and may be based on GDT: BusinessTransactionDocumentParty. PaymentRegisterItemTypeCode may have a cardinality of 1, and may be based on GDT: PaymentRegisterItemTypeCode. PaymentFormCode may have a cardinality of 0..1, and may be based on GDT: PaymentFormCode. In some implementations, in the field HouseBank, only the field InternlId is used.

AccountsReceivablePayableLedgerAccount

Figures 1, 82:
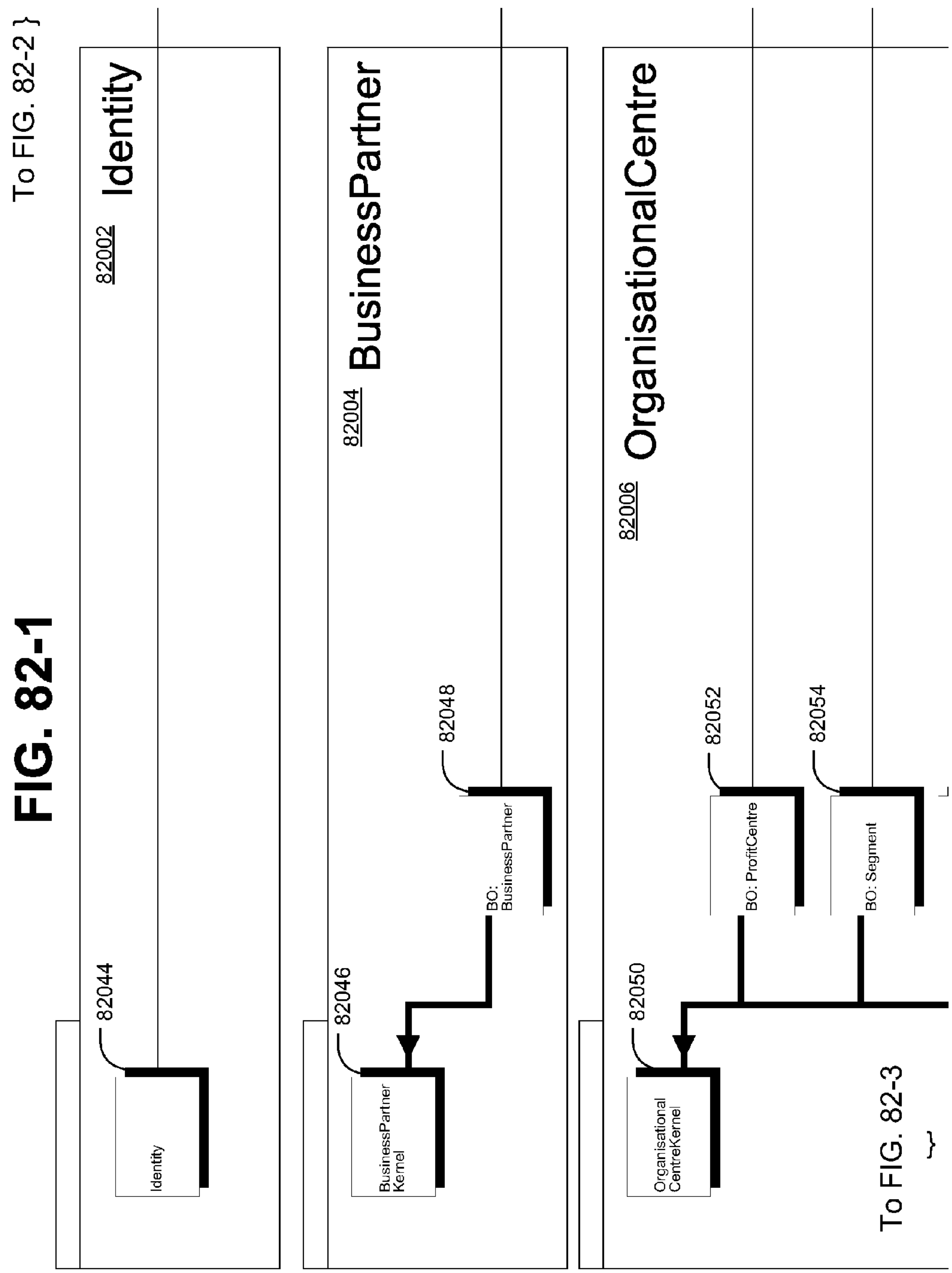
Figures 2, 82:
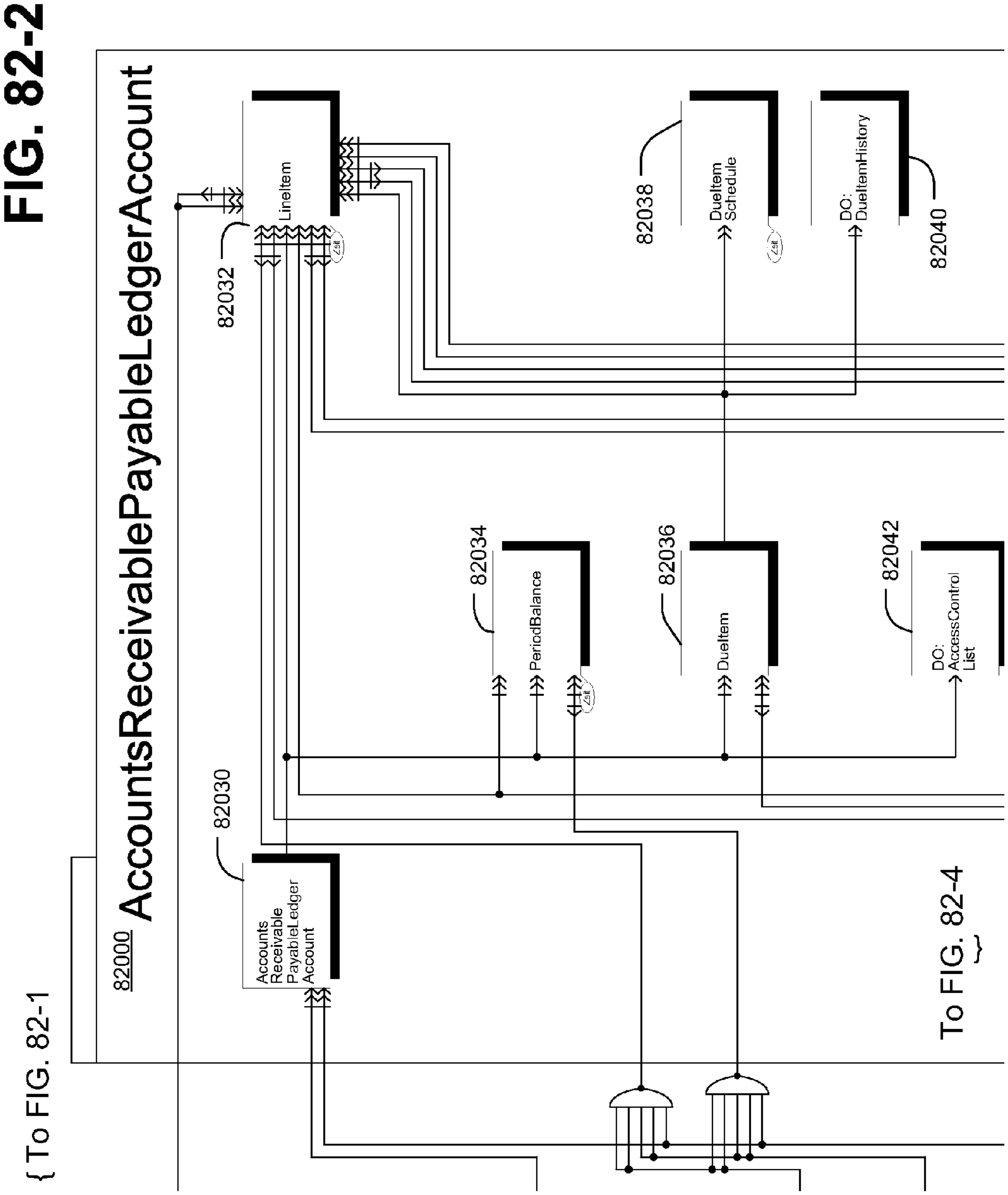
Figures 3, 82:
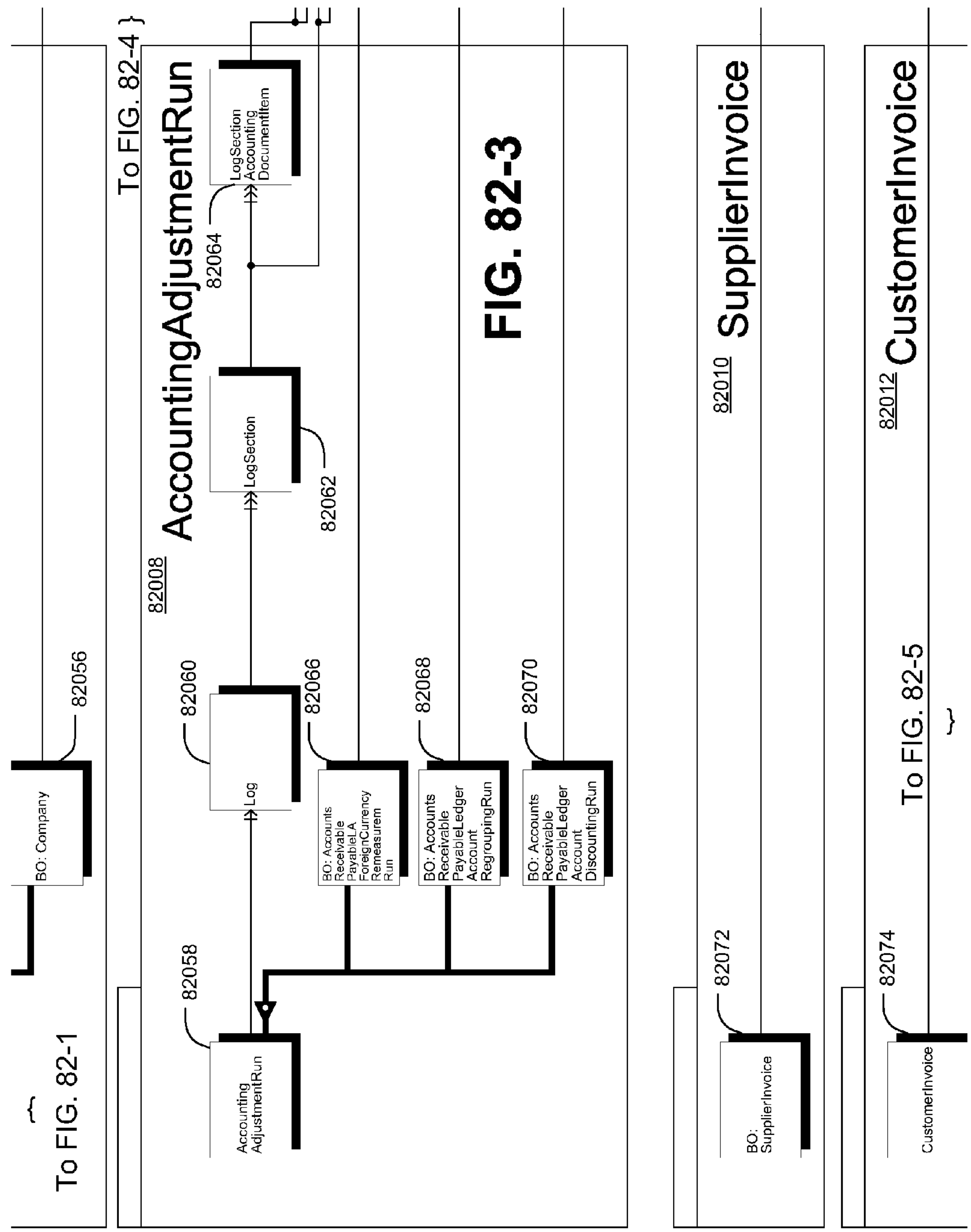
Figures 4, 82:
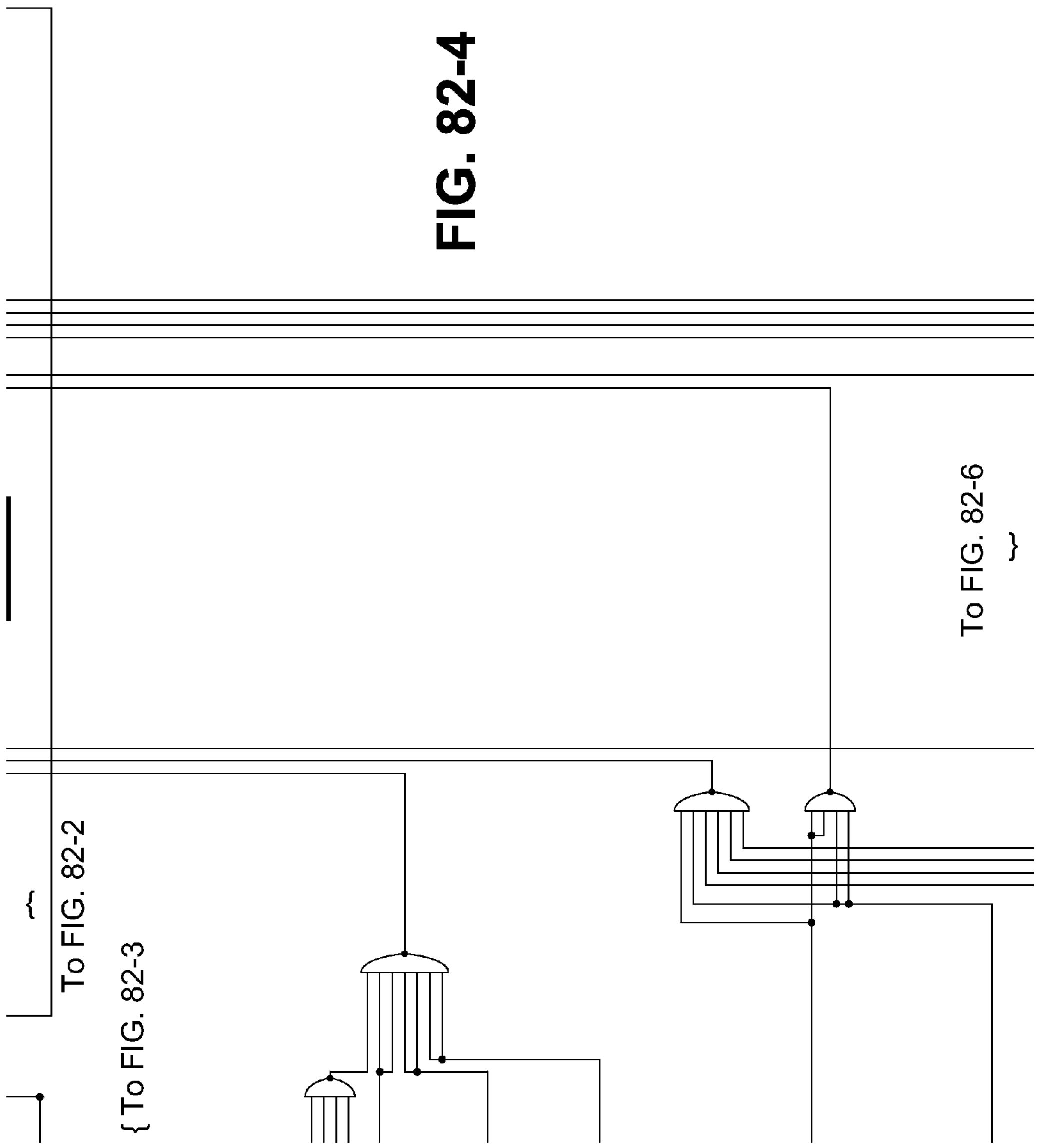
Figures 5, 82:
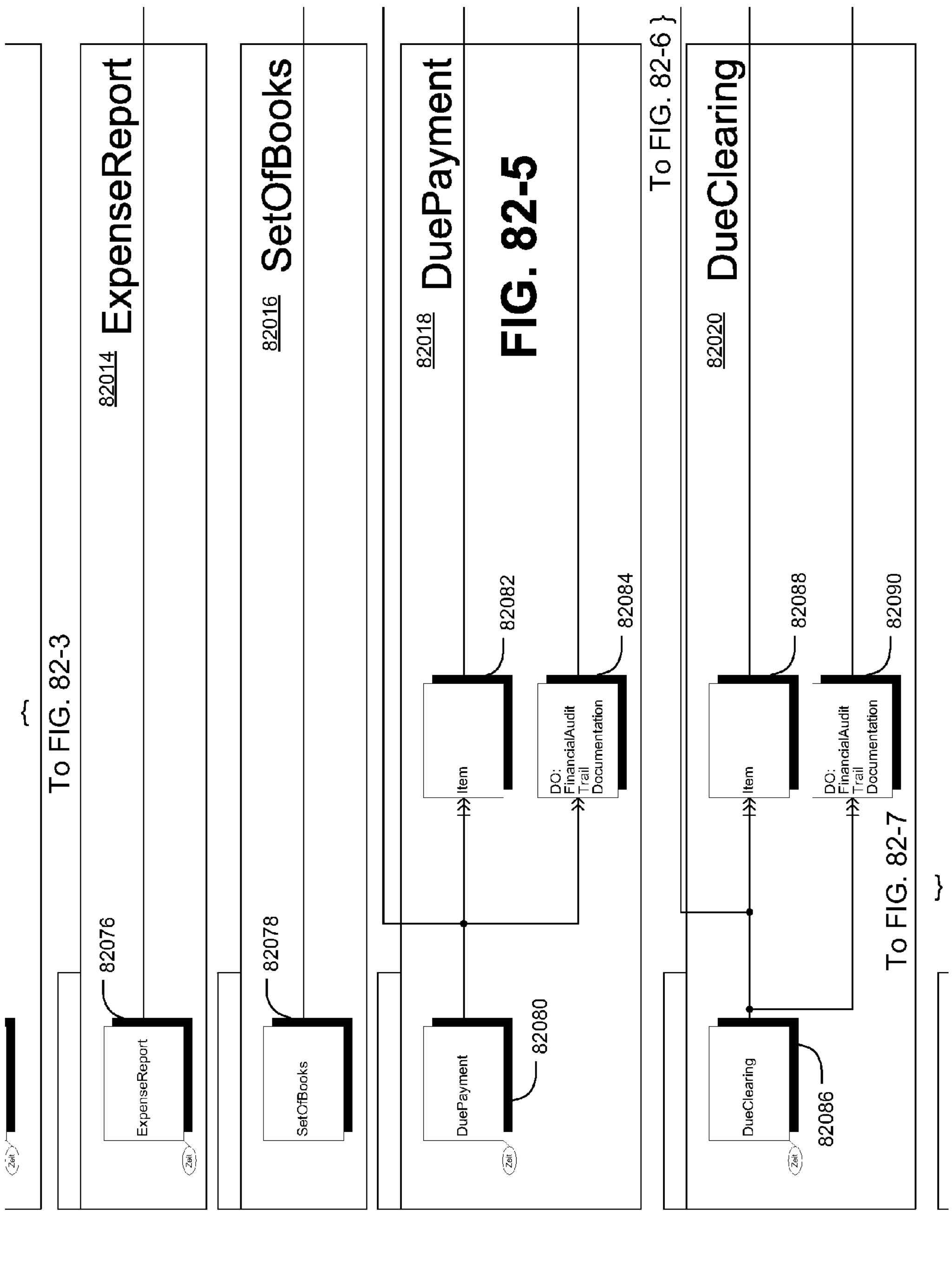
Figures 6, 82:
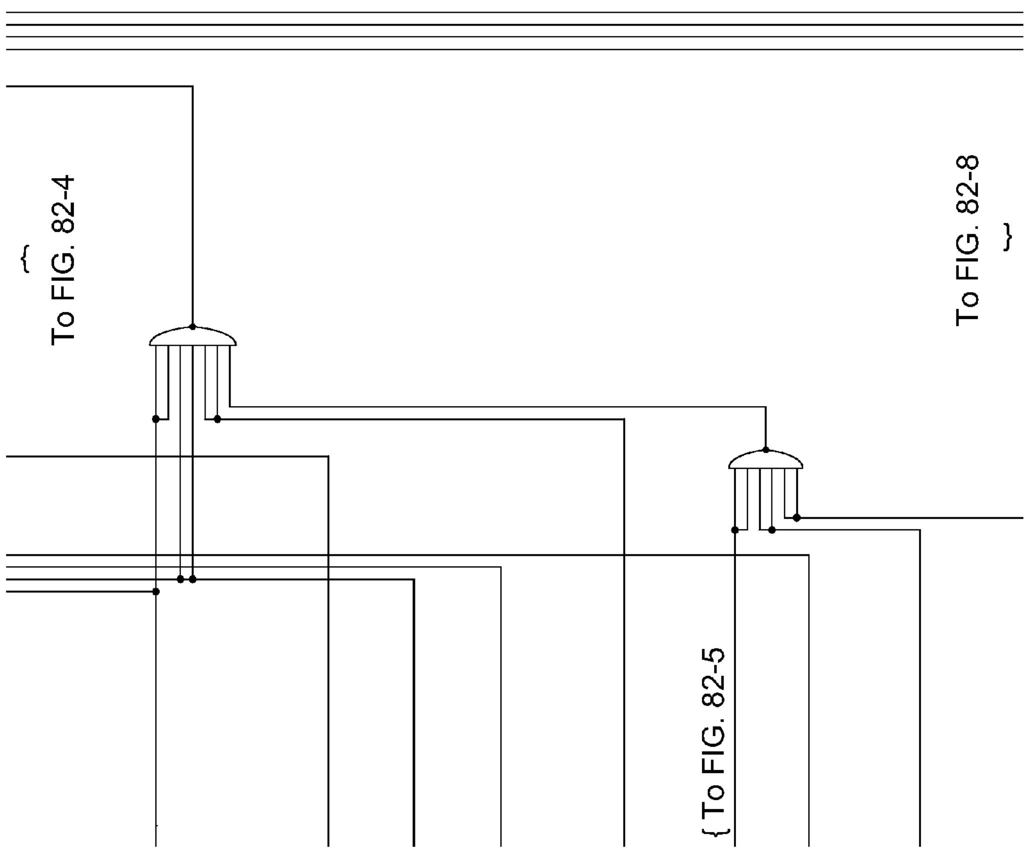
Figures 7, 82:
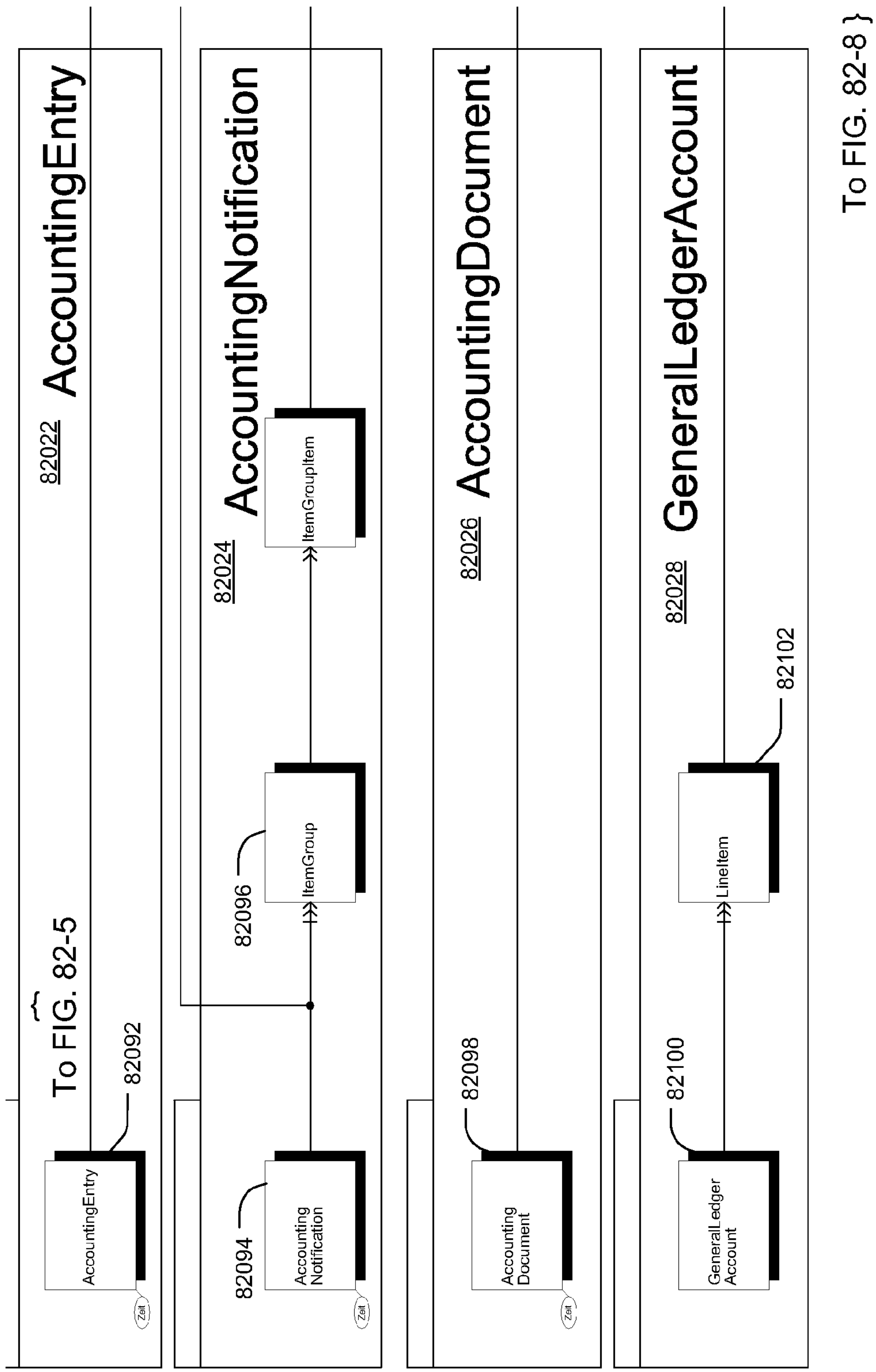
Figures 8, 82:
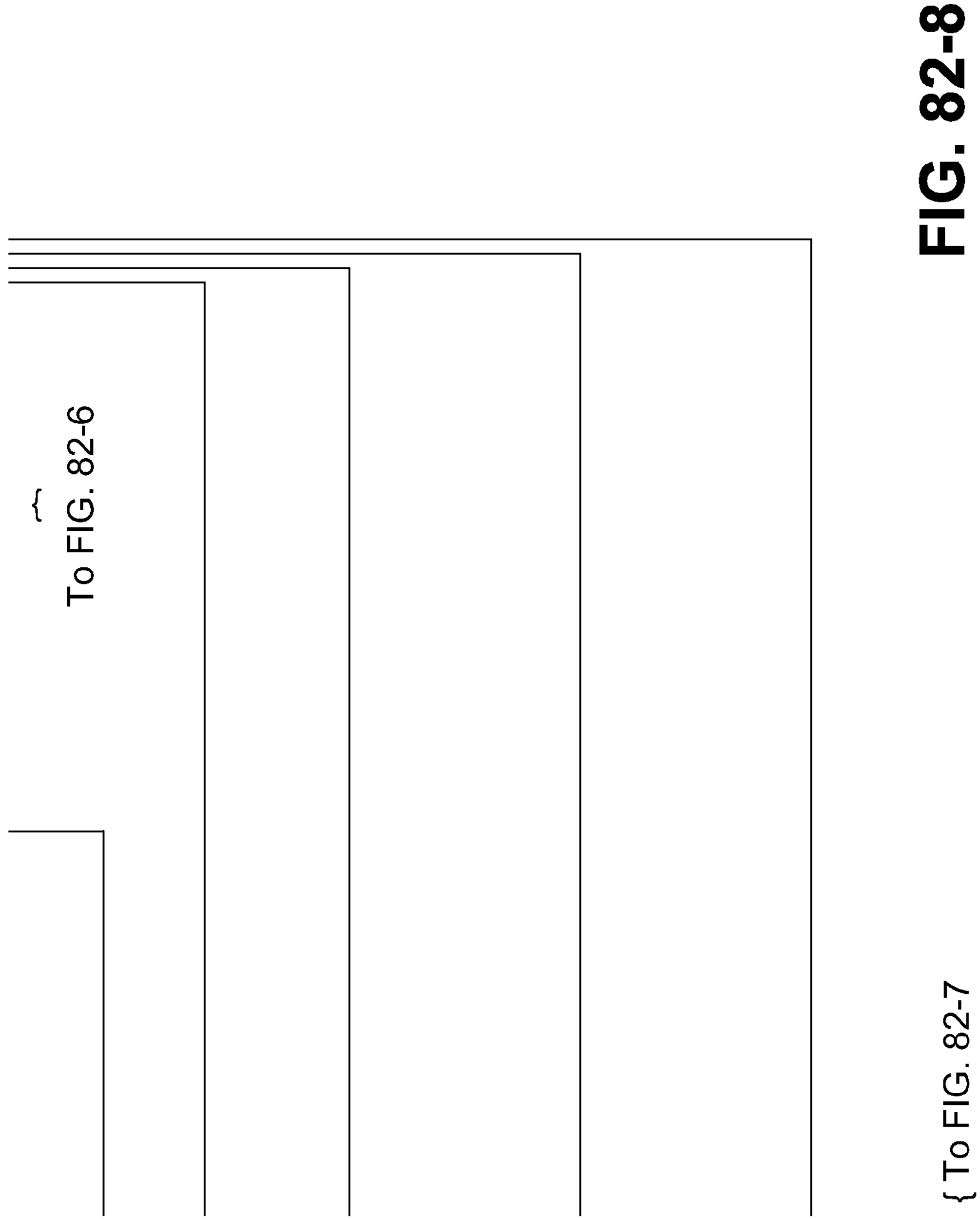

FIGS. 82-1 through 82-8 illustrate an example AccountsReceivablePayableLedgerAccount business object model 82000. Specifically, this model depicts interactions among various hierarchical components of the AccountsReceivablePayableLedgerAccount, as well as external components that interact with the AccountsReceivablePayableLedgerAccount (shown here as 82000 through 82028 and 82042 through 82102).

The AccountsReceivablePayableLedgerAccount can be defined as a Record for a company based on the principle of double-entry bookkeeping that reflects the effects of business transactions on the valuated balance of trade payables and receivables. It can serve as a structuring element for collecting and evaluating postings in the customer/vendor subledger (payables/receivables subledger). It can contain values concerning the payables or receivables that a company may have with a business partner. Subsequently a generic approach for referencing Operational Documents can be used An operational document may be a document about a business transaction that takes place in an operational business area outside Financial Accounting. From the Financial Accounting point of view operational documents can be assigned to the categories "Contract", "Order" and "Confirmation". The Notification of an Operational Document to Accounting can result in postings (confirmations can be posted) and lead to the creation of LineItems. The reference to the operational document in LineItems can have a specific semantic and may be called Original Entry Document (german: Prima Nota) reference. An Original Entry Document can be a document that can be used for auditing purposes and can verify that the value stated in the LineItem of a ledger account has been booked on the base of a real business transaction. Subsequently also a generic approach for referencing Original Entry Documents can be used. An Original Entry Document may be contained in another Object, the Original Entry DocumentContainingObject. Typical such constellations may include: FinancialAuditTrailDocumentation contained in a Host object like DuePayment, DueClearing, Dunning, and PaymentAllocation from Operative Financials, LogSection contained in all AccountingAdjustmentRun-MDROs (e.g. InventoryPriceChangeRun, GeneralLedgerAccountBalanceDistributionRun, FixedAssetDepreciationRun, WorkInProcessClearingRun), SettlementResultAccounting contained in an ExpenseReport, and PeriodItem contained in an Employee. The business object AccountsReceivablePayableLedgerAccount 82030 can be part of the process component Accounting. AccountsReceivablePayableLedgerAccount may contain the following components: DueItem 82036, DueItemSchedule 82038, LineItem 82032, and PeriodBalance 82034. The component DueItem can be a representation of items due in operations, such as invoices or down payments, in Financial Accounting. The component DueItemSchedule can keep a schedule for a DueItem in which a DueItem becomes due for payment as agreed per contract. The component LineItem can keep a record for an AccountsReceivablePayableLedgerAccount about the value of the change in stock following a business transaction. Furthermore, this component can contain detailed information on the business transaction from the accounting view. The component PeriodBalance can keep a period-based record for an AccountsReceivablePayableLedgerAccount of the value of receivables or payables. AccountsReceivablePayableLedgerAccount can be represented by the node AccountsReceivablePayableLedgerAccount. A business transaction can cause a change to the value of a AccountsReceivablePayableLedgerAccount and can be posted, then a set of rules determines which GeneralLedgerAccounts can be concerned. The posting of the business transaction can cause a change in value of the same amount in the GeneralLedgerAccounts determined.

The business object AccountsReceivablePayableLedgerAccount can be involved in the process integration models of MigrationAdaptor Processing_Accounting. The process integration model Accounting_Accounting can be used to connect external accounting components or to transfer legacy data to Financial Accounting. The service interface Accounts Receivable Payable Ledger Account Transmission In can be called by the technical name of AccountsReceivablePayableLedgerAccountTransmissionIn. The Service Interface Accounts Receivable Payable Ledger Account Transmission In can part of the Process Component Interaction Model MigrationAdaptor Processing_Accounting. The Accounts Receivable Payable Ledger Account Transmission In can group the operations that inform Accounting about the master data parts (root nodes) of AccountsReceivablePayableLedgerAccounts which can be migrated from a legacy system to a new ERP system. The service interface for Operation Transmit Accounts Receivable (A2A) can also be called AccountsReceivablePayableLedgerAccountTransmissionIn.TransmitAccountsReceivable. It can converts information about master data parts (root nodes) of AccountsReceivablePayableLedgerAccounts which can be migrated from a legacy system to a new ERP system into master data parts (root nodes) of AccountsReceivablePayableLedgerAccount The operation can be based on message type AccountsReceivableLedgerAccountTransmitRequest (derived from business object AccountsReceivablePayableLedgerAccount). This operation can transmit AccountsReceivable. The interface for Operation Transmit Accounts Payable can be referred to as AccountsReceivablePayableLedgerAccountTransmissionIn.TransmitAccountsPayable. Furthermore, it can convert information about master data parts (root nodes) of AccountsReceivablePayableLedgerAccounts which can be migrated from a legacy system to a new ERP system into master data parts (root nodes) of AccountsReceivablePayableLedgerAccount The operation can be based on message type AccountsPayableLedgerAccountTransmitRequest (which can be derived from business object AccountsReceivablePayableLedgerAccount). This operation can transmit AccountsPayable.

AccountsReceivablePayableLedgerAccount

AccountsReceivablePayableLedgerAccount (Root Node of Business Object AccountsReceivablePayableLedgerAccount) can be defined as a record for a company based on the principle of double-entry bookkeeping which can reflect the effects of business transactions on the valuated balance of trade payables and receivables. It can serve as a structuring element for collecting and evaluating postings in the customer/vendor subledger (payables/receivables subledger). It can contain values concerning the payables or receivables that a company has with a business partner. Business partners may include Customer, Supplier, and Employee. The elements located directly at the node AccountsReceivablePayableLedgerAccount can be defined by the type GDT: AccountsReceivablePayableLedgerAccountElements. These may include: UUID, CompanyUUID, BusinessPartnerUUID, PartyRoleCategoryCode, AccountDeterminationDebtorGroupCode, AccountDeterminationCreditorGroupCode, ReceivablesFunctionalUnitUUID, PayablesFunctionalUnitUUID, and Key. Furthermore, UUID (Alternative Key) can be a globally unique identifier of the AccountsReceivablePayableLedgerAccount and can be of type GDT: UUID. CompanyUUID can globally and uniquely identify the company that the recorded data relates to and can be of type GDT: UUID. The element BusinessPartnerID can globally and uniquely identify the business partner that the recorded data relates to and can be of type GDT: UUID. Coded representation of PartyRoleCategory can denote the role of the business partner. The values “3 Creditor Party” and “4 Debtor Party” can be possible. It can be of type GDT: PartyRoleCategoryCode. AccountDeterminationDebtorGroupCode, which can be optional, can be a coded representation of a group of debtors based on the viewpoint of a similar derivation of accounts in accounting and can be of type GDT: AccountDeterminationDebtorGroupCode. AccountDeterminationCreditorGroupCode, which can be optional, can be a coded representation of a group of creditors based on the viewpoint of a similar derivation of accounts in accounting and can be of type GDT: AccountDeterminationCreditorGroupCode and have an Integrity of one of the above. AccountDeterminationGroupCodes can exist for a Root depending on the PartyRoleCategoryCode. ReceivablesFunctionalUnitUUID, which can be optional, can be an universally unique identifier of the FunctionalUnit working on the AccountsReceivablePayableLedgerAccount that can contain values concerning the receivables. The Integrity: The FunctionalUnit referenced can be able to execute the organizational function Receivables Accounting, i.e. the element OrganisationalFunctionCode in one of the instances of the node FunctionalUnitAttributes in the FunctionalUnit references can have the value, ‘21’ (Receivables). It can be of type GDT: UUID. PayablesFunctionalUnitUUID, which can be optional, can be an universally unique identifier of the FunctionalUnit working on the AccountsReceivablePayableLedgerAccount that can contain values concerning the payables. The Integrity: The FunctionalUnit referenced can be able to execute the organizational function Payables Accounting, i.e. the element OrganisationalFunctionCode in one of the instances of the node FunctionalUnitAttributes in the FunctionalUnit references can have the value, '23' (Payables). It can be of type GDT: UUID. As for the Integrity: one of the above FunctionalUnitUUID can exist for a Root depending on the PartyRoleCategoryCode. The Key (Alternative Key) can be a structured business key of the AccountsReceivablePayableLedgerAccount and be of type IDT: AccountsReceivablePayableLedgerAccountKey. The AccountsReceivablePayableLedgerAccountKey can consist of the following elements: CompanyUUID, BusinessPartnerUUID, and PartyRoleCategoryCode. The element CompanyUUID can globally and uniquely identify the company that the recorded data relates to and can be of type GDT: UUID. The element BusinessPartnerID can globally and uniquely identify the business partner that the recorded data relates to and can be of type GDT: UUID. The PartyRoleCategoryCode can be a coded representation of PartyRoleCategory which can denote the role of the business partner. The values "3 Creditor Party" and "4 Debtor Party" are can be possible. It can be of type GDT: PartyRoleCategoryCode. As for the Integrity: one of the elements AccountDeterminationDebtorGroupCode and AccountDeterminationCreditorGroupCode can be filled. The following composition relationships to subordinate nodes can exist: DueItem 1:cn, LineItem 1:cn, PeriodBalance 1:cn, and AccessControlList 82042 has a cardinality of 1:1. There may be a number of inbound aggregation relationships. From the OrganisationalCentre business object (or node) to the Company business object (or node) there may be a cardinality relationship of 1:cn; the company to which the record relates. From the BusinessPartner business object (node) to the Business Partner business object (or node) there may be a cardinality relationship of 1:cn; the business partner to which the record relates.

There may be a number of inbound association relationships. From the FunctionalUnit business object (or node) to the ReceivablesFunctionalUnit business object (or node) there may be a cardinality relationship of c:cn. ReceivablesFunctionalUnit can specify the Functional Unit which can be working on the AccountsReceivablePayableLedgerAccount which can contain values concerning the receivables. From the FunctionalUnit business object (or node) to the PayablesFunctionalUnit business object (or node) there may be a cardinality relationship of c:cn. PayablesFunctionalUnit can specify the Functional Unit which is working on the AccountsReceivablePayableLedgerAccount that can contain values concerning the payables. For the Integrity, one of the above association relationships can exist for a Root RemeasureForeignCurrency and Regroup can be enterprise service infrastructure actions. The RemeasureForeignCurrency can perform a foreign currency valuation for Dues. If changes to the object occur and if valuation differences are determined, new line items can be generated for the value of the valuation differences. If changes to other objects occur and if valuation differences are determined, a business object AccountingDocument can be generated and used to post the valuation differences. A log can still be generated in the business object, AccountsReceivablePayableLedgerAccountForeignCurrencyRemeasurementRun.

The Parameters can include the action elements which can be defined by the data type AccountsReceivablePayableLedgerAccountRemeasureForeignCurrencyActionElements. These elements can consist of MassDataRunObjectID, MassDataRunObjectTypeCode, CompanyUUID, and SetOfBooksID. The MassDataRunObjectID can be an universally unique identifier for an Accounting Adjustment Run and can be of type GDT: MassDataRunObjectID. The MassDataRunObjectTypeCode can be a coded representation of a type of the Mass Data Run Object and can be of type GDT: MassDataRunObjectTypeCode. CompanyUUID, may be optional, and can be the universally unique identifier for the company, for which the action can be executed. CompanyUUID can be transferred when processing of the Accounting Adjustment Run is executed per company and set of books. CompanyUUID can be of type GDT: UUID. SetOfBooksID, may be optional, and can be a unique identifier for the set of books, for which the action is executed. SetOfBooksID can be transferred when processing of the Accounting Adjustment Run is executed per company and set of books. SetOfBooksID can be of type GDT: SetOfBooksID. The action may be performed by the business object AccountsReceivablePayableLedgerAccountForeignCurrencyRemeasurementRun.

The Regroup process can reorganize the Dues with regard to their term or their current character as receivable/payable (vendor with debit balance/customer with credit balance). If changes to the object and if regrouping is necessary, new line items can be generated for the value of the amount to be regrouped. If changes to other objects and if regrouping is necessary, a business object AccountingDocument can be generated and used to post the amount to be regrouped. A log can still be generated in the business object AccountsReceivablePayableLedgerAccountRegroupingRun (node Log). The following parameters can exist and the action elements are defined by the data type: AccountsReceivablePayableLedgerAccountRegroupActionElements. These elements can include MassDataRunObjectID, MassDataRunObjectTypeCode, CompanyUUID, and SetOfBooksID.

MassDataRunObjectID can be an universally unique identifier for an Accounting Adjustment Run and can be of type GDT: MassDataRunObjectID. MassDataRunObjectTypeCode can be a coded representation of a type of the Mass Data Run Object and can be of type GDT: MassDataRunObjectTypeCode. CompanyUUID (optional) can be an universally unique identifier for the company, for which the action can be executed. CompanyUUID can be transferred when processing of the Accounting Adjustment Run is executed per company and set of books. CompanyUUID can be of type GDT: UUID. SetOfBooksID (optional) and can be an unique identifier for the set of books, for which the action can be executed. SetOfBooksID can be transferred when processing of the Accounting Adjustment Run is executed per company and set of books. SetOfBooksID can be of type GDT: SetOfBooksID. The action can be performed by the business object AccountsReceivablePayableLedgerAccountRegroupingRun. There can be multiple queries which can be performed. The QueryByElements can deliver a list of all AccountsReceivablePayableLedgerAccounts that meet the selection criteria specified by the query elements, linked by a logical "AND". Query elements can be defined by the data type AccountsReceivablePayableLedgerAccountElementsQueryElements. These elements can include: CompanyID (optional) which can be of type GDT: OrganisationalCentreID, CompanyUUID (optional) which can be of type GDT: UUID, BusinessPartnerID (optional) which can be of type GDT: BusinessPartnerID, BusinessPartnerUUID (optional) which can be of type GDT: UUID, PartyRoleCategoryCode (optional) which can be of type GDT: PartyRoleCategoryCode, AccountDeterminationDebtorGroupCode (optional) which can be of type GDT:

AccountDeterminationDebtorGroupCode, and AccountDeterminationCreditorGroupCode (optional) which can be of type GDT: AccountDeterminationCreditorGroupCode.

The query, QueryByForeignCurrencyRemeasurementSetOfBooksID, can deliver a list of all AccountsReceivablePayableLedgerAccounts that may be relevant for foreign currency valuation within a set of books and at the end of an accounting period. AccountsReceivablePayableLedgerAccounts can be relevant for foreign currency valuation when there is at least one open DueItemHistory 82040 at the end of the accounting period. An additional prerequisite can be that the line item currency (Due.LineItemCurrencyCode) is different from the local currency or, if available, hard currency, index-based currency, or set of books currency that are updated for the corresponding company within the corresponding set of books.

Query elements can be defined by the data type: AccountsReceivablePayableLedgerAccountForeignCurrencyRemeasurementSetOfBooksIDQueryElements. These elements can include DueItemHistorySetOfBooksID, DueItemHistoryFiscalYearID, DueItemHistoryAccountingPeriodID, CompanyUUID, BusinessPartnerID, PartyRoleCategoryCode, AccountDeterminationDebtorGroupCode. AccountDeterminationCreditorGroupCode, and DueItemLineItemCurrencyCode. DueItemHistorySetOfBooksID can have one set of books that can be specified. The AccountsReceivablePayableLedgerAccounts returned can be those containing relevant data for the set of books specified here and for foreign currency valuation. DueItemHistorySetOfBooksID can be of type GDT: SetOfBooksID. One DueItemHistoryFiscalYearID may can be specified and can be of type GDT: FiscalYearID. One DueItemHistoryAccountingPeriodID can be specified.

The AccountsReceivablePayableLedgerAccounts returned can be those containing relevant data for the date specified here (which can be the last day of DueItemHistoryFiscalYearID/DueItemHistoryAccountingPeriodID) and for foreign currency valuation and can be of type GDT: AccountingPeriodID. CompanyUUID can be optional and can be of type GDT: UUID. BusinessPartnerID can be optional and can be of type GDT: BusinessPartnerID. PartyRoleCategoryCode can be of type GDT: PartyRoleCategoryCode. AccountDeterminationDebtorGroupCode may be optional and can be of type GDT: AccountDeterminationDebtorGroupCode. AccountDeterminationCreditorGroupCode may be optional and can be of type GDT: AccountDeterminationCreditorGroupCode. DueItemLineItemCurrencyCode may be optional and can be of type GDT: CurrencyCode.

The query QueryByRegroupingSetOfBooksID can deliver a list of all AccountsReceivablePayableLedgerAccounts that may be relevant for regrouping within a set of books and at the end of an accounting period. AccountsReceivablePayableLedgerAccounts can be relevant for regrouping when there is at least one open DueItemHistory at the end of the accounting period.

Query elements can be defined by the data type: AccountsReceivablePayableLedgerAccountRegroupingSetOfBooksIDQueryElements. These elements may include DueItemHistorySetOfBooksID, DueItemHistoryFiscalYearID, DueItemHistoryAccountingPeriodID, CompanyUUID, BusinessPartnerID, PartyRoleCategoryCode, AccountDeterminationDebtorGroupCode, and AccountDeterminationCreditorGroupCode. DueItemHistorySetOfBooksID can have one set of books specified and can be of type GDT: SetOfBooksID. DueItemHistoryFiscalYearID can be the fiscal year, in which the Accounting Document was posted and can be of type GDT: FiscalYearID. One DueItemHistoryAccountingPeriodID can be specified. The AccountsReceivablePayableLedgerAccounts returned can be those containing relevant data for the date specified here (which can be the last day of DueItemHistoryFiscalYearID/DueItemHistoryAccountingPeriodID) and for regrouping and can be of type GDT: AccountingPeriodID. CompanyUUID which can be optional and can be of type GDT: UUID. BusinessPartnerID which can be optional and can be of type GDT: BusinessPartnerID. PartyRoleCategoryCode which can be of type GDT: PartyRoleCategoryCode. AccountDeterminationDebtorGroupCode which may be optional and can be of type GDT: AccountDeterminationDebtorGroupCode. AccountDeterminationCreditorGroupCode may be optional and can be of type GDT: AccountDeterminationCreditorGroupCode.

The AccessControlList can be defined as a list of access groups that have access to an AccountsReceivablePayableLedgerAccount. The DueItem can be defined as the representation of an item due during operations in Financial Accounting. The elements located directly at the DueItem node can be defined by the type GDT: AccountsReceivablePayableLedgerAccountDueItemElements. These can include UUID, OrderReference, OrderItemReference, LineItemCurrencyCode, and Key. The element UUID (Alternative Key) can be a globally unique identifier of the DueItem and can be of type GDT: UUID. OrderReference can be a reference to an Operational Document that acts—from the Financial Accounting point of view—as an Order and that can be represented by the due item or whose Items can be represented by the due item. The life cycle of this operational document or of its items can be stated in the LineItems and the DueItemHistory of the AccountsReceivablePayableLedgerAccount OrderReference can be of type GDT: ObjectNodeReference. OrderItemReference (optional) can be a reference to an item of an Operational Document that acts—from the Financial Accounting point of view—as an OrderItem and that can be represented by the due item. The life cycle of this operational document item can be stated in the LineItems and the DueItemHistory of the AccountsReceivablePayableLedgerAccount. OrderItemReference can be of type GDT: ObjectNodeReference. The element LineItemCurrencyCode can specify the currency key of the currency in which the DueItem occurred. LineItemCurrencyCode can be of type GDT: CurrencyCode. Key (Alternative Key) can be a structured business key of the DueItem and can be of type IDT: AccountsReceivablePayableLedgerAccountDueItemKey. The AccountsReceivablePayableLedgerAccountDueItemKey can consist of OrderReference and OrderItemReference (optional).DueItemSchedule can have a composition relationship of 1:n. DueItemHistory can have a composition relationship of 1:c.

There may be a number of inbound aggregation relationships. From the SupplierInvoice business object (or node) to the SupplierInvoice business object (or node) there may be a cardinality relationship of c:cn. SupplierInvoice can specify the supplier invoice for which the DueItem can be represented by a due. From the CustomerInvoice business object (or node) to the CustomerInvoice business object (or node) there may be a cardinality relationship of c:cn. CustomerInvoice can specify the customer invoice for which the due can be represented by a DueItem. From the CustomerInvoice business object (or node) to the CustomerInvoice business object (or node) there may be a cardinality relationship of c:cn. CustomerInvoice can specify the customer invoice for which the due can be represented by a DueItem. From the ExpenseReport business object (or node) to the ExpenseReport business object (or node) there may be a cardinality relationship of c:cn. ExpenseReport can be an ExpenseReport whose items are represented by the DueItem. From the ExpenseReport business object (or node) to the ExpenseReportItem business object (or node) there may be a cardinality relationship of c:cn. ExpenseReportItem can be an Item in a ExpenseReport that can be represented by the DueItem. From the DuePayment business object (or node) to the DuePayment business object (or node) there may be a cardinality relationship of c:cn. DuePayment can be a DuePayment whose items are represented by the DueItem. From the DuePayment business object (or node) to the DuePaymentItem business object (or node) there may be a cardinality relationship of c:cn. DuePaymentItem. DuePaymentItem can be an Item in a DuePayment that can be represented by the DueItem. From the DueClearing business object (or node) to the DueClearing business object (or node) there may be a cardinality relationship of c:cn. DueClearing can be defined as a DueClearing whose items are represented by the DueItem. From the DueClearing business object (or node) to the DueClearingItem business object (or node) there may be a cardinality relationship of c:cn. DueClearingItem can be defined as an Item in a DueClearing that is represented by the DueItem. One of the above aggregation relationships may exist for a DueItem.

The DueItemSchedule can be defined as the part of a DueItem that can be due for payment at a specific time that can be contractually agreed upon. The elements located directly at the DueItem schedule node can be defined by the type GDT: AccountsReceivablePayableLedgerAccountDueItemScheduleElements. These can include LineItemCurrencyAmount and BusinessTransactionDate. The element LineItemCurrencyAmount can specify the value of the DueItem or of a part of the DueItem in the currency in which the due occurred and in which the relevant line items can be consequently updated. LineItemCurrencyAmount can be of type GDT: Amount and of Qualifier: LineItemCurrency. The element BusinessTransactionDate can specify the date on which the DueItem or the part of the DueItem can be due for payment (net due). BusinessTransactionDate can be of type GDT: Date and of Qualifier: BusinessTransaction. The DueItemHistory can be defined as the History of a DueItem. The node DO: DueItemHistory can be represented by the Dependent Object Accounting Clearing Object History.

LineItem

The LineItem can be defined as the line item that serves as a record for an AccountsReceivablePayableLedgerAccount containing information for a set of books about the value of a change in stock resulting from an individual business transaction. The elements directly located on the LineItem node can be defined by the type GDT AccountsReceivablePayableLedgerAccountLineItemElements. These elements can include UUID, SetOfBooksID, SegmentUUID, ProfitCentreUUID, PartnerCompanyUUID, PartnerSegmentUUID, PartnerProfitCentreUUID, AccountingDocumentUUID, AccountingDocumentID, AccountingDocumentItemID, OriginalEntryDocumentContainingObjectReference, OriginalEntryTransactionUUID, OriginalEntryDocumentReference, OriginalEntryDocumentItemReference, OriginalEntryDocumentItemTypeCode, OriginalEntryDocumentPartnerID, AccountingNotificationUUID, AccountingNotificationItemGroupItemUUID, GeneralLedgerAccountLineItemUUID, GeneralLedgerAccountLineItemAccountingDocumentItemGroupID, DueItemUUID, SystemAdministrativeData, ChartOfAccountsCode, ChartOfAccountsItemCode, AccountingBusinessTransactionTypeCode, TypeCode, AccountsReceivableDueItemTypeCode, AccountsPayableDueItemTypeCode, AccountingDocumentTypeCode, AccountingDocumentNote, AccountingDocumentItemNote, ProductTaxTypeCode, ProductTaxDueCategoryCode, ProductTaxCountryCode, ProductTaxEventTypeCode, ProductTaxRateTypeCode, WithholdingTaxTypeCode, WithholdingTaxCountryCode, WithholdingTaxEventTypeCode, WithholdingTaxRateTypeCode, PostingDate, OriginalEntryDocumentDate, AccountingBusinessTransactionDate, CurrencyConversionDate, FiscalYearVariantCode, FiscalYearID, AccountingPeriodID, AccountingClosingStepCode, AccountingDocumentItemAccountingGroupID, PropertyMovementDirectionCode, GeneralLedgerMovementTypeCode, DebitCreditCode, CancellationDocumentIndicator, CancellationOriginalEntryDocumentContainingBusinessObjectReference, CancellationOriginalEntryDocumentReference, CancellationOriginalEntryDocumentTransactionUUID, CancelledIndicator, BusinessTransactionCurrencyAmount, LineItemCurrencyAmount, LocalCurrencyAmount, SetOfBooksCurrencyAmount, HardCurrencyAmount, IndexBasedCurrencyAmount, NetTransactionCurrencyAmount, NetLineItemCurrencyAmount, NetLocalCurrencyAmount, NetSetOfBooksCurrencyAmount, NetHardCurrencyAmount, and NetIndexBasedCurrencyAmount. UUID may be an alternative key and can be an universally unique identification of the LineItem and can be of type GDT: UUID. SetOfBooksID can be an unique identification of the SetOfBooks according to whose specifications the LineItem was created and can be of type GDT: SetOfBooksID. SegmentUUID may be optional and can be an universally unique identification of the Segment to which the value of the LineItem can be allocated and can be of type GDT: UUID. ProfitCentreUUID, may be optional, and can be an universally unique identification of the ProfitCentre to which the value of the LineItem can be allocated. ProfitCentreUUID can be of type GDT: UUID. PartnerCompanyUUID can be optional and can be an universally unique identification of a Company that acts in the business transaction stated in the LineItem as an intra corporate partner. PartnerCompanyUUID can be of type GDT: UUID. PartnerSegmentUUID can be optional and can be an universally unique identification of a Segment that acts in the business transaction stated in the LineItem as an intra corporate partner. PartnerSegmentUUID can be of type GDT: UUID. PartnerProfitCentreUUID can be optional and can be an universally unique identification of a ProfitCentre the that acts in the business transaction stated in the LineItem as an intra corporate partner. PartnerProfitCentreUUID can be of type GDT: UUID. AccountingDocumentUUID can be an universally unique identification of the AccountingDocument that can record the entire business transaction in Accounting it can be of type GDT: UUID. AccountingDocumentID can be an unique identification of the AccountingDocument that can record the entire business transaction in Accounting and can be of type GDT: BusinessTransactionDocumentID. AccountingDocumentItemID can be an unique identification of the corresponding AccountingDocumentItem in the AccountingDocument which can record the value change according to the criteria of GeneralLedger and can be of type GDT: BusinessTransactionDocumentItemID. OriginalEntryDocumentContainingObjectReference can be a reference to an Object containing the Original Entry Document and can be of type GDT: ObjectNodeReference and of Qualifier: OriginalEntryDocumentContaining. OriginalEntryTransactionUUID can be an universally unique identifier of the transaction during which the Original Entry Document was created or changed and can be of type GDT: UUID. OriginalEntryDocumentReference can be a reference to the document, that can keep the original entry of the business transaction and can be of type GDT: ObjectNodeReference. OriginalEntryDocumentItemReference can be a reference to an item of the OriginalEntryDocument. The value change recorded in the AccountsReceivablePayableLedgerAccountItem can be verified by that item of the OriginalEntryDocument. OriginalEntryDocumentItemReference can be of type GDT: ObjectNodeReference. OriginalEntryDocumentItemTypeCode may be optional and can be the coded representation of the Item Type of the referred OriginalEntryDocumentItem. OriginalEntryDocumentItemTypeCode can be of type GDT: BusinessTransactionDocumentItemTypeCode and also element may be used, if the Original Entry Document is a Business Transaction Document. OriginalEntryDocumentPartnerID which may be optional can be an identification of the Original Entry Document as assigned by the business partner. (For example, the ID of the Supplier Invoice assigned by the Supplier). OriginalEntryDocumentPartnerID can be of type GDT: BusinessTransactionDocumentID) and this element can be used, if the Original Entry Document is a Business Transaction Document and if the Original Entry Document is identical to the Original Entry Document Containing Object. AccountingNotificationUUID can be optional and can be an universally unique identification of the notification sent to Financial Accounting about the business transaction stated in the LineItem. AccountingNotificationUUID can be of type GDT: UUID. AccountingNotificationItemGroupItemUUID can be optional and can be an universally unique identification of the Accounting Notification Item Group Item, which may have triggered the posting of this CashLedgerAccountItem. AccountingNotificationItemGroupItemUUID can be of type GDT: UUID. GeneralLedgerAccountLineItemUUID can be the universally unique identification of a LineItem of a GeneralLedgerAccount that can record the value change of the AccountsReceivablePayableLedgerAccountLineItem in the GeneralLedger and can be of type GDT: UUID. GeneralLedgerAccountLineItemAccountingDocumentItemGroupID can be an universally unique identification of the group of all AccountingDocumentItems that can be summarized together in a GeneralLedgerAccountLineItem. The LineItem can correspond to one AccountingDocumentItem belonging to the group. GeneralLedgerAccountLineItemAccountingDocumentItemGroupID can be of type GDT: BusinessTransactionDocumentItemGroupID. DueItemUUID can globally and uniquely identify the DueItem that the partner company relates to and can be of type GDT: UUID. SystemAdministrativeData can be administrative data stored in a system This data can include the system user and change time.

DueItemUUID can be of type GDT: SystemAdministrativeData. ChartOfAccountsCode can be a coded representation of the ChartOfAccounts containing the ChartOfAccountsItem that classifies—for general ledger accounting purposes—the value stated in the LineItem. ChartOfAccountsCode can be of type GDT: ChartOfAccountsCode. ChartOfAccountsItemCode can be a coded representation of a ChartOfAccountsItem that classifies—for general ledger accounting purposes—the value stated in the LineItem and can be of type GDT: ChartOfAccountsItemCode. AccountingBusinessTransactionTypeCode can be a coded representation of the type of the business transaction stated in the LineItem. It classifies the business transaction according to Accounting criteria and can be of type GDT: AccountingBusinessTransactionTypeCode. TypeCode can be a coded representation of the type of the LineItem and can be of type GDT: SubledgerAccountLineItemTypeCode. AccountsReceivableDueItemTypeCode can be a coded representation of the type of DueItem of an accounts receivable and can be of type GDT: AccountsReceivableDueItemTypeCode. AccountsPayableDueItemTypeCode can be a coded representation of the type of DueItem of an accounts payable and can be of type GDT: AccountsPayableDueItemTypeCode. AccountingDocumentTypeCode can be a coded representation of the type of the AccountingDocument to which the LineItem refers by the AccountingDocumentReference and can be of type GDT: AccountingDocumentTypeCode. AccountingDocumentNote may be optional and can be a natural-language comment that applies the AccountingDocument—referred via the AccountingDocumentReference—as a whole rather than to individual items. AccountingDocumentNote can be of type GDT: SHORT_Note. AccountingDocumentItemNote may be optional and can be a natural-language comment pertaining to the AccountingDocumentItem to which the LineItem refers by the AccountingDocumentReference. AccountingDocumentItemNote can be of type GDT: SHORT_Note. ProductTaxTypeCode, may be optional and can denote the product tax type to which the recorded data relates and can be of type GDT: TaxTypeCode. ProductTaxDueCategoryCode may be optional and can denote the category (receivable or payable) of a tax due to which the recorded data relates. ProductTaxDueCategoryCode can be of type GDT: DueCategoryCode and of Qualifier: Tax. ProductTaxCountryCode may be optional and can be the country to whose tax authority the product tax data has been or will be reported. ProductTaxCountryCode can be of type GDT: CountryCode. ProductTaxEventTypeCode can be optional and can denote the product tax event to which the recorded data relates and can be of type GDT: ProductTaxEventTypeCode. ProductTaxRateTypeCode can be optional and can denotes the type of product tax rate to which the recorded data relates. ProductTaxRateTypeCode can be of type GDT: TaxRateTypeCode and of Qualifier: Product. WithholdingTaxTypeCode may be optional and can denote the withholding tax type to which the recorded data relates. WithholdingTaxTypeCode can be of type GDT TaxTypeCode. WithholdingTaxCountryCode may be optional and can be the country to whose tax authority the withholding tax data has been or will be reported and can be of type GDT: CountryCode. WithholdingTaxEventTypeCode may be optional and can denote the witholding tax event to which the recorded data relates and can be of type GDT WithholdingTaxEventTypeCode. WithholdingTaxRateTypeCode can be optional and can denote the type of withholding tax rate to which the recorded data relates and can be of type GDT TaxRateTypeCode. PostingDate can be the date with which the business transaction is effectively recorded in Accounting. Effectively means that period totals and balances in accounting are updated with this date and it can be of type GDT: Date and of Qualifier: Posting. OriginalEntryDocumentDate can be the issue date of the Original Entry Document and can be of type GDT: Date and of Qualifier: OriginalEntryDocument. AccountingBusinessTransactionDate can be the date at which the business transaction took place applying the criteria of Accounting and can be of type GDT: Date and of Qualifier: BusinessTransaction. CurrencyConversionDate can be the date that can be used for the currency translation applied to amounts in the accounting document and can be of type GDT: Date and of Qualifier: CurrencyConversion. FiscalYearVariantCode can be a coded representation of the FiscalYearVariant according to whose fiscal year definition (begin, end, period definition) the FiscalYearID and the AccountingPeriodID can be derived. FiscalYearVariantCode can be of type GDT: FiscalYearVariantCode. FiscalYearID can be an identification of the fiscal year in which the LineItem can be posted and can be of type GDT: FiscalYearID. AccountingPeriodID can be an identification of the accounting period in which the LineItem can be posted and can be of type GDT: AccountingPeriodID. AccountingClosingStepCode may be optional and can be a coded representation of the closing step of the accounting document and can be of type GDT: AccountingClosingStepCode. AccountingDocumentItemAccountingGroupID can be an unique identification of a group of AccountingDocumentItems belonging together applying the criteria of Accounting. It can be used to indicate the items of an AccountingDocument that belong together e.g. in partial zero-balance checking within the Accounting Document. AccountingDocumentItemAccountingGroupID can be of type GDT: BusinessTransactionDocumentItemGroupID. PropertyMovementDirectionCode may be optional and can be a coded representation of the direction of movement of a property in case the LineItem describes a property movement. PropertyMovementDirectionCode can be of type GDT: PropertyMovementDirectionCode. GeneralLedgerMovementTypeCode may be optional and can be a coded representation of the type of movement with which the value change can be recorded for GeneralLedger purposes in the GeneralLedgerAccount. GeneralLedgerMovementTypeCode can be of type GDT: GeneralLedgerMovementTypeCode. DebitCreditCode can be a coded representation of debit or credit. It can specify whether the line item can be assigned to the debit or credit side of the GeneralLedger account. DebitCreditCode can be of type GDT: DebitCreditCode. CancellationDocumentIndicator may be optional and can indicate whether the AccountingDocument to which the LineItem refers by the AccountingDocumentReference refers to a Cancellation Original Entry Document and it can be of type GDT: Indicator, Qualifier: CancellationDocument. CancellationOriginalEntryDocumentContainingBusinessObjectReference may be optional and can be a reference to the Business Object containing the OriginalEntryDocument that cancelled this LineItem. CancellationOriginalEntryDocumentContainingBusinessObjectReference can be of type GDT: ObjectNodeReference and of Qualifier: CancellationOriginalEntryDocumentContaining. CancellationOriginalEntryDocumentReference may be optional and can be a reference to the OriginalEntryDocument, that cancelled this Item and it can be of type GDT: ObjectNodeReference and of Qualifier: Cancellation. CancellationOriginalEntryDocumentTransactionUUID may be optional and can be an universally unique identifier of the transaction during which the CancellationOriginalEntryDocument was created or changed and it can be of type GDT: UUID. CancelledIndicator may be optional and can indicate if the line item has been cancelled. CancelledIndicator can be of type GDT: Indicator and of Qualifier: Cancelled. BusinessTransactionCurrencyAmount may be optional and can be the value of the LineItem in transaction currency. The transaction currency can be the currency agreed on by two business partners for their business relationship. BusinessTransactionCurrencyAmount can be of type GDT: Amount and of Qualifier: BusinessTransactionCurrency. LineItemCurrencyAmount can be the value of the LineItem in LineItem currency and can be of type GDT: Amount and of Qualifier: LineItem. LocalCurrencyAmount can be the value of the LineItem in the local currency of the Company carrying the account. The local currency can be the currency in which the local books are kept. LocalCurrencyAmount can be of type GDT: Amount and of Qualifier: LocalCurrency. SetOfBooksCurrencyAmount may be optional and can be the value of the LineItem in the currency selected for the set of books. It can be of type GDT: Amount and of Qualifier: SetOfBooksCurrency. HardCurrencyAmount may be optional and can be the value of the LineItem, in the hard currency of the country of the Company carrying the account. The hard currency can be a stable, country-specific currency that can be used in high-inflation countries. HardCurrencyAmount can be of type GDT: Amount and of Qualifier: HardCurrency. IndexBasedCurrencyAmount may be optional and can be the value of the LineItem in the index-based currency of the country of the Company carrying the account. The index-based currency can be a fictitious, country-specific currency that is used in high-inflation countries as a comparison currency for reporting. IndexBasedCurrencyAmount can be of type GDT: Amount and of Qualifier: IndexedBasedCurrency. NetTransactionCurrencyAmount may be optional and can be the net value of the LineItem in transaction currency. The transaction currency can be the currency agreed on by two business partners for their business relationship. NetTransactionCurrencyAmount can be of type GDT: Amount and of Qualifier: TransactionCurrency. NetLineItemCurrencyAmount can be the net value of the LineItem in LineItem currency and can be of type GDT: Amount and of Qualifier: LineItemCurrency. NetLocalCurrencyAmount can be the net value of the LineItem in the local currency of the Company carrying the account. The local currency can be the currency in which the local books are kept. NetLocalCurrencyAmount can be of type GDT: Amount and of Qualifier: LocalCurrency. NetSetOfBooksCurrencyAmount can be optional and can be the net value of the LineItem in the currency selected for the set of books. NetSetOfBooksCurrencyAmount can be of type GDT: Amount and of Qualifier: SetOfBooksCurrency. NetHardCurrencyAmount may be optional and can be the net value of the LineItem, in the hard currency of the country of the Company carrying the account. The hard currency can be a stable, country-specific currency that can be used in high-inflation countries. NetHardCurrencyAmount can be of type GDT: Amount, Qualifier: HardCurrency. NetIndexBasedCurrencyAmount may be optional and can be the net value of the LineItem in the index-based currency of the country of the Company carrying the account. The index-based currency can be a fictitious, country-specific currency that can be used in high-inflation countries as a comparison currency for reporting. NetIndexBasedCurrencyAmount can be of type GDT: Amount and of Qualifier: IndexBasedCurrency. The integrity condition may exist such that the elements ProductTaxTypeCode, ProductTaxDueCategoryCode, ProductTaxCountryCode, ProductTaxEventTypeCode, ProductTaxRateTypeCode, WithholdingTaxTypeCode, WithholdingTaxCountryCode, WithholdingTaxEventTypeCode and WithholdingTaxRateTypeCode can be filled if one or more taxes are created on the basis of this LineItem. For example, this can happen with down payments.

There may be a number of inbound aggregation relationships. From the SetOfBooks business object (or node) to the SetOfBooks business object (or node) there may be a cardinality relationship of 1:cn. SetOfBooks can be the SetOfBooks according to whose specifications the LineItem was created. There may be a number of inbound aggregation relationships. From the Company business object (or node) to the Partner Company business object (or node) there may be a cardinality relationship of c:cn. A partner company can be company that acts in the business transaction stated in the LineItem as an intra corporate partner. There may be a number of inbound aggregation relationships. From the Segment business object (or node) to the Segment business object (or node) there may be a cardinality relationship of c:cn. Segment can be a segment to which the value and quantity of the LineItem can be allocated. From the Segment business object (or node) to the PartnerSegment business object (or node) there may be a cardinality relationship of c:cn. The PartnerSegment can be a Segment that acts in the business transaction stated in the LineItem as an intra corporate Partner. There may be a number of inbound aggregation relationships. From the ProfitCentre business object (or node) to the ProfitCentre business object (or node) there may be a cardinality relationship of c:cn. ProfitCentre can be a ProfitCentre to which the value and quantity of the LineItem can be allocated. From the ProfitCentre business object (or node) to the PartnerProfitCentre business object (or node) there may be a cardinality relationship of c:cn. PartnerProfitCentre can be a ProfitCentre that can act in the business transaction stated in the LineItem as an intra corporate partner. The integrity condition may consist in that one of the relationships below to an Original Entry Document and to an Original EntryDocument Item can exist. If the Original Entry Document is not identical to a Business Object but contained in it then the corresponding relationship to this Business Object can exist, too. There may be a number of inbound aggregation relationships. From the AccountingEntry business object (or node) to the AccountingEntry business object (or node) there may be a cardinality relationship of c:cn. AccountingEntry can be an AccountingEntry that can keep the original entry of the business transaction stated in the LineItem. From the SupplierInvoice business object (or node) to the SupplierInvoice business object (or node) there may be a cardinality relationship of c:cn. SupplierInvoice can be a supplier invoice that can keep the original entry of the business transaction stated in the LineItem. From the CustomerInvoice business object (or node) to the CustomerInvoice business object (or node) there may be a cardinality relationship of c:cn. CustomerInvoice can be a customer invoice that can keep the original entry of the business transaction stated in the LineItem. From the ExpenseReport business object (or node) to the ExpenseReport business object (or node) there may be a cardinality relationship of c:cn. ExpenseReport can be a reference to the ExpenseReport that can contain the Original Entry Document. From the ExpenseReport/SettlementResultAccounting business object (or node) to the ExpenseReportSettlementResultAccounting business object (or node) there may be a cardinality relationship of c:cn. ExpenseReportSettlementResultAccounting can be a reference to a FinancialAuditTrailDocumentation that can serve as Original Entry Document for a business transaction in an ExpenseReport. From the ExpenseReport/SettlementResultAccountingDueItem business object (or node) to the ExpenseReportSettlementResultAccountingDueItem business object (or node) there may be a cardinality relationship of c:cn. ExpenseReportSettlementResultAccountingDueItem can be a DueItem in an SettlementResultAccounting of an ExpenseReport serving as Original Entry Document Item by which the value change recorded in the LineItem can be verified. From the DuePayment business object (or node) to the DuePayment business object (or node) there may be a cardinality relationship of c:cn. DuePayment can be a reference to the DuePayment that may contain the Original Entry Document. From the DuePayment/FinancialAuditTrailDocumentationbusiness object (or node) to the DuePaymentFinancialAuditTrailDocumentation business object (or node) there may be a cardinality relationship of c:cn. DuePaymentFinancialAuditTrailDocumentation can be a reference to a FinancialAuditTrailDocumentation that serves as Original Entry Document for a business transaction in a DuePayment. From the DuePayment/FinancialAuditTrailDocumentationTradeReceivablesPayablesRegisterItem business object (or node) to the DuePaymentFinancialAuditTrailDocumentationTradeReceivablesPayablesRegisterItem business object (or node) there may be a cardinality relationship of c:cn. DuePaymentFinancialAuditTrailDocumentationTradeReceivablesPayablesRegisterItem can be a TradeReceivablesPayablesRegisterItem in a FinancialAuditTrailDocumentation serving as Original Entry Document Item by which the value change recorded in the LineItem can be verified. From the DueClearing business object (or node) to the DueClearing business object (or node) there may be a cardinality relationship of c:cn. DueClearing can be a reference to the DueClearing that contains the Original Entry Document. From the DueClearing/FinancialAuditTrailDocumentation business object (or node) to the DueClearing FinancialAuditTrailDocumentation business object (or node) there may be a cardinality relationship of c:cn. DueClearing FinancialAuditTrailDocumentation can be a reference to a FinancialAuditTrailDocumentation that can serve as Original Entry Document for a business transaction in a DueClearing. From the DuePayment/FinancialAuditTrailDocumentationTradeReceivablesPayablesRegisterClearingItem business object (or node) to the DueClearingFinancialAuditTrailDocumentationTradeReceivablesPayablesRegisterClearingItem business object (or node) there may be a cardinality relationship of c:cn. DueClearingFinancialAuditTrailDocumentationTradeReceivablesPayablesRegisterClearingItem can be a TradeReceivablesPayablesRegisterClearingItem in a FinancialAuditTrailDocumentation serving as Original Entry Document Item by which the value change recorded in the LineItem can be verified. From the MDRO AccountsReceivablePayableLedgerAccountForeignCurrencyRemeasurementRun business object (or node) to the AccountsReceivablePayableLedgerAccountForeignCurrencyRemeasurementRun business object (or node) there may be a cardinality relationship of c:cn. AccountsReceivablePayableLedgerAccountForeignCurrencyRemeasurementRun can be a reference to the AccountsReceivablePayableLedgerAccountForeignCurrencyRemeasurementRun that can contain the Original Entry Document. From the MDRO AccountsReceivablePayableLedgerAccountForeignCurrencyRemeasurementRun/LogSection business object (or node) to the AccountsReceivablePayableLedgerAccountForeignCurrencyRemeasurementRunLogSection business object (or node) there may be a cardinality relationship of c:cn. AccountsReceivablePayableLedgerAccountForeignCurrencyRemeasurementRunLogSection can be a reference to a LogSection that serves as Original Entry Document for a business transaction AccountsReceivablePayableLedgerAccountForeignCurrencyRemeasurementRun. From the MDRO AccountsReceivablePayableLedgerAccountForeignCurrencyRemeasurementRun/LogSectionItembusiness object (or node) to the Accounts ReceivablePayableLedgerAccountForeignCurrencyRemeasurementRunLogSectionAccountingDocumentItem business object (or node) there may be a cardinality relationship of c:cn. AccountsReceivablePayableLedgerAccountForeignCurrencyRemeasurementRunLogSectionAccountingDocumentItem can be an AccountingDocumentItem in a LogSection of an AccountsReceivablePayableLedgerAccountForeignCurrencyRemeasurementRun serving as Original Entry Document Item by which the value change recorded in the LineItem can be verified. From the MDRO AccountsReceivablePayableLedgerAccountDiscountingRun business object (or node) to the MDRO AccountsReceivablePayableLedgerAccountDiscountingRun business object (or node) there may be a cardinality relationship of c:cn. AccountsReceivablePayableLedgerAccountDiscountingRun can be a reference to the AccountsReceivablePayableLedgerAccountDiscountingRun that can contain the Original Entry Document. From the MDRO AccountsReceivablePayableLedgerAccountDiscountingRun/LogSection business object (or node) to the AccountsReceivablePayableLedgerAccountDiscountingRunLogSection business object (or node) there may be a cardinality relationship of c:cn. AccountsReceivablePayableLedgerAccountDiscountingRunLogSection can be a reference to a LogSection that can serve as Original Entry Document for a business transaction AccountsReceivablePayableLedgerAccountDiscountingRun. From the MDRO AccountsReceivablePayableLedgerAccountDiscountingRun/LogSectionAccountingDocumentItembusiness object (or node) to the AccountsReceivablePayableLedgerAccountDiscountingRunLogSection AccountingDocumentItem business object (or node) there may be a cardinality relationship of c:cn. AccountsReceivablePayableLedgerAccountDiscountingRunLogSectionAccountingDocumentItem can be an AccountingDocumentItem in a LogSection of an AccountsReceivablePayableLedgerAccountDiscountingRun serving as Original Entry Document Item by which the value change recorded in the LineItem can be verified. From the MDRO AccountsReceivablePayableLedgerAccountRegroupingRun business object (or node) to the AccountsReceivablePayableLedgerAccountRegroupingRun business object (or node) there may be a cardinality relationship of c:cn. AccountsReceivablePayableLedgerAccountRegroupingRun can be a reference to the AccountsReceivablePayableLedgerAccountRegroupingRun that can contain the Original Entry Document. From the MDRO AccountsReceivablePayableLedgerAccountRegroupingRun/LogSection business object (or node) to the AccountsReceivablePayableLedgerAccountRegroupingRunLogSection business object (or node) there may be a cardinality relationship of c:cn. AccountsReceivablePayableLedgerAccountRegroupingRunLogSection can be a reference to a LogSection that can serve as Original Entry Document for a business transaction AccountsReceivablePayableLedgerAccountRegroupingRun. From the MDRO AccountsReceivablePayableLedgerAccountRegroupingRun/LogSectionAccountingDocumentItem business object (or node) to the AccountsReceivablePayableLedgerAccountRegroupingRunLogSection AccountingDocumentItem business object (or node) there may be a cardinality relationship of c:cn. AccountsReceivablePayableLedgerAccountRegroupingRunLogSectionAccountingDocumentItem can be an AccountingDocumentItem in a LogSection of an AccountsReceivablePayableLedgerAccountRegroupingRun serving as Original Entry Document Item by which the value change recorded in the LineItem can be verified The integrity condition can exist such that one of the relationships below to an Cancellation Original Entry Document and to an Cancellation Original EntryDocument Item can exist. If the Cancellation Original Entry Document is not identical to a Business Object but contained in it then the corresponding relationship to this Business Object can exist, too. From the AccountingEntry business object (or node) to the CancellationAccountingEntry business object (or node) there may be a cardinality relationship of c:cn. CancellationAccountingEntry can be an accounting entry that can keep the original entry of the business transaction for the cancellation of this LineItem. From the SupplierInvoice business object (or node) to the CancellationSupplierInvoice business object (or node) there may be a cardinality relationship of c:cn. CancellationSupplierInvoice can be a supplier invoice that can keep the original entry of the business transaction for the cancellation of this LineItem. From the CustomerInvoice business object (or node) to the CancellationCustomerInvoice business object (or node) there may be a cardinality relationship of c:cn. CancellationCustomerInvoice can be a customer invoice that can keep the original entry of the business transaction for the cancellation of this LineItem. From the ExpenseReport business object (or node) to the CancellationExpenseReport business object (or node) there may be a cardinality relationship of c:cn. CancellationExpenseReport can be a reference to the ExpenseReport that can contain the Original Entry Document for the cancellation of this LineItem. From the ExpenseReport/SettlementResultAccounting business object (or node) to the CancellationExpenseReportSettlementResultAccounting business object (or node) there may be a cardinality relationship of c:cn. CancellationExpenseReportSettlementResultAccounting can be a reference to a FinancialAuditTrailDocumentation that can serve as Original Entry Document for the cancellation of this LineItem. From the DuePayment business object (or node) to the CancellationDuePayment business object (or node) there may be a cardinality relationship of c:cn. CancellationDuePayment can be a reference to the DuePayment that can contain the Original Entry Document for the cancellation of this LineItem. From the DuePayment/FinancialAuditTrailDocumentation business object (or node) to the CancellationDuePaymentFinancialAuditTrailDocumentation business object (or node) there may be a cardinality relationship of c:cn. CancellationDuePaymentFinancialAuditTrailDocumentation can be a reference to a FinancialAuditTrailDocumentation in a DuePayment which can serve as Original Entry Document for the cancellation of this LineItem. From the DueClearing business object (or node) to the Cancellation DueClearing business object (or node) there may be a cardinality relationship of c:cn. Cancellation DueClearing can be a reference to the DueClearing that can contain the Original Entry Document for the cancellation of this LineItem. From the DueClearing/FinancialAuditTrailDocumentation business object (or node) to the Cancellation DueClearing FinancialAuditTrailDocumentation business object (or node) there may be a cardinality relationship of c:cn. Cancellation DueClearing FinancialAuditTrailDocumentation can be a reference to a FinancialAuditTrailDocumentation in a DueClearing which can serve as Original Entry Document for the cancellation of this LineItem. From the MDRO AccountsReceivablePayableLedgerAccountForeignCurrencyRemeasurementRun business object (or node) to the CancellationAccountsReceivablePayableLedgerAccountForeignCurrencyRemeasurementRun business object (or node) there may be a cardinality relationship of c:cn. CancellationAccountsReceivablePayableLedgerAccountForeignCurrencyRemeasurementRun can be a reference to the AccountsReceivablePayableLedgerAccountForeignCurrencyRemeasurementRun that can contain the Original Entry Document for the cancellation of this LineItem. From the MDRO AccountsReceivablePayableLedgerAccountForeignCurrencyRemeasurementRun/LogSectionbusiness object (or node) to the CancellationAccountsReceivablePayableLedgerAccountForeignCurrency RemeasurementRunLogSection business object (or node) there may be a cardinality relationship of c:cn.

CancellationAccountsReceivablePayableLedgerAccountForeignCurrencyRemeasurementRunLogSection can be a reference to a LogSection that can serve as Original Entry Document for the cancellation of this LineItem. From the MDRO AccountsReceivablePayableLedgerAccountDiscountingRun business object (or node) to the CancellationAccountsReceivablePayableLedgerAccountDiscountingRun business object (or node) there may be a cardinality relationship of c:cn. CancellationAccountsReceivablePayableLedgerAccountDiscountingRun can be a reference to the AccountsReceivablePayableLedgerAccountDiscountingRun that can contain the Original Entry Document for the cancellation of this LineItem. From the MDRO AccountsReceivablePayableLedgerAccountDiscountingRun/LogSection business object (or node) to the CancellationAccountsReceivablePayableLedgerAccountDiscountingRunLogSection business object (or node) there may be a cardinality relationship of c:cn. CancellationAccountsReceivablePayableLedgerAccountDiscountingRunLogSection can be a reference to a LogSection that can serve as Original Entry Document for the cancellation of this LineItem. From the MDRO AccountsReceivablePayableLedgerAccountRegroupingRun business object (or node) to the CancellationAccountsReceivablePayableLedgerAccountRegroupingRun business object (or node) there may be a cardinality relationship of c:cn. CancellationAccountsReceivablePayableLedgerAccountRegroupingRun can be a reference to the AccountsReceivablePayableLedgerAccountRegroupingRun that can contain the Original Entry Document for the cancellation of this LineItem. From the MDRO AccountsReceivablePayableLedgerAccountRegroupingRun/LogSection business object (or node) to the CancellationAccountsReceivablePayableLedgerAccountRegroupingRunLogSection business object (or node) there may be a cardinality relationship of c:cn. CancellationAccountsReceivablePayableLedgerAccountRegroupingRunLogSection can be a reference to a LogSection that can serve as Original Entry Document for the cancellation of this LineItem.

There may be a number of inbound association relationships for navigation. From the AccountingDocument business object (or node) to the AccountingDocument business object (or node) there may be a cardinality relationship of 1:cn. AccountingDocument can be the accounting document that can record the entire business transaction in Accounting. From the GeneralLedgerAccount/LineItem business object (or node) to the GeneralLedgerAccountLineItem business object (or node) there may be a cardinality relationship of 1:cn. GeneralLedgerAccountLineItem can be a LineItem of a GeneralLedgerAccount that can record the value change for GeneralLedger purposes. There may be a number of inbound association relationships. From the AccountingNotification business object (or node) to the AccountingNotification business object (or node) there may be a cardinality relationship of c:cn. AccountingNotification can be the notification that can be sent to Financial Accounting about the business transaction stated in the LineItem. From the AccountingNotification/AccountingNotificationItemGroupItem business object (or node) to the AccountingNotificationItemGroupItem business object (or node) there may be a cardinality relationship of c:cn. AccountingNotificationItemGroupItem can be a LineItem that can originate as a result of a business transaction that was represented in an AccountingNotification. From the Identity business object (or node) to the CreationIdentity business object (or node) there may be a cardinality relationship of 1:cn. CreationIdentity can be a system user Identity who created the LineItem. From the Identity business object (or node) to the LastChangeIdentity business object (or node) there may be a cardinality relationship of c:cn. LastChangeIdentity can be the system user Identity who last changed the LineItem. From the AccountsReceivablePayableLedgerAccount/DueItembusiness object (or node) to the AccountsReceivablePayableLedgerAccountDueItem business object (or node) there may be a cardinality relationship of 1:cn. AccountsReceivablePayableLedgerAccountDueItem can be the DueItem the LineItem relates to.

In some implementations, there can be multiple queries done for LineItem. This can include QueryByElements which can deliver a list of all line items that meet the selection criteria specified by the query elements, linked by a logical "AND". Query elements can be defined by the data type: AccountsReceivablePayableLedgerAccountLineItemElementsQueryElements. These elements can include AccountsReceivablePayableLedgerAccountCompanyID, AccountsReceivablePayableLedgerAccountCompanyUUID, AccountsReceivablePayableLedgerAccountBusinessPartnerID, AccountsReceivablePayableLedgerAccountBusinessPartnerUUID, AccountsReceivablePayableLedgerAccountPartyRoleCategoryCode, SetOfBooksID, SegmentID, SegmentUUID, ProfitCentreID, ProfitCentreUUID, PartnerCompanyID, PartnerCompanyUUID, PartnerSegmentUUID. Partner, SegmentID, Partner ProfitCentreID, PartnerProfitCentreUUID, AccountingDocumentUUID, AccountingDocumentID, AccountingDocumentItemID, OriginalEntryDocumentContainingObjectReference, OriginalEntryTransactionUUID, OriginalEntryDocumentReference, OriginalEntryDocumentItemReference. OriginalEntryDocumentItemTypeCode, OriginalEntryDocumentPartnerID, AccountingNotificationUUID, AccountingNotificationItemGroupItemUUID, GeneralLedgerAccountLineItemUUID, GeneralLedgerAccountLineItemAccountingDocumentItemGroupID, SystemAdministrativeData, ChartOfAccountsCode, ChartOfAccountsItemCode, AccountingBusinessTransactionTypeCode, TypeCode, AccountsReceivableDueItemTypeCode, AccountsPayableDueItemTypeCode, AccountingDocumentTypeCode, AccountingDocumentNote, AccountingDocumentItemNote, ProductTaxTypeCode, ProductTaxDueCategoryCode, ProductTaxCountryCode, ProductTaxEventTypeCode, ProductTaxRateTypeCode, WithholdingTaxTypeCode, WithholdingTaxCountryCode, WithholdingTaxEventTypeCode, WithholdingTaxRateTypeCode, PostingDate, OriginalEntryDocumentDate, AccountingBusinessTransactionDate, CurrencyConversionDate, FiscalYearVariantCode, FiscalYearID, AccountingPeriodID, AccountingClosingStepCode, AccountingDocumentItemAccountingGroupID, PropertyMovementDirection- Code, GeneralLedgerMovementTypeCode, DebitCreditCode, CancellationDocumentIndicator, CancellationOriginalEntryDocumentContainingBusinessObjectReference, CancellationOriginalEntryDocumentReference, and CancellationOriginalEntryDocumentTransactionUUID CancelledIndicator. AccountsReceivablePayableLedgerAccountCompanyID may be optional and can be of type GDT: OrganisationalCentreID. AccountsReceivablePayableLedgerAccountCompanyUUID may be optional and can be of type GDT: UUID. AccountsReceivablePayableLedgerAccountBusinessPartnerID may be optional and can be of type GDT: BusinessPartnerID. AccountsReceivablePayableLedgerAccountBusinessPartnerUUID may be optional and can be of type GDT: UUID. AccountsReceivablePayableLedgerAccountPartyRoleCategoryCode may be optional and can be of type GDT: PartyRoleCategoryCode. SetOfBooksID may be optional and can be of type GDT: SetOfBooksID. SegmentID may be optional and can be of type GDT: OrganisationalCentreID. SegmentUUID may be optional and can be of type CDT: UUID. ProfitCentreID may be optional and can be of type GDT: OrganisationalCentreID. ProfitCentreUUID may be optional and can be of type GDT: UUID. PartnerCompanyID may be optional and can be of type: OrganisationalCentreID. PartnerCompanyUUID may be optional and can be of type GDT: UUID. Partner SegmentID may be optional and can be of type: OrganisationalCentreID. PartnerSegmentUUID may be optional and can be of type GDT: UUID. Partner ProfitCentreID may be optional and can be of type GDT: OrganisationalCentreID. PartnerProfitCentreUUID may be optional and can be of type GDT: UUID. AccountingDocumentUUID may be optional and can be of type GDT: UUID. AccountingDocumentID may be optional and can be of type GDT: BusinessTransactionDocumentID. AccountingDocumentItemID may be optional and can be of type GDT: BusinessTransactionDocumentItemID. OriginalEntryDocumentContainingObjectReference may be optional and can be of type: ObjectNodeReference and of Qualifier: OriginalEntryDocumentContaining. OriginalEntryTransactionUUID may be optional and can be of type GDT: UUID. OriginalEntryDocumentReference may be optional and can be of type GDT: ObjectNodeReference. OriginalEntryDocumentItemReference may be optional and can be of type GDT: ObjectNodeReference. OriginalEntryDocumentItemTypeCode may be optional and can be of type GDT: BusinessTransactionDocumentItemTypeCode. OriginalEntryDocumentPartnerID may be optional and can be of type GDT: BusinessTransactionDocumentID. AccountingNotificationUUID may be optional and can be of type GDT: UUID. AccountingNotificationItemGroupItemUUID may be optional and can be of type GDT: UUID. GeneralLedgerAccountLineItemUUID may be optional and can be of type GDT: UUID. GeneralLedgerAccountLineItemAccountingDocumentItemGroupID may be optional and can be of type GDT: BusinessTransactionDocumentItemGroupID. SystemAdministrativeData may be optional and can be of type: SystemAdministrativeData. ChartOfAccountsCode may be optional and can be of type GDT: ChartOfAccountsCode. ChartOfAccountsItemCode may be optional and can be of type GDT: ChartOfAccountsItemCode. AccountingBusinessTransactionTypeCode may be optional and can be of type GDT: AccountingBusinessTransactionTypeCode. TypeCode may be optional and can be of type GDT: SubledgerAccountLineItemTypeCode. AccountsReceivableDueItemTypeCode may be optional and can be of type GDT: AccountsReceivableDueItemTypeCode. AccountsPayableDueItemTypeCode may be optional and can be of type GDT: AccountsPayableDueItemTypeCode. AccountingDocumentTypeCode may be optional and can be of type GDT: AccountingDocumentTypeCode. AccountingDocumentNote may be optional and can be of type GDT: SHORT_Note. AccountingDocumentItemNote may be optional and can be of type GDT: SHORT_Note. ProductTaxTypeCode may be optional and can be of type GDT: TaxTypeCode. ProductTaxDueCategoryCode may be optional and can be of type GDT: DueCategoryCode and of Qualifier: Tax. ProductTaxCountryCode may be optional and can be of type GDT: CountryCode. ProductTaxEventTypeCode may be optional and can be of type GDT: ProductTaxEventTypeCode. ProductTaxRateTypeCode may be optional and can be of type GDT: TaxRateTypeCode and of Qualifier: Product. WithholdingTaxTypeCode may be optional and can be of type GDT: TaxTypeCode. WithholdingTaxCountryCode may be optional and can be of type GDT: CountryCode. WithholdingTaxEventTypeCode may be optional and can be of type WithholdingTaxEventTypeCode. WithholdingTaxRateTypeCode may be optional and can be of type GDT: TaxRateTypeCode. PostingDate may be optional and can be of type GDT: Date and of Qualifier: Posting.

OriginalEntryDocumentDate may be optional and can be of type GDT: Date and of Qualifier: OriginalEntryDocument. AccountingBusinessTransactionDate may be optional and can be of type Date, Qualifier: Transaction. CurrencyConversionDate may be optional and can be of type GDT: Date and of Qualifier: CurrencyConversion. FiscalYearVariantCode may be optional and can be of type GDT: FiscalYearVariantCode. FiscalYearID may be optional and can be of type GDT: FiscalYearID. AccountingPeriodID may be optional and can be of type: AccountingPeriodID. AccountingClosingStepCode may be optional and can be of type GDT: AccountingClosingStepCode.

AccountingDocumentItemAccountingGroupID may be optional and can be of type: BusinessTransactionDocumentItemGroupID. PropertyMovementDirectionCode may be optional and can be of type GDT: PropertyMovementDirectionCode. GeneralLedgerMovementTypeCode may be optional and can be of type GDT: GeneralLedgerMovementTypeCode. DebitCreditCode may be optional and can be of type GDT: DebitCreditCode. CancellationDocumentIndicator may be optional and can be of type GDT: Indicator and can be of Qualifier: CancellationDocument. CancellationOriginalEntryDocumentContainingBusinessObjectReference may be optional and can be of type GDT: ObjectNodeReference and of Qualifier: CancellationOriginalEntryDocumentContaining.

CancellationOriginalEntryDocumentReference may be optional and can be of type GDT: ObjectNodeReference and of Qualifier: Cancellation. CancellationOriginalEntryDocumentTransactionUUID may be optional and can be of type GDT: UUID. CancelledIndicator may be optional and can be of type: Indicator and of Qualifier: Cancelled.

Another type of query that can be performed for LineItem is QueryByOpenDueItem. QueryByOpenDueItem can delivers a list of all line items that can be assigned to a DueItem that can open on the specified key date. Query elements can be defined by the data type: AccountsReceivablePayableLedgerAccountLineItemOpenDueItemQueryElements. These elements can include AccountsReceivablePayableLedgerAccountDueItemHistoryKeyPostingDate, AccountsReceivablePayableLedgerAccountCompanyID, AccountsReceivablePayableLedgerAccountCompanyUUID, AccountsReceivablePayableLedgerAccountBusinessPartnerID, AccountsReceivablePayableLedgerAccountBusinessPartnerUUID, AccountsReceivablePayableLedgerAccountPartyRoleCategoryCode, SetOfBooksID, SegmentID, SegmentUUID, ProfitCentreID, ProfitCentreUUID, PartnerCompanyID, PartnerCompanyUUID, PartnerSegmentID, PartnerSegmentUUID, Partner ProfitCentreID, PartnerProfitCentreUUID, AccountingDocumentUUID, AccountingDocumentID, AccountingDocumentItemID, OriginalEntryDocumentContainingObjectReference, OriginalEntryTransactionUUID, OriginalEntryDocumentReference, OriginalEntryDocumentItemReference, OriginalEntryDocumentItemTypeCode, OriginalEntryDocumentPartnerID, AccountingNotificationUUID, AccountingNotificationItemGroupItemUUID, GeneralLedgerAccountLineItemUUID, GeneralLedgerAccountLineItemAccountingDocumentItemGroupID, SystemAdministrativeData, ChartOfAccountsCode, ChartOfAccountsItemCode, AccountingBusinessTransactionTypeCode, TypeCode, AccountsReceivableDueItemTypeCode, AccountsPayableDueItemTypeCode, AccountingDocumentTypeCode, AccountingDocumentNote, AccountingDocumentItemNote, ProductTaxTypeCode, ProductTaxDueCategoryCode, ProductTaxCountryCode, ProductTaxEventTypeCode, ProductTaxRateTypeCode, WithholdingTaxTypeCode, WithholdingTaxCountryCode, WithholdingTaxEventTypeCode, WithholdingTaxRateTypeCode, PostingDate, OriginalEntryDocumentDate, AccountingBusinessTransactionDate, CurrencyConversionDate, FiscalYearVariantCode, FiscalYearID, AccountingPeriodID, AccountingClosingStepCode, AccountingDocumentItemAccountingGroupID, PropertyMovementDirectionCode, GeneralLedgerMovementTypeCode, DebitCreditCode, CancellationDocumentIndicator, CancellationOriginalEntryDocumentContainingBusinessObjectReference, CancellationOriginalEntryDocumentReference, CancellationOriginalEntryDocumentTransactionUUID, and CancelledIndicator. AccountsReceivablePayableLedgerAccountDueItemHistoryKeyPostingDate can have one DueItemHistoryKeyPostingDate specified and can be of type GDT: Date and of Qualifier: Posting. AccountsReceivablePayableLedgerAccountCompanyID may be optional and can be of type GDT: OrganisationalCentreID. AccountsReceivablePayableLedgerAccountCompanyUUID may be optional and can be of type GDT: UUID. AccountsReceivablePayableLedgerAccountBusinessPartnerID may be optional and can be of type GDT: BusinessPartnerID. AccountsReceivablePayableLedgerAccountBusinessPartnerUUID may be optional and can be of type GDT: UUID. AccountsReceivablePayableLedgerAccountPartyRoleCategoryCode may be optional and can be of type GDT: PartyRoleCategoryCode. SetOfBooksID may be optional and can be of type GDT: SetOfBooksID.SegmentID may be optional and can be of type GDT: OrganisationalCentreID. SegmentUUID may be optional and can be of type GDT: UUID. ProfitCentreID may be optional and can be of type GDT: OrganisationalCentreID. ProfitCentreUUID may be optional and can be of type GDT: UUID. PartnerCompanyID may be optional and can be of type GDT: OrganisationalCentreID. PartnerCompanyUUID may be optional and can be of type GDT: UUID. Partner SegmentID may be optional and can be of type GDT: OrganisationalCentreID. PartnerSegmentUUID may be optional and can be of type GDT: UUID. Partner ProfitCentreID may be optional and can be of type GDT: OrganisationalCentreID. PartnerProfitCentreUUID may be optional and can be of type GDT: UUID. AccountingDocumentUUID may be optional and can be of type GDT: UUID. AccountingDocumentID may be optional and can be of type GDT: BusinessTransactionDocumentID. AccountingDocumentItemID may be optional and can be of type GDT: BusinessTransactionDocumentItemID. OriginalEntryDocumentContainingObjectReference may be optional and can be of type GDT: ObjectNodeReference and of Qualifier: OriginalEntryDocumentContaining. OriginalEntryTransactionUUID may be optional and can be of type GDT: UUID. OriginalEntryDocumentReference may be optional and can be of type GDT: ObjectNodeReference. OriginalEntryDocumentItemReference may be optional and can be of type GDT: ObjectNodeReference. OriginalEntryDocumentItemTypeCode may be optional and can be of type GDT: BusinessTransactionDocumentItemTypeCode.OriginalEntryDocumentPartnerID may be optional and can be of type GDT: BusinessTransactionDocumentID. AccountingNotificationUUID may be optional and can be of type GDT: UUID. AccountingNotificationItemGroupItemUUID may be optional and can be of type GDT: UUID. GeneralLedgerAccountLineItemUUID may be optional and can be of type GDT: UUID. GeneralLedgerAccountLineItemAccountingDocumentItemGroupID may be optional and can be of type GDT: BusinessTransactionDocumentItemGroupID. SystemAdministrativeData may be optional and can be of type GDT: SystemAdministrativeData. ChartOfAccountsCode may be optional and can be of type GDT: ChartOfAccountsCode. ChartOfAccountsItemCode may be optional and can be of type GDT: ChartOfAccountsItemCode. AccountingBusinessTransactionTypeCode may be optional and can be of type GDT: AccountingBusinessTransactionTypeCode. TypeCode may be optional and can be of type GDT: SubledgerAccountLineItemTypeCode. AccountsReceivableDueItemTypeCode may be optional and can be of type GDT: AccountsReceivableDueItemTypeCode. AccountsPayableDueItemTypeCode may be optional and can be of type GDT: AccountsPayableDueItemTypeCode. AccountingDocumentTypeCode may be optional and can be of type GDT: AccountingDocumentTypeCode. AccountingDocumentNote may be optional and can be of type GDT: SHORT_Note, AccountingDocumentItemNote may be optional and can be of type GDT: SHORT_Note. ProductTaxTypeCode may be optional and can be of type GDT: TaxTypeCode. ProductTaxDueCategoryCode may be optional and can be of type GDT: DueCategoryCode and of Qualifier: Tax. ProductTaxCountryCode may be optional and can be of type GDT: CountryCode. ProductTaxEventTypeCode may be optional and can be of type GDT: ProductTaxEventTypeCode. ProductTaxRateTypeCode may be optional and can be of type GDT: TaxRateTypeCode and of Qualifier: Product. WithholdingTaxTypeCode may be optional and can be of type GDT: TaxTypeCode. WithholdingTaxCountryCode may be optional and can be of type GDT: CountryCode. WithholdingTaxEventTypeCode may be optional and can be of type GDT: WithholdingTaxEventTypeCode. WithholdingTaxRateTypeCode may be optional and can be of type GDT: TaxRateTypeCode. PostingDate may be optional and can be of type GDT: Date and of Qualifier: Posting. OriginalEntryDocumentDate may be optional and can be of type GDT: Date and of Qualifier: OriginalEntryDocument. AccountingBusinessTransactionDate may be optional and can be of type GDT: Date and of Qualifier: Transaction. CurrencyConversionDate may be optional and can be of type GDT: Date and of Qualifier: CurrencyConversion. FiscalYearVariantCode may be optional and can be of type GDT: FiscalYearVariantCode. FiscalYearID may be optional and can be of type GDT: FiscalYearID. AccountingPeriodID may be optional and can be of type GDT: AccountingPeriodID. AccountingClosingStepCode may be optional and can be of type GDT: AccountingClosingStepCode. AccountingDocumentItemAccountingGroupID may be optional and can be of type GDT: BusinessTransactionDocumentItemGroupID. PropertyMovementDirectionCode may be optional and can be of type GDT: PropertyMovementDirectionCode. GeneralLedgerMovementTypeCode may be optional and can be of type GDT: GeneralLedgerMovementTypeCode. DebitCreditCode may be optional and can be of type GDT: DebitCreditCode. CancellationDocumentIndicator may be optional and can be of type GDT: Indicator and of Qualifier: CancellationDocument. CancellationOriginalEntryDocumentContainingBusinessObjectReference may be optional and can be of type GDT: ObjectNodeReference and of Qualifier: CancellationOriginalEntryDocumentContaining. CancellationOriginalEntryDocumentReference may be optional and can be of type GDT: ObjectNodeReference and of Qualifier: Cancellation. CancellationOriginalEntryDocumentTransactionUUID may be optional and can be of type GDT: UUID. CancelledIndicator may be optional and can be of type GDT: Indicator and of Qualifier: Cancelled.

Another type of query that can be performed for LineItem is QueryByClearedDueItem which can deliver a list of all line items that can be assigned to a cleared DueItem. Query elements can be defined by the data type AccountsReceivablePayableLedgerAccountLineItemClearedDueItemQueryElements. These elements can include AccountsReceivablePayableLedgerAccountDueItemLifecycleClearingPostingDate, AccountsReceivablePayableLedgerAccountCompanyID, AccountsReceivablePayableLedgerAccountCompanyUUID, AccountsReceivablePayableLedgerAccountBusinessPartnerID, AccountsReceivablePayableLedgerAccountBusinessPartnerUUID, AccountsReceivablePayableLedgerAccountPartyRoleCategoryCode, SetOfBooksID, SegmentID, SegmentUUID, ProfitCentreID, ProfitCentreUUID, PartnerCompanyID, PartnerCompanyUUID, Partner SegmentID, PartnerSegmentUUID, Partner ProfitCentreID, PartnerProfitCentreUUID, AccountingDocumentUUID, AccountingDocumentID, AccountingDocumentItemID, OriginalEntryDocumentContainingObjectReference, OriginalEntryTransactionUUID, OriginalEntryDocumentReference, OriginalEntryDocumentItemReference, OriginalEntryDocumentItemTypeCode, OriginalEntryDocumentPartnerID, AccountingNotificationUUID, AccountingNotificationItemGroupItemUUID, GeneralLedgerAccountLineItemUUID, GeneralLedgerAccountLineItemAccountingDocumentItemGroupID, SystemAdministrativeData, ChartOfAccountsCode, ChartOfAccountsItemCode, AccountingBusinessTransactionTypeCode, TypeCode, AccountsReceivableDueItemTypeCode, AccountsPayableDueItemTypeCode, AccountingDocumentTypeCode, AccountingDocumentNote, AccountingDocumentItemNote, ProductTaxTypeCode, ProductTaxDueCategoryCode, ProductTaxCountryCode, ProductTaxEventTypeCode, ProductTaxRateTypeCode, WithholdingTaxTypeCode, WithholdingTaxCountryCode, WithholdingTaxEventTypeCode, WithholdingTaxRateTypeCode, PostingDate, OriginalEntryDocumentDate, AccountingBusinessTransactionDate, CurrencyConversionDate, FiscalYearVariantCode, FiscalYearID, AccountingPeriodID, AccountingClosingStepCode, AccountingDocumentItemAccountingGroupID, PropertyMovementDirectionCode, GeneralLedgerMovementTypeCode, DebitCreditCode, CancellationDocumentIndicator, CancellationOriginalEntryDocumentContainingBusinessObjectReference, CancellationOriginalEntryDocumentReference, CancellationOriginalEntryDocumentTransactionUUID, and CancelledIndicator. AccountsReceivablePayableLedgerAccountDueItemLifecycleClearingPostingDate can be of type GDT: Date and of Qualifier: Posting. AccountsReceivablePayableLedgerAccountCompanyID may be optional and can be of type GDT: OrganisationalCentreID. AccountsReceivablePayableLedgerAccountCompanyUUID may be optional and can be of type GDT: UUID. AccountsReceivablePayableLedgerAccountBusinessPartnerID may be optional and can be of type GDT: BusinessPartnerID. AccountsReceivablePayableLedgerAccountBusinessPartnerUUID may be optional and can be of type GDT: UUID. AccountsReceivablePayableLedgerAccountPartyRoleCategoryCode may be optional and can be of type GDT: PartyRoleCategoryCode. SetOfBooksID may be optional and can be of type GDT: SetOfBooksID. SegmentID may be optional and can be of type GDT: OrganisationalCentreID. SegmentUUID may be optional and can be of type GDT: UUID. ProfitCentreID may be optional and can be of type GDT: OrganisationalCentreID. ProfitCentreUUID may be optional and can be of type GDT: UUID. PartnerCompanyID may be optional and can be of type GDT: OrganisationalCentreID. PartnerCompanyUUID may be optional and can be of type GDT: UUID. Partner SegmentID may be optional and can be of type GDT: OrganisationalCentreID. PartnerSegmentUUID may be optional and can be of type GDT: UUID. Partner ProfitCentreID may be optional and can be of type: OrganisationalCentreID. PartnerProfitCentreUUID may be optional and can be of type GDT: UUID. AccountingDocumentUUID may be optional and can be of type GDT: UUID. AccountingDocumentID may be optional and can be of type: BusinessTransactionDocumentID. AccountingDocumentItemID may be optional and can be of type GDT: BusinessTransactionDocumentItemID. OriginalEntryDocumentContainingObjectReference may be optional and can be of type: ObjectNodeReference and of Qualifier: OriginalEntryDocumentContaining. OriginalEntryTransactionUUID may be optional and can be of type GDT: UUID. OriginalEntryDocumentReference may be optional and can be of type GDT: ObjectNodeReference. OriginalEntryDocumentItemReference may be optional and can be of type GDT: ObjectNodeReference. OriginalEntryDocumentItemTypeCode may be optional and can be of type GDT: BusinessTransactionDocumentItemTypeCode. OriginalEntryDocumentPartnerID may be optional and can be of type GDT: BusinessTransactionDocumentID. AccountingNotificationUUID may be optional and can be of type: UUID. AccountingNotificationItemGroupItemUUID may be optional and can be of type: UUID. GeneralLedgerAccountLineItemUUID may be optional and can be of type GDT: UUID. GeneralLedgerAccountLineItemAccountingDocumentItemGroupID may be optional and can be of type GDT: BusinessTransactionDocumentItemGroupID. SystemAdministrativeData may be optional and can be of type GDT: SystemAdministrativeData. ChartOfAccountsCode may be optional and can be of type GDT: ChartOfAccountsCode. ChartOfAccountsItemCode may be optional and can be of type: ChartOfAccountsItemCode. AccountingBusinessTransactionTypeCode may be optional and can be of type GDT: AccountingBusinessTransactionTypeCode. TypeCode may be optional and can be of type GDT: SubledgerAccountLineItemTypeCode. AccountsReceivableDueItemTypeCode may be optional and can be of type GDT: AccountsReceivableDueItemTypeCode. AccountsPayableDueItemTypeCode may be optional and can be of type GDT: AccountsPayableDueItemTypeCode.

AccountingDocumentTypeCode may be optional and can be of type GDT: AccountingDocumentTypeCode. AccountingDocumentNote may be optional and can be of type GDT: SHORT_Note. AccountingDocumentItemNote may be optional and can be of type GDT: SHORT_Note.

ProductTaxTypeCode may be optional and can be of type GDT: TaxTypeCode. ProductTaxDueCategoryCode may be optional and can be of type GDT: DueCategoryCode and of Qualifier: Tax. ProductTaxCountryCode may be optional and can be of type GDT: CountryCode.

ProductTaxEventTypeCode may be optional and can be of type GDT: ProductTaxEventTypeCode. ProductTaxRateTypeCode may be optional and can be of type GDT: TaxRateTypeCode and of Qualifier: Product. WithholdingTaxTypeCode may be optional and can be of type GDT TaxTypeCode. WithholdingTaxCountryCode may be optional and can be of type GDT: CountryCode. WithholdingTaxEventTypeCode may be optional and can be of type GDT WithholdingTaxEventTypeCode. WithholdingTaxRateTypeCode may be optional and can be of type GDT TaxRateTypeCode. PostingDate may be optional and can be of type GDT: Date and of Qualifier: Posting. OriginalEntryDocumentDate may be optional and can be of type GDT: Date and of Qualifier: OriginalEntryDocument. AccountingBusinessTransactionDate may be optional and can be of type GDT: Date and of Qualifier: Transaction. CurrencyConversionDate may be optional and can be of type GDT: Date and of Qualifier: CurrencyConversion. FiscalYearVariantCode may be optional and can be of type GDT: FiscalYearVariantCode. FiscalYearID may be optional and can be of type GDT: FiscalYearID. AccountingPeriodID may be optional and can be of type GDT: AccountingPeriodID. AccountingClosingStepCode may be optional and can be of type: AccountingClosingStepCode. AccountingDocumentItemAccountingGroupID may be optional and can be of type GDT: BusinessTransactionDocumentItemGroupID. PropertyMovementDirectionCode may be optional and can be of type GDT: PropertyMovementDirectionCode. GeneralLedgerMovementTypeCode may be optional and can be of type GDT: GeneralLedgerMovementTypeCode. DebitCreditCode may be optional and can be of type: DebitCreditCode. CancellationDocumentIndicator may be optional and can be of type GDT: Indicator and of Qualifier: CancellationDocument. CancellationOriginalEntryDocumentContainingBusinessObjectReference may be optional and can be of type: ObjectNodeReference and of Qualifier: CancellationOriginalEntryDocumentContaining. CancellationOriginalEntryDocumentReference may be optional and can be of type GDT: ObjectNodeReference and of Qualifier: Cancellation. CancellationOriginalEntryDocumentTransactionUUID may be optional and can be of type GDT: UUID. CancelledIndicator may be optional and can be of type GDT: Indicator and of Qualifier: Cancelled.

PeriodBalance

PeriodBalance can be defined as a period-specific record for an AccountsReceivablePayableLedgerAccount containing information for a set of books about the value of the balance of payables or receivables. The elements located at the PeriodBalance node can be defined by the type GDT: AccountsReceivablePayableLedgerAccountPeriodBalanceElements. These elements can include SetOfBooksID, SegmentUUID, ProfitCentreUUID, PartnerCompanyUUID, PartnerSegmentUUID, PartnerProfitCentreUUID, ChartOfAccountsCode, ChartOfAccountsItemCode, FiscalYearVariantCode, FiscalYearID, AccountingPeriodID, SubledgerAccountLineItemTypeCode, AccountsReceivableDueItemTypeCode, AccountsPayableDueItemTypeCode, LineItemCurrencyCode, LineItemCurrencyAmount, LocalCurrencyAmount, SetOfBooksCurrencyAmount, HardCurrencyAmount, IndexBasedCurrencyAmount, NetLineItemCurrencyAmount, NetLocalCurrencyAmount, NetSetOfBooksCurrencyAmount, NetHardCurrencyAmount, and NetIndexBasedCurrencyAmount.

SetOfBooksID can be an universally unique identification of the SetOfBooks according to whose specifications the PeriodBalance was created and updated and can be type GDT: SetOfBooksID. SegmentUUID may be optional and can be a universally unique identification of the Segment to which the value of the period balance is allocated and can be of type GDT: UUID. ProfitCentreUUID may be optional and can be a universally unique identification of the ProfitCentre to which the value of the period balance can be allocated and can be of type GDT: UUID. PartnerCompanyUUID may be optional and can be an universally unique identification of a Company that acts in the business transaction stated in the period balance as an intra corporate partner and can be of type GDT: UUID. PartnerSegmentUUID may be optional and can be an universally unique identification of a Segment that acts in the business transaction stated in the period balance as an intra corporate partner and can be of type GDT: UUID. PartnerProfitCentreUUID may be optional and can be a unique identification of a ProfitCentre that acts in the business transaction stated in the period balance as an intra corporate partner and can be of type GDT: UUID. ChartOfAccountsCode can be a coded representation of the ChartOfAccounts that contains the ChartOfAccountsItem that can classify the value stated in the PeriodBalance and can be of type GDT: ChartOfAccountsCode. ChartOfAccountsItemCode can be a coded representation of a ChartOfAccountsItem that classifies—for general ledger accounting purposes the value stated in the PeriodBalance and can be of type GDT: ChartOfAccountsItemCode. FiscalYearVariantCode can be a coded representation of the FiscalYearVariant according to whose fiscal year definition (begin, end, period definition) the FiscalYearID and the AccountingPeriodID are derived and can be of type GDT: FiscalYearVariantCode. FiscalYearID can be an identification of the fiscal year in which the LineItem can be posted for which the PeriodBalance keeps summarized values and quantities and can be of type GDT: FiscalYearID. AccountingPeriodID can be an identification of the accounting period in which the LineItem can be posted for which the PeriodBalance keeps summarized values and quantities and can be of type GDT: AccountingPeriodID. SubledgerAccountLineItemTypeCode can be a coded representation of the type of the SubledgerAccountLineItems whose amounts and quantities can be summarized in the PeriodBalance and can be of type GDT: SubledgerAccountLineItemTypeCode. AccountsReceivableDueItemTypeCode can be a coded representation of the type of due of an accounts receivable and can be of type GDT: AccountsReceivableDueItemTypeCode. AccountsPayableDueItemTypeCode can be a coded representation of the type of DueItem of an accounts payable and can be of type GDT: AccountsPayableDueItemTypeCode. LineItemCurrencyCode can be a coded representation of the LineItem currency and can be of type GDT: CurrencyCode and of Qualifier: LineItem. LineItemCurrencyAmount can be the value of the PeriodBalance in the LineItem currency and can be of type GDT: Amount and of Qualifier: LineItemCurrency. The value reported here can match the total of all values in LineItem currency that can be documented in the line items of the PeriodBalance. LocalCurrencyAmount can be the value of the PeriodBalance in the local currency of the Company carrying the AccountsReceivablePayableLedgerAccount. The local currency can be the currency in which the local books are kept. LocalCurrencyAmount can be of type GDT: Amount and of Qualifier: LocalCurrency. The value reported here can match the total of all values in local currency that are documented in the line items of the PeriodBalance. SetOfBooksCurrencyAmount may be optional and can be the value of the PeriodBalance in the currency selected for the set of books. SetOfBooksCurrencyAmount can be of type GDT: Amount and of Qualifier: SetOfBooksCurrency. The value reported here can match the total of all values in the additional currency selected for the set of books that are documented in the line items of the PeriodBalance. HardCurrencyAmount may be optional and can be the value of the PeriodBalance in the hard currency of the country of the Company carrying the AccountsReceivablePayableLedgerAccount. The hard currency can be a stable, country-specific currency that can be used in high-inflation countries. HardCurrencyAmount can be of type GDT: Amount and of Qualifier: HardCurrency. The value reported here can match the total of all values in the hard currency that can be documented in the line items of the PeriodBalance. IndexBasedCurrencyAmount may be optional and can be the value of the period balance in the index-based currency of the country of the Company Company carrying the AccountsReceivablePayableLedgerAccount. The index-based currency can be a fictitious, country-specific currency that can be used in high-inflation countries as a comparison currency for reporting. IndexBasedCurrencyAmount can be of type GDT: Amount and of Qualifier: IndexBasedCurrency. The value reported here can match the total of all values in the index-based currency that can be documented in the line items of the PeriodBalance. NetLineItemCurrencyAmount can be the net value of the PeriodBalance in the LineItem currency and can be of type GDT: Amount and of Qualifier: LineItemCurrency. The value reported here can match the total of all net values in LineItem currency that can be documented in the line items of the PeriodBalance. NetLocalCurrencyAmount can be the net value of the PeriodBalance in the local currency of the Company carrying the AccountsReceivablePayableLedgerAccount. The local currency can be the currency in which the local books can be kept. NetLocalCurrencyAmount can be of type GDT: Amount and of Qualifier: LocalCurrency. The value reported here can match the total of all net values in local currency that can be documented in the line items of the PeriodBalance. NetSetOfBooksCurrencyAmount may be optional and ca be the net value of the PeriodBalance in the currency selected for the set of books. NetSetOfBooksCurrencyAmount can be of type GDT: Amount and of Qualifier: SetOfBooksCurrency. The value reported here can match the total of all net values in the additional currency selected for the set of books that can be documented in the line items of the PeriodBalance. NetHardCurrencyAmount may be optional and can be the net value of the PeriodBalance in the hard currency of the country of the Company carrying the AccountsReceivablePayableLedgerAccount The hard currency can be a stable, country-specific currency that can be used in high-inflation countries. NetHardCurrencyAmount can be of type GDT: Amount and of Qualifier: HardCurrency. The value reported here can match the total of all net values in the hard currency that can be documented in the line items of the PeriodBalance. NetIndexBasedCurrencyAmount may be optional and can be the net value of the period balance in the index-based currency of the country of the Company Company carrying the AccountsReceivablePayableLedgerAccount. The index-based currency can be a fictitious, country-specific currency that can be used in high-inflation countries as a comparison currency for reporting. NetIndexBasedCurrencyAmount can be of type GDT: Amount and of Qualifier: IndexBasedCurrency. The value reported here can match the total of all net values in the index-based currency that can be documented in the line items of the PeriodBalance. There may be a number of inbound aggregation relationships. From the SetOfBooks business object (or node) to the SetOfBooks business object (or node) there may be a cardinality relationship of 1:cn. SetOfBooks can be a SetOfBooks based on whose specifications the PeriodBalance was created and updated. From the Company business object (or node) to the Partner Company business object (or node) there may be a cardinality relationship of c:cn. Partner Company can be a Company that acts in the business transactions as an intra corporate partner From the Segment business object (or node) to the Segment business object (or node) there may be a cardinality relationship of c:cn. Segment can be a Segment to which the value of the PeriodBalance can be allocated. From the Segment business object (or node) to the PartnerSegment business object (or node) there may be a cardinality relationship of c:cn. PartnerSegment can be a segment that acts in the business transactions as an intra corporate partner. From the ProfitCentre business object (or node) to the ProfitCentre business object (or node) there may be a cardinality relationship of c:cn. ProfitCentre can be a ProfitCentre to which the value of the PeriodBalance is allocated.

From the ProfitCentre business object (or node) to the PartnerProfitCentre business object (or node) there may be a cardinality relationship of c:cn. PartnerProfitCentre can be a ProfitCentre that acts in the business transactions as an intra corporate partner.

PeriodBalance can have a number of types of queries performed on it. This may include a QueryByElements which can deliver a list of all period balances that meet the selection criteria specified by the query elements, linked by a logical "AND". Query elements can be defined by the data type: AccountsReceivablePayableLedgerAccountPeriodBalanceElementsQueryElements. These elements can include AccountsReceivablePayableLedgerAccountCompanyID, AccountsReceivablePayableLedgerAccountCompanyUUID, AccountsReceivablePayableLedgerAccountBusinessPartnerID, AccountsReceivablePayableLedgerAccountBusinessPartnerUUID, AccountsReceivablePayableLedgerAccountPartyRoleCategoryCode, SetOfBooksID, SegmentID, SegmentUUID, ProfitCentreID, ProfitCentreUUID, PartnerCompanyID, PartnerCompanyUUID, Partner SegmentID, PartnerSegmentUUID, Partner ProfitCentreID, PartnerProfitCentreUUID, ChartOfAccountsCode, ChartOfAccountsItemCode, FiscalYearVariantCode, FiscalYearID, AccountingPeriodID, SubledgerAccountLineItemTypeCode, AccountsReceivableDueItemTypeCode, AccountsPayableDueItemTypeCode, and LineItemCurrencyCode. AccountsReceivablePayableLedgerAccountCompany may be optional and can be of type GDT: OrganisationalCentreID. AccountsReceivablePayableLedgerAccountCompanyUUID may be optional and can be of type GDT: UUID. AccountsReceivablePayableLedgerAccountBusinessPartnerID may be optional and can be of type GDT: BusinessPartnerID AccountsReceivablePayableLedgerAccountBusinessPartnerUUID may be optional and can be of type GDT: UUID.AccountsReceivablePayableLedgerAccountPartyRoleCategoryCode may be optional and can be of type GDT: PartyRoleCategoryCode. SetOfBooksID may be optional and can be of type GDT: SetOf- BooksID. SegmentID may be optional and can be of type GDT: OrganisationalCentreID. SegmentUUID may be optional and can be of type GDT: UUID. ProfitCentreID may be optional and can be of type GDT: OrganisationalCentreID. ProfitCentreUUID may be optional and can be of type GDT: UUID. PartnerCompanyID may be optional and can be of type GDT: OrganisationalCentreID. PartnerCompanyUUID may be optional and can be of type GDT: UUID. Partner SegmentID may be optional and can be of type GDT: OrganisationalCentreID. PartnerSegmentUUID may be optional and can be of type GDT: UUID. Partner ProfitCentreID may be optional and can be of type GDT: OrganisationalCentreID. PartnerProfitCentreUUID may be optional and can be of type GDT: UUID. ChartOfAccountsCode may be optional and can be of type GDT: ChartOfAccountsCode. ChartOfAccountsItemCode may be optional and can be of type GDT: ChartOfAccountsItemCode. FiscalYearVariantCode may be optional and can be of type GDT: FiscalYearVariantCode. FiscalYearID may be optional and can be of type GDT: FiscalYearID. AccountingPeriodID may be optional and can be of type GDT: AccountingPeriodID. SubledgerAccountLineItemTypeCode may be optional and can be of type GDT: SubledgerAccountLineItemTypeCode. AccountsReceivableDueItemTypeCode may be optional and can be of type GDT: AccountsReceivableDueItemTypeCode. AccountsPayableDueItemTypeCode may be optional and can be of type GDT: AccountsPayableDueItemTypeCode. LineItemCurrencyCode may be optional and can be of type GDT: CurrencyCode.

FIG. 83-1 through 83-2 illustrates one example logical configuration of AccountsPayableLedgerAccountTransmitRequestMessage message 83000. Specifically, this figure depicts the arrangement and hierarchy of various components such as one or more levels of packages, entities, and datatypes, shown here as 83000 through 83062. As described above, packages may be used to represent hierarchy levels. Entities are discrete business elements that are used during a business transaction. Data types are used to type object entities and interfaces with a structure. For example, AccountsPayableLedgerAccountTransmitRequestMessage message 83000 includes, among other things, AccountsPayableLedgerAccountTransmitRequest 83032. Accordingly, heterogeneous applications may communicate using this consistent message configured as such.

FIG. 84-1 through 84-3 illustrates one example logical configuration of AccountsReceivableLedgerAccountTransmitRequestMessage message 84000. Specifically, this figure depicts the arrangement and hierarchy of various components such as one or more levels of packages, entities, and datatypes, shown here as 84000 through 84062. As described above, packages may be used to represent hierarchy levels. Entities are discrete business elements that are used during a business transaction. Data types are used to type object entities and interfaces with a structure. For example, AccountsReceivableLedgerAccountTransmitRequestMessage message 84000 includes, among other things, AccountsReceivableLedgerAccountTransmitRequest 84032. Accordingly, heterogeneous applications may communicate using this consistent message configured as such.

Message Types and their Signatures

This section describes the message types and their signatures that can be derived from the operations of the business object AccountReceivablesPayablesLedgerAccount. In a signature, the business object can be contained as a "leading" business object. The message data type can determine the structure of the following message types. Master data parts (root nodes) of AccountsReceivablePayableLedgerAccounts of a company are migrated from a legacy system to a new ERP system. In some implementations the message types AccountsReceivableLedgerAccountTransmitRequest and AccountsPayableLedgerAccountTransmitRequest may exist. AccountsReceivableLedgerAccountTransmitRequest can be defined as a request to migrate the master data parts (root node) of an AccountsReceivablePayableLedgerAccount of one company. The structure of this message type can be determined by the message data type AccountsReceivableLedgerAccountTransmitRequest Message. The integrity condition may exist such that for details of constraints on the structure and integrity conditions AccountsReceivableLedgerAccountTransmitRequest that can be imposed by message data type AccountsReceivableLedgerAccountTransmitRequestMessage. This message type can be used in the operation of business object AccountReceivablesPayablesLedgerAccount in order to Transmit Accounts Receivable. This message can transmit AccountsReceivable. AccountsPayableLedgerAccountTransmitRequest can be defined as a request to migrate the master data part (root node) of an AccountsReceivablePayableLedgerAccount of one company. The structure of this message type can be determined by the message data type AccountsPayableLedgerAccountTransmitRequest Message. This message type can be used in the operation of business object in order to Transmit Accounts Payable. This message can transmit AccountsPayable.

AccountsReceivableLedgerAccountTransmitRequestMessage

The AccountsReceivableLedgerAccountTransmitRequestMessage message data type may contain the object AccountsReceivableLedgerAccountTransmitRequest which can be contained in the business document. Furthermore, it may also contain the business information that can be relevant for sending a business document in a message. AccountsReceivableLedgerAccountTransmitRequestMessage can contain the packages of MessageHeader package and AccountsReceivableLedgerAccountTransmitRequest package. This message data type, therefore, can provide the structure for the following message types and the operations that are based on them: AccountsReceivableLedgerAccountTransmitRequest. This message can transmit AccountsReceivable. This means that the PartyRoleCategory "Debtor Party" can be used in the resulting AccountsReceivablePayableLedgerAccount MessageHeader Package The MessageHeader Package can be defined as a grouping of business information that can be relevant for sending a business document in a message. It can contain the node MessageHeader. A MessageHeader can be defined as a grouping of business information from the perspective of the sending application which can include Information to identify the business document in a message, Information about the sender, and optionally Information about the recipient. The MessageHeader may contain SenderParty and RecipientParty. It can be of the type GDT: BusinessDocumentMessageHeader, and the following elements of the GDT can be used: ID, ReferenceID. The SenderParty can be defined as a partner responsible for sending a business document at business application level. The SenderParty can be of the type GDT: BusinessDocumentMessageHeaderParty. The RecipientParty can be defined as the partner responsible for receiving a business document at business application level. The RecipientParty can be of the type GDT: BusinessDocumentMessageHeaderParty.

AccountsReceivableLedgerAccountTransmitRequest Package

The AccountsReceivableLedgerAccountTransmitRequest Package may contain the entity AccountsReceivableLedger-AccountTransmitRequest. AccountsReceivableLedgerAccountTransmitRequest can be defined as a request to migrate the master data part (root node) of an AccountsReceivable-PayableLedgerAccount of one company. AccountsReceivableLedgerAccountTransmitRequest can be of type IDT: AccountsReceivableLedgerAccountTransmitRequest, it can contain the elements @actionCode, CompanyID, Business-PartnerID, and AccountDeterminationDebtorGroupCode. @actionCode can have a cardinality relationship of 1 and can be of type GDT: ActionCode. Company can have a cardinality relationship of 1 and can be of type GDT: OrganisationalCentreID. BusinessPartnerID can have a cardinality relationship of 1 and can be of type GDT: BusinessPartnerID. Account-DeterminationDebtorGroupCode can have a cardinality relationship of land can be of type GDT: AccountDetermination-DebtorGroupCode. The data types BusinessDocumentMessageHeader, ActionCode, OrganisationalCentreID, BusinessPartnerID, and AccountDeterminationDebtorGroupCode can be used.

AccountsPayableLedgerAccount-TransmitRequestMessage

The AccountsPayableLedgerAccount-TransmitRequestMessage message data type may contain the object AccountsPayableLedgerAccountTransmitRequest which can be contained in the business document. Furthermore, it can contain the business information that can be relevant for sending a business document in a message. AccountsPayableLedgerAccountTransmitRequestMessage can contain the packages MessageHeader package and AccountsPayableLedgerAccountTransmitRequest package. This message data type, therefore, can provide the structure for the following message AccountsPayableLedgerAccount-TransmitRequest and the operations that may be based on it. This message can transmit AccountsPayable. This means that the PartyRoleCategory "Creditor Party" can be used in the resulting AccountReceivablesPayablesLedgerAccount.

MessageHeader Package

The MessageHeader Package can be defined as a grouping of business information that may be relevant for sending a business document in a message. MessageHeader Package may contain the node MessageHeader. The MessageHeader can be defined as a grouping of business information from the perspective of the sending application and may include information to identify the business document in a message, information about the sender, and optionally information about the recipient. The MessageHeader can contain SenderParty and RecipientParty. It can be of the type GDT: BusinessDocumentMessageHeader, and the ID and ReferenceIDelements of the GDT can be used. The SenderParty can be defined as the partner responsible for sending a business document at business application level. The SenderParty can be of the type GDT: BusinessDocumentMessageHeaderParty. The RecipientParty can be defined as the partner responsible for receiving a business document at business application level. The RecipientParty can be of the type GDT: BusinessDocument-MessageHeaderParty.

AccountsPayableLedgerAccountTransmitRequest Package

The AccountsPayableLedgerAccountTransmitRequest Package can contains the entity AccountsPayableLedgerAccountTransmitRequest. The AccountsPayableLedgerAccountTransmitRequestRequest can be used to migrate the master data part (root node) of an AccountReceivablesPayablesLedgerAccount of one company. AccountsPayableLedgerAccountTransmitRequest can be of type IDT: AccountsPayableLedgerAccountTransmitRequest, it can contains the elements @actionCode, CompanyID, Business-PartnerID, and AccountDeterminationCreditorGroupCode. @actionCode can have a cardinality relationship of 1 and can be of type GDT: ActionCode. CompanyID can have a cardinality relationship of 1 and can be of type GDT: OrganisationalCentreID. BusinessPartnerID can have a cardinality relationship of 1 and can be of type GDT: BusinessPartnerID. AccountDeterminationCreditorGroupCode can have a cardinality relationship of 1 and can be of type GDT: AccountDeterminationCreditorGroupCode. The data types Business-DocumentMessageHeader, ActionCode, OrganisationalCentreID, BusinessPartnerID, and Account-DeterminationCreditorGroupCode can be used.

Business Object BalanceSheetAndIncomeStatementReport

Figure 85:
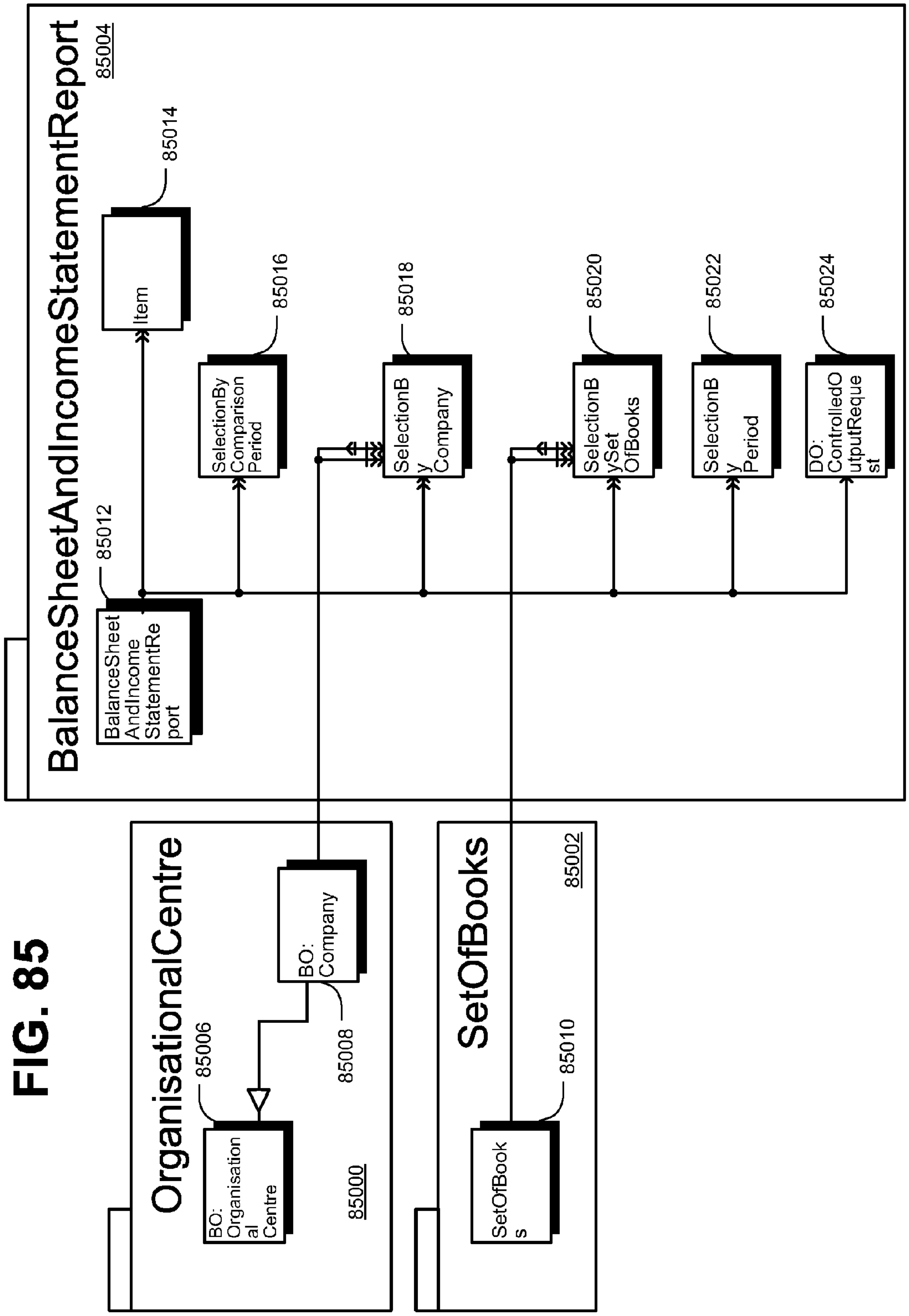
FIG. 85 shows an exemplary BalanceSheetAndIncomeStatementReport object model.

FIG. 85 illustrates one example of an BalanceSheetAndIncomeStatementReportbusiness object model 85004. Specifically, this figure depicts interactions among various hierarchical components of the BalanceSheetAndIncomeStatementReport, as well as external components that interact with the BalanceSheetAndIncomeStatementReport (shown here as 85000 through 85002 and 85006 through 85010).

BalanceSheetAndIncomeStatementReport is a report containing a statement of the book value and net income of one or more companies. The report can be given at the end of an accounting period which often coincides with the end of its fiscal year. It can be given in the legally required form. The business object BalanceSheetAndIncomeStatementReport is part of the Globalization Layer process component Accounting. A BalanceSheetAndIncomeStatementReport contains its type, e.g. opening balance or running balance, selection nodes which define for which company, set of books and accounting period the report is to be given, tts (transient) line items result from these selection nodes and contains the total values as summed up of the balances of the accounts assigned to them according to the balance sheet structure. BalanceSheetAndIncomeStatementReport is represented by the root node BalanceSheetAndIncomeStatementReport. The Business Object BalanceSheetAndIncomeStatementReport is involved in the Accounting_OutputManagement process integration model. Service interface Balance Sheet AndIncome Statement Out can have a technical name of AccountingBalanceSheetAndIncomeStatementOut. The Service Interface Balance Sheet And Income Statement Out is part of the Accounting_OutputManagement process integration model. The interface Balance Sheet And Income Statement Out contains the operation which sends the Report to the printer. Print Balance Sheet And Income Statement (A2A) has a technical name of AccountingBalanceSheetAndIncomeStatementOut.PrintBalanceSheetAndIncomeStatement. The Operation Print Balance Sheet And Income Statement sends the Report to the printer. The operation is based on the message type FormBalanceSheetAndIncomeStatementReportRequest derived from the business object BalanceSheetAndIncomeStatementReport.

Node Structure of Business Object BalanceSheetAndIncomeStatementReport

BalanceSheetAndIncomeStatementReport 85012 (root node of the business object BalanceSheetAndIncomeStatementReport) is a report containing a statement of the book value and net income of one or more companies. It contains the type of the Balance Sheet and Income Statement and information for its identification. The elements located directly at the node BalanceSheetAndIncomeStatementReport are defined by the type BalanceSheetAndIncomeStatementReportElements. These elements are UUID and TypeCode. UUID is a universally unique identification of the BalanceSheetAndIncomeStatementReport and is of type GDT: UUID. TypeCode is a coded representation of the type of the Balance Sheet and Income Statement and is of type GDT: BalanceSheetAndIncomeStatementReportTypeCode. A number of composition relationships to subordinate nodes can exist, such as a 1:n relationship involving SelectionByCompany 85018, a 1:n relationship involving SelectionBySetOfBooks 85020, a 1:n relationship involving SelectionByPeriod 85022, a 1:n relationship involving SelectionByComparisonPeriod 85016, a 1:n relationship involving Item 85014, and a 1:1 relationship involving ControlledOutputRequest 85024.

The Enterprise Service Infrastructure can include CreateItemsForBalanceSheetAndIncomeStatement and CreateBalanceSheetAndIncomeStatement actions. The CreateItemsForBalanceSheetAndIncomeStatement action can read balances from the Business Objects GeneralLedgerAccount and CashLedgerAccount and collects them into items of the balance sheet and income statement according to the balance sheet and income statement structure. The action Changes to the object: The CreateItemsForBalanceSheetAndIncomeStatement action can create transient item nodes containing the collected balances. The CreateBalanceSheetAndIncomeStatement action creates a business object BalanceSheetAndIncomeStatementReport. The CreateBalanceSheetAndIncomeStatement action creates a new business object BalanceSheetAndIncomeStatementReport. The CreateBalanceSheetAndIncomeStatement action elements are defined by the data type CreateBalanceSheetAndIncomeStatementActionElements. These elements include MassDataRunObjectID, a unique identifier for a Balance Sheet and Income Statement Report Run which has a type of GDT: MassDataRunObjectID. In some implementations, the CreateBalanceSheetAndIncomeStatement action may only be called by the mass data run object.

SelectionByCompany

SelectionByCompany is a selection of account balances by Companies in order to build up the balance sheet and income statement report. The elements located directly at the node SelectionByCompany are defined by the data type BalanceSheetAndIncomeStatementReportSelectionByCompanyElements. These elements include InclusionExclusionCode, IntervalBoundaryTypeCode, LowerBoundaryCompanyID, LowerBoundaryCompanyUUID, UpperBoundaryCompanyID, and UpperBoundaryCompanyUUID. InclusionExclusionCode is a code to determine whether the result set of the following interval selection is included in the overall result or is excluded from it and is of type GDT: InclusionExclusionCode. IntervalBoundaryTypeCode is a coded representation of the type of the interval boundary that is used for selecting the objects and is of type GDT: IntervalBoundaryTypeCode. LowerBoundaryCompanyID is a unique identification for the company that is used as the lower boundary in the interval condition for selecting objects and is of type GDT: OrganisationalCentreID. LowerBoundaryCompanyUUID is a universally unique identification for the company that is used as the lower boundary in the interval condition for selecting objects and is of type GDT: UUID. UpperBoundaryCompanyID is a unique identification for the company that is used as the upper boundary in the interval condition for selecting objects and is of type GDT: OrganisationalCentreID. UpperBoundaryCompanyUUID is optional, is a universally unique identification for the company that is used as the upper boundary in the interval condition for selecting objects, and is of type GDT: UUID.

A number of inbound association relationships can exist from business object Company or node Root. These can include LowerBoundaryCompany with a 1:cn cardinality relationship, involving a company whose ID is used as the lower boundary of the interval condition for selecting objects. UpperBoundaryCompany can be involved in a c:cn relationship with a company whose ID is used as the upper boundary of the interval condition for selecting objects. Associations for navigation from business object Company/node Root can include a Company with a cn:cn relationship where all companies whose identification is used in the selection condition. In some implementations, if only one company is available, its identification is assigned to the field LowerBoundaryCompanyID.

SelectionBySetOfBooks

SelectionBySetOfBooks is a selection of account balances by sets of books in order to build up the balance sheet and income statement report. Values are represented in accordance with the requirements of the respective set of books. The elements located directly at the node SelectionBySetOfBooks are defined by the data type BalanceSheetAndIncomeStatementReportSelectionBySetOfBooksElements. These elements include InclusionExclusionCode, IntervalBoundaryTypeCode, LowerBoundarySetOfBooksID, and UpperBoundarySetOfBooksID. InclusionExclusionCode is a code to determine whether the result set of the following interval selection is included in the overall result or is excluded from it, and is of type GDT: InclusionExclusionCode. IntervalBoundaryTypeCode is a coded representation of the type of the interval boundary that is used for selecting the objects, and is of type GDT: IntervalBoundaryTypeCode. LowerBoundarySetOfBooksID is a coded representation for the set of books that is used as the lower boundary in the interval condition for selecting objects, and is of type GDT: SetOfBooksID. UpperBoundarySetOfBooksID is a coded representation for the set of books that is used as the upper boundary in the interval condition for selecting objects, and is of type GDT: SetOfBooksID. A number of inbound association relationships can exist from the business object SetOfBooks or Root. LowerBoundarySetOfBooks can be involved in a 1:cn relationship, where a set of books whose code is used as a lower boundary of the interval condition for selecting objects. UpperBoundarySetOfBooks can be involved in a c:cn relationship where a set of books whose code is used as a upper boundary of the interval condition for selecting objects.

SelectionByPeriod

SelectionByPeriod is a selection of account balances by accounting periods within a fiscal year in order to build up the balance sheet and income statement report. The elements located directly at the node SelectionByPeriod are defined by the data type BalanceSheetAndIncomeStatementReportSelectionByPeriodElements. These elements are LowerBoundaryFiscalYearValue, UpperBoundaryFiscalYearValue, LowerBoundaryAccountingPeriodID, and UpperBoundaryAccountingPeriodID.

LowerBoundaryFiscalYearValue is a fiscal year used as the lower boundary in the interval condition for selecting objects, and is of type GDT: FiscalYearValue. UpperBoundaryFiscalYearValue is optional, is a fiscal year used as the upper boundary in the interval condition for selecting objects, and is of type GDT: FiscalYearValue. LowerBoundaryAccountingPeriodID is a unique identification for the posting period of a fiscal year that is used as the lower boundary in the interval condition for selecting objects, and is of type GDT: AccountingPeriodID. UpperBoundaryAccountingPeriodID is optional, is a unique identification for the posting period of a fiscal year that is used as the upper boundary in the interval condition for selecting objects, and is of type GDT: AccountingPeriodID.

SelectionByComparisonPeriod

SelectionByComparisonPeriod is a selection of account balances by accounting periods within a fiscal year in order to build up a comparison balance sheet and income statement within the report. The elements located directly at the node SelectionByComparisonPeriod are defined by the data type BalanceSheetAndIncomeStatementReportSelectionByPeriodElements. These elements include LowerBoundaryFiscalYearValue, UpperBoundaryFiscalYearValue, LowerBoundaryAccountingPeriodID, and UpperBoundaryAccountingPeriodID. LowerBoundaryFiscalYearValue is a fiscal year used as the lower boundary in the interval condition for selecting objects, and is of type GDT: FiscalYearValue. UpperBoundaryFiscalYearValue is optional, is a fiscal year used as the upper boundary in the interval condition for selecting objects, and is of type GDT: FiscalYearValue. LowerBoundaryAccountingPeriodID is a unique identification for the posting period of a fiscal year that is used as the lower boundary in the interval condition for selecting objects, and is of type GDT: AccountingPeriodID. UpperBoundaryAccountingPeriodID is optional, is a unique identification for the posting period of a fiscal year that is used as the upper boundary in the interval condition for selecting objects, and is of type GDT: AccountingPeriodID.

Item

Item is part of the Balance Sheet and Income Statement hierarchy containing the total values as collected from the balances of the assigned accounts. The balance sheet and income statement hierarchicy is defined within the business configuration. It defines how account's balances are to be collected and displayed. Within this hierarchy, an item can have child items, in which case it is their only parent. All accounts assigned to the child items are also assigned to the parent, and the parent's total equals the sum of the children's totals. The item's position within the hierarchy follows from its counter and level. The balances are collected according to the periods and comparison periods as defined in the SelectionByPeriod and SelectionByComparisonPeriod nodes. Their values are calculated according to the accounting principle assigned to the combinations of sets of books and companies which follow from the SelectionByCompany and SelectionBySetOfBooks nodes. The elements located directly at the node Item are defined by the data type BalanceSheetAndIncomeStatementReportItemElements. These elements are BalanceSheetAndIncomeStatementHierarchyItemOrdinalNumberValue, CompanyID, SetOfBooksID, BalanceSheetAndIncomeStatementHierarchyItemDescription, BalanceSheetAndIncomeStatementHierarchyLevelOrdinalNumberValue, FromSummationExcludedIndicator, TotalAmount, ComparisonTotalAmount, AbsoluteDifferenceAmount, and RelativeDifferencePercent. BalanceSheetAndIncomeStatementHierarchyItemOrdinalNumberValue is the number of the Item within the Balance Sheet and Income Statement, is of type GDT: OrdinalNumberValue, and can have a qualifier of Item. CompanyID is an identifier of the company to which the balance sheet reported item belongs to, and is of type GDT: OrganisationalCentreID. SetOfBooksID is a set of books according to which the item's amounts are calculated, and is of type GDT: SetofBooksID. BalanceSheetAndIncomeStatementHierarchyItemDescription is a description of the Balance Sheet and Income Statement hierarchy item, and is of type GDT: Description. BalanceSheetAndIncomeStatementHierarchyLevelOrdinalNumberValue is a level of the Item within the Item hierarchy, is of type GDT: OrdinalNumberValue, and can have a qualifier of Level. FromSummationExcludedIndicator is optional, is an indicator that the Item's amounts shall not be included in the collection to derive the parent's item amounts, is of type GDT: Indicator, and can have a qualifier of Excluded. TotalAmount is a total value as summed up of the balances of the assigned accounts, is of type GDT: Amount, and can have a qualifier of Total. ComparisonTotalAmount is optional, is a total value as summed up of the balances of the assigned accounts within the selected comparison period, is of type GDT: Amount, and can have a qualifier of Total. AbsoluteDifferenceAmount is optional, is an absolute difference between the amount and the comparison amount, is of type GDT: Amount, and can have a qualifier of Difference. RelativeDifferencePercent is optional, is a relative difference between the amount and the comparison amount, expressed in percentage, is of type GDT: Percentage, and can have a qualifier of Difference. DO: ControlledOutputRequest is a controller of output requests and output history entries related to the BalanceSheetAndIncomeStatementReport.

Figure 86:
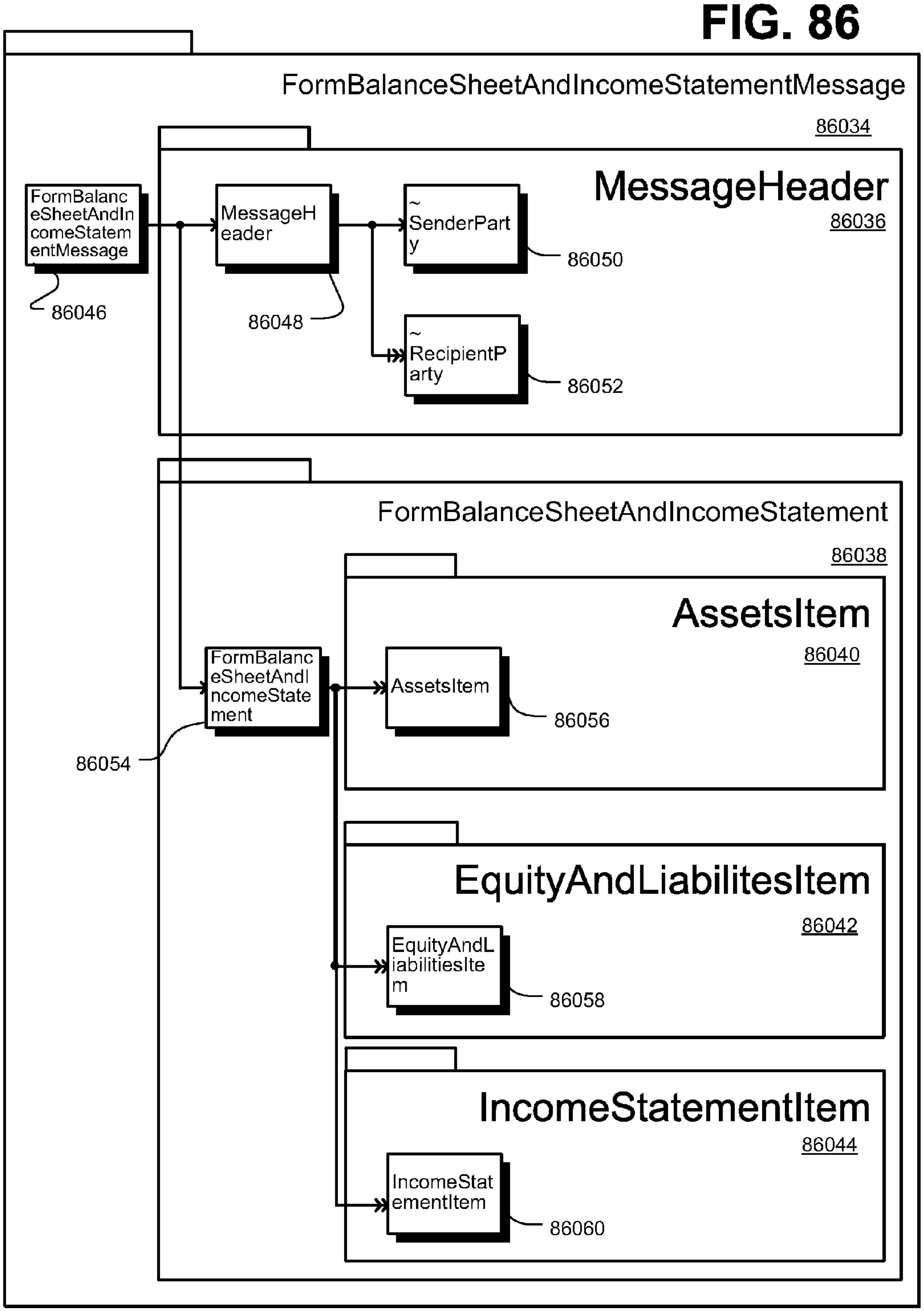
FIG. 86 shows an exemplary FormBalanceAndIncomeStatementMessage Message Data Type.

FIG. 86 illustrates one example logical configuration of FormBalanceAndIncomeStatementMessage message 86034. Specifically, this figure depicts the arrangement and hierarchy of various components such as one or more levels of packages, entities, and datatypes, shown here as 86034 though 86060. As described above, packages may be used to represent hierarchy levels. Entities are discrete business elements that are used during a business transaction. Data types are used to type object entities and interfaces with a structure. For example, FormBalanceAndIncomeStatementMessage message 86034 includes, among other things, FormBalanceAndIncomeStatement 86038. Accordingly, heterogeneous applications may communicate using this consistent message configured as such.

FIG. 87-1 through 87-8 illustrates one example logical configuration of BalanceSheetAndIncomeStatementMessage message 87000. Specifically, this figure depicts the arrangement and hierarchy of various components such as one or more levels of packages, entities, and datatypes, shown here as 87000 through 87220. As described above, packages may be used to represent hierarchy levels. Entities are discrete business elements that are used during a business transaction. Data types are used to type object entities and interfaces with a structure. For example, BalanceSheetAndIncomeStatementMessage message 87000 includes, among other things, FormBalanceSheetAndIncomingStatement 87026. Accordingly, heterogeneous applications may communicate using this consistent message configured as such.

Message Types and their Signatures

This section describes the message types and their signatures that are derived from the operations of the BalanceSheetAndIncomeStatementReport business object. In a signature, the business object is contained as a "leading" business object. The message data type defines the structure of the following message types. At the end of its fiscal year, a company has to deliver balance sheet and income statement. The printout has to be formatted according to the company's needs and legal requirements.

FormBalanceSheetAndIncomeStatementReportRequest

FormBalanceSheetAndIncomeStatementReportRequest is a request to send a balance sheet and income statement report to an output device, e.g. a printer. The structure of this message type is determined by the message data type FormBalanceSheetAndIncomeStatementRequestMessage. For details of constraints on the structure and integrity conditions of FormBalanceSheetAndIncomeStatementRequest that are imposed by message data type FormBalanceSheetAndIncomeStatementRequestMessage, refer to the relevant subsection. This message type is used in the Print Balance Sheet And Income Statement operation of the BalanceSheetAndIncomeStatementReport business object.

FormBalanceSheetAndIncomeStatementMessage

The FormBalanceSheetAndIncomeStatementMessage message data type contains the object FormBalanceSheetAndIncomeStatement contained in the business document, and the business information that is relevant for sending a business document in a message. It contains the MessageHeader and FormBalanceSheetAndIncomeStatement package. This message data type, therefore, provides the structure for the FormBalanceSheetAndIncomeStatementRequest message type and the operations that are based on them. The MessageHeader Package is a grouping of business information that is relevant for sending a business document in a message. It contains the MessageHeader entity, which is a grouping of business information from the perspective of the sending application, such as identification of the business document in a message, information about the sender and optionally information about the recipient. The MessageHeader contains SenderParty and RecipientParty and is of the type GDT: BusinessDocumentMessageHeader, whereby the ID and ReferenceID elements of the GDT are used. SenderParty is the partner responsible for sending a business document at business application level. SenderParty is of the type GDT: BusinessDocumentMessageHeaderParty. RecipientParty is the partner responsible for receiving a business document at business application level. RecipientParty is of the type GDT: BusinessDocumentMessageHeaderParty.

FormBalanceSheetAndIncomeStatement Package

FormBalanceSheetAndIncomeStatement Package is the grouping of the FormBalanceSheetAndIncomeStatement with its AssetsItem, EquityAndLiabilities, and IncomeStatement packages. FormBalanceSheetAndIncomeStatement is a statement of the book value and net income of a company. The statement can be given at the end of an accounting period which often coincides with the end of its fiscal year. It can be given in the legally required form. The elements contained can be used for printout. A FormBalanceSheetAndIncomeStatement contains the CompanyID, SetOfBooksID, TypeCode, AccountingPeriodID, ComparisonAccountingPeriodID, FiscalYearValue and ComparisonFiscalYearValue elements. CompanyID can have a cardinality of 1:1 and is of type GDT: CompanyID. SetOfBooksID can have a cardinality of 1:1 and is of type GDT: SetOfBooksID. TypeCode can have a cardinality of 1:1 and can be of type GDT: BalanceSheetAndIncomeStatementReportTypeCode. AccountingPeriodID can have a cardinality of 1:1 and can be of type GDT: AccountingPeriodID. ComparisonAccountingPeriodID can have a cardinality of 0:1 and can be of type GDT: AccountingPeriodID. FiscalYearValue can have a cardinality of 1:1 and can be of type GDT: FiscalYearValue. ComparisonFiscalYearValue can have a cardinality of 0:1 and can be of type GDT: FiscalYearValue. The Items Package is the grouping of balance sheet and income statement line items: Assets items, EquityAndLiabilities items and IncomeStatement items.

AssetsItem

AssetsItem is part of the balance sheet and income statement hierarchy to which asset accounts are assigned to. Examples of assets items are current assets, long-term investments or fixed assets. An AssetsItem contains the elements LevelValue, Text, Amount, ComparisonAmount, AbsoluteDifference, RelativeDifferencePercent, and FromSummationExcludedIndicator. LevelValue can have a cardinality of 1:1 and can be of type GDT: BalanceSheetAndIncomeStatementHierarchyLevelValue. Text can have a cardinality of 1:1 and can be of type GDT: Text. Amount can have a cardinality of 1:1 and can be of type GDT: Amount. ComparisonAmount can have a cardinality of 0:1 and can be of type GDT: Amount. AbsoluteDifference can have a cardinality of 0:1 and can be of type GDT: Amount. RelativeDifferencePercent can have a cardinality of 0:1 and can be of type GDT: Percent. FromSummationExcludedIndicator can have a cardinality of 0:1 and can be of type GDT: ExcludedIndicator.

EquityAndLiabilitiesItem

EquityAndLiabilitiesItem is part of the balance sheet and income statement hierarchy to which equity and liabilies accounts are assigned to. Examples of equity and liabilities items are share capital, bank loans or accounts payable. An EquityAndLiabilitiesItem contains the LevelValue, Text, Amount, ComparisonAmount, AbsoluteDifference, RelativeDifferencePercent, and FromSummationExcludedIndicator elements. LevelValue can have a cardinality of 1:1 and can be of type GDT: BalanceSheetAndIncomeStatementHierarchyLevelValue. Text can have a cardinality of 1:1 and can be of type GDT: Text. Amount can have a cardinality of 1:1 and can be of type GDT: Amount. ComparisonAmount can have a cardinality of 0:1 and can be of type GDT: Amount. AbsoluteDifference can have a cardinality of 0:1 and can be of type GDT: Amount. RelativeDifferencePercent can have a cardinality of 0:1 and can be of type GDT: Percent. FromSummationExcludedIndicator can have a cardinality of 0:1 and can be of type GDT: ExcludedIndicator.

IncomeStatementItem

IncomeStatementItem is part of the balance sheet and income statement hierarchy to which income statement accounts are assigned to. Examples of income statement items are revenues and expenses. An AssetsItem can include the LevelValue, Text, Amount, ComparisonAmount, AbsoluteDifference, RelativeDifferencePercent, and FromSummationExcludedIndicator elements. LevelValue can have a cardinality of 1:1, and can be of type GDT: BalanceSheetAndIncomeStatementHierarchyLevelValue. Text can have a cardinality of 1:1 and can be of type GDT: Text. Amount can have a cardinality of 1:1 and can be of type GDT: Amount. ComparisonAmount can have a cardinality of 0:1 and can be of type GDT: Amount. AbsoluteDifference can have a cardinality of 0:1 and can be of type GDT: Amount. RelativeDifferencePercent can have a cardinality of 0:1 and can be of type GDT: Percent. FromSummationExcludedIndicator can have a cardinality of 0:1 and can be of type GDT: ExcludedIndicator.

Business Object CashLedgerAccount

Figures 1, 88:
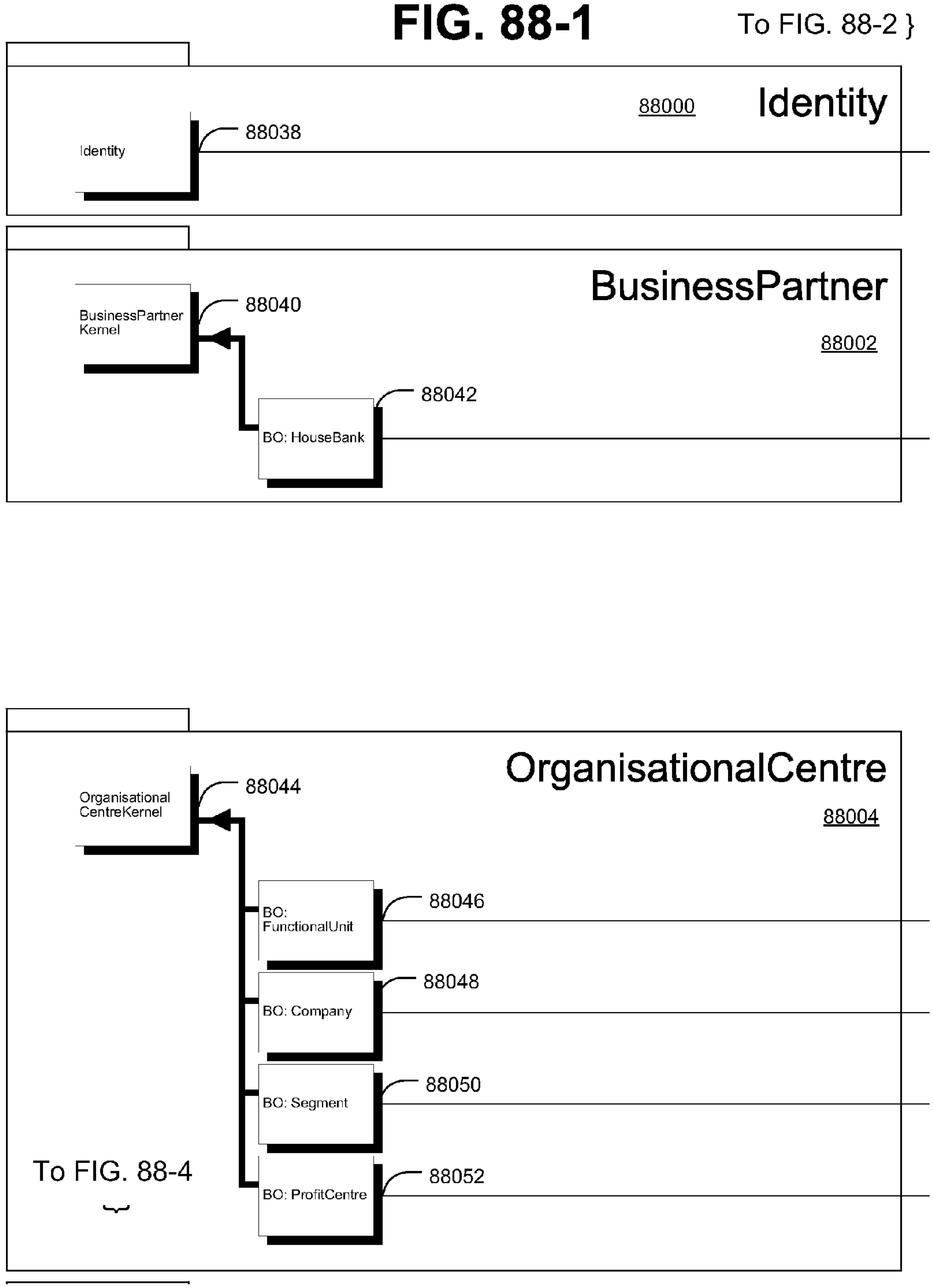
Figures 2, 88:
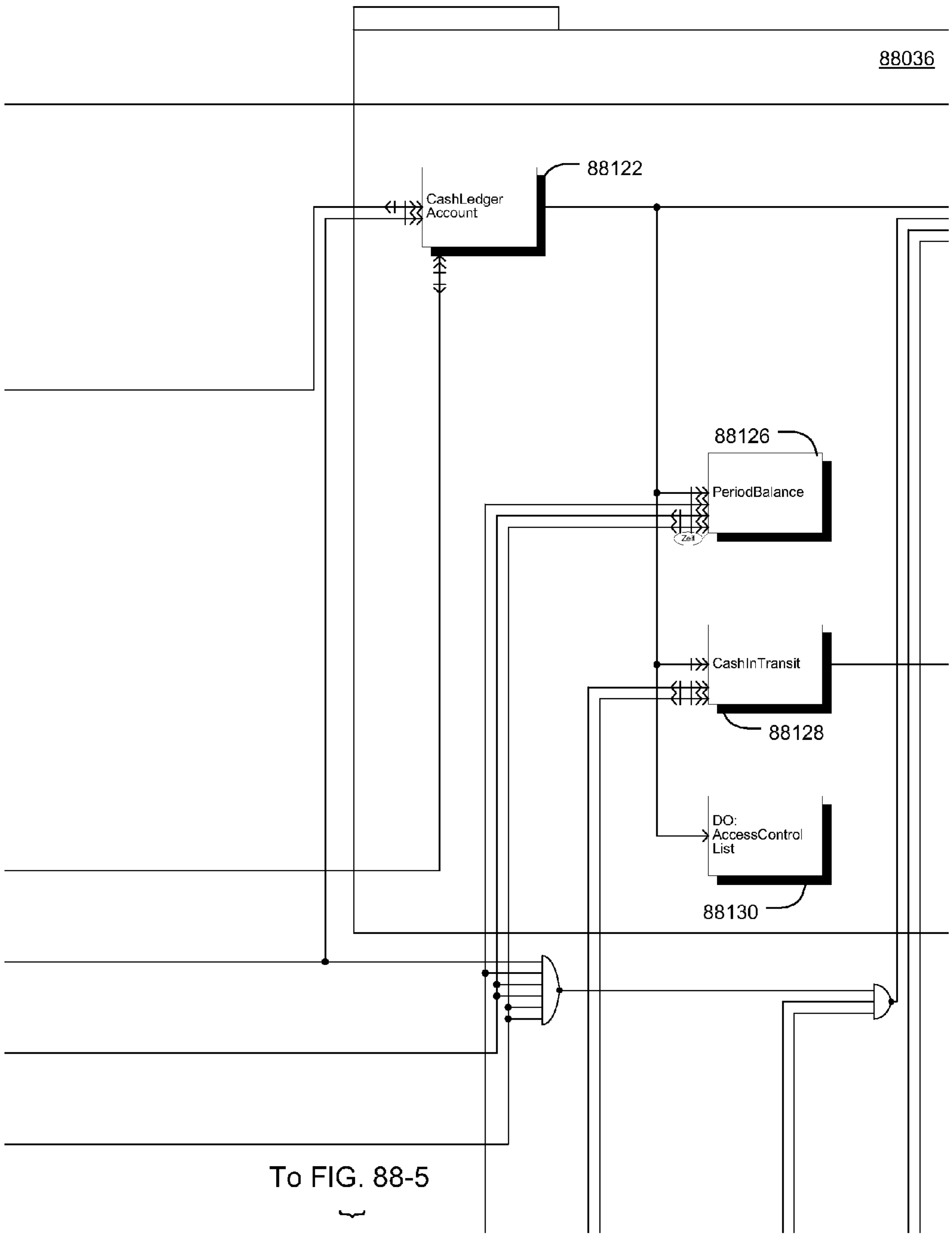
Figures 3, 88:
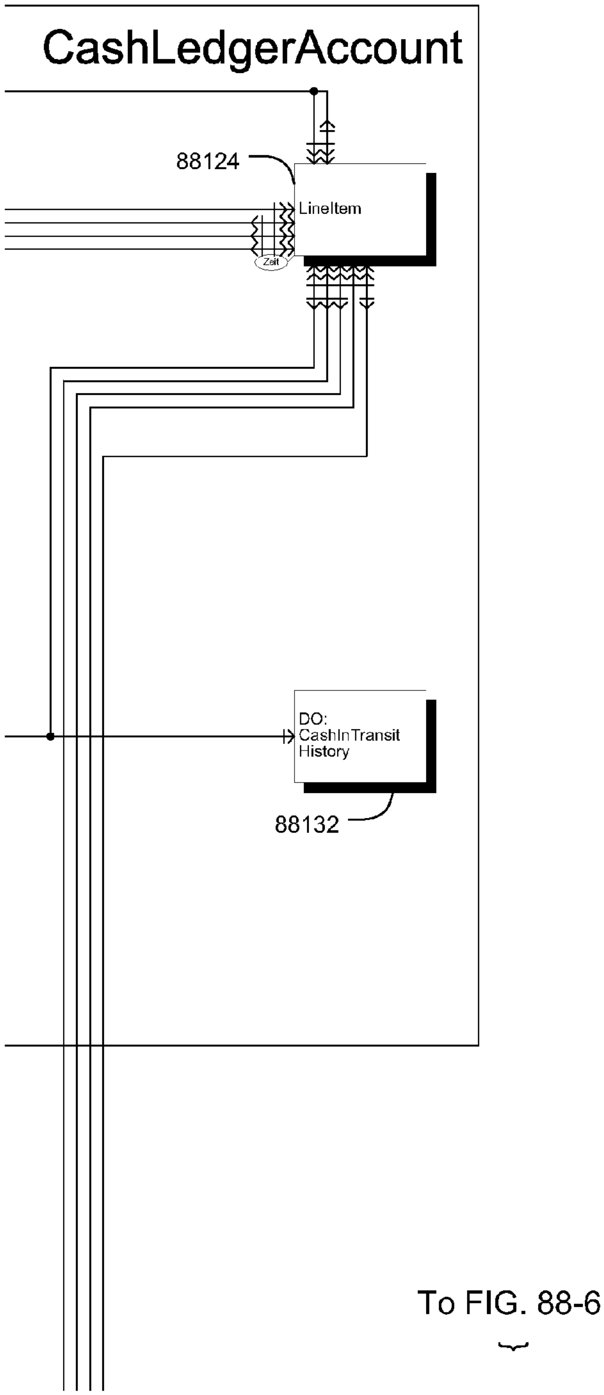
Figures 4, 88:
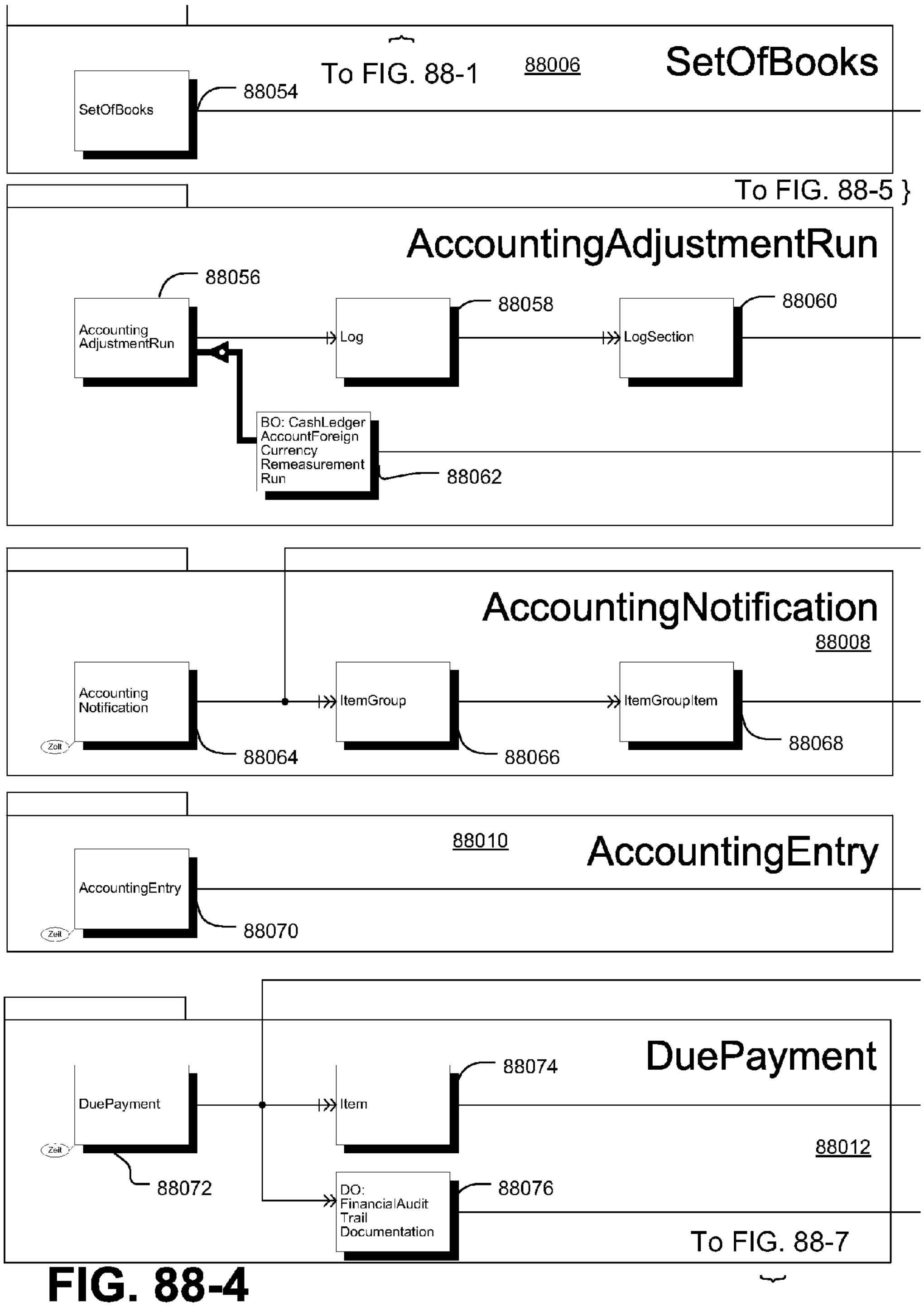
Figures 5, 88:
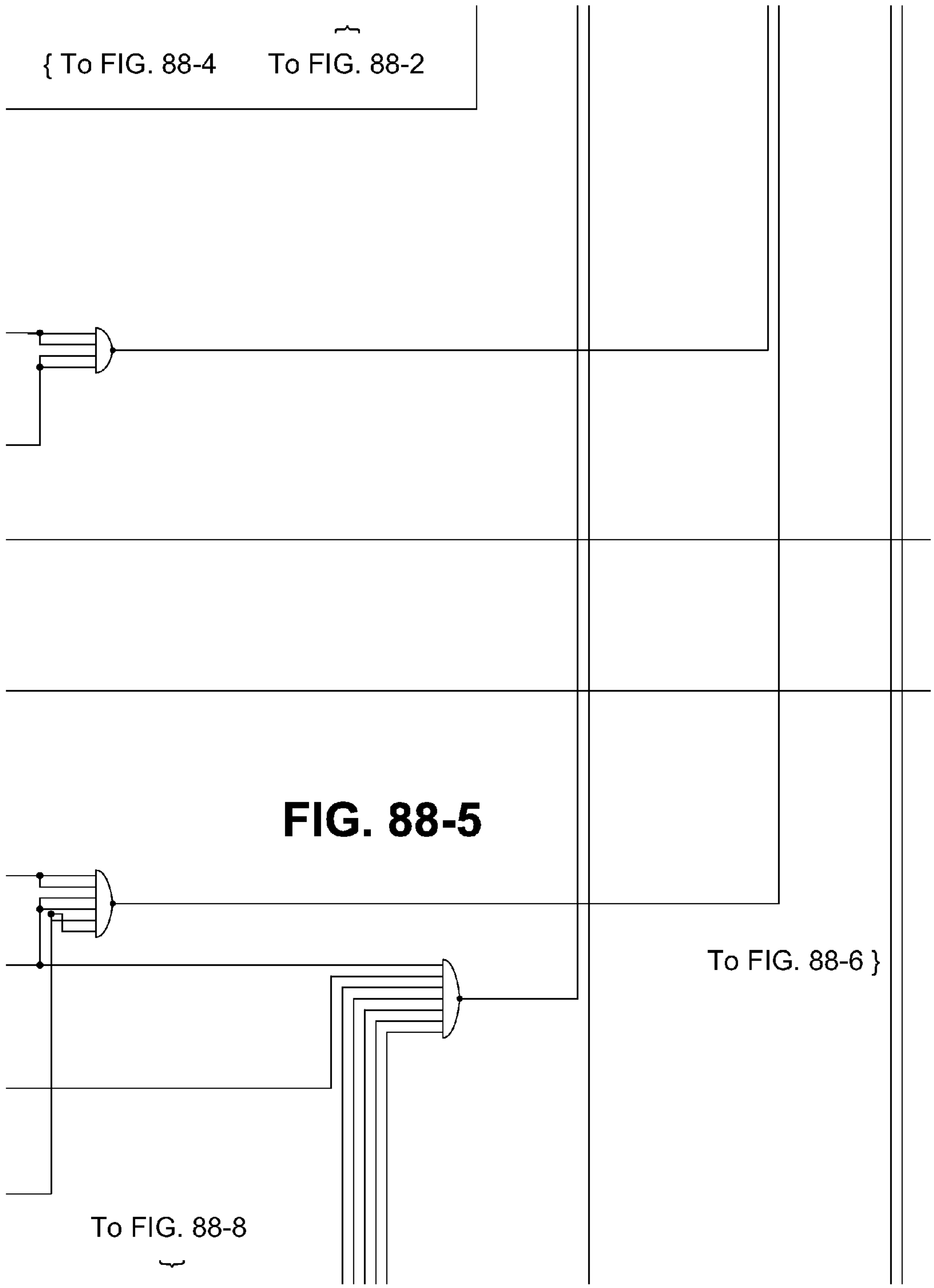
Figures 6, 88:
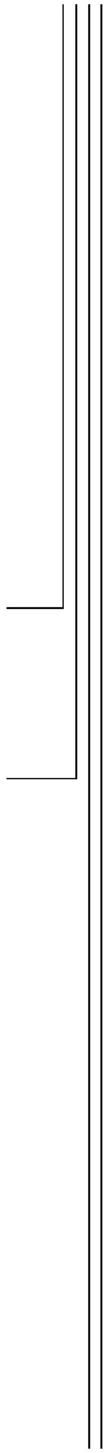
Figures 7, 88:
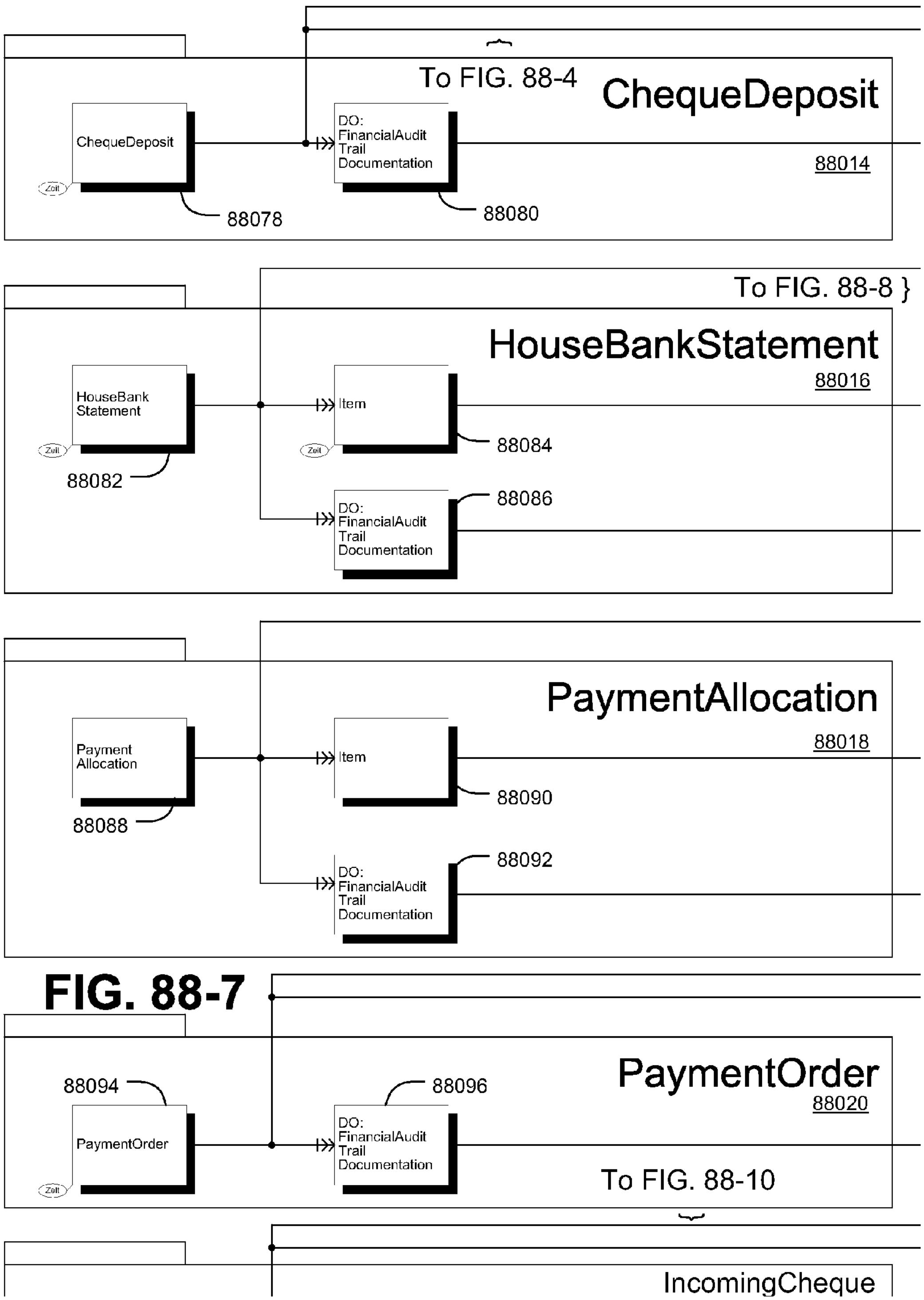
Figures 8, 88:
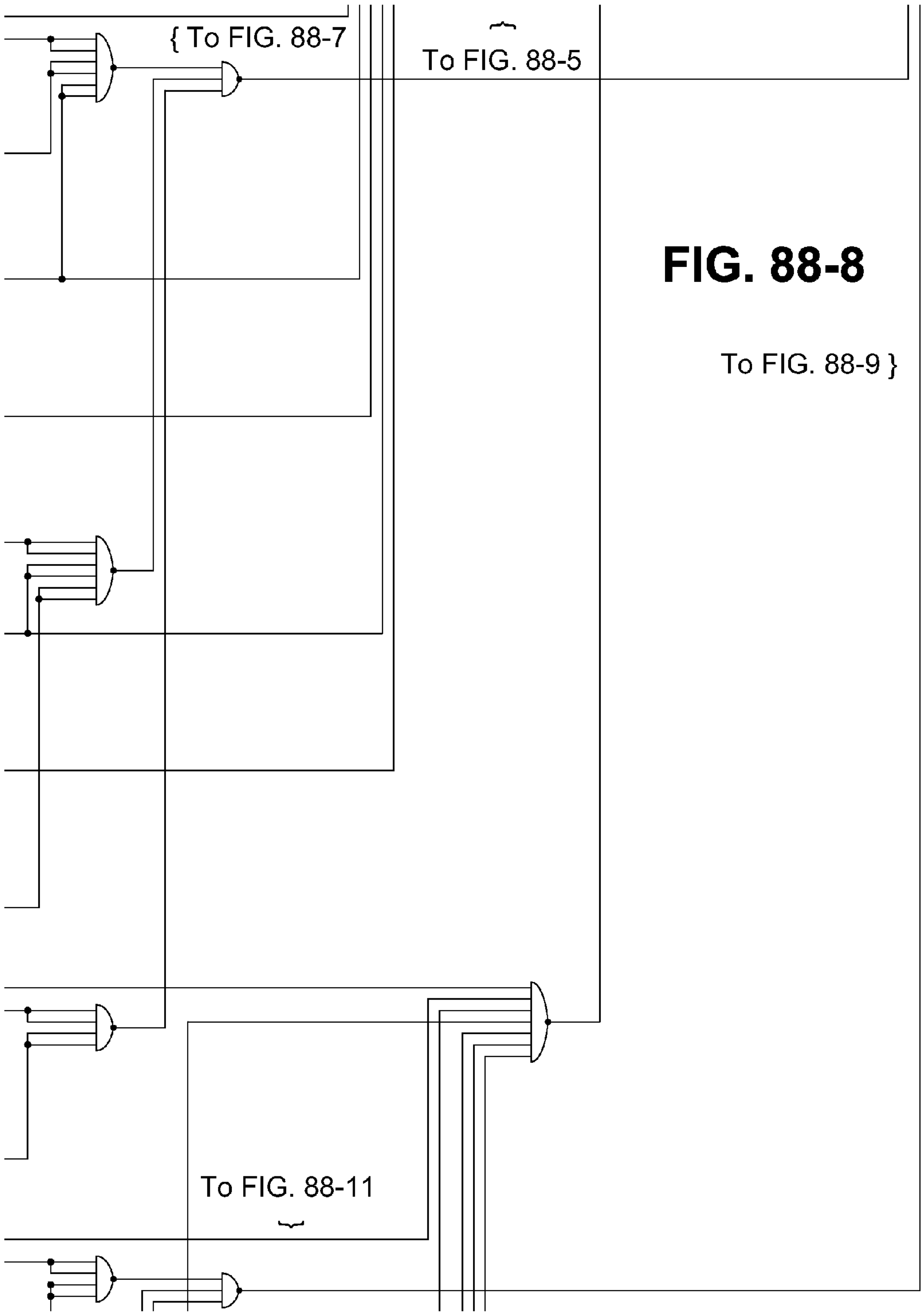
Figures 10, 88:
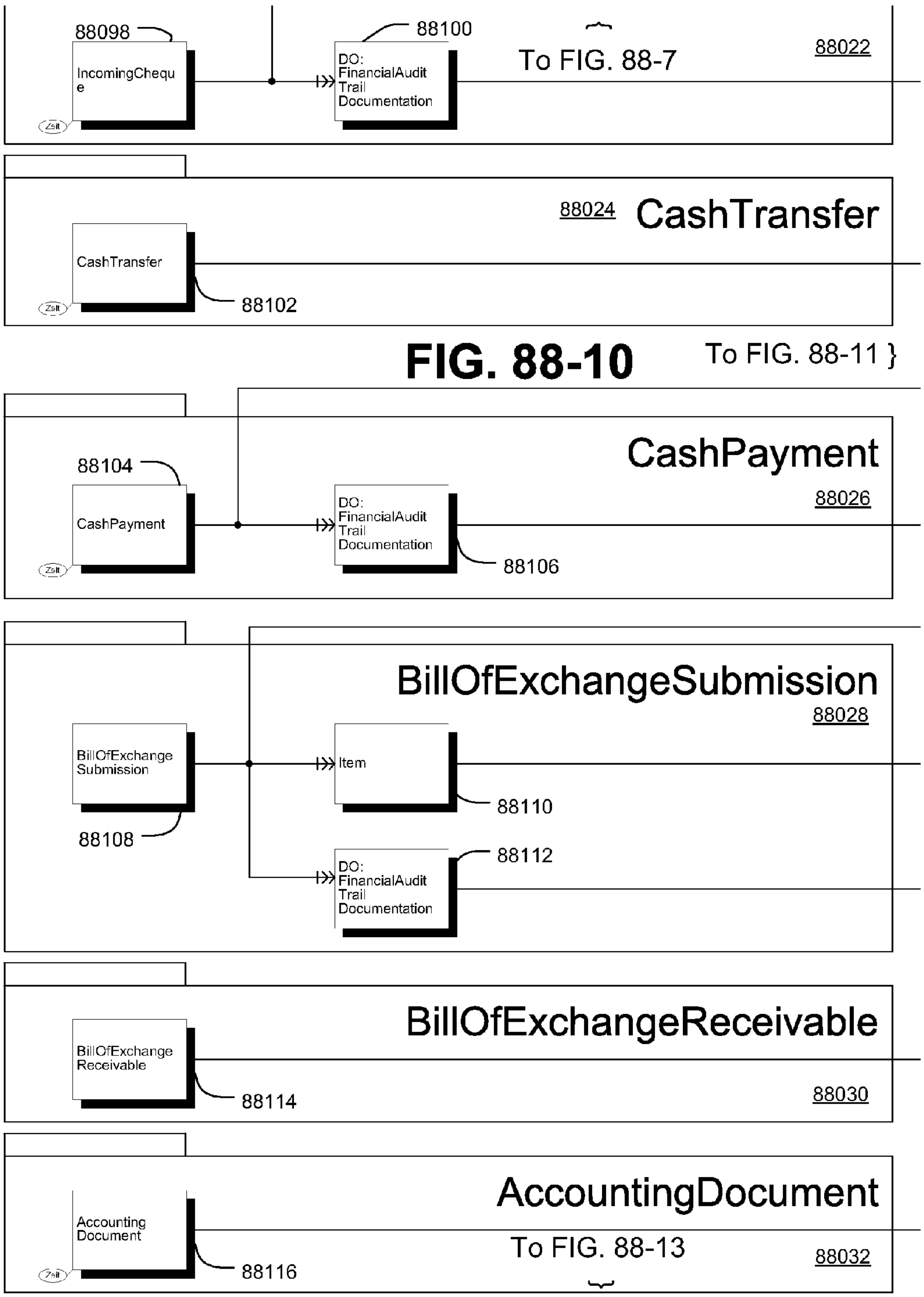
Figures 11, 88:
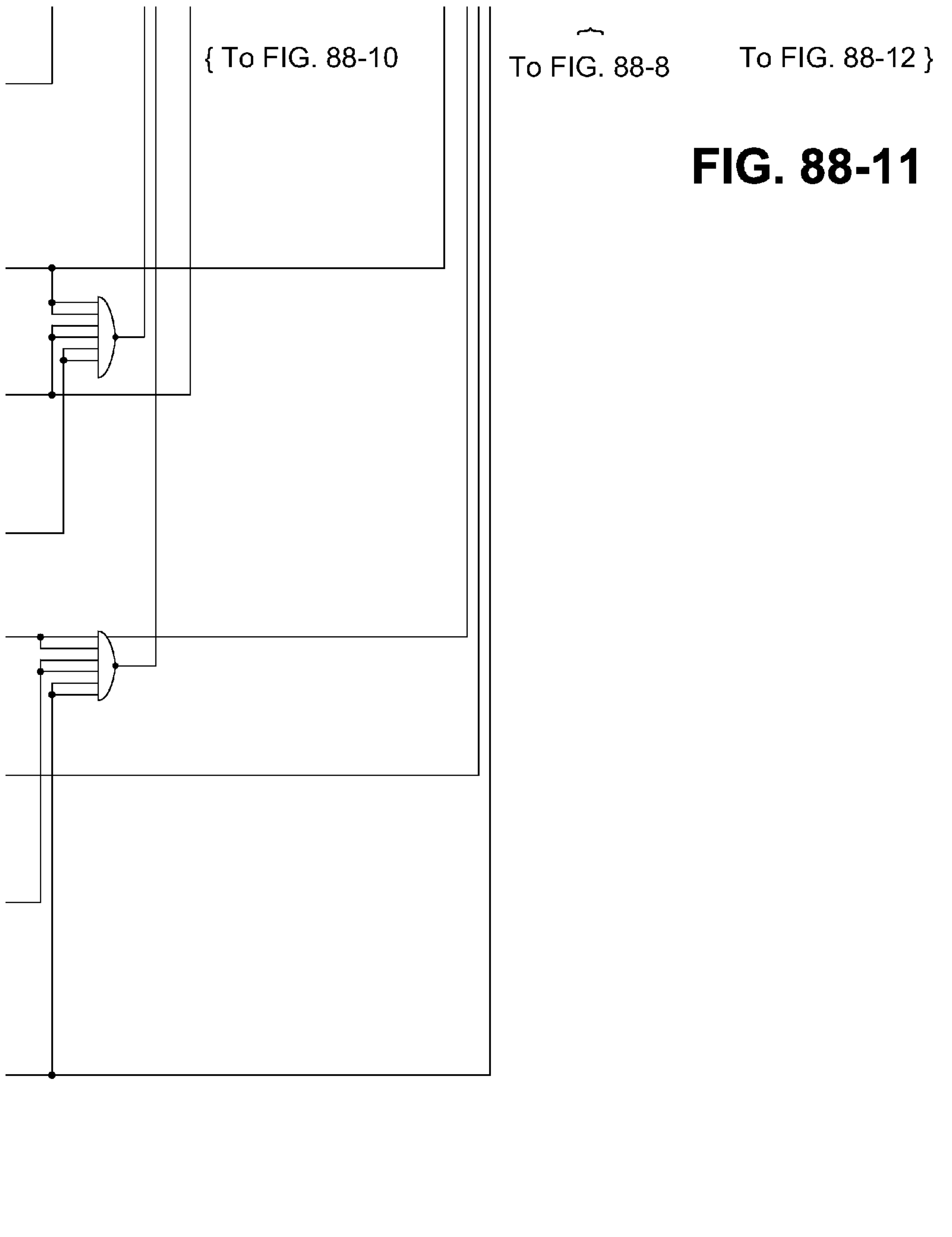
Figures 13, 88:
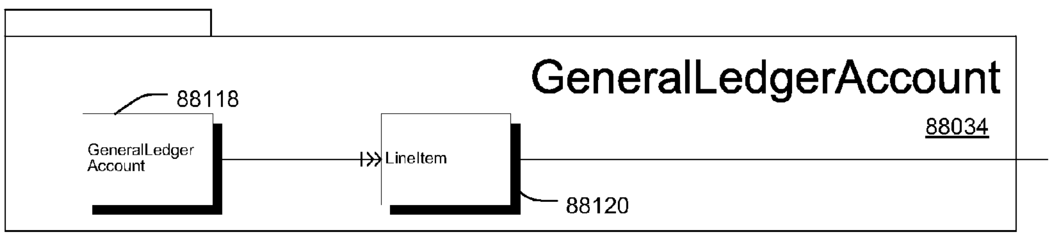

FIGS. 88-1 through 88-9 illustrate an example CashLedgerAccount business object model 88036. Specifically, this model depicts interactions among various hierarchical components of the CashLedgerAccount, as well as external components that interact with the CashLedgerAccount (shown here as 88000 through 88034 and 88038 through 88120).

The Business Object CashLedgerAccount is a record for a company based on the principle of double-entry bookkeeping that reflects the effects of business transactions on a restricted part of the valuated balance for means of payment. CashLedgerAccount serves as a structuring element for collecting and evaluating postings in the cash ledger. CashLedgerAccount contains values that concern the means of payment of a company at a house bank or the cash in the cash fund. Subsequently a generic approach for referencing Operational Documents is used An operational document is a document about a business transaction that takes place in an operational business area outside Financial Accounting. From the Financial Accounting point of view operational documents can be assigned to the categories “Contract”, “Order” and “Confirmation”. The Notification of an Operational Document to Accounting can result in postings (at least all confirmations are posted) and lead to the creation of LineItems. The reference to the operational document in LineItems has a specific semantic and is called Original Entry Document reference. An Original Entry Document is a document that is necessary for auditing purposes and verifies that the value stated in the LineItem of a ledger account has been booked on the base of a real business transaction. Subsequently also a generic approach for referencing Original Entry Documents can be used. An Original Entry Document may be contained in another Object, the Original Entry DocumentContainingObject. Typical such constellations are: FinancialAuditTrailDocumentation contained in a Host object like DuePayment, DueClearing, Dunning, and PaymentAllocation from Operative Financials. LogSection contained in all AccountingAdjustmentRun-MDROs (e.g. InventoryPriceChangeRun, GeneralLedgerAccountBalanceDistributionRun, FixedAssetDepreciationRun, WorkInProcessClearingRun). SettlementResultAccounting contained in an ExpenseReport. PeriodItem contained in an Employee.

The business object CashLedgerAccount is part of the process component Accounting.

A CashLedgerAccount contains the following components: CashInTransit, LineItem, PeriodBalance. CashInTransit is the component CashInTransit is the representation of cash resources in transit during operations (such as cash transfers or check deposits) in Financial Accounting. LineItem keeps a record for an CashLedgerAccount about the value of the change in stock following a business transaction. Furthermore, this component also contains detailed information on a business transaction from the accounting view. PeriodBalance stores information about the value of cash resources for a CashLedgerAccount specific to the relevant accounting period.

CashLedgerAccount can be represented by the node CashLedgerAccount 88122. When a business transaction causing a change to the value of a CashLedgerAccount is posted, a set of rules determines which GeneralLedgerAccounts are concerned. The posting of the business transaction therefore causes a change in value of the same amount in the GeneralLedgerAccounts determined. The record for a company based on the principle of double-entry bookkeeping that reflects the effects of business transactions on a restricted part of the valuated balance for means of payment. It may serve as a structuring element for collecting and evaluating postings in the cash ledger. Contains values that concern the means of payment of a company at a house bank or the cash in the cash fund.

The elements located directly at the node CashLedgerAccount are defined by the type GDT: CashLedgerAccountElements. These elements are: UUID, CompanyUUID, HouseBankUUID, AccountDeterminationHouseBankGroupCode, CashManagementFunctionalUnitUUID, Key. UUID is an universally unique identification of the CashLedgerAccount. TheUUID may be represented by the GDT UUID. CompanyUUID is an universally unique identification of the Company for which the CashLedgerAccount is carried. CompanyUUID may be represented by GDT UUID. HouseBankUUID is an universally unique identification of the house bank that for which the CashLedgerAccount is carried, and is optional. CashLedgerAccount may be represented by GDT UUID. AccountDeterminationHouseBankGroupCode is the element AccountDeterminationHouseBankGroupCode groups together house banks and thereby CashLedgerAccounts to achieve for this group a uniform derivation of accounts in GeneralLedger Accounting. This may be represented by GDT AccountDeterminationHouseBankGroupCode. CashManagementFunctionalUnitUUID is an universally unique identifier of the FunctionalUnit working on the Cash Ledger Account. In some implementations, the FunctionalUnit referenced has to be able to execute the organizational function. Cash Management, (i.e., the element OrganisationalFunctionCode in one of the instances of the node FunctionalUnitAttributes in the FunctionalUnit references may have the value, ‘17’). Cash Management may be represented by GDT UUID. Key is the structured business key of the a CashLedgerAccount. The Key may be represented by GDT CashLedgerAccountKey. The CashLedgerAccountKey consists of the following elements: CompanyUUID, and HouseBankUUI, which is optional.

A number of composition relationships to subordinate nodes can exist, such as CashInTransit 88128 1:cn, LineItem 88124 1:cn, PeriodBalance 88126 1:cn, AccessControlList 88130 1:1. Inbound aggregation relationships can exist from business object BusinessPartner/node HouseBank, such as HouseBank c:cn, which denotes the house bank for which the account is carried. Inbound aggregation relationships can exist from business object OrganisationalCentre/node Company, such as Company 1:cn, which denotes the Company for which the account is carried. Inbound association relationships from business object functional unit/node functional unit can exist, such as FunctionalUnit c:cn, which specifies the Functional Unit which is working on the CashLedgerAccount.

In certain implementations, RemeasureForeignCurrency performs a foreign currency valuation for balances. If valuation differences are determined, new line items are generated for the value of the valuation differences. If valuation differences are determined, a business object AccountingDocument can be generated and used to post the valuation differences. A log is still generated in the business object CashLedgerAccountForeignCurrencyRemeasurementRun.

In certain implementations, the elements for CashLedgerAccountRemeasureForeignCurrencyActionElements may include MassDataRunObjectID, MassDataRunObjectTypeCode, CompanyUUID and SetOfBooksID.

MassDataRunObjectID can be a universally unique identifier for an Accounting Adjustment Run, may be based on GDT: MassDataRunObjectID. MassDataRunObjectTypeCode can be a coded representation of a type of the Mass Data Run Object and may be based on GDT: MassDataRunObjectTypeCode). CompanyUUID can be a universally unique identifier for the company, for which the action is executed. CompanyUUID is transferred only then when processing of the Accounting Adjustment Run is executed per company and set of books and may be based on GDT: UUID. SetOfBooksID can be a Unique identifier for the set of books, for which the action is executed. SetOfBooksID is only transferred when processing of the Accounting Adjustment Run is executed per company and set of books, and may be based on GDT: SetOfBooksID. These elements originate from the mass data run object CashLedgerAccountForeignCurrencyRemeasurementRun. In some implementations, the use of these elements may only be performed by the mass data run object CashLedgerAccountForeignCurrencyRemeasurementRun.

A QueryByElements query provides a list of all CashLedgerAccounts that meet the selection criteria specified by the query elements. Query elements can be defined by the data type CashLedgerAccountElementsQueryElements. These elements can include CompanyID which may be optional, CompanyUUID which may be optional, HouseBankID which may be optional, HouseBankUUID which may be optional, and AccountDeterminationHouseBankGroupCode, which may be optional.

CompanyID may be based on GDT CompanyID. Company UUID may be based on GDT UUID. HouseBankID may be based on GDT BusinessPartnerID. HouseBankUUID may be based on GDT UUID. AccountDeterminationHouseBankGroupCode may be based on GDT AccountDeterminationHouseBankGroupCode.

QueryByForeignCurrencyRemeasurementSetOfBooksID delivers a list of all CashLedgerAccounts that are relevant for foreign currency valuation within a set of books and at the end of an accounting period.

CashLedgerAccounts are relevant for foreign currency valuation if there is a balance on the key date. In some implementations, an additional prerequisite is that the balance currency (PeriodBalanceLineItemCurrencyCode) is different from the local currency or, if available, hard currency, index-based currency, or set of books currency that are updated for the corresponding company within the corresponding set of books. Query elements are defined by the data type CashLedgerAccount may be represented by ForeignCurrencyRemeasurementSetOfBooksIDQueryElements. These elements can include PeriodBalanceSetOfBooksID, PeriodBalanceFiscalYearID, PeriodBalanceAccountingPeriodID, PeriodBalanceChartOfAccountsCode, PeriodBalanceChartofAccountItemsCode, CompanyUUID, HouseBankID, AccountDeterminationHouseBankGroupCode, and PeriodBalanceLineItemCurrencyCode.

In some implementations, PeriodBalanceSetOfBooksId means that one set of books only may be specified. This may be represented by GDT SetOfBooksID. In some implementations, PeriodeBalanceFiscalYearID means that one PeriodeBalanceFiscalYearID only may be specified. This may be represented by GDT FiscalYearID. In some implementations, PeriodeBalanceAccountingPeriodID means that one PeriodeBalanceAccountingPeriodID only may be specified. In some implementations, the CashLedgerAccounts returned are only those containing relevant data for the specified period (PeriodeBalanceFiscalYearID/PeriodeBalanceAccountingPeriodID) and for foreign currency valuation. This may be represented by GDT AccountingPeriodID. PeriodeBalanceChartOfAccountsCode, which is optional, may be represented by GDT ChartOfAccountsCode. PeriodBalanceChartOfAccountsItemCode, which is optional, may be represented by GDT ChartOfAccountsItemCode. CompanyUUID, which is optional, may be represented by GDT UUID. HouseBankID is, on the basis of the HouseBankID specified, the HouseBankUUID that then has to correspond to the element on the node is determined. This may correspond to GDT BusinessPartnerID. The AccountDeterminationHouseBankGroupCode, which is optional, may be based on GDT AccountDeterminationHouseBankGroupCode. PeriodBalanceLineItemCurrencyCode, which is optional, may be based on GDT CurrencyCode. DO: AccessControlList is the is a list of access groups that have access to an CashLedgerAccount.

CashInTransit

CashInTransit is a representation of cash that is in transit during transfer operations that groups together CashLedgerAccountLineItems for settlement purposes (that is, for the purpose of clearing credit and debit entries). The elements located directly at the node CashInTransit are defined by the type GDT CashLedgerAccountCashInTransitElements. These elements can include UUID, OrderReference, OrderItemReference, SubledgerAccountLineItemTypeCode, LineItemCurrencyCode, and Key. UUID is the Universally unique identification of the CashInTransit. UUID may be represented by GDT UUID. OrderReference is a reference to an Operational Document that acts—from the Financial Accounting point of view—as an Order and that is represented by the cash in transit or whose Items are represented by the cash in transit. The life cycle of this operational document or of its items is stated in the LineItems and the CashInTransitHistory of the Cash Ledger Account. OrderReference may be based on ObjectNodeReference. OrderItemReference is a reference to an item of an Operational Document that acts—from the Financial Accounting point of view—as an OrderItem and that is represented by the cash in transit. The life cycle of this operational document item can be stated in the LineItems and the CashInTransitHistory of the Cash Ledger Account, and is optional. OrderItemReference may be based on GDT ObjectNodeReference. SubledgerAccountLineItemTypeCode is the Coded representation of the item category that the cash in transit relates to. SubledgerAccountLineItemTypeCode may be based on GDT SubledgerAccountLineItemTypeCode. LineItemCurrencyCode is the Coded representation of the currency key of the currency in which the cash in transit occurred and in which the assigned line items are consequently updated. LineItemCurrencyCode may be based on GDT CurrencyCode. Key is a structured business key of the CashInTransit. Key may be based on GDT CashledgerAccountCashInTransitKey. In some implementations, the CashLedgerAccountCashInTransitKey consists of the following elements: OrderReference, OrderItemReference, SubledgerAccountLineItemTypeCode.

A CashInTransitHistory 88132 composition relationship with cardinality 1:c to subordinate nodes can exist. A number of inbound aggregation relationships can exist, such as 1) From business object CheckDeposit/node CheckDeposit (Cross DU), CheckDeposit with a cardinality of c:cn, with a CheckDeposit whose items are represented by the cash in transit; 2) From business object PaymentAllocation/node PaymentAllocation (Cross DU), PaymentAllocation with a cardinality of c:cn, with a PaymentAllocation whose items are represented by the cash in transit; 3) From business object PaymentAllocation/node Item (Cross DU), PaymentAllocationItem with a cardinality of c:cn, with an Item in a PaymentAllocation that is represented by the cash in transit; 4) From business object HouseBankStatement/node HouseBankStatement (Cross DU), HouseBankStatement, with a cardinality of c:cn, with a HouseBankStatement whose items are represented by the cash in transit; 5) From business object HouseBankStatement/node Item (Cross DU), HouseBankStatementItem, with a cardinality of c:cn, with an Item in a HouseBankStatement that is represented by the cash in transit; 6) From business object IncomingCheck/node IncomingCheck (Cross DU), IncomingCheck, with a cardinality of c:cn, with an IncomingCheck whose items are represented by the cash in transit; 7) From business object PaymentOrder/node PaymentOrder (Cross DU), PaymentOrder, with a cardinality of c:cn, a PaymentOrder whose items are represented by the cash in transit; 8) From business object BillOfExchangeSubmission/node BillOfExchangeSubmission (Cross DU), BillOfExchangeSubmission, with a cardinality of c:cn, with a BillOfExchangeSubmission whose items are represented by the cash in transit; 9) From business object BillOfExchangeSubmission t/node Item (Cross DU), BillOfExchangeSubmissionItem, with a cardinality of c:cn, with an Item in a BillOfExchangeSubmission that is represented by the cash in transit; 10) From business object CashTransfer/node CashTransfer (Cross DU), CashTransfer, with a cardinality of c:cn, with a CashTransfer whose items are represented by the cash in transit; 11)

From business object CashPayment/node CashPayment (Cross DU), CashPayment, with a cardinality of c:cn, with a CashPayment whose items are represented by the cash in transit; 12)

From business object BillOfExchangeReceivable/node BillOfExchangeReceivable (Cross DU), BillOfExchangeReceivable, with a cardinality of c:cn, with a BillOfExchangeReceivable whose items are represented by the cash in transit; 13) From business object DuePayment/node DuePayment (Cross DU), DuePayment, with a cardinality of c:cn, with a DuePayment whose items are represented by the cash in transit; and 14) From business object DuePayment/node Item (Cross DU), DuePaymentItem, with a cardinality of c:cn, with an Item in a DuePayment that is represented by the cash in transit. In some implementations, an integrity condition can exist such that one and only one of the above relationships to an OrderOperationalDocument and to an OrderOperationalDocumentItem may exist.

CashInTransitHistory (DO)

CashInTransitHistory is a History of a CashInTransit. The node CashInTransitHistory is represented by the Dependent Object Accounting Clearing Object History.

LineItem

LineItem is a Line item that serves as a records about the value of the change in stock following a single business transaction. The line item refers to a CashLedgerAccount for a set of books. A set of books is a complete, self-contained, and consistent body of accounting records. For a set of books: "Complete" means that all postings and relevant information for all items in the financial statements are contained in the set of books. "Self-contained" means that no external reference to other posted information in accounting is needed to explain the content of a set of books. "Consistent" means that the posted data in a set of books is comparable both structurally (fiscal year variant, currency, chart of accounts) and semantically (that is, according to a set of accounting rules, other rules, or assumptions). The set of books supports the integration of the general ledger with the subledgers. It also supports cost accounting and profitability analysis. The subledgers, cost accounting, and profitability analysis may be known to the set of books, and all documents may be assigned to a single set of books.

The elements located directly at the LineItem node are defined by the type GDT: CashLedgerAccountLineItemElements. These elements can include UUID, SetofBooksID, SegmentUUID, ProfitCentreUUID, PartnerCompanyUUID, PartnerSegmentUUID, PartnerProfitCentreUUID, AccountingDocumentUUID, AccountingDocumentID, AccountingDocumentItemID, OriginalEntryDocumentContainingObjectReference, OriginalEntryTransactionUUID, OriginalEntryDocumentReference, OriginalEntryDocumentItemReference, OriginalEntryDocumentItemTypeCode, OriginalEntryDocumentPartnerID, AccountingNotificationUUID, AccountingNotificationItemGroupItemUUID, GeneralLedgerAccountLineItemUUID, GeneralLedgerAccountLineItemAccountingDocumentItemGroupID, CashInTransitUUID, SystemAdministrativeData, ChartOfAccountsCode, ChartOfAccountsItemCode, AccountingBusinessTransactionTypeCode, TypeCode, PaymentRegisterItemTypeCode, PaymentFormCode, AccountingDocumentTypeCode, AccountingDocumentNote, AccountingDocumentItemNote, PostingDate, OriginalEntryDocumentDate, AccountingBusinessTransactionDate, CurrencyConversionDate, FiscalYearVariantCode, FiscalYearID, AccountingPeriodID, AccountingClosingStepCode, AccountingDocumentItemAccountingGroupID, AccountingDocumentItemAccountingGroupID, GeneralLedgerMovementTypeCode, DebitCreditCode, CancellationDocumentIndicator, CancellationOriginalEntryDocumentContainingBusinessObjectReference, CancellationOriginalEntryDocumentReference, CancellationOriginalEntryDocumentTransactionUUID, CancelledIndicator, BusinessTransactionCurrencyAmount, LineItemCurrencyAmount, LocalCurrencyAmount, SetOfBooksCurrencyAmount, HardCurrencyAmount, and IndexBasedCurrencyAmount.

UUID is a universal identification of the LineItem, which can be unique. UUID may be based on GDT UUID. SetOfBooksID is an identifier for the set of books to which the line item relates, which can be unique. SetOfBooksID may be based on GDT SetOfBooksID. SegmentUUID is a universal identification of the Segment to which the value and quantity of the LineItem is/are allocated, which can be unique. SegmentUUID may be based on GDT UUID. ProfitCentreUUID is an universal identification of the ProfitCentre to which the value and quantity of the LineItem is/are allocated, which can be unique. ProfitCentreUUID may be based on GDT UUID. PartnerCompanyUUID is a universal identification of a Company that acts in the business transaction stated in the LineItem as an intra corporate partner, which can be unique. PartnerCompanyUUID may be based on GDT UUID. PartnerSegmentUUID is a universal identification, which can be unique, of a Segment that acts in the business transaction stated in the LineItem as an intra corporate partner, and is optional. PartnerSegmentUUID may be based on GDT UUID. PartnerProfitCentreUUID is a universal identification, which may be unique, of a ProfitCentre that acts in the business transaction stated in the LineItem as an intra corporate partner, and is optional. PartnerProfitCentreUUID may be based on GDT UUID. AccountingDocumentUUID is a universal identification of the AccountingDocument that records the entire business transaction in Accounting, and may be unique. PartnerProfitCentreUUID may be based on GDT UUID. AccountingDocumentID is an identification of the AccountingDocument that records the entire business transaction in Accounting, and may be unique. AccountingDocumentID may be based on GDT BusinessTransactionDocumentID.

AccountingDocumentItemID is an identification of the corresponding AccountingDocumentItem in the AccountingDocument which records the value change according to the criteria of GeneralLedger, which may be unique. AccountingDocumentItemID may be based on GDT BusinessTransactionDocumentItemID. OriginalEntryDocumentContainingObjectReference is a reference to an Object containing the Original Entry Document. OriginalEntryDocumentContainingObjectReference may be based on GDT ObjectNodeReference and Qualifier: OriginalEntryDocumentContaining. OriginalEntryTransactionUUID is a universal identifier of the transaction during which the Original Entry Document was created or changed, and may be unique. OriginalEntryTransactionUUID may be based on GDT UUID. OriginalEntryDocumentReference is a reference to the document, that keeps the original entry of the business transaction. OriginalEntryDocumentReference may be based on GDT ObjectNodeReference. OriginalEntryDocumentItemReference is a reference to an item of the OriginalEntryDocument. The value change recorded in the CashLedgerAccountItem can be verified by that item of the OriginalEntryDocument. OriginalEntryDocumentReference may be based on GDT ObjectNodeReference. OriginalEntryDocumentItemTypeCode is a coded representation of the Item Type of the referred OriginalEntryDocumentItem, and is optional. OriginalEntryDocumentItemTypeCode may be based on GDT BusinessTransactionDocumentItemTypeCode. In some implementations, OriginalEntryDocumentItemTypeCode can be used only if the Original Entry Document is a Business Transaction Document.

OriginalEntryDocumentPartnerID is an identification of the Original Entry Document as assigned by the business partner. (e.g., the ID of the Supplier Invoice assigned by the Supplier). OriginalEntryDocumentPartnerID may be based on GDT BusinessTransactionDocumentID. In some implementations, OriginalEntryDocumentPartnerID can be used only if the Original Entry Document is a Business Transaction Document and if the Original Entry Document is identical to the Original Entry Document Containing Object. AccountingNotificationUUID is a universal identification, which may be unique, of the notification sent to Financial Accounting about the business transaction stated in the LineItem, and is optional. The AccountingNotificationUUID may be based on the UUID. AccountingNotificationItemGroupItemUUID is an universal identification of the Accounting Notification Item Group Item, which triggered the posting of this CashLedgerAccountItem, and may be unique. AccountingNotificationItemGroupItemUUID may be based on GDT UUID. GeneralLedgerAccountLineItemUUID is an universal identification of a LineItem of a GeneralLedgerAccount that records the value change of the CashLedgerAccountLineItem in the GeneralLedger, and may be unique. GeneralLedgerAccountLineItemUUID may be based on GDT UUID. GeneralLedgerAccountLineItemAccountingDocumentItemGroupID is a universal identification of the group of all AccountingDocumentItems that are summarized together in a GeneralLedgerAccountLineItem, and may be unique. The LineItem corresponds to exactly one AccountingDocumentItem belonging to the group. GeneralLedgerAccountLineItemAccountingDocumentItemGroupID may be based on GDT BusinessTransactionDocumentItemGroupID. CashInTransitUUID is a universal identification of the cash in transit that the line item relates to, which may be unique. CashInTransitUUID may be based on GDT UUID. SystemAdministrativeData is an administrative data stored in a system. This data includes the system user and change time. SystemAdministrativeData may be based on GDT systemAdministrativeData. ChartOfAccountsCode is a coded representation of the ChartOfAccounts containing the ChartOfAccountsItem that classifies—for general ledger accounting purposes—the value stated in the LineItem. ChartOfAccountsCode may be based on GDT ChartOfAccountsCode. ChartOfAccountsItemCode is a coded representation of a ChartOfAccountsItem that classifies—for general ledger accounting purposes—the value stated in the LineItem. ChartOfAccountsItem may be represented by GDT ChartOfAccountsItemCode.

AccountingBusinessTransactionTypeCode is a coded representation of the type of the business transaction stated in the CashLedgerAccountLineItem. It classifies the business transaction according to Accounting criteria. AccountingBusinessTransactionTypeCode may be represented by GDT AccountingBusinessTransactionTypeCode. TypeCode is a coded representation of the type of the LineItem. TypeCode may be represented by GDT SubledgerAccountLineItemTypeCode. PaymentRegisterItemTypeCode is a coded representation of the type of a payment register item, transferred from the payment process to document the transaction in the AccountingLineItem. PaymentRegisterItemTypeCode may be represented by GDT PaymentRegisterItemTypeCode. PaymentFormCode is a coded representation of the form of payment, transferred from the payment process to document the transaction in the AccountingLineItem. PaymentFormCode may be represented by GDT PaymentFormCode. AccountingDocumentTypeCode is a coded representation of the type of the AccountingDocument to which the LineItem refers by the AccountingDocumentReference. AccountingDocumentTypeCode may be represented by GDT AccountingDocumentTypeCode. AccountingDocumentNote is a natural-language comment that applies the AccountingDocument—referred via the AccountingDocumentReference—as a whole rather than to individual items, and is optional. AccountingDocumentReference may be based on GDT SHORT_Note. AccountingDocumentItemNote is a natural-language comment pertaining to the AccountingDocumentItem to which the LineItem refers by the AccountingDocumentReference, and is optional. AccountingDocumentItemNote may be based on GDT SHORT_Note. PostingDate is the date with which the business transaction is effectively recorded in Accounting, and effectively means that period totals and balances in accounting are updated with this date. PostingDate may be based on GDT Date, Qualifier Posting.

OriginalEntryDocumentDate is the issue date of the Original Entry Document. OriginalEntryDocumentDate may be represented by GDT Date and Qualifier: OriginalEntryDocument. AccountingBusinessTransactionDate is the date at which the business transaction took place applying the criteria of Accounting. AccountingBusinessTransactionDate may be based on GDT: Date and Qualifier: BusinessTransaction. CurrencyConversionDate is the date that is used for the currency translation applied to amounts in the accounting document. CurrencyConversionDate may be represented by GDT Date and Qualifier: CurrencyConversion. FiscalYearVariantCode is the coded representation of the FiscalYearVariant according to whose fiscal year definition (begin, end, period definition) the FiscalYearID and the AccountingPeriodID are derived. FiscalYearVariantCode may be represented by GDT FiscalYearVariantCode. FiscalYearID is the identification of the fiscal year in which the LineItem is posted. FiscalYearID may be based on GDT FiscalYearID. AccountingPeriodID is the identification of the accounting period in which the LineItem is posted. AccountingPeriodID may be based on the GDT AccountingPeriodID. AccountingClosingStepCode is a coded representation of the closing step of the accounting document, and is optional. AccountingClosingStepCode may be represented by GDT AccountingClosingStepCode. AccountingDocumentItemAccountingGroupID is an identification of a group of AccountingDocumentItems belonging together applying the criteria of Accounting, which may be unique. It is used to indicate the items of an AccountingDocument that belong together, for example, in partial zero-balance checking within the Accounting Document. AccountingDocumentItemAccountingGroupID may be based on GDT BusinessTransactionDocumentItemGroupID.

GeneralLedgerMovementTypeCode is a coded representation of the type of movement with which the value change is recorded for GeneralLedger purposes in the GeneralLedgerAccount, and is optional. GeneralLedgerMovementTypeCode may be based on GDT GeneralLedgerMovementTypeCode. DebitCreditCode is a coded representation of debit or credit. It specifies whether the line item is assigned to the debit or credit side of the GeneralLedger account. DebitCreditCode may be based on GDT DebitCreditCode. CancellationDocumentIndicator indicates whether the AccountingDocument to which the LineItem refers by the AccountingDocumentReference refers to a Cancellation Original Entry Document, and is optional. CancellationDocumentIndicator may be based on GDT Indicator and Qualifier: CancellationDocument. CancellationOriginalEntryDocumentContainingBusinessObjectReference is a reference to the Business Object containing the OriginalEntryDocument that cancelled this LineItem, and is optional. CancellationOriginalEntryDocumentContainingBusinessObjectReference may be based on GDT ObjectNodeReference and Qualifier: CancellationOriginalEntryDocumentContaining. CancellationOriginalEntryDocumentReference is a reference to the OriginalEntryDocument, that cancelled this Item. CancellationOriginalEntryDocumentReference may be based on GDT ObjectNodeReference and Qualifier: Cancellation. CancellationOriginalEntryDocumentTransactionUUID is a universal identifier, which may be optional, of the transaction during which the CancellationOriginalEntryDocument was created or changed. CancellationOriginalEntryDocumentTransactionUUID may be based on GDT UUID. CancelledIndicator indicates if the line item has been cancelled. CancelledIndicator may be based on GDT Indicator and Qualifier: Cancelled. BusinessTransactionCurrencyAmount is the value of the LineItem in transaction currency, and is optional. The transaction currency is the currency agreed on by two business partners for their business relationship. BusinessTransactionCurrencyAmount may be based on GDT Amount and Qualifier: BusinessTransactionCurrency. LineItemCurrencyAmount is the value of the LineItem in LineItem currency. LineItemCurrencyAmount may be based on GDT Amount. LocalCurrencyAmount is the value of the LineItem in the local currency of the Company carrying the account. The local currency is the currency in which the local books are kept. LocalCurrencyAmount may be based on GDT Amount.

SetOfBooksCurrencyAmount is the value of the LineItem in the currency selected for the set of books. SetOfBooksCurrencyAmount may be based on GDT Amount. HardCurrencyAmount is the value of the LineItem, in the hard currency of the country of the Company carrying the account, and is optional. The hard currency is a stable, country-specific currency that is used in high-inflation countries.

HardCurrencyAmount may be based on GDT Amount. IndexBasedCurrencyAmount is the value of the LineItem in the index-based currency of the country of the Company carrying the account, and is optional. The index-based currency is a fictitious, country-specific currency that is used in high-inflation countries as a comparison currency for reporting. IndexBasedCurrencyAmount may be based on GDT Amount.

A number of inbound aggregation relationships can exist, such as 1) From business object SetOfBooks/node SetOfBooks, SetOfBooks, with cardinality 1:cn, the SetOfBooks according to whose specifications the LineItem was created; 2) From business object Company/node Company, Partner Company, with cardinality c:cn, a company that acts in the business transaction stated in the LineItem as an intra corporate partner; 3) From business object Segment/node Segment, Segment, with cardinality c:cn, a segment to which the value and quantity of the LineItem are allocated; 4) PartnerSegment, with cardinality c:cn, a Segment that acts in the business transaction stated in the LineItem as an intra corporate Partner.company's point of view; 5) From business object ProfitCentre/node ProfitCentre, ProfitCentre, with cardinality c:cn, a ProfitCentre to which the value and quantity of the LineItem are allocated; and 6) PartnerProfitCentre, with cardinality c:cn, a ProfitCentre that acts in the business transaction stated in the LineItem as an intra corporate partner.

In some implementations, an integrity condition can exist such that one and only one of the relationships below to an Original Entry Document and to an Original EntryDocument Item may exist. In some implementations, if the Original Entry Document is not identical to a Business Object but contained in it then the corresponding relationship to this Business Object may exist, too.

Additional inbound aggregation relationships can exist, such as 1) AccountingEntry, with cardinality c:cn, an accounting entry that keeps the original entry of the business transaction stated in the LineItem; 2) From business object CheckDeposit/node CheckDeposit (Cross DU), CheckDeposit, with cardinality c:cn, a reference to the CheckDeposit that contains the Original Entry Document; 3) From business object CheckDeposit/node FinancialAuditTrailDocumentation (Cross DU), CheckDepositFinancialAuditTrailDocumentation, with cardinality c:cn, a reference to a FinancialAuditTrailDocumentation that serves as Original Entry Document for a business transaction in a CheckDeposit; 4) From business object CheckDeposit/node FinancialAuditTrailDocumentationPaymentRegisterItem (Cross DU), CheckDepositFinancialAuditTrailDocumentationPaymentRegisterItem, with cardinality c:cn, a PaymentRegisterItem in a FinancialAuditTrailDocumentation serving as Original Entry Document Item by which the value change recorded in the LineItem can be verified; 5) From business object PaymentAllocation/node PaymentAllocation (Cross DU), PaymentAllocation, with cardinality c:cn, a reference to the PaymentAllocation that contains the Original Entry Document; 6) From business object PaymentAllocation/node FinancialAuditTrailDocumentation, PaymentAllocationFinancialAuditTrailDocumentation, with cardinality c:cn, a reference to a FinancialAuditTrailDocumentation that serves as Original Entry Document for a business transaction in a PaymentAllocation; 7) From business object PaymentAllocation/node, FinancialAuditTrailDocumentationPaymentRegisterAllocationItem (Cross DU), PaymentAllocationFinancialAuditTrailDocumentationPaymentRegisterAllocationItem, with cardinality c:cn, a PaymentRegisterAllocationItem in a FinancialAuditTrailDocumentation serving as Original Entry Document Item by which the value change recorded in the LineItem can be verified; 8) From business object HouseBankStatement/node HouseBankStatement (Cross DU), HouseBankStatement, with cardinality c:cn, a reference to the HouseBankStatement that contains the Original Entry Document; 9) From business object HouseBankStatement/node FinancialAuditTrailDocumentation (Cross DU), HouseBankStatementFinancialAuditTrailDocumentation, with cardinality c:cn, a reference to a FinancialAuditTrailDocumentation that serves as Original Entry Document for a business transaction in a HouseBankStatement; 10) From business object HouseBankStatement/node FinancialAuditTrailDocumentationPaymentRegisterItem (Cross DU), HouseBankStatementFinancialAuditTrailDocumentationPaymentRegister Item, with cardinality c:cn, a PaymentRegisterItem in a FinancialAuditTrailDocumentation serving as Original Entry Document Item by which the value change recorded in the LineItem can be verified; 11) From business object IncomingCheck/node IncomingCheck (Cross DU), IncomingCheck, with cardinality c:cn, a reference to the IncomingCheck that contains the Original Entry Document; 12) From business object IncomingCheck/node FinancialAuditTrailDocumentation (Cross DU), IncomingCheck FinancialAuditTrailDocumentation, with cardinality c:cn, a reference to a FinancialAuditTrailDocumentation that serves as Original Entry Document for a business transaction in a IncomingCheck; 13) From business object IncomingCheck/node FinancialAuditTrailDocumentationPaymentRegisterItem (Cross DU), IncomingCheckFinancialAuditTrailDocumentationPaymentRegisterItem, with cardinality c:cn, a PaymentRegisterItem in a FinancialAuditTrailDocumentation serving as Original Entry Document Item by which the value change recorded in the LineItem can be verified; 14) From business object PaymentOrder/node PaymentOrder (Cross DU), PaymentOrder, with a cardinality of c:cn, a reference to the PaymentOrder that contains the Original Entry Document; 15) From business object PaymentOrder/node FinancialAuditTrailDocumentation (Cross DU), PaymentOrderFinancialAuditTrailDocumentation, with a cardinality of c:cn, a reference to a FinancialAuditTrailDocumentation that serves as Original Entry Document for a business transaction in a PaymentOrder; 16) From business object PaymentOrder/node FinancialAuditTrailDocumentationPaymentRegisterItem (Cross DU), PaymentOrderFinancialAuditTrailDocumentationPaymentRegisterItem, with a cardinality of c:cn, a PaymentRegisterItem in a FinancialAuditTrailDocumentation serving as Original Entry Document Item by which the value change recorded in the LineItem can be verified; 17) From business object BillOfExchangeSubmission/node BillOfExchangeSubmission (Cross DU), BillOfExchangeSubmission, with a cardinality of c:cn, a reference to the BillOfExchangeSubmission that contains the Original Entry Document; 18) From business object BillOfExchangeSubmission/node FinancialAuditTrailDocumentation (Cross DU), BillOfExchangeSubmissionFinancialAuditTrailDocumentation, with a cardinality of c:cn, a reference to a FinancialAuditTrailDocumentation that serves as Original Entry Document for a business transaction in a BillOfExchangeSubmission; 19) From business object BillOfExchangeSubmission/node FinancialAuditTrailDocumentationPaymentRegisterItem (Cross DU), BillOfExchangeSubmissionFinancialAuditTrailDocumentationPaymentRegisterItem, with a cardinality of c:cn, a PaymentRegisterItem in a FinancialAuditTrailDocumentation serving as Original Entry Document Item by which the value change recorded in the LineItem can be verified; 20) From business object CashTransfer/node CashTransfer (Cross DU), CashTransfer, with a cardinality of c:cn, a reference to the CashTransfer that contains the Original Entry Document; 21)

From business object CashTransfer/node FinancialAuditTrailDocumentation (Cross DU), CashTransferFinancialAuditTrailDocumentation, with a cardinality of c:cn, a reference to a FinancialAuditTrailDocumentation that serves as Original Entry Document for a business transaction in a CashTransfer; 22) From business object CashTransfer/node FinancialAuditTrailDocumentationPaymentRegisterItem (Cross DU), CashTransferFinancialAuditTrailDocumentationPaymentRegisterItem, with a cardinality of c:cn, a PaymentRegisterItem in a FinancialAuditTrailDocumentation serving as Original Entry Document Item by which the value change recorded in the LineItem can be verified; 23) From business object CashPayment/node CashPayment (Cross DU), CashPayment, with a cardinality of c:cn, a reference to the CashPayment that contains the Original Entry Document; 24) From business object CashPayment/node FinancialAuditTrailDocumentation (Cross DU), CashPayment FinancialAuditTrailDocumentation, with a cardinality of c:cn, a reference to a FinancialAuditTrailDocumentation that serves as Original Entry Document for a business transaction in a CashPayment; 25) From business object CashPayment/node FinancialAuditTrailDocumentationPaymentRegisterItem (Cross DU), CashPaymentFinancialAuditTrailDocumentationPaymentRegisterItem, with a cardinality of c:cn, a PaymentRegisterItem in a FinancialAuditTrailDocumentation serving as Original Entry Document Item by which the value change recorded in the LineItem can be verified; 26) From business object BillOfExchangeReceivable/node BillOfExchangeReceivable (Cross DU), BillOfExchangeReceivable, with a cardinality of c:cn, a reference to the BillOfExchangeReceivable that contains the Original Entry Document; 27) From business object BillOfExchangeReceivable/node FinancialAuditTrailDocumentation (Cross DU), BillOfExchangeReceivable FinancialAuditTrailDocumentation, with a cardinality of c:cn, a reference to a FinancialAuditTrailDocumentation that serves as Original Entry Document for a business transaction in a BillOfExchangeReceivable; 28) From business object BillOfExchangeReceivable/node FinancialAuditTrailDocumentationPaymentRegisterItem (Cross DU), BillOfExchangeReceivableFinancialAuditTrailDocumentationPayment RegisterItem, with a cardinality of c:cn, a PaymentRegisterItem in a FinancialAuditTrailDocumentation serving as Original Entry Document Item by which the value change recorded in the LineItem can be verified; 29) From business object DuePayment/node DuePayment (Cross DU), DuePayment, with a cardinality of c:cn, a reference to the DuePayment that contains the Original Entry Document; 30)

From business object DuePayment/node FinancialAuditTrailDocumentation (Cross DU), DuePaymentFinancialAuditTrailDocumentation, with a cardinality of c:cn, a reference to a FinancialAuditTrailDocumentation that serves as Original Entry Document for a business transaction in a DuePayment; 31) From business object DuePayment/node FinancialAuditTrailDocumentationPaymentRegisterItem (Cross DU), DuePaymentFinancialAuditTrailDocumentationPaymentRegisterItem, with a cardinality of c:cn, a PaymentRegisterItem in a FinancialAuditTrailDocumentation serving as Original Entry Document Item by which the value change recorded in the LineItem can be verified; 32) From MDRO CashLedgerAccountForeignCurrencyRemeasurementRun/node Root, CashLedgerAccountForeignCurrencyRemeasurementRun, with a cardinality of c:cn, a reference to the CashLedgerAccountForeignCurrencyRemeasurementRun that contains the Original Entry Document; 33)

From MDRO CashLedgerAccountForeignCurrencyRemeasurementRun/node LogSection, CashLedgerAccountForeignCurrencyRemeasurementRunLogSection, with a cardinality of c:cn, a reference to a LogSection that serves as Original Entry Document for a business transaction CashLedgerAccountForeignCurrencyRemeasurementRun; and 34) From MDRO CashLedgerAccountForeignCurrencyRemeasurementRun/node LogSectionCashLedgerAccountForeignCurrencyRemeasurementRemeasuredBalance, CashLedgerAccountForeignCurrencyRemeasurementRunLogSectionItem, with a cardinality of c:cn, a CashLedgerAccountForeignCurrencyRemeasurementRemeasuredBalance in a LogSection of an CashLedgerAccountForeignCurrencyRemeasurementRun serving as Original Entry Document Item by which the value change recorded in the LineItem can be verified.

In some implementations, an integrity condition can exist such that one and only one of the relationships below to an Cancellation Original Entry Document and to an Cancellation Original EntryDocument Item may exist. In some implementations, if the Cancellation Original Entry Document is not identical to a Business Object but contained in it then the corresponding relationship to this Business Object may exist, also.

Additional inbound aggregation relationships can exist, such as 1) CancellationAccountingEntry, with a cardinality of c:cn, an accounting entry that keeps the original entry of the business transaction for the cancellation of this LineItem; 2) From business object CheckDeposit/node CheckDeposit (Cross DU), CancellationCheckDeposit, with a cardinality of c:cn, a reference to the CheckDeposit that contains the Original Entry Document for the cancellation of this LineItem; 3) From business object CheckDeposit/node FinancialAuditTrailDocumentation (Cross DU), CancellationCheckDepositFinancialAuditTrailDocumentation, with a cardinality of c:cn, a reference to a FinancialAuditTrailDocumentation in a CheckDeposit which serves as Original Entry Document for the cancellation of this LineItem; 4) From business object PaymentAllocation/node PaymentAllocation (Cross DU), CancellationPaymentAllocation, with a cardinality of c:cn, a reference to the PaymentAllocation that contains the Original Entry Document for the cancellation of this LineItem; 5)

From business object PaymentAllocation/node FinancialAuditTrailDocumentation (Cross DU), CancellationPaymentAllocationFinancialAuditTrailDocumentation, with a cardinality of c:cn, a reference to a FinancialAuditTrailDocumentation in a PaymentAllocation which serves as Original Entry Document for the cancellation of this LineItem; 6) From business object HouseBankStatement/node HouseBankStatement (Cross DU), CancellationHouseBankStatement, with a cardinality of c:cn, a reference to the HouseBankStatement that contains the Original Entry Document for the cancellation of this LineItem; 7) From business object HouseBankStatement/node FinancialAuditTrailDocumentation (Cross DU), CancellationHouseBankStatementFinancialAuditTrailDocumentation, with a cardinality of c:cn, a reference to a FinancialAuditTrailDocumentation in a HouseBankStatement which serves as Original Entry Document for the cancellation of this LineItem; 8) From business object IncomingCheck/node IncomingCheck (Cross DU), CancellationIncomingCheck, with a cardinality of c:cn, a reference to the IncomingCheck that contains the Original Entry Document for the cancellation of this LineItem; 9)

From business object IncomingCheck/node FinancialAuditTrailDocumentation (Cross DU), CancellationIncomingCheck FinancialAuditTrailDocumentation, with a cardinality of c:cn, a reference to a FinancialAuditTrailDocumentation in a IncomingCheck which serves as Original Entry Document for the cancellation of this LineItem; 10) From business object PaymentOrder/node PaymentOrder (Cross DU), CancellationPaymentOrder, with a cardinality of c:cn, a reference to the PaymentOrder that contains the Original Entry Document for the cancellation of this LineItem; 11) From business object PaymentOrder/node FinancialAuditTrailDocumentation (Cross DU), CancellationPaymentOrderFinancialAuditTrailDocumentation, with a cardinality of c:cn, a reference to a FinancialAuditTrailDocumentation in a PaymentOrder which serves as Original Entry Document for the cancellation of this LineItem; 12) From business object BillOfExchangeSubmission/node BillOfExchangeSubmission (Cross DU), CancellationBillOfExchangeSubmission, with a cardinality of c:cn, a reference to the BillOfExchangeSubmission that contains the Original Entry Document for the cancellation of this LineItem; 13) From business object BillOfExchangeSubmission/node FinancialAuditTrailDocumentation (Cross DU), CancellationBillOfExchangeSubmissionFinancialAuditTrailDocumentation, with a cardinality of c:cn, a reference to a FinancialAuditTrailDocumentation in a BillOfExchangeSubmission which serves as Original Entry Document for the cancellation of this LineItem; 14) From business object CashTransfer/node CashTransfer (Cross DU), CancellationCashTransfer, with a cardinality of c:cn, a reference to the CashTransfer that contains the Original Entry Document for the cancellation of this LineItem; 15) From business object CashTransfer/node FinancialAuditTrailDocumentation (Cross DU), CancellationCashTransferFinancialAuditTrailDocumentation, with a cardinality of c:cn, a reference to a FinancialAuditTrailDocumentation in a CashTransfer which serves as Original Entry Document for the cancellation of this LineItem; 16) From business object CashPayment/node CashPayment (Cross DU), CancellationCashPayment, with a cardinality of c:cn, a reference to the CashPayment that contains the Original Entry Document for the cancellation of this LineItem; 17)

From business object CashPayment/node FinancialAuditTrailDocumentation (Cross DU), CancellationCashPaymentFinancialAuditTrailDocumentation, with a cardinality of c:cn, a reference to a FinancialAuditTrailDocumentation in a CashPayment which serves as Original Entry Document for the cancellation of this LineItem; 18) From business object BillOfExchangeReceivable/node BillOfExchangeReceivable (Cross DU), CancellationBillOfExchangeReceivable, with a cardinality of c:cn, a reference to the BillOfExchangeReceivable that contains the Original Entry Document for the cancellation of this LineItem; 19) From business object BillOfExchangeReceivable/node FinancialAuditTrailDocumentation (Cross DU), CancellationBillOfExchangeReceivableFinancialAuditTrailDocumentation, with a cardinality of c:cn, a reference to a FinancialAuditTrailDocumentation in a BillOfExchangeReceivable which serves as Original Entry Document for the cancellation of this LineItem; 20) From business object DuePayment/node DuePayment (Cross DU), CancellationDuePayment, with a cardinality of c:cn, a reference to the DuePayment that contains the Original Entry Document for the cancellation of this LineItem; 21)

From business object DuePayment/node FinancialAuditTrailDocumentation (Cross DU), CancellationDuePaymentFinancialAuditTrailDocumentation, with a cardinality of c:cn, a reference to a FinancialAuditTrailDocumentation in a DuePayment which serves as Original Entry Document for the cancellation of this LineItem; 22) From MDRO CashLedgerAccountForeignCurrencyRemeasurementRun/node Root, CancellationCashLedgerAccountForeignCurrencyRemeasurementRun, with a cardinality of c:cn, a reference to the CashLedgerAccountForeignCurrencyRemeasurementRun that contains the Original Entry Document for the cancellation of this LineItem; and 23) From MDRO CashLedgerAccountForeignCurrencyRemeasurementRun/node LogSection, CancellationCashLedgerAccountForeignCurrencyRemeasurementRunLogSection, with a cardinality of c:cn, a reference to a LogSection that serves as Original Entry Document for the cancellation of this LineItem.

A number of association relationships for navigation can exist to business object AccountingDocument/node AccountingDocument, such as 1) AccountingDocument, with a cardinality of 1:cn, the accounting document that records the entire business transaction in Accounting; and 2) GeneralLedgerAccountLineItem, with a cardinality of 1:cn, a LineItem of a GeneralLedgerAccount that records the value change for GeneralLedger purposes.

A number of inbound association relationships can exist, such as 1) From business object AccountingNotification/node AccountingNotification, AccountingNotification, with a cardinality of c:cn, the notification sent to Financial Accounting about the business transaction stated in the LineItem; 2) From business object AccountingNotification/node AccountingNotificationItemGroupItem, AccountingNotificationItemGroupItem, with a cardinality of c:cn, a LineItem may originate as a result of a business transaction that was represented in an AccountingNotification 3) From business object CashLedgerAccount/node CashInTransit, CashLedgerAccount/CashInTransit, with a cardinality of c:cn, the cash in transit to which the LineItem is allocated; 4) From business object Identity/node Identity, CreationIdentity, with a cardinality of 1:cn, the system user Identity who created the LineItem; and 5) LastChangeIdentity, with a cardinality of c:cn, the system user Identity who last changed the LineItem.

A QueryByElements query can provides a list of all line items that meet the selection criteria specified by the query elements. The query elements are defined by the data type CashLedgerAccountLineItemElementsQueryElements. These elements can include CashLedgerAccountCompanyID, CashLedgerAccountCompanyUUID, CashLedgerAccountHouseBankID, CashLedgerAccountHouseBankUUID, CashLedgerAccountAccountDeterminationHouseBankGroupCode, SetOfBooksID, SegmentID, SegmentUUID, ProfitCentreID, ProfitCentreUUID, PartnerCompanyID, PartnerCompanyUUID, PartnerSegmentID, PartnerSegmentUUID, PartnerProfitCentreID, PartnerProfitCentreUUID, AccountingDocumentUUID, AccountingDocumentID, AccountingDocumentItemID, OriginalEntryDocumentContainingObjectReference, OriginalEntryTransactionUUID, OriginalEntryDocumentReference, OriginalEntryDocumentItemReference, OriginalEntryDocumentItemTypeCode, OriginalEntryDocumentPartnerID, AccountingNotificationUUID, AccountingNotificationItemGroupItemUUID, GeneralLedgerAccountLineItemUUID, GeneralLedgerAccountLineItemAccountingDocumentItemGroupID, CashInTransitUUID, SystemAdministrativeData, ChartOfAccountsCode, ChartOfAccountsItemCode, AccountingBusinessTransactionTypeCode, TypeCode, PaymentRegisterItemTypeCode, PaymentFormCode, AccountingDocumentTypeCode, AccountingDocumentNote, AccountingDocumentItemNote, PostingDate, OriginalEntryDocumentDate, AccountingBusinessTransactionDate, CurrencyConversionDate, FiscalYearVariantCode, FiscalYearID, AccountingPeriodID, AccountingClosingStepCode, AccountingDocumentItemAccountingGroupID, PropertyMovementDirectionCode, GeneralLedgerMovementTypeCode, DebitCreditCode, CancellationDocumentIndicator, CancellationOriginalEntryDocumentContainingBusinessObjectReference, CancellationOriginalEntryDocumentReference, CancellationOriginalEntryDocumentTransactionUUID, and CancelledIndicator.

CashLedgerAccountCompanyID is optional and may be of type GDT: CompanyID. CashLedgerAccountCompanyUUID is optional and may be of type (GDT: UUID). CashLedgerAccountHouseBankID is optional and may be of type GDT: BusinessPartnerID. CashLedgerAccountHouseBankUUID is optional and may be of type GDT: UUID. CashLedgerAccountAccountDeterminationHouseBankGroupCode is optional and may be of type GDT: AccountDeterminationHouseBankGroupCode. SetOfBooksID is optional and may be of type GDT: SetOfBooksID. SegmentID is optional and may be of type GDT: SegmentID. SegmentUUID is optional and may be of type GDT: UUID. ProfitCentreID is optional and may be of type GDT: ProfitCentreID. ProfitCentreUUID GDT: UUID. PartnerCompanyID is optional and may be of type GDT: CompanyID. PartnerCompanyUUID is optional and may be of type GDT: UUID. Partner SegmentID is optional and may be of type GDT: SegmentID. PartnerSegmentUUID is optional and may be of type GDT: UUID. Partner ProfitCentreID is optional and may be of type GDT: ProfitCentreID. PartnerProfitCentreUUID is optional and may be of type GDT: UUID. AccountingDocumentUUID is optional and may be of type GDT: UUID. AccountingDocumentID is optional and may be of type GDT: BusinessTransactionDocumentID. AccountingDocumentItemID is optional and may be of type GDT: BusinessTransactionDocumentItemID. OriginalEntryDocumentContainingObjectReference is optional and may be of type GDT: ObjectNodeReference with a Qualifier of OriginalEntryDocumentContaining. OriginalEntryTransactionUUID is optional and may be of type GDT: UUID. OriginalEntryDocumentReference is optional and may be of type GDT: ObjectNodeReference. OriginalEntryDocumentItemReference is optional and may be of type GDT: ObjectNodeReference. OriginalEntryDocumentItemTypeCode is optional and may be of type GDT: BusinessTransactionDocumentItemTypeCode. OriginalEntryDocumentPartnerID is optional and may be of type GDT: BusinessTransactionDocumentID. AccountingNotificationUUID is optional and may be of type GDT: UUID. AccountingNotificationItemGroupItemUUID is optional and may be of type GDT: UUID. GeneralLedgerAccountLineItemUUID is optional and may be of type GDT: UUID. GeneralLedgerAccountLineItemAccountingDocumentItemGroupID is optional and may be of type GDT: BusinessTransactionDocumentItemGroupID. CashInTransitUUID is optional and may be of type GDT: UUID. SystemAdministrativeData is optional and may be of type GDT: SystemAdministrativeData. ChartOfAccountsCode is optional and may be of type GDT: ChartOfAccountsCode. ChartOfAccountsItemCode is optional and may be of type GDT: ChartOfAccountsItemCode. AccountingBusinessTransactionTypeCode is optional and may be of type GDT: AccountingBusinessTransactionTypeCode. TypeCode is optional and may be of type GDT: SubledgerAccountLineItemTypeCode. PaymentRegisterItemTypeCode is optional and may be of type GDT: PaymentRegisterItemTypeCode. PaymentFormCode is optional and may be of type GDT: PaymentFormCode. AccountingDocumentTypeCode is optional and may be of type GDT: AccountingDocumentTypeCode. AccountingDocumentNote is optional and may be of type GDT: SHORT_Note. AccountingDocumentItemNote is optional and may be of type GDT: SHORT_Note. PostingDate is optional and may be of type GDT: Date with a Qualifier of Posting. OriginalEntryDocumentDate is optional and may be of type GDT: Date, Qualifier: OriginalEntryDocument. AccountingBusinessTransactionDate is optional and may be of type GDT: Date, Qualifier: BusinessTransaction. CurrencyConversion- Date is optional and may be of type GDT: Date with a Qualifier of CurrencyConversion. FiscalYearVariantCode is optional and may be of type GDT: FiscalYearVariantCode. FiscalYearID is optional and may be of type GDT: FiscalYearID. AccountingPeriodID is optional and may be of type GDT: AccountingPeriodID. AccountingClosingStepCode is optional and may be of type GDT: AccountingClosingStepCode. AccountingDocumentItemAccountingGroupID is optional and may be of type GDT: BusinessTransactionDocumentItemGroupID. PropertyMovementDirectionCode is optional and may be of type GDT: PropertyMovementDirectionCode. GeneralLedgerMovementTypeCode is optional and may be of type GDT: GeneralLedgerMovementTypeCode. DebitCreditCode is optional and may be of type GDT: DebitCreditCode. CancellationDocumentIndicator is optional and may be of type GDT: Indicator, with a qualifier of CancellationDocument. CancellationOriginalEntryDocumentContainingBusinessObjectReference is optional and may be of type GDT: ObjectNodeReference with a Qualifier of CancellationOriginalEntryDocumentContaining. CancellationOriginalEntryDocumentReference is optional and may be of type GDT: ObjectNodeReference with a Qualifier of Cancellation. CancellationOriginalEntryDocumentTransactionUUID is optional and may be of type GDT: UUID. CancelledIndicator is optional and may be of type GDT: Indicator, Qualifier: Cancelled.

PeriodBalance

PeriodBalance is the period balance that stores information about the value of cash resources specific to a period. The period balance belongs to a CashLedgerAccount for a set of books. The elements located directly at the PeriodBalance node are defined by the type GDT: CashLedgerAccountPeriodBalanceElements. These elements can include SetOfBooksID, SegmentUUID, ProfitCentreUUID, CharofAccountsCode, ChartOFAccountsItemCode, FiscalYearVariantCode, FiscalYearID, AccountingPeriodID, AccountingClosingStepCode, SubledgerAccountLineItemTypeCode, PaymentFormCode, LineItemCurrencyCode, LineItemCurrencyAmount, LineItemCurrencyAmount, LocalCurrencyAmount, SetOfBooksCurrencyAmount, HardCurrencyAmount, and IndexBasedCurrencyAmount.

SetOfBooksID is an identifier for the set of books to which the period balance relates, which can be unique. SetOfBooksID may be based on GDT SetOfBooksID. SegmentUUID is an universal identification, which may be unique, of the Segment to which the value and quantity of the period total are/is allocated, which is optional. SegmentUUID may be based on GDT UUID. ProfitCentreUUID is an universal identification, which may be unique, of the ProfitCentre to which the value and quantity of the period total are/is allocated. ProfitCentreUUID may be based on GDT UUID. ChartOfAccountsCode is a coded representation of the ChartOfAccounts that contains the ChartOfAccountsItem that classifies the value stated in the PeriodTotal. ChartOfAccountsCode may be based on GDT ChartOfAccountsCode. ChartOfAccountsItemCode is a coded representation of a ChartOfAccountsItem that classifies—for general ledger accounting purposes—the value stated in the PeriodTotal. ChartOfAccountsItemCode may be based on GDT ChartOfAccountsItemCode. FiscalYearVariantCode is a coded representation of the FiscalYearVariant according to whose fiscal year definition (begin, end, period definition) the FiscalYearID and the AccountingPeriodID are derived. FiscalYearVariantCode may be based on GDT FiscalYearVariantCode. FiscalYearID is the identification of the fiscal year in which the LineItem are posted for which the PeriodTotal keeps summarized values and quantities. FiscalYearID may be based on GDT FiscalYearID. AccountingPeriodID is an identification of the accounting period in which the LineItem are posted for which the PeriodTotal keeps summarized values and quantities. AccountingPeriodID may be based on GDT AccountingPeriodID. AccountingClosingStepCode is the identification of the accounting closing step in which the LineItem are posted for which the PeriodTotal keeps summarized values and quantities. AccountingClosingStepCode may be based on GDT AccountingClosingStepCode. SubledgerAccountLineItemTypeCode is the coded representation of the type of the SubledgerAccountLineItems whose amounts and quantities are summarized in the PeriodTotal. SubledgerAccountLineItemTypeCode may be based on GDT SubledgerAccountLineItemTypeCode. PaymentFormCode is the coded representation of the form of payment, transferred from the payment process to document the transaction in the accounting. PaymentFormCode may be represented by GDT PaymentFormCode. LineItemCurrencyCode is the Coded representation of the currency key of the currency in which line items occurred. LineItemCurrencyCode may be based on GDT CurrencyCode.

LineItemCurrencyAmount is the value of the period total in the LineItem currency carrying the CashLedgerAccount. LineItemCurrencyAmount may be based on GDT Amount. In some implementations, the value reported here matches the total of all values in LineItem currency that are documented in the LineItems. LocalCurrencyAmount is the value of the period total in the local currency of the Company carrying the CashLedgerAccount. The local currency is the currency in which the local books are kept. LocalCurrencyAmount may be based on GDT Amount. In some implementations, the value reported here matches the total of all values in local currency that are documented in the LineItems. SetOfBooksCurrencyAmount is the value of the period total in the currency selected for the set of books, and is optional. SetOfBooksCurrencyAmount may be based on GDT Amount. In some implementations, the value reported here matches the total of all values in the additional currency selected for the set of books that are documented in the LineItems. HardCurrencyAmount is the value of the period total in the hard currency of the country of the Company carrying the CashLedgerAccount, and is optional. The hard currency is a stable, country-specific currency that is used in high-inflation countries. HardCurrencyAmount may be based on GDT Amount. In some implementations, the value reported here may match the total of all values in the hard currency that are documented in the LineItems. IndexBasedCurrencyAmount is the value of the period total in the index-based currency of the country of the Company carrying the CashLedgerAccount. The index-based currency is a fictitious, country-specific currency that is used in high-inflation countries as a comparison currency for reporting. IndexBasedCurrencyAmount may be based on GDT Amount. In some implementations, the value reported here may match the total of all values in the index-based currency that are documented in LineItems.

A number of Inbound Aggregation Relationships can exist, such as 1) From business object SetOfBooks/node SetOfBooks, SetOfBooks, with a cardinality of 1:cn, a SetOfBooks according to whose specifications the PeriodTotal was created and updated; 2) From business object Segment/node Segment, Segment, with a cardinality of c:cn, a Segment to which the values of the PeriodTotal are allocated; and 3) From business object ProfitCentre/node ProfitCentre, ProfitCentre, with a cardinality of c:cn, a ProfitCentre to which the values of the PeriodTotal are assigned.

A QueryByElements query can provide a list of all period balances that meet the selection criteria specified by the query elements. The query elements can be defined by the data type CashLedgerAccountPeriodBalanceElementsQueryElements. These elements can include CashLedgerAccountCompanyID, CashLedgerAccountCompanyUUID, CashLedgerAccountHouseBankID, CashLedgerAccountHouseBankUUID, SetOfBooksID, SegmentID, SegmentUUID, ProfitCentreID, ProfitCentreUUID, ChartOfAccountsCode, ChartOfAccountsItemCode, FiscalYearVariantCode, FiscalYearID, AccountingPeriodID, AccountingClosingStepCode, SubledgerAccountLineItemTypeCode, PaymentFormCode, and LineItemCurrencyCode.

CashLedgerAccountCompanyID is optional and may be of type GDT: CompanyID.CashLedgerAccountCompanyUUID is optional and may be of type GDT: UUID. CashLedgerAccountHouseBankID is optional and may be of type GDT: BusinessPartnerID.CashLedgerAccountHouseBankUUID GDT: UUID. SetOfBooksID is optional and may be of type GDT: SetOfBooksID. SegmentID is optional and may be of type GDT: SegmentID. SegmentUUID is optional and may be of type GDT: UUID. ProfitCentreID is optional and may be of type GDT: ProfitCentreID. ProfitCentreUUID is optional and may be of type GDT: UUID. ChartOfAccountsCode is optional and may be of type GDT: ChartOfAccountsCode. ChartOfAccountsItemCode is optional and may be of type GDT: ChartOfAccountsItemCode. FiscalYearVariantCode is optional and may be of type GDT: FiscalYearVariantCode. FiscalYearID is optional and may be of type GDT: FiscalYearID. AccountingPeriodID is optional and may be of type GDT: AccountingPeriodID. AccountingClosingStepCode is optional and may be of type GDT: AccountingClosingStepCode. SubledgerAccountLineItemTypeCode is optional and may be of type GDT: SubledgerAccountLineItemTypeCode. PaymentFormCode is optional and may be of type GDT: PaymentFormCode. LineItemCurrencyCode is optional and may be of type GDT: CurrencyCode.

FixedAsset Business Object

Figures 1, 89:
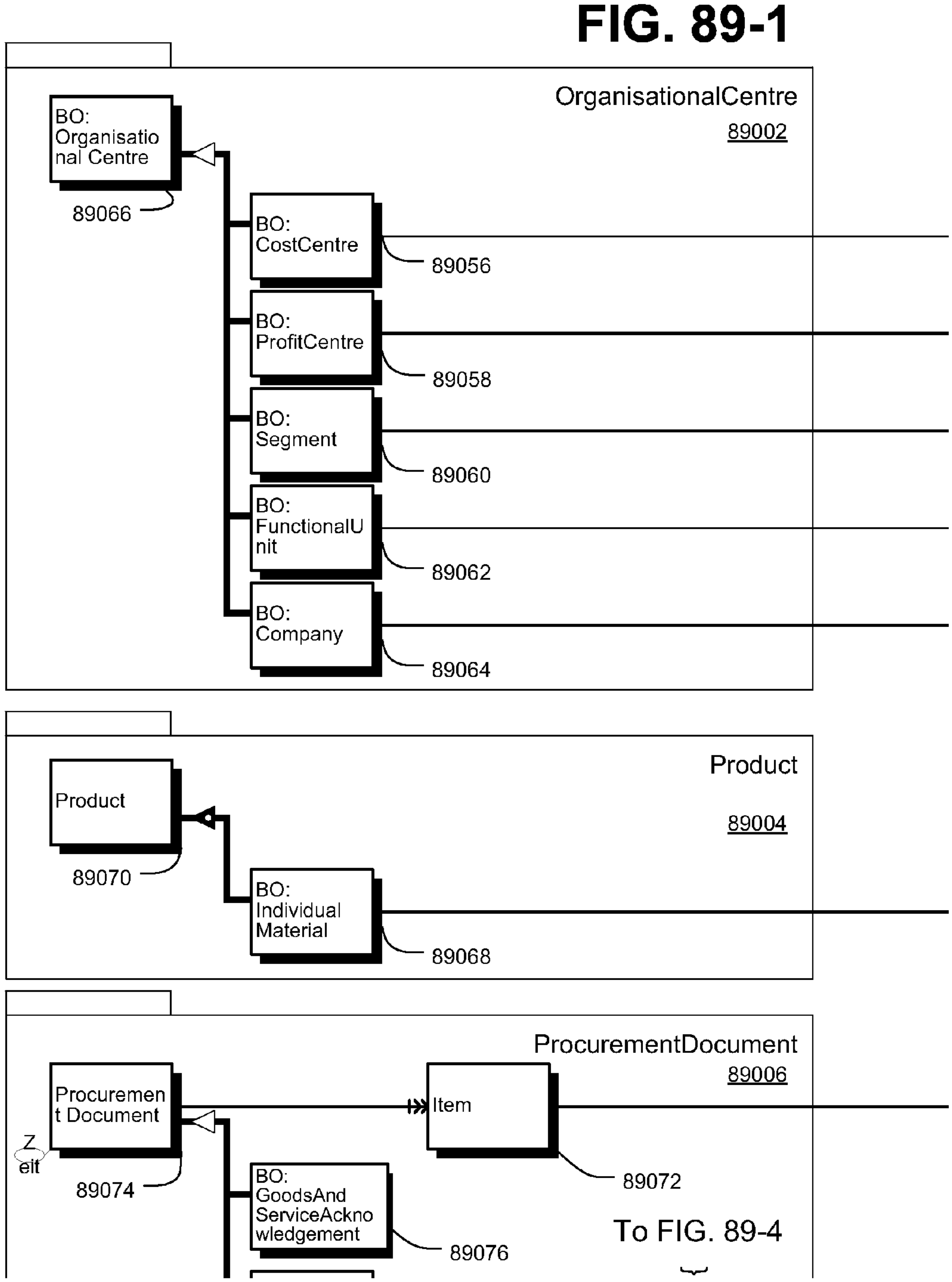
Figures 2, 89:
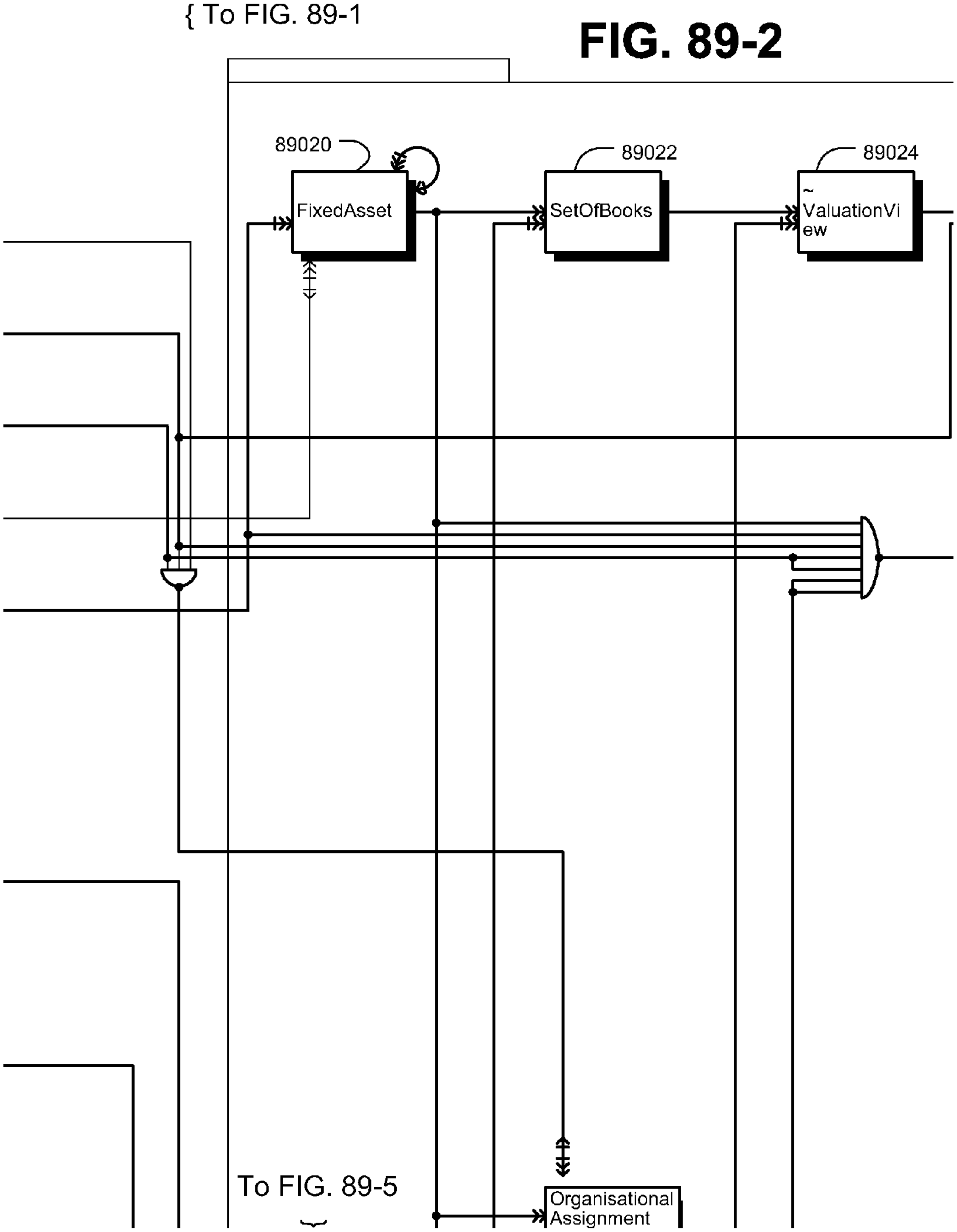
Figures 3, 89:
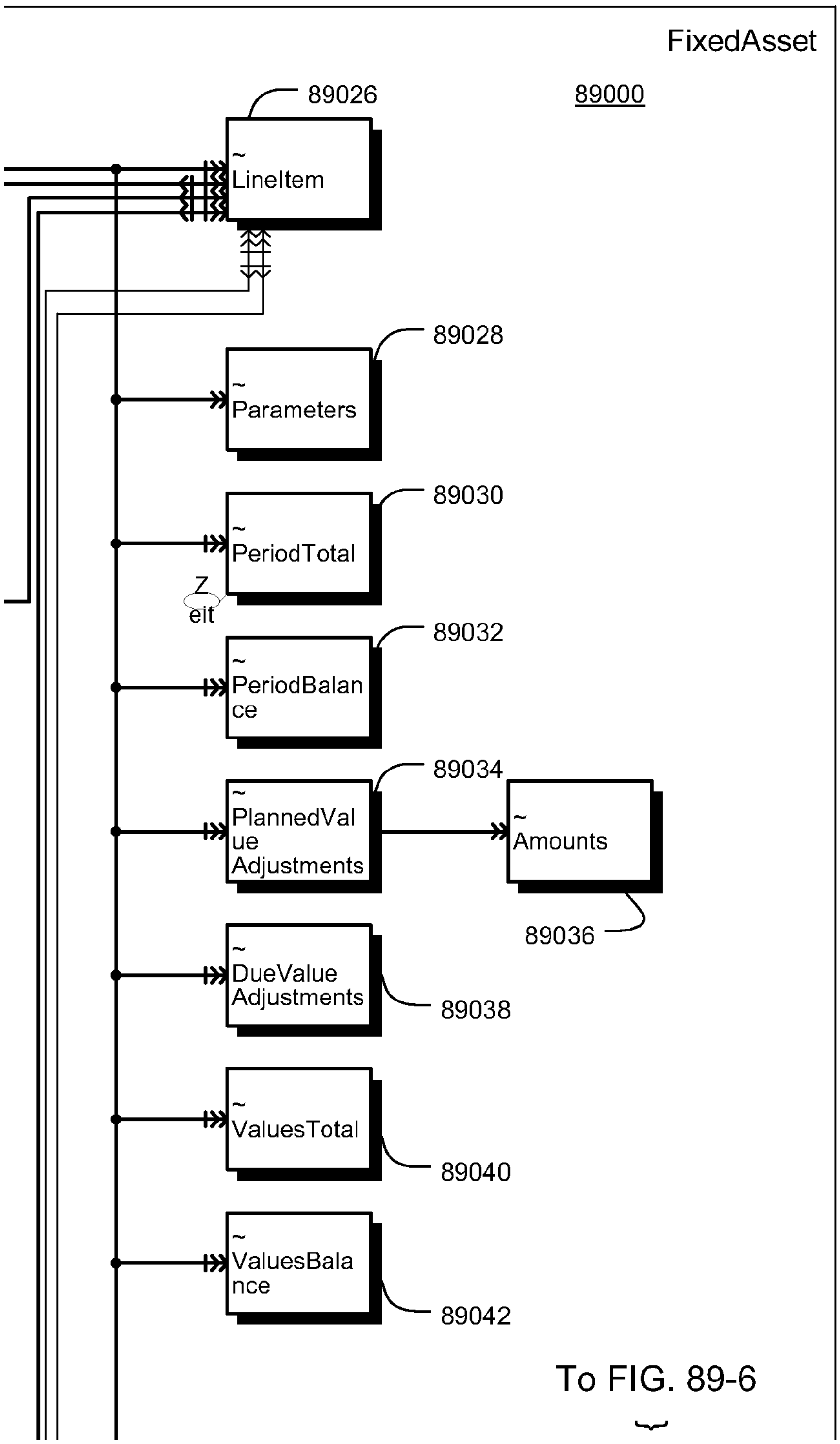
Figures 5, 89:
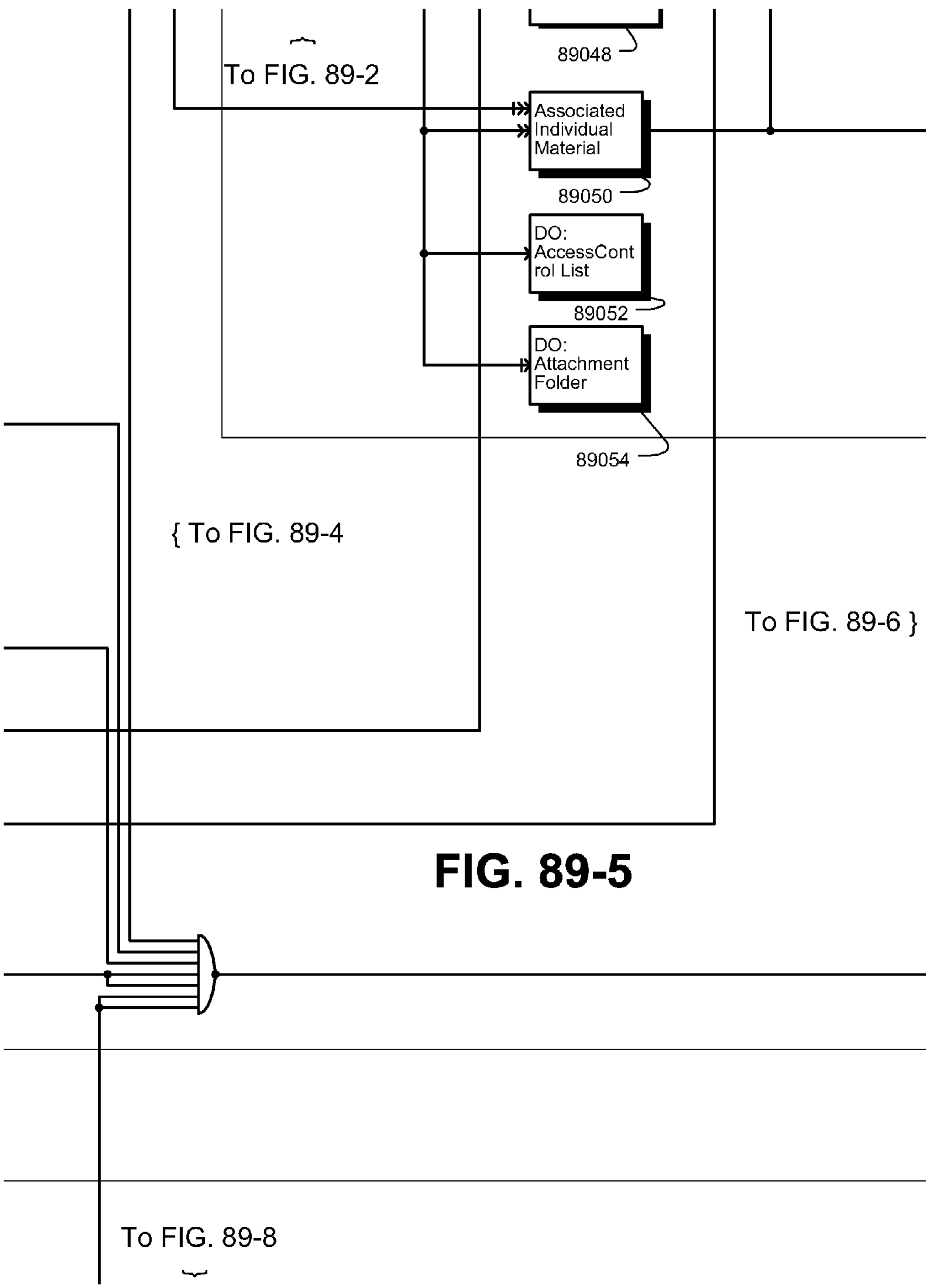
Figures 6, 89:
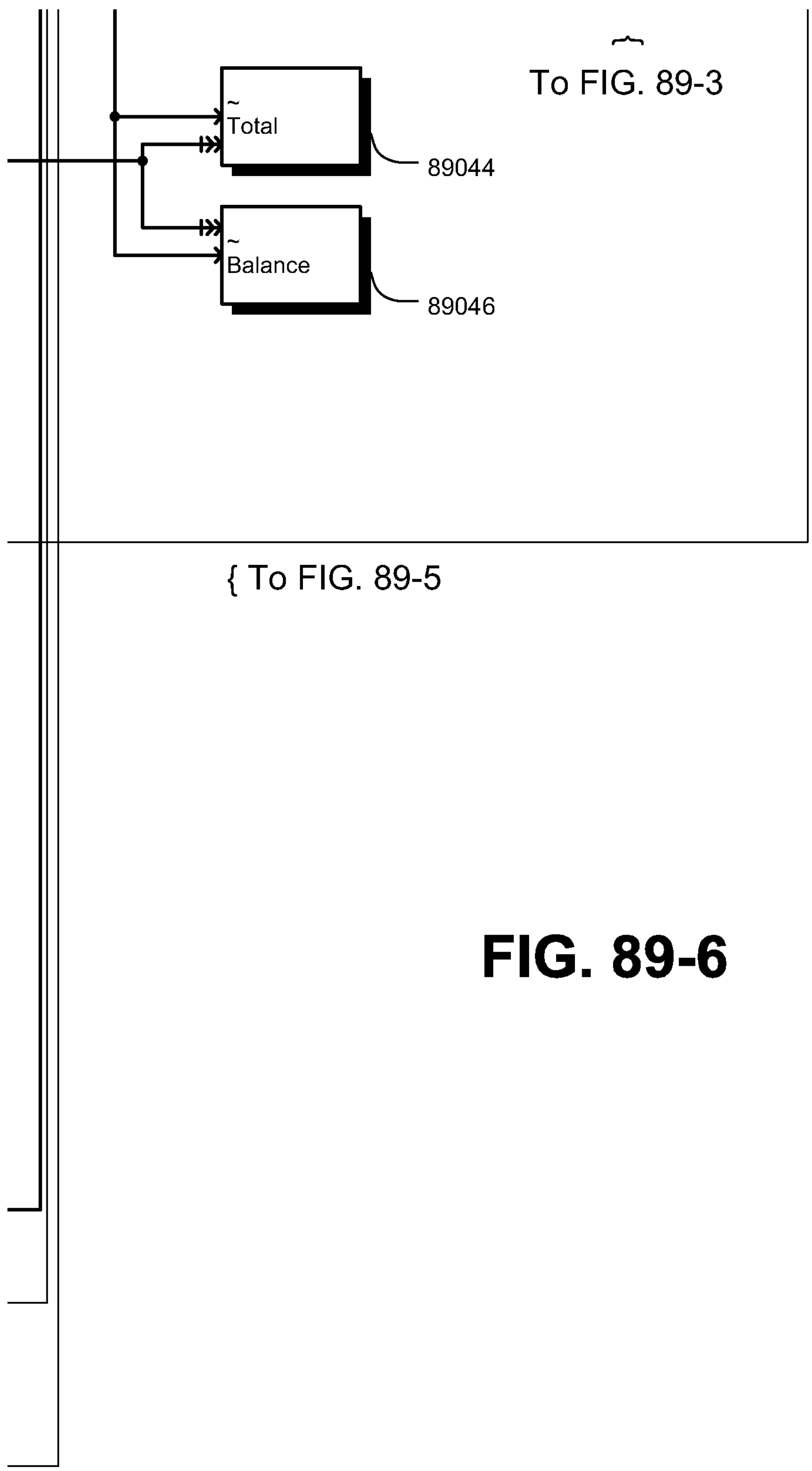
Figures 7, 89:
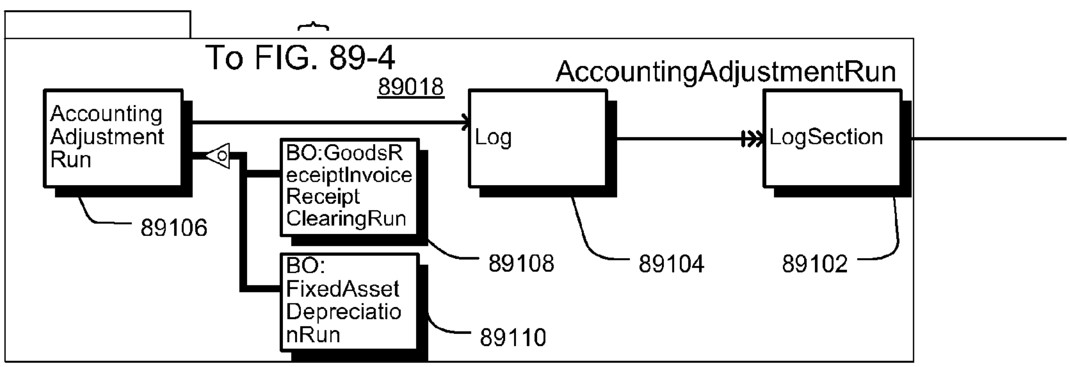

FIGS. 89-1 through 89-7 illustrate an example FixedAsset business object model 89000. Specifically, this model depicts interactions among various hierarchical components of the FixedAsset, as well as external components that interact with the FixedAsset (shown here as 89002 through 89018 and 890056 through 89110).

The Business Object FixedAsset is a view, defined for the purposes of financial accounting, of usually one or more physical objects, rights or other economic values belonging to a company. They may be in long-term use, are recognized in the financial statements at closing, and may be individually identifiable. It can also include the recording of the values (based on the principle of double-entry bookkeeping) that may reflect the effects of business transactions on this view. Business Object FixedAsset can serve as a structuring element for collecting and evaluating postings in the asset subledger. A fixed asset can encompass the given view definition and the values for this view resulting from acquisitions, retirements, depreciation, revaluation and interest. It can also contain the calculation parameters to determine depreciation, revaluation and interest. In addition to individual account movements related to business transactions, may it contain period-based totals and balances that can summarize the movements. The Business Object FixedAsset can be part of: a Process Component Accounting and a Deployable Unit FinancialAccounting. A FixedAsset may contain the following components: FixedAsset 89020 (Root node which may contain time-independent master data, such as asset number and name), OrganisationalAssignment 89048 (which can contain the time-dependent organizational assignment to cost centers or enterprise areas such as profit center and segment for example), SetOfBooks 89022 (which can contain the values and parameters for calculating these values using various valuation methods for example), AssociatedIndividualMaterial 89050 (which can contain the individual materials that are valuated using the fixed asset for example), AccessControlList 89052 (which can be Access control for a FixedAsset for identity and access management (IAM) for example) and AttachmentFolder 89054 (which can be Attachment of other Business Documents for example, e.g. Office Documents). FixedAsset may be represented by the FixedAsset node. There may exist Service Interfaces that the business object FixedAsset may be involved in the MigrationAdaptor Processing_Accounting process integration model. The process integration model MigrationAdaptor Processing Accounting is used to transfer legacy data to Financial Accounting in some implementations.

Fixed Asset Migration In is FixedAssetMigrationIn and can be part of the MigrationAdaptor Processing_Accounting Process Component Interaction Model. The Service Interface Fixed Asset Migration In may group the operations that inform Accounting about requests to migrate fixed assets (and their values) that may have been created in a legacy system to FinancialAccounting.

An Operation Migrate Fixed Asset (A2A) (MigrationIn-.MigrateFixedAsset) can convert information about fixed assets which are to be migrated from a legacy system to a new ERP system into FixedAssets. The operation may be based on message type Fixed Asset Migrate Request (derived from business object FixedAsset).

The Business Object FixedAsset (Root Node of the Business Object FixedAsset) alternatively is a view, defined for the purposes of financial accounting, of usually one or more physical objects, rights or other economic values belonging to a company. They may be in long-term use, may be recognized in the financial statements at closing, and may be individually identifiable. It can also include the recording of the values (based on the principle of double-entry bookkeeping) that may reflect the effects of business transactions on this view. A fixed asset can encompass the given view definition, the line items, and totals in financial accounting. It can also include the recording of the results of changes in value due to depreciation, revaluation, and interest, as well as the calculation parameters used for determining these values. The recording of values may serve the purpose of proper financial reporting for fixed assets and is used in the profit and loss statement of the company. Subsequently the term “offsetting” may be used frequently. In particular, an OffsettingSubledgerAccount can be a SubledgerAccount that may contain—with reference to the same Accounting Document—the inverse representation of the business transaction stated in an SubledgerAccountLineItem. The inverse representation may be required by the double entry bookkeeping principle. The compliance with this principle may lead to a zero balance of the AccountingDocument that can represent the Business transaction. An example for offsetting may be where an InventoryChangeItem of a ProductionLotConfirmation may have to be represented as a debit LineItem of a ProductionLedgerAccount and as an inverse credit LineItem of a MaterialLedgerAccount.

Subsequently, a generic approach for referencing Original Entry Documents may also be used, where an Original Entry Document can be a document that may be necessary for auditing purposes and can verify that the value stated in the LineItem of a ledger account may have been booked on the base of a real business transaction. An Original Entry Document may be contained in another Object, the Original Entry DocumentContainingObject. These can typically be: a FinancialAuditTrailDocumentation contained in a Host object like DuePayment, DueClearing, Dunning, and PaymentAllocation from Operative Financials, a LogSection in all AccountingAdjustmentRun-MDROs (e.g. InventoryPriceChangeRun, GeneralLedgerAccountBalanceDistributionRun, FixedAssetDepreciationRun, WorkInProcessClearingRun), a SettlementResultAccounting in an ExpenseReport, and a PeriodItem in an EmployeeTimeCalendar.

The elements located directly at the node FixedAsset can be defined by the data type FixedAssetElements, and may include: UUID, CompanyUUID, FixedAssetsFunctionalUnitUUID, MasterFixedAssetUUID, CompanyID, MasterFixedAssetID, ID, FixedAssetsFunctionalUnitID, ClassCode, AccountDeterminationFixedAssetClassGroupCode, Name, MasterFixedAssetName, SystemAdministrativeData, Status, PrimaryPostingBlockingStatusCode, DataCompletenessStatusCode, PostingConsistencyStatusCode, LifeCycleStatusCode, ArchivingStatusCode and Key. UUID is an universal identification, which can be unique, of the FixedAsset. UUID may be based on GDT UUID. CompanyUUID is an universal identification, which can be unique, of the Company for which the FixedAsset is carried. CompanyUUID may be based on GDT UUID. FixedAssetsFunctionalUnitUUID is an global identifier, which can be unique, of the FunctionalUnit working on the Business-Object FixedAsset, and is optional. FixedAssetsFunctionalUnitUUID may be based on GDT UUID. The FunctionalUnit referenced may have to be able to execute the organizational function FixedAssets, that is, the element OrganisationalFunctionCode in one of the instances of the node. FunctionalUnitAttributes in the FunctionalUnit references may have the value 18' (FixedAssets) for example. MasterFixedAssetUUID is an ID, which can be unique, of the main asset that is assigned to the sub-asset, and is optional. The asset master data can be transferred from this main asset and may be collected there where it can be maintained for the main asset and sub-asset. MasterFixedAssetUUID may be based on GDT UUID.

Integrity: If the asset itself is a main asset, this element is empty. CompanyID is an identification, which can be unique, of the company to whose fixed assets the asset may belong. CompanyID may be based on GDT OrganisationalCentreID. Furthermore, MasterFixedAssetID can identify a business unit within a company from a main asset and one or several sub-assets that may be depreciated individually, but it may be possible to represent their values together and maintain their data together. MasterFixedAssetID may be based on GDT MasterFixedAssetID. If the fixed asset is a sub-asset of a main asset, they both may have the same MasterFixedAssetID in some implementations. ID is an identification, which can be unique, of the fixed asset in a company in the context of the MasterFixedAssetID. It is part of the key (Element Key) of the fixed asset. ID may be based on GDT FixedAssetID. All main assets may have the same ID "0" in some implementations. FixedAssetsFunctionalUnitID can identify the functional unit responsible for the FixedAssets, and is optional. FixedAssetsFunctionalUnitID may be based on GDT OrganisationalCentreID. ClassCode is a coded representation of the fixed asset class to which the fixed asset is assigned. The result of this assignment may be, for example, that all assets in a class can be subject to the same depreciation rules. ClassCode may be based on GDT FixedAssetClassCode. AccountDeterminationFixedAssetClassGroupCode can enable a fixed asset to be grouped with other fixed assets so that the same derivation of accounts in general ledger accounting may be used for the entire group. AccountDeterminationFixedAssetClassGroupCode may be based on GDT AccountDeterminationFixedAssetClassGroupCode with no restriction in some implementations. Name can contain the description of the fixed asset. Name may be based on GDT LANGUAGEINDEPENDENT_MEDIUM_Name. MasterFixedAssetName can contain the name of the main asset if the asset is assigned to a main asset by means of the Key, and is optional. MasterFixedAssetName may be based on GDT LANGUAGEINDEPENDENT_MEDIUM_Name, Restrictions: If the fixed asset is itself a main asset, then the element may be empty. If the fixed asset is a sub-asset of a main asset, then the element may be filled with the contents of the Name element of the main asset. SystemAdministrativeData is administrative data stored in a system, where this data may include system user and change time. SystemAdministrativeData may be based on GDT SystemAdministrativeData. Status may be based on IDT: FixedAssetStatus. PrimaryPostingBlockingStatusCode can specify, if the fixed asset is blocked for primary postings or not. PrimaryPostingBlockingStatusCode may be restricted GDT for BlockingStatusCode and Qualifier PrimaryPosting. DataCompletenessStatusCode can specify the data completeness of the fixed asset and may be restricted GDT for DataCompletenessStatusCode. PostingConsistencyStatusCode can specify, if necessary data for postings is available or not and may be restricted GDT INCONSISTENTCONSISTENT_ConsistencyStatusCode and Qualifier Posting; central list for qualified harmonized status codes may have to be created. LifeCycleStatusCode can specify the lifecycle of a fixed asset. The value can be aggregated from the LifeCycleStatus in all active SetOfBooks 89022 nodes. LifeCycleStatusCode may be based on GDT FixedAssetLifeCycleStatusCode in review. ArchivingStatusCode can specify the achieving status and may be based on GDT ArchivingStatusCode. Key is a semantic key, which can be unique, for the FixedAsset and may be based on IDT: FixedAssetKey. The FixedAssetKey can consist of the elements CompanyUUID, MasterFixedAssetID and ID. CompanyUUID may be based on GDT UUID. MasterFixedAssetID may be based on GDT MasterFixedAssetID. ID may be based on GDT FixedAssetID.

The following composition relationships to subordinate nodes exist: OrganisationalAssignment 89048, SetOfBooks, AssociatedIndividualMaterial 89050, AccessControlList 89052, and AttachmentFolder 89054. OrganisationalAssignment has a cardinality relationship of 1:n (Filtered), where the filter elements may be defined by the data type FixedAssetOrganisationalAssignmentFilterElements. These elements can include ValidityDate which is optional and may be based on GDT Date and have a Qualifier Validity. ValidityDate can refer to date on which the organizational assignment may be valid. The validity date lies within an OrganisationalAssignmentValidityPeriod. If the date is not set, no filter may be applied. SetOfBooks has a cardinality relationship of 1:n (Filtered). The filter elements may be defined by the data type FixedAssetSetOfBooksFilterElements. These elements can include SetOfBooksID which is optional and based on GDT SetOfBooksID. SetOfBooksID is an identification, which can be unique, of the SetOfBooks that may not be filtered out in some implementations. If the ID is not set, no filter may be applied. AssociatedIndividualMaterial has a cardinality relationship of 1:n. AccessControlList has a cardinality relationship of 1:1. AttachmentFolder has a cardinality relationship of 1:c.

There may exist Inbound Aggregation Relationships from business object Company/node Company, Company has a cardinality relationship of 1:n 1:cn, as it can denote the Company for which the fixed asset account may be carried and/or where the company may be the owner of the individual material that may be valuated by the fixed asset; and from business object FixedAsset/node FixedAsset, MasterFixedAsset c:cn, which can specify the main asset to which the fixed asset may be assigned as a sub-asset. Inbound Association Relationships may relate from business object Identity/node Identity, CreationIdentity has a cardinality relationship of 1:cn, as the system user Identity who may have created the FixedAsset and LastChangeIdentity has a cardinality relationship of c:cn, as the system user Identity who may have last changed the FixedAsset. Inbound Association Relationships may relate from Business-Object FunctionalUnit/node FunctionalUnit, FixedAssetsFunctionalUnit has a cardinality relationship of c:cn, as it can identify the Functional Unit which may be working on the Business-Object FixedAsset.

Queries can include QueryByClassAndName, QueryByOrganisationalAssignment and QueryByIndividualMaterial. QueryByClassAndName can provide a list of all fixed assets that may meet the selection criteria. The query element may be defined by the data type FixedAssetClassAndNameQueryElements. These elements can include CompanyUUID, CompanyID, MasterFixedAssetID, ID, ClassCode, AccountDeterminationFixedAssetClassGroupCode, Name and SetOfBooksCapitalizationDate. CompanyUUID is optional and may be based on GDT UUID. CompanyID is optional and may be based on GDT OrganisationalCentreID. MasterFixedAssetID is optional and may be based on GDT MasterFixedAssetID. ID is optional and may be based on GDT FixedAssetID. FixedAssetID can be used in selection to distinguish between main assets and sub-assets. ClassCode may be based on GDT FixedAssetClassCode. ClassCode is optional and may be based on GDT FixedAssetClassCode. AccountDeterminationFixedAssetClassGroupCode is optional and may be based on GDT AccountDeterminationFixedAssetClassGroupCode. Name is optional and may be based on GDT LANGUAGEINDEPENDENT_MEDIUM_Name. SetOfBooksCapitalizationDate can be used to limit the result list to active fixed assets, and is optional. SetOfBooksCapitalizationDate may be based on GDT Date and has a Qualifier Capitalization.

A QueryByOrganisationalAssignment query can provide a list of all fixed assets that meet the selection criteria. The query elements may be defined by the data type FixedAssetOrganisationalAssignmentQueryElement. These elements can include CompanyUUID, CompanyID, ValidityDate, OrganisationalAssignmentSegmentUUID, OrganisationalAssignmentSegmentID, OrganisationalAssignmentProfitCentreUUID, OrganisationalAssignmentProfitCentreID, OrganisationalAssignmentCostCentreUUID and OrganisationalAssignmentCostCentreID. CompanyUUID is optional and may be based on GDT UUID. CompanyID is optional and may be based on GDT OrganisationalCentreID. ValidityDate can be date on which the organizational assignment may be valid, and is optional. The validity date is in an OrganisationalAssignmentValidityPeriod. If the date is not set, the current system data may be used. ValidityDate may be based on GDT Date, Qualifier Validity. OrganisationalAssignmentSegmentUUID is an universal identification, which can be unique, of a segment of a FixedAssetOrganisationalAssignment and is optional. OrganisationalAssignmentSegmentUUID may be based on GDT UUID. OrganisationalAssignmentSegmentID is optional and may be based on GDT Segment. OrganisationalAssignmentSegmentID is an identification, which can be unique, of a segment of a FixedAssetOrganisationalAssignment.

Furthermore, OrganisationalAssignmentProfitCentreUUID is an universal identification, which can be unique, of the ProfitCentre of a FixedAssetOrganisationalAssignment, and is optional. OrganisationalAssignmentProfitCentreUUID may be based on GDT UUID. OrganisationalAssignmentProfitCentreID is an identification, which can be unique, of the profit center of a FixedAssetOrganisationalAssignment, and is optional. OrganisationalAssignmentProfitCentreID may be based on GDT OrganisationalCentreID. OrganisationalAssignmentCostCentreUUID is an universal identification, which can be unique, of the cost center of a FixedAssetOrganisationalAssignment, and is optional. OrganisationalAssignmentCostCentreUUID may be based on GDT UUID. OrganisationalAssignmentCostCentreID is an identification, which can be unique, of the cost center of a FixedAssetOrganisationalAssignment, and is optional. OrganisationalAssignmentCostCentreID may be based on GDT OrganisationalCentreID.

A QueryByIndividualMaterial can provide a list of all fixed assets that may be assigned to individual material and comply with the selection criteria for attributes of individual material. The query elements may be defined by the data type: FixedAssetIndividualMaterialQueryElements. These elements are: CompanyUUID, which is optional and may be based on GDT UUID. CompanyID, which is optional and may be based on GDT OrganisationalCentreID. AssociatedIndividualMaterialIndividualMaterialUUID, an universal identification, which can be unique, of an AssociatedIndividualMaterial, optional and may be based on GDT UUID. AssociatedIndividualMaterialIndividualMaterialID, an identification, which can be unique, of an AssociatedIndividualMaterial, is optional and may be based on GDT ProductID. AssociatedIndividualMaterialIndividualMaterialInventoryID, an identification, which can be unique, for an AssociatedIndividualMaterial that is stocked as physical inventory, is optional and may be based on GDT IndividualMaterialInventoryID.

Enterprise Service.Infrastructure Actions may include CreateWithReference, Block (S&AM action), Unblock (S&AM action), CheckPostingConsistency (S&AM check-action), CheckDataCompleteness (S&AM check-action), CheckArchivability (S&AM action) and MoveToArchive (S&AM action). CreateWithReference action can create a FixedAsset object using data from a referenced FixedAsset and may have the following attributes: Changes to the status where the status variable PrimaryPostingBlocking can contain the value Blocked. The action may be performed on one or multiple node instances; and Usage where the action can be performed by all service consumers.

A Block (S&AM action), with which the fixed asset can be blocked for primary postings. Planned depreciations can be posted. Block action may have the following attributes: Preconditions that result from Status & Action Management: The status variable PrimaryPostingBlocking may have the value not blocked. The status variable PostingConsistency has the status consistent. Changes to the status can include that the status variable PrimaryPostingBlocking can contain the value Blocked. The action can be performed on one or multiple node instances. This action can be performed by all service consumers in some implementations.

A Unblock (S&AM action), with which the fixed asset may be unblocked for primary postings. All business transactions can be posted. Unblock action may have the following attributes: Preconditions that result from Status & Action Management: The status variable PrimaryPostingBlocking may have the value blocked. The status variable PostingConsistency may have the status consistent. Changes to the status: The status variable PrimaryPostingBlocking can contain the value Unblocked. The action can be performed on one or multiple node instances in some implementations. This action can be performed by all service consumers, for example.

A CheckPostingConsistency can be a non-real ESI-action. Furthermore disabled can be true, and finalized can be true. The action can check, if all data being necessary for postings is maintained and may have the following attributes that Preconditions that result from Status & Action Management include that the status variable PostingConsistency may have the value inconsistent or consistent. Changes to the status can include that the status variable PostingConsistency and can contain the value consistent or inconsistent. The action may be performed on one or multiple node instances as soon as data which may be necessary for posting has been changed. This action may not be performed by any service consumers, in some implementations.

A CheckDataCompleteness can be a non-real ESI-action. Furthermore, disabled can be true, and finalized can be true. The action can check if all data which may have already been maintained and may have the following attributes that Preconditions that result from Status & Action Management that the status variable DataCompleteness may have the value incomplete or complete. Changes to the status can include that the status variable DataCompleteness can contain the value incomplete or complete. The action may be performed on one or multiple node instances as soon as data was changed in some implementations. This action may not be performed by any service consumers in some implementations. Pattern can be for Archiving.

A CheckArchivability (S&AM action) can check, if conditions for archiving data may be fulfilled and may have the following attributes that Preconditions that result from Status & Action Management can include that the status variable LifeCycle may have the value retired. The status variable ArchivingStatus may have the value notArchived. Other preconditions can include that configured residence time and retention time can be expired. Changes to the status can include the status variable ArchivingStatus can contain the value ArchivingInProcess. The action can be performed on one node instance. This action can be performed by any service consumers in some implementations.

A MoveToArchive (S&AM action) can move Fixed Asset to archive and can delete the corresponding data on database tables. The action may have the following attributes: Preconditions that result from Status & Action Management can include that the status variable ArchivingStatus may have the value ArchivingInProcess. Changes to the status can include that the status variable ArchivingStatus can contain the value Archived. Changes to the object can be deleted from database completely in some implementations. The action may be performed on one node instance. This action can be performed by the Archiving Framework in some implementations.

An OrganisationalAssignment can contain the assignments of the fixed asset (valid for a given time period) to the organizational units: cost center (CostCentre), profit center (ProfitCentre) and/or segment (Segment). This assignment may be necessary so that values for fixed assets can be recorded separately for different organizational units of the company. The elements located directly at the OrganisationalAssignment node and may be defined by the data type FixedAssetOrganisationalAssignmentElements. These can include ValidityPeriod, SegmentUUID, SegmentID, ProfitCentreUUID, ProfitCentreID, CostCentreUUID and CostCentreID. ValidityPeriod can specify the validity period of assignments to organizational units and may be based on GDT CLOSED_DatePeriod and have a Qualifier Validity. SegmentUUID can specify the segment to which the fixed asset is assigned, and is optional. SegmentUUID may be based on GDT UUID. SegmentID is an identification, which can be unique, of the segment to which the fixed asset is assigned, and is optional. SegmentID may be based on GDT OrganisationalCentreID. ProfitCentreUUID can specify the profit center to which the fixed asset is assigned, and is optional. ProfitCentreUUID may be based on GDT UUID. ProfitCentreID is an identification, which can be unique, of the profit center to which the fixed asset is assigned, and is optional. ProfitCentreID may be based on GDT OrganisationalCentreID. CostCentreUUID can specify the cost center to which the fixed asset is assigned, and is optional. CostCentreUUID may be based on GDT UUID. CostCentreID is an identification, which can be unique, of the cost center to which the fixed asset is assigned. CostCentreID may be based on GDT OrganisationalCentreID.

All elements may be part of the organizational hierarchy, with the Segment at the top level and the CostCentre at the lowest level. The higher-level elements may be specified using this hierarchy defined in MOM. For example, if the ProfitCentreUUID element contains a UUID, then the SegmentUUID element may have to contain the UUID of the higher-level segment in MOM. Inbound Association Relationships may relate from the business object SegmentSegment/node Segment that Segment has a cardinality relationship of c:cn, as segment to which the fixed asset may be assigned; from business object ProfitCentre/node ProfitCentre that ProfitCentre has a cardinality relationship of c:cn, as profit center to which the fixed asset may be assigned; and from business object CostCentre/node CostCentre, CostCentre has a cardinality relationship of c:cn, as a cost center to which the fixed asset may be assigned.

A SetOfBooks can represent the valuation of a fixed asset based on a set of books. The node can contain dates relevant for the valuation of the fixed asset. The elements located directly at the SetOfBooks node may be defined by the data type FixedAssetSetOfBooksElements. These may include SetOfBooksID, FiscalYearVariantCode, CapitalizationDate, DeactivationDate, FirstAcquisitionDate, LastRetirementDate, LowValueAssetIndicator, Status and LifeCycleStatusCode. SetOfBooksID can specify the set of books on which the asset value may be based. SetOfBooksID may be based on GDT SetOfBooksID with no restrictions. FiscalYearVariantCode is a coded representation of the FiscalYearVariant according to whose fiscal year definition (begin, end, period definition) the FiscalYearID and the AccountingPeriodID in the sub nodes may be derived. FiscalYearVariantCode may be based on GDT FiscalYearVariantCode. CapitalizationDate is the reference date the fixed asset may have been capitalized in the fixed assets of the company, and is optional. CapitalizationDate may be based on GDT Date, Qualifier Capitalization. DeactivationDate is the date the fixed asset may have been removed from the fixed assets of the company, and is optional. DeactivationDate may be based on GDT Date, Qualifier Deactivation. FirstAcquisitionDate is date of the first acquisition posting on the fixed asset, and is optional. FirstAcquisitionDate may be based on GDT Date, Qualifier FirstAcquisition. LastRetirementDate is date of the last retirement posting in this valuation view, and is optional. LastRetirementDate may be based on GDT Date, Qualifier LastRetirement. LowValueAssetIndicator can specify if the fixed asset is valued as a low value asset or not, and is optional. LowValueAssetIndicator may be based on GDT LowValueAssetIndicator. Status may be based on IDT: FixedAssetSetOfBooksStatus. LifeCycleStatusCode can specify the lifecycle of an fixed asset. The status of all SetOfBooks nodes may be aggregated to the LifeCycleStatus in root node. LifeCycleStatusCode may be based on GDT FixedAssetLifeCycleStatusCode in review. The SetOfBooksValuation- View 89024 has a cardinality relationship of 1:n and is a composition relationship to subordinate nodes that may exist; Inbound Aggregation Relationships may relate from business object SetOfBooks/node SetOfBooks SetOfBooks has a cardinality relationship of 1:cn, as a valuation may relate to a SetOfBooks based on whose specifications the values are calculated. Enterprise Service Infrastructure Actions may include CheckLifeCycle (S&AM checkaction) which is no real ESI-action in some implementations. Furthermore disabled can be true, finalized can be true. The CheckLifeCycle action can determine the lifecycle status of a fixed asset and may have the following attributes: Preconditions that result from Status & Action Management: The status variable LifeCycle may have the value pending or acquired or capitalized or retired. Changes to the status: The status variable LifeCycle can contain the value pending or acquired or capitalized or retired. The action may be performed on one or multiple node instances. Usage: This action may not be performed by any service consumers.

A SetOfBooksValuationView can represent the valuation of a fixed asset based on a valuation method. The node can contain parameters (constant over time) that may be required for calculating the value of a fixed asset. The elements located directly at the SetOfBooksValuationView node may be defined by the data type FixedAssetSetOfBooksValuationViewElements. These are: SetOfBooksAssetValuationViewUUID, SetOfBooksAssetValuationViewID, OrdinaryDepreciationStartDate, SpecialDepreciationStartDate, InterestStartDate, FiscalYearVariantCode, ChangeoverFiscalYearID, ChangeoverCalculationPeriodID, ReplacementIndexSeriesCode, AgeIndexSeriesCode and AmountSignCheckExecutionCode. SetOfBooksAssetValuationViewUUID is an universal identification, which can be unique, of the SetOfBooksAssetValuationView used for valuation of the fixed asset. SetOfBooksAssetValuationViewUUID may be based on GDT UUID. SetOfBooksAssetValuationViewID is an identification of the SetOfBooksAssetValuationView used for valuation of the fixed asset. SetOfBooksAssetValuationViewID may be based on GDT SetOfBooksAssetValuationViewID. OrdinaryDepreciationStartDate is date on which the calculation of ordinary depreciation begins for the asset value, and is optional. OrdinaryDepreciationStartDate may be based on GDT Date and Qualifier Start. SpecialDepreciationStartDate is date on which the calculation of the special depreciation begins for the asset value, and is optional. SpecialDepreciationStartDate may be based on GDT Date, Qualifier Start. InterestStartDate is a date on which the calculation of interest begins for the asset value, and is optional. InterestStartDate may be based on GDT Date and has a Qualifier Start. FiscalYearVariantCode is a coded representation of the FiscalYearVariant according to whose fiscal year definition (begin, end, period definition) the ChangeOverFiscalYearID and the ChangeOverCalculationPeriodID are derived. FiscalYearVariantCode may be based on GDT FiscalYearVariantCode. ChangeoverFiscalYearID is identification of the fiscal year in which the changeover of the calculation method for ordinary depreciation took place (for example, changeover from declining-balance depreciation to straight-line depreciation), and is optional. ChangeoverFiscalYearID may be based on GDT FiscalYearID and has a Qualifier Changeover. ChangeoverCalculationPeriodID is identification of the calculation period in which the changeover of the calculation method for ordinary depreciation took place (for example, changeover from declining-balance depreciation to straight-line depreciation), and is optional. ChangeoverCalculationPeriodID may be based on GDT FixedAssetCalculationPeriodID and have a Qualifier Changeover. ReplacementIndexSeriesCode is Coded representation of the index series that is used for calculating the replacement value of the fixed asset, and is optional. ReplacementIndexSeriesCode may be based on GDT IndexSeriesCode, Qualifier Replacement with no restrictions. AgeIndexSeriesCode is a coded representation of the age index series that is used for calculating the replacement value of the fixed asset, and is optional. AgeIndexSeriesCode may be based on GDT IndexSeriesCode and has a Qualifier Age with no restriction. AmountSignCheckExecutionCode is a coded representation of the rule how the positive/negative sign of the valuation view should be checked for amounts. AmountSignCheckExecutionCode may be based on GDT FixedAssetValuationViewAmountSignCheckExecutionCode. The positive/negative signs may be a part of the configuration of the valuation view. They can specify which positive/negative sign may be used for amount of particular asset value types. For example, ordinary depreciation amount, amount of the acquisition and production costs and so on. The following composition relationships to subordinate nodes may exist: SetOfBooksValuationViewParameters has a cardinality relationship of 1:n (Filtered), where the filter elements may be defined by the data type FiscalYearAccountingPeriodFilterElements, for example ValidityDate which is optional and may be based on GDT Date and has a Qualifier Validity. ValidityDate is date on which the valuation parameters may be valid. The validity date lies within a SetOfBooksValuationViewParametersValidityPeriod. If the date is not set, no filter is applied in some implementations; SetOfBooksValuationViewLineItem 89026 has a cardinality relationship of 1:cn (Filtered), where the filter elements may be defined by the data type FiscalYearAccountingPeriodFilterElements, for example FiscalYearID, which is optional and may be based on GDT FiscalYearID and AccountingPeriodID which is optional and may be based on GDT AccountingPeriodID; SetOfBooksValuationViewPeriodTotal has a cardinality relationship of 1:cn (Filtered), where the filter elements may be defined by the data type FiscalYearAccountingPeriodFilterElements, for example FiscalYearID which is optional and may be based on GDT FiscalYearID and AccountingPeriodID which is optional and may be based on GDT AccountingPeriodID; SetOfBooksValuationViewPeriodBalance has a cardinality relationship of 1:cn (Filtered), where the filter elements are defined by the data type FiscalYearAccountingPeriodFilterElements, for example FiscalYearID, which is optional and may be based on GDT FiscalYearID and AccountingPeriodID, which is optional and may be based on GDT AccountingPeriodID; SetOfBooksValuationViewPlannedValueAdjustments 89034 has a cardinality relationship of 1:cn; SetOfBooksValuationViewDueValueAdjustments 89038 has a cardinality relationship of 1:cn; SetOfBooksValuationViewValuesTotal 89040 has a cardinality relationship of 1:cn (Filtered), where the filter elements may be defined by the data type FiscalYearAccountingPeriodFilterElements, for example FiscalYearID which is optional and may be based on GDT FiscalYearID and AccountingPeriodID which is optional and may be based on GDT AccountingPeriodID; and SetOfBooksValuationViewValuesBalance 89042 has a cardinality relationship of 1:cn (Filtered), where the filter elements may be defined by the data type FiscalYearAccountingPeriodFilterElements, for example FiscalYearID which is optional and may be based on GDT FiscalYearID and AccountingPeriodID which is optional and may be based on GDT AccountingPeriodID. Enterprise Service Infrastructure Actions may include RecalculateValueAdjustments, an action that can recalculate all planned and due value adjustments for a valuation view. RecalculateValueAdjustments action may have the following attributes: Preconditions: The fixed asset may be active. Changes in the object: The action can calculate the planned and due value adjustments for open fiscal years for the valuation view in the nodes SetOfBooksValuationView-PlannedValueAdjustments and SetOfBooksValuationView-DueValueAdjustments. The action can be used by the BO FixedAsset itself if one or more valuation parameters were changed in the nodes SetOfBooksValuationView or SetOfBooksValuationViewParameters 89028 in some implementations. A user can carry out an action in the UI if the configuration of the valuation parameters was changed in some implementations. Inbound Aggregation Relationships may relate from business object SetOfBooks/node AssetValuationView, SetOfBooksAssetValuationView has a cardinality relationship of 1:cn, as a valuation that can relate to a set of specifications structuring a body of asset accounting records sharing one common valuation view.

Queries can include QueryBySetOfBooksValuationViewID, which can provide a list of fixed asset valuation views of the assets that meet the selection criteria. The query elements are defined by the data type FixedAssetSetOfBooksValuationViewSetOfBooks-ValuationViewIDElements. These elements are FixedAssetUUID, FixedAssetMasterFixedAssetID, FixedAssetID, FixedAssetCompanyUUID, FixedAssetCompanyID, SetOfBooksSetOfBooksID, SetOfBooksAssetValuationViewUUID and SetOfBooksAssetValuationViewID. FixedAssetUUID is optional and may be based on GDT UUID. FixedAssetMasterFixedAssetID is optional and may be based on GDT MasterFixedAssetID. FixedAssetID is optional and may be based on GDT FixedAssetID. FixedAssetID can be used in selection to distinguish between main assets and sub-assets. FixedAssetCompanyUUID is optional and may be based on GDT UUID. FixedAssetCompanyID is optional and may be based on GDT OrganisationalCentreID. SetOfBooksSetOfBooksID is optional and may be based on GDT SetOfBooksID. SetOfBooksAssetValuationViewUUID is optional and may be based on GDT UUID. SetOfBooksAssetValuationViewID is optional and may be based on GDT SetOfBooksAssetValuationViewID.

SetOfBooksValuationViewParameters can be time-dependent valuation parameters that may be required for determining the value of a fixed asset. The elements located directly at the SetOfBooksValuationViewParameters node may be defined by the data type FixedAssetSetOfBooksValuationViewParametersElements. These can include ValidityPeriod, DepreciationCalculationProcedureCode, ImputedInterestCalculationMethodCode, UsefulLifeFiscalYearsTotalNumberValue, UsefulLifeAccountingPeriodsTotalNumberValue, VariableDepreciationPortionPercent, ScrapValueAmount, ScrapValuePercent, ShutDownIndicator and ShiftFactorDecimalValue. ValidityPeriod can specify the validity period of the valuation parameters and may be based on GDT CLOSED_DatePeriod, Qualifier Validity. DepreciationCalculationProcedureCode is a coded representation of the procedure for calculating depreciation for the fixed asset and may be based on GDT DepreciationCalculationProcedureCode with no restrictions. ImputedInterestCalculationMethodCode is a coded representation of the procedure for calculating interest for the fixed asset, and is optional. ImputedInterestCalculationMethodCode may be based on GDT FixedAssetImputedInterestCalculationMethodCode with no restrictions. UsefulLifeFiscalYearsTotalNumberValue is a planned useful life of the fixed asset in number of fiscal years and may be based on GDT TotalNumberValue. UsefulLifeAccountingPeriodsTotalNumberValue is a planned useful life of the fixed asset in number of accounting periods and may be based on GDT TotalNumberValue. VariableDepreciationPortionPercent is a percentage of the portion of depreciation that is dependent on use, and is optional and may be based on GDT Percent and has a Qualifier Portion. ScrapValueAmount is the value of the asset after the expiration of the useful life, and is optional and may be based on GDT Amount, Qualifier ScrapValue. ScrapValuePercent is the value of the asset after the expiration of the useful life as a percentage of the acquisition and production costs, and is optional and may be based on GDT Percent, Qualifier ScrapValue. ShutDownIndicator is an indicator if the asset is shutdown in this valuation view or not, and is optional and may be based on GDT ShutDownIndicator. ShiftFactorDecimalValue can specify if the asset is used in multiple shifts, and if so, the number of shifts, and is optional and may be based on GDT DecimalValue.

SetOfBooksValuationViewLineItem can be a line item representing a record of a period total for the value of a change in asset values resulting from a single business transaction. The elements located directly at the SetOfBooksValuationViewLineItem node may be defined by the data type FixedAssetSetOfBooksValuationViewLineItemElements. These may include UUID, SegmentUUID, ProfitCentreUUID, PartnerCompanyUUID, PartnerSegmentUUID, PartnerProfitCentreUUID, AccountingDocumentUUID, AccountingDocumentID, AccountingDocumentItemID, OriginalEntryDocumentContainingObjectReference, OriginalEntryTransactionUUID, OriginalEntryDocumentReference, OriginalEntryDocumentItemReference, OriginalEntryDocumentItemTypeCode, OriginalEntryDocumentPartnerID, AccountingNotificationUUID, AccountingNotificationItemGroupItemUUID, GeneralLedgerAccountLineItemUUID, GeneralLedgerAccountLineItemAccountingDocumentItemGroupID, OffsettingSubledgerAccountUUID, OffsettingSubledgerAccountTypeCode, SystemAdministrativeData, ChartOfAccountsCode, ChartOfAccountsItemCode, AccountingBusinessTransactionTypeCode, TypeCode, AccountingDocumentTypeCode, AccountingDocumentNote, AccountingDocumentItemNote, ProductTaxAccountingDocumentItemGroupID, ProductTaxTypeCode, ProductTaxDueCategoryCode, ProductTaxEventTypeCode, ProductTaxRateTypeCode, ProductTaxCountryCode, WithholdingTaxTypeCode, WithholdingTaxEventTypeCode, WithholdingTaxRateTypeCode, WithholdingTaxCountryCode, PostingDate, OriginalEntryDocumentDate, AccountingBusinessTransactionDate, CurrencyConversionDate, FiscalYearID, AccountingPeriodID, AccountingClosingStepCode, AccountingDocumentItemAccountingGroupID, GeneralLedgerMovementTypeCode, DebitCreditCode, CancellationDocumentIndicator, CancellationOriginalEntryDocumentContainingBusinessObjectReference, CancellationOriginalEntryDocumentReference, CancellationOriginalEntryDocumentTransactionUUID, CancelledIndicator, CashDiscountDeductibleIndicator, BusinessTransactionCurrencyAmount, LocalCurrencyAmount, SetOfBooksCurrencyAmount, HardCurrencyAmount, IndexBasedCurrencyAmount, MovementCategoryCode, SubledgerInternalIndicator, IndividualMaterialUUID, OffsettingMaterialUUID, ValueCalculationReferenceDate and OriginalValueCalculationReferenceDate.

UUID is an universal identification, which can be unique, identification of the LineItem and may be based on GDT UUID. SegmentUUID is an universal identification, which can be unique, of the Segment to which the value of the LineItem may be allocated, and is optional. SegmentUUID may be based on GDT UUID. ProfitCentreUUID is an universal identification, which can be unique, of the ProfitCentre to which the value of the LineItem may be allocated, and is optional. ProfitCentreUUID may be based on GDT UUID. PartnerCompanyUUID is an universal identification, which can be unique, of a company that can act in the business transaction stated in the LineItem as an intra corporate partner, and is optional. PartnerCompanyUUID may be based on GDT UUID. PartnerSegmentUUID is an universal identification, which can be unique, of a Segment that can act in the business transaction stated in the LineItem as an intra corporate partner, and is optional. PartnerSegmentUUID may be based on GDT UUID. PartnerProfitCentreUUID is an universal identification, which can be unique, of a ProfitCentre that can act in the business transaction stated in the LineItem as an intra corporate partner, and is optional. PartnerProfitCentreUUID may be based on GDT UUID. AccountingDocumentUUID is an universal identification, which can be unique, of the AccountingDocument that can record the entire business transaction in Accounting. AccountingDocumentUUID may be based on GDT UUID.

AccountingDocumentID is an identification, which can be unique, of the AccountingDocument that can record the entire business transaction in Accounting. AccountingDocumentID may be based on GDT BusinessTransactionDocumentID. AccountingDocumentItemID is an identification, which can be unique, of the corresponding AccountingDocumentItem in the AccountingDocument which can record the value change according to the criteria of GeneralLedger. AccountingDocumentItemID may be based on GDT BusinessTransactionDocumentItemID.OriginalEntryDocumentContainingObjectReference can be reference to an Object containing the Original Entry Document. OriginalEntryDocumentContainingObjectReference may be based on GDT ObjectNodeReference, Qualifier OriginalEntryDocumentContaining. OriginalEntryTransactionUUID is an universal identifier, which can be unique, of the transaction during which the Original Entry Document may have been created or changed. OriginalEntryTransactionUUID may be based on GDT UUID. OriginalEntryDocumentReference is reference to the document, that can keep the original entry of the business transaction. OriginalEntryDocumentReference may be based on GDT ObjectNodeReference. OriginalEntryDocumentItemReference can be reference to an item of the OriginalEntryDocument. The value change recorded in the [SubledgerAccount] Item can be verified by that item of the OriginalEntryDocument. OriginalEntryDocumentItemReference may be based on GDT ObjectNodeReference. OriginalEntryDocumentItemTypeCode is a coded representation of the Item Type of the referred OriginalEntryDocumentItem, and is optional. OriginalEntryDocumentItemTypeCode may be based on GDT BusinessTransactionDocumentItemTypeCode. This element can be used, if the Original Entry Document is a Business Transaction Document.

OriginalEntryDocumentPartnerID is identification of the Original Entry Document as assigned by the business partner. (For example, the ID of the Supplier Invoice assigned by the Supplier), and is optional. OriginalEntryDocumentPartnerID may be based on GDT: BusinessTransactionDocumentID. This element can be used, if the Original Entry Document is a Business Transaction Document and if the Original Entry Document is identical to the Original Entry Document Containing Object. AccountingNotificationUUID is an universal identification, which can be unique, of the notification sent to Financial Accounting about the business transaction stated in the LineItem, and is optional. AccountingNotificationUUID may be based on GDT UUID. AccountingNotificationItemGroupItemUUID is an universal identification, which can be unique, of the Accounting Notification Item Group Item, which might have triggered the posting of this lineItem, and is optional. AccountingNotificationItemGroupItemUUID may be based on GDT UUID. GeneralLedgerAccountLineItemUUID is an universal identification, which can be unique, of a LineItem of a GeneralLedgerAccount that can record the value change of the FixedAsset line item in the GeneralLedger. GeneralLedgerAccountLineItemUUID may be based on GDT UUID. GeneralLedgerAccountLineItemAccountingDocumentItemGroupID is an universal identification, which can be unique, of the group of all AccountingDocumentItems that may be summarized together in a GeneralLedgerAccountLineItem. The LineItem can correspond to one AccountingDocumentItem belonging to the group. GeneralLedgerAccountLineItemAccountingDocumentItemGroupID may be based on GDT BusinessTransactionDocumentItemGroupID.

OffsettingSubledgerAccountUUID is an universal identification, which can be unique, of a SubledgerAccount (such as a FixedAsset) in whose LineItems the inverse representation of the business transaction may be stated. OffsettingSubledgerAccountUUID may be based on GDT UUID. OffsettingSubledgerAccountTypeCode is a coded representation of the type of the OffsettingSubledgerAccount to which the line item may refer.

OffsettingSubledgerAccountTypeCode may be based on GDT SubledgerAccountTypeCode where restrictions at the code value 1 (FixedAsset) can occur. SystemAdministrativeData is administrative data stored in a system This data can include the system user and change time. SystemAdministrativeData may be based on GDT SystemAdministrativeData. ChartOfAccountsCode is a coded representation of the ChartOfAccounts containing the ChartOfAccountsItem that can classify—for general ledger accounting purposes—the value stated in the LineItem. ChartOfAccountsCode may be based on GDT ChartOfAccountsCode. ChartOfAccountsItemCode is a coded representation of a ChartOfAccountsItem that can classify for general ledger accounting purposes—the value stated in the LineItem. ChartOfAccountsItemCode may be based on GDT ChartOfAccountsItemCode. AccountingBusinessTransactionTypeCode is a coded representation of the type of the business transaction stated in the FixedAsset line item. It can classify the business transaction according to accounting criteria. AccountingBusinessTransactionTypeCode may be based on GDT AccountingBusinessTransactionTypeCode.

TypeCode is a coded representation of the type of the LineItem. TypeCode may be based on GDT SubledgerAccountLineItemTypeCode where restrictions at the code values 1000 to 1999 can occur. AccountingDocumentTypeCode is a coded representation of the type of the AccountingDocument to which the LineItem may refer by the AccountingDocumentReference. AccountingDocumentTypeCode may be based on GDT AccountingDocumentTypeCode. AccountingDocumentNote is natural-language comment that can apply the AccountingDocument referred via the AccountingDocumentReference—as a whole rather than to individual items, and is optional. AccountingDocumentNote may be based on GDT SHORT_Note. AccountingDocumentItemNote is natural-language comment pertaining to the AccountingDocumentItem to which the LineItem may refer by the AccountingDocumentReference, and is optional. AccountingDocumentItemNote may be based on GDT SHORT_Note. ProductTaxAccountingDocumentItemGroupID is an identification, which can be unique, of the group of all items of an AccountingDocument that may be tax relevant or tax items and have the same taxation. ProductTaxAccountingDocumentItemGroupID may be based on GDT BusinessTransactionDocumentItemGroupID. ProductTaxTypeCode can denote the product tax type to which the recorded data may relate, and is optional. ProductTaxTypeCode may be based on GDT TaxTypeCode. ProductTaxDueCategoryCode can denote the category (receivable or payable) of a tax due to which the recorded data may relate, and is optional. ProductTaxDueCategoryCode may be based on GDT DueCategoryCode. ProductTaxEventTypeCode can denote the product tax event to which the recorded data may relate, and is optional. ProductTaxEventTypeCode may be based on GDT ProductTaxEventTypeCode. ProductTaxRateTypeCode can denote the type of product tax rate to which the recorded data may relate, and is optional. ProductTaxRateTypeCode may be based on GDT TaxRateTypeCode. ProductTaxCountryCode is the country to whose tax authority the product tax data may have been or may be reported, and is optional. ProductTaxCountryCode may be based on GDT CountryCode. WithholdingTaxTypeCode can denote the withholding tax type to which the recorded data may relate, and is optional. WithholdingTaxTypeCode may be based on GDT TaxTypeCode. WithholdingTaxEventTypeCode-Optional can denote the witholding tax event to which the recorded data may relate, and is optional. WithholdingTaxEventTypeCode is optional may be based on GDT WithholdingTaxEventTypeCode.

WithholdingTaxRateTypeCode can denote the type of withholding tax rate to which the recorded data may relate, and is optional. WithholdingTaxRateTypeCode may be based on GDT TaxRateTypeCode. WithholdingTaxCountryCode is the country to whose tax authority the withholding tax data may have been or may be reported, and is optional. WithholdingTaxCountryCode may be based on GDT CountryCode. PostingDate is the date with which the business transaction can be effectively recorded in Accounting. Effectively can mean that period's totals and balances in accounting may be updated with this date. PostingDate may be based on GDT Date and has a Qualifier Posting. OriginalEntryDocumentDate is the issue date of the Original Entry Document and may be based on GDT Date, Qualifier OriginalEntryDocument. AccountingBusinessTransactionDate is the date at which the business transaction may have taken place applying the criteria of Accounting and may be based on GDT Date, Qualifier BusinessTransaction. CurrencyConversionDate is the date that may be used for the currency translation applied to amounts in the accounting document, and is optional. CurrencyConversionDate may be based on GDT Date and has a Qualifier CurrencyConversion. FiscalYearID is the identification of the fiscal year in which the LineItem can be posted and may be based on GDT FiscalYearID. AccountingPeriodID is the identification of the accounting period in which the LineItem can be posted and may be based on GDT AccountingPeriodID. AccountingClosingStepCode is the coded representation of the closing step of the accounting document, and is optional. AccountingClosingStepCode may be based on GDT AccountingClosingStepCode. AccountingDocumentItemAccountingGroupID is an identification, which can be unique, of a group of AccountingDocumentItems belonging together applying the criteria of Accounting. It can be used to indicate the items of an AccountingDocument that belong together e.g. in partial zero-balance checking within the Accounting Document. AccountingDocumentItemAccountingGroupID may be based on GDT BusinessTransactionDocumentItemGroupID. An example is an activity confirmation that may contain items for actual working times and also for spare parts used for the service, The created AccountingDocumentItems may be grouped together according to the spare part or working time confirmation they belong to.

GeneralLedgerMovementTypeCode is the coded representation of the type of movement with which the value change may be recorded for GeneralLedger purposes in the GeneralLedgerAccount, and is optional. GeneralLedgerMovementTypeCode may be based on GDT GeneralLedgerMovementTypeCode with no restrictions. DebitCreditCode is the coded representation of debit or credit. It can specify whether the line item may be assigned to the debit or credit side of the GeneralLedger account. DebitCreditCode may be based on GDT DebitCreditCode. CancellationDocumentIndicator can indicate whether the AccountingDocument to which the LineItem refers by the AccountingDocumentReference may refer to a cancellation document, and is optional. CancellationDocumentIndicator may be based on GDT Indicator, Qualifier CancellationDocument. CancellationOriginalEntryDocumentContainingBusinessObjectReference is reference to the Business Object containing the OriginalEntryDocument that cancelled this LineItem, and is optional. CancellationOriginalEntryDocumentContainingBusinessObjectReference may be based on GDT ObjectNodeReference Qualifier CancellationOriginalEntryDocumentContaining. CancellationOriginalEntryDocumentReference is reference to the OriginalEntryDocument, that cancelled this line item, and is optional. CancellationOriginalEntryDocumentReference may be based on GDT ObjectNodeReference, Qualifier OriginalEntryDocument. CancellationOriginalEntryDocumentTransactionUUID is an universal identifier, which can be unique, of the transaction during which the CancellationOriginalEntryDocument may have been created or changed, and is optional. CancellationOriginalEntryDocumentTransactionUUID may be based on GDT UUID. CancelledIndicator can indicate if the line item has been cancelled, and is optional. CancelledIndicator may be based on GDT Indicator and has a Qualifier Cancelled. CashDiscountDeductibleIndicator can indicate whether a cash discount can be deducted from the LineItem, and is optional. CashDiscountDeductibleIndicator may be based on GDT Indicator and has a Qualifier CashDiscountDeductible.

BusinessTransactionCurrencyAmount is the value of the LineItem in transaction currency, and is optional. The transaction currency can be the currency agreed on by two business partners for their business relationship. BusinessTransactionCurrencyAmount may be based on GDT Amount. Qualifier BusinessTransactionCurrency. LocalCurrencyAmount is the value of the LineItem in the local currency of the Company carrying the account. The local currency may be the currency in which the local books are kept. LocalCurrencyAmount may be based on GDT Amount and has a Qualifier LocalCurrency. SetOfBooksCurrencyAmount is the value of the LineItem in the currency selected for the set of books, and is optional. SetOfBooksCurrencyAmount may be based on GDT Amount and has a Qualifier SetOfBooksCurrency. HardCurrencyAmount is the value of the LineItem, in the hard currency of the country of the Company carrying the account, and is optional. The hard currency can be a stable, country-specific currency that may be used in high-inflation countries. HardCurrencyAmount may be based on GDT Amount and has a Qualifier HardCurrency. IndexBasedCurrencyAmount is the value of the LineItem in the index-based currency of the country of the Company carrying the account, and is optional. The index-based currency can be a fictitious, country-specific currency that may be used in high-inflation countries as a comparison currency for reporting. IndexBasedCurrencyAmount may be based on GDT Amount, Qualifier IndexedBasedCurrency. The following section can refer to the node FixedAssetItem of the business object AccountingDocument. MovementCategoryCode is category of the movement on the fixed asset the line item can represent. MovementCategoryCode may be based on DT: FixedAssetMovementCategoryCode.

SubledgerInternalIndicator can indicate if the line items exists in the FixedAsset subledger or not, and is optional. SubledgerInternalIndicator may be based on GDT InternalIndicator. IndividualMaterialUUID is an universal identification, which can be unique, of an individual material that may be moved by a business transaction, and which can trigger a value change in fixed assets, and is optional. IndividualMaterialUUID may be based on GDT UUID. OffsettingMaterialUUID is an universal identification, which can be unique, of an individual material that may moved by a business transaction and that can trigger a value changes in the fixed asset and the partner fixed asset, and is optional. OffsettingMaterialUUID may be based on GDT UUID. ValueCalculationReferenceDate is reference date for the asset value calculation. ValueCalculationReferenceDate may be based on GDT Date, Qualifier ValueCalculationReference. OriginalValueCalculationReferenceDate refers to original reference date for the asset value calculation, and is optional. OriginalValueCalculationReferenceDate may be based on GDT Date, Qualifier ValueCalculationReference.

Inbound Aggregation Relationships may relate from business object Company/Company, Partner Company has a cardinality relationship of c:cn, as a company that can act in the business transaction stated in the LineItem as an intra corporate partner; from business object Segment/Segment, Segment has a cardinality relationship of c:cn, as a segment to which the value and quantity of the LineItem may be allocated and PartnerSegment has a cardinality relationship of c:cn, as a Segment that can act in the business transaction stated in the LineItem as a Partner; from business object ProfitCentre/ProfitCentre, as a ProfitCentre has a cardinality relationship of c:cn, as a ProfitCentre to which the value and quantity of the LineItem may be allocated and PartnerProfitCentre has a cardinality relationship of c:cn, as a ProfitCentre that can act in the business transaction stated in the LineItem as an intra corporate partner. In cases where OriginalEntryDocument equals OriginalEntryContainingObject, for example, from business object AccountingEntry/node AccountingEntry AccountingEntry has a cardinality relationship of c:cn, as an AccountingEntry that can keep the original entry of the business transaction stated in the LineItem. In cases where OriginalEntryDocument OriginalEntryContainingObject for example, from MDRO FixedAssetDepreciationRun/node LogSection has a cardinality relationship of c:cn, FixedAssetDepreciationRunLogSection, as a FixedAssetDepreciationRunLogSection that can keep the original entry of the business transaction stated in the LineItem; from MDRO GoodsReceiptInvoiceReceiptClearingRun/node LogSection has a cardinality relationship of c:cn, GoodsReceiptInvoiceReceiptClearingRunLogSection, as a GoodsReceiptInvoiceReceiptRunLogSection that can keep the original entry of the business transaction stated in the LineItem. There may exist an Integrity condition that one of the above relationships to an Original Entry Document and to an Original EntryDocument Item may exist. If the Original Entry Document may not be identical to a Business Object but contained in it then the corresponding relationship to this Business Object may exist, too, in some implementations; for Cancellation, in cases where CancellationOriginalEntryDocument equals OriginalEntryContainingObject, for example.

There may exist Inbound Aggregation Relationships that may further relate: from business object AccountingEntry/node AccountingEntry, CancellationAccountingEntry has a cardinality relationship of c:cn, as an AccountingEntry that can keep the original entry of the business transaction stated in the LineItem. In cases where OriginalEntryDocument OriginalEntryContainingObject for example, from MDRO FixedAssetDepreciationRun/node LogSection has a cardinality relationship of c:cn, CancellationFixedAssetDepreciationRunLogSection, as a FixedAssetDepreciationRunLogSection that can keep the original entry of the business transaction for the cancellation of this LineItem; from MDRO GoodsReceiptInvoiceReceiptClearingRun/node LogSection has a cardinality relationship of c:cn, CancellationGoodsReceiptInvoiceReceiptClearingRunLogSection, as a GoodsReceiptInvoiceReceiptRunLogSection that can keep the original entry of the business transaction for the cancellation of this LineItem; from the business object FixedAsset/node FixedAsset, OffsettingFixedAsset has a cardinality relationship of c:cn, as a line item can relate an offsetting FixedAsset to which the line item is to be assigned; from the business object FixedAsset/node AssociatedIndividualMaterial, AssociatedIndividualMaterial has a cardinality relationship of c:cn, as the individual material associated to the asset. The business transaction relates to this individual material, OffsettingIndividualMaterial c:cn, as the individual material associated to the offsetting fixed asset. The business transaction may relate to this individual material.

Constraints with the maximums to the relationships can exist as follows: from business object SupplierInvoice/node SupplierInvoiceItem, SupplierInvoiceItem has a cardinality relationship of c:cn (Cross DU), as a reference to the item of the business transaction document: A line item can result from an invoice receipt; from business object CustomerInvoice/node CustomerInvoiceItem, CustomerInvoiceItem has a cardinality relationship of c:cn (Cross DU), as a reference to the item of the business transaction document: A line item can result from an outgoing invoice; from business object GoodsAndServiceAcknowledgement/node Item, GoodsAndServiceAcknowledgement has a cardinality relationship of c:cn (Cross DU), as a reference to the business transaction document: A line item can be generated by a business transaction that may have originally been recorded in a GoodsAndServiceAcknowledgement; from business object SiteLogisticsConfirmation node InventoryChangeItem, SiteLogisticsConfirmationInventoryChangeItem has a cardinality relationship of c:cn (Cross DU), as a reference to the item of the business transaction document: A line item can be generated by a business transaction that may have originally been recorded in a node InventoryChangeItem of BO SiteLogisticsConfirmation (Projection of LogisticsConfirmation_Template).

Inbound Association Relationships for Navigation may relate: to the business object AccountingDocument/node AccountingDocument, AccountingDocument has a cardinality relationship of 1:cn, as the accounting document that can record the entire business transaction in Accounting; and to business object GeneralLedgerAccount/node LineItem, GeneralLedgerAccountLineItem has a cardinality relationship of 1:cn, as a LineItem of a GeneralLedgerAccount that can record the value change for GeneralLedger purposes. Inbound Association Relationships may relate: from business object AccountingNotification/node AccountingNotification, AccountingNotification has a cardinality relationship of c:cn, as the notification that may have been sent to Financial Accounting about the business transaction stated in the LineItem; from business object AccountingNotification/node AccountingNotificationItemGroupItem, AccountingNotificationItemGroupItem has a cardinality relationship of c:cn, as a LineItem may originate as a result of a business transaction that may have been represented in an AccountingNotification; from business object Identity/node Identity, CreationIdentity has a cardinality relationship of 1:cn, as the system user Identity who may have created the LineItem and LastChangeIdentity has a cardinality relationship of c:cn, as the system user Identity who may have last changed the LineItem.

Queries may include QueryByAccountingDocumentID, QueryByOriginalEntryDocumentID and QueryByAccountingPeriodID. QueryByAccountingDocumentID query can deliver a list of SetOfBooksValuationViewLineItem that may have a semantic key agreeing entirely (or in the specified part) with the query parameters. The query elements are defined by the data type FixedAssetSetOfBooksValuationViewLineItemAccounting-DocumentIDQueryElements. These elements can include: AccountingDocumentID, which is optional and may be based on GDT BusinessTransactionDocumentID, FixedAssetCompanyUUID, which is optional and may be based on GDT UUID, FixedAssetCompanyID, which is optional and may be based on GDT OrganisationalCentreID, FiscalYearID which is optional and may be based on GDT FiscalYearID, SetOfBooksSetOfBooksID, which is optional and may be based on GDT SetOfBooksID. QueryByOriginalEntryDocumentID query can deliver a list of SetOfBooksValuationViewLineItem that were posted in Accounting as a result of the business transaction that may have been documented in the operational component with this original document. The query elements are defined by the data type FixedAssetSetOfBooksValuationViewLineItem-OriginalEntryDocumentIDQueryElements. These elements are: OriginalEntryDocumentID, which is optional and may be based on GDT BusinessTransactionDocumentID, OriginalEntryDocumentTypeCode, which is optional and may be based on GDT BusinessTransactionDocumentTypeCode and SetOfBooksSetOfBooksID, which is optional and may be based on GDT SetOfBooksID.

QueryByAccountingPeriodID can provide a list of all associated line items that may meet the selection criteria. The query elements may be defined by the data type FixedAssetSetOfBooksValuationViewLineItemAccountingPeriodIDQueryElements. These elements are: FixedAssetUUID, which is optional and may be based on GDT UUID. FixedAssetMasterFixedAssetID, which is optional and may be based on GDT MasterFixedAssetID. FixedAssetID, which is optional and may be based on GDT FixedAssetID. SetOfBooksSetOfBooksID, which is optional and may be based on GDT SetOfBooksID, SetOfBooksValuationViewSetOfBooksAssetValuationViewID, which is optional and may be based on GDT SetOfBooksAssetValuationViewID, SetOfBooksValuationViewSetOfBooksAssetValuationViewUUID, which is optional and may be based on GDT UUID, FiscalYearID, which is optional and may be based on GDT FiscalYearID and AccountingPeriodID, which is optional and may be based on GDT AccountingPeriodID.

SetOfBooksValuationViewPeriodTotal 89030 is a period total that can represent a period based record of the value changes of an asset for each valuation view. The elements located directly at the SetOfBooksValuationViewPeriodTotal node may be defined by the data type FixedAssetSetOfBooksValuationViewPeriodTotalElements. These are: FiscalYearID, AccountingPeriodID, SubledgerAccountLineItemTypeCode, LocalCurrencyAmount, SetOfBooksCurrencyAmount, HardCurrencyAmount and IndexBasedCurrencyAmount.FiscalYearID is an identification of the fiscal year for which the period total can keeps value and may be based on GDT FiscalYearID. AccountingPeriodID is an identification of the accounting period for which the period total can keep values and may be based on GDT AccountingPeriodID. SubledgerAccountLineItemTypeCode is a coded representation of the item type to which the period total may relate and may be based on GDT SubledgerAccountLineItemTypeCode, Restrictions: the code values 1000 to 1999 can occur.

LocalCurrencyAmount is the value of the period total in the local currency of the company. The local currency can be the currency in which the local books may be kept. LocalCurrencyAmount may be based on GDT Amount, Qualifier LocalCurrency. SetOfBooksCurrencyAmount is the value of the period total in the additional currency selected for the set of books, and is optional. SetOfBooksCurrencyAmount may be based on GDT Amount, Qualifier SetOfBooksCurrency. HardCurrencyAmount is the value of the period total in the hard currency of the country of the company, and is optional. The hard currency can be a stable, country-specific currency that may be used in high-inflation countries. HardCurrencyAmount may be based on GDT Amount, Qualifier HardCurrency. IndexBasedCurrencyAmount is the value of the period total in the index currency of the country of the company, and is optional. The index-based currency can be a fictitious, country-specific currency that may be used in high-inflation countries as a comparison currency for reporting. IndexBasedCurrencyAmount may be based on GDT Amount, Qualifier IndexBasedCurrency.

SetOfBooksValuationViewPeriodBalance 89032 is a period balance that can represent a period-based record of the value changes of an asset for each valuation view. The elements located directly at the SetOfBooksValuationViewPeriodBalance node may be defined by the data type FixedAssetSetOfBooksValuationViewPeriodBalanceElements. These are FiscalYearID, AccountingPeriodID, SubledgerAccountLineItemTypeCode, LocalCurrencyAmount, SetOfBooksCurrencyAmount, HardCurrencyAmount and IndexBasedCurrencyAmount. FiscalYearID is an identification of the fiscal year for which the period balance can keep values and may be based on GDT FiscalYearID. AccountingPeriodID is an identification of the accounting period for which the period balance can keep values and may be based on GDT AccountingPeriodID. SubledgerAccountLineItemTypeCode is a coded representation of the type of the line items whose amounts may be summarized in the period balance and may be based on GDT SubledgerAccountLineItemTypeCode, Restrictions: the code values 1000 to 1999 can occur.

LocalCurrencyAmount is the value of the period balance in the local currency of the company. The local currency can be the currency in which the local books may be kept. LocalCurrencyAmount may be based on GDT Amount; Qualifier LocalCurrency. SetOfBooksCurrencyAmount is the value of the period balance in the additional currency selected for the set of books, and is optional. SetOfBooksCurrencyAmount may be based on GDT Amount, Qualifier SetOfBooksCurrency. HardCurrencyAmount is the value of the period balance in the hard currency of the country of the company, and is optional. The hard currency can be a stable, country-specific currency that may be used in high-inflation countries. HardCurrencyAmount may be based on GDT Amount, Qualifier HardCurrency. IndexBasedCurrencyAmount is the value of the period balance in the index currency of the country of the company, and is optional. The index-based currency is a fictitious, country-specific currency that is used in high-inflation countries as a comparison currency for reporting. IndexBasedCurrencyAmount may be based on GDT Amount and have a Qualifier IndexBasedCurrency.

SetOfBooksValuationViewPlannedValueAdjustments can refer to planned value adjustments due to depreciation, interest or revaluation for calculation periods in the fiscal year. Planned value adjustments may have to be distinguished from actual value adjustments. Actual value adjustments can generate line items (SetOfBooksValuationViewLineItems) and may be recorded in the period total (SetOfBooksValuationViewPeriodTotal) node. The calculation periods may be derived from: the period limit of the time-dependent valuation parameters (SetOfBooksValuationViewParameters), the asset value date that may define the business transactions that change the asset balance, and the configuration (that may change mid-year) of the procedure for calculating depreciation or interest. The period can be spread over the whole year if none of these influences may be present in a fiscal year. A calculation period (FixedAssetCalculationPeriodID) may be the smallest unit of time for which value adjustments can be calculated. It may not have to be the same as the fiscal year period (AccountingPeriodID). The elements located directly at the SetOfBooksValuationViewPlannedValueAdjustments node are defined by the data type FixedAssetSetOfBooksValuationViewPlannedValueAdjustmentsElements. These are FiscalYearID, SubledgerAccountLineItemTypeCode, StartCalculationPeriodID, EndCalculationPeriodID, ExpiredUsefulLifeFiscalYearsTotalNumberValue, ExpiredUsefulLifeWeightedCalculationPeriodsDecimalValue and CalculationPeriodDuration.

FiscalYearID is an identification of the fiscal year for which the value adjustments may be planned and may be based on GDT FiscalYearID. SubledgerAccountLineItemTypeCode is a coded representation of the type of the line items that may have been used for the planned value adjustments in the periodic posting run in the accounting document. SubledgerAccountLineItemTypeCode may be based on GDT SubledgerAccountLineItemTypeCode, and there may exist restrictions that the allowed SubledgerAccountLineItemTypeCode may be from 1203 to 1209, periodically posted value adjustments of a fixed asset. StartCalculationPeriodID is an identification of the calculation period at the beginning of the considered time period and may be based on GDT FixedAssetCalculationPeriodID.EndCalculationPeriodID is an identification of the calculation period at the end of the considered time period and may be based on GDT FixedAssetCalculationPeriodID. ExpiredUsefulLifeFiscalYearsTotalNumberValue is the expired useful life at the end of the considered time period in number of fiscal years and may be based on GDT NumberValue and has a Qualifier Total. ExpiredUsefulLifeWeightedCalculationPeriodsDecimalValue is the expired useful life at the end of the considered time period in number of weighted calculation periods and may be based on GDT DecimalValue, Qualifier WeightedCalculationPeriods. CalculationPeriodDuration can specify the duration of a calculation period, and is optional. CalculationPeriodDuration may be based on GDT Duration, Qualifier CalculationPeriod. The SetOfBooksValuationViewPlannedValueAdjustmentsAmounts 89036 has a cardinality relationship of 1:n and composition relationship to subordinate nodes may exist.

SetOfBooksValuationViewPlannedValueAdjustmentsAmounts can refer to amounts of planned value adjustments. The amounts have different currency roles. All amounts of the node may be given in hard, index, local or set of books currency. Value adjustments may be given in reference to prior-year related asset transactions (e.g. acquisitions in closed fiscal years) or current-year related asset transactions (e.g. acquisitions in current fiscal year). The elements located directly at the SetOfBooksValuationViewPlannedValueAdjustmentsAmounts node may be defined by the data type FixedAssetSetOfBooksValuationViewPlannedValueAdjustmentsAmountsElements. These are: CurrencyRoleCode, CalculatedAmount, CurrentYearAcquisitionAndProductionCostsAmount, CurrentYearDownPaymentAmount, CurrentYearOrdinaryDepreciationAmount, CurrentYearSpecialDepreciationAmount, CurrentYearUnplannedDepreciationAmount, CurrentYearInterestAmount, CurrentYearTransferReservesAmount, CurrentYearRevaluationAmount, CurrentYearDepreciationRevaluationAmount, PreviousYearAcquisitionAndProductionCostsAmount, PreviousYearDownPaymentAmount, PreviousYearOrdinaryDepreciationAmount, PreviousYearSpecialDepreciationAmount, PreviousYearUnplannedDepreciationAmount, PreviousYearInterestAmount, PreviousYearTransferReservesAmount, PreviousYearRevaluationAmount, PreviousYearDepreciationRevaluationAmount, PreviousYearProportionalOrdinaryDepreciationAmount, PreviousYearProportionalSpecialDepreciationAmount, PreviousYearProportionalUnplannedDepreciationAmount, PreviousYearProportionalInterestAmount, PreviousYearProportionalTransferReservesAmount, PreviousYearProportionalRevaluationAmount and PreviousYearProportionalDepreciationRevaluationAmount.

CurrencyRoleCode is the coded representation of the role of the currency of the planned value adjustments. CurrencyRoleCode may be based on GDT CurrencyRoleCode, and there may exist Restrictions that the allowed values may be 3 HardCurrency, 4 IndexBasedCurrency, 6 LocalCurrency, 10 SetOfBooksCurrency. CalculatedAmount is the total amount of the value adjustment, and is optional and may be based on GDT Amount, Qualifier Calculated. CurrentYearAcquisitionAndProductionCostsAmount is the total amount of acquisition and production costs related to the current fiscal year that may be considered during calculations, and is optional. CurrentYearAcquisitionAndProductionCostsAmount may be based on GDT Amount and have a Qualifier AcquisitionAndProductionCosts. CurrentYearDownPaymentAmount is the total amount of down payments related to the current fiscal year that may be considered during calculations, and is optional. CurrentYearDownPaymentAmount may be based on GDT Amount and have a Qualifier DownPayment. CurrentYearOrdinaryDepreciationAmount is the total amount of ordinary depreciation determined for the current year that may be considered when calculating value adjustments, and is optional. CurrentYearOrdinaryDepreciationAmount may be based on GDT Amount and have a Qualifier OrdinaryDepreciation.

CurrentYearSpecialDepreciationAmount is the total amount of special depreciation related to prior fiscal years, determined for the current year, that may be considered when calculating value adjustments, and is optional. CurrentYearSpecialDepreciationAmount may be based on GDT Amount and has a Qualifier SpecialDepreciation. CurrentYearUnplannedDepreciationAmount is the total amount of unplanned depreciation related to prior fiscal years, determined for the current year, that may be considered when calculating value adjustments, and is optional. CurrentYearUnplannedDepreciationAmount may be based on GDT Amount, Qualifier UnplannedDepreciation. CurrentYearInterestAmount is the total amount of interest related to current fiscal years, determined for the current year, that may be considered when calculating value adjustments, and is optional. CurrentYearInterestAmount may be based on GDT Amount, Qualifier Interest. CurrentYearTransferReservesAmount is the total amount of transfer reserves determined for the current year to be considered when calculating value adjustments, and is optional. CurrentYearTransferReservesAmount may be based on GDT Amount, Qualifier Transferkeserves. CurrentYearRevaluationAmount is the total amount of revaluation related to the current fiscal year that may be considered during calculations, and is optional. CurrentYearRevaluationAmount may be based on GDT Amount, Qualifier Revaluation. CurrentYearDepreciationRevaluationAmount is the total amount of revaluation of depreciation related to prior fiscal years, determined for the current year, that may be considered when calculating value adjustments, and is optional. CurrentYearDepreciationRevaluationAmount may be based on GDT Amount, Qualifier Revaluation.

PreviousYearAcquisitionAndProductionCostsAmount is the total amount of acquisition and production costs related to previous years that may be considered during calculations, and is optional. CurrentYearDepreciationRevaluationAmount may be based on GDT Amount, Qualifier AcquisitionAndProductionCosts. PreviousYearDownPaymentAmount is the total amount of down payments related to previous years to be considered during calculations, and is optional. CurrentYearDepreciationRevaluationAmount may be based on GDT Amount, Qualifier DownPayment. PreviousYearOrdinaryDepreciationAmount is the total amount of ordinary depreciation related to previous years that may be considered when calculation value adjustments, and is optional. PreviousYearOrdinaryDepreciationAmount may be based on GDT Amount, Qualifier OrdinaryDepreciation. PreviousYearSpecialDepreciationAmount is the total amount of special depreciation related to previous years that may be considered when calculating value adjustments, and is optional. PreviousYearSpecialDepreciationAmount may be based on GDT Amount, Qualifier SpecialDepreciation. PreviousYearUnplannedDepreciationAmount is the total amount of unplanned depreciation related to previous years that may be considered when calculating value adjustments, and is optional. PreviousYearUnplannedDepreciationAmount may be based on GDT Amount, Qualifier UnplannedDepreciation. PreviousYearInterestAmount is the total amount of interest related to previous years that may be considered when calculating value adjustments, and is optional. PreviousYearInterestAmount may be based on GDT Amount, Qualifier Interest. PreviousYearTransferReservesAmount is the total amount of transfer reserves related to previous years that may be considered when calculating value adjustments, and is optional. PreviousYearTransferReservesAmount may be based on GDT Amount, Qualifier TransferReserves.

PreviousYearRevaluationAmount is the total amount of revaluation related to previous years that may be considered during calculations, and is optional. PreviousYearRevaluationAmount may be based on GDT Amount, Qualifier Revaluation. PreviousYearDepreciationRevaluationAmount is the total amount of revaluation of depreciation related to previous years that may be considered when calculating value adjustments, and is optional. PreviousYearDepreciationRevaluationAmount may be based on GDT Amount, Qualifier Revaluation. PreviousYearProportionalOrdinaryDepreciationAmount is the total amount of ordinary depreciation determined for the current year to be considered when calculating value adjustments, and is optional. PreviousYearProportionalOrdinaryDepreciationAmount may be based on GDT Amount, Qualifier OrdinaryDepreciation. PreviousYearProportionalSpecialDepreciationAmount is the total amount of special depreciation determined for the current year that may be considered when calculating value adjustments, and is optional. PreviousYearProportionalSpecialDepreciationAmount may be based on GDT Amount, Qualifier SpecialDepreciation. PreviousYearProportionalUnplannedDepreciationAmount is the total amount of unplanned depreciation determined for the current year that may be considered when calculating value adjustments, and is optional. PreviousYearProportionalUnplannedDepreciationAmount may be based on GDT Amount, Qualifier UnplannedDepreciation.

PreviousYearProportionalInterestAmount is the total amount of interest determined for the current year that may be considered when calculating value adjustments, and is optional. PreviousYearProportionalInterestAmount may be based on GDT Amount, Qualifier Interest. PreviousYearProportionalTransferReservesAmount is the total amount of transfer reserves determined for the current year that be considered when calculating value adjustments, and is optional. PreviousYearProportionalTransferReservesAmount may be based on GDT Amount, Qualifier TransferReserves. PreviousYearProportionalRevaluationAmount is the total amount of revaluation determined for the current year that may be considered when calculating value adjustments, and is optional. PreviousYearProportionalRevaluationAmount may be based on GDT Amount, Qualifier Revaluation. PreviousYearProportionalDepreciationRevaluationAmount is the total amount of revaluation determined for the current year that may be considered when calculating value adjustments, and is optional. PreviousYearProportionalDepreciationRevaluationAmount may be based on GDT Amount, Qualifier Revaluation.

SetOfBooksValuationViewDueValueAdjustments can refer to due value adjustments that may be posted from the depreciation run (BO FixedAssetDepreciationRun) to the general ledger during a fiscal year period. The elements located directly at the SetOfBooksValuationViewDueValueAdjustments node my be defined by the data type FixedAssetSetOfBooksValuationViewDueValueAdjustmentsElements. These can include FiscalYearID, AccountingPeriodID, SubledgerAccountLineItemTypeCode, (GDT SubledgerAccountLineItemTypeCode, LocalCurrencyAmount, SetOfBooksCurrencyAmount, HardCurrencyAmount and IndexBasedCurrencyAmount.

FiscalYearID is an identification of the fiscal year in which the value adjustments can be due and may be based on GDT FiscalYearID. AccountingPeriodID is an identification of the accounting period in which the value adjustments can be due and may be based on GDT AccountingPeriodID. SubledgerAccountLineItemTypeCode is a coded representation of the type of the line items of the due value adjustments in the accounting document and may be based on GDT SubledgerAccountLineItemTypeCode, Restrictions: The allowed SubledgerAccountLineItemTypeCode can be from 01203 to 01209 (periodic posted value adjustments of a fixed asset. LocalCurrencyAmount is the due amount in the local currency of the company. The local currency can be the currency in which the local books are kept. LocalCurrencyAmount may be based on GDT Amount, Qualifier LocalCurrency.

SetOfBooksCurrencyAmount is the value due amount in the additional currency that may be selected for the set of books, and is optional. SetOfBooksCurrencyAmount may be based on GDT Amount, Qualifier SetOfBooksCurrency- .HardCurrencyAmount is the due amount accrued in the hard currency of the country of the company, and is optional. The hard currency can be a stable, country-specific currency that may be used in high-inflation countries. HardCurrencyAmount may be based on GDT Amount, Qualifier HardCurrency. IndexBasedCurrencyAmount is the due amount accrued in the index currency of the country of the company, and is optional. The index-based currency may be a fictitious, country-specific currency that can be used in high-inflation countries as a comparison currency for reporting. IndexBasedCurrencyAmount may be used on GDT Amount, Qualifier IndexBasedCurrency.

Enterprise Service Infrastructure Actions can include PostDueValueAdjustments, an action that can post the due value adjustments to the general ledger. The PostDueValueAdjustments action may have the following attributes: Changes in the object where a new node SetOfBooksValuationViewLineItem can be created for each SetOfBooksValuationViewDueValueAdjustment node. The corresponding node DueValueAdjustment may be deleted; Changes in other objects where the fixed asset may be recorded in the log node Log in the FixedAssetDepreciationRun. A FixedAssetItem node can be created in the AccountingDocument. Parameters where the FixedAssetSetOfBooksValuationViewDueValueAdjustments-PostDueValueAdjustmentsActionElements may have the following attributes: MassDataRunObjectID, MassDataRunObjectTypeCode, CompanyUUID and SetOfBooksID. MassDataRunObjectID is an universal identification, which can be unique, for an Accounting Adjustment Run. MassDataRunObjectID may be based on GDT MassDataRunObjectID. MassDataRunObjectTypeCode is a coded representation of a type of the Mass Data Run Object. MassDataRunObjectTypeCode may be based on GDT MassDataRunObjectTypeCode. CompanyUUID is an universal identification, which can be unique, for the company, for which the action may be executed, and is optional. CompanyUUID can be transferred then when processing of the Accounting Adjustment Run is executed per company and set of books. CompanyUUID may be based on GDT UUID. SetOfBooksID is an identification, which can be unique, of the set of books, for which the action may be executed, and is optional. SetOfBooksID can be transferred when processing of the Accounting Adjustment Run is executed per company and set of books. SetOfBooksID may be based on GDT SetOfBooksID. Usage is where the action may be executed by the BO FixedAssetDepreciationRun.

Queries can include QueryByAccountingPeriodID, which can provide a list of all due value adjustments that meet the selection criteria. The query elements may be defined by the data type FixedAssetSetOfBooksValuationViewDueValueAdjustmentsAccountingPeriodIDQueryElements. In certain implementations, these elements include: FixedAssetCompanyUUID, FixedAssetCompanyID, FixedAssetUUID, FixedAssetMasterFixedAssetID, FixedAssetID, FixedAssetClassCode, SetOfBooksSetOfBooksID, SetOfBooksValuationViewSetOfBooksAssetValuationViewUUID, SetOfBooksValuationViewSetOfBooksAssetValuationViewID, FiscalYearAccountingPeriod, FiscalYearID and AccountingPeriodID.

FixedAssetCompanyUUID is optional and may be based on GDT UUID. FixedAssetCompanyID is optional and may be based on GDT OrganisationalCentreID. FixedAssetUUID is optional and may be based on GDT UUID. FixedAssetMasterFixedAssetID is optional and may be based on GDT MasterFixedAssetID. FixedAssetID is optional and may be based on GDT FixedAssetID. FixedAssetClassCode is optional and may be based on GDT FixedAssetClassCode. SetOfBooksSetOfBooksID is optional and may be based on GDT SetOfBooksID. SetOfBooksValuationViewSetOfBooksAssetValuationViewUUID is optional and may be based on GDT UUID. SetOfBooksValuationViewSetOfBooksAssetValuationViewID is optional and may be based on GDT SetOfBooksAssetValuationViewID. FiscalYearAccountingPeriod is optional and may be based on IDT FixedAssetSetOfBooksValuationViewDueValueAdjustmentsFiscalYearAccountingPeriod. FiscalYearID is optional and may be based on GDT FiscalYearID. AccountingPeriodID is optional and may be based on GDT AccountingPeriodID.

SetOfBooksValuationViewValuesTotal 89040 can refer to value overview derived from the due value adjustments and period total. The due value adjustments may be in the node SetOfBooksValuationViewDueValueAdjustments and the period total in SetOfBooksValuationViewPeriodTotal. The values total is calculated from these. The elements located directly at the SetOfBooksValuationViewValuesTotal node are defined by the data type FixedAssetSetOfBooksValuationViewValuesTotalElements. In certain implementations, these elements include: FiscalYearID, AccountingPeriodID, FixedAssetKeyFigureCode, LocalCurrencyAmount, SetOfBooksCurrencyAmount, HardCurrencyAmount and IndexBasedCurrencyAmount.

FiscalYearID is an identification of the fiscal year for which the total can keep values. The FiscalYearID may be based on GDT FiscalYearID. AccountingPeriodID is an identification of the accounting period for which the total can keep values. The AccountingPeriodID may be based on GDT AccountingPeriodID. FixedAssetKeyFigureCode is a coded representation of the value type to which the total may relate. The FixedAssetKeyFigureCode may be based on GDT FixedAssetKeyFigureCode, with no restrictions. LocalCurrencyAmount is the value of the total in the local currency of the company. The local currency can be the currency in which the local books are kept. The LocalCurrencyAmount may be based on GDT Amount, Qualifier LocalCurrency. SetOfBooksCurrencyAmount is the value of the total in the additional currency selected for the set of books, and is optional. SetOfBooksCurrencyAmount may be based on GDT Amount, Qualifier SetOfBooksCurrency. HardCurrencyAmount is the value of the total in the hard currency of the country of the company, and is optional. The hard currency may be a stable, country-specific currency that can be used in high-inflation countries. The HardCurrencyAmount may be based on GDT Amount, Qualifier HardCurrency. IndexBasedCurrencyAmount is the value of the total in the index currency of the country of the company, and is optional. The index-based currency may be a fictitious, country-specific currency that can be used in high-inflation countries as a comparison currency for reporting. The IndexBasedCurrencyAmount may be based on GDT Amount, Qualifier IndexBasedCurrency.

Queries can include QueryByKeyFigureCode, which can provide a list of key figure total values for the specified fiscal year's accounting period of the assets that may meet the selection criteria. The query elements are defined by the data type FixedAssetSetOfBooksValuationViewValuesTotalKeyFigureCodeQueryElements. In certain implementations, these elements include: FixedAssetUUID, FixedAssetCompanyUUID, FixedAssetMasterFixedAssetID, FixedAssetID, FixedAssetCompanyID, SetOfBooksSetOfBooksID, SetOfBooksValuationViewSetOfBooksAssetValuationViewUUID, SetOfBooksValuation- ViewSetOfBooksAssetValuationViewID, KeyFigureCode, FiscalYearAccountingPeriod, FiscalYearID and AccountingPeriodID.

FixedAssetUUID is optional and may be based on GDT UUID. FixedAssetCompanyUUID is optional and may be based on GDT UUID. FixedAssetMasterFixedAssetID is optional and may be based on GDT MasterFixedAssetID. FixedAssetID can be used in selection to distinguish between main assets and sub-assets, and is optional. FixedAssetID may be based on GDT FixedAssetID. FixedAssetCompanyID is optional and may be based on GDT OrganisationalCentreID. SetOfBooksSetOfBooksID is optional and may be based on GDT SetOfBooksID. SetOfBooksValuationViewSetOfBooksAssetValuationViewUUID is optional and may be based on GDT UUID. SetOfBooksValuationViewSetOfBooksAssetValuationViewID is optional and may be based on GDT SetOfBooksAssetValuationViewID. KeyFigureCode is optional and may be based on GDT FixedAssetKeyFigureCode. FiscalYearAccountingPeriod is optional and may be based on IDT FixedAsset SetOfBooksValuationViewValuesTotalFiscalYearAccountingPeriod. FiscalYearID is optional and may be based on GDT FiscalYearID. AccountingPeriodID is optional and may be based on GDT AccountingPeriodID.

SetOfBooksValuationViewValuesBalance can refer to value overview derived from the due value adjustments and balance. The due value adjustments may be in the node SetOfBooksValuationViewDueValueAdjustments and the balance in SetOfBooksValuationViewPeriodBalance. The values balance can be calculated from these. The elements located directly at the SetOfBooksValuationViewValuesBalance node are defined by the data type FixedAssetSetOfBooksValuationViewValuesBalanceElements. In certain implementations, these elements include: FiscalYearID, AccountingPeriodID, FixedAssetKeyFigureCode, LocalCurrencyAmount, SetOfBooksCurrencyAmount, HardCurrencyAmount and IndexBasedCurrencyAmount.

FiscalYearID is an identification of the fiscal year for which the balance can keep values. The FiscalYearID may be based on GDT FiscalYearID. AccountingPeriodID is an identification of the accounting period for which the period balance can keep values. The AccountingPeriodID may be based on GDT AccountingPeriodID. FixedAssetKeyFigureCode is a coded representation of the value type to which the balance may relate. The FixedAssetKeyFigureCode may be based on GDT FixedAssetKeyFigureCode. LocalCurrencyAmount is the value of the balance in the local currency of the company. The local currency is the currency in which the local books are kept. The LocalCurrencyAmount may be based on GDT Amount, Qualifier LocalCurrency.

SetOfBooksCurrencyAmount is the value of the balance in the additional currency selected for the set of books, and is optional. The SetOfBooksCurrencyAmount may be based on GDT Amount, Qualifier SetOfBooksCurrency. HardCurrencyAmount is the value of the balance in the hard currency of the country of the company, and is optional. The hard currency may be a stable, country-specific currency that can be used in high-inflation countries. The HardCurrencyAmount may be based on GDT Amount, Qualifier HardCurrency. IndexBasedCurrencyAmount is the value of the balance in the index currency of the country of the company, and is optional. The index-based currency may be a fictitious, country-specific currency that can used in high-inflation countries as a comparison currency for reporting. The IndexBasedCurrencyAmount may be based on GDT Amount, Qualifier IndexBasedCurrency.

Queries may include QueryByKeyFigureCode, which can provide a list of key figure balance values for the specified fiscal year's accounting period of the assets that meet the selection criteria. The query elements are defined by the data type FixedAssetSetOfBooksValuationViewValuesTotalKeyFigureCodeQueryElements. In certain implementations, these elements include: FixedAssetUUID, FixedAssetCompanyUUID, FixedAssetMasterFixedAssetID, FixedAssetID, FixedAssetCompanyID, SetOfBooksSetOfBooksID, SetOfBooksValuationViewSetOfBooksAssetValuationViewUUID, SetOfBooksValuationViewSetOfBooksAssetValuationViewID, KeyFigureCode, FiscalYearAccountingPeriod, FiscalYearID and AccountingPeriodID.

FixedAssetUUID is optional and may be based on GDT UUID. FixedAssetCompanyUUID is optional and may be based on GDT UUID. FixedAssetMasterFixedAssetID is optional and may be based on GDT MasterFixedAssetID. FixedAssetID can be used in selection to distinguish between main assets and sub-assets, and is optional. The FixedAssetID may be based on GDT FixedAssetID. FixedAssetCompanyID is optional and may be based on GDT OrganisationalCentreID. SetOfBooksSetOfBooksID is optional and may be based on GDT SetOfBooksID. SetOfBooksValuationViewSetOfBooksAssetValuationViewUUID is optional and may be based on GDT UUID. SetOfBooksValuationViewSetOfBooksAssetValuationViewID is optional and may be based on GDT SetOfBooksAssetValuationViewID. KeyFigureCode is optional and may be based on GDT FixedAssetKeyFigureCode. FiscalYearAccountingPeriod is optional and may be based on IDT FixedAsset SetOfBooksValuationViewValuesBalanceFiscalYearAccountingPeriod. FiscalYearID is optional and may be based on GDT FiscalYearID. AccountingPeriodID is optional and may be based on GDT AccountingPeriodID.

AssociatedIndividualMaterial is the assigned individual material and can contain the individual materials that may be valuated using the fixed asset. The elements located directly at the AssociatedIndividualMaterial node may be defined by the data type FixedAssetAssociatedIndividualMaterialElements. In certain implementations, these elements include: IndividualMaterialUUID, IndividualMaterialID, IndividualMaterialInventoryID, Status and FixedAssetViewOnIndividualMaterialStatusCode.

IndividualMaterialUUID is an universal identification, which can be unique, of individual material valuated by the fixed asset. The IndividualMaterialUUID may be based on GDT UUID. IndividualMaterialID is an identification, which can be unique, of the individual material valuated by the fixed asset, and is optional. The IndividualMaterialID may be based on GDT ProductID. IndividualMaterialInventoryID is an identification, which can be unique, for individual material that is stocked as physical inventory, and is optional. The IndividualMaterialInventoryID may be based on GDT IndividualMaterialInventoryID. Status is optional and may be based on IDT: FixedAssetAssociatedIndividualMaterial Status. FixedAssetViewOnIndividualMaterialStatusCode is a coded representation of the status of the association from the Fixed Asset to the Individual Material. The FixedAssetViewOnIndividualMaterialStatusCode may be based on GDT FixedAssetViewOnIndividualMaterialStatusCode in review.

The following composition relationships to subordinate nodes exist: AssociatedIndividualMaterialTotal 89044, and AssociatedIndividualMaterialBalance 89046. AssociatedIndividualMaterialTotal has a cardinality relationship of 1:cn (Filtered), where the filter elements may be defined by the data type FiscalYearAccountingPeriodFilterElements. In certain implementations, these elements include: FiscalYearID, which is optional and may be based on GDT FiscalYearID, and AccountingPeriodID which is optional and may be based on GDT AccountingPeriodID. AssociatedIndividualMaterialBalance has a cardinality relationship of 1:cn (Filtered), where the filter elements may be defined by the data type FiscalYearAccountingPeriodFilterElements. In certain implementations, these elements include: FiscalYearID, which is optional and may be based on GDT FiscalYearID and AccountingPeriodID, which is optional and may be based on GDT AccountingPeriodID. Inbound Aggregation Relationships may relate from the business object IndividualMaterial/node IndividualMaterial, IndividualMaterial has a cardinality relationship of 1:cn, as individual material valuated by the fixed asset. IndividualMaterial may be a projection of BO Product Enterprise Service Infrastructure Actions may include CheckFixedAssetViewOnIndividualMaterial (S&AM check-action) which is no real ESI-action: disabled can be true, finalized can be true!

This action can determine the status of the association from the Fixed Asset to the Individual Material and may have the following attributes: Preconditions that result from Status & Action Management where the status variable ViewOnIndividualMaterial may have the value assigned or acquired or retired; Changes to the status where the status variable FixedAssetViewOnIndividualMaterialStatus can contain the value assigned or acquired or retired; the action may be performed on one or multiple node instances; and Usage where this action can not be performed by any service consumers.

Queries can include QueryByIndividualMaterial, which can provide a list of individual materials associated to the specified FixedAssets that meet the selection criteria. The query elements may be defined by the data type FixedAssetAssociatedIndividualMaterialIndividualMaterialQueryElements. In certain implementations, these elements include: FixedAssetUUID, FixedAssetCompanyUUID, FixedAssetMasterFixedAssetID, FixedAssetID, FixedAssetCompanyID, IndividualMaterialUUID and IndividualMaterialID. FixedAssetUUID is optional and may be based on GDT UUID. FixedAssetCompanyUUID is optional and may be based on GDT UUID. FixedAssetMasterFixedAssetID is optional and may be based on GDT MasterFixedAssetID. FixedAssetID can be used in selection to distinguish between main assets and sub-assets, and is optional. The FixedAssetID may be based on GDT FixedAssetID. FixedAssetCompanyID is optional and may be based on GDT OrganisationalCentreID. IndividualMaterialUUID may be based on GDT UUID. IndividualMaterialID is optional and may be based on GDT ProductID.

AssociatedIndividualMaterialTotal is the total of the assigned individual materials, which can represent the total of all acquisition and production costs that were posted for an individual material assigned to the fixed asset. The elements located directly at the IndividualMaterialTotal node may be defined by the data type FixedAssetAssociatedIndividualMaterialTotalElements. In certain implementations, these elements include: SetOfBooksID, SetOfBooksAssetValuationViewUUID, SetOfBooksAssetValuationViewID, FiscalYearVariantCode, FiscalYearID, AccountingPeriodID, SubledgerAccountLineItemTypeCode, LocalCurrencyAmount, SetOfBooksCurrencyAmount, HardCurrencyAmount and IndexBasedCurrencyAmount.

SetOfBooksID is the set of books to which the asset value can refer and may be based on GDT SetOfBooksID. SetOfBooksAssetValuationViewUUID is the SetOfBooksAssetValuationView that can be used for valuation of the fixed asset and may be based on GDT UUID. SetOfBooksAssetValuationViewID is the semantic key of the SetOfBooksAssetValuationView used for valuation of the fixed asset. SetOfBooksAssetValuationViewID may be based on GDT SetOfBooksAssetValuationViewID. FiscalYearVariantCode is a coded representation of the FiscalYearVariant according to whose fiscal year definition (begin, end, period definition) the FiscalYearID and the AccountingPeriodID may be derived. FiscalYearVariantCode may be based on GDT FiscalYearVariantCode. FiscalYearID is an identification of the fiscal year for which the total can keep acquisition and production costs of the individual material. FiscalYearID may be based on GDT FiscalYearID. AccountingPeriodID is an identification of the accounting period for which the total can keep acquisition and production costs of the individual material. AccountingPeriodID may be based on GDT AccountingPeriodID.

SubledgerAccountLineItemTypeCode is a coded representation of the type of the line items whose amounts may be summarized in the total. SubledgerAccountLineItemTypeCode may be based on GDT SubledgerAccountLineItemTypeCode, Restrictions where the code values 1000 to 1999 can occur. LocalCurrencyAmount is the value of the total in the local currency of the company. The local currency can be the currency in which the local books may be kept. LocalCurrencyAmount may be based on GDT Amount, Qualifier LocalCurrency. SetOfBooksCurrencyAmount is the value of the total in the currency selected for the set of books, and is optional. SetOfBooksCurrencyAmount may be based on GDT Amount and Qualifier SetOfBooksCurrency. HardCurrencyAmount is the value of the total in the hard currency of the country of the company, and is optional. The hard currency can be a stable, country-specific currency that may be used in high-inflation countries. HardCurrencyAmount may be based on GDT Amount, Qualifier HardCurrency. IndexBasedCurrencyAmount is the value of the total in the index currency of the country of the company, and is optional. The index-based currency can be a fictitious, country-specific currency that may be used in high-inflation countries as a comparison currency for reporting. IndexBasedCurrencyAmount may be based on GDT Amount and Qualifier IndexBasedCurrency.

Inbound Aggregation Relationships may relate from business object FixedAsset/node SetOfBooksValuationView, SetOfBooksValuationView has a cardinality relationship of 1:1, which can specify the valuation view node for which the total can keep values.

Queries can include QueryBySubledgerAccountLineItemTypeCode, which can provide a list of subledger specific total values for the specified fiscal year's accounting period of the assets that meet the selection criteria. The query elements may be defined by the data type FixedAssetAssociatedIndividualMaterialTotalSubledgerAccountLineItemTypeCodeQueryElements. In certain implementations, these elements include: FixedAssetUUID, FixedAssetCompanyUUID, FixedAssetMasterFixedAssetID, FixedAssetID, FixedAssetCompanyID, AssociatedIndividualMaterialIndividualMaterialUUID, AssociatedIndividualMaterialIndividualMaterialID, SetOfBooksID, SetOfBooksAssetValuationViewUUID, SetOfBooksAssetValuationViewID, SubledgerAccountLineItemTypeCode, FiscalYearAccountingPeriod, FiscalYearID and AccountingPeriodID.

FixedAssetUUID is optional and may be based on GDT UUID. FixedAssetCompanyUUID is optional and may be based on GDT UUID. FixedAssetMasterFixedAssetID is optional and may be based on GDT MasterFixedAssetID. FixedAssetID is optional and may be based on GDT FixedAssetID. FixedAssetCompanyID is optional and may be based on GDT OrganisationalCentreID. AssociatedIndividualMaterialIndividualMaterialUUID is optional and may be based on GDT UUID. AssociatedIndividualMaterialIndividualMaterialID is optional and may be based on GDT ProductID. SetOfBooksID is optional and may be based on GDT SetOfBooksID. SetOfBooksAssetValuationViewUUID is optional and may be based on GDT UUID. SetOfBooksAssetValuationViewID is optional and may be based on GDT SetOfBooksAssetValuationViewID. SubledgerAccountLineItemTypeCode is optional and may be based on GDT SubledgerAccountLineItemTypeCode, Restrictions where the code values 1000 to 1999 can occur. FiscalYearAccountingPeriod is optional and may be based on IDT FixedAssetAssociatedIndividualMaterialTotalFiscalYearAccountingPeriod. FiscalYearID is optional and may be based on GDT FiscalYearID. AccountingPeriodID is optional and may be based on GDT AccountingPeriodID.

AssociatedIndividualMaterialBalance is the balance of the assigned individual materials, which can represent the balance of all acquisition and production costs that were posted for an individual material assigned to the fixed asset. The elements located directly at the IndividualMaterialBalance node may be defined by the data type FixedAssetAssociatedIndividualMaterialBalanceElements. In certain implementations, these elements include: SetOfBooksID, SetOfBooksAssetValuationViewUUID, SetOfBooksAssetValuationViewID, FiscalYearVariantCode, FiscalYearID, AccountingPeriodID, SubledgerAccountLineItemTypeCode, LocalCurrencyAmount, SetOfBooksCurrencyAmount, HardCurrencyAmount and IndexBasedCurrencyAmount.

SetOfBooksID is an identification, which can be unique, of the set of books to which the asset value may relate. The SetOfBooksID may be based on GDT SetOfBooksID with no restriction. SetOfBooksAssetValuationViewUUID can specify the SetOfBooksAssetValuationView used for valuation of the fixed asset and may be based on GDT UUID. SetOfBooksAssetValuationViewID is an identification of the SetOfBooksAssetValuationView used for valuation of the fixed asset and may be based on GDT SetOfBooksAssetValuationViewID. FiscalYearVariantCode is a coded representation of the FiscalYearVariant according to whose fiscal year definition (begin, end, period definition) the FiscalYearID and the AccountingPeriodID may be derived. FiscalYearVariantCode may be based on GDT FiscalYearVariantCode.FiscalYearID is an identification of the fiscal year that the balance of the acquisition and production costs of the individual material may relate to. FiscalYearID may be based on GDT FiscalYearID.

AccountingPeriodID is an identification of the accounting period for which the balance can keep values.

AccountingPeriodID may be based on GDT AccountingPeriodID. SubledgerAccountLineItemTypeCode is a coded representation of the type of the line items whose amounts may be summarized in the balance. SubledgerAccountLineItemTypeCode may be based on GDT SubledgerAccountLineItemTypeCode, Restrictions where the code values 1000 to 1999 can occur. LocalCurrencyAmount is the value of the balance in the local currency of the company. The local currency can be the currency in which the local books may be kept. LocalCurrencyAmount may be based on GDT Amount, Qualifier LocalCurrency. SetOfBooksCurrencyAmount is the value of the balance in the currency selected for the set of books, and is optional. SetOfBooksCurrencyAmount may be based on GDT Amount and Qualifier SetOfBooksCurrency. HardCurrencyAmount is the value of the balance in the hard currency of the country of the company. The hard currency can be a stable, country-specific currency that may be used in high-inflation countries. HardCurrencyAmount may be based on GDT Amount and Qualifier HardCurrency. IndexBasedCurrencyAmount is the value of the balance in the index currency of the country of the company, and is optional. The index-based currency can be a fictitious, country-specific currency that may be used in high-inflation countries as a comparison currency for reporting. IndexBasedCurrencyAmount may be based on GDT Amount and Qualifier IndexBasedCurrency.

Inbound Aggregation Relationships may relate from business object FixedAsset/node SetOfBooksValuationView, SetOfBooksValuationView has a cardinality relationship of 1:1, which can specify the valuation view node for which the balance can keep values.

Queries may include QueryBySubledgerAccountLineItemTypeCode, which can provide a list of subledger specific balance values for the specified fiscal year's accounting period of the assets that meet the selection criteria. The query elements may be defined by the data type FixedAssetAssociatedIndividualMaterialBalanceSubledgerAccountLineItemTypeCodeQueryElements. In certain implementations, these elements include: FixedAssetUUID, FixedAssetCompanyUUID, FixedAssetMasterFixedAssetID, FixedAssetID, FixedAssetCompanyID, AssociatedIndividualMaterialIndividualMaterialUUID, AssociatedIndividualMaterialIndividualMaterialID, SetOfBooksID, SetOfBooksAssetValuationViewUUID, SetOfBooksAssetValuationViewID, SubledgerAccountLineItemTypeCode, FiscalYearAccountingPeriod, FiscalYearID and AccountingPeriodID.

FixedAssetUUID is optional and may be based on GDT UUID. FixedAssetCompanyUUID is optional and may be based on GDT UUID. FixedAssetMasterFixedAssetID is optional and may be based on GDT MasterFixedAssetID. FixedAssetID can be used in selection to distinguish between main assets and sub-assets, and is optional. FixedAssetID may be based on GDT FixedAssetID. FixedAssetCompanyID is optional and may be based on GDT OrganisationalCentreID. AssociatedIndividualMaterialIndividualMaterialUUID may be based on GDT UUID. AssociatedIndividualMaterialIndividualMaterialID is optional and may be based on GDT ProductID. SetOfBooksID is optional and may be based on GDT SetOfBooksID. SetOfBooksAssetValuationViewUUID is optional and may be based on GDT UUID. SetOfBooksAssetValuationViewID is optional and may be based on GDT SetOfBooksAssetValuationViewID. SubledgerAccountLineItemTypeCode is optional and may be based on GDT SubledgerAccountLineItemTypeCode, Restrictions where the code values 1000 to 1999 can occur. FiscalYearAccountingPeriod is optional and may be based on IDT FixedAssetAssociatedIndividualMaterialBalanceFiscalYearAccountingPeriod. FiscalYearID is optional and may be based on GDT FiscalYearID. AccountingPeriodID is optional and may be based on GDT AccountingPeriodID.

An AccessControlList direct object is a list of AccessGroups, which may have got access to FixedAssets during a validity period.

An AttachmentFolder direct object can refer to an attachment of other documents to a FixedAsset object instance. The AttachmentFolder node can be defined by the dependent object Attachment. It may be used to link an AccountingEntry to different types of documents, for example MS Excel spreadsheets or MS Word documents.

FIGS. 90-1 through 90-18 illustrate one example logical configuration of FixedAsset 90000. Specifically, this figure depicts the arrangement and hierarchy of various components such as one or more levels of packages, entities, and datatypes, shown here as 90000 through 900398. As described above, packages may be used to represent hierarchy levels. Entities are discrete business elements that are used during a business transaction. Data types are used to type object entities and interfaces with a structure. For example, FixedAsset 90000 includes, among other things, FixedAssetMigrateRequest 90032. Accordingly, heterogeneous applications may communicate using this consistent message configured as such.

Some of the following are message types and their signatures that may be derived from the operations of the business object FixedAsset. In a signature, the business object may be contained as a "leading" business object. The message data type can determine the structure of the following message types. Motivating Business Scenarios can result when Fixed Assets (and their values) of a company may be migrated from a legacy system to PC Financial Accounting of a new ERP system.

A FixedAssetMigrateRequest message type can be a request to migrate fixed assets (and their values) of one company from a legacy system to PC Financial Accounting of a new ERP system. The structure of this message type may be determined by the message data type FixedAssetMigrateRequestMessage. This message type can be used in the FixedAsset and Migrate Fixed Asset operations of business objects.

The FixedAssetMigrateRequestMessage message data type can contain the object FixedAssetMigrateRequest which may be contained in the business document and the business information that may be relevant for sending a business document in a message. The FixedAssetMigrateRequestMessage contains the packages MessageHeader package and FixedAssetMigrateRequest package. This message data type, therefore, can provide the structure for the FixedAssetMigrateRequest message type and the operation that may be based on it.

A MessageHeader Package is a grouping of business information that may be relevant for sending a business document in a message. It can contain the node MessageHeader.

A MessageHeader is a grouping of business information from the perspective of the sending application, including information to identify the business document in a message, information about the sender and Information about the recipient, which is optional. The MessageHeader can contain SenderParty and RecipientParty. It can be of the type GDT: BusinessDocumentMessageHeader, and the following elements of the GDT may be used: ID and ReferenceID. SenderParty is the partner responsible for sending a business document at business application level. The SenderParty can be of the type GDT: BusinessDocumentMessageHeaderParty. RecipientParty is the partner responsible for receiving a business document at business application level. The RecipientParty can be of the type GDT: BusinessDocumentMessageHeaderParty.

A FixedAssetMigrateRequest Package is the grouping of FixedAssetMigrateRequest.

A FixedAssetMigrateRequest is a request to migrate fixed assets (and their values) of one company from a legacy system to PC Financial Accounting of a new ERP system. FixedAssetMigrateRequest is of type IDT: FixedAssetMigrateRequest, it can contain the elements FixedAssetCompanyID, FixedAssetClassCode and FixedAssetName. FixedAssetCompanyID has a cardinality relationship of 1 and may be based on GDT: OrganisationalCentreID. FixedAssetClassCode has a cardinality relationship of 1 and may be based on GDT: FixedAssetClassCode. FixedAssetName has a cardinality relationship of 1 and may be based on GDT: LANGUAGEINDEPENDENT_MEDIUM_Name. The following subordinate entities exist: AssociatedIndividualMaterial has a cardinality relationship of 1..n, OrganisationalAssignment has a cardinality relationship of 1..n and SetOfBooks has a cardinality relationship of 1..n.

An AssociatedIndividualMaterial is assigned individual material and can contain the individual materials that may be valuated using the fixed asset. FixedAssetMigrateRequestAssociatedIndividualMaterial can be of IDT: FixedAssetMigrateRequestAssociatedIndividualMaterial, which may contain the elements IndividualMaterialInventoryID and IndividualMaterialID. IndividualMaterialInventoryID has a cardinality relationship of 1..n and may be based on GDT: IndividualMaterialInventoryID. IndividualMaterialID has a cardinality relationship of 0..n and may be based on GDT: IndividualMaterialID.

An OrganisationalAssignment can contain the assignments of the fixed asset (valid for a given time period) to the organizational units: cost center (CostCentre), profit center (ProfitCentre) and/or segment (Segment). This assignment may be necessary so that values for fixed assets can be recorded separately for different organizational units of the company. FixedAssetMigrateRequestOrganisationalAssignment can use IDT: FixedAssetMigrateRequestOrganisationalAssignment, which may contain the fields ValidityPeriod, SegmentID, ProfitCentreID and CostCentreID. ValidityPeriod has a cardinality relationship of 0..n and may be based on GDT: Closed_DatePriod. SegmentID has a cardinality relationship of 0..1 and may be based on GDT: OrganisationalCentreID. ProfitCentreID has a cardinality relationship of 0..1 and may be based on GDT: OrganisationalCentreID. CostCentreID has a cardinality relationship of 0..1 and may be based on GDT: OrganisationalCentreID.

A SetOfBooks can represent the valuation of a fixed asset based on a set of books. The node can contain dates relevant for the valuation of the fixed asset. FixedAssetMigrateRequestSetOfBooks can be of IDT: FixedAssetMigrateRequestSetOfBooks, which may contain the fields: SetOfBooksID, CapitalizationDate, DeactivationDate, FirstAcquisitionDate, LastRetirementDate and LowValueAssetIndicator. SetOfBooksID has a cardinality relationship of 1 and may be based on GDT: SetOfBooksID. CapitalizationDate has a cardinality relationship of 0..1 and may be based on GDT: Date. DeactivationDate has a cardinality relationship of 0..1 and may be based on GDT: Date. FirstAcquisitionDate has a cardinality relationship of 0..1 and may be based on GDT: Date. LastRetirementDate has a cardinality relationship of 0..1 and may be based on GDT: Date. LowValueAssetIndicator has a cardinality relationship of 0..1 and may be based on GDT: LowValueAssetIndicator. The SetOfBooksValuationView has a cardinality relationship of 1..n subordinate entity may exist.

A SetOfBooksValuationView can represent the valuation of a fixed asset based on a valuation method. The node can contain parameters (constant over time) that may be required for calculating the value of a fixed asset. FixedAssetMigrateRequestSetOfBooksSetOfBooksValuationView can be of IDT: FixedAssetMigrateRequestSetOfBooksValuationView, which may contain the fields AssetValuationViewID, OrdinaryDepreciationStartDate, SpecialDepreciationStartDate, InterestStartDate, ChangeoverFiscalYearID, ChangeoverCalculationPeriodID, ReplacementIndexSeriesCode, AgeIndexSeriesCode, AmountSignCheckExecutionCode, OrdinaryDepreciationExpiredUsefulLifeWeightedCalculation PeriodsDecimalValue and SpecialDepreciationExpiredUsefulLifeWeightedCalculationPeriodsDecimalValue.

AssetValuationViewID has a cardinality relationship of 1 and may be based on GDT: SetOfBooksAssetValuationViewID. OrdinaryDepreciationStartDate has a cardinality relationship of 0..1 and may be based on GDT: Date. SpecialDepreciationStartDate has a cardinality relationship of 0..1 and may be based on GDT: Date. InterestStartDate has a cardinality relationship of 0..1 and may be based on GDT: Date. ChangeoverFiscalYearID has a cardinality relationship of 0..1 and may be based on GDT: FiscalYearID. ChangeoverCalculationPeriodID has a cardinality relationship of 0..1 and may be based on GDT: FixedAssetCalculationPeriodID. ReplacementIndexSeriesCode has a cardinality relationship of 0..1 and may be based on GDT: IndexSeriesCode. AgeIndexSeriesCode has a cardinality relationship of 0..1 and may be based on GDT: IndexSeriesCode. AmountSignCheckExecutionCode has a cardinality relationship of 1 and may be based on GDT: FixedAssetValuationViewAmountSignCheckExecutionCode. OrdinaryDepreciationExpiredUsefulLifeWeightedCalculationPeriodsDecimalValue has a cardinality relationship of 0..1 and may be based on GDT: DecimalValue. SpecialDepreciationExpiredUsefulLifeWeightedCalculationPeriodsDecimalValue has a cardinality relationship of 0..1 and may be based on GDT: DecimalValue.

The following subordinate entities exist: Parameters has a cardinality relationship of 1..n and AccountingEntry Card. 1.

Parameters can relate to time-dependent valuation parameters that may be required for determining the value of a fixed asset. FixedAssetMigrateRequestSetOfBooksSetOfBooksValuationViewParameters can be of IDT: FixedAssetMigrateRequestSetOfBooksValuationViewParameters, which can contain the fields ValidityPeriod, DepreciationCalculationProcedureCode, ImputedInterestCalculationMethodCode, UsefulLifeFiscalYearsTotalNumberValue, UsefulLifeAccountingPeriodsTotalNumberValue, VariableDepreciationPortionPercent, ScrapValueAmount, ScrapValuePercent, ShutDownIndicator and ShiftFactorDecimalValue. ValidityPeriod has a cardinality relationship of 1..n and may be based on GDT: Closed_DatePriod. DepreciationCalculationProcedureCode has a cardinality relationship of 1 and may be based on GDT: DepreciationCalculationProcedureCode. ImputedInterestCalculationMethodCode has a cardinality relationship of 0..1 and may be based on GDT: FixedAssetInputedInterestCalculationMethodCode. UsefulLifeFiscalYearsTotalNumberValue has a cardinality relationship of 1 and may be based on GDT: TotalNumberValue. UsefulLifeAccountingPeriodsTotalNumberValue has a cardinality relationship of 1 and may be based on GDT: TotalNumberValue. VariableDepreciationPortionPercent has a cardinality relationship of 0..1 and may be based on GDT: Percent. ScrapValueAmount has a cardinality relationship of 0..1 and may be based on GDT: Amount. ScrapValuePercent has a cardinality relationship of 0..1 and may be based on GDT: Percent. ShutDownIndicator has a cardinality relationship of 0..1 and may be based on GDT: ShutDownIndicator. ShiftFactorDecimalValue has a cardinality relationship of 0..1 and may be based on GDT: DecimalValue.

An AccountingEntry is the capture of value changes in the asset structure of a company. FixedAssetMigrateRequestSetOfBooksSetOfBooksValuationViewAccountingEntry can be of IDT: FixedAssetMigrateRequestSetOfBooksValuationViewAccountingEntry, which can contain the fields: PostingDate, AccountingClosingStepCode, AccountingDocumentTypeCode, AccountingBusinessTransactionDate and EntryDate. PostingDate has a cardinality relationship of 1 and may be based on GDT: Date. AccountingClosingStepCode has a cardinality relationship of 0..1 and may be based on GDT: AccountingClosingStepCode. AccountingDocumentTypeCode has a cardinality relationship of 1 and may be based on GDT: AccountingDocumentTypeCode. AccountingBusinessTransactionDate has a cardinality relationship of 1 and may be based on GDT: Date. EntryDate has a cardinality relationship of 1 and may be based on GDT: Date. The Item has a cardinality relationship of 0..n and a subordinate entity may exist.

An Item can represent the capture of value a change in the asset structure of a company. FixedAssetMigrateRequestSetOfBooksSetOfBooksValuationViewAccountingEntryItem can be of IDT: FixedAssetMigrateRequestSetOfBooksValuationViewAccounting EntryLineItem, which can contain the fields MovementCategoryCode, ItemGroupIDNote, GeneralLedgerMovementTypeCode, ValueCalculationReferenceDate, IndividualMaterialID, ItemGroupId, SubledgerAccountLineItemTypeCode, LocalCurrencyAmount, SetOfBooksCurrencyAmount, HardCurrencyAmount, TransactionCurrencyAmount and IndexBasedCurrencyAmount. MovementCategoryCode has a cardinality relationship of 1 and may be based on GDT: MovementCategoryCode. ItemGroupIDNote has a cardinality relationship of 0..1 and may be based on GDT: SHORT_Note. GeneralLedgerMovementTypeCode has a cardinality relationship of 1 and may be based on GDT: GeneralLedgerMovementTypeCode. ValueCalculationReferenceDate has a cardinality relationship of 1 and may be based on GDT: Date. IndividualMaterialID has a cardinality relationship of 0..1 and may be based on GDT: IndividualMaterialID. ItemGroupId has a cardinality relationship of 1 and may be based on GDT: BusinessTransactionDocumentItemGroupID. SubledgerAccountLineItemTypeCode has a cardinality relationship of 0..1 and may be based on GDT: SubledgerAccountLineItemTypeCode. LocalCurrencyAmount has a cardinality relationship of 1 and may be based on GDT: Amount. SetOfBooksCurrencyAmount has a cardinality relationship of 0..1 and may be based on GDT: Amount. HardCurrencyAmount has a cardinality relationship of 0..1 and may be based on GDT: Amount. TransactionCurrencyAmount has a cardinality relationship of 0..1 and may be based on GDT: Amount. IndexBasedCurrencyAmount has a cardinality relationship of 0..1 and may be based on GDT: Amount.

A List of Data Types Used (GDTs) can include the following: BusinessDocumentMessageHeader, BusinessDocumentMessageID, DateTime, OrganisationalCentreID, FixedAssetClassCode, LANGUAGEINDEPENDENT_MEDIUM_Name, IndividualMaterialInventoryID, IndividualMaterialID, Closed_DatePriod, SetOfBooksID, Date, LowValueAssetIndicator, SetOfBooksAssetValuationViewID, FiscalYearID, FixedAssetCalculationPeriodID, IndexSeriesCode, FixedAssetValuationViewAmountSignCheckExecutionCode and DecimalValue.

Business Object GeneralLedgerAccount

Figures 1, 91:
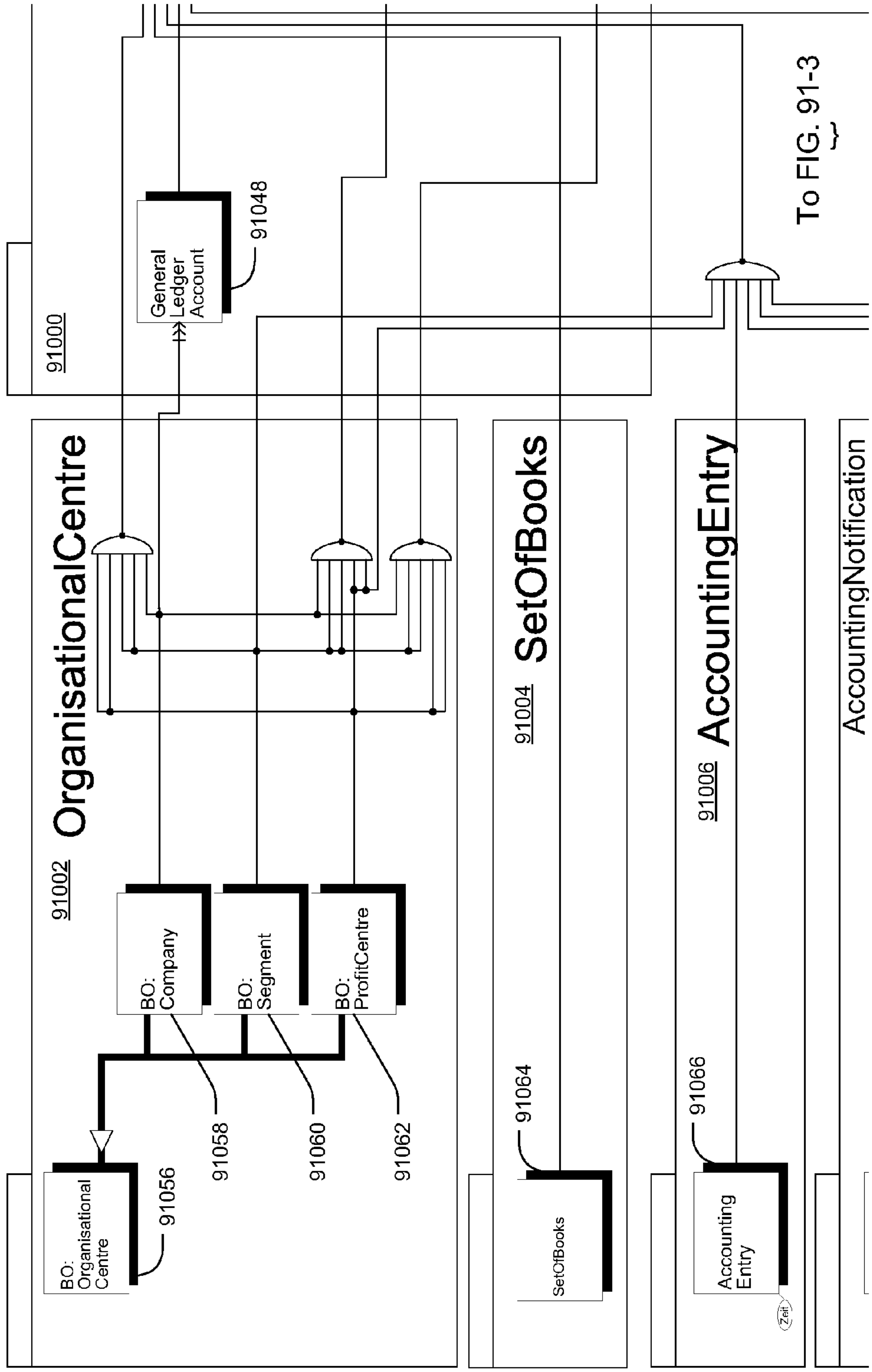
Figures 2, 91:
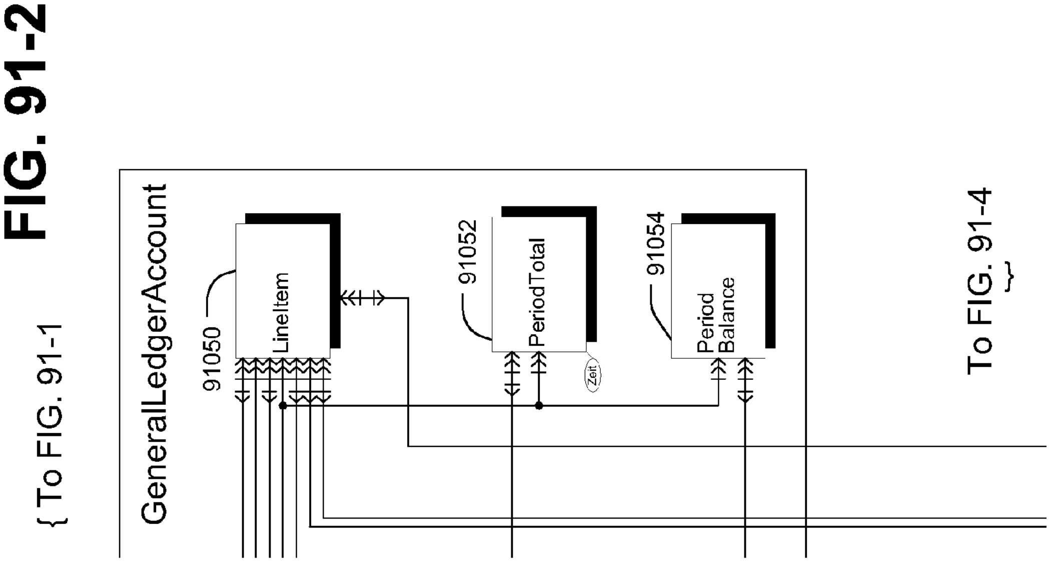
Figures 3, 91:
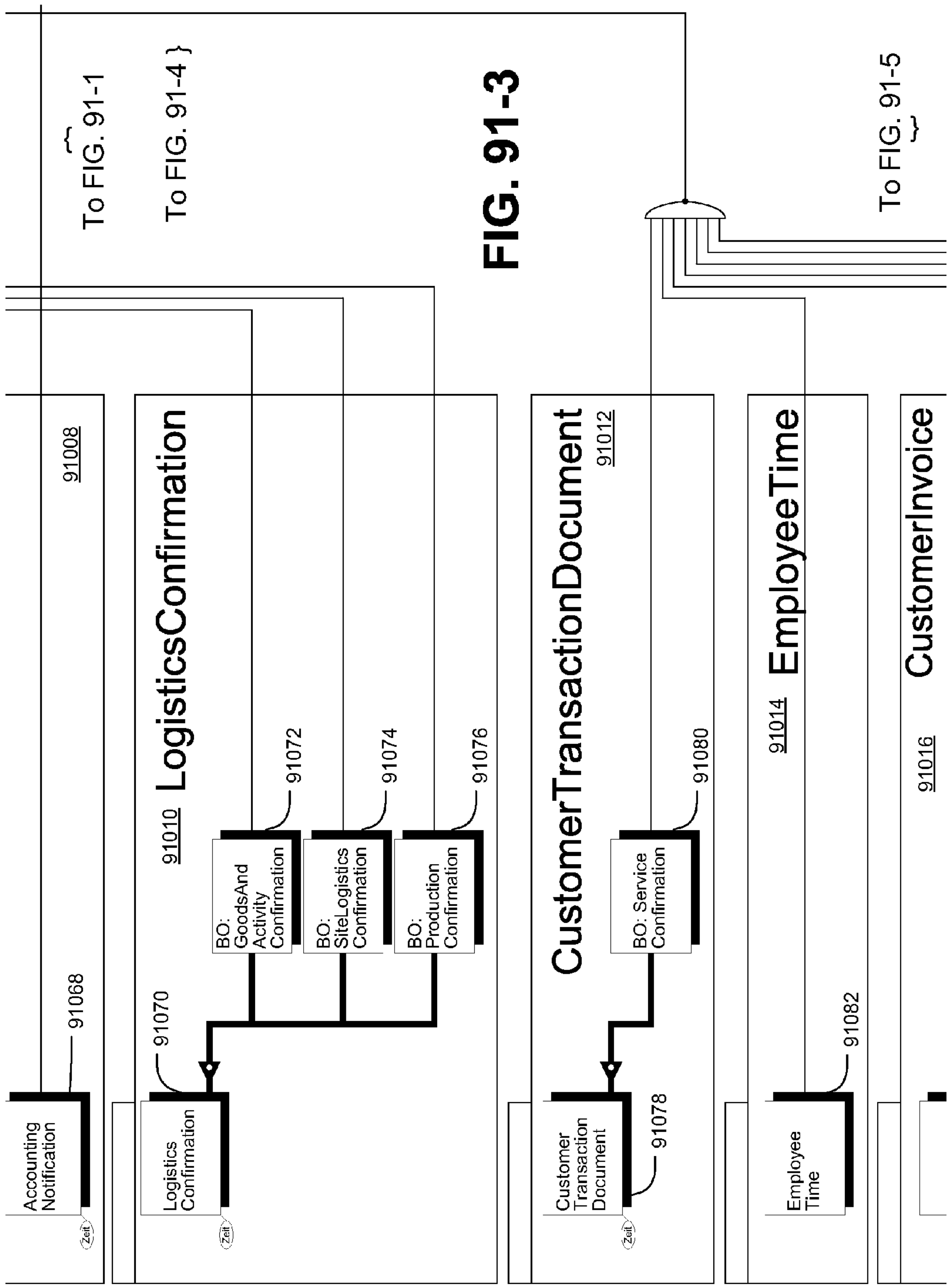
Figures 5, 91:
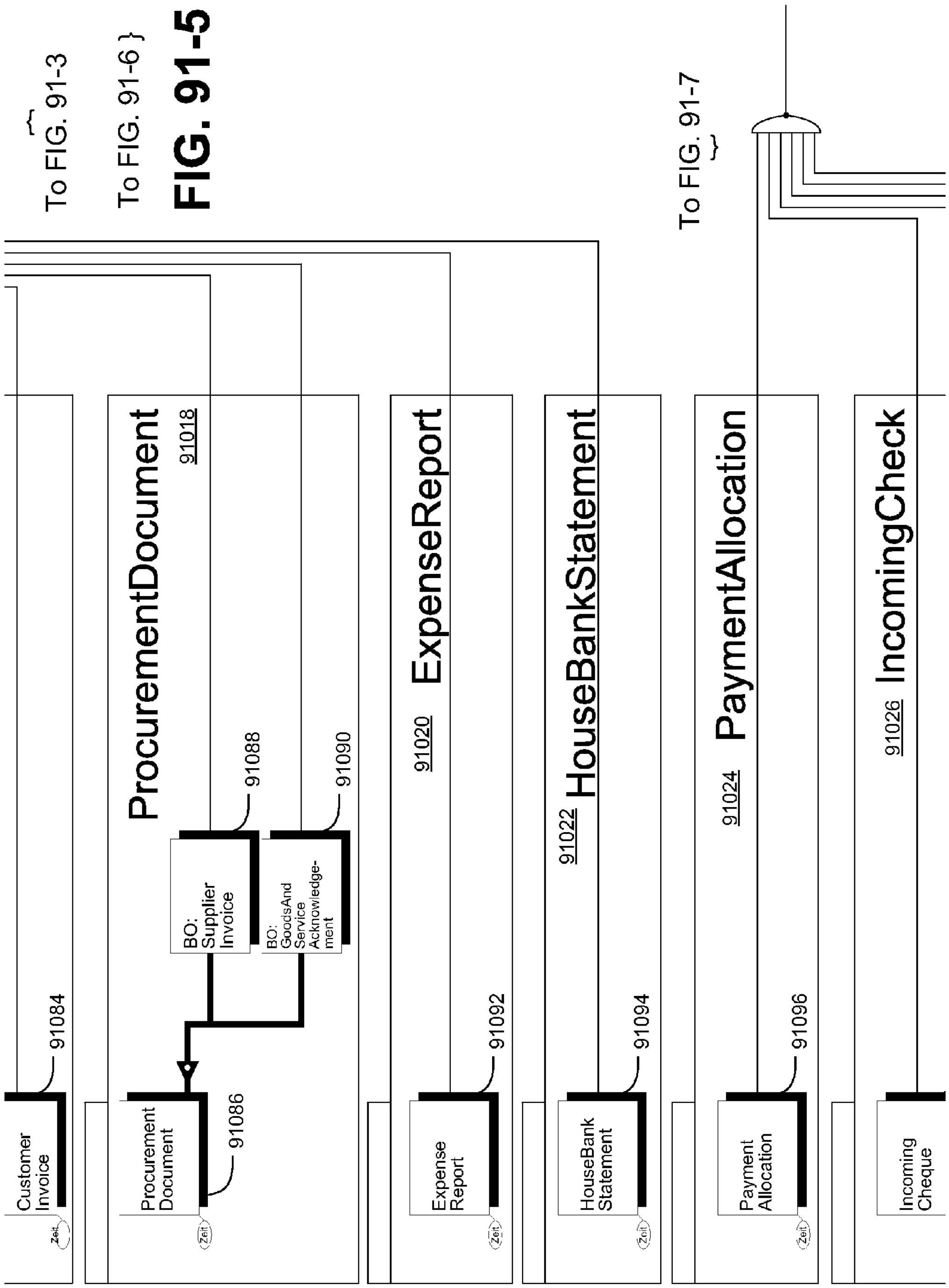
Figures 7, 91:
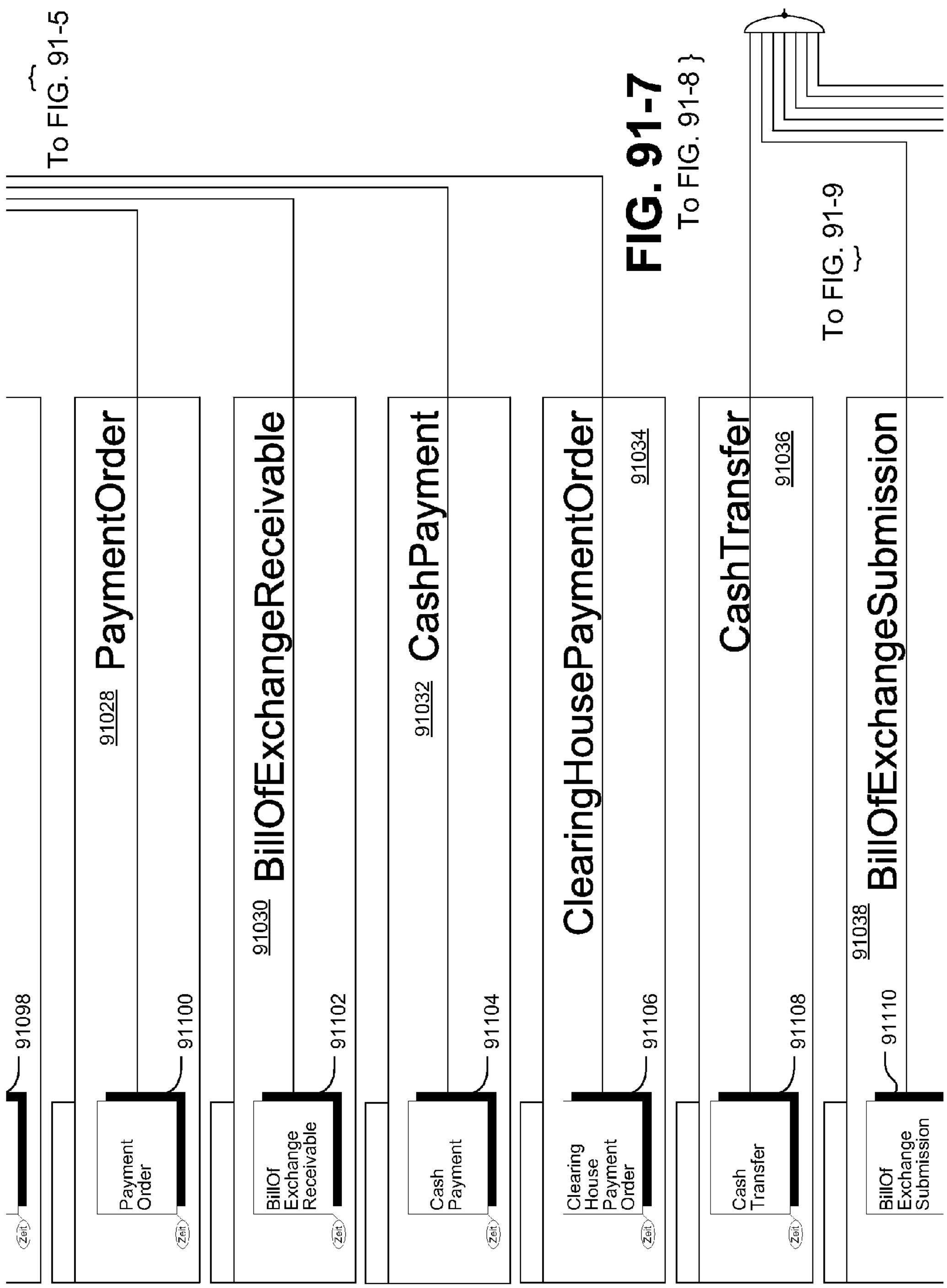
Figures 9, 91:
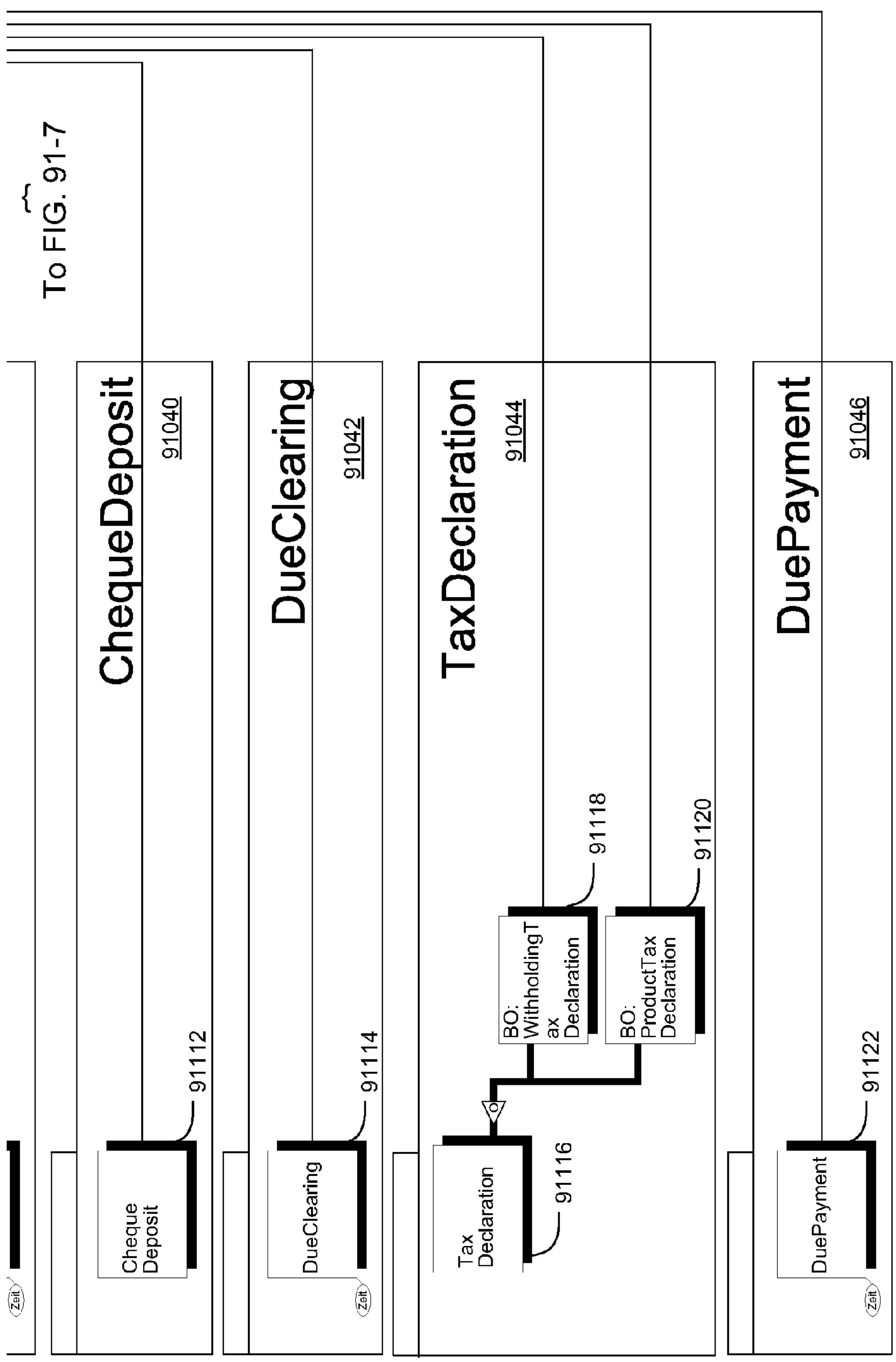

FIGS. 91-1 through 91-8 illustrate an example GeneralLedgerAccount business object model 91000. Specifically, this model depicts interactions among various hierarchical components of the GeneralLedgerAccount, as well as external components that interact with the GeneralLedgerAccount (shown here as 91002 through 91046 and 91056 through 91122). A GeneralLedgerAccount can be a record of all quantities and values of a company that may be relevant to valuation and that relate to a functional grouping item of a chart of accounts (business object Chart Of Accounts, node Item). This record can serve the purposes of a company's proper financial reporting in accordance with a set of books. The business object GeneralLedgerAccount can be part of the process component Accounting. A GeneralLedgerAccount can include a LineItem, a PeriodTotal, and a PeriodBalance. The LineItem component can store, for a GeneralLedgerAccount and specific to a business transaction, any changes to values or, if applicable, quantities caused by the individual business transactions. The LineItem component can also include detailed information on a business transaction from the accounting view. The PeriodTotal component can store, for a GeneralLedgerAccount and for each set of books (and possibly using other dimensions such as profit center, segment, or functional area), period-specific information about changes to quantities and values. The PeriodBalance component can store, for a GeneralLedgerAccount and for each set of books (and possibly using other dimensions such as profit center, segment, or functional area), period-specific information about quantity-based and value based stock. GeneralLedgerAccount can be represented by the node GeneralLedgerAccount.

All generations of and changes to the business object GeneralLedgerAccount that are triggered from outside the DU Financial Accounting can run via the business object AccountingNotification.

Node structure of Business Object GeneralLedgerAccount

The GeneralLedgerAccount 91048 can be a Root Node of the Business Object GeneralLedgerAccount. A GeneralLedgerAccount can be a record of all quantities and values of a company that may be relevant to valuation and that relate to a functional grouping item of a chart of accounts (business object Chart Of Accounts, node Item). The record can serve the purposes of a company's proper financial reporting in accordance with a set of books. Subsequently, a generic approach for referencing Original Entry Documents can be used, where an Original Entry Document may be a document that can be necessary for auditing purposes and can verify that the value stated in the LineItem of a ledger account may have been booked on the base of a real business transaction. An Original Entry Document may be contained in another Object, the Original Entry DocumentContainingObject. Typical such constellations can include a FinancialAuditTrailDocumentation, a LogSection, a SettlementResultPostingTransaction and, a PeriodItem. The FinancialAuditTrailDocumentation may be contained in a Host object, for example, DuePayment, DueClearing, Dunning, and PaymentAllocation from Operative Financials. The LogSection may be included in an AccountingAdjustmentRun-MDROs (e.g. InventoryPriceChangeRun, GeneralLedgerAccountBalanceDistributionRun, FixedAssetDepreciationRun, WorkInProcessClearingRun). SettlementResultPostingTransaction may be in an ExpenseReport. PeriodItem may be in an EmployeeTimeCalendar.

The elements located directly at the GeneralLedgerAccount node may be defined by the type GDT GeneralLedgerAccountElements. In some implementations, these elements can include a CompanyUUID, a ChartOfAccountsCode, a ChartOfAccountsItemCode, a GeneralLedgerFunctionalUnitUUID, a SystemAdministrativeData, and a Key. The CompanyUUID can be a universal identification of the company for which the GeneralLedgerAccount may be carried. The CompanyUUID may be based on a GDT of type UUID. The ChartOfAccountsCode can be the ChartOfAccounts of the field ChartOfAccountsItemCode. The ChartOfAccountsCode may be based on a GDT of type ChartOfAccountsCode. The ChartOfAccountsItemCode can be the item of ChartOfAccounts for which the data may be recorded. The ChartOfAccountsItemCode may be based on a GDT of type ChartOfAccountsItemCode. The GeneralLedgerFunctionalUnitUUID can be a global unique identifier of the FunctionalUnit working on the GeneralLedgerAccount, and in some implementations, can be optional. The FunctionalUnit referenced may be able to execute the organizational function 'GeneralLedger'. The element OrganisationalFunctionCode in one of the instances of the node FunctionalUnitAttributes in the FunctionalUnit references, in some implementations, has the value of '19' (GeneralLedger). The GeneralLedgerFunctionalUnitUUID may be based on a GDT of type UUID. The SystemAdministrativeData can be administrative data stored in a system. This data can include system user and change time. The SystemAdministrativeData may be based on a GDT of type SystemAdministrativeData. The Key can be a unique semantic key for the GeneralLedgerAccount. The Key may be based on a GDT of type GeneralLedgerAccountKey. The GeneralLedgerAccountKey can include the following elements: CompanyUUID, ChartOfAccountsCode and ChartOfAccountsItemCode. The CompanyUUID can be an universally unique identification of the company for which the GeneralLedgerAccount can be carried. The CompanyUUID may be based on a GDT of type UUID. The ChartOfAccountsCode can refer to the ChartOfAccounts of the field ChartOfAccountsItemCode. The ChartOfAccountsCode may be based on a GDT of type ChartOfAccountsCode. The ChartOfAccountsItemCode can refer to the item of ChartOfAccounts for which the data can be recorded. The ChartOfAccountsItemCode may be based on a GDT of type ChartOfAccountsItemCode.

The following composition relationships to subordinate nodes may exist: PeriodTotal 91052 has a cardinality relationship of 1:cn. PeriodBalance 91054 has a cardinality relationship of 1:cn. LineItem 91050 has a cardinality relationship of 1:cn. DO AccessControlList has a cardinality relationship of 1:1.

Inbound Aggregation Relationships may relate from a business object Company/node Company. Company has a cardinality relationship of 1:cn. The Company can denote the company for which the GeneralLedgerAccount may be carried. Inbound Association Relationships may relate from Business-Object FunctionalUnit/node FunctionalUnit. The GeneralLedgerAccount can identify the Functional Unit which may be working on the GeneralLedgerAccount. The GeneralLedgerFunctionalUnit has a cardinality relationship of c:cn.

Enterprise Service Infrastructure Actions may include a DoBalanceDistribution. The action DoBalanceDistribution can distribute the values accumulated on general ledger accounts during the period to other general ledger accounts. The DoBalanceDistribution, in some implementations, can have no preconditions. The DoBalanceDistribution can result in changes in the object, where the action can generate line items (via a posting framework) and adjust the period totals and period balances accordingly. The affected nodes can include LineItem, PeriodTotal, and PeriodBalance. The DoBalanceDistribution can result in changes in other objects, where the action can generate AccountingDocuments via a posting framework. The DoBalanceDistribution, in some implementations, can result in no changes to the status. The DoBalanceDistribution can include parameters, where the action elements may be defined by the data type GeneralLedgerAccountBalanceDistributionActionElements. In some implementations, these elements can include a MassDataRunObjectID, a MassDataRunObjectTypeCode, a CompanyUUID, and a SetOfBooksID. The MassDataRunObjectID can be a universally unique identifier for an Accounting Adjustment Run. The MassDataRunObjectID may be based on a GDT of type MassDataRunObjectID. The MassDataRunObjectTypeCode can be a coded representation of a type of the Mass Data Run Object. The MassDataRunObjectTypeCode may be based on a GDT of type MassDataRunObjectTypeCode. The CompanyUUID can be an universally unique identifier of the company for which the action can be executed, and in some implementations, can be optional. The CompanyUUID can be transferred when processing of the Accounting Adjustment Run is executed per company and set of books. The CompanyUUID may be based on a GDT of type UUID. The SetOfBooksID can be a unique identifier for the set of books for which the action can be executed, and in some implementations, can be optional. The SetOfBooksID can be transferred when processing of the Accounting Adjustment Run is executed per company and set of books. The SetOfBooksID may be based on a GDT of type SetOfBooksID. The action DoBalanceDistribution may be executed by the projection GeneralLedgerAccountBalanceDistributionRun of the BO template AccountingAdjustmentRun.

Queries can include a QueryByElements, which can be a query that can deliver a list of all GeneralLedgerAccounts that may fulfill random selection criteria from the quantity of elements located at the node. The query elements may be described by the data type GeneralLedgerAccountElementsQueryElements. In some implementations, the QueryByElements can include the following elements: CompanyUUID, CompanyID, ChartOfAccountsCode, ChartOfAccountsItemCode, GeneralLedgerFunctionalUnitUUID, GeneralLedgerFunctionalUnitID, and SystemAdministrativeData. The CompanyUUID, in some implementations, can be optional and may be based on a GDT of type UUID. The CompanyID, in some implementations, can be optional and may be based on a GDT of type OrganisationalCentreID. The ChartOfAccountsCode, in some implementations, can be optional and may be based on a GDT of type ChartOfAccountsCode. The ChartOfAccountsItemCode, in some implementations, can be optional and may be based on a GDT of type ChartOfAccountsItemCode. The GeneralLedgerFunctionalUnitUUID, in some implementations, can be optional and may be based on a GDT of type UUID. The GeneralLedgerFunctionalUnitID, in some implementations, can be optional and may be based on a GDT of type OrganisationalCentreID. The SystemAdministrativeData, in some implementations, can be optional and may be based on a GDT of type SystemAdministrativeData.

LineItem

A LineItem can be a record concerning the value of a quantity-based/value-based change following an individual business transaction. The detailed information it includes can represent the business transaction from the accounting view, such as a posting date and a reference to the original document. The elements located directly at the LineItem node may be defined by the data type GeneralLedgerAccountLineItemElements. In some implementations, these elements can include a UUID, a SetOfBooksID, a SegmentUUID, a ProfitCentreUUID, a PartnerCompanyUUID, a PartnerSegmentUUID, a PartnerProfitCentreUUID, an AccountingDocumentUUID, an AccountingDocumentID, an OriginalEntryDocumentContainingObjectReference, an OriginalEntryTransactionUUID, an OriginalEntryDocumentReference, an OriginalEntryDocumentItemTypeCode, a PartnerOriginalEntryDocumentID, an AccountingNotificationUUID, an ItemID, a SystemAdministrativeData, an AccountingBusinessTransactionTypeCode, a SubledgerAccountTypeCode, a SubledgerAccountLineItemTypeCode, an AccountingDocumentTypeCode, an AccountingDocumentNote, an AccountingDocumentItemNote, a ProductTaxTypeCode, a ProductTaxDueCategoryCode, a ProductTaxCountryCode, a ProductTaxEventTypeCode, a ProductTaxRateTypeCode, a WithholdingTaxTypeCode, a WithholdingTaxCountryCode, a WithholdingTaxEventTypeCode, a WithholdingTaxRateTypeCode, a PostingDate, an OriginalEntryDocumentDate, an AccountingBusinessTransactionDate, a CurrenyConversionDate, a FiscalYearVariantCode, a FiscalYearID, an AccountingPeriodID, an AccountingClosingStepCode, an AccountingDocumentItemProductTaxGroupID, an ExpenseClassificationFunctionalAreaCode, a GeneralLedgerMovementTypeCode, a DebitCreditCode, a CancellationDocumentIndicator, a CashDiscountDeductibleIndicator, a BusinessTransactionCurrencyAmount, a LineItemCurrencyAmount, a LocalCurrencyAmount, a SetOfBooksCurrencyAmount, a HardCurrencyAmount, an IndexBasedCurrencyAmount, a ValuationQuantity, and a ValuationQuantityTypeCode.

The UUID can be a universally unique identification of the LineItem, and may be an alternative key. The UUID may be based on a GDT of type UUID. The SetOfBooksID can be a unique identification of the SetOfBooks according to whose specifications the LineItem was created. The SetOfBooksID may be based on a GDT of type SetOfBooksID. The SegmentUUID can be a universally unique identification of the Segment to which the value and quantity of the LineItem may be allocated, and in some implementations, can be optional. The SegmentUUID may be based on a GDT of type UUID. The ProfitCentreUUID can be a universally unique identification of the ProfitCentre to which the value and quantity of the LineItem may be allocated, and in some implementations, can be optional. The ProfitCentreUUID may be based on a GDT of type UUID. The PartnerCompanyUUID can be a universally unique identification of a Company that can act in the business transaction stated in the LineItem as an intra corporate partner, and in some implementations, can be optional. The PartnerCompanyUUID may be based on a GDT of type UUID. The PartnerSegmentUUID can be an universally unique identification of a Segment that can act in the business transaction stated in the LineItem as an intra corporate partner, and in some implementations, can be optional. The PartnerSegmentUUID may be based on a GDT of type UUID. The PartnerProfitCentreUUID can be a universally unique identification of a ProfitCentre that can act in the business transaction stated in the LineItem as an intra corporate partner, and in some implementations, can be optional. The PartnerProfitCentreUUID may be based on a GDT of type UUID. The AccountingDocumentUUID can be a universally unique identification of the AccountingDocument that can record the entire business transaction in Accounting. The AccountingDocumentUUID may be based on a GDT of type UUID. The AccountingDocumentID can be a unique identification of the AccountingDocument that can record the entire business transaction in Accounting. The AccountingDocumentID may be based on a GDT of type BusinessTransactionDocumentID. The OriginalEntryDocumentContainingObjectReference can be a reference to an Object containing the Original Entry Document. The OriginalEntryDocumentContainingObjectReference may be based on a GDT of type ObjectNodeReference, and can have a Qualifier of OriginalEntryDocumentContaining. The OriginalEntryTransactionUUID can be a unique universal identifier of the transaction during which the Original Entry Document may have been created or changed. The OriginalEntryTransactionUUID may be based on a GDT of type UUID. The OriginalEntryDocumentReference can be a reference to the document that can keep the original entry of the business transaction. The OriginalEntryDocumentReference may be based on a GDT of type ObjectNodeReference and can have a Qualifier of OriginalEntryDocument. The OriginalEntryDocumentItemTypeCode can be a coded representation of the Item Type of the referred OriginalEntryDocumentItem. The OriginalEntryDocumentItemTypeCode may be based on a GDT of type BusinessTransactionDocumentItemTypeCode, and in some implementations, can be optional. In some implementations, this element can be used if the Original Entry Document is a Business Transaction Document. The PartnerOriginalEntryDocumentID can be an identification of the original entry document as assigned by the business partner, and in some implementations, can be optional. For example, the PartnerOriginalEntryDocumentID can be the ID of the Supplier Invoice assigned by the Supplier. The PartnerOriginalEntryDocumentID may be based on a GDT of type BusinessTransactionDocumentID. The AccountingNotificationUUID can be a unique universal identification of the notification sent to Financial Accounting about the business transaction stated in the LineItem, and in some implementations, can be optional. The AccountingNotificationUUID may be based on a GDT of type UUID. The ItemID can be the line number of the LineItem. The ItemID may be based on a GDT of type BusinessTransactionDocumentItemID. The SystemAdministrativeData can be administrative data stored in a system. This data can include the system user and change time. The SystemAdministrativeData may be based on a GDT of type SystemAdministrativeData. The AccountingBusinessTransactionTypeCode can be a coded representation of the type of the business transaction stated in the LineItem. It can classify the business transaction according to accounting criteria. The AccountingBusinessTransactionTypeCode may be based on a GDT of type AccountingBusinessTransactionTypeCode. The SubledgerAccountTypeCode can be a coded representation of the type of the subledger account that the line item can relate to. The SubledgerAccountTypeCode may be based on a GDT of type SubledgerAccountTypeCode. The SubledgerAccountLineItemTypeCode can be a coded representation of the type of the LineItem from the point of the view of the subledger account that the line item may relate to. The SubledgerAccountLineItemTypeCode may be based on a GDT of type SubledgerAccountLineItemTypeCode. The AccountingDocumentTypeCode can be a coded representation of the type of the AccountingDocument to which the LineItem can refer by the AccountingDocumentReference. The AccountingDocumentTypeCode may be based on a GDT of type AccountingDocumentTypeCode. The AccountingDocumentNote can be a natural-language comment that can apply to the AccountingDocument (referred via the AccountingDocumentReference) as a whole rather than to individual items, and in some implementations, can be optional. The AccountingDocumentNote may be based on a GDT of type SHORT_Note. The AccountingDocumentItemNote can be a natural-language comment pertaining to the AccountingDocumentItem to which the LineItem can be referred to by the AccountingDocumentReference, and in some implementations, can be optional. The AccountingDocumentItemNote may be based on a GDT of type SHORT_Note. The ProductTaxTypeCode can be the product tax type to which the line item may relate, and in some implementations, can be optional. The ProductTaxTypeCode may be based on a GDT of type TaxTypeCode. The ProductTaxDueCategoryCode can be the category (receivable or payable) of a tax due to which the line item may relate, and in some implementations, can be optional. The ProductTaxDueCategoryCode may be based on a GDT of type DueCategoryCode. The ProductTaxCountryCode can be the country to whose tax authority the product tax data has been or will be reported, and in some implementations, can be optional. The ProductTaxCountryCode may be based on a GDT of type CountryCode. The ProductTaxEventTypeCode can be the product tax event to which the line item may relate, and in some implementations, can be optional. The ProductTaxEventTypeCode may be based on a GDT of type ProductTaxEventTypeCode. The ProductTaxRateTypeCode can be the type of product tax rate to which the line item total may relate, and in some implementations, can be optional. The ProductTaxRateTypeCode may be based on a GDT of type TaxRateTypeCode. The WithholdingTaxTypeCode can be the withholding tax type to which the line item may relate, and is optional. The WithholdingTaxTypeCode may be based on a GDT of type TaxTypeCode. The WithholdingTaxCountryCode can be the country to whose tax authority the withholding tax data has been or can be reported, and in some implementations, can be optional. The WithholdingTaxCountryCode may be based on a GDT of type CountryCode. The WithholdingTaxEventTypeCode can be the witholding tax event to which the line item may relate, and in some implementations, can be optional. The WithholdingTaxEventTypeCode may be based on a GDT of type WithholdingTaxEventTypeCode. The WithholdingTaxRateTypeCode can be the type of withholding tax rate to which the line item may relate, and in some implementations, can be optional. The WithholdingTaxRateTypeCode may be based on a GDT of type TaxRateTypeCode. The PostingDate can be the date with which the business transaction may be effectively recorded in Accounting. Effectively can mean that period totals and balances in accounting may be updated with this date. The PostingDate may be based on a GDT of type Date, and can have a Qualifier of Posting. The OriginalEntryDocumentDate can be the issue date of the Original Entry Document. The OriginalEntryDocumentDate may be based on a GDT of type Date, and can have a Qualifier of OriginalEntryDocument. The AccountingBusinessTransactionDate can be the date at which the business transaction took place applying the criteria of accounting. The AccountingBusinessTransactionDate may be based on a GDT of type Date and can have a Qualifier of BusinessTransaction. The CurrenyConversionDate can be the date that is used for the currency translation applied to amounts in the accounting document, and in some implementations, can be optional. The CurrenyConversionDate may be based on a GDT of type Date and can have a Qualifier of CurrencyConversion.

The FiscalYearVariantCode can be a coded representation of the FiscalYearVariant according to whose fiscal year definition (begin, end, period definition) the FiscalYearID and the AccountingPeriodID may be derived. The FiscalYearVariantCode may be based on a GDT of type FiscalYearVariantCode. The FiscalYearID can be the identification of the fiscal year in which the LineItem may be posted. The FiscalYearID may be based on a GDT of type FiscalYearID. The AccountingPeriodID can be an identification of the accounting period in which the LineItem may be posted, and in some implementations, can be optional. The AccountingPeriodID may be based on a GDT of type AccountingPeriodID. The AccountingClosingStepCode can be a coded representation of the closing step of the accounting document, and in some implementations, can be optional. The AccountingClosingStepCode may be based on a GDT of type AccountingClosingStepCode. The AccountingDocumentItemProductTaxGroupID can be a unique identification of a group of AccountingDocumentItems that can belong together because they may be tax relevant and may have the same taxation and related tax items, and in some implementations, can be optional. The AccountingDocumentItemProductTaxGroupID may be based on a GDT of type BusinessTransactionDocumentItemGroupID. The ExpenseClassificationFunctionalAreaCode can be a coded representation of the functional area to which the value and quantity of the LineItem may be allocated, and in some implementations, can be optional. The ExpenseClassificationFunctionalAreaCode may be based on a GDT of type ExpenseClassificationFunctionalAreaCode. The GeneralLedgerMovementTypeCode can be a coded representation of the type of movement with which the value change may be recorded for General Ledger purposes in the GeneralLedgerAccount, and in some implementations, can be optional. The GeneralLedgerMovementTypeCode may be based on a GDT of type GeneralLedgerMovementTypeCode. The DebitCreditCode can be a coded representation of debit or credit. It can specify whether the line item may be assigned to the debit or credit side of the General Ledger account. The DebitCreditCode may be based on a GDT of type DebitCreditCode. The CancellationDocumentIndicator can indicate whether the AccountingDocument to which the LineItem may refer to by the AccountingDocumentReference can refer to a cancellation document, and in some implementations, can be optional. The CancellationDocumentIndicator may be based on a GDT of type Indicator, and can have a Qualifier of CancellationDocument. The CashDiscountDeductibleIndicator can indicate whether a cash discount may be deducted from the line item. The CashDiscountDeductibleIndicator may be based on a GDT of type Indicator, and can have a Qualifier of CashDiscountDeductible. The BusinessTransactionCurrencyAmount can be the value of the LineItem in transaction currency, and in some implementations, can be optional. The transaction currency can be the currency agreed on by two business partners for their business relationship. The BusinessTransactionCurrencyAmount may be based on a GDT of type Amount, and can have a Qualifier of BusinessTransactionCurrency. The LineItemCurrencyAmount can be the value of the LineItem LineItem currency, and in some implementations, can be optional. The LineItemCurrencyAmount may be based on a GDT of type Amount, and can have a Qualifier of LineItemCurrency.

The LocalCurrencyAmount can be the value of the LineItem in the local currency of the Company carrying the account. The local currency may be the currency in which the local books can be kept. The LocalCurrencyAmount may be based on a GDT of type Amount, and can have a Qualifier of LocalCurrency. The SetOtfBooksCurrencyAmount can be the value of the LineItem in the currency selected for the set of books, and in some implementations, can be optional. The SetOfBooksCurrencyAmount may be based on a GDT of type Amount, and can have a Qualifier of SetOfBooksCurrency. The HardCurrencyAmount can be the value of the LineItem, in the hard currency of the country of the Company carrying the account, and in some implementations, can be optional. The hard currency can be a stable, country-specific currency that can be used in high-inflation countries. The HardCurrencyAmount may be based on a GDT of type Amount, and can have a Qualifier of HardCurrency. The IndexBasedCurrencyAmount can be the value of the LineItem in the index-based currency of the country of the Company carrying the account, and in some implementations, can be optional. The index-based currency can be a fictitious, country-specific currency that may be used in high-inflation countries as a comparison currency for reporting. The IndexBasedCurrencyAmount may be based on a GDT of type Amount, and can have a Qualifier of IndexBasedCurrency. The ValuationQuantity can be the quantity change of the business transaction that may be stated in the line item in the valuation unit of measurement of the material, service product, or resource, and in some implementations, can be optional. The ValuationQuantity may be based on a GDT of type Quantity, and can have a Qualifier of Valuation. The ValuationQuantityTypeCode can be a coded representation of the type of the valuation quantity, and in some implementations, can be optional. The ValuationQuantityTypeCode may be based on a GDT of type QuantityTypeCode, and can have a Qualifier of Valuation.

The following Inbound Aggregation Relationships from business object AccountingEntry/Root may exist. AccountingEntry has a cardinality relationship of c:cn. The AccountingEntry can be a line item that may originate as a result of a business transaction recorded in an accounting entry. Each accounting entry may have at least one line item.

The following Inbound Aggregation Relationships from business object GoodsAndServiceAcknowledgement/node GoodsAndServiceAcknowledgement may exist. GoodsAndServiceAcknowledgement has a cardinality relationship of c:cn. The GoodsAndServiceAcknowledgement can be a line item that may originate as a result of a business transaction recorded in a GoodsAndServiceAcknowledgement.

The following Inbound Aggregation Relationships from business object GoodsAndActivityConfirmation/node GoodsAndActivityConfirmation may exist. GoodsAndActivityConfirmation has a cardinality relationship c:cn. The GoodsAndActivityConfirmation can be a line item that may originate as a result of a business transaction recorded in a GoodsAndActivityConfirmation.

The following Inbound Aggregation Relationships from business object SiteLogisticsConfirmation/node SiteLogisticsConfirmation may exist. SiteLogisticsConfirmation has a cardinality relationship c:cn. The SiteLogisticsConfirmation can be a line item that may originate as a result of a business transaction recorded in a SiteLogisticsConfirmation.

The following Inbound Aggregation Relationships from business object ProductionConfirmation/node ProductionConfirmation may exist. ProductionConfirmation has a cardinality relationship c:cn, The ProductionConfirmation can be a line item that may originate as a result of a business transaction recorded in a ProductionConfirmation.

The following Inbound Aggregation Relationships from business object ProductionConfirmation node InventoryChangeItem may exist. ProductionConfirmationInventoryChangeItem has a cardinality relationship c:cn. The ProductionConfirmationInventoryChangeItem can be an InventoryChangeItem in a ProductionConfirmation serving as Original Entry Document Item by which the value change recorded in the LineItem can be verified.

The following Inbound Aggregation Relationships from business object ServiceConfirmation/node ServiceConfirmation may exist. ServiceConfirmation has a cardinality relationship of c:cn. The ServiceConfirmation can be a line item that may originate as a result of a business transaction recorded in a ServiceConfirmation.

The following Inbound Aggregation Relationships from business object EmployeeTimeCalendar/node EmployeeTimeCalendar may exist. EmployeeTimeCalendar has a cardinality relationship of c:cn. The EmployeeTimeCalendar can be a line item that may originate as a result of a business transaction recorded in a EmployeeTimeCalendar.

The following Inbound Aggregation Relationships from business object EmployeeTimeCalendar/node PeriodItem may exist. EmployeeTimeCalendarPeriodItem has a cardinality relationship of c:cn. The EmployeeTimeCalendarPeriodItem can be a reference to a PeriodItem that may serve as an Original Entry Document for a business transaction in an EmployeeTimeCalendar.

The following Inbound Aggregation Relationships from business object CustomerInvoice/node CustomerInvoice may exist. CustomerInvoice has a cardinality relationship of c:cn. The CustomerInvoice can be a line item that may originate as a result of a business transaction recorded in a CustomerInvoice.

The following Inbound Aggregation Relationships from business object SupplierInvoice/node SupplierInvoice may exist. SupplierInvoice has a cardinality relationship of c:cn The SupplierInvoice can be a line item that may originate as a result of a business transaction recorded in a SupplierInvoice.

The following Inbound Aggregation Relationships from business object ExpenseReport/node ExpenseReport may exist. ExpenseReport has a cardinality relationship of c:cn. The ExpenseReport can be a line item may originate as a result of a business transaction recorded in an ExpenseReport.

The following Inbound Aggregation Relationships from business object ExpenseReport/node SettlementResultPostingTransaction can exist. ExpenseReportSettlementResultPostingTransaction has a cardinality relationship of c:cn. The ExpenseReportSettlementResultPostingTransaction can be a reference to a FinancialAuditTrailDocumentation that can serve as an Original Entry Document for a business transaction in an ExpenseReport.

The following Inbound Aggregation Relationships from business object BankStatement/node BankStatement may exist. BankStatement has a cardinality relationship of c:cn. The BankStatement can be a line item that may originate as a result of a business transaction recorded in a BankStatement.

The following Inbound Aggregation Relationships from business object PaymentAllocation/node PaymentAllocation may exist. PaymentAllocation has a cardinality relationship of c:cn. The PaymentAllocation can be a line item that may originate as a result of a business transaction recorded in a PaymentAllocation.

The following Inbound Aggregation Relationships from business object IncomingCheck/node IncomingCheck may exist. IncomingCheck has a cardinality relationship of c:cn. The IncomingCheck can be a line item that may originate as a result of a business transaction recorded in an IncomingCheck.

The following Inbound Aggregation Relationships from business object PaymentOrder/node PaymentOrder may exist. PaymentOrder has a cardinality relationship of c:cn. The PaymentOrder can be a line item that may originate as a result of a business transaction recorded in a PaymentOrder.

The following Inbound Aggregation Relationships from business object BillOfExchangeReceivable/node BillOfExchangeReceivable may exist. BillOfExchangeReceivable has a cardinality relationship of c:cn. The BillOfExchangeReceivable can be a line item that may originate as a result of a business transaction recorded in a BillOfExchangeReceivable.

The following Inbound Aggregation Relationships from business object CashPayment/node CashPayment may exist. CashPayment has a cardinality relationship of c:cn. The CashPayment can be a line item that may originate as a result of a business transaction recorded in a CashPayment.

The following Inbound Aggregation Relationships from business object CashTransfer/node CashTransfer may exist. CashTransfer has a cardinality relationship of c:cn. The CashTransfer can be a line item that may originate as a result of a business transaction recorded in a CashTransfer.

The following Inbound Aggregation Relationships from business object BillOfExchangeSubmission/node BillOfExchangeSubmission may exist. BillOfExchangeSubmission has a cardinality relationship of c:cn. The BillOfExchangeSubmission can be a line item that may originate as a result of a business transaction recorded in a BillOfExchangeSubmission.

The following Inbound Aggregation Relationships from business object CheckDeposit/node CheckDeposit may exist. CheckDeposit has a cardinality relationship of c:cn. The CheckDeposit can be a line item that may originate as a result of a business transaction recorded in a CheckDeposit.

The following Inbound Aggregation Relationships from business object DueClearing/node DueClearing may exist. DueClearing has a cardinality relationship of c:cn. The DueClearing can be a line item that may originate as a result of a business transaction recorded in a DueClearing.

The following Inbound Aggregation Relationships from business object ProductTaxDeclaration/node ProductTaxDeclaration may exist. ProductTaxDeclaration has a cardinality relationship of c:cn. The ProductTaxDeclaration can be a line item that may originate as a result of a business transaction recorded in a ProductTaxDeclaration.

The following Inbound Aggregation Relationships from business object WithholdingTaxDeclaration/node WithholdingTaxDeclaration may exist. WithholdingTaxDeclaration has a cardinality relationship of c:cn. The WithholdingTaxDeclaration can be a line item that may originate as a result of a business transaction recorded in a WithholdingTaxDeclaration.

The following Inbound Aggregation Relationships from business object DuePayment/node DuePayment may exist. DuePayment has a cardinality relationship of c:cn. The DuePayment can be a line item that may originate as a result of a business transaction recorded in a DuePayment.

The following Inbound Aggregation Relationships from business object DuePayment/node FinancialAuditTrailDocumentation may exist. DuePaymentFinancialAuditTrailDocumentation has a cardinality relationship of c:cn. The DuePaymentFinancialAuditTrailDocumentation can be a reference to a FinancialAuditTrailDocumentation that may serve as an Original Entry Document for a business transaction in a DuePayment. In some implementations, one of the above relationships to an Operational Document exists. If the Operational Document contained in a Business Object is different from the Operational Document then the corresponding relationship to this Business Object also exists.

The following Inbound Aggregation Relationships from business object SetOfBooks/node SetOfBooks may exist. SetOfBooks has a cardinality relationship of 1:cn. The SetOfBooks can be a LineItem that may relate to a SetOfBooks for which the line item may be recorded.

The following Inbound Aggregation Relationships from business object Company/node Company may exist. PartnerCompany has a cardinality relationship of c:cn. The PartnerCompany can be a LineItem that may relate to a partner company to which the line item may be assigned.

The following Inbound Aggregation Relationships from business object Segment/node Segment may exist. Segment has a cardinality relationship of c:cn. The Segment can be a LineItem that can relate to a segment to which the line item may be assigned. PartnerSegment has a cardinality relationship of c:cn. The PartnerSegment can be a LineItem that can relate to a partner segment to which the line item may be assigned.

The following Inbound Aggregation Relationships from business object ProfitCentre/node ProfitCentre. ProfitCentre has a cardinality relationship of c:cn. The ProfitCentre can be a LineItem that can relate to a profit center to which the line item may be assigned. PartnerProfitCentre has a cardinality of relationship c:cn. The PartnerProfitCentre can be a LineItem that can relate to a partner profit center to which the line item may be assigned.

The following Inbound Association Relationships from business object AccountingNotification/node AccountingNotification may exist. AccountingNotification has a cardinality relationship of c:cn. The AccountingNotification can be a line item that may originate as a result of a business transaction that was represented in an accounting notification. An accounting notification can produce a line item.

The following Inbound Association Relationships from business object Identity/node Identity may exist. CreationIdentity has a cardinality relationship of 1:cn. The CreationIdentity can be the system user Identity who created the LineItem.

The following Inbound Association Relationships for Navigation from business object AccountingDocument/node AccountingDocument may exist. AccountingDocument has a cardinality relationship of 1:n. The AccountingDocument can be a LineItem that can relate to the accounting document to which the item can be assigned.

Queries may include QueryByElements. The QueryByElements query can deliver a list of all LineItems that fulfill random selection criteria from the quantity of elements located at the node as well as elements located at the root node. The query elements are described by the data type GeneralLedgerAccountLineItemElementsQueryElements. In some implementations, these elements can include a CompanyUUID, a CompanyID, a ChartOfAccountsCode, a ChartOfAccountsItemCode, an UUID, a SetOfBooksID, a SegmentUUID, a SegmentID, a ProfitCentreUUID, a ProfitCentreID, a PartnerCompanyUUID, a PartnerCompanyID, a PartnerSegmentUUID, a PartnerSegmentID, a PartnerProfitCentreUUID, a PartnerProfitCentreID, an AccountingDocumentUUID, an AccountingDocumentID, an ItemID, an AccountingNotificationUUID, an OriginalEntryDocumentContainingObjectReference, an OriginalEntryTransactionUUID, an OriginalEntryDocumentReference, an OriginalEntryDocumentItemTypeCode, a SystemAdministrativeData, a FiscalYearID, a FiscalYearVariantCode, an AccountingPeriodID, an AccountingClosingStepCode, a GeneralLedgerMovementTypeCode, an ExpenseClassificationFunctionalAreaCode, a ProductTaxTypeCode, a ProductTaxDueCategoryCode, a ProductTaxEventTypeCode, a ProductTaxRateTypeCode, a ProductTaxCountryCode, a WithholdingTaxTypeCode, a WithholdingTaxEventTypeCode, a WithholdingTaxRateTypeCode, a WithholdingTaxCountryCode, an AccountingBusinessTransactionTypeCode, an AccountingDocumentItemProductTaxGroupID, a SubledgerAccountTypeCode, a SubledgerAccountLineItemTypeCode, a DebitCreditCode, an AccountingDocumentTypeCode, an AccountingDocumentNote, an AccountingDocumentItemNote, a CancellationDocumentIndicator, a CashDiscountDeductibleIndicator, an AccountingBusinessTransactionDate, a PostingDate, an OriginalEntryDocumentDate, a CurrenyConversionDate, a BusinessTransactionCurrencyAmount, a LineItemCurrencyAmount, a LocalCurrencyAmount, a SetOfBooksCurrencyAmount, a HardCurrencyAmount, an IndexBasedCurrencyAmount, a ValuationQuantity, and a ValuationQuantityTypeCode.

CompanyUUID may be based on a GDT of type UUID, and in some implementations, can be optional. CompanyID may be based on a GDT of type OrganisationalCentreID, and in some implementations, can be optional. ChartOfAccountsCode may be based on a GDT of type ChartOfAccountsCode, and in some implementations, can be optional. ChartOfAccountsItemCode may be based on a GDT of type ChartOfAccountsItemCode, and in some implementations, can be optional. UUID may be based on a GDT of type UUID, and in some implementations, can be optional. SetOfBooksID may be based on a GDT of type SetOfBooksID, and in some implementations, can be optional. SegmentUUID may be based on a GDT of type UUID, and in some implementations, can be optional. SegmentID may be based on a GDT of type OrganisationalCentreID, and in some implementations, can be optional. ProfitCentreUUID may be based on a GDT of type UUID, and in some implementations, can be optional. ProfitCentreID may be based on a GDT of type OrganisationalCentreID, and in some implementations, can be optional. PartnerCompanyUUID may be based on a GDT of type UUID, and in some implementations, can be optional. PartnerCompanyID may be based on a GDT of type OrganisationalCentreID, and in some implementations, can be optional. PartnerSegmentUUID may be based on a GDT of type UUID, and in some implementations, can be optional. PartnerSegmentID may be based on a GDT of type OrganisationalCentreID, and in some implementations, can be optional. PartnerProfitCentreUUID may be based on a GDT of type UUID, and in some implementations, can be optional. PartnerProfitCentreID may be based on a GDT of type OrganisationalCentreID, and in some implementations, can be optional. AccountingDocumentUUID may be based on a GDT of type UUID, and in some implementations, can be optional. AccountingDocumentID may be based on a GDT of type BusinessTransactionDocumentID, and in some implementations, can be optional. ItemID may be based on a GDT of type BusinessTransactionDocumentItemID, and in some implementations, can be optional. AccountingNotificationUUID may be based on a GDT of type UUID, and in some implementations, can be optional. OriginalEntryDocumentContainingObjectReference may be based on a GDT of type ObjectNodeReference, can have a Qualifier of OriginalEntryDocumentContaining, and in some implementations, can be optional. OriginalEntryTransactionUUID may be based on a GDT of type UUID, and in some implementations, can be optional. OriginalEntryDocumentReference may be based on a GDT of type ObjectNodeReference, and in some implementations, can be optional. OriginalEntryDocumentItemTypeCode may be based on a GDT of type BusinessTransactionDocumentItemTypeCode, and in some implementations, can be optional. SystemAdministrativeData may be based on a GDT of type SystemAdministrativeData, and in some implementations, can be optional. FiscalYearID may be based on a GDT of type FiscalYearID, and in some implementations, can be optional. FiscalYearVariantCode may be based on a GDT of type FiscalYearVariantCode, and in some implementations, can be optional. AccountingPeriodID may be based on a GDT of type AccountingPeriodID, and in some implementations, can be optional. AccountingClosingStepCode may be based on GDT AccountingClosingStepCode, and in some implementations, can be optional. GeneralLedgerMovementTypeCode may be based on a GDT of type GeneralLedgerMovementTypeCode, and in some implementations, can be optional. ExpenseClassificationFunctionalAreaCode may be based on a GDT of type ExpenseClassificationFunctionalAreaCode, and in some implementations, can be optional. ProductTaxTypeCode may be based on a GDT of type TaxTypeCode, and in some implementations, can be optional. ProductTaxDueCategoryCode may be based on a GDT of type DueCategoryCode, and in some implementations, can be optional. ProductTaxEventTypeCode may be based on a GDT of type ProductTaxEventTypeCode, and in some implementations, can be optional. ProductTaxRateTypeCode may be based on a GDT of type TaxRateTypeCode, and in some implementations, can be optional. ProductTaxCountryCode may be based on a GDT of type CountryCode, and in some implementations, can be optional. WithholdingTaxTypeCode may be based on a GDT of type TaxTypeCode, and in some implementations, can be optional. WithholdingTaxEventTypeCode may be based on a GDT of type WithholdingTaxEventTypeCode, and in some implementations, can be optional. WithholdingTaxRateTypeCode may be based on a GDT of type TaxRateTypeCode, and in some implementations, can be optional. WithholdingTaxCountryCode may be based on a GDT of type CountryCode, and in some implementations, can be optional. AccountingBusinessTransactionTypeCode may be based on a GDT of type AccountingBusinessTransactionTypeCode, and in some implementations, can be optional. AccountingDocumentItemProductTaxGroupID may be based on a GDT of type BusinessTransactionDocumentItemGroupID, and in some implementations, can be optional. SubledgerAccountTypeCode may be based on a GDT of type SubledgerAccountTypeCode, and in some implementations, can be optional. SubledgerAccountLineItemTypeCode may be based on a GDT of type SubledgerAccountLineItemTypeCode. DebitCreditCode may be based on a GDT of type DebitCreditCode, and in some implementations, can be optional. AccountingDocumentTypeCode may be based on a GDT of type AccountingDocumentTypeCode, and in some implementations, can be optional. AccountingDocumentNote may be based on a GDT of type SHORT_Note, and in some implementations, can be optional. AccountingDocumentItemNote may be based on a GDT of type SHORT_Note, and in some implementations, can be optional. CancellationDocumentIndicator may be based on a GDT of type Indicator, can have a Qualifier of CancellationDocument, and in some implementations, can be optional. CashDiscountDeductibleIndicator may be based on a GDT of type Indicator, can have a Qualifier of CashDiscountDeductible, and in some implementations, can be optional. AccountingBusinessTransactionDate may be based on a GDT of type Date, can have a Qualifier of BusinessTransaction, and in some implementations, can be optional. PostingDate may be based on a GDT of type Date, can have a Qualifier of Posting, and in some implementations, can be optional. OriginalEntryDocumentDate may be based on a GDT of type Date, can have a Qualifier of Document, and in some implementations, can be optional. CurrenyConversionDate may be based on a GDT of type Date, can have a Qualifier of CurrencyConversion, and in some implementations, can be optional. BusinessTransactionCurrencyAmount may be based on a GDT of type Amount, can have a Qualifier of BusinessTransactionCurrency, and in some implementations, can be optional. LineItemCurrencyAmount may be based on a GDT of type Amount, can have a Qualifier of LineItemCurrency, and in some implementations, can be optional. LocalCurrencyAmount may be based on a GDT of type Amount, can have a Qualifier of LocalCurrency, and in some implementations, can be optional. SetOfBooksCurrencyAmount may be based on a GDT of type Amount, can have a Qualifier of SetOfBooksCurrency, and in some implementations, can be optional. HardCurrencyAmount may be based on a GDT of type Amount, can have a Qualifier of HardCurrency, and in some implementations, can be optional. IndexBasedCurrencyAmount may be based on a GDT of type Amount, can have a Qualifier of IndexBasedCurrency, and in some implementations, can be optional. ValuationQuantity may be based on a GDT of type Quantity, can have a Qualifier of Valuation, and in some implementations, can be optional. ValuationQuantityTypeCode may be based on a GDT of type QuantityTypeCode, can have a Qualifier of Valuation, and in some implementations, can be optional.

PeriodTotal

A PeriodTotal can be a record for a GeneralLedgerAccount about period-specific changes to quantities and values for a set of books. The PeriodTotal can be attributed to other dimensions, such as profit center, segment, or functional area. The elements located directly at the PeriodTotal node may be defined by a GDT of type GeneralLedgerAccountPeriodTotalElements. In some implementations, these elements can include a SetOfBooksID, a SegmentUUID, a ProfitCentreUUID, a PartnerCompanyUUID, a PartnerSegmentUUID, a PartnerProfitCentreUUID, a FiscalYearVariantCode, a FiscalYearID, an AccountingPeriodID, an AccountingClosingStepCode, an AccountingBusinessTransactionTypeCode, an OriginalEntryDocumentObjectTypeCode, a SubledgerAccountTypeCode, a DebitCreditCode, an ExpenseClassificationFunctionalAreaCode, a GeneralLedgerMovementTypeCode, a ProductTaxTypeCode, a ProductTaxDueCategoryCode, a ProductTaxCountryCode, a ProductTaxEventTypeCode, a ProductTaxRateTypeCode, a WithholdingTaxTypeCode, a WithholdingTaxCountryCode, a WithholdingTaxEventTypeCode, a WithholdingTaxRateTypeCode, a LineItemCurrencyAmount, a LocalCurrencyAmount, a SetOfBooksCurrencyAmount, a HardCurrencyAmount, an IndexBasedCurrencyAmount, a ValuationQuantity, and a ValuationQuantityTypeCode.

SetOfBooksID can be a unique universal identification of the SetOfBooks according to whose specifications the PeriodTotal was created and updated. The SetOfBooksID may be based on a GDT of type SetOfBooksID. SegmentUUID can be a unique universal identification of the Segment to which the value and quantity of the PeriodTotal may be allocated, and in some implementations, can be optional. The SegmentUUID may be based on a GDT of type UUID. ProfitCentreUUID can be a unique universal identification of the ProfitCentre to which the value and quantity of the PeriodTotal may be allocated, and in some implementations, can be optional. The ProfitCentreUUID may be based on a GDT of type UUID. PartnerCompanyUUID can be a unique universal identification of a Company that can act in the business transactions for which the PeriodTotal can document summarized quantities and values as an intra corporate partner, and in some implementations, can be optional. PartnerCompanyUUID may be based on a GDT of type UUID. PartnerSegmentUUID can be a unique universal identification of a Segment that can act in the business transactions for which the PeriodTotal can document summarized quantities and values as an intra corporate partner, and in some implementations, can be optional. The PartnerSegmentUUID may be based on a GDT of type UUID. PartnerProfitCentreUUID can be a unique universal identification of a ProfitCentre that acts in the business transactions for which the PeriodTotal documents summarized quantities and values as an intra corporate partner, and in some implementations, can be optional. The PartnerProfitCentreUUID may be based on a GDT of type UUID.

FiscalYearVariantCode can be a coded representation of the FiscalYearVariant according to whose fiscal year definition (begin, end, period definition) the FiscalYearID and the AccountingPeriodID may be derived. The FiscalYearVariantCode may be based on a GDT of type FiscalYearVariantCode. FiscalYearID can be an identification of the fiscal year in which the LineItem may be posted for which the PeriodTotal can keep summarized values and quantities. The FiscalYearID may be based on a GDT of type FiscalYearID. AccountingPeriodID can be an identification of the accounting period in which the LineItem may be posted for which the PeriodTotal can keep summarized values and quantities. The AccountingPeriodID may be based on a GDT of type AccountingPeriodID. AccountingClosingStepCode can be a coded representation of the closing step in accounting to which the PeriodTotal may relate. The AccountingClosingStepCode may be based on a GDT of type AccountingClosingStepCode. AccountingBusinessTransactionTypeCode can be a coded representation of the type of the business transactions for which the PeriodTotal can keep summarized quantities and values. It can classify the business transactions according to accounting criteria. The AccountingBusinessTransactionTypeCode may be based on a GDT of type AccountingBusinessTransactionTypeCode. OriginalEntryDocumentObjectTypeCode can specify the object type of the original documents for which the amounts may have been entered into the period total. The OriginalEntryDocumentObjectTypeCode may be based on a GDT of type ObjectTypeCode. SubledgerAccountTypeCode can be a coded representation of the type of subledger account to which the PeriodTotal may relate. The SubledgerAccountTypeCode may be based on a GDT of type SubledgerAccountTypeCode. DebitCreditCode can be a coded representation of debit or credit. It can specify whether the PeriodTotal adds up debit or credit values. The DebitCreditCode may be based on a GDT of type DebitCreditCode.

ExpenseClassificationFunctionalAreaCode can be a coded representation of the functional area to which the PeriodTotal may relate, and in some implementations, can be optional. The ExpenseClassificationFunctionalAreaCode may be based on a GDT of type ExpenseClassificationFunctionalAreaCode. GeneralLedgerMovementTypeCode can be a coded representation of the type of movement to the G/L account to which the PeriodTotal may relate, and in some implementations, can be optional. The GeneralLedgerMovementTypeCode may be based on a GDT of type GeneralLedgerMovementTypeCode. ProductTaxTypeCode can be a coded representation of the product tax type to which the PeriodTotal may relate, and in some implementations, can be optional. The ProductTaxTypeCode may be based on a GDT of type TaxTypeCode. ProductTaxDueCategoryCode can be a coded representation of the category (receivable or payable) of a tax due to which the PeriodTotal may relate, and in some implementations, can be optional. The ProductTaxDueCategoryCode may be based on a GDT of type DueCategoryCode. ProductTaxCountryCode can be a coded representation of the country to whose tax authority the product tax data may have been or can be reported, and in some implementations, can be optional. ProductTaxCountryCode may be based on a GDT of type CountryCode. ProductTaxEventTypeCode can be a coded representation of the product tax event to which the PeriodTotal may relate, and in some implementations, can be optional. The ProductTaxEventTypeCode may be based on a GDT of type ProductTaxEventTypeCode. ProductTaxRateTypeCode can be a coded representation of the type of product tax rate to which the PeriodTotal relates, and in some implementations, can be optional. The ProductTaxRateTypeCode may be based on a GDT of type TaxRateTypeCode. WithholdingTaxTypeCode can be a coded representation of the withholding tax type to which the PeriodTotal may relate. The WithholdingTaxTypeCode may be based on a GDT of type TaxTypeCode.

WithholdingTaxCountryCode can be a coded representation of the country to whose tax authority the withholding tax data has been or will be reported, and in some implementations, can be optional. The WithholdingTaxCountryCode may be based on a GDT of type CountryCode. WithholdingTaxEventTypeCode can be a coded representation of the witholding tax event to which the PeriodTotal may relate, and in some implementations, can be optional. The WithholdingTaxEventTypeCode may be based on a GDT of type WithholdingTaxEventTypeCode. WithholdingTaxRateTypeCode can be a coded representation of the type of withholding tax rate to which the PeriodTotal may relate, and in some implementations, can be optional. The WithholdingTaxRateTypeCode may be based on a GDT of type TaxRateTypeCode. LineItemCurrencyAmount can be the value of the PeriodTotal in the LineItem currency. The LineItemCurrencyAmount may be based on a GDT of type Amount, and can have a Qualifier of LineItemCurrency. The value reported here can match the total of all values in LineItem currency that may be documented in the LineItems. LocalCurrencyAmount can be the value of the PeriodTotal in the local currency of the Company carrying the GeneralLedgerAccount. The local currency can be the currency in which the local books may be kept. The LocalCurrencyAmount may be based on a GDT of type Amount, and can have a Qualifier of LocalCurrency. The value reported here can match the total of all values in local currency that are documented in the LineItems. SetOfBooksCurrencyAmount can be the value of the PeriodTotal in the currency selected for the set of books, and in some implementations, can be optional. The SetOfBooksCurrencyAmount may be based on a GDT of type Amount, and can have a Qualifier of SetOfBooksCurrency. The value reported here can match the total of all values in the additional currency selected for the set of books that may be documented in the LineItems.

HardCurrencyAmount can be the value of the PeriodTotal in the hard currency of the country of the Company carrying the GeneralLedgerAccount, and in some implementations, can be optional. The hard currency can be a stable, country-specific currency that may be used in high-inflation countries. The HardCurrencyAmount may be based on a GDT of type Amount, and can have a Qualifier of HardCurrency. The value reported here can match the total of all values in the hard currency that are documented in the LineItems. IndexBasedCurrencyAmount can be the value of the PeriodTotal in the index-based currency of the country of the Company carrying the GeneralLedgerAccount. The index-based currency can be a fictitious, country-specific currency that may be used in high-inflation countries as a comparison currency for reporting. The IndexBasedCurrencyAmount may be based on a GDT of type Amount, and can have a Qualifier of IndexBasedCurrency. The value reported here may match the total of all values in the index-based currency that may be documented in LineItems. ValuationQuantity can be the quantity of the PeriodTotal in the valuation unit of the material, and in some implementations, can be optional. The valuation unit can be the unit in which consumed or manufactured materials or production activities may be valuated in Financial Accounting. The ValuationQuantity may be based on a GDT of type Quantity, and can have a Qualifier of Valuation. The quantity reported here can match the total of all changes in the valuation quantity that may be documented in the LineItems. ValuationQuantityTypeCode can be a coded representation of the type of the valuation quantity, and in some implementations, can be optional. The ValuationQuantityTypeCode may be based on a GDT of type QuantityTypeCode, and can have a Qualifier of Valuation.

The following Inbound Aggregation Relationships from business object Company/node Company may exist. PartnerCompany has a cardinality relationship of c:cn. The PartnerCompany can be a PeriodTotal that can relate to a partner company to which the period total may be to be assigned.

The following Inbound Aggregation Relationships from business object Segment/node Segment may exist. Segment has a cardinality relationship of c:cn. The Segment can be a PeriodTotal that can relate to a segment to which the period total may be assigned. PartnerSegment has a cardinality relationship of c:cn. The PartnerSegment can be a PeriodTotal that can relate to a partner segment to which period total may be assigned.

The following Inbound Aggregation Relationships from business object ProfitCentre/node ProfitCentre may exist. ProfitCentre has a cardinality relationship of c:cn. The ProfitCentre can be a PeriodTotal that can relate to a profit center to which the period total may be assigned. PartnerProfitCentre has a cardinality relationship of c:cn. The PartnerProfitCentre can be a PeriodTotal that can relate to a partner profit center to which the period total may be assigned.

The following Inbound Aggregation Relationships from business object SetOfBooks/node SetOfBooks may exist. SetOfBooks has a cardinality relationship of 1:cn. The SetOfBooks can be a PeriodTotal can relate to a SetOfBooks for which the period total may be recorded.

Queries can include QueryByElements. QueryByElements can be a query that can deliver a list of all PeriodTotals that may fulfill random selection criteria from the quantity of elements located at the node as well as elements located at the root node. The query elements may be described by the data type GeneralLedgerAccountPeriodTotalElementsQueryElements. In some implementations, these elements can include a CompanyUUID, a CompanyID, a ChartOfAccountsCode, a ChartOfAccountsItemCode, a SetOfBooksID, a SegmentUUID, a SegmentID, a ProfitCentreUUID, a ProfitCentreID, a PartnerCompanyUUID, a PartnerCompanyID, a PartnerSegmentUUID, a PartnerSegmentID, a PartnerProfitCentreUUID, a PartnerProfitCentreID, a FiscalYearID, a FiscalYearVariantCode, an AccountingPeriodID, an AccountingClosingStepCode, an AccountingBusinessTransactionTypeCode, an OriginalEntryDocumentObjectTypeCode, a SubledgerAccountTypeCode, a DebitCreditCode, a GeneralLedgerMovementTypeCode, an ExpenseClassificationFunctionalAreaCode, a ProductTaxTypeCode, a ProductTaxDueCategoryCode, a ProductTaxEventTypeCode, a ProductTaxRateTypeCode, a ProductTaxCountryCode, a WithholdingTaxTypeCode, a WithholdingTaxEventTypeCode, a WithholdingTaxRateTypeCode, a WithholdingTaxCountryCode, a LineItemCurrencyAmount, a LocalCurrencyAmount, a SetOfBooksCurrencyAmount, a HardCurrencyAmount, an IndexBasedCurrencyAmount, A ValuationQuantity, and a ValuationQuantityTypeCode.

CompanyUUID may be based on a GDT of type UUID, and in some implementations, can be optional. CompanyID may be based on a GDT of type OrganisationalCentreID, and in some implementations, can be optional. ChartOfAccountsCode may be based on a GDT of type ChartOfAccountsCode, and in some implementations, can be optional. ChartOfAccountsItemCode may be based on a GDT of type ChartOfAccountsItemCode, and in some implementations, can be optional. SetOfBooksID may be based on a GDT of type SetOfBooksID. SegmentUUID may be based on a GDT of type UUID, and in some implementations, can be optional. SegmentID may be based on a GDT of type OrganisationalCentreID, and in some implementations, can be optional. ProfitCentreUUID may be based on a GDT of type UUID, and in some implementations, can be optional. ProfitCentreID may be based on a GDT of type OrganisationalCentreID, and in some implementations, can be optional. PartnerCompanyUUID may be based on a GDT of type UUID, and in some implementations, can be optional. PartnerCompanyID may be based on a GDT of type OrganisationalCentreID, and in some implementations, can be optional. PartnerSegmentUUID may be based on a GDT of type UUID, and in some implementations, can be optional. PartnerSegmentID may be based on a GDT of type OrganisationalCentreID, and in some implementations, can be optional. PartnerProfitCentreUUID may be based on a GDT of type UUID, and in some implementations, can be optional. PartnerProfitCentreID may be based on a GDT of type OrganisationalCentreID, and in some implementations, can be optional. FiscalYearID may be based on a GDT of type FiscalYearID, and in some implementations, can be optional. FiscalYearVariantCode may be based on a GDT of type FiscalYearVariantCode, and in some implementations, can be optional. AccountingPeriodID may be based on a GDT of type AccountingPeriodID, and in some implementations, can be optional. AccountingClosingStepCode may be based on a GDT of type AccountingClosingStepCode, and in some implementations, can be optional. AccountingBusinessTransactionTypeCode may be based on a GDT of type AccountingBusinessTransactionTypeCode, and in some implementations, can be optional. OriginalEntryDocumentObjectTypeCode may be based on a GDT of type ObjectTypeCode, and in some implementations, can be optional. SubledgerAccountTypeCode may be based on a GDT of type SubledgerAccountTypeCode, and in some implementations, can be optional. DebitCreditCode may be based on a GDT of type DebitCreditCode, and in some implementations, can be optional. GeneralLedgerMovementTypeCode may be based on a GDT of type GeneralLedgerMovementTypeCode, and in some implementations, can be optional. ExpenseClassificationFunctionalAreaCode may be based on a GDT of type ExpenseClassificationFunctionalAreaCode, and in some implementations, can be optional. ProductTaxTypeCode may be based on a GDT of type TaxTypeCode, and in some implementations, can be optional. ProductTaxDueCategoryCode may be based on a GDT of type DueCategoryCode, and in some implementations, can be optional. ProductTaxEventTypeCode may be based on a GDT of type ProductTaxEventTypeCode, and in some implementations, can be optional. ProductTaxRateTypeCode may be based on a GDT of type TaxRateTypeCode, and in some implementations, can be optional. ProductTaxCountryCode may be based on a GDT of type CountryCode, and in some implementations, can be optional. WithholdingTaxTypeCode may be based on a GDT of type TaxTypeCode, and in some implementations, can be optional. WithholdingTaxEventTypeCode may be based on a GDT of type WithholdingTaxEventTypeCode, and in some implementations, can be optional. WithholdingTaxRateTypeCode may be based on a GDT of type TaxRateTypeCode, and in some implementations, can be optional. WithholdingTaxCountryCode may be based on a GDT of type CountryCode, and in some implementations, can be optional. LineItemCurrencyAmount may be based on a GDT of type Amount, can have a Qualifier of LineItemCurrency, and in some implementations, can be optional. LocalCurrencyAmount may be based on GDT Amount, can have a Qualifier of LocalCurrency, and in some implementations, can be optional. SetOfBooksCurrencyAmount may be based on a GDT type of Amount, can have a Qualifier of SetOfBooksCurrency, and in some implementations, can be optional. HardCurrencyAmount may be based on a GDT of type Amount, can have a Qualifier of HardCurrency, and in some implementations, can be optional. IndexBasedCurrencyAmount may be based on a GDT of type Amount, can have a Qualifier of IndexBasedCurrency, and in some implementations, can be optional. ValuationQuantity may be based on a GDT of type Quantity, can have a Qualifier of Valuation, and in some implementations, can be optional. ValuationQuantityTypeCode may be based on a GDT of type QuantityTypeCode, can have a Qualifier of Valuation, and in some implementations, can be optional.

PeriodBalance

A PeriodBalance can be a period-specific record for a GeneralLedgerAccount about the quantity-related and value-related balance for a set of books. The PeriodBalance can relate to other dimensions, such as profit center, segment, or functional area. The elements located directly at the PeriodBalance node can be defined by the data type GeneralLedgerAccountPeriodBalanceElements. In some implementations, these elements can include a SetOfBooksID, a SegmentUUID, a ProfitCentreUUID, a PartnerCompanyUUID, a PartnerSegmentUUID, a PartnerProfitCentreUUID, a FiscalYearVariantCode, a FiscalYearID, an AccountingPeriodID, an AccountingClosingStepCode, an AccountingBusinessTransactionTypeCode, an OriginalEntryDocumentObjectTypeCode, a SubledgerAccountTypeCode, an ExpenseClassificationFunctionalAreaCode, a GeneralLedgerMovementTypeCode, a ProductTaxTypeCode, a ProductTaxDueCategoryCode, a ProductTaxCountryCode, a ProductTaxEventTypeCode, a ProductTaxRateTypeCode, a WithholdingTaxTypeCode, a WithholdingTaxCountryCode, a WithholdingTaxEventTypeCode, a WithholdingTaxRateTypeCode, a LineItemCurrencyAmount, a LocalCurrencyAmount, a SetOfBooksCurrencyAmount, a HardCurrencyAmount, an IndexBasedCurrencyAmount, a ValuationQuantity, and a ValuationQuantityTypeCode.

SetOfBooksID can be a unique universal identification of the SetOfBooks according to whose specifications the PeriodBalance may have been created and updated. The SetOfBooksID may be based on a GDT of type SetOfBooksID. SegmentUUID can be a unique universal identification of the Segment to which the value and quantity of the PeriodBalance may be allocated, and in some implementations, can be optional. The SegmentUUID may be based on a GDT of type UUID. ProfitCentreUUID can be a unique universal identification of the ProfitCentre to which the value and quantity of the PeriodBalance may be allocated, and in some implementations, can be optional. The ProfitCentreUUID may be based on a GDT of type UUID. PartnerCompanyUUID can be a unique universal identification of a Company that can act in the business transactions for which the PeriodBalance documents summarized quantities and values as an intra corporate partner, and in some implementations, can be optional. PartnerCompanyUUID may be based on a GDT of type UUID. PartnerSegmentUUID can be a unique universal identification of a Segment that can act in the business transactions for which the PeriodBalance may document summarized quantities and values as an intra corporate partner, and in some implementations, can be optional. The PartnerSegmentUUID may be based on a GDT of type UUID. PartnerProfitCentreUUID can be a unique universal identification of a ProfitCentre that can act in the business transactions for which the PeriodBalance may document summarized quantities and values as an intra corporate partner, and in some implementations, can be optional. The PartnerProfitCentreUUID may be based on a GDT of type UUID. FiscalYearVariantCode can be a coded representation of the FiscalYearVariant according to whose fiscal year definition (begin, end, period definition) the FiscalYearID and the AccountingPeriodID may be derived. The FiscalYearVariantCode may be based on a GDT of type FiscalYearVariantCode. FiscalYearID can be an identification of the fiscal year in which the LineItem may be posted for which the PeriodBalance can keep summarized values and quantities. The FiscalYearID may be based on a GDT of type FiscalYearID. AccountingPeriodID can be an identification of the accounting period in which the LineItem may be posted for which the PeriodBalance can keep summarized values and quantities. The AccountingPeriodID may be based on a GDT of type AccountingPeriodID. AccountingClosingStepCode can be a coded representation of the closing step in accounting to which the PeriodBalance relates, and in some implementations, can be optional. The AccountingClosingStepCode may be based on a GDT of type AccountingClosingStepCode. AccountingBusinessTransactionTypeCode can be a coded representation of the type of the business transactions for which the PeriodBalance can keep summarized quantities and values. It can classify the business transactions according to accounting criteria. The AccountingBusinessTransactionTypeCode may be based on a GDT of type AccountingBusinessTransactionTypeCode. OriginalEntryDocumentObjectTypeCode can specify the object type of the original documents for which the amounts may have been entered into the period total. The OriginalEntryDocumentObjectTypeCode may be based on a GDT of type ObjectTypeCode. SubledgerAccountTypeCode can be a coded representation of the type of subledger account to which the PeriodBalance may relate. The SubledgerAccountTypeCode may be based on a GDT of type SubledgerAccountTypeCode. ExpenseClassificationFunctionalAreaCode can be a coded representation of the functional area to which the PeriodBalance may relate. The ExpenseClassificationFunctionalAreaCode may be based on a GDT of type ExpenseClassificationFunctionalAreaCode, and in some implementations, can be optional. GeneralLedgerMovementTypeCode can be a coded representation of the type of movement to the G/L account to which the PeriodBalance may relate. The GeneralLedgerMovementTypeCode may be based on GDT GeneralLedgerMovementTypeCode. ProductTaxTypeCode can be a coded representation of the product tax type to which the PeriodBalance may relate, and in some implementations, can be optional. The ProductTaxTypeCode may be based on a GDT of type TaxTypeCode. ProductTaxDueCategoryCode can be a coded representation of the category (receivable or payable) of a tax due to which the PeriodBalance may relate, and in some implementations, can be optional. The ProductTaxDueCategoryCode may be based on a GDT of type DueCategoryCode. ProductTaxCountryCode can be a coded representation of the country to whose tax authority the product tax data may have been or can be reported, and in some implementations, can be optional. The ProductTaxCountryCode may be based on a GDT of type CountryCode. ProductTaxEventTypeCode can be a coded representation of the product tax event to which the PeriodBalance may relate, and in some implementations, can be optional. The ProductTaxEventTypeCode may be based on a GDT of type ProductTaxEventTypeCode. ProductTaxRate- TypeCode can be a coded representation of the type of product tax rate to which the PeriodBalance may relate, and in some implementations, can be optional. The ProductTaxRateTypeCode may be based on a GDT of type TaxRateTypeCode. WithholdingTaxTypeCode can be a coded representation of the withholding tax type to which the PeriodBalance may relate, and in some implementations, can be optional. The WithholdingTaxTypeCode may be based on a GDT of type TaxTypeCode. WithholdingTaxCountryCode can be a coded representation of the country to whose tax authority the withholding tax data may have been or can be reported, and in some implementations, can be optional. The WithholdingTaxCountryCode may be based on a GDT of type CountryCode. WithholdingTaxEventTypeCode can be a coded representation of the witholding tax event to which the PeriodBalance may relate, and in some implementations, can be optional. The WithholdingTaxEventTypeCode may be based on a GDT of type WithholdingTaxEventTypeCode. WithholdingTaxRateTypeCode can be a coded representation of the type of withholding tax rate to which the PeriodBalance may relate, and in some implementations, can be optional. The WithholdingTaxRateTypeCode may be based on a GDT of type TaxRateTypeCode. LineItemCurrencyAmount can be the value of the PeriodBalance in the LineItem currency, and in some implementations, can be optional. The LineItemCurrencyAmount may be based on a GDT of type Amount, and can have a Qualifier of LineItemCurrency. The value reported here can match the total of all values in LineItem currency that may be documented in the LineItems. LocalCurrencyAmount can be the value of the PeriodBalance in the local currency of the Company carrying the GeneralLedgerAccount. The local currency can be the currency in which the local books may be kept. The LocalCurrencyAmount may be based on a GDT of type Amount, and can have a Qualifier of LocalCurrency. The value reported here can match the total of all values in local currency that are documented in the LineItems. SetOfBooksCurrencyAmount can be the value of the PeriodBalance in the currency selected for the set of books, and in some implementations, can be optional. The SetOfBooksCurrencyAmount may be based on a GDT of type Amount, and can have a Qualifier of SetOfBooksCurrency. The value reported here can match the total of all values in the additional currency selected for the set of books that may be documented in the LineItems. HardCurrencyAmount can be the value of the PeriodBalance in the hard currency of the country of the Company carrying the GeneralLedgerAccount, and in some implementations, can be optional. The hard currency can be a stable, country-specific currency that may be used in high-inflation countries. The HardCurrencyAmount may be based on a GDT of type Amount, and can have a Qualifier of HardCurrency. The value reported here may match the total of all values in the hard currency that are documented in the LineItems. IndexBasedCurrencyAmount can be the value of the PeriodBalance in the index-based currency of the country of the Company carrying the GeneralLedgerAccount, and in some implementations, can be optional. The index-based currency can be a fictitious, country-specific currency that may be used in high-inflation countries as a comparison currency for reporting. The IndexBasedCurrencyAmount may be based on a GDT of type Amount, and can have a Qualifier of IndexBasedCurrency. The value reported here may match the total of all values in the index-based currency that may be documented in LineItems. ValuationQuantity can be the quantity of the PeriodBalance in the valuation unit of the material. The valuation unit can be the unit in which consumed or manufactured materials or production activities may be valuated in Financial Accounting. The ValuationQuantity may be based on a GDT of type Quantity, and can have a Qualifier of Valuation. The quantity reported here can match the total of all changes in the valuation quantity that may be documented in the LineItems. ValuationQuantityTypeCode can be a coded representation of the type of the valuation quantity, and in some implementations, can be optional. ValuationQuantityTypeCode may be based on a GDT of type QuantityTypeCode, and can have a Qualifier of Valuation.

The following Inbound Aggregation Relationships from business object Company/node Company may exist. PartnerCompany has a cardinality relationship of c:cn. The PartnerCompany can be a PeriodBalance that can relate to a partner company to which the period balance may be assigned.

The following Inbound Aggregation Relationships from business object Segment/node Segment may exist. Segment has a cardinality relationship of c:cn. The Segment can be a PeriodBalance that can relate to a segment to which the period balance may be assigned. PartnerSegment has a cardinality relationship of c:cn. The PartnerSegment can be a PeriodBalance that can relate to a partner segment to which the period balance may be assigned.

The following Inbound Aggregation Relationships from business object ProfitCentre/node ProfitCentre may exist. ProfitCentre has a cardinality relationship of c:cn. The ProfitCentre can be a PeriodBalance that can relate to a profit center to which the period balance may be assigned. PartnerProfitCentre has a cardinality relationship of c:cn. The PartnerProfitCentre can be a PeriodBalance that can relate to a partner profit center to which the period balance may be assigned.

The following Inbound Aggregation Relationships from business object SetOfBooks/node SetOfBooks may exist. SetOfBooks has a cardinality relationship of 1:cn. The SetOfBooks can be a PeriodBalance that can relate to a SetOfBooks for which the period balance may be recorded.

Queries can include QueryByElements, which can deliver a list of all PeriodBalances that fulfill random selection criteria from the quantity of elements located at the node as well as elements located at the root node. The query elements may be described by the data type GeneralLedgerAccountPeriodBalanceElementsQueryElements. In some implementations, these elements can include a CompanyUUID, a CompanyID, a ChartOfAccountsCode, a ChartOfAccountsItemCode, a SetOfBooksID, a SegmentUUID, a SegmentID, a ProfitCentreUUID, a ProfitCentreID, a PartnerCompanyUUID, a PartnerCompanyID, a PartnerSegmentUUID, a PartnerSegmentID, a PartnerProfitCentreUUID, a PartnerProfitCentreID, a FiscalYearID, a FiscalYearVariantCode, an AccountingPeriodID, an AccountingClosingStepCode, an AccountingBusinessTransactionTypeCode, an OriginalEntryDocumentObjectTypeCode, a SubledgerAccountTypeCode, a GeneralLedgerMovementTypeCode, an ExpenseClassificationFunctionalAreaCode, a ProductTaxTypeCode, a ProductTaxDueCategoryCode, a ProductTaxEventTypeCode, a ProductTaxRateTypeCode, a ProductTaxCountryCode, a WithholdingTaxTypeCode, a WithholdingTaxEventTypeCode, a WithholdingTaxRateTypeCode, a WithholdingTaxCountryCode, a LineItemCurrencyAmount, a LocalCurrencyAmount, a SetOfBooksCurrencyAmount, a HardCurrencyAmount, an IndexBasedCurrencyAmount, a ValuationQuantity, and a ValuationQuantityTypeCode.

CompanyUUID may be based on a GDT of type UUID, and in some implementations, can be optional. CompanyID may be based on a GDT of type OrganisationalCentreID, and in some implementations, can be optional. ChartOfAccountsCode may be based on a GDT of type ChartOfAccountsCode, and in some implementations, can be optional. ChartOfAccountsItemCode may be based on GDT ChartOfAccountsItemCode, and in some implementations, can be optional. SetOfBooksID may be based on a GDT of type SetOfBooksID. SegmentUUID may be based on a GDT of type UUID, and in some implementations, can be optional. SegmentID may be based on a GDT of type OrganisationalCentreID, and in some implementations, can be optional. ProfitCentreUUID may be based on a GDT of type UUID, and in some implementations, can be optional. ProfitCentreID may be based on a GDT of type OrganisationalCentreID, and in some implementations, can be optional. PartnerCompanyUUID may be based on a GDT of type UUID, and in some implementations, can be optional. PartnerCompanyID may be based on a GDT of type OrganisationalCentreID, and in some implementations, can be optional. PartnerSegmentUUID i may be based on a GDT of type UUID, and in some implementations, can be optional. PartnerSegmentID may be based on a GDT of type OrganisationalCentreID, and in some implementations, can be optional. PartnerProfitCentreUUID may be based on a GDT of type UUID, and in some implementations, can be optional. PartnerProfitCentreID may be based on a GDT of type OrganisationalCentreID, and in some implementations, can be optional. FiscalYearID may be based on a GDT of type FiscalYearID. FiscalYearVariantCode may be based on a GDT of type FiscalYearVariantCode, and in some implementations, can be optional. AccountingPeriodID may be based on a GDT of type AccountingPeriodID, and in some implementations, can be optional. AccountingClosingStepCode\may be based on a GDT of type AccountingClosingStepCode, and in some implementations, can be optional. AccountingBusinessTransactionTypeCode may be based on a GDT of type AccountingBusinessTransactionTypeCode, and in some implementations, can be optional. OriginalEntryDocumentObjectTypeCode may be based on a GDT of type ObjectTypeCode, and in some implementations, can be optional. SubledgerAccountTypeCode may be based on a GDT of type SubledgerAccountTypeCode, and in some implementations, can be optional. GeneralLedgerMovementTypeCode may be based on a GDT of type GeneralLedgerMovementTypeCode, and in some implementations, can be optional. ExpenseClassificationFunctionalAreaCode may be based on a GDT of type ExpenseClassificationFunctionalAreaCode, and in some implementations, can be optional. ProductTaxTypeCode may be based on a GDT of type TaxTypeCode, and in some implementations, can be optional. ProductTaxDueCategoryCode may be based on a GDT of type DueCategoryCode, and in some implementations, can be optional. ProductTaxEventTypeCode may be based on a GDT of type ProductTaxEventTypeCode, and in some implementations, can be optional. ProductTaxRateTypeCode may be based on a GDT of type TaxRateTypeCode, and in some implementations, can be optional. ProductTaxCountryCode may be based on a GDT of type CountryCode, and in some implementations, can be optional. WithholdingTaxTypeCode may be based on a GDT of type TaxTypeCode, and in some implementations, can be optional. WithholdingTaxEventTypeCode may be based on a GDT of type WithholdingTaxEventTypeCode, and in some implementations, can be optional. WithholdingTaxRateTypeCode may be based on a GDT of type TaxRateTypeCode, and in some implementations, can be optional. WithholdingTaxCountryCode may be based on a GDT of type CountryCode, and in some implementations, can be optional. LineItemCurrencyAmount may be based on a GDT of type Amount, can have a Qualifier of LineItemCurrency, and in some implementations, can be optional. LocalCurrencyAmount may be based on a GDT of type Amount, can have a Qualifier of LocalCurrency, and in some implementations, can be optional. SetOfBooksCurrencyAmount may be based on a GDT of type Amount, can have a Qualifier of SetOfBooksCurrency, and in some implementations, can be optional. HardCurrencyAmount may be based on a GDT of type Amount, can have a Qualifier of HardCurrency, and in some implementations, can be optional. IndexBasedCurrencyAmount may be based on a GDT of type Amount, can have a Qualifier of IndexBasedCurrency, and in some implementations, can be optional. ValuationQuantity may be based on a GDT of type Quantity, can have a Qualifier of Valuation, and in some implementations, can be optional. ValuationQuantityTypeCode may be based on a GDT of type QuantityTypeCode, can have a Qualifier of Valuation, and in some implementations, can be optional.

The DO AccessControlList can be a list of access groups that have access to a GeneralLedgerAccount. Its Structure can be found in DO: AccessControlList.

Business Object MaterialLedgerAccount

Figures 1, 92:
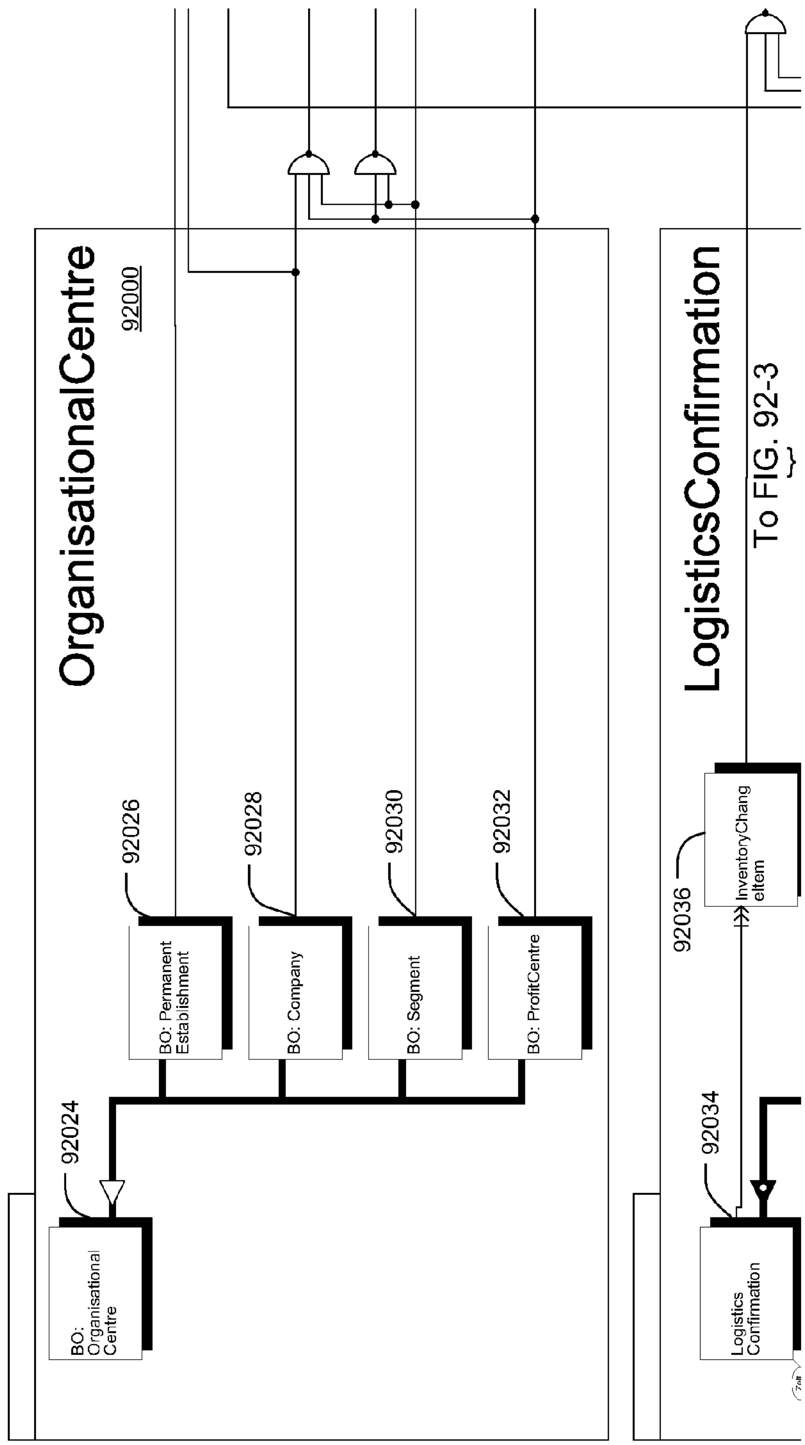
Figures 2, 92:
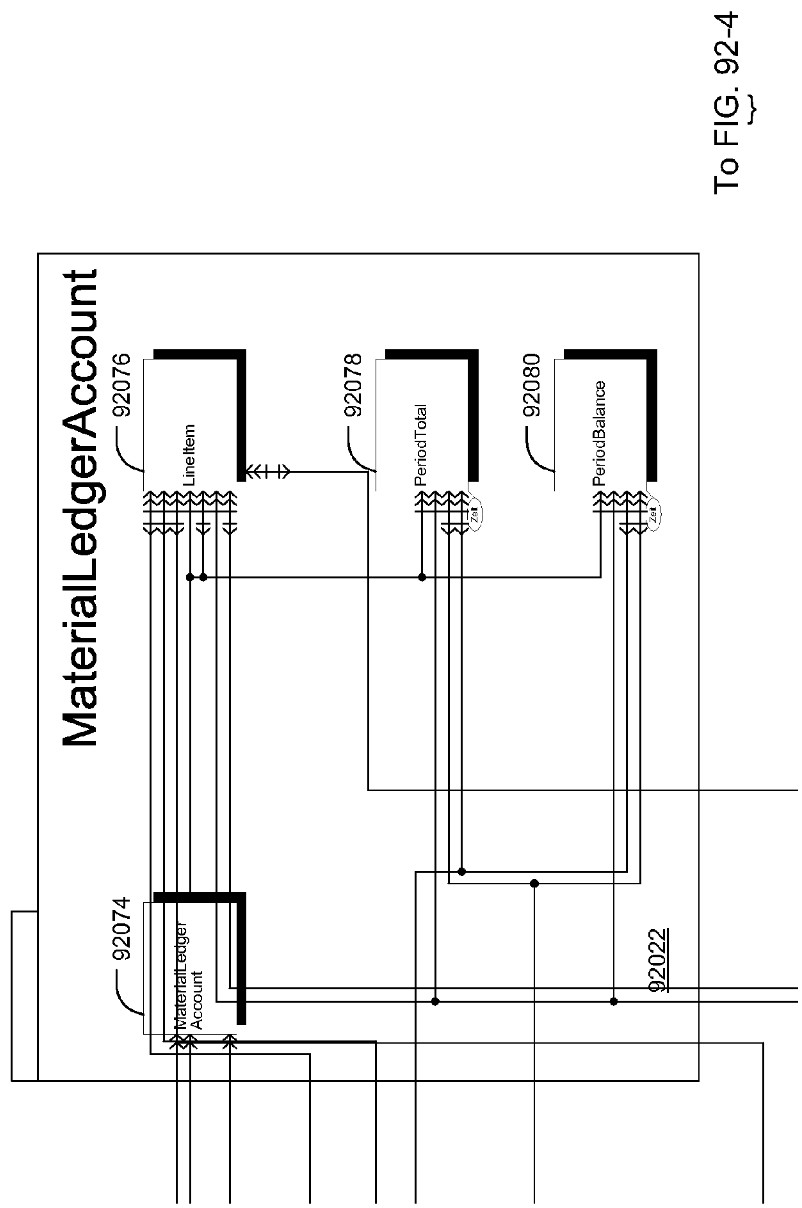
Figures 3, 92:
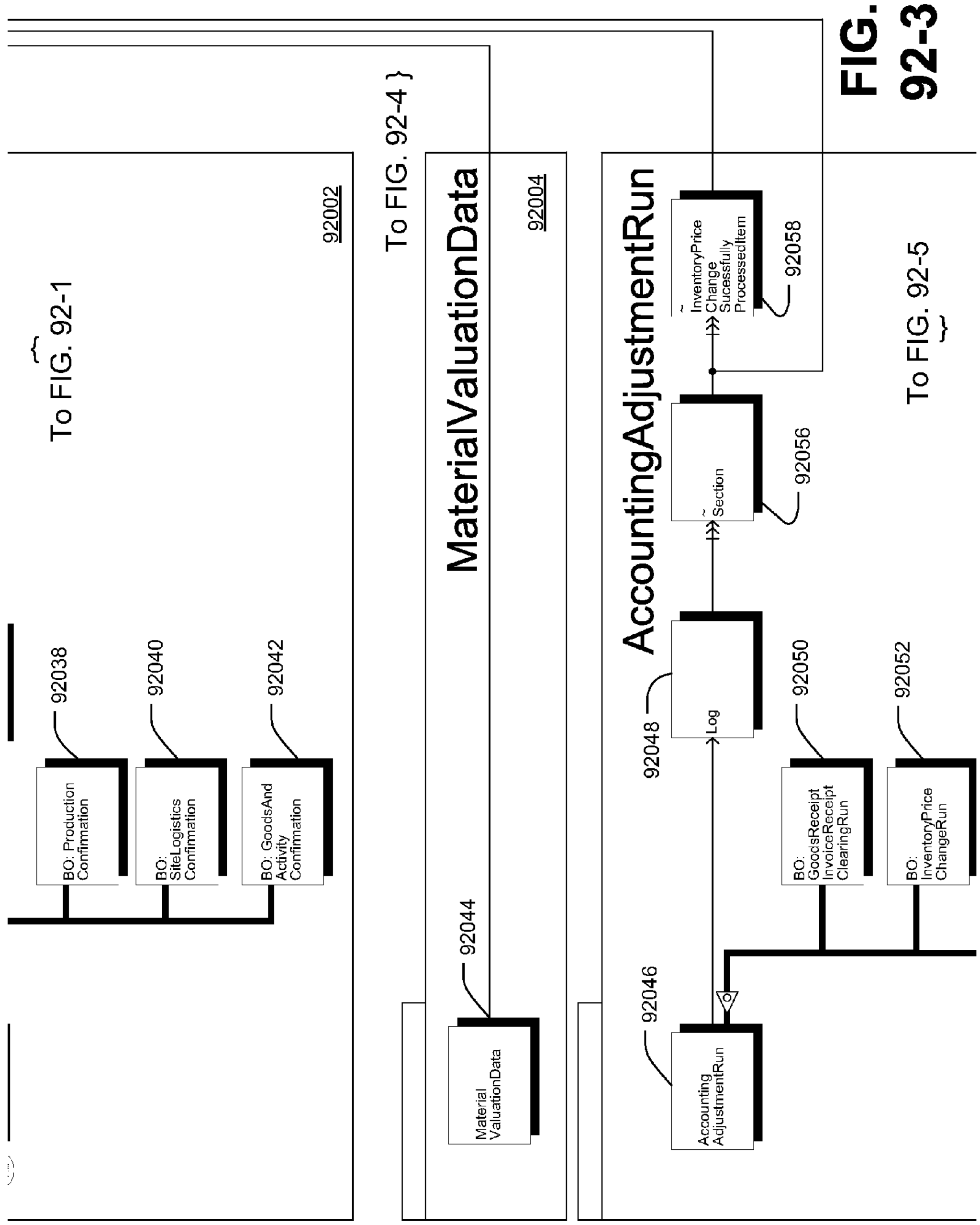
Figures 5, 92:
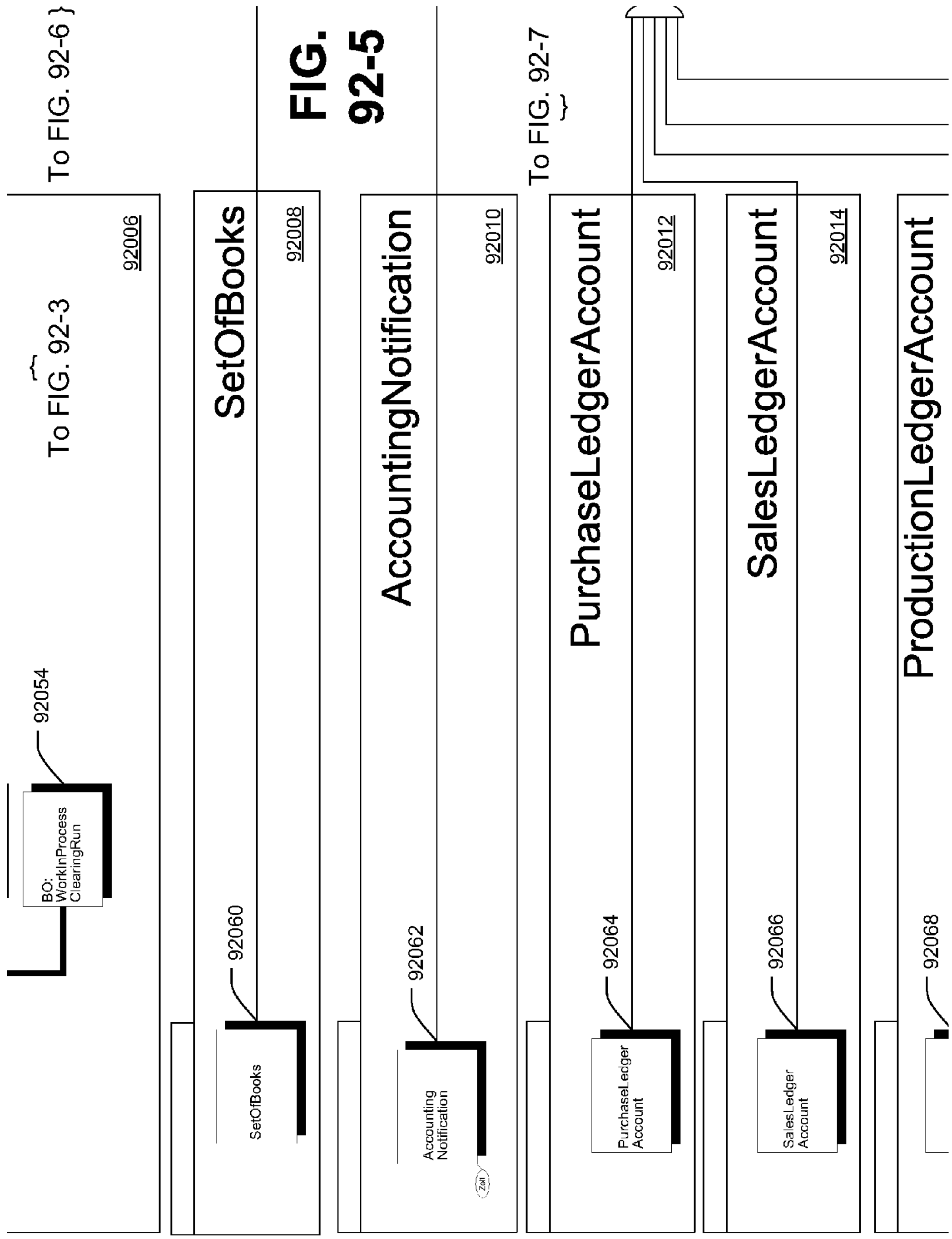
Figures 6, 92:
Figures 7, 92:
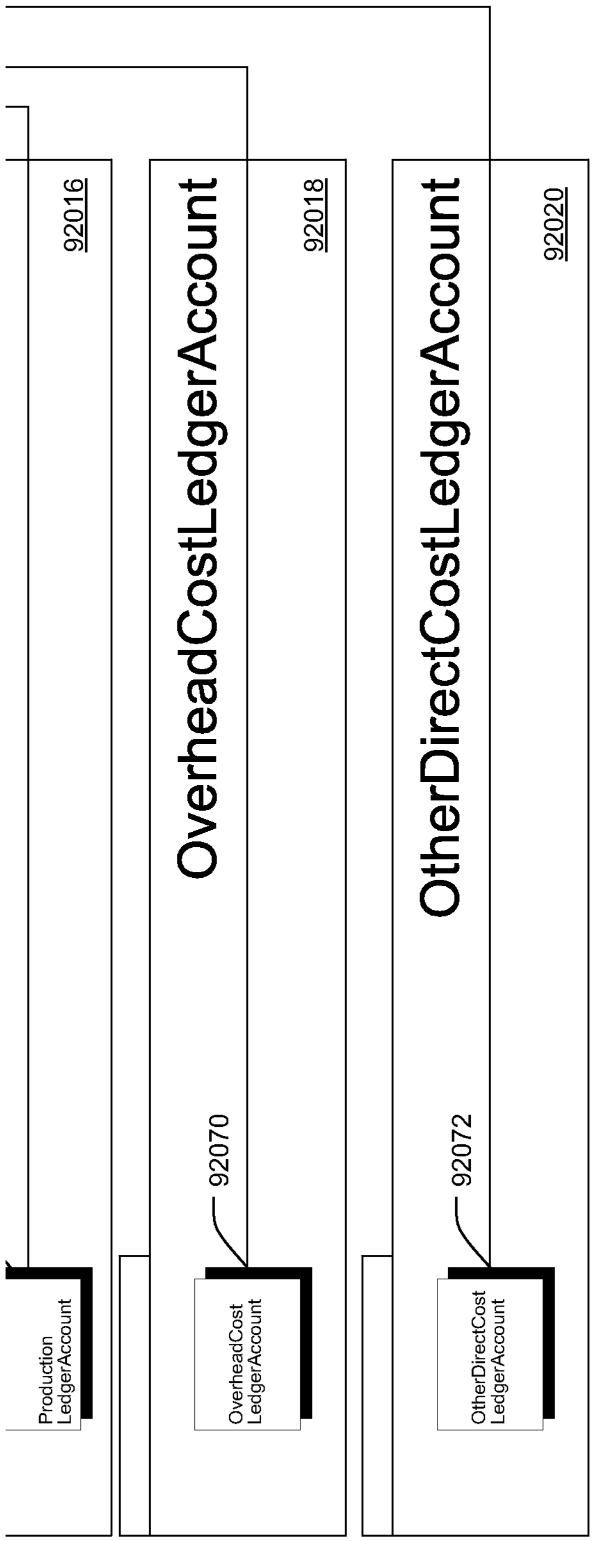

FIGS. 92-1 through 92-7 illustrate an example MaterialLedgerAccount business object model 92022. Specifically, this model depicts interactions among various hierarchical components of the MaterialLedgerAccount, as well as external components that interact with the MaterialLedgerAccount (shown here as 92000 through 92024 and 92024 through 92072). MaterialLedgerAccount is a record of the quantities and values for part of the value-based inventory of materials in a company. The quantities and the values based on the principle of double-entry bookkeeping show the effects of business transactions on the value of these material inventories. In addition to individual account movements related to business transactions, the material ledger account can contain period-based totals and balances that summarize the movements. The material ledger account serves the purpose of proper financial reporting of the inventory or profit and loss statement of a company, to be able to collect and evaluate postings in the material ledger. It contains values and quantities resulting from receipts, issues, depreciations, revaluations or settlements concerning the company's materials. The business object MaterialLedgerAccount is part of the process component Accounting. For each business transaction, a MaterialLedgerAccount can contain an itemization of the quantity and value of the inventory change and any price differences. For each set of books and business transaction category, a MaterialLedgerAccount can contain a period-based record of the quantity and value of the inventory change and any price differences. For each set of books, a MaterialLedgerAccount can contain a period-based record of the quantity and value of the material inventories. MaterialLedgerAccount can be represented by the node MaterialLedgerAccount. A MaterialLedgerAccount is recorded in a configurable granularity, such as material and permanent establishment. When a business transaction causing a quantity/value change to a MaterialLedgerAccount is updated, a set of rules can determine which GeneralLedgerAccounts are concerned. Updating the business transaction can change the quantity and/or value on the GeneralLedgerAccounts selected in this way by the same amount. Changes to the BO MaterialLedgerAccount can be made automatically by other business objects (such as AccountingNotification) through the service interfaces or actions there, or are made directly in a user interface.

Node Structure of Business Object MaterialLedgerAccount

MaterialLedgerAccount 92074 (Root Node of Business Object MaterialLedgerAccount) is a record of the quantities and values for part of the value-based inventory of materials in a company. The quantities and the values based on the principle of double-entry bookkeeping show the effects of business transactions on the value of these material inventories. In addition to individual account movements related to business transactions, the material ledger account contains period-based totals and balances that summarize the movements. The term "offsetting" can be used. In particular, an OffsettingSubledgerAccount is a SubledgerAccount that contains—with reference to the same AccountingDocument—the inverse representation of the business transaction stated in a SubledgerAccountLineItem. The inverse representation can be required by the double entry bookkeeping principle. The compliance with this principle can lead to a zero balance of the AccountingDocument that completely represents the Business transaction. An example for offsetting is: an InventoryChangeItem of a ProductionLotConfirmation can be represented as a debit LineItem of a ProductionLedgerAccount and as an inverse credit LineItem of a MaterialLedgerAccount. Subsequently also a generic approach for referencing Original Entry Documents can be used, where an Original Entry Document is a document that is necessary for auditing purposes and verifies that the value stated in the LineItem of a ledger account has been booked on the base of a real business transaction. An Original Entry Document may be contained in another Object, the Original Entry DocumentContainingObject. Typical such constellations are: 1) FinancialAuditTrailDocumentation contained in a Host object like DuePayment, DueClearing, Dunning, and PaymentAllocation from Operative Financials; 2) LogSection contained in all AccountingAdjustmentRun-MDROs (e.g. InventoryPriceChangeRun, GeneralLedgerAccountBalanceDistributionRun, FixedAssetDepreciationRun, WorkInProcessClearingRun); 3) SettlementResultAccounting contained in an ExpenseReport; and 4) PeriodItem contained in an EmployeeTimeCalendar.

The elements located directly at the node MaterialLedgerAccount can be defined by the type GDT: MaterialLedgerAccountElements. These elements can include UUID, CompanyUUID, MaterialValuationDataUUID, PermanentEstablishmentUUID, GranularityCode, MaterialLedgerAccountKey, CompanyUUID, MaterialValuationDataUUID, PermanentEstablishmentUUID, SetOfBooksID, SegmentUUID, ProfitCentreUUID, PartnerCompanyUUID, PartnerSegmentUUID, PartnerProfitCentreUUID, AccountingDocumentUUID, AccountingDocumentID, AccountingDocumentItemID, OriginalEntryDocumentContainingObjectReference, OriginalEntryDocumentReference, OriginalEntryDocumentItemReference, OriginalEntryDocumentItemTypeCode, OriginalEntryDocumentPartnerID, OffsettingSubledgerAccountUUID, OffsettingSubledgerAccountTypeCode, SystemAdministrativeData, ChartOfAccountsCode, ChartOfAccountsItemCode, AccountingBusinessTransactionTypeCode, SubledgerAccountLineItemTypeCode, PostingDate, OriginalEntryDocumentDate, AccountingBusinessTransactionDate, FiscalYearVariantCode, FiscalYearID, AccountingPeriodID, CancellationDocumentIndicator, CancellationOriginalEntryDocumentContainingObjectReference, CancellationOriginalEntryDocumentReference, CancelledIndicator, PeriodTotal, SetOfBooksID, SegmentUUID, ProfitCentreUUID, ChartOfAccountsCode, ChartOfAccountsItemCode, AccountingBusinessTransactionTypeCode, SubledgerAccountLineItemTypeCode, FiscalYearVariantCode, FiscalYearID, AccountingPeriodID, SetOfBooksID, SegmentUUID, ProfitCentreUUID, ChartOfAccountsCode, ChartOfAccountsItemCode, FiscalYearVariantCode, FiscalYearID, and AccountingPeriodID.

UUID can be an alternative key, can be a universally unique identification of the MaterialLedgerAccount, and can be based on GDT: UUID. CompanyUUID is a universally unique identification of the Company for which the MaterialLedgerAccount is carried and may be based on GDT: UUID. MaterialValuationDataUUID is a universally unique identification of the valuation data of a material for which quantities and values are recorded in the MaterialLedgerAccount and may be based on GDT: UUID. PermanentEstablishmentUUID is a universally unique identification of the PermanentEstablishment for which quantities and values are recorded in the MaterialLedgerAccount, and may be based on GDT: UUID. GranularityCode establishes additional attributes beyond the company that serve to differentiate the MaterialLedgerAccount, and may be based on GDT: SubledgerAccountGranularityCode. MaterialLedgerAccountKey is a business key of the MaterialLedgerAccount. The MaterialLedgerAccountKey can consist of CompanyUUID, MaterialValuationDataUUID, and PermanentEstablishmentUUID.

A number of composition relationships to subordinate nodes are available, such as a LineItem 92076 1:cn relationship which can be Filtered. The filter elements can be defined by the data type MaterialLedgerAccountLineItemFilterElements. These elements can include SetOfBooksID, SegmentUUID, ProfitCentreUUID, PartnerCompanyUUID, PartnerSegmentUUID, PartnerProfitCentreUUID, AccountingDocumentUUID, AccountingDocumentID, AccountingDocumentItemID, OriginalEntryDocumentContainingObjectReference, OriginalEntryDocumentReference, OriginalEntryDocumentItemReference, OriginalEntryDocumentItemTypeCode, OriginalEntryDocumentPartnerID, OffsettingSubledgerAccountUUID, OffsettingSubledgerAccountTypeCode, SystemAdministrativeData, ChartOfAccountsCode, ChartOfAccountsItemCode, AccountingBusinessTransactionTypeCode, SubledgerAccountLineItemTypeCode, PostingDate, OriginalEntryDocumentDate, AccountingBusinessTransactionDate, FiscalYearVariantCode, FiscalYearID, AccountingPeriodID, CancellationDocumentIndicator, CancellationOriginalEntryDocumentContainingObjectReference, CancellationOriginalEntryDocumentReference, and CancelledIndicator.

SetOfBooksID is optional and may be based on GDT: SetOfBooksID. SegmentUUID is optional and may be based on GDT: UUID. ProfitCentreUUID is optional and may be based on GDT: UUID. PartnerCompanyUUID is optional and may be based on GDT: UUID. PartnerSegmentUUID is optional and may be based on GDT: UUID. PartnerProfitCentreUUID is optional and may be based on GDT: UUID. AccountingDocumentUUID is optional and may be based on GDT: UUID. AccountingDocumentID is optional and may be based on GDT: BusinessTransactionDocumentID. AccountingDocumentItemID is optional and may be based on GDT: BusinessTransactionDocumentItemID. OriginalEntryDocumentContainingObjectReference is optional and may be based on GDT: ObjectNodeReference. OriginalEntryDocumentReference is optional and may be based on GDT: ObjectNodeReference. OriginalEntryDocumentItemReference is optional and may be based on GDT: ObjectNodeReference. OriginalEntryDocumentItemTypeCode is optional and may be based on GDT: BusinessTransactionDocumentItemTypeCode. OriginalEntryDocumentPartnerID is optional and may be based on GDT: BusinessTransactionDocumentID. OffsettingSubledgerAccountUUID is optional and may be based on GDT: UUID. OffsettingSubledgerAccountTypeCode is optional and may be based on GDT: SubledgerAccountTypeCode. SystemAdministrativeData is optional and may be based on GDT: SystemAdministrativeData. ChartOfAccountsCode is optional and may be based on GDT: ChartOfAccountsCode. ChartOfAccountsItemCode is optional and may be based on GDT: ChartOfAccountsItemCode. AccountingBusinessTransactionTypeCode is optional and may be based on GDT: AccountingBusinessTransactionTypeCode. SubledgerAccountLineItemTypeCode is optional and may be based on GDT: SubledgerAccountLineItemTypeCode. PostingDate is optional and may be based on GDT: Date. OriginalEntryDocumentDate is optional and may be based on GDT: Date. AccountingBusinessTransactionDate is optional and may be based on GDT: Date. FiscalYearVariantCode is optional and may be based on GDT: FiscalYearVariantCode. FiscalYearID is optional and may be based on GDT: FiscalYearID. AccountingPeriodID is optional and may be based on GDT: AccountingPeriodID. CancellationDocumentIndicator is optional and may be based on GDT: Indicator. CancellationOriginalEntryDocumentContainingObjectReference is optional and may be based on GDT: ObjectNodeReference. CancellationOriginalEntryDocumentReference is optional and may be based on GDT: ObjectNodeReference. CancelledIndicator is optional and may be based on GDT: Indicator.

A PeriodTotal 92078 1:cn Filtered composition relationship can exist. The filter elements can be defined by the data type: MaterialLedgerAccountPeriodTotalFilterElements. These elements can include: SetOfBooksID, SegmentUUID, ProfitCentreUUID, ChartOfAccountsCode, ChartOfAccountsItemCode, AccountingBusinessTransactionTypeCode, SubledgerAccountLineItemTypeCode, FiscalYearVariantCode, FiscalYearID, and AccountingPeriodID.

SetOfBooksID is optional and may be based on GDT: SetOfBooksID. SegmentUUID is optional and may be based on GDT: UUID. ProfitCentreUUID is optional and may be based on GDT: UUID. ChartOfAccountsCode is optional and may be based on GDT: ChartOfAccountsCode. ChartOfAccountsItemCode is optional and may be based on GDT: ChartOfAccountsItemCode. AccountingBusinessTransactionTypeCode is optional and may be based on GDT: AccountingBusinessTransactionTypeCode. SubledgerAccountLineItemTypeCode is optional and may be based on GDT: SubledgerAccountLineItemTypeCode. FiscalYearVariantCode is optional and may be based on GDT: FiscalYearVariantCode. FiscalYearID is optional and may be based on GDT: FiscalYearID. AccountingPeriodID is optional and may be based on GDT: AccountingPeriodID.

A PeriodBalance 92080 1:cn Filtered composition relationship can exist. The filter elements can be defined by the data type: MaterialLedgerAccountPeriodBalanceFilterElements. These elements can include SetOfBooksID, SegmentUUID, ProfitCentreUUID, ChartOfAccountsCode, ChartOfAccountsItemCode, FiscalYearVariantCode, FiscalYearID, and AccountingPeriodID.

SetOfBooksID is optional and may be based on GDT: SetOfBooksID. SegmentUUID is optional and may be based on GDT: UUID. ProfitCentreUUID is optional and may be based on GDT: UUID. ChartOfAccountsCode is optional and may be based on GDT: ChartOfAccountsCode. ChartOfAccountsItemCode is optional and may be based on GDT: ChartOfAccountsItemCode. FiscalYearVariantCode is optional and may be based on GDT: FiscalYearVariantCode. FiscalYearID is optional and may be based on GDT: FiscalYearID. AccountingPeriodID is optional and may be based on GDT: AccountingPeriodID.

A number of inbound aggregation relationships can exist, such as 1) From business object Company/node Company, a Company relationship with a cardinality of (1:cn), which denotes the Company for which the account is carried; 2) From business object PermanentEstablishment/node PermanentEstablishment, a PermanentEstablishment relationship with a cardinality of (1:cn), the PermanentEstablishment for which quantities and values are recorded in the MaterialLedgerAccount; and 3) From business object MaterialValuationData/node MaterialValuationData, a MaterialValuationData relationship with a cardinality of (1:cn), the valuation data of a material for which quantities and values are recorded in the MaterialLedgerAccount. The MaterialValuationData is used also for access control to a MaterialLedgerAccount, and the record for an individual material (IndividualMaterial) based on the material level. A material may be assigned to the individual material.

A QueryByMaterial query returns a list of all MaterialLedgerAccounts that represent a record for a certain material or for all materials in a product category, or that exist in a Company or PermanentEstablishment.

Query elements can be defined by the data type: MaterialLedgerAccountMaterialQueryElements. These elements can include MaterialValuationDataMaterialIdentificationProductID, MaterialValuationDataMaterialUUID, MaterialValuationDataMaterialDescriptionDescription, MaterialValuationDataUUID, CompanyID, CompanyUUID, PermanentEstablishmentID, PermanentEstablishmentUUID, MaterialValuationDataMaterialProductCategoryAssignmentProductCategoryInternalID, and MaterialValuationDataAccountDeterminationSpecificationAccountDeterminationMaterialValuation DataGroupCode.

MaterialValuationDataMaterialIdentificationProductID is the element ProductID of node Identification of BO Material that can be reached through the association MaterialValuationData, is optional and may be based on GDT: ProductID. MaterialValuationDataMaterialUUID is the element UUID of BO Material that can be reached through the association MaterialValuationData, is optional and may be based on GDT: UUID. MaterialValuationDataMaterialDescriptionDescription is the element description of node Description of BO Material that can be reached through the association MaterialValuationData, is optional and may be based on GDT: SHORT_Description. MaterialValuationDataMaterialProductCategoryAssignmentProductCategoryInternalID is the element ProductCategoryInternalID of node ProductCategoryAssignment of BO Material that can be reached through the association MaterialValuationData, is optional and may be based on GDT: ProductCategoryInternalID. MaterialValuationDataUUID, is optional and may be based on GDT: UUID. MaterialValuationDataAccountDeterminationSpecificationAccountDeterminationMaterialValuation DataGroupCode is the element AccountDeterminationMaterialValuationDataGroupCode of node AccountDeterminationSpecification of BO MaterialValuationData that can be reached through the association MaterialValuationData, is optional and may be based on GDT: AccountDeterminationMaterialValuationDataGroupCode. CompanyID is the element ID of BO Company that can be reached through the association Company, is optional and may be based on GDT: OrganisationalCentreID. CompanyUUID, is optional and may be based on GDT: UUID. PermanentEstablishmentID is the element ID of BO PermanentEstablishment that can be reached through the association PermanentEstablishment, is optional and may be based on GDT: OrganisationalCentreID. PermanentEstablishmentUUID, is optional and may be based on GDT: UUID.

LineItem

LineItem is a record in a material ledger account of the value of an inventory change or price difference resulting from a single business transaction. A line item contains detailed information on the business transaction needed by accounting, such as a posting date and a reference to the original entry document. The elements located directly at the LineItem node can be defined by the type GDT: MaterialLedgerAccountLineItemElements. These elements can include UUID, SetOfBooksID, SegmentUUID, ProfitCentreUUID, PartnerCompanyUUID, PartnerSegmentUUID, PartnerProfitCentreUUID, AccountingDocumentUUID, AccountingDocumentID, AccountingDocumentItemID, OriginalEntryDocumentContainingObjectReference, OriginalEntryTransactionUUID, OriginalEntryDocumentReference, OriginalEntryDocumentItemReference, OriginalEntryDocumentItemTypeCode, OriginalEntryDocumentPartnerID, AccountingNotificationUUID, AccountingNotificationItemGroupItemUUID, GeneralLedgerAccountLineItemUUID, GeneralLedgerAccountLineItemAccountingDocumentItemGroupID, OffsettingSubledgerAccountUUID, OffsettingSubledgerAccountTypeCode, SystemAdministrativeData, ChartOfAccountsCode, ChartOfAccountsItemCode, AccountingBusinessTransactionTypeCode, TypeCode, AccountingDocumentTypeCode, AccountingDocumentNote, AccountingDocumentItemNote, PostingDate, OriginalEntryDocumentDate, AccountingBusinessTransactionDate, CurrencyConversionDate, FiscalYearVariantCode, FiscalYearID, AccountingPeriodID, AccountingClosingStepCode, AccountingDocumentItemAccountingGroupID, ExpenseClassificationFunctionalAreaCode, PropertyMovementDirectionCode, GeneralLedgerMovementTypeCode, DebitCreditCode, CancellationDocumentIndicator, CancellationOriginalEntryDocumentContainingObjectReference, CancellationOriginalEntryTransactionUUID, CancellationOriginalEntryDocumentReference, CancelledIndicator, BusinessTransactionCurrencyAmount, LocalCurrencyAmount, SetOfBooksCurrencyAmount, HardCurrencyAmount, IndexBasedCurrencyAmount, ValuationQuantity, ValuationQuantityTypeCode, ReferenceQuantity, and ReferenceQuantityTypeCode.

UUID is a universally unique identification of the LineItem and may be of type GDT: UUID. SetOfBooksID is a unique identification of the SetOfBooks according to whose specifications the LineItem was created, is optional and may be based on GDT: SetOfBooksID. SegmentUUID is a universally unique identification of the Segment to which the value and quantity of the LineItem are allocated, is optional and may be based on GDT: UUID. ProfitCentreUUID is a universally unique identification of the ProfitCentre to which the value and quantity of the LineItem are allocated, is optional and may be based on GDT: UUID. PartnerCompanyUUID is a universally unique identification of a Company that acts in the business transaction stated in the LineItem as an intra corporate partner, is optional and may be based on GDT: UUID. PartnerSegmentUUID is a universally unique identification of a Segment that acts in the business transaction stated in the LineItem as an intra corporate partner, is optional and may be based on GDT: UUID. PartnerProfitCentreUUID is a universally unique identification of a ProfitCentre the that acts in the business transaction stated in the LineItem as an intra corporate partner, is optional and may be based on GDT: UUID. AccountingDocumentUUID is a universally unique identification of the AccountingDocument that records the entire business transaction in Accounting, is optional and may be based on GDT: UUID. AccountingDocumentID is a unique identification of the AccountingDocument that records the entire business transaction in Accounting, is optional and may be based on GDT: BusinessTransactionDocumentID. AccountingDocumentItemID is a unique identification of the corresponding AccountingDocumentItem in the AccountingDocument which records the value change according to the criteria of GeneralLedger, is optional and may be based on GDT: BusinessTransactionDocumentItemID. OriginalEntryDocumentContainingObjectReference is a reference to an Object containing the OriginalEntryDocument, is optional and may be based on GDT: ObjectNodeReference and Qualifier: OriginalEntryDocumentContaining. OriginalEntryTransactionUUID is a universally unique identifier of the transaction during which the OriginalEntryDocument was created or changed, is optional and may be based on GDT: UUID.

OriginalEntryDocumentReference is a reference to the document, that keeps the original entry of the business transaction, is optional and may be based on GDT: ObjectNodeReference. OriginalEntryDocumentItemReference is a reference to an item of the OriginalEntryDocument. The value change recorded in the LineItem can be verified by that item of the OriginalEntryDocument. OriginalEntryDocumentItemReference, is optional and may be based on GDT: ObjectNodeReference. OriginalEntryDocumentItemTypeCode is a coded representation of the ItemType of the referred OriginalEntryDocumentItem, is optional and may be based on GDT: BusinessTransactionDocumentItemTypeCode. In some implementations, this element can be used only if the OriginalEntryDocument is a Business Transaction Document. OriginalEntryDocumentPartnerID is an identification of the OriginalEntryDocument as assigned by the business partner. For example, the ID of the Supplier Invoice assigned by the Supplier, is optional and may be based on GDT: BusinessTransactionDocumentID. In some implementations, this element can be used only if the OriginalEntryDocument is a Business Transaction Document and if the OriginalEntryDocument is identical to the OriginalEntryDocumentContainingObject. AccountingNotificationUUID is a universally unique identification of the notification sent to Financial Accounting about the business transaction stated in the LineItem, is optional and may be based on GDT: UUID. AccountingNotificationItemGroupItemUUID is a universally unique identification of the AccountingNotificationItemGroupItem, which triggered the posting of this LineItem, is optional and may be based on GDT: UUID. GeneralLedgerAccountLineItemUUID is a universally unique identification of a LineItem of a GeneralLedgerAccount that records the value change of the MaterialLedgerAccountLineItem in the GeneralLedger, is optional and may be based on GDT: UUID. GeneralLedgerAccountLineItemAccountingDocumentItemGroupID is a universally unique identification of the group of all AccountingDocumentItems that are summarized together in a GeneralLedgerAccountLineItem. In some implementations, the LineItem corresponds to exactly one AccountingDocumentItem belonging to the group.

GeneralLedgerAccountLineItemAccountingDocumentItemGroupID, is optional and may be based on GDT: BusinessTransactionDocumentItemGroupID. OffsettingSubledgerAccountUUID is a universally unique identification of a SubledgerAccount such as a ProductionLedgerAccount) in whose LineItems the inverse representation of the business transaction is stated, is optional and may be based on GDT: UUID.

OffsettingSubledgerAccountTypeCode is a coded representation of the type of the OffsettingSubledgerAccount to which the MaterialLedgerAccountLineItem refers, and may be based on GDT: SubledgerAccountTypeCode. In some implementations, only the code values 2 (MaterialLedgerAccount), 3 (ProductionLedgerAccount), 4 (Purchase in Process Ledger Account), 8 (Sales Ledger Account), 9 (Overhead Cost Ledger Account) and 11 (Other Direct Cost Ledger Account) can occur are applicable. SystemAdministrativeData is an administrative data stored in a system. This data includes the system user and change time. SystemAdministrativeData may be based on GDT: SystemAdministrativeData. ChartOfAccountsCode is a coded representation of the ChartOfAccounts containing the ChartOfAccountsItem that classifies—for general ledger accounting purposes—the value stated in the LineItem, and may be based on GDT: ChartOfAccountsCode. ChartOfAccountsItemCode is a coded representation of a ChartOfAccountsItem that classifies—for general ledger accounting purposes—the value stated in the LineItem, and may be based on GDT: ChartOfAccountsItemCode. AccountingBusinessTransactionTypeCode is a coded representation of the type of the business transaction stated in the MaterialLedgerAccountLineItem. It classifies the business transaction according to accounting criteria. AccountingBusinessTransactionTypeCode may be based on GDT: AccountingBusinessTransactionTypeCode. TypeCode is a coded representation of the type of the LineItem, and may be based on GDT: SubledgerAccountLineItemTypeCode. In some implementations there may be a restriction that only code values 02010 (warehouse inventory), 02020 (revenue/expense from revaluation), 02030 (revenue/expense from stock transfer), 02040 (physical inventory/inventory differences), 02050 (initial entry of stock balances), 02110 (valuation differences from production), 99010 (material consumption), 99020 (material consumption scrapping), 99050 (price differences purchase goods receipt), 99060 (price differences purchase invoice receipt), 99070 (price differences other) and 99080 (exchange rate differences purchase) can occur. AccountingDocumentTypeCode is a coded representation of the type of the AccountingDocument to which the LineItem refers by the AccountingDocumentReference, and may be based on GDT: AccountingDocumentTypeCode.

AccountingDocumentNote is a natural-language comment that applies the AccountingDocument, referred via the AccountingDocumentReference, as a whole rather than to individual items, is optional and may be based on GDT: SHORT_Note. AccountingDocumentItemNote is a natural-language comment pertaining to the AccountingDocumentItem to which the LineItem refers by the AccountingDocumentReference, is optional and may be based on GDT: SHORT_Note. PostingDate is the date with which the business transaction is effectively recorded in accounting, effectively means that period totals and balances in accounting are updated with this date, may be based on GDT: Date and Qualifier: Posting. OriginalEntryDocumentDate is the issue date of the Original Entry Document, and may be based on GDT: Date and Qualifier: OriginalEntryDocument. AccountingBusinessTransactionDate is the date at which the business transaction took place applying the criteria of accounting, is optional and may be based on GDT: Date and Qualifier: BusinessTransaction. CurrencyConversionDate is the date that is used for the currency translation applied to amounts in the accounting document, is optional and may be based on GDT: Date and Qualifier: CurrencyConversion. FiscalYearVariantCode is a coded representation of the FiscalYearVariant according to whose fiscal year definition (begin, end, period definition) the FiscalYearID and the AccountingPeriodID are derived from, is optional and may be based on GDT: FiscalYearVariantCode. FiscalYearID is an identification of the fiscal year in which the LineItem is posted, and may be based on GDT: FiscalYearID. AccountingPeriodID is an identification of the accounting period in which the LineItem is posted, and may be based on GDT: AccountingPeriodID. AccountingClosingStepCode is a coded representation of the closing step of the accounting document, is optional and may be based on GDT: AccountingClosingStepCode.

AccountingDocumentItemAccountingGroupID is a unique identification of a group of AccountingDocumentItems belonging together applying the criteria of accounting. It is used to indicate the items of an AccountingDocument that belong together (e.g., in partial zero-balance checking) within the Accounting Document and may be based on GDT: BusinessTransactionDocumentItemGroupID. An example is an activity confirmation from production that contains items for actual working times and also for materials used for the production process. The created AccountingDocumentItems are grouped together according to the material movement or working time confirmation they belong to. ExpenseClassificationFunctionalAreaCode is a coded representation of the functional area to which the value and quantity of the LineItem are allocated, is optional and may be based on GDT: ExpenseClassificationFunctionalAreaCode. PropertyMovementDirectionCode is a coded representation of the direction of movement of a property in case the LineItem describes a property movement, is optional and may be based on GDT: PropertyMovementDirectionCode. GeneralLedgerMovementTypeCode is a coded representation of the type of movement with which the value change is recorded for GeneralLedger purposes in the GeneralLedgerAccount, is optional and may be based on GDT: GeneralLedgerMovementTypeCode. DebitCreditCode is a coded representation of debit or credit. It specifies whether the LineItem is assigned to the debit or credit side of the GeneralLedger account and may be based on GDT: DebitCreditCode. CancellationDocumentIndicator indicates whether the AccountingDocument to which the LineItem refers by the AccountingDocumentReference refers to a CancellationOriginalEntryDocument, is optional and may be based on GDT: Indicator and Qualifier: CancellationDocument. CancellationOriginalEntryDocumentContainingObjectReference is a reference to the Business Object containing the OriginalEntryDocument that cancelled this LineItem, is optional and may be based on GDT: ObjectNodeReference and Qualifier: CancellationOriginalEntryDocumentContaining. CancellationOriginalEntryTransactionUUID is a universally unique identifier of the transaction during which the CancellationOriginalEntryDocument was created or changed, is optional and may be based on GDT: UUID.

CancellationOriginalEntryDocumentReference is a reference to the OriginalEntryDocument, that cancelled this LineItem, is optional and may be based on GDT: ObjectNodeReference and Qualifier: Cancellation. CancelledIndicator indicates if the LineItem has been cancelled, is optional and may be based on GDT: Indicator and Qualifier: Cancelled. BusinessTransactionCurrencyAmount is the value of the LineItem in transaction currency. The transaction currency is the currency agreed on by two business partners for their business relationship. BusinessTransactionCurrencyAmount may be based on GDT: Amount and Qualifier: BusinessTransactionCurrency. LocalCurrencyAmount is the value of the LineItem in the local currency of the Company carrying the MaterialLedgerAccount. The local currency is the currency in which the local books are kept. LocalCurrencyAmount may be based on GDT: Amount and Qualifier: LocalCurrency. SetOfBooksCurrencyAmount is the value of the LineItem in the currency selected for the set of books, and may be based on GDT: Amount and Qualifier: SetOfBooksCurrency. HardCurrencyAmount is the value of the LineItem, in the hard currency of the country of the Company carrying the MaterialLedgerAccount. The hard currency is a stable, country-specific currency that is used in high-inflation countries. HardCurrencyAmount, is optional and may be based on GDT: Amount and Qualifier: HardCurrency. IndexBasedCurrencyAmount is the value of the LineItem in the index-based currency of the country of the Company carrying the MaterialLedgerAccount. The index-based currency is a fictitious, country-specific currency that is used in high-inflation countries as a comparison currency for reporting. IndexBasedCurrencyAmount is optional and may be based on GDT: Amount and Qualifier: IndexedBasedCurrency. ValuationQuantity is the quantity change of the business transaction stated in the LineItem in the valuation unit of measurement of the material, and may be based on GDT: Quantity, and Qualifier: Valuation. In some implementations, the unit of measure corresponds to the valuation unit of the material as it was maintained at the time the LineItem was created. ValuationQuantityTypeCode is a coded representation of the type of the valuation quantity, and may be based on GDT: QuantityTypeCode and Qualifier: Valuation. In some implementations, the quantity type code corresponds to the valuation quantity type code of the material as it was maintained at the time the LineItem was created. ReferenceQuantity specifies, in the valuation unit of the material, a quantity to which the business transaction stated in the LineItem refers but which does not result in a change to the inventory quantity. ReferenceQuantity is optional and may be based on GDT: Quantity and Qualifier: Reference. In some implementations, the unit of measure corresponds to the valuation unit of the material as it was maintained at the time the LineItem was created. ReferenceQuantityTypeCode is a coded representation of the type of the reference quantity, is optional and may be based on GDT: QuantityTypeCode and Qualifier: Reference. In some implementations, the quantity type code corresponds to the valuation quantity type code of the material as it was maintained at the time the LineItem was created. In some implementations, ReferenceQuantityTypeCode.

A number of inbound aggregation relationships can exist, such as 1) From business object SetOfBooks/node SetOfBooks, a SetOfBooks relationship, with a cardinality of (1:cn), the SetOfBooks according to whose specifications the LineItem was created; 2) From business object Company/node Company, a Partner Company relationship, with a cardinality of (c:cn), a company that acts in the business transaction stated in the LineItem as an intra corporate partner; 3) From business object Segment/node Segment, a Segment relationship, with a cardinality of (c:cn), a segment to which the value and quantity of the LineItem are allocated; 4) From business object Segment/node Segment, a PartnerSegment relationship, with a cardinality of (c:cn), a Segment that acts in the business transaction stated in the LineItem as an intra corporate partner; 5) From business object ProfitCentre/node ProfitCentre, a ProfitCentre relationship, with a cardinality of (c:cn), a ProfitCentre to which the value and quantity of the LineItem are allocated; 6) From business object ProfitCentre/node ProfitCentre, a PartnerProfitCentre relationship, with a cardinality of (c:cn), a ProfitCentre that acts in the business transaction stated in the LineItem as an intra corporate partner; 7) From business object GoodsAndActivityConfirmation/node GoodsAndActivityConfirmation, a GoodsAndActivityConfirmation relationship, with a cardinality of (c:cn), a GoodsAndActivityConfirmation that keeps the original entry of the business transaction stated in the LineItem; 8) From business object GoodsAndActivityConfirmation/node InventoryChangeItem, a GoodsAndActivityConfirmationInventoryChangeItem relationship, with a cardinality of (c:cn), an InventoryChangeItem in a GoodsAndActivityConfirmation serving as OriginalEntryDocumentItem by which the value change recorded in the LineItem can be verified; 9) From business object SiteLogisticsConfirmation/node SiteLogisticsConfirmation, a SiteLogisticsConfirmation relationship, with a cardinality of (c:cn), a SiteLogisticsConfirmation that keeps the original entry of the business transaction stated in the LineItem; 10) From business object SiteLogisticsConfirmation/node InventoryChangeItem, a SiteLogisticsConfirmationInventoryChangeItem relationship, with a cardinality of (c:cn), an InventoryChangeItem in a SiteLogisticsConfirmation serving as OriginalEntryDocumentItem by which the value change recorded in the LineItem can be verified; 11) From business object ProductionConfirmation/node ProductionConfirmation, a ProductionConfirmation relationship, with a cardinality of (c:cn), a ProductionConfirmation that keeps the original entry of the business transaction stated in the LineItem; 12) From business object ProductionConfirmation/node InventoryChangeItem, a ProductionConfirmationInventoryChangeItem relationship, with a cardinality of (c:cn), an InventoryChangeItem in a ProductionConfirmation serving as OriginalEntryDocumentItem by which the value change recorded in the LineItem can be verified; 13) From MDRO InventoryPriceChangeRun/node InventoryPriceChangeRun, an InventoryPriceChangeRun relationship, with a cardinality of (c:cn), a reference to the InventoryPriceChangeRun that contains the OriginalEntryDocument; 14) From MDRO InventoryPriceChangeRun/node LogSection, an InventoryPriceChangeRunLogSection relationship, with a cardinality of (c:cn), a reference to a LogSection that serves as OriginalEntryDocument for a business transaction in an InventoryPriceChangeRun; 15) From MDRO InventoryPriceChangeRun/node LogSectionInventoryPriceChangeSuccessfullyProcessedItem, an InventoryPriceChangeRunLogSectionInventoryPriceChangeSuccessfullyProcessedItem relationship, with a cardinality of (c:cn), a SuccessfullyProcessedItem in a LogSection of an InventoryPriceChangeRun serving as OriginalEntryDocumentItem by which the value change recorded in the LineItem can be verified; 16) From MDRO GoodsReceiptInvoiceReceiptClearingRun/node GoodsReceiptInvoiceReceiptClearingRun, a GoodsReceiptInvoiceReceiptClearingRun relationship, with a cardinality of (c:cn), a reference to the GoodsReceiptInvoiceReceiptClearingRun that contains the OriginalEntryDocument; 17) From MDRO GoodsReceiptInvoiceReceiptClearingRun/node LogSection, a GoodsReceiptInvoiceReceiptClearingRunLogSection relationship, with a cardinality of (c:cn), a reference to a LogSection that serves as OriginalEntryDocument for a business transaction in an GoodsReceiptInvoiceReceiptClearingRun; 18) From MDRO GoodsReceiptInvoiceReceiptClearingRun/node LogSectionGoodsReceiptInvoiceReceiptClearingCalculatedItem, a GoodsReceiptInvoiceReceiptClearingRunLogSectionGoodsReceipt InvoiceReceiptClearingCalculatedItem relationship, with a cardinality of (c:cn), a CalculatedItem in a LogSection of an GoodsReceiptInvoiceReceiptClearingRun serving as OriginalEntryDocumentItem by which the value change recorded in the LineItem can be verified; 19) From MDRO WorkInProcessClearingRun/node WorkInProcessClearingRun, a WorkInProcessClearingRun relationship, with a cardinality of (c:cn), a reference to the WorkInProcessClearingRun that contains the OriginalEntryDocument; 20) From MDRO WorkInProcessClearingRun/node LogSection, a WorkInProcessClearingRunLogSection relationship, with a cardinality of (c:cn), a reference to a LogSection that serves as OriginalEntryDocument for a business transaction in an WorkInProcessClearingRun; 21) From MDRO WorkInProcessClearingRun/node LogSectionWorkInProcessClearingCalculatedItem, a WorkInProcessClearingRunLogSectionWorkInProcessClearingCalculatedItem relationship, with a cardinality of (c:cn), a CalculatedItem in a LogSection of an WorkInProcessClearingRun serving as OriginalEntryDocumentItem by which the value change recorded in the LineItem can be verified.

In some implementations, an integrity condition can exist such that one and only one of the above relationships to an OriginalEntryDocument and to an OriginalEntryDocumentItem may exist. If the OriginalEntryDocument is not identical to a Business Object but contained in it then the corresponding relationship to this Business Object may exist, too.

Other inbound aggregation relationships can exist, such as 1) From business object GoodsAndActivityConfirmation/node GoodsAndActivityConfirmation, a CancellationGoodsAndActivityConfirmation relationship, with a cardinality of (c:cn), a GoodsAndActivityConfirmation that keeps the OriginalEntryDocument for the cancellation of this LineItem; 2) From business object SiteLogisticsConfirmation/node SiteLogisticsConfirmation, a CancellationSiteLogisticsConfirmation relationship, with a cardinality of (c:cn), a SiteLogisticsConfirmation that keeps the OriginalEntryDocument for the cancellation of this LineItem; and 3) From business object ProductionConfirmation/node ProductionConfirmation, a CancellationProductionConfirmation relationship, with a cardinality of (c:cn), a ProductionConfirmation that keeps the OriginalEntryDocument for the cancellation of this LineItem. In some implementations, an integrity condition can exist such that one and only one of the above relationships to an CancellationOriginalEntryDocument may exist. In these implementations, if the CancellationOriginalEntryDocument is not identical to a Business Object but contained in it then the corresponding relationship to this Business Object may exist, too.

In some implementations, a constraint such that with the following six relationships, a maximum of one of these relationships can exist: 1) From business object MaterialLedgerAccount/node MaterialLedgerAccount, an OffsettingMaterialLedgerAccount relationship, with a cardinality of (c:cn), which denotes the MaterialLedgerAccount to which the LineItem relates as the OffsettingSubLedgerAccount; 2) From business object PurchaseLedgerAccount/node PurchaseLedgerAccount, an OffsettingPurchaseLedgerAccount relationship, with a cardinality of (c:cn), which denotes the PurchaseLedgerAccount to which the LineItem relates as the OffsettingSubLedgerAccount; 3) From business object ProductionLedgerAccount/node ProductionLedgerAccount, an OffsettingProductionLedgerAccount relationship, with a cardinality of (c:cn), which denotes the ProductionLedgerAccount to which the LineItem relates as the OffsettingSubLedgerAccount; 4) From business object SalesLedgerAccount/node SalesLedgerAccount, an OffsettingSalesLedgerAccount relationship, with a cardinality of (c:cn), which denotes the SalesLedgerAccount to which the LineItem relates as the OffsettingSubLedgerAccount; 5) From business object OverheadCostLedgerAccount/node OverheadCostLedgerAccount, an OffsettingOverheadCostLedgerAccount relationship, with a cardinality of (c:cn), which denotes the OverheadCostLedgerAccount to which the LineItem relates as the OffsettingSubLedgerAccount; and 6) From business object OtherDirectCostLedgerAccount/node OtherDirectCostLedgerAccount, an OffsettingOtherDirectCostLedgerAccount relationship, with a cardinality of (c:cn), which denotes the OtherDirectCostLedgerAccount to which the LineItem relates as the OffsettingSubLedgerAccount.

A number of association relationships for navigation can exist, such as 1) To business object AccountingDocument/node AccountingDocument, an AccountingDocument relationship, with a cardinality of (1:cn), the accounting document that records the entire business transaction in accounting; and 2) To business object GeneralLedgerAccount/node LineItem, a GeneralLedgerAccountLineItem relationship, with a cardinality of (1:cn), a LineItem of a GeneralLedgerAccount that records the value change for GeneralLedger purposes.

a number of inbound association relationships can exist, such as 1) From business object AccountingNotification/node AccountingNotification, an AccountingNotification relationship, with a cardinality of (c:cn), the notification sent to Financial Accounting about the business transaction stated in the LineItem; 2) From business object AccountingNotification/node ItemGroupItem, an AccountingNotificationItemGroupItem relationship, with a cardinality of (c:cn), the item of the AccountingNotification whose information is recorded in the LineItem; 3) From business object Identity/node Identity, a CreationIdentity relationship, with a cardinality of (1:cn), the system user Identity who created the LineItem; and 4) From business object Identity/node Identity, a LastChangeIdentity relationship, with a cardinality of (c:cn), the system user Identity who last changed the LineItem.

PeriodTotal

PeriodTotal is a period-based record in a material ledger account for a set of books and a business transaction category. The period total indicates the quantity and value of the inventory change and any price differences. The elements located directly at the node PeriodTotal are defined by the type GDT: MaterialLedgerAccountPeriodTotal. These elements can include SetOfBooksID, SegmentUUID, ProfitCentreUUID, ChartOfAccountsCode, ChartOfAccountsItemCode, AccountingBusinessTransactionTypeCode, SubledgerAccountLineItemTypeCode, FiscalYearVariantCode, FiscalYearID, AccountingPeriodID, SetOfBooksCurrencyAmount, HardCurrencyAmount, IndexBasedCurrencyAmount, ValuationQuantity, ValuationQuantityTypeCode, ReferenceQuantity, and ReferenceQuantityTypeCode. SetOfBooksID is a universally unique identification of the SetOfBooks according to whose specifications the PeriodTotal was created and updated, and may be based on GDT: SetOfBooksID. SegmentUUID is optional, is a universally unique identification of the Segment to which the value and quantity of the PeriodTotal are allocated, and may be based on GDT: UUID. ProfitCentreUUID is optional, is a universally unique identification of the ProfitCentre to which the value and quantity of the PeriodTotal are allocated, and may be based on GDT: UUID. ChartOfAccountsCode is a coded representation of the ChartOfAccounts that contains the ChartOfAccountsItem that classifies the value stated in the PeriodTotal, and may be based on GDT: ChartOfAccountsCode. ChartOfAccountsItemCode is a coded representation of a ChartOfAccountsItem that classifies, for general ledger accounting purposes, the value stated in the PeriodTotal, and may be based on GDT: ChartOfAccountsItemCode. AccountingBusinessTransactionTypeCode is a coded representation of the type of the business transactions for which the PeriodTotal keeps summarized quantities and values. It classifies the business transactions according to accounting criteria. It may be based on GDT: AccountingBusinessTransactionTypeCode. SubledgerAccountLineItemTypeCode is a coded representation of the type of the LineItems whose amounts and quantities are summarized in the PeriodTotal, and may be based on GDT: SubledgerAccountLineItemTypeCode. In some implementations, there may be restrictions such that only code values 02010 (warehouse inventory), 02020 (revenue/expense from revaluation), 02030 (revenue/expense from stock transfer), 02040 (physical inventory/inventory differences), 02050 (initial entry of stock balances), 02110 (valuation differences from production), 99010 (material consumption), 99020 (material consumption scrapping), 99050 (price differences purchase goods receipt), 99060 (price differences purchase invoice receipt), 99070 (price differences other) and 99080 (exchange rate differences purchase) can occur.

FiscalYearVariantCode is a coded representation of the FiscalYearVariant according to whose fiscal year definition (begin, end, period definition) the FiscalYearID and the AccountingPeriodID are derived, and may be based on GDT: FiscalYearVariantCode. FiscalYearID is an identification of the fiscal year in which the LineItem are posted for which the PeriodTotal keeps summarized values and quantities, and may be based on GDT: FiscalYearID. AccountingPeriodID is an identification of the accounting period in which the LineItem are posted for which the PeriodTotal keeps summarized values and quantities, and may be based on GDT: AccountingPeriodID. LocalCurrencyAmount is the value of the PeriodTotal in the local currency of the Company carrying the MaterialLedgerAccount. The local currency is the currency in which the local books are kept. LocalCurrency may be based on GDT: Amount and Qualifier: LocalCurrency. In some implementation, there may be a constraint such that the value reported here may equal the total of all values in the local currency of the line items for which the following elements match: SetOfBooksID, SegmentUUID, ProfitCentreUUID, ChartOfAccountsCode, ChartOfAccountsItemCode, AccountingBusinessTransactionTypeCode, SubledgerAccountLineItemTypeCode, FiscalYearVariantCode, FiscalYearID, AccountingPeriodID, measure unit code of ValuationQuantity, ValuationQuantityTypeCode, measure unit code of ReferenceQuantity and ReferenceQuantityTypeCode.

SetOfBooksCurrencyAmount is optional, is the value of the PeriodTotal in the currency selected for the set of books, and may be based on GDT: Amount and Qualifier: SetOfBooksCurrency. In some implementations, there may be a constraint such that the value reported here may equal the total of all values, in the additional currency selected for the set of books, of the line items for which the following elements match: SetOfBooksID, SegmentUUID, ProfitCentreUUID, ChartOfAccountsCode, ChartOfAccountsItemCode, AccountingBusinessTransactionTypeCode, SubledgerAccountLineItemTypeCode, FiscalYearVariantCode, FiscalYearID, AccountingPeriodID, measure unit code of ValuationQuantity, ValuationQuantityTypeCode, measure unit code of ReferenceQuantity and ReferenceQuantityTypeCode.

HardCurrencyAmount is optional, is the value of the PeriodTotal in the hard currency of the country of the Company carrying the MaterialLedgerAccount. The hard currency is a stable, country-specific currency that is used in high-inflation countries. HardCurrencyAmount may be based on GDT: Amount and Qualifier: HardCurrency. In some implementations, there may be a constraint such that the value reported here may equal the total of all values in the hard currency of the line items for which the following elements match: SetOfBooksID, SegmentUUID, ProfitCentreUUID, ChartOfAccountsCode, ChartOfAccountsItemCode, AccountingBusinessTransactionTypeCode, SubledgerAccountLineItemTypeCode, FiscalYearVariantCode, FiscalYearID, AccountingPeriodID, measure unit code of ValuationQuantity, ValuationQuantityTypeCode, measure unit code of ReferenceQuantity and ReferenceQuantityTypeCode.

IndexBasedCurrencyAmount is optional, is the value of the PeriodTotal in the index-based currency of the country of the Company carrying the MaterialLedgerAccount. The index-based currency is a fictitious, country-specific currency that is used in high-inflation countries as a comparison currency for reporting.

IndexBasedCurrencyAmount may be based on GDT: Amount and Qualifier: IndexBasedCurrency. In some implementations there may be a constraint such that the value reported here may equal the total of all values in the index-based currency of the line items for which the following elements match: SetOfBooksID, SegmentUUID, ProfitCentreUUID, ChartOfAccountsCode, ChartOfAccountsItemCode, AccountingBusinessTransactionTypeCode, SubledgerAccountLineItemTypeCode, FiscalYearVariantCode, FiscalYearID, AccountingPeriodID, measure unit code of ValuationQuantity, ValuationQuantityTypeCode, measure unit code of ReferenceQuantity and ReferenceQuantityTypeCode.

ValuationQuantity is the quantity of the PeriodTotal in the valuation unit of measurement of the material, and may be based on GDT: Quantity and Qualifier: Valuation. In some implementations, there may be a constraint such that the quantity reported here may equal the total of all changes in the inventory quantity of the line items for which the following elements match: SetOfBooksID, SegmentUUID, ProfitCentreUUID, ChartOfAccountsCode, ChartOfAccountsItemCode, AccountingBusinessTransactionTypeCode, SubledgerAccountLineItemTypeCode, FiscalYearVariantCode, FiscalYearID, AccountingPeriodID, measure unit code of ValuationQuantity, ValuationQuantityTypeCode, measure unit code of ReferenceQuantity and ReferenceQuantityTypeCode. The unit of measure corresponds to the valuation unit of the material as it was maintained at the time the LineItem that was summarized to the PeriodTotal was created.

ValuationQuantityTypeCode is a coded representation of the type of the valuation quantity and may be based on GDT: QuantityTypeCode and Qualifier: Valuation. In some implementations, there may be a constraint such that the quantity type code corresponds to the valuation quantity type code of the material as it was maintained at the time the LineItem that was summarized to the PeriodTotal was created.

ReferenceQuantity is optional, and specifies, in the valuation unit of the material, a quantity to which the business transactions represented in the PeriodTotal refer but which do not result in a change to the inventory quantity, and may be based on GDT: Quantity and Qualifier: Reference.

Constraint: The quantity indicated here may equal the total of all changes in the reference quantity of the line items for which the following elements match: SetOfBooksID, SegmentUUID, ProfitCentreUUID, ChartOfAccountsCode, ChartOfAccountsItemCode, AccountingBusinessTransactionTypeCode, SubledgerAccountLineItemTypeCode, FiscalYearVariantCode, FiscalYearID, AccountingPeriodID, measure unit code of ValuationQuantity, ValuationQuantityTypeCode, measure unit code of ReferenceQuantity and ReferenceQuantityTypeCode. The unit of measure corresponds to the valuation unit of the material as it was maintained at the time the LineItem that was summarized to the PeriodTotal was created.

ReferenceQuantityTypeCode is optional and is a coded representation of the type of the reference quantity, and may be based on GDT: QuantityTypeCode and Qualifier: Reference. In some implementations, there may be a constraints such that the quantity type code corresponds to the valuation quantity type code of the material as it was maintained at the time the LineItem that was summarized to the PeriodTotal was created and the ReferenceQuantityTypeCode can be used if the element ReferenceQuantity is filled.

A number of inbound aggregation relationships can exist, such as 1) From business object SetOfBooks/node SetOfBooks, a SetOfBooks relationship with cardinality of (1:cn), the SetOfBooks according to whose specifications the PeriodTotal was created; 2) From business object Segment/node Segment, a Segment relationship with cardinality of (c:cn), a segment to which the value and quantity of the PeriodTotal are allocated; and 3) From business object ProfitCentre/node ProfitCentre, a ProfitCentre relationship with a cardinality of (c:cn), a ProfitCentre to which the value and quantity of the PeriodTotal are allocated.

PeriodBalance

PeriodBalance is a period-based record in a material ledger account for a set of books. The period balance is the quantity and value of the inventory. The elements located directly at the PeriodBalance node can be defined by the type GDT: MaterialLedgerAccountPeriodBalanceElements. These elements can include SetOfBooksID, SegmentUUID, ProfitCentreUUID, ChartOfAccountsCode, ChartOfAccountsItemCode, FiscalYearVariantCode, FiscalYearID, AccountingPeriodID, LocalCurrencyAmount, SetOfBooksCurrencyAmount, HardCurrencyAmount, IndexBasedCurrencyAmount, ValuationQuantity, and ValuationQuantityTypeCode.

SetOfBooksID is a universally unique identification of the SetOfBooks according to whose specifications the PeriodBalance was created and updated, GDT: SetOfBooksID. SegmentUUID is optional, is a universally unique identification of the Segment to which the value and quantity of the PeriodBalance are allocated, and may be based on GDT: UUID. ProfitCentreUUID is optional, is a universally unique identification of the ProfitCentre to which the value and quantity of the PeriodBalance are allocated, and may be based on GDT: UUID. ChartOfAccountsCode is a coded representation of the ChartOfAccounts that contains the ChartOfAccountsItem that classifies the value stated in the PeriodBalance, and may be based on GDT: ChartOfAccountsCode. ChartOfAccountsItemCode is a coded representation of a ChartOfAccountsItem that classifies, for general ledger accounting purposes, the value stated in the PeriodBalance, and may be based on GDT: ChartOfAccountsItemCode. FiscalYearVariantCode is a coded representation of the FiscalYearVariant according to whose fiscal year definition (begin, end, period definition) the FiscalYearID and the AccountingPeriodID are derived, and may be based on GDT: FiscalYearVariantCode. FiscalYearID is an identification of the fiscal year for which the PeriodBalance keeps summarized values and quantities, and may be based on GDT: FiscalYearID. AccountingPeriodID is an identification of the accounting period for which the PeriodBalance keeps summarized values and quantities, and may be based on GDT: AccountingPeriodID. LocalCurrencyAmount is the value of the PeriodBalance in the local currency of the Company carrying the MaterialLedgerAccount. The local currency is the currency in which the local books are kept, and may be based on GDT: Amount and Qualifier: LocalCurrency. SetOfBooksCurrencyAmount is optional, is the value of the PeriodBalance in the currency selected for the set of books, and may be based on GDT: Amount and Qualifier: SetOfBooksCurrency. HardCurrencyAmount is optional, and is the value of the PeriodBalance in the hard currency of the country of the Company carrying the MaterialLedgerAccount. The hard currency is a stable, country-specific currency that is used in high-inflation countries. HardCurrencyAmount may be based on GDT: Amount and Qualifier: HardCurrency. IndexBasedCurrencyAmount is optional, and is the value of the PeriodBalance in the index-based currency of the country of the Company carrying the MaterialLedgerAccount. The index-based currency is a fictitious, country-specific currency that is used in high-inflation countries as a comparison currency for reporting. IndexBasedCurrencyAmount may be based on GDT: Amount and Qualifier: IndexBasedCurrency. ValuationQuantity is the quantity of the PeriodBalance in the valuation unit of measurement of the material, and may be based on GDT: Quantity and Qualifier: Valuation. In some implementations, there may be a constraint such that the unit of measure corresponds to the currently maintained valuation unit of the material. ValuationQuantityTypeCode is a coded representation of the type of the valuation quantity, and may be based on GDT: QuantityTypeCode and Qualifier: Valuation. In some implementations, there may be a constraint such that the quantity type code corresponds to the currently maintained valuation quantity type code of the material.

A number of inbound aggregation relationships can exist, such as: 1) From business object SetOfBooks/node SetOfBooks, a SetOfBooks relationship with cardinality of (1:cn), the SetOfBooks according to whose specifications the PeriodBalance was created; 2) From business object Segment/node Segment, a Segment relationship with cardinality of (c:cn), a segment to which the value and quantity of the PeriodBalance are allocated; and 3) From business object ProfitCentre/node ProfitCentre, a ProfitCentre relationship with a cardinality of (c:cn), a ProfitCentre to which the value and quantity of the PeriodBalance are allocated.

Business Object MaterialValuationData

Figures 1, 93:
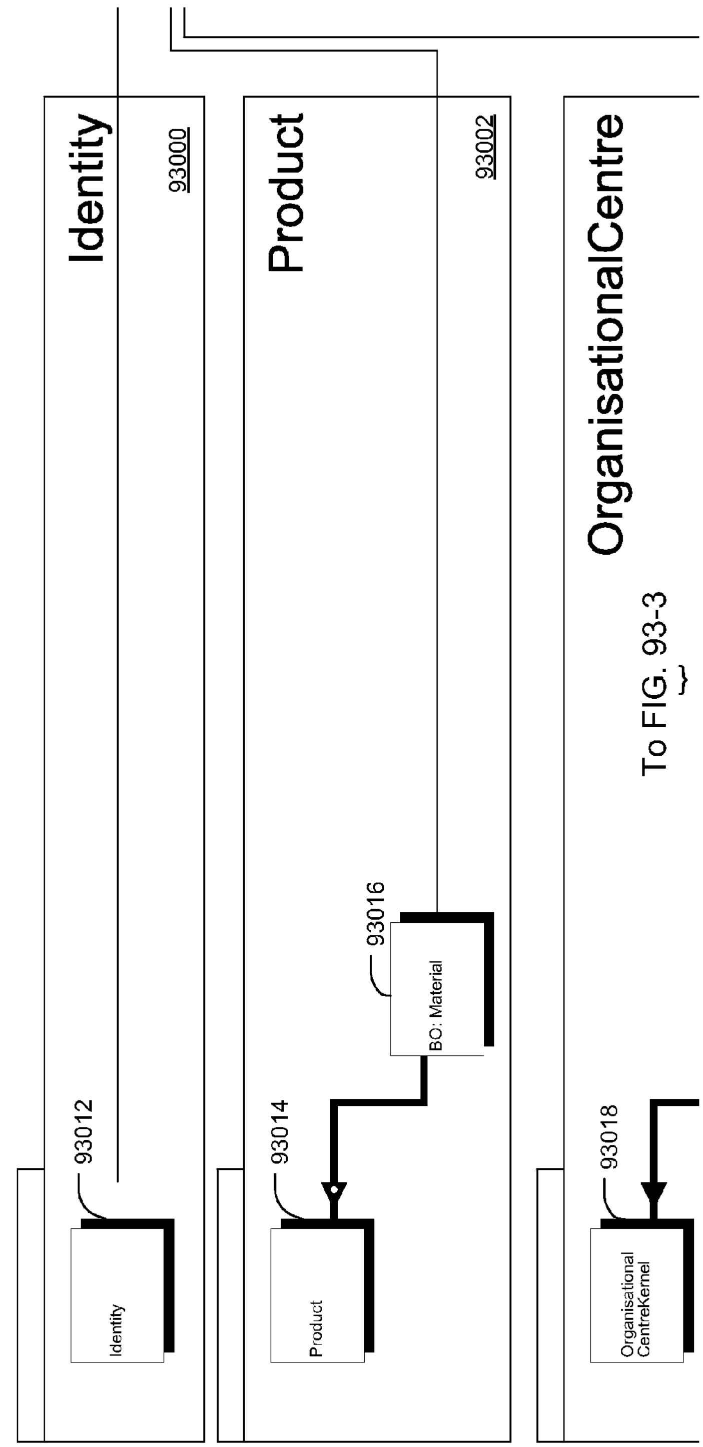
Figures 2, 93:
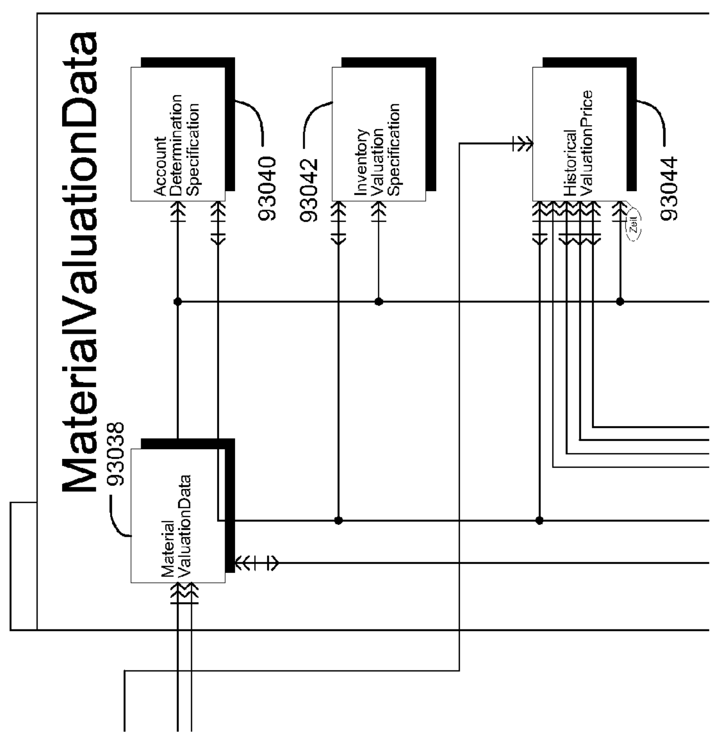
Figures 3, 93:
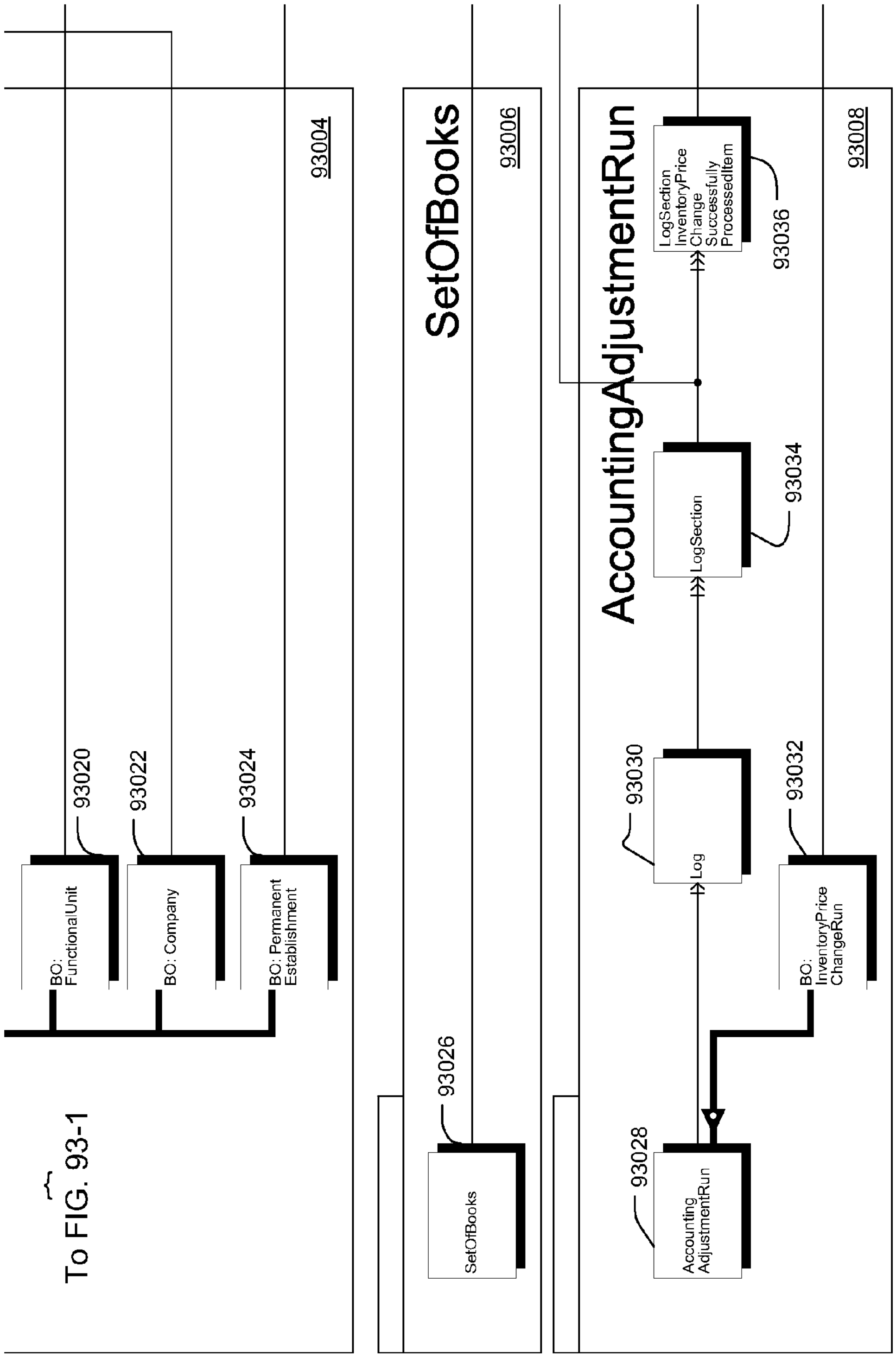
Figures 4, 93:
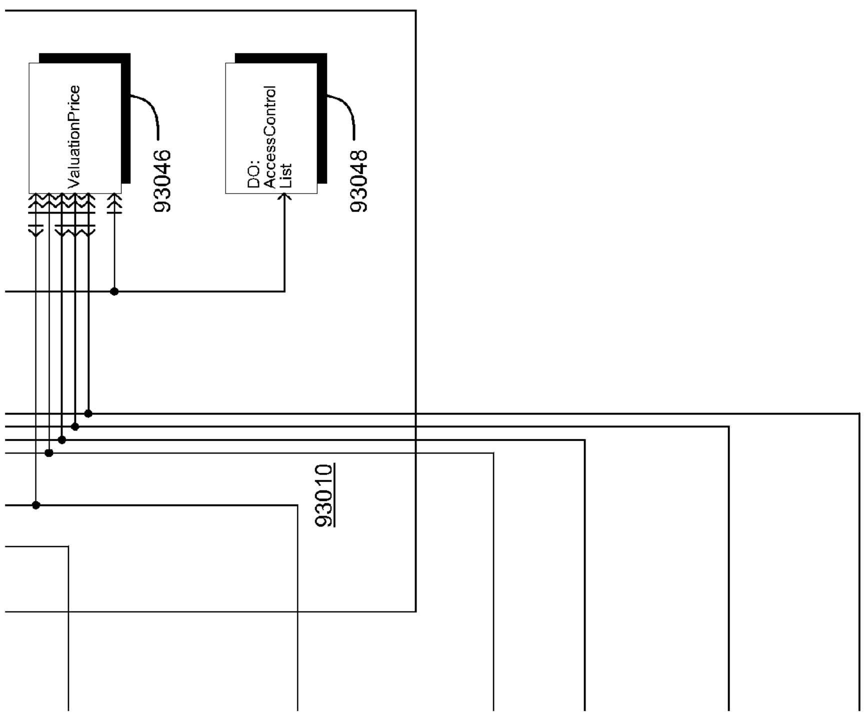

FIGS. 93-1 through 93-4 illustrate an example MaterialValuationDatabusiness object model 93010. Specifically, this model depicts interactions among various hierarchical components of the MaterialValuationData, as well as external components that interact with the MaterialValuationData (shown here as 93000 through 93008 and 93012 through 93036). Data that references a material or material group for valuating business transactions, for cost estimates, and for value-based management of material inventories. In particular, it contains internal valuation prices for a material or material group. Release b 1 will only include data with reference to a material. A material group contains materials that are valuated in the same way.

Process Components

The MaterialValuationData business object is part of the Financial Accounting Master Data Management process component. MaterialValuationData contains information on account determination, perpetual inventory valuation, and valuation prices and their history. MaterialValuationData is represented by the MaterialValuationData node. The Business Object is involved in the following Process Component Interaction Models: DataMigrationProcessing_FinancialAccountingMasterDataManagement, and Service Interface Material.

Valuation Data Transmission In: Technical Name MaterialValuationDataTransmissionIn The Service Interface Receivables Payables Migration List Migration In is part of the following Process Component Interaction Models: DataMigrationProcessing_FinancialAccountingMasterDataManagement The Service Interface Material Valuation Data Transmission In groups the operations that inform Financial Accounting Master Data Management about material valuation data.

Transmit Material Valuation Data (A2A): Technical Name MaterialValuationDataTransmissionIn, TransmitMaterialValuationData Transmits information about material valuation data from data migration processing into Material Valuation Data and forwards this information to Financial Accounting Master Data Management.

The operation is based on message type MaterialValuationDataTransmitRequest (derived from business object MaterialValuationData).

The MaterialValuationData 93038 (Root Node) contains attributes and internal prices for valuating business transactions, for cost estimates with reference to a material or material group, and for value-based management of material inventories. Includes information on account determination, perpetual inventory valuation, and valuation prices and their history.

The elements located directly at the MaterialValuationData node are defined by the MaterialValuationDataElements data type. These elements may include: UUID, CompanyUUID, MaterialUUID, ValuationPriceDefaultBase Quantity, ValuationPriceDefaultBaseQuantityTypeCode, InventoryFunctionUnitUUID. A UUID is a GTD of the type UUID and is universally unique identifier of a MaterialValuationData. A CompanyUUID is a GDT of the type UUID and is a universally unique identification of the copy to which MaterialValuationData applies. A MaterialUUID is a GDT of the type UUID and contains a universally unique identification of the material for which MaterialValuationData contains information. The ValuationPriceDefaultBaseQuantity is a GDT of the type Quantity and contains a default value for the base quantity of new valuation prices and it is optional. The ValuationPriceDefaultBase QuantityTypeCode is a GDT of the type QuantityTypeCode and contains the coded representation of the type of the valuation price default base quantity. The quantity type code can be the same as the quantity type code for the valuation unit of the material and it is optional. The InventoryFunctionUnitUUID is a GDT of the type UUID and contains a globally unique identifier of the FunctionalUnit working on the MaterialValuationData and it is optional.

The FunctionalUnit referenced has to be able to execute the organizational function Inventory, i.e. the element OrganisationalFunctionCode in one of the instances of the node FunctionalUnitAttributes in the FunctionalUnit references can have the value ‘20’ (Inventory).

MaterialValuationDataKey: The element MaterialValuationDataKey is the business key of the MaterialValuationData. The MaterialValuationDataKey may consists of the following elements:

CompanyUUID and MaterialUUI

The following composition relationships to subordinate nodes exits

AccountDeterminationSpecification 93040 has a cardinality of (1:cn).

InventoryValuationSpecification 93042 has a cardinality of (1:cn).

ValuationPrice 93046 has a cardinality of (1:cn) (Filtered).

The filter elements may be defined by the data type: MaterialValuationDataValuationPriceFilterElements. These elements can include: PermanentEstablishmentUUID, ValidityDatePeriod, PriceTypeCode, SetOfBooksID. The PermanentEstablishmentUUID is a GDT of the type OrganisationalCentreIID and is optional. The ValidityDatePeriod is a GDT of the type Closed_DatePeriod, Qualifier: Validity, Constraint: only StartDate and EndDate and is optional. The PricetypeCode is a GDT of the type PriceTypeCode, Constraint: only material-based code value and is optional. SetOfbooksID is a GDT of the type SetOfBooksID and is optional.

HistoricalValuationPrice 93044 has a cardinality of (1:cn).

AccessControlList 93048 has a cardinality of (1:1).

There may be a number of Inbound Aggregation Relationships including:

From business object Material: Material may have a cardinality of (1:cn). Material can be the material for which the MaterialValuationData contains information.

From business object Company: Company may have a cardinality of (1:cn). Company can be the company for which the MaterialValuationData applies.

There may be a number of Inbound Association Relationships including:

From business object FunctionalUnit: InventoryFunctionalUnit may have a cardinality of (c:cn).

Functional Unit Identifies the Functional Unit which is working on the MaterialValuationData.

There maybe a number of Associations for Navigation including:

To business object MaterialValuationData: ValuationPriceByDate may have a cardinality of (1:cn)

MaterialValuationData can output a list of valuation prices which are valid on a given date.

The filter elements can be defined by the data type: MaterialValuationDataValuationPriceByDateFilterElements. These elements may include: ValidAtDate, PermanentEstablishmentUUID, PriceTypeCode, SetOfBooksID. The ValidAtDate is a GDT of the type Date and contains the date on which the valuation prices are valid and is within the validity period (ValidityDatePeriod) of the valuation prices. The PermanentEstablishmentUUID is a GDT of the type OrganisationalCentreIID and it is optional. The PricetypeCode is a GDT of the type PriceTypeCode, constraint: only material-based code values and it is optional. SetOfBooksID is a GDT of the type SetOfBooksID and it is optional.

Enterprise Service Infrastructure Actions

SetValuationPrice

Sets a new valuation price for a given validity period. Since the action can also trigger a new ValuationPrice, SetValuationPrice is assigned to the root node. A valuation price is created for the given validity period. If a valuation price already exists, it is overwritten. If there are valuation prices within the given validity period, their validity period is adjusted or, in case of complete overlaps, they are deleted. The action elements may be defined by the data type: MaterialValuationDataRootSetValuationPriceActionElements. These elements can include: PermanentEstablishmentID, PriceOriginatingBusinessTransactionDocumentReference, ValidityPeriod, PriceTypeCode, SetOfBooksID, LocalCurrencyValuationPrice, SetofBooksID, LocalCurrencyValuationPrice, SetofBooksCurrencyValuationPrice, HardCurrencyValuationPrice, IndexBasedCurrencyValuationPrice. The PermanentEstablishmentID is a GDT of the type OrganisationalCentreID and it is optional. The PriceOriginatingBusinessTransactionDocumentReference is a GDT of the type businessTransactionDocumentReference and it is optional. The ValidityPeriod is a GDT of the type Closed_DatePeriod, Qualifier: validity, constraint: only StartDate and EndDate). The PriceTypeCode is a GDT of the type PriceTypeCode, constraint: only material-based code values. SetOfBooksID is a GDT of the type SetOfBooks. The LocalCurrencyValuationPrice is a GDT of the type Price Qualifier: Valuation. The SetofBooksCurrencyValuationPrice is a GDT of the type Price Qualifier: Valuation and it is optional. The HardCurrencyValuationPrice is a GDT of the type PriceQualifier: Valuation and it is optional. The IndexBasedCurrencyValuationPrice is a GDT of the type Price Qualifier: Valuation and it is optional.

Queries

QueryByMaterial

Outputs a list of all MaterialValuationData that contains a supplement for a certain material. The query elements are defined by the data type: The elements may include: MaterialUUID, MaterialIdentificationProductID, MaterialDescriptionDescription, MaterialProductCategoryAssignmentProductCategoryInternalID, CompanyUUID, CompanyID. The MaterialUUID is a GDt of the type UUID and it is optional. The MaterialIdentificationProductID is a GDT of the type ProductID and contains the element at the identification node in the Material business objet that can be reached through the Material association and it is optional. MaterialDescriptionDescription is a GDT of a type Short_Description and contains the Description element at the Description node in the Material business object that can be reached through the Material association. This a language-dependent description of the product and it is optional. MaterialProductCategoryAssignmentProductCategoryInternalID is a GDT of the type ProductCategoryInternalID and contains the ProductCategoryAssignmentProductCategoryID element at the ProductCategoryAssignment node in the Material business object that can be reached through the Material association and it is optional. The Company UUID is a GDT of the type UUID and it is optional. The Company UUID is a GDT of the type UUID and it is optional.

AccountDeterminationSpecification

Group of control parameters for determination of the accounts in Accounting that reflect the consumption or inventory of the material, and for other types of material-based account determination (such as price differences, revaluations, Purchase in Transit, Unbilled Payables, or Work In Process).

The elements located at the node may be defined by the data type: MaterialValuationDataAccountDeterminationSpecificationElements. In detail, these are: PermanentEstablishmentUUID and AccountDeterminationMaterialValuationDateGroupCode. The PermanentEstablishmentUUID is a GDT of the type UUID and contains a universally unique identification of the permanent establishment to which MaterialValuationData the control parameters apply and it is optional. The AccountDeterminationMaterialValuationDataGroupCode is a GDT of the type AccountDeterminationGroupCodeMaterialValuationData and contains the coded representation of a group of material valuation data from the standpoint of identical determination of accounts in Accounting.

Queries

QueryByElements

The query provides a list of all Account Determination Specifications on the basis of the transferred selection options. The query elements are defined by the data type MaterialValuationDataMaterialValuationDataAccountDeterminationSpecificationElementsQueryElements.

These elements may include: PermanentEstablishment UUID and AccountDeterminationMaterialValuationDateGroup Code. The PermanentEstablishmentUUID is a GDT of a type UUID and it is optional. AccountDeterminationMaterialValuationDateGroupCode is a GDT of a type AccountDeterminationMaterialValuationDateGroupCode and it is optional.

There may be of a number of Inbound Aggregation Relationships:

From business object PermanentEstablishment: PermanentEstablishment may have a cardinality of (c:cn). PermanentEstablishment can be the permanent establishment to which the control parameters apply.

InventoryValuationSpecification

Control parameters for material inventory valuation.

The elements located at the node are defined by the data type: MaterialValuationDataInventoryValuationSpecificationElements. The element may include: PermanentEstablishmentUUID and PerpetualInventoryValuationProcedureCode. The PermanentEstablishmentUUID is a GDT of the type UUID and contains a universally unique identification of the permanent establishment at which the procedure is used and it is optional. The PerpetualInventoryValuationProcedureCode is a GDT of the type InventoryValuationProcedureCode and assigns an inventory valuation procedure to a MaterialValuationData for permanent valuation of the material inventory.

The maybe a number of Inbound Aggregation Relationships:

From business object PermanentEstablishment: PermanentEstablishment may have a cardinality of (c:cn). PermanentEstablishment can be the permanent establishment in which the procedure is used.

ValuationPrice.

The last valuation price entered that is valid for a given time period and set of books. The nature of a valuation price is determined by the price type (such as standard price or planned price). The price type influences the system behavior at various points.

The elements located directly at the ValuationPrice node-MaterialValuationData are defined by the data type MaterialValuationDataValuationPriceElements. These elements may include: PermanentEstablishmentUUID, OriginalEntry, OriginalEntryDocumentContainingObjectReference, OriginalEntrydocumentReference, OriginalEntryDocumentItemReference, ValidityDatePeriod, PriceTypeCode, SetofBooksID, InventoryPrice ChangeIndicator, LocaCurrencyValuationPrice, SetOfbooksCurrencyValuationPrice, HardCurrencyValuationPrice, IndexBasedCurrencyValuationPrice. The PermanentEstablishmentUUID is a GDT of the type UUID and contains a universally unique identification of the permanent establishment to which MaterialValuationData the valuation price applies and it is optional. The OriginalEntryDocumentContainingObjectReference is a GDT of the type ObjectNodeReference Qualifier: OriginalEntryDocumentContaining and is a reference to an Object containing the Original Entry Document. The OriginalEntryDocumentReference is a GDT of the type ObjectNode and contains a reference to the document, that keeps the original entry of the business transaction and it is optional. The OriginalEntryDocumentItemReference is a GDT of the type ObjectNodeReference and contains a reference to an item of the OriginalEntryDocument that led to the valuation price being created, changed, or deleted and it is optional. The ValidityDatePeriod is a GDT of the type CLOSED_Date Period, Qualifier: Validity, restriction StartDate and EndDate and contains the Validity period of the valuation price. The PriceTypeCode is a GDT of the type PriceTypeCode, constraint: only material-based code values and contains a coded representation of the price type of the valuation price. The SetOfBooksID is a GDT of the type SetOfBooksID and contains a unique Identifier of the set of books based on whose specifications the valuation price was created. The InventoryPriceChangedIndicator is an GDT of the type Indicator, Qualifier: Changed and it Indicates whether the valuation price changed the inventory price or not. The LocalCurrencyValuationPrice is a GDT of the type Price, Qualifier: Valuation and contains the valuation price in the local currency of the company keeping the books. The local currency is the national currency in which the local books are kept.

The unit of measure of the BaseQuantity element can be the same as the valuation unit. The SetOf BooksCurrencyValuationPrice is a GDT of a type Price Qualifier: Valuation and contains the valuation price in the currency chosen as the overall currency in a set of books and it is optional. The unit of measure of the BaseQuantity element can be the same as the valuation unit. The Hard CurrencyValuationPrice is a GDT of the type Price Qualifier: Valuation and contains a valuation price in the hard currency of the country of the company keeping the books and it is optional. The hard currency is a stable, country-specific currency that is used in high-inflation countries. The unit of measure of the BaseQuantity element can be the same as the valuation unit of the material. The IndexBasedCurrencyValuationPrice is a GDT of the type Price Qualifier: Valuation and contains a valuation price in the index-based currency of the country of the company keeping the books and it is optional. The index-based currency is a fictitious, country-specific currency that is used in high-inflation countries as a comparison currency for reporting. The unit of measure of the BaseQuantity element can be the same as the valuation unit of the material.

There may be a number of Inbound Aggregation Relationships including:

From business object PermanentEstablishment: PermanentEstablishment may have a cardinality relationship of (c:cn). PermanentEstablishment can be the permanent establishment to which the valuation price applies From business object SetOfBooks: SetOfBooks may have a cardinality relationship of (1:cn). SetofBooks can be the set of books based on whose specifications the valuation price was created.

From MDRO InventoryPriceChangeRun: InventoryPriceChangeRun may have a cardinality relationship of c:cn. InventoryPriceChangeRun can be the reference to the InventoryPriceChangeRun that contains the Original Entry Document.

From MDRO InventoryPriceChangeRun: InventoryPriceChangeRunLogSection may have a cardinality relationship of c:cn. LogSection can be the reference to a log section that serves as Original Entry Document for a business transaction in an InventoryPriceChangeRun From MDRO InventoryPriceChangeRun: LogSectionInventoryPriceChangeSuccessfullyProcessedItem InventoryPriceChangeRun-LogSectionInventoryPriceChangeSuccessfullyProcessedItem may have a cardinality of c:cn. LogSectionInventoryPriceChangeSuccessfullyProcessedItem can be the reference to a LogSectionInventoryPriceChangeSuccessfullyProcessedItem that serves as Original Entry Document for a business transaction in an InventoryPriceChangeRun Queries Outputs a list of all ValuationPrice nodes that are valid on a given date. The list may be restricted through the query elements PriceTypeCode, SetOfBooksID, CompanyID, MaterialID, and PermanentEstablishmentID. The query elements may be defined by the data type: MaterialValuationDataMaterialValuationData-ValuationPriceDateQueryElements. These elements may include: ValidAtDate, PriceTypeCode, SetofBooksID, materialValuationDataCompanyUUID, MaterialValuationDataCompanyUUID, MaterialValuationDataCompanyID, PermanentEstablishmentUUID, PermanentEstablishmentID, MaterialValuationDataMaterialUUID, MaterialValuationDataMaterialIdentificationProductID, MaterialValuationDataMaterialDescription, MaterialValuationDataMaterialProductCategoryAssignmentProductCategoryInternalID. The ValidAtDate is a GDT of the type Date and contains the date on which the valuation price is valid. The date is within the validity period (ValidityDatePeriod) of the valuation price. The PriceTypeCode is a GDT of the type PriceTypeCode and it is optional. The SetOfBooksID is a GDT of the type SetOfBooksID and it is optional. The MaterialValuationDataCompanyUUID is a GDT of the type UUID and it is optional. The MaterialValuationDataCompanyID is a GDT of the type OrganisationalCentreIID and it is optional. The PermanentEstablishment UUID is a GDT of the type UUID and it is optional. The PermanentEstablishmentID is a GDT of the type OrganisationalCentreIID and it is optional. The MaterialValuationDataMaterialUUID is a GDT of the type UUID and it is optional. The MaterialValuationDataMaterialIdentificationProductID is a GDT of the type ProductID and contains the ProductID element at the Identification node in the Material business object that can be reached through the Material association at the root node and it is optional. The MaterialValuationDataMaterialDescriptionDescription is a GDT of the type Short_Description and contains the Description element at the Description node in the Material business object that can be reached through the Material association at the root node. This is a language-dependent description of the product and it is optional. The MaterialValuationDataMaterialProductCategoryAssignmentProductCategoryInternalID The ProductCategoryID is a GDT of the type ProductCateogryInternalID and contains an element at the ProductCategoryAssignment node in the Material business object that can be reached through the Material association at the root node.

QueryByDateInterval

Outputs a list of all valuation prices that are valid at a date within the given interval of dates. The list may be restricted through the additional query elements. The query elements may be defined by the data type: MaterialValuationDataValuationPriceDateIntervalQueryElements. These elements may include: StartDate, EndDate, PriceTypeCode, SetOfBooksID, MaterialValuationDataCompanyUUID, MaterialValuationDataCompanyID, Permanent EstablishUUID, PermanentEstablishmentID, MaterialValuationDataMaterialUUID, MaterialValuationDataMaterialIdentificationProductID, MaterialValuationDataMaterialDescriptionDescription, The StartDate is a GDT of the type Date and contains a Lower limit of the interval of dates at which the valuation prices are valid (that is, the date is within the validity period [ValidityDatePeriod] of the valuation price). The EndDate is a GDT of the type Date and contains an Upper limit of the interval of dates at which the valuation prices are valid (that is, the date is within the validity period [ValidityDatePeriod] of the valuation price). If the element EndDate is not supplied all valuation prices which are valid at the date given by the element StartDate or at any date from there on are listed and it is optional. The PriceTypeCode is a GDT of the type PriceTypeCode and it is optional. The SetOfBooksID is a GDT of the type SetOfBooksID and it is optional. The MaterialValuationDataCompany UUID is a GDT of the type UUID and it is optional. The MaterialValuationDataCompanyID is a GDT of the type OrganisationalCentreIID and it is optional. The PermanentEstablishmentUUID is a GDT of the type UUID and it is optional. The PermanentEstablishmentID is a GDT of the type OrganisationalCentreIID and it is optional. The MaterialValuationDataMaterialUUID is a GDT of the type UUID and it is optional. The MaterialDataMaterialIdentificationProductID is a GDT of the type ProductID and contains the ProductID element at the Identification node in the Material business object that can be reached through the Material association at the root node and it is optional. The MaterialValuationDataMaterialIdentificationProductID is a GDT of the type SHORT_Description and contains The Description element at the Description node in the Material business object that can be reached through the Material association at the root node. This is a language-dependent description of the product. The MaterialValuationDataMaterialProductCategoryAssignmentProductCategoryInternalID is a DGT of the type ProductCategoryInternalID and contains the ProductCategoryID element at the ProductCategoryAssignment node in the Material business object that can be reached through the Material association at the root node.

HistoricalValuationPrice

An earlier state of a valuation price that is valid for a given time period and set of books.

The data is used for research purposes and to trace business transactions. The data can be deleted or archived at any time. In contrast to the change document, what is documented is not the change to an element (such as the price field) of the ValuationPrice node but the value of all elements at the time of the change.

The elements located directly at the HistoricalValuationPrice nodeMaterialValuationData may be defined by the data type MaterialValuationDataHistoricalValuationPriceElements. These elements may include: PermanentEstablishment UUID, OriginalEntryDocumentContainingObjectReference, OriginalEntryDocument Reference, OriginalEntryDocumentItemReference, SystemAdministrationData, ValidityDatePeriod, PriceTypeCode, SetOfBooksID, InventoryPriceChangedIndicators, ValuationPrice DeletedIndicators, LocalCurrencyValuationPrice, HardCurrencyValuationPrice, IndexBasedCurrencyValuationPrice. The PermanentEstablishmentUUID is a GDT of the type UUID and contains the u Universally unique identification of the permanent establishment to whichMaterialValuationData the valuation price applies and it is optional. The OriginalEntryDocumentContainingObjectReference is a GDT of the type ObjectNodeReference, Qualifier: OriginalEntryDocumentContaining and contains a reference to an Object containing the Original Entry Document and it is optional. The OriginalEntryDocumentReference is a GDT of the type ObjectNodeReference and contains a reference to the document, that keeps the original entry of the business transaction and it is optional. The OriginalEntryDocumentItemReference is a GDT of the type ObjectNodeReference and contains reference to an item of the OriginalEntryDocument that led to the valuation price being created, changed, or deleted and it is optional. The SystemAdministrativeData is a GDT of the type SystemAdministrativeData, constraint: only CreationUserAccountID and CreationDateTime and specifies when and by whom the valuation price was created, changed, or deleted. The ValidityDatePeriod is a GDT of a type CLOSED_DatePeriod, Qualifier: Validity, restriction: StartDate and EndDate and contain a validity period of the valuation price. The PriceTypeCode is a GDT of a type PriceTypeCode, constraint: only material-based code values) and contains a coded representation of the price type of the valuation price. The SetOfBooksID is a GDT of the type SetOfBooksID and contains a unique Identifier of the set of books based on whose specifications the valuation price was created. The InventoryPriceChangedIndicator is a GDT of the type Indicator, Qualifier: Changed and indicates whether the valuation price changed the inventory price or not. The ValuationPriceDeletedIndicator is a GDT of a type Indicator, Qualifier; Deleted and specifies whether the valuation price was deleted or not. The LocalCurrencyValuationPrice is a GDT of the type SetOfBooksCurrencyValuationPrice and contains a valuation price in the local currency of the company keeping the books. The local currency is the national currency in which the local books are kept.

The unit of measure of the BaseQuantity element may be the same as the valuation unit. The HardCurrencyValuationPricei is a GDT of Price, Qualifier: Valuation and contains a valuation price in the hard currency of the country of the company keeping the books. The hard currency is a stable, country-specific currency that is used in high-inflation countries. The unit of measure of the BaseQuantity element can be the same as the valuation of the material. The IndexBasedCurrencyValuationPrice is a GDT of a type Price, Qualifier: Valuation and contains a valuation price in the index-based currency of the country of the company keeping the books. The index-based currency is a fictitious, country-specific currency that is used in high-inflation countries as a comparison currency for reporting. The unit of measure of the BaseQuantity element can be the same as the valuation unit of the material.

There may be a number of Inbound Aggregation Relationships including:

From business object PermanentEstablishment: PermanentEstablishment may have a cardinality relationship of (c:cn). PermanentEstablishment can be the permanent establishment to which the valuation price applies.

From business object SetOfBooks: SetOfBooks may have a cardinality relationship of (1:cn). SetOfBooks can be the set of books based on whose specifications the historical valuation price was created.

From MDRO InventoryPriceChangeRun: InventoryPriceChangeRun may have a cardinality relationship of c:cn. InventoryPriceChangeRun can be the reference to the InventoryPriceChangeRun that contains the Original Entry Document.

From MDRO InventoryPriceChangeRun: InventoryPriceChangeRunLogSection may have a cardinality relationship of c:cn The InventoryPriceChangeRun can be the reference to a LogSection that serves as Original Entry Document for a business transaction in an InventoryPriceChangeRun From MDRO InventoryPriceChangeRun: LogSectionInventoryPriceChangeSuccessfullyProcessedItem InventoryPriceChangeRun LogSectionInventoryPriceChangeSuccessfullyProcessedItem May have a cardinality relationship of c:cn. InventoryPriceChangeFun can be the reference to a LogSectionInventoryPriceChangeSuccessfullyProcessedItem that serves as Original Entry Document for a business transaction in an InventoryPriceChangeRun There may be a number of Inbound Association Relationships including:

From business object Identity CreationIdentity: CreationIdentity may have a cardinality relationship of (1:cn). The CreationIdentity can be the system user Identity who created the Historical Valuation Price node.

Queries

Outputs a list of all ValuationPrice nodes that are valid on a given date or that were valid in the past. The list can be restricted through the query elements PriceTypeCode, SetOfBooksID, CompanyID, MaterialID, PermanentEstablishmentID, SystemAdministrativeData, and ValuationPriceDeletedIndicator.

The query elements may be defined by the data type: MaterialValuationDataMaterial-ValuationDataValuationPriceDateQueryElements. These elements may include: ValidAtDate, PriceTypeCode, SetOfBooksID, MaterialValuatinDataCompanyUUID, MaterialValuationDataCompanyID, PermanentEstablishmentUUID, PermanentEstablishmentID, MaterialValuationDataMaterialUUID, MaterialValuationDataMaterialIdentificationProductID, MaterialValuatinDataMaterialDescriptionDescription, MaterialValationDataMaterial-ProductCateogryAssignmentProductCategoryInternalID, System AdministrativeDate, ValuationPriceDeletedIndicator. TheValidDate is a GDT of the type Date and contains the Date on which the valuation price is valid. The date is within the validity period (ValidityDatePeriod) of the valuation price. The PriceTypeCode is a GDT of the type PriceTypeCode and it is optional. The SetOfBooksID is a GDT of the type SetOf BooksID and it is optional. The MaterialValuationDataCompanyUUID is a GDT of the type UUID and it is optional. The MaterialValuationDataCompanyID is a GDT of the type OrganisationalCentrelID and it is optional. The PermanentEstablishmentUUID is a GDT of the type UUID and it is optional. The Permanent EstablishmentID is a GDT of the type OrganisationalCentrelID and it is Optional. The MaterialValuationDataMaterialUUID is a GDT of the type UUID and it is optional. The MaterialValuationDataMaterialIdentification on ProductID is a GDT of the type ProductID and contains the ProductID element at the Identification node in the Material business object that can be reached through the Material association at the root node and it is optional. The MaterialValuationDataMaterialDescriptionDescription is a GDT of the type SHORT_Description and contains the description element at the Description node in the Material business object that can be reached through the Material association at the root node. This is a language-dependent description of the product and it is optional. The MaterialValuationDataMaterialProduct-CategoryAssignmentProductCategoryInternalID is a GDT of the type ProductCategoryInternal and contains the ProductCategoryID element at the ProductCategoryAssignment node in the Material business object that can be reached through the Material association at the root node and it is optional. The SystemAdministrativeData is a GDT of the type SystemAdministrativeData, restriction: CreationUserAccountID and CreationDateTime and it is optional. The ValuationPriceDeletedIndicator is a GDT of the type Indicator, Qualifier: Deleted and it is optional.

QueryByDateInterval

Outputs a list of all historical valuation prices that have been valid at a date within the given interval of dates. The list may be restricted through the additional query elements.

The query elements may be defined by the data type: MaterialValuationDataHistorical-ValuationPriceDateIntervalQueryElements. These elements may include: StartDate, EndDate, PricetypeCode, SetOfBooksID, MaterialValuatinDataCompanyUUID, MaterialValuationDataCompanyID, PermanentEstablishmentUUID, PermanentEstablishmentID, MaterialValuationDataMaterialUUID, MaterialValuationDataMaterialIdentificationProductID, MaterialValuationDataMaterialDescriptionDescription, MaterialValuationDataMaterialProductCategoryAssignmentProductCategoryInternalID, SystemAdministrativeDataValuationPriceDeletedIndicator. The StartDate is a GDT of a type Date and contains the lower limit of the interval of dates at which the historical valuation prices have been valid (that is, the date is within the validity period [ValidityDatePeriod] of the historical valuation price). The EndDate is a GDT of the type Date and contains the upper limit of the interval of dates at which the historical valuation prices have been valid (that is, the date is within the validity period [ValidityDatePeriod] of the historical valuation price) and it is optional. If the element EndDate is not supplied all historical valuation prices which are valid at the date given by the element StartDate or at any date from there on are listed. The PricetypeCode is a GDT of a type PriceTypeCode and it is optional. The SetOfBooksID is a GDT of the type SetOfBooksID and it is optional. MaterialValuationDataCompanyUUID is a GDT of a type UUID and it is optional. The MaterialValuationDataCompanyID is a GDT of the type OrganisationalCentreID and it is optional. The PermanentEstablishmentUUID is a GDT of the type UUID and it is optional The PermanentEstablishmentID is a GDT of the type OrganisationalCentreID and it is optional. The MaterialValuationDataMaterialUUID is a GDT of the type UUID and it is optional. The MaterialValuationDataMaterialIdentificationProductID is a GDT of the type ProductID and contains the ProductID element at the Identification node in the Material business object that can be reached through the Material association at the root node. The MaterialValuationDataMaterialDescriptionDescription is a GDT of the type SHORT_Description and contains the description element at the Description node in the Material business object that can be reached through the Material association at the root node. This is a language-dependent description of the product and it is optional. The MaterialValuationDataMaterialProductCategoryAssignmentProductCategoryInternalID is a GDT of the type ProductCategoryInternalID and contains the ProductCategoryID element at the ProductCategoryAssignment node in the Material business object that can be reached through the Material association at the root node and it is optional. The SystemAdministrativeData is a GDT of a type SystemAdministrativeData, restriction: CreationIdentityUUID and CreationDateTime and it is optional. The ValuationPriceDeletedIndicator is a GDT of a type Indicator, Qualifier: Deleted and it is optional.

DO: AccessControlList

The AccessControlList is a list of access groups that have access to an MaterialValuationData.

FIG. 94-1 through 94-11 illustrates one example logical configuration of MaterialFinancialProcessUsability message 94198. Specifically, this figure depicts the arrangement and hierarchy of various components such as one or more levels of packages, entities, and datatypes, shown here as 94198 through 94216. As described above, packages may be used to represent hierarchy levels. Entities are discrete business elements that are used during a business transaction. Data types are used to type object entities and interfaces with a structure. For example, MaterialFinancialProcessUsability message 94198 includes, among other things, MaterialValuation- DataTransmitRequest 94028. Accordingly, heterogeneous applications may communicate using this consistent message configured as such.

Message Types and their Signatures

This section describes the message types and their signatures that are derived from the operations of the business object MaterialValuationData. In a signature, the business object is contained as a "leading" business object.

The message data type determines the structure of the following message types.

Motivating Business Scenarios: Material Valuation Data of a company are transmitted from a legacy system to a new ERP system.

Message Type(s)

Material ValuationDataTransmit Request

This message is a request to transmit Material Valuation Data from one Material of one company. The structure of this message type is determined by the message data type MaterialValuationDataTransmitRequestMessage. This message type is used in the following operations of business objects: MaterialValuationData and TransmitMaterialValuationData MaterialValuationDataTransmitRequestMessage This message data type contains the object MaterialValuationData which is contained in the business document. The business information that is relevant for sending a business document in a message. It may contain the packages: MessageHeader package, MaterialValuationDataTransmitRequest package. This message data type, therefore, provides the structure for the following message types and the operations that are based on them: MaterialValuationDataTransmitRequest and MessageHeader Package. A grouping of business information that is relevant for sending a business document in a message. It contains the node: MessageHeader.

MessageHeader

A grouping of business information from the perspective of the sending application: Information to identify the business document in a message, Information about the sender, and Information about the recipient.

The MessageHeader contains: SenderParty and RecipientParty. It is of the type GDT: BusinessDocumentMessageHeader, and the following elements of the GDT may be used: ID, ReferenceID.

SenderParty is the partner responsible for sending a business document at business application level. The SenderParty is of the type GDT: BusinessDocumentMessageHeaderParty.

RecipientParty is the partner responsible for receiving a business document at business application level.

The RecipientParty is of the type GDT: BusinessDocumentMessageHeaderParty.

MaterialValuationDataTransmitRequest Package is the grouping of MaterialValuationDataTransmitRequest with its packages: ValuationPrice. AccountDeterminationSpecification, InventoryValuationSpecification and MaterialValuationDataTransmitRequest MaterialValuationDataTransmitRequest may contain the elements:

MaterialValuationDataCompanyID may have a cardinality relationship of 1 and is of type GDT: OrganisationalCentreID. MaterialValuationDataMaterialInternalID may have a cardinality relationship of 1 and is of type GDT: ProductInternalID. ValuationPriceDefaultBaseQuantity may have a cardinality relationship of 0..1 and is of type GDT: Quantity. ValuationPriceDefaultBaseQuantityTypeCode may have a cardinality relationship of 0..1 and is of type GDT: QuantityTypeCode.

ValuationPriceDefaultBaseQuantity and ValuationPriceDefaultBaseQuantityTypeCode is used as a default value and can be omitted, if the receiver of the message uses his own defaults here.

MaterialValuationDataTransmitRequestValuationPrice Package

ValuationPrice is the last valuation price entered that is valid for a given time period and set of books.

MaterialValuationDataTransmitRequestValuationPrice may contain the elements:

MaterialValuationDataPermanentEstablishmentID may have a cardinality relationship of 1 and is of type GDT: OrganisationalCentreID. ValidityDatePeriod may have a cardinality relationship of 1 and is of type GDT: CLOSED_DatePeriod. PriceTypeCode may have a cardinality relationship of 1 and is of type GDT: PriceTypeCode. SetOfBooksID may have a cardinality relationship of 1 and is of type GDT: SetOfBooksID. LocalCurrencyValuationPrice may have a cardinality relationship of 0..1 and is of type GDT: Price. SetOfBooksCurrencyValuationPrice may have a cardinality relationship of 0..1 and is of type GDT: Price. HardCurrencyValuationPrice may have a cardinality relationship of 0..1 and is of type GDT: Price. IndexBasedCurrencyValuationPrice may have a cardinality relationship of 0..1 and is of type GDT: Price.

ValuationPrice: for every combination of PermanentEstablishment, PriceTypeCode, SetOfBooksID the ValuationPrices may not have overlapping ValidityDatePeriods. No overlapping ValidityDatePeriod means: There do not exist two prices, where the start date of the first is earlier than the valid to of the second and the end date of the first is later then the valid from date of the second.

LocalCurrencyValuationPrice: if the Status of the corresponding FinancialsProcessUsability node in MaterialFinancialsProcessControl is Active, then the LocalCurrencyValuationPrice has to be filled.

SetOfBooksCurrencyValuationPrice: If the Price in Set Of Books Currency differs from the currency-converted (according to the standard exchange rate) LocalCurrencyValuationPrice then it has to be filled.

HardCurrencyValuationPrice: If the Price in Hard Currency differs from the currency-converted (according to the standard exchange rate) LocalCurrencyValuationPrice then it has to be filled.

IndexBasedCurrencyValuationPrice: If the Price in Index Based Currency differs from the currency-converted (according to the standard exchange rate) LocalCurrencyValuationPrice then it has to be filled.

MaterialValuationDataTransmitRequestAccountDeterminationSpecification Package

AccountDeterminationSpecification: Group of control parameters for determination of the accounts in Accounting that reflect the consumption or inventory of the material, and for other types of material-based account determination (such as price differences, revaluations, Purchase in Transit, Unbilled Payables, or Work In Process.

MaterialValuationDataTransmitRequestAccountDeterminationSpecification my contain the elements:

MaterialValuationDataPermanentEstablishmentID may have a cardinality relationship of 1 and is of type GDT: OrganisationalCentreID. AccountDeterminationMaterialValuationDataGroupCode may have a cardinality relationship of 0..1 and is of type GDT: CLOSED_DatePeriod.

AccountDeterminationMaterialValuationDataGroupCode: if the Status of the corresponding FinancialsProcessUsability node in MaterialFinancialsProcessControl is Active, then the AccountDeterminationMaterialValuationDataGroupCode has to be filled.

MaterialValuationDataTransmitRequestInventoryValuationSpecification Package

InventoryValuationSpecification: Control parameters for material inventory valuation.

MaterialValuationDataTransmitRequestAccountDeterminationSpecification may contain the elements:

MaterialValuationDataPermanentEstablishmentID may have a cardinality relationship of 1 and is of type GDT: OrganisationalCentreID. PerpetualInventoryValuationProcedureCode may have a cardinality relationship of 0..1 and is of type GDT: InventoryValuationProcedureCode.

PerpetualInventoryValuationProcedureCode: if the Status of the corresponding FinancialsProcessUsability node in MaterialFinancialsProcessControl is Active, then the PerpetualInventoryValuationProcedureCode has to be filled.

List of Data Types Used (GDTs)

BusinessDocumentMessageHeader, OrganisationalCentreID, ProductInternalID, Quantity, QuantityTypeCode, CLOSED_DatePeriod, PriceTypeCode, SetOfBooksID, Price, AccountDeterminationMaterialValuationDataGroupCode, InventoryValuationProcedureCode.

Business Object OtherDirectCostLedgerAccount

Figures 1, 95:
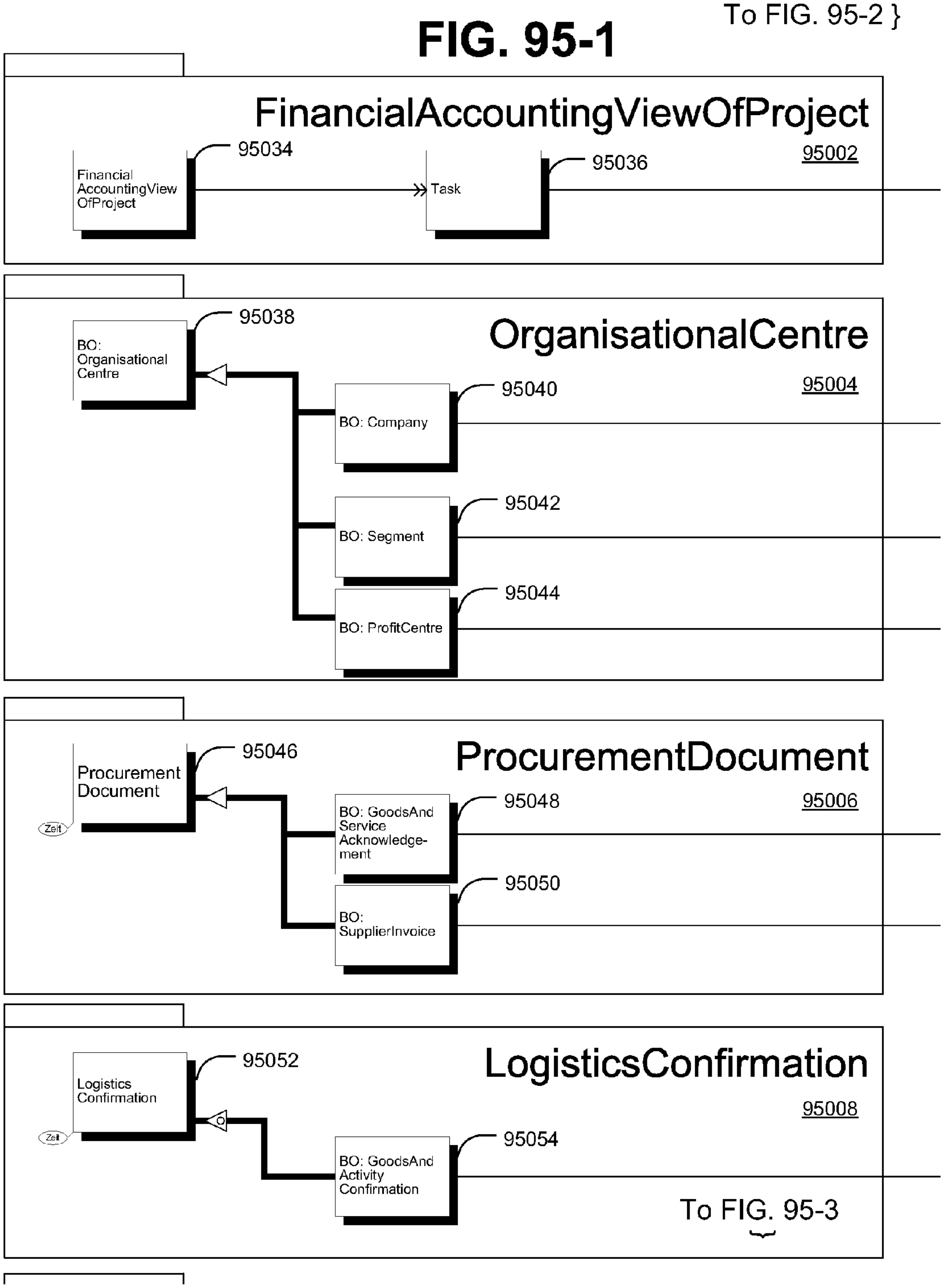
Figures 2, 95:
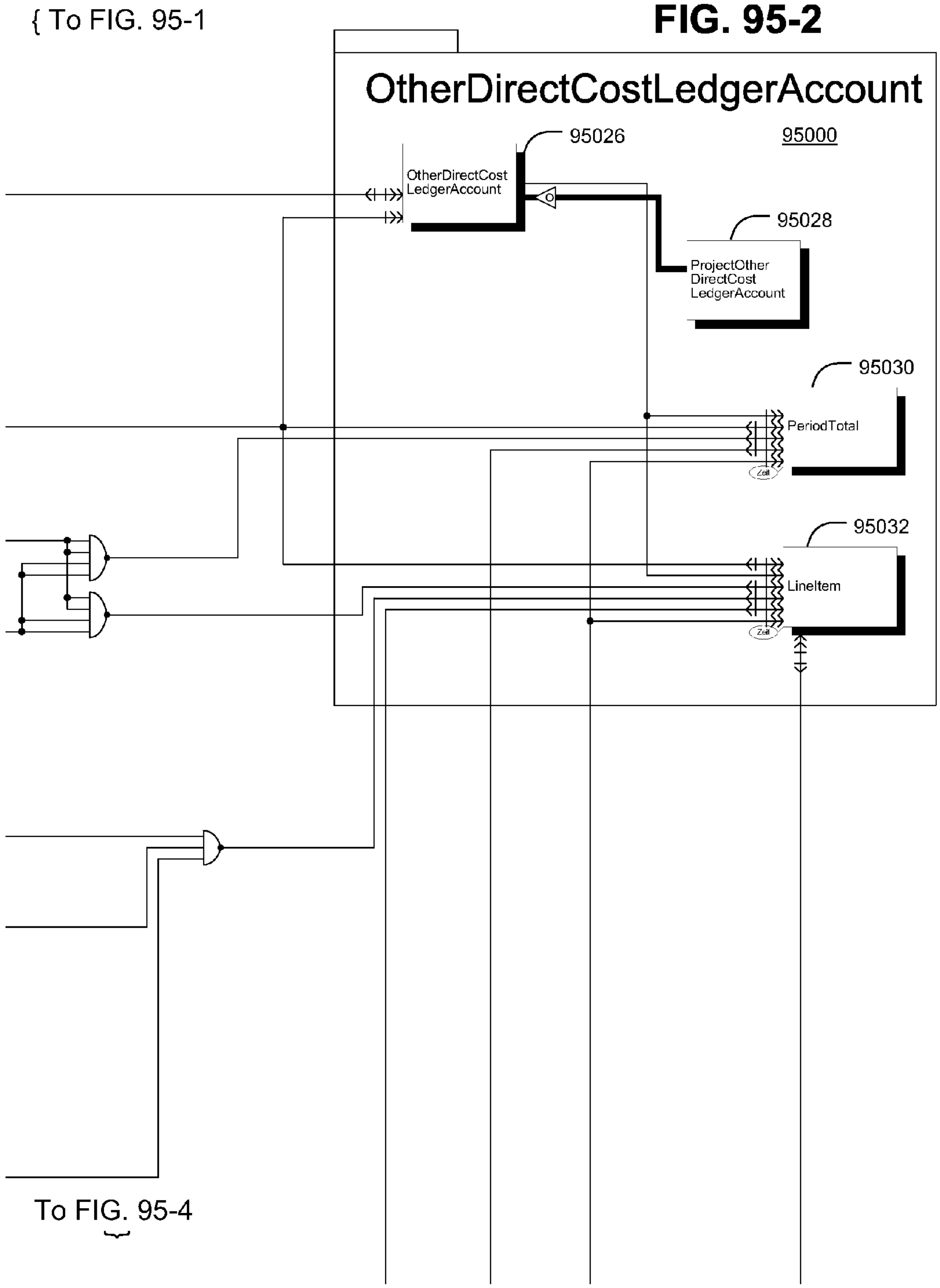
Figures 3, 95:
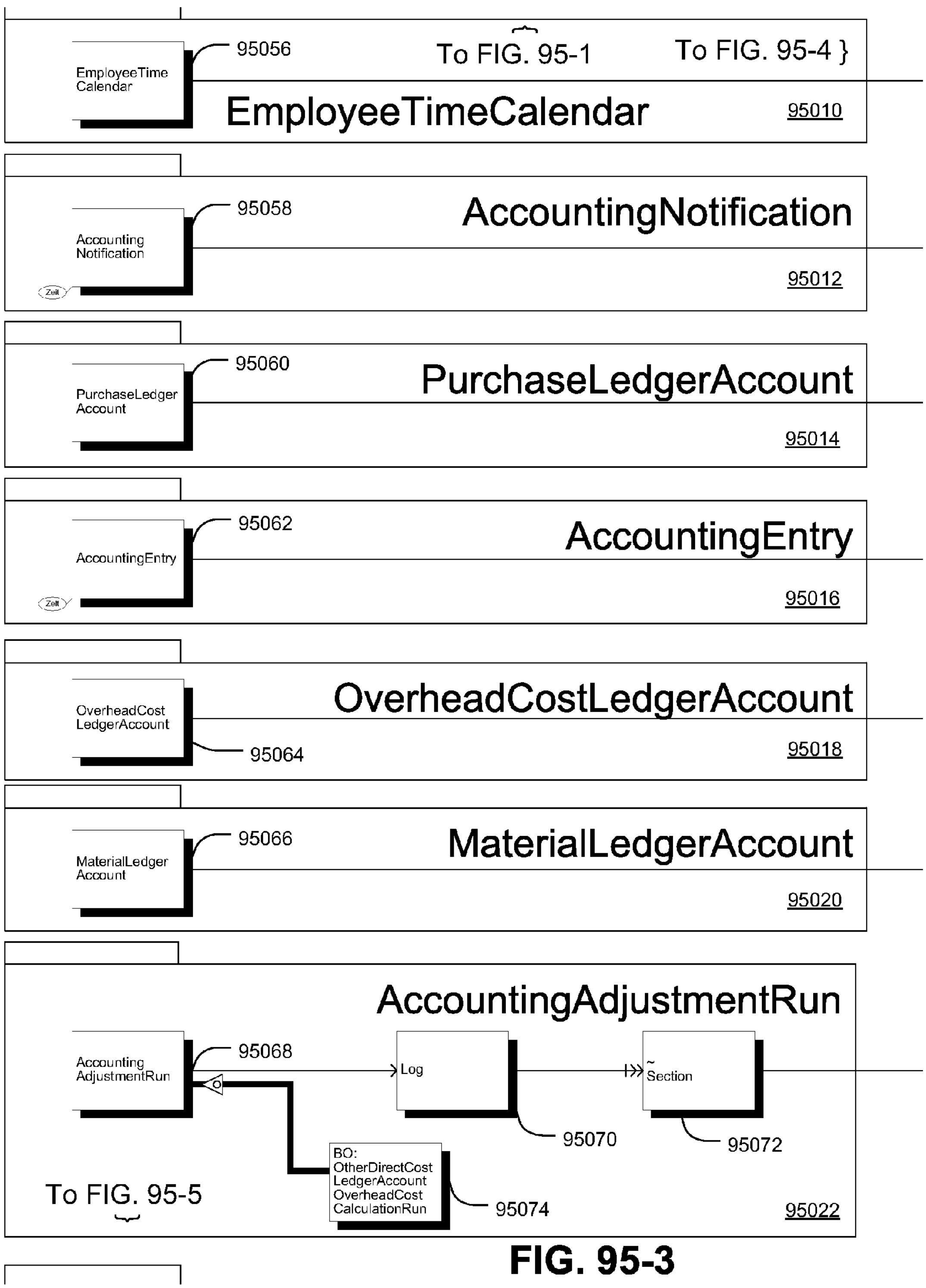
Figures 4, 95:
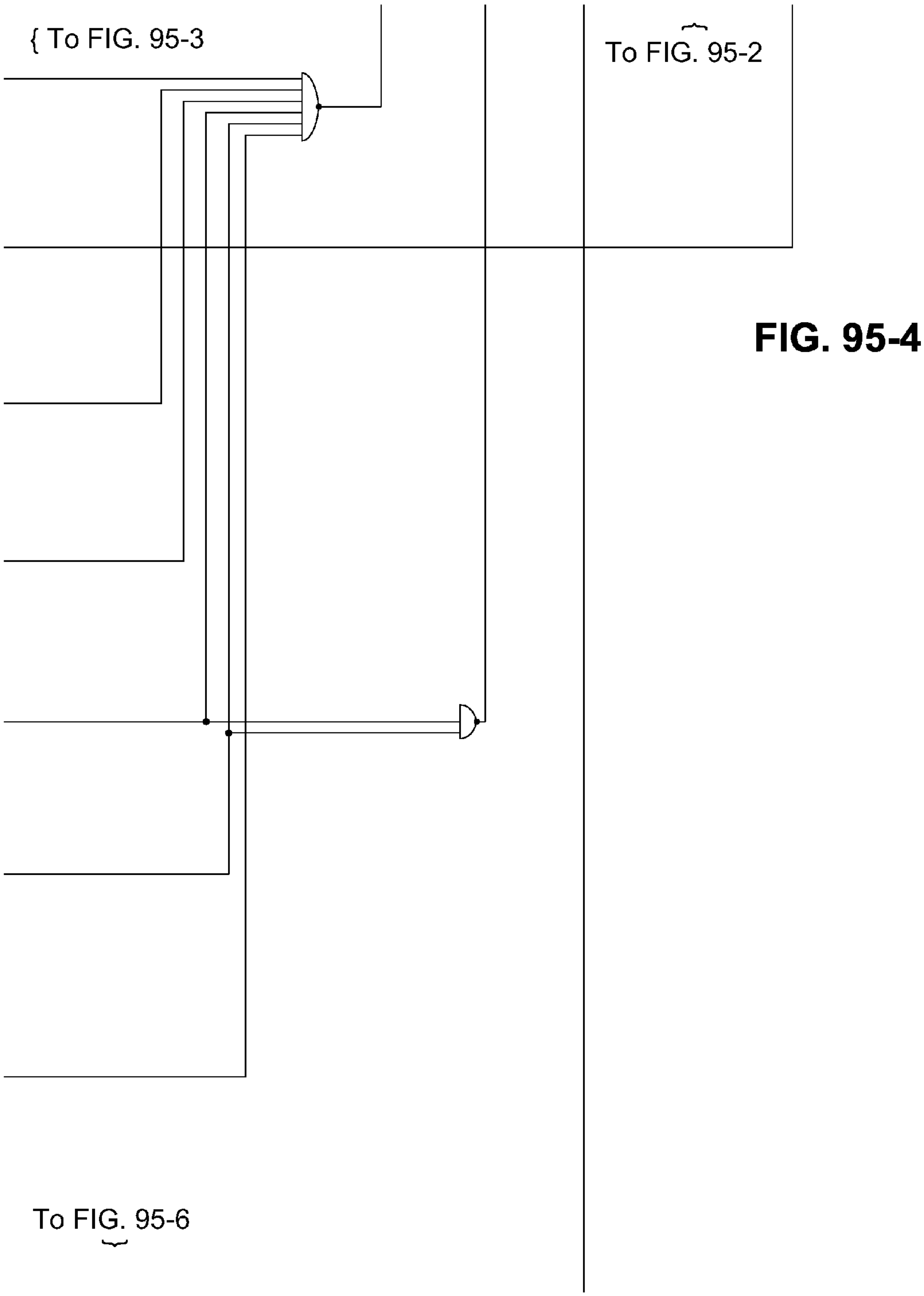
Figures 5, 95:
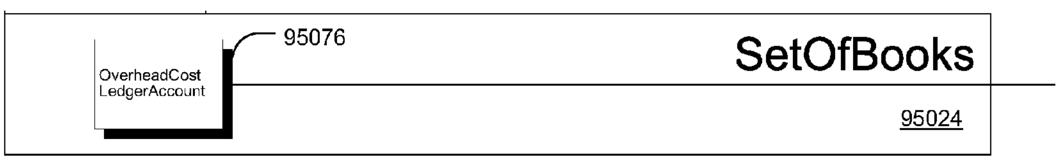

FIG. 95 illustrates one example of an OtherDirectCostLedgerAccountbusiness object model 95000. Specifically, this figure depicts interactions among various hierarchical components of the OtherDirectCostLedgerAccount, as well as external components that interact with the OtherDirectCostLedgerAccount (shown here as 95002 through 95024 and 95034 through 95076). Record for a company based on the principle of double-entry bookkeeping that shows the effects of business transactions on other direct costs. In addition to individual account movements related to business transactions, it contains period-based totals that summarize the movement. Other direct costs are direct costs that are incurred through the activities of normal business operations and for which no record is made in the production, sales, or purchasing ledgers. Such costs can be traced directly to the activity that caused them.

Process Component

The business object OtherDirectCostLedgerAccount is part of the process component Accounting Processing in the DU Financial Accounting. This ledger account serves as a structuring element for collecting and evaluating postings in the Other Direct Costs Ledger. For example, it can document expenses for research and development, trade fairs, or advertising events that can be assigned directly to projects or market segments. The business object OtherDirectCostLedgerAccount contains an itemization for each business transaction on the quantities and expenses relevant to valuation that can be traced directly to the activities that caused them. A period-based record for each set of books on the quantities and expenses that can be traced directly to the activities that caused them. OtherDirectCostLedgerAccount is represented by the node OtherDirectCostLedgerAccount. When a business transaction causing a quantity/value change to the OtherDirectCostLedgerAccount is posted, a set of rules determines which GeneralLedgerAccounts are involved. Posting the business transaction changes the quantity and/or value on the GeneralLedgerAccounts selected in this way by the same amount. Creation of the BO OtherDirectCostLedgerAccount and any changes to it are always triggered by the BO AccountingNotification.

Node Structure of Business Object OtherDirectCostLedgerAccount

OtherDirectCostLedgerAccount 95026 is record for a company based on the principle of double-entry bookkeeping that shows the effects of business transactions on other direct costs.

The business object OtherDirectCostLedgerAccount occurs in the following incomplete and disjoint specializations: ProjectOtherDirectCostLedgerAccount 95028. The cost object of the direct costs is a project or a project task.

Subsequently the term “offsetting” is used frequently. In particular, an OffsettingSubledgerAccount is a SubledgerAccount that contains—with reference to the same Accounting Document—the inverse representation of the business transaction stated in an SubledgerAccountLineItem. The inverse representation is required by the double entry bookkeeping principle. The compliance with this principle leads to a zero balance of the AccountingDocument that completely represents the Business transaction.

An example for offsetting is: an InventoryChangeItem of a ProductionLotConfirmation has to be represented as a debit LineItem of a ProductionLedgerAccount and as an inverse credit LineItem of a MaterialLedgerAccount.

Subsequently also a generic approach for referencing Original Entry Documents is used, where an Original Entry Document is a document that is necessary for auditing purposes and verifies that the value stated in the LineItem of a ledger account has been booked on the base of a real business transaction.

An Original Entry Document may be contained in another Object, the Original Entry DocumentContainingObject. Typical such constellations are:

FinancialAuditTrailDocumentation contained in a Host object like DuePayment, DueClearing, Dunning, and PaymentAllocation from Operative Financials;

LogSection contained in all AccountingAdjustmentRunMDROs (e.g. InventoryPriceChangeRun, GeneralLedgerAccountBalanceDistributionRun, FixedAssetDepreciationRun, WorkInProcessClearingRun); SettlementResultAccounting contained in an ExpenseReport; and PeriodItem contained in an EmployeeTimeCalendar.

The elements located directly at the node OtherDirectCostLedgerAccount are defined by the type GDT: OtherDirectCostLedgerAccountElements. These elements may include: UUID, CompanyUUID, FinancialAccountingViewOfProjectTaskUUID, ProjectTaskUUID, CostManagementfunctionalUnitUUID, The UUID is a GDT of a type UUID and contains universally unique identification of the OtherDirectcostLedgerAccount. The CompanyUUID is a GDT of a type UUID and contains a universally unique identification of the Company for which the OtherDirectCostLedgerAccount is carried. The FinancialAccountingViewofProjectTaskUUID is a GDT of a type UUID and contains a universally unique identification of the Financial Account View of Project Task for which quantities and values are recorded in the OtherDirectCostLedgerAccount and it is optional. The CostManagementFunctionalUnitUUID is a GDT of a type UUID and contains a universally unique identification of a Functional Unit that is responsible for processing the Other Direct Cost Ledger Account and it is optional.

Integrity condition: The referenced Functional Unit can be responsible for the Organisational Function ‘Cost Management’, i.e. the OrganisationalFunctionCode on one of the FunctionalUnitAttributes nodes of the FunctionalUnit may have the value ‘24’ (CostManagement).

The following composition relationships to subordinate nodes exist:

Line Item 95032 may have a cardinality relationship of 1:cn.

PeriodTotal 95030 may have a cardinality relationship of 1:cn.

AccessControlList (not shown) may have a cardinality relationship of 1:1.

There may be a number of Inbound Aggregation Relationships including:

From business object Company: Company may have a cardinality relationship of 1:cn.

Denotes the Company for which the account is carried.

From business object FinancialAccountingViewOfProject: FinancialAccountingViewOfProjectTask may have a cardinality relationship of c:cn.

Denotes the project task for which the account is carried.

There may be a number of Inbound Association Relationships including:

From business object FunctionalUnit: CostManagementFunctionalUnit may have a cardinality relationship of c:cn.

The Functional Unit that is responsible for processing the Other Direct Cost Ledger Account.

Enterprise Service Infrastructure Actions

CalculateOverheadCosts: The action CalculateOverheadCosts calculates overhead costs on projects.

Preconditions:

The action can be executed for the specialization ProjectOtherDirectCostLedgerAccount.

Overhead costs can be calculated if an overhead cost scheme is stored on the node Task of BO AccountingViewOnProject that is referenced by the ProjectOtherDirectCostLedgerAccount.

The action can be executed at any time.

Resulting changes in the object: The action generates line items and adjusts the period totals accordingly. The affected nodes are LineItem and PeriodTotal.

Resulting changes in other objects: The action generates AccountingDocuments. Furthermore, a line item is generated in the business object belonging to the credit object (such as OverheadCostLedgerAccount), and any existing period total or period balance record is adjusted or a new one created.

Changes to the status: does not apply

Parameters: The action elements are defined by the data type: OtherDirectCostLedgerAccountCalculateOverheadCostsActionElements. These elements may include: MassDataRunObjectID, MassDataRunObjectTypeCode, CompanyUUID, SetOfBooksID, The MassDataRunObject ID is a GDT of a type MassDataRunObjectID and contains a universally unique identifier for an Account Adjustment Run. The Mass DataRunObjectTypeCode is a GDT of a type MassDataRunObjectTypeCode and contains a coded representation of a type of the Mass Data Run Object. The CompanyUUID is a GDT of the type UUID and contains a universally unique identifier for the company for which the action is executed and it is optional. CompanyUUID is transferred when processing of the Accounting Adjustment Run is executed per company and set of books. The SetOfbooksID is a GDT of a type SetOfBooksID and contains a parameter denoting the set of books in which overhead calculations are executed.

Queries

QueryByProjectTask:

Provides a list of OtherDirectCostLedgerAccounts where the record refers to project task specified by the parameter ProjectTaskID. Query elements are defined by the data type: OtherDirectCostLedgerAccountProjectTaskQueryElements. These elements may include: FinancialAccountingViewofProjectTaskUUID, FinancialAccountingViewOfProjectTaskReferenceUUID, FinancialAccountingViewOfProjectTaskReferenceFormattedID. The FinancialAccountingViewOfProjectTaskUUID is a GDT of a type UUID and it is optional. The FinancialAccountingViewOfProjectTaskReferenceUUID is a GDT of a type UUID and contains a universally unique identification of the project task which the OtherDirectCostLedgerAccount refers to and it is optional. The FinancialAccountingViewOfProjectTaskReferenceFormattedID is a GDT of a type ObjectNodeFormattedID and contains the identification of the project task which the OtherDirectCostLedgerAccount refers to and it is optional. Exactly one of the above parameters can be used.

QueryByProjectTaskCostCentre:

Provides a list of the OtherDirectCostLedgerAccounts of type ProjectOtherDirectCostLedgerAccount where the record refers to a project task whose responsible cost center is the cost center specified by the parameter ResponsibleCostCentreID, or where the record refers to a project task whose requesting cost center is the cost center specified by the parameter RequestingCostCentreID.

The query elements may be defined by the data type:

OtherDirectCostLedgerAccountProjectTaskCostCentreQueryElements. These elements may include:

FinancialAccountViewOfProjectTaskResponsibleCostCentreUUID, FinancialAccountingViewOfProjectTaskResponsibleCostCenterID, FinancialAccountingViewOfProjectTaskRequestingCostCentreUUID, FinancialAccountViewOfProjectRequestingCostCentreID. The FinancialAccountViewOfProjectTaskResponsibleCostCentreUUID is a GDT of a type UUID and contains a globally unique identification of the cost centre which is assigned to the project task, which the OtherDirectCostLedgerAccount refers to, as responsible cost centre and it is optional. The financialAccountingViewOfProjectTaskResponsibleCostCentreID is a GDT of a type OrganisationalCentreID and contains the identification of the cost centre which is assigned to the project task, which the OtherDirectCostLedgerAccount refers to as responsible cost centre. The FinancialAccountViewOfProjectTaskRequestingCostCentreUUID is a GDT of a type UUID and contains a globally unique identification of the cost centre which is assigned to the project task which the OtherDirectCostLedgerAccount refers to a requesting cost centre and it is optional. The FinancialAccountingViewOfProjectTaskRequestingCostCentreID is a GDT of a type OrganisationalCentreID and contains the identification of the cost centre which is assigned to the project task which the OtherDirectCostLedgerAccount refers to as requesting cost centre and it is optional. Exactly one of the above parameters can be supplied.

QueryByElements:

Provides a list of OtherDirectCostLedgerAccounts where the elements are specified by the query elements.

Query elements are defined by the data type: OtherDirectCostLedgerAccountElementsQueryElements. These elements may include: FinancialAccountingViewOfProjectTaskUUID, FinancialAccountingViewOfProjectTaskReferenceUUID, FinancialAccountingViewOfProjectTaskReferenceFormattedID, CompanyUUID, CompanyID, CostManagementFunctionalUnitUUID, CostManagementFunctionalUnitID. The FinancialAccountingView of ProjectUUID is a GDT of a type UUID and it is optional. The FinancialAccountingViewOfProjectTaskReferenceUUID is a GDT of a type UUID and contains a universally unique identification of the project task which the OtherDirectCostLedgerAccount refers to and it is optional. FinancialAccountingViewOfProjectTaskReferenceFormattedID is a GDT of a type UUID and contains the identification of the project task which the OtherDirectCostLedgerAccount refers to and it is optional. Exactly one of the above parameters can be applied. The CompanyUUID is a GDT of a type UUID and it is optional. The CompanyID is a GDT of a type OrganisationalCentreID and contains the identification of the company which the OtherDirectCostLedgerAccount refers to and it is optional. A maximum of one of the above two parameters may be supplied. CostManagementFunctionalUnitUUID is a GDT of a type UUID and it is optional. The CostManagementfunctionalUnitID is a GDT of a type OrganisationalCentreID and contains the identification of a Functional Unit that is responsible for processing the OtherDirectCostLedgerAccount and it is optional. A maximum of one of the above two parameters may be supplied.

LineItem

Statement in an OtherDirectCostLedgerAccount on the change in the direct costs caused by a single business transaction. A LineItem contains detailed information from the accounting-based representation of the business transaction, such as the posting date and a Original Entry reference.

The elements located directly at the LineItem node are defined by the type GDT: OtherDirectCostLedgerAccountLineItemElements. These elements may include: UUID, SetOfBooksID, SegmentUUID, ProfitCentreUUID, PartnerCompanyUUID, PartnerSegmentUUID, PartnerPartnerCentreUUID, AccountingDocumentUUID, AccountingDocumentID, AccountingDocumentItem, OriginalEntryDocumentContainingObjectReference, OriginalEntryTransactionUUID, OriginalEntryDocumentReference, OriginalEntryDocumentItemReference, OriginalEntryDocumentItemTypeCode, OriginalEntryDocumentPartnerID, AccountingNotificationUUID, AccountingNotificationItemGroupItemUUID, GeneralLedgerAccountLineItemUUID, GeneralLedgerAccountLineItemAccountingDocumentItemGroupID, OffsettingSubledgerAccountUUID, OffsettingSubledgerAccountUUID, OffsettingSubledgerAccountTypeCode, SystemAdministrativeData, ChartOfAccountsCode, ChartOfAccountsItemCode, AccountingBusinessTransactionTypeCode, TypeCode, CostRevenueElementCode, AccountingDocumentTypeCode, AccountingDocumentNote, AccountingDocumentItemNote, ProductTaxTypeCode, ProductTaxDueCategoryCode, ProductTaxEventTypeCode, ProductTaxRateTypeCode, ProductTaxCountryCode, WithholdingTaxTypeCode, WithholdingTaxEventTypeCode, WithholdingTaxEventTypeCode, WithholdingTaxEventTypeCode, PostingDate, OriginalEntryDocumentDate, AccountingBusinessTransactionDate, CurrencyConversionDate, FiscalYearVariantCode, FiscalYearID, AccountingPeriodID, AccountingClosingStepCode, AccountingDocumentItemAccountingGroupID.

The UUID is a GDT of a type UUID and contains a universally unique identification of the LineItem. The SetOfBooksID is a GDT of a type SetOfBooksID and contains a unique identification of the SetOfBooks according to whose specifications the LineItem was created. The Segment UUID is a GDT of a type UUID and contains a universally unique identification of the Segment to which the value and quantity of the LineItem is allocated and it is optional. The ProfitCentreUUID is a GDT of a type UUID and contains a universally unique identification of the ProfitCentre to which the value and quantity of the LineItem are allocated and it is optional. The PartnershipCompanyUUID is a GDt of a type UUID and contains a universally unique identification of a Company that acts in the business transaction stated in the LineItem as an intra corporate partner and it is optional. The PartnerSegmentUUID is a GDt of a type UUID and contains a universally unique identification of a Segment that acts in the business transaction stated in the LineItem as an intra corporate partner and it is optional. The PartnerProfitCentreUUID is a GDT of a type UUID and contains a universally unique identification of a ProfitCentre that acts in the business transaction stated in the LineItem as an intra corporate partner and it is optional. The AccountingDocumentUUID is a GDT of a type UUID. The AccountingDocumentID is a GDT of a type BusinessTransactionDocumentID. The AccountingDocumentItemID is a GDT of a typeBusinessTransactionDocumentItemID and contains a unique identification of the correspondingAccountingDocumentItem in the AccountingDocument which records the value change according to the criteria of GeneralLedger. OriginalEntryDocumentContainingObjectReference is a GDT of a type ObjectNodeReference, Qualifier: OriginalEntryDocumentContaining and contains a reference to an Object containing the OriginalEntryDocumentContaining. The OriginalEntryTransactionalUUID is a GDT of a type UUID and contains a universally unique identifier of the transaction during which the Original Entry Document was created or changed. The OriginalEntryDocumentReference is a GDT of a type ObjectNodeReference and contains a reference to the document, that keeps the original entry of the business transaction. The OriginalentryDocumentItemReference is a GDT of a type ObjectNodeReference and contains a reference to an item of the OriginalEntryDocument. The value change recorded in the [SubledgerAccount]Item can be verified by that item of the OriginalEntryDocument. The OriginalEntryDocumentItemTypeCode is a GDT of a type BusinessTransactionDocumentItemTypeCode and contains a. Coded representation of the Item Type of the referred OriginalEntryDocumentItem and it is optional. The element can be used if the Originalentry Document is a BusinessTransaction Document. The OriginalEntryDocumentPartnerID is a GDT of a type BusinessTransactionDocumentID and contains the identification of the Original Entry Document as assigned by the business partner. (For example, the ID of the Supplier Invoice assigned by the Supplier and it is optional. This element may be used only, if the Original Entry Document is a Business Transaction Document and if the Original Entry Document is identical to the Original Entry Document Containing Object. AccountingNotificationUUID is a GDT of a type UUID and contains a universally unique identification of the notification sent to Financial Accounting about the business transaction stated in the LineItem and it is optional. AccountingNotificationItemGroupItemUUID is a GDt of a type UUID and contains a universally unique identification of the Accounting Notification Item Group Item, which triggered the posting of this [SubledgerAccount]Item and it is optional. GeneralLedgerAccountLineItemUUID is aGDT of a type UUID and contains a universally unique identification of a LineItem of a GeneralLedgerAccount that records the value change of the OtherDirectCostLedgerAccountLineItem in the GeneralLedger. The GeneralLedgerAccountLineItemAccountingDocumentItemGroupID is a GDT of a type BusinessTransactionDocumentItemGroupID and contains a universally unique identification of the group of all AccountingDocumentItems that are summarized together in a GeneralLedgerAccountLineItem. The LineItem corresponds to exactly one AccountingDocumentItem belonging to the group. The OffsettingSubledgerAccountUUID is a GDT of a type UUID and contains a Universally unique identification of a SubledgerAccount (such as a MaterialLedgerAccount) in whose LineItems the inverse representation of the business transaction is stated and it is optional. The OffsettingSubledgerAccountTypeCode is a GDT of a type SubledgerAccountTypeCode—restrictions: are to include the code values 2 (MaterialLedgerAccount), 4(Purchase in Process LedgerAccount), and 9 (overheat Costs LedgerAccount) occur) and contains the Coded representation of the type of the OffsettingSubledgerAccount to which the OtherDirectCostLedgerAccountLineItem refers and it is optional. The SystemAdministrativeData is a GDT of a type SystemAdministrativeDate and contains the administrative data stored in a system This data includes the system user and change time. The ChartOfAccountsCode is a GDT of a type Chartof AccountsCode and contains a coded representation of the ChartOfAccounts containing the ChartOfAccountsItem that classifies—for general ledger accounting purposes—the value stated in the LineItem The ChartOfAccountsItemCode is a GDT of a type ChartOfAccountsItemCode and contains a coded representation of a ChartOfAccountsItem that classifies—for general ledger accounting purposes the value stated in the LineItem. The AccountingBusinessTransactionTypeCode is a GDT of a type AccountingBusinessTransactionTypeCode and contains a coded representation of the type of the business transaction stated in the OtherDirectCostLedgerAccountLineItem. It classifies the business transaction according to Accounting criteria. The TypeCode is a GDT of a type SubledgerAccountLineItemTypeCode)—Restrictions: Only code value 09001 (Internal Service Provision), 09002 (Overhead Cost), 99010 (Material Consumption), 99011 (External Service Provision), and 99300 (General Expense) can occur and contails a coded representation of the type of the LineItem. The CostRevenueelementCode is a GDT of a type CostRevenueelementCode and contains a coded representation of the value component that classifies the value that flowed from the OffsettingLedgerAccount to the OtherDirectCostLedgerAccount or vice-versa. The AccountingDocumentTypeCode is GDT of a type AccountingDocumentTypeCode and contains a Coded representation of the type of the AccountingDocument to which the LineItem refers by the AccountingDocumentReference. The AccountingDocumentNote is a GDT of a type SHORT_Note and contains a natural-language comment that applies the AccountingDocument—referred via the AccountingDocumentReference—as a whole rather than to individual items and it is optional. The Accounting DocumentItemNote is a GDT of a type Short_Note and contains a natural-language comment pertaining to the AccountingDocumentItem to which the LineItem refers by the AccountingDocumentReference and it is optional. The ProductTaxTypeCode is a GDT of a type TaxTypeCode and denotes the product tax type to which the recorded data relates and it is optional. The ProductTaxDueCategoryCode is a GDT of a type DueCategoryCode and denotes the category (receivable or payable) of a tax due to which the recorded data relates and it is optional. The ProductTaxEventTypeCode is a GDT of a type ProductTaxEventTypeCode and denotes the product tax event to which the recorded data relates and it is optional. The ProductTaxRateTypeCode is a GDT of a type TaxRateTypeCode and denotes the type of product tax rate to which the recorded data relates and it is optional. The ProductTaxCountryCode is a GDt of a type CountryCode and contains the country to whose tax authority the product tax data has been or will be reported and it is optional. The WithholdingTaxTypeCode is a GDT of a type TaxTypeCode and denotes the withholding tax type to which the recorded data relates and it is optional. The WithholdingTaxEventTypeCode is A GDT of a type WithholdingTaxEventTypeCode and denotes the witholding tax event to which the recorded data relates and it is optional. The WithholdingTaxEventTypeCode is a GDT of a type TaxRateTypeCode and denotes the type of withholding tax rate to which the recorded data relates and it is optional. The WithholdingTaxCountryCode is a GDT of a type CountryCode and contains the country to whose tax au WithholdingTaxEventTypeCode authority the product tax data has been or will be reported and it is optional.

The PostingDate is a GDT of a type Date, Qualifier: Posting and contains the date with which the business transaction is effectively recorded in Accounting. Effectively means that period totals and balances in accounting are updated with this date. The OriginalEntryDocumentDate is a GDT of a type Date, Qualifier: Posting and contains the issue date of the Original Entry Document. The AccountingBusinessTransactionDate is a GDT of a type Date, Qualifier: BusinessTransaction and contains the date at which the business transaction took place applying the criteria of Accounting. The CurrencyConversionDate is a GDT of a type Date, Qualifier: CurrencyConversion and contains the date that is used for the currency translation applied to amounts in the accounting document and it is optional. The FicialYearVariantCode is a GDT of a type FiscalYearVariantCode and contains coded representation of the FiscalYearVariant according to whose fiscal year definition (begin, end, period definition) the FiscalYearID and the AccountingPeriodID are derived. The FiscalYearID is a GDT of a type FiscalYearID and contains the identification of the fiscal year in which the LineItem is posted. The AccountingPeriodID is a GDT of a type AccountingPeriodID and contains the identification of the accounting period in which the LineItem is posted. The AccountingClosingStepCode is a GDT of a type AccountingClosingStepCode and contains a coded representation of the closing step of the accounting document and it is optional. The AccountingDocumentItemAccountingGroup is a GDT of a type BusinessTransactionDocumentItemGroupID and contains a unique identification of a group of AccountingDocumentItems belonging together applying the criteria of Accounting. It is used to indicate the items of an AccountingDocument that belong together e.g. in partial zero-balance checking within the Accounting Document.

An example is an activity confirmation from production that contains items for actual working times and also for materials used for the production process, The created AccountingDocumentItems are grouped together according to the material movement or working time confirmation they belong to.

AccountingDocumentItemProductTaxGroupID a GDT of a type BusinessTransactionDocumentItemGroupID and contains a unique Identification of a group of AccountingDocumentItems that belong together because they are tax relevant and have the same taxation and related tax items and it is optional.

ExpenseClassificationFunctionalAreaCode is a GDT of a type ExpenseClassificationFunctionAreaCode and contains a coded representation of the functional area to which the value and quantity of the LineItem are allocated and it is optional.

GeneralLedgerMovementTypeCode is a GDT of a type GeneralLedgerMovementTypeCode and contains a Ledger purposes in the GeneralLedgerAccount and it is optional.

DebitCreditCode is a GDT of a type of DebitCreditCode and contains a coded representation of debit or credit. It specifies whether the line item is assigned to the debit or credit side of the GeneralLedger account.

SubledgerAccountChargeTypeCode is a GDT of a type SubledgerAccountChargeTypeCode and contains a type of debit or credit of the OtherDirectCostLedgerAccounts by the line item.

CancellationDocumentIndicator is a GDT of a type Indicator, Qualifier: CancellationDocument and indicates whether the AccountingDocument to which the LineItem refers by the AccountingDocumentReference refers to a Cancellation Original Entry Document and it is optional.

CancellationOriginalEntryDocumentContainingBusinessObjectReference is a GDT of a type ObjectNodeReference, Qualifier: CancellationOriginalEntryDocumentContaining and contains a reference to the Business Object containing the OriginalEntryDocument that cancelled this LineItem and it is optional.

CancellationOriginalEntryTransactionUUID is a. GDt of a type UUID and contains a universally unique identifier of the transaction during which the CancellationOriginalEntryDocument was created or changed and it is optional.

CancellationOriginalEntryDocumentReference is a GDT of a type ObjectNodeReference, Qualifier: Cancellation and contains a reference to the OriginalEntryDocument, that cancelled this LineItem and it is optional.

CancelledIndicator is a GDT of a type Indicator, Qualifier: Cancelled and indicates if the line item has been cancelled.

CashDiscountDeductibleIndicator is a GDT of a type Indicator, Qualifier: CashDiscountDeductible and Indicates whether a cash discount can be deducted from the LineItem and it is optional.

BusinessTransactionCurrencyAmount is a GDT of a type Amount, Qualifier: BusinessTransactionCurrency and contains the value of the LineItem in transaction currency. The transaction currency is the currency agreed on by two business partners for their business relationship.

LineItemCurrencyAmount is a GDT of a type Amount, Qualifier: LineItem and contains the value of the LineItem in LineItem currency.

LocalCurrencyAmount is a GDT of a type Amount, Qualifier: LocalCurrency and contains the value of the LineItem in the local currency of the Company carrying the account. The local currency is the currency in which the local books are kept.

SetOfBooksCurrencyAmount is a GDT of a type Amount, Qualifier: SetOfBooksCurrency and contains the value of the LineItem in the currency selected for the set of books.

HardCurrencyAmount is a GDT of a type Amount, Qualifier: HardCurrently and contains the value of the LineItem, in the hard currency of the country of the Company carrying the account. The hard currency is a stable, country-specific currency that is used in high-inflation countries.

IndexBasedCurrencyAmount is a GDT of a type Amount, Qualifier: IndexBasedCurrency and contains the value of the LineItem in the index-based currency of the country of the Company carrying the account. The index-based currency is a fictitious, country-specific currency that is used in high-inflation countries as a comparison currency for reporting.

ValuationQuantity is a GDT of a type Quantity, Qualifier: Valuation and contains the quantity change of the business transaction stated in the line item in the valuation unit of measurement of the material, service product, or resource and it is optional.

ValuationQuantityTypeCode is a GDT of a type QuantityTypeCode, Qualifier: Valuation and contains a representation of the type of the valuation quantity and it is optional.

There are a number of Inbound Aggregation Relationships including:

From business object SetOfBooks: SetOfBooks may have a cardinality relationship of 1:cn.

The SetOfBooks according to whose specifications the LineItem was created.

From business object Company: Partner Company may have a cardinality relationship of c:cn.

A company that acts in the business transaction stated in the LineItem as an intra corporate partner.

From business object Segment: Segment may have a cardinality relationship of c:cn.

A segment to which the value and quantity of the LineItem are allocated.

PartnerSegment may have a cardinality relationship of c:cn.

A Segment that acts in the business transaction stated in the LineItem as an intra corporate Partner.

From business object ProfitCentre: ProfitCentre may have a cardinality relationship of c:cn.

A ProfitCentre to which the value and quantity of the LineItem are allocated.

PartnerProfitCentre may have a cardinality relationship of c:cn.

A ProfitCentre that acts in the business transaction stated in the LineItem as an intra corporate partner.

One of the following pairs of relationships are included in an Original Entry Document and its Item can exist. If the Original Entry Document is contained in another Object then the corresponding relationship to this Object can exist, too.

One of the following relationships to a Cancellation Original Entry Document can exist.

If the Cancellation Original Entry Document is contained in another Object then the corresponding relationship to this Object can exist, too.

From business object AccountingEntry: AccountingEntry may have a cardinality relationship of c:cn.

An AccountingEntry that keeps the original entry of the business transaction stated in the entry.

CancellationAccountingEntry may have a cardinality relationship of c:cn.

An AccountingEntry that keeps the original entry of the cancellation of the business transaction stated in the LineItem.

From business object AccountingEntry: AccountingEntryItem may have a cardinality relationship of c:cn.

An Item in an AccountingEntry serving as Original Entry Document Item by which the value change recorded in the LineItem can be verified.

From business object GoodsAndServiceAcknowledgement: GoodsAndServiceAcknowledgement may have a cardinality relationship of c:cn (cross DU).

A GoodsAndServiceAcknowledgement that keeps the original entry of the business transaction stated in the LineItem.

CancellationGoodsAndServiceAcknowledgement may have a cardinality relationship of c:cn (cross DU).

A GoodsAndServiceAcknowledgement that keeps the original entry of the cancellation of the business transaction stated in the LineItem.

From business object GoodsAndServiceAcknowledgement: GoodsAndServiceAcknowledgementItem may have a cardinality relationship of c:cn (cross DU).

An Item in a GoodsAndServiceAcknowledgement serving as Original Entry Document Item by which the value change recorded in the LineItem can be verified.

From business object GoodsAndActivityConfirmation: GoodsAndActivityConfirmation may have a cardinality relationship of c:cn (cross DU).

A GoodsAndActivityConfirmation that that keeps the original entry of the business transaction stated in the LineItem.

CancellationGoodsAndActivityConfirmation may have a cardinality relationship of c:cn (cross DU).

A GoodsAndActivityConfirmation that keeps the original entry of the cancellation of the business transaction stated in the LineItem.

From business object GoodsAndActivityConfirmation: GoodsAndActivityConfirmationInventoryChangeItem may have a cardinality relationship of c:cn (cross DU).

An InventoryChangeItem in a GoodsAndActivityConfirmation serving as Original Entry Document Item by which the value change recorded in the LineItem can be verified.

From business object EmployeeTimeCalendar: EmployeeTimeCalendar may have a cardinality relationship of c:cn (cross DU).

Reference to the EmployeeTimeCalendar that contains the Original Entry Document.

From business object EmployeeTimeCalendar: EmployeeTimeCalendarPeriodItem may have a cardinality relationship of c:cn (cross DU).

Reference to a PeriodItem that serves as Original Entry Document for a business transaction in an EmployeeTimeCalendar CancellationEmployeeTimeCalendarPeriodItem may have a cardinality relationship of c:cn (cross DU).

Reference to a PeriodItem that serves as Original Entry Document for the cancellation of a business transaction in an EmployeeTimeCalendar From business object SupplierInvoice: SupplierInvoice may have a cardinality relationship of c:cn (cross-DU).

A SupplierInvoice that keeps the original entry of the business transaction stated in the LineItem.

CancellationSupplierInvoice may have a cardinality relationship of c:cn (cross-DU).

A SupplierInvoice that keeps the original entry of the cancellation of the business transaction stated in the LineItem.

From business object SupplierInvoice: SupplierInvoiceItem may have a cardinality relationship of c:cn (cross DU).

An Item in a SupplierInvoice serving as Original Entry Document Item by which the value change recorded in the LineItem can be verified.

From MDRO GoodsReceiptInvoiceReceiptClearingRun: GoodsReceiptInvoiceReceiptClearingRun may have a cardinality relationship of c:cn.

Reference to the GoodsReceiptInvoiceReceiptClearingRun that contains the Original Entry Document.

CancellationGoodsReceiptInvoiceReceiptClearingRun may have a cardinality relationship of c:cn.

Reference to the GoodsReceiptInvoiceReceiptClearingRun that contains the Original Entry Document for the cancellation of this LineItem.

From MDRO GoodsReceiptInvoiceReceiptClearingRun: GoodsReceiptInvoiceReceiptClearingRunLogSection may have a cardinality relationship of c:cn.

Reference to a LogSection that serves as Original Entry Document for a business transaction in an GoodsReceiptInvoiceReceiptClearingRun.

CancellationGoodsReceiptInvoiceReceiptClearingRunLogSection may have a cardinality relationship of c:cn.

Reference to a LogSection that serves as Original Entry Document for the cancellation of this LineItem.

From MDRO GoodsReceiptInvoiceReceiptClearingRun: LogSectionGoodsReceiptInvoiceReceiptClearingCalculatedItem GoodsReceiptInvoiceReceiptClearingRunLogSectionGoodsReceiptInvoiceReceiptClearingCalculatedItem may have a cardinality relationship of c:cn.

An GoodsReceiptInvoiceReceiptClearingCalculatedItem in a LogSection of an GoodsReceiptInvoiceReceiptClearingRun serving as Original Entry Document Item by which the value change recorded in the LineItem can be verified.

From MDRO OtherDirectCostLedgerAccountOverheadCostCalculationRun: OtherDirectCostLedgerAccountOverheadCostCalculationRun may have a cardinality relationship of c:cn.

Reference to the OtherDirectCostLedgerAccountOverheadCostCalculationRun that contains the Original Entry Document.

CancellationOtherDirectCostLedgerAccountOverheadCostCalculationRun may have a cardinality relationship of c:cn.

Reference to the GoodsReceiptInvoiceReceiptClearingRun that contains the Original Entry Document for the cancellation of this LineItem.

From MDRO OtherDirectCostLedgerAccountOverheadCostCalculationRun: OtherDirectCostLedgerAccountOverheadCostCalculationRunLogSection may have a cardinality relationship of c:cn.

Reference to a LogSection that serves as Original Entry Document for a business transaction in an OtherDirectCostLedgerAccountOverheadCostCalculationRun CancellationOtherDirectCostLedgerAccountOverheadCostCalculationRunLogSection may have a cardinality relationship of c:cn.

Reference to a LogSection that serves as Original Entry Document for the cancellation of this LineItem.

From MDRO OtherDirectCostLedgerAccountOverheadCostCalculationRun: LogSectionOverheadCostCalculationCalculatedItem OtherDirectCostLedgerAccountOverheadCostCalculationRunLogSectionOverheadCostCalculationCalculatedItem may have a cardinality relationship of c:cn.

An LogSectionOverheadCostCalculationCalculatedItem in a LogSection of an OtherDirectCostLedgerAccountOverheadCostCalculationRun serving as Original Entry Document Item by which the value change recorded in the LineItem can be verified Constraint with the following relationships: A maximum of one of these relationships can exist.

From business object OverheadCostLedgerAccount: Offsetting OverheadCostLedgerAccount may have a cardinality relationship of c:cn.

Denotes the OverheadCostsLedgerAccount to which the LineItem relates as the OffsettingSubLedgerAccount.

From business object MaterialLedgerAccount: Offsetting MaterialLedgerAccount may have a cardinality relationship of c:cn.

Denotes the MaterialLedgerAccount to which the LineItem relates as the OffsettingSubLedgerAccount.

From business object PurchaseLedgerAccount: Offsetting PurchaseLedgerAccount may have a cardinality relationship of c:cn.

Denotes the PurchaseLedgerAccount to which the LineItem relates as the OffsettingSubLedgerAccount.

Association Relationships for Navigation

To the business object AccountingDocument: AccountingDocument may have a cardinality relationship of 1:cn.

The accounting document that records the entire business transaction in Accounting.

To business object GeneralLedgerAccount: GeneralLedgerAccountLineItem may have a cardinality relationship of 1:cn.

A LineItem of a GeneralLedgerAccount that records the value change for GeneralLedger purposes.

There may be a number of Inbound Association Relationships including:

From business object AccountingNotification: AccountingNotification may have a cardinality relationship of c:cn.

The notification sent to Financial Accounting about the business transaction stated in the LineItem.

From business object AccountingNotification: AccountingNotificationItemGroupItem may have a cardinality relationship of c:cn.

The item of the AccountingNotification whose information is recorded in the LineItem.

From business object Identity: CreationIdentity may have a cardinality relationship of 1:cn.

The system user Identity who created the LineItem.

LastChangeIdentity may have a cardinality relationship of c:cn.

The system user Identity who last changed the LineItem.

PeriodTotal

A PeriodTotal is a period-based record in an OtherDirectCostLedgerAccount for a set of books and business transaction category of the consumption quantity and the effects of the business transactions of that category on the other direct costs.

The elements located directly at the PeriodTotal node are defined by the type GDT: OtherDirectCostLedgerAccountPeriodTotalElements. These elements may include: SetOfBooksID, SegmentUUID, ProfitCentreUUID, PartnerCompanyUUID, PartnerSegmentUUID, PartnerProfitCentreUUID, OffsettingSubledgerAccountUUID, OffsettingSubledgerAccountTypeCode, ChartOfAccountsCode, ChartOfAccountsItemCode, AccountingBusinessTransactionTypeCode, SubledgerAccountLineItemTypeCode, CostRevenueElementCode, FiscalYearVariantCode, FiscalYearID, AccountingPeriodID, ExpenseClassificationFunctionalAreaCode, SubledgerAccountChargeTypeCode, LocalCurrencyAmount, SetOfBooksCurrencyAmount, HardCurrencyAmount, IndexBasedCurrencyAmount, ValuationQuantity, ValuationQuantityTypeCode. The SetOtfBooksID is aGDT of a type SetOfBooksID and contains a universally unique identification of the SetOfBooks according to whose specifications the PeriodTotal was created and updated. The SegmentUUID is a GDT of a type UUID and contains a universally unique identification of the Segment to which the value and quantity of the period total are allocated. The ProfitCentreUUID is a GDT of a type UUID and contains a universally unique identification of the ProfitCentre to which the value and quantity of the period total are allocated. The PartnerCompanyUUID is a GDT of a type UUID and contains a universally unique identification of a Company that acts in the business transactions for which the PeriodTotal documents summarized quantities and values as an intra corporate partner. The PartnerSegmentUUID is aGDT of a type UUID and contains a universally unique identification of a Segment that acts in the business transactions for which the PeriodTotal documents summarized quantities and values as an intra corporate partner. The PartnerProfitCentreUUID is a GDT of a type UUID and contains a universally unique identification of a ProfitCentre that acts in the business transactions for which the PeriodTotal documents summarized quantities and values as an intra corporate partner. The OffsettingSubledgerAccountUUID is a GDT of a typeUUID and contains a universally unique identification of a SubledgerAccount (such as a MaterialLedgerAccount) that states—required by the double entry bookkeeping principle—the inverse representation of the business transactions that are stated in the PeriodTotal and it is optional. The OffsettingSubledgerAccountTypeCode is a GDT of a type SubledgerAccountTypeCode restrictions: the code value9 9 (Overheat Costs Ledger Account) can occur and contains a coded representation of the type of the OffsettingLedgerAccount to which the PeriodTotal refers. The ChartOfAccountsCode is a GDT of a type ChartOfAccountsCode and contains a coded representation of the ChartOfAccounts that contains the ChartOfAccountsItem that classifies the value stated in the PeriodTotal. The ChartOfAccountsItemCode is a GDT of ChartOfAccountsItemCode and contains a coded representation of a ChartOfAccountsItem that classifies—for general ledger accounting purposes—the value stated in the PeriodTotal. The AccountingBusinessTransactionTypeCode is a GDT of a type AccountingBusinessTransactionTypeCode and contains a coded representation of the type of the business transactions for which the PeriodTotal keeps summarized quantities and values. It classifies the business transactions according to Accounting criteria. The SubledgerAccountLineItemTypeCode is a GDT of a type SubledgerAccountLineItemTypeCode)—Restrictions: Only code value 09001 (Internal Service Provision), 09002 (Overhead Cost), 99010 (Material Consumption), 99011 (External Service Provision), and 99300 (General Expense) can occur and contains a coded representation of the type of the SubledgerAccountLineItems whose amounts and quantities are summarized in the PeriodTotal. The CostRevenueElementCode is a GDT of a type CostRevenueElementCode and contains a coded representation of the value component that classifies the value that flowed from the OffsettingLedgerAccount to the OtherDirectCostLedgerAccount or vice-versa. The FiscalYearVariantCode is a GDT of a type FiscalYearVariantCode and contains a coded representation of the FiscalYearVariant according to whose fiscal year definition (begin, end, period definition) the FiscalYearID and the AccountingPeriodID are derived. The FiscalYearID is a GDT of a type FiscalYearID and contains the identification of the fiscal year in which the LineItem are posted for which the PeriodTotal keeps summarized values and quantities. The AccountingPeriodID is a GDT of a type AccountingPeriodID and contains the identification of the accounting period in which the LineItem are posted for which the PeriodTotal keeps summarized values and quantities. The ExpenseClassificationFunctionalAreaCode is a GDT of a type ExpenseClassificationFunctionalAreaCode and contains a coded representation of the functional area to which the value and quantity of the PeriodTotal are allocated. The SubledgerAccountChargeTypeCode is a GDT of a type SubledgerAccountChargeTypeCode and contains a coded representation of the type of OtherDirectCostLedgerAccount debit or credit for which the period total keeps values and quantities. The type of debit or credit influences how work in process is cleared. The LocalCurrencyAmount is a GDT of a type Amount and contains the value of the period total in the local currency of the Company carrying the OtherDirectCostLedgerAccount. The local currency is the currency in which the local books are kept.

Constraint: The value reported here matches the total of all values in local currency that are documented in the LineItems. The SetOfBooksCurrencyAmount is a GDT of a type Amount and contains the value of the period total in the currency selected for the set of books.

Constraint: The value reported here matches the total of all values in the additional currency selected for the set of books that are documented in the LineItems. The HardCurrencyAmount is a GDT of a type Amount and contains the value of the period total in the hard currency of the country of the Company carrying the OtherDirectCostLedgerAccount. The hard currency is a stable, country-specific currency that is used in high-inflation countries and it is optional.

Constraint: The value reported here may match the total of all values in the hard currency that are documented in the LineItems. The IndexBasedCurrencyAmount is a GDT of a type Amount and contains the value of the period total in the index-based currency of the country of the Company carrying the OtherDirectCostLedgerAccount. The index-based currency is a fictitious, country-specific currency that is used in high-inflation countries as a comparison currency for reporting and it is optional.

Constraint: The value reported here may match the total of all values in the index-based currency that are documented in LineItems. The ValuationQuantity is a GDT of a type GDT of a type Quantity and contains the quantity of the period total in the valuation unit of the material. The valuation unit is the unit in which consumed or manufactured materials or production activities are valuated in Financial Accounting and it is optional. The ValuationQuantityTypeCode is a GDT of a type QuantityTypeCode, Qualifier, Valuation and contains a coded representation of the type of the valuation quantity and it is optional.

(GDT: QuantityTypeCode, Qualifier: Valuation)

The may be a number of Inbound Aggregation Relationships including:

From business object SetOfBooks:

SetOfBooks may have a cardinality relationship of 1:cn.

Denotes the Set Of Books which the period total relates to.

From business object Company:

Partner Company may have a cardinality relationship of c:cn.

A company that acts in the business transaction stated in the LineItem as an intra corporate partner.

From business object Segment:

Segment may have a cardinality relationship of c:cn.

A segment to which the value and quantity of the LineItem are allocated.

PartnerSegment may have a cardinality relationship of c:cn.

A Segment that acts in the business transaction stated in the LineItem as an intra corporate Partner.

From business object ProfitCentre:

ProfitCentre may have a cardinality relationship of c:cn.

A ProfitCentre to which the value and quantity of the LineItem are allocated.

PartnerProfitCentre may have a cardinality relationship of c:cn.

A ProfitCentre that acts in the business transaction stated in the LineItem as an intra corporate partner.

From business object OverheadCostLedgerAccount/node OverheadCostLedgerAccount

Offsetting OverheadCostLedgerAccount may have a cardinality relationship of c:cn.

Denotes the OverheadCostsLedgerAccount to which the LineItem relates as the

OffsettingSubLedgerAccount

Queries

QueryByElements:

Delivers a list of all PeriodTotals that fulfill arbitrary selection criteria from the quantity of elements located at the node as well as elements located at the root node.

Query elements are defined by the data type: OtherDirectCostLedgerAccountPeriodTotalQueryElements. These elements may include: OtherDirectCostLedgerAccountFinancialAccountingViewOfProjectTaskUUID, OtherDirectCostLedgerAccount-FinancialAccountingViewOfProjectTaskReferenceUUID, OtherDirectCostLedgerAccount-FinancialAccountingViewOf-ProjectTaskReferenceFormattedID OtherDirectCostLedgerAccountCompanyUUID, OtherDirectCostLedgerAccountCompanyID, SetOfBooksID, SegmentUUID, SegmentID, ProfitCentreUUID, ProfitCentreID, PartnerCompanyUUID, PartnerCompanyID, PartnerSegmentID, PartnerProfitCentreID, OffsettingSubledgerAccountTypeCode, ChartOfAccountsItemCode, AccountingBusinessTransactionTypeCode, SubledgerAccountLineItemTypeCode, CostRevenueElementCode, FiscalYearID, AccountingPeriodID, ExpenseClassificationFunctionalAreaCode, SubledgerAccountChargeTypeCode. The OtherDirectCostLedgerAccount-FinancialAccountingViewOfProjectTaskUUID is a GDT of a typeUUId and it is Optional. The OtherDirectCostLedgerAccountFinancialAccounting-ViewOfProjectTaskReferenceUUID is a GDT of the type UUID and contains a universally unique identification of the project task which the OtherDirectCostLedgerAccount refers to and it is optional. The OtherDirectCostLedgerAccount-FinancialAccountingViewOf-ProjectTaskReferenceFormattedID is a GDT of a type ObjectNodeFormattedID and contains the identification of the project task which the OtherDirectCostLedgerAccount refers to and it is optional. The OtherDirectCostLedgerAccountCompanyUUID is a GDT of a type UUID and it is optional. The OtherDirectCostLedgerAccounCompanyID is a GDT of a type OrganisationalCentreID and it is optional. The SetOfBooksID is a GDT of a type SetOfBooksID and it is optional. The SegmentUUID is a GDT of a type and it is optional. The SegmentID is a GDT of w type OrganisationCentreID and it is optional. The ProfitCentreUUID is a GDT of a type UUID and it is optional. The ProfitCentreID is a GDT of a type OrganisationalCentreID and it is optional. The PartnerCompanyUUID is a GDT of a type UUID and it is optional. The PartnerCompanyID is a GDT of a type OrganisationalCentreID and it is optional. The PartnerSegmentUUID is a GDT of a type UUID and it is optional. The PartnerSegmentID is a GDT of a type OrganisationalCentreID and it is optional. The PartnerProfitCentreUUID is a GDT of a type UUID and it is optional. The PartnerProfitCentreID is a GDT of a type OrganisationalCentreID and it is optional. The OffsettingSubledgerAccountUUID is a GDT of a type UUID and it is optional. The OffsettingSubledgerAccountTypeCode is a GDT of a type Chartof AccountsItemCode and it is optional. The ChartOfAccountsItemCode is a GDT of a type ChartOfAccountsItemCode and it is optional. The AccountingBusinessTransactionTypeCode is a GDT of a type and it is optional. The SubledgerAccountLineItemTypeCode is a GDT of a type SubledgerAccountLineItemTypeCode and it is optional. The CostRevenueElementCode is a GDT of a type CostRevenueElementcode and it is optional. The FiscalYearID is a GDT of a type FiscalYearID and it is optional. The AccountingPeriodID is a GDT of a type AccountingPeriodID and it is optional. The ExpenseClassificationFunctionalAreaCode is a GDT of a type ExpenseClassificationFunctionalAreaCode and it is optional. The SubledgerAccountChargeTypeCode is a GDT of a type SubledgerAccountChargeTypeCode and it is optional.

DO: AccessControlList

The AccessControlList is a list of access groups that have access to an OtherDirectCostLedgerAccount.

Business Object OverheadCostLedgerAccount

Figures 1, 96:
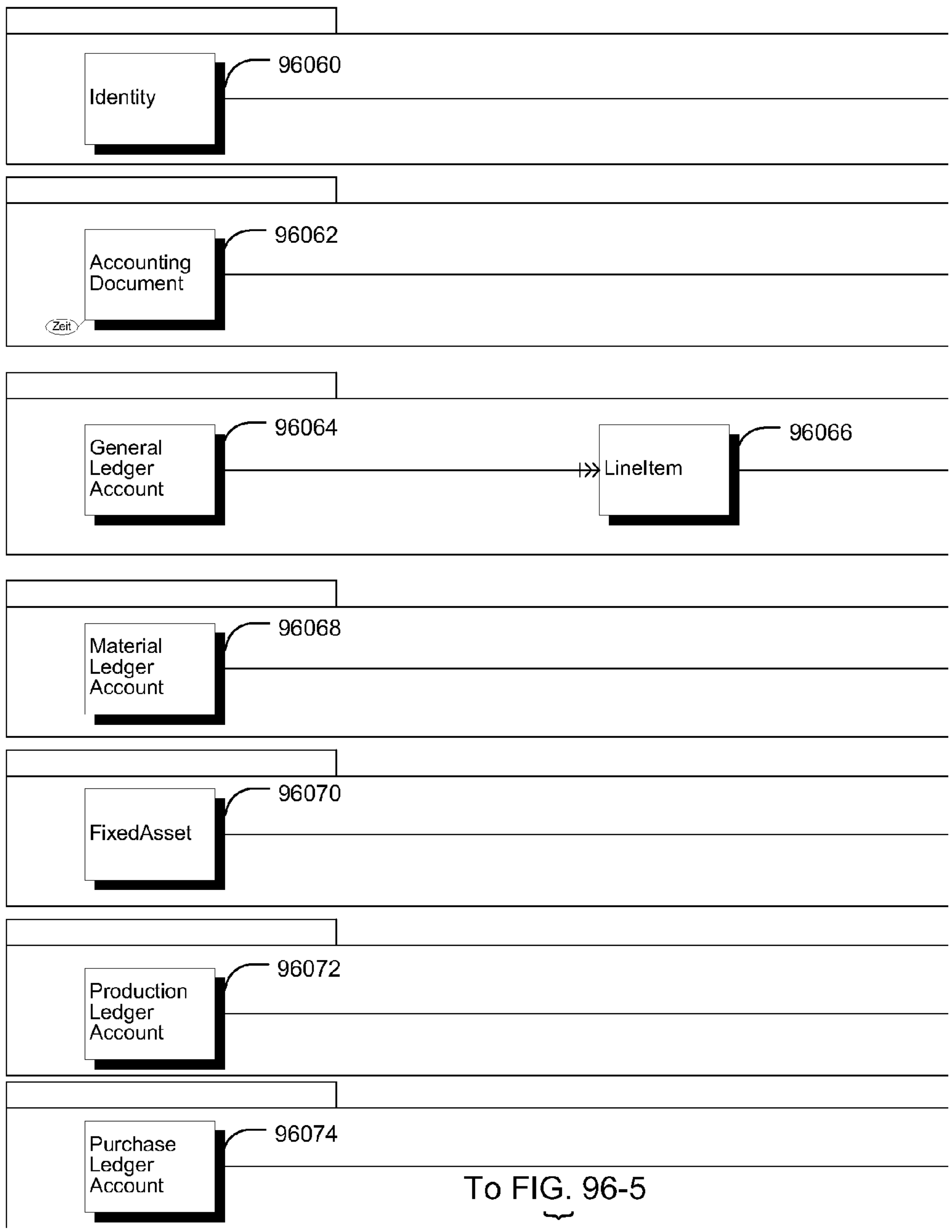
Figures 2, 96:
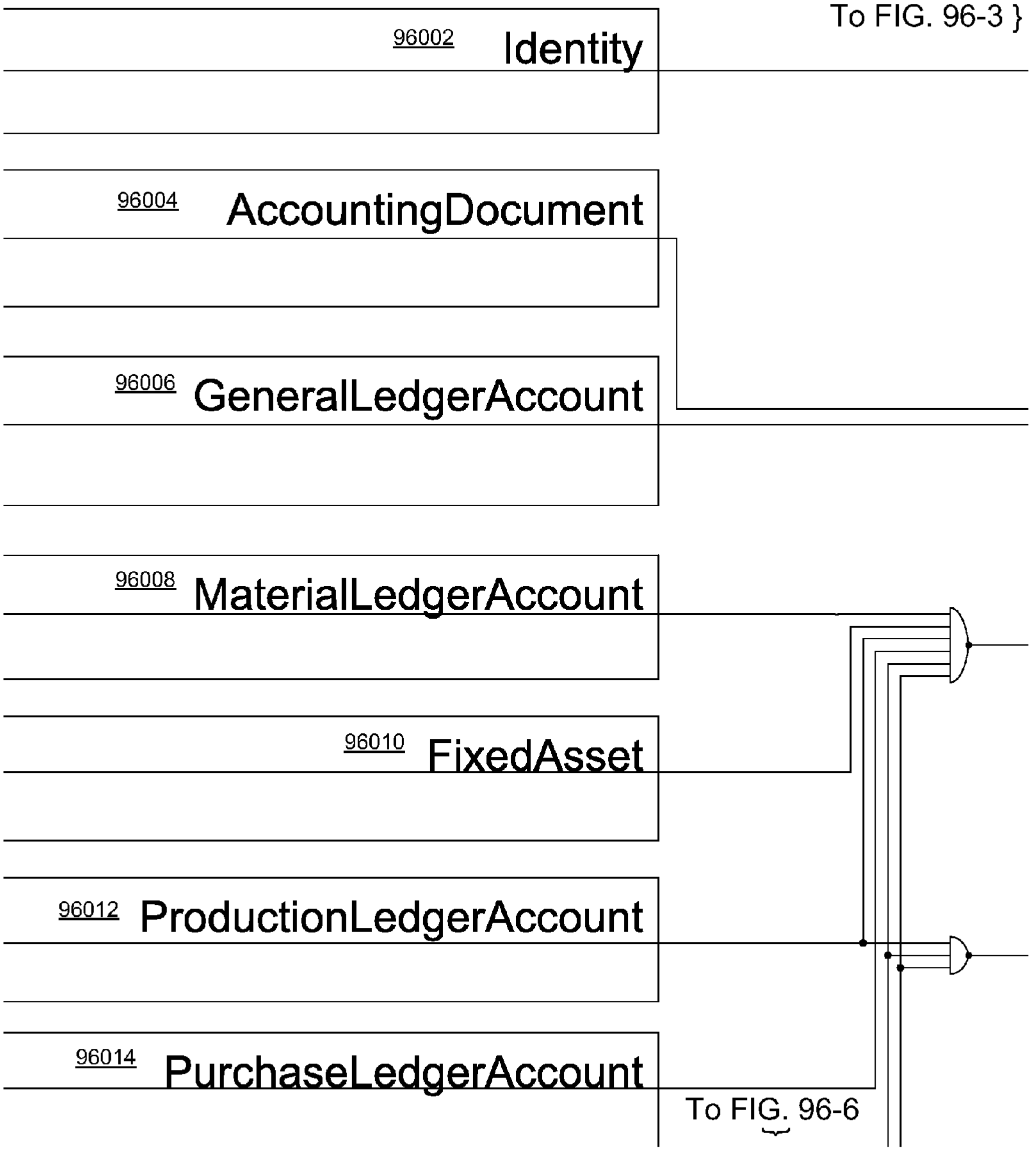
Figures 3, 96:
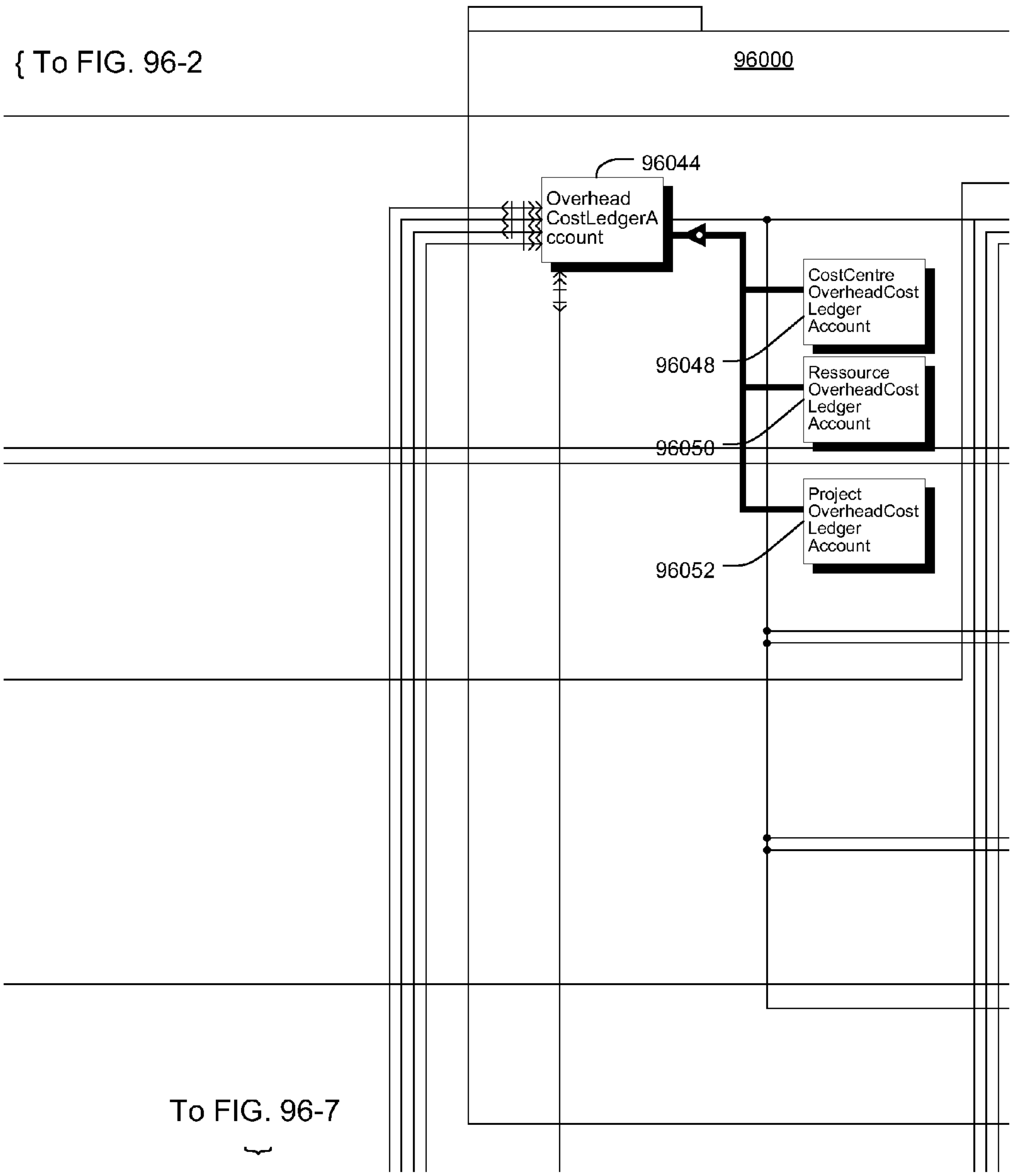
Figures 4, 96:
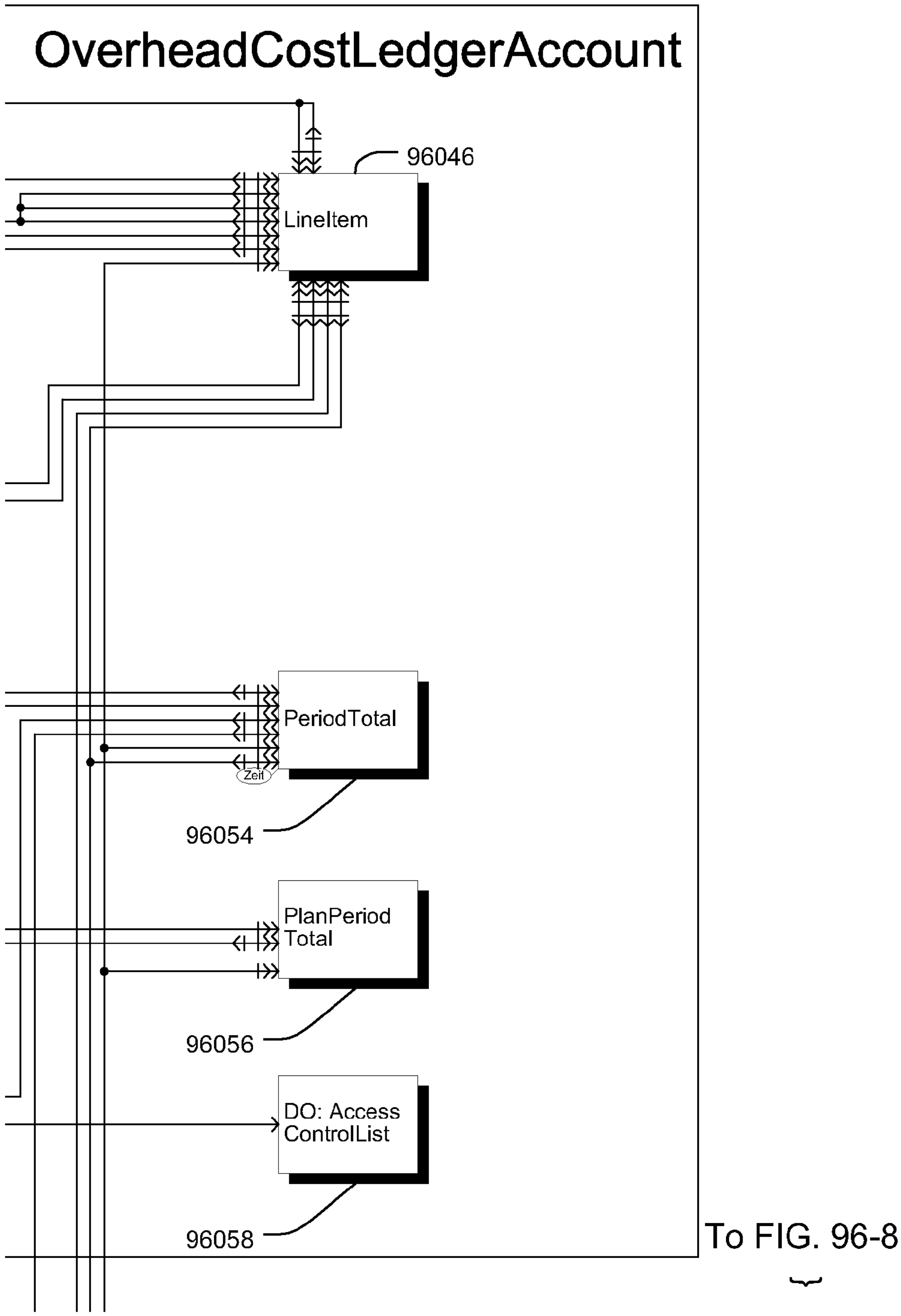
Figures 5, 96:
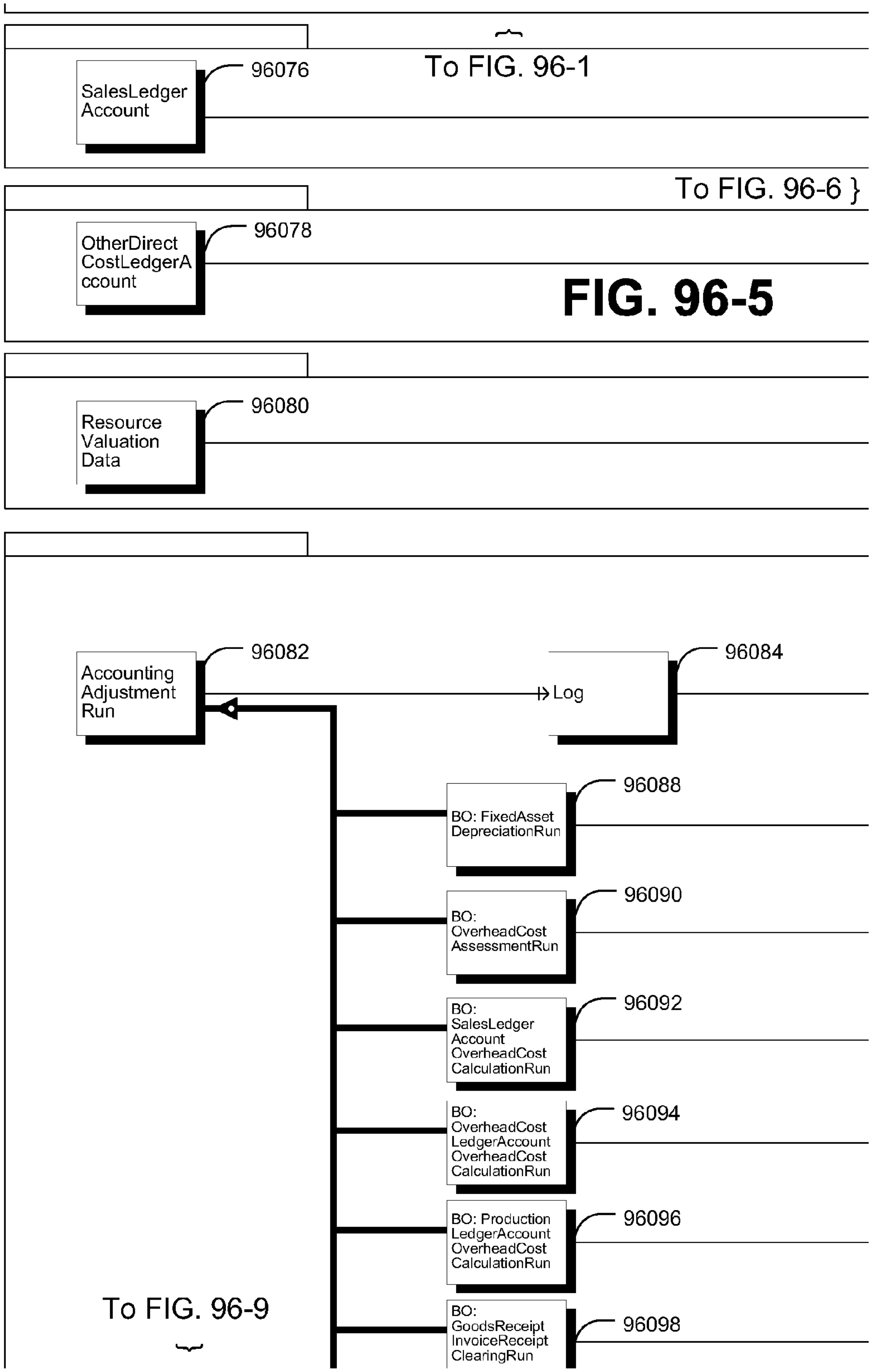
Figures 6, 96:
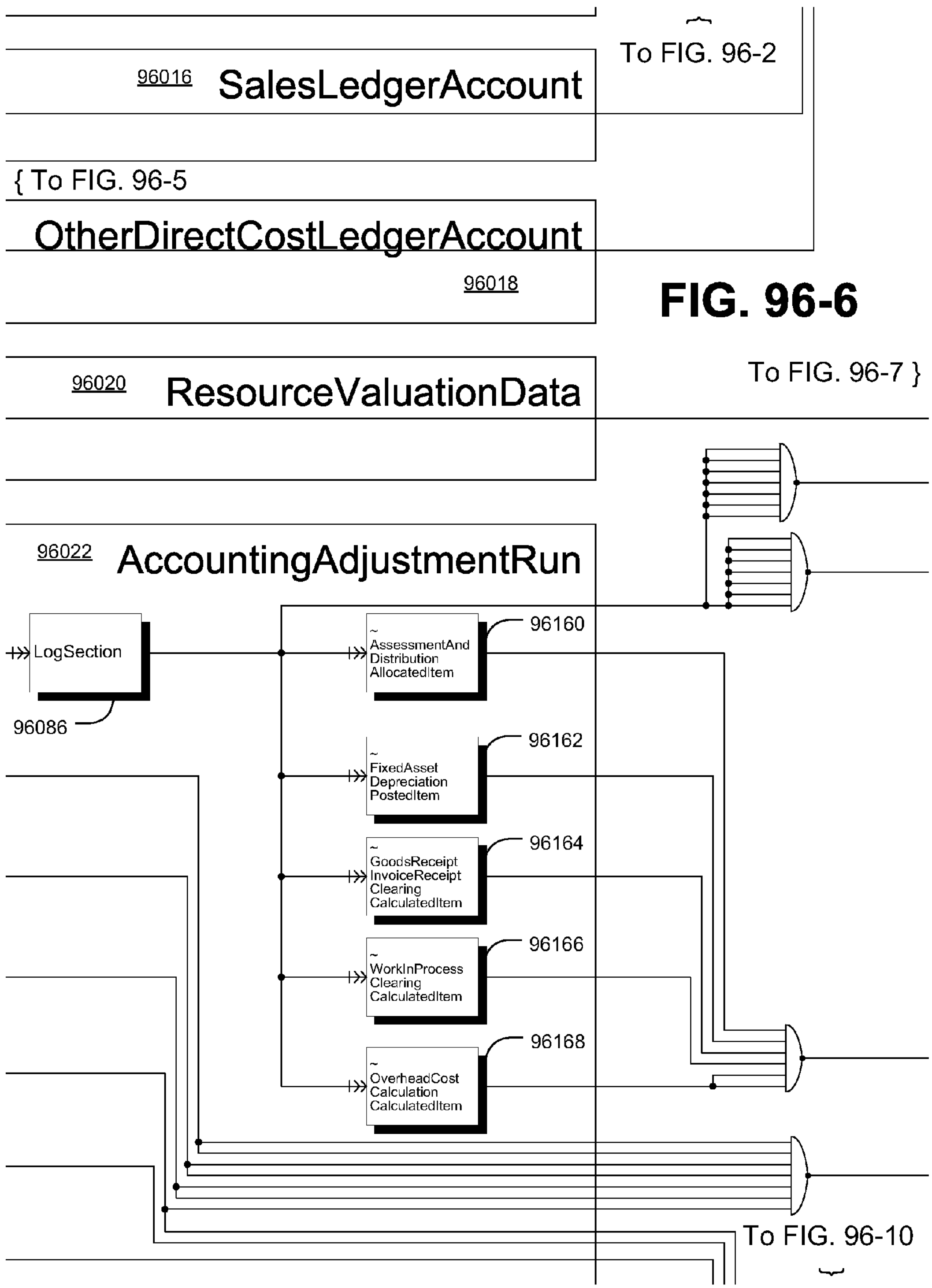
Figures 7, 96:
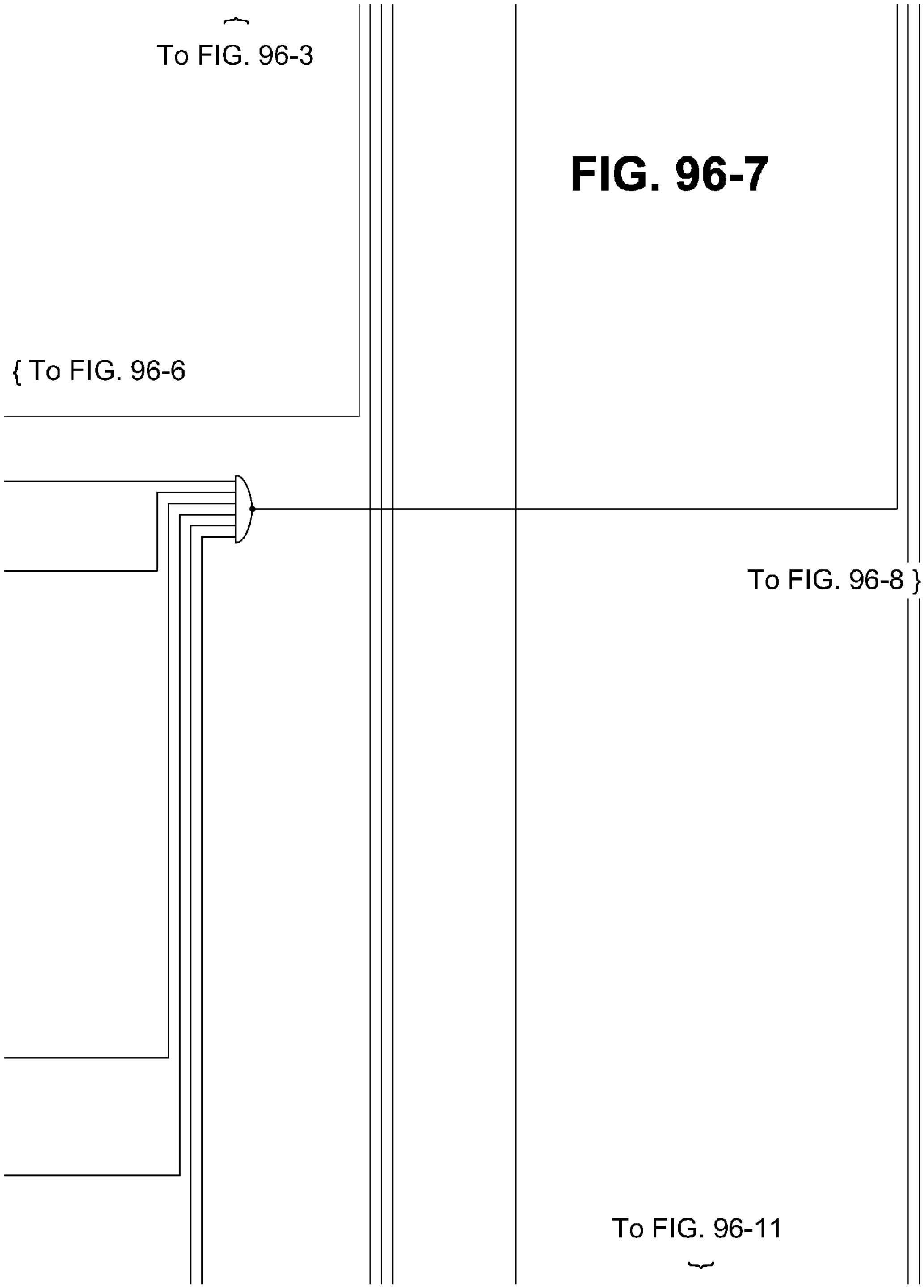
Figures 9, 96:
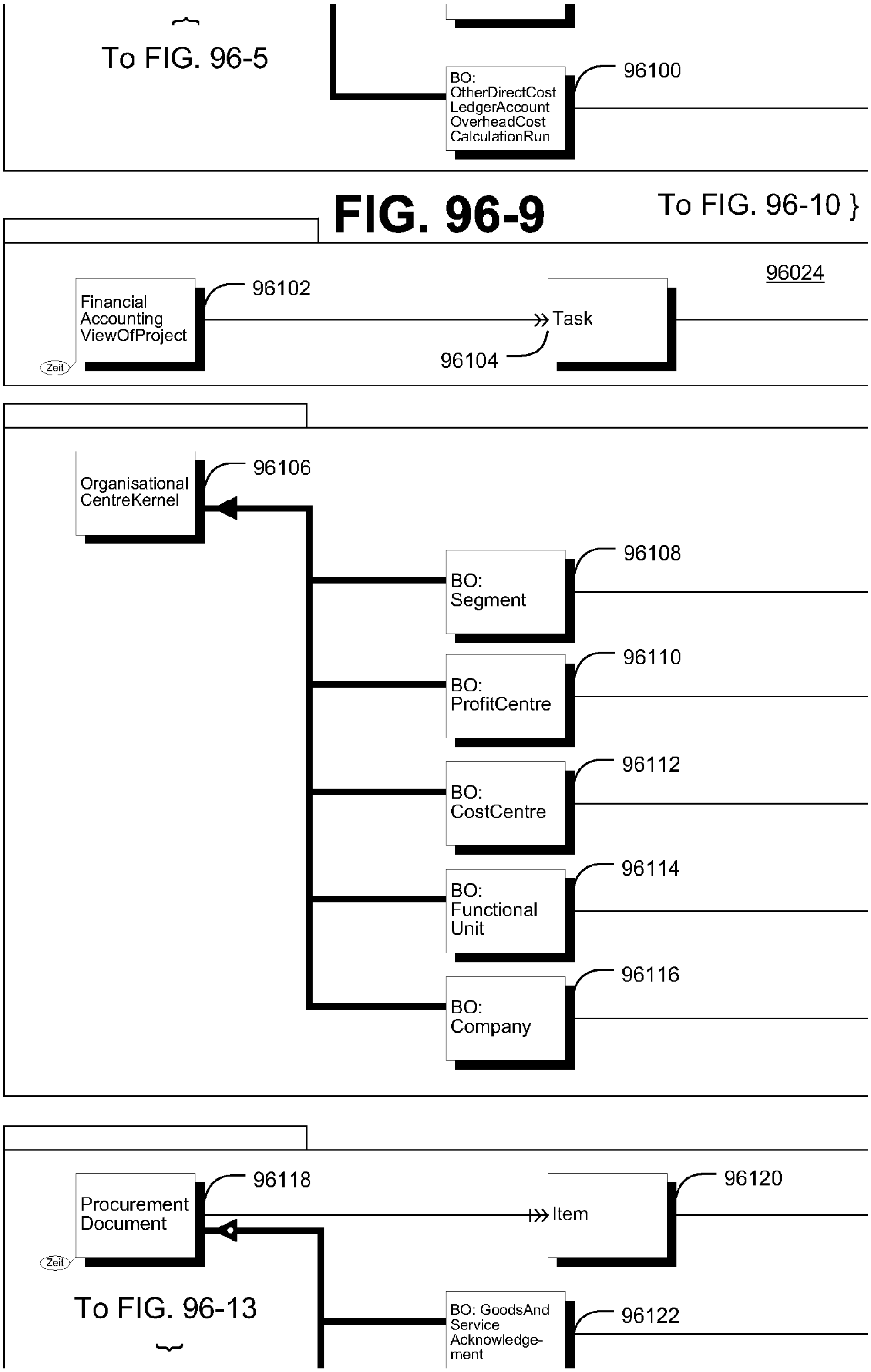
Figures 10, 96:
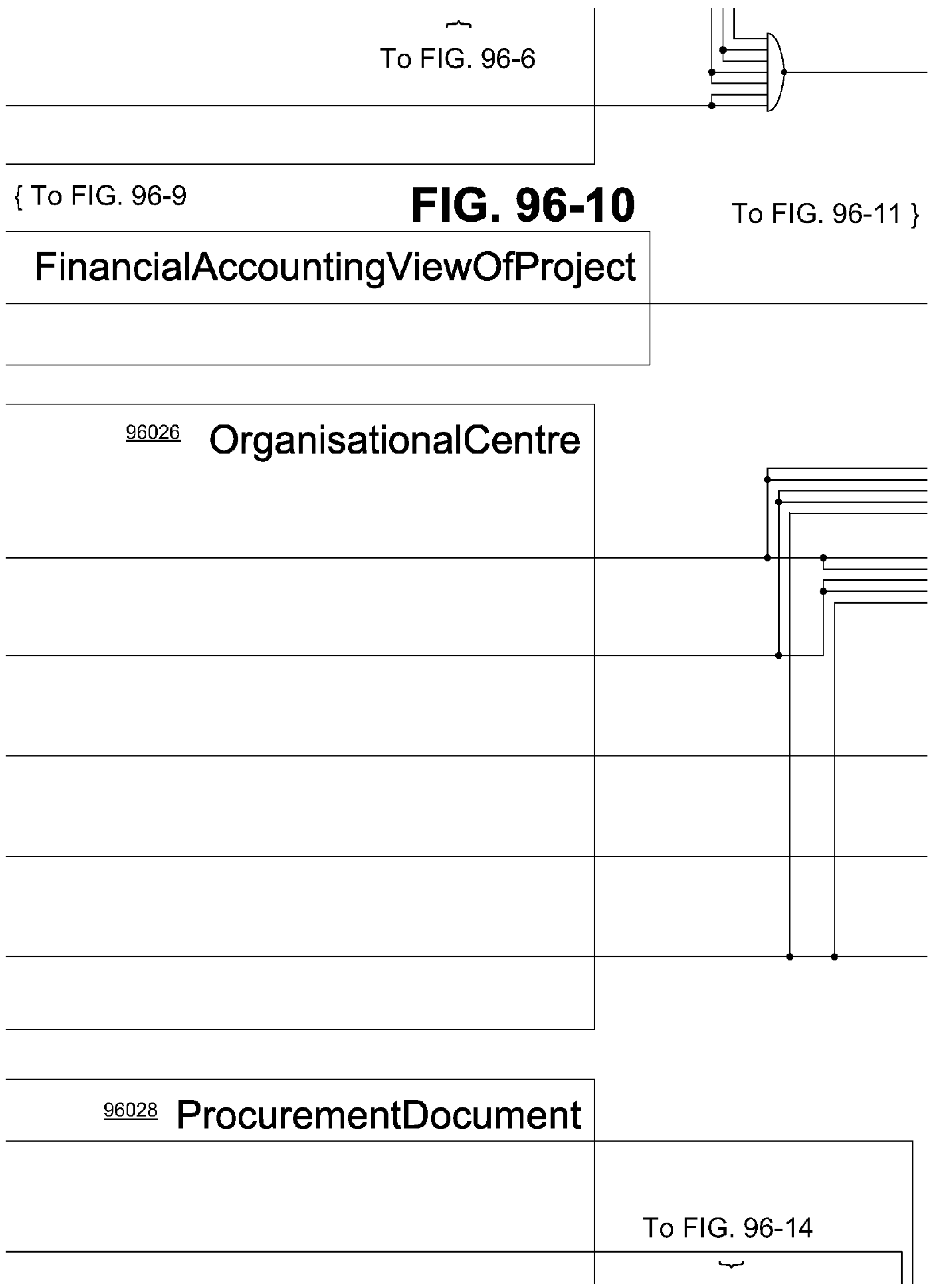
Figures 11, 96:
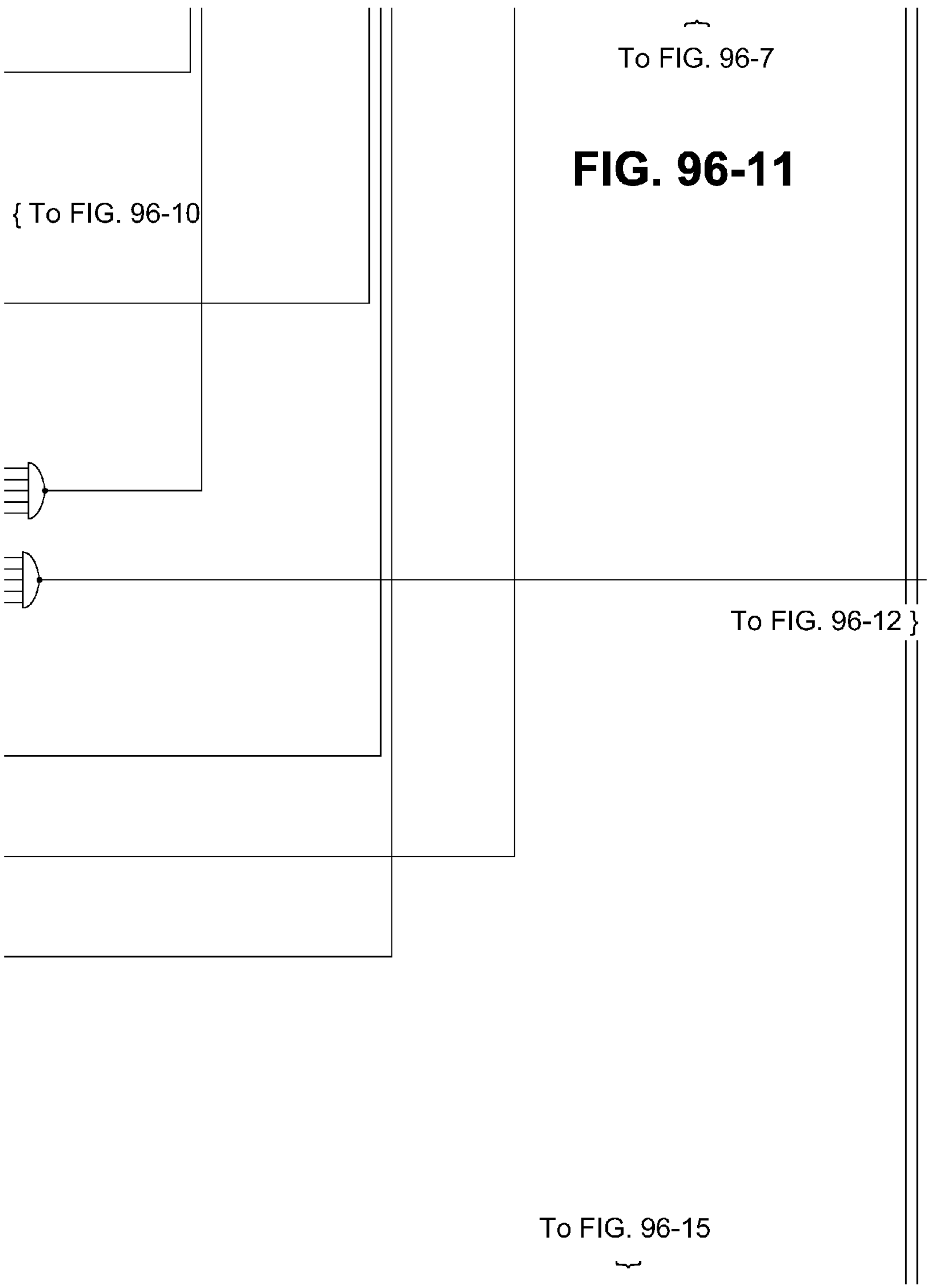
Figures 13, 96:
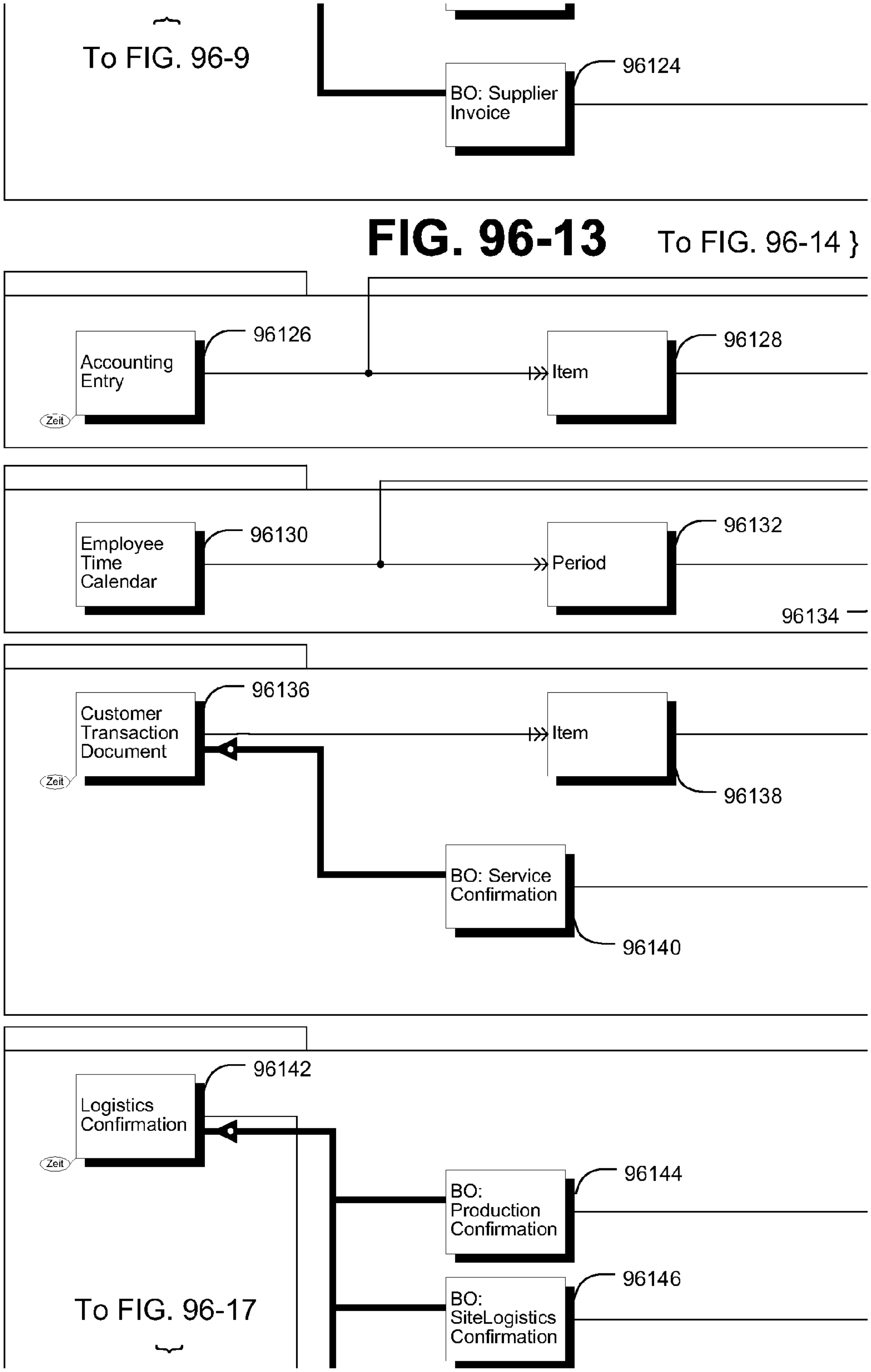
Figures 14, 96:
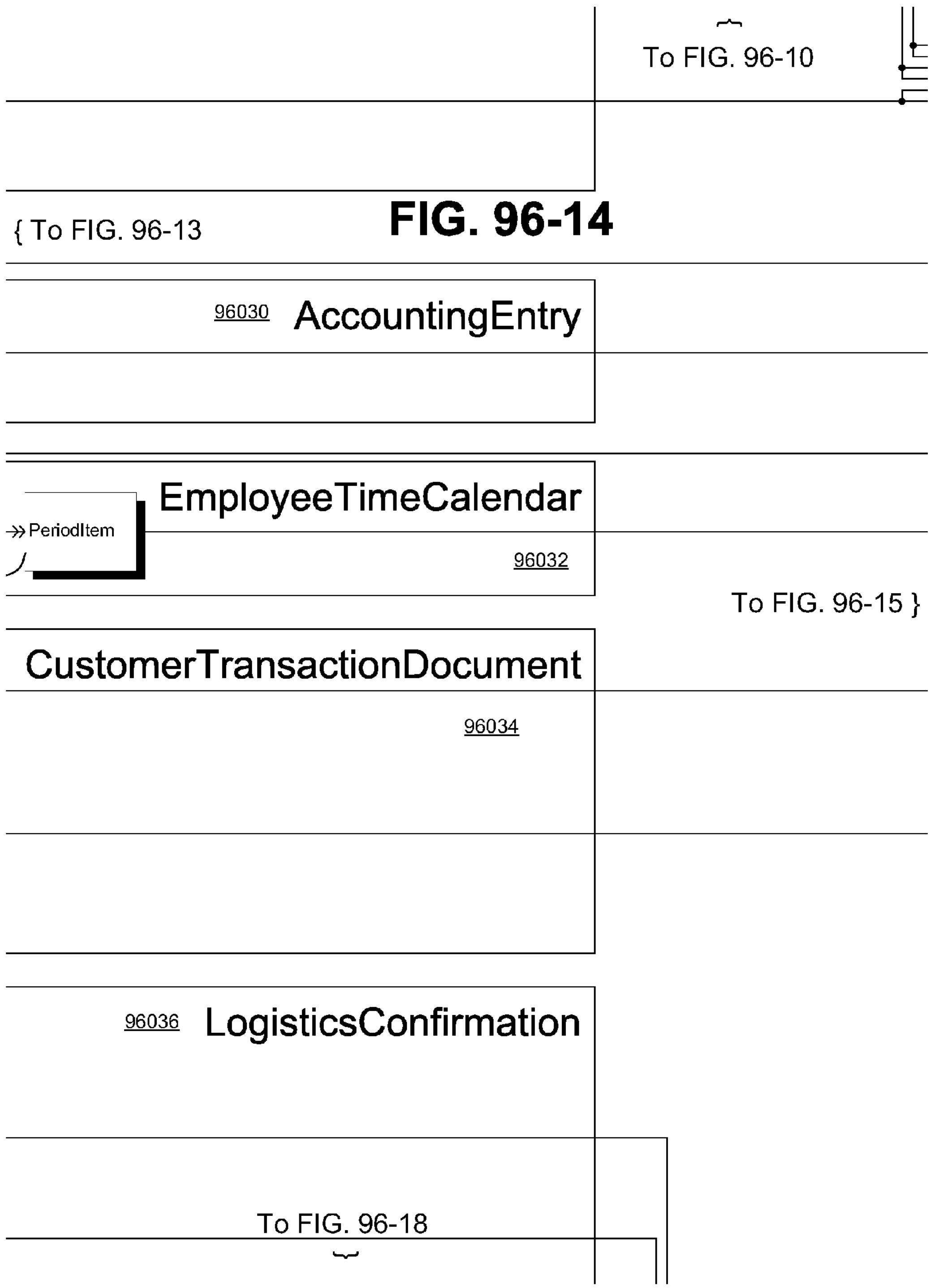
Figures 15, 96:
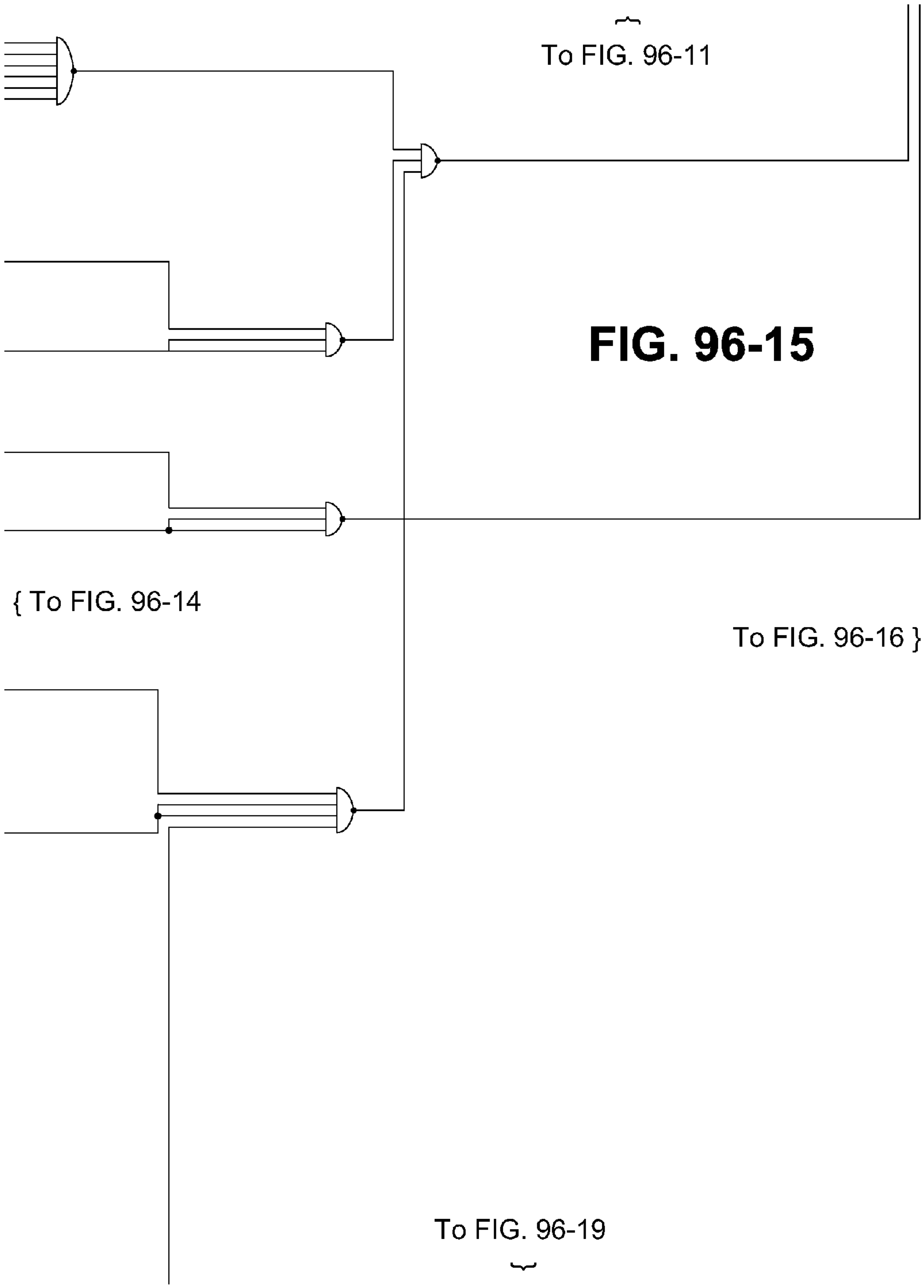
Figures 17, 96:
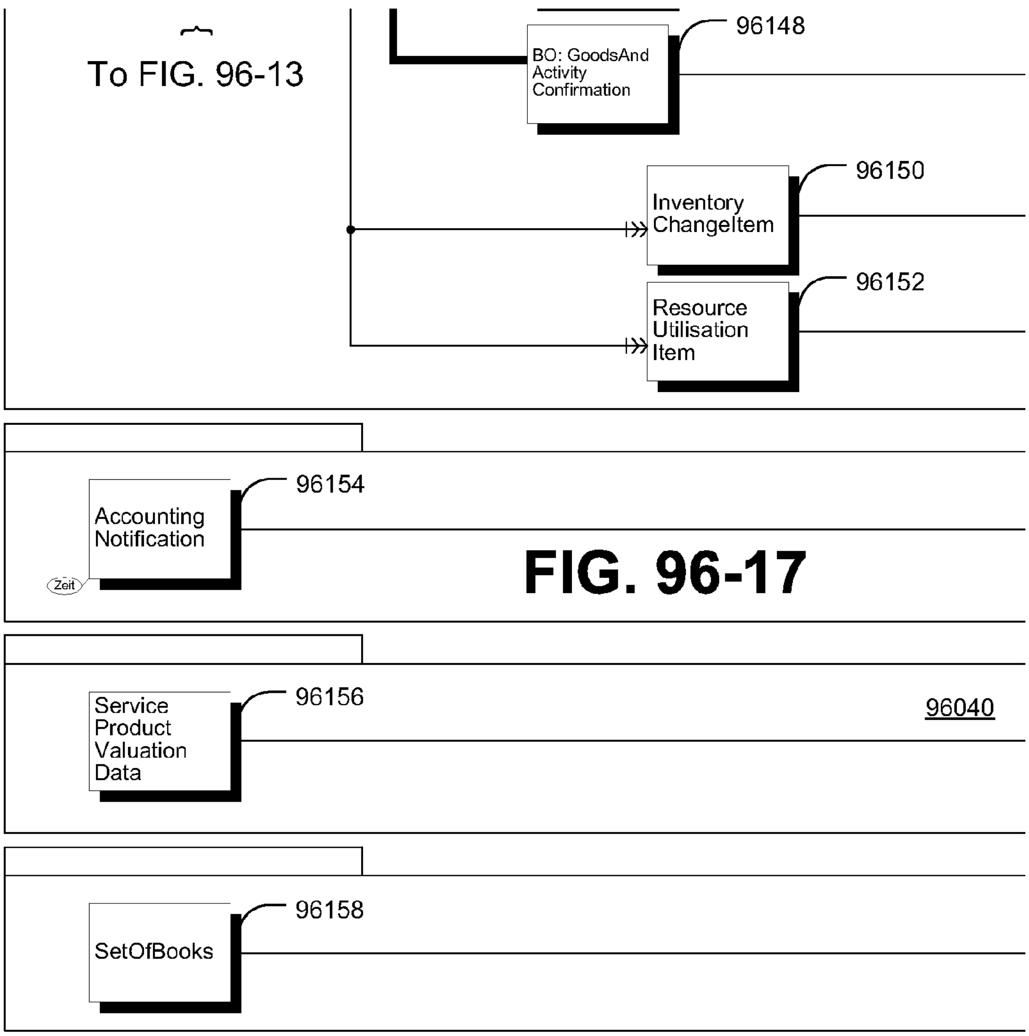
Figures 18, 96:
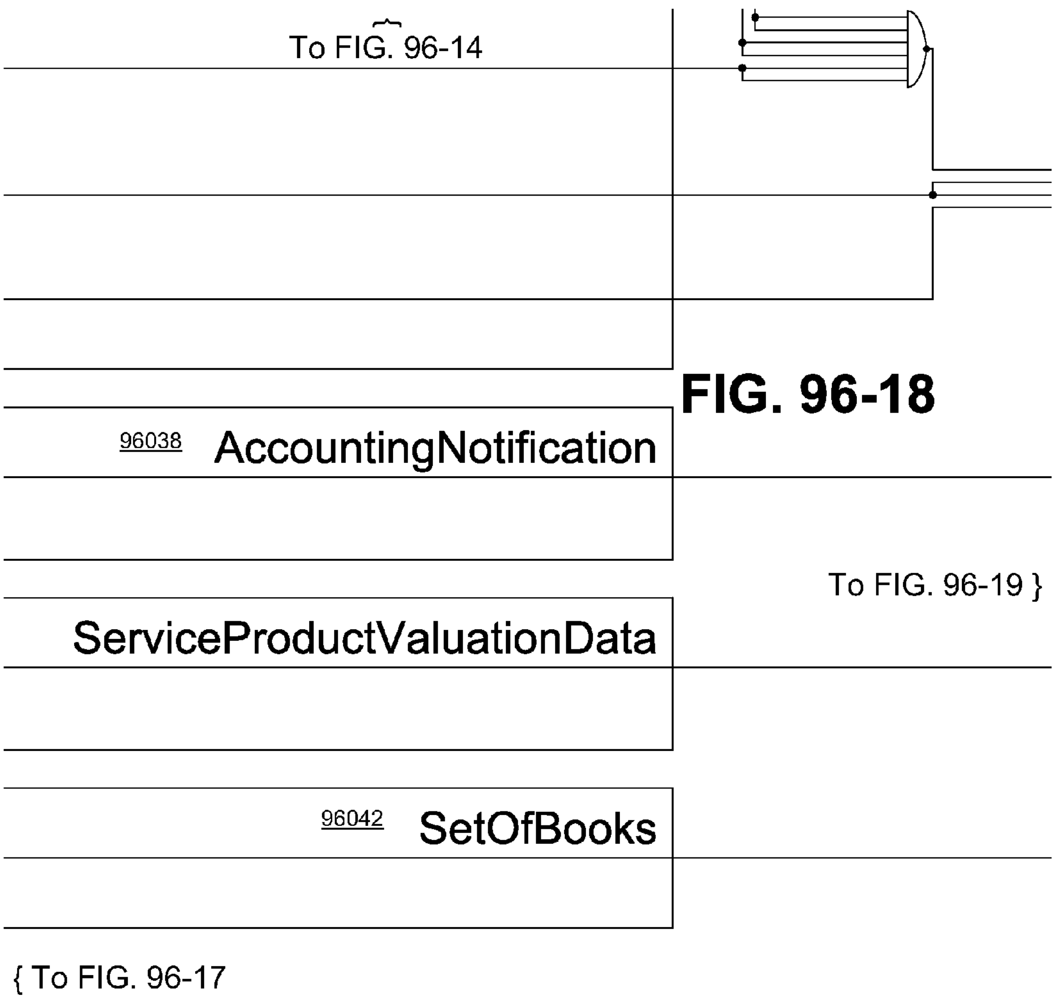
Figures 19, 96:
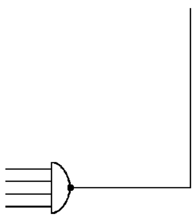

FIG. 96 illustrates one example of an OverheadCostLedgerAccount business object model 96000. Specifically, this figure depicts interactions among various hierarchical components of the OverheadCostLedgerAccount, as well as external components that interact with the OverheadCostLedgerAccount (shown here as 96002 through 96042 and 96060 through 96158). OverheadCostLedgerAccount is a record for a Company based on the principle of double-entry bookkeeping that reflects the effects of business transactions on the costs incurred in the provision of company resources (overhead). It serves as a structuring element for collecting and evaluating postings and for planning in the overhead cost ledger. Contains the overhead costs and the activity and consumption quantities of a company for a cost center, resource, or project task (project of the normal business activities of the company). In addition to individual movements related to business transactions, it contains period-based totals that summarize the individual movements along with period-based planned overhead costs. The business object OverheadCostLedgerAccount is part of the process component Accounting Processing.

Structure

The BO OverheadCostLedgerAccount contains the following components:

Root node 96044 indicates the object on which the overhead costs are recorded. It is specialized by:

CostCentreOverheadCostLedgerAccount 96048: The overhead costs are recorded for a cost center.

ResourceOverheadCostLedgerAccount 96050: The overhead costs are recorded for a resource.

ProjectOverheadCostLedgerAccount 96052: The overhead costs are recorded for a project in the sense of an internal, non-billable, non-capitalizable task with a limited life span.

PeriodTotal 96054: Period-based statement on the overhead costs and any associated consumption quantities for a cost center, resource, or project for a set of books.

Line Item 96046: Itemization of a change in the value and (if applicable) quantity of the overhead costs based on a single business transaction.

PlanPeriodTotal 96056: Period-based planned overhead costs for a cost center, resource, or project for a set of books.

OverheadCostLedgerAccount is represented by the root node OverheadCostLedgerAccount.

When a business transaction causing a quantity/value change to the OverheadCostLedgerAccount is posted, a set of rules determines which GeneralLedgerAccounts are involved. Posting the business transaction changes the quantity and/or value on the GeneralLedgerAccounts selected in this way by the same amount.

Creation of the BO OverheadCostLedgerAccount and any changes to it are always triggered by the BO AccountNotification or by projections of the BO template AccountingAdjustmentRun.

Node Structure of Business Object OverheadCostLedgerAccount Record for a Company based on the principle of double-entry bookkeeping that reflects the effects of business transactions on the costs incurred in the provision of company resources (overhead).

Serves as a structuring element for collecting and evaluating postings and for planning in the overhead cost ledger. Contains the overhead costs and the activity and consumption quantities of a company for a cost center, resource, or a resource or task of the normal business activities of the company, along with the company-based cost rates for the resources.

In addition to individual movements related to business transactions, it contains period-based totals that summarize the individual movements along with period-based planned overhead costs OverheadCostLedgerAccount occurs in the following complete and disjoint specializations:

CostCentreOverheadCostLedgerAccount: The overhead costs are recorded for a cost center.

ResourceOverheadCostLedgerAccount: The overhead costs are recorded for a resource.

ProjectOverheadCostLedgerAccount: The overhead costs are recorded for a project in the sense of an internal, non-billable, non-capitalizable task with a limited life span.

The term "offsetting" is used frequently. In particular, an Offsetting Subledger Account is a Subledger Account that contains—with reference to the same Accounting Document—the inverse representation of the business transaction stated in a Subledger Account Line Item. The inverse representation is required by the double entry bookkeeping principle. The compliance with this principle leads to a zero balance of the Accounting Document that completely represents the Business transaction. An example for offsetting is: an Inventory Change Item of a Production Lot Confirmation has to be represented as a debit Line Item of a Production Ledger Account and as an inverse credit Line Item of a Material Ledger Account.

Subsequently also a generic approach for referencing Original Entry Documents is used, where an Original Entry Document is a document that is necessary for auditing purposes and verifies that the value stated in the Line Item of a ledger account has been booked on the base of a real business transaction.

An Original Entry Document may be contained in another Object, the Original Entry Document Containing Object. Typical such constellations are:

FinancialAuditTrailDocumentation contained in a Host Object like DuePayment, DueClearing, Dunning, and PaymentAllocation from Operative Financials.

LogSection contained in all AccountingAdjustmentRunMDROs (e.g. InventoryPriceChangeRun, GeneralLedgerAccountBalanceDistributionRun, FixedAssetDepreciationRun, WorkInProcessClearingRun)

SettlementResultAccounting contained in an ExpenseReport

PeriodItem contained in an EmployeeTimeCalendar

The elements located directly at the node OverheadCostLedgerAccount are defined by the type GDT: OverheadCostLedgerAccountElements. These elements may include: UUID, CompanyUUID, OverheadCostLedgerAccountTypeCode, CostCentreUUID, ResourceValuationDataUUID, FinancialAccountingViewOfProjectTaskUUID, FinancialAccountingViewOfProjectTaskUUID, CostManagementFunctionalUnitUUID, The UUID is a GDT of a type UUID and contains a universally unique identification of the OverheadCostLedgerAccount. The CompanyUUID is a GDT of a type UUID and contains a universally unique identification of the Company for which the OverheadCostLedgerAccount is carried. The OverheadCostLedgerAccountTypeCode is a UUID of a type OverhearCostLedgerAccountTypeCode and denotes the subtype of the OverheadCostLedgerAccount: CostCentreOverheadCostLedgerAccount, ResourceOverheadCostLedgerAccount, or ProjectOverheadCostLedgerAccount in accordance with the specializations of the root node. The CostCentreUUID is a GDT of a type UUID and contains a universally unique identification of the cost center for which the OverheadCostLedgerAccount records business transactions. The element CostCentreUUID is filled if the element OverheadCostLedgerAccountTypeCode has the value CostCentreOverheadCostLedgerAccount. The ResourceValuationDataUUID is a GDT of a type UUID and contains a universally unique identification of the ResourceValuationData for which the OverheadCostLedgerAccount records business transactions. The element ResourceValuationDataUUID is filled if and only if the element OverheadCostLedgerAccountTypeCode has the value ResourceOverheadCostLedgerAccount. The FinancialAccountingViewOfProjectTaskUUID is a GDT of a type UUID and contains a universally unique identification of the Financial Accounting View Of Project Task for which the OverheadCostLedgerAccount records business transactions. The element FinancialAccountingViewOfProjectTaskUUID is filled if the element OverheadCostLedgerAccountTypeCode has the value ProjectOverheadCostLedgerAccount.

The CostManagementFunctionalUnitUUID is a GDT of a type UUID and contains a universally unique identification of a Functional Unit that is responsible for processing the Overhead Cost Ledger Account. The referenced Functional Unit can be responsible for the Organisational Function 'Cost Management', i.e. the OrganisationalFunctionCode on one of the FunctionalUnitAttributes nodes of the FunctionalUnit can have the value '24' (CostManagement).

The following relationships to subordinate nodes exist:

PeriodTotal may have a cardinality relationship of 1:cn.

LineItem may have a cardinality relationship of 1:cn.

PlanPeriodTotal may have a cardinality relationship of 1:cn.

AccessControlList 96058 may have a cardinality relationship of 1:1.

There may be a number Inbound Aggregation Relationships including:

From business object Company: Company may have a cardinality relationship of 1:cn.

Denotes the Company for which the account is carried.

From business object CostCentre: CostCentre may have a cardinality relationship of c:cn.

The association exists if the OverheadCostLedgerAccount is of the type CostCentreOverheadCostLedgerAccount.

From business object ResourceValuationData: ResourceValuationData may have a cardinality relationship of c:cn. The association exists if the OverheadCostLedgerAccount is of the type ResourceOverheadCostLedgerAccount.

From business object FinancialAccountingViewOfProject: FinancialAccountingViewOfProjectProjectTask may have a cardinality relationship of c:cn. The association exists if and only if the OverheadCostLedgerAccount is of the type ProjectOverheadCostLedgerAccount.

Inbound Association Relationships:

From business object FunctionalUnit: CostManagementFunctionalUnit may have a cardinality relationship of c:cn. The Functional Unit that is responsible for processing the Overhead Cost Ledger Account.

Enterprise Service Infrastructure Actions

DoCostCentreAssessment: The action DoCostCentreAssessment assesses the costs accumulated on the cost centers during the period to other cost centers.

Preconditions:

The action can only be executed on OverheadCostLedgerAccounts of the type CostCentreOverheadCostLedgerAccount. The action can be executed at any time.

Resulting changes in the object: Cost center assessment generates line items and adjusts the period totals accordingly. The affected nodes are Line Item and PeriodTotal.

Resulting changes in other objects: The action generates AccountingDocuments. Also, in the OverheadCostLedgerAccounts of the cost centers to which the costs are assessed, line items (Line Item node) are generated and the existing period total record (PeriodTotal node) adjusted or a new one created.

Parameters: The action elements are defined by the data type: OverheadCostLedgerAccountDoCostCentreAssessmentActionElements. These elements may include: MassDataRunObjectID, MassDataRunObjectTypeCode, CompanyUUID, SetOfBooksID. The MassDataRunObjectID is a GDT of a type MassDataRunObjectID and contains a universally unique identifier for an Accounting Adjustment Run. The MassDataRunObjectTypeCode is a GDT of a type MassDataRunObjectTypeCode and contains a coded representation of a type of the Mass Data Run Object. The CompanyUUID is a GDT of a type UUID and contains a universally unique identifier for the company, for which the action is executed; CompanyUUID is transferred only then when processing of the Accounting Adjustment Run is executed per company and set of books. TheSetOfBooksID is a GDT of a type SetOfBooksID and contains the identification of the set of books, for which the action is executed. SetOfBooksID is only transferred when processing of the Accounting Adjustment Run is executed per company and set of books. Usage: The action is executed exclusively by the projection OverheadCostAssessmentRun of the BO template AccountingAdjustmentRun.

CalculateOverheadCosts: The action CalculateOverheadCosts calculates overhead costs on projects.

Preconditions:

The action can be executed on OverheadCostLedgerAccounts of the type ProjectOverheadCostLedgerAccount. The action can be executed at any time.

Resulting changes in the object: The action generates line items and adjusts the period totals accordingly. The affected nodes are Line Item and PeriodTotal.

Resulting changes in other objects: The action generates AccountingDocuments. Also, in the OverheadCostLedgerAccounts of the projects to which the costs are allocated, line items (Line Item node) are generated and the existing period total record (PeriodTotal node) adjusted or a new one created.

Changes to the status: does not apply

Parameters: The action elements are defined by the data type: OverheadCostLedgerAccountDoOverheadCostCalculationActionElements. These elements may include: MassDataRunObjectID, MassDataRunObjectTypeCode, CompanyUUID, SetOfBooksID. The MassDataRunObjectID is a GDT of a type MassDataRunObject ID and contains a universally unique identifier for an Accounting Adjustment Run. The MassDataRunObjectTypeCode is a GDT of a type MassDataRunObjectTypeCode and contains a coded representation of a type of the Mass Data Run Object. The CompanyUUID is a GDT of a type UUID and contains a universally unique identifier for the company, for which the action is executed. CompanyUUID is transferred only then when processing of the Accounting Adjustment Run is executed per company and set of books. The SetOfBooksID is a GDT of a type SetOfBooksID and contains an identification of the set of books, for which the action is executed. SetOfBooksID is only transferred when processing of the Accounting Adjustment Run is executed per company and set of books. Usage: The action is executed exclusively by the projection OverheadCostLedgerAccountOverheadCostCalculationRun of the BO template AccountingAdjustmentRun.

Queries

QueryByCostCentre:

Provides a list of OverheadCostLedgerAccounts of type CostCentreOverheadCostLedgerAccount where the record refers to the cost center specified by the parameter CostCentreID.

The query elements are defined by the data type OverheadCostLedgerAccountCostCentreQueryElements. These elements may include: CostCentreUUID and CostCentreID. The CostCentreUUID is a GDT of a type UUID. The CostCentreID is a GDT of a type organizationalCentreID and contains the identification of the cost centre which the OverheadCostLedgerAccount refers to. One of the above parameters can be applied.

QueryByResourceCostCentre:

Provides a list of OverheadCostLedgerAccounts of type ResourceOverheadCostLedgerAccount where the record refers to a resource to which a cost center specified by the parameter ResourceCostCentreID is assigned.

The query elements are defined by the data type: OverheadCostLedgerAccountResourceCostCentreQueryElements.

These elements may include:

ResourceCostCentreUUID, ResourceCostCentreID. The ResourceCostCentreUUID is a GDT of a type UUID and contains a universally unique identification of the cost centre assigned to the resource which the OverheadCostLedgerAccount refers to. The ResourceCostCentreID is a GDT of the type OrganisationalCentreID and contains the identification of the cost centre assigned to the resource which the OverheadCostLedgerAccount refers to and it is. One of the above parameters can be supplied.

QueryByResource:

Provides a list of OverheadCostLedgerAccounts of type ResourceOverheadCostLedgerAccount where the record refers to the resource specified by the parameter ResourceID.

The query elements are defined by the data type: OverheadCostLedgerAccountResourceQueryElements. These elements may include: ResourceValuationDataUUID, ResourceUUID, ResourceID: The ResourceValuationDataUUID is a GDT of a type UUID. The ResourceUUID is a GDT of a type UUID and contains a universally unique identification of the resource which the OverhearCostLedgerAccount refers to. The ResourceID is a GDT of a type and contains the identification of the resource which the OverheadCostLedgerAccount refers to. One of the above parameters can be supplied.

QueryByProjectTask:

Provides a list of OverheadCostLedgerAccounts of type ProjectOverheadCostLedgerAccount where the record refers to project task specified by the parameter ProjectTaskID.

The query elements are defined by the data type: OverheadCostLedgerAccountProjectTaskQueryElements. These elements may include: FinancialAccountingViewOfProjectTaskUUID, FinancialAccountViewOfProjectTaskReferenceUUID, FinancialAccountingViewOfProjectTaskReferenceFormattedID. The FinancialAccountingViewOfProjectTaskUUID is a GDT of a type UUID. The FinancialAccountingViewOfProjectTaskReferenceUUID is a GDT of a type UUID and contains a universally unique identification of the project task which the OverheadCostLedgerAccount refers to. The FinancialAccountingViewOfProjectTaskReferenceFormattedID is a GDT of a type ObjectNodeFormattedID and contains the identification of the project task which the OverheadCostLedgerAccount refers to. One of the above parameters can be supplied.

QueryByProjectTaskCostCentre:

Provides a list of the OverheadCostLedgerAccounts of type ProjectOverheadCostLedgerAccount where the record refers to a project task whose responsible cost center is the cost center specified by the parameter ResponsibleCostCentreID, or where the record refers to a project task whose requesting cost center is the cost center specified by the parameter RequestingCostCentreID.

The query elements are defined by the data type: OverheadCostLedgerAccountProjectTaskCostCentreQueryElements. These elements may include: FinancialAccountingViewOfProjectTaskResponsibleCostCentreUUID, FinancialAccountingViewOfProjectTaskResponsibleCostCentreID, FinancialAccountingViewOfProjectTaskRequestingCostCentreUUID, FinancialAccountingViewOfProjectTaskRequestingCostCentreID. The FinancialAccountingViewOfProjectTaskResponsibleCostCentreUUID is a GDT of a type UUID and contains a universally unique identification of the cost centre which is assigned to the project task, which the OverheadCostLedgerAccount refers to, as responsible cost centre. The FinancialAccountingViewOfProjectTaskResponsibleCostCentreID is a GDT of a type OrganisationalCentreID and contains the identification of the cost centre which is assigned to the project task, which the OverheadCostLedgerAccount refers to, as responsible cost centre. The FinancialAccountingViewOfProjectTaskRequestingCostCentreUUID is a GDT of a type UUID and contains a universally unique identification of the cost centre which is assigned to the project task, which the OverheadCostLedgerAccount refers to, as requesting cost centre. The FinancialAccountingViewOfProjectTaskRequestingCostCentreID is a GDT or a type OrganisationalCentreID and contains the identification of the cost centre which is assigned to the project task, which the OverheadCostLedgerAccount refers to, as requesting cost centre.

(GDT: OrganisationalCentreID). One of the above parameters can be supplied.

QueryByElements:

Provides a list of the OverheadCostLedgerAccounts where the elements are as specified by the query elements.

The query elements are defined by the data type:

OverheadCostLedgerAccountElementsQueryElements.

These elements may include: UUID, OverheadCostLedgerAccountTypeCode, CompanyUUID, CompanyID, CostManagementFunctionalUnitUUID, CostManagementFunctionalUnitUUID, CostCenterUUID, CostCentreID, ResourceUUID, ResourceID, FinancialAccountingViewOfProjectTaskUUID, FinancialAccountingViewOfProjectTaskReferenceUUID, FinancialAccountingViewOfProjectTaskReferenceFormattedID. The UUID is a GDT of a type UUID. The OverheadCostLedgerAccountTypeCode is a GDT of a type OverheadCostLedgerAccountTypeCode. The CompanyUUID is a GDT of a type UUID. The CompanyID is a GDT of a type OrganisationalCentreID and contains the identification of the company which the OverheadCostLedgerAccount refers to. The CostManagementFunctionalUnitUUID is a GDT of a type UUID. The CostManagementFunctionalUnitUUID is a GDT of a type OrganisationalCentreID and contains the identification of the department that is responsible for Cost Management. One of the above two parameters may be supplied. The CostCentreUUID is aGDT of a type UUID. The CostCentreID is a GDT of a type OrganisationalCentreID and contains the identification of the cost centre which the OverheadCostLedgerAccount refers to. One of the above two parameters may be supplied. The ResourceValuationDataUUID is a GDT of a type UUID. The ResourceUUID is a GDT of a type UUID and contain the universally unique identification of the resource which the OverheadCostLedgerAccount refers to. The ResourceID is a GDT of a type ResourceID and contains the identification of the resource which the OverheadCostLedgerAccount refers to and it is options. One of the above three parameters may be supplied. The FinancialAccountingViewOfProjectTaskUUID is a GDT of a type UUID. The FinancialAccountingViewOfProjectTaskReferenceUUID is a GDT of a type UUID and contains a universally unique identification of the project task which the OverheadCostLedgerAccount refers to. The FinancialAccountingViewOfProjectTaskReferenceFormattedID is a GDT of a type ObjectNodeFormattedID and contains the identification of the project task which the OverheadCostLedgerAccount refers to. One of the above three parameters may be supplied.

PeriodTotal

Period-based statement on the overhead costs and any associated consumption quantities for a cost center, resource, or project for a set of books.

A PeriodTotal also relates to a chart-of-accounts item, the assignments of the cost center, resource, or project to a profit center, segment, and functional area, as well as an offsetting object (see OffsettingObject below).

Structure

The elements located directly at the PeriodTotal node are defined by the type GDT: OverheadCostLedgerAccountPeriodTotalElements. These elements may include: SetOfBooksID, SegmentUUID, ProfitCentreUUID, PartnerCompanyUUID, PartnerSegmentUUID, PartnerProfitCentreUUID, OffsettingSubledgerAmountUUID, OffsettingSubledgerAccountTypeCode, OriginOverheadCostLedgerAccountUUID, The ServiceProductValuationDataUUID, ChartOfAccountsCode, ChartOfAccountsItemCode, AccountingBusinessTransactionTypeCode, SubledgerAccountLine ItemTypeCode, CostRevenueElementCode, FiscalYearVariantCode, FiscalYearID, AccountingPeriodID, ExpenseClassificationFunctionalAreaCode, SubledgerAccountChargeTypeCode, LocalCurrencyAmount, SetOfBooksCurrencyAmount, HardCurrencyAmount, IndexBasedCurrencyAmount, ValuationQuantity, ValuationQuantityTypeCode, ResourceQuantity, ResourceQuantityTypeCode, ServiceProductQuantity, ServiceProductQuantityTypeCode. The SetOfBooksID is a GDT of a type SetOfBooksID and contains the universally unique identification of the SetOfBooks according to whose specifications the PeriodTotal was created and updated. The SegmentUUID is a GDT of a type UUID and contains the universally unique identification of the Segment to which the value and quantity of the period total are allocated. The ProfitCentreUUID is a GDT of a type UUID and contains the universally unique identification of the ProfitCentre to which the value and quantity of the period total are allocated. The PartnerCompanyUUID is a GDT of a type UUID and contains the universally unique identification of a Company that acts in the business transactions for which the PeriodTotal documents summarized quantities and values as an intra corporate partner. The PartnerSegmentUUID is a GDT of a type UUID and contains the universally unique identification of a Segment that acts in the business transactions for which the PeriodTotal documents summarized quantities and values as an intra corporate partner. The PartnerProfitCentreUUID is a GDT of a type UUID and it contains a universally unique identification of a ProfitCentre that acts in the business transactions for which the PeriodTotal documents summarized quantities and values as an intra corporate partner. The OffsettingSubledgerAccountUUID is a GDT of a type UUID and contains a universally unique identification of a sub-ledger account (such as a MaterialLedgerAccount) that states—required by the double entry bookkeeping principle—the inverse representation of the business transactions that are stated in the PeriodTotal. The OffsettingSubledgerAccountTypeCode is a GDT of a type SubledgerAccountTypeCode), Restriction: Only the code values 03 (Production Ledger Account), 07 (Sales Ledger Account), 09 (Overhead Cost Ledger Account), and 11 (Other Direct Cost Ledger Account) can occur and it contains a coded representation of the type of the offsetting sub-ledger account to which the PeriodTotal refers. The element OffsettingSubledgerAccountTypeCode is generally filled if the element OffsettingSubledgerAccountUUID is filled. The OriginOverheadCostLedgerAccountUUID is a GDT of a type UUID and contains a universally unique identification of an OverheadCostLedgerAccount from which a value flow stated in the PeriodTotal originally started. The ServiceProductValuationDataUUID is a GDT of a type UUID and it contains a universally unique identification of the ServiceProductValuationData about the service product that was exchanged between the OverheadCostLedgerAccount and the offsetting sub-ledger account of the business transactions summarized in the PeriodTotal. Since the ServiceProduct can influence the valuation of these business transactions, this reference enables the summary revaluation of these business transactions. This element is generally filled if the element AccountingBusinessTransactionTypeCode has the value ‘Internal Service Provision’. The ChartOfAccountsCode is a GDT of a type ChartOfAccountsCode and contains a coded representation of the ChartOfAccounts that contains the ChartOfAccountsItem that classifies the value stated in the PeriodTotal. The ChartOfAccountsItemCode is a GDT of a type CharOfAccountsItemCode and contains a coded representation of a ChartOfAccountsItem that classifies—for general ledger accounting purposes—the value stated in the PeriodTotal. The AccountingBusinessTransactionTypeCode is a GDT of a type AccountingBusinessTransactionTypeCode and contains a coded representation of the type of the business transactions for which the PeriodTotal keeps summarized quantities and values. It classifies the business transactions according to Accounting criteria. The SubledgerAccountLine ItemTypeCode is a GDT of a type SubledgerAccountLine ItemTypeCode). In some cases, only code values “service provision”, “overhead cost assessment”, “overhead cost”, “material consumption”, “service product consumption”, and “general expense” may occur and contains a coded representation of the type of the SubledgerAccountLine Items whose amounts and quantities are summarized in the PeriodTotal. The CostRevenueElementCode is a GDT of a type CostRevenueElementCode and contains a coded representation of the value component that classifies the value that flowed from the OffsettingLedgerAccount to the OverheadCostLedgerAccount or vice-versa. The FiscalYearVariantCode is a GDT of a type FiscalYearVariantCode and contains a coded representation of the FiscalYearVariant according to whose fiscal year definition (begin, end, period definition) the FiscalYearID and the AccountingPeriodID are derived. The FiscalYearID is a GDT of a type FiscalYearID and contains the identification of the fiscal year in which the Line Item are posted for which the PeriodTotal keeps summarized values and quantities. The AccountingPeriodID is a GDT of a type AccountingPeriodID and contains the identification of the accounting period in which the Line Item are posted for which the PeriodTotal keeps summarized values and quantities. The ExpenseClassificationFunctionalAreaCode is a GDT of a type ExpenseClassificationFunctionalAreaCode and contains a coded representation of the functional area to which the value and quantity of the PeriodTotal are allocated. The SubledgerAccountChargeTypeCode is a GDT of a type SubledgerAccountChargeTypeCode), and contains a coded representation of the type of OverheadCostLedgerAccount debit or credit for which the period total keeps values and quantities. The LocalCurrencyAmount is a GDT of a type Amount and contains the value of the period total in the local currency of the Company carrying the OverheadCostLedgerAccount. The local currency is the currency in which the local books are kept.

Integrity condition: The value reported here matches the total of all values in local currency that are documented in the Line Items. The SetOfBooksCurrencyAmount is a GDT of a type Amount and contains the value of the period total in the currency selected for the set of books.

Integrity condition: The value reported here matches the total of all values in the additional currency selected for the set of books that are documented in the Line Items. The HardCurrencyAmount is a GDT of a type Amount and contains the value of the period total in the hard currency of the country of the Company carrying the OverheadCostLedgerAccount. The hard currency is a stable, country-specific currency that is used in high-inflation countries. The value reported here generally matches the total of all values in the hard currency that are documented in the Line Items. The IndexBasedCurrencyAmount is a GDT of a type Amount and contains the value of the period total in the index-based currency of the country of the Company carrying the OverheadCostLedgerAccount. The index-based currency is a fictitious, country-specific currency that is used in high-inflation countries as a comparison currency for reporting. The ValuationQuantity is a GDT of a type Quantity and contains the quantity of the period total in the valuation unit of measurement of the material, service product, or resource. The valuation unit is the unit in which consumed or provided materials, service products or resources are valuated in Financial Accounting. Integrity condition: The value reported here generally matches the total of all values in the valuation quantity that are documented in the Line Items. The ValuationQuantityTypeCode is a GDT of a type QuantityTypeCode, Qualifier: Valuation and contains a coded representation of the type of the valuation quantity. The ResourceQuantity is a GDT of a type Quantity, Qualifier: Resource and contains the quantity of resource consumption of the period total, in the capacity unit of measurement of the resource.

Integrity condition: This element is generally filled. The AccountingBusinessTransactionTypeCode is a GDT of a type Quantity, Qualifier: Resource and has the value "Internal Service Provision". The ResourceQuantityTypeCode is a GDT of a type QuantityTypeCode, Qualifier: Resource and contains a coded representation of the type of the ResourceQuantity. Integrity condition: The element ResourceQuantityTypeCode can be filled if the element ResourceQuantity is filled. The ServiceProductQuantity is a GDT of a type Quantity, Qualifier: ServiceProduct and contains the quantity of service provision of the period total, in the base unit of measurement of the service product. Integrity condition: This element if filled if the element AccountingBusinessTransactionTypeCode has the value "Internal Service Provision". The ServiceProductQuantityTypeCode is a GDT of a type QuantityTypeCode, Qualifier: ServiceProduct and contains a coded representation of the type of the ServiceProductQuantity. Integrity condition: The element ServiceProductQuantityTypeCode can be filled if the element ServiceProductQuantity is filled.

The may be a number of Inbound Aggregation Relationships including:

From business object SetOfBooks: SetOfBooks may have a cardinality relationship of 1:cn.

A SetOfBooks according to whose specifications the PeriodTotal was created and updated.

From business object Company: PartnerCompany may have a cardinality relationship of c:cn.

A Company that acts in the business transactions for which the PeriodTotal documents summarized quantities and values as an intra corporate partner.

From business object Segment: Segment may have a cardinality relationship of c:cn.

A Segment to which the values of the PeriodTotal are assigned.

PartnerSegment may have a cardinality relationship of c:cn.

A Segment that acts in the business transactions for which the PeriodTotal documents summarized quantities and values as an intra corporate partner.

From business object ProfitCentre: ProfitCentre may have a cardinality relationship of c:cn.

A ProfitCentre to which the values of the PeriodTotal are assigned.

PartnerProfitCentre may have a cardinality relationship of c:cn.

A ProfitCentre that acts in the business transactions for which the PeriodTotal documents summarized quantities and values as an intra corporate partner.

From business object OverheadCostLedgerAccount: OriginOverheadCostLedgerAccount may have a cardinality relationship of c:cn.

Denotes an OverheadCostLedgerAccount from which a value flow stated in the PeriodTotal originally started.

From business object ServiceProductValuationData: ServiceProductValuationData may have a cardinality relationship of c:cn.

Denotes the ServiceProductValuationData which the period total relates to.

Constraint with the following relationships: One and only one of these relationships may exist.

From business object OverheadCostLedgerAccount:

OffsettingOverheadCostLedgerAccount may have a cardinally relationship of c:cn.

Denotes the OverheadCostLedgerAccount to which the period total relates as the OffsettingSubLedgerAccount.

From business object OtherDirectCostLedgerAccount:

OffsettingOtherDirectCostLedgerAccount may have a cardinality relationship of c:cn.

Denotes the OtherDirectCostLedgerAccount to which the period total relates as the OffsettingSubLedgerAccount.

From business object ProductionLedgerAccount:

OffsettingProductionLedgerAccount may have a cardinality relationship of c:cn.

Denotes the ProductionLedgerAccount to which the period total relates as the OffsettingSubLedgerAccount.

From business object SalesLedgerAccount:

OffsettingSalesLedgerAccount may have a cardinality relationship of c:cn.

Denotes the SalesLedgerAccount to which the period total relates as the OffsettingSubLedgerAccount.

Queries

QueryByElements:

Provides a list of PeriodTotals where the elements are as specified by the query parameters.

The query elements are defined by the data type OverheadCostLedgerAccountPeriodTotalElementsQueryElements. These elements may include: OverheadCostLedgerAccountCostCentreUUID, OverheadCostLedgerAccountCostCentreID OverheadCostLedgerAccountResourceValuationDataUUID, OverheadCostLedgerAccountResourceUUID, OverheadCostLedgerAccountResourceID, OverheadCostLedgerAccountFinancialAccountingViewOfProjectTaskUUID, OverheadCostLedgerAccountFinancialAccountingViewOfProjectTaskReferenceUUID, OverheadCostLedgerAccountFinancialAccountingViewOfProjectTaskReferenceFormattedID, SetOfBooksID, ChartOfAccountsCode, ChartOfAccountsItemCode, SubledgerAccountLine ItemTypeCode, AccountingBusinessTransactionTypeCode, CostRevenueElementCode, FiscalYearVariantCode, FiscalYearID, AccountingPeriodID, SegmentUUID, SegmentID, ProfitCentreUUID, ExpenseClassificationFunctionalAreaCode, PartnerCompanyUUID, PartnerSegmentUUID, PartnerSegmentID, PartnerProfitCentreUUID, PartnerProfitCentreID, OffsettingSubledgerAccountUUID, OffsettingSubledgerAccountTypeCode, OriginOverheadCostLedgerAccountUUID, ServiceProductValuationDataUUID, SubledgerAccountChargeTypeCode, ServiceProductBasedValuationIndicator. The OverheadCostLedgerAccountCostCentreUUID is a GDT of a type UUID and contains a universally unique identification of the cost centre which the OverheadCostLedgerAccount relates to. The OverheadCostLedgerAccountCostCentreID is a GDT of a type OrganisationalCentrelID and contains the identification of the cost centre which the OverheadCostLedgerAccount relates to. The OverheadCostLedgerAccountResourceValuationDataUUID is a GDT of a type UUID and contains a universally unique identification of the ResourceValuationData for the resource which the OverheadCostLedgerAccount relates to. The OverheadCostLedgerAccountResourceUUID is a GDT of a type UUID and containing a universally unique identification of the resource which the OverheadCostLedgerAccount relates to. The OverheadCostLedgerAccountResourceID is a GDT of a type OrganisationalCentreID and contains the identification of the resource which the OverheadCostLedgerAccount relates to. The OverheadCostLedgerAccountFinancialAccountingViewOfProjectTaskUUID is a GDT of a type UUID. The OverheadCostLedgerAccountFinancialAccountingViewOfProjectTaskReferenceUUID is a GDT of a type UUID and contains a universally unique identification of the project task which the OverheadCostLedgerAccount refers to. The OverheadCostLedgerAccountFinancialAccountingViewOfProjectTaskReferenceFormattedID is a GDT of a type ObjectNodeFormattedID and contains the identification of the project task which the OverheadCostLedgerAccount refers to. One of the above seven parameters referring to the root node can be supplied. The SetOfBooksID is a GDT of a type SetOfbooksID. The ChartOfAccountsCode is a GDT of a type chartOfAccountsCode. The ChartOfAccountsItemCode is a GDT of a type ChartOfAccountsItemCode. The SubledgerAccountLine ItemTypeCode is a GDT of a type SubledgerAccountLine ItemTypeCode. The AccountingBusinessTransactionTypeCode is a GDT of a type AccountingBusinessTransactionTypeCode. The CostRevenueElementCode is a GDT of a type CostRevenueElementCode. The FiscalYearVariantCode is a GDT of a type FiscalYearCode. The FiscalYearID is a GDT of a type FiscalYearID. The AccountingPeriodID is a GDT of a type AccountingPeriodID. The SegmentUUID is a GDT of a type UUID. The SegmentID is a GDT of a type OrganisationalCentreID and contains the identification of the segment to which the period total is allocated. The ProfitCentreUUID is a GDT of a type UUID. The ProfitCentreID is a GDT of a type OrganisationalCentreID and contains the identification of the profit center to which the period total is allocated. The ExpenseClassificationFunctionalAreaCode is a GDT of a type ExpenseClassificationFunctionalAreaCode. The PartnerCompanyUUID is a GDT of a type UUID. The PartnerCompanyID is a GDT of a type OrganisationalCentreID and contains the identification of a company that acts as an intra corporate partner. The PartnerSegmentUUID is a GDT of a type UUID. The PartnerSegmentID is a GDT of a type OrganisationalCentreID and contains the identification of a segment that acts as an intra corporate partner. The PartnerProfitCentreUUID is a GDT of a type UUID. The PartnerProfitCentreID is a GDT of a type OrganisationalCentreID and contains the identification of a profit center that acts as an intra corporate partner. The OffsettingSubledgerAccountUUID is a GDT of a type UUID. The OffsettingSubledgerAccountTypeCode is a GDT of a type SubledgerAccountTypeCode. The OriginOverheadCostLedgerAccountUUID is a GDT of a type UUID. The ServiceProductValuationDataUUID is a GDT of a type UUID. The SubledgerAccountChargeTypeCode is a GDT of a type SubledgerAccountChargeTypeCode. The ServiceProductBasedValuationIndicator is a GDT of a type ServiceProductBasedValuationIndicator.

LineItem

Itemization of a change in the value and (if applicable) quantity of the overhead costs based on a single business transaction. It contains detailed information from the accounting-based representation of the business transaction, such as the posting date and a PrimaNota reference.

Structure

The elements located directly at the Line Item node are defined by the type GDT: OverheadCostLedgerAccountLine ItemElements. These elements may include: UUID, SetOfBooksID, SegmentUUID, ProfitCentreUUID, PartnerCompanyUUID, PartnerSegmentUUID, PartnerProfitCentreUUID, PartnerProfitCentreUUID, AccountingDocumentUUID, AccountingDocumentID, AccountingDocumentItemID, OriginalEntryDocumentContainingObjectReference, OriginalEntryTransactionUUID, OriginalEntryDocumentReference, OriginalEntryDocumentItemReference, OriginalEntryDocumentItemTypeCode, OriginalEntryDocumentPartnerID, AccountingNotificationUUID, AccountingNotificationItemGroupItemUUID, GeneralLedgerAccountLineItemUUID, GeneralLedgerAccountLineItemAccountingDocumentItemGroupID, OffsettingSubledgerAccountUUID, OffsettingSubledgerAccountTypeCode, OriginOverheadCostLedgerAccountUUID, ServiceProductValuationDataUUID, AccountingBusinessTransactionTypeCode, ChartOfAccountsCode, ChartOfAccountsItemCode, AccountingBusinessTransactionTypeCode, TypeCode, CostRevenueElementCode, AccountingDocumentTypeCode, AccountingDocumentReference, AccountingDocumentReference, AccountingDocumentItemNote, ProductTaxTypeCode, ProductTaxDueCategoryCode, ProductTaxEventTypeCode, ProductTaxRateTypeCode, ProductTaxCountryCode, WithholdingTaxTypeCode, WithholdingTaxEventTypeCode, WithholdingTaxRateTypeCode, WitholdingTaxCountryCode, PostingDate, OriginalEntryDocumentDate, AccountingBusinessTransactionDate, CurrencyConversionDate, FiscalYearVariantCode, FiscalYearID, AccountingPeriodID, AccountingClosingStepCode, AccountingDocumentItemAccountingGroupID.

The UUID is a GDT of a type UUID and contains a universally unique identification of the Line Item. The SetOfBooksID os a GDT of a type SetOfBooksID and contains a unique identification of the SetOfBooks according to whose specifications the Line Item was created. The SegmentUUID is a GDT of a type UUID and contains a universally unique identification of the Segment to which the value and quantity of the Line Item is/are allocated. The ProfitCentreUUID is a GDT of a type UUID and contains a universally unique identification of the ProfitCentre to which the value and quantity of the Line Item is/are allocated. The PartnerCompanyUUID is a GDT of a type UUID and contains a universally unique identification of a Company that acts in the business transaction stated in the Line Item as an intra corporate partner. The PartnerSegmentUUID is a GDT of a type UUID and contains a universally unique identification of a Segment that acts in the business transaction stated in the Line Item as an intra corporate partner. The PartnerProfitCentreUUID is a GDT of a type UUID and contains a universally unique identification of a ProfitCentre the that acts in the business transaction stated in the Line Item as an intra corporate partner. The AccountingDocumentUUID is a GDT of a type UUID and contains a universally unique identification of the AccountingDocument that records the entire business transaction in Accounting. The AccountingDocumentID id a GDT of a type BusinessTransactionDocumentID and contains a unique identification of the AccountingDocument that records the entire business transaction in Accounting. The AccountingDocumentItemID is a GDT of a type BusinessTransactionDocumentItemID and contains a unique identification of the corresponding AccountingDocumentItem in the AccountingDocument which records the value change according to the criteria of GeneralLedger. The OriginalEntryDocumentContainingObjectReference is a GDT of a type ObjectNodeReference, Qualifier: OriginalEntryDocumentContaining and contains a reference to an Object containing the Original Entry Document. The OriginalEntryTransactionUUID is a GDT of a type UUID and contains a universally unique Identifier of the transaction during which the Original Entry Document was created or changed. The OriginalEntryDocumentReference is a GDT of a type ObjectNodeReference and contains a reference to the document, that keeps the original entry of the business transaction. The OriginalEntryDocumentItemReference is a GDT of a type ObjectNodeReference and contains a reference to an item of the OriginalEntryDocument. The value change recorded in the Line Item can be verified. by that item of the OriginalEntryDocument. The OriginalEntryDocumentItemTypeCode is a GDT of a type BusinessTransactionDocumentItemTypeCode and contains a coded representation of the Item Type of the referred OriginalEntryDocumentItem. This element can be used if the Original Entry Document is a Business Transaction Document. The OriginalEntryDocumentPartnerID is a GDT of a type BusinessTransactionDocumentID and contains the identification of the Original Entry Document as assigned by the business partner. (For example, the ID of the Supplier Invoice assigned by the Supplier). This element can be used if the Original Entry Document is a Business Transaction Document and if the Original Entry Document is identical to the Original Entry Document Containing Object. The AccountingNotificationUUID is a GDT of a type UUID and contains a universally unique identification of the notification sent to Financial Accounting about the business transaction stated in the Line Item. The AccountingNotificationItemGroupItemUUID is a GDT of a type UUID and contains a universally unique identification of the Accounting Notification Item Group Item, which triggered the posting of this Overhead Cost Ledger Account Line Item ant it is. The GeneralLedgerAccountLineItemUUID is a GDT of a type UUID and contains a universally unique identification of a Line Item of a GeneralLedgerAccount that records the value change of the OverheadCostLedgerAccountLineItem in the GeneralLedger. The GeneralLedgerAccountLineItemAccountingDocumentItemGroupID is a GDT of a type BusinessTransactionDocumentItemGroupID and contains a universally unique identification of the group of all AccountingDocumentItems that are summarized together in a GeneralLedgerAccountLine Item. The Line Item corresponds to exactly one AccountingDocumentItem belonging to the group. The OffsettingSubledgerAccountUUID is a GDT of a type UUID and contains a universally unique identification of a SubledgerAccount (such as a MaterialLedgerAccount) in whose Line Items the inverse representation of the business transaction is stated. The OffsettingSubledgerAccountTypeCode is a GDT of a type SubledgerAccountTypeCode), Restriction: Only the code values 01 (Fixed Asset), 02 (Material Ledger Account), 03 (Production Ledger Account), 04 (Purchase Ledger Account), 08 (Sales Ledger Account), 09 (Overhead Cost Ledger Account), and 11 (Other Direct Cost Ledger Account) can occur and contains a coded representation of the type of the OffsettingSubledgerAccount to which the OverheadCostLedgerAccountLine Item refers. The OriginOverheadCostLedgerAccountUUID is a GDT of a type UUID and contains a universally unique identification of an OverheadCostLedgerAccount from which a value flow originally started and it is The ServiceProductValuationDataUUID is a GDT of a type UUID and contains a universally unique identification of the Service Product Valuation Data about the service product that was exchanged between the OverheadCostLedgerAccount and the offsetting sub-ledger account. Integrity condition: This element can be filled if the element AccountingBusinessTransactionTypeCode has the value 403 (‘Internal Service Provision’). The SystemAdministrativeData is a GDT of a type SystemAdministrativeData and contains an administrative data stored in a system This data includes the system user and change time. The ChartOfAccountsCode is a GDT of a type ChartOfAccountsCode and contains a coded representation of the ChartOfAccounts containing the ChartOfAccountsItem that classifies—for general ledger accounting purposes—the value stated in the Line Item. The ChartOfAccountsItemCode is a GDT of a type ChartOfAccountsItemsCode and contains a coded representation of a ChartOfAccountsItem that classifies—for general ledger accounting purposes—the value stated in the Line Item. The AccountingBusinessTransactionTypeCode is a GDT of a type AccountingBusinessTransactionTypeCode and contains a coded representation of the type of the business transaction stated in the OverheadCostLedgerAccountLine Item. It classifies the business transaction according to Accounting criteria. The TypeCode is a GDT of a type SubledgerAccountLine ItemTypeCode), Restriction: Only code values “service provision”, “overhead cost assessment”, “overhead cost”, “material consumption", "service product consumption", and "general expense" may occur and contains a coded representation of the type of the Line Item. The CostRevenueElementCode is a GDT of a type CostRevenueElementCode and contains a coded representation of the value component that classifies the value that flowed from the OffsettingLedgerAccount to the OverheadCostLedgerAccount or vice-versa. The AccountingDocumentTypeCode is a GDT of a type AccountingDocumentTypeCode and contains a coded representation of the type of the AccountingDocument to which the Line Item refers by the AccountingDocumentReference. The AccountingDocumentNote is a GDT of a type SHORT_Note and contains a natural-language comment that applies the AccountingDocument—referred via the AccountingDocumentReference—as a whole rather than to individual items. The AccountingDocumentItemNote is a GDT of a type SHORT_Note and contains a natural-language comment pertaining to the AccountingDocumentItem to which the Line Item refers by the AccountingDocumentReference. The ProductTaxTypeCode is a GDT of a type TaxTypeCode and denotes the product tax type to which the recorded data relates. The ProductTaxDueCategoryCode is a GDT of a type DueCategoryCode and denotes the category (receivable or payable) of a tax due to which the recorded data relates. The ProductTaxEventTypeCode is a GDT of a type ProductTaxEventTypeCode and denotes the product tax event to which the recorded data relates. The ProductTaxRateTypeCode is a GDT of a type TaxRateTypeCode and denotes the type of product tax rate to which the recorded data relates. The ProductTaxCountryCode is a GDT of a type CountryCode and specifies the Product tax reporting country to which the recorded data relates. The WithholdingTaxTypeCode is a GDT of a type TaxTypeCode and denotes the withholding tax type to which the recorded data relates. The WithholdingTaxEventTypeCode is a GDT of a type WithholdingTaxEventTypeCode and denotes the withholding tax event to which the recorded data relates. The WithholdingTaxRateTypeCode is a GDT of a type TaxRateTypeCode and denotes the type of withholding tax rate to which the recorded data relates. The WitholdingTaxCountryCode is a GDT of a type Country Code and specifies the Withholding tax reporting country to which the recorded data relates. The PostingDate is a GDT of a type Date, Qualifier: Posting and contains the date with which the business transaction is effectively recorded in Accounting. Effectively means that period totals and balances in accounting are updated with this date. The OriginalEntryDocumentDate is a GDT of a type Date, Qualifier: OriginalEntryDocument and contains the issue date of the Original Entry Document. The AccountingBusinessTransactionDate is a GDT of a type Date, Qualifier: BusinessTransaction and contains the date at which the business transaction took place applying the criteria of Accounting. The CurrencyConversionDate is a GDT of a type Date, Qualifier: CurrencyConversion and contains the date that is used for the currency translation applied to amounts in the accounting document. The FiscalYearVariantCode is a GDT of a type FiscahYearVariantCode and contains a coded representation of the FiscalYearVariant according to whose fiscal year definition (begin, end, period definition) the FiscalYearID and the AccountingPeriodID are derived. The FiscalYearID is a GDT of a type FiscalYearID and contains the identification of the fiscal year in which the Line Item is posted. The AccountingPeriodID is a GDT of a type AccountingPeriodID and contains the identification of the accounting period in which the Line Item is posted. The AccountingClosingStepCode is a GDT of a type AccountClosingStepCode and contains a coded representation of the closing step of the accounting document. The AccountingDocumentItemAccountingGroupID is a GDT of a type BusinessTransactionDocumentItemGroupID and contains a unique identification of a group of AccountingDocumentItems belonging together applying the criteria of Accounting. It is used to indicate the items of an AccountingDocument that belong together e.g. in partial zero-balance checking within the Accounting Document.

An example is an activity confirmation from production that contains items for actual working times and also for materials used for the production process, The created AccountingDocumentItems are grouped together according to the material movement or working time confirmation they belong to.

AccountingDocumentItemProductTaxGroupID is a GDT of a type BusinessTransactionDocumentItemGroupID and contains a unique Identification of a group of Accounting Document Items that belong together because they are tax relevant and have the same taxation and related tax items. The ExpenseClassificationFunctionalAreaCode is a GDT of a type ExpenseClassificationFunctionAreaCode and contains a coded representation of the functional area to which the value and quantity of the Line Item are allocated. The GeneralLedgerMovementTypeCode is a GDT of a type GeneralLedgerMovementTypeCode and contains a coded representation of the type of movement with which the value change is recorded for GeneralLedger purposes in the GeneralLedger Account. The DebitCreditCode is a GDT of a type DebitCreditCode and contains a coded representation of debit or credit. It specifies whether the line item is assigned to the debit or credit side of the GeneralLedger account. The SubledgerAccountChargeTypeCode is a GDT of a type SubledgerAccountChargeTypeCode and indicates whether the line item represents a debit or credit of the OverheadCostLedgerAccount.

The code values "I" (credit) and "2" (debit) may occur The CancellationDocumentIndicator is a GDT of a type Indicator, Qualifier: CancellationDocument and indicates whether the Accounting Document to which the Line Item refers by the Accounting Document Reference refers to a Cancellation Original Entry Document. The CancellationOriginalEntryDocumentContainingObjectReference is a GDT of a type ObjectNodeReference, Qualifier: CancellationOriginalEntryDocumentContaining and contains a reference to the Object containing the Original Entry Document that cancelled this Line Item. The CancellationOriginalEntryDocumentReference is a GDT of a type ObjectNodeReference, Qualifier: Cancellation and contains a reference to the Original Entry Document, that cancelled this Line Item. The CancellationOriginalEntryTransactionUUID is a GDT of a type UUID and contains a universally unique identifier of the transaction during which the Cancellation Original Entry Document was created or changed. The CancelledIndicator is a GDT of a type Indicator, Qualifier: Cancelled and iIndicates if the line item has been cancelled. The CashDiscountDeductibleIndicator is a GDT of a type Indicator, Qualifier: CashDiscountDeductible and indicates whether a cash discount can be deducted from the Line Item. The ServiceProductBasedValuationIndicator is a GDT of a type ServiceProductQuantity and indicates that the values of the line item are a result of valuation of the service product quantity (ServiceProductBasedValuation. If the indicator is not set, this indicates that the values of the line item arose through valuation of the resource consumption quantity (ResourceQuantity element. Integrity condition: This element can be filled if (and only if) the element The AccountingBusinessTransactionTypeCode is a GDT of a type Indicator, Qualifier: ServiceProductBased/Valuation and has the value "Internal Service Provision". The BusinessTransactionCurrencyAmount The value of the Line Item in transaction currency. The transaction currency is the currency agreed on by two business partners for their business relationship.

(GDT: Amount. Qualifier: BusinessTransactionCurrency)

LineItemCurrencyAmount

The value of the Line Item in Line Item currency.

(GDT: Amount. Qualifier: LineItem)

LocalCurrencyAmount

The value of the Line Item in the local currency of the Company carrying the account. The local currency is the currency in which the local books are kept.

(GDT: Amount, Qualifier: LocalCurrency)

SetOfBooksCurrencyAmount

The value of the Line Item in the currency selected for the set of books.

(GDT: Amount, Qualifier: SetOfBooksCurrency)

HardCurrencyAmount

The value of the Line Item, in the hard currency of the country of the Company carrying the account. The hard currency is a stable, country-specific currency that is used in high-inflation countries.

(GDT: Amount, Qualifier: HardCurrency)

IndexBasedCurrencyAmount

The value of the Line Item in the index-based currency of the country of the Company carrying the account. The index-based currency is a fictitious, country-specific currency that is used in high-inflation countries as a comparison currency for reporting.

(GDT: Amount, Qualifier: IndexedBasedCurrency)

ValuationQuantity

The quantity change of the business transaction stated in the line item in the valuation unit of measurement of the material, service product, or resource (GDT: Quantity, Qualifier: Valuation)

ValuationQuantityTypeCode

Coded representation of the type of the valuation quantity.

(GDT: QuantityTypeCode, Qualifier: Valuation)

ResourceQuantity

The quantity of a resource consumption of the business transaction stated in the line item, in the capacity unit of measurement of the resource.

Integrity condition: This element is filled if the element AccountingBusinessTransactionTypeCode has the value "Internal Service Provision".

(GDT: Quantity; Qualifier: Resource)

ResourceQuantityTypeCode coded representation of the type of the ResourceQuantity.

Integrity condition: The element ResourceQuantityTypeCode can be filled if the element ResourceQuantity is filled.

(GDT: QuantityTypeCode; Qualifier: Resource)

ServiceProductQuantity

The quantity of a service provision of the business transaction stated in the line item, in the unit of the service product.

Integrity condition: This element is filled if the element AccountingBusinessTransactionTypeCode has the value "Internal Service Provision".

(GDT: Quantity; Qualifier: ServiceProduct)

ServiceProductQuantityTypeCode coded representation of the type of the ServiceProductQuantity.

Integrity condition: The element ServiceProductQuantityTypeCode can be filled if the element ServiceProductQuantity is filled.

(GDT: QuantityTypeCode; Qualifier: ServiceProduct)

Inbound Aggregation Relationships:

From business object SetOfBooks/node SetOfBooks SetOfBooks 1:cn

The SetOfBooks according to whose specifications the Line Item was created.

From business object Company/node Company

Partner Company c:cn

A company that acts in the business transaction stated in the Line Item as an intra corporate partner.

From business object Segment/node Segment

Segment c:cn

A segment to which the value and quantity of the Line Item are allocated.

PartnerSegment c:cn

A Segment that acts in the business transaction stated in the Line Item as an intra corporate Partner.

From business object ProfitCentre/node ProfitCentre

ProfitCentre c:cn

A ProfitCentre to which the value and quantity of the Line Item are allocated.

PartnerProfitCentre c:cn

A ProfitCentre that acts in the business transaction stated in the Line Item as an intra corporate partner.

From business object OverheadCostLedgerAccount/node OverheadCostLedgerAccount

OriginOverheadCostLedgerAccount c:cn

Denotes the OverheadCostLedgerAccount to which the line item relates as the origin of a value flow.

Constraints with the following relationships:

One and only one of the following pairs of relationships to an Original Entry Document and its Item may exist.

If the Original Entry Document is contained in another Object then the corresponding relationship to this Object generally exists as well.

If the Cancellation Original Entry Document is contained in another Object then the corresponding relationship to this Object generally exists as well.

From business object AccountingEntry/node AccountingEntry

AccountingEntry: c:cn

An AccountingEntry that keeps the original entry of the business transaction stated in the Line Item CancellationAccountingEntry: c:cn An AccountingEntry that keeps the Original Entry Document for the cancellation of this Line Item From business object AccountingEntry/node Item AccountingEntryItem: c:cn An Item in an AccountingEntry serving as Original Entry Document Item by which the value change recorded in the LineItem can be verified.

From business object GoodsAndServiceAcknowledgement/node

GoodsAndServiceAcknowledgement

GoodsAndServiceAcknowledgement: c:cn (cross DU)

A GoodsAndServiceAcknowledgement that keeps the original entry of the business transaction stated in the Line Item.

CancellationGoodsAndServiceAcknowledgement: c:cn (cross DU)

A GoodsAndServiceAcknowledgement that keeps the Original Entry Document for the cancellation of this Line Item.

From business object GoodsAndServiceAcknowledgement/node Item

GoodsAndServiceAcknowledgementItem: c:cn (cross DU)

An Item in a GoodsAndServiceAcknowledgement serving as Original Entry Document Item by which the value change recorded in the LineItem can be verified.

From business object GoodsAndActivityConfirmation/node

GoodsAndActivityConfirmation

GoodsAndActivityConfirmation: c:cn (cross DU)

A GoodsAndActivityConfirmation that keeps the original entry of the business transaction stated in the Line Item.

CancellationGoodsAndActivityConfirmation: c:cn (cross DU)

A GoodsAndActivityConfirmation that keeps the Original Entry Document for the cancellation of this Line Item.

From business object GoodsAndActivityConfirmation/node InventoryChangeItem

GoodsAndActivityConfirmationInventoryChangeItem: c:cn (cross DU)

An InventoryChangeItem in a GoodsAndActivityConfirmation serving as Original Entry Document Item by which the value change recorded in the LineItem can be verified.

From business object ProductionConfirmation/node ProductionConfirmation

ProductionConfirmation: c:cn (cross DU)

A ProductionConfirmation that keeps the original entry of the business transaction stated in the Line Item.

CancellationProductionConfirmation: c:cn (cross DU)

A ProductionConfirmation that keeps the Original Entry Document for the cancellation of this Line Item.

From business object ProductionConfirmation/node ResourceUtilisationItem

ProductionConfirmationResourceUtilisationItem: c:cn (cross DU)

A ResourceUtilisationItem in a ProductionConfirmation serving as Original Entry. Document Item by which the value change recorded in the LineItem can be verified.

From business object SiteLogisticsConfirmation/node SiteLogisticsConfirmation

SiteLogisticsConfirmation: c:cn (cross DU)

A SiteLogisticsConfirmation that keeps the original entry of the business transaction stated in the Line Item.

CancellationSiteLogisticsConfirmation: c:cn (cross DU)

A SiteLogisticsConfirmation that keeps the Original Entry Document for the cancellation of this Line Item.

From business object SiteLogisticsConfirmation/node InventoryChangeItem

SiteLogisticsConfirmationInventoryChangeItem: c:cn (cross DU)

An InventoryChangeItem in a SiteLogisticsConfirmation serving as Original Entry Document Item by which the value change recorded in the LineItem can be verified.

From business object ServiceConfirmation/node ServiceConfirmation

ServiceConfirmation: c:cn (cross DU)

A ServiceConfirmation that keeps the original entry of the business transaction stated in the Line Item.

CancellationServiceConfirmation: c:cn (cross DU)

A ServiceConfirmation that keeps the Original Entry Document for the cancellation of this Line Item.

From business object ServiceConfirmation/node CustomerServiceConfirmationItem

ServiceConfirmationCustomerServiceConfirmationItem: c:cn (cross DU)

An CustomerServiceConfirmationItem in a ServiceConfirmation serving as Original Entry Document Item by which the value change recorded in the LineItem can be verified.

From business object SupplierInvoice/node SupplierInvoice SupplierInvoice: c:cn (cross DU)

A SupplierInvoice that keeps the original entry of the business transaction stated in the Line Item.

CancellationSupplierInvoice: c:cn (cross DU)

A SupplierInvoice that keeps the Original Entry Document for the cancellation of this Line Item.

From business object SupplierInvoice/node Item

SupplierInvoiceItem: c:cn (cross DU)

An Item in a SupplierInvoice serving as Original Entry Document Item by which the value change recorded in the LineItem can be verified.

From business object EmployeeTimeCalendar/node EmployeeTimeCalendar EmployeeTimeCalendar: c:cn (cross DU)

Reference to the EmployeeTimeCalendar that contains the Original Entry Document.

From business object EmployeeTimeCalendar/node PeriodItem

EmployeeTimeCalendarPeriodItem: c:cn (cross DU)

Reference to a PeriodItem that serves as Original Entry Document for a business transaction in an EmployeeTimeCalendar.

CancellationEmployeeTimeCalendarPeriodItem: c:cn (cross DU)

Reference to a PeriodItem that serves as Original Entry Document for the cancellation of a business transaction in an EmployeeTimeCalendar.

From MDRO GoodsReceiptInvoiceReceiptClearingRun/node

GoodsReceiptInvoiceReceiptClearingRun

GoodsReceiptInvoiceReceiptClearingRun: c:cn

Reference to the GoodsReceiptInvoiceReceiptClearingRun that contains the Original Entry Document.

CancellationGoodsReceiptInvoiceReceiptClearingRun: c:cn

Reference to the GoodsReceiptInvoiceReceiptClearingRun that contains the Original Entry Document for the cancellation of this LineItem.

From MDRO GoodsReceiptInvoiceReceiptClearingRun/node LogSection

GoodsReceiptInvoiceReceiptClearingRunLogSection c:cn

Reference to a LogSection that serves as Original Entry Document for a business transaction in a GoodsReceiptInvoiceReceiptClearingRun.

CancellationGoodsReceiptInvoiceReceiptClearingRunLogSection c:cn

Reference to a LogSection that serves as Original Entry Document for the cancellation of a business transaction in a GoodsReceiptInvoiceReceiptClearingRun.

From MDRO GoodsReceiptInvoiceReceiptClearingRun/node

LogSectionGoodsReceiptInvoiceReceiptClearingCalculatedItem

GoodsReceiptInvoiceReceiptClearingRunLogSectionGoodsReceiptInvoiceReceiptClearingCalculatedItem c:cn A GoodsReceiptInvoiceReceiptClearingCalculatedItem in a LogSection of a GoodsReceiptInvoiceReceiptClearingRun serving as Original Entry Document Item by which the value change recorded in the LineItem can be verified.

From MDRO SalesLedgerAccountOverheadCostCalculationRun/node

SalesLedgerAccountOverheadCostCalculationRun

SalesLedgerAccountOverheadCostCalculationRun c:cn

Reference to the SalesLedgerAccountOverheadCostCalculationRun that contains the Original Entry Document.

CancellationSalesLedgerAccountOverheadCostCalculationRun c:cn

Reference to the SalesLedgerAccountOverheadCostCalculationRun that contains the Original Entry Document for the cancellation of this Line Item.

From MDRO SalesLedgerAccountOverheadCostCalculationRun/node LogSection SalesLedgerAccountOverheadCostCalculationRunLogSection c:cn Reference to a LogSection that serves as Original Entry Document for a business transaction in a SalesLedgerAccountOverheadCostCalculationRun.

CancellationSalesLedgerAccountOverheadCostCalculationRunLogSection c:cn

Reference to a LogSection that serves as Original Entry Document for the cancellation of a business transaction in a SalesLedgerAccountOverheadCostCalculationRun.

From MDRO SalesLedgerAccountOverheadCostCalculationRun/node

LogSectionOverheadCostCalculationCalculatedItem

SalesLedgerAccountOverheadCostCalculationRunLogSectionOverheadCostCalculationCalculatedItem c:cn An OverheadCostCalculationCalculatedItem in a LogSection of a SalesLedgerAccountOverheadCostCalculationRun serving as Original Entry Document Item by which the value change recorded in the LineItem can be verified.

From MDRO ProductionLedgerAccountOverheadCostCalculationRun/node

ProductionLedgerAccountOverheadCostCalculationRun

ProductionLedgerAccountOverheadCostCalculationRun c:cn

Reference to the ProductionLedgerAccountOverheadCostCalculationRun that contains the Original Entry Document.

CancellationProductionLedgerAccountOverheadCostCalculationRun c:cn

Reference to the ProductionLedgerAccountOverheadCostCalculationRun that contains the Original Entry Document for the cancellation of this Line Item.

From MDRO ProductionLedgerAccountOverheadCostCalculationRun/node LogSection ProductionLedgerAccountOverheadCostCalculationRunLogSection c:cn Reference to a LogSection that serves as Original Entry Document for a business transaction in a ProductionLedgerAccountOverheadCostCalculationRun.

CancellationProductionLedgerAccountOverheadCostCalculationRunLogSection c:cn

Reference to a LogSection that serves as Original Entry Document for the cancellation of a business transaction in a ProductionLedgerAccountOverheadCostCalculationRun.

From MDRO ProductionLedgerAccountOverheadCostCalculationRun/node

LogSectionOverheadCostCalculationCalculatedItem

Production LedgerAccountOverheadCostCalculationRunLogSectionOverheadCostCalculationCalculatedItem c:cn An OverheadCostCalculationCalculatedItem in a LogSection of a ProductionLedgerAccountOverheadCostCalculationRun serving as Original Entry Document Item by which the value change recorded in the LineItem can be verified.

From MDRO OtherDirectCostLedgerAccountOverheadCostCalculationRun/node

OtherDirectCostLedgerAccountOverheadCostCalculationRun

OtherDirectCostLedgerAccountOverheadCostCalculationRun c:cn

Reference to the OtherDirectCostLedgerAccountOverheadCostCalculationRun that contains the Original Entry Document.

CancellationOtherDirectCostLedgerAccountOverheadCostCalculationRun c:cn

Reference to the OtherDirectCostLedgerAccountOverheadCostCalculationRun that contains the Original Entry Document for the cancellation of this Line Item.

From MDRO OtherDirectCostLedgerAccountOverheadCostCalculationRun/node

LogSection

OtherDirectCostLedgerAccountOverheadCostCalculationRunLogSection c:cn

Reference to a LogSection that serves as Original Entry Document for a business transaction in a OtherDirectCostLedgerAccountOverheadCostCalculationRun.

CancellationOtherDirectCostLedgerAccountOverheadCostCalculationRunLogSection c:cn Reference to a LogSection that serves as Original Entry Document for the cancellation of a business transaction in an OtherDirectCostLedgerAccountOverheadCostCalculationRun.

From MDRO OtherDirectCostLedgerAccountOverheadCostCalculationRun/node

LogSectionOverheadCostCalculationCalculatedItem

OtherDirectCostLedgerAccountOverheadCostCalculationRunLogSectionOverheadCostCalculationCalculatedItem c:cn A OverheadCostCalculationCalculatedItem in a LogSection of an OtherDirectCostLedgerAccountOverheadCostCalculationRun serving as Original Entry Document Item by which the value change recorded in the LineItem can be verified.

From MDRO FixedAssetDepreciationRun/node FixedAssetDepreciationRun

FixedAssetDepreciationRun c:cn

Reference to the FixedAssetDepreciationRun that contains the Original Entry Document.

CancellationFixedAssetDepreciationRun c:cn

Reference to the FixedAssetDepreciationRun that contains the Original Entry Document for the cancellation of this Line Item.

From MDRO FixedAssetDepreciationRun/node LogSection

FixedAssetDepreciationRunLogSection c:cn

Reference to a LogSection that serves as Original Entry Document for a business transaction in an FixedAssetDepreciationRun.

Cancellation FixedAssetDepreciationRunLogSection c:cn

Reference to a LogSection that serves as Original Entry Document for the cancellation of a business transaction in an FixedAssetDepreciationRun.

From MDRO FixedAssetDepreciationRun/node

LogSectionFixedAssetDepreciationPostedItem

FixedAssetDepreciationRunLogSectionFixedAssetDepreciationPostedItem c:cn

A FixedAssetDepreciationPostedItem in a LogSection of an FixedAssetDepreciationRun serving as Original Entry Document Item by which the value change recorded in the LineItem can be verified.

From MDRO OverheadCostLedgerAccountOverheadCostCalculationRun/node

OverheadCostLedgerAccountOverheadCostCalculationRun

OverheadCostLedgerAccountOverheadCostCalculationRun c:cn

Reference to the OverheadCostLedgerAccountOverheadCostCalculationRun that contains the Original Entry Document.

CancellationOverheadCostLedgerAccountOverheadCostCalculationRun c:cn

Reference to the OverheadCostLedgerAccountOverheadCostCalculationRun that contains the Original Entry Document for the cancellation of this Line Item.

From MDRO OverheadCostLedgerAccountOverheadCostCalculationRun/node LogSection

OverheadCostLedgerAccountOverheadCostCalculationRunLogSection c:cn

Reference to a LogSection that serves as Original Entry Document for a business transaction in an OverheadCostLedgerAccountOverheadCostCalculationRun.

CancellationOverheadCostLedgerAccountOverheadCostCalculationRunLogSection c:cn

Reference to a LogSection that serves as Original Entry Document for the cancellation of a business transaction in an OverheadCostLedgerAccountOverheadCostCalculationRun.

From MDRO OverheadCostLedgerAccountOverheadCostCalculationRun/node LogSectionOverheadCostCalculationCalculatedItem OverheadCostLedgerAccountOverheadCostCalculationRunLogSectionOverheadCostCalculationCalculatedItem c:cn An OverheadCostCalculationCalculatedItem in a LogSection of an OverheadCostLedgerAccountOverheadCostCalculationRun serving as Original Entry Document Item by which the value change recorded in the LineItem can be verified.

From MDRO OverheadCostAssessmentRun/node OverheadCostAssessmentRun

OverheadCostAssessmentRun c:cn

Reference to the OverheadCostAssessmentRun that contains the Original Entry Document.

CancellationOverheadCostAssessmentRun c:cn

Reference to the OverheadCostAssessmentRun that contains the Original Entry Document for the cancellation of this Line Item.

From MDRO OverheadCostAssessmentRun/node LogSection

OverheadCostAssessmentRunLogSection c:cn

Reference to a LogSection that serves as Original Entry Document for a business transaction in an OverheadCostAssessmentRun.

CancellationOverheadCostAssessmentRunLogSection c:cn

Reference to a LogSection that serves as Original Entry Document for the cancellation of a business transaction in an OverheadCostAssessmentRun.

From MDRO OverheadCostAssessmentRun/node LogSectionAssessmentAndDistributionAllocatedItem OverheadCostAssessmentRunLogSectionAssessmentAndDistributionAllocatedItem c:cn An AssessmentAndDistributionAllocatedItem in a LogSection of an OverheadCostAssessmentRun serving as Original Entry Document Item by which the value change recorded in the LineItem can be verified.

Constraint with the following relationships: A maximum of one of these relationships can exist.

From business object OverheadCostLedgerAccount/node OverheadCostLedgerAccount

OffsettingOverheadCostLedgerAccount c:cn

Denotes the OverheadCostLedgerAccount to which the Line Item relates as the OffsettingSubLedgerAccount.

From business object OtherDirectCostLedgerAccount/node OtherDirectCostLedgerAccount OffsettingOtherDirectCostLedgerAccount c:cn Denotes the OtherDirectCostLedgerAccount to which the Line Item relates as the OffsettingSubLedgerAccount.

From business object ProductionLedgerAccount/node ProductionLedgerAccount

OffsettingProductionLedgerAccount c:cn

Denotes the ProductionLedgerAccount to which the Line Item relates as the OffsettingSubLedgerAccount.

From business object SalesLedgerAccount/node SalesLedgerAccount

OffsettingSalesLedgerAccount c:cn

Denotes the SalesLedgerAccount to which the Line Item relates as the OffsettingSubLedgerAccount.

From business object PurchasingLedgerAccount/node PurchasingLedgerAccount

OffsettingPurchasingLedgerAccount c:cn

Denotes the PurchasingLedgerAccount to which the Line Item relates as the OffsettingSubLedgerAccount.

From business object MaterialLedgerAccount/node MaterialLedgerAccount

OffsettingMaterialLedgerAccount c:cn

Denotes the MaterialLedgerAccount to which the Line Item relates as the OffsettingSubLedgerAccount.

From business object FixedAsset/node FixedAsset

OffsettingFixedAsset c:cn

Denotes the FixedAsset to which the Line Item relates as the OffsettingSubLedgerAccount.

Inbound Association Relationships:

From business object AccountingNotification/node AccountingNotification

AccountingNotification c:cn

The notification sent to Financial Accounting about the business transaction stated in the Line Item.

From business object ServiceProductValuationData/node ServiceProductValuationData ServiceProductValuationData c:cn The valuation data about the service product that was exchanged between the OverheadCostLedgerAccount and the OffsettingObject.

Integrity condition: This association may exist if the element AccountingBusinessTransactionTypeCode has the value 'Internal Service Provision'.

From business object Identity/node Identity

CreationIdentity 1:cn

The system user Identity who created the Line Item.

LastChangeIdentity c:cn

The system user Identity who last changed the Line Item.

Association Relationships for Navigation:

To the business object AccountingDocument/node AccountingDocument

AccountingDocument 1:cn.

The accounting document that records the entire business transaction in Accounting.

To business object GeneralLedgerAccount/node Line Item

GeneralLedgerAccountLine Item 1:cn

A Line Item of a GeneralLedgerAccount that records the value change for GeneralLedger purposes.

PlanPeriodTotal

Definition

Period-based planned overhead costs for a cost center, resource, or project. A PlanPeriodTotal relates to a Chart-of-accounts item for a set of books. A PlanPeriodTotal may relate to an offsetting object (see OffsettingOverheadCostLedgerAccountUUID).

Structure

The elements located directly at the PlanPeriodTotal node are defined by the type GDT: OverheadCostLedgerAccountPlanPeriodTotalElements. These elements are:

SetOfBooksID identifies the set of books which the planned period total relates to.

(GDT: SetOfBooksID)

ChartOfAccountsCode specifies the chart of account of the field ChartOfAccountsItemCode (GDT: ChartOfAccountsCode)

ChartOfAccountsItemCode specifies the chart of account item which the planned period total relates to.

(GDT: ChartOfAccountsItemCode)

OffsettingOverheadCostLedgerAccountUUID denotes the OverheadCostLedgerAccount from which the OverheadCostLedgerAccount received values or to which it output values.

Integrity condition: The element can be filled with secondary allocations (plan assessments, plan overhead) and with resource consumption planning. With primary cost planning the element is not filled.

(GDT: UUID)

AccountingBusinessTransactionTypeCode specifies business transaction code that the planned period total relates to.

(GDT: AccountingBusinessTransactionTypeCode)

Restriction: The element AccountingBusinessTransactionTypeCode may be filled with secondary allocations (plan assessments, plan overhead)

CostRevenueElementCode

The cost- and revenue element of the planned period total.

(GDT: CostRevenueElementCode)

FiscalYearVariantCode specifies the configuration of FiscalYearID and AccountingPeriodID.

(GDT: FiscalYearVariantCode)

FiscalYearID denotes the fiscal year to which the planned period total relates (GDT: FiscalYearID)

AccountingPeriodID denotes the period within the fiscal year to which the planned period total relates.

(GDT: AccountingPeriodID)

SubledgerAccountChargeTypeCode denotes whether the planned period total represents debits or credits of the OverheadCostLedgerAccount.

(GDT: SubledgerAccountChargeTypeCode)

LocalCurrencyAmount denotes the value of the planned period total in the local currency of the company keeping the books. The local currency is the currency in which the local books are kept.

(GDT: Amount; Qualifier: LocalCurrency)

SetOfBooksCurrencyAmount denotes the value of the planned period total in the currency selected for the set of books.

(GDT: Amount; Qualifier: SetOfBooksCurrency)

HardCurrencyAmount denotes the value of the planned period total in the hard currency of the country of the company keeping the books. The hard currency is a stable, country-specific currency that is used in high-inflation countries. (GDT: Amount; Qualifier: HardCurrency)

IndexBasedCurrencyAmount

Denotes the value of the planned period total in the index-based currency of the country of the company keeping the books. The index-based currency is a fictitious, country-specific currency that is used in high-inflation countries as a comparison currency for reporting.

(GDT: Amount; Qualifier: IndexBasedCurrency)

Inbound Aggregation Relationships:

From business object SetOfBooks/node SetOfBooks

SetOfBooks 1:cn

The SetOfBooks to which the planned period total relates.

From business object OverheadCostLedgerAccount/node OverheadCostLedgerAccount

OffsettingOverheadCostLedgerAccount c:cn

Denotes the offsetting OverheadCostLedgerAccount to which the planned period total relates (if necessary).

Queries

QueryByElements:

Provides a list of PlanPeriodTotals where the elements are as specified by the query parameters.

The query elements are defined by the data type OverheadCostLedgerAccountPlanPeriodTotalElementsQueryElements. These elements are:

OverheadCostLedgerAccountCostCentreUUID Universally unique identification of the cost centre which the OverheadCostLedgerAccount relates to.

(GDT: UUID)

OverheadCostLedgerAccountCostCentreID

Identification of the cost centre which the OverheadCostLedgerAccount relates to.

(GDT: OrganisationalCentreID)

OverheadCostLedgerAccountResourceValuationDataUUID

Universally unique identification of the ResourceValuationData for the resource which the OverheadCostLedgerAccount relates to.

(GDT: UUID)

OverheadCostLedgerAccountResourceUUID

Universally unique identification of the resource which the OverheadCostLedgerAccount relates to.

(GDT: UUID)

OverheadCostLedgerAccountResourceID

Identification of the resource which the OverheadCostLedgerAccount relates to.

(GDT: OrganisationalCentreID)

OverheadCostLedgerAccountProjectTaskUUID

Universally unique identification of the project task which the OverheadCostLedgerAccount relates to.

(GDT: UUID)

OverheadCostLedgerAccountProjectTaskID

Identification of the project task which the OverheadCostLedgerAccount relates to.

(GDT: ProjectClementID)

Integrity condition: Exactly only one of the above six parameters CostCentreUUID, CostCentreID, ResourceUUID, ResourceID, ProjectTaskUUID, or ProjectTaskID can be supplied.

SetOfBooksID (GDT: SetOfBooksID)

ChartOfAccountsCode (GDT: ChartOfAccountsCode)

ChartOfAccountsItemCode (GDT: ChartOfAccountsItemCode)
AccountingBusinessTransactionTypeCode
(GDT: AccountingBusinessTransactionTypeCode)
CostRevenueElementCode
(GDT: CostRevenueElementCode)
FiscalYearVariantCode
(GDT: FiscalYearVariantCode)
FiscalYearID
(GDT: FiscalYearID)
AccountingPeriodID
(GDT: AccountingPeriodID)
OffsettingSubledgerAccountUUID
(GDT: UUID)
SubledgerAccountChargeTypeCode
(GDT: SubledgerAccountChargeTypeCode)
DO: AccessControlList
Definition The AccessControlList is a list of access groups that have access to an OverheadCostLedgerAccount.

Structure

See DO: AccessControlList

Figures 1, 97:
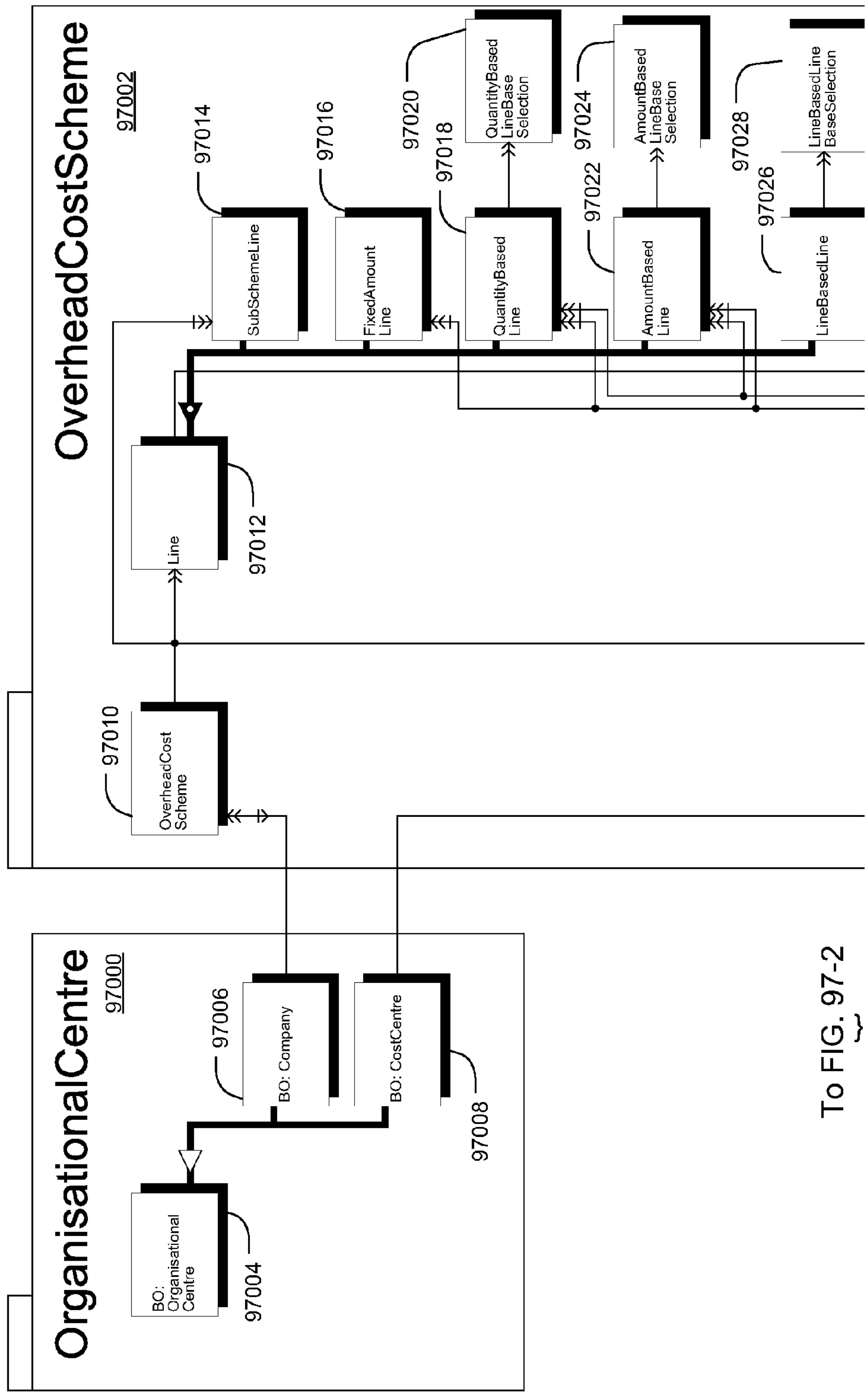
Figures 2, 97:
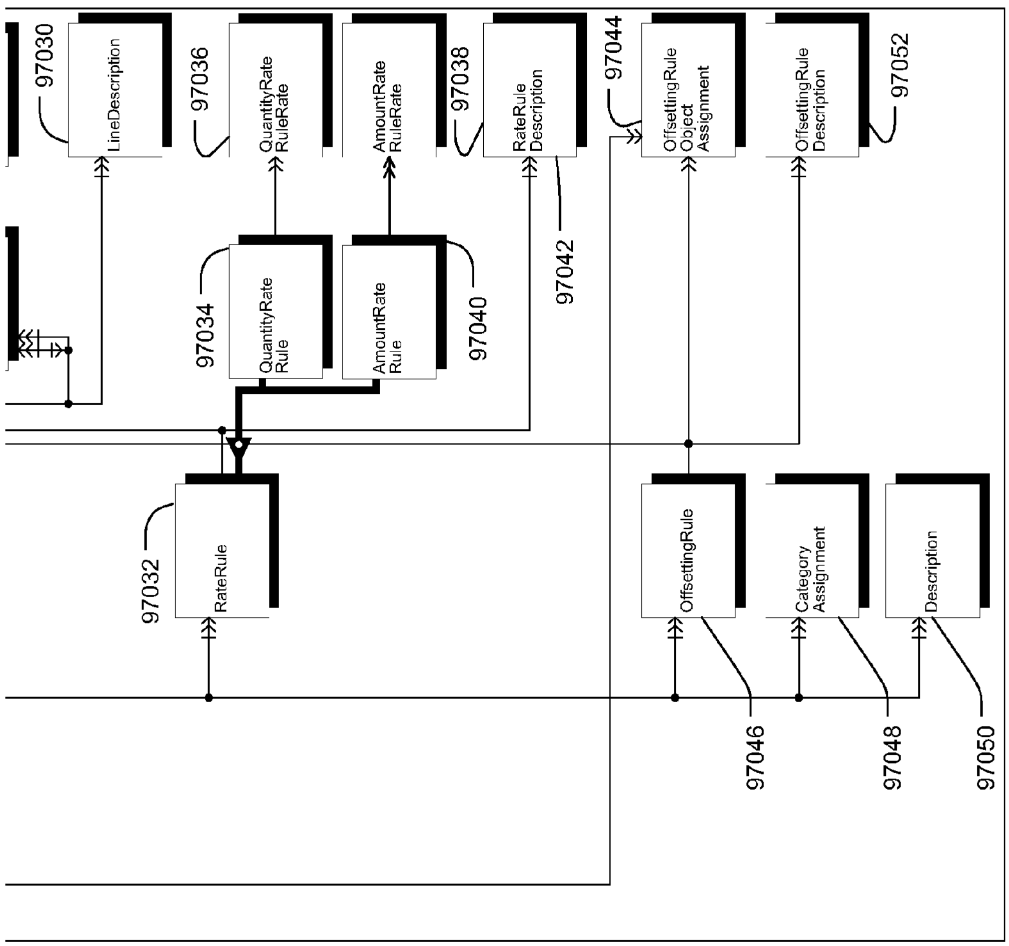

FIG. 97 illustrates one example of an OverheadCostScheme business object model 97002. Specifically, this figure depicts interactions among various hierarchical components of the OverheadCostScheme, as well as external components that interact with the OverheadCostScheme (shown here as 97000 and 97004 through 97008). The OverheadCostScheme Business Object is a set of rules for the calculation of overhead charges. The rules define the base data and the corresponding overhead rates, for example, calculating overhead rates for production orders. Some of the costs involved in the production of a machine can be traced to the machine (such as EUR 3000 for direct materials). The material costs, however, also include indirect costs, such as the electricity for the warehouse, that cannot easily be traced to this particular machine. The electricity costs are therefore allocated to the machine at the rate of 5% of the direct material costs. The resulting material costs are EUR 3,150 (direct costs of EUR 3,000 plus overhead of EUR 150). These costs are calculated in the overhead cost scheme. The overhead cost scheme consists of a language-dependent description of one or more lines, along with rate rules and offsetting rules used in the lines. The OverheadCostScheme business object is represented by the OverheadCostScheme node.

The OverheadCostScheme root node 97010 represents a scheme for calculating overhead rates. It contains a description, lines defining the method for calculating the rates, rate rules for determining the amount of overhead to be allocated, and offsetting rules defining the object to be credited. A Company can be assigned to the overhead cost scheme so that overhead allocations are restricted to that Company. The elements located at the OverheadCostScheme node are defined by the type GDT OverheadCostSchemeElements. These elements include UUID, OverheadCostSchemeID, CompanyUUID, CompanyID, CostManagementFunctionalUnitUUID, and InternalIndicator. A UUID is a GDT of type UUID and is a universally unique identification of the OverheadCostScheme. An OverheadCostSchemeID is a GDT of type OverheadCostSchemeID and is a unique identifier of the OverheadCostScheme. A CompanyUUID is a GDT of type UUID. The CompanyUUID is a universally unique identification of the company to which the overhead cost scheme is restricted and is optional. A CompanyID is a GDT of type CompanyID. The CompanyID is a unique identification of the company to which the overhead cost scheme is restricted and is optional. A CostManagementFunctionalUnitUUID is a GDT of type UUID. The CostManagementFunctionalUnitUUID is a universally unique identifier of the department that is responsible for processing the Overhead Cost Scheme and is optional. In some implementations, the referenced Functional Unit can be responsible for the Organisational Function 'Cost Management', i.e. the OrganisationalFunctionCode on one of the FunctionalUnitAttributes nodes of the FunctionalUnit can have the value '24' e.g. CostManagement. An InternalIndicator is a GDT of type InternalIndicator. The InternalIndicator Specifies whether the overhead cost scheme is only used internally and is optional. The OverheadCostScheme has a 1:n cardinality relationship with the Line subordinate node 97012, a 1:cn cardinality relationship with the RateRule subordinate node 97032, a 1:cn cardinality relationship with the OffsettingRule subordinate node 97046, a 1:cn cardinality relationship with the CategoryAssignment subordinate node 97048, and a 1:1 cardinality relationship with the AccessControlList subordinate node (not shown). Company has a cardinality of c:n. The Company in which the overhead cost scheme will be used. CostManagementFunctionalUnit has a cardinality of c:cn. The Functional Unit that is responsible for processing the Overhead Cost Scheme.

QueryByElements outputs a list of OverheadCostSchemes where the elements are as specified by the query parameters. The query elements are defined by the data type OverheadCostSchemeQueryElements. These elements include UUID, OverheadCostSchemeID, CompanyUUID, CompanyID, CostManagementFunctionalUnitUUID, CostManagementFunctionalUnitID, and InternalIndicator. A UUID is a GDT of type UUID and is a unique identifier of the OverheadCostScheme. The UUID is optional. An OverheadCostSchemeID is a GDT type of OverheadCostSchemeID. The OverheadCostSchemeID is a Unique identifier of the OverheadCostScheme and is optional. A CompanyUUID is a GDT of type UUID. The CompanyUUID is a universally unique identification of the company to which the overhead cost scheme is restricted and is optional. A CompanyID is a GDT of type CompanyID. The CompanyID is a unique identification of the company to which the overhead cost scheme is restricted and is optional. A CostManagementFunctionalUnitUUID is a GDT of type OrganisationalCentreID. The CostManagementFunctionalUnitUUID is a Unique identificatier of the Functional Unit that is responsible for Processing the Overhead Cost Scheme and is optional. In some implementations, a maximum of one of the above two parameters may be supplied. A InternalIndicator is a GDT of type: Indicator, Qualifier Internal and Specifies whether the overhead cost scheme is only used internally. The InternalIndicator is optional.

QueryByOffsettingObject outputs a list of OverheadCostSchemes that do have a given offsetting object. The query elements are defined by the data type OverheadCostSchemeOffsettingObjectQueryElements. These elements include CostCentreUUID, CostCentreID, and KeyDate. A CostCentreUUID is a GDT of type UUID. The CostCentreUUID is a universally unique identifier of a cost center and is optional. A CostCentreID is a GDT of type CostCentreID. The CostCentreID is a Unique identifier of a cost center and is optional. A KeyDate is a GDT of type Date, Qualifier Key. The KeyDate is date for which it is determined whether a cost centre is assigned to the scheme. The key date refers to the validity period of the cost centre assignment and is optional.

QueryByCategoryCode outputs a list of OverheadCostSchemes that are classified by the specified CategoryCode. The query elements are defined by the data type OverheadCostSchemeCategoryCodeQueryElements. These elements include CategoryAssignmentCategoryCode. A CategoryAssignmentCategoryCode is a GDT of type OverheadCostSchemeCategoryCode.

SubschemeUsage has a cardinality of c:cn. An OverheadCostScheme that embed the current OverheadCostScheme as a subscheme. This association may be redundant to the Subscheme association in node SubSchemeLine 97014.

Line is defined as an element in the overhead cost scheme that establishes the method of calculating an overhead rate, the amount of overhead to be allocated, and the object to be credited. Line may occur in the following complete and disjoint specializations SubSchemeLine, FixedAmountLine 97016, QuantityBasedLine 97018, AmountBasedLine 97022, and LineBasedLine 97026. The elements located at the line node can be defined by the type GDT: OverheadCostSchemeLineElements. These elements include UUID, OrdinalNumberValue, GroupCode, ActiveIndicator, TypeCode, TypeCode. A UUID is a GDT of type UUID and is a universally unique identifier of a Line. A OrdinalNumberValue is a GDT of type OrdinalNumberValue. The OrdinalNumberValue is a Line number (for sorting purposes) and is optional. A GroupCode is a GDT of type OverheadCostSchemeLineGroupCode. The GroupCode is a coded representation of the category of the overhead calculated in the line e.g. transportation or material and is optional. An ActiveIndicator is a GDT of type Indicator, Qualifier Active. The ActiveIndicator specifies whether the line should be included when the scheme is processed and is optional. A TypeCode is a GDT of type OverheadCostSchemeLineCode and is a Coded representation of the type of the line. The TypeCode specifies the specialization of the line.

Fields that depend on the LineTypeCode include OffsettingRuleUUID, AccountDeterminationOverheadCostSchemeLineGroupCode, CostRevenueElementCode, SetOfBooksID, RateRuleUUID, OverheadCostRateAmount, QuantityRoleCode, OverheadCostSchemeID, OverheadCostSchemeUUID. An OffsettingRuleUUID is a universally unique identification of an OffsettingRule that is used as a credit rule in the line that is a GDT of type UUID and is optional. In some implementations, the definitions can be exempted from the SubSchemeLine. An AccountDeterminationOverheadCostSchemeLineGroupCode is a coded representation of a group of OverheadCostSchemeLines to which the Line is assigned for the purpose of account determination with allocation postings and is a GDT of type AccountDeterminationOverheadCostSchemeLineGroupCode. The AccountDeterminationOverheadCostSchemeLineGroupCode is optional and in some implementations, the definitions can be exempted from the SubSchemeLine. A CostRevenueElementCode is a coded representation of the cost or revenue element to be used in the allocation of the line that is a GDT of type CostRevenueElementCode and is optional. In some applications, the definitions can be exempted from the SubSchemeLine. A SetOfBooksID is The set of books to be used in the allocation of the line and is a GDT of type SetOfBooksID and is optional. In some applications, the definitions can be exempted from the SubSchemeLine. The RateRuleUUID is a Universally unique identification of a RateRule that defines the overhead rates for the line and a GDT of type UUID and is optional. In some applications, the definitions can be exempted from the SubShemeLine and the FixedAmountLine. An OverheadCostRateAmount is the Overhead rate as currency amount and is a GDT of type Amount, Qualifier OverheadCostRate and is optional. In some applications, definitions can be specified in the FixedAmountLine. A QuantityRoleCode is the Coded representation of the quantity field used in the line as the basis for overhead allocation and is a GDT of type QuantityRoleCode. In some applications, definitions can be specified in the QuantityBasedLine. An OverheadCostSchemeID is a unique identification of an OverheadCostScheme embedded in the line and a GDT of type OverheadCostSchemeID. In some applications, definitions can be specified in the SubSchemeLine. An OverheadCostSchemeUUID is a Universally unique identification of an OverheadCostScheme embedded in the line and a GDT of UUID. In some applications, definitions can be specified in the SubSchemeLine. LineDescription 97030 has a cardinality of 1:cn.

SetOfBooks has a cardinality of c:cn. SetOfBooks is the set of books based on whose principles the line will be treated.

QueryByElements outputs a list of Lines where the elements are as specified by the query parameters. The query elements are defined by the data type OverheadCostSchemeLineQueryElements which is identical to the structure OverheadCostSchemeLineElements of the node. These elements may include UUID, OrdinalNumberValue, GroupCode, ActiveIndicator, TypeCode, OffsettingRuleUUID, AccountDeterminationOverheadCostSchemeLineGroupCode, CostRevenueElementCode, SetOfBooksID, RateRuleUUID, OverheadCostRateAmount, QuantityRoleCode, OverheadCostSchemeID, and OverheadCostSchemeUUID. A UUID is a Universally unique identifier of a Line and is a GDT of type UUID and is optional. An OrdinalNumberValue is a Line number (for sorting purposes) and is a GDT of type OrdinalNumberValue and is optional. A GroupCode is a Coded representation of the category of the overhead calculated in the line e.g. transportation or material and is a GDT of type OverheadCostSchemeLineGroupCode and is optional. An ActiveIndicator Specifies whether the line should be included when the scheme is processed and is a GDT of type Indicator, Qualifier Active and is optional. A TypeCode is a coded representation of the type of the line. Specifies the specialization of the line and is a GDT of type OverheadCostSchemeLineTypeCode and is optional. An OffsettingRuleUUID universally unique identification of an OffsettingRule that is used as a credit rule in the line and is a GDT of type UUID and is optional. An AccountDeterminationOverheadCostSchemeLineGroupCode and is a coded representation of a group of OverheadCostSchemeLines to which the Line is assigned for the purpose of account determination with allocation postings and is a GDT of type AccountDeterminationOverheadCostSchemeLineGroupCode and is optional. A CostRevenueElementCode is a coded representation of the cost or revenue element to be used in the allocation of the line and is a GDT of type CostRevenueElementCode and is optional. A SetOfBooksID is the set of books to be used in the allocation of the line and is a GDT of type SetOfBooksID and is optional. A RateRuleUUID is a universally unique identification of a RateRule that defines the overhead rates for the line and is a GDT of type UUID and is optional. An OverheadCostRateAmount is an Overhead rate as currency amount and is a GDT of type Amount, Qualifier OverheadCostRate and is optional. A QuantityRoleCode coded representation of the quantity field used in the line as the basis for overhead allocation and is a GDT of type QuantityRoleCode and is optional. An OverheadCostSchemeID and is a unique identification of an OverheadCostScheme embedded in the line and is a GDT of type OverheadCostSchemeID and is optional. An OverheadCostSchemeUUID is a universally unique identification of an OverheadCostScheme embedded in the line and is a GDT of type UUID and is optional.

SubSchemeLine is a line that references an existing OverheadCostScheme so that it can be used as a subscheme. It is used when a line in the overhead cost scheme that embeds another OverheadCostScheme in the current scheme. Subscheme has a cardinality of 1:cn. An OverheadCostScheme that is embedded in the current OverheadCostScheme as a subscheme. A SubSchemeLine may contain one SubScheme.

A FixedAmountLine is a line in which a fixed currency amount is specified as an overhead rate. It is a line in the overhead cost scheme that specifies a fixed amount as the overhead rate and establishes the currency amount and the object to be credited. OffsettingRule has a cardinality of 1:cn and is used for determining the offsetting object to be credited QuantityBasedLine is a line in which the overhead rate is defined based on quantities. It is a Line in the overhead cost scheme that specifies the overhead to be allocated based on a quantity. The QuantityBasedLine defines the type of quantity used as the basis for the allocation, the overhead rate, and the object to be credited. QuantityBasedLineBaseSelection97020 has a cardinality of 1:n.

RateRule has a cardinality of 1:cn and is the rule for determining the overhead rate. OffsettingRule has a cardinality of 1:cn and is the rule for determining the offsetting object to be credited. In some applications, the inbound association relationship RateRule may come from the specialization QuantityRateRule 97034 of the node RateRule.

QuantityBasedLineBaseSelection is a selection of quantity classifications e.g. AmountComponentCode for determining a basis for a quantity-based line in the overhead cost scheme. The elements located at the QuantityBasedLineBaseSelection node are defined by the type GDT including OverheadCostSchemeQuantityBasedLineBaseSelectionElements. The elements are CostRevenueElementCode which is a coded representation of the cost or revenue element to be used in the allocation of the line and a GDT of type CostRevenueElementCode.

AmountBasedLine is a line in which the overhead rate is defined based on currency amounts. It is a line in the overhead cost scheme that specifies the overhead to be allocated based on an amount that defines the type of amount used as the basis for the allocation, the overhead rate, and the object to be credited. AmountBasedLineBaseSelection 97024 has a Cardinality of 1:n.

RateRule has a cardinality of 1:cn and is used for determining the overhead rate. OffsettingRule has a cardinality of 1:cn and is used for determining the offsetting object to be credited. In some applications, the inbound association relationship RateRule may come from the specialization AmountRateRule 97040 of the node RateRule.

AmountBasedLineBaseSelection is a selection of amount classifications e.g. such as AmountComponentCode for determining the basis for an amount-based line in the overhead cost scheme. The elements located at the AmountBasedLineBaseSelection node are defined by the type GDT: OverheadCostSchemeAmountBasedLineBaseSelectionElements. These elements include the CostRevenueElementCode which is a coded representation of the cost or revenue element to be used in the allocation of the line which is a GDT of type CostRevenueElementCode.

LineBasedLine is a line in which the overhead rate is defined based on the sum of the values of the other lines in the scheme. It is a line in the overhead cost scheme that defines the allocation of overhead based on the values of other lines in the scheme. Defines the lines used as the basis for the allocation, the overhead rate, and the object to be credited. LineBasedLineBaseSelection 97028 has a Cardinality of 1:n.

RateRule has a cardinality of 1:cn and is used for determining the overhead rate. OffsettingRule has a cardinality of 1:cn and is used for determining the offsetting object to be credited. In some applications, the inbound association relationship RateRule may come from the specialization AmountRateRule of the node RateRule.

LineBasedLineBaseSelection is a selection of lines in an overhead cost scheme for determining the basis for a line-based line of that overhead cost scheme. The elements located at the LineBasedLineBaseSelection node are defined by the type GDT: OverheadCostSchemeLineBasedLineBaseSelectionElements. These elements include LineUUID, and OverheadCostSchemeLineBaseAmountCompositionCode. A LineUUID is a universally unique identification of the line to be read as a basis when the LineBasedLine is processed and is a GDT of type UUID. An OverheadCostSchemeLineBaseAmountCompositionCode is a coded representation of the base amount of the referenced OverheadCostSchemeLine that specifies which amounts of the referenced line are to be used as a base and is a GDT of type OverheadCostSchemeLineBaseAmountCompositionCode.

BaseLine has a cardinality of 1:cn and is a line whose UUID represents the selection. In some applications, the inbound aggregation relationship Line may come from the specialization AmountBasedLine or QuantityBasedLine of the Line node.

LineDescription is a language-dependent description of a line in the overhead cost scheme. The elements located at the LineDescription node are defined by the type GDT: OverheadCostSchemeLineDescriptionElements. These elements include Description which is the natural-language description of the line and a GDT of type MEDIUM_description. This is optional.

RateRule in the overhead cost scheme consists of one or more time-based rates. RateRule may occur in the following complete and disjoint specializations. They include QuantityRateRule and AmountRateRule. QuantityRateRule is the rate rule for quantity-based lines. AmountRateRule is the rate rule for amount-based lines. The elements located at the RateRule node are defined by the type GDT: OverheadCostSchemeRateRuleElements. These elements include UUID and TypeCode. A UUID universally unique identification of the RateRule which is a GDT of type UUID. A TypeCode is a coded representation of the type of the RateRule that specifies one of the two specializations of the RateRule e.g. QuantityRateRule or AmountRateRule and is a GDT of type OverheadCostSchemeRateRuleTypeCode. A RateRuleDescription has a Cardinality of 1:cn.

QuantityRateRule is a Rate rule for a quantity-based line in the overhead cost scheme e.g. QuantityBasedLine. QuantityRateRuleRate 97036 has a Cardinality of 1:n.

QuantityRateRuleRate is an overhead rate for a QuantityRateRule. The elements located at the QuantityRateRuleRate node are defined by the type GDT: OverheadCostSchemeQuantityRateRuleRateElements. These elements include ValidityPeriod, OverheadCostRateAmount, Quantity, and QuantityTypeCode. ValidityPeriod is the validity period of the rate and is a GDT of type DatePeriod, Qualifier Validity—Duration field is not used. OverheadCostRateAmount is the overhead rate as currency amount and is a GDT of type Amount, Qualifier OverheadCostRate. Quantity is the quantity for which the overhead amount is calculated and is a GDT of type Quantity. QuantityTypeCode specifies the type of the Quantity and is a GDT of QuantityTypeCode.

AmountRateRule is a rate rule for an amount-based line in the overhead cost scheme e.g. AmountBasedLine. AmountRateRuleRate 97038 has a Cardinality of 1:n. An AmountRateRuleRate is a rate for an AmountRateRule. The elements located at the AmountRateRuleRate node are defined by the type GDT: OverheadCostSchemeAmountRateRuleRateElements. These elements include ValidityPeriod and OverheadCostRatePercent. A ValidityPeriod is the validity period of the rate and is a GDT of type DatePeriod, Qualifier Validity—Duration field is not used. An OverheadCostRatePercent is the percentage used to calculate the overhead and is a GDT of type Percent, Qualifier OverheadCostRate.

RateRuleDescription is a language-dependent description of a rate rule in an overhead cost scheme. The elements located at the RateRuleDescription node are defined by the type GDT: OverheadCostSchemeRateRuleRateRuleDescriptionElements. These elements include Description which is a natural-language description of the rule for determining the rate and a GDT of type MEDIUM_description. This is optional.

OffsettingRule is an offsetting rule for a line in the overhead cost scheme and Consists of one or more time-based object assignments for determining the offsetting object. The elements located at the OffsettingRule node are defined by the type GDT: OverheadCostSchemeOffsettingRuleElements. These elements include UUID. A UUID is a universally unique identifier of an OffsettingRule and is a GDT of type UUID. OffsettingRuleObjectAssignment 97044 has a Cardinality of 1:n. OffsettingRuleDescription 97052 has a Cardinality of 1:cn.

OffsettingRuleObjectAssignment is an assignment of an accounting object to an offsetting rule for an overhead cost scheme. The elements located at the OffsettingRuleObjectAssignment node are defined by the type GDT: OverheadCostSchemeOffsettingRuleObjectAssignmentElements. These elements include ValidityPeriod, CostCentreID, and CostCentreUUID. A ValidityPeriod is the validity period of the assignment and is a GDT of type DatePeriod, Qualifier Validity—Duration field is not used. CostCentreID is a unique identification of the cost center used as the offsetting object and is a GDT of type CostCentreID. A CostCentreUUID is a universally unique identification of the cost center used as the offsetting object and is GDT of type UUID. CostCentre has a cardinality of 1:n and is assigned as the offsetting object.

An OffsettingRuleDescription is a language-dependent description of an offsetting rule in the overhead cost scheme. The elements located at the OffsettingRuleDescription node are defined by the type GDT: OverheadCostSchemeOffsettingRuleDescriptionElements. These elements include Description. Description is a natural-language description of the offsetting rule and is a GDT of type MEDIUM_description.

A description 97050 is a language-dependent description of an overhead cost scheme. The elements located at the Description node are defined by the type GDT: OverheadCostSchemeDescriptionElements. These elements include description which is a natural-language description of the overhead cost scheme and a GDT of type MEDIUM_description. This is optional.

CategoryAssignment is an assignment of the overhead cost scheme to an overhead cost scheme category. The elements located at the CategoryAssignment node are defined by the type GDT: OverheadCostSchemeCategoryAssignmentElements. These elements include OverheadCostSchemeCategoryCode which is a coded representation of the category to which the overhead cost scheme is assigned and is a GDT of type OverheadCostSchemeCategoryCode.

DO: AccessControlList is a list of access groups that have access to an OverheadCostLedgerAccount.

Figures 1, 98:
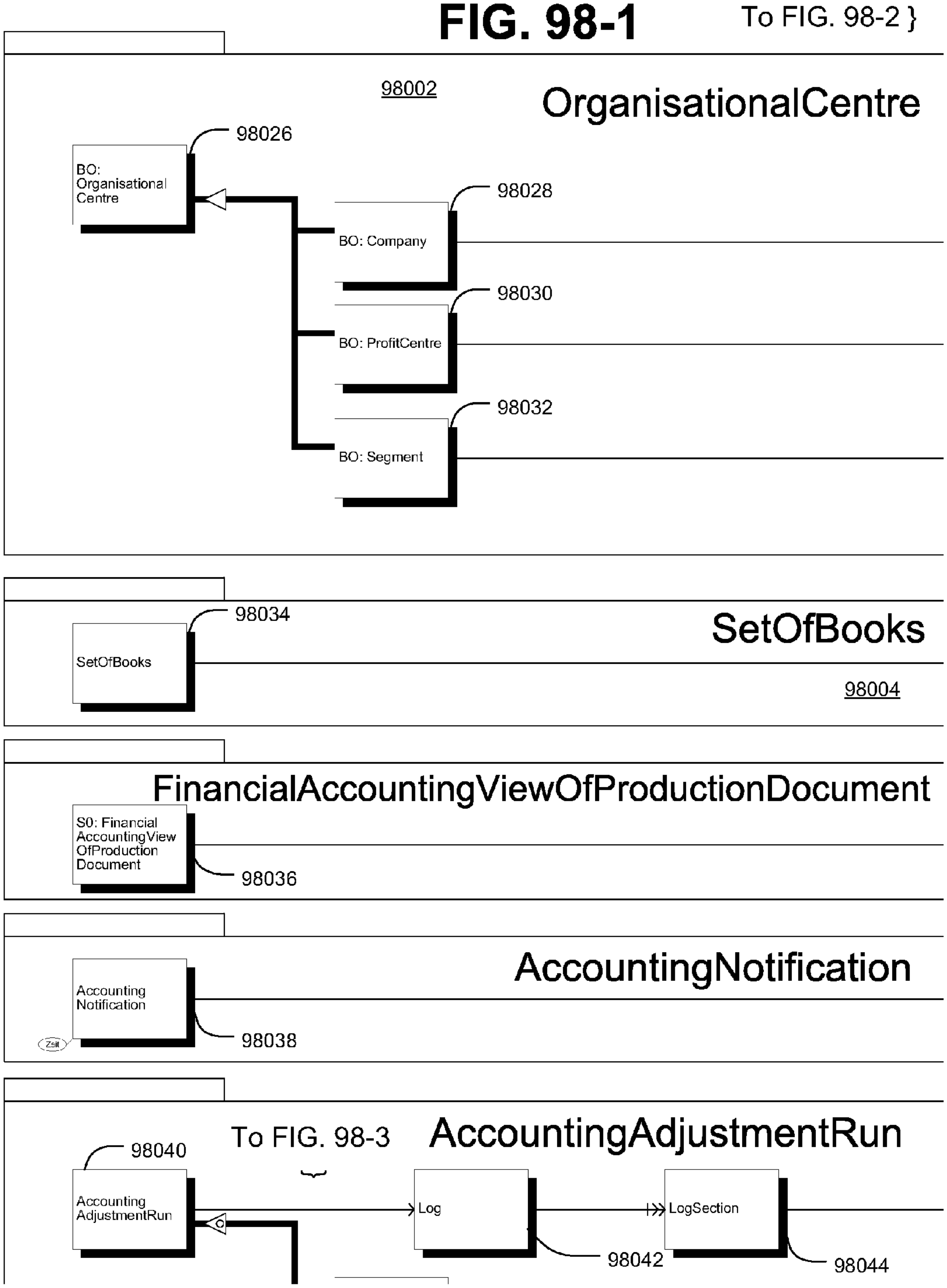
Figures 2, 98:
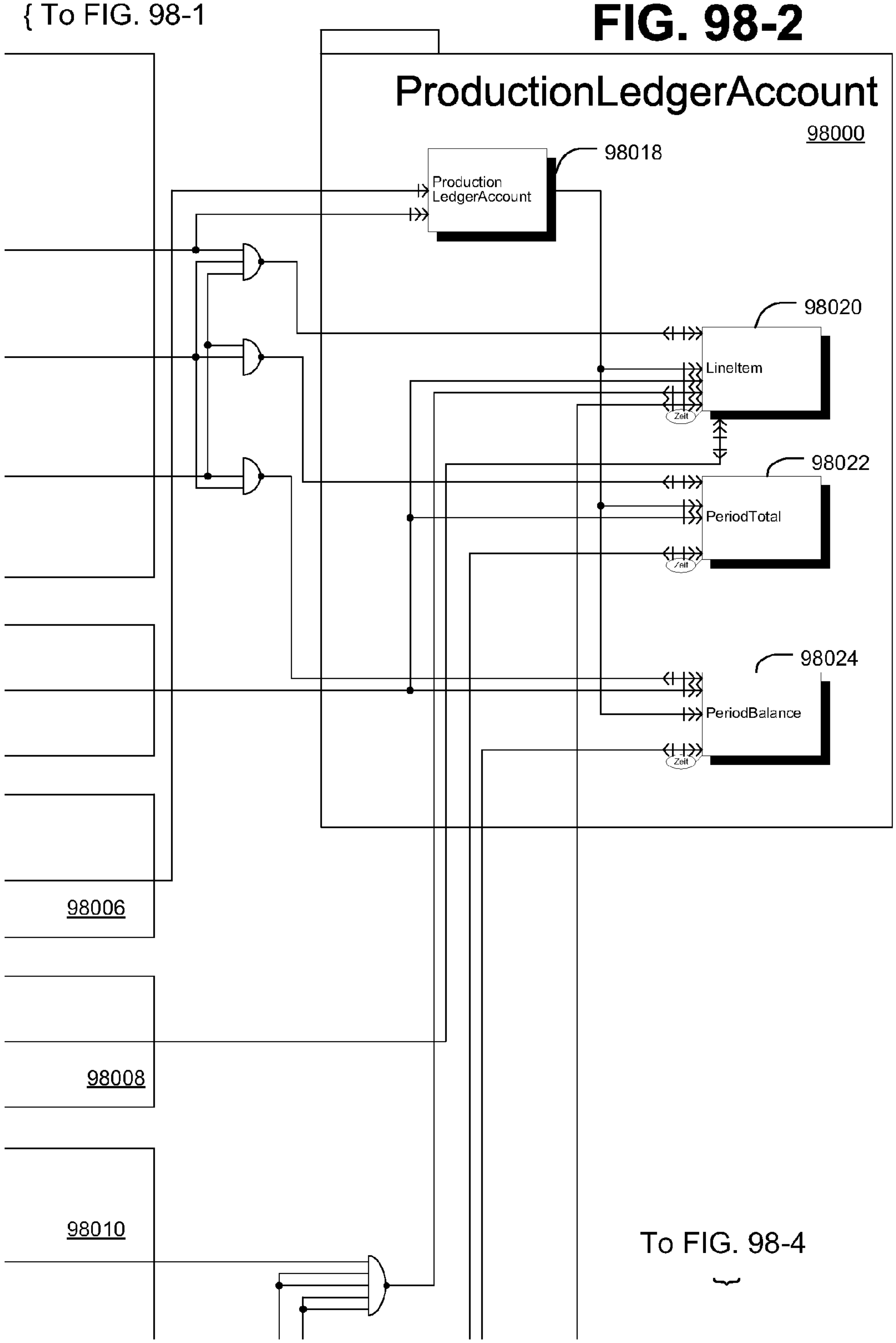
Figures 3, 98:
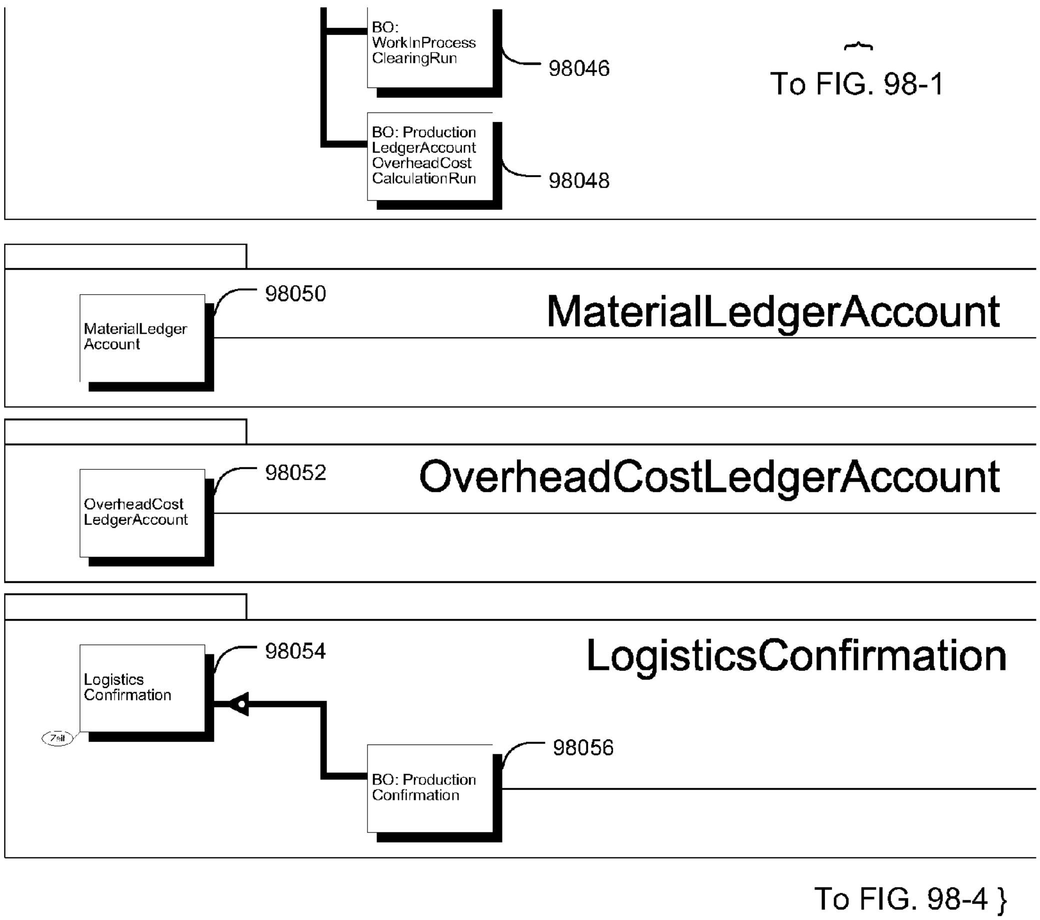
Figures 4, 98:
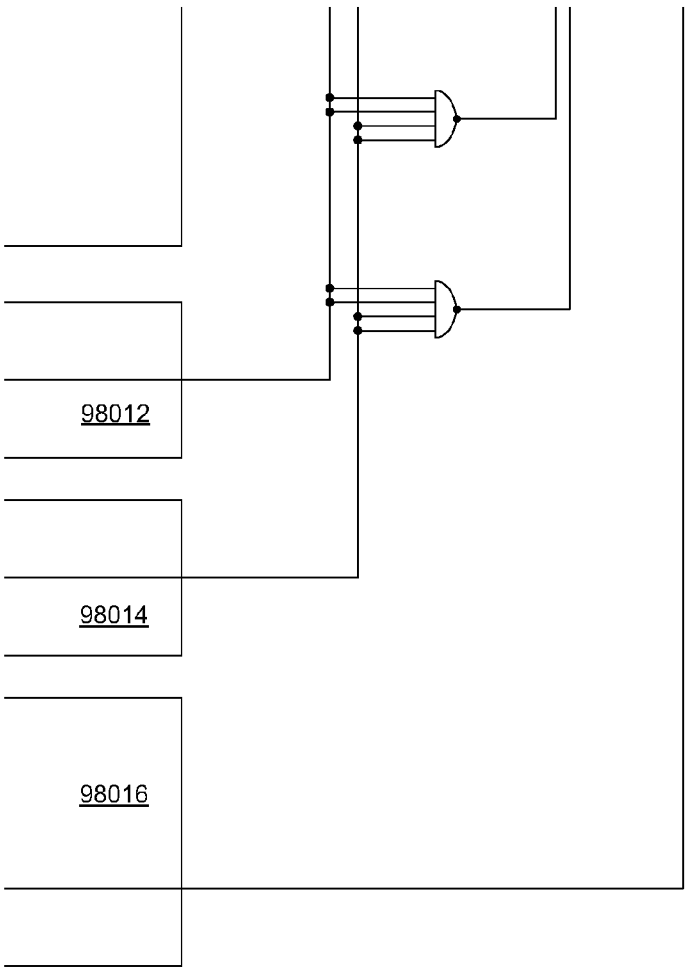

FIGS. 98-1 through 98-4 illustrate one example of an ProductionLedgerAccount business object model 98000. Specifically, this model depicts interactions among various hierarchical components of the ProductionLedgerAccount, as well as external components that interact with the ProductionLedgerAccount (shown here as 98002 through 98016 and 98026 through 98056).

Business Object ProductionLedgerAccount

ProductionLedgerAccount is the record for a Company based on the principle of double-entry bookkeeping that shows the effects of business transactions in a Company on the value of a defined part of the work-in-process inventory or expenses in production. The production ledger account can serve as a structuring element for collecting and evaluating postings in the production ledger. A ProductionLedgerAccount can contain values and quantities pertaining to production in a company. In addition to individual account movements related to business transactions, it can contain period-based totals and balances that summarize the movements.

The business object ProductionLedgerAccount is part of the process component Accounting. A ProductionLedgerAccount can contain: a period-based statement for each set of books and business transaction category regarding the quantity and value of the change in the work-in-process inventory or regarding expenses incurred in production, an itemization for each business transaction category showing the quantity and value of the change in the work-in-process inventory or showing the expenses incurred in production, an period-based statement for each set of books regarding the quantity and value of the work-in-process inventory or the total amount of expenses incurred for the production object. Further, ProductionLedgerAccount is represented by the node ProductionLedgerAccount 98018.

When a business transaction causing a quantity/value change to a ProductionLedgerAccount is updated, a set of rules can determine which GeneralLedgerAccounts are concerned. Updating the business transaction can change the quantity and/or value on the GeneralLedgerAccounts selected in this way by the same amount.

Node Structure of Business Object ProductionLedgerAccount (Root Node of the Business Object ProductionLedgerAccount)

ProductionLedgerAccount is the record for a Company based on the principle of double-entry bookkeeping that shows the effects of business transactions in a Company on the value of a defined part of the work-in-process inventory or expenses in production. The production ledger account can include a period-based statement for each set of books and business transaction category regarding the quantity and value of the change in the work-in-process inventory or expenses in production, and on the quantity and value of the work-in-process inventory or the total amount of expenses incurred for the production object.

Subsequently the term “offsetting” can be used. In particular, an OffsettingSubledgerAccount is a SubledgerAccount that can contain—with reference to the same Accounting Document—the inverse representation of the business transaction stated in an SubledgerAccountLineItem. The inverse representation can be required by the double entry bookkeeping principle. The compliance with this principle can lead to a zero balance of the AccountingDocument that completely represents the Business transaction.

An example for offsetting could be as follows: an InventoryChangeItem of a ProductionLotConfirmation may be represented as a debit LineItem of a ProductionLedgerAccount and as an inverse credit LineItem of a MaterialLedgerAccount.

Subsequently also a generic approach for referencing Original Entry Documents can be used, where an Original Entry Document is a document that can be used for auditing purposes and can verify that the value stated in the LineItem of a ledger account has been booked on the base of a real business transaction.

An Original Entry Document may be contained in another Object, the Original Entry DocumentContainingObject. Typical such constellations may include: FinancialAuditTrailDocumentation contained in a Host object like DuePayment, DueClearing, Dunning, and PaymentAllocation from Operative Financials, LogSection contained in all AccountingAdjustmentRun-MDROs (e.g., InventoryPriceChangeRun, GeneralLedgerAccountBalanceDistributionRun, FixedAssetDepreciationRun, WorkInProcessClearingRun), SettlementResultAccounting contained in an ExpenseReport, PeriodItem contained in an EmployeeTimeCalendar.

The elements located directly at the ProductionLedgerAccount node are defined by the type GDT: ProductionLedgerAccountElements. In some implementations, these elements may include: UUID, FinancialAccountingViewOfProductionDocumentUUID, CompanyUUID, ProductionLedgerAccountKey.

UUID is a universal identification, which may be unique, of the ProductionLedgerAccount. UUID may be based on GDT UUID. FinancialAccountingViewOfProductionDocumentUUID is a universal identification, which may be unique, of the FinancialAccountingViewOfProductionDocument for which the ProductionLedgerAccount records business transactions. FinancialAccountingViewOfProductionDocumentUUID may be based on GDT UUID. CompanyUUID is a universal identification, which may be unique, of the Company for which the ProductionLedgerAccount is carried. CompanyUUID may be based on GDT UUID. ProductionLedgerAccountKey is the business key of the ProductionLedgerAccount. ProductionLedgerAccountKey may be based on GDT ProductionLedgerAccountKey.

The following composition relationships to subordinate nodes may exist. The ProductionLedgerAccount can have a 1:cn cardinality relationship with a LineItem subordinate node 98020. The ProductionLedgerAccount can have a 1:cn cardinality relationship with a PeriodTotal subordinate node 98022. The ProductionLedgerAccount can have a 1:cn cardinality relationship with a PeriodBalance subordinate node 98024.

The following inbound aggregation relationships may exist. From business object FinancialAccountingViewOfProductionDocument/Root, the business object ProductionLedgerAccount can have a 1:c cardinality inbound aggregation relationship with FinancialAccountingViewOfProductionDocument, where FinancialAccountingViewOfProductionDocument denotes the FinancialAccountingViewOfProductionDocument for which quantities and values are updated in the ProductionLedgerAccount. The FinancialAccountingViewOfProductionDocument is used also for access control to a ProductionLedgerAccount. From business object Company/node Company, the business object ProductionLedgerAccount can have a 1:cn cardinality inbound aggregation relationship with Company, where Company denotes the Company for which the account is carried.

There may be multiple enterprise service infrastructure actions, such as, for example, WorkInProcessClearing and OverheadCalculation.

The WorkInProcessClearing action allocates the work in process (WIP) on the ProductionLedgerAccount to one or more receivers. It can also reverse a previous clearing. WIP clearing can be performed at any time, regardless of the status. Whether the existing WIP is cleared depends on whether the associated ProductionLot is completed on the key date of WIP clearing. If the associated ProductionLot is completed on the key date of WIP clearing, the balance on the line item/totals records of the ProductionLedgerAccount can be determined and posted as the clearing amount. The balance on the ProductionLedgerAccount is then zero. If the associated ProductionLot is not completed on the key date of WIP clearing, any existing clearing runs may be canceled. That is, the amount of the existing clearing runs is written back to WIP. It is possible for clearing runs to exist for a ProductionLot that is not completed if the ProductionLot was completed but then the completed status was withdrawn. The affected nodes are LineItem, PeriodTotal, and PeriodBalance. WIP clearing may generate an accounting document. Furthermore, a line item may be generated in the LedgerAccount BO belonging to the receivers (such as MaterialLedgerAccount), and any existing period total or period balance record is adjusted or a new one created.

The WorkInProcessClearing action elements are defined by the data type: ProductionLedgerAccountRootWorkInProcessClearingActionElements. These are: MassDataRunObjectID, MassDataRunObjectTypeCode, AccountingBusinessTransactionTypeCode, and CompanyUUID. MassDataRunObjectID is a universally unique identifier for an Accounting Adjustment Run, and is a GDT of type MassDataRunObjectID. MassDataRunObjectTypeCode is a coded representation of a type of the Mass Data Run Object, and is a GDT of type MassDataRunObjectTypeCode. AccountingBusinessTransactionTypeCode is a coded representation for the business transaction type of the Accounting Adjustment Run, and is a GDT of type AccountingBusinessTransactionTypeCode. CompanyUUID is a universally unique identifier for the company, for which the action is executed. In some implementations, CompanyUUID may be transferred only then when processing of the Accounting Adjustment Run is executed per company and set of books. CompanyUUID is a GDT of type UUID and may be optional. In some implementations, the WorkInProcessClearing action may be executed only by the BO AccountingAdjustmentRun.

The OverheadCalculation action posts overhead rates to the ProductionLedgerAccount based on the overhead structure for production in the ProductionLedgerAccount. This credits the objects specified in the associated overhead structure (such as the cost center). Overhead calculation can be performed at any time, regardless of the status. Overhead calculation can generate line items and adjusts the period totals and period inventories accordingly. The affected nodes are LineItem, PeriodTotal, and PeriodBalance. Overhead calculation generates an accounting document. Furthermore, a line item is generated in the LedgerAccount BO belonging to the credit object (such as OverheadCostLedgerAccount), and any existing period total or period balance record can be adjusted or a new one created.

The OverheadCalculation action elements are defined by the data type: ProductionLedgerAccountRootOverheadCalculationActionElements. These are: MassDataRunObjectID, MassDataRunObjectTypeCode, AccountingBusinessTransactionTypeCode, and CompanyUUID. MassDataRunObjectID is a universally unique identifier for an Accounting Adjustment Run and is a GDT of type MassDataRunObjectID. MassDataRunObjectTypeCode is a coded representation of a type of the Mass Data Run Object and is a GDT of type MassDataRunObjectTypeCode. AccountingBusinessTransactionTypeCode is a coded representation for the business transaction type of the Accounting Adjustment Run and is a GDT of type AccountingBusinessTransactionTypeCode. CompanyUUID is a universally unique identifier for the company, for which the action is executed. In some implementations, CompanyUUID is transferred only when processing of the Accounting Adjustment Run is executed per company and set of books. CompanyUUID is a GDT of type UUID and may be optional. In some implementations, the OverheadCalculation action is executed only by the BO AccountingAdjustmentRun.

QueryByOperationalDocument outputs a list of all ProductionLedgerAccounts that update quantities and values for a given ProductionLot (which is related to the FinancialsViewOfProductionDocument to which the ProductionLedgerAccounts are assigned) or that exist within a Company. Data type: ProductionLedgerAccountOperationalDocumentQueryElements may define the following query elements. FinancialAccountingViewOfProductionDocumentOperational-DocumentReferenceFormattedID is a GDT of type ObjectNodeFormattedID and may be optional. CompanyID can be a unique identification from which is derived the globally unique identification of the company in the root. CompanyID is a GDT of type OrganisationalCentreID and may be optional. CompanyUUID is the globally unique identification of the company. CompanyUUID is a GDT of type UUID and may be optional. FinancialAccountingViewOfProductionDocumentPermanentEstablishmentID can be a unique identification from which is derived the globally unique identification of the permanent establishment. FinancialAccountingViewOfProductionDocumentPermanentEstablishmentID is a GDT of type OrganisationalCentreID and may be optional. FinancialAccountingViewOfProductionDocumentPermanentEstablishmentUUID is the globally unique identification of the permanent establishment. FinancialAccountingViewOfProductionDocumentPermanentEstablishmentUUID is a GDT of type UUID and may be optional.

LineItem

LineItem is a statement on the value of a work-in-process inventory change or an expense in production resulting from a single business transaction. A line item can contain detailed information on the business transaction needed by accounting, such as a posting date and a reference to the Original Entry Document. The elements located directly at the TotalLineItem node are defined by the type GDT: [SubledgerAccount]LineItemElements. In certain implementations, these elements may include: UUID, SetOfBooksID, SegmentUUID, ProfitCentreUUID, PartnerCompanyUUID, PartnerSegmentUUID, PartnerProfitCentreUUID, AccountingDocumentUUID, AccountingDocumentID, AccountingDocumentItemID, OriginalEntryDocumentContainingObjectReference, OriginalEntryTransactionUUID, OriginalEntryDocumentReference, OriginalEntryDocumentItemReference, OriginalEntryDocumentItemTypeCode, OriginalEntryDocumentPartnerID, AccountingNotificationUUID, AccountingNotificationItemGroupItemUUID, GeneralLedgerAccountLineItemUUID, GeneralLedgerAccountLineItemAccountingDocumentItemGroupID, OffsettingSubledgerAccountUUID, OffsettingSubledgerAccountTypeCode, OriginalOffsettingSubledgerAccountUUID, OriginalOffsettingSubledgerAccountTypeCode, SystemAdministrativeData, ChartOfAccountsCode, ChartOfAccountsItemCode, AccountingBusinessTransactionTypeCode, TypeCode, SubledgerAccountChargeTypeCode, CostRevenueElementCode, AccountingDocumentTypeCode, AccountingDocumentNote, AccountingDocumentItemNote, PostingDate, OriginalEntryDocumentDate, AccountingBusinessTransactionDate, CurrencyConversionDate, FiscalYearVariantCode, FiscalYearID, AccountingPeriodID, AccountingClosingStepCode, AccountingDocumentItemAccountingGroupID, GeneralLedgerMovementTypeCode, DebitCreditCode, CancellationDocumentIndicator, CancellationOriginalEntryDocumentContainingBusinessObjectReference, CancellationOriginalEntryDocumentReference, CancellationOriginalEntryDocumentTransactionUUID, CancelledIndicator, BusinessTransactionCurrencyAmount, LineItemCurrencyAmount, LocalCurrencyAmount, SetOfBooksCurrencyAmount, HardCurrencyAmount, IndexBasedCurrencyAmount, ValuationQuantity, and ValuationQuantityTypeCode.

UUID is a universal identifier, which may be unique, of the LineItem. UUID may be based on GDT UUID.

SetOfBooksID is an identification, which may be unique, of the SetOfBooks according to whose specifications the LineItem was created. SetOfBooksID may be based on GDT SetOfBooksID.

SegmentUUID is a universal identification, which may be unique, of the Segment to which the value and quantity of the LineItem is/are allocated and may be optional. SegmentUUID may be based on GDT UUID.

ProfitCentreUUID is a universal identification, which may be unique, of the ProfitCentre to which the value and quantity of the LineItem is/are allocated and may be optional. ProfitCentreUUID may be based on GDT UUID.

PartnerCompanyUUID is a universal identification, which may be unique, of a Company that acts in the business transaction stated in the LineItem as an intra corporate partner and may be optional. PartnerCompanyUUID can be based on GDT UUID.

PartnerSegmentUUID is a universal identification, which may be unique, of a Segment that acts in the business transaction stated in the LineItem as an intra corporate partner and may be optional. PartnerSegmentUUID can be based on GDT UUID.

PartnerProfitCentreUUID is a universal identification, which may be unique, of a ProfitCentre that acts in the business transaction stated in the LineItem as an intra corporate partner and may be optional. PartnerProfitCentreUUID can be based on GDT UUID.

AccountingDocumentUUID is a universal identification, which may be unique, of the AccountingDocument that records the entire business transaction in Accounting. AccountingDocumentUUID can be based on GDT UUID.

AccountingDocumentID is an identification, which may be unique, of the AccountingDocument that records the entire business transaction in Accounting. AccountingDocumentID may be based on GDT BusinessTransactionDocumentID.

AccountingDocumentItemID is an identification, which may be unique, of the corresponding AccountingDocumentItem in the AccountingDocument which records the value change according to the criteria of GeneralLedger. AccountingDocumentItemID can be based on GDT BusinessTransactionDocumentItemID.

OriginalEntryDocumentContainingObjectReference is a reference to an Object containing the Original Entry Document. OriginalEntryDocumentContainingObjectReference may be based on GDT ObjectNodeReference, Qualifier: OriginalEntryDocumentContaining.

OriginalEntryTransactionUUID is a universal identifier, which may be unique, of the transaction during which the Original Entry Document was created or changed. OriginalEntryTransactionUUID may be based on GDT UUID.

OriginalEntryDocumentReference is a reference to the document, that keeps the original entry of the business transaction. OriginalEntryDocumentReference may be based on GDT ObjectNodeReference.

OriginalEntryDocumentItemReference is the reference to an item of the OriginalEntryDocument. The value change recorded in the [SubledgerAccount]Item can be verified by that item of the OriginalEntryDocument. OriginalEntryDocumentItemReference may be based on GDT ObjectNodeReference.

OriginalEntryDocumentItemTypeCode is the coded representation of the Item Type of the referred OriginalEntryDocumentItem and may be optional. OriginalEntryDocumentItemTypeCode may be based on GDT BusinessTransactionDocumentItemTypeCode. This element can be used if the Original Entry Document is a Business Transaction Document.

OriginalEntryDocumentPartnerID is an identification of the Original Entry Document as assigned by the business partner, for example, the ID of the Supplier Invoice assigned by the Supplier. OriginalEntryDocumentPartnerID may be optional and may be based on GDT BusinessTransactionDocumentID. This element can be used if the Original Entry Document is a Business Transaction Document and if the Original Entry Document is identical to the Original Entry Document Containing Object.

AccountingNotificationUUID is a universal identification, which may be unique, of the notification sent to Financial Accounting about the business transaction stated in the LineItem. AccountingNotificationUUID may be optional and can be based on GDT UUID. AccountingNotificationItemGroupItemUUID is a universal identification, which may be unique, of the AccountingNotificationItemGroupItem, which triggers the posting of this [SubledgerAccount]Item. AccountingNotificationItemGroupItemUUID may be optional and can be based on GDT UUID. GeneralLedgerAccountLineItemUUID is a universal identification, which may be unique, of a LineItem of a GeneralLedgerAccount that records the value change of the [SubledgerAccount]LineItem in the GeneralLedger. GeneralLedgerAccountLineItemUUID may be based on GDT UUID.

GeneralLedgerAccountLineItemAccountingDocumentItemGroupID is a universal identification, which may be unique, of the group of all AccountingDocumentItems that are summarized together in a GeneralLedgerAccountLineItem. The LineItem can correspond to one AccountingDocumentItem belonging to the group. GeneralLedgerAccountLineItemAccountingDocumentItemGroupID may be based on GDT BusinessTransactionDocumentItemGroupID.

OffsettingSubledgerAccountUUID is a universal identification, which may be unique, of a SubledgerAccount (e.g., a MaterialLedgerAccount) in whose LineItems the inverse representation of the business transaction can be stated. OffsettingSubledgerAccountUUID may be based on GDT UUID. OffsettingSubledgerAccountTypeCode is the coded representation of the type of the OffsettingSubledgerAccount to which the [SubledgerAccount]LineItem refers. OffsettingSubledgerAccountTypeCode may be based on GDT SubledgerAccountTypeCode. In some implementations, restrictions may be applicable: the code values 2 (i.e., MaterialLedgerAccount), and 9 (i.e., Overhead Costs Ledger Account) can occur.

OriginalOffsettingSubledgerAccountUUID is a universal identification, which may be unique, of a SubledgerAccount which originally—before an account reassignment took place contained the inverse representation of the business transaction. An example for such a reassignment is a split of a ProductionLot. OriginalOffsettingSubledgerAccountUUID may be optional and can be based on GDT UUID.

OriginalOffsettingSubledgerAccountTypeCode is a coded representation of the type OriginalOffsettingSubledgerAccount to which the [SubledgerAccount]LineItem refers and can be original. OriginalOffsettingSubledgerAccountTypeCode may be based on GDT SubledgerAccountTypeCode. In some implementations, restrictions may be applicable: the code values 2 (i.e., MaterialLedgerAccount), and 9 (i.e., Overhead Costs Ledger Account) can occur.

SystemAdministrativeData is the administrative data stored in a system. This data includes the system user and change time. SystemAdministrativeData may be based on GDT SystemAdministrativeData.

ChartOfAccountsCode is a coded representation of the ChartOfAccounts containing the ChartOfAccountsItem that classifies—for general ledger accounting purposes—the value stated in the LineItem. ChartOfAccountsCode may be based on GDT ChartOfAccountsCode.

ChartOfAccountsItemCode is a coded representation of a ChartOfAccountsItem that classifies—for general ledger accounting purposes—the value stated in the LineItem. ChartOfAccountsItemCode may be based on GDT ChartOfAccountsItemCode.

AccountingBusinessTransactionTypeCode is a coded representation of the type of the business transaction stated in the [SubledgerAccount]LineItem. It can classify the business transaction according to Accounting criteria. AccountingBusinessTransactionTypeCode may be based on GDT AccountingBusinessTransactionTypeCode.

TypeCode is the coded representation of the type of the LineItem. TypeCode may be based on GDT SubledgerAccountLineItemTypeCode. In some implementations, restrictions may be applicable: code value 03010 (i.e., Work in Process) can occur.

SubledgerAccountChargeTypeCode is the coded representation of the type of ProductionLedgerAccount debit or credit for which the period total keeps values and quantities. The type of debit or credit may influence how work in process is cleared. SubledgerAccountChargeTypeCode may be based on GDT SubledgerAccountChargeTypeCode. There may not be restrictions.

CostRevenueElementCode is the coded representation of the value component that classifies the value that flowed from the OffsettingLedgerAccount to the ProductionLedgerAccount or vice-versa. CostRevenueElementCode may be based on GDT CostRevenueElementCode.

AccountingDocumentTypeCode is the coded representation of the type of the AccountingDocument to which the LineItem refers by the AccountingDocumentReference. AccountingDocumentTypeCode may be based on GDT AccountingDocumentTypeCode. AccountingDocumentNote is the natural-language comment that applies the AccountingDocument referred via the AccountingDocumentReference—as a whole rather than to individual items. AccountingDocumentNote may be optional and can be based on GDT SHORT_Note. AccountingDocumentItemNote is the natural-language comment pertaining to the AccountingDocumentItem to which the LineItem refers by the AccountingDocumentReference and may be optional. AccountingDocumentItemNote may be based on GDT SHORT_Note.

PostingDate is the date with which the business transaction is effectively recorded in Accounting. Effectively this may mean that period totals and balances in accounting are updated with this date. PostingDate may be based on GDT Date, Qualifier: Posting.

OriginalEntryDocumentDate is the issue date of the Original Entry Document. OriginalEntryDocumentDate may be based on GDT Date, Qualifier: OriginalEntryDocument.

AccountingBusinessTransactionDate is the date at which the business transaction took place applying the criteria of Accounting. AccountingBusinessTransactionDate may be based on GDT Date, Qualifier: BusinessTransaction.

CurrencyConversionDate is the date that is used for the currency translation applied to amounts in the accounting document. CurrencyConversionDate may be optional and can be based on GDT Date, Qualifier CurrencyConversion.

FiscalYearVariantCode is the coded representation of the FiscalYearVariant according to whose fiscal year definition (e.g., begin, end, period definition) the FiscalYearID and the AccountingPeriodID are derived. FiscalYearVariantCode may be based on GDT FiscalYearVariantCode.

FiscalYearID is the identification of the fiscal year in which the LineItem is posted. FiscalYearID may be based on GDT FiscalYearID.

AccountingPeriodID is the identification of the accounting period in which the LineItem is posted. AccountingPeriodID may be based on GDT AccountingPeriodID.

AccountingClosingStepCode is the coded representation of the closing step of the accounting document and may be optional. AccountingClosingStepCode can be based on GDT AccountingClosingStepCode.

AccountingDocumentItemAccountingGroupID is an identification, which may be unique, of a group of AccountingDocumentItems belonging together and applying the criteria of Accounting. It can be used to indicate the items of an AccountingDocument that belong together (e.g., in partial zero-balance checking within the Accounting Document). AccountingDocumentItemAccountingGroupID may be based on GDT BusinessTransactionDocumentItemGroupID. An example could be an activity confirmation from production that contains items for actual working times and also for materials used for the production process. The created AccountingDocumentItems can be grouped together according to the material movement or working time confirmation they belong to.

GeneralLedgerMovementTypeCode is a coded representation of the type of movement with which the value change is recorded for GeneralLedger purposes in the GeneralLedgerAccount and may be optional. GeneralLedgerMovementTypeCode can be based on GDT GeneralLedgerMovementTypeCode. There may not be restrictions.

DebitCreditCode is the coded representation of debit or credit. It can specify whether the line item is assigned to the debit or credit side of the GeneralLedger account. DebitCreditCode may be based on GDT DebitCreditCode.

CancellationDocumentIndicator indicates whether the AccountingDocument to which the LineItem refers by the AccountingDocumentReference refers to a Cancellation Original Entry Document and may be optional. CancellationDocumentIndicator may be based on GDT Indicator, Qualifier: CancellationDocument.

CancellationOriginalEntryDocumentContainingBusinessObjectReference is a reference to the Business Object containing the OriginalEntryDocument that cancelled this LineItem and may be optional. CancellationOriginalEntryDocumentContainingBusinessObjectReference can be based on GDT ObjectNodeReference Qualifier: CancellationOriginalEntryDocumentContaining.

CancellationOriginalEntryDocumentReference is a reference to the OriginalEntryDocument that cancelled this LineItem and may be optional. CancellationOriginalEntryDocumentReference can be based on GDT ObjectNodeReference Qualifier: Cancellation.

CancellationOriginalEntryDocumentTransactionUUID is a universal identifier, which may be unique, of the transaction during which the CancellationOriginalEntryDocument was created or changed and may be optional. CancellationOriginalEntryDocumentTransactionUUID can be based on GDT UUID.

CancelledIndicator indicates if the line item has been cancelled and may be optional. CancelledIndicator may be based on GDT IndicatorQualifierCancelled.

BusinessTransactionCurrencyAmount is the value of the LineItem in transaction currency and may be optional. For example, the transaction currency can be the currency agreed on by two business partners for their business relationship. BusinessTransactionCurrencyAmount can be based on GDT Amount. Qualifier: BusinessTransactionCurrency.

LineItemCurrencyAmount is the value of the LineItem in LineItem currency and may be optional. LineItemCurrencyAmount may be based on GDT Amount. Qualifier: LineItem.

LocalCurrencyAmount is the value of the LineItem in the local currency of the Company carrying the account. The local currency can be considered the currency in which the local books are kept. LocalCurrencyAmount may be based on GDT Amount, Qualifier: LocalCurrency.

SetOfBooksCurrencyAmount is the value of the LineItem in the currency selected for the set of books and may be optional. SetOfBooksCurrencyAmount can be based on GDT Amount, Qualifier: SetOfBooksCurrency.

HardCurrencyAmount is the value of the LineItem, in the hard currency of the country of the Company carrying the account and may be optional. The hard currency can be a stable, country-specific currency that is used in high-inflation countries. HardCurrencyAmount may be based on GDT Amount, Qualifier: HardCurrency.

IndexBasedCurrencyAmount is the value of the LineItem in the index-based currency of the country of the Company carrying the account and may be optional. The index-based currency can be a fictitious, country-specific currency that is used in high-inflation countries as a comparison currency for reporting. IndexBasedCurrencyAmount can be based on GDT Amount, Qualifier: IndexedBasedCurrency.

ValuationQuantity is the quantity change of the business transaction stated in the line item in the valuation unit of measurement of the material, service product, or resource and may be optional. ValuationQuantity can be based on GDT Quantity, Qualifier: Valuation.

ValuationQuantityTypeCode is the coded representation of the type of the valuation quantity and may be optional. ValuationQuantityTypeCode may be based on GDT QuantityTypeCode, Qualifier: Valuation.

The following inbound aggregation relationships may exist. From business object SetOfBooks/node SetOfBooks, the business object ProductionLedgerAccount can have a 1:cn cardinality inbound aggregation relationship with SetOfBooks, where SetOfBooks may be according to whose specifications the LineItem was created. From business object Company/node Company, the business object ProductionLedgerAccount can have a c:cn cardinality inbound aggregation relationship with PartnerCompany, where PartnerCompany is a company that acts in the business transaction stated in the LineItem as an intra corporate partner. From business object Segment/node Segment, the business object ProductionLedgerAccount can have a c:cn cardinality inbound aggregation relationship with Segment, where Segment may be to which the value and quantity of the LineItem are allocated. Also, from business object Segment/node Segment, the business object ProductionLedgerAccount can have a c:cn cardinality inbound aggregation relationship with PartnerSegment, where PartnerSegment is a Segment that acts in the business transaction stated in the LineItem as an intra corporate Partner. From business object ProfitCentre/node ProfitCentre, the business object ProductionLedgerAccount can have a c:cn cardinality inbound aggregation relationship with ProfitCentre, where ProfitCentre is a ProfitCentre to which the value and quantity of the LineItem are allocated. Also, From business object ProfitCentre/node ProfitCentre, the business object ProductionLedgerAccount can have a c:cn cardinality inbound aggregation relationship with PartnerProfitCentre, where PartnerProfitCentre is a ProfitCentre that acts in the business transaction stated in the LineItem as an intra corporate partner. From business object ProductionConfirmation/node ProductionConfirmation, the business object ProductionLedgerAccount can have a c:cn cardinality inbound aggregation relationship with ProductionConfirmation, where ProductionConfirmation is a ProductionConfirmation that that keeps the original entry of the business transaction stated in the LineItem. From business object ProductionConfirmation/node InventoryChangeItem, the business object ProductionLedgerAccount can have a c:cn cardinality inbound aggregation relationship with ProductionConfirmationInventoryChangeItem, where ProductionConfirmationInventoryChangeItem is an InventoryChangeItem in a ProductionConfirmation serving as OriginalEntryDocumentItem by which the value change recorded in the LineItem can be verified. From business object ProductionConfirmation/node ProductionConfirmation, the business object ProductionLedgerAccount can have a c:cn cardinality inbound aggregation relationship with CancellationProductionConfirmation, where CancellationProductionConfirmation is a ProductionConfirmation that that keeps the Original Entry Document for the cancellation of this LineItem.

Additionally, from MDRO WorkInProcessClearingRun/node WorkInProcessClearingRun, the business object ProductionLedgerAccount can have a c:cn cardinality inbound aggregation relationship with WorkInProcessClearingRun, where WorkInProcessClearingRun is a reference to the WorkInProcessClearingRun that contains the Original Entry Document. From MDRO WorkInProcessClearingRun/node LogSection, the business object ProductionLedgerAccount can have a c:cn cardinality inbound aggregation relationship with WorkInProcessClearingRunLogSection, where WorkInProcessClearingRunLogSection is a reference to a LogSection that serves as OriginalEntryDocument for a business transaction in a WorkInProcessClearingRun. From MDRO WorkInProcessClearingRun/node LogSectionWorkInProcessClearingCalculatedItem, the business object ProductionLedgerAccount can have a c:cn cardinality inbound aggregation relationship with WorkInProcessClearingRunLogSectionWorkInProcessClearingCalculatedItem, where WorkInProcessClearingRunLogSectionWorkInProcessClearingCalculatedItem is a LogSectionWorkInProcessClearingCalculatedItem in a LogSection of a WorkInProcessClearingRun serving as OriginalEntryDocument Item by which the value change recorded in the LineItem can be verified. From MDRO ProductionLedgerAccountOverheadCostCalculationRun/node ProductionLedgerAccountOverheadCostCalculationRun, the business object ProductionLedgerAccount can have a c:cn cardinality inbound aggregation relationship with ProductionLedgerAccountOverheadCostCalculationRun, where ProductionLedgerAccountOverheadCostCalculationRun is a reference to the ProductionLedgerAccountOverheadCostCalculationRun that contains the OriginalEntryDocument. From MDRO ProductionLedgerAccountOverheadCostCalculationRun/node LogSection, the business object ProductionLedgerAccount can have a c:cn cardinality inbound aggregation relationship with ProductionLedgerAccountOverheadCostCalculationRunLogSection, where ProductionLedgerAccountOverheadCostCalculationRunLogSection is a reference to a LogSection that serves as OriginalEntryDocument for a business transaction in a ProductionLedgerAccountOverheadCostCalculationRun. From MDRO ProductionLedgerAccountOverheadCostCalculationRun/node LogSectionOverheadCostCalculationCalculatedItem, the business object ProductionLedgerAccount can have a c:cn cardinality inbound aggregation relationship with ProductionLedgerAccountOverheadCostCalculationRunLogSectionOverheadCostCalculationCalculatedItem, where ProductionLedgerAccountOverheadCostCalculationRunLogSectionOverheadCostCalculationCalculatedItem is a LogSectionOverheadCostCalculationCalculatedItem in a LogSection of a ProductionLedgerAccountOverheadCostCalculationRun serving as OriginalEntryDocument Item by which the value change recorded in the LineItem can be verified.

In some implementations, a maximum of one of the following relationships may exist. From business object MaterialLedgerAccount/node MaterialLedgerAccount, the business object ProductionLedgerAccount can have a c:cn cardinality inbound aggregation relationship with Offsetting MaterialLedgerAccount, where Offsetting MaterialLedgerAccount denotes the MaterialLedgerAccount to which the LineItem relates as the OffsettingSubLedgerAccount. From business object OverheadCostLedgerAccount/node OverheadCostLedgerAccount, the business object ProductionLedgerAccount can have a c:cn cardinality inbound aggregation relationship with Offsetting OverheadCostLedgerAccount, where Offsetting OverheadCostLedgerAccount denotes the OverheadCostLedgerAccount to which the LineItem relates as the OffsettingSubLedgerAccount.

In some implementations, a maximum of one of these relationships can exist. From business object MaterialLedgerAccount/node MaterialLedgerAccount, the business object ProductionLedgerAccount can have a c:cn cardinality inbound aggregation relationship with OriginalOffsettingMaterialLedgerAccount, where OriginalOffsettingMaterialLedgerAccount denotes the MaterialLedgerAccount which originally—before an account reassignment took place contained the inverse representation of the business transaction. From business object OverheadCostLedgerAccount/node OverheadCostLedgerAccount, the business object ProductionLedgerAccount can have a c:cn cardinality inbound aggregation relationship with OriginalOffsettingOverheadCostLedgerAccount, where OriginalOffsettingOverheadCostLedgerAccount denotes the OverheadCostLedgerAccount which originally—before an account reassignment took place—contained the inverse representation of the business transaction.

One or more association relationships for navigation may exist. To the business object AccountingDocument/node AccountingDocument, the business object ProductionLedgerAccount can have a 1:cn cardinality association relationship for navigation with AccountingDocument, where AccountingDocument is the accounting document that records the entire business transaction in Accounting. To business object GeneralLedgerAccount/node LineItem, the business object ProductionLedgerAccount can have a 1:cn cardinality association relationship for navigation with GeneralLedgerAccountLineItem, where GeneralLedgerAccountLineItem is a LineItem of a GeneralLedgerAccount that records the value change for GeneralLedger purposes.

The following inbound association relationships may exist. From business object AccountingNotification/node AccountingNotification, the business object ProductionLedgerAccount can have a c:cn cardinality inbound association relationship with AccountingNotification, where AccountingNotification is the notification sent to Financial Accounting about the business transaction stated in the LineItem. From business object AccountingNotification/node ItemGroupItem, the business object ProductionLedgerAccount can have a c:cn cardinality inbound association relationship with AccountingNotificationItemGroupItem, where AccountingNotificationItemGroupItem is the item of the AccountingNotification whose information is recorded in the LineItem. From business object Identity/node Identity, the business object ProductionLedgerAccount can have a 1:cn cardinality inbound association relationship with CreationIdentity, where CreationIdentity is the system user Identity who created the LineItem. Also, from business object Identity/node Identity, the business object ProductionLedgerAccount can have a c:cn cardinality inbound association relationship with LastChangeIdentity, where LastChangeIdentity is the system user Identity who last changed the LineItem.

PeriodTotal

Period total is a period-based statement for a ProductionLedgerAccount for a set of books and business transaction category regarding the quantity and value of the changes in the work-in-process inventory or regarding expenses incurred in production. The elements located directly at the PeriodTotal node are defined by the type GDT: ProductionLedgerAccountPeriodTotalElements. In certain implementations, these elements may include: SetOfBooksID, SegmentUUID, ProfitCentreUUID, OffsettingSubledgerAccountUUID, OffsettingSubledgerAccountTypeCode, OriginalOffsettingSubledgerAccountUUID, OriginalOffsettingSubledgerAccountTypeCode, ChartOfAccountsCode, ChartOfAccountsItemCode, FiscalYearVariantCode, FiscalYearID, AccountingPeriodID, AccountingBusinessTransactionTypeCode, SubledgerAccountLineItemTypeCode, SubledgerAccountChargeTypeCode, CostRevenueElementCode, DebitCreditCode, LocalCurrencyAmount, SetOfBooksCurrencyAmount, HardCurrencyAmount, IndexBasedCurrencyAmount, ValuationQuantity, ValuationQuantityTypeCode.

SetOfBooksID is a universal identification, which may be unique, of the SetOfBooks according to whose specifications the PeriodTotal was created and updated. SetOfBooksID may be based on GDT SetOfBooksID.

SegmentUUID is a universal identification, which may be unique, of the Segment to which the value and quantity of the period total are/is allocated and may be optional. SegmentUUID can be based on GDT UUID.

ProfitCentreUUID is a universal identification, which may be unique, of the ProfitCentre to which the value and quantity of the period total are/is allocated and may be optional. ProfitCentreUUID can be based on GDT UUID.

OffsettingSubledgerAccountUUID is a universal identification, which may be unique, of a SubledgerAccount (e.g., a MaterialLedgerAccount) that states—required by the double entry bookkeeping principle—the inverse representation of the business transactions that are stated in the PeriodTotal. OffsettingSubledgerAccountUUID can be based on GDT UUID.

OffsettingSubledgerAccountTypeCode is the coded representation of the type of the OffsettingLedgerAccount to which the PeriodTotal refers. OffsettingSubledgerAccountTypeCode may be based on GDT SubledgerAccountTypeCode. The restrictions may be applicable: the code values 2 (i.e., MaterialLedgerAccount), and 9 (i.e., Overhead Costs Ledger Account) can occur.

OriginalOffsettingSubledgerAccountUUID is a universal identification, which may be unique, of a SubledgerAccount (i.e., such as a MaterialLedgerAccount) which originally—before an account reassignment took place—contained the inverse representation of the business transactions that are stated in the PeriodTotal. OriginalOffsettingSubledgerAccountUUID may be optional and can be based on GDT UUID.

OriginalOffsettingSubledgerAccountTypeCode is a coded representation of the type of the OriginalOffsettingSubledgerAccount to which the PeriodTotal refers. OriginalOffsettingSubledgerAccountTypeCode may be optional and can be based on GDT SubledgerAccountTypeCode. Restrictions may be applicable: the code values 2 (i.e., MaterialLedgerAccount), and 9 (i.e., Overhead Costs Ledger Account) can occur.

ChartOfAccountsCode is the coded representation of the ChartOfAccounts that contains the ChartOfAccountsItem that classifies the value stated in the PeriodTotal. ChartOfAccountsCode may be based on GDT ChartOfAccountsCode.

ChartOfAccountsItemCode is the coded representation of a ChartOfAccountsItem that classifies—for general ledger accounting purposes—the value stated in the PeriodTotal. ChartOfAccountsItemCode may be based on GDT ChartOfAccountsItemCode.

FiscalYearVariantCode is the coded representation of the FiscalYearVariant according to whose fiscal year definition (i.e., begin, end, period definition) the FiscalYearID and the AccountingPeriodID are derived. FiscalYearVariantCode may be based on GDT FiscalYearVariantCode. In some implementations, GDT may be requested.

FiscalYearID is the identification of the fiscal year in which the LineItem are posted for which the PeriodTotal keeps summarized values and quantities. FiscalYearID may be based on GDT FiscalYearID.

AccountingPeriodID is the identification of the accounting period in which the LineItem are posted for which the PeriodTotal keeps summarized values and quantities. AccountingPeriodID may be based on GDT AccountingPeriodID.

AccountingBusinessTransactionTypeCode is the coded representation of the type of the business transactions for which the PeriodTotal keeps summarized quantities and values. It can classify the business transactions according to Accounting criteria. AccountingBusinessTransactionTypeCode may be based on GDT AccountingBusinessTransactionTypeCode.

SubledgerAccountLineItemTypeCode is the coded representation of the type of the SubledgerAccountLineItems whose amounts and quantities are summarized in the PeriodTotal. SubledgerAccountLineItemTypeCode may be based on GDT SubledgerAccountLineItemTypeCode. In some implementations, restrictions may be applicable: code value 03010 (i.e., Work in Process) can occur.

SubledgerAccountChargeTypeCode is the coded representation of the type of ProductionLedgerAccount debit or credit for which the period total keeps values and quantities. The type of debit or credit can influence how work in process is cleared. SubledgerAccountChargeTypeCode may be based on GDT SubledgerAccountChargeTypeCode. There may not be restrictions.

CostRevenueElementCode is the coded representation of the value component that classifies the value that flowed from the OffsettingLedgerAccount to the ProductionLedgerAccount or vice-versa. CostRevenueElementCode may be based on GDT CostRevenueElementCode.

DebitCreditCode is the coded representation of debit or credit. It can specify whether the PeriodTotal is assigned to the debit or credit side of the GeneralLedger account. DebitCreditCode may be based on GDT DebitCreditCode.

LocalCurrencyAmount is the value of the period total in the local currency of the Company carrying the [SubledgerAccount]. The local currency can be considered the currency in which the local books are kept. LocalCurrencyAmount may be based on GDT Amount. In some implementations, the following constraint may apply: the value reported here can match the total of all values in local currency that are documented in the LineItems.

SetOfBooksCurrencyAmount is the value of the period total in the currency selected for the set of books and may be optional. SetOfBooksCurrencyAmount can be based on GDT Amount. In some implementations, the following constraint may apply: the value reported here can match the total of all values in the additional currency selected for the set of books that are documented in the LineItems.

HardCurrencyAmount is the value of the period total in the hard currency of the country of the Company carrying the [SubledgerAccount] and may be optional. The hard currency can be a stable, country-specific currency that is used in high-inflation countries. HardCurrencyAmount may be based on GDT Amount. In some implementations, the following constraint may apply: the value reported here can match the total of all values in the hard currency that are documented in the LineItems.

IndexBasedCurrencyAmount is the value of the period total in the index-based currency of the country of the Company carrying the [SubledgerAccount] and may be optional. The index-based currency can be a fictitious, country-specific currency that is used in high-inflation countries as a comparison currency for reporting. IndexBasedCurrencyAmount may be based on GDT Amount. In some implementations, the following constraint may apply: the value reported here can match the total of all values in the index-based currency that are documented in LineItems.

ValuationQuantity is the quantity of the period total in the valuation unit of the material and may be optional. The valuation unit can be the unit in which consumed or manufactured materials or production activities are valuated in Financial Accounting. ValuationQuantity may be based on GDT Quantity. In some implementations, the following constraint may apply: the quantity reported here can match the total of all changes in the inventory quantity that are documented in the LineItems.

ValuationQuantityTypeCode is the coded representation of the type of the valuation quantity and may be optional. ValuationQuantityTypeCode can be based on GDT QuantityTypeCode, Qualifier: Valuation.

One or more inbound aggregation relationships may exist. For example, from business object SetOfBooks/node SetOfBooks, the business object ProductionLedgerAccount can have a 1:cn cardinality inbound aggregation relationship with SetOfBooks, where SetOfBooks is a SetOfBooks according to whose specifications the PeriodTotal was created and updated. From business object Segment/node Segment, the business object ProductionLedgerAccount can have a c:cn cardinality inbound aggregation relationship with Segment, where Segment is a Segment to which the values of the PeriodTotal are allocated. From business object ProfitCentre/node ProfitCentre, the business object ProductionLedgerAccount can have a c:cn cardinality inbound aggregation relationship with ProfitCentre, where ProfitCentre is a ProfitCentre to which the values of the PeriodTotal are assigned.

In some implementations, one and only one of the following relationships may exist. From business object MaterialLedgerAccount/node MaterialLedgerAccount, the business object ProductionLedgerAccount can have a c:cn cardinality inbound aggregation relationship with Offsetting MaterialLedgerAccount, where Offsetting MaterialLedgerAccount denotes the MaterialLedgerAccount to which the PeriodTotal relates as the OffsettingSubLedgerAccount. From business object OverheadCostLedgerAccount/node OverheadCostLedgerAccount, the business object ProductionLedgerAccount can have a c:cn cardinality inbound aggregation relationship with OffsettingOverheadCostLedgerAccount, where OffsettingOverheadCostLedgerAccount denotes the [SubledgerAccount2] to which the PeriodTotal relates as the OffsettingSubLedgerAccount.

In some implementations, a maximum of one of the following relationships may exist. From business object MaterialLedgerAccount/node MaterialLedgerAccount, the business object ProductionLedgerAccount can have a c:cn cardinality inbound aggregation relationship with OriginalOffsettingMaterialLedgerAccount, where OriginalOffsettingMaterialLedgerAccount denotes the MaterialLedgerAccount which originally—before an account reassignment took place contained the inverse representation of the business transactions that are stated in the PeriodTotal. From business object OverheadCostLedgerAccount/node OverheadCostLedgerAccount, the business object ProductionLedgerAccount can have a c:cn cardinality inbound association relationship with OriginalOffsettingOverheadCostLedgerAccount, where OriginalOffsettingOverheadCostLedgerAccount denotes the OverheadCostLedgerAccount which originally—before an account reassignment took place—contained the inverse representation of the business transactions that are stated in the PeriodTotal.

PeriodBalance

A period balance is a period-based statement for a ProductionLedgerAccount for a set of books regarding the quantity and value of the work-in-process inventory or regarding the total expense incurred for the production object. The elements located directly at the PeriodBalance node are defined by the type GDT: ProductionLedgerAccountPeriodBalancelElements. In certain implementations, these elements may include: SetOfBookID, SegmentUUID, ProfitCentreUUID, OffsettingSubledgerAccountUUID, OffsettingSubledgerAccountTypeCode, OriginalOffsettingSubledgerAccountUUID, OriginalOffsettingSubledgerAccountTypeCode, ChartOfAccountsCode, ChartOfAccountsItemCode, FiscalYearVariantCode, FiscalYearID, AccountingPeriodID, AccountingBusinessTransactionTypeCode, SubledgerAccountLineItemTypeCode, SubledgerAccountChargeTypeCode, CostRevenueElementCode, DebitCreditCode, LocalCurrencyAmount, SetOfBooksCurrencyAmount, HardCurrencyAmount, IndexBasedCurrencyAmount, ValuationQuantity.

SetOfBookID is a universal identification, which may be unique, of the SetOfBooks according to whose specifications the PeriodBalance was created and updated. SetOfBookID may be based on GDT SetOfBooksID.

SegmentUUID is a universal identification, which may be unique, of the Segment to which the value and quantity of the period balance are allocated. SegmentUUID may be optional and can be based on GDT UUID.

ProfitCentreUUID is a universal identification, which may be unique, of the ProfitCentre to which the value and quantity of the period balance are allocated. ProfitCentreUUID may be optional and can be based on GDT UUID.

OffsettingSubledgerAccountUUID is a universal identification, which may be unique, of a SubledgerAccount (e.g., a MaterialLedgerAccount) that states—required by the double entry bookkeeping principle—the inverse representation of the business transactions that are stated in the PeriodBalance. OffsettingSubledgerAccountUUID may be based on GDT UUID.

OffsettingSubledgerAccountTypeCode is the coded representation of the type of the OffsettingLedgerAccount to which the PeriodBalance refers. OffsettingSubledgerAccountTypeCode may be based on GDT SubledgerAccountTypeCode. In some implementations, restrictions may apply: the code values 2 (i.e., MaterialLedgerAccount), and 9 (i.e., Overhead Costs Ledger Account) can occur.

OriginalOffsettingSubledgerAccountUUID is a universal identification, which may be unique, of a SubledgerAccount (e.g., a MaterialLedgerAccount) which originally—before an account reassignment took place—contained the inverse representation of the business transactions that are stated in the PeriodBalance. OriginalOffsettingSubledgerAccountUUID may be optional and can be based on GDT UUID.

OriginalOffsettingSubledgerAccountTypeCode is the coded representation of the type of the OriginalOffsettingSubledgerAccount to which the PeriodBalance refers and may be optional. OriginalOffsettingSubledgerAccountTypeCode may be based on GDT SubledgerAccountTypeCode. In some implementations, restrictions may apply: the code values 2 (i.e., MaterialLedgerAccount), and 9 (i.e., Overhead Costs Ledger Account) can occur.

ChartOfAccountsCode is the coded representation of the ChartOfAccounts that contains the ChartOfAccountsItem that classifies the value stated in the PeriodBalance. ChartOfAccountsCode may be based on GDT ChartOfAccountsCode.

ChartOfAccountsItemCode is the coded representation of a ChartOfAccountsItem that classifies—for general ledger accounting purposes—the value stated in the PeriodBalance. ChartOfAccountsItemCode may be based on GDT ChartOfAccountsItemCode.

FiscalYearVariantCode is the coded representation of the FiscalYearVariant according to whose fiscal year definition (i.e., begin, end, period definition) the FiscalYearID and the AccountingPeriodID are derived. FiscalYearVariantCode may be based on GDT FiscalYearVariantCode.

FiscalYearID is the identification of the fiscal year in which the LineItem are posted for which the PeriodBalance keeps summarized values and quantities. FiscalYearID may be based on GDT FiscalYearID.

AccountingPeriodID is the identification of the accounting period in which the LineItem are posted for which the PeriodBalance keeps summarized values and quantities. AccountingPeriodID may be based on GDT AccountingPeriodID.

AccountingBusinessTransactionTypeCode is the coded representation of the type of the business transactions for which the PeriodBalance keeps summarized quantities and values. It can classify the business transactions according to Accounting criteria. AccountingBusinessTransactionTypeCode may be based on GDT AccountingBusinessTransactionTypeCode.

SubledgerAccountLineItemTypeCode is the coded representation of the type of the SubledgerAccountLineItems whose amounts and quantities are summarized in the PeriodBalance. SubledgerAccountLineItemTypeCode may be based on GDT SubledgerAccountLineItemTypeCode. In some implementations, the following restrictions may be applicable: code value 03010 (i.e., Work in Process) can occur.

SubledgerAccountChargeTypeCode is the coded representation of the type of credit or debit to which the PeriodBalance refers. The type of debit or credit can influence how work in process is cleared. SubledgerAccountChargeTypeCode may be based on GDT SubledgerAccountChargeTypeCode. CostRevenueElementCode is the coded representation of the value component that classifies the value that flowed from the OffsettingLedgerAccount to the (i.e., SubledgerAccount) or vice-versa. CostRevenueElementCode may be based on GDT CostRevenueElementCode. There may not be restrictions.

DebitCreditCode is the coded representation of debit or credit. It can specify whether the PeriodTotal is assigned to the debit or credit side of the GeneralLedger account. DebitCreditCode may be based on GDT DebitCreditCode.

LocalCurrencyAmount is the value of the PeriodBalance in the local currency of the Company carrying the ProductionLedgerAccount. The local currency can be the currency in which the local books are kept. LocalCurrencyAmount may be based on GDT Amount. In some implementations, the following constraint may apply: the value reported here may match the total of all values in local currency that are documented in the line items of the PeriodBalance.

SetOfBooksCurrencyAmount is the value of the PeriodBalance in the currency selected for the set of books and may be optional. SetOfBooksCurrencyAmount may be based on GDT Amount. In some implementations, the following constraint may apply: the value reported here may match the total of all values in the additional currency selected for the set of books that are documented in the line items of the PeriodBalance.

HardCurrencyAmount is the value of the PeriodBalance in the hard currency of the country of the Company carrying the ProductionLedgerAccount and may be optional. The hard currency can be a stable, country-specific currency that is used in high-inflation countries. HardCurrencyAmount may be based on GDT Amount. In some implementations, the following constraint may apply: the value reported here may match the total of all values in the hard currency that are documented in the line items of the PeriodBalance.

IndexBasedCurrencyAmount is the value of the period balance in the index-based currency of the country of the Company carrying the (i.e., SubledgerAccount) and may be optional. The index-based currency can be a fictitious, country-specific currency that is used in high-inflation countries as a comparison currency for reporting. IndexBasedCurrencyAmount may be based on GDT Amount. In some implementations, the following constraint may apply: the value reported here may match the total of all values in the index-based currency that are documented in the line items of the PeriodBalance.

ValuationQuantity is the quantity of the PeriodBalance in the valuation unit of the material and may be optional. The valuation unit can be the unit in which consumed or manufactured materials or production activities are valuated in Financial Accounting. ValuationQuantity may be based on GDT Quantity. In some implementations, the following constraint may apply: the quantity reported here may match the total of all changes in the inventory quantity that are documented in the line items of the period total.

ValuationQuantityTypeCode is the coded representation of the type of the valuation quantity and may be optional. ValuationQuantityTypeCode can be based on GDT QuantityTypeCode, Qualifier: Valuation.

One or more inbound aggregation relationships may exist. From business object SetOfBooks/node SetOfBooks, the business object ProductionLedgerAccount can have a 1:cn cardinality inbound aggregation relationship with SetOfBooks, where SetOfBooks is a SetOfBooks based on whose specifications the PeriodBalance was created and updated. From business object Segment/node Segment, the business object ProductionLedgerAccount can have a c:cn cardinality inbound aggregation relationship with Segment, where Segment is a Segment to which the value of the PeriodBalance is allocated. From business object ProfitCentre/node ProfitCentre, the business object ProductionLedgerAccount can have a c:cn cardinality inbound aggregation relationship with ProfitCentre, where ProfitCentre is a ProfitCentre to which the value of the PeriodBalance is allocated.

In some implementations, one and only one of the following relationships may exist. From business object MaterialLedgerAccount/node MaterialLedgerAccount, the business object ProductionLedgerAccount can have a c:cn cardinality inbound aggregation relationship with Offsetting MaterialLedgerAccount, where Offsetting MaterialLedgerAccount denotes the MaterialLedgerAccount to which the PeriodBalance relates as the OffsettingSubLedgerAccount. From business object OverheadCostLedgerAccount/node OverheadCostLedgerAccount, the business object ProductionLedgerAccount can have a c:cn cardinality inbound aggregation relationship with Offsetting OverheadCostLedgerAccount, where Offsetting OverheadCostLedgerAccount denotes the OverheadCostLedgerAccount to which the PeriodBalance relates as the OffsettingSubLedgerAccount.

In some implementations, a maximum of one of these relationships may exist. From business object MaterialLedgerAccount/node MaterialLedgerAccount, the business object ProductionLedgerAccount can have a c:cn cardinality inbound aggregation relationship with OriginalOffsettingMaterialLedgerAccount, where OriginalOffsettingMaterialLedgerAccount denotes the MaterialLedgerAccount which originally—before an account reassignment took place contained the inverse representation of the business transactions that are stated in the PeriodBalance. From business object OverheadCostLedgerAccount/node OverheadCostLedgerAccount, the business object ProductionLedgerAccount can have a c:cn cardinality inbound aggregation relationship with OriginalOffsettingOverheadCostLedgerAccount, where OriginalOffsettingOverheadCostLedgerAccount denotes the OverheadCostLedgerAccount which originally—before an account reassignment took place—contained the inverse representation of the business transactions that are stated in the PeriodBalance.

Figures 1, 99:
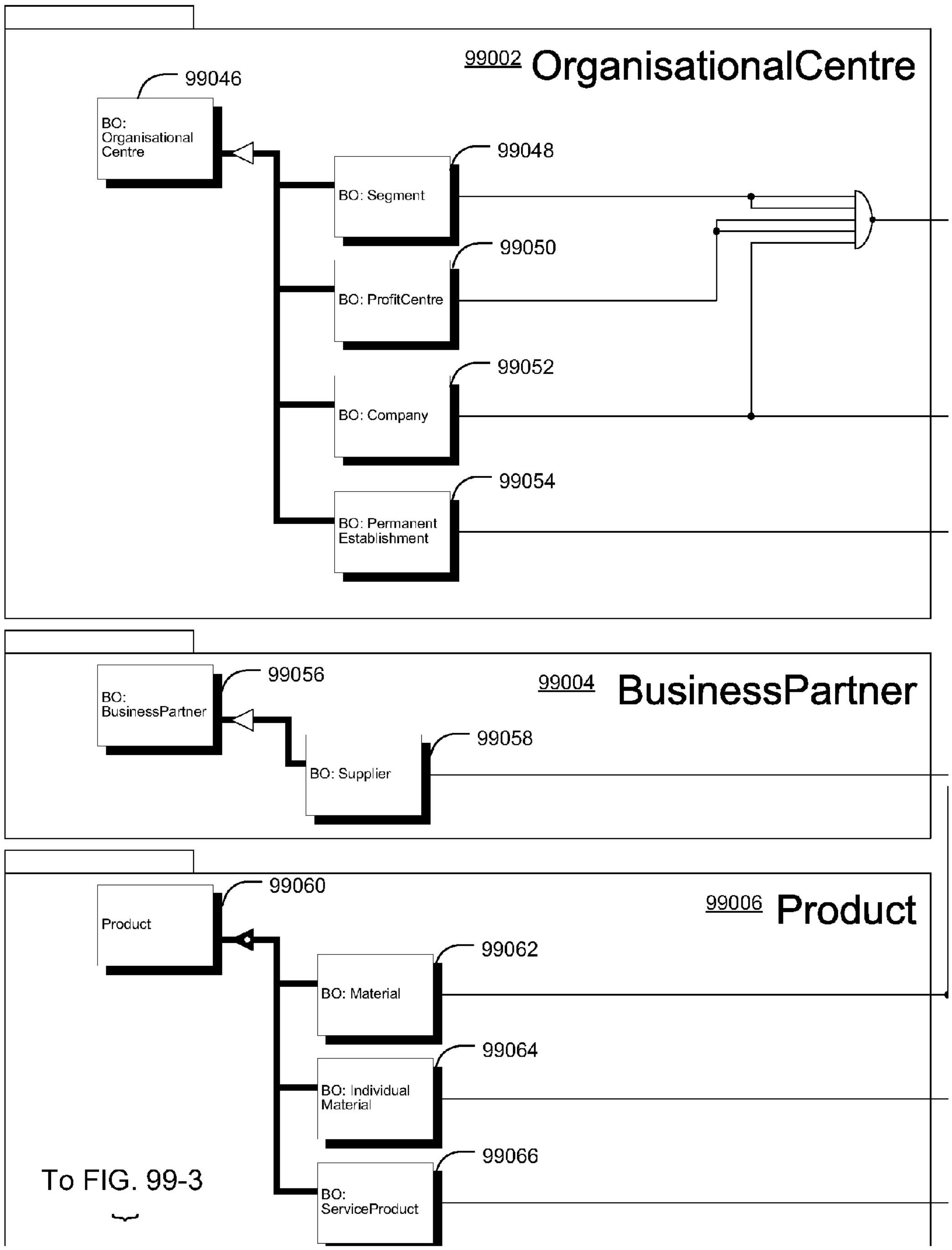
Figures 2, 99:
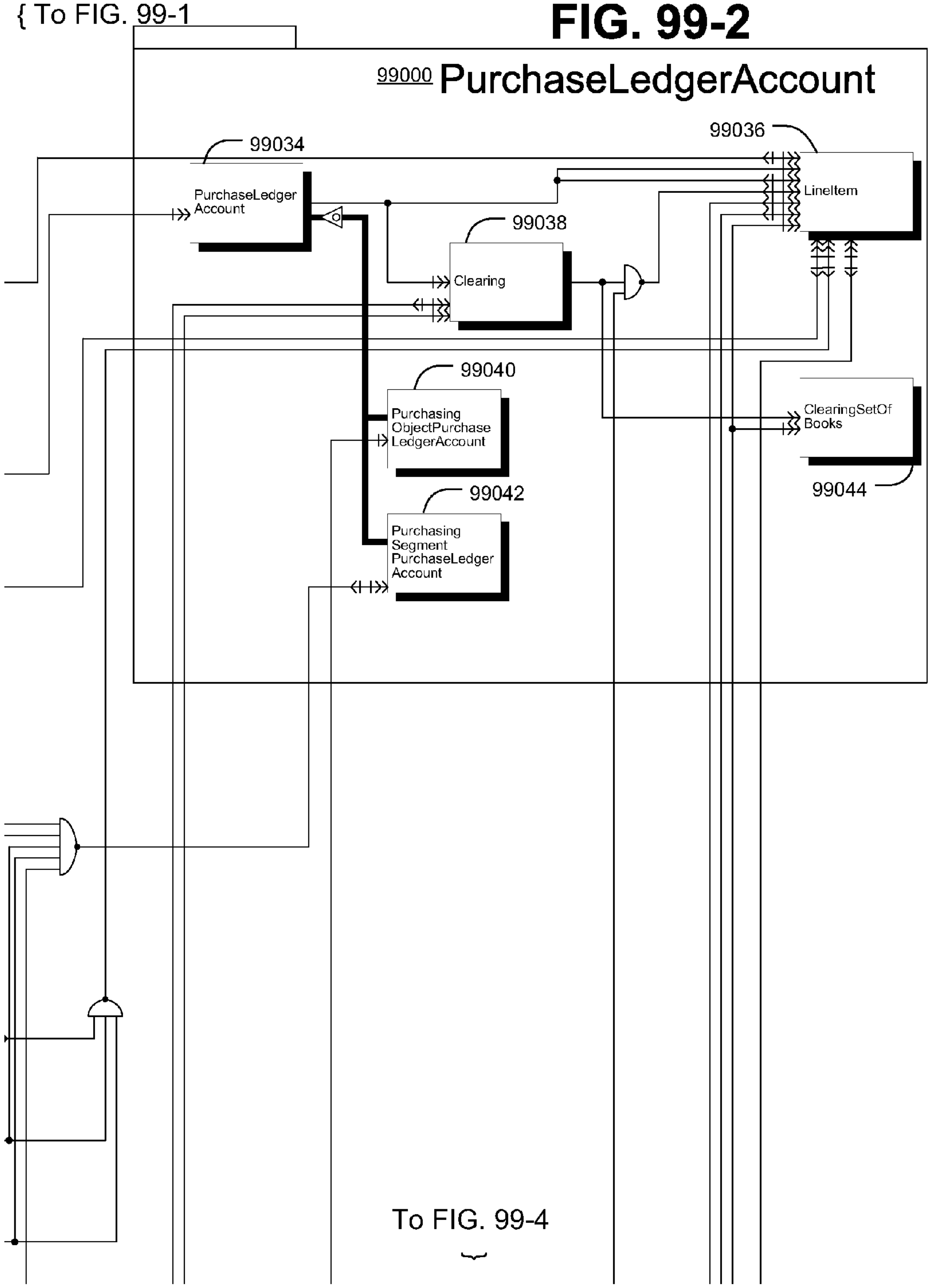
Figures 3, 99:
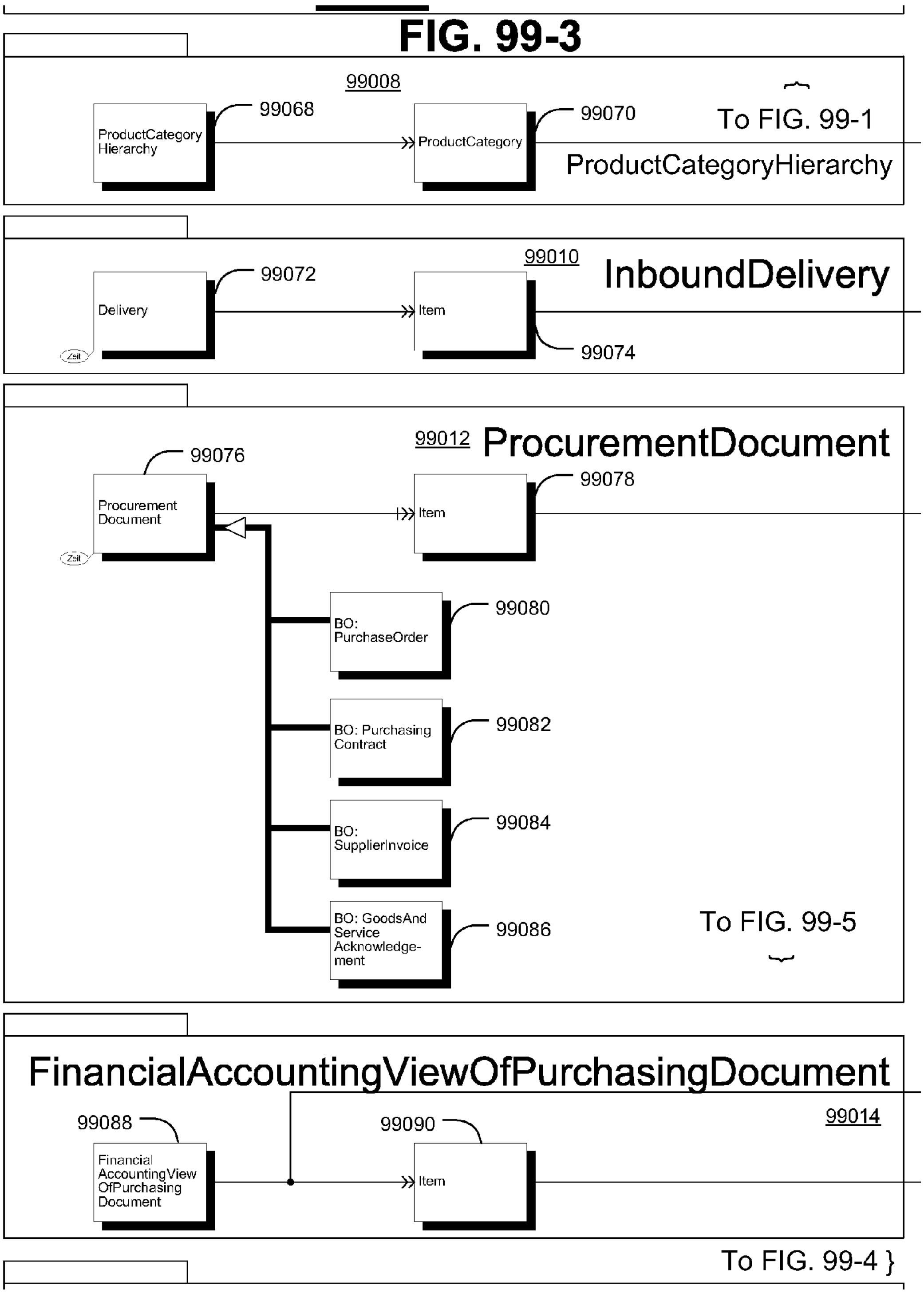
Figures 4, 99:
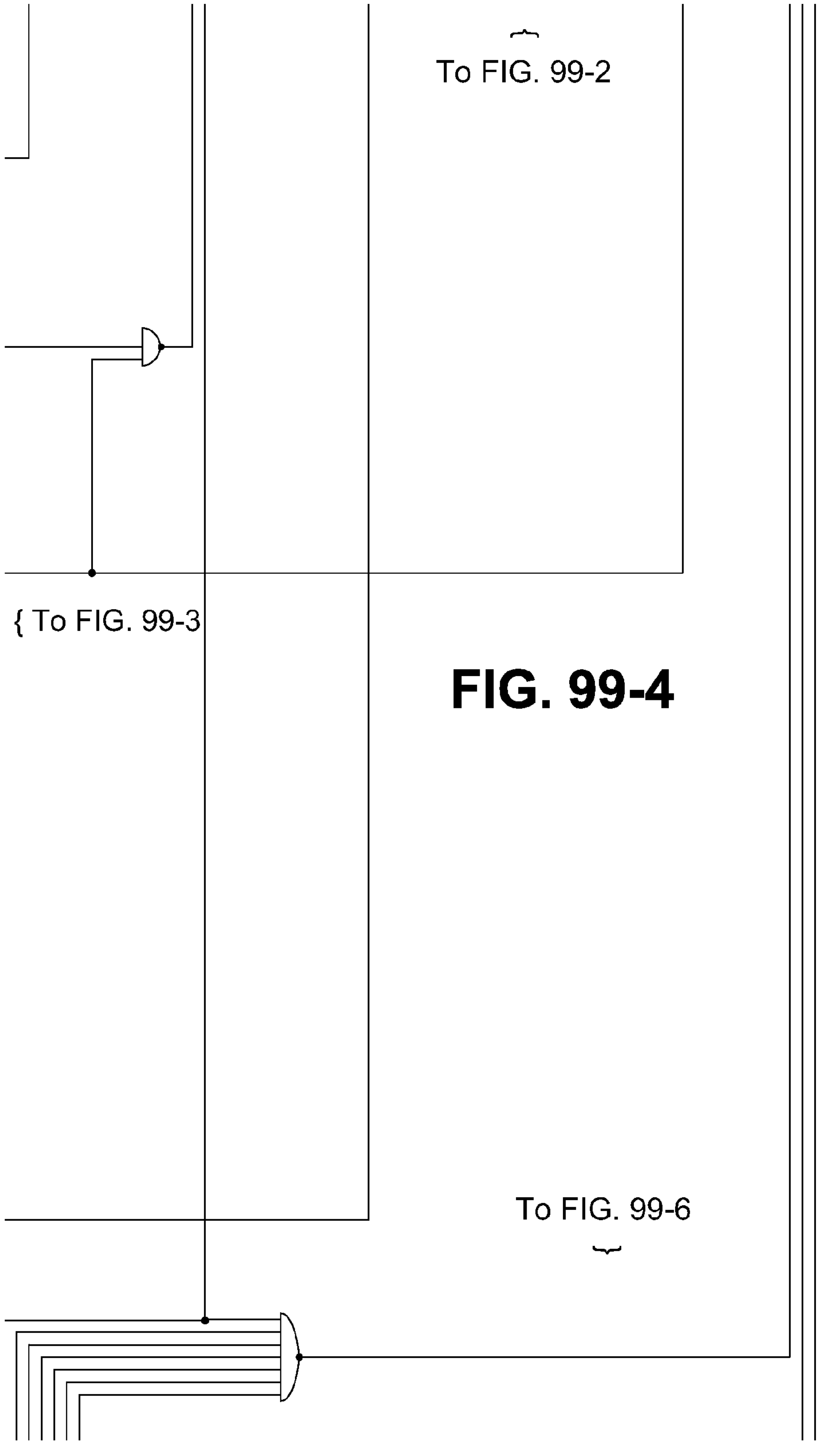
Figures 6, 99:
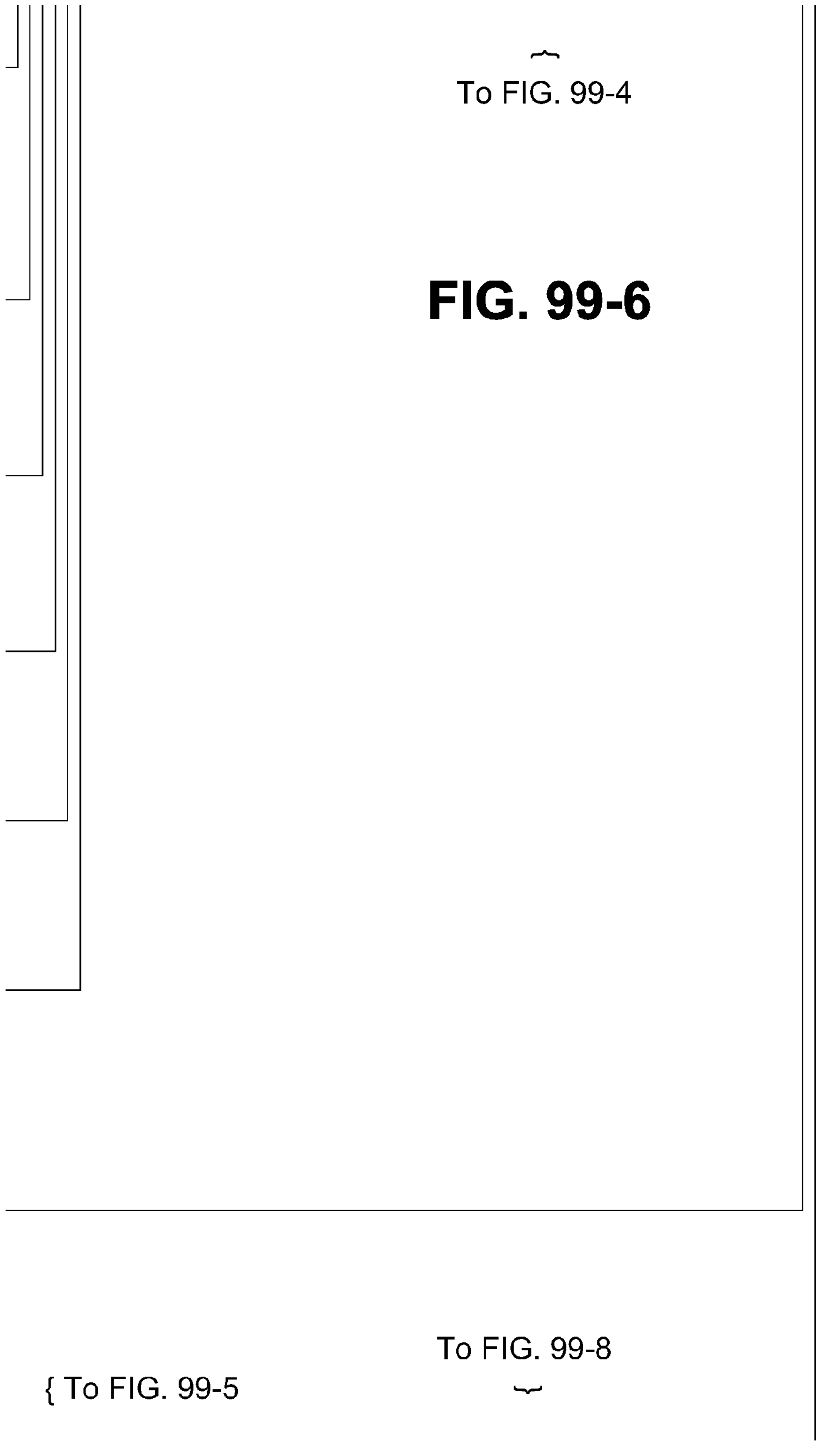
Figures 7, 99:
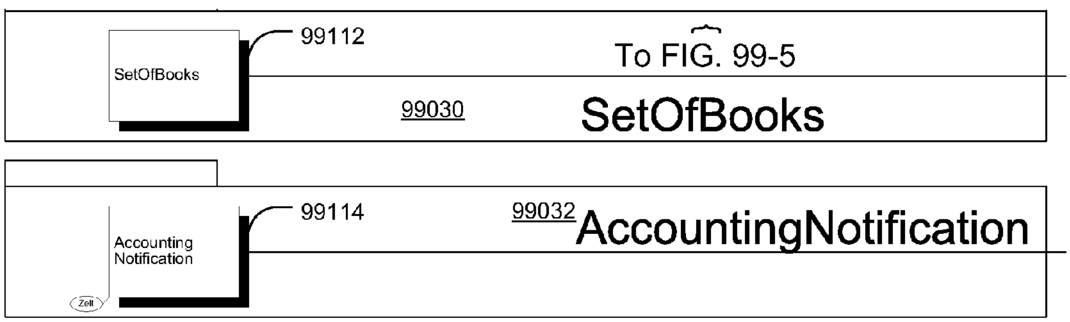
Figures 8, 99:
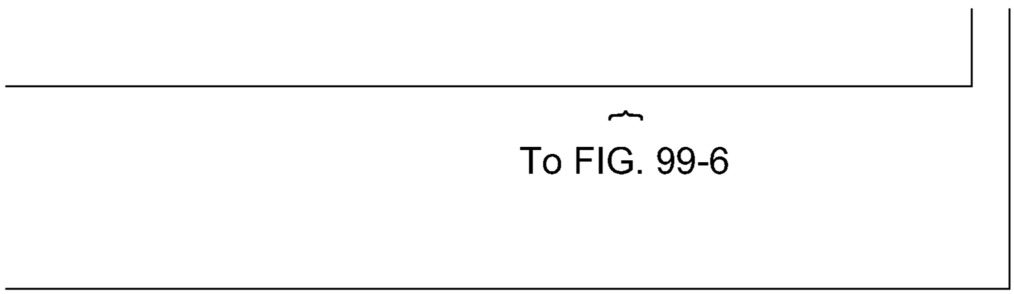

FIGS. 99-1 through 99-8 illustrate an example PurchaseLedgerAccount business object model 99000. Specifically, this model depicts interactions among various hierarchical components of the PurchaseLedgerAccount, as well as external components that interact with the PurchaseLedgerAccount (shown here as 99002 through 99032 and 99046 through 99114).

Business Object PurchaseLedgerAccount

Business Object PurchaseLedgerAccount is the record for a company based on the principle of double-entry bookkeeping that shows the effects of purchasing transactions, deliveries, and invoice verification on the valuation of the purchased materials and services. The purchasing ledger account can serve as a structuring element for collecting and evaluating goods receipts and the associated invoice receipts. The generated postings can be the basis for determining value differences and settling such differences to the inventory of the procured asset or to costs (i.e., goods receipt/invoice receipt clearing). A PurchaseLedgerAccount can contains the values and quantities of a company with reference to purchasing documents or deliveries.

The PurchaseLedgerAccount business object is part of the Accounting process component. A PurchaseLedgerAccount may contain the following components: PurchasingObjectPurchaseLedgerAccount 990034, LineItem 99036, Clearing 99038.

A PurchaseLedgerAccount is a PurchasingObjectPurchaseLedgerAccount if the record references exactly one business transaction document of Purchasing. In this case it has an association to a FinancialAccountingViewOfPurchasingDocument that reflects the business transaction document of Purchasing (e.g., such as a purchase order).

The LineItem component for a PurchaseLedgerAccount records the quantity and value of goods receipts and invoice receipts and of goods receipt/invoice receipt clearings that refer to an external procurement process. This information can be carried separately for each set of books.

The Clearing component establishes the granularity for goods receipt/invoice receipt clearing. This granularity is independent of the set of books.

PurchaseLedgerAccount is represented by the root node PurchaseLedgerAccount.

There may not be service interfaces. Creating and changing the business object PurchaseLedgerAccount can be triggered by the business object AccountingNotification.

Business Object PurchaseLedgerAccount is a record of values, quantities, and reference quantities (e.g., quantities on which those values are based) for goods receipts and invoice receipts of externally procured material goods and services within a company. A purchase ledger account refers to a financial accounting view of purchasing document. It can include LineItems that contain the individual movements. It can also include clearings that are the basis for goods receipt/invoice receipt clearing.

A PurchaseLedgerAccount can occur in disjoint and complete specializations. At present the following specialization is possible: PurchasingObjectPurchaseLedgerAccount 99040.

Subsequently the term "offsetting" can be used. In particular, an OffsettingSubledgerAccount is a SubledgerAccount that can contain—with reference to the same Accounting Document—the inverse representation of the business transaction stated in an SubledgerAccountLineItem. The inverse representation can be required by the double entry bookkeeping principle. The compliance with this principle may lead to a zero balance of the AccountingDocument that represents the Business transaction. An example for offsetting is: an InventoryChangeItem of a ProductionLotConfirmation can be represented as a debit LineItem of a ProductionLedgerAccount and as an inverse credit LineItem of a MaterialLedgerAccount.

Subsequently a generic approach for referencing Original Entry Documents can be used, where an Original Entry Document is a document that can be necessary for auditing purposes and verifies that the value stated in the LineItem of a ledger account has been booked on the base of a real business transaction. An Original Entry Document may be contained in another Object, the Original Entry DocumentContainingObject. Typical such constellations may include: FinancialAuditTrailDocumentation (e.g., contained in a Host object like DuePayment, DueClearing, Dunning, and PaymentAllocation from Operative Financials), LogSection (e.g., contained in all AccountingAdjustmentRun-MDROs for example: InventoryPriceChangeRun, GeneralLedgerAccountBalanceDistributionRun, FixedAssetDepreciationRun, WorkInProcessClearingRun), SettlementResultAccounting contained in an ExpenseReport, PeriodItem contained in an EmployeeTimeCalendar.

The elements located directly at the node PurchaseLedgerAccount are defined by the GDT type PurchaseLedgerAccountElements. In certain implementations, these elements may include: UUID, FinancialAccountingViewOfPurchasingDocumentUUID, CompanyUUID, TypeCode.

UUID is an universal identification, which may be unique, of the PurchaseLedgerAccount. UUID may be based on GDT UUID.

FinancialAccountingViewOfPurchasingDocumentUUID is a universal identification, which may be unique, of the FinancialAccountingViewOfPurchasingDocument for which the PurchaseLedgerAccount records business transactions. FinancialAccountingViewOfPurchasingDocumentUUID may be based on GDT UUID.

Company UUID is a universal identification, which may be unique, of the Company for which the PurchaseLedgerAccount is carried. CompanyUUID may be based on GDT UUID.

TypeCode is the element TypeCode types the PurchaseLedgerAccount. TypeCode may be based on GDT PurchaseLedgerAccountTypeCode.

The following composition relationships to subordinate nodes exist: LineItem has a cardinality of 1:cn, and Clearing has a cardinality of 1:cn.

An inbound aggregation relationships from business object Company, node Company, exists: Company, has a cardinality of 1:cn, and denotes the Company for which the account is carried.

The QueryByOperationalDocument query provides a list of all PurchaseLedgerAccounts of the type (PurchaseLedgerAccountTypeCode) PurchasingObject for company and business transaction document of Purchasing for which the FinancialAccountingViewOfPurchasingDocument is created in Financial Accounting. The query elements are defined by the data type PurchaseLedgerAccountOperationalDocumentQueryElements. These elements include:

FinancialAccountingViewOfPurchasingDocumentOperationalDocumentUUID, FinancialAccountingViewOfPurchasingDocumentOperationalDocumentFormattedID, FinancialAccountingViewOfPurchasingDocumentOperationalDocumentTypeCode, CompanyUUID, CompanyID. FinancialAccountingViewOfPurchasingDocumentOperationalDocumentUUID is optional and is of GDT type UUID. FinancialAccountingViewOfPurchasingDocumentOperationalDocumentFormattedID is optional and is of GDT type ObjectNodeFormattedID. FinancialAccountingViewOfPurchasingDocumentOperationalDocumentTypeCode is optional and is of GDT type ObjectTypeCode. CompanyUUID is optional and is of GDT type UUID. CompanyID is optional and is of GDT type OrganisationalCentreID.

PurchasingObjectPurchaseLedgerAccount is the purchase ledger account whose record refers to a business transaction document of Purchasing (i.e., PurchaseOrder). PurchasingObjectPurchaseLedgerAccount can be created for a business object FinancialAccountingViewOfPurchasingDocument, which itself represents a view of the business transaction document of Purchasing based on the requirements of Financial Accounting. The elements of the specialization PurchasingObjectPurchaseLedgerAccount are part of the structure of the root node.

An inbound aggregation relationship, FinancialAccountingViewOfPurchasingDocument, exists from business object FinancialAccountingViewOfPurchasingDocument, node FinancialAccountingViewOfPurchasingDocument. FinancialAccountingViewOfPurchasingDocument has a cardinality of 1:c, and denotes the FinancialAccountingViewOfPurchasingDocument to which the record relates. The FinancialAccountingViewOfPurchasingDocument is used also for access control to a PurchasingObjectPurchaseLedgerAccount.

LineItem is a statement for a PurchaseLedgerAccount for a set of books on the value of an inventory change based on a single business transaction. A line item contains detailed information representing the business transaction from the accounting viewpoint, such as a posting date and an OriginalEntryDocument reference.

A set of books can be a complete, self-contained, and consistent set of accounting figures within accounting. Complete may mean that postings and relevant information on all items in the balance sheet and profit and loss statement are included. “Self-contained” may mean that no external reference to other posted information in accounting is needed to explain the content of a set of books. Consistent may mean that the posted data of a set of books are comparable as regards the structure (e.g., fiscal year variant, currency, chart of accounts) and the semantics (e.g., based on an accounting principle or other rules or exceptions).

The elements located directly at the LineItem node are defined by the type GDT: PurchaseLedgerAccountLineItemElements. The elements located directly at the TotalLineItem node are defined by the GDT type SubledgerAccountLineItemElements. In certain implementations, these elements may include: UUID, SetOfBooksID, SegmentUUID, ProfitCentreUUID, PartnerCompanyUUID, PartnerSegmentUUID, PartnerProfitCentreUUID, FinancialAccountingViewOfPurchasingDocumentItemUUID, ClearingUUID, ProductUUID, ProductTypeCode, PermanentEstablishmentUUID, AccountingDocumentUUID, AccountingDocumentID, AccountingDocumentItemID, OriginalEntryDocumentContainingObjectReference, OriginalEntryTransactionUUID, OriginalEntryDocumentReference, OriginalEntryDocumentItemReference, OriginalEntryDocumentItemTypeCode, OriginalEntryDocumentPartnerID, AccountingNotificationUUID, AccountingNotificationItemGroupItemUUID, GeneralLedgerAccountLineItemUUID, GeneralLedgerAccountLineItemAccountingDocumentItemGroupID, OffsettingSubledgerAccountUUID, OffsettingSubledgerAccountTypeCode, SystemAdministrativeData, ChartOfAccountsCode, ChartOfAccountsItemCode, AccountingBusinessTransactionTypeCode, TypeCode, AccountingDocumentTypeCode, AccountingDocumentNote, AccountingDocumentItemNote, ProductTaxTypeCode, ProductTaxDueCategoryCode, ProductTaxCountryCode, ProductTaxEventTypeCode, ProductTaxRateTypeCode, WithholdingTaxTypeCode, WithholdingTaxCountryCode, WithholdingTaxEventType- Code, WithholdingTaxRateTypeCode, PostingDate, OriginalEntryDocumentDate, AccountingBusinessTransactionDate, CurrencyConversionDate, FiscalYearVariantCode, FiscalYearID, AccountingPeriodID, AccountingClosingStepCode, AccountingDocumentItemAccountingGroupID, AccountingDocumentItemProductTaxGroupID, GeneralLedgerMovementTypeCode, DebitCreditCode, CancellationDocumentIndicator, CancellationOriginalEntryDocumentContainingBusinessObjectReference, CancellationOriginalEntryTransactionUUID, CancellationOriginalEntryDocumentReference, CancelledIndicator, CashDiscountDeductibleIndicator, BusinessTransactionCurrencyAmount, LineItemCurrencyAmount, LocalCurrencyAmount, SetOfBooksCurrencyAmount, HardCurrencyAmount, IndexBasedCurrencyAmount, ClearingQuantity, ClearingQuantityTypeCode, ValuationQuantity, ValuationQuantityTypeCode, ReferenceQuantity, ReferenceQuantityTypeCode.

UUID is a universal identification, which may be unique, of the LineItem. UUID may be based on GDT UUID. SetOfBooksID is an identification, which may be unique, of the SetOfBooks according to whose specifications the LineItem was created. SetOfBooksID may be based on GDT SetOfBooksID. SegmentUUID is a universal identification, which may be unique, of the Segment 99042 to which the value and quantity of the LineItem is/are allocated and is optional. SegmentUUID may be based on GDT UUID. ProfitCentreUUID is an universal identification, which may be unique, of the ProfitCentre to which the value and quantity of the LineItem is/are allocated and is optional. ProfitCentreUUID may be based on GDT UUID. PartnerCompanyUUID is an universal identification, which may be unique, of a Company that acts in the business transaction stated in the LineItem as an intra corporate partner and is optional. PartnerCompanyUUID may be based on GDT UUID. PartnerSegmentUUID is an universal identification, which may be unique, of a Segment that acts in the business transaction stated in the LineItem as an intra corporate partner and is optional. PartnerSegmentUUID may be based on GDT UUID. PartnerProfitCentreUUID is an universal identification, which may be unique, of a ProfitCentre the that acts in the business transaction stated in the LineItem as an intra corporate partner and is optional. PartnerProfitCentreUUID may be based on GDT UUID. FinancialAccountingViewOfPurchasingDocumentItemUUID denotes an item of a FinancialAccountingViewOfPurchasingDocument for which the line item was generated and is optional. FinancialAccountingViewOfPurchasingDocumentItemUUID may be based on GDT UUID. ClearingUUID denotes a clearing for which the line item was generated and is optional. ClearingUUID may be based on GDT UUID. ProductUUID denotes the product to which the recorded data relates and is optional. ProductUUID may be based on GDT UUID. ProductTypeCode denotes the type of the product to which the recorded data relates and is optional. ProductTypeCode may be based on GDT ProductTypeCode. Restrictions may include the following: Code values 1 (i.e., material), 2 (i.e., service product), and 3 (i.e., individual material) can occur. PermanentEstablishmentUUID denotes the PermanentEstablishment to which the recorded data relates and is optional. PermanentEstablishmentUUID may be based on GDT UUID. AccountingDocumentUUID is a universal identification, which may be unique, of the AccountingDocument that records the entire business transaction in Accounting. AccountingDocumentUUID may be based on GDT UUID. AccountingDocumentID is an identification, which may be unique, of the AccountingDocument that records the entire business transaction in Accounting. AccountingDocumentID may be based on GDT BusinessTransactionDocumentID. AccountingDocumentItemID is an identification, which may be unique, of the corresponding AccountingDocumentItem in the AccountingDocument which records the value change according to the criteria of GeneralLedger. AccountingDocumentItemID may be based on GDT BusinessTransactionDocumentItemID. OriginalEntryDocumentContainingObjectReference is a reference to an Object containing the Original Entry Document. OriginalEntryDocumentContainingObjectReference may be based on GDT ObjectNodeReference. Qualifiers may include OriginalEntryDocumentContaining. OriginalEntryTransactionUUID is an universal identifier, which may be unique, of the transaction during which the Original Entry Document was created or changed. OriginalEntryTransactionUUID may be based on GDT UUID. OriginalEntryDocumentReference is the reference to the document, that keeps the original entry of the business transaction. OriginalEntryDocumentReference may be based on GDT ObjectNodeReference. OriginalEntryDocumentItemReference is a reference to an item of the OriginalEntryDocument. The value change recorded in the PurchaseLedgerAccountItem can be verified by that item of the OriginalEntryDocument. OriginalEntryDocumentItemReference may be based on GDT ObjectNodeReference. OriginalEntryDocumentItemTypeCode is the coded representation of the Item Type of the referred OriginalEntryDocumentItem and is optional. OriginalEntryDocumentItemTypeCode may be based on GDT BusinessTransactionDocumentItemTypeCode. This element can be used if the Original Entry Document is a Business Transaction Document.OriginalEntryDocumentPartnerID is the identification of the Original Entry Document as assigned by the business partner and is optional. For example, the ID of the Supplier Invoice assigned by the Supplier. OriginalEntryDocumentPartnerID may be based on GDT BusinessTransactionDocumentID. This element can be used if the Original Entry Document is a Business Transaction Document and if the Original Entry Document is identical to the Original Entry Document Containing Object. AccountingNotificationUUID is an universal identification, which may be unique, of the notification sent to Financial Accounting about the business transaction stated in the LineItem and is optional. AccountingNotificationUUID may be based on GDT UUID. AccountingNotificationItemGroupItemUUID is an universal identification, which may be unique, of the Accounting Notification Item Group Item, which triggered the posting of this PurchaseLedgerAccountItem and is optional. AccountingNotificationItemGroupItemUUID may be based on GDT UUID. GeneralLedgerAccountLineItemUUID is an universal identification, which may be unique, of a LineItem of a GeneralLedgerAccount that records the value change of the PurchaseLedgerAccountLineItem in the GeneralLedger. GeneralLedgerAccountLineItemUUID may be based on GDT UUID.

GeneralLedgerAccountLineItemAccountingDocumentItemGroupID is an universal identification, which may be unique, of the group of all AccountingDocumentItems that are summarized together in a GeneralLedgerAccountLineItem. The LineItem can correspond to one AccountingDocumentItem belonging to the group. GeneralLedgerAccountLineItemAccountingDocumentItemGroupID may be based on GDT BusinessTransactionDocumentItemGroupID. OffsettingSubledgerAccountUUID is an universal identification, which may be unique, of a SubledgerAccount (e.g., such as a MaterialLedgerAccount) in whose LineItems the inverse representation of the business transaction is stated and is optional. OffsettingSubledgerAccountUUID may be based on GDT UUID. OffsettingSubledgerAccountTypeCode is the coded representation of the type of the OffsettingSubledgerAccount to which the PurchaseLedgerAccount LineItem refers and is optional. OffsettingSubledgerAccountTypeCode may be based on GDT SubledgerAccountTypeCode. Restrictions may include: the code values 1 (i.e., Fixed Asset), 2 (i.e., Material Ledger Account), 9 (i.e., Overhead Costs Ledger Account) and 11 (i.e., OtherDirectCostLedgerAccount) can occur. SystemAdministrativeData is the administrative data stored in a system. This data can include the system user and change time. SystemAdministrativeData may be based on GDT SystemAdministrativeData.

ChartOfAccountsCode is the coded representation of the ChartOfAccounts containing the ChartOfAccountsItem that classifies—for general ledger accounting purposes—the value stated in the LineItem. ChartOfAccountsCode may be based on GDT ChartOfAccountsCode. ChartOfAccountsItemCode is the coded representation of a ChartOfAccountsItem that classifies for general ledger accounting purposes—the value stated in the LineItem. ChartOfAccountsItemCode may be based on GDT ChartOfAccountsItemCode. AccountingBusinessTransactionTypeCode is the coded representation of the type of the business transaction stated in the PurchaseLedgerAccountLineItem. It can classify the business transaction according to Accounting criteria. AccountingBusinessTransactionTypeCode may be based on GDT AccountingBusinessTransactionTypeCode. TypeCode is the coded representation of the type of the LineItem. TypeCode may be based on GDT SubledgerAccountLineItemTypeCode. AccountingDocumentTypeCode is the coded representation of the type of the AccountingDocument to which the LineItem refers by the AccountingDocumentReference. AccountingDocumentTypeCode may be based on GDT AccountingDocumentTypeCode. AccountingDocumentNote is the natural-language comment that applies the AccountingDocument—referred via the AccountingDocumentReference—as a whole rather than to individual items and is optional. AccountingDocumentNote may be based on GDT SHORT_Note.

AccountingDocumentItemNote is the natural-language comment pertaining to the AccountingDocumentItem to which the LineItem refers by the AccountingDocumentReference and is optional. AccountingDocumentItemNote may be based on GDT SHORT_Note. ProductTaxTypeCode denotes the product tax type to which the recorded data relates and is optional. ProductTaxTypeCode may be based on GDT TaxTypeCode. ProductTaxDueCategoryCode denotes the category (e.g., receivable or payable) of a tax due to which the recorded data relates and is optional. ProductTaxDueCategoryCode may be based on GDT DueCategoryCode. ProductTaxCountryCode is the country to whose tax authority the product tax data has been or will be reported and is optional. ProductTaxCountryCode may be based on GDT CountryCode. ProductTaxEventTypeCode denotes the product tax event to which the recorded data relates and is optional. ProductTaxEventTypeCode may be based on GDT ProductTaxEventTypeCode. ProductTaxRateTypeCode denotes the type of product tax rate to which the recorded data relates and is optional. ProductTaxRateTypeCode may be based on GDT TaxRateTypeCode. WithholdingTaxTypeCode denotes the withholding tax type to which the recorded data relates and is optional. WithholdingTaxTypeCode may be based on GDT TaxTypeCode.

WithholdingTaxCountryCode is the country to whose tax authority the withholding tax data has been or will be reported and is optional. WithholdingTaxCountryCode may be based on GDT CountryCode. WithholdingTaxEventTypeCode denotes the witholding tax event to which the recorded data relates and is optional. WithholdingTaxEventTypeCode may be based on GDT WithholdingTaxEventTypeCode. WithholdingTaxRateTypeCode denotes the type of withholding tax rate to which the recorded data relates and is optional. WithholdingTaxRateTypeCode may be based on GDT TaxRateTypeCode. PostingDate is the date with which the business transaction is effectively recorded in Accounting. Effectively may mean that period totals and balances in accounting are updated with this date. PostingDate may be based on GDT Date. Qualifiers may include: Posting. OriginalEntryDocumentDate is the issue date of the Original Entry Document. OriginalEntryDocumentDate may be based on GDT Date. Qualifiers may include: OriginalEntryDocument. AccountingBusinessTransactionDate is the date at which the business transaction took place applying the criteria of Accounting. AccountingBusinessTransactionDate may be based on GDT Date Qualifiers may include: BusinessTransaction.

CurrencyConversionDate is the date that is used for the currency translation applied to amounts in the accounting document. CurrencyConversionDate may be based on GDT Date. Qualifiers may include: CurrencyConversion. FiscalYearVariantCode is the coded representation of the FiscalYearVariant according to whose fiscal year definition (begin, end, period definition) the FiscalYearID and the AccountingPeriodID are derived. FiscalYearVariantCode may be based on GDT FiscalYearVariantCode. FiscalYearID is an identification of the fiscal year in which the LineItem is posted. FiscalYearID may be based on GDT FiscalYearID. AccountingPeriodID is an identification of the accounting period in which the LineItem is posted. AccountingPeriodID may be based on GDT AccountingPeriodID. AccountingClosingStepCode is the coded representation of the closing step of the accounting document and is optional. AccountingClosingStepCode may be based on GDT AccountingClosingStepCode.

AccountingDocumentItemAccountingGroupID is an identification, which may be unique, of a group of AccountingDocumentItems belonging together applying the criteria of Accounting. It can be used to indicate the items of an AccountingDocument that belong together for example in partial zero-balance checking within the Accounting Document. AccountingDocumentItemAccountingGroupID may be based on GDT BusinessTransactionDocumentItemGroupID. An example is an activity confirmation from production that can contain items for actual working times and also for materials used for the production process. The created AccountingDocumentItems can be grouped together according to the material movement or working time confirmation they belong to. AccountingDocumentItemProductTaxGroupID is an identification, which may be unique, of a group of AccountingDocumentItems that belong together because they are tax relevant and have the same taxation and related tax items and is optional. AccountingDocumentItemProductTaxGroupID may be based on GDT BusinessTransactionDocumentItemGroupID. GeneralLedgerMovementTypeCode is a coded representation of the type of movement with which the value change is recorded for GeneralLedger purposes in the GeneralLedgerAccount and is optional. GeneralLedgerMovementTypeCode may be based on GDT GeneralLedgerMovementTypeCode. DebitCreditCode is the coded representation of debit or credit. It can specify whether the line item is assigned to the debit or credit side of the GeneralLedger account. DebitCreditCode may be based on GDT DebitCreditCode.

CancellationDocumentIndicator indicates whether the AccountingDocument to which the LineItem refers by the AccountingDocumentReference refers to a Cancellation Original Entry Document and is optional. CancellationDocumentIndicator may be based on GDT Indicator. Qualifiers may include: CancellationDocument. CancellationOriginalEntryDocumentContainingBusinessObjectReference is a reference to the Business Object containing the OriginalEntryDocument that cancelled this LineItem and is optional. CancellationOriginalEntryDocumentContainingBusinessObjectReference may be based on GDT ObjectNodeReference. Qualifiers may include: CancellationOriginalEntryDocumentContaining. CancellationOriginalEntryTransactionUUID is an universal identifier, which may be unique, of the transaction during which the CancellationOriginalEntryDocument was created or changed and is optional. CancellationOriginalEntryTransactionUUID may be based on GDT UUID.

CancellationOriginalEntryDocumentReference is a reference to the OriginalEntryDocument, that cancelled this LineItem and is optional. CancellationOriginalEntryDocumentReference may be based on GDT ObjectNodeReference. Qualifiers may include: Cancellation.

CancelledIndicator indicates if the line item has been cancelled and is optional. CancelledIndicator may be based on GDT Indicator. Qualifiers may include: Cancelled.

CashDiscountDeductibleIndicator indicates whether a cash discount can be deducted from the LineItem and is optional. CashDiscountDeductibleIndicator may be based on GDT Indicator. Qualifiers may include: CashDiscountDeductible.

BusinessTransactionCurrencyAmount is the value of the LineItem in transaction currency and is optional. The transaction currency can be the currency agreed on by two business partners for their business relationship. BusinessTransactionCurrencyAmount may be based on GDT Amount. Qualifiers may include: BusinessTransactionCurrency.

LineItemCurrencyAmount is the value of the LineItem in LineItem currency and is optional. LineItemCurrencyAmount may be based on GDT Amount. Qualifiers may include: LineItem. Constraints may include: LineItemCurrencyAmount can be used if the element ClearingUUID is filled.

LocalCurrencyAmount is the value of the LineItem in the local currency of the Company carrying the account. The local currency is the currency in which the local books are kept. LocalCurrencyAmount may be based on GDT Amount. Qualifiers may include: LocalCurrency.

SetOfBooksCurrencyAmount is the value of the LineItem in the currency selected for the set of books and is optional. SetOfBooksCurrencyAmount may be based on GDT Amount. Qualifiers may include: SetOfBooksCurrency.

HardCurrencyAmount is the value of the LineItem, in the hard currency of the country of the Company carrying the account and is optional. The hard currency can be a stable, country-specific currency that is used in high-inflation countries. HardCurrencyAmount may be based on GDT Amount. Qualifiers may include: HardCurrency.

IndexBasedCurrencyAmount is the value of the LineItem in the index-based currency of the country of the Company carrying the account and is optional. The index-based currency can be a fictitious, country-specific currency that is used in high-inflation countries as a comparison currency for reporting. IndexBasedCurrencyAmount may be based on GDT Amount. Qualifiers may include: IndexedBasedCurrency.

ClearingQuantity denotes the quantity of the business transaction represented in the line item that is used in goods receipt/invoice receipt clearing to distribute the variances or for which the price variances were calculated and cleared in goods receipt/invoice receipt clearing and is optional. ClearingQuantity may be based on GDT Quantity. Qualifiers may include: Clearing. Constraints may include: ClearingQuantity is used if the element ClearingUUID is filled.

ClearingQuantityTypeCode is the coded representation of the type of the clearing quantity. ClearingQuantityTypeCode may be based on GDT QuantityTypeCode. Qualifiers may include: Clearing. Constraints may include: ClearingQuantityTypeCode can be used if the element ClearingQuantity is filled.

ValuationQuantity is the quantity change of the business transaction stated in the line item in the valuation unit of measurement of the material, service product, or resource and is optional. ValuationQuantity may be based on GDT Quantity. Qualifiers may include: Valuation.

ValuationQuantityTypeCode is the coded representation of the type of the valuation quantity and is optional. ValuationQuantityTypeCode may be based on GDT QuantityTypeCode. Qualifiers may include: Valuation. Constraints may include: ValuationQuantityTypeCode can be used if the element ValuationQuantity is filled.

ReferenceQuantity specifies, in the order unit, a quantity to which the business transaction stated in the line item refers but which does not result in a change to the clearing quantity and is optional. ReferenceQuantity may be based on GDT Quantity. Qualifiers may include: Reference.

ReferenceQuantityTypeCode is the coded representation of the type of the reference quantity and is optional. ReferenceQuantityTypeCode may be based on GDT QuantityTypeCode. Qualifiers may include: Reference. Constraints may include: ReferenceQuantityTypeCode can be used if the element ReferenceQuantity is filled.

An inbound aggregation relationship, SetOfBooks, may exist from business object SetOfBooks, node SetOfBooks. SetOfBooks has a cardinality of 1:cn and is the SetOfBooks according to whose specifications the LineItem was created.

An inbound aggregation relationship, Partner Company, may exist from business object Company, node Company. Partner Company has a cardinality of c:cn, and is a company that acts in the business transaction stated in the LineItem as an intra corporate partner.

A number of inbound aggregation relationships from business object Segment, node Segment, may exist, including: Segment, which has a cardinality of c:cn and is a segment to which the value and quantity of the LineItem are allocated, and PartnerSegment, which has a cardinality of c:cn and is a Segment that acts in the business transaction stated in the LineItem as an intra corporate Partner.

A number of inbound aggregation relationships from business object ProfitCentre, node ProfitCentre, may exist, including: ProfitCentre, which has a cardinality of c:cn and is a ProfitCentre to which the value and quantity of the LineItem are allocated, and PartnerProfitCentre, which has a cardinality of c:cn and is a ProfitCentre that acts in the business transaction stated in the LineItem as an intra corporate partner.

An inbound aggregation relationship, FinancialAccountingViewOfPurchasingDocumentItem, from business object FinancialAccountingViewOfPurchasingDocument, node Item, may exist. FinancialAccountingViewOfPurchasingDocumentItem has a cardinality of c:cn and is a LineItem that can reference an item of a FinancialAccountingViewOfPurchasingDocument.

An inbound aggregation relationship, Clearing, from business object PurchaseLedgerAccount, node Clearing may exist. Clearing has a cardinality of c:cn and a LineItem can relate to a Clearing (of the same PurchaseLedgerAccount) that groups LineItems for goods receipt/invoice receipt clearing.

An inbound aggregation relationship, SupplierInvoice, from business object SupplierInvoice, node SupplierInvoice, may exist. SupplierInvoice has a cardinality of c:cn, and is a reference to the SupplierInvoice that contains the Original Entry Document.

An inbound aggregation relationship, SupplierInvoiceItem, from business object SupplierInvoice, node SupplierInvoiceItem, may exist. SupplierInvoiceItem has a cardinality of c:cn, and is an Item in a SupplierInvoice serving as Original Entry Document Item by which the value change recorded in the LineItem can be verified.

An inbound aggregation relationship, SiteLogisticConfirmation, from business object SiteLogisticConfirmation, node SiteLogisticConfirmation, may exist. SiteLogisticConfirmation has a cardinality of c:cn and is a reference to the SiteLogisticConfirmation that contains the Original Entry Document.

An inbound aggregation relationship, SiteLogisticConfirmationInventoryChangeItem, from business object SiteLogisticConfirmation, node SiteLogisticConfirmationInventoryChangeItem, may exist. SiteLogisticConfirmationInventoryChangeItem has a cardinality of c:cn, and is an InventoryChangeItem in a SiteLogisticConfirmation serving as Original Entry Document Item by which the value change recorded in the LineItem can be verified.

An inbound aggregation relationship, GoodsAndServiceAcknowledgment, from business object GoodsAndServiceAcknowledgment, node GoodsAndServiceAcknowledgment, may exist. GoodsAndServiceAcknowledgment has a cardinality of c:cn and is a reference to the GoodsAndServiceAcknowledgment that contains the Original Entry Document.

An inbound aggregation relationship, GoodsAndServiceAcknowledgmentItem, from business object GoodsAndServiceAcknowledgment, node GoodsAndServiceAcknowledgmentItem, may exist. GoodsAndServiceAcknowledgmentItem has a cardinality of c:cn, and may be an Item in a GoodsAndServiceAcknowledgment serving as Original Entry Document Item by which the value change recorded in the LineItem can be verified.

An inbound aggregation relationship, GoodsReceiptInvoiceReceiptClearingRun, from MDRO GoodsReceiptInvoiceReceiptClearingRun, node GoodsReceiptInvoiceReceiptClearingRun, may exist. GoodsReceiptInvoiceReceiptClearingRun has a cardinality of c:cn, and is a reference to the GoodsReceiptInvoiceReceiptClearingRun that contains the Original Entry Document.

An inbound aggregation relationship, GoodsReceiptInvoiceReceiptClearingRunLogSection, from MDRO GoodsReceiptInvoiceReceiptClearingRun, node LogSection, may exist. GoodsReceiptInvoiceReceiptClearingRunLogSection has a cardinality of c:cn, and is a reference to a LogSection that serves as Original Entry Document for a business transaction in a GoodsReceiptInvoiceReceiptRunLogSection.

An inbound aggregation relationship, GoodsReceiptInvoiceReceiptClearingRunLogSectionGoodsReceiptInvoiceReceiptClearingCalculatedItem, from MDRO GoodsReceiptInvoiceReceiptClearingRun, node LogSectionGoodsReceiptInvoiceReceiptClearingCalculatedItem, may exist. GoodsReceiptInvoiceReceiptClearingRunLogSectionGoodsReceiptInvoiceReceiptClearingCalculatedItem has a cardinality of c:cn, and is a GoodsReceiptInvoiceReceiptClearingCalculatedItem in a LogSection of an GoodsReceiptInvoiceReceiptClearingRun serving as Original Entry Document Item by which the value change recorded in the LineItem can be verified.

One of the above relationships to an Original Entry Document and to an Original EntryDocument Item can exist. If the Original Entry Document is not identical to a Business Object but contained in it then the corresponding relationship to this Business Object can exist, too.

One of these relationships can exist:

From business object FixedAsset, node FixedAsset, OffsettingFixedAsset has a cardinality of c:cn and denotes the FixedAsset to which the LineItem relates as the OffsettingSubLedgerAccount. From business object MaterialLedgerAccount, node MaterialLedgerAccount, OffsettingMaterialLedgerAccount has a cardinality of c:cn and denotes the MaterialLedgerAccount to which the LineItem relates as the OffsettingSubLedgerAccount. From business object OverheadCostLedgerAccount, node OverheadCostLedgerAccount, OffsettingOverheadCostLedgerAccount has a cardinality of c:cn, and denotes the OverheadCostLedgerAccount to which the LineItem relates as the OffsettingSubLedgerAccount. From business object OtherDirectCostLedgerAccount, node OtherDirectCostLedgerAccount, Offsetting OtherDirectCostLedgerAccount has a cardinality of c:cn and denotes the OtherDirectCostLedgerAccount to which the LineItem relates as the OffsettingSubLedgerAccount.

An association relationship for navigation, AccountingDocument, to the business object AccountingDocument/node AccountingDocument, may exist. AccountingDocument has a cardinality of 1:cn and is the accounting document that records the entire business transaction in Accounting.

An association relationship for navigation, GeneralLedgerAccountLineItem, to business object GeneralLedgerAccount, node LineItem, may exist. GeneralLedgerAccountLineItem has a cardinality of 1:cn and is a LineItem of a GeneralLedgerAccount that records the value change for GeneralLedger purposes.

An inbound association relationship, AccountingNotification, from business object AccountingNotification, node AccountingNotification, may exist. AccountingNotification has a cardinality of c:cn, and is the notification sent to Financial Accounting about the business transaction stated in the LineItem. An inbound association relationship, AccountingNotificationItemGroupItem, from business object AccountingNotification, node ItemGroupItem, may exist. AccountingNotificationItemGroupItem has a cardinality of c:cn, and is the item of the AccountingNotification whose information is recorded in the LineItem.

One of these relationships can exist: From business object Material, node Material, Material has a cardinality of c:cn and is a LineItem that can relate to a material to which the line item is to be assigned.

From business object ServiceProduct, node ServiceProduct, ServiceProduct has a cardinality of c:cn and is a LineItem can relate to a service to which the line item is to be assigned. From business object IndividualMaterial, node IndividualMaterial, IndividualMaterial has a cardinality of c:cn and is a LineItem that can relate to an individual material to which the line item is to be assigned. From business object PermanentEstablishment, node PermanentEstablishment, PermanentEstablishment has a cardinality of c:cn and is a LineItem that can relate to a PermanentEstablishment to which the line item is to be assigned. From business object Identity, node Identity, CreationIdentity has a cardinality of 1:cn and is the system user Identity who created the LineItem, and LastChangeIdentity, which has a cardinality of c:cn and is the system user Identity who last changed the LineItem.

Clearing is a grouping of LineItems within a PurchaseLedgerAccount with which the goods receipts of a procurement process are compared with the associated invoice receipts. Clearing can therefore a basis for GR/IR clearing.

The granularity can be prespecified by invoice verification when it assigns invoice items to goods receipts. The granularity can be specified as the level of the purchase order item, for example. In this case clearing can operate on each purchase order item.

The elements located directly at the Clearing node are defined by the type GDT: PurchaseLedgerAccountClearingElements. In certain implementations, these elements may include the following: UUID, FinancialAccountingViewOfPurchasingDocumentItemUUID, OrderItemReference, ClearingQuantityUnitCode, ClearingQuantityTypeCode, LineItemCurrencyCode.

UUID can contain an universally valid identifier for Clearing. UUID may be based on GDT UUID.

FinancialAccountingViewOfPurchasingDocumentItemUUID is a global identifier, which may be unique, of the FinancialAccountingViewOfPurchasingDocumentItem that is represented by the Clearing. FinancialAccountingViewOfPurchasingDocumentItemUUID may be based on GDT UUID.

OrderItemReference is a reference to an item of an Operational Document that acts—from the Financial Accounting point of view—as an OrderItem and that is represented by the Clearing together with the FinancialAccountingViewOfPurchasingDocumentItem. OrderItemReference may be based on GDT ObjectNodeReference. Restrictions for Object type code may include: Code values 56 (i.e., Goods and Service Acknowledgment) and 24 (i.e., ConfirmedInboundDelivery) can be used.

ClearingQuantityUnitCode is the unit of measure key of the unit of measure with which the goods receipt is compared with the invoice receipt in goods receipt/invoice receipt clearing (e.g. if the reference is a purchase order, it is the purchase order unit of measure). ClearingQuantityUnitCode may be based on GDT MeasureUnitCode.

ClearingQuantityTypeCode is the coded representation of the type of the clearing quantity. ClearingQuantityTypeCode may be based on GDT QuantityTypeCode. Qualifiers may include: Clearing.

LineItemCurrencyCode denotes the currency key of the currency with which the goods receipt can be compared with the invoice receipt in goods receipt/invoice receipt clearing (for example, if the reference is a purchase order, it is the purchase order currency). LineItemCurrencyCode may be based on GDT CurrencyCode.

The following composition relationship to subordinate nodes exists: ClearingSetOfBooks has a cardinality of 1:n.

An incoming aggregation relationship from business object FinancialAccountingViewOfPurchasingDocument, node Item, FinancialAccountingViewOfPurchasingDocumentItem exists, FinancialAccountingViewOfPurchasingDocumentItem has a cardinality of 1:cn and is a FinancialAccountingViewOfPurchasingDocument whose items are represented by the Clearing.

An incoming aggregation from business object ConfirmedInboundDelivery, node ConfirmedInboundDeliveryItem, ConfirmedInboundDeliveryItemexists.ConfirmedInboundDeliveryItem has a cardinality of c:cn and is a ConfirmedInboundDelivery whose items are represented by the Clearing.

An incoming aggregation relationship from business object GoodsAndServiceAcknowledgement, node GoodsAndServiceAcknowledgementItem, GoodsAndServiceAcknowledgementItem exists. GoodsAndServiceAcknowledgementItem has a cardinality of c:cn and is a GoodsAndServiceAcknowledgement whose items are represented by the Clearing.

An association relationships for navigation to business object PurchaseLedgerAccount, node LineItem, LineItem exists. LineItem has a cardinality of 1:cn and denotes the line items which are assigned to the Clearing.

The action Clear determines price variances between valuated goods receipts and the associated invoice receipts of a clearing run and allocates them based on the cause-effect principle.

The action enables goods receipt/invoice receipt clearing to be executed for multiple sets of books. The goods receipt/invoice receipt clearing function is run for all sets of books and a clearing status is set for each set of books. The action Clear of node SetOfBooksClearing is called for this purpose.

In some implementations the action can be performed if the status of the clearing is ‘Open’ or ‘Partially Cleared’. The valuated goods receipts are compared against the associated invoice receipts and any price variances are settled. A document is only written if price variances are found. In some implementations, if the action determines price variances on the key date, the clearing amount is posted so that the price variances in the PurchaseLedgerAccount are offset. The affected node is LineItem. In some implementations, the action generates an instance of the BO AccountingDocument. Furthermore, a line item can be written in the LedgerAccount BO belonging to the receivers (such as MaterialLedgerAccount), and any existing period total or period balance record is adjusted or a new one created. In some implementations, the action influences the status variable Clearing Status at node Clearing, which is adjusted as necessary. If goods receipt/invoice receipt clearing is executed as an update run based on a set of books and completes without errors, the status is changed to Cleared or Partially Cleared after the price variances have been calculated and settled. The status is set to Cleared if all sets of books of Clearing are cleared. The status is set to Partially Cleared if not all sets of books of Clearing are cleared but at least one set of books is cleared. If goods receipt/invoice receipt clearing is executed as a test run or as update run and ends with errors based on a set of books, the status remains unchanged.

The action elements are defined by the data type PurchaseLedgerAccountClearingClearActionElements. These elements include: MassDataRunObjectID, MassDataRunObjectTypeCode, CompanyUUID, and SetOfBooksID. MassDataRunObjectID is a universally unique identifier for an Accounting Adjustment Run and is of GDT type MassDataRunObjectID). MassDataRunObjectTypeCode is a coded representation of a type of the Mass Data Run Object, and is of GDT type MassDataRunObjectTypeCode. CompanyUUID is optional, is of GDT type UUID, and is a universally unique identifier for the company, for which the action is executed. CompanyUUID is transferred only then when processing of the Accounting Adjustment Run is executed per company and set of books. SetOfBooksID is optional, is of GDT type SetOfBooksID, and is a coded representation for the set of books, for which the action is executed. SetOfBooksID is only transferred when processing of the Accounting Adjustment Run is executed per company and set of books. The action Clear is executed by the BO GoodsReceiptInvoiceReceiptClearingRun. It cannot be started directly from a UI.

ClearingSetOfBooks carries information on a clearing run that is relevant to the set of books. For example, the processing status of the clearing run with respect to goods receipt/invoice receipt clearing for a set of books can be specified here. It can be set for and by goods receipt/invoice receipt clearing and can take on values such as Open or Cleared. The elements located directly at the Clearing node are defined by the type GDT: PurchaseLedgerAccountClearingSetOfBooksElements. In certain implementations, these elements include: SetOfBooksID.

SetOfBooksID denotes the set of books based on which the value of the LineItem was calculated. SetOfBooksID may be based on GDT SetOfBooksID.

An inbound aggregation relationship from business object SetOfBooks, node SetOfBooks, SetOfBooks exists. SetOfBooks has a cardinality of 1:cn, and is the element SetOfBooks denotes the set of books based on which the value of the LineItem was calculated.

The action Clear determines price variances between valuated goods receipts and the associated invoice receipts for the ClearingSetOfBooks, and allocates them based on the cause-effect principle.

In some implementations, the action can only be performed if the status of the clearing is 'Open'. The valuated goods receipts are compared against the associated invoice receipts and any price variances are settled. A document is only written if price variances are found. In some implementations if goods receipt/invoice receipt clearing for a set of books determines price variances on the key date, the clearing amount is posted so that the price variances in the PurchaseLedgerAccount are offset. The affected node is LineItem. In some implementations, goods receipt/invoice receipt clearing for a set of books generates an instance of the BO AccountingDocument. Furthermore, a line item is generated in the LedgerAccount BO belonging to the receivers (such as MaterialLedgerAccount), and any existing period total or period balance record is adjusted or a new one created. In some implementations, the action influences the status variable Clearing Status at node ClearingSetOfBooks, which is adjusted as necessary. If goods receipt/invoice receipt clearing is executed as an update run based on a set of books and completes without errors, the status is changed to Cleared after the price variances have been calculated and settled. If goods receipt/invoice receipt clearing is executed as a test run or as a update run with errors based on a set of books, the status remains unchanged.

The action elements are defined by the data type PurchaseLedgerAccountClearingSetOfBooksClearActionElements. These elements include: MassDataRunObjectID, MassDataRunObjectTypeCode, CompanyUUID, and SetOfBooksID.

MassDataRunObjectID is of GDT type MassDataRunObjectID, and is a universally unique identifier for an Accounting Adjustment Run. MassDataRunObjectTypeCode is of GDT type MassDataRunObjectTypeCode and is a coded representation of a type of the Mass Data Run Object. CompanyUUID is optional, is of GDT type UUID, and is a universally unique identifier for the company, for which the action is executed. CompanyUUID is transferred only then when processing of the Accounting Adjustment Run is executed per company and set of books. SetOfBooksID is optional, is of GDT type SetOfBooksID, and is a coded representation for the set of books, for which the action is executed. SetOfBooksID is transferred when processing of the Accounting Adjustment Run is executed per company and set of books. The action Clear at node SetOfBooksClearing is called by the action Clear at node Clearing in the clearing run. It can not be started directly from a UI.

The action AllowClearing sets the Clearing Status of ClearingSetOfBooks to Open so that the next goods receipt/invoice receipt clearing run includes ClearingSetOfBooks.

In some implementations, the action can be performed at any time. In some implementations, the action influences the status variable Clearing Status at node ClearingSetOfBooks. The status is set to Open so that the next goods receipt/invoice receipt clearing run includes ClearingSetOfBooks. In some implementations, the action AllowClearing is called if new accounting documents for ClearingSetOfBooks are posted (e.g. if a goods receipt or an invoice receipt with reference to a purchase order is occurred and a line item is posted in business object Purchase Ledger Account, the action AllowClearing is performed).

Business Object ResourceValuationData

FIGS. 100-1 through 100-2 illustrate one example of a ResourceValuationData business object model 100010. Specifically, this model depicts interactions among various hierarchical components of the ResourceValuationData, as well as external components that interact with the ResourceValuationData (shown here as 100000 through 100008 and 100012 through 100034). BO ResourceValuationData represents data referencing a resource or resource group for the valuation of business transactions and for cost estimates and cost accounting.

In particular, BO ResourceValuationData contains the internal cost rates for a resource or resource group. These attributes and cost rates may be based on organisational units and additional accounting concepts (such as the set of books or period).

BO ResourceValuationData is part of the Financial Accounting Master Data Management process component.

The structure elements located directly at BO ResourceValuationData Root Node 100030 contain cost rates for the valuation of business transactions within a company and for cost estimates.

Node Structure of the ResourceValuationData Business Object

ResourceValuationData/Root Node

BO ResourceValuationData/Root Node represents data that references a resource or resource group for the valuation of business transactions and for cost estimates and cost accounting.

The structure elements located directly at the ResourceValuationData node are defined by ResourceValuationDataElements data type. In certain implementations these elements may include the following: UUID, ResourceUUID, CompanyUUID, CostManagementFunctionalUnitUUID.

UUID is an identifier, which may be unique, of an ResourceValuationData. This element may be based on GDT UUID.

ResourceUUID is an identifier, which may be unique, of the resource to which ResourceValuationData refers. This element may be based on GDT UUID.

CompanyUUID is an identifier, which may be unique, of the company to which ResourceValuationData applies. This element may be based on GDT UUID.

CostManagementFunctionalUnitUUID is an identifier, which may be unique, of a Functional Unit that is responsible for processing the Resource Valuation Data. This element may be based on GDT UUID. It may be optional. The referenced Functional Unit may be responsible for the Organisational Function "Cost Management", that is, the OrganisationalFunctionCode on one of the FunctionalUnitAttributes nodes of the FunctionalUnit may have the value "24" (CostManagement).

In certain implementations of Root Node, the following composition relationships to subordinate nodes may exist: CostRate 100032 may have a cardinality relationship of 1:cn; AccessControlList 100034 may have a cardinality relationship of 1:1.

In certain implementations of Root Node, the following inbound aggregation relationships may exist. Resource may have a cardinality relationship of c:cn, and indicates that Resource to which ResourceValuationData refers; this may originate from BO Resource/Root Node. Company may have a cardinality relationship of 1:cn, and indicates the company to which ResourceValuationData applies; this may originate from BO Company/Root Node.

In certain implementations of Root Node, the following inbound association relationships from BO FunctionalUnit/Root Node may exist: CostManagementFunctionalUnit may have a cardinality relationship of c:cn, and indicates that The Functional Unit that is responsible for processing the Resource Valuation Data.

In certain implementations of Root Node a QueryByResource may be called. This retrieves a list of ResourceValuationData for a particular resource, or for resources of a particular type, or for resources that exist within a particular company.

The query elements are defined by data type ResourceValuationDataResourceQueryElements. In certain implementations these elements may include the following. ResourceUUID, for which simple selection (no ranges, no exclusions) may be used; this element may be based on GDT UUID. ResourceID, for which simple selection (no ranges, no exclusions) may be used, this element identifies the resource (the ID element in the Resource business object that can be reached through the "Resource" association); this element may be based on GDT ResourceID. ResourceCategoryCode is a coded representation of the category of a resource (the ResourceCategoryCode element in the Resource business object that can be reached through the "Resource" association); this element may be based on GDT ResourceCategoryCode. CompanyUUID, which may be based on GDT UUID. CompanyID, which identifies the company to which the ResourceValuationData refers (the ID element in the Company business object that can be reached through the "Company" association); this element may be based on GDT OrganisationalCentreID.

The above query elements may be optional. One or more of the above query elements may be transferred; exactly one element of each UUID/ID pair of elements may be transferred; the element ResourceCategoryCode may be transferred if the elements ResourceUUID and ResourceID are not transferred. Query elements defined by data type ResourceValuationDataResourceQueryElements may also include the following, which may be optional: Date, SetOfBooksID.

Date specifies the date at which the assignment of a resource to a ResourceValuationData is evaluated. This element may be based on GDT Date. A resource may be assigned to a ResourceValuationData indirectly via a resource group. The assignment of a resource to a resource group may be changed in the course of time. It may be recorded based on validity dates at the BO Resource. In Financial Accounting a change of a resource's assignment to a resource group may be relevant on an accounting period basis. Therefore, the accounting period may be derived from the Date query element. Following that, the resource's resource group assignment may be evaluated on the first day of this accounting period. If the Date element is not supplied the current date may be used.

SetOfBooksID specifies the set of books for which the accounting period is derived from the given date. This element may be based on GDT SetOfBooksID. The assignment of dates to accounting periods may controlled at the company/set of books level. The company may be derived from the resource itself via its cost centre assignment. If the SetOfBooksID element is not supplied the default set of books of the resource's company may be used.

CostRate

BO ResourceValuationData/node CostRate represents a period-based cost rate for a resource for a set of books (SetOfBooks) that may be used to valuate the business transactions with which a service product is provided in a company by utilizing the resource. It may reference the ServiceProduct provided when the resource was utilized.

A cost rate is a price that may be used to valuate the provision of a certain quantity of a service product and that is calculated or (manually) planned with the intention of allocating a fair share of the costs incurred in providing the resource which produces the service product (such as salaries and machine depreciation) to the users of the service product (such as production lots or projects).

The character of a cost rate is determined by the price type (such as manually entered planned cost rate or calculated actual cost rate). The price type influences the system behavior at various points.

The structure elements located directly at the CostRate node are defined by data type GDT ResourceValuationDataCostRateElements. In certain implementations these elements may include the following: SetOfBooksID, PriceTypeCode, FiscalYearVariantCode, FiscalYearID, AccountingPeriodID, ServiceProductUUID, SystemAdministrativeData, LocalCurrencyValuationPrice, SetOfBooksCurrencyValuationPrice, HardCurrencyValuationPrice, IndexBasedCurrencyValuationPrice.

SetOfBooksID identifies the set of books to which the cost rate refers. This element may be based on GDT SetOfBooksID.

PriceTypeCode is a coded representation of the price type of the cost rate. This element may be based on GDT PriceTypeCode.

FiscalYearVariantCode is a coded representation of the FiscalYearVariant according to whose fiscal year definition (begin, end, period definition) the FiscalYearID and the AccountingPeriodID are derived. This element may be based on GDT FiscalYearVariantCode.

FiscalYearID specifies the fiscal year for which the cost rate is valid. This element may be based on GDT FiscalYearID.

AccountingPeriodID specifies the period within the fiscal year for which the cost rate is valid. This element may be based on GDT AccountingPeriodID.

ServiceProductUUID is an identifier, which may be unique, of the service product to which the cost rate refers. This element may be based on GDT UUID. It may be optional.

SystemAdministrativeData Indicates when and by whom the cost rate was created or changed. This element may be based on GDT SystemAdministrativeData.

LocalCurrencyValuationPrice specifies the cost rate in the local currency of the company keeping the books. The local currency is the national currency in which the local books are kept. It may be necessary to convert the unit of measure of the BaseQuantity element into the capacity unit of measure of the resource. This element may be based on GDT Price, Qualifier Valuation.

SetOfBooksCurrencyValuationPrice is cost rate in the currency chosen as the overall currency in a set of books. It may be necessary to convert the unit of measure of the BaseQuantity element into the capacity unit of measure of the resource. This element may be based on GDT Price, Qualifier Valuation. It may be optional.

HardCurrencyValuationPrice is cost rate in the hard currency of the country of the company keeping the books. The hard currency is a stable, country-specific currency that is used in high-inflation countries. It may be necessary to convert the unit of measure of the BaseQuantity element into the capacity unit of measure of the resource. This element may be based on GDT Price, Qualifier Valuation. It may be optional.

IndexBasedCurrencyValuationPrice is cost rate in the index currency of the country of the company keeping the books. The index-based currency is a fictitious, country-specific currency that is used in high-inflation countries as a comparison currency for reporting. It may be necessary to convert the unit of measure of the BaseQuantity element into the capacity unit of measure of the resource. This element may be based on GDT Price Qualifier Valuation. It may be optional.

In certain implementations of node CostRate, the following inbound aggregation relationships may exist. SetOfBooks may have a cardinality relationship of 1:cn, and indicates the Set Of Books to which the cost rate relates. ServiceProduct may have a cardinality relationship of c:cn, and indicates the service product to which the cost rate relates.

In certain implementations of node CostRate, the following inbound association relationships from BO Identity/Root Node may exist: CreationIdentity may have a cardinality relationship of 1:cn, which specifies the system user Identity who created the Cost Rate; LastChangeIdentity may have a cardinality relationship of c:cn, which specifies the system user Identity who last changed the cost rate.

In certain implementations of node CostRate, navigation associations to BO CostCentre/Root Node may exist as follows: CostCentre may have a cardinality relationship of 1:cn, which specifies the cost centre to which the resource may be assigned in the accounting period of the cost rate.

In certain implementations of node CostRate, the ESI action CreateForAccountingPeriodInterval (Enterprise Service Infrastructure) may be implemented. This action creates a series of CostRate nodes for the given interval of accounting periods. A series of CostRate nodes may be created for the given interval of accounting periods. The action elements are defined by data type ResourceValuationDataCostRateCreateForAccountingPeriodIntervalActionElements. In certain implementations these elements may include the following: ResourceValuationDataUUID, SetOfBooksID, PriceTypeCode, FiscalYearVariantCode, StartFiscalYearID, StartAccountingPeriodID, EndFiscalYearID, EndAccountingPeriodID, ServiceProductUUID, LocalCurrencyValuationPrice.

ResourceValuationDataUUID is an identifier, which may be unique, of the ResourceValuationData to which the cost rate refers. This element may be based on GDT UUID.

SetOfBooksID identifies the set of books to which the cost rate refers. This element may be based on GDT SetOfBooksID.

PriceTypeCode is a coded representation of the price type of the cost rate. This element may be based on GDT PriceTypeCode.

FiscalYearVariantCode is a coded representation of the FiscalYearVariant according to whose fiscal year definition (begin, end, period definition) the FiscalYearID and the AccountingPeriodID are derived. This element may be based on GDT FiscalYearVariantCode.

StartFiscalYearID specifies the fiscal year of the accounting period given by the element StartAccountingPeriodID. This element may be based on GDT FiscalYearID.

StartAccountingPeriodID specifies the start of the interval of accounting periods for which the cost rate is valid. This element may be based on GDT AccountingPeriodID.

EndFiscalYearID specifies the fiscal year of the accounting period given by the element EndAccountingPeriodID. This element may be based on GDT FiscalYearID.

EndAccountingPeriodID specifies the end of the interval of accenting periods for which the cost rate is valid. This element may be based on GDT AccountingPeriodID.

ServiceProductUUID is an identifier, which may be unique, of the service product to which the cost rate refers. This element may be based on GDT UUID. It may be optional.

LocalCurrencyValuationPrice specifies the cost rate in the local currency of the company keeping the books. The local currency is the national currency in which the local books are kept. It may be necessary to convert the unit of measure of the BaseQuantity element into the capacity unit of measure of the resource. This element may be based on GDT Price, Qualifier Valuation.

In certain implementations of Root Node the following queries may be called: QueryByDate, QueryByAccountingPeriodInterval.

QueryByDate outputs a list of all cost rates for a resource that are valid on a given date. The list can be restricted through the additional query elements. The query elements are defined by data type ResourceValuationDataCostRateDateQueryElements. In certain implementations these elements may include the following: Date, ResourceValuationDataUUID, ResourceValuationDataResourceUUID, ResourceValuationDataResourceID, ResourceValuationDataCompanyUUID, ResourceValuationDataCompanyID, SetOfBooksID, FiscalYearVariantCode, PriceTypeCode, ServiceProductUUID, ServiceProductIdentificationProductID.

Date specifies the date from which the fiscal year and period are derived to determine the valid cost rates. This element may be based on GDT Date.

ResourceValuationDataUUID is an identifier, which may be unique, of the ResourceValuationData (the UUID element in the root node). This element may be based on GDT UUID. It may be optional.

ResourceValuationDataResourceUUID is an identifier, which may be unique, of the resource (the ResourceUUID element in the root node). Simple selection (i.e., no ranges, no exclusions) may be used. This element may be based on GDT UUID. It may be optional.

ResourceValuationDataResourceID identifies the resource (the ID element in the Resource business object that can be reached through the "Resource" association at the root node). Simple selection (i.e., no ranges, no exclusions) may be used. This element may be based on GDT ResourceID. It may be optional.

ResourceValuationDataCompanyUUID is an identifier, which may be unique, of the company to which the ResourceValuationData refers (the CompanyUUID element in the root node). This element may be based on GDT UUID. It may be optional.

ResourceValuationDataCompanyID identifies the company to which the ResourceValuationData refers (the ID element in the Company business object that can be reached through the "Company" association at the root node). This element may be based on GDT OrganisationalCentreID. It may be optional.

SetOfBooksID. This element may be based on GDT SetOfBooksID. It may be optional.

FiscalYearVariantCode. This element may be based on GDT FiscalYearVariantCode. It may be optional.

PriceTypeCode. This element may be based on GDT PriceTypeCode. It may be optional.

ServiceProductUUID. This element may be based on GDT UUID. It may be optional.

ServiceProductIdentificationProductID identifies the service product to which the cost rate refers (the ProductID element in the Identification node in the ServiceProduct business object that can be reached through the "ServiceProduct" association). This element may be based on GDT ProductID. It may be optional.

With regards to QueryByDate elements, exactly one element of each UUID/ID pair of elements may be transferred; either the element FiscalYearVariantCode or the two elements ResourceValuationDataCompanyID and SetOfBooksID may be transferred.

QueryByAccountingPeriodInterval outputs a list of all cost rates for a resource that are valid within a given interval of accounting periods. The list may be restricted through the additional query elements. The query elements are defined by data type ResourceValuationDataCostRateAccountingPeriodIntervalQueryElements. In certain implementations these elements may include the following: StartAccountingPeriodID, EndAccountingPeriodID, StartFiscalYearID, EndFiscalYearID, ResourceValuationDataUUID, ResourceValuationDataResourceUUID, ResourceValuationDataResourceID, ResourceValuationDataCompanyUUID, ResourceValuationDataCompanyID, SetOfBooksID, FiscalYearVariantCode, PriceTypeCode, ServiceProductUUID, ServiceProductIdentificationProductID.

StartAccountingPeriodID specifies the lower limit of the interval of accounting periods within which the cost rates are valid. This element may be based on GDT AccountingPeriodID.

EndAccountingPeriodID specifies the upper limit of the interval of accounting periods within which the cost rates are valid. If the element EndAccountingPeriodID is not supplied all cost rates which are valid until the end of the fiscal year given by the element StartFiscalYearID may be listed. This element may be based on GDT AccountingPeriodID. It may be optional.

StartFiscalYearID specifies the fiscal year of the accounting period identified by the query element StartAccountingPeriodID. This element may be based on GDT FiscalYearID.

EndFiscalYearID specifies the fiscal year of the accounting period identified by the query element EndAccountingPeriodID. This element may be omitted if the element EndAccountingPeriodID is not supplied. This element may be based on GDT FiscalYearID. It may be optional.

ResourceValuationDataUUID is an identifier, which may be unique, of the ResourceValuationData (the UUID element in the root node). This element may be based on GDT UUID. It may be optional.

ResourceValuationDataResourceUUID is an identifier, which may be unique, of the resource (the ResourceUUID element in the root node). Simple selection (i.e. no ranges, no exclusions) may be used. This element may be based on GDT UUID. It may be optional.

ResourceValuationDataResourceID identifies the resource (the ID element in the Resource business object that can be reached through the "Resource" association at the root node). Simple selection (i.e. no ranges, no exclusions) may be used. This element may be based on GDT ResourceID. It may be optional.

ResourceValuationDataCompanyUUID is an identifier, which may be unique, of the company to which the ResourceValuationData refers (the CompanyUUID element in the root node). This element may be based on GDT UUID. It may be optional.

ResourceValuationDataCompanyID identifies the company to which the ResourceValuationData refers (the ID element in the Company business object that can be reached through the "Company" association at the root node). This element may be based on GDT OrganisationalCentreID. It may be optional.

SetOfBooksID. This element may be based on GDT SetOfBooksID. It may be optional.

FiscalYearVariantCode. This element may be based on GDT FiscalYearVariantCode. It may be optional.

PriceTypeCode. This element may be based on GDT PriceTypeCode. It may be optional.

ServiceProductUUID. This element may be based on GDT UUID. It may be optional.

ServiceProductIdentificationProductID identifies the service product to which the cost rate refers (the ProductID element in the Identification node in the ServiceProduct business object that can be reached through the "ServiceProduct" association). This element may be based on GDT ProductID. It may be optional.

With regards to QueryByAccountingPeriodInterval elements, one or more query elements referring to the root node may be transferred. Exactly one element of each UUID/ID pair of elements may be transferred.

DO AccessControlList

DO AccessControlList specifies a list of access groups that have access to a ResourceValuationData.

Business Object SalesLedgerAccount

Figures 1, 101:
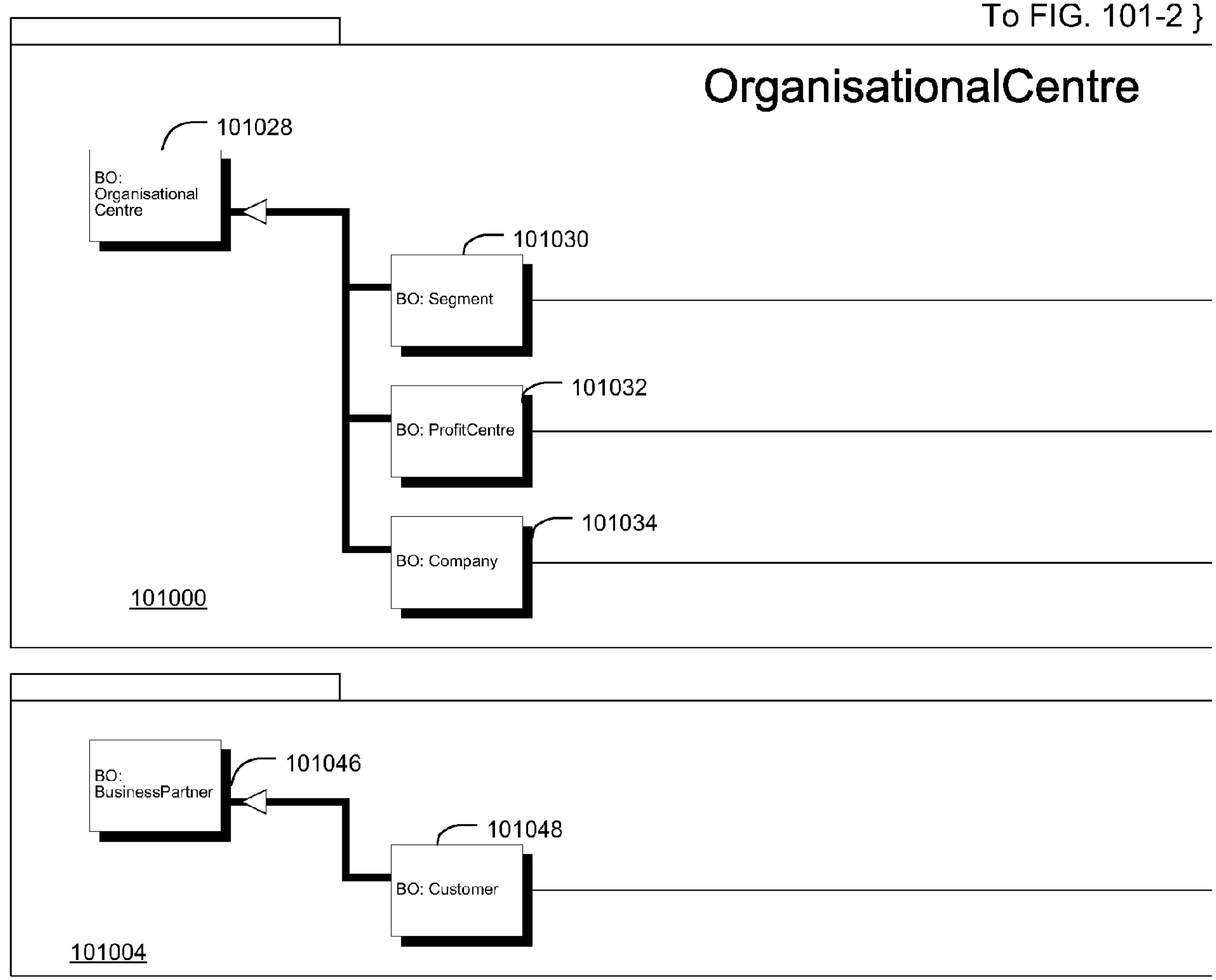
Figures 2, 101:
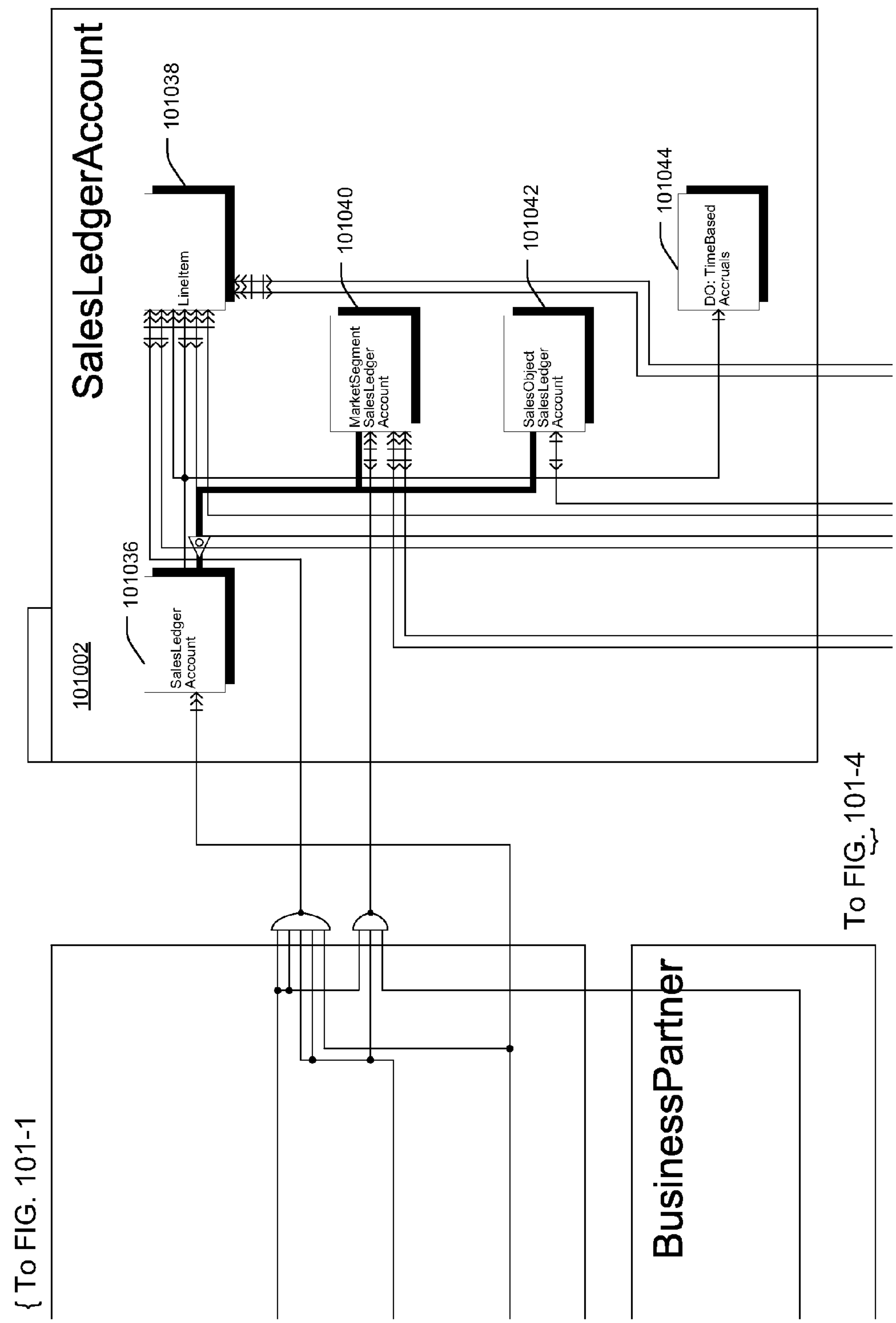
Figures 3, 101:
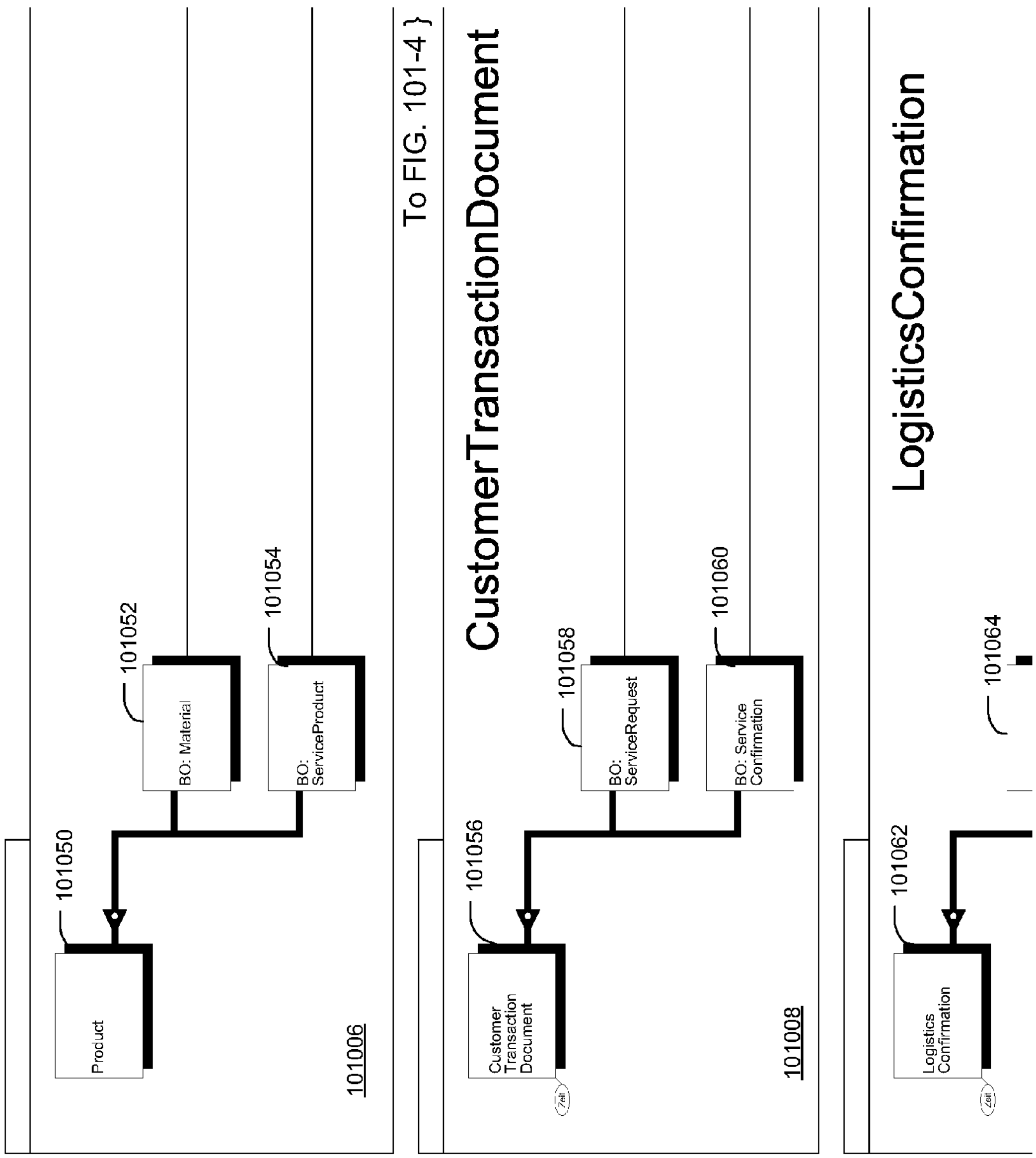
Figures 4, 101:
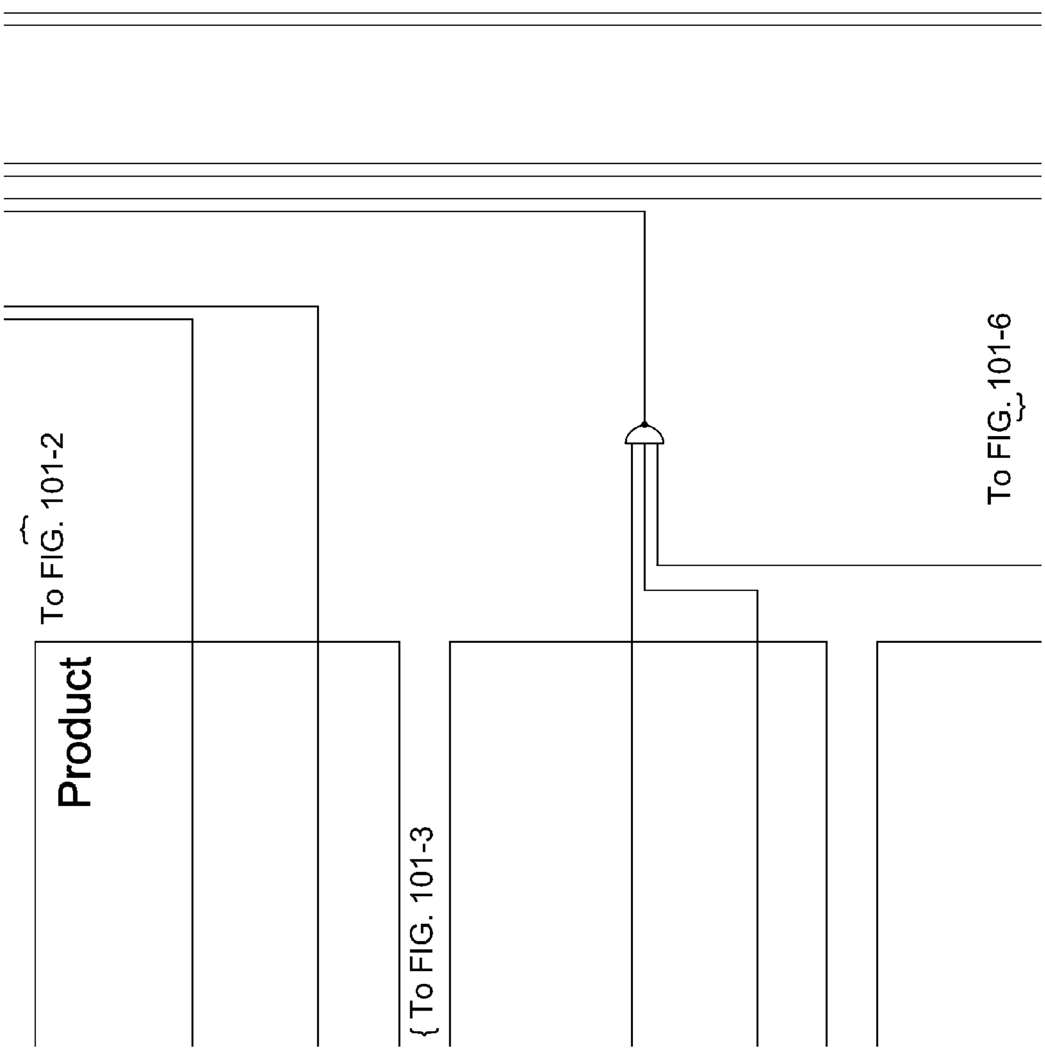
Figures 5, 101:
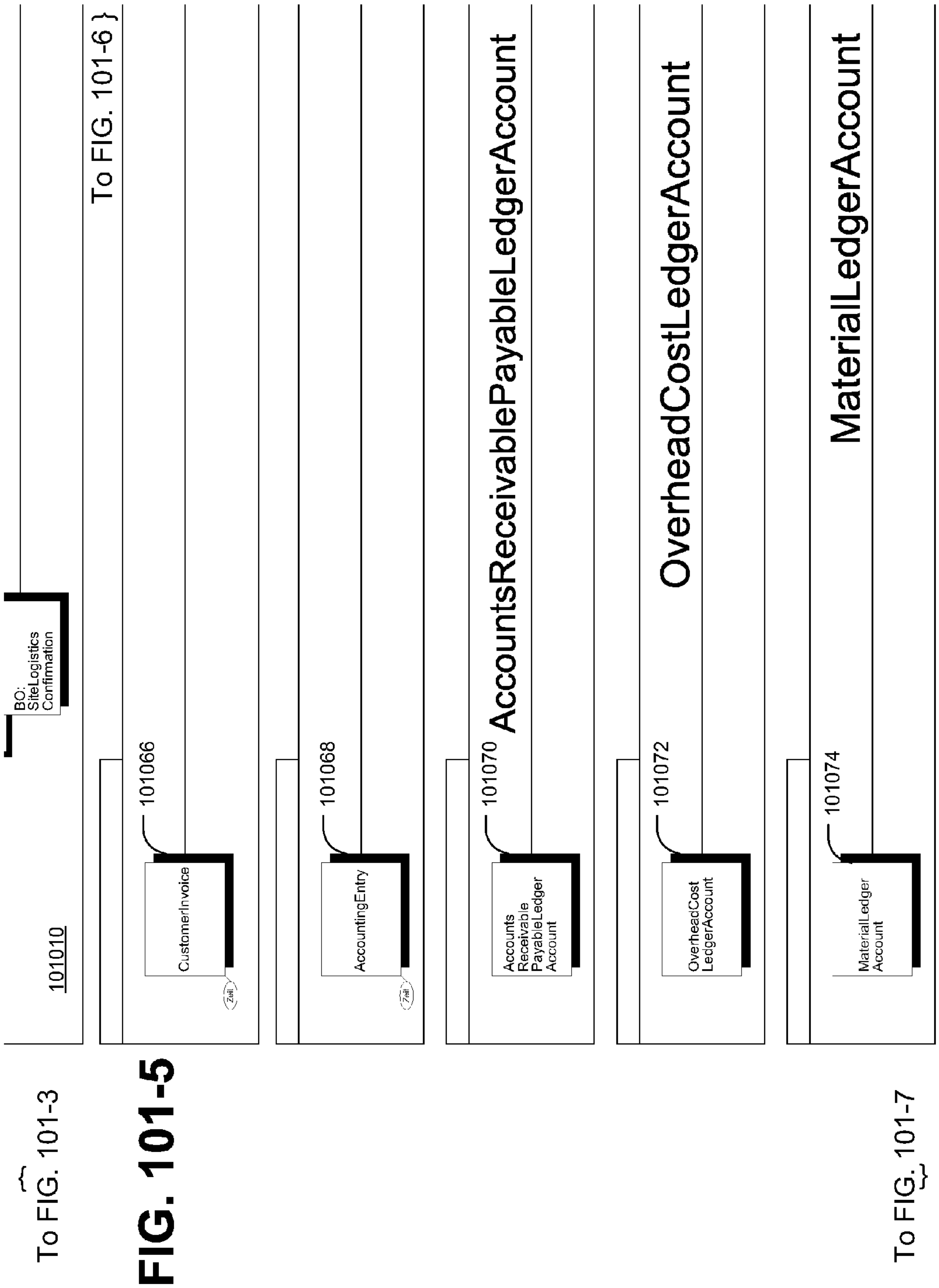
Figures 6, 101:
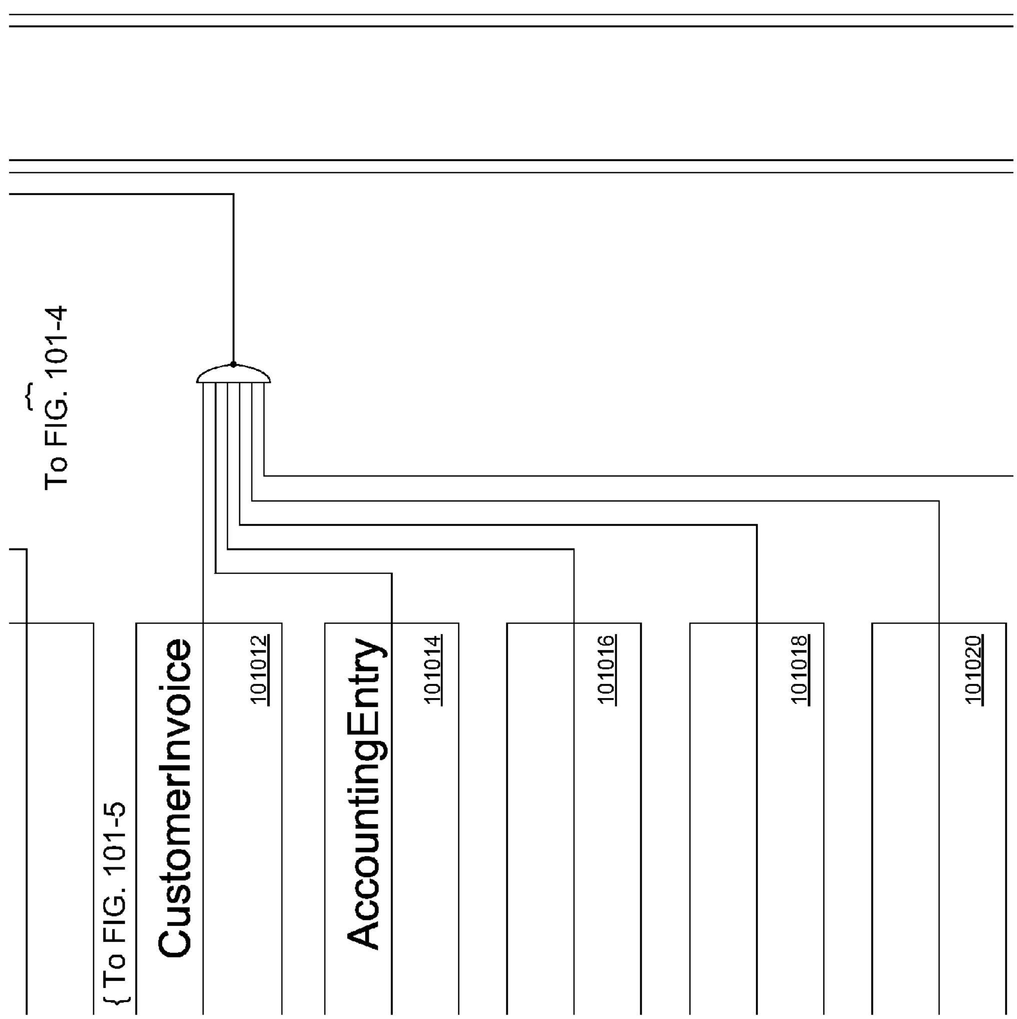
Figures 7, 101:
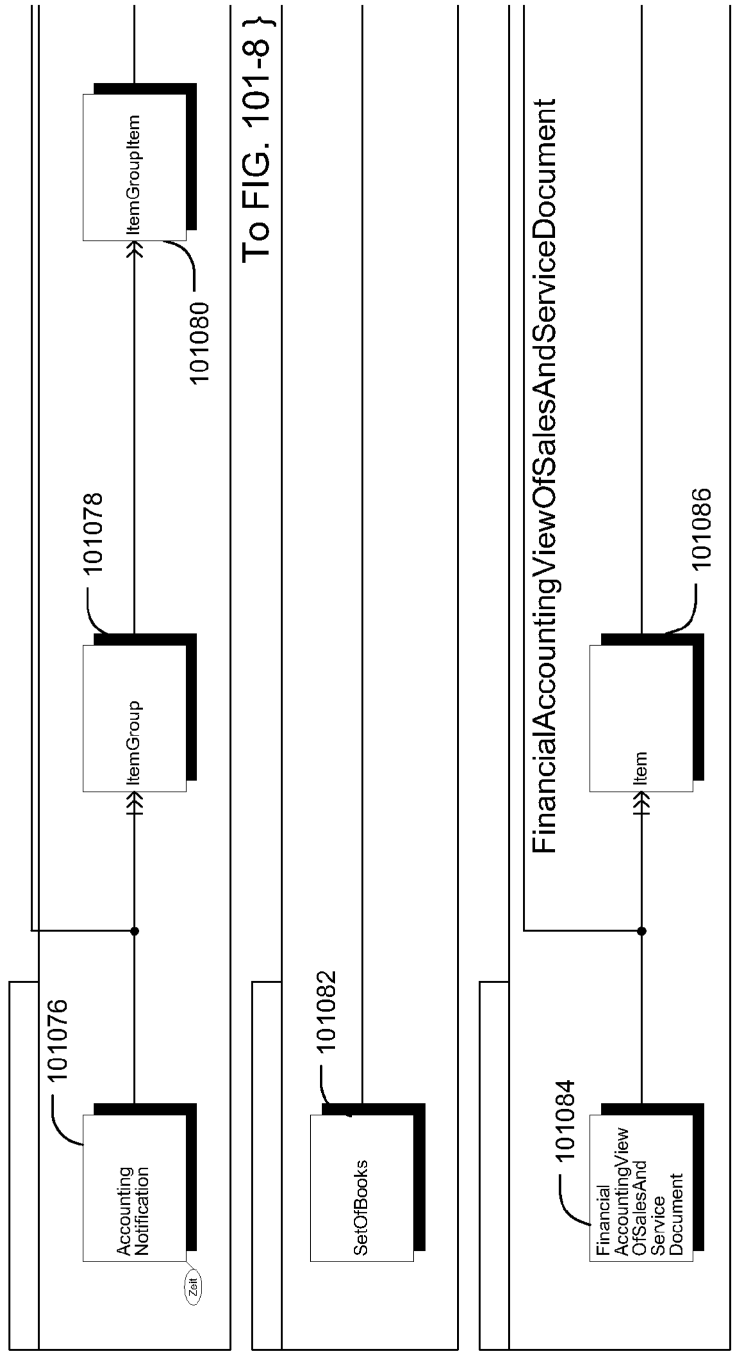
Figures 8, 101:
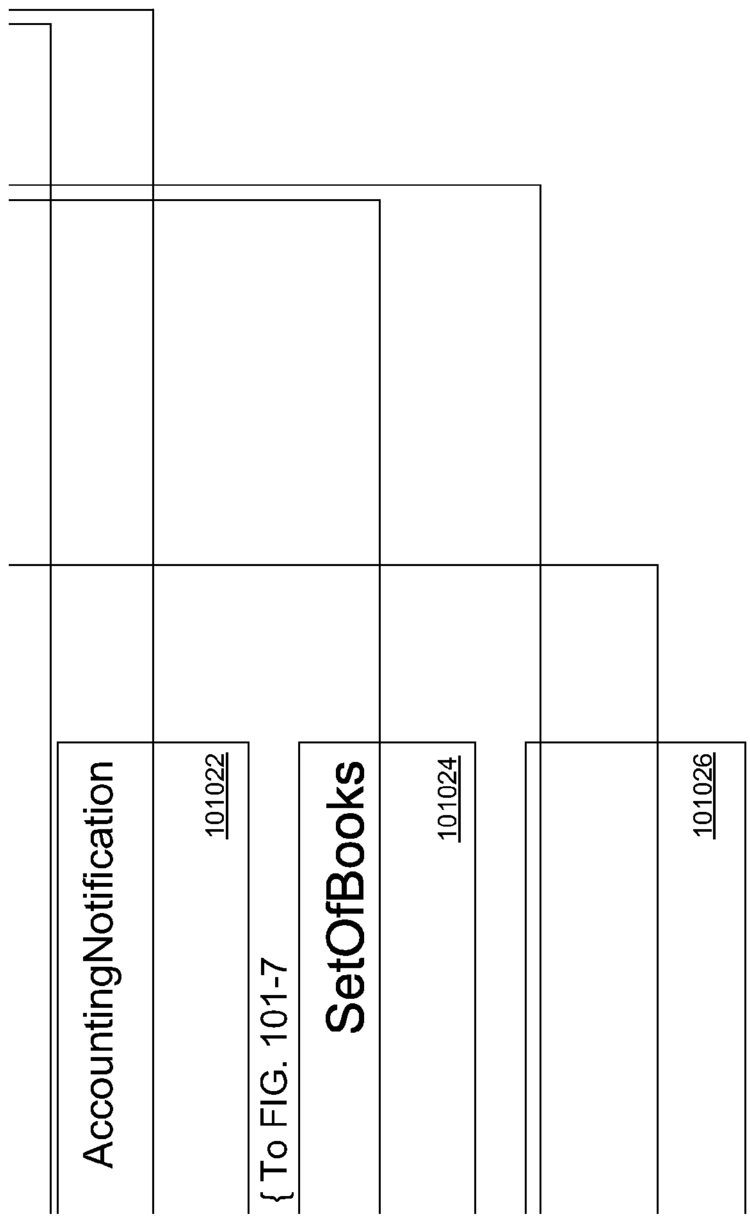

FIGS. 101-1 through 101-8 illustrate an example SalesLedgerAccount business object model 101002. Specifically, this model depicts interactions among various hierarchical components of the SalesLedgerAccount, as well as external components that interact with the SalesLedgerAccount (shown here as 101000, 101004 through 101034 and 101046 through 101086). The SalesLedgerAccount is a record for a company based on the principle of double-entry bookkeeping that shows the effects of business transactions on revenues and the cost of sales. A SalesLedgerAccount serves as a structuring element for collecting postings in the sales ledger, analyzing them for the purposes of profitability analysis, and differentiating them for period-based revenue realization. A SalesLedgerAccount can contain the values and quantities of a company with reference to a business transaction document of Sales or to a combination of characteristics (market segment) that classify sales processes (such as customer group, product group, or sales organization). IN some implementations, a SalesLedgerAccount that refers to a business transaction document of Sales (such as the sales order or service order) has an association to a Business Object FinancialAccountingViewOfSalesAndServiceDocument.

The business object SalesLedgerAccount is part of the process component Accounting. A SalesLedgerAccount can include the following components: SalesObjectSalesLedger- Account, MarketSegmentSalesLedgerAccount, TimeBasedAccruals and LineItem. A SalesLedgerAccount is a SalesObjectSalesLedgerAccount if the record references exactly one business transaction document of Sales. In this case it has an association to a FinancialAccountingViewOfSalesAndServiceDocument that reflects the business transaction document of Sales (such as a sales order). A SalesLedgerAccount is a MarketSegmentSalesLedgerAccount if the record references a combination of characteristics rather than a single business transaction document of Sales. TimeBasedAccruals can be used to manage time-based accruals of the SalesLedgerAccount, such as in cases of service contracts with monthly revenue realization. LineItem can contain verification of the valuation-relevant quantities and values. They can refer either to the entire business transaction document of Sales or to an item of the document or to a market segment.

SalesLedgerAccount is represented by the node SalesLedgerAccount 101036. In some implementations, creating and changing the business object SalesLedgerAccount is always triggered by the business object AccountingNotification.

SalesLedgerAccount can occur in the following disjoint, complete specializations: SalesObjectSalesLedgerAccount 101042 and MarketSegmentSalesLedgerAccount 101040. The specialization MarketSegmentSalesLedgerAccount is not part of the first platform release, in some implementations. It serves to explain the different specializations of the root node. The elements located at the SalesLedgerAccount node are defined by the GDT SalesLedgerAccountElements. These include UUID, CompanyUUID and FinancialAccountingViewOfSalesAndServiceDocumentUUID. The UUID is a GDT of type UUID and is the universally valid identifier for the SalesLedgerAccount. The universally unique identifier CompanyUUID is a GDT of type UUID and denotes the company to which the record relates. The FinancialAccountingViewOfSalesAndServiceDocumentUUID is a GDT of type UUID and is a universally unique identification of the FinancialAccountingViewOfSalesAndServiceDocument for which the SalesLedgerAccount records business transactions.

The following composition relationships to subordinate nodes exist. A TimeBasedAccruals 101044 has a cardinality of (1:c) with a SalesLedgerAccount. A LineItem 101038 has a cardinality of (1:cn) with a SalesLedgerAccount. Business object Company has a cardinality of (1:cn) with a SalesLedgerAccount. Company denotes the company to which the record relates.

An AccrualCalculation action executes an event-based or time-based accrual run for the SalesLedgerAccount. Accrual calculation determines the revenues to be reported in the income statement and (depending on the accrual method) the associated cost of sales. The posting is to the corresponding expense and revenue accounts. The offsetting posting is to Unbilled Receivables or Reserves for Unrealized Costs. Depending on the requirements, further detailing of the accounts is possible, such as based on sales deductions due to customer discounts or promotional discounts.

Accrual calculation is controlled by the accrual method (AccrualMethodCode) specified in the ItemSetOfBooks node of BO FinancialAccountingViewOfSalesAndServiceDocument for each set of books. This method points to settings that define for example whether the accrual is event-based or time-based. If no accrual method is specified in the SalesDocumentItemSetOfBooks node, no accrual calculation takes place for the SalesDocumentItem in the set of books. When changes to the object occur the postings generate line items in the LineItem node. When changes to other objects occur Accrual calculation generates a business object Accounting Document and creates a line item in the business object GeneralLedger Account. In some implementations, changes to the status do not apply.

The action elements are defined by the data type SalesLedgerAccountAccrualCalculationActionElements. These include MassDataRunObjectID, MassDataRunObjectTypeCode, CompanyUUID and SetOfBooksID. The MassDataRunObjectID is a GDT of type MassDataRunObjectID and is a universally unique identifier for an Accounting Adjustment Run. The MassDataRunObjectTypeCode is a GDT of type MassDataRunObjectTypeCode and is a coded representation of a type of the Mass Data Run Object. The CompanyUUID is a GDT of type UUID and is a universally unique identifier for the company, for which the action is executed. CompanyUUID is transferred when processing of the Accounting Adjustment Run is executed per company and set of books. The SetOfBooksID is a GDT of type SetOfBooksID and is a coded representation for the set of books, for which the action is executed. SetOfBooksID is transferred when processing of the Accounting Adjustment Run is executed per company and set of books. The AccrualCalculation action is executed by the business object SalesLedgerAccountAccrualsRun.

An OverheadCostCalculation action posts overhead costs to the SalesLedgerAccount based on the overhead structure specified in the SalesLedgerAccount. This credits the SubledgerAccounts (such as OverheadCostLedgerAccount) specified in the overhead structure. Overhead cost calculation can be executed if an overhead scheme is specified in the Item node of BO FinancialAccountingViewOfSalesAndServiceDocument. When changes to the object occur, overhead cost calculation generates line items in the LineItem node. When changes to other objects occur, overhead cost calculation generates a business object Accounting Document. Furthermore, a line item is generated in the business object belonging to the credit object (such as OverheadCostLedgerAccount), and any existing period total or period balance record is adjusted or a new one created. Also, a line item in the business object GeneralLedger Account is created. In some implementations, changes to the status do not apply.

The action elements are defined by the data type SalesLedgerAccountOverheadCostCalculationActionElements. These elements include MassDataRunObjectID, MassDataRunObjectTypeCode, CompanyUUID, SetOfBooksID. The MassDataRunObjectID is a GDT of type MassDataRunObjectID and is a universally unique identifier for an Accounting Adjustment Run. The MassDataRunObjectTypeCode is a GDT of type MassDataRunObjectTypeCode and is a coded representation of a type of the Mass Data Run Object. The CompanyUUID is a GDT of type UUID and is a universally unique identifier for the company, for which the action is executed. CompanyUUID is transferred when processing of the Accounting Adjustment Run is executed per company and set of books. The SetOfBooksID is a GDT of type SetOfBooksID and is a coded representation for the set of books, for which the action is executed. SetOfBooksID is transferred when processing of the Accounting Adjustment Run is executed per company and set of books. The OverheadCostCalculation action is executed by the business object SalesLedgerAccountOverheadCostCalculationRun.

QueryByOperationalDocument provides a list of all SalesObjectSalesLedgerAccounts for the company, ID, and type of a business transaction document of Sales and its assignment to a sales organization and customer service organization. The query elements are defined by the data type SalesObjectSalesLedgerAccountQueryElements. These elements include CompanyID, CompanyUUID, FinancialAccountingViewOfSalesAndServiceDocumentOperationalDocumentUUID, FinancialAccountingViewOfSalesAndServiceDocumentOperational DocumentFormattedID, FinancialAccountingViewOfSalesAndServiceDocumentOperationalDocumentTypeCode, SalesOrganisationID, SalesOrganisationUUID, CustomerServiceOrganisationID, and CustomerServiceOrganisationUUID. CompanyID is a GDT of type OrganisationalCentreID. CompanyUUID is a GDT of type UUID. FinancialAccountingViewOfSalesAndServiceDocumentOperationalDocumentUUID is a GDT of type UUID. FinancialAccountingViewOfSalesAndServiceDocumentOperationalDocumentFormattedID is a GDT of type ObjectNodeFormattedID. FinancialAccountingViewOfSalesAndServiceDocumentOperationalDocumentTypeCode is a GDT of type ObjectTypeCode. SalesOrganisationID is a GDT of type OrganisationalCentreID. SalesOrganisationUUID is a GDT of type UUID. CustomerServiceOrganisationID is a GDT of type OrganisationalCentreID. CustomerServiceOrganisationUUID is a GDT of type UUID.

QueryByInboundDelivery provides a list of all SalesObjectSalesLedgerAccounts for the company and ID of the inbound delivery. In some implementations, the inbound delivery reference will only be available in certain scenarios, e.g. if a customer or service technician returns products or spare parts. The query elements are defined by the data type SalesObjectSalesLedgerAccountInboundDeliveryQueryElements. These elements include CompanyID, CompanyUUID, FinancialAccountingViewOfSalesAndServiceDocumentInboundDeliveryUUID, and FinancialAccountingViewOfSalesAndServiceDocumentInboundDeliveryFormattedID. CompanyID is a GDT of type OrganisationalCentreID. CompanyUUID is a GDT of type UUID. FinancialAccountingViewOfSalesAndServiceDocumentInboundDeliveryUUID is a GDT of type UUID.

FinancialAccountingViewOfSalesAndServiceDocumentInboundDeliveryFormattedID is a GDT of type ObjectFormattedID.

QueryByElements provides a list of all SalesLedgerAccounts for the elements of the root node. The query elements are defined by the data type SalesLedgerAccountElementsQueryElements. These elements include UUID, CompanyUUID, FinancialAccountingViewOfSalesAndServiceDocumentUUID. FinancialAccountingViewOfSalesAndServiceDocumentUUID is a GDT of type UUID.

SalesObjectSalesLedgerAccount is a sales ledger account whose record references a business transaction document of Sales (SalesOrder, ServiceOrder, ServiceContract, ServiceRequest, ServiceConfirmation, CustomerReturn, CustomerInvoice). In some implementations, SalesObjectSalesLedgerAccount is created for a business object FinancialAccountingViewOfSalesAndServiceDocument, which itself represents a view of the business transaction document of Sales based on the requirements of Financial Accounting. The elements of the specialization SalesObjectSalesLedgerAccount are part of the structure of the root node.

A FinancialAccountingViewOfSalesAndServiceDocument has a cardinality of (c:c) with a SalesObjectSalesLedgerAccount. A FinancialAccountingViewOfSalesAndServiceDocument Denotes the business transaction document of Sales to which the record relates. The FinancialAccountingViewOfSalesAndServiceDocument is used also for access control to a SalesObjectSalesLedgerAccount.

MarketSegmentSalesLedgerAccount is a sales ledger account whose record relates to a sector of the overall market. This segment is defined by product and customer characteristics (such as product, division, and customer) and by organizational characteristics (logistics division, sales office, sales group, sales organization, service organization, and so on). MarketSegmentSalesLedgerAccount is therefore a multidimensional accounting view of sales revenues and the cost of sales as well as accrued costs and revenues that were not posted with reference to an order-like sales document. In some implementations, the component MarketSegmentSalesLedgerAccount is not part of the first platform release and is not specified further in PIC2. It serves to explain the different specializations of the root node. ProfitCentre has a cardinality of (c:cn) with MarketSegmentSalesLedgerAccount. ProfitCentre denotes the profit center to which the record relates. Segment has a cardinality of (c:cn) with MarketSegmentSalesLedgerAccount. Segment denotes the segment to which the record relates.

In some implementations, a maximum of one of the following relationships can exist. Product Material has a cardinality of (c:cn) with MarketSegmentSalesLedgerAccount. Material denotes the Material for which the record is created and which as a sold Material, for example, characterizes a sector of the overall market. Product ServiceProduct has a cardinality of (c:cn) with MarketSegmentSalesLedgerAccount. ServiceProduct denotes the ServiceProduct for which the record is created and which as a sold service product, for example, characterizes a sector of the overall market. Customer has a cardinality of (c:cn) with MarketSegmentSalesLedgerAccount. A MarketSegmentSalesLedgerAccount can reference a Customer that takes on the BuyerParty role.

TimeBasedAccruals is the assignment of revenues or expenses relating to services provided over a period to the correct periods in terms of accepted accounting practice. TimeBasedAccruals can be used for example when realizing revenue of service contracts. In this case it contains the contract data such as the planned revenue and contract duration. On this basis, the accrual run (MDRO SalesLedgerAccountAccrualsRun) generates postings that affect net income in the income statement.

TimeBasedAccruals is only created if an accrual method is specified for the item of the business transaction document in the SalesDocumentItemSetOfBooks node and that accrual method defines a time-based accrual.

LineItem is a statement for a SalesLedgerAccount about the value of the cost of sales, revenues, or cost or revenue accruals, based on a single business transaction for a set of books. A line item contains detailed information representing the business transaction from the accounting viewpoint, such as a posting date and a original entry document reference. It can reference either a SalesObjectSalesLedgerAccount or a MarketSegmentSalesLedgerAccount. If it references a SalesObjectSalesLedgerAccount, the reference can be further specified through the item of the business transaction document of Sales. A set of books is a complete, self-contained, and consistent set of accounting figures within accounting. Complete means that all postings and relevant information on all items in the balance sheet and profit and loss statement are included. “Self-contained” means that no external reference to other posted information in accounting is needed to explain the content of a set of books. Consistent means that the posted data of a set of books are comparable as regards the structure (fiscal year variant, currency, chart of accounts) and the semantics (that is, based on an accounting principle or other rules or exceptions).

Subsequently a generic approach for referencing Original Entry Documents is used, where an Original Entry Document is a document that is necessary for auditing purposes and verifies that the value stated in the LineItem of a ledger account has been booked on the base of a real business transaction. An Original Entry Document may be contained in another Object, the OriginalEntryDocument ContainingObject. Typical such constellations include FinancialAuditTrailDocumentation, LogSection, SettlementResultAccounting, and PeriodItem. A FinancialAuditTrailDocumentation is generally contained in a Host object like DuePayment, DueClearing, Dunning, and PaymentAllocation from Operative Financials. A LogSection is generally contained in some or all AccountingAdjustmentRun-MDROs (e.g. InventoryPriceChangeRun, GeneralLedgerAccountBalanceDistributionRun, FixedAssetDepreciationRun, WorkInProcess ClearingRun). SettlementResultAccounting is generally contained in an ExpenseReport. PeriodItem is generally contained in an EmployeeTimeCalendar The elements located at the LineItem node are defined by the GDT SalesLedgerAccountLineItemElements. These include UUID, SetOfBooksID, SegmentUUID, ProfitCentreUUID, PartnerCompanyUUID, PartnerSegmentUUID, PartnerProfitCentreUUID, FinancialAccountingViewOfSalesAndServiceDocumentItemUUID, AccountingDocumentUUID, AccountingDocumentID, AccountingDocumentItemID, OriginalEntryDocumentContainingObjectReference, OriginalEntryTransactionUUID, OriginalEntryDocumentReference, OriginalEntryDocumentItemReference, OriginalEntryDocumentItemTypeCode, OriginalEntryDocumentPartnerID, CancellationOriginalEntryDocumentContainingBusinessObjectReference, CancellationOriginalEntryTransactionUUID, CancellationOriginalEntryDocumentReference, AccountingNotificationUUID, AccountingNotificationItemGroupItemUUID, GeneralLedgerAccountLineItemUUID, GeneralLedgerAccountLineItemAccountingDocumentItemGroupID, OffsettingSubledgerAccountUUID, OffsettingSubledgerAccountTypeCode, SystemAdministrativeData, ChartOfAccountsCode, ChartOfAccountsItemCode, AccountingBusinessTransactionTypeCode, TypeCode, SubledgerAccountChargeTypeCode, CostRevenueElementCode, AccountingDocumentTypeCode, AccountingDocumentNote, AccountingDocumentItemNote, ProductTaxTypeCode, ProductTaxDueCategoryCode, ProductTaxEventTypeCode, ProductTaxRateTypeCode, ProductTaxCountryCode, WithholdingTaxTypeCode, WithholdingTaxEventTypeCode, WithholdingTaxRateTypeCode, WithholdingTaxCountryCode, PostingDate, OriginalEntryDocumentDate, AccountingBusinessTransactionDate, CurrencyConversionDate, FiscalYearVariantCode. FiscalYearID, AccountingPeriodID, AccountingClosingStepCode, AccountingDocumentItemAccountingGroupID, AccountingDocumentItemProductTaxGroupID, ExpenseClassificationFunctionalAreaCode, GeneralLedgerMovementTypeCode, DebitCreditCode, PriceSpecificationElementPurposeCode, PriceSpecificationElementCategoryCode, CancellationDocumentIndicator, CancelledIndicator, CashDiscountDeductibleIndicator, BusinessTransactionCurrencyAmount, LineItemCurrencyAmount, LocalCurrencyAmount, SetOfBooksCurrencyAmount, HardCurrencyAmount, IndexBasedCurrencyAmount, ValuationQuantity, ValuationQuantityTypeCode, OrderQuantity, and OrderQuantityTypeCode.

The UUID is a GDT of type UUID and is a universally unique identification of the LineItem. The SetOfBooksID is a GDT of type SetOfBooksID and is a unique identification of the SetOfBooks according to whose specifications the LineItem was created. The SegmentUUID is a GDT of type UUID and is a universally unique identification of the Segment to which the value and quantity of the LineItem are allocated. The ProfitCentreUUID is a GDT of type UUID and is a universally unique identification of the ProfitCentre to which the value and quantity of the LineItem are allocated. The PartnerCompanyUUID is a GDT of type UUID and is a universally unique identification of a Company that acts in the business transaction stated in the LineItem as an intra corporate partner. The PartnerSegmentUUID is a GDT of type UUID and is a universally unique identification of a Segment that acts in the business transaction stated in the LineItem as an intra corporate partner. The PartnerProfitCentreUUID is a GDT of type UUID and is a universally unique identification of a ProfitCentre that acts in the business transaction stated in the LineItem as an intra corporate partner. The FinancialAccountingViewOfSalesAndServiceDocumentItemUUID is a GDT of type UUID and is a reference to an item of the business transaction document of Sales on which the posting of the LineItem is based. The AccountingDocumentUUID is a GDT of type UUID and is a universally unique identification of the AccountingDocument that records the entire business transaction in Accounting. The AccountingDocumentID is a GDT of type BusinessTransactionDocumentID and is a unique identification of the AccountingDocument that records the entire business transaction in Accounting. The AccountingDocumentItemID is a GDT of type BusinessTransactionDocumentItemID and is a unique identification of the corresponding AccountingDocumentItem in the AccountingDocument which records the value change according to the criteria of GeneralLedger. The OriginalEntryDocumentContainingObjectReference is a GDT of type ObjectNodeReference with qualifier OriginalEntryDocumentContaining and is a reference to an Object containing the Original Entry Document. The OriginalEntryTransactionUUID is a GDT of type UUID and is universally unique identifier of the transaction during which the Original Entry Document was created or changed. The OriginalEntryDocumentReference is a GDT of type ObjectNodeReference and is a reference to the document, that keeps the original entry of the business transaction. The OriginalEntryDocumentItemReference is a GDT of type ObjectNodeReference and is a reference to an item of the OriginalEntryDocument. The value change recorded in the SalesLedgerAccountLineItem can be verified by that item of the OriginalEntryDocument. The OriginalEntryDocumentItemTypeCode is a GDT of type BusinessTransactionDocumentItemTypeCode and is coded representation of the Item Type of the referred OriginalEntryDocumentItem. In some implementations this element can be used only if the Original Entry Document is a Business Transaction Document. The OriginalEntryDocumentPartnerID is a GDT of type BusinessTransactionDocumentID and is an identification of the Original Entry Document as assigned by the business partner. (For example, the ID of the Supplier Invoice assigned by the Supplier).

In some implementations, this element can be used only if the Original Entry Document is a Business Transaction Document and if the Original Entry Document is identical to the Original Entry Document Containing Object. The CancellationOriginalEntryDocumentContainingBusinessObjectReference is a GDT of type ObjectNodeReference with qualifier CancellationOriginalEntryDocumentContaining and is a reference to the Business Object containing the OriginalEntry-Document that cancelled this LineItem. The Cancellation-OriginalEntryTransactionUUID is a GDT of type UUID and is universally unique identifier of the transaction during which the CancellationOriginalEntryDocument was created or changed. The CancellationOriginalEntryDocumentReference is a GDT of type ObjectNodeReference with qualifier OriginalEntryDocument and is a reference to the OriginalEntryDocument, that cancelled this Item. The AccountingNotificationUUID is a GDT of type UUID and is a universally unique identification of the notification sent to Financial Accounting about the business transaction stated in the LineItem. The AccountingNotificationItem-GroupItemUUID is a GDT of type UUID and is a universally unique identification of the AccountingNotificationItem-GroupItem, which triggered the posting of this LineItem. The GeneralLedgerAccountLineItemUUID is a GDT of type UUID and is a universally unique identification of a LineItem of a GeneralLedgerAccount that records the value change of the SalesLedgerAccountLineItem in the GeneralLedger. The GeneralLedgerAccountLineItemAccountingDocumentItemGroupID is a GDT of type BusinessTransactionDocumentItemGroupID and is a universally unique identification of the group of all Accounting-DocumentItems that are summarized together in a GeneralLedgerAccountLineItem. The LineItem corresponds to exactly one AccountingDocumentItem belonging to the group. The OffsettingSubledgerAccountUUID is a GDT of type UUID and is a universally unique identification of a SubledgerAccount (such as a MaterialLedgerAccount) in whose LineItems the inverse representation of the business transaction is stated. The OffsettingSubledgerAccount-TypeCode is a GDT of type SubledgerAccountTypeCode and is a coded representation of the type of the OffsettingSubledgerAccount to which the SalesLedgerAccountLineItem refers. The following codes are used: 2 MaterialLedgerAccount, 5 AccountsReceivablePayableLedgerAccount, 8 SalesLedgerAccount, 9 OverheadCostLedgerAccount. The SystemAdministrativeData is a GDT of type SystemAdministrativeData and is administrative data stored in a system. This data includes the system user and change time. The ChartOfAccountsCode is a GDT of type ChartOfAccountsCode and is a coded representation of the ChartOfAccounts containing the ChartOfAccountsItem that classifies—for general ledger accounting purposes—the value stated in the LineItem. The ChartOfAccountsItemCode is a GDT of type ChartOfAccountsItemCode and is coded representation of a ChartOfAccountsItem that classifies—for general ledger accounting purposes—the value stated in the LineItem. The AccountingBusinessTransactionTypeCode is a GDT of type AccountingBusinessTransactionTypeCode and is a coded representation of the type of the business transaction stated in the SalesLedgerAccountLineItem. It classifies the business transaction according to Accounting criteria. The TypeCode is a GDT of type SubledgerAccountLineItemTypeCode and is a coded representation of the type of the LineItem. The SubledgerAccountChargeTypeCode is a GDT of type SubledgerAccountChargeTypeCode and is a coded representation of the type of SalesLedgerAccount debit or credit. CostRevenueElementCode is a GDT of type CostRevenueElementCode and is a coded representation of the value component that classifies the value that flowed from the OffsettingLedgerAccount to the SalesLedgerAccount or vice-versa. The AccountingDocumentTypeCode is a GDT of type AccountingDocumentTypeCode and is a coded representation of the type of the AccountingDocument to which the LineItem refers by the AccountingDocumentReference.

The AccountingDocumentNote is a GDT of type SHORT_Note and is natural-language comment that applies the AccountingDocument—referred via the AccountingDocumentReference—as a whole rather than to individual items. AccountingDocumentItemNote is a GDT of type SHORT_Note and is a natural-language comment pertaining to the AccountingDocumentItem to which the LineItem refers by the AccountingDocumentReference. The ProductTaxTypeCode is a GDT of type TaxTypeCode and denotes the product tax type to which the recorded data relates. The ProductTaxDueCategoryCode is a GDT of type DueCategoryCode and denotes the category (receivable or payable) of a tax due to which the recorded data relates. The ProductTaxEventTypeCode is a GDT of type ProductTaxEventTypeCode and denotes the product tax event to which the recorded data relates. The ProductTaxRateTypeCode is a GDT of type TaxRateTypeCode and denotes the type of product tax rate to which the recorded data relates. The ProductTaxCountryCode is a GDT of type CountryCode and represents the country to whose tax authority the product tax data has been or will be reported. The WithholdingTaxTypeCode is a GDT of type TaxTypeCode and denotes the withholding tax type to which the recorded data relates. The WithholdingTaxEventTypeCode is a GDT of type WithholdingTaxEventTypeCode and denotes the witholding tax event to which the recorded data relates. The WithholdingTaxRateTypeCode is a GDT of type TaxRateTypeCode and denotes the type of withholding tax rate to which the recorded data relates. The WithholdingTaxCountryCode is a GDT of type CountryCode and represents the country to whose tax authority the withholding tax data has been or will be reported. The PostingDateis a GDT of type Date with qualifier Posting and represents the date with which the business transaction is effectively recorded in Accounting. Effectively means that period totals and balances in accounting are updated with this date. The OriginalEntryDocumentDate is a GDT of type Date with qualifier OriginalEntry and represents the issue date of the Original Entry Document. The AccountingBusinessTransactionDate is a GDT of type Date with qualifier BusinessTransaction and represents the date at which the business transaction took place applying the criteria of Accounting. The CurrencyConversionDate is a GDT of type Date with qualifier CurrencyConversion and represents the date that is used for the currency translation applied to amounts in the accounting document. The FiscalYearVariantCode is a GDT of type FiscalYearVariantCode and is a coded representation of the FiscalYearVariant according to whose fiscal year definition (begin, end, period definition) the FiscalYearID and the AccountingPeriodID are derived. The FiscalYearID is a GDT of type FiscalYearID and is an identification of the fiscal year in which the LineItem is posted. The AccountingPeriodID is a GDT of type AccountingPeriodID and is an identification of the accounting period in which the LineItem is posted. The AccountingClosingStepCode is a GDT of type Accounting-ClosingStepCode and is a coded representation of the closing step of the accounting document. The AccountingDocument-ItemAccountingGroupID is a GDT of type BusinessTransactionDocumentItemGroupID and is a unique identification of a group of AccountingDocumentItems belonging together applying the criteria of Accounting. It is used to indicate the items of an AccountingDocument that belong together e.g. in partial zero-balance checking within the Accounting Document. An example is an activity confirmation from production that contains items for actual working times and also for materials used for the production process, The created AccountingDocumentItems are grouped together according to the material movement or working time confirmation they belong to. The AccountingDocumentItemProductTaxGroupID is a GDT of type BusinessTransactionDocumentItemGroupID and is a unique Identification of a group of AccountingDocumentItems that belong together because they are tax relevant and have the same taxation and related tax items. The ExpenseClassificationFunctionalAreaCode is a GDT of type ExpenseClassificationFunctionalAreaCode and is a coded representation of the functional area to which the value and quantity of the LineItem are allocated. The GeneralLedgerMovementTypeCode is a GDT of type GeneralLedgerMovementTypeCode and is a coded representation of the type of movement with which the value change is recorded for GeneralLedger purposes in the GeneralLedgerAccount. The DebitCreditCode is a GDT of type DebitCreditCode and is a coded representation of debit or credit. It specifies whether the line item is assigned to the debit or credit side of the GeneralLedger account. The PriceSpecificationElementPurposeCode is a GDT of type PriceSpecificationElementPurposeCode. PriceSpecificationElementPurposeCode is the coded representation of the purpose of a PriceSpecificationElement. A PriceSpecificationElement is the specification of a price, discount, surcharge, or tax. The PriceSpecificationElementCategoryCode is a GDT of type PriceSpecificationElementCategoryCode. PriceSpecificationElementCategoryCode is the coded representation of the category of a PriceSpecificationElement. The CancellationDocumentIndicator is a GDT of type Indicator with Qualifier CancellationDocument and indicates whether the AccountingDocument to which the LineItem refers by the AccountingDocumentReference refers to a cancellation document. The CancelledIndicator is a GDT of type Indicator with qualifier Cancelled and indicates if the line item has been cancelled. The CashDiscountDeductibleIndicator is a GDT of type Indicator with qualifier CashDiscountDeductible and indicates whether a cash discount can be deducted from the LineItem. In some implementations, this information is needed for backdated sales tax calculation when a cash discount is applied in the payment for an outgoing invoice. The BusinessTransactionCurrencyAmount is a GDT of type Amount with qualifier BusinessTransactionCurrency and represents the value of the LineItem in transaction currency. The transaction currency is the currency agreed on by two business partners for their business relationship. The LineItemCurrencyAmount is a GDT of type Amount with qualifier LineItemCurrency and represents the value of the LineItem in LineItem currency. The LocalCurrencyAmount is a GDT of type Amount with qualifier LocalCurrency and represents the value of the LineItem in the local currency of the Company carrying the account. The local currency is the currency in which the local books are kept. The SetOfBooksCurrencyAmount is a GDT of type Amount and represents the value of the LineItem in the currency selected for the set of books. The HardCurrencyAmount is a GDT of type Amount and represents the value of the LineItem, in the hard currency of the country of the Company carrying the account. The hard currency is a stable, country-specific currency that is used in high-inflation countries. The IndexBasedCurrencyAmount is a GDT of type amount and represents the value of the LineItem in the index-based currency of the country of the Company carrying the account. The index-based currency is a fictitious, country-specific currency that is used in high-inflation countries as a comparison currency for reporting. The ValuationQuantity is a GDT of type Quantity and represents the quantity change of the business transaction stated in the line item in the valuation unit of measurement of the material, service product, or resource. The ValuationQuantityTypeCode is a GDT of type QuantityTypeCode and is a coded representation of the type of the valuation quantity. The OrderQuantity is a GDT of type Quantity and represents the quantity change of the business transaction stated in the line item in the order unit of measurement of the business transaction document of Sales. The OrderQuantityTypeCode is a GDT of type QuantityTypeCode and is a coded representation of the type of the order quantity.

FinancialAccountingViewOfSalesAndServiceDocumentItem has a cardinality relationship of (c:cn). A LineItem can reference an item of a business transaction document of Sales. SetOfBooks has a cardinality relationship of (1:cn). In some implementations, a LineItem always relates to a SetOfBooks to which the line item is to be assigned. Partner Company has a cardinality relationship of (c:cn). A LineItem can relate to a partner company to which the line item is to be assigned. Segment has a cardinality relationship of (c:cn). Segment denotes the segment to which the record relates. PartnerSegment has a cardinality relationship of (c:cn). A LineItem can relate to a partner segment to which the line item is to be assigned. ProfitCentre has a cardinality relationship of (c:cn). ProfitCentre denotes the profit center to which the record relates. PartnerProfitCentre has a cardinality relationship of (c:cn). A LineItem can relate to a partner profit center to which the line item is to be assigned.

In some implementations a maximum of one of the following relationships can exist. Offsetting SalesLedgerAccount has a cardinality relationship of (c:cn). SalesLedgerAccount denotes the SalesLedgerAccount that occurs in the LineItem in the Offsetting LedgerAccount role. Offsetting MaterialLedgerAccount has a cardinality relationship of (c:cn). MaterialLedgerAccount denotes the MaterialLedgerAccount that occurs in the LineItem in the Offsetting LedgerAccount role. Offsetting OverheadCostLedgerAccount has a cardinality relationship of (c:cn). OverheadCostLedgerAccount denotes the OverheadCostLedgerAccount that occurs in the LineItem in the Offsetting LedgerAccount role. Offsetting AccountsReceivablePayableLedgerAccount has a cardinality relationship of (c:cn). AccountsReceivablePayableLedgerAccount denotes the AccountsReceivablePayableLedgerAccount that occurs in the LineItem in the Offsetting LedgerAccount role.

OffsettingSubledgerAccount denotes the LedgerAccount (such as MaterialLedgerAccount, OverheadCostLedgerAccount or AccountsReceivablePayableLedgerAccount) that contains the inverse representation of the inventory change or expense. Business transactions are value flows that in many cases are represented as an issue for a given LedgerAccount and as a receipt for another LedgerAccount (such as an issue from material inventory and a receipt into work-in-process inventory, or a resource receipt in the SalesLedgerAccount and a resource consumption in the OverheadCostLedgerAccount), or vice-versa. The association between these two representations is established by the OffsettingLedgerAccount.

In some implementations, a maximum of one of the following relationships can exist. AccountingEntry has a cardinality relationship of (c:cn). A LineItem may originate as a result of a business transaction recorded in an AccountingEntry. SalesLedgerAccountAccrualsRun has a cardinality relationship of (c:cn) and is a reference to the SalesLedgerAccountAccrualsRun that contains the Original Entry Document. SalesLedgerAccountAccrualsRunLogSection has a cardinality relationship of (c:cn) and is a reference to a LogSection that serves as Original Entry Document for a business transaction in a SalesLedgerAccountAccrualsRun. SalesLedgerAccountAccrualsRunLogSectionAccrualsCalculatedItem has a cardinality relationship of (c:cn) and is an AccrualsCalculatedItem in a LogSection of an SalesLedgerAccountAccrualsRun serving as Original Entry Document Item by which the value change recorded in the LineItem can be verified. SalesLedgerAccountOverheadCostCalculationRun has a cardinality relationship of (c:cn) and is a reference to the SalesLedgerAccountOverheadCostCalculationRun that contains the Original Entry Document. SalesLedgerAccountOverheadCostCalculationRunLogSection has a cardinality relationship of (c:cn) and is a reference to a LogSection that serves as Original Entry Document for a business transaction in a SalesLedgerAccountOverheadCostCalculationRun. SalesLedgerAccountOverheadCostCalculationRunLogSectionOverheadCostCalculationCalculatedItem has a cardinality relationship of (c:cn) and is an OverheadCostCalculationCalculatedItem in a LogSection of an SalesLedgerAccountOverheadCostCalculationRun serving as Original Entry Document Item by which the value change recorded in the LineItem can be verified.

The following Inbound aggregation relationships (cross-DU) may exist. CustomerInvoiceItem has a cardinality relationship of (c:cn). A line item may originate as a result of a business transaction recorded in a CustomerInvoiceItem. SiteLogisticsConfirmationInventoryChangeItem has a cardinality relationship of (c:cn). A LineItem may originate as a result of a business transaction recorded in a SiteLogisticsConfirmationInventoryChangeItem. ServiceConfirmationItem has a cardinality relationship of (c:cn), A LineItem may originate as a result of a business transaction recorded in a ServiceConfirmationItem. ServiceRequestItem has a cardinality relationship of (c:cn). A LineItem may originate as a result of a business transaction recorded in a ServiceRequestItem.

In some implementations, one and only one of the above relationships to an Original Entry Document and to an Original EntryDocument Item may exist. In these implementations, if the Original Entry Document is not identical to a Business Object but contained in it then the corresponding relationship to this Business Object may exist, too.

The following Inbound Association Relationships may exist. AccountingNotification has a cardinality relationship of (c:cn). A LineItem may originate as a result of a business transaction that was represented in an AccountingNotification. AccountingNotificationItemGroupItem has a cardinality relationship of (c:cn). A LineItem may originate as a result of a business transaction that was represented in an AccountingNotification. CreationIdentity has a cardinality relationship of (1:cn) and represents the system user Identity who created the LineItem. LastChangeIdentity has a cardinality relationship of (c:cn) and represents the system user identity who last changed the LineItem.

The following Association Relationships for Navigation may exist. AccountingDocument has a cardinality relationship of (1:cn). A LineItem relates to the accounting document to which the item is assigned. GeneralLedgerAccountLineItem has a cardinality relationship of (1:cn). A LineItem relates to the line item of GeneralLedgerAccount to which the item is assigned.

Figure 102:
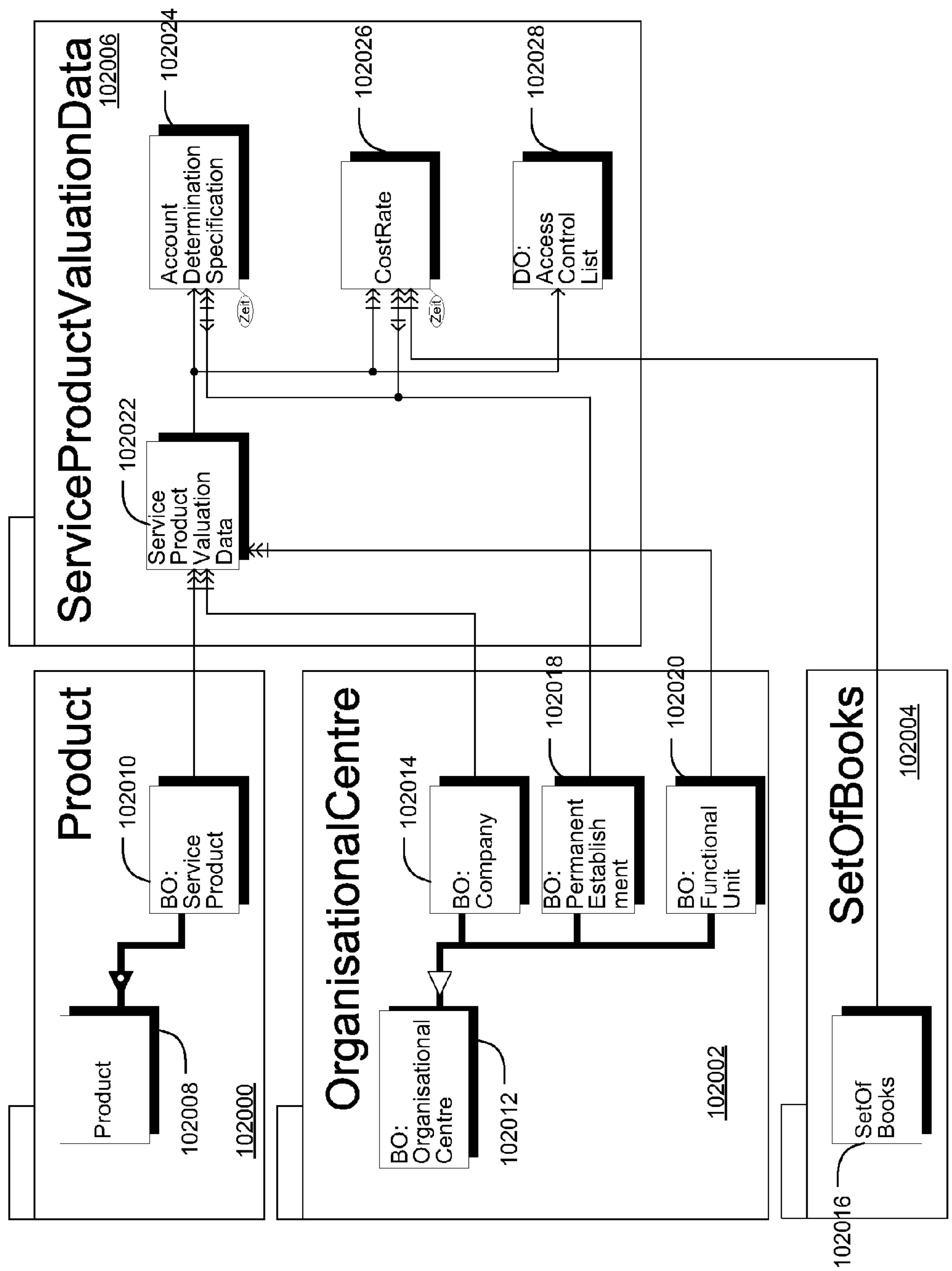
FIG. 102 shows an exemplary ServiceProductValuationData object model.

FIG. 102 illustrates one example of an ServiceProductValuationData business object model 102006. Specifically, this figure depicts interactions among various hierarchical components of the ServiceProductValuationData, as well as external components that interact with the ServiceProductValuationData (shown here as 102000 through 102004 and 102008 through 102020).

Data that references a service product or service product group for the valuation of business transactions and for cost estimates and cost accounting. In particular, it may contain the internal cost rates for a service product or service product group. These attributes and cost rates can be based on organizational units and additional accounting concepts (such as the set of books or period). Release 1 can include data with reference to a service product. A service product group may contain service products that are valuated in the same way.

The ServiceProductValuationData business object is part of the Financial Accounting Master Data Management process component. ServiceProductValuationData can include information on account determination and cost rates for valuating business transactions in a company, and for cost estimates ServiceProductValuationData is represented by the ServiceProductValuationData node 102022. The ServiceProductValuationData business object may be created or changed with a user interface.

ServiceProductValuationData is Data that references a service product or service product group for the valuation of business transactions and for cost estimates and cost accounting. The elements located at the ServiceProductValuationData node can be defined by the ServiceProductValuationDataElements data type. In certain implementations, these elements include: UUID, ServiceProductUUID, CompanyUUID, SystemAdministrativeData, CostRateDefaultBaseQuantity, CostRateDefaultBaseQuantityTypeCode and CostManagementFunctionalUnitUUID.

The UUID is a universal identifier, which can be unique, of an ServiceProductValuationData. UUID may be based on GDT UUID. The ServiceProductUUID is a universal identifier, which can be unique, of the service product to which ServiceProductValuationData refers. ServiceProductUUID may be based on GDT UUID. The CompanyUUID is a universal identifier, which can be unique, of the company to which ServiceProductValuationData refers. CompanyUUID may be based on GDT UUID. The SystemAdministrativeData indicates when and by whom the Resource Valuation Data was created or changed. SystemAdministrativeData may be based on GDT SystemAdministrativeData). The CostRateDefaultBaseQuantity is the default value for the base quantity of new cost rates, and is optional. CostRateDefaultBaseQuantity may be based on GDT Quantity. The unit of measure may be the same as the valuation unit of measure of the service product. The CostRateDefaultBaseQuantityTypeCode is a coded representation of the type of the cost rate default base quantity, and is optional. CostRateDefaultBaseQuantityTypeCode may be based on GDT QuantityTypeCode.

The quantity type code may be the same as the quantity type code for the valuation unit of the service product. The element may be filled if the element CostRateDefaultBaseQuantity is filled.

The CostManagementFunctionalUnitUUID is a universal identifier, which can be unique, of a Functional Unit that is responsible for processing the Service Product Valuation Data, and is optional. CostManagementFunctionalUnitUUID may be based on GDT UUID. The referenced Functional Unit may be responsible for the Organisational Function 'Cost Management', for example, the OrganisationalFunctionCode on one of the FunctionalUnitAttributes nodes of the FunctionalUnit may have the value '24' (CostManagement).

There may be a number of composition relationships to subordinate nodes including the following. AccountDeterminationSpecification 102024 may have a cardinality of 1:1. Although there is a 1:1 relationship between the root node and this node, in some implementations, the AccountDeterminationSpecification is modelled as a separate node since further dependencies and account determination attributes are expected. CostRate 102026 may have a cardinality of 1:cn. AccessControlList 102028 may have a cardinality of 1:1.

There may be a number of Inbound aggregation relationships including: 1) From business object (or node) ServiceProduct as follows. ServiceProduct may have a cardinality of 1:cn and is the service product to which ServiceProductValuationData refers. 2) From business object (or node) Company as follows. Company may have a cardinality of 1:cn and is the company to which ServiceProductValuationData applies.

There may be a number of Inbound Association Relationships including:

1) From business object Identity/node Identity as follows. CreationIdentity may have a cardinality of 1:cn and is the system user Identity who created or changed the Service Product Valuation Data. LastChangeIdentity may have a cardinality of c:cn and is the system user Identity who last changed the Service Product Valuation Data.

There may be a number of Inbound Association Relationships from business object (or node) FunctionalUnit including the following. CostManagementFunctionalUnit may have a cardinality of c:cn and is the Functional Unit that is responsible for processing the Service Product Valuation Data.

QueryByServiceProduct outputs a list of all ServiceProductValuationData for a particular service product or that exist within a Company. The query elements are defined by the data type: ServiceProductValuationDataServiceProductQueryElements. These elements can include: ServiceProductUUID, ServiceProductIdentificationProductID, ServiceProductProductCategoryAssignmentProductCategoryUUID, ServiceProductProductCategoryAssignmentProductCategoryID, CompanyUUID, CompanyID. ServiceProductUUID is of GDT UUID. ServiceProductIdentificationProductID is of GDT type ProductID and is an identification of the service product (the ProductID element in the Identification node in the ServiceProduct business object, which can be reached through the ServiceProduct association): ServiceProductProductCategoryAssignmentProductCategoryUUID is of GDT type UUID and is a universally unique identification of the category of the service product to which ServiceProductValuationData refers (the ProductCategoryUUID element in the ProductCategoryAssignment node in the ServiceProduct business object, which can be reached through the ServiceProduct association). ServiceProductProductCategoryAssignmentProductCategoryID is of GDT type ProductCategoryID and is an identification of the category of the service product to which ServiceProductValuationData refers (the ProductCategoryID element in the ProductCategoryAssignment node in the ServiceProduct business object, which can be reached through the ServiceProduct association). CompanyUUID is of GDT type UUID. CompanyID is of GDT type OrganisationalCentreID and is an identification of the company to which the ServiceProductValuationData refers (the ID element in the Company business object that can be reached through the Company association). In some implementations, at least one of the query elements must be transferred. Only one element of each UUID/ID pair of elements may be transferred.

AccountDeterminationSpecification is a group of control parameters for the determination of accounts in accounting that reflect the consumption or production of the service product. The elements located at the AccountDeterminationSpecification node can be defined by the data type: ServiceProductValuationDataAccountDeterminationSpecificationElements. In certain implementations, these elements include: AccountDeterminationServiceProductValuationDataGroupCode.

The AccountDeterminationServiceProductValuationDataGroupCode is a coded representation of a group of Service Product Valuation Data from the viewpoint of identical determination of accounts in accounting. AccountDeterminationServiceProductValuationDataGroupCode may be based on GDT AccountDeterminationServiceProductValuationDataGroupCode.

QueryByElements outputs a list of all AccountDeterminationSpecification nodes for the specified selection parameters. The query elements are defined by the data type: ServiceProductValuationDataAccountDeterminationSpecificationElementsQueryElements. These elements can include: AccountDeterminationServiceProductValuationDataGroupCode.

AccountDeterminationServiceProductValuationDataGroupCode is of GDT type AccountDeterminationServiceProductValuationDataGroupCode.

CostRate is the last cost rate entered for a service product for a time period and set of books, which can be used to valuate business transactions involving the production of a service product within a company.

A cost rate is a price that may be used to valuate the provision of a certain quantity of a service product and that is calculated or (manually) planned with the intention of allocating a fair share of the costs incurred in providing the resource which produces the service product (such as salaries and machine depreciation) to the users of the service product (such as production lots or projects).

The character of a cost rate may be determined by the price type (such as manually entered cost rate or calculated cost rate). The price type may influence the system behavior at various points. The elements located at the CostRate node are defined by the data type: ServiceProductValuationDataCostRateElements. In certain implementations, these elements include: PermanentEstablishmentUUID, SetOfBooksID, ValidityDatePeriod, PriceTypeCode, SystemAdministrativeData, LocalCurrencyValuationPrice, SetOfBooksCurrencyValuationPrice, HardCurrencyValuationPrice and IndexBasedCurrencyValuationPrice. The PermanentEstablishmentUUID is a universal identifier, which can be unique, of the permanent establishment to which ServiceProductValuationData the cost rate applies, and is optional. PermanentEstablishmentUUID may be based on GDT UUID. The SetOfBooksID is the identification of the set of books to which the cost rate applies. SetOfBooksID may be based on GDT SetOfBooksID.

The ValidityDatePeriod is the validity period of the cost rate. ValidityDatePeriod may be based on GDT CLOSED_DatePeriod with qualifier Validity. constraint: StartDate and EndDate. The PriceTypeCode is the coded representation of the price type of the cost rate. PriceTypeCode may be based on GDT PriceTypeCode. The SystemAdministrativeData Indicates when and by whom the cost rate was created or changed. SystemAdministrativeData may be based on GDT SystemAdministrativeData. The LocalCurrencyValuationPrice is the cost rate in the local currency of the company keeping the books. The local currency is the national currency in which the local books are kept. LocalCurrencyValuationPrice may be based on GDT Price Qualifier: Valuation. It may be possible to convert the unit of measure of the BaseQuantity element into the base unit of measure of the service product. The SetOfBooksCurrencyValuationPrice is the cost rate in the currency chosen as the overall currency in a set of books, and is optional. SetOfBooksCurrencyValuationPrice may be based on GDT Price Qualifier: Valuation. It may be possible to convert the unit of measure of the BaseQuantity element into the base unit of measure of the service product. The HardCurrencyValuationPrice is the cost rate in the hard currency of the country of the company keeping the books. The hard currency is a stable, country-specific currency that is used in high-inflation countries, and is optional. HardCurrencyValuationPrice may be based on GDT Price with qualifier valuation. It may be possible to convert the unit of measure of the BaseQuantity element into the base unit of measure of the service product. The IndexBasedCurrencyValuationPrice is the cost rate in the index currency of the country of the company keeping the books. The index-based currency is a fictitious, country-specific currency that is used in high-inflation countries as a comparison currency for reporting, and is optional. IndexBasedCurrencyValuationPrice may be based on GDT Price Qualifier Valuation.

Integrity condition: It may be possible to convert the unit of measure of the BaseQuantity element into the base unit of measure of the service product.

There may be a number of Inbound aggregation relationships including: 1) From business object (or node) SetOfBooks as follows. SetOfBooks may have a cardinality of 1:cn and denotes the Set Of Books to which the cost rate relates. 2) From business object (or node) PermanentEstablishment as follows. PermanentEstablishment may have a cardinality of c:cn and is a permanent establishment to which the cost rate applies.

There may be a number of Inbound Association Relationships from business object (or node) Identity including the following. CreationIdentity may have a cardinality of 1:cn and is the system user Identity who created or changed the Cost Rate. LastChangeIdentity may have a cardinality of c:cn and is the system user Identity who last changed the Cost Rate.

QueryByDate outputs a list of all cost rates that are valid on a given date. The list can be restricted through the additional query elements. The query elements are defined by the data type: ServiceProductValuationDataCostRateDateQueryElements. These elements can include: Date, ServiceProductValuationDataUUID, ServiceProductValuationDataServiceProductUUID, ServiceProductValuationDataServiceProductIdentificationProductID, ServiceProductValuationDataCompanyUUID, ServiceProductValuationDataCompanyID, PermanentEstablishmentUUID, PermanentEstablishmentID, PriceTypeCode, SetOfBooksID. Date is of GDt type Date and is a date on which a cost rate is valid (that is, the date is within the validity period [ValidityDatePeriod] of the cost rate). ServiceProductValuationDataUUID is of GDT type UUID and is a universally unique identification of the ServiceProductValuationData (the UUID element in the root node). ServiceProductValuationDataServiceProductUUID is of GDT type UUID and is a universally unique identification of the service product (the ServiceProductUUID element in the root node). ServiceProductValuationDataServiceProductIdentificationProductID is of GDT type ProductID and is an identification of the service product (the ProductID element at the Identification node in the ServiceProduct business object, which can be reached through the ServiceProduct association at the root node). ServiceProductValuationDataCompanyUUID is of GDT type UUID and is a universally unique identification of the company to which theServiceProductValuationData cost rate applies (the CompanyUUID element in the root node). ServiceProductValuationDataCompanyID is of GDT type OrganisationalCentreID and is an identification of the company to which theServiceProductValuationData cost rate applies (the ID element in the Company business object that can be reached through the Company association at the root node). PermanentEstablishmentUUID is of GDT type UUID and is a universally unique identification of the permanent establishment to which theServiceProductValuationData cost rate applies (the UUID element in the PermanentEstablishment business object that can be reached through the PermanentEstablishment association). PermanentEstablishmentID is of GDT type OrganisationalCentreID and is an identification of the permanent establishment to which theServiceProductValuationData cost rate applies (the ID element in the PermanentEstablishment business object that can be reached through the PermanentEstablishment association). PriceTypeCode is of GDT type PriceTypeCode. SetOfBooksID is of GDT type SetOfBooksID. In some implementations, at least one of the query elements referring to the root node must be transferred. Only one element of each UUID/ID pair of elements may be transferred.

QueryByDateInterval outputs a list of all cost rates that are valid at a date within the given interval of dates. The list can be restricted through the additional query elements. The query elements are defined by the data type: ServiceProductValuationDataCostRateDateIntervalQueryElements. These elements may include: StartDate, EndDate, ServiceProductValuationDataUUID, ServiceProductValuationDataServiceProductUUID, ServiceProductValuationDataServiceProductIdentificationProductID, ServiceProductValuationDataCompanyUUID, ServiceProductValuationDataCompanyID, PermanentEstablishmentUUID, PermanentEstablishmentID, PriceTypeCode, SetOfBooksID. StartDate is of GDT type Date and is a lower limit of the interval of dates within which the cost rates are valid (that is, the date is within the validity period [ValidityDatePeriod] of the cost rate). EndDate is of GDT type Date and is an upper limit of the interval of dates within which the cost rates are valid (that is, the date is within the validity period [ValidityDatePeriod] of the cost rate). If the element EndDate is not supplied all cost rates which are valid at the date given by the element StartDate or at any date from there on are listed. ServiceProductValuationDataUUID is of GDT type UUID and is a universally unique identification of the ServiceProductValuationData (the UUID element in the root node). ServiceProductValuationDataServiceProductUUID is of GDT type UUID and is a universally unique identification of the service product (the ServiceProductUUID element in the root node). ServiceProductValuationDataServiceProductIdentificationProductID is of GDT type ProductID and is an identification of the service product (the ProductID element at the Identification node in the ServiceProduct business object, which can be reached through the ServiceProduct association at the root node). ServiceProductValuationDataCompanyUUID is of GDT type UUID and is a universally unique identification of the company to which theServiceProductValuationData cost rate applies (the CompanyUUID element in the root node). ServiceProductValuationDataCompanyID is of GDT type OrganisationalCentreID and is identification of the company to which theServiceProductValuationData cost rate applies (the ID element in the Company business object that can be reached through the Company association at the root node). PermanentEstablishmentUUID is of GDT type UUID and is a universally unique identification of the permanent establishment to which theServiceProductValuationData cost rate applies (the UUID element in the PermanentEstablishment business object that can be reached through the PermanentEstablishment association). PermanentEstablishmentID is of GDT type OrganisationalCentreID and is an identification of the permanent establishment to which theServiceProductValuationData cost rate applies (the ID element in the PermanentEstablishment business object that can be reached through the PermanentEstablishment association). PriceTypeCode is of GDT type PriceTypeCode. SetOfBooksID is of GTD type SetOfBooksID. In some implementations, at least one of the query elements referring to the root node must be transferred. Only one element of each UUID/ID pair of elements may be transferred.

The AccessControlList is a list of access groups that have access to a ServiceProductValuationData.

Business Object TaxLedgerAccount

Figures 1, 103:
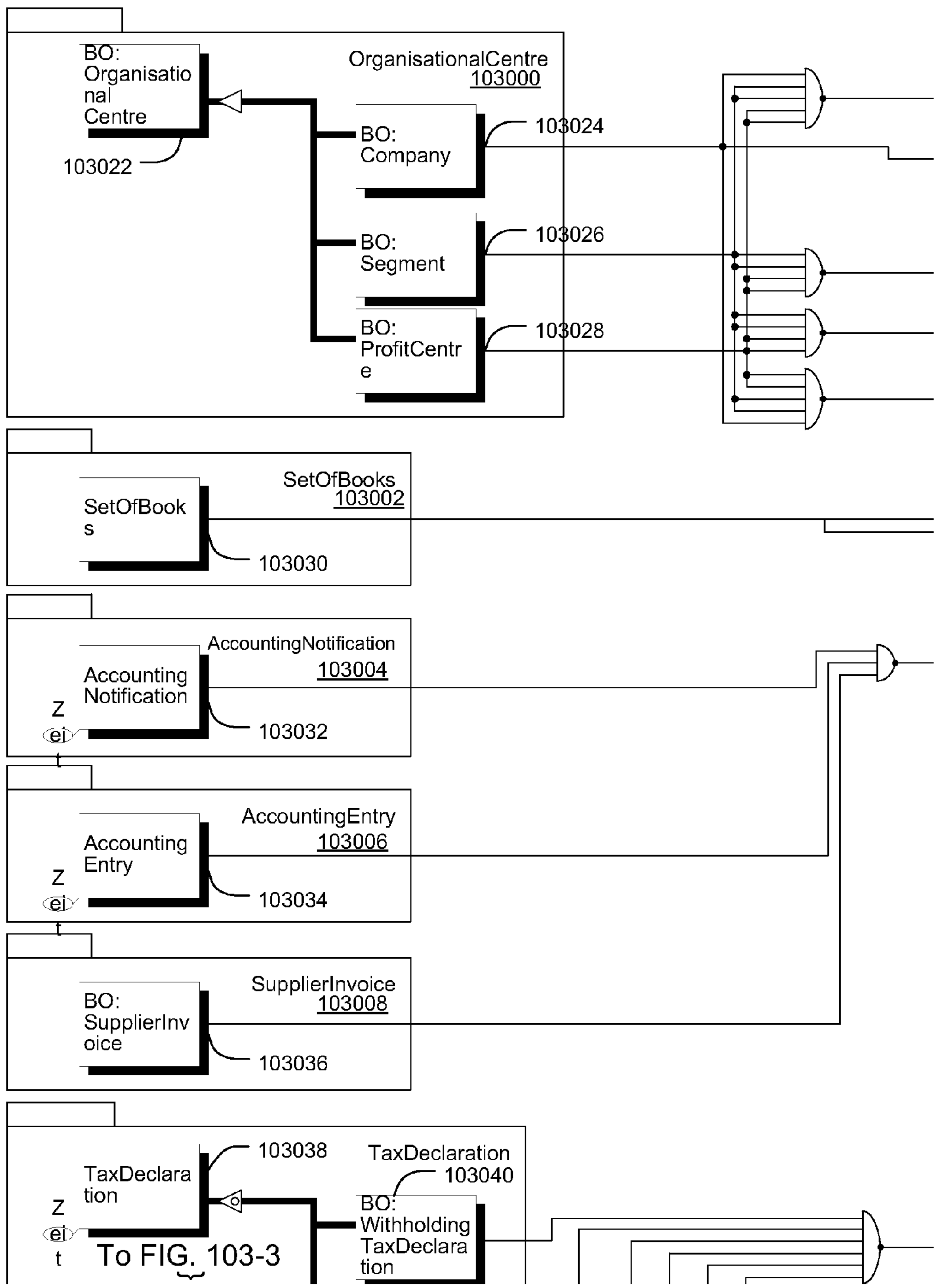
Figures 2, 103:
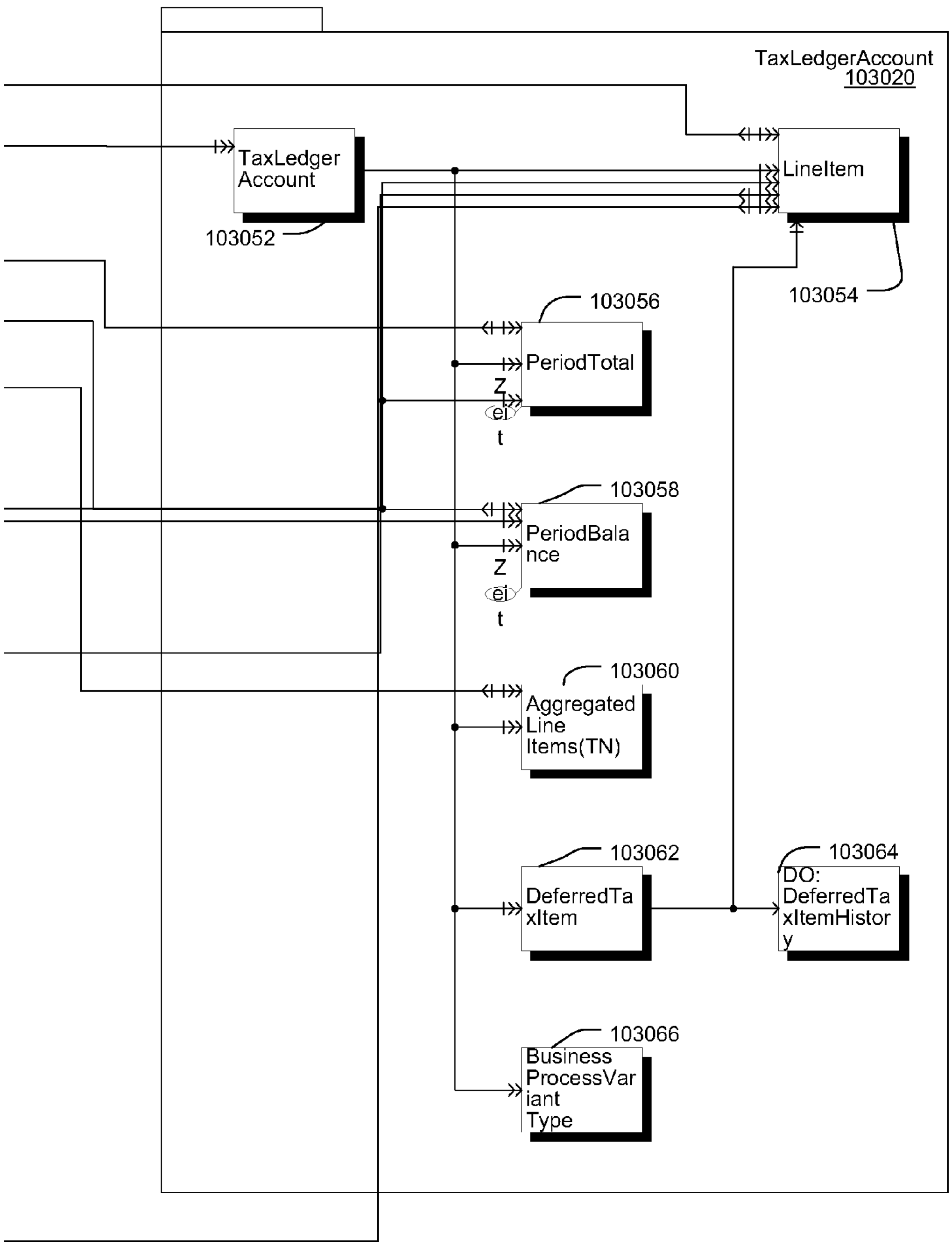

FIGS. 103-1 through 103-3 illustrate an example TaxLedgerAccount business object model 103020. Specifically, this model depicts interactions among various hierarchical components of the TaxLedgerAccount, as well as external components that interact with the TaxLedgerAccount (shown here as 103000 through 103018 and 103022 through 103050).

The record for a company based on the principle of double-entry bookkeeping that reflects the effects of business transactions on a restricted part of the valuated balance of payables and receivables from sales tax and excise duty with regard to the tax authorities. Serves as a structuring element for collecting and evaluating postings in the tax ledger in Accounting. Contains values that concern a company and where applicable various tax characteristics such as tax authority, tax type, and tax rate. Subsequently a generic approach for referencing Operational Documents is used An operational document is a document about a business transaction that takes place in an operational business area outside Financial Accounting. From the Financial Accounting point of view operational documents can be assigned to the categories "Contract", "Order" and "Confirmation". The Notification of an Operational Document to Accounting can result in postings (at least all confirmations are posted) and lead to the creation of LineItems. The reference to the operational document in LineItems has a specific semantic and is called Original Entry Document (German: Prima Nota) reference. An Original Entry Document is a document that is necessary for auditing purposes and verifies that the value stated in the LineItem of a ledger account has been booked on the base of a real business transaction. Subsequently also a generic approach for referencing Original Entry Documents is used. An Original Entry Document may be contained in another Object, the Original Entry DocumentContainingObject. Typically, such constellations are: FinancialAuditTrailDocumentation contained in a Host object like DuePayment, DueClearing, Dunning, and PaymentAllocation from Operative Financials, LogSection contained in all AccountingAdjustmentRun-MDROs (e.g. InventoryPriceChangeRun, GeneralLedgerAccountBalanceDistributionRun, FixedAssetDepreciationRun, WorkInProcessClearingRun), SettlementResultPostingTransaction contained in an ExpenseReport, and PeriodItem contained in an Employee The business object TaxLedgerAccount is part of the process component Accounting Processing. A TaxLedgerAccount may contain the following components: PeriodTotal 103056: The component PeriodTotal stores period-specific information for a TaxLedgerAccount about the value of changes to payables and receivables from sales tax and excise duty, LineItem 103054: Line Item that serves as a record for an TaxLedgerAccount containing information for a set of books about the value of the change in stock resulting from an individual business transaction, PeriodBalance 103058: The component PeriodBalance stores for a TaxLedgerAccount and for each set of books period-specific information about the value of payables and receivables from sales tax and excise duty, DeferredTaxItem 103062: Is the representation of deferred tax in Accounting, and AggregatedLineItems 103060: The AggregatedLineItems is a aggregation of TaxLedgerAccountLineItems by the coding block elements.

The TaxLedgerAccount is represented by the root node TaxLedgerAccount 103052. When a business transaction causing a quantity/value change to a TaxLedgerAccount is posted, a set of rules determines which GeneralLedgerAccounts are concerned. Posting the business transaction changes the quantity and/or value on the GeneralLedgerAccounts selected in this way by the same amount.

Service Interfaces

The business object TaxLedgerAccount is not involved in any process integration models.

Business Object TaxLedgerAccount Node Structure

TaxLedgerAccount is the root node of the Business Object TaxLedgerAccount, and is the record for a company based on the principle of double-entry bookkeeping that reflects the effects of business transactions on a restricted part of the valuated balance of payables and receivables from sales tax and excise duty with regard to the tax authorities. Serves as a structuring element for collecting and evaluating postings in the tax ledger in Accounting. Contains values that concern a company and where applicable various tax characteristics (such as tax authority, tax type, and tax rate. Subsequently the term "offsetting" is used frequently. In particular, an OffsettingSubledgerAccount is a SubledgerAccount that contains—with reference to the same Accounting Document—the inverse representation of the business transaction stated in a SubledgerAccountLineItem. The inverse representation is required by the double entry bookkeeping principle. The compliance with this principle leads to a zero balance of the AccountingDocument that completely represents the Business transaction. An example for offsetting is: an InventoryChangeItem of a ProductionLotConfirmation has to be represented as a debit LineItem of a ProductionLedgerAccount and as an inverse credit LineItem of a MaterialLedgerAccount. The elements directly located on the TaxLedgerAccount node are defined by the GDT type TaxLedgerAccountElements. In certain implementations, these elements include: UUID, CompanyUUID, CountryCode, RegionCode, TaxTypeCode, TaxDueCategoryCode, ProductTaxEventTypeCode, WithholdingTaxEventTypeCode, TaxRateTypeCode, GeneralLedgerFunctionalUnitUUID, and Key.

UUID is a universal identification, which can be unique, of the TaxLedgerAccount. The UUID may be based on GDT UUID. CompanyUUID is a universal identification, which can be unique, of the Company for which the The TaxLedgerAccount is carried. The CompanyUUID may be based on UUID. CountryCode can specify the tax reporting country to which the recorded data relates. The CountryCode may be based on CountryCode. RegionCode can specify the tax-reporting region to which the recorded data relates, and is optional. The RegionCode may be based on RegionCode.

TaxTypeCode can specify the tax type to which the recorded data relates. The TaxTypeCode may be based on TaxTypeCode. TaxDueCategoryCode can specify the category (receivable or payable) of a tax due to which the recorded data relates. The TaxDueCategoryCode may be based on DueCategoryCode. ProductTaxEventTypeCode can specify the product tax event to which the recorded data relates, and is optional. The ProductTaxEventTypeCode may be based on ProductTaxEventTypeCode. WithholdingTaxEventTypeCode can specify the withholding tax event to which the recorded data relates, and is optional. TheWithholdingTaxEventTypeCode may be based on Withholding- TaxEventTypeCode. TaxRateTypeCode can specify the type of tax rate to which the recorded data relates. The TaxRateTypeCode may be base don TaxRateTypeCode.

GeneralLedgerFunctionalUnitUUID is a universal identifier, which can be unique, of the FunctionalUnit working on the TaxLedgerAccount. In some implementations, the FunctionalUnit referenced has to be able to execute the organizational function GeneralLedger Accounting (i.e., the element OrganisationalFunctionCode in one of the instances of the node FunctionalUnitAttributes in the FunctionalUnit references may have the value '19' GeneralLedger), and is optional. The GeneralLedgerAccounting may be based on UUID.

Key is the structured business key of the TaxLedgerAccount. It consists of the elements CompanyUUID, CountryCode, RegionCode, TaxTypeCode, TaxDueCategoryCode, ProductTaxEventTypeCode, WithholdingTaxEventTypeCode and TaxRateTypeCode. The Key may be based on IDT: TaxLedgerAccountKey.

The following composition relationships to subordinate nodes exist: PeriodBalance has a cardinality relationship of 1:cn, PeriodTotal has a cardinality relationship of 1:cn, LineItem has a cardinality relationship of 1:cn, DeferredTaxItem has a cardinality relationship of 1:cn, Aggregated Line Items has a cardinality relationship of 1:cn, and AccessControlList has a cardinality relationship of 1:1.

Inbound aggregation relationships from business object Company/node Company include:

Company has a cardinality relationship of 1:cn, may denote the Company for which the account is carried. FunctionalUnit has a cardinality relationship of c:cn, may specify the Functional Unit which is working on the TaxLedgerAccount.

The QueryByElements query delivers a list of TaxLedgerAccounts, whereby all elements of the root node can be used for the search. The query elements are defined by the data type TaxLedgerAccountElementsQueryElements. These elements are: CompanyUUID, CompanyID, CountryCode, RegionCode, TaxTypeCode, TaxDueCategoryCode, ProductTaxEventTypeCode, WithholdingTaxEventTypeCode, TaxRateTypeCode.

CompanyUUID is optional and is of GDT type UUID), CompanyID is optional and is of GDT type OrganisationalCentreID, CountryCode is optional and is of GDT type CountryCode, RegionCode is optional and is of GDT type RegionCode, TaxTypeCode is optional and is of GDT type TaxTypeCode, TaxDueCategoryCode is optional and is of GDT type DueCategoryCode, ProductTaxEventTypeCode is optional and is of GDT type ProductTaxEventTypeCode, WithholdingTaxEventTypeCode is optional and is of GDT type WithholdingTaxEventTypeCode, TaxRateTypeCode is optional and is of GDT type TaxRateTypeCode.

DO: AccessControlList

The AccessControlList is a list of access groups that have access to an AccountingEntry.

PeriodBalance

A PeriodBalance is a period-specific record for a set of books for a TaxLedgerAccount about the value of the balance. The elements located directly at the PeriodBalance node are defined by the type TaxLedgerAccountPeriodBalancelElements. In certain implementations, these elements include: SetOfBookID, SegmentUUID, ProfitCentreUUID, ChartOfAccountsCode, ChartOfAccountsItemCode, FiscalYearVariantCode, FiscalYearID, AccountingPeriodID, LineItemCurrencyAmount, LocalCurrencyAmount, SetOfBooksCurrencyAmount, HardCurrencyAmount, and IndexBasedCurrencyAmount.

SetOfBookID is a universal identification, which can be unique, of the SetOfBooks according to whose specifications the PeriodBalance was created and updated. The SetOfBookID may be based on SetOfBooksID.

SegmentUUID is a universal identification, which can be unique, of the Segment to which the value and quantity of the period balance are allocated, and is optional. The SegmentUUID may be based on UUID.

ProfitCentreUUID is a universal identification, which can be unique, of the ProfitCentre to which the value and quantity of the period balance are allocated, and is optional. The ProfitCentreUUID may be based on UUID.

ChartOfAccountsCode is coded representation of the ChartOfAccounts that contains the ChartOfAccountsItem that classifies the value stated in the PeriodBalance. The ChartOfAccountsCode may be based on ChartOfAccountsCode.

ChartOfAccountsItemCode is coded representation of a ChartOfAccountsItem that classifies—for general ledger accounting purposes—the value stated in the PeriodBalance. The ChartOfAccountsItemCode may be based on ChartOfAccountsItemCode.

FiscalYearVariantCode is coded representation of the FiscalYearVariant according to whose fiscal year definition (i.e., begin, end, and period definition), the FiscalYearID, and the AccountingPeriodID are derived. The FiscalYearVariantCode may be based on FiscalYearVariantCode.

FiscalYearID is the fiscal year in which the accounting document was posted. The FiscalYearID may be based on FiscalYearID.

AccountingPeriodID can specify the accounting period to which the period balance relates. AccountingPeriodID may be based on AccountingPeriodID.

LineItemCurrencyAmount can specify the value of the period balance in the currency of the tax due.

The LineItemCurrencyAmount may be based on Amount.

LocalCurrencyAmount is the value of the PeriodBalance in the local currency of the Company carrying the TaxLedgerAccount. The local currency is the currency in which the local books are kept.

The LocalCurrencyAmount may be based on Amount.

Constraint: The value reported here can match the total of all values in local currency that are documented in the line items of the PeriodBalance.

SetOfBooksCurrencyAmount is the value of the PeriodBalance in the currency selected for the set of books, and is optional. The SetOfBooksCurrencyAmount may be based on Amount.

Constraint: The value reported here can match the total of all values in the additional currency selected for the set of books that are documented in the line items of the PeriodBalance.

HardCurrencyAmount is the value of the PeriodBalance in the hard currency of the country of the Company carrying the TaxLedgerAccount. The hard currency is a stable, country-specific currency that is used in high-inflation countries, and is optional. The HardCurrencyAmount may be based on Amount. The value reported here can match the total of all values in the hard currency that are documented in the line items of the PeriodBalance.

IndexBasedCurrencyAmount is the value of the period balance in the index-based currency of the country of the Company Company carrying the TaxLedgerAccount. The index-based currency is a fictitious, country-specific currency that is used in high-inflation countries as a comparison currency for reporting, and is optional. The IndexBasedCurrencyAmount may be based on Amount.

The value reported here can match the total of all values in the index-based currency that are documented in the line items of the PeriodBalance.

SetOfBooks has a cardinality relationship of 1:cn, and may be a SetOfBooks based on whose specifications the PeriodBalance was created and updated. Segment has a cardinality relationship of c:cn, and may be a Segment to which the value of the PeriodBalance is allocated. ProfitCentre has a cardinality relationship of c:cn, and may be a ProfitCentre to which the value of the PeriodBalance is allocated.

QueryByElements is a query delivers a list of TaxLedgerAccountsPeriodBalances: All elements of the root node can be used for the search, as well as all elements of the node PeriodBalance, which does not contain any amounts.

The query elements are defined by the data type TaxLedgerAccountPeriodBalanceElementsQueryElements. These elements are:

TaxLedgerAccountCompanyUUID, CompanyID, TaxLedgerAccountTaxCountryCode, TaxLedgerAccountTaxRegionCode, TaxLedgerAccountTaxTypeCode, TaxLedgerAccountDueCategoryCode, TaxLedgerAccountProductTaxEventTypeCode, TaxLedgerAccountWithholdingTaxEventTypeCode, TaxLedgerAccountTaxRateTypeCode, SetOfBookID, SegmentID, SegmentUUID, ProfitCentreID, ProfitCentreUUID, ChartOfAccountsCode, ChartOfAccountsItemCode, FiscalYearVariantCode, FiscalYearID, AccountingPeriodID.

TaxLedgerAccountCompanyUUID is optional and is of GDT type UUID, CompanyID is optional and is of GDT type OrganisationalCentreID, TaxLedgerAccountTaxCountryCode is optional and is of GDT type CountryCode, TaxLedgerAccountTaxRegionCode is optional and is of GDT type RegionCode, TaxLedgerAccountTaxTypeCode is optional and is of GDT type TaxTypeCode, TaxLedgerAccountDueCategoryCode is optional and is of GDT type DueCategoryCode, TaxLedgerAccountProductTaxEventTypeCode is optional and is of GDT type ProductTaxEventTypeCode, TaxLedgerAccountWithholdingTaxEventTypeCode is optional and is of GDT type WithholdingTaxEventTypeCode, TaxLedgerAccountTaxRateTypeCode is optional and is of GDT type TaxRateTypeCode, SetOfBookID is optional and is of GDT type SetOfBooksID, SegmentID is optional and is of GDT type OrganisationalCentreID, SegmentUUID is optional and is of GDT type UUID, ProfitCentreID is optional and is of GDT type OrganisationalCentreID, ProfitCentreUUID is optional and is of GDT type UUID, ChartOfAccountsCode is optional and is of GDT type ChartOfAccountsCode, ChartOfAccountsItemCode is optional and is of GDT type ChartOfAccountsItemCode, FiscalYearVariantCode is optional and is of GDT type FiscalYearVariantCode, FiscalYearID is optional and is of GDT type FiscalYearID, AccountingPeriodID is optional and is of GDT type AccountingPeriodID.

PeriodTotal

A PeriodTotal is a period-specific record for a TaxLedgerAccount about the change in value of payables and receivables from sales tax and excise duty for a set of books. A set of books is a complete, self-contained, and consistent set of accounting figures within accounting. Complete means that all postings and relevant information on all items in the balance sheet and profit and loss statement are included.

Self-contained means that no external reference to other posted information in accounting is needed to explain the content of a set of books. Consistent means that the posted data of a set of books are comparable as regards the structure (fiscal year variant, currency, and chart of accounts) and the semantics (that is, based on an accounting principle or other rules or exceptions). The set of books supports the integration between the general ledger and the subledgers as well as cost accounting and profitability analysis. The subledgers, cost accounting, and profitability analysis can be known to the set of books, and all documents can be assigned to a single set of books. The elements directly located on the PeriodTotal node are defined by the TaxLedgerAccountPeriodTotalElements. In certain implementations, these elements include: SetOfBooksID, SegmentUUID, ProfitCentreUUID, AccountingBusinessTransactionDate, ChartOfAccountsCode, ChartOfAccountsItemCode, FiscalYearVariantCode, FiscalYearID, AccountingPeriodID, AccountingBusinessTransactionTypeCode, SubledgerAccountLineItemTypeCode, DebitCreditCode, LineItemCurrencyAmount, LocalCurrencyAmount, SetOfBooksCurrencyAmount, HardCurrencyAmount, and IndexBasedCurrencyAmount. SetOfBooksID is a universal identification, which can be unique, of the SetOfBooks according to whose specifications the PeriodTotal was created and updated. The SetOfBooksID may be based on SetOfBooksID. SegmentUUID is a universal identification, which can be unique, of the Segment to which the value and quantity of the period total can allocate, and is optional. The SegmentUUID may be based on UUID. ProfitCentreUUID is a universal identification, which can be unique, of the ProfitCentre to which the value and quantity of the period total can allocate, and is optional. The ProfitCentreUUID may be based on UUID. AccountingBusinessTransactionDate is the date at which the business transaction took place applying the criteria of Accounting. The AccountingBusinessTransactionDate may be based on Date, Qualifier: BusinessTransaction. ChartOfAccountsCode is coded representation of the ChartOfAccounts that contains the ChartOfAccountsItem that classifies the value stated in the PeriodTotal. The ChartOfAccountsCode) may be based on ChartOfAccountsCode. ChartOfAccountsItemCode is coded representation of a ChartOfAccountsItem that classifies—for general ledger accounting purposes—the value stated in the PeriodTotal. The ChartOfAccountsItemCode may be based on ChartOfAccountsItemCode. FiscalYearVariantCode is coded representation of the FiscalYearVariant according to whose fiscal year definition (begin, end, and period definition), the FiscalYearID and the AccountingPeriodID are derived. The FiscalYearVariantCode may be based on FiscalYearVariantCode. GDT is requested. FiscalYearID is identification of the fiscal year in which the LineItem are posted for which the PeriodTotal keeps summarized values and quantities. The FiscalYearID may be based on FiscalYearID. AccountingPeriodID is identification of the accounting period in which the LineItem are posted for which the PeriodTotal keeps summarized values and quantities. The AccountingPeriodID may be based on AccountingPeriodID. AccountingBusinessTransactionTypeCode is coded representation of the type of the business transactions for which the PeriodTotal keeps summarized quantities and values. It classifies the business transactions according to Accounting criteria. The AccountingBusinessTransactionTypeCode may be based on AccountingBusinessTransactionTypeCode. SubledgerAccountLineItemTypeCode is coded representation of the type of the SubledgerAccountLineItems whose amounts and quantities are summarized in the PeriodTotal. The SubledgerAccountLineItemTypeCode may be based on SubledgerAccountLineItemTypeCode. DebitCreditCode can specify whether the period total is assigned to the debit or credit side of the general ledger account. The DebitCreditCode may be based on DebitCreditCode. LineItemCurrencyAmount can specify the value of the period total in the currency of the tax due. The LineItemCurrencyAmount may be based on Amount. LocalCurrencyAmount is the value of the period total in the local currency of the Company carrying the TaxLedgerAccount. The local currency is the currency in which the local books are kept. Local CurrencyAmount may be based on Amount. In some implementations, the value reported here may match the total of all values in local currency that are documented in the LineItems. SetOfBooksCurrencyAmount is the value of the period total in the currency selected for the set of books, and is optional. The SetOfBooksCurrencyAmount may be based on Amount. In some implementations, the value reported here matches the total of all values in the additional currency selected for the set of books that are documented in the LineItems. HardCurrencyAmount is the value of the period total in the hard currency of the country of the Company carrying the TaxLedgerAccount. The hard currency is a stable, country-specific currency that is used in high-inflation countries, and is optional. The HardCurrencyAmount may be based on Amount. In some implementations, the value reported here can match the total of all values in the hard currency that are documented in the LineItems. IndexBasedCurrencyAmount is the value of the period total in the index-based currency of the country of the Company carrying the TaxLedgerAccount. The index-based currency is a fictitious, country-specific currency that is used in high-inflation countries as a comparison currency for reporting, and is optional. The IndexBasedCurrencyAmount may be based on Amount.

In some implementations, the value reported here can match the total of all values in the index-based currency that are documented in LineItems. SetOfBooks has a cardinality relationship of 1:cn, and may be a SetOfBooks according to whose specifications the PeriodTotal was created and updated. Segment has a cardinality relationship of c:cn, and may be a PeriodBalance can refer to a segment to which the PeriodBalance is assigned. ProfitCentre has a cardinality relationship of c:cn, and may be a PeriodBalance can refer to a ProfitCentre to which the PeriodBalance is assigned. The QueryByElements query delivers a list of TaxLedgerAccountsPeriodTotals. All elements of the root node can be used for the search, as well as all elements of the node PeriodTotal, which does not contain any amounts.

The query elements are defined by the data type TaxLedgerAccountPeriodTotalElementsQueryElements. These elements include: TaxLedgerAccountCompanyUUID, CompanyID, TaxLedgerAccountTaxCountryCode, TaxLedgerAccountTaxRegionCode, TaxLedgerAccountTaxTypeCode, TaxLedgerAccountDueCategoryCode, TaxLedgerAccountProductTaxEventTypeCode, TaxLedgerAccountWithholdingTaxEventTypeCode, TaxLedgerAccountTaxRateTypeCode, SetOfBooksID, SegmentID, SegmentUUID, ProfitCentreID, ProfitCentreUUID, AccountingBusinessTransactionDate, ChartOfAccountsCode, ChartOfAccountsItemCode, FiscalYearVariantCode, FiscalYearID, AccountingPeriodID, AccountingBusinessTransactionTypeCode, SubledgerAccountLineItemTypeCode, DebitCreditCode.

TaxLedgerAccountCompanyUUID is optional, and is of GDT type UUID, CompanyID is optional, and is of GDT type OrganisationalCentreID, TaxLedgerAccountTaxCountryCode is optional, and is of GDT type CountryCode, TaxLedgerAccountTaxRegionCode is optional, and is of GDT type RegionCode, TaxLedgerAccountTaxTypeCode is optional, and is of GDT type TaxTypeCode, TaxLedgerAccountDueCategoryCode is optional, and is of GDT type DueCategoryCode, TaxLedgerAccountProductTaxEventTypeCode is optional, and is of GDT type ProductTaxEventTypeCode, TaxLedgerAccountWithholdingTaxEventTypeCode is optional, and is of GDT type WithholdingTaxEventTypeCode, TaxLedgerAccountTaxRateTypeCode is optional, and is of GDT type TaxRateTypeCode, SetOfBooksID is optional, and is of GDT type SetOfBooksID, SegmentID is optional, and is of GDT type OrganisationalCentreID, SegmentUUID is optional, and is of GDT type UUID, ProfitCentreID is optional, and is of GDT type OrganisationalCentreID, ProfitCentreUUID is optional, and is of GDT type UUID, AccountingBusinessTransactionDate is optional, is of GDT type Date, and has a qualifier of BusinessTransaction, ChartOfAccountsCode is optional, and is of GDT type ChartOfAccountsCode, ChartOfAccountsItemCode is optional, and is of GDT type ChartOfAccountsItemCode, FiscalYearVariantCode is optional, and is of GDT type FiscalYearVariantCode, FiscalYearID is optional, and is of GDT type FiscalYearID, AccountingPeriodID is optional, and is of GDT type AccountingPeriodID, AccountingBusinessTransactionTypeCode is optional, and is of GDT type AccountingBusinessTransactionTypeCode, SubledgerAccountLineItemTypeCode is optional, and is of GDT type SubledgerAccountLineItemTypeCode, DebitCreditCode is optional, and is of GDT type DebitCreditCode.

LineItem

A LineItem records information about the value of a change in balance from sales tax and excise duty following a single business transaction. It may contain detailed information from the accounting-based representation of the business transaction, such as the posting date and a PrimaNota reference. The elements directly located on the LineItem node are defined by the GDT TaxLedgerAccountLineItemElements. In certain implementations, these elements include: UUID, SetOfBooksID, SegmentUUID, ProfitCentreUUID, PartnerCompanyUUID, PartnerSegmentUUID, PartnerProfitCentreUUID, AccountingDocumentUUID, AccountingDocumentID, AccountingDocumentItemID, OriginalEntryDocumentContainingObjectReference, OriginalEntryTransactionUUID, OriginalEntryDocumentReference, OriginalEntryDocumentItemReference, OriginalEntryDocumentItemTypeCode, OriginalEntryDocumentPartnerID, AccountingNotificationUUID, AccountingNotificationItemGroupItemUUID, GeneralLedgerAccountLineItemUUID, GeneralLedgerAccountLineItemAccountingDocumentItemGroupID, SystemAdministrativeData, ChartOfAccountsCode, ChartOfAccountsItemCode, AccountingBusinessTransactionTypeCode, TypeCode, AccountingDocumentTypeCode, AccountingDocumentNote, AccountingDocumentItemNote, PostingDate, OriginalEntryDocumentDate, AccountingBusinessTransactionDate, CurrencyConversionDate, FiscalYearVariantCode, FiscalYearID, AccountingPeriodID, AccountingClosingStepCode, AccountingDocumentItemAccountingGroupID, AccountingDocumentItemProductTaxGroupID, PropertyMovementDirectionCode, GeneralLedgerMovementTypeCode, DebitCreditCode, CancellationDocumentIndicator, CancellationOriginalEntryDocumentContainingBusinessObjectReference, CancellationOriginalEntryTransactionUUID, CancellationOriginalEntryDocumentReference, CancelledIndicator, DeferredTaxUUID, BusinessTransactionCurrencyAmount, LineItemCurrencyAmount, LocalCurrencyAmount, SetOfBooksCurrencyAmount, HardCurrencyAmount, and IndexBasedCurrencyAmount.

UUID is a universally identification, which can be unique, of the LineItem. The UUID may be based on UUID SetOfBooksID is an identification, which can be unique, of the SetOfBooks according to whose specifications the LineItem was created. The SetOfBooksID may be based on SetOfBooksID.

SegmentUUID is a universal identification, which can be unique, of the Segment to which the value of the LineItem is allocated, and is optional. The SegmentUUID may be based on UUID.

ProfitCentreUUID is a universal identification, which can be unique, of the ProfitCentre to which the value of the LineItem is allocated, and is optional. The ProfitCentreUUID may be based on UUID.

PartnerCompanyUUID is a universal identification, which can be unique, of a Company that acts in the business transaction stated in the LineItem as an intra corporate partner, and is optional. The PartnerCompanyUUID may be based on UUID.

PartnerSegmentUUID is a universal identification, which can be unique, of a Segment that acts in the business transaction stated in the LineItem as an intra corporate partner, and is optional. The PartnerSegmentUUID may be based on UUID.

PartnerProfitCentreUUID is a universal identification, which can be unique, of a ProfitCentre the that acts in the business transaction stated in the LineItem as an intra corporate partner, and is optional. The PartnerProfitCentreUUID may be based on UUID.

AccountingDocumentUUID is a universal identification, which can be unique, of the AccountingDocument that records the entire business transaction in Accounting. The AccountingDocumentUUID may be based on UUID.

AccountingDocumentID is an identification, which can be unique, of the AccountingDocument that records the entire business transaction in Accounting. The AccountingDocumentID may be based on BusinessTransactionDocumentID.

AccountingDocumentItemID is an identification, which can be unique, of the corresponding AccountingDocumentItem in the AccountingDocument which records the value change according to the criteria of GeneralLedger. The AccountingDocumentItemID may be based on BusinessTransactionDocumentItemID.

OriginalEntryDocumentContainingObjectReference is a reference to an Object containing the Original Entry Document. The OriginalEntryDocumentContainingObjectReference may be based on ObjectNodeReference, Qualifier: OriginalEntryDocumentContaining.

OriginalEntryTransactionUUID is a universal identifier, which can be unique, of the transaction during which the Original Entry Document was created or changed. The OriginalEntryTransactionUUID may be based on UUID.

OriginalEntryDocumentReference is a reference to the document that keeps the original entry of the business transaction. The OriginalEntryDocumentReference may be based on ObjectNodeReference.

OriginalEntryDocumentItemReference is a reference to an item of the OriginalEntryDocument. The value change recorded in the TaxLedgerAccountItem can be verified by that item of the OriginalEntryDocument. OriginalEntryDocumentItemReference may be based on ObjectNodeReference.

OriginalEntryDocumentItemTypeCode is a coded representation of the Item Type of the referred OriginalEntryDocumentItem, and is optional. The BusinessTransactionDocumentItemTypeCode may be based on BusinessTransactionDocumentItemTypeCode. This element can be used only, if the Original Entry Document is a Business Transaction Document.

OriginalEntryDocumentPartnerID is an Identification of the Original Entry Document as assigned by the business partner. (For example, the ID of the Supplier Invoice assigned by the Supplier), and is optional. The OriginalEntryDocumentPartnerID may be based on BusinessTransactionDocumentID; This element can be used only, if the Original Entry Document is a Business Transaction Document and if the Original Entry Document is identical to the Original Entry Document Containing Object.

AccountingNotificationUUID is a universal identification, which can be unique, of the notification sent to Financial Accounting about the business transaction stated in the LineItem, and is optional. The AccountingNotificationUUID may be based on UUID.

AccountingNotificationItemGroupItemUUID is a universal identification, which can be unique, of the Accounting Notification Item Group Item, which triggered the posting of this TaxLedgerAccountItem. The AccountingNotificationItemGroupItemUUID may be based on UUID.

GeneralLedgerAccountLineItemUUID is a universal identification, which can be unique, of a LineItem of a GeneralLedgerAccount that records the value change of the TaxLedgerAccountLineItem in the GeneralLedger. The GeneralLedgerAccountLineItemUUID may be based on UUID.

GeneralLedgerAccountLineItemAccountingDocumentItemGroupID is a universal identification, which can be unique, of the group of all AccountingDocumentItems that are summarized together in a GeneralLedgerAccountLineItem. The LineItem corresponds to exactly one AccountingDocumentItem belonging to the group. The GeneralLedgerAccountLineItemAccountingDocumentItemGroupID BusinessTransactionDocumentItemGroupID.

SystemAdministrativeData is administrative data stored in a system this data includes the system user and change time. The SystemAdministrativeData may be based on SystemAdministrativeData.

ChartOfAccountsCode is coded representation of the ChartOfAccounts containing the ChartOfAccountsItem that classifies—for general ledger accounting purposes—the value stated in the LineItem. The ChartOfAccountsCode may be based on ChartOfAccountsCode.

ChartOfAccountsItemCode is coded representation of a ChartOfAccountsItem that classifies—for general ledger accounting purposes—the value stated in the LineItem. The ChartOfAccountsItemCode may be based on ChartOfAccountsItemCode.

AccountingBusinessTransactionTypeCode is coded representation of the type of the business transaction stated in the TaxLegerAccountLineItem. It classifies the business transaction according to Accounting criteria. The AccountingBusinessTransactionTypeCode may be based on AccountingBusinessTransactionTypeCode.

TypeCode is coded representation of the type of the LineItem. The TypeCode may be based on SubledgerAccountLineItemTypeCode.

AccountingDocumentTypeCode is coded representation of the type of the AccountingDocument to which the LineItem refers by the AccountingDocumentReference. The AccountingDocumentTypeCode may be based on AccountingDocumentTypeCode.

AccountingDocumentNote is a natural-language comment that applies the AccountingDocument—referred via the AccountingDocumentReference—as a whole rather than to individual items, and is optional. The AccountingDocumentNote may be based on SHORT_Note.

AccountingDocumentItemNote is a natural-language comment pertaining to the AccountingDocumentItem to which the LineItem refers by the AccountingDocumentReference, and is optional. The AccountingDocumentItemNote may be based on SHORT_Note.

PostingDate is the date with which the business transaction is effectively recorded in Accounting. Effectively means that period totals and balances in accounting are updated with this date. The PostingDate may be based on Date, Qualifier: Posting.

OriginalEntryDocumentDate is the issue date of the Original Entry Document. The OriginalEntryDocumentDate may be based on Date, Qualifier: OriginalEntryDocument.

AccountingBusinessTransactionDate is the date at which the business transaction took place applying the criteria of Accounting. The AccountingBusinessTransactionDate may be based on Date, Qualifier: BusinessTransaction.

CurrencyConversionDate is the date that is used for the currency translation applied to amounts in the accounting document, and is optional. The CurrencyConversionDate may be based on Date, Qualifier CurrencyConversion.

FiscalYearVariantCode is the coded representation of the FiscalYearVariant according to whose fiscal year definition (begin, end, period definition) the FiscalYearID and the AccountingPeriodID are derived. The FiscalYearVariantCode may be based on FiscalYearVariantCode.

FiscalYearID is the identification of the fiscal year in which the LineItem is posted. The FiscalYearID may be based on FiscalYearID.

AccountingPeriodID is the identification of the accounting period in which the LineItem is posted. The AccountingPeriodID may be based on AccountingPeriodID.

AccountingClosingStepCode is coded representation of the closing step of the accounting document, and is optional. The AccountingClosingStepCode may be based on AccountingClosingStepCode.

AccountingDocumentItemAccountingGroupID is an identification, which can be unique, of a group of AccountingDocumentItems belonging together applying the criteria of Accounting. It is used to indicate the items of an AccountingDocument that belong together, e.g. in partial zero-balance checking within the Accounting Document. The AccountingDocumentItemAccountingGroupID may be based on BusinessTransactionDocumentItemGroupID. An example may be an activity confirmation from production that contains items for actual working times and also for materials used for the production process, the created AccountingDocumentItems may be grouped together according to the material movement or working time confirmation they belong to.

AccountingDocumentItemProductTaxGroupID is an Identification, which can be unique, of a group of AccountingDocumentItems that belong together because they are tax relevant and have the same taxation and related tax items, and is optional. The AccountingDocumentItemProductTaxGroupID may be based on GDT BusinessTransactionDocumentItemGroupID.

PropertyMovementDirectionCode is coded representation of the direction of movement of a property in case the LineItem describes a property movement, and is optional. The PropertyMovementDirectionCode may be based on PropertyMovementDirectionCode.

GeneralLedgerMovementTypeCode is coded representation of the type of movement with which the value change is recorded for GeneralLedger purposes in the GeneralLedgerAccount, and is optional. The GeneralLedgerMovementTypeCode may be based on GeneralLedgerMovementTypeCode.

DebitCreditCode is coded representation of debit or credit. It can specify whether the line item is assigned to the debit or credit side of the GeneralLedger account. The DebitCreditCode may be based on DebitCreditCode.

CancellationDocumentIndicator indicates whether the AccountingDocument to which the LineItem refers by the AccountingDocumentReference refers to a Cancellation Original Entry Document, and is optional. The CancellationDocumentIndicator may be based on Indicator, Qualifier: CancellationDocument.

CancellationOriginalEntryDocumentContainingBusinessObjectReference is reference to the Business Object containing the OriginalEntryDocument that cancelled this LineItem, and is optional. The CancellationOriginalEntryDocumentContainingBusinessObjectReference may be based on ObjectNodeReference Qualifier: CancellationOriginalEntryDocumentContaining.

CancellationOriginalEntryTransactionUUID is a universal identifier, which can be unique, of the transaction during which the CancellationOriginalEntryDocument was created or changed, and is optional. The CancellationOriginalEntryTransactionUUID may be based on UUID.

CancellationOriginalEntryDocumentReference is reference to the OriginalEntryDocument, that cancelled this LineItem, and is optional. The CancellationOriginalEntryDocumentReference may be based on ObjectNodeReference Qualifier: Cancellation.

CancelledIndicator indicates if the line item has been cancelled, and is optional. The CancelledIndicator may be based on Indicator: Qualifier Cancelled.

DeferredTaxUUID is an element UUID. In certain implementations, the DeferredTaxUUID is a globally unique identifier of DeferredTaxItemInformation, and is optional. The DeferredTaxUUID may be based on GDT UUID.

BusinessTransactionCurrencyAmount is the value of the LineItem in transaction currency. The transaction currency is the currency agreed on by two business partners for their business relationship, and is optional. The BusinessTransactionCurrencyAmount may be based on GDT Amount. Qualifier BusinessTransactionCurrency.

LineItemCurrencyAmount is the value of the LineItem in LineItem currency. The LineItemCurrencyAmount may be based on GDT Amount. Qualifier LineItem.

LocalCurrencyAmount is the value of the LineItem in the local currency of the Company carrying the account. The local currency is the currency in which the local books are kept. The LocalCurrencyAmount may be based on GDT Amount, Qualifier LocalCurrency.

SetOfBooksCurrencyAmount is the value of the LineItem in the currency selected for the set of books, and is optional. The SetOfBooksCurrencyAmount may be based on GDT Amount, Qualifier SetOfBooksCurrency)

HardCurrencyAmount is the value of the LineItem, in the hard currency of the country of the Company carrying the account. The hard currency is a stable, country-specific currency that is used in high-inflation countries, and is optional. The hardCurrencyAmount may be based on GDT Amount, Qualifier HardCurrency.

IndexBasedCurrencyAmount is the value of the LineItem in the index-based currency of the country of the Company carrying the account. The index-based currency is a fictitious, country-specific currency that is used in high-inflation countries as a comparison currency for reporting, and is optional.

The IndexBasedCurrencyAmount may be based on GDT Amount, Qualifier IndexedBasedCurrency.

Inbound aggregation relationships from business object SetOfBooks/node SetOfBooks may include: SetOfBooks has a cardinality relationship of 1:cn and may be the SetOfBooks according to whose specifications the LineItem was created.

Inbound aggregation relationships from business object Company/node Company may include: Partner Company has a cardinality relationship of c:cn and may be a company that acts in the business transaction stated in the LineItem as an intra corporate partner.

Inbound aggregation relationships from business object Segment/node Segment may include: Segment has a cardinality relationship of c:cn and may be a segment to which the value and quantity of the LineItem are allocated, and PartnerSegment has a cardinality relationship of c:cn and may be a Segment that acts in the business transaction stated in the LineItem as a Partner.

Inbound aggregation relationships from business object ProfitCentre/node ProfitCentre may include: ProfitCentre has a cardinality relationship of c:cn and may be a ProfitCentre to which the value and quantity of the LineItem are allocated, and PartnerProfitCentre has a cardinality relationship of c:cn and may be a ProfitCentre that acts in the business transaction stated in the LineItem as an intra corporate partner. In some implementations, only one of the relationships below to an Original Entry Document and to an Original EntryDocument Item may exist. If the Original Entry Document is not identical to a Business Object but contained in it then the corresponding relationship to this Business Object may exist as well.

Inbound aggregation relationships from business object AccountingEntry/node AccountingEntry may include: AccountingEntry has a cardinality relationship of c:cn and may be an accounting entry that keeps the original entry of the business transaction stated in the LineItem.

Inbound aggregation relationships from business object SupplierInvoice/node SupplierInvoice may include: SupplierInvoice has a cardinality relationship of c:cn and may be a supplier invoice that that keeps the original entry of the business transaction stated in the LineItem.

Inbound aggregation relationships from business object CustomerInvoice/node CustomerInvoice may include: CustomerInvoice has a cardinality relationship of c:cn and may be a customer invoice that that keeps the original entry of the business transaction stated in the LineItem.

Inbound aggregation relationships from business object ProductTaxDeclaration/node ProductTaxDeclaration may include: ProductTaxDeclaration has a cardinality relationship of c:cn and may be a reference to the ProductTaxDeclaration that contains the Original Entry Document.

Inbound aggregation relationships from business object ProductTaxDeclaration/node FinancialAuditTrailDocumentationDuePayment may include: FinancialAuditTrailDocumentation has a cardinality relationship of c:cn and may be a reference to a FinancialAuditTrailDocumentation that serves as Original Entry Document for a business transaction in a ProductTaxDeclaration.

Inbound aggregation relationships from business object ProductTaxDeclaration/node FinancialAuditTrailDocumentationProductTaxItem ProductTaxDeclaration may include: FinancialAuditTrailDocumentationProductTaxItem has a cardinality relationship of c:cn and may be a ProductTaxItemItem in a FinancialAuditTrailDocumentation of a ProductTaxDeclaration serving as Original Entry Document Item by which the value change recorded in the LineItem can be verified.

Inbound aggregation relationships from business object WithholdingTaxDeclaration/node WithholdingTaxDeclaration may include: WithholdingTaxDeclaration has a cardinality relationship of c:cn and may be a reference to the WithholdingTaxDeclaration that contains the Original Entry Document.

Inbound aggregation relationships from business object WithholdingTaxDeclaration/node FinancialAuditTrailDocumentation may include: DuePaymentFinancialAuditTrailDocumentation has a cardinality relationship of c:cn and may be a reference to a FinancialAuditTrailDocumentation that serves as Original Entry Document for a business transaction in a WithholdingTaxDeclaration.

Inbound aggregation relationships from business object WithholdingTaxDeclaration/node FinancialAuditTrailDocumentationWithholdingTaxItem may include: WithholdingTaxDeclarationFinancialAuditTrailDocumentationWithholdingTaxItem has a cardinality relationship of c:cn and may be a WithholdingTaxItem in a FinancialAuditTrailDocumentation of a WithholdingTaxDeclaration serving as Original Entry Document Item by which the value change recorded in the LineItem can be verified.

A number of inbound aggregation relationships may exist, including: 1) from business object ExpenseReport/node ExpenseReport: ExpenseReport has a cardinality relationship of c:cn and may be a reference to the ExpenseReport that contains the Original Entry Document. 2) From business object ExpenseReport/node SettlementResultPostingTransaction: SettlementResultPostingTransaction has a cardinality relationship of c:cn and may be a reference to a FinancialAuditTrailDocumentation that serves as Original Entry Document for a business transaction in an ExpenseReport. 3) From business object DueClearing/node DueClearing: DueClearing has a cardinality relationship of c:cn and may be a reference to the DueClearing that contains the Original Entry Document. 4) From business object DueClearing/node FinancialAuditTrailDocumentation: DueClearing FinancialAuditTrailDocumentation has a cardinality relationship of c:cn and may be a reference to a FinancialAuditTrailDocumentation that serves as Original Entry Document for a business transaction in a DueClearing. 5) From business object DuePayment/node FinancialAuditTrailDocumentationTaxAllocationItem DueClearing: FinancialAuditTrailDocumentationTaxAllocationItem has a cardinality relationship of c:cn and may be a TaxAllocationItem in a FinancialAuditTrailDocumentation of a DueClearing serving as Original Entry Document Item by which the value change recorded in the LineItem can be verified.

A number of inbound aggregation relationships may exist, including: 1) from business object DuePayment/node DuePayment: DuePayment has a cardinality relationship of c:cn and may be a reference to the DuePayment that contains the Original Entry Document. 2) From business object DuePayment/node FinancialAuditTrailDocumentation: DuePaymentFinancialAuditTrailDocumentation has a cardinality relationship of c:cn may be a reference to a FinancialAuditTrailDocumentation that serves as Original Entry Document for a business transaction in a DuePayment. 3) From business object DuePayment/node FinancialAuditTrailDocumentationTaxAllocationItem DuePaymentFinancialAuditTrailDocumentationTaxAllocationItem has a cardinality of c:cn. A TaxAllocationItem in a FinancialAuditTrailDocumentation of a DuePayment serving as Original Entry Document Item by which the value change recorded in the LineItem can be verified.

In some implementations, one of the relationships below to an Cancellation Original Entry Document and to an Cancellation Original EntryDocument Item can exist. If the Cancellation Original Entry Document is not substantially identical to a Business Object but contained in it then the corresponding relationship to this Business Object can exist, too.

A number of inbound aggregation relationships may exist, including: 1) From business object AccountingEntry, node AccountingEntry, CancellationAccountingEntry which has a cardinality of c:cn, and is an accounting entry that keeps the original entry of the business transaction for the cancellation of this LineItem. 2) From business object SupplierInvoice, node SupplierInvoice, CancellationSupplierInvoice has a cardinality of c:cn, and is a supplier invoice that that keeps the original entry of the business transaction transaction for the cancellation of this LineItem. 3) From business object CustomerInvoice, node CustomerInvoice, CancellationCustomerInvoice has a cardinality of c:cn, and is a customer invoice that that keeps the original entry of the business transaction transaction for the cancellation of this LineItem. 4) From business object ExpenseReport, node ExpenseReport, CancellationExpenseReport has a cardinality of c:cn, and is a reference to the ExpenseReport that contains the Original Entry Document for the cancellation of this LineItem. 5) From business object ExpenseReport, node SettlementResultPostingTransaction, CancellationExpenseReportSettlementResultPostingTransaction has a cardinality of c:cn, and is a reference to a FinancialAuditTrailDocumentation that serves as Original Entry Document for the cancellation of this LineItem. 6) From business object ProductTaxDeclaration, node ProductTaxDeclaration, CancellationProductTaxDeclaration ha a cardinality of c:cn, and is a reference to the ProductTaxDeclaration that contains the Original Entry Document for the Cancellation of this LineItem. 7) From business object ProductTaxDeclaration, node FinancialAuditTrailDocumentation, CancellationDuePaymentFinancialAuditTrailDocumentation has a cardinality of c:cn, and is a reference to a FinancialAuditTrailDocumentation in a Due Payment that serves as Original Entry Document for the cancellation of this LineItem. 8) From business object WithholdingTaxDeclaration, node WithholdingTaxDeclaration, CancellationWithholdingTaxDeclaration has a cardinality of c:cn, and is a reference to the WithholdingTaxDeclaration that contains the Original Entry Document for the Cancellation of this LineItem. 9) From business object WithholdingTaxDeclaration, node FinancialAuditTrailDocumentation, CancellationDuePaymentFinancialAuditTrailDocumentation has a cardinality of c:cn, and is a reference to a FinancialAuditTrailDocumentation in a Due Payment that serves as Original Entry Document for a for the Cancellation of this LineItem. 10)

From business object DuePayment, node DuePayment, CancellationDuePayment has a cardinality of c:cn, and is a reference to the DuePayment that contains the Original Entry Document for the cancellation of this LineItem. 11)

From business object DuePayment, node FinancialAuditTrailDocumentation, CancellationDuePaymentFinancialAuditTrailDocumentation has a cardinality of c:cn, and is a reference to a FinancialAuditTrailDocumentation in a Due Payment which serves as Original Entry Document for the cancellation of this LineItem. 12) From business object DueClearing, node DueClearing Cancellation DueClearing has a cardinality of c:cn, and is a reference to the DueClearing that contains the Original Entry Document for the cancellation of this LineItem. 13) From business object DueClearing, node FinancialAuditTrailDocumentation, Cancellation DueClearing FinancialAuditTrailDocumentation has a cardinality of c:cn, and is a reference to a FinancialAuditTrailDocumentation in a DueClearing which serves as Original Entry Document for the cancellation of this LineItem.

A number of association relationships for navigation may exist, including: 1) To the business object AccountingDocument, node AccountingDocument, AccountingDocument has a cardinality of 1:cn, and is the accounting document that records the entire business transaction in Accounting. 2) To business object GeneralLedgerAccount, node LineItem, GeneralLedgerAccountLineItem has a cardinality of 1:cn, and is a LineItem of a GeneralLedgerAccount that records the value change for GeneralLedger purposes.

A number of inbound association relationships may exist, including: 1) From business object AccountingNotification, node AccountingNotification, AccountingNotification has a cardinality of c:cn, and is the notification sent to Financial Accounting about the business transaction stated in the LineItem. 2) From business object AccountingNotification, node AccountingNotificationItemGroupItem, AccountingNotificationItemGroupItem has a cardinality of c:cn, and a LineItem may originate as a result of a business transaction that was represented in an AccountingNotification. 3) To the business object TaxLedgerAccount, node DeferredTaxItem, DeferredTaxItem has a cardinality of 1:c, and a TaxLedgerAccountItem may have a relation to a deferred tax item within Tax Ledger Account. 4) From business object Identity, node Identity, CreationIdentity has a cardinality of 1:cn, and is the system user Identity who created the LineItem. 5) LastChangeIdentity has a cardinality of c:cn, and is the system user Identity who last changed the LineItem.

The QueryByElements query delivers a list of TaxLedgerAccountLineItems. All elements of the root node, as well as line items that do not contain any amounts, can be used for the search. The query elements are defined by the data type TaxLedgerAccountLineItemElementsQueryElements. These elements include:

TaxLedgerAccountCompanyUUID, CompanyID, OrganisationalCentreID, TaxLedgerAccountTaxCountryCode, TaxLedgerAccountTaxRegionCode, TaxLedgerAccountTaxTypeCode, TaxLedgerAccountTaxDueCategoryCode, TaxLedgerAccountProductTaxEventTypeCode, TaxLedgerAccountWithholdingTaxEventTypeCode, TaxLedgerAccountTaxRateTypeCode, UUID, SetOfBooksID, SegmentID, SegmentUUID, ProfitCentreID, ProfitCentreUUID, PartnerCompanyID, PartnerCompanyUUID, Partner SegmentID, PartnerSegmentUUID, Partner ProfitCentreID, PartnerProfitCentreUUID, AccountingDocumentUUID, AccountingDocumentID, AccountingDocumentItemID, OriginalEntryDocumentContainingObjectReference, OriginalEntryTransactionUUID, OriginalEntryDocumentReference, OriginalEntryDocumentItemReference, OriginalEntryDocumentItemTypeCode, OriginalEntryDocumentPartnerID, AccountingNotificationUUID, AccountingNotificationItemGroupItemUUID, GeneralLedgerAccountLineItemUUID, GeneralLedgerAccountLineItemAccountingDocumentItemGroupID, ChartOfAccountsCode, ChartOfAccountsItemCode, AccountingBusinessTransactionTypeCode, TypeCode, SystemAdministrativeData, AccountingDocumentTypeCode, AccountingDocumentNote, AccountingDocumentItemNote, PostingDate, OriginalEntryDocumentDate, AccountingBusinessTransactionDate, CurrencyConversionDate, FiscalYearVariantCode, FiscalYearID, AccountingPeriodID, AccountingClosingStepCode, AccountingDocumentItemAccountingGroupID, AccountingDocumentItemProductTaxGroupID, PropertyMovementDirectionCode, GeneralLedgerMovementTypeCode, DebitCreditCode, CancellationDocumentIndicator, CancellationOriginalEntryDocumentContainingBusinessObjectReference, CancellationOriginalEntryDocumentTransactionUUID, CancellationOriginalEntryDocumentReference, CancelledIndicator, DeferredTaxUUID, and QueryByAccountingDocumentUUID. TaxLedgerAccountCompanyUUID is optional and is of GDT type UUID, CompanyID is optional and is of GDT type OrganisationalCentreID. TaxLedgerAccountTaxCountryCode is optional and is of GDT type CountryCode. TaxLedgerAccountTaxRegionCode is optional and is of GDT type RegionCode. TaxLedgerAccountTaxTypeCode is optional and is of GDT type TaxTypeCode. TaxLedgerAccountTaxDueCategoryCode is optional and is of GDT type DueCategoryCode. TaxLedgerAccountProductTaxEventTypeCode, is optional and is of GDT type ProductTaxEventTypeCode. TaxLedgerAccountWithholdingTaxEventTypeCode is optional and is of GDT type WithholdingTaxEventTypeCode. TaxLedgerAccountTaxRateTypeCode is optional and is of GDT type TaxRateTypeCode, and specifies the type of tax rate to which the recorded data relates. UUID is optional and is of GDT type UUID. SetOfBooksID is optional and is of GDT type SetOfBooksID, SegmentID is optional and is of GDT type OrganisationalCentreID. SegmentUUID is optional and is of GDT type UUID, ProfitCentreID is optional and is of GDT type OrganisationalCentreID. ProfitCentreUUID is optional and is of GDT type UUID. PartnerCompanyID is optional and is of GDT type OrganisationalCentreID. PartnerCompanyUUID is optional and is of GDT type UUID. Partner SegmentID is optional and is of GDT type OrganisationalCentreID. PartnerSegmentUUID is optional and is of GDT type UUID. Partner ProfitCentreID is optional and is of GDT type OrganisationalCentreID. PartnerProfitCentreUUID is optional and is of GDT type UUID. AccountingDocumentUUID is optional and is of GDT type UUID. AccountingDocumentID is optional and is of GDT type BusinessTransactionDocumentID. AccountingDocumentItemID is optional and is of GDT type BusinessTransactionDocumentItemID. OriginalEntryDocumentContainingObjectReference is optional and is of GDT type ObjectNodeReference, and has a qualifier OriginalEntryDocumentContaining. OriginalEntryTransactionUUID is optional and is of GDT type UUID. OriginalEntryDocumentReference is optional and is of GDT type ObjectNodeReference. OriginalEntryDocumentItemReference is optional and is of GDT type ObjectNodeReference. OriginalEntryDocumentItemTypeCode is optional and is of GDT type BusinessTransactionDocumentItemTypeCode. OriginalEntryDocumentPartnerID is optional and is of GDT type BusinessTransactionDocumentID. AccountingNotificationUUID is optional and is of GDT type UUID. AccountingNotificationItemGroupItemUUID is optional and is of GDT type UUID. GeneralLedgerAccountLineItemUUID is optional and is of GDT type UUID. GeneralLedgerAccountLineItemAccountingDocumentItemGroupID is optional and is of GDT type BusinessTransactionDocumentItemGroupID. ChartOfAccountsCode is optional and is of GDT type ChartOfAccountsCode. ChartOfAccountsItemCode is optional and is of GDT type ChartOfAccountsItemCode. AccountingBusinessTransactionTypeCode is optional and is of GDT type AccountingBusinessTransactionTypeCode. TypeCode is of GDT type SubledgerAccountLineItemTypeCode. SystemAdministrativeData is of GDT type SystemAdministrativeData. AccountingDocumentTypeCode is optional and is of GDT type AccountingDocumentTypeCode. AccountingDocumentNote is optional and is of GDT type SHORT_Note. AccountingDocumentItemNote is optional and is of GDT type SHORT_Note. PostingDate is optional and is of GDT type Date, and has a qualifier Posting. OriginalEntryDocumentDate is optional and is of GDT type Date, and has a qualifier OriginalEntryDocument. AccountingBusinessTransactionDate is of GDT type Date and has a qualifier BusinessTransaction. CurrencyConversionDate is optional and is of GDT type Date and has a qualifier CurrencyConversion. FiscalYearVariantCode is optional and is of GDT type FiscalYearVariantCode. FiscalYearID is optional and is of GDT type FiscalYearID. AccountingPeriodID is optional and is of GDT type AccountingPeriodID. AccountingClosingStepCode is optional and is of GDT type AccountingClosingStepCode. AccountingDocumentItemAccountingGroupID is optional and is of GDT type BusinessTransactionDocumentItemGroupID. AccountingDocumentItemProductTaxGroupID is optional and is of GDT type BusinessTransactionDocumentItemGroupID. PropertyMovementDirectionCode is optional and is of GDT type PropertyMovementDirectionCode. GeneralLedgerMovementTypeCode is optional and is of GDT type GeneralLedgerMovementTypeCode. DebitCreditCode is optional and is of GDT type DebitCreditCode. CancellationDocumentIndicator is optional and is of GDT type Indicator, and has a qualifier CancellationDocument. CancellationOriginalEntryDocumentContainingBusinessObjectReference is optional and is of GDT type ObjectNodeReference, and has a qualifier CancellationOriginalEntryDocumentContaining. CancellationOriginalEntryDocumentTransactionUUID is optional and is of GDT type UUID. CancellationOriginalEntryDocumentReference is optional and is of GDT type ObjectNodeReference, and has a qualifier Cancellation. CancelledIndicator is optional and is of GDT type Indicator Qualifier Cancelled. DeferredTaxUUID is optional and is of GDT type UUID. QueryByAccountingDocumentUUID delivers a list of TaxLedgerAccountLineItems for a TaxLedgerAccount and several AccountingDocumentUUID's. The query elements are defined by the data type TaxLedgerAccountLineItemAccountingDocumentUUIDQueryElements. These elements include:

TaxLedgerAccountUUID, and AccountingDocumentUUID. TaxLedgerAccountUUID is of GDT type UUID. AccountingDocumentUUID is of GDT type UUID.

The DeferredTaxItem is the representation of deferred tax in Accounting. For each TaxLedgerAccountLineItem, which is of the type deferred taxes exactly one instance of node DeferredTaxItem exist. It also includes the dependent object AccountingClearingObjectHistory. The elements directly located on the LineItem node are defined by the GDT type TaxLedgerAccountDeferredTaxItemElements. In certain implementations, these elements include: UUID, and OrderReference.

UUID is an element UUID. In certain implementations, the UUID is a globally unique identifier of DeferredTaxItemInformation. UUID may be based on GDT UUID.

OrderReference is reference to an Operational Document that acts, for example, from the Financial Accounting point of view—as an Order and that is represented by the DeferredTaxItem or whose Items are represented by the DeferredTaxItem and is an alternative key. The life cycle of this operational document or of its items is stated in the LineItems and the DeferredTaxItemHistory of the TaxLedgerAccount. The OrderReference may be based on GDT ObjectNodeReference.

A number of inbound aggregation relationships may exist, including: 1) From business object SupplierInvoice, node SupplierInvoice, SupplierInvoice has a cardinality of c:cn and is a supplier invoice that is represented by the DeferredTaxItem. 2) From business object CustomerInvoice, node CustomerInvoice, CustomerInvoice has a cardinality of c:cn, and is a customer invoice that is represented by the DeferredTaxItem. 3) From business object ExpenseReport, node ExpenseReport, ExpenseReport has a cardinality of c:cn, and is an ExpenseReport that is represented by the DeferredTaxItem. In some implementations, one of the described relationships to an OrderOperationalDocument can exist.

A composition relationships DeferredTaxItemHistory 103064 may exist with a cardinality of 1:1. The DeferredTaxItemHistory is the History of the Deferred Tax Item. The node DeferredTaxItemHistory is represented by the Dependent Object Accounting Clearing Object History.

AggregatedLineItems (Transformation Node)

The AggregatedLineItems is a aggregation of TaxLedgerAccountLineItems by the coding block elements. The Node is used to determine the account assignments for the tax payable postings.

All TaxLedgerAccountLineItems with the same combination of SegmentUUID, ProfitCentreUUID, PartnerCompanyUUID, PartnerSegmentUUID and PartnerProfitCentreUUID are aggregarted in one Instance of Aggregated LineItems. All elements are derived from TaxLedgerAccountLineItem Elements with identical names. The elements directly located on the AggregatedLineItems node are defined by the GDT TaxLedgerAccountAggregatedLineItemsElements. In certain implementations, these elements include: SegmentUUID, ProfitCentreUUID, PartnerCompanyUUID, PartnerSegmentUUID, PartnerProfitCentreUUID, LineItemCurrencyAmount, BusinessTransactionCurrencyAmount, LocalCurrencyAmount, SetOfBooksCurrencyAmount, HardCurrencyAmount, and IndexBasedCurrencyAmount, SegmentUUID can specify the segment that the tax line item of the tax payable posting relates to, and is optional. The SegmentUUID may be based on GDT UUID.

ProfitCentreUUID can specify the profit center that the tax line item of the tax payable posting relates to, and is optional. The ProfitCentreUUID may be based on GDT UUID.

PartnerCompanyUUID can specify the partner company that the tax line item of the tax payable posting relates to, and is optional. The PartnerCompanyUUID may be based on UUID.

PartnerSegmentUUID can specify the partner center that the tax line item of the tax payable posting relates to, and is optional. The PartnerSegmentUUID may be based on GDT UUID.

PartnerProfitCentreUUID can specify the partner profit center that the tax line item of the tax payable posting relates to, and is optional. The PartnerProfitCentreUUID may be based on GDT UUID.

LineItemCurrencyAmount can specify the value of the tax line item of the tax payable posting in the currency of the tax due. The LineItemCurrencyAmount may be based on GDT Amount.

BusinessTransactionCurrencyAmount can specify the value of the tax line item of the tax payable posting in the transaction currency of the business transaction. The BusinessTransactionCurrencyAmount may be based on Amount Qualifier BusinessTransaction.

LocalCurrencyAmount can specify the value of the tax line item of the tax payable posting in the local currency of the company. The LocalCurrencyAmount may be based on GDT Amount Qualifier LocalCurrency.

SetOfBooksCurrencyAmount can specify the value of the tax line item of the tax payable posting in the additional currency selected for the set of books, and is optional. The SetOfBooksCurrencyAmount may be based on GDT Amount Qualifier SetOfBooksCurrency.

HardCurrencyAmount can specify the value of the tax line item of the tax payable posting in the hard currency of the country of the company, and is optional. The HardCurrencyAmount may be based on GDT Amount Qualifier HardCurrency.

IndexBasedCurrencyAmount can specify the value of the tax line item of the tax payable posting in the index-based currency of the country of the company, and is optional. The IndexBasedCurrencyAmount may be based on Amount with qualifier IndexBased.

A number of inbound aggregation relationships may exist, including: 1) From business object Company, node Company, Partner Company has a cardinality of c:cn, and is a LineItem that can relate to a partner company to which the line item is to be assigned. 2) From business object Segment, node Segment, Segment has a cardinality of c:cn. A LineItem can relate to a segment to which the line item is to be assigned. PartnerSegment has a cardinality of c:cn. A LineItem can relate to a partner segment to which the line item is to be assigned. 3) From business object ProfitCentre, node ProfitCentre, ProfitCentre has a cardinality of c:cn. A LineItem can relate to a profit center to which the line item is to be assigned.

PartnerProfitCentre has a cardinality of c:cn. A LineItem can relate to a partner profit center to which the line item is to be assigned.

QueryByOriginalEntryDocumentID delivers for a TaxLedgerAccount a record of the assignment of tax line items for the tax payable posting. In some implementations, the query elements are defined by the data type TaxLedgerAccountAggregatedLineItemsOriginalEntryDocumentIDQueryElements. These elements include: TaxLedgerAccountCompanyUUID, TaxLedgerAccountCountryCode, TaxLedgerAccountRegionCode, TaxLedgerAccountTaxTypeCode, TaxLedgerAccountTaxDueCategoryCode, TaxLedgerAccountProductTaxEventTypeCode, TaxLedgerAccountWithholdingTaxEventTypeCode, TaxLedgerAccountTaxRateTypeCode, OriginalEntryDocumentContainingObjectReference, OriginalEntryDocumentReference, SetOfBooksID. TaxLedgerAccountCompanyUUID is of GDT type UUID. TaxLedgerAccountCountryCode is of GDT type CountryCode. TaxLedgerAccountRegionCode is optional and is of GDT type RegionCode. TaxLedgerAccountTaxTypeCode is of GDT type TaxTypeCode. TaxLedgerAccountTaxDueCategoryCode is optional and is of GDT type DueCategoryCode. TaxLedgerAccountProductTaxEventTypeCode is optional is of GDT type ProductTaxEventTypeCode.

TaxLedgerAccountWithholdingTaxEventTypeCode is optional and is of GDT type WithholdingTaxEventTypeCode. TaxLedgerAccountTaxRateTypeCode is of GDT type TaxRateTypeCode. OriginalEntryDocumentContainingObjectReference is optional and is of GDT type ObjectNodeReference. OriginalEntryDocumentReference is optional and is of GDT type ObjectNodeReference. SetOfBooksID is of GDT type SetOfBooksID.

Dependent Object AccessControlList

Figure 104:
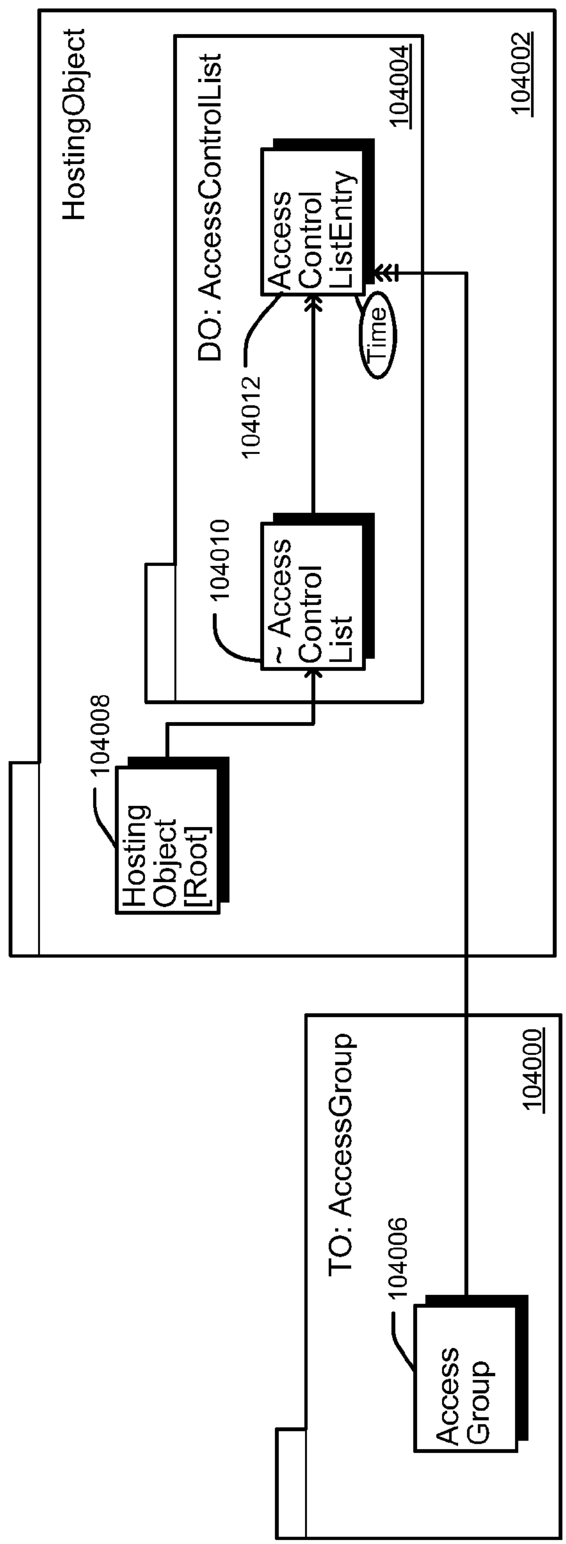
FIG. 104 shows an exemplary AccessControlList object model.

FIG. 104 illustrates one example of an AccessControlList business object model 104004. Specifically, this model depicts interactions among various hierarchical components of the AccessControlList, as well as external components that interact with the AccessControlList (shown here as 104000 through 104002 and 104006 through 104012). The AccessControlList is a list of access groups 104000 that have access to the entire host object 104002 during a validity period. The dependent object AccessControlList can be a part of a basis process component. Each object can have an AccessControlList which can control the access to its instances. Typically, different instances of the host object cannot share a common Access Control List.

An AccessControlList can contain access control entries 104012, which can specify the restrictions regarding access to a business object instance in their access context. AccessControlList can be represented by the node AccessControlList 104010 (i.e., root). In some implementations, the dependent object AccessControlList does not send or receive any messages.

An AccessControlList is a list of access groups that have access to the entire host object 104002 during a validity period. The elements located directly at the node AccessControlList can be defined by the data type: AccessControlListElements. These elements can include UUID and Entry. UUID can be a universally unique identifier of the AccessControlList of type GDT: UUID. The UUID has a cardinality relationship of 1:n. The dependent object AccessControlList can be used on root level of the host object 104008.

An Entry is an Access group that has access during a validity period to an entire object instance for a specific access context in which the object instance occurs. An access context is a business function, management function or employee self-service activity with specific rules for instance-based access control.

The elements located directly at the node AccessControlEntry 104012 can be defined by the data type: AccessControlListEntryElements. These elements can include AccessGroupKey and ValidityPeriod. The AccessGroupKey is a key for the AccessGroup 104006 that describes the access restriction applicable, and can be of type IDT: AccessGroupKey. The ValidityPeriod is the period for the validity of the access control entry, and can be of type GDT: CLOSED_DatePeriod, Qualifier: Validity. AccessGroup has a cardinality relationship of 1:n for which the access control entry grants access.

Transformed Object AccessGroup

Figure 105:
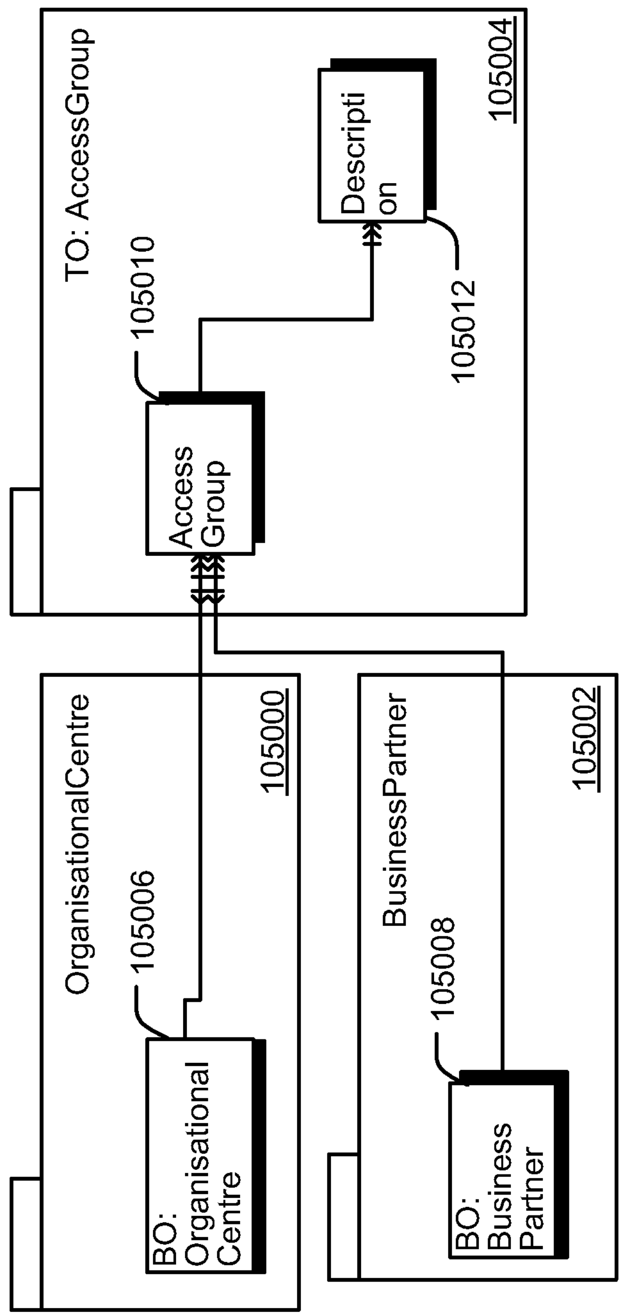
FIG. 105 shows an exemplary AccessGroup object model.

FIG. 105 illustrates one example of an AccessGroup transformed object model 105004. Specifically, this model depicts interactions among various hierarchical components of the AccessGroup, as well as external components that interact with the AccessGroup (shown here as 105000 through 105002 and 105006 through 105012). An AccessGroup is a group of identities for which access control is specified in a certain context.

The group can be defined by the (indirect) assignment of an identity to an organizational centre, project or business partner. (Grouping by project currently not in scope.) The transformed object AccessGroup can be a part of a process component. AccessGroup can be represented by the node Root. In some implementations, the transformed object AccessGroup does not send or receive any A2A and/or B2B messages.

An AccessGroup is a group of identities for which access control can be specified in a certain context. The group can be defined by the assignment of an identity to an organizational centre, project or business partner. The elements located at the node AccessGroup 105010 are defined by the data type AccessGroupElements. These elements include GroupingObjectUUID, GroupingAccessContextCode, Name, GroupingObjectHierarchyCheckRelevanceIndicator, and Key. GroupingObjectUUID is a GDT of type UUID. The GroupingObjectUUID is a unique identifier for the object used for grouping the identities.

GroupingAccessContextCode is a GDT of type AccessContextCode. The GroupingAccessContextCode is a coded representation of the access context used for grouping the identities. An access context is a business function, management function or employee self-service activity with specific rules for instance-based access control. Name is a GDT of type LANGUAGEINDEPENDENT_MEDIUM_Name and, in some implementations, has a qualifier of Group. A Name is the name of the AccessGroup. GroupingObjectHierarchyCheckRelevanceIndicator is a GDT of type indicator and, in some implementations, has a qualifier of Relevance. A GroupingObjectHierarchyCheckRelevanceIndicator Indicates whether the hierarchical structure of the grouping object is relevant for access control or not. Key is an IDT of type AccessGroupKey and is an alternative key. A Key is a unique identifier for the access group and includes GroupingAccessContextCode and GroupingObjectUUID. A GroupingAccessContextCode is a GDT of type AccessContextCode and is a coded representation of the access context used for grouping the identities. GroupingObjectUUID is a GDT of type UUID and is a unique identifier for the object used for grouping the identities. Description 105012 has a cardinality of 1:cn. OrganisationalCentre 105006 has a cardinality of c:cn and is used for grouping the identities to form the access group. BusinessPartner 105008 has a cardinality of c:cn and is used for grouping the identities to form the access group.

In some implementations, a business partner 105002 or an organizational centre 105000 can be an object used for grouping. GroupingObjectUUID can be a UUID of a organizational centre if the grouping object is an organizational centre and a UUID of a business partner if the grouping object is a business partner. In addition, Name can be an ID of the organizational centre if the grouping object is an organizational centre and a Name of the business partner if the grouping object is a business partner. In some implementations, if the grouping object is a business partner, the GroupingObjectHierarchyCheckRelevanceIndicator is false. QueryByName provides a list of all AccessGroups with the specified Name. The query elements are defined by the data type AccessGroupNameQueryElements. These elements include Name and GroupingAccessContextCode. Name is a GDT of type LANGUAGEINDEPENDENT_MEDIUM_Name and, in some implementations, has a qualifier of Group. GroupingAccessContextCode is a GDT of type AccessContextCode. QueryByHierarchicalSubordination provides a list of all AccessGroups which are hierarchically subordinated to the specified AccessGroups. In some implementations, the hierarchical subordination is unique for a specified access context. The query elements are defined by the data type AccessGroupHierarchicalSubordinationQueryElements. These elements include a Key. A Key is an IDT of type AccessGroupKey.

In some implementations, properties of the AccessGroup can be represented in a natural language. The elements located directly at the node AccessGroupDescription are defined by the data type AccessGroupDescriptionElements. These elements include a Description. A Description is a GDT of type Description and, in some implementations, has a qualifier of Group. A Description is the description of the AccessGroup in the language given by the attribute languagecode.

Dependent Object AccountingCodingBlockDistribution

Figures 1, 106:
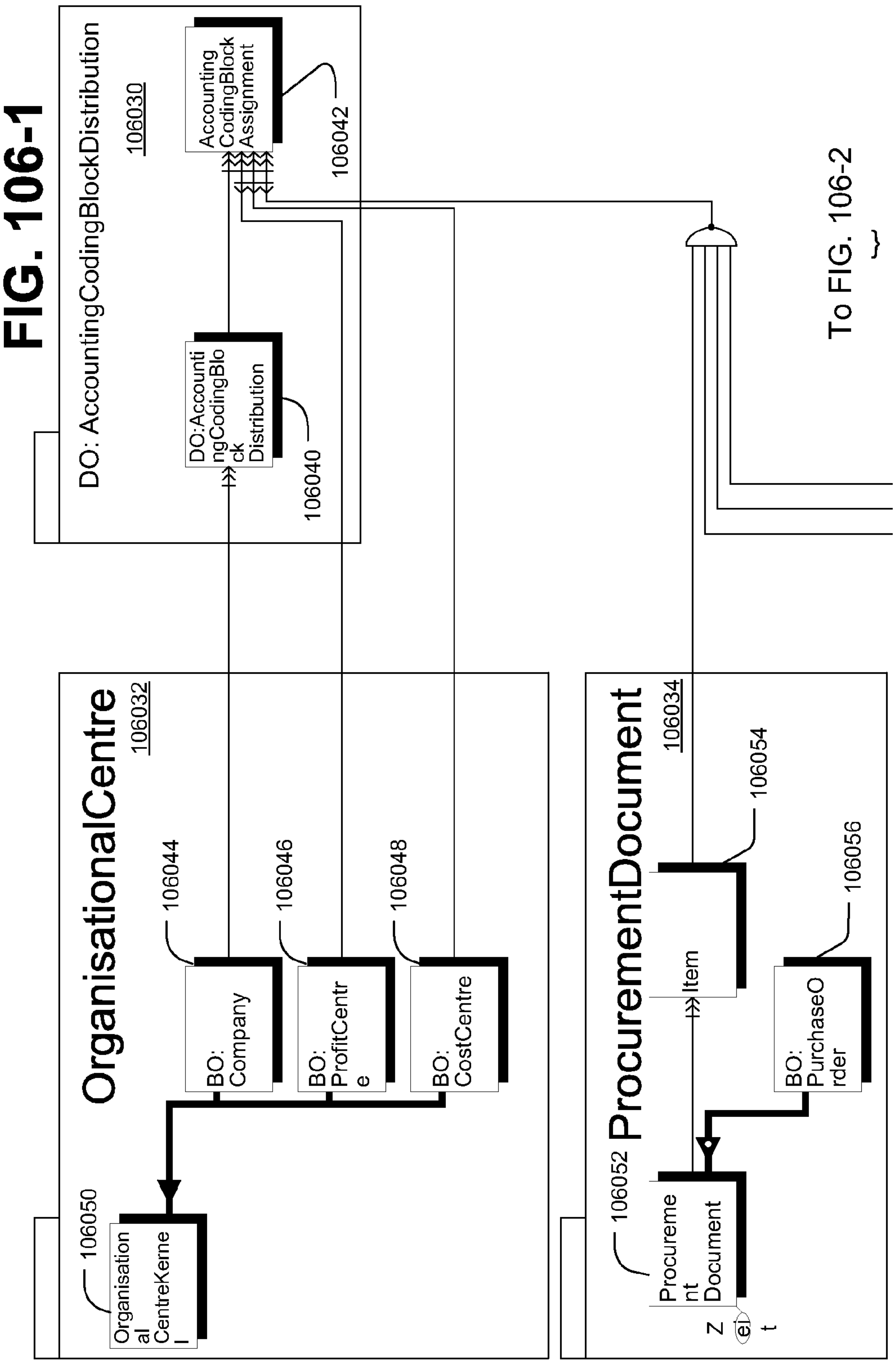
Figures 2, 106:
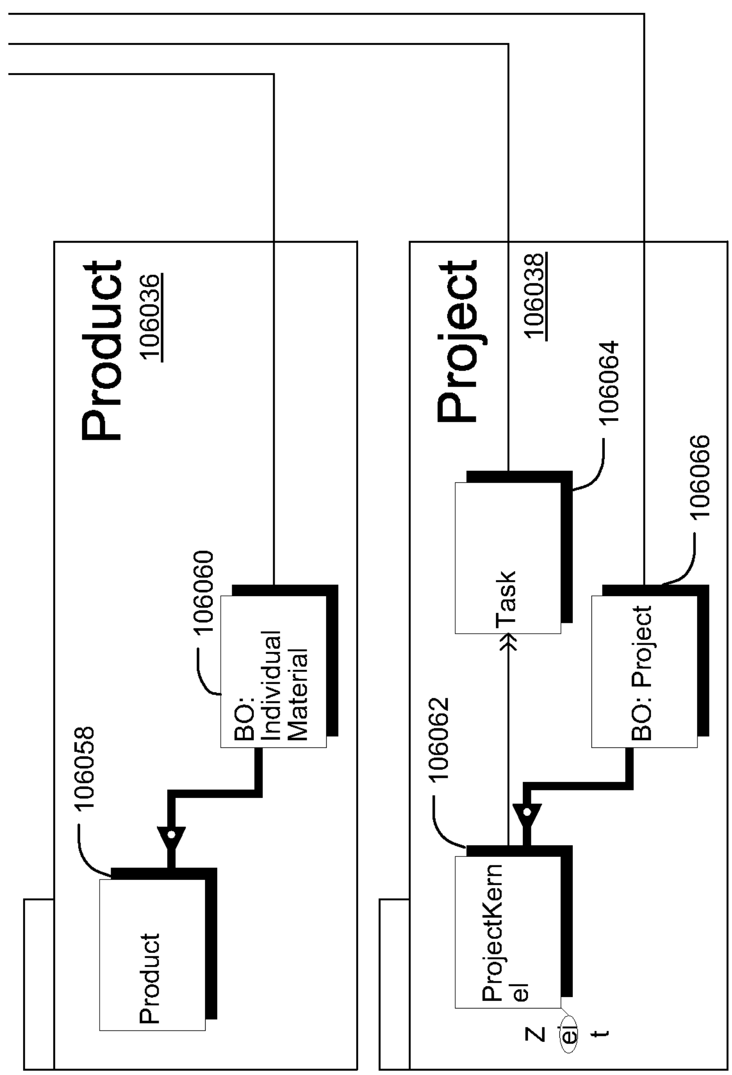

FIGS. 106-1 through 106-2 illustrate one example of an AccountingCodingBlockDistribution dependent object model 106030. Specifically, this model depicts interactions among various hierarchical components of the Accounting- CodingBlockDistribution, as well as external components that interact with the AccountingCodingBlockDistribution (shown here as 106000 through 106028 and 106032 through 106066). An AccountingCodingBlockDistribution is a distribution of value changes from business transactions to coding blocks, whereby the distribution may occur on the basis of, for example, amounts, quantities, or percentages. A coding block is a set of accounting objects of different types. An accounting object is a business object to which value changes from business transactions can be assigned in Accounting (e.g., a cost center or a profit center).

In some implementations, the AccountingCodingBlock-Distribution dependent object is part of the AccountingCodingBlockDistributionProcessing process component, is used by the business transaction documents in operational applications (e.g., in purchase orders or invoices, to enter and check accounting objects), and is used in business objects GoodsAndActivityConfirmation (which may be derived from the LogisticsConfirmationTemplate template), Internal-Request, PurchaseRequest, PurchasingContract, Purchase-Order 106056, ServiceOrder, GoodsAndServiceAcknowledgment, SupplierInvoiceRequest, SupplierInvoice, and EmployeeTime.

In some implementations, AccountingCodingBlockDistribution contains a reference to a company for which the account assignments apply, and comprises AccountingCodingBlockAssignments (i.e., coding blocks and their respective share of the total value or the total quantity of the business transaction documents).

An AccountingCodingBlockDistribution dependent object can be involved, via the business objects it uses, in process integration models, including Supplier Invoice Processing_Project Processing_Coding Block, Internal Request Processing_Project Processing_Coding Block, Purchase Order Processing_Project Processing_Coding Block, Purchase Request Processing_Project Processing_Coding Block, and Goods and Service Acknowledgement_Project Processing_Coding Block.

AccountingCodingBlockDistributionAccountingCodingBlockDistribution can be associated with service interface Project Task Accountability In and service interface Project Task Accountability Out. In some implementations, the Project Task Accountability In service interface is part of process integration models Supplier Invoice Processing_Project Processing_Coding Block, Internal Request Processing_Project Processing_Coding Block, Purchase Order.Processing_Project Processing_Coding Block, Purchase Request Processing_Project Processing_Coding Block, and Goods and Service Acknowledgement_Project Processing_Coding Block and contains the operation that checks whether the Project and Task accounting objects can exist and whether they can be permitted for assignment and it synchronously returns the result of the check to the calling process component. A Check Project Task Accountability operation can check in the Project Processing process component whether the tasks exist and whether they can be permitted for assignment. In the Request role, the operation can be based on the AccountingObjectCheckRequest message type. In the Confirmation role, it can be based on the AccountingObjectCheckConfirmation message type (derived from the AccountingCodingBlockDistribution dependent object).

In some implementations, the Project Task Accountability Out service interface is part of process integration models Supplier Invoice Processing_Project Processing_Coding Block, Internal Request Processing_Project Processing_Coding Block, Purchase Order Processing_Project Processing_Coding Block, Purchase Request Processing_Project Processing_Coding Block, and Goods and Service Acknowledgement_Project Processing_Coding Block, and contains the operation that calls the account assignment check, to be performed synchronously, of accounting objects that typically are not available locally, and receives the result of the check. A Request Project Task Accountability Information operation can send a synchronous request to the Project Processing process component to determine whether the tasks exist and whether they can be valid from the business perspective (i.e., whether they can be assigned). In the Request role, the operation can be based on the AccountingObjectCheckRequest message type. In the Confirmation role, it can be based on the AccountingObjectCheckConfirmation message type (derived from the dependent object AccountingCodingBlockDistribution).

In some implementations, elements located at the AccountingCodingBlockDistribution node 106040 are defined by data type AccountingCodingBlockDistributionElements and include ValidityDate, a date on which the account assignments should apply; CompanyID, a company in which the coding blocks from the AccountingCodingBlockAssignments should apply; and LanguageCode. a language in which the account assignment should be described. Optional elements include UserAccountID, a system user for which the account assignment should apply; TemplateIndicator, an indicator denoting whether the distribution should be stored as a user-specific template; TotalAmount, the total amount distributed across the single account assignments in the case of a distribution involving a number of single account assignments (AccountingCodingBlockAssignments); and TotalQuantity, the quantity distributed across the account assignments in the case of a distribution involving a number of subnodes (i.e., single account assignments). In such implementations, node AccountingCodingBlockDistribution has a 1:cn cardinality composition relationship with AccountingCodingBlockAssignment subordinate nodes 106042 and from business object Company/Root, node AccountingCodingBlockDistribution has a 1:cn cardinality inbound aggregation relationship with Company 106044, the company for which the account assignments apply.

In some implementations, enterprise service infrastructure action Check checks whether the accounting objects of the coding blocks exist and whether they are permitted for assignment. An assignment may only be made to a Task 106064, for example, if the relevant project is released. In such implementations, preconditions should be checked before an account assignment is saved within the business object; there are no changes to the object; the business object used must react to the messages of the action, but there are no stipulations about how the business object used reacts to the messages of the action; there are no changes to the status; there are no parameters; and the action can be called by the business objects used.

In some implementations, enterprise service infrastructure action SaveAsUserTemplate selects the entered account assignment as a user-specific template to be stored. In such implementations, an account assignment must be entered, i.e., at least one accounting object must be specified; the "TemplateIndicator" field on the root node is selected; there are no changes to other objects; there are no changes to the status; parameter User is a system user for whom the template should be stored; and the action can be called by the business objects used.

In some implementations, enterprise service infrastructure action RetrieveUserTemplate reads a user-specific account assignment template from the database as a current account assignment. In such implementations, an account assignment template of the specified user needs to have been saved with the SaveAsUserTemplate action; the account assignment template generates or replaces the account assignments that have been created, i.e., the AccountingCodingBlockAssignment nodes; there are no changes to other objects; there are no changes to the status; parameter User is a system user whose template is to be read; and the action can be called by the business objects used.

An AccountingCodingBlockAssignment can be, for an AccountingCodingBlockDistribution, the assignment of an amount, a quantity, or a percentage to a coding block. In this way, it can be a single value of the distribution. In some implementations, the elements located at the AccountingCodingBlockAssignment node are defined by the AccountingCodingBlockAssignmentElements data type, and optionally include Percent, a percentage of the total amount or of the total quantity to which the single account assignment is assigned; Amount, an amount that is assigned to the single account assignment; Quantity, a quantity that is assigned to the single account assignment; AccountingCodingBlockTypeCode, a type of account assignment that specifies, for example, required and optional entries for the coding block; AccountDeterminationExpenseGroupCode, a symbol for a G/L account; ProfitCentreID, an identifier of a profit center as part of the coding block; ProfitCentreUUID, a universally unique identifier of the profit center; CostCentreID, an identifier of a cost center as part of the coding block; CostCentreUUID, a universally unique identifier of the cost center; MaterialID, an individual material as part of the coding block; MaterialUUID, a universally unique identifier of the individual material; ProjectReference, a reference to a task, i.e., a project element as part of the coding block; ProjectTaskUUID, a universally unique identifier of the task; ProjectUUID, a universally unique identifier of the project; ProjectResponsibleEmployeeID, a project lead to whom the task is assigned.

In such implementations, from the business object ProfitCentre/node Root, node AccountingCodingBlockAssignment has a c:cn cardinality inbound aggregation relationship with ProfitCentre 106046, wherein a profit center can be part of the account assignment; from the business object CostCentre/node Root, node AccountingCodingBlockAssignment has a c:cn cardinality inbound aggregation relationship with CostCentre 106048, wherein a cost center can be part of the account assignment; from the business object IndividualMaterial/node Root, node AccountingCodingBlockAssignment has a c:cn cardinality inbound aggregation relationship with IndividualMaterial 106060, wherein an IndividualMaterial can be part of the account assignment; from business object Project 106038/node Project 106066, node AccountingCodingBlockAssignment has a c:cn (Cross DU) cardinality inbound aggregation relationship with Task, wherein a task from a project can be part of the account assignment; and from the business object Project/node Root, node AccountingCodingBlockAssignment has a c:cn (Cross DU) cardinality inbound aggregation relationship with Project, wherein a task is assigned to a project. In this way, the project is associated implicitly.

AccountingCodingBlockDistribution Message Types and Signatures

Figures 1, 107:
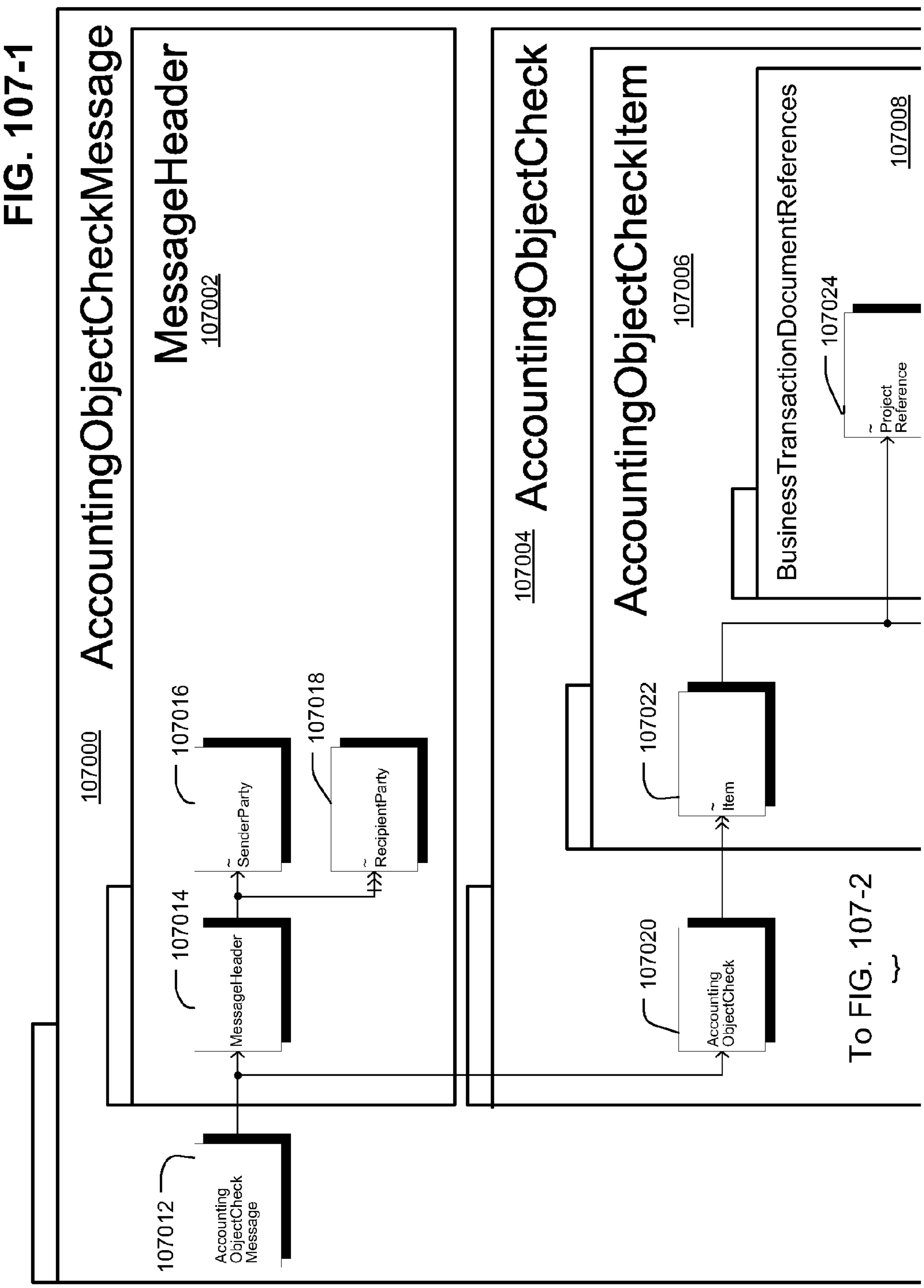
Figures 2, 107:
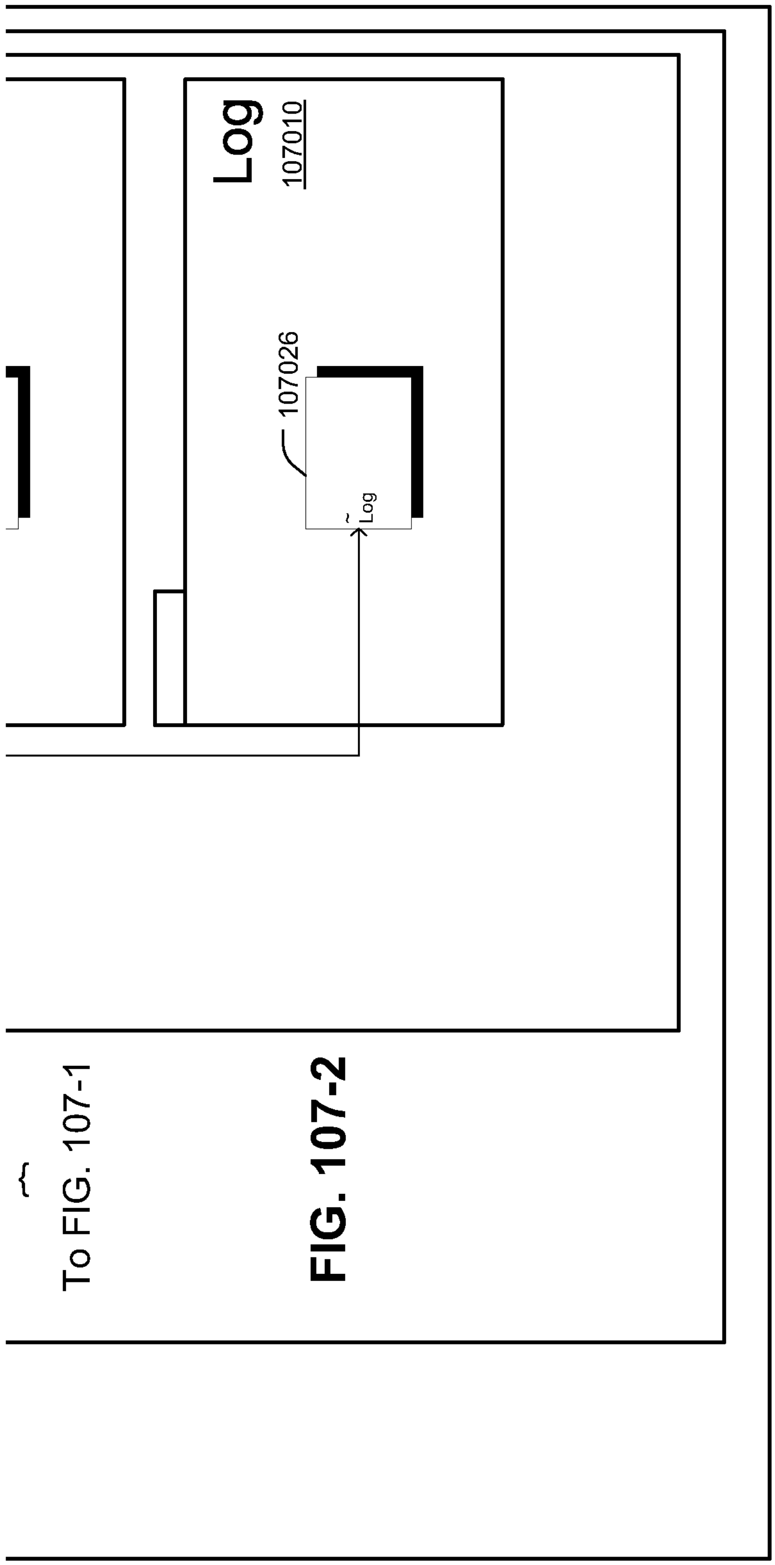

FIGS. 107-1 through 107-2 illustrate one example logical configuration of AccountingObjectCheckMessage message 107000. Specifically, this figure depicts the arrangement and hierarchy of various components such as one or more levels of packages, entities, and datatypes, shown here as 107000 though 107026. As described above, packages may be used to represent hierarchy levels. Entities are discrete business elements that are used during a business transaction. Data types are used to type object entities and interfaces with a structure. For example, AccountingObjectCheckMessage message 107000 includes, among other things, AccountingObjectCheck 107004. Accordingly, heterogeneous applications may communicate using this consistent message configured as such.

FIGS. 108-1 through 108-3 illustrate one example logical configuration of AccountingObjectCheckMessage message 108000. Specifically, this figure depicts the arrangement and hierarchy of various components such as one or more levels of packages, entities, and datatypes, shown here as 108000 though 108092. As described above, packages may be used to represent hierarchy levels. Entities are discrete business elements that are used during a business transaction. Data types are used to type object entities and interfaces with a structure. For example, AccountingObjectCheckMessage message 108000 includes, among other things, AccountingObjectCheck 108026. Accordingly, heterogeneous applications may communicate using this consistent message configured as such.

Message types AccountingObjectCheckRequest and AccountingObjectCheckConfirmation can be derived from the operations of the AccountingCodingBlockDistribution business object and their signatures. The signature of the business object contains that business object as the "leading" business object. In the scenario Service Procurement for Projects, a service employee enters the number of working hours spent working on a task, wherein a task is part of a project. The operation Check Coding Block can check this task and provide additional information for this task, such as the project to which the task belongs and the project description.

In some implementations, message type AccountingObjectCheckRequest is a request to check whether one or more accounting objects can exist and whether they are permitted for assignment. The accounting objects originate from the coding blocks contained in the dependent object AccountingCodingBlockDistribution. In such implementations, the structure of this message type is determined by message data type AccountingObjectCheckMessage, described below. This message type can be used in operations of business objects, including AccountingCodingBlockDistribution and its subset CheckCodingBlockSubset.

In some implementations, message type AccountingObjectCheckConfirmation confirms that one or more accounting objects exist and that they are permitted for assignment. In such implementations, the structure of this message type is determined by the message data type AccountingObjectCheckMessage, described below. This message type can be used in operations of business objects, including AccountingCodingBlockDistribution and its subset CheckAccountingObject.

Message data type AccountingObjectCheckMessage can contain the object AccountingObjectCheck contained in the business document and can contain business information that is relevant for sending a business document in a message. Message data type AccountingObjectCheckMessage can contain a MessageHeader package and an AccountingObjectCheckPackage. In this way, this message data type can provide the structure for message types AccountingObjectCheckRequest and AccountingObjectCheckConfirmation and the operations that are based on them.

A MessageHeader package can be a grouping of business information that is relevant for sending a business document in a message and can contain a MessageHeader. A Message- Header can be a grouping of business information from the perspective of the sending application, including identification of the business document in a message, information about the sender, and optionally information about the recipient. MessageHeader can contain a SenderParty and a RecipientParty. MessageHeader can be of type GDT: BusinessDocumentMessageHeader, whereby the ID and ReferenceID elements of the GDT are used. SenderParty can be the partner responsible for sending a business document at business application level and can be of type GDT: BusinessDocumentMessageHeaderParty. RecipientParty can be the partner responsible for receiving a business document at business application level and can be of type GDT: BusinessDocumentMessageHeaderParty.

An AccountingObjectCheck package can be a grouping of the AccountingObjectCheck with its AccountingObjectCheckItem package. In some implementations, there are no integrity conditions with message type AccountingObjectCheckRequest, while for message type AccountingObjectCheckConfirmation, the elements of an AccountingObjectCheck package represent header information that may be relevant for the check; however, these elements do not affect the synchronous answer in the message type CheckConfirmationAccountObjectCheckConfirmation and consequently must not be used there.

An AccountingObjectCheck can be a check of a distribution of coding blocks (see, for example, business object AccountingCodingBlockDistribution/node AccountingCodingBlockDistribution). The constraint can require that each coding block can contain one element, an AccountingObject (see for example, business object AccountingCodingBlockDistribution/node AccountingCodingBlockDistribution). The elements contained can be used for the check on whether the contained accounting objects are permitted for assignment, and include ValidityDate, having a cardinality relationship of 1:1; CompanyID, having a cardinality relationship of 1:1; UserAccountID, having a cardinality relationship of 0:1; and LanguageCode, having a cardinality relationship of 0:1. In some implementations, for message type AccountingObjectCheckRequest the elements must be filled, while for message type AccountingObjectCheckConfirmation, the elements may not be used.

An AccountingObjectCheckItem Package can be a grouping of anAccountingObjectCheckItem with its packages BusinessTransactionDocumentReferences and Log. AccountingObjectCheckItem can be an accounting object from the coding block of an AccountingCodingBlockDistribution, together with its identification, textual information, and details regarding permission for assignment, and can contain the elements ID having a cardinality relationship of 1:1, and ProjectResponsibleEmployeeID having a cardinality relationship of 0:1.

A BusinessTransactionDocumentReference package can be a grouping for BusinessTransactionDocumentReference. In some implementations, there are no integrity conditions with message type AccountingObjectCheckRequest or message type AccountingObjectCheckConfirmation. BusinessTransactionDocumentReference can be a reference to an accounting object. In some implementations, only one element of the package may be filled at a time so that its reference to the Log package may be unique. BusinessTransactionDocumentReference can contain the element ProjectReference having a cardinality relationship of 0:1.

A Log package can be a grouping for a Log. In some implementations, there are no integrity conditions with message type AccountingObjectCheckConfirmation, but the elements of the Log packages represent information from the reply message and consequently must not be used in the request message. Log can be messages for the accounting object that relate to whether it is permitted for assignment, and can contain the element Log having a cardinality relationship of 0:1.

Message data type AccountingObjectCheckMessage can use data types BusinessDocumentMessageHeader, BusinessDocumentMessageID, BusinessProcessVariantTypeCode, BusinessTransactionDocumentItemID, BusinessTransactionDocumentReference, CompanyID, DateTime, Date, EmployeeID, LanguageCode, Log, ProjectReference, and UserAccountID.

Business Object Template Activity

Figures 1, 109:
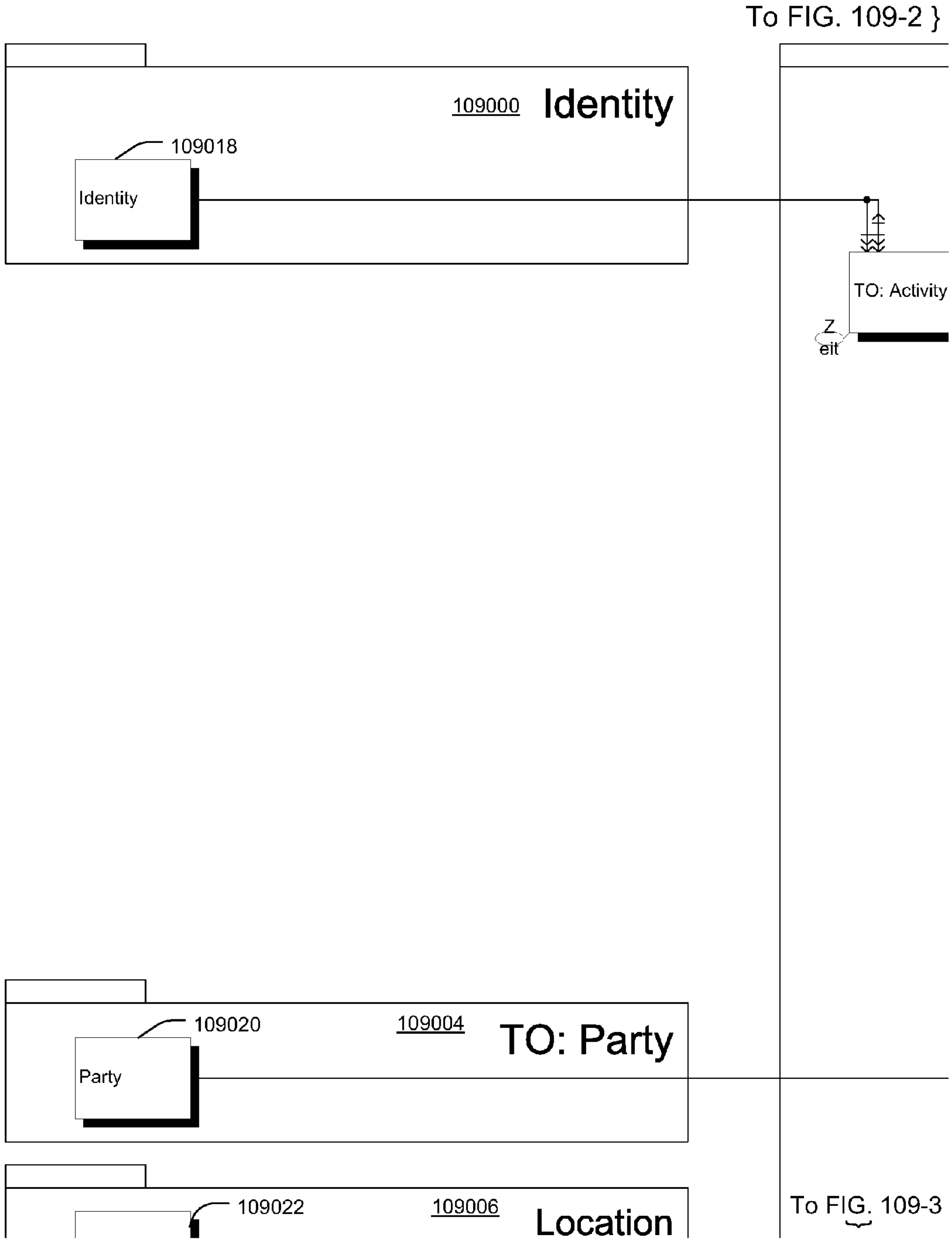
Figures 2, 109:
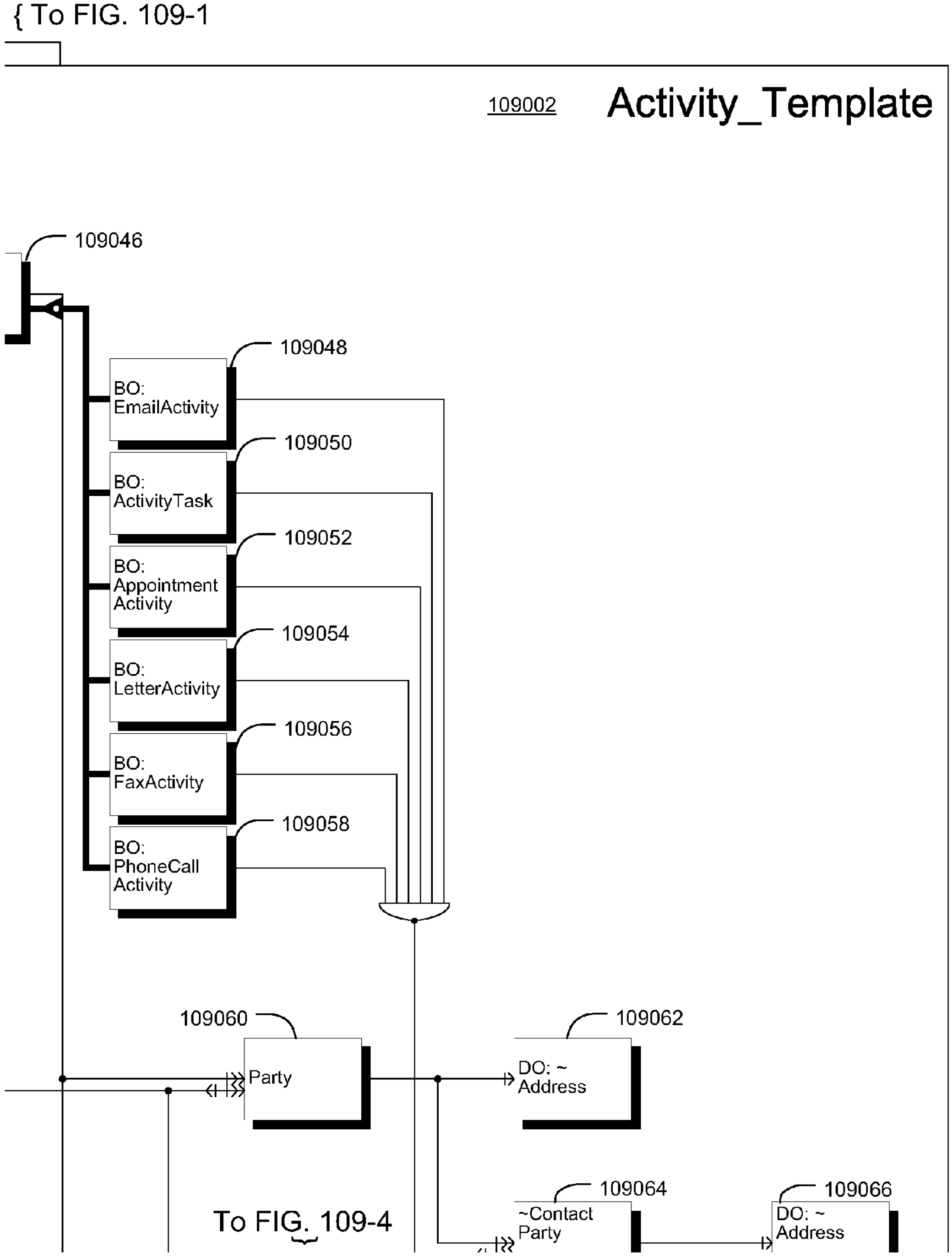
Figures 3, 109:
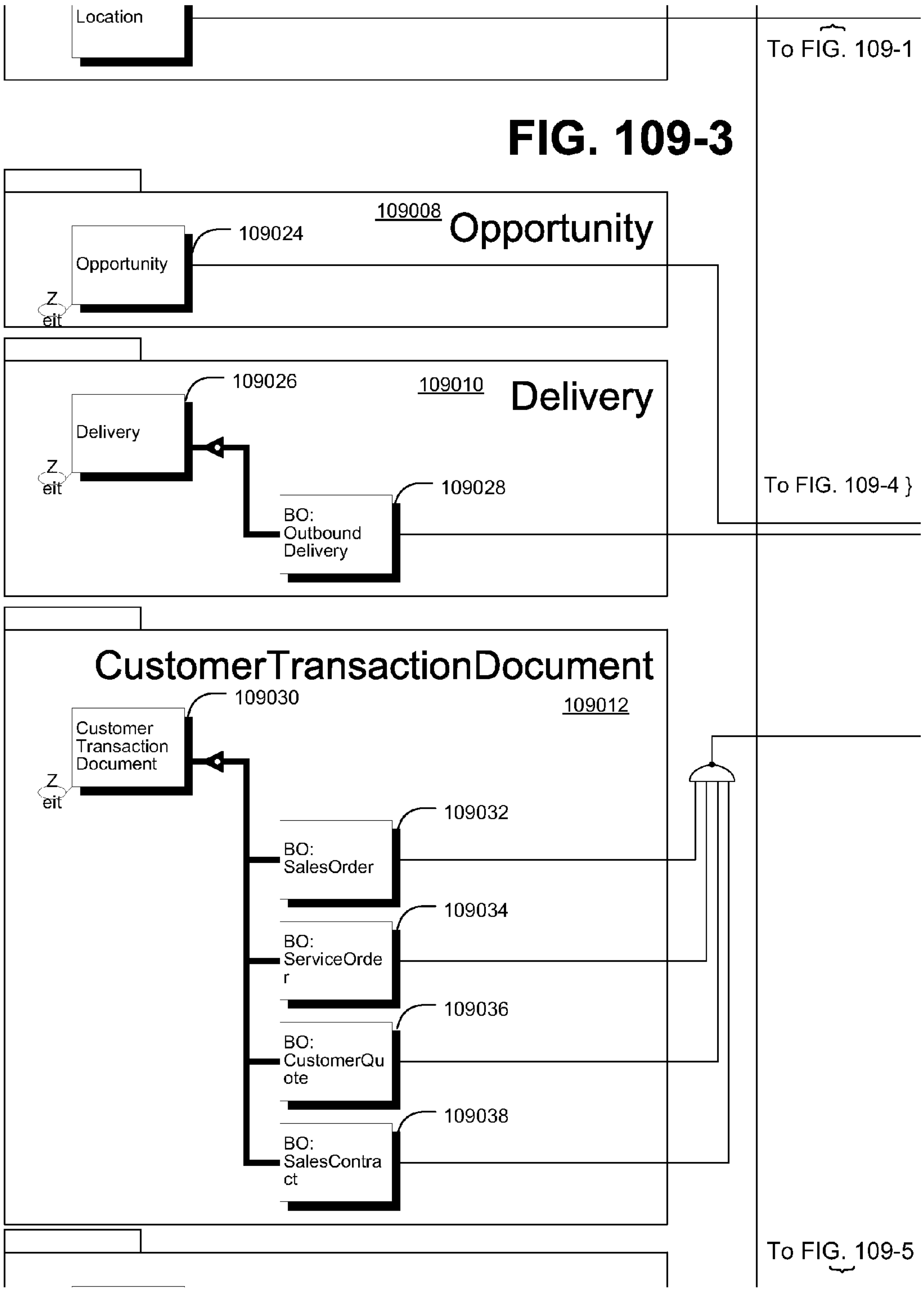
Figures 4, 109:
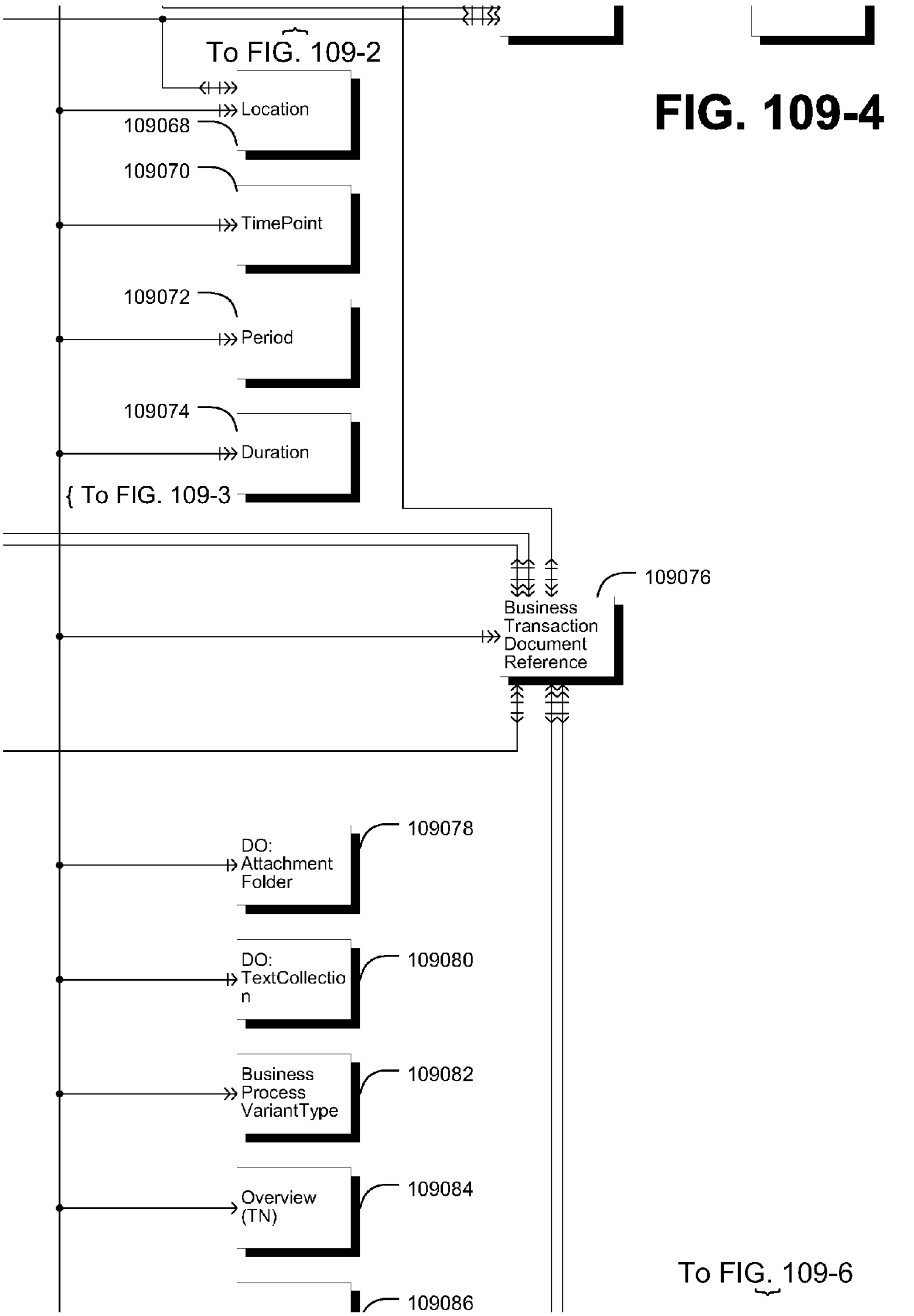
Figures 5, 109:
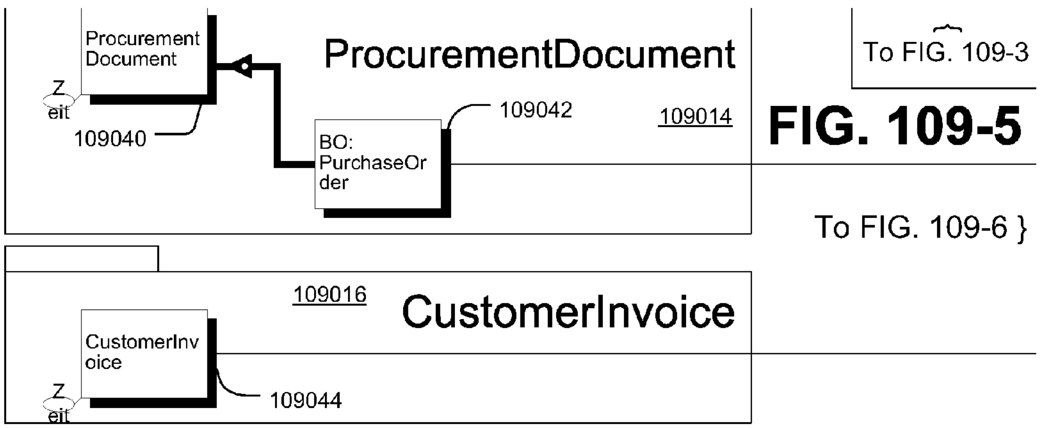
Figures 6, 109:
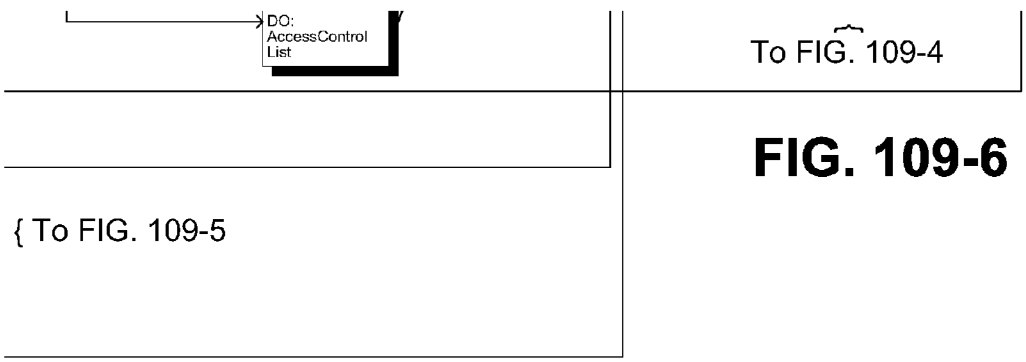

FIGS. 109-1 through 109-6 illustrate an example Activity_Template business object model 109002. Specifically, this model depicts interactions among various hierarchical components of the Activity_Template, as well as external components that interact with the Activity_Template (shown here as 109000 through 109044).

An Activity template can be a template for all business transaction documents within Activity Management which represents interactions and tasks undertaken by employees on behalf of their company. The Activity Template itself may not be a business object in a business sense. That is, it may not be included in the business object map and may not be used in any process component as a business object. In particular, it may not be able to be instantiated. It can be used to ensure the consistency, integrity, and reusability of the business objects that are derived from the Activity Template.

The following business objects can be derived from the Activity_Template 109046 using projection, for example—AppointmentActivity 109052, EmailActivity 10948, LetterActivity 109054, FaxActivity 109056, PhoneCallActivity 109058, Activity (TO) and ActivityTask 109050.

Business objects can be derived from the "Activity_Template" which can be a part of the "Activity Management" process component. An Activity may contain one or more parties that are either involved in the Activity or are the subject of the Activity, and could contain one or more locations where the Activity takes place.

Service Interfaces

InteractiveFormActivityReport may be derived from BO Template ActivityTemplate which can be used for front-end-printing the message type.

Business Object Activity Template Node Structure

Root Node of the Business Object Activity_Template

An Activity can be an interaction or task, used in Activity Management, undertaken by employees on behalf of their company. In general, an Activity may contain information about the business partner involved and the date on which it can take place. An Activity can be, but does not have to be private in nature. An Activity may contain the priority, the sensitivity, the category of an Activity, and at least one party that may be involved in the Activity. If applicable, the Activity can also contain locations and attachments that can be assigned to it, and provide detailed information on the Activity and a reference to a business document that may provide the business context of the Activity. For example, the customer has questions concerning sales order 4711.

The elements located directly at the root node Activity can be defined by the data type ActivityElements. UUID can be the internal assigned UUID of an Activity on which other business objects can define foreign keys. This may be based on GDT: UUID. This element is an alternative key. ID can be a unique identifier for an Activity, assigned by the user. This may be based on GDT: BusinessTransactionDocumentID. This element is an alternative key. TypeCode can be a coded representation of an Activity type, or of a business object projected from this type. In some implementations, only those codes are permitted that stand for the business objects AppointmentActivity, EmailActivity, LetterActivity, FaxActivity and PhoneCallActivity. This may be based on GDT: BusinessTransactionDocumentTypeCode. ProcessingTypeCode can be a coded representation of Activity processing within the process component. This may be based on GDT: BusinessTransactionDocumentProcessingTypeCode. Name can be a Name of an Activity. This may be based on GDT: ExtendedName. This element can be optional. SystemAdministrativeData can be the administrative data recorded by the system. This data includes system users and change dates/times. This may be based on GDT: SystemAdministrativeData. PriorityCode can be the priority of an Activity. In some implementations, only codes 1.3 and 7 are permitted. This may be based on GDT: PriorityCode. This element is optional. Initiator Code can be a coded representation of whether the Activity was initiated inside or outside a company. This may be based on GDT: ActivityInitiator Code. This element is optional. MessageFromName can be a brief description of an Activity assigned by sender (your reference). This may be based on GDT: Language-independent _Medium_Name, Qualifier MessageFrom. This element is optional. InformationSensitivityCode can define the confidentiality level of an Activity. This may be based on GDT: InformationSensitivityCode. This element is optional. GroupCode can specify the group of activities to which the Activity is assigned. This may be based on GDT: ActivityGroupCode. This element is optional. DataOriginTypeCode can be a coded representation of where the data originates. The type of source of a customer-specific transaction document provides the technical source of a transaction document, for example, a technical system in which the transaction document was created. This may be based on GDT: ActivityDataOriginTypeCode. This element is optional. CompletionPercent can be the degree of completion expressed as a percentage. This may be based on GDT: SMALLNONNEGATIVEINTEGER_Percent, Qualifier: Completion. This element is optional. ReportedDateTime can be the time point at which the Activity is reported. The ReportedTimePoint is the time point that corresponds with the ScheduledPeriod-TimePointPeriod-StartTimePoint for AppointmentActivities, PhoneCallActivities and ActivityTasks, and that corresponds with the SentTimePoint-TimePoint or ReceiptTimePointTimePoint for EmailActivities, LetterActivities and FaxActivites. This may be based on GDT: GlobalDateTime, Qualifier: Reported. This element is optional. Status can be a current step in the life cycle of the root node. This element is optional. LifeCycleStatusCode may represent the life cycle of an Activity. This may be based on GDT: ActivityLifeCycleStatusCode. This element is optional. CorrespondenceTransmissionStatusCode may specify whether an Activity has been sent or received. This may be based on GDT: ActivityCorrespondenceTransmissionStatusCode. This element is optional.

The ID may not be able to be changed once it has been created. The TypeCode can be determined by the system and may not be able to be set using an interface. The ProcessingTypeCode may not be able to be changed once it has been created. The SystemAdministrativeData can be set internally by the system. Data may not be able to be assigned or changed externally. A limited value range can be permitted for the PriorityCode. In some implementations, the codes of 1, 3 or 7 are permitted.

Party 109060, Location 109068, TimePoint 109070, Period 108072, Duration 109074 and BusinessTransactionDocumentReference 109076 can have a 1:cn composition relationship to subordinate nodes. DO: Attachment Folder 109078 and DO: Text Collection 109080 can have a 1:c relationship to subordinate nodes. Overview 109 084 and DO: AccessControlList 109086 can have a 1:1 relationship with subordinate nodes. BusinessProcessVariantType 108082 can have a 1:n relationship with subordinate nodes.

CreationIdentity, which can be an identity that has created an activity can have a 1:cn inbound association relationship with a root node. LastChangedIdentity, which can be an identity that has changed an activity can have a c:cn inbound association relationship with a root node.

AppointmentActivity has a cardinality relationship of 1:c and can be an AppointmentActivity referenced by the Activity (TO). EmailActivity has a cardinality relationship of 1:c and can be an EmailActivity referenced by the Activity (TO). FaxActivity has a cardinality relationship of 1:c, and can be referenced by the Activity (TO). LetterActivity has a cardinality relationship of 1:c and can be referenced by the Activity (TO). PhoneCallActivity has a cardinality relationship of 1:c and can be referenced by the Activity (TO). ActivityTask has a cardinality relationship of 1:c and can be referenced by the Activity (TO). On the BusinessProcessVariantType node, MainBusinessProcessVariantType has a cardinality relationship of 1:1 and can specifies the main BusinessProcessVariantType. On the Party node, ActivityParty has a cardinality relationship of 1:cn and can be the Party in the Activity Party specialization. MainActivityParty has a cardinality relationship of 1:c and can be the Party in the MainActivity Party specialization AttendeeParty has a cardinality relationship of 1:cn and can be the Party in the Attendee Party specialization. MessageToParty has a cardinality relationship of 1:cn and can be the Party in the MessageTo Party specialization. MessageFromParty has a cardinality relationship of 1:c and can be the Party in the Message From Party specialization. CopyMessageToParty has a cardinality relationship of 1:cn and can be the Party in the Copy Message To Party specialization. BlindCopyMessageToParty has a cardinality relationship of 1:cn and can be the Party in the Blind Copy Message To Party specialization OrganizerParty has a cardinality relationship of 1:c and can be the Party in the Organizer Party specialization. ReferenceParty has a cardinality relationship of 1:cn and can be the Party in the Reference Party specialization. ActivityUnitParty has a cardinality relationship of 1:c and can be the Party in the Activity Unit Party specialization. CommunicationParty has a cardinality relationship of 1:c and can be the Party in the Communication Party specialization. EmployeeResponsibleParty has a cardinality relationship of 1:c and can be the Party in the Employee Responsible Party specialization. MainMessageToParty has a cardinality relationship of 1:c and can be the Main party in MessageTo Party specialization. MainAttendeeParty has a cardinality relationship of 1:c and can be the Main party in the Attendee Party specialization. Processor Party has a cardinality relationship of 1:c and can be the Party in the Processor Party specialization.

At the TimePoint node, SentTimePoint has a cardinality relationship of 1:c and can be the Time point in the Sent Time Point specialization. ReceiptTimePoint has a cardinality relationship of 1:c and can be the Time point in the Receipt Time Point specialization. At the Period, ScheduledPeriod has a cardinality relationship of 1:c and can be the Period in the Scheduled Period specialization. At the TextCollectionText node, ActivityBodyTextCollectionText has a cardinality relationship of 1:c. ActivityBodyTextCollectionText is a long text that contains the body for an Activity. On the Location node, MainLocation has a cardinality relationship of 1:c and can be the Main location in the location specialization. At the BusinessTransactionDocumentReference node, ActivityBusinessTransactionDocumentReference has a cardinality relationship of 1:cn and can provide a reference to the business objects AppointmentActivity, EmailActivity, LetterActivity, FaxActivity and PhoneCallActivity that are linked to an Activity. OtherBusinessTransactionDocumentReference has a cardinality relationship of 1:cn and can provide a reference to all other business objects like CustomerQuote, Opportunity, SalesOrder, ServiceOrder, SalesContract, PurchaseOrder, OutboundDelivery and CustomerInvoice that are linked to an Activity.

Association for Navigation

From business object BusinessDocumentFlow/node root node, BusinessDocumentFlow has a c:cn cardinality relationship and can specify an association relationship to all business objects that use an Activity in a business process.

Enterprise Service Infrastructure Actions

CreateWithReference may create an Activity with reference to an existing document, from which the relevant data is transferred. AddReferenceWithDataProvision may create a BusinessTransactionDocumentReference in an Activity, and can provide the Activity with data from the referenced document. Prerequisites can be the ESI action which can be executed at all times. Changes to the object: can be the ESI action which can generate a new Activity. The action elements may be defined by the data type: Activity AddReferenceWithDataProvisionActionElements. These elements are ID and TypeCode. ID may be based on GDT: BusinessTransactionDocumentID. TypeCode may be based on GDT: BusinessTransactionDocumentTypeCode. Use: can be the "Use" of the ESI action which may not be subject to constraints. CreateFromBusinessPartner may create an Activity with the provided Business Partner as the main Activity Party. CreateFromBusinessPartnerContact may create an Activity with the provided Business Partner Contact and the Business Partner derived from the Business Partner Contact. Reopen can be an S&AM Action. This action sets the LifeCycleStatus of an Activity back to the initial status. Process can be an S&AM Action. This action sets the LifeCycleStatus to "In Process". The Activity can be processed afterwards. Complete can be an S&AM Action. This action closes the processing of an Activity. Send can be an S&AM Action. This action sends an Activity. The communication channel can be selected according the type of the Activity for sending activities. For example, an EmailActivity can be sent as e-mail. NotifyOfSending can be an S&AM Action. This action informs an Activity that it has already been sent. NotifyOfReception can be an S&AM Action. This action informs an Activity that receipt has taken place. QueryByElements returns a list of all opportunities (root node) searched for an ID, name, start date, expected processing date, success probability, expected sales volume, sales cycle, phase or party. EmployeeResponsibleParty can be a party in the specialization ProspectParty or a status. The query elements may be defined by the data type ActivityElementsQueryElements. These elements are ID, which may be based on GDT: BusinessTransactionDocumentID. This element is optional. TypeCode may be based on GDT: BusinessTransactionDocumentTypeCode. This element is optional. ProcessingTypeCode may be based on GDT: BusinessTransactionDocumentProcessingTypeCode. This element is optional. Name may be based on GDT: ExtendedName. This element is optional. PriorityCode may be based on GDT: PriorityCode. This element is optional. Initiator Code may be based on GDT: ActivityInitiator Code. This element is optional. MessageFromName may be based on GDT: Language-independent MediumName. This element is optional. InformationSensitivityCode may be based on GDT: InformationSensitivityCode. This element is optional. GroupCode may be based on GDT: ActivityGroupCode. This element is optional. DataOriginTypeCode may be based on GDT: ActivityDataOriginTypeCode. This element is optional. SystemAdministrativeData may be based on GDT: SystemAdministrativeData. This element is optional. PartyRoleCode can be the role of a party that occurs in an Activity. may be based on GDT: PartyRoleCode. This element is optional. PartyPartyID can be the identification of a party that occurs in an Activity. This may be based on GDT: PartyID. This element is optional. PartyName can be the name of a party that occurs in an Activity. This may be based on GDT: LongName. This element is optional. PartyActivityPartyCityName can be determined using the address of the business partner that occurs in the ActivityParty specialization. This may be based on GDT: GDT: _LANGUAGEINDEPENDENT_MEDIUM_Name. This element is optional. PartyActivityPartyPostalCode can be determined from the address of the business partner that occurs in the ActivityParty specialization in the Activity. This may be based GDT: PostalCode. This element is optional. CreationBusinessPartner_CommonPersonNameGivenName can be the first name of the person who has created the Activity. This may be based on GDT: MediumName. This element is optional. CreationBusinessPartner_CommonPersonNameFamilyName can be the last name of the person who has creates the Activity. This may be based on GDT: MediumName. This element is optional. LastChangeBusinessPartner_CommonPersonNameGivenName can be the first name of the person who has changed the Activity. This may be based on GDT: MediumName. This element is optional. LastChangeBusinessPartner_CommonPersonNameFamilyName can be the last name of the person who has changed the Activity. This may be based on GDT: MediumName. This element is optional. ActivityPartyID can be the identifier of a party in an Activity. This may be based on GDT: PartyID. This element is optional. EmployeeResponsiblePartyID can be the identifier of a Employee responsible assigned to a party for an Activity. This may be based on GDT: PartyID. This element is optional. ReportedDateTime can be the time point at which the Activity is reported. This may be based on GDT: GlobalDateTime. This element is optional. Status may contain the LifeCycleStatus and TransmissionStatus of an Activity. This element is optional. The composition's property for Overview node Enabled-Attribute_value can be set to False and EnabledFinal set to True. All business objects in Activity Management can be synchronized with objects in groupware systems. In groupware systems a much greater length for the description is supported. MS Outlook with 255 characters is supported. Lotus Notes with significantly more than 255 characters is supported. In order to avoid any loss of information when mapping to the element Description, the content is also saved to a TextCollection node.

Party (Using Party Template)

A party that participates in an Activity can be a business partner, a business partner in the specialized business objects, Customer, Supplier, and Employee, an organizational center in the specialized business objects ActivityUnitParty, an address (master data address of a party; or of a party without business partner master data), and a party without master data, if the party does not exist as a BusinessPartner or an OrganisationalCentre.

A Party node can be used in the following incomplete and non-disjoint specializations. ActivityParty can be a party to which an Activity has been assigned. It may express the relationship of the Activity to a business partner. For example, all assigned Activities appear in the interaction history for the Activity Party. AttendeeParty can be a party that is requested as a participant on a specific date. MessageToParty can be a MessageRecipientParty which can be a party to which a message is sent. MessageFromParty can be a party that sends a message. CopyMessageToParty can be a party that receives a copy of a message. BlindCopyMessageToParty can be a party that receives a copy of a message, without other recipients being informed of this. OrganizerParty can be a party responsible for an Activity document. This identifier corresponds to the organizer as defined in the iCalendar standard. ReferenceParty can be a party that is relevant to the current Activity but does not play an active role in it. ActivityUnitParty can be an organizational unit to which an Activity is assigned. CommunicationParty can be a party that is a participant of real-time communication (for example, phone call, Internet chat). EmployeeResponsibleParty can be a party that is responsible for an Activity. Processor Party can be a party that processes an Activity.

The Party node can be defined by the Activity PartyElements data type, which may contain the following elements. PartyID can be the identifier of a party within a business document or master data object. This may be based on GDT: PartyID. This element is optional. PartyUUID can be the unique identifier for the business partner, the organizational unit or their specializations. This may be based on GDT: UUID. This element is optional. PartyTypeCode can be the type of party referenced by the attribute PartyUUID. This may be based on GDT: BusinessObjectTypeCode. This element is optional. RoleCategoryCode can be the category of the PartyRole in the business document. This may be based on GDT: PartyRoleCategoryCode. This element is optional. RoleCode can be PartyRoleCode which can be the role of a party in the business document. This may be based on GDT: PartyRoleCode. This element is optional. AddressReference can be the unique reference to an address of a party. This may be based on GDT: PartyAddressReference. This element is optional. DeterminationMethodCode can be the coded representation of the party determination method. This may be based on GDT: PartyDeterminationMethodCode. This element is optional. MainIndicator can indicate whether or not a party is emphasized in a group of parties with the same PartyRole. This may be based on GDT: Indicator, Qualifier PartyMain. This element is optional. Name can be the description for a party. This may be based on GDT: LongName. This element is optional. The following composition relationships to subordinate nodes exist. PartyContactParty 109064 has a cardinality relationship of 1:cn. DO: PartyAddress 109062 has a cardinality relationship of 1:c. There can be inbound aggregation relationships from business object party to the node Root node. Party (TO) has a cardinality relationship of c:cn. Party is a party that is involved in an Activity. At the PartyContactParty node, MainPartyContactParty has a C:C cardinality relationship and can be an Association to the main contact person. From business object UsedAddress/node Root node, UsedAddress has a c:cn cardinality relationship and can be an address of a Party that is involved in an Activity. In some implementations, there may only be one aggregation relationship to the business partner, the organizational unit, or their specializations. In some implementations, if the PartyUUID exists, the PartyTypeCode must exist as well. Only one association can exist for the address. This address is a master data address of the business partner, organizational unit, or their specializations referenced by PartyUUID.

PartyContactParty

The PartyContactParty may be a natural person or an organizational unit that can be contacted for the respective party. The contact can be a contact person, for example, a secretariat. Normally, the communication data can be available for the contact. The PartyContact node can be defined by the ActivityPartyContactElements data type, which may contain the following elements. PartyID can be the identifier of a contact within a business document or master data object. This may be based on GDT: PartyID. This element is optional. PartyUUID can be the unique identifier for the business partner, the organizational unit or their specializations. This may be based on GDT: UUID. This element is optional. PartyTypeCode can be the type of the business partner, organizational unit, or their specializations referenced by the attribute PartyUUID. This may be based on GDT: BusinessObjectTypeCode. This element is optional. AddressReference can be the unique reference to an address of a contact. This may be based on GDT: PartyAddressReference. This element is optional. DeterminationMethodCode can be the coded representation of the party determination method. This may be based on GDT: PartyDeterminationMethodCode. This element is optional. MainIndicator can indicate whether or not a contact is emphasized in a group of contacts. This may be based on GDT: Indicator, Qualifier PartyMain This element is optional. Name can be the description for a contact. This may be based on GDT: LongName. This element is optional. DO: PartyContactPartyAddress has a cardinality relationship of 1:c.

From business object Party/node Root node, Party (TO), which can be involved in an activity, has a c:cn cardinality relationship. From business object UsedAddress/node Root node, UsedAddress has a c:cn cardinality relationship and can be an address of a Party that is involved in an Activity. In some implementations, only one association can exist for the address. This address is a master data address of the business partner, organizational unit, or their specializations referenced by PartyUUID.

DO: PartyContactPartyAddress

The PartyContactPartyAddress 109066 may contain the document-specific address of a PartyContactParty. The node PartyContactPartyAddress can be defined by the DO Address.

DO: PartyAddress

The PartyAddress may contain the document-specific address of a Party. The node PartyAddress can be defined by the DO Address.

Location (Using Location Template)

The Location may identify the logical or physical place where an Activity takes place.

The Location node can be defined using the data type ActivityLocationElements which may contain the following elements. LocationID can be a unique identifier for a location. This may be based on GDT: LocationID. This element is optional. LocationUUID can be a universal unique identifier for a location. This may be based on GDT: UUID. This element is optional. AddressReference can be the unique reference to an address of a party. This may be based on GDT: LocationAddressReference. This element is optional. RoleCode can be a LocationRoleCode which can be the role of a location. This may be based on GDT: LocationRoleCode. This element is optional. RoleCategoryCode can be a LocationCategoryCode which can be the category of Location. This may be based on GDT: LocationRoleCategoryCode. This element is optional. DeterminationMethodCode can be the coded representation of the location determination method. This may be based on GDT: LocationDetermination- MethodCode. This element is optional. Name can be the description for a location. This may be based on GDT: LongName. This element is optional. Inbound aggregation relationships from business object Location/node Root node can include a Location cardinality relationship of c:cn. Location can be a Location that is involved in an Activity. Specialization Associations for Navigation from business object UsedAddress/node Root node can include a UsedAddress c:cn cardinality relationship. UsedAddress can be an Address of a Party that is involved in an Activity.

TimePoint

The TimePoint node can be the time point of an Activity. A TimePoint node can be used in the following complete and non-disjoint specializations: a SentTimePoint which can be the time point at which an e-mail, fax or letter is sent, and a ReceiptTimePoint which can be the time point at which an e-mail, fax or letter is received. The TimePoint node can be defined by the ActivityTimePointElements data type, which can be derived from the GDT TimePointElements, which may contain the following elements. TimePointRoleCode can be the role of the time point specified. This may be based on GDT: TimePointRoleCode. TimePoint can be the time point specified. The business role of the time point can be specified by the TimePointRoleCode. This may be based on GDT: TimePoint. DateCalculationFunctionReference, can be the reference to a function with which the time point is calculated. This may be based on GDT: DateCalculationFunctionReference. This element is optional.

Period

The Period node can be the period of an Activity. A Period node can be used in the following complete specialization. A ScheduledPeriod can be the scheduled time period of an appointment or the time period in which a phone call takes place. This element is optional. The Period node can be defined by the ActivityPeriodElements data type, which can be derived from the GDT PeriodElements, which may contain the following elements. PeriodRoleCode can be the role of the period specified. This may be based on GDT: PeriodRoleCode. TimePointPeriod can be the period specified. The business role of the period may be specified by the PeriodRoleCode. This may be based on GDT: TimePointPeriod. StartTimePointDateCalculationFunctionReference can be the reference to a function with which the start time point of the period is calculated. This may be based on GDT: DateCalculationFunctionReference. This element is optional. EndTimePointDateCalculationFunctionReference can be the reference to a function with which the end time point of the period is calculated. This may be based on GDT: DateCalculationFunctionReference. This element is optional. FullDayIndicator can be the specification whether a time point covers a full day or not. This may be based on GDT: Indicator, Qualifier FullDay. This element is optional.

Duration

The Duration node can be the duration of an Activity. The Duration node can be defined by the ActivityDurationElements data type, which can be derived from the GDT PeriodElements, which may contain the following elements. DurationRoleCode can be the role of the duration specified. This may be based on GDT: DurationRoleCode. Duration can be the duration specified. The business role of the duration may be specified by the DurationRoleCode. This may be based on GDT: Duration. DateCalculationFunctionReference can be the reference to a function with which the duration is calculated. This may be based on GDT: DateCalculationFunctionReference. This element is optional.

BusinessTransactionDocumentReference

The BusinessTransactionDocumentReference node may identify the link to a business document that, in a specified role, is related to an Activity in a business process. A Reference node can be used in the following complete and non-disjoint specializations. AppointmentActivityReference can be a reference to an AppointmentActivity document that, in a specified role, is related to the Activity in the Activity process. EmailActivityReference can be a reference to an EmailActivity document that, in a specified role, is related to the Activity in the Activity process. LetterActivityReference can be a reference to a LetterActivity document that, in a specified role, is related to the Activity in the Activity process. FaxActivityReference can be a reference to a FaxActivity document that, in a specified role, is related to the Activity in the Activity process. PhoneCallActivityReference can be a reference to a PhoneCallActivity document that, in a specified role, is related to the Activity in the Activity process. ActivityTaskReference can be a reference to an ActivityTask document that, in a specified role, is related to the Activity in the Activity process. CustomerQuoteReference can be a reference to the Customer Quote business document that, in a specified role, is related to the Activity in the Activity process. OpportunityReference can be a reference to the Opportunity business document that, in a specified role, is related to the Activity in the Activity process. SalesOrderReference can be a reference to the Sales Order business document that, in a specified role, is related to the Activity in the Activity process. ServiceOrderReference can be a reference to the Service Order business document that, in a specified role, is related to the Activity in the Activity process. SalesContractReference can be a reference to the Sales Contract business document that, in a specified role, is related to the Activity in the Activity process. PurchaseOrderReference can be a reference to the Purchase Order business document that, in a specified role, is related to the Activity in the Activity process. OutboundDeliveryReference can be a reference to the Outbound Delivery business document that, in a specified role, is related to the Activity in the Activity process. CustomerInvoiceReference can be a reference to the Customer Invoice business document that, in a specified role, is related to the Activity in the Activity process. The BusinessTransactionDocumentReference node can be defined by the data type ActivityBusinessTransactionDocumentReferenceElements that is derived from the data type BusinessTransactionDocumentReferenceElements. BusinessTransactionDocumentReference may contain the unique reference to a business document, or to an item in a business document. This may be based on GDT: BusinessTransactionDocumentReference. BusinessTransactionDocumentRelationshipRoleCode can be the role that an Activity adopts within a relationship to another business document or business document item. This may be based on GDT: BusinessTransactionDocumentRelationshipRoleCode. This element is optional. DataProviderIndicator can be the indicator that specifies whether or not an Activity stores additional data in a relationship to a business document. This may be based on GDT: Indicator, Qualifier: DataProvider. This element is optional. Inbound Association Relationships can exist from business object AppointmentActivity/node Root node. AppointmentActivity has an c:cn cardinality relationship and can be an Activity that references an AppointmentActivity. From business object EmailActivity/node Root node, EmailActivity has a c:cn cardinality relationship and can be an Activity that references an EmailActivity. From business object LetterActivity/node Root node, LetterActivity has a c:cn cardinality relationship and can be an Activity that references a LetterActivity. From business object FaxActivity/node Root node, FaxActivity has a c:cn cardinality relationship and can be an Activity that references a FaxActivity. From business object PhoneCallActivity/node Root node, PhoneCallActivity has a c:cn cardinality relationship.

From business object ActivityTask/node Root node, ActivityTask has a c:cn cardinality relationship. From business object Customer/node Root node, Customer Quote has a c:cn cardinality relationship An Activity can reference a CustomerQuote. From business object Opportunity/node Root nod, Opportunity has a c:cn cardinality relationship. An Activity can reference an Opportunity. From business object SalesOrder/node Root node, SalesOrder has a c:cn cardinality relationship. An Activity can reference a SalesOrder. From business object ServiceOrder/node Root node, ServiceOrder has a c:cn cardinality relationship. An Activity can reference a ServiceOrder. From business object SalesContract/node Root node, SalesContract has a c:cn cardinality relationship. An Activity can reference a SalesContract. From business object PurchaseOrder/node Root node, PurchaseOrder has a c:cn cardinality relationship. An Activity can reference a PurchaseOrder. From business object OutboundDelivery/node Root node, OutboundDelivery has a c:cn cardinality relationship. An Activity can reference an OutboundDelivery. From business object CustomerInvoice/node Root node, CustomerInvoice has a c:cn cardinality relationship. An Activity can reference a CustomerInvoice.

DO: Attachment Folder

The Attachment can be an electronic document of any type, the content of which relates to the Activity in question. An Attachment node can be used in the following incomplete and nondisjoint specialization: An EmailBodyAttachment can be the primary natural-language text of an EmailActivity. Together with the EmailBodyAttachment there can be several attachments. The association EmailBody may only exist for the business object EmailActivity. The AttachmentFolder node can be defined by the dependent object AttachmentFolder.

DO: Text Collection

The TextCollection can be a collection of texts in natural language with reference to an Activity. The Text node can be defined by the dependent object TextCollection.

BusinessProcessVariantType

The BusinessProcessVariantType can define the character of a business process variant of an Activity.

The node BusinessProcessVariantType can be defined by the GDT type ActivityBusinessProcessVariantTypeElements, that is derived from BusinessProcessVariantTypeElements (Template), and that contain the following elements. BusinessProcessVariantTypeCode can be the coded representation of a business process variant of an Activity. This may be based on GDT: BusinessProcessVariantTypeCode. MainIndicator can be the indicator that can specify whether the current BusinessProcessVariantTypeCode is the main variant or not. This may be based on GDT: Indicator; Qualifier: Main. The Activity can use the Standard Main PVT. In some implementations, only one instance of the BusinessProcessVariantType may be flagged as the main BusinessProcessVariantType.

Overview (Transformation Node)

The Overview can be a general view on the Activity Template. Overview may provide the information of the Activity at a first glance. The Query Response Node can be defined by the ActivityTemplateQueryResponseElements which contains the following elements. UUID can be internally assigned to UUID, an Activity which other business objects may define foreign keys. This may be based on GDT: UUID. TypeCode can be a coded representation of an Activity type, or of a business object projected from this type. In some implementations, restrictions: Only those codes are permitted that stand for the business objects AppointmentActivity, EmailActivity, LetterActivity, FaxActivity and PhoneCallActivity. This may be based on GDT: BusinessTransactionDocumentTypeCode. Name can be the Name of an Activity. This may be based on GDT: ExtendedName. This element is optional. LifeCycleStatus can represent the life cycle of an Activity. This may be based on GDT: ActivityLifeCycleStatus. This element is optional. ReportedDateTime can be the time point at which the Activity is reported. The ReportedTimePoint is the time point that corresponds with the ScheduledPeriod-TimePointPeriod-StartTimePoint for AppointmentActivities and PhoneCallActivities, and that corresponds with the SentTimePointTimePoint or ReceiptTimePoint-TimePoint for EmailActivities, LetterActivities and FaxActivites. This may be based on GDT: GlobalDateTime, Qualifier: Reported. This element is optional. GroupCode may specify the group of activities to which the Activity is assigned. This may be based on GDT: ActivityGroupCode. This element is optional. PriorityCode can be the priority of an Activity. In some implementations, only codes 1, 3 and 7 are permitted. This may be based on GDT: PriorityCode. This element is optional. MainActivityPartyID can be the identifier of a party in an Activity. This may be based on GDT: PartyID. This element is optional. MainActivityPartyUUID can be the unique identifier for the business partner, the organizational unit or their specializations in an Activity. This may be based on GDT: UUID. This element is optional. MainActivityPartyPartyTypeCode can be the type of the business partner, organizational unit, or their specializations referenced by the attribute PartyUUID in an Activity. This may be based on GDT: PartyTypeCode. This element is optional. MainActivityPartyFormattedName can be the formatted name for a party in an Activity. From TO party, node Name, element FormattedName. This may be based on GDT: LANGUAGEINDEPENDENT_LONG_Name. This element is optional. MainActivityPartyFormattedPostalAddressDescription can be the formatted postal description for a party in an Activity. From TO party, node FormattedAddress, element FormattedName. This may be based on GDT: LANGUAGEINDEPENDENT_MEDIUM_Description. This element is optional. EmployeeResponsiblePartyID can be the identifier of a Employee responsible assigned to a party for an Activity. This may be based on GDT: PartyID. This element is optional. EmployeeResponsiblePartyUUID can be the unique of a Employee responsible assigned to a party for an Activity. This may be based on GDT: UUID. EmployeeResponsiblePartyPartyTypeCode can be the type of a Employee responsible assigned to a party for an Activity. This may be based on GDT: PartyTypeCode. This element is optional. EmployeeResponsiblePartyFormattedName can be the formatted name of a Employee responsible assigned to a party for an Activity. From TO party, node name, element FormattedName. This may be based on GDT: LANGUAGEINDEPENDENT_LONG_Name. This element is optional. EmployeeResponsiblePartyFormattedPostalAddressDescription can be the formatted postal description of an Employee responsible assigned to a party for an Activity. From TO party, node FormattedAddress, element FormattedName. This may be based on GDT: LANGUAGEINDEPENDENT_MEDIUM_Description. This element is optional. In some implementations, this node shall not be create enabled, update enabled or delete enabled. QueryByElements can be as modeled for the Root node.

DO: AccessControlList

The AccessControlList can be a list of access groups that have access to an Activity. The AccessControlList node can be defined by the dependent object AccessControlList.

Derived Business Objects

The following business objects may be derived from the "Activity Template" using projection—AppointmentActivity, EmailActivity, LetterActivity, FaxActivity, PhoneCallActivity and ActivityTask.

AppointmentActivity

The appointment can be a type of Activity in Activity Management that can be, but does not have to be planned, and that can be maintained in an employee's calendar. This includes external appointments and scheduled meetings with other business parties. An appointment typically may contain information regarding the business partner involved, the date on which it is to take place, and whether it is related to business, or private in nature. The business object AppointmentActivity can be a part of the process component Activity Management.

EmailActivity

The e-mail can be a type of Activity in Activity Management that contains information communicated via the Internet or an internal Groupware server. E-mails may include texts and attachments, and can also be sent automatically to a large number of addresses. The business object EmailActivity can be a part of the process component Activity Management.

LetterActivity

The LetterActivity can be a type of Activity in Activity Management that records messages, written on paper by employees on behalf of their company. The business object LetterActivity can be a part of the process component Activity Management.

FaxActivity

The FaxActivity can be a type of Activity in Activity Management that contains documents or graphics transmitted via a telecommunications facility by employees on behalf of their company. The business object FaxActivity can be a part of the process component Activity Management.

PhoneCallActivity

The PhoneCallActivity can be a type of Activity in Activity Management that records communication between employees and other persons, for example, business partners or colleagues. The business object PhoneCall can be a part of the process component Activity Management.

Activity (TO)

The Activity TO may provide a structured view of activities of various types in order to plan and document all actions and interactions related to business partners. The business object Activity can be a part of the process component "Activity Management." Create or edit may not be allowed for Activity TO.

ActivityTask

The ActivityTask can be used in Activity Management which contains information about anything an employee needs to do within a certain time frame, and which can be related to a business partner. The business object Activity can be a part of the process component "Activity Management".

Root Node for Derived Business Objects

In some implementations, the matrix below may show the use of the individual structure elements of the root node in the respective business object.

| Structure Elements | Appointment Activity | Email Activity | Fax Activity | Letter Activity | Phone Call Activity | Activity Task | Activity (TO) |
|---|---|---|---|---|---|---|---|
| UUID | X | X | X | X | X | X | X |
| ID | X | X | X | X | X | X | X |
| TypeCode | X | X | X | X | X | X | X |
| ProcessingTypeCode | X | X | X | X | X | X | X |
| Name | X | X | X | X | X | X | X |
| SystemAdministrativeData | X | X | X | X | X | X | X |
| PriorityCode | X | X | X | X | X | X | X |
| InitiatorCode | X | X | X | X | X | X | X |
| MessageFromName | X | X | X | X | X | X | X |
| InformationSensitivity Code | X | X | X | X | X | X | X |
| GroupCode | X | X | X | X | X | X | X |
| DataOriginTypeCode | X | X | X | X | X | X | X |
| CompletionPercent | | | | | | X | |
| ReportedDateTime | X | X | X | X | X | X | X |

Nodes and Specialization Associations

In some implementations, the following matrix may list the use of the nodes and associations in the respective business objects.

| Node/Specializations | Appointment Activity | Email Activity | Fax Activity | Letter Activity | Phone Call Activity | Activity Task | Activity (TO) |
|---|---|---|---|---|---|---|---|
| Party | X | X | X | X | X | X | X |
| ActivityParty | X | X | X | X | X | X | X |
| MainActivityParty | X | X | X | X | X | X | X |
| AttendeeParty | X | | | | | | |
| MainAttendeeParty | X | | | | | | |
| MessageToParty | | X | X | X | | | |
| MainMessageToParty | | X | X | X | | | |
| MessageFromParty | | X | X | X | | | |
| CopyMessageToParty | | X | | | | | |
| BlindCopyMessageToParty | | X | | | | | |

-continued

| Node/Specializations | Appointment Activity | Email Activity | Fax Activity | Letter Activity | Phone Call Activity | Activity Task | Activity (TO) |
|---|---|---|---|---|---|---|---|
| OrganizerParty | X | | | | | | |
| Reference Party | X | X | X | X | X | X | X |
| ActivityUnitParty | X | X | X | X | X | X | X |
| CommunicationParty | | | | | X | | |
| EmployeeResponsibleParty | X | X | X | X | X | X | X |
| MainPartyContactParty | X | X | X | X | X | X | X |
| ProcessorParty | | | | | | X | |
| PartyContactParty | X | X | X | X | X | X | X |
| Location | X | | | | | | |
| TimePoint | | X | X | X | | | |
| SentTimePoint | | X | X | X | | | |
| ReceiptTimePoint | | X | X | X | | | |
| Period | X | | | | | | |
| ScheduledPeriod | X | | | | | | |
| Duration | | | | | | | |
| BTDReference: | X | X | X | X | X | X | X |
| AttachmentFolder | X | X | X | X | X | X | |
| TextCollection | X | X | X | X | X | X | |
| ActivityBodyTextCollectionText | X | X | X | X | X | X | |
| BusinessProcessVariantType | X | X | X | X | X | X | X |
| Overview | X | X | X | X | X | X | X |
| AccessControlList | X | X | X | X | X | X | X |
| AppointmentActivity | | | | | | | X |
| EmailActivity | | | | | | | X |
| PhoneCallActivity | | | | | | | X |
| FaxActivity | | | | | | | X |
| LetterActivity | | | | | | | X |
| TaskActivity | | | | | | | X |

ESI Actions

In some implementations, the following matrix may list the use of the ESI associations in the respective business objects.

| ESI Actions | Appointment Activity | Email Activity | Fax Activity | Letter Activity | Phone Call Activity | Activity Task | Activity (TO) |
|---|---|---|---|---|---|---|---|
| CreateWithReference | X | X | X | X | X | X | |
| AddReferenceWithDataProvision | X | X | X | X | X | X | |
| CreateFromBusinessPartner | X | X | X | X | X | X | |
| CreateFromBusinessPartnerContact | X | X | X | X | X | X | |
| Reopen | X | X | X | X | X | X | |
| Process | X | X | X | X | X | X | |
| Complete | X | X | X | X | X | X | |
| Send | | X | X | | | | |
| NotifyOfSending | | X | X | X | | | |
| NotifyOfReception | | X | X | X | | | |

Queries

In some implementations, the following matrix may list the use of the Queries associations in the respective business objects.

| Queries | Appointment Activity | Email Activity | Fax Activity | Letter Activity | Phone Call Activity | Activity Task | Activity (TO) |
|---|---|---|---|---|---|---|---|
| QueryByElements | X | X | X | X | X | X | X |

InteractiveFormActivityVisitReportNotification

FIG. 110-1 through 110-21 illustrates one example logical configuration of InteractiveFormActivityVisitReportNotification message 110000. Specifically, this figure depicts the arrangement and hierarchy of various components such as one or more levels of packages, entities, and datatypes, shown here as 110000 through 110502. As described above, packages may be used to represent hierarchy levels. Entities are discrete business elements that are used during a business transaction. Data types are used to type object entities and interfaces with a structure. For example, LiquidityInformationMessage message 110000 includes, among other things, ActivityVisitReport 110040. Accordingly, heterogeneous applications may communicate using this consistent message configured as such.

Interfaces

The message can be used by an interface of Output Management.

Motivating Business Scenario

The CRM Activity Management can be about tracking the interactions between a company and it's customers to gain a benefit for the company as well as for its customers. In most companies sales and service representatives have to report on their business activities such as customer visits or ongoing opportunities. Therefore, the business goal of visit reporting in AIS is to support these sales and service employees with an easy to use visit reporting tool that will help them to deliver the required information to their sales and service managers.

Message Types

The output management scenario can be used to pass information used in generating Adobe print forms. As it can be a message tailored with respect to a service, the message type category "Notification" can be used and not any other messages requiring a request/response scenario, also as opposed to an "Information" message, which is not created for a specific usage.

InteractiveFormActivityReport

A InteractiveFormActivityReport can be used to send Activity related information to be used by Output Management to create Interactive Form used in Activity related scenarios. The structure of the message type InteractiveFormActivityReport can be specified by the message data type InteractiveFormActivityReportNotification. The InteractiveFormActivityReport structure can be created using the template as to create this specific form request.

Whenever an appointment is created a corresponding message payload is triggered internally which carries the Appointment related information to be pre-filled via the output management in an interactive form.

Message Data Type InteractiveFormActivityVisitReportNotification

The message data type InteractiveFormActivityVisitReportNotificationMessage may include the following: The Activity related information to be used for pre-filling and the business information that is relevant for sending a business document in a message. It may also contain the following packages: MessageHeader package and ActivityVisitReport package. This message can only be used by Appointment BO to transfer relevant information to be used by Output Management.

MessageHeader Package

The MessageHeader package may group the business information that is relevant for sending a business document in a message. It may contain the following entity: MessageHeader.

MessageHeader

The BusinessDocumentMessageHeader can comprise a business information from the perspective of the sender application for identifying and processing of a business document (instance) within a (technical) message (if applicable, with a reference to a previous instance of a business document within a previous (technical) message), information about the sender, and any information about the receiver.

In certain implementations, the BusinessDocumentMessageHeader may contain the following elements.

ID can be the identifier for the instance of the business document within a (technical) message that is generated by the business application level at the sender. ReferenceID can be the identifier of another instance of a business document in another (technical) message that the BusinessDocument references (a BusinessDocument can link to another BusinessDocumentMessage to represent a business interrelation or a dependency). CreationDateTime can be the exact date and time stamp (to the second) for when a message is created for the business document within the business application. TestDataIndicator can indicate if the business data contained in the message is test data or not. This element is optional and if omitted its default is "false". In some implementations, ReconciliationIndicator may not be defined. SenderParty can be the party that creates and sends the BusinessDocument at business application level. SenderParty contains a unique sender identification. The identifiers contained in SenderParty can also be used for internal forwarding at application level. The contact person in it contains the necessary direct contact information in case there are problems or errors during processing of the respective BusinessDocument. RecipientParty can be the party that receives and processes the BusinessDocument at business application level. RecipientParty contains a unique receiver identification. The identifiers contained in RecipientParty can also be used for internal forwarding at application level. The contact person in it contains the necessary direct contact information in case there are problems or errors during processing of the respective BusinessDocument. BusinessScopeBusinessProcess cannot be defined as this time (Translation pending).

ActivityVisitReport Package

The ActivityVisitReportPackage can group together ActivityVisitReport and its packages. It may contain the following packages: Party, Location, Period, TextCollection and Item. In certain implementations, the ActivityVisitReportPackage may contain the following elements. UUID can be a unique identifier for a object. The UUID may be based on GDT: UUID. ID can be a unique identifier for a Business Transaction document. The ID may be based on GDT BusinessTransactionDocumentID. ActionCode can be a coded representation of an instruction to the recipient of a message telling it how to process a transmitted element. The ActionCode may be based on GDT ActionCode. SystemAdministrativeData can be the administrative data recorded by the system. This data may include system users and change dates/times. The SystemAdministrativeData may be based on GDT SystemAdministrativeData. TypeCode can be a coded representation of an Activity type, or of a business object projected from this type. The TypeCode may be based on GDT BusinessTransactionDocumentTypeCode. TypeCodeName can be the short name associated with the BusinessTransactionDocumentTypeCode. The TypeCodeName may be based on GDT MediumName. TypeCodeDescription can be the description associated with the BusinessTransactionDocumentTypeCode. The TypeCodeDescription may be based on GDT LongDescription. ProcessingTypeCode can be a coded representation of Activity processing within the process component. The ProcessingTypeCode may be based on GDT BusinessTransactionDocumentProcessingTypeCode. ProcessingTypeCodeName can be the short name associated with the BusinessTransactionDocumentProcessingTypeCode. The ProcessingTypeCodeName may be based on GDT MediumName. ProcessingTypeCodeDescription can be the description associated with the BusinessTransactionDocumentProcessingTypeCode. The ProcessingTypeCodeDescription may be based on GDT LongDescription. Name can be the name used to characterise something. The Name may be based on GDT EXTENDED_Name. PriorityCode can be a coded representation of the ranking of a business transaction in terms of its urgency. The assignment of a priority may always creates a sequence, i.e., a unique predecessor-successor relationship always exists between the individual values of a priority and they can always be sorted uniquely. The PriorityCode may be based on GDT: PriorityCode. PriorityName can be the short name associated with the PriorityCode. The ProcessingTypeCodeName may be based on GDT MediumName. PriorityDescription can be the description associated with the BusinessTransactionDocumentProcessingTypeCode. The PriorityDescription may be based on GDT LongDescription.

Initiator Code can be a coded representation of whether the Activity was initiated inside or outside a company. The Initiator Code may be based on GDT ActivityInitiator Code. Initiator Name can be the short name associated with the Initiator Code. The ActivityInitiatorCodeName may be based on GDT MediumName. InitiatorDescription can be the description associated with the ActivityInitiator Code. The InitiatorDescription may be based on GDT LongDescription. MessageFromName can be a brief description of an Activity assigned by sender (your reference). The MessageFromName may be GDT Language-independent _Medium-_Name, Qualifier MessageFrom. InformationSensitivityCode can be the flag used to set the visibility level of this activity object. The InformationSensitivityCode may be based on GDT: InformationSensitivityCode.

InformationSensitivityName can be the short name associated with the InformationSensitivityCode. The InformationSensitivityName may be based on GDT MediumName. InformationSensitivityDescription can be the description associated with the InformationSensitivityCode. The InformationSensitivityDescription may be based on GDT LongDescription. GroupCode can be a group of activities, grouped using subjective criteria. The GroupwareEventGroupCode may be based on GDT ActivityGroupCode. GroupName can be the short name associated with the GroupCode. The GroupName may be based on GDT MediumName. GroupDescription can be the description associated with the GroupCode. The GroupDescription may be based on GDT LongDescription. DataOriginTypeCode can be the coded representation of where the data originates. The DataOriginTypeCode may be based on GDT ActivityDataOriginTypeCode. DataOriginTypeName can be the short name associated with the DataOriginTypeCode. The DataOriginTypeName may be based on MediumName. DataOriginTypeDescription can be the description associated with the DataOriginTypeCode. The DataOriginTypeDescription may be based on GDT LongDescription. ReportedDateTime can be the time point at which the activity is reported. The ReportedDateTime may be based on GDT GlobalDateTime, Qualifier: Reported. DueDateTime can be the DateTime at which something is due. The DueDateTime may be based on GDT GlobalDateTime, Qualifier: Due. LifeCycleStatus can represent the life cycle of an activity. The LifeCycleStatus may be based on GDT ActivityLifeCycleStatus. LifeCycleStatusName can be the short name associated with the LifeCycleStatus. The LifeCycleStatusName may be based on GDT MediumName. LifeCycleStatusDescription can be the description associated with the LifeCycleStatus. The LifeCycleStatusDescription may be based on GDT LongDescription. Description can be a description is a representation of the properties of an object in natural language. The Description may be based on GDT: MediumDescription, Qualifier: Activity. CompletedIndicator can specify whether or not something is complete. The CompletedIndicator may be based on GDT Indicator, Qualifier: Completed. ResultReasonCode can be the coded representation of a substantiation of result within a customer specific business transaction. The ResultReasonCode may be based on GDT CustomerTransactionDocumentResultReasonCode. ResultReasonName can be the short name associated with the CustomerTransactionDocumentResultReasonCode. The ResultReasonName may be based on GDT MediumName. ResultReasonDescription can be the description associated with the CustomerTransactionDocumentResultReasonCode. The ResultReasonDescription may be based on GDT LongDescription. ReasonCode can be the coded representation of the reason for visit. The ReasonCode may be based on GDT CustomerTransactionDocumentReasonCode. ReasonName can be the short name associated with the CustomerTransactionDocumentReasonCode. The ReasonName may be based on GDT MediumName. ReasonDescription can be the description associated with the CustomerTransactionDocumentReasonCode. The ReasonDescription may be based on GDT LongDescription.

Party Package

The Party package can assemble together all the business parties involved in the Visit Report. In certain implementations, the Party may contain the following elements. ActivityParty can be a party to which an Activity has been assigned. It can express the relationship of the Activity to a business partner. For example, all assigned Activities appear in the interaction history for the Activity Party. The ActivityParty may be based on GDT FormBusinessTransactionDocumentParty. OrganizerParty can be a party responsible for an Activity document. This identifier corresponds to the organizer as defined in the iCalendar standard. The OrganizerParty may be based on GDT FormBusinessTransactionDocumentParty. AttendeeParty can be a party that is requested as a participant on a specific date. The AttendeeParty may be based on GDT FormBusinessTransactionDocumentParty. ReferenceParty can be a party that is relevant to the current Activity but does not play an active role in it. The ReferenceParty may be based on GDT FormBusinessTransactionDocumentParty. ActivityUnitParty can be an organizational unit to which an Activity is assigned. The ActivityUnitParty may be based on GDT FormBusinessTransactionDocumentParty.

Location Package

The Location package can assemble together all the location involved in the Activity and to be used in the Visit Report. In certain implementations, the Location may contain the following element: MainLocation, which may identify the main logical or physical place where an Activity takes place. The Location may be based on GDT FormBusinessTransactionDocumentLocation.

Period Package

The Period package can assemble together all the date/time related information relevant in the Activity and to be used in the Visit Report. In certain implementations, the Period may contain the following element: ScheduledPeriod, which can be the scheduled time period of an appointment or the time period in which a phone call takes place. The ScheduledPeriod may be based on GDT ActivityPeriodElements.

TextCollection Package

The TextCollection package can assemble together all the text related information relevant in the Activity and to be used in the Visit Report. In certain implementations, the TextCollection may contain the following element: TextCollection, which can be the collection of texts in natural language with reference to an Activity. The TextCollection may be based on GDT TextCollection.

Item Package

The Item package may assemble together all the item related information relevant in the Visit Report. The Item can be a possibility of selling a quantity of a product or service. It may contain product information, quantity and values. The Item may also contain both identifying and administrative information. The Item may contain the following package: ProductInformation and PriceInformation. In certain implementations, the Item may contain the following elements. ID can be the unique identifier for an item within the Visit Report assigned by the user. The ID may be based on GDT BusinessTransactionDocumentItemID. ProcessingTypeCode can be the coded representation for processing an item in a Visit Report. The TextCollection may be based on GDT TextCollection.

ProcessingTypeName can be the ProcessingTypeCode may be based on the GDT TextCollection. ProcessingTypeDescription can be the ProcessingTypeDescription may be based on GDT BusinessTransactionDocumentItemProcessingTypeCode. Description can be a representation of the properties of an object in natural language. The Description may be based on GDT ShortDescription.

ResultReasonCode can be the coded representation of a substantiation of result within a customer specific business transaction. The ResultReasonCode may be based on GDT CustomerTransactionDocumentResultReasonCode. ResultReasonName can be the short name associated with the CustomerTransactionDocumentResultReasonCode. The ResultReasonName may be based on GDT MediumName. ResultReasonDescription can be the description associated with the CustomerTransactionDocumentResultReasonCode. The ResultReasonDescription may be based on GDT LongDescription. ReturnsIndicator may specify whether or not something was returned. The ReturnsIndicator may be based on GDT Indicator, Qualifier: Returns. Quantity can be the quantity of an item in a Visit Report. The Quantity may be based on GDT Quantity. QuantityTypeCode can be the coded representation of the type in which quantities are used for the product in the Visit Report. The QuantityTypeCode may be based on GDT QuantityTypeCode. ReasonCode can be the coded representation of the reason for visit. The ReasonCode may be based on GDT CustomerTransactionDocumentReasonCode. ReasonName can be the short name associated with the CustomerTransactionDocumentReasonCode. The ReasonName may be based on GDT MediumName.

ReasonDescription can be the description associated with the CustomerTransactionDocumentReasonCode. The ReasonDescription may be based on GDT LongDescription.

ItemProduct Package

The ItemProduct package can group together all the itemProduct related information relevant in the Visit Report. The ItemProduct can be the identification, description and classification of the product (Material or ServiceProduct) in the item of a Visit Report. In certain implementations, the ItemProduct may contain the following elements. StandardID can be the StandardID of a product. The ProductStandardID may be based on GDT ProductStandardID. BuyerID can be the unique identifier specified for the buyer of the products. The TextCollection may be based on GDT ProductPartyID. SellerID can be the unique identifier specified for the seller of the products. The SellerID may be based on GDT ProductPartyID.

ManufacturerID can be the unique identifier specified for the manufacturer of the products. The ManufacturerID may be based on GDT ProductPartyID. TypeCode can be the coded representation for the product type that describes the nature and essential characteristics of products such as Material, ServiceProduct. The TypeCode may be based on GDT ProductTypeCode. TypeCodeName can be the short name associated with the ProductTypeCode. The TypeCodeName may be based on GDT MediumName. TypeDescription can be the description associated with the ProductTypeCode. The TypeDescription may be based on GDT LongDescription. Note can be a natural language comment on a situation or subject. The Note may be based on GDT Note, Qualifier.

ActivityVisitReportItemPriceInformation Package

The ActivityVisitReportItemPriceInformation package can group together all the item price related information relevant in the Visit Report. It may contain the Price entity. The Price can be the activity visit report price related to a product. In certain implementations, the Price may include the NetPrice element, which can be the net price of a product in relation to a base quantity. The net price may be based on GDT: FormPrice. In certain implementations, the GDT/CDT may include the following data types: UUID, _MEDIUM_Name, ActionCode, ActivityDataOriginTypeCode, ActivityGroupCode, ActivityInitiator Code, ActivityLifeCycleStatus, ActivityPeriodElements, BusinessTransactionDocumentID, BusinessTransactionDocumentItemID, BusinessTransactionDocumentItemProcessingTypeCode, BusinessTransactionDocumentProcessingTypeCode, BusinessTransactionDocumentTypeCode, CustomerTransactionDocumentResultReasonCode, EXTENDED_Name. FormBusinessTransactionDocumentLocation, FormBusinessTransactionDocumentParty, GlobalDateTime, Indicator, InformationSensitivityCode, LongDescription, MediumDescription, MediumName, PriorityCode, ProductPartyID, ProductStandardID, ProductTypeCode, Quantity, QuantityTypeCode, ShortDescription, SystemAdministrativeData and TextCollection.

Data Model of the Message Data Type

Address

Figures 1, 111:
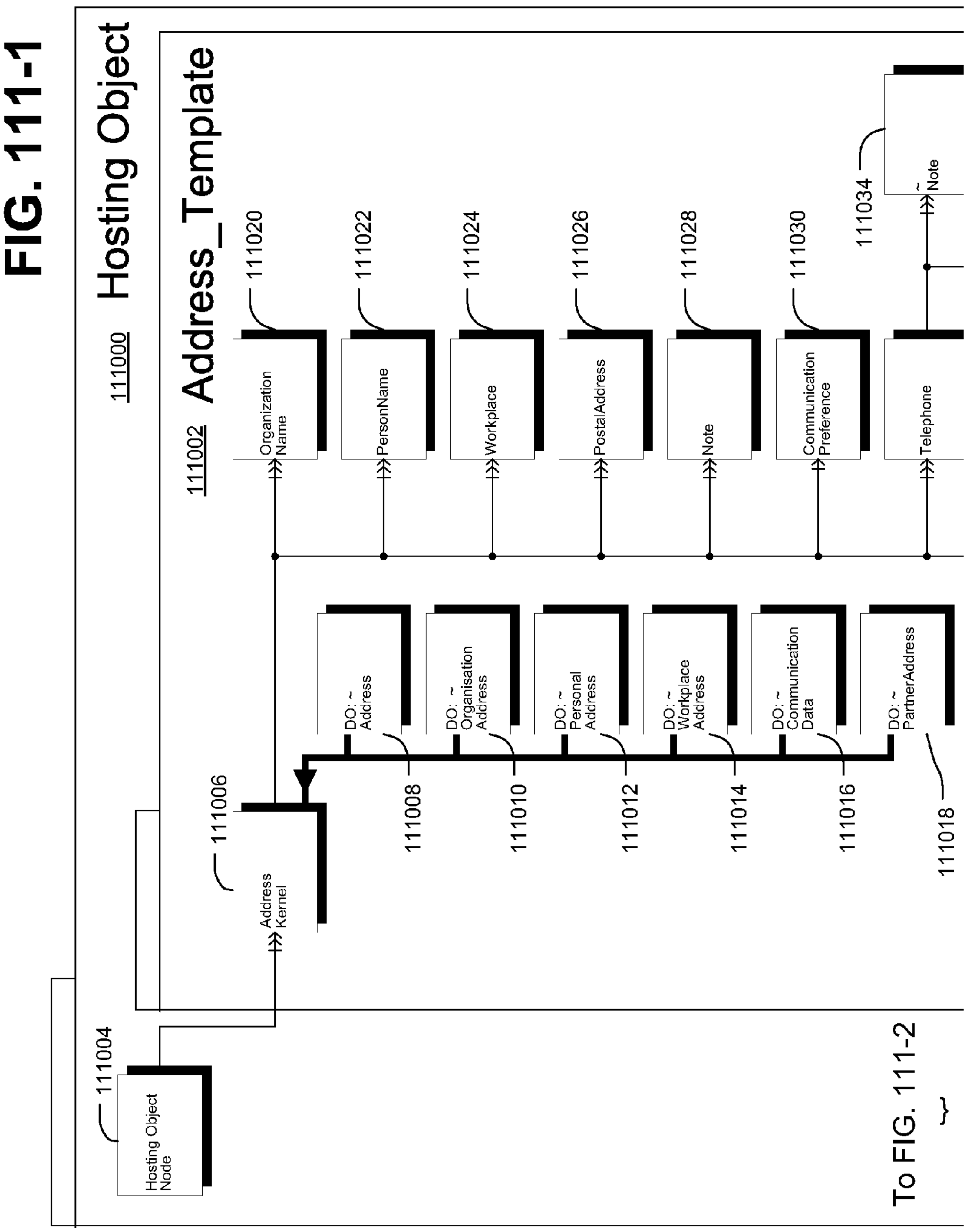
Figures 2, 111:
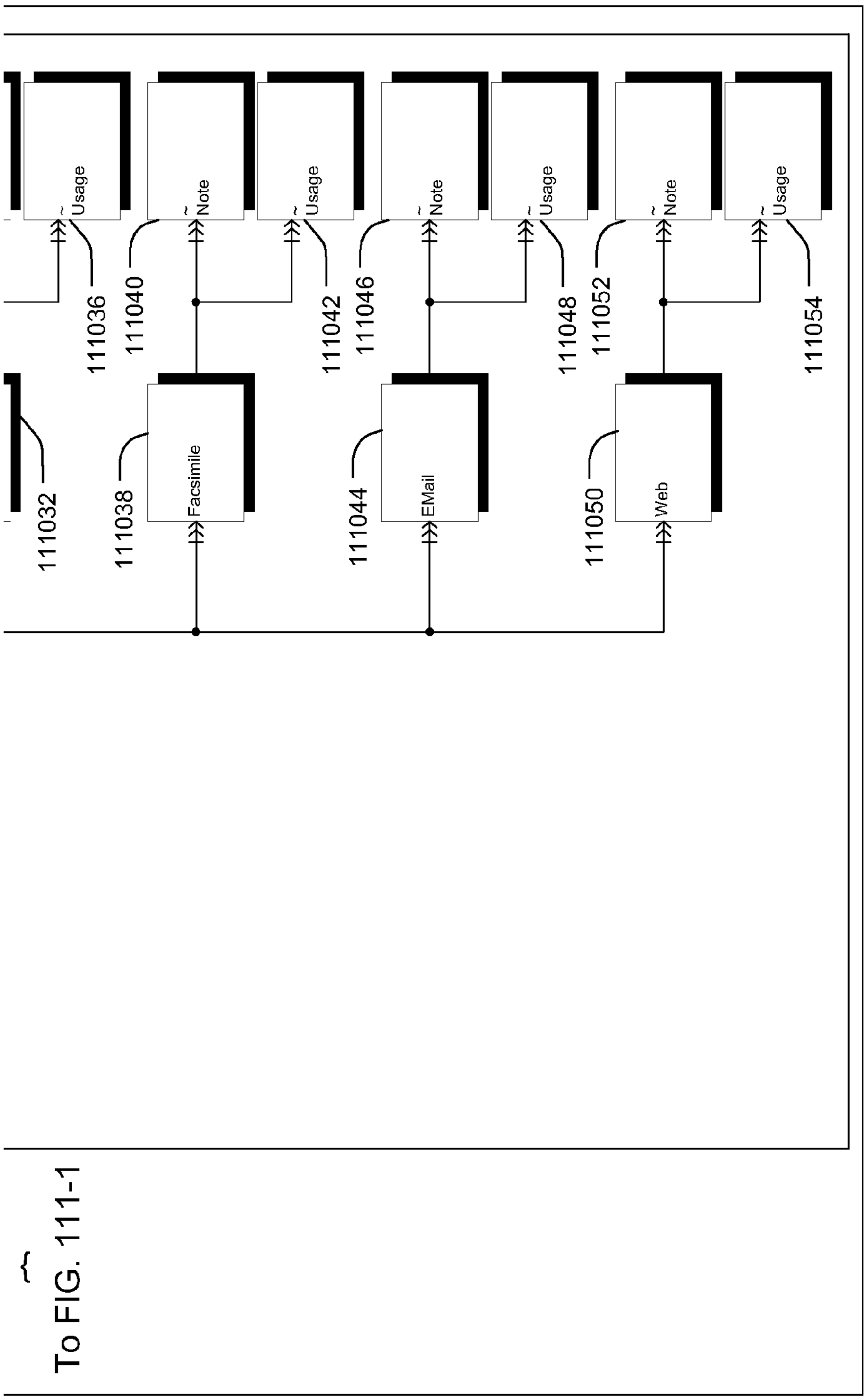

FIGS. 111-1 through 111-2 illustrate an example Address business object model 111002. Specifically, this model depicts interactions with various components of Address (shown here by 111000 and 111004).

Address Business Object may be the data that can describe the addressee, postal address and/or communication addresses. The dependent object Address 111006 may be used in master data objects (such as customer) and in documents (such as order). In some implementations, the usage of the DO Address may not be restricted, it can be used anywhere. The business object Address may be a business foundation object that can be used in a number of different DUs. For this reason, it may be located in the foundation layer. Address may be represented by the Address root node and its associations.

Node Structure of Dependent Object Address

Address (Root Node)

The business object address can contain structured information on all types of addresses. This can include details on the addressee, postal address, physical location, and communication address.

The elements located at the Root node may be defined by the type GDT: AddressElements. In certain implementations exemplary elements may include TypeCode, ID, PostalAddressID, PersonID, GroupCode, WorkplaceOrganisationAddressID, PersonAddressID, HostObjectNodeReference, and AddressKey. TypeCode may be an address type and may be a GDT of type AddressTypeCode. ID may be an address identification and based on GDT AddressID. PostalAddressID may be an identification for the postal address component of the address and an optional GDT of type AddressID. PersonID may be an identification for the person component of the address, and may be optional. The PersonID may be based on GDT AddressPersonID. GroupCode may be an address group of the address and based on GDT AddressGroupCode. WorkplaceOrganisationAddressID may be an AddressID of the organization that is assigned to the workplace address, and may be optional. The WorkplaceOrganisationAddressID may be based on GDT AddressID. PersonAddressID may be an AddressID of the person that is assigned to the address, and may be optional. The PersonAddressID may be based on GDT AddressID. HostObjectNodeReference may be a name of the carrier node of the host BO where the address is included. The HostObjectNodeReference may be based on a GDT. AddressKey may be an alternative address of an IDT AddressKey. The AddressKey may consist of the exemplary elements AddressTypeCode; AddressPostalAddressID, and/or AddressPersonID.

Composition relationships to subordinate nodes may exist, examples of which (including their possible cardinality relationships) are OrganisationName 111020 (cardinality 1 to cn), PersonName 111022 (cardinality 1 to cn), Workplace 111024 (cardinality 1 to cn), PostalAddress 111024 (cardinality 1 to cn), Note 111028 (cardinality 1 to cn), CommunicationPreference 111030 (cardinality 1 to c), Telephone 111032 (cardinality 1 to cn), Facsimile 111038 (cardinality 1 to cn), Email 111044 (cardinality 1 to cn), Web 111050 (cardinality 1 to cn), and FormattedAddress (cardinality 1 to 1).

In some implementations, associations for navigation exist with nodes, exemplary nodes may include OrganisationName, DefaultOrganisationNameRepresentation, DefaultPersonNameRepresentation, DefaultWorkplaceRepresentation, DefaultPostalAddressRepresentation, DefaultNote, DefaultTelephone, DefaultMobilePhone, DefaultConventionalPhone, DefaultFacsimile, DefaultEMail, and/or DefaultWeb.

Relating to the associations for navigation with Address (Root Node), for the OrganisationName node, a relationship with DefaultOrganisationNameRepresentation (cardinality of c to c) may exist and involve access to the standard representation of the node OrganisationName. For the PersonName node, a relationship with DefaultPersonNameRepresentation may have a cardinality relationship of c to c and involve access to the standard representation of the node PersonName. For the Workplace node, a relationship with DefaultWorkplaceRepresentation may have a cardinality relationship of c to c and involve access to the standard representation of the node Workplace. For the PostalAddress node, a relationship with DefaultPostalAddressRepresentation may have a cardinality relationship of c to c and involve access to the standard representation of the node PostalAddress. For the Note node, a relationship DefaultNote may have a cardinality relationship of c to c and involve access to the standard representation of the node Note in the logon language.

Still relating to the associations for navigation with Address (Root Node), for the Telephone node there may exist a relationship with DefaultTelephone (with a cardinality of c to 1 and involving access to the current standard telephone number), DefaultMobilePhone (with a cardinality of c to 1 and involving access to the current standard mobile telephone number), and/or DefaultConventionalPhone (with a cardinality of c to 1 and involving access to the current standard landline telephone number). For the Facsimile node, there may exist a relationship with DefaultFacsimile (cardinality of c to c) involving access to the current standard fax number. For the EMail node, there may exist a relationship with DefaultEMail (cardinality of c to c) involving access to the current standard e-mail address. For the Web node, there may exist a relationship with DefaultWeb (cardinality of c to c) involving access to the current standard web address.

In some embodiments, if the address is not an organization address, there can be no entries for the OrganisationName node. If the address is not a workplace address, personal address or personal address without a postal address, there may be no entries for the PersonName node. If the address is not a workplace address, there may be no entries for the Workplace node. If the address is not an organization address or a personal address, there may be no entries for the PostalAddress node. If the address is not an organization address or a personal address, there can be no entries for the Note node. If the address is an organization address, there may be no entries for the PersonAddressID and WorkplaceOrganisationAddressID. If the address is a personal address, there may be no entries for WorkplaceOrganisationAddressID. If the address is communication data without the postal address, there may be no entries for PersonAddressID and WorkplaceOrganisationAddressID. If the address is a personal address without the postal address, there may be no entries for PersonAddressID and WorkplaceOrganisationAddressID. If the address is an organization address, the GroupCode may not be equal to CAM1. If the address is a personal address, workplace address or a personal address without the postal address, the GroupCode may have the values BBP1, BC01, BEA1, BP, CRM1, EHS1, EHS2, IB01, MKT1, PLMD, SODE, SODI, SOEX. If the address is communication data without the postal address, the GroupCode may equal CAM1.

Exemplary Enterprise Service Infrastructure Actions relating to Address (Root Node) can include GeneratePostalAddressID, GeneratePersonID, CopyFromAddress, and/or SetMaximumCommunicationDataValidity.

In some embodiments, GeneratePostalAddressID may generate a PostalAddressID for the address. Exemplary prerequisites may include: that the address can be an organization address, personal address or communication data without a postal address; the elements HostBusinessObjectCarrierNodeName, DependentObjectPrefix, HostBusinessObjectCarrierNodeKey of the root node are filled correctly; No PostalAddressID was previously generated for the address. Changes to object can cause a PostalAddressID to be generated for the address and the field PostalAddressID of the root node to be filled accordingly. This action can be called by the host business object of the dependent object address using the local client proxy.

In some embodiments, GeneratePersonID can generate a PersonID for the address. Exemplary prerequisites may include: The address can be a personal address, workplace address or a personal address without a postal address; The elements HostBusinessObjectCarrierNodeName, DependentObjectPrefix, HostBusinessObjectCarrierNodeKey of the root node are filled correctly. No PersonID was generated for the address. Changes to object can cause a PersonID to be generated for the address and the field PersonID of the root node to be filled accordingly. This action can be called by the host business object of the dependent object address using the local client proxy.

In some implementations, CopyFromAddress can copy the data of the transferred address to Address. An exemplary prerequisites may be that no data maintained for the current address with exception of node root. Changes to the object can cause the data of the transferred address to be copied to the current address. Possible parameters can include that the action elements are defined by the data type AddressCopyFromAddressActionElements. In certain implementations these elements may include AddressID, a GDT of type AddressID and act as an Identifier for the address whose data is to be copied to the current address.

In some implementations, SetMaximumCommunicationDataValidity may be a check that can be activated in the address, which can ensure that the validity of all the communication data lies within the specified period. If the relevant indicator can be set, the temporal validity of the communication data can be adjusted so that it lies within the specified period. The action elements may be defined by the data type AddressSetMaximumCommunicationDataValidityActionElements. In certain implementations these elements may include ValidityPeriod and ExistingCommunicationAddressAdaptionAllowedIndicator. ValidityPeriod may be a GDT of type DatePeriod and may represent the maximum validity period for the communication data of the address. ExistingCommunicationAddressAdaptionAllowedIndicator may be a GDT of type Indicator with a possible qualifier such as ExistingCommunicationAddressAdaptionAllowed and may indicate whether or not the temporal validity of the existing communication addresses can be adjusted in such a way that it can lie within the ValidityPeriod. This action can be called by the host business object of the dependent object address using the local client proxy.

OrganisationName can include the name components of an organization. There can be a separate node instance for each alternative representation. The elements located at the OrganisationName node can be defined by the type GDT: AddressOrganisationNameElements. In certain implementations these elements may include AddressRepresentationCode, Name, KeyWordsText, and AdditionalKeyWordsText. In some implementations, AddressRepresentationCode may be an indicator for the address representation, and may be optional. The AddressRepresentationCode may be based on GDT AddressRepresentationCode. Name may be the name of organization and may be based on GDT OrganisationName. KeyWordsText may be key words for searching for the organisation address, and may be optional. The KeyWordsText may be based on GDT KeyWordsText. AdditionalKeyWordsText can be key words for searching for the organization address, and may be optional. AdditionalKeyWordsText may be based on GDT KeyWordsText. If the address is the standard representation of the address, there are typically no entries for AddressRepresentationCode.

PersonName can contain the name components of a natural person. There can be a separate node instance for each alternative representation. The elements located at the PersonName node can be defined by the type GDT: AddressPersonNameElements. In certain implementations these elements may include AddressRepresentationCode, Name, GenderCode, KeyWordsText, AdditionalKeyWordsText, and FormattedName. In some implementations, AddressRepresentationCode may be an indicator for the address representation, and may be optional. The AddressRepresentationCode may be based on GDT AddressRepresentationCode. Name may be the name components of the person, and may be optional. The Name may be based on GDT PersonName. GenderCode may be the gender of the person, and may be optional. The GenderCode may be based on GDT GenderCode. The value range may be limited to the values ‘0’, ‘1’ and ‘2’. KeyWordsText are key words for searching for the personal address, and may be optional. The KeyWordsText may be based on GDT KeyWordsText. AdditionalKeyWordsText are additional key words for searching for the personal address, and may be optional. The AdditionalKeyWordsText may be based on GDT KeyWordsText. FormattedName may be the complete formatted name of the person, and may be optional. The FormattedName may be based on GDT PersonFormattedName. If the address is the standard representation of the address, there typically can be no entries for AddressRepresentationCode.

Workplace can include details describing the workplace of a person as well as internal address and identification details within the organization. There can be a separate node instance for each alternative representation. The elements located directly at the Workplace node can be defined by the type GDT: AddressWorkplaceElements. In certain implementations these elements may include AddressRepresentationCode, FunctionalTitleName, DepartmentName, BuildingID, FloorID, RoomID, InhouseMailID, and/or CorrespondenceShortName. AddressRepresentationCode may be an indicator for the address representation, and may be optional. The AddressRepresentationCode may be based on GDT AddressRepresentationCode. FunctionalTitleName can be a description of the function of the Person, for example as contact person in a company, and may be optional. The FunctionalTitleName may be based on GDT _LANGUAGEINDEPENDENT_MEDIUM_Name. DepartmentName may be the department, and may be optional. The DepartmentName may be based on a GDT of type LANGUAGEINDEPENDENT_MEDIUM_Name. BuildingID can be the ID of the building in which the workplace is located, and may be optional. The BuildingID may be based on GDT BuildingID. FloorID may be the number of the floor on which the workplace is located, and may be optional. The FloorID may be based on GDT FloorID. RoomID may be the room number of the workplace, and may be optional. The RoomID may be based on GDT RoomID. InhouseMailID may be the ID for the internal post or the internal PO Box, and may be optional. The InhouseMailID may be based on GDT InhouseMailID. CorrespondenceShortName may be a short description for internal correspondence, and may be optional. The CorrespondenceShortName may be based on GDT _LANGUAGEINDEPENDENT_SHORT_Name. If the address is the standard representation of the address, there may be no entries for AddressRepresentationCode. In some implementations, at least one of the fields not equal to the AddressRepresentationCode may be filled.

The first 10 characters can be maintained in the BuildingID.

PostalAddress can include the postal address data of a physical place. This may contain both the street data and the PO Box address data. There can be a separate node instance for each alternative representation. PostalAddress also may contain PO Box data. The elements located at the PostalAddress node can be defined by the type GDT: AddressPostalAddressElements. In certain implementations these elements may include AddressRepresentationCode, CountryCode, RegionCode, CityName, RegionalStructureCityCode, AdditionalCityName, RegionalStructureAdditionalCityCode, DistrictName, RegionalStructureDistrictCode, StreetPostalCode, POBoxPostalCode, CompanyPostalCode, StreetPrefixName, AdditionalStreetPrefixName, StreetName, RegionalStructureStreetCode, StreetSuffixName, AdditionalStreetSuffixName, HouseID, AdditionalHouseID, BuildingID, RoomID, CareOfName, StreetAddressMailNonDeliveryReasonCode, RegionalStructureElementGroupCode, POBoxDeviatingCountryCode, POBoxDeviatingRegionCode, POBoxDeviatingCityName, RegionalStructurePOBoxDeviatingCityCode, POBoxID, POBoxIndicator, POBoxAddressMailNonDeliveryReasonCode, TaxJurisdictionCode, TimeZoneCode, and RegionalStructureAddressCheckStatusCode.

AddressRepresentationCode may be an indicator for the address representation, and may be optional. The AddressRepresentationCode may be based on GDT AddressRepresentationCode. CountryCode may be an ID for the country of the address. The CountryCode may be based on GDT CountryCode. RegionCode may be an ID for the region (federal, state, county) of the address. The RegionCode may be based on GDT RegionCode. CityName may be the city or district of the address, and may be optional. The CityName may be based on GDT _LANGUAGEINDEPENDENT_MEDIUM_Name. RegionalStructureCityCode may be an identification number of the city or district within the regional structure, and may be optional. The RegionalStructureCityCode may be based on GDT RegionalStructureCityCode. AdditionalCityName may be a place of residence in the event that this deviates from the city of the post office, and may be optional. The AdditionalCityName may be based on GDT _LANGUAGEINDEPENDENT_MEDIUM_Name. RegionalStructureAdditionalCityCode may be an identification number of the place of residence within the regional structure, and may be optional. The RegionalStructureAdditionalCityCode may be based on GDT RegionalStructureCityCode. DistrictName may be the district, and may be optional. The DistrictName may be based on GDT _LANGUAGEINDEPENDENT_MEDIUM_Name. RegionalStructureDistrictCode may be an identification number of the district within the regional structure, and may be optional. The RegionalStructureDistrictCode may be based on GDT RegionalStructureDistrictCode.

StreetPostalCode may be a postal code for the street address, and may be optional. The StreetPostalCode may be based on GDT PostalCode. POBoxPostalCode may be a postal code for the PO Box address, and may be optional. The POBoxPostalCode may be based on GDT PostalCode. CompanyPostalCode may be a company (major customer) postal code, and may be optional. The CompanyPostalCode may be based on GDT PostalCode. StreetPrefixName may be an additional address field above the street, and may be optional. The StreetPrefixName may be based on GDT _LANGUAGEINDEPENDENT_MEDIUM_Name. AdditionalStreetPrefixName may be another additional address field above the street, and may be optional. The AdditionalStreetPrefixName may be based on GDT _LANGUAGEINDEPENDENT_MEDIUM_Name. StreetName may be the street, and may be optional. The StreetName may be based on GDT StreetName. RegionalStructureStreetCode may be an identification number of the street within the regional structure, and may be optional. The RegionalStructureStreetCode may be based on GDT RegionalStructureStreetCode. StreetSuffixName may be an additional address field under the street, and may be optional. StreetSuffixName may be based on GDT _LANGUAGEINDEPENDENT_MEDIUM_Name. AdditionalStreetSuffixName may be another additional address field under the street, and may be optional. The AdditionalStreetSuffixName may be based on GDT _LANGUAGEINDEPENDENT_MEDIUM_Name. HouseID may be a house number, and may be optional. The HouseID may be based on GDT HouseID. AdditionalHouseID may be an addendum to house number, and may be optional. The AdditionalHouseID may be based on GDT HouseID. BuildingID may be a building ID, and may be optional. The BuildingID may be based on GDT BuildingID. RoomID may be a room number, and may be optional. The RoomID may be based on GDT RoomID.

CareOfName may be a part of the address (c/o=care of) if the recipient deviates from the apartment owner/resident and there may be no obvious connection to the owner/resident name (as in the case of sub-letters), and may be optional. The CareOfName may be based on GDT _LANGUAGEINDEPENDENT_MEDIUM_Name. StreetAddressMailNonDeliveryReasonCode may be a reason why mail could not be delivered to the street address, and may be optional. The StreetAddressMailNonDeliveryReasonCode may be based on GDT MailNonDeliveryReasonCode. RegionalStructureElementGroupCode may be a grouping of the regional structure, and may be optional. The regional structure grouping combines the elements of the regional structure (cities, streets, street sections). The RegionalStructureElementGroupCode may be based on GDT RegionalStructureElementGroupCode. POBoxDeviatingCountryCode may be a country of the PO Box address if it deviates from the country of the street address, and may be optional. The POBoxDeviatingCountryCode may be based on GDT CountryCode. POBoxDeviatingRegionCode may be a region of the PO Box address if it deviates from the region of the street address, and may be optional. The POBoxDeviatingRegionCode may be based on GDT RegionCode. POBoxDeviatingCityName may be a town or district of the PO Box address if it deviates from the town or district of the street address, and may be optional. The POBoxDeviatingCityName may be based on GDT _LANGUAGEINDEPENDENT_MEDIUM_Name. RegionalStructurePOBoxDeviatingCityCode may be an identification number of the city of the PO Box address within the regional structure, and may be optional. The RegionalStructurePOBoxDeviatingCityCode may be based on GDT RegionalStructureCityCode. POBoxID may be a PO Box number, and may be optional. The POBoxID may be based on GDT POBoxID. POBoxIndicator indicates whether or not the PO Box address may be maintained, and may be optional. This indicator may be necessary if a PO Box number may be not specified within a PO Box address. The POBoxIndicator may be based on GDT Indicator.

POBoxAddressMailNonDeliveryReasonCode may be a reason why mail could not be delivered to the PO box address, and may be optional. The POBoxAddressMailNonDeliveryReasonCode may be based on GDT MailNonDeliveryReasonCode. TaxJurisdictionCode may be a tax jurisdiction code of the address, and may be optional. The TaxJurisdictionCode may be based on GDT TaxJurisdictionCode. TimeZoneCode may be a time zone code of the address, and may be optional. The TimeZoneCode may be based on GDT TimeZoneCode. RegionalStructureAddressCheckStatusCode may be a check status of the current address data with relation to the regional structure, and may be optional. The RegionalStructureAddressCheckStatusCode may be based on GDT RegionalStructureAddressCheckStatusCode. If the address may be the standard representation of the address, there may be no entries for AddressRepresentationCode.

Note may contain additional remarks about the address and can refer to characteristics or contain other unstructured information. There can be a separate node instance for each alternative representation and each language. The elements located at the Note node can be defined by the type GDT: AddressNoteElements. In certain implementations these elements may include AddressRepresentationCode and Note. AddressRepresentationCode may be an indicator for the address representation, and may be optional. The AddressRepresentationCode may be based on GDT AddressRepresentationCode. Note may be additional remarks for the address. The Note may be based on GDT Note. In some implementations, there may be one additional remark for each language.

If the remark is for the standard representation of the address, there may be no entries for AddressAlternativeRepresentationCode. In some embodiments, the first 50 characters can be maintained in the Note.

CommunicationPreference can contain the correspondence language and standard communication type for the address. The elements located at the Note node may be defined by the type GDT: AddressNoteElements. In certain implementations, these elements may include CorrespondenceLanguageCode and PreferredCommunicationMediumTypeCode. CorrespondenceLanguageCode may be a correspondence language of the address, and may be optional. The CorrespondenceLanguageCode may be based on GDT LanguageCode. PreferredCommunicationMediumTypeCode may be a communication type through which the addressee wants to be contacted, and may be optional. The PreferredCommunicationMediumTypeCode may be based on GDT CommunicationMediumTypeCode. The value range may include the values FAX, INT, LET, PAG, PRT, RML, SSF, TEL, TLX, TTX, URI, VIS, and X40. In some implementations, at least one of the fields may be filled.

In some implementations, Telephone can include a telephone number for the address with its components and other details. The elements located at the Telephone node may be defined by the type GDT: AddressTelephoneElements. In certain implementations these elements may include Number, FormattedNumberDescription, NormalizedNumberDescription, UsageDeniedIndicator, ValidityPeriod, MobilePhoneNumberIndicator, and SMSEnabledIndicator. Number may be the telephone number. The Number may be based on GDT PhoneNumber. FormattedNumberDescription may be a formatted textual representation of the telephone number, and may be optional. The FormattedNumberDescription may be based on GDT LANGUAGEINDEPENDENT_MEDIUM_Description. NormalizedNumberDescription may be a normalized representation of the telephone number, and may be optional. The NormalizedNumberDescription may be based on GDT LANGUAGEINDEPENDENT_MEDIUM_Description and may be read-only. UsageDeniedIndicator can specifies whether or not a customer or business partner may contacted under this number, and may be optional. The UsageDeniedIndicator may be based on a GDT of type Indicator. ValidityPeriod may be a validity period of the telephone number, and may be optional. The ValidityPeriod may be based on GDT CLOSED_DatePeriod and may have a qualifier of Validity. MobilePhoneNumberIndicator can specifies whether or not the telephone may be a mobile telephone, and may be optional. The MobilePhoneNumberIndicator may be based on GDT Indicator. SMSEnabledIndicator can specify whether or not the telephone is SMS enabled, and may be optional. The SMSEnabledIndicator may be based on GDT Indicator.

Composition relationships to subordinate nodes may exist, examples of which may include TelephoneNote 111034 (cardinality of 1 to cn) and/or TelephoneUsage 111036 (cardinality of 1 to cn). TelephoneNote can include an additional remark for a telephone number. The elements located at the TelephoneNote node can be defined by the type GDT: AddressTelephoneNoteElements. In certain implementations these elements may include Note. Note may be additional remarks for the telephone number. The Note may be based on GDT Note. In some implementations, there can be one additional remark for each language, where the first 50 characters can be maintained in the Note. TelephoneUsage can specify the use for a telephone number. The elements located at the TelephoneUsage node can be defined by the type GDT: AddressTelephoneUsageElements. In certain implementations these elements include Usage. Usage may be a telephone number usage. The Usage may be based on GDT CommunicationAddressUsage.

Facsimile can contain a fax number for the address with its components and other details. The elements located at the Facsimile node can be defined by the type GDT: AddressFacsimileElements. In certain implementations these elements may include Number, FormattedNumberDescription, NormalizedNumberDescription, UsageDeniedIndicator, and/or ValidityPeriod. Number may be the fax number. The Number may be based on GDT PhoneNumber. FormattedNumberDescription may be a formatted textual representation of the fax number, and may be optional. The FormattedNumberDescription may be based on GDT LANGUAGEINDEPENDENT_MEDIUM_Description. NormalizedNumberDescription may be a normalized representation of the fax number, and may be optional. The NormalizedNumberDescription may be based on GDT LANGUAGEINDEPENDENT_MEDIUM_Description and may be read-only. UsageDeniedIndicator can specify whether or not a customer or business partner may faxed under this number, and may be optional. The UsageDeniedIndicator may be based on GDT Indicator. ValidityPeriod may be a validity period of the fax number, and may be optional. The ValidityPeriod may be based on GDT CLOSED_DatePeriod and may have a qualifier of Validity.

Composition relationships to subordinate nodes can exist, examples of which may include FacsimileNote 111040 (cardinality 1 to cn) and/or FacsimileUsage 111042 (cardinality 1 to cn). FacsimileNote can include an additional remark for a fax number. The elements located at the FacsimileNote node can be defined by the type GDT: AddressFacsimileNoteElements. In certain implementations these elements include Note. Note may be additional remarks for the fax number. The Note may be based on GDT Note. There may be one additional remark for each language, the first 50 characters of which can be maintained in the Note. FacsimileUsage can specify the use for a fax number. The elements located directly at the FacsimileUsage node can be defined by the type GDT: AddressFacsimileUsageElements. In certain implementations these elements include Usage. Usage may be a fax number usage. The Usage may be based on GDT CommunicationAddressUsage.

EMail can include an e-mail address for the address with its components and other details. The elements located directly at the EMail node can be defined by the type GDT: AddressEMailElements. In certain implementations these elements may include URI, UsageDeniedIndicator, and/or ValidityPeriod. URI may be an e-mail address. The URI may be base on GDT EMailURI. UsageDeniedIndicator can specify whether or not a customer or business partner wants to contacted under this e-mail address, and may be optional. The UsageDeniedIndicator may be based on GDT Indicator. ValidityPeriod may be a validity period of an address, and may be optional. The ValidityPeriod may be based on GDT CLOSED_DatePeriod and my have a qualifier of Validity.

Composition relationships to subordinate nodes exist, examples of which may include EMailNote 111046 (cardinality of 1 to cn) and/or EMailUsage 111048 (cardinality of 1 to cn). EMailNote can include an additional remark for an e-mail address. The elements located at the EMailNote node can be defined by the type GDT: AddressEMailNoteElements. In certain implementations these elements may include Note. Note may be additional remarks for the e-mail address. The Note may be based on GDT Note. In some implementations, there can be one additional remark for each language, the first 50 characters of which may be maintained in the Note. MailUsage can specify the use for an e-mail address. The elements located at the EMailUsage node can be defined by the type GDT: AddressEMailUsageElements. In certain implementations these elements may include Usage. Usage may be e-mail address usage. The Usage may be based on GDT CommunicationAddressUsage.

Web can include a web address for the address with its components and other details. The elements located at the Web node can be defined by the type GDT: AddressWebElements. In certain implementations these elements may include URI, UsageDeniedIndicator, and/or ValidityPeriod. URI may be a web address. The URI may be based on GDT WebURI. UsageDeniedIndicator can specify whether or not a customer or business partner may be contacted at this web address, and may be optional. The UsageDeniedIndicator may be based on GDT Indicator. ValidityPeriod may be a validity period of the web address, and may be optional. The ValidityPeriod may be based on GDT CLOSED_DatePeriod and may have a qualifier of Validity.

Composition relationships to subordinate nodes may exist, examples of which may include WebNote 111052 (cardinality 1 to cn) and/or WebUsage 111054 (cardinality 1 to cn). WebNote can include an additional remark for a web address. The elements located at the WebNote node can be defined by the type GDT: AddressWebNoteElements. In certain implementations these elements may include Note. Note may be additional remarks for the web address. Note may be based on GDT Note. In some implementations, there can be one additional remark for each language, the first 50 characters of which can be maintained in the Note. WebUsage can specify the use for a web address. The elements located directly at the WebUsage node can be defined by the type GDT: AddressWebUsageElements. In certain implementations these elements may include Usage. Usage may be web address usage. The Usage may be based on GDT CommunicationAddressUsage.

FormattedAddress (Transient Node) may include the formatted address in various forms. These formats can have one or more lines and can be created in accordance with fixed formatting rules. The elements located at the FormattedAddress node can be defined by the type GDT: AddressFormattedAddressElements. In certain implementations these elements may include FormattedName, FormattedAddressDescription, FormattedPostalAddressDescription, FormattedNameAndCityAddressDescription, FormattedAddress, and/or FormattedPostalAddress. FormattedName may be based on GDT LANGUAGEINDEPENDENT_LONG_Name. The FormattedAddressDescription may be based on GDT LANGUAGEINDEPENDENT_MEDIUM_Description and may have a qualifier of FormattedAddress. FormattedPostalAddressDescription may be a formatted postal address, and may be optional. The FormattedPostalAddressDescription may be based on GDT LANGUAGEINDEPENDENT_MEDIUM_Description and may have a qualifier of FormattedPostalAddress. FormattedNameAndCityAddressDescription may be a formatted address that contains the name and city only, and may be optional. The FormattedNameAndCityAddressDescription may be based on GDT LANGUAGEINDEPENDENT_MEDIUM_Description and may have a qualifier of FormattedNameAndCityAddress. FormattedAddress may be a formatted address in four lines, and may be optional. The FormattedAddress may be based on GDT FormattedAddress. FormattedPostalAddress may be a formatted postal address in three lines, and may be optional. The FormattedPostalAddress may be based on GDT FormattedPostalAddress. In some implementations, the elements of this node may not be changed (read-only).

Derived Business Objects

In some implementations, derivations of the business object template Address 111006 have been implemented as business objects, examples of which may include Address 111008, OrganisationAddress 111010, PersonalAddress 111012, WorkplaceAddress 111014, CommunicationData 111016, and/or PartnerAddress 111018.

The following table shows which elements of the node Root can be available for these derivations.

| | Business Object | | | | | |
|---|---|---|---|---|---|---|
| Element | Address | Organisation Address | Personal Address | Workplace Address | Communication Data | Partner Address |
| TypeCode | X | — | — | — | — | X |
| ID | X | X | X | X | X | X |
| PostalAddressID | X | X | X | X | X | X |
| PersonID | X | — | X | X | — | X |
| GroupCode | X | X | X | X | — | X |
| WorkplaceOrganisationAddressID | X | — | — | X | — | — |
| PersonAddressID | X | — | X | X | — | X |
| HostObjectNodeReference | X | X | X | X | X | X |
| AddressKey | X | X | X | X | X | X |

The following table shows nodes that can be available for these derivations.

| | Business Object | | | | | |
|---|---|---|---|---|---|---|
| Node | Address | Organisation Address | Personal Address | Workplace Address | Communication Data | Partner Address |
| Root | X | X | X | X | X | X |
| OrganisationName | X | X | — | — | — | X |
| PersonName | X | — | X | X | — | X |
| Workplace | X | — | — | X | — | — |
| PostalAddress | X | X | X | — | — | X |
| Note | X | X | X | — | — | X |
| CommunicationPreference | X | X | X | X | X | X |
| Telephone | X | X | X | X | X | X |
| TelephoneNote | X | X | X | X | X | X |
| TelephoneUsage | X | X | X | X | X | X |
| Facsimile | X | X | X | X | X | X |
| FacsimileNote | X | X | X | X | X | X |
| FacsimileUsage | X | X | X | X | X | X |
| EMail | X | X | X | X | X | X |
| EMailNote | X | X | X | X | X | X |

-continued

| | Business Object | | | | | |
|---|---|---|---|---|---|---|
| Node | Address | Organisation Address | Personal Address | Workplace Address | Communication Data | Partner Address |
| EMailUsage | X | X | X | X | X | X |
| Web | X | X | X | X | X | X |
| WebNote | X | X | X | X | X | X |
| WebUsage | X | X | X | X | X | X |
| FormattedAddress | X | X | X | X | — | X |

Business Object Address

An OrganisationAddress may be the Address of an organisation, a group or a similar entity. The business object Address may be a business foundation object that can be used in a number of different DUs. In some implementations, it can be located in the foundation layer.

Business Object OrganisationAddress

An OrganisationAddress may be the Address of an organisation, a group or a similar entity. The business object OrganisationAddress may be a business foundation object that can be used in a number of different DUs. In some implementations, it can be located in the foundation layer.

Business Object PersonalAddress

A PersonalAddress may be the individual address of a Person. The business object PersonalAddress may be a business foundation object that can be used in a number of different DUs. In some implementations, it can be located in the foundation layer.

Business Object WorkplaceAddress

A WorkplaceAddress may be the Address of a Workplace of a person within an organisation. The business object WorkplaceAddress may be a business foundation object that can be used in a number of different DUs. In some implementations, it can be located in the foundation layer.

Business Object CommunicationData

A CommunicationData may be a set of communication data without postal address data. The business object CommunicationData may be a business foundation object that can be used in a number of different DUs. In some implementations, it can be located in the foundation layer.

Business Object PartnerAddress

A PartnerAddress may be the Address of an organisation or a group or the individual address of a Person. The business object PartnerAddress may be a business foundation object that can be used in a number of different DUs. In some implementations, it can be located in the foundation layer.

Open Issues

In some implementations, the BO address can be implemented in this form if it is possible to define restrictions to the length of a field in the repository.

Attachment Folder

Figure 112:
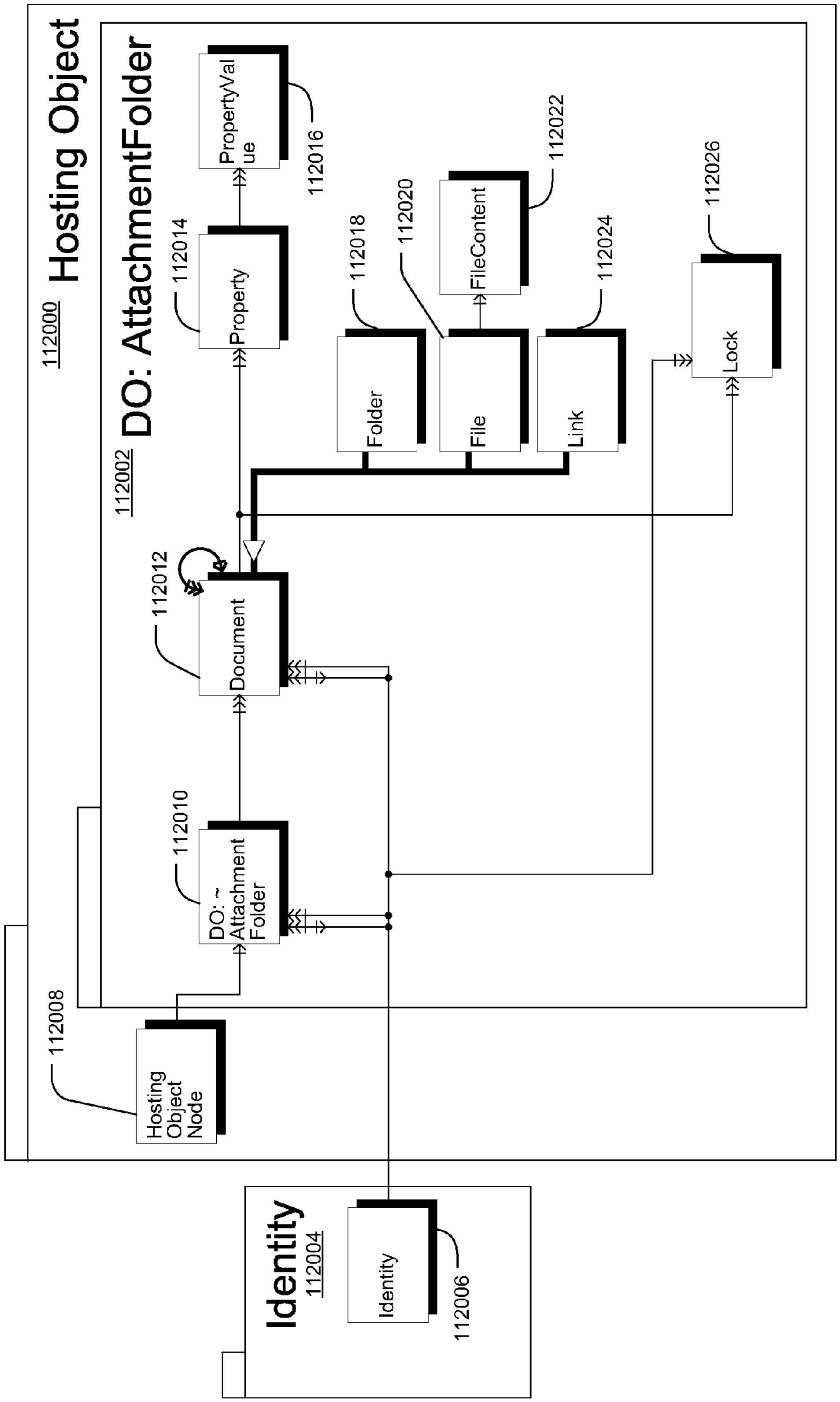
FIG. 112 shows an exemplary AttachmentFolder object model.

FIG. 112 illustrates an example Attachment Folder business object model 112002. Specifically, this model depicts interactions among various hierarchical components of the Attachment Folder object, as well as external components that interact with the Attachment Folder object (shown here as 112000 and 112004 through 112008).

The Attachment Folder 112010 dependent object is a collection of all documents attached to a business object or a part of a business object. The Attachment Folder can be used in master data objects (such as the Business Partner) as well as in documents (such as order). The use of the DO Attachment Folder is not restricted. The cardinality between the business object node of the hosting object and the Attachment Folder is always 1:c. The attachment object Attachment Folder is a generic object and is available to process components in logical deployment units (LDUs). Hence, the business object Attachment Folder resides in the foundation layer. Attachment Folder is represented by the Attachment Folder root node.

The dependent object Attachment Folder may not provide any B2B operations because it is created, changed and archived by a higher-level object. The dependent object Attachment Folder may not provide any A2A operations because it is created, changed and archived by a higher-level object.

An Attachment Folder (root) is the collection of documents attached to a business object or a part of a business object. It contains administrative data and attached documents, which are in turn independent documents. The elements directly located at the AttachmentFolder node are defined by the GDT type AttachmentFolderElements. These include UUID, PathName, SystemAdministrativeData, AttachmentExistsIndicator, HostObjectNodeReference, and ConfigurationProfileCode. The UUID is a global unique identifier for an AttachmentFolder of GDT type UUID. The PathName defines the absolute path name of the Attachment Folder in the Document Management System. SystemAdministrativeData represents administrative data stored by the system of GDT type SystemAdministrativeData. The AttachmentExistsIndicator indicates whether an attachment exists in the AttachmentFolder. AttachmentExistsIndicator is of a GDT type Indicator and, in some implementations, can have a qualifier of "AttachmentExists." The HostObjectNodeReference is the name and reference of a Business Object to which the AttachmentFolder is related to of GDT type ObjectNodeReference. The ConfigurationProfileCode is the configuration profile for the AttachmentFolder of GDT AttachmentFolderConfigurationProfileCode. A 1:cn relationship exists with subordinate node Document 112012. The "Document' indicates the documents that are assigned to the Attachment Folder.

An Inbound Association Relationship of 1:cn may exist from business object Identity/node Root CreationIdentity. The relationship identifies the Identity that created the Document. Similarly, a relationship of c:cn may exist from business object Identity/node Root LastChangeIdentity. The relationship identifies the Identity that changed the Document.

Various Enterprise service infrastructure actions may exist. For example, a CreateFolder, a CreateFile, and a CreateLink action may be used in the architecture. The CreateFolder action creates a new document inside the Attachment Folder with category Folder. There are generally no preconditions and changes to the object may create a new Business Object Document with the CategoryCode=1, below the association Document. Changes to other objects and status may not occur. The involved parameter may include the action elements defined by the data type: AttachmentFolderCreate- FolderActionElements. These elements include DocumentTypeCode of GDT type DocumentTypeCode, DocumentName of GDT type Name, that in some implementations, includes the qualifier of "document." Elements also include DocumentAlternativeName of GDT type Name and qualifier "DocumentAlternative," and DocumentDescription of GDT type Description The CreateFile action creates a new document inside the Attachment Folder with category File. Changes to the object include creation of a new Business Object Document with the CategoryCode=2 below the association Document. The involved parameter may include the action elements defined by the data type: AttachmentFolderCreateFileActionElements. These elements are DocumentTypeCode of GDT type DocumentTypeCode, DocumentName of GDT type Name and Qualifier "Document," DocumentAlternativeName of GDT type Name and Qualifier "DocumentAlternative," DocumentDescription of GDT type Description, and DocumentFileContentBinaryObject of GDT type BinaryObject and Qualifier "FileContent."

The CreateLink action creates a new document inside the Attachment Folder with category Link. Changes to the object include creation of a new Business Object Document with the CategoryCode=3 below the association Document. The involved parameter may include the action elements defined by the data type: AttachmentFolderCreateLinkActionElements. These elements are DocumentLinkInternalIndicator of GDT type Indicator and qualifier "Internal," DocumentTypeCode of GDT type DocumentTypeCode, DocumentName of GDT type Name and Qualifier "Document," DocumentAlternativeName of GDT type Name and Qualifier "DocumentAlternative," DocumentDescription of GDT type Description, HostObjectNodeReference of GDT type ObjectNodeReference, DocumentInternalLinkPathName of GDT type Name and Qualifier "DocumentPath," and DocumentExternalLinkWebURI of GDT type WebURI and Qualifier "DocumentExternalLink."

Documents

A document is an attachment that was assigned to the Attachment Folder and contains unstructured information and additional control and monitoring information. Document occurs in the following complete and disjoint specializations: a file 112020, a folder 112018, or a link 112024. The File contains unstructured information (the file content) and additional descriptive attributes. The Folder is a container for documents and folders. The Link is a reference to another document within the Document Management System or a reference to an external URL. In ESR, these specializations are summarized in a document node and the respective specialization is mapped using the attribute DocumentCategoryCode. For example, in the Attachment Folder of a product, a product description, which was generated in MS Word, is stored and thus assigned to the product as an attachment. The structure of the elements located directly at the node Document are defined by the GDT type AttachmentFolderDocumentElements. These elements are UUID, VersionID, SystemAdministrativeData, LinkInternalIndicator, CheckedOutIndicator, VisibleIndicator, VersioningEnabledIndicator, LinkToFolderIndicator, CategoryCode, TypeCode, MIMECode, PathName, Name, AlternativeName, HostObjectNodeReference, InternalLinkPathName, Description, ExternalLinkWebURI, FileContentURI, and FilesizeMeasure.

The UUID represents a universally unique identifier of a document of GDT type UUID. The VersionID represents a unique identifier of a document version of GDT type VersionID. The SystemAdministrativeData represents an administrative data that is stored in a system of GDT type SystemAdministrativeData. The LinkInternalIndicator specifies whether a link is an internal link or not and is of GDT type Indicator having the Qualifier "Internal." The CheckedOutIndicator specifies whether a document has been checked out and is being edited by someone locally or not and is of GDT type Indicator having the Qualifier "CheckedOut." The VisibleIndicator specifies whether a document is visible or not and is of GDT type Indicator having the Qualifier "Visible." The VersioningEnabledIndicator specifies whether versioning has been activated for the document or not and is of GDT type Indicator with a Qualifier of "Enabled." The LinkToFolderIndicator specifies whether an internal link is a link to a folder or not and is of GDT type Indicator with a Qualifier "LinkToFolder." The CategoryCode specifies whether a document is a folder, a link or a file and is of GDT type DocumentCategoryCode. The TypeCode defines the document type and thus the document's central settings and is of GDT type DocumentTypeCode. The MIMECode specifies the MIMECode for a document and is of GDT type MIMECode. The PathName is hierarchically structured and consists of the complete name of the folder in which the document is stored and the name of the document itself. The individual components are generally separated by a "/". The Pathname is of GDT type Name and a Qualifier "DocumentPath." The Name is the name of a document that identifies the document within its higher-level folder. The Name is the same as the last component of the DocumentPathName. Characters (apart from the separator "/") are allowed in the name. The Name is of GDT type Name with a Qualifier "Document." The AlternativeName is the Language-independent name of a document with a GDT type Name and a Qualifier "DocumentAlternative." The HostObjectNodeReference is the Name and Reference of the Business Object in which Attachment Folder the linked Document is stored (if its an internal link to an Attachment of another Business Object). The HostObjectNodeReference is of GDT type ObjectNodeReference. The InternalLinkPathName is the name of the document that the link points to (if it is an internal link) of GDT type Name and Qualifier "DocumentPath." The Description is a language-independent description of a document of GDT type Description where Description is not language-dependent. The ExternalLinkWebURI is the destination URI (if the link is external) of GDT type WebURI and Qualifier "DocumentExternalLink." The FileContentURI is the URL for accessing unstructured data (file content) and is of GDT type URI. The FilesizeMeasure specifies the size of unstructured data (file content) and is of type GDT type Measure with a Qualifier of "Filesize."

The Allowed values for the attribute UnitCode include the standard information technology codes: Byte, Kilobyte, Megabyte, Gigabyte and Terabyte. The List of codes allowed for UnitCode are in the following table:

| Common Code | Name | Representation Symbol |
|---|---|---|
| AD | Byte | B |
| 2P | Kilobyte | kB |
| 4L | Megabyte | MB |
| E34 | Gigabyte | GB |
| E35 | Terabyte | TB |

The composition relationships to subordinate nodes exist between Property (1:cn) and Lock 112026 (1:cn). Inbound Aggregation Relationships exist from the node Folder to ParentFolder (c:cn) which specifies the higher-level directory. Inbound Association Relationships exist from business object Identity/node Root to CreationIdentity (1:cn) for identifying the Identity that created the Document and from business object Identity/node Root to LastChangeIdentity (c:cn) for identifying the Identity that changed the Document.

Associations for navigation exist to Document node VersionListDocument (1:cn) for specifying the list of all preceding document versions. A version is a distinction of documents according to the order in which they were created. Associations for navigation also exist to File, Folder, and Link nodes (1:cn) to access documents of that type.

In some implementations, the MIMECode, FileContentURI, and FilesizeMeasure elements exist for the specialization of File. The LinkInternalIndicator, HostObjectNodeReference, InternalLinkDocumentPathName, and LinkToFolderIndicator elements exist for the specialization of Link. In the case of internal Links, LinkInternalIndicator=True. In the case of external Links, LinkInternalIndicator=False.

Various Enterprise service infrastructure actions may be employed. The actions may include Checkout, UndoCheckout, Checkin, Lock, SetAsCurrentVersion, Copy, Move, CreateFolder, CreateFile, CreateLink, CheckIfFileContentModifiable, FinishFileContentModification, CheckIfFileContentModifiable, Query, and Unlock. The Checkout action checks out a document. If a document is subject to version control, it may be checked out before it is changed. The document may be subject to version control (see element VersioningEnabledIndicator) and checked in. In general, other users may not perform an exclusive lock for the document after checkout. In operation, the document is checked out and the "CheckedOutIndicator" in the Document (root) node is set to "True".

The UndoCheckout action reverses the checkout of a document. The document is generally checked out before the UndoCheckout action is performed. In operation, the checkout operation is undone and the "CheckedOutIndicator" in the Document (root) node is set to "False". The Checkin action checks in a document that was checked out previously, and creates a new document version. The document may be subject to version control (see element VersioningEnabledIndicator) and checked out.

In operation, the "CheckedOutIndicator" in the Document (root) node is set to "False" and the current status of the document—including the lower-level nodes Property 112014, PropertyValue 112016, and FileContent 112022—is saved as a new document version beneath the VersionListDocument association. The Lock action creates a new lock for a document and, depending on the lock type, may prevent other users from changing the document. In operation, a new node with type Lock is created. The action elements are defined by data type AttachmentFolderDocumentLockActionElements and include LockDepthCode, LockModeCode, and LockDuration. LockDepthCode is of GDT type LockDepthCode. LockModeCode is of GDT type LockModeCode. LockDuration is of GDT type Duration with a qualifier of Lock.

The SetAsCurrentVersion action makes the selected version the current version. Other users may not have an exclusive lock for the document. The selected document can not be the current version. The current status of the document—including the lower-level nodes Property, PropertyValue, and FileContent—is saved as the new document version beneath the VersionListDocument association.

The data for the current document version is then overwritten with the data from the selected document version. In the process, the Document (root) node—including the lower-level nodes Property, PropertyValue, and FileContent—are overwritten with the corresponding data from the document version.

The Copy action copies a document to the specified target folder. Other users may not have an exclusive lock for the specified target folder. The Document business object—including the lower-level nodes Property, PropertyValue, FileContent, and Children—is copied. A new Document node is created beneath the Children association in the specified target folder. The action elements are defined by data type AttachmentFolderDocumentCopyActionElements. These are ParentDocumentPathName and Name. ParentDocumentPathName is the full name of the folder into which the document will be copied. If no ParentDocumentPathName is specified, the document is copied within the same folder. The parameter Name is generally specified in this case having a GDT type Name and a Qualifier of "DocumentPath." Name is the name of the new document within its higher-level folder. If no Name is specified, the document is created with the same name in the target folder. The parameter ParentDocumentPathName is generally specified in this case and has a GDT of type Name and a Qualifier of "Document."

The Move action moves a document to the specified target folder. In general, other user may not have an exclusive lock for the document itself or the specified target folder. The corresponding Document business object including its lower-level nodes Property, PropertyValue, FileContent, and Children—can be deleted beneath the Children association and created beneath the Children association in the specified target folder. The action elements are defined by data type AttachmentFolderDocumentMoveActionElements. These elements include a ParentDocumentPathName and a Name. The ParentDocumentPathName is the full name of the folder into which the document will be moved. If no ParentDocumentPathName is specified, the document is renamed within the same folder and the parameter Name is specified instead. The ParentDocumentPathName is of GDT type Name and has a Qualifier of "DocumentPath." The Name is the name of the new document within its higher-level folder. If no Name is specified, the document is created with the same name in the target folder and the parameter ParentDocumentPathName is specified instead. The Name is of GDT type Name and has a Qualifier of "Document."

The CreateFolder action creates a new document with category Folder within the current folder. This action is generally available for specialization Folder. A new Document business object with CategoryCode=1 is created beneath the Children association. The action elements are defined by data type AttachmentFolderDocumentCreateFolderActionElements.

These elements include a TypeCode of GDT type DocumentTypeCode, a Name of GDT type Name and having a Qualifier of "Document," an AlternativeName of GDT type Name having a Qualifier of "DocumentAlternative," and a Description of GDT type Description.

The CreateFile action creates a new document with category File within the current folder. This action is generally available for specialization Folder. A new Document business object with CategoryCode=2 is created beneath the Children association. The action elements are defined by data type AttachmentFolderDocumentCreateFileActionElements.

These elements include a TypeCode of GDT type DocumentTypeCode, a Name of GDT type Name having a Qualifier of "Document," an AlternativeName of GDT type Name having a Qualifier of "DocumentAlternative," a Description of GDT type Description, and a BinaryObject of GDT type BinaryObject having a Qualifier of "FileContent."

The CreateLink action creates a new document with category Link within the current folder. This action is generally available for specialization Folder. A new Document business object with CategoryCode=3 is created beneath the Children association. The action elements are defined by data type AttachmentFolderDocumentCreateLinkActionElements. These elements include LinkInternalIndicator of GDT type Indicator and having a Qualifier of "Internal," TypeCode of GDT type DocumentTypeCode, Name of GDT type Name and having a Qualifier of "Document," AlternativeName of GDT type Name having a Qualifier "DocumentAlternative," Description of GDT type Description, HostObjectNodeReference indicating the Name and Reference of the Business Object in which Attachment Folder the linked Document is stored (if its an internal link to an Attachment of another Business Object). The HostObjectNodeReference is GDT type ObjectNodeReference. The elements further include InternalLinkpathName of GDT type Name and a Qualifier "DocumentPath," ExternalLinkWebURI GDT type WebURI and having a qualifier "DocumentExternalLink."

The CheckIfFileContentModifiable action checks whether the file content of a document can be changed directly through the FileContentURI. If the file content cannot be changed, an error message is returned. Because the file content can involve extremely large data volumes, the FileContentURI is generally used directly to change the file content in certain scenarios. This action is generally available for specialization File.

The FinishFileContentModification action completes a direct change of the file content of a document that was executed directly through the FileContentURI. Because the file content can involve extremely large data volumes, the FileContentURI can be used directly to change the file content in certain scenarios. This action is generally available for specialization File. This action can be performed if action CheckIfFileContentModifiable was called previously. The elements FilesizeMeasure, MimeCode, and FileContentURI are changed in the Document (root) node and the BinaryObject element can be changed in the FileContent node.

The CheckIfFileContentModifiable action checks whether the file content of a document can be read directly through the FileContentURI. If the file content cannot be read, an error message is returned. Because the file content can involve extremely large data volumes, the FileContentURI can be used directly to read the file content in certain scenarios. This action is generally available for specialization File.

Query actions can also be performed. For example, a QueryByElements action provides a list of attachment data with the Attachment Folder, that meet the selection criteria specified by query elements. The query elements are defined by the data type AttachmentFolderDocumentElementsQueryElements. These elements include a DocumentUUID of GDT type UUID, a DocumentTypeCode of GDT type DocumentTypeCode, a DocumentPathName of GDT type Name and Qualifier "DocumentPath," a DocumentName of GDT type Name and Qualifier "Document," a DocumentAlternativeName of GDT type Name and Qualifier "DocumentAlternative," a DocumentDescription of GDT type Description, a DocumentSearchText that defines a text that is searched within the binary content of a document, and a DocumentPropertySearchText that defines a text that is searched within the properties of a document.

The UnLock action removes a document lock. A lock can be removed by the user who set it or from another authorized person—usually an administrator. The node with type Lock can be deleted.

A Folder is a specialization of a document and is a container for documents (folder, files and links). Besides the structural information, a Folder also contains additional control and monitoring information. Folders enable the organization and structuring of documents within the Document Management System. Documents for a certain subject area can all be saved in an appropriately named folder. Such a structure facilitates the navigation and search for these objects. The elements located directly at the node Folder are defined by the type GDT AttachmentFolderDocumentElements. An association of c:cn for navigation exists for the Folder to a Document node Children. The association specifies the documents that are stored in this folder.

A File is a specialization of a document and a carrier of unstructured data and additional control and monitoring information. As an example, a File can be a product specification that is written in MS Word and also contains additional information such as document type, description, author and status. The elements located directly at the node File are defined by the type GDT AttachmentFolderDocumentElements. A composition relationship of 1:c exists to subordinate node FileContent.

FileContent is the unstructured information of a document; in other words, the actual document content. This node was added because this can, under certain circumstances, involve very large data volumes and determining this data can lead to performance problems. As an example, FileContent contains the Word document (as XSTRING) in which the above-mentioned product specification is stored. The elements located directly at the node File are defined by the type GDT AttachmentFolderDocumentFileContentElements. These elements include a BinaryObject that describes the unstructured data in binary form. The BinaryObject is type GDT BinaryObject, and in some implementations can include a Qualifier "FileContent." The mimeCode attribute from the GDT BinaryObject is used to specify the corresponding MIMECode.

A Link is a specialization of a document and is either a reference to another document (folder or file) within the Document Management System or to an external URL. In addition, a Link contains additional monitoring and control information. As an example, an internal Link "Product Specification" is stored in a project folder and points to a document that is stored in another folder. An external Link "Homepage" refers to the URL of that particular homepage. The elements located directly at the node Link are defined by the type GDT AttachmentFolderDocumentElements. An association for navigation of cn:c exists to Document node LinkedDocument. The LinkedDocument specifies the document to which the internal Link points.

A Property is the description of a document characteristic or property. A Property contains a unique name, a data type, a description, as well as additional control information. A Property can have several values. A Property is, for example, the "drawing format", that describes the DIN format for a construction drawing. The elements located directly at the node Property are defined by the type GDT AttachmentFolderDocumentPropertyElements. These elements include a Name, a DataTypeFormatCode, a VisibleIndicator, a ChangeAllowedIndicator, a MultipleValueIndicator, a NamespaceURI, a Description, a The Name is the Name of a document property, which identifies the property within its namespace. It is type GDT Name with a Qualifier "DocumentProperty." The DataTypeFormatCode is a coded representation of the data type of a property. It is type GDT PropertyDataTypeFormatCode. In general, the following values from the PropertyDataTypeFormatCode code list are allowed for the DataTypeFormatCode element: Boolean, DateTime, Integer, and String. The VisibleIndicator specifies whether a property is visible or not. It is type GDT Indicator with a Qualifier "Visible." The ChangeAllowedIndicator specifies whether a user can change the document property or not. Properties created and maintained by the system, for example, cannot be changed by a user. It is type GDT Indicator with a Qualifier "ChangeAllowed." The MultipleValueIndicator specifies whether a property can include a list of values or not. It is type GDT Indicator with a Qualifier: PropertyMultipleValue. The NamespaceURI is a Namespace for the property. In order to avoid conflicting names when defining properties, each property is assigned a namespace. It is type GDT NamespaceURI. The Description is language-independent description of a document property. It is type GDT Description. The PropertyKey is a key for a document property. The Namespace is a Namespace for the property having type GDT NamespaceURI. A composition relationship of 1:cn exists to PropertyValue subordinate node.

A PropertyValue is a value that is assigned to a Property. The value for Property "Drawing format" is, for example, DIN A4. The elements located directly at the node PropertyValue are defined by the type GDT AttachmentFolderDocumentPropertyValueElements. These elements include Text, Indicator, DateTime, and IntegerValue. The Text is the value of the property, if the property is of the type: "String." The type GDT is Text. The Indicator is the value of the property, if the property is of the type: "Boolean." The type GDT is Indicator. The DateTime is the value of the property, if the property is of the type: "DateTime." The type GDT is DateTime. The IntegerValue is the value of the property, if the property is of the type: "Integer." The type GDT is IntegerValue.

Figure 113:
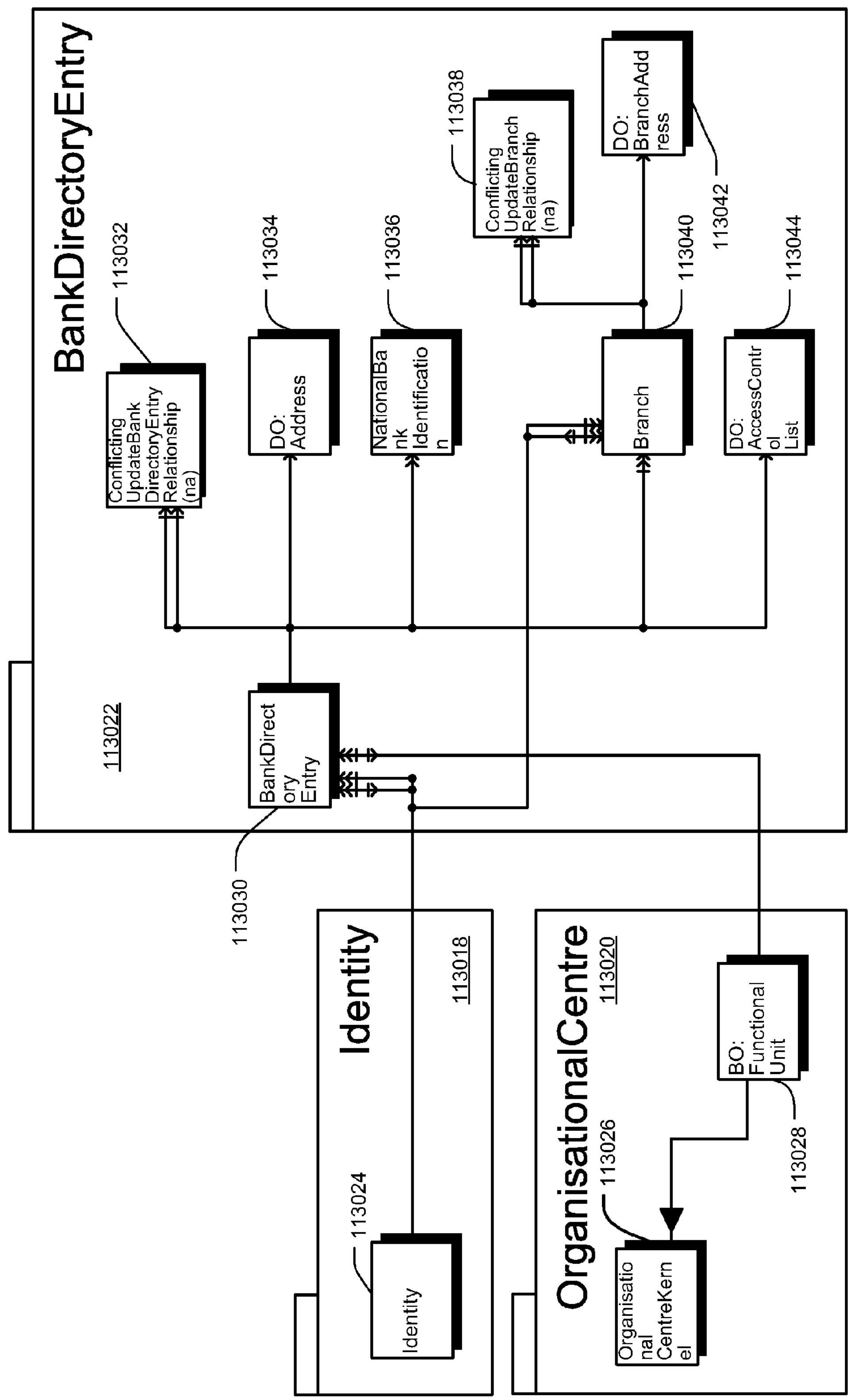
FIG. 113 shows an exemplary BankDirectoryEntry object model.

A DocumentLock is a (persistent) restriction placed on access to a document. The type of restriction is either exclusive or shared. Exclusive locks prevent any other locks being set. Shared locks, on the other hand, also allow other users to set shared locks. Several persistent locks of different types can be set for a document. A user wants to edit a document offline. To do this, he or she checks out the document. As this editing process might take some time, a persistent exclusive lock has to be set for the document. This protects the document from changes made by other users. The elements located directly at the node Lock are defined by the type GDT AttachmentFolderDocumentLockElements. These elements include ID, IdentityUUID, DepthCode, ModeCode, CreationDateTime, Duration, and ExpirationDateTime. The ID is a unique identifier of the lock with type GDT DocumentLockID. The IdentityUUID is the identity of the User who set the lock with type GDT UUID. The DepthCode specifies the value of the "depth" of the lock. A lock can apply to an individual document or to an entire folder hierarchy. The type GDT is LockDepthCode. The ModeCode is the coded representation of the mode of an object lock. The type GDT is LockModeCode. The CreationDateTime is the time at which the lock was created, The type GDT is DateTime with a Qualifier of "Creation." The Duration defines a lock's period of validity in milliseconds. The type GDT is Duration with a Qualifier "Lock." The ExpirationDateTime defines a lock's period of validity. The type GDT is DateTime with a Qualifier of "Expiration." An inbound Association Relationship exists from business object Identity/node Root: LockIdentity of 1:cn. The relationship identifies the Identity that created the Lock. Business Object BankDirectoryEntry FIG. 113 illustrates an example BankDirectoryEntry business object model 113022. Specifically, this model depicts interactions among various hierarchical components of the BankDirectoryEntry, as well as external components that interact with the BankDirectoryEntry (shown here as 113018 through 113020 and 113024 through 113028).

A BankDirectoryEntry is an entry with the main information on a bank in a classified directory of banks. A Bank is an entity that performs financial investment services and payment transactions. The business object BankDirectoryEntry can be part of the Foundation Layer. A BankDirectoryEntry can be either created manually or can be created through the upload of BIC-International bank catalog files. BankDirectoryEntry can be used by Business partner projections like HouseBank to validate the Bank Master information. A BankDirectoryEntry contains the following nodes. BankDirectoryEntry, which can be a Root node, is a standardized identifier for a bank according to the global identification scheme of the S.W.I.F.T. organization (BIC code). Address is the name and address of the bank. NationalBankIdentification can be one or more national identifiers (such as the German bank number (Bankleitzahl)), which identifies a bank using its number in a clearing system. Branch is an optional node that can include branches of the bank with its identifiers and address. BankDirectoryEntry can be represented by its own root node.

The Business Object is involved in the Financial Market Data Management_External Bank Directory Management data model. The Service Interface Bank Directory Transmission Requesting Out is part of the Financial Market Data Management_External Bank Directory Management Process Integration Model. The service interface Bank Directory Transmission Requesting Out groups the operations which request the transmission of the Bank Directory entries. FinancialMarketDataManagement-BankDirectoryTransmission-RequestingOut.RequestBankDirectory Transmission requests the transmission of Bank directory entries from an external provider. e.g. a bank. The operation is based on message type BankDirectoryTransmissionRequest (Derived from business object BankDirectoryEntry). FinancialMarketDataManagementBankDirectoryTransmissionIn groups the operations which maintain the Bank Directory entries in the system. The Service Interface Bank Directory Transmission In is part of the Financial Market Data Management_External Bank Directory Management Process Integration Model. The Maintain Bank Directory Entry (B2B) can have a technical name of FinancialMarketDataManagementBankDirectoryTransmissionIn.MaintainBankDirectoryEntry. FinancialMarketDataManagementBankDirectoryTransmissionIn.MaintainBank DirectoryEntry can create, change or delete bank directory entries based on the request. The operation is based on message type BankDirectoryTransmissionResponse (Derived from business object BankDirectoryEntry).

Node Structure of Business Object BankDirectoryEntry

BankDirectoryEntry 113030, which can be a Root Node, is an entry with the main information on a bank in a classified directory of banks. The elements located directly at the node BankDirectoryEntry can be defined by the type GDT: BankDirectoryEntryElements. These elements include a UUID, BankInternalID, BankStandardID, CountryCode, BankGroupCode, BankAddressID, BankAccountIDCheckDigitCalculationMethodCode, BankCatalogueID, DeletedIndicator, AutomaticallyGeneratedIndicator, ValidityPeriod, CashLiquidityFunctionalUnitUUID, SystemAdministrativeData, Status, LifecycleStatusCode, UpdateConflictStatusCode, ConsistencyStatusCode and ConflictingUpdateBankDirectoryEntryUUID. UUID is a universally unique identifier for the BankDirectoryEntry and is of type GDT: UUID. BankInternalID is a unique identifier for the BankDirectoryEntry and is of type GDT: BankInternalID. BankStandardID is an optional international identifier (BIC—Bank Identifier Code) and is of type GDT: BankStandardID. CountryCode is a coded representation of the country where the bank has its registered office and is of type GDT: CountryCode.

BankGroupCode is an optional code that specifies the group to which the Bank belongs and is of type GDT: BankGroupCode. BankAddressID is an optional unique identifier for the address and is of type GDT: AddressID. BankAccountIDCheckDigitCalculationMethodCode is an optional code that specifies the check digit calculation method that is used by the bank for validation of bank account numbers and is of type GDT: BankAccountIDCheckDigitCalculationMethodCode. BankCatalogueID is an optional identification of the bank catalogue from which this entry was derived and is of type GDT: CatalogueID. DeletedIndicator is an optional indicator which specifies if a BankDirectoryEntry was deleted or not and is of type GDT: Indicator and can have a qualifier of Deleted. AutomaticallyGeneratedIndicator is an optional indicator which indicates whether the BankDirectoryEntry instance was generated manually or not, is of type GDT: Indicator, and can have a qualifier of AutomaticallyGenerated. ValidityPeriod is optional and is a BankDirectoryEntry Validity period (including from date and to date), is of type GDT: DatePeriod, and can have a qualifier of Validity. CashLiquidityFunctionalUnitUUID is an optional universally unique identifier of type GDT: UUID of the FunctionalUnit working on the Bank Directory Entry. In some implementations, the FunctionalUnit referenced has to be able to execute the organizational function Cash/Liquidity Management (i.e., the element OrganisationalFunctionCode in one of the instances of the node FunctionalUnitAttributes in the FunctionalUnit references must have the value "17" for Cash/Liquidity Management). SystemAdministrativeData is optional administrative data stored within the system. This data contains the system users and time of change and is of type GDT: SystemAdministrativeData. Status is optional, gives the status of the BO and is of type IDT: BankDirectoryEntryStatus. LifecycleStatusCode is optional, gives an overview of the lifecycle status of the BO, and is of type GDT: BankDirectoryEntryLifecycleStatusCode. UpdateConflictStatusCode is optional, gives an overview of the status of the BO if a conflict is detected during the upload of a Bank catalog, and is of type GDT: ConflictStatusCode. ConsistencyStatusCode is optional, gives an overview of the consistency of the Bank directory entry, and is of type GDT: ConsistencyStatusCode.

ConflictingUpdateBankDirectoryEntryUUID is optional, stores the UUID of the BankDirectoryEntry in case a conflict is detected during further uploads, and is of type GDT: UUID.

Several composition relationships to subordinate nodes may exist. Address 113034 can have a cardinality relationship of 1:1. NationalBankIdentification 113036 can have a cardinality relationship of 1:n. DO: AccessControlList 113044 can have a cardinality relationship of 1:1. Branch 113040 can have a cardinality relationship of 1:cn. There may be a number of inbound aggregation relationships from the business object identity (or node root). CreationIdentity may be a cardinality relationship of 1:cn and is the identity that created the BankDirectoryEntry. LastChangeIdentity may be a cardinality relationship of c:cn and is the identity that changed the BankDirectoryEntry in the last time. There may be a number of inbound association relationships from the business object BankDirectoryEntry or node BankDirectoryEntry. ConflictingBankDirectoryEntry 113032 can be a cardinality relationship of c:c and can denote the conflicting BankDirectoryEntry which was uploaded. From the business object FunctionalUnit or node FunctionalUnit, CashLiquidityFunctionalUnit can be a cardinality relationship of c:cn and can identify the Functional Unit which is working on the BankDirectoryEntry. There may be a number of associations for navigation from business object BankDirectoryEntry or node BankDirectoryEntry. DefaultNationalBankIdentification can have a 1:c filtered cardinality relationship and is the default national bank identification. Filter parameters such as DefaultIndicator can be defined by the data type DefaultNationalBankIdentificationFilterElements. DefaultIndicator is optional, is of type GDT: Indicator, and can have a qualifier of Default. In some implementations, at least the standard identifier (root node) or the routing identifier (node: NationalBankIdentification) can be entered for unique identification. In some implementations, BankStandardID can be filled only in case of an International Bank having Swift Code.

Actions

In some implementations, the Enterprise Service Infrastructure may perform actions that include MarkAsObsolete, Activate, CheckConsistency, NotifyOfPendingChanges, RejectChanges and AcceptChanges. The MarkAsObsolete action can mark the Bank directory entry as Obsolete. In some implementations, preconditions can include the condition that the bank directory entry must be active for the above action to be performed. The MarkAsObsolete action sets the 'deleted indicator' flag of the Bank directory entry to true. The MarkAsObsolete action can change the lifecycle status of the Bank directory entry from 'Active' to 'Obsolete'. The MarkAsObsolete action can be performed on the UI as well as by the inbound agent. The Activate action changes a bank directory entry in preparation or Obsolete to Active. In some implementations, preconditions: The Bank directory entry must be in preparation or Obsolete for the above action to be performed. The Activate action clears the deleted indicator flag in the root node if the lifecycle status of the BO was obsolete when the action was performed. The Activate action changes the lifecycle status of the BankDirectoryEntry from 'Obsolete' to 'Active' or "In Preparation" to "Active" depending on the status at the time the action is performed. The Activate action can be performed on the UI as well as by the inbound agent. The CheckConsistency checks if the Bank directory entry being created is consistent or not. Consistency means that the Bank directory entry is not obsolete and all the mandatory fields are filled correctly. The CheckConsistency action can change the consistency status of the bank directory entry to status "Consistent" or "Inconsistent" depending on the consistency of the bank directory entry. The CheckConsistency action can be called before all the CRUD operations to check the consistency of the data being modified. The NotifyOfPendingChanges action notifies that there are pending changes on a BankDirectoryEntry. The inbound agent checks for conflicts during the upload process of Bank directory entries and calls the action NotifyOfPendingChanges in case a conflicting entry is found and created a BTM entry for the user. The user can then decide which of the two conflicting entries must be retained in the system. A Conflicting entry can be defined as an entry which already exists in the system (With same NationalBankIdentification node or same BankStandardID) which has been modified manually but is being uploaded again. In some implementations, preconditions can exist such that the existing Bank directory entry must be Active and must have been created or changed manually. The NotifyOfPendingChanges action can cause the BankDirectoryEntry being uploaded to be created with a new UUID with no status. If the BankDirectoryEntry being uploaded already exists in the system, the NotifyOfPendingChanges action can set BankDirectoryEntryUpdateStatus for the existing BankDirectoryEntry to “Pending Changes”. The ConflictingUpdateBankDirectoryEntryUUID can be filled with the UUID of the uploaded BankDirectoryEntry. The NotifyOfPendingChanges action can change the BankDirectoryEntryUpdateStatus of the existing BankDirectoryEntry from ‘No Conflict’ to ‘Pending changes’. The NotifyOfPendingChanges action can be called by the inbound agent. The AcceptChanges action accepts the pending changes on a BankDirectoryEntry. The AcceptChanges action can be called when the user accepts the proposed changes. In some implementations, the update status of the Bank directory entry must be in “Pending Changes”. The AcceptChanges action can update the existing BankDirectoryEntry with the information from the conflicting BankDirectoryEntry. The AcceptChanges action can delete the conflicting bank directory. The AcceptChanges action can change the BankDirectoryEntryUpdateConflictStatus of the existing BankDirectoryEntry from ‘Pending Changes’ to ‘No Conflict’. The AcceptChanges action can be called from the UI. The RejectChanges action rejects the pending changes on a BankDirectoryEntry. The AcceptChanges action can be called when the user rejects the proposed changes. In some implementations, the update status of the Bank directory entry must be in “Pending Changes”. The AcceptChanges action can clear the conflicting bank directory entry UUID field. The AcceptChanges action can delete the conflicting bank directory. The AcceptChanges action can change the BankDirectoryEntryUpdateStatus of the existing BankDirectoryEntry from ‘Pending Changes’ to ‘No Conflict’. The AcceptChanges action can be called from the UI. The AcceptAllChanges action accepts all the pending changes on both the Bank directory entry as well as the Branch level. In some implementations, the update status of one Bank directory entry or Branch must be in “Pending Changes”. The AcceptAllChanges action can clear the conflicting bank directory entry UUID or conflicting branch UUID field for all the Root and branch nodes with status “Pending Changes”. The corresponding root and branch information can be updated with the information in the conflicting entries. The AcceptAllChanges action can delete the conflicting bank directory. The AcceptAllChanges action can change the Update Status of the node with status ‘Pending Changes’ to ‘No Conflict’. The AcceptAllChanges action can be called from the UI.

Queries

A number of queries can be included, such as QueryByBankRoutingIDAndTypeCode, QueryByBankStandardID, QueryByBankInternalID, QueryByBankNameAndPostalAddress, QueryByBankGroupCode, and QueryByStatus. The QueryByBankRoutingIDAndTypeCode query provides a list of all valid BankDirectoryEntries with status ‘Active’ corresponding to the BankRoutingID and the BankRoutingIDTypeCode. The query elements are defined by the data type BankDirectoryEntryBankRoutingIDAndTypeCodeQueryElements, which includes NationalBankIdentificationBankRoutingID and NationalBankIdentificationBankRoutingIDTypeCode elements. NationalBankIdentificationBankRoutingID is of type GDT: BankRoutingID. NationalBankIdentificationBankRoutingIDTypeCode is optional and is of type GDT: BankRoutingIDTypeCode. The QueryByBankStandardID query provides the valid BankDirectoryEntry with status ‘Active’ which corresponds to the specified BankStandardID. The query elements are defined by the data type BankDirectoryEntryBankStandardIDQueryElements. These elements include BankStandardID, which is of type GDT: BankStandardID. The BankStandardID of at least one BankDirectoryEntry with status ‘Active’ and matches by individual value to the query element BankStandardID. The QueryByBankInternalID provides the valid BankDirectoryEntry with status ‘Active’ which corresponds to the specified BankInternalID. The query elements are defined by the data type: BankDirectoryEntryBankInternalIDQueryElements. These elements include BankInternalID, which is of type GDT: BankInternalID. The BankInternalID of at least one BankDirectoryEntry with status ‘Active’ and matches by individual value to the query element BankInternalID. The QueryByBankNameAndPostalAddress query provides a list of all valid BankDirectoryEntries with status ‘Active’ which correspond to the specified fields in the Address DO. The query elements are defined by the data type AddressNameAndPostalAddressQueryElements. The QueryByBankGroupCode provides a list of all valid BankDirectoryEntries with status ‘Active’ corresponding to a BankGroupCode. The query elements are defined by the data type BankDirectoryEntryBankGroupCodeElements. These elements include BankGroupCode, which is optional and is of type GDT: BankGroupCode. The Bank group code of at least one BankDirectoryEntry with status ‘Active’ and matches by individual value to the query element BankGroupCode. All the BankDirectoryEntries corresponding to this BankGroupCode are returned. The QueryByStatus query provides a list of all BankDirectoryEntries with status specified in the input parameter StatusCode. The query elements are defined by the data type BankDirectoryEntryStatusQueryElements. These elements include LifecycleStatusCode, which is of type GDT: BankDirectoryEntryLifecycleStatusCode.

Address

Address is a location where a bank has its registered office and where it operates from. Postal communication with the bank takes place using this address. The Address is a dependent object and is described separately.

NationalBankIdentification

NationalBankIdentification is an identifier of the bank represented by the BankDirectoryEntry in a national clearing system (bank key, for example, the German bank number). A clearing system is an electronic system with which the participating banks eliminate (balance) their non-cash payment flows with each other and clear receivables and payables. There are multiple clearing systems in some countries (for example, United States). To uniquely identify a bank using a bank key, the country of the bank is not sufficient in those cases. The elements of the structure NationalBankIdentification are defined by the type GDT: NationalBankIdElements, which includes UUID, BankRoutingID, BankRoutingIDTypeCode, BankAccountIDCheckDigitCalculationMethodCode, and DefaultIndicator. UUID is a universally unique National Bank identifier and is of type GDT: UUID. BankRoutingID identifies a BankDirectoryEntry by its number (Bank Key) in a clearing system and is of type GDT BankRoutingID. BankRoutingIDTypeCode is optional, is a coded representation of the type of a bank number and thus identifies the clearing system, and is of type GDT: BankRoutingIDTypeCode. BankAccountIDCheckDigitCalculationMethodCode is of type GDT: BankAccountIDCheckDigitCalculationMethodCode, and is an optional code that specifies the check digit calculation method that is used by the bank for validation of bank account numbers. (Code specific to the Clearing system). DefaultIndicator is an optional indicator to define the default Bank key and is of type GDT: Indicator; Qualifier: Default. In some implementations, the BankRoutingIDTypeCode is specified only when a there are multiple clearing systems.

Branch

Branch is a branch of a bank represented by the BankDirectoryEntry. All branches of a bank act under the same identification in payment transactions, differentiated by their registered office. The Bank Branch contains the following elements that are defined by the data type GDT BranchElements, which can include UUID, BankBranchID, BranchAddressID, DeletedIndicator, SystemAdministrativeData, Status, LifeCycleStatusCode, UpdateConflictStatusCode, ConsistencyStatusCode, AutomaticallyGeneratedIndicator, and ConflictingBranchUUID. UUID is a universally unique Branch identifier and is of type GDT: UUID. BankBranchID is a unique identifier for a Branch and is of type GDT: BankBranchID. BranchAddressID is an optional unique identifier for the address and is of type GDT: AddressID. DeletedIndicator is an optional indicator which specifies if a branch was deleted or not and is of type GDT: Indicator and can have a qualifier of Deleted. SystemAdministrativeData is optional administrative data stored within the system. This data contains the system users and time of change.

SystemAdministrativeData is of type GDT: SystemAdministrativeData. Status is optional, gives the status of the Branch, and is of type IDT: BankDirectoryEntryBranchStatus. LifeCycleStatusCode is optional, gives an overview of the status of the Branch node, and is of type GDT: BankDirectoryEntryBranchLifeCycleStatusCode. UpdateConflictStatusCode is optional, gives an overview of the Update status of the Branch node, and is of type GDT: ConflictStatusCode. ConsistencyStatusCode is optional, gives an overview of the Consistency of the Branch node, and is of type GDT: ConsistencyStatusCode. AutomaticallyGeneratedIndicator is optional, indicates whether the Branch instance was uploaded manually or not, is of type GDT: Indicator and can have a qualifier of AutomaticallyGenerated. ConflictingBranchUUID is optional, stores the UUID of the Branch in case a conflict is detected during further uploads, and is of type GDT: UUID. A BranchAddress 113042 1:1 composition relationship may exist. Inbound Aggregation Relationships may exist from business object Identity or node Root, such as a CreationIdentity 1:cn relationship that is an identity that created the Branch, a LastChangeIdentity c:cn relationship that is an identity that changed the Branch in the last time.

Inbound Association Relationships can exist from business object BankDirectoryEntry or node Branch, such as a ConflictingBranchEntry 113038 c:c relationship which denotes the conflicting Branch entry which was uploaded.

Actions

An enterprise service infrastructure can include actions such as MarkAsObsolete, CheckConsistency, Activate, NotifyOfPendingChanges, AcceptChanges, and RejectChanges.

The MarkAsObsolete action marks the branch as Obsolete. An Obsolete branch is no longer valid and may not be able to be used anymore. In some implementations, the MarkAsObsolete action can include a preconditions such that the Branch and Bank directory entry instances must be Active for the above action to be performed. The MarkAsObsolete action sets the 'deleted indicator' flag in the branch to true.

The MarkAsObsolete action changes the lifecycle status of the Branch from 'Active' to 'Obsolete'. The MarkAsObsolete action can be performed on the UI as well as by the inbound agent.

The CheckConsistency action checks if the Branch of the bank directory entry being created is consistent or not. Consistency means that the branch is not obsolete and all the mandatory fields are filled correctly.

The CheckConsistency action changes the consistency status of the branch to status "Consistent" or "Inconsistent" depending on the consistency of the branch entry. The CheckConsistency action can be called before all the Create and Update operations to check the consistency of the data being modified.

The Activate action resets the Obsolete branch to Active or a sets a Branch entry In Preparation to Active.

In some implementations, the Activate action can include a precondition such that the Bank directory entry must be Active and the Branch must be marked Obsolete or in Preparation for the above action to be performed. The Activate action can clear the 'deleted indicator' flag in the root node if the current status of the branch was 'Obsolete' when the action was performed. The Activate action can change the lifecycle status of the Branch from 'Obsolete' to 'Active' or 'In Preparation' to 'Active'. The Activate action can be performed on the UI as well as by the inbound agent.

The NotifyOfPendingChanges action notifies that there are pending changes on a Branch. If a branch of a BankDirectoryEntry, which was created or modified manually, is being uploaded again, then in such a case, the NotifyOfPendingChanges action can set the Branch update status to Pending Changes. This will also trigger a BTM to the user and the user would then decide which of the two entries is the latest.

In some implementations, the NotifyOfPendingChanges action can include preconditions such that the Branch entry must be created or modified manually and the branch must be Active for the following action to be performed. The NotifyOfPendingChanges action creates a new UUID in the Branch being uploaded. If the BankDirectoryEntry being uploaded already exists in the system, the NotifyOfPendingChanges action sets the BankDirectoryEntryUpdateStatus for the existing BankDirectoryEntry to "Pending Changes". The NotifyOfPendingChanges action fills the ConflictingBranchUUID with the UUID of the latest uploaded Branch. The NotifyOfPendingChanges action changes the BranchUpdateStatus of the existing Branch from 'No Conflict' to 'Pending changes'. The NotifyOfPendingChanges action can be called by the inbound agent.

The AcceptChanges action accepts the pending changes on a Branch. The AcceptChanges action can be called when the user accepts the proposed changes. In some implementations, the AcceptChanges action can include preconditions such that the Branch of the BO must be in status "Pending Changes".

The AcceptChanges action overwrites the existing Branch data with the information from the conflicting branch data. The AcceptChanges action can delete the conflicting Branch entry. The AcceptChanges action can change the BranchUpdateStatus of the existing Branch from 'Pending Changes' to 'No Conflict'. The AcceptChanges action can be called from the UI.

The RejectChanges action rejects the pending changes on a Branch. The RejectChanges action can be called when the user rejects the proposed changes. In some implementations, the RejectChanges action can include preconditions such that the BranchUpdateStatus of the BO must be in "Pending Changes".

The RejectChanges action can clear the conflicting branch UUID field. The RejectChanges action can change the BranchUpdateStatus of the existing Branch from 'Pending Changes' to 'No Conflict'.

The RejectChanges action can delete the conflicting Branch entry. The RejectChanges action can be called from the UI.

Queries

A number of queries can be included, such as QueryByBranchNameAndPostalAddress and QueryByBranchStatus.

QueryByBranchNameAndPostalAddress provides a list of all Branches of a Bank with status 'Active' which correspond to the specified fields specified in the query elements. The query elements are defined by the data type: AddressNameAndPostalAddressQueryElements. QueryByBranchStatus provides a list of all Branches with status specified in the input parameter StatusCode. The query elements are defined by the data type BankDirectoryEntryBranchStatusQueryElements, which includes LifecycleStatusCode, which is of type GDT: BankDirectoryEntryBranchLifecycleStatusCode, and can provide a list of all Branches with status 'Obsolete'.

BranchAddress is a location where a branch of the bank has its registered office and where it operates from. It has the same structure as BankDirectoryEntry Address. DO: AccessControlList is a list of access groups that have access to a BankDirectoryEntry during a validity period.

Message Types and their Signatures

Figure 114:
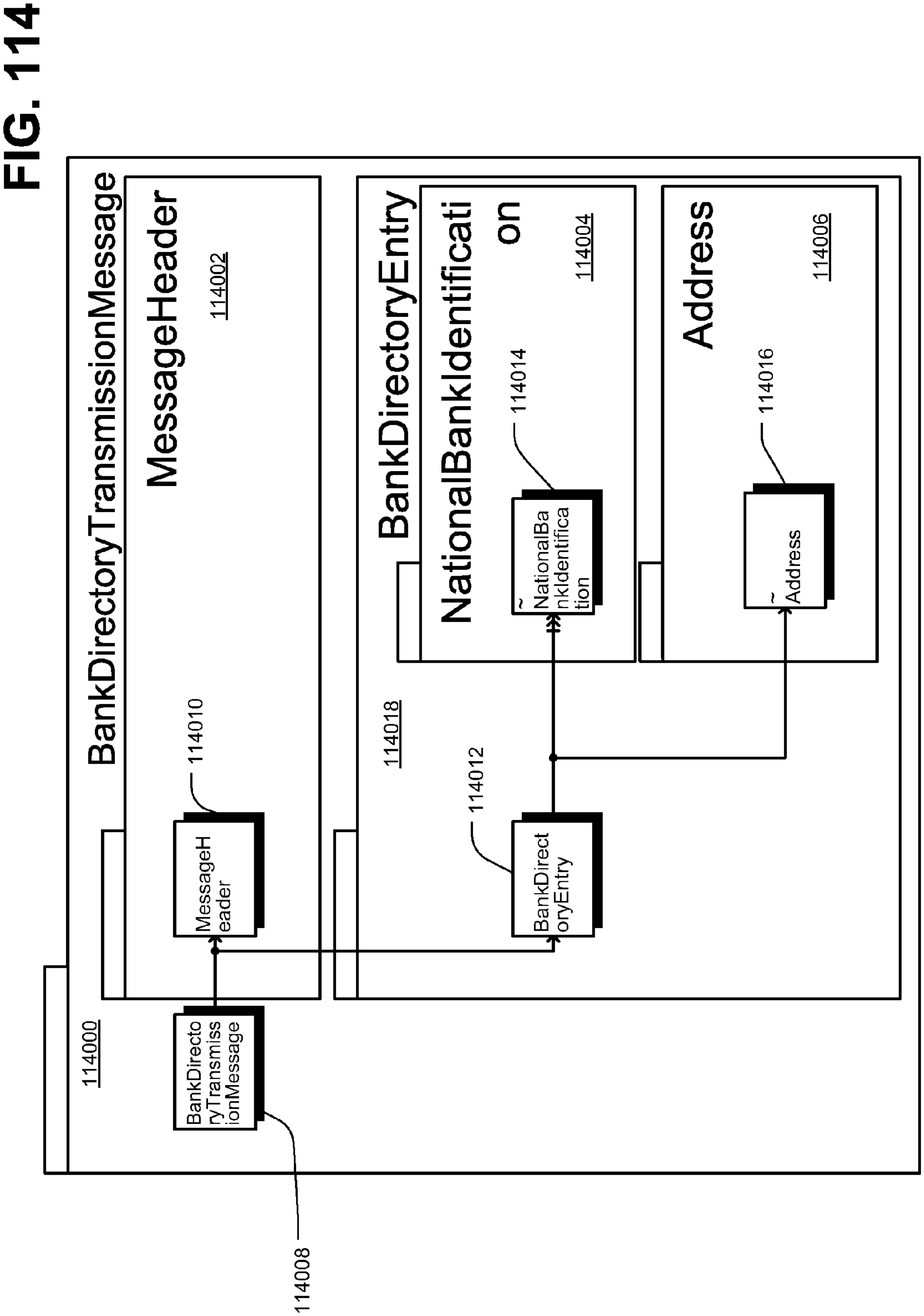
FIG. 114 shows an exemplary BankDirectoryTransmissionMessage Message Data Type.

FIG. 114 illustrates one example logical configuration of BankDirectoryTransmissionMessage message 114000. Specifically, this figure depicts the arrangement and hierarchy of various components such as one or more levels of packages, entities, and datatypes, shown here as 114000 though 114018. As described above, packages may be used to represent hierarchy levels. Entities are discrete business elements that are used during a business transaction. Data types are used to type object entities and interfaces with a structure. For example, BankDirectoryTransmissionMessage message 114000 includes, among other things, BankDirectoryEntry 114018. Accordingly, heterogeneous applications may communicate using this consistent message configured as such.

FIG. 115-1 through 115-4 illustrates one example logical configuration of BankDirectoryTransmissionMessage message 115000. Specifically, this figure depicts the arrangement and hierarchy of various components such as one or more levels of packages, entities, and datatypes, shown here as 115000 through 115100. As described above, packages may be used to represent hierarchy levels. Entities are discrete business elements that are used during a business transaction. Data types are used to type object entities and interfaces with a structure. For example, BankDirectoryTransmissionMessage message 115000 includes, among other things, BankDirectoryEntry 115026. Accordingly, heterogeneous applications may communicate using this consistent message configured as such.

This section describes the message types and their signatures that are derived from the operations of the business object BankDirectoryEntry. In a signature, the business object is contained as a "leading" business object. The message data type defines the structure of the following message types. The process component "Financial Market Data Management" is responsible for the management of Financial Market Data. Bank Directory Entries, which contains the Identifications and Communication data of banks, will be provided in Bank Directories by Financial Institutions as data files. For the upload of these data (as well as the usage of synchronous services) the message type BankDirectoryTransmissionMessage can be required. Message Types can include BankDirectoryTransmissionRequest and BankDirectoryTransmissionResponse. BankDirectoryTransmissionRequest is a request for the transmission of Bank Directory Entries.

The structure of this message type is determined by the message data type BankDirectoryTransmissionMessage. For details of constraints on the structure and integrity conditions of the BankDirectoryTransmissionRequest that are imposed by the message data type BankDirectoryTransmissionMessage, refer to the relevant subsection related to BankDirectoryTransmissionMessage. The BankDirectoryTransmissionMessage message type is used in the operations of the BankDirectoryTransmissionRequestingOut.RequestBankDirectoryTransmission BankDirectoryEntry business object.

BankDirectoryTransmissionResponse is associated with BankDirectoryEntries which were requested by a BankDirectoryTransmissionRequest. The structure of this message type is determined by the message data type BankDirectoryTransmissionMessage. For details of constraints on the structure and integrity conditions of the BankDirectoryTransmissionResponse that are imposed by the message data type BankDirectoryTransmissionMessage, refer to the relevant subsection related to BankDirectoryTransmissionMessage. The BankDirectoryTransmissionResponse message type can be used in the operations of BankDirectoryEntry BankDirectoryTransmissionIn.MaintainBankDirectoryEntry business objects:

BankDirectoryTransmissionMessage

The BankDirectoryTransmissionMessage message data type contains the object Bank Directory Entry which is contained in the business document and the business information that is relevant for sending a business document in a message. It contains the MessageHeader package and the BankDirectoryEntry package. This message data type, therefore, provides the structure for the following message types and the operations that are based on them: BankDirectoryTransmissionRequest and BankDirectoryTransmissionResponse.

MessageHeader Package

MessageHeader Package is a grouping of business information that is relevant for sending a business document in a message. It contains the entity MessageHeader. MessageHeader is a grouping of business information from the perspective of the sending application, such as Identification of the business document in a message, information about the sender, and optionally information about the recipient. The MessageHeader contains SenderParty and RecipientParty. The MessageHeader is of the type GDT: BusinessDocumentMessageHeader whereby the ID and ReferenceID elements of the GDT are used.

BankDirectoryEntry Package

BankDirectoryEntry Package is a grouping of the BankDirectoryEntry with its packages NationalBankIdentification and Address. In some implementations, the message type BankDirectoryTransmissionRequest only uses the element BankCatalogueID within entity BankDirectoryEntry.

BankDirectoryEntry contains the elements BankStandardID. CountryCode, BankAccountIDCheckDigitCalculationMethodCode, DeletedIndicator, ValidityPeriod and BankCatalogueID. BankStandardID has a 1:1 cardinality relationship and is of type GDT: BankStandardID. CountryCode has a 1:1 cardinality relationship and is of type GDT: CountryCode.

BankAccountIDCheckDigitCalculationMethodCode has a 1:1 cardinality relationship and is of type GDT: BankAccountIDCheckDigitCalculationMethodCode. DeletedIndicator has a 1:1 cardinality relationship and is of type GDT: Indicator; and can have a qualifier of Deleted. ValidityPeriod has a 1:1 cardinality relationship and is of type GDT: DatePeriod, and can have a qualifier of Validity. BankCatalogueID can have a 1:1 cardinality relationship and is of type GDT: CatalogueID.

NationalBankIdentification Package

NationalBankIdentification Package is a National Identification of a Bank and it contains the NationalBankIdentification entity.

NationalBankIdentification contains the BankRoutingID, BankRoutingIDTypeCode, and BankAccountIDCheckDigitCalculationMethodCode elements. BankRoutingID can have a 1:1 cardinality relationship and is of type GDT: BankRoutingID. BankRoutingIDTypeCode can have a 1:1 cardinality relationship and is of type GDT: BankRoutingIDTypeCode. BankAccountIDCheckDigitCalculationMethodCode can have a 1:1 cardinality relationship and is of type GDT: BankAccountIDCheckDigitCalculationMethodCode.

Address Package

Address Package includes an address of a Bank. It contains the Address entity. The Address is of the type GDT: Address.

Business Object Business Partner

Figures 1, 116:
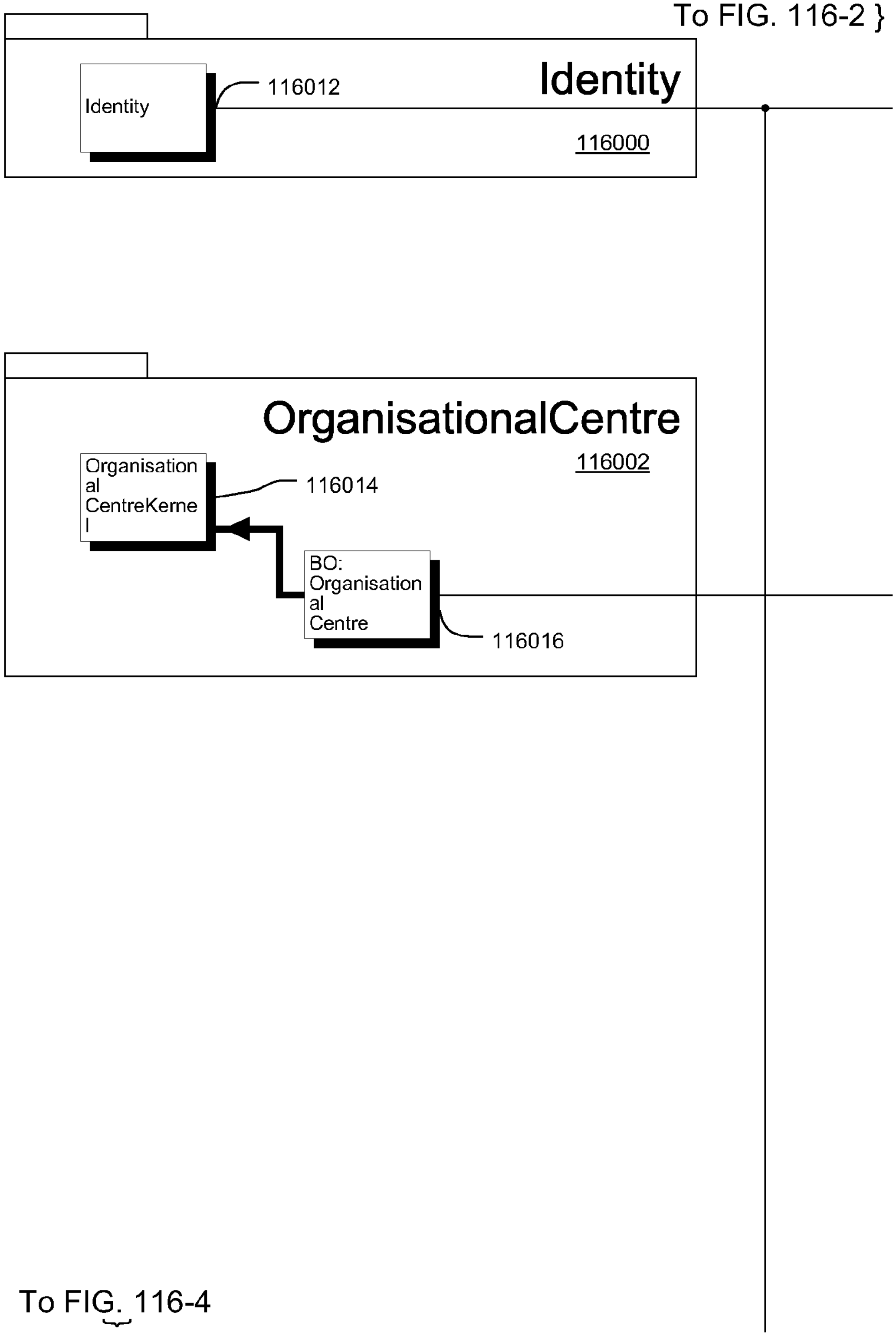
Figures 2, 116:
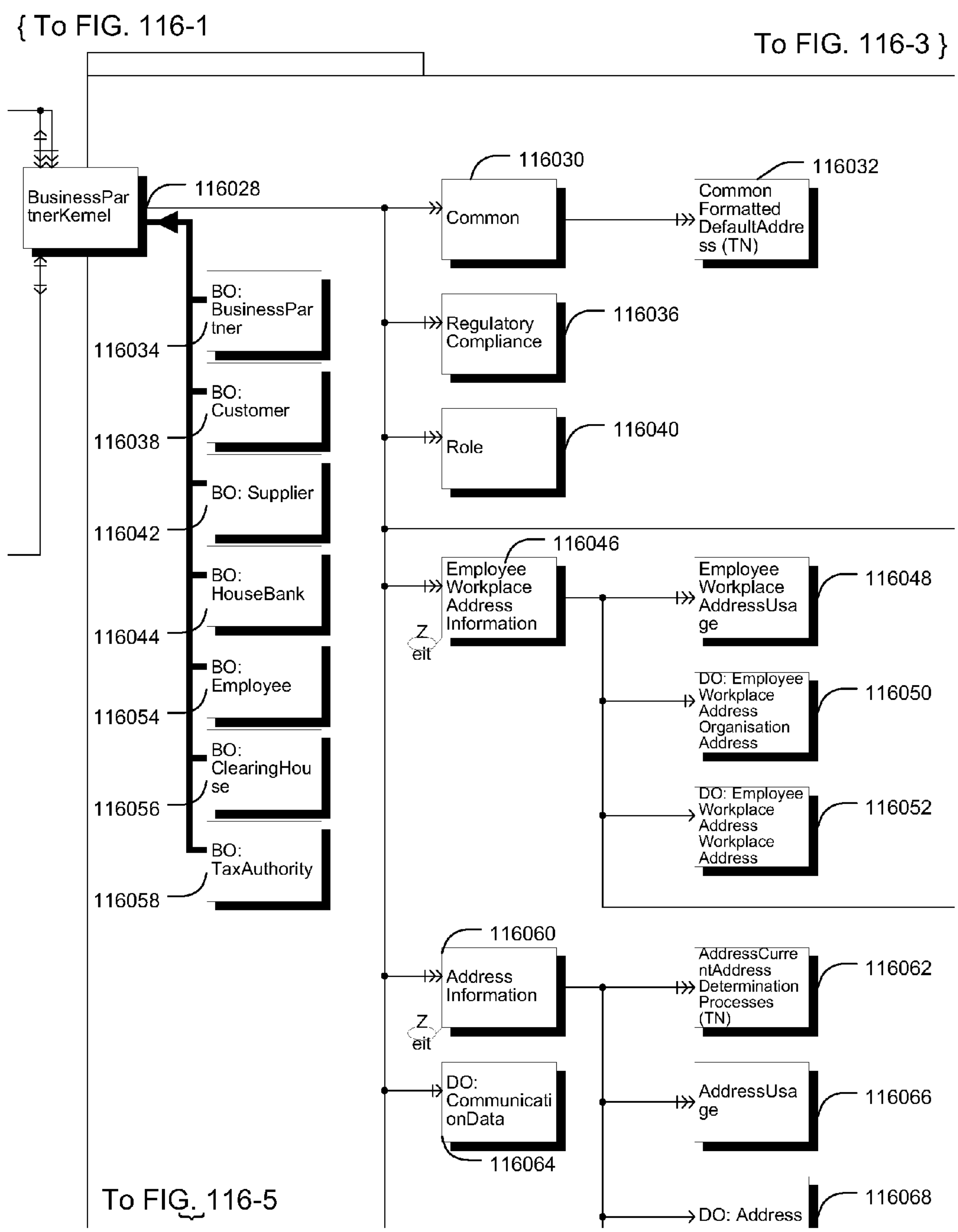
Figures 3, 116:
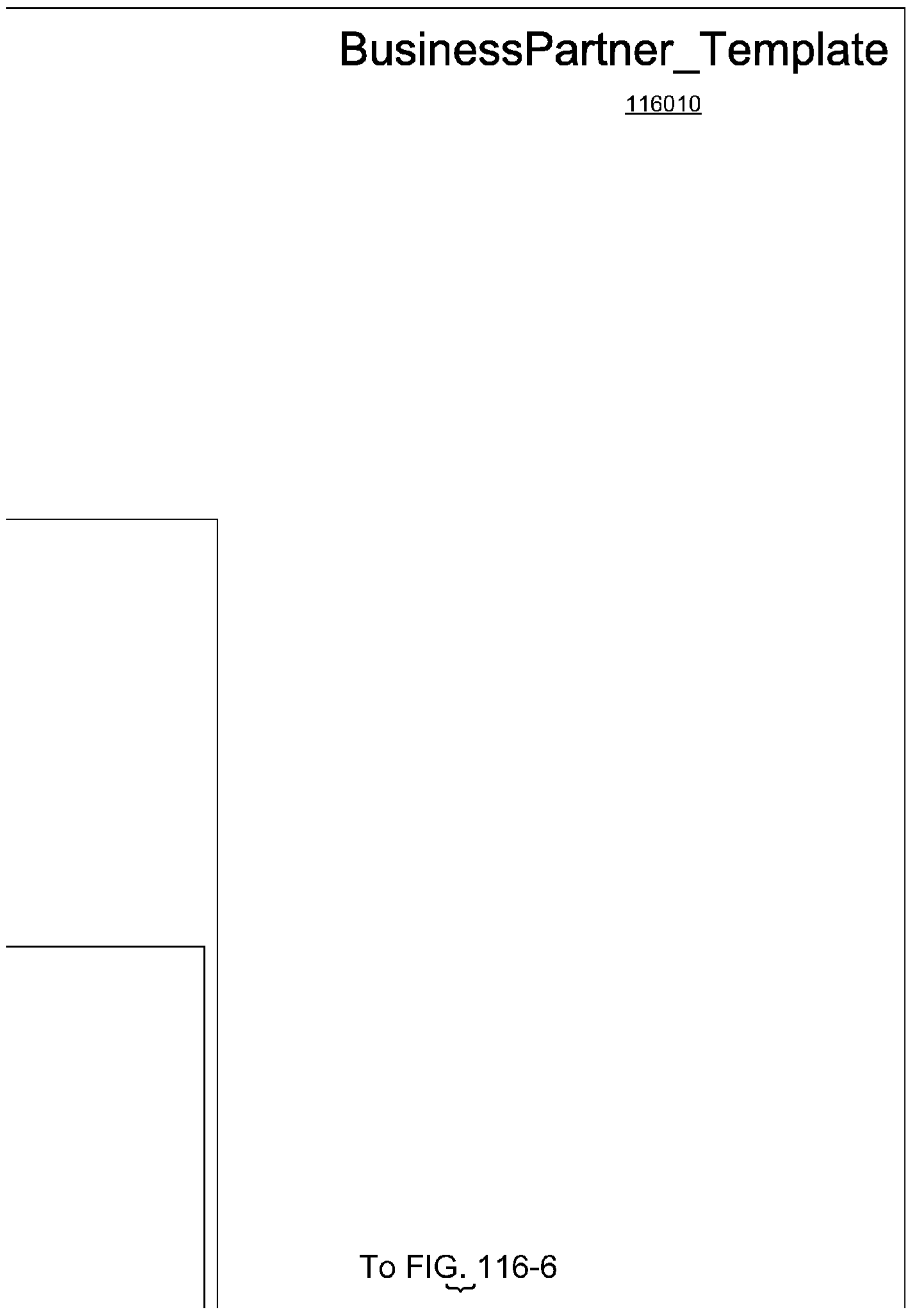
Figures 4, 116:
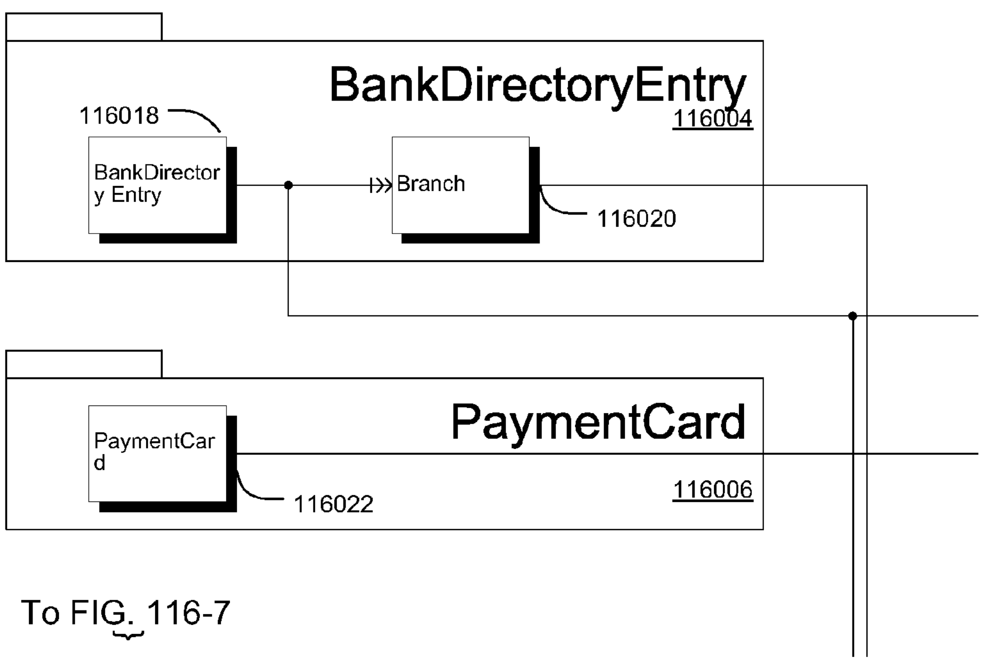
Figures 5, 116:
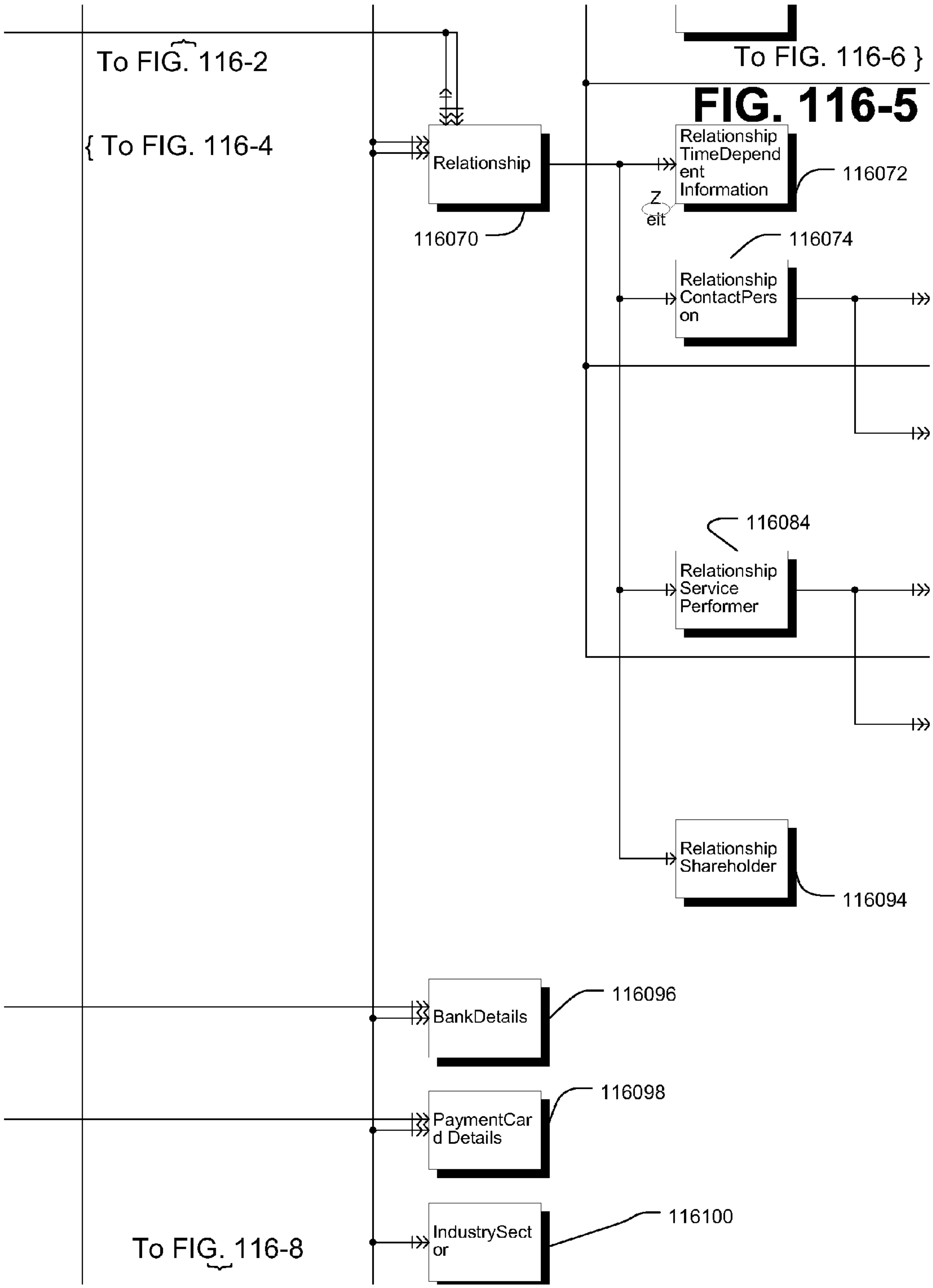
Figures 6, 116:
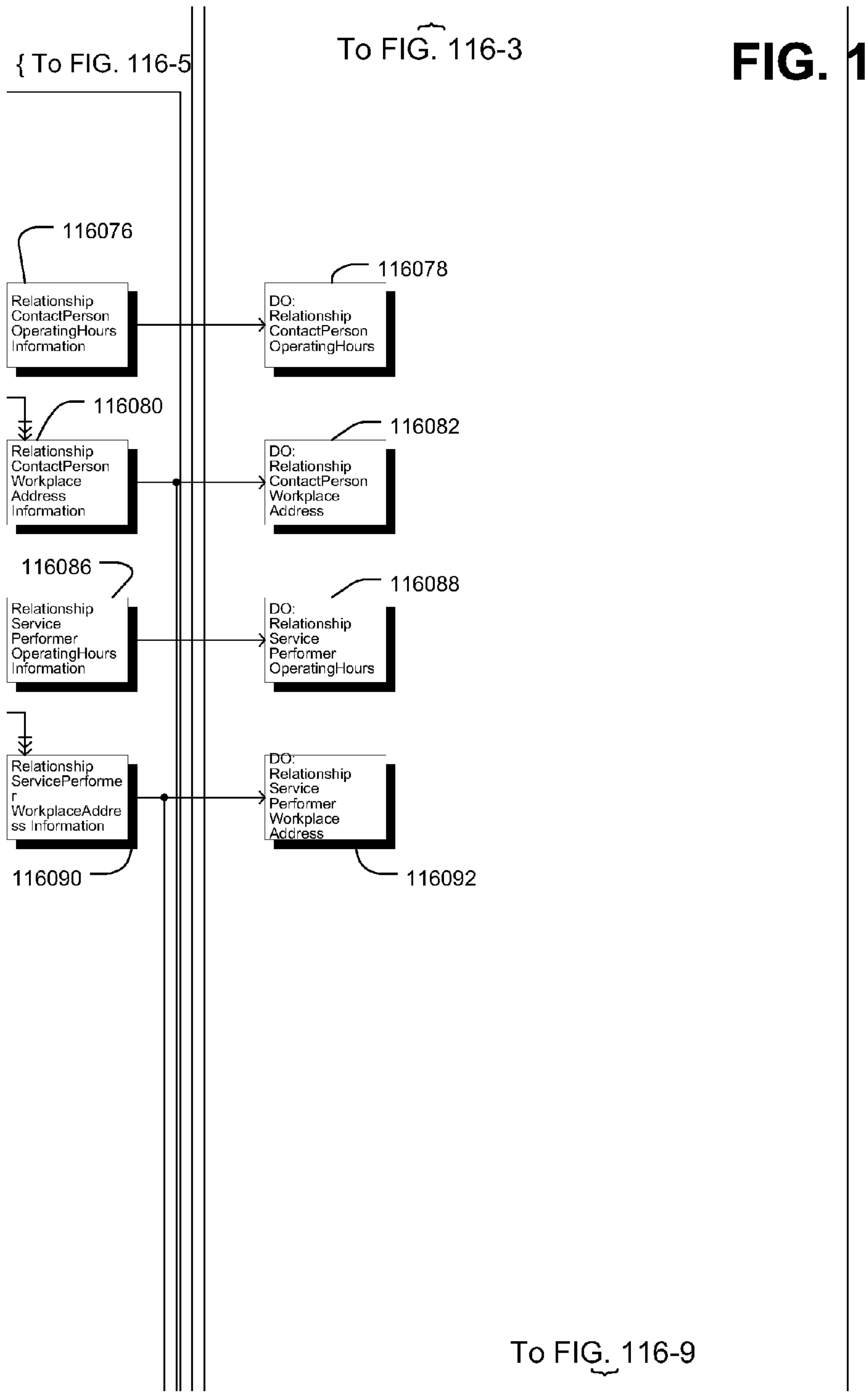
Figures 7, 116:
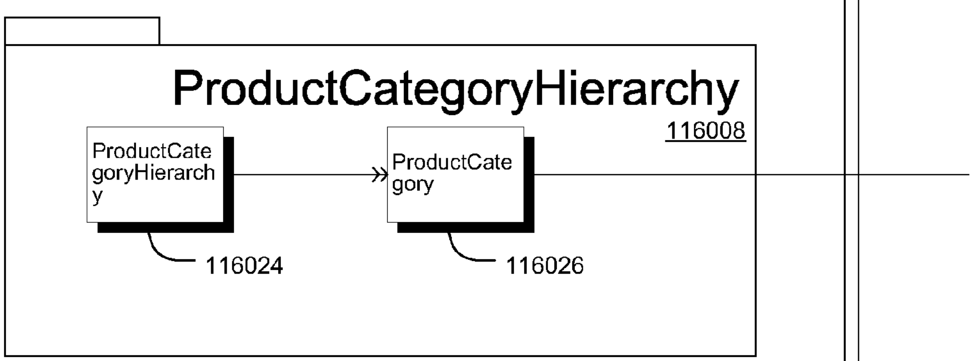
Figures 8, 116:
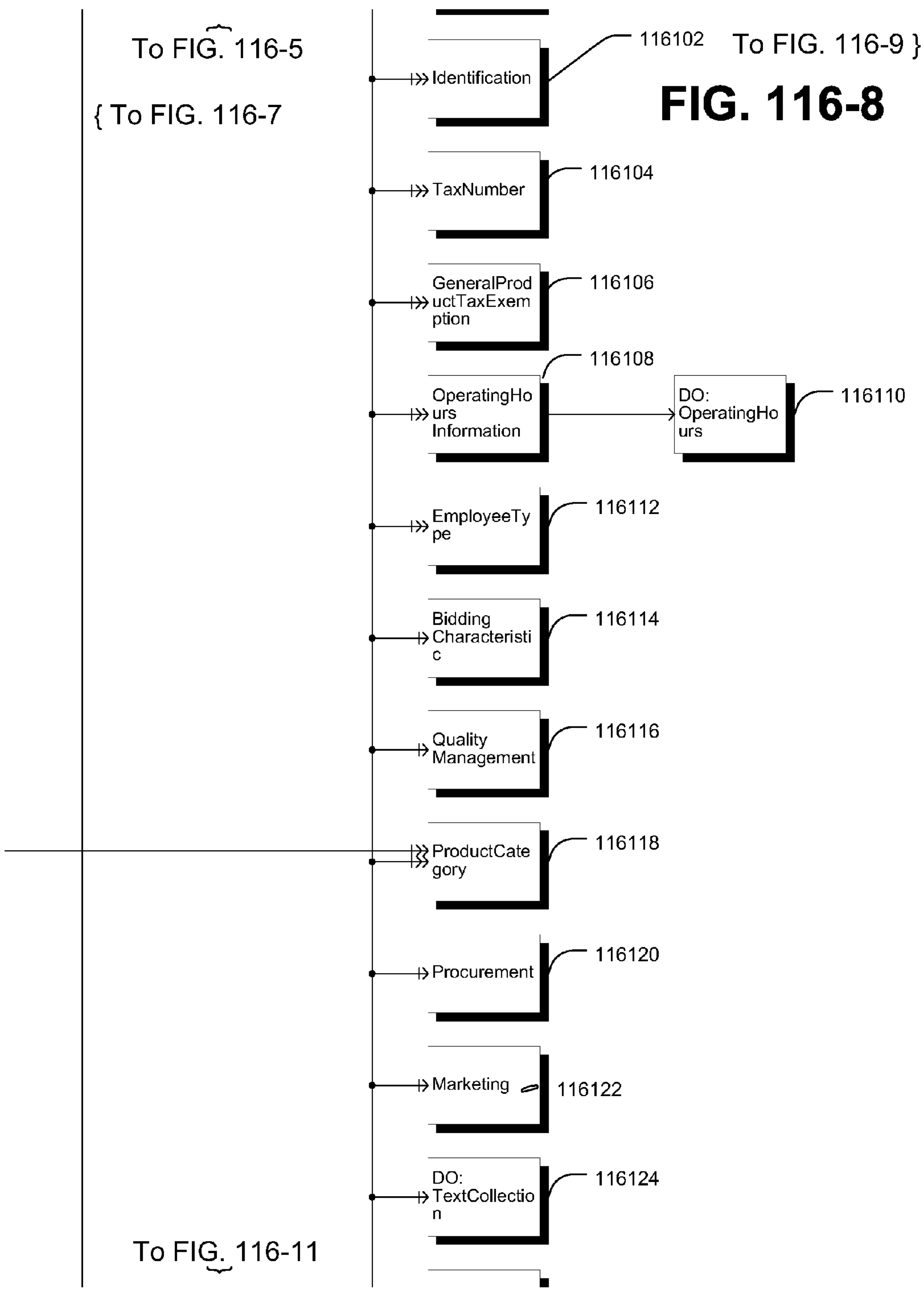
Figures 11, 116:
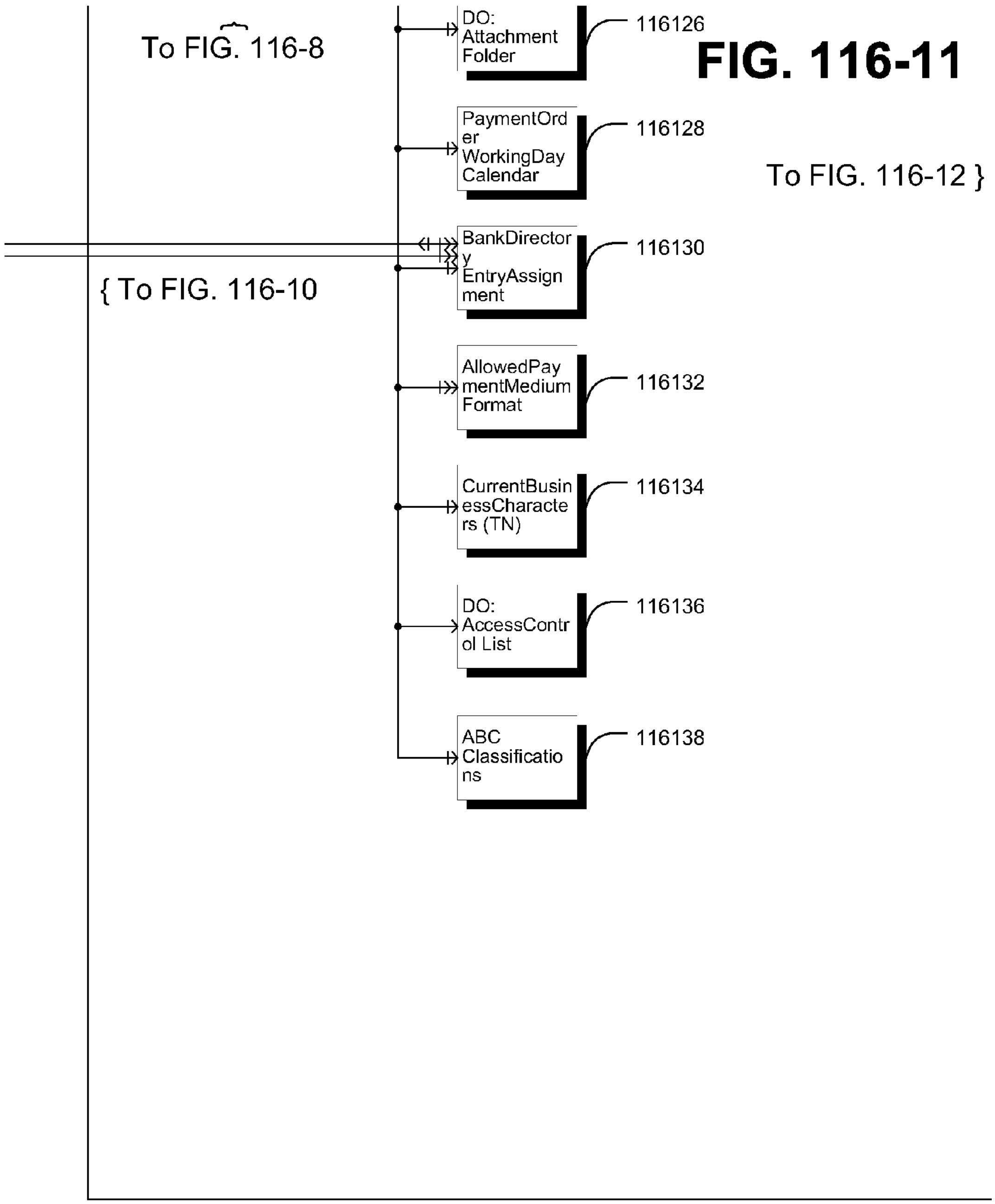
Figures 12, 116:
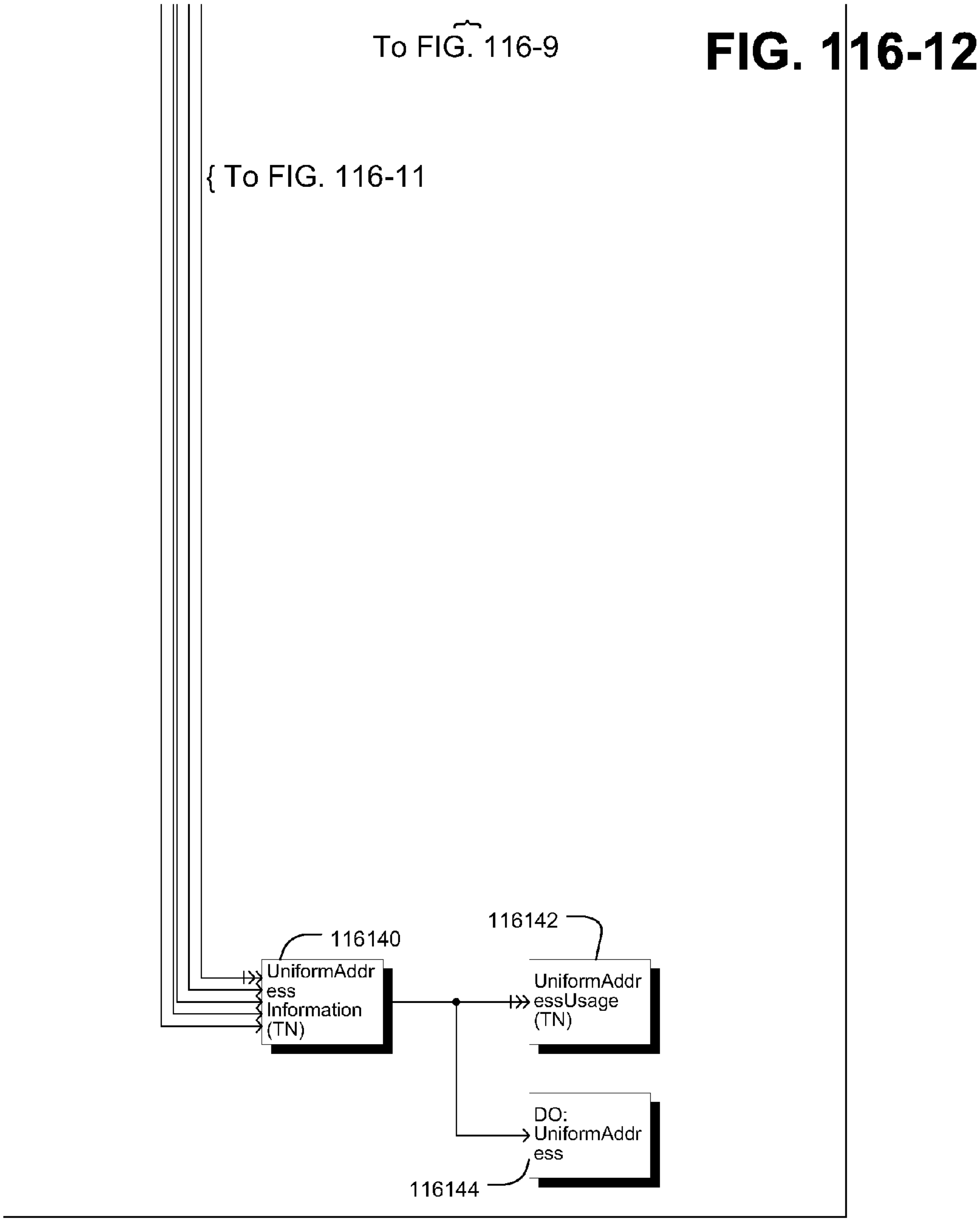

FIGS. 116-1 through 116-12 illustrate an example Business Partner business object model 116010. Specifically, this model depicts interactions among various hierarchical components of the Business Partner, as well as external components that interact with the Business Partner (shown here as 116000 through 116008 and 116012 through 116026).

A person, an organization, or a group of persons or organizations in which a company has a business interest. An organization is a legal entity. Organization should not be confused with organizational unit. An organizational unit is a business unit within an organizational structure (for example, organizational plan, financial structure, geographical structure) of a company. The business object template Business Partner and the business objects derived from the template Business Partner may be part of the process component Business Partner Data Processing. Business partner can consist of the general data (for example, name, address, bank details) from the business partner relationships (for example, the contact person and shareholder relationship) and of data needed for particular business processes such as sales or purchasing data. The business object template Business Partner may comprise all nodes, associations, actions, and queries of its derivates Customer, Supplier, Employee, House Bank, Clearing House, Tax Authority and Business Partner. The business object template Business Partner is represented by the root node BusinessPartnerBusinessPartner.

A Business Partner (root) 116028 specifies whether it is a person, organization, or a group of persons or organizations in question. It also can specify its roles and relationships with other business partners as well as details for its unique identification.

The elements located at the Root node can be defined by the data type BusinessPartnerElements. In certain implementations, these elements can include: UUID, InternalID, CategoryCode, NumberRangeIntervalBusinessPartnerGroupCode, ActsAsOrganisationalCentreIndicator, CreatedFromOrganisationalCentreIndicator, SystemAdministrativeData, and Status.

UUID is a universal identification, which can be unique, of the business partner and is an alternative key. The UUID may be based on GDT UUID. InternalID is an internal number of the business partner and is an alternative key. The InternalID may be based on CDT BusinessPartnerInternalID. CategoryCode specifies whether the business partner is a person, organization or a group. The CategoryCode may be based on GDT BusinessPartnerCategoryCode. NumberRangeIntervalBusinessPartnerGroupCode determines the number range interval from which the number is drawn. The NumberRangeIntervalBusinessPartnerGroupCode may be based on GDT NumberRangeIntervalBusinessPartnerGroupCode. ActsAsOrganisationalCentreIndicator is the business partner that may act as a organizational centre. The ActsAsOrganisationalCentreIndicator may be based on GDT Indicator Qualifier BusinessPartnerActsAsOrganisationalCentre. CreatedFromOrganisationalCentreIndicator is the business partner that was created from a organizational centre. The CreatedFromOrganisationalCentreIndicator may be based on GDT Qualifier CreatedFromOrganisationalCentre. SystemAdministrativeData is the administrative data of a business partner. This data may include system users and change dates/times. The SystemAdministrativeData may be based on GDT SystemAdministrativeData. Status is the status of the business partner. Status may be based on IDT BusinessPartnerStatus. In certain implementations, Status may include the element: LifeCycleStatusCode. LifeCycleStatusCode is the status of the business partner. The LifeCycleStatusCode may be based on GDT BusinessPartnerLifeCycleStatusCode.

In some implementations, the elements ActsAsOrganisationalCentreIndicator, CreatedFromOrganisationalCentreIndicator and LifeCycleStatusCode can't be changed.

There may be a number of composition relationships with subordinate nodes including:

Common 116030 may have a cardinality relationship of 1:n. Role 116040 may have a cardinality relationship of 1:cn. RegulatoryCompliance 116036 may have a cardinality relationship of 1:cn. CurrentBusinessCharacters may have a cardinality relationship of 1:c. EmployeeWorkplaceAddressInformation 116046 may have a cardinality relationship of 1:cn. AddressInformation 116060 may have a cardinality relationship of 1:cn. CommunicationData 116064 may have a cardinality relationship of 1:c. Relationship 116070 may have a cardinality relationship of 1:cn. BankDetails 116096 116098 may have a cardinality relationship of 1:cn. PaymentCardDetails may have a cardinality relationship of 1:cn. IndustrySector 116100 may have a cardinality relationship of 1:cn. Identification 116102 may have a cardinality relationship of 1:cn. TaxNumber 116104 may have a cardinality relationship of 1:cn. GeneralProductTaxExemption 116106 may have a cardinality relationship of 1:cn. OperatingHoursInformation 116108 may have a cardinality relationship of 1:cn. TextCollection 116124 may have a cardinality relationship of 1:c. AttachmentFolder 116126 may have a cardinality relationship of 1:c. EmployeeType 116112 may have a cardinality relationship of 1:cn. BiddingCharacteristic 116114 may have a cardinality relationship of 1:c. QualityManagement 116116 may have a cardinality relationship of 1:c. ProductCategory 116118 may have a cardinality relationship of 1:cn. Procurement 116120 may have a cardinality relationship of 1:c. Marketing 116122 may have a cardinality relationship of 1:c. PaymentOrderWorkingDayCalendar 116128 may have a cardinality relationship of 1:c. BankDirectoryEntryAssignment 116130 may have a cardinality relationship of 1:c. AllowedPaymentMediumFormats 116132 may have a cardinality relationship of 1:cn. UniformAddressInformation may have a cardinality relationship of 1:cn. AccessControlList 116136 may have a cardinality relationship of 1:1. ABCClassification 116138 may have a cardinality relationship of 1:c.

Inbound Association Relationships:

There may be a number of composition relationships including: 1) From the business object OrganisationalCentre/Root node. CorrespondingOrganisationalCentre may have a cardinality relationship of c:c. and is the organizational center that represents the same entity as the business partner. This association is active, when the element ActsAsOrganisationalCentreIndicator is set. 2) From the business object Identity/Root node. CreationIdentity may have a cardinality relationship of 1:cn and is an identity that created business partner. 3) From the business object Identity/Root node. LastChangeIdentity may have a cardinality relationship of c:cn and is an identity that changed the business partner the last time.

There may be a number of Associations for Navigation including: 1) Inner Business Object Association/Common Node. CurrentCommon may have a cardinality relationship of c:1 and is an association with the currently-valid general information for the business partner.

2) Inner Business Object Association/CommonFormatted-DefaultAddress Node 116032. CurrentCommonFormatted-DefaultAddress may have a cardinality relationship of c:1c and is an association with the currently-valid formatted standard address for the business partner.

3) Inner Business Object Association/AddressInformation Node CurrentDefaultAddressInformation may have a cardinality relationship of c:1c and is an association with the currently-valid standard address.

4) Inner Business Object Association/EmployeeWorkplaceAddressInformation Node 116048. CurrentDefaultEmployeeWorkplaceAddressInformation may have a cardinality relationship of c:1c and is an association with the currently-valid workplace address of the employee.

5) Inner Business Object Association/Relationship Node. HasContactPerson may have a cardinality relationship of c:cn and is an association with business partner relationships used in the specialization "Has Contact Person". (This is the directed contact person relationship from organization to person). In some implementations, this specialization association is only used in organizations. IsContactPersonFor may have a cardinality relationship of c:cn and is an association with business partner relationships used in the specialization "Is Contact Person For". (This is the directed contact person relationship from person to organization) In some implementations, this specialization association is only used in persons. CurrentHasContactPerson may have a cardinality relationship of c:cn and is an association with the currently-valid business partner relationships used in the specialization "Has Contact Person". (This is the directed contact person relationship from organization to person) In some implementations, this specialization association is only used in organizations. CurrentIsContactPersonFor may have a cardinality relationship of c:cn and is an association with the currently-valid business partner relationships used in the specialization "Is Contact Person For". (This is the directed contact person relationship from person to organization) In some implementations, this specialization association is only used in persons. CurrentDefaultHasContactPerson may have a cardinality relationship of c:c and is an association with the currently-valid business partner relationship used in the specialization "Has Contact Person" and which is flagged as the standard contact person. CurrentDefaultIsContactPersonFor may have a cardinality relationship of c:c and is an association with the currently-valid business partner relationship used in the specialization "Is Contact Person For" and which is flagged as the standard contact person. HasServicePerformer may have a cardinality relationship of c:cn and is an association with business partner relationships used in the specialization "Has Service Performer". IsServicePerformerFor may have a cardinality relationship of c:cn and is an association with service performer relationships used in the specialization "Is Service Performer For". CurrentHasServicePerformer may have a cardinality relationship of c:cn and is an association with the currently-valid business partner relationships used in the specialization "Has Service Performer". CurrentIsServicePerformerFor may have a cardinality relationship of c:cn and is an association with the currently-valid business partner relationships used in the specialization "Is Service Performer For". CurrentDefaultHasServicePerformer may have a cardinality relationship of c:c and is an association with the currently-valid business partner relationship used in the specialization "Has Service Performer" and which is flagged as the standard service performer. CurrentDefaultIsServicePerformerFor may have a cardinality relationship of c:c and is an association with the currently-valid business partner relationship used in the specialization "Is Service Performer For" and which is flagged as the standard service performer.

6) Inner Business Object Association/IndustrySector Node. DefaultIndustrySector may have a cardinality relationship of c:c and is an association with the standard industry of the standard industry system.

7) Inner Business Object Association/Identification Node. IdentificationDunAndBradstreetNumber may have a cardinality relationship of 1:c and is an association with a Dun and Bradstreet ID number. IdentificationSocialInsurance may have a cardinality relationship of 1:cn and is an association with the social insurance numbers.

8) Inner Business Object Association/OperatingHoursInformation Node. OperatingHoursInformationByOperatingHoursRole may have a cardinality relationship of c:cn and returns a specified type of operating hours. In some implementations, OperatingHoursInformationByOperatingHoursRole is filtered. The filter elements can be defined by the data type BusinessPartnerOperatingHoursInformationByOperatingHoursRoleFilterElements. In certain implementations, this element includes: OperatingHoursRoleCode. OperatingHoursRoleCode specifies the type of business hours that should be determined and is optional. The OperatingHoursRoleCode may be based on GDT BUSINESSPARTNER_OperatingHoursRoleCode.

9) Inner Business Object Association/UniformAddressInformation Node. CurrentUniformAddressInformationByAddressTypes may have a cardinality relationship of c:cn and returns business partner address within a uniform format. In some implementations, CurrentUniformAddressInformationByAddressTypes is filtered. The filter elements can be defined by the data type BusinessPartnerCurrentUniformAddressInformationByAddressTypesFilterElements. In certain implementations, these elements can include: MasterDataMainAddressIndicator, OnlyDefaultMasterDataMainAddressIndicator, CommunicationDataIndicator, EmployeeWorkplaceAddressIndicator, OnlyDefaultEmployeeWorkplaceAddressIndicator, RelationshipContactPersonWorkplaceAddressIndicator, OnlyDefaultRelationshipContactPersonWorkplaceAddressIndicator, RelationshipContactPersonOnlyDefaultWorkplaceAddressIndicator, RelationshipServicePerformerWorkplaceAddressIndicator, OnlyDefaultRelationshipServicePerformerWorkplaceAddressIndicator, and RelationshipServicePerformerOnlyDefaultWorkplaceAddressIndicator. MasterDataMainAddressIndicator specifies if the business partner main addresses should be shown and is optional. The MasterDataMainAddressIndicator may be based on GDT Indicator and, in some implementations, can have a Qualifier of MasterDataMainAddress. OnlyDefaultMasterDataMainAddressIndicator specifies if only the default of the business partner main addresses should be shown and is optional. The OnlyDefaultMasterDataMainAddressIndicator may be based on GDT Indicator and, in some implementations, can have a Qualifier of OnlyDefaultMasterDataMainAddress. CommunicationDataIndicator specifies if the communication data should be shown and is optional. The CommunicationDataIndicator may be based on GDT Indicator and, in some implementations, can have a Qualifier of CommunicationData. EmployeeWorkplaceAddressIndicator specifies if the employee workplace addresses should be shown and is optional. The EmployeeWorkplaceAddressIndicator may be based on GDT Indicator and, in some implementations, can have a Qualifier of EmployeeWorkplaceAddress. OnlyDefaultEmployeeWorkplaceAddressIndicator specifies if only the default employee workplace address should be shown and is optional. The OnlyDefaultEmployeeWorkplaceAddressIndicator may be based on GDT Indicator and, in some implementations, can have a Qualifier of OnlyDefaultEmployeeWorkplaceAddress. RelationshipContactPersonWorkplaceAddressIndicator specifies if workplace addresses of contact person relationships should be shown and is optional. The RelationshipContactPersonWorkplaceAddressIndicator may be based on GDT Indicator and, in some implementations, can have a Qualifier of RelationshipContactPersonWorkplaceAddress. OnlyDefaultRelationshipContactPersonWorkplaceAddressIndicator specifies if only the workplace addresses of the default contact person relationship should be shown and is optional. The OnlyDefaultRelationshipContactPersonWorkplaceAddressIndicator may be based on GDT Indicator and, in some implementations, can have a Qualifier of OnlyDefaultRelationshipContactPersonWorkplaceAddress. RelationshipContactPersonOnlyDefaultWorkplaceAddressIndicator specifies if only the default workplace addresses of the contact person relationships should be shown and is optional. The RelationshipContactPersonOnlyDefaultWorkplaceAddressIndicator may be based on GDT Indicator Qualifier RelationshipContactPersonOnlyDefaultWorkplaceAddress. RelationshipServicePerformerWorkplaceAddressIndicator specifies if workplace addresses of service performer relationships should be shown and is optional. The RelationshipServicePerformerWorkplaceAddressIndicator may be based on GDT Indicator Qualifier RelationshipServicePerformerWorkplaceAddress. OnlyDefaultRelationshipServicePerformerWorkplaceAddressIndicator specifies if only the workplace addresses of the default service performer relationship should be shown and is optional. The OnlyDefaultRelationshipServicePerformerWorkplaceAddressIndicator may be based on GDT Indicator and, in some implementations, can have a Qualifier of OnlyDefaultRelationshipServicePerformerWorkplaceAddress. RelationshipServicePerformerOnlyDefaultWorkplaceAddressIndicator specifies if only the default workplace addresses of the service performer relationships should be shown and is optional. The RelationshipServicePerformerOnlyDefaultWorkplaceAddressIndicator may be based on GDT Indicator and, in some implementations, can have a Qualifier of RelationshipServicePerformerOnlyDefaultWorkplaceAddress.

10) Inner Business Object Association/EmployeeWorkplaceAddressInformation Node. EmployeeWorkplaceAddressInformationByPartyAddressDetermination may have a cardinality relationship of c:cn and returns those addresses assigned at a particular point in time to an address determination process. In some implementations, EmployeeWorkplaceAddressInformationByPartyAddressDetermination is filtered. The filter elements can be defined by the data type BusinessPartnerEmployeeWorkplaceAddressInformationByPartyAddressDeterminationFilterElements. In certain implementations, these elements can include: PartyAddressDeterminationCode, AddressUsageValidityDate, and AddressUsageDefaultIndicator. PartyAddressDeterminationCode is an address determination process for which addresses may be determined. The PartyAddressDeterminationCode may be based on GDT PartyAddressDeterminationCode. AddressUsageValidityDate is the date for determining assignment and is optional. The AddressUsageValidityDate may be based on GDT Date and, in some implementations, can have a Qualifier of Validity. AddressUsageDefaultIndicator is optional. If this indicator is set, then only one address is returned. If this flag is not set and several addresses are returned, then the first can be the one that has been maintained as the standard address. The AddressUsageDefaultIndicator may be based on GDT Indicator and, in some implementations, can have a Qualifier of Default.

11) Inner Business Object Association/AddressInformation Node. AddressInformationByPartyAddressDetermination may have a cardinality relationship of c:cn and returns those addresses assigned at a particular point in time to an address determination process. In some implementations, AddressInformationByPartyAddressDetermination is filtered. The filter elements can be defined by the data type BusinessPartnerAddressInformationByPartyAddressDeterminationFilterElements. In certain implementations, these elements can include: PartyAddressDeterminationCode, AddressUsageValidityCode, and AddressUsageDefaultIndicator. PartyAddressDeterminationCode is the address determination process for which addresses are to be determined. The PartyAddressDeterminationCode may be based on GDT PartyAddressDeterminationCode. AddressUsageValidityDate is the date for determining assignment and is optional. The AddressUsageValidityDate may be based on GDT Date and, in some implementations, can have a Qualifier of Validity. AddressUsageDefaultIndicator is optional. If this indicator is set, then only one address is returned. If this flag is not set and several addresses are returned, then the first is the one that has been maintained as the standard address. The AddressUsageDefaultIndicator may be based on GDT Indicator and, in some implementations, can have a Qualifier of Default.

12) Inner Business Object Association/Role Node. RoleByBusinessCharacter may have a cardinality relationship of c:cn and returns those roles assigned at a particular point in time to a business partner and which are grouped by a specific business character. In some implementations, RoleByBusinessCharacter is filtered. The filter elements can be defined by the data type BusinessPartnerRoleByBusinessCharacterFilterElements. In certain implementations, these elements can include: BusinessCharacterCode, and RoleValidityDate. BusinessCharacterCode is a business Character for which the roles of a business partner are to be determined. The BusinessCharacterCode may be based on GDT BUSINESSPARTNER_PartyBusinessCharacterCode. RoleValidityDate is the date for determining assignment and is optional. The RoleValidityDate may be based on GDT Date and, in some implementations, can have a Qualifier of Validity.

13) Inner Business Object Association/Identification Node. IdentificationByPartyIdentifierCategory may have a cardinality relationship of c:cn and returns the alternative identifiers for a PartyIdentifierCategory. In some implementations, IdentificationByPartyIdentifierCategory is filtered. The filter elements can be defined by the data type BusinessPartnerIdentificationByPartyIdentifierCategoryFilterElements. In certain implementations, this element is: PartyIdentifierCategoryCode. PartyIdentifierCategoryCode is the PartyIdentifierCategory for which alternative identifiers are to be determined. The PartyIdentifierCategoryCode may be based on GDT PartyIdentifierCategoryCode.

14) Inner Business Object Association/Relationship Node. RelationshipByRoleCode may have a cardinality relationship of c:cn and returns those addresses assigned to a RoleCode that is assigned to a business partner at a particular point in time. In some implementations, RelationshipByRoleCode is filtered. The filter elements can be defined by the data type BusinessPartnerRelationshipByRoleCodeFilterElements. In certain implementations, these elements can include: RoleCode, RelationshipValidityDate, and RelationshipTimeDependentInformationDefaultIndicator. RoleCode defines the roles for which the relationships are to be determined. The RoleCode may be based on GDT BusinessPartnerRelationshipRoleCode. RelationshipValidityDate is the date for determining assignment and is optional. The RelationshipValidityDate may be based on GDT Date and, in some implementations, can have a Qualifier of Validity. RelationshipTimeDependentInformationDefaultIndicator is optional. If this indicator is set, then only one relationship is returned. If, for the point in time RelationshipValidityDate, a relationship in the subnode RelationshipTimeDependentInformation 116072 is indicated as the default relationship, then this relationship is the one that is returned, otherwise no relationship is returned. If this indicator has not been set then all those relationships that may be valid at the point in time RelationshipValidityDate can be returned for the RoleCode specified. The RelationshipTimeDependentInformationDefaultIndicator may be based on GDT Indicator and, in some implementations, can have a Qualifier of Default. By the phrase "Inner Object Association" we mean that the source and target business object can be the same. In the projection Customer, the association may go from the business object customer to the business object customer and the projection Employee may go from the business object employee to the business object employee.

Enterprise Service Infrastructure Actions

CreateCustomerFromExistingBusinessPartner is defined as an existing business partner who may also be created as a customer. If you want to create a Customer you can do this within the BO Customer. But if the customer you may want to create exists already as a business partner but not as a customer, you can make a customer out of this business partner by using this action.

The action elements can be defined by the data type: BusinessPartnerCreateCustomerFromExistingBusinessPartnerActionElements. In certain implementations, these elements can include: InternalID, UUID, and RoleCode. InternalID is the internal number of the business partner to created as a customer. The InternalID may be based on GDT BusinessPartnerInternalID. UUID is a universal identification, which can be unique, of the business partner to created as a customer. The UUID may be based on GDT UUID. RoleCode is the role to be added to the business partner. The RuleCode may be based on GDT BusinessPartnerRoleCode: Restriction—only those BusinessPartnerRoleCodes belonging to a business character assigned to the business object Customer can be permitted. In some implementations, this action may only be performed by the UI, an inbound agent, and other business objects.

CreateSupplierFromExistingBusinessPartner is defined as an existing business partner may also be created as a supplier. If you want to create a supplier you can do this within the BO Supplier. But if the supplier you want to create already exists as a business partner but not as a supplier, you can make a supplier out of this business partner by using this action. The action elements can be defined by the data type: BusinessPartnerCreateSupplierFromExistingBusinessPartnerActionElements. In certain implementations, these elements can include: InternalID, UUID, and RuleCode. InternalID is the internal number of the business partner to be created as a supplier. The InternalID may be based on GDT BusinessPartnerInternalID. UUID is a universal identification, which can be unique, of the business partner to be created as a supplier. The UUID may be based on GDT UUID. RoleCode is a role to be added to the business partner. The RoleCode may be based on GDT BusinessPartnerRoleCode: Restriction—only those BusinessPartnerRoleCodes belonging to a business character assigned to the business object Supplier may be permitted. In some implementations, this action may only be performed by the UI, an inbound agent, and other business objects.

CreateEmployeeFromExistingBusinessPartner is defined as an existing business partner may also be created as an employee. If you want to create an employee you can do this within the BO Employee. But if the employee you want to create exists already as a business partner but not as an employee, you can make an employee out of this business partner by using this action. The action elements can be defined by the data type: BusinessPartnerCreateEmployeeFromExistingBusinessPartnerActionElements. In certain implementations, these elements can include: InternalID, UUID, EmployeeTypeInternalEmployeeIndicator, and IdentificationEmployeeID. InternalID is the internal number of the business partner to be created as an employee. The InternalID may be based on GDT BusinessPartnerInternalID. UUID is a universal identification, which can be unique, of the business partner to be created as an employee. The UUID may be based on GDT UUID. EmployeeTypeInternalEmployeeIndicator specifies whether the employee should be an external or an internal employee. The EmployeeTypeInternalEmployeeIndicator may be based on GDT Indicator and, in some implementations, can have a Qualifier of InternalEmployee. EmployeeTypeValidityPeriod specifies the period for which the type of employee is valid and is optional. The EmployeeTypeValidityPeriod may be based on GDT CLOSED_DatePeriod and, in some implementations, can have a Qualifier of Validity. IdentificationEmployeeID specifies the EmployeeID in case of an external number assignment and is optional. The IdentificationEmployeeID may be based on GDT EmployeeID. In some implementations, this action may only be performed by the UI, an inbound agent, and other business objects.

CreateHouseBankFromExistingBusinessPartner is defined as an existing business partner may also be created as a house bank. If you want to create a house bank you can do this within the BO House Bank. But if the house bank you want to create exists already as a business partner but not as a house bank, you can make a house bank out of this business partner by using this action. The action elements can be defined by the data type: BusinessPartnerCreateHouseBankFromExistingBusinessPartnerActionElements. In certain implementations, these elements can include: InternalID, and UUID. InternalID is the internal number of the business partner to be created as a house bank. The InternalID may be based on GDT BusinessPartnerInternalID. UUID is a universal identification, which can be unique, of the business partner to be created as a house bank. The UUID may be based on GDT UUID. In some implementations, this action may only be performed by the UI, an inbound agent, and other business objects.

CreateClearingHouseFromExistingBusinessPartner is defined as an existing business partner may also be created as a clearing house. If you want to create a clearing house you can do this within the BO Clearing House. But if the clearing house you want to create exists already as a business partner but not as a clearing house, you can make a clearing house out of this business partner by using this action. The action elements can be defined by the data type: BusinessPartnerCreateClearingHouseFromExisting-BusinessPartnerActionElements. In certain implementations, these elements can include: InternalID, and UUID. InternalID is the internal number of the business partner to be created as a clearing house. The InternalID may be based on GDT BusinessPartnerInternalID. UUID is a universal identification, which can be unique, of the business partner to be created as a clearing house. The UUID may be based on GDT UUID.

In some implementations, this action may only be performed by the UI, an inbound agent, and other business objects.

CreateTaxAuthorityFromExistingBusinessPartner is defined as an existing business partner may also be created as a tax authority. If you want to create a tax authority you can do this within the BO Tax Authority. But if the tax authority you want to create exists already as a business partner but not as a tax authority, you can make a tax authority out of this business partner by using this action. The action elements can be defined by the data type BusinessPartnerCreateTaxAuthorityFromExistingBusinessPartnerActionElements. In certain implementations, these elements can include: InternalID, and UUID. InternalID is the internal number of the business partner to be created as a tax authority. The InternalID may be based on GDT BusinessPartnerInternalID. UUID is a universal identification, which can be unique, of the business partner to be created as a tax authority. The UUID may be based on GDT UUID. In some implementations, this action may only be performed by the UI, an inbound agent, and other business objects.

CreateCorrespondingOrganisationalCentre is defined as an organizational center may be created for the business partner and models the same entity. Some objects of a company structure can be required for processes in which the focus may be on the object as a component in an organizational structure, as well as for processes in which only business partners may be used. For this reason it may be necessary to model these entities as both an organizational center and a business partner. The action is only possible if the business partner is an organization. The element ActsAsOrganisationalCentreIndicator in the root node is maintained. The association CorrespondingOrganisationalCentre may become active. Changes to other objects: An OrganisationalCentre is created. The elements ActsAsBusinessPartnerIndicator and CreatedWithCorrespondingBusinessPartnerReferenceIndicator within this organizational centre may be set. (The OrganisationalCentre can be created using the ESI action CreateWithCorrespondingOrganisationalCentreReference in the OrganisationalCentre business object). In some implementations, this action may only be performed by the UI and an inbound agent.

CreateWithCorrespondingOrganisationalCentreReference is defined as a business partner may be created with reference to a OrganisationalCentre. Both the business partner and the organizational centre do represent the same real live entity. Some objects of a company structure can be required for processes in which the focus is on the object as a component in an organizational structure, as well as for processes in which only business partners may be used. For this reason, it may be necessary to model these entities as both an organizational center and a business partner.

In some implementations, the action may only be possible if an OrganisationalCentre exists with the UUID specified in the parameters OrganisationalCentreUUID. A business partner may be created with the category Organization that has the same UUID as the OrganisationalCentre. The business partner may get a standard address and a name that matches the standard address and name in the OrganisationalCentre. The Elements ActsAsOrganizationalCentreIndicator and CreatedWithCorrespondingOrganizationalCentreReferenceIndicator within the business partner can be set and the association CorrespondingOrganisationalCentre may become active. The Element ActsAsBusinessPartnerIndicator within the organizational centre can be set and the association CorrespondingBusinessPartner may become active. The action elements can be defined by the data type: BusinessPartnerCreateWithCorrespondingOrganisational-CentreReferenceActionElements. In certain implementations, this element includes: OrganisationalCentreUUID. OrganisationalCentreUUID is a universal identification, which can be unique, of the OrganisationalCentre for which a business partner is being created that may represent the same entity. The OrganisationalCentreUUID may be based on GDT UUID. In some implementations, this action may only be carried out by the ESI action CreateCorrespondingBusinessPartner (in the OrganisationalCentre) that may create identical business partners for an OrganisationalCentre.

A QueryByNamesAndKeyWords query returns a list of business partners that belong to the derived business object for which the query is executed. The name and search criteria can be entered as the most important selection parameters. The data type BusinessPartnerNamesAndKeyWordsQueryElements defines the query elements: InternalID, UUID, CategoryCode, BusinessPartnerName, BusinessPartnerAdditionalName, RoleCode, RoleBusinessObjectTypeCode, CommonKeyWordsText, CommonAdditionalKeyWordsText, CommonLegalCompetenceIndicator, LifeCycleStatusCode, ValidityDate. InternalID is of GDT type BusinessPartnerInternalID. UUID is of GDT type UUID. CategoryCode is of GDT type BusinessPartnerCategoryCode. With regard to BusinessPartnerName, only those business partners whose first organization name or group name, or their last name matches the name specified here are selected. (If a category is also specified (query element CategoryCode), the name entered is then compared to the name component of the category only). BusinessPartnerName is of GDT type LANGUAGEINDEPENDENT_MEDIUM_Name and, in some implementations, can have a Qualifier of BusinessPartner. With regard to BusinessPartnerAdditionalName, only those business partners whose second organization name or group name, or their first name matches the name specified here are selected. (If a category is also specified (query element CategoryCode), the name entered is then compared to the name component of the category only). BusinessPartnerAdditionalName is of GDT type LANGUAGEINDEPENDENT_MEDIUM_Name and, in some implementations, can have a Qualifier of BusinessPartnerAdditional. RoleCode is of GDT type BusinessPartnerRoleCode, only those code values assigned to the derived business object can be selected. RoleBusinessObjectTypeCode is of GDT type BusinessObjectTypeCode. In some implementations, restrictions include: the value range includes only the values of the business objects derived from the business partner template. CommonKeyWordsText is of GDT type KeyWordsText. CommonAdditionalKeyWordsText is of GDT type KeyWordsText and, in some implementations, can have a Qualifier of Additional. CommonLegalCompetenceIndicator is of GDT type Indicator and, in some implementations, can have a Qualifier of LegalCompetence. LifeCycleStatusCode is of GDT type BusinessPartnerLife- CycleStatusCode. With regard to ValidityDate, only the data that is valid on the date specified here is selected. ValidityDate is of GDT type Date and, in some implementations, can have a Qualifier of Validity.

A QueryByCommunicationData query returns a list of business partners that belong to the derived business object for which the query is executed. Telephone numbers and fax numbers can be entered as the most important selection parameters. The data type BusinessPartnerCommunicationDataQueryElements defines the query elements: NormalisedPhoneNumberDescription, NormalisedFacsimileNumberDescription, InternalID, UUID, CategoryCode, BusinessPartnerName, BusinessPartnerAdditionalName, CommonKeyWordsText, CommonAdditionalKeyWordsText, LifeCycleStatusCode, ValidityDate. With regard to NormalisedPhoneNumberDescription, in some implementations, only those business partners that have an address-dependent or address-independent telephone number that matches the number specified here are selected. In addition, those business partners with the category Person and Organization whose telephone number for the workplace address matches the number specified here are selected. Also, those employees whose telephone number for the workplace address match the number specified here are selected. NormalisedPhoneNumberDescription is of GDT type LANGUAGEINDEPENDENT_MEDIUM_Description and, in some implementations, can have a Qualifier of NormalisedPhoneNumber. With regard to NormalisedFacsimileNumberDescription, in some implementations, only those business partners that have an address-dependent or address-independent fax number that matches the number specified here are selected. In addition, those business partners with the category Person and Organization whose fax number for the workplace address matches the number specified here are selected. Also, those employees whose fax number for the workplace address match the number specified here are selected. NormalisedFacsimileNumberDescription is of GDT type LANGUAGEINDEPENDENT_MEDIUM_Description and, in some implementations, can have a Qualifier of NormalisedFacsimileNumber. InternalID is of GDT type BusinessPartnerInternalID. UUID is of GDT type UUID. CategoryCode is of GDT type BusinessPartnerCategoryCode. With regard to BusinessPartnerName, in some implementations, only those business partners whose first organization name or group name, or their last name matches the name specified here are selected. (If a category is also specified (query element CategoryCode), the name entered is then compared to the name component of the category only.) BusinessPartnerName is of GDT type LANGUAGEINDEPENDENT_MEDIUM_Name and, in some implementations, can have a Qualifier of BusinessPartner. With regard to, BusinessPartnerAdditionalName, in some implementations, only those business partners whose second organization name or group name, or their first name matches the name specified here are selected. (If a category is also specified (query element CategoryCode), the name entered is then compared to the name component of the category only.) BusinessPartnerAdditionalName is of GDT type LANGUAGEINDEPENDENT_MEDIUM_Name and, in some implementations, can have a Qualifier of BusinessPartnerAdditional. CommonKeyWordsText is of GDT type KeyWordsText. CommonAdditionalKeyWordsText is of GDT type KeyWordsText and, in some implementations, can have a Qualifier of Additional. LifeCycleStatusCode is of GDT type BusinessPartnerLifeCycleStatusCode. With regard to ValidityDate, in some implementations, only the data that is valid on the date specified here is selected. ValidityDate is of GDT type Date and, in some implementations, can have a Qualifier of Validity.

A QueryByRole query returns a list of business partners that belong to the derived business object for which the query is executed. The role can be entered as the most important selection parameter.

The data type BusinessPartnerRoleQueryElements defines the query elements: RoleCode, InternalID, UUID, CategoryCode, BusinessPartnerName, BusinessPartnerAdditionalName, CommonKeyWordsText, CommonAdditionalKeyWordsText, LifeCycleStatusCode, ValidityDate. RoleCode is of GDT type BusinessPartnerRoleCode, only those code values assigned to the derived business object can be selected. RoleBusinessObjectTypeCode is of GDT type BusinessObjectTypeCode and in some implementations has the following restrictions: The value range includes only the values of the business objects derived from the business partner template. InternalID is of GDT type BusinessPartnerInternalID. UUID is of GDT type UUID. CategoryCode is of GDT type BusinessPartnerCategoryCode. With regard to BusinessPartnerName, in some implementations, only those business partners whose first organization name or group name, or their last name matches the name specified here are selected. (If a category is also specified (query element CategoryCode), the name entered is then compared to the name component of the category only.) BusinessPartnerName is of GDT type LANGUAGEINDEPENDENT_MEDIUM_Name and, in some implementations, can have a Qualifier of BusinessPartner. With regard to BusinessPartnerAdditionalName in some implementations, only those business partners whose second organization name or group name, or their first name matches the name specified here are selected. (If a category is also specified (query element CategoryCode), the name entered is then compared to the name component of the category only.) BusinessPartnerAdditionalName is of GDT type LANGUAGEINDEPENDENT_MEDIUM_Name and, in some implementations, can have a Qualifier of BusinessPartnerAdditional. CommonKeyWordsText is of GDT type KeyWordsText. CommonAdditionalKeyWordsText is of GDT type KeyWordsText and, in some implementations, can have a Qualifier of Additional. LifeCycleStatusCode is of GDT type BusinessPartnerLifeCycleStatusCode. With regard to ValidityDate in some implementations, only the data that is valid on the date specified here is selected. ValidityDate is of GDT type Date and, in some implementations, can have a Qualifier of Validity.

In some implementations, The element BusinessObjectTypeCode is only active for the projection business object Business Partner.

A QueryByIdentification query returns a list of business partners that belong to the derived business object for which the query is executed. An alternative identifier can be entered as the most important selection parameter. The data type BusinessPartnerIdentificationQueryElements defines the query elements: IdentificationPartyIdentifierTypeCode, IdentificationBusinessPartnerID, InternalID, UUID, CategoryCode, BusinessPartnerName, BusinessPartnerAdditionalName, CommonKeyWordsText, CommonAdditionalKeyWordsText, LifeCycleStatusCode, ValidityDate. IdentificationPartyIdentifierTypeCode is of GDT type PartyIdentifierTypeCode. IdentificationBusinessPartnerID is of GDT type BusinessPartnerID. InternalID is of GDT type BusinessPartnerInternalID. UUID is of GDT type UUID. CategoryCode is of GDT type BusinessPartnerCategoryCode. With regard to BusinessPartnerName, in some implementations, only those business partners whose first organization name or group name, or their last name matches the name specified here are selected. (If a category is also specified (query element CategoryCode), the name entered is then compared to the name component of the category only.) BusinessPartnerName is of GDT type LANGUAGEINDEPENDENT_MEDIUM_Name and, in some implementations, can have a Qualifier of BusinessPartner. With regard to BusinessPartnerAdditionalName in some implementations, only those business partners whose second organization name or group name, or their first name matches the name specified here are selected. (If a category is also specified (query element CategoryCode), the name entered is then compared to the name component of the category only.) BusinessPartnerAdditionalName is of GDT type LANGUAGEINDEPENDENT_MEDIUM_Name and, in some implementations, can have a Qualifier of BusinessPartnerAdditional. CommonKeyWordsText is of GDT type KeyWordsText. CommonAdditionalKeyWordsText is of GDT type KeyWordsText and, in some implementations, can have a Qualifier of Additional. LifeCycleStatusCode is of GDT type BusinessPartnerLifeCycleStatusCode. With regard to ValidityDate in some implementations, only the data that is valid on the date specified here is selected. ValidityDate is of GDT type Date and, in some implementations, can have a Qualifier of Validity.

QueryByBankDetails: This query returns a list of business partners that belong to the derived business object for which the query is executed. The account number and bank key of the banking details can be entered as the most important selection parameters. The data type BusinessPartnerBankDetailsQueryElements defines the query elements: BankDirectoryEntryCountryCode, BankDetailsBankInternalID, BankDetailsBankAccountID, BankDetailsBankAccountStandardID, InternalID, UUID, CategoryCode, BusinessPartnerName, BusinessPartnerAdditionalName, CommonKeyWordsText, CommonAdditionalKeyWordsText, LifeCycleStatusCode, ValidityDate. BankDirectoryEntryCountryCode is of GDT type CountryCode. BankDetailsBankInternalID is of GDT type BankInternalID. BankDetailsBankAccountID is of GDT type BankAccountID. BankDetailsBankAccountStandardID is of GDT type BankAccountStandardID. InternalID is of GDT type BusinessPartnerInternalID. UUID is of GDT type UUID. CategoryCode is of GDT type BusinessPartnerCategoryCode. With regard to BusinessPartnerName, in some implementations, only those business partners whose first organization name or group name, or their last name matches the name specified here are selected. (If a category is also specified (query element CategoryCode), the name entered is then compared to the name component of the category only.) BusinessPartnerName is of GDT type LANGUAGEINDEPENDENT_MEDIUM_Name and, in some implementations, can have a Qualifier of BusinessPartner. With regard to BusinessPartnerAdditionalName in some implementations, only those business partners whose second organization name or group name, or their first name matches the name specified here are selected. (If a category is also specified (query element CategoryCode), the name entered is then compared to the name component of the category only.) BusinessPartnerAdditionalName is of GDT type LANGUAGEINDEPENDENT_MEDIUM_Name and, in some implementations, can have a Qualifier of BusinessPartnerAdditional. CommonKeyWordsText is of GDT type KeyWordsText. CommonAdditionalKeyWordsText is of GDT type KeyWordsText and, in some implementations, can have a Qualifier of Additional. LifeCycleStatusCode is of GDT type BusinessPartnerLifeCycleStatusCode. With regard to ValidityDate in some implementations, only the data that is valid on the date specified here is selected. ValidityDate is of GDT type Date and, in some implementations, can have a Qualifier of Validity.

A QueryByAddress query returns a list of business partners that belong to the derived business object for which the query is executed. The street, house number, location and postal code of an address can be entered as the most important selection parameters. The data type BusinessPartnerAddressQueryElements defines the query elements: AddressPostalAddressCityName, AddressPostalAddressPostalCode, AddressPostalAddressStreetName, AddressPostalAddressHouseID, AddressPostalAddressCountryCode, ABCClassificationsCompetitorABCClassificationCode, InternalID, RoleCode, UUID, CategoryCode, BusinessPartnerName, BusinessPartnerAdditionalName, CommonKeyWordsText, CommonAdditionalKeyWordsText, LifeCycleStatusCode, ValidityDate. is of GDT type LANGUAGEINDEPENDENT_MEDIUM_Name. With regard to AddressPostalAddressPostalCode, in some implementations, only those business partners whose street or PO box postal code matches the postal code specified here are selected. AddressPostalAddressPostalCode is of GDT type PostalCode. AddressPostalAddressStreetName is of GDT type StreetName. AddressPostalAddressHouseID is of GDT type HouseID. AddressPostalAddressCountryCode is of GDT type CountryCode. ABCClassificationsCompetitorABCClassificationCode is of GDT type CompetitorABCClassificationCode. InternalID is of GDT type BusinessPartnerInternalID. RoleCode is of GDT type BusinessPartnerRoleCode, Only those code values assigned to the derived Business Object can be selected. UUID is of GDT type UUID. CategoryCode is of GDT type BusinessPartnerCategoryCode. With regard to BusinessPartnerName, in some implementations, only those business partners whose first organization name or group name, or their last name matches the name specified here are selected. (If a category is also specified (query element CategoryCode), the name entered is then compared to the name component of the category only.) BusinessPartnerName is of GDT type LANGUAGEINDEPENDENT_MEDIUM_Name and, in some implementations, can have a Qualifier of BusinessPartner. With regard to BusinessPartnerAdditionalName in some implementations, only those business partners whose second organization name or group name, or their first name matches the name specified here are selected. (If a category is also specified (query element CategoryCode), the name entered is then compared to the name component of the category only.) BusinessPartnerAdditionalName is of GDT type LANGUAGEINDEPENDENT_MEDIUM_Name and, in some implementations, can have a Qualifier of BusinessPartnerAdditional. CommonKeyWordsText is of GDT type KeyWordsText. CommonAdditionalKeyWordsText is of GDT type KeyWordsText and, in some implementations, can have a Qualifier of Additional. LifeCycleStatusCode is of GDT type BusinessPartnerLifeCycleStatusCode. With regard to ValidityDate in some implementations, only the data that is valid on the date specified here is selected. ValidityDate is of GDT type Date and, in some implementations, can have a Qualifier of Validity.

A QueryByAddressRepresentation query returns a list of business partners that belong to the derived business object for which the query is executed. The street, house number, location and postal code of a particular address representation can be entered as the most important selection parameters. The data type BusinessPartnerAddressRepresentationQueryElements defines the query elements: AddressPostalAddressRepresentationCode, AddressPostal- AddressCityName, AddressPostalAddressPostalCode, AddressPostalAddressStreetName, AddressPostalAddressHouseID, AddressPostalAddressCountryCode, InternalID, UUID, CategoryCode, BusinessPartnerName, BusinessPartnerAdditionalName, CommonKeyWordsText, CommonAdditionalKeyWordsText, LifeCycleStatusCode, ValidityDate. AddressPostalAddressRepresentationCode is of GDT type AddressRepresentationCode. AddressPostalAddressCityName is of GDT type LANGUAGEINDEPENDENT_MEDIUM_Name. With regard to AddressPostalAddressPostalCode, in some implementations, only those business partners whose street or PO box postal code matches the postal code specified here are selected. AddressPostalAddressPostalCode is of GDT type PostalCode. AddressPostalAddressStreetName is of GDT type StreetName. AddressPostalAddressHouseID is of GDT type HouseID. AddressPostalAddressCountryCode is of GDT type CountryCode. InternalID is of GDT type BusinessPartnerInternalID. UUID is of GDT type UUID. CategoryCode is of GDT type BusinessPartnerCategoryCode. With regard to BusinessPartnerName, in some implementations, only those business partners whose first organization name or group name, or their last name matches the name specified here are selected. (If a category is also specified (query element CategoryCode), the name entered is then compared to the name component of the category only.) BusinessPartnerName is of GDT type LANGUAGEINDEPENDENT_MEDIUM_Name and, in some implementations, can have a Qualifier of BusinessPartner. With regard to BusinessPartnerAdditionalName in some implementations, only those business partners whose second organization name or group name, or their first name matches the name specified here are selected. (If a category is also specified (query element CategoryCode), the name entered is then compared to the name component of the category only.) BusinessPartnerAdditionalName is of GDT type LANGUAGEINDEPENDENT_MEDIUM_Name and, in some implementations, can have a Qualifier of BusinessPartnerAdditional. CommonKeyWordsText is of GDT type KeyWordsText. CommonAdditionalKeyWordsText is of GDT type KeyWordsText and, in some implementations, can have a Qualifier of Additional. LifeCycleStatusCode is of GDT type BusinessPartnerLifeCycleStatusCode. With regard to ValidityDate in some implementations, only the data that is valid on the date specified here is selected. ValidityDate is of GDT type Date and, in some implementations, can have a Qualifier of Validity.

A QueryByEmployeeWorkplaceAddress query returns a list of employees. The street, house number, location, postal code, building number, floor number and room number of the workplace address of an employee can be entered as the most important selection parameters. The data type BusinessPartnerEmployeeWorkplaceAddressQueryElements defines the query elements: EmployeeWorkplaceAddressPostalAddressCityName, EmployeeWorkplaceAddressPostalAddressPostalCode, EmployeeWorkplaceAddressPostalAddressStreetName, EmployeeWorkplaceAddressPostalAddressHouseID, EmployeeWorkplaceAddressPostalAddressCountryCode, EmployeeWorkplaceAddressWorkplaceBuildingID, EmployeeWorkplaceAddressWorkplaceFloorID, EmployeeWorkplaceAddressWorkplaceRoomID, EmployeeWorkplaceAddressOrganisationNameFirstLineName, EmployeeWorkplaceAddressOrganisationNameSecondLineName, InternalID, UUID, CategoryCode, BusinessPartnerName, BusinessPartnerAdditionalName, CommonKeyWordsText, CommonAdditionalKeyWordsText, LifeCycleStatusCode, ValidityDate. EmployeeWorkplaceAddressPostalAddressCityName is of GDT type LANGUAGEINDEPENDENT_MEDIUM_Name. With regard to EmployeeWorkplaceAddressPostalAddressPostalCode, in some implementations, only those business partners whose street or PO box postal code matches the postal code specified here are selected. EmployeeWorkplaceAddressPostalAddressPostalCode is of GDT type PostalCode. EmployeeWorkplaceAddressPostalAddressStreetName is of GDT type StreetName. EmployeeWorkplaceAddressPostalAddressHouseID is of GDT type HouseID. EmployeeWorkplaceAddressPostalAddressCountryCode is of GDT type CountryCode. EmployeeWorkplaceAddressWorkplaceBuildingID is of GDT type BuildingID. EmployeeWorkplaceAddressWorkplaceFloorID is of GDT type FloorID. EmployeeWorkplaceAddressWorkplaceRoomID is of GDT type RoomID. EmployeeWorkplaceAddressOrganisationNameFirstLineName is of GDT type LANGUAGEINDEPENDENT_MEDIUM_Name. EmployeeWorkplaceAddressOrganisationNameSecondLineName is of GDT type LANGUAGEINDEPENDENT_MEDIUM_Name. InternalID is of GDT type BusinessPartnerInternalID. UUID is of GDT type UUID. CategoryCode is of GDT type BusinessPartnerCategoryCode. With regard to BusinessPartnerName, in some implementations, only those business partners whose first organization name or group name, or their last name matches the name specified here are selected. (If a category is also specified (query element CategoryCode), the name entered is then compared to the name component of the category only.) BusinessPartnerName is of GDT type LANGUAGEINDEPENDENT_MEDIUM_Name and, in some implementations, can have a Qualifier of BusinessPartner. With regard to BusinessPartnerAdditionalName in some implementations, only those business partners whose second organization name or group name, or their first name matches the name specified here are selected. (If a category is also specified (query element CategoryCode), the name entered is then compared to the name component of the category only.) BusinessPartnerAdditionalName is of GDT type LANGUAGEINDEPENDENT_MEDIUM_Name and, in some implementations, can have a Qualifier of BusinessPartnerAdditional. CommonKeyWordsText is of GDT type KeyWordsText. CommonAdditionalKeyWordsText is of GDT type KeyWordsText and, in some implementations, can have a Qualifier of Additional. LifeCycleStatusCode is of GDT type BusinessPartnerLifeCycleStatusCode. With regard to ValidityDate in some implementations, only the data that is valid on the date specified here is selected. ValidityDate is of GDT type Date and, in some implementations, can have a Qualifier of Validity.

A QueryByIdentificationAndAddress query returns a list of business partners. You can also enter the ID number, street, house number, location and postal code of an address as the most important selection parameters. The data type BusinessPartnerIdentificationAndAddressQueryElements defines the query elements: InternalID, UUID, IdentificationPartyIdentifierTypeCode, IdentificationBusinessPartnerID, BusinessPartnerName, BusinessPartnerAdditionalName, AddressPostalAddressCountryCode, AddressPostalAddressCityName, AddressPostalAddressStreetPostalCode, AddressPostalAddressStreetName, AddressPostalAddressHouseID, ABCClassificationsCustomerABCClassificationCode, ABCClassificationsSupplierABCClassificationCode, ABCClassificationsSalesAndServicePartnerABCClassificationCode, ABCClassificationsCompetitorABCClassificationCode, CommonKeyWordsText, CommonAdditionalKeyWordsText, RoleBusinessObjectTypeCode, BusinessCharacter- Code, CommonLegalCompetenceIndicator, LifeCycleStatusCode, ValidityDate. InternalID is of GDT type BusinessPartnerInternalID. UUID is of GDT type UUID. IdentificationPartyIdentifierTypeCode is of GDT type PartyIdentifierTypeCode. IdentificationBusinessPartnerID is of GDT type BusinessPartnerID. BusinessPartnerName is of GDT type LANGUAGEINDEPENDENT_MEDIUM_Name and, in some implementations, can have a Qualifier of Party. BusinessPartnerAdditionalName is of GDT type LANGUAGEINDEPENDENT_MEDIUM_Name and, in some implementations, can have a Qualifier of BusinessPartnerAdditional. AddressPostalAddressCountryCode is of GDT type CountryCode. AddressPostalAddressCityName is of GDT type LANGUAGEINDEPENDENT_MEDIUM Name. AddressPostalAddressStreetPostalCode is of GDT type PostalCode. AddressPostalAddressStreetName is of GDT type StreetName. AddressPostalAddressHouseID is of GDT type HouseID. ABCClassificationsCustomerABCClassificationCode is of GDT type CustomerABCClassificationCode. ABCClassificationsSupplierABCClassificationCode is of GDT type SupplierABCClassificationCode. ABCClassificationsSalesAndServicePartnerABCClassificationCode is of GDT type SalesAndServicePartnerABCClassificationCode. ABCClassificationsCompetitorABCClassificationCode is of GDT type CompetitorABCClassificationCode. CommonKeyWordsText is of GDT type KeyWordsText. CommonAdditionalKeyWordsText is of GDT type KeyWordsText and, in some implementations, can have a Qualifier of Additional. RoleBusinessObjectTypeCode is of GDT type BusinessObjectTypeCode. BusinessCharacterCode is of GDT type BUSINESSPARTNER_PartyBusinessCharacterCode. CommonLegalCompetenceIndicator is of GDT type Indicator and, in some implementations, can have a Qualifier of LegalCompetence. LifeCycleStatusCode is of GDT type BusinessPartnerLifeCycleStatusCode. With regard to ValidityDateOnly, in some implementations, only the data that is valid on the date specified here is selected. ValidityDateOnly is of GDT type Date and, in some implementations, can have a Qualifier of Validity.

The query is only active for the projection business object Business Partner. In some implementations, this query is modeled in such a way that it exactly represents the input parameters of the query QueryByIDAndAddress of the transformed object Party.

A QueryByRelationship query returns a list of business partners that belong to the derived business object for which the query is executed. The relationship category and name of the business partner in question can be entered as the most important selection parameters. The data type BusinessPartnerRelationshipQueryElements defines the query elements: InternalID, UUID, RoleCode, RoleBusinessObjectTypeCode, CategoryCode, BusinessPartnerName, BusinessPartnerAdditionalName, AddressPostalAddressCityName, AddressPostalAddressStreetPostalCode, AddressPostalAddressStreetName, AddressPostalAddressCountryCode, AddressPostalAddressRegionCode, AddressEMailAddress, AddressPostalAddressBuildingID, AddressPostalAddressFloorID, IdentificationDunAndBradstreetNumberBusinessPartnerID, IdentityUserAccountID, LifeCycleStatusCode, RelationshipRoleCode, RelationshipWorkplaceAddressBuildingID, RelationshipWorkplaceAddressFloorID, RelationshipWorkplaceAddressRoomID, RelationshipWorkplaceAddressEmailAddress, RelationshipBusinessPartnerInternalID, RelationshipBusinessPartnerUUID, RelationshipBusinessPartnerRoleCode, RelationshipBusinessPartnerRoleBusinessObjectTypeCode, RelationshipBusinessPartnerCategoryCode, RelationshipBusinessPartnerName, RelationshipBusinessPartnerAdditionalName, RelationshipBusinessPartnerAddressPostalAddressCityName, RelationshipBusinessPartnerAddressPostalAddressStreetPostalCode, RelationshipBusinessPartnerAddressPostalAddressStreetName, RelationshipBusinessPartnerAddressPostalAddressCountryCode, RelationshipBusinessPartnerAddressPostalAddressRegionCode, RelationshipBusinessPartnerVendorDunAndBradstreetNumber, RelationshipBusinessPartnerAddressEMailAddress, RelationshipBusinessPartnerAddressBuildingID, RelationshipBusinessPartnerAddressFloorID, RelationshipBusinessPartnerRelationshipTimeDependentInformationDefaultIndicator, RelationshipTimeDependentInformationDefaultIndicator, RelationshipBusinessPartnerLifeCycleStatusCode, ValidityDate. InternalID is of GDT type BusinessPartnerInternalID. UUID is of GDT type UUID. RoleCode is of GDT type BusinessPartnerRoleCode, only those code values assigned to the derived business object can be selected. RoleBusinessObjectTypeCode is of GDT type BusinessObjectTypeCode and in some implementations restrictions can include: The value range includes only the values of the business objects derived from the business partner template.CategoryCode is of GDT type BusinessPartnerCategoryCode. With regard to BusinessPartnerName, in some implementations, only those business partners whose first organization name or group name, or their last name matches the name specified here are selected. BusinessPartnerName is of GDT type LANGUAGEINDEPENDENT_MEDIUM_Name and, in some implementations, can have a Qualifier of BusinessPartner. With regard to BusinessPartnerAdditionalName, in some implementations, only those business partners whose second organization name or group name, or their first name matches the name specified here are selected. BusinessPartnerAdditionalName is of GDT type LANGUAGEINDEPENDENT_MEDIUM_Name and, in some implementations, can have a Qualifier of BusinessPartnerAdditional. AddressPostalAddressCityName is of GDT type LANGUAGEINDEPENDENT_MEDIUM_Name and, in some implementations, can have a Qualifier of City. AddressPostalAddressStreetPostalCode is of GDT type PostalCode. AddressPostalAddressStreetName is of GDT type StreetName. AddressPostalAddressCountryCode is of GDT type CountryCode. AddressPostalAddressRegionCode is of GDT type RegionCode. AddressEMailAddress is of GDT type EMailAddress. AddressPostalAddressBuildingID is of GDT type BuildingID. AddressPostalAddressFloorID is of GDT type FloorID. With regard to IdentificationDunAndBradstreetNumberBusinessPartnerID, in some implementations, only those invoicing parties that have the Dun & Bradstreet ID number specified here are selected. IdentificationDunAndBradstreetNumberBusinessPartnerID is of GDT type BusinessPartnerID. With regard to IdentityUserAccountID, in some implementations, only those business partners that have the user number specified here are selected. IdentityUserAccountID is of GDT type UserAccountID. LifeCycleStatusCode is of GDT type BusinessPartnerLifeCycleStatusCode. With regard to RelationshipRoleCode, in some implementations, only those business partners that have a relationship with another business partner of the relationship category specified here are selected. RelationshipRoleCode is of GDT type BusinessPartnerRelationshipRoleCode. With regard to RelationshipWorkplaceAddressBuildingID, in some implementations, only those business partners are selected that have a contact person or service performer relationship with a business partner where the building number of the workplace address matches the one specified here. RelationshipWorkplaceAddressBuildingID is of GDT type BuildingID. With regard to RelationshipWorkplaceAddressFloorID, in some implementations, only those business partners are selected that have a contact person or service performer relationship with a business partner where the floor number of the workplace address matches the one specified here. RelationshipWorkplaceAddressFloorID is of GDT type FloorID. With regard to RelationshipWorkplaceAddressRoomID, in some implementations, only those business partners are selected that have a contact person or service performer relationship with a business partner where the room number of the workplace address matches the one specified here. RelationshipWorkplaceAddressRoomID is of GDT type RoomID. With regard to RelationshipWorkplaceAddressEmailAddress, in some implementations, only those business partners are selected that have a contact person or service performer relationship with a business partner where the e-mail number of the workplace address matches the one specified here. RelationshipWorkplaceAddressEmailAddress is of GDT type EMailAddress. With regard to RelationshipBusinessPartnerInternalID, in some implementations, only those business partners that have a relationship with a business partner that have the internal number specified here are selected. RelationshipBusinessPartnerInternalID is of GDT type BusinessPartnerInternalID. With regard to RelationshipBusinessPartnerUUID, in some implementations, only those business partners that have a relationship with a business partner that has the UUID specified here are selected. RelationshipBusinessPartnerUUID is of GDT type UUID. RelationshipBusinessPartnerRoleCode is of GDT type BusinessPartnerRoleCode. RelationshipBusinessPartnerRoleBusinessObjectTypeCode is of GDT type BusinessObjectTypeCode. With regard to RelationshipBusinessPartnerCategoryCode, in some implementations, only those business partners that have a relationship with a business partner that has the category specified here are selected. RelationshipBusinessPartnerCategoryCode is of GDT type BusinessPartnerCategoryCode. With regard to RelationshipBusinessPartnerName, in some implementations, only those business partners who have a relationship with a business partner whose first organization name or group name, or their last name matches the name specified here are selected. RelationshipBusinessPartnerName is of GDT type LANGUAGEINDEPENDENT_MEDIUM_Name and, in some implementations, can have a Qualifier of BusinessPartner. With regard to RelationshipBusinessPartnerAdditionalName, in some implementations, only those business partners who have a relationship with a business partner whose second organization name or group name, or their first name matches the name specified here are selected. RelationshipBusinessPartnerAdditionalName is of GDT type LANGUAGEINDEPENDENT_MEDIUM_Name and, in some implementations, can have a Qualifier of BusinessPartnerAdditional. With regard to RelationshipBusinessPartnerAddressPostalAddressCityName, in some implementations, only those business partners that have a relationship with another business partner that has an address with the town or place specified here are selected. RelationshipBusinessPartnerAddressPostalAddressCityName is of GDT type LANGUAGEINDEPENDENT_MEDIUM_Name and, in some implementations, can have a Qualifier of City. With regard to RelationshipBusinessPartnerAddressPostalAddressStreetPostalCode, in some implementations, only those business partners that have a relationship with another business partner that has an address with the postal code of the street address specified here are selected. RelationshipBusinessPartnerAddressPostalAddressStreetPostalCode is of GDT type PostalCode. With regard to RelationshipBusinessPartnerAddressPostalAddressStreetName, in some implementations, only those business partners that have a relationship with another business partner that has an address with the street address specified here are selected. RelationshipBusinessPartnerAddressPostalAddressStreetName is of GDT type StreetName. With regard to RelationshipBusinessPartnerAddressPostalAddressCountryCode, in some implementations, only those business partners that have a relationship with another business partner that has an address with the country specified here are selected. RelationshipBusinessPartnerAddressPostalAddressCountryCode is of GDT type CountryCode. With regard to RelationshipBusinessPartnerAddressPostalAddressRegionCode, in some implementations, only those business partners that have a relationship with another business partner that has an address with the region specified here are selected. RelationshipBusinessPartnerAddressPostalAddressRegionCode is of GDT type RegionCode. With regard to RelationshipBusinessPartnerVendorDunAndBradstreetNumber, in some implementations, only those business partners that have a relationship with another business partner that has the Dun & Bradstreet ID number (D-U-N-S number. specified here are selected. RelationshipBusinessPartnerVendorDunAndBradstreetNumber is of GDT type BusinessPartnerID. With regard to RelationshipBusinessPartnerAddressEMailAddress, in some implementations, only those business partners that have a relationship with another business partner that has an address with the email number specified here are selected. RelationshipBusinessPartnerAddressEMailAddress is of GDT type EMailAddress. With regard to RelationshipBusinessPartnerAddressBuildingID, in some implementations, only those business partners that have a relationship with another business partner that has an address with the building number specified here are selected. RelationshipBusinessPartnerAddressBuildingID is of GDT type BuildingID. With regard to RelationshipBusinessPartnerAddressFloorID, in some implementations, only those business partners that have a relationship with another business partner that has an address with the floor specified here are selected. RelationshipBusinessPartnerAddressFloorID is of GDT type FloorID. In some implementations, if the RelationshipBusinessPartnerRelationshipTimeDependentInformationDefaultIndicator indicator is set, only those business partners are selected that are the standard partner for the relationship. RelationshipBusinessPartnerRelationshipTimeDependentInformationDefaultIndicator is of GDT type Indicator and, in some implementations, can have a Qualifier of Default. In some implementations, if the RelationshipTimeDependentInformationDefaultIndicator indicator is set, only those business partners are selected that have a relationship with another business partner that is flagged as the standard. RelationshipTimeDependentInformationDefaultIndicator is of GDT type Indicator and, in some implementations, can have a Qualifier of Default. RelationshipBusinessPartnerLifeCycleStatusCode is of GDT type BusinessPartnerLifeCycleStatusCode. With regard to ValidityDate, in some implementations, only the data that is valid on the date specified here is selected. ValidityDate is of GDT type Date and, in some implementations, can have a Qualifier of Validity.

QueryByContactPerson: This query returns a list of business partners that belong to the derived business object for which the query is executed. The business partner number and the contact person name can be entered as the most important selection parameters. The data type BusinessPartnerContactPersonQueryElements defines the query elements: RoleCode, InternalID, UUID, CategoryCode, BusinessPartnerName, BusinessPartnerAdditionalName, AddressPostalAddressCityName, AddressPostalAddressStreetPostalCode, AddressPostalAddressCountryCode, ABCClassificationsSalesAndServicePartnerABCClassificationCode, ContactPersonInternalID, ContactPersonUUID, ContactPersonNameFamilyName, ContactPersonNameGivenName, LifeCycleStatusCode, ValidityDate. RoleCode is of GDT type BusinessPartnerRoleCode. InternalID is of GDT type BusinessPartnerInternalID. UUID is of GDT type UUID. CategoryCode is of GDT type BusinessPartnerCategoryCode. With regard to BusinessPartnerName, in some implementations, only those business partners whose first organization name or group name, or their last name matches the name specified here are selected. BusinessPartnerName is of GDT type LANGUAGEINDEPENDENT_MEDIUM_Name and, in some implementations, can have a Qualifier of BusinessPartner. With regard to BusinessPartnerAdditionalName, in some implementations, only those business partners whose second organization name or group name, or their first name matches the name specified here are selected. BusinessPartnerAdditionalName is of GDT type LANGUAGEINDEPENDENT_MEDIUM_Name and, in some implementations, can have a Qualifier of BusinessPartnerAdditional. AddressPostalAddressCityName is of GDT type LANGUAGEINDEPENDENT_MEDIUM_Name and, in some implementations, can have a Qualifier of City. AddressPostalAddressStreetPostalCode is of GDT type PostalCode. AddressPostalAddressCountryCode is of GDT type CountryCode. ABCClassificationsSalesAndServicePartnerABCClassificationCode is of GDT type SalesAndServicePartnerABCClassificationCode. With regard to ContactPersonInternalID, in some implementations, only those business partners that have a contact person relationship with a person that has the business partner number specified here are selected. ContactPersonInternalID is of GDT type BusinessPartnerInternalID. With regard to ContactPersonUUID, in some implementations, only those business partners that have a contact person relationship with a person that has the business partner UUID specified here are selected. ContactPersonUUID is of GDT type UUID. With regard to ContactPersonNameFamilyName, in some implementations, only those business partners that have a contact person relationship with a person that has the last name specified here are selected. ContactPersonNameFamilyName is of GDT type MEDIUM_Name and, in some implementations, can have a Qualifier of Family. With regard to ContactPersonNameGivenName, in some implementations, only those business partners that have a contact person relationship with a person that has the first name specified here are selected. ContactPersonNameGivenName is of GDT type MEDIUM_Name and, in some implementations, can have a Qualifier of Given. LifeCycleStatusCode is of GDT type BusinessPartnerLifeCycleStatusCode. With regard to ValidityDate, in some implementations, only the data that is valid on the date specified here is selected. ValidityDate is of GDT type Date and, in some implementations, can have a Qualifier of Validity.

A QueryByBusinessObjectCustomer query returns a list of customers. As well as the general business partner data, attributes that only exist in customers can also be entered as the most important selection parameters. The data type BusinessPartnerBusinessObjectCustomerQueryElements defines the query elements: RoleCode, InternalID, UUID, CategoryCode, BusinessPartnerName, BusinessPartnerAdditionalName, AddressPostalAddressCityName, AddressPostalAddressStreetPostalCode, AddressPostalAddressCountryCode, ABCClassificationsCustomerABCClassificationCode, IndustrialSectorCode, ContactPersonInternalID, ContactPersonUUID, ContactPersonNameFamilyName, ContactPersonNameGivenName, SalesArrangementSalesOrganisationID, SalesArrangementBlockingReasonsBlockingIndicator, SalesArrangementBlockingReasonsInvoicingBlockingIndicator, SalesArrangementBlockingReasonsCustomerTransactionDocumentFulfilmentBlockingIndicator, SalesArrangementBlockingReasonsCustomerBlockingIndicator, CreatedSinceDate, LifeCycleStatusCode, ValidityDate, SearchText. RoleCode is of GDT type BusinessPartnerRoleCode. InternalID is of GDT type BusinessPartnerInternalID. UUID is of GDT type UUID. CategoryCode is of GDT type BusinessPartnerCategoryCode. With regard to BusinessPartnerName, in some implementations, only those business partners whose first organization name or group name, or their last name matches the name specified here are selected. BusinessPartnerName is of GDT type LANGUAGEINDEPENDENT_MEDIUM_Name and, in some implementations, can have a Qualifier of BusinessPartner. With regard to BusinessPartnerAdditionalName, in some implementations, only those business partners whose second organization name or group name, or their first name matches the name specified here are selected. BusinessPartnerAdditionalName is of GDT type LANGUAGEINDEPENDENT_MEDIUM_Name and, in some implementations, can have a Qualifier of BusinessPartnerAdditional. AddressPostalAddressCityName is of GDT type LANGUAGEINDEPENDENT_MEDIUM_Name and, in some implementations, can have a Qualifier of City. AddressPostalAddressStreetPostalCode is of GDT type PostalCode. AddressPostalAddressCountryCode is of GDT type CountryCode. ABCClassificationsCustomerABCClassificationCode is of GDT type CustomerABCClassificationCode. With regard to IndustrialSectorCode, in some implementations, only those customers that have the industry of the standard industry system specified here are selected. IndustrialSectorCode is of GDT type IndustrialSectorCode. With regard to ContactPersonInternalID, in some implementations, only those customers that have a contact person with the business partner number specified here are selected. ContactPersonInternalID is of GDT type BusinessPartnerInternalID. With regard to ContactPersonUUID, in some implementations, only those customers that have a contact person with the UUID specified here are selected. is of GDT type UUID. With regard to ContactPersonNameFamilyName, in some implementations, only those customers that have a contact person with the last name specified here are selected. ContactPersonNameFamilyName is of GDT type MEDIUM_Name and, in some implementations, can have a Qualifier of Family. With regard to ContactPersonNameGivenName, in some implementations, only those customers that have a contact person with the first name specified here are selected. ContactPersonNameGivenName is of GDT type MEDIUM_Name and, in some implementations, can have a Qualifier of Given. With regard to SalesArrangementSalesOrganisationID, in some implementations, only those customers that have an arrangement with the sales organization specified here are selected. ContactPersonNameGivenName is of GDT type OrganisationalCentreID. In some implementations, If the SalesArrangementBlockingReasonsBlockingIndicator indicator is marked, then only those customers are selected, that are assigned to a sales arrangement where the InvoicingBlockingIndicator, the CustomerTransactionDocumentFulfilmentBlockingIndicator or the CustomerBlockingIndicator is set. SalesArrangementBlockingReasonsBlockingIndicator is of GDT type Indicator and, in some implementations, can have a Qualifier of InvoicingBlocking. In some implementations, If the SalesArrangementBlockingReasonsInvoicingBlockingIndicator indicator is marked, then only those customers are selected, that are assigned to a sales arrangement where the InvoicingBlockingIndicator is set. SalesArrangementBlockingReasonsInvoicingBlockingIndicator is of GDT type Indicator and, in some implementations, can have a Qualifier of InvoicingBlocking. In some implementations, if the SalesArrangementBlockingReasonsCustomerTransactionDocumentFulfilmentBlockingIndicator indicator is marked, then only those customers are selected, that are assigned to a sales arrangement where the CustomerTransactionDocumentFulfilmentBlockingIndicator is set. SalesArrangementBlockingReasonsCustomerTransactionDocumentFulfilmentBlockingIndicator is of GDT type Indicator and, in some implementations, can have a Qualifier of CustomerTransactionDocumentFulfilmentBlocking. In some implementations, if the SalesArrangementBlockingReasonsCustomerBlockingIndicator indicator is marked, then only those customers are selected, that are assigned to a sales arrangement where the CustomerBlockingIndicator is set. SalesArrangementBlockingReasonsCustomerTransactionDocumentFulfilmentBlockingIndicator is of GDT type Indicator and, in some implementations, can have a Qualifier of CustomerBlocking. With regard to CreatedSinceDate, in some implementations, only those customers created on the date specified here or later are selected. (This would then be the case if the sub-element CreationDateTime of the root element SystemAdministrativeData contains a date that either corresponds to the date specified here or has a later date.) CreatedSinceDate is of GDT type Date and, in some implementations, can have a Qualifier of CreatedSince. LifeCycleStatusCode is of GDT type BusinessPartnerLifeCycleStatusCode. With regard to ValidityDate, in some implementations, only the data that is valid on the date specified here is selected. ValidityDate is of GDT type Date and, in some implementations, can have a Qualifier of Validity. SearchText is of GDT type SearchText.

A QueryByBusinessObjectSupplier query returns a list of suppliers. As well as the general business partner data, attributes that only exist in suppliers can also be entered as the most important selection parameters. The data type BusinessPartnerBusinessObjectSupplierQueryElements defines the query elements: RoleCode, InternalID, UUID, CategoryCode, BusinessPartnerName, BusinessPartnerAdditionalName, CommonKeyWordsText, CommonAdditionalKeyWordsText, AddressPostalAddressCityName, AddressPostalAddressStreetPostalCode, AddressPostalAddressStreetName, AddressPostalAddressBuildingID, AddressPostalAddressFloorID, AddressPostalAddressCountryCode, AddressPostalAddressRegionCode, AddressEMailAddress, ABCClassificationsSupplierABCClassificationCode, IndustrialSectorCode, ContactPersonInternalID, ContactPersonUUID, ContactPersonNameFamilyName, ContactPersonNameGivenName, QualityManagementSystemStandardCode, ProductCategoryReleasedToProcureProductCategoryID, BiddingCharacteristicMinorityOwnedIndicator, BiddingCharacteristicWomanOwnedIndicator, BiddingCharacteristicSurrogateBiddingAllowedIndicator, IdentificationDunAndBradstreetNumberBusinessPartnerID, ProcurementArrangementStrategicPurchasingFunctionalUnitID, ProcurementArrangementPurchasingTermsPurchasingBlockIndicator, CreatedSinceDate, LifeCycleStatusCode, ValidityDate, SearchText. RoleCode is of GDT type type BusinessPartnerRoleCode. InternalID is of GDT type BusinessPartnerInternalID. UUID is of GDT type type UUID. CategoryCode is of GDT type type BusinessPartnerCategoryCode. With regard to BusinessPartnerName, in some implementations, only those business partners whose first organization name or group name, or their last name matches the name specified here are selected. BusinessPartnerName is of GDT type LANGUAGEINDEPENDENT_MEDIUM_Name and, in some implementations, can have a Qualifier of BusinessPartner. With regard to BusinessPartnerAdditionalName, in some implementations, only those business partners whose second organization name or group name, or their first name matches the name specified here are selected. BusinessPartnerAdditionalName is of GDT type LANGUAGEINDEPENDENT_MEDIUM_Name and, in some implementations, can have a Qualifier of BusinessPartnerAdditional. CommonKeyWordsText is of GDT type type KeyWordsText. CommonAdditionalKeyWordsText is of GDT type type KeyWordsText and, in some implementations, can have a Qualifier of Additional. AddressPostalAddressCityName is of CDT type LANGUAGEINDEPENDENT_MEDIUM_Name and, in some implementations, can have a Qualifier of City. AddressPostalAddressStreetPostalCode is of GDT type PostalCode. AddressPostalAddressStreetName is of GDT type StreetName. AddressPostalAddressBuildingID is of GDT type BuildingID. AddressPostalAddressFloorID is of GDT type FloorID. AddressPostalAddressCountryCode is of GDT type CountryCode. AddressPostalAddressRegionCode is of GDT type RegionCode. AddressEMailAddress is of GDT type EMailAddress. ABCClassificationsSupplierABCClassificationCode is of GDT type type SupplierABCClassificationCode. With regard to IndustrialSectorCode, in some implementations, only those suppliers that have the industry of the standard industry system specified here are selected. IndustrialSectorCode is of GDT type type IndustrialSectorCode. With regard to ContactPersonInternalID, in some implementations, only those suppliers that have a contact person with the business partner number specified here are selected. ContactPersonInternalID is of GDT type type BusinessPartnerInternalID. With regard to ContactPersonUUID, in some implementations, only those suppliers that have a contact person with the UUID specified here are selected. ContactPersonUUID is of GDT type type UUID. With regard to ContactPersonNameFamilyName, in some implementations, only those suppliers that have a contact person with the last name specified here are selected. ContactPersonNameFamilyName is of GDT type type MEDIUM_Name and, in some implementations, can have a Qualifier of Family. With regard to ContactPersonNameGivenName, in some implementations, only those suppliers that have a contact person with the first name specified here are selected. ContactPersonNameGivenName is of GDT type type MEDIUM_Name and, in some implementations, can have a Qualifier of Given. QualityManagementSystemStandardCode is of GDT type QualityManagementSystemStandardCode. ProductCategoryReleasedToProcureProductCategoryID is of GDT type ProductCategoryID. BiddingCharacteristicMinorityOwnedIndicator is of GDT type Indicator and, in some implementations, can have a Qualifier of MinorityOwned. BiddingCharacteristicWomanOwnedIndicator is of GDT type Indicator and, in some implementations, can have a Qualifier of WomanOwned. BiddingCharacteristicSurrogateBiddingAllowedIndicator is of GDT type Indicator and, in some implementations, can have a Qualifier of Allowed. With regard to IdentificationDunAndBradstreetNumberBusinessPartnerID, in some implementations, only those suppliers that have the Dun & Bradstreet ID number specified here are selected. IdentificationDunAndBradstreetNumberBusinessPartnerID is of GDT type type BusinessPartnerID. With regard to ProcurementArrangementStrategicPurchasingFunctionalUnitID, in someplementations, only those suppliers that have an agreement with the strategic purchasing unit specified here are selected. is of GDT type type OrganisationalCentreID. In some implementations, if the ProcurementArrangementPurchasingTermsPurchasingBlockIndicator indicator is marked, then only those suppliers are selected, that are assigned to a procurement arrangement where the PurchasingBlockIndicator is set. ProcurementArrangementPurchasingTermsPurchasingBlockIndicator is of GDT type type Indicator and, in some implementations, can have a Qualifier of PurchasingBlock. With regard to CreatedSinceDate, in some implementations, only those suppliers created on the date specified here or later are selected. (This would then be the case if the sub-element CreationDateTime of the root element SystemAdministrativeData contains a date that either corresponds to the date specified here or has a later date.) CreatedSinceDate is of GDT type type Date and, in some implementations, can have a Qualifier of CreatedSince. LifeCycleStatusCode is of GDT type type BusinessPartnerLifeCycleStatusCode. With regard to ValidityDate, in some implantations, only the data that is valid on the date specified here is selected. ValidityDate is of GDT type type Date and, in some implementations, can have a Qualifier of Validity. SearchText is of GDT type type SearchText.

With a QueryByRoleContactPersonOrRelationshipIsContactPersonForCustomer query: Only those persons who either have the role that is assigned to the RoleCategory contact person, or are a contact person for a customer or sales partner are selected. The business partner number and the name of the person or organization for which the person is a contact person can be entered as the most important selection parameters. The data type BusinessPartnerRoleContactPersonOrRelationshipIsContactPersonForCustomerQueryElements defines the query elements: InternalID, UUID, CommonPersonNameFamilyName, CommonPersonNameGivenName, in some implementations, AddressPostalAddressCityName, AddressPostalAddressStreetPostalCode, AddressPostalAddressCountryCode, LifeCycleStatusCode, RelationshipBusinessPartnerInternalID, RelationshipBusinessPartnerUUID, RelationshipBusinessPartnerCommonOrganisationNameFirstLineName, RelationshipContactPersonBusinessPartnerFunctionTypeCode, RelationshipContactPersonBusinessPartnerFunctionalAreaCode, CreatedSinceDate, RelationshipBusinessPartnerLifeCycleStatusCode, ValidityDate. With regard to InternalID, in some implementations, only those contact persons with the business partner number specified here are selected. It is of GDT type BusinessPartnerInternalID. With regard to UUID, in some implementations, only those contact persons with the UUID specified here are selected. It is of GDT type UUID. With regard to CommonPersonNameFamilyName, in some implementations, only those contact persons with the family name specified here are selected. It is of GDT type MEDIUM_Name and, in some implementations, can have a Qualifier of Family. With regard to CommonPersonNameGivenName, in some implementations, only those contact persons with the first name specified here are selected. It is of GDT type MEDIUM_Name and, in some implementations, can have a Qualifier of Given. With regard to AddressPostalAddressCityName, in some implementations, only those contact persons whose city in the partner address, contact person workplace address or employee workplace address matches city name specified here are selected. It is of GDT type LANGUAGEINDEPENDENT_MEDIUM_Name. With regard to AddressPostalAddressStreetPostalCode, in some implementations, only those contact persons whose postal code in the partner address, contact person workplace address or employee workplace address matches postal code specified here are selected. It is of GDT type PostalCode. With regard to AddressPostalAddressCountryCode, in some implementations, only those contact persons whose country in the partner address, contact person workplace address or employee workplace address matches country specified here are selected. It is of GDT type CountryCode. LifeCycleStatusCode is of GDT type BusinessPartnerLifeCycleStatusCode. With regard to RelationshipBusinessPartnerInternalID, in some implementations, only those contact persons that have a contact person relationship with a business partner that has the business partner number specified here are selected. It is of GDT type BusinessPartnerInternalID. With regard to RelationshipBusinessPartnerUUID, in some implementations, only those contact persons that have a contact person relationship with a business partner that has the UUID specified here are selected. It is of GDT type UUID. With regard to RelationshipBusinessPartnerCommonOrganisationNameFirstLineName, in some implementations, only those contact persons are selected, that have a contact person relationship with a business partner where the name components specified here are in the first name line of the address format. It is of GDT type LANGUAGEINDEPENDENT_MEDIUM_Name and, in some implementations, can have a Qualifier of FirstLine. With regard to RelationshipContactPersonBusinessPartnerFunctionTypeCode, in some implementations, only those contact persons whose function matches the one specified here are selected. It is of GDT type BusinessPartnerFunctionTypeCode. With regard to RelationshipContactPersonBusinessPartnerFunctionalAreaCode, in some implementations, only those contact persons whose functional area matches the one specified here are selected. It is of GDT type BusinessPartnerFunctionalAreaCode. With regard to CreatedSinceDate, in some implementations, only those contact persons created on the date specified here or later are selected. (This would then be the case if the sub-element CreationDateTime of the root element SystemAdministrativeData contains a date that either corresponds to the date specified here or has a later date.) It is of GDT type Date and, in some implementations, can have a Qualifier of CreatedSince. RelationshipBusinessPartnerLifeCycleStatusCode is of GDT type BusinessPartnerLifeCycleStatusCode. With regard to ValidityDate, in some implementations, only the data that is valid on the date specified here is selected. It is of GDT type Date and, in some implementations, can have a Qualifier of Validity.

With a QuerybyRoleContactPersonOrRelationshipIsContactPersonForSupplier query: Only those persons who either have the role that is assigned to the RoleCategory contact person, or are a contact person for a supplier are selected. The business partner number and the name of the person or supplier for which the person is a contact person can be entered as the most important selection parameters. The data type BusinessPartnerRoleContactPersonOrRelationshipIsContactPersonForSupplierQueryElements defines the query elements: InternalID, UUID, CommonPersonNameGivenName, AddressPostalAddressCityName, AddressPostalAddressStreetPostalCode, AddressPostalAddressCountryCode, LifeCycleStatusCode, RelationshipBusinessPartnerInternalID, RelationshipBusinessPartnerUUID, RelationshipBusinessPartnerCommonOrganisationNameFirstLineName, Relation shipContactPersonBusinessPartnerFunctionTypeCode, RelationshipContactPersonBusinessPartnerFunctionalAreaCode, CreatedSinceDate, RelationshipBusinessPartnerLifeCycleStatusCode ValidityDate. With regard to InternalID, in some implementations, only those contact persons with the business partner number specified here are selected. It is of GDT type BusinessPartnerInternalID. With regard to UUID, in some implementations, only those contact persons with the UUID specified here are selected. It is of GDT type UUID. With regard to CommonPersonNameFamilyName, in some implementations, only those contact persons with the family name specified here are selected. It is of GDT type MEDIUM_Name and, in some implementations, can have a Qualifier of Family. With regard to CommonPersonNameGivenName, in some implementations, only those contact persons with the first name specified here are selected. It is of GDT type MEDIUM_Name and, in some implementations, can have a Qualifier of Given. With regard to AddressPostalAddressCityName, in some implementations, only those contact persons whose city in the partner address, contact person workplace address or employee workplace address matches city name specified here are selected. It is of GDT type LANGUAGEINDEPENDENT_MEDIUM_Name. With regard to AddressPostalAddressStreetPostalCode, in some implementations, only those contact persons whose postal code in the partner address, contact person workplace address or employee workplace address matches postal code specified here are selected. It is of GDT type PostalCode. With regard to AddressPostalAddressCountryCode, in some implementations, only those contact persons whose country in the partner address, contact person workplace address or employee workplace address matches country specified here are selected. It is of GDT type CountryCode. With regard to LifeCycleStatusCode is of GDT type BusinessPartnerLifeCycleStatusCode. With regard to RelationshipBusinessPartnerInternalID, in some implementations, only those contact persons that have a contact person relationship with a business partner that has the business partner number specified here are selected. It is of GDT type BusinessPartnerInternalID. With regard to RelationshipBusinessPartnerUUID, in some implementations, only those contact persons that have a contact person relationship with a business partner that has the UUID specified here are selected. It is of GDT type UUID. With regard to RelationshipBusinessPartnerCommonOrganisationNameFirstLineName, in some implementations, only those contact persons are selected, that have a contact person relationship with a business partner where the name components specified here are in the first name line of the address format. It is of GDT type LANGUAGEINDEPENDENT_MEDIUM_Name and, in some implementations, can have a Qualifier of FirstLine. With regard to RelationshipContactPersonBusinessPartnerFunctionTypeCode, in some implementations, only those contact persons whose function matches the one specified here are selected. It is of GDT type BusinessPartnerFunctionTypeCode. With regard to RelationshipContactPersonBusinessPartnerFunctionalAreaCode, in some implementations, only those contact persons whose functional area matches the one specified here are selected. It is of GDT type BusinessPartnerFunctionalAreaCode. With regard to CreatedSinceDate, in some implementations, only those contact persons created on the date specified here or later are selected. (This would then be the case if the sub-element CreationDateTime of the root element SystemAdministrativeData contains a date that either corresponds to the date specified here or has a later date.) It is of GDT type Date and, in some implementations, can have a Qualifier of CreatedSince. RelationshipBusinessPartnerLifeCycleStatusCode is of GDT type BusinessPartnerLifeCycleStatusCode. With regard to ValidityDate, only the data that is valid on the date specified here is selected. It is of GDT type Date and, in some implementations, can have a Qualifier of Validity.

With a QuerybyRoleServicePerformerOrRelationshipIsServicePerformer query: Only those persons who either have the role that is assigned to the RoleCategory Service Performer, or have a service performer relationship are selected. The business partner number and the name of the person and organization for which the person is a service performer can be entered as the most important selection parameters. The data type BusinessPartnerRoleServicePerformerOrRelationshipsServicePerformerQueryElements defines the query elements: InternalID, UUID, CommonPersonNameFamilyName, CommonPersonNameGivenName, AddressPostalAddressCityName, AddressPostalAddressStreetPostalCode, AddressPostalAddressCountryCode, LifeCycleStatusCodeRelationshipBusinessPartnerInternalID, RelationshipBusinessPartnerUUID, RelationshipBusinessPartnerCommonOrganisationNameFirstLineName, RelationshipServicePerformerBusinessPartnerFunctionTypeCode, RelationshipServicePerformerBusinessPartnerFunctionalArea Code, CreatedSinceDate, RelationshipBusinessPartnerLifeCycleStatusCode, ValidityDate. With regard to InternalID, in some implementations, only those service performers with the business partner number specified here are selected. It is of GDT type BusinessPartnerInternalID. With regard to UUID, in some implementations, only those service performers with the UUID specified here are selected. It is of GDT type UUID. With regard to CommonPersonNameFamilyName, in some implementations, only those service performers with the family name specified here are selected. It is of GDT type MEDIUM_Name and, in some implementations, can have a Qualifier of Family. With regard to CommonPersonNameGivenName, in some implementations, only those service performers with the first name specified here are selected. It is of GDT type MEDIUM_Name and, in some implementations, can have a Qualifier of Given. With regard to AddressPostalAddressCityName, in some implementations, only those service performers whose city in the partner address, service performer workplace address or employee workplace address matches city name specified here are selected. It is of GDT type LANGUAGEINDEPENDENT_MEDIUM_Name. With regard to AddressPostalAddressStreetPostalCode, in some implementations, only those service performers whose postal code in the partner address, service performer workplace address or employee workplace address matches postal code specified here are selected. It is of GDT type PostalCode. With regard to AddressPostalAddressCountryCode, in some implementations, only those service performers whose country in the partner address, service performer workplace address or employee workplace address matches country specified here are selected. It is of GDT type CountryCode. LifeCycleStatusCode is of GDT type BusinessPartnerLifeCycleStatusCode. With regard to RelationshipBusinessPartnerInternalID, in some implementations, only those service performers that have a service performer relationship with a business partner that has the business partner number specified here are selected. It is of GDT type BusinessPartnerInternalID. With regard to RelationshipBusinessPartnerUUID, in some implementations, only those service performers that have a service performer relationship with a business partner that has the UUID number specified here are selected. It is of GDT type UUID. With regard to RelationshipBusinessPartner-CommonOrganisationNameFirstLineName, in some implementations, only those service performers are selected, that have a service performer relationship with a business partner where the name components specified here are in the first name line of the address format. It is of GDT type LANGUAGEINDEPENDENT_MEDIUM_Name and, in some implementations, can have a Qualifier of FirstLine. With regard to RelationshipServicePerformer-BusinessPartnerFunctionTypeCode, in some implementations, only those service performers whose function matches the one specified here are selected. It is of GDT type BusinessPartnerFunctionTypeCode. With regard to RelationshipServicePerformerBusinessPartnerFunctionalAreaCode, in some implementations, only those service performers whose functional area matches the one specified here are selected. It is of GDT type BusinessPartnerFunctionalAreaCode. With regard to CreatedSinceDate, in some implementations, only those service performers created on the date specified here or later are selected. (This would then be the case if the sub-element CreationDateTime of the root element SystemAdministrativeData contains a date that either corresponds to the date specified here or has a later date.) It is of GDT type Date and, in some implementations, can have a Qualifier of CreatedSince. RelationshipBusinessPartner-LifeCycleStatusCode is of GDT type BusinessPartnerLifeCycleStatusCode. With regard to ValidityDate, only the data that is valid on the date specified here is selected. It is of GDT type Date and, in some implementations, can have a Qualifier of Validity.

A QueryByRoleContactPersonOrServicePerformer query supplies a list of business partners with role contact person and/or service performer, whose results comply with the selection criteria from query elements and specified supplier role. The query can be performed by using human-readable unambiguous identifiers and indicators contained in Supplier and Address. The query selects only business partners where the current data corresponds to the selection criteria. The data type BusinessPartnerRoleContact-PersonOrServicePerformerQueryElements defines the query elements: RoleCode, InternalID, UUID, CommonPersonNameFamilyName, CommonPersonNameGivenName, RelationshipWorkplaceAddressBuildingID, Relationship-WorkplaceAddressFloorID, RelationshipWorkplaceAddressRoomID, RelationshipWorkplaceAddressEmailAddress, RelationshipDefaultIndicator, RelationshipBusinessPartnerRoleCodeValid, Relationship-BusinessPartnerInternalID, RelationshipBusinessPartner-UUID, RelationshipBusinessPartner-CommonOrganisationNameFirstLineName, RelationshipBusinessPartner-CommonOrganisationNameSecondLineName, RelationshipBusinessPartnerAddressPostalAddressCityName, RelationshipBusinessPartnerAddressPostalAddressStreetPostalCode, RelationshipBusinessPartnerAddressPostalAddressStreetName, RelationshipBusinessPartnerAddressPostalAddressCountryCode, RelationshipBusinessPartnerAddressPostalAddressRegionCode, RelationshipBusinessPartnerIdentificationDunAndBradstreetNumberBusinessPartnerID, IdentityUserAccountID. With regard to RoleCode, in some implementations, valid roles for this query are Contact Person and Service Performer. Query will deliver only supplier contact with specified role. Query without specified supplier contact role will deliver all supplier contacts. It is of GDT type BusinessPartnerRoleCode. InternalID is of GDT type BusinessPartnerInternalID. UUID is of GDT type UUID. CommonPersonNameFamilyName is of GDT type MEDIUM_Name and, in some implementations, can have a Qualifier of Family. CommonPersonNameGivenName is of GDT type MEDIUM_Name and, in some implementations, can have a Qualifier of Given. With regard to RelationshipWorkplaceAddressBuildingID, in some implementations, only those contact persons and service performers are selected that have a contact person or service performer relationship with a business partner where the building number of the relationship address matches the one specified here. It is of GDT type BuildingID. With regard to RelationshipWorkplaceAddressFloorID, in some implementations, only those contact persons and service performers are selected, that have a contact person or service performer relationship with a business partner where the floor number of the relationship address agrees with the one specified here. It is of GDT type FloorID. With regard to RelationshipWorkplaceAddressRoomID, in some implementations, only those contact persons and service performers are selected, that have a contact person or service performer relationship with a business partner where the room number of the relationship address agrees with the one specified here. It is of GDT type RoomID. With regard to RelationshipWorkplaceAddressEmailAddress, in some implementations, only those contact persons and service performers are selected, that have a contact person or service performer relationship with a business partner where the e-mail number of the relationship address agrees with the one specified here. It is of GDT type EMailAddress. RelationshipDefaultIndicator indicates that this supplier contact is the default contact/service performer. It is of GDT type Indicator and, in some implementations, can have a Qualifier of Default. With regard to RelationshipBusinessPartnerRoleCode, in some implementations, balid roles for query are Vendor, Bidder and Invoicing Party. Query will deliver only the supplier contact for specified supplier role. Query without specified role will deliver supplier contact for all supplier roles. It is of GDT type BusinessPartnerRoleCode. With regard to RelationshipBusinessPartnerInternalID, in some implementations, only those contact persons and service performers are selected that have a contact person or service performer relationship with the business partner that has the business partner number specified here. It is of GDT type BusinessPartnerInternalID. With regard to RelationshipBusinessPartnerUUID, in some implementations, only those contact persons and service performers are selected, that have a contact person or service performer relationship with the business partner that has the business partner number specified here. It is of GDT type UUID. With regard to RelationshipBusinessPartner-CommonOrganisationNameFirstLineName, in some implementations, only those contact persons and service performers are selected, that have a contact person or service performer relationship with the business partner where the name components specified here are in the first name line of the address format. It is of GDT type LANGUAGEINDEPENDENT_MEDIUM_Name and, in some implementations, can have a Qualifier of FirstLine. With regard to RelationshipBusinessPartnerCommonOrganisationNameSecond LineName, in some implementations, only those contact persons and service performers are selected, that have a contact person or service performer relationship with the business partner where the name components specified here are in the second name line of the address format. It is of GDT type LANGUAGEINDEPENDENT_MEDIUM_Name and, in some implementations, can have a Qualifier of SecondLine. With regard to RelationshipBusinessPartnerAddressPostalAddressCityName, in some implementations, only those contact persons and service performers are selected, that have a contact person or service performer relationship with the business partner that has the address with the town or place specified here. It is of GDT type LANGUAGEINDEPENDENT_MEDIUM_Name and, in some implementations, can have a Qualifier of City. With regard to RelationshipBusinessPartnerAddressPostalAddressStreetPostalCode, in some implementations, only those contact persons and service performers are selected, that have a contact person or service performer relationship with the business partner that has the address with the postal code specified here. It is of GDT type PostalCode. With regard to RelationshipBusinessPartnerAddressPostalAddressStreetName, in some implementations, only those contact persons and service performers are selected that have a contact person or service performer relationship with the business partner that has an address with the street name specified here. It is of GDT type StreetName. With regard to RelationshipBusinessPartnerAddressPostalAddressCountryCode, in some implementations, only those contact persons and service performers are selected, that have a contact person or service performer relationship with the business partner that has an address with the country specified here. It is of GDT type CountryCode. With regard to RelationshipBusinessPartnerAddressPostalAddressRegionCode, in some implementations, only those contact persons and service performers are selected that have a contact person or service performer relationship with the business partner that has an address with the region specified here. It is of GDT type RegionCode. With regard to RelationshipBusinessPartnerIdentificationDunAndBradstreetNumberBusinessPartnerID, in some implementations, only those contact persons and service performers are selected that have a contact person or service performer relationship with the business partner that has a Dun & Bradstreet identification number (D-U-N-S number. specified here. It is of GDT type BusinessPartnerID. With regard to IdentityUserAccountID, in some implementations, only those contact persons and service performers are selected that have user number specified here. It is of GDT type UserAccountID.

A QueryInvoicingPartyByRelationship query supplies a list of business partners with role invoicing party, which results comply with the selection criteria from query elements of specified supplier. The query can be performed by using human-readable unambiguous identifiers and indicators contained in Supplier and Address. The query selects only business partners where the current data corresponds to the selection criteria. SupplierInvoicingPartyByRelationshipQueryElement defines the query elements: InternalID, UUID, CommonOrganisationNameFirstLineName, CommonOrganisationNameSecondLineName, AddressPostalAddressCityName, AddressPostalAddressStreetPostalCode, AddressPostalAddressStreetName, AddressPostalAddressCountryCode, AddressPostalAddressRegionCode, IdentificationDunAndBradstreetNumberBusinessPartnerID, AddressEMailAddress, AddressPostalAddressBuildingID, AddressPostalAddressFloorID, RelationshipBusinessPartnerInternalID, RelationshipBusinessPartnerUUID, RelationshipBusinessPartnerCommonOrganisationNameFirstLineName, RelationshipBusinessPartnerCommonOrganisationNameSecondLineName, RelationshipBusinessPartnerAddressPostalAddressCityName, RelationshipBusinessPartnerAddressPostalAddressStreetPostalCode, RelationshipBusinessPartnerAddressPostalAddressStreetName, RelationshipBusinessPartnerAddressPostalAddressCountryCode, RelationshipBusinessPartnerAddressPostalAddressRegionCode, RelationshipBusinessPartnerVendorDunAndBradstreetNumber, RelationshipBusinessPartnerAddressEMailAddress, RelationshipBusinessPartnerAddressBuildingID, RelationshipBusinessPartnerAddressFloorID, in some implementations, RelationshipDefaultIndicator. InternalID is of GDT type BusinessPartnerInternalID. UUID is of GDT type UUID. CommonOrganisationNameFirstLineName is of GDT type MEDIUM_Name and, in some implementations, can have a Qualifier of FirstLine. CommonOrganisationNameSecondLineName is of GDT type MEDIUM_Name and, in some implementations, can have a Qualifier of SecondLine. AddressPostalAddressCityName is of GDT type LANGUAGEINDEPENDENT_MEDIUM_Name and, in some implementations, can have a Qualifier of City. AddressPostalAddressStreetPostalCode is of GDT type PostalCode. AddressPostalAddressStreetName is of GDT type StreetName. AddressPostalAddressCountryCode is of GDT type CountryCode. AddressPostalAddressRegionCode is of GDT type RegionCode. With regard to IdentificationDunAndBradstreetNumberBusinessPartnerID, in some implementations, only those invoicing parties that have the Dun & Bradstreet ID number specified here are selected. is of GDT type BusinessPartnerID. AddressEMailAddress is of GDT type EMailAddress. AddressPostalAddressBuildingID is of GDT type BuildingID. AddressPostalAddressFloorID is of GDT type FloorID. With regard to RelationshipBusinessPartnerInternalID, in some implementations, only those invoicing parties that have an invoicing party relationship with a vendor that has the business partner number specified here are selected. It is of GDT type BusinessPartnerInternalID. With regard to RelationshipBusinessPartnerUUID, in some implementations, only those invoicing parties that have an invoicing party relationship with a vendor that has the UUID specified here are selected. It is of GDT type UUID. With regard to RelationshipBusinessPartnerCommonOrganisationNameFirstLineName, in some implementations, only those invoicing parties are selected that have an invoicing partner relationship with vendor where the name components specified here are in the first name line of the address format. It is of GDT type MEDIUM_Name and, in some implementations, can have a Qualifier of FirstLine. With regard to RelationshipBusinessPartnerCommonOrganisationNameSecondLineName, in some implementations, only those invoicing parties are selected that have an invoicing partner relationship with vendor where the name components specified here are in the second name line of the address format. It is of GDT type MEDIUM_Name and, in some implementations, can have a Qualifier of SecondLine. With regard to RelationshipBusinessPartnerAddressPostalAddressCityName, in some implementations, only those invoicing parties that have an invoicing party relationship with a vendor that has an address with the town or place specified here are selected. It is of GDT type LANGUAGEINDEPENDENT_MEDIUM_Name and, in some implementations, can have a Qualifier of City. With regard to RelationshipBusinessPartnerAddressPostalAddressStreetPostalCode, in some implementations, only those invoicing parties that have an invoicing party relationship with a vendor that has an address with the postal code of the street address specified here are selected. It is of GDT type PostalCode. With regard to RelationshipBusinessPartnerAddressPostalAddressStreetName, in some implementations, only those invoicing parties that have an invoicing party relationship with a vendor that has an address with the street name specified here are selected. It is of GDT type StreetName. With regard to RelationshipBusinessPartnerAddressPostalAddressCountryCode, in some implementations, only those invoicing parties that have an invoicing party relationship with a vendor that has an address with the country specified here are selected. It is of GDT type CountryCode. With regard to RelationshipBusinessPartnerAddressPostalAddressRegionCode, in some implementations, only those invoicing parties that have an invoicing party relationship with a vendor that has an address with the region specified here are selected. It is of GDT type RegionCode. With regard to RelationshipBusinessPartnerVendorDunAndBradstreetNumber, in some implementations, only those invoicing parties that have an invoicing party relationship with a vendor that has the Dun & Bradstreet ID number (D-U-N-S number. specified here are selected. It is of GDT type. BusinessPartnerID. With regard to RelationshipBusinessPartnerAddressEMailAddress, in some implementations, only those invoicing parties that have an invoicing party relationship with a vendor that has an address with the e-mail number specified here are selected. It is of GDT type EMailAddress. With regard to RelationshipBusinessPartnerAddressBuildingID, in some implementations, only those invoicing parties that have an invoicing party relationship with a vendor that has an address with the building number specified here are selected. It is of GDT type BuildingID. With regard to RelationshipBusinessPartnerAddressFloorID, in some implementations, only those invoicing parties that have an invoicing party relationship with a vendor that has an address with the floor number specified here are selected. It is of GDT type FloorID. If the RelationshipDefaultIndicator indicator is set, in some implementations, only those invoicing parties that have an invoicing party relationship with a vendor that is flagged as the standard vendor are selected. It is of GDT type Indicator and, in some implementations, can have a Qualifier of Default.

Common

Common contains general, time-dependent information for business partner. This would include, for example, the nationality of a person, and also the year an organization was established along with its legal form. The elements located at the Common node can be defined by the data type BusinessPartnerCommonElements. In certain implementations, these elements can include: ValidityPeriod, KeyWordsTest, AdditionalKeyWordsText, VerbalCommunicationalLanguageCode, SalutationText, CorrespondenceBrailleRequiredIndicator, CorrespondenceUpperCaseRequiredIndicator, NaturalPersonIndicator, ContactAllowedCode, BusinessPartnerFormattedName, BusinessPartnerName, LegalCompetenceIndicator, Person, Organization, and Group.

ValidityPeriod is the period in which the general data is valid. The ValidityPeriod may be based on GDT CLOSED_DatePeriod and, in some implementations, can have a Qualifier of Validity.

KeyWordsText is additional information that may be defined for an object, which can only be interpreted when searching for this object as an additional search criterion and is optional. The KeyWordsText may be based on GDT KeyWordsText. AdditionalKeyWordsText is an additional piece of information that is defined for an object, which may only be interpreted when searching for this object as an additional search criterion and is optional. The AdditionalKeyWordsText may be based on GDT KeyWordsText. VerbalCommunicationLanguageCode is the language used for the verbal communication with a business partner and is optional. The VerbalCommunicationLanguageCode may be based on GDT LanguageCode. SalutationText is the individual salutation for a business partner that can be used instead of one that is generated for a letter and is optional. The SalutationText may be based on GDT SalutationText. CorrespondenceBrailleRequiredIndicator shows whether correspondence with the business partner is required in Braille. The CorrespondenceBrailleRequiredIndicator may be based on GDT Indicator and, in some implementations, can have a Qualifier of CorrespondenceBrailleRequired. CorrespondenceUpperCaseRequiredIndicator shows that correspondence with the business partner is required in uppercase. The CorrespondenceUpperCaseRequiredIndicator may be based on GDT Indicator and, in some implementations, can have a Qualifier of CorrespondenceUpperCaseRequired. NaturalPersonIndicator shows whether the business partner is regarded as a natural person for the purposes of tax law. The NaturalPersonIndicator may be based on GDT Indicator and, in some implementations, can have a Qualifier of NaturalPerson ContactAllowedCode shows whether the business partner may be contacted or not and is optional. The ContactAllowedCode may be based on GDT ContactAllowedCode. BusinessPartnerFormattedName is the fully-formatted name of the business partner and is optional. The BusinessPartnerFormattedName may be based on GDT LANGUAGEINDEPENDENT_LONG_Name and, in some implementations, can have a Qualifier of BusinessPartnerFormatted. BusinessPartnerName is the name of the business partner and is optional. The name may be identical with the last name for a person, with the first component of the organization name for an organization and with the group name for a group. The BusinessPartnerName may be based on GDT LANGUAGEINDEPENDENT_MEDIUM_Name and, in some implementations, can have a Qualifier of BusinessPartner. LegalCompetenceIndicator indicates if a business partner has legal competence or not. The LegalCompetenceIndicator may be based on GDT Indicator and, in some implementations, can have a Qualifier of LegalCompetence. Person is the data for a business partner of the category Person and is optional. The person may be based on IDT BusinessPartnerCommonPerson. In certain implementations, the elements include: Name, GenderCode, BirthPlaceName, BirthDate, BirthDateProtectedIndicator, DeathDate, MaritalStatusCode, NonVerbalCommunicationLanguageCode, OccupationCode, NationalityCountryCode, and OriginCountryCode. Name is the name of the person and is optional. The name may be based on GDT PersonName. GenderCode is the gender of the person and is optional. The GenderCode may be based on GDT GenderCode. BirthPlaceName is the person's place of birth and is optional. The BirthPlaceName may be based on GDT LANGUAGEINDEPENDENT_MEDIUM_Name and, in some implementations, can have a Qualifier of BirthPlace.

BirthDate is the date of birth of the person and is optional. The BirthDate may be based on GDT Date and, in some implementations, can have a Qualifier of Birth. BirthDateProtectedIndicator indicates that the date of birth of the person is protected. In some implementations, the personal data of the employee must be protected for legal reasons. This protected data may only be visible in the Employee business object. This means that apart from the employee, only people with special authorization can view this data. It is only when the employee expressly gives consent that this data may be used in other processes (and therefore in other business objects). The BirthDateProtectedIndicator may be based on GDT Indicator and, in some implementations, can have a Qualifier of Protected. DeathDate is the date of death of person and is optional. The DeathDate may be based on GDT Date and, in some implementations, can have a Qualifier of Death. MaritalStatusCode is the marital status of the person and is optional. The MaritalStatusCode may be based on GDT MaritalStatusCode. NonVerbalCommunicationLanguageCode is the language for correspondence with person and is optional. NonVerbalCommunicationLanguageCode may be based on GDT LanguageCode. OccupationCode is the occupation of person and is optional. The OccupationCode may be based on GDT OccupationCode. NationalityCountryCode is the nationality of person and is optional. The NationalityCountryCode may be based on GDT CountryCode. OriginCountryCode is the country of origin for persons who are not native to the country and is optional. The OriginCountryCode may be based on GDT CountryCode. Organisation is the data for a business partner of the category Organization and is optional. The Organisation may be based on IDT BusinessPartnerCommonOrganisation. In certain implementations, the elements include: Name, CompanyLegalFormCode, FoundationDate, and LiquidationDate. Name is the name of organization and is optional. The Name may be based on GDT OrganisationName. CompanyLegalFormCode is the legal form of organization and is optional. The CompanyLegalFormCode may be based on GDT CompanyLegalFormCode. FoundationDate is the date of the foundation of organization and is optional. The FoundationDate may be based on GDT Date and, in some implementations, can have a Qualifier of Foundation. LiquidationDate is the date of liquidation of the organization and is optional. The LiquidationDate may be based on GDT Date and, in some implementations, can have a Qualifier of Liquidation. Group is the data for a business partner of the category Group and is optional. The Group may be based on IDT BusinessPartnerCommonGroup. In certain implementations, the elements include: FormOfAddressCode, Name, AdditionalName, and PartnerGroupTypeCode. FormOfAddressCode is a code for group salutation and is optional. The FormOfAddressCode may be based on GDT FormOfAddressCode. Name is a name of the group and is optional. The Name may be based on GDT LANGUAGEINDEPENDENT_MEDIUM_Name and, in some implementations, can have a Qualifier of BusinessPartnerGroup. AdditionalName is an additional group name and is optional. The AdditionalName may be based on GDT LANGUAGEINDEPENDENT_MEDIUM_Name and, in some implementations, can have a Qualifier of BusinessPartnerGroup. PartnerGroupTypeCode is a type of group and is optional. The PartnerGroupTypeCode may be based on GDT BusinessPartnerPartnerGroupTypeCode.

There may be a number of composition relationships with subordinate nodes including: CommonFormattedDefaultAddress may have a cardinality relationship of 1:cn In some implementations, if the business partner is a person, the IDTs BusinessPartnerCommonOrganisation and BusinessPartnerCommonGroup should not contain any information. If the business partner is an organization, the IDTs BusinessPartnerCommonPerson and BusinessPartnerCommonGroup should not contain any information. If the business partner is a group, the IDTs BusinessPartnerCommonPerson and BusinessPartnerCommonOrganisation should not contain any information. The elements BusinessPartnerFormattedName and BusinessPartnerName cannot be changed (read-only). The element BirthDateProtectedIndicator is only visible and can only be maintained in the business object Employee. If the BirthDateProtectedIndicator is set, then the date of birth can only be maintained in the business object Employee. The date of birth is empty and cannot be maintained in all other derived business objects.

A CommonFormattedDefaultAddress is the formatted standard address of the business partner. The elements located at the CommonFormattedDefaultAddress node can be defined by the data type BusinessPartnerCommonFormattedDefaultAddressElements. In certain implementations, these elements can include: ValidityPeriod, FormattedAddressDescription, FormattedNameAndCityAddressDescription, and FormattedAddress. ValidityPeriod is the period in which the name of the business partner is valid: The ValidityPeriod may be based on GDT CLOSED_DatePeriod and, in some implementations, can have a Qualifier of Validity. FormattedAddressDescription is the formatted standard address of the business partner and is optional. The FormattedAddressDescription may be based on GDT LANGUAGEINDEPENDENT_MEDIUM_Description. FormattedNameAndCityAddressDescription is the formatted standard address of the business partner that contains the name and city only and is optional. The FormattedNameAndCityAddressDescription may be based on GDT LANGUAGEINDEPENDENT_MEDIUM_Description. FormattedAddress is the formatted standard address of the business partner in four lines and is optional. The FormattedAddress may be based on GDT FormattedAddress.

In some implementations, the elements of this node cannot be changed (read-only). The node is transient.

RegulatoryCompliance is the representation of country-specific requirements which govern employers' compliance with legislation regulating employment. The elements located at the node RegulatoryCompliance can be defined by the data type BusinessPartnerRegulatoryComplianceElements. In certain implementations, this element includes: ValidityPeriod. ValidityPeriod is the validity period of the regulatory compliance. The ValidityPeriod may be based on GDT CLOSED_DatePeriod and, in some implementations, can have a Qualifier of Validity.

A Role is the business role that a business partner has. This role may contain the business environment of the business partner and its tasks (rights and obligations) that it may have to observe in this environment and it is described in more detail through the business information required in this environment. The elements located at the Role node can be defined by the data type BusinessPartnerRoleElements. In certain implementations, these elements can include: RoleCode, BusinessObjectTypeCode, and ValidityPeriod. RoleCode is a role of the business partner. TheRoleCode may be based on GDT BusinessPartnerRoleCode. BusinessObjectTypeCode is the type of business object to which a business partner may belong and is optional. Whether or not a business partner may belong to the business objects derived from the business partner template may depend on the business partner role—for example, if a business partner has the role Employee it can belong to the business object Employee and if a business partner has the role Ship-To Party it can belong to the business object Customer. (All business partners may belong to the business object Business Partner). The BusinessObjectTypeCode may be based on GDT BusinessObjectTypeCode; The value range can include the values of the business objects derived from the business partner template. ValidityPeriod is the period in which the business partner may have this role and is optional. The ValidityPeriod may be based on GDT CLOSED_DatePeriod and, in some implementations, can have a Qualifier of Validity.

In some implementations, the element BusinessObjectTypeCode of this node cannot be changed (read-only).

CurrentBusinessCharacters 116134 specifies the currently-valid business characters of a business partner. This node is a Transformation Node. The data is derived from the Role node and changes can likewise be carried out via the Role node. In some implementations, time restrictions can be applied to the validity of the data. "Currently valid" means that the day on which the data is determined for this node can lie within the validity period.

For example, for business character Contact Person the two BusinessPartnerRoles "Contact Person for Software" and "Contact Person for Hardware" are created, whereby the latter is the standard assignment. In this case for business partners who are currently "Contact Person for Software" or "Contact Person for Hardware", the ContactPersonIndicator is set. If the indicator is reset the role assignment is also reset. If the indicator is set, then the business partner is maintained as the "Contact Person for Hardware".

The elements located at the CurrentBusinessCharacters node can be defined by the data type BusinessPartnerCurrentBusinessCharactersElements. In certain implementations, these elements can include: VendorIndicator, BidderIndicator, PortalProviderIndicator, InvoicingPartyIndicator, PayeeIndicator, ProspectIndicator, CustomerIndicator, EmployeeIndicator, ServicePerformerIndicator, ContactPersonIndicator, CompetitorIndicator, CarrierIndicator, SalesAndServicePartnerIndicator, LogisticServiceProviderIndicator, HouseBankIndicator, ClearingHouseIndicator, TaxAuthorityIndicator, SocialInsuranceFundHeadOfficeIndicator, SocialInsuranceFundLocalOfficeIndicator, and PrivateInsuranceProviderIndicatorIndicator.

VendorIndicator is the business partner who may be a vendor. (BUSINESSPARTNER_PartyBusinessCharacterCode BBP000). The VendorIndicator may be based on CDT Indicator and, in some implementations, can have a Qualifier of Vendor. BidderIndicator is the business partner who may be a bidder. (BUSINESSPARTNER_PartyBusinessCharacterCode BBP001). The BidderIndicator may be based on GDT Indicator and, in some implementations, can have a Qualifier of Bidder. PortalProviderIndicator is the business partner who may be a portal provider. (BUSINESSPARTNER_PartyBusinessCharacterCode BBP002). The PortalProvider may be based on GDT: Indicator and, in some implementations, can have a Qualifier of PortalProvider. InvoicingPartyIndicator is the business partner who may be an invoicing party. (BUSINESSPARTNER_PartyBusinessCharacterCode BBP006). The InvoicingPartyIndicator may be based on GDT Indicator and, in some implementations, can have a Qualifier of InvoicingParty. PayeeIndicator is the business partner who is a payee. (BUSINESSPARTNER_PartyBusinessCharacterCode BBP007). The PayeeIndicator may be based on GDT Indicator and, in some implementations, can have a Qualifier of ServicePerformer. ProspectIndicator is the business partner who is a prospect. (BUSINESSPARTNER_PartyBusinessCharacterCode BUP002). The ProspectIndicator may be based on GDT Indicator and, in some implementations, can have a Qualifier of Prospect. CustomerIndicator is the business partner who is a customer. (BUSINESSPARTNER_PartyBusinessCharacterCode CRM000). The CustomerIndicator may be based on GDT Indicator and, in some implementations, can have a Qualifier of Customer. EmployeeIndicator is the business partner who is an employee. (BUSINESSPARTNER_PartyBusinessCharacterCode BUP003). The EmployeeIndicator may be based on GDT Indicator and, in some implementations, can have a Qualifier of Employee. ServicePerformerIndicator is the business partner who is a service performer. (BUSINESSPARTNER_PartyBusinessCharacterCode BBP005). The ServicePerformerIndicator may be based on GDT Indicator and, in some implementations, can have a Qualifier of ServicePerformer. ContactPersonIndicator is the business partner who is a contact person. (BUSINESSPARTNER_PartyBusinessCharacterCode BUP001). The ContactPersonIndicator may be based on GDT Indicator and, in some implementations, can have a Qualifier of ContactPerson. CompetitorIndicator is the business partner who is a competitor. (BUSINESSPARTNER_PartyBusinessCharacterCode CRM005). The CompetitorIndicator may be based on GDT Indicator and, in some implementations, can have a Qualifier of Competitor. CarrierIndicator is the business partner who is a carrier (BUSINESSPARTNER_PartyBusinessCharacterCode CRM010). The CarrierIndicator may be based on GDT Indicator and, in some implementations, can have a Qualifier of Carrier. SalesAndServicePartnerIndicator is the business partner who is a sales and service partner. (BUSINESSPARTNER_PartyBusinessCharacterCode CRM011). The SalesAndServicePartnerIndicator may be based on GDT Indicator and, in some implementations, can have a Qualifier of SalesAndServicePartner. LogisticServiceProviderIndicator is the business partner who is a logical service provider (BUSINESSPARTNER_PartyBusinessCharacterCode SCM001). The LogisticServiceProviderIndicator may be based on GDT Indicator and, in some implementations, can have a Qualifier of LogisticServiceProvider. HouseBankIndicator is the business partner who is a house bank (BUSINESSPARTNER_PartyBusinessCharacterCode PAY001). The HouseBankIndicator may be based on GDT Indicator and, in some implementations, can have a Qualifier of HouseBank. ClearingHouseIndicator is the business partner who is a clearing house (BUSINESSPARTNER_PartyBusinessCharacterCode PAY002). The ClearingHouseIndicator may be based on GDT Indicator and, in some implementations, can have a Qualifier of ClearingHouse. TaxAuthorityIndicator is the business partner who is a tax authority (BUSINESSPARTNER_PartyBusinessCharacterCode TAX001). The TaxAuthorityIndicator may be based on GDT Indicator and, in some implementations, can have a Qualifier of TaxAuthority. SocialInsuranceFundHeadOfficeIndicator is the business partner who is a head office of a social insurance fund (BUSINESSPARTNER_PartyBusinessCharacterCode HCMG01). The SocialInsuranceFundHeadOfficeIndicator may be based on GDT Indicator and, in some implementations, can have a Qualifier of SocialInsuranceFundHeadOffice. SocialInsuranceFundLocalOfficeIndicator is the business partner who is a local office of a social insurance fund. (BUSINESSPARTNER_PartyBusinessCharacterCode HCMG02). The SocialInsuranceFundLocalOfficeIndicator may be based on GDT Indicator and, in some implementations, can have a Qualifier of SocialInsuranceFundLocalOffice. PrivateInsuranceProviderIndicatorIndicator is the business partner who is a private insurance provider. (BUSINESSPARTNER_PartyBusinessCharacterCode HCMG03). The PrivateInsuranceProviderIndicatorIndicator may be based on GDT Indicator and, in some implementations, can have a Qualifier of PrivateInsuranceProvider. In some implementations, only those indicators assigned to the actual projection can be maintained for the roles.

An EmployeeWorkplaceAddressInformation contains the employee workplace address. The elements located at the EmployeeWorkplaceAddressInformation node can be defined by the data type BusinessPartnerEmployeeWorkplaceAddressInformationElements. In certain implementations, these elements can include: UUID, and ValidityPeriod. UUID is a universal identifier, which can be unique, of the employee workplace address and is an alternative key. The UUID may be based on GDT UUID.

ValidityPeriod is the period in which the employee workplace address is valid and is optional. The ValidityPeriod may be based on GDT CLOSED_DatePeriod and, in some implementations, can have a Qualifier of Validity.

There may be a number of composition relationships with subordinate nodes including: EmployeeWorkplaceAddressUsage may have a cardinality relationship of 1:cn. EmployeeWorkplaceAddressOrganisationAddress 116050 may have a cardinality relationship of 1:c. EmployeeWorkplaceAddressWorkplaceAddress 116052 may have a cardinality relationship of 1:1.

EmployeeWorkplaceAddressUsage may contain the business, time-dependent usage of the workplace address of an employee. The elements located at the EmployeeWorkplaceAddressUsage node can be defined by the data type BusinessPartnerEmployeeWorkplaceAddressUsageElements. In certain implementations, these elements can include: AddressUsageCode, ValidityPeriod, and DefaultIndicator. AddressUsageCode specifies the usage of an address. The AddressUsageCode may be based on GDT AddressUsageCode. The code value for the default employee workplace address may be allowed. ValidityPeriod is the period in which the employee workplace address may have a particular usage. The ValidityPeriod may be based on GDT CLOSED_DatePeriod and, in some implementations, can have a Qualifier of Validity. DefaultIndicator indicates the standard address within an Address Usage type 116066. In some implementations, If several addresses are assigned to an address usage at one specific time, one address can be indicated as the default address. The DefaultIndicator may be based on GDT Indicator and, in some implementations, can have a Qualifier of Default.

EmployeeWorkplaceAddressOrganisationAddress may contain the organization-specific part of an employee workplace address. The data is modeled using the dependent object OrganisationAddress.

EmployeeWorkplaceAddressOrganisationAddress may contain the address of an employee within an organization. The data is mapped using the dependent object WorkplaceAddress.

AddressInformation is the address of business partner along with its usage. The elements located at the AddressInformation node can be defined by the data type BusinessPartnerAddressInformation. In certain elements, these elements can include: UUID, MoveDestinationAddressUUID, MoveDate, ProtectedIndicator, and ValidityPeriod. UUID is a universal identification, which can be unique, of a business partner address and is an alternative key. The UUID may be based on GDT UUID. MoveDestinationAddressUUID is a universal identification, which can be unique, of the new address after the business partner has moved and is optional. The MoveDestinationAddressUUID may be based on GDT UUID. MoveDate is the date as of which an address is replaced by another and is optional. The MoveDate may be based on GDT Date and, in some implementations, can have a Qualifier of Move. ProtectedIndicator indicates the address is protected. In some implementations, the personal data of the employee must be protected for legal reasons. This protected data may only be visible in the Employee business object. This means that apart from the employee, only people with special authorization can view this data. It is only when the employee expressly gives consent that this data may be used in other processes (and therefore in other business objects). The ProtectedIndicator may be based on GDT Indicator and, in some implementations, can have a Qualifier of Protected. ValidityPeriod is the period in which the address is valid and is optional. The ValidityPeriod may be based on GDT CLOSED_DatePeriod and, in some implementations, can have a Qualifier of Validity.

There may be a number of composition relationships with subordinate nodes including: AddressUsage may have a cardinality relationship of 1:cn. AddressCurrentAddressDeterminationProcesses 116062 may have a cardinality relationship of 1:c. Address 116068 may have a cardinality relationship of 1:1.

In some implementations, the element ProtectedIndicator can only be viewed and maintained in the business object Employee and may only be maintained if the address has the usage Private Address of Employee. When the element ProtectedIndicator is set, the address can only be maintained in the business object Employee. The address is empty and cannot be maintained in all other derived business objects.

AddressCurrentAddressDeterminationProcesses specifies the address determination processes for which an address can currently be used. This node is a Transformation Node. The data can be derived from the AddressUsage node and changes can likewise be carried out via the AddressUsage node. To determine the individual values, a check is first carried out as to whether an AddressUsageCode is assigned to the AddressDeterminationCode in the business configuration. If the assignment exists, a check is then carried out to see if the address currently has the assigned AddressUsageCode. The result of this check is then shown in the element. In some implementations, time restrictions can be applied to the validity of the data. “Current” means that the day on which the data is determined for this node lies within the validity period.

For example, the AddressUsageCode Delivery Address is assigned to the PartyAddressDeterminationCode “Address Determination for Sending Goods” and “Address Determination for Sending Invoices”. In this case the elements DeliveryAddressAddressDeterminationProcessRelevanceCode and BillToPartyAddressDeterminationProcessRelevanceCode always have the same value. If the address is the current delivery address or the standard delivery address, both elements have the value Yes or Standard. If the address is not the current delivery address, both elements have the value No. If, for example, the value for the element DeliveryAddressAddressDeterminationProcessRelevanceCode is changed from No to Standard, then the address is maintained as the current delivery address via the Usage node. The value in the element BillToPartyAddressDeterminationProcessRelevanceCode is thus likewise changed from No to Standard. (If conflicting values are maintained in the two elements DeliveryAddressAddressDeterminationProcessRelevanceCode and BillToPartyAddressDeterminationProcessRelevanceCode, it triggers an error message.)

The elements located at the AddressCurrentAddressDeterminations node can be defined by the data type BusinessPartnerAddressCurrentAddressDeterminationsElements. In certain implementations, these elements can include:

DefaultAddressDeterminationProcessRelevanceIndicator, InvoicingAddressDeterminationProcessRelevanceCode, BillToAddressDeterminationProcessRelevanceCode, GoodsRecipientAddressDeterminationProcessRelevanceCode, OrderingAddressAddressDeterminationProcessRelevanceCod, ShipFromAddressAddressDeterminationProcessRelevanceCode, DeliveryAddressDeterminationProcessRelevanceCode, PaymentAddressDeterminationProcessRelevanceCode, and EmployeePrivateAddressCorrespondenceDeterminationProcessRelevanceCode DefaultAddressDeterminationProcessRelevanceIndicator is the coded representation of the relevance of the address for address determination processes to which no address is explicitly assigned. The DefaultAddressDeterminationProcessRelevanceIndicator may be based on GDT Indicator and, in some implementations, can have a Qualifier of DefaultAddressDeterminationProcessRelevance. InvoicingAddressDeterminationProcessRelevanceCode is the coded representation of the relevance of the address for address determination for invoices from an invoicing party. (PartyAddressDeterminationCode BBP002). The InvoicingAddressDeterminationProcessRelevanceCode may be based on GDT AddressDeterminationProcessRelevanceCode Qualifier Invoicing. BillToAddressDeterminationProcessRelevanceCode is the coded representation of the relevance of the address for address determination when sending invoices to a bill-to party. (PartyAddressDeterminationCode BBP004). The BillToAddressDeterminationProcessRelevanceCode may be based on GDT AddressDeterminationProcessRelevanceCode and, in some implementations, can have a Qualifier of BillTo. GoodsRecipientAddressDeterminationProcessRelevanceCode is the coded representation of the relevance of the address for address determination for (in-house) goods distribution. (PartyAddressDeterminationCode BBP005). The GoodsRecipientAddressDeterminationProcessRelevanceCode may be based on GDT AddressDeterminationProcessRelevanceCode and, in some implementations, can have a Qualifier of GoodsRecipient. OrderingAddressAddressDeterminationProcessRelevanceCode is the coded representation of the relevance of the address for address determination when ordering with a vendor. (PartyAddressDeterminationCode BBP000). The OrderingAddressAddressDeterminationProcessRelevanceCode may be based on GDT AddressDeterminationProcessRelevanceCode and, in some implementations, can have a Qualifier of Ordering. ShipFromAddressAddressDeterminationProcessRelevanceCode is the coded representation of the relevance of the address for address determination for goods distribution from a vendor. (PartyAddressDeterminationCode BBP001). The ShipFromAddressAddressDeterminationProcessRelevanceCode may be based on GDT AddressDeterminationProcessRelevanceCode and, in some implementations, can have a Qualifier of ShipFrom. DeliveryAddressDeterminationProcessRelevanceCode is the coded representation of the relevance of the address for address determination when sending goods. (PartyAddressDeterminationCode BBP003). The DeliveryAddressDeterminationProcessRelevanceCode may be based on GDT AddressDeterminationProcessRelevanceCode Qualifier Delivery. PaymentAddressDeterminationProcessRelevanceCode is the coded representation of the relevance of the address for address determination for paying a payee. (PartyAddressDeterminationCode SRM001). The PaymentAddressDeterminationProcessRelevanceCode may be based on GDT AddressDeterminationProcessRelevanceCode Qualifier Payment. EmployeePrivateAddressCorrespondenceDeterminationProcessRelevanceCode is the coded representation of the relevance of the address for address determination for correspondence with an employee using the private address (PartyAddressDeterminationCode HCM001). The EmployeePrivateAddressCorrespondenceDeterminationProcessRelevanceCode may be based on GDT AddressDeterminationProcessRelevanceCode and, in some implementations, can have a Qualifier of EmployeePrivateAddressCorrespondence) The element EmployeePrivateAddressCorrespondenceDeterminationProcessRelevanceCode is only visible and can only be maintained in the business object Employee. In some implementations, the personal data of the employee must be protected for legal reasons. This protected data is only visible in the Employee business object. This means that apart from the employee, only people with special authorization can view this data. It is only when the employee expressly gives consent that this data may be used in other processes (and therefore in other business objects).

AddressUsage contains the business, time-dependent usage of an address. An address can be used as a correspondence, delivery or bill-to party address, for example. The elements located at the AddressUsage node can be defined by the data type BusinessPartnerAddressUsageElements. In certain implementations, these elements can include: AddressUsageCode, ValidityPeriod, and DefaultIndicator. AddressUsageCode specifies the usage type of an address. An address can, for example, be used as a delivery or holiday address. The AddressUsageCode may be based on GDT AddressUsageCode. In some implementations, the codes values HCM003, HCM004, HCM005, HCM006 and HCM007 may not be permitted (Table TB009). ValidityPeriod is the period during which an address may have a certain usage. The ValidityPeriod may be based on GDT CLOSED_DatePeriod and, in some implementations, can have a Qualifier of Validity. DefaultIndicator indicates the standard address within an address usage type. In some implementations, if several addresses are assigned to an address usage at one specific time, one address must be indicated as the default address. The DefaultIndicator may be based on GDT Indicator and, in some implementations, can have a Qualifier of Default.

In some implementations, In the element AddressUsageCode the code for the private address of the employee can only be maintained in the business object Employee. In some implementations, the personal data of the employee must be protected for legal reasons. This protected data is only visible in the Employee business object. This means that apart from the employee, only people with special authorization can view this data. It is only when the employee expressly gives consent that this data may be used in other processes (and therefore in other business objects).

An Address may contain the postal address of a business partner and the related contact information data. The data is mapped using the dependent object PartnerAddress.

A CommunicationData may contain communication data of the business partner. Typical address-independent communication data would be e-mail addresses or cell phone numbers. The data is mapped using the dependent object CommunicationData.

A Business Partner Relationship may contain the business-relevant, time-dependent relationship between two business partners. Typical business partner relationships would be, for example, contact person and shareholder relationships. The elements located at the Relationship node can be defined by the data type BusinessPartner RelationshipElements. In certain implementations, these elements can include: RelationshipBusinessPartnerUUID, RelationshipBusinessPartnerInternalID, RoleCode, SystemAdministrativeData, ValidityPeriod, and Key. RelationshipBusinessPartnerUUID is a universal identifier, which can be unique, of a business partner with whom a relationship exists. The RelationshipBusinessPartnerUUID may be based on GDT UUID. RelationshipBusinessPartnerInternalID is an internal number of the business partner with whom a relationship exists. The RelationshipBusinessPartnerInternalID may be based on GDT BusinessPartnerInternalID. RoleCode determines the roles that the business partners have in the relationship. The RoleCode may be based on GDT BusinessPartnerRelationshipRoleCode. SystemAdministrativeData is the administrative data of a relationship. This data may include system users and change dates/times. SystemAdministrativeData may be based on GDT SystemAdministrativeData. ValidityPeriod is a period in which the relationship exists. The ValidityPeriod may be based on GDT CLOSED_DatePeriod and, in some implementations, can have a Qualifier of Validity. Key is an alternative key for a business partner relationship. The Key may be based on IDT BusinessPartnerRelationshipKey. In certain implementations, these elements can include: BusinessPartnerUUID, RelationshipBusinessPartnerUUID, RoleCode, and ValidityPeriodEndDate. BusinessPartnerUUID is a universal identification, which can be unique, of the business partner. The BusinessPartnerUUID may be based on GDT UUID. RelationshipBusinessPartnerUUID is a universal identification, which can be unique, of a business partner with whom a relationship exists. The RelationshipBusinessPartnerUUID may be based on GDT UUID. RoleCode may determine the roles that the business partners have in the relationship. The RoleCode may be based on GDT BusinessPartnerRelationshipRoleCode. ValidityPeriodEndDate is an end date of the validity for a relationship. The ValidityPeriodEndDate may be based on GDT Date and, in some implementations, can have a Qualifier of ValidityPeriodEnd. (The element ValidityPeriodEndDate may not have to be filled in cases where the relationship categories have no time dependency). (The element ValidityPeriodEndDate can be filled in cases where the relationship categories can have a validity period).

There may be a number of composition relationships with subordinate nodes including: RelationshipTimeDependentInformation may have a cardinality relationship of 1:cn. (In some implementations, RelationshipTimeDependentInformation may have a cardinality relationship of 1:c). RelationshipContactPerson 116074 may have a cardinality relationship of 1:c. RelationshipServicePerformer 116084 may have a cardinality relationship of 1:c RelationshipShareholder 116094 may have a cardinality relationship of 1:c.

There may be a number of Inbound aggregation relationship including: 1) From business object BusinessPartner/BusinessPartner node (Root Node) as follows. RelationshipBusinessPartner may have a cardinality relationship of 1:cn and is an association relationship with the business partner with which the relationship exists.

2) From business object Identity/Root Node as follows. CreationIdentity may have a cardinality relationship of 1:cn and is an identity that created the relationship.

3) From business object Identity/Root Node as follows. LastChangeIdentity may have a cardinality relationship of c:cn and is an identity that changed the relationship the last time.

There may be a number of Specialization Associations for Navigation including: 1) Inner Business Object Association/RelationshipTimeDependentInformation Node. CurrentTimeDependentInformation may have a cardinality relationship of c:c and is an association with the currently-valid information for a relationship.

QueryByIsContactPersonForAndWorkplaceAddress: This query supplies a list of "is Contact Person for" relations, whose results comply with the selection criteria from query elements. The query can be performed by using human readable unambiguous identifiers and indicators contained in the contact person, the organization and the workplace address. The data type BusinessPartnerIsContactPersonForAndWorkplaceAddressQueryElement defines the query elements: BusinessPartnerInternalID, BusinessPartnerUUID, BusinessPartnerCommonPersonNameFamilyName, BusinessPartnerCommonPersonNameGivenName, WorkplaceAddressBuildingID, WorkplaceAddressFloorID, WorkplaceAddressRoomID, WorkplaceAddressEmailAddress, RelationshipBusinessPartnerRoleCode, RelationshipBusinessPartnerInternalID, RelationshipBusinessPartnerUUID, RelationshipBusinessPartnerCommonOrganisationNameFirstLineName, RelationshipBusinessPartnerCommonOrganisationNameSecondLineName, RelationshipBusinessPartnerAddressPostalAddressCityName, RelationshipBusinessPartnerAddressPostalAddressStreetPostalCode, RelationshipBusinessPartnerAddressPostalAddressStreetName, RelationshipBusinessPartnerAddressPostalAddressCountryCode, RelationshipBusinessPartnerAddressPostalAddressRegionCode. BusinessPartnerInternalID is of GDT type BusinessPartnerInternalID. BusinessPartnerUUID is of GDT type UUID. BusinessPartnerCommonPersonNameFamilyName is of GDT type MEDIUM_Name and, in some implementations, can have a Qualifier of Family. BusinessPartnerCommonPersonNameGivenName is of GDT type MEDIUM_Name and, in some implementations, can have a Qualifier of Given. With regard to WorkplaceAddressBuildingID, in some implementations, only those "Is Contact Person For" relationships are selected where the building number of the relationship address matches the one specified here. It is of GDT type BuildingID. With regard to WorkplaceAddressFloorID, in some implementations, only those "Is Contact Person For" relationships are selected where the floor number of the relationship address matches the one specified here. It is of GDT type FloorID. With regard to WorkplaceAddressRoomID, in some implementations, only those "Is Contact Person For" relationships are selected where the room number of the relationship address matches the one specified here. It is of GDT type RoomID. With regard to WorkplaceAddressEmailAddress, in some implementations, only those "Is Contact Person For" relationships are selected where the e-mail number of the relationship address matches the one specified here. It is of GDT type EMailAddress. With regard to RelationshipBusinessPartnerRoleCode, in some implementations, only those "Is Contact Person For" relationships are selected where the role of the organization matches the one specified here. It is of GDT type BusinessPartnerRoleCode. With regard to RelationshipBusinessPartnerInternalID, in some implementations, only those "Is Contact Person For" relationships are selected where the internal number of the organization matches the one specified here. It is of GDT type BusinessPartnerInternalID. With regard to RelationshipBusinessPartnerUUID, in some implementations, only those "Is Contact Person For" relationships are selected where the UUID of the organization matches the one specified here. It is of GDT type UUID. With regard to RelationshipBusinessPartnerCommonOrganisationNameFirstLineName, in some implementations, only those "Is Contact Person For" relationships are selected where the first name component of the organization matches the one specified here. It is of GDT type LANGUAGEINDEPENDENT_MEDIUM_Name and, in some implementations, can have a Qualifier of FirstLine. With regard to RelationshipBusinessPartnerCommonOrganisationNameSecondLineName, in some implementations, only those "Is Contact Person For" relationships are selected where the second name component of the organization matches the one specified here. It is of GDT type LANGUAGEINDEPENDENT_MEDIUM_Name and, in some implementations, can have a Qualifier of SecondLine. With regard to RelationshipBusinessPartnerAddressPostalAddressCityName, in some implementations, only those "Is Contact Person For" relationships are selected where the organization has an address that matches the city or location specified here. It is of GDT type LANGUAGEINDEPENDENT_MEDIUM_Name and, in some implementations, can have a Qualifier of City. With regard to RelationshipBusinessPartnerAddressPostalAddressStreetPostalCode, in some implementations, only those "Is Contact Person For" relationships are selected where the organization has an address that matches the postal code of the street address specified here. It is of GDT type PostalCode. With regard to RelationshipBusinessPartnerAddressPostalAddressStreetName, in some implementations, only those "Is Contact Person For" relationships are selected where the organization has an address that matches the street name specified here. It is of GDT type StreetName. With regard to RelationshipBusinessPartnerAddressPostalAddressCountryCode, in some implementations, only those "Is Contact Person For" relationships are selected where the organization has an address that matches the country specified here. It is of GDT type CountryCode. With regard to RelationshipBusinessPartnerAddressPostalAddressRegionCode, in some implementations, only those "Is Contact Person For" relationships are selected where the organization has an address that matches the region specified here. It is of GDT type RegionCode.

RelationshipTimeDependentInformation

RelationshipTimeDependentInformation contains time-dependent information for a relationship. In some implementations, time restrictions can be applied to the validity of a relationship. You can use the RelationshipTimeDependentInformation node to show information that changes during this validity period. The elements located at the RelationshipTimeDependentInformation node can be defined by the data type BusinessPartnerRelationshipTimeDependentInformationElements. In certain implementations, these elements can include: ValidityPeriod, and DefaultIndicator. ValidityPeriod is the period in which data is valid. The ValidityPeriod may be based on GDT CLOSED_DatePeriod and, in some implementations, can have a Qualifier of Validity. DefaultIndicator indicates the standard relationship within relationships of the same category. The DefaultIndicator may be based on GDT Indicator and, in some implementations, can have a Qualifier of Default.

In some implementations, the element ValidityPeriod cannot be changed (read only) and is maintained implicitly. Within "base scope" it is not possible to support the fully time dependence of node RelationshipTimeDependentInformation. Therefore, the validity of this node may be identical to the validity of node Relationship. Within "market entry," the validity is changeable again and the cardinality can be changed back to 1:cn.

A RelationshipContactPerson contains information about the contact person within the relationship in more detail. The attributes may include, for example, the function that a contact person of a business partner can have and the department where a contact person of a business partner works. The elements located at the RelationshipContactPerson node can be defined by the data type BusinessPartnerRelationshipContactPersonElements. In certain implementations, these elements can include: BusinessPartnerFunctionTypeCode, BusinessPartnerFunctionalAreaCode, PowerOfAttorneyTypeCode, VIPReasonCode, and ContactPersonNote.

BusinessPartnerFunctionTypeCode is the type of function of contact person and is optional. The BusinessPartnerFunctionTypeCode may be based on GDT BusinessPartnerFunctionTypeCode. In some implementations, while in the element FunctionalTitleName the exact name of the contact person function is defined as you might find it on a business card, for example, this field only contains a broad description of the function (such as board member, purchasing manager and so on). This information can be evaluated for sales promotions, for example. (The element FunctionalTitleName is mapped using the dependent object Address and can found at the RelationshipContactPersonWorkplaceAddressWorkplace node.) BusinessPartnerFunctionalAreaCode is a functional area to which the contact person is assigned and is optional. The BusinessPartnerFunctionalAreaCode may be based on GDT BusinessPartnerFunctionalAreaCode. In some implementations, while for the element DepartmentName the exact name of the department of a contact person is defined as you might find it on a business card for example, this field only specifies a functional area where the contact person is employed. This information can be evaluated for sales promotions, for example. (The element DepartmentName is mapped using the dependent object Address and can found at the RelationshipContactPersonWorkplaceAddressWorkplace node.) PowerOfAttorneyTypeCode is the power of attorney that the contact person has for the business partner and is optional. The PowerOfAttorneyTypeCode may be based on GDT PowerOfAttorneyTypeCode. VIPReasonCode codes the reason that can make the contact person a VIP and is optional. The VIPReasonCode may be based on GDT VIPReasonCode. ContactPersonNote is a note on the contact person and is optional. The ContactPersonNote may be based on GDT Note, Restriction shortened to 40 characters.

There may be a number of composition relationships with subordinate nodes including: RelationshipContactPersonOperatingHoursInformation 116076 may have a cardinality relationship of 1:cn. RelationshipContactPersonWorkplaceAddressInformation 116080 may have a cardinality relationship of 1:cn. In some implementations, attributes for contact person relationships can only be used in contact person relationships.

There may be a number of Specialization Associations for Navigation including: 1) Inner Business Object Association/RelationshipContactPersonWorkplaceAddressInformation Node. DefaultWorkplaceAddressInformation may have a cardinality relationship of c:c and is an association with the standard workplace address for a contact person relationship.

1) Inner Business Object Association/RelationshipContactPersonOperatingHoursInformation Node. RelationshipContactPersonOperatingHoursInformationByOperatingHoursRole may have a cardinality relationship of c:cn and, in some implementations, may be filtered. It returns a specified type of operating hours. The filter elements can be defined by the data type BusinessPartnerRelationshipContactPersonOperatingHoursInformationByOperatingHoursRoleFilter Elements. These elements can include: OperatingHoursRole- Code. OperatingHoursRoleCode specifies the type of business hours that should be determined and is of GDT type CONTACTPERSON_OperatingHoursRoleCode.

RelationshipContactPersonOperatingHoursInformation contains the business hours for a contact person relationship. Visiting hours or calling hours can be maintained for a contact person relationship. The element located at the RelationshipContactPersonOperatingHoursInformation node can be defined by the data type BusinessPartnerRelationshipContactPersonOperatingHoursInformationElements. In certain implementations, this element includes: RoleCode. RoleCode specifies the type of business hours in question. The RoleCode may be based on GDT CONTACTPERSON_OperatingHoursRoleCode.

There are a number composition relationships with subordinate nodes including: RelationshipContactPersonOperatingHours 116078 may have a cardinality relationship of 1:1.

RelationshipContactPersonOperatingHours may contain the visiting or calling hours for a contact person relationship. The data is mapped using the dependent object OperatingHours.

RelationshipContactPersonWorkplaceAddressInformation may contain the workplace address for a contact person relationship. The elements located at the RelationshipContactPersonWorkplaceAddressInformation node can be defined by the data type BusinessPartnerRelationshipContactPersonWorkplaceAddressInformationElements. In certain implementations, these elements can include: AddressUUID, DefaultIndicator, and Key.

AddressUUID is a universal identification, which can be unique, specifies the UUID of the organization address that belongs to this workplace address. The AddressUUID may be based on GDT UUID. DefaultIndicator indicates the default workplace address. The DefaultIndicator may be based on GDT Indicator and, in some implementations, can have a Qualifier of Default. Key is the alternative key of the workplace of a business partner. The Key may be based on IDT BusinessPartnerRelationshipContactPersonWorkplaceAddressInformationKey. In certain implementations, these elements can include: ContactPersonUUID, BusinessPartnerRelationshipRoleCode, and AddressUUID. ContactPersonUUID is a universal identification, which can be unique, of the contact person. The ContactPersonUUID may be based on GDT UUID. BusinessPartnerRelationshipRoleCode describes the roles that the business partners have in the relationship. The BusinessPartnerRelationshipRoleCode may be based on GDT BusinessPartnerRelationshipRoleCode. AddressUUID specifies the universal identification, which can be unique, of the organization address that belongs to this workplace address. The AddressUUID may be based on GDT UUID.

There may be a number of composition relationships with subordinate nodes including: RelationshipContactPersonWorkplaceAddress 116082 may have a cardinality relationship of 1:1 (Composition relationship with dependent object WorkplaceAddress.)

There may be a number of Inbound Association Relationships including: 1) From business object BusinessPartner/node AddressInformation as follows. OrganisationAddressInformation may have a cardinality relationship of 1:cn and is an address of the organization to which the workplace address is assigned.

For example, The company Global Cooperation has an address in New York and one in Berlin. Peter Smith is the contact person in Global Cooperation and his workplace is in the New York office. The workplace address can be clearly specified using the UUID of Global Cooperation, the UUID of Peter Smith and the UUID of the New York address. The OrganisationAddressInformation association points from the New York address of the Global Cooperation to the workplace address.

A RelationshipContactPersonWorkplaceAddress may contain the internal address or ID of the contact person's workplace within its organization. The data is mapped using the dependent object WorkplaceAddress. If a service performer is also the contact person for the same business partner, the workplace addresses for an organization address can be identical.

A RelationshipServicePerformer may contain information about the service performer within the relationship in more detail. The attributes may include, for example, the function that a service performer of a business partner has and the department where a service performer of a business partner works.

The elements located at the RelationshipServicePerformer node can be defined by the data type BusinessPartnerRelationshipServicePerformerElements. In certain implementations, these elements can include: BusinessPartnerFunctionTypeCode, and BusinessPartnerFunctionalAreaCode.

BusinessPartnerFunctionTypeCode is a type of function of service performer and is optional. The BusinessPartnerFunctionTypeCode may be based on GDT: BusinessPartnerFunctionTypeCode. In some implementations, whilst in the element FunctionalTitleName the exact name of the service performer function is defined as you might find it on a business card, for example, this field only contains a broad description of the function (such as board member). (The element FunctionalTitleName is mapped using the dependent object Address and can be found at the RelationshipServicePerformerWorkplaceAddressWorkplace node.) BusinessPartnerFunctionalAreaCode is a functional area to which the service performer is assigned and is optional. The BusinessPartnerFunctionalArea Code may be based on GDT BusinessPartnerFunctionalAreaCode. In some implementations, while in the element DepartmentName the exact name of the department of a service performer is defined as you might find it on a business card for example, this field only specifies a functional area where the service performer is employed. (The element DepartmentName is mapped using the dependent object Address and can found at the RelationshipServicePerformerWorkplaceAddressWorkplace node.)

There may be a number of composition relationships with subordinate nodes including: RelationshipServicePerformerOperatingHoursInformation may have a cardinality relationship of 1:cn. RelationshipServicePerformerWorkplaceAddressInformation may have a cardinality relationship of 1:cn.

In some implementations, Attributes for service performer relationships can only be used in service performer relationships.

There may be a number of Specialization Associations for Navigation including: 1) Inner Business Object Association/RelationshipServicePerformerWorkplaceAddressInformation Node. DefaultWorkplaceAddressInformation may have a cardinality relationship of c:c and is an association with the standard workplace address for a service performer relationship.

2) Inner Business Object Association/RelationshipServicePerformerOperatingHoursInformation Node. RelationshipServicePerformerOperatingHoursInformationByOperatingHoursRole may have a cardinality relationship of c:cn and, in some implementations, may be filtered. It returns a specified type of operating hours.

The filter elements can be defined by the data type BusinessPartnerRelationshipServicePerformerOperatingHoursInformationByOperatingHoursRoleFilterElements. These elements can include: OperatingHoursRoleCode. OperatingHoursRoleCode specifies the type of business hours that should be determined and is of GDT type SERVICEPERFORMER_OperatingHoursRoleCode.

RelationshipServicePerformerOperatingHoursInformation 116086 may contain the business hours for a service performer relationship. Visiting hours or calling hours can be maintained for a service performer relationship. The elements located at the RelationshipServicePerformerOperatingHoursInformation node can be defined by the data type BusinessPartnerRelationshipServicePerformerOperatingHoursInformationElements. In certain implementations, the element includes: RoleCode. RoleCode specifies the type of business hours in question. The RoleCode may be based on GDT SERVICEPERFORMER_OperatingHoursRoleCode.

There may be a number composition relationships with subordinate nodes including: RelationshipServicePerformerOperatingHours may have a cardinality relationship of 1:1.

RelationshipServicePerformerOperatingHours 116088 may contain the business hours for a service performer relationship. The data is mapped using the dependent object OperatingHours.

RelationshipServicePerformerWorkplaceAddressInformation

RelationshipServicePerformerWorkplaceAddressInformation may contain the workplace address for a service performer relationship. The elements located at the RelationshipServicePerformerWorkplaceAddressInformation node 116090 can be defined by the data type BusinessPartnerRelationshipServicePerformerWorkplaceAddressInformationElements. In certain implementations, these elements can include: AddressUUID, DefaultIndicator and Key.

AddressUUID specifies the universal identification, which can be unique, of the organization address that belongs to this workplace address. The AddressUUID may be based on GDT UUID. DefaultIndicator indicates the standard workplace address. The DefaultIndicator may be based on GDT Indicator and, in some implementations, can have a Qualifier of Default. Key is the alternative key of the workplace address of a business partner. The Key may be based on IDT BusinessPartnerRelationshipServicePerformerWorkplaceAddressInformationKey. In certain implementations, these elements can include: ServicePerformerUUID, BusinessPartnerRelationshipRoleCode, and AddressUUID.

ServicePerformerUUID is a universal identifier, which can be unique, of the business partner. The ServicePerformerUUID may be based on GDT UUID. BusinessPartnerRelationshipRoleCode may determine the roles that the business partners have in the relationship. The BusinessPartnerRelationshipRoleCode may be based on GDT BusinessPartnerRelationshipRoleCode. AddressUUID specifies the universal identification, which can be unique, of the organization address that belongs to this workplace address. The AddressUUID may be based on GDT UUID.

There may be a number of composition relationships with subordinate nodes including: RelationshipServicePerformerWorkplaceAddress 116092 may have a cardinality relationship of 1:1. (Composition relationship with dependent object WorkplaceAddress.)

There may be a number of Inbound Association Relationships including: 1) From business object BusinessPartner/node AddressInformation as follows. OrganisationAddressInformation may have a cardinality relationship of 1:cn and is an address of the organization to which the workplace address is assigned.

For example the company Global Cooperation has an address in New York and one in Berlin. Peter Smith is the service performer in Global Cooperation and his workplace is in the New York office. The workplace address can be clearly specified using the UUID of Global Cooperation, the UUID of Peter Smith and the UUID of the New York address. The OrganisationAddressInformation association points from the New York address of the Global Cooperation to the workplace address.

RelationshipServicePerformerWorkplaceAddress

A RelationshipContactPersonWorkplaceAddress may contain the internal address or ID of the service performer's workplace within its organization. The data can be mapped using the dependent object WorkplaceAddress. If a service performer is also the contact person for the same business partner, the workplace addresses for an organization address may be identical.

A RelationshipShareholder may contain attributes that specify the shareholder relationship in more detail.

Among the attributes may be, for example, the principle and the percentage with which one business partner (parent company) can be involved in another (subsidiary company). The elements located at the RelationshipShareholder node can be defined by the data type BusinessPartnerRelationshipShareholderElements. In certain implementations, these elements can include: EquityParticipationPercent, EquityParticipationAmount, and CompanyControlIndicator.

EquityParticipationPercent is the scope of own capital involvement in percent and is optional. The EquityParticipationPercent may be based on GDT Percent and, in some implementations, can have a Qualifier of EquityParticipation, Restriction 3 whole number and 7 decimal places. EquityParticipationAmount is the amount of capital involvement and is optional. The EquityParticipationAmount may be based on GDT Percent and, in some implementations, can have a Qualifier of EquityParticipation, Restriction 11 whole number and 2 decimal places. CompanyControlIndicator is the indicator whether the scope of involvement in a company allows control of the company in question. The CompanyControlIndicator may be based on GDT Indicator and, in some implementations, can have a Qualifier of CompanyControl. Attributes for shareholder relationships can only be used in shareholder relationships.

BankDetails contains the banking details of a business partner. Bank details can be the account and other details about how and when this account may be used. The elements located at the BankDetails node can be defined by the data type BusinessPartnerBankDetailsElements. In certain implementations, these elements can include: ID, BankInternalID, BankDirectoryEntryUUID, BankAccountID, BankAccountIDCheckDigitValue, BankAccountTypeCode, BankAccountHolderName, Name, BankAccountStandardID, SubstituteBusinessPartnerBankDetailsID, SubstituteDate, ValidityPeriod, ProtectedIndicator, and Key.

ID is an internal four-digit number that may identify the bank details. The ID may be based on GDT BusinessPartnerBankDetailsID. BankInternalID is a bank key identifier, which can be unique, of a bank in the bank master record and is optional. The BankInternalID may be based on GDT BankInternalID. BankDirectoryEntryUUID is a universal identifier, which can be unique, of the bank with which the account is held. (All banks are listed in the bank register). The BankDirectoryEntryUUID may be based on GDT UUID. BankAccountID is the account number from the bank details and is optional. The BankAccountID may be based on GDT BankAccountID. BankAccountIDCheckDigitValue is the check digit for the bank account number and is optional. The BankAccountIDCheckDigitValue may be based on GDT BankAccountIDCheckDigitValue. BankAccountTypeCode specifies the type of bank account and is optional. (A bank account can be a checking account, a loan account, or a savings account). The BankAccountTypeCode may be based on GDT BankAccountTypeCode. BankAccountHolderName is the name of the account holder and is optional. The BankAccountHolderName may be based on GDT BankAccountHolderName, Restriction: Limited to 60 characters. Name is the name of bank details and is optional. (Name may not be confused with the name of the account holder and with the name of the bank master record). The Name may be based on GDT LANGUAGEINDEPENDENT_MEDIUM_Name and, in some implementations, can have a Qualifier of BankDetails. BankAccountStandardID is the IBAN (International Bank Account Number) of the bank details and is optional. The BankAccountStandardID may be based on GDT BankAccountStandardID. SubstituteBusinessPartnerBankDetailsID is the internal four-digit number of new bank details after changing an account and is optional. The SubstituteBusinessPartnerBankDetailsID may be based on GDT BusinessPartnerBankDetailsID and, in some implementations, can have a Qualifier of Substitute. SubstituteDate is the date as of which the bank details can be replaced by another and is optional. The SubstituteDate may be based on GDT Date and, in some implementations, can have a Qualifier of Substitute. ValidityPeriod is the time frame during which the bank details can be valid and is optional. The ValidityPeriod may be based on GDT CLOSED_DatePeriod and, in some implementations, can have a Qualifier of Validity. ProtectedIndicator are the bank details that may be protected. In some implementations, the personal data of the employee must be protected for legal reasons. This protected data is only visible in the Employee business object. This means that apart from the employee, only people with special authorization can view this data. It is only when the employee expressly gives consent that this data may be used in other processes (and therefore in other business objects). The ProtectedIndicator may be based on GDT Indicator and, in some implementations, can have a Qualifier of Protected. Key is an alternative key for the bank details. Key may be based on IDT BusinessPartnerBankDetailsKey. In certain implementations, the elements include: BusinessPartnerUUID, and ID. BusinessPartnerUUID is a universal identification, which can be unique, of the business partner. The BusinessPartnerUUID may be based on GDT UUID. ID is the internal four-digit number that identifies the bank details. The ID may be based on GDT BusinessPartnerBankDetailsID.

There may be a number of Inbound aggregation relationships including: 1) From the business object BankDirectoryEntry/node Root as follows. BankDirectoryEntry may have a cardinality relationship of 1:cn and is a bank where the account of the bank details is held.

In some implementations, the element ProtectedIndicator is only visible and can only be maintained in the business object Employee. In some implementations, when the element ProtectedIndicator is set, the bank details can only be maintained in the business object Employee. The bank details are empty and cannot be maintained in all other derived business objects.

A QueryByBusinessPartnerUUID query returns all bank details of one business partner.

The data type BusinessPartnerBusinessPartnerUUIDQueryElements defines the query elements: BusinessPartnerUUID. BusinessPartnerUUID is of GDT type UUID.

PaymentCardDetails contain the relationship of a business partner with a payment or credit card. Such a relationship may include a payment card and other details that can describe the significance of the payment card for the business partner. The elements located at the PaymentCardDetails node can be defined by the data type BusinessPartnerPaymentCardDetailsElements. In certain implementations, these elements can include: ID, PaymentCardTypeCode, PaymentCardID, DefaultIndicator, Note, and Key.

ID is an internal 6-digit number identifying the payment card details. The ID may be based on GDT BusinessPartnerPaymentCardDetailsID. PaymentCardTypeCode is a type of payment card. The PaymentCardTypeCode may be based on GDT PaymentCardTypeCode. PaymentCardID is the identifier of payment card. The PaymentCardID may be based on GDT PaymentCardID. DefaultIndicator indicates the standard payment card. The DefaultIndicator may be based on GDT Indicator and, in some implementations, can have a Qualifier of Default. Note is a note on payment card details and is optional. The Note may be based on GDT Note, Restriction Shortened to 40 characters. Key is an alternative key for the payment card details. The Kay may be based on IDT BusinessPartnerPaymentCardDetailsKey. In certain implementations, the elements include: BusinessPartnerUUID, and ID. BusinessPartnerUUID is a universal identification, which can be unique, of the business partner. The BusinessPartnerUUID may be based on GDT UUID. ID is an internal four-digit number that may identify the payment card details. The ID May be based on GDT BusinessPartnerPaymentCardDetailsID.

There may be a number of Inbound Association Relationships including: 1) From the business object PaymentCard/node Root as follows. PaymentCard may have a cardinality relationship of 1:cn and is a payment or credit card of a business partner.

An IndustrySector contains the industry sector in which a business partner may work. An industry sector is the classification of a company according to the main focus of its business activities. The elements located at the IndustrySector node can be defined by the data type BusinessPartnerIndustrySectorElements. In certain implementations, these elements can include: IndustrialSectorCode, IndustryClassificationSystemCode, and DefaultIndicator.

IndustrialSectorCode is an industry sector to which a business partner is assigned. The IndustrialSectorCode may be based on GDT IndustrialSectorCode. IndustryClassificationSystemCode is an industrial sector system to which the industry sector of the field IndustrialSectorCode is assigned. Industry sectors may be organized in industry sector systems. This can make assigning a business partner to an industry sector easier. The IndustryClassificationSystemCode may be based on GDT IndustryClassificationSystemCode. DefaultIndicator indicates the standard industry sector within an industry sector system. The DefaultIndicator may be based on GDT Indicator and, in some implementations, can have a Qualifier of Default.

An identification may contain an alternative identifier for a business partner. Identifiers can be, for example, issued by an institution for administrative purposes (such as passport numbers) or by a business information company (such as Dun & Bradstreet). The elements located at the Identification node can be defined by the data type BusinessPartner IdentificationElements. In certain implementations, these elements can include: PartyIdentifierTypeCode, BusinessPartnerID, IdentifierIssuingAgencyName, EntryDate, AreaOfValidityCountryCode, AreaOfValidityRegionCode, ValidityPeriod, and EmployeeID.

PartyIdentifierTypeCode is a type of identification number. The PartyIdentifierTypeCode may be based on GDT PartyIdentifierTypeCode. BusinessPartnerID is an identification number. The BusinessPartnerID may be based on GDT BusinessPartnerID. IdentifierIssuingAgencyName is a name of the agency (for example, government agency, registry office), company (for example, Dun & Bradstreet), or an organization (for example, UN), that issued the identification number and is optional. The IdentifierIssuingAgencyName may be based on GDT LANGUAGEINDEPENDENT_MEDIUM_Name and, in some implementations, can have a Qualifier of IdentifierIssuingAgency. EntryDate is a date on which the identification number was entered and is optional. The EntryDate may be based on GDT Date and, in some implementations, can have a Qualifier of Entry. AreaOfValidityCountryCode is a country where the identification number is valid and is optional. The AreaOfValidityCountryCode may be based on GDT CountryCode. AreaOfValidityRegionCode is a region (for example, state, province, county) where the identification number is valid and is optional. The AreaOfValidityRegionCode may be based on GDT RegionCode. ValidityPeriod is a period in which an identifier (for example, identification number) is valid and is optional. The ValidityPeriod may be based on GDT CLOSED_DatePeriod and, in some implementations, can have a Qualifier of Validity. EmployeeID is an ID number of an employee and is optional and an alternative key. Do not use the Employee ID to reference an employee. The business partnerUUID may be used instead. The EmployeeID may be based on GDT EmployeeID. In some implementations, the element EmployeeID cannot be changed (read-only).

A QueryByEmployeeAttributes query returns a list of identification numbers of the type Employee Number that fulfill the selection criteria. The name and position can be entered as the most important selection parameters. The data type BusinessPartnerEmployeeAttributesQueryElements defines the query elements: BusinessPartnerUUID, EmployeeID, BusinessPartnerCommonPersonNameFamilyName, EmployeeTypeInternalEmployeeIndicator, PositionDescriptionDescription, ReportingLineUnitName, HoldsManagingPositionIndicator, CompanyID, ManagerEmployeeID, BusinessPartnerLifeCycleStatusCode, ValidityDate. BusinessPartnerUUID is of GDT type UUID. With regard to EmployeeID, in some implementations, only those employees whose ID numbers match the ones specified here are selected. It is of GDT type EmployeeID. With regard to BusinessPartnerCommonPersonNameGivenName, in some implementations, only those employee ID numbers where the first name of the employee matches the name specified here are selected. It is of GDT type LANGUAGEINDEPENDENT_MEDIUM_Name and, in some implementations, can have a Qualifier of Family. With regard to BusinessPartnerCommonPersonNameFamilyName, in some implementations, only those employee ID numbers where the last name of the employee matches the name specified here are selected. It is of GDT type LANGUAGEINDEPENDENT_MEDIUM_Name and, in some implementations, can have a Qualifier of Family. EmployeeTypeInternalEmployeeIndicator is of GDT type Indicator and, in some implementations, can have a Qualifier of Employee. With regard to PositionDescriptionDescription, in some implementations, only those employee ID numbers where the job title of the employee matches the title specified here are selected. It is of GDT type Description. With regard to ReportingLineUnitName, in some implementations, only those employee ID numbers where the name of the reporting line unit for the employee matches the name of the reporting line unit specified here are selected. It is of GDT type MEDIUM_Name. With regard to HoldsManagingPositionIndicator, in some implementations, only those employee ID numbers of employees assigned to a position that also have a management link to an organizational center are selected. It is of GDT type Indicator and, in some implementations, can have a Qualifier of ManagingPositionIndicator. With regard to CompanyID, in some implementations, only those employees whose ID numbers that have a position assigned to a company whose ID number matches the CompanyID specified here, are selected. It is of GDT type OrganisationalCentreID. With regard to ManagerEmployeeID, in some implementations, only those employee ID numbers are selected, where the employee has a manager, whose ID number matches the ManagerID specified here. The manager of an employee is one who has the position ManagingPosition of a ReportingLineUnit which is assigned to the position Employee using the association ReportingLineUnitWithStaffedManagingPositionAssignment. It is of GDT type EmployeeID. With regard to BusinessPartnerLifeCycleStatusCode, in some implementations, only those employee ID numbers where the BusinessPartnerLifeCycleStatusCode matches the BusinessPartnerLifeCycleStatusCode specified here are selected. It is of GDT type BusinessPartnerLifeCycleStatusCode. With regard to ValidityDate, in some implementations, only the data that is valid on the date specified here is selected. It is of GDT type Date and, in some implementations, can have a Qualifier of Validity. TaxNumber A TaxNumber may contain the identification issued by the tax authorities for those business partners liable for tax. These identifiers may differ from country to country. In Germany the identifier is represented by the tax number. The elements located at the TaxNumber node can be defined by the data type BusinessPartner TaxNumberElements. In certain implementations, these elements can include: CountryCode, TaxIdentificationNumberTypeCode and PartyTaxID, CountryCode is a country to which the tax number type is assigned. The CountryCode may be based on GDT CountryCode. TaxIdentificationNumberTypeCode is a type of tax number assigned to the business partner. The TaxIdentificationNumberTypeCode may be based on GDT TaxIdentificationNumberTypeCode. PartyTaxID is a tax number to which a business partner is assigned. The PartyTaxID may be based on GDT PartyTaxID.

GeneralProductTaxExemption is a general exemption for a business partner from product tax. General tax exemptions may arise directly from legal regulations and can not be based on the business partner tax free certificates. In some implementations, time restrictions may not apply to the exemptions. The exemptions can be the basis for a complete or partial exemption from product tax. Product taxes may be taxes that are incurred for product-related business cases, for example, purchasing, sales or consumption (see GDT ProductTax). The elements located at the GeneralProductTaxExemption node can be defined by the data type BusinessPartnerGeneralProductTaxExemptionElements. In certain implementations, these elements can include: CountryCode, RegionCode, TaxTypeCode, and ReasonCode.

CountryCode is a country to which the tax exemption applies. The CountryCode may be based on GDT CountryCode. RegionCode is a region to which the tax exemption applies. The RegionCode may be based on GDT RegionCode. TaxTypeCode specifies the type of tax to which the tax exemption refers. The TaxTypeCode may be based on GDT TaxTypeCode. ReasonCode is a reason for the tax exemption. The ReasonCode may be based on GDT TaxExemptionReasonCode.

OperatingHoursInformation contains the business hours of a business partner. Visiting hours, calling hours or goods receiving hours can be maintained for a business partner. The elements located at the OperatingHoursInformation node can be defined by the data type BusinessPartnerOperatingHoursInformationElements. In certain implementations, this element includes: RoleCode. RoleCode specifies the type of business hours in question. The RoleCode may be based on GDT BUSINESSPARTNER_OperatingHoursRoleCode.

There may be a number of composition relationships with subordinate nodes including: OperatingHours (DO) 116110 may have a cardinality relationship of 1:1.

OperatingHours contain the business hours of business partner. The data is mapped using the dependent object OperatingHours.

A TextCollection contains the notes for a business partner. The data is mapped using the dependent object TextCollection. A TextCollection is a collection of all textual descriptions. Each text can be specified in different languages and can include formatting information.

A Document contains the documents for a business partner. The data is mapped using the dependent object AttachmentFolder.

An EmployeeType may contain the time-dependent information about the type of employee. An employee can be of an internal or external type. The elements located at the EmployeeType node can be defined by the data type BusinessPartnerEmployeeTypeElements. In certain implementations, these elements can include: InternalEmployeeIndicator, and ValidityPeriod. An InternalEmployeeIndicator may specify whether or not an employee is an internal employee. The InternalEmployeeIndicator may be based on GDT Indicator and, in some implementations, can have a Qualifier of InternalEmployee. A ValidityPeriod is the period for which the type of employee is valid. The ValidityPeriod may be based on GDT CLOSED_DatePeriod and, in some implementations, can have a Qualifier of Validity.

A BiddingCharacteristic may contain characteristics to specify special conditions, features or status of the bidder. For example, in the United States, if governmental institutes post a bid invitation they might have to send the invitation to all bidder organizations known to be run by minorities. The elements located at the node BiddingCharacteristic can be defined by the type GDT: BusinessPartnerBiddingCharacteristicElements. In certain implementations, these elements can include: MinorityOwnedIndicator, MinorityOwnedCertificateExpirationDate, WomanOwnedIndicator, WomanOwnedCertificateExpirationDate, and SurrogateBiddingAllowedIndicator. MinorityOwnedIndicator indicates that a bidder organization is owned (or run) by a minority. (This characteristic is certified and has an expiration date). The MinorityOwnedIndicator may be based on GDT Indicator and, in some implementations, can have a Qualifier of MinorityOwned. MinorityOwnedCertificateExpirationDate is the date and time the characteristic "minority owned" may expire and is optional. The MinorityOwnedCertificateExpirationDate may be based on GDT Date and, in some implementations, can have a Qualifier of Expiration. WomanOwnedIndicator indicates that a bidder organization is owned (or run) by a woman. (This characteristic is certified and has an expiration date). The WomanOwnedIndicator may be based on GDT Indicator and, in some implementations, can have a Qualifier of WomanOwned. WomanOwnedCertificateExpirationDate is the date and time the characteristic "woman owned" expires and is optional. The WomanOwnedCertificateExpirationDate may be based on GDT Date and, in some implementations, can have a Qualifier of Expiration. SurrogateBiddingAllowedIndicator indicates that a "bid on behalf of" agreement exists. (This characteristic is an agreement of a bidder organization and buying company which allows members of the buying company to "bid on behalf of"—to act as a surrogate of—the bidder during auctions). The SurrogateBiddingAllowedIndicator may be based on GDT Indicator and, in some implementations, can have a Qualifier of Allowed.

In some implementations, MinorityOwnedCertificateExpirationDate is obligatory, if the MinorityOwnedIndicator is marked. In some implementations, WomanOwnedCertificateExpirationDate is obligatory, if the WomanOwnedIndicator is marked.

A QualityManagement may contain information that describes how a business partner ensures that all the activities necessary to design and develop products/services as well as the internal processes meet certain requirements regarding quality. For example, the buying company might want to send bid invitations only to suppliers that may be certified for a specific quality standard (ISO-9001 say). The elements located at the node QualityManagement can be defined by the type GDT BusinessPartnerQualityManagementElements. In certain elements, these elements can include: SystemStandardCode, and SystemStandardCodeExpirationDate. SystemStandardCode is a coded representation of the quality standards the supplier meets. The SystemStandardCode may be based on GDT QualityManagementSystemStandardCode. SystemStandardCodeExpirationDate is the date and time when the assignment of QualityManagementSystemStandardCode to supplier expires (for example, a new certificate is required). The SystemStandardCodeExpirationDate may be based on GDT Date and, in some implementations, can have a Qualifier of Expiration.

A ProductCategory specifies the product category a business partner may offer goods or services for. This information is needed for automated processes or in online document processing. For example, bid invitations may be sent to all partners who deliver for a certain category or it may be searched for all partners delivering for the respective product category. The elements located at the node ProductCategory can be defined by the type GDT: BusinessPartnerProductCategoryElements. In certain implementations this element includes: ReleasedToProcureProductCategoryID. ReleasedToProcureProductCategoryID is an ID number of a product category which is available at the business partner and may be permitted to be used within procurement processes. The ReleasedToProcureProductCategoryID may be based on GDT ProductCategoryID.

In some implementations, currently only "released" product categories may be stored with the business partner but one could think of an attribute AvailableProductCategoryID to have all categories available and the "released" ones as the subset the buying company is really interested in.

There may be a number of Inbound Association Relationships including: 1) From BusinessObject ProductCategoryHierarchy/node ProductCategory as follows. ProductCategoryHierarchyProductCategory may have a cardinality relationship of 1:cn and is a product category which is available at the business partner and permitted to be used within procurement processes.

A Procurement contains general, time independent, information of the supplier. For example, the local currency of a partner, the tolerance group assigned to a partner, the way a partner can access the buying companies system, the information if a partner has the general ability to communicate via XI or the information if a partner exists within a MarketSet environment. The elements located at the node Procurement can be defined by the type GDT: BusinessPartnerProcurementElements. In certain implementations, these elements can include: ExchangeInfrastructureEnabledIndicator, MarketPlaceActiveIndicator, SupplierSelfServiceActiveIndicator, LocalCurrencyCode, MinimumOrderValue, and SystemAccessWebAddress.

ExchangeInfrastructureEnabledIndicator is an indicator used to determine the general ability of the supplier to communicate via ExchangeInfrastructure (XI). The ExchangeInfrastructureEnabledIndicator may be based on GDT Indicator and, in some implementations, can have a Qualifier of Enabled. MarketPlaceActiveIndicator is an indicator used to state that the supplier is a member of the MarketSet environment. (Implicitly, this indicator may identify the MarketSet-hub as the destination of all procurement documents). The MarketPlaceActiveIndicator may be based on GDT Indicator and, in some implementations, can have a Qualifier of Active. SupplierSelfServiceActiveIndicator is an indicator used to state that a supplier may use the SupplierSelfService component for order and invoice processing. (Implicitly, this indicator may identify the SUS component to be the destination of all procurement documents and can force data synchronization of the supplier master records between the two systems). The SupplierSelfServiceActiveIndicator may be based on GDT Indicator and, in some implementations, can have a Qualifier of Active. LocalCurrencyCode is a coded representation of the supplier's local currency, in which prices may be converted if no specific agreements (for example, like PurchasingDataDetails) apply during procurement document processing and is optional. The LocalCurrencyCode may be based on GDT CurrencyCode. MinimumOrderValue is a minimum value of orders for the supplier in question and is optional. Orders with a lesser amount cannot be posted. The MinimumOrderValue may be given in the LocalCurrencyCode of the supplier. The MinimumOrderValue may be based on GDT Amount. SystemAccessWebAddress is the suppliers path (for example, technically spoken the http(s)-address) to access the system of the buying company and is optional. The supplier may access the system to maintain own data, to check detail information regarding a bid-invitation, to create goods-receipt documents, or to post invoices. The SystemAccessWebAddress may be based on GDT WebAddress.

In some implementations, the SystemAccessWebAddress is restricted to a length of 255 characters. Furthermore, the URL stored with the WebAddress has to provide a means to access the system (a logon service for example).

In some implementations, the LocalCurrencyCode is obligatory for suppliers with role bidder, vendor, and invoicing party; the portal provider must not necessarily keep that information. (Public portals might be free of charge, so the local currency can be omitted due to the fact that there never will be a payment process). SystemAccessWebAddress in general is optional, but certain processes can require the existence. For example, a bid-invitation is completely useless unless the bidder has an access path to log on to the buying companies system.

Marketing contains the data to indicate how the business partner is used in marketing processes. The elements located at the node Marketing can be defined by the type GDT: BusinessPartnerMarketingElements. In certain implementations, these elements can include: NielsenRegionCode, and AddressRentedIndicator. NielsenRegionCode specifies the region based on the geographical subdivisions of a country according to the definitions of A.C. Nielsen and is optional. The NielsenRegionCode may be based on GDT NielsenRegionCode. AddressRentedIndicator specifies whether the address data of a business partner is rented or not and is optional. The AddressRentedIndicator may be based on GDT Indicator and, in some implementations, can have a Qualifier of AddressRented. In some implementations, if the address data of a business partner is rented then the business partner can only be used in marketing processes. A rented address is a business partner master record supplied by a data provider. The AddressRentedIndicator may indicate that a business partner is used as a Rented Address in the system.

PaymentOrderWorkingDayCalendar is the calendar that specifies which days that the institute (for example, such as a house bank) processes payment orders. The elements located at the PaymentOrderWorkingDayCalendar node can be defined by the type GDT BusinessPartnerPaymentOrderWorkingDayCalendarElements. In certain implementations, this element includes: WorkingDayCalendarCode. WorkingDayCalendarCode is the coded representation of the working day calendar that may specify on which days the business partner carries out payment transactions and is optional. The WorkingDayCalendarCode may be based on GDT WorkingDayCalendarCode.

BankDirectoryEntryAssignment is the assignment to the bank master so that the data of a bank can be accessed from the bank master. The elements located at the BankDirectoryEntryAssignment node can be defined by the type GDT BusinessPartnerBankDirectoryEntryAssignmentElements. In certain implementations, these elements can include: BankDirectoryEntryUUID, and BankDirectoryEntryBranchUUID. BankDirectoryEntryUUID is a universal identification, which can be unique, that references a bank from the bank master. The BankDirectoryEntryUUID may be based on GDT UUID. BankDirectoryEntryBranchUUID is a universal identification, which can be unique, that references a bank branch from the bank master and is optional. The BankDirectoryEntryBranchUUID may be based on GDT UUID.

There may be a number of Inbound Association Relationships including: 1) From business object BankDirectoryEntry/node BankDirectoryEntry (root node) as follows. BankDirectoryEntry may have a cardinality relationship of 1:cn and references the data of a bank center from the bank master.

2) From the business object BankDirectoryEntry/node Branch as follows. BankDirectoryEntryBranch may have a cardinality relationship of c:cn and references the data of a bank branch from the bank master.

In some implementations, a house bank requires an BankDirectoryEntryAssignment.

AllowedPaymentMediumFormat is the payment medium format that an institute (for example, such as a house bank) can process. The elements located at the AllowedPaymentMediumFormat node can be defined by the type GDT BusinessPartnerAllowedPaymentMediumFormatElements. In certain implementations, this element includes: PaymentMediumFormatCode. PaymentMediumFormatCode is the payment medium format that the institute (for example, such as a house bank) can support. The PaymentMediumFormatCode may be based on GDT PaymentMediumFormatCode.

A UniformAddressInformation contains a business partner address within a uniform format. Within the business partner we have different address types that may be all located at separate nodes. Within this node we can display all these addresses within a uniform format. That means that corresponding address data for all addresses types is displayed at the same node and element. For example, the telephone number of all address types is displayed at UniformAddressTelephone and the city name of all addresses can be found at UniformAddressPostalAddressCityName. The elements located at the UniformAddress node can be defined by the data type BusinessPartnerUniformAddressInformationElements. In certain implementations, these elements can include: HostTypeCode, AddressUUID, BusinessPartnerUUID, RelationshipBusinessPartnerUUID, ValidityPeriod, and Key.

A HostTypeCode is the type code of the address. The HostTypeCode may be based on GDT BusinessPartnerAddressHostTypeCode; Restriction: Only the following Codes may be allowed: Code 1 (i.e., Master Data Main Address), Code 2 (i.e., Business Partner Communication Data), Code 3 (i.e., Relationship Contact Person Workplace Address), Code 4 (i.e., Employee Workplace Address), and Code 5 (i.e., Relationship Service Performer Workplace Address)). AddressUUID is a universal identification, which can be unique, of the address and is optional. If the address is a partner address, we display the UUID of Node AddressInformation. If the address is an employee workplace address, we display the UUID of the node EmployeeWorkplaceAddressInformation. If the address is a contact person or service performer relationship workplace address, we display the UUID of the node RelationshipContactPersonWorkplaceAddressInformation or RelationshipServicePerformerWorkplaceAddressInformation respectively. This element is empty if we display the address independent communication data. The AddressUUID may be based on GDT UUID. BusinessPartnerUUID is a universal identification, which can be unique, of the business partner and is optional. If we show the address independent communication data or the workplace address of a contact person or service performer, then this element may be filled with the UUID of the business partner. For all other address types this element may be empty. The BusinessPartnerUUID may be based on GDT UUID. RelationshipBusinessPartnerUUID is a universal identification, which can be unique, of the business partner with whom a relationship exists and is optional. If we show the workplace address of a contact person or service performer, then this element may be filled with the UUID of the relationship business partner. For all other address types this element may be empty. The RelationshipBusinessPartnerUUID may be based on GDT UUID. ValidityPeriod is a period in which the address is valid and is optional. The ValidityPeriod may be based on GDT CLOSED_DatePeriod and, in some implementations, can have a Qualifier of Validity. Key is an alternative key of the address. Key may be based on IDT BusinessPartnerUniformAddressInformationKey. In certain implementations, these elements can include: HostTypeCode, AddressUUID, and BusinessPartnerUUID. The HostTypeCode may be based on GDT AddressHostTypeCode. The AddressUUID may be based on GDT UUID. The BusinessPartnerUUID may be based on GDT UUID.

There may be a number of Inbound Aggregation Relationship including: 1) Inner Business Object Association/EmployeeWorkplaceAddressInformation Node. EmployeeWorkplaceAddressInformation may have a cardinality relationship of c:1 and is an association to an employee workplace address.

2) Inner Business Object Association/RelationshipContactPersonWorkplaceAddressInformation Node. RelationshipContactPersonWorkplaceAddressInformation may have a cardinality relationship of c:1 and is an association to a workplace address of a contact person relationship.

3) Inner Business Object Association/RelationshipServicePerformerWorkplaceAddressInformation Node. RelationshipServicePerformerWorkplaceAddressInformation may have a cardinality relationship of c:1 and is an association to a workplace address of a service performer relationship.

4) Inner Business Object Association/AddressInformation Node. AddressInformation may have a cardinality relationship of c:1 and is an association to a business partner address.

In some implementations, the elements of this node cannot be changed (read-only). The relationship workplace address will only be displayed at the person and not at the organisation. The association EmployeeWorkplaceAddressInformation is active if the HostTypeCode equals “4”. The association RelationshipContactPersonWorkplaceAddressInformation is active if the HostTypeCode equals “3”.

The association RelationshipServicePerformerWorkplaceAddressInformation is active if the HostTypeCode equals “6”. The association AddressInformation is active if the HostTypeCode equals “1”.

There may be a number of composition relationships with subordinate nodes including: UniformAddressUsage may have a cardinality relationship of 1:cn. UniformAddress may have a cardinality relationship of 1:1.

UniformAddressUsage may contain the business, time-dependent usage of an address. An address can be used as a correspondence, delivery or bill-to party address, for example. The elements located at the UniformAddressUsage node can be defined by the data type BusinessPartnerUniformAddressUsageElements. In certain implementations, these elements can include: AddressUsageCode, ValidityPeriod, and DefaultIndicator AddressUsageCode specifies the usage type of an address. An address can, for example, be used as a delivery or holiday address. The AddressUsageCode may be based on GDT AddressUsageCode.

ValidityPeriod is the period during which an address may have a certain usage. The ValidityPeriod may be based on GDT CLOSED_DatePeriod and, in some implementations, can have a Qualifier of Validity. DefaultIndicator indicates the standard address within an address usage type. In some implementations, if several addresses are assigned to an address usage at one specific time, one address must be indicated as the default address. The DefaultIndicator may be based on GDT Indicator and, in some implementations, can have a Qualifier of Default. In some implementations, the elements of this node cannot be changed (read-only).

UniformAddress may contain the data of the business partner address within a uniform format. The data is modeled using the dependent object Address. In some implementations, the elements of this node cannot be changed (read-only).

The AccessControlList is a list of access groups that may have access to a Business Partner during a validity period. The data is modeled using the dependent object AccessControlList.

The ABCClassifications contain the ABC classifications of a business partner. The elements located at the ABCClassifications node can be defined by the data type BusinessPartnerABCClassificationsElements. In certain implementations, these elements can include: CustomerABCClassificationCode, SupplierABCClassificationCode, SalesAndServicePartnerABCClassificationCode, and CompetitorABCClassificationCode. CustomerABC-ClassificationCode is the ABC classification of a customer and is optional. The CustomerABCClassificationCode may be based on GDT CustomerABCClassificationCode. SupplierABCClassificationCode is the ABC classification of a supplier and is optional. The SupplierABCClassificationCode may be based on GDT CustomerABCClassificationCode. SalesAndServicePartnerABCClassificationCode is the ABC classification of a sales and service partner and is optional. The SalesAndServicePartnerABCClassiificationCode may be based on GDT SalesAndServicePartnerABC-ClassificationCode. CompetitorABCClassificationCode is the ABC classification of a customer and is optional. The CompetitorABCClassificationCode may be based on GDT CompetitorABCClassificationCode.

In some implementations, the elements will only be visible and maintainable within specific business objects:

| Element | Maintainable and visible within the following BO's |
|---|---|
| CustomerABCClassificationCode | Customer |
| SupplierABCClassificationCode | Supplier |
| SalesAndServicePartnerABCClassificationCode | Business Partner |
| CompetitorABCClassificationCode | Business Partner |

The following derivations of the business object template Business Partner can be implemented as business objects: Business Partner, Customer, Supplier, Employee, HouseBank, ClearingHouse, and TaxAuthority.

The following table shows which nodes are available for these derivations.

| | Business Objects | | | | | | |
|---|---|---|---|---|---|---|---|
| Node | Customer | Supplier | Employee | Business Partner | House Bank | Clearing House | Tax Authority |
| Business Partner (Root Node) | X | X | X | X | X | X | X |
| Common | X | X | X | X | X | X | X |
| CommonFormattedDefaultAddress | X | X | X | X | X | X | X |
| RegulatoryCompliance | X | X | X | X | X | X | X |
| Role | X | X | | X | | | |
| CurrentBusinessCharacters | X | X | | X | | | |
| EmployeeWorkplaceAddressInformation | | | X | X (read only) | | | |
| AddressInformation | X | X | X | X | X | X | X |
| AddressUsage | X | X | X | X | X | X | X |
| AddressCurrentAddressDeterminationProcesses | X | X | X | X | X | X | X |
| CommunicationData | X | | | X | X | X | X |
| Relationship | X | X | X | X | X | X | X |
| RelationshipTimeDependentInformation | X | X | X | X | X | X | X |
| RelationshipContactPerson | X | X | X | X | X | X | X |
| RelationshipContactPersonOperatingHoursInformation | X | X | X | X | X | X | X |
| RelationshipContactPersonWorkplaceAddressInformation | X | X | X | X | X | X | X |
| RelationshipServicePerformer | X | X | X | X | X | X | X |
| RelationshipContactPersonOperatingHoursInformation | X | X | X | X | X | X | |
| RelationshipServicePerformerWorkplaceAddressInformation | X | X | X | X | X | X | |
| RelationshipShareholder | X | | | | | | |
| BankDetails | X | X | X | X | | X | X |
| PaymentCardDetails | X | | | X | | | |
| IndustrySector | X | X | | | | | |
| Identification | X | X | X | X | | | X |
| TaxNumber | X | X | X | X | | | |
| GeneralProductTaxExemption | X | X | | | | | |
| OperatingHoursInformation (Visiting, calling and delivery hours of a business partner) | X | | | | X | X | X |
| TextCollection | X | X | X | X | X | X | X |
| AttachmentFolder | X | X | X | X | X | X | X |
| EmployeeType | | | X | | | | |
| BiddingCharacteristic | | X | | | | | |
| QualityManagement | | X | | | | | |
| ProductCategory | | X | | | | | |
| Procurement | | X | | | | | |
| ProcurementTolerance | | X | | | | | |
| Marketing | X | | | | | | |
| PaymentOrderWorkingDayCalendar | | | | | X | X | |
| BankDirectoryEntryAssignment | | | | | X | | |
| AllowedPaymentMediumFormat | | | | | X | | |
| UniformAddressInformation and the following | X | X | X | X | X | X | X |
| AccessControlList | X | X | X | X | X | X | X |
| ABCClassifications (check also the visibility and maintainability of the elements within the chapter ABCClassifications) | X | X | | X | | | |

The following table shows which queries are available for the derivations.

| Query | Business Objects | | | | | | |
|---|---|---|---|---|---|---|---|
| | Customer | Supplier | Employee | Business Partner | House Bank | Clearing House | Tax Authority |
| QueryByNamesAndKeyWords | X | X | X | X | X | X | X |
| QueryByCommunicationData | X | X | X | X | X | X | X |
| QueryByRole | X | X | | X | X | X | X |
| QueryByIdentification | X | X | X | X | | | X |
| QueryByBankDetails | X | X | X | X | | X | |
| QueryByAddress | X | X | X | X | X | X | X |
| QueryByAddressRepresentaion | X | X | X | X | | | |
| QueryByEmployeeWorkplaceAddress | | | X | | | | |
| QueryByIdentificationAndAddress | | | | X | | | |
| QueryByRelationship | X | X | | X | X | X | X |
| QueryByContactPerson | X | X | | X | X | X | X |
| QueryByBusinessObjectCustomer | X | | | | | | |
| QueryByBusinessObjectSupplier | | X | | | | | |
| QuerybyRoleContactPersonOrRelationshipIsContactPersonForCustomer | | | | X | | | |
| QuerybyRoleContactPersonOrRelationshipIsContactPersonForSupplier | | | | X | | | |
| QuerybyRoleServicePerformerOrRelationshipIsServicePerformer | | | | X | | | |
| QueryByRoleContactPersonOrServicePerformer | | X | | | | | |
| QueryInvoicingPartyByRelationship | | X | | | | | |
| QueryByEmployeeAttributes | | | X | | | | |

The following table shows which associations are available for the derivations.

| Node/Association | Business Objects | | | | | | |
|---|---|---|---|---|---|---|---|
| | Customer | Supplier | Employee | Business Partner | House Bank | Clearing House | Tax Authority |
| Root/AddressInformationByPartyAddressDetermination (filtered association) | X | X | X | X | X | X | X |
| Root/EmployeeWorkplaceAddressInformationByPartyAddressDetermination | | | X | | | | |
| Root/RoleByBusinessCharacter (filtered association) | X | X | | X | | | |
| Root/IdentificationByPartyIdentifierCategory (filtered association) | X | X | X | X | | | X |
| Root/CorrespondingOrganisationalCentre | X | X | | X | | | |
| Root/CurrentCommon | X | X | X | X | X | X | X |
| Root/CurrentCommonFormattedDefaultAddress | X | X | X | X | X | X | X |
| Root/CurrentDefaultAddressInformation | X | X | X | X | X | X | X |
| Root/CurrentDefaultEmployeeWorkplaceAddressInformation | | | X | | | | |
| Root/HasContactPerson | X | X | | X | X | X | X |
| Root/IsContactPersonFor | X | X | | X | X | X | X |
| Root/CurrentHasContactPerson | X | X | | X | X | X | X |
| Root/CurrentIsContactPersonFor | X | X | | X | X | X | X |
| Root/CurrentDefaultHasContactPerson | X | X | | X | X | X | X |
| Root/CurrentDefaultIsContactPersonFor | X | X | | X | X | X | X |
| Root/HasServicePerformer | X | X | | X | X | X | |
| Root/IsServicePerformerFor | X | X | | X | X | X | |
| Root/CurrentHasServicePerformer | X | X | | X | X | X | |
| Root/CurrentIsServicePerformerFor | X | X | | X | X | X | |
| Root/CurrentDefaultHasServicePerformer | X | X | | X | X | X | |
| Root/CurrentDefaultIsServicePerformerFor | X | X | | X | X | X | |
| Root/OperatingHoursInformationByOperatingHoursRole (filtered association) | X | | | | X | X | X |
| Root/DefaultIndustrySector | X | X | | | | | X |
| Root/IdentificationDunAndBradstreetNumber | X | X | | | | | X |
| Root/IdentificationSocialInsurance | | | X | X | | | |
| Relationship/CurrentTimeDependentInformation | X | X | | X | X | X | X |
| RelationshipContactPerson/DefaultWorkplaceAddressInformation | X | X | | X | X | X | X |
| RelationshipContactPerson/OperatingHoursInformationByOperatingHoursRole (filtered association) | X | X | | X | X | X | X |
| RelationshipServicePerformer/DefaultWorkplaceAddressInformation | X | X | | X | X | X | X |
| RelationshipServicePerformer/OperatingHoursInformationBy-OperatingHoursRole (filtered association) | X | X | | X | X | X | X |

The following table shows which ESI actions are available for the derivations.

| Node/ESI Actions | Business Objects: Customer | Supplier | Employee | Business Partner | House Bank | Clearing House | Tax Authority |
|---|---|---|---|---|---|---|---|
| Root/CreateCorrespondingOrganisationalCentre | X | X | | X | | | |
| Root/CreateWithCorrespondingOrganisationalCentreReference | | | | X | | | |
| Root/CreateCustomerFromExistingBusinessPartner | X | | | | | | |
| Root/CreateSupplierFromExistingBusinessPartner | | X | | | | | |
| Root/CreateEmployeeFromExistingBusinessPartner | | | X | | | | |
| Root/CreateHouseBankFromExistingBusinessPartner | | | | | X | | |
| Root/CreateClearingHouseFromExistingBusinessPartner | | | | | | X | |
| Root/CreateTaxAuthorityFromExistingBusinessPartner | | | | | | | X |

A Business Object Business Partner 116034 is a person, an organization, or a group of persons or organizations in which a company has a business interest. The business object Business Partner may belong to the process component Business Partner Data Processing.

A Business Object Customer 116038 is a business partner to whom materials or services are offered or provided. Customers can be external or internal. The business object Customer can belong to the process component Business Partner Data Processing.

A Business Object Supplier 116042 is a Business Partner who offers or provides materials or services. The Business Object Supplier can belong to the process component Business Partner Data Processing.

A Business Object HouseBank 116044 is an organization that provides banking services (for example, account management) for its own company. In addition to information from the bank master data (for example, bank country and bank number), the house bank may have specific information that is required for automatic payment transactions, for example, such as allowed payment formats, business hours (hours of electronic data traffic) and contact persons. The HouseBank business object can belong to the Business Partner Data Processing process component.

A Business Object ClearingHouse 116056 (for example, a clearing house for card payments) is an organization that provides services for payment card payments. The main services can be the authorization of payments and the initiation of clearing. The ClearingHouse business object can belong to the Business Partner Data Processing process component.

A Business Object TaxAuthority 116058 (in German "Steuerbehorde") is an authority that collects and administers taxes. A company declares and pays taxes to a tax authority. The TaxAuthority business object may belongs to the Business Partner Data Processing process component. In some countries tax authorities may be identified by centrally-assigned IDs. These IDs should be specified in Identification. In Germany, for example, each tax office has a unique tax office number.

A Business Object Employee 116054 is a person who contributes or has contributed to the creation of goods or services for a company. This person can be an internal or an external employee. Unlike external employees, internal employees may be bound by the instructions and can be subject to the control of the labor organization. The Business Object Employee may belong to the process component Business Partner Data Processing.

The Identification node is used for the Employee business object for mapping the employee ID and the social security number.

In some implementations, not all elements (E) and structures (S) in the node specified in the integration matrix are used for the Employee business object. The tables below describe which elements and structures are deactivated for each node used where the Root Node is BusinessPartner

| Name | Type |
|---|---|
| InternalID | |
| CategoryCode | |
| NumberRangeIntervalDefiningBusinessPartnerGroupCode | |

Common

| Structure/Element Name | Type |
|---|---|
| KeyWordsText | |
| AdditionalKeyWordsText | |
| VerbalCommunicationLanguageCode | |
| DataOriginTypeCode | |
| UsageControl | |
| ReleasedIndicator | |
| CorrespondenceBrailleRequiredIndicator | |
| CorrespondenceUpperCaseRequiredIndicator | |
| NaturalPersonIndicator | |
| DeathDate | |
| OccupationCode | |
| OriginCountryCode | |
| Organization | |
| Group | |

Identification

| Name | Type |
|---|---|
| IdentifierIssuingAgencyName | |
| EntryDate | |
| AreaOfValidityRegionCode | |

Business Object BusinessPartnerTemplate Extension_FR

A BusinessPartnerTemplate_Extension_FR is a person, an organization, or a group of persons or organizations in which a company has a business interest. The business partner extension for France captures country specific information regarding France.

In some implementations, the only node that is enhanced with information specific to France (FR) is the node RegulatoryCompliance. All other nodes of the BusinessPartner remain the same. For all GDTs with CountryCode in their context structure, the following restriction applies: Only value FR is allowed.

RegulatoryCompliance is the representation of country-specific requirements which govern employers' compliance with legislation regulating employment. The extension for France comprises characteristics of France Social Insurance Organizations that are stored for the purposes of calculation of employee social insurance contributions. The extension elements may be defined by the data type BusinessPartnerRegulatoryComplianceFR_ExtensionElements. These elements can include: SocialInsuranceTypeCode. SocialInsuranceTypeCode is a coded representation of the type of a social insurance for France. SocialInsuranceTypeCode may be based on GDT SocialInsuranceTypeCode.

Dependent Object CashDiscountTerms

Figure 117:
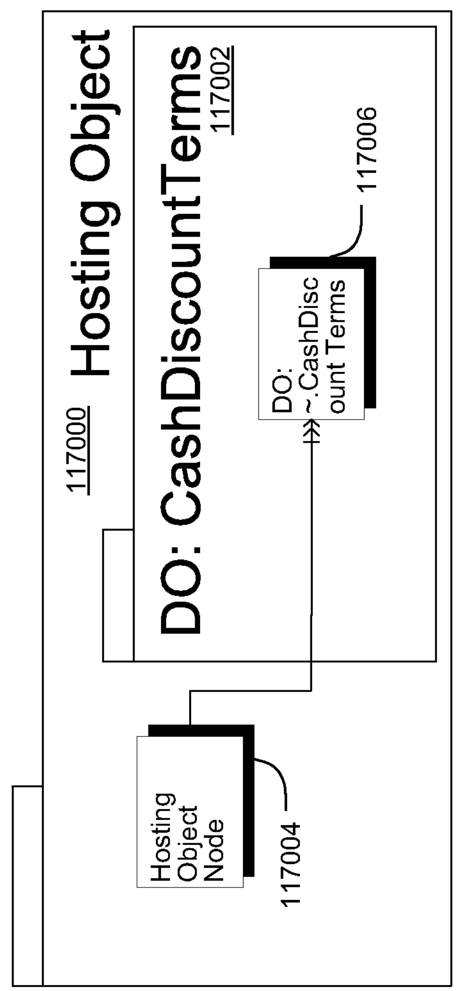
FIG. 117 shows an exemplary CashDiscountTerms object model.

FIG. 117 illustrates an example CashDiscountTerms business object model 117002. Specifically, this model depicts interactions among various hierarchical components of the CashDiscountTerms, as well as external components that interact with the CashDiscountTerms (shown here as 117000 and 117004).

The Dependent Object CashDiscountTerms are the modalities agreed on by business partners for the payment of goods delivered or services provided. These modalities consist of incremental payment periods and the cash discounts that are allowed when payment is made within one of these periods. CashDiscountTerms can be used to define terms of payment, for example, for a purchase order or invoice issue for goods and services. The business object CashDiscountTerms 117002 is part of the process component Foundation Layer. A CashDiscountTerms contains a root node. CashDiscountTerms can be represented by the node Root. The dependent object is used in the SalesOrder or CustomerInvoice, for example, to store terms of payment there. CashDiscountTerms contains a predefined CashDiscountTermsCode from the configuration. As another example, where terms of payment occur only once, these can be defined directly in the CashDiscountTerms. In this case, a configuration entry is neither generated nor referenced. The dependant Object CashDiscountTerms 117006 are the modalities agreed on by business partners for the payment of goods delivered or services provided. These modalities consist of incremental payment periods and the cash discounts that are allowed when payment is made within one of these periods.

The elements found directly at the node CashDiscountTerms are defined by the data type CashDiscountTerms Elements. In certain implementations these elements include UUID, Code, MaximumCashDiscount, NormalCashDiscount, FullPaymentDaysValue, FullPaymentDueDaysValue, FullPaymentDaysof MonthValue, FullPaymentMonthOffsetValue, FullPaymentEndDate, PaymentBaselineDate, and CashDiscountLevelCode. UUID is a universal identification, which can be unique, of CashDiscountTerms. The UUID may be based on GDT UUID. Code is a coded representation of the terms of payment, and is optional. The Code may be based on GDT CashDiscountTermsCode. MaximumCashDiscount is the maximum possible CashDiscount, and is optional. MaximumCashDiscount may be based on GDT CashDiscount. NormalCashDiscount is the normal possible CashDiscount, and is optional. NormalCashDiscount may be based on GDT CashDiscount. FullPaymentDueDaysValue is the number of days until the due date for net payment, and is optional. FullPaymentDueDaysValue may be based on GDT IntegerValue. FullyPaymentDayofMonthValue is information on which day of a following month the payment deadline for the payment of the full amount ends, and is optional. FullPaymentDayofMonthValue may be based on GDT IntegerValue. FullPaymentMonthOffsetValue is information in which in the following month the payment deadline for the payment of the full amount ends, and is optional. FullPaymentDayOfMonthValue may be based on GDT IntegerValue. FullPaymentMonthOffsetValue is information in which following month the payment deadline for the payment of the full amount ends, and is optional. FullyPaymentDayOfMonthValue may be based on GDT IntegerValue. FullPaymentEndDate is information in which following month the payment deadline for the payment of the full amount ends, and is optional. FullyPaymentDayOfMonthValue may be represented by GDT Date or Qualifier End. PaymentBaselineDate is the baseline date for payment that is used for calculating the payment period dates, and is optional. PaymentBaselineDate may be based on GDT BaselineDate, or Qualifier Payment. CashDiscountLevelCode specifies which payment period (maximum cash discount, normal cash discount or net payment) was chosen, and is optional. CashDiscountLevelCode may be based on GDT CashDiscountTermsCode.

In some implementations, if the element Code (corresponding to using a preconfigured term of payment) is filled, then no entry is possible in the elements MaximumCashDiscount, NormalCashDiscount, FullPaymentDueDaysValue, FullPaymentDayOfMonthValue, FullPaymentMonthOffsetValue, and FullPaymentEndDate. However, the payment period dates calculated in conjunction with PaymentBaselineDate can be found in the elements MaximumCashDiscount, NormalCashDiscount, and FullPaymentEndDate.

Technical Object: ChangeDocument

Figure 118:
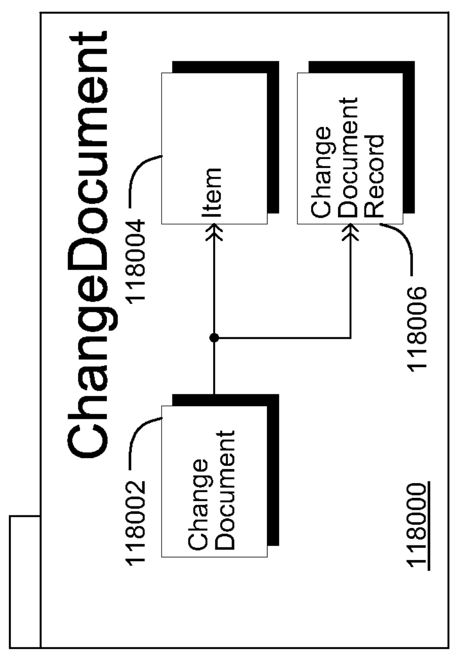
FIG. 118 shows an exemplary ChangeDocument object model.

FIG. 118 illustrates one example of an ChangeDocument business object model 118000. Specifically, this model depicts interactions among various hierarchical components of the ChangeDocument.

A ChangeDocument is a record of changes made to an object instance. For example, the ChangeDocument can specify the identity of the user responsible for the change and the change date and time. In some examples, the changes can include object node element values that are created, changed or deleted in an object instance.

In some implementations, the ChangeDocument can be used to record changes applied to a object instance during the create, update, or delete operations performed in a logical work unit transaction. The ChangeDocument can be used for any object except for transformation objects and dependent objects. For example, a user John Doe changes the reason for blocking a payment card from “Unknown” to “Lost”. Common details of the change such as user, changed object, and change time point can be recorded in the change document root. For each changed object element, individual details such as new and old values of the node, and element name can be stored in the change document item.

In some examples, a Change Document can include information such as an object type for which the change document is created, identity of the user who performed the change, or the time stamp at which the change document is created. The ChangeDocument can include information pertaining to changes that can be made to the object instance during a transaction such as the name of the node element which is modified, the new value of the node element, and the old value of the node element.

A Root node ChangeDocument 118002 is a record of changes made to an object instance in a transaction. For example, the root can specify an identity of the user responsible for the change and the change date and time. The elements located at the node ROOT can be defined by a GDT of type ChangeDocumentRootElements. The elements can include UUID, ObjectTypeCode, ObjectNodeTechnicalID, IdentityUUID, ChangeDateTime, LogicalWorkUnitTransactionUUID, BusinessSystemID, and ArchivingStatusCode.

In some implementations, the UUID can be an identifier of a ChangeDocument which may be unique. The UUID may be based on a GDT of type UUID. In some implementations, the ObjectTypeCode can be an object type code of the object for which the ChangeDocument is created. The ObjectTypeCode may be based on a GDT of type ObjectTypeCode. In some implementations, the ObjectNodeTechnicalID can be a Technical Node ID of the root node of the object for which the Change Document is created. The ObjectNodeTechnicalID may be based on a GDT of type ObjectNodeTechnicalID. In some implementations, the IdentityUUID can be the identity of the user who changed the object instance. The IdentityUUID may be based on a GDT of type UUID. ChangeDateTime is the timestamp of the change in UTC format. The ChangeDateTime may be based on a GDT of type GLOBAL_DateTime. In some implementations, the LogicalWorkUnitTransactionUUID is an identifier, which may be unique, of the logical work unit transaction during which the object instance was changed. The LogicalWorkUnitTransactionUUID, may be based on a GDT of type UUID, Qualifier: LocalWorkUnitTransaction. In certain implementations, the identifier can be provided by the ABAP runtime system. In some implementations, the BusinessSystemID can be the System ID used to identify the logical business system in which the transaction can be initiated, and can be optional. The BusinessSystemID may be based on a GDT of type BusinessSystemID. In some implementations, the ArchivingStatusCode can be the archiving status of a ChangeDocument Record, and can be optional. The ArchivingStatusCode may be based on a GDT of type ArchivingStatusCode.

An example of a Root node instance of ChangeDocument technical object can include aUUID of "8003BAC2B7F11DEB89D7AD9867239159", an ObjectTypeCode of "207 (Payment Card)", an ObjectNodeTechnicalID of "8003BAC2B7F11DEB89D75BB1795483D0", an IdentityUUID of "8003BAC2B7F11DEB89D75BB18C7C4125", a ChangeDateTime of "20060808090815", a TechnicalTransactionUUID of "00001155026959000001000000000000", and BusinessSystemID of "115".

The Root node can include composition relationships to subordinate nodes. For example, the Root node can be related to an Item 118004 with a cardinality of 1:n. In another example, the Root node can be related to a ChangeDocumentRecord 118006 with a cardinality of 1:n.

In some implementations, the Root node can include a QueryByObjectTypeCodeAndID. For example, the query can deliver a list of ChangeDocuments that can meet the selection criteria specified by the query elements, linked by a logical "AND". For example, a GDT of type QueryByObjectTypeCodeAndIDElements can define the query elements including, a ObjectTypeCode, a ObjectNodeTechnicalID, a FromChangeDateTime, a ToChangeDateTime, and an IdentityUUID. In some implementations, the ObjectTypeCode can be a GDT of type ObjectTypeCode. In some implementations, the ObjectNodeTechnicalID can be a GDT of type ObjectNodeTechnicalID. In some implementations, the FromChangeDateTime can be optional and can be a GDT of type GLOBAL_DateTime. For example, the ChangeDateTime from root node can be used between FromChangeDateTime and ToChangeDateTime. In some implementations, the ToChangeDateTime can be optional and can be a GDT of type GLOBAL_DateTime. For example, the ChangeDateTime from root node can be used between FromChangeDateTime and ToChangeDateTime. In some implementations, the IdentityUUID can be optional and can be a GDT of type UUID.

In one example, an ObjectTypeCode can be "207", an ObjectNodeTechnicalID can be "8003BAC2B7F1 IDEB89D75BB1795483D0", an IdentityUUID can be "8003BAC2B7F1 IDEB89D75BB18C7C4125", a FromChangeDateTime can be "20060808090815", and a ToChangeDateTime can be "20060809090815".

An Item is a record of a change of a single object node element. The elements located at the node Item can be defined by the GDT of type ChangeDocumentItemElements. These elements can include ID, ObjectNodeTypeCode, ObjectNodeElementName, ObjectNodeTechnicalID, ParentObjectNodeTechnicalID, ObjectNodeElementModificationTypeCode, ObjectNodeElementOldContent, ObjectNodeElementNewContentText, ChangeReasonText, and AdditionalObjectInformationText.

In some implementations, the ID is an identifier, which may be unique, of ChangeDocumentItem of a ChangeDocument. The ID may be based on a GDT of type ChangeDocumentItemID. In some implementations, the ObjectNodeTypeCode can be a type code for the object node for which change documents can be created. The ObjectNodeTypeCode may be based on a GDT of type ObjectNodeTypeCode. In some implementations, the ObjectNodeElementName can be the name of the node element for which change documents were created. The ObjectNodeElementName may be based on a GDT of type ObjectNodeElementName. In some implementations, the ObjectNodeTechnicalID can be an identifier, which may be unique, of the object node for which change documents are created. The ObjectNodeTechnicalID. ObjectNodeTechnicalID may be based on a GDT of type ObjectNodeTechnicalID. ParentObjectNodeTechnicalID is an identifier, which may be unique, of the object parent node of the node for which change documents are created. ParentObjectNodeTechnicalID may be based on a GDT of type ObjectNodeTechnicalID. In some implementations, the ObjectNodeElementModificationTypeCode can be the modification type of the ChangeDocumentItem. The ObjectNodeElementModificationTypeCode may be based on a GDT of type ObjectNodeElementModificationTypeCode. In some implementations, the ObjectNodeElementOldContent can be the content of the node element prior to the change. The ObjectNodeElementOldContent may be based on a GDT of type LANGUAGEINDEPENDENT_Text. In some implementations, the ObjectNodeElementNewContentText is the content of the node element after the change. The ObjectNodeElementNewContentText may be based on a GDT of type LANGUAGEINDEPENDENT_Text. In some implementations, the ChangeReasonText is additional information about the reason for the modification of the object instance, and is optional. The ChangeReasonText may be based on a GDT of type LANGUAGEINDEPENDENT_Text. In some implementations, the AdditionalObjectInformationText is additional Information provided by the changed object. The AdditionalObjectInformationText may be based on a GDT of type LANGUAGEINDEPENDENT_Text.

One example of an Item node instance of change document technical object can include an ID of "8003BAC2B7F1 IDEB89D7AD9867239159", an ObjectNodeTypeCode of "4462 (Payment Card Block)", an ObjectNodeElementName of "BlockingReasonCode", an ObjectNodeTechnicalID of "8003BAC2B7F11DEB89D7AD456F081075", a ParentObjectNodeTechnicalID of "8003BAC2B7F1 DEB89D75BB1795483D0", an ObjectNodeElementModificationTypeCode of "U (Updated)", an ObjectNodeElementOldContentText of "0006 (e.g. Unknown)", and an ObjectNodeElementNewContentText of "0010 (e.g. Lost)".

In some implementations, the Item can include QueryByObjectNodeTypeCodeAndNodeID. For example, the query can be define on the changedocumentItem node returns a list of changedocumentItems that can satisfy the input condition given by the user. For example, the QueryByObjectNode- TypeCodeAndNodeID can be a GDT of type QueryByObjectNodeTypeCodeAndNodeIDElements that can define the query elements including an ObjectNodeTypeCode, an ObjectNodeTechnicalID, a ChangeDocumentFromChangeDateTime, and a ChangeDocumentToChangeDateTime. In some implementations, the ObjectNodeTypeCode can be a GDT of type ObjectNodeTypeCode. In some implementations, the ObjectNodeTechnicalID can be a GDT of type ObjectNodeTechnicalID. In some implementations, the ChangeDocumentFromChangeDateTime can be optional and can be a GDT of type GLOBAL_DateTime. For example, the ChangeDateTime from root node can be used between RootFromChangeDateTime and RootToChangeDateTime. In some implementations, the ChangeDocumentToChangeDateTime can be optional and can be a GDT of type GLOBAL_DateTime. For example, the ChangeDateTime from root node can be used between RootFromChangeDateTime and RootToChangeDateTime. In one example, the ObjectNodeTypeCode can be "4462 (Payment Card Block)", the ObjectNodeTechnicalID can be "8003BAC2B7F11DEB89D7AD456F081075", the ChangeDocumentFromChangeDateTime can be "20060808090815", and the ChangeDocumentToChangeDateTime can be "20060809090815".

A ChangeDocumentRecord is a record of the change with additional information about its context such as the node hierarchy or the node element hierarchy. For example, this node can be a transformation node. In some implementations, the elements located at the node ChangeDocumentRecord can be defined by the GDT: ChangeDocumentRecordElements. The elements can include CompleteNodeHierarchyText, CompleteAttributePathText, ObjectNodeElementName, ObjectElementNewContentText, ObjectElementOldContentText, BusinessPartnerFormattedName, ChangeDateTime, ObjectNodeElementModificationTypeCode, IdentityUUID, ChangeReasonText, ObjectNodeFormattedID, AdditionalNodeHierarchyInformationText, and MiscellaneousAdditionalObjectInformationText.

In some implementations, the CompleteNodeHierarchyText can be the complete node hierarchy concatenated with the node ids of the object node which can be modified in a specific format. For example, the format can be Node1 (NodeID1) Node2 (NodeID2). The CompleteNodeHierarchyText may be based on GDT LANGUAGEINDEPENDENT_Text. The CompleteAttributePathText can be a user interface text associated with the node element which can be modified. In some examples, the User interface text can be not defined the ESR name of the node element. The name can include the entire hierarchy if the node element can have complex structure. The CompleteAttributePathText may be based on a GDT of type LANGUAGEINDEPENDENT_Text. The ObjectNodeElementName can be the node element whose contents were modified. ObjectNodeElementName may be based on a GDT of type ObjectNodeElementName. The ObjectElementNewContentText can be the content of the node element after the change. The ObjectElementNewContentText may be based on a GDT of type LANGUAGEINDEPENDENT_Text. The ObjectElementOldContentText can be the content of the node element prior to the change. The ObjectElementOldContentText may be based on a GDT of type LANGUAGEINDEPENDENT_Text. In some implementations, BusinessPartnerFormattedName is the name of the user who changed the object instance. BusinessPartnerFormattedName may be based on a GDT of type LANGUAGEINDEPENDENT_LONG_Name. ChangeDateTime is the timestamp of the change in UTC format. The ChangeDateTime may be based on a GDT of type GLOBAL_DateTime. In some implementations, ObjectNodeElementModificationTypeCode is the modification type of the ChangeDocumentItem. The ObjectNodeElementModificationTypeCode may be based on a GDT of type ObjectNodeElementModificationTypeCode. In some implementations, IdentityUUID is the IdentityUUID of the user who changed the object instance. The IdentityUUID may be based on a GDT of type UUID. In some implementations, ChangeReasonText is additional information about the reason for the modification of the object instance, and is optional. ChangeReasonText may be based on a GDT of type LANGUAGEINDEPENDENT_Text. In some implementations, ObjectNodeFormattedId can an human readable identifier of the object node instance. The ObjectNodeFormattedId may be based on a GDT of type ObjectNodeFormattedID. In some implementations, the AdditionalNodeHierarchyInformationText can be additional information about the hierarchy of the object node, and can be optional. The AdditionalNodeHierarchyInformationText may be based on a GDT of type LANGUAGEINDEPENDENT_Text. MiscellaneousAdditionalObjectInformationText can be additional information provided by the modified object, and is optional. MiscellaneousAdditionalObjectInformationText may be based on a GDT of type LANGUAGEINDEPENDENT_Text.

One Example of a ChangeDocumentRecord node instance of change document technical object can include a CompleteNodeHierarchy of "ROOT(1234578782373873838) NODE1(2345362728828288)", a CompleteAttributePath of "ValidityPeriod/StartDateTime/timeZoneCode", an ObjectNodeElementName of "timeZoneCode", an ObjectElementNewContentText of "UTC", an IdentityUUID of "8003BAC2B7FlIDEB89D75BB18C7C4125", a ChangeDateTime of "2006-04-05T11:17:42Z", a HumanReadableID of "Additional Information A", and an AdditionalNodeHierarchyInformationText of "Additional Information B", and a MiscellaneousAdditionalObjectInformationText of "Additional Information C".

In some implementations, the ChangeDocumentRecord can include QueryByObjectTypeCodeAndRootNodeID. For example, the query can deliver a list of Change Documents that can meet the selection criteria specified by the query elements, linked by a logical "AND". For example, a GDT of type QueryByObjectTypeCodeAndRootNodeIDElements can define the query elements, such as ChangeDocumentObjectTypeCode, ChangeDocumentObjectNodeTechnicalID, ChangeDocumentFromChangeDateTime, ChangeDocumentToChangeDateTime, and IdentityUUID. In some implementations, the ChangeDocumentObjectTypeCode can be a GDT of type ObjectTypeCode. In some implementations, the ChangeDocumentObjectNodeTechnicalID can be a GDT of type ObjectNodeTechnicalID. In some implementations, the ChangeDocumentFromChangeDateTime can be optional and can be a GDT of type GLOBAL_DateTime. For example, the ChangeDateTime from root node can be used between RootFromChangeDateTime and RootToChangeDateTime. In some implementations, the ChangeDocumentToChangeDateTime can be optional and can be a GDT of type GLOBAL_DateTime. For example, the ChangeDateTime from root node can be used between RootFromChangeDateTime and RootToChangeDateTime. In some implementations, the IdentityUUID can be optional and can be a GDT of type UUID, with Qualifier: Identity. One example can be ChangeDocumentObjectTypeCode of "207 (Payment Card)", a ChangeDocumentObjectNodeTechnicalID of "8003BAC2B7F11DEB89D75BB18C7C4125", an IdentityUUID-content of "8003BAC2B7F1

IDEB89D7AD456F081075", a ChangeDocumentFromChangeDateTime of "20060125153704", and a ChangeDocumentToChangeDateTime of "20060127153704".

Business Object CompanyTaxArrangement

Figure 119:
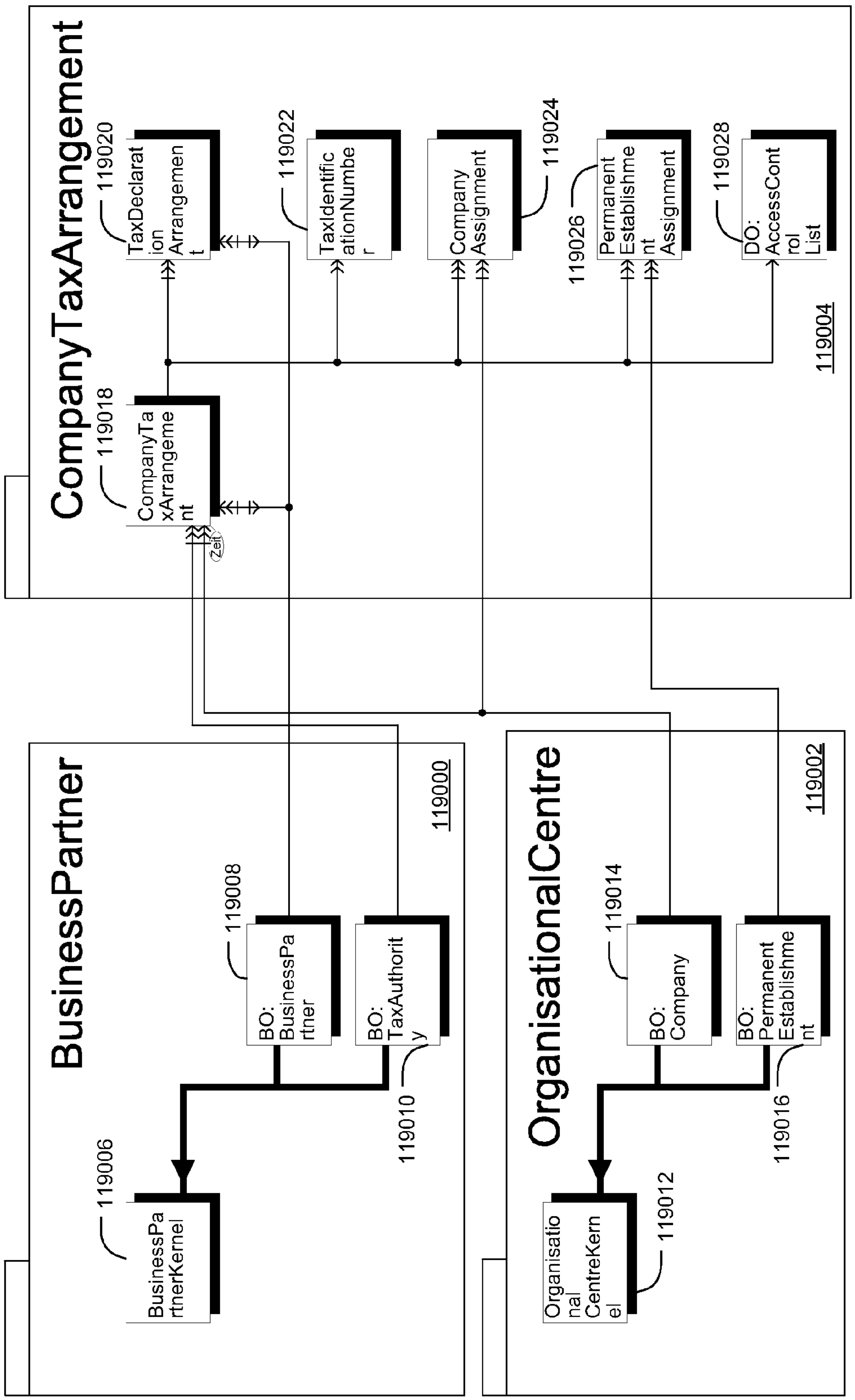
FIG. 119 shows an exemplary CompanyTaxArrangement object model.

FIG. 119 illustrates one example of an CompanyTaxArrangement business object model 119004. Specifically, this model depicts interactions among various hierarchical components of the CompanyTaxArrangement, as well as external components that interact with the CompanyTaxArrangement (shown here as 119000 through 119002 and 119006 through 119028). CompanyTaxArrangement is a mutual arrangement between a Company and a Tax Authority regarding the declaration and payment of taxes. The business object CompanyTaxArrangement is part of the Foundation Layer and process component Organisational Management. A CompanyTaxArrangement contains attributes that are used for creating a tax declaration. These are, for example, the type of tax declaration, as well as the declaration as to which permanent establishment (PermanentEstablishment) of the company the tax authority specified is responsible, and for which companies the tax declaration should be valid, in the case of a VAT group. CompanyTaxArrangement can be represented by the root node CompanyTaxArrangement 119018.

Node Structure of Business Object CompanyTaxArrangement

CompanyTaxArrangement is a mutual arrangement between a Company and a Tax Authority regarding the declaration and payment of taxes. In particular, it contains the validity period of the CompanyTaxArrangement. A number of composition relationships to subordinate nodes can exist, such as a TaxDeclarationArrangement 119020 relationship with a cardinality of 1:cn, a TaxIdentificationNumber 119022 relationship with a cardinality of 1:n, a PermanentEstablishmentAssignment 119026 relationship with a cardinality of 1:cn, a CompanyAssignment 119024 relationship with a cardinality of 1:cn, and a DO: AccessControlList 119028 relationship with a cardinality of 1:1.

The elements located directly at the node CompanyTaxArrangement can be defined by the type GDT: CompanyTaxArrangementElements. These elements can include UUID, CompanyID, CompanyUUID, TaxAuthorityInternalID, TaxAuthorityUUID, TaxAuthorityRegionCode, TaxAuthorityCountryCode, ValidityPeriod, TaxAuthorityContactPersonBusinessPartnerInternalID, TaxAuthorityContactPersonBusinessPartnerUUID, TaxManagementFunctionalUnitUUID.

UUID is a universal identifier, which may be unique, of the CompanyTaxArrangement. UUID may be based on GDT UUID. CompanyID is an identifier, which may be unique, of the company for which the CompanyTaxArrangement is valid. CompanyID may be based on GDT OrganisationalCentreID. CompanyUUID is a universal identifier, which may be unique, of the company for which the CompanyTaxArrangement is valid. CompanyUUID may be based on GDT UUID. TaxAuthorityInternalID is an identifier, which may be unique, or the tax authority with which the CompanyTaxArrangement was agreed upon. TaxAuthorityInternalID may be based on GDT BusinessPartnerInternalID. TaxAuthorityUUID is a universal identifier, which may be unique, of the tax authority with which the CompanyTaxArrangement was agreed upon. TaxAuthorityUUID may be based on GDT UUID. TaxAuthorityRegionCode is the region or state where the tax authority is situated, and is optional. TaxAuthorityRegionCode may be based on GDT RegionCode and Qualifier: TaxAuthority. TaxAuthorityCountryCode is the country in which the tax authority is situated. TaxAuthorityCountryCode may be based on GDT CountryCode and Qualifier: TaxAuthority. ValidityPeriod is the time period during which the CompanyTaxArrangement is valid. ValidityPeriod may be based on GDT _CLOSED_DatePeriod and Qualifier: Validity. TaxAuthorityContactPersonBusinessPartnerInternalID is an identifier of the contact person at the tax authority who acts as a contact for the company, and is optional. TaxAuthorityContactPersonBusinessPartnerInternalID may be based on GDT BusinessPartnerInternalID and Qualifier: ContactPerson. TaxAuthorityContactPersonBusinessPartnerUUID is a universal identifier, which may be unique, of the contact person at the tax authority who acts as a contact for the company, and is optional. TaxAuthorityContactPersonBusinessPartnerUUID may be based on GDT UUID. TaxManagementFunctionalUnitUUID is a Global identifier, which may be unique of the FunctionalUnit working on the CompanyTaxArrangement. In some implementations, the FunctionalUnit referenced has to be able to execute the organizational function 'Tax Management', (i.e. the element OrganisationalFunctionCode in one of the instances of the node FunctionalUnitAttributes in the FunctionalUnit references can have the value '33' (TaxManagement)). TaxManagementFunctionalUnitUUID may be based on GDT UUID.

A number of inbound aggregation relationships can exist, such as 1) From business object Company/node Company, a Company relationship with a cardinality of 1:cn, which specifies the company for which the CompanyTaxArrangement should be valid (the company that should pay the taxes); and 2) From business object TaxAuthority/node TaxAuthority, a TaxAuthority relationship with a cardinality of 1:cn, which specifies the tax authority and the address, for which the CompanyTaxArrangement should be valid.

A number of inbound association relationships can exist, such as 1) From the business object BusinessPartner/node BusinessPartner, a TaxAuthorityContactPersonBusinessPartner relationship with a cardinality of c:cn, which specifies the contact person for the company on behalf of the tax authority; and 2) From Business-Object FunctionalUnit/node FunctionalUnit, a TaxManagementFunctionalUnit relationship with a cardinality of c:cn, which identifies the Functional Unit which is working on the CompanyTaxArrangement. In some implementations, a company can have several CompanyTaxArrangements with different tax authorities. In some implementations, a company can act as the representative member of a VAT tax group. In this case, CompanyAssignments specify the associated companies. As a result, these companies may not have their own CompanyTaxArrangements. In some implementations, if a TaxAuthorityContactBusinessPartnerID is maintained, then the corresponding TaxAuthorityContactBusinessPartnerUUID can also be maintained.

A QueryByElements query returns a list of CompanyTaxArrangements that meet the selection criteria from the CompanyTaxArrangement elements. GDT: CompanyTaxArrangementElementQueryElements can define the query elements, which can include CompanyID, TaxAuthorityInternalID, TaxAuthorityRegionCode, TaxAuthorityCountryCode, PermanentEstablishmentAssignmentPermanentEstablishmentID, and ValidityPeriod.

CompanyID is optional and may be based on GDT: OrganisationalCentreID. TaxAuthorityInternalID is optional and may be based on GDT: BusinessPartnerInternalID. TaxAuthorityRegionCode is optional and may be based on GDT: RegionCode and Qualifier: TaxAuthority. TaxAuthorityCountryCode is optional and may be based on GDT: CountryCode and Qualifier: TaxAuthority. PermanentEstablishmentAssignmentPermanentEstablishmentID is optional and may be based on GDT: OrganisationalCentreID. ValidityPeriod is optional and may be based on GDT: _CLOSED_ DatePeriod; Qualifier: Validity.

TaxDeclarationArrangement

A TaxDeclarationArrangement contains specifications concerning a certain tax declaration type (for example, a preliminary sales tax declaration or a European Sales List). The specifications can be, for example, a validity period for the tax declaration arrangement, or a contact person of the company for the tax authority. Many of the characteristics for the tax declaration can be specified by the tax authority.

The elements located directly at the TaxDeclarationArrangement node can be defined by the type GDT: CompanyTaxArrangementTaxDeclarationArrangementElements. These can include: UUID, ID, TaxDeclarationTypeCode, ElectronicSubmissionRequiredIndicator, PrintFormRequiredIndicator, CarryForwardRequiredIndicator, ValidityPeriod, TaxDeclarationCalendarDayRecurrence, TaxPaymentRequiredIndicator, PaymentCalendarDayRecurrence, ThresholdRelevanceIndicator, ThresholdAmount, ResponsibleBusinessPartnerUUID.

UUID is a universal identifier, which may be unique, of the TaxDeclarationArrangement. UUID maybe based on GDT UUID. ID is an identifier, which may be unique, of a TaxDeclarationArrangement of a CompanyTaxArrangement. In some implementations, this ID may not be used in foreign key associations. ID may be based on GDT CompanyTaxArrangementTaxDeclarationArrangementID. TaxDeclarationTypeCode is an identifier, which may be unique, of the tax declaration type, for example, a preliminary sales tax declaration or a European Sales List. TaxDeclarationTypeCode may be based on GDT TaxDeclarationTypeCode. ElectronicSubmissionRequiredIndicator indicates whether or not the tax declaration should be transferred electronically to the tax authority. ElectronicSubmissionRequiredIndicator may be based on GDT Indicator and Qualifier: Required. PrintFormRequiredIndicator is an indicator whether or not the tax declaration should be printed. PrintFormRequiredIndicator may be based on GDT Indicator and Qualifier: Required. CarryForwardRequiredIndicator indicates whether or not tax receivables should be carried forward to the next declaration period. CarryForwardRequiredIndicator may be based on GDT Indicator and Qualifier: Required. ValidityPeriod is the time period during which the TaxDeclarationArrangement is valid. ValidityPeriod may be based on GDT _CLOSED_ atePeriod and Qualifier: Validity. TaxDeclarationCalendarDayRecurrence is the frequency that specifies in which time intervals the declaration should be written, and is optional. TaxDeclarationCalendarDayRecurrence may be based on GDT CalendarDayRecurrence and Qualifier: Declaration. TaxPaymentRequiredIndicator specifies whether a payment can be made or not, based on the TaxDeclarationArrangements. TaxPaymentRequiredIndicator may be based on GDT Indicator and Qualifier: Required.

PaymentCalendarDayRecurrence is the frequency that specifies in which time intervals the tax payments should be made, and is optional. PaymentCalendarDayRecurrence may be based on GDT CalendarDayRecurrence and Qualifier: Payment. ThresholdRelevanceIndicator specifies whether a threshold amount is applicable for the TaxDeclarationArrangement or not. ThresholdRelevanceIndicator may be based on GDT Indicator and Qualifier: Relevance. ThresholdAmount is the value up to which no tax can be paid for the TaxDeclarationArrangement, and is optional. ThresholdAmount may be based on GDT Amount and Qualifier: Threshold. ResponsibleBusinessPartnerUUID is a universal identifier, which may be optional, of the responsible business partner at the company who acts as a contact for the tax authority and is responsible for this tax declaration type. This information is derived using the responsibility concept. ResponsibleBusinessPartnerUUID may be based on GDT UUID.

A number of inbound association relationships can exist, such as from business object BusinessPartner/node BusinessPartner, a ResponsibleBusinessPartner relationship with a cardinality of c:cn, which specifies the business partner who serves directly as contact person for the tax declaration. This business partner can be internal (for example, an employee) or external, such as, for example, the tax accountant.

In some implementations, if the TaxPaymentIndicator is set, then the element TaxPaymentCalendarDayRecurrence can also be maintained and if the ThresholdIndicator is set, then a value in the element ThresholdAmount can also be specified.

A QueryByTaxDeclarationTypeCodeAndPeriod query returns a list of TaxDeclarationArrangements that meet the selection criteria from the TaxDeclarationArrangement elements. The data type GDT: CompanyTaxArrangementTaxDeclarationArrangementElements can define the query elements, which can include CompanyTaxArrangementUUID, ID, TaxDeclarationTypeCode, and ValidityPeriod. CompanyTaxArrangementUUID may be based on GDT: UUID. ID is optional and may be based on GDT: CompanyTaxArrangementTaxDeclarationArrangementID. TaxDeclarationTypeCode is optional and may be based on GDT: TaxDeclarationTypeCode. ValidityPeriod is optional and may be based on GDT: _CLOSED_DatePeriod and Qualifier: Validity.

A QueryByCompanyTaxArrangement query returns a list of TaxDeclarationArrangements that meet the selection criteria from the CompanyTaxArrangement elements. The data type GDT: CompanyTaxArrangementTaxDeclarationArrangementCompanyTaxArrangementQueryElements can define the query elements, which can include CompanyTaxArrangementCompanyID, CompanyTaxArrangementTaxAuthorityInternalID, CompanyTaxArrangementTaxAuthorityCountryCode, ID, and ValidityPeriod.

CompanyTaxArrangementCompanyID is optional and may be based on GDT: OrganisationalCentreID. CompanyTaxArrangementTaxAuthorityInternalID is optional and may be based on GDT: BusinessPartnerInternalID. CompanyTaxArrangementTaxAuthorityCountryCode is optional and may be based on GDT: CountryCode and Qualifier: TaxAuthority. ID is optional and may be based on GDT: CompanyTaxArrangementTaxDeclarationArrangementID. ValidityPeriod is optional and may be based on GDT: _CLOSED_DatePeriod and Qualifier: Validity.

TaxIdentificationNumber

A TaxIdentificationNumber is a unique identifier for the company for which this is assigned by a tax authority. The elements located directly at the TaxIdentificationNumber node can be defined by the type GDT: CompanyTaxArrangementTaxIdentificationNumberElements. These elements can include TypeCode and PartyTaxID. TypeCode is an identifier, which may be unique, of the type of the tax identification number. TypeCode may be based on GDT TaxIdentificationNumberTypeCode. PartyTaxID is an identifier, which may be unique, for the company that is assigned by a tax authority to that company. PartyTaxID may be based on GDT PartyTaxId. In some implementations, exactly one PartyTaxID can be assigned for each TypeCode.

PermanentEstablishmentAssignment

PermanentEstablishmentAssignment specifies the responsibility of the tax authority for a PermanentEstablishment within a TaxArrangement. In some implementations, the responsibility of a tax authority can be related only to those locations where the company is operating, and for which the CompanyTaxArrangement is valid. If there is no PermanentEstablishmentAssignment, then the tax authority to which the CompanyTaxArrangement applies is responsible for all permanent establishments of the company. The elements located directly at the node PermanentEstablishmentAssignment can be defined by the type GDT: CompanyTaxArrangementPermanentEstablishmentAssignmentElements. These elements can include PermanentEstablishmentID, and PermanentEstablishmentUUID. PermanentEstablishmentID is an identifier, which may be unique, of the permanent establishment of the company, for which the tax authority that is referred to is responsible. PermanentEstablishmentID, may be based on GDT OrganisationalCentreID. PermanentEstablishmentUUID is an identifier, which may be unique, of the permanent establishment of the company for which the tax authority that is referred to is responsible. PermanentEstablishmentUUID may be based on GDT UUID.

A number of Inbound Aggregation Relationships can exist, such as from business object PermanentEstablishment/node PermanentEstablishment, a PermanentEstablishment relationship with a cardinality of 1:cn, a PermanentEstablishment for which the tax authority is responsible.

CompanyAssignment

In a CompanyTaxArrangement, the CompanyAssignment is used to assign an included Company to a VAT tax group. The representative member of the VAT tax group is the company for which the CompanyTaxArrangement is valid (Company of the root node). If there is no CompanyAssignment, then the company to which the CompanyTaxArrangement applies may not a VAT tax group. The elements located directly at the node CompanyAssignment are defined by the type GDT: CompanyTaxArrangementCompanyAssignmentElements. These are: CompanyID, and CompanyUUID. CompanyID is an identifier, which may be unique, of a company that, together with the company that is stated in the CompanyTaxArrangement, forms a VAT tax group. In this case, the company that is referred to in the node CompanyTaxArrangement takes on the function of a representative member. CompanyID may be based on GDT OrganisationalCentreID. CompanyUUID is a universal identifier, which may be unique, of a company that, together with the company that is stated in the CompanyTaxArrangement, forms a VAT tax group. In this case, the company that is referred to in the node CompanyTaxArrangement takes on the function of a representative member. CompanyUUID may be based on GDT UUID.

A number of inbound aggregation relationships can exist, such as from business object Company/node Company, a Company relationship with a cardinality of 1:cn, a Company that is included in the VAT tax group. DO: AccessControlList is an AccessControlList that is a list of access groups that have access to a CompanyTaxArrangement during a validity period.

The Business object CompanyTaxArrangement is a mutual arrangement between a Company and a Tax Authority regarding the declaration and payment of taxes of a given type. For each company and tax authority there can be several TaxArrangements. The specification is time-dependent. The business object CompanyTaxArrangement is part of the Foundation Layer.

Node Structure of CompanyTaxArrangement

The elements located directly at the node CompanyTaxArrangement can be defined by the GDT: CompanyTaxArrangementElements, which can be extended with additional fields that can be defined by the data type enhancement structure: CompanyTaxArrangementNumberingExtensionElements. The enhancement element can include NumberingProfileID, which is a NumberingProfileID which identifies uniquely a configurable set of properties for document numbering functionality, and is optional. The NumberingProfileID is stored in the tax arrangement between a company and a tax authority. This identifier determines the call to a particular number range, which generates a legally required number based on the legal requirements of the country. NumberingProfileID may be based on GDT NumberingProfileID.

Business Object CompensationComponentType

Figure 120:
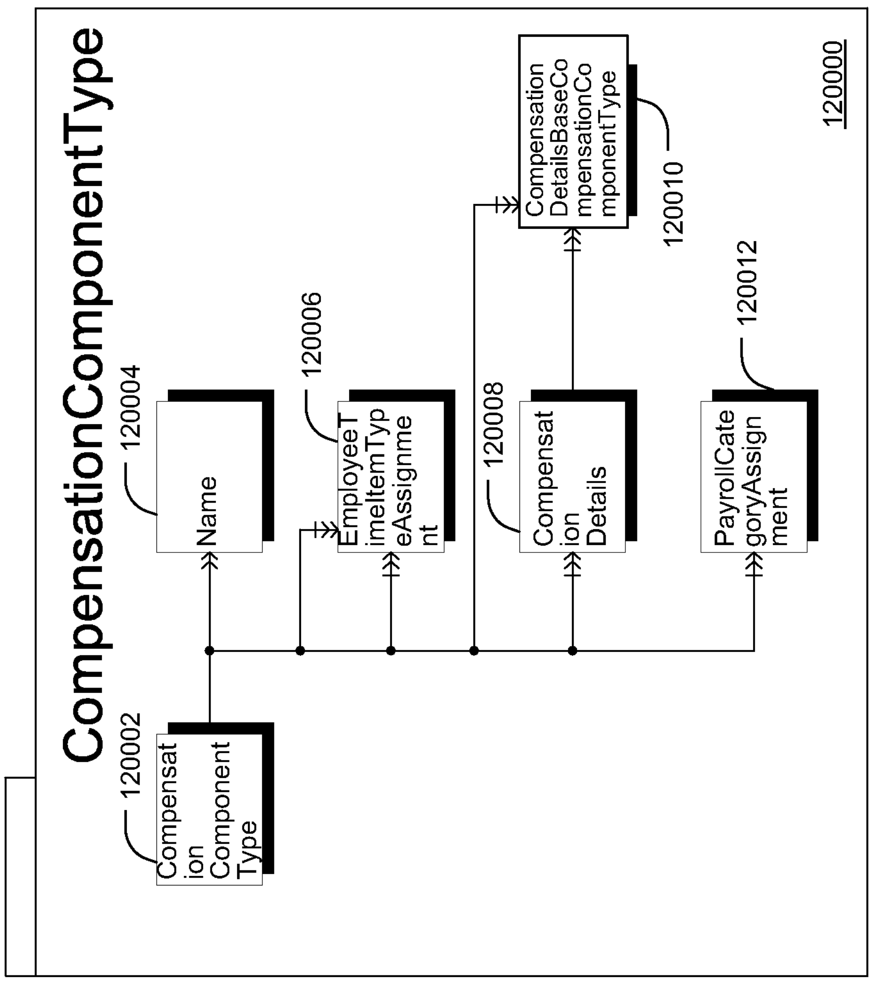

FIG. 120 illustrates one example of an CompensationComponentType business object model 120000. Specifically, this model depicts interactions among various hierarchical components of the CompensationComponentType, as well as external components that interact with the CompensationComponentType (shown here as 120002 through 120012). A CompensationComponentType can describe the employee compensation components in the context of Human Resources. The business object CompensationComponentType can be part of the process component Human Capital Master Data Management. In some implementations, the CompensationComponentType comprises the contribution amount and details relevant for payroll and is represented by the Root node.

Root node CompensationComponentType 120002 can describe the employee compensation components in the context of Human Resources. In some implementations, the elements located at the root node are defined by GDT CompensationComponentTypeElements and include UUID, ID, CompensationComponentCategoryCode, ValidityPeriod, CompensationComponentOccurrenceTypeCode, CountryCode, ActiveIndicator, DeviationAllowedIndicator, BankDetailsAllowedIndicator, CompaRatioRelevanceIndicator, EstimatedGrossEarningsRelevanceIndicator, and EstimatedDeductionsRelevanceIndicator, wherein UUID is a unique identifier of a CompensationComponentType and is based on GDT UUID; ID is a unique identifier of a CompensationComponentType and is based on GDT CompensationComponentTypeID; CompensationComponentCategoryCode is the coded representation of a categorization of employee's compensation components, combines compensation components that are related from a business point of view, and is based on GDT CompensationComponentCategoryCode; ValidityPeriod is the validity period of a CompensationComponentType and is based on GDT CLOSED_DatePeriod with Qualifier Validity; CompensationComponentOccurrenceTypeCode is a coded representation of the occurrence type of a compensation component, wherein compensation components can be transferred to payroll on recurring basis with or without specific date or as one-time payment on a fixed date and is based on GDT CompensationComponentOccurrenceTypeCode; CountryCode is a code of the country for which a CompensationComponentType is valid and is based on GDT CountryCode; ActiveIndicator indicates whether a CompensationComponentType is active or inactive, wherein only an active CompensationComponentType can be newly assigned in any other Business Objects, e.g. the EmployeeCompensationAgreement, and is based on GDT Indicator with Qualifier Active; DeviationAllowedIndicator indicates whether a different entry is allowed in the Amount field of the ItemCompensationComponentDetailRate of the business object EmployeeCompensationAgreement and is based on GDT Indicator with Qualifier Allowed; BankDetailsAllowedIndicator indicates whether or not bank details can be specified in the field BusinessPartnerBankDetailsUUID of the business object EmployeeCompensationAgreement and is based on GDT Indicator with Qualifier Allowed; CompaRatioRelevanceIndicator indicates whether a CompensationComponentType is relevant for the calculation of the Key Figure Compa-Ratio and is based on GDT Indicator with Qualifier Relevance; EstimatedGrossEarningsRelevanceIndicator indicates whether a CompensationComponentType is relevant for the calculation of the Key Figure Estimated Gross Earnings and is based on GDT Indicator with Qualifier Relevance; and EstimatedDeductionsRelevanceIndicator indicates whether a CompensationComponentType is relevant for the calculation of the Key Figure Estimated Deductions and is based on GDT Indicator with Qualifier Relevance.

Root node CompensationComponentType can have a 1:n composition relationship to subordinate node Name 120004; a 1:cn filtered composition relationship to subordinate node CompensationDetails 120008, wherein the filter elements can be defined by the data type CompensationComponentTypeCompensationDetailsFilterElements and include ValidityPeriod based on GDT CLOSED_DatePeriod with Qualifier Validity and RelativePeriodCode based on GDT CURRENTDAYFROMTODAYON_RelativePeriodCode; a 1:cn filtered composition relationship to subordinate node PayrollCategoryAssignment 120012, wherein the filter elements are defined by the data type CompensationComponentTypePayrollCategoryAssignmentFilterElements and include ValidityPeriod base on GDT CLOSED_DatePeriod with Qualifier Validity and RelativePeriodCode based on GDT CURRENTDAYFROMTODAYON_RelativePeriodCode; and a 1:cn filtered composition relationship to subordinate node EmployeeTimeItemTypeAssignment 120006, wherein the filter elements are defined by the data type CompensationComponentEmployeeTimeItemTypeAssignmentFilterElements and include ValidityPeriod based on GDT CLOSED_DatePeriod with Qualifier Validity and RelativePeriodCode based on GDT CURRENTDAYFROMTODAYON_RelativePeriodCode.

In some implementations, only one CompensationDetails and one PayrollCategoryAssignment can be assigned to a CompensationComponentType at any one time, wherein the validity periods of the nodes CompensationDetails and one PayrollCategoryAssignment can lie within the validity period of the CompensationComponentType; a node TimeTypeAssignment can only exist if CompensationComponentOccurrenceTypeCode=1 (Multiple occurrence) and "RecurrenceFrequencyCode=3 (Hourly); and within TimeTypeAssignments, there is no more than one entry for any combination of TimeTypeCode and PaymentTypeCode at any one point in time, wherein the validity periods of the node TimeTypeAssignment can lie within the validity period of the CompensationComponentType.

Enterprise service infrastructure action Copy can create a copy of an existing CompensationComponentType with a new name and ID including all subordinate nodes. In some implementations, the action elements are defined by the data type CompensationComponentTypeCopyActionElements and optionally include ID, which is based on GDT CompensationComponentTypeID and specifies the ID of the CompensationComponentType copied; and NameName, which is based on GDT MEDIUM_Name with Qualifier CompensationComponentType and specifies the name of the CompensationComponentType copied. Copy can be executed from the UI.

Enterprise service infrastructure action CreateWithReference can create a one to one copy of an existing CompensationComponentType including all subordinate nodes. CreateWithReference can be executed from the UI.

Query QueryByElements can provide a list of all CompensationComponentTypes (root node) that satisfy the selection parameters specified. In some implementations, query elements are defined by the data type CompensationComponentTypeCompensationComponentTypeElementsQueryElements and optionally include NameName, ID, KeyDate, CompensationComponentCategoryCode, ActiveIndicator, CountryCode, CompensationComponentOccurrenceTypeCode, DeviationAllowedIndicator, BankDetailsAllowedIndicator, CompaRatioRelevanceIndicator, EstimatedGrossEarningsRelevanceIndicator), EstimatedDeductionsRelevanceIndicator, CompensationDetailsCompensationComponentAmount, CompensationDetailsBaseCompensationComponentPercent, CompensationDetailsBaseCompensationComponentTypeBaseCompensationComponentTypeUUID, CompensationDetailsBaseCompensationComponentTypeBaseCompensationComponentTypeID, PayrollCategoryAssignmentCompensationComponentPayrollCategoryCode, EmployeeTimeItemTypeAssignmentEmployeeTimeItemTypeCode, EmployeeTimeItemTypeAssignmentEmployeeTimeItemPaymentTypeCode, EmployeeTimeItemTypeAssignmentResultCompensationComponentTypeUUID, and EmployeeTimeItemTypeAssignmentResultCompensationComponentTypeID, wherein NameName is based on GDT MEDIUM_Name with qualifier CompensationComponentType and is the name of the CompensationComponentType or a pattern for this (e.g., all CompensationComponentTypes whose name starts with "Base"); ID is based on GDT CompensationComponentTypeID; KeyDate is based on GDT Date with qualifier Key and is the validity period of the CompensationComponentType as specified in the element ValidityPeriod overlaps the period of the query element KeyDate; CompensationComponentCategoryCode is based on GDT CompensationComponentCategoryCode; ActiveIndicator is based on GDT Indicator with Qualifier Active; CountryCode is based on GDT CountryCode; CompensationComponentOccurrenceTypeCode is based on GDT CompensationComponentOccurrenceTypeCode; DeviationAllowedIndicator is based on GDT Indicator with qualifier Allowed; BankDetailsAllowedIndicator is based on GDT Indicator with qualifier Allowed; CompaRatioRelevanceIndicator is based on GDT Indicator with qualifier Relevance; EstimatedGrossEarningsRelevanceIndicator is based on GDT Indicator with qualifier Relevance; EstimatedDeductionsRelevanceIndicator is based on GDT Indicator with qualifier Relevance; CompensationDetailsCompensationComponentAmount is based on GDT LARGE_Amount with qualifier CompensationComponent; CompensationDetailsBaseCompensationComponentPercent is based on GDT MEDIUM_Percent with qualifier BaseCompensationComponent; CompensationDetailsBaseCompensationComponentTypeBaseCompensationComponentTypeUUID is based on GDT UUID, wherein CompensationComponentType is derived from the CompensationComponentType specified in the query element BaseCompensationComponentTypeUUID, and wherein the validity period of the CompensationDetails as specified in the element CompensationDetailsValidityPeriod overlaps the period of the query element ValidityDate; CompensationDetailsBaseCompensationComponentTypeBaseCompensationComponentTypeID (is based on GDT CompensationComponentTypeID, wherein the CompensationComponentType is derived from the CompensationComponentType specified in the query element BaseCompensationComponentTypeID, and wherein the validity period of the CompensationDetails as specified in the element CompensationDetailsValidityPeriod overlaps the period of the query element KeyDate; PayrollCategoryAssignmentCompensationComponentPayrollCategoryCode is based on GDT CompensationComponentPayrollCategoryCode; EmployeeTimeItemTypeAssignmentEmployeeTimeItemTypeCode is based on GDT EmployeeTimeItemTypeCode; EmployeeTimeItemTypeAssignmentEmployeeTimeItemPaymentTypeCode is based on GDT EmployeeTimeItemPaymentTypeCode; EmployeeTimeItemTypeAssignmentResultCompensationComponentTypeUUID is based on GDT UUID; and EmployeeTimeItemTypeAssignmentResultCompensationComponentTypeID is based on GDT CompensationComponentTypeID.

Subordinate node Name can be a language-dependent word or combination of words designating or describing a CompensationComponentType and can exist in several languages. In some implementations, elements of the node Name are defined by the GDT CompensationComponentTypeNameElements and include Name, which specifies the name of a CompensationComponentType in a particular language and is based on GDT MEDIUM_Name with qualifier CompensationComponentType.

Subordinate node CompensationDetails can refer to provisions pertaining to contribution details throughout the whole company and can be filled only if the provisions apply to the whole company (e.g., there is a fixed fee of 20 Euro for use of the company gym; you can define all further details in the CompensationStructure or EmployeeCompensationAgreement). In some implementations, the elements of the node CompensationComponentTypeCompensationDetails are defined by the GDT CompensationComponentTypeCompensationDetailsElements, and include ValidityPeriod and optionally include CompensationComponentAmount, CompensationComponentRecurrenceFrequencyCode, BaseCompensationComponentPercent, and CompensationComponentCalendarDayRecurrence, wherein ValidityPeriod is the validity period of a CompensationComponentTypeCompensationDetails and is based on GDT CLOSED_DatePeriod with qualifier Validity; CompensationComponentAmount is a monetary amount, wherein this amount is proposed when the CompensationComponentType is used for a EmployeeCompensationAgreementItemCompensationComponent, and is based on GDT LARGE_Amount with qualifier CompensationComponent; CompensationComponentRecurrenceFrequencyCode is a coded representation of the frequency of a compensation component which is due on a recurring basis with no specification of fixed due dates, wherein this frequency is proposed when the CompensationComponentType is used for a EmployeeCompensationAgreementItemCompensationComponent, and is based on GDT COMPENSATIONCOMPONENT_RecurrenceFrequencyCode with qualifier CompensationComponent; BaseCompensationComponentPercent is the percentage rate used to derive the EmployeeCompensationComponentDefaultRate from the sum of all related BaseCompensationComponentTypes and is based on GDT MEDIUM_Percent with qualifier CompensationComponent; and CompensationComponentCalendarDayRecurrence is the default recurrence of the due date of a compensation component within a period and is based on GDT CalendarDayRecurrence with qualifier CompensationComponent.

CompensationDetails can have a 1:cn cardinality composition relationships to subordinate node BaseCompensationComponentType. In some implementations, a subordinate node BaseCompensationComponentType can only exist if the field CompensationComponentAmount is not filled; RecurrenceFrequencyCode can be filled if the CompensationComponentOccurrenceTypeCode at Root node level is set to value ‘1’ (Multiple occurrences); CalendarDayRecurrence can not be filled if the CompensationComponentOccurrenceTypeCode at the root node is set to ‘1’ (Multiple occurrences) or ‘2’ (One-time fixed occurrence); CalendarDayRecurrence can be filled if the CompensationComponentOccurrenceTypeCode at Root node level is set to value ‘3’ (Multiple occurrences on fixed due dates); RecurrenceFrequencyCode and CalendarDayRecurrence can not be filled if the CompensationComponentOccurrenceTypeCode at Root node level is set to value ‘2’ (One-time fixed occurrence); and if the CompensationComponentOccurrenceTypeCode at the root node is set to ‘1’ (Multiple occurrences) or ‘2’ (One-time fixed occurrence), the element Recurrence can not exist.

Enterprise service infrastructure action Delimit can delimit CompensationComponentType CompensationDetails by setting the end date of its ValidityPeriod to the parameter value. In some implementations, if the date provided as action parameter is between the CompensationComponentTypeCompensationDetails ValidityPeriod start date and end date, the end date is set to the parameter date; otherwise, the change is refused by issuing an error message. In some implementations, the action elements are defined by the data type DelimitActionElements and include EndDate, which is based on GDT Date.

Subordinate node CompensationDetailsBaseCompensationComponentType 120010 can specify the base for calculating the Compensation Component Amount for relative Compensation Component Types. In some implementations, this node is only filled for relative Compensation Component Types, and contains one or more BaseCompensationComponentTypes whereby each contributes to the computed amount with a defined percentage value. In some implementations, the elements of node CompensationDetailsBaseCompensationComponentType are defined by the GDT CompensationComponentTypeCompensationDetailsBaseCompensationComponentTypeElements, and include WeightingPercent, BaseCompensationComponentTypeUUID, and BaseCompensationComponentTypeID, wherein WeightingPercent defines the weighting percentage of the BaseCompensationComponentType for the relative CompensationComponentType and is based on GDT MEDIUM_Percent with qualifier Weighting; BaseCompensationComponentTypeUUID is a unique identifier of the BaseCompensationComponentType to which the weighting percentage refers to and is based on GDT UUID; and BaseCompensationComponentTypeID is an identifier of a CompensationComponentType and is based on GDT CompensationComponentTypeID.

From business object CompensationComponentType/node Root, CompensationDetailsBaseCompensationComponentType can have a 1:cn cardinality inbound association relationship with BaseCompensationComponentType, which specifies the CompensationComponentType from which the percentage CompensationComponentAmount is derived. In some implementations, once a BaseCompensationComponentType is defined, the BaseCompensationComponentType cannot be reassigned or deleted and recursion of BaseCompensationComponentType and CompensationComponentTypes can be prevented.

Subordinate node PayrollCategoryAssignment can specify the time dependent assignment of a Compensation Component Type to the Payroll Provider-specific Payroll Category. In some implementations, the elements of node CompensationComponentTypePayrollCategoryAssignment are defined by the GDT CompensationComponentTypePayrollCategoryAssignmentElements, and include ValidityPeriod and CompensationComponentPayrollCategoryCode, wherein ValidityPeriod is the validity period of a CompensationComponentTypePayrollCategoryAssignment and is based on GDT CLOSED_DatePeriod with qualifier Validity and CompensationComponentPayrollCategoryCode is the coded representation of a Payroll Category and is based on GDT CompensationComponentPayrollCategoryCode. In some implementations, the Compensation Component Type and the assigned CompensationComponentPayrollCategoryCode can belong to the same country.

Enterprise service infrastructure action Delimit can delimit CompensationComponentTypePayrollCategoryAssignment by setting the end date of its ValidityPeriod to the parameter value. In some implementations, if the date provided as action parameter is between the CompensationComponentTypePayrollCategoryAssignment ValidityPeriod start date and end date, the end date is set to the parameter date; otherwise, the change is refused by issuing an error message. In some implementations, the action elements are defined by the data type DelimitActionElements and include EndDate, which is based on GDT Date.

Subordinate node EmployeeTimeItemTypeAssignment can specify the time dependent assignment of a Compensation Component Type to Time & Labour Managements Time Type attributes. In some implementations, the elements of node CompensationComponentTypeEmployeeTimeItemTypeAssignment are defined by the GDT CompensationComponentTypeEmployeeTimeItemTypeAssignmentElements, and include ValidityPeriod, EmployeeTimeItemTypeCode, EmployeeTimeItemPaymentTypeCode, ResultCompensationComponentTypeUUID, and ResultCompensationComponentTypeID, wherein ValidityPeriod is the validity period of a CompensationComponentTypeTimeTypeAssignment and is based on GDT CLOSED_DatePeriod with qualifier Validity; EmployeeTimeItemTypeCode is the coded representation of employees recorded time (e.g., Planned working time, Overtime, Illness, etc.) and is based on GDT EmployeeTimeItemTypeCode; EmployeeTimeItemPaymentTypeCode is a coded representation of a payment type of employees reported time (e.g., Regular, Early shift, Night shift, Overtime 50% of Regular, Overtime 100% of Regular, etc.) and is based on GDT EmployeeTimeItemPaymentTypeCode, wherein in combination with the EmployeeTimeItemTypeCode, the EmployeeTimeItemPaymentTypeCode defines the payment of the employee time item; ResultCompensationComponentTypeUUID is a CompensationType which holds a calculated amount of a CompensationComponent with an hourly CompensationComponentRecurrenceFrequencyCode and is based on GDT UUID) and ResultCompensationComponentTypeID is an identifier of a CompensationComponentType and is based on GDT CompensationComponentTypeID.

From business object CompensationComponentType/node Root, EmployeeTimeItemTypeAssignment can have a 1:cn cardinality inbound association relationship with ResultCompensationComponentType, which specifies the CompensationComponentType which holds a calculated amount of a CompensationComponent with an hourly CompensationComponentRecurrenceFrequencyCode. In some implementations, a ResultCompensationComponentType can be of CompensationComponentOccurrenceTypeCode "One-time fixed occurrence."

Enterprise service infrastructure action Delimit can delimit CompensationComponentTypeEmployeeTimeItemTypeAssignment by setting the end date of its ValidityPeriod to the parameter value. In some implementations, if the date provided as action parameter is between the CompensationComponentTypeEmployeeTimeItemTypeAssignment ValidityPeriod start date and end date, the end date is set to the parameter date; otherwise, the change is refused by issuing an error message. In some implementations, the action elements are defined by the data type DelimitActionElements and include EndDate, which is based on GDT Date.

Dependent Object ControlledOutputRequest

Figure 121:
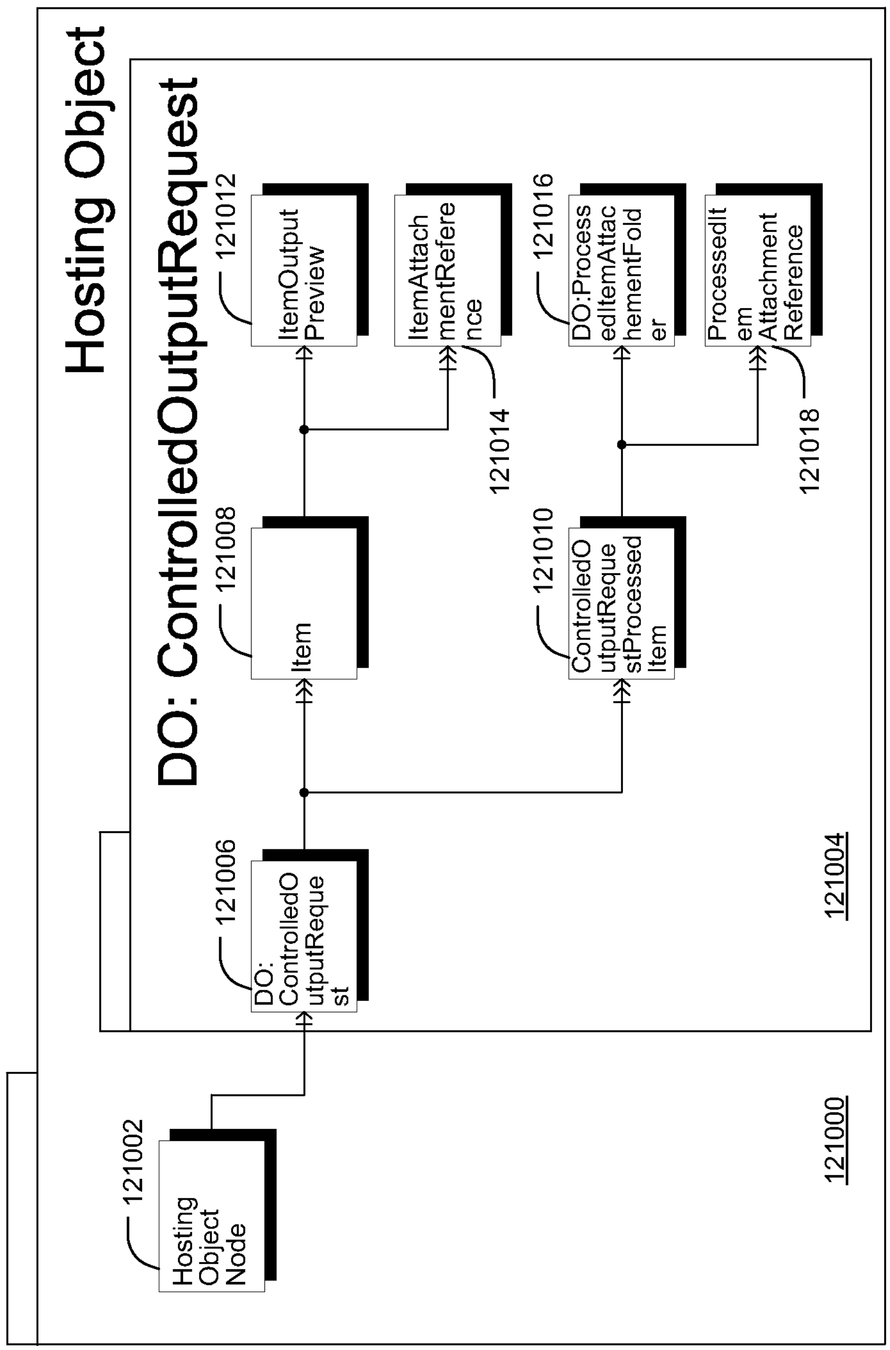

FIG. 121 illustrates an example ControlledOutputRequest business object model 121004. Specifically, this model depicts interactions among various hierarchical components of the ControlledOutputRequest, as well as external components that interact with the ControlledOutputRequest (shown here as 121000 through 121002).

A Controlled Output Request is a controller of output requests and processed output requests related to the Hosting Business Object. Several output channels are supported for sending out documents.

The dependent object Controlled Output Request is a generic object and is available to process components of deployment units. Hence, the dependent object Controlled Output Request resides in the foundation layer.

A Controlled Output Request supports the output to several output channels. Possible output channels are print, email, fax, or XML messaging.

The Controlled Output Request can be used in any Business Object. Dependent Object Controlled Output Request can only composite into the Root Node of the Hosting Business Object. The cardinality between the Hosting Business Object Root Node and the Dependent Object Controlled Output Request is always 1:c.

An invoice can only been output once as an original document, later on only a document marked as copy can be output. The application BO can access the output history to check whether the invoice has already been sent to process the output accordingly.

A Controlled Output Request contains: Output Request as single item, Output History information, Attached Documents. Controlled Output Request is represented by the root node Controlled Output Request.

Node Structure of Dependent Object A controller of output requests and output history entries related to the Hosting Business Object. Several output channels are supported for sending out documents.

The elements located directly at the node ControlledOutputRequest 121006 are defined by the data type: ControlledOutputRequestElements. The element is: HostObjectNodeReference is a reference of current hosting business object node. HostObjectNodeReference may be based on GDT ObjectNodeReference and Qualifier: Host. Item 121008 may have a cardinality of 1:cn and ProcessedItem 121010 may have a cardinality of 1:cn.

Enterprise Service Infrastructure Actions may include a RefreshDefaultOutputRequestItems action. The RefreshDefaultOutputRequestItems action refreshes the Output Request Items according to current business context of the hosting business object with Defaults and user specific parameters. This action will be called after form template selection on the UI to refresh the output request to have a new output request instance(s) filled with default values to work with. The defaults will be overruled by parameters retrieved from the parameter service that were adjusted by the user. The existing node Item will be deleted and a new node Item with the context of the hosting business object will be created. The action elements are defined by data type.

ControlledOutputRequestRefreshDefaultOutputRequestItemActionElements. These are: OutputRequestFormTemplateGroupCode that forms template group of the output document If OutputRequestFormTemplateGroupCode is not specified, the default From Template Group for the hosting business object will be used. It is type GDT: OutputRequestFormTemplateCode;

DiscardChangesOfOutputRequestItems that discards changes of an Output Request Items and fill them with data according to current business context of the hosting business object with defaults. This action will be called within the UI of the output dialog to discard all parameter changes previous done by the user. The existing node Item will be deleted and a new node Item with the context of the hosting business object will be created.

The action elements are defined by data type ControlledOutputRequestDiscardChangesOutputRequestItemActionElements. These are:

OutputRequestFormTemplateGroupCode that forms a template group of the output document If OutputRequestFormTemplateGroupCode is not specified, the default From Template Group for the hosting business object will be used. It is type GDT: OutputRequestFormTemplateCode.

RefreshProcessedItem

RefreshProcessedItem refreshes the Processed Item of one ControlledOutputRequest. The user navigates to the output history UI where she/he sees all processed items with the current status and the newest processed items. She/he can refresh the list to either again retrieving the status of a processed item from Netweaver Business Communication Services or retrieve new processed items. The node ProcessedItem will be updated to the latest status of the output request processed by Business Communication Service.

SendOutputRequestItems

Sends the OutputRequestItems of one ControlledOutputRequest to the specified output channels.

A change to the object may include allowing the object to internally set a trigger. The action elements are defined by data typeControlledOutputRequestSendOutputRequestItemsActionElements. These are: OutputRequestFormTemplateGroupCode to form a template group of the output document. If OutputRequestFormTemplateGroupCode is not specified, the default Form Template Group for the hosting business object will be used. It is type GDT: OutputRequestFormTemplateGroupCode.

Item

An Item is a request to send a document related to the Hosting Business Object to one specified output channel at a specific point in time. An invoice is sent to the customer at midnight as an e-mail attachment.

The elements located directly at the node Item are defined by the data type: ControlledOutputRequestItemElements. These elements are: OutputRequestFormTemplateGroupCode, OutputRequestFormTemplateCode, OutputRequestFormTemplateCountryCode, OutputRequestFormTemplateLanguageCode, PrinterCode, ElectronicMessageSubjectText, ElectronicMessageBodyText, BusinessPartnerUUID, CommunicationMediumTypeCode, LogicalOutputQueueCode, OutputPlannedTimePoint, OutputCopyNumberValue, CopyIndicator, AttachmentIncludedIndicator, ArchiveRelevanceIndicator, FacsimileNumber, EmailAddress, MobilePhoneNumber.

OutputRequestFormTemplateGroupCode is a form template group that provides for an output request item a certain form template for a business context. OutputRequestFormTemplateGroupCode may be based on GDT OutputRequestFormTemplateGroupCode. OutputRequestFormTemplateCode is a form template that decides the output layout of an output request. OutputRequestFormTemplateCode may be based on GDT OutputRequestFormTemplateCode. OutputRequestFormTemplateCountryCode is an attribute of a form template which determines the country version for this template. OutputRequestFormTemplateCountryCode may be based on GDT CountryCode, Qualifier: OutputRequestFormTemplate. OutputRequestFormTemplateLanguageCode is a language of a form template. OutputRequestFormTemplateLanguageCode may be based on GDT LanguageCodeQualifier: OutputRequestFormTemplate. PrinterCode is a printer to which the output request will be sent. PrinterCode may be based on GDT PrinterCode. ElectronicMessageSubjectText is an e-mail subject text if output channel is e-mail. ElectronicMessageSubjectText may be based on GDT ElectronicMessageSubjectText.

ElectronicMessageBodyText is an e-mail or SMS body text if output channel is e-mail or SMS. ElectronicMessageBodyText may be based on GDT ElectronicMessageBodyText. BusinessPartnerUUID is a business partner to whom the output request will be sent. BusinessPartnerUUID may be based on GDT UUID. CommunicationMediumTypeCode is an output channel for one output request. CommunicationMediumTypeCode may be based on GDT CommunicationMediumTypeCode. LogicalOutputQueueCode is an application queue of hosting object for deferred output. LogicalOutputQueueCode may be based on GDT LogicalOutputQueueCode. OutputPlannedTimePoint is a time point at which the actual output should be done. OutputPlannedTimePoint may be based on GDT TimePoint, Qualifier: Planned. OutputCopyNumberValue is a number of copies the output (print) should do. OutputCopyNumberValue may be based on GDT NumberValue, Qualifier: OutputCopy. CopyIndicator indicates whether the output form is a copy of an original or not. CopyIndicator may be based on GDT Indicator Qualifier Copy. AttachmentIncludedIndicator indicates whether the attachments of the hosting BO should be included in the Output Request or not. AttachmentIncludedIndicator may be based on GDT Indicator, Qualifier: AttachmentIncluded. ArchiveRelevanceIndicator indicates whether an Output Request should be archived or not. ArchiveRelevanceIndicator may be based on GDT Indicator, Qualifier: ArchiveRelevance. FacsimileNumber is a number to which output will send a fax if the output channel is fax. FacsimileNumber may be based on GDT PhoneNumber. EmailAddress is an e-mail address to which output will send an e-mail if the output channel is e-mail. EmailAddress may be based on GDT EmailAddress. MobilePhoneNumber is a mobile phone number to which output will send an SMS message if the output channel is SMS. MobilePhoneNumber may be based on GDT PhoneNumber. ItemAttachmentReference 121014 may have a cardinality of 1:cn and ItemOutputPreview may have a cardinality of 1:c.

ItemOutputPreview 121012 is a preview of an Item. This node was added because this can, under certain circumstances, involve very large data volumes and determining this data can lead to performance problems. The node keeps the data of a PDF form that was requested by the UI for preview. Item Output Preview contains the output as a PDF document that will be printed.

The elements located directly at the node ItemOutputPreview are defined by the data type: ControlledOutputRequestItemOutputPreviewElements. The element is: BinaryObject. BinaryObject is a PDF document of this item for preview. BinaryObject may be based on GDT BinaryObject.

Item Attachment Reference is a list of attachments that have to be output with the output request of a Hosting Business Object. This node was added so the application can determine which attachment should be output with the current BO document. An output of an order confirmation will include terms and conditions and the product description in addition to the output form of the hosting BO itself.

The elements located directly at the node ItemAttachmentReference are defined by the data type: ControlledOutputRequestItemAttachmentReference elements. The element is: UUID. UUID is a global identifier, which may be unique of a document in the knowledge management system. With the output of a business object some attachments can be output. Instead of copy such documents references are used. More than one attachment can be output with one item. UUID may be based on GDT UUID, Qualifier: ItemAttachmentReference.

ProcessedItem

ProcessedItem is an item that has already been processed. In addition to the output parameters, it contains the information about the progress of the output.

The elements located directly at the node ProcessedItem are defined by the data type: ControlledOutputRequestProcessedItemElements. These elements are: OutputRequestFormTemplateGroupCode, OutputRequestFormTemplateCode, OutputRequestFormTemplateCountryCode, OutputRequestFormTemplateLanguageCode, PrinterCode, ElectronicMessageSubjectText, ElectronicMessageBodyText, BusinessPartnerUUID, CommunicationMediumTypeCode, LogicalOutputQueueCode, OutputPlannedTimePoint, OutputCopyNumberValue, CopyIndicator, AttachmentIncludedIndicator, ArchiveRelevanceIndicator, FacsimileNumber, EmailAddress, MobilePhoneNumber, Status.

OutputRequestFormTemplateGroupCode is a form template group that provides for an output request item a certain form template for a business context. OutputRequestFormTemplateGroupCode may be based on GDT OutputRequestFormTemplateGroupCode. OutputRequestFormTemplateCode is a form template that decides the output layout of an output request. OutputRequestFormTemplateCode GDT OutputRequestFormTemplateCode. OutputRequestFormTemplateCountryCode is an attribute of a form template which determines the country version for this template. OutputRequestFormTemplateCountryCode may be based on GDT CountryCode Qualifier: OutputRequestFormTemplate. OutputRequestFormTemplateLanguageCode is a language of a form template. OutputRequestFormTemplateLanguageCode may be based on GDT LanguageCodeQualifier: OutputRequestFormTemplate. PrinterCode is a printer to which the output request will be sent. PrinterCode may be based on GDT PrinterCode. ElectronicMessageSubjectText is an e-mail subject text if output channel is e-mail. ElectronicMessageSubjectText may be based on GDT ElectronicMessageSubjectText. ElectronicMessageBodyText is an e-mail or SMS body text if output channel is e-mail or SMS. ElectronicMessageBodyText may be based on GDT ElectronicMessageBodyText. BusinessPartnerUUID is a business partner to whom the output request will be sent. BusinessPartnerUUID may be based on GDT UUID. CommunicationMediumTypeCode is an output channel for one output request. CommunicationMediumTypeCode may be based on GDT CommunicationMediumTypeCode.

LogicalOutputQueueCode is an application queue of hosting object for deferred output. LogicalOutputQueueCode may be based on GDT LogicalOutputQueueCode. OutputPlannedTimePoint is a time point at which the actual output should be done. OutputPlannedTimePoint may be based on GDT TimePoint, Qualifier: Planned. OutputCopyNumberValue is a number of copies the output (print) should do. OutputCopyNumberValue may be based on GDT Number Value, Qualifier: OutputCopy. CopyIndicator indicates whether the output form is a copy of an original or not. CopyIndicator may be based on GDT Indicator Qualifier: Copy. AttachmentIncludedIndicator indicates whether the attachments of the hosting BO should be included in the Output Request or not. AttachmentIncludedIndicator may be based on GDT Indicator, Qualifier: AttachmentIncluded. ArchiveRelevanceIndicator indicates whether an Output Request should be archived or not. ArchiveRelevanceIndicator may be based on GDT Indicator, Qualifier: ArchiveRelevance. FacsimileNumber is a number to which output will send a fax if the output channel is fax. FacsimileNumber may be based on GDT PhoneNumber. EmailAddress is an e-mail address to which output will send an e-mail if the output channel is e-mail, which is optional. EmailAddress may be based on GDT EmailAddress.

MobilePhoneNumber is a mobile phone number to which output will send an SMS message if the output channel is SMS. MobilePhoneNumber may be based on GDT PhoneNumber. Status is the current step in the life cycle of a processed output request. The status elements are defined by the data type: ControlledOutputRequestProcessedItemStatus. These elements are: ControlledOutputRequestProcessedItemStatus, and SystemAdministrativeData.

ControlledOutputRequestProcessedItemStatus is the status reflect the last information about the status of a processed item retrieved by the BO and the according UI (Output request history). ControlledOutputRequestProcessedItemStatus may be based on GDT OutputStatusCode. SystemAdministrativeData is data including CreationDateTime, CreationUserAccountID, LastChangeDateTime, and LastChangeUserAccountID. SystemAdministrativeData may be based on GDT SystemAdministrativeData. AttachmentFolder 121016 may have a cardinality of 1:c and ProcessedItemAttachmentReference 121018 may have a cardinality of 1:cn.

A Processed Item Attachment Reference is a reference (according to definition above) of documents that have been output with the output request of the hosting business object in the past. This node was added because, in repeated output, the attachments can be output again with BO document. It is also useful as a history of all kind of attachments that are part of the output request. ProcessedItemAttachmentReference includes the terms and conditions and the product description in addition to the output form of the hosting BO itself of a processed item.

The elements located directly at the node ProcessedItemAttachmentReference are defined by the data type ControlledOutputRequestProcessedItemAttachmentReferenceElements. The element is: ItemAttachmentReferenceUUID is a global identifier, which may be unique, of a document in the knowledge management system. With the output of a business object some attachments can be output. Instead of copy such documents references are used. More than one attachment can be output with one item. After tranfering the output request to Netwaever both the Item and the ItemAttachmentReference will be copied to the ProcessedItem and ProcessedItemAttachmentReference. ItemAttachmentReferenceUUID may be based on GDT UUID, Qualifier: ItemAttachmentReference.

A DO Attachment Folder is a collection of documents of the output request that has already been processed. The folder contains the real output request, e.g. an invoice, as file.

Business Object CrossProductCatalogueSearch

Figure 122:
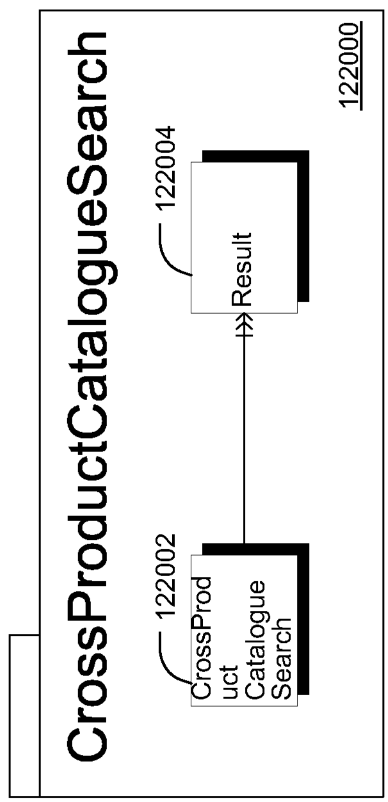

FIG. 122 illustrates an example CrossProductCatalogueSearch business object model 122000. Specifically, this model depicts interactions among various hierarchical components of the CrossProductCatalogueSearch.

Business Object CrossProductCatalogueSearch is a search across product catalogs including the search condition and the result. The Cross Product Catalog Search contains the condition used for and the result of a search across product catalogs. The catalogs available for a product search are maintained in the Business Configuration. The business object CrossProductCatalogueSearch is part of the process component of the Reuse Service Component (RSC) Open Catalogue and Partner Interface. The technical object CrossProductCatalogueSearch can be used to access the cross catalog search service of the RSC Open Catalogue and Partner Interface from service consumers. CrossProductCatalogueSearch can be represented by the node CrossProductCatalogueSearch.

Node Structure of Business Object CrossProductCatalogueSearch

CrossProductCatalogueSearch 122002 is a search across product catalogs including the search condition and the result. The CrossProductCatalogueSearch can be transient. The elements located directly at the node CrossProductCatalogueSearch can be defined by the data type CrossProductCatalogueSearchElements. These elements can include UUID. UUID is a global identifier, which may be unique, for the CrossProductCatalogueSearch. UUID may be based on GDT UUID. A composition relationship to subordinate nodes involving a Result 122004 with a 1:cn cardinality can exist.

Enterprise Service Infrastructure actions can include SearchProduct. The SearchProduct action searches for a product across product catalogs that match the specified search text. The SearchProduct action can trigger the search across product catalogs. The SearchProduct action can create the CrossProductCatalogueSearch and the Result. The SearchProduct action elements are defined by the data type CrossProductCatalogueSearch-SearchProductActionElements. These elements are SearchText and MaximumSearchDuration. SearchText is text that is searched for within the particular data content of product catalogs, and can be of type GDT: SearchText. MaximumSearchDuration is the maximum duration of the search across product catalogs, can be of type GDT: TIME_Duration, and can have a qualifier of Maximum. The SearchText action can be used to find a product in one or more product catalogs.

Result

Result is the result of a search across product catalogs for the specified search conditions. Product is not necessarily a master data BO Product. The elements located directly at the node CrossProductCatalogueSearchResult can be defined by the data type CrossProductCatalogueSearchResultElements. These elements are Description, SellerPartyID, Price, ProductID, ProductSellerID, ProductTypeCode, ProductCategoryInternalID, MaximumLeadTimeDuration, ProductCatalogueReference, PurchasingContractReference, and Attachment. Description is the description of the found product. Description may be based on GDT SHORT_Description. SellerPartyID is an identifier, which may be unique, for the SellerParty of the found product. SellerPartyID may be based on GDT PartyID. Price is the price of the found product, and is optional. Price may be based on GDT Price. ProductID is an identifier, which may be unique, for the found product. ProductID may be based on GDT ProductID. ProductSellerID is an identifier, which may be unique, for the found product assigned by the Seller. ProductSellerID may be based on GDT ProductPartyID. ProductTypeCode is a coded representation of the product type for the found product, and is optional. ProductTypeCode may be based on GDT ProductTypeCode. ProductCategoryInternalID is an identifier, which may be unique, for the internal product category of the found product. A product category is a division of products according to objective business-specific criteria. ProductCategoryInternalID may be based on GDT ProductCategoryInternalID. MaximumLeadTimeDuration is the maximum lead time from the time the order is placed until the receipt of the delivery, and is optional. MaximumLeadTimeDuration may be based on GDT DAY_Duration. ProductCatalogueReference is a reference to the found Product Catalog item. ProductCatalogueReference may be based on GDT CatalogueReference. PurchasingContractReference is a reference to a Purchasing Contract that contains the business terms and conditions (e.g. price) for purchase orders, and is optional. PurchasingContractReference may be based on GDT BusinessTransactionDocumentReference. Attachment contains the following elements that are defined by the data type CrossProductCatalogueSearchResultAttachment, and is optional. These elements are Name, DocumentTypeCode, WebURI. Name is the name of the attachment, and is optional. Name may be based on GDT LANGUAGEINDEPENDENT_Name. DocumentTypeCode is the coded description of the attachment document type, e.g. a help document or an product presentation, and is optional. DocumentTypeCode may be based on GDT DocumentTypeCode. WebURI is a Web uniform resource identifier for a document of any type that is related to the found product. WebURI may be based on GDT AttachmentWebURI. ProductText is unstructured, readable information that contains additional information for a found product, and is optional. ProductText may be based on GDT Text.

Business Object Document

Figure 123:
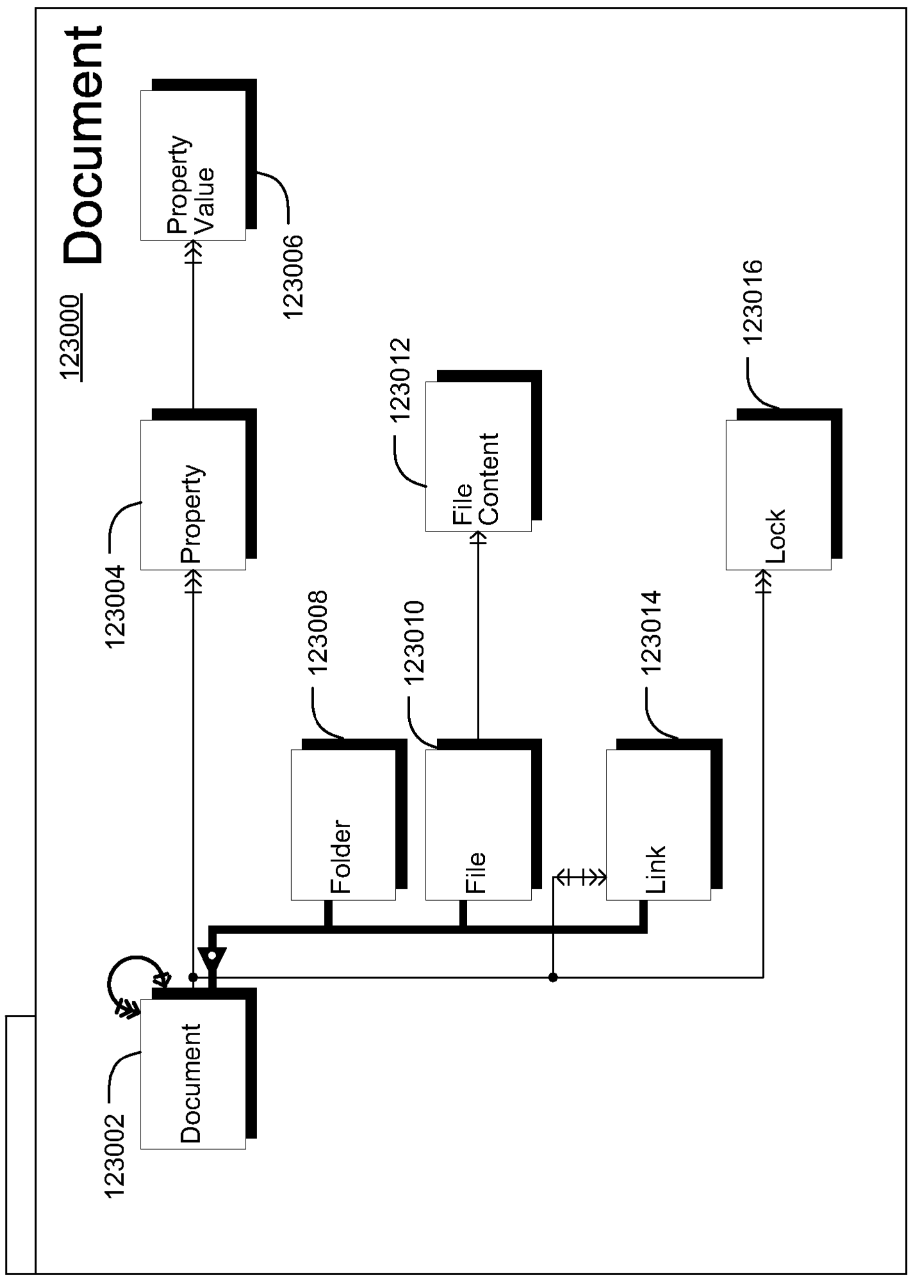

FIG. 123 illustrates one example of an Document business object model 123000. Specifically, this model depicts interactions among various hierarchical components of the Document.

Document is carrier of unstructured information and additional control and monitoring information. For example, the business object Document can be a generic object and can be available to some process components of some DUs. For example, the business object Document can be located in the foundation layer. A Document can include the properties of a document, persistent locks and the document content. Document is represented by the root node Document 123002.

Document (Root Node)

A Document (root) is a carrier of unstructured information and additional control and monitoring information. The root node represents a generalization for the respective actual instance, File, Folder or Link and represents all common properties of a document. Document can be used to complete and disjoint specializations, such as File, Folder, and Link. A file may contain unstructured information (the file content) and a descriptive characteristic. A folder may contain documents and files. Link is a reference to another document (internal link) within the Document Management System or reference to an external URL (external link). These specializations are grouped together in the ESR in a Document node and each specialization can be mapped via the attribute CategoryCode. The elements located directly at the node Document are defined by aGDT of type DocumentElements.

In certain implementations, these elements include: UUID, VersionID, SystemAdministrativeData, LinkInternalIndicator, CheckedOutIndicator, VisibleIndicator, VersioningEnabledIndicator, LinkToFolderIndicator, CategoryCode, TypeCode, MIMECode, PathName, Name, AlternativeName, HostObjectNodeReference, InternalLinkPathName, Description, ExternalLinkWebURI, FileContentURI, and FilesizeMeasure.

The UUID is universally a unique identifier of a document. UUID may be based on a GDT of type UUID. VersionID is a unique identifier of a document version and may be optional. VersionID may be based on a GDT of type VersionID. SystemAdministrativeData is administrative data that is stored in a system. SystemAdministrativeData may be based on a GDT of type SystemAdministrativeData. LinkInternalIndicator can specify whether or not a link is an internal link. LinkInternalIndicator may be based on a GDT of type Indicator and may have a Qualifier of Internal. CheckedOutIndicator can specify whether a document has been checked out and is being edited by someone locally or not. CheckedOutIndicator may be based on a GDT of type Indicator and may have a Qualifier of CheckedOut. VisibleIndicator can specify whether a document is visible or not. VisibleIndicator may be based on a GDT of type Indicator and may have a Qualifier of Visible. The VersioningEnabledIndicator can specify whether or not versioning has been activated for the document. VersioningEnabledIndicator may be based on a GDT of type Indicator and have a Qualifier of Enabled.

LinkToFolderIndicator can specify whether or not an internal link is a link to a folder. LinkToFolderIndicator may be based on a GDT of type Indicator and may have a Qualifier of LinkToFolder. CategoryCode can specify whether or not a document is a folder, a link or a file. CategoryCode may be based on a GDT of type DocumentCategoryCode. TypeCode defines the document type and thus the document's central settings and may be optional. TypeCode may be based on a GDT of type DocumentTypeCode. MIMECode can specify the MIMECode for a document. MIMECode may be based on a GDT of type MIMECode.

PathName can determine the PathName that is hierarchically structured and consists of the complete name of the folder in which the document is stored and the name of the document itself. The individual components are separated by a "/". PathName may be based on a GDT of type Name and may have a Qualifier of DocumentPath.

In some examples, a Name can specify the name of a document that identifies the document within its higher-level folder. For example, the Name is the same as the last component of the DocumentPathName. Some characters (apart from the separator "/") can be allowed in the name. In some implementations, the Name may be based on a GDT of type Name and may have a Qualifier of Document. AlternativeName can determine the language-independent name of a document and may be optional. AlternativeName may be based on a GDT of type Name and may have a Qualifier of DocumentAlternative.

HostObjectNodeReference can determine the name and reference of the Business Object in which Attachment Folder the linked Document is stored (if its an internal link to an Attachment of another Business Object) and may be optional. HostObjectNodeReference may be based on a GDT of type ObjectNodeReference. InternalLinkPathName can determine the name of the document that the link points to (if it is an internal link) and may be optional. InternalLinkPathName may be based on a GDT of type Name and may have a Qualifier of DocumentPath. In some examples, the Description can determine the language-independent description of a document and may be optional. Description is not language-dependent. Description may be based on a GDT of type Description.

ExternalLinkWebURI can be the destination URI (if the link can be external) and may be optional. ExternalLinkWebURI may be based on a GDT of type WebURI and may have a Qualifier of DocumentExternalLink. FileContentURI can be the URL for accessing unstructured data (file content) and may be optional. FileContentURL may be based on a GDT of type URI. FilesizeMeasure can specify the size of unstructured data (file content) and may be optional. FilesizeMeasure may be based on a GDT of type Measure may be based on Qualifier of Filesize.

In certain implementations, allowable values for the attribute UnitCode include the standard information technology codes may include Byte, Kilobyte, Megabyte, Gigabyte and Terabyte. In certain implementations, allowable values for UnitCode may include the codes in the following table:

| Common Code | Name | Representation Symbol |
|---|---|---|
| AD | Byte | B |
| 2P | Kilobyte | kB |
| 4L | Megabyte | MB |
| E34 | Gigabyte | GB |
| E35 | Terabyte | TB |

The following composition relationships to subordinate nodes can exist. Property 123004 has a cardinality relationship of 1:cn. Lock has a cardinality relationship of 1:cn.

There may be a number of aggregation relationships. From the Folder 123008 business object (or node) to the ParentFolder business object (or node) there may be a cardinality relationship of c:cn. ParentFolder specifies the higher-level directory.

From the business object Identity or node Root to the CreationIdentity business object (or node) there may be a cardinality relationship of 1:cn. CreationIdentity identifies the Identity that created the Document.

From the business object Identity or node Root business object (or node) to the LastChangeIdentity business object (or node) there may be a cardinality relationship of c:cn. LastChangeIdentity identifies the Identity that changed the Document.

From the Document business object (or node) to the VersionListDocument business object (or node) there may be a cardinality relationship of 1:cn. VersionListDocument specifies the list of all preceding document versions. A version is a distinction of documents according to the order in which they were created.

From the Document business object (or node) to the File 123010 business object (or node) there may be a cardinality relationship of 1:cn. File includes information used to provide access to all documents of the type File.

From the Document business object (or node) to the Folder business object (or node) there may be a cardinality relationship of 1:cn. Folder includes information used to provide access to all documents of the type Folder.

From the Document business object (or node) to the Link 123014 business object (or node) there may be a cardinality relationship of 1:cn. Link includes information used to provide access to all documents of the type Link.

The following elements that exist for the specialization File can include, MIMECode, FileContentURI, and FilesizeMeasure. The following elements that exist for the specialization internal Links include, LinkInternalIndicator, HostObjectNodeReference, InternalLinkDocumentPathName, and LinkToFolderIndicator (LinkInternalIndicator=True). For external Links it may include, LinkInternalIndicator and ExternalLinkWebURI (LinkInternalIndicator=False).

Enterprise Service Infrastructure Action checks out a document, and if a document is subject to version control, it has to be checked out before it can be changed. This action can include prerequisites and changes to the object. Prerequisites for example, can be that the document may be subject to version control (see element VersioningEnabledIndicator) and checked in. Changes to the object for example, are that for the document that is checked out the "CheckedOutIndicator" in the Document (root) node is set to "True".

In some implementations, UndoCheckout reverses the checkout of a document. This action can include, Prerequisites, and Changes to the object. Prerequisites for example, may be that the document is checked out by no other user and may have an exclusive lock for the document. Changes to the object for example, can be that the checkout operation is undone and that "CheckedOutIndicator" in the Document (root) node is set to "False".

In some implementations, Checkin checks in a document that was checked out previously, and creates a new document version. This action can include: Prerequisites and Changes to the object. Prerequisites for example, can be that the documents may be subject to version control (see element VersioningEnabledIndicator) and checked out. In certain implementations, no other user may have an exclusive look for the document. Changes to the object for example, can be that the "CheckedOutIndicator" in the Document (root) node is set to "False" and the current status of the document—including the lower-level nodes Property, PropertyValue 123006, and FileContent 123012—is saved as a new document version beneath the VersionListDocument association.

In some implementations, Lock 123016 creates a new lock for a document and depending on the lock type, it may prevent other users from changing the document. This action can include: Prerequisites, to the object, and parameters. Prerequisites for example, may be that no other users have an exclusive lock for the document. Changes to the object can be that, for example, a new node with type Lock that is created. Parameters can include the action elements that are defined by the data type, DocumentLockActionElements. In certain implementations these include: LockDepthCode, LockModeCode, and LockDuration. In some examples, the LockDepthCode may be based on a GDT of type LockDepthCode. LockModeCode may be based on GDT: LockModeCode. LockDuration and may be based on a GDT of type Duration and may have a qualifier of Lock.

In some implementations, SetAsCurrentVersion makes the selected version the current version. In some implementations, prerequisites, for example, may be that no other users and may have an exclusive lock for the document, or that the selected document can not be the current version. Changes to the object, for example, can be the current status of the document—including the lower-level nodes Property, PropertyValue, and FileContent—that is saved as the new document version beneath the VersionListDocument association. The data for the current document version is then overwritten with the data from the selected document version. In the process, the Document (root) node—including the lower-level nodes Property, PropertyValue, and FileContent—are overwritten with the corresponding data from the document version.

In some implementations, Copy copies a document to the specified target folder. This action can include: Prerequisites, Changes to the object, and Parameters. Prerequisites can be that, for example, no other user may have an exclusive lock for the specified target folder. Changes to the object can be that, for example, the Document business object—including the lower-level nodes Property, PropertyValue, FileContent, and Children is copied. A new Document node is created beneath the Children association in the specified target folder. Parameters can include the action elements that are defined by the data type, DocumentCopyActionElements. In certain implementations these include: ParentDocumentPathName and Name.

In some implementations, ParentDocumentPathName can determine the full name of the folder into which the document will be copied and may be optional. If no ParentDocumentPathName is specified, the document is copied within the same folder. In some implementations, parameter Name can be specified in this case. ParentDocumentPathName may be based on a GDT of type Name and may have a Qualifier of DocumentPath.

In some implementations, Name can specify the name of the new document within its higher-level folder and may be optional. If no Name is specified, the document is created with the same name in the target folder. In some implementations, parameter ParentDocumentPathName can be specified in this case. Name may be based on a GDT of type Name and may have a Qualifier of Document.

In some implementations, Move transfers a document to the specified target folder. This action can include: Prerequisites, Changes to the object and Parameters. Prerequisites can include, for example, that no other users may have an exclusive lock for the document itself or the specified target folder. Changes to the object can include, for example, that the corresponding Document business object—including its lower-level nodes Property, PropertyValue, FileContent, and Children is deleted beneath the Children association and created beneath the Children association in the specified target folder. Parameters can include the action elements that are defined by the data type DocumentMoveActionElements. In certain implementations these include ParentDocumentPathName and Name. For example, ParentDocumentPathName can determine the full name of the folder into which the document will be moved and may be optional. If no ParentDocumentPathName is specified, the document is renamed within the same folder. In some implementations, parameter Name can be specified in this case. ParentDocumentPathName may be based on a GDT of type Name and may have a Qualifier of DocumentPath. For example, Name can specify the name of the new document within its higher-level folder and may be optional. If no Name is specified, the document is created with the same name in the target folder. In some implementations, parameter ParentDocumentPathName can be specified in this case. Name may be based on a GDT of type Name and may have a Qualifier of Document.

In some implementations, CreateFolder creates a new document with category Folder within the current folder. This action is only available for specialization Folder. This action may include: Prerequisites, Changes to the object and Parameters. Prerequisites can include, for example, that no other user may have an exclusive lock for the current folder. Changes to the object can include, for example, that a new Document business object with CategoryCode=1 is created beneath the Children association. Parameters can include the action elements that are defined by the data type DocumentCreateFolderActionElements. In certain implementations these include: TypeCode, Name, AlternativeName, and Description.

In some examples, TypeCode may be based on a GDT of type DocumentTypeCode and may be optional. Name may be based on a GDT of type Name and may have a Qualifier of Document. AlternativeName may be based on a GDT of type Name and may have a Qualifier of DocumentAlternative and may be optional. Description may be based on a GDT of type Description and may be optional.

In some implementations, CreateFile creates a new document with category File within the current folder. This action is only available for specialization Folder. This action can include: Prerequisites, Changes to the object, and Parameters. Prerequisites can include, for example, that no other user may have an exclusive lock for the current folder. Changes to the object can include, for example, that a new Document business object with CategoryCode=2 is created beneath the Children association. Parameters can include the action elements that are defined by data type DocumentCreateFileActionElements. In certain implementations these include: TypeCode, Name, AlternativeName, Description, and BinaryObject.

In some implementations, TypeCode may be based on a GDT of type DocumentTypeCode and may be optional. Name may be based on a GDT of type Name and may have a Qualifier of Document. AlternativeName may be based on a GDT of type Name and may have a Qualifier of DocumentAlternative and may be optional. Description may be based on a GDT of type Description and may be optional. BinaryObject may be based on a GDT of type BinaryObject and may have a qualifier of FileContent and may be optional.

In some implementations, CreateLink creates a new document with category Link within the current folder. This action is only available for specialization Folder. This action can include: Prerequisites, Changes to the object, and Parameters. Prerequisites can include, for example, that no other user may have an exclusive lock for the current folder. Changes to the object can include, for example, that a new Document business object with CategoryCode=3 is created beneath the Children association. Parameters can include the action elements that are defined by the data type, DocumentCreateLinkActionElements. In certain implementations these include: LinkInternalIndicator, TypeCode, Name, AlternativeName, Description, HostObjectNodeReference, InternalLinkPathName, and ExternalLinkWebURI.

In some examples, LinkInternalIndicator may be based on a GDT of type Indicator and may have a Qualifier of Internal and may be optional. TypeCode may be based on a GDT of type DocumentTypeCode and may be optional. Name may be based on a GDT of type Name and may have a Qualifier of Document. AlternativeName may be based on a GDT of type Name and may have a Qualifier of DocumentAlternative and may be optional. Description may be based on a GDT of type Description and may be optional.

In some examples, HostObjectNodeReference can determine the name and Reference of the Business Object in which Attachment Folder the linked Document is stored (e.g., if its an internal link to an Attachment of another Business Object) and may be optional. HostObjectNodeReference may be based on GDT ObjectNodeReference.

In some examples, InternalLinkPathName may be based on a GDT of type Name and may have a Qualifier of DocumentPathName and may be optional. ExternalLinkWebURL may be based on a GDT of type WebURI may have a Qualifier of DocumentExternalLink and may be optional.

In some implementations, CheckIfFileContentModifiable checks whether the file content of a document can be changed directly through the FileContentURI. If the file content cannot be changed, an error message is returned. The FileContentURI may be used directly to change the file content in certain scenarios because the file content can involve extremely large data volumes.

In some implementations, FinishFileContentModification completes a direct change of the file content of a document that was executed directly through the FileContentURI. In some implementations, the FileContentURI can be used directly to change the file content in certain scenarios because the file content can involve extremely large data volumes. In some implementations, this action can be only available for specialization File. This can include: Prerequisites and Changes to the object. Prerequisites can include, for example, that the action can only be performed if action CheckIfFileContentModifiable was called previously. Changes to the object can include, for example, that are elements FilesizeMeasure, MimeCode, and FileContentURI that are changed in the Document (root) node. The BinaryObject element can be changed in the FileContent node.

In some implementations, CheckIfFileContentModifiable checks whether the file content of a document can be read directly through the FileContentURI. If the file content cannot be read, an error message can be returned. The FileContentURI may be used directly to read the file content in certain scenarios because the file content can involve extremely large data volumes. This action can be available for specialization file.

In some implementations, the Document include QueryByElements that can return a list of documents in which the values of the specified elements agree with the values of the query elements. The query elements can be defined by data type, DocumentElementsQueryElements. In certain implementations these include: ParentDocumentPathName, UUID, CategoryCode, TypeCode, PathName, Name, AlternativeName, Description, SearchText, and PropertySearchText.

In some examples, ParentDocumentPathName defines the folder from which the search will be performed and may be optional. If no folder is specified, the search is executed for all subordinate documents beneath the root node ("/"). ParentDocumentPathName may be based on a GDT of type DocumentPathName.

In some implementations, the UUID may be based on a GDT of type UUID and may be optional. CategoryCode may be based on a GDT of type DocumentCategoryCode and may be optional. TypeCode may be based on a GDT of type DocumentTypeCode and may be optional. PathName may be based on a GDT of type Name and may have a Qualifier of DocumentPath and may be optional. Name may be based on a GDT of type Name and may have a Qualifier a Document and may be optional. AlternativeName may be based on a GDT of type Name and may have a Qualifier of DocumentAlternative. Description may be based on a GDT of type Description and may be optional. SearchText can determine the SearchText that defines a search string to find within the binary document content and may be optional. SearchText may be based on a GDT of type SearchText. PropertySearchText can determine the SearchText that defines a text to find within the binary document properties and may be optional. PropertySearchText may be based on a GDT of type SearchText.

Folder

A Folder is a specialization of a document and is a container for documents (folder, files and links). A Folder may also contain additional control and monitoring information. Folders enable the organization and structuring of documents within the Document Management System. Documents for a certain subject area for example, can all be saved in an appropriately named folder. Such a structure facilitates the navigation and search for these objects. The elements located directly at the node Folder are defined by a GDT of type DocumentElements. There may be a number of inbound aggregation relationships. From the Document business object (or node) to the Children business object (or node) there may be a cardinality relationship of c:cn. Children Specifies the documents that are stored in this folder.

File

A File is a specialization of a document and a carrier of unstructured data and additional control and monitoring information. A File can be a product specification that is written in MS Word and may also contain additional information such as document type, description, author and status. The elements located directly at the node File are defined by the type a GDT of type DocumentElements. The following composition relationships to subordinate nodes exist. FileContent has a cardinality relationship of 1:c.

FileContent

FileContent is the unstructured information of a document; meaning the actual document content. This node was added because under certain circumstances, this can involve very large data volumes and determining this data can lead to performance problems. FileContent contains, for example, the Word document (as XSTRING) in which the above-mentioned product specification is stored. The elements located directly at the node File are defined by a GDT of type DocumentFileContentElements. In certain implementations these elements include: BinaryObject.

In some implementations, BinaryObject describes the unstructured data in binary form. BinaryObject may be based on a GDT of type BinaryObject and may have a Qualifier of FileContent. The attributes from the GDT of type BinaryObject are mimeCode, specification of the corresponding MIMECode.

Link

A Link is a specialization of a document that is either a reference to another document (folder or file) within the Document Management System or to an external URL. In addition, a Link contains additional monitoring and control information. An internal Link “Product Specification” is stored in a project folder and points to a document that is stored in another folder. The elements located directly at the node Link are defined by a GDT of type DocumentElements.

There may be a number of aggregation relationships. From the LinkedDocument business object (or node) to the Document business object (or node) there may be a cardinality relationship of cn:c. LinkedDocument specifies the document to which the internal Link points.

Property

A Property is the description of a document characteristic or property. A Property may contain a unique name, data type, a description, as well as additional control information. It may also have several values. A Property is, for example, the “drawing format”, that describes the DIN format for a construction drawing. The elements located directly at the node Property are defined by the type, a GDT of type DocumentPropertyElements. In certain implementations these elements include: DataTypeFormatCode, Name, VisibleIndicator, ChangeAllowedIndicator, MultipleValueIndicator, NamespaceURI, Description, PropertyKey, Namespace, and Name. In some implementations, Name can specify the name of a document property, which identifies the property within its namespace. Name may be based on a GDT of type Name and may have a Qualifier: DocumentProperty.

DataTypeFormatCode is a coded representation of the data type of a property. DataTypeFormatCode may be based on a GDT of type PropertyDataTypeFormatCode. Only the following values from the PropertyDataTypeFormatCode code list are allowed for the DataTypeFormatCode element. The code can include: Boolean, DateTime, Integer, and String. In some implementations, VisibleIndicator can specify whether or not a property is visible. VisibleIndicator may be based on a GDT of type Indicator and may have a Qualifier of Visible.

ChangeAllowedIndicator can specify whether or not a user can change the document property. Properties created and maintained by the system, for example, cannot be changed by a user. ChangeAllowedIndicator may be based on a GDT of type Indicator and may have a Qualifier of ChangeAllowed.

MultipleValueIndicator can specify whether or not a property can include a list of values. MultipleValueIndicator may be based on a GDT of type Indicator and may have a Qualifier of PropertyMultipleValue.

NamespaceURI can specify the namespace for the property. Each property is assigned a namespace, in order to avoid conflicting names when defining properties. In some implementations, NamespaceURI may be based on a GDT of type NamespaceURI.

Description can determine the language-independent description of a document property and may be optional. Description may be based on a GDT of type Description. PropertyKey is the key for a document property. Namespace can specify the namespace for the property. Namespace may be based on a GDT of type NamespaceURI. In some implementations, Name can specify the name of a document property, which identifies the property within its namespace. Name may be based on a GDT of type Name and may have a Qualifier: DocumentProperty. The following composition relationships to subordinate nodes exist. PropertyValue has a cardinality relationship of 1:cn.

PropertyValue

PropertyValue is a value that is assigned to a Property. The value for Property “Drawing format” is, for example, DIN A4. The elements located directly at the node PropertyValue are defined by a GDT of type DocumentPropertyValueElements. In certain implementations these elements include: Text, Indicator, DateTime, and IntegerValue.

Text can determine the value of the property, if the property is “String” type. Text may be based on a GDT of type Text and may be optional. Indicator can determine the value of the property, if the property is “Boolean” type. Indicator may be based on a GDT of type Indicator and may be optional. DateTime can determine the value of the property, if the property is “DateTime” type. DateTime may be based on a GDT of type DateTime and may be optional. IntegerValue can determine the value of the property, if the property is “Integer” type. IntegerValue may be based on a GDT of type IntegerValue and may be optional.

Lock

A DocumentLock is a (persistent) restriction placed on access to a document. The type of restriction can either be exclusive or shared. Exclusive locks prevent any other locks being set. Shared locks, on the other hand, also allow other users to set shared locks. Several persistent locks of different types can be set for a document. For example, if a user wants to edit a document offline, to do this, he or she may check out the document. As this editing process might take some time, a persistent exclusive lock has to be set for the document. This protects the document from changes made by other users. The elements located directly at the node Lock are defined by a GDT of type DocumentLockElements. In certain implementations these elements include: ID, IdentityUUID, DepthCode, ModeCode, CreationDateTime, Duration, and ExpirationDateTime.

ID is a unique identifier of the lock. ID may be based on a GDT of type DocumentLockID. IdentityUUID can specify the identity of the user who sets the lock. IdentityUUID may be based on a GDT of type UUID. DepthCode can determine the DepthCode that can specify the value of the "depth" of the lock. A lock can apply to an individual document or to an entire folder hierarchy. DepthCode may be based on a GDT of type LockDepthCode. ModeCode can specify a LockModeCode that is the coded representation of the mode of an object lock. ModeCode may be based on a GDT of type LockModeCode. CreationDateTime can determine the time at which the lock was created. CreationDateTime may be based on a GDT of type DateTime and may have a Qualifier of Creation. Duration defines a lock's period of validity in milliseconds. Duration may be based on a GDT of type Duration and may have a Qualifier of Lock. ExpirationDateTime defines a lock's period of validity. ExpirationDateTime my be based on a GDT of type DateTime and may have a Qualifier of Expiration.

There may be a number of inbound aggregation relationships. From the business object Identity/node Root to the LockIdentity business object (or node) there may be a cardinality relationship of 1:cn. LockIdentity Identifies the Identity that created the Lock.

Enterprise-Service-Infrastructure-Actions

UnLock removes a document lock and this action can include: Prerequisites and Changes to the object. Prerequisites can include, for example, that the lock can only be removed by the user who set it or from another authorized person, such as an administrator. Changes to the object can include, for example, that the node with the type Lock that is deleted.

Business Object Employment

Figure 124:
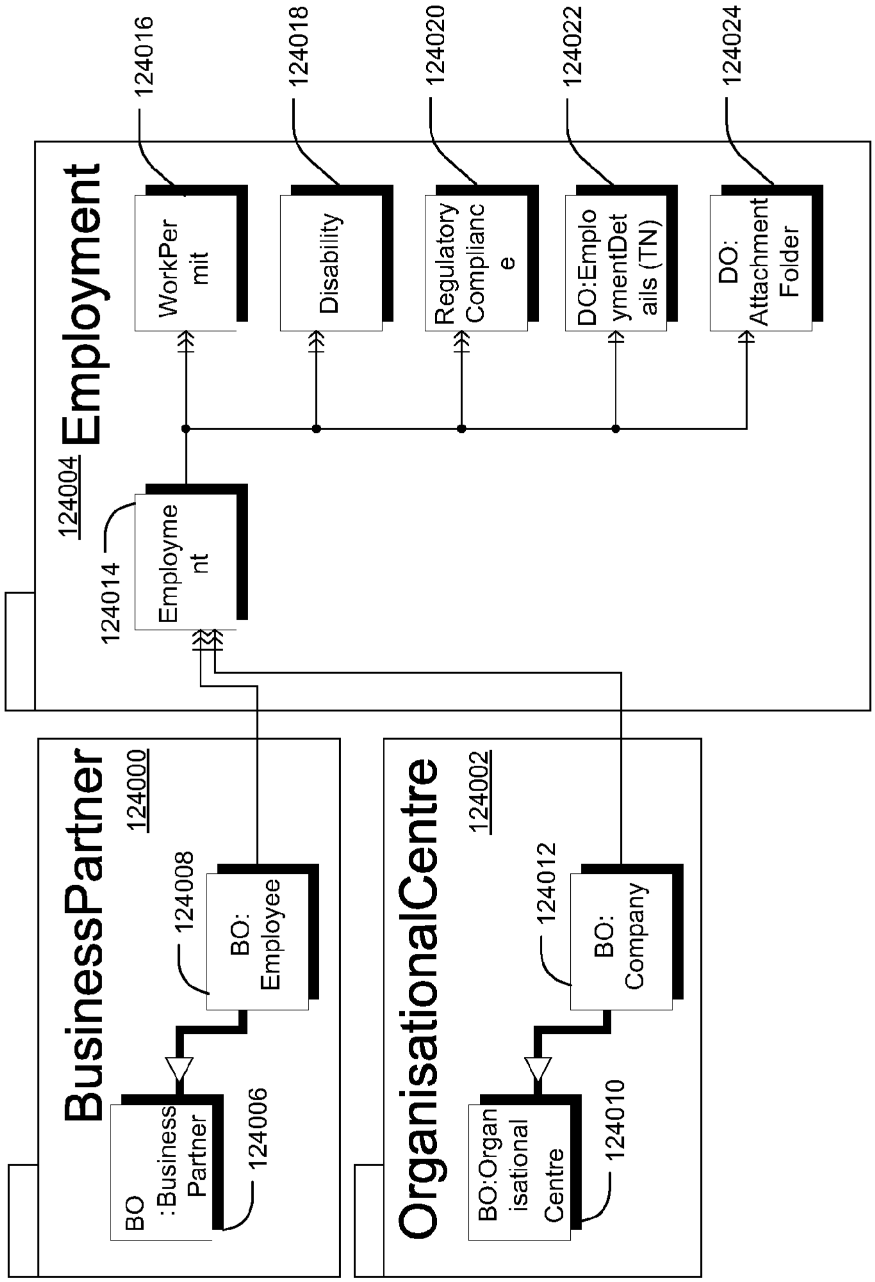

FIG. 124 illustrates an example Employment business object model 124004. Specifically, this model depicts interactions among various hierarchical components of the Employment, as well as external components that interact with the Employment (shown here as 124000 through 124002 and 124006 through 124012).

An employment is the relationship which comes into being by virtue of one or more valid work agreements. Whereas the work agreement consists only of the specific labor-related arrangements agreed between company and employee, the employment encompasses the entire legal relationship between the contracting parties. The business object Employment is part of the process component Human Capital Master Data Management in the foundation layer. The employment object contains data which is relevant for all work agreements an employee has with a specific company (as employer), such as work permit, disability and regulatory compliance.

An Employment 124014 (root) is the relationship between the company (as employer) and the employee which takes in all related work agreements. The Employment contains relevant data to identify the business object itself and contains also the relationship to the Company (as employer) and Employee. The elements located directly at the node Employment are defined by the type GDT: EmploymentElements. These elements are: UUID, CompanyUUID, EmployeeUUID, CountryCode, MigratedDataAdaptationTypeCode, and SystemAdministrativeData. A UUID is a unique ID that identifies exactly one employment and is a GDT of type UUID. A CompanyUUID is a unique ID that identifies exactly one company and is a GDT of type UUID. The EmployeeUUID is a unique ID that identifies exactly one employee and is a GDT of type UUID. The CountryCode is a coded representation of a country defined by either national or administrative/political borders. The MigratedDataAdaptationTypeCode is a coded representation of the type of data adaptation performed during migration of Employment data. When migrating data from a source system to a target system this data may be adapted, for example, a business object or business document may be taken over completely or partially. The MigratedDataAdaptationTypeCode is used, when an Employment of an Employee is migrated. The MigratedDataAdaptationTypeCode is a GDT of type MigratedDataAdaptationTypeCode, and is optional. SystemAdministrativeData describes who has created or changed an instance of Employment and when, and is a GDT of type SystemAdministrativeData.

A WorkPermit 124016 has a cardinality of 1:cn. The filter elements are defined by the data type EmploymentWorkPermitFilterElements. These elements are ValidityPeriod, and RelativePeriodCode. ValidityPeriod is a GDT of type DatePeriod, in some implementations has a restriction of CLOSED, and is optional. RelativePeriodCode is a GDT of type CURRENTDAYFROMTODAYON_RelativePeriodCode, and is optional.

A Disability 124018 has a cardinality of 1:cn. The filter elements are defined by the data type EmploymentDisabilityFilterElements. These elements are ValidityPeriod and RelativePeriodCode.

ValidityPeriod is a GDT of type DatePeriod, in some implementations has the restriction CLOSED, and is optional. RelativePeriodCode is a GDT of type CURRENTDAYFROMTODAYON_RelativePeriodCode, and is optional.

A RegulatoryCompliance 124020 has a cardinality of 1:cn. The filter elements are defined by the data type EmploymentRegulatoryComplianceFilterElements. These elements are ValidityPeriod, and RelativePeriodCode. ValidityPeriod is a GDT of type DatePeriod, in some implementations has the restriction CLOSED, and is optional. RelativePeriodCode is a GDT of type CURRENTDAYFROMTODAYON_RelativePeriodCode, and is optional.

An AttachmentFolder 124024 has a cardinality of 1:c. EmployeeDetails 124022 has a cardinality of 1:c. An AccessControlList has a cardinality of 1:c.

A Company has a cardinality of 1:cn. A Company is the Company employing the employee. An Employee has a cardinality of 1:cn. An Employee is the Employee being employed by the company.

A CreationIdentity has a cardinality of 1:cn. A CreationIndentity is an association from the identity, which has created the Employment. A LastChangeIdentity has a cardinality of 1:cn. The LastChangeIdentity is an association from the identity, which was the last changer of the Employment.

A WorkAgreement has a cardinality of 1:n. One Employment can refer to one or more WorkAgreements.

A QueryByElements provides a list of all Employments which satisfy the selection criteria, specified by the query elements, combined by logical "AND". The GDT EmploymentElementsQueryElements defines the query elements CompanyUUID, EmployeeUUID and CountryCode. CompanyUUID is a GDT of type UUID, and is optional. EmployeeUUID is a GDT of type UUID, and is optional. CountryCode is a GDT of type CountryCode, and is optional.

QueryByEmployeeDetails provides a list of all employments of an employee which satisfy the selection criteria, specified by the query elements, combined by logical "AND". The GDT EmploymentEmployeeDetailsQueryElements defines the query elements EmployeeID, EmployeeFamilyName, EmployeeGivenName, EmployeeGenderCode, EmployeeNationalityCountryCode, CompanyID, PositionID, JobID, ReportingLineUnitID, OrganisationalCentreID, CostCenterID, PermanentEstablishmentID, ManagerID, WorkAgreementTypeCode, WorkAgreementAdministrativeCategoryCode, and HiringDate. An EmployeeID is the ID of the employee that holds the Employment matches to the query element EmployeeID, is a GDT of type EmployeeID, and is optional. An EmployeeFamilyName is the family name of the employee that holds the Employment matches to the query element EmployeeFamilyName, is a GDT of type Name, LANGUAGEINDEPENDENT_MEDIUM_Name, and is optional. An EmployeeGivenName is the given name of the employee that holds the Employment matches to the query element EmployeeGivenName, is a GDT of type Name LANGUAGEINDEPENDENT_MEDIUM_Name, and is Optional. An EmployeeGenderCode is the gender code of the employee that holds the Employment matches the query element EmployeeGenderCode, is a GDT of type EmployeeGenderCode, and is optional. An EmployeeNationalityCountryCode is the nationality of the Employee that holds the Employment matches the query element EmployeeNationality, is a GDT of type CountryCode and is optional. A CompanyID is he ID of the company (employer) of the Employment matches the query element CompanyID, is a GDT of type OrganisationalCentreID and is optional. A PositionID is The ID of the position assigned via the Employment matches to the query element PositionID, is a GDT of type PositionID, and is optional. A JobID is the ID of the job assigned via the Employment matches to the query element JobID, is a GDT of type JobID, and is optional. A ReportingLineUnitID is the ID of the reporting line unit assigned via the Employment matches to the query element ReportingLineUnitID, is a GDT of type OrganisationalCentreID and is optional. An OrganisationalCentreID is the ID of the OrganizationalCentre assigned via the Employment matches to the query element OrganisationalCentreID, is a GDT of type OrganisationalCentreID and is optional. A CostCenterID is the ID of the cost center assigned to the employee by the Employment matches to the query element CostCenterID, is a GDT of type OrganisationalCentreID and is optional. A PermanentEstablishmentID is the ID of the permanent establishment assigned via the Employment matches to the query element PermanentEstablishmentID, is a GDT of type OrganisationalCentreID and is optional. A ManagerID is the ID of the manager of the employee that holds Employment matches to the query element ManagerID, is a GDT of type EmployeeID, and is optional. A WorkAgreementTypeCode is the type of a work agreement of the employment matches the query element WorkAgreementTypeCode, is a GDT of type WorkAgreementTypeCode, and is optional. A WorkAgreementAdministrativeCategoryCode is the administrative category of a work agreement of the employment matches the query element WorkAgreementAdministrativeCategoryCode is a GDT of type WorkAgreementAdministrativeCategoryCode, and is optional. A HiringDate is the begin date of a work agreement of the employment matches to the query element HiringDate, is a GDT of type Date, and is optional.

A WorkPermit is the permission issued by an authority of a certain country to a foreign person allowing this person to work for a defined period of time. The WorkPermit can be used to perform a check of the validity period. For example, the US IMMIGRATION REFORM AND CONTROL ACT OF 1986 http://www.usda.gov/agency/oce/oce/labor-affairs/ircasumm.htm requires companies (as employer) in the US to control residence and work permits of their employees. The elements located directly at the node WorkPermit are defined by the type GDT: EmploymentWorkPermitElements. These elements are ValidityPeriod. The ValidityPeriod is the validity period of the work permit, is a GDT of type CLOSED_DatePeriod, and in some implementations has a Qualifier of Validity.

The action Delimit delimits WorkPermit by setting the end date of its ValidityPeriod to the parameter value. There are no preconditions. Changes to the Objects include if the date provided as action parameter is between the WorkPermit ValidityPeriod start date and end date, the end date is set to the parameter date. Otherwise, the change is refused by issuing an error message. Parameters include the action elements are defined by the data type DelimitActionElements. These elements are EndDate. EndDate is a GDT of type Date.

A Disability is the description of an employee's physical or mental disability. The Disability contains information about the disability that the employer is obliged to maintain because of legal obligations. These obligations exist in several countries. The elements located directly at the node Disability are defined by the type GDT: EmploymentDisabilityElements. These elements are: ValidityPeriod, CertificateIssuingAuthorityTypeCode, CertificateIssuingAuthorityLocationName, PersonDisabilityCertificateID, and CertificateIssueDate.

The ValidityPeriod is the validity period of the disability, is a GDT of type CLOSED_DatePeriod, and in some implementations has a Qualifier of Validity. The CertificateIssuingAuthorityTypeCode is a code representing the type of authority that has issued the disability certificate, is a GDT of type AuthorityTypeCode, and is optional. The CertificateIssuingAuthorityLocationName is the name of the location of the authority that has issued the disability certificate, is a GDT of type LANGUAGEINDEPENDENT_MEDIUM_Name, and is optional. The PersonDisabilityCertificateID is the ID that identifies the certificate documenting a person's disability, is a GDT of type PersonDisabilityCertificateID, and is optional. The CertificateIssueDate is the date of issue for the certificate documenting a person's disability, is a GDT of type Date, in some implementations has a Qualifier of Issue), and is optional.

The action delimits disability by setting the end date of its ValidityPeriod to the parameter value. There are no preconditions. Changes to the Objects include if the date provided as action parameter is between the Disability ValidityPeriod start date and end date, the end date is set to the parameter date. Otherwise, the change is refused by issuing an error message. Parameters include the action elements are defined by the data type DelimitActionElements.

RegulatoryCompliance is the representation of country-specific requirements which govern employers' compliance with legislation regulating employment. The elements located directly at the node RegulatoryCompliance are defined by the type GDT: EmploymentRegulatoryComplianceElements. These elements are ValidityPeriod. The ValidityPeriod is the validity period of the regulatory compliance, is a GDT of CLOSED_DatePeriod, and in some implementations has Qualifier of Validity.

Country specific fields will be added in Globalization Layer.

The action delimit delimits RegulatoryCompliance by setting the end date of its ValidityPeriod to the parameter value. There are no preconditions. Changes to the Objects include if the date provided as action parameter is between the RegulatoryCompliance ValidityPeriod start date and end date, the end date is set to the parameter date. Otherwise, the change is refused by issuing an error message. Parameters includeThe action elements are defined by the data type DelimitActionElements.

An AttachmentFolder is the folder that may contain documents for an employment and its associated work agreements. Examples are work permit, disability certificate, curriculum vitae, work contract and birth certificate.

An EmployeeDetails is a compilation of detailed data of the employee that holds the employment, This is a read-only node. This transformation node is used to facilitate creation of employee lists. The elements located directly at the node EmployeeDetails are defined by the type GDT: EmploymentEmployeeDetailsElements. These elements are: EmployeeID, EmployeeFamilyName, EmployeeGivenName, BirthDate, PhoneNumber, Email, ManagerFormattedName, EntryDate, LengthOfServiceDuration, and ReportingLineUnitName. An EmployeeID is the ID of the employee that holds the Employment. Employee ID corresponds to EmployeeID of Employee BO valid for the current date, is a GDT of type EmployeeID, and is optional. An EmployeeFamilyName is the family name of the employee that holds the Employment, is a GDT of type. LANGUAGEINDEPENDENT_MEDIUM_Name, and is optional. EmployeeFamilyName corresponds to Employee Family Name of Employee BO valid for the current date. EmployeeGivenName, the given name of the employee that holds the Employment, is a GDT of type Name, LANGUAGEINDEPENDENT_MEDIUM_Name), and is optional. EmployeeGivenName corresponds to Employee Given Name of Employee BO valid for the current date. The BirthDate is the date on which the employee that holds the Employment, is born. BirthDate corresponds to Birth Date of Employee BO valid for the current date, is a GDT of type Date, in some implementations has a Qualifier of Birth, and is optional. The PhoneNumber is the phone number of the employee that holds the Employment. PhoneNumber corresponds to PhoneNumber of Address DO of Employee BO valid for the current date, is a GDT of type LANGUAGEINDEPENDENT_SHORT_Description and is optional. Email is The Email of the Employee that holds the Employment. Email corresponds to Email of Address DO of Employee BO valid for the current date, is a GDT of type EmailURI, and is optional. The ManagerFormattedName is the formatted name of the manager of the employee that holds the Employment. The ManagerFormattedName corresponds to FormattedName of Employee BO valid for the current date, is a GDT of type LANGUAGEINDEPENDENT_LONG_Name, and is optional. The EntryDate is the entry date of the first work-agreement of the Employment, adjusted by periods of non-employment. The EntryDate is the calculated AdjustedServiceDate of the first WorkAgreement at the Employment BO valid for the current date, is a GDT of type Date, in some implementations has a Qualifier of Entry, and is optional. The LengthOfService is the duration for which an employee that holds the Employment, has served the company. LengthOfServiceduration is the duration derived by finding the difference between the EntryDate and the Current Date, is a GDT of type YEAR_Duration and is optional. The ReportingLineUnitName is the name describing the reporting line unit the employee is assigned to. ReportingLineUnitName corresponds to the name of the ReportingLineUnit BO valid for the current date, is a GDT of type MEDIUM_Name), and is optional.

The AccessControlList is a list of access groups that have access to an Employment during a validity period.

Business Object Employment

An employment is the relationship which comes into being by virtue of one or more valid work agreements. Whereas the work agreement consists only of the specific labor-related arrangements agreed between company and employee, the employment encompasses the entire legal relationship between the contracting parties. The CN extension of Employment captures additional information regarding the regulatory compliance.

Node Structure of Business Object Employment is the node that is enhanced with Chinese specific information is RegulatoryCompliance. All other nodes of the Employment remain the same. For all GDTs with CountryCode in their context structure, the following restriction may apply: values with listID valid for CN are allowed.

RegulatoryCompliance is the representation of country-specific requirements which govern employers' compliance with legislation regulating employment. In CN, the employer also stores race and the political party affiliations of the employee. The elements added to the node RegulatoryCompliance are defined by the data type enhancement structure: EmploymentRegulatoryCompli-anceCN_ExtensionElements. These elements are PoliticalPartyAffiliationTypeCode, and PersonRaceEthnicityCode. A PoliticalPartyAffiliationTypeCode is a coded representation of the type of affiliation to a political party, according to country specific criteria, is a GDT of type PoliticalPartyAffiliationTypeCode, and is optional. The PersonRaceEthnicityCode is the code representing the racial or ethnic background of an employee, is a GDT of type PersonRaceEthnicityCode, and is optional.

Business Object Employment

An employment is the relationship which comes into being by virtue of one or more valid work agreements. Whereas the work agreement consists only of the specific labor-related arrangements agreed between company and employee, the employment encompasses the entire legal relationship between the contracting parties. The DE extension of Employment captures additional information about the disability of an employee.

The only node that is enhanced with information specific to Germany (DE) is the Disability Node. All other nodes of the Employment remain the same. For all GDTs with CountryCode in their context structure, the following restriction may apply: values with listID valid for Germany are allowed.

A Disability is the description of an employee's physical or mental disability. The Disability contains information about the disability that the employer is obliged to maintain because of legal obligations. These obligations exist in several countries. In Germany, additional data about the disability has to be maintained by the employer. The elements added directly at the node Disability are defined by the data type enhancement structure: EmploymentDisabilityDE_ExtensionElements. These elements are DisabledPersonGroupCode, PersonDisabilityPercent, SuspensionDate, DisabledPersonCertificateTypeCode, DisabledPersonStatisticExceptionReasonCode, DisabledPersonWorkCapabilityLimitationCode, and WeightingDecimalValue. The DisabledPersonGroupCode is the coded representation of the disability group to which a disabled employed person belongs, is a GDT of type DisabledPersonGroupCode, in some implementations has a restriction of values from the code list for Germany are allowed and is optional. The PersonDisabilityPercent is the degree of the disability of the employee expressed as percentage value, is a GDT of type SMALLNONNEGATIVE_Percent, in some implementations may have a Qualifier of PersonDisability and is optional. The SuspensionDate is the date of expiry for the certificate documenting the employee's disability, is a GDT of type Date, in some implementations has a Qualifier of Suspension, and is optional. The DisabledPersonCertificateTypeCode is the coded representation of the type of certificate attesting the employee's disability, is a GDT of type DisabledPersonCertificateTypeCode, in some implementations may have a restriction of values from the code list for Germany are allowed, and is optional. The DisabledPersonStatisticExceptionReasonCode is the coded representation of the reason for an exception from the statistical data collection for the disabled employee, is a GDT of type DisabledPersonStatisticExceptionReasonCode and is optional.

The DisabledPersonWorkCapabilityLimitationCode is the coded representation of the limitation of the disabled employee's work capability, is a GDT of type DisabledPersonWorkCapabilityLimitationCode, in some implementations may have a restriction of values from the code list for Germany are allowed, and is optional. The WeightingDecimalValue is a decimal value that corresponds to the number of positions occupied by a disabled person in fulltime employment of those positions that are reserved for disabled employees in a company. The possible values of the WeightingDecimalValue are defined by the disability group to which the employee belongs. For example, A disabled employee belongs to the disability group MSBA (severely disabled trainee with multiple employment relationships). This disability group permits a statutory WeightingDecimalValue between 2.0 and 3.0. The employee has a WeightingDecimalValue of 3.0 and a capacity utilization level of 0.5. In this case, the employee occupies 1.5 positions reserved for disabled persons in the company. Legal requirements stipulate that positions in a company that are designated as reserved for disabled persons can only be occupied by employees with disabilities. The positions referred to are not specific positions, but rather a specific number of positions determined on the basis of the total number of positions in the company or based on other company criteria. Thus, a position that is reserved for disabled employees does not refer to a specific position. For example, Companies with an annual average of at least 20 positions a month can as a rule reserve at least 5 percent of their positions for disabled employees. In this case, the number of positions reserved for disabled employees in a company with an average of 50 employees a year would be 2.5 positions. The WeightingDecimalValue is a GDT of type VERYSMALLNONNEGATIVE_DecimalValue, and is optional.

Business Object Employment

An employment is the relationship which comes into being by virtue of one or more valid work agreements. Whereas the work agreement consists only of the specific labor-related arrangements agreed between company and employee, the employment encompasses the entire legal relationship between the contracting parties. The Employment FR extension captures additional information specific for France. The only node that is enhanced with information specific to France (FR) is the Disability Node. All other nodes of the Employment remain the same. For all GDTs with CountryCode in their context structure, the following restriction applies: Only values with listID valid for France are allowed.

A Disability is the description of an employee's physical or mental disability. The Disability contains information about the disability that the employer is obliged to maintain because of legal obligations. These obligations exist in several countries. In France, additional data about the disability has to be maintained by the employer. The elements added directly at the node Disability are defined by the data type enhancement structure: EmploymentDisabilityFR_ExtensionElements. These elements are DisabledPersonGroupCode and PersonDisabilityPercent. The DisabledPersonGroupCode denotes the group of a disabled person, is a GDT of type DisabledPersonGroupCode and is optional. The PersonDisabilityPercent is the degree of the disability of the employee expressed as percentage value, is a GDT of type Percent, in some implementations has a Qualifier of PersonDisability, and is optional.

Business Object Employment

An employment is the relationship which comes into being by virtue of one or more valid work agreements. Whereas the work agreement consists only of the specific labor-related arrangements agreed between company and employee, the employment encompasses the entire legal relationship between the contracting parties. The US extension of Employment captures additional information regarding the regulatory compliance, disability and work permit. The nodes that are enhanced with information specific to US are Disability, RegulatoryCompliance and WorkPermit. All other nodes of the Employment remain the same. For all GDTs with CountryCode in their context structure, the following restriction may apply: values with listID valid for US are allowed.

A Disability is the description of an employee's physical or mental disability. The Disability contains information about the disability that the employer is obliged to maintain because of legal obligations. These obligations exist in several countries. In US additional data about the disability has to be maintained by the employer. The elements added directly at the node Disability are defined by the data type enhancement structure: EmploymentDisabilityUS_ExtensionElements. These elements are EmployerNotificationDate. An EmployerNotificationDate is the date on which the employer is notified about the disability, is a GDT of type Date, in some implementations may have a Qualifier of Notification, and is optional.

RegulatoryCompliance is the representation of country-specific requirements which govern employers' compliance with legislation regulating employment. In US, the employer also stores race, veteran status and military status of the employee. The elements added at the node RegulatoryCompliance are defined by the data type enhancement structure: EmploymentRegulatoryComplianceUS_ExtensionElements. These elements are PersonRaceEthnicityCode, EqualEmploymentOpportunityExcludedIndicator, SpecialDisabledVeteranCategoryEffectiveIndicator, VietnamEraVeteranCategoryEffectiveIndicator, OtherProtectedVeteranCategoryEffectiveIndicator, NewlySeparatedVeteranCategoryEffectiveIndicator, and PersonMilitaryStatusCode. The PersonRaceEthnicityCode is the code representing the racial or ethnic background of an employee, is a GDT of type PersonRaceEthnicityCode, in some implementations may have a Restriction of values from the code list for US are allowed, and is optional. The EqualEmploymentOpportunityExcludedIndicator indicates if the employee is excluded for Equal Employment Opportunity reporting or not, is a GDT of type ExcludedIndicator, and is optional. The SpecialDisabledVeteranCategoryEffectiveIndicator indicates if the SpecialDisabledVeteranCategory is effective or not for the person, is a GDT of type EffectiveIndicator, and is optional. The VietnamEraVeteranCategoryEffectiveIndicator indicates if the VietnamEraVeteranCategory is effective or not for the person, is a GDT of type EffectiveIndicator, and is optional. The OtherProtectedVeteranCategoryEffectiveIndicator indicates if the OtherProtectedVeteranCategory is effective or not for the person, is a GDT of type EffectiveIndicator and is optional. The NewlySeparatedVeteranCategoryEffectiveIndicator indicates if the NewlySeparatedVeteranCategory is effective or not for the person is a GDT of type EffectiveIndicator and is optional. A PersonMilitaryStatusCode is a coded representation of the Military status of a person is a GDT of type PersonMilitaryStatusCode, in some implementations may have a Restriction of values from the code list for US are allowed, and is optional.

A WorkPermit is the permission issued by an authority of a certain country to a foreign person allowing this person to work for a defined period of time. The WorkPermit can be used to perform a validation check of the work permit information provided by the employee. For example, the US IMMIGRATION REFORM AND CONTROL ACT OF 1986 http://www.usda.gov/agency/oce/oce/labor-affairs/ircasumm.htm requires companies (as employer) in the US to control residence and work permits of their employees. The elements added at the node WorkPermit are defined by the data type enhancement structure: EmploymentWorkPermitUS_ExtensionElements. These elements are EmployeeWorkPermitTypeCode and EmployeeWorkPermitID. An EmployeeWorkPermitTypeCode is a coded representation of the Work permit type of an employee is a GDT of type EmployeeWorkPermitTypeCode, in some implementations may have a Restriction of values from the code list for US are allowed, and is optional. An EmployeeWorkPermitID is a unique identifier for an Employee Work Permit is a GDT of type EmployeeWorkPermitID, and is optional.

Business Object EngineeringChangeOrder

Figures 1, 125:
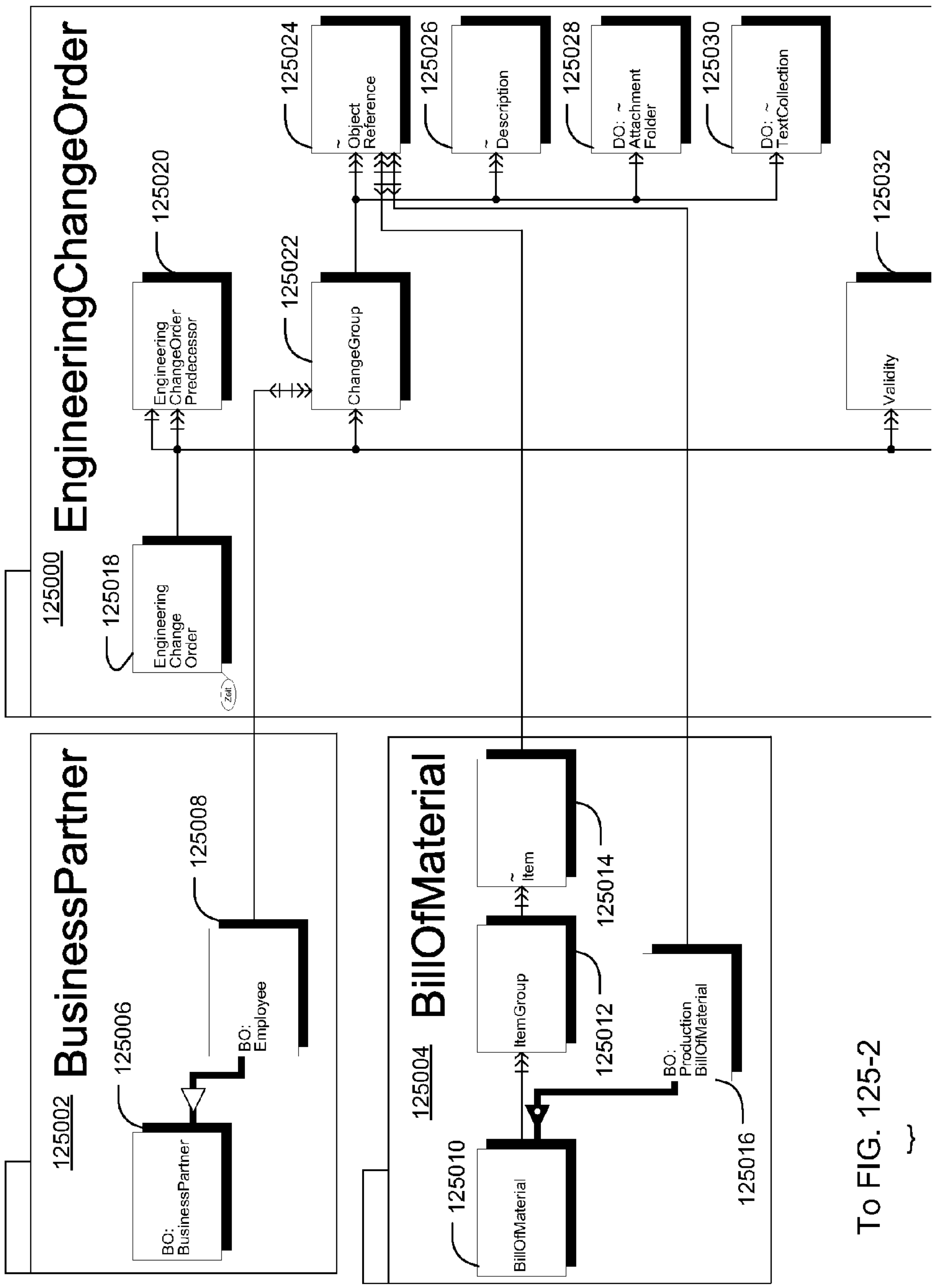
Figures 2, 125:
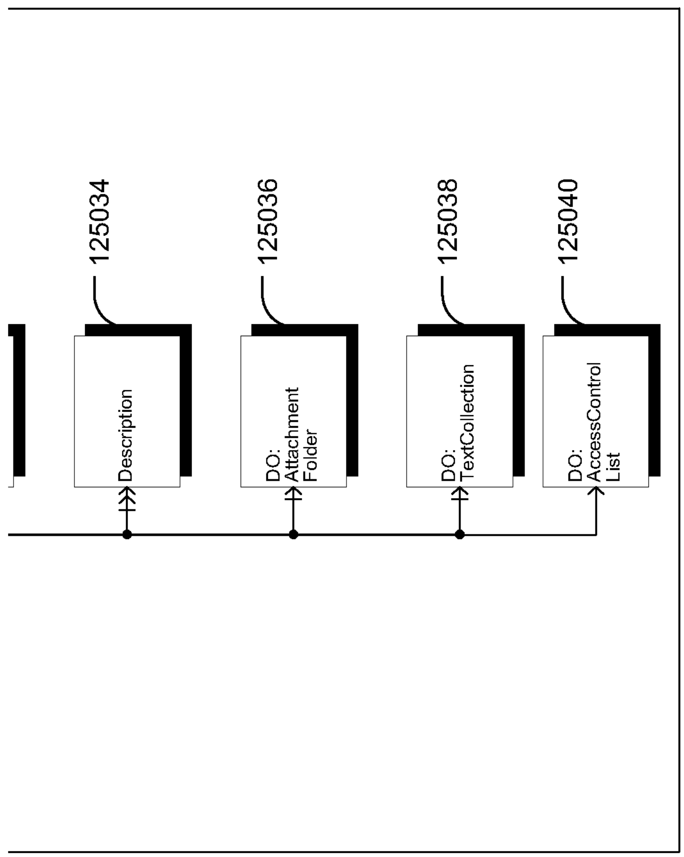

FIGS. 125-1 through 125-2 illustrate an example EngineeringChangeOrder business object model 125000, Specifically, this model depicts interactions among various hierarchical components of the EngineeringChangeOrder, as well as external components that interact with the EngineeringChangeOrder (shown here as 125002 through 125016).

A Business Object EngineeringChangeOrder is a set of instructions to make changes to a number of objects from the areas of engineering or production. It may define the conditions under which these changes become effective and specify the release status of these changes. The engineering change order can indicate, for a changed business object, a state that may have been reached via the changes to this business object, for example, change state. The engineering change order then can become part of the changed business object and may have continuing significance in the determination of the status of this business object. The engineering change order can control which objects can be changed with that order. The conditions under which the object changes become effective might be the validities. The engineering change order may determine the validity. An example of a condition may be a valid-from date, which means that the changes that belong to the engineering change order may be effective from a certain date—therefore the related change state can be valid from this date. The following business object nodes may be changed with the engineering change order: variant hierarchy relationships of the engineering product structure and BOM items of the production bill of material. In the following text, these nodes can be referred to as "objects", "changeable objects" or "engineering change processing objects."

The change states of some of these objects may be modeled as separate business object nodes.

The engineering change order may not be an order that triggers an individual business process, for example, the purchase of a component, and may have no further effects once this process is complete.

However, the engineering change order is called an order because one or more users can be instructed to create new change states for one or more business objects, to release the new change state and to control the effectivity of the new change state via the validity. The Business Object EngineeringChangeOrder is part of the process component Engineering Change Processing and is in the Foundation Layer. EngineeringChangeOrder may contain: Change groups, Validities, and Descriptions. EngineeringChangeOrder is represented by the root node (Root).

A Business Object EngineeringChangeOrder 125018 (Root Node) is a set of instructions to make changes to a number of objects from the areas of engineering or production. EngineeringChangeOrder may define the conditions under which these changes become effective and specify the release status of these changes. The EngineeringChangeOrder can comprise both business objects to which changes have already been made within the order, and business objects to which changes are still outstanding. The engineering change order can contain a change state for each changed business object. This is the state that may have been achieved by means of the change to the business object with this engineering change order. The ID of the engineering change order may be the change number. The conditions under which the related object changes become effective may be referred to as the validity. The engineering change order may determine the validity. The validity may be a set of parameters. For example, a parameter can be a valid-from date. The changes related to the engineering change order might be effective from a certain date. Therefore, the related change state can be valid from this date. The values of the set of the parameters can control the effectivity of a change. If a business object has been changed using engineering change orders, these orders can have complete control of the validity for these new change states. The following business object nodes can currently be changed with the engineering change order: BOM items of the production bill of material. The elements located directly at the root node EngineeringChangeOrder are defined by the data type EngineeringChangeOrderElements. In certain implementations, these elements include: UUID, ID, PredecessingEngineeringChangeOrderID, TypeCode, Status and SystemAdministrativeData.

UUID is a universal identification, which can be unique, of an engineering change order and is an alternative key. The UUID may be based on GDT UUID.

ID is an identification, which can be unique, of an engineering change order and is an alternative key. The ID may be based on GDT EngineeringChangeOrderID.

PredecessingEngineeringChangeOrderID is an identification for the preceding engineering change order and is optional. The PredecessingEngineeringChangeOrderID may be based on GDT EngineeringChangeOrderID.

TypeCode is a coded representation of the type of a change order. The TypeCode may be based on GDT EngineeringChangeOrderTypeCode.

Status is the status of the engineering change order. The Status may be based on IDT EngineeringChangeOrderStatus. In certain implementations, these elements include: LifeCycleStatusCode, AggregatedChangeGroupProcessingStatusCode, and AggregatedValidityReleaseStatusCode.

LifeCycleStatusCode is a description of the status of life cycle of the engineering change order. The LifeCycleStatusCode may be based on GDT EngineeringChangeOrderLifeCycleStatusCode.

AggregatedChangeGroupProcessingStatusCode is an aggregated status of all change groups. This status may relate to the execution of the changes. The AggregatedChangeGroupProcessingStatusCode may be based on GDT ProcessingStatusCode—With limited value range: The value "Not started" is may not be possible. AggregatedValidityReleaseStatusCode is an aggregated status of all validities for the release. The AggregatedValidityReleaseStatusCode may be based on GDT ReleaseStatusCode—With limited value range: The value "Partially Released" is not possible.

SystemAdministrativeData is administrative data, for example, the person who last changed the ECO, for the time at which it was last changed. SystemAdministrativeData may be based on GDT SystemAdministrativeData.

The following composition relationships to subordinate nodes exist: ChangeGroup 125022 1:n, Validity 125032 1:cn, Description 125034 1:cn, TextCollection 125038 (DO) 1:c, and AttachmentFolder 125036 (DO) 1:c.

There may be a number of inbound aggregation relationships. From the EngineeringChangeOrder business object (or node) to the PredecessingEngineeringChangeOrder 125020 business object (or node) there may be a cardinality relationship of c:cn. When an engineering change order is created, a preceding engineering change order can be assigned to it. The purpose of the new engineering change order is to (partially or fully) correct the contents and effects of the preceding order using the current change order.

There may be a number of associations for navigation. From the nodeValidity business object (or node) to the MainValidity business object (or node) there may be a cardinality relationship of 1:1. MainValidity can be such that there exists one special validity, the "Main Validity". From the ChangeGroup business object (or node) to the MainChangeGroup business object (or node) there may be a cardinality relationship of 1:1. MainChangeGroup can be such that there can exist one special change group, the "Main Change Group".

The changes made using the engineering change order can not be effective until the engineering change order has the status "released" (no further object changes permitted) or "completed" (no further validity changes permitted). The association MainValidity is effective only for the change order types with "Single-date," for which always one validity exists.

RegisterObjectChange is the action which can indicate that the specified engineering change processing object in the engineering change order may have been changed and lists the specified person as the processor. Prerequisites: A processor may have made a change to an engineering change processing object using a specific change number. Changes can be made in the business object EngineeringChangeOrder: The ObjectChangedIndicator is set in the related object reference for the changed engineering change processing object, in the change group that can belong to the processor. Changes in other objects: The change order is entered into the change state evolution graph of the changed engineering change processing object. Parameters: The action elements are defined by the data type EngineeringChangeOrderRegisterObjectChangeActionElements. In certain implementations, these elements include: ProcessingEmployeeUUID, ProcessingEmployeeIdentityUUID, EngineeringChangeProcessingObjectUUID, EngineeringChangeProcessingObjectNodeTypeCodeUUID, RootEngineeringChangeProcessingObjectUUID, and RootEngineeringChangeProcessingObjectNodeTypeCode.

ProcessingEmployeeUUID is a universal identification, which can be unique, of the processor who uses a change order to make changes to engineering change processing objects (from the BO Employee) and is optional. The ProcessingEmployeeUUID may be based on GDT UUID.

ProcessingEmployeeIdentityUUID is a universal identification, which can be unique, of the combination of all user accounts of the processor (from the BO Identity) and is optional. The ProcessingEmployeeIdentityUUID may be based on GDT UUID.

EngineeringChangeProcessingObjectUUID is a universal identification, which can be unique, of the changed engineering change processing object. The EngineeringChangeProcessingObjectUUID may be based on GDT UUID.

EngineeringChangeProcessingObjectNodeTypeCode is a coded representation of the type of the changed engineering change processing object. The EngineeringChangeProcessingObjectNodeTypeCode may be based on GDT ObjectNodeTypeCode.

RootEngineeringChangeProcessingObjectUUID is a universal identification, which can be unique, of the root object for the changed engineering change processing object. The RootEngineeringChangeProcessingObjectUUID may be based on GDT UUID.

RootEngineeringChangeProcessingObjectNodeTypeCode is a coded representation of the type of the root object for the changed engineering change processing object. The RootEngineeringChangeProcessingObjectNodeTypeCode may be based on GDT ObjectNodeTypeCode.

This action is called from the transaction in which the engineering change processing object is changed. This means that the transaction is called from the BO of the changed engineering change processing object or from the UI.

DeleteObjectReference can cause the deletion of the references of a given engineering change processing object in the change group object reference nodes. The given engineering change processing object may have been treated with the Engineering Change Order. Changes can be made in the business object EngineeringChangeOrder. All entries in the change group object reference nodes, which match the given engineering change processing object, can be deleted. Changes in other objects: The change order is deleted from the change state evolution graph of the changed engineering change processing object. Parameters: The action elements are defined by the data type EngineeringChangeOrderDeleteObjectReferenceActionElements. In certain implementations, these elements include: EngineeringChangeProcessingObjectUUID, and EngineeringChangeProcessingObjectNodeTypeCode.

EngineeringChangeProcessingObjectUUID is a universal identification, which can be unique, of the considered engineering change processing object. The EngineeringChangeProcessingObjectUUID may be based on GDT UUID.

EngineeringChangeProcessingObjectNodeTypeCode is a coded representation of the type of the considered engineering change processing object. The EngineeringChangeProcessingObjectNodeTypeCode may be based on GDT ObjectNodeTypeCode.

This action is called when the engineering change processing object itself is deleted or when the change of an object with the Engineering Change Order is cancelled.

StartProcessing (S&AM action "StartProcessing") releases a change order with the status in preparation so that it can be used to change engineering change processing objects. Changes in the business object EngineeringChangeOrder can occur, including changing the status of the change order from in preparation to in process.

Block (S&AM Action "Block"): blocks a change order so that it may not be used to change any further engineering change processing objects. Changes in the business object EngineeringChangeOrder can occur, including changing the status of the change order from in process to blocked.

ResumeProcessing (S&AM action "ResumeProcessing") releases a change order that may have the status blocked so that it can again be used to change objects. Changes in the business object EngineeringChangeOrder can occur, including changing the status of the change order from blocked to in process.

CompleteChanges (S&AM action "CompleteChanges"): causes that the change order can no longer be used to make changes to objects. Furthermore, the change order can then be taken into account in evaluations. The validities in the change order can still be changed.

Changes in the business object EngineeringChangeOrder can occur, including changing the status of the change order from in process to changes completed.

Complete (S&AM action "Complete") completes the life cycle of the change order. After this action, it is no longer possible to enter new validities in the change order. Furthermore, this change order can no longer be used to make object changes and all object changes that have been made with this change order may be taken into account in the evaluation. Changes in the business object EngineeringChangeOrder can occur, including changing the status of the change order to completed.

In certain implementations, there can be multiple queries done for EngineeringChangeOrders. This can include QueryByID which can deliver a list of EngineeringChangeOrders for given IDs. The query elements can be defined by the data type: EngineeringChangeOrderIDQueryElements. These elements can include: UUID which is optional and is of type GDT: UUID, ID which is optional and is of type GDT: EngineeringChangeOrderID.

Another type of query that can be performed for EngineeringChangeOrder is QueryByEmployeeAndStatus. QueryByEmployeeAndStatus delivers a list of EngineeringChangeOrders, with which a given processor has made changes to engineering change processing objects, or which can be used by the employee. In addition, it is possible to limit both the status of the change order and of the change group. The query elements are defined by the data type EngineeringChangeOrderEmployeeAndStatusQueryElements. These elements can include:

ChangeGroupProcessingEmployeeUUID which is optional and is of type GDT: UUID,

ChangeGroupProcessingEmployeeID which is optional and is an identifier of the processor who makes changes to objects using the change order (from the BO BusinessPartner, projection Employee) and is of type GDT: EmployeeID, ChangeGroupProcessingEmployeeGivenName which is optional and is the given name of the processor who makes changes to objects using the change order (from the BO BusinessPartner, projection Employee) and is of type GDT: Name and has a Qualifier of LANGUAGEINDEPENDENT_MEDIUM_Name, ChangeGroupProcessingEmployeeFamilyName, which is optional and is the family name of the processor who makes changes to objects using the change order (from the BO BusinessPartner, projection Employee) and is of type GDT: Name, and has a Qualifier: LANGUAGEINDEPENDENT_MEDIUM_Name, LifeCycleStatusCode which is optional and is of type GDT: EngineeringChangeOrderLifeCycleStatusCode, and ChangeGroupProcessingStatusCode, which is optional and is of type GDT: ProcessingStatusCode.

Another type of query that can be performed for EngineeringChangeOrder is QueryByPredecessor. QueryByPredecessor delivers a list of EngineeringChangeOrders, that are successor orders to a given change order, in other words, to which the given change order is the predecessor. The query elements are defined by the data type EngineeringChangeOrderPredecessorQueryElements. These elements can include: PredecessingEngineeringChangeOrderID which is mandatory, and is of type GDT: EngineeringChangeOrderID.

Another type of query that can be performed for EngineeringChangeOrder is QueryByChangedObjects. QueryByChangedObjects delivers a list of EngineeringChangeOrders with which a given engineering change processing object has been changed. Alternatively, it is possible to specify the root object of the given engineering change processing object as a search criteria. The query elements are defined by the data type EngineeringChangeOrderChangedObjectsQueryElements. These elements can include:

ChangeGroupObjectReferenceEngineeringChangeProcessingObjectUUID which is optional and is of type GDT: UUID, ChangeGroupObjectReferenceEngineeringChangeProcessingObjectNodeTypeCode which is of type GDT: ObjectNodeTypeCode, ChangeGroupObjectReferenceRootEngineeringChangeProcessingObjectUUID which is optional and is of type GDT: UUID, ChangeGroupObjectReferenceRootEngineeringChangeProcessingObjectNodeTypeCode which is optional and is of type GDT: ObjectNodeTypeCode.

Another type of query that can be performed for EngineeringChangeOrder is QueryByElements. QueryByElements delivers a list of EngineeringChangeOrders, which were queried by parameters, which exist in the UI of the EngineeringChangeOrder. The query elements are defined by the data type EngineeringChangeOrderElementsQueryElements. These elements can include: ID which is optional and is of type GDT: EngineeringChangeOrderID, TypeCode which is optional and is of type GDT: EngineeringChangeOrderTypeCode, SystemAdministrativeData which is optional and is of type GDT: SystemAdministrativeData, CreationBusinessPartnerCommonPersonNameGivenName which is optional and is the given name of the person who created the change order (from the BO BusinessPartner) and is of type GDT: Name, and has a Qualifier: LANGUAGEINDEPENDENT_MEDIUM_Name, CreationBusinessPartnerCommonPersonNameFamilyName, which is optional and is the family name of the person who created the change order (from the BO BusinessPartner) and is of type GDT: Name, and has a Qualifier: LANGUAGEINDEPENDENT_MEDIUM_Name, LastChangeBusinessPartnerCommonPersonNameGivenName which is optional and is the given name of the person who performed the last change of the change order (from the BO BusinessPartner) and is of type GDT: Name, and has a Qualifier of LANGUAGEINDEPENDENT_MEDIUM_Name, LastChangeBusinessPartnerCommonPersonNameFamilyName which is optional and is the family name of the person who performed the last change of the change order (from the BO BusinessPartner) and is of type GDT: Name, and has a Qualifier of LANGUAGEINDEPENDENT_MEDIUM_Name, Description which is optional and is of type GDT: _SHORT_Description and has a Qualifier of EngineeringChangeOrder, LifeCycleStatusCode which is optional and is of type GDT: EngineeringChangeOrderLifeCycleStatusCode, ValidityStartDate which is optional and is of type GDT: Date, and has a Qualifier of Start, ChangeGroupProcessingEmployeeUUID which is optional and is of type GDT: UUID, ChangeGroupProcessingEmployeeID which is optional and is the identifier of the processor who makes changes to objects using the change order (from the BO BusinessPartner, projection Employee) and is of type GDT: EmployeeID, ChangeGroupProcessingEmployeeGivenName which is optional and is the given name of the processor who makes changes to objects using the change order (from the BO BusinessPartner, projection Employee) and is of type GDT: Name and has a Qualifier of LAN- GUAGEINDEPENDENT_MEDIUM_Name, ChangeGroupProcessingEmployeeFamilyName which is optional and is the family name of the processor who makes changes to objects using the change order (from the BO BusinessPartner, projection Employee) and is of type GDT: Name and has a Qualifier of LANGUAGEINDEPENDENT_MEDIUM_Name, ChangeGroupObjectReferenceRootEngineeringChangeProcessingObjectUUID which is optional and is of type GDT: UUID, ChangeGroupObjectReferenceRootEngineeringChangeProcessingObjectNodeTypeCode which is optional and is of type GDT: ObjectNodeTypeCode, ChangeGroupObjectReferenceBillOfMateriallKey which is optional and is a key of a Bill of Material which is referenced as engineering change processing object and is of type GDT: BillOfMaterialKey. (definition see Appendix).

The ChangeGroup groups and manages the concrete changes to objects that can be carried out using an engineering change order. The elements located directly at the node ChangeGroup are defined by the data type EngineeringChangeOrderChangeGroupElements. In certain implementations, these elements include: UUID, ID, ProcessingEmployeeUUID, ProcessingEmployeeID, MainIndicator, Status, and SystemAdministrativeData.

UUID is a universal identification, which can be unique, of a change group. The UUID may be based on GDT UUID. ID is an identification, which can be unique, of a change group and is optional. The ID may be based on GDT EngineeringChangeOrderChangeGroupID. ProcessingEmployeeUUID is a universal identification, which can be unique, of the processor who uses a change group to make changes to objects and is optional. The ProcessingEmployeeUUID may be based on GDT UUID. ProcessingEmployeeID is an identification of the processor who makes changes to objects using the change order (from the BO BusinessPartner, projection Employee) and is optional (Derived). The ProcessingEmployeeID may be based on GDT EmployeeID. MainIndicator is an indicator that specifies which change group is the main change group (for example, for the UI) and is optional. The MainIndicator may be based on GDT Indicator, Qualifier Main. Status is a status of the change group. Status may be based on IDT EngineeringChangeOrderChangeGroupStatus. In certain implementations, the Status elements include: ProcessingStatusCode, and EngineeringChangeOrderLifeCycleStatusCode. ProcessingStatusCode is a description of the status of the change group. This status may relate to the execution of the changes. The ProcessingStatusCode may be based on GDT ProcessingStatusCode. EngineeringChangeOrderLifeCycleStatusCode is a description of the status of life cycle of the engineering change order (status value inherited from root node). The EngineeringChangeOrderLifeCycleStatusCode may be based on GDT EngineeringChangeOrderLifeCycleStatusCode.

SystemAdministrativeData is administrative data, such as the person who last changed the change group and the time at which it was last changed. SystemAdministrativeData may be based on GDT SystemAdministrativeData.

The following composition relationships to subordinate nodes exist: ChangeGroupObjectReference 125024 1:cn, ChangeGroupDescription 125026 1:cn, ChangeGroupTextCollection 125030 (DO) 1:c, and ChangeGroupAttachmentFolder 125028 (DO) 1:c.

There may be a number of inbound aggregation relationships. From the Employee to ChangeGroup business object (or node) to the Employee business object (or node) there may be a cardinality relationship of c:cn. The change group can be processed by this employee.

A change group is generated at the same time as an engineering change order. In many implementations, the processor assigned to a change group is allowed to make changes to objects within this change group. If no processor has been assigned to the change group, multiple users can make changes to objects within this change group. After the first user has made changes to objects within this change group, his or her ProcessingEmployeeUUID can be entered in the change group. Thereafter, in many implementations, this processor can make changes to the objects within this change group. If a processor has made a change to an object which has a reference to a change group, then this change group can no longer be deleted. The related engineering change order can only be released if all change groups have been completed.

Start (S&AM action "Start") releases a change group that may have the status in preparation so that it may be used to change engineering change processing objects. Changes in the business object node ChangeGroup can occur, including changing the status of the change group can change from in preparation to in process.

Finish (S&AM action "Finish") completes the life cycle of the change group. After this, no more object changes can be made with this change group. Changes in the business object node ChangeGroup can occur, including changing the status of the change group to completed.

In certain implementations, there can be multiple queries done for ChangeGroup. This can include QueryByEmployeeAndStatus. QueryByEmployeeAndStatus delivers a list of ChangeGroups, with which a given processor has made changes to engineering change processing objects, or which can be used by the employee. In addition, it is possible to limit the status of the change group. The query elements are defined by the data type EngineeringChangeOrderChangeGroupEmployeeAndStatusQueryElements. These elements can include: ProcessingEmployeeUUID which is optional and of type GDT: UUID, ProcessingEmployeeID which is the identifier of the processor who makes changes to objects using the change order (from the BO BusinessPartner, projection Employee) and is of type GDT: EmployeeID, ProcessingEmployeeGivenName which is optional and is the given name of the processor who makes changes to objects using the change order (from the BO BusinessPartner, projection Employee) and is of type GDT: Name, having a Qualifier of LANGUAGEINDEPENDENT_MEDIUM_Name, ProcessingEmployeeFamilyName which is optional and is the family name of the processor who makes changes to objects using the change order (from the BO BusinessPartner, projection Employee) and is of type GDT: Name, having a Qualifier of LANGUAGEINDEPENDENT_MEDIUM_Name, ProcessingStatusCode which is optional and is of type GDT: ProcessingStatusCode.

A ChangeGroupObjectReference is the reference to an object that can be changed with this change group, or has been changed with this change group. The object reference of the change group may specify which engineering change processing objects can be changed with this change group and, in the form of an indicator, whether changes may have already been made to the objects. Therefore, the object references of the change group can have two functions that can be differentiated using an attribute. Each object reference may refer to one object. In release AP1 this is a BOM item or a BOM, later it may be a hierarchy relationship in the engineering product structure or a variant or a header in the engineering product structure. In addition, customer-specific business objects can be connected.

Also, each object reference can contain information about the root object of the currently referenced object, for example, the reference to the BOM number if the current object is a BOM item. This can make special search functions and consistency checks possible. For a validity order, there is a special meaning to this object reference: It can specify whether an object may be treated by this validity order and—in the form of that indicator—whether a validity of the validity order can be effective for an object. The elements located directly at the node ChangeGroupObjectReference are defined by the data type EngineeringChangeOrderChangeGroupObjectReferenceElements. In certain implementations, these elements include: EngineeringChangeProcessingObjectUUID, EngineeringChangeProcessingObjectNodeTypeCode, RootEngineeringChangeProcessingObjectUUID, RootEngineeringChangeProcessingObjectNodeTypeCode, BillOfMaterialKey, BillOfMaterialItemGroupItemKey, ObjectChangeIndicator, and SystemAdministrativeData.

EngineeringChangeProcessingObjectUUID is a universal identification, which can be unique, of the referenced engineering change processing object. The EngineeringChangeProcessingObjectUUID may be based on GDT UUID. EngineeringChangeProcessingObjectNodeTypeCode is a coded representation of the type of the referenced engineering change processing object. The EngineeringChangeProcessingObjectNodeTypeCode may be based on GDT ObjectNodeTypeCode. RootEngineeringChangeProcessingObjectUUID is a universal identification, which can be unique, of the root object for the referenced engineering change processing object and is optional. The RootEngineeringChangeProcessingObjectUUID may be based on GDT UUID. RotEngineeringChangeProcessingObjectNodeTypeCode is a coded representation of the type of the root object for the referenced engineering change processing object and is optional. The RootEngineeringChangeProcessingObjectNodeTypeCode may be based on GDT ObjectNodeTypeCode.). BillOfMaterialKey is a key of a Bill of Material, which is referenced as engineering change processing object and is optional (Derived). The BillOfMaterialKey may be based on GDT BillOfMaterialKey, definition see Appendix. BillOfMaterialItemGroupItemKey is a key of the item (position) of the Bill of Material, which is referenced as engineering change processing object and is optional (derived). The BillOfMaterialItemGroupItemKey may be based on GDT BillOfMaterialItemGroupItemKey, definition see Appendix. ObjectChangedIndicator is an indicator that specifies whether the referenced engineering change processing object was changed using the change group and is optional. The ObjectChangeIndicator may be based on GDT Indicator, Qualifier Changed. SystemAdministrativeData is administrative data, such as the person who last changed the change group object reference and the time at which it was last changed. The SystemAdministrativeData may be based on GDT SystemAdministrativeData.

There may be a number of inbound aggregation relationships. From the root node of business object ProductionBillOfMaterial to ChangeGroupObjectReference to the ProductionBillOfMaterial business object (or node) there may be a cardinality relationship of c:cn. The object reference can refer to one item of a production BOM (as a whole).

From the business object ProductionBillOfMaterial, node ItemGroupItem to ChangeGroupObjectReference to the ProductionBillOfMaterialItemGroupItem business object (or node) there may be a cardinality relationship of c:cn. The object reference can refer to one item of a production BOM.

Only references to existing objects can be possible. There may be no reference to the change state of an object because this change state may not exist until a change has been made. Conversely, each change state of a changed object may reference the engineering change order. For each object that uses a change order, there can be at least one object reference in the corresponding change groups. If a change group does not include any object references with which to limit the changeable objects, then all objects can be changed with the change group. As soon as an object has been changed, an object reference that refers to the object can be generated and carries the indicator "Object has been changed."

RegisterValidityUpdateForObject may cause the update of the validity, which is done by a validity order, and is effective for the engineering change processing object, which belongs to the given object reference. The object reference considered may belong to the change group of a validity order. This validity order may have inherited the object reference considered from its preceding change order. Changes in the business object EngineeringChangeOrder can occur. The ObjectChangedIndicator is set in the object reference of the validity order. Changes in other objects can occur. The validity order is entered into the change state evolution graph of the considered engineering change processing object. Parameters for this change may not be needed (the considered object reference is sufficient as input information). This action is called by the maintenance transaction of the validity order.

UnregisterValidityUpdateForObject may cause that the update of a validity, which was done by a validity order, is no longer effective for the engineering change processing object, which can belong to the given object reference. It may be a prerequisite that, for an object reference at a change group of a validity order, the action RegisterValidityChangeForObject may have been executed. Changes in the business object EngineeringChangeOrder can occur, including a reset of the action RegisterValidityChangeForObject. Changes in other objects can occur, including the deletion of the validity order from the change state evolution graph of the considered engineering change processing object. Parameters for this action may not be needed (the considered object reference is sufficient as input information). This action is called by the maintenance transaction of the validity order.

In certain implementations, there can be multiple queries done for ChangeGroupObjectReference. This can include QueryByEngineeringChangeOrderForChangeableObjects. QueryByEngineeringChangeOrderForChangeableObjects delivers a list of object references for those engineering change processing objects that can be changed by a given user, using a given change order. When the given change order has the status "Released" or "Completed", the query may not deliver anything, because it may not be used to change objects. Similarly, when the status of the considered change group is "Finished", the query may not deliver anything. The query elements are defined by the data type EngineeringChangeOrderChangeGroupObjectReference EngineeringChangeOrderForChangeableObjectsQueryElements. These elements can include: EngineeringChangeOrderUUID which is mandatory and is of type GDT: UUID, EngineeringChangeOrderChangeGroupProcessingEmployeeUUID which is optional and is of type GDT: UUID, EngineeringChangeOrderChangeGroupProcessingEmployeeID which is optional and is the identifier of the processor who makes changes to objects using the change order (from the BO BusinessPartner, projection Employee) and is of type GDT: EmployeeID, EngineeringChangeOrderChangeGroupProcessingEmployeeGivenName which is optional and is the given name of the processor who makes changes to objects using the change order (from the BO BusinessPartner, projection Employee) and is of type GDT: Name, having a Qualifier of LANGUAGEINDEPENDENT_MEDIUM_Name, EngineeringChangeOrderChangeGroupProcessingEmployeeFamilyName which is optional and is the family name of the processor who makes changes to objects using the change order (from the BO BusinessPartner, projection Employee) and is of type GDT: Name, having a Qualifier of LANGUAGEINDEPENDENT_MEDIUM_Name.

Another type of query that can be performed for ChangeGroupObjectReference is QueryByEngineeringChangeOrderForTreatedObjects. QueryByEngineeringChangeOrderForTreatedObjects delivers a list of object references for those engineering change processing objects that have been handled by a given user, using a given change order. These actions are, depending on the type of the change order: Object changes with a standard order or an Easy Mode change order, corrections to changes to objects using a correction order, and changes to validities using a validity order. The query elements are defined by the data type EngineeringChangeOrderChangeGroupObjectReferenceEngineeringChangeOrderForTreatedObjects QueryElements. These elements can include: EngineeringChangeOrderUUID which is mandatory and is of type GDT: UUID, EngineeringChangeOrderChangeGroupProcessingEmployeeUUID which is optional and is of type GDT: UUID, EngineeringChangeOrderChangeGroupProcessingEmployeeID which is optional and is the identifier of the processor who makes changes to objects using the change order (from the BO BusinessPartner, projection Employee) and is of type GDT: EmployeeID, EngineeringChangeOrderChangeGroupProcessingEmployeeGivenName which is optional and is the given name of the processor who makes changes to objects using the change order (from the BO BusinessPartner, projection Employee) and is of type GDT: Name, having a Qualifier of LANGUAGEINDEPENDENT_MEDIUM_Name, EngineeringChangeOrderChangeGroupProcessingEmployeeFamilyName which is optional and is the family name of the processor who makes changes to objects using the change order (from the BO BusinessPartner, projection Employee) and is of type GDT: Name, having a Qualifier of LANGUAGEINDEPENDENT_MEDIUM_Name.

The ChangeGroupDescription is a language-dependent short text with additional information about a change group of an engineering change order. The elements located directly at the node ChangeGroupDescription are defined by the data type EngineeringChangeOrderChangeGroupDescriptionElements. In certain implementation, this element includes Description. Description is a language-dependent short text for a change group of an engineering change order and is optional. The Description may be based on GDT _SHORT_Description, Qualifier EngineeringChangeOrderChangeGroup.

The ChangeGroupTextCollection is a set of all textual descriptions of the change group.

The ChangeGroupAttachmentFolder is the collection of all attached documents whose content is related to the change group under examination.

The Validity may refer to conditions under which a change becomes effective. The conditions can be related to times or locations, or to the level of maturity of an object within its life cycle. Examples of conditions: Valid-from date, Valid-to date, a phase of the product life cycle (for example, design or production), and an organizational unit (for example, a production plant or a department). A phase can consist of an individual process, meaning that particular processes can be released, (for example, phase “calculation” and status “released” results in “released for calculation.” The assignment of an organizational unit to a release can restrict the validity to this organization only. In this way it is possible, for example, to use or produce a product in one plant from the 1st of January, while in a second plant, the same product may only be used from June onward. In release AP1, only the valid-from date may be realized. The elements located directly at the node Validity are defined by the data type EngineeringChangeOrderValidityElements. In certain implementations, these elements include: StartDate, CancelledIndicator, MainIndicator, ActivationDateTime, Status, and SystemAdministrativeData.

StartDate is a date from which a change made using the engineering change order is effective (for example, valid). The StartDate may be based on GDT Date, Qualifier Start.

CancelledIndicator is an indicator that specifies that this validity should no longer be taken into account, for example, that it should be regarded as deleted and is optional. The CancelledIndicator may be based on GDT Indicator, Qualifier Cancelled.

MainIndicator is an indicator that specifies which validity is the main validity (for example, for the UI) and is optional. The MainIndicator may be based on GDT Indicator, Qualifier Main.

ActivationDateTime is a timestamp that specifies when the validity was activated for the evaluation and is optional—Read-Only. The ActivationDateTime may be based on GDT DateTime, Qualifier Activation.

Status is a status of the validity. The Status may be based on IDT EngineeringChangeOrderValidityStatus. In certain implementations, the Status elements include: ReleaseStatusCode, and EngineeringChangeOrderLifeCycleStatusCode.

ReleaseStatusCode is a description of the validity in relation to the release. The ReleaseStatusCode may be based on GDT ReleaseStatusCode.

EngineeringChangeOrderLifeCycleStatusCode is a description of the status of life cycle of the engineering change order (status value inherited from root node). The EngineeringChangeOrderLifeCycleStatusCode may be based on GDT EngineeringChangeOrderLifeCycleStatusCode.

SystemAdministrativeData is administrative data, such as the person who last changed the ECO and the time at which it was last changed. The SystemAdministrativeData may be based on GDT SystemAdministrativeData Only if the change order has the status “released” or “completed,” the current conditions (for example, date, plant) of a set of validity parameters in the change order have been fulfilled, and this validity has the status “released” may the object changes made with the engineering change order be effective.

To determine all valid change states from an application, all validities with the status “released” may be taken into account. The MainIndicator is set for not more than one validity in an engineering change order.

Enterprise Service Infrastructure Actions

Release (S&AM action “Release”) releases the validity so that it can be taken into account in evaluations. Changes in the business object node Validity: The status of the validity may change from in process to released.

CancelRelease (S&AM action “CancelRelease”) cancels the release of the validity so that it is no longer taken into account in evaluations. Changes in the business object node Validity: The status of the validity can change from released to in process.

In certain implementations, there can be multiple queries done for Validity. These may include QueryByEngineeringChangeOrderAndObject. QueryByEngineeringChangeOrderAndObject delivers a list of current Validities that belong to a given change order and a given object reference, taking into account (any existing) validity orders for the given change order.

The query elements are defined by the data type EngineeringChangeOrderValidityEngineeringChangeOrderAndObjectQueryElements. These elements can include: EngineeringChangeOrderUUID which is mandatory and is of type GDT: UUID, EngineeringChangeOrderChangeGroupObjectReferenceEngineeringChangeProcessingObjectUUID which is mandatory and is of type GDT: UUID.

The Description is a language-dependent short text with additional information about an engineering change order. The elements located directly at the node Description are defined by the data type EngineeringChangeOrderDescriptionElements. In certain implementations, this element includes a Description. Description is a language-dependent short text for an engineering change order and is optional. The Description is of type GDT_SHORT_Description, having a Qualifier of EngineeringChangeOrder The TextCollection is a set of all textual descriptions of the engineering change order.

The AttachmentFolder is the collection of all attached documents whose content is related to the engineering change order under examination.

Definition of the GDTs BillOfMaterialKey and BillOfMaterialItemGroupItemKey

GDT BillOfMaterialKey: In certain implementations, these elements include: BillOfMaterialID, and BillOfMaterialVariantID.

BillOfMaterialID is an identifier, which can be unique, for a Bill of Material. The BillOfMaterialID may be based on GDT BillOfMaterialID.

BillOfMaterialVariantID is an identifier, which can be unique, for a variant of a Bill of Material. The BillOfMaterialVariantID may be based on GDT BillOfMaterialVariantID.

GDT BillOfMaterialItemGroupItemKey: In certain implementations, these elements include: BillOfMaterialID, BillOfMaterialItemGroupID, and BillOfMaterialItemGroupItemID.

BillOfMaterialID is an identifier, which can be unique, for a Bill of Material. The BillOfMaterialID may be based on GDT BillOfMaterialID.

BillOfMaterialItemGroupID is an identifier, which can be unique, for a Bill of Material item group. The BillOfMaterialGroupID may be based on GDT BillOfMaterialItemGroupID.

BillOfMaterialItemGroupItemID is an identifier, which can be unique, for an item of a Bill of Material item group. The BillOfMaterialItemGroupItemID may be based on GDT BillOfMaterialItemGroupItemID.

ExchangeRate Business Object

Figure 126:
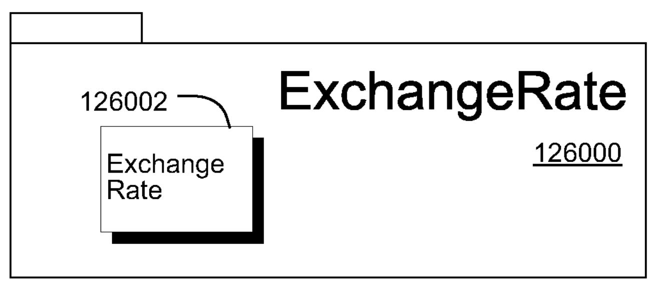

FIG. 126 illustrates an example ExchangeRate business object model 126000. Specifically, this model depicts interactions among various hierarchical components of the ExchangeRate.

An ExchangeRate Business Object is the relationship in which one currency can be exchanged for another currency at a specified time. The business object ExchangeRate can be part of the process component Financial Market Data Management. Exchange rate can be classified by an exchange rate type. In some example, the exchange rates are classified by International Monetary Fund (IMF) into three broad categories, reflecting both the role of the authorities in the determination of the exchange rates and/or the multiplicity of exchange rates in a country. The descriptor market rate is used to describe exchange rates determined largely by market forces; the official rate is an exchange rate determined by the authorities, sometimes in a flexible manner. For countries maintaining multiple exchange arrangements, the third category, the rates are labeled principal rate, secondary rate, and tertiary rate. ExchangeRate can be used by applications to store the rate between a pair of currencies for performing a number of monetary calculations and conversions. In some implementations, the Exchange Rate is represented by the Root node, ExchangeRate 126002.

For example, an exchange rate is the relationship in which one currency can be exchanged for another currency at a specified time with associated details such as exchange rate type, date and time of entry into the system, category and status of the exchange rate. Some elements located at the node ExchangeRate can be defined by the data type: ExchangeRateElements. These elements can include UUID, TypeCode, ExchangeRate, CategoryCode, RegisterDateTime, and DeletedIndicator. An UUID is an Universally Unique Identifier of an Exchange Rate, and is a GDT of type UUID.) The exchange rate type code defines characteristics of an exchange rate according to the currencies that get converted, is a GDT of type ExchangeRateTypeCode, has an Alternative Key, and is optional. An ExchangeRate is the structure containing the exchange rate between a currency pair and the date from which it is valid (the quotation date), and is a GDT of type ExchangeRate. A CategoryCode specifies the category of an Exchange Rate, is a GDT of type ExchangeRateCategoryCode, and is optional. In some implementations, a RegisterDateTime contains the value of date and time when the Exchange Rate is entered into the system is a GDT: Global_DateTime, and is optional. A DeletedIndicator indicates if an exchange rate record has been logically deleted or not, is a GDT of type DeletedIndicator, and is optional. Logical deletion is not deletion of the record from the database, but can be an indication that the exchange rate for that quotation date and time can no longer be used for conversion processes.

In certain implementations, the node element RegisterDateTime can be read only. The query QueryByCurrencyPair provides a list of all Exchange Rates available for a currency pair. The query elements are defined by the data type: ExchangeRateQueryElements. These elements are: TypeCode, ExchangeRateUnitCurrencyCode, ExchangeRateQuotedCurrencyCode, ValidFromDate, and ValidToDate. A TypeCode can be a GDT of type ExchangeRateTypeCode. An ExchangeRateUnitCurrencyCode can be a GDT of type CurrencyCode. An ExchangeRateQuotedCurrencyCode can be a GDT of type CurrencyCode. A ValidFromDate can be the exchange rate retrieved using the query, features a quotation date greater than or equal to the value specified by the query element ValidFrom, and can be a GDT of type Date. A ValidToDate can be the exchange rate retrieved using the query, features a quotation date less than or equal to the value specified by the query element ValidTo, and can be a GDT of type Date.

FinancialAuditTrailDocumentation Dependent Object

Figures 1, 127:
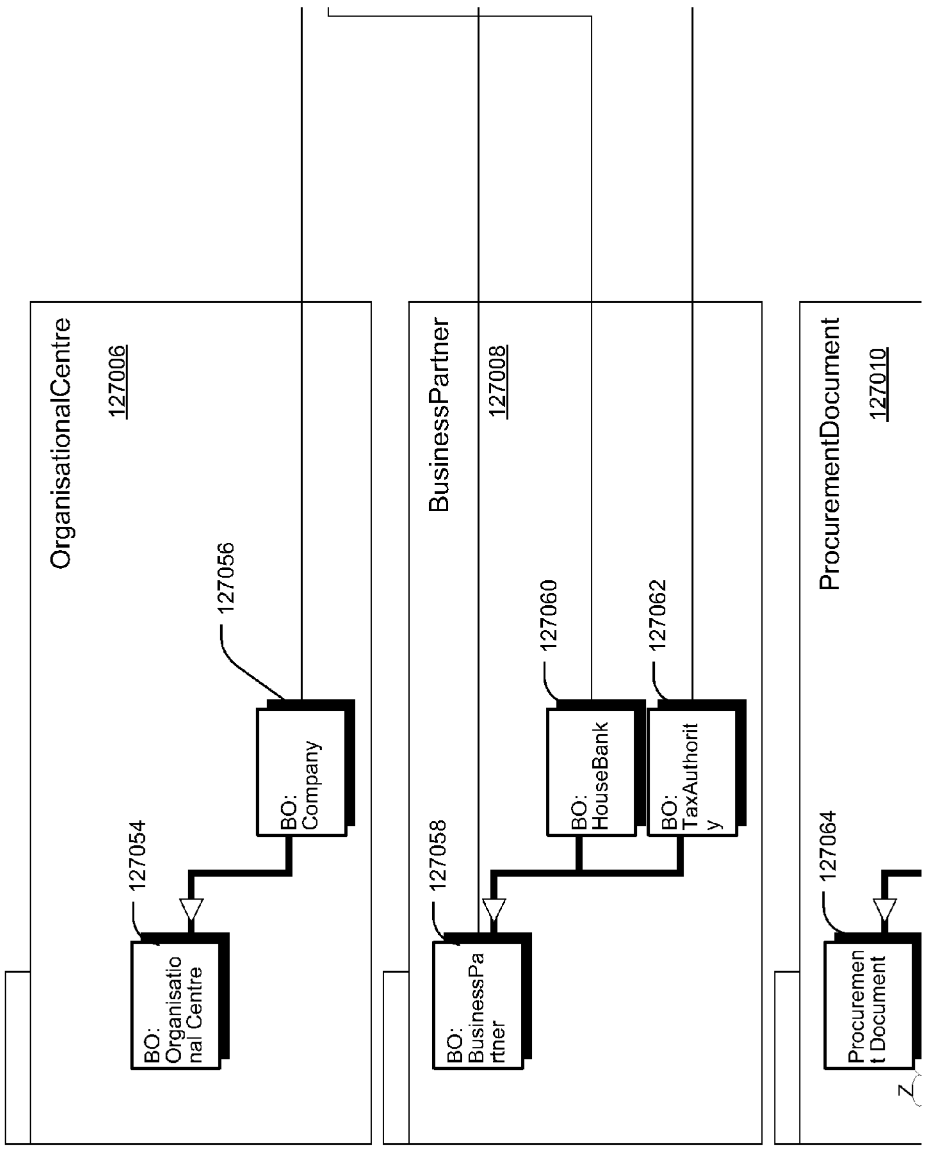
Figures 2, 127:
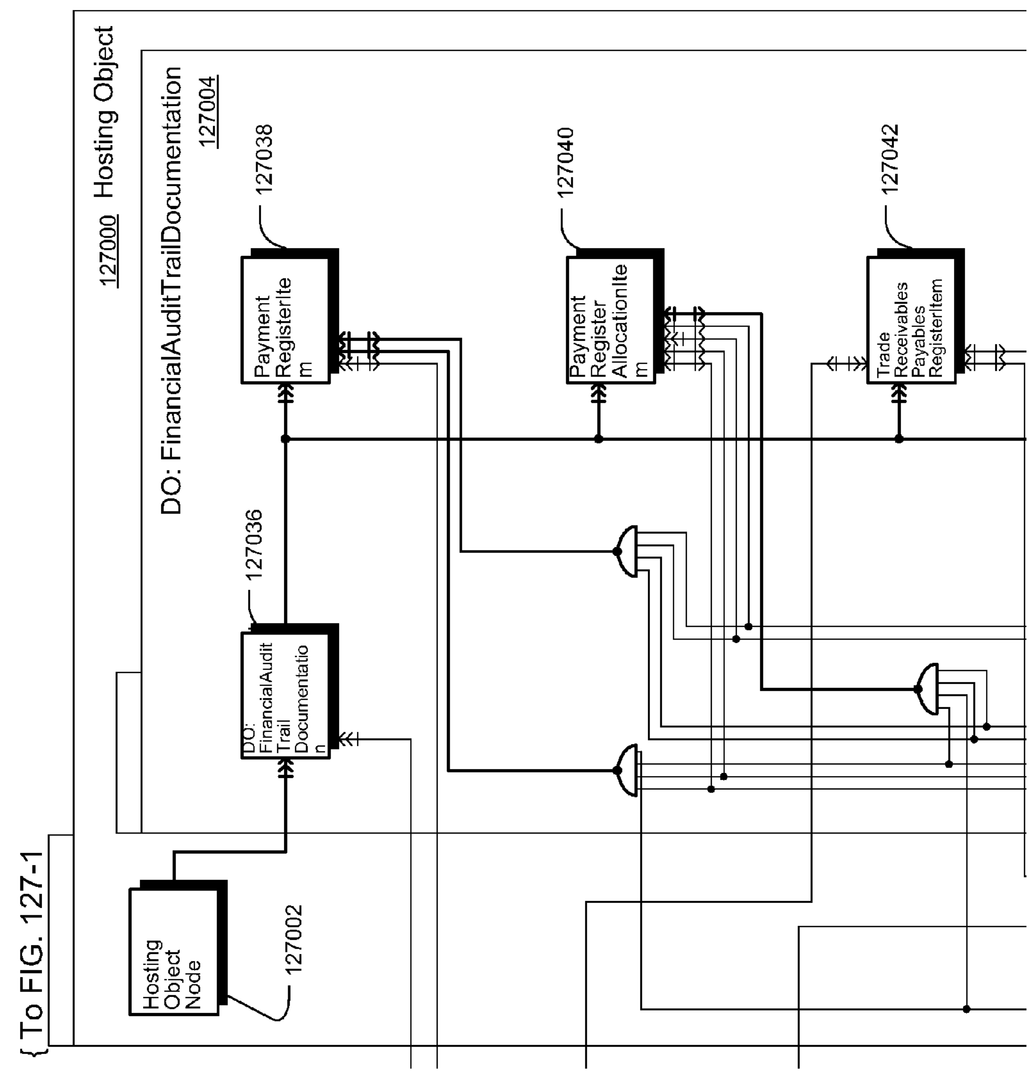
Figures 3, 127:
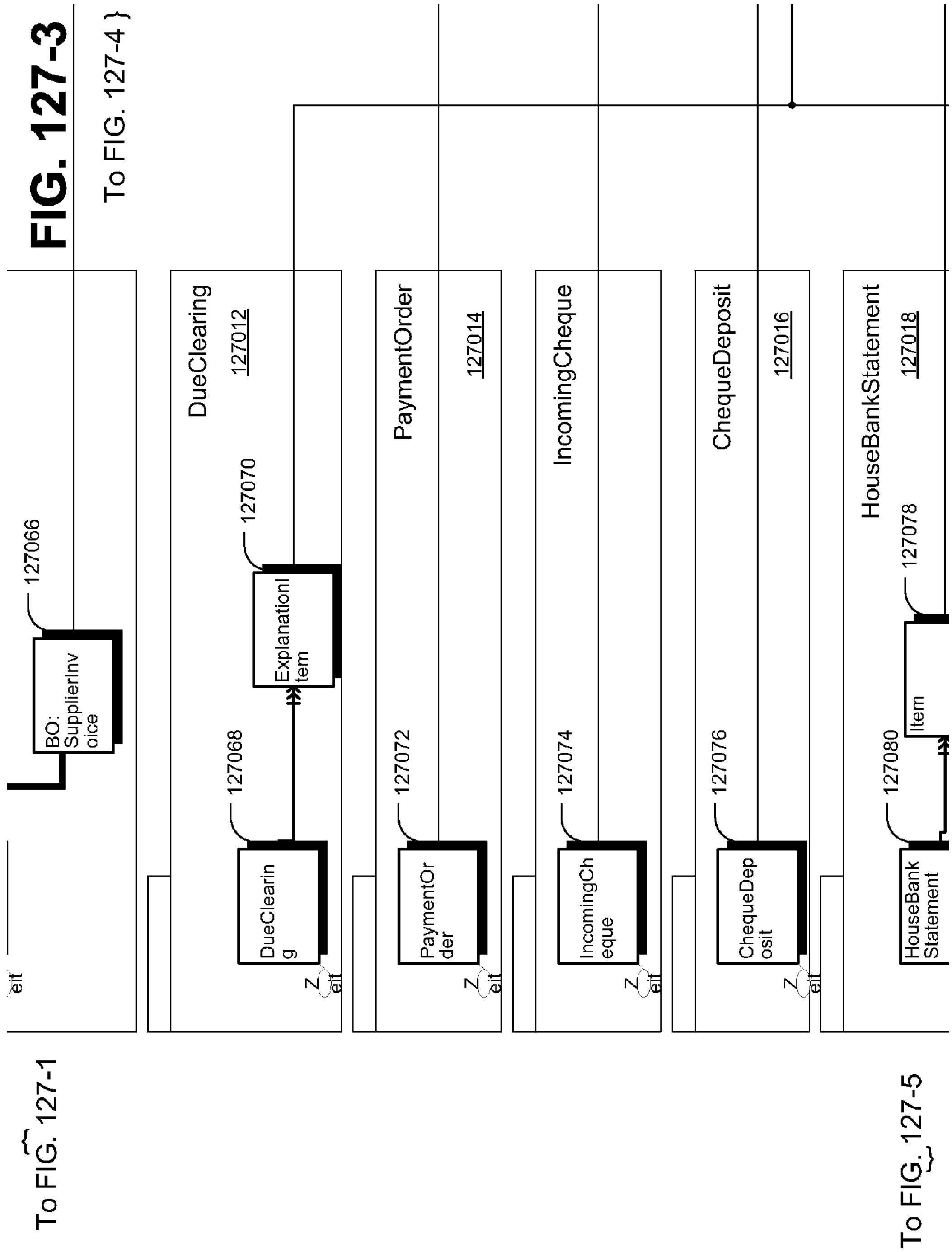
Figures 4, 127:
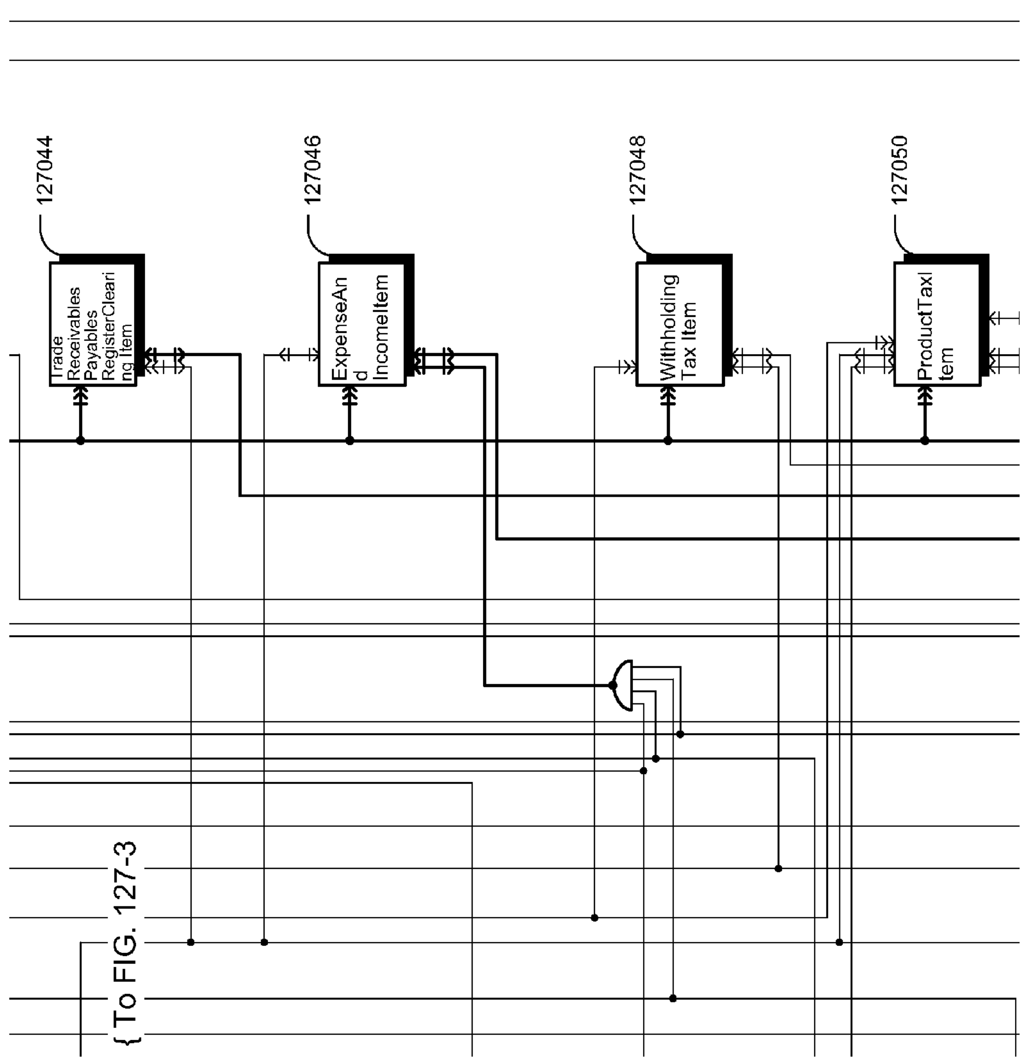
Figures 5, 127:
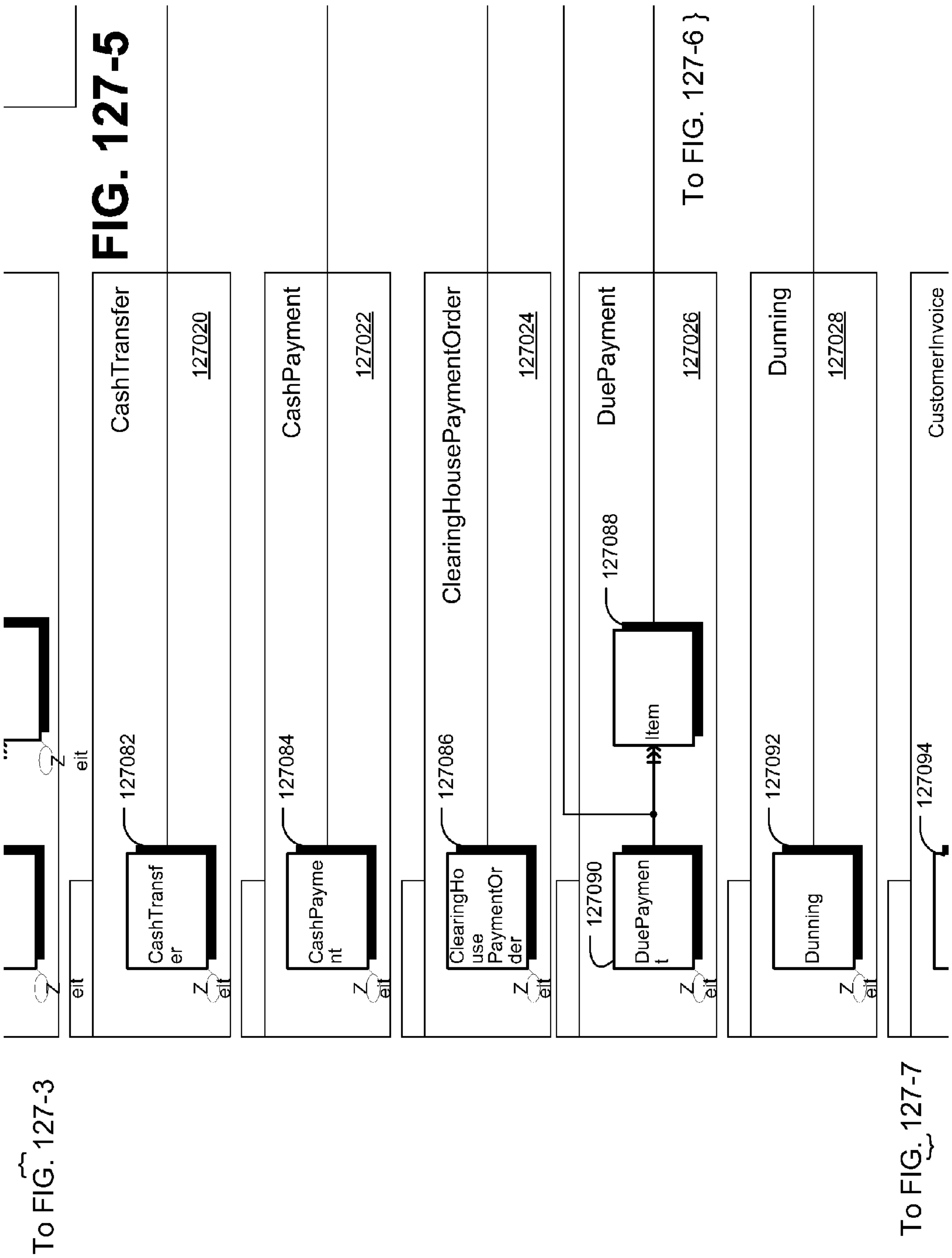
Figures 6, 127:
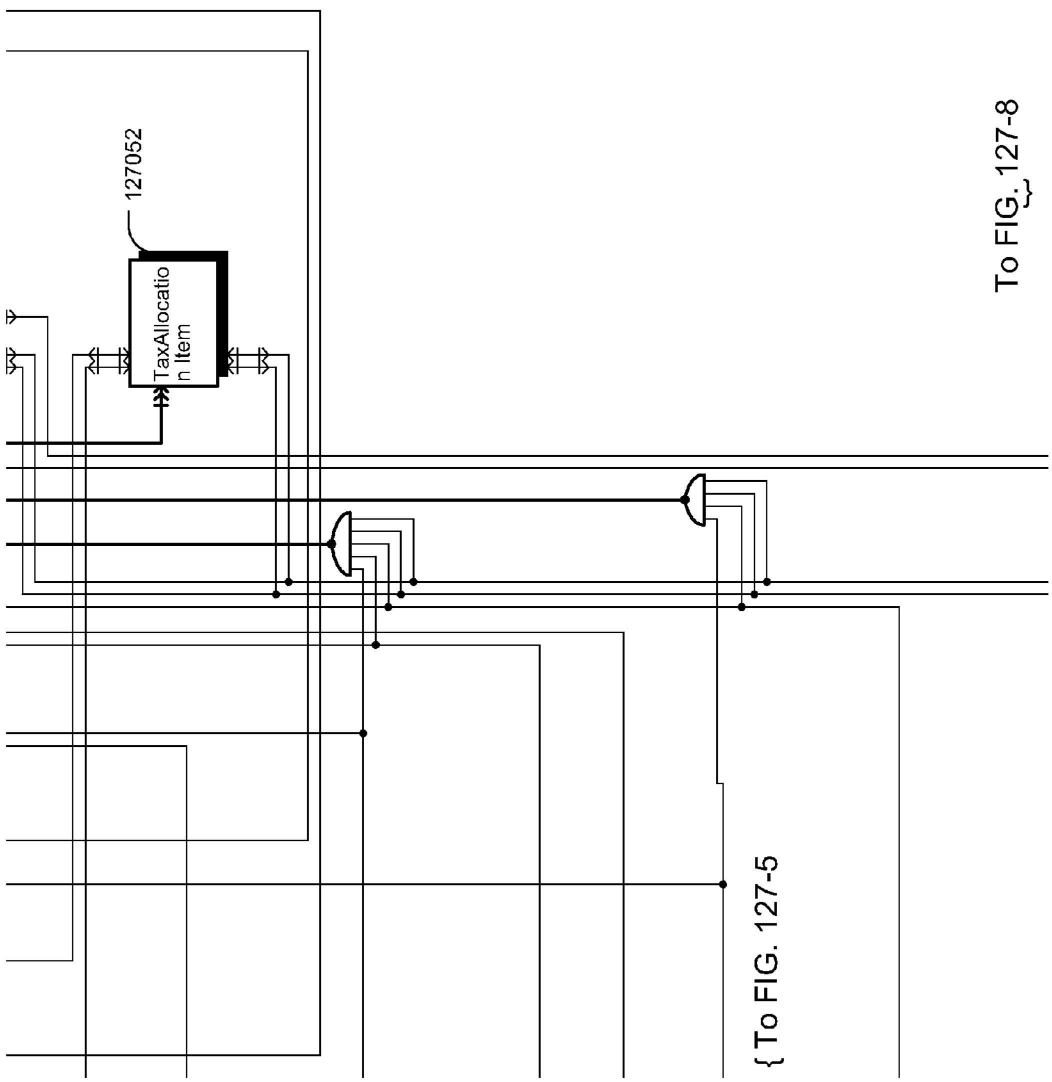
Figures 7, 127:
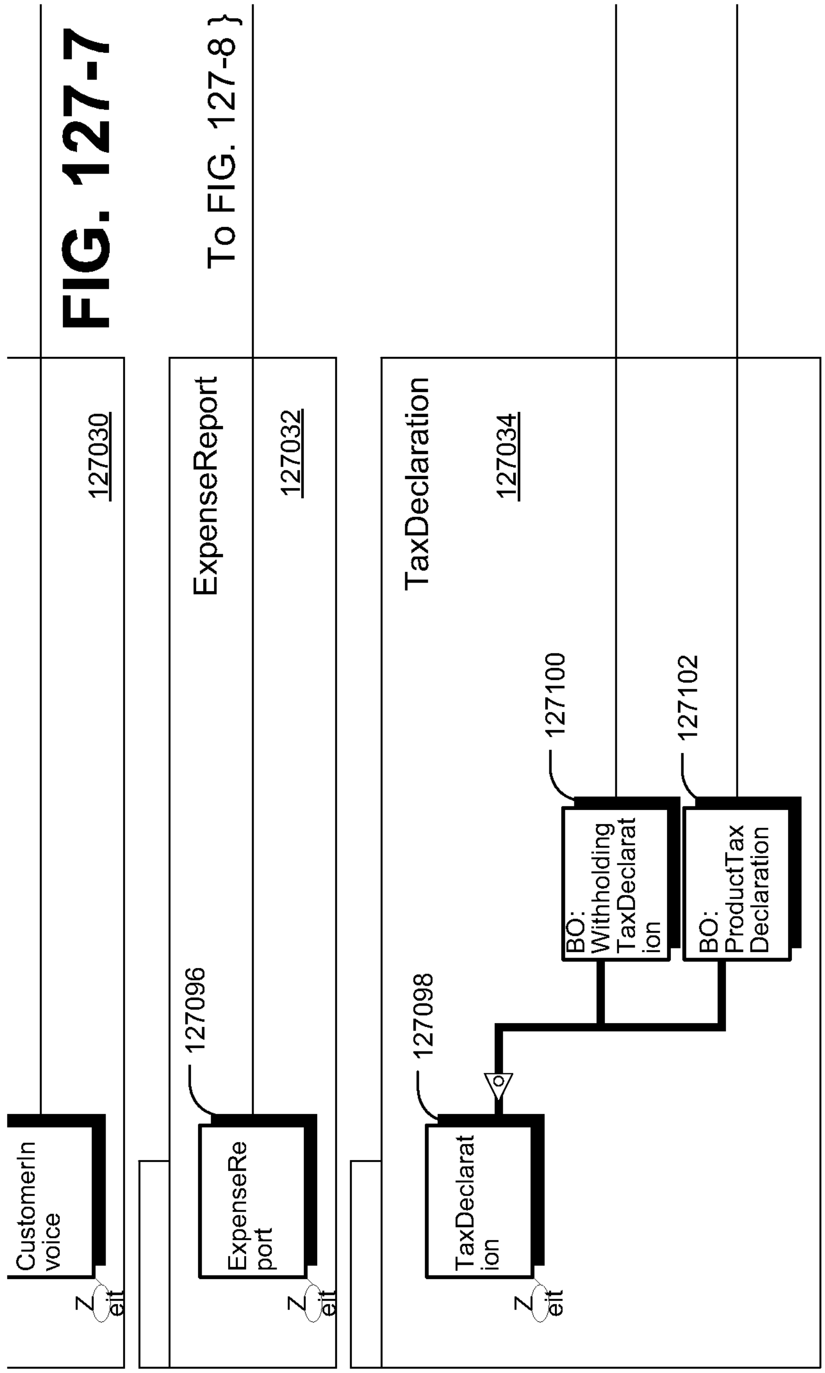
Figures 8, 127:
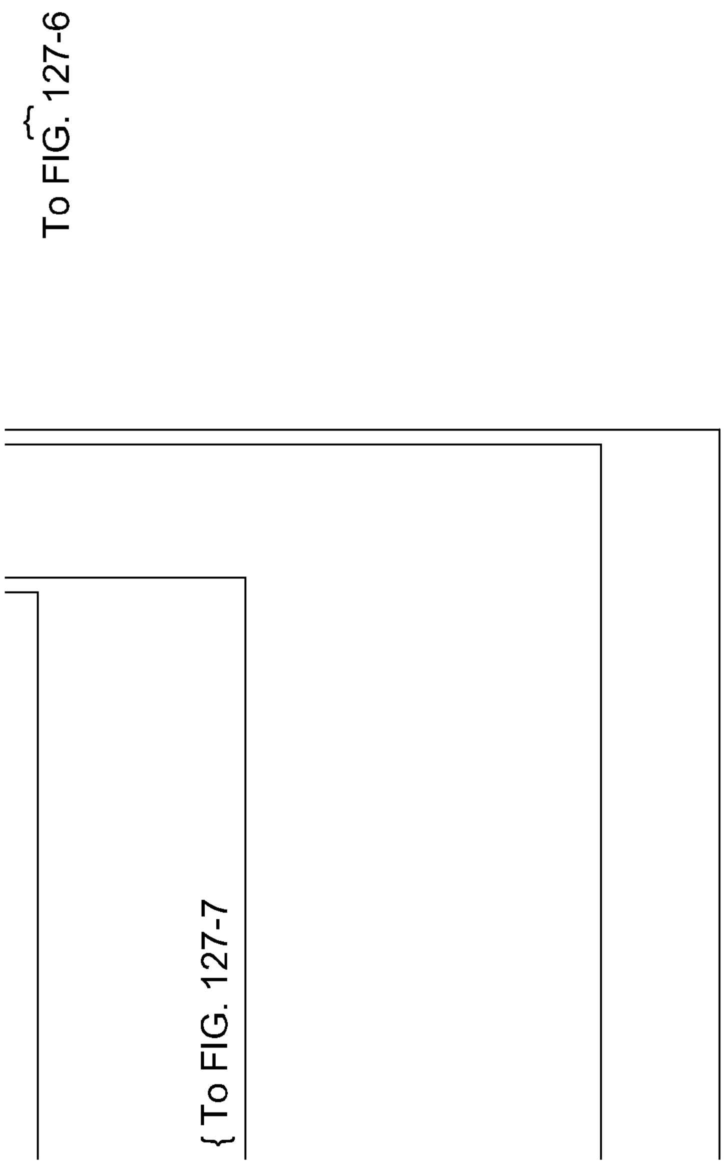

FIGS. 127-1 through 127-6 illustrate an example FinancialAuditTrailDocumentation business object model 127004. Specifically, this model depicts interactions among various hierarchical components of the FinancialAuditTrailDocumentation, as well as external components that interact with the FinancialAuditTrailDocumentation (shown here as 127000 through 127002 and 127006 through 127034 and 127054 through 127102).

FinancialAuditTrailDocumentation is the uniform documentation of the changes to receivables and payables and financial transactions linked to a business transaction for audit purposes. The FinancialAuditTrailDocumentation dependent object is part of the Foundation Layer process component. Operative processes that lead to changes in receivables and payables and financial transactions can result in postings in Financial Accounting. Due to legal requirements, it may be necessary that an auditor can determine the operative origin of these postings (prima nota). The FinancialAuditTrailDocumentation dependent object can be used for this purpose in that it groups together the complete and unchangeable data on which the notification of Financial Accounting is based. The use of the FinancialAuditTrailDocumentation dependent object in the following business process objects can ensure the auditability: DuePayment, DueClearing, Dunning, ProductTaxDeclaration, PaymentOrder, HouseBankStatement, PaymentAllocation, IncomingCheque, ChequeDeposit, and CashPayment. FinancialAuditTrailDocumentation may contain information on the following items: Payments (i.e., PaymentRegisterItem), The use of payments during the allocation to a payment reason (i.e., PaymentRegisterAllocationItem), Changes to receivables and payables from goods and services (i.e., TradeReceivablesPayablesRegisterItem), The grouping of receivables and payables for clearing (i.e., TradeReceivablesPayablesRegisterClearingItem), Incurred expenses or revenues (i.e., ExpenseAndIncomeItem), Changes to tax receivables and tax payables (i.e., ProductTaxItem and WithholdingTaxItem), and the allocation of tax receivables or tax payables (i.e., TaxAllocationItem).

FinancialAuditTrailDocumentation is represented by the node FinancialAuditTrailDocumentation 127036.

Node Structure of FinancialAuditTrailDocumentation Dependent Object

FinancialAuditTrailDocumentation (Root Node)

FinancialAuditTrailDocumentation is the uniform documentation of the changes to receivables and payables and financial transactions linked to a business transaction for audit purposes. It can contain information on the company involved in the business transaction for whom the changes are documented, and the reference to the superordinate business transaction document in which the business transaction is documented from an operative perspective. FinancialAuditTrailDocumentation may also contain information about the following items: Payments (i.e., PaymentRegisterItem), The use of payments during the allocation to a payment reason (i.e., PaymentRegisterAllocationItem), Changes to receivables and payables from goods and services (i.e., TradeReceivablesPayablesRegisterItem), The grouping of receivables and payables for clearing (i.e., TradeReceivablesPayablesRegisterClearingItem), Incurred expenses or revenues (i.e., ExpenseAndIncomeItem), Changes to tax receivables and tax payables (i.e., ProductTaxItem and WithholdingTaxItem), and the allocation of tax receivables or tax payables (i.e., TaxAllocationItem). The elements located directly at the FinancialAuditTrailDocumentation node are defined by the FinancialAuditTrailDocumentation Elements data type. In certain implementations, these elements include: UUID, ID, HostBusinessTransactionDocumentUUID, HostBusinessTransactionDocumentID, HostBusinessTransactionDocumentTypeCode, CancelledFinancialAuditTrailDocumentionUUID, CancelledFinancialAuditTrailDocumentionID, CompanyUUID, CompanyID, SystemAdministrativeData, CancellationDocumentIndicator, CancelledIndicator, BusinessProcessVariantTypeCode, AccountingTransactionDate, DocumentDate, TransactionCurrencyCode, and Note.

UUID is an universal identifier, which can be unique, of FinancialAuditTrailDocumentation. The UUID may be based on GDT UUID.

ID is an identifier, which can be unique, of the FinancialAuditTrailDocumentation. The ID may be based on GDT AuditTrailDocumentationID.

HostBusinessTransactionDocumentUUID is an universal identifier, which can be unique, of the superordinate business transaction document in which the business transaction is documented from an operative perspective. The HostBusinessTransactionDocumentUUID may be based on GDT UUID.

HostBusinessTransactionDocumentID is an identifier, which can be unique, of the superordinate business transaction document in which the business transaction is documented from an operative perspective. The HostBusinessTransactionDocumentID may be based on GDT BusinessTransactionDocumentID.

HostBusinessTransactionDocumentTypeCode is the coded representation of the type of the superordinate business transaction document in which the business transaction is documented from an operative perspective. The HostBusinessTransactionDocumentTypeCode may be based on GDT BusinessTransactionDocumentTypeCode.

The CancelledFinancialAuditTrailDocumentionUUID may be based on GDT AuditTrailDocumentationID.

The CancelledFinancialAuditTrailDocumentionID may be based on GDT AuditTrailDocumentationID.

CompanyUUID is an universal identifier, which can be unique, of the company for whom the changes to receivables and payables and financial transactions linked to a business transaction are documented. The CompanyUUID may be based on GDT UUID.

CompanyID is an identifier, which can be unique, of the company for whom the changes to receivables and payables and financial transactions linked to a business transaction are documented. The CompanyID may be based on GDT OrganisationalCentreID.

SystemAdministrativeData is administrative data stored in the system. This data may include system users and change dates/times. The SystemAdministrativeData may be based on GDT SystemAdministrativeData.

The CancellationDocumentIndicator may be based on GDT Indicator, Qualifier: CancellationDocument.

The CancelledIndicator may be based on GDT Indicator, Qualifier: Cancelled.

BusinessProcessVariantTypeCode is the type of business transaction variant, and is optional. The BusinessProcessVariantTypeCode may be based on GDT BusinessProcessVariantTypeCode.

AccountingTransactionDate is the date on the basis of which the posting date in Financial Accounting is determined. The AccountingTransactionDate may be based on GDT Date, Qualifier: AccountingTransaction.

DocumentDate is the issue date of the FinancialAuditTrailDocumention. The DocumentDate may be based on GDT Date, Qualifier: Document.

TransactionCurrencyCode is the currency key of the transaction currency in the business transaction. The TransactionCurrencyCode may be based on GDT CurrencyCode, Qualifier Transaction.

Note is a natural-language comment on the FinancialAuditTrailDocumentation, and is optional. The Note may be based on GDT Note.

The following composition relationships to subordinate nodes exist: PaymentRegisterItem 127038 1:cn, PaymentRegisterAllocationItem 127040 1:cn, TradeReceivablesPayablesRegisterItem 127042 1:cn, TradeReceivablesPayablesRegisterClearingItem 127044 1:cn, ExpenseAndIncomeItem 127046 1:cn, ProductTaxItem 127050 1:cn, WithholdingTaxItem 127048 1:cn, and TaxAllocationItem 127052 1.cn.

Inbound Aggregation Relationships include: from business object Identity/node Root to CreationIdentity 1:cn that is an identity that created the Financial Audit Trail Documentation, and to LastChangeIdentity c:cn that is an identity that changed the Financial Audit Trail Documentation in the last time.

Inbound Association Relationships include: from business object Company/node Root to OwningCompany 1:cn that is a company to which the business transaction belongs.

PaymentRegisterItem

PaymentRegisterItem is the payment that is documented within FinancialAuditTrailDocumentation. The elements located directly at the PaymentRegisterItem node are defined by the FinancialAuditTrailDocumentationPaymentRegisterItemElements data type. In certain implementations, these elements include: UUID, ID, PaymentRegisterItemBaseBusinessTransactionDocumentReference, HouseBankUUID, TypeCode, TransactionCurrencyAmount, and PaymentFormCode.

UUID is an universal identifier, which can be unique, of a PaymentRegisterItem in the FinancialAuditTrailDocumentation. The UUID may be based on GDT UUID.

ID is an identifier, which may be unique, of an Item in the FinancialAuditTrailDocumentation. The ID may be based on GDT AuditTrailDocumentationIItemID.

PaymentRegisterItemBaseBusinessTransactionDocumentReference is a reference to the business document, or its, item on which the item of the PaymentRegister that is generated for this payment is based. The PaymentRegisterItemBaseBusinessTransactionDocumentReference may be based on GDT BusinessTransactionDocumentReference.

HouseBankUUID is the house bank at which the payment is processed, and is optional. The HouseBankUUID may be based on GDT UUID.

TypeCode is the PaymentRegisterItem type. The TypeCode may be based on GDT PaymentRegisterItemTypeCode.

TransactionCurrencyAmount is the amount of payment. The TransactionCurrencyAmount may be based on GDT Amount, Qualifier: TransactionCurrency.

PaymentFormCode is the coded representation of the payment form, and is optional. The PaymentFormCode may be based on GDT PaymentFormCode.

Inbound Association Relationships include: from business object HouseBank/node Root to HouseBank c:cn that is a bank that carries out the payment, from business object PaymentOrder/node Root to PaymentOrder c:c that is a payment order on which the payment register item generated for the payment is based, from business object IncomingCheque/node Root to IncomingCheque c:c that is an incoming check on which the payment register item generated for the payment is based, from business object ChequeDeposit/node Root to ChequeDeposit c:c that is a check deposit on which the payment register item generated for the payment is based, from business object HouseBankStatement/node Item to HouseBankStatementItem c:c that is a bank statement item on which the payment register item generated for the payment is based, from business object CashTransfer/node Root to CashTransfer c:c that is a cash transfer on which the payment register item generated for the payment is based, from business object CashPayment/node Root to CashPayment c:c that is a cash payment on which the payment register item generated for the payment is based, from business object ClearingHousePaymentOrder/node Root to ClearingHousePaymentOrder c:c that is a card payment on which the payment register item generated for the payment is based, and from business object DuePayment/node Root to DuePayment c:c that is a payment on which the payment register item generated for the payment is based.

PaymentRegisterAllocationItem

PaymentRegisterAllocationItem is the use of a payment during the allocation to a payment reason that is documented within FinancialAuditTrailDocumentation. The elements located directly at the PaymentRegisterAllocationItem node are defined by the FinancialAuditTrailDocumentationPaymentRegisterAllocationItemElements data type. In certain implementations, these elements include: UUID, ID, AllocationPaymentRegisterItemBaseBusinessTransactionDocumentReference, TransactionCurrencyAmount, and PaymentAmount.

UUID is an universal identifier, which can be unique, of a PaymentRegisterAllocationItem in the FinancialAuditTrailDocumentation. The UUID may be based on GDT UUID.

ID is an identifier, which can be unique, of an Item in the FinancialAuditTrailDocumentation. The ID may be based on GDT AuditTrailDocumentationItemID.

AllocationPaymentRegisterItemBaseBusinessTransactionDocumentReference is a reference to the business document or its item on which the item of the PaymentRegister that is used for the allocation to a payment reason is based. The AllocationPaymentRegisterItemBaseBusinessTransactionDocumentReference may be based on GDT BusinessTransactionDocumentReference.

TransactionCurrencyAmount is the amount of the payment in the transaction currency used during allocation of a payment reason. The TransactionCurrencyAmount may be based on GDT Amount, Qualifier: TransactionCurrency.

PaymentAmount is the amount of the payment used during allocation of a payment reason, and is optional. PaymentAmount may only need to be filled if the currency of the payment differs from the transaction currency at the time of allocation. The PaymentAmount may be based on GDT Amount, Qualifier: Payment.

Inbound Association Relationships include: from business object PaymentOrder/node Root to PaymentOrder c:c that is a payment order on which the allocated payment register item is based, from business object IncomingCheque/node Root to IncomingCheque c:c that is an incoming check on which the allocated payment register item is based, from business object ChequeDeposit/node Root to ChequeDeposit c:c that is a check deposit on which the allocated payment register item is based, from business object HouseBankStatement/node Item to HouseBankStatementItem c:c that is a bank statement item on which the allocated payment register item is based, from business object CashTransfer/node Root to CashTransfer c:c that is a cash transfer on which the allocated payment register item is based, from business object CashPayment/node Root to CashPayment c:c that is a cash payment on which the allocated payment register item is based, from business object ClearingHousePaymentOrder/node Root to ClearingHousePaymentOrder c:c card payment on which the allocated payment register item is based, and from business object Due- Payment/node Root to DuePayment c:c that is a payment on which the allocated payment register item is based.

TradeReceivablesPayablesRegisterItem

TradeReceivablesPayablesRegisterItem is the receivable or payable from goods or services that is documented within. FinancialAuditTrailDocumentation. The elements located directly at the TradeReceivablesPayablesRegisterItem node are defined by the FinancialAuditTrailDocumentationTradeReceivablesPayablesRegisterItemElements data type. In certain implementations, these elements include: UUID, ID, TradeReceivablesPayablesRegisterItemBaseBusinessTransactionDocumentReference, BusinessPartnerUUID, PartyRoleCategoryCode, OrderBusinessTransactionDocumentReference, ContractBusinessTransactionDocumentReference, TypeCode, TransactionCurrencyAmount, and DueDate.

UUID is an universal identifier, which can be unique, of a TradeReceivablesPayablesRegisterItem in the FinancialAuditTrailDocumentation. The UUID may be based on GDT UUID.

ID is an identifier, which can be unique, of an Item in the FinancialAuditTrailDocumentation. The ID may be based on GDT AuditTrailDocumentationItemID.

TradeReceivablesPayablesRegisterItemBaseBusinessTransactionDocumentReference is a reference to the business document or its item on which the item of the TradeReceivablesPayablesRegister that is generated for this receivable or payable is based. The TradeReceivablesPayablesRegisterItemBaseBusinessTransactionDocumentReference may be based on GDT BusinessTransactionDocumentReference.

BusinessPartnerUUID is an universal identifier, which can be unique, of the business partner that occurs in the role Debitor or Creditor in TradeReceivablesPayablesRegisterItem. The BusinessPartnerUUID may be based on GDT UUID.

PartyRoleCategoryCode is the role in which the business partner occurs in TradeReceivablesPayablesRegisterItem. The PartyRoleCategoryCode may be based on GDT PartyRoleCategoryCode. The code for Creditor is typically 3 and the code for Debitor is typically 4.

OrderBusinessTransactionDocumentReference is a reference to a Sales or PurchaseOrder, and is optional. The OrderBusinessTransactionDocumentReference may be based on GDT BusinessTransactionDocumentReference. Typically, the SalesOrder (127) and PurchaseOrder (001) TypeCodes are used in the Type Code attribute.

ContractBusinessTransactionDocumentReference is a reference to a Sales or PurchaseContract, and is optional. The ContractBusinessTransactionDocumentReference may be based on GDT BusinessTransactionDocumentReference. Typically, the SalesContract (002) and PurchasingContract (120) codes are used in the Type Code attribute.

TypeCode is the type of the receivable or payable. The TypeCode may be based on GDT TradeReceivablesPayablesRegisterItemTypeCode.

TransactionCurrencyAmount is the amount of the receivable or payable in the transaction currency. The TransactionCurrencyAmount may be based on GDT Amount, Qualifier: TransactionCurrency.

DueDate is the due date of the receivable or payable. The DueDate may be based on GDT Date, Qualifier Due.

Inbound Association Relationships include: from business object BusinessPartner/node Root to Debtor c:cn that is a business partner that occurs in the role Debitor during the receivable or payable, from business object BusinessPartner/node Root to Creditor c:cn that is a business partner that occurs in the role Creditor during the receivable or payable, from business object DuePayment/node DuePaymentItem to DuePaymentItem c:c that is a payment item on which the generated due receivable/payable is based, and from business object Dunning/node Root to Dunning c:c that is a dunning on which the generated due receivable/payable is based.

Integrity Conditions

The business partner occurs in TradeReceivablesPayablesRegisterItem in exactly one role, either as Creditor or as Debitor.

TradeReceivablesPayablesRegisterClearingItem

TradeReceivablesPayablesRegisterClearingItem is the clearing of a receivable or payable that is documented within FinancialAuditTrailDocumentation. The elements located directly at the TradeReceivablesPayablesClearingItem node are defined by the FinancialAuditTrailDocumentationTradeReceivablesPayablesRegisterClearingItemElements data type. In certain implementations, these elements include: UUID, ID, ClearingTradeReceivablesPayablesRegisterItemBaseBusinessTransactionDocumentReference, PartyRoleCategoryCode, TransactionCurrencyAmount, and OpenItemAmount.

UUID is an universal identifier, which can be unique, of a TradeReceivablesPayablesRegisterClearingItem in the FinancialAuditTrailDocumentation. The UUID may be based on GDT UUID.

ID is an identifier, which can be unique, of an Item in the FinancialAuditTrailDocumentation. The ID may be based on GDT AuditTrailDocumentationItemID.

ClearingTradeReceivablesPayablesRegisterItemBaseBusinessTransactionDocumentReference is a reference to the business document or its item on which the item of the TradeReceivablesPayablesRegister that is cleared is based. The ClearingTradeReceivablesPayablesRegisterItemBaseBusinessTransactionDocumentReference may be based on GDT BusinessTransactionDocumentReference.

The PartyRoleCategoryCode may be based on GDT PartyRoleCategoryCode. The code for Creditor is typically 3 and the code for Debitor is typically 4.

TransactionCurrencyAmount is the amount in the transaction currency that is included in the clearing. The TransactionCurrencyAmount may be based on GDT: Amount, Qualifier: TransactionCurrency.

OpenItemAmount is the amount in the currency of the receivable or payable that is included in the clearing, and is optional. The OpenItemAmount may be based on GDT: Amount, Qualifier: OpenItem.

Inbound Association Relationships include: from business object SupplierInvoice/node SupplierInvoice to SupplierInvoice c:c that is a supplierInvoice on which the cleared due receivable/payable is based, from business object CustomerInvoice/node CustomerInvoice to CustomerInvoice c:c that is a customerInvoice on which the cleared due receivable/payable is based, from business object ExpenseReport/node ExpenseReport to ExpenseReport c:c that is an expense report on which the cleared due receivable/payable is based, from business object DuePayment/node DuePaymentItem to DuePaymentItem c:c that is a payment item on which the cleared due receivable/payable is based, and from business object Dunning/node Root to Dunning c:c that is a dunning on which the cleared due receivable/payable is based.

ExpenseAndIncomeItem

ExpenseAndIncomeItem is an expense or revenue that is documented within FinancialAuditTrailDocumentation. The elements located directly at the ExpenseAndIncomeItem node are defined by the FinancialAuditTrailDocumentationExpenseAndIncomeItemElements data type. In certain implementations, these elements include: UUID, ID, RelatedBaseBusinessTransactionDocumentReference, ProductTaxBusinessTransactionDocumentItemGroupID, ExpenseAndIncomeCategoryCode, and TransactionCurrencyAmount.

UUID is an universal identifier, which can be unique, of an ExpenseAndIncomeItem in the FinancialAuditTrailDocumentation. The UUID may be based on GDT UUID.

ID is an identifier, which can be unique, of an Item in the FinancialAuditTrailDocumentation. The ID may be based on GDT AuditTrailDocumentationIItemID.

RelatedBaseBusinessTransactionDocumentReference is a reference to the business document or its item to which the expense or income relates, and is optional. The RelatedBaseBusinessTransactionDocumentReference may be based on GDT BusinessTransactionDocumentReference.

ProductTaxBusinessTransactionDocumentItemGroupID is an identifier, which can be unique, of a group of ExpenseAndIncomeItems that are taxed the same way, and is optional. The ProductTaxBusinessTransactionDocumentItemGroupID may be based on GDT BusinessTransactionDocumentItemGroupID.

ExpenseAndIncomeCategoryCode is the category of the expense or income. The ExpenseAndIncomeCategoryCode may be based on GDT: ExpenseAndIncomeCategoryCode. The following may be constraints of ExpenseAndIncomeCategoryCode: 1 (i.e., BankAccountInterest), 2 (i.e., BankAccountMaintenanceFee), 3 (i.e., BankAccountTransactionFee), 4 (i.e., CashDiscount), 5 (i.e., ChargeOffDifference), 6 (i.e., InsolvencyWriteOff), 9 (i.e., PaymentDifferenceForAlternativeCurrency).

TransactionCurrencyAmount is the amount of the expense or income in the transaction currency. The TransactionCurrencyAmount may be based on GDT Amount, Qualifier: TransactionCurrency.

Inbound Association Relationships include: from business object SupplierInvoice/node SupplierInvoice to RelatedSupplierInvoice c:c that is a supplierInvoice to which the expense or income relates, from business object CustomerInvoice/node CustomerInvoice to RelatedCustomerInvoice c:c that is a customerInvoice to which the expense or income relates, from business object ExpenseReport/node ExpenseReport to RelatedExpenseReport c:c that is an expense report to which the expense or income relates, from business object Dunning/node Root to RelatedDunning c:c that is a dunning to which the expense or income relates, from business object IncomingCheque/node Root to RelatedIncomingCheque c:c that is a check to which the expense or income relates, from business object ChequeDeposit/node Root to RelatedChequeDeposit c:c that is a check deposit to which the expense or income relates, from business object HouseBankStatement/node Item to RelatedBankStatement c:c that is a bank statement item to which the expense or income relates, from business object CashTransfer/node Root to RelatedCashTransfer c:c that is a cashTransfer to which the expense or income relates, from business object CashPayment/node Root to RelatedCashPayment c:c that is a Cash payment to which the expense or income relates, and from business object ClearingHousePaymentOrder/node Root to RelatedClearingHousePaymentOrder c:c that is a Card payment to which the expense or income relates.

ProductTaxItem

ProductTaxItem is the receivable or payable from purchase tax and/or sales tax that is documented within FinancialAuditTrailDocumentation. The elements located directly at the ProductTaxItem node are defined by the FinancialAuditTrailDocumentationProductTaxItemElements data type. In certain implementations, these elements include: UUID, ID, RelatedBaseBusinessTransactionDocumentReference, TaxReceivablesPayablesRegisterItemBaseBusinessTransactionDocumentReference, TaxAuthorityUUID, TaxAllocationAccountingNotificationItemGroupID, TaxReceivablesPayablesRegisterItemSplitItemTypeCode, TaxDeclarationTaxAmount, TaxDeclarationNonDeductibleAmount, and ProductTax.

UUID is an universal identifier, which can be unique, of a ProductTaxItem in the FinancialAuditTrailDocumentation. The UUID may be based on GDT UUID.

ID is an identifier, which can be unique of an Item in the FinancialAuditTrailDocumentation. The ID may be based on GDT AuditTrailDocumentationItemID.

RelatedBaseBusinessTransactionDocumentReference is a reference to the business document or its item to which the tax relates, and is optional. The RelatedBaseBusinessTransactionDocumentReference may be based on GDT BusinessTransactionDocumentReference.

TaxReceivablesPayablesRegisterItemBaseBusinessTransactionDocumentReference is a reference to the business document, or its item, on which the item in the TaxReceivablesPayablesRegister that is generated for this tax is based. The TaxReceivablesPayablesRegisterItemBaseBusinessTransactionDocumentReference may be based on GDT BusinessTransactionDocumentReference.

TaxAuthorityUUID is an universal identifier, which can be unique, of the tax authority to which the tax receivable or tax payable is reported. The TaxAuthorityUUID may be based on GDT UUID.

TaxAllocationAccountingNotificationItemGroupID is an identifier, which can be unique, of a group of tax receivables and payables that are allocated together and from which this ProductTaxItem is derived, and is optional. The TaxAllocationAccountingNotificationItemGroupID may be based on GDT BusinessTransactionDocumentItemGroupID.

The TaxReceivablesPayablesRegisterItemSplitItemTypeCode may be based on GDT TaxReceivablesPayablesRegisterItemSplitItemTypeCode.

TaxDeclarationTaxAmount is the amount of tax in the tax declaration currency, and is optional. The TaxDeclarationTaxAmount is typically filled if the tax declaration currency differs from the transaction currency. The TaxDeclarationTaxAmount may be based on GDT Amount, Tax.

TaxDeclarationNonDeductibleAmount is the amount of tax in the tax declaration currency that is non-deductible, and is optional. The TaxDeclarationNonDeductibleAmount is typically filled if the tax declaration currency differs from the transaction currency. The TaxDeclarationNonDeductibleAmount may be based on GDT Amount, Qualifier NonDeductible.

ProductTax is the purchase tax and/or sales tax, and is optional. The ProductTax may be based on GDT ProductTax. The GDT structure may be reduced to the following elements: CountryCode, RegionCode, EventTypeCode, TypeCode, RateTypeCode, Amount, NonDeductibleAmount, BusinessTransactionDocumentItemGroupID, DueCategoryCode, and DeferredIndicator.

Inbound Association Relationships include: From business object TaxAuthority/node Root to TaxAuthority 1:cn that is a Tax authority to which the tax receivable or tax payable is to be reported, from business object SupplierInvoice/node SupplierInvoice to RelatedSupplierInvoice c:c that is a Supplier- Invoice to which the tax relates, from business object CustomerInvoice/node CustomerInvoice to RelatedCustomerInvoice c:c that is a CustomerInvoice to which the tax relates, from business object ExpenseReport/node ExpenseReport to RelatedExpenseReport c:c that is an Expense report to which the tax relates, from business object DueClearing/node DueClearing to DueClearing c:cn that is a DueClearing on which this due tax receivable/payable is based, and from business object ProductTaxDeclaration/node ProductTaxDeclaration to ProductTaxDeclaration c:c that is a ProductTaxDeclaration on which this due tax receivable/payable is based.

WithholdingTaxItem

WithholdingTaxItem is the receivable or payable from withholding tax that is documented within FinancialAuditTrailDocumentation. The elements found directly at the WithholdingTaxItem node are defined by the FinancialAuditTrailDocumentationWithholdingTaxItemElements data type. In certain implementations, these elements include: UUID, ID, TaxReceivablesPayablesRegisterItemBaseBusinessTransactionDocumentReference, TaxAuthorityUUID, TaxAllocationAccountingNotificationItemGroupID, TaxDeclarationTaxAmount, and WithholdingTax.

UUID is an universal identifier, which can be unique, of a WithholdingTaxItem in the FinancialAuditTrailDocumentation. The UUID may be based on GDT UUID.

ID is an identifier, which can be unique, of an Item in the FinancialAuditTrailDocumentation. The ID may be based on GDT AuditTrailDocumentationIItemID.

TaxReceivablesPayablesRegisterItemBaseBusinessTransactionDocumentReference is a reference to the business document or its item on which the item in the TaxReceivablesPayablesRegister that is generated for this tax is based. The TaxReceivablesPayablesRegisterItemBaseBusinessTransactionDocumentReference may be based on GDT BusinessTransactionDocumentReference.

TaxAuthorityUUID is an universal identifier, which can be unique, of the tax authority to which the tax receivable or tax payable is reported. The TaxAuthorityUUID may be based on GDT UUID.

TaxAllocationAccountingNotificationItemGroupID is an identifier, which can be unique, of a group of tax receivables and payables that are allocated together and from which this WithholdingTaxItem is derived, and is optional. The TaxAllocationAccountingNotificationItemGroupID may be based on GDT BusinessTransactionDocumentItemGroupID.

TaxDeclarationTaxAmount is the amount of tax in the tax declaration currency, and is optional. The TaxDeclarationTaxAmount is typically filled if the tax declaration currency differs from the transaction currency. The TaxDeclarationTaxAmount may be based on GDT Amount, Qualifier Tax.

WithholdingTax is the withholding tax. The WithholdingTax may be based on GDT WithholdingTax. The GDT structure may be reduced to the following elements: CountryCode, RegionCode, EventTypeCode, TypeCode, RateTypeCode, and Amount.

Inbound Association Relationships include: from business object TaxAuthority/node Root to TaxAuthority 1:cn that is a Tax authority to which the tax receivable or tax payable is to be reported, from business object WithholdingTaxDeclaration/node Root to WithholdingTaxDeclaration c:c that is a WithholdingTaxDeclaration on which this due tax receivable/payable is based, and from business object DuePayment/node DuePaymentItem to DuePaymentItem c:c that is a Payment item on which this due tax receivable/payable is based.

TaxAllocationItem

TaxAllocationItem is an allocation of a tax receivable or payable that occurred in a preceding business transaction. The elements located directly at the TaxAllocationItem node are defined by the FinancialAuditTrailDocumentationTaxAllocationItemElements data type. In certain implementations, these elements include: UUID, ID, AllocationTaxReceivablesPayablesRegisterItemBaseBusinessTransactionDocumentReference, TaxAllocationAccountingNotificationItemGroupID, TaxDeclarationTaxAmount, and TransactionCurrencyAmount.

UUID is an universal identifier, which can be unique, of a TaxAllocationItem in the FinancialAuditTrailDocumentation. The UUID may be based on GDT UUID.

ID is an identifier, which can be unique, of an Item in the FinancialAuditTrailDocumentation. The ID may be based on GDT AuditTrailDocumentationItemID.

AllocationTaxReceivablesPayablesRegisterItemBaseBusinessTransactionDocumentReference is a reference to the business document or its item on which the item of the TaxReceivablesPayablesRegister that is cleared is based. The AllocationTaxReceivablesPayablesRegisterItemBaseBusinessTransactionDocumentReference may be based on GDT BusinessTransactionDocumentReference.

TaxAllocationAccountingNotificationItemGroupID is an identifier, which can be unique, of a group of tax receivables and payables that are allocated together, and is optional. The TaxAllocationAccountingNotificationItemGroupID may be based on GDT BusinessTransactionDocumentItemGroupID.

TaxDeclarationTaxAmount is the amount of allocated tax in tax declaration currency, and is optional. The TaxDeclarationTaxAmount may be based on GDT Amount, Tax.

TransactionCurrencyAmount is the amount of allocated tax in tax declaration currency, and is optional. The TransactionCurrencyAmount may be based on GDT Amount, Qualifier TransactionCurrency.

Inbound Association Relationships include: from business object SupplierInvoice/node SupplierInvoice to SupplierInvoice c:c that is a SupplierInvoice to which the tax relates that is allocated, from business object CustomerInvoice/node CustomerInvoice to CustomerInvoice c:c that is a CustomerInvoice to which the tax relates that is allocated, from business object ExpenseReport/node ExpenseReport to ExpenseReport c:c that is an Expense report to which the tax relates that is allocated, and from business object DueClearing/node DueClearing to DueClearing c:cn that is a DueClearing to which the tax relates that is allocated.

Business Object IdentifiedStock

Figure 128:
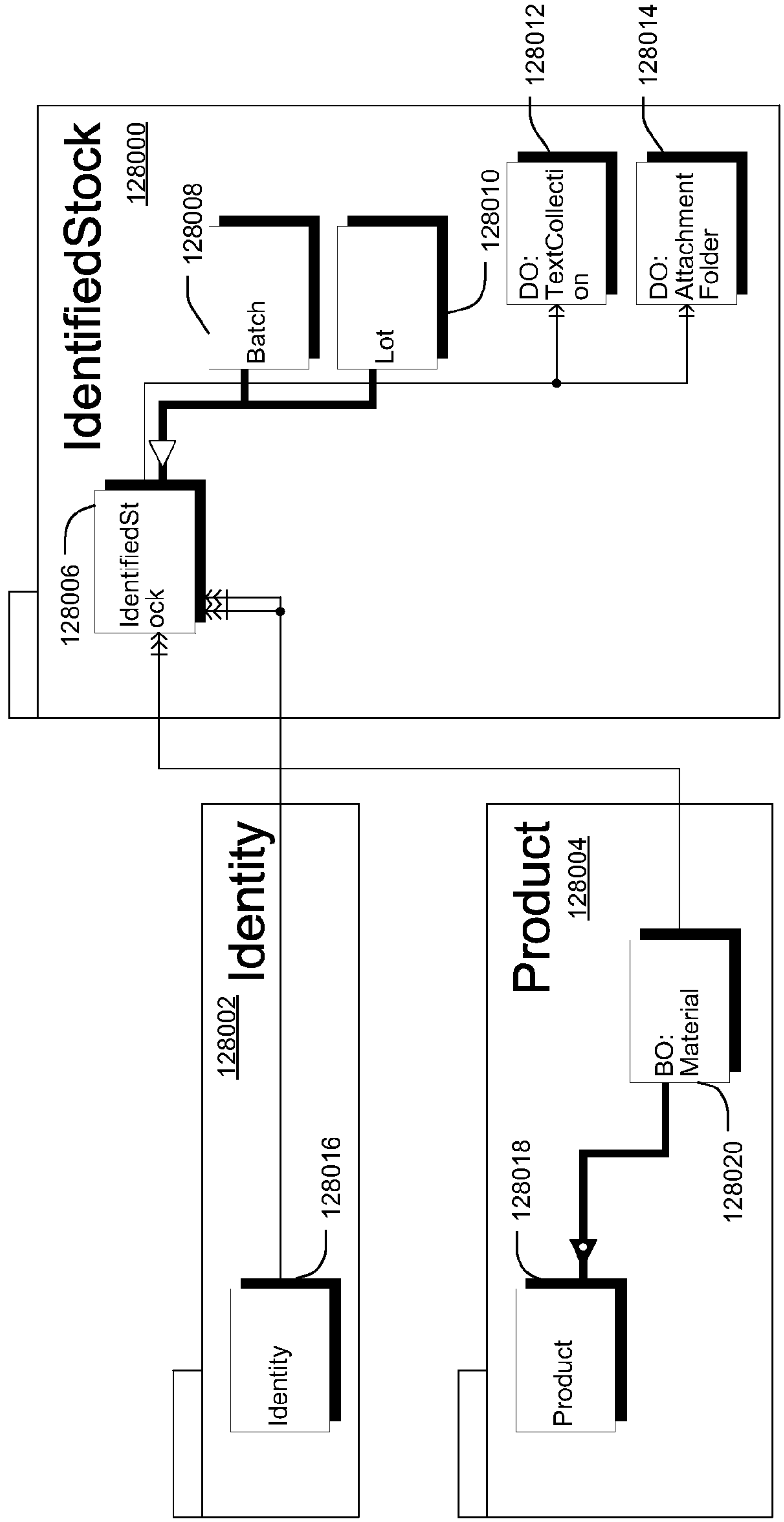

FIG. 128 illustrates an example IdentifiedStock business object model 128000. Specifically, this model depicts interactions among various hierarchical components of the IdentifiedStock, as well as external components that interact with the IdentifiedStock (shown here as 128002 through 128004 and 128016 through 128020).

The Business Object IdentifiedStock is a subset of a material that shares a set of common characteristics, is logistically handled separately from other subsets of the same material, and can be uniquely identified. The business object IdentifiedStock can be part of the foundation layer, and in some implementations, may not part of any process component. An IdentifiedStock contains information about the IdentifiedStock, including expiration date, production date, and the related material (IdentifiedStock). IdentifiedStock can be represented by the root node IdentifiedStock.

Node Structure of Business Object IdentifiedStock

IdentifiedStock 128008 is a subset of a material that shares a set of common characteristics, is logistically handled separately from other subsets of the same material and is uniquely identified. The IdentifiedStock can contain information about the IdentifiedStock, including expiration date, production date and related material (IdentifiedStock). IdentifiedStock can occur in the Batch 128008 and Lot 128010 disjoint specializations: Batch is an IdentifiedStock whose characteristics are typically of physical or chemical nature, since it is created in one production process. Batch is a standard term that is used in the food, process, and chemical industries. Lot is an IdentifiedStock whose characteristics are typically of physical or chemical nature, since it is created in one production process. Lot is a standard term that is used in the electronics industry.

The elements located directly at the node IdentifiedStock may be defined by the type GDT IdentifiedStock Elements. In certain implementations, these elements include UUID, ID, MaterialUUID, MaterialID, SystemAdministrativeData, IdentifiedStockTypeCode, SupplierIdentifiedStockID, ProductionDateTime, ExpirationDateTime, IdentifiedStockRestrictedUseIndicator, Status, IdentifiedStockLifeCycleStatusCode, and Key. UUID is a universal identifier, which may be unique, of the IdentifiedStock for referencing purposes. It may be based on GDT UUID. ID is an identifier, which may be unique, of the IdentifiedStock, in the context of a material number. It may be based on GDT IdentifiedStockID. MaterialUUID is a universal identifier, which may be unique, of the Material, which is assigned in order to reference the specific Material, a sub-quantity of which is identified by the IdentifiedStock. It may be based on GDT UUID. MaterialID is a readable alternative identifier of a Material, a sub-quantity of which is identified by the IdentifiedStock. It may be based on GDT ProductID. SystemAdministrativeData is administrative data that is stored in a system. This data includes system users and change dates/times. It may be based on GDT SystemAdministrativeData. IdentifiedStockTypeCode is a coded representation of the type of an IdentifiedStock. It may be based on GDT IdentifiedStockTypeCode. SupplierIdentifiedStockID is an identifier originally assigned to the IdentifiedStock by the IdentifiedStock supplier, and it is optional. It may be based on GDT IdentifiedStockID. ProductionDateTime is the date and time at which the IdentifiedStock was produced, and it is optional. It may be based on GDT GLOBAL_DateTime. In certain implementations, ProductionDateTime may include a qualifier of Production. ExpirationDateTime is the date and time at which the IdentifiedStock expires, and it is optional. It may be based on GDT GLOBAL_DateTime. In certain implementations, ExpirationDateTime may include a qualifier of Expiration. IdentifiedStockRestrictedUseIndicator indicates whether or not IdentifiedStock is restricted for use by business processes. It may be based on GDT Indicator. In certain implementations, IdentifiedStockRestrictedUseIndicator may include a qualifier of RestrictedUse. Status specifies the current status of an IdentifiedStock. It may be based on IDT IdentifiedStockStatus.

IdentifiedStockLifeCycleStatusCode is information about the IdentifiedStock lifecycle status. It may be based on GDT IdentifiedStockLifeCycleStatusCode. Key is the alternative key for the IdentifiedStock node. It may be based on IDT IdentifiedStockKey. The IdentifiedStockKey consists of the elements ID and MaterialID.

IdentifiedStock can have a number of composition relationships to subordinate nodes, such as DO: AttachmentFolder 1:c and DO: TextCollection 128012 1:c. IdentifiedStock can have the following relationship to node Root Material, which denotes the Material, a sub-quantity of which is identified by the IdentifiedStock: 1:cn. IdentifiedStock can have the following relationship to node Root CreationIdentity: 1:cn. CreationIdentity denotes the user that created the IdentifiedStock. IdentifiedStock can have the following relationship to node Root LastChangeIdentity: 1:cn. LastChangeIdentity denotes the user that last changed the IdentifiedStock.

Actions

Activate, an S&AM action, may be able to activates an IdentifiedStock for usage in logistic processes. The lifecycle status may or may not be set to 'Active'. Block, an S&AM action, may be able to block an IdentifiedStock, so usage of the IdentifiedStock may temporary not be allowed. The IdentifiedStock may or may not currently be 'Active'. The lifecycle status is set to 'Blocked'. Unblock, an S&AM action, may be able to unblock a blocked IdentifiedStock. The IdentifiedStock may or may not currently be 'Blocked'. The lifecycle status may or may not be set to 'Active'. SetAsObsolete, an S&AM action, may be able to set an IdentifiedStock as obsolete, so usage of the IdentifiedStock may or may not allowed. The IdentifiedStock may or may not currently be 'Active'. The lifecycle status may or may not be set to 'Obsolete'. RevokeObsolescence, an S&AM action, may be able to make an obsolete IdentifiedStock non-obsolete, so usage of the IdentifiedStock may be allowed. The IdentifiedStock may or may not currently be 'Obsolete'. The lifecycle status may or may not be set to 'Active'. Delete, an S&AM action, may be able to delete an IdentifiedStock that has not yet been activated. The IdentifiedStock may or may not currently be 'In Preparation'. The deletion may or may not be physical. Thereafter, the IdentifiedStock may or may not exist.

Queries

QueryByElementsAndBusinessPartnerName provides a list of all IdentifiedStocks instances that satisfy the selection criteria specified by the IdentifiedStock query elements, together with the name of a business partner. The query elements are defined by the data type IdentifiedStockElementsQueryElements. In certain implementations, these elements include ID, MaterialUUID, MaterialID, SystemAdministrativeData, CreationBusinessPartnerCommonPersonNameGivenName, CreationBusinessPartnerCommonPersonNameFamilyName, LastChangeBusinessPartnerCommonPersonNameGivenName, LastChangeBusinessPartnerCommonPersonNameFamilyName, IdentifiedStockTypeCode, SupplierIdentifiedStockID, ProductionDateTime, ExpirationDateTime, IdentifiedStockRestrictedUseIndicator, and LifeCycleStatusCode. ID is optional and may be based on GDT IdentifiedStockID. MaterialUUID is optional and may be based on GDT UUID. MaterialID is optional and may be based on GDT ProductID. SystemAdministrativeData is optional and may be based on GDT SystemAdministrativeData. CreationBusinessPartnerCommonPersonNameGivenName is from BO BusinessPartner. CreationBusinessPartnerCommonPersonNameGivenName is optional and may be based on GDT LANGUAGEINDEPENDENT_MEDIUM_Name. In certain implementations, CreationBusinessPartnerCommonPersonNameGivenName may include a qualifier of Given.

CreationBusinessPartnerCommonPersonNameFamilyName is from BO BusinessPartner. CreationBusinessPartnerCommonPersonNameFamilyName is optional and may be based on GDT LANGUAGEINDEPENDENT_MEDIUM_Name. In certain implementations, CreationBusinessPartnerCommonPersonNameFamilyName may include a qualifier of Family. LastChangeBusinessPartnerCommonPersonNameGivenName is from BO BusinessPartner. LastChangeBusinessPartnerCommonPersonNameGivenName is optional and may be based on GDT LANGUAGEINDEPENDENT_MEDIUM_Name. In certain implementations, LastChangeBusinessPartnerCommonPersonNameGivenName may include a qualifier of Given.

LastChangeBusinessPartnerCommonPersonNameFamilyName is optional and may be based on GDT LANGUAGEINDEPENDENT_MEDIUM_Name. In certain implementations, LastChangeBusinessPartnerCommonPersonNameFamilyName may include a qualifier of Family.

IdentifiedStockTypeCode is optional and may be based on GDT IdentifiedStockTypeCode.

SupplierIdentifiedStockID is optional and may be based on GDT IdentifiedStockID.

ProductionDateTime is optional and may be based on GDT GLOBAL_DateTime. ExpirationDateTime is optional and may be based on GDT GLOBAL_DateTime. IdentifiedStockRestrictedUseIndicator is optional, and may be based on GDT Indicator. In some implementations, IdentifiedStockRestrictedUseIndicator may include a qualifier of RestrictedUse. LifeCycleStatusCode is optional and may be based on GDT IdentifiedStockLifeCycleStatusCode.

The DO: TextCollection is a collection of all textual descriptions related to the IdentifiedStock. The DO: AttachmentFolder 218014 is a container of documents for the IdentifiedStock that describe the IdentifiedStock or certain processes that are related to the IdentifiedStock.

Business Object Identity

Figure 129:
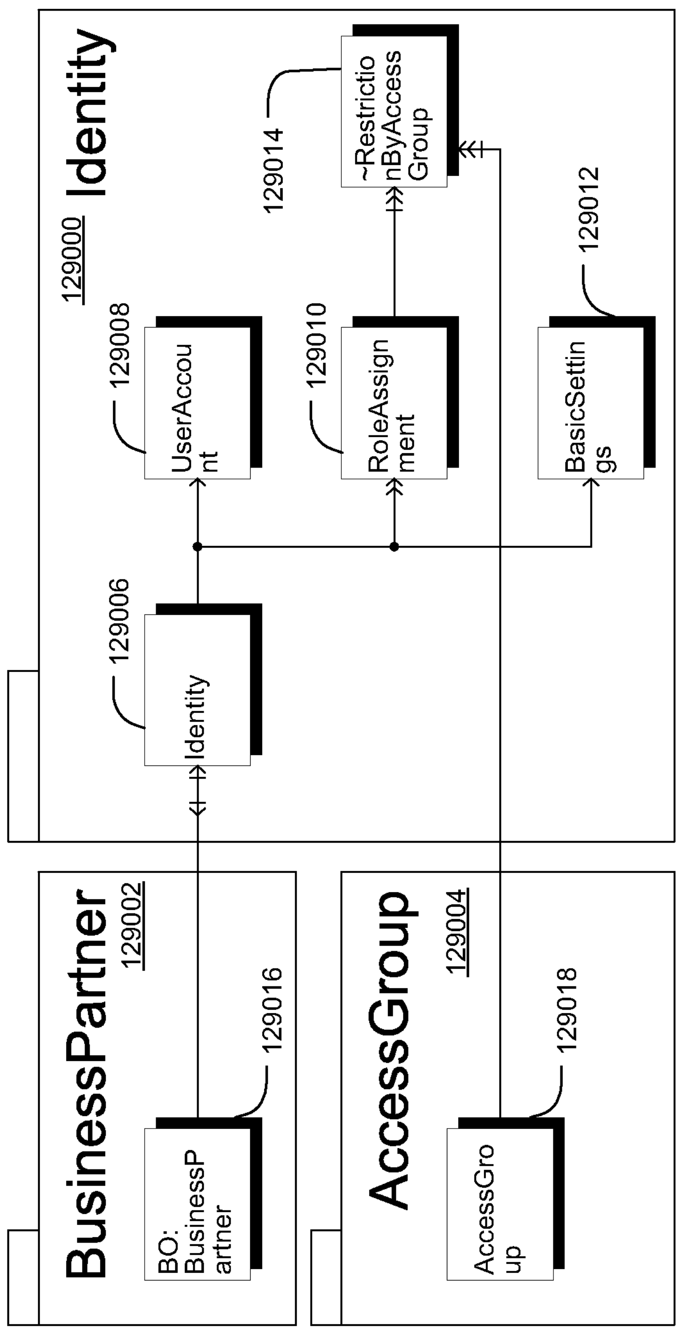

FIG. 129 illustrates an example Identity business object model 129000. Specifically, this model depicts interactions among various hierarchical components of the Identity, as well as external components that interact with the Identity (shown here as 129002 through 129004 and 129016 through 129018).

An identity is a representation of the uniqueness of a human person or non-human subject in a uniform way. The identity specifies the person's or subject's credentials for accessing systems in a system landscape, the granted authorizations and the system settings which are valid for the person or subject. The business object Identity can be part of the foundation layer. An Identity representing a non-human subject can also referred to as "Technical User". Examples are systems or functions that can be used by human persons. An Identity contains two different kinds of components. On the one hand, components that are valid for all user accounts of an Identity across several systems, and on the other hand, components that may only be valid for a specified user account in a system. Identity can be represented by the node Root.

Node Structure of Business Object Identity

The Business Object Identity 129006 is the aggregation of all user accounts of a person in a system landscape, as well as of the settings required for system access, and the associated user rights and restrictions. In exceptional cases, an Identity may represent user accounts of a technical user. A technical user is used for system-to-system communication, not for system access of a specific person. In this case the identity is not assigned to a person.

The elements located directly at the node Identity are defined by the data type IdentityElements. In certain implementations, these elements include UUID, ID, BusinessPartnerUUID, AddressHostTypeCode, AddressUUID, ValidityPeriod, SystemAdministrativeData, UserAccountsInactiveIndicator, and TechnicalUser. UUID is a universal identifier, which may be unique, of the identity. UUID may be based on. GDT UUID and can be used as an alternative key. ID is an identifier, which may be unique, of an Identity used for logging on to the system. It may be based on GDT IdentityID and can be used as an alternative key. BusinessPartnerUUID refers to the person to whom the Identity belongs. It is optional and may be based on GDT UUID. AddressHostTypeCode is a type of address for the person to whom the Identity belongs, and is optional. It may be based on GDT AddressHostTypeCode. In certain implementations, AddressHostTypeCode may be restricted. For example, the following codes 3 and 4 may be used. For example, Relationship Contact Person Workplace Address and Employee Workplace Address. AddressUUID is a universal identifier, which may be unique, of the address. It is optional and may be based on GDT UUID. ValidityPeriod is the period in which the Identity is valid, and is optional. ValidityPeriod may be based on GDT DatePeriod. In certain implementations, ValidityPeriod may be restricted. For example, the codes Startdate and EndDate may be used. SystemAdministrativeData is administrative data of an Identity. This data includes creation and change dates and time as well as the users of the persons who last created or changed the Identity. SystemAdministrativeData may be based on GDT SystemAdministrativeData. UserAccountsInactiveIndicator determines whether or not all user accounts of the Identity are inactive. UserAccountsInactiveIndicator is optional and may be based on GDT: Indicator. In certain implementations, UserAccountsInactiveIndicator may include the Qualifier InactiveIndicator. TechnicalUser is the set of additional attributes for technical users. TechnicalUse is optional and may be based on IDT IdentityTechnicalUser. In certain implementations, the elements Indicator and ResponsibleIdentityUUID are included. Indicator determines whether or not the Identity represents user accounts of technical users. Indicator is optional and may be based on GDT Indicator. In certain implementations, Indicator may include a qualifier of TechnicalUserIndicator. Description is the description of a technical user. Description is optional and may be based on GDT _MEDIUM_. In certain implementations, Description may include a qualifier of TechnicalUserDescription. ResponsibleIdentityUUID is the identity responsible for the technical user. ResponsibleIdentityUUID is optional and may be based on GDT UUID.

Identity can have a composition relationship to subordinate nodes: UserAccount 129008 1:1 or 1:n. An Identity may or may not have one user account assigned. Composition relationships RoleAssignment 129010 1:cn and BasicSettings 129012 1:1 can exist. Identity has the following relationship to node Root Person: C:C. Person is the Person to whom the Identity belongs. Identity has the following relationship to node Address, which is the Address of the person to whom the Identity belongs: C:C.

In some implementations, if an Identity is not denoted as a technical user, a person may be able to be assigned to it. In this case the elements TechnicalUserDescription and TechnicalUserResponsibleIdentityUUID may be filled. If an Identity is denoted as a technical user, a person may be assigned to it. AddressTypeCode and AddressUUID can be either both set or not. If set, BusinessPartnerUUID can be used.

Enterprise Service Infrastructure Actions

The ESI action Lock may be able to lock all user accounts of an Identity. The UserAccountsInactiveIndicator may or may not be set. The UserAccountsInactiveIndicator may or may not be set. The ESI action Unlock may be able to unlock all user accounts of an Identity. The UserAccountsInactiveIndicator may or may not be set. The UserAccountsInactiveIndicator may or may not be reset.

Queries

QueryByBusinessPartnerUUID provides a list of all Identities which are assigned to the specified persons. The query elements are defined by the data type IdentityBusinessPartnerUUIDQueryElements. In certain implementations, these elements include BusinessPartnerUUID and may be based on GDT UUID. QueryByID provides a list of all Identities whose logon name for internet transactions corresponds to the specified value. The query elements are defined by the data type IdentityIDQueryElements. In certain implementations, these elements include ID and may be based on GDT IdentityID. QueryByUserAccountID provides a list of all Identities to which a user account with the specified identifier can be assigned. The query elements are defined by the data type IdentityUserAccountIDQueryElements. In certain implementations, these elements include UserAccountID, which may be based on GDT UserAccountID.

QueryByElements: provides a list of all Identities whose attribute values correspond to the specified ones. The query elements are defined by the data type IdentityElementsQueryElements. In certain implementations, these elements include UUID, ID, BusinessPartnerUUID, ValidityPeriod, SystemAdministrativeData, UserAccountsInactiveIndicator, TechnicalUserIndicator, TechnicalUserDescription, TechnicalUserResponsibleIdentityUUID, UserAccountID, UserAccountLastLoginDateTime, UserAccountPasswordLastChangeDate, UserAccountPasswordLastLoginDate, UserAccountPasswordInactiveIndicator, UserAccountPasswordChangeRequiredIndicator, RoleAssignmentIdentityRoleID, RoleAssignmentRestrictionPortalWorkcentreID, RoleAssignmentRestrictionAccessGroupKey, RoleAssignmentRestrictionHierarchicallySubordinatedAccessGroupsEvaluationRelevanceIndicator, BasicSettingsDateFormatCode, BasicSettingsDecimalFormatCode, BasicSettingsLogonLanguageCode, and BasicSettingsTimeZoneCode. UUID is optional and may be based on GDT UUID. ID is optional and may be based on GDT IdentityID. BusinessPartnerUUID is optional and may be based on GDT UUID. The ValidityPeriod of an Identity may overlap the range specified for the query element ValidityPeriod. ValidityPeriod is optional and may be based on GDT DatePeriod. In certain implementations, ValidityPeriod may be restricted. For example, the codes Startdate and EndDate may be used. SystemAdministrativeData is optional and may be based on GDT SystemAdministrativeData. UserAccountsInactiveIndicator is optional and may be based on GDT Indicator. In certain implementations, UserAccountsInactiveIndicator may include a qualifier, InactiveIndicator.

TechnicalUserIndicator is optional and may be based on GDT Indicator. In certain implementations, TechnicalUserIndicator may include a qualifier of TechnicalUserIndicator. TechnicalUserDescription is optional and may be based on GDT _MEDIUM_Description. In certain implementations, TechnicalUserDescription may include a qualifier of TechnicalUserDescription. TechnicalUserResponsibleIdentityUUID is optional and may be based on GDT UserAccountID.UserAccountID is optional and may be based on GDTUserAccountID. UserAccountLastLoginDateTime is optional and may be based on GDT _GLOBAL_DateTime. In certain implementations, UserAccountLastLoginDateTime may include a qualifier of LastLoginDateTime.

UserAccountPasswordLastChangeDate is optional and may be based on GDT _GLOBAL_Date. In certain implementations, UserAccountPasswordLastChangeDate may include a qualifier of ChangeDate. UserAccountPasswordLastLoginDate is optional and may be based on GDT _GLOBAL_Date. In certain implementations, UserAccountPasswordLastLoginDate may include a qualifier of LastLoginDate. UserAccountPasswordInactiveIndicator is optional and may be based on GDT Indicator. In certain implementations, UserAccountPasswordInactiveIndicator may include a qualifier of InactiveIndicator. UserAccountPasswordChangeRequiredIndicator is optional and may be based on GDT Indicator. In certain implementations, UserAccountPasswordChangeRequiredIndicator may include a qualifier of RequiredIndicator. RoleAssignmentIdentityRoleID is optional and may be based on GDT IdentityRoleID.

RoleAssignmentRestrictionPortalWorkcentreID is optional and may be based on GDT PortalWorkcentreID. RoleAssignmentRestrictionAccessGroupKey is optional and may be based on IDT AccessGroupKey. RoleAssignmentRestrictionHierarchicallySubordinatedAccessGroupsEvaluationRelevanceIndicator is optional and may be based on GDT Indicator. In certain implementations, RoleAssignmentRestrictionHierarchicallySubordinatedAccessGroupsEvaluationRelevanceIndicator may include a qualifier of RelevanceIndicator. BasicSettingsDateFormatCode is optional and may be based on GDT DateFormatCode. BasicSettingsDecimalFormatCode is optional and may be based on GDT DecimalFormatCode. BasicSettingsLogonLanguageCode is optional and may be based on GDT LanguageCode. BasicSettingsTimeZoneCode is optional and may be based on GDT TimeZoneCode.

QueryByBusinessPartnerName provides a list of all Identities whose name of the assigned person corresponds to the specified value. The query elements are defined by the data type IdentityBusinessPartnerNameQueryElements. In certain implementations, these elements include BusinessPartnerPersonName. BusinessPartnerPersonName is the PersonName in the node Common of the assigned BusinessPartner. BusinessPartnerPersonName is optional and may be based on GDT PersonName. QueryByAssignedRole provides a list of all Identities whose role assignment and restrictions correspond to the specified values. The query elements are defined by the data type IdentityAssignedRoleQueryElements. In certain implementations, these elements include RoleAssignmentIdentityRoleID, RoleAssignmentRestrictionAccess GroupKey, RoleAssignmentRestrictionHierarchicallySubordinatedAccessGroupsEvaluationRelevanceIndicator, and RoleAssignmentRestrictionPortalWorkcentreID. RoleAssignmentIdentityRoleID may be based on GDT IdentityRoleID. RoleAssignmentRestrictionAccessGroupKey is optional and may be based on IDT AccessGroupKey. RoleAssignmentRestrictionHierarchicallySubordinatedAccessGroupsEvaluationRelevanceIndicator is optional and may be based on GDT Indicator). In certain implementations, RoleAssignmentRestrictionHierarchicallySubordinatedAccessGroupsEvaluationRelevanceIndicator may include a qualifier of RelevanceIndicator. RoleAssignmentRestrictionPortalWorkcentreID is optional and may be based on GDT PortalWorkcentreID.

UserAccount

The User Account contains information controlling the system access of a user. The elements located directly at the node Identity are defined by the data type IdentityUserAccountElements. In certain implementations, these elements include ID, LastLoginDateTime, PasswordLastChanged- Date, PasswordLastLoginDate, PasswordInactiveIndicator, PasswordChangeRequiredIndicator, OldPasswordText, NewPasswordText, ConfirmationPasswordText, and GeneratedPasswordText. ID identifies a user account in a system. ID may be based on GDT UserAccountID. LastLoginDateTime is the last point in time that the user logged on to the user account. LastLoginDateTime is optional and may be based on GDT _GLOBAL_DateTime. In certain implementations, LastLoginDateTime may include a qualifier, LastLoginDateTime. PasswordLastChangedDate is the last date on which the password was changed, and is optional PasswordLastChangedDate may be based on GDT _GLOBAL_ Date and, in certain implementations, may include a qualifier of ChangeDate. PasswordLastLoginDate is the last date on which one used the password to log on. PasswordLastLoginDate is optional and may be based on GDT _GLOBAL_ Date. In certain implementations, PasswordLastLoginDate may include a qualifier, LastLogin. PasswordInactiveIndicator determines whether or not the password of the user account is inactive, and thus whether a logon with the password is possible or not. PasswordInactiveIndicator is optional and may be based on GDT Indicator. In certain implementations, PasswordInactiveIndicator may include a qualifier of InactiveIndicator. PasswordChangeRequiredIndicator determines whether or not a password change is required. PasswordChangeRequiredIndicator is optional and may be based on GDT Indicator). In certain implementations, PasswordChangeRequiredIndicator may include a qualifier, RequiredIndicator. OldPasswordText is the old password for logging on to a user account. OldPasswordText is optional and may be based on GDT PasswordText. NewPasswordText is the new password for logging on to a user account. NewPasswordText is optional and may be based on GDT PasswordText. ConfirmationPasswordText is the confirmed password for logging on to a user account. ConfirmationPasswordText is optional and may be based on GDT PasswordText. GeneratedPasswordText is the generated password for logging on to a user account. GeneratedPasswordText is optional and may be based on GDT PasswordText.

The following integrity conditions are valid for Old, New and ConfirmationPasswordText according to the specified use cases. If the password is changed by the user, all three elements can be filled. The password can be active at the next logon by the user. If the password is set by an administrator, NewPasswordText and ConfirmationPasswordText can be filled. In this case, the user may be asked to change the password the next time he logs on. In all other cases, none of the three elements may have to be filled.

Enterprise Service Infrastructure Actions

The ESI action GeneratePassword may be able to generate a password for the user account of the Identity. The element GeneratedPasswordText may or may not be filled. The ESI action DeactivatePasseord may be able to deactivate the password of the user account of the Identity. The PasswordDeactivatedIndicator may or may not be set.

RoleAssignment

Role assignment is the assignment of a role determining which services and objects the Identity is allowed to access. The elements located directly at the node Identity are defined by the data type IdentityRoleAssignmentElements. In certain implementations, these elements include IdentityRoleID. IdentityRoleID is a role assigned to the Identity, and may be based on GDT IdentityRoleID. Identity has the following composition relationships to subordinate nodes: RoleAssignmentRestriction 129014 1:cn.

A RoleAssignmentRestriction is the Restriction specified for the role assignment. The elements located directly at the node Identity are defined by the data type IdentityRoleAssignmentRestrictionElements. In certain implementations, these elements include PortalWorkcentreID, AccessGroupKey, GroupingAccessContextCode, GroupingObjectUUID, and HierarchicallySubordinatedAccessGroupsRelevanceIndicator. Portal WorkcentreID is a workcenter for which the restriction is relevant, and may be based on GDT PortalWorkcentreID. AccessGroupKey is an identifier, which may be unique, for the access group. AccessGroupKey may be based on IDT AccessGroupKey. GroupingAccessContextCode is a coded representation of the access context for the access group. GroupingAccessContextCode may be based on GDT AccessContextCode. GroupingObjectUUID is an Identifier for the access group, that may be unique in the access context of the group. GroupingObjectUUID may be based on GDT UUID. HierarchicallySubordinatedAccessGroupsRelevanceIndicator determines whether or not AccessGroups that are hierarchically subordinated to the Access Group specified by AccessGroupKey are relevant for determining the restrictions corresponding to the role assignment. HierarchicallySubordinatedAccessGroupsRelevanceIndicator is optional and may be based on GDT Indicator). In certain implementations, HierarchicallySubordinatedAccessGroupsRelevanceIndicator may include a qualifier of RelevanceIndicator.

Identity can have the following relationship to node Root AccessGroup 129014: 1:cn. AccessGroup is used to restrict access to object instances for the specified role assignment.

BasicSettings

BasicSettings is the set of basic settings for all systems for which an Identity provides system access. The elements located directly at the node Identity are defined by the data type IdentityBasicSettingsElements. In certain implementations, these elements include DateFormatCode, DecimalFormatCode, LogonLanguageCode, and TimeZoneCode. DateFormatCode specifies the date format used by the Identity, and may be based on GDT DateFormatCode. DecimalFormatCode specifies the decimal format used by the Identity, and may be based on GDT DecimalFormatCode. LogonLanguageCode specifies the logon language of an Identity, and is optional. LogonLanguageCode may be based on GDT LanguageCode. TimeZoneCode specifies the time zone for which dates and times are formatted. TimeZoneCode may be based on GDT TimeZoneCode.

Business Object Installation Point

Figures 1, 130:
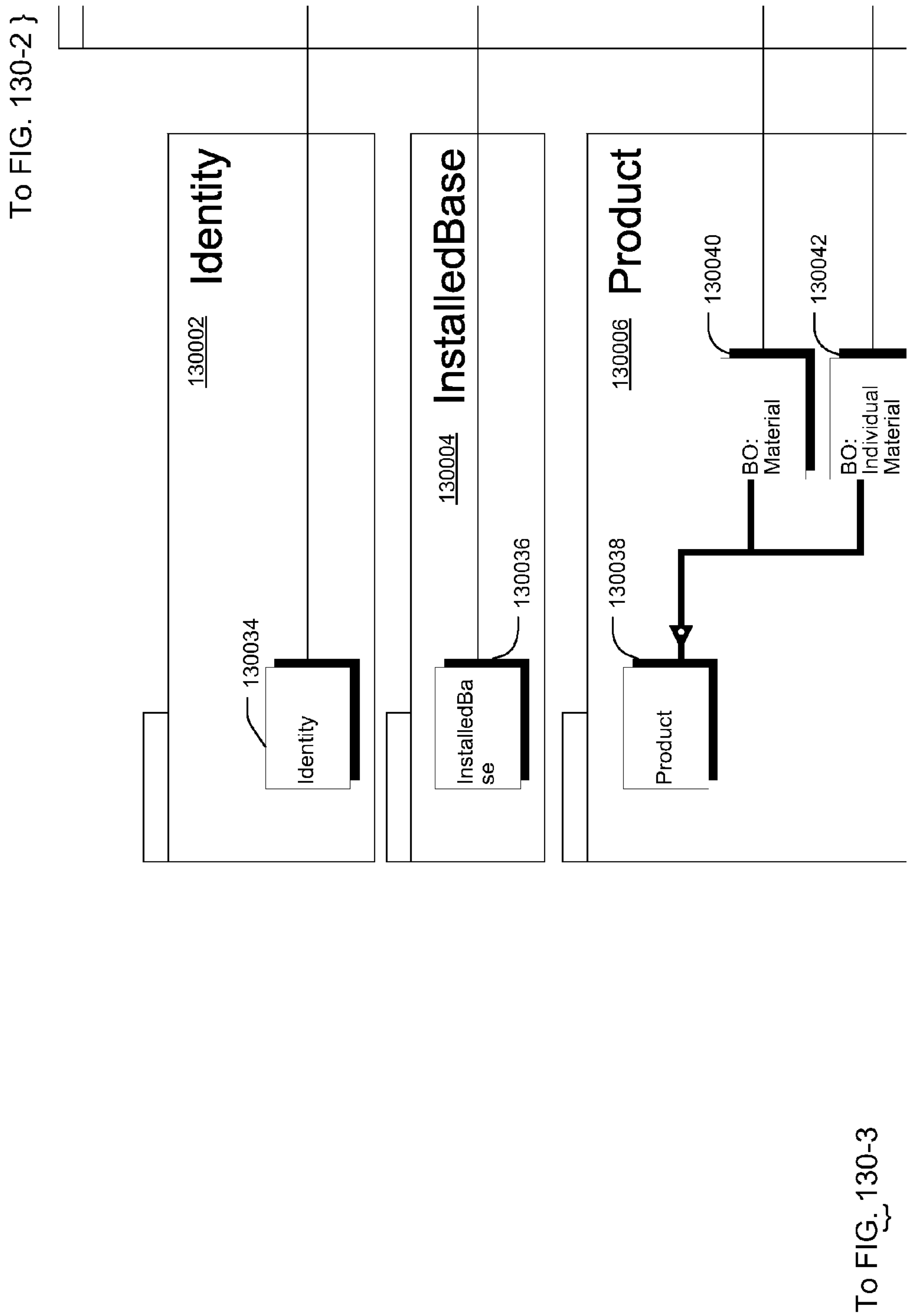
Figures 2, 130:
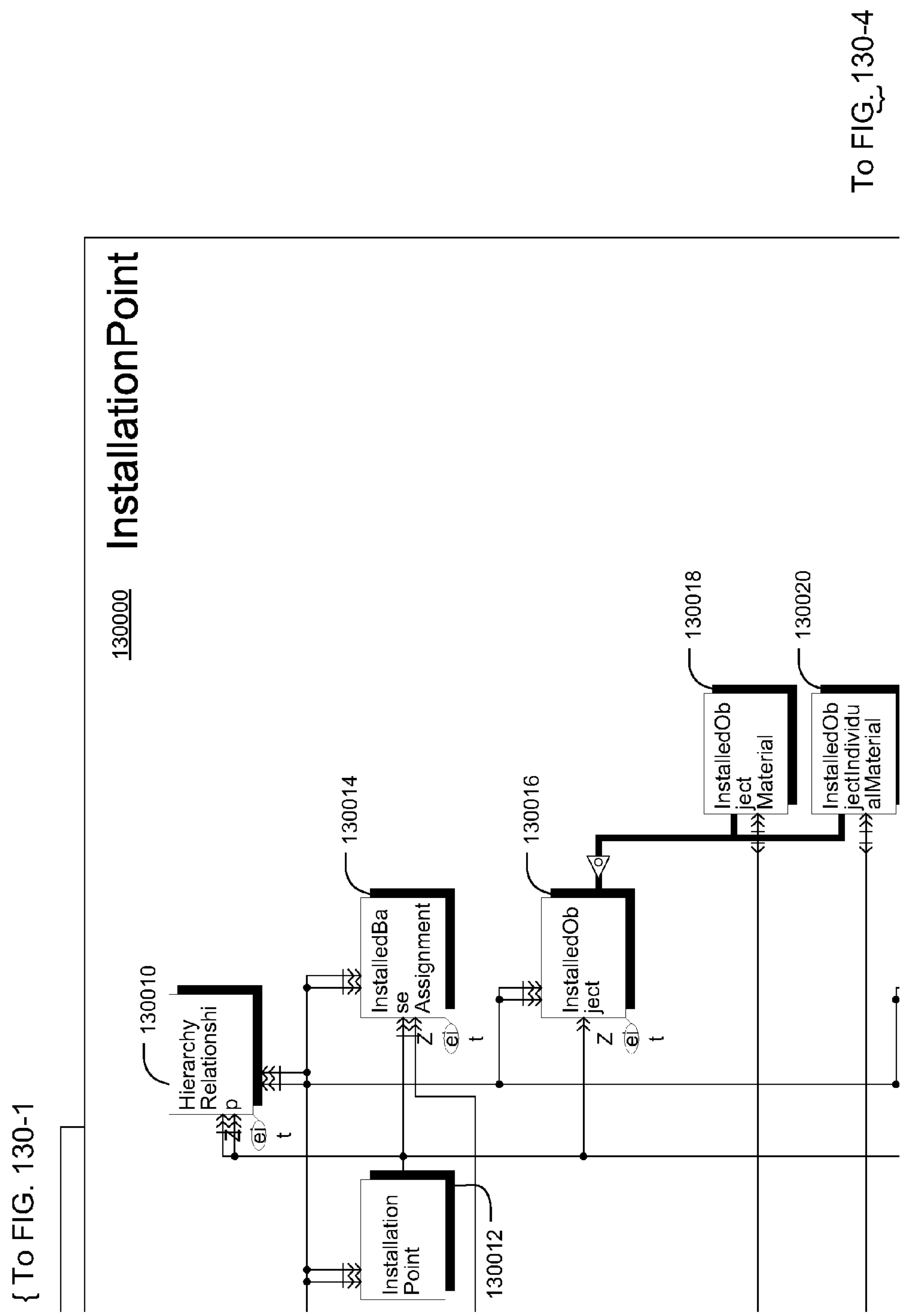
Figures 3, 130:
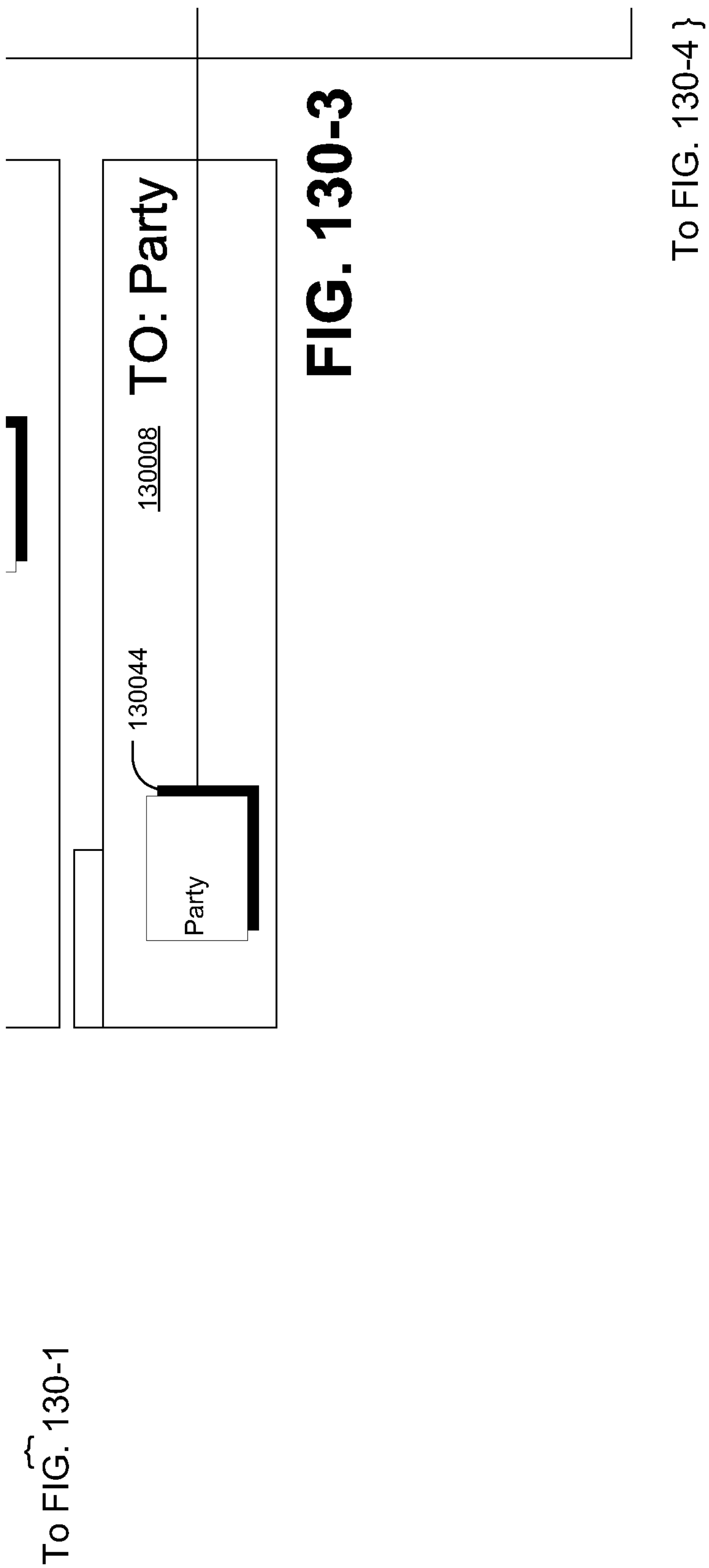
Figures 4, 130:
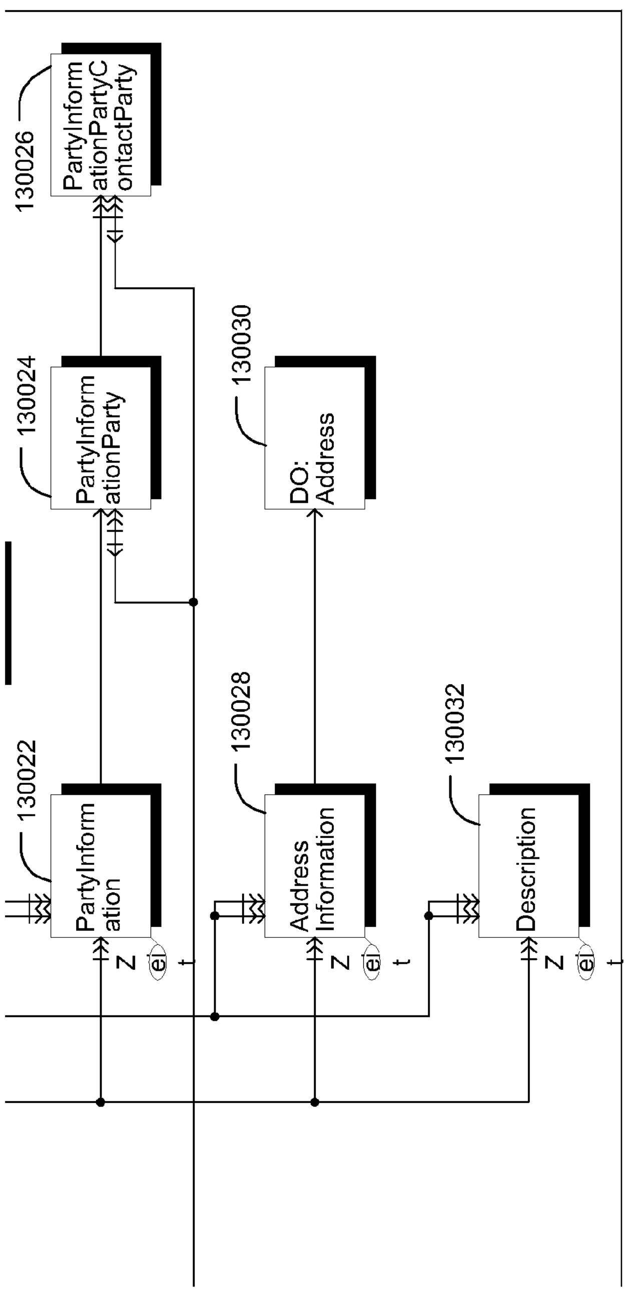

FIGS. 130-1 through 130-2 illustrate an example InstallationPoint business object model 130000. Specifically, this model depicts interactions among various hierarchical components of the InstallationPoint, as well as external components that interact with the InstallationPoint (shown here as 130002 through 13008 and 130034 through 130044).

In some implementations, Business Object Installation Point physical or logical location at which a business object, for example software or a material, can be installed during a certain period of time. An installation point contains descriptive information about its installed object, for example, the quantity of materials used, and can be structured in a hierarchical relationship with other installation points. An installation point essentially includes: The reference to a business object that was assigned to an installation—for example, a material; information about business partners that have a particular role and that are related to the installation point; and hierarchical structure information that describes the order of installation points, their assigned business objects and the relationships of one business object to another. The order of the hierarchy also includes implicit information on the location of the individual installation point, for example, if a lower-level object can be contained within a higher-level object. If this can be a physical location, this can also be specified in more detail by means of address information. The most important information of an installation point can be subject to business validity (time-dependency). The business object Installation Point belongs to the process component Installed Base Data Management. The business object Installation Point can be situated in the foundation layer. The process component Installed Base Data Management may or may not belong to the Foundation Layer. In certain installations, this layer may be locally available in all LDUs. Hence, no interfaces may be required in addition to those defined in the actual BO.

An InstallationPoint 130012 describes the location of a business object, for example, a material within an installation. Furthermore, an Installation Point contains both identifying as well as administrative information. The information of the Installation Point can be mainly described by its structure. Here the essential elements are the composition of HierarchyRelationship 130010, which describes the hierarchical structure of the Installation Point and the composition of InstalledObject, which describes the general business data and validity periods of the installed object at the installation point. The elements located at the InstallationPoint node are defined by the GDT type InstallationPointElements. In certain implementations, these elements include: UUID, ID, SystemAdministrativeData, and Status. UUID can be a global identifier, which can be unique, for the business object. UUID may be based on GDT UUID. ID can be an identifier, which can be unique, for an InstallationPoint. ID may be based on GDT InstallationPointID. SystemAdministrativeData can be administrative data that can be stored in a system. This data includes system users and change dates/times. SystemAdministrativeData may be based on GDT SystemAdministrativeData. Status can be the current step in the life cycle of an InstallationPoint. In certain implementations, it includes LifeCycleStatusCode. LifeCycleStatusCode can be a status defining the state of an InstallationPoint during its lifecycle. LifeCycleStatusCode may be based on GDT: InstallationPointLifeCycleStatusCode. The Composition Relationships may exist including:

HierarchyRelationship has a cardinality of 1:cn, InstallationPointHierarchyRelationshipFilterElements ValidityPeriod: UPPEROPEN_GLOBAL_DateTimePeriod. InstalledBaseAssignment 130014 has a cardinality of 1:cn, InstallationPointInstalledBaseAssignmentFilterElements. ValidityPeriod: UPPEROPEN_GLOBAL_DateTimePeriod. InstalledObject 130016 has a cardinality of 1:n, InstallationPointInstalledObjectFilterElements. ValidityPeriod UPPEROPEN_GLOBAL_DateTimePeriod. Description has a cardinality of 1:cn, InstallationPointDescriptionFilterElements. ValidityPeriod UPPEROPEN_GLOBAL_DateTimePeriod. AddressInformation has a cardinality of 1:cn, InstallationPointAddressInformationFilterElements. ValidityPeriod UPPEROPEN_GLOBAL_DateTimePeriod. PartyInformation has a cardinality of 1:cn, InstallationPointPartyInformationFilterElements. ValidityPeriod UPPEROPEN_GLOBAL_DateTimePeriod. There may be a number of Associations for Navigation including: To the business object Installation Point/node InstallationPoint, DirectDependentInstallationPointByValidityPeriod has a cardinality of 1..cn. DirectDependentInstallationPointByValidityPeriodFilterElements. ValidityPeriod: UPPEROPEN_GLOBAL_DateTimePeriod. This association defines the direct subordinated installation points. To node PartyInformation, CustodianPartyInformationByValidityPeriod has a cardinality of 1..cn. CustodianInstallationPointPartyInformationByValidityPeriodFilterElements, ValidityPeriod: UPPEROPEN_GLOBAL_DateTimePeriod. This association defines parties that are in the role category "Custodian". To node PartyInformation, CurrentCustodianPartyInformation has a cardinality of 1..c. This association defines the currently valid custodian party (role category "Custodian"). To node AddressInformation, CurrentAddressInformation has a cardinality of 1..c. This association defines the currently valid address information. InstallationPoint has the following relationships with the node roots: CreationIdentity has a cardinality of 1:cn. CreationIdentity specifies the person who created the InstallationPoint; and LastChangeIdentity has a cardinality of 1:cn. LastChangeIdentity specifies the person who last changed the InstallationPoint. The Integrity Conditions conditions may exist such, such that an Installation Point may be able to be assigned to at least one InstalledObject, which may define a business validity period and also may define the type of business object to be installed. The composition relationship HierarchyRelationship describes the higher-level Installation Points assigned to the Installation Point with reference to a validity period. Often, one installation point may be related to one higher-level installation point at one time. The SystemAdministrativeData may or may not be set internally by the system. It may be able to be assigned or changed "externally".

In some implementations, the Enterprise Service Infrastructure Action CreateWithReference may be copy from a given reference InstallationPoint along with all its components. Often, if a validity period can be set as parameter in the action, components which intersect with the given period are copied. In certain implementations, if an IndividualMaterial can be installed at the referenced InstallationPoint, the InstalledObject of the copy may be marked as uninstalled (InstalledIndicator) because an IndividualMaterial may be installed once. The action may or may not create a new instance of the business object Installation Point. The action elements are defined by the data type InstallationPointCreateWithReferenceActionElements. In certain implementations, these elements include ValidityPeriod, which may determine the validity period for the time-dependent components of the copy of the installation point. ValidityPeriod is optional and may be based on GDT UPPEROPEN_GLOBAL_DateTimePeriod. The ESI Block, an S&AM Action, may or may not set the status of an InstallationPoint to "Blocked". The InstallationPoint may be able to be newly referenced by other BOs. This status may or may not be temporary and intention may or may not be to come back to "Active". The LifeCycleStatusCode may be able to be "Active". LifeCycleStatusCode may or may not change. The LifeCycleStatusCode may or may not be changed to "Blocked". Unblock, an S&AM action, can be able to unblock the InstallationPoint and set its status back to "Active". Often, the LifeCycleStatusCode can be "Blocked". LifeCycleStatusCode may or may not change. The LifeCycleStatusCode may or may not be changed to "Active".

Business Object InstallationPoint can be queried by using QueryByIdentificationAndInstalledObjectInformation, QueryByInstalledObject, QueryByInstalledObjectMaterial, QueryByInstalledObjectIndividualMaterial, QueryByParty, QueryByAddress, QueryByInstalledObjectIndividualMaterialAndPartyAndAddress, and QueryByDescription. QueryByIdentificationAndInstalledObjectInformation gets a list of installation points whereby a search can be carried out using the InstallationPoint identifier and the characteristics of an InstalledObject. The query elements are defined by the data type InstallationPointIdentificationAndInstalledObjectInformationQueryElements. In certain implementations, these elements include: ID, InstalledObjectTypeCode, InstalledObjectName, InstalledObjectValidityPeriod, and StatusLifeCycleStatusCode. ID is optional and may be based on GDT of type InstallationPointID. InstalledObjectTypeCode is optional and may be based on GDT of type InstalledObjectTypeCode.

InstalledObjectName is optional and may be based on GDT of type LANGUAGEINDEPENDENT_MEDIUM_Name. In certain implementations, InstalledObjectName may include a qualifier, InstallationPoint. InstalledObjectValidityPeriod is optional and may be based on GDT UPPEROPEN_GLOBAL_DateTimePeriod. StatusLifeCycleStatusCode is optional and may be based on GDT of type InstallationPointLifeCycleStatusCode. QueryByInstalledBaseAssignment gets a list of all installation points, which are assigned to an installed base with reference to a validity period. The query elements are defined by the data type InstallationPointInstalledBaseAssignmentQueryElements. In certain implementations, these elements include: InstalledBaseAssignmentInstalledBaseID, InstalledBaseAssignmentValidityPeriod, and StatusLifeCycleStatusCode. InstalledBaseAssignmentInstalledBaseID may be based on GDT of type InstalledBaseID.

InstalledBaseAssignmentValidityPeriod is optional and may be based on GDT of type UPPEROPEN_GLOBAL_DateTimePeriod. StatusLifeCycleStatusCode is optional and may be based on GDT of type InstallationPointLifeCycleStatusCode. QueryByInstalledObject gets a list of all installation points to which a specific installed object can be assigned with reference to a validity period. The query elements are defined by the data type InstallationPointInstalledObjectQueryElements. In certain implementations, these elements may include: InstalledObjectTypeCode, InstalledObjectName, InstalledObjectValidityPeriod, and StatusLifeCycleStatusCode. InstalledObjectTypeCode is optional and may be based on GDT of type InstalledObjectTypeCode. InstalledObjectName is optional and may be based on GDT of type LANGUAGEINDEPENDENT_MEDIUM_Name. In certain implementations, InstalledObjectName may include a qualifier, InstallationPoint. InstalledObjectValidityPeriod is optional and may be based on GDT of type UPPEROPEN_GLOBAL_DateTimePeriod. StatusLifeCycleStatusCode is optional and may be based on GDT of type InstallationPointLifeCycleStatusCode. QueryByInstalledObjectMaterial gets a list of all installation points to which a specific installed material can be assigned with reference to a validity period. The query elements are defined by the data type InstallationPointInstalledObjectMaterialQueryElements. In certain implementations, these elements include: InstalledObjectMaterialProductID, InstalledObjectValidityPeriod, and StatusLifeCycleStatusCode. InstalledObjectMaterialProductID may be based on GDT of type ProductID. InstalledObjectValidityPeriod is optional and may be based on GDT of type UPPEROPEN_GLOBAL_DateTimePeriod. StatusLifeCycleStatusCode is optional and may be based on GDT of type InstallationPointLifeCycleStatusCode. QueryByInstalledObjectIndividualMaterial gets a list of all installation points to which a specific installed individual material can be assigned with reference to a validity period. The query elements are defined by the data type InstallationPointInstalledObjectIndividualMaterialQueryElements. In certain implementations, these elements include: InstalledObjectIndividualMaterialIndividualMaterialID, InstalledObjectValidityPeriod, and StatusLifeCycleStatusCode. InstalledObjectIndividualMaterialIndividualMaterialID may be based on GDT of type ProductID. InstalledObjectValidityPeriod is optional and may be based on GDT of type UPPEROPEN_GLOBAL_DateTimePeriod. StatusLifeCycleStatusCode is optional and may be based on GDT of type InstallationPointLifeCycleStatusCode. QueryByParty gets a list of all installation points to which a specific party can be assigned with reference to a validity period. The query elements are defined by the data type InstallationPointPartyQueryElements. In certain implementations, these elements include: PartyInformationPartyPartyID, PartyInformationPartyRoleCategoryCode, PartyInformationPartyRoleCode, PartyInformationValidityPeriod, and StatusLifeCycleStatusCode. PartyInformationPartyPartyID is optional and may be based on GDT of type PartyID. PartyInformationPartyRoleCategoryCode is optional and may be based on GDT of type PartyRoleCategoryCode. PartyInformationPartyRoleCode is optional and may be based on GDT of type PartyRoleCode. PartyInformationValidityPeriod is optional and may be based on GDT of type UPPEROPEN_GLOBAL_DateTimePeriod. StatusLifeCycleStatusCode is optional and may be based on GDT of type InstallationPointLifeCycleStatusCode. QueryByAddress gets a list of all installation points to which a specific address can be assigned with reference to a validity period. The query elements are defined by the data type InstallationPointAddressQueryElements. In certain implementations, these elements include: AddressInformationAddressOrganisationNameNameFirstLineName, AddressInformationAddressOrganisationNameNameSecondLineName, AddressInformationAddressOrganisationNameKeyWordsText, AddressInformationAddressPostalAddressCountryCode, AddressInformationAddressPostalAddressRegionCode, AddressInformationAddressPostalAddressCityName, AddressInformationAddressPostalAddressDistrictName, AddressInformationAddressPostalAddressStreetPostalCode, AddressInformationAddressPostalAddressStreetName, AddressInformationAddressPostalAddressHouseID, AddressInformationAddressPostalAddressAdditionalHouseID, AddressInformationAddressPostalAddressBuildingID, AddressInformationAddressPostalAddressRoomID, AddressInformationAddressPostalAddressFloorID, AddressInformationValidityPeriod, and StatusLifeCycleStatusCode. AddressInformationAddressOrganisationNameNameFirstLineName is optional and may be based on GDT of type _LANGUAGEINDEPENDENT_MEDIUM_Name. AddressInformationAddressOrganisationNameNameSecondLineName is optional and may be based on GDT of type _LANGUAGEINDEPENDENT _MEDIUM_Name. AddressInformationAddressOrganisationNameKeyWordsText is optional and may be based on GDT of type KeyWordsText. AddressInformationAddressPostalAddressCountryCode is optional and may be based on GDT of type CountryCode. AddressInformationAddressPostalAddressRegionCode is optional and may be based on GDT of type RegionCode. AddressInformationAddressPostalAddressCityName is optional and may be based on GDT of type LANGUAGEINDEPENDENT_MEDIUM_Name. AddressInformationAddressPostalAddressDistrictName is optional and may be based on GDT of type _LANGUAGEINDEPENDENT_MEDIUM_Name. AddressInformationAddressPostalAddressStreetPostalCode is optional and may be based on GDT of type PostalCode. AddressInformationAddressPostalAddressStreetName is optional and may be based on GDT of type StreetName. AddressInformationAddressPostalAddressHouseID is optional and may be based on GDT of type HouseID. AddressInformationAddressPostalAddressAdditionalHouseID is optional and may be based on GDT of type HouseID. AddressInformationAddressPostalAddressBuildingID is optional and may be based on GDT of type BuildingID. AddressInformationAddressPostalAddressRoomID is optional and may be based on GDT of type RoomID. AddressInformationAddressPostalAddressFloorID is optional and may be based on GDT of type FloorID. AddressInformationValidityPeriod can be the validity period of the party relationship. AddressInformationValidityPeriod is optional and may be based on GDT of type UPPEROPEN_GLOBAL_DateTimePeriod. StatusLifeCycleStatusCode is optional and may be based on GDT of type InstallationPointLifeCycleStatusCode.

QueryByInstalledObjectIndividualMaterialAndPartyAndAddress gets a list of all installation points to which a specific individual material, party and address can be assigned with reference to a validity period. The query elements are defined by the data type InstallationPointInstalledObjectIndividualMaterialAndPartyAndAddressQueryElements. In certain implementations, these elements include: InstalledObjectIndividualMaterialIndividualMaterialUUID, InstalledObjectIndividualMaterialIndividualMaterialID, AddressInformationAddressOrganisationNameFirstLineName, AddressInformationAddressOrganisationNameSecondLineName, AddressInformationAddressOrganisationKeyWordsText, AddressInformationAddressPostalAddressCountryCode, AddressInformationAddressPostalAddressRegionCode, AddressInformationAddressPostalAddressCityName, AddressInformationAddressPostalAddressDistrictName, AddressInformationAddressPostalAddressStreetPostalCode, AddressInformationAddressPostalAddressStreetName, AddressInformationAddressPostalAddressHouseID, AddressInformationAddressPostalAddressBuildingID, AddressInformationAddressPostalAddressRoomID, AddressInformationAddressPostalAddressFloorID, PartyInformationPartyPartyID, PartyInformationPartyContactPartyPartyID, InstalledObjectValidityPeriod, AddressInformationValidityPeriod, PartyInformationValidityPeriod, and StatusLifeCycleStatusCode. InstalledObjectIndividualMaterialIndividualMaterialUUID is optional and may be based on GDT of type UUID. InstalledObjectIndividualMaterialIndividualMaterialID is optional and may be based on GDT of type ProductID. AddressInformationAddressOrganisationNameFirstLineName is optional and may be based on GDT of type _LANGUAGEINDEPENDENT_MEDIUM_Name. AddressInformationAddressOrganisationNameSecondLineName is optional and may be based on GDT of type _LANGUAGEINDEPENDENT_MEDIUM_Name. AddressInformationAddressOrganisationKeyWordsText is optional and may be based on GDT of type KeyWordsText. AddressInformationAddressPostalAddressCountryCode is optional and may be based on GDT of type CountryCode. AddressInformationAddressPostalAddressRegionCode is optional and may be based on GDT of type RegionCode. AddressInformationAddressPostalAddressCityName is optional and may be based on GDT of type _LANGUAGEINDEPENDENT_MEDIUM_Name. AddressInformationAddressPostalAddressDistrictName is optional and may be based on GDT of type _LANGUAGEINDEPENDENT_MEDIUM_Name. AddressInformationAddressPostalAddressStreetPostalCode is optional and may be based on GDT of type PostalCode. AddressInformationAddressPostalAddressStreetName is optional and may be based on GDT of type StreetName. AddressInformationAddressPostalAddressHouseID is optional and may be based on GDT of type HouseID. AddressInformationAddressPostalAddressAdditionalHouseID is optional and may be based on GDT of type HouseID. AddressInformationAddressPostalAddressBuildingID is optional and may be based on GDT of type BuildingID. AddressInformationAddressPostalAddressRoomID is optional and may be based on GDT of type RoomID. AddressInformationAddressPostalAddressFloorID is optional and may be based on GDT of type FloorID. PartyInformationPartyPartyID is optional and may be based on GDT of type PartyID. PartyInformationPartyContactPartyPartyID is optional and may be based on GDT of type PartyID. InstalledObjectValidityPeriod can be a validity period. InstalledObjectValidityPeriod is optional and may be based on GDT of type UPPEROPEN_GLOBAL_DateTimePeriod. AddressInformationValidityPeriod can be a validity period. AddressInformationValidityPeriod is optional and may be based on GDT of type UPPEROPEN_GLOBAL_DateTimePeriod. PartyInformationValidityPeriod can be a validity period. PartyInformationValidityPeriod is optional and may be based on GDT of type UPPEROPEN_GLOBAL_DateTimePeriod. StatusLifeCycleStatusCode is optional and may be based on GDT of type InstallationPointLifeCycleStatusCode.

QueryByDescription gets a list of installation points to which a specific description can be assigned with reference to a validity period. The query elements are defined by the data type InstallationPointDescriptionQueryElements. In certain implementations, these elements include: Description Description, DescriptionValidityPeriod, and StatusLifeCycleStatusCode.

Description Description may be based on GDT of type InstallationPointDescription.

DescriptionValidityPeriod is optional and may be based on GDT of type UPPEROPEN_GLOBAL_DateTimePeriod. StatusLifeCycleStatusCode is optional and may be based on GDT of type InstallationPointLifeCycleStatusCode.

A HierarchyRelationship can be information about the hierarchical structure of an Installation Point with reference to a validity period. It describes the hierarchical relationship between the Installation Point and other Installation Points within a validity period. Furthermore, a HierarchyRelationship contains both identifying as well as administrative information. The elements located at the HierarchyRelationship node are defined by the GDT type InstallationPointHierarchyRelationshipElements. In certain implementations, these elements include: UUID, UpperInstallationPointUUID, SystemAdministrativeData, and ValidityPeriod. UUID can be a global identifier, which can be unique, for HierarchyRelationship. UUID may be based on GDT of type UUID. UpperInstallationPointUUID can be a global identifier, which can be unique, for the hierarchically higher installation point. UpperInstallationPointUUID may be based on GDT of type UUID. SystemAdministrativeData can be administrative data that can be stored in a system. This data includes system users and change dates/times. SystemAdministrativeData may be based on GDT of type SystemAdministrativeData. ValidityPeriod can be the business validity of the HierarchyRelationship. This data includes a start and end time. ValidityPeriod may be based on GDT of type UPPEROPEN_GLOBAL_DateTimePeriod. InstallationPoint has the following relationship with the root node: UpperInstallationPoint has a cardinality of 1:cn. UpperInstallationPoint can be the Installation Point that represents the parent in an Installation Point structure. InstallationPoint has the following relationships with the node roots: CreationIdentity has a cardinality of 1:cn. CreationIdentity specifies the person who created the HierarchyRelationship; and LastChangeIdentity has a cardinality of 1:cn. LastChangeIdentity specifies the person who last changed the HierarchyRelationship. The Integrity Conditions may exist, such that the SystemAdministrativeData may or may not be set internally by the system. It may be able to be assigned or changed “externally”. For multiple instances of HierarchyRelationship, the start time of a ValidityPeriod may or may not correspond to the end time of the ValidityPeriod for the HierarchyRelationship previously valid on that time stream. Gaps may or may not exist in the overall time frame when all existing validity intervals of HierarchyRelationship are analyzed.

An InstalledBaseAssignment describes the assignment of an Installation Point to an installed base with reference to a validity period. Furthermore, an InstalledBaseAssignment contains both identifying as well as administrative information. The elements located at the InstalledBaseAssignment node are defined by the GDT type InstallationPointInstalledBaseAssignmentElements. In certain implementations, these elements include: UUID, InstalledBaseUUID, SystemAdministrativeData, and ValidityPeriod. UUID is a global identifier, which can be unique, for InstalledBaseAssignment. UUID may be based on GDT of type UUID. InstalledBaseUUID can be a global identifier, which can be unique, for an InstalledBase. InstalledBaseUUID may be based on GDT of type UUID. SystemAdministrativeData can be administrative data that can be stored in a system. This data includes system users and change dates/times. SystemAdministrativeData may be based on GDT of type SystemAdministrativeData. ValidityPeriod can be the business validity of the InstalledBaseAssignment. This data includes a start and end time. ValidityPeriod may be based on GDT of type UPPEROPEN_GLOBAL_DateTimePeriod.

InstallationPoint has the following relationship with the root node InstalledBaseAssignment has a cardinality of 1:cn. InstalledBaseAssignment specifies the InstalledBase to which the Installation Point was assigned. InstallationPoint has the following relationships with the node roots: CreationIdentity has a cardinality of 1:cn. CreationIdentity specifies the person who created the InstalledBaseAssignment; and LastChangeIdentity has a cardinality of 1:cn. LastChangeIdentity specifies the person who last changed the InstalledBaseAssignment. The Integrity Conditions may exist, such that an InstalledBaseAssignment often exists at the InstallationPoint that can be the root element within the hierarchy structure with reference to a validity period. The SystemAdministrativeData may or may not be set internally by the system. It may be able to be assigned or changed “externally”. For multiple instances of InstalledBaseAssignment, the start time of a ValidityPeriod may or may not correspond to the end time of the ValidityPeriod for the InstalledBaseAssignment previously valid on that time stream. Gaps may or may not exist in the overall time frame when all existing validity intervals of InstalledBaseAssignment are analyzed.

An InstalledObject can be the definition of the business object installed at the Installation Point with reference to a validity period. Typical time-dependent information can be, for example, the type of business object installed. This might be, for example, a material. Furthermore, an InstalledObject can contain both identifying as well as administrative information. The elements located directly at the InstalledObject node are defined by the GDT type InstallationPointInstalledObjectElements. In certain implementations, these elements include: UUID, SystemAdministrativeData, TypeCode, ValidityPeriod, and Name. UUID can be a global identifier, which can be unique, for the InstalledObject. UUID may be based on GDT of type UUID. SystemAdministrativeData can be administrative data that can be stored in a system. This data includes system users and change dates/times. SystemAdministrativeData may be based on GDT of type SystemAdministrativeData. TypeCode can be the coded representation of the type of object installed. There are no constraints for InstalledObjectTypeCode with respect to the code list. TypeCode is optional and may be based on GDT of type InstalledObjectTypeCode. ValidityPeriod can be the business validity of the InstalledObject. This data includes a start and end time. ValidityPeriod may be based on GDT of type UPPEROPEN_GLOBAL_DateTimePeriod. Name can be the name of the installation point. Name is optional, and may be based on GDT of type _LANGUAGEINDEPENDENT_MEDIUM_Name. In certain implementations, Name may include a qualifier, InstallationPoint. In certain implementations, InstalledObject occurs in the following disjoint specializations: InstalledObjectMaterial 130018 and InstalledObjectIndividualMaterial 130020. The specializations may specify the business object connected to the Installation Point. The specialization can be represented in the ESR with a 1:c composition to the individual specialized nodes. InstallationPoint has the following relationships with the node roots: CreationIdentity has a cardinality of 1:cn. CreationIdentity specifies the person who created the InstalledObject; and LastChangeIdentity has a cardinality of 1:cn. LastChangeIdentity specifies the person who last changed the InstalledObject. The Integrity Conditions may exist, such that the SystemAdministrativeData may or may not be set internally by the system. It may be able to be assigned or changed “externally”. For multiple instances of InstalledObject, the start time of a ValidityPeriod may or may not correspond to the end time of the ValidityPeriod for the InstalledObject previously valid on that time stream. Gaps may or may not exist in the overall time frame when all existing validity intervals of InstalledObject are analyzed.

An InstalledObjectMaterial can specify the material installed or to be installed at the Installation Point. The InstalledIndicator element can specify whether a material can be installed. If it can be, the indicator can contain the value “TRUE” and the ID and quantity of the material are specified. If it is not, the indicator can contain the value “FALSE”. In this case, the information on a material can still be specified if a material has already been installed but has been uninstalled temporarily, for example, for maintenance. The elements located directly at the InstalledObjectMaterial node are defined by the GDT type InstallationPointInstalledObjectMaterialElements. In certain implementations, these elements include: MaterialUUID, MaterialID, Quantity, QuantityTypeCode, and InstalledIndicator. MaterialUUID can be the UUID of installed material. MaterialUUID is optional and may be based on GDT of type UUID. MaterialID can be the ID of installed material. MaterialID is optional and may be based on GDT of type ProductID. Quantity can be a specification of the quantity of installed material. Quantity is optional and may be based on GDT Quantity.

QuantityTypeCode can be a specification of the quantity type code. QuantityTypeCode is optional, and may be based on GDT of type QuantityTypeCode. InstalledIndicator can specify whether a material can be installed or not. InstalledIndicator may be based on GDT of type InstalledIndicator. In certain implementations, InstalledIndicator may include a qualifier, Installed. For the element Quantity, other elements/attributes are required with regard to the Quantity Service. The element structure will be extended accordingly once there can be an exact definition. InstallationPoint has the following relationship with the node Material has a cardinality of c:cn. Material specifies the material installed at the Installation Point.

An InstalledObjectIndividualMaterial can specify the individual material installed at the Installation Point. The InstalledIndicator element can specify whether an IndividualMaterial can be installed. If it is, the indicator can contain the value "TRUE" and the ID of the IndividualMaterial can be specified. If it is not, the indicator can contain the value "FALSE". In this case, the information on an IndividualMaterial can still be specified if a material has already been installed but has been uninstalled temporarily due to maintenance, for example. The elements located directly at the InstalledObjectMaterial node are defined by the GDT of type InstallationPointInstalledObjectMaterialElements. In certain implementations, these elements include: IndividualMaterialUUID, IndividualMaterialID, and InstalledIndicator. IndividualMaterialUUID can be the UUID of the installed individual material. IndividualMaterialUUID is optional and may be based on GDT of type UUID. IndividualMaterialID can be the ID of individual material installed. IndividualMaterialID is optional and may be based on GDT of type ProductID. InstalledIndicator can specify whether an individual material can be installed or not. InstalledIndicator can be based on GDT of type InstalledIndicator. In certain implementations, InstalledIndicator may include a qualifier, Installed.

InstallationPoint has the following relationship with the node IndividualMaterial has a cardinality of c:cn. IndividualMaterial specifies the individual material installed at the Installation Point.

PartyInformation 130022 can specify the parties involved at the installation point with reference to a validity period. It can assign business partners (that have a particular function for the installation point) to the installation point in a time-dependent manner. Furthermore, PartyInformation can contain both identifying and administrative information. The composition relationship PartyInformationParty 130024 refers to the node model of the Partner Processing (Unified Modeling of Parties), which can be transferred as a reuse component into the Installation Point Model. The installation point can be not the owner of the design of these nodes but rather uses the Party template for BO modeling. The elements located directly at the node PartyInformation are defined by the type GDT InstalledBase PartyInformationElements. In certain implementations, these elements include: UUID, SystemAdministrativeData, and ValidityPeriod. UUID can be a global identifier, which can be unique, for PartyInformation. UUID may be based on GDT of type UUID. SystemAdministrativeData can be administrative data that can be stored in a system. This data includes system users and change dates/times. SystemAdministrativeData may be based on GDT of type SystemAdministrativeData. ValidityPeriod can be the business validity of the PartyInformation. This data includes a start and end time. ValidityPeriod may be based on GDT of type UPPEROPEN_GLOBAL_DateTimePeriod. A number of Composition Relationships may exist including:

PartyInformationParty has a cardinality of 1:. There may be a number of Inbound Association Relationships including: From the business object Identity/node Root, CreationIdentity has a cardinality of 1:cn. Specifies the person who created the PartyInformation. LastChangeIdentity has a cardinality of 1:cn, Specifies the person who last changed the PartyInformation. The Integrity Conditions my exist, such that the SystemAdministrativeData may or may not be set internally by the system. It may be able to be assigned or changed "externally".

A PartyInformationParty can specify an involved party, generally a business partner that has a particular function for the installation point. PartyInformationParty can occur in the role CustodianParty. In certain implementations, the following elements are included: UUID, PartyID, PartyUUID, PartyTypeCode, RoleCategoryCode, RoleCode, and MainIndicator. UUID can be a global identifier, which can be unique, for a PartyInformationParty. UUID may be based on GDT of type UUID. PartyID can be an identifier of the PartyInformationParty in this PartyRole. If a business partner can be referenced, the attribute can contain his or her identifiers. If an unidentified identifier can be, for example, entered by the user, the attribute can contain this identifier. PartyID is optional and may be based on GDT of type PartyID (without additional components, such as schemeAgencyID). PartyUUID can be an identifier, which can be unique, for a business partner or his or her specializations. PartyUUID is optional and may be based on GDT of type UUID.

PartyTypeCode can be the type of the business partner or his or her specializations referenced by the attribute PartyUUID. PartyTypeCode is optional and may be based on GDT of type PartyTypeCode. RoleCategoryCode can be the party role category of the PartyInformationParty. RoleCategoryCode is optional and may be based on GDT of type PartyRoleCategoryCode. RoleCode can be the Party Role of the PartyInformationParty. RoleCode is optional and may be based on GDT of type PartyRoleCode. MainIndicator can indicate whether or not a PartyInformationParty can be emphasized in a group of parties with the same PartyRole. MainIndicator is optional and may be based on GDT of type Indicator. In certain implementations, MainIndicator may include a qualifier, Main. Composition Relationships my exist including: PartyInformationPartyContactParty 130026 has a cardinality of 1:cn. InstallationPoint has the following relationship with the node root, Party has a cardinality of c:cn. Party can be the referenced Party in Master Data. InstallationPoint has the following relationship with the node, MainPartyInformationPartyContactParty has a cardinality of 1:c. MainPartyInformationPartyContactParty specifies the contact to the party. The Integrity Conditions my exist, such that the following integrity conditions may or may not be checked: If the PartyUUID exists, the PartyTypeCode may be able to exist as well.

A PartyInformationPartyContactParty can be a natural person that can be contacted for the PartyInformationParty. The contact may be a contact person or, for example, a secretary's office. Usually, communication data for the contact can be available. In certain implementations, the following elements are included: UUID, PartyID, PartyUUID, PartyTypeCode, and MainIndicator. UUID can be a global identifier, which can be unique, for a contact. UUID may be based on GDT of type UUID. PartyID can be an identifier of the contact in this PartyRole. If a business partner can be referenced, the element contains its identifier. PartyID is Optional PartyUUID can be an identifier, which can be unique, of the contact in this PartyRole. PartyUUID is Optional. PartyTypeCode can be the type of the business partner, which can be referenced by the element PartyUUID. PartyTypeCode is optional and may be based on GDT of type BusinessObjectTypeCode. MainIndicator indicates whether or not a PartyInformationPartyContactParty can be emphasized in a group of contact parties with the same PartyRole. MainIndicator is optional and may be based on GDT of type Indicator. In certain implementations, MainIndicator may include a qualifier, Main. InstallationPoint has the following relationship with the node root Party has a cardinality of c:cn, Party can be the referenced Party in Master Data.

AddressInformation 130028 specifies address-specific information which describes the physical location of an installation point with reference to a validity period. It assigns a time-dependent address to the installation point. The address can be the delivery address, the location, or the customer address of an Installation Point for example. Furthermore, AddressInformation can contain both identifying as well as administrative information. The elements located directly at the AddressInformation node are defined by the GDT type InstallationPointAddressInfoElements. In certain implementations, these elements can include: UUID, SystemAdministrativeData, and ValidityPeriod. UUID can be a global identifier, which can be unique, for AddressInformation. UUID may be based on GDT of type UUID. SystemAdministrativeData. Administrative data that can be stored in a system. This data includes system users and change dates/times. SystemAdministrativeData may be based on GDT of type SystemAdministrativeData.

ValidityPeriod can be the business validity of the AddressInformation. This data includes a start and end time. ValidityPeriod may be based on GDT UPPEROPEN_GLOBAL_DateTimePeriod. InstallationPoint has the following Composition Relationship with the node DO: Address 130030 has a cardinality of 1:1. InstallationPoint has the following relationships with the node roots: CreationIdentity has a cardinality of 1:cn. CreationIdentity specifies the person who created the AddressInformation; and LastChangeIdentity has a cardinality of 1:cn. LastChangeIdentity specifies the person who last changed the AddressInformation. The Integrity Conditions may exist, such that the SystemAdministrativeData may or may not be set internally by the system. It may be able to be assigned or changed "externally". The validity periods of multiple instances of AddressInformation may be able to overlap. An Address contains a postal address and can also contain contact information. Address can be mapped by the DO Address. A Description 130030 can be a language-dependent description of an Installation Point with reference to a validity period. Furthermore, a Description can contain both identifying as well as administrative information. The elements located directly at the Description node are defined by the GDT type InstallationPointDescriptionElements. In certain implementations, these elements include: UUID, SystemAdministrativeData, ValidityPeriod, and Description. UUID can be a global identifier, which can be unique, for Description. UUID may be based on GDT of type UUID. SystemAdministrativeData can be administrative data that can be stored in a system. This data includes system users and change dates/times. SystemAdministrativeData may be based on GDT of type SystemAdministrativeData. ValidityPeriod can be the business validity of Description. This data includes a start and end time. ValidityPeriod may be based on GDT of type UPPEROPEN_GLOBAL_DateTimePeriod. Description can be a short description of an Installation Point. Description may be based on GDT of type _SHORT_Description. In certain implementations, Description may include a qualifier, InstallationPoint. InstallationPoint has the following relationships with the node roots: CreationIdentity has a cardinality of 1:cn. CreationIdentity specifies the person who created the Description; and LastChangeIdentity has a cardinality of 1:cn. LastChangeIdentity specifies the person who last changed the Description. The Integrity Conditions my exist, such that the SystemAdministrativeData may or may not be set internally by the system. It may be able to be assigned or changed "externally". The validity periods of multiple instances of Description may be able to overlap within the same language.

Business Object Installed Base

Figure 131:
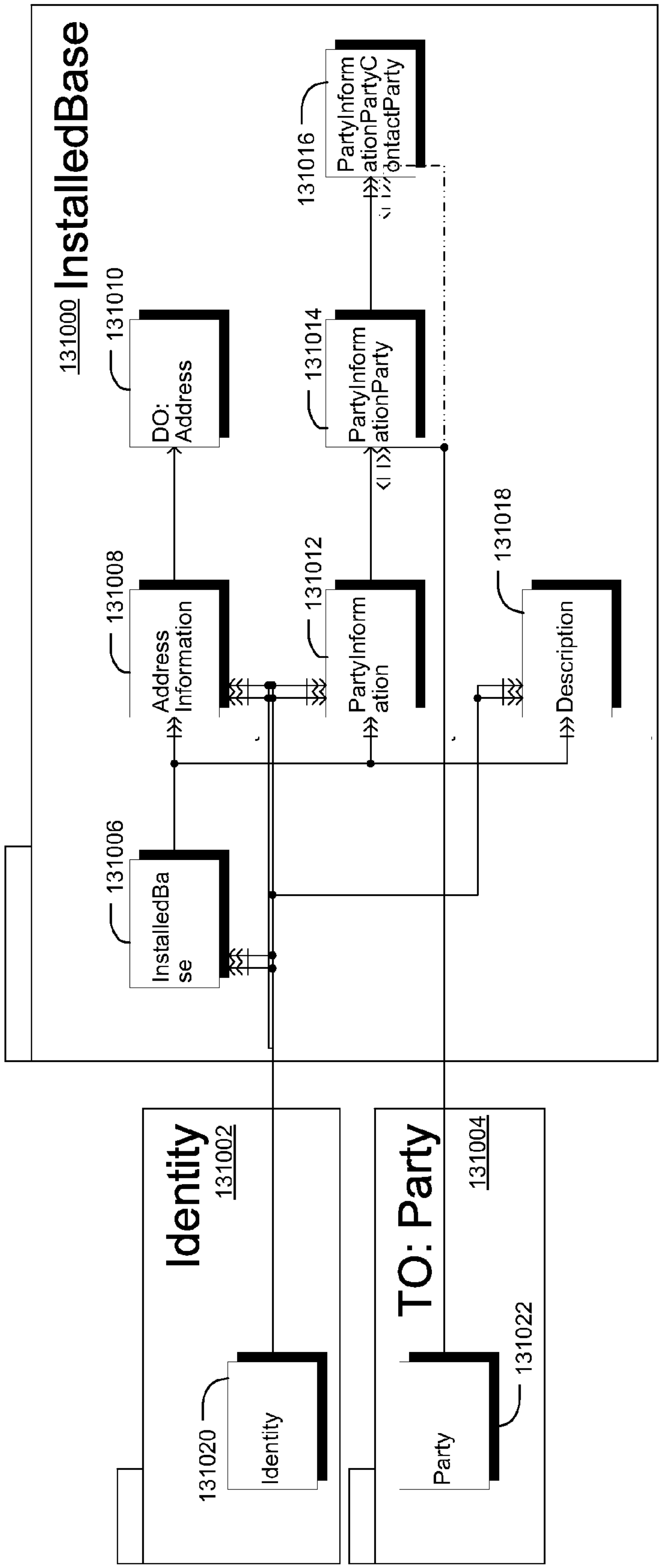

FIG. 131 illustrates an example InstalledBase business object model 131000. Specifically, this model depicts interactions among various hierarchical components of the InstalledBase, as well as external components that interact with the InstalledBase (shown here as 131002 through 131004 and 131020 through 131022).

The Business Object InstalledBase is a functionally-structured arrangement of business objects at a logical or physical location. Objects within an installed base are structured in a hierarchy. The hierarchy generally describes the organization of these objects. The hierarchical structure and the installed objects are described by instances of the business object installation point that are related to the installed base. An installed base essentially can contain structural information about the root nodes of the Installation Points that belong to the installed base (BO Installation Point), information about business partners that have a particular role and that are related to the installed base, and address information that can specify a physical address of an installed base in more detail. The business object installed base belongs to the process component Installed Base Data Management. The business object Installed Base is a foundation object and thus can reside in the Foundation Layer. Application examples for business include a Service Provider view as seen using the products installed at the customer end (CRM Service), and in-house administration of business objects for internal as well as external service. The process component Installed Base Data Management belongs to the Foundation Layer. This layer can be locally available in all LDUs. In certain implementations, therefore, no interfaces are required in addition to those defined in the actual BO.

Node Structure of Business Object Installed Base

An installed base is the business context of different installation points (BO Installation Point) which logically belongs to an installed base. Furthermore, an InstalledBase 131006 can contain both identifying as well as administrative information.

The elements located directly at the node InstalledBase are defined by the type GDT InstalledBase Elements. In certain implementations, these elements include UUID, ID, SystemAdministrativeData, Name, Status, and LifeCycleStatusCode. UUID is a global identifier, which can be unique, for the business object. UUID may be based on GDT UUID, and is an alternative key. ID is an identifier, which can be unique, for an installed base. ID may be based on GDT InstalledBaseID. SystemAdministrativeData is administrative data that is stored in a system. This data includes system users and change dates/times. SystemAdministrativeData may be based on GDT SystemAdministrativeData. Name is the name for an installed base. Name is optional and may be based on GDT _LANGUAGEINDEPENDENT_MEDIUM_Name. In certain implementations, Name may include a qualifier of InstalledBase. Status is the current step in the life cycle of an InstalledBase. LifeCycleStatusCode is the status defining the state of an InstalledBase during its lifecycle. LifeCycleStatusCode may be based on GDT InstalledBaseLifeCycleStatusCode.

Composition Relationships can include Description 1..cn (InstalledBaseDescriptionFilterElements), ValidityPeriod: UPPEROPEN_GLOBAL_DateTimePeriod, AddressInformation 131008 1..cn (InstalledBaseAddressInformationFilterElements), ValidityPeriod: UPPEROPEN_GLO- BAL_DateTimePeriod, PartyInformation 131012 1..cn, (InstalledBasePartyInformationFilterElements), and ValidityPeriod: UPPEROPEN_GLOBAL_DateTimePeriod.

Associations for Navigation to the business object Installation Point/node InstallationPoint can include DirectDependentInstallationPointByValidityPeriod 1..cn (DirectDependentInstallationPointByValidityPeriodFilterElements) and ValidityPeriod UPPEROPEN_GLOBAL_DateTimePeriod. This association defines the root installation points that belong to the installed base. An association for navigation to node PartyInformation can exist, such as CustodianPartyInformationByValidityPeriod 1..cn (CustodianInstalledBasePartyInformationByValidityPeriodFilterElements) and ValidityPeriod: UPPEROPEN_GLOBAL_DateTimePeriod. This association defines parties that are in the role category "Custodian". InstalledBase has the following relationships with the node root: CreationIdentity 1:cn. CreationIdentity specifies the person who created the Installed Base; and LastChangeIdentity 1:cn. LastChangeIdentity specifies the person who last changed the Installed Base. In some implementations, for integrity, the SystemAdministrativeData is set internally by the system. It may or may not be assigned or changed "externally".

Enterprise Service Infrastructure Actions

In a CreateWithReference action, the InstalledBase is able to be copied from a given reference InstalledBase along with all its components. If a validity period is set as parameter in the action, only components which intersect with the given period may or may not be copied. The action may be able to create a new instance of the business object Installed Base. The action elements are defined by the data type InstalledBaseCreateWithReferenceActionElements. In certain implementations, these elements include ValidityPeriod, which may determine the validity period for which the components of the installed base are to be copied. ValidityPeriod is optional and may be based on GDT UPPEROPEN_GLOBAL_DateTimePeriod.

The ESI Activate, an (S&AM Action, may be able to set the status of an InstalledBase to "Active". With this status the InstalledBase may be able to be referenced by other BOs and its data validated. The LifeCycleStatusCode may or may not be "InPreparation". LifeCycleStatusCode may or may not change. The LifeCycleStatusCode may or may no be changed to "Active".

The ESI Block (S&AM Action) may be able to set the status of an InstalledBase to "Blocked". The InstalledBase may be able to be newly referenced by other BOs. This status may or may not be temporary and intention be to come back to "Active". The LifeCycleStatusCode may or may not be "Active". LifeCycleStatusCode may or may not change. The LifeCycleStatusCode may or may not be changed to "Blocked".

The ESI Unblock, an S&AM Action, may be able to unblock the InstalledBase and may or may not set its status back to "Active". The LifeCycleStatusCode may or may not be "Blocked". LifeCycleStatusCode may or may not change. The LifeCycleStatusCode may or may not be changed to "Active".

Queries

QueryByIdentification gets a list of all installed bases that correspond to a particular identification. The query elements are defined by the data type InstalledBaseIdentificationQueryElements. In certain implementations, these elements include ID, Name, and StatusLifeCycleStatusCode. ID is optional and may be based on GDTInstalledBaseID. Name is optional and may be based on GDT_LANGUAGEINDEPENDENT_MEDIUM_Name. In certain installations, Name may include a qualifier, InstalledBase. StatusLifeCycleStatusCode is optional and may be based on GDT InstalledBaseLifeCycleStatusCode.

QueryByDescription gets a list of all installed bases that correspond to a particular description. The query elements are defined by the data type InstalledBaseDescriptionQueryElements. In certain implementations, these elements include DescriptionDescription, DescriptionValidityPeriod, and StatusLifeCycleStatusCode. DescriptionDescription is optional and may be based on GDT _SHORT_Description. DescriptionValidityPeriod is optional and may be based on GDT UPPEROPEN_GLOBAL_DateTimePeriod. StatusLifeCycleStatusCode is optional and may be based on GDT InstalledBaseLifeCycleStatusCode.

QueryByParty gets a list of all installed bases to which, based on a validity period, a specific party is assigned. The query elements are defined by the data type InstalledBasePartyQueryElements. In certain implementations, these elements include PartyInformationPartyPartyID, PartyInformationPartyRoleCategoryCode, PartyInformationPartyRoleCode, PartyInformationValidityPeriod, and StatusLifeCycleStatusCode. PartyInformationPartyPartyID is optional and may be based on GDT PartyID. PartyInformationPartyRoleCategoryCode is optional and may be based on GDT PartyRoleCategoryCode. PartyInformationPartyRoleCode is optional and may be based on GDT PartyRoleCode. PartyInformationValidityPeriod is optional and may be based on GDT UPPEROPEN_GLOBAL_DateTimePeriod. StatusLifeCycleStatusCode is optional and may be based on GDT InstalledBaseLifeCycleStatusCode.

QueryByAddress gets a list of all installed bases to which a specific address is assigned with reference to a validity period. The query elements are defined by the data type InstalledBaseAddressQueryElements. In certain implementations, these elements include AddressInformationAddressOrganisationNameNameFirstLineName, AddressInformationAddressOrganisationNameNameSecondLineName, AddressInformationAddressOrganisationNameKeyWordsText, AddressInformationAddressOrganisationNameAdditionalKeyWordsText, AddressInformationAddressPostalAddressCountryCode, AddressInformationAddressPostalAddressRegionCode, AddressInformationAddressPostalAddressCityName, AddressInformationAddressPostalAddressDistrictName, AddressInformationAddressPostalAddressStreetPostalCode, AddressInformationAddressPostalAddressHouseID, AddressInformationAddressPostalAddressAdditionalHouseID, AddressInformationAddressPostalAddressBuildingID, AddressInformationAddressPostalAddressRoomID, AddressInformationAddressPostalAddressFloorID, AddressInformationValidityPeriod, and StatusLifeCycleStatusCode.

AddressInformationAddressOrganisationNameNameFirstLineName is optional and may be based on GDT _LANGUAGEINDEPENDENT_MEDIUM_Name. AddressInformationAddressOrganisationNameNameSecondLineName is optional and may be based on GDT _LANGUAGEINDEPENDENT_MEDIUM_Name. AddressInformationAddressOrganisationNameKeyWordsText is optional and may be based on GDT KeyWordsText. AddressInformationAddressOrganisationNameAdditionalKeyWordsText is optional and may be based on GDT KeyWordsText. AddressInformationAddressPostalAddressCountryCode is optional and may be based on GDT CountryCode. AddressInformationAddress- PostalAddressRegionCode is optional and may be based on GDT RegionCode. AddressInformationAddressPostalAddressCityName is optional and may be based on GDT _LANGUAGEINDEPENDENT_MEDIUM_Name. AddressInformationAddressPostalAddressDistrictName is optional and may be based on GDT _LANGUAGEINDEPENDENT_MEDIUM_Name. AddressInformationAddressPostalAddressStreetPostalCode is optional and may be based on GDT PostalCode. AddressInformationAddressPostalAddressStreetName is optional and may be based on GDT StreetName. AddressInformationAddressPostalAddressHouseID is optional and may be based on GDT HouseID. AddressInformationAddressPostalAddressAdditionalHouseID is optional and may be based on GDT HouseID. AddressInformationAddressPostalAddressBuildingID is optional and may be based on GDT BuildingID. AddressInformationAddressPostalAddressRoomID is optional and may be based on GDT RoomID. AddressInformationAddressPostalAddressFloorID is optional and may be based on GDT. FloorID. AddressInformationValidityPeriod is optional and may be based on GDT UPPEROPEN_GLOBAL_DateTimePeriod. StatusLifeCycleStatusCode is optional and may be based on GDT InstalledBaseLifeCycleStatusCode.

Description

A description 131018 is a language-dependent description of an installed base. The elements located directly at the Description node are defined by the type GDT: InstalledBaseDescriptionElements. In certain implementations, these elements include UUID, SystemAdministrativeData, ValidityPeriod, and Description. UUID is a global identifier, which can be unique, for Description. UUID may be based on GDT UUID. SystemAdministrativeData is administrative data that is stored in a system. This data includes system users and change dates/times. SystemAdministrativeData may be based on GDT SystemAdministrativeData. ValidityPeriod is the business validity of Description. This data includes a start and end time. ValidityPeriod may be based on GDT UPPEROPEN_GLOBAL_DateTimePeriod. Description is a short description of an installed base. Description may be based on GDT _SHORT_Description. In certain implementations, Description may include a qualifier, InstalledBase.

InstalledBase has the following relationships with the node Roots: CreationIdentity 1:cn. CreationIdentity specifies the person who created the Description; and LastChangeIdentity 1:cn. LastChangeIdentity specifies the person who last changed the Description.

In some implementations, for integrity, the SystemAdministrativeData may or may not be set internally by the system. It may be able to be assigned or changed "externally". The validity periods of multiple instances of Description may be able to overlap within the same language.

AddressInformation

An AddressInformation can specify address-specific information which describes the physical location of an installed base with reference to a validity period. It can assign the installed base a time-dependent address. For example, the address can be the delivery address, the location, or the customer address of an Installed Base. Furthermore, an AddressInformation can contain both identifying as well as administrative information.

The elements located directly at the AddressInformation node are defined by the type GDT InstalledBaseAddressInformationElements. In certain implementations, these elements include UUID, SystemAdministrativeData, and ValidityPeriod. UUID is a global identifier, which can be unique, for AddressInformation. UUID may be based on GDT UUID. SystemAdministrativeData is administrative data that is stored in a system. This data includes system users and change dates/times. SystemAdministrativeData may be based on GDT SystemAdministrativeData. ValidityPeriod is the business validity of the AddressInformation. This data includes a start and end time. ValidityPeriod may be based on GDT UPPEROPEN_GLOBAL_DateTimePeriod.

InstalledBase can have the following Composition Relationship with the node DO: Address 131010: 1:1.

InstalledBase can have the following relationships with the node Roots: CreationIdentity 1:cn. CreationIdentity specifies the person who created the AddressInformation; and LastChangeIdentity 1:cn. LastChangeIdentity specifies the person who last changed the AddressInformation.

In some implementations, for integrity, the SystemAdministrativeData may or may not be set internally by the system. It may be able to be assigned or changed "externally". The validity periods of multiple instances of AddressInformation may be able to overlap.

Address

An Address contains a postal address and can also contain contact information. Address is mapped as the DO Address.

PartyInformation

PartyInformation can specify the parties involved in the installed base with reference to a validity period. Essentially it can assign the installed base business partners time-dependently, who have a particular function for the Installed Base. Furthermore, PartyInformation can contain both identifying and administrative information. The composition relationship PartyInformationParty 131014 refers to the node model of the Partner Processing (Unified Modeling of Parties), which is transferred as a reuse component into the Installed Base Model. The installed base is not the owner of the design of these nodes but rather uses the Party template for BO modeling.

The elements located directly at the node PartyInformation are defined by the type GDT InstalledBase PartyInformationElements. In certain implementations, these elements include UUID, SystemAdministrativeData, and ValidityPeriod. UUID is a global identifier, which can be unique, for PartyInformation. UUID may be based on GDT UUID. SystemAdministrativeData is administrative data that is stored in a system. This data includes system users and change dates/times. SystemAdministrativeData may be based on GDT SystemAdministrativeData. ValidityPeriod is the business validity of the PartyInformation. This data includes a start and end time. ValidityPeriod may be based on GDT UPPEROPEN_GLOBAL_DateTimePeriod.

InstalledBase has the following composition relationship with the node PartyInformationParty: 1:1.

InstalledBase has the following relationships with the node Roots: CreationIdentity 1:cn. CreationIdentity specifies the person who created the PartyInformation; and LastChangeIdentity 1:cn. LastChangeIdentity specifies the person who last changed the PartyInformation.

In some implementations, for integrity, the SystemAdministrativeData may or may not be set internally by the system. It may be able to be assigned or changed "externally".

PartyInformationParty

A PartyInformationParty can specify an involved party, generally a business partner that has a particular function for the installed base. PartyInformationParty can arise in the role CustodianParty. In certain implementations, the elements include UUID, PartyID, PartyUUID, PartyTypeCode, RoleCategoryCode, RoleCode, and MainIndicator. UUID is a global identifier, which can be unique, for a PartyInformationParty. UUID may be based on GDT UUID. PartyID is an identifier of the PartyInformationParty in this PartyRole. If a business partner is referenced, the attribute can contain his or her identifiers. If an unidentified identifier is, for example, entered by the user, the attribute can contain this identifier. PartyID is optional and may be based on GDT PartyID (without additional components, such as schemeAgencyID). PartyUUID is an identifier, which can be unique, for a business partner or his or her specializations. PartyUUID is optional and may be based on GDT UUID. PartyTypeCode is the type of the business partner or his or her specializations referenced by the attribute PartyUUID. PartyTypeCode is optional and may be based on GDT PartyTypeCode. RoleCategoryCode is the party role category of the PartyInformationParty. RoleCategoryCode is optional and may be based on GDT: PartyRoleCategoryCode. RoleCode is the party role of the PartyInformationParty. RoleCode is optional and may be based on GDT PartyRoleCode. MainIndicator indicates whether or not a PartyInformationParty is emphasized in a group of parties with the same PartyRole. MainIndicator is optional and may be based on GDT Indicator. In certain implementations, MainIndicator may include a qualifier of Main.

InstalledBase can have the following composition relationship with the node PartyInformationPartyContactParty 131016: 1:cn. InstalledBase can have the following relationship with the node root Party: c:cn. Party is the referenced Party in Master Data. InstalledBase can have the following relationship with the node MainPartyInformationPartyContactParty: 1:c. MainPartyInformationPartyContactParty specifies the contact to the party.

In some implementations, for integrity, if the PartyUUID exists, the PartyTypeCode may be able to exist as well.

PartyInformationPartyContactParty

A PartyInformationPartyContactParty is a natural person that can be contacted for the PartyInformationParty. The contact may be a contact person or, for example, a secretary's office. Usually, communication data for the contact is available. UUID is a global identifier, which can be unique, for a contact. UUID may be based on GDT UUID. PartyID is an identifier of the contact in this PartyRole. If a business partner is referenced, the element contains its identifier. PartyID is optional. PartyUUID is an identifier, which can be unique, of the contact in this PartyRole. PartyUUID is optional. PartyTypeCode is the type of the business partner, which is referenced by the element PartyUUID. PartyTypeCode is optional and may be based on GDT BusinessObjectTypeCode. MainIndicator indicates whether or not a PartyInformationPartyContactParty is emphasized in a group of contact parties with the same PartyRole. MainIndicator is optional and may be based on GDT Indicator. In certain implementations, MainIndicator may include a qualifier, Main. InstalledBase has the following relationship with the node root Party: c:cn. Party is the referenced Party in Master Data.

Business Object Job

FIG. 132 illustrates an example Job business object model 132000. Specifically, this model depicts interactions among various hierarchical components of the Job.

In the business object Job, a Job is the type of a Position. The business object Job is part of the process component Organizational Management. Job comprises task descriptions and task profiles, competencies and responsibilities as well as required Qualifications and Skill Profile. A Job could be assigned (via Position) to one or more suitable Employees.

A Job may be able to contain a time dependent name and an attachment folder for Documents describing the Job, the task profiles, competencies, responsibilities, qualifications and skill profile. The business object Job may or may not contain surface interfaces.

The Node Structure of Business Object Job 132002 is the type of a Position. The elements located directly at the node Job are defined by the data type JobElements. In certain implementations, these elements include: UUID, ID, and ValidityPeriod. UUID is a universal identifier, which can be unique, of the Job. UUID is an alternative key and may be based on GDT UUID. ID is an identifier of the Job. ID may be based on GDT JobID. ValidityPeriod is the period during which the Job exists. ValidityPeriod may be based on GDT CLOSED_DatePeriod. In certain implementations, ValidityPeriod may include a qualifier "Validity." The following composition relationships to subordinate nodes exist: Name 132004 1:n and AttachmentFolder 132006 1:c. The filter elements are defined by the GDT ValidityPeriodFilterElements. In some implementations, one Name per language and time may exist.

Queries

QueryByID returns a list of jobs within a validity period that have an ID which matches with the pattern given in the query elements. The query elements are defined by the data type JobByIDQueryElements. In certain implementations, these elements include ID and ValidityPeriod. ID is optional and may be based on GDT JobID.

ValidityPeriod is the time frame that may be used for the query. A Job may be selected, if its validity period intersects at least one day with the ValidityPeriod. ValidityPeriod is optional and may be based on GDT CLOSED_DatePeriod. In certain implementations, ValidityPeriod may include a qualifier, Validity.

QueryByName returns a list of jobs with a given Name. The query elements are defined by the data type JobByNameQueryElements. In certain implementations, these elements include Name and NameValidityPeriod. NameName is optional and may be based on GDT MEDIUM_Name.

NameValidityPeriod is the time frame that is used for the query. A Job may selected, if its validity period intersects at least one day with the ValidityPeriod. ValidityPeriod is optional and may be based on GDT CLOSED_DatePeriod. In certain implementations, NameValidityPeriod may include a qualifier, Validity.

Name

A Name is a language and time specific name of a Job. The elements located directly at the node Name are defined by the data type JobNameElements. In certain implementations, these elements include Name and ValidityPeriod. Name is a language specific name of the job. Name may be based on GDT MEDIUM_Name. ValidityPeriod is the period during which the name exists. ValidityPeriod may be based on GDT CLOSED_DatePeriod. In certain implementations, ValidityPeriod may include a qualifier, Validity.

AttachmentFolder

An AttachmentFolder is a collection of all documents attached to a Job.

Business Object Location

FIGS. 133-1 through 133-2 illustrate an example Location business object model 133000. Specifically, this model depicts interactions among various hierarchical components of the Location, as well as external components that interact with the Location (shown here as 133002 through 133004 and 133038 through 133040).

Business Object Location is a location is a geographical place. The business object Location is part of the foundation layer. A Location may be used in particular for communicating place information in business processes. It can include places within and without a company. Using the Location, places can be modelled to or from which goods shipments are made, that have to be passed through when shipping goods or at which services are provided. A Location can have a hierarchical relationship to another Location. This means that the physical structure of company sites can be modelled from a cross-company perspective. Examples may include buildings, warehouses, gates, unloading points and loading points, ramps, harbors, airports, borders, customs points and terminals.

Location is represented by the node Location. The business object Location sends and receives no B2B messages. The business object Location sends and receives no A2A messages.

Node Structure of the Business Object Location A location 133006 is a geographical place. Locations can occur in the following incomplete and non disjoint specializations: 1) Site 133008: a Location at which parts of a company may be located. 2) InventoryManagedLocation 133010: a Location at which stocks may be kept. 3) ServicePoint 133012: a Location at which services may be provided. 4) ShipToLocation 133014: a location to which goods may be shipped and 5) ShipFromLocation 133016: a location from which goods may be shipped. Several indicators can be set. This means, in case for example all indicators are set, that this location can be part of an enterprise where stocks are kept and for which goods and services can be provided to and shipped from.

The elements located directly at the node Root are defined by the datatype: LocationElements. These elements are: ID, UUID, ParentLocationUUID, SystemAdministrativeData, SiteIndicator, InventoryManagedLocationIndicator, ServicePointIndicator, ShipToLocationIndicator, ShipFromLocationIndicator, WorkingDayCalendarCode, and Status.

ID is an identifier, which can be unique, for a Location. ID may be based on GDT: LocationID. UUID is a universal identifier, which can be unique, of a Location. UUID may be based on GDT: UUID; ParentLocationUUID can denote which location is on the above level in the hierarchy. ParentLocationUUID may be based on GDT: UUID; SystemAdministrativeData could denote general administrative data on the location that is stored in a system and may be based on GDT: SystemAdministrativeData; LocationLogisticUnitManagedIndicator would indicate if the Location is LogisticsUnit managed or not. This can be set to TRUE for a siteIndicator is TRUE for the location and may be based on GDT: Indicator, with the Qualifier as LogisticUnitManagedIndicator. SiteIndicator denotes whether the Location is of the type Site and may be based on GDT: Indicator; with the Qualifier as SiteIndicator; InventoryManagedLocationIndicator denotes whether the Location in question may be used to manage stock and may be based on GDT: Indicator, with the qualifier: InventoryManagedLocation.

In addition to the above-mentioned are: ServicePointIndicator which denotes whether the Location is of the type ServicePoint and may be based on GDT: Indicator and Qualifier: ServicePointIndicator. ShipToLocationIndicator denotes whether the Location is of the type ShipToLocation and may be based on GDT: Indicator and Qualifier: ShipToLocationIndicator. ShipFromLocationIndicator denotes whether the Location is of the type ShipFromLocation and may be based on GDT: Indicator and Qualifier: ShipFromIndicator. WorkingDayCalendarCode which is a coded representation of a working day calendar of a Location may be based on GDT: WorkingDayCalendarCode. Status indicates the status of a Location. The IDT LocationStatus consists of the following status variables: LifeCycleStatusCode which can be used to give the lifecycle status of a Location and which may be based on GDT: LocationLifeCycleStatusCode.

The following composition relationships to subordinate nodes exist: Description 133034 (1:cn), AlternativeIdentification 133018 (1:cn), BusinessPartner 133020 (1:c), GeographicalInformation 133022 (1:c) and TimeInformation 133028 (1:cn). Associations for Navigation may relate: to the business object LogisticsArea/node Root (LogisticArea 1:cn), as a LogisticAreas attached to a location; to business object Location/node Root 1:cn (ChildLocation), as a location that can represent the immediate child locations in a hierarchy; and to business object Location/node Root 1:cn (SubordinateLocation), as a location representing all subordinate locations in a hierarchy. Inbound Aggregation Relationships may relate from business object Location/node Root c:cn (ParentLocation), as a location that can represent the parent in a location hierarchy. The lower-level Location may represent a more detailed subdivision of the higher-level Location. Example: Gates of a large warehouse. The gates can be locations that reference the Location warehouse as the parent of the location hierarchy. Inbound Association Relationships may relate: from business object Identity/node Root and may include the following: CreationIdentity (1:cn), which can identify the identity that has created the Location; and LastChangeIdentity (c:cn), which can identify the Identity that has last changed the Location. Constraints may include the following limitations regarding the specializations apply when creating location hierarchies: a Site may not have a parent and/or an InventoryManagedLocation can have a Site as parent.

ESI Actions may include the following: CreateDefaultSupplyPlanningArea, Block (S&AM action), Activate (S&AM action), Unblock (S&AM action), Delete (S&AM action), FlagAsObsolete (S&AM action) and RevokeObsolescence (S&AM action). CreateDefaultSupplyPlanningArea is an action that can create a Supply Planning Area that references the Location and is the default SupplyPlanningArea for the Location. The action CreateSupplyPlanningArea is allowed for Locations of the type Site without additional input elements. Block (S&AM action) is an action that can block an active Location. The following attributes may relate as well: Preconditions, which may be called if the Location is not flagged for deletion, it can be active and not blocked; Changes to the object which can be None; Changes to other objects which can be None and Changes to the status, that is, the status of the location can be set to “Blocked”

In addition to the above, Activate (S&AM action) can be an action that may activate a Location. It may be executed in order to indicate that the Location may be referenced and available for use in business processes. This action can check whether the Location is consistent. If the Location is consistent the status may be changed. Active Locations may no longer be deleted. In order to delete the active locations, we may need to flag them as obsolete. Also, if a location is obsolete and if there are no more references to this Location, then this location can be deleted. The following attributes may relate: Preconditions, where the Location may have the status “In Preparation”; Changes to the object which can be None; Changes to other objects which can be None; Changes to the status, when the action is executed, a consistency check may be carried out for the Location. The Location may be activated if it is consistent.

Similarly, an Unblock action can unblock a Location. The following attributes may relate: Preconditions, that is, the Location may have the status “Blocked”; Changes to the object can be None. Changes to other objects can be None; Changes to the status where the Location may be set to “Active” status. A Delete action can delete a location. The following attributes may relate: Preconditions, where the location may be in “In Preparation” or “Obsolete” state. For obsolete locations, those locations which are not referenced can be deleted; Changes to the object, where the location may be deleted; Changes to other objects can be None; and Changes to the status can be None.

As a continuation of the above, a FlagAsObsolete action can be an action that marks a location as obsolete. This may indicate that the Location is no longer to be referenced and hence cannot be used any more. The following attributes may relate: Preconditions, where the location may not be used in any processes; Changes to the object may be None; Changes to other objects may be None; Changes to the status, where the location may have the status "Obsolete". RevokeObsolescence action can revoke the obsolescence for a location and set it as active. The following attributes may relate: Preconditions where the location may have the status "Obsolete"; Changes to the object can be None; Changes to other objects can be None; and Changes to the status, where the location may have the status "Active".

Furthermore, Queries can include QueryByIdentifier, which can provide a set of Locations by identifiers. You can search with identifiers that can be interpreted (ID, StandardLocationID) and that are technically (UUID). The query elements are defined by the datatype: LocationIdentifierQueryElements, which may include the following: ID may be based on GDT: LocationID; StandardLocationID may be based on GDT: LocationStandardID; UUID may be based on GDT: UUID; and Status which indicates the status of a Location and may be based on IDT: LocationStatus. If no element related to location is defined then all the Locations that exist may be listed. QueryBySpecialization, which can provide a quantity of Locations that correspond to a predefined specialization. As well as the LocationID, a search may be performed using GLN and DUNS+4 ID, that is, the LocationStandardId. The query elements are defined by the datatype: LocationSpecializationQueryElements and may include: ID may be based on GDT: LocationID; StandardLocationID may be based on GDT: LocationStandardID; SiteIndicator may be based on GDT: Indicator; InventoryManagedLocationIndicator may be based on GDT: Indicator; ServicePointIndicator which may be based on GDT: Indicator; ShipToLocationIndicator which may be based on GDT: Indicator; ShipFromLocationIndicator which is may be based on GDT: Indicator; and Status which indicates the status of a Location and may be based on IDT: LocationStatus.

As a continuation, QueryByBusinessPartner can provide a quantity of Locations that belong to the specified BusinessPartner. Here, the Locations are considered that are indirectly assigned to the BusinessPartner via a hierarchy of Locations. The query elements are defined by the datatype: LocationBusinessPartnerQueryElements and may include the following: BusinessPartnerUUID which may be based on GDT: UUID; BusinessPartnerInternalID may be based on GDT: BusinessPartnerInternalID; and Status which indicates the status of a Location and may be based on IDT: LocationStatus. At least one of the two elements related to Business Partner may have to be filled.

QueryTopLocationByIdentifierAndSpecialisation can provide the top location of a given specialisation type in a hierarchy of locations for a given input location. If the input location has the same specialisation as the input specialisation, then return the input location itself, else traverse up the hierarchy till we find a location with the same specialisation as the input specialisation. The query elements are defined by the datatype: LocationTopLocationByIdentifierAndSpecialisationQueryElements and may include the following: ID which may be based on GDT: LocationID; StandardLocationID which may be based on GDT: LocationStandardID; UUID which may be based on GDT: UUID; SiteIndicator which may be based on GDT: Indicator; InventoryManagedLocationIndicator which may be based on GDT: Indicator; ServicePointIndicator which may be based on GDT: Indicator; ShipToLocationIndicator which may be based on GDT: Indicator; and ShipFromLocationIndicator which may be based on GDT: Indicator. At least one of the three identifiers for the location may be filled. Also one of the specialisation may be provided as an input.

In addition to the above are QueryAllSubLocationsByIdentifierAndSpecialisations, which can provide all the sub locations of the given specialisation types in a hierarchy of locations for a given input location. If the input location is of the same specialisation as the input specialisation, then the input location may also be returned. The query elements are defined by the datatype: LocationAllSubLocationsByIdentifierAndSpecialisationsQueryElements and may include the following attributes: ID which may be based on GDT: LocationID; StandardLocationID which may be based on GDT: LocationStandardID; UUID which may be based on GDT: UUID; SiteIndicator which may be based on GDT: Indicator; InventoryManagedLocationIndicator which is and may be based on GDT: Indicator; ServicePointIndicator which may be based on GDT: Indicator; ShipToLocationIndicator which may be based on GDT: Indicator; and ShipFromLocationIndicator which may be based on GDT: Indicator. At least one of the three identifiers for the location may be filled.

In addition to the above are QueryNextLevelSubLocationsByIdentifierAndSpecialisations, which can provide the next level sub locations of the given specialisation types in a hierarchy of locations for a given input location. The query elements are defined by the datatype: LocationNextLevelSubLocationsByIdentifierAndSpecialisationsQueryElements and can have the following attributes: ID which may be based on GDT: LocationID; StandardLocationID which may be based on GDT: LocationStandardID; UUID which may be based on GDT: UUID; SiteIndicator which may be based on GDT: Indicator; InventoryManagedLocationIndicator which may be based on GDT: Indicator; ServicePointIndicator which may be based on GDT: Indicator); ShipToLocationIndicator which may be based on GDT: Indicator; and ShipFromLocationIndicator which may be based on GDT: Indicator. At least one of the three identifiers for the location may be filled.

In addition to the above are QueryParentLocationByIdentifier, which can provide the parent location for a given location in a hierarchy of locations. The query elements are defined by the datatype: LocationParentLocationByIdentifierQueryElements and may have the following attributes: ID which may be based on GDT: LocationID, StandardLocationID which may be based on GDT: LocationStandardID and UUID which may be based on GDT: UUID. At least one of the three elements may have to be filled. Also QueryAllParentLocationsByIdentifier, which provides all the parent locations (immediate parent, parent of the parents etc.) for a given input location in a hierarchy of locations. The query elements are defined by the datatype: LocationAllParentLocationsByIdentifierQueryElements, which has the following attributes: ID which may be based on GDT: LocationID, StandardLocationID which may be based on GDT: LocationStandardID and UUID which may be based on GDT: UUID. At least one of the three elements may have to be filled.

Description

Description contains a language-dependent description of the Location. The elements located directly at the node Description are defined by the datatype: DescriptionElements. This element is Description GDT: _SHORT_Description.

AlternativeIdentification

AlternativeIdentification is an alternative identifier for a Location. The elements located directly at the node AlternativeIdentification are defined by the datatype: AlternativeIdentificationElements. This element is LocationStandardID an identifier for a Location. It may be based on GDT: LocationStandardID, LocationStandardID is a standardized ID provided by organizations (such as Duns & Bradstreet).

BusinessPartner

BusinessPartner is a business partner to which a Location belongs. The elements located directly at the node BusinessPartner are defined by the datatype: BusinessPartnerElements. These elements are: BusinessPartnerInternalID, an internal identifier of a BusinessPartner that may be based on GDT: BusinessPartnerInternalID and BusinessPartnerUUID, an universally unique identifier of a BusinessPartner that may be based on GDT: UUID. Inbound Aggregation Relationships may relate from the business object BusinessPartner/node Root and have the attribute BusinessPartner (c:cn), referring to Business partner to which the Location may belong.

GeographicalInformation

GeographicalInformation contains geographical information on a Location. The elements located directly at the node GeographicalInformation are defined by the datatype: GeographicalInformationElements. These elements are: TimeZoneCode which denotes in which time zone the Location is situated. It may be based on GDT: TimeZoneCode; GeoCoordinates where GeoCoordinates is the geographical data, that is, the longitude and latitude specifications of the location. It may be based on GDT: GeoCoordinates; and BusinessPartnerAddressUUID which denotes which address of the BusinessPartner is referenced. It may be based on GDT: UUID. Inbound Association Relationships, from the business object BusinessPartner/AddressInformation node, which have the attribute AssignedBusinessPartnerAddress (c:c), which can be BusinessPartner's address to which the location is assigned.

Constraints may include a maximum of one of the following specifications existing: Address and Allocation of a business partner's address. If none of the above mentioned addresses was chosen, the Text Collection may have to be filled. Also, in case there is an association to a business partner via the node business partner, then one of the addresses of the business partner may have to be assigned to the node geographical information. In case the association to the business partner is deleted, or the location refers to another business partner, then the business partner address stored at the address node of Location may need to be invalidated. The following composition relationships to subordinate nodes are available: DO (Address 133024, 1:c) and DO (TextCollection 133026 1:c)(language-dependent).

DO: GeographicalInformationAddress

DO: GeographicalInformationAddress is the address of a location. DO: GeographicalInformationTextCollection is a piece of additional information on the geographical information for a location. TimeInformation contains information about the opening hours of a location. The exact meaning is dependent on the specialisation of the location. The elements located directly at the node TimeInformation are defined by the datatype: TimeInformationElements. These elements are: SiteRelevanceIndicator which denotes whether this Time Information is relevant for the site specialisation of the location. It may be based on GDT: Indicator, Qualifier: RelevanceIndicator; ServicePointRelevanceIndicator which denotes whether this time information is relevant for the service point specialisation of the location. It may be based on GDT: Indicator, Qualifier: RelevanceIndicator; ShipToRelevanceIndicator which denotes whether this time information is relevant for the ship to specialization of the location. It may be based on GDT: Indicator, Qualifier: RelevanceIndicator; ShipFromRelevanceIndicator which denotes whether this time information is relevant for the ship from specialisation of the location. It may be based on GDT: Indicator, Qualifier: RelevanceIndicator; and CalendarUUID which is a universal identifier, which can be unique, of a Calendar for a location. This calendar is generated by combining the working calendar code for a location with operating hours. CalendarUUID may be based on GDT: UUID. The following composition relationships to subordinate nodes exist: OperatingHours 133030 (1:c) and CalendarItem 133032 (1:cn).

Constraints may persist where TimeInformation is only valid for locations of type Site, ShipFromLocation, ShipToLocation and ServicePoint with the following meaning: TimeInformation at a Site denotes working hours at a Site and can contain its factory calendar, TimeInformation at a ServicePoint denotes at which time services can be delivered to a Location, TimeInformation at a ShipToLocation denotes at which times goods can be shipped to a Location and TimeInformation at a ShipFromLocation denotes at which time good can be picked up from a Location. Similarly, the aforementioned specializations can refer to the same TimeInformation. A given location cannot have more than one time information for a given specialisation—for example, if the location has a specialisation of site, then only one time information can be relevant for the site specialisation i.e. one cannot have two records in the node TimeInformation where the site indicator is set to true. There is generally a consistency in the specialisation types at the root node and the specialisation indicators at this level. For example, one cannot have a scenario where a location is not a site but it has time information which may be relevant for the site.

ESI Actions include: GenerateTimeInformationCalendarItems, which can generate the TimeInformationCalendarItems for a specified time frame and may have the following attributes. Preconditions, which can be None; Changes to the object, where TimeInformationCalendarItems for the specified time-frame may be generated; Changes to other objects which can be None; Changes to the status which can be None; Parameters where the action elements may be defined by type IDT, LocationTimeInformationGenerateTimeInformationCalendarItemsActionElements. These are: InPastDuration which can denote the start of the time-frame for the generation and may be based on GDT: DAY_Duration and Qualifier: InPast) and InFutureDuration which can denote the end of the time-frame for the generation and may be based on GDT: DAY_Duration and Qualifier: InPast.

DO: TimeInformationOperatingHours are the operating hours of a location in a certain role. TimeInformationCalendarItem, a Location TimeInformation calendar item specifies a time-period given by two time points, which can describe an active period for the location. It may not be possible to have several time periods which overlap. The elements may be located directly at the node. TimeInformationCalendarItem are defined by the node data type: LocationTimeInformationCalendarItem Elements. These elements are: ActivePeriod and ActiveDuration. ActivePeriod, which can indicate the start and end timepoint for the calendar item generated, and may be based on GDT: TIMEZONEINDEPENDENT_DateTimePeriod and ActiveDuration, which can denote the active duration for the Location based on the active period start and end times, may be based on GDT: Duration, Qualifier: Productive.)

Business Object LogisticsArea

FIG. 134 illustrates an example LogisticsArea business object model 134006. Specifically, this model depicts interactions among various hierarchical components of the LogisticsArea, as well as external components that interact with the LogisticsArea (shown here as 134000 through 134004 and 134008 through 134022).

The Business Object LogisticsArea is a freely definable area within a location providing detailed physical and operational information required for storage and production. Logistics areas can be arranged in a hierarchy according to physical aspects or logistical functions. A logistics area can be a plant, warehouse, staging area, or storage area for example. The physical features are described by the physical aspects of a logistics area. It can include the position, dimensions, or entry/exit points of a location for example. The operational features may include the opening hours, factory calendar, and task granularity for a plant/warehouse. Several areas can be grouped based on their logistical functions. A logistical function could be a specific logistics activity such as picking. A functional grouping of physical locations can be a picking area which groups all physical locations where picking activities have to be performed. LogisticsArea is a part of the foundation layer and in some implementations does not belong to any process component. LogisticsArea comprises physical aspects (for example, dimensions and entry/exit points), hierarchical relationships which may enable the modeling of a logistics facility from a physical/functional perspective, and the data that is required for specific business processes (for example, storage and capacity information).

LogisticsArea (Root Node)

LogisticsArea 134026 (Root Node) is a freely definable area within a location providing detailed physical and operational information required for storage and production. It can specify whether an area is a physical area or a functional grouping of physical areas and may also contain all the information to uniquely identify a logistics area.

The elements located directly at the node LogisticsArea (Root) are defined by the node data type (NDT) LogisticsAreaElements. These elements can include UUID, an universal identifier, that can be unique, for the LogisticsArea and which may be based on GDT: UUID; ID, an identifier, which can be unique, for the LogisticsArea and based on GDT: LogisticsAreaID; InventoryManagedLocationID, the identifier based on GDT: LocationID, that may be unique for an inventory managed location; InventoryManagedLocationUUID, the universal identifier based on GDT: UUID, unique for an inventory managed location; SiteID, the identifier based on GDT: LocationID that may be unique for a site where the LogisticsArea is located; SiteUUID, the universal identifier based on GDT: UUID that may be unique for a site where the LogisticsArea is located; SystemAdministrativeData, based on GDT: SystemAdministrativeData, that is administrative data can be stored within the system. This data can contain the system users and time of change; TypeCode, a coded representation of the type of the LogisticsArea within a storage or production facility, based on GDT: LogisticsAreaTypeCode; Status, indicates the status of a LogisticsArea. The data type (IDT) LogisticsAreaStatus consists of a status variable, LifeCycleStatusCode. This status variable is used to give the lifecycle status of a LogisticsArea and is based on GDT: LogisticsAreaLifeCycleStatusCode; and LogisticsAreaKey, an alternative key of a LogisticsArea. The data type (IDT) LogisticsAreaKey consists of the following elements: LogisticsAreaID and SiteID, which is optional.

Inbound Aggregation Relationships may have the following attributes: from the business object Identity node Root (CreationIdentity, 1:cn), as an aggregation from Identity that may have created the LogisticsArea; from the business object Identity node Root (LastChangeIdentity, c:cn), an aggregation from the Identity that may have last changed the LogisticsArea; from the business object Location (specialization InventoryManagedLocation) (InventoryManagedLocation, c:cn), which can denote the inventory managed location within which the logistics area may be located and from the business object Location (specialization Site) (Site, c:cn), which can denote the site within which the logistics area may be located.

Associations for Navigation may have the following to the LogisticsArea (Root) node, ParentLogisticsArea 1:c, an association to the LogisticsArea which can be the Parent within the logistics area hierarchy, RootLogisticsArea, an association to the LogisticsArea which can be the Root of the Logistics area hierarchy and SubordinateLogisticsArea, an association to all the LogisticsArea's below the root. Also to business Object/Node LogisticsSourceAndDestinationDeterminationRule/Root, AssignedSourceDeterminationRules c:cn, an association that can fetch the rules for inventory retrieval. Similarly, to business Object/Node LogisticsSourceAndDestinationDeterminationRule/Root, AssignedDestinationDeterminationRules, c:cn, an association that can fetch the rules for inventory placement. LogisticsArea contains the following nodes: Description 134038 1:n, PhysicalAspects 134028 1:c, SubordinateLogisticsAreaAssignment 134024 1:cn, ResourceAssignment 134034 1:cn, DefaultSupplyAndOutputAreaAssignment 134036 1:c, StorageControl 134040 (DO) 1:c, ShippingLocationAssignment 134032 1:cn and OperationalAspects 134030 1:c. A LogisticsArea can be associated with either a LogisticsArea or a Location but not both together.

Enterprise Service Infrastructure Actions include the following: CollectiveOptimizeInventoryLevel, CreateSubordinateLogisticsAreas, CreateWithReference, Block (S&AM action), Activate (S&AM action), Unblock (S&AM action), Delete (S&AM action), FlagAsObsolete (S&AM action) and RevokeObsolescence (S&AM action).

CollectiveOptimizeInventoryLevel can optimize the inventory level of all storage locations which require a replenishment or clean up check. The Action first determines the storage locations which require a replenishment or clean up check by using the query QueryByInventoryLevelControlRequirement and then, for each previously determined storage location, it can trigger the instance action InventoryLevelOptimize. The collective Action CollectivelOptimizeInventoryLevel may then start the replenishment/cleanup process for numerous Logistics Areas. The instance Action OptimizedInventoryLevel may then start the replenishment/cleanup process for the specific Logistics Area. Changes to other objects is an action that can call the storage control DO action OptimizeInventoryLevel and in addition the storage control node instance InventoryLevelControlRequirement may the be updated or deleted and site logistic request may then be created. Action elements may be defined by the data type LogisticsAreaStorageControlCollectiveOptimizeInventoryLevelActionElements.

These elements can include the following: SiteUUID, which may be based on GDT: UUID; SiteID which may be based on GDT: LocationID; Inventory ManagedLocationUUID, which may be based on GDT: UUID; InventoryManagedLocationID, which may be based on GDT: LocationID; UUID, which may be based on GDT: UUID; ID, which may be based on GDT: LogisticsAreaID; TypeCode, which may be based on GDT: LogisticAreaTypeCode; MaterialUUID, which may be based on GDT: UUID; MaterialID, which may be based on GDT: ProductID; StorageControlInventoryLevelControlRequirementTypeCode, which may be based on GDT: InventoryLevelControlRequirementTypeCode; StorageControlInventoryLevelControlRequirementRequirementPriorityCode which may be based on GDT: PriorityCode; InventoryLevelControlRequirementLogisticUnitUUID, which may be based on GDT: UUID; StorageControlInventoryLevelControlRequirementLogisticUnitID, which may be based on GDT: LogisticUnitID; StorageControlInventoryLevelControlRequirementSystemAdministrativeData, which may be based on GDT: SystemAdministrativeData; StorageControl_BlockingStatusCode, which may be based on GDT: NOTBLOCKEDBLOCKED_BlockingStatusCode; StorageControl_PickingStatusCode, which may be based on GDT: NOTBLOCKEDBLOCKED_BlockingStatusCode; and StorageControl_PutawayStatusCode, which may be based on GDT: NOTBLOCKEDBLOCKED_BlockingStatusCode.

CreateSubordinateLogisticsAreas can create sub-ordinate logistics areas for the logistics area. The action elements can be defined by the data type LogisticsAreaCreateSubordinateLogisticsAreasActionElements. These elements can include the following: LogisticsAreaIDNumberingSchemaCode, which may be based on GDT: LogisticsAreaIDNumberingSchemaCode, and can define rules for generation of LogisticsAreaID; LogisticsAreaTypeCode, which may be based on GDT: LogisticsAreaTypeCode, which can specify the type of the sub-ordinate logistics areas to be created; ReferenceLogisticsAreaID, which may be based on GDT: LogisticsAreaID; SiteID, which may be based on GDT: LocationID; SiteUUID, which may be based on GDT: UUID; FromLogisticsAreaID, which may be based on GDT: LogisticsAreaID with the Qualifier: From, and can specify the start value of the Subordinate LogisticsAreaID to be created; ToLogisticsAreaID, which may be based on GDT: LogisticsAreaID with the Qualifier: To, and can specify the end value of the Subordinate LogisticsAreaID to be created; Usage, this action might be used by the Mass Data Run Object or directly by the UI; Changes to other Objects, where new logistics areas are created; and Changes to the Object, with creation of new LayoutViewAssignments which assign the newly created logistics areas to the current logistics area.

CreateWithReference, where the LogisticsArea along with all its attributes may be copied can have the following attributes: a pre-condition where the instance of the BO may exist; a changes to another object where a new LogisticsArea may be created with the copied attributes; Block (S&AM action) is an action that can block an active LogisticsArea and can have the following attributes: Preconditions which may be called if the LogisticsArea is not flagged for deletion, it can be active, and it may not be blocked; Changes to the status where the status of the LogisticsArea may be set to “Blocked”. Activate (S&AM action) is an action that can activate a LogisticsArea. It may have the following attributes: Preconditions: The LogisticsArea may have the status “In Preparation”; Changes to the status where when the action is executed, a consistency check may be carried out for the LogisticsArea. The LogisticsArea may be activated if it is consistent.

Unblock (S&AM action) is an action that can unblock a LogisticsArea. It can have the following attributes: Preconditions where the LogisticsArea may have the status “Blocked”; Changes to the status where the LogisticsArea may be set to “Active” status. Delete (S&AM action) is an action that can delete a LogisticsArea and can have the following attributes: Preconditions, where the LogisticsArea may be in “In Preparation” state; Changes to the object where the LogisticsArea may be deleted; FlagAsObsolete (S&AM action) is an action that can mark a LogisticsArea as obsolete. It may have the following attributes: Preconditions where the LogisticsArea may not be used in any processes; Changes to the status where the LogisticsArea may have the status “Obsolete”. RevokeObsolescence (S&AM action) is an action that can revoke the obsolescence for a LogisticsArea and set it as active. It can have the following attributes: Preconditions: The LogisticsArea may have the status “Obsolete”; Changes to the object can be None; Changes to other objects can be None and Changes to the status where the LogisticsArea may have the status “Active”.

Queries can be subdivided into the following categories: QueryByElements, QueryByDesignatedMaterial, QueryByStorageConstraints, QueryByDesignatedLogisticsArea, QueryInventoryManagedSubordinateLogisticsAreaByLogisticsArea and QueryTopLogisticsAreaByInventoryManagedLocation.

QueryByElements can contain a list of all relevant parameters which can be used to search for logistics areas. It returns a list of all LogisticsAreas which may satisfy the selection criteria. The query elements are defined by the data type LogisticsAreaElementsQueryElements. These elements can include ID, UUID, SiteID, SiteUUID, TypeCode, Status, InventoryManagedLocationID, InventoryManagedLocationUUID and SystemAdministrativeData. ID may be based on GDT: LogisticsAreaID. UUID may be based on GDT: UUID. SiteID may be based on GDT: LocationID. SiteUUID may be based on GDT: UUID. TypeCode may be based on GDT: LogisticsAreaTypeCode. Status may be based on IDT: LogisticsAreaStatus. InventoryManagedLocationID may be based on GDT: LocationID. InventoryManagedLocationUUID may be based on GDT: UUID. SystemAdministrativeData may be based on GDT: SystemAdministrativeData.

QueryByDesignatedMaterial can return a list of logistics areas, which are the fixed bins for the given inventory items, taking into account all constraints (status, allowed logistic units, allowed materials etc.). The query elements are defined by the data type LogisticsAreaDesignatedInventoryItemQueryElements. These elements can include InventoryManagedLocationUUID, InventoryManagedLocationID, UUID, ID, SiteID, SiteUUID, TypeCode, Status, Material_UUID, Material_ID, StorageControlStorageBehaviourMethodInventoryItemConstraintAllowedLogisticUnitUUID, StorageControlStorageBehaviourMethodInventoryItemConstraintAllowed LogisticUnitID, StorageControlInventoryManagedIndicator, StorageControlStorageBehaviourMethodLocationLogisticsUsageCode, StorageControl_BlockingStatusCode, StorageControl_PickingStatusCode and StorageControl_PutawayStatusCode.

For InventoryManagedLocationUUID, which may be based on GDT: UUID, the Query can return logistics areas that are part of the sub hierarchy defined by the given LocationUUID. For InventoryManagedLocationID, which may be based on GDT: LocationID, the Query can return logistics areas that are part of the sub hierarchy defined by the given LocationID. For UUID, which may be based on GDT: UUID, the Query can return logistics areas that are part of the sub hierarchy defined by the given LogisticsAreaUUID. For ID, which may be based on GDT: LogisticsAreaID, the Query can return logistics areas that are part of the sub hierarchy defined by the given LogisticsAreaID. For SiteID, which may be based on GDT: LocationID, the Query can return logistics areas that are part of the sub hierarchy defined by the given SiteID. For SiteUUID, which may be based on GDT: UUID, the Query can return logistics areas that are part of the sub hierarchy defined by the given SiteUUID. For TypeCode, which may be based on GDT: LogisticAreaTypeCode, the Query can return logistics areas that match the given type. Status may be based on IDT: LogisticsAreaStatus Material_UUID, which may be based on GDT: UUID. The Query can return logistics areas where the MaterialUUID of the DesignatedMaterial node in the StorageControl DO match the given MaterialUUID, and where the Material Category of the given material is allowed according to the InventoryItemConstraint node in the StorageBehaviourMethod For Material_ID, which may be based on GDT: ProductID, the Query can return logistics areas where the MaterialID of the DesignatedMaterial node in the StorageControl DO match the given MaterialID, and where the Material Category of the given material is allowed according to the InventoryItemConstraint node in the StorageBehaviourMethod. For StorageControlStorageBehaviourMethodInventoryItemConstraintAllowedLogisticUnitUUID, which may be based on GDT: UUID, the Query can return logistics areas where the LogisticUnitUUID of the DesignatedMaterial node in the StorageControl DO matches the given LogisticUnitUUID. It excludes logistics areas for which the logistic unit or group of the given logistic unit are not allowed to be stored according to the LogisticUnitConstraints node or the LogisticUnitGroupConstraints node respectively, which are part of StorageBehaviourMethod BO. For StorageControlStorageBehaviourMethodInventoryItemConstraintAllowedLogisticUnitID, which may be based on GDT: LogisticUnitID, the Query can return logistics areas where the LogisticUnitID of the DesignatedMaterial node in the StorageControl DO matches the given LogisticUnitID. It excludes logistics areas for which the logistic unit or group of the given logistic unit are not allowed to be stored according to the LogisticUnitConstraints node or the LogisticUnitGroupConstraints node respectively, which are part of StorageBehaviourMethod BO. For StorageControlInventoryManagedIndicator, which may be based on GDT: InventoryManagedIndicator, the Query can return logistics areas where the InventoryManagedIndicator of the StorageControl DO matches at least one of the given InventoryManagedIndicator. StorageControlStorageBehaviourMethodLocationLogisticsUsageCode may be based on GDT: LocationLogisticsUsageCode. For StorageControl_BlockingStatusCode, which may be based on GDT: NOTBLOCKEDBLOCKED_BlockingStatusCode, the Query can return logistics areas where the BlockingStatusCode of the StorageControl DO matches at least one of the given BlockingStatuses. For StorageControl_PickingStatusCode, which may be based on GDT: NOTBLOCKEDBLOCKED_BlockingStatusCode, the Query can return logistics areas where the PickingStatusCode of the StorageControl DO matches at least one of the given Statuses. For StorageControl_PutawayStatusCode, which may be based on GDT: NOTBLOCKEDBLOCKED_BlockingStatusCode, the Query can return logistics areas where the PutawayStatusCode of the StorageControl DO matches at least one of the given Statuses.

A QueryByStorageConstraints query can return a list of logistics areas based on the storage constraints like status, allowed materials etc. defined in the StorageControl and StorageBehaviourMethod. The query elements can be defined by the data type LogisticsAreaStorageConstraintsQueryElements. These elements can include the following: InventoryManagedLocationUUID, InventoryManagedLocationID, UUID, ID, SiteID, SiteUUID, TypeCode, Status, Material_UUID, Material_ID, StorageControlStorageBehaviourMethodInventoryItemConstraintAllowedLogisticUnitUUID, StorageControlStorageBehaviourMethodInventoryItemConstraintAllowedLogisticUnitID, StorageControlInventoryManagedIndicator, StorageControlStorageBehaviourMethodLocationLogisticsUsageCode, StorageControl_BlockingStatusCode, StorageControl_PickingStatusCode and StorageControl_PutawayStatusCode.

For InventoryManagedLocationUUID, which may be based on GDT: UUID, the Query may return logistics areas that are part of the sub hierarchy defined by the given LocationUUID. For InventoryManagedLocationID, which may be based on GDT: LocationID, the Query may return logistics areas that are part of the sub hierarchy defined by the given LocationID. For UUID, which may be based on GDT: UUID, the Query may return logistics areas that are part of the sub hierarchy defined by the given LogisticsAreaUUID. For ID, which may be based on GDT: LogisticsAreaID, the Query may return logistics areas that are part of the sub hierarchy defined by the given LogisticsAreaID. For SiteID, which may be based on GDT: LocationID, the Query can return logistics areas that are part of the sub hierarchy defined by the given SiteID. For SiteUUID, which may be based on GDT: UUID, the Query can return logistics areas that are part of the sub hierarchy defined by the given SiteUUID. For TypeCode, which may be based on GDT: LogisticAreaTypeCode, the Query can return logistics areas that match the given type. Status may be based on IDT: LogisticsAreaStatus.

For Material_UUID, which may be based on GDT: UUID, the Query can return logistics areas where the MaterialUUID of the DesignatedMaterial node in the StorageControl DO match the given MaterialUUID, and where the Material Category of the given material is allowed according to the InventoryItemConstraint node in the StorageBehaviourMethod. For Material_ID, which may be based on GDT: ProductID, the Query can return logistics areas where the MaterialID of the DesignatedMaterial node in the StorageControl DO match the given MaterialID, and where the Material Category of the given material is allowed according to the InventoryItemConstraint node in the StorageBehaviourMethod. StorageControlStorageBehaviourMethodInventoryItemConstraintAllowedLogisticUnitUUID may be based on GDT: UUID. StorageControlStorageBehaviourMethodInventoryItemConstraintAllowedLogisticUnitID may be based on GDT: LogisticUnitID. For StorageControlInventoryManagedIndicator, which may be based on GDT: InventoryManagedIndicator, the Query may return logistics areas where the InventoryManagedIndicator of the StorageControl DO matghes at least one of the given InventoryManagedIndicator. StorageControlStorageBehaviourMethodLocationLogisticsUsageCode, may be based on GDT: LocationLogisticsUsageCode. For StorageControl_BlockingStatusCode, which may be based on GDT: NOTBLOCKEDBLOCKED_BlockingStatusCode, the Query may return logistics areas where the BlockingStatusCode of the StorageControl DO matches at least one of the given BlockingStatuses. For StorageControl_PickingStatusCode, which may be based on GDT: NOTBLOCKEDBLOCKED_BlockingStatusCode, the Query may return logistics areas where the PickingStatusCode of the StorageControl DO matches at least one of the given Statuses. For StorageControl_PutawayStatusCode, which may be based on GDT: NOTBLOCKEDBLOCKED_BlockingStatusCode, the Query may return logistics areas where the PutawayStatusCode of the StorageControl DO matches at least one of the given Statuses.

A QueryByDesignatedLogisticsArea query returns one logistics area which is inventory managed and may be the lowest logistics area in the hierarchy that appears above the given logistics area. The query elements are defined by the data type LogisticsAreaInventoryManagedQueryElements. These elements can include the following elements: UUID, ID, SiteID, SiteUUID, Inventory ManagedLocationUUID, InventoryManagedLocationID and Status. UUID may be based on GDT: UUID and this query can return one logistics area which appears above the given logistics area. ID may be based on GDT: LogisticsAreaID and this query can return one logistics area which appears above the given logistics area. SiteID may be based on GDT: LocationID and the Query can return logistics areas that are part of the sub hierarchy defined by the given SiteID. SiteUUID may be based on GDT: UUID and the Query can return logistics areas that are part of the sub hierarchy defined by the given SiteUUID. Inventory ManagedLocationUUID may be based on GDT: UUID. InventoryManagedLocationID may be based on GDT: LocationID. Status may be based on IDT: LogisticsAreaStatus.

QueryInventoryManagedSubordinateLogisticsAreaByLogisticsArea query can return a list of inventory managed logistics areas which are below the Logistics Areas passed as input parameters to this query. If the input LogisticsArea is inventory managed then this itself is returned as the result. The query elements can be defined by the data type LogisticsAreaInventoryManagedSubordinateLogisticsAreaByLogisticsAreaQueryElements. These elements can include the following: ID, UUID, SiteID, SiteUUID, InventoryManagedLocationUUID, InventoryManagedLocationID and Status. ID may be based on GDT: LogisticsAreaID. UUID may be based on GDT: UUID. SiteID may be based on GDT: LocationID and the Query can return logistics areas that are part of the sub hierarchy defined by the given SiteID. SiteUUID may be based on GDT: UUID and the Query can return logistics areas that are part of the sub hierarchy defined by the given SiteUUID. InventoryManagedLocationUUID may be based on GDT: UUID and is optional. InventoryManagedLocationID may be based on GDT: LocationID. Status may be based on IDT: LogisticsAreaStatus.

QueryTopLogisticsAreaByInventoryManagedLocation query can return a list of logistics areas which are assigned directly to the InventoryManagedLocation, which is passed as input parameters to this query. The query elements can be defined by the data type LogisticsAreaTopLogisticsAreaByInventoryManagedLocationQueryElements. These elements can include the following: Inventory ManagedLocationUUID, InventoryManagedLocationID, SiteID, SiteUUID and Status. Inventory ManagedLocationUUID may be based on GDT: UUID, and is optional. InventoryManagedLocationID may be based on GDT: LocationID. SiteID maybe based on GDT: LocationID and the Query can return logistics areas that are part of the sub hierarchy defined by the given SiteID. SiteUUID may be based on GDT: UUID and the Query can return logistics areas that are part of the sub hierarchy defined by the given SiteUUID. Status may be based on IDT: LogisticsAreaStatus.

Description

Description is a natural-language short text with additional information on a logistics area. The elements located directly at the node Description can be defined by the NDT: LogisticsAreaDescriptionElements. These elements may include Description, which is a Language dependent description of the LogisticsArea, and may be based on GDT: _SHORT_Description.

PhysicalAspects

PhysicalAspects is a grouping of all physical features of a LogisticsArea necessary for storage and production. The physical features may be the physical dimensions, position and coordinates of the entry and exit points of a warehouse, that are used to calculate the shortest route to be taken by the logistic activities such as picking and put away. The elements located directly at the node PhysicalAspects are defined by the NDT: LogisticsAreaPhysicalAspectElements. These elements are: LengthMeasure, WidthMeasure, HeightMeasure, RelativePositionCoordinates, EntryRelativePositionCoordinates and ExitRelativePositionCoordinates.

LengthMeasure describes the length dimension of the LogisticsArea and may be based on GDT: Measure. WidthMeasure describes the width dimension of the LogisticsArea and may be based on GDT: Measure. HeightMeasure describes the height dimension of the LogisticsArea and may be based on GDT: Measure. RelativePositionCoordinates specifies the relative position of the LogisticsArea within a storage or production facility in terms of Cartesian co-ordinates and may be based on GDT: CartesianCoordinates with the Qualifier: RelativePosition. EntryRelativePositionCoordinates specifies the entry point into the LogisticsArea in terms of Cartesian co-ordinates and may be based on GDT: CartesianCoordinates, with the Qualifier: RelativePosition. ExitRelativePositionCoordinates specifies the exit point from the LogisticsArea in terms of Cartesian co-ordinates and may be based on GDT: CartesianCoordinates with the Qualifier: RelativePosition. In some implementations, the CartesianCoordinates needs to be specified according to a chosen origin (0, 0, 0) for every storage or production facility.

SubordinateLogisticsAreaAssignment

SubordinateLogisticsAreaAssignment is an assignment of a sub-ordinate logistics area to the logistics area. The elements located directly at the node SubordinateLogisticsAreaAssignment can be defined by the NDT: LogisticsAreaSubordinateLogisticsAreaAssignmentElements. These elements can include: SubordinateLogisticsAreaID, SubordinateLogisticsAreaUUID and SubordinateLogisticsAreaTypeCode. SubordinateLogisticsAreaID is the identifier of the subordinate LogisticsArea, may be unique and is based on GDT: LogisticsAreaID. SubordinateLogisticsAreaUUID is the identifier of the subordinate LogisticsArea, may be unique and is based on GDT: UUID. SubordinateLogisticsAreaTypeCode is a type of the subordinate Logistics Area and may be based on GDT: LogisticsAreaTypeCode. Inbound Aggregation Relationships from the LogisticsArea (Root) node can be identified as LogisticsArea 1:c and may be an aggregation from the subordinate logisitics area.

ESI Actions include the action DeleteSubordinateLogisticsAreaAssignment, which can be used to delete the assignments to the subordinate logistics areas. Changes to the object can occur because SubordinateLogisticsAreaAssignments may be deleted.

ResourceAssignment

ResourceAssignment is an assignment of a resource to the logistics area. The elements located directly at the node ResourceAssignment are defined by the NDT: LogisticsAreaResourceAssignmentElements. These elements can include: ResourceID and ResourceUUID. ResourceID is the identifier of the Resource located at the LogisticsArea, may be unique and is based on GDT: ResourceID. ResourceUUID is a universal identifier of the Resource located at the LogisticsArea, may be unique and is based on GDT: UUID. ResourceTypeCode is a type of the Resource located at the LogisticsArea and is based on GDT: ResourceTypeCode. Inbound Aggregation Relationships from the business object Resource/node Root can be identified as Resource 1:c. An aggregation from the Resource located at the LogisticsArea.

DefaultSupplyAndOutputAreaAssignment

DefaultSupplyAndOutputAreaAssignment is the assignment of a default supply area and a default output area for the LogisticsArea. A supply area is a logistics area where materials and tools are stored and can be directly withdrawn for production. An output area is a logistics area where materials that were produced in the production process are stored or where tools that were used in the production process are stored. A supply/output area is specific storage area within a site and is not related to the business object SupplyPlanningArea. The elements located directly at the node DefaultSupplyAndOutputAreaAssignment are defined by the NDT: LogisticsAreaDefaultSupplyAndOutputAreaAssignmentElements. These elements can include: SupplyAreaSiteUUID, SupplyAreaSiteID, SupplyLogisticsAreaID, SupplyLogisticsAreaUUID, SupplyLogisticsAreaTypeCode, OutputAreaSiteUUID, OutputAreaSiteID, OutputLogisticsAreaID, OutputLogisticsAreaUUID and OutputLogisticsAreaTypeCode.

SupplyAreaSiteUUID may be based on GDT: UUID. SupplyAreaSiteID may be based on GDT: LocationID. SupplyLogisticsAreaID is an identifier of the LogisticsArea which is the supply area. It can be unique and be based on GDT: LogisticsAreaID. SupplyLogisticsAreaUUID is a universal identifier of the LogisticsArea which is the supply area. It can be unique and be based on GDT: UUID. SupplyLogisticsAreaTypeCode is a type of LogisticsArea which is the supply area and may be based on GDT: LogisticsAreaTypeCode. OutputAreaSiteUUID may be based on GDT: UUID. OutputAreaSiteID may be based on GDT: LocationID. OutputLogisticsAreaID is an identifier of a LogisticsArea which is the output area, may be unique and may be based on GDT: ResourceID. OutputLogisticsAreaUUID is a universal identifier of the LogisticsArea which is the output area, may be unique and be based on GDT: UUID. OutputLogisticsAreaTypeCode is a type of LogisticsArea which is the output area and may be based on GDT: LogisticsAreaTypeCode. Inbound Aggregation Relationships from the business object LogisticsArea may be identified as: SupplyAreaLogisticsArea c:cn, which can denote the logistics area that is used as supply area; OutputAreaLogisticsArea c:cn, which can denote the logistics area that is used as output area.

StorageControl (DO)

StorageControl is a grouping of all attributes of a logistics area relevant for the storage of goods. The storage rules would be defined as a part of the business configuration. Examples for storage control attributes could be: Product mixing (allowed/not allowed) and Perishable goods can be stored. The structure of this node is provided by the DO StorageControl. Inbound Association Relationships can be None and Compositions, None.

ShippingLocationAssignment

A ShippingLocationAssignment is the assignment of a ShipFromLocation and/or ShipToLocation to a logistics area for logistics execution purposes. Inbound Aggregation Relationships from the business object Location/node Location (Root) may be identified as ShipToLocation c:cn, which may denote the ShipToLocation that can be used for logistics execution purposes; ShipFromLocation c:cn, which may denote the ShipFromLocation that can be used for logistics execution purposes. ShippingLocationAssignments can be maintained at each logistics area level or these values can be inherited based on the physical layout hierarchy assignment. The elements located directly at the node ShippingLocationAssignment can be defined by the NDT: LogisticsAreaShippingLocationAssignmentElements. These elements can include: ShipFromLocationIndicator, ShipFromIndicator, ShipToIndicator and LocationUUID.

ShipFromLocationIndicator can indicate an assigned ShipFromLocation and may be based on GDT: Indicator with the Qualifier: ShipFromIndicator. ShipToLocationIndicator can indicate an assigned ShipToLocation and may be based on GDT: Indicator with the Qualifier: ShipToIndicator. LocationID is a unique identifier for a Location and may be based on GDT: LocationID. LocationUUID is the universal identifier for a Location. It may be unique and based on GDT: UUID. The projections ShipFromLocation and ShipToLocations of the BO Location may be assigned to this node. In some implementations, at least one of the indicators ShipFromLocationIIndicator or the ShipToLocationIndicator may be set.

OperationalAspects

OperationalAspects is a grouping of all operational features of a logistic area. The operational features include the opening hours, factory calendar, and task granularity for a plant/warehouse. The elements located directly at the node OperationalAspects are defined by the NDT: LogisticsAreaOperationalAspectsElements. These elements are: WorkingDayCalendarCode and DefaultTravelSequenceOrdinalNumberValue. WorkingDayCalendarCode is a coded representation of the factory calendar that is relevant for the logistics area. It may be based on GDT: WorkingDayCalendarCode. DefaultTravelSequenceOrdinalNumberValue can specify the sequence for accessing the LogisticsArea within a storage or production facility for picking and put-away purposes and may be based on GDT: OrdinalNumberValue.

Business Object LogisticsShift

FIG. 135 illustrates an example LogisticsShift business object model 135002. Specifically, this model depicts interactions among various hierarchical components of the LogisticsShift, as well as external components that interact with the LogisticsShift (shown here as 135000 and 135004).

Business Object LogisticsShift is a period of working time (called shift) in supply chain processes such as production, warehousing, and transportation that can be interrupted by breaks. The business object LogisticsShift can be part of the process component Foundation. LogisticsShift can span over two consecutive days and can last up to a maximum of 24 hours. Such shifts can start or end on non working days. Examples can include: 1) In a manufacturing plant, a morning shift starts at 8:00 a.m. and ends at 4:00 p.m. with a 15 minute break every 2 hours. 2) A late night shift starts at 10:00 p.m. and ends at 6:00 a.m. the following day. LogisticsShift can be represented by the node LogisticsShift.

Node Structure of Business Object LogisticsShift

Node Structure of Business Object LogisticsShift 135006 can be defined as the working time as a period given as start and end time of the day. Relationships to relative break programs may be allowed inside a shift. The elements located directly at the node LogisticsShift may be defined by the data type LogisticsShiftElements. These elements can include UUID, ID, ShiftWeightingFactorValue, UnscheduledBreakDuration, TimePeriod and RelativeBreakProgrammeUUID. UUID is a universal identifier, which can be unique, of a LogisticsShift. UUID may be based on GDT: UUID. ID is an identifier, which can be unique, of a LogisticsShift. ID may be based on GDT: LogisticsShiftID. ShiftWeightingFactorValue may specify a value to scale the length of a shift by a weight, and is optional. The WeightingFactorValue can be used to scale a shift up or down, in order to indicate the rate at which it is being utilized. ShiftWeightingFactorValue may be based on GDT: WeightingFactorValue. UnscheduledBreakDuration may specify the time that would be spent in this Shift as an unscheduled break, and is optional. If the UnscheduledBreakDuration exceeds the duration of a shift, the effective duration of the shift may be set to 0. Negative effective durations may not be supported. The effective duration of a shift may be calculated by weighting the duration of a shift's time period with ShiftWeightingFactorValue and subtracting the unscheduled break duration. UnscheduledBreakDuration may be based on GDT: TIME_Duration. TimePeriod may specify the start time and the end time of the Shift as a time period. TimePeriod may be based on GDT: UPPEROPEN_TimePeriod. RelativeBreakProgrammeUUID is an universal identifier, which can be unique, of a LogisticsBreakProgramme, and is optional. A set of relative breaks can be associated to a LogisticsShift via the BO LogisticsBreakProgramme (association). RelativeBreakProgrammeUUID may be based on GDT: UUID.

A number of composition relationships to subordinate nodes may exist, such as Description 135008 (1:cn). Inbound Association Relationship may relate: from business object LogisticsBreakProgramme/Root node, LogisticsBreakProgramme c:cn, as the LogisticsBreakProgramme, which will be applied in this shift. Queries can include QueryByID, which may provide a list of all LogisticsShifts for the given IDs. The query elements can be defined by the data type LogisticsShiftIDQueryElements. The included elements may include ID, which may be based on GDT: LogisticsShiftID.

Description

Description is a natural-language short text with additional information on a logistics shift. The elements located directly at the node Description may be defined by the data type: LogisticsShiftDescriptionElements. The included elements may include Description, which can be a language dependent description of the LogisticsShift, which may be based on GDT: _SHORT_Description.

Business Object LogisticUnit

FIG. 136 illustrates an example LogisticUnit business object model 136006. Specifically, this model depicts interactions among various hierarchical components of the LogisticUnit, as well as external components that interact with the LogisticUnit (shown here as 136000 through 136004 and 136008 through 136018).

Business Object LogisticUnit is an item established for logistics operations, such as storage, movement, and packing. A LogisticUnit may represent all physical units handled in the same manner during logistic operations, whether they are packed or unpacked goods. Examples include high pallet, liter milk carton. The business object LogisticUnit can be located in the foundation layer of the application platform, and in some implementations is not part of any process component. The business object LogisticUnit may contain LogisticUnit, which can contain information regarding physical limitations, and packaging; GroupAssignment, which can contain information regarding the groups to which the LogisticUnit is assigned, for various logistics usages; and StandardMaterialContent, which can contain information regarding the materials that can be packed into the LogisticUnit, as well as their units of measure, for standard packing. LogisticUnit may be represented by the root node LogisticUnit.

Node Structure of Business Object LogisticUnit

Node Structure of Business Object LogisticUnit 136020 (Root) refers to the information on an item of any composition which is used for storage, movement, and packing. This information includes physical measurement limitations, packaging data, and other logistics-related attributes. A standard LogisticUnit may refer to a LogisticUnit that contains uniform content based on StandardMaterialContent. Standard packing is performed based on a standard LogisticUnit. Standard packing can optionally utilize the default packaging material that can be defined for the LogisticUnit at the root node level. The elements located directly at the root node LogisticUnit can be defined by the type GDT: LogisticUnitElements.

These elements can include ID, UUID, SystemAdministrativeData, UniformMaterialRequiredIndicator, StandardContentRequiredIndicator, ProductCategoryUUID, ProductCategoryInternalID, ProductCategoryHeirarchyID, RemainderLogisticUnitUUID, RemainderLogisticUnitID, DefaultPackagingMaterial, Weight, Volume, Dimensions, Stackability and Status.

ID is a universal identifier, which can be unique, of the LogisticUnit for referencing purposes. ID may be based on GDT: LogisticUnitID. UUID is a universal identifier, which can be unique, of the LogisticUnit for referencing purposes. UUID may be based on GDT: UUID. SystemAdministrativeData refers to Administrative data that can be stored in a system. This data can include system users and change dates/times. SystemAdministrativeData may be based on GDT: SystemAdministrativeData. UniformMaterialRequiredIndicator indicates that uniform material may be required for packing.

Uniform material may refer to a non-mixed material content. UniformMaterialRequiredIndicator may be based on GDT: Indicator Qualifier: Required, and Secondary qualifier: UniformMaterial. StandardContentRequiredIndicator indicates that standard content can be required for packing. The standard content can be defined in the node StandardMaterialContent. StandardContentRequiredIndicator may be based on GDT: Indicator, Qualifier: Required, and Secondary qualifier: StandardContent. ProductCategoryUUID is a universal identifier, which can be unique, of the product category that represents the nature of the content of the LogisticUnit; for example, hazardous, fragile, and is optional. ProductCategoryUUID may be based on GDT: UUID.

In the same context as above, ProductCategoryInternalID is an identifier of the product category that represents the nature of the content of the LogisticUnit; for example, hazardous, fragile. ProductCategoryInternalID may be based on GDT: ProductCategoryInternalID. ProductCategoryHierarchyID is an identifier, which can be unique of the product category hierarchy which the product category can belong to, and is optional. ProductCategoryHierarchyID may be based on GDT: ProductCategoryHeirarchyID. RemainderLogisticUnitUUID is a universal identifier, which can be unique, of the LogisticUnit, which is assigned in order to reference the default LogisticUnit that is used for packing a partial quantity, which may remain after a LogisticUnit has been filled with its standard material content. RemainderLogisticUnitUUID may be based on GDT: UUID. RemainderLogisticUnitID is an identifier, which can be unique, of the LogisticUnit, which is assigned in order to specify the default LogisticUnit that can be used for packing a partial quantity, which may remain after a LogisticUnit has been filled with its standard material content, and is optional. RemainderLogisticUnitID may be based on GDT: LogisticUnitID. DefaultPackagingMaterial is a default packaging material that can be utilized for packing, and is optional. DefaultPackagingMaterial may be based on IDT: LogisticUnitDefaultPackagingMaterial and can have the following attributes: UUID, MeasureUnitCode, QuantityTypeCode and ID. UUID is an identifier, which can be unique, of the default packaging material. UUID may be based on GDT: UUID. MeasureUnitCode is the measure unit of the default packaging material, and is optional. MeasureUnitCode may be based on GDT: MeasureUnitCode. QuantityTypeCode is the quantity type of the default packaging material, and is optional. QuantityTypeCode may be based on GDT: QuantityTypeCode. ID is an identifier, which can be unique, of the default packaging material, and is optional. ID may be based on GDT: ProductID.

As a continuation of GDT LogisticUnitElements, Weight is the weight of the LogisticUnit, and is optional. Weight can include the average and maximum weight and may be based on IDT: LogisticUnitWeight. MeasureUnitCode is the measure unit of the LogisticUnit's weight attributes and may be based on GDT: MeasureUnitCode. MeasureTypeCode is the measure type of the LogisticUnit's weight attributes, and is optional. MeasureTypeCode may be based on GDT: MeasureTypeCode. AverageWeightMeasure is the average weight of the LogisticUnit, and is optional. AverageWeightMeasure may be based on GDT: Measure and Qualifier: AverageWeight. MaximumWeightMeasure is the maximum weight of the LogisticUnit, and is optional. MaximumWeightMeasure may be based on GDT: Measure and Qualifier: MaximumWeight. Volume is the volume of the LogisticUnit, includes the average and maximum volume, and is optional. Volume may be based on IDT: LogisticUnitVolume. MeasureUnitCode is the measure unit of the volume attributes of the LogisticUnit and may be based on GDT: MeasureUnitCode. MeasureTypeCode is the measure type of the volume attributes of the LogisticUnit, and is optional. MeasureTypeCode may be based on GDT: MeasureTypeCode. AverageVolumeMeasure is the average volume of the LogisticUnit, and is optional. AverageVolumeMeasure may be based on GDT: Measure, and Qualifier: AverageVolume. MaximumVolumeMeasure is the maximum volume of the LogisticUnit, and is optional. MaximumVolumeMeasure may be based on GDT: Measure and Qualifier: MaximumVolume.

In addition to GDT LogisticUnitElements, Dimensions can refer to the physical dimensions of the LogisticUnit, and is optional. Dimensions can include the average and maximum height, width and length and may be based on IDT: LogisticUnitDimensions. MeasureUnitCode is the measure unit of the dimensions attributes of the LogisticUnit and may be based on GDT: MeasureUnitCode. MeasureTypeCode is the measure type of the dimensions attributes of the LogisticUnit, and is optional. MeasureTypeCode may be based on GDT: MeasureTypeCode. AverageHeightMeasure is the average height of the LogisticUnit, and is optional. AverageHeightMeasure may be based on GDT: Measure, Qualifier: AverageHeight. MaximumHeightMeasure is the maximum height of the LogisticUnit, and is optional. MaximumHeightMeasure may be based on GDT: Measure and Qualifier: MaximumHeight. AverageWidthMeasure is the average width of the LogisticUnit, and is optional. AverageWidthMeasure may be based on GDT: Measure and Qualifier: AverageWidth. MaximumWidthMeasure is the maximum width of the LogisticUnit, and is optional. MaximumWidthMeasure may be based on GDT: Measure, Qualifier: MaximumWidth. AverageLengthMeasure is the average length of the LogisticUnit, and is optional. AverageLengthMeasure may be based on GDT: Measure and Qualifier: AverageLength. MaximumLengthMeasure is the maximum length of the LogisticUnit, and is optional. MaximumLengthMeasure may be based on GDT: Measure and Qualifier: MaximumLength.

In addition to GDT LogisticUnitElements, Stackability can refer to the stackability of the LogisticUnit, which may include the quantity of stackable LogisticUnits and the stackable weight, and is optional. Stackability may be based on IDT: LogisticUnitStackability. LogisticUnitQuantity is the quantity of the stackable LogisticUnits that can be stacked on the LogisticUnit, and is optional. LogisticUnitQuantity may be based on GDT: Quantity. LogisticUnitQuantityTypeCode is the quantity type of the stackable LogisticUnits that can be stacked on the LogisticUnit, and is optional. LogisticUnitQuantityTypeCode may be based on GDT: QuantityTypeCode. WeightMeasure is the weight that can be stacked on the LogisticUnit, and is optional. WeightMeasure may be based on GDT: Measure and Qualifier: Weight. WeightMeasureTypeCode is the measure type of the weight that can be stacked on the LogisticUnit, and is optional. WeightMeasureTypeCode may be based on GDT: Measure and Qualifier: Weight. Status can contain the status variable that describes the current state of a LogisticUnit and may be based on IDT: LogisticUnitStatus. LogisticUnitLifecycleStatusCode is a code that describes the lifecycle state of a LogisticUnit and may be based on GDT: LogisticUnitLifecycleStatusCode.

A number of composition relationships to subordinate nodes can exist, such as GroupAssignment 136020 1:cn; StandardMaterialContent 136026 1:cn; Description 136028 1:cn and TextCollection 136030 (DO) 1:c. Inbound Association Relationships may relate: from the business object Identity/node Root, CreationIdentity 1:cn, as it denotes the user that created the LogisticUnit and LastChangeIdentity c:cn, as it denotes the user that last changed the LogisticUnit; from the Product's projection business object Material/node Root, PackagingMaterial c:cn, as it denotes the default packaging material that is used for packing a LogisticUnit; from the business object ProductCategoryHierarchy/node ProductCategory, ProductCategory c:cn, as it denotes the product category that is assigned to a LogisticUnit; and from the business object LogisticUnit/node LogisticUnit; RemainderLogisticUnit c:cn, as it denotes the default LogisticUnit that is used for packing a partial quantity, which remains after a LogisticUnit has been filled with its standard material content. Constraints arise such as: the RemainderLogisticUnit defined for a LogisticUnit cannot be the LogisticUnit itself. The StandardContentRequiredIndicator can be selected only if the StandardMaterialContent node has content. When the StandardContentRequiredIndicator is selected, no quantity tolerance is allowed for the StandardMaterialContent; and when the StandardContentRequiredIndicator is selected, the UniformMaterialRequiredIndicator can be marked as well.

Enterprise Service Infrastructure Actions can include Activate, Block, Unblock, FlagAsObsolete, RevokeObsolescence and CreateWithReference. Activate (S&AM action) can activate a LogisticUnit to be used in logistics processes and may have the following attributes: 1) Preconditions where the LogisticUnit may currently be 'In Preparation'; 2) Changes to the status where the lifecycle status may be set to 'Active'. Block (S&AM action) can block a LogisticUnit so that it cannot be used in logistic processes and may have the following attributes: 1) Preconditions where the LogisticUnit may currently be 'Active'; 2) Changes to the status where the lifecycle status can be set to 'Blocked'. Unblock (S&AM action) can block a blocked LogisticUnit and may have the following attributes: 1) Preconditions where the LogisticUnit may currently be 'Blocked'; 2) Changes to the status where the lifecycle status may be set to 'Active'. FlagAsObsolete (S&AM action) may flag a LogisticUnit as obsolete and can have the following attributes: 1) Preconditions, where the LogisticUnit may currently be 'Active' or 'Blocked'; and 2) Changes to the status where the lifecycle status may be set to 'Obsolete'. RevokeObsolescence (S&AM action) may make an obsolete LogisticUnit non-obsolete and may have the following attributes: 1) Preconditions where the LogisticUnit may currently be 'Obsolete'; and 2) Changes to the status where the lifecycle status may be set to 'Blocked'. A CreateWithReference action can create a new LogisticUnit based on the data of an existing LogisticUnit and may preconditions where the action can not copy multiple logistics unit, but may copy one.

Queries may include QueryByElements, QueryByGroup, QueryByStandardMaterialContent, QueryByGroupAndStandardMaterialContent and QueryByDescription. QueryByElements can provide a list of all LogisticUnits which satisfy the selection criteria specified by the LogisticUnit query elements. For each Element for which no value is specified, any value of the corresponding LogisticUnit element can match the selection criteria (wildcard). The query elements are defined by the data type: LogisticUnitElementsQueryElements. These elements can include ID, UUID, SystemAdministrativeData, CreationBusinessPartnerCommonPersonNameGivenName, CreationBusinessPartnerCommonPersonNameFamilyName, LastChangeBusinessPartnerCommonPersonNameGivenName, LastChangeBusinessPartnerCommonPersonNameFamilyName, UniformMaterialRequiredIndicator, StandardContentRequiredIndicator, RemainderLogisticUnitID, RemainderLogisticUnitUUID, ProductCategoryInternalID, ProductCategoryHierarchyID, ProductCategoryUUID, DefaultPackagingMaterialID, DefaultPackagingMaterialUUID, DefaultPackagingMaterialQuantityTypeCode, DefaultPackagingMaterialMeasureUnitCode, WeightWeightMeasureUnitCode, WeightWeightMeasureTypeCode, WeightAverageWeightMeasure, WeightMaximumWeightMeasure, VolumeVolumeMeasureUnitCode, VolumeVolumeMeasureTypeCode, VolumeAverageVolumeMeasure, VolumeMaximumVolumeMeasure, DimensionsDimensionsMeasureUnitCode, DimensionsDimensionsMeasureTypeCode, DimensionsAverageHeightMeasure, DimensionsMaximumHeightMeasure, DimensionsAverageWidthMeasure, DimensionsMaximumWidthMeasure, DimensionsAverageLengthMeasure, DimensionsMaximumLengthMeasure, StackabilityLogisticUnitQuantity, StackabilityLogisticUnitQuantityTypeCode, StackabilityWeightMeasure, StackabilityWeightMeasureUnitCode, StandardMaterialContentMaterialID, StandardMaterialContentMaterialUUID, Description and Status.

ID, which is optional, may be based on GDT: LogisticUnitID. UUID, which is optional, may be based on GDT: UUID. SystemAdministrativeData, which is optional, may be based on GDT: SystemAdministrativeData. The CreationDateTime and LastChangeDateTime may lie within the selected ranges specified for the corresponding attributes of query element SystemAdministrativeData. CreationBusinessPartnerCommonPersonNameGivenName, which is optional, may be based on GDT: LANGUAGEINDEPENDENT_MEDIUM_Name. CreationBusinessPartnerCommonPersonNameFamilyName, which is optional, may be based on GDT: LANGUAGEINDEPENDENT_MEDIUM_Name. LastChangeBusinessPartnerCommonPersonNameGivenName, which is optional, may be based on GDT: LANGUAGEINDEPENDENT_MEDIUM_Name. LastChangeBusinessPartnerCommonPersonNameFamilyName, which is optional, may be based on GDT: LANGUAGEINDEPENDENT_MEDIUM_Name. UniformMaterialRequiredIndicator, which is optional, may be based on GDT: Indicator, Qualifier: Required and Secondary qualifier: UniformMaterial.

StandardContentRequiredIndicator, which is optional, may be based on GDT: Indicator, Qualifier: Required, and Secondary qualifier: StandardContent. RemainderLogisticUnitID, which is optional, may be based on GDT: LogisticUnitID. RemainderLogisticUnitUUID, which is optional, may be based on GDT: UUID. ProductCategoryInternalID, which is optional, may be based on GDT: ProductCategoryInternalID. ProductCategoryHierarchyID, which is optional, may be based on GDT: ProductCategoryHeirarchyID. ProductCategoryUUID, which is optional, may be based on GDT: UUID. DefaultPackagingMaterialID, which is optional, may be based on GDT: ProductID. DefaultPackagingMaterialUUID, which is optional, may be based on GDT: UUID. DefaultPackagingMaterialQuantityTypeCode, which is optional, may be based on GDT: QuantityTypeCode DefaultPackagingMaterialMeasureUnitCode, which is optional, may be based on GDT: MeasureUnitCode. WeightWeightMeasureUnitCode, which is optional, may be based on GDT: MeasureUnitCode. WeightWeightMeasureTypeCode, which is optional, may be based on GDT: MeasureTypeCode. WeightAverageWeightMeasure, which is optional, may be based on GDT: Measure. WeightMaximumWeightMeasure, which is optional, may be based on GDT: Measure. VolumeVolumeMeasureUnitCode, which is optional, may be based on GDT: MeasureUnitCode. VolumeVolumeMeasureTypeCode, which is optional, may be based on GDT: MeasureTypeCode. VolumeAverageVolumeMeasure, which is optional, may be based on GDT: Measure. VolumeMaximumVolumeMeasure, which is optional, may be based on GDT: Measure. DimensionsDimensionsMeasureUnitCode, which is optional, may be based on GDT: MeasureUnitCode. DimensionsDimensionsMeasureTypeCode, which is optional, may be based on GDT: MeasureTypeCode. DimensionsAverageHeightMeasure, which is optional, may be based on GDT: Measure. DimensionsMaximumHeightMeasure, which is optional, may be based on GDT: Measure. DimensionsAverageWidthMeasure, which is optional, may be based on GDT: Measure. DimensionsMaximumWidthMeasure, which is optional, may be based on GDT: Measure. DimensionsAverageLengthMeasure, which is optional, may be based on GDT: Measure. DimensionsMaximumLengthMeasure, which is optional, may be based on GDT: Measure. StackabilityLogisticUnitQuantity, which is optional, may be based on GDT: Quantity. StackabilityLogisticUnitQuantityTypeCode, which is optional, may be based on GDT: QuantityTypeCode. StackabilityWeightMeasure, which is optional, may be based on GDT: Measure. StackabilityWeightMeasureUnitCode, which is optional, may be based on GDT: MeasureTypeCode. StandardMaterialContentMaterialID, which is optional, may be based on GDT: ProductID. StandardMaterialContentMaterialUUID, which is optional, may be based on GDT: UUID. Description, which is optional, may be based on GDT: SHORT_Description. Status, which is optional, may be based on IDT: LogisticUnitStatus.

A QueryByGroup query can provide a list of all LogisticUnits which satisfy the group selection criteria specified by the query element. The query elements may be defined by the data type: LogisticUnitGroupQueryElements. These elements may include GroupAssignmentLogisticUnitGroupID, GroupAssignmentLogisticUnitGroupUUID and Status. GroupAssignmentLogisticUnitGroupID, which is optional, may be based on GDT: LogisticUnitGroupID. GroupAssignmentLogisticUnitGroupUUID, which is optional, may be based on GDT: UUID. Status, which is optional, may be based on IDT: LogisticUnitStatus.

A QueryByStandardMaterialContent query can provide a list of all LogisticUnits that include a StandardMaterialContent node item and satisfy the standard material content selection criteria specified by the query elements. The query elements can be defined by the data type: LogisticUnitStandardMaterialContentQueryElements.

These elements can include StandardMaterialContentMaterialID, StandardMaterialContentMaterialUUID, StandardMaterialContentMaterialMeasureUnitCode, StandardMaterialContentMaterialQuantityTypeCode and Status. StandardMaterialContentMaterialID, which is optional, may be based on GDT: ProductID. StandardMaterialContentMaterialUUID, which is optional, may be based on GDT: UUID. StandardMaterialContentMaterialMeasureUnitCode, which is optional, may be based on GDT: MeasureUnitCode. StandardMaterialContentMaterialQuantityTypeCode, which is optional, may be based on GDT: QuantityTypeCode. Status, which is optional, may be based on IDT: LogisticUnitStatus.

A QueryByGroupAndStandardMaterialContent query can provide a list of all LogisticUnits that include a GroupAssignment node item and a StandardMaterialContent node item which satisfy the group and standard material content specified by the query elements. For each Element for which no value is specified, any value of the corresponding LogisticUnit element will match the selection criteria (wildcard). The query elements can be defined by the data type: LogisticUnitGroupAndStandardMaterialContentQueryElements. These elements can include GroupAssignmentLogisticUnitGroupID, GroupAssignmentLogisticUnitGroupUUID, StandardMaterialContentMaterialID, StandardMaterialContentMaterialUUID, StandardMaterialContentMaterialMeasureUnitCode, StandardMaterialContentMaterialQuantityTypeCode and Status. GroupAssignmentLogisticUnitGroupID, which is optional, may be based on GDT: LogisticUnitGroupID. GroupAssignmentLogisticUnitGroupUUID, which is optional, may be based on GDT: UUID. StandardMaterialContentMaterialID, which is optional, may be based on GDT: ProductID. StandardMaterialContentMaterialUUID, which is optional, may be based on GDT: UUID. StandardMaterialContentMaterialMeasureUnitCode, which is optional, may be based on GDT: MeasureUnitCode. StandardMaterialContentMaterialQuantityTypeCode, which is optional, may be based on GDT: QuantityTypeCode. Status, which is optional, may be based on IDT: LogisticUnitStatus.

A QueryByDescription query can provide a list of all LogisticUnits that have a certain ID and description. The default language for the description is the logon language. The query elements can be defined by the data type LogisticUnitDescriptionQueryElements. These elements can include ID and LogisticUnitDescription. ID, which is optional, may be based on GDT: LogisticUnitID. LogisticUnitDescription, which is optional, may be based on GDT: SHORT_Description.

GroupAssignment

GroupAssignment specifies for a LogisticUnit the group to which the LogisticUnit is assigned, for the purposes of a LogisticUnit usage. The elements located directly at the node GroupAssignment can be defined by the type GDT: LogisticUnitGroupAssignmentElements. These elements can include UUID, LogisticUnitGroupUUID and LogisticUnitGroupID. UUID is a universal identifier, which can be unique, of the group assignment for referencing purposes. UUID may be based on GDT: UUID. LogisticUnitGroupUUID is a universal identifier, which can be unique, of the LogisticUnitGroup, which is assigned in order to reference the group to which the LogisticUnit belongs. LogisticUnitGroupUUID may be based on GDT: UUID. LogisticUnitGroupID is an identifier, which can be unique, of the LogisticUnitGroup, which is assigned in order to reference the group to which the LogisticUnit belongs. LogisticUnitGroupID may be based on GDT: LogisticUnitGroupID.

Inbound Aggregation Relationships may relate from the business object LogisticUnitUsage/node LogisticUnitGroup, LogisticUnitGroup 1:cn, as it can denote the group to which the LogisticUnit is assigned for a particular logistics usage. The node GroupAssignment may be limited to have one instance per usage (that is, a LogisticUnit can be assigned to many groups, but to one group per usage).

Queries may include QueryByLogisticUnitAndUsage, which provides a list of all GroupAssignments that can satisfy the selection criteria specified by the query elements. The query elements can be defined by the data type LogisticUnitGroupAssignmentLogisticUnitAndUsageQueryElements. These elements can be LogisticUnitID and LogisticUnitUsage. LogisticUnitID may be based on GDT: LogisticUnitID. LogisticUnitUsage, which is optional, may be based on GDT: LogisticUnitUsageID. The query can navigate to the LogisticUnitUsage BO.

StandardMaterialContent

StandardMaterialContent can refer to specification for a LogisticUnit of information on the material and unit of measure to be packed in the LogisticUnit during standard packing. As expressed by the node cardinality, a LogisticUnit may include numerous records describing their 'StandardMaterialContent'. For example, a standard WINE_BOX LU may include the two 'StandardMaterialContent' records "Red wine box" and "White wine box". During actual standard packing either a "white wine box" or a "red wine box" can be packed as requested, both giving an instance of a WINE_BOX LU. The elements located directly at the node StandardMaterialContent can be defined by the type GDT: LogisticUnitStandardMaterialContentElements. These elements can include UUID, MaterialUUID, MaterialQuantityTypeCode, MaterialMeasureUnitCode, MaterialID and QuantityTolerance. UUID is a universal identifier, which can be unique, of the standard material content for referencing purposes. UUID may be based on GDT: UUID. MaterialUUID is a universal identifier, which can be unique, of the material, which is assigned in order to reference the standard material. MaterialUUID may be based on GDT: UUID. MaterialQuantityTypeCode is the quantity type of the standard material. MaterialQuantityTypeCode may be based on GDT: QuantityTypeCode. MaterialMeasureUnitCode can refer to the measure unit of the standard material and may be based on GDT: MeasureUnitCode. MaterialID is an identifier, which can be unique, of the material, which is assigned in order to reference of the standard material. MaterialID may be based on GDT: ProductID. QuantityTolerance is the tolerated difference (as an over or under percentage) between the quantity defined for the standard material and the actual quantity, and is optional. QuantityTolerance may be based on GDT: QuantityTolerance.

A number of composition relationships to subordinate nodes may exist, such as StandardMaterialContentMaterialQuantity 136024, 1:c. Inbound Aggregation Relationships may relate from the Product's projection business object Material/node Root, StandardMaterial 1:cn, as it can denote materials that may be packed into the LogisticUnit during standard packing. StandardMaterialContent may be limited to have one instance per material (that is, a LogisticUnit can be assigned to many units of measure, but then limited to one unit of measure per material).

Queries may include QueryByLogisticUnitAndStandardMaterial, which can provide a list of all StandardMaterialContents by the requested logistic unit and material. The query elements may be defined by the data type: LogisticUnitStandardMaterialContentLogisticUnitAndStandardMaterialQueryElements. These elements may include LogisticUnitID, LogisticUnitUUID, MaterialID, MaterialUUID, MaterialQuantityTypeCode and MaterialMeasureUnitCode. LogisticUnitID, which is optional, may be based on GDT: LogisticUnitID. LogisticUnitUUID, which is optional, may be based on GDT: UUID. MaterialID, which is optional, may be based on GDT: ProductID. MaterialUUID, which is optional, may be based on GDT: UUID. MaterialQuantityTypeCode, which is optional, may be based on GDT: QuantityTypeCode. MaterialMeasureUnitCode, which is optional, may be based on GDT: MeasureUnitCode.

StandardMaterialContentMaterialQuantity

StandardMaterialContentMaterialQuantity is the information of the standard material's quantity in its inventory measure unit. All the information in this node may be transient. The elements located directly at the node StandardMaterialContentMaterialQuantity may be defined by the type GDT: LogisticUnitStandardMaterialContentMaterialQuantityElements. These elements can include Quantity and QuantityTypeCode. Quantity is the quantity in the inventory measure unit of the standard material that is assigned to a LogisticUnit. Quantity may be based on GDT: Quantity. QuantityTypeCode is the quantity type of the quantity in the inventory measure unit of the standard material that is assigned to a LogisticUnit. QuantityTypeCode may be based on GDT: QuantityTypeCode.

Description

Description can refer to the Language-dependent short statement describing the LogisticUnit. The elements located directly at the node Description are defined by the type GDT: LogisticUnitDescriptionElements. The elements can include LogisticUnitDescription, which is the language-dependent short description of the LogisticUnit, and may be based on GDT: SHORT_Description. There may be a limit to one description per language. TextCollection (DO) is a Language-dependent formatted statement describing the LogisticUnit.

Dependent Object MarketSegment

FIG. 137 illustrates an example MarketSegment business object model 137012. Specifically, this model depicts interactions among various hierarchical components of the MarketSegment, as well as external components that interact with the MarketSegment (shown here as 137000 through 137002 and 137004 through 137010).

The Dependent Object MarketSegment is a sector of the overall market that may be characterized by a specific constellation of supply and demand and that may exhibit specific customer and product characteristics as well as characteristics for regional and organizational classification. MarketSegment can be a dependent object.

The dependent object MarketSegment can be a business foundation object that may be used in a number of different DUs. For this reason, it can be located in the foundation layer.

This dependent object may be used to assign master data objects or business transactions to market segments. It may be used by the host objects Overhead Cost Ledger Account and Project, i.e., so that characteristic values of a market segment can be added to these objects. In this way, any costs occurring in projects, i.e., can be assigned to the respective market segments where they were incurred and then included in the respective market segment report. This makes it possible to produce a complete profit and loss statement by market segment.

The market segment for confectionery sold in the region Europe. This division enables the region Europe to be handled separately from regions in which a different pricing policy, i.e., can be applied due to greater or smaller demand/supply and in which a different profit margin is expected.

MarketSegment may be represented by the root node <MarketSegment>.

DO Market Segment 137014 does not provide A2A nor B2B operations as it can be created, modified, or archived by a hosting object 137012.

The Dependent Object MarketSegment is a sector of the overall market that may be characterized by a specific constellation of supply and demand and that exhibits specific customer and product characteristics as well as characteristics for regional and organizational classification.

There are no subnodes.

The elements located at the MarketSegment node are defined by the data type GDT MarketSegmentElements. In certain implementations, these elements include: UUID, ProductCategoryUUID, ProductCategoryInternalID, CustomerGroupCode, CountryCode, RegionCode, SalesUnitUUID, SalesUnitID, CustomerServiceUnitUUID, and CustomerServiceUnitID The UUID is a universal identifier, which can be unique, for identifying the dependent object. The UUID can be based on the GDT UUID.

The ProductCategoryUUID is a universal identifier, which can be unique, of a product category. The ProductCategoryUUID can be based on the GDT UUID. Restriction: The only product categories used are those with a ProductCategoryHierarchy assigned to Sales.

The ProductCategoryInternalID is a natural-language unique identifier of the Product Category. The ProductCategoryInternalID can be based on the GDT ProductCategoryInternalID. Restriction: The only product categories used are those with a ProductCategoryHierarchy assigned to Sales.

The CustomerGroupCode is a group of customers for statistics purposes. The CustomerGroupCode can be based on the GDT CustomerGroupCode.

The CountryCode is the coded representation of a country defined by either national or administrative/political borders. The CountryCode can be based on the GDT CountryCode.

The RegionCode is the coded representation of logically or physically linked geographical or political regions that have one or more attributes in common. The RegionCode can be based on the GDT RegionCode.

The SalesUnitUUID is a universal identifier, which can be unique, of an organizational unit responsible for planning, realizing and administering sales force processes. The SalesUnitUUID can be based on the GDT UUID.

The SalesUnitID is a natural-language identifier, which can be unique, of an organizational unit responsible for planning, realizing and administering sales force processes. It can be the natural-language identification of SalesUnit. The SalesUnitID can be based on the GDT OrganizationalCentreID)

Only functional units to which FunctionalUnitCategoryCode 4='Sales' is assigned can be used.

The CustomerServiceUnitUUID is a universal identifier, which can be unique, of an organizational unit responsible for processes covering all aspects of a customer service and support center's business. The CustomerServiceUnitUUID can be based on the GDT UUID.

The CustomerServiceUnitID is a natural-language identifier, which can be unique, of an organizational unit responsible for processes covering all aspects of a customer service and support center's business. It can be the natural-language identification of ServiceUnit. The CustomerServiceUnitID can be based on the GDT: OrganizationalCentreID. Only functional units to which FunctionalUnitCategoryCode 5='Customer Service' is assigned can be used.

Inbound Association Relationships

From the business object FunctionalUnit/node FunctionalUnit the MarketSegment has the following Inbound Association Relationships. There exists a SalesUnit relationship of c:cn. A MarketSegment can reflect the division of the overall market by sales unit. There exists a CustomerServiceUnit relationship of c:cn. A MarketSegment can reflect the division of the overall market by customer service unit.

From Business object ProductCategoryHierarchy/node ProductCategory the MarketSegment has the following Inbound Association Relationships. There exists a ProductCategory relationship of c:cn. A MarketSegment can reflect the division of the overall market by product categories and can reference a product category that is the division of products on the basis of objective, company-specific criteria.

CopyFromMarketSegment

The action CopyFromMarketSegment copies attributes of a given Market Segment. Preconditions may include no market segment attributes maintained for the current market segment. Changes to the object may cause the data of the transferred market segment to be copied to the current market segment. In certain implementations, there may be no changes to other objects. Changes to the status may not apply. Parameters can be action elements defined by the data type: MarketSegmentCopyFromMarketSegmentActionElements: MarketSegmentUUID is of GDT type UUID). There may be no limitations on usage.

Dependent Object OperatingHours

FIG. 138 illustrates one example of an OperatingHours business object model 138032. Specifically, this figure depicts interactions among various hierarchical components of the OperatingHours. OperatingHours is a generic description of time periods based on a recurrence pattern, during which operations are performed. In some cases, OperatingHours may be a dependent object hosted by other objects, shown here as hosting object 138000 and its rote node 138004. The dependent object OperatingHours is part of the process component Foundation. Operating hours may usually be recurring in nature. Examples of operating hours are opening hours, working hours, service hours, and availability times. Examples are Opening hours of a business partner: Mo-Fr 8:00-12:00 and 13:00-18:00, Sa 8:00-13:00, and 24×7 service hours in a gold service contract. OperatingHours is represented by the Root node OperatingHours 138006 and its associations.

The elements located directly at the node OperatingHours are defined by the data type, OperatingHoursElements. In certain implementations these elements can include: UUID, CreatedCalendarUUID, TimeZoneCode, ValidityPeriod, WorkingDayCalendarCode, and SystemAdministrativeData.

UUID can be a universally unique identifier of an OperatingHours instance. CreatedCalendarUUID can be a universally unique identifier of a UDTM runtime calendar. It will be populated by the system when a UDTM calendar is created from the operating hours. UDTM stands for Unified DateTime Model, which is part of the Reuse Service Date and Time. The UDTM provides a unified view to time points, periods, durations, time zones and calendars. UDTM Calendars are runtime objects that support operations like moving forwards/backwards or finding the next active time etc. The CreatedCalendarUUID may be optional and can be based on GDT UUID.

TimeZoneCode, which can be the time zone in which the operating hours are specified. If the time zone is provided, the active and inactive time periods can be calculated with time stamps in the UTC time zone (GLOBAL_DateTime). If the time zone is not provided, active and inactive time periods are calculated as time zone independent DateTime periods. The TimeZoneCode is optional. It may be based on GDT TimeZoneCode.

ValidityPeriod can be a validity period for an OperatingHours. It may be based on GDT CLOSED_DatePeriod.

WorkingDayCalendarCode can be a calendar with general working days in a week and public holidays. Operating hours for general working days can be omitted, depending on the ActiveTimePeriodApplyStrategyCode of node RecurringDayProgramme. The WorkingDayCalendarCode may be optional and can be based on GDT WorkingDayCalendarCode.

SystemAdministrativeData can contain administrative data containing information about creation and change times, etc. It may be based on GDT SystemAdministrativeData.

The following composition relationships to subordinate nodes may exist. The OperatingHours may have a 1:cn cardinality relationship with a RecurringDayProgramme 138008.

RecurringDayProgramme

RecurringDayProgramme is a generic program comprising the operating time periods occurring on a particular day in combination with a recurrence pattern which describes when that day occurs. In this day program, active time periods are grouped in accordance with a recurrence rule. As the recurrence rule is used to identify dates, grouping is done based on days. The elements located directly at the node RecurringDayProgramme are defined by the data type: OperatingHoursRecurringDayProgrammeElements. In certain implementations these elements include: Recurrence, DayProgrammeApplicationStrategyCode, and ActiveTimePeriodApplicationStrategyCode.

Recurrence can be a specification of the recurrence pattern for day-based recurring events. This element uses recurrence rules defined in the iCalendar standard. It may be based on GDT CalendarDayRecurrence.

DayProgrammeApplicationStrategyCode can be a coded representation of the strategy used to apply a day program on an inactive day. If a day program occurs on an inactive day, then this day program can either be omitted or moved to the next or previous active day, using options provided by this datatype. It may be based on GDT DayProgrammeApplicationStrategyCode.

ActiveTimePeriodApplicationStrategyCode can be a strategy for applying an active time period on an inactive day specified by the WorkingDayCalendarCode. It may be based on GDT ActiveTimePeriodApplicationStrategyCode.

The following composition relationships to subordinate nodes may exist. The OperatingHours may have a 1:cn cardinality relationship with a RecurringDayProgrammeOperatingPeriod 138010.

RecurringDayProgrammeOperatingPeriod

RecurringDayProgrammeOperatingPeriod is a time period that describes the start and end times for a contiguous operating period. The elements located directly at the node RecurringDayProgrammeOperatingPeriod are defined by the data type: OperatingHoursRecurringDayProgrammeOperatingPeriodElements. In certain implementations these elements include: TimePeriod and RelativePeriodCode.

TimePeriod can be an active time period of a day in a day program. It may be based on GDT UPPEROPEN_TimePeriod.

RelativePeriodCode can be the relative position of an active time period with respect to a day. Time periods that represent operating periods can span across two days; for example, start at 22:00 and end at 06:00 on the following day.

This operating period can be applied to a day in the following three ways: starts on the day before and ends on the specified day; starts on the specified day and ends on the following day; or starts and ends on the next day. RelativePeriodCode can be based on GDT CURRENTPREVIOUSANDNEXTDAY_RelativePeriodCode. In some implementations, restriction of GDT RelativePeriodCode with codes 8 (i.e., current day), 7 (i.e., previous day) and 9 (i.e., next day) may occur.

OrganisationalCentre Business Object

FIG. 139 illustrates one example of an OrganisationalCentre business object model 139000, specifically a template for other business objects. This figure depicts interactions among various hierarchical components of the OrganisationalCentre. The OrganisationalCentre is a business unit within an organizational structure (for example, organizational plan, financial structure) of a company. An organizational center can assume one or more business roles (for example, company, cost center, permanent establishment and reporting line unit). Normally, an organizational centre is a business unit within the company itself. However, it can also belong to a collaborative partner if it is treated like an internal organizational center in internal business processes. The business object OrganisationalCentre is part of the process component Organizational Management. The OrganisationalCentre can assume one or more of the following business roles: Company, PermanentEstablishment, Segment, ProfitCentre, CostCentre, ReportingLineUnit, Programme, and FunctionalUnit (German: Aufbauorganisatorische Einheit). An organizational center can have a hierarchical relationship with other organizational centers. It is possible to have separate hierarchy paths for the various organizational structures (for example, organizational plan, financial structure). This is determined by the relevant hierarchy type. These hierarchical relationships are time-dependent.

An OrganisationalCentre includes the following components, which can have time-dependent versions. This may include, BusinessCharacter, Name, Type, AddressInformation, ManagingPositionAssignment, StandardIdentification, DefaultCurrency, SiteAssignment, and WorkingDayCalendar. Some components are relevant only in the context of specific business roles. An organizational center can exist in only one, inactive, not operationally-used version that is currently being changed. This version is modeled using the StagingArea and replicates all components of the active version.

OrganisationalCentre is represented by the node OrganisationalCentre 139002.

In some instances, the business object OrganisationalCentre may not send or receives messages.

OrganisationalCentre (root node) is a business unit within an organizational structure (for example, organizational plan, financial structure) of a company. An organizational center can assume one or more business roles (for example, company, cost center, permanent establishment and reporting line unit).

Normally, an organizational center is a business unit within the company itself. However, it can also belong to a collaborative partner if it is treated like an internal organizational center in internal business processes. OrganisationalCentre occurs in the following non-complete, non-disjoint specializations since an organizational center can assume one or more different business roles. Each of the following business roles is represented as a separate business object that is derived from the business object OrganisationalCentre.

Company is a financially and legally-independent organizational center that is not tied to a geographical location and that is registered under business law.

PermanentEstablishment is an organizational centre that represents an area of a company that is tied to a geographical location whose business activity is subject to uniform legal and fiscal processing.

Segment is an organizational center that represents a company area whose business activities result in revenue and expenditure, and whose operating income is regularly monitored by the main decision-makers for the purpose of assigning resources and evaluating performance. Financial information is available for a segment.

ProfitCentre is an organizational center that represents a company area for which a separate period-based profit is determined and used for evaluating and regulating the activities of the company area in a profit-oriented manner.

CostCentre is an organizational center that represents a defined location of cost occurrence and for which costs are recorded separately. The definition can be based on functional requirements, allocation criteria, physical location, and responsibility for costs.

ReportingLineUnit is an organizational center in the personnel reporting line of a company. A reporting line unit typically has a personnel manager who is responsible for defining the objectives and salaries of the directly or indirectly-assigned employees.

Programme is an organizational center for administrating a group of projects or subprograms. Programme represents a complex, time restricted project for achieving higher-level goals within an extensive strategy.

FunctionalUnit is an organizational center responsible for the planning, execution and administration of defined business process steps. This responsibility can lie with the organizational center itself or it can be delegated to other organizational centers.

The elements located directly at the OrganisationalCentre node are defined by the data type OrganisationalCentreElements. In certain implementations these elements include: UUID, ID and ValidityPeriod.

UUID, which can uniquely identify the business object. It may be based on GDT UUID.

ID, which is a semantic key of the organizational center. It is not cross session stable. It may be based on GDT OrganisationalCentreID.

ValidityPeriod, which can be the period in which the organizational center exists. It may be based on GDT CLOSED_DatePeriod and may have a Qualifier of Validity.

ActsAsBusinessPartnerIndicator means that the OrganisationalCentre can also act in the BusinessPartner role if the ActsAsBusinessPartnerIndicator is set. It may be based on GDT Indicator and may have a Qualifier of OrganisationalCentreActsAsBusinessPartner.

CreatedFromBusinessPartnerIndicator means that the OrganisationalCentre was created from a BusinessPartner that represents an organization. It may be based on GDT Indicator and may have a Qualifier of CreatedFromBusinessPartner.

The following filtered composition relationships with subordinate nodes exist: UpperOrganisationalCentreHierarchyRelationship, which has a cardinality of 1:cn.

The filter elements are defined by the data type OrganisationalCentreUpperOrganisationalCentreHierarchyRelationshipFilterElements. These elements include the following. StartDate, which is the date when the time frame begins. The valid nodes are determined within this time frame. The StartDate element is optional. It may be based on GDT: Date. EndDate, which is the date when the time frame finishes. The valid nodes are determined within this time frame. The EndDate element is optional. It may be based on GDT: Date.

The filter elements are defined by the data type ValidityPeriodFilterElements. In certain implementations these elements include: StartDate, EndDate, and MostRecentIndicator.

StartDate, which is the date when the time frame begins. The valid nodes are determined within this time frame. The StartDate element is optional. It may be based on GDT Date.

EndDate, which is the date when the time frame finishes. The valid nodes are determined within this time frame. The EndDate element is optional. It may be based on GDT Date.

MostRecentIndicator, if set, then the following applies: If the current date (the date on which the query was put) is before the StartDate of the filter, then no node is determined. If the current date is before or the same as the EndDate, then the most recent node (the node that is valid on the current date or nearest to the current date) is determined. It may be based on GDT Indicator and may have a Qualifier of MostRecent.

The filter elements are defined by the data type, OrganisationalCentreAddressNameFilterElements. In certain implementations these elements include: StartDate, EndDate, MostRecentIndicator, and LanguageCode.

StartDate, which is the date when the time frame begins. The valid nodes are determined within this time frame. The StartDate element is optional. It may be based on GDT Date.

EndDate, which is the date when the time frame finishes. The valid nodes are determined within this time frame. The EndDate element is optional. It may be based on GDT Date.

MostRecentIndicator. If the MostRecentIndicator is set, then the following applies: If the current date (the date on which the query was put) is before the StartDate of the filter, then no node is determined. If the current date is before or the same as the EndDate, then the most recent node (the node that is valid on the current date or nearest to the current date) is determined. It may be based on GDT Indicator and may have a Qualifier of MostRecent.

LanguageCode, which can be the language of the name being sought. The LanguageCode element is optional. It may be based on GDT LanguageCode.

The filter elements are defined by the data type ValidityPeriodFilterElements.

The filter elements are defined by the data type OrganisationalCentreAddressInformationFilterElements. In certain implementations these elements include:

StartDate, which is the date when the time frame begins. The valid nodes are determined within this time frame. The StartDate element is optional. It may be based on GDT Date.

EndDate, which is the date when the time frame ends. The valid nodes are determined within this time frame. The EndDate element is optional. It may be based on GDT Date.

MostRecentIndicator. If the MostRecentIndicator is set, then the following applies: If the current date (the date on which the query was put) is before the StartDate of the filter, then no node is determined. If the current date is before or the same as the EndDate, then the most recent node (the node that is valid on the current date or nearest to the current date) is determined. It may be based on GDT Indicator and may have a Qualifier of MostRecent.

AddressUsageTypeCode, which can specify the usage type of an address. An address can, for example, be used as the communication or load-enabled address. The AddressUsageTypeCode element is optional. It may be based on GDT AddressUsageTypeCode.

ManagingPositionAssignment has a cardinality of 1:cn. The filter elements are defined by the data type ValidityPeriodFilterElements. StandardIdentification has a cardinality of 1:cn. The filter elements are defined by the data type ValidityPeriodFilterElements. DefaultCurrency has a cardinality of 1:cn. The filter elements are defined by the data type ValidityPeriodFilterElements. SiteAssignment has a cardinality of 1:cn. The filter elements are defined by the data type ValidityPeriodFilterElements. WorkingDayCalendar has a cardinality of 1:cn. The filter elements are defined by the data type ValidityPeriodFilterElements. CompanyAttributes has a cardinality of 1:cn. The filter elements are defined by the data type ValidityPeriodFilterElements. ProfitCentreAttributes has a cardinality of 1:cn. The filter elements are defined by the data type ValidityPeriodFilterElements. CostCentreAttributes has a cardinality of 1:cn. The filter elements are defined by the data type ValidityPeriodFilterElements.

FunctionalUnitAttributes has a cardinality of 1:cn. The filter elements are defined by the data type ValidityPeriodFilterElements. StaffedManagingPositionOfReportingLineUnitAssignment has a cardinality of 1:cn. The filter elements are defined by the data type ValidityPeriodFilterElements. OrganisationalCentreAssignment has a cardinality of 1:cn.

The filter elements are defined by the data type OrganisationalCentreAssignmentFilterElements. In certain implementations these elements include: StartDate and EndDate.

StartDate, which is the date when the time frame begins. The valid nodes are determined within this time frame. The StartDate element is optional. It may be based on GDT Date.

EndDate, which is the date when the time frame finishes. The valid nodes are determined within this time frame. The EndDate element is optional. It may be based on GDT Date.

MostRecentIndicator, if set, then the following applies: If the current date (the date on which the query was put) is before the StartDate of the filter, then no node is determined. If the current date is before or the same as the EndDate, then the most recent node (the node that is valid on the current date or nearest to the current date) is determined. It may be based on GDT: Indicator, qualifier MostRecent.

OrganisationalCentreRelationshipRoleCode. The OrganisationalCentreRelationshipRoleCode specifies whether the search is for a superordinate or subordinate role. The OrganisationalCentreRelationshipRoleCode element is optional. It may be based on GDT OrganisationalCentreRelationshipRoleCode.

DirectDependecyIndicator, if set, then a search is only carried out for the directly-assigned OrganisationalCentre of a role. If this indicator is not set, then all accessible organizational centers of a role are determined. The DirectDependecyIndicator only has an effect when determining subordinate organizational centers, because the node instances that refer to superordinate organizational centers always refer to the directly-superordinate organizational center. Accessible means that the hierarchy type, via which both organizational centers are directly or indirectly linked, supports the linking of roles. It may be based on GDT Indicator and may have a Qualifier of DirectDependecy.

BusinessCharacterCode. The BusinessCharacterCode specifies what business role should be taken into account. It may be based on GDT ORGANISATIONALCENTRE_PartyBusinessCharacterCode.

OrganisationalFunctionCode, which can specify the organizational and structural function of the FunctionalUnit for which the search is to be carried out. It may be based on GDT OrganisationalFunctionCode.

FunctionalUnitRoleCode, which can specify the role the FunctionalUnit, for which the search is to be carried out. The FunctionUnitRoleCode element is optional. It may be based on GDT FunctionalUnitRoleCode. PositionAssignment has a cardinality of 1:cn The filter elements are defined by the data type, OrganisationalCentrePositionAssignmentFilterElements. In certain implementations these elements include: StartDate and EndDate.

StartDate, which is the date when the time frame begins. The valid nodes are determined within this time frame. The StartDate element is optional. It may be based on GDT Date.

EndDate, which is the date when the time frame finishes. The valid nodes are determined within this time frame. The EndDate element is optional. It may be based on GDT Date.

MostRecentIndicator, if set, then the following applies: If the current date (the date on which the query was put) is before the StartDate of the filter, then no node is determined. If the current date is before or the same as the EndDate, then the most recent node (the node that is valid on the current date or nearest to the current date) is determined. It may be based on GDT Indicator and may have a Qualifier of MostRecent.

DirectDependecyIndicator, if set, then the positions directly assigned to a role of an OrganisationalCentre are determined. If this indicator is not set, then a search is carried out for all accessible positions. It may be based on GDT Indicator and may have a Qualifier of DirectDependecy.

DirectDependentOrganisationalCentreAssignment has a cardinality of 1:cn.

The filter elements are defined by the data type OrganisationalCentreDirectDependentOrganisationalCentreAssignmentFilterElements. In certain implementations these elements include: StartDate, EndDate, and HierarchyTypeCode.

StartDate, which is the date when the time frame begins. The valid nodes are determined within this time frame. The StartDate element is optional. It may be based on GDT Date.

EndDate, which is the date when the time frame finishes. The valid nodes are determined within this time frame. The EndDate element is optional. It may be based on GDT Date.

HierarchyTypeCode, which describes the nature of the hierarchy relationship. The HierarchyTypeCode element is optional. It may be based on GDT OrganisationalCentreHierarchyTypeCode. StagingArea has a cardinality of 1:c.

The elements ActsAsBusinessPartnerIndicator and CreatedWithCorrespondingBusinessPartnerReferenceIndicator are read-only.

A number of inbound association relationships exist, including: 1) From business object BusinessPartner/node Root: CorrespondingBusinessPartner has a cardinality of c:c, and is the business partner that represents the same real-world organization as the OrganisationalCentre.

A number of associations for navigation exist, including: 1) To the root of the business object Company:

SuperordinateCompany has a cardinality of c:cn, and specifies the superordinate company that is assigned to the role of an organizational center. The filter elements are defined by the data type ValidityPeriodFilterElements. 2) To the root of the business object PermanentEstablishment:

SuperordinatePermanentEstablishment has a cardinality of c:cn, and specifies the superordinate permanent establishment that is assigned to the role of an organizational center. The filter elements are defined by the data type ValidityPeriodFilterElements. SubordinatePermanentEstablishment has a cardinality of c:cn, and specifies the directly-subordinate permanent establishments that are assigned to the role of an organizational center. The current organization center is also taken into consideration. The filter elements are defined by the data type ValidityPeriodFilterElements. AllSubordinatePermanentEstablishment has a cardinality of c:cn, and specifies all subordinate permanent establishments that are assigned to the role of an organizational center. The current organization center is also taken into consideration. The filter elements are defined by the data type ValidityPeriodFilterElements. 3) To the root of the business object Segment: SuperordinateSegment has a cardinality of c:cn, and specifies the superordinate segment that is assigned to the role of an organizational center. The filter elements are defined by the data type ValidityPeriodFilterElements. 4) To the root of the business object ProfitCentre: SuperordinateProfitCentre has a cardinality of c:cn, and specifies the superordinate profit center that is assigned to the role of an organizational center. The filter elements are defined by the data type ValidityPeriodFilterElements. SubordinateProfitCentre has a cardinality of c:cn, and specifies the directly-subordinate profit centers that are assigned to the role of an organizational center. The current organization center is also taken into consideration. The filter elements are defined by the data type ValidityPeriodFilterElements. AllSubordinateProfitCentre has a cardinality of c:cn, and specifies all subordinate profit centers that are assigned to the role of an organizational center. The current organization center is also taken into consideration. The filter elements are defined by the data type ValidityPeriodFilterElements. 5) To the root of the business object CostCentre: SuperordinateCostCentre has a cardinality of c:cn, and specifies the superordinate cost center that is assigned to the role of an organizational center. The filter elements are defined by the data type ValidityPeriodFilterElements. SubordinateCostCentre has a cardinality of c:cn, and specifies the directly-subordinate cost centers that are assigned to the role of an organizational center. The current organization center is also taken into consideration. The filter elements are defined by the data type ValidityPeriodFilterElements. AllSubordinateCostCentre has a cardinality of c:cn, and specifies all subordinate cost centers that are assigned to the role of an organizational center. The current organization center is also taken into consideration. The filter elements are defined by the data type ValidityPeriodFilterElements. DirectDependentCostCentre has a cardinality of c:cn, and specifies the directly-subordinate cost centers that are assigned to the role of an organizational center. In this case the current organization center is not taken into consideration. The filter elements are defined by the data type ValidityPeriodFilterElements. 6) To the root of the business object ReportingLineUnit:

SuperordinateReportingLineUnit has a cardinality of c:cn, and specifies the superordinate reporting line units that are assigned to the role of an organizational center. The filter elements are defined by the data type ValidityPeriodFilterElements. SubordinateReportingLineUnit has a cardinality of c:cn, and specifies the directly-subordinate reporting line units that are assigned to the role of an organizational center. The current organization center is also taken into consideration. The filter elements are defined by the data type ValidityPeriodFilterElements. AllSubordinateReportingLineUnit has a cardinality of c:cn, and specifies all subordinate reporting line units that are assigned to the role of an organizational center. The current organization center is also taken into consideration. The filter elements are defined by the data type ValidityPeriodFilterElements. DirectDependentReportingLineUnit has a cardinality of c:cn, and specifies the directly-subordinate reporting line units that are assigned to the role of an organizational center. In this case the current organization center is not taken into consideration. The filter elements are defined by the data type ValidityPeriodFilterElements. AllDependentReportingLineUnit has a cardinality of c:cn, and specifies all subordinate reporting line units that are assigned to the role of an organizational center. In this case the current organization center is not taken into consideration.

The filter elements are defined by the data type ValidityPeriodFilterElements. 7) To the root of the business object Programme: SuperordinateProgramme has a cardinality of c:cn, and specifies the superordinate program that is assigned to the role of an organizational center. The filter elements are defined by the data type ValidityPeriodFilterElements. 8) To the root of the business object FunctionalUnit: Superordinate FunctionalUnit has a cardinality of c:cn, and specifies the superordinate functional units that are assigned to the role of an organizational center. The filter elements are defined by the data type, OrganisationalCentreSuperordinateFunctionalUnitFilterElements. In certain implementations these elements include: StartDate and EndDate.

StartDate, which is the date when the time period begins. The valid nodes are determined within this time period. The StartDate element is optional. It may be based on GDT Date.

EndDate, which is the date when the time period finishes. The valid nodes are determined within this time period. The EndDate element is optional. It may be based on GDT Date.

MostRecentIndicator. If the MostRecentIndicator is set, then the following applies: If the current date (the date on which the query was put) is before the StartDate of the filter, then no node is determined. If the current date is before or the same as the EndDate, then the most recent node (the node that is valid on the current date or nearest to the current date) is determined.

OrganisationalFunctionCode can specify the organizational and structural function of the FunctionalUnit; this function is used as a selection criterion. It may be based on GDT OrganisationalFunctionCode.

FunctionalUnitRoleCode can specify the role of the FunctionalUnit that is to be selected. The FunctionUnitRoleCode element is optional. It may be based on GDT FunctionalUnitRoleCode.

SubordinateFunctionalUnit has a cardinality of c:cn, and specifies the directly-subordinate functional units that are assigned to the role of an organizational center. The current organization center is also taken into consideration.

The filter elements are defined by the data type, OrganisationalCentreSuperordinateFunctionalUnitFilterElements. In certain implementations these elements include:

StartDate, which is the date when the time period begins. The valid nodes are determined within this time period. The StartDate element is optional. It may be based on GDT Date.

EndDate, which is the date when the time period finishes. The valid nodes are determined within this time period. The EndDate element is optional. It may be based on GDT Date.

MostRecentIndicator. If the MostRecentIndicator is set, then the following applies: If the current date (the date on which the query was put) is before the StartDate of the filter, then no node is determined. If the current date is before or the same as the EndDate, then the most recent node (the node that is valid on the current date or nearest to the current date) is determined.

OrganisationalFunctionCode, which can specify the organizational and structural function of the FunctionalUnit; this function is used as a selection criterion. It may be based on GDT OrganisationalFunctionCode.

FunctionalUnitRoleCode, which can specify the type that is to be selected. The FunctionalUnitRoleCode element is optional. It may be based on GDT FunctionalUnitRoleCode.

AllSubordinateFunctionalUnit has a cardinality of c:cn, and specifies all subordinate functional units that are assigned to the role of an organizational center. The current organization center is also taken into consideration. The filter elements are defined by the data type OrganisationalCentreAllSubordinateFunctionalUnitFilterElements. The data type is identical to the data type OrganisationalCentreSuperordinateFunctionalUnitFilterElements.

DirectDependentFunctionalUnit has a cardinality of c:cn, and specifies the directly-subordinate functional units that are assigned to the role of an organizational center. In this case the current organization center is not taken into consideration. The filter elements are defined by the data type OrganisationalCentreDirectDependentFunctionalUnitFilterElements. In certain implementations these elements include: StartDate, which is the date when the time period begins. The valid nodes are determined within this time period. The StartDate element is optional. It may be based on GDT Date. EndDate, which is the date when the time period finishes. The valid nodes are determined within this time period. The EndDate element is optional. It may be based on GDT Date. MostRecentIndicator if set, then the following applies: If the current date (the date on which the query was put) is before the StartDate of the filter, then no node is determined. If the current date is before or the same as the EndDate, then the most recent node (the node that is valid on the current date or nearest to the current date) is determined. OrganisationalFunctionCode, which can specify the organizational and structural function of the FunctionalUnit; this function is used as a selection criterion. It may be based on GDT OrganisationalFunctionCode.

AllDependentFunctionalUnit has a cardinality of c:cn, and specifies all subordinate functional units that are assigned to the role of an organizational center. In this case the current organization center is not taken into consideration. The filter elements are defined by the data type OrganisationalCentreAllDependentFunctionalUnitFilterElements. This data type is identical to the data type OrganisationalCentreDirectDependentFunctionalUnitFilterElements.

The following matrix describes which associations are available for which role.

Association with NavigationRole
CompanyPermanentEstablishmentSegmentProfitCentreCostCentreReportingLineUnitProgrammeFunctionalUnit
SuperordinateCompanyXXXX
SuperordinatePermanentEstablishmentXXX
SuperordinateSegmentX
SuperordinateProfitCentreXXX
SuperordinateCostCentreXXX
SuperordinateReportingLineUnitXX
SuperordinateProgrammeX
SuperordinateFunctionalUnitX
SubordinatePermanentEstablishmentX
SubordinateProfitCentreX
SubordinateCostCentreXXX
SubordinateReportingLineUnitXXX
SubordinateFunctionalUnitXX
DirectDependentCostCentreXX
DirectDependentReportingLineUnitX
DirectDependentFunctionalUnitX
AllSubordinatePermanentEstablishmentX
AllSubordinateProfitCentreX
AllSubordinateCostCentreXX
AllSubordinateReportingLineUnitXXX
AllSubordinateFunctionalUnitXX
AllDependentReportingLineUnitX
AllDependentFunctionalUnitAssignmentX SubordinateFunctionalUnit and AllSubordinateFunctionalUnit are only available for those FunctionalUnits that are of the type sales or customer service.

CreateCorrespondingBusinessPartnerFromOrganisationalCentre creates a business partner for an OrganisationalCentre; this business partner represents the same real-world organization.

Some objects of a company structure are required for processes in which the focus is on the object as a component in an organizational structure, as well as for processes in which only business partners may be used. For this reason it is necessary to model these real-world organizations as both an organizational center and a business partner. This may include, Prerequisites, Changes to the object, and Changes to other objects. Prerequisites for example, is the action that is only possible if the organizational center is a company. Changes to the object for example the association CorrespondingBusinessPartner is activated. Changes to other objects for example, can be a BusinessPartner that is created. (The BusinessPartner is created using the ESI action CreateCorrespondingBusinessPartnerFromOrganisationalCentre in the BusinessPartner business object.) This action may only be performed by the UI and by an inbound agent.

CreateWithCorrespondingBusinessPartnerReference is a corresponding organizational center is created for a business partner; this organizational center represents the same real-world organization.

Some objects of a company structure are required for processes in which the focus is on the object as a component in an organizational structure, as well as for processes in which only business partners may be used. For this reason it is necessary to model these real-world organizations as both an organizational center and a business partner. This may include, Preconditions, Changes to the object, Changes to other objects, and Parameters. Preconditions for example, is the action that may only be performed by BusinessPartner. Changes to the object for example, can be a new organizational center that is created. The organizational center gets a standard address and a name that matches the standard address and name of the business partner. Changes to other objects for example, can be, in the business partner it is specified that there is an organizational center that represents the same real-world organization. Parameters are the action elements that are defined by the data type OrganisationalCentre CreateWithCorrespondingBusinessPartnerReferenceActionElements. In certain implementations these elements include: BusinessPartnerUUID.

BusinessPartnerUUID, which can be the UUID of the BusinessPartner for which an OrganisationalCentre is created. It may be based on GDT UUID.

This action may only be carried out by the ESI action CreateCorrespondingOrganisationalCentre (in the BusinessPartner) that creates the identical OrganisationalCentre for a BusinessPartner. The BusinessPartner can be an organization.

RollbackToLastActiveVersion changes that were made on the Staging Area since the last activation are rolled back. Most changes on OrganisationalCentres as well as on Positions can be rolled back by changing the nodes accordingly. This is not the case when nodes or even the whole OrganisationalCentre have been deleted and the primary node ID has to be restored. Executing this action reverts all OrganisationalCentres that have been changed, to the last activated state. This may include: Changes to the object and Changes to other objects. Changes to the object for example, are the actual inactive version will be deleted. Changes to other objects for example, are the actual inactive version of the Positions will be deleted also.

QueryByID returns a list of all organizational centers that were or are valid during a period and whose ID completely or partially matches the value entered. The query can, for example, by used in order to allow the selection of a Company by its ID in the User Interface. The query elements are defined by the data type OrganisationalCentreIDQueryElements. In certain implementations these elements include: ID, BusinessCharacterCode, and OrganisationalFunctionCode. ID can be an OrganisationalCentre (root) matches the query element ID. The ID can be specified partially or completely. It may be based on GDT OrganisationalCentreID. BusinessCharacterCode can determine the OrganisationalCentre matches of the query element BusinessCharacter. The BusinessCharacterCode element is optional. It may be based on GDT ORGANISATIONALCENTRE_PartyBusinessCharacterCode. OrganisationalFunctionCode can determine the OrganisationalCentre matches the query element OrganisationalFunction. This element is only useful when searching for FunctionalUnits. The OrganisationalFunctionCode element is optional. It may be based on GDT OrganisationalFunctionCode. FunctionalUnitRoleCode can determine the OrganisationalCentre matches of the query element FunctionalUnitRole. This element is only useful when searching for FunctionalUnits with the category Sales or CustomerService. The FunctionalUnitRoleCode element is optional. It may be based on GDT FunctionalUnitRoleCode. ValidityPeriod can determine the OrganisationalCentre (root) (for a query on the OrganisationalCentre) or the ValidityPeriod of a BusinessCharacter (for a query on a specialization of the OrganisationalCentre) overlaps with the area specified for the ValidityPeriod query element. It may be based on GDT CLOSED_DatePeriod and may have a Qualifier of Validity.

QueryByName returns a list of all organizational centers that were or are valid during a period and whose name completely or partially matches the value entered. The query elements are defined by the data type OrganisationalCentreNameQueryElements. In certain implementations these elements include: ValidityPeriod and Name. ValidityPeriod can overlap the area specified for the ValidityPeriod query element. It may be based on GDT CLOSED_DatePeriod and may have a Qualifier of Validity. Name can determine the matches of the query element name. The name can be specified partially or completely. It may be based on GDT Name and may have a Qualifier of MEDIUM.

QueryBySiteAssignment returns a list of all organizational centers that were or are valid during a period and whose assigned location matches the entered value for the SiteUUID. The query elements are defined by the data type OrganisationalCentreSiteAssignmentQueryElements. In certain implementations these elements include: ValidityPeriod and SiteUUID. ValidityPeriod can overlap the specified area for the ValidityPeriod query element. It may be based on GDT CLOSED_DatePeriod and may have a Qualifier of Validity. SiteUUID, which can be the UUID of a location (root) matches the query element UUID. The complete UUID can be specified. It may be based on GDT UUID.

QueryByIdentificationAndAddress returns a list of all OrganisationalCentres that were or are valid during a period and whose ID and address information completely or partially match the entered value. The query elements are defined by the data type OrganisationalCentreIdentificationAndAddressQueryElements. In certain implementations these elements include: UUID, ID, IdentificationPartyIdentifierTypeCode, IdentificationPartyID, PartyName, AddressPostalAddressCountryCode, AddressPostalAddressCityName, AddressPostalAddressStreetPostalCode, AddressPostalAddressStreetName, AddressPostalAddressHouseID, PartyTypeCode, PartyBusinessCharacterCode, FunctionalUnitRoleCode, and ValidityDate.

UUID, which can be the UUID of an OrganisationalCentre (root), and can match the query element ID. It may be based on GDT UUID.

ID, which can be the ID of an OrganisationalCentre (root), and matches the query element ID. The ID can be specified partially or completely. The ID element is optional. It may be based on GDT PartyID.

IdentificationPartyIdentifierTypeCode may be based on GDT PartyIdentifierTypeCode and is Optional.

IdentificationPartyID may be based on GDT PartyID and is Optional.

PartyName may be based on GDT MEDIUM_Name and may have a Qualifier of Party and is Optional.

AddressPostalAddressCountryCode may be based on GDT CountryCode and is Optional.

AddressPostalAddressCityName may be based on GDT LANGUAGEINDEPENDENT_MEDIUM_Name and is Optional.

AddressPostalAddressStreetPostalCode may be based on GDT PostalCode and is Optional.

AddressPostalAddressStreetName may be based on GDT StreetName and is Optional.

AddressPostalAddressHouseID may be based on GDT HouseID and is Optional.

PartyTypeCode may be based on GDT BusinessObjectTypeCode.

PartyBusinessCharacterCode may be based on GDT PartyBusinessCharacterCode.

OrganisationalFunctionCode may be based on GDT OrganisationalFunctionCode and is Optional.

FunctionalUnitRoleCode may be based on GDT FunctionalUnitRoleCode and is Optional.

ValidityDate may be based on GDT Date, qualifier Validity; current date is default.

QueryByManagingPositionAssignment

Returns a list of all OrganisationalCentres that were or are valid during a period and whose assigned managing position matches the entered value for the ManagingPositionUUID.

The query elements are defined by the data type OrganisationalCentreManagingPositionAssignmentQueryElements. These elements are:

ValidityPeriod. The ValidityPeriod of an OrganisationalCentre (root) (for a query on the OrganisationalCentre) or the ValidityPeriod of a BusinessCharacter (for a query on a specialization of the OrganisationalCentre) overlaps with the area specified for the ValidityPeriod query element. It may be based on GDT: CLOSED_DatePeriod, qualifier Validity.

ManagingPositionUUID. The UUID of a Position (root) matches the query element UUID. The complete UUID can be specified. It may be based on GDT: UUID.

UpperOrganisationalCentreHierarchyRelationship is the hierarchy type-dependent relationship with a superordinate organizational center within a validity period. Companies can have different organizational structures (for example, organizational plan, financial structure, geographical structure). These different organizational structures are represented by hierarchy types.

The elements located directly at the node UpperOrganisationalCentreHierarchyRelationship are defined by the data type OrganisationalCentreUpperOrganisationalCentreHierarchyRelationshipElements. These elements are:

ValidityPeriod, which can be the validity period of the hierarchy relationship. It may be based on GDT: CLOSED_DatePeriod, qualifier Validity.

HierarchyTypeCode. The HierarchyTypeCode describes the nature of the hierarchy relationship. The HierarchyTypeCode element is optional. It may be based on GDT: OrganisationalCentreHierarchyTypeCode.

UpperOrganisationalCentreUUID. The UpperOrganisationalCentreUUID references the superordinate organizational center in the type specified by the HierarchyTypeCode. It may be based on GDT: UUID.

An inbound aggregation relationships from the business object OrganisationalCentre/node Root exists: UpperOrganisationalCentre has a cardinality of c:cn, and is the organizational center that represents the parent in an organizational structure. Only one superordinate organizational center may be assigned to an organizational center per hierarchy type at any given time.

BusinessCharacter is the business role of an organizational center within a validity period. The possible business roles correspond to the specializations of the OrganisationalCentre. The element BusinessCharacterCode cannot be changed in this node.

The elements located directly at the node BusinessCharacter are defined by the data type OrganisationalCentreBusinessCharacterElements. These elements are:

ValidityPeriod, which is the validity period of an instance of the business role. It may be based on GDT: CLOSED_DatePeriod, qualifier Validity.

BusinessCharacterCode, which can be used to assign a business role to the organizational center. It may be based on GDT: ORGANISATIONALCENTRE_PartyBusinessCharacterCode.

More than one business role can be assigned to an organizational center at any given time.

Name 139004 is the name of an organizational center within a validity period.

The elements located directly at the node Name are defined by the OrganisationalCentreNameElements data type. These elements are:

ValidityPeriod, which can be the validity period of the name. It may be based on GDT: CLOSED_DatePeriod, qualifier Validity.

Name, which can be the name of an organizational center in a language that is defined by the attribute LanguageCode. It may be based on GDT: MEDIUM_Name.

Only one name per language may be assigned to an organizational center at any given time.

Type 139006 is the customer-specific type of an organizational center within a validity period. The elements located directly at the node Type OrganisationalCentre are defined by the data type OrganisationalCentreTypeElements. These elements are:

ValidityPeriod, which can be the validity period of a customer-specific type. It may be based on GDT: CLOSED_DatePeriod, qualifier Validity. TypeCode, which can be used to assign a customer-specific type to the organizational center. It may be based on GDT: OrganisationalCentreTypeCode. Only one customer-specific type may be assigned to an organizational center at any given time.

Address information 139008 is the address information of an OrganisationalCentre along with its usage. The elements located directly at the AddressInformation node are defined by the GDT type: OrganisationalCentreAddressInformationElements. These elements are:

UUID, which can be the UUID (Universal Unique IDentifier) of an address of an organizational center. It may be based on GDT: UUID.

ValidityPeriod, which can be the period in which the address is valid. It may be based on GDT: CLOSED_DatePeriod, qualifier Validity.

The following composition relationships with subordinate nodes are available: AddressUsage has a cardinality of 1:cn. The filter elements are defined by the data type ValidityPeriodFilterElements. Address has a cardinality of 1:1, and is a composition relationship with dependent object OrganisationAddress.

AddressUsage 139010 is the business, time dependent usage of an address. An address can, for example, be used as the communication or load-enabled address. The elements located directly at the Address Usage node are defined by the type GDT: OrganisationalCentreAddressUsageElements. These elements are: TypeCode, which can specify the usage type of an address. An address can, for example, be used as the communication or load-enabled address. It may be based on GDT: AddressUsageTypeCode.

ValidityPeriod, which can be the period during which an address may have a certain usage. It may be based on GDT: CLOSED_DatePeriod, qualifier Validity.

DefaultIndicator, which can indicate the standard address within an address usage type. The DefaultIndicator element is optional. It may be based on GDT: Indicator, qualifier Default.

If several addresses are assigned to an address usage at a certain time, one address can be indicated as the default address.

Address contains the postal address. The data is modeled using the dependent object OrganisationAddress.

ManagingPositionAssignment is the assignment of the Position to an OrganisationalCentre, which refers to the manager(s) of the OrganisationalCentres during a validity period. The elements located directly at the node ManagingPositionAssignment are defined by the data type OrganisationalCentreManagingPositionAssignmentElements. These elements are:

ValidityPeriod, which can be the validity period of the assignment to the position. It may be based on GDT: CLOSED_DatePeriod, qualifier Validity.

PositionUUID, which can refer to the assigned position. It may be based on GDT: UUID.

An inbound aggregation relationship from the business object Position/node Root exists. AssignedManagingPosition has a cardinality of 1:c, and is the position to which the employee is or employees are assigned who manage the organizational center.

Only one customer-specific type may be assigned to an organizational center at any given time.

StandardIdentification is the standardized identifier of an organizational center within a validity period.

Organizational centers can have standardized identifiers that are defined as industry standards by external institutes. These identifiers are relevant for B2B communications. Example: DUNS.

The elements located directly at the node StandardIdentification are defined by the data type OrganisationalCentreStandardIdentificationElements. These elements are:

ValidityPeriod, which can be the validity period of the assignment to a StandardID. It may be based on GDT: CLOSED_DatePeriod, qualifier Validity.

StandardIDTypeCode, which can specify the standard to which the StandardID refers. It may be based on GDT: PartyIdentifierTypeCode.

StandardID, which can identify an organizational center and refers to the standard specified by the attribute StandardIDTypeCode. It may be based on GDT: PartyID.

Only one StandardID per standard may be assigned to an organizational center at any given time.

DefaultCurrency is a default currency defined for a usage in a validity period. At present, default currencies can be stored with an organizational center for the following usages (DefaultCurrencyUsageCodes):

Default currency for payment of salaries (Company) Default currency for business transactions with customers/suppliers (SalesUnit) The elements located directly at the node DefaultCurrency are defined by the data type OrganisationalCentreDefaultCurrencyElements. These elements are:

ValidityPeriod, which can be the validity period of the assignment to the default currency. It may be based on GDT: CLOSED_DatePeriod, qualifier Validity.

DefaultCurrencyUsageCode, which can describe the usage of the default currency. It may be based on GDT: CurrencyUsageCode.

DefaultCurrencyCode, which can be used to assign a default currency to the organizational center. It may be based on GDT: CurrencyCode.

Only one default currency per usage may be assigned to an organizational center at any given time.

A SiteAssignment is the assignment of a site at which an organizational center is located during a validity period.

The elements located directly at the node SiteAssignmentOrganisationalCentre are defined by the data type OrganisationalCentreSiteAssignmentElements. These elements are:

ValidityPeriod, which can be the validity period of the assignment to the site. It may be based on GDT: CLOSED_DatePeriod, qualifier Validity.

SiteUUID, which can refer to the assigned site. It may be based on GDT: UUID.

An inbound aggregation relationships from business object Location/node Root exists. AssignedSite has a cardinality of 1:c, and is the site at which the organizational center is located Only one location may be assigned to an organizational center at any given time.

The assigned location can have the specialization Site.

For an organizational center that defines the business role PermanentEstablishment.

For organizational centers that do not have the business role PermanentEstablishment and for which the node is available according to the integrity matrix in Chapter 0, the assignment of the location is inherited from the higher-level PermanentEstablishment and cannot be changed.

A WorkingDayCalendar is the assignment of a calendar of working days to an OrganisationalCentre, in one validity period. The working day calendar contains the days on which the organizational center works.

The elements located directly at the WorkingDayCalendar node are defined by the data type OrganisationalCentreWorkingDayCalendarElements. These elements are:

ValidityPeriod, which can be the validity period of the assignment to the working day calendar. It may be based on GDT: CLOSED_DatePeriod, qualifier Validity.

Code, which can define a working day calendar. It may be based on GDT: WorkingDayCalendarCode.

Only one working day calendar may be assigned to an organizational center at any given time.

CompanyAttributes is the set of attributes of a company within a validity period.

The elements located directly at the node CompanyAttributes are defined by the data type OrganisationalCentreCompanyAttributesElements. These elements are:

ValidityPeriod, which can be the period in which the set of attributes are valid for the company. It may be based on GDT: CLOSED_DatePeriod, qualifier Validity.

CountryOfRegistration, which can be the country where the company is entered in the local register. It may be based on GDT: CountryCode.

ProfitCentreAttributes is the set of attributes of a profit center within a validity period.

The elements located directly at the node ProfitCentreAttributes are defined by the data type OrganisationalCentre-ProfitCentreAttributesElements. These elements are:

ValidityPeriod, which can be the period in which the set of attributes are valid for the profit center. It may be based on GDT: CLOSED_DatePeriod, qualifier Validity.

PostingUsageAllowedIndicator, which can determine whether or not actual financial accounting postings are permitted against the profit center. The PostingUsageAllowedIndicator element is optional. It may be based on GDT: Indicator, qualifier: AllowedIndicator.

PlanUsageAllowedIndicator, which can determine whether or not planned financial accounting postings are permitted against the profit center. The PlanUsageAllowedIndicator element is optional. It may be based on GDT: Indicator, qualifier: AllowedIndicator.

Only one set of attributes may be assigned to an organizational center at any given time.

At least one field other than the validity period can be filled.

CostCentreAttributes is the set of attributes of a cost center within a validity period.

The elements located directly at the node CostCentreAttributes are defined by the data type OrganisationalCentre-CostCentreAttributesElements. These elements are:

ValidityPeriod, which can be the period in which the set of attributes are valid for the cost center. It may be based on GDT: CLOSED_DatePeriod, qualifier Validity.

CostCentreTypeCode, which can categorize a cost center on the basis of criteria selected by customers. The CostCentreTypeCode element is optional. It may be based on. GDT: CostCentreTypeCode.

PostingUsageAllowedIndicator, which can determine whether or not actual financial accounting postings are permitted against the cost center. The PostingUsageAllowedIndicator element is optional. It may be based on GDT: Indicator, qualifier: AllowedIndicator.

PlanUsageAllowedIndicator, which can determine whether or not planned financial accounting postings are permitted against the cost center. The PlanUsageAllowedIndicator element is optional. It may be based on GDT: Indicator, qualifier: AllowedIndicator.

Only one set of attributes may be assigned to an organizational center at any given time.

At least one field other than the validity period can be filled.

The following composition relationships with subordinate nodes are available:

CostCentreAttributesMarketSegment has a cardinality of 1:1, and is the composition relationship with the dependent object MarketSegment.

The CostCentreAttributesMarketSegment is a sector of the overall market that is characterized by a specific constellation of supply and demand and that exhibits specific customer and product characteristics as well as characteristics for regional and organizational classification. The data is modeled using the dependent object MarketSegment.

FunctionalUnitAttributes is the set of attributes of a functional unit within a validity period. Only the element ValidityPeriod can be changed in this node.

The elements located directly at the FunctionalUnitAttributes node OrganisationalCentre are defined by the data type OrganisationalCentreFunctionalUnitAttributesElements. These elements are:

ValidityPeriod, which can be the period in which the set of attributes are valid for the functional unit. It may be based on GDT: DatePeriod, qualifier CLOSED.

OrganisationalFunctionCode, which can indicate the organizational function that is taken from the FunctionalUnit. It may be based on GDT: OrganisationalFunctionCode.

The following filtered composition relationships with subordinate nodes are available:

FunctionalUnitAttributesFunctionalUnitRole has a cardinality of 1:cn, and the filter elements are defined by the data type ValidityPeriodFilterElements.

Only one set of attributes may be assigned to an organizational center per OrganisationalFunctionCode at any given time.

If the organizational center has the role FunctionalUnit then this node can be available.

A FunctionalUnitAttributesFunctionalUnitRole is the subdivision of a FunctionalUnit within an organizational structure to which the same organizational function is assigned.

The elements located directly at the FunctionalUnitAttributesFunctionalUnitRole node OrganisationalCentre are defined by the data type OrganisationalCentreFunctionalUnitAttributesFunctionalUnitRoleElements. These elements are:

ValidityPeriod, which can be the period in which the set of attributes are valid for the cost center. It may be based on GDT: CLOSED_DatePeriod, qualifier Validity.

FunctionalUnitRoleCode, which is the subdivision within a FunctionalUnit of the same type. It may be based on GDT: FunctionalUnitRoleCode.

The FunctionalUnitAttributesFunctionalUnitRole node is only relevant for the organizational functions sales and customer service.

A StaffedManagingPositionOfReportingLineUnitAssignment is the assignment of a ManagingPosition (that is filled) of a superordinate reporting line unit, to a reporting line unit in a validity period.

The elements located directly at the StaffedManagingPositionOfReportingLineUnitAssignment node are defined by the type GDT: OrganisationalCentreStaffedManagingPositionOfReportingLineUnitAssignmentElements. These elements are:

ValidityPeriod, which can be the validity period of the assignment to an organizational center. It may be based on GDT: CLOSED_DatePeriod, qualifier Validity.

ManagingPositionUUID, which can refer to the assigned position. It may be based on GDT: UUID.

ManagedReportingLineUnitUUID, which can refer to the assigned reporting line unit. It may be based on GDT: UUID.

ManagingEmployeeUUID, which can refer to the assigned employee. It may be based on GDT: UUID.

A number of inbound association relationships exist, including: 1) From the business object OrganisationalCentre/node Root: ManagedReportingLineUnit has a cardinality of 1:cn, and specifies the ManagedReportingLineUnit of a reporting line unit that is assigned to the position. 2) From the business object Position/node Root: ManagingPosition has a cardinality of 1:cn, and specifies the ManagingPosition of a position that is assigned to the Position. 3) From the business object Position/node Root: ManagingEmployee has a cardinality of 1:cn, and specifies the manager that is assigned to the ManagingPosition.

Only one ManagingPosition of a reporting line unit may be assigned to an organizational center at any one time. If at any one time several employees are assigned to a ManagingPosition, there are then several instances of the node. The node is transient.

An OrganisationalCentreAssignment is the assignment of the superordinate organizational center that can be accessed first and all subordinate organizational centers that occur in a particular business role to an organizational center in the same role or in different business role within a validity period. Accessible means that the hierarchy type, via which both organizational centers are directly or indirectly linked, supports the linking of roles. When determining a superordinate business role, the current organizational center is also taken into consideration, if the current role is different from the superordinate one.

Whether or not the current organizational center is also taken into consideration when determining the subordinate roles depends on the combination of the current business role and business role of the subordinate organizational center.

The elements located directly at the OrganisationalCentre-Assignment node OrganisationalCentre are defined by the data type OrganisationalCentreAssignmentElements. These elements are:

ValidityPeriod, which can be the validity period of the assignment to an organizational center. It may be based on GDT: CLOSED_DatePeriod, qualifier Validity.

OrganisationalCentreRelationshipRoleCode, which can specify whether the node refers to a superordinate or subordinate OrganisationalCentre. The OrganisationalCentreRelationshipRoleCode element is optional. It may be based on GDT: OrganisationalCentreRelationshipRoleCode.

DirectDependencyIndicator, which can indicate that an organizational center belongs to set of directly-accessible organizational centers of a particular role. Accessible means that the hierarchy type, via which both organizational centers are directly or indirectly linked, supports the linking of roles. It may be based on GDT: Indicator, qualifier DirectDependecy.

BusinessCharacterCode, which can specify the business role to which the organizational center is assigned. It may be based on GDT: ORGANISATIONALCENTRE_Party-BusinessCharacterCode.

OrganisationalFunctionCode. If there is a reference to a FunctionalUnit then the OrganisationalFunctionCode indicates the organizational function of the FunctionalUnit. The OrganisationalFunctionCode element is optional. It may be based on GDT: OrganisationalFunctionCode.

FunctionalUnitRoleCode, which can specify the role of a FunctionalUnit that has the FunctionalUnitCategories sales and customer service. The FunctionalUnitRoleCode element is optional. It may be based on GDT: FunctionalUnitRoleCode.

OrganisationalCentreUUID. The UUID of the superordinate or subordinate OrganisationalCentre in a particular role to which the node refers. It may be based on GDT: UUID.

A number of inbound aggregation relationships may exist, including:

1) From the business object Company: OrganisationalCentreCompany has a cardinality of c:cn Indicates the assigned company.

2) From the business object PermanentEstablishment: OrganisationalCentrePermanentEstablishment has a cardinality of c:cn and indicates the assigned permanent establishment.

3) From business object Segment: OrganisationalCentre-Segment has a cardinality of c:cn and indicates the assigned segment. 4) From business object ProfitCentre: OrganisationalCentreProfitCentre has a cardinality of c:cn and indicates the assigned profit center. 5) From business object CostCentre: OrganisationalCentreCostCentre has a cardinality of c:cn and indicates the assigned cost center.

6) From business object ReportingLineUnit: OrganisationalCentreReportingLineUnit has a cardinality of c:cn and indicates the assigned reporting line unit. 7) From business object Programme: OrganisationalCentreProgramme has a cardinality of c:cn and indicates the assigned program.

8) From business object FunctionalUnit: OrganisationalCentreFunctionalUnit has a cardinality of c:cn and indicates the assigned organizational unit.

The node is transient. The node cannot be accessed in the OrganisationalCentre.

At any given time only one OrganisationalCentre per role may be assigned to a superordinate OrganisationalCentre of a role. If the superordinate role is a FunctionalUnit, then the role may only be assigned to a combination of BusinessCharacterCode, OrganisationalFunctionCode and FunctionalUnitRoleCode. Only one inbound association relationship is active for a node.

Not all roles reference all other roles. The superordinate and subordinate roles are not always all referenced and in the case of the subordinate roles, this is more the exception than the rule. The following matrix specifies how and which roles are referenced. The target roles have the following prefixes to demonstrate whether superordinate, subordinate or all subordinate roles are referenced.

Subordinate is a subordinate role where the current OrganisationalCentre is also taken into consideration when determining the nodes. DirectDependent is a subordinate role where the current OrganisationalCentre is not taken into consideration when determining the nodes. All subordinate roles up to the next OrganisationalCentre that has the same role. In some implementations, some roles may also be illustrated by the following table.

OrganisationalCentre RoleRole that is referenced

SuperordinateCompanySuperordinatePermanentEstablishmentSuperordinateSegment SuperordinateProfitCentreSuperordinateCostCentre SuperordinateReportingLineUnitSuperordinateProgrammeSuperordinateFunctionalUnitSubordinatePermanent EstablishmentSubordinateProfitCentreSubordinateCost CentreSubordinateFunctionalUnitDirectDependentCost CentreDirectDependentReportingLineUnitDirectDependentFunctionalUnitAllSubordinatePermanentEstablishmentAllSubordinateProfit CentreAllSubordinateCostCentreAISubordinateReportingLineUnitAISubordinateFunctionalUnitAll DependentReportingLineUnitAllDependentFunctionalUnit CompanyXXXXXX PermanentEstablishmentXXXX SegmentXX ProfitCentreXXXX CostCentreXXXXX ReportingLineUnitXXXXXXX ProgrammeX FunctionalUnitXXXXXXXXXXX In some embodiments, not every combination of superordinate, subordinate and dependent roles make sense for each role. The following can apply: If you can navigate from role A to role B using a node SuperordinateB, then you can navigate from B to role A using a node SuperordinateA. If you can navigate from role A to role B using a node SuperordinateB, then you can navigate from A to role B using a node DependentB.

For example, the following shows a section of an organizational structure. The organizational centers have the following business characters:

Org1: ProfitCentre, CostCentre and ReportingLineUnit

Org2: CostCentre

Org3: CostCentre

Org4: CostCentre and ReportingLineUnit

Org5: CostCentre

Org6: ProfitCentre

Org7: ReportingLineUnit

Along with the links of all OrganisationalCentre via the UpperOrganisationalCentreHierarchyRelationship node, this graphic also contains the links from Org1 and Org6 contained in the OrganisationalCentreAssignment node. From the perspective of the ProfitCentres Org1, Org1 is the subordinate CostCentre. From the perspective of ReportingLineUnit Org1, Org2 and Org 4 are subordinate CostCentre, Org1 is the superordinate CostCentre. For the cost center Org1, Org2 and Org3 are the subordinate cost centers. The result is the following nodes for the corresponding roles, illustrated by the following tables:

ProfitCentre Org1

NodeIDOrganisationalCentreRelationshipRoleDirectDependecyIndicatorBusinessCharacterOrganisationalCentreUUID 1Is_SubordinateXCostCentreOrg1

ReportingLineUnit Org1

NodeIDOrganisationalCentreRelationshipRoleDirectDependecyIndicatorBusinessCharacterOrganisationalCentreUUID 4Is_SuperordinateXCostCentreOrg1

5Is_SubordinateXCostCentreOrg2

6Is_SubordinateXCostCentreOrg4

CostCentre Org1

NodeIDOrganisationalCentreRelationshipRoleDirectDependecyIndicatorBusinessCharacterOrganisationalCentreUUID 7Is_SubordinateXCostCentreOrg2

8Is_SubordinateXCostCentreOrg3

ProfitCentre Org6 has the following nodes

NodeIDOrganisationalCentreRelationshipRoleDirectDependecyIndicatorBusinessCharacterOrganisationalCentreUUID 4Is_SubordinateXCostCentreOrg4

5Is_SubordinateCostCentreOrg5

A PositionAssignment is the assignment of positions under an OrganisationalCentre in a business role with a validity period. A distinction can be made between whether a position that is directly under an OrganisationalCentre has a particular role or not. Positions considered to be directly under a role are those linked to organizational center that are between the current organizational center and an organizational center that has the same role. The following semantics result from the perspective of the roles illustrated in the following table:

FunctionMeaning

Company: The positions that are directly subordinate are those whose assigned employees are employees of the company.

PermanentEstablishment: The positions that are directly subordinate are those whose assigned employees are subject to the same legal treatment as the permanent establishment due to the location of their workplace.

ReportingLineUnit: The positions that are directly subordinate are those that lie directly in the reporting line (that is, there is no other reporting line in between).

FunctionalUnitThe positions that are directly subordinate are those that are required to fulfill the tasks of the organizational center.

The elements located directly at the PositionAssignment node OrganisationalCentre are defined by the data type OrganisationalCentrePositionAssignmentElements. These elements are:

ValidityPeriod, which can be the validity period of the assignment to an organizational center. It may be based on GDT: CLOSED_DatePeriod, qualifier Validity.

DirectDependencyIndicator, which can indicate that a position belongs to the group of the positions of the directly-subordinate organizational center. It may be based on GDT: Indicator, qualifier DirectDependecy.

PositionUUID, which can refer to the subordinate position. It may be based on GDT: UUID.

The inbound association relationships, from business object Position, Position has a cardinality of 1:cn, and specifies the position that is assigned to projection of an organizational center.

The node is transient. The node is available for the roles Company, PermanentEstablishment, ReportingLineUnit and FunctionalUnit. All subordinate positions are only available for the roles ReportingLineUnit and FunctionalUnit.

A DirectDependentOrganisationalCentreAssignment is the assignment of a subordinate organizational center within a validity period. The DirectDependentOrganisationalCentre are the organizational centers that are assigned directly under the organizational center.

The elements located directly at the DirectDependentOrganisationalCentreAssignment node are defined by the type GDT: OrganisationalCentreDirectDependentOrganisationalCentreAssignmentElements. These elements are: ValidityPeriod, which can be the validity period of the assignment to an organizational center. It may be based on GDT: CLOSED_DatePeriod, qualifier Validity. HierarchyTypeCode, which can describe the nature of the hierarchy relationship. The HierarchyTypeCode element is optional. It may be based on GDT: OrganisationalCentreHierarchyTypeCode. OrganisationalCentreUUID, which can refer to the organizational center to which the projection is assigned. It may be based on GDT: UUID.

An inbound association relationship from the business object OrganisationalCentre, exists. DirectDependentOrganisationalCentre has a cardinality of 1:cn, and specifies the organizational center to which an OrganisationalCentre is assigned. The node is read-only. StagingArea is the inactive version of an organizational center for a planned validity period.

The elements located directly at the node StagingArea are defined by the data type OrganisationalCentreStagingAreaElements. These elements are:

UUID, which can be the globally-unique identifier of the Business Object. It may be based on GDT: UUID.

ID, which can be a semantic key of the organizational center. The ID element is optional. It may be based on GDT: OrganisationalCentreID.

ValidityPeriod, which can be the period during which the inactive version of the organizational center exists. It may be based on GDT: CLOSED_DatePeriod, qualifier Validity.

The following filtered composition relationships with subordinate nodes exist:

StagingAreaUpperOrganisationalCentreHierarchyRelationship 1:cn

The filter elements are defined by the data type OrganisationalCentreStagingAreaUpperOrganisationalCentreHierarchyRelationshipFilterElements.

These elements are: StartDate, which is the date when the time frame begins. The valid nodes are determined within this time frame. The StartDate element is optional. It may be based on GDT: Date. EndDate, which is the date when the time frame finishes. The valid nodes are determined within this time frame. The EndDate element is optional. It may be based on GDT: Date.

StagingAreaBusinessCharacter has a cardinality of 1:cn. The filter elements are defined by the data type OrganisationalCentreStagingAreaBusinessCharacterFilterElements. This data type is identical to the data type OrganisationalCentreStagingAreaUpperOrganisationalCentreHierarchyRelationshipFilterElements.

StagingAreaName has a cardinality of 1:cn. The filter elements are defined by the data type OrganisationalCentreStagingAreaNameFilterElements. These elements are:

StartDate, which is the date when the time frame begins. The valid nodes are determined within this time frame. The StartDate element is optional. It may be based on GDT: Date.

EndDate, which is the date when the time frame finishes. The valid nodes are determined within this time frame. The EndDate element is optional. It may be based on GDT: Date.

LanguageCode, which can be the language of the name being sought. The LanguageCode element is optional. It may be based on GDT: LanguageCode. StagingAreaType has a cardinality of 1:cn. The filter elements are defined by the data type OrganisationalCentreStagingAreaTypeFilterElements. This data type is identical to the data type OrganisationalCentreStagingAreaUpperOrganisationalCentreHierarchyRelationshipFilterElements.

StagingAreaAddressInformation has a cardinality of 1:cn. The filter elements are defined by the data type OrganisationalCentreStagingAreaAddressInformationFilterElements. These elements are:

StartDate, which is the date when the time frame begins. The valid nodes are determined within this time frame. The StartDate element is optional. It may be based on GDT: Date. EndDate, which is the date when the time frame ends. The valid nodes are determined within this time frame. The EndDate element is optional. It may be based on GDT: Date. AddressUsageTypeCode, which can specify the usage type of an address. An address can, for example, be used as the communication or load-enabled address. The AddressUsageTypeCode element is optional. It may be based on GDT: AddressUsageTypeCode.

StagingAreaManagingPositionAssignment has a cardinality of 1:cn. The filter elements are defined by the data type OrganisationalCentreStagingAreaManagingPositionFilterElements. This data type is identical to the data type OrganisationalCentreStagingAreaUpperOrganisationalCentreHierarchyRelationshipFilterElements.

StagingAreaStandardIdentification has a cardinality of 1:cn. The filter elements are defined by the data type OrganisationalCentreStagingAreaStandardIdentificationFilterElements. This data type is identical to the data type OrganisationalCentreStagingAreaUpperOrganisationalCentreHierarchyRelationshipFilterElements.

StagingAreaDefaultCurrency has a cardinality of 1:cn. The filter elements are defined by the data type OrganisationalCentreStagingAreaDefaultCurrencyFilterElements. This data type is identical to the data type OrganisationalCentreStagingAreaUpperOrganisationalCentreHierarchyRelationshipFilterElements.

StagingAreaSiteAssignment has a cardinality of 1:cn. The filter elements are defined by the data type OrganisationalCentreStagingAreaSiteAssignmentFilterElements. This data type is identical to the data type OrganisationalCentreStagingAreaUpperOrganisationalCentreHierarchyRelationshipFilterElements.

StagingAreaWorkingDayCalendar has a cardinality of 1:cn. The filter elements are defined by the data type OrganisationalCentreStagingAreaWorkingDayCalendarFilterElements. This data type is identical to the data type OrganisationalCentreStagingAreaUpperOrganisationalCentreHierarchyRelationshipFilterElements.

StagingAreaCompanyAttributes has a cardinality of 1:cn. The filter elements are defined by the data type OrganisationalCentreStagingAreaCompanyAttributesFilterElements. This data type is identical to the data type OrganisationalCentreStagingAreaUpperOrganisationalCentreHierarchyRelationshipFilterElements.

StagingAreaProfitCentreAttributes has a cardinality of 1:cn. The filter elements are defined by the data type OrganisationalCentreStagingAreaProfitCentreAttributesFilterElements. This data type is identical to the data type OrganisationalCentreStagingAreaUpperOrganisationalCentreHierarchyRelationshipFilterElements.

StagingAreaCostCentreAttributes has a cardinality of 1:cn. The filter elements are defined by the data type OrganisationalCentreStagingAreaCostCentreAttributesFilterElements. This data type is identical to the data type OrganisationalCentreStagingAreaUpperOrganisationalCentreHierarchyRelationshipFilterElements.

StagingAreaFunctionalUnitAttributes has a cardinality of 1:cn. The filter elements are defined by the data type OrganisationalCentreStagingAreaFunctionalUnitAttributesFilterElements. This data type is identical to the data type OrganisationalCentreStagingAreaUpperOrganisationalCentreHierarchyRelationshipFilterElements.

StagingAreaDirectDependentOrganisationalCentre has a cardinality of 1:cn. The filter elements are defined by the data type OrganisationalCentreDirectDependentOrganisationalCentreAssignmentFilterElements Activate transfers an error-free inactive version of organizational centers to their active version.

Prerequisites: There are inactive nodes in the organizational centers or in one of the organizational centers under the organizational structure or position.

All inactive nodes of an organizational center are transferred to the active version of the organizational center. All organizational centers under the organizational structure and position are activated. The action has no parameters. The action is called from the UI.

CheckForActivation checks whether or not the inactive version of organizational centers is correct in the context of the whole organizational structure and if it can be activated. There are inactive nodes in the organizational centers or in one of the organizational centers under the organizational structure or position. The action has no parameters. The action is called from the UI.

QueryByID returns a list of all organizational centers that were or are valid during a time period and whose ID completely or partially matches the value entered. In some implementations, both the active and inactive versions are taken into account for the query. The query can, for example, by used in order to allow the selection of a Company by its ID in the User Interface. The query elements are defined by the data type OrganisationalCentreOrganisationalCentreStagingAreaIDQueryElements. These elements are: ID. The ID of an OrganisationalCentre (root) corresponds to the query element ID. The ID can be specified partially or completely. It may be based on GDT: OrganisationalCentreID.

BusinessCharacterCode, which can match the query element BusinessCharacter. The BusinessCharacterCode element is optional. It may be based on GDT: ORGANISATIONALCENTRE_PartyBusinessCharacterCode.

ValidityPeriod. The ValidityPeriod of a StagingArea node (for a query on the OrganisationalCentre) or the ValidityPeriod of a BusinessCharacter overlaps with the area specified for the ValidityPeriod query element. It may be based on GDT: CLOSED_DatePeriod, qualifier Validity.

StagingAreaUpperOrganisationalCentreHierarchyRelationship

UpperOrganisationalCentreHierarchyRelationship is the inactive version of the hierarchy-dependent relationship with a superordinate organizational center for a planned validity period. Companies can have different organizational structures (for example, organizational plan, financial structure, geographical structure). These different organizational structures are represented by hierarchy types.

The elements located directly at the node StagingAreaUpperOrganisationalCentreHierarchyRelationship are defined by the data type OrganisationalCentreStagingAreaUpperOrganisationalCentreHierarchyRelationshipElements. These elements are: ValidityPeriod, which can be the validity period of the hierarchy relationship. It may be based on GDT: CLOSED_DatePeriod, qualifier Validity. HierarchyTypeCode, which can describe the nature of the hierarchy relationship. It may be based on GDT: OrganisationalCentreHierarchyTypeCode.

UpperOrganisationalCentreUUID, which can reference the superordinate organizational center in the type specified by the HierarchyTypeCode. It may be based on GDT: UUID.

An inbound aggregation relationship from the business object OrganisationalCentre/node Root exists. UpperOrganisationalCentre has a cardinality of c:cn, and is the organizational center that represents the parent in an organizational structure. Only one superordinate organizational center may be assigned to an organizational center per hierarchy type at any given time.

StagingAreaBusinessCharacter is the inactive version of a business role for a planned validity period. The possible business roles correspond to the specializations of the OrganisationalCentre.

The elements located directly at the node StagingAreaBusinessCharacter are defined by the data type OrganisationalCentreStagingAreaBusinessCharacterElements. These elements are: ValidityPeriod, which can be the validity period of an instance of the business role. It may be based on GDT: CLOSED_DatePeriod, qualifier Validity. BusinessCharacterCode, which can be used to assign a business role to the organizational center. It may be based on GDT: ORGANISATIONALCENTRE_PartyBusinessCharacterCode. More than one business role can be assigned to an organizational center at any given time.

StagingAreaName is the inactive version of the name of an organizational center for a planned validity period.

The elements located directly at the StagingAreaName node are defined by the data type OrganisationalCentreStagingAreaNameElements. These elements are: ValidityPeriod, which can be the period in which the name is valid. It may be based on GDT: CLOSED_DatePeriod, qualifier Validity.

Name, which can be the name of an organizational center in a language that is defined by the attribute LanguageCode. It may be based on GDT: MEDIUM_Name. Only one name per language may be assigned to an organizational center at any given time.

StagingAreaName is the inactive version of the customer-specific type of an organizational center for a planned validity period. The elements located directly at the node StagingAreaType are defined by the data type OrganisationalCentreStagingAreaTypeElements. These elements are: ValidityPeriod, which can be the validity period of the assignment of a customer-specific type. It may be based on GDT: CLOSED_DatePeriod, qualifier Validity. TypeCode, which can be used to assign a customer-specific type to the organizational center. It may be based on GDT: OrganisationalCentreTypeCode. Only one customer-specific type may be assigned to an organizational center at any given time.

StagingAreaAddressInformation is the inactive version of the address information of an OrganisationalCentre and its usage. The elements located directly at the StagingAreaAddressInformation node are defined by the type GDT: StagingAreaOrganisationalCentreAddressInformationElements. These elements are: UUID, which can be the UUID (Universal Unique IDentifier) of an address of an organizational center. It may be based on GDT: UUID. ValidityPeriod, which can be the period in which the address is valid. It may be based on GDT: CLOSED_DatePeriod, qualifier Validity.

StagingAreaAddressUsage has a cardinality of 1:cn. The filter elements are defined by the data type OrganisationalCentreStagingAreaAddressInformationAddressUsageFilterElements.

StagingAreaAddress has a cardinality of 1:1. A StagingAreaAddressUsage is the inactive version of the business, time-dependent usage of an address. An address can, for example, be used as the communication or load-enabled address.

The elements located directly at the StagingAreaAddressUsage node are defined by the type GDT: StagingAreaOrganisationalCentreAddressUsageElements. These elements are: TypeCode, which can specify the usage type of an address. An address can, for example, be used as the communication or load-enabled address. It may be based on GDT: AddressUsageTypeCode. ValidityPeriod, which can be the period during which an address may have a certain usage. It may be based on GDT: CLOSED_DatePeriod, qualifier Validity. DefaultIndicator, which can indicate the standard address within an address usage type. The DefaultIndicator element is optional. It may be based on GDT: Indicator, qualifier Default.

If several addresses are assigned to an address usage at one specific time, one address can be indicated as the default address. It may be based on GDT: Indicator, qualifier Default.

StagingAreaAddress contains the inactive version of the postal address. The data is modeled using the dependent object OrganisationAddress.

StagingAreaManagingPositionAssignment is the inactive version of the assignment of the Position to an OrganisationalCentre, which refers to the manager(s) of the OrganisationalCentre during a validity period.

The elements located directly at the StagingAreaManagingPositionAssignment node are defined by the data type OrganisationalCentreStagingAreaManagingPositionAssignmentElements. These elements are:

ValidityPeriod, which is the validity period of the assignment of the position. It may be based on GDT: CLOSED- _DatePeriod, qualifier Validity. PositionUUID, which can refer to the assigned position. It may be based on GDT: UUID.

An inbound aggregation relationship from the business object Position, node Root, exists. AssignedManagingPosition has a cardinality of 1:c, and is the position to which the employee is or employees are assigned who manage the organizational center.

StagingAreaStandardIdentification is the inactive version of a standardized identifier of an organizational center for a planned validity period. Organizational centers can have standardized identifiers that are defined as industry standards by external institutes. These identifiers are relevant for B2B communications. Example: DUNS.

The elements located directly at the node StagingAreaStandardIdentification are defined by the data type OrganisationalCentreStagingAreaStandardIdentificationElements. These elements are: ValidityPeriod, which can be the validity period of the assignment of a standard ID. It may be based on GDT: CLOSED_DatePeriod, qualifier Validity. StandardIDTypeCode, which can specify the standard to which the StandardID refers. It may be based on GDT: PartyIdentifierTypeCode. StandardID, which can be the identifier of an organizational center and refers to the standard specified by the attribute StandardIDTypeCode. It may be based on GDT: PartyID. Only one StandardID per standard may be assigned to an organizational center at any given time.

StagingAreaDefaultCurrency is the inactive version of a default currency defined for a usage and for a planned validity period. At present, the following default currencies (DefaultCurrencyUsageCodes) can be stored with an organizational center: default currency for payment of salaries (Company), default currency for business transactions with customers/suppliers (SalesUnit).

The elements located directly at the StagingAreaDefaultCurrency node are defined by the data type OrganisationalCentreStagingAreaDefaultCurrencyElements. These elements are: ValidityPeriod, which can be the validity period of the assignment of the default currency. It may be based on GDT: CLOSED_DatePeriod, qualifier Validity. DefaultCurrencyUsageCode, which can describe the usage of the default currency. It may be based on GDT: CurrencyUsageCode. DefaultCurrencyCode, which can be used to assign a default currency to the organizational center. It may be based on GDT: CurrencyCode.

Only one default currency per usage may be assigned to an organizational center at any given time.

A StagingAreaSiteAssignment is the inactive version of the assignment of a site at which an organizational center is located during a planned validity period.

The elements located directly at the StagingAreaSiteAssignment node are defined by the data type OrganisationalCentreStagingAreaSiteAssignmentElements. These elements are:

ValidityPeriod, which can be the validity period of the assignment of the site. It may be based on GDT: CLOSED_DatePeriod, qualifier Validity.

SiteUUID, which can refer to the assigned site. It may be based on GDT: UUID.

An inbound aggregation relationship from business object Location, node Root, exists. AssignedSite has a cardinality of 1:c, and is the site at which the organizational center is located.

Only one location may be assigned to an organizational center at any given time.

The assigned location can have the specialization Site.

For an organizational center that defines the business role PermanentEstablishment. For organizational centers that do not have the business role PermanentEstablishment and for which the node is available according to the integrity matrix in Chapter 0, the assignment of the location is inherited from the higher-level PermanentEstablishment and cannot be changed.

A StagingAreaWorkingDayCalendar is inactive version of the assignment of a working day calendar to an OrganisationalCentre, in a validity period. The working day calendar contains the days on which the organizational center works.

The elements located directly at the StagingAreaWorkingDayCalendar node are defined by the data type OrganisationalCentreStagingAreaWorkingDayCalendarElements. These elements are: ValidityPeriod, which can be the validity period of the assignment of the working day calendar. It may be based on GDT: CLOSED_DatePeriod, qualifier Validity. Code, which can define a working day calendar. It may be based on GDT: WorkingDayCalendarCode. Only one working day calendar may be assigned to an organizational center at any given time.

StagingAreaCompanyAttributes is the inactive version of the set of attributes of a company within a validity period. The elements located directly at the StagingAreaCompanyAttributes node are defined by the data type OrganisationalCentreStagingAreaCompanyAttributesElements. These elements are: ValidityPeriod, which can be the validity period of the set of attributes of the company. It may be based on GDT: CLOSED_DatePeriod, qualifier Validity. CountryOfRegistration, which can be the country where the company is entered in the local register. It may be based on GDT: CountryCode.

StagingAreaProfitCentreAttributes is the inactive version of the attributes of a profit center for a planned validity period. The elements located directly at the StagingAreaProfitCentreAttributes node are defined by the data type OrganisationalCentreStagingAreaProfitCentreAttributesElements. These elements are:

ValidityPeriod, which can be the period in which the set of attributes are valid for the profit center. It may be based on GDT: CLOSED_DatePeriod, qualifier Validity. PostingUsageAllowedIndicator, which can determine whether or not actual financial accounting postings are permitted against the profit center. The PostingUsageAllowedIndicator element is optional. It may be based on GDT: Indicator, qualifier: AllowedIndicator. PlanUsageAllowedIndicator, which can determine whether or not planned financial accounting postings are permitted against the profit center. The PlanUsageAllowedIndicator element is optional. It may be based on GDT: Indicator, qualifier: AllowedIndicator. Only one set of attributes may be assigned to an organizational center at any given time. At least one field other than the validity period can be filled.

StagingAreaCostCentreAttributes is the inactive version of the attributes of a cost center for a planned validity period.

The elements located directly at the StagingAreaCostCentreAttributes node are defined by the data type OrganisationalCentreStagingAreaCostCentreAttributesElements. These elements are: ValidityPeriod, which can be the period in which the set of attributes are valid for the cost center. It may be based on GDT: CLOSED_DatePeriod, qualifier Validity. CostCentreTypeCode, which can categorize a cost center on the basis of criteria selected by customers. The CostCentreTypeCode element is optional. It may be based on GDT: CostCentreTypeCode. PostingUsageAllowedIndicator, which can determine whether or not actual financial accounting postings are permitted against the cost center. The PostingUsageAllowedIndicator element is optional. It may be based on GDT: Indicator, qualifier: AllowedIndicator. PlanUsageAllowedIndicator, which can determine whether or not planned financial accounting postings are permitted against the cost center. The PlanUsageAllowedIndicator element is optional. It may be based on GDT: Indicator, qualifier: AllowedIndicator.

Only one set of attributes may be assigned to an organizational center at any given time.

At least one field other than the validity period can be filled.

The following composition relationships with subordinate nodes are available: StagingAreaCostCentreAttributesMarketSegmentMarketSegment has a cardinality of 1:1.

The StagingAreaCostCentreAttributesMarketSegment is the inactive version of a sector of the overall market that is characterized by a specific constellation of supply and demand and that exhibits specific customer and product characteristics as well as characteristics for regional and organizational classification. The data is modeled using the dependent object MarketSegment.

StagingAreaFunctionalUnitAttributes is the inactive version of the attributes of a FunctionalUnit within a validity period. Only the element ValidityPeriod can be changed in this node. The elements located directly at the StagingAreaFunctionalUnitAttributes nodeOrganisationalCentre are defined by the data type OrganisationalCentreStagingAreaFunctionalUnitAttributesElements. These elements are:

ValidityPeriod, which can be the period in which the set of attributes are valid for the FunctionalUnit. It may be based on GDT: DatePeriod, qualifier CLOSED.

OrganisationalFunctionCode, which can specify the organizational and structural function that is taken from the FunctionalUnit. It may be based on GDT: OrganisationalFunctionCode.

The following filtered composition relationships with subordinate nodes are available:

StagingAreaFunctionalUnitAttributesFunctionalUnitRole has a cardinality of 1:cn. The filter elements are defined by the data type OrganisationalCentreStagingAreaFunctionalUnitAttributesFunctionalUnitRoleFilterElements. Only one set of attributes may be assigned to an organizational center per OrganisationalFunctionCode at any given time. If the organizational center has the role FunctionalUnit then this node can be available.

A StagingAreaFunctionalUnitAttributesFunctionalUnitRole is the inactive version of the derivation of a FunctionalUnit within an organizational structure to which the same organizational function is assigned.

The elements located directly at the StagingAreaFunctionalUnitAttributesFunctionalUnitRole nodeOrganisationalCentre are defined by the data type OrganisationalCentreStagingAreaFunctionalUnitAttributesFunctionalUnitRole Elements. These elements are: ValidityPeriod, which can be the period in which the set of attributes are valid for the cost center. It may be based on GDT: CLOSED_DatePeriod, qualifier Validity. FunctionalUnitRoleCode. The FunctionalUnitRoleCode is the derivation within a FunctionalUnit of the same organizational and structural function. It may be based on GDT: FunctionalUnitRoleCode.

The StagingAreaFunctionalUnitAttributesFunctionalUnitRole node is only relevant for the organizational functions sales and customer service.

A StagingAreaDirectDependentOrganisationalCentreAssignment is the inactive version of the assignment of a subordinate organizational center within a validity period. The StagingAreaDirectDependentOrganisationalCentreAssignments are the organizational centers that are assigned directly under the organizational centers.

The elements located directly at the StagingAreaDirectDependentOrganisationalCentreAssignment node OrganisationalCentre are defined by the data type Organisational CentreStagingAreaDirectDependentOrganisational CentreAssignmentElements. These elements are: ValidityPeriod, which can be the validity period of the assignment to an organizational center. It may be based on GDT: CLOSED_DatePeriod, qualifier Validity. HierarchyTypeCode, which can describe the nature of the hierarchy relationship. It may be based on GDT: OrganisationalCentreHierarchyTypeCode. OrganisationalCentreUUID, which can refer to the organizational center to which the projection is assigned. It may be based on GDT: UUID.

An inbound association relationship from the business object OrganisationalCentre, node Root, exists. DirectDependentOrganisationalCentre has a cardinality of 1:cn, and specifies the organizational center to which an OrganisationalCentre is assigned. The node is transient and is read-only.

The following derivations of the business object OrganisationalCentre have been implemented as business objects: Company, PermanentEstablishment, Segment, ProfitCentre, CostCentre, ReportingLineUnit, Programme, Functional Unit.

The derivations do not include the StagingArea because changes are only made to the business object OrganisationalCentre. The following table shows which nodes are available for these derivations.

NodeBusiness Object

CompanyPermanentEstablishmentSegmentProfitCentreCostCentreReportingLineUnitProgrammeFunctionalUnitOrganisationalCentre UpperOrganisationalCentreHierarchyRelationship

X

BusinessCharacter

XXXXXXXXX

Name

XXXXXXXXX

Type

XXXXXXXXX

AddressInformation

XXXX

ManagingPositionAssignment

XXXXXX

StandardIdentification

XXX

DefaultCurrency

XXX

SiteAssignment

XXX

WorkingDayCalendar

XXX

CompanyAttributes

XX

ProfitCentreAttributes

XX

CostCentreAttributes

XX

FunctionalUnitAttributes

XX

StaffedManagingPositionOfReportingLineUnit Assignment

XX

OrganisationalCentreAssignmentThe node is transient.

XXXXXXXX

PositionAssignment

XXXXX

DirectDependentOrganisationalCentreAssignment

XX

The business object definitions correspond to those of the business roles.

Some components are relevant only in the context of specific business characters. The extension of OrganisationalCentre captures additional information about a company regarding the legally required type of company which shall specify whether the company is state owned, private owned, foreign investment enterprise, etc. This information is required for reporting to the authorities (e.g. tax authority).

The CompanyAttributes and StagingAreaCompanyAttributes nodes are extended with additional fields. Other nodes of the Business Object OrganisationalCentre typically remain the same.

CompanyAttributes

CompanyAttributes is the set of attributes of a company within a validity period. The CompanyAttributes node is extended with additional fields which are defined by the data type, OrganisationalCentreCompanyAttributesCN_ExtensionElements. The elements of the enhancement structure can include: CompanyOwnershipTypeCode and IndustrialSectorCode.

CompanyOwnershipTypeCode, which can be a coded representation of the type of ownership. It may contain information on the type of the company such as state enterprise, private enterprise, foreign—investment enterprise, etc. This value, as applicable to the company, has to be reported to the tax authorities for VAT declaration for China. The CompanyOwnershipTypeCode element is optional. It may be based on GDT CompanyOwnershipTypeCode.

IndustrialSectorCode, which can be a coded representation of an industry. An IndustrialSectorCode is the classification of a company according to the main focus of its business activities. This information can be used by statistical institutes in China to generate various reports. It is also reported in GoIden Audit for China. This information is derived from BO Company based on CompanyID stored in the root node of BO ProductTaxDeclaration. The IndustrialSectorCode element is optional. It may be based on GDT IndustrialSectorCode.

StagingAreaCompanyAttributes

StagingAreaCompanyAttributes is the inactive version of the set of attributes of a company within a validity period. The StagingAreaCompanyAttributes node is extended with additional fields which are defined by the data type, OrganisationalCentreStagingAreaCompanyAttributesCN_ExtensionElements. In certain implementations these elements include: CompanyOwnershipTypeCode and IndustrialSectorCode.

CompanyOwnershipTypeCode, which can be a coded representation of the type of ownership. It may contain information on the type of the company such as state enterprise, private enterprise, foreign—investment enterprise, etc. This value, as applicable to the company, has to be reported to the tax authorities for VAT declaration for China. The CompanyOwnershipTypeCode element is optional. It may be based on GDT CompanyOwnershipTypeCode.

IndustrialSectorCode, which can be a coded representation of an industry. An IndustrialSectorCode is the classification of a company according to the main focus of its business activities. This information is used by statistical institutes in China to generate various reports. It is also reported in GoIden Audit for China. This information is derived from BO Company based on CompanyID stored in the root node of BO ProductTaxDeclaration. The IndustrialSectorCode element is optional. It may be based on GDT IndustrialSectorCode.

Party Business Object

FIG. 140-1 through 140-5 illustrates an example Party business object model 140002. Specifically, this model depicts interactions among various hierarchical components of the Party, as well as external components that interact with the Party (shown here as 140000, 140004 through 140018 and 140034 through 140050).

In some implementations, a Party represents a business partner or an organizational center. The transformation object Party belongs to the process component Business Partner Data Processing. Party may contains the name, ID numbers and addresses. The transformation object Party can be represented by the root node Party 140020. The elements located directly at the Party node are defined by the type GDT: PartyElements and include UUID, ID, BusinessPartnerInternalID, OrganisationalCentreID, Status der Party, LifeCycleStatusCode, and ValidityPeriod. A UUID can be a Universal Unique IDentifier of the party and is a GDT of type UUID. An ID can be an identifier of the party and is a GDT of type PartyID. A BusinessPartnerInternalID is optional and can be an internal number of business partner and is a GDT of type BusinessPartnerInternalID. A OrganisationalCentreID is optional and can be a semantic key of organizational unit. It is a GDT of type OrganisationalCentreID. Status can be Status of Party and is an IDT of type PartyStatus. LifeCycleStatusCode can be Status of Party. It is a GDT of type PartyLifeCycleStatusCode. A ValidityPeriod can be the period in which party can be valid and is a GDT of type CLOSED_DatePeriod, Qualifier: Validity. The following composition relationships to subordinate nodes exist: Name 140022 has a cardinality of 1:cn, Identification 140024 has a cardinality of 1:cn, AddressInformation 140026 has a cardinality of 1:cn, and AccessControlList 140032 has a cardinality of 1:1. There may be a number of Inbound Aggregation Relationships including: From the business object BusinessPartner/node Root, BusinessPartner has a cardinality of c:1. Business partner corresponding to the party. From the business object Customer/node Root, Customer has a cardinality of c:1. Customer corresponding to the party. From the business object Supplier/node Root. Supplier has a cardinality of c:1. Provider corresponding to the party. From the business object Employee/node Root, Employee has a cardinality of c:1. Employee corresponding to the party. From the business object HouseBank/node Root, HouseBank has a cardinality of c:1. House bank corresponding to the party. From the business object ClearingHouse/node Root, ClearingHouse has a cardinality of c:1. Clearing house corresponding to the party. From the business object TaxAuthority/node Root, TaxAuthority has a cardinality of c:1. Tax authority corresponding to the party. From the business object Company/node Root, Company has a cardinality of c:1. Company corresponding to the party. From the business object PermanentEstablishment/node Root, PermanentEstablishment has a cardinality of c:1. Permanent establishment corresponding to the party. From the business object Segment/node Root, Segment has a cardinality of c:1. Segment corresponding to the party. From the business object ProfitCentre/node Root, ProfitCentre has a cardinality of c:1. Profit center corresponding to the party. From the business object CostCentre/node Root, CostCentre has a cardinality of c:1. Cost center corresponding to the party.

From the business object ReportingLineUnit/node Root, ReportingLineUnit has a cardinality of c:1. Reporting line unit corresponding to the party. From the business object FunctionalUnit/node Root, FunctionalUnit has a cardinality of c:1. Functional Unit corresponding to the party. From the business object Programme/node Root, Programme has a cardinality of c:1. Program corresponding to the party.

There may be a number of Associations for Navigation including: To the business object Party/node Name, CurrentName has a cardinality of c:c. Association to the current name of the party.

AddressInformationByPartyAddressDetermination has a cardinality of c:cn. In some implementations it my be filtered. Association to address information valid for a certain address determination operation at a certain time point. Restricting to default address information may also be possible. The filter elements are defined by the data type PartyAddressInformationByPartyAddressDeterminationFilterElements and include PartyAddressDeterminationCode, AddressUsageValidityDate, and AddressUsageDefaultIndicator. A PartyAddressDeterminationCode can be an address determination operation for which addresses are to be determined and is a GDT of type PartyAddressDeterminationCode. An AddressUsageValidityDate is optional and is a date for determining assignment and is a GDT of type Date, Qualifier: Validity. An AddressUsageDefaultIndicator is a GDT of type Indicator, Qualifier: Default. If this indicator has been set, then only one address at maximum is returned. If this flag has not been set and several addresses are returned, then the first address to be returned is used as the standard address.

In some implementations, IdentificationByPartyIdentifierCategory has a cardinality of c:cn and may be filtered. Returns alternative identifiers for a PartyIdentifierCategory. The filter elements are defined by the data type PartyIdentificationByPartyIdentifierCategoryFilterElements and include PartyIdentifierCategory. A PartyIdentifierCategory for which alternative identifiers are to be determined is a GDT of type PartyIdentifierCategoryCode.

In some applications, QueryByIdentificationAndAddress can return a list of parties. You can also enter the ID number, street, house number, location and postal code of an address as the most important selection parameters. GDT: PartyIdentificationAndAddressQueryElements defines the query element including UUID, ID, IdentificationPartyIdentifierTypeCode, IdentificationPartyID, PartyName, PartyAdditionalName, AddressPostalAddressCountryCode, AddressPostalAddressCityName, AddressPostalAddressStreetPostalCode, AddressPostalAddressStreetName, AddressPostalAddressHouseID, BusinessPartnerCommonKeyWordsText, BusinessPartnerCommonAdditionalKeyWordsText, PartyTypeCode, LifeCycleStatusCode, PartyBusinessCharacterCode, FunctionalUnitAttributesOrganisationalFunctionCode, FunctionalUnitAttributesFunctionalUnitRoleCode, LegalCompetenceIndicator, ValidityDate, MasterDataRestrictionsUseIndicator, and AutomaticProposalUseIndicator. A UUID is optional. Parties are selected whose UUID matches the UUID specified here and is a GDT of type UUID. An ID is optional and parties are selected whose identifier matches the value specified here. It is a GDT of type PartyID. An IdentificationPartyIdentifierTypeCode is optional and is a GDT of type PartyIdentifierTypeCode. An IdentificationPartyID is optional and is a GDT of type PartyID. A PartyName is optional and parties are selected whose Name matches the value specified here and is a GDT of type MEDIUM_Name, Qualifier: Party. A PartyAdditionalName is optional and parties are selected whose additional name matches the value specified here. It is a GDT of type LANGUAGEINDEPENDENT_MEDIUM_Name, Qualifier: BusinessPartnerAdditional. An AddressPostalAddressCountryCode is optional and parties are selected that do have a address with a country code matches the value specified here and is a GDT of type CountryCode. An AddressPostalAddressCityName is optional and parties are selected that do have a address with a city name matches the value specified here and is a GDT of type LANGUAGEINDEPENDENT_MEDIUM_Name. an AddressPostalAddressStreetPostalCode is optional. Parties are selected that do have a address with a postal code matches the value specified here and is a GDT of type PostalCode. An AddressPostalAddressStreetName is optional and parties are selected that do have a address with a street name matches the value specified here. It is a GDT of type StreetName. An AddressPostalAddressHouseID is optional and parties are selected that do have a address with a house id matches the value specified here and is a GDT of type HouseID. A BusinessPartnerCommonKeyWordsText is optional and parties are selected whose key word matches the value specified here. It is a GDT of type KeyWordsText. A BusinessPartnerCommonAdditionalKeyWordsText is optional and parties are selected whose additional key word matches the value specified here and is GDT of type KeyWordsText, Qualifier: Additional. A PartyTypeCode is optional and parties are selected that do have a business object type code specified here. It is a GDT of type BusinessObjectTypeCode. A LifeCycleStatusCode is optional. Parties are selected whose live cycle status code matches the value specified here and is a GDT of type PartyLifeCycleStatusCode. A PartyBusinessCharacterCode is optional and parties are selected whose business character matches the value specified here and is a GDT of type PartyBusinessCharacterCode. A FunctionalUnitAttributesOrganisationalFunctionCode is optional and parties are selected whose organisational function matches the value specified here. It is a GDT of type OrganisationalFunctionCode. A FunctionalUnitAttributesFunctionalUnitRoleCode is optional and parties are selected whose functional unit role matches the value specified here and is a GDT of type FunctionalUnitRoleCode. A LegalCompetenceIndicator is optional and parties that have legal competence will be selected and is a GDT of type Indicator; Qualifier: LegalCompetence. A ValidityDate is optional. Parties are selected whose validity matches the value specified here and is a GDT of type Date, Qualifier: Validity; current date is default. A MasterDataRestrictionsUseIndicator is optional. If the MasterDataRestrictionsUseIndicator is marked, then the query can be restricted to parties having master data maintained fitting to the usage context. An AutomaticProposalUseIndicator is optional. If the AutomaticProposalUseIndicator is marked, then the query may be restricted on the set of parties that have been determined automatically as selection proposal by using the application context and is a GDT of type Indicator, Qualifier: AutomaticProposalUse.

In some implementations, name contains the time-dependent name of the party. The elements located at the node Name are defined by the type GDT: PartyNameElements and include ValidityPeriod and FormattedName. A ValidityPeriod is optional and can be the period in which the name is valid. It is a GDT of type CLOSED_DatePeriod, Qualifier: Validity. A FormattedName is optional and can be the formatted name of party and is a GDT of type LONG_Name, Qualifier: Formatted. An identification may contains an alternative identifier for a party. The elements located at the Identification node are defined by the type GDT: PartyIdentificationElements including PartyIdentifierTypeCode, PartyID, IdentifierIssuingAgencyName, EntryDate, AreaOfValidityCountryCode, AreaOfValidityRegionCode, and ValidityPeriod. A PartyIdentifierTypeCode can be a type of identification number and is a GDT of type PartyIdentifierTypeCode. A PartyID can be an identification number and is a GDT of type PartyID. An IdentifierIssuingAgencyName is optional and can be the name of the agency, company, an organization that issued the identification number and is a GDT of type _MEDIUM-_Name, Qualifier: IdentifierIssuingAgency. An EntryDate is optional. It can be the date on which the identification number was entered and is a GDT of type Date, Qualifier: Entry. An AreaOfValidityCountryCode is optional and can be the country in which an identification number is valid. It is a GDT of type CountryCode. An AreaOfValidityRegionCode is optional and can be the region (state, province, county) where the identification number is valid and is a GDT of type RegionCode. A ValidityPeriod is optional and can be a period in which an identifier (identification number) is valid. It is a GDT of type CLOSED_DatePeriod, Qualifier: Validity.

In some implementations, AddressInformation may contain the address of a party along with its usages. The elements located at the AddressInformation node are defined by the GDT type: PartyAddressInformationElements and include UUID and ValidityPeriod. A UUID can be a Universal Unique IDentifier of a party address and is a GDT of type UUID. A ValidityPeriod is optional and can be a period in which the address is valid. It is a GDT of type CLOSED_DatePeriod, Qualifier: Validity. The following composition relationships to subordinate nodes exist: AddressUsage 140028 has a cardinality of 1:cn, Address 140030 has a cardinality of 1:1. AddressUsage can contain the business, time-dependent usage of an address. The elements located at the Address Usage node are defined by the type GDT: PartyAddressUsageElements including TypeCode, ValidityPeriod, and DefaultIndicator. A TypeCode can specify the usage type of an address and is a GDT of type AddressUsageTypeCode. A ValidityPeriod is optional and can be a period during which an address may have a certain usage and is a GDT of type CLOSED_DatePeriod, Qualifier: Validity. A DefaultIndicator can indicate the standard address within an address usage type and is a GDT of type Indicator, Qualifier: Default. If several addresses are assigned to an address usage at one specific time, one address may be indicated as the default address. An Address may contains a postal address and can also contain contact information. The AccessControlList can be a list of access groups that have access to a Party during a validity period.

PaymentAgreement business object

FIG. 141 illustrates an example PaymentAgreement business object model 141004. Specifically, this model depicts interactions among various hierarchical components of the PaymentAgreement, as well as external components that interact with the PaymentAgreement (shown here as 141000 through 141002 and 141006 through 141014).

A payment agreement is an agreement between a company and a business partner on the handling of payments. It can define, for example, the payment methods allowed and which bank details or credit cards should be used. The Payment Agreement business object is part of the Foundation Layer (LDU Foundation) process component. A payment agreement can contain entries on possible payment methods, the bank details and credit cards used, and payment blocks. A grouping strategy that can determine the conditions under which payments can be summarized can also be defined. Other optional agreements of the payment agreement refer to the payment advice control and the bank instructions. It is possible to combine payments if there are several payments for a business partner with different due dates such as 1 Jun. 2005 for € 100 and 3 Jun. 2005 for € 300. If agreed, the two payments can be combined in one payment of € 400. The Payment Agreement business object may not send or receive any B2B messages. The Payment Agreement business object may not send or receive A2A messages.

A payment agreement is an agreement between a company and a business partner on the handling of payments. The elements located directly at the PaymentAgreement 141018 can be defined by the type GDT PaymentAgreementElements. In certain implementations, these elements can include: UUID, BusinessPartnerUUID, BusinessPartnerInternalID, CompanyUUID, CompanyID, ResponsibleEmployeeUUID, AdviceAddressUUID, AdviceAddressInformationKey, BusinessPartnerUUID, AddressUUID, SystemAdministrativeData, AdviceChannelCommunicationMediumTypeCode, FirstPaymentInstructionCode, SecondPaymentInstructionCode, ThirdPaymentInstructionCode, FourthPaymentInstructionCode, BankChargeBearerCode, PaymentPriorityCode, PaymentGroupingCriterionCode, DirectDebitAllowedIndicator, PaymentCardPaymentAllowedIndicator, PaymentBlockedIndicator, and PaymentAgreementKey. An UUID is an universal key, which may be unique, of the Payment Agreement, and is a GDT of type UUID. A BusinessPartnerUUID is an universal identifier, which may be unique, of the business partner with which a company has a payment agreement, and is a GDT of type UUID. A BusinessPartnerInternalID is an internal identifier, which may be unique, of the business partner with which a company has a payment agreement (e.g., semantic ID), and is a GDT of type BusinessPartnerInternalID. A CompanyUUID is an universal identifier, which may be unique, of the company with which a business partner has a payment agreement and is a GDT of type UUID. A CompanyID is an identifier, which may be unique, of the company with which a business partner has a payment agreement (e.g., semantic ID), and is a GDT of type OrganisationalCentreID. A ResponsibleEmployeeUUID is the employee responsible for the business processes of this business partner derived using the responsibility concept, is a GDT of type UUID, and is optional. This information is not persisted. The employee responsible can be contacted by customers if they encounter any problems during the payment process. An AdviceAddressUUID is the universal identification, which may be unique, of the advice address, is a GDT of type UUID and is optional. An AdviceAddressInformationKey is the advice address to be used from the business partner record, is an IDT of type BusinessPartnerAddressInformationKey, and is optional. The structure consists of the elements: BusinessPartnerUUID (e.g., GDT: UUID) and AddressUUID (e.g., GDT: UUID). A SystemAdministrativeData is administrative data stored by the system such as systems users and change dates, is a GDT of type SystemAdministrativeData. An AdviceChannelCommunicationMediumTypeCode defines the communication channel used to send the payment advice is a GDT of type CommunicationMediumTypeCode, in some implementations may have a Qualifier of AdviceChannel, and is optional. The restriction may exist: the following values of the proprietary code list 30100 can be used: FAX, INT, LET and XML. A FirstPaymentInstructionCode is the first instruction key used for instructions for a payment, is a GDT of type PaymentInstructionCode, and is optional. A SecondPaymentInstructionCode is the second instruction key used for instructions for a payment, is a GDT of type PaymentInstructionCode, and is optional. A ThirdPaymentInstructionCode is the third instruction key used for instructions for a payment, is a GDT of type PaymentInstructionCode, and is optional. A FourthPaymentInstructionCode is the fourth instruction key used for instructions for a payment, is a GDT of type PaymentInstructionCode, and is optional. A BankChargeBearerCode is the coded representation of settlement type of costs incurred from a bank transaction, for example, a payer charge, is a GDT of type BankChargeBearerCode, and is optional. A PaymentPriorityCode specifies that bank transactions of this business partner have priority, is a GDT of type BusinessTransactionPriorityCode and is optional. A PaymentGroupingCriterionCode defines the strategy for grouping payments for a payment agreement, is a GDT of type PaymentGroupingCriterionCode, and is optional. A DirectDebitAllowedIndicator displays that payments by direct debit are possible for this business partner since at least one DirectDebitDetails exists, is a GDT of type Indicator, and in some implementations may have a Qualifier of Allowed. A PaymentCardPaymentAllowedIndicator displays that payments by payment card are possible for this business partner since at least one PaymentCardDetails exists, is a GDT of type Indicator, and in some implementations may have a Qualifier of Allowed. A PaymentBlockedIndicator displays that there is a current payment block for this business partner, is a GDT of type Indicator, and in some implementations may have a Qualifier of Blocked. A PaymentAgreementKey is an alternative key for accessing a payment agreement between a business partner and a company with technical keys, and is an IDT of type PaymentAgreementKey. The key can contain the following elements: BusinessPartnerUUID (e.g., GDT: UUID) and CompanyUUID (e.g., GDT: UUID).

The following composition relationships to subordinate nodes exist: PaymentForm 141020 may have a cardinality relationship of 1:cn; DirectDebitDetails 141024 may have a cardinality relationship of 1:cn; PaymentCardDetails 141022 may have a cardinality relationship of 1:cn; and PaymentBlock 141026 may have a cardinality relationship of 1:cn.

There may be a number of Inbound Aggregation Relationships including: A BusinessPartner may have a cardinality relationship of 1:cn, and specifies the business partner (customer or supplier) who has a payment agreement with a company; A Company may have a cardinality relationship of 1:cn, and specifies the company that has a payment agreement with a business partner.

There may be a number of Inbound Association Relationships including: EmployeeResponsibleEmployee may have a cardinality relationship of c:cn, and specifies the employee that can be entered as the person responsible for a payment. A BusinessPartnerAdviceAddressInformation may have a cardinality relationship of c:cn, and specifies the address of a business partner that is used as the payment advice address.

The query QueryByCompanyPartner provides a list of all PaymentAgreements that meet the selection criteria specified by the query elements. The query elements can be defined by the data type PaymentAgreementCompanyPartnerQueryElements. In certain implementations, these elements may include the following: CompanyID and BusinessPartnerInternalID. A CompanyID is a GDT of type OrganisationalCentreID. A BusinessPartnerInternalID is a GDT of type BusinessPartnerInternalID.

The PaymentForm defines the payment methods that can be used for a payment agreement in a business process between a company and a business partner. The elements located directly at the PaymentForm node are defined by the type GDT PaymentAgreementPaymentFormElements. In certain implementations, these elements include: PaymentFormCode. PaymentFormCode defines the payment method for a PaymentAgreement in coded form, and is a GDT of type PaymentFormCode. If a payment method is specified that requires the bank details of the business partner such as a bank transfer, then the BankDetails can be available. If a payment method is specified that requires the payment card of the business partner such as credit card payment, the PaymentCardDetails can be available.

DirectDebitDetails defines for a payment agreement which bank details can be used for payments of a business partner by direct debit in a particular period. The elements located directly at the DirectDebitDetails node are defined by the type GDT PaymentAgreementDirectDebitDetailsElements. In certain implementations, these elements may include: ID, BusinessPartnerBankDetailsKey, and ValidityPeriod. An ID is an identifier of bank details from the business partner record, and is a GDT of type BusinessPartnerBankDetailsID. A BusinessPartnerBankDetailsKey refers to bank details from the business partner record, and is an IDT of type BusinessPartnerBankDetailsKey. The key structure consists of the elements: PaymentAgreementBusinessPartnerUUID (e.g., GDT: UUID) and ID (e.g., GDT: BusinessPartnerBankDetailsID). A ValidityPeriod defines the validity period for the use of bank details, is a GDT of type DatePeriod, and in some implementations may have a Qualifier of Validity with the restriction that duration is not used. If no period is specified, the validity period of the bank details from the business partner record can be used. There may be a number of Inbound Association Relationships including: BusinessPartnerBankDetails may have a cardinality relationship of 1:cn and specifies the banks details of a business partner.

PaymentCardDetails defines for a payment agreement that this payment card from the business partner record can be used in a particular period. The elements located at the PaymentCardDetails node are defined by the type GDT PaymentAgreementPaymentCardDetailsElements. In some implementations, these elements may include: ID, BusinessPartnerPaymentCardDetailsKey, and ValidityPeriod. An ID is an identifier of a payment card from the business partner record, and is a GDT of type BusinessPartnerPaymentCardDetailsID. A BusinessPartnerPaymentCardDetailsKey refers to a payment card from the business partner record, and is an IDT of type BusinessPartnerPaymentCardDetailsKey. The key structure can consists of the elements: PaymentAgreementBusinessPartnerUUID (e.g., GDT: UUID) and ID (e.g., GDT: BusinessPartnerPaymentCardDetailsID). A ValidityPeriod defines the validity period for the use of a payment card, is a GDT of DatePeriod, and is some implementations may have a Qualifier of Validity with the restriction that duration is not used. If no period is specified, the validity period of the payment card from the business partner record is used. There may be a number of Inbound Association Relationships including: BusinessPartnerPaymentCardDetails may have a cardinality relationship of 1:cn, and specifies the credit card of a business partner. The validity period can be within the validity period of the referenced payment card from the business partner record.

A PaymentBlock is the time-dependent payment block that can be set in a payment agreement between a business partner and a company. A payment block is an indicator that is set to prevent a company's payments being made to a business partner. Each payment block can contain a reason for the block, for example, the partner is bankrupt or there is a dispute to be settled. Payment blocks can be restricted to a period of time, for example, the company and partner can agree that a payment can be made by direct debit 2 weeks later. The elements located directly at the PaymentBlock node are defined by the type GDT PaymentAgreementPaymentBlockElements. In certain implementations, these elements include: PaymentBlock. A PaymentBlock has a payment block reason and a validity period, and is a GDT of type PaymentBlock. There can also be administrative information for the payment block such as creation date/time and the user ID of the person who set the payment block.

Dependent Object PaymentControl

FIG. 142-1 through 142-4 illustrates an example PaymentControl business object model 142044. Specifically, this model depicts interactions among various hierarchical components of the PaymentControl, as well as external components that interact with the PaymentControl (shown here as 142000 through 142006 and 142010 through 142028). Dependent Object PaymentControl is an agreement between a company and a business partner on processing payments for an individual business transaction. The PaymentControl can be used to determine instructions on payment processing, such as an individual order or invoicing for goods and services. In contrast, a PaymentAgreement determines possible payment methods and bank accounts or credit cards that should be used between a company and a business partner, regardless of the business transaction. The payments agreed in PaymentControl are the same in the characteristics payment method, execution date, payer party and payee party. The dependent object PaymentControl is part of the DU foundation process component. A PaymentControl can contain information about the paying and receiving party, details on the payment amount and the type of payments, such as bank transfer, payment card, or check, and detailed information on the selected type of payment.

The elements located at the node PaymentControl 142032 are defined by the type GDT: PaymentControlElements. In certain implementations, these elements may include one or more of the following: UUID, PaymentProcessingCompanyUUID, PaymentProcessingCompanyID, PaymentProcessingBusinessPartnerUUID, PaymentProcessingBusinessPartnerInternalID, ResponsibleEmployeeUUID, SystemAdministrativeData, PropertyMovementDirectionCode, PaymentFormCode, PaymentAmount, ExchangeRate, PaymentBlock, FirstPaymentInstructionCode, SecondPaymentInstructionCode, ThirdPaymentInstructionCode, FourthPaymentInstructionCode, BankChargeBearerCode, PaymentPriorityCode, SinglePaymentIndicator, DebitValueDate, CreditValueDate, PaymentReceivablesPayablesGroupID, ScandinavianPaymentReferenceID, SwissPaymentReferenceID, and Note.

An UUID is the ID of the PaymentControl, and is a GDT of type UUID. A PaymentProcessingCompanyUUID is the company that is involved in the payment, and is a GDT of type UUID. A PaymentProcessingCompanyID is an internal identification of the company that is involved in the payment, and is a GDT of type OrganisationalCentreID. A PaymentProcessingBusinessPartnerUUID is a business partner that is involved in the payment and is a GDT of type UUID. A PaymentProcessingBusinessPartnerInternalID is an identifier, which may be unique, for the business partner that is involved in the payment and is a GDT of type BusinessPartnerInternalID. A ResponsibleEmployeeUUID is the contact person for questions about payment in the company that initiated the payment, is a GDT of type UUID, and is optional. A ResponsibleEmployeeID is the contact person for questions about payment in the company that initiated the payment, is a GDT of type BusinessPartnerInternalID, and is optional. A SystemAdministrativeData is the administrative data retained by a system that includes the system users and the change dates/times, is a GDT of type SystemAdministrativeData. Relevant for the actions "create" and "update." A PropertyMovementDirectionCode is the coded representation of the property change type from the view of the company (decrease or increase of means of payment), and is a GDT of type PropertyMovementDirectionCode. A PaymentFormCode is the coded representation of the payment form, is a GDT of type PaymentFormCode, and is optional. The payment form is the way a product or service is paid for. A PaymentAmount is the payment amount in payment currency, is a GDT of type Amount, in some implementations may have a Qualifier of Payment, and is optional. An ExchangeRate is the Exchange rate for the payment amount from transaction currency in payment currency, is a GDT of type ExchangeRate, and is optional. A PaymentBlock is information about a payment block, and is a GDT of type PaymentBlock. A FirstPaymentInstructionCode is the first instruction key used for instructions for a payment, is a GDT of type PaymentInstructionCode, and is optional. A SecondPaymentInstructionCode is the second instruction key used for instructions for a payment, is a GDT PaymentInstructionCode, and is optional. A ThirdPaymentInstructionCode is the third instruction key used for instructions for a payment, is a GDT of type PaymentInstructionCode, and is optional. A FourthPaymentInstructionCode is the fourth instruction key used for instructions for a payment, is a GDT of type PaymentInstructionCode, and is optional. A BankChargeBearerCode specifies the bearer of the charges incurred during payment such as charges at the expense of the payer, is a GDT of type BankChargeBearerCode and is optional. A PaymentPriorityCode specifies that bank transactions of this business partner have priority, is a GDT of type BusinessTransactionPriorityCode, and is optional. The possible values for the PaymentPriorityCode can be restricted to: 2 (urgent) and 3 (normal). A SinglePaymentIndicator is an indicator whether a payment request can be grouped together with another payment request, is a GDT of type Indicator, in some implementations may have a Qualifier of SinglePayment, and is optional. A DebitValueDate is the due date of the payment amount in the bank account of the party that initiated the payment, is a GDT of type Date, in some implementations may have a Qualifier of Value, and is optional. A CreditValueDate is the due date of the payment amount in the bank account of the party that received the payment, is a GDT of type Date, in some implementations may have a Qualifier of Value, and is optional. A PaymentReceivablesPayablesGroupID is the affiliation to a group of receivables or payables that are in relationship with each other for the purpose of common payment, is a GDT of type PaymentReceivablesPayablesGroupID, and is optional. A ScandinavianPaymentReferenceID is the payment reference common in Scandinavia, is a GDT of type PaymentReferenceID, in some implementations may have a Qualifier of Scandinavian, and is optional. A SwissPaymentReferenceID is the payment reference common in Switzerland (e.g., ISR reference), is a GDT of type PaymentReferenceID, in some implementations may have a Qualifier of Swiss, and is optional. A Note is the user-defined text that explains the payment, is a GDT of type Note, and is optional.

The following composition relationships to subordinate nodes may exist: BankTransfer 142034(which may have a cardinality relationship of 1:cn), ChequePayment 142036 (which may have a cardinality relationship of 1:cn), CreditCardPayment 142038(which may have a cardinality relationship of 1:cn), and CashPayment 142042 (which may have a cardinality relationship of 1:c).

There may be a number of Inbound Aggregation Relationships including: CreationIdentity (which may have a cardinality relationship of 1:cn, and is the identity that created the PaymentControl) and LastChangeIdentity (which may have a cardinality relationship of c:cn, and is the identity that changed the PaymentControl in the last time).

There may be a number of Inbound Association Relationships including: PaymentProcessingCompany (which may have a cardinality relationship of c:cn, and specifies which company is involved in the payment), PaymentProcessingBusinessPartner (which may have a cardinality relationship of c:cn, and specifies which business partner is involved in the payment), ActingReportingLineUnit (which may have a cardinality relationship of c:cn, and specifies which ReportingLineUnit is involved in the payment), and ResponsibleEmployee (which may have a cardinality relationship of c:cn, and specifies which employee is involved in the payment as contact person). If CurrencyCode is filled, CurrencyCode and Amount.CurrencyCode can correspond with each other. If ExchangeRate is filled, Amount and TransactionCurrencyPaymentAmount for ExchangeRate can be consistent.

BankTransfer includes details about processing a payment with the payment procedure "bank transfer" or "debit memo." The elements located at the node Bank are defined by the data type PaymentControlBankTransfer Elements. In certain implementations, this may include one or more of the following: UUID, HouseBankAccountUUID, HouseBankAccountInternalID, HouseBankUUID, BusinessPartnerBankDetailsKey, BusinessPartnerUUID, ID, Amount. A UUID is an universal identifier, which may be unique, of the node BankTransfer, and is a GDT of type UUID. A HouseBankAccountUUID is a foreign key relationship to the house bank account, is a GDT of type UUID, and is optional. A HouseBankAccountInternalID is an identifier of HouseBankAccount, is a GDT of type BankAccountInternalID, and is optional. A HouseBankUUID is a foreign key relationship to the house bank, is a GDT of type UUID, and is optional. A BusinessPartnerBankDetailsKey is a key of the bank details of a business partner, is an IDT of type BusinessPartnerBankDetailsKey and is optional. A BusinessPartnerUUID is the business partner that is involved in the payment, is a GDT of type UUID, and is optional. The business partner can be taken from the Root node. This may mean that only bank details of the business partner involved can be used. An ID is an identifier, which may be unique, for the bank details of a business partner, is a GDT of type BusinessPartnerBankDetailsID, and is optional. An Amount is the amount paid in payment currency by bank transfer or direct debit, is a GDT of type Amount, in some implementations may have a Qualifier of BankTransfer, and is optional. There may be a number of Inbound Association Relationships including: BusinessPartnerBankDetails may have a cardinality relationship of c:cn, and specifies the bank details of the business partner that is to be used for payment processing. HouseBank may have a cardinality of c:cn, and specifies the house bank which is to be used for payment processing.

ChequePayment provides details about processing a payment with the payment procedure "check." The elements located at the node ChequePayment are defined by the data type PaymentControlChequePayment Elements. In certain implementations, these elements may include: UUID, HouseBankAccountUUID, HouseBankAccountInternalID, HouseBankUUID, Amount. An UUID is an universal identifier, which may be unique, of the ChequePayment, and is a GDT of type UUID. A HouseBankAccountUUID is the foreign key relationship to the house bank account, is a GDT of type UUID and is optional. A HouseBankAccountInternalID is an identifier of the HouseBankAccount, is a GDT of type BankAccountInternalID, and is optional. A HouseBankUUID is the foreign key relationship to the house bank, is a GDT of type UUID, and is optional. An Amount is the amount paid in payment currency by check, is a GDT of type Amount and in some implementations may have a Qualifier of Payment, and is optional. There may be a number of Inbound Association Relationships including: HouseBank may have a cardinality relationship of c:cn, and specifies the house bank which is to be used for payment processing.

CreditCardPayment details processing a payment with the payment procedure "credit card." The elements located at the node CreditCardPayment are defined by the data type PaymentControlCreditCardPayment Elements. In certain implementations, elements may include the following: UUID, PaymentCardID, PaymentCardTypeCode, BusinessPartnerPaymentCardDetailsKey, BusinessPartnerUUID, BusinessPartnerPaymentCardDetailsID, PaymentCardDataOriginTypeCode, PaymentCardVerificationValueText, PaymentCardVerificationValueAvailabilityCode, PaymentCardVerificationValueCheckRequiredIndicator, AuthorisationRequiredIndicator, AuthorisationLimitAmount, AuthorisationValueUnlimitedIndicator, and Amount. An UUID an universal identifier, which may be unique, of the CreditCardPayment, and is a GDT of type UUID. A PaymentCardID is an identifier, which may be unique, for a payment card, is a GDT of type PaymentCardID, and is optional. A PaymentCardTypeCode is a type of a payment card, is a GDT of type PaymentCardTypeCode, and is optional. A BusinessPartnerPaymentCardDetailsKey is the key of a payment card of a business partner, and is a IDT of type BusinessPartnerPaymentCardDetailsKey. A BusinessPartnerUUID is the business partner that is involved in the payment, is a GDT of type UUID, and is optional. The business partner can be taken from the Root node and means that payment cards of the business partner involved can be used. A BusinessPartnerPaymentCardDetailsID is an identifier, which may be unique, for a payment card of a business partner, is a GDT of type BusinessPartnerPaymentCardDetailsID, and is optional. A PaymentCardDataOriginTypeCode is information about the origin of the payment card data (e.g., manual entry, card reader), is a GDT of type PaymentCardDataOriginTypeCode and is optional. A PaymentCardVerificationValueText is the security feature of payment cards, is a GDT of type PaymentCardVerificationValueText, and is optional. This element can be used for authorization and is not saved. A PaymentCardVerificationValueAvailabilityCode is status of PaymentCardVerificationValue (e.g., exists/does not exist/not readable), is a GDT of type PaymentCardVerificationValueAvailabilityCode, and is optional. A PaymentCardVerificationValueCheckRequiredIndicator is an indicator whether or not the CardVerificationValue should be transferred in the authorization message, is a GDT of type Indicator, in some implementations may have a Qualifier of Required, and is optional. An AuthorisationRequiredIndicator is an indicator whether or not an authorization should take place, is a GDT of type Indicator, in some implementations may have a Qualifier of Required, and is optional. An AuthorisationLimitAmount is the maximum amount that can be authorized for the card, is a GDT of type Amount, in some implementations may have a Qualifier of Limit, and is optional. An AuthorisationValueUnlimitedIndicator is an indicator whether the authorization amount is not fixed, is a GDT of type Indicator, in some implementations may have a Qualifier of ValueUnlimited, and is optional. This indicator is used if multiple payment cards are used for payment processing. Then all but one payment cards are limited. An Amount is the amount paid in payment currency by payment card, is a GDT of type Amount, in some implementations may have a Qualifier of Payment, and is optional. The following composition relationships to subordinate nodes exist: CreditCardPaymentAuthorisation 142040 may have a cardinality relationship of 1:cn.

There may be a number of Inbound Association Relationships including: PaymentCard (which may have a cardinality relationship of c:cn, and is the payment card with which the payment is to be processed) and BusinessPartnerPaymentCardDetails (which may have a cardinality relationship of c:cn, and specifies which payment card of the business partner is to be used for payment processing). Either the PaymentCardID or BusinessPartnerPaymentCardDetailsID can be filled.

The action RequestAuthorisation authorizes the amount of a payment by credit card at the responsible clearing house. In addition, the address data of the credit card holder and information about the goods paid with the credit card are transferred optionally. The successful authorization of a credit card payment may be a prerequisite for supplying the customer in the SalesOrder. In some implementations, preconditions to the action may include that on the root node of PaymentControl, "credit card payment" should have been selected in the attribute PaymentFormCode. In those implementations, only if the "credit card payment" is selected in the attribute PaymentFormCode will credit card payments be possible. Changes to the object may include if there is no authorization of the total payment amount, an authorization of the amount is requested at the clearing house. The function PaymentCardAuthorisation is used for this. The result is a new node PaymentAuthorisation. The action elements are defined by the data type: PaymentControlCreditCardRequestAuthorisationActionElements. These elements may include one or more of the following: GivenName, FamilyName, CountryCode, RegionCode, StreetPostalCode, StreetName, HouseID, LocationName, BusinessTransactionDocumentTypeCode, BusinessTransactionDocumentID, BuyerPurchaseOrderID, BuyerPurchaseOrderCreationDateTime, CustomerInternalID, PreAuthorisationIndicator, PreAuthorisationAmount. A GivenName is the first name of the credit card holder, is a GDT of type Name, in some implementations may have a Qualifier of Given, and is optional. A FamilyName is the last name of the credit card holder, is a GDT of type Name, in some implementations may have a Qualifier of type Family, and is optional. A CountryCode is the country of residence of the credit card holder, is a GDT of type CountryCode, and is optional. A RegionCode is the region of residence of the credit card holder, is a GDT of type RegionCode, and is optional. A StreetPostalCode, is the Postal code of residence of the credit card holder, and is a GDT of type PostalCode, in some implementations may have a Qualifier of Street, and is optional. A StreetName is the street of residence of the credit card holder, is a GDT of type StreetName, and is optional. A HouseID is the house number of the street of residence of the credit card holder, is a GDT of type HouseID, and is optional. A LocationName is the Location name of the residence of the credit card holder, is a GDT of type Name, is some implementations may have a Qualifier of Location, and is optional. A BusinessTransactionDocumentID is the unique identifier for a document in a business transaction, and is a GDT of type BusinessTransactionDocumentID. The authorization of a credit card payment can occur from different documents: SalesOrder, CustomerInvoice. The clearing house performing the authorization wants to receive an appropriate document reference. A BuyerPurchaseOrderID is the unique identifier of a purchase order in a business transaction that is assigned by the buyer, is a GDT of type BusinessTransactionDocumentID, and is optional. A BuyerPurchaseOrderCreationDateTime, is the creation time of the purchase order, is a GDT of type GLOBAL_DateTime, is some implementations may have a Qualifier of Creation, and is optional. A CustomerInternalID is the unique proprietary identifier for a business partner, and is a GDT of type BusinessPartnerInternalID. A PreAuthorisationIndicator specifies whether it is a preauthorization, is a GDT of type Indicator, in some implementations may have a Qualifier of PreAuthorisation, and is optional. A PreAuthorisationAmount is the amount that is used for the preauthorization, is a GDT of type Amount, in some implementations may have a Qualifier of PreAuthorisation; to be approved, and is optional. The action is called by the hosting object which includes the dependent object PaymentControl. BuyerPurchaseOrderID or BuyerPurchaseOrderCreationDateTime are filled if they are made available by the buyer.

CreditCardPaymentAuthorisation is an authorization data for a payment card payment. The elements located at the node CreditCardPaymentAuthorisation are defined by the data type GDT PaymentControlCreditCardPaymentAuthorisation Elements. In certain implementations the elements may include one or more of the following: UUID, ID, ClearingHouseID, ClearingHouseUUID, ClearingHouseInternalID, CompanyClearingHouseID, DateTime, PreAuthorisationIndicator, Amount, ExpirationDateTime, ActiveIndicator, AppliedIndicator, ResultCode, AddressVerificationResultCode, PaymentCardVerificationResultCode, PaymentCardVerificationValueVerificationResultCode, ResultDescription. An UUID is an universal identifier, which may be unique, of the node CreditCardPaymentAuthorisation, and is a GDT of type UUID. An ID is an identifier for an authorization of a card payment that is assigned by the company, is a GDT of type PaymentCardPaymentAuthorisationID, and is optional. A ClearingHouseID is an identifier for an authorization of a card payment that is assigned by a clearing house for card payments, is a GDT of type PaymentCardPaymentAuthorisationClearingHouseID, and is optional. A ClearingHouseUUID is an universal identifier, which may be unique for the clearing house that is involved in the card payment, is a GDT of type UUID, and is optional. A ClearingHouseInternalID is the company proprietary identifier for the clearing house that is involved in the card payment, is a GDT of type BusinessPartnerInternalID, and is optional. A CompanyClearingHouseID is an identifier for the company at the clearing house, and is a GDT of type PartyPartyID. A DateTime is the date and time on which the authorization was carried out, is a GDT of type DateTime, and in some implementations may have a Qualifier of Authorisation. A PreAuthorisationIndicator specifies whether or not it is a preauthorization, is a GDT of type Indicator, and in some implementations may have a Qualifier of PreAuthorisation. An Amount is the amount that can be taken from the credit card in TransactionCurrency, and is a GDT of type Amount. An ExpirationDateTime is the date and time until which the authorization is valid, and is a GDT of type DateTime. An ActiveIndicator specifies whether or not the authorization can be used, is a GDT of type Indicator, and in some implementations may have a Qualifier of Active. An AppliedIndicator is an indicator whether or not this authorization was already used in the settlement, is a GDT of type AppliedIndicator, and in some implementations may have a Qualifier of Authorisation. A ResultCode is the result of the authorization message to the clearing house, and is a GDT of type AuthorisationResultCode. An AddressVerificationResultCode is the result of the address check during authorization (address result), and is a GDT of type AddressVerificationResultCode. A PaymentCardVerificationResultCode is the result of the card number check during authorization (response code), and is a GDT of type PaymentCardVerificationResultCode; to be approved. A PaymentCardVerificationValueVerificationResultCode is the result of the card verification value check (CVV) during authorization, and is a GDT of type PaymentCardVerificationValueVerificationResultCode. A ResultDescription is the result text of the authorization, is a GDT of type _SHORT_Description, in some implementations may have a Qualifier of AuthorisationResult, and is optional. There are a number of Inbound Association Relationships including: ClearingHouse may have a cardinality relationship of c:cn, and specifies which clearing house is involved in the credit card payment.

CashPayment provides details about processing a cash payment. The elements located at the node CashPayment are defined by the data type: PaymentControlCashPayment Elements. In certain implementations, these elements may include: UUID, CashStorageUUID, CashStorageID. An UUID is an universal identifier, which may be unique, of the node CashPayment, and is a GDT of type UUID. A CashStorageUUID is the foreign key relationship to the cash storage, is a GDT of type UUID, and is optional. A CashStorageID is an identifier of the cash storage, is a GDT of type CashStorageID, and is optional.

PaymentExplanation Dependent Object

FIG. 143 illustrates an example PaymentExplanation business object model 143008. Specifically, this model depicts interactions among various hierarchical components of the PaymentExplanation, as well as external components that interact with the PaymentExplanation (shown here as 143000 through 143006 and 143010, and 143022 through 143024).

PaymentExplanation Dependent Object

A payment explanation specifies the reason/reasons for a payment, typically with reference to one or more business documents such as contracts, invoices, credit memos, or sales orders. You can apportion payment amounts for each business document and explain the possible difference between the expected and the actual payment amount. The PaymentExplanation dependent object is part of the Foundation Layer process component.

PaymentExplanation may be used in the following process components: Payment Processing (e.g., for payment orders (i.e., PaymentOrder), bank statements (i.e., BankStatement), incoming check and bill of exchange payments (i.e., IncomingCheque and IncomingBoE), and payment advice notes (i.e., PaymentAdvice)), Due Item Processing (e.g., for payments of receivables and payables (i.e., DuePayment). A PaymentExplanation is embedded by a 1:c—composition into the host object.

PaymentExplanation can contain the reason/reasons for a payment in one of the following forms: an unstructured form as user-defined text (i.e., for example, rental payment for February), a structured form using one or more references to business documents (i.e., such as contracts, invoices, or credit memos). In some implementations, PaymentExplanation is a dependent object and therefore does not have any service interfaces. It always belongs to the host object. PaymentExplanation can be represented by the root node PaymentExplanation.

PaymentExplanation Dependent Object (Root Node)

The Dependent Object PaymentExplanation 143012 is an explanation of a payment with reference to one or more business documents, for example, contracts, invoices, credit memos, or sales orders. A PaymentExplanation may contain multiple items that break down the payment amounts for each business document. The elements located directly at the PaymentExplanation node are defined by the PaymentExplanationElements data type. In certain implementations, these elements may include: UUID, PaymentAmount, TotalGrossAmount, TotalCashDiscountAmount. UUID is an universal identifier, which may be unique, of PaymentExplanation. UUID may be based on GDT UUID. PaymentAmount is the payment amount. PaymentAmount may be based on GDT Amount and, in some implementations, can have a Qualifier of Payment. TotalGrossAmount is the gross amount of all paid and allocated business documents (e.g., without deduction of cash discount) and is optional. TotalGrossAmount may be based on GDT Amount and, in some implementations, can have a Qualifier of Gross. TotalCashDiscountAmount is the total of cash discount amounts for all paid and allocated business documents and is optional. TotalCashDiscountAmount may be based on GDT Amount and, in some implementations, can have a Qualifier of CashDiscount.

In a PaymentExplanation node there is/are either one or more Item node(s) or one or more NoteToPayee node(s).

There may be a number of composition relationships to subordinate nodes including: Item 143014 may have a cardinality of 1:cn, and NoteToPayee 143016 may have a cardinality of 1:cn.

Item is a payment explanation item that contains the payment amount and information used to identify a business document (for example, contract, invoice, credit memo, or sales order) that has initiated the payment transaction. The elements located directly at the PaymentExplanationItem node are defined by the PaymentExplanationItemElements data type. In certain implementations, this may include: UUID, ID, CompanyUUID, CompanyID, BusinessPartnerInternalUUID, BusinessPartnerInternalID, OriginalDocumentDate, PaymentBaseBusinessTransactionTypeCode, TradeReceivablesPayablesRegisterItemTypeCode, OffsettingIndicator, NetAmount, GrossAmount, OriginalDocumentCurrencyGrossAmount, CashDiscountAmount, OriginalDocumentCurrencyCashDiscountAmount, WithholdingTaxAmount, BankFeeAmount, TotalDeductionAmount, ScandinavianPaymentReferenceID, SwissPaymentReferenceID, Note, InternalInvoiceReference. BusinessTransactionDocumentReference, BusinessTransactionDocumentTypeCode, ExternalInvoiceReference, BusinessTransactionDocumentReference, BusinessTransactionDocumentTypeCode, InternalContractReference, BusinessTransactionDocumentReference, BusinessTransactionDocumentTypeCode, ExternalContractReference, BusinessTransactionDocumentReference, BusinessTransactionDocumentTypeCode, InternalPurchaseOrderReference, ExternalPurchaseOrderReference. UUID is an universal identifier, which may be unique, of PaymentExplanation. UUID may be based on GDT UUID. ID is an identification of a PaymentExplanationItem in the context of a higher-level object or a payment. This ID may uniquely identifies a PaymentExplanationItem together with the ID of the higher-level object or the payment ID. ID may be based on GDT PaymentExplanationItemID. CompanyUUID is a technical key of the company to which the business document belongs that is the basis for entering the payment transaction in the system and is optional. CompanyUUID may be based on GDT UUID. CompanyID is an internal identifier of the company to which the business document belongs that is the basis for entering the payment transaction in the system and is optional. CompanyID may be based on GDT OrganisationalCentreID. BusinessPartnerInternalUUID is a technical key of the business partner that is involved in the payment transaction as the second party in addition to the company named in CompanyUUID and is optional. BusinessPartnerInternalUUID may be based on GDT UUID. BusinessPartnerInternalID is an internal identification of the business partner that is involved in the payment transaction as the second party in addition to the company named in CompanyUUID and is optional. BusinessPartnerInternalID may be based on GDT BusinessPartnerInternalID. OriginalDocumentDate is the date of the business document to which the PaymentExplanationItem refers and is optional. OriginalDocumentDate may be based on GDT Date and, in some implementations, can have a Qualifier of Document. PaymentBaseBusinessTransactionTypeCode is the coded representation of the type of a business transaction that is based on a payment transaction from the view of PaymentProcessing and is optional. There are not restrictions. PaymentBaseBusinessTransactionTypeCode may be based GDT PaymentBaseBusinessTransactionTypeCode. TradeReceivablesPayablesRegisterItemTypeCode is a TradeReceivablesPayablesRegisterItemTypeCode is the coded representation of the type of a trade receivable or payable and is optional. Restrictions may include: only the codes 1 (i.e., invoice), 2 (i.e., credit memo) and 3 (i.e., down payment request) are allowed. TradeReceivablesPayablesRegisterItemTypeCode GDT TradeReceivablesPayablesRegisterItemTypeCode. OffsettingIndicator specifies whether the amounts of this PaymentExplanationItem are offset with other PaymentExplanationItems on the same level or whether these amounts are included additively in the total amounts and is optional. OffsettingIndicator may be based on GDT Indicator and, in some implementations, can have a Qualifier of Offsetting. NetAmount is the paid or collected amount and is optional. NetAmount may be based GDT Amount and, in some implementations, can have a Qualifier of Net. GrossAmount is the amount of the business document to which the PaymentExplanationItem refers, for example, invoice amount or amount of the loan contract and is optional. GrossAmount may be based on GDT Amount and, in some implementations, can have a Qualifier of Gross. OriginalDocumentCurrencyGrossAmount is amount of the business document in transaction currency and is optional. OriginalDocumentCurrencyGrossAmount may be based on GDT Amount and, in some implementations, can have a Qualifier of Gross. CashDiscountAmount is the deducted cash discount and is optional. CashDiscountAmount may be based on GDT Amount and, in some implementations, can have a Qualifier of CashDiscount. OriginalDocumentCurrencyCashDiscountAmount is the cash discount amount in transaction currency and is optional. OriginalDocumentCurrencyCashDiscountAmount may be based on GDT Amount and, in some implementations, can have a Qualifier of CashDiscount. WithholdingTaxAmount is the deducted withholding tax and is optional. WithholdingTaxAmount may be based on GDT Amount and, in some implementations, can have a Qualifier of WithholdingTax. BankFeeAmount is the deducted bank fees and is optional. BankFeeAmount may be based on GDT Amount and, in some implementations, can have a Qualifier of Fee. TotalDeductionAmount is the total amount of all deducted amounts and is optional. TotalDeductionAmount may be based on GDT Amount and, in some implementations, can have a Qualifier of Deduction. ScandinavianPaymentReferenceID is the payment reference common in Scandinavia and is optional. ScandinavianPaymentReferenceID may be based on GDT PaymentReferenceID and, in some implementations, can have a Qualifier of Scandinavian. SwissPaymentReferenceID is the payment reference common in Switzerland (ISR reference) and is optional. SwissPaymentReferenceID may be based on GDT PaymentReferenceID and, in some implementations, can have a Qualifier of Swiss. Note is the user-defined text that explains the payment and the deducted amounts and is optional. Note may be based on GDT Note. InternalInvoiceReference is the identification of the invoice by the company named in CompanyUUID and is optional. InternalInvoiceReference may not be used for navigation. If it is a company initiated payment, this field can be for information only. For business partner initiated payments, this reference is used during clearing. BusinessTransactionDocumentReference is a reference to the business document. BusinessTransactionDocumentReference may be based on GDT BusinessTransactionDocumentReference. BusinessTransactionDocumentTypeCode is the type of the business document (i.e., customer invoice or vendor invoice) and is optional. BusinessTransactionDocumentTypeCode may be based on GDT BusinessTransactionDocumentTypeCode, only the codes SupplierInvoice (i.e., 143) and CustomerInvoice (i.e., 031) are used. ExternalInvoiceReference is an identification of the invoice of the business partner named in BusinessPartnerInternalID and is optional. ExternalInvoiceReference may not be used for navigation. If it is a company initiated payment, this field can be for information only. For business partner initiated payments, this reference can be used during clearing. BusinessTransactionDocumentReference is a reference to the business document. BusinessTransactionDocumentReference may be based on GDT BusinessTransactionDocumentReference. BusinessTransactionDocumentTypeCode is a type of the business document (i.e., customer invoice or vendor invoice) and is optional. BusinessTransactionDocumentTypeCode may be based on GDT BusinessTransactionDocumentTypeCode, only the codes SupplierInvoice (i.e., 143) and CustomerInvoice (i.e., 031) are used. InternalContractReference is an identification of the contract by the company named in CompanyUUID and is optional. InternalContractReference may not be used for navigation. If it is a company initiated payment, this field can be for information only. For business partner initiated payments, this reference can be used during clearing. BusinessTransactionDocumentReference is the reference to the business document. BusinessTransactionDocumentReference may be based on GDT BusinessTransactionDocumentReference. BusinessTransactionDocumentTypeCode is a type of the business document and is optional. BusinessTransactionDocumentTypeCode may be based on GDT BusinessTransactionDocumentTypeCode, only the codes SalesContract (i.e., 002) and PurchasingContract (i.e., 120) are used. ExternalContractReference is an identification of the contract of the business partner named in BusinessPartnerInternalID and is optional. ExternalContractReference may not be used for navigation. If it is a company initiated payment, this field can be for information only. For business partner initiated payments, this reference can be used during clearing. BusinessTransactionDocumentReference is a reference to the business document. BusinessTransactionDocumentReference may be based on GDT BusinessTransactionDocumentReference. BusinessTransactionDocumentTypeCode is the type of the business document and is optional. BusinessTransactionDocumentTypeCode may be based on GDT BusinessTransactionDocumentTypeCode, only the codes SalesContract (i.e., 002) and PurchasingContract (i.e., 120) are used. InternalPurchaseOrderReference is an identification of the purchase order by the company named in CompanyUUID and is optional. InternalPurchaseOrderReference may not be used for navigation. If it is a company initiated payment, this field can be for information only. For business partner initiated payments, this reference can be used during clearing. InternalPurchaseOrderReference may be based on GDT BusinessTransactionDocumentReference. ExternalPurchaseOrderReference is an identification of the purchase order of the business partner named in BusinessPartnerInternalID and is optional. ExternalPurchaseOrderReference may not be used for navigation. If it is a company initiated payment, this field can be for information only. For business partner initiated payments, this reference can be used during clearing may be based on GDT BusinessTransactionDocumentReference.

There may be a number of composition relationships to subordinate nodes including: ItemPaymentDifferenceExplanation 143018 may have a cardinality of 1:cn, and ItemCentralBankReport 143020 may have a cardinality of 1:cn.

There may be a number of Inbound Association Relationships including: 1) From business object Company/node Company as follows. Company may have a cardinality of c:cn and associates the company to which the business document belongs. 2) From business object BusinessPartner/node BusinessPartner as follows. BusinessPartner may have a cardinality of c:cn and associates the business partner that is involved in the payment transaction as the second party in addition to the company named in CompanyUUID.

The (i.e., Specialization) associations for navigation may include the action check. Check checks if a PaymentExplanationItem is complete (i.e., no data missing) and consistent (i.e., free of errors). The preconditions may allow that this action is always allowed. Changes to the object may be defined as: no further changes to the attributes of the dependent object. This action hands over messages resulting from checks to the ESI message framework. There may not be parameters. The usage may be defined as: this action can be intended to be called either by the user from UI or by an automatic check in XML inbound.

ItemPaymentDifferenceExplanation contains a reason for the difference between the expected and the actual payment amount for an item. The expected payment amount refers to the amount of the referenced business document, for example, the invoice minus discount and withholding tax. The elements located directly at the ItemPaymentDifferenceExplanation node are defined by the PaymentExplanationItemPaymentDifferenceExplanationElements data type. In certain implementations, these elements may include: UUID, ReasonCode, OffsettingIndicator, Amount, InternalInvoiceReference, BusinessTransactionDocumentReference, BusinessTransactionDocumentTypeCode, ExternalInvoiceReference, BusinessTransactionDocumentReference, BusinessTransactionDocumentTypeCode, InternalContractReference, BusinessTransactionDocumentReference, BusinessTransactionDocumentTypeCode, ExternalContractReference, BusinessTransactionDocumentReference, BusinessTransactionDocumentTypeCode, InternalPurchaseOrderReference, ExternalPurchaseOrderReference. UUID is a universal identifier, which may be unique, of ItemPaymentDifferenceExplanation. UUID may be based on GDT UUID. ReasonCode is the code for the reason of the payment difference and is optional. There might not be restrictions. ReasonCode may be based on GDT PaymentDifferenceReasonCode. OffsettingIndicator specifies whether the difference amount is offset with other PaymentDifferenceExplanationItems on the same level or whether this amount is included additively in an amount at the level Item and is optional. Amount is the amount of the adjustment of a payment (i.e., in payment currency). Amount may be based on GDT Amount. InternalInvoiceReference is an identification of the invoice by the company named in CompanyUUID and is optional. InternalInvoiceReference is not used for navigation. If it is a company initiated payment, this field can be for information only. For business partner initiated payments, this reference can be used during clearing. BusinessTransactionDocumentReference is a reference to the business document. BusinessTransactionDocumentReference may be based on GDT BusinessTransactionDocumentReference. BusinessTransactionDocumentTypeCode is a type of the business document (i.e., customer invoice or vendor invoice) and is optional. BusinessTransactionDocumentTypeCode may be based on GDT BusinessTransactionDocumentTypeCode, only the codes SupplierInvoice (i.e., 143) and CustomerInvoice (i.e., 031) are used. ExternalInvoiceReference is an identification of the invoice of the business partner named in BusinessPartnerInternalID and is optional. ExternalInvoiceReference might not be used for navigation. If it is a company initiated payment, this field can be for information only. For business partner initiated payments, this reference ca be used during clearing. BusinessTransactionDocumentReference is a reference to the business document. BusinessTransactionDocumentReference may be based on GDT BusinessTransactionDocumentReference.

BusinessTransactionDocumentTypeCode is the type of the business document (i.e., customer invoice or vendor invoice). BusinessTransactionDocumentTypeCode may be based on GDT BusinessTransactionDocumentTypeCode, only the codes SupplierInvoice (i.e., 143) and CustomerInvoice (i.e., 031) are used. InternalContractReference is an identification of the contract by the company named in CompanyUUID and is optional. InternalContractReference might not be used for navigation. If it is a company initiated payment, this field can be for information only. For business partner initiated payments, this reference can be used during clearing. BusinessTransactionDocumentReference is a reference to the business document. BusinessTransactionDocumentReference may be based on GDT BusinessTransactionDocumentReference. BusinessTransactionDocumentTypeCode is a type of the business document and is optional. BusinessTransactionDocumentTypeCode may be based on GDT BusinessTransactionDocumentTypeCode, only the codes SalesContract (i.e., 002) and PurchasingContract (i.e., 120) are used. ExternalContractReference is an identification of the contract of the business partner named in BusinessPartnerInternalID and is optional. ExternalContractReference might not be used for navigation. If it is a company initiated payment, this field can be for information only. For business partner initiated payments, this reference can be used during clearing. BusinessTransactionDocumentReference is a reference to the business document. BusinessTransactionDocumentReference may be based on GDT BusinessTransactionDocumentReference.

BusinessTransactionDocumentTypeCode is the type of the business document and is optional. BusinessTransactionDocumentTypeCode may be based on GDT BusinessTransactionDocumentTypeCode, the codes SalesContract (i.e., 002) and PurchasingContract (i.e., 120) are used. InternalPurchaseOrderReference is identification of the purchase order by the company named in CompanyUUID and is optional. InternalPurchaseOrderReference might not be used for navigation. If it is a company initiated payment, this field is can be information only. For business partner initiated payments, this reference can be used during clearing. InternalPurchaseOrderReference may be based on GDT BusinessTransactionDocumentReference. ExternalPurchaseOrderReference is identification of the purchase order of the business partner named in BusinessPartnerInternalID and is optional. ExternalPurchaseOrderReference might not be used for navigation. If it is a company initiated payment, this field can be for information only. For business partner initiated payments, this reference can be used during clearing. ExternalPurchaseOrderReference may be based on GDT BusinessTransactionDocumentReference.

An ItemPaymentDifferenceExplanation node can reference an item in the document to which the higher-level item refers. For example, deductions may only be specified for an item in the invoice that is assigned and paid in the higher-level item.

The actions may include Check. Check checks if an ItemPaymentDifferenceExplanation is complete (i.e., no data missing) and consistent (i.e., free of errors). There may not be preconditions; this action may be allowed. Changes to the object may be defined as: no further changes to the attributes of the dependent object. This action hands over messages resulting from checks to the ESI message framework. There may not be parameters. The usage may be defined as: This action can be intended to be called either by the user from UI or by an automatic check in XML inbound.

ItemCentralBankReport is an Individual report to the central bank regarding a foreign payment. The elements located directly at the ItemCentralBankReport node are defined by the PaymentExplanationItemCentralBankReportElements data type. In certain implementations, these elements may include: SupplyingCountryCode, Amount, ReasonClassificationCode, ReasonCode, ReasonDescription. SupplyingCountryCode is the country of delivery, in other words, the country in which the activity was performed or from which the goods were delivered and to which the payment was made and is optional. There may not be restrictions. SupplyingCountryCode may be based on GDT CountryCode. Amount is the amount to be reported. Amount may be based on GDT Amount. ReasonClassificationCode is the coded representation of the classification of the reason for notification and is optional. There may not be restrictions. ReasonClassificationCode may be based on GDT CentralBankReportReasonClassificationCode. ReasonCode is the coded representation of the reason for notification, for example, key figure according to national service specifications and is optional. There may not be restrictions. ReasonCode may be based on GDT CentralBankReportReasonCode. ReasonDescription is the description of the reason for notification and is optional. ReasonDescription may be based on GDT Description and, in some implementations, can have a Qualifier of Reason.

The total amount from all ItemCentralBankReport should not exceed the amount of the higher-level item. The actions may include: Check. Check checks if a ItemCentralBankReport is complete (no data missing) and consistent (free of errors). The may not be preconditions; This action is always allowed. The changes to the object: No further changes to the attributes of the dependent object. This action hands over messages resulting from checks to the ESI message framework. There may not be parameters. The usage may be defined as: this action can be intended to be called either by the user from UI or by an automatic check in XML inbound.

NoteToPayee is a text field line for a PaymentExplanation containing information used to identify a business document that has been paid or offset (for example, invoice, credit memo, contract, or sales order). The elements located directly at the PaymentExplanationNoteToPayee node are defined by the PaymentExplanationNoteToPayeeElements data type. In certain implementations these elements may include: Note. Note is a user-defined text that explains the payment. Note may be based on GDT Note.

Position Business Object

FIG. 144-1 through 144-4 illustrates an example Position business object model 144006. Specifically, this model depicts interactions among various hierarchical components of the Position, as well as external components that interact with the Position (shown here as 144000 through 144004 and 144008 through 144024).

A Position is an organizational element within the organizational plan of an enterprise. It can combine tasks, competencies and responsibilities permanently that can be taken care of by one or more suitable employees. If there are multiple employees assigned to a position they will share the same tasks, competencies and responsibilities. The business object Position is part of the process component Organizational Management. A position can be assigned to an organizational center and include the target value number of full time equivalents as well as the assignments of employees. A position can exist in one, inactive, not operationally used version that is currently being changed. This version can be mapped using the StagingArea and replicates all components of the active operationally used version that are not purely calculated. Both the components of the active and the inactive version can be time-dependent and thus include the plan for as well as the history of a position. Position can be represented by the root node Root. A position 144026 is an organizational element within the organizational plan of an enterprise. It can combine tasks, competencies and responsibilities permanently that can be taken care of by one or more suitable employees. If there are multiple employees assigned to a position they may share the same tasks, competencies and responsibilities. The elements located directly at the node Position are defined by the type GDT: PositionElements. In certain implementations, these may include: UUID, ID, ValidityPeriod. UUID is the global identifier, which may be unique, of the Business Object. UUID may be based on GDT UUID. ID is a semantic key of the Position. ID may be based on GDT PositionID. ValidityPeriod is the period during which the position exists. ValidityPeriod may be based on GDT CLOSED_DatePeriod (e.g., StartDate and EndDate), and has a Qualifier: Validity.

The following filtered composition relationships to subordinate nodes exist: Description has a cardinality relationship of 1:cn. The filter has the data type ValidityPeriodFilterElements. These elements are: StartDate and is optional, the start date of the time window that is used to determine the valid nodes and is of the type GDT: Date, EndDate and is optional, the end date of the time window that is used to determine the valid nodes and is of the type GDT: Date, MostRecentIndicator, if the MostRecentIndicator is set, it indicates that the last valid data are requested. For determining the last valid node, the following approach is used: If the current date (the date at which the request is made) lies prior to the StartDate of the filter, no nodes will be returned; if the current date lies between StartDate and EndDate or is equal to the EndDate, the current node (the node that is valid at the current date or whose end date is closest to the current date) is determined; if the current date lies after the EndDate, the node whose end date is closest to the requested end date is determined, and is of the type GDT: Indicator, and has a Qualifier: MostRecent. There may exist a FullTimeEquivalentWorkingTime 144032 that has a cardinality relationship 1:cn. The filter has the data type ValidityPeriodFilterElements. There may exist a TargetHeadcount 144036 that has a cardinality relationship of 1:cn. The filter has the data type ValidityPeriodFilterElements. There may exist a OpenHeadcount 144034 that has a cardinality relationship of 1:cn. The filter has the data type ValidityPeriodFilterElements. There may exist a Organisational- CentreAssignment 144038 that has a cardinality relationship of 1:cn. The filter has the data type ValidityPeriodFilterElements. There may exist a StaffedOrganisationalCentreAssignment 144048 that has a cardinality relationship of 1:cn. The filter has the data type ValidityPeriodFilterElements. There may exist a EmployeeAssignment 144040 that has a cardinality relationship of 1:cn. The filter has the data type ValidityPeriodFilterElements. There may exist a JobAssignment 144042 that has a cardinality relationship of 1:cn. The filter has the data type ValidityPeriodFilterElements. There may exist a OrganisationalCentreAssignment that has a cardinality relationship of 1:cn. The filter has the data type PositionOrganisationalCentreAssignmentFilterElements. These elements are: StartDate and is optional, is the start date of the time window that is used to determine the valid nodes, and is of the type GDT: Date, EndDate and is optional, is the end date of the time window that is used to determine the valid nodes, and is of the type GDT: Date, MostRecentIndicator which determines which elements should be returned as described within GDT PositionOrganisationalCentreAssignmentFilterElements, and is of the type GDT: Indicator, and has a Qualifier: MostRecent, BusinessCharacterCode, setting the BusinessCharacterCode filter determines which business role should be taken into account and is of the type GDT: ORGANISATIONALCENTRE_PartyBusinessCharacterCode, OrganisationalFunctionCode, and is optional, setting the OrganisationalFunctionCode filter determines that functional units with the given organisational function should be taken into account, and is of the type GDT: OrganisationalFunctionCode, FunctionalUnitRoleCode, and is optional, setting the FunctionalUnitRoleCode filter determines which functional unit role should be taken into account, and is of the type GDT: FunctionalUnitRoleCode.

ReportingLineUnitWithStaffedManagingPositionAssignment 144046 has a cardinality relationship of 1:cn. The filter has the data type ValidityPeriodFilterElements. StagingArea 144028 has a cardinality relationship of 1:c. There may exist a Root node of Business Object Company, including a SuperordinateCompany that has a cardinality of c:cn and determines the superordinate company that is assigned to a Position via its StaffedOrganisationalCentreAssignment and the filter has the data type ValidityPeriodFilterElements. There may exist a Root node of Business Object PermanentEstablishment, including SuperordinatePermanentEstablishment that has a cardinality of c:cn and determines the superordinate permanent establishment that is assigned to a Position via its StaffedOrganisationalCentreAssignment, and the filter has the data type ValidityPeriodFilterElements. There may exist a Root node of Business Object CostCentre, including SuperordinateCostCentre that has a cardinality of c:cn and determines the superordinate cost centre that is assigned to a Position via its StaffedOrganisationalCentreAssignment, and the filter has the data type ValidityPeriodFilterElements. There may exist a Root node of Business Object ReportingLineUnit, including SuperordinateReportingLineUnit that has a cardinality of c:cn, and determines the superordinate reporting line unit that is assigned to a Position via its StaffedOrganisationalCentreAssignment, and the filter has the data type ValidityPeriodFilterElements. There may exist a Root node of Business Object Programme, including SuperordinateProgramme that has a cardinality of c:cn, and determines the superordinate programme that is assigned to a Position via its StaffedOrganisationalCentreAssignment, and the filter has the data type ValidityPeriodFilterElements.

There may exist a Root node of Business Object FunctionalUnit, including Superordinate FunctionalUnit, that has a cardinality of c:cn, and determines the superordinate programme that is assigned to a Position via its StaffedOrganisationalCentreAssignment, and the filter has the data type PositionSuperordinateFunctionalUnitFilterElements. These elements are: StartDate, and is optional, and is the start date of the time window that is used to determine the valid nodes, and is of the type GDT: Date, EndDate, and is optional, and is the end date of the time window that is used to determine the valid nodes, and is of the type GDT: Date, MostRecentIndicator, and determines which elements should be returned as described within GDT PositionOrganisationalCentreAssignmentFilterElements, and is of the type GDT: Indicator, and has a Qualifier: MostRecent, OrganisationalFunctionCode, and is optional, setting the OrganisationalFunctionCode filter determines that functional unit with the given organisational function should be taken into account, and is of the type GDT: OrganisationalFunctionCode, FunctionalUnitRoleCode, and is optional, setting the FunctionalUnitRoleCode filter determines which functional unit role should be taken into account, and is of the type GDT: FunctionalUnitRoleCode.

A QueryByElements query returns a list of all positions within a validity period that have an ID which matches with the pattern given in the query elements. The query elements are defined by the data type PositionByElementsQueryElements. These elements are: ID and is optional, and is the IDs of the requested Positions, and is of type GDT: PositionID, ValidityPeriod, and is optional, and is the time frame that is used for the query. A position is selected, if its validity period intersects at least one day with the ValidityPeriod, and is of type GDT: CLOSED_DatePeriod, and has a Qualifier: Validity, Description, and is optional, is (or subset of the description) of the requested Positions, and is of type GDT: Description, and has a Qualifier LONG, CompanyUUID, and is optional, and a Position is selected if the UUID of its superordinate company matches the given UUID for at least one day of the requested ValidityPeriod, and is of type GDT: UUID, Company_ID, and is optional, and a Position is selected if the ID of its superordinate company matches the given ID for at least one day of the requested ValidityPeriod, and is of type GDT: OrganisationalCentreID, PermanentEstablishmentUUID, and is optional, a Position is selected if the UUID of its superordinate permanent establishment matches the given UUID for at least one day of the requested ValidityPeriod, and is of type GDT: UUID, PermanentEstablishment_ID, and is optional, a Position is selected if the ID of its superordinate permanent establishment matches the given ID for at least one day of the requested ValidityPeriod, and is of type GDT: OrganisationalCentreID, CostCentreUUID, and is optional, a Position is selected if the UUID of its superordinate cost centre matches the given UUID for at least one day of the requested ValidityPeriod, and is of type GDT: UUID, CostCentre_ID, and is optional, and a Position is selected if the ID of its superordinate cost centre matches the given ID for at least one day of the requested ValidityPeriod, and is of type GDT: OrganisationalCentreID, FunctionalUnitUUID, and is optional, and a Position is selected if the UUID of its superordinate functional unit matches the given UUID for at least one day of the requested ValidityPeriod, and is of type GDT: UUID, FunctionalUnit_ID, and is optional, and a Position is selected if the ID of its superordinate functional unit matches the given ID for at least one day of the requested ValidityPeriod, and is of type GDT: OrganisationalCentreID, ReportingLineUnitUUID, and is optional, and a Position is selected if the UUID of its superordinate reporting line unit matches the given UUID for at least one day of the requested ValidityPeriod, and is of type GDT: UUID, ReportingLine- Unit_ID, and is optional, and a Position is selected if the ID of its superordinate reporting line unit matches the given ID for at least one day of the requested ValidityPeriod, and is of type GDT: OrganisationalCentreID, ProgrammeUUID, and is optional, and a Position is selected if the UUID of its superordinate programme matches the given UUID for at least one day of the requested ValidityPeriod, and is of type GDT: UUID, Programme_ID, and is optional, and a Position is selected if the ID of its superordinate programme matches the given ID for at least one day of the requested ValidityPeriod and is of type GDT: OrganisationalCentreID, Employee-UUID, and is optional, and a Position is selected if the employee with the given UUIDs is assigned to it for at least one day of the requested ValidityPeriod, and is of type GDT: UUID, Employee_ID, and is optional, and a Position is selected if the employee with the given IDs is assigned to it for at least one day of the requested ValidityPeriod, and is of type GDT: EmployeeID, JobUUID, and is optional, and a Position is selected if the job with the given UUIDs is assigned to it for at least one day of the requested ValidityPeriod, and is of type GDT: UUID, Job_ID, and is optional, and a Position is selected if the job with the given IDs is assigned to it for at least one day of the requested ValidityPeriod, and is of type GDT: JobID, ReportingLineUnitManagingEmployeeUUID, and is optional, and a Position is selected if the employee with the given UUID holds the managing position of the superordinate reporting line unit for at least one day of the requested ValidityPeriod. The determination is in sync with the algorithm for node ReportingLineUnitWithStaffed-ManagingPositionAssignment, and is of type GDT: UUID, ReportingLineUnitManagingEmployee ID, and is optional, and a Position is selected if the employee with the given ID holds the managing position of the superordinate reporting line unit for at least one day of the requested ValidityPeriod. The determination is in sync with the algorithm for node ReportingLineUnitWithStaffed-ManagingPositionAssignment, and is of type GDT: EmployeeID, StaffedOrganisationalCentreUUID, and is optional, and a Position is selected if the organisational centre with the given UUID is the staffed organisational centre of the position for at least one day of the requested ValidityPeriod, and is of type GDT: UUID, StaffedOrganisationalCentre_ID, and is optional, and a Position is selected if the organisational centre with the given ID is the staffed organisational centre of the position for at least one day of the requested ValidityPeriod, and is of type GDT: OrganisationalCentreID. Description 144030 is the description of a position during a validity period. The elements located directly at the Description node are defined by the type GDT: PositionDescriptionElements. In certain implementations, these elements may include: ValidityPeriod, Description. ValidityPeriod is the validity period of the description. ValidityPeriod may be based on GDT CLOSED_DatePeriod, Qualifier: Validity. Description is the description of a position in a language defined by the languageCode attribute and may be based on GDT Description, Qualifier LONG. One description may be assigned to a position for each language at any one time, in some implementations.

A TargetHeadcount is the target head count of a position during a validity period. The target head count can be the target value for the number of fulltime equivalents of a position. The elements located directly at the TargetHeadcount node are defined by the type GDT: PositionTargetHeadcountElements. In certain implementations, these may include: ValidityPeriod, TargetHeadCountQuantity. ValidityPeriod is the validity period of the target head count. ValidityPeriod may be based on GDT CLOSED_DatePeriod and has a Qualifier: Validity. TargetHeadCountQuantity is the target value for the number of fulltime equivalents (e.g., unitCode: Person) of a position. TargetHeadCountQuantity may be based on GDT Quantity. At any given point in time, one target head count may be assigned to a position in some implementations.

An OpenHeadcount shows the difference between the TargetHeadcount of an position and the really assigned number of fulltime equivalents during a validity period. The elements located directly at the OpenHeadcount node are defined by the type GDT: PositionOpenHeadcountElements. In certain implementations, these may include: ValidityPeriod, Quantity. ValidityPeriod is the validity period of the open head count. ValidityPeriod may be based on GDT CLOSED_DatePeriod, Qualifier: Validity. Quantity is the value for the number of open fulltime equivalents (e.g., unitCode: Person) of a position. Quantity may be based on GDT Quantity. At any given point in time, one open head count node may be assigned to a position in some implementations. The node can be read (read-only) in some implementations.

A StaffedOrganisationalCentreAssignment links a Position with the OrganisationalCentre that is staffed with the head count on this position. In particular, this may define which OrganisationalCentre the personnel on the given position is assigned to. The node can contain the OrganisationalCentre which is directly linked to the Position. The elements located directly at the StaffedOrganisationalCentreAssignment node can be defined by the type GDT: PositionStaffedOrganisationalCentreAssignmentElements. In certain implementations, this may include: ValidityPeriod, OrganisationalCentreUUID. The ValidityPeriod is the validity period of the assignment of to the staffed organisational centre. ValidityPeriod may be based on GDT CLOSED_DatePeriod and have a Qualifier: Validity. The OrganisationalCentreUUID points to the organisational centre that is staffed with the head count on this position. OrganisationalCentreUUID may be based on GDT UUID. There may exist Inbound Aggregation Relationships: From the business object OrganisationalCentre/node Root, StaffedOrganisationalCentre has a cardinality relationship of 1:cn and specifies the organizational center which is staffed by a given position. One organisational center may be staffed by a position at any given point in time in some implementations.

A EmployeeAssignment is the assignment of an employee to a position during a validity period. The elements located directly at the PositionEmployeeAssignment node are defined by the type GDT: PositionEmployeeAssignmentElements. In certain implementations, this may include: UUID, ValidityPeriod, FullTimeEquivalentPortionQuantity, EmployeeUUID. The UUID is the globally unique assignment of an employee to a position. UUID may be based on GDT UUID. The ValidityPeriod is the validity period of the assignment of an employee. ValidityPeriod may be based on GDT CLOSED_DatePeriod, Qualifier: Validity. The FullTimeEquivalentPortionQuantity is the assigned portion of the working time of the assigned employee in fulltime equivalent (e.g., unitCode: Person) and is optional. FullTimeEquivalentPortionQuantity may be based on GDT Quantity and has aQualifier: Portion. The EmployeeUUID refers to the assigned employee. EmployeeUUID may be based on GDT UUID. The node can be read (i.e., read-only) in some implementations. There may exist Inbound Aggregation Relationships: From the business object Employee/node Root, PositionEmployeeAssignment has a cardinality relationship of 1:cn and specifies the employee that is assigned to the position.

A JobAssignment is the assignment of a job description to a position during a validity period. The elements located directly at the JobAssignment node are defined by the type GDT: PositionJobAssignmentElements. In certain implementations, this may include: ValidityPeriod, JobUUID. The ValidityPeriod is the validity period of the assignment to a job description. ValidityPeriod may be based on GDT CLOSED_DatePeriod and have a Qualifier: Validity. The JobUUID refers to the job description that is assigned to the given position. JobUUID may be based on GDT UUID. One job description may be assigned to a position at any given point in time. The node can only be read (i.e., read-only) in some implementations. There may exist Inbound Aggregation Relationships From the business object Job/node Root, Job has a cardinality relationship of 1:n and specifies the job description to which a position is assigned.

An OrganisationalCentreAssignment is the assignment of the first superordinate OrganisationalCentre that carries a given business role to a position within a validity period. The elements located directly at the OrganisationalCentreAssignment node are defined by the type GDT: OrganisationalCentreAssignmentElements. In certain implementations, this may include: BusinessCharacterCode, OrganisationalFunctionCode, FunctionalUnitRoleCode, ValidityPeriod, OrganisationalCentreUUID. Setting the BusinessCharacterCode filter determines which business role should be taken into account. BusinessCharacterCode may be based on GDT ORGANISATIONALCENTRE_Party-BusinessCharacterCode. Setting the OrganisationalFunctionCode filter determines that functional units with the given organisational function should be taken into account and is optional. OrganisationalFunctionCode may be based on GDT OrganisationalFunctionCode. Setting the FunctionalUnitRoleCode filter determines which functional unit role should be taken into account and is optional. FunctionalUnitRoleCode may be based on GDT FunctionalUnitRoleCode. The ValidityPeriod is the validity period of the assignment to a job description. ValidityPeriod may be based on GDT CLOSED_DatePeriod and have a Qualifier: Validity. The OrganisationalCentreUUID refers to the first superordinate OrganisationalCentre that carries a given business role assigned to the given position. OrganisationalCentreUUID may be based on GDT UUID. There may exist Inbound Aggregation Relationships: From the business object Company/node RootCompany has a cardinality relationship of c:cn and points to the superordinate company, From the business object PermanentEstablishment/node Root, PermanentEstablishment has a cardinality relationship of c:cn and points to the superordinate permanent establishment, From the business object CostCentre/node Root, CostCentre has a cardinality relationship of c:cn and points to the superordinate cost centre, From the business object Programme/node Root, Programme has a cardinality relationship of c:cn and points to the superordinate programme, From the business object FunctionalUnit/node Root, FunctionalUnit has a cardinality relationship of c:cn and points to the superordinate functional unit, and From the business object ReportingLineUnit/node Root, ReportingLineUnit has a cardinality relationship of c:cn and points to the superordinate reporting line unit. There may exist Integrity conditions such that the node can only be read (read-only) and at each given point in time, the Position may only be assigned to one OrganisationalCentre of each business role in some implementations. If the role of the superordinate OrganisationalCentre is a FunctionalUnit, the Position may point to one combination of BusinessCharacterCode, OrganisationalFunctionCode and FunctionalUnitRoleCode. At each node, only one of the inbound association relationships is active in some implementations.

A ReportingLineUnitWithStaffedManagingPositionAssignment is the assignment of the ManagingPosition of the first superordinateReportingLineUnit that has a staffed ManagingPosition, to the given Position. The elements located directly at the ReportingLineUnitWithStaffedManagingPositionAssignment node are defined by the GDT: PositionReportingLineUnitWithStaffedManagingPositionAssignmentElements. In certain implementations, this may include: ValidityPeriod, ManagedReportingLineUnitUUID, ManagingPositionUUID, ManagingEmployeeUUID. The ValidityPeriod is the validity period of the assignment to a job description. ValidityPeriod may be based on GDT CLOSED_DatePeriod and has a Qualifier: Validity. The ManagedReportingLineUnitUUID containts the UUID of the superordinate ReportingLineUnit. ManagedReportingLineUnitUUID may be based on GDT UUID. The ManagingPositionUUID contains the UUID of the superordinate ManagingPosition, ManagingPositionUUID may be based on GDT UUID. The ManagingEmployeeUUID contains the UUID of the superordinate Employee that is assigned to the given ManagingPosition. ManagingEmployeeUUID may be based on GDT UUID. There may exist Inbound Aggregation Relationships From the business object ReportingLineUnit/node Root, ManagedReportingLineUnit has a cardinality relationship of 1:cn and points to the superordinate ManagedReportingLineUnit that fulfills the criteria for this node and From the business object Position/node Root, ManagingPosition has a cardinality relationship of 1:cn, and points to the superordinate ManagingPosition that fulfills the criteria for this node and From the business object Employee/node Root, ManagingEmployee has a cardinality relationship of 1:cn and points to the superordinate ManagingEmployee that fulfills the criteria for this node. There may exist Integrity that for each given point in time, the Position may only be assigned to a single ManagingPosition of a ReportingLineUnit in some implementations. The node is transient in some implementations.

A StagingArea is the inactive version of a position for a planned validity period. When creating the StagingArea, the inactive Version of the Position's data gets higher priority. The elements located directly at the StagingArea node are defined by the type GDT: PositionStagingAreaElements. In certain implementations, this may include: ID, ValidityPeriod. The ID is a semantic key of the Position. ID may be based on GDT PositionID. The ValidityPeriod is the period during which the inactive version of the position exists. ValidityPeriod may be based on GDT CLOSED_DatePeriod and has a Qualifier: Validity. The following filtered composition relationships to subordinate nodes may exist in some implementations: StagingAreaDescription 144052 has a cardinality relationship of 1:cn and the filter has the data type PositionStagingAreaDescriptionFilterElements and these elements are: StartDate is optional and is the start date of the time window that is used to determine the valid nodes and is of type GDT: Date, and EndDate is optional and is the end date of the time window that is used to determine the valid nodes and is of type GDT: Date. StagingAreaFullTimeEquivalentWorkingTime 144054 has a cardinality relationship of 1:cn and the filter has the data type PositionStagingAreaFullTimeEquivalentWorkingTimeFilterElements and the data type has an identical structure to the data type PositionStagingAreaDescriptionFilterElements in some implementations. StagingAreaTargetHeadcount 144056 has a cardinality relationship of 1:cn and the filter has the data type PositionStagingAreaTargetHeadcountFilterElements and the data type has an identical structure to the data type PositionStagingAreaDescriptionFilterElements in some implementations. StagingAreaReportingLineUnitAssignment has a cardinality relationship of 1:cn and the filter has the data type PositionStagingAreaReportingLineUnitAssignmentFilterElements and the data type has an identical structure to the data type PositionStagingAreaDescriptionFilterElements in some implementations. StagingAreaEmployeeAssignment 144058 has a cardinality relationship of 1:cn and the filter has the data type DatentypePositionStagingAreaEmployeeAssignmentFilterElements and the data type has an identical structure to the data type PositionStagingAreaDescriptionFilterElements in some implementations. StagingAreaJobAssignment 144044 has a cardinality relationship of 1:c and the filter has the data type Datentyp PositionStagingAreaOrganisationalJobAssignmentFilterElements and the data type has an identical structure to the data type PositionStagingAreaDescriptionFilterElements in some implementations.

There may exist Enterprise Service Infrastructure Actions that Activate transfers the inactive Version of Positions to their active Version and has a prerequisite: the given Position has inactive nodes, and Resulting changes to the object that by executing the action, all inactive nodes of a Position are transferred to the active version of the Position, and the action does not provide any parameters and the action is called by the UI in some implementations.

A QueryByID query returns a list of Positions whose ID (or a subset of whose ID) matches the given ID. The query elements are defined by the data type PositionByIDQueryElements definiert. These elements are: ID is optional and is of type GDT: PositionID and is the Ids of the requested Positions, and ValidityPeriod is optional and is of type GDT: CLOSED_DatePeriod and has a Qualifier: Validity and is a time frame that is used for the query and A position is selected, if its validity period intersects at least one day with the given ValidityPeriod.

A QueryByStaffedOrganisationalCentre query returns a list of all Positions that are staffing a given OrganisationalCentre during a validity period. The query elements are defined by the data type PositionByStaffedOrganisationalCentreQueryElements definiert. These elements are: StaffedOrganisationalCentreUUID of type GDT: UUID and UUIDs of the organisational centers whose staffing positions should be returned, and ValidityPeriod is optional and is of type GDT: CLOSED_DatePeriod and has a Qualifier: Validity and a time frame that is used for the query and a position is selected, if its validity period intersects at least one day with the given ValidityPeriod.

StagingAreaDescription is the inactive version of the description of a position for a planned validity period. The elements located directly at the StagingAreaDescription node are defined by the type GDT: PositionStagingAreaDescriptionElements. In certain implementations, this may include: ValidityPeriod, Description. The ValidityPeriod is the validity period of the description. ValidityPeriod may be based on GDT CLOSED_DatePeriod, Qualifier: Validity. The Description is the description of a position in a language defined by the languageCode attribute. Description may be based on GDT Description, and have a Qualifier LONG. At any given point in time, only one description per language may be assigned to a position, in some implementations.

A StagingAreaTargetHeadcount is the inactive version of the target head count of a position for a planned validity period. The target head count can be the target value for the number of fulltime equivalents of a position. The elements located directly at the StagingAreaTargetHeadcount node are defined by the type GDT: PositionStagingAreaTargetHeadcountElements. In certain implementations, this may include: ValidityPeriod, TargetHeadcountQuantity. The ValidityPeriod is the validity period of the target head count. ValidityPeriod may be of type GDT CLOSED_DatePeriod and has a Qualifier: Validity. The TargetHeadcountQuantity is the target quantity of the number of fulltime equivalents (e.g., unitCode: Person) on a position. TargetHeadcountQuantity may be of type GDT Quantity. At any given point in time, one target head count may be assigned to a position in some implementations A StagingAreaStaffedOrganisationalCentreAssignment 144050 is the inactive version of the link of a Position to the OrganisationalCentre that is staffed with the head count on this position. The node can contains the OrganisationalCentre which is directly linked to the Position. The elements located directly at the StaffedOrganisationalCentreAssignment node are defined by the type GDT: PositionStaffedOrganisationalCentreAssignmentElements. In certain implementations, this may include: ValidityPeriod, OrganisationalCentreUUID. The ValidityPeriod is the validity period of the assignment of to the staffed organisational centre. ValidityPeriod may be based on GDT CLOSED_DatePeriod, Qualifier: Validity. The OrganisationalCentreUUID points to the organisational centre that is staffed with the head count on this position. OrganisationalCentreUUID may be based on GDT UUID. One organisational center may be staffed by a position at any given point in time in some implementations. Inbound Aggregation Relationships: From the business object OrganisationalCentre/node Root that StaffedOrganisationalCentre has a cardinality relationship of 1:cn and specifies the organizational center which is staffed by a given position.

A StagingAreaEmployeeAssignment is the inactive version of the assignment of an employee to a position during a validity period. The elements located directly at the StagingAreaEmployeeAssignment node are defined by the type GDT: PositionStagingAreaEmployeeAssignmentElements. In certain implementations, this may include: UUID, ValidityPeriod, FullTimeEquivalentPortionQuantity, EmployeeUUID. The UUID is the globally unique assignment of an employee to a position. UUID may be based on GDT UUID. The ValidityPeriod is the validity period of the assignment of an employee. ValidityPeriod may be based on GDT CLOSED_DatePeriod and has a Qualifier: Validity. The FullTimeEquivalentPortionQuantity is the assigned portion of the working time of the assigned employee in fulltime equivalent (e.g., unitCode: Person) and is optional. FullTimeEquivalentPortionQuantity may be based on GDT Quantity and has a Qualifier: Portion. The EmployeeUUID may refer to the assigned employee. EmployeeUUID may be based on GDT UUID. There may exist Inbound Aggregation Relationships From the business object Employee/node Root that PositionEmployeeAssignment has a cardinality relationship of 1:cn and specifies the employee that is assigned to the position.

A StagingAreaJobAssignment is the inactive version of the assignment of a job description to a position during a validity period. The elements located directly at the StagingAreaJobAssignment node are defined by the type GDT: PositionStagingAreaJobAssignmentElements. In certain implementations, this may include: ValidityPeriod, JobUUID. The ValidityPeriod is the validity period of the assignment to a job description. ValidityPeriod may be based on GDT CLOSED_DatePeriod and have a Qualifier: Validity. The JobUUID refers to the job description that is assigned to the given position. JobUUID may be based on GDT UUID. One job description may be assigned to a position at any given point in time in some implementations. There may exist Inbound Aggregation Relationships From the business object Job/node Root Job has a cardinality relationship of 1:n and specifies the job description to which a position is assigned.

Dependent Object: PriceAndTaxCalculation

FIG. 145 illustrates one example of an PriceAndTaxCalculation business object model 145002. Specifically, this model depicts interactions among various hierarchical components of the PriceAndTaxCalculation, as well as external components that interact with the PriceAndTaxCalculation (shown here as 145000 and 145004).

PriceAndTaxCalculation 145010 is the summary of the determined price and tax components for a business case. Projections of PriceAndTaxCalculation that can be instantiated as independent Dependent Objects include: PriceCalculation 145012, TaxCalculation 145014.

The generalization PriceAndTaxCalculation_Kernel 145006 has not been realized as a Dependent Object.

The dependent objects can be used, amongst other things, in the following process components belonging to different LDUs: Sales Order Processing, Service Order Processing, Customer Invoice Processing, Vendor Invoice Processing, Purchase Order Processing.

Both PriceAndTaxCalculation and its projections can be in the Foundation Layer.

The structure of PriceAndTaxCalculation may be displayed in the following diagram displays the structure of PriceAndTaxCalculation. For the sake of clarity, the individual parts (e.g., nodes) can be grouped semantically: common nodes for price and tax calculation, nodes that contain the results of tax calculation, nodes that contain the results of price calculation.

Common nodes of price and tax calculation for TaxCalculation and all its projections include: PriceAndTaxCalculation (e.g., contains attributes that characterize or are relevant for the whole object), Item (e.g., contains attributes that are relevant only for the document item of the higher-level object).

The result of tax calculation can be contained in the following nodes that may be available in PriceAndTaxCalculation and in the projection TaxCalculation: ProductTaxDetails and ItemProductTaxDetails (e.g., the calculated elements of a specific type of product tax), WithholdingTaxDetails and ItemWithholdingTaxDetails (e.g., the calculated elements of a specific type of withholding tax).

PriceAndTaxCalculation may not provide B2B Operations, as it can be created, changed and archived by a higher-level object.

PriceAndTaxCalculation may not provide A2A Operations, as it can be created, changed and archived by a higher-level object.

The result of tax calculation can be contained in the following nodes that may be available in PriceAndTaxCalculation and in the projection PriceCalculation:

PriceComponent and ItemPriceComponent can be pricing elements for the whole document or for a document item. The pricing elements can be structured and build on each other.

Both price and tax determination may require further information that exceeds the information provided by the elements of the modeled elements, and may be necessary for the determination and valuation. Since this data is can be managed by the higher-level object, it may not be made persistent in the PriceAndTaxCalculation and is therefore not represented in the modeling. However, this information may be available at runtime. The data can be entered in the Dependent Object via a separate API layer; Enterprise Service Infrastructure actions may not be used for this due to current technical restrictions.

Dependent Object PriceAndTaxCalculation—Node Structure

PriceAndTaxCalculation is the specification of the general procedure for price and tax determination and valuation using attributes that are characteristic or relevant for the whole object. The elements located directly at the node PriceANdTaxCalculation are defined by the data type: PriceAndTaxCalculationElements. In certain implementations, the elements may include: UUID, PropertyDefinitionClassCode, PricingProcedureCode, CurrencyCode, Status.

UUID is an identifier, which may be unique, for the object PriceAndTaxCalculation. UUID may be based on GDT UUID.

PropertyDefinitionClassCode is the property definition class for the specification of the general procedure for price and tax calculation. It can define the business area according to the functional unit in an organization in which price and tax calculation takes place, and can specify which properties are available for the price definition. PropertyDefinitionClassCode can be based on PriceSpecificationElementPropertyDefinitionClassCode.

PricingProcedureCode is the calculation procedure for price calculation. PricingProcedureCode can be based on PricingProcedureCode.

CurrencyCode is the currency in which the price and tax determination and valuation takes place. CurrencyCode can be based on GDT CurrencyCode.

Status is a description of the status and of possible actions of the entire object. Status may be based on IDT PriceAndTaxCalculationStatus. The IDT PriceAndTaxCalculationStatus can consist of the following elements: GDT: CalculationStatusCode (e.g., status that gives the information if the PriceAndTaxCalculation has been successfully completed or not), GDT: CalculationStatusCode.

The following composition relationships to subordinate nodes exist: Item 145008—1:cn, ProductTaxDetails 145016—1:cn, WithholdingTaxDetails 145020—1:cn, PriceComponent 145024—1:cn, and TaxationTerms 145028—1:c.

The following associations for navigation to subordinate nodes exist: MainPrice—1:c that is an association to PriceComponent that is marked as MainPrice, MainDiscount—1:c that is an association to PriceComponent that is marked as MainDiscount, and MainSurcharge—1:c that is an association to PriceComponent that is marked as MainSurcharge.

Enterprise Service Infrastructure Actions

Recalculate

This action carries out a new calculation of price and tax elements. It is possible to choose whether existing manual price elements should be kept or discarded. The object PriceAndTaxCalculation is re-calculated; changes can occur in all nodes. The status of the root node and/or single Item nodes can change. The action elements are defined by the data type PriceAndTaxCalculationRecalculateActionElements. These elements include PriceRecalculationTypeCode. PriceRecalculationTypeCode specifies the type of recalculation of price and tax parts and is of type GDT: PriceRecalculationTypeCode.

Calculate

This action carries out calculation of price and tax elements. If a change was done on a PriceAndTaxCalculation node (e.g. on the Item node), the change only takes effect if the Calculate action is triggered. Changes can occur in all nodes. The status of the root node and/or single Item nodes can change.

MoveToArchive

This action deletes the object from the database. The hosting object is responsible for having archived all data from the PriceAndTaxCalculation DO before. Within the next SAVE call, the object will be deleted from the database. The status of the root node and/or single Item nodes can change.

Permitted characteristic values of the element PropertyDefinitionClassCode are present can include: 1 (e.g., Purchasing), 2 (e.g., Sales/Service). The value of the element UUID may not be subsequently changed. The value of the element PropertyDefinitionClassCode may not be subsequently changed. The value of the element PricingProcedureCode may not be subsequently changed.

ProductTaxDetails

ProductTaxDetails are details determined for a specific type of product tax for the entire document. Product taxes can be taxes that are incurred for product-related business cases, such as purchasing, sales or consumption. The elements located directly at the node PriceAndTaxCalculationProductTaxDetails are defined by the data type: PriceAndTaxCalculationProductTaxDetailsElements. In certain implementations, the elements may include: UUID, TaxationCharacteristicsCode, ProductTax, TransactionCurrencyProductTax.

UUID is an identifier, which may be unique, for the object PriceAndTaxCalculation.ProductTaxDetails. UUID may be based on GDT UUID.

TaxationCharacteristicsCode is the coded representation of basic characteristics upon which the taxation of products is based and is optional. TaxationCharacteristicsCode may be based on GDT ProductTaxationCharacteristicsCode.

ProductTax are the parts of product tax determined. ProductTax may be based on GDT ProductTax.

TransactionCurrencyProductTax is the determined parts of product tax in document currency. TransactionCurrencyProductTax may be based on GDT ProductTax.

The value of the following elements can be determined internally but can be changed externally: TaxationCharacteristicsCode, TransactionCurrencyProductTax.CountryCode, TransactionCurrencyProductTax.Amount.

WithholdingTaxDetails

WithholdingTaxDetails are details determined for a specific type of withholding tax for the entire document. Withholding taxes can be taxes that a paying party pays for directly instead of the payment recipient. The elements found directly at the node PriceAndTaxCalculationWithholdingTaxDetails are defined by the data type: PriceAndTaxCalculationWithholdingTaxDetails Elements. In certain implementations, the elements may include: UUID, TaxationCharacteristicsCode, WithholdingTax, TransactionCurrencyWithholdingTax.

UUID is an identifier, which may be unique, for the object PriceAndTaxCalculation.WithholdingTaxDetails. UUID may be based on GDT UUID. TaxationCharacteristicsCode is the coded representation of basic characteristics upon which the withholding tax is based and is optional. TaxationCharacteristicsCode may be based on GDT WithholdingTaxationCharacteristicsCode.

WithholdingTax are the parts of withholding tax determined in the currency of declaration. WithholdingTax may be based on GDT WithholdingTax.

TransactionCurrencyWithholdingTax are the parts of withholding tax determined in the document currency. TransactionCurrencyWithholdingTax may be based on GDT WithholdingTax.

The value of the following elements can be determined internally but can be changed externally: TaxationCharacteristicsCode, TransactionCurrencyWithholdingTax.CountryCode, TransactionCurrencyWithholdingTax.Amount.

PriceComponent

PriceComponent is a cumulated price element for the entire document from a manually created price specification, or from the items of a cumulated price element. The pricing elements can be structured and build on each other. The elements located directly at the node PriceAndTaxCalculationPriceComponent are defined by the data type: PriceAndTaxCalculationPriceComponentElements. In certain implementations, the elements may include: UUID, Description, MajorLevelOrdinalNumberValue MinorLevelOrdinalNumberValue, TypeCode, CategoryCode, PurposeCode, Rate, RateBaseQuantityTypeCode, CalculationBasis, CalculatedAmount, RoundingDifferenceAmount, EffectiveIndicator, GroupedIndicator, ManuallyChangedIndicator, FixationCode, InactivityReasonCode, OriginCode.

UUID is an identifier, which may be unique, for the object PriceAndTaxCalculation.PriceComponent. UUID may be based on GDT UUID.

Description is the description of the price component in a defined language and is optional. Description may be based on GDT SHORT_Description.

MajorLevelOrdinalNumberValue is the step in the calculation procedure for the price calculation for which the price element is defined. MajorLevelOrdinalNumberValue may be based on GDT OrdinalNumberValue.

MinorLevelOrdinalNumberValue is the place at which the price element exists within the linear quantity of price elements with the same MajorLevelOrdinalNumberValue. MinorLevelOrdinalNumberValue may be based on GDT OrdinalNumberValue.

TypeCode is the type of price element and is optional. TypeCode may be based on GDT PriceSpecificationElementTypeCode.

CategoryCode is the category code of the price element and is optional. CategoryCode may be based on GDT PriceSpecificationElementCategoryCode.

PurposeCode is the purpose code of the price element and is optional. PurposeCode may be based on GDT PriceSpecificationElementPurposeCode.

Rate is the monetary rate for a price, discount or surcharge of the price element. Rate may be based on GDT Rate.

RateBaseQuantityTypeCode is the type of the base quantity of the rate and is optional. RateBaseQuantityTypeCode may be based on GDT QuantityTypeCode.

CalculationBasis is the basis upon which the price element is calculated. CalculationBasis may be based on GDT PriceComponentCalculationBasis.

CalculatedAmount is the calculated amount for the price element. CalculatedAmount may be based on GDT Amount.

RoundingDifferenceAmount is the rounding difference amount when calculating the price element. RoundingDifferenceAmount may be based on GDT Amount.

EffectiveIndicator is the specification as to whether the price element is effective for further calculation, and therefore also for the end result of the price calculation. EffectiveIndicator may be based on GDT EffectiveIndicator.

GroupedIndicator specifies whether the price element concerned is grouped with further price elements of the underlying business case, that is whether these are treated separately or not. GroupedIndicator may be based on GDT GroupedIndicator.

ManuallyChangedIndicator specifies whether the price element was manually changed or not. ManuallyChangedIndicator may be based on GDT ChangedIndicator.

FixationCode is the fixation of the price element and is optional. FixationCode may be based on GDT PriceComponentFixationCode.

InactivityReasonCode is the reason why the price element is inactive and is optional. InactivityReasonCode may be based on GDT PriceComponentInactivityReasonCode.

OriginCode is the origin of the price element. OriginCode may be based on GDT PriceComponentOriginCode.

The value of the element MajorLevelOrdinalNumberValue can be determined internally, and cannot be changed externally. The value of the element MinorLevelOrdinalNumberValue can be determined internally, and may not be changed externally. The value of the element CalculationBasis can be determined internally, and may not be changed externally.

The value of the element CalculatedAmount can be determined internally, and may not be changed externally. The value of the element RoundingDifferenceAmount can be determined internally, and may not be changed externally. The value of the element EffectiveIndicator can be determined internally, and may not be changed externally. The value of the element GroupedIndicator can be determined internally, and may not be changed externally. The value of the element ManuallyChangedIndicator can be determined internally, and may not be changed externally. The value of the element FixationCode can be determined internally, and may not be changed externally. The value of the element InactivityReasonCode can be determined internally, and may not be changed externally. The value of the element OriginCode can be determined internally, and may not be changed externally. The value of the element AllocationTypeCode can be determined internally, and may not be changed externally. The value of the element TypeCode may not be subsequently changed. The partial element Rate/BaseCurrencyCode may never exist.

The characteristic value of the element Rate may depend on that of the element CalculationBasis: (e.g., In case the value “1,” “8,” “9,” or “17” is specified for the element CalculationBasis/BaseCode, then Rate/DecimalValue and Rate/MeasureUnitCode can exist, and Rate/MeasureUnitCode can contain the value “P1.” If the value “2” is specified for the element Calculation/BaseCode, both Rate/DecimalValue and Rate/CurrencyCode can exist. If the value “3,” “4,” “5,” “6,” “7,” “10,” “11,” “12,” “13,” “14,” “15,” or “16” is specified for the element CalculationBasis/BaseCode, Rate/DecimalValue, Rate/CurrenyCode and Rate/BaseMeasureUnitCode should exist and Rate/BaseDecimalValue can exist.

TaxationTerms

TaxationTerms are agreements that are required exclusively for the taxation of the invoiced goods and services. The elements located directly at the node TaxationTerms are defined by the data type PriceAndTaxCalculationTaxationTermsElements derived from data type BusinessTransactionDocumentTaxationTermsElements. In certain implementations, the elements may include: UUID, SellerCountryCode, SellerTaxID, SellerTaxIdentificationNumberTypeCode, BuyerCountryCode, BuyerTaxID, BuyerTaxIdentificationNumberTypeCode, EuropeanCommunityVATTriangulationIndicator, ProvisionDate, TaxDueDate.

UUID is the unique identifier for the object PriceAndTaxCalculation.TaxationTerms. UUID may be based on GDT UUID.

SellerCountryCode is the seller’s country and is optional. SellerCountryCode may be based on GDT CountryCode.

SellerTaxID is the seller’s identifier assigned by the tax authorities and is optional. SellerTaxID may be based on GDT PartyTaxID.

SellerTaxIdentificationNumberTypeCode is the coded representation of the type of SellerTaxID and is optional. SellerTaxIdentificationNumberTypeCode may be based on GDT TaxIdentificationNumberTypeCode.

BuyerCountryCode is the buyer’s country and is optional. BuyerCountryCode may be based on GDT CountryCode.

BuyerTaxID is the buyer’s identifier assigned by the tax authorities and is optional. BuyerTaxID may be based on GDT PartyTaxID.

BuyerTaxIdentificationNumberTypeCode is the coded representation of the type of BuyerTaxID and is optional. BuyerTaxIdentificationNumberTypeCode may be based on GDT TaxIdentificationNumberTypeCode.

EuropeanCommunityVATTriangulationIndicator is an indicator for whether the underlying business transaction is an EU triangulation and is optional. EuropeanCommunityVATTriangulationIndicator may be based on GDT Indicator Qualifier: EuropeanCommunityVATTriangulation.

ProvisionDate is the specific point in time where invoiced goods or services have been provided from a taxation point of view and is optional. ProvisionDate may be based on GDT Date Qualifier: Provision.

TaxDueDate is the date where taxes are supposed to be due based on legal requirements and is optional. TaxDueDate may be based on GDT Date Qualifier TaxDue.

Item

Item is the specification for price and tax determination and valuation using attributes that are characteristic or relevant for the document item. Examples may include: Identifier of document item, quantity and unit of measure of item of higher-level object. The elements located directly at the node PriceAndTaxCalculationItem are defined by the data type: PriceAndTaxCalculationItemElements. In certain implementations, the elements may include: UUID, ParentItemUUID, CountryCode, TaxationCharacteristicsCode, Status.

UUID is an identifier, which may be unique, for the object PriceAndTaxCalculationItem. UUID may be based on GDT UUID.

ParentItemUUID is an identifier, which may be unique, of the higher-level item of the item category of the underlying business case and is optional. ParentItemUUID may be based on GDT UUID.

CountryCode is the coded representation of a country defined by either national or administrative/political borders and is optional. CountryCode may be based on GDT CountryCode.

TaxationCharacteristicsCode is the coded representation of basic characteristics upon which the taxation of products is based and is optional. TaxationCharacteristicsCode may be based on GDT ProductTaxationCharacteristicsCode.

Status is the description of the status and of possible actions of the entire object. Status may be based on IDT PriceAndTaxCalculationItemStatus. The IDT PriceAndTaxCalculationItemStatus can consist of the following elements: CalculationStatusCode (i.e., status that gives the information if the PriceAndTaxCalculationItem has been successfully completed or not) is of GDT type CalculationStatusCode.

The following composition relationships to subordinate nodes exist: ItemProductTaxDetails 145018—1:cn, ItemWithholdingTaxDetails 145022—1:cn, ItemPriceComponent 145026—1:cn, and ItemTaxationTerms 145030—1:c.

(Specialization) Associations for Navigation

The following associations for navigation to subordinate nodes exist: ItemMainPrice—1:c that is an association to ItemPriceComponent that is marked as MainPrice, ItemMainDiscount—1:c that is an association to ItemPriceComponent that is marked as MainDiscount, ItemMainSurcharge—1:c that is an association to ItemPriceComponent that is marked as MainSurcharge, Subitem—c:cn that is an association to logically subordinate item nodes (aggregation).

From a semantic point of view, the item can also contain other items. In this way, item hierarchies are structured. Items that are a part of an item hierarchy, and that do not have any higher-level items, are called main items (hierarchy root nodes), all others are called subitems.

If the element ParentItemUUID exists, its characteristic value may not correspond to that of the element UUID. The value of the element CountryCode can be determined internally but can be changed externally. The value of the element TaxationCharacteristicsCode can be determined internally but can be changed externally.

ItemProductTaxDetails

ItemProductTaxDetails are details determined for a specific type of product tax for document items. Product taxes are taxes that can be incurred for product-related business cases, such as purchasing, sales or consumption. The elements located directly at the node PriceAndTaxCalculationItemProductTaxDetails are defined by the data type: PriceAndTaxCalculationItemProductTaxDetailsElements. In certain implementations, the elements may include: UUID, TaxationCharacteristicsCode, ProductTax, TransactionCurrencyProductTax.

UUID is an identifier, which may be unique, for the object ItemProductTaxDetails. UUID may be based on GDT UUID.

TaxationCharacteristicsCode is the coded representation of basic characteristics upon which the taxation of products is based and is optional. TaxationCharacteristicsCode may be based on GDT ProductTaxationCharacteristicsCode.

ProductTax are parts of product tax determined. ProductTax may be based on GDT ProductTax.

TransactionCurrencyProductTax are the determined parts of product tax in document currency. TransactionCurrencyProductTax may be based on GDT ProductTax.

The value of the following elements can be determined internally, and cannot be changed externally: TaxationCharacteristicsCode, TransactionCurrencyProductTax.CountryCode, TransactionCurrencyProductTax.Amount.

ItemWithholdingTaxDetails

ItemProductTaxDetails are details determined for a specific type of withholding tax for document items. Withholding taxes are taxes that a paying party pays for directly instead of the payment recipient. The elements found directly at the node PriceAndTaxCalculationItemWithholdingTaxDetails are defined by the data type: PriceAndTaxCalculationItemWithholdingTaxDetails Elements. In certain implementations, the elements may include: UUID, TaxationCharacteristicsCode, WithholdingTax, TransactionCurrencyWithholdingTax.

UUID is an identifier, which may be unique, for the object ItemWithholdingTaxDetails.

UUID may be based on GDT UUID.

TaxationCharacteristicsCode is the coded representation of basic characteristics upon which the withholding tax is based and is optional. TaxationCharacteristicsCode may be based on GDT WithholdingTaxationCharacteristicsCode.

WithholdingTax are the parts of withholding tax determined in the currency of declaration.

WithholdingTax may be based on GDT WithholdingTax.

TransactionCurrencyWithholdingTax are the parts of withholding tax determined in the document currency. TransactionCurrencyWithholdingTax may be based on GDT WithholdingTax. The value of the following elements can be determined internally, and cannot be changed externally: TaxationCharacteristicsCode, TransactionCurrencyWithholdingTax.CountryCode, TransactionCurrencyWithholdingTax.Amount.

ItemPriceComponent

ItemPriceComponent is a calculated price component for the document item, that results from: a manually created price specification, an automatically determined price specification, or a price specification distributed from the entire document. Price components can be structured according to their dependencies specified in Business Configuration. This may mean that one price component influences all subsequent price components. The elements located directly at the node PriceAndTaxCalculationItemPriceComponent are defined by the data type: PriceAndTaxCalculationItemPriceComponentElements. In certain implementations, the elements may include: UUID, Description, MajorLevelOrdinalNumberValue, MinorLevelOrdinalNumberValue, TypeCode, CategoryCode, PurposeCode, Rate, RateBaseQuantityTypeCode, CalculationBasis, CalculatedAmount, RoundingDifferenceAmount, EffectiveIndicator, GroupedIndicator, ManuallyChangedIndicator, FixationCode, InactivityReasonCode, OriginCode, ItemHierarchyEvaluationMethodCode, PriceSpecificationUUID, PriceSpecificationDeterminationTimePoint, ScaleAxisStepDeterminationBasis, QuantityConversionRate, QuantityConversionRateQuantityTypeCode, QuantityConversionRateBaseQuantityTypeCode.

UUID is an identifier, which may be unique, for the object PriceAndTaxCalculation.ItemPriceComponent. UUID may be based on GDT UUID.

Description is the description of the price component in a defined language and is optional. Description may be based on GDT SHORT_Description.

MajorLevelOrdinalNumberValue is the step in the calculation procedure for the price calculation for which the price element is defined. MajorLevelOrdinalNumberValue may be based on GDT OrdinalNumberValue.

MinorLevelOrdinalNumberValue is the place at which the price element exists within the linear quantity of price elements with the same MajorLevelOrdinalNumberValue. MinorLevelOrdinalNumberValue may be based on GDT OrdinalNumberValue.

TypeCode is the type of price element and is optional. TypeCode may be based on GDT PriceSpecificationElementTypeCode.

CategoryCode is the category code of the price element and is optional. CategoryCode may be based on GDT PriceSpecificationElementCategoryCode.

PurposeCode is the purpose code of the price element and is optional. PurposeCode may be based on GDT PriceSpecificationElementPurposeCode.

Rate is the monetary rate for a price, discount or surcharge of the price element. Rate may be based on GDT Rate.

RateBaseQuantityTypeCode is the type of the base quantity of the rate and is optional. RateBaseQuantityTypeCode may be based on GDT QuantityTypeCode.

CalculationBasis is the basis upon which the price element is calculated. CalculationBasis may be based on GDT PriceComponentCalculationBasis.

CalculatedAmount is the calculated amount for the price element. CalculatedAmount may be based on GDT Amount.

RoundingDifferenceAmount is the rounding difference amount when calculating the price component. RoundingDifferenceAmount may be based on GDT Amount.

EffectiveIndicator is the specification as to whether the price element is effective for further calculation, and therefore also for the end result of the price calculation. EffectiveIndicator may be based on GDT EffectiveIndicator.

GroupedIndicator specifies whether the price element concerned is grouped with further price elements of the underlying business case, that is whether these are treated separately or not. GroupedIndicator may be based on GDT GroupedIndicator.

ManuallyChangedIndicator specifies whether the price element was manually changed or not. ManuallyChangedIndicator may be based on GDT ChangedIndicator.

FixationCode is the fixation of the price element and is optional. FixationCode may be based on GDT PriceComponentFixationCode.

InactivityReasonCode is the reason why the price component is inactive and is optional. InactivityReasonCode may be based on GDT PriceComponentInactivityReasonCode.

OriginCode is the origin of the price element. OriginCode may be based on GDT PriceComponentOriginCode.

ItemHierarchyEvaluationMethodCode is the coded representation of the method for evaluating the item hierarchy for this price component and is optional. ItemHierarchyEvaluationMethodCode may be based on GDT PriceComponentItemHierarchyEvaluationMethodCode.

PriceSpecificationUUID is an identifier, which may be unique, of the price component of the underlying specification of a price, discount or surcharge and is optional. PriceSpecificationUUID may be based on GDT UUID.

PriceSpecificationDeterminationTimePoint is the time which is taken during the determination of the price component for the underlying price, discount or surcharge and is optional. PriceSpecificationDeterminationTimePoint may be based on GDT TimePoint.

ScaleAxisStepDeterminationBasis is the basis for determining a scale axis step for a scale line when specifying a price discount or surcharge and is optional. ScaleAxisStepDeterminationBasis may be based on GDT ScaleAxisStepDeterminationBasis.

QuantityConversionRate is the relationship between the item unit of measure of the underlying business case and the unit of measure of the denominator in the specification of the PriceComponentRate and is optional. QuantityConversionRate may be based on GDT Rate.

QuantityConversionRateQuantityTypeCode is the type of the quantity of the quantity conversion rate and is optional. QuantityConversionRateQuantityTypeCode may be based on GDT QuantityTypeCode.

QuantityConversionRateBaseQuantityTypeCode is the type of the base quantity of the quantity conversion rate and is optional. QuantityConversionRateBaseQuantityTypeCode may be based on GDT QuantityTypeCode.

The value of the element MajorLevelOrdinalNumberValue can be determined internally, and may not be changed externally. The value of the element MinorLevelOrdinalNumberValue can be determined internally, and may not be changed externally. The value of the element CalculationBasis can be determined internally, and may not be changed externally. The value of the element CalculatedAmount can be determined internally, and may not be changed externally. The value of the element RoundingDifferenceAmount can be determined internally, and may not be changed externally. The value of the element EffectiveIndicator can be determined internally, and may not be changed externally. The value of the element GroupedIndicator can be determined internally, and may not be changed externally. The value of the element ManuallyChangedIndicator can be determined internally, and may not be changed externally. The value of the element FixationCode can be determined internally, and may not be changed externally. The value of the element InactivityReasonCode can be determined internally, and may not be changed externally. The value of the element OriginCode can be determined internally, and may not be changed externally. The value of the element ItemHierarchyEvaluationMethodCode can be determined internally, and may not be changed externally. The value of the element PricingSpecificationUUID can be determined internally, and may not be changed externally. The value of the element PriceSpecificationDeterminationTimePoint can be determined internally, and may not be changed externally. The type of the element PriceSpecificationDeterminationTimePoint can be restricted to "1," this may mean it should be an example of a date. The value of the element ScaleAxisStepDeterminationBasis can be determined internally, and may not be changed externally. The value of the element QuantityConversionRate can be determined internally, and may not be changed externally.

The value of the element TypeCode may not be subsequently changed.

The partial element Rate/BaseCurrencyCode may never exist.

The characteristic value of the element Rate depends on that of the element CalculationBasis: In case the value "1," "8," "9," or "17" is specified for the element CalculationBasis/BaseCode, then Rate/DecimalValue and Rate/MeasureUnitCode can exist, and Rate/MeasureUnitCode can contain the value "P1." If the value "2" is specified for the element Calculation/BaseCode, both Rate/DecimalValue and Rate/CurrencyCode can exist. If the value "3," "4," "5," "6," "7," "10," "11," "12," "13," "14," "15," or "16" is specified for the element CalculationBasis/BaseCode, Rate/DecimalValue, Rate/CurrenyCode and Rate/BaseMeasureUnitCode can exist and Rate/BaseDecimalValue can exist.

If the element Element QuantityConversionRate exists, then the subelements QuantityConversionRate/MeasureUnitCode, QuantityConversionRate/BaseMeasureUnitCode and QuantityConversionRate/BaseDecimalValue can be specified.

ItemTaxationTerms

ItemTaxationTerms are agreements that are required exclusively for the taxation of the goods and services invoiced in this item. The elements located directly at the node ItemTaxationTerms are defined by the data type PriceAndTaxCalculationItemTaxationTermsElements derived from data type BusinessTransactionDocumentTaxationTermsElements. In certain implementations, the elements may include: UUID, SellerCountryCode, SellerTaxID, SellerTaxIdentificationNumberTypeCode, BuyerCountryCode, BuyerTaxID, BuyerTaxIdentificationNumberTypeCode, EuropeanCommunityVATTriangulationIndicator, ProvisionDate, TaxDueDate.

UUID is an identifier, which may be unique, for the object PriceAndTaxCalculation.ItemTaxationTerms. UUID may be based on GDT UUID.

SellerCountryCode is the seller's country and is optional. SellerCountryCode may be based on GDT CountryCode.

SellerTaxID is the seller's identifier assigned by the tax authorities and is optional. SellerTaxID may be based on GDT PartyTaxID.

SellerTaxIdentificationNumberTypeCode is the coded representation of the type of SellerTaxID and is optional. SellerTaxIdentificationNumberTypeCode may be based on GDT TaxIdentificationNumberTypeCode.

BuyerCountryCode is the buyer's country and is optional. BuyerCountryCode may be based on GDT CountryCode.

BuyerTaxID is the buyer's identifier assigned by the tax authorities and is optional.

BuyerTaxID may be based on GDT PartyTaxID.

BuyerTaxIdentificationNumberTypeCode is the coded representation of the type of BuyerTaxID and is optional. BuyerTaxIdentificationNumberTypeCode may be based on GDT TaxIdentificationNumberTypeCode.

EuropeanCommunityVATTriangulationIndicator is an indicator for whether the underlying business transaction is an EU triangulation and is optional.

EuropeanCommunityVATTriangulationIndicator may be based on GDT Indicator Qualifier: EuropeanCommunityVATTriangulation.

ProvisionDate is the specific point in time where invoiced goods or services have been provided from a taxation point of view and is optional. ProvisionDate may be based on GDT Date Qualifier: Provision.

TaxDueDate is the date where taxes are supposed to be due based on legal requirements and is optional. TaxDueDate may be based on GDT Date Qualifier: TaxDue.

Projections of the Dependent Object

The following derivations of the maximum projection PriceAndTaxCalculation may also be realized as a dependent object: PriceCalculation, TaxCalculation. The Dependent Object PriceCalculation can contain all nodes except tax-relevant nodes. The Dependent Object TaxCalculation can contain all nodes except price-relevant nodes.

The following projection matrix here may describe in detail which nodes are relevant for these projections:

NodeDependent Object
PriceAndTaxCalculation
TaxCalculation
PriceCalculation
PriceAndTaxCalculation
XXX
ProductTaxDetailsXX
WithholdingTaxDetailsXX
TaxationTermsXX
PriceComponentXX
ItemXXX
ItemProductTaxDetailsXX
ItemWithholdingTaxDetailsXX
ItemTaxationTermsXX
ItemPriceComponentXX Dependent Object PriceAndTaxCalculation PriceAndTaxCalculation can be used in the following Business Objects: SalesOrder, ServiceOrder, CustomerInvoice, PurchaseOrder, InternalRequest.

Dependent Object PriceCalculation

PriceCalculation is the summary of the determined price components for a business case.

This derivation is used in the following Business Objects: PurchaseRequest, SupplierQuote.

Dependent Object TaxCalculation

TaxCalculation is the summary of the determined price and tax components for a business case. This derivation is used in the following Business Objects: SupplierInvoice, SupplierInvoiceRequest.

ProcurementArrangement business object

FIG. 146 illustrates one example of an ProcurementArrangement business object model 146004. Specifically, this model depicts interactions among various hierarchical components of the ProcurementArrangement, as well as external components that interact with the ProcurementArrangement (shown here as 146000 through 146002, 146006 through 146008, and 146016 through 146018).

In some implementations, a ProcurementArrangement can be an arrangement used to control procurement transactions. It can be established between a supplier and a purchasing unit, but also for one supplier across all purchasing units. The Business-Object ProcurementArrangement can be part of the process component Business Partner Data Processing. The ProcurementArrangement may be assigned to a supplier and might be assigned to a purchasing-unit as well; it may hold information like cash discount terms, purchase order currency, inco-terms or details about the exchange of procurement documents.

A Business-Object Procurement Arrangement Node Structure 146010 can be an arrangement used to control procurement transactions. It can be established between a supplier and a purchasing unit, but also for one supplier across all purchasing units. The elements located at the node Root are defined by the type GDT ProcurementArrangementElements and include SupplierUUID and StrategicPurchasingFunctionalUnitUUID. A SupplierUUID can be a universal unique identifier of the suppliers for which the ProcurementArrangement exists and is a GDT of type UUID. A StrategicPurchasingFunctionalUnitUUID can be a universal unique identifier of the strategic purchasing unit for which the ProcurementArrangement exists and is a GDT of type UUID and is optional. In some implementations, the status will include Status of the ProcurementArrangement and LifeCycleStatusCode. A Status of the ProcurementArrangement is an IDT of type ProcurementArrangementStatus. A LifeCycleStatusCode is a GDT of type ProcurementArrangementLifeCycleStatusCode. There may be a number of Composition relationships including: PurchasingTerms 146012 has a cardinality of 1:c, DocumentExchangeTerms 146014 has a cardinality of 1:c, and AccessControlList has a cardinality of 1:1. There may be a number of Inbound Aggregation Relationships including: Supplier has a cardinality of 1:cn and StrategicPurchasingFunctionalUnit has a cardinality of c:cn. If the element StrategicPurchasingFunctionalUnitUUID is not populated, only the composition relationship DocumentExchangeTerms may exist.

In some implementations, a QueryByElements may provide a list of ProcurementArrangements according to the selection parameters specified. It may be used to retrieve all ProcurementArrangements for a supplier given say—in this case the selection parameter StrategicPurchasingFunctionalUnitUUID has to be remain empty; alternatively the existence of a ProcurementArrangement can be checked (both selection parameters, SupplierUUID and StrategicPurchasingFunctionalUnitUUID fully specified) or a list of all ProcurementArrangements of a purchasing unit given may be requested (selection parameter SupplierUUID left blank). A GDT: ProcurementArrangementElementsQueryElements defines the Query-elements including SupplierUUID, StrategicPurchasingFunctionalUnitUUID, and LifeCycleStatusCode. A SupplierUUID is optional and is a GDT of type UUID. A StrategicPurchasingFunctionalUnitUUID is optional and is a GDT of type UUID. A LifeCycleStatusCode is optional and a GDT of type ProcurementArrangementLifeCycleStatusCode.

A PurchasingTerms can be the purchasing unit dependent data to control the purchasing process. A PurchasingTerms may contain agreements between the supplier and the buying company as well as process related information. The elements located at the node PurchasingTerms are defined by the type GDT: ProcurementArrangementPurchasingTermsElements and include PurchaseOrderCurrencyCode CashDiscountTermsCode, DeliveryBasedInvoiceVerificationIndicator, EvaluatedReceiptSettlementIndicator, BuyerPartySellerID, InvoiceConfirmationRequirementCode, PurchaseOrderConfirmationRequirementCode, PurchasingBlockIndicator, and Incoterms. A PurchaseOrder- CurrencyCode can be a coded representation of the transaction currency, which is to be used for purchase orders (and subsequent procurement documents) and is a GDT of type CurrencyCode. A CashDiscountTermsCode is optional and can be a coded representation of the terms of payment a purchasing unit and a supplier agreed on. It is a GDT of type CashDiscountTermsCode. A DeliveryBasedInvoiceVerificationIndicator can be an indicator if the verification of a SupplierInvoice has to be based on quantity and price data of GoodsAndServiceAcknowledgement, or on InboundDelivery documents that have been created for the PurchaseOrder. If the indicator is not set, SupplierInvoice verification is carried out on the basis of quantity and price data of the PurchaseOrder itself. It is a GDT of type Indicator, Qualifier: DeliveryBasedInvoiceVerification. An EvaluatedReceiptSettlementIndicator can be an indicator if the evaluated receipt settlement (ERS) procedure is to be used for settlement of the PurchaseOrder and is a GDT of type Indicator, Qualifier: EvaluatedReceiptSettlement. A BuyerPartySellerID is optional and can identify the purchasing unit of a buying company at supplier side (own customer number at the supplier). This might be an account number, a name or any other identification code. This code has to be shipped with the procurement documents in order to allow the supplier to identify the purchasing unit of a buying company. It is a GDT of type PartyID. An InvoiceConfirmationRequirementCode is optional and can specify if a supplier expects a confirmation as soon as his invoice has been received. It is a GDT of type FollowUpMessageRequirementCode. The InvoiceConfirmationRequirementCode may restricts the FollowUpMessageRequirementCode to the two values ‘01’ (required) and ‘05’ (forbidden). A PurchaseOrderConfirmationRequirementCode is optional and can specify if a buying company respectively its purchasing unit wants to get an acknowledgement upon order receipt at supplier side and is GDT of type FollowUpBusinessTransactionDocumentRequirementCode). The PurchaseOrderConfirmationRequirementCode restricts the FollowUpBusinessTransactionDocumentRequirementCode to the two values ‘02’ (expected) and ‘04’ (not expected). A PurchasingBlockIndicator can be an indicator if a purchasing unit should not order at the supplier in question and is a GDT of type Indicator, Qualifier: Block. An Incoterms is optional. Incoterms may be commercial formulas for delivery conditions, which correspond to the rules compiled by the x International Chamber of Commerce (ICC) and are GDT of type Incoterms.

In some implementations, a DocumentExchangeTerms keeps information that may be used for the exchange of (business) documents between the buying company and the supplier. The elements located at the node DocumentExchangeTerms are defined by the type GDT including ProcurementDocumentExchangeCommunicationMediumTypeCode. A ProcurementDocumentExchangeCommunicationMediumTypeCode can be a coded representation of the send-medium used for document transfer between the buying company and the supplier and is a GDT of type CommunicationMediumTypeCode, Qualifier: SupplierProcurementDocumentExchange. In some applications, the ProcurementDocumentExchangeCommunicationMediumTypeCode can be a derivation of the general communication medium type is of GDT type CommunicationMediumTypeCode). The ProcurementDocumentExchangeCommunicationMediumTypeCode may restrict the communication medium type to codes that refer to means by which business documents can be exchanged: print, fax, email and XchangeInfrastructure. XchangeInfrastructure as DocumentExchangeTypeCode may be valid if the supplier’s general ability to communicate via XI can be indicated by the Supplier.Procurement.ExchangeInfrastructureEnabledIndicator. The AccessControlList can be a list of access groups that have access to a Procurement Arrangement during a validity period.

Business Object Product Category Hierarchy

FIG. 147 illustrates one example of an ProductCategoryHierarchy business object model 147000. Specifically, this model depicts interactions among various hierarchical components of the ProductCategoryHierarchy.

Product Category Hierarchy is an hierarchical arrangement of product categories according to objective business aspects. Subordinate product categories may represent a semantic refinement of the respective higher-level product category. The business object Product Category Hierarchy belongs to the process component Product Data Management. The exclusive purpose of the Product Category Hierarchy business object is to determine a hierarchy for product categories. Therefore, Product Category Hierarchy may not be involved in business configuration and does not contain the following: Process data, attributes, or properties, Application-specific features, Information about organizational units, for example, company or job. In addition, Product Category Hierarchy does not include business logic, for example, for the execution of veto checks on changes; any application using Product Category Hierarchy may therefore provide its own conflict resolution. The hierarchy from the product categories is created using the Children association on the Product Category node. The RootProductCategory association can be used to determine the only root category. Product Category Hierarchy is represented by the root node ProductCategoryHierarchy. The process component Product Data Management may belong to the Foundation Layer. This Layer can be available locally in all DUs. As a result, no additional interfaces (i.e., service interfaces) beyond those defined on the BO itself may be required.

Business Object Product Category Hierarchy Node Structure (Root Node)

A ProductCategoryHierarchy 147002 (root) is an hierarchical, structured group of product categories used to categorize products. This takes place using the ProductCategory node. The arrangement of product categories to each other can specify the structure of the product category hierarchy. A ProductCategoryHierarchy may have at least one purpose that is relevant for all product categories. This can be used to group products. The elements located directly at the Product Category Hierarchy node are defined by the type GDT: ProductCategoryHierarchyElements. In certain implementations, these may include the following elements: UUID, ID, RootProductCategoryUUID, RootProductCategoryInternalID. UUID is a global identifier, which may be unique, for a product category hierarchy. UUID may be based on GDT UUID. ID is a User-friendly identifier, which may be unique, for a product category hierarchy. ID may be based on GDT ProductCategoryHierarchyID. RootProductCategoryUUID is a global identifier, which may be unique, for the root product category of the product category hierarchy. RootProductCategoryUUID is optional and may be based on GDT UUID. RootProductCategoryInternalID is an user-friendly identifier, which may be unique, for the root product category of the product category hierarchy. RootProductCategoryInternalID is optional and may be based on GDT ProductCategoryInternalID.

A number of composition relationships to subordinate nodes exist, such as ProductCategory 147004, which is a 1:n relationship, Description 147008, which is a 1:n relationship, and Usage 147006, which is a 1:n relationship.

A specialization association for navigation at the ProductCategory node can be included, such as RootProductCategory 147010, in a c:1 relationship, an association to the root of the hierarchy.

Queries

QueryByIdentification delivers a list of the product category hierarchies that satisfy the selection criteria from the query elements. You can search using legible, unique indicators present in the BO ProductCategoryHierarchy.GDT: ProductCategoryHierarchyRootIdentificationQueryElements defines the query element, and can include ID, ProductCategoryInternalID, and ProductCategoryProductAssignmentAllowedIndicator. ID is optional and is of type GDT: ProductCategoryHierarchyID. ProductCategoryInternalID is optional and is of type GDT: ProductCategoryInternalID. ProductCategoryProductAssignmentAllowedIndicator is optional and is of type GDT: Indicator, Qualifier: Allowed. QueryByDescription delivers a list of the product category hierarchies that satisfy the selection criteria from the query elements. You can search using language-dependent texts. GDT: ProductCategoryHierarchyRootDescriptionQueryElements defines the query elements and includes DescriptionDescription, ProductCategoryDescriptionDescription and ProductCategoryProductAssignmentAllowedIndicator. DescriptionDescription is optional and is of type GDT: MEDIUM_Description. ProductCategoryDescriptionDescription is optional and is of type GDT: MEDIUM_Description. ProductCategoryProductAssignmentAllowedIndicator is optional, is of type GDT: Indicator, and may have a qualifier of Allowed. QueryByUsage delivers a list of the product category hierarchies that satisfy the selection criteria from the query elements. A search can be done using the purpose of a hierarchy. GDT: ProductCategoryHierarchyRootUsageQueryElements defines the query elements UsageCode. UsageCode is a coded representation of the purpose of a product category hierarchy that exists on the Usage node and is of type GDT: ProductCategoryHierarchyUsageCode.

ProductCategory

A ProductCategory is a grouping of products according to objective, enterprise-specific criteria.

Product categories are arranged in hierarchies according to semantic criteria. The elements located directly at the Product Category Hierarchy node are defined by the type GDT: ProductCategoryElements. In certain implementations, these elements may include the following: UUID, ParentUUID, InternalID, ParentInternalID, ProductAssignmentAllowedIndicator, ProductCategoryHierarchyUUID, ProductCategoryHierarchyID, Key, ProductCategoryHierarchyUUID, ProductCategoryInternalID, IDKey, ProductCategoryHierarchyID, ProductCategoryInternalID. UUID is a global identifier, which may be unique, for a product category. UUID may be based on GDT UUID. ParentIUD is a global identifier, which may be unique, for the hierarchically superior product category. ParentUUID is optional and may be based on GDT UUID.

InternalID is an alternative identifier for a product category. InternalID may be based on GDT ProductCategoryInternalID. ParentInternalID is an alternative identifier, which may be unique, for the parent product category. ParentInternalID is optional and may be based on GDT ProductCategoryInternalID.

ProductAssignmentAllowedIndicator specifies whether the product category can be assigned to products or not. ProductAssignmentAllowedIndicator may be based on GDT Indicator, and may have a qualifier of Allowed. ProductCategoryHierarchyUUID is a global identifier, which may be unique, for a product category hierarchy. ProductCategoryHierarchyUUID is optional and may be based on GDT UUID. ProductCategoryHierarchyID is an user-friendly identifier, which may be unique, for a product category hierarchy. ProductCategoryHierarchyID is optional and may be based on GDT ProductCategoryHierarchyID. Key is an alternative key for a ProductCategory node. The IDT ProductCategoryHierarchyProductCategoryKey can consist of the following elements: ProductCategoryHierarchyUUID, ProductCategoryInternalID. IDKey is the second alternative key for a ProductCategory node. The IDT ProductCategoryHierarchyProductCategoryIDKey can consist of the following elements: ProductCategoryHierarchyID, ProductCategoryInternalID.

A ProductCategoryDescription 147012 composition relationships can exist, which is a 1:n relationship. Association for Navigation to the ProductCategory node can include a 1:cn Children relationship. Association to the subordinate product categories within the product category hierarchy can include a 1:c Parent relationship, which is an association to the higher-level product categories within the product category hierarchy.

In a MoveTo ESI Action, the current product category, including the entire product categories assigned to it, is assigned as the Child to the product category described by the ID. The actions elements are defined by type GDT: ProductCategoryHierarchyProductCategoryMoveToActionElements. These elements include InternalID which is of type GDT: ProductCategoryInternalID.

Queries

QueryByIdentification delivers a list of the product categories that satisfy the selection criteria from the query elements. GDT: ProductCategoryHierarchyProductCategoryIdentificationQueryElements defines the query elements InternalID, ProductCategoryHierarchyUsageCode and ProductAssignmentAllowedIndicator. InternalID is of type GDT: ProductCategoryInternalID. ProductCategoryHierarchyUsageCode is a coded representation of the purpose of a product category hierarchy that exists on the Usage node and is of type GDT: ProductCategoryHierarchyUsageCode. ProductAssignmentAllowedIndicator is optional and is of type GDT: Indicator and may have a qualifier of Allowed. QueryByElements delivers a list of the product categories that satisfy the selection criteria from the query elements. GDT: ProductCategoryHierarchyProductCategoryElementsQueryElements defines the query elements InternalID, ProductCategoryHierarchyUsageCode, ParentInternalID, ProductAssignmentAllowedIndicator and ProductCategoryDescriptionDescription. InternalID is optional and is of type GDT: ProductCategoryInternalID. ProductCategoryHierarchyUsageCode is a coded representation of the purpose of a product category hierarchy that exists on the Usage node and is of type GDT: ProductCategoryHierarchyUsageCode. ParentInternalID is optional and is of type GDT: ProductCategoryInternalID. ProductAssignmentAllowedIndicator is optional and is of type GDT: Indicator, Qualifier: Allowed. ProductCategoryDescriptionDescription is optional and is of type GDT: MEDIUM_Description. QueryByDescription delivers a list of the product categories that satisfy the selection criteria from the query elements. You can search for language-dependent texts. GDT: ProductCategoryHierarchyProductCategoryDescriptionQueryElements defines the query elements ProductCategoryDescription, ProductCategoryHierarchyUsageCode, and ProductAssignmentAllowedIndicator. ProductCategoryDescription is optional and is of type GDT: MEDIUM_Description. ProductCategoryHierarchyUsageCode is a coded representation of the purpose of a product category hierarchy that exists on the Usage node and is of type GDT: ProductCategoryHierarchyUsageCode. ProductAssignmentAllowedIndicator is optional and is of type GDT: Indicator and can have a qualifier of Allowed.

ProductCategoryDescription

A ProductCategoryDescription is the language-dependent description of the properties of a product category. The elements located directly at the Product Category Hierarchy node are defined by the type GDT: ProductCategoryDescriptionElements. In certain implementations, these elements may include the following: Description. Description is the language-dependent description of the properties of a product category. Description may be based on GDT_MEDIUM_Description. A Description is the language-dependent description of the properties of a product category hierarchy. The elements located directly at the Description Product Category Hierarchy node are defined by the type GDT: ProductCategoryHierarchyDescriptionElements. In certain implementations, these elements may include: Description. Description is the language-dependent description of the properties of a product category hierarchy. Description may be based on GDT _SHORT_Description.

Usage

Usage describes the purpose of the hierarchy. It can be used to determine certain products that have a common purpose. This can be achieved by assigning product categories from a product category hierarchy with this purpose to the products you are looking for. A specific usage can be assigned to one ProductCategoryHierarchy. A possible usage is purchasing, that is, product categories in this hierarchy are important for purchasing. The elements located directly at the UsageProduct Category Hierarchy node are defined by the type GDT: ProductCategoryHierarchyUsageElements. In certain implementations, this may include the following: Code. Code is the coded representation of the use of a product category hierarchy. Code may be based on GDT ProductCategoryHierarchyUsageCode. In some implementations, the following constraint may be applicable: within a single product category hierarchy, only the following combinations of usages are allowed: Cross-process, Sales, Demand Planning, Storage Management and Logistics Processes, Production, Supply Planning.

Business Object ProductionSegment

FIG. 148-1 through 148-3 illustrates an example ProductionSegment business object model 148000. Specifically, this model depicts interactions among various hierarchical components of the ProductionSegment, as well as external components that interact with the ProductionSegment (shown here as 148002 through 148008 and 148036 through 148062).

Business Object ProductionSegment

A ProductionSegment is a part of a production process that is determined by a network of operations and the materials assigned to them for the production of a material. A production segment can create a link between the master data of the business object ProductionBillOfOperations and the business object ProductionBillOfMaterial. One or more ProductionSegments can be assigned to a ProductionModel. An individual ProductionOrder can be created in production for ProductionSegments assigned to a production model. The business object ProductionBillOfOperations can describe operations in production and the business object ProductionBillOfMaterial can describe the breakdown of a material into its individual elements The business object ProductionSegment can belong to the process component "Production Model Management" in the foundation layer. A ProductionSegment can contain the Material, ProductionBillOfOperations, ProductionBillOfMaterialVariant, the assigned ProductionBillOfMaterialActivityAssignments with the assignments of the activities of the ProductionBillOfOperations to the items or item groups of the ProductionBillOfMaterialVariant, and the assigned ProductActivityAssignments with the assignments of co-products or by-products to the activities of the ProductionBillOfOperations.

A ProductionSegment is represented by the root node "Root." The definitions of the business objects Material, ProductionBillOfOperations, ProductionModel, and ProductionBillOfMaterial can be found in the appropriate PIC documents. In some implementations, the business object ProductionSegment may send and receive no messages and therefore may not have any service interfaces.

A ProductionSegment is the combination of Material, ProductionBillOfMaterialVariant, and ProductionBillOfOperations. It can provide the basis for the production of materials in a production process. In some implementations, a ProductionSegment may not have specializations.

The elements located directly at the node ProductionSegment are defined by the data type: ProductionSegmentElements. In certain implementations, these elements may include the following: UUID, ID, MaterialID, MaterialUUID, ProductionBillOfMaterialID, ProductionBillOfMaterialVariantID, ProductionBillOfMaterialVariantUUID, ProductionBillOfOperationsID, ProductionBillOfOperationsUUID, SystemAdministrativeData, MaterialPackingMethodCode, ProductionScrapPercent.

UUID is a universal identifier, which may be unique, and an alternative key of a ProductionSegment. UUID may be based on GDT UUID.

ID is an identifier, which may be unique, of the ProductionSegment. ID may be based on GDT ProductionSegmentID.

MaterialID is an identifier, which may be unique, of the Material that is assigned to the ProductionSegment and may be optional. MaterialID may be based on GDT ProductID.

MaterialUUID is a universal identifier, which may be unique, of the Material that is assigned to the ProductionSegment and is optional. MaterialUUID may be based on GDT UUID.

ProductionBillOfMaterialID is an identifier, which may be unique, of the ProductionBillOfMaterialGroup that has a BillOfMaterialVariant that is assigned to the ProductionSegment. ProductionBillOfMaterialID may be based on GDT BillOfMaterialID.

ProductionBillOfMaterialVariantID is an identifier of the BillOfMaterial Variant that is assigned to the ProductionSegment and may be optional. It can be unique in combination with the ProductionBillOfMaterialID. ProductionBillOfMaterialVariantID may be based on GDT BillOfMaterialVariantID.

ProductionBillOfMaterialVariantUUID is a universal identifier, which may be unique, of the BillOfMaterialVariant that is assigned to the ProductionSegment and may be optional. ProductionBillOfMaterialVariantUUID may be based on GDT UUID.

ProductionBillOfOperationsID is an identifier, which may be unique, of the ProductionBillOfOperations that is assigned to the ProductionSegment and is optional. ProductionBillOfOperationsID may be based on GDT BillOfOperationsID. ProductionBillOfOperationsUUID is a universal identifier, which may be unique, of the ProductionBillOfMaterialVariant that is assigned to the ProductionSegment and can be optional. ProductionBillOfOperationsUUID may be based on GDT UUID.

SystemAdministrativeData is the administrative data recorded by the system and can be optional. This data includes system users and change dates/times. SystemAdministrativeData may be based on GDT SystemAdministrativeData.

MaterialPackingMethodCode is the coded representation of the procedure that determines whether and how the material of production segment is to be packed and is optional. There may be limitation of the code values in the first release to "Standard Packing" and "Free Packing." MaterialPackingMethodCode may be based on GDT PackingMethodCode 1. Qualifiers may include: Material.

ProductionScrapPercent is the scrap quantity as a percentage of the total quantity that is assumed for a ProductionSegment and can be optional. ProductionScrapPercent may be based on GDT Percent, 1. Qualifier may be based on: Scrap.

The following composition relationships to subordinate nodes may exist. The ProductionSegment may have a 1:cn cardinality relationship with a ProductionBillOfMaterialItemActivityAssignment 148022 subordinate node. The ProductionSegment 148010 may have a 1:cn cardinality relationship with a ProductActivityAssignment subordinate node. Also, the ProductionSegment may have a 1:c cardinality relationship with a DO AttachmentFolder 148028 subordinate node. The ProductionSegment may have a 1:c cardinality relationship with a DO TextCollection 148026 subordinate node. Further, the ProductionSegment may have a 1:cn cardinality relationship with a Description 148024 subordinate node. The ProductionSegment may have a 1:1 cardinality relationship with a PlanningConsistencyStatus 148012 subordinate node. The ProductionSegment may have a 1:1 cardinality relationship with an ExecutionConsistencyStatus 148014 subordinate node. Additionally, the ProductionSegment may have a 1:cn cardinality relationship with a HierarchicalViewElement 148030 subordinate node.

The following inbound aggregation relationships may exist. From business object Material/node Root, the business object ProductionSegment can have a 1:cn cardinality inbound aggregation relationship with Material, where Material denotes the finished material (main material) to be produced in the ProductionSegment. From the business object ProductionBillOfMaterial/node ProductionBillOfMaterialVariant, the business object ProductionSegment can have a c:cn cardinality inbound aggregation relationship with ProductionBillOfMaterialVariant, where ProductionBillOfMaterialVariant denotes the ProductionBillOfMaterialVariant in which the material and ProductionSegment are maintained. Also, from the business object ProductionBillOfOperations/node Root, the business object ProductionSegment can have a c:cn cardinality inbound aggregation relationship with ProductionBillOfOperations, where ProductionBillOfOperations denotes the ProductionBillOfOperations with which the material of the ProductionSegment is to be produced.

The following inbound association relationships may exist. From business object Identity/node Root, the business object ProductionSegment can have a 1:cn cardinality inbound association relationship with CreationIdentity, where CreationIdentity denotes who has created the entry. From the business object Identity/node Root, the business object ProductionSegment can have a c:cn cardinality inbound association relationship with LastChangeIdentity, where LastChangeIdentity denotes who has last changed the lentry.

The following (specialization) association for navigation relationships may exist. To the node ProductActivityAssignment, the business object ProductionSegment can have a 1:cn cardinality (specialization) association for navigation with CoProduct, where the CoProduct can be the specialization association from the root node ProductionSegment that describes the role CoProduct. To the node ProductActivityAssignment, the business object ProductionSegment can have a 1:cn cardinality (specialization) association for navigation with ByProduct, where the ByProduct can be the specialization association from the root node ProductionSegment that describes the role ByProduct. Also, to the node HierarchicalViewElement, the business object ProductionSegment can have a 1:cn cardinality (specialization) association for navigation with FirstHierarchyLevelHierarchicalViewElement, where FirstHierarchyLevelHierarchicalViewElement denotes all instances which are the first level below root node of assigned ProductionBillOfOperations. To business object ProductionModel/node Root, the business object ProductionSegment can have a c:cn cardinality (specialization) association for navigation with ProductionModel, where ProductionModel denotes in which Production Models the Production Segment is used.

The integrity may be as follows. The material exists. The Bill Of Material Variant exists. The material corresponds to a material of the Bill Of Material Variant. The bill of operations exists. Either the MaterialID or the MaterialUUID can be entered. The ProductionBillOfMaterialID can be filled along with the ProductionBillOfMaterialVariantID or the ProductionBillOfMaterialVariantUUID. Either the ProductionBillOfOperationsID or the ProductionBillOfOperationsUUID can be entered.

There may be multiple enterprise service infrastructure actions, such as, for example, Copy, CheckItemActivityAssignment, and CheckConsistency (S&AM Action).

Copy creates a duplicate of an existing production segment. A precondition of Copy may be that the original production segment be available. The original production segment remains unchanged. A complete new object will be created which may differ from the original object by the ID. Business objects to which the original business object refers may not be copied. The action elements are defined by the data type ProductionSegmentCopyActionElements. These elements may include TargetProductionSegmentID. TargetProductionSegmentID is a GDT of type ProductionSegmentID and represents an identifier of the new ProductionSegment. The action can be executed by all users.

CheckItemActivityAssignment, for the production segments, checks the completeness of the assignments of the Bill Of Material items or Bill Of Material item groups of their Bill Of Material variants to the activities of category "Produce" of their ProductionBillOfOperations. The action can be executed by all users.

CheckConsistency (S&AM Action) executes a consistency check for a production segment and the bill of material and bill of operations assigned to it. The Enterprise-Service-InfrastructureAction CheckConsistency corresponds to the S&AM Actions CheckPlanningConsistency and CheckExecutionConsistency. A precondition of CheckConsistency may be that the consistency of the production segment has not been checked since last being changed. The status variables PlanningConsistencyStatusCode at the node PlanningConsistencyStatus and ExecutionConsistencyStatusCode at the node ExecutionConsistencyStatus and the time of the status change at this node are changed. The action CheckAndDetermine is called at the business objects ProductionBillOfMaterial and ProductionBillOfOperations. The status variables PlanningConsistencyStatusCode at the node PlanningConsistencyStatus and ExecutionConsistencyStatusCode at the node ExecutionConsistencyStatus are converted from “unchecked” to “inconsistent” or “consistent” depending on the check result. The action can be executed by all users.

There may be multiple queries, including, for example, QueryByID, QueryByMaterial, QueryByMaterialUUID, QueryByElements, and QueryByStatusInformation. QueryByID provides a list of all ProductionSegments (root) for which the identifier (ID) lies within the area specified for the query element ProductionSegmentID. QueryByID is a GDT of type ProductionSegmentIDQueryElements and may define the query elements ProductionSegmentID, which is a GDT of type ProductionSegmentID. QueryByMaterial provides a list of all ProductionSegments (root) for which the identifier of the assigned material (Element MaterialID) lies within the area specified for the query element. QueryByMaterial is a GDT of type ProductionSegmentMaterialQueryElements and may define the query elements MaterialID. MaterialID is a GDT of type ProductID and may be optional. QueryByMaterialUUID provides a list of all ProductionSegments (root) for which the universally unique identifier of the assigned material (element MaterialUUID) corresponds to a UUID from the query element MaterialUUID. QueryByMaterial UUID is a GDT of type ProductionSegmentMaterialUUIDQueryElements and may define the query elements MaterialUUID, which is a GDT of type UUID.

QueryByElements provides a list of all ProductionSegments (root) for which the Identifier (ID) may lie within the area specified for the query element ID; Identifiers of the assigned production bill of material variant (elements ProductionBillOfMaterialID and ProductionBillOfMaterialVariantID) may lie within the area specified for the query elements ProductionBillOfMaterialID and ProductionBillOfMaterialVariantID; Identifier of the assigned production bill of operations (element) may lie within the area specified for the query element ProductionBillOfOperationsID; and values of the status variables may correspond to the values of the corresponding query elements. QueryByElements is a GDT of type ProductionSegmentElementsQueryElements and may define the query elements: ID, MaterialID, ProductionBillOfMaterialID, ProductionBillOfMaterialVariantID, ProductionBillOfOperationsID, PlanningConsistencyStatusCode, and ExecutionConsistencyStatusCode. ID is a GDT of type ProductionSegmentID and may be optional. MaterialID is a GDT of type ProductID and may be optional. ProductionBillOfMaterialID is a GDT of type BillOfMaterialID and may be optional. ProductionBillOfMaterialVariantID is a GDT of type BillOfMaterialVariantID and may be optional. ProductionBillOfOperationsID is a GDT of type BillOfOperationsID and may be optional. PlanningConsistencyStatusCode is a GDT of type ConsistencyStatusCode and may be optional. ExecutionConsistencyStatusCode is a GDT of type ConsistencyStatusCode and may be optional.

QueryByStatusInformation provides a list of all ProductionSegments (root) for which the values of the status variables correspond to the values of the corresponding query elements. QueryByStatusInformation is a GDT of type ProductionSegmentStatusInformationQueryElements and may define the query elements PlanningConsistencyStatusCode and ExecutionConsistencyStatusCode. PlanningConsistencyStatusCode is a GDT of type ConsistencyStatusCode. ExecutionConsistencyStatusCode is a GDT of type ConsistencyStatusCode. Query elements PlanningConsistencyStatusCode and ExecutionConsistencyStatusCode may be optional.

PlanningConsistencyStatus

PlanningConsistencyStatus is the result of the consistency checks for production planning. The elements located directly at the node PlanningConsistencyStatus are defined by the data type ProductionSegmentPlanningConsistencyStatusElements. In certain implementations, these elements may include the following: PlanningConsistencyStatusCode, LastCheckDateTime.

PlanningConsistencyStatusCode describes whether the ProductionSegment is consistent, unchecked or inconsistent with regard to the checks for the generation of a released planning production model and is optional. PlanningConsistencyStatusCode may be based on GDT ConsistencyStatusCode. LastCheckDateTime is the time of the last check and is optional. LastCheckDateTime may be based on GDT GLOBAL_DateTime. Qualifiers may include: LastCheck. ResetPlanningConsistencyCheckResult (S&AM Action) is an enterprise service infrastructure action and may reset the planning check status of a production segment to the initial value “unchecked”. The Enterprise-Service-Infrastructure-Action ResetPlanningConsistencyCheckResult may correspond to the S&AM Actions ResetPlanningConsistencyCheckResult. As a precondition, the production segment may have been checked. The status variable PlanningConsistencyStatusCode and the time of the check status change may be changed at the node PlanningConsistencyStatus. The status variable PlanningConsistencyStatusCode at the node PlanningConsistencyStatus may be converted from “inconsistent” or “consistent” to “unchecked”. The action can be executed by all users.

ExecutionConsistencyStatus

ExecutionConsistencyStatus is the result of the consistency checks for production execution. The elements located directly at the node ExecutionConsistencyStatus are defined by the data type: ProductionSegmentExecutionConsistencyStatusElements. In certain implementations, these elements may include the following: ExecutionConsistencyStatusCode, LastCheckDateTime.ExecutionConsistencyStatusCode describes whether the ProductionSegment is consistent, unchecked or inconsistent with regard to the checks for the generation of a released execution production model and is optional. ExecutionConsistencyStatusCode may be based on GDT ConsistencyStatusCode. LastCheckDateTime is the time of the last check and is optional. LastCheckDateTime may be based on GDT GLOBAL_DateTime. Qualifiers may include the following: LastCheck. ResetExecutionConsistencyCheckResult (S&AM Action) is an enterprise service infrastructure action, which may reset the execution check status of a production segment to the initial value “unchecked”. The Enterprise-Service-Infrastructure-Action ResetExecutionConsistencyCheckResult corresponds to the S&AM Actions ResetExecutionConsistencyCheckResult. As a precondition, the production segment may have been checked. The status variable ExecutionConsistencyStatusCode and the time of the check status change may be changed at the node ExecutionConsistencyStatus. The status variable ExecutionConsistencyStatusCode at the node ExecutionConsistencyStatus may be converted from “inconsistent” or “consistent” to “unchecked”. The action can be executed by all users.

ProductionBillOfMaterialItemActivityAssignment

ProductionBillOfMaterialItemActivityAssignment is an assignment that, for a ProductionSegment, can determine which activity of its assigned ProductionBillOfOperations is assigned which Bill Of Material item group or Bill Of Material item of its assigned Bill Of Material Variant (i.e., component assignment). An Activity in this document can be a part of the business object ProductionBillOfOperations (i.e., nodeOperationActivity), has the category "Produce" and should not be confused with the business object Activity. ProductionBillOfMaterialItemActivityAssignment may not have specializations.

The elements located directly at the node ProductionBillOfMaterialItemActivityAssignment are defined by the data type: ProductionSegmentProductionBillOfMaterialItemActivityAssignmentElements. In certain implementations, these elements may include the following: UUID, ProductionBillOfMaterialItemGroupID, ProductionBillOfMaterialItemGroupUUID, ProductionBillOfMaterialItemGroupItemID, ProductionBillOfMaterialItemGroupItemUUID, ProductionBillOfOperationsOperationID, ProductionBillOfOperationsActivityID, ProductionBillOfOperationsActivityUUID, LogisticsConfirmationMethodCode.

UUID is a universal identifier, which may be unique, of a ProductionBillOfMaterialItemActivityAssignment. UUID may be based on GDT UUID. ProductionBillOfMaterialItemGroupID is an identifier of the assigned BillOfMaterialItemGroup and can be unique in combination with the ProductionBillOfMaterialGroupID and may be optional. ProductionBillOfMaterialItemGroupID may be based on GDT BillOfMaterialItemGroupID. ProductionBillOfMaterialItemGroupUUID is a universal identifier, which may be unique, of the assigned BillOfMaterialItemGroup and may be optional. ProductionBillOfMaterialItemGroupUUID may be based on GDT UUID. ProductionBillOfMaterialItemGroupItemID is an identifier of the assigned BillOfMaterialItem that can be unique in combination with the ProductionBillOfMaterialGroupID and the ProductionBillOfMaterialItemGroupID and may be optional. ProductionBillOfMaterialItemGroupItemID may be based on GDT BillOfMaterialItemGroupItemID. ProductionBillOfMaterialItemGroupItemUUID is a universal identifier, which may be unique, of the assigned BillOfMaterialItemGroupItem and may be optional. ProductionBillOfMaterialItemGroupItemUUID may be based on GDT UUID. ProductionBillOfOperationsOperationID is an identifier of the operation of the assigned activity that can be unique in combination with the BillOfOperationsID and may be optional. ProductionBillOfOperationsOperationID may be based on GDT BillOfOperationsElementID. ProductionBillOfOperationsActivityID is an identifier of the assigned activity that can be unique in combination with the BillOfOperationsID and the BillOfOperationsOperationID and may be optional. ProductionBillOfOperationsActivityID may be based on GDT OperationActivityID. ProductionBillOfOperationsActivityUUID is an universal identifier, which may be unique, of the assigned activity and may be optional. ProductionBillOfOperationsActivityUUID may be based on GDT UUID. LogisticsConfirmationMethodCode is the coded representation of the type of confirmation to be used when confirming the materials of the production bill of materials group or the production bill of materials item and may be optional. LogisticsConfirmationMethodCode may be based on GDT LogisticsConfirmationMethodCode. In some implementations, composition relationships to subordinate nodes may not exist.

The following inbound aggregation relationships may exist. From the business object ProductionBillOfOperations/node OperationActivity, ProductionBillOfMaterialItemActivityAssignment can have a 1:cn cardinality inbound aggregation relationship with Activity, where Activity denotes an activity assigned to a ProductionBillOfMaterialItem or a ProductionBillOfMaterialItemGroup in the context of a ProductionSegment. From the business object ProductionBillOfMaterial/node ProductionBillOfMaterialItemGroup, ProductionBillOfMaterialItemActivityAssignment can have a 1:cn cardinality inbound aggregation relationship with ProductionBillOfMaterialItemGroup, where ProductionBillOfMaterialItemGroup denotes a ProductionBillOfMaterialItemGroup assigned to an Activity in the context of a ProductionSegment. From the business object ProductionBillOfMaterial/node ProductionBillOfMaterialItemGroupItem, ProductionBillOfMaterialItemActivityAssignment can have a c:cn cardinality inbound aggregation relationship with ProductionBillOfMaterialItemGroupItem, where ProductionBillOfMaterialItemGroupItem denotes a ProductionBillOfMaterialItem assigned to an Activity in the context of a ProductionSegment.

The integrity of ProductionBillOfMaterialItemActivityAssignment may be as follows. In some implementations, either a ProductionBillOfMaterialItemGroup or a ProductionBillOfMaterialItemGroupItem may need to be assigned to a ProductionBillOfMaterialItemActivityAssignment. In some implementations, the ProductionBillOfMaterialItems or the ProductionBillOfMaterialItemGroups may exist and they may belong to the same bill of material as the Bill Of Material Variant in the node ProductionSegment (root). In some implementations, the ProductionBillOfMaterialItem or the ProductionBillOfMaterialItemGroup may exist and may belong to the same bill of material as the Bill Of Material Variant in the node ProductionSegment (root). The activity can be an operation activity, it can exist and it may belong to the bill of operations in the ProductionSegment (root). In some implementations, the ProductionBillOfOperationsOperationID be filled along with the ProductionBillOfOperationsActivityID or the ProductionBillOfOperationsActivityUUID. In some implementations, the ProductionBillOfMaterialItemGroupID or ProductionBillOfMaterialItemGroupID may be filled with the ProductionBillOfMaterialItemGroupItemID, the ProductionBillOfMaterialItemGroupUUID, or the ProductionBillOfMaterialItemGroupItemUUID.

ProductActivityAssignment

ProductActivityAssignment is an assignment that defines for a ProductionSegment which product is assigned as ByProduct or CoProduct to which Activity of its ProductionBillOfOperations. ProductActivityAssignment can occur in the following partial and disjoint specializations: CoProductActivityAssignment and/or ByProductActivityAssignment. CoProductActivityAssignment 148018 defines for a ProductionSegment which material is assigned as CoProduct to which activity of its ProductionBillOfOperations. CoProducts can be desired materials that are produced during the production of another product. ByProductActivityAssignment 148020 defines for a ProductionSegment which material is assigned as ByProduct to which activity of its ProductionBillOfOperations. ByProducts can be undesirable materials that are produced during the production of another product.

In some implementations, the role "main product" may not be required here as the main product may appear directly in the root node ProductionSegment as an attribute.

The elements located directly at the node ProductActivityAssignment 148016 are defined by the data type: ProductionSegmentProductActivityAssignmentElements. In certain implementations, these elements may include the following: UUID, MaterialID, MaterialUUID, ProductionBillOfOperationsOperationID, ProductionBillOfOperationsActivityID, ProductionBillOfOperationsActivityUUID, JointProductionMaterialRoleCode, VariableProductOutputQuantity, VariableProductOutputQuantityTypeCode.

UUID is a universal identifier, which may be unique, of a ProductActivityAssignment. UUID may be based on GDT UUID. MaterialID is an identifier, which may be unique, of the assigned co-product or by-product and may be optional. MaterialID may be based on GDT ProductID. MaterialUUID is a universal identifier, which may be unique, of the Material of the assigned co-product or by-productProductionSegment and may be optional. MaterialUUID may be based on GDT UUID. ProductionBillOfOperationsOperationID is an identifier of the operation of the assigned activity that is may be unique in combination with the BillOfOperationsID and may be optional. ProductionBillOfOperationsOperationID may be based on GDT BillOfOperationsElementID. ProductionBillOfOperationsActivityID is an identifier of the assigned activity that can be unique in combination with the BillOfOperationsID and the BillOfOperationsOperationID and may be optional. ProductionBillOfOperationsActivityID may be based on GDT OperationActivityID. ProductionBillOfOperationsActivityUUID is a universal identifier, which may be unique, of the assigned activity and may be optional. ProductionBillOfOperationsActivityUUID may be based on GDT UUID. JointProductionMaterialRoleCode defines whether the assigned Material is a co-product or a byproduct. (Limitation of the code values to "CoProduct" and "ByProduct," in the first release to "ByProduct" may exist.) JointProductionMaterialRoleCode may be based on GDT MaterialRoleCode, 1. Qualifiers may include: JointProduction. VariableProductOutputQuantity is variable output quantity and quantity unit of measure of the assigned co-product or by-product and may be optional. VariableProductOutputQuantity may be based on GDT Quantity, 1. Qualifiers may include: Output. VariableProductOutputQuantityTypeCode contains the type code of Variable output quantity of the assigned co-product or by-product and may be optional. VariableProductOutputQuantityTypeCode may be based on GDT QuantityTypeCode. In some implementations, composition relationships to subordinate nodes may not exist.

The following inbound aggregation relationships may exist. From the business object ProductionBillOfOperations/node OperationActivity, business object ProductionSegment can have a 1:cn cardinality inbound aggregation relationship with Activity, where the Activity denotes an Activity assigned to a CoProduct or a ByProduct in the context of a ProductionSegment. From business object Material/node Material, business object ProductionSegment can have a 1:cn cardinality inbound aggregation relationship with Material, where Material denotes the Material assigned to the ProductionSegment as CoProduct or ByProduct.

The integrity of ProductActivityAssignment may be as follows. In some implementations, by-products are supported in the first release. In some implementations, the Material may exist and may not be the same Material as the one at the node ProductionSegment (root). In some implementations, the activity may be an operation activity, it may exist and it belongs to the bill of operations in the ProductionSegment (root). Further, in certain implementations, the output quantity is mandatory for co-products. A combination of activity and material may occur as either co-product or as by-product. In some implementations, either the MaterialID or the MaterialUUID may be entered. Also, in some implementations, the ProductionBillOfOperationsOperationID may be filled along with the ProductionBillOfOperationsActivityID or the ProductionBillOfOperationsActivityUUID.

DO: AttachmentFolder

DO: AttachmentFolder defines which existing document is assigned in electronic form to a ProductionSegment.

DO: TextCollection

DO: TextCollection is a natural-language explanation of the features of the ProductionSegment.

Description

Description is a natural-language explanation of the features of the ProductionSegment. The elements located directly at the node Description are defined by the data type: ProductionSegmentDescriptionElements. In certain implementations, these elements may include the following: Description. Description may be based on GDT MEDIUM_Description.

HierarchicalViewElement (Transformation Node)

HierarchicalViewElement is an element of a hierarchical view of the structure of a production segment and its assigned production bill of operations. The top levels of the HierarchicalViewElement can be derived from the structure of a production bill of operations. This structure can be determined by production bill of operations elements and operation activities. It may correspond to the node HierarchicalViewElement of the ProductionBillOfOperations.

The hierarchy and the order within a hierarchy level can result from the hierarchical relations and the chronologically defined arrangements between the bill of operations elements and the operation activities as they are defined in the bill of operations.

The hierarchy level below an operation activity can contain the items of a production bill of material item group, co-products, and by-products that are assigned to this activity in the context of the production segment. The hierarchy level below the item of production bill of material item group can contain the materials of its item change states.

The elements located directly at the node HierarchicalViewElement are defined by the data type: ProductionSegmentHierarchicalViewElementElements. In certain implementations, these elements may include the following: ObjectID, ObjectNodeTypeCode, ElementOrdinalNumberValue.

ObjectID identifies the Object of the hierarchy. ObjectID may be based on GDT ObjectID. ObjectNodeTypeCode denotes the type of the object of the hierarchy. ObjectNodeTypeCode may be based on GDT ObjectNodeTypeCode. ElementOrdinalNumberValue is the value calculated during sorting of the elements. ElementOrdinalNumberValue may be based on GDT OrdinalNumberValue.

Certain composition relationships to subordinate nodes may exist. The HierarchicalViewElement (Transformation Node) has a 1:cn cardinality relationship with a HierarchicalViewElementProductionBillOf-MaterialItemGroupItemChangeState subordinate node. The HierarchicalViewElement (Transformation Node) has a 1:cn cardinality relationship with a HierarchicalViewElementDescription 148032 subordinate node.

The following (specialization) association for navigation relationships may exist. To node HierarchicalViewElement, business object ProductionSegment can have a 1:cn cardinality (specialization) association for navigation with SubhierarchyLevelHierarchicalViewElement, where SubhierarchyLevelHierarchicalViewElement denotes all objects from the next level of the hierarchy. To business object ProductionBillOfOperations/node Element, business object ProductionSegment can have a c:c cardinality (specialization) association for navigation with ProductionBillOfOperationElement, where ProductionBillOfOperationElement denotes the Production Bill Of Operation Element. To business object ProductionBillOfOperations/node OperationActivity, business object ProductionSegment can have a c:c cardinality (specialization) association for navigation with OperationActivity, where OperationActivity denotes the Production Bill Of Operation Activity. To business object ProductionSegment/node ProductActivityAssignment, business object ProductionSegment can have a c:c cardinality (specialization) association for navigation with ProductActivityAssignment, where ProductActivityAssignment denotes the Assignment of a co-product or by-product that is assigned to an activity. To business object ProductionSegment/node ProductionBillOfMaterialItemActivityAssignment, business object ProductionSegment can have a c:c cardinality (specialization) association for navigation with ProductionBillOfMaterialItemActivityAssignment, where ProductionBillOfMaterialItemActivityAssignment denotes the Assignment of an item (business object ProductionBillOfMaterial/node ItemGroupItem) to an activity (business object ProductionBillOfOperations/node OperationActivity). To business object Material/node Root, business object ProductionSegment can have a c:c cardinality (specialization) association for navigation with Material, where Material denotes a material of item change state.

There may be multiple enterprise service infrastructure actions. UnassignAllItems may remove all assignments (business object ProductionSegment/nodes HierarchicalViewElement and ProductionBillOfMaterialItemActivityAssignment) of items of the ProductionBillOfMaterial (node ItemGroupItems) to the ProductionBillOfOperations activities. There may be no preconditions. All Item to activity assignment entries may be deleted in the nodes HierarchicalViewElement and ProductionBillOfMaterialActivityAssignment. The action can be executed by all users.

UnassignProduct may remove the assignment of a co-product or by-product to an activity. There may be no preconditions. Product to activity assignment entries may be deleted in the nodes HierarchicalViewElement and ProductActivityAssignment. The action can be executed by all users.

UnassignItem may remove the assignment of one item of the ProductionBillOfMaterial (node ItemGroupItems) to an activity. There may be no preconditions. Item to activity assignment entries may be deleted in the nodes HierarchicalViewElement and ProductionBillOfMaterialActivityAssignment. The action can be executed by all users.

AssignProductToActivity may assign a co-product or by-product to an activity. In some implementations, the co-product or by-product may not yet be assigned to the activity. New product to activity assignment entries may be created in the nodes HierarchicalViewElement and ProductActivityAssignment. The action elements can be defined by the data type: ProductionSegmentHierarchicalViewElementAssignProductToActivityActionElements. These elements include MaterialID, JointProductionMaterialRoleCode, Variable ProductOutputQuantity, VariableProductOutputQuantityTypeCode. MaterialID is a unique identifier of the co-product or byproduct that shall be assigned to an activity, and is a GDT of type ProductID. JointProductionMaterialRoleCode defines whether the assigned Material is a co-product or a byproduct, and is a GDT of type MaterialRoleCode, 1. Qualifier: JointProduction. VariableProductOutputQuantity is a variable output quantity and quantity unit of measure of the assigned co-product or by-product, and is a GDT of type Quantity, 1. Qualifier: Output. VariableProductOutputQuantity may be optional. VariableProductOutputQuantityTypeCode is a quantity type code of variable output quantity of the assigned co-product or by-product, and is a GDT of type QuantityTypeCode. VariableProductOutputQuantityTypeCode may be optional. The action can be executed by all users.

HierarchicalViewElementDescription (Transformation Node)

HierarchicalViewElementDescription (Transformation Node) is a natural-language explanation of the features of the objects of the hierarchy. The elements located directly at the node HierarchicalViewElementDescription are defined by the data type: ProductionSegmentHierarchicalViewElementDescriptionElements. In certain implementations, these elements may include the following: Description. Description may be based on GDT MEDIUM_Description.

HierarchicalViewElementProductionBillMaterialItemGroupItemChangeState (Transformation Node)

HierarchicalViewElementProductionBillOfMaterialItemGroupItemChangeState 148034 (Transformation Node) is a change state of an item of a bill of material item group that is or can be assigned to a operation activity. The elements located directly at the node HierarchicalViewElementProductionBillOfMaterialItemGroupItemChangeState are defined by the data type: ProductionSegmentHierarchicalViewElementProductionBillOfMaterialItemGroupItemChangeState Elements. In certain implementations, these elements may include the following: ProductionBillOfMaterialItemGroupItemChangeStateUUID, ProductionActivityAssignmentAppliedIndicator.

ProductionBillOfMaterialItemGroupItemChangeStateUUID is a universal identifier, which may be unique, of the ProductionBillOfMaterialItemGroupItemChangeState that belongs to an Item, which may already be assigned or can be assigned to a production activity. ProductionBillOfMaterialItemGroupItemChangeStateUUID may be based on GDT UUID.

ProductionActivityAssignmentAppliedIndicator determines whether the Item of the ProductionBillOfMaterialItemGroupItemChangeState is assigned to an activity of the hierarchic view and is optional. ProductionActivityAssignmentAppliedIndicator may be based on GDT Indicator. Qualifiers may include: Applied. In some implementations, composition relationships to subordinate nodes may not exist.

There may be one or more inbound aggregation relationships. From the business object ProductionBillOfMaterial/node ItemGroupItemChangeState, business object ProductionSegment can have a 1:cn cardinality inbound aggregation relationship with ProductionB IllOfMaterialItemGroupItemChangeState, where ProductionBillOfMaterialItemGroupItemChangeState denotes a ProductionBillOfMaterialItemGroupItemChangeState of an Item that can be assigned to an Activity in the context of a ProductionSegment.

There may be one or more (specialization) associations for navigation. To business object ProductionSegment/node ProductionBillOfMaterialItemActivityAssignment, business object ProductionSegment can have a c:cn cardinality (specialization) associations for navigation with ProductionBillOfMaterialItemActivityAssignment, where ProductionBillOfMaterialItemActivityAssignment denotes to which Activities the ProductionBillOfMaterialItemGroupItem of a Item change state is already assigned.

There may be one or more actions. AssignItemToActivity may assign an item of ProductionBillOfMaterial (node ItemGroupItem) to an activity. In some implementations, the item may not yet be assigned to the activity. New item to activity assignment entries will be created in the nodes HierarchicalViewElement and ProductionBillOfMaterialActivityAssignment. The ProductionActivityAssignmentAppliedIndicator of node HierarchicalViewElementProductionBillOfMaterialItemGroupItemChangeState may be set for all change states of the assigned item. The action elements are defined by the data type: ProductionSegmentHierarchicalViewElementProductionBillOfMaterialItemGroupItemChangeState AssignItemToActivityActionElements. These elements can be LogisticsConfirmationMethodCode, which can be a coded representation of the type of confirmation to be used when confirming the materials of the production bill of materials group or the production bill of materials item, and is a GDT of type LogisticsConfirmationMethodCode. The action can be executed by all users.

Business Object ReleasedExecutionProductModel

FIGS. 149-1 through 149-18 illustrate an example RELEASEDEXECUTIONPRODUCTIONMODEL business object model 149020. Specifically, this model depicts interactions among various hierarchical components of the RELEASEDEXECUTIONPRODUCTIONMODEL, as well as external components that interact with the RELEASEDEXECUTIONPRODUCTIONMODEL (shown here as 149000 through 149018, 149022 through 149068 and 149192).

BO ReleasedExecutionProductionModel is a released version of a production model that contains all the production bill of operations and production bill of material data required for the execution of a production process.

BO ReleasedPlanningProductionModel contains master data for production planning; BO ReleasedExecutionProductionModel, on the other hand, contains master data for production execution.

BO ReleasedExecutionProductionModel may be used to create ProductionRequests and ProductionOrders and may contain all the necessary master data from the ProductionModel.

The BO ReleasedExecutionProductionModel (s) for a ProductionModel may be versioned. BO ReleasedExecutionProductionModel may contain the master data version of a ProductionModel available when BO ReleasedExecutionProductionModel was created.

BO ReleasedExecutionProductionModel may be part of the process component Production Model Processing.

A ReleasedExecutionProductionModel may be split into ProductionSegments. Each ProductionSegment 149072 may contain BOM information from the ProductionBillOfMaterial and BOO information from the ProductionBillOfOperations.

BO ReleasedExecutionProductionModel is represented by the root node "Root".

NODE STRUCTURE OF BO ReleasedExecutionProductionModel

Root Node

BO ReleasedExecutionProductionModel 149070/Root Node is a structure that represents the master data required for production execution. It may contain information on the bill of materials and bill of operations as well as data on the production segments. It may also contain identifying and administrative data.

The structure elements located directly at Root Node are defined by data type GDT ReleasedExecutionProductionModelElements. In certain implementations these elements may include:

UUID is an identifier, which may be unique, of the ReleasedExecutionProductionModel. It may be based on GDT UUID.

ProductionModelID is an identifier of the ReleasedExecutionProductionModel. The pair, ProductionSegmentID and VersionID, may uniquely identify the ReleasedExecutionProductionModel. ProductionModelID may be based on GDT ProductionModelID.

VersionID is a version counter for the generated version of the ReleasedExecutionProductionModel. The version counter is a positive number between 1 and 2,147,483,647. It may be based on GDT VersionID.

ProductionModelUUID is an identifier, which may be unique, of the ProductionModel from which the ReleasedExecutionProductionModel was generated. It may be based on GDT UUID.

MaterialUUID specifies the material that is the main product of the production process as described by the ReleasedExecutionProductionModel.

ReleasedPlanningProductionModelUUID is an identifier, which may be unique, of the corresponding ReleasedPlanningProductionModel. It may be based on GDT UUID.

ProductionModelChangeDateTime is the date stamp of the last change to the ProductionModel. It may be based on GDT _GLOBAL_DateTime.

SystemAdministrativeData specifies administrative data recorded in the system concerning the system user who created the ReleasedExecutionProductionModel and the time of creation. It may be based on GDT SystemAdministrativeData.

In certain implementations of Root Node, the following composition relationships to subordinate nodes may exist. ProductionSegment may have a cardinality relationship of 1:n. Description 149184 may have a cardinality relationship of 1:cn. HierarchicalViewFilterCondition 149186 may have a cardinality relationship of 1:1. HierarchicalViewElement may have a cardinality relationship of 1:n.

In certain implementations of Root Node, the following inbound aggregation relationships may exist: ProductionModel may have a cardinality relationship of c:cn, and indicates the ProductionModel from which the ReleasedExecutionProductionModel was generated.

In certain implementations of Root Node, the following inbound association relationships may exist: Material may have a cardinality relationship of 1:cn, and indicates the material that is the main product of the production process as described by the ReleasedExecutionProductionModel. ReleasedPlanningProductionModel may have a cardinality relationship of 1:cn, and indicates the associated ReleasedPlanningProductionModel. CreationIdentity may have a cardinality relationship of 1:cn, and indicates the user who created the root node.

In certain implementations of Root Node the following queries may be called: QueryByElements, QueryByElementIDs, or QueryByNewestVersion.

QueryByElements provides a list of all ReleasedExecutionProductionModels that fulfill the selection conditions for the UUIDs of the ProductionModel and the material as well as the version. Its query elements are defined by data type ReleasedExecutionProductionModelElementsQueryElements. In certain implementations of Root Node these elements may include: ProductionModelUUID, which may be based on GDT UUID; MaterialUUID, which may be based on GDT UUID; VersionID, which may be based on GDT VersionID; and ReleasedPlanningProductionModelUUID, which may be based on GDT UUID. The above elements may be optional.

QueryByElementIDs provides a list of all ReleasedExecutionProductionModels that fulfill the selection conditions for the IDs of the ReleasedExecutionProductionModels, the material, and the version. Its query elements are defined by data type ReleasedExecutionProductionModelElementsQueryElements. In certain implementations of Root Node these elements may include: ProductionModelID, which may be based on GDT ProductionModelID; MaterialID, which may be based on GDT ProductID (MaterialUUID may be determined from the ID of the Root Node of the business object Material); and VersionID, which may be based on GDT VersionID. The above elements may be optional.

QueryByNewestVersion provides a list of each of the newest versions of all ReleasedExecutionProductionModels that fulfill the selection conditions. Its query elements are defined by data type ReleasedExecutionProductionModelNewestVersionQueryElements. In certain implementations of Root Node these elements may include: ProductionModelUUID, which may be based on GDT UUID; and MaterialUUID, which may be based on GDT UUID. The above elements may be optional.

ProductionSegment

BO ReleasedExecutionProductionModel/node ProductionSegment is a segment in the production process of a material. It is a node that may create a link between the master data, BOO (BO ProductionBillOfOperations) and BOM (BO ProductionBillOfMaterial).

The structure elements located directly at node ProductionSegment are defined by data type GDT ReleasedExecutionProductionModelProductionSegmentElements. In certain implementations these elements may include the following:

UUID is an identifier, which may be unique, of the ProductionSegment. It may be based on GDT UUID.

ID is an identifier of the ProductionSegment. The pair, ProductionSegmentID and VersionID, uniquely identifies the node in a ReleasedExecutionProductionModel. It may be based on GDT ProductionSegmentID.

VersionID is a version counter for the generation version of the ProductionSegment. This counter may be independent of the use of the ProductionSegment in ReleasedExecutionProductionModels. The version counter is a positive number between 1 and 2.147.483.647. It may be based on GDT VersionID.

ProductionSegmentUUID is an identifier, which may be unique, of the business object instance of the ProductionSegment from which the ProductionSegment of the ReleasedExecutionProductionModels was generated. It may be based on GDTUUID.

MaterialUUID specifies the material that is the main product of the production process as described by the ProductionSegment. It may be based on GDT UUID.

BillOfOperationsUUID specifies the BillOfOperations used in the ProductionSegment. It may be based on GDT UUID.

BillOfOperationsID is an identifier, which may be unique, of the BillOperations. It may be based on GDT BillOfOperationsID.

BillOfMaterialUUID specifies the BillOfMaterial used in the ProductionSegment. It may be based on GDT UUID.

BillOfMaterialID is an identifier, which may be unique, of the BillOfMaterial. It may be based on GDT BillOfMaterialID.

CreateNewVersionIndicator specifies that a new version of the production segment should be created. This element may be based on GDT CreateNewVersionIndicator. This element may be optional.

ProductionSegmentChangeDateTime is a date stamp of the last change to the business object instance of the ProductionSegment from which the ProductionSegment of the ReleasedExecutionProductionModels was generated. It may be based on GDT _GLOBAL_DateTime.

ProductionScrapPercent is a percentage that specifies which part of the complete quantity is scrap. This element is optional. The yield of the ProductionSegment is the difference between the total quantity and the scrap quantity. It may be based on GDT Percent.

ProductionTaskGenerationInstruction is an instruction according to which the production tasks are created. Specifies for which concrete production step the production tasks are created (values: ReportingPoint, Operation, and Activity), which event triggers the creation of the production tasks, and which layout is used for the representation of the production tasks. It may be based on GDT LogisticsTaskGenerationInstruction.

In certain implementations of node ProductionSegment, the following composition relationships to subordinate nodes may exist. ProductionSegmentMaterialOutput 149168 may have a cardinality relationship of 1:n. ProductionSegmentMaterialInput 149166 may have a cardinality relationship of 1:cn. ProductionSegmentPlanningOperation 149118 may have a cardinality relationship of 1:n. ProductionSegmentBranching 149116 may have a cardinality relationship of 1:cn. ProductionSegmentOperation 149074 may have a cardinality relationship of 1:n. ProductionSegmentInternalMaterialFlow 149140 may have a cardinality relationship of 1:n. ProductionSegmentDescription 149178 may have a cardinality relationship of 1:cn. ProductionSegmentTextCollection 149180 may be (DO) may have a cardinality relationship of 1:c. ProductionSegmentAttachmentFolder 149182 may be (DO) may have a cardinality relationship of 1:c.

In certain implementations of node ProductionSegment, the following inbound aggregation relationships may exist: ProductionSegment may have a cardinality relationship of c:cn. ProductionBillOfMaterial may have a cardinality relationship of c:cn. ProductionBillOfOperations may have a cardinality relationship of c:cn.

In certain implementations of node ProductionSegment, the following inbound association relationships may exist: Material may have a cardinality relationship of 1:cn. Successor ProductionSegment may have a cardinality relationship of c:cn.

In certain implementations of node ProductionSegment, navigation associations may exist as follows: ProductionSegmentMainProductMaterialOutput 149172 may have a cardinality relationship of 1:1.

There may be exactly one ProductionSegment that has no successor (concerning the association SuccessorProductionSegment). Every other ProductionSegment would have this SuccessorProductionSegment as a direct or on indirect successor. The Root Node and the ProductionSegment without successor would contain the same MaterialUUID.

In certain implementations of node ProductionSegment the following queries may be called: QueryByElements, QueryByElementIDs, QueryByNewestVersion, QueryByResourceRequirementResource, and/or query elements defined by data type. QueryByElements provides a list of all ProductionSegments that fulfill the selection conditions for the IDs of the ProductionModel, the ProductionSegment, the material and the version. The query elements are defined by data type ReleasedExecutionProductionModelProductionSegmentElementIDsQueryElements and may include the following: ReleasedExecutionProductionModelProductionModelUUID, which may be based on GDT UUID; ID, which may be based on GDT ProductionSegmentID); ProductionSegmentUUID, which may be based on GDT UUID; MaterialUUID, which may be based on GDT UUID; and VersionID, which may be based on GDT VersionID. The above elements may be optional.

QueryByElementIDs provides a list of all ProductionSegments that fulfill the selection conditions for the IDs of the ReleasedExecutionProductionModel, the ProductionSegment, the material, and the version. The query elements are defined by data type ReleasedExecutionProductionModelProductionSegmentElementIDsQueryElements and may include: ReleasedExecutionProductionModelProductionModelID, which may be based on GDT ProductionModelID; ID, which may be based on GDT ProductionSegmentID; MaterialID, which may be based on GDT ProductID (the MaterialUUID may be determined from the ID of the root node of the business object Material); and VersionID, which may be based on GDT VersionID. The above elements may be optional.

QueryByNewestVersion provides a list of each of the newest versions of all ProductionSegments that fulfill the selection conditions. The query elements are defined by data type ReleasedExecutionProductionModelProductionSegmentNewestVersionQueryElements and may include the following: ReleasedExecutionProductionModelProductionModelUUID, ProductionSegmentUUID, and MaterialUUID. The above elements may be optional and may be based on GDT UUID.

QueryByResourceRequirementResource provides a list of all production segments that have a ProductionSegmentOperationActivityChangeStateResourceRequirement 149100 that fulfill the selection conditions for the UUID of the resource. The query elements are defined by data type ReleasedExecutionProductionModelProductionSegmentResourceRequirementResourceQueryElements and may include query element OperationActivityChangeStateResourceRequirementResourceUUID, which may be based on GDT UUID.

ProductionSegmentMaterialOutput

BO ReleasedExecutionProductionModel/node ProductionSegmentMaterialOutput represents a material that is produced according to the production process described in ReleasedExecutionProductionModel ProductionSegment.

A ProductionSegmentMaterialOutput may exist within specialisations such as the following: ProductionSegmentMainProductMaterialOutput, such as a bill of material variant of a production bill of material (therefore providing the main product of a ProductionSegment); ProductionSegmentCoProductMaterialOutput 149174, which provides a co-product that is produced according to the production process described in a ProductionSegment; and ProductionSegmentByProductMaterialOutput 149176, which provides a by-product that is produced according to the production process described in a ProductionSegment.

The structure elements located directly at Node ProductionSegmentMaterialOutput are defined by data type GDT ReleasedExecutionProductionModelProductionSegmentMaterialOutputElements. In certain implementations these elements may include the following: UUID, BillOfMaterialVariantID, BillOfMaterialVariantUUID, MaterialRoleCode, PackingMethodCode.

UUID is an identifier, which can be unique, of MaterialOutput. This element may be based on GDT UUID.

BillOfMaterialVariantID is an identifier, which can be unique, of the ProductionSegmentMaterialOutput This element may be based on GDT BillOfMaterialVariantID.

BillOfMaterialVariantUUID is an identifier, which can be unique, of the bill of material variant in the BillOfMaterial. This element may be based on GDT UUID.

MaterialRoleCode specifies the specialization (MainProduct, CoProduct, or ByProduct). This element may be based on GDT MaterialRoleCode.

PackingMethodCode specifies the packaging at the end of the production process of the material which is the result of the production process. This element may be based on GDT PackingMethodCode. This element may be optional.

In certain implementations of Node ProductionSegmentMaterialOutput, the following composition relationship to subordinate nodes may exist. ProductionSegmentMaterialOutputChangeState may have a cardinality relationship of 1:n In certain implementations of Node ProductionSegmentMaterialOutput, the following inbound aggregation relationships may exist: BillOfMaterialVariant may have a cardinality relationship of c:cn.

Every ProductionSegmentMaterialOutput may have exactly one change state.

ProductionSegmentMaterialOutputChangeState

BO ReleasedExecutionProductionModel/ProductionSegmentMaterialOutputChangeState represents a state of a ProductionSegmentMaterialOutputItem that may occur with or without using engineering change management. If engineering change management is used, attributes of the ProductionSegmentMaterialOutputItem can be defined dependent on time.

The structure elements located directly at node ProductionSegmentMaterialOutputChangeState are defined by data type GDT ReleasedExecutionProductionModelProductionSegmentMaterialOutputChangeStateElements. In certain implementations these elements may include the following: UUID, MaterialUUID, Quantity, QuantityTypeCode.

UUID is an identifier, which may be unique, of the ChangeState. This element may be based on GDT UUID.

MaterialUUID specifies the material that is the result of the production process. This element may be based on GDT UUID.

Quantity is a variable quantity of the material produced in the production process. For the main product, this quantity defines the base quantity to which the variable quantities in the node ProductionSegmentMaterialInputChangeState 149162 and the other instances of the node ProductionSegmentMaterialOutputChangeState 149170. For co-products and by-products, the quantity refers to the base quantity defined for the main product. This element may be based on GDT Quantity. It may be optional.

QuantityTypeCode is the type of the variable quantity of the material produced in the production process. This element may be based on GDT QuantityTypeCode. It may be optional.

In certain implementations of node ProductionSegmentMaterialOutputChangeState, the following composition relationships to subordinate nodes may exist: ProductionSegmentMaterialOutputChangeStateDescription 149158 may have a cardinality relationship of 1:cn; ProductionSegmentMaterialOutputChangeStateTextCollection 149160 (DO) may have a cardinality relationship of 1:c; and ProductionSegmentMaterialOutputChangeStateAttachmentFolder 149164 (DO) may have a cardinality relationship of 1:c.

In certain implementations of node ProductionSegmentMaterialOutputChangeState, the following inbound association relationships may exist: Material may have a cardinality relationship of 1:cn.

Every ProductionSegmentMaterialOutput may have exactly one change state. MaterialUUID in the change state of a main product may be the same as MaterialUUID of the ProductionSegment. The Quantity for by-products may be blank.

ProductionSegmentMaterialOutputChangeStateDescription

BO ReleasedExecutionProductionModel/node ProductionSegmentMaterialOutputChangeStateDescription represents a language-dependent text with additional information on a ProductionSegmentMaterialOutputChangeState.

The structure elements located directly at node ProductionSegmentMaterialOutputChangeStateDescription are defined by data type GDT ProductionSegmentMaterialOutputChangeStateDescriptionElements. In certain implementations these elements may include the following: Description. Structure element Description may be based on GDT_MEDIUM_DESCRIPTION).

ProductionSegmentMaterialOutputChangeStateTextCollection (DO)

BO ReleasedExecutionProductionModel/node ProductionSegmentMaterialOutputChangeStateTextCollection (DO) represents the collection of all language-dependent texts with additional information on a ProductionSegmentMaterialOutputChangeState.

ProductionSegmentMaterialOutputChangeStateAttachmentFolder (DO)

BO ReleasedExecutionProductionModel/node ProductionSegmentMaterialOutputChangeStateAttachmentFolder (DO) represents the collection of all existing documents in electronic form with additional information on a ProductionSegmentMaterialOutputChangeState (for example, drawings).

ProductionSegmentMaterialInput

BO ReleasedExecutionProductionModel/node ProductionSegmentMaterialInput represents an item in a production bill of material. From a business perspective, it may contain information on a material that is used in the production process, such as material number and quantity.

The structure elements located directly at Node ProductionSegmentMaterialInput are defined by data type GDT: ReleasedExecutionProductionModelProductionSegmentMaterialInputElements. In certain implementations these elements may include the following: UUID, BillOfMaterialItemGroupID, BillOfMaterialItemGroupItemID, BillOfMaterialItemGroupItemUUID.

UUID is an identifier, which can be unique, of the bill of material item. This element may be based on GDT UUID.

BillOfMaterialItemGroupID is an identifier, which can be unique, of the bill of material item group. This element may be based on GDT BillOfMaterialItemGroupID.

BillOfMaterialItemGroupItemID is an identifier, which can be unique, of the bill of material item. This element may be based on GDT BillOfMaterialItemGroupItemID.

BillOfMaterialItemGroupItemUUID is an identifier, which can be unique, of the bill of material item in the BillOfMaterial. This element may be based on GDT UUID.

In certain implementations of Node ProductionSegmentMaterialInput, the following composition relationships to subordinate nodes may exist: ProductionSegmentMaterialInputChangeState may have a cardinality relationship of 1:n.

In certain implementations of Node ProductionSegmentMaterialInput, the following inbound aggregation relationships may exist: BillOfMaterialItemGroupItem may have a cardinality relationship of c:cn.

ProductionSegmentMaterialInputChangeState

BO ReleasedExecutionProductionModel/node ProductionSegmentMaterialInputChangeState represents a state of a bill of material item of a production bill of material that occurs with or without using engineering change management. If engineering change management is used, attributes of the bill of material item can be defined dependent on time.

A ProductionSegmentMaterialInputChangeState may describe a material that is produced according to the production process described in a ProductionSegment.

The elements located directly at node ProductionSegmentMaterialInputChangeState are defined by data type GDT ReleasedExecutionProductionModelProductionSegmentMaterialInputChangeStateElements. In certain implementations these elements may include the following: UUID, BillOfMaterialItemGroupItemChangeStateUUID, EngineeringChangeOrderUUID, EngineeringChangeOrderID, ValidityDatePeriod, MaterialUUID, Quantity, QuantityTypeCode, QuantityFixedIndicator.

UUID is an identifier, which may be unique, of the ChangeState. This element may be based on GDT UUID.

BillOfMaterialItemGroupItemChangeStateUUID is an identifier, which may be unique, of the change state in the BillOfMaterial. This element may be based on GDT UUID.

EngineeringChangeOrderUUID specifies the EngineeringChangeOrder that was used to create the change state. This element may be based on GDT UUID.

EngineeringChangeOrderID is an identifier, which may be unique, of the EngineeringChangeOrder. This element may be based on GDT EngineeringChangeOrderID.

ValidityDatePeriod specifies the validity period for the ProductionSegmentMaterialInputChangeState. The ProductionSegmentMaterialInputChangeState is valid for a ProductionOrder if the explosion date of the ProductionOrder lies in this interval. This element may be based on GDT DatePeriod.

MaterialUUID specifies the material used in the production process.

Quantity specifies the requirement quantity of the material. If the FixedQuantityIndicator is not set, the quantity accumulates in proportion to the order quantity of the ProductionOrder (the requirement quantity refers to the quantity in the ProductionSegmentMainProductMaterialOutput). This quantity is required irrespective of the order quantity of the ProductionOrder. This element may be based on GDT Quantity. This element may be optional.

QuantityTypeCode specifies the Type of requirement quantity. This element may be based on GDT QuantityTypeCode. This element may be optional.

QuantityFixedIndicator indicates whether the requirement quantity is fixed and therefore independent of the order quantity of the ProductionOrder. This element may be based on GDT Indicator, Qualifier Fixed. This element may be optional.

In certain implementations of node ProductionSegmentMaterialInputChangeState, the following composition relationships to subordinate nodes may exist: ProductionSegmentMaterialInputChangeStateDescription 149152 may have a cardinality relationship of 1:cn; ProductionSegmentMaterialInputChangeStateTextCollection 149154 (DO) may have a cardinality relationship of 1:c; and ProductionSegmentMaterialInputChangeStateAttachmentFolder 149156 (DO) may have a cardinality relationship of 1:c.

In certain implementations of node ProductionSegmentMaterialInputChangeState, the following inbound aggregation relationships may exist: EngineeringChangeOrder may have a cardinality relationship of c:cn.

In certain implementations of node ProductionSegment-MaterialInputChangeState, the following inbound association relationships may exist. Material may have a cardinality relationship of 1:cn. The validity periods of the change states of a bill of material item defined by the ValidityDatePeriod may be non-disjoint in pairs.

ProductionSegmentMaterialInputChangeStateDescription

BO ReleasedExecutionProductionModel/node ProductionSegmentMaterialInputChangeStateDescription represents a language-dependent text with additional information on a ProductionSegmentMaterialInputChangeState.

The structure elements located directly at node ProductionSegmentMaterialInputChangeStateDescription are defined by data type GDT ProductionSegmentMaterialInputChangeStateDescriptionElements. Structure element Description may be based on GDT_MEDIUM_DESCRIPTION.

ProductionSegmentMaterialInputChangeStateTextCollection (DO)

BO ReleasedExecutionProductionModel/node ProductionSegmentMaterialInputChangeStateTextCollection (DO) represents the collection of all language-dependent texts with additional information on a ProductionSegmentMaterialInputChangeState.

ProductionSegmentMaterialInputChangeStateAttachmentFolder (DO)

BO ReleasedExecutionProductionModel/node ProductionSegmentMaterialInputChangeStateAttachmentFolder (DO) represents the collection of all existing documents in electronic form with additional information on a ProductionSegmentMaterialInputChangeState (for example, drawings).

ProductionSegmentPlanningOperation

BO ReleasedExecutionProductionModel/node ProductionSegmentPlanningOperation represents a segment of production from a planning perspective. It may group several ProductionSegmentOperations.

Detailed process descriptions for production may be aggregated for planning purposes. With node ProductionSegmentPlanningOperation, several operations may be grouped into one planning operation to reduce the complexity of the process description.

The structure elements located directly at node ProductionSegmentPlanningOperation ReleasedExecutionProductionModel are defined by data type GDT ReleasedExecutionProductionModelProductionSegmentPlanningOperationElements. In certain implementations these elements may include the following: UUID, ID, BillOfOperationsPlanningOperationUUID.

UUID is an identifier, which may be unique, of the PlanningOperation. This element may be based on GDT UUID.

ID is an identifier, which may be unique, of the PlanningOperation. This element may be based on GDT OperationID.

BillOfOperationsPlanningOperationUUID is an identifier, which may be unique, of the planning operation in the BillOfOperations. This element may be based on GDT UUID.

In certain implementations of BO ReleasedExecutionProductionModel/node ProductionSegmentPlanningOperation, the following composition relationships to subordinate nodes may exist: ProductionSegmentPlanningOperationAlternative 149114 may have a cardinality relationship of 1:n.

In certain implementations of node ProductionSegmentPlanningOperation, the following inbound aggregation relationships may exist: BillOfOperationsPlanningOperation may have a cardinality relationship of c:cn.

ProductionSegmentPlanningOperationAlternative

BO ReleasedExecutionProductionModel/node ProductionSegmentPlanningOperationAlternative represents a planning alternative for a planning operation. Several planning alternatives of a planning operation may exist if alternative processing paths are defined in the process description.

The structure elements located directly at BO ReleasedExecutionProductionModel/node ProductionSegmentPlanningOperationAlternative are defined by data type GDT ReleasedExecutionProductionModelProductionSegmentPlanningOperationAlternativeElements. In certain implementations these elements may include the following: UUID, ID, BillOfOperationsPlanningOperationAlternativeUUID.

UUID is an identifier, which may be unique, of the planning operation alternative. This element may be based on GDT UUID.

ID is an identifier, which may be unique, of the planning operation alternative. This element may be based on GDT OperationAlternativeID.

BillOfOperationsPlanningOperationAlternativeUUID is an identifier, which may be unique, of the planning operation alternative in the BillOfOperations. This element may be based on GDT UUID.

In certain implementations of node ProductionSegmentPlanningOperationAlternative, the following inbound aggregation relationships may exist: BillOfOperationsPlanningOperationAlternative may have a cardinality relationship of c:cn.

ProductionSegmentBranching

BO ReleasedExecutionProductionModel/node ProductionSegmentBranching represents the branching of the production process into at least two alternative production paths.

Alternative production paths may exclude each other—that is, the total quantity of the intermediate product before the branching may continue on one of the alternative production paths without being split over several paths. Eventually the node may be redesigned to enable splitting of the intermediate product quantity over the alternative production paths.

The structure elements located directly at node ProductionSegmentBranching are defined by data type GDT ReleasedExecutionProductionModelProductionSegmentBranchingElements. In certain implementations these elements may include the following: UUID, ID, BillOfOperationsBranchingUUID, ProductionSegmentPlanningOperationUUID.

UUID is an identifier, which may be unique, of the branching. This element may be based on GDT UUID.

ID is an identifier, which may be unique, of the branching. This element may be based on GDT LogisticsBranchingID.

BillOfOperationsBranchingUUID specifies the UUID of the branching in the BillOfOperations. This element may be based on GDT UUID.

ProductionSegmentPlanningOperationUUID specifies the planning operation for which the alternative selected in planning is relevant for the selection of the production path in execution. This element may be based on GDT UUID. This element may be optional.

In certain implementations of node ProductionSegmentBranching, the following composition relationships to subordinate nodes may exist: ProductionSegmentBranchingPath 149120 may have a cardinality relationship of 1:n; ProductionSegmentBranchingJoin 149138 may have a cardinality relationship of 1:1; ProductionSegmentBranchingDescription 149132 may have a cardinality relationship of 1:cn; ProductionSegmentBranchingTextCollection 149134 (DO) may have a cardinality relationship of 1:c; and ProductionSegmentBranchingAttachmentFolder 149136 (DO) may have a cardinality relationship of 1:c.

In certain implementations of node ProductionSegmentBranching, the following inbound aggregation relationships may exist: BillOfOperationsBranching may have a cardinality relationship of c:cn.

In certain implementations of node ProductionSegmentBranching, the following inbound association relationships may exist: ProductionSegmentPlanningOperation may have a cardinality relationship of c:cn.

ProductionSegmentBranchingPath

BO ReleasedExecutionProductionModel/node ProductionSegmentBranchingPath represents a linear sequence of operations that represents one of several alternative production paths.

The structure elements located directly at node ProductionSegmentBranchingPath are defined by data type GDT ReleasedExecutionProductionModelProductionSegmentBranchingPathElements. In certain implementations these elements may include: UUID, ID, BillOfOperationsSequenceUUID.

UUID is an identifier, which may be unique, of the production path. This element may be based on GDT UUID.

ID is an identifier, which may be unique, of the production path. This element may be based on GDT LogisticsBranchingPathID.

BillOfOperationsSequenceUUID is an identifier, which may be unique, of the corresponding sequence in the BillOfOperations. This element may be based on GDT UUID.

In certain implementations of node ProductionSegmentBranchingPath, the following composition relationships to subordinate nodes may exist: ProductionSegmentBranchingPathChangeState 149122 may have a cardinality relationship of 1:n; ProductionSegmentBranchingPathDescription 149126 may have a cardinality relationship of 1:cn; ProductionSegmentBranchingPathTextCollection 149130 (DO) may have a cardinality relationship of 1:c; and ProductionSegmentBranchingPathAttachmentFolder 149128 (DO) may have a cardinality relationship of 1:c.

In certain implementations of node ProductionSegmentBranchingPath, the following inbound aggregation relationships may exist: BillOfOperationsSequence may have a cardinality relationship of c:cn.

ProductionSegmentBranchingPathChangeState

BO ReleasedExecutionProductionModel/node ProductionSegmentBranchingPathChangeState represents a state of a ProductionSegmentBranchingPaths that occurs with or without using engineering change management. If engineering change management is used, attributes of the production path may be defined dependent on time.

The structure elements located directly at node ProductionSegmentBranchingPathChangeState are defined by data type GDT ReleasedExecutionProductionModelProductionSegmentBranchingPathChangeStateElements. In certain implementations these elements may include the following: UUID, BillOfOperationsSequenceChangeStateUUID, ProductionSegmentPlanningOperationAlternativeUUID, DefaultIndicator, PlanningRelevanceIndicator.

UUID is an identifier, which may be unique, of the ChangeState. This element may be based on GDT UUID.

BillOfOperationsSequenceChangeStateUUID specifies the UUID of the change state in the BillOfOperations. This element may be based on GDT UUID.

ProductionSegmentPlanningOperationAlternativeUUID specifies the planning operation alternative that is relevant for selecting the production path in execution. This element may be based on GDT UUID. This element may be optional.

DefaultIndicator indicates the default production path. This element may be based on GDT DefaultIndicator. This element may be optional.

PlanningRelevanceIndicator indicates that the production path is planning relevant. This element may be based on GDT RelevanceIndicator. This element may be optional.

In certain implementations of node ProductionSegmentBranchingPathChangeState, the following inbound association relationships may exist: ProductionSegmentPlanningOperationAlternative may have a cardinality relationship of c:n, which specifies the planning operation alternative that is relevant for selecting the production path in execution.

ProductionSegmentBranchingPathDescription

BO ReleasedExecutionProductionModel/node ProductionSegmentBranchingPathDescription represents a language-dependent text with additional information on a ProductionSegmentBranchingPath.

The structure elements located directly at node ProductionSegmentBranchingPathDescription are defined by the element structure ReleasedExecutionProductionModelProductionSegmentBranchingPathDescriptionElements. Structure element Description 149124 may be based on GDT _MEDIUM_DESCRIPTION.

ProductionSegmentBranchingPathTextCollection (DO)

BO ReleasedExecutionProductionModel/node ProductionSegmentBranchingPathTextCollection (DO) represents the collection of all language-dependent texts with additional information on a ProductionSegmentBranchingPath.

ProductionSegmentBranchingPathAttachmentFolder (DO)

BO ReleasedExecutionProductionModel/node ProductionSegmentBranchingPathAttachmentFolder (DO) represents the collection of all existing documents in electronic form with additional information on a ProductionSegmentBranchingPath (for example, drawings).

ProductionSegmentBranchingJoin

BO ReleasedExecutionProductionModel/node ProductionSegmentBranchingJoin represents the rejoining of a branched material flow. The material flow may describe how intermediate products are passed on from one operation to a succeeding operation.

The structure elements located directly at node ProductionSegmentBranchingJoin are defined by data type GDT ReleasedExecutionProductionModelProductionSegmentBranchingJoinElements. In certain implementations these elements may include the following: UUID, ID.

UUID is an identifier, which may be unique, of the join. This element may be based on GDT UUID.

ID is an identifier, which may be unique, of the join. This element may be based on GDT LogisticsBranchingJoinID.

ProductionSegmentBranchingDescription

BO ReleasedExecutionProductionModel/node ProductionSegmentBranchingDescription represents a language-dependent text with additional information on a ProductionSegmentBranching.

The structure elements located directly at node ProductionSegmentBranchingDescription are defined by data type GDT ReleasedExecutionProductionModelProductionSegmentBranchingDescriptionElements. The structure element Description may be based on GDT _MEDIUM_DESCRIPTION.

ProductionSegmentBranchingTextCollection (DO)

BO ReleasedExecutionProductionModel/node ProductionSegmentBranchingTextCollection (DO) represents the collection of all language-dependent texts with additional information on a ProductionSegmentBranching.

ProductionSegmentBranchingAttachmentFolder (DO)

BO ReleasedExecutionProductionModel/node ProductionSegmentBranchingAttachmentFolder (DO) represents the collection of all existing documents in electronic form with additional information on a ProductionSegmentBranching (for example, drawings).

ProductionSegmentOperation

BO ReleasedExecutionProductionModel/node ProductionSegmentOperation represents a self-contained operation in production. It may contain a linear sequence of ProductionSegmentOperationActivities that are produced on the same main resource.

The structure elements located directly at node ProductionSegmentOperationItem are defined by data type GDT ReleasedExecutionProductionModelProductionSegmentOperationElements. In certain implementations these elements may include the following: UUID, ID, BillOfOperationsOperationUUID, ProductionSegmentBranchingPathUUID, ProductionSegmentPlanningOperationUUID, TypeCode, CategoryCode:

UUID is an identifier, which may be unique, of the operation. This element may be based on GDT UUID.

ID is an identifier, which may be unique, of the operation. This element may be based on GDT OperationID.

BillOfOperationsOperationUUID specifies the UUID of the operation in the BillOfOperations. This element may be based on GDT UUID.

ProductionSegmentBranchingPathUUID specifies the production path in which the operation exists. If the ParentUUID is blank, then the operation exists directly below the ProductionSegment. This element may be based on GDT UUID. This element may be optional.

ProductionSegmentPlanningOperationUUID specifies the planning operation to which the operation belongs. If alternative main resources are relevant to planning, the resource selected in planning can also be transferred to execution. This element may be based on GDT UUID.

TypeCode specifies the type of operation. This element may be based on GDT OperationTypeCode.

CategoryCode specifies the category of operation. Valid categories in the ReleasedExecutionProductionModel may include "Make" and "Pack". This element may be based on GDT OperationCategoryCode.

In certain implementations of node ProductionSegmentOperation, the following composition relationships to subordinate nodes may exist: ProductionSegmentOperationActivity 149076 may have a cardinality relationship of 1:n; ProductionSegmentOperationChangeState 149110 may have a cardinality relationship of 1:n; ProductionSegmentOperationDescription 149092 may have a cardinality relationship of 1:cn; ProductionSegmentOperationTextCollection 149094 (DO) may have a cardinality relationship of 1:c; and ProductionSegmentOperationAttachmentFolder 149096 (DO) may have a cardinality relationship of 1:c.

In certain implementations of node ProductionSegmentOperation, the following inbound aggregation relationships may exist: BillOfOperationsOperation may have a cardinality relationship of c:cn. ParentProductionSegment may have a cardinality relationship of c:cn. ParentProductionSegmentBranchingPath may have a cardinality relationship of c:cn.

In certain implementations of node ProductionSegmentOperation, the following inbound association relationships may exist: ProductionSegmentPlanningOperation may have a cardinality relationship of 1:n.

Every ProductionSegmentOperation may have exactly one incoming parent association relationship (either ParentRoot or ParentPath).

The OperationType may be "Pack" in ProductionSegmentOperations that have no successor ProductionSegmentOperation in the material flow in the complete ReleasedExecutionProductionModel.

ProductionSegmentOperationActivity

BO ReleasedExecutionProductionModel/node ProductionSegmentOperationActivity represents a section of an operation that can be scheduled.

Whether or not a processing step is a part of the material flow can be controlled at the activity level above the activity type. Typically, an operation is divided into the operation activities "setup", "produce", and "tear down". Capacity and service requirements as well as materials that flow into the production process or that result from the production process can be assigned per activity.

The structure elements located directly at node ProductionSegmentOperationActivity are defined by data type GDT ReleasedExecutionProductionModelProductionSegmentOperationActivityElements. In certain implementations these elements may include the following: UUID, ID, BillOfOperationsOperationActivityUUID, PrecedingProductionSegmentOperationActivityUUID, TypeCode, CategoryCode.

UUID is an identifier, which may be unique, of the operation activity. This element may be based on GDT UUID.

ID is an identifier, which may be unique, of the operation activity. This element may be based on GDT OperationActivityID.

BillOfOperationsOperationActivityUUID is an identifier, which may be unique, of the operation activity in the BillOfOperations. This element may be based on GDT UUID.

PrecedingProductionSegmentOperationActivityUUID specifies the preceding activity in the same operation. This element may be based on GDT UUID. This element may be optional.

TypeCode specifies the operation activity type. This element may be based on GDT OperationActivityTypeCode.

CategoryCode specifies the category of operation activity. It determines whether the activity is included in the material flow, for example. This element may be based on GDT OperationActivityCategoryCode.

In certain implementations of node ProductionSegmentOperationActivity, the following composition relationships to subordinate nodes may exist: ProductionSegmentOperationActivityMaterialAssignment 149112 may have a cardinality relationship of 1:cn; and ProductionSegmentOperationActivityChangeState 149080 may have a cardinality relationship of 1:n.

In certain implementations of node ProductionSegmentOperationActivity, the following inbound aggregation relationships may exist: BillOfOperationsOperationActivity may have a cardinality relationship of c:cn.

In certain implementations of node ProductionSegmentOperationActivity, the following inbound association relationships may exist: PrecedingProductionSegmentOperationActivity 149078 may have a cardinality relationship of c:c, which specifies the preceding activity in the same operation.

The ActivityType may be related to the OperationType of the corresponding ProductionSegmentOperation. The activities identified by the UUID and the PrecedingProductionSegmentOperationActivityUUID may belong to the same operation. The PrecedingProductionSegmentOperationActivityUUID may define a unique sequence of the activities of a ProductionSegmentOperationActivity.

ProductionSegmentOperationActivityMaterialAssignment

BO ReleasedExecutionProductionModel/node ProductionSegmentOperationActivityMaterialAssignment represents the assignment of a BOM item, a co-product, or a by-product to an operation activity. The assignment may describe the ProductionSegmentOperationActivity into or from which the material defined in the assigned node flows in the production process.

The structure elements located directly at node ProductionSegmentOperationActivityfMaterialAssignment are defined by data type GDT ProductionSegmentOperationActivityMaterialAssignmentElements. In certain implementations these elements may include the following: UUID, ProductionSegmentActivityAssignmentUUID, ProductionSegmentMaterialOutputUUID, ProductionSegmentMaterialInputUUID, ConfirmationMethodCode.

UUID is an identifier, which may be unique, of the assignment. This element may be based on GDT UUID.

ProductionSegmentActivityAssignmentUUID is an identifier, which may be unique, of the component assignment in the production segment. This element may be based on GDT UUID.

ProductionSegmentMaterialOutputUUID specifies which by-product or co-product may be assigned to the operation activity. This element may be based on GDT UUID. This element may be optional.

ProductionSegmentMaterialInputUUID specifies which bill of material item may be assigned to the operation activity. This element may be based on GDT UUID. This element may be optional.

ConfirmationMethodCode specifies the procedure used to confirm the material defined in a bill of material item. Values: Backflush (default), Explicit. This element may be based on GDT LogisticsConfirmationMethodCode. This element may be optional.

In certain implementations of BO ReleasedExecutionProductionModel/node ProductionSegmentOperationActivityfMaterialAssignment, the following inbound aggregation relationships may exist:

ProductionSegmentMaterialOutput may have a cardinality relationship of c:cn.

ProductionSegmentMaterialInput may have a cardinality relationship of c:cn.

Each ProductionSegmentMaterialAssignment may have exactly one incoming assigned aggregation relationship (either ProductionSegmentMaterialOutput or ProductionSegmentMaterialInput).

Materials (that is, ProductionSegmentMaterialOutputs or ProductionSegmentMaterialInputs) that are assigned ProductionSegmentOperationActivities and that do not occur in alternative paths may have no further MaterialAssignments. Materials that are assigned ProductionSegmentOperationActivities that occur in alternative paths may have MaterialAssignments to exactly one ProductionSegmentOperationActivity on each alternative path of the corresponding ProductionSegmentBranching.

The activity type of the parent node of a ProductionSegmentOperationActivityMaterialAssignment may allow it to take part in the material flow.

The ConfirmationMethodCode may be blank when the incoming assigned aggregation relationship is of the type ProductionSegmentMaterialOutput.

ProductionSegmentOperationActivityChangeState

BO ReleasedExecutionProductionModel/node ProductionSegmentOperationActivityChangeState represents a state of an operation activity that occurs with or without using engineering change management.

If engineering change management is used, attributes of the operation activity and the subordinate nodes can be defined dependent on time.

The structure elements located directly at node ProductionSegmentOperationActivityChangeState are defined by data type GDT ReleasedExecutionProductionModelProductionSegmentOperationActivityChangeStateElements. In certain implementations these elements may include the following: UUID, BillOfOperationsOperationActivityChangeStateUUID, FixedDuration, VariableDuration, ConfirmationMethodCode.

UUID is an identifier, which may be unique, of the ChangeState. This element may be based on GDT UUID.

BillOfOperationsOperationActivityChangeStateUUID is an identifier, which may be unique, of the ActivityChangeState in the BillOfOperations. This element may be based on GDT UUID.

FixedDuration specifies a fixed duration of the operation activity. This duration is required irrespective of the order quantity of the ProductionOrder. This element may be based on GDT TIME_Duration. This element may be optional.

VariableDuration specifies a variable duration of the operation activity. This duration occurs in proportion to the order quantity of the ProductionOrder. The variable duration refers to the BaseQuantity in the OperationChangeState. This element may be based on GDT TIME_Duration. This element may be optional.

ConfirmationMethodCode specifies which procedure may be used to confirm the activity. Values: Backflush (default), Explicit. This element may be based on GDT LogisticsConfirmationMethodCode. This element may be optional.

In certain implementations of node ProductionSegmentOperationActivityChangeState, the following composition relationships to subordinate nodes may exist: ProductionSegmentOperationActivityChangeStateStep 149082 may have a cardinality relationship of 1:cn; ProductionSegmentOperationActivityChangeStateResourceRequirement 149100 may have a cardinality relationship of 1:n; ProductionSegmentOperationActivityChangeStateServiceProductInput 149098 may have a cardinality relationship of 1:cn; ProductionSegmentOperationActivityChangeStateDescription 149102 may have a cardinality relationship of 1:cn; ProductionSegmentOperationActivityChangeStateTextCollection 149104 (DO) may have a cardinality relationship of 1:c; and ProductionSegmentOperationActivityChangeStateAttachmentFolder 149106 (DO) may have a cardinality relationship of 1:c.

In certain implementations of node ProductionSegmentOperationActivityChangeState, the following inbound aggregation relationships may exist: OperationChangeState may have a cardinality relationship of 1:cn.

Every ProductionSegmentOperationActivity may have exactly one change state.

ProductionSegmentBranchingPathChangeStateStep

BO ReleasedExecutionProductionModel/node ProductionSegmentBranchingPathChangeStateStep represents a detailed work instruction within an operation activity.

The structure elements located directly at node ProductionSegmentOperationActivityChangeStateStep are defined by data type GDT ReleasedExecutionProductionModelProductionSegmentOperationActivityChangeStateStepElements. In certain implementations these elements may include the following: UUID, OperationActivityStepID, BillOfOperationsOperationActivityStepChangeStateUUID, PrecedingProductionSegmentOperationActivityChangeStateStepUUID.

UUID is an identifier, which may be unique, of the step. This element may be based on GDT UUID.

OperationActivityStepID is an identifier, which may be unique, of the non-historical step. This element may be based on GDT OperationActivityStepID.

BillOfOperationsOperationActivityStepChangeStateUUID is an identifier, which may be unique, of the change state of the step in the BillOfOperations. This element may be based on GDT UUID.

BillOfOperationsOperationActivityStepUUID is an identifier, which may be unique, of the non-historical step in the BillOfOperations. This element may be based on GDT UUID.

PrecedingProductionSegmentOperationActivityChangeStateStepUUID specifies the preceding step in the same activity. This element may be based on GDT UUID. This element may be optional.

In certain implementations of node ProductionSegmentOperationActivityChangeStateStep, the following composition relationships to subordinate nodes may exist: ProductionSegmentOperationActivityChangeStateStepDescription 149086 may have a cardinality relationship of 1:cn; ProductionSegmentOperationActivityChangeStateStepTextCollection 149088 (DO) may have a cardinality relationship of 1:c; and ProductionSegmentOperationActivityChangeStateStepAttachmentFolder 149090 (DO) may have a cardinality relationship of 1:c.

In certain implementations of node ProductionSegmentOperationActivityChangeStateStep, the following inbound association relationships may exist: PrecedingProductionSegmentOperationActivityChangeStateStep 149084 may have a cardinality relationship of c:c, which specifies the preceding step in the same activity.

The steps identified by the UUID and the PrecedingProductionSegmentOperationActivityChangeStateStepUUID may belong to the same ProductionSegmentOperationActivityChangeState. The PrecedingProductionSegmentOperationActivityChangeStateStepUUID may define a unique sequence of the steps of a ProductionSegmentOperationActivityChangeState.

ProductionSegmentBranchingPathChangeStateStepDescription

BO ReleasedExecutionProductionModel/node ProductionSegmentBranchingPathChangeStateStepDescription represents a language-dependent text with additional information on a ProductionSegmentOperationActivityBillOfMaterialItemChangeStateStep.

The structure elements located directly at node ProductionSegmentOperationActivityChangeStateStepDescription are defined by data type GDT ReleasedExecutionProductionModelProductionSegmentOperationActivityChangeStateStepDescriptionElements. Structure element Description may be based on GDT _MEDIUM_DESCRIPTION.

ProductionSegmentOperationActivityChangeStateStepTextCollection (DO)

BO ReleasedExecutionProductionModel/node ProductionSegmentOperationActivityChangeStateStepTextCollection (DO) represents the collection of all language-dependent texts with additional information on a ProductionSegmentOperationActivityBillOfMaterialItemChangeStateStep.

ProductionSegmentOperationActivityChangeStateStepAttachmentFolder (DO)

BO ReleasedExecutionProductionModel/node ProductionSegmentOperationActivityChangeStateStepAttachmentFolder (DO) represents the collection of all existing documents in electronic form with additional information on a ProductionSegmentOperationActivityChangeStateStep (for example, drawings).

ProductionSegmentOperationActivityChangeStateResourceRequirement

BO ReleasedExecutionProductionModel/node ProductionSegmentOperationActivityChangeStateResourceRequirement represents the capacity requirement for a resource in an operation activity. Capacity requirements may be defined for the main resources; additional resources with their capacity requirements may also be specified.

The structure elements located directly at node ProductionSegmentOperationActivityChangeStateResourceRequirement are defined by data type GDT ReleasedExecutionProductionModelProductionSegmentOperationActivityChangeStateResourceRequirementElements. In certain implementations these elements may include the following: UUID, BillOfOperationsOperationActivityChangeStateResourceRequirementUUID, ResourceUUID, ResourceMainIndicator.

UUID is an identifier, which may be unique, of the ResourceRequirements. This element may be based on GDT UUID.

BillOfOperationsOperationActivityChangeStateResourceRequirementUUID is an identifier, which may be unique, of the ResourceRequirements in the BillOfOperations. This element may be based on GDT UUID.

ResourceUUID specifies a resource that is required in the higher-level operation activity. This element may be based on GDT UUID.

ResourceMainIndicator is an indicator that specifies whether the ResourceRequirement is valid for the main resource of the operation. This element may be based on GDT MainIndicator. It may be optional.

In certain implementations of node ProductionSegmentOperationActivityChangeStateResourceRequirement, the following inbound aggregation relationships may exist: Resource may have a cardinality relationship of c:cn.

There may be exactly one ProductionSegmentOperationActivityChangeStateResourceRequirement with the indicator ResourceMainIndicator per ProductionSegmentOperationActivityChangeState.

ProductionSegmentOperationActivityChangeStateServiceProductInput

BO ReleasedExecutionProductionModel/node ProductionSegmentOperationActivityChangeStateServiceProductInput represents a service requirement for a ServiceProduct that is required for an operation activity.

The structure elements located directly at node ProductionSegmentOperationActivityChangeStateServiceProductInput are defined by data type GDT ReleasedExecutionProductionModelProductionSegmentOperationActivityChangeStateServiceProductInputElements. In certain implementations these elements may include the following: UUID, BillOfOperationsOperationActivityChangeStateServiceProductRequirementUUID, ServiceProductUUID, ResourceUUID.

UUID is an identifier, which may be unique, of the service requirement. This element may be based on GDT UUID.

BillOfOperationsOperationActivityChangeStateServiceProductRequirementUUID is an identifier, which may be unique, of the ServiceProductRequirements in the BillOfOperations. This element may be based on GDT UUID.

ServiceProductUUID specifies the service to be provided. This element may be based on GDT UUID.

ResourceUUID specifies the resource to provide the service. This element may be based on GDT UUID. This element may be optional.

In certain implementations of node ProductionSegmentOperationActivityChangeStateServiceProductInput, the following inbound aggregation relationships may exist: ServiceProduct may have a cardinality relationship of 1:cn. Resource may have a cardinality relationship of c:cn.

ProductionSegmentOperationActivityChangeStateDescription

BO ReleasedExecutionProductionModel/node ProductionSegmentOperationActivityChangeStateDescription represents a language-dependent text with additional information on a ProductionSegmentOperationActivityChangeState.

The structure elements located directly at node ProductionSegmentOperationActivityChangeStateDescription are defined by data type GDT ProductionSegmentOperationActivityChangeStateDescriptionElements. Structure element Description may be based on GDT _MEDIUM_DESCRIPTION.

ProductionSegmentOperationActivityChangeStateTextCollection (DO)

BO ReleasedExecutionProductionModel/node ProductionSegmentOperationActivityChangeStateTextCollection (DO) represents the collection of all language-dependent texts with additional information on a ProductionSegmentOperationActivityChangeState.

ProductionSegmentOperationActivityChangeStateAttachmentFolder (DO)

BO ReleasedExecutionProductionModel/node ProductionSegmentOperationActivityChangeStateAttachmentFolder (DO) represents the collection of all existing documents in electronic form with additional information on a ProductionSegmentOperationActivityChangeState (for example, drawings).

ProductionSegmentOperationChangeState

BO ReleasedExecutionProductionModel/node ProductionSegmentOperationChangeState represents a state of an operation that occurs with or without using engineering change management. If engineering change management is used, attributes of the operation and the subordinate nodes can be defined dependent on time.

The structure elements located directly at node ProductionSegmentOperationChangeState are defined by data type GDT ReleasedExecutionProductionModelProductionSegmentOperationChangeStateElements. In certain implementations these elements may include the following: UUID, BillOfOperationsOperationChangeStateUUID, MainResourceUUID, BaseQuantity, BaseQuantityTypeCode, UserDefinedSendAheadQuantityEnabledIndicator, SendAheadQuantity, SendAheadQuantityTypeCode, InterOperationLagDuration, InterOperationLagShiftCalendarDeterminationRuleCode.

UUID is an identifier, which may be unique, of the ChangeState. This element may be based on GDT UUID.

BillOfOperationsOperationChangeStateUUID specifies the UUID of the change state in the BillOfOperations. This element may be based on GDT UUID.

MainResourceUUID specifies the main resource of the operation. This element may be based on GDT UUID.

BaseQuantity specifies the reference quantity of the operation. The variable duration of the operation activities reference these quantities. This element may be based on GDT Quantity.

BaseQuantityTypeCode specifies the type of the BaseQuantity. This element may be based on GDT QuantityTypeCode.

UserDefinedSendAheadQuantityEnabledIndicator specifies whether the operation has a send-ahead quantity or whether only the complete lot is always passed on to the next operation. This element may be based on GDT EnabledIndicator. This element may be optional.

SendAheadQuantity specifies the send-ahead quantity of the operation. The send-ahead quantity is the quantity that has passed through an operation before successor operations can be started. This element may be based on GDT Quantity. This element may be optional.

SendAheadQuantityTypeCode specifies the type of the send-ahead quantity. This element may be based on GDT QuantityTypeCode. This element may be optional.

InterOperationLagDuration specifies the time between the end of the current operation and the start of its successor operation. This element may be based on GDT TIME_Duration. This element may be optional.

InterOperationLagShiftCalendarDeterminationRuleCode specifies the code that indicates whether the InterOperationDuration is scheduled to the calendar of the LogisticsDivision (that is consider non-working times) or whether it also continues in non-working times. This element may be based on GDT ShiftCalendarDeterminationRuleCode. This element may be optional.

In certain implementations of node ProductionSegmentOperationChangeState, the following composition relationships to subordinate nodes may exist: Resource may have a cardinality relationship of 1:cn.

In certain implementations of node ProductionSegmentOperationChangeState, the following inbound association relationships may exist: ProductionSegmentOperationChangeStateLogisticUnitAssignment 149108 may have a cardinality relationship of 1:cn, and indicates the main resource of the operation.

Every ProductionSegmentOperation may have exactly one change state.

At the last operation of a ProductionSegment, the InterOperationLagShiftCalenderDeterminationRuleCode and UserDefinedSendAheadQuantityEnabledIndicator may be blank. The UserDefinedSendAheadQuantityEnabledIndicator may be set when the SendAheadQuantity is positive. If the InterOperationLagShiftCalendarDeterminationRuleCode is blank, the InterOperationLagDuration may also be blank.

ProductionSegmentOperationChangeStateLogisticUnitAssignment

BO ReleasedExecutionProductionModel/node ProductionSegmentOperationChangeStateLogisticUnitAssignment represents the assignment of a LogisticUnit to an operation.

A LogisticUnit may group objects that are treated in the same way in logistical processes (a LogisticUnit can be the quantity of all pallets with specific characteristics, for example). In the current context the LogisticUnit can describe the main product in a packed state—that is, the unit comprising the main product and packaging material.

The structure elements located directly at node ProductionSegmentOperationChangeStateLogisticUnitAssignment are defined by data type GDT ReleasedExecutionProductionModelProductionSegmentOperationChangeStateLogisticUnitAssignmentElements. In certain implementations these elements may include the following: UUID, BillOfOperationsOperationChangeStateLogisticUnitAssignmentUUID, LogisticUnitUUID.

UUID is an identifier, which may be unique, of the LogisticUnitAssignments. This element may be based on GDT UUID.

BillOfOperationsOperationChangeStateLogisticUnitAssignmentUUID is an identifier, which may be unique, of the LogisticUnitAssignments in the BillOfOperations. This element may be based on GDT UUID.

LogisticUnitUUID specifies the LogisticUnit assigned to the operation. This element may be based on GDT UUID.

In certain implementations of node ProductionSegmentOperationChangeStateLogisticUnitAssignment, the following inbound aggregation relationships may exist: LogisticUnit may have a cardinality relationship of 1:cn, and indicates the LogisticUnit assigned to the operation.

The higher-level operation may have the OperationType "Pack".

ProductionSegmentOperationDescription

BO ReleasedExecutionProductionModel/node ProductionSegmentOperationDescription represents a language-dependent text with additional information on a ProductionSegmentOperation.

The structure elements located directly at node ProductionSegmentOperationDescription are defined by the element structure ReleasedExecutionProductionModelProductionSegmentOperationDescriptionElements.Structure element Description may be based on GDT _MEDIUM_DESCRIPTION.

ProductionSegmentOperationTextCollection (DO)

BO ReleasedExecutionProductionModel/node ProductionSegmentOperationTextCollection (DO) represents the collection of all language-dependent texts with additional information on a ProductionSegmentOperation.

ProductionSegmentOperationAttachmentFolder (DO)

BO ReleasedExecutionProductionModel/node ProductionSegmentOperationAttachmentFolder (DO) represents the collection of all existing documents in electronic form with additional information on a ProductionSegmentOperation (for example, drawings).

ProductionSegmentInternalMaterialFlow

BO ReleasedExecutionProductionModel/node ProductionSegmentInternalMaterialFlow represents a relationship between two elements of the material flow network of a ProductionSegment.

The material flow network of a ProductionSegment may consist of the elements (operations, branchings, and rejoins) and the ProductionSegmentInternalMaterialFlows. A ProductionSegmentInternalMaterialFlow has a direction and may link a source with a target.

The structure elements located directly at node ProductionSegmentInternalMaterialFlow are defined by data type GDT ReleasedExecutionProductionModelProductionSegmentInternalMaterialFlowElements. In certain implementations these elements may include the following: UUID, SourceMaterialFlowElementUUID, SourceMaterialFlowElementTypeCode, TargetMaterialFlowElementUUID, TargetMaterialFlowElementTypeCode, MainIndicator.

UUID is an identifier, which may be unique, of the InternalMaterialFlow. This element may be based on GDT UUID.

SourceMaterialFlowElementUUID is an identifier, which may be unique, of the source of the InternalMaterialFlow. This element may be based on GDT UUID.

SourceMaterialFlowElementTypeCode specifies the source type of the InternalMaterialFlow. This element may be based on GDT MaterialFlowElementTypeCode.

TargetMaterialFlowElementUUID is an identifier, which may be unique, of the target of the InternalMaterialFlow. This element may be based on GDT UUID. This element may be optional.

TargetMaterialFlowElementTypeCode specifies the target type of the InternalMaterialFlow. This element may be based on GDT MaterialFlowElementTypeCode. This element may be optional.

MainIndicator specifies whether the InternalMaterialFlow is part of the main material flow as opposed to feeder material flow. This element may be based on GDT Indicator. This element may be optional.

In certain implementations of node ProductionSegmentInternalMaterialFlow, the following composition relationships to subordinate nodes may exist: ProductionSegmentInternalMaterialFlowReportingPoint 149142 may have a cardinality relationship of 1:cn.

In certain implementations of node ProductionSegmentInternalMaterialFlow, the following inbound aggregation relationships may exist: SourceProductionSegmentBranching may have a cardinality relationship of c:n, and specifies the ProductionSegmentBranching that is the source of the InternalMaterialFlow. TargetProductionSegmentBranching may have a cardinality relationship of c:n, and specifies the ProductionSegmentBranching that is the target of the InternalMaterialFlow. SourceProductionSegmentBranchingJoin may be c:1, and specifies the ProductionSegmentBranchingJoin that is the source of the InternalMaterialFlow. TargetProductionSegmentBranchingJoin may have a cardinality relationship of c:n, and specifies the ProductionSegmentBranchingJoin that is the target of the InternalMaterialFlow. SourceProductionSegmentOperation may be c:1, and specifies the ProductionSegmentOperation that is the source of the InternalMaterialFlow. TargetProductionSegmentOperation may have a cardinality relationship of c:cn, and indicates the ProductionSegmentOperation that is the target of the InternalMaterialFlow.

ProductionSegmentInternalMaterialFlowReportingPoint

BO ReleasedExecutionProductionModel/node ProductionSegmentInternalMaterialFlowReportingPoint represents a reporting point at which the material flow is counted.

The structure elements located directly at node ProductionSegmentInternalMaterialFlowReportingPoint are defined by the element structure ReleasedExecutionProductionModelProductionSegmentInternalMaterialFlowReportingPointElements. In certain implementations these elements may include the following: UUID, BillOfOperationsReportingPointUUID, ID, StartEndCode.

UUID is an identifier, which may be unique, of the ReportingPoint. This element may be based on GDT UUID.

BillOfOperationsReportingPointUUID is an identifier, which may be unique, of the ReportingPoint in the BillOfOperations. This element may be based on GDT UUID.

ID is an identifier, which may be unique, of the ReportingPoint. This element may be based on GDT ReportingPointID.

StartEndCode specifies whether the reporting point is a start or end reporting point. That is, it determines whether the material flow that flows into the target of the InternalMaterialFlow is counted or whether the material flow that flows away from the source of the InternalMaterialFlow is counted. This element may be based on GDT StartEndCode.

In certain implementations of node ProductionSegmentInternalMaterialFlowReportingPoint, the following composition relationships to subordinate nodes may exist: ProductionSegmentInternalMaterialFlowReportingPointChangeState 149144 may have a cardinality relationship of 1:n; ProductionSegmentInternalMaterialFlowReportingPointDescription 149146 may have a cardinality relationship of 1:cn; ProductionSegmentInternalMaterialFlowReportingPointTextCollection 149148 (DO) may have a cardinality relationship of 1:c; and ProductionSegmentInternalMaterialFlowReportingPointAttachmentFolder 149150 (DO) may have a cardinality relationship of 1:c.

ProductionSegmentInternalMaterialFlowReportingPointChangeState

BO ReleasedExecutionProductionModel/node ProductionSegmentInternalMaterialFlowReportingPointChangeState represents a state of a reporting point that occurs with or without using engineering change management. If engineering change management is used, attributes of the reporting point may be defined dependent on time.

The structure elements located directly at node ProductionSegmentInternalMaterialFlowReportingPointChangeState are defined by the element structure ReleasedExecutionProductionModelProductionSegmentInternalMaterialFlowReportingPointChange StateElements. In certain implementations these elements may include the following: UUID, BillOfOperationsReportingPointChangeStateUUID, ProductionTaskGenerationInstruction.

UUID is an identifier, which may be unique, of the ChangeState. This element may be based on GDT UUID.

BillOfOperationsReportingPointChangeStateUUID is an identifier, which may be unique, of the ReportingPointChangeState in the BillOfOperations. This element may be based on GDT UUID.

ProductionTaskGenerationInstruction specifies the instructions according to which the production tasks are created. Specifies for which concrete production step the production tasks are created (values: ReportingPoint, Operation, and Activity), which event triggers the creation of the production tasks, and which layout is used for the representation of the production tasks. This element may be based on GDT LogisticsTaskGenerationInstruction. This element may be optional.

ProductionSegmentInternalMaterialFlowReportingPointDescription

BO ReleasedExecutionProductionModel/node ProductionSegmentInternalMaterialFlowReportingPointDescription represents a language-dependent text with additional information on a ProductionSegmentInternalMaterialFlowReportingPoint.

The structure elements located directly at node ProductionSegmentInternalMaterialFlowReportingPointChangeStateDescription are defined by the element structure ReleasedExecutionProductionModelProductionSegmentInternalMaterialFlowReportingPointDescriptionElements. Structure element Description may be based on GDT _MEDIUM_DESCRIPTION.

ProductionSegmentInternalMaterialFlowReportingPointTextCollection (DO)

BO ReleasedExecutionProductionModel/node ProductionSegmentInternalMaterialFlowReportingPointTextCollection (DO) represents the collection of all language-dependent texts with additional information on a ProductionSegmentInternalMaterialFlowReportingPoint.

ProductionSegmentInternalMaterialFlowReportingPointAttachmentFolder (DO)

BO ReleasedExecutionProductionModel/node ProductionSegmentInternalMaterialFlowReportingPointAttachmentFolder (DO) represents the collection of existing documents in electronic form with additional information on a ProductionSegmentInternalMaterialFlowReportingPoint (for example, drawings).

ProductionSegmentDescription

BO ReleasedExecutionProductionModel/node ProductionSegmentDescription represents a language-dependent text with additional information on a ProductionSegment.

The structure elements located directly at node ProductionSegmentDescription are defined by the element structure ReleasedExecutionProductionModelProductionSegmentDescriptionElements.

BillOfOperationsDescription may be based on GDT _MEDIUM_DESCRIPTION. This element may be optional. Structure element BillOfMaterialDescription may be based on GDT MEDIUM_DESCRIPTION. This element may be optional.

ProductionSegmentTextCollection (DO)

BO ReleasedExecutionProductionModel/node ProductionSegmentTextCollection (DO) represents the collection of all language-dependent texts with additional information on a ProductionSegment.

ProductionSegmentAttachmentFolder (DO)

BO ReleasedExecutionProductionModel/node ProductionSegmentAttachmentFolder (DO) represents the collection of existing documents in electronic form with additional information on a ProductionSegment (for example, drawings).

Description [Node]

BO ReleasedExecutionProductionModel/node Description represents a language-dependent text with additional information on a ReleasedExecutionProductionModel.

The structure elements located directly at node Description are defined by the element structure ReleasedExecutionProductionModelDescriptionElement: Structure element Description may be based on GDT _MEDIUM_DESCRIPTION.

HierarchicalViewFilterCondition (Transformation Node)

BO ReleasedExecutionProductionModel/node HierarchicalViewFilterCondition (Transformation Node) represents a filter condition that defines which production segments and change states are to be included in the hierarchical view of the released execution production model. The structure elements located directly at node HierarchicalViewFilterCondition are defined by the element structure ReleasedExecutionProductionModelHierarchicalViewFilterConditionElements. In certain implementations these elements may include the following: ExplosionDate.

ExplosionDate specifies the ExplosionDate used as filter condition for the hierarchical view. A change state is included in the hierarchical view if the explosion date is in the validity period of the change state. A production segment is included in the hierarchical view if there is a material input change state in the view containing the output material of the production segment. The default for the explosion date is the current date. This element may be based on GDT Date.

HierarchicalViewElement 149190 (Transformation Node)

BO ReleasedExecutionProductionModel/node HierarchicalViewElement (Transformation Node) represents an element of a hierarchical view of the structure of a released execution production model.

The elements contained in the hierarchical view are all ProductionSegments, ProductionSegmentBranchings, ProductionSegmentBranchingProductionPathChangeStates, ProductionSegmentInternalMaterialFlowReportingPointChangeStates, ProductionSegmentOperationChangeStates, ProductionSegmentOperationActivityChangeStates, ProductionSegmentMaterialOutputChangeStates, and ProductionSegmentMaterialInputChangeStates, and Materials. The hierarchy and the order within a hierarchical level result from the hierarchical relations and the chronologically defined arrangements between the elements as they are defined in the released execution production model.

The structure elements located directly at node HierarchicalViewElement are defined by the element structure ReleasedExecutionProductionModelHierarchialViewElementElements. In certain implementations these elements may include the following: ObjectID, ObjectNodeTypeCode, OrdinalNumberValue.

ObjectID is an identifier, which may be unique, of a HierarchicalViewElement. This element may be based on GDT ObjectID.

ObjectNodeTypeCode specifies the BO node type of the node that is represented by the HierarchicalViewElement (GDT ObjectNodeTypeCode).

OrdinalNumberValue specifies a sort order of HierarchicalViewElements. This element may be based on GDT OrdinalNumberValue, Qualifier Element.

In certain implementations of node HierarchicalViewElement, the following composition relationships to subordinate nodes may exist: HierarchicalViewElementDescription 149188 may have a cardinality relationship of 1:cn.

In certain implementations of node HierarchicalViewElement, the following inbound aggregation relationships may exist: ProductionSegment may be c:1, and specifies the ProductionSegment the HierarchicalViewElement is representing. ProductionSegmentBranching may be c:1, and specifies the Branching the HierarchicalViewElement is representing. ProductionSegmentBranchingProductionPathChangeState may be c:1, and specifies the ProductionPathChangeState the HierarchicalViewElement is representing. ProductionSegmentInternalMaterialFlowReportingPointChangeState may be c:1, and specifies the ReportingPointChangeState the HierarchicalViewElement is representing. ProductionSegmentOperationChangeState may be c:1, which specifies the OperationChangeState the HierarchicalViewElement is representing. ProductionSegmentOperationActivityChangeState may be c:1, which specifies the ActivityChangeState the HierarchicalViewElement is representing. ProductionSegmentMaterialOutputChangeState may be c:1, which specifies the MaterialOutputChangeState the HierarchicalViewElement is representing. ProductionSegmentsMaterialInputChangeState may be c:1, which specifies the MaterialInputChangeState the HierarchicalViewElement is representing.

In certain implementations of node HierarchicalViewElement, the following inbound association relationships may exist. ParentHierarchicalViewFilterCondition may have a cardinality relationship of c:n, and specifies if the root node of the released execution production model is the parent of the HierarchicalViewElement in the hierarchical view filtered by the condition defined in node HierarchicalViewFilterCondition. ParentHierarchicalViewElement may have a cardinality relationship of c:cn.

HierarchicalViewElementDescription (Transformation Node).

BO ReleasedExecutionProductionModel/node HierarchicalViewElementDescription (Transformation Node) represents a language-dependent text with additional information on a hierarchical view element.

The structure elements located directly at node HierarchicalViewElementDescription are defined by the element structure ReleasedExecutionProductionModelHierarchialViewElementDescriptionElement. Structure element Description may be based on GDT _MEDIUM_DESCRIPTION.

FIGS. 150-1 through 150-6 illustrate an example ReleasedPlanningProductionModel business object model 150018. Specifically, this model depicts interactions among various hierarchical components of the ReleasedPlanningProductionModel, as well as external components that interact with the ReleasedPlanningProductionModel (shown here as 150000 through 150016, 150020 through 150060 and 150110).

Business Object ReleasedPlanningProductionModel

BO ReleasedPlanningProductionModel is a released version of a production model that contains all the production bill of operations and production bill of material data required for the planning of a production process.

BO ReleasedPlanningProductionModel may be used to create ProductionPlanningOrders. ReleasedPlanningProductionModels may be versioned. A ReleasedPlanningProductionModel may contain the status of the ProductionModel master data available when the ReleasedPlanningProductionModel was created.

BO ReleasedPlanningProductionModel may be part of the process component Production Model Processing.

The structure of BO ReleasedPlanningProductionModel may be split into ProductionSegments 150064. A ProductionSegment 150064 may contain BOM information from the ProductionBillOfMaterial and BOO information from the ProductionBillOfOperations.

BO ReleasedPlanningProductionModel is represented by the root node "Root".

BO ReleasedPlanningProductionModel 150062/Root Node is a structure that provides information on bills of material and production bill of operations in an integrated format for production planning. In addition to the production segments, it may also contain identifying and administrative data.

The structure elements located directly at node ReleasedPlanningProductionModel are defined by data type ReleasedPlanningProductionModelElements. In certain implementations these elements may include the following: ProductionModelID, UUID, VersionID, ProductionModelUUID, ProductionModelChangeDateTime, SystemAdministrativeData.

ProductionModelID is an identifier, which may be unique, of the ProductionModel from which the ReleasedPlanningProductionModel was generated. This element may be based on GDT ProductionModelID.

UUID is an identifier, which may be unique, of a ReleasedPlanningProductionModel. This element may be based on GDT UUID.

VersionID is an identifier, which may be unique, for the generated version of the ReleasedPlanningProductionModel. This version counter is a positive, whole number. This element may be based on GDT VersionID.

ProductionModelUUID is an identifier, which may be unique, of the ProductionModel from which the ReleasedPlanningProductionModel was generated. This element may be based on GDT UUID.

ProductionModelChangeDateTime specifies the date stamp of the last change to the ProductionModel. This element may be based on GDT GLOBAL_DateTime Qualifier Change.

SystemAdministrativeData specifies administrative data recorded in the system concerning the system user who created the ReleasedPlanningProductionModel and the time of creation. This element may be based on GDT SystemAdministrativeData).

In certain implementations of Root Node, the following composition relationships to subordinate nodes may exist: ProductionSegment may have a cardinality relationship of 1:n; SupplyPlanningArea 150102 may have a cardinality relationship of 1:n; HierarchicalViewFilterCondition 150108 may have a cardinality relationship of 1:1; PlanningOperation 150104 may have a cardinality relationship of 1:n (filtered); PlanningOperationRelationship 150106 may have a cardinality relationship of 1:cn (filtered); and HierarchicalViewElement 150100 may have a cardinality relationship of 1:n (filtered).

Filter elements for the above relationships may be defined by data type ReleasedPlanningProductionModelDateFilter. In certain implementations these elements may include the following: Date, which may be based on GDT Date and may be optional.

In certain implementations of Root Node, the following inbound aggregation relationships may exist. ProductionModel may have a cardinality relationship of c:cn. SourceOfSupplyLogisticRelationship may have a cardinality relationship of c:c. CreationIdentity may have a cardinality relationship of 1:cn.

In certain implementations of Root Node, navigation associations may exist as follows: LastProductionSegment may have a cardinality relationship of 1:1, and specifies the ProductionSegment whose MainProduct is planned with the ReleasedPlanningProductionModel.

There may be exactly one operation per ReleasedPlanningProductionModel.

In certain implementations of Root Node the following queries may be called: QueryByElements, QueryByInputMaterial, QueryByOutputMaterial, or QueryByCapacityRequirementResource.

QueryByElements provides Root Node with a list of all ReleasedPlanningProductionModels that fulfill the selection conditions for attributes of the root node. Its elements are defined by data type ReleasedPlanningProductionModelReleasedPlanningProductionModelElementsQueryElements. In certain implementations of Root Node these elements may include: ProductionModelID, which may be based on GDT ProductionModelID; UUID, which may be based on GDT UUID; VersionID, which may be based on GDT VersionID; ProductionModelUUID, which may be based on GDT UUID; ProductionModelChangeDateTime, which may be based on GDT DateTime; and SystemAdministrativeData, which may be based on GDT SystemAdministrativeData. The above elements may be optional.

QueryByInputMaterial provides Root Node with a list of all ReleasedPlanningProductionModels that have a ProductionSegmentInputMaterialChangeState which fulfills the selection conditions for the MaterialUUID and the ValidityPeriod. Its elements are defined by data type ReleasedPlanningProductionModelReleasedPlanningProductionModelInputMaterialQueryElements. In certain implementations of Root Node these elements may include: ProductionSegmentMaterialInputChangeStateMaterialUUID, which may be based on GDT UUID and may be optional.

QueryByOutputMaterial provides Root Node with a list of all ReleasedPlanningProductionModels that have a ProductionSegmentOutputMaterialChangeState which fulfills the selection conditions for the MaterialUUID and the ValidityPeriod. Its elements are defined by data type ReleasedPlanningProductionModelReleasedPlanningProductionModeOutputMaterialQueryElements. In certain implementations of Root Node these elements may include: ProductionSegmentMaterialOutputChangeStateMaterialUUID, which may be based on GDT UUID and may be optional.

QueryByCapacityRequirementResource provides Root Node with a list of all ReleasedPlanningProductionModels that have a ProductionSegmentOperationActivityCapacityRequirement 150072 which fulfills the selection conditions for the ResourceUUID. Its elements are defined by data type ReleasedPlanningProductionModelCapacityRequirementResourceQueryElements. In certain implementations of Root Node these elements may include: ProductionSegmentOperationActivityCapacityRequirementResourceUUID, which may be based on GDT UUID and may be optional.

In certain implementations of Root Node, Enterprise Service Infrastructure/ESI action ModifySourceOfSupply may be implemented. This ESI may be executed internally when the ReleasedPlanningProductionModel is stored. This ESI may create a source of supply for a ReleasedPlanningProductionModel or change an existing source of supply. A precondition for this ESI may exist in that there may be a Material and SupplyPlanningArea for the source of supply. This ESI may change if the source of supply belonging to the ReleasedPlanningProductionModel is created/changed.

In certain implementations of Root Node, the parameters of ESI ModifySourceOfSupply are defined by the type GDT ReleasedPlanningProductionModelModifySourceOfSupplyActionElements and may include the following: ValidityDatePeriod, MinimumLotsizeQuantity, MinimumLotsizeQuantityTypeCode, MaximumLotsizeQuantityTypeCode:

ValidityDatePeriod, which specifies the validity period of the SourceOfSupply; this element may be based on GDT UPPEROPEN_LOCALNORMALISED_DateTimePeriod.

MinimumLotsizeQuantity, which specifies the smallest possible lot size during procurement; this element may be based on GDT Quantity.

MinimumLotsizeQuantityTypeCode, which specifies the type of the smallest possible lot size during procurement; this element may be based on GDT QuantityTypeCode. MaximumLotSizeQuantity, which specifies the largest possible lot size during procurement; this element may be based on GDT Quantity.

MaximumLotsizeQuantityTypeCode, which specifies the type of the largest possible lot size during procurement; this element may be based on GDT QuantityTypeCode.

SupplyPlanningArea

BO ReleasedPlanningProductionModel/node SupplyPlanningArea represents the assignment of a ReleasedPlanningProductionModel to a SupplyPlanningArea.

The structure elements found directly at node SupplyPlanningArea are defined by data type ReleasedPlanningProductionModelSupplyPlanningAreaElements. In certain implementations these elements may include the following: UUID, SupplyPlanningAreaUUID.

UUID may be based on GDT UUID.

SupplyPlanningAreaUUID is an identifier, which may be unique, for the object instance of a SupplyPlanningArea to which the ReleasedPlanningProductionModel is assigned. This element may be based on GDT UUID.

In certain implementations of node SupplyPlanningArea, the following inbound aggregation relationships may exist: SupplyPlanningArea may have a cardinality relationship of 1:cn, and indicates the SupplyPlanningArea to which a ReleasedPlanningProductionModel is assigned.

ProductionSegment

BO ReleasedPlanningProductionModel/node ProductionSegment represents a section in the production of a material in a LogisticsDivision.

The structure elements located directly at node ProductionSegment are defined by data type ReleasedPlanningProductionModelProductionSegmentElements. In certain implementations these elements may include the following: ID, UUID, ProductionSegmentUUID, BillOfMaterialUUID, BillOfOperationsUUID:

ID is an identifier, which may be unique, of the ProductionSegment. This element may be based on GDT ProductionSegmentID.

UUID is an identifier, which may be unique, of a ProductionSegment. This element may be based on GDT UUID.

ProductionSegmentUUID is an identifier, which may be unique, of the business object instance of the ProductionSegment from which the ProductionSegment of the ReleasedPlanningProductionModel was generated This element may be based on GDT UUID.

BillOfMaterialUUID is an identifier, which may be unique, of the business object instance of the ProductionBillOfMaterial. This element may be based on GDT UUID.

BillOfOperationsUUID is an identifier, which may be unique, of the business object instance of the ProductionBillOfOperations. This element may be based on GDT UUID.

In certain implementations of node ProductionSegment, the following composition relationships to subordinate nodes may exist: ProductionSegmentMaterialOutput 150090 may have a cardinality relationship of 1:n; ProductionSegmentOperation 150066 may have a cardinality relationship of 1:cn; ProductionSegmentMaterialInput 150086 may have a cardinality relationship of 1:cn (filtered); and ProductionSegmentMaterialAssignment 150080 may have a cardinality relationship of 1:cn (filtered).

Filter elements for the above relationships may be defined by data type ReleasedPlanningProductionModelDateFilter. In certain implementations these elements may include the following: Date, which may be based on GDT Date and may be optional.

In certain implementations of node ProductionSegment, the following inbound aggregation relationships may exist: ProductionSegment may have a cardinality relationship of c:cn. ProductionBillOfMaterial may have a cardinality relationship of c:cn. ProductionBillOfOperations may have a cardinality relationship of c:cn.

In certain implementations of node ProductionSegment, navigation associations to the node may exist as follows: Predecessor may have a cardinality relationship of c:cn (filtered), which specifies the ProductionSegments whose MainProducts go into the current ProductionSegment.

Filter elements for the above relationships may be defined by data type ReleasedPlanningProductionModelDateFilter. In certain implementations these elements may include the following: Date, which may be based on GDT Date and may be optional.

There may be exactly one ProductionSegment that is not a predecessor in terms of the Predecessor association. Every other ProductionSegment may be a predecessor once. ProductionSegments may be non-cycling.

In certain implementations of node ProductionSegment a QueryByElements may be called, which provides a list of all ProductionSegments that fulfill the selection conditions. Elements are defined by data type ReleasedPlanningProductionModelProductionSegmentElementsQueryElements. These elements may include the following: ProductionSegmentID, which may be based on GDT ProductionSegmentID; UUID, which may be based on GDT UUID; and ProductionSegmentUUID, which may be based on GDT UUID. The above elements may be optional.

ProductionSegmentMaterialOutput

BO ReleasedPlanningProductionModel/node ProductionSegmentMaterialOutput represents a material that is produced according to the production process described in a ProductionSegment.

A ProductionSegmentMaterialOutput may exist within specialisations such as the following:

ProductionSegmentMainProductMaterialOutput: the main product to be planned and produced that is expected as the result of a ProductionOrder; a main product is the material that is the primary goal of the production order.

ProductionSegmentCoProductMaterialOutput 150094 is the co-product that may be produced and is expected as the result of a production order. A co-product is a desirable material that is produced during the production of the main product.

ProductionSegmentByProductMaterialOutput 150096 is the by-product to be produced that is expected as the result of a production order. A by-product is an undesirable material that is produced during the production of the main product.

ProductionSegmentIntermediateMaterialOutput: The Intermediate Product is a material that emerges during the production in one production segment and is processed further in a different production segment of the same production model.

The structure elements located directly at node ProductionSegmentMaterialOutput are defined by data type ReleasedPlanningProductionModelProductionSegmentMaterialOutputElements. In certain implementations these elements may include the following: BillOfMaterialVariantID, UUID, MaterialRoleCode, BillOfMaterialVariantUUID.

BillOfMaterialVariantID is an external identifier of the ProductionSegmentMaterialOutput. This element may be based on GDT BillOfMaterialVariantID).

UUID is an identifier, which may be unique, of the MaterialOutput. This element may be based on GDT UUID.

MaterialRoleCode specifies the specialization (MainProduct, ByProduct or Intermediate). This element may be based on GDT MaterialRoleCode.

BillOfMaterialVariantUUID is an identifier, which may be unique, of the bill of material variant in the BillOfMaterial. This element may be based on GDT UUID.

In certain implementations of node ProductionSegmentMaterialOutput, the following inbound aggregation relationships may exist: BillOfMaterialVariant may have a cardinality relationship of c:cn.

In certain implementations of node ProductionSegmentMaterialOutput, the following composition relationships to subordinate nodes may exist: ProductionSegmentMaterialOutputChangeState 150088 may have a cardinality relationship of 1:n A ReleasedPlanningProductionModel may contain a maximum of one MainProductMaterialOutput during the validity of the ProductionSegment.

In certain implementations of node ProductionSegmentMaterialOutput a QueryByElements may be called, which provides a list of all ProductionSegmentMaterialOutputs that fulfill the selection conditions. Elements are defined by data type ReleasedPlanningProductionModelProductionSegmentMaterialOutputElementsQueryElements. These elements may include the following: BillOfMaterialVariantID, which may be based on GDT BillOfMaterialVariantID; UUID, which may be based on GDT UUID; MaterialRoleCode, which may be based on GDT MaterialRoleCode; and BillOfMaterialVariantUUID, which may be based on GDT UUID. The above elements may be optional.

ProductionSegmentMaterialOutputChangeState

BO ReleasedPlanningProductionModel/node ProductionSegmentMaterialOutputChangeState represents a state of a ProductionSegmentMaterialOutput that can be created with or without an EngineeringChangeOrder.

The structure elements located directly at node ProductionSegmentMaterialOutputChangeState are defined by data type ReleasedPlanningProductionModelProductionSegmentMaterialOutputChangeStateElements. In certain implementations these elements may include the following: UUID, MaterialUUID, Quantity, QuantityTypeCode.

UUID is an identifier, which may be unique, of the MaterialOutput.

MaterialUUID specifies the material that is the result of the production process. This element may be based on GDT UUID.

Quantity specifies the variable quantity of the material that is the result of the production process. For the main product, this quantity may define the base quantity to which the variable quantities in the node ProductionSegmentMaterialInputChangeState 150084 or the variable quantities of the other instances of the node ProductionSegmentMaterialOutputChangeState refer. For co-products and by-products, the quantity may refer to the base quantity defined for the main product. This element may be based on GDT Quantity.

QuantityTypeCode specifies the type of the variable quantity. This element may be based on GDT QuantityTypeCode.

In certain implementations of node ProductionSegmentMaterialOutputChangeState, the following inbound association relationships may exist: Material may have a cardinality relationship of 1:cn.

During the validity of the ProductionSegment, one ProductionSegmentMaterialOutputChangeState may be valid for a ProductionSegmentMainProductMaterialOutput 150092. The material of a ProductionSegmentMainProductMaterialOutput may be non-substitutable.

In certain implementations of node ProductionSegmentMaterialOutputChangeState a QueryByElements may be called, which provides a list of all ProductionSegmentMaterialOutputChangeStates that fulfill the selection conditions. Elements are defined by data type ReleasedPlanningProductionModelProductionSegmentOutputChangeStateElementsQueryElements. These elements may include: UUID, which may be based on GDT UUID; ReleasedPlanningProductionModelUUID, which may be based on GDT UUID; and MaterialUUID, which may be based on GDT UUID. The above elements may be optional.

ProductionSegmentMaterialInput

BO ReleasedPlanningProductionModel/node ProductionSegmentMaterialInput represents a material that is used in the production process described in a ProductionSegment.

A ProductionSegmentMaterialInput may describe an item in a production bill of material. It may contain information on a material that is used in the production process, for example, material number and quantity.

The structure elements located directly at node ProductionSegmentMaterialInput are defined by data type ReleasedPlanningProductionModelProductionSegmentMaterialInputElements. In certain implementations these elements may include the following: BillOfMaterialItemGroupItemID, BillOfMaterialItemGroupID, UUID, BillOfMaterialItemGroupItemUUID.

BillOfMaterialItemGroupItemID is an identifier, which may be unique, of the ItemGroupItem of the business object ProductionBillOfMaterial. This element may be based on GDT BillOfMaterialItemGroupItemID.

BillOfMaterialItemGroupID is an identifier, which may be unique, of the ItemGroup of the business object ProductionBillOfMaterial. This element may be based on GDT BillOfMaterialItemGroupID.

UUID is an identifier, which may be unique, of the MaterialInput. This element may be based on GDT UUID.

BillOfMaterialItemGroupItemUUID is an identifier, which may be unique, of the ItemGroupItem of the business object ProductionBillOfMaterial. This element may be based on GDT UUID.

In certain implementations of node ProductionSegmentMaterialInput, the following inbound aggregation relationships may exist: BillOfMaterialItemGroupItem may have a cardinality relationship of c:cn.

In certain implementations of node ProductionSegmentMaterialInput, the following composition relationships to subordinate nodes may exist: ProductionSegmentMaterialInputChangeState 150084 may have a cardinality relationship of 1:n (filtered).

Filter elements for the above relationships may be defined by data type ReleasedPlanningProductionModelDateFilter. In certain implementations these elements may include the following: Date, which may be based on GDT Date and may be optional.

In certain implementations of node ProductionSegmentMaterialInput a QueryByElements may be called, which provides a list of all ProductionSegmentMaterialInputs that fulfill the selection conditions. Elements are defined by data type ReleasedPlanningProductionModelProductionSegmentMaterialInputElementsQueryElements. These elements may include: BillOfMaterialItemGroupItemID, which may be based on GDT BillOfMaterialItemGroupItemID; BillOfMaterialItemGroupID, which may be based on GDT BillOfMaterialItemGroupID; UUID, which may be based on GDT UUID. It may be optional; BillOfMaterialItemGroupItemUUID, which may be based on GDT UUID; and MaterialRoleCode, which may be based on GDT MaterialRoleCode. The above elements may be optional.

ProductionSegmentMaterialInputChangeState

BO ReleasedPlanningProductionModel/node ProductionSegmentMaterialInputChangeState represents a state of a ProductionSegmentMaterialInput that can be created with an EngineeringChangeOrder.

A ProductionSegmentMaterialInput may exist within specialisations such as the following: ProductionSegmentComponentMaterialInputChangeState, which represents a component in a material that is planned separately and used for the production of the primary product; and ProductionSegmentIntermediateMaterialInputChangeState, which represents an intermediate Product in a material that emerges during the production in one predecessor production segment and is processed further the production segment of the component.

The structure elements located directly at node ProductionSegmentMaterialInputChangeState are defined by data type ReleasedPlanningProductionModelProductionSegmentMaterialInputChangeStateElements. In certain implementations these elements may include the following: UUID, EngineeringChangeOrderID, EngineeringChangeOrderUUID, ReleasedPlanningProductionModelUUID, ValidityPeriod, BillOfMaterialItemChangeStateUUID, MaterialRoleCode, MaterialUUID, Quantity, QuantityTypeCode, QuantityFixedIndicator.

UUID is an identifier, which may be unique, of the MaterialOutput. This element may be based on GDT UUID.

EngineeringChangeOrderID is an identifier, which may be unique, of the business object EngineeringChangeOrder with which the ChangeState of the BillOfMaterialItemGroupItemID was created. This element may be based on GDT EngineeringChangeOrderID.

EngineeringChangeOrderUUID is an identifier, which may be unique, of the business object EngineeringChangeOrder with which the ChangeState of the BillOfMaterialItemGroupItemID was created. This element may be based on GDT UUID.

ReleasedPlanningProductionModelUUID is an identifier, which may be unique, of the root node. Necessary for interpreting the query results more quickly. This element may be based on GDT UUID.

ValidityPeriod specifies the validity period for the ProductionSegmentMaterialInput. The ProductionSegmentMaterialInput is valid for a ProductionPlanningOrder if the explosion date of the ProductionPlanningOrder lies in this interval. This element may be based on GDT CLOSED_DatePeriod.

BillOfMaterialItemChangeStateUUID is an identifier, which may be unique, of the BOM item in the BillOfMaterial. This element may be based on GDT UUID.

MaterialRoleCode specifies the role of the material input, which is restricted to component or intermediate product. This element may be based on GDT MaterialRoleCode.

MaterialUUID specifies the material used in the production process. This element may be based on GDT UUID.

Quantity specifies a variable or fixed requirement quantity of the material. If the FixedQuantityIndicator is not set, then the quantity accumulates proportionately to the ProductionPlanningOrder's order quantity. The variable requirement quantity then refers to the quantity in the ProductionSegmentMainProductMaterialOutput. Otherwise, this quantity is required irrespective of the order quantity of the ProductionPlanningOrders. This element may be based on GDT Quantity.

QuantityTypeCode specifies the type of the variable or fixed quantity. This element may be based on GDT QuantityTypeCode.

QuantityFixedIndicator specifies whether the requirement quantity is fixed and therefore independent of the order quantity of the ProductionPlanningOrder. This element may be based on GDT Indicator, Qualifier Fixed. It may be optional.

In certain implementations of node ProductionSegmentMaterialInputChangeState, the following inbound association relationships may exist: Material may have a cardinality relationship of 1:cn.

In certain implementations of node ProductionSegmentMaterialInputChangeState, the following inbound aggregation relationships may exist: EngineeringChangeOrder may have a cardinality relationship of c:cn.

In certain implementations of node ProductionSegmentMaterialInputChangeState, the following composition relationships to subordinate nodes may exist: ProductionSegmentMaterialInputChangeStateUsage 150082 may have a cardinality relationship of 1:1

At least one ProductionSegmentMaterialInputChangeState may be valid at all times during the validity of the ProductionSegment.

In certain implementations of node ProductionSegmentMaterialInputChangeState a QueryByElements may be called, which provides a list of all ProductionSegmentMaterialInputChangeStates that fulfill the selection conditions. Elements are defined by data type ReleasedPlanningProductionModelProductionSegmentMaterialInputChangeStateElementsQueryElements. These elements may include: UUID, which may be based on GDT UUID; EngineeringChangeOrderID, which may be based on GDT EngineeringChangeOrderID; EngineeringChangeOrderUUID, which may be based on GDT UUID; MaterialRoleCode, which may be based on GDT MaterialRoleCode; ReleasedPlanningProductionModelUUID, which may be based on GDT UUID; ValidityPeriod, which may be based on GDT DatePeriod; BillOfMaterialItemChangeStateUUID, which may be based on GDT UUID; and MaterialUUID, which may be based on CDT UUID. The above elements may be optional.

ProductionSegmentMaterialInputChangeStateUsage (Query Response Transformation Node)

BO ReleasedPlanningProductionModel I/node ProductionSegmentMaterialInputChangeStateUsage is a node containing the usage of a material in an ReleasedPlanningProductionModel.

ProductionSegmentMaterialInputChangeStateUsage may be necessary to get the used Materials for a list of ReleasedPlanningProductionModels in an adequate response time. It may be needed during the LowLevelCode calculation.

The structure elements located directly at node ProductionSegmentMaterialInputChangeStateUsage are defined by data type ReleasedPlanningProductionModelProductionSegmentMaterialInputChangeStateUsageElements. In certain implementations these elements may include the following: ReleasedPlanningProductionModelUUID, MaterialRoleCode, MaterialUUID.

ReleasedPlanningProductionModelUUID is an identifier, which may be unique, of the root node. Necessary for interpreting the query results more quickly. This element may be based on GDT UUID.

MaterialRoleCode specifies the role of the material input, which is restricted to component or intermediate product. This element may be based on GDT MaterialRoleCode.

MaterialUUID specifies the material used in the production process. This element may be based on GDT UUID.

In certain implementations of node ProductionSegmentMaterialInputChangeStateUsage a QueryByElements may be called, which provides a list of all ProductionSegmentMaterialInputChangeStateUsages that fulfill the selection conditions. Elements are defined by data type ReleasedPlanningProductionModelProductionSegmentMaterialInputChange StateUsageElementQueryElements. These elements may include: ReleasedPlanningProductionModelUUID, which may be based on GDT UUID; MaterialRoleCode, which may be based on GDT MaterialRoleCode; and MaterialUUID, which may be based on GDT UUID. The above elements may be optional.

ProductionSegmentOperation

BO ReleasedPlanningProductionModel/node ProductionSegmentOperation represents a segment of a process description from a planning perspective.

A ProductionSegmentOperation may correspond to one or several operations in a BillOfOperations. The grouping of OperationElements into a ProductionSegmentOperation may be done using planning markers.

A ProductionSegmentOperation may exist within specialisations such as the following: RoughCutOperation, which is an operation that groups one or several operations of the bill of operations. In such a case the RoughCutOperation may contain fewer details. The RoughCutOperation defines a time-frame in which the grouped production operations have to be executed.

The structure elements located directly at node ProductionSegmentOperation are defined by data type ReleasedPlanningProductionModelProductionSegmentOperationElements. In certain implementations these elements may include the following: ID, UUID, LogisticsPlanningDetailLevelCode, BillOfOperationsPlanningOperationUUID.

ID is an identifier, which may be unique, of a RoughCutOperation. This element may be based on GDT OperationID.

UUID is an identifier, which may be unique, of the RoughCutOperation. This element may be based on GDT UUID.

LogisticsPlanningDetailLevelCode defines the level of detail of an operation in planning with reference to production. This element may be based on GDT LogisticsPlanningDetailLevelCode.

BillOfOperationsPlanningOperationUUID is an identifier, which may be unique, of the planning operation in the master data. This element may be based on GDTUUID.

In certain implementations of node ProductionSegmentOperation, the following inbound aggregation relationships may exist: BillOfOperationsPlanningOperation may have a cardinality relationship of c:cn.

In certain implementations of node ProductionSegmentOperation, the following composition relationships to subordinate nodes may exist: ProductionSegmentOperationActivity 150070 may have a cardinality relationship of 1:n; ProductionSegmentOperationAlternative 150074 may have a cardinality relationship of 1:n; and ProductionSegmentOperationDescription 150078 may have a cardinality relationship of 1:cn.

In certain implementations of node ProductionSegmentOperation a QueryByElements may be called, which provides a list of all ProductionSegmentOperations that fulfill the selection conditions. Elements are defined by data type ReleasedPlanningProductionModelProductionSegmentOperationElementsQueryElements. These elements may include: ID, which may be based on GDT OperationID; UUID, which may be based on GDT UUID; LogisticsPlanningDetailLevelCode, which may be based on GDT LogisticsPlanningDetailLevelCode; and BillOfOperationsPlanningOperationUUID, which may be based on GDT UUID. The above elements may be optional.

ProductionSegmentOperationDescription

BO ReleasedPlanningProductionModel/node ProductionSegmentOperationDescription is a node containing the description of a ProductionSegmentOperation.

The structure elements located directly at node ProductionSegmentOperationDescription are defined by data type ProductionSegmentOperationDescriptionElements. In certain implementations these elements may include the following: Description.

Description specifies language-dependent short text for a planning operation. This element may be based on GDT MEDIUM_Description.

ProductionSegmentOperationActivity

BO ReleasedPlanningProductionModel/node ProductionSegmentOperationActivity is a node containing the description of a processing or transportation step at a lower level than a ProductionSegmentOperation for a production process. A ProductionSegmentOperationActivity may define the scheduling and capacity planning in the ProductionPlanningOrder.

A ProductionSegmentOperation may exist within specialisations such as the following: RoughCutOperation, which is an operation that groups one or several activities of the bill of operations and is, therefore, a less detailed representation of the bill of operations. When using RoughCutOperations, all the Activities between two planning markers of a production bill of operations may be grouped into a RoughCutActivity.

A RoughCutActivity may be assigned to a ProductionSegmentOperation of the type RoughCutOperation.

The structure elements located directly at node ProductionSegmentOperationActivity are defined by data type ReleasedPlanningProductionModelProductionSegmentOperationActivityElements. In certain implementations these elements may include the following: ID, UUID, BillOfOperationsPlanningActivityUUID, LogisticsPlanningDetailLevelCode.

ID is an identifier, which may be unique, of a RoughCutOperation activity. This element may be based on GDT OperationActivityID.

UUID is an identifier, which may be unique, of a RoughCutActivity. This element may be based on GDT UUID.

BillOfOperationsPlanningActivityUUID is an identifier, which may be unique, of the planning activity of the ProductionBillOfOperations. This element may be based on GDT UUID.

LogisticsPlanningDetailLevelCode defines the level of detail of an activity in planning with reference to production. This element may be based on GDT LogisticsPlanningDetailLevelCode.

In certain implementations of node ProductionSegmentOperationActivity, the following composition relationships to subordinate nodes may exist: ProductionSegmentOperationActivityCapacityRequirements may have a cardinality relationship of 1:cn; and ProductionSegmentOperationActivityRelationship may have a cardinality relationship of 1:cn.

In certain implementations of node ProductionSegmentOperationActivity, the following inbound aggregation relationships may exist: BillOfOperationsPlanningActivity may have a cardinality relationship of c:cn.

At least one ProductionSegmentOperationActivity may exist.

In certain implementations of node ProductionSegmentOperationActivity a QueryByElements may be called, which provides a list of all ProductionSegmentOperationActivities that fulfill the selection conditions. Elements are defined by data type ReleasedPlanningProductionModelProductionSegmentOperationActivityElementsQueryElements. These elements may include: ID, which may be based on GDT OperationActivityID; UUID, which may be based on GDT UUID; BillOfOperationsPlanningActivityUUID, which may be based on GDT UUID; and LogisticsPlanningDetailLevelCode, which may be based on GDT LogisticsPlanningDetailLevelCode. The above elements may be optional.

ProductionSegmentOperationActivityCapacityRequirement

BO ReleasedPlanningProductionModel/node ProductionSegmentOperationActivityCapacityRequirement represents a capacity requirement for a ProductionSegmentOperationActivity at one main resource.

A ProductionSegmentOperationActivityCapacityRequirement may exist within specialisations such as the following: RoughCutCapacityRequirement, which may be assigned to a ProductionSegmentOperationActivity of the type RoughCutActivity.

The structure elements located directly at node ProductionSegmentOperationActivityCapacityRequirement are defined by data type ReleasedPlanningProductionModelProductionSegmentOperationActivityCapacityRequirementElements. In certain implementations these elements may include the following: UUID, ProductionSegmentOperationAlternativeUUID, ResourceUUID, LogisticsPlanningDetailLevelCode, FixedDuration, VariableDuration.

UUID is an identifier, which may be unique, of the CapacityRequirement. This element may be based on GDT UUID.

ProductionSegmentOperationAlternativeUUID is an identifier, which may be unique, for the alternative. This element may be based on GDT UUID.

ResourceUUID is an identifier, which may be unique, of the resource. This element may be based on GDT UUID.

LogisticsPlanningDetailLevelCode specifies the level of detail of a resource in planning with reference to production. This element may be based on GDT LogisticsPlanningDetailLevelCode.

FixedDuration specifies a fixed duration of an activity. This duration is required irrespective of the order quantity of the ProductionPlanningOrder. This element may be based on GDT TIME_Duration. It may be optional.

VariableDuration specifies a variable duration of the activity. This duration occurs in proportion to the order quantity of the ProductionPlanningOrder. This element may be based on GDT TIME_Duration. It may be optional.

In certain implementations of node ProductionSegmentOperationActivityCapacityRequirement, the following inbound association relationships may exist: Resource may have a cardinality relationship of 1:cn.

In certain implementations of node ProductionSegmentOperationActivityCapacityRequirement, the following inbound aggregation relationships may exist: ProductionSegmentOperationAlternative may have a cardinality relationship of 1:n, which specifies the change state of an alternative that refers to the planning resource.

In certain implementations of node ProductionSegmentOperationActivityCapacityRequirement a QueryByElements may be called, which provides a list of all ProductionSegmentOperationActivityCapacityRequirements that fulfill the selection conditions. Elements are defined by data type ReleasedPlanningProductionModelProductionSegmentOperationActivityCapacityRequirementElementsQueryElements. These elements may include: UUID, which may be based on GDT UUID; ProductionSegmentOperationAlternativeUUID, which may be based on GDT UUID; ResourceUUID, which may be based on GDT UUID; and LogisticsPlanningDetailLevelCode, which may be based on GDT LogisticsPlanningDetailLevelCode. The above elements may be optional.

ProductionSegmentOperationActivityRelationship

BO ReleasedPlanningProductionModel/node ProductionSegmentOperationActivityRelationship represents a relationship between ProductionSegmentOperationActivities.

The structure elements located directly at node ProductionSegmentOperationActivityRelationship are defined by data type ReleasedPlanningProductionModelProductionSegmentOperationActivityRelationshipElements. In certain implementations these elements may include the following: UUID, SuccessorOperationActivityUUID, NetworkPlanElementSuccessionTypeCode, MinimumFixedLagDuration, MinimumVariableLagDuration.

UUID is an identifier, which may be unique, of a rough-cut activity relationship. This element may be based on GDT UUID.

Successor OperationActivityUUID is an identifier, which may be unique, of the planning activity that is defined as successor by the planning activity relationship. This element may be based on GDT UUID.

NetworkPlanElementSuccessionTypeCode is a coded representation of the type of the planning activity relationship. This element may be based on GDT NetworkPlanElementSuccessionTypeCode.

MinimumFixedLagDuration specifies a minimum fixed time period between the planning activities of the rough-cut activity relationship. This time period may be independent of the order quantity. This element may be based on GDT TIME_Duration Qualifier LagDuration. It may be optional.

MinimumVariableLagDuration specifies a minimum variable time period between the rough-cut activities of the rough-cut activity relationship. This time period may occur in proportion to the order quantity of the ProductionPlanningOrder. This element may be based on GDT TIME_Duration Qualifier LagDuration. It may be optional.

In certain implementations of node ProductionSegmentOperationActivityRelationship, the following inbound association relationships may exist: ProductionSegmentOperationActivity may have a cardinality relationship of 1:c, which specifies the activity that is included in the activity relationship.

In certain implementations of node ProductionSegmentOperationActivityRelationship a QueryByElements may be called, which provides a list of all ProductionSegmentOperationActivityRelationships that fulfill the selection conditions. Elements are defined by data type ReleasedPlanningProductionModelProductionSegmentOperationActivityRelationshipElementsQueryElements. These elements may include: UUID, which may be based on GDT UUID; SuccessorOperationActivityUUID, which may be based on GDT UUID; NetworkPlanElementSuccessionTypeCode, which may be based on GDT NetworkPlanElementSuccessionTypeCode; MinimumFixedLagDuration, which may be based on GDT Duration Qualifier LagDuration; and MinimumVariableLagDuration, which may be based on GDT Duration Qualifier LagDuration. The above elements may be optional.

ProductionSegmentOperationAlternative

BO ReleasedPlanningProductionModel/node ProductionSegmentOperationAlternative represents an alternative for a ProductionSegmentOperation that can be selected in planning. If alternative processing paths or alternative assignments for the main resource are maintained in the process definition, several planning alternatives may be created for a ProductionSegmentOperation.

The structure elements located directly at node ProductionSegmentOperationAlternative are defined by data type ReleasedPlanningProductionModelProductionSegmentOperationAlternativeElements. In certain implementations these elements may include the following: ID, UUID, BillOfOperationsPlanningAlternativeUUID.

ID is an identifier, which may be unique, of the alternative of a ProductionSegmentOperation. This element may be based on GDT OperationAlternativeID.

UUID is an identifier, which may be unique, of the OperationAlternative. This element may be based on GDT UUID.

BillOfOperationsPlanningAlternativeUUID is an identifier, which may be unique, of the planning alternative of the ProductionBillOfOperations. This element may be based on GDT UUID.

In certain implementations of node ProductionSegmentOperationAlternative, the following inbound aggregation relationships may exist: BillOfOperationsPlanningAlternative may have a cardinality relationship of c:cn.

In certain implementations of node ProductionSegmentOperationAlternative, the following composition relationships to subordinate nodes may exist: ProductionSegmentOperationAlternativeChangeState 150076 may have a cardinality relationship of 1:n In certain implementations of node ProductionSegmentOperationAlternative a QueryByElements may be called, which provides a list of all ProductionSegmentOperationAlternatives that fulfill the selection conditions. Elements are defined by data type ReleasedPlanningProductionModelProductionSegmentOperationAlternativeElementsQueryElements. These elements may include: ID, which may be based on GDT OperationAlternativeID; UUID, which may be based on GDT UUID; and BillOfOperationsPlanningAlternativeUUID, which may be based on GDT UUID. The above elements may be optional.

ProductionSegmentOperationAlternativeChangeState

BO ReleasedPlanningProductionModel/node ProductionSegmentOperationAlternativeChangeState represents an alternative of a ProductionSegmentOperationAlternative that can be created with or without an EngineeringChangeOrder.

The structure elements located directly at node ProductionSegmentOperationAlternativeChangeState are defined by data type ReleasedPlanningProductionModelProductionSegmentOperationAlternativeChangeStateElements. In certain implementations these elements may include the following: UUID, PriorityValue, LeadVariableDuration, LeadFixedDuration.

UUID is an identifier, which may be unique, of the OperationAlternative. This element may be based on GDT UUID.

PriorityValue, which describes the representation of a dispatching priority in logistics. This element may be based on GDT SMALLINTEGER_PriorityValue. It may be optional.

LeadVariableDuration, which specifies the variable lead time of an alternative of a rough-cut operation. This element may be based on GDT TIME_Duration Qualifier VariableDuration. It may be optional.

LeadFixedDuration, which specifies the fixed lead time of an alternative of a rough-cut operation. This element may be based on GDT TIME_Duration Qualifier FixedDuration. It may be optional.

In certain implementations of node ProductionSegmentOperationAlternativeChangeState a QueryByElements may be called, which provides a list of all ProductionSegmentOperationAlternativeChangeStates that fulfill the selection conditions. Elements are defined by data type ReleasedPlanningProductionModelProductionSegmentOperationAlternative ChangeStateElementsQueryElements. These elements may include: UUID, which may be based on GDT UUID; and PriorityValue, which may be based on GDT SMALLINTEGER_PriorityValue. The above elements may be optional.

ProductionSegmentMaterialAssignment

BO ReleasedPlanningProductionModel/node ProductionSegmentMaterialAssignment represents the assignment of a ProductionSegmentMaterialOutput or a ProductionSegmentMaterialInput to a ProductionSegmentOperationActivity.

The structure elements located directly at node ProductionSegmentMaterialAssignment are defined by data type ReleasedPlanningProductionModelProductionSegmentMaterialAssignmentElements. In certain implementations these elements may include the following: UUID, MaterialInputUUID, MaterialOutputUUID, ProductionSegmentOperationActivityUUID.

UUID is an identifier, which may be unique, of the MaterialAssignment. This element may be based on GDT UUID.

MaterialInputUUID is an identifier, which may be unique, of the MaterialInput. This element may be based on GDT UUID. It may be optional.

MaterialOutputUUID is an identifier, which may be unique, of the MaterialOutput. This element may be based on GDT UUID. It may be optional.

ProductionSegmentOperationActivityUUID is an identifier, which may be unique, of the planning activity that may be assigned to the material. This element may be based on GDT UUID.

In certain implementations of node ProductionSegmentMaterialAssignment, the following inbound aggregation relationships may exist.

Activity may have a cardinality relationship of 1:c, and specifies the activity to which a component is assigned.

MaterialInput may have a cardinality relationship of c:cn.

MaterialOutput may have a cardinality relationship of c:cn.

In certain implementations of node ProductionSegmentMaterialAssignment a QueryByElements may be called, which provides a list of all ProductionSegmentMaterialAssignments that fulfill the selection conditions. Elements are defined by data type ReleasedPlanningProductionModelProductionSegmentMaterialAssignmentElementsQueryElements. These elements may include: UUID, which may be based on GDT UUID; MaterialInputUUID, which may be based on GDT UUID; MaterialOutputUUID, which may be based on GDT UUID; and ProductionSegmentOperationActivityUUID, which may be based on GDT UUID. The above elements may be optional.

HierarchicalViewFilterCondition (Transformation Node)

BO ReleasedPlanningProductionModel/node HierarchicalViewFilterCondition (Transformation Node). A HierarchicalViewFilterCondition is a condition that is used for filtering the elements of the hierarchical view. It may contain an explosion date. The hierarchical view with its elements is represented by the Transformation Node HierarchicalViewElement The structure elements located directly at node HierarchicalViewFilterCondition are defined by data type ReleasedPlanningProductionModelHierarchicalViewFilterConditionElements. In certain implementations these elements may include the following: ExplosionDate, ValidityPeriod.

ExplosionDate. This element may be based on GDT Date Qualifier ExplosionDate.

ValidityPeriod specifies the validity period for the HierarchicalViewFilterCondition. The Filter result is valid if the explosion date lies in this interval. This element may be based on GDT CLOSED_DatePeriod.

In certain implementations of node HierarchicalViewFilterCondition, navigation associations may exist as follows: TopLevelHierarchicalViewElement may have a cardinality relationship of 1:n (filtered); this is an association to node HierarchicalViewElement specifying the top level of the HierarchicalViewElement filtered by the explosion date of node HierarchicalViewFilterCondition. PlanningOperation may have a cardinality relationship of 1:n (filtered); this is an association to node PlanningOperation specifying the PlanningOperation filtered by the explosion date of node HierarchicalViewFilterCondition. PlanningOperationRelationship may have a cardinality relationship of 1:cn (filtered); this is an association to node PlanningOperationRelationship specifying the PlanningOperationRelationship filtered by the explosion date of node HierarchicalViewFilterCondition. HierarchicalViewMaterialInputChangeState may have a cardinality relationship of 1:cn (filtered); this is an association to node HierarchicalViewElement specifying the HierarchicalViewElement of the type MaterialInput filtered by the explosion date of node HierarchicalViewFilterCondition. HierarchicalViewMaterialOutputChangeState may have a cardinality relationship of 1:n (filtered); this is an association to node HierarchicalViewElement specifying the HierarchicalViewElement of the type MaterialOutput filtered by the explosion date of node HierarchicalViewFilterCondition.

PlanningOperation (Transformation Node)

BO ReleasedPlanningProductionModel/node PlanningOperation (Transformation Node) represents a segment of a process description from a planning perspective. It may correspond to one or several operations in a BillOfOperations.

A PlanningOperation may combine attributes of the ProductionSegment, the ProductionSegmentOperation and one marked ProductionSegmentOperationAlternative. The marked ProductionSegmentOperationAlternative may be either the ProductionSegmentOperationAlternative with the highest priority, or the ProductionSegmentOperationAlternative which was selected by the action SelectAlternative of node HierarchicalViewElement.

The structure elements located directly at node PlanningOperation are defined by data type ReleasedPlanningProductionModelPlanningOperationElements. In certain implementations these elements may include the following: ProductionSegmentID, OperationID, OperationUUID, AlternativeID, LeadVariableDuration, LeadFixDuration, OrdinalNumberValue.

ProductionSegmentID is an identifier, which may be unique, of the ProductionSegment. This element may be based on GDT ProductionSegmentID.

OperationID is an identifier, which may be unique, of a rough-cut ProductionSegmentOperation. This element may be based on GDT OperationID.

OperationUUID is an identifier, which may be unique, of a rough-cut ProductionSegmentOperation. This element may be based on GDT UUID.

AlternativeID is an identifier, which may be unique, of the Alternative of a ProductionSegmentOperation. This element may be based on GDT OperationAlternativeID.

LeadVariableDuration specifies the variable lead duration of the alternative of a rough-cut ProductionSegmentOperation. This element may be based on GDT TIME_Duration Qualifier VariableDuration. It may be optional.

LeadFixDuration specifies the fixed lead duration of the Alternative of a rough-cut ProductionSegmentOperation. This element may be based on GDT TIME_Duration Qualifier FixedDuration. It may be optional.

OrdinalNumberValue is defined by Sorting. It corresponds to the order of the Planning Operations. This element may be based on GDT OrdinalNumberValue.

In certain implementations of node PlanningOperation, navigation associations may exist as follows: OperationDescription may have a cardinality relationship of 1:c (filtered), which is an association to node ProductionSegmentOperationDescription which specifies the ProductionSegmentOperationDescription for a given language. HierarchicalViewAlternative may have a cardinality relationship of 1:n, which is an association to node HierarchicalViewElement which specifies the HierarchicalViewElements of type Alternative, which are hierarchical below the PlanningOperation. HierarchicalViewMaterialInputChangeState may have a cardinality relationship of 1:cn (filtered), which is an association to node HierarchicalViewElement which specifies the HierarchicalViewElements of type MaterialInputChangeState, which are hierarchical below the PlanningOperation. HierarchicalViewMaterialOutputChangeState may have a cardinality relationship of 1:cn, which is an association to node HierarchicalViewElement which specifies the HierarchicalViewElements of type MaterialOutputChangeState, which are hierarchical below the PlanningOperation. TopLevelHierarchicalViewElement may have a cardinality relationship of 1:n (filtered), which is an association to node HierarchicalViewElement specifying the top level of the HierarchicalViewElement filtered by the explosion date of node HierarchicalViewFilterCondition.

Filter elements for the above relationships may be defined by data type ReleasedPlanningProductionModelDateFilter. In certain implementations these elements may include the following: LanguageCode, which may be based on GDT LanguageCode and may be optional; and Date, which may be based on GDT Date and may be optional.

PlanningOperationRelationship (Transformation Node)

BO ReleasedPlanningProductionModel/node PlanningOperationRelationship (Transformation Node) represents a relationship between two Planning Operations.

A PlanningOperationRelationship may be derived from the activity relationship between the activities of two Planning Operations. The relationship between two ProductionSegments may be created as an End Start relationship.

The structure elements located directly at node PlanningOperationRelationship are defined by data type ReleasedPlanningProductionModelPlanningOperationRelationshipElements. In certain implementations these elements may include the following: PredecessorProductionSegmentID, Predecessor OperationID, Predecessor OperationUUID, SuccessorProductionSegmentID, Successor OperationID, Successor OperationUUID, NetworkPlanElementSuccessionTypeCode, MinimumFixedLagDuration, MinimumVariableLagDuration, OrdinalNumberValue.

Predecessor ProductionSegmentID is an identifier, which may be unique, of a ProductionSegment. This element may be based on GDT ProductionSegmentID.

Predecessor OperationID is an identifier, which may be unique, of a PlanningOperation. This element may be based on GDT OperationID.

Predecessor OperationUUID is an identifier, which may be unique, of a PlanningOperation. This element may be based on GDT UUID.

Successor ProductionSegmentID is an identifier, which may be unique, of a ProductionSegment of the successing PlanningOperation. This element may be based on GDT ProductionSegmentID.

Successor OperationID is an identifier, which may be unique, of the successing PlanningOperation. This element may be based on GDT OperationID.

Successor OperationUUID is an identifier, which may be unique, of a PlanningOperation. This element may be based on GDT UUID.

NetworkPlanElementSuccessionTypeCode is a coded representation of the type of the planning activity relationship. This element may be based on GDT NetworkPlanElementSuccessionTypeCode.

MinimumFixedLagDuration specifies the minimum fixed time period between the planning activities of the rough-cut activity relationship. This time period may be independent of the order quantity. This element may be based on GDT TIME_Duration Qualifier LagDuration. It may be optional.

MinimumVariableLagDuration specifies the minimum variable time period between the rough-cut activities of the rough-cut activity relationship. This time period occurs in proportion to the order quantity of the ProductionPlanningOrder. This element may be based on GDT TIME_Duration Qualifier LagDuration. It may be optional.

OrdinalNumberValue is defined by Sorting. It corresponds to the order of the Planning operations. This element may be based on GDT OrdinalNumberValue.

In certain implementations of node PlanningOperationRelationship, navigation associations to node ProductionSegmentOperationDescription may exist as follows:

Predecessor OperationDescription may have a cardinality relationship of 1:c (filtered), which specifies for a given language the ProductionSegmentOperationDescription of the predecessor. Successor OperationDescription may have a cardinality relationship of 1:c (filtered), which specifies for a given language the ProductionSegmentOperationDescription of the successor.

Filter elements for the above relationships may be defined by data type ReleasedPlanningProductionModelLanguageFilter. In certain implementations these elements may include the following: LanguageCode, which may be based on GDT LanguageCode and may be optional.

HierarchicalViewElement (Transformation Node)

BO ReleasedPlanningProductionModel/node HierarchicalViewElement (Transformation Node) represents an element of a hierarchical view of the structure of a ReleasedPlanningProductionModel.

The structure elements located directly at node HierarchicalViewElement are defined by data type ReleasedPlanningProductionModelHierarchicalViewElementElements. In certain implementations these elements may include the following: ObjectNodeID, ObjectNodeTypeCode, UUID, BillOfMaterialItemGroupItemID, BillOfMaterialItemGroupID, EngineeringChangeOrderID, MaterialRoleCode, Quantity, QuantityTypeCode, QuantityFixedIndicator, ValidityPeriod, FixedDuration, VariableDuration, OrdinalNumberValue.

ObjectNodeID is an identifier of the corresponding node or Object. These are the identifiers of the nodes ProductionSegment, ProductionSegmentOperation, ProductionSegmentOperationActivity, ProductionSegmentAlternative or ProductionSegmentMaterialAssignment respectively of the objects Material (for node type ProductionSegmentMaterialInput or ProductionSegmentMaterialOutput) or Resource (for node type ProductionSegmentOperationActivityCapacityRequirement). This element may be based on GDT ObjectID.

ObjectNodeTypeCode specifies the node type of the corresponding node of the ReleasedPlanningProductionModel: ProductionSegment, ProductionSegmentMaterialOutput (with specialisations MainProductMaterialOutput, ByProductMaterialOutput and IntermediateMaterialOutput), ProductionSegmentMaterialInput (with specialisations ComponentMaterialInput and IntermediateMaterialInput), ProductionSegmentOperation, ProductionSegmentOperationActivity, ProductionSegmentOperationActivityCapacityRequirement, ProductionSegmentOperationAlternative und ProductionSegmentMaterialAssignment. This element may be based on GDT ObjectNodeTypeCode.

UUID is an identifier, which may be unique, of an HierarchicalViewElement. It may be identical with the Identifier of the corresponding node of the ReleasedPlanningProductionModels. This element may be based on GDT UUID.

BillOfMaterialItemGroupItemID is an identifier, which may be unique, of the ItemGroupItem of the business object ProductionBillOfMaterial. This element may be based on GDT BillOfMaterialItemGroupItemID. It may be optional.

BillOfMaterialItemGroupID is an identifier, which may be unique, of the ItemGroup of the business object ProductionBillOfMaterial. This element may be based on GDT BillOfMaterialItemGroupID. It may be optional.

EngineeringChangeOrderID is an identifier, which may be unique, of the business object EngineeringChangeOrder with that the ChangeState of the BillOfMaterialItemGroupItemID was created. This element may be based on GDT EngineeringChangeOrderID. It may be optional.

MaterialRoleCode specifies the role of material which is restricted to MainProduct, ByProduct, Component and Intermediate. This element may be based on GDT MaterialRoleCode. It may be optional.

Quantity specifies the quantity of the consumed or produced Material. This element may be based on GDT Quantity. It may be optional.

QuantityTypeCode is a coded representation of the type of the quantity. This element may be based on GDT QuantityTypeCode. It may be optional.

QuantityFixedIndicator indicates whether the requirement quantity is fixed and therefore independent of the order quantity of the ProductionPlanningOrder. This element may be based on GDT Indicator, Qualifier Fixed. It may be optional.

ValidityPeriod specifies the validity interval of the HierachicalViewElement. This element may be based on GDT CLOSED_DatePeriod.

FixedDuration specifies a fixed duration of an Activity or fixed lead time of an Alternative. This element may be based on GDT TIME_Duration. It may be optional.

VariableDuration specifies a variable duration of an Activity or variable lead time of an Alternative Alternative. This element may be based on GDT TIME_Duration. It may be optional.

OrdinalNumberValue is defined by Sorting. It corresponds to the order of the elements. This element may be based on GDT OrdinalNumberValue.

In certain implementations of node HierarchicalViewElement, the following composition relationships to subordinate nodes may exist: SubHierarchyViewElement may have a cardinality relationship of c:cn (filtered), which is an association to node HierarchicalViewElement specifying the HierarchicalViewElements that are hierarchical below the node HierachicalViewElement filtered by the explosion date of the node HierarchicalViewFilterCondition. ProductionSegment may have a cardinality relationship of 1:c, which is an association to node ProductionSegment specifying the related ProductionSegments. ProductionSegmentOperation may have a cardinality relationship of 1:c, which is an association to node ProductionSegmentOperation specifying the related Operations. ProductionSegmentOperationAlternativeChangeState may have a cardinality relationship of 1:c, which is an association to node ProductionSegmentOperationAlternativeChangeState specifying the related AlternativeChangeStates. ProductionSegmentOperationActivityCapacityRequirement may have a cardinality relationship of 1:c, which is an association to node ProductionSegmentOperationActivityCapacityRequirement specifying the related CapacityRequirements. ProductionSegmentMaterialOutputChangeState may have a cardinality relationship of 1:c, which is an association to node ProductionSegmentMaterialOutputChangeState specifying the related MaterialOutputChangeStates. ProductionSegmentMaterialInputChangeState may have a cardinality relationship of 1:c, which is an association to node ProductionSegmentMaterialInputChangeState specifying the related MaterialOutputChangeStates.

In certain implementations of node HierarchicalViewElement, the following ESI Actions (Enterprise Service Infrastructure) may exist: SelectAlternative, which defines an Alternative that may be assigned to the PlanningOperation (node PlanningOperation).

HierarchicalViewElementDescription 150098 (Transformation Node)

BO ReleasedPlanningProductionModel/node HierarchicalViewElementDescription (Transformation Node) represents a language dependent text description with additional information on a hierarchical view element.

The structure elements located directly at node HierarchicalViewElementDescription are defined by data type ReleasedPlanningProductionModelHierarchicalViewElementDescriptionElements. In certain implementations these elements may include the following:

Description is a language dependent short text of a PlanningOperation. It may be based on GDT MEDIUM_Description.

Business Object ReleasedSiteLogisticsProcessModel

FIGS. 151-1 through 151-6 illustrate an example ReleasedSiteLogisticsProcessModel business object model 151008. Specifically, this model depicts interactions among various hierarchical components of the ReleasedSiteLogisticsProcessModel, as well as external components that interact with the ReleasedSiteLogisticsProcessModel (shown here as 151000 through 151006 and 151010 through 151024).

ReleasedSiteLogisticsProcessModel is a released version of a site logistics process model that contains all elements required for defining and describing the execution of a site logistics process. BO ReleasedSiteLogisticsProcessModel may be part of the process component Site Logistics Model Management in the foundation layer.

BO ReleasedSiteLogisticsProcessModel may be used for executing site logistics processes. The process described by a ReleasedSiteLogisticsProcessModel can include the following: Standard Receiving, Standard Shipping, receiving of returned goods (from customer), shipping of returned goods (to supplier), Replenishment, Cleanup, Physical inventory counting.

BO ReleasedSiteLogisticsProcessModel may be created by copying the original master data found in a site logistics process model at a chosen point in time. This can provides site logistics processing (requests, orders and lots) with a consistent read only version of the process model, and it can separate between master data use and maintenance.

The structure of BO ReleasedSiteLogisticsProcessModel offers a reference to the site logistics process model from which the ReleasedSiteLogisticsProcessModel was created. It also offers information on each process segment which by itself or in combination with others builds the complete process described by the ReleasedSiteLogisticsProcessModel (ProcessSegment 151026).

ReleasedSiteLogisticsProcessModel is represented by the node ReleasedSiteLogisticsProcessModel.

BO ReleasedSiteLogisticsProcessModel 151082/Root Node represents a released version of a site logistics process model that contains all elements required for defining and describing the execution of a site logistics process.

The structure elements located directly at node ReleasedSiteLogisticsProcessModel are defined by data type ReleasedSiteLogisticsProcessModelElements. In certain implementations these elements may include the following: ID, UUID, SiteLogisticsProcessModelUUID, BusinessRuleDefinitionUUID, SystemAdministrativeData, SiteLogisticsProcessModelTypeCode, VersionID, Status, LifeCycleStatusCode.

ID is an identifier, which may be unique, of the ReleasedSiteLogisticsProcessModel, which may be unique within a system installation. This element may be based on GDT ReleasedSiteLogisticsProcessModelID.

UUID is an identifier, which may be unique, of the ReleasedSiteLogisticsProcessModel for referencing purposes. This element may be based on GDT UUID.

SiteLogisticsProcessModelUUID is an identifier, which may be unique, of the site logistics process model, from which the ReleasedSiteLogisticsProcessModel was created. This element may be based on GDT UUID.

BusinessRuleDefinitionUUID is an identifier, which may be unique, of the business rule used for selecting the ReleasedSiteLogisticsProcessModel. This element may be based on GDT UUID.

SystemAdministrativeData specifies administrative data that is stored in a system. This data may include system users and change dates/times. This element may be based on GDT SystemAdministrativeData.

SiteLogisticsProcessModelTypeCode is a coded representation of the type of the site logistic process model (e.g. Standard Shipping, Replenishment) that is described by the ReleasedSiteLogisticsProcessModel. This element may be based on GDT SiteLogisticsProcessModelTypeCode.

VersionID is a numeric identifier of the particular form of the ReleasedSiteLogisticsProcessModel. This element may be based on GDT VersionID.

Status specifies the status of the ReleasedSiteLogisticsProcessModel lifecycle status IDT: ReleasedSiteLogisticsProcessModelStatus.

LifeCycleStatusCode specifies the current status value. This element may be based on GDT ReleasedSiteLogisticsProcessModelLifeCycleStatusCode.

In certain implementations of node ReleasedSiteLogisticsProcessModel, the following composition relationships to subordinate nodes may exist: ProcessSegment 151026 may have a cardinality relationship of 1:n; Description 151074 may have a cardinality relationship of 1:cn; TextCollection 151078 (DO) may have a cardinality relationship of 1:c; and AttachmentFolder 151076 (DO) may have a cardinality relationship of 1:c.

In certain implementations of node ReleasedSiteLogisticsProcessModel, the following inbound association relationships may exist. SiteLogisticsProcessModel may have a cardinality relationship of 1:cn, which represents the site logistics process model from which the released site logistics process model was created. CreationIdentity may have a cardinality relationship of 1:cn.

In certain implementations of node ReleasedSiteLogisticsProcessModel, Enterprise Service Infrastructure/ESI action FlagAsObsolete (S&AM action) may be implemented. This action flags an "Active" ReleasedSiteLogisticsProcessModel as "Obsolete". This ESI action may be used internally by the business object and may be unavailable in the UI.

The ESI action FlagAsObsolete may change the LifeCycleStatusCode of the ReleasedSiteLogisticsProcessModel from "Active" to "Obsolete". Note: once a ReleasedSiteLogisticsProcessModel is marked as "Obsolete" there may be no possibility to undo this action.

The ESI action FlagAsObsolete may be performed on a ReleasedSiteLogisticsProcessModel with lifecycle status value "Active". Changing the status of a ReleasedSiteLogisticsProcessModel from "Active" to "Obsolete" indicates that a newer version of the ReleasedSiteLogisticsProcessModel exists and that no new references to the ReleasedSiteLogisticsProcessModel are allowed (though old references may still exist).

In certain implementations of node ReleasedSiteLogisticsProcessModel the following queries may be called: QueryByElementsAndBusinessPartnerName, QueryBySiteLogisticsProcessModel, QueryByProcessSegmentOperation QueryByProcessSegmentID.

QueryByElementsAndBusinessPartnerName provides a list of all ReleasedSiteLogisticsProcessModels which satisfy the selection criteria, specified by the query elements and combined by logical "AND". If a selection criterion is not filled, the query will regard it as a wild-card, meaning that all values of the criterion may be valid. Query elements are defined by data type ReleasedSiteLogisticsProcessModelElementsAndBusinessPartnerNameQueryElements. In certain implementations these elements may include the following: ID, which may be based on GDTReleasedSiteLogisticsProcessModelID; SiteLogisticsProcessModelID, which may be based on GDT SiteLogisticsProcessModelID; CreationDateTime, which may be based on GDT Global_DateTime, Qualifier Creation; CreationBusinessPartnerCommonPersonNameGivenName, which may be based on GDT LANGUAGEINDEPENDENT_MEDIUM_Name; CreationBusinessPartnerCommonPersonNameFamilyName, which may be based on GDT LANGUAGEINDEPENDENT_MEDIUM_Name; SiteLogisiticsProcessTypeCode, which may be based on GDT SiteLogisiticsProcessTypeCode; VersionID, which may be based on GDT VersionID; and LifeCycleStatusCode, which may be based on GDT ReleasedSiteLogisticsProcessModelLifeCycleStatusCode. The above elements may be optional.

QueryBySiteLogisticsProcessModel provides a list of all ReleasedSiteLogisticsProcessModels which were created from the specified SiteLogisticsProcessModel. If the LifeCycleStatusCode is filled, then the returned ReleasedSiteLogisticsProcessModels may be dependent on the value provided—"Active" or "Obsolete". QueryBySiteLogisticsProcessModel may be used by a site logistics process model (master data) to determine the ReleasedSiteLogisticsProcessModels that were created from it.

The query elements are defined by data type ReleasedSiteLogisticsProcessModelSiteLogisticsProcessModelQueryElements. In certain implementations these elements may include the following: SiteLogisticsProcessModelUUID, which may be based on GDT UUID; and LifeCycleStatusCode, which may be based on GDT ReleasedSiteLogisticsProcessModelLifeCycleStatusCode and may be optional.

QueryByProcessSegmentOperation provides a list of all ReleasedSiteLogisticsProcessModels which contain an operation with given attributes, specified by the query. The following selection criteria, specified by the query elements, are combined by logical "AND". If a selection criterion is not filled, the query will regard it as a wild-card, meaning that all values of this criterion may be valid. The query elements are defined by data type ReleasedSiteLogisticsProcessModelProcessSegmentOperationQueryElements. In certain implementations these elements may include the following: ProcessSegmentOperationID, which may be based on GDT OperationID; ProcessSegmentOperationTypeCode, which may be based on GDT OperationTypeCode; ProcessSegmentOperationCategory, which may be based on GDT OperationCategoryCode; ProcessSegmentOperationLogisticUnitLogisticUnitID, which may be based on GDT LogisticUnitID; ProcessSegmentOperationLogisticUnitRoleCode, which may be based on GDT OperationLogisticUnitRoleCode; ProcessSegmentOperationActivityID, which may be based on GDT OperationActivityID; ProcessSegmentOperationActivityTypeCode, which may be based on GDT OperationActivityTypeCode; and ProcessSegmentOperationActivityCategoryCode, which may be based on GDT OperationActivityCategoryCode. The above elements may be optional.

QueryByProcessSegmentID: provides a list of all ReleasedSiteLogisticsProcessModels which contain the specified Process Segment. The query elements are defined by data type ReleasedSiteLogisticsProcessModelProcessSegmentIDQueryElements. In certain implementations these elements may include the following: ProcessSegmentID, which may be based on GDT ReleasedSiteSiteLogisticsProcessModelProcessSegmentID).

ProcessSegment

BO ReleasedSiteLogisticsProcessModel/node ProcessSegment represents a net of operations for moving, packing or checking stock in a logistic site.

The structure elements located directly at node ProcessSegment are defined by data type ReleasedSiteLogisticsProcessModelProcessSegmentElements. In certain implementations these elements may include the following: ID, UUID, LeadTimeDuration, AutomaticProcessingIndicator.

ID is an identifier, which may be unique, of the ProcessSegment. This element may be based on GDT ReleasedSiteLogisticsProcessModelProcessSegmentID.

UUID is an identifier, which may be unique, of the ProcessSegment for referencing purposes. This element may be based on GDT UUID.

LeadTimeDuration specifies the rough time estimation for executing the ProcessSegment. This element may be measured in days, hours or minutes. It may be based on GDT Duration, Qualifier LeadTime. It may be optional.

AutomaticProcessingIndicator indicates whether the process segment shall be processed automatically. This element may be based on GDT Indicator. Qualifier AutomaticProcessing may be optional.

In certain implementations of node ProcessSegment, the following composition relationships to subordinate nodes may exist: ProcessSegmentBranching 151080 may have a cardinality relationship of 1:cn; ProcessSegmentOperation 151028 may have a cardinality relationship of 1:n; ProcessSegmentInternalMaterialFlow 151038 may have a cardinality relationship of 1:n; ProcessSegmentDescription 151068 may have a cardinality relationship of 1:cn; ProcessSegmentTextCollection 151072 (DO) may have a cardinality relationship of 1:c; and ProcessSegmentAttachmentFolder 151070 (DO) may have a cardinality relationship of 1:c.

ProcessSegmentBranching

BO ReleasedSiteLogisticsProcessModel/node ProcessSegmentBranching represents an entry point of two or more paths in the site logistics process segment. It may divide the operations in the process segment into alternative paths which can be followed in parallel.

The structure elements located directly at node ProcessSegmentBranching are defined by data type ReleasedSiteLogisticsProcessModelProcessSegmentBranchingElements. In certain implementations these elements may include the following: ID, UUID, BusinessRuleDefinitionUUID.

ID is an identifier, which may be unique, of the ReleasedSiteLogisticsProcessModelProcessSegmentBranching, which may be unique in the context of the process segment that contains it. This element may be based on GDT LogisticsBranchingID.

UUID is an identifier, which may be unique, of the ReleasedSiteLogisticsProcessModelProcessSegmentBranching for referencing purposes. This element may be based on GDT UUID.

BusinessRuleDefinitionUUID is an identifier, which may be unique, of a business rule definition used for selecting a processing path. This element may be based on GDT UUID.

In certain implementations of node ProcessSegmentBranching, the following composition relationships to subordinate nodes may exist: ProcessSegmentBranchingJoin 151046 may have a cardinality relationship of 1:1; ProcessSegmentBranchingPath 151048 may have a cardinality relationship of 1:n; ProcessSegmentBranchingDescription 151062 may have a cardinality relationship of 1:cn; ProcessSegmentBranchingTextCollection 151066 (DO) may have a cardinality relationship of 1:c; and ProcessSegmentBranchingAttachmentFolder 151064 (DO) may have a cardinality relationship of 1:c.

ProcessSegmentBranchingJoin

BO ReleasedSiteLogisticsProcessModel/node ProcessSegmentBranchingJoin represents a point at which the branched paths of a process segment branching meet.

The structure elements located directly at node ProcessSegmentBranchingJoin are defined by data type ReleasedSiteLogisticsProcessModelProcessSegmentBranchingJoinElements. In certain implementations these elements may include the following: ID, UUID.

ID is an identifier, which may be unique, of the ProcessSegmentBranchingJoin, which may be unique in the context of the process segment that contains it. This element may be based on GDT LogisticsBranchingJoinID.

UUID is an identifier, which may be unique, of the ProcessSegmentBranchingJoin for referencing purposes. This element may be based on GDT UUID.

ProcessSegmentBranchingPath

BO ReleasedSiteLogisticsProcessModel/node ProcessSegmentBranchingPath represents a sequence of operations that defines a course of action in a process segment.

The structure elements located directly at node ProcessSegmentBranchingPath are defined by data type ReleasedSiteLogisticsProcessModelReleasedSiteLogisticsProcessModelProcessSegmentBranchingPathElements. In certain implementations these elements may include the following: ID, UUID.

ID is an identifier, which may be unique, of the ProcessSegmentBranchingPath which may be unique in the context of the process segment that contains it. This element may be based on GDT LogisticsBranchingPathID.

UUID is an identifier, which may be unique, of the ProcessSegmentBranchingPath for referencing purposes. This element may be based on GDT UUID.

In certain implementations of node ProcessSegmentBranchingPath, the following composition relationships to subordinate nodes may exist: ProcessSegmentBranchingPathDescription 151050 may have a cardinality relationship of 1:cn; ProcessSegmentBranchingPathTextCollection 151056 (DO) may have a cardinality relationship of 1:c; and ProcessSegmentBranchingPathAttachmentFolder 151052 (DO) may have a cardinality relationship of 1:c.

In certain implementations of node ProcessSegmentBranchingPath, the following navigation association relationship to node ProcessSegmentOperation may exist: Operations may have a cardinality relationship of c:n, which represents the operations that the path contains.

A ProcessSegmentBranchingPath may contain at least one operation.

ProcessSegmentBranchingPathDescription

BO ReleasedSiteLogisticsProcessModel/node ProcessSegmentBranchingPathDescription represents a language-dependent medium-length statement describing the ProcessSegmentBranchingPath.

The structure elements located directly at node ProcessSegmentBranchingPathDescription are defined by data type ReleasedSiteLogisticsProcessModelProcessSegmentBranchingPathDescriptionElements. In certain implementations these elements may include the following: Description.

Description is a language dependent description of the process segment. This element may be based on GDT _MEDIUM_Description, Qualifier ReleasedSiteLogisticsProcessModelProcessSegmentBranchingPath.

ProcessSegmentBranchingPathAttachmentFolder (DO)

BO ReleasedSiteLogisticsProcessModel/node ProcessSegmentBranchingPathAttachmentFolder represents a container of documents that describe the ProcessSegmentBranchingPath.

ProcessSegmentBranchingPathTextCollection (DO)

BO ReleasedSiteLogisticsProcessModel/node ProcessSegmentBranchingPathTextCollection represents a natural-language representation of the characteristics of the ProcessSegmentBranchingPath.

ProcessSegmentBranchingDescription

BO ReleasedSiteLogisticsProcessModel/node ProcessSegmentBranchingDescription represents a language-dependent medium-length statement describing the ProcessSegmentBranching.

The structure elements located directly at node ProcessSegmentBranchingDescription are defined by data type ReleasedSiteLogisticsProcessModelProcessSegmentBranchingDescriptionElements. In certain implementations these elements may include the following: Description.

Description is a language dependent description of the process segment. This element may be based on GDT _MEDIUM_Description, Qualifier ReleasedSiteLogisticsProcessModelProcessSegmentBranching).

ProcessSegmentBranchingAttachmentFolder (DO)

BO ReleasedSiteLogisticsProcessModel/node ProcessSegmentBranchingAttachmentFolder represents a container of documents that describe the ProcessSegmentBranching.

ProcessSegmentBranchingTextCollection (DO)

BO ReleasedSiteLogisticsProcessModel/node ProcessSegmentBranchingTextCollection represents a natural-language representation of the characteristics of the ProcessSegmentBranching.

ProcessSegmentInternalMaterialFlow

BO ReleasedSiteLogisticsProcessModel/node ProcessSegmentInternalMaterialFlow represents a directional link between two components in the process segment, specifically between operations, between a branching and an operation, or between an operation and a branching join. Each link may be comprised of a source component and a target component.

The structure elements located directly at node ProcessSegmentInternalMaterialFlow are defined by data type ReleasedSiteLogisticsProcessModelProcessSegmentInternalMaterialFlowElements. In certain implementations these elements may include the following: UUID, SourceUUID, TargetUUID, SourceMaterialFlowElementTypeCode, TargetMaterialFlowElementTypeCode.

UUID is an identifier, which may be unique, of the ProcessSegmentInternalMaterialFlow for referencing purposes. This element may be based on GDT UUID.

SourceUUID is an identifier, which may be unique, of the process segment component that precedes another process segment component, as defined by the internal material flow. This element may be based on GDT UUID.

TargetUUID is an identifier, which may be unique, of the process segment component that succeeds another process segment component as defined by the internal material flow. This element may be based on GDT UUID.

SourceMaterialFlowElementTypeCode is a coded representation of the source process segment component type in the internal material flow (such as operation, branching or join). This element may be based on GDT MaterialFlowElementTypeCode.

TargetMaterialFlowElementTypeCode is a coded representation of the target process segment component type in the internal material flow, i.e. operation, branching or join. This element may be based on GDT MaterialFlowElementTypeCode.

In certain implementations of node ProcessSegmentInternalMaterialFlow, the following inbound association relationships may exist. SourceBranching may have a cardinality relationship of c:n, representing the branching in the process segment which precede another process segment component, as defined by the internal material flow. TargetBranching may have a cardinality relationship of c:1, representing the branching in the process segment which succeed another process segment component, as defined by the internal material flow. SourceBranchingJoin may have a cardinality relationship of c:c, representing the branching join in the process segment which precede another process segment component, as defined by the internal material flow. TargetBranchingJoin may have a cardinality relationship of c:n, representing the branching join in the process segment which succeed another process segment component, as defined by the internal material flow. SourceOperation may have a cardinality relationship of c:c, representing the operation in the process segment which precede another process segment component, as defined by the internal material flow. TargetOperation may be c:1, representing the operation in the process segment which succeed another process segment component, as defined by the internal material flow.

An InternalMaterialFlow may have exactly one reference to a source component and one reference to a target component as specified in the Inbound Association Relationships section. Two operations may be unconnected by a InternalMaterialFlow if they exist in different BranchingPaths.

In some implementations, the association TargetBranching may only exist with the association SourceOperation unless the Branching is the starting element. In some implementations, the association SourceBranching may only exist with the association TargetOperation. In some implementations, the association TargetJoin may only exist with the association SourceOperation. In some implementations, the association SourceJoin may only exist with the association TargetOperation.

ProcessSegmentOperation

BO ReleasedSiteLogisticsProcessModel/node ProcessSegmentOperation represents An action carried out on stock in the logistic site A ProcessSegmentOperation may exist within specialisations such as the following. Move: an operation involving the movement of a material or a logistic unit from one or more source locations to one or more destination locations. Pack: an operation involving the packing, unpacking and repacking of goods in the logistics site. Make: a production operation. Count: an operation for counting the logistic unit physical inventory (in a logistic unit count, the quantity of logistic units may be recorded). Count Approval: an operation for approving the result of a count operation An Operation of type move may change the logistic unit of the stock it handles. Operation of type pack may change the location of the stock it handles The structure elements located directly at node ProcessSegmentOperation are defined by data type ReleasedSiteLogisticsProcessModelProcessSegmentOperationElements. In certain implementations these elements may include the following: ID, UUID, ProcessSegmentBranchingPathUUID, TypeCode, CategoryCode, GoodsPlanningRelevanceIndicator, DeliveryCreationMethodCode, SourceAndDestinationDeterminationRequestMethodCode, SourceLocationLogisticsUsageCode, DestinationLocationLogisticsUsageCode.

ID is an identifier, which may be unique, of the ProcessSegmentOperation which may be unique in the context of the process segment that contains it. This element may be based on GDT OperationID.

UUID is an identifier, which may be unique, of the ProcessSegmentOperation for referencing purposes. This element may be based on GDT UUID.

ProcessSegmentBranchingPathUUID is an identifier, which may be unique, of the process segment path that contains the operation. This element may be based on GDT UUID. It may be optional.

TypeCode is a coded representation of the operation type, such as “putaway, receive”. This element may be based on GDT OperationTypeCode.

CategoryCode is a coded representation of an operation category such as “move”. This element may be based on GDT OperationCategoryCode.

GoodsPlanningRelevanceIndicator indicates whether the goods in the operation is relevant for planning or not. This element may be based on GDT Indicator, Qualifier PlanningRelevance. It may be optional.

DeliveryCreationMethodCode is a coded representation of the method used for creating a delivery document. This element may be based on GDT DeliveryCreationMethodCode. It may be optional.

SourceAndDestinationDeterminationRequestMethodCode is a coded representation of the method for requesting source and destination determination. This element may be based on GDT SourceAndDestinationDeterminationRequestMethodCode.

SourceLocationLogisticsUsageCode is a coded representation of the logistics usage of the source location of the operation. This element may be based on GDT LocationLogisticsUsageCode. It may be optional.

DestinationLocationLogisticsUsageCode is a coded representation of the logistics usage of the destination location of the operation. This element may be based on GDT LocationLogisticsUsageCode. It may be optional.

In certain implementations of node ProcessSegmentOperation, the following composition relationships to subordinate nodes may exist: ProcessSegmentOperationActivity 151030 may have a cardinality relationship of 1:1; ProcessSegmentOperationLogisticUnit 151040 may have a cardinality relationship of 1:cn; ProcessSegmentOperationDescription 151054 may have a cardinality relationship of 1:cn; ProcessSegmentOperationTextCollection 151060 (DO) may have a cardinality relationship of 1:c; and ProcessSegmentOperationAttachmentFolder 151058 (DO) may have a cardinality relationship of 1:c.

In certain implementations of node ProcessSegmentOperation, the following inbound association relationships may exist: ProcessSegmentBranchingPath may have a cardinality relationship of c:n, representing the branching path in the process segment where the operation takes place.

An operation of type move may consist of exactly one of the following activity types: single move, collective move or distribute move. An operation of type pack may consist of exactly one of the following activity types: single pack, unpack or mixed pack.

ProcessSegmentOperationActivity

BO ReleasedSiteLogisticsProcessModel/node ProcessSegmentOperationActivity represents a physical action to be carried out in order to fulfill the operation.

A ProcessSegmentOperationActivity may exist within specialisations such as the following. SingleMove: An activity involving the movement of materials or logistic units from one source location to one destination location. CollectiveMove: An activity involving the movement of materials or logistic units from several source locations to one destination location. DistributedMove: An activity involving the movement of materials or logistic units from one source location to several destination locations. SinglePack: An activity involving the packing of a quantity of one single material or logistic unit into a logistic unit. Pack: An activity involving the packing of one or more materials or logistic units into another logistic unit. Unpack: An activity involving the unpacking of one or more materials or logistic units from a logistic unit.

The structure elements located directly at node ProcessSegmentOperationActivity are defined by data type ReleasedSiteLogisticsProcessModelProcessSegmentOperationActivityElements. In certain implementations these elements may include the following: ID, UUID, TypeCode, CategoryCode.

ID is an identifier, which may be unique, of the ProcessSegmentOperationActivity, which may be unique in the context of the operation that contains it. This element may be based on GDT OperationActivityID.

UUID is an identifier, which may be unique, of the ProcessSegmentOperationActivity for referencing purposes. This element may be based on GDT UUID.

TypeCode is a coded representation of the type of the activity, such as single move, or single pack. This element may be based on GDT OperationActivityTypeCode.

CategoryCode is a coded representation of an activity category, such as single move, or single pack. This element may be based on GDT OperationCategoryCode.

In certain implementations of node ProcessSegmentOperationActivity, the following composition relationships to subordinate nodes may exist: ProcessSegmentOperationActivityDescription 151032 may have a cardinality relationship of 1:cn; ProcessSegmentOperationActivityTextCollection 151036 (DO) may have a cardinality relationship of 1:c; ProcessSegmentOperationActivityAttachmentFolder 151034 (DO) may have a cardinality relationship of 1:c.

ProcessSegmentOperationActivityDescription

BO ReleasedSiteLogisticsProcessModel/node ProcessSegmentOperationActivityDescription represents a language-dependent medium-length statement describing the ProcessSegmentOperationActivity.

The structure elements located directly at node ProcessSegmentOperationActivityDescription are defined by data type ReleasedSiteLogisticsProcessModelProcessSegmentOperationActivityDescriptionElements. In certain implementations these elements may include the following: Description.

Description is a language dependent description of the process segment. This element may be based on GDT _MEDIUM_Description, Qualifier ReleasedSiteLogisticsProcessModelProcessSegmentOperationActivity).

ProcessSegmentOperationActivityAttachmentFolder (DO)

BO ReleasedSiteLogisticsProcessModel/node ProcessSegmentOperationActivityAttachmentFolder represents a container of documents that describe the ProcessSegmentOperationActivity.

ProcessSegmentOperationActivityTextCollection (DO)

BO ReleasedSiteLogisticsProcessModel/node ProcessSegmentOperationActivityTextCollection represents a natural-language representation of the characteristics of the ProcessSegmentOperationActivity.

ProcessSegmentOperationLogisticUnit

BO ReleasedSiteLogisticsProcessModel/node ProcessSegmentOperationLogisticUnit represents the expected logistic unit that the operation can receive (input) or dispatch (output). Output logistic unit of a pack operation may define the logistic unit level the operation should reach.

A ProcessSegmentOperationLogisticUnit may exist within specialisations such as the following. ProcessSegmentOperationInputLogisticUnit 151042 is the logistic unit that the operation expects as input. ProcessSegmentOperationOutputLogisticUnit 151044 is the logistic unit that the operation expects to output.

The structure elements located directly at node ProcessSegmentOperationLogisticUnit are defined by data type ReleasedSiteLogisticsProcessModelProcessSegmentOperationLogisticUnitElements. In certain implementations these elements may include the following: UUID, RoleCode, PackingMethodCode, LogisticUnitUUID.

UUID is an identifier, which may be unique, of the ProcessSegmentLogisticUnit for referencing purposes. This element may be based on GDT UUID.

RoleCode is a coded representation of the role of the assignment of a logistic unit or a logistics unit group to the operation, such as input or output. This element may be based on GDT OperationLogisticUnitRoleCode.

PackingMethodCode is a coded representation of the manner in which a logistic unit should be used in packing operation. It may be based on GDT PackingMethodCode. It may be optional.

LogisticUnitUUID is an identifier, which may be unique, of the LogisticUnit, which may be assigned in order to specify the logistic unit that the operation expects as input/output. It may be based on GDT UUID. It may be optional.

In certain implementations of node ProcessSegmentOperationLogisticUnit, the following inbound aggregation relationships may exist: LogisticUnit may have a cardinality relationship of 1:cn, representing the logistic unit that the operation expects as input.

Each ProcessSegmentOperationLogisticUnit may reference a logistic unit either as input or output of the operation. A ProcessSegmentOperationLogisticUnit which belongs to a ProcessSegmentOperation of type pack may be assigned with a logistic unit as its output.

ProcessSegmentOperationDescription

BO ReleasedSiteLogisticsProcessModel/node ProcessSegmentOperationDescription represents a language-dependent medium-length statement describing the ProcessSegmentOperation.

The structure elements located directly at node ProcessSegmentOperationDescription are defined by data type ReleasedSiteLogisticsProcessModelProcessSegmentOperationDescriptionElements. In certain implementations these elements may include the following: Description.

Description is a language dependent description of the process segment. This element may be based on GDT _MEDIUM_Description, Qualifier ReleasedSiteLogisticsProcessModelProcessSegmentOperation).

ProcessSegmentOperationAttachmentFolder (DO)

BO ReleasedSiteLogisticsProcessModel/node ProcessSegmentOperationAttachmentFolder represents a container of documents that describe the ProcessSegmentOperation.

ProcessSegmentOperationTextCollection (DO)

BO ReleasedSiteLogisticsProcessModel/node ProcessSegmentOperationTextCollection represents a natural-language representation of the characteristics of the ProcessSegmentOperation.

ProcessSegmentDescription

BO ReleasedSiteLogisticsProcessModel/node ProcessSegmentDescription represents a language-dependent medium-length statement describing the ProcessSegment.

The structure elements located directly at node ProcessSegmentDescription are defined by data type ReleasedSiteLogisticsProcessModelProcessSegmentDescriptionElements. In certain implementations these elements may include the following: Description.

Description is a language dependent description of the process segment. This element may be based on GDT _MEDIUM_Description, Qualifier SiteLogisticsProcessSegment).

ProcessSegmentTextCollection (DO)

BO ReleasedSiteLogisticsProcessModel/node ProcessSegmentTextCollection represents a natural-language representation of the characteristics of the ProcessSegment.

ProcessSegmentAttachmentFolder (DO)

BO ReleasedSiteLogisticsProcessModel/node ProcessSegmentAttachmentFolder represents a container of documents that describe the ReleasedSiteLogisticsProcessModel.

Description

BO ReleasedSiteLogisticsProcessModel/node Description represents a language-dependent medium-length statement describing the ReleasedSiteLogisticsProcessModel.

The structure elements located directly at node Description are defined by data type SiteLogisticsDataStructureDescriptionElements. In certain implementations these elements may include the following: Description.

Description is a language dependent description of the SiteLogisticsDataStructure. This element may be based on GDT _MEDIUM_Description, Qualifier ReleasedSiteLogisticsProcessModel).

TextCollection (DO)

BO ReleasedSiteLogisticsProcessModel/node TextCollection represents a natural-language representation of the characteristics of the ReleasedSiteLogisticsProcessModel.

AttachmentFolder (DO)

BO ReleasedSiteLogisticsProcessModel/node AttachmentFolder represents a container of documents that describe the ReleasedSiteLogisticsProcessModel.

Business Object Resource_Template

FIGS. 152-1 through 152-8 illustrate an example Resource_Template business object model 152044. Specifically, this model depicts interactions among various hierarchical components of the Resource_Template, as well as external components that interact with the Resource_Template (shown here as 152000 through 152042).

BO Resource represents the means of production or person which have the capacity to contribute to the production or delivery of goods and services.

BO Resource_Template may include all nodes, associations, actions and queries of all of its derivations. It may be used to ensure the consistency, integrity, and reusability of derived business objects such as the following: EquipmentResource 152048; VehicleResource 152050; LabourResource 152052; ResourceGroup 152054; Transformed Object: Resource 152046.

Means of production are tangible products which contribute to production or delivery without becoming a part of the product. A resource has a capacity, which is the potential of a resource to provide services to consumers.

The business objects derived from BO template may be part of the process component ResourceDataProcessing, which resides in the foundation layer.

A Resource_Template may contain general data (such as identifiers and administration data), physical aspects (such as temperature and pressure), storage aspects (such as storage capacity), planning aspects (such as capacity, shift definitions, and working times) and services provided.

The BO Resource_Template may include all nodes, associations, queries and actions of the business objects derived from it, including objects such as EquipmentResource, LabourResource, VehicleResource, ResourceGroup and the Transformed Object Resource. The template itself may be used as the starting basis for making these derivations without being instantiated itself.

BO Resource_Template is represented by the root node "Resource."

BO Resource/Root Node 152044 represents the means of production or person which have the capacity to contribute to the production or delivery of goods and services. The type of service which is provided by the resource and the available capacity may be specified. There may also be scheduling information and organisational specifications.

The structure elements located directly at BO Resource/Root Node are defined by data type ResourceElements. In certain implementations these elements may include the following: UUID, ID, ResourceOperatingTimeTemplateID, ResourceOperatingTimeTemplateUUID, SystemAdministrativeData, CategoryCode, ResourceTimeZoneCode, WorkingDayCalendarCode, ResourceGroupUsageCode, Status, FinancialRelevanceIndicator, SupplyPlanningRelevanceIndicator, ProductionSchedulingRelevanceIndicator.

UUID is an identifier, which may be unique, for the Resource. This element may be based on GDT UUID.

ID is an identifier, which may be unique, for the Resource. This element may be based on GDT ResourceID.

ResourceOperatingTimeTemplateID is an identifier, which may be unique, for the Resource Operating Time Template This element may be based on GDT ResourceOperatingTimeTemplateID.

ResourceOperatingTimeTemplateUUID is an identifier, which may be unique, for the Resource Operating Time Template. This element may be based on GDT UUID.

SystemAdministrativeData specifies administrative data stored within the system. This data contains the system users and time of change. This element may be based on GDT SystemAdministrativeData.

CategoryCode is a coded representation of the category of the Resource. This element may be based on GDT ResourceCategoryCode.

ResourceTimeZoneCode is a coded representation of the time zone for the resource. This element may be based on GDT TimeZoneCode. It may be optional.

WorkingDayCalendarCode is a coded representation of a working day calendar for the resource. This element may be based on GDT WorkingDayCalendarCode. It may be optional.

ResourceGroupUsageCode is a coded representation of the usage for the resource group. This element may be based on GDT ResourceGroupUsageCode. It may be optional.

Status indicates the status of a Resource The data type IDT ResourceStatus may consist of the following status variable: LifeCycleStatusCode, which may be used to give the lifecycle status of a resource (this may be based on GDT: ResourceLifeCycleStatusCode).

FinancialRelevanceIndicator indicates that the resource is relevant for financials. This element may be based on GDT Indicator, Qualifier: Relevance.

SupplyPlanningRelevanceIndicator indicates that the resource is relevant for supply planning. This element may be based on GDT Indicator, Qualifier: Relevance.

ProductionSchedulingRelevanceIndicator indicates that the resource is relevant for production scheduling. This element may be based on GDT Indicator, Qualifier: Relevance.

In certain implementations of Root Node, the following inbound association relationships may exist. Location may have a cardinality relationship of c:cn. CreationIdentity may have a cardinality relationship of 1:cn, this indicates association to the Identity that has created the resource; this may originate from BO Identity/Root Node. LastChangeIdentity may have a cardinality relationship of c:cn, and indicates that Association to the Identity that has last changed the resource. AssignedLogisticsArea may have a cardinality relationship of c:c, this indicates Association to the LogisticsArea where the resource is located within the storage or production facility; this may originate from BO LogisticsArea/Root Node. AssignedResourceOperatingTimeTemplate may have a cardinality relationship of c:c, this indicates association to the ResourceOperatingTimeTemplate, where the resource operating time definition is copied from; this may originate from BO ResourceOperatingTimeTemplate/Root Node.

In certain implementations of Root Node, the following composition relationships to subordinate nodes may exist: Description 152090 may have a cardinality relationship of 1:cn; PositionAssignment 152060 may have a cardinality relationship of 1:cn; ResourceAssignment 152056 may have a cardinality relationship of 1:cn; CapacityAndSchedulingSpecification 152062 may have a cardinality relationship of 1:c; Overtime 152078 may have a cardinality relationship of 1:cn; Downtime 152080 may have a cardinality relationship of 1:cn; Provided Service 152082 may have a cardinality relationship of 1:cn; IndividualMaterialAssignment 152084 may have a cardinality relationship of 1:cn; CostCentreAssignment 152058 may have a cardinality relationship of 1:cn; ReportingPoint 152086 may have a cardinality relationship of 1:c; LogisticsExecutionResourceActivationInformation 152092 may have a cardinality relationship of 1:c; JobAssignment 152062 may have a cardinality relationship of 1:cn.

Navigation associations to BO Resource/Root Node may exist as follows. AssignedResourceGroup may have a cardinality relationship of c:cn. AssignedPlanningResourceGroup may have a cardinality relationship of c:c. AssignedFinancialResourceGroup may have a cardinality relationship of c:c. AssignedResources may have a cardinality relationship of c:cn.

In certain implementations of BO Resource/Root Node, navigation associations to node CostCentreAssignment may exist as follows. CurrentCostCentreAssignment may have a cardinality relationship of c:c, and specifies the current CostCentre assigned to a Resource. CurrentPositionAssignment may have a cardinality relationship of c:c, and specifies the current Position assigned to a Resource.

In certain implementations of Root Node, the following ESI actions (Enterprise Service Infrastructure) may be implemented: CreateWithReference, Block, Activate, Unblock, Delete, FlagAsObsolete, RevokeObsolescence.

CreateWithReference creates a new resource instance with reference to an existing resource. A new Resource instance may be created with same data as the referenced Resource and the Status set to “InPreparation”.

Block (S&AM action) blocks an active Resource. As a precondition, this may be called if the Resource is not flagged for deletion, it is active, and it is not blocked. The status of the resource may be changed to “Blocked”.

Activate (S&AM action) activates a Resource. As a precondition, the Resource may have the status “In Preparation”. When the action is executed, a consistency check may be carried out for the Resource, and the Resource may be activated if it is consistent.

Unblock (S&AM action) unblocks a Resource. As a precondition, the Resource may have the status “Blocked”. The resource may be set to “Active” status.

Delete (S&AM action) deletes a resource. As a precondition, the Resource may be in “In Preparation” state.

FlagAsObsolete (S&AM action) marks a resource as obsolete. As a precondition, the resource may be unused with regards to any processes. The status of the resource may be changed to “Obsolete”.

RevokeObsolescence (S&AM action) revokes the obsolescence for a resource and sets it as active. As a precondition, the Resource may have the status “Obsolete”. The status may be changed to “Active”.

In certain implementations of Root Node the following queries may be called: QueryByElements, QueryByProvidedService, QueryBySupplyPlanningResponsibleEmployeeAndLocation, QueryByEmployee.

QueryByElements contains a list of all relevant parameters which may be used to search for resources. It returns a list of all Resources which satisfy the selection criteria, specified by the query elements. If, in the following list of selection criteria, no further selection logic is explained, the system may simply check whether the value given in the selection criterion is equal to the value of the corresponding BO node element. The query elements are defined by data type ResourceElementsQueryElements. In certain implementations these elements may include the following: ID, which may be based on GDT ResourceID and may be optional; UUID, which may be based on GDT UUID and may be optional; ResourceGroupUsageCode, which may be based on GDT ResourceGroupUsageCode and may be optional; SystemAdministrativeData, which may be based on GDT SystemAdministrativeData and may be optional; CategoryCode, which may be based on GDT ResourceCategoryCode; Status, which may be based on IDT ResourceStatus; FinancialRelevanceIndicator, which may be based on GDT Indicator, Qualifier: Relevance, and may be optional; SupplyPlanningRelevanceIndicator, which may be based on GDT Indicator, Qualifier: Relevance and may be optional; DetailedSchedulingRelevanceIndicator, which may be based on GDT Indicator, Qualifier: Relevance and may be optional.

QueryByProvidedService returns all resources belonging to a given ResourceType which provide certain services defined by the ProvidedServiceServiceProductID. The query elements are defined by data type ResourceProvidedServiceQueryElements. In certain implementations these elements may include the following: ProvidedServiceServiceProductID, which may be based on GDT ProductID; ProvidedServiceServiceProductUUID, which may be based on GDT UUID and may be optional; CategoryCode, which may be based on GDT ResourceCategoryCode; Status, which may be based on GDT ResourceStatus.

QueryBySupplyPlanningResponsibleEmployeeAndLocation provides a list of all resources for which an employee is responsible for supply planning and which are located at a given Location. The query elements are defined by data type ResourceSupplyPlanningResponsibleEmployeeAndLocationQueryElements. In certain implementations these elements may include the following: SupplyPlanningResponsibleEmployee_ID, which is an identifier of an employee who is responsible for supply planning for resources, this element may be based on GDTEmployeeID; LocationID, which may be based on GDT LocationID and may be optional; Status, which may be based on IDT ResourceStatus; CategoryCode, which may be based on GDT ResourceCategoryCode; ID, which may be based on GDT ResourceID and may be optional; UUID, which may be based on GDT UUID and may be optional; ResourceDescription, which may be based on GDT _SHORT_Description and may be optional.

QueryByEmployee provides a list of LabourResources for a given EmployeeID. The EmployeeID may have assignments to Positions; if these assignments exist then the query may return all the Resources Assigned to a Position, via the PositionAssignment node, for a given validity period. In the case that Resources are not assigned to a position then the cost centre information for the Positions and the Resource may be used to determine the labour resources for a given employee for a given validity period. The assignment of position to employee, position to cost centre, resource to cost centre and resource to position may be validity dependent and the validity period in the query may be used to select the valid assignments. The query elements are defined by data type ResourceByEmployeeQueryElements. In certain implementations these elements may include the following: EmployeeID, which is an identifier of an employee which may be assigned to the resource, this element may be based on GDT EmployeeID and may be optional; Status, which may be based on IDT ResourceStatus; ValidityPeriod, which may be based on GDT CLOSED_DatePeriod and may be optional.

Description

BO Resource/node Description represents a natural-language text with additional information on a resource.

The structure elements located directly at node Description are defined by data type ResourceDescriptionElements. In certain implementations these elements may include the following: Description, which is a language dependent description of the Resource; it may be based on GDT: _SHORT_Description.

PositionAssignment

BO Resource/node PositionAssignment represents a time-dependent assignment of a position to the resource which specifies that the resource is being staffed from the position.

The structure elements located directly at node PositionAssignment are defined by data type ResourcePositionAssignmentElements. In certain implementations these elements may include the following: PositionID, PositionUUID, PositionAssignmentValidityPeriod.

PositionID is an identifier, which may be unique, of the position assigned. This element may be based on GDT PositionID.

PositionUUID is an identifier, which may be unique, of the position. This element may be based on GDT UUID.

PositionAssignmentValidityPeriod specifies the validity period for the position assignment. This element may be based on GDT CLOSED_DatePeriod.

In certain implementations of node PositionAssignment, the following inbound aggregation relationships from BO Position/Root Node may exist: Position may have a cardinality relationship of 1:cn, and indicates that the resource is staffed from employees holding the position.

ResourceAssignment

BO Resource/node ResourceAssignment represents an assignment of several resources to a resource group based on their logistics function.

The ResourceGroup itself is a resource that groups other individual resources. For example, a set of resources in an area can be grouped into a Resource Group 1. This group can be the responsible recipient of the execution tasks. In this case, the resource group is a resource with its own set of attribute values.

The structure elements located directly at node ResourceAssignment are defined by data type ResourceResourceAssignmentElements. In certain implementations these elements may include the following: ResourceID, ResourceUUID, ResourceCategoryCode.

ResourceID is an identifier, which may be unique, of the Resource which part of the resource group. This element may be based on GDT ResourceID.

ResourceUUID is an identifier, which may be unique, of the Resource which is the part of the resource group. This element may be based on GDT UUID. It may be optional.

ResourceCategoryCode is a coded representation of the type of the assigned Resource. This element may be based on GDT ResourceCategoryCode.

In certain implementations of BO Resource/node ResourceAssignment, the following inbound aggregation relationships from the projection transformed object Resource/Root Node may exist: Resource may have a cardinality relationship of c:cn.

Node ResourceAssignment may be relevant for the specialisation/projection ResourceGroup of Resource. Rather than to a ResourceGroup itself, the association may be to the transformed object Resource of type Equipment, Labour or Vehicle.

An individual equipment, labour or vehicle resource may be part of one or more ResourceGroups (if the ResourceGroup is not relevant for Supply Planning/Financials). An individual equipment, labour or vehicle resource may be part of exactly one ResourceGroup that is relevant for financials and/or supply planning.

CapacityAndSchedulingSpecification

BO Resource/node CapacityAndSchedulingSpecification represents a specification of the capacity offered by the resource and its scheduling details.

The structure elements location directly at node CapacityAndSchedulingSpecification are defined by data type ResourceCapacityAndSchedulingSpecificationElements. In certain implementations these element may include: UUID, CapacityCalendarUUID, SchedulingCalendarUUID, ResourceOperatingTimeDefiningObjectTypeCode, Operating, LogisticsShiftProgramID, LogisticsShiftProgramUUID, OperatingHoursUUID, CapacityMeasureUnitCode, ResourceUtilisationPercent, ResourceProductiveDuration, ResourceGroupAggregatedProductiveDuration, ResourceCapacityPlanningConstraintTypeCode, ResourceCapacityCalendarUnitCode, ResourceBucketUtilisationPercent, ResourceDetailedSchedulingRelevanceIndicator, EquipmentNumberValue, LabourNumberValue, VehicleNumberValue, PlanningFloatDuration, SafetyFloatDuration.

UUID is an identifier, which may be unique, of the node for referencing purposes. This element may be based on GDT UUID.

CapacityCalendarUUID is an identifier, which may be unique, of the Resource capacity calendar. This element may be based on GDT UUID.

SchedulingCalendarUUID is an identifier, which may be unique, of the Resource scheduling calendar. This element may be based on GDT UUID.

ResourceOperatingTimeDefiningObjectTypeCode is a coded representation of the business object type using which the operating time is defined.

Operating time is defined either using the business object LogisticsShiftProgram or using the dependent object Operating Hours. This element may be based on GDT ObjectTypeCode, Qualifier ResourceOperatingTimeDefining.

LogisticsShiftProgramID specifies the identifier of the shift program for the resource. This element may be based on GDT LogisticsShiftProgramID. It may be optional.

LogisticsShiftProgramUUID is an identifier, which may be unique, of the shift program for the resource. This element may be based on GDT UUID. It may be optional.

OperatingHoursUUID is an identifier, which may be unique, of the operating hours for the resource. This element may be based on GDT UUID. It may be optional.

CapacityMeasureUnitCode is a coded representation of the unit in which the capacity provided by the resource is measured. This element may be based on GDT MeasureUnitCode.

ResourceUtilisationPercent specifies the utilization percentage of the resource. This element may be based on GDT Percent, Qualifier ResourceUtilisation. It may be optional.

ResourceProductiveDuration specifies the productive duration of the resource. This element may be based on GDT Duration, Qualifier Productive.

ResourceGroupAggregatedProductiveDuration specifies the aggregated productive duration of a resource group. This element may be based on GDT Duration, Qualifier AggregatedProductive. It may be optional.

ResourceCapacityPlanningConstraintTypeCode specifies how resource capacities are constraining planning. This element may be based on GDT ResourceCapacityPlanningConstraintTypeCode. It may be optional.

ResourceCapacityCalendarUnitCode defines the size of time bucket for which the capacity of the resource is cumulated for planning purposes. This element may be based on GDT CalendarUnitCode, Qualifier ResourceCapacity. It may be optional.

ResourceBucketUtilisationPercent specifies the utilization percentage of the bucket. This element may be based on GDT Percent, Qualifier ResourceUtilisation. It may be optional.

ResourceDetailedSchedulingRelevanceIndicator specifies that the resource is a main or a primary resource. This element may be based on GDT Indicator, Qualifier Main.

EquipmentNumberValue specifies the number of equipment that constitutes the resource. This element may be based on GDT NumberValue. It may be optional.

LabourNumberValue specifies the amount of labour that constitutes the resource. This element may be based on GDT NumberValue. It may be optional.

VehicleNumberValue specifies the number of vehicles that constitutes the resource. This element may be based on GDT NumberValue. It may be optional.

PlanningFloatDuration specifies the planning time buffer for the resource. This element may be based on GDT Duration, Qualifier Float. It may be optional.

SafetyFloatDuration specifies a time buffer to prevent downtimes for the resource. This element may be based on GDT Duration, Qualifier Float. It may be optional.

In certain implementations of node CapacityAndSchedulingSpecification, the following inbound aggregation relationships from BO LogisticsShiftProgram/Root Node may exist: AssignedLogisticsShiftProgram may have a cardinality relationship of c:cn, and indicates the assignment of LogisticsShiftProgram to the Resource.

In certain implementations of node CapacityAndSchedulingSpecification, the following composition relationships to subordinate nodes may exist: CapacityAndSchedulingSpecification.OperatingHours 152066 may have a cardinality relationship of 1:c; CapacityAndSchedulingSpecificationCapacityVariancePerPeriod 152068 may have a cardinality relationship of 1:cn; CapacityAndSchedulingInformationCapacityCalendarItem 152072 may have a cardinality relationship of 1:cn; CapacityAndSchedulingSpecificationSchedulingCalendarItem 152074 may have a cardinality relationship of 1:cn.

For a given CapacityAndSchedulingSpecification it may be possible to specify either the LogisticsShiftProgramID or the OperatingHours separately.

The attribute EquipmentNumberValue may be available for the projection EquipmentResource. The attribute VehicleNumberValue may be available for the projection VehicleResource. The attribute LabourNumberValue may be available for the projection LabourResource.

In certain implementations of node CapacityAndSchedulingSpecification, navigation associations may exist as follows: CapacityAndSchedulingSpecificationCapacityCalendarPeriodItems may have a cardinality relationship of 1:cn (filtered); CapacityAndSchedulingSpecificationSchedulingCalendarPeriodItems may have a cardinality relationship of 1:cn (filtered).

Filter elements for the above relationships may be defined by data type ResourceCapacityAndSchedulingSpecificationCapacityCalendarPeriodItemsFilterElements. In certain implementations these elements may include the following: CapacityCalendarPeriod and/or SchedulingCalendarPeriod, which may be based on GDT CLOSED_DatePeriod.

In certain implementations of node CapacityAndSchedulingSpecification, the following ESI actions (Enterprise Service Infrastructure) may be implemented: GenerateCapacityAndSchedulingCalendarItems. This generates the CapacityAndSchedulingSpecificationCapacityCalendarItems and CapacityAndSchedulingSpecificationSchedulingCalendarItems for a specified time frame. The CapacityCalendarItems and SchedulingCalendarItems may be generated for the specified time frame.

Action elements for ESI action GenerateCapacityAndSchedulingCalendarItems are defined by type GDT ResourceCapacityAndSchedulingSpecificationGenerateCapacityAndSchedulingCalendarItemsActionElements. In certain implementations these elements may include the following. InPastDuration, which specifies the start of the time frame for the generation; this element may be based on GDT DAY_Duration, Qualifier InPast. InFutureDuration, which specifies the end of the time frame for the generation; this element may be based on GDT DAY_Duration, Qualifier InFuture.

CapacityAndSchedulingSpecificationOperatingHours 152066 (DO).

BO Resource/node CapacityAndSchedulingSpecificationOperatingHours specifies the working times of the resource based on a recurrence pattern.

The node structure of this node is provided by the DO OperatingHours

CapacityAndSchedulingSpecificationCapacityVariancePerPeriod

BO Resource/node CapacityAndSchedulingSpecificationCapacityVariancePerPeriod. CapacityAndSchedulingSpecificationCapacityVariancePerPeriod specifies the variances to the capacity offered by the resource per period.

The structure elements located directly at node CapacityAndSchedulingSpecificationCapacityVariancePerPeriod are defined by data type ResourceCapacityAndSchedulingSpecificationCapacityVarianceElements. In certain implementations these elements may include; UUID, CapacityVarianceValidityPeriod, ResourceUtilisationPercent, EquipmentNumberValue, VehicleNumberValue, LabourNumberValue, ResourceOperatingTimeDefiningObjectTypeCode, Operating, LogisticsShiftProgramID, LogisticsShiftProgramUUID, OperatingHoursUUID.

UUID is an identifier, which may be unique, of the node for referencing purposes. This element may be based on GDT UUID.

CapacityVarianceValidityPeriod is the period for which the capacity variance is valid. This element may be based on GDT CLOSED_DatePeriod.

ResourceUtilisationPercent specifies the utilization percentage of the resource. This element may be based on GDT Percent, Qualifier ResourceUtilisation.

EquipmentNumberValue specifies the number of equipment that constitute the resource. This element may be based on GDT NumberValue. It may be optional.

VehicleNumberValue specifies the number of vehicles that constitute the resource. This element may be based on. GDT NumberValue. It may be optional.

LabourNumberValue specifies the amount of labour that constitute the resource. This element may be based on GDT NumberValue. It may be optional.

ResourceOperatingTimeDefiningObjectTypeCode is a coded representation of the business object type using which the operating time is defined.

Operating time are defined either using the business object LogisticsShiftProgram or using the dependent object Operating Hours. This element may be based on GDT ObjectTypeCode, Qualifier ResourceOperatingTimeDefining.

LogisticsShiftProgramID specifies the identifier of a shift program for the resource. This element may be based on GDT LogisticsShiftProgramID. It may be optional.

LogisticsShiftProgramUUID is an identifier, which may be unique, of the shift program for the resource. This element may be based on GDT UUID. It may be optional.

OperatingHoursUUID is an identifier, which may be unique, of the operating hours for the resource. This element may be based on GDT UUID. It may be optional.

In certain implementations of node CapacityAndSchedulingSpecificationCapacityVariancePerPeriod, the following inbound aggregation relationships from BO LogisticsShiftProgram/Root Node may exist: AssignedLogisticsShiftProgram may have a cardinality relationship of c:cn, and indicates the assignment of LogisticsShiftProgram to the Resource.

In certain implementations of node CapacityAndSchedulingSpecificationCapacityVariancePerPeriod, the following composition relationships to subordinate nodes may exist: CapacityAndSchedulingSpecificationCapacityVariancePerPeriod.OperatingHours may have a cardinality relationship of 1:c.

For a given capacity variance per period it may be possible to specify either the LogisticsShiftProgramID or the OperatingHours individually.

The attribute EquipmentNumberValue may be available for the projection EquipmentResource. The attribute VehicleNumberValue may be available for the projection VehicleResource. The attribute LabourNumberValue may be available for the projection LabourResource.

CapacityAndSchedulingSpecificationCapacityVariancePerPeriodOperatingHours 152076 (DO).

BO Resource/node CapacityAndSchedulingSpecificationCapacityVariancePerPeriodOperatingHours specifies the working times of the resource based on a recurrence pattern.

The structure of this node is provided by the DO OperatingHours

CapacityAndSchedulingSpecificationCapacityCalendarItem

BO Resource/node CapacityAndSchedulingSpecificationCapacityCalendarItem. A capacity calendar item specifies a time period given by two time points, which describes the available capacity for the resource.

The capacity calendar item may be used for supply planning purposes. The data may be adjusted for a resource without adjusting the shift definitions.

The structure elements located directly at node CapacityAndSchedulingSpecificationCapacityCalendarItem are defined by data type ResourceCapacityAndSchedulingSpecificationCapacityCalendarItem Elements. In certain implementations these elements may include the following: CapacityCalendarItemPeriod, ResourceProductiveDuration, ResourceGroupAggregatedProductiveDuration.

CapacityCalendarItemPeriod specifies the start and end date time for the capacity calendar item. This element may be based on GDT TIMEZONEINDEPENDENT_DateTimePeriod.

ResourceProductiveDuration specifies the productive duration of the resource. This element may be based on GDT Duration, Qualifier Productive.

ResourceGroupAggregatedProductiveDuration specifies the aggregated productive duration of a resource group. This element may be based on GDT Duration, Qualifier Productive. It may be optional.

The attribute AggregatedProductiveDuration may be available for the projection ResourceGroup.

In certain implementations of node CapacityAndSchedulingSpecificationCapacityCalendarItem, the following inbound association relationships from node CapacityAndSchedulingSpecificationCapacityCalendarItem may exist: SchedulingDetailsCapacityAndSchedulingSpecificationCapacityCalendarItem may have a cardinality relationship of 1:cn, which consists of the scheduling time slice details broken down per Capacity Calendar Item.

CapacityAndSchedulingSpecificationSchedulingCalendarItem

BO Resource/node CapacityAndSchedulingSpecificationSchedulingCalendarItem specifies a time period given by two time points, which describes either an active or inactive period for the resource.

Active period indicates a period during which the resource is available for scheduling. Inactive period indicates a period during which the resources is not available for scheduling. Inactive period could be due to downtime or shift definitions.

The data may be adjusted for a resource without adjusting the shift definitions.

The structure elements located directly at node CapacityAndSchedulingSpecificationSchedulingCalendarItem are defined by data type ResourceCapacityAndSchedulingSpecificationSchedulingCalendarItem Elements. In certain implementations these elements may include the following: LogisticsShiftProgramID, SchedulingCalendarItemPeriod, ResourceProductiveDuration, ResourceCalendarItemOriginTypeCode.

LogisticsShiftProgramID is an identifier for a logistics shift. This element may be based on GDT LogisticsShiftProgramID. It may be optional.

SchedulingCalendarItemPeriod specifies the start time for the scheduling calendar item. This element may be based on GDT TIMEZONEINDEPENDENT_DateTimePeriod.

ResourceProductiveDuration specifies the productive duration for the resource. This element may be based on GDT Duration, Qualifier Productive.

ResourceCalendarItemOriginTypeCode specifies the type of origin of the calendar item for the resource. This element may be based on GDT ResourceCalendarItemOriginTypeCode.

In certain implementations of node, the following ESI actions (Enterprise Service Infrastructure) may be implemented: CreateDowntimes, CreateOvertimes.

ESI action CreateDowntimes enables the creation of multiple downtimes for a given resource. Downtimes may be created for the specified duration. CapacityAndSchedulingSpecificationCapacityCalendarItems and the CapacityAndSchedulingSpecificationSchedulingCalendarItems may be regenerated to reflect these downtimes. Action elements for ESI action CreateDowntimes are defined by type GDT ResourceCapacityAndSchedulingSpecificationSchedulingCalendarItemCreateDowntimesActionElements. In certain implementations these may include: PlannedIndicator, ResourceDowntimeReasonCode, ResourceDowntimePeriod.

PlannedIndicator indicates that the downtimes are planned downtimes. This element may be based on GDT Indicator, Qualifier Planned.

ResourceDowntimeReasonCode specifies the reason for the resource downtime. This element may be based on GDT ResourceDowntimeReasonCode.

ResourceDowntimePeriod specifies the start and end date times for the for the resource downtime. The start date/time could be an expected or an actual date/time; the end date/time could be an expected or an actual date/time. This element may be based on GDT DateTimePeriod.

ESI action CreateOvertimes enables the creation of multiple overtimes for a given resource. Overtimes may be created for the specified duration. CapacityAndSchedulingSpecificationCapacityCalendarItems and the CapacityAndSchedulingSpecificationSchedulingCalendarItems may be regenerated to reflect the overtimes action elements for ESI action CreateOvertimes are defined by type GDT ResourceCapacityAndSchedulingSpecificationSchedulingCalendarItemCreateOvertimesActionElements. In certain implementations these may include: ResourceOvertimeReasonCode, ResourceOvertimePeriod.

ResourceOvertimeReasonCode specifies the reason for the resource downtime. This element may be based on GDT ResourceOvertimeReasonCode.

ResourceOvertimePeriod specifies the start and end date times for the for the resource overtime. The start date/time could be an expected or an actual date/time; the end date/time could be an expected or an actual date/time. This element may be based on GDT DateTimePeriod.

Overtime

BO Resource/node Overtime specifies the overtime of the resource. Overtimes are additional working times for the resource.

The structure elements located directly at node Overtime are defined by data type ResourceOvertimeElements. In certain implementations these elements may include the following: OvertimeReasonCode, ResourceOvertimePeriod.

OvertimeReasonCode specifies the reason for the resource overtime. This element may be based on GDT ResourceOvertimeReasonCode.

ResourceOvertimePeriod specifies the start and end date times for the for the resource overtime. This element may be based on GDT DateTimePeriod.

ResourceCalendarItemOriginTypeCode is a coded description of origin of the calendar item (in this case overtime) for the resource. This element may be based on GDT ResourceCalendarItemOriginTypeCode.

In certain implementations of node Overtime, navigation associations may exist as follows: OvertimePeriod may have a cardinality relationship of 1:cn (filtered).

Filter elements for the above relationships may be defined by data type ResourceOvertimePeriodFilterElements. In certain implementations these elements may include the following: OvertimePeriod, which may be based on GDT CLOSED_DatePeriod.

Downtime

BO Resource/node Downtime represents the planned and unplanned downtime of the resource. Downtimes are non-working times for the resource.

The structure elements located directly at node Downtime are defined by data type ResourceDowntimeElements. In certain implementations these elements may include the following: PlannedIndicator, DowntimeReasonCode, ResourceDowntimePeriod, ResourceCalendarItemOriginTypeCode.

PlannedIndicator indicates that the downtime is a planned downtime. This element may be based on GDT Indicator, Qualifier Planned.

DowntimeReasonCode specifies the reason for the resource downtime. This element may be based on GDT ResourceDowntimeReasonCode.

ResourceDowntimePeriod specifies the start and end date times for the for the resource downtime. The start date/time could be an expected or an actual date/time. The end date/time could be an expected or an actual date/time. This element may be based on GDT DateTimePeriod.

ResourceCalendarItemOriginTypeCode is a coded description of origin of the calendar item (in this case downtime) for the resource. This element may be based on GDT ResourceCalendarItemOriginTypeCode.

In certain implementations of node Downtime, navigation associations may exist as follows: DowntimePeriod may have a cardinality relationship of 1:cn (filtered).

Filter elements for the above relationships may be defined by data type ResourceDowntimePeriodFilterElements. In certain implementations these elements may include the following: DowntimePeriod, which may be based on GDT CLOSED_DatePeriod.

ProvidedService

BO Resource/node ProvidedService. The provided service may be described by a service product.

A service product is an intangible product that describes the provision of a service. As an example, Oven__001 can provide heating, baking, and cooking services.

The structure elements located directly at node ProvidedService are defined by data type GDT ResourceProvidedServiceElements. In certain implementations these elements may include the following: ServiceProductID, ServiceProductUUID.

ServiceProductID is an identifier, which may be unique, of a service product. This element may be based on GDT ProductID.

ServiceProductUUID is an identifier, which may be unique, of the service product. This element may be based on GDT UUID. It may be optional.

In certain implementations of node ProvidedService, the following inbound aggregation relationships from BO ServiceProduct/Root Node may exist: ServiceProduct may have a cardinality relationship of 1:cn, which specifies the service that is provided by the resource.

IndividualMaterialAssignment

BO Resource/node IndividualMaterialAssignment represents the assignment of one or more individual materials to a resource. In some implementations, an individual material is a material that only occurs once in the real world and therefore describes a uniquely-identifiable material. For example, Resource__001 could be linked to IndividualMaterial Equipment 001.

The structure elements located directly at node IndividualMaterialAssignment are defined by data type GDT ResourceIndividualMaterialAssignmentElements. In certain implementations these elements may include the following: IndividualMaterialID, IndividualMaterialUUID.

IndividualMaterialID is an identifier, which may be unique, of an individual material. This element may be based on GDT ProductID.

IndividualMaterialUUID is an identifier, which may be unique, of an individual material. This element may be based on GDT UUID.

In certain implementations of node IndividualMaterialAssignment, the following inbound aggregation relationships from BO IndividualMaterial/Root Node may exist: IndividualMaterial may have a cardinality relationship of 1:c, which specifies the individual material that is associated to a resource.

Node IndividualMaterialAssignment may be relevant for the specialisations/projections EquipmentResource and VehicleResource of resource. An individual material may be associated to exactly one resource instance.

CostCentreAssignment

BO Resource/node CostCentreAssignment represents an assignment of a cost centre to the resource for a specified validity period.

The structure elements located directly at node CostCentreAssignment are defined by data type ResourceCostCentreAssignmentElements. In certain implementations these elements may include the following: ValidityPeriod, CostCentreID, CostCentreUUID, AssignedFinancialResourceGroupUUID, AssignedFinancialResourceGroupID.

ValidityPeriod is the period in which the CostCentre assignment is valid. This element may be based on GDT CLOSED_DatePeriod.

CostCentreID is an identifier, which may be unique, of an cost centre. This element may be based on GDT OrganisationalCentreID. It may be optional.

CostCentreUUID is an identifier, which may be unique, for an cost centre. This element may be based on GDT UUID. It may be optional.

AssignedFinancialResourceGroupUUID is an identifier, which may be unique, of a resource group to which the Resource may be assigned to financial purposes. This element may be based on GDT UUID. It may be optional.

AssignedFinancialResourceGroupID is an identifier, which may be unique, of a resource group to which the Resource may be assigned to financial purposes. This element may be based on GDT ResourceID. It may be optional.

In certain implementations of node CostCentreAssignment, the following inbound aggregation relationships may exist. CostCentre may have a cardinality relationship of 1:cn, which specifies the cost centre responsible for managing and reporting the costs for a resource. AssignedFinancialResourceGroup may have a cardinality relationship of c:cn, and indicates the association to the resource group to which the resource may be assigned for financial purposes.

There may be exactly one assignment to a cost centre for a given ValidityPeriod. CostCentreUUID or CostCentreID may be entered.

ReportingPoint

BO Resource/node ReportingPoint defines a point at which the progress of logistics process is recorded. ReportingPoint specifies how reporting should be done for the resource.

The structure elements located directly at node ReportingPoint are defined by data type ResourceReportingPointElements. In certain implementations these elements may include the following: ReportingPointBeforeUsageRelevanceIndicator, ReportingPointAfterUsageRelevanceIndicator.

ReportingPointBeforeUsageRelevanceIndicator indicates that a reporting point is relevant before the usage of the resource during logistics execution. This element may be based on GDT Indicator, Qualifier Relevance.

ReportingPointAfterUsageRelevanceIndicator indicates that a reporting point is relevant after the usage of the resource during logistics execution. This element may be based on GDT Indicator, Qualifier Relevance.

LogisticsExecutionResourceActivationInformation

BO Resource/node LogisticsExecutionResourceActivationInformation represents the information about the activation of the resource from a logistics execution perspective.

A resource can consist of one or more equipment/labour or vehicles. LogisticsExecutionResourceActivationInformation provides information about whether all the constituents of the resource is active or not within the production or the storage facility.

The structure elements located directly at node LogisticsExecutionResourceActivationInformation are defined by data type ResourceLogisticsExecutionResourceActivationInformationElements. In certain implementations these elements may include the following: UUID, SystemAdministrativeData, ResourceActivationReasonCode, ResourceDeactivationReasonCode, ActiveEquipmentNumberValue, InactiveEquipmentNumberValue, ActiveVehiclesNumberValue, InactiveVehiclesNumberValue, ActiveLabourNumberValue, InactiveLabourNumberValue, Status.

UUID is an identifier, which may be unique, for referencing purposes. This element may be based on GDT UUID. It may be optional.

SystemAdministrativeData specifies administrative data stored within the system. This data contains the system users and time of change. This element may be based on GDT SystemAdministrativeData.

ResourceActivationReasonCode is the reason code for the activation. This element may be based on GDT ResourceActivationReasonCode. It may be optional.

ResourceDeactivationReasonCode is the reason code for the deactivation. This element may be based on GDT ResourceDeactivationReasonCode. It may be optional.

ActiveEquipmentNumberValue specifies the number of equipment that are part of the resource that are currently active. This element may be based on GDT NumberValue, Qualifier Equipment. It may be optional.

InactiveEquipmentNumberValue specifies the number of equipment that are part of the resource that are currently inactive. This element may be based on GDT NumberValue, Qualifier Equipment. It may be optional.

ActiveVehiclesNumberValue specifies the number of vehicles that are part of the resource that are currently active. This element may be based on GDT NumberValue, Qualifier Vehicle. It may be optional.

InactiveVehiclesNumberValue specifies the number of vehicles that are part of the resource that are currently inactive. This element may be based on GDT NumberValue, Qualifier Vehicle. It may be optional.

ActiveLabourNumberValue specifies the amount of labour that is part of the resources that are currently active. This element may be based on GDT NumberValue, Qualifier Labour. It may be optional.

InactiveLabourNumberValue specifies the amount of labour that is part of the resources that are currently inactive. This element may be based on GDT NumberValue, Qualifier Labour. It may be optional.

Status indicates the activation status of the equipment/labour or vehicles that constitutes the resource. IDT ResourceLogisticsExecutionResourceActivationInformationStatus consists of the following status variable: AggregatedActivationStatusCode, which is used to give the activation status of a resource, this variable may be based on GDT ResourceAggregatedActivationStatusCode.

In certain implementations of node LogisticsExecutionResourceActivationInformation, the following composition relationships to subordinate nodes may exist: LogisticsExecutionResourceActivationInformationActivationHistory 152088 may have a cardinality relationship of 1:cn.

The attributes ActiveEquipmentNumberValue and InactiveEquipmentNumberValue may be available for the projection EquipmentResource The attributes ActiveVehiclesNumberValue and InactiveVehiclesNumberValue may be available for the projection VehicleResource. The attributes ActiveLabourNumberValue and InactiveLabourNumberValue may be available for the projection LabourResource.

In certain implementations of node LogisticsExecutionResourceActivationInformation, navigation associations may exist as follows: ResourceActivationCreationIdentity may have a cardinality relationship of 1:cn, and indicates an association to the Identity business object by whom the resource activation was done. ResourceActivationChangedIdentity may have a cardinality, relationship of c:cn, and indicates an association to the Identity business object by whom the resource activation was last changed.

In certain implementations of node LogisticsExecutionResourceActivationInformation, the following ESI actions (Enterprise Service Infrastructure) may be implemented:

Activate (S & AM Action), which enables the activation of equipment/labour or vehicles that are part of the resource. For the projection EquipmentResource, ActiveEquipmentNumberValue and InactiveEquipmentNumberValue may be updated based on the values in the action parameters. For the projection LabourResource, ActiveLabourNumberValue and InactiveLabourNumberValue may be updated based on the values in the action parameters. For the projection VehicleResource, ActiveVehiclesNumberValue and InactiveVehiclesNumberValue may be updated based on the values in the action parameters. AggregatedActivationStatus may be set to "Active" or "Partially Active".

Action elements are defined by type GDT: ResourceLogisticsExecutionInformationActivateActionElements. In certain implementations these may include: ResourceActivationReasonCode is the reason code for the activation. It may be based on GDT ResourceActivationReasonCode; EquipmentNumberValue represents the number of equipment that need to be activated; this element may be based on GDT NumberValue, Qualifier Equipment. VehicleNumberValue represents the number of vehicles that need to be activated. This element may be based on GDT NumberValue, Qualifier Vehicle; LabourNumberValue represents the amount of labour that need to be activated. This element may be based on GDT NumberValue, Qualifier Labour.

Deactivate (S & AM Action) enables the deactivation of equipment/labour or vehicles that are part of the resource. For the projection EquipmentResource, ActiveEquipmentNumberValue and InactiveEquipmentNumberValue may be updated based on the values in the action parameters. For the projection LabourResource, ActiveLabourNumberValue and InactiveLabourNumberValue may be updated based on the values in the action parameters. For the projection VehicleResource, ActiveVehiclesNumberValue and InactiveVehiclesNumberValue may be updated based on the values in the action parameters. AggregatedActivationStatus may be set to "Inactive" or "Partially Active".

The action elements are defined by type GDT: ResourceLogisticsExecutionInformationDeactivateActionElements. In certain implementations these may include: ResourceDeactivationReasonCode is the reason code for the deactivation; this element may be based on GDT: ResourceDeactivationReasonCode [not yet approved]. EquipmentNumberValue represents the number of equipment that need to be activated; this element may be based on GDT NumberValue, Qualifier Equipment. VehicleNumberValue represents the number of vehicles that need to be activated; this element may be based on GDT NumberValue, Qualifier Vehicle. LabourNumberValue represents the amount of labour that need to be activated; this element may be based on GDT NumberValue, Qualifier Labour.

With regards to ESI action Deactivate, integrity relationships such as the following may outline the use of action parameters for resource projections (pattern followed is Activate:Action Parameter:Resource). Activate:EquipmentNumberValue:EquipmentResource. Activate:VehicleNumberValue:VehicleResource. Activate:LabourNumberValue: LabourResource. Deactiveate:EquipmentNumberValue: EquipmentResource. Deactivate:VehicleNumberValue: VehicleResource. Deactivate:LabourNumberValue: LabourResource.

LogisticsExecutionResourceActivationInformationActivationHistory

BO Resource/node LogisticsExecutionResourceActivationInformationActivationHistory specifies the history of the resource activation.

The structure elements located directly at node LogisticsExecutionResourceActivationInformationResource are defined by data type ResourceLogisticsExecutionResourceActivationInformationElements. In certain implementations these elements may include the following: UUID, SystemAdministrativeData, ResourceActivationReasonCode, ResourceDeactivationReasonCode, ActiveEquipmentNumberValue, InactiveEquipmentNumberValue, ActiveVehiclesNumberValue, InactiveVehiclesNumberValue, ActiveLabourNumberValue, InactiveLabourNumberValue.

UUID is an identifier, which may be unique, for referencing purposes. This element may be based on GDT UUID.

SystemAdministrativeData is administrative data stored within the system. This data contains the system users and time of change. This element may be based on GDT SystemAdministrativeData. It may be optional.

ResourceActivationReasonCode is Reason code for the activation. This element may be based on GDT ResourceActivationReasonCode. It may be optional.

ResourceDeactivationReasonCode is Reason code for the deactivation. This element may be based on GDT ResourceDeactivationReasonCode. It may be optional.

ActiveEquipmentNumberValue specifies the number of equipment that are part of the resource that were active. This element may be based on GDT NumberValue, Qualifier Equipment. It may be optional.

InactiveEquipmentNumberValue specifies the number of equipment that are part of the resource that were inactive. This element may be based on GDT NumberValue, Qualifier Equipment. It may be optional.

ActiveVehiclesNumberValue specifies the number of vehicles that are part of the resource that were active. This element may be based on GDT NumberValue, Qualifier Vehicle. It may be optional.

InactiveVehiclesNumberValue specifies the number of vehicles that are part of the resource that were inactive. This element may be based on GDT NumberValue, Qualifier Vehicle. It may be optional.

ActiveLabourNumberValue specifies the amount of labour that is part of the resource that were active. This element may be based on GDT NumberValue, Qualifier Labour. It may be optional.

InactiveLabourNumberValue specifies the amount of labour that is part of the resource that were inactive. This element may be based on GDT NumberValue, Qualifier Labour. It may be optional.

The attributes ActiveEquipmentNumberValue and InactiveEquipmentNumberValue may be available for the projection EquipmentResource The attributes ActiveVehiclesNumberValue and InactiveVehiclesNumberValue may be available for the projection VehicleResource. The attributes ActiveLabourNumberValue and InactiveLabourNumberValue may be available for the projection LabourResource.

In certain implementations of node LogisticsExecutionResourceActivationInformationActivationHistory, navigation associations may exist as follows: ResourceActivationInformationHistoryCreationIdentity may have a cardinality relationship of c:cn, and indicates that Association to the Identity business object by whom the resource activation was done. ResourceActivationInformationHistoryChangedIdentity may have a cardinality relationship of c:cn, and indicates that Association to the Identity business object by whom the resource activation was last changed.

JobAssignment (Transformation Node)

BO Resource/node JobAssignment specifies the assignment of jobs to a labour resource. The node JobAssignment may be used from a solution perspective to determine the position using the jobs that are assigned to the resource.

The structure elements located directly at node JobAssignment are defined by data type ResourceJobAssignmentElements. In certain implementations these elements may include the following: JobID, JobUUID, ValidityPeriod. JobID is an identifier, which may be unique, of the job that may be assigned to the resource. This element may be based on GDT JobID. JobUUID is an identifier, which may be unique, of the job that may be assigned to the resource. This element may be based on GDTUUID. ValidityPeriod is the period in which the Job assignment is valid. This element may be based on GDT CLOSED_DatePeriod. this attribute corresponds to the validity period of the position assignment.

In certain implementations of node JobAssignment, the following inbound aggregation relationships from BO Job may exist: Job may have a cardinality relationship of c:cn, and indicates the job(s) that are assigned to the resource.

Node JobAssignment may be relevant for projection Labour Resource.

Derived Business Objects

The following derivations of BO template Resource_Template may be implemented as business objects: EquipmentResource, LabourResource, VehicleResource, ResourceGroup, Resource.

The following nodes may be relevant for the EquipmentResource derivation: CapacityAndSchedulingSpecification; CapacityAndSchedulingSpecificationCapacityCalendarItem; CapacityAndSchedulingSpecificationCapacityVariancePerPeriod; CapacityAndSchedulingSpecificationSchedulingCalendarItem; CostCentreAssignment; Description; Downtime; IndividualMaterialAssignment; LogisticsExecutionResourceActivationInformation; LogisticsExecutionResourceActivationInformationActivationHistory; Overtime; ReportingPoint; Resource (Root Node); ServiceProvided. The following queries may be called for the EquipmentResource derivation: QueryByElements; QueryByProvidedService; QueryBySupplyPlanningEmployeeAndLocation.

The following nodes may be relevant for derivation LabourResource: CapacityAndSchedulingSpecification; CapacityAndSchedulingSpecificationCapacityCalendarItem; CapacityAndSchedulingSpecificationCapacityVariancePerPeriod; CapacityAndSchedulingSpecificationSchedulingCalendarItem; CostCentreAssignment; Description; Downtime; LogisticsExecutionResourceActivationInformation; LogisticsExecutionResourceActivationInformationActivationHistory; Overtime; ReportingPoint; Resource (Root Node); ServiceProvided. The following queries may be called for the LabourResource derivation: QueryByElements; QueryByProvidedService; QueryBySupplyPlanningEmployeeAndLocation; QueryByEmployee.

The following nodes may be relevant for derivation VehicleResource: CapacityAndSchedulingSpecification; CapacityAndSchedulingSpecificationCapacityCalendarItem;

CapacityAndSchedulingSpecificationCapacityVariancePerPeriod; CapacityAndSchedulingSpecificationSchedulingCalendarItem; CostCentreAssignment; Description; Downtime; IndividualMaterialAssignment; LogisticsExecutionResourceActivationInformation; LogisticsExecutionResourceActivationInformationActivationHistory; Overtime; ReportingPoint; Resource (Root Node); ServiceProvided. The following queries may be called for the VehicleResource derivation: QueryByElements; QueryByProvidedService; QueryBySupplyPlanningEmployeeAndLocation.

The following nodes may be relevant for derivation ResourceGroup: CapacityAndSchedulingSpecification; CapacityAndSchedulingSpecificationCapacityCalendarItem; CapacityAndSchedulingSpecificationCapacityVariancePerPeriod; CapacityAndSchedulingSpecificationSchedulingCalendarItem; CostCentreAssignment; Description; Resource (Root Node); ResourceAssignment. The following queries may be called for the ResourceGroup derivation: QueryByElements; QueryByProvidedService.

The following nodes may be relevant for derivation Resource (Transformed Object): CapacityAndSchedulingSpecification; CapacityAndSchedulingSpecificationCapacityCalendarItem; CapacityAndSchedulingSpecificationCapacityVariancePerPeriod; CapacityAndSchedulingSpecificationSchedulingCalendarItem; CostCentreAssignment; Description; Resource (Root Node); ServiceProvided. The following queries may be called for the Resource (Transformed Object) derivation: QueryByElements; QueryByProvidedService; QueryBySupplyPlanningEmployeeAndLocation.

Business Object EquipmentResource

BO EquipmentResource represents a permanently installed operating facility or a group of identical operating facilities that has the capacity to provide services. BO EquipmentResource belongs to the process component Resource Data Processing in the Foundation Layer.

Business Object VehicleResource

BO VehicleResource represents a means of transportation or a group of identical means of transportation that has the capacity to provide transportation services. BO VehicleResource belongs to the process component Resource Data Processing in the Foundation Layer.

Business Object LabourResource

BO LabourResource represents a worker or a group of workers with the same skills and qualifications with the capacity to operate specific devices or to perform specific tasks. BO LabourResource belongs to the process component Resource Data Processing in the Foundation Layer.

Transformed Object Resource

BO Transformed Object Resource represents an asset that contributes to the sourcing, production, or delivery of a product. A resource may represent an equipment resource, a labour resource, a vehicle resource, or a grouping of these.

Resource may be used by other business objects for the association and query purposes such as allowing other business objects to be associated with several specialisations of a resource simultaneously. In addition, business objects that receive resource information do not necessarily need specific information about the specialisations; they generally only need generic resource information.

BO Transformed Object Resource belongs to the process component Resource Data Processing in the Foundation Layer.

Business Object ResourceGroup

BO Resource/node represents a grouping of individual resources that provide similar services or have similar physical and functional characteristics. BO ResourceGroup belongs to the process component Resource Data Processing in the Foundation Layer.

Business Object ResourceOperatingTimeTemplate

FIG. 153 illustrates an example ResourceOperatingTimeTemplate business object model 153008. Specifically, this model depicts interactions among various hierarchical components of the ResourceOperatingTimeTemplate, as well as external components that interact with the ResourceOperatingTimeTemplate (shown here as 153000 through 153018).

BO ResourceOperatingTimeTemplate is a template of a resource operating time definition that contains all information required to maintain the operating times for multiple resources.

A resource operating time definition may contain information such as the following: Factory calendar; standard operating times; time-dependent deviations to standard operating times; definition of single downtime or uptime events.

The business object ResourceOperatingTimeTemplate belongs to the process component Resource Data Processing in the Foundation Layer.

A ResourceOperatingTimeTemplate may contain general data such as identifiers and administration data. It may also contain the operating time information (maintained using the business object LogisticsShiftProgram, or using dependent object OperatingHours), downtime, overtime information etc.

ResourceOperatingTimeTemplate is represented by the root node "ResourceOperatingTimeTemplate."

Business Object ResourceOperatingTimeTemplate Node Structure

Root Node

BO ResourceOperatingTimeTemplate 153020/Root Node represents a template of a resource operating time definition that contains all information required to maintain the operating times for multiple resources.

The structure elements located directly at Root Node are defined by data type ResourceOperatingTimeTemplateElements. In certain implementations these elements may include the following: ID, UUID, SystemAdministrativeData, TimeZoneCode, WorkingDayCalendarCode, Status.

ID is an identifier, which may be unique, of the a ResourceOperatingTimeTemplate. This element may be based on GDT ResourceOperatingTimeTemplateID.

UUID is an identifier, which may be unique, of a ResourceOperatingTimeTemplate. This element may be based on GDT UUID.

SystemAdministrativeData is administrative data stored within the system. This data contains the system users and time of change. This element may be based on GDT SystemAdministrativeData. It may be optional.

TimeZoneCode is a coded representation of the time zone for the ResourceOperatingTimeTemplate. This element may be based on GDT TimeZoneCode.

WorkingDayCalendarCode is a coded representation of a working day calendar for the ResourceOperatingTimeTemplate. This element may be based on GDT WorkingDayCalendarCode.

Status indicates the status of a Resource. IDT ResourceOperatingTimeTemplateStatus consists of the following status variable: ResourceOperatingTimeTemplateLifecycleStatusCode, which is used to give the lifecycle status of a ResourceOperatingTimeTemplate; it may be based on GDT ResourceOperatingTimeTemplateLifeCycleStatusCode.

In certain implementations of Root Node, the following inbound association relationships from BO Identity/Root Node may exist: CreationIdentity may have a cardinality relationship of 1:cn, and indicates an association to the Identity that has created the ResourceOperatingTimeTemplate; LastChangeIdentity may have a cardinality relationship of c:cn, and indicates that Association the Identity that has last changed the ResourceOperatingTimeTemplate.

In certain implementations of Root Node, the following composition relationships to subordinate nodes may exist: Description 153022 may have a cardinality relationship of 1:cn; LocationAssignment 153024 may have a cardinality relationship of 1:cn; Overtime 153028 may have a cardinality relationship of 1:cn; Downtime 153030 may have a cardinality relationship of 1:cn; OperatingTimeSpecification 153026 may have a cardinality relationship of 1:c; OperatingTimeTemplateUsage 153032 may have a cardinality relationship of 1:cn.

In certain implementations of Root Node, the following ESI actions (Enterprise Service Infrastructure) may be implemented: Block, Activate, Unblock, Delete, FlagAsObsolete, RevokeObsolescence.

Block (S&AM action) blocks an active ResourceOperatingTimeTemplate. It may be called if the ResourceOperatingTimeTemplate is not flagged for deletion, it is active, and it is not blocked. The status of the ResourceOperatingTimeTemplate may be set to “Blocked”.

Activate (S&AM action) activates a ResourceOperatingTimeTemplate. The ResourceOperatingTimeTemplate may have the initial status “In Preparation”. When the action is executed, a consistency check may be carried out for the ResourceOperatingTimeTemplate. The ResourceOperatingTimeTemplate may be activated if it is consistent.

Unblock (S&AM action) unblocks a ResourceOperatingTimeTemplate. The ResourceOperatingTimeTemplate may have the initial status “Blocked” and may be set to “Active” status.

Delete (S&AM action) deletes a ResourceOperatingTimeTemplate. The ResourceOperatingTimeTemplate may initially be in “In Preparation” state and may subsequently be deleted.

FlagAsObsolete (S&AM action) marks a ResourceOperatingTimeTemplate as obsolete. The ResourceOperatingTimeTemplate may initially be unreferenced by other resources. It may be set to “Obsolete” status.

RevokeObsolescence (S&AM action) revokes the obsolescence for a ResourceOperatingTimeTemplate and sets it as active. The ResourceOperatingTimeTemplate may initially have the status “Obsolete” and may be set to “Active” status.

In certain implementations of Root Node the following queries may be called: QueryByElements, QueryByLogisticsShiftProgram.

QueryByElements returns a list of all ResourceOperatingTimeTemplates which satisfy the selection criteria, specified by the query elements The query elements are defined by data type ResourceOperatingTimeTemplateElementsQueryElements. In certain implementations these elements may include the following: ID, which may be based on GDT ResourceOperatingTimeTemplateID and may be optional; UUID, which may be based on GDT UUID and may be optional; SystemAdministrativeData, which may be based on GDT SystemAdministrativeData and may be optional; Status, which may be based on GDT ResourceOperatingTimeTemplateStatus.

QueryByLogisticsShiftProgram returns a list of all ResourceOperatingTimeTemplates that may be assigned to a LogisticsShiftProgram specified as a part of the selection criteria.

The query elements are defined by data type ResourceByLogisticsShiftProgramQueryElements. In certain implementations these elements may include the following. OperatingTimeSpecificationLogisticsShiftProgramID is an identifier of the logistics shift programme; this element may be based on GDT LogisticsShiftProgramID and may be optional. OperatingTimeSpecificationLogisticsShiftProgramUUID is an identifier, which may be unique, of the logistics shift programme; this element may be based on GDT UUID and may be optional. OperatingTimeSpecificationOperatingTimeVariancePerPeriodLogisticsShiftProgramID is an identifier of the logistics shift programme; this element may be based on GDT LogisticsShiftProgramID and may be optional. OperatingTimeSpecificationOperatingTimeVariancePerPeriodLogisticsShiftProgramUUID is an identifier, which may be unique, of the logistics shift programme; this element may be based on GDT UUID and may be optional. Status, which may be based on GDT ResourceOperatingTimeTemplateStatus.

Description

BO ResourceOperatingTimeTemplate/node Description represents a natural-language text with additional information on a ResourceOperatingTimeTemplate.

The structure elements located directly at node Description are defined by data type ResourceOperatingTimeTemplateDescriptionElements. In certain implementations these elements may include the following: Description, which is a Language dependent description of the ResourceOperatingTimeTemplate; it may be based on GDT _SHORT_Description.

LocationAssignment

BO ResourceOperatingTimeTemplate/node LocationAssignment represents an assignment of Location to a ResourceOperatingTimeTemplate. For all resources in an assigned location the ResourceOperatingTimeTemplate may contain the definition of the default operating times.

The structure elements located directly at node LocationAssignment are defined by the node data type: ResourceOperatingTimeTemplateLocationAssignmentElements. In certain implementations these elements may include the following: LocationID, LocationUUID.

LocationID is an identifier, which may be unique, of the Location to which ResourceOperatingTimeTemplate is associated to. This element may be based on GDT LocationID.

LocationUUID is an identifier, which may be unique, of Location to which ResourceOperatingTimeTemplate is associated to. This element may be based on GDT UUID. It may be optional.

In certain implementations of node LocationAssignment, the following inbound aggregation relationships BO Location/Root Node may exist: AssignedLocation may have a cardinality relationship of 1:cn, and indicates a Location that may be assigned to the ResourceOperatingTimeTemplate.

OperatingTimeSpecification

BO ResourceOperatingTimeTemplate/node OperatingTimeSpecification represents the operating times for a ResourceOperatingTimeTemplate.

The structure elements located directly at ResourceOperatingTimeTemplate/node OperatingTimeSpecification are defined by data type ResourceOperatingTimeTemplateOperatingTimeSpecificationElements. In certain implementations these elements may include the following: UUID, ResourceOperatingTimeDefiningObjectTypeCode, OperatingTime, LogisticsShiftProgramID, LogisticsShiftProgramUUID.

UUID is an identifier, which may be unique, of the node. This element may be based on GDT UUID.

ResourceOperatingTimeDefiningObjectTypeCode is a coded representation of the business object type using which the operating time is defined.

OperatingTime is defined either using the business object LogisticsShiftProgram or using the dependent object Operating Hours. This element may be based on GDT ObjectTypeCode, Qualifier ResourceOperatingTimeDefining.

LogisticsShiftProgramID is an identifier, which may be unique, of the LogisticsShiftProgrammme that is used to define the operating time. This element may be based on GDT LogisticsShiftProgramID. It may be optional.

LogisticsShiftProgramUUID is an identifier, which may be unique, of the LogisticsShiftProgram that is used to define the operating time. This element may be based on GDT UUID. It may be optional.

In certain implementations of node OperatingTimeSpecification, the following inbound aggregation relationships from BO LogisticsShiftProgram/Root Node may exist: AssignedLogisticsShiftProgram may have a cardinality relationship of c:cn, and indicates the assignment of LogisticsShiftProgram to the ResourceOperatingTimeTemplate.

In certain implementations of node OperatingTimeSpecification, the following composition relationships to subordinate nodes may exist: OperatingTimeSpecificationOperatingHours 153034 may have a cardinality relationship of 1:c; OperatingTimeSpecificationOperatingTimeVariancePerPeriod 153036 may have a cardinality relationship of 1:cn.

For a given operating time variance per period it may be possible to specify either the LogisticsShiftProgramID or the OperatingHours based on the specified ResourceOperatingTimeDefiningObjectTypeCode.

OperatingTimeSpecificationOperatingHours (DO)

BO ResourceOperatingTimeTemplate/node OperatingTimeSpecificationOperatingHours represents working times of the resource based on a recurrence pattern.

The node structure of this node is provided by the DO OperatingHours.

OperatingTimeSpecificationOperatingTimeVariancePerPeriod

BO ResourceOperatingTimeTemplate node OperatingTimeSpecificationOperatingTimeVariancePerPeriod specifies the variances to the operating time definition of a ResourceOperatingTimeTemplate per period.

The structure elements located directly at node OperatingTimeSpecificationOperatingTimeVariancePerPeriod are defined by data type ResourceOperatingTimeTemplateOperatingTimeSpecificationOperatingTimeVariancePerPeriodElements. In certain implementations these elements may include the following: UUID, OperatingTimeVarianceValidityPeriod, ResourceOperatingTimeDefiningObjectTypeCode, OperatingTime, LogisticsShiftProgramID, LogisticsShiftProgramUUID.

UUID is an identifier, which may be unique, of the time variance per period. This element may be based on GDT UUID.

OperatingTimeVarianceValidityPeriod specifies the period for which the operating time variance is valid. This element may be based on GDT CLOSED_DatePeriod.

ResourceOperatingTimeDefiningObjectTypeCode is a coded representation of the business object type using which the operating time is defined.

OperatingTime is defined either using the business object LogisticsShiftProgram or using the dependent object Operating Hours.

This element may be based on GDT ObjectTypeCode, Qualifier ResourceOperatingTimeDefining.

LogisticsShiftProgramID is an identifier, which may be unique, of the LogisticsShiftProgrammme that is used to define the operating time. This element may be based on GDT LogisticsShiftProgramID. It may be optional.

LogisticsShiftProgramUUID is an identifier, which may be unique, of the LogisticsShiftProgrammme that is used to define the operating time. This element may be based on GDT UUID. It may be optional.

In certain implementations of node OperatingTimeSpecificationOperatingTimeVariancePerPeriod, the following inbound aggregation relationships from BO LogisticsShiftProgram/Root Node may exist: AssignedLogisticsShiftProgram may have a cardinality relationship of c:cn, and indicates the assignment of LogisticsShiftProgram to the ResourceOperatingTimeTemplate.

In certain implementations of node OperatingTimeSpecificationOperatingTimeVariancePerPeriod, the following composition relationships to subordinate nodes may exist: OperatingTimeSpecificationOperatingTimeVariancePerPeriodOperatingHours 153038 may have a cardinality relationship of 1:c.

For a given operating time variance per period it may be possible to specify either the LogisticsShiftProgramID or the OperatingHours based on the specified ResourceOperatingTimeDefiningObjectTypeCode.

OperatingTimeSpecificationOperatingTimeVariancePerPeriodOperatingHours (DO)

BO ResourceOperatingTimeTemplate node OperatingTimeSpecificationOperatingTimeVariancePerPeriodOperatingHours represents working times of the resource based on a recurrence pattern.

The node structure of this node is provided by the DO OperatingHours

OperatingTimeTemplateUsage (Transient Node).

BO ResourceOperatingTimeTemplate/node OperatingTimeTemplateUsage represents a Resource that is using the ResourceOperatingTimeTemplate.

The structure elements located directly at node ResourceOperatingTimeTemplateUsage are defined by data type ResourceOperatingTimeTemplateUsageElements. In certain implementations these elements may include the following: ResourceUUID, ResourceID, ResourceCategoryCode.

ResourceUUID is an identifier, which may be unique, of the resource assigned. This element may be based on GDT UUID.

ResourceID is an identifier, which may be unique, of the resource that is assigned. This element may be based on GDT ResourceID.

ResourceCategoryCode specifies the type of the resource that may be assigned to the operating time template. This element may be based on GDT ResourceCategoryCode. It may be optional.

In certain implementations of node OperatingTimeTemplateUsage, the following inbound aggregation relationships from Transformation Object Resource/Root Node may exist: ReferencingResource may have a cardinality relationship of 1:c, and indicates association to a resource that is using (referencing) the ResourceOperatingTimeTemplate.

In certain implementations of node OperatingTimeTemplateUsage, the following ESI action (Enterprise Service Infrastructure) may be implemented: UpdateResources. This is a propagation of the changes to the operating times of the ResourceOperatingTimeTemplate to all referencing resources. Operating time information for the referencing resource may be updated.

Overtime

BO ResourceOperatingTimeTemplate/node Overtime represents an overtime for the ResourceOperatingTimeTemplate. Overtimes are additional working times for the ResourceOperatingTimeTemplate.

The structure elements located directly at node Overtime are defined by data type ResourceOperatingTimeTemplateOvertimeElements. In certain implementations these elements may include the following: ResourceOperatingTimeTemplateOvertimeReasonCode, ResourceOperatingTimeTemplateOvertimePeriod.

ResourceOperatingTimeTemplateOvertimeReasonCode specifies the reason for the overtime. This element may be based on GDT ResourceOperatingTimeTemplateOvertimeReasonCode.

ResourceOperatingTimeTemplateOvertimePeriod specifies the start and end date times for the for the overtime. This element may be based on GDT DateTimePeriod.

Downtime

BO ResourceOperatingTimeTemplate/node Downtime represents planned and unplanned downtimes for the ResourceOperatingTimeTemplate. Downtimes are non-working times for the ResourceOperatingTimeTemplate.

The structure elements located directly at node Downtime are defined by data type ResourceOperatingTimeTemplateDowntimeElements. In certain implementations these elements may include the following: PlannedIndicator, ResourceOperatingTimeTemplateDowntimeReasonCode, ResourceOperatingTimeTemplateDowntimePeriod.

PlannedIndicator indicates that the downtime is a planned downtime. This element may be based on GDT Indicator, Qualifier Planned. It may be optional.

ResourceOperatingTimeTemplateDowntimeReasonCode specifies the reason for the resource downtime. This element may be based on GDT ResourceOperatingTimeTemplateDowntimeReasonCode.

ResourceOperatingTimeTemplateDowntimePeriod specifies the start and end date times for the for the resource downtime. This element may be based on GDT DateTimePeriod.

Business Object Responsibility

FIG. 154 illustrates one example of a Responsibility business object model 154004. Specifically, this model depicts interactions among various hierarchical components of the Responsibility, as well as external components that interact with the Responsibility (shown here as 154000 through 154002 and 154006 through 154022). A BO Responsibility describes specific rights and duties of a responsible acting agent such as a person or an organisational centre etc. A Responsibility is an assignment of an responsible agent to single responsibilities describing its duty within a certain responsibility category.

A Responsibility Category may be defined as an area of validity for responsibilities. It may be limited with regards to the different OrganisationalFunctionCode, different Responsible Agent Types or instances and the set of parameter types that are used to describe the Responsibility. A Responsible Agent may be defined as an acting agent with specific rights and duties, such as an Employee or an Organisational Centre.

As an example, within the Responsibility Category Sales, the Responsible Agent Frank Miller might be responsible for Customers BASF and Bayer and Product Category Pharmaceuticals.

The Reuse Service Component "Responsibility Finder" might offer two potential components. First, it may provide assignment of responsible agents to their area of responsibility (called set of SingleResponsibility); second, it may provide a search for the agent who is responsible for some specific duty. BO Responsibility may provide functionality for the first component above, for example, when agents are assigned to their areas of responsibility.

An instance of BO Responsibility Root Node 154010 may exist once per ResponsibilityCategory and ResponsibleAgent. It may be created when a ResponsibleAgent is created; for example, during the creation of an OrgCentre a Responsibility instance may be created, etc. Also, without further information an "empty" SingleResponsibility node (no ParameterRangeValues) may be created. This may be interpreted as "responsible for all parameters".

The responsibility BO is inside the Foundation Layer in Process Component Organization Management.

Node Structure of BO Responsibility

Root Node

BO Responsibility/Root Node represents an assignment of a responsible agent to single responsibilities describing its duty within a certain responsibility category. It may contain all information relating to one responsibility category and one responsible agent.

The structure elements located directly at BO Root Node are defined by data type ResponsibilityElements. In certain implementations these elements may include the following: ResponsibleAgent, AgentDescription, CategoryUUID, CategoryDescription, FallbackIndicator.

ResponsibleAgent is the agent that may be assigned to one or more tasks. This element may be based on GDT ResponsibleAgent.

AgentDescription describes the responsible agent (as displayed in the UI). This element may be based on GDT Description.

CategoryUUID is an identifier specifying the responsibility category. This element may be based on GDT UUID.

CategoryDescription describes the responsibility category as displayed in the UI. This element may be based on GDT Description.

FailbackIndicator indicates whether the responsibility is used as the fallback for all other responsibility instances within the given category or not. This element may be based on GDT Indicator, Qualifier Fallback.

For each pair of Responsibility Category and Responsible Agent, there may be exactly one responsibility serving as fallback in case no other responsibility can be determined during a responsibility determination.

In certain implementations of Root Node the following queries may be called: QueryBySuperiorFunctionalUnit, QueryByResponsibleAgent.

QueryBySuperiorFunctionalUnit returns a list of all Responsibility instances that belong to persons working in and for a functional unit. The output may include responsibility categories that cannot be maintained by the given functional unit. In certain implementations query elements may include the following: FunctionalUnit, which may be based on GDT OrgCentreID; ResponsibleAgent, which may be based on GDT ResponsibleAgent; OrganisationalFunctionCode, which may be based on GDT OrganisationalFunctionCode; and FallbackIndicator, which may be based on GDT Indicator, Qualifier Fallback. The above elements may be optional.

QueryByResponsibleAgent returns a list of all responsibility instances that involve an agent. In certain implementations query elements may include the following: Responsible- Agent, which may be based on GDT ResponsibleAgent; CategoryUUID, which may be based on GDT UUID; OrganisationalFunctionCode, which may be based on GDT OrganisationalFunctionCode; FallbackIndicator, which may be based on GDT Indicator, Qualifier Fallback. The above elements may be optional.

Query element OrganisationalFunctionCode may be an attribute of the ResponsibilityType. ResponsibilityTypes of exactly one OrganisationalFunctionCode may be assigned to a ResponsibilityCategory. Thus, indirectly, OrganisationalFunctionCode may also be an attribute of a ResponsibilityCategory.

In certain implementations of Root Node, ESI action Check (Enterprise Service Infrastructure) may be implemented: The Check action runs consistency checks for overlaps with other Responsibility instances and for white spots where no Responsibilities are defined. It may occur in cases when Responsible Agent is of type “Person”. Results may be returned in form of messages. This action may be called from UI or by LCP.

In certain implementations of Root Node, the following composition relationships to subordinate nodes may exist: UsageType 154012 may have a cardinality relationship of 1:n; ParameterType 154014 may have a cardinality relationship of 1:n; SingleResponsibility 154016 may have a cardinality relationship of 1:cn.

UsageType

BO Responsibility/node UsageType represents the type of usage of a responsibility category within an application.

A Responsibility Type defines the characteristic features of a particular responsibility being used in some BO or business task. It may be defined with reference to a OrganisationalFunctionCode, a Responsible Agent Type(s) and/or the set of parameter types being used to describe the Responsibility usage.

As an example, Responsibility Category “Making Deals” within OrganisationalFunctionCode Sales may contain the following UsageTypes referring to BTM Task Types where the corresponding responsibility determination is being made: Backorder Tasks, Post Process Sales Order Quote Tasks, and Opportunity Tasks.

A UsageType may be assigned to one or more Responsibility Categories, and exactly one assignment may be active.

Inactive assignments of Responsibility Types to Responsibility Categories can offer flexibility: an inactive assignment may be activated instead of the active one during Business Configuration at customer site.

Responsibility Types may be used, rather than Responsibility Categories directly, in the Reuse Service Component “Responsibility Finder” in order to define what kind of responsibility shall be found for an application that is making a “Responsibility Finder” call in the coding. Responsibility Categories may be used in the Reuse Service Component “Responsibility Finder” for end user maintenance of responsibilities (indirectly related to requests in the coding).

The structure elements located directly at node UsageType are defined by data type ResponsibilityTypeElements. In certain implementations these elements may include the following: ResponsibilityTypeCode, ResponsibilityTypeDescription.

ResponsibilityTypeCode is a coded representation of the type of a responsibility. This element may be based on GDT ResponsibilityTypeCode.

ResponsibilityTypeDescription describes the responsibility type code. This element may be based on GDT MEDIUM_Description, Qualifier ResponsibilityType.

ParameterType

BO Responsibility/node ParameterType specifies the description and type of a business parameter to define/limit a Responsibility Category.

The parameter type may the type of a Lower/UpperBoundaryObjectPropertyValue in a ParameterValueRange that may be specified in a category. It may provide all information needed to display and maintain a corresponding value. Such parameters may be specified throughout a single Responsibility instance that refers to these ParameterTypes.

Node ParameterType stems from the fact that Responsibility is a so-called “Generic BO”. Because of this, type information may be defined at runtime at the customer site when possible configuration settings are made, rather than being defined statically.

The structure elements located directly at node ParameterType are defined by data type ResponsibilityParameterTypeElements. In certain implementations these elements may include the following: Description, ObjectNodeElementPropertyReference, StableIndicator, HierarchyTypeDescription, HierarchyTypeObjectNodeElementPropertyReference.

Description describes the parameter (as displayed in the UI). This element may be based on GDTSHORT Description.

ObjectNodeElementPropertyReference specifies information about an assignment parameter. This element may be based on GDT ObjectNodeElementPropertyReference.

StableIndicator may be valid for parameters of type identifier. It may show if this ID is being stored as the ID itself or as the corresponding NodeID (indicating an important difference of dependencies). This element may be based on GDT Indicator, Qualifier Stable. It may be optional.

HierarchyTypeDescription describes the HierarchyType. The ObjectNodeElementPropertyReference may be unique. There may be exactly one HierarchyType per SingleResponsibility and ParameterType. This element may be based on GDTSHORT_Description, Qualifier HierarchyType. It may be optional.

HierarchyTypeObjectNodeElementPropertyReference is information about a HierarchyType. ObjectNodeElementPropertyReference may be unique. There may be exactly one HierarchyType per SingleResponsibility and ParameterType. This element may be based on GDT ObjectNodeElementPropertyReference. It may be optional.

For good reason an existing BO node element may be referred to so that it is usable for other parts of the technology stack. It may be a business requirement that by a reference to an existing BO node element (such as BO Namespace, BO Name, BO Node Name, BO Node Element) all information may be derived in order to display fields in the right format, offer value help and codelists etc.

In certain implementations of node ParameterType, navigation associations to node ParameterValueRange may exist as follows: ParameterValueRange 154018 may have a cardinality relationship of 1:cn, and indicates that Defining the type of LowerBoundaryObjectPropertyValue and UpperBoundaryObjectPropertyValue.

SingleResponsibility

BO Responsibility/node SingleResponsibility represents the atomic and concrete part of a responsibility.

A Single Responsibility may consist of 1 combination of the parameters defined in the ParameterType node. Parameters of one ParameterType may be specified as one or several ParameterValueRanges. Doing so may allow for definition of independent “table rows” for Single Responsibility instances (in data format ParameterType A/ParameterType B/ParameterType C): Single Responsibility 1: 4711/815/A-C; Single Responsibility 1: 4711/816/F—H; Single Responsibility 2: 4811/817/A-C.

The type of each parameter may be defined by the ParameterType node to which each ParameterValueRange has an association. Usually, some but not all of the parameters will be specified in a SingleResponsibility instance.

The structure elements located directly at node SingleResponsibility are defined by data type ResponsibilitySingleResponsibilityElements. In certain implementations these elements may include the following: Name, ValidityPeriod, SystemAdministrativeData.

Name specifies the name of the parameter set. This element may be based on GDT MEDIUM_Name, Qualifier SingleResponsibility.

ValidityPeriod specifies the period for which SingleResponsibility is valid. This element may be based on GDT DatePeriod, Qualifier Validity.

SystemAdministrativeData specifies administrative data stored by the system to store last changed data. This element may be based on GDT SystemAdministrativeData.

In certain implementations of node, the following ESI actions (Enterprise Service Infrastructure) may be implemented: Copy, Move.

Copy copies a SingleResponsibility instance into another Responsibility instance.

Move copies a SingleResponsibility instance into another Responsibility instance and deletes it in the current Responsibility instance. The system may deletes the current SingleResponsibility instance and create a new instance of SingleResponsibility with description, validity period and ParametersValueRanges. The action may be called from UI or by LCP. It may be executed for one or several instances of SingleResponsibility.

Action elements of ESI action Move are defined by data type SingleResponsibilityCopyActionElements. In certain implementations these elements may include ResponsibleAgent. This element may be based on GDT ResponsibleAgent. Via the ResponsibleAgent plus the CategoryUUID of the own Responsibility root node the system may find an existing Responsibility instance and copy the content of the SingleResponsibility instance into a newly created SingleResponsibility instance.

In certain implementations of node SingleResponsibility, the following composition relationships to subordinate nodes may exist: ParameterValueRange may have a cardinality relationship of 1:cn.

ParameterValueRange

BO Responsibility/node ParameterValueRange represents a value range of a parameter of type ParameterType to which each ParameterValueRange has an association. Within a SingleResponsibility, multiple value ranges may refer to the same parameter type.

The structure elements located directly at node ParameterValueRange are defined by data type ResponsibilitySingleResponsibilityParameterValueRangeElements. In certain implementations these elements may include the following: InclusionExclusionCode, IntervalBoundaryTypeCode, LowerBoundaryPropertyValue, UpperBoundaryPropertyValue, HierarchyTypePropertyValue.

InclusionExclusionCode specifies if the range in included or excluded. This element may be based on GDT InclusionExclusionCode.

IntervalBoundaryTypeCode specifies how LowerBoundaryObjectPropertyValue and UpperBoundaryObjectPropertyValue value will be interpreted. This element may be based on GDT IntervalBoundaryTypeCode.

LowerBoundaryPropertyValue specifies the lower boundary or single value. This element may be based on GDT OBJECT_PropertyValue.

UpperBoundaryPropertyValue specifies the upper boundary. This element may be based on GDT OBJECT_PropertyValue. It may be optional.

HierarchyTypePropertyValue is Value about a HierarchyType. ObjectNodeElementPropertyReference may be unique. There may be exactly one HierarchyType per SingleResponsibility and ParameterType. This element may be based on GDT OBJECT_PropertyValue. It may be optional.

In case there are supplemental elements specified in Lower/UpperBoundaryObjectPropertyValue there may be exactly one value specified for them per SingleResponsibility and ParameterType. In cases in which there is a HierarchyTypeObjectPropertyValue specified, there may be exactly one value per SingleResponsibility and ParameterType.

Business Object SalesArrangement

FIG. 155 illustrates an example SalesArrangement business object model 155002. Specifically, this model depicts interactions among various hierarchical components of the SalesArrangement, as well as external components that interact with the SalesArrangement (shown here as 155000, 155004 through 155008 and 155024 through 155026).

Business Object SalesArrangement is an agreement between a sales unit and a customer that is used for sales transactions. This agreement contains, for example, payment terms, invoice currency and incoterms. This agreement is not a contract with the customer. The business object Sales Arrangement is part of the process component Business Partner Data Processing. The sales arrangement can be assigned to a customer and sales area and may contain information on delivery, transport, pricing and the blocking reasons for sales transactions.

Sales Arrangement is an agreement for regulating sales transactions. The agreement can be between a customer and one sales department, but also for one customer and all sales departments and for one sales department and all customers. This agreement contains, for example, payment conditions, invoice currency and incoterms. This agreement is not a contract with the customer. Together the sales organization, distribution channel and division form the sales area.

The elements found directly at the root node SalesArrangement 155010 are defined by the data type SalesArrangementElements. These elements include, of type GDT, UUID, a Universal Unique Identifier of the agreement; CustomerUUID, a universally unique identifier of the customer with whom the agreement is made; SalesOrganisationUUID, optional, a universally unique identifier of the sales organization with which the agreement is made; DistributionChannelCode, a distribution channel to which the data belongs; DivisionCode, a division channel to which the data belongs; Status, Status of the SalesArrangement, of type IDT; LifeCycleStatusCode, status of the SalesArrangement.

DeliveryTerms 155012 may have a cardinality of 1:1. TransportationTerms 155014 may have a cardinality of 1:1. PricingTerms 155016 may have a cardinality of 1:1. PaymentTerms 155018 may have a cardinality of 1:1. BlockingReasons 155020 may have a cardinality of 1:c. AccessControlList 155022 may have a cardinality of 1:1.

There may be a number of Inbound Aggregation Relationships, including:

1) From the business object Customer, node Root: Customer, which may have a cardinality of c:cn, and is the Customer to which the data belongs. 2) From the business object Functional Unit, node Root: SalesOrganisation, which may have a cardinality of c:cn, and is the sales organization to which the data belongs.

In the node either the field CustomerUUID or SalesOrganisationUUID can be filled.

The element LifeCycleStatusCode cannot be changed and is maintained implicitly.

The sales organizations are represented by the functional units with organizational function "Sales" (i.e., GDT OrganisationalFunctionCode; code value "4") and role "Organization" (i.e., GDT FunctionalUnitRoleCode; code value "1").

The QueryByElements query returns a list of sales arrangements. The elements of the root node can be entered as the selection parameters. GDT: SalesArrangementElementsQueryElements defines the query elements: CustomerUUID.

The agreements where the root element CustomerUUID agrees with the value specified here are selected. (In the agreements that are valid for all customers the root element CustomerUUID is initial.); SalesOrganisationUUID, of type GDT; DistributionChannelCode, of type GDT; DivisionCode; LifeCycleStatusCode.

The QueryByCustomer query gets a list of sales arrangements. The sales area and UUID of a customer can be entered as selection parameters.

GDT: SalesArrangementCustomerQueryElements defines the query elements that include: BusinessPartnerUUID, only those agreements that belong to a customer with a UUID that agrees with the value specified here are selected; SalesOrganisationUUID; DistributionChannelCode; DivisionCode LifeCycleStatusCode.

DeliveryTerms are agreements that apply for the delivery of the goods ordered and the provision of services ordered. The elements found directly at the DeliveryTerms node are defined by the type GDT SalesArrangementDeliveryTermsElements. These elements include Incoterms, the conventional contract formulations for the delivery terms, of type GDT; DeliveryPriorityCode, a coded representation of the priority and urgency of the delivery, of type GDT; FollowUpDespatchedDeliveryNotificationRequirementCode, a coded representation of the necessity of a Despatched Delivery Notification as follow-up message.

Transportation terms are the conditions and agreements that are valid for the transport of the goods to be delivered. The elements located directly at the TransportationTerms node are defined by the type GDT: SalesArrangementTransportationTermsElements. These elements include TransportServiceLevelCode, agreed services with regard to the speed of the delivery, of type GDT; TransportModeCode, a mode of transportation for delivery, of type GDT; PricingTerms. PricingTerms are the individual characteristics that are used for the pricing and for the value date of the goods and services ordered. The elements located directly at the PricingTerms node are defined by the type GDT. SalesArrangementPricingTermsElements. These elements include CustomerPricingProcedureDeterminationCode, a customer pricing procedure for the pricing procedure determination (proposed by buyer or sold-to party), of type GDT; ExchangeRateTypeCode, an exchange rate type for currency conversion between the document currency and the local currency, of type GDT; CurrencyCode, a currency for the value date of the goods and services ordered (document currency), of type GDT; PriceSpecificationCustomerGroupCode, a group of customers for whom the same price specification applies (proposed by buyer or sold-to party). Of type GDT; CustomerPriceListTypeCode, a type of price list for customers (proposed by buyer or sold-to party), of type GDT; CustomerGroupCode, a group of customers (for general purposes such as pricing and statistics (proposed by buyer or sold-to party), of type GDT.

PaymentTerms is the data required for handling payments for a business document.

The elements located directly at the PaymentTerms node are defined by the type GDT: SalesArrangementPaymentTermsElements. These elements include: CashDiscountTerms, which describes the possible payment terms and discounts.

BlockingReasons specifies for which business transactions a business is blocked and why. The elements located directly at the BlockingReasons node are defined by the type GDT SalesArrangementBlockingReasonsElements. These elements include: of type GDT, InvoicingBlockingReasonCode, a reason why business partner cannot be invoiced; CustomerTransactionDocumentFulfilmentBlockingReasonCode, a reason why business partner cannot receive deliveries or services; CustomerBlockingReasonCode, a reason why business partner cannot be used in business transactions; InvoicingBlockingIndicator, which specifies whether or not the business partner can be invoiced; CustomerTransactionDocumentFulfilmentBlockingIndicator, which specifies whether or not a business partner can receive deliveries or services; CustomerBlockingIndicator, which specifies whether or not the business partner can be used in business transactions.

The elements InvoicingBlockingIndicator, CustomerTransactionDocumentFulfilmentBlockingIndicator, and CustomerBlockingIndicator cannot be changed.

The AccessControlList is a list of access groups that have access to a Business Partner during a validity period. The data is modeled using the dependent object AccessControlList.

FIG. 156 illustrates one example of an SalesPriceList business object model 156002. Specifically, this model depicts interactions among various hierarchical components of the SalesPriceList, as well as external components that interact with the SalesPriceList (shown here as 156000 and 156004).

Business Object SalesPriceList

SalesPriceList is a combination of specifications for prices, discounts or surcharges, (PriceSpecification), in Sales and Service. The list is defined for a combination of properties, and is valid for a specific time period. The Business Object SalesPriceList is used to simplify the mass maintenance of product base prices, customer discounts, and so on. On the other hand, the Business Object SalesPriceSpecification can be used to maintain single specifications that cannot be grouped together, such as freight costs, and so on. Criteria that can be commonly identified are, for example, sales organization, distribution channel, purchaser, and so on. The specification of a price, discount, or surcharge is evaluated within the framework of pricing. Pricing can be called during document processing. Specifications that are created with the BO SalesPriceList (SalesPriceSpecification) cannot be processed further with the BO SalesPriceSpecification (SalesPriceList). Using Configuration, you have to check whether specifications have to be maintained with the BO SalesPriceList, or with the BO SalesPriceSpecification.

The Business Object SalesPriceList is used in the DUs CustomerRelationshipManagement and CustomerInvoicing. It is, therefore, in the AP Foundation Layer.

A SalesPriceList may contain header information, such as the identifier, the type of representation, the maximum possible properties, and the validity period of a list. A SalesPriceList may also contain common properties of all specifications with their assigned values, the default values for the individual specifications, and the list of specifications.

The SalesPriceList is involved in the following process integration models: PriceMasterDataManagement-_PriceMasterDataManagementatCustomer.

The Service Interface Price Information Out service interface is part of the process integration model Price Master Data Management_Price Master Data Management at Customer. PriceMasterDataManagementPriceInformationOut is the technical name.

The Interface Price Information Out service interface can group the operations for generating sales price list information from the Price Master Data Management to the Price Master Data Management of the Customer.

PriceMasterDataManagementPriceInformationOut.InformOfSalesPriceList is the InformOfSalesPriceList operation informs of sales price lists.

The operation is based on the SalesPriceListInformation message (MDT: FormSalesPriceListInformation), that is derived from the business objects SalesPriceList.

The interface Sales Price List Replication Out service interface groups the operations for generating confirmations of replicated sales price specifications at the Price Master Data Management. PriceMasterDataManagementSalesPriceListReplicationOut is the technical name.

The ConfirmfSalesPriceListReplication operation may confirm the replication of sales price lists. The operation is based on the SalesPriceListReplicateConfirmation message (MDT: SalesPriceListReplicateConfirmation), that is derived from the business objects SalesPriceList.

The Interface Sales Price List Replication In service interface groups the operations for generating sales price specification replications at Price Master Data Management.

The ReplicateSalesPriceList operation can replicate sales price lists. The operation is based on the SalesPriceListReplicateRequest and is of MDT type SalesPriceListReplicateRequest, that is derived from the business objects SalesPriceList.

A Node Structure of Business Object SalesPriceList 156006 is a list of specifications for prices, discounts, or surcharges, and contains the identifier, the information on the type of representation, the maximum possible characteristics and the validity period.

A SalesPriceList can contain: PropertyValuation 156010 having a cardinality relationship of 1:n. Description 156014 having a cardinality relationship of 1:c. DefaultValues 156012 having a cardinality relationship of 1:1. PriceSpecification 156008 having a cardinality relationship of 1:cn. AttachmentFolder 156018 having a cardinality relationship of 1:c. having a cardinality relationship of 1:c. AccessControlList 156020 having a cardinality relationship of 1:1. ControlledOutputRequest 156022 having a cardinality relationship of 1:1.

The elements located at the node SalesPriceList are defined by the type GDT: SalesPriceListElements. In certain implementations, these elements include: UUID, ID, WorstLogItemSeverityCode, PropertyValueSearchText, PriceSpecificationElementPropertyDefinitionClassCode, TypeCode, CurrencyCode, ValidityPeriod, SystemAdministrativeData and Status.

UUID is a universal identifier, which can be unique, of the list. UUID may be based on GDT UUID. ID is an identifier of the list. ID may be based on GDT SalesPriceListID. WorstLogItemSeverityCode is a log report with the highest severity. WorstLogItemSeverityCode may be based on GDT LogItemSeverityCode. PropertyValueSearchText is a text that is concatenated by all the property values of the node PropertyValuation. PropertyValueSearchText may be based on GDT SearchText. PriceSpecificationElementPropertyDefinitionClassCode is the coded representation of a property definition class of a PriceSpecificationElement. PriceSpecificationElementPropertyDefinitionClassCode may be based on GDT PriceSpecificationElementPropertyDefinitionClassCode. TypeCode is the list type. TypeCode may be based on GDT SalesPriceListTypeCode. CurrencyCode is the currency code of the list. CurrencyCode may be based on GDT CurrencyCode. ValidityPeriod is the validity period of the list GDT TimePointPeriod. SystemAdministrativeData is the administrative data for the list that is stored by the system. SystemAdministrativeData may be based on GDT SystemAdministrativeData. Status is the information on whether the list is released and free of errors. Status may be based on IDT SalesPriceListStatus. In certain implementations, these elements include: releaseStatusCode and ConsistencyStatusCode. ReleaseStatusCode is the release status. ReleaseStatusCode may be based on GDT ReleaseStatusCode. ConsistencyStatusCode is the error Status. ConsistencyStatusCode may be based on GDT ConsistencyStatusCode.

If the list contains errors, the ReleaseStatus is set by the system to “Not Released”, and the ReleaseStatus cannot be changed. The ReleaseStatus can be set by the consumer. The Error Status is set internally by the system.

In some implementations, the TypeCode, as a part of the semantic key, cannot be changed after creation. WorstLogItemSeverityCode is provided by the system after checking all elements of the root node and all subnodes, and cannot be set externally. In these implementations, the SystemAdministrativeData is set internally by the system. It cannot be assigned or changed externally. Furthermore, CreationDateTime is only accurate to the day;

In some implementations, LastChangeDateTime and LastChangeUserID are not persistent. ElementPropertyDefinitionClassCode, as a part of the semantic key, cannot be changed after creation. ValidityPeriod can be processed for a particular day. Time periods from data that is transferred from a different system cannot be taken into consideration.

An ElementPropertyDefinitionClass may exist within the framework of business configuration.

The following Inbound Aggregation Relationships may exist. CreationIdentity has a cardinality relationship of (1:cn) and is the identity that created the SalesPriceList. LastChangeIdentity has a cardinality relationship of c:cn and is identity that changed the SalesPriceList in the last time.

Duplicate may duplicate a SalesPriceList. The affected changes in the object are as follows: The action creates a new object. The action elements are defined by the data type SalesPriceListDuplicateElements. In certain implementations, these elements include ID, DescriptionDescription and ValidityPeriod.

ID is the identifier of the duplicated list. ID may be based on GDT SalesPriceListID. DescriptionDescription is the description of the duplicated list and is optional. DescriptionDescription may be based on GDT SHORT_Description. ValidityPeriod represents the validity of the duplicated list. DescriptionDescription may be based on GDT TimePointPeriod.

Release releases a SalesPriceList. The action sets the release status to released. CleanUp rolls back price changes of multiple sales price lists that are not saved yet.

QueryByID provides a list of SalesPriceLists for the IDs specified. Query elements are defined by the data type SalesPriceListIDQueryElements. These include ID. ID is a GDT of type SalesPriceListID.

QueryByUUID provides a list of SalesPriceLists for the UUIDs specified. Query elements are defined by the data type SalesPriceListUUIDQueryElements. These include UUID UUID is a GDT of type UUID.

QueryByPriceSpecificationUUID provides a list of SalesPriceLists for the PriceSpecificationUUIDs specified. Query elements are defined by the data type SalesPriceListPriceSpecificationUUIDQueryElements. These include PriceSpecificationUUID. PriceSpecificationUUID is a GDT of type UUID.

QueryByDescription provides a list of SalesPriceLists for the IDs specified and the language-dependent texts. In some implementations It is not necessary to specify the attribute LanguageCode in the element Description. LanguageCode can be set internally. The query elements are defined by the data type SalesPriceListDescriptionQueryElements. These include DescriptionDescription. DescriptionDescription is a GDT of type SHORT_Description.

QueryByPropertyValueSearchText provides a list of SalesPriceLists for the PropertyValueSearchTexts specified. Query elements are defined by the data type SalesPriceListPropertyValueSearchTextQueryElements. These include PropertyValueSearchText PropertyValueSearchText is a GDT of type SearchText.

QueryByTypeCodeAndPropertyIDAndPropertyValue provides a list of SalesPriceLists for the specified TypeCode of the list, the PropertyIDs with the corresponding PropertyValues, the valid-from date, and the valid-to date. In some implementations, PropertyValuationPriceSpecificationElementPropertyValuations are required, since the ESI Framework supports flat structures only. In practice, the restriction of a maximum of 10 PropertyValuationPriceSpecificationElementPropertyValuations does not present the consumer with any limitations. The query elements are defined by the data type SalesPriceListTypeCodeAndPropertyIDAndPropertyValueQueryElements. These elements include ID, TypeCode, ReleaseStatusCode, ValidityPeriod, PropertyValuationPriceSpecificationElementPropertyValuation1, PropertyValuationPriceSpecificationElementPropertyValuation2, PropertyValuationPriceSpecificationElementPropertyValuation3, PropertyValuationPriceSpecificationElementPropertyValuation4, PropertyValuationPriceSpecificationElementPropertyValuation5, PropertyValuationPriceSpecificationElementPropertyValuation6, PropertyValuationPriceSpecificationElementPropertyValuation7, PropertyValuationPriceSpecificationElementPropertyValuation8, PropertyValuationPriceSpecificationElementPropertyValuation9, PropertyValuationPriceSpecificationElementPropertyValuation10, PriceSpecificationPropertyValuationPriceSpecificationElementPropertyValuation1, PriceSpecificationPropertyValuationPriceSpecificationElementPropertyValuation2, PriceSpecificationPropertyValuationPriceSpecificationElementPropertyValuation3, PriceSpecificationPropertyValuationPriceSpecificationElementPropertyValuation4, PriceSpecificationPropertyValuationPriceSpecificationElementPropertyValuation5, PriceSpecificationPropertyValuationPriceSpecificationElementPropertyValuation6, PriceSpecificationPropertyValuationPriceSpecificationElementPropertyValuation7, PriceSpecificationPropertyValuationPriceSpecificationElementPropertyValuation8, PriceSpecificationPropertyValuationPriceSpecificationElementPropertyValuation9, and PriceSpecificationPropertyValuationPriceSpecificationElementPropertyValuation10.

ID is a GDT of type SalesPriceListID. TypeCode is a GDT of type SalesPriceListTypeCode. ReleaseStatusCode is a GDT of type ReleaseStatusCode. ValidityPeriod is a GDT of type TimePointPeriod. PropertyValuationPriceSpecificationElementPropertyValuation1 is a GDT of type PriceSpecificationElementPropertyValuation. The PriceSpecificationElementPropertyValuation of at least one PropertyValuation node corresponds with the specified PropertyValuationPriceSpecificationElementPropertyValuation1. PropertyValuationPriceSpecificationElementPropertyValuation2 is a GDT of type PriceSpecificationElementPropertyValuation and has the same functionality of PropertyValuationPriceSpecificationElementPropertyValuation1. PropertyValuationPriceSpecificationElementPropertyValuation3 is a GDT of type PriceSpecificationElementPropertyValuation and has the same functionality of PropertyValuationPriceSpecificationElementPropertyValuation1. PropertyValuationPriceSpecificationElementPropertyValuation4 is a GDT of type PriceSpecificationElementPropertyValuation and has the same functionality of PropertyValuationPriceSpecificationElementPropertyValuation1. PropertyValuationPriceSpecificationElementPropertyValuation5 is a GDT of type PriceSpecificationElementPropertyValuation and has the same functionality of PropertyValuationPriceSpecificationElementPropertyValuation. PropertyValuationPriceSpecificationElementPropertyValuation6 is a GDT of type PriceSpecificationElementPropertyValuation and has the same functionality of PropertyValuationPriceSpecificationElementPropertyValuation1. PropertyValuationPriceSpecificationElementPropertyValuation7 is a GDT of type PriceSpecificationElementPropertyValuation and has the same functionality of PropertyValuationPriceSpecificationElementPropertyValuation1. PropertyValuationPriceSpecificationElementPropertyValuation8 is a GDT of type PriceSpecificationElementPropertyValuation and has the same functionality of PropertyValuationPriceSpecificationElementPropertyValuation1. PropertyValuationPriceSpecificationElementPropertyValuation9 is a GDT of type PriceSpecificationElementPropertyValuation and has the same functionality of PropertyValuationPriceSpecificationElementPropertyValuation1. PropertyValuationPriceSpecificationElementPropertyValuation10 is a GDT of type PriceSpecificationElementPropertyValuation and has the same functionality of PropertyValuationPriceSpecificationElementPropertyValuation1. PriceSpecificationPropertyValuationPriceSpecificationElementPropertyValuation1 is a GDT of type PriceSpecificationElementPropertyValuation. The PriceSpecificationElementPropertyValuation of at least one PriceSpecificationPropertyValuation node corresponds with the specified PriceSpecificationPropertyValuationPriceSpecificationElementPropertyReferenceValuation1. PriceSpecificationPropertyValuationPriceSpecificationElementPropertyValuation2 is a GDT of type PriceSpecificationElementPropertyValuation and has the same functionality of PriceSpecificationPropertyValuationPriceSpecificationElementPropertyValuation1. PriceSpecificationPropertyValuationPriceSpecificationElementPropertyValuation3 is a GDT of type PriceSpecificationElementPropertyValuation and has the same functionality of PriceSpecificationPropertyValuationPriceSpecificationElementPropertyValuation1. PriceSpecificationPropertyValuationPriceSpecificationElementPropertyValuation4 is a GDT of type PriceSpecificationElementPropertyValuation and has the same functionality of PriceSpecificationPropertyValuationPriceSpecificationElementPropertyValuation1. PriceSpecificationPropertyValuationPriceSpecificationElementPropertyValuation5 is a GDT of type PriceSpecificationElementPropertyValuation and has the same functionality of PriceSpecificationPropertyValuationPriceSpecificationElementPropertyValuation1. PriceSpecificationPropertyValuationPriceSpecificationElementPropertyValuation6 is a GDT of type PriceSpecificationElementPropertyValuation and has the same functionality of PriceSpecificationPropertyValuationPriceSpecificationElementPropertyValuation1. PriceSpecificationPropertyValuationPriceSpecificationElementPropertyValuation7 is a GDT of type PriceSpecificationElementPropertyValuation and has the same functionality of PriceSpecificationPropertyValuationPriceSpecificationElementPropertyValuation1. PriceSpecificationPropertyValuationPriceSpecificationElementPropertyValuation8 is a GDT of type PriceSpecificationElementPropertyValuation and has the same functionality of PriceSpecificationPropertyValuationPriceSpecificationElementPropertyValuation1. PriceSpecificationPropertyValuationPriceSpecificationElementPropertyValuation9 is a GDT of type PriceSpecificationElementPropertyValuation and has the same functionality of PriceSpecificationPropertyValuationPriceSpecificationElementPropertyValuation1. PriceSpecificationPropertyValuationPriceSpecificationElementPropertyValuation10 is a GDT of type PriceSpecificationElementPropertyValuation and has the same functionality of PriceSpecificationPropertyValuationPriceSpecificationElementPropertyValuation1.

A serialization of the PriceSpecificationElementPropertyValuations is caused by the given flat structure of the query. The maximum number of 10, that is used here, is no real restriction to any consumer. The hit list is restricted to specifications that are valid for at least one point in time between the valid from and valid to date.

QueryByGroupCode provides a list of SalesPriceLists for the coded representation of a group of price or discount specifications. In some implementations, immediately, after the start up of a session QueryByGroupCode has to be executed. In some implementations The SalesPriceLists provided by QueryByGroupCode can not be changed. These SalesPriceLists are meta data for configuring a user interface at run time. Query elements are defined by the data type SalesPriceListGroupCodeQueryElements. These include PriceSpecificationGroupCode. PriceSpecificationGroupCode is a GDT of type PriceSpecificationGroupCode.

PropertyValuation is the assignment of a value to an identifying property of all specifications for prices, discounts, or surcharges of the list.

SalesPriceListPropertyValuation is of the type GDT SalesPriceListPropertyValuationElements. In certain implementations, these elements include: PriceSpecificationElementPropertyValuation and Description. PriceSpecificationElementPropertyValuation is the assignment of a value to an identifying property of a price list. PriceSpecificationElementPropertyValuation may be based on GDT PriceSpecificationElementPropertyValuation. Description is the description of PriceSpecificationElementPropertyValue in Element PriceSpecificationElementPropertyValuation. Description may be based on GDT Description.

In some implementations, property values may no longer be changed after adding a price specification to the SalesPriceList.

The corresponding property references (SalesPriceListPropertyValuationReferencePropertyID) are variable, however, always for the specified property class (SalesPriceListPropertyDefinitionClassCode) of the root node. They are created during the instantiation of SalesPriceList from the type of representation of the list (SalesPriceListTypeCode). Property references may refer to the external representation of properties, for example, how they appear on the user interface. SalesPriceListPropertyValuation as a generic construction based on a property definition class cannot display associations, for example, to Product, BusinessPartner, or OrganisationalCentre at design time because the corresponding GDTs are not modeled explicitly, but implicitly in the property definition class. Corresponding associations are only known at run time.

A Description is a language-dependent description of a SalesPriceList. The elements located at the Description node are defined by the type GDT SalesPriceListDescriptionElements. In certain implementations, these elements include: Description.

Description is the language-dependent product description. Description may be based on GDT SHORT_Description.

DefaultValues are the default values amount, percent, and base quantity for the specifications to be created for the list. SalesPriceListDefaultValues is of the type GDT SalesPriceListDefaultValuesElements. In certain implementations, these elements include: Amount, BaseQuantity and Percent. Amount is the default amount with currency unit for the specifications and is optional. Amount may be based on GDT Amount. BaseQuantity is the default base quantity with unit of measure relating to the amount for quantity dependent specifications and is optional. BaseQuantity may be based on GDT Quantity. Percent is the default percent for percentage specifications and is optional. Percent may be based on GDT Percent.

In some implementations, for the specification of a price both the Amount and BaseQuantity are relevant; for the specification of a discount or surcharge that is not quantity dependent, only the Amount is relevant, and for the specification of a percentage discount or surcharge, only Percent is relevant.

PriceSpecification is the specification of a price, discount, or surcharge that is used in sales or service documents indirectly via Pricing. The specification is defined for a combination of properties, and is valid for a specific time period. When a price specification is created, the default values can be transferred from the price list header as default.

AttachmentFolder is a collection of all documents attached to a SalesPriceList.

TestCollection 156016 is a collection of all textual descriptions which are related to a SalesPriceList. Each text can be specified in different languages and can include formatting information.

An AccessControlList is a list of access groups that have access to a SalesPriceList during a validity period.

ControlledOutRequest is a controller of output requests and processed output requests related to SalesPriceList. Several output channels are supported for sending out documents.

FIG. 157-1 through 157-11 illustrates one example logical configuration of FormSalesPriceListInformationMessage message 157000. Specifically, this figure depicts the arrangement and hierarchy of various components such as one or more levels of packages, entities, and datatypes, shown here as 157000 through 157330. As described above, packages may be used to represent hierarchy levels. Entities are discrete business elements that are used during a business transaction. Data types are used to type object entities and interfaces with a structure. For example, FormSalesPriceListInformationMessage message 157000 includes, among other things, SalesPriceListInformation 157006. Accordingly, heterogeneous applications may communicate using this consistent message configured as such.

FIG. 158-1 through 158-9 illustrates one example logical configuration of SalesPriceListReplicateConfirmationMessage message 158000. Specifically, this figure depicts the arrangement and hierarchy of various components such as one or more levels of packages, entities, and datatypes, shown here as 158000 through 158234. As described above, packages may be used to represent hierarchy levels. Entities are discrete business elements that are used during a business transaction. Data types are used to type object entities and interfaces with a structure. For example, SalesPriceListReplicateConfirmationMessage message 158000 includes, among other things, SalesPriceListReplicateConfirmation 158016. Accordingly, heterogeneous applications may communicate using this consistent message configured as such.

FIG. 159-1 through 159-9 illustrates one example logical configuration of SalesPriceListReplicateRequestMessage message 159000. Specifically, this figure depicts the arrangement and hierarchy of various components such as one or more levels of packages, entities, and datatypes, shown here as 159000 through 159222. As described above, packages may be used to represent hierarchy levels. Entities are discrete business elements that are used during a business transaction. Data types are used to type object entities and interfaces with a structure. For example, SalesPriceListReplicateRequestMessage message 159000 includes, among other things, SalesPriceListReplicateRequest 159016. Accordingly, heterogeneous applications may communicate using this consistent message configured as such.

SalesPriceList Interface(s)

The message type FormSalesPriceListInformation can be used to show sales price list as preview or for printing sales price list. The FormSalesPriceListInformation is a form for preview and output of a SalesPriceList. The structure of the message type FormSalesPriceListInformation is specified by the message data type FormSalesPriceListInformationMessage. The SalesPriceListInformationMessage can contain the BO SalesPriceList and can be implemented by the sending process component PriceMasterDataManagement.

The SalesPriceListReplicateRequest is a request to replicate a SalesPriceList. The structure of the message type SalesPriceListReplicateRequest may be specified by the message data type SalesPriceListReplicateRequestMessage The SalesPriceListReplicateRequestMessage may contain the BO SalesPriceList and can be implemented by the receiving process component PriceMasterDataManagement.

The SalesPriceListReplicateConfirmation is a confirmation for the request to replicate a SalesPriceList. The structure of the message type SalesPriceListReplicateConfirmation may be specified by the message data type SalesPriceListReplicateConfirmationMessage. The SalesPriceListReplicateConfirmationMessage contains the BO SalesPriceList and can be implemented by the sending process component PriceMasterDataManagement.

The Message-data type FormSalesPriceListInformation may contain: The SalesPriceList business object and the package SalesPriceList package. The SalesPriceListInformationMessage data type can provide the structure for the FormSalesPriceListInformation message type and the operations based on this.

The SalesPriceListPackage may contain the PropertyValuation and PriceSpecification. SalesPriceList is a list of specifications for prices, discounts, or surcharges, and can contain the identifier, the information on the type of representation, the maximum possible characteristics and the validity period. In certain implementations, these elements include: ID, TypeCode, TypeCodeName, ReleaseStatusCode, ReleaseStatusCodeName, CurrencyCode, ValidityPeriod and Description The ID is the identifier of the list. ID may be based on GDT SalesPriceListID.

The TypeCode is the list type. TypeCode may be based on GDT SalesPriceListTypeCode.

The TypeCodeName is the name of the list type. GDT SalesPriceListTypeCode.

The ReleaseStatusCode is the release status of the list. ReleaseStatusCode may be based on GDT NOTRELEASEDRELEASED_ReleaseStatusCode.

The ReleaseStatusCodeName is the name of the release status. ReleaseStatusCodeName may be based on GDT Name.

The CurrencyCode is the currency of the list. CurrencyCode may be based on GDT CurrencyCode.

The ValidityPeriod is the validity period of the list. ValidityPeriod may be based on GDT TimePointPeriod.

The Description is the description of the list and is optional. Description may be based on GDT Description.

PropertyValuation is the assignment of a value to an identifying property of all specifications for prices, discounts, or surcharges of the list. In certain implementations, these elements include: PriceSpecificationElementPropertyValuation and Description.

The PriceSpecificationElementPropertyValuation is the assignment of a value to a property of a sales price specification. PriceSpecificationElementPropertyValuation may be based on GDT PriceSpecificationElementPropertyValuation.

The Description is the description of PriceSpecificationElementPropertyValue in Element PriceSpecificationElementPropertyValuation. Description may be based on GDT Description.

The PriceSpecification package groups together the packages. It may contain the packages: PriceSpecificationPropertyValuation and PriceSpecificationScaleLine.

PriceSpecification is the price, or the percentage of quantity-dependent or quantity-independent discount/surcharge. It may contain information on the type of the price/discount/surcharge, the maximum possible properties of the specification and the period for which the specification is valid. In certain implementations, these elements include: PriceSpecificationElementTypeCode, PriceSpecificationElementTypeCodeName, BaseQuantity, BaseQuantityTypeCode, BaseQuantityTypeCodeName, ValidityPeriod, Amount and Percent.

The PriceSpecificationElementTypeCode is the type of the specification for a price, discount, or surcharge. PriceSpecificationElementTypeCode may be based on GDT PriceSpecificationElementTypeCode.

The PriceSpecificationElementTypeCodeName is the type name of the specification for a price, discount, or surcharge. PriceSpecificationElementTypeCodeName may be based on GDT Name.

The BaseQuantity is the reference quantity with unit of measure, based on the amount for quantity-specific prices, discounts or surcharges and is optional. BaseQuantity may be based on GDT Quantity, Qualifier: Base.

The BaseQuantityTypeCode is the coded representation of a type of BaseQuantity and is optional. BaseQuantityTypeCode may be based on GDT QuantityTypeCode, Qualifier: Base.

The BaseQuantityTypeCodeName is the name of the base quantity type and is optional. BaseQuantityTypeCodeName may be based on GDT Name.

The ValidityPeriod is the validity period for specification. ValidityPeriod may be based on GDT TimePointPeriod.

The Amount is the amount with currency unit and is optional. Amount may be based on GDT Amount.

The Percent is the percentage discount/surcharge and is optional. Percent may be based on GDT Percent.

PropertyValuation is the assignment of a value to a property of a price/discount/surcharge specification. In certain implementations, these elements include: PriceSpecificationPropertyValuation and Description.

The PriceSpecificationPropertyValuation is the assignment of a value to a property of a sales price specification. PriceSpecificationPropertyValuation may be based on GDT PriceSpecificationElementPropertyValuation.

The Description is the description of PriceSpecificationElementPropertyValue in Element PriceSpecificationElementPropertyValuation. Description may be based on GDT Description.

The PriceSpecificationScaleLine package groups together the packages. It may contain the packages: FirstDimensionScaleAxisStep and SecondDimensionScaleAxisStep.

Specification of the price/discount/surcharge for a specific interval of the following: Amounts, including currency unit, Quantities including unit of measure, Decimal numbers and Integers. In certain implementations, these elements include: Amount, BaseQuantity, BaseQuantityTypeCode, BaseQuantityTypeCodeName and Percent.

The Amount is the amount with currency unit and is optional. Amount may be based on GDT Amount.

The BaseQuantity is the reference quantity with unit of measure, based on the amount for quantity-specific prices, discounts or surcharges and is optional. BaseQuantity may be based on GDT Quantity, Qualifier: 'Base'.

The BaseQuantityTypeCode is the coded representation of a type of BaseQuantity and is optional. BaseQuantityTypeCode may be based on GDT QuantityTypeCode, Qualifier: Base.

The BaseQuantityTypeCodeName is the name of BaseQuantityTypeCode and is optional. BaseQuantityTypeCodeName may be based on GDT Name.

The Percent is the percentage for discount/surcharge and is optional. Percent may be based on GDT Percent.

FirstDimensionScaleAxisStep is the step of scale axis for the first scale dimension. In certain implementations, these elements include: ScaleAxisBaseCode, ScaleAxisBaseCodeName, ScaleAxisIntervalBoundaryCode, ScaleAxisIntervalBoundaryCodeName, Amount, Quantity, QuantityTypeCode, QuantityTypeCodeName, Decimalvalue and IntegerValue.

The ScaleAxisBaseCode is the ScaleAxisBaseCode of scale axis step. ScaleAxisBaseCode may be based on GDT ScaleAxisBaseCode.

The ScaleAxisBaseCodeName is the name of ScaleAxisBaseCode. ScaleAxisBaseCodeName may be based on GDT Name.

The ScaleAxisIntervalBoundaryCode is the ScaleAxisIntervalBoundaryCode of scale axis step. ScaleAxisIntervalBoundaryCode may be based on GDT ScaleAxisIntervalBoundaryCode.

The ScaleAxisIntervalBoundaryCodeName is the name of ScaleAxisIntervalBoundaryCode. ScaleAxisIntervalBoundaryCodeName may be based on GDT Name.

The Amount is the amount with currency unit and is optional. Amount may be based on GDT Amount.

The Quantity is the reference quantity with unit of measure, based on the amount for quantity-specific prices, discounts or surcharges and is optional. Quantity may be based on GDT Quantity.

The QuantityTypeCode is the coded representation of a type of Quantity and is optional. QuantityTypeCode may be based on GDT QuantityTypeCode.

The QuantityTypeCodeName is the name of QuantityTypeCode and is optional. QuantityTypeCodeName may be based on GDT Name.

Decimalvalue is optional. Decimalvalue may be based on GDT DecimalValue.

The IntegerValue is optional. IntegerValue may be based on GDT IntegerValue.

The SecondDimensionScaleAxisStep is the step of scale axis for the second scale dimension. In certain implementations, these elements include: ScaleAxisBaseCode, ScaleAxisBaseCodeName, ScaleAxisIntervalBoundaryCode, ScaleAxisIntervalBoundaryCodeName, Amount, Quantity, QuantityTypeCode, QuantityTypeCodeName, Decimalvalue and IntegerValue.

The ScaleAxisBaseCode is the ScaleAxisBaseCode of scale axis step. ScaleAxisBaseCode may be based on GDT ScaleAxisBaseCode.

The ScaleAxisBaseCodeName is the name of ScaleAxisBaseCode. ScaleAxisBaseCodeName may be based on GDT Name.

The ScaleAxisIntervalBoundaryCode is the ScaleAxisIntervalBoundaryCode of scale axis step. ScaleAxisIntervalBoundaryCode may be based on GDT ScaleAxisIntervalBoundaryCode.

The ScaleAxisIntervalBoundaryCodeName is the name of ScaleAxisIntervalBoundaryCode. ScaleAxisIntervalBoundaryCodeName may be based on GDT Name.

The Amount is the amount with currency unit and is optional. Amount may be based on GDT Amount.

The Quantity is the reference quantity with unit of measure, based on the amount for quantity-specific prices, discounts or surcharges and is optional. Quantity may be based on GDT Quantity.

The QuantityTypeCode is the coded representation of a type of Quantity and is optional. QuantityTypeCode may be based on GDT QuantityTypeCode.

The QuantityTypeCodeName is the name of QuantityTypeCode and is optional. QuantityTypeCodeName may be based on GDT Name.

The Decimalvalue is optional. Decimalvalue may be based on GDT DecimalValue.

The IntegerValue is optional. IntegerValue may be based on GDT IntegerValue.

The Message-data type SalesPriceListReplicateRequest can contain the SalesPriceList business object. It may also contain the following packages: MessageHeader package and SalesPriceListReplicateRequest package. The SalesPriceListReplicateRequestMessage data type may provide the structure for the SalesPriceListReplicateRequest message type and the operations based on this.

A Messageheader package is a grouping of business information that is relevant for sending a business document in a message. It contains the node MessageHeader.

MessageHeader

The MessageHeader is a grouping of business information from the perspective of the sending application. It may contain: Information to identify the business document in a message, Information about the sender and Information about the recipient. The MessageHeader can contain SenderParty and RecipientParty. It is of the type GDT: BusinessDocumentMessageHeader, and In certain implementations, may include the following elements ID, ReferenceID.

SalesPriceListReplicateRequest Package contains the package: PriceSpecification. SalesPriceListReplicateRequest is a request to replicate a SalesPriceList. It may contain the entity SalesPriceList.

SalesPriceList is a list of specifications for prices, discounts, or surcharges, and can contain the identifier, the information on the type of representation, the maximum possible characteristics and the validity period. It can also contain the entities Description and PropertyValuation. In certain implementations, these elements include: ID, AcceptanceStatusCode, TypeCode, CurrencyCode, ValidityPeriod and PropertyDefinitionClassCode.

The ID is the identifier of the list. ID may be based on GDT SalesPriceListID.

The AcceptanceStatusCode is the acceptance status of the replicate price list and is optional. AcceptanceStatusCode may be based on GDT AcceptanceStatusCode.

The TypeCode is the list type. TypeCode may be based on GDT SalesPriceListTypeCode.

The CurrencyCode is the currency of the list. CurrencyCode may be based on GDT CurrencyCode.

The ValidityPeriod is the validity period of the list. ValidityPeriod may be based on GDT TimePointPeriod.

The PropertyDefinitionClassCode is the property definition class code of the list. PropertyDefinitionClassCode may be based on GDT PriceSpecificationElementPropertyDefinitionClassCode.

Description is a description of the list.

PropertyValuation is the assignment of a value to an identifying property of all specifications for prices, discounts, or surcharges of the list. In certain implementations, these elements include: PriceSpecificationElementPropertyValuation.

PriceSpecificationElementPropertyValuation is the assignment of a value to a property of a sales price specification. PriceSpecificationElementPropertyValuation may be based on GDT PriceSpecificationElementPropertyValuation.

PriceSpecification is the price, or the percentage of quantity-dependent or quantity-independent discount/surcharge. It may contain information on the type of the price/discount/surcharge, the maximum possible properties of the specification and the period for which the specification is valid. It can contain the entities PropertyValuation and ScaleLine. In certain implementations, these elements include: PriceSpecificationElementTypeCode, BaseQuantity, BaseQuantityTypeCode, ValidityPeriod, Amount and Percent. The PriceSpecificationElementTypeCode is the type of the specification for a price, discount, or surcharge. PriceSpecificationElementTypeCode may be based on GDT PriceSpecificationElementTypeCode. The BaseQuantity is the reference quantity with unit of measure, based on the amount for quantity-specific prices, discounts or surcharges and is optional. BaseQuantity may be based on GDT Quantity with Base. The BaseQuantityTypeCode is the coded representation of a type of BaseQuantity and is optional. BaseQuantityTypeCode may be based on GDT QuantityTypeCode, with qualifier Base. The ValidityPeriod is the validity period for specification. ValidityPeriod may be based on GDT TimePointPeriod. The Amount is the amount with currency unit and is optional. Amount may be based on GDT Amount. The Percent is the percentage discount/surcharge and is optional. Percent may be based on GDT Percent.

PropertyValuation is the assignment of a value to a property of a price/discount/surcharge specification. In certain implementations, these elements include: PropertyValuation. PropertyValuation is the assignment of a value to a property of a sales price specification and is optional. PropertyValuation may be based on GDT PriceSpecificationElementPropertyValuation.

ScaleLine is the specification of the price/discount/surcharge for a specific interval of the following: amounts, including currency unit, quantities including unit of measure, decimal numbers and integers. In certain implementations, these elements include ScaleLine. ScaleLine is the scale lines of a price specification and is optional. ScaleLine may be based on GDT PriceSpecificationElementScaleLine.

The Message-data type SalesPriceListReplicateConfirmation may contain: The SalesPriceList business object. Also, It may contain the following packages: MessageHeader package and SalesPriceListReplicateConfirmation package. The SalesPriceListReplicateConfirmationMessage data type can provide the structure for the SalesPriceListReplicateConfirmation message type and the operations based on this.

MessageHeader Package is a grouping of business information that is relevant for sending a business document in a message. It may contain the node MessageHeader.

The MessageHeader is a grouping of business information from the perspective of the sending application. It may include: Information to identify the business document in a message, information about the sender and information about the recipient. The MessageHeader can contain: SenderParty and RecipientParty. It is of the type GDT: BusinessDocumentMessageHeader, and the following elements of the GDT may be used: ID, ReferenceID.

SalesPriceListReplicateConfirmation Package can contain the packages: PriceSpecification The SalesPriceListReplicateConfirmation is a confirmation for the request to replicate a SalesPriceList. It may contain the entities: SalesPriceList, Description and PropertyValuation.

The SalesPriceList is a list of specifications for prices, discounts, or surcharges, and may contain the identifier, the information on the type of representation, the maximum possible characteristics and the validity period. In certain implementations, these elements include: ID, AcceptanceStatusCode, TypeCode, CurrencyCode, ValidityPeriod and PropertyDefinitionClassCode.

The ID is the Identifier of the list. ID may be based on GDT SalesPriceListID.

The AcceptanceStatusCode is the acceptance status of the replicate price list. AcceptanceStatusCode may be based on GDT AcceptanceStatusCode.

The TypeCode is the list type. TypeCode may be based on GDT SalesPriceListTypeCode.

The CurrencyCode is the currency of the list. CurrencyCode may be based on GDT CurrencyCode.

The ValidityPeriod is the validity period of the list. ValidityPeriod may be based on GDT TimePointPeriod.

The PropertyDefinitionClassCode is the property definition class code of the list. PropertyDefinitionClassCode may be based on GDT PriceSpecificationElementPropertyDefinitionClassCode.

Description is the Description of the list. In certain implementations, these elements include: Description. Description may be based on GDT Description.

PropertyValuation is the assignment of a value to an identifying property of all specifications for prices, discounts, or surcharges of the list. The PriceSpecificationElementPropertyValuation is the assignment of a value to a property of a sales price specification. PriceSpecificationElementPropertyValuation may be based on GDT PriceSpecificationElementPropertyValuation.

PriceSpecification is the price, or the percentage of quantity-dependent or quantity-independent discount/surcharge. It may contain information on the type of the price/discount/surcharge, the maximum possible properties of the specification and the period for which the specification is valid. It may contain the entities PropertyValuation and ScaleLine. In certain implementations, these elements include:

The PriceSpecificationElementTypeCode is the type of the specification for a price, discount, or surcharge. PriceSpecificationElementTypeCode may be based on GDT PriceSpecificationElementTypeCode. The BaseQuantity is the reference quantity with unit of measure, based on the amount for quantity-specific prices, discounts or surcharges and is optional. BaseQuantity may be based on GDT Quantity, with qualifier Base. The BaseQuantityTypeCode is the coded representation of a type of BaseQuantity and is optional. BaseQuantityTypeCode may be based on GDT QuantityTypeCode, with qualifier Base. The ValidityPeriod is the validity period for specification. ValidityPeriod may be based on GDT TimePointPeriod. The Amount is the amount with currency unit and is optional. Amount may be based on GDT Amount. The Percent is the percentage discount/surcharge and is optional. Percent may be based on GDT Percent.

PropertyValuation is the assignment of a value to a property of a price/discount/surcharge specification. In certain implementations, these elements include: PropertyValuation.

The PropertyValuation is the assignment of a value to a property of a price specification and is optional. PropertyValuation may be based on GDT PriceSpecificationElementPropertyValuation.

ScaleLine is the pacification of the price/discount/surcharge for a specific interval of the following: amounts, including currency unit, quantities including unit of measure, decimal numbers and integers. In certain implementations, these elements include: ScaleLine. ScaleLine is the scale lines of a price specification and is optional. ScaleLine may be based on GDT PriceSpecificationElementScaleLine.

Business Object SalesPriceSpecification

FIG. 160 illustrates one example of an SalesPriceSpecification business object model 160002. Specifically, this model depicts interactions among various hierarchical components of the SalesPriceSpecification, as well as external components that interact with the SalesPriceSpecification (shown here as 160000 and 160004).

SalesPriceSpecification is the specification of a price, a discount, or a surcharge for sales and service. The specification is defined for a combination of properties and is valid for a specific period. The specification of a price, a discount, or a surcharge is evaluated within the scope of price calculation which is called during sales and service document processing. A Sales Price Specification can be based on specific combinations of master data, for example, material, buyer and business configuration data, for example, customer group. A Sales Price Specification defines a price of 5 Euro per piece for the material “Refrigerator A-100”, applicable for a customer group “Retail”, and valid from Jan. 1 to Dec. 31, 2005. The properties are the material and the customer group, and the property values are “Refrigerator A-100” for the material and “Retail” for the customer group. The Business Object SalesPriceSpecification is used in the LDUs CustomerRelationshipManagement and CustomerInvoicing. It is therefore in the AP Foundation Layer.

The SalesPriceList is involved in the following process integration models: PriceMasterDataManagement, PriceMasterDataManagementAtCustomer and Service Interface Sales Price Specification Replication Out. The technical name is PriceMasterDataManagementSalesPriceSpecificationReplicationOut. The interface Sales Price Specification Replication Out service interface can group the operations for generating confirmations of replicated sales price specifications at the Price Master Data Management.

The technical name for ConfirmSalesPriceSpecificationReplication is PriceMasterDataManagementSalesPriceSpecificationReplicationOut.ConfirmSalesPriceSpecificationReplication. The ConfirmSalesPriceSpecificationReplication operation may confirm the replication of sales price specifications. The operation is based on the SalesPriceSpecificationReplicateConfirmation message (MDT: SalesPriceSpecificationReplicateConfirmation), that is derived from the business objects SalesPriceSpecification.

The technical name for Service Interface Sales Price Specification Replication In is PriceMasterDataManagementSalesPriceSpecificationReplicationIn. The Interface Sales Price Specification Replication In service interface can group the operations for generating sales price specification replications at Price Master Data Management The technical name for ReplicateSalesPriceSpecification is PriceMasterDataManagementSalesPriceSpecificationReplicationIn.ReplicateSalesPriceSpecification. The ReplicateSalesPriceSpecification operation can replicate sales price specifications. The operation is based on the SalesPriceSpecificationReplicateRequest message (MDT: SalesPriceSpecificationReplicateRequest), that is derived from the business objects SalesPriceSpecification.

The Node Structure of the Business Object SalesPriceSpecification is the price, or the percentage of quantity-dependent or quantity-independent discount/surcharge. It may contain information on the type of the price/discount/surcharge, the maximum possible properties of the specification and the period for which the specification is valid. A SalesPriceSpecification 160006 can contain the following elements: PropertyValuation 160008 having a cardinality relationship of 1:cn. ScaleLine 160010 having a cardinality relationship of 1:cn. AccessControlList 160012 having a cardinality relationship of 1:1.

The elements located on the SalesPriceSpecification node are defined by the SalesPriceSpecificationElements GDT. In certain implementations, these elements include: UUID, PriceSpecificationElementPropertyDefinitionClassCode, WorstLogItemSeverityCode, Status, ReleaseStatus, ConsistencyStatus, PropertyValueSearchText, PriceSpecificationElementTypeCode, ValidityPeriod, SystemAdministrativeData, Amount, BaseQuantity, BaseQuantityTypeCode, Percent and PriceSpecificationElementScaleExistsIndicator.

The UUID is a universal identifier, which can be unique, of a SalesPriceSpecification on which other business objects can define external keys. UUID may be based on GDT UUID.

The PriceSpecificationElementPropertyDefinitionClassCode is the code for the property definition class that can define the maximal possible properties for this SalesPriceSpecification. PriceSpecificationElementPropertyDefinitionClassCode may be based on GDT PriceSpecificationElementPropertyDefinitionClassCode.

The WorstLogItemSeverityCode is the worst log message severity that occurs for this SalesPriceSpecification. WorstLogItemSeverityCode may be based on GDT LogItemSeverityCode.

The Status can give information whether the price/discount/surcharge specification is released and whether errors on this specification have occurred. Status may be based on IDT PriceSpecificationStatus. In certain implementations, elements of Status include: ReleaseStatus and ConsistencyStatus. ReleaseStatus may determine whether Status can be 'released' or not 'released'. ReleaseStatus may be based on GDT ReleaseStatusCode. ConsistencyStatus contains the information about the consistency of the object, for example, whether errors occurred. ConsistencyStatus may be based on GDT ConsistencyStatusCode.

PropertyValueSearchText is a text that is concatenated by all the property values of the node PropertyValuation and is optional. PropertyValueSearchText may be based on GDT SearchText. PriceSpecificationElementTypeCode is the type of the specification for a price, discount, or surcharge. PriceSpecificationElementTypeCode may be based on GDT PriceSpecificationElementTypeCode. ValidityPeriod is the validity period of the specification. ValidityPeriod may be based on GDT TimePointPeriod. SystemAdministrativeData is the administrative data stored by the system. SystemAdministrativeData may be based on GDT SystemAdministrativeData. Amount is the amount with currency unit and is optional. Amount may be based on GDT Amount. BaseQuantity is the reference quantity with unit of measure, based on the amount for quantity-specific prices, discounts or surcharges and is optional. BaseQuantity may be based on GDT Quantity, Qualifier Base. BaseQuantityTypeCode is the coded representation of a type of BaseQuantity and is optional. BaseQuantityTypeCode may be based on GDT QuantityTypeCode, Qualifier Base. Percent is the percentage discount/surcharge and is optional. Percent may be based on GDT Percent. PriceSpecificationElementScaleExistsIndicator is the information whether scales exist for this root instance. PriceSpecificationElementScaleExistsIndicator may be based on GDT Indicator, Qualifier PriceSpecificationElementScaleExists.

In some implementations, the WorstLogItemSeverityCode is assigned by the system once all elements of the root node and all lower-level nodes have been checked. In this instance, it can not be set by a consumer. In case the specification has errors, ReleaseStatus is set to 'Not Released' by the system and can not be changed. The attributes PriceSpecificationElementTypeCode and PriceSpecificationElementPropertyDefinitionClassCode are part of the semantic key, and can not be changed once it has been saved. ValidityPeriod can be processed on a day-by-day basis. The TimePointTypeCode that occurs in SalesPriceSpecificationValidityPeriodStartTimePoint and SalesPriceSpecificationValidityPeriodEndTimePoint is set to 1. The SystemAdministrativeData is set internally by the system and can not be assigned or changed externally. One of the elements Amount and Percent is filled. BaseQuantity may, but does not have to be filled if data is entered under Amount.

In some implementations, the Amount and BaseQuantity are relevant for defining a price, only the Amount is relevant for defining a quantity-independent discount/surcharge, and only Percent is relevant for defining a percentage-based discount/surcharge. AmountCurrencyCode and BaseQuantityUnitCode can not be changed once you have saved your entries.

In some implementations, a UUID is required because the price document contains a reference to a SalesPriceSpecification. A UUID can be specified externally in the Create function. In some implementations, a UUID is the only unique ID for a SalesPriceSpecification. This can only be read by the system. Within the framework of pricing, only a SalesPriceSpecification that contains no errors or was saved with a warning will be taken into account (WorstLogItemSeverityCode=1 or =2). ReleaseStatus can be set by a consumer, whereas ConsistencyStatus is set internally by the system.

The root node contains parts of the semantic key for a SalesPriceSpecification instance. At a specific time on the time axis defined by ValidityDateTimePeriod, such an instance may be identified by the following: PropertyDefinitionClassCode, PriceSpecificationElementTypeCode, and the part of the association on the subnode PropertyValuation for which PriceSpecificationElementPropertyValuationIdentifyingTypeIndicator=1. The following Inbound Aggregation Relationships may exist. CreationIdentity has a cardinality relationship of 1:cn and is the identity that created the SalesPriceSpecification. LastChangeIdentity has a cardinality relationship of c:cn and is the identity that changed the SalesPriceSpecification in the last time.

ChangeRate is an action that can change the amount or percentage for multiple specifications. Preconditions: ChangeRate can have multiple rows as input and can be called whenever a consumer wishes to mass change the amount or percentage of several BO instances. When changes to the object occur, Amount or Percent element of BO is changed. When changes to other objects occur, Amount or Percent element of input BO instances is changed. ChangeRate is defined by the GDT: SalesPriceSpecificationChangeRateActionElements. In certain implementations, these elements include: Amount, Percent and RoundingRule.

The Amount is an absolute amount change and is optional. Amount may be based on GDT Amount. The Percent is the percentage change of the amount or the percent and is optional. Percent may be based on GDT Percent. The RoundingRule is the rounding rule to be applied after the rate change and is optional. RoundingRule may be based on GDT RoundingRule.

In some implementations, either Amount or Percent is passed, An amount change is reasonable only in case SalesPriceSpecificationAmount is filled for all input rows. Although a modify can do a mass-change, the ChangeRate action is accompanied with rounding rules are not part of the standard modify.

ChangeValidityPeriod is an action that can change the validity period for multiple specifications. Preconditions: ChangeValidityPeriod has multiple rows as input and can be called whenever a consumer wishes to mass change the ValidityPeriod of several BO instances. When changes to the object occur, the ValidityPeriod attribute of input BO's is changed. ChangeValidityPeriod is defined by the GDT: SalesPriceSpecificationChangeValidityPeriodActionElements. In certain implementations, these elements include: ValidityPeriod. The ValidityPeriod is the new target date period for all input rows—maps to the ValidityPeriod root-attribute of BO. ValidityPeriod may be based on GDT TimePointPeriod.

CreateWithReference is an action that can create one or more new BO instances on the basis of an existing one(s). In some implementations, CreateWithReference has multiple rows as input and can be called whenever a consumer wishes to create BO instances on the basis of existing ones. CreateWithReference has no parameters as input.

CleanUp rolls back price changes of multiple sales price specifications that are not saved yet.

The following are queries for SalesPriceSpecification.

QueryByGroupCode provides a list of SalesPriceSpecifications for a group of price, discount, or surcharge specifications. The search elements for restricting the hit list are defined using the GDT: SalesPriceSpecificationGroupCodeQueryElements. It can include the following elements: GroupCode. GroupCode is a GDT of type PriceSpecificationGroupCode and is the group of price, discount or surcharge specifications that is searched for. In some implementations, QueryByGroupCode has to be executed immediately after the start up of a session. In some implementations, the SalesPriceSpecification provided by QueryByGroupCode can not be changed. These SalesPriceSpecifications are meta data for configuring a user interface at run time.

QueryByTypeAndPropertyIDAndPropertyValue is a search for a SalesPriceSpecification based on the type of the price/discount/surcharge specification, on not more than 10 property IDs together with their property values, on a valid from date, and on a valid to date. The search elements for restricting the hit list are defined using the GDT: SalesPriceSpecificationTypeAndPropertyIDAndPropertyValueQueryElements. It can contain the following elements: PriceSpecificationElementTypeCode, ValidityPeriodStartTimePoint, ValidityPeriodEndTimePoint, PropertyValuationPriceSpecificationElementPropertyValuation1, PropertyValuationPriceSpecificationElementPropertyValuation2, PropertyValuationPriceSpecificationElementPropertyValuation3, PropertyValuationPriceSpecificationElementPropertyValuation4, PropertyValuationPriceSpecificationElementPropertyValuation5, PropertyValuationPriceSpecificationElementPropertyValuation6, PropertyValuationPriceSpecificationElementPropertyValuation7, PropertyValuationPriceSpecificationElementPropertyValuation8, PropertyValuationPriceSpecificationElementPropertyValuation9, PropertyValuationPriceSpecificationElementPropertyValuation10.

PriceSpecificationElementTypeCode is a GDT of type PriceSpecificationElementTypeCode and represents the type of the specification for a price, discount, or surcharge. ValidityPeriodStartTimePoint is a GDT of type TimePoint and is valid from date of the search mapped to SalesPriceSpecificationTimePointPeriodStartTimePoint. ValidityPeriodEndTimePoint is a GDT of type TimePoint and is valid to date of the search—mapped to SalesPriceSpecificationValidityPeriodEndTimePoint. PropertyValuationPriceSpecificationElementPropertyValuation1 is a GDT of type PriceSpecificationElementPropertyValuation. The PriceSpecificationElementPropertyValuation of at least one PropertyValuation node corresponds with the specified PropertyValuationPriceSpecificationElementPropertyValuation1. PropertyValuationPriceSpecificationElementPropertyValuation2 is a GDT of type PriceSpecificationElementPropertyValuation and has the same functionality as PropertyValuationPriceSpecificationElementPropertyValuation1. PropertyValuationPriceSpecificationElementPropertyValuation3 is a GDT of type PriceSpecificationElementPropertyValuation and has the same functionality as PropertyValuationPriceSpecificationElementPropertyValuation1. PropertyValuationPriceSpecificationElementPropertyValuation4 is a GDT of type PriceSpecificationElementPropertyValuation and has the same functionality as PropertyValuationPriceSpecificationElementPropertyValuation1. PropertyValuationPriceSpecificationElementPropertyValuation5 is a GDT of type PriceSpecificationElementPropertyValuation and has the same functionality as PropertyValuationPriceSpecificationElementPropertyValuation1. PropertyValuationPriceSpecificationElementPropertyValuation6 is a GDT of type PriceSpecificationElementPropertyValuation and has the same functionality as PropertyValuationPriceSpecificationElementPropertyValuation1. PropertyValuationPriceSpecificationElementPropertyValuation7 is a GDT of type PriceSpecificationElementPropertyValuation and has the same functionality as PropertyValuationPriceSpecificationElementPropertyValuation1. PropertyValuationPriceSpecificationElementPropertyValuation8 is a GDT of type PriceSpecificationElementPropertyValuation and has the same functionality as PropertyValuationPriceSpecificationElementPropertyValuation1. PropertyValuationPriceSpecificationElementPropertyValuation9 is a GDT of type PriceSpecificationElementPropertyValuation and has the same functionality as PropertyValuationPriceSpecificationElementPropertyValuation1. PropertyValuationPriceSpecificationElementPropertyValuation10 is a GDT of type PriceSpecificationElementPropertyValuation and has the same functionality as PropertyValuationPriceSpecificationElementPropertyValuation1.

In some implementations, a serialization of the PriceSpecificationElementPropertyValuations is caused by the given flat structure of the query. The maximum number of 10, that is used here, is no real restriction to any consumer.

The hit list is restricted to specifications that are valid for at least one point in time between the valid from and valid to date.

QueryByTypeandSearchText is a search for a SalesPriceSpecification based on its type and a search text for the property values. The search elements for restricting the hit list are defined using the GDT: SalesPriceSpecificationTypeAndPropertyIDAndPropertyValueQueryElements. It can contain the following elements: PriceSpecificationElementTypeCode, SearchText, ValidityPeriodStartTimePoint, ValidityPeriodEndTimePoint. PriceSpecificationElementTypeCode is a GDT of type PriceSpecificationElementTypeCode and is the type of the specification for a price, discount, or surcharge. SearchText is a GDT of type SearchText and is the Search Text for property values. ValidityPeriodStartTimePoint is a GDT of type TimePoint and is valid from date of the search—mapped to the date part of SalesPriceSpecificationTimePointPeriodStartTimePoint. ValidityPeriodEndTimePoint is a GDT or type TimePoint and is valid to date of the search—mapped to the date part of SalesPriceSpecificationTimePointPeriodEndTimePoint.

PropertyValuation is the assignment of a value to a property of a price/discount/surcharge specification. In certain implementations, these elements include: PriceSpecificationElementPropertyValuation and Description.

The PriceSpecificationElementPropertyValuation is the assignment of a value to a property of a sales price specification. PriceSpecificationElementPropertyValuation may be based on GDT PriceSpecificationElementPropertyValuation.

The Description is the description of PriceSpecification-ElementPropertyValue in Element PriceSpecificationElementPropertyValuation. Description may be based on GDT Description.

PropertyValuation is of the type GDT: SalesPriceSpecificationPropertyValuation Elements In some implementations, the property valuations that have a TypeIndicator=1 (identifying) can not be changed as part of the semantic key once a SalesPriceSpecification has been saved. At least one property valuation can be identifying.

Identifying property references can be used. Characterizing property references are optional fields in a specification. Use case for characterizing property valuations: In the first step, the access part of pricing determines the price, discount/surcharge, and the characterizing property valuations of the specification found, based on the PriceSpecificationElementTypeCode and the identifying property valuations. The characterizing property valuations can then be available in the access part itself or in exits in the subsequent evaluation part of pricing, for individual fine-tuned control. There is a varying quantity of corresponding property references (PropertyValuationPropertyReferencePropertyID) and a number of values. They always stem from the defined PropertyDefinitionClassCode, however). The references are determined during the instantiation of the SalesPriceSpecification, based on the type for the price/discount/surcharge (PriceSpecificationElementTypeCode). The property references can relate to the external representation of the property valuations, and are visible on the user interface, for example. If the sequence of identifying property valuations is changed, the semantics of the SalesPriceSpecification is not changed. The identifying property valuations can be used as inbound values in pricing, for example, to determine the gross price of a sales order. PropertyValuation based on a property definition class, can not refer to a Product, BusinessPartner, or OrganisationalCentre at the time of design, as the corresponding GDTs are modeled implicitly, rather than explicitly in the property definition class. The corresponding associations are known at runtime.

ScaleLine is the specification of the price/discount/surcharge for a specific interval of the following: Amounts, including currency unit, Quantities including unit of measure, Decimal numbers and Integers. ScaleLine has the GDT: PriceSpecificationScaleLineElements. In certain implementations, ScaleLine contains the elements: FirstDimensionScaleAxisStep, SecondDimensionScaleAxisStep, Amount, BaseQuantity, BaseQuantityTypeCode, and Percent.

The FirstDimensionScaleAxisStep is the step of scale axis for the first scale dimension. FirstDimensionScaleAxisStep may be based on GDT ScaleAxisStep.

The SecondDimensionScaleAxisStep is the step of scale axis for the second scale dimension and is optional. SecondDimensionScaleAxisStep may be based on GDT ScaleAxisStep.

The Amount is the amount with currency unit and is optional. Amount may be based on GDT Amount. The BaseQuantity is the reference quantity with unit of measure, based on the amount for quantity-specific prices, discounts or surcharges and is optional. BaseQuantity may be based on GDT Quantity, with qualifier Base. The BaseQuantityTypeCode is the coded representation of a type of BaseQuantity and is optional. BaseQuantityTypeCode may be based on GDT QuantityTypeCode, with qualifier base. The Percent is the percentage for discount/surcharge and is optional. Percent may be based on GDT Percent.

In some implementations, all scale lines of an instance may have the same value for IntervalBoundaryTypeCode and the same value for ScaleAxisBaseCode ("header fields"). One of the elements Amount and Percent is filled. BaseQuantity may be, but does not have to be filled if data is entered under Amount. In some implementations, for all scale line, the same elements in the set (Amount, BaseQuantity, and Percent) are filled. Amount-CurrencyCode and Quantity-UnitCode can not be changed once they have been created and saved, and can have the same values for all scale lines. Exactly one of the elements Amount, Quantity, DecimalValue, IntegerValue in FirstDimensionScaleAxisStep and SecondDimensionScaleAxisStep is filled, always for all scale lines.

The GDT: ScaleAxisStep has n certain implementations, the following elements: ScaleAxisBaseCode is the scale axis base code. ScaleAxisBaseCode may be based on GDT ScaleAxisBaseCode. The IntervalBoundaryTypeCode is a type of scale axis step interval boundary (1=Base scale 2=To-scale). IntervalBoundaryTypeCode may be based on GDT ScaleAxisStepIntervalBoundaryTypeCode. The Amount is the amount with currency unit and is optional. Amount may be based on GDT Amount. The Quantity is the quantity with currency unit and is optional. Quantity may be based on GDT Quantity. The QuantityTypeCode is the coded representation of a type of Quantity and is optional. The DecimalValue is the decimal number and is optional. DecimalValue may be based on GDT DecimalValue. The IntegerValue is the integer and is optional. IntegerValue may be based on GDT IntegerValue. The intervals specified in the definition are implicitly defined from the IntervalBoundaryTypeCodes of two consecutive scale lines. ScaleAxisBaseCode and IntervalBoundaryTypeCode can not be changed once you have saved your entries. One individual amount—including the currency unit, one quantity—including the unit of measure, one decimal number or one integer can be transferred as an inbound value in pricing. Pricing may determine the price/surcharge/discount, taking account of any intervals that have been defined. For the value IntervalBoundaryTypeCode=1, a scale line is implicitly set with the smallest possible Amount, Quantity, DecimalValue, and IntegerValue in the corresponding element of the root node of SalesPriceSpecification. It may not be explicitly set. This means that a scale line From 0 Euro (or from 0 piece) is possible, but not necessary. In some implementations, two-dimensional price scales are only possible in special scenarios (CRM Leasing).

The AccessControlList is a list of access groups that have access to a SalesPriceSpecification during a validity period.

FIG. 161-1 through 161-7 illustrates one example logical configuration of SalesPriceSpecifica-tionReplicateConfirma-tionMessage message 161000. Specifically, this figure depicts the arrangement and hierarchy of various components such as one or more levels of packages, entities, and datatypes, shown here as 161000 through 160178. As described above, packages may be used to represent hierarchy levels. Entities are discrete business elements that are used during a business transaction. Data types are used to type object entities and interfaces with a structure. For example, SalesPriceSpecifica-tionReplicateConfirma-tionMessage message 161000 includes, among other things, SalesPriceSpecifica-tionReplicateConfir-mation 161016. Accordingly, heterogeneous applications may communicate using this consistent message configured as such.

FIG. 162-1 through 162-7 illustrates one example logical configuration of SalesPriceSpecifica-tionReplicateRequest-Message message 162000. Specifically, this figure depicts the arrangement and hierarchy of various components such as one or more levels of packages, entities, and datatypes, shown here as 162000 through 160172. As described above, packages may be used to represent hierarchy levels. Entities are discrete business elements that are used during a business transaction. Data types are used to type object entities and interfaces with a structure. For example, SalesPriceSpecificationReplicateRequest-Message message 162000 includes, among other things, SalesPriceSpecifica-tionReplicateRequest 162016. Accordingly, heterogeneous applications may communicate using this consistent message configured as such.

SalesPriceSpecification Interface(s)

A SalesPriceSpecificationReplicateRequest is a request to replicate a SalesPriceSpecification. The structure of the message type SalesPriceSpecificationReplicateRequest is specified by the message data type SalesPriceSpecificationReplicateRequestMessage. Structural limitations or integrity conditions of the SalesPriceSpecificationReplicateRequest regarding the message data type SalesPriceSpecificationReplicateRequestMessage are listed in the respective part of section 2. The SalesPriceSpecificationReplicateRequestMessage contains the BO SalesPriceSpecification and can be implemented by the receiving process component PriceMasterDataManagement.

A SalesPriceSpecificationReplicateConfirmation is a confirmation for the request to replicate a SalesPriceSpecification. The structure of the message type SalesPriceSpecificationReplicateConfirmation may be specified by the message data type SalesPriceSpecificationReplicateConfirmationMessage. Structural limitations or integrity conditions of the SalesPriceSpecificationReplicateConfirmation regarding the message data type SalesPriceSpecificationReplicateConfirmationMessage are listed in the respective part of section 3. The SalesPriceSpecificationReplicateConfirmationMessage can contain the BO SalesPriceSpecification and can be implemented by the sending process component PriceMasterDataManagement.

The Message-data type SalesPriceSpecificationReplicateRequest may contain the SalesPriceSpecification business object. It may contain the following packages: MessageHeader package (see section 3.1) and SalesPriceSpecificationReplicateRequest package (see section 3.2). The SalesPriceSpecificationReplicateRequestMessage data type can provide the structure for the SalesPriceSpecificationReplicateRequest message type and the operations based on this.

MessageHeader Package

The MessageHeader Package is a grouping of business information that is relevant for sending a business document in a message. It may contain the node: MessageHeader.

MessageHeader

The MessageHeader is a grouping of business information from the perspective of the sending application: Information to identify the business document in a message, Information about the sender and Information about the recipient which is optional. The MessageHeader may contain: SenderParty and RecipientParty. It is of the type GDT: BusinessDocumentMessageHeader, and the following elements of the GDT are used: ID, ReferenceID. SalesPriceSpecificationReplicateRequest Package SalesPriceSpecificationReplicateRequest The SalesPriceSpecificationReplicateRequest is a request to replicate a SalesPriceSpecification. It may contain the entity SalesPriceSpecification.

The SalesPriceSpecification is the price, or the percentage of quantity-dependent or quantity-independent discount/surcharge. It may contain information on the type of the price/discount/surcharge, the maximum possible properties of the specification and the period for which the specification is valid. It may contain the entities: PropertyValuation and ScaleLine. In certain implementations, these elements include: PriceSpecificationElementTypeCode, BaseQuantity, BaseQuantityTypeCode, ValidityPeriod, Amount, Percent and AcceptanceStatusCode.

The PriceSpecificationElementTypeCode is a type of the specification for a price, discount, or surcharge. PriceSpecificationElementTypeCode may be based on GDT PriceSpecificationElementTypeCode.

The BaseQuantity is the reference quantity with unit of measure, based on the amount for quantity-specific prices, discounts or surcharges and is optional. BaseQuantity may be based on GDT Quantity, Qualifier Base. The BaseQuantityTypeCode is the coded representation of a type of BaseQuantity and is optional. BaseQuantityTypeCode may be based on GDT QuantityTypeCode, Qualifier Base.

The ValidityPeriod is the validity period for specification. ValidityPeriod may be based on GDT TimePointPeriod. The Amount is the amount with currency unit and is optional. Amount may be based on GDT Amount. The Percent is the percentage discount/surcharge and is optional. Percent may be based on GDT Percent. The AcceptanceStatusCode is the acceptance status of the replicate price list and is optional. AcceptanceStatusCode may be based on GDT AcceptanceStatusCode.

The PropertyValuation is the assignment of a value to a property of a price/discount/surcharge specification. In certain implementations, the elements include: PropertyValuation.

The PropertyValuation is the assignment of a value to a property of a sales price specification and is optional. PropertyValuation may be based on GDT PriceSpecificationElementPropertyValuation.

A ScaleLine is the specification of the price/discount/surcharge for a specific interval of the following: Amounts, including currency unit, Quantities including unit of measure, Decimal numbers and Integers. In certain implementations, the elements include: ScaleLine.

The ScaleLine is the assignment of a value to a property of a sales price specification and is optional. GDT PriceSpecificationElementScaleLine.

SalesPriceSpecificationReplicateConfirmationMessage

The Message-data type SalesPriceSpecificationReplicateConfirmation may contain the SalesPriceSpecification business object. It may also contain the following packages: MessageHeader package and SalesPriceSpecificationReplicateConfirmation package. The SalesPriceSpecificationReplicateConfirmationMessage data type can provide the structure for the SalesPriceSpecificationReplicateConfirmation message type and the operations based on this.

A messageheader Package is a grouping of business information that is relevant for sending a business document in a message. It may contain the node MessageHeader.

MessageHeader

A MessageHeader is a grouping of business information from the perspective of the sending application: Information to identify the business document in a message, Information about the sender and Information about the recipient which is optional. The MessageHeader may contain: SenderParty and RecipientParty. It is of the type GDT: BusinessDocumentMessageHeader, and the following elements of the GDT may be used: ID, ReferenceID.

A SalesPriceSpecificationReplicateConfirmation is a confirmation for the request to replicate a SalesPriceSpecification. It may contain the entity SalesPriceSpecification.

PriceSpecification is the price, or the percentage of quantity-dependent or quantity-independent discount/surcharge. It may contain information on the type of the price/discount/surcharge, the maximum possible properties of the specification and the period for which the specification is valid. It may contain the entities: PropertyValuation and ScaleLine. In certain implementations, these elements include: PriceSpecificationElementTypeCode, BaseQuantity, BaseQuantityTypeCode, ValidityPeriod, Amount, Percent and AcceptanceStatusCode.

The PriceSpecificationElementTypeCode represents type of the specification for a price, discount, or surcharge. PriceSpecificationElementTypeCode may be based on GDT PriceSpecificationElementTypeCode. The BaseQuantity is the reference quantity with unit of measure, based on the amount for quantity-specific prices, discounts or surcharges and is optional. BaseQuantity may be based on GDT Quantity, Qualifier Base. The BaseQuantityTypeCode is a coded representation of a type of BaseQuantity and is optional. BaseQuantityTypeCode may be based on GDT QuantityTypeCode, Qualifier Base. The ValidityPeriod is the validity period for specification. ValidityPeriod may be based on GDT TimePointPeriod. The Amount is an amount with currency unit. Amount may be based on GDT Amount. The Percent is the percentage discount/surcharge and is optional. Percent may be based on GDT Percent. The AcceptanceStatusCode is the acceptance status of the replicate price list. AcceptanceStatusCode may be based on GDT AcceptanceStatusCode.

PropertyValuation is the assignment of a value to a property of a price/discount/surcharge specification. In certain implementations, the elements include: PropertyValuation.

The PropertyValuation is the assignment of a value to a property of a sales price specification and is optional. PropertyValuation may be based on GDT PriceSpecificationElementPropertyValuation.

ScaleLine is a specification of the price/discount/surcharge for a specific interval of the following: Amounts, including currency unit, Quantities including unit of measure, Decimal numbers and Integers. In certain implementations, the elements include: ScaleLine.

The ScaleLine is the assignment of a value to a property of a sales price specification and is optional. ScaleLine may be based on GDT PriceSpecificationElementScaleLine.

FIG. 163 illustrates one example of an ServiceIssueCategoryCatalogue business object model 163006. Specifically, this model depicts interactions among various hierarchical components of the ServiceIssueCategoryCatalogue, as well as external components that interact with the ServiceIssueCategoryCatalogue (shown here as 163000 through 163004 and 163008 through 163014).

A ServiceIssueCategoryCatalogue is a structured directory of issue categories that group business transactions in Customer Service from an objective or a subjective point of view. In this context, the business transactions are, for example, service requests, service orders, and service confirmations, for which relevant documents are created ("service transactions"). Issues are recorded by assigning issue categories ("categorization") to a service transaction. This can be done for different aspects, for example, damage to a product, or for the cause of certain damage. Example: Service Transaction: "Service Request", Aspect: "Damage" or Categories: "Display", "Input Device", "Computer Unit". In particular, categorization of service transactions is used to group them, and is typically used later for analysis purposes. By means of a hierarchical directory structure of issue categories, it is possible to express dependencies between the categories: depending on the level of detail that is necessary to describe a service transaction using issue categories, additional, more specific categories are defined underneath the main categories. The number of directory levels in the structure is unlimited. Example: Aspect: "Damage", Main Category: "Display" or More Specific Categories: "No picture", "Picture flickers". In the simplest case, a ServiceIssueCategoryCatalogue can represent a flat list of categories. Categories of a ServiceIssueCategoryCatalogue can be linked to certain business objects, to control the service transactions. The linked business objects can be, for example, materials. With such a link, appropriate categories can be limited or proposed for selection after the processor of a service request has entered the damaged product. Solutions can also be linked to categories that can then be proposed to the processor of a service request after a category has been selected.

In some implementations, the business object ServiceIssueCategoryCatalogue is not part of a process component. It is used by the following process components: Service Request Processing, Service Order Processing and/or Service Confirmation Processing.

The business object ServiceIssueCategoryCatalogue consists of three basic levels: The root node (ServiceIssueCategoryCatalogue 163018) can represent the basic aspect that can be described in a service transaction; A structured set of categories (node Category) describing and grouping a service transaction (according to a certain aspect) is assigned to the aspect; The products that can be used to limit the selection of categories when a service transaction is processed are assigned to each category (node CategoryProduct).

A ServiceIssueCategoryCatalogue is a structured directory of issue categories that group business transactions in Customer Service from an objective or a subjective point of view. A ServiceIssueCategoryCatalogue may have a validity period from a business point of view. Each instance of a ServiceIssueCategoryCatalogue can display a version of a catalog, and has its own VersionUUID (as primary key). All instances of catalogs with the same ID are interpreted of versions of one another. There is no common UUID for all versions of a catalog. The elements found on the ServiceIssueCategoryCatalogue node are defined by the type NDT ServiceIssueCategoryCatalogueElements. In certain implementations, these elements include: VersionUUID, ID, VersionID, ValidityPeriod, Status, TypeCode, ProfileCode, SystemAdministrativeData and Key. The VersionUUID is an alternative Key is a universal identifier, which can be unique, of an issue category catalog and its version. VersionUUID may be based on GDT UUID.

The ID is an identifier of an issue category catalog. ID may be based on GDT ServiceIssueCategoryCatalogueID. The VersionID is an identifier of the version of an issue category catalog. VersionID may be based on GDT VersionID. The ValidityPeriod is a validity period of the version of an issue category catalog. ValidityPeriod may be based on GDT UPPEROPEN_GLOBAL_DateTimePeriod Qualifier Validity. The Status is the status of the version of an issue category catalog. Status may be based on IDT ServiceIssueCategoryCatalogueStatus. LifecycleStatusCode is the status of the version of an issue category catalog within its life cycle. LifecycleStatusCode may be based on GDT ServiceIssueCategoryCatalogueLifecycleStatusCode.

The TypeCode is a coded representation of type of issue category catalog that indicates the semantic relationship of the categories included in the catalog. TypeCode may be based on GDT IssueCategoryCatalogueTypeCode. The ProfileCode is a coded representation of profile of issue category catalog, that contains control parameters for the maintenance and usage of the catalog. ProfileCode may be based on GDT ServiceIssueCategoryCatalogueProfileCode. The SystemAdministrativeData is the administrative data (stored in the system) relating to the version of an issue category catalog. SystemAdministrativeData may be based on GDT SystemAdministrativeData.

The Key is an alternative, structured key for identification, which can be unique, of an issue category catalog, and its version. Key may be based on IDT ServiceIssueCategoryCatalogueKey. ServiceIssueCategoryCatalogueID is an identifier of an issue category catalog. ServiceIssueCategoryCatalogueID may be based on GDT ServiceIssueCategoryCatalogueID. ServiceIssueCategoryCatalogueVersionID is an identifier of the version of an issue category catalog. ServiceIssueCategoryCatalogueVersionID may be based on GDT VersionID.

There may be a number of Composition Relationships to Subordinate Nodes, including the following. Name 163028 may have a cardinality of 1:cn. Description 163030 may have a cardinality of 1:cn. Usage 163032 may have a cardinality of 1:cn. Category 163020 may have a cardinality of 1:cn.

There may be a number of Inbound Association Relationships including the following. CreationIdentity may have a cardinality of 1:cn and is the association of the Identity business object. The CreationIdentity can be used for granting access to the person who has created a version of a ServiceIssueCategoryCatalogue. LastChangeIdentity may have a cardinality of c:cn and is the association of the Identity business object. The LastChangeIdentity may be used for granting access to the person who last changed a version of a ServiceIssueCategoryCatalogue.

Universality of the type of an issue category catalog within its versions. The type of an issue category catalog (element TypeCode) is constant within all related versions. Universality of the profile of an issue category catalog within its versions. The profile of an issue category catalog (element ProfileCode) is constant within all related versions. Chronological versioning: When an issue category catalog is released (using the "Release" action), the following checks are carried out (status change "In Preparation" to "Released"): ValidityPeriodStartDateTime>Current time stamp: Only changes that are relevant for the future may be released, so that existing business documents remain consistent. No overlapping of validity periods of released versions: The validity periods of different versions of an issue category catalog that have been released may not overlap nor block each other. When a version is released, any existing overlap with validity periods of previous versions that have already been released will be resolved, if possible, by means of adjusting the interval limits of the latest released version. Example for resolving an overlap: Situation: Version A, valid from Jan. 1, 2005 until Dec. 31, 2100 is released and Version B, valid from Oct. 1, 2005 until Dec. 31, 2100 is released; Result: Version A, valid from Jan. 1, 2005 until Oct. 1, 2005 is released and Version B, valid from Oct. 1, 2005 until Dec. 31, 2100 is released.

With the above-mentioned checks, a well-defined chronological sequence of issue category catalogs with the same ID ("time versions") with the "Released" status is guaranteed. This is important, since issue category catalogs with these statuses are visible to the applications using it.

Issue category catalogs with the "In Preparation" status do not need to fulfill the last two checks, since they can also have interim states during maintenance.

ServiceIssueCategoryCatalogue may do the following: CreateVersion, Revise (S&AM action) and Delete.

CreateVersion (static action) creates a new version of a relevant issue category catalog. In some implementations, the action has the following properties: It has no parameters and execution creates the new version "In Preparation" in the lifecycle status. Release (S&AM action): Release of a version of a relevant issue category catalog for use in business cases. In some implementations, the action has the following properties: It has no parameters and execution is only possible if the following requirements are fulfilled: Modeled requirement: The lifecycle status of the version is "In Preparation". Implemented requirement: Validity end of the version has not yet been reached and Execution sets the lifecycle status of the version to "Released".

Revise (S&AM action): Withdrawal of release of a version of a relevant issue category catalog. In some implementations, the action has the following properties: It has no parameters, Execution is only possible if the following requirements are fulfilled: Modeled requirement: The lifecycle status of the version is "Released". Implemented requirement: Validity start of version has not yet been reached and execution sets the lifecycle status of the version to "In Preparation".

Delete: Delete a version of a relevant issue category catalog. In some implementations, the action has the following properties: It has no parameters and execution is only possible if the lifecycle status of the version to be deleted is "In Preparation".

QueryByElements searches for category catalogs using a combination of attribute values. A list of issue category catalogs (more precisely, catalog versions) is returned. The data type ServiceIssueCategoryCatalogueElementsQueryElements can define the Query parameters: ID, ValidityDateTime, ValidityPeriod, LifeCycleStatusCode, NameName, DescriptionDescription, TypeCode, ProfileCode, UsageUsageCode, UsageBusinessTransactionDocumentProcessingTypeCode, UsageKnowledgeBaseArticleProcessingTypeCode, CreationDateTime, CreationBusinessPartnerCommonPersonNameFamilyName, CreationBusinessPartnerCommonPersonNameGivenName, LastChangeDateTime, LastChangeBusinessPartnerCommonPersonNameGivenName. ID is of GDT type ServiceIssueCategoryCatalogueID and is the identifier of an issue category catalog. ValidityDateTime is of GDT type GLOBAL_DateTime and is a point in time when the sought issue category catalogs should be valid. In some implementations, the relevant point in time can be within the validity period of a category catalog (attribute ValidityPeriod on the root node). ValidityPeriod is of GDT type UPPEROPEN_GLOBAL_DateTimePeriod and is the validity period during which the sought category catalogs should be valid. Validity periods and issue category categories overlap when the intersection of the given validity period and the validity period of a catalog version (attribute ValidityPeriod on the root node) is not empty. LifeCycleStatusCode is of GDT type ServiceIssueCategoryCatalogueLifecycleStatusCode and represents the status of the sought issue category catalog within its lifecycle. NameName is of GDT type Name (Representation _MEDIUM_Name) with qualifier: ServiceIssueCategoryCatalogueName and is a short description of the sought issue category catalog. DescriptionDescription is of GDT type Description (Representation _MEDIUM_Description) with qualifier: ServiceIssueCategoryCatalogueDescription and is a description of the sought issue category catalog. TypeCode is of GDT type IssueCategoryCatalogueTypeCode and is a coded representation of type of issue category catalog that indicates the semantic relationship of the categories included in the catalog. ProfileCode is of GDT type ServiceIssueCategoryCatalogueProfileCode and is a coded representation of profile of issue category catalog that contains control parameters for the maintenance and usage of the catalog. UsageUsageCode is of IDT type ServiceIssueCategoryCatalogueUsageStatus and represents a user of the sought issue category catalogs. UsageBusinessTransactionDocumentProcessingTypeCode is of GDT type BusinessTransactionDocumentProcessingTypeCode and is a processing type of the issue category catalogs in business documents. UsageKnowledgeBaseArticleProcessingTypeCode is of GDT type KnowledgeBaseArticleProcessingTypeCode and is a processing type of the issue category catalogs used in customer problems and solutions. CreationDateTime is of GDT type GLOBAL_DateTime and is the creation date/time of the issue category catalogs sought. CreationBusinessPartnerCommonPersonNameFamilyName is of GDT type LANGUAGEINDEPENDENT_MEDIUM_Name and is the family name of the person who created the sought issue category catalogs. CreationBusinessPartnerCommonPersonNameGivenName is of GDT type LANGUAGEINDEPENDENT_MEDIUM_Name and is the first name of the person who created the sought issue category catalogs. LastChangeDateTime is of GDT type GLOBAL_DateTime and is the last change date/time of the issue category catalogs sought. LastChangeBusinessPartnerCommonPersonNameFamilyName is of GDT type LANGUAGEINDEPENDENT_MEDIUM_Name and is the family name of the person who last changed the sought issue category catalogs. LastChangeBusinessPartnerCommonPersonNameGivenName is of GDT type LANGUAGEINDEPENDENT_MEDIUM_Name and is the first name of the person who last changed the sought issue category catalogs.

QueryByUsage searches for issue category catalogs according to information on usage. A list is returned of those issue category catalogs (more precisely: those catalog versions) that, at a given time, are valid (that is, the point in time falls within the validity period of the catalog version) and released (that is, the lifecycle status is "Released"). The data type ServiceIssueCategoryCatalogueUsageQueryElements can define the Query parameters: UsageUsageCode, UsageBusinessTransactionDocumentProcessingTypeCode, and ValidityDateTime. UsageUsageCode is of IDT type ServiceIssueCategoryCatalogueUsageStatus and represents the user of the sought issue category catalogs. UsageBusinessTransactionDocumentProcessingTypeCode is of GDT type BusinessTransactionDocumentProcessingTypeCode is of GDT type BusinessTransactionDocumentProcessingTypeCode and represents the processing type of the issue category catalogs in business documents. UsageKnowledgeBaseArticleProcessingTypeCode is of GDT type KnowledgeBaseArticleProcessingTypeCode and represents the processing type of the issue category catalogs used in customer problems and solutions. ValidityDateTime is of GDT type GLOBAL_DateTime and is the time for identifying the released catalog versions. In some implementations the relevant point in time can fall within the validity period of a released catalog version (attribute ValidityPeriod on the root node). If no entry is made, the current time is taken A Name is a language-dependent short description of an issue category catalog, for example, ID: "DAMAGE" and/or Name: "Damage". The elements located on the Name node are defined by the type NDT ServiceIssueCategoryCatalogueNameElements. In certain implementations, these elements include: Name.

The Name is a Short description of an issue category catalog. Name may be based on GDT Name Representation _MEDIUM_Name Qualifier ServiceIssueCategoryCatalogName.

In some implementations, the language key (attribute LanguageCode of the GDT Name) may be specified and can be valid.

A Description is a language-dependent, more detailed description of the meaning of an issue category catalog, for example, ID: "DAMAGE", Name: "Damage" and/or Description: "Screen damage, Version 0". The elements located on the Description node are defined by the type NDT ServiceIssueCategoryCatalogueDescriptionElements. In certain implementations, these elements include: Description. The Description is a description of an issue category catalog. Description may be based on GDT Description (Representation _MEDIUM_Description) with qualifier ServiceIssueCategoryCatalogueDescription. In some implementations, the language key (attribute LanguageCode of the GDT Description) can be specified and can be valid.

A Usage is the specification of a field of application for issue category catalogs in Customer Service, for example, ID: "DAMAGE", Name: "Damage" and Usage: "Service Request". The elements located on the Usage node may be defined by the type NDT ServiceIssueCategoryCatalogueUsageElements. In certain implementations, these elements include: UsageCode, BusinessTransactionDocumentProcessingTypeCode and KnowledgeBaseArticleProcessingTypeCode.

The UsageCode is a coded representation of an object that uses issue category catalogs in Customer Service. Examples: service request, service order, service confirmation, customer problem and solution. UsageCode may be based on GDT ServiceIssueCategoryCatalogueUsageCode.

The BusinessTransactionDocumentProcessingTypeCode is a coded representation of the processing type of a business document in Customer Service, for example, a service request, a service order, or a service confirmation and is optional. BusinessTransactionDocumentProcessingTypeCode may be based on GDT BusinessTransactionDocumentProcessingTypeCode.

The KnowledgeBaseArticleProcessingTypeCode is a coded representation of the processing type of a customer problem and solution. KnowledgeBaseArticleProcessingTypeCode may be based on GDT KnowledgeBaseArticleProcessingTypeCode.

The specification of an object that uses issue category catalogs, as well as the related processing type, may define an application area. In some implementations, consistency of the application area depending on the object that uses issue category catalogs, either the BusinessTransactionDocumentProcessingTypeCode or the KnowledgeBaseArticleProcessingTypeCode can be specified as the processing type. In addition, the specified processing type can be valid for the object, for example, UsageCode="Service Order", BusinessTransactionDocumentProcessingTypeCode="Repair Order" and UsageCode="Customer Problem and Solution" or KnowledgeBaseArticleProcessingTypeCode="Helpdesk Solution". Also, Cardinality between usage area and category catalog for each object that uses issue category catalogs (UsageCode), business configuration may specify how many released issue category catalogs may be assigned to an application area at any given time.

A Category represents an issue that groups business transactions in Customer Service according to an objective or a subjective point of view. The elements located on the Category node are defined by the type NDT ServiceIssueCategoryCatalogueCatagoryElements. In certain implementations, these elements include: UUID, ID, TypeCode, SystemAdministrativeData, ServiceIssueCategoryCatalogueVersionUUID, Key and ServiceIssueCategoryID, ServiceIssueCategoryCatalogueVersionUUID. The UUID is an alternative key that is a universal identifier, which can be unique, of an issue category. UUID may be based on GDT UUID. The ID is an identifier of an issue category. ID may be based on GDT ServiceIssueCategoryID. The TypeCode is a coded representation of the type of an issue category. TypeCode may be based on GDT ServiceIssueCategoryTypeCode.

The SystemAdministrativeData is administrative data that is stored in a system. SystemAdministrativeData may be based on GDT SystemAdministrativeData.

The ServiceIssueCategoryCatalogueVersionUUID is a universal identifier, which can be unique, of an issue category catalog and its version. ServiceIssueCategoryCatalogueVersionUUID may be based on GDT UUID.

The Key is an alternative, structured key for identification, which can be unique, of an issue category. Key may be based on IDT ServiceIssueCategoryKey. ServiceIssueCategoryID is an identifier of an issue category which may be based on GDT ServiceIssueCategoryID. ServiceIssueCategoryCatalogueVersionUUID is a universal identifier, which can be unique, of an issue category catalog and its version. ServiceIssueCategoryCatalogueVersionUUID may be based on GDT UUID.

There may be a number of Composition Relationships to Subordinate Nodes including the following. CategoryName 163024 may have a cardinality of 1:cn. CategoryDescription 163026 may have a cardinality of 1:cn. CategoryProduct 163022 may have a cardinality of 1:cn.

There may be a number of Inbound aggregation relationships including the following. ParentCategory may have a cardinality of c:cn. The category that is superordinate to a particular category is derived from the association ParentCategory on the node Category.

There may be a number of Inbound Association Relationships including the following. CreationIdentity may have a cardinality of 1:cn and is the association of the Identity business object. CreationIdentity may be used to grant access to the person who has created a Category. LastChangeIdentity may have a cardinality of c:cn and is the association of the Identity business object. LastChangeIdentity be used to grant access to the person who last changed a Category.

There may be a number of (Specialization) Associations for Navigation including the following. RootCategory may have a cardinality of 1:1. The main category that belongs to a category is determined by means of the association RootCategory on the node Category. ChildCategory may have a cardinality of 1:cn. In some implementations, Starting with the main categories, a hierarchy is built top-down using the association ChildCategory on the node Category.

In some implementations, a uniqueness check for the category identifier refers only to a single instance of an issue category catalog; that is, the category identifiers do not need to be unique across multiple instances of issue category catalogs.

Hierarchical and Attributive Categorization: The type of uniqueness check depends on what type of relationship is chosen for the categories (attribute TypeCode of the root node ServiceIssueCategoryCatalogue):

In some implementations, in a Hierarchical Relationship, all category identifiers used can be unique. In an Attributive Relationship, all identifiers used for the hierarchy leaf nodes can be unique. The same identifiers are allowed above the leaf nodes, however only on the same hierarchy level ("semantic duplicates"). Semantic duplicates may not have the same ParentCategory.

A MoveTo action involves Moving an issue category (including any subcategories) within the category hierarchy. The action has the following properties: The data type ServiceIssueCategoryCatalogueCategoryMovetoActionElements defines the Action parameters which can include ID. ID is a GDT of type ServiceIssueCategoryID and is an identifier of the category that is to be placed above the category to be moved. If no identifier is specified, the category to be moved becomes the main category. In some implementations, execution is only possible if the lifecycle status of the relevant catalog version is "In Preparation".

QueryByElements searches for category catalogs using a combination of attribute values in all catalog versions. A list of issue categories is returned. The data type ServiceIssueCategoryCatalogueCategoryElementsQueryElements defines the Query parameters which can include: ID, ServiceIssueCategoryCatalogueID, ServiceIssueCategoryCatalogueValidityDateTime, ServiceIssueCategoryCatalogueLifecycleStatusCode, CategoryNameName, CategoryDescriptionDescription, TypeCode, CreationDateTime, CreationBusinessPartnerCommonPersonNameFamilyName, CreationBusinessPartnerCommonPersonNameGivenName, LastChangeDateTime, LastChangeBusinessPartnerCommonPersonNameFamilyName, LastChangeBusinessPartnerCommonPersonNameGivenName. ID is of GDT type ServiceIssueCategoryID and is an identifier of the sought issue categories. ServiceIssueCategoryCatalogueID is of GDT type ServiceIssueCategoryCatalogueID and is an identifier of the catalog that should contain the sought issue categories. ServiceIssueCategoryCatalogueValidityDateTime is of GDT type GLOBAL_DateTime and is a point in time at which the sought category catalogs should be valid. In some implementations, the relevant point in time can be within the validity period of a category catalog (attribute ValidityPeriod on the root node). ServiceIssueCategoryCatalogueLifecycleStatusCode is of GDT type ServiceIssueCategoryCatalogueLifecycleStatusCode and is the status of the sought issue category catalog within its lifecycle. CategoryNameName is of GDT type Name (Representation _MEDIUM_Name) with qualifier ServiceIssueCategoryName and is a short description of the sought issue category catalog. CategoryDescriptionDescription is of GDT type Description (Representation _MEDIUM_Description) with qualifier ServiceIssueCategoryDescription and is a description of the sought issue category catalogs. TypeCode is of GDT type ServiceIssueCategoryTypeCode and is a coded representation of the type of the sought issue categories. CreationDateTime is of GDT type GLOBAL_DateTime and represents the creation date/time of the issue categories. CreationBusinessPartnerCommonPersonNameFamilyName is of GDT type LANGUAGEINDEPENDENT_MEDIUM_Name and is a family name of the person who created the sought issue categories. CreationBusinessPartnerCommonPersonNameGivenName is of GDT type LANGUAGEINDEPENDENT_MEDIUM_Name and is a first name of the person who created the sought issue categories. LastChangeDateTime is of GDT type GLOBAL_DateTime and is the last change date/time of the sought issue categories. LastChangeBusinessPartnerCommonPersonNameFamilyName is of GDT type LANGUAGEINDEPENDENT_MEDIUM_Name and is a family name of the person who last changed the sought issue categories. LastChangeBusinessPartnerCommonPersonNameGivenName is of GDT type LANGUAGEINDEPENDENT_MEDIUM_Name and is a first name of the person who last changed the sought issue categories.

QueryByHierarchy searches for subordinate issue categories in a version of a specific catalog that, at a given time, is valid (that is, the point in time falls within the validity period of the catalog version) and released (that is, the lifecycle status is "Released"). A list of issue categories is returned.

The data type ServiceIssueCategoryCatalogueCategoryHierarchyQueryElements defines the Query parameters which can include: ParentCategoryID, TypeCode, ServiceIssueCategoryCatalogueID, ServiceIssueCategoryCatalogueUsageUsageCode, ServiceIssueCategoryCatalogueUsageBusinessTransactionDocumentProcessingTypeCode, ServiceIssueCategoryCatalogueUsageKnowledgeBaseArticleProcessingTypeCode, ServiceIssueCategoryCatalogueValidityDateTime. ParentCategoryID is of GDT type ServiceIssueCategoryID and is an identification of a sought partial tree of issue categories within a catalog. TypeCode is of GDT type ServiceIssueCategoryTypeCode and is a coded representation of the type of the sought issue categories. ServiceIssueCategoryCatalogueID is of GDT type ServiceIssueCategoryCatalogueID and is an identifier of the catalog that should contain the sought issue categories. ServiceIssueCategoryCatalogueUsageUsageCode is of GDT type ServiceIssueCategoryCatalogueUsageCode. User of the catalog that should contain the sought issue categories. ServiceIssueCategoryCatalogueUsageBusinessTransactionDocumentProcessingTypeCode is of GDT type BusinessTransactionDocumentProcessingTypeCode and is the processing type of the business documents used. ServiceIssueCategoryCatalogueUsageKnowledgeBaseArticleProcessingTypeCode is of GDT type KnowledgeBaseArticleProcessingTypeCode and is the processing type of the issue category catalogs used in customer problems and solutions. ServiceIssueCategoryCatalogueValidityDateTime is of GDT type GLOBAL_DateTime and is the Date/time for identification of released catalog version in which the sought issue categories should be contained. In some implementations, the relevant point in time can fall within the validity period of the catalog version (attribute ValidityPeriod on the root node). If no entry is made, the current time is taken.

A CategoryName is a language-dependent short description of an issue category, for example, ID: "DAMAGE", CategoryID: "NO_DISPLAY" and CategoryName: "No picture". The elements located on the CategoryName node are defined by the type NDT ServiceIssueCategoryCatalogueCategoryNameElements. In certain implementations, these elements include: Name.

The Name is a short description of an issue category. Name may be based on GDT NameRepresentation _MEDIUM_ Name Qualifier ServiceIssueCategoryName. In some implementations, the language key (attribute LanguageCode of the GDT Name) can be specified and can be valid.

A CategoryDescription is a language-dependent, more detailed description of the meaning of a category, for example, ID: "DAMAGE", CategoryID: "NO_DISPLAY", CategoryName: "No picture" and CategoryDescription: "The screen is completely dark". The elements located on the CategoryDescription node are defined by the type NDT ServiceIssueCategoryCatalogueCategoryDescriptionElements. In certain implementations, these elements include: Description.

A Description is the description of an issue category. Description may be based on GDT Description Representation _MEDIUM_Description Qualifier ServiceIssueCategoryDescription.

In some implementations, the language key (attribute LanguageCode of the GDT Description) may be specified and can be valid.

A CategoryProduct is a product or a number of products used to determine the relevance of an issue category in a service transaction. The elements located on the CategoryProduct node are defined by the type NDT ServiceIssueCategoryCatalogueCategoryProductElements. In certain implementations, these elements include: ProductID and ProductCategoryID.

The ProductID is an identifier of a product, and is optional. ProductID may be based on GDT ProductID.

The ProductCategoryID is an identifier of a product category with which a number of products are determine, that is, all products that are assigned to the product category, and is optional. ProductCategoryID may be based on GDT ProductCategoryID.

There may be a number of Inbound Association Relationships including the following. Material may have a cardinality of c:cn and is an association of the business object Material. Material pertains to assignment of a material that is relevant for a category. ProductCategory may have a cardinality of c:cn and is an association of the ProductCategory node in the ProductCategoryHierarchy business object. ProductCategory pertains to assignment of a product category that is relevant for an issue category. In some implementations, either a ProductID or a ProductCategoryID may be specified. It is not permitted to specify a ProductID and a ProductCategoryID at the same time. In some implementations, for the ProductID only products of the type "Material" may be specified. For the ProductCategoryID only those product categories that have at least one material assigned to them may be specified.

FIG. 164 illustrates one example of an SiteLogisticsProcessModel business object model 164003. Specifically, this model depicts interactions among various hierarchical components of the SiteLogisticsProcessModel, as well as external components that interact with the SiteLogisticsProcessModel (shown here as 164000 through 164002 and 164004 through 164008).

Business Object SiteLogisticsProcessModel is a model of logistics process that is specified by a sequence of site logistics process segments. The business object SiteLogisticsProcessModel resides in the foundation layer, in the process component Site Logistics Model Management. The process described by a SiteLogisticsProcessModel can be: Standard receiving, Receipt of returned goods, Standard shipping, Shipping of returned goods, Replenishment and Cleanup. A SiteLogisticsProcessModel contains: Information about the type of the process, for example, standard receiving, standard shipping, represented by the model. (SiteLogisticsProcessModel) and Information about a single Site Logistics Process Segment, which makes up the complete process described by the SiteLogisticsProcessModel (SiteLogisticsProcessSegment).

SiteLogisticsProcessModel is represented by the node SiteLogisticsProcessModel 164010.

Business Object SiteLogisticsProcessModel is a model of logistics process that is specified by a sequence of site logistics process segments. It contains information about the type of process, for example, standard receiving, standard shipping, represented by the model. The elements located at the node SiteLogisticsProcessModel are defined by the data type:

SiteLogisticsProcessModelElements. In certain implementations, these elements include: ID is a universal identifier, which can be unique, of the SiteLogisticsProcessModel. ID may be based on GDT SiteLogisticsProcessModelID. UUID is a universal identifier, which can be unique, of the SiteLogisticsProcessModel for referencing purposes. UUID may be based on GDT UUID.

SystemAdministrativeData indicates the system user and the points of alteration time of the SiteLogisticsProcessModel. SystemAdministrativeData may be based on GDT SystemAdministrativeData. TypeCode is a coded representation of the type of the process described by the SiteLogisticsProcessModel. TypeCode may be based on GDT SiteLogisticsProcessModelTypeCode.

There may be a number of composition relationships to subordinate nodes including the following. ProcessSegment 164012 may have a cardinality relationship of 1:cn. Status 164014 may have a cardinality relationship of 1:1. HierarchicalViewElement 164016 may have a cardinality relationship of 1:n. AttachmentFolder 164020 may have a cardinality relationship of 1:c. TextCollection 164022 may have a cardinality relationship of 1:cn. Description 164024 may have a cardinality relationship of 1:cn.

There may be a number of Inbound Association Relationships including: 1) From the business object Identity as follows. CreationIdentity may have a cardinality relationship of 1:cn and denotes the Identity that created the SiteLogisticsProcessModel. LastChangeIdentity may have a cardinality relationship of c:cn and denotes the Identity that changed the SiteLogisticsProcessModel in the last time.

There may be a number of Associations for Navigation including: 1) To business object (or node) ReleasedSiteLogisticsProcessModel as follows. ReleasedSiteLogisticsProcessModel may have a cardinality relationship of 1:cn and denotes the ReleasedSiteLogisticsProcessModels which were generated out of the SiteLogisticsProcessModel. FirstProcessSegment may have a cardinality relationship of 1:c Denotes the process segment which is first in processing order.

Enterprise Service Infrastructure Action: A Copy creates a new SiteLogisticsProcessModel based on an existing SiteLogisticsProcessModel. The precondition is a predefined SiteLogisticsProcessModel that is to be copied. The changes to the object are the source SiteLogisticsProcessModel remains unchanged. A completely new SiteLogisticsProcessModel is created with a different UUID, ID and system administrative data. The consistency status of the newly created SiteLogisticsProcessModel is 'check pending'. Objects associated with the source SiteLogisticsProcessModel are not copied but only referenced by the newly created one.

The parameters are that the action elements are defined by the data type: SiteLogisticsProcessModelCopyActionElements. In certain implementations, these elements include: TargetSiteLogisticsProcessModelID. The TargetSiteLogisticsProcessModelID is an identifier, which can be unique, of the Site Logistics Process Model to be created. TargetSiteLogisticsProcessModelID may be based on GDT SiteLogisticsProcessModelID Qualifier Target. The usage action may be called from the UI to copy an existing Site Logistics Process Model, thereby saving time and effort when defining a new similar SiteLogisticsProcessModel.

MarkForRelease marks a SiteLogisticsProcessModel for release. When a marked SiteLogisticsProcessModel is saved, a ReleasedSiteLogisticsProcessModel will be generated out of the SiteLogisticsProcessModel. Using this action, the information contained in the SiteLogisticsProcessModel is released, and can be used for site logistics processing. ReleasedSiteLogisticsProcessModel is required for executing a site logistics process. It is created by copying the original master data found in a SiteLogisticsProcessModel at a chosen point in time. The generation is done during the save phase of the SiteLogisticsProcessModel. The changes to the object are that if the SiteLogisticsProcessModel in not consistent, a consistency check is called. The check may set the status of the SiteLogisticsProcessModel. The changes to other objects are that this action calls the business object ReleasedSiteLogisticsProcessModel and creates a new ReleasedSiteLogisticsProcessModel instance.

The user may call the Usage action after the SiteLogisticsProcessModel has been changed and the user would like to apply the new information for site logistics processing.

QueryByElements provides a list of all Site Logistics Process Models which match by different attributes.

Query elements are defined by the data type: SiteLogisticsProcessModelElementsQueryElements. These elements can include: ID, TypeCode, ConsistencyStatusCode, SystemAdministrativeDataCreationDateTime, CreationBusinessPartnerCommonPersonNameGivenName, CreationBusinessPartnerCommonPersonNameFamilyName, SystemAdministrativeDataLastChangeDateTime LastChangeBusinessPartnerCommonPersonNameGivenName, LastChangeBusinessPartnerCommonPersonNameFamilyName. ID is of GDT type SiteLogisticsProcessModelID. TypeCode is of GDT type SiteLogisticsProcessModelTypeCode. ConsistencyStatusCode is of GDT type ConsistencyStatusCode. SystemAdministrativeDataCreationDateTime is of GDT type DateTime with qualifier Creation. SystemAdministrativeDataLastChangeDateTime is of GDT type DateTime with qualifier LastChange.

QueryBySiteLogisticsProcessSegment provides a list of all SiteLogisticsProcessModels which are composed of the SiteLogisticsProcessSegment matched the query element SiteLogisticsProcessSegmentID. Query elements are defined by the data type: SiteLogisticsProcessModelSiteLogisticsProcessSegmentQueryElements. These elements can include: SiteLogisticsProcessSegmentID. SiteLogisticsProcessSegmentID is of GDT type SiteLogisticsProcessSegmentID and is the unique identifier of the SiteLogisticsProcessSegment which is a segment of the SiteLogisticsProcessModel.

QueryBySiteLogisticsBillOfOperations provides a list of all SiteLogisticsProcessModels which composed of the Bill of Operations matches the query element BillOfOperationsID. Query elements are defined by the data type: SiteLogisticsProcessModelSiteLogisticsBillOfOperationsQueryElements. These elements can include: BillOfOperationsID. BillOfOperationsID is of GDT type BillOfOperationsID and is the unique identifier of the Site Logistics BillOfOperations which reside in a SiteLogisticsProcessSegment that is a segment of the SiteLogisticsProcessModel.

ProcessSegment specifies a segment of a site logistics process, which describes operations for moving, packing or checking stock in a distribution center. The elements located at the node ProcessSegment are defined by the data type: SiteLogisticsProcessModelProcessSegmentElements. In certain implementations, these elements include: ID, UUID and AutomaticProcessingIndicator. ID is an identifier, which can be unique, of the ProcessSegment. ID may be based on GDT SiteLogisticsProcessModelProcessSegmentID. UUID is a universal identifier, which can be unique, of a ProcessSegment. UUID may be based on GDT UUID. AutomaticProcessingIndicator Indicates whether a process segment in a site logistics process model shall be processed automatically, or not. AutomaticProcessingIndicator may be based on GDT AutomaticProcessingIndicator Qualifier AutomaticProcessing.

There may be a number of Inbound Aggregation Relationships including: 1) From the business object (or node) SiteLogisticsProcessSegment as follows. Assigned SiteLogisticsProcessSegment may have a cardinality relationship of 1:cn. Denotes the SiteLogisticsProcessSegment which by itself or in combination with others, builds the complete process described by the SiteLogisticsProcessModel.

Consistency Status specifies the consistency status of the SiteLogisticsProcessModel. The elements located at the node Status are defined by the data type: SiteLogisticsProcessModelStatusElements. In certain implementations, these elements can include: SiteLogisticsProcessModelConsistencyStatusElements, ConsistencyStatusCode and LastCheckDateTime. The SiteLogisticsProcessModelConsistencyStatusElements may contain information about the last consistency check performed on the SiteLogisticsProcessModel. SiteLogisticsProcessModelConsistencyStatusElements may be based on IDT SiteLogisticsProcessModelConsistencyStatusElements. The ConsistencyStatusCode is a coded representation of the consistency status of the SiteLogisticsProcessModel. ConsistencyStatusCode may be based on GDT ConsistencyStatusCode. The LastCheckDateTime may contain the date and time when the last consistency check occurred. LastCheckDateTime may be based on GDT DateTime.

A CheckConsistency action can check a current SiteLogisticsProcessModel for consistency against a predefined set of rules enforcing the correctness and completeness of the SiteLogisticsProcessModel data. For a successful consistency check, the execution of the rules may not result in any errors. The consistency of a SiteLogisticsProcessModel is influenced by the consistency of other business objects associated to this SiteLogisticsProcessModel. The preconditions may include a predefined SiteLogisticsProcessModel to be checked. The changes in other objects include that this action may call the CheckConsistency of the business objects SiteLogisticsProcessSegment. The Consistency status of the SiteLogisticsProcessSegment may be affected. The changes to the status may include the Consistency status variable being affected by the action. If the SiteLogisticsProcessModel is found to be consistent, the Consistency status will be set to "consistent", if the SiteLogisticsProcessModel is not found to be consistent, the Consistency status will be set to "inconsistent".

The usage may include the CheckConsistency of the SiteLogisticsProcessModel being called from the UI for checking the consistency of an SiteLogisticsProcessModel.

A ResetConsistencyCheckResult action resets the consistency status of a SiteLogisticsProcessModel.

This action shall be used by the business object SiteLogisticsProcessSegment in order to propagate its consistency status to the SiteLogisticsProcessModel. The preconditions may include a change in the consistency status of the assigned SiteLogisticsProcessSegment. The changes to the object may be that the action resets the consistency status within the header node. The changes to the status may include the following: If the status of the SiteLogisticsProcessSegment is "check pending" or "inconsistent", then the status of the SiteLogisticsProcessModel may be set to "check pending". In some implementations, the usage may only be triggered by the assigned SiteLogisticsProcessSegment for propagating its status. In some implementations, the action can not be called by the UI.

HierarchicalViewElement is the hierarchical view of the site logistics process model and subordinate business objects in a defined order. The top most level of the hierarchical view is the site logistics process model root, in the next level are the as site logistics process segments which are assigned to the model, next in order are the elements of the bill of operations which is assigned to each segment. The bill of operations is composed of operations and branchings. The branchings contain sequences that in turn contain operations. Operations are always in the lowest level of the hierarchy. The order of the hierarchy also results from the sequential relationships between the elements. For example, an operation will come prior in order to its successor operation. The elements located at the node HierarchicalView are defined by the element structure SiteLogisticsProcessModel HierarchicalViewElements. In certain implementations, these elements can include: ObjectNodeID and ObjectNodeTypeCode. The ObjectNodeID is an identifier, which can be unique, of a Site logistics process model header, Site logistics Process Segment, bill of operations element or an operation activity. This field corresponds to the field ID of the root node of the Site logistics Process model, the field ID of the root node of the business object Site logistics Process Segment the field ID of the element node of the business object Site Logistics Bill of Operations and OperationActivityID of the node OperationActivity of the business object Site Logistics Bill of Operations. ObjectNodeID may be based on GDT ObjectNodeID.

The ObjectNodeTypeCode is a coded representation of one of the following: root node of the Site logistics Process Model, root node of the Site logistics process segment, or of the sub-types of a bill of operations element. The sub-type specializes an element in the bill of operations model. The code list may contain the values 'Process Model', 'Process Segment' and all sub-types of the node Element as defined in the GDT BillOfOperationsElementTypeCode. ObjectNodeTypeCode may be based on GDT ObjectNodeTypeCode.

There may exist a number of Associations for Navigation including: 1) To the business object SiteLogisticsProcessModel/HierarchicalViewElement as follows. Subhierarchy 164018 may have a cardinality relationship of 1:cn and specifies the hierarchy of which lays underneath the Hierarchical View Element. Subordinate Operation may have a cardinality relationship of 1:cn and specifies the subordinate operations of a Hierarchical View Element. 2) To the business object SiteLogisticsProcessModel/root as follows. ProcessModel may have a cardinality relationship of 1:c. and is the associated SiteLogisticsProcessModel.

3) To the business object SiteLogisticsProcessModel/ProcessSegment as follows. ProcessSegment may have a cardinality relationship of 1:c and is the associated ProcessSegment. 4) To the business object Site Logistics Bill of Operations/Element as follows. BillOfOperationElement may have a cardinality relationship of 1:c and is the associated Bill of operation element.

ObjectNodeTypeCode can be a SiteLogisticsProcessModel root, ProcessSegment, Branching, Sequence, Operation. In some implementations, if the Hierarchical View Element is a SiteLogisticsProcessModel root then only the following associations are enabled: Subhierarchy, Subordinate Operation and ProcessModel. If the Hierarchical View Element is a ProcessSegment then only the following associations are enabled: Subhierarchy, Subordinate Operation and ProcessSegment. If the Hierarchical View Element is a BOO element (Branching, Sequence, Operation) then only the following associations are enabled: Subhierarchy, Subordinate Operation and BillOfOperationElement. In some implementations, exactly one association of the above is allowed, the allowed association is determined by the type filed.

The Enterprise Service Infrastructure Actions may include InsertBranching and InsertSequence. InsertBranching is an action for inserting a branching of type or alternative. The branching contains two sequences with one operation each. Every operation contains one operation activity. The branching is inserted chronologically after the chosen bill of operations element. In some implementations, the preconditions are that It is only possible to insert a branching if an operation or a branching or a mark is the predecessor element. The changes to the object may include the predecessor relationship of the subsequent elements being adjusted when inserting the branching. The Parameters are that the action elements are defined by the type GDT: SiteLogisticsProcessModelViewElementInsertBranchingAlternativeOrActionElements. In certain implementations, these elements include: ElementBranchingID, FirstElementSequenceID, FirstElementOperationID, FirstElementOperationTypeCode, FirstElementOperationActivityID, FirstElementOperationActivityTypeCode, SecondElementSequenceID, SecondElementOperationID, SecondElementOperationTypeCode, SecondElementOperationActivityID, SecondElementOperationActivityTypeCode. The ElementBranchingID is an identifier, which can be unique, of a branching. ElementBranchingID may be based on GDT BillOfOperationsElementID. The FirstElementSequenceID is an identifier, which can be unique, of the first sequence. FirstElementSequenceID may be based on GDT BillOfOperationsElementID. The FirstElementOperationID is an identifier, which can be unique, of the operation. The operation belongs to the first sequence. FirstElementOperationID may be based on GDT BillOfOperationsElementID. The FirstElementOperationTypeCode is the TypeCode of the first operation. FirstElementOperationTypeCode may be based on GDT OperationTypeCode. The FirstElementOperationActivityID is an identifier, which can be unique, of the operation activity. The operation activity belongs to the first operation. FirstElementOperationActivityID may be based on GDT OperationActivityID. The FirstElementOperationActivityTypeCode is a TypeCode of the first operation activity. FirstElementOperationActivityTypeCode may be based on GDT OperationActivityTypeCode.

The SecondElementSequenceID is an identifier, which can be unique, of the second sequence. SecondElementSequenceID may be based on GDT BillOfOperationsElementID. The SecondElementOperationID is an identifier, which can be unique, of the operation. SecondElementOperationID may be based on GDT BillOfOperationsElementID. The SecondElementOperationTypeCode is a TypeCode of the second operation. SecondElementOperationTypeCode may be based on GDT OperationTypeCode. The SecondElementOperationActivityID is an identifier, which can be unique, of the operation activity. The operation activity belongs to the second operation. SecondElementOperationActivityID may be based on GDT OperationActivityID. The SecondElementOperationActivityTypeCode is a TypeCode of the second operation activity. SecondElementOperationActivityTypeCode may be based on GDT OperationActivityTypeCode.

An InsertSequence is an action for inserting a sequence. The sequence may contain one operation and one operation activity. The sequence is inserted chronologically after the chosen bill of operations element.

In some implementations, the precondition is that it is only possible to insert a sequence if a branching is the predecessor element. The changes to the object may be that the predecessor relationship of the subsequent element is adjusted when inserting the sequence. The changes to the status may be that If new sequences are inserted, the status BillOfOperationsExecutionConsistencyStatus is reset. The parameter is that the action elements are defined by the type GDT: SiteLogisticsProcessModelHierarchicalViewElementInsertSequenceActionElements. In certain implementations, these elements can include: The ElementSequenceID is an identifier, which can be unique, of the sequence. ElementSequenceID may be based on GDT BillOfOperationsElementID. The ElementOperationID is an identifier, which can be unique, of the operation. ElementOperationID may be based on GDT BillOfOperationsElementID. The ElementOperationTypeCode is a TypeCode of the operation. ElementOperationTypeCode may be based on GDT OperationTypeCode. The ElementOperationActivityID is an identifier, which can be unique, of the operation activity. ElementOperationActivityID may be based on GDT OperationActivityID. The ElementOperationActivityTypeCode is a TypeCode of the operation activity. ElementOperationActivityTypeCode may be based on GDT OperationActivityTypeCode.

An InsertOperation is an action for inserting an operation. The operation contains an operation activity. The operation is inserted after the chosen bill of operations element. In some implementations, the preconditions are that It is only possible to insert an operation if the predecessor element is not a sequence. The changes to the object may include that the predecessor relationship of the subsequent element is adjusted when inserting the operation. The changes to the status include that If new operations are inserted, the status BillOfOperationsExecutionConsistencyStatus is reset. The parameters are that the action elements are defined by the type GDT: SiteLogisticsProcessModelHierarchicalViewElementInsertOperationActionElements. In certain implementations, these elements include: ElementOperationID, ElementOperationTypeCode, ElementOperationActivityID and ElementOperationActivityTypeCode. The ElementOperationID is an identifier, which can be unique, of the operation. ElementOperationID may be based on GDT BillOfOperationsElementID.

The ElementOperationTypeCode is a TypeCode of the operation. ElementOperationTypeCode may be based on GDT OperationTypeCode. The ElementOperationActivityID is an identifier, which can be unique, of the operation activity. ElementOperationActivityID may be based on GDT OperationActivityID).

The ElementOperationActivityTypeCode is a TypeCode of the operation activity. ElementOperationActivityTypeCode may be based on GDT OperationActivityTypeCode.

AttachmentFolder specifies a folder of documents that describe the SiteLogisticsProcessModel.

The "DO TextCollection" is a natural-language representation of the characteristics of the SiteLogisticsProcessModel.

Description is language-dependent short-length statement describing the SiteLogisticsProcessModel. The elements located at the node Description are defined by the type GDT: SiteLogisticsProcessModelDescriptionElements. In certain implementations, these elements include:

Description. Description is a language dependent description of the process model. Description may be based on GDT MEDIUM_Description.

FIG. 165 illustrates one example of an SiteLogisticsProcessSegment business object model 165002. Specifically, this model depicts interactions among various hierarchical components of the SiteLogisticsProcessSegment, as well as external components that interact with the SiteLogisticsProcessSegment (shown here as 165000 and 165004 through 165006).

Business Object SiteLogisticsProcessSegment is part of a logistic process specified by a net of operations for packing, moving and checking of goods. The business object SiteLogisticsProcessSegment resides in the process component Site Logistics Model Management in the foundation layer. One or more SiteLogisticsProcessSegments can be assigned and sequenced in any site logistics process model that defines a complete site logistics process. SiteLogisticsProcessSegment may contain: Information about the SiteLogisticsProcessSegment, including the site logistics bill of operations that the segment holds and the estimated execution duration of the segment (SiteLogisticsProcessSegment). SiteLogisticsProcessSegment is represented by the root node SiteLogisticsProcessSegment 165008.

SiteLogisticsProcessSegment is a part of a logistic process specified by a net of operations for packing, moving and checking of goods. The SiteLogisticsProcessSegment includes estimated execution duration of the segment. The elements located at the node SiteLogisticsProcessSegment are defined by the data type: SiteLogisticsProcessSegmentElements. In certain implementations, these elements include: ID, UUID, SiteLogisticsBillOfOperationsID, SiteLogisticsBillOfOperationsUUID, SystemAdministrativeData and LeadTimeDuration. The ID is an identifier, which can be unique, of the SiteLogisticsProcessSegment system installation, and is an alternative key. ID may be based on GDT SiteLogisticsProcessSegmentID.

The UUID is a universal identifier, which can be unique, of a SiteLogisticsProcessSegment for referencing purposes, and is an alternative key. UUID may be based on GDT UUID. The SiteLogisticsBillOfOperationsID is an identifier, which can be unique, of the assigned SitLogisticsBillOfOperations, and is optional. SiteLogisticsBillOfOperationsID may be based on GDT BillOfOperationsID. The SiteLogisticsBillOfOperationsUUID is a universal identifier, which can be unique, of the site logistics bill of operations, which is assigned in order to define the set of operations in the site logistics process segment, and is optional. SiteLogisticsBillOfOperationsUUID may be based on GDT UUID. The SystemAdministrativeData is administrative data that is stored in a system. This data includes system users and change dates/times. SystemAdministrativeData may be based on GDT SystemAdministrativeData. The LeadTimeDuration is the rough time estimation for executing the SiteLogisticsProcessSegment, measured in days, hours and minutes, and is optional. LeadTimeDuration may be based on GDT Duration Qualifier LeadTime.

There may be a number of composition relationships to subordinate nodes including the following. Description 165010 may have a cardinality relationship of 1:cn. ConsistencyStatus 165012 may have a cardinality relationship of 1:1. TextCollection 165014 may have a cardinality relationship of 1:c. AttachmentFolder 165016 may have a cardinality relationship of 1:c.

There may be a number of Inbound Aggregation Relationships including: 1) From the business object (Or node) SiteLogisticsBillOfOperations as follows. BillOfOperations may have a cardinality relationship of c:cn and is the assignment of a site logistics bill of operations that defines the operation set in a SiteLogisticsProcessSegment.

There may be a number of Inbound Association Relationships including: 1) From the business object Identity. CreationIdentity may have a cardinality relationship of 1:cn and is the identity of the person who created the SiteLogisticsProcessSegment. LastChangeIdentity may have a cardinality relationship of c:cn and is the Identity of the last person who changed the SiteLogisticsProcessSegment.

Site logistics bill of operations assignment is not mandatory in a SiteLogisticsProcessSegment (c:cn) since a SiteLogisticsProcessSegment can be saved without an assigned site logistics bill of operations. Nevertheless, in some implementations, site logistics processing will only use a SiteLogisticsProcessSegment that contains a site logistics bill of operations.

Enterprise Service Infrastructure Actions

The Copy action copies a SiteLogisticsProcessSegment. A predefined SiteLogisticsProcessSegment that is to be copied, with a SiteLogisticsBillOfOperations assigned to it can be a preconditions Changes to the object may include the source SiteLogisticsProcessSegment remains unchanged. A completely new SiteLogisticsProcessSegment is created with a different UUID, ID and system administrative data. The consistency status value of the newly created SiteLogisticsProcessSegment is "unchecked". Changes to other objects may include the SiteLogisticsBillOfOperations which is assigned to the SiteLogisticsProcessSegment is copied as well, thus the new copy of the SiteLogisticsProcessSegment will be assigned to a new copy of a SiteLogisticsBillOfOperations.

The parameters may be that the action elements are defined by the data type:

SiteLogisticsProcessSegmentCopyActionElements. In certain implementations, these elements include: TargetID. The TargetID is an identifier, which can be unique, of the new SiteLogisticsProcessSegment copy. TargetID may be based on GDT SiteLogisticsProcessSegmentID. The usage is that this action will be used in the UI to copy an existing SiteLogisticsProcessSegment, thereby saving time and effort when defining a new resembled SiteLogisticsProcessSegment.

QueryByElements provides a list of all SiteLogisticsProcessSegments which satisfy the selection criteria, specified by the query Elements, combined by logical "AND". In some implementations, if a selection criterion is not filled, the query will regard it as a wild-card, meaning that all values of the criterion are valid. Data Type SiteLogisticsProcessSegmentElementsQueryElements defines the following query elements: ID, SiteLogisticsBillOfOperationsID, ConsistencyStatusCode, LeadTimeDuration, CreationBusinessPartnerCommonPersonNameGivenName, CreationBusinessPartnerCommonPersonNameFamilyName, LastChangeBusinessPartnerCommonPersonNameGivenName, LastChangeBusinessPartnerCommonPersonNameFamilyName. ID is of GDT type SiteLogisticsProcessSegmentID. SiteLogisticsBillOfOperationsID is of GDT type BillOfOperationsID. ConsistencyStatusCode is of GDT type ConsistencyStatusCode. LeadTimeDuration is of GDT type Duration with qualifier LeadTime. CreationBusinessPartnerCommonPersonNameGivenName is of GDT type CreationBusinessPartnerCommonPersonNameGivenName. CreationBusinessPartnerCommonPersonNameFamilyName is of GDT type CreationBusinessPartnerCommonPersonNameFamilyName. LastChangeBusinessPartnerCommonPersonNameGivenName is of GDT type LastChangeBusinessPartnerCommonPersonNameGivenName. LastChangeBusinessPartnerCommonPersonNameFamilyName is of GDT type LastChangeBusinessPartnerCommonPersonNameFamilyName.

QueryByID provides the SiteLogisticsProcessSegment with the specified ID. In some implementations, If an ID is not filled, the query will regard it as a wild-card, and provide all existed SiteLogisticsProcessSegments. Data Type SiteLogisticsProcessSegmentIDQueryElements defines the query elements: ID. ID is of GDT type SiteLogisticsProcessSegmentID.

Description is a language-dependent medium-length statement describing the SiteLogisticsProcessSegment. The elements located at the node Description are defined by the data type: SiteLogisticsProcessSegmentDescriptionElements. In certain implementations, these elements include: Description. The Description is a Language dependent description of the process segment. Description may be based on GDT _MEDIUM_DESCRIPTION with qualifier SiteLogisticsProcessSegment.

ConsistencyStatus is the status of consistency of the SiteLogisticsProcessSegment. According to the status value, it is decided whether the SiteLogisticsProcessSegment is valid for use by Site Logistics Processing. The elements located at the node ConsistencyStatus are defined by the data type: SiteLogisticsProcessSegmentConsistencyStatusElements. In certain implementations, these elements can include: Code and LastCheckDateTime. The Code is the current status value. Code may be based on GDT ConsistencyStatusCode. The LastCheckDateTime is a time stamp of the last check. LastCheckDateTime may be based on GDT GLOBAL_DateTime Qualifier Check.

In some implementations, Enterprise Service Infrastructure Actions include CheckConsistency (S&AM Action) and ResetConsistencyCheckResult (S&AM Action). CheckConsistency (S&AM Action) may check the current SiteLogisticsProcessSegment for consistency against a predefined set of rules. For a successful consistency check, the execution of the rules may not result in any errors.

The consistency of a SiteLogisticsProcessSegment may be influenced by the consistency of other associated business objects, for example, SiteLogisticsBillOfOperations.

ResetConsistencyCheckResult (S&AM Action) may reset the consistency status of a SiteLogisticsProcessSegment. This action shall be used by the business object SiteLogisticsBillOfOperations in order to propagate its consistency status to the SiteLogisticsProcessSegment.

The "DO TextCollection" specifies for a SiteLogisticsProcessSegment a container of documents that describe the SiteLogisticsProcessSegment.

The "DO AttachmentFolder" is a natural-language representation of the characteristics of the SiteLogisticsProcessSegment.

Business Object SourcingList is a list of internal and external procurement options. The procurement option defines a source of supply with an (optional) transportation lane and/or a supply quota arrangement. The extension of node SourcingListItem captures additional information regarding the purchasing compliance in terms of determination of non-deterministic sources of supply and price-based sourcing decisions. The business object SourcingList is part of process component Source of Supply Determination in AP Foundation. The data type enhancement is part of deployment unit Purchasing. The Transformed Object SourcingList can be used to select procurement options based on freely-defined business criteria and to sort the procurement options according to priority. The selection and sorting itself is guaranteed by the Reuse Service Component SourcingEngine. Different procurement options can relate to the same source of supply. For example, the rule for prioritizing procurement options can be chosen in business configuration. If the user chooses Procurement Priority the list is sorted according to procurement priority. The elements located directly at the node SourcingListItem are defined by the data type: SourcingListItemElements. The SourcingListItem enhancement is defined by the data type: SourcingListItemPurchasingExtensionElements and includes PurchaseOrderReference, PurchasingContractReference, PurchasingContractIncoterms, PurchasingContractCashDiscountTermsCode, NetUnitPrice, NetAmount, NonDeterministicSearchEnabledIndicator, and SupplierBlockedIndicator. A PurchaseOrderReference is a GDT of type BusinessTransactionDocumentReference and refers to a unique reference to a PurchaseOrder or a PurchaseOrderItem that can be used (as non-deterministic) source of supply and is optional. A PurchasingContractReference is a GDT of type BusinessTransactionDocumentReference which is a unique reference to a PurchasingContract or a PurchaseContractItem that can be used source of supply and is optional. The purchasing contract reference identifies the contract and the item of the contract which will be displayed in the sourcing list. In case of product items, which has to be sourced, the source of supply will be a contract with a dedicated contract item. In case of limit items, which has to be sourced only the contract header represents the source of supply. PurchasingContractIncoterms is a GDT of type Incoterms which refers to standard contract formulas for the terms of delivery. It will be taken over from the source of supply (e.g. contract) to the sourcing list item and is optional. A PurchasingContractCashDiscountTermsCode is a GDT of CashDiscountTermsCode referring to the PurchasingContractCashDiscountTerms are conditions and agreements that apply for the payment in the purchasing process and is optional. A NetUnitPrice is a GDT of type Price and refers to the net unit price is the exchange value without tax, expressed in a monetary unit, of a material or a service in relation to a basic amount and is optional. The net unit price is necessary in order to take price-based sourcing decision. Typically the source of supply with the best price in terms of total cost and quality is used to purchase the required product. The price will be supported by a pricing simulation from the DU purchasing. A NetAmount is a GDT of type Amount, Qualifier: Net which is the total net amount will be calculated from NetUnitPrice and Quantity and is optional. Of the item which has to be sourced. E.g. if NetUnitPrice=9 €/5 Each and Quantity=10 Each □ NetAmount=18 €. A NonDeterministicSearchEnabledIndicator is a GDT of type Indicator, Qualifier: Enabled and indicates whether or not the non-deterministic search for sources of supply has been enabled and is optional. In contrast to the deterministic search for sources of supply the non-deterministic search also considers PurchaseOrders as source of supply.

A SupplierBlockedIndicator is a GDT of type Indicator, Qualifier: Block which specifies whether the supplier is blocked or not. A supplier can be blocked to prevent a purchaser or the SourcingEngine from using it as source of supply.

FIGS. 166-1 through 166-8 illustrate an example SourceOfSupply business object model 166023. Specifically, this model depicts interactions among various hierarchical components of the SourceOfSupply, as well as external components that interact with the SourceOfSupply (shown here as 166000 through 166022 and 166052 through 166092).

Business Object SourceOfSupply is a source for the external and internal procurement of products. A special form of internal procurement is the production of products. The business object SourceOfSupply belongs to the process component SourceOfSupplyDetermination, which is in the foundation layer. The business object SourceOfSupply contains the business relationship (general part) between partners concerning a material, and the optional corresponding logistical relationship, which describes in-house production or transportation between geographical locations. In some implementations, the business object SourceOfSupply does not send or receive any B2B messages.

Node Structure of Business Object SourceOfSupply 166024 is a source for the external and internal procurement of products. It contains a business relationship, an option for producing products or for procuring them internally, as well as lot size margins and costs. A source of supply can refer to the following original business objects, or adopt data from the ProductionModel, TransportationLane, or PurchasingContract. A SourceOfSupply occurs in the ExternalProcurementSourceOfSupply 166026, the InternalProcurementSourceOfSupply 166028 and the InternalProductionSourceOfSupply 166030. An ExternalProcurementSourceOfSupply which refers to a source of supply for the external procurement of products and contains all the parameters required for that purpose. An InternalProcurementSourceOfSupply is a source of supply for the internal procurement of products and contains all the parameters required for that purpose. An InternalProductionSourceOfSupply is a source of supply for the internal production of materials and contains all the parameters required for that purpose. In the case of the external and internal procurement of materials, a SourceOfSupply occurs in a MaterialSourceOfSupply 166032, ServiceProductSourceOfSupply 166036, ProductCategorySourceOfSupply 166034, and AllMaterialsSourceOfSupply 166038. A MaterialSourceOfSupply is a source of supply for the procurement of a particular material. A ServiceProductSourceOfSupply is a source of supply for the procurement of a particular service. A ProductCategorySourceOfSupply is a source of supply for the procurement of products in a particular product category. An AllMaterialsSourceOfSupply is a source of supply that can be used for the procurement of all materials.

During source determination for a material, the sources of supply are determined according to the rules of MaterialSourceOfSupply/ServiceProductSourceOfSupply, ProductCategorySourceOfSupply, and AllMaterialsSourceOfSupply. As soon as a source of supply has been determined, source determination is terminated and the determined source of supply is returned. The root node SourceOfSupply contains elements, which are defined by the data type SourceOfSupplyElements which include the UUID, SystemAdministrativeData, SenderBusinessPartnerUUID, SenderOrganisationalCentreUUID, SenderOrganisationalCentreBusinessCharacterCode, RecipientBusinessPartnerUUID, RecipientOrganisationalCentreUUID, RecipientOrganisationalCentreBusinessCharacterCode, BaseObjectNodeReference, ProductUUID, ProductTypeCode, ProductCategoryHierarchyProductCategoryUUID, ProductsSpecificationDetailLevelCode, CatalogueReference, ProductSellerID, ProcurementCategoryCode, PriorityValue, ValidityPeriod, MinimumLotsizeQuantity, MinimumLotsizeQuantityTypeCode, TargetQuantity, TargetQuantityTypeCode, PlannedDeliveryDuration, PlannedDeliveryDurationRelevanceIndicator, and Status. A UUID is a GDT of type UUID and universally identifies the source of supply. A SystemAdministrativeData is a GDT of type SystemAdministrativeData is the administrative data recorded by the system. This data includes system users and change dates/times. A SenderBusinessPartnerUUID is a GDT of type UUID and is optional. It refers to a business partner, that sends the product, that is to be procured. A OrganisationalCentre, that sends the product, that is to be procured. A SenderOrganisationalCentreBusinessCharacterCode is a GDT of type of ORGANISATIONALCENTRE_PartyBusinessCharacterCode which is coded representation of the business role of the SenderOrganisationalCentre, possible value is 'Company' and is optional.

A RecipientBusinessPartnerUUID is a GDT of type UUID which is a business partner, that receives the product, that is to be procured and is optional. A RecipientOrganisationalCentreUUID is a GDT of type UUID which is the OrganisationalCentre, that receives the product, that is to be procured and is optional. A RecipientOrganisationalCentreBusinessCharacterCode is a GDT of type ORGANISATIONALCENTRE_PartyBusinessCharacterCode which is coded representation of the business role of the RecipientOrganisationalCentre, possible value is 'Company' and is optional. A BaseObjectNodeReference is a GDT of type ObjectNodeReference, Qualifier: Base and is optional. The baseObjectNodeReference is the alternative key-Universal reference of the object from which the source of supply was replicated. A source of supply may be replicated from a material specific transportation lane, from an item of a purchasing contract or a production model. The UUID has to be specified, the ObjectNodeId must not be specified. —A ProductUUID is a GDT of type UUID which is the universal identifier of the product to be procured. —A ProductTypeCode is a GDT of type ProductTypeCode and is coded representation of the type of the product to be procured which include Material and ServiceProduct. —A ProductCategoryHierarchyProductCategoryUUID is a GDT of type UUID and is the universal identifier of the product category to be procured. A ProductsSpecificationDetailLevelCode is a GDT of type ProductsSpecificationDetailLevelCode and is coded representation of the type of the specification level of the product to be procured. A CatalogueReference is a GDT of type CatalogueReference and is a unique reference to a catalog or an object in a catalog. A ProductSellerID is a GDT of type ProductPartyID and identifies that a party assigns to a product. A ProcurementCategoryCode is a GDT of type ProcurementCategoryCode and is coded representation of the procurement category. A PriorityValue is a GDT of type PriorityValue which refers to the priority according to which the source of supply is taken into account in procurement and is optional. A ValidityPeriod is a GDT of type UPPEROPEN_LOCALNORMALISED_DateTimePeriod, Qualifier: V and refers to the validity period of the source of supply and is optional. A MinimumLotsizeQuantity is a GDT of type Quantity, Qualifier: Lotsize and refers to the smallest possible lot size during procurement. A MinimumLotsizeQuantityTypeCode GDT: QuantityTypeCode, Qualifier: Lotsize which is coded representation of the type of the MinimumLotsizeQuantity and is optional. A MaximumLotsizeQuantity is a GDT of type Quantity, Qualifier: Lotsize which is the largest possible lot size during procurement and is optional. MaximumLotsizeQuantityTypeCode is a GDT of type QuantityTypeCode, Qualifier: Lotsize which is coded representation of the type of the MaximumLotsizeQuantity and is optional. A TargetQuantity is a GDT of type Quantity, Qualifier: Target and refers to the target quantity for a material to be delivered, for example, in a contract item and is optional. A TargetQuantityTypeCode is a GDT of type QuantityTypeCode, Qualifier: Target which is coded representation of the type of the TargetQuantity and is optional. A PlannedDeliveryDuration is a GDT of type TIME_Duration, Qualifier: Delivery Planned delivery time, including transportation time and is restriction to the GDTs Duration: The PlannedDeliveryDuration is an exact time in minutes and is optional. A PlannedDeliveryDurationRelevanceIndicator is a GDT of type Indicator, Qualifier: Relevance which indicates whether the PlannedDeliveryDuration has to be considered and is optional. A Status is the current status of the SourceOfSupply. It is defined by the data type SourceOfSupplyStatus and consists of LifeCycleStatusCode which describes stages in the life of a SourceOfSupply A PurchasingContractItem has a cardinality of c:c and refers to the purchasing contract item for which the source of supply was created. A TransportationLaneValidMaterials has a cardinality of c:1 and refers to the material-specific transportation lane from which the source of supply was created. A ProductionModel has a cardinality of c:c and refers to the ProductionModel for which the source of supply was created. There may be a number of Inbound Association Relationships including the Supplier which may have a cardinality of c:cn, the Customer may have a cardinality of c:cn, the SenderCompany may have a cardinality of c:cn, and a SenderCompany which is financially and legally independent, geographically unbound organizational center registered under business law may have a cardinality of c:cn.

A RecipientCompany may have a cardinality of c:cn. Material may have a cardinality of c:cn and is the material for the material-specific source of supply. ServiceProduct may have a cardinality of c:cn. ProductCategory for the product-category-specific source of supply may have a cardinality of c:cn. CreationIdentity has a cardinality of 1:cn and identifies the Identity that created the SourceOfSupply The LastChangedIdentity has a cardinality of c:cn and identifies the Identity that changed the SourceOfSupply. A LogisticRelationship 166040 has a cardinality of 1:n A ReferenceCollection 166050 has a cardinality of 1:n.

The inbound aggregation relationship Material is used in the specialization MaterialSourceOfSupply.

The inbound aggregation relationship ServiceProduct is used in the specialization ServiceProductSourceOfSupply. The inbound aggregation relationship ProductCategory is used in the specialization ProductCategorySourceOfSupply, and is relevant for internal and external procurement.

In case the SourceOfSupply is based on a PurchasingContractItem, the inbound aggregation relationship ProductCategory may also be used in addition to the inbound aggregation relationship Material/ProductService, but exists then still in the specialization MaterialSourceOfSupply/ProductServiceSourceOfSupply. The specialization AllMaterialsSourceOfSupply is relevant for internal and external procurement if there is an underlying transportation lane.

In case the SourceOfSupply is based on an item of a purchasing contract it exists in the specialization ExternalProcurementSourceOfSupply. In case the SourceOfSupply is based on a material specific transportation lane it exists in the specialization ExternalProcurementSourceOfSupply. In case the SourceOfSupply is based on a production model it exists in the specialization InternalProductionSourceOfSupply.

A SourceOfSupply based on an item of a purchasing contract can refer to products and product categories. A SourceOfSupply is based on a material specific transportation lane can refer to a material, product categories or to all materials. A SourceOfSupply is based on a production model can only refer to a material. Currently, SenderBusinessPartnerUUID may contain a SupplierUUID. Currently, RecipientBusinessPartnerUUID may contain a CustomerUUID. In case the SourceOfSupply is based on an item of a purchasing contract SenderBusinessPartnerUUID and is specified. A CompanyUUID is specified as RecipientOrganisationalCentreUUID. If the SourceOfSupply is based on an item of a purchasing contract, the GuaranteedMinimumAmount, TargetAmount and TargetQuantity are copied from the contract item or the contract. CatalogueReference and ProductSellerID may be specified in case the SourceOfSupply is based on an item of a purchasing contract.

Enterprise Service Infrastructure Actions

Activate (S&AM action) This action activates a SourceOfSupply.

Preconditions: The SourceOfSupply is consistent and has the LifeCycleStatus 'In Preparation'.

Changes to the status: Sets the LifeCycleStatus to 'Active'.

Use: It is called from TransportationLane, ProductionModel, and PurchasingContract.

Block (S&AM action) This action blocks a SourceOfSupply. Preconditions: The SourceOfSupply has the LifeCycleStatus 'Active'.

Changes to the status: Sets the LifeCycleStatus to 'Blocked'.

Use: It is called from TransportationLane, ProductionModel, and PurchasingContract.

Unblock (S&AM action)

This action puts a SourceOfSupply back to 'Active'. Preconditions: The SourceOfSupply has the LifeCycleStatus 'Blocked'.

Changes to the status: Sets the LifeCycleStatus to 'Active'.

Use: It is called from TransportationLane, ProductionModel, and PurchasingContract.

FlagAsObsolete (S&AM action) This action flags a SourceOfSupply as obsolete. Preconditions: The SourceOfSupply has the LifeCycleStatus 'Active' or 'Blocked'.

Changes to the status: Sets the LifeCycleStatus to 'Obsolete'.

Use: It is called from TransportationLane, ProductionModel, and PurchasingContract.

RevokeObsolescence (S&AM action)

This action puts a SourceOfSupply back to 'Blocked'. Preconditions: The SourceOfSupply has the LifeCycleStatus 'Obsolete'.

Changes to the status: Sets the LifeCycleStatus to 'Blocked'.

Use: It is called from TransportationLane, ProductionModel, and PurchasingContract.

ActivateAll (ESI action) This action activates a SourceOfSupply including all subordinated nodes LogisticRelationship. Preconditions: The SourceOfSupply and its subordinated nodes LogisticRelationship are consistent and have the LifeCycleStatus 'In Preparation'.

Changes to the status: Sets the LifeCycleStatus of the SourceOfSupply and of its subordinated nodes LogisticRelationship to 'Active'.

Use: It is called from TransportationLane, ProductionModel, and PurchasingContract.

QueryByProductAndRecipientOrganisationalCentre provides a list of all sources of supply for a particular product and a particular organizational center that is the recipient of this product. The sources of supply are valid for the specified point in time. The query elements are defined by the datatype SourceOfSupplyProductAndRecipientOrganisationalCentreQueryElements and include ProductUUID, CatalogueReference, ProductSellerID, ProductTypeCode, RecipientOrganisationalCentreUUID, SenderBusinessPartnerUUID, RequirementDateTime, and RequiredLotsizeQuantity.

A ProductUUID is a GDT of type UUID. A CatalogueReference is a GDT of type CatalogueReference and is optional. A ProductSellerID is a GDT of ProductPartyID and is optional. A ProductTypeCode is a GDT of type ProductTypeCode and is optional. A RecipientOrganisationalCentreUUID is a GDT of type UUID and is optional. A SenderBusinessPartnerUUID is a GDT of type UUID and is optional. A RequirementDateTime is a GDT of type GLOBAL_DateTime. A RequiredLotsizeQuantity is a GDT of type Quantity. The system returns the sources of supply for which the RequiredLotsizeQuantity is larger or the same as the MinimumLotsizeQuantity, and for which the RequiredLotsizeQuantity is smaller or the same as the MaximumLotsizeQuantity is a GDT of type ObjectTypeCode and is optional. A BaseObjectNodeTypeCode is a GDT of type ObjectNodeTypeCode and is optional. A ProcurementCategoryCode is a GDT of type ProcurementCategoryCode and is optional. A LifeCycleStatusCode is a GDT of type SourceOfSupplyLifeCycleStatusCode and is optional.

QueryByProductAndRecipientBusinessPartner provides a list of all sources of supply for a particular product and a particular business partner that is the recipient of this product. The sources of supply are valid for the specified point in time. The query elements are defined by the datatype SourceOfSupplySourceOfSupplyProductAndRecipientBusinessPartnerQueryElements which include ProductUUID, CatalogueReference, ProductSellerID, ProductTypeCode, RecipientBusinessPartnerUUID, SenderBusinessPartnerUUID, SenderBusinessPartnerUUID, RequirementDateTime, RequiredLotsizeQuantity, BaseObjectTypeCode, BaseObjectNodeTypeCode, ProcurementCategoryCode, and LifeCycleStatusCode.

A ProductUUID is a GDT of type UUID and is optional. Sources of supply that refer to the product category of the specified product, to a product category on the above hierarchy level of the product category of the specified product or to all materials are also returned.

A CatalogueReference is a GDT of type CatalogueReference and is optional. A ProductSellerID is a GDT of type ProductPartyID and is optional.

A ProductTypeCode is a GDT of type ProductTypeCode and is optional.

A RecipientBusinessPartnerUUID is a GDT of type UUID. A SenderBusinessPartnerUUID is a GDT of type UUID and is optional. A RequirementDateTime is a GDT of type GLOBAL_DateTime and is optional.

A RequiredLotsizeQuantity is a GDT of type Quantity and is optional. The system returns the sources of supply for which the RequiredLotsizeQuantity is larger or the same as the MinimumLotsizeQuantity, and for which the RequiredLotsizeQuantity is smaller or the same as the MaximumLotsizeQuantity. A BaseObjectTypeCode is a GDT of type ObjectTypeCode and is optional. A BaseObjectNodeTypeCode is a GDT of type ObjectNodeTypeCode and is optional. A ProcurementCategoryCode is a GDT of type ProcurementCategoryCode and is optional. A LifeCycleStatusCode is a GDT of type SourceOfSupplyLifeCycleStatusCode and is optional.

QueryByProductCategoryAndRecipientOrganisationalCentre provides a list of all sources of supply for a particular product category and a particular organizational center that is the recipient of the products in this product category. The sources of supply are valid for the specified point in time which are defined by the datatype, SourceOfSupplyProductCategoryAndRecipientOrganisationalCentreQueryElements and include ProductCategoryHierarchyProductCategoryUUID, ProductCategoryHierarchyProductCategoryUUID, SenderBusinessPartnerUUID, RequirementDateTime, RequiredLotsizeQuantity, BaseObjectTypeCode, BaseObjectNodeTypeCode, ProcurementCategoryCode, and LifeCycleStatusCode. A ProductCategoryHierarchyProductCategoryUUID is a GDT of type UUID. Sources of supply that refer to a product category on the above hierarchy level of the product category are also returned. A RecipientOrganisationalCentreUUID is a GDT of type UUID. A SenderBusinessPartnerUUID is a GDT of type UUID. A RequirementDateTime is a GDT of type GLOBAL_DateTime. A RequiredLotsizeQuantity is a GDT of type Quantity. The system returns the sources of supply for which the RequiredLotsizeQuantity is larger or the same as the MinimumLotsizeQuantity, and for which the RequiredLotsizeQuantity is smaller or the same as the MaximumLotsizeQuantity. A BaseObjectTypeCode is a GDT of type ObjectTypeCode and is optional. A BaseObjectNodeTypeCode is a GDT of type ObjectNodeTypeCode and is optional. A ProcurementCategoryCode is a GDT of type ProcurementCategoryCode and is optional. A LifeCycleStatusCode is a GDT of type SourceOfSupplyLifeCycleStatusCode and is optional.

QueryByProductCategoryAndRecipientBusinessPartner provides a list of all sources of supply for a particular product category and a particular business partner that is the recipient of the products in this product category. The sources of supply are valid for the specified point in time and are defined by the data type SourceOfSupplySourceOfSupplyProductCategoryAndRecipientBusinessPartnerQueryElements which include ProductCategoryHierarchyProductCategoryUUID, RecipientBusinessPartnerUUID, SenderBusinessPartnerUUID, RequirementDateTime, RequiredLotsizeQuantity, BaseObjectTypeCode, BaseObjectNodeTypeCode, ProcurementCategoryCode, and LifeCycleStatusCode. A ProductCategoryHierarchyProductCategoryUUID is a GDT of type UUID. Sources of supply that refer to a product category on the above hierarchy level of the product category are also returned. A RecipientBusinessPartnerUUID is a GDT of type UUID. A SenderBusinessPartnerUUID is a GDT of type UUID and is optional. A RequirementDateTime is a GDT of type GLOBAL_DateTime. A RequiredLotsizeQuantity is a GDT of type Quantity and is optional. The system returns the sources of supply for which the RequiredLotsizeQuantity is larger or the same as the MinimumLotsizeQuantity, and for which the RequiredLotsizeQuantity is smaller or the same as the MaximumLotsizeQuantity. A BaseObjectTypeCode is a GDT of type ObjectTypeCode and is optional. A BaseObjectNodeTypeCode is a GDT of type ObjectNodeTypeCode and is optional. A ProcurementCategoryCode is a GDT of type ProcurementCategoryCode and is optional. A LifeCycleStatusCode is a GDT of type SourceOfSupplyLifeCycleStatusCode and is optional.

QueryByProductIDAndRecipientCompanyID provides a list of all sources of supply for a particular product and a particular company that is the recipient of this product. The sources of supply are valid for the specified point in time and are defined by the datatype SourceOfSupplyProductIDAndRecipientCompanyIDQueryElements which include Product_IdentificationProductID, ProductTypeCode, RecipientCompany_ID, RequirementDateTime, LifeCycleStatusCode, and CreationUserAccountID. A Product_IdentificationProductID is a GDT of type ProductID. A ProductTypeCode is a GDT of typeProductTypeCode and is optional. A RecipientCompany_ID is a GDT of type OrganisationalCentreID and is optional. A RequirementDateTime is a GDT of type GLOBAL_DateTime. A LifeCycleStatusCode is a GDT of type SourceOfSupplyLifeCycleStatusCode and is optional. A CreationUserAccountID is a GDT of type UserAccountID and is optional.

QueryByProductCategoryIDAndRecipientCompanyID provides a list of all sources of supply for a particular product category and a particular company that is the recipient of this product category. The sources of supply are valid for the specified point in time and are defined by the datatype SourceOfSupplyProductCategoryIDAndRecipientCompanyIDQueryElements which include ProductCategoryHierarchy_ProductCategoryIDKey, RecipientCompany_ID, RequirementDateTime, LifeCycleStatusCode, and CreationUserAccountID. A ProductCategoryHierarchy_ProductCategoryIDKey is a GDT of type ProductCategoryHierarchyProductCategoryIDKey. A RecipientCompany_ID is a GDT of type OrganisationalCentreID and is optional. A RequirementDateTime is a GDT of type GLOBAL_DateTime. A LifeCycleStatusCode is a GDT of type SourceOfSupplyLifeCycleStatusCode. A CreationUserAccountID is a GDT of type UserAccountID.

QueryByProductAndRecipientOrganisationalCentreAndSenderBusinessPartner provides a list of all sources of supply for a particular product and a particular organizational centre that is the recipient of the product and a particular business partner that is the sender of this product. The sources of supply are valid within the specified time period and are defined by the datatype SourceOfSupplyProductAndRecipientOrganisationalCentreAndSenderBusinessPartnerQueryElements which include ProductUUID, RecipientOrganisationalCentreUUID, SenderBusinessPartnerUUID, ValidityDateTimePeriod, and LifeCycleStatusCode. A ProductUUID is a GDT of type UUID. A RecipientOrganisationalCentreUUID is a GDT of type UUID. A SenderBusinessPartnerUUID is a GDT of type UUID. A ValidityDateTimePeriod is a GDT of type UPPEROPEN_GLOBAL_DateTimePeriod. Sources Of Supply that are valid within this time period are returned. A LifeCycleStatusCode is a GDT of type SourceOfSupplyLifeCycleStatusCode and is optional.

QueryByElements provides a list of all sources of supply which refer to a particular business object or to a node of a business object and is defined by the data type SourceOfSupplyElementsQueryElements which include BusinessPartnerUUID, OrganisationalCentreUUID, BaseObjectNodeReference, ProductUUID, ProductCategoryHierarchyProductCategoryUUID, ProductCategoryHierarchyProductCategoryUUID, and LifeCycleStatusCode. A BusinessPartnerUUID is a GDT of type UUID and is optional.

A OrganisationalCentreUUID is a GDT of type UUID and is optional. A BaseObjectNodeReference is a GDT of type BaseObjectNodeReference and is optional. A ProductUUID is a GDT of type UUID and is optional. A ProductCategoryHierarchyProductCategoryUUID is a GDT of type UUID and is optional. A LifeCycleStatusCode is a GDT of type SourceOfSupplyLifeCycleStatusCode and is optional.

QueryByPurchasingContractIdAndPurchasingContractItemID provides a list of all sources of supply which refer to a particular purchasing contract item and is defined by the data type SourceOfSupplyPurchasingContractIdAndPurchasingContractItemIdQueryElements which include ReferenceCollectionPurchasingContractID, ReferenceCollectionPurchasingContractItemID, and LifeCycleStatusCode. A ReferenceCollectionPurchasingContractID is a GDT of type BusinessTransactionDocumentID. A ReferenceCollectionPurchasingContractItemID is a GDT of type BusinessTransactionDocumentItemID. A LifeCycleStatusCode is a GDT of type SourceOfSupplyLifeCycleStatusCode and is optional.

A ReferenceCollection contains the human-readable Identifiers for the References of the SourceOfSupply. The node ReferenceCollection contains the following elements, which are defined by the data type SourceOfSupplyReferenceCollectionElements which includes the PurchasingContractID, PurchasingContractItemID, and PurchasingContractItemKey. A PurchasingContractID is a GDT of type BusinessTransactionDocumentID and is a unique identifier of a contract that defines the business relationship.

A PurchasingContractItemID is a GDT of type BusinessTransactionDocumentItemID and is a unique identifier of an item of the contract that defines the business relationship PurchasingContractItemKey refers to the Alternative key of the LogisticRelationshipReferenceCollection 166042 which include the PurchasingContractId and the PurchasingContractItemId. A LogisticRelationship is a relationship between two locations that is used to procure and produce products. It defines logistical characteristics. The two locations can also be identical. This often occurs in the case of the production of materials and references the BO ReleasedPlanningProductionModel, Business object PurchasingContract, and Business object TransportationLane. If the goods are obtained or supplied from several geographical locations, several logistical relationships can exist for one source of supply.

A LogisticRelationship occurs under complete and disjoint specializations (independent of the specialization of the SourceOfSupply). An ExternalProcurementLogisticRelationship 166048 is a type of logistical relationship that contains all the parameters for external procurement. An InternalProcurementLogisticRelationship 166044 is a type of logistical relationship that contains all the parameters for internal procurement. An InternalProductionLogisticRelationship 166046 is a type of logistical relationship that contains all the parameters for in-house production.

A UUID is a GDT of type UUID and is the universal identifier of the logistical relationship A SystemAdministrativeData is a GDT of type SystemAdministrativeData which is the administrative data recorded by the system. This data includes system users and change dates/times.

A SenderLocationUUID is a GDT of type UUID which is a universal identifier of the geographical starting point of the logistical relationship and is optional.

A RecipientLocationUUID is a GDT of type UUID which is a universal identifier of a geographical end point of the logistical relationship or the location that produces the material.

A SenderTransportationZoneUUID is a GDT of type UUID which is a universal identifier of the transportation zone where the procurement relationship starts.

A RecipientTransportationZoneUUID is a GDT of typeUUID which is a universal identifier of the transportation zone where the procurement relationship ends and is optional.

A SenderSupplyPlanningAreaUUID is a GDT of type UUID and is a universal identifier of the requirements planning area where the logistical relationship starts which is optional.

A RecipientSupplyPlanningAreaUUID is a GDT of type UUID which is a universal identifier of the requirements planning area where procurement relationship ends or the requirements planning area where the material is produced and is optional.

A BaseObjectNodeReference, alternative key is a GDT of type ObjectNodeReference, Qualifier: Base which is a universal reference of the object from which the logistic relationship was replicated. A logistic relationship may be replicated from a material specific transportation lane, from an item of a purchasing contract or a released planning production model. The UUID may be specified, the ObjectNodeId may not be specified and is optional.

A ProcurementCategoryCode is a GDT of type ProcurementCategoryCode mandatory which is coded representation of the procurement category and is optional.

A ValidityPeriod is a GDT of type UPPEROPEN_LOCALNORMALISED_DateTimePeriod, Qualifier: Validity which refers to the time period during which the logistical relationship is valid and is optional.

A PriorityValue is a GDT of type PriorityValue which is a priority according to which the logistical relationship is taken into account in procurement and is optional.

GoodsIssueDuration is a GDT of type TIME_Duration, Qualifier: Issue referring to the duration of the goods issue process and is optional. Restriction to the GDT Duration: The GoodsIssueDuration is an exact time in minutes.

A GoodsIssueDurationRelevanceIndicator is a GDT of type Indicator, Qualifier: Relevance which indicates whether the GoodsIssueDuration has to be considered.

A GoodsReceiptDuration is a GDT of type TIME_Duration, Qualifier: Receipt refers to the duration of the goods receipt process. Restriction of the GDT Duration: The GoodsReceiptDuration is an exact time in minutes.

A GoodsReceiptDurationRelevanceIndicator is a GDT of type Indicator, Qualifier: Relevance which indicates whether the GoodsReceiptDuration has to be considered.

A PlannedProductionFixedDuration is a GDT of TIME_Duration Qualifier: Fixed and refers to the planned, fixed duration of production and is optional. Restriction of the GDT Duration: The PlannedProductionFixedDuration is an exact time in seconds.

A PlannedProductionVariableDuration is a GDT of TIME_Duration Qualifier: Variable which is a planned, variable duration of production that depends on the lot size that is to be produced is optional. Restriction of the GDT Duration: The PlannedProductionVariableDuration is an exact time in seconds.

A MinimumLotsizeQuantity is a GDT of Quantity, Qualifier: Lotsize referring to the smallest permitted lot size during transportation and is optional.

A MinimumLotsizeQuantityTypeCode is a GDT of type QuantityTypeCode, Qualifier: Lotsize which is coded representation of the type of the MinimumLotsizeQuantity and is optional.

A MaximumLotsizeQuantity is a GDT of type Quantity, Qualifier: Lotsize which is the largest permitted lot size during transportation and is optional.

MaximumLotsizeQuantityTypeCode is a GDT of type QuantityTypeCode, Qualifier: Lotsize and is coded representation of the type of the MaximumLotsizeQuantity which is optional.

A Status refers to the current status of the LogisticRelationship and is defined by the data type SourceOfSupplyLogisticRelationshipStatus which includes the LifeCycleStatusCode, the SourceOfSupplyLifeCycleStatusCode, and the OverallLifeCycleStatusCode. A LifeCycleStatusCode describes stages in the life of a LogisticRelationship. A SourceOfSupplyLifeCycleStatusCode describes the LifeCycle stage of the root node. A OverallLifeCycleStatusCode summarizes the LifeCycleStatus and the SourceOfSupplyLifeCycleStatus.

There may be a number of Inbound Aggregation Relationships including RecipientLocation may have a cardinality relationship of c:cn. A RecipientLocationIdentifies the target location of the geographical point that is linked logistically. TransportationLaneValidMaterials which refers to the material-specific transportation lane to which the source of supply refers may have a cardinality of c:1. From the business object PurchasingContract/item (cannot be modeled in ESR) a PurchasingContractItem may which refers to the purchasing contract item for which the source of supply was created may have a cardinality of c:c.

From the business object ReleasedPlanningProductionModel, ReleasedPlanningProductionModel may have a cardinality of c:1.

There may be a number of Inbound Aggregation Relationships including from the business object Location, SenderLocation which identifies the starting location of the geographical points that are linked logistically and has a cardinality of c:cn. From the business object TransportationZone, SenderTransportationZone in which transportation zone where the procurement relationship start has a cardinality of c:cn. From the business object TransportationZone, RecipientTransportationZone where the transportation zone where the procurement relationship ends has a cardinality of c:cn. From the business object SupplyPlanningArea, the SenderSupplyPlanningArea which identifies the initial planning area has a cardinality of c:cn. From the business object SupplyPlanningArea, the RecipientSupplyPlanningArea which identifies the target planning are has a cardinality of c:cn. From the business object Identity, CreationIdentity which identifies the Identity that created the SourceOfSupply has a cardinality of 1:cn. From the business object Identity, LastChangedIdentity identifies the Identity that changed the SourceOfSupply and has a cardinality of c:cn.

A LogisticRelationshipReferenceCollection has a cardinality of 1:c. In case the LogisticRelationship is based on an item of a purchasing contract, RecipientLocationUUID may be specified.

SenderLocationUUID, SenderTransportationZoneUUID, RecipientTransportationZoneUUID, SenderSupplyPlanningAreaUUID and RecipientSupplyPlanningAreaUUID may not be specified.

In case the LogisticRelationship is based on a material specific transportation lane, SenderLocationUUID may be specified. RecipientLocationUUID or RecipientTransportationZoneUUID may be specified.

SenderTransportationZoneUUID, RecipientSupplyPlanningAreaUUID and SenderSupplyPlanningAreaUUID may not be specified.

In case the LogisticRelationship is based on a ReleasedPlanningProductionModel, Sender- and RecipientSupplyPlanningAreaUUID may be specified in the same way. SenderLocationUUID, RecipientLocationUUID, SenderTransportationZoneUUID and RecipientTransportationZoneUUID may not be specified.

There can be several LogisticRelationships based on a ReleasedPlanningProductionModel for the same SourceOfSupply, which may then be based on a ProductionModel. The LogisticRelationship may be active while the others may be blocked.

RecipientLocationUUID and RecipientTransportationZoneUUID may not be specified together.

SenderLocationUUID and SenderTransportationZoneUUID may not be specified together.

If the PurchasingContractItemUUID of a contract is specified in the SourceOfSupply, and no TransportationLane is assigned to this contract, a LogisticRelationship is created for each RecipientLocation of the contract. In this LogisticRelationship the UUID and the ProcurementCategoryCode are defined. If no RecipientLocation is specified, a LogisticRelationship is created in which the UUID and the Procurement- TypeCode are defined. The LogisticRelationship then exists in the specialization ExternalProcurementLogisticRelationship, and the ProcurementType is defined accordingly.

Activate (S&AM action) activates a LogisticRelationship. In some implementations, preconditions may be where the LogisticRelationship is consistent and has the LifeCycleStatus 'In Preparation'. Changes to the status may include sets the LifeCycleStatus to 'Active'. In some implementations, the action is called from TransportationLane, ReleasedPlanningProductionModel, and PurchasingContract.

Block (S&AM action) blocks a LogisticRelationship. In some implementations, the LogisticRelationship has the LifeCycleStatus 'Active'. Changes to the status may include sets the LifeCycleStatus to 'Blocked'. In some implementations, the action is called TransportationLane, ReleasedPlanningProductionModel, and PurchasingContract.

Unblock (S&AM action) puts a LogisticRelationship back to 'Active'. In some implementations, the LogisticRelationship has the LifeCycleStatus 'Blocked'. Changes to the status may include sets the LifeCycleStatus to 'Active'. In some implementations, the actions is called TransportationLane, ReleasedPlanningProductionModel, and PurchasingContract.

FlagAsObsolete (S&AM action) flags a LogisticRelationship as obsolete. In some implementations, the LogisticRelationship has the LifeCycleStatus 'Active' or 'Blocked'. Changes to the status may include sets the LifeCycleStatus to 'Obsolete'. In some implementations, the action is called TransportationLane, ReleasedPlanningProductionModel, and PurchasingContract.

RevokeObsolescence (S&AM action) puts a LogisticRelationship back to 'Blocked'. In some implementations, preconditions may be that LogisticRelationship has the LifeCycleStatus 'Obsolete'. Changes to the status may include sets the LifeCycleStatus to 'Blocked'. In some implementations, the action is called fromTransportationLane, ReleasedPlanningProductionModel, and PurchasingContract.

QueryByProductAndRecipientOrganisationalCentre provides a list of all logistical relationships for a particular product and a particular organizational center that is the recipient of this product. The logistical relationships are valid for the specified point in time and are defined by the GDT SourceOfSupplyLogisticRelationship-ProductAndRecipientOrganisationalCentreQueryElements which include SourceOfSupplyProductUUID, SourceOfSupplyCatalogueReference, SourceOfSupplyProductSellerID, SourceOfSupplyProductTypeCode, SourceOfSupplyRecipientOrganisationalCentreUUID, RecipientLocationUUID, SourceOfSupplySenderBusinessPartnerUUID, RequirementDateTime, RequiredLotsizeQuantity, SourceOfSupply ProcurementCategoryCode, SourceOfSupplyBaseObjectTypeCode, SourceOfSupplyBaseObjectNodeTypeCode, and OverallLifeCycleStatusCode. A SourceOfSupplyProductUUID is a GDT of type UUID and is optional. The logistic relationships that refer to the product category of the specified product, to a product category on the above hierarchy level of the product category of the specified product or to all materials are also returned. A SourceOfSupplyCatalogueReference is a GDT of type CatalogueReference and is optional. A SourceOfSupplyProductSellerID is a GDT of type ProductPartyID and is optional. A SourceOfSupplyProductTypeCode is a GDT of type ProductTypeCode and is optional. A SourceOfSupplyRecipientOrganisationalCentreUUID is a GDT of type UUID. A RecipientLocationUUID is a GDT of type UUID and is optional. Logistic relationships that are defined for RecipientLocations on the above level in the location hierarchy are also returned. Logistic relationships that are defined for a RecipientTransportationZone that contains the location are also returned. A SourceOfSupplySenderBusinessPartnerUUID is a GDT of type UUID and is optional. A RequirementDateTime is a GDT of type _GLOBAL_DateTime. A RequiredLotsizeQuantity is a GDT of type Quantity and is optional. The system returns logistical relationships for which the RequiredLotsizeQuantity is larger or the same as the MinimumLotsizeQuantity, and for which the RequiredLotsizeQuantity is smaller or the same as the MaximumLotsizeQuantity. A SourceOfSupply ProcurementCategoryCode is a GDT of type SourceOfSupply ProcurementCategoryCode and is optional. A SourceOfSupplyBaseObjectTypeCode is a GDT of type ObjectTypeCode and is optional. A SourceOfSupplyBaseObjectNodeTypeCode is a GDT of type ObjectNodeTypeCode and is optional. A OverallLifeCycleStatusCode is a GDT of type SourceOfSupplyLogisticRelationshipLifeCycleStatusCode and is optional.

QueryByProductAndRecipientBusinessPartner provides a list of all logistical relationships for a particular product and a particular business partner that is the recipient of this product. The logistical relationships are valid for the specified point in time and are defined by the GDT SourceOfSupplyLogisticRelationshipProductAndRecipientBusiness PartnerQueryElements which includes SourceOfSupplyProductUUID, SourceOfSupplyProductSellerID, SourceOfSupplyProductUUID (optional) SourceOfSupplyProductTypeCode, SourceOfSupplyRecipientBusinessPartnerUUID, SourceOfSupplyRecipientBusinessPartnerUUID, RecipientLocationUUID, RecipientLocationUUID, SourceOfSupplySenderBusinessPartnerUUID, RequirementDateTime, RequiredLotsizeQuantity, SourceOfSupply ProcurementCategoryCode, SourceOfSupplyBaseObjectTypeCode, SourceOfSupplyBaseObjectNodeTypeCode, and OverallLifeCycleStatusCode. A SourceOfSupplyProductUUID is a GDT of type UUID and is optional. Logistic relationships that refer to the product category of the specified product, to a product category on the above hierarchy level of the product category of the specified product or to all materials are also returned. A SourceOfSupplyCatalogueReference is a GDT of type CatalogueReference and is optional. A SourceOfSupplyProductSellerID is a GDT of type ProductPartyID and is optional. A SourceOfSupplyProductTypeCode is a GDT of type ProductTypeCode. A SourceOfSupplyRecipientBusinessPartnerUUID is a GDT of type UUID. A RecipientLocationUUID is a GDT of type UUID and is optional. Logistic relationships that are defined for RecipientLocations on the above level in the location hierarchy are also returned. Logistic relationships that are defined for a RecipientTransportationZone that contains the location are also returned. A SourceOfSupplySenderBusinessPartnerUUID is a GDT of type UUID and is optional. A RequirementDateTime is a GDT of type _GLOBAL_DateTime and is optional. A RequiredLotsizeQuantity is a GDT of type Quantity and is optional. The system returns logistical relationships for which the RequiredLotsizeQuantity is larger or the same as the MinimumLotsizeQuantity, and for which the RequiredLotsizeQuantity is smaller or the same as the MaximumLotsizeQuantity. A SourceOfSupply ProcurementCategoryCode is a GDT of type SourceOfSupply ProcurementCategoryCode and is optional. A SourceOfSupplyBaseObjectTypeCode is a GDT of type ObjectTypeCode and is optional. A SourceOfSupplyBaseObjectNodeTypeCode is a GDT of type ObjectNodeTypeCode and is optional. A OverallLifeCycleStatusCode is a GDT of type SourceOfSupplyLogisticRelationshipLifeCycleStatusCode and is optional.

QueryByProductCategoryAndRecipientOrganisationalCentre provides a list of all logistical relationships for a particular product category and a particular organizational center that is the recipient of the products in this product category. The logistical relationships are valid for the specified point in time and are defined by the GDT SourceOfSupplyLogisticRelationshipProductCategoryAndRecipientOrganisationalCentreQueryElements which include SourceOfSupplyProductCategoryHierarchyProductCategoryUUID, SourceOfSupplyRecipientOrganisationalCentreUUID, RecipientLocationUUID, SourceOfSupplySenderBusinessPartnerUUID, RequirementDateTime, RequiredLotsizeQuantity, SourceOfSupply ProcurementCategoryCode, SourceOfSupplyBaseObjectTypeCode, SourceOfSupplyBaseObjectNodeTypeCode, and OverallLifeCycleStatusCode. A SourceOfSupplyProductCategoryHierarchyProductCategoryUUID is a GDT of type UUID. Logistic relationships that refer to a product category on the above hierarchy level of the product category are also returned. A SourceOfSupplyRecipientOrganisationalCentreUUID is a GDT of type UUID. A RecipientLocationUUID is a GDT of type UUID and is optional. Logistic relationships that are defined for RecipientLocations on the above level in the location hierarchy are also returned. Logistic relationships that are defined for a RecipientTransportationZone that contains the location are also returned. A SourceOfSupplySenderBusinessPartnerUUID is a GDT of type UUID and is optional. A RequirementDateTime is a GDT of type _GLOBAL_DateTime. A RequiredLotsizeQuantity is a GDT of type Quantity and is optional. The system returns logistical relationships for which the RequiredLotsizeQuantity is larger or the same as the MinimumLotsizeQuantity, and for which the RequiredLotsizeQuantity is smaller or the same as the MaximumLotsizeQuantity. A SourceOfSupply ProcurementCategoryCode is a GDT of type SourceOfSupply ProcurementCategoryCode and is optional. A SourceOfSupplyBaseObjectTypeCode is a GDT of type ObjectTypeCode and is optional. A SourceOfSupplyBaseObjectNodeTypeCode is a GDT of type ObjectNodeTypeCode and is optional. An OverallLifeCycleStatusCode is a GDT of type SourceOfSupplyLogisticRelationshipLifeCycleStatusCode and is optional.

QueryByProductCategoryAndRecipientBusinessPartner provides a list of all logistical relationships for a particular product category and for a particular business partner that is the recipient of the products in this product category. The logistical relationships are valid for the specified point in time and are defined by the data type SourceOfSupplySourceOfSupplyLogisticRelationshipProductCategoryAndRecipientBusinessPartner QueryElements which include SourceOfSupplyProductCategoryHierarchyProductCategoryUUID, SourceOfSupplyRecipientBusinessPartnerUUID, RecipientLocationUUID, SourceOfSupplySenderBusinessPartnerUUID, SourceOfSupplySenderBusinessPartnerUUID, RequirementDateTime, RequiredLotsizeQuantity, SourceOfSupply ProcurementCategoryCode, SourceOfSupplyBaseObjectTypeCode, and SourceOfSupplyBaseObjectNodeTypeCode. A SourceOfSupplyProductCategoryHierarchyProductCategoryUUID is a GDT of type UUID. Logistic relationships that refer to a product category on the above hierarchy level of the product category are also returned. A SourceOfSupplyRecipientBusinessPartnerUUID is a GDT of type UUID and is optional. A RecipientLocationUUID is a GDT of type UUID and is optional. Logistic relationships that are defined for RecipientLocations on the above level in the location hierarchy are also returned. Logistic relationships that are defined for a RecipientTransportationZone that contains the location are also returned. A SourceOfSupplySenderBusinessPartnerUUID is a GDT of type UUID and is optional. A RequirementDateTime is a GDT of type _GLOBAL_DateTime and is optional. A RequiredLotsizeQuantity is a GDT of type Quantity. The system returns logistical relationships for which the RequiredLotsizeQuantity is larger or the same as the MinimumLotsizeQuantity, and for which the RequiredLotsizeQuantity is smaller or the same as the MaximumLotsizeQuantity. A SourceOfSupply ProcurementCategoryCode is a GDT of type SourceOfSupply ProcurementCategoryCode and is optional. A SourceOfSupplyBaseObjectTypeCode is a GDT of type ObjectTypeCode and is optional. A SourceOfSupplyBaseObjectNodeTypeCode is a GDT of type ObjectNodeTypeCode and is optional. A OverallLifeCycleStatusCode is a GDT of type SourceOfSupplyLogisticRelationshipLifeCycleStatusCode and is optional.

QueryByProductAndRecipientLocation provides a list of all logistical relationships for a particular production and a particular geographical end point of the logistical relationship. The logistical relationships are valid for the specified point in time and are defined by the GDT SourceOfSupplyLogisticRelationshipProductAndRecipientLocationQueryElements which includes SourceOfSupplyProductUUID, SourceOfSupplyProductTypeCode, RecipientLocationUUID, RequirementDateTime, RequiredLotsizeQuantity, SourceOfSupply ProcurementCategoryCode, and OverallLifeCycleStatusCode. A SourceOfSupplyProductUUID is a GDT of type UUID. Logistic relationships that refer to the product category of the specified product, to a product category on the above hierarchy level of the product category of the specified product or to all materials are also returned. A SourceOfSupplyProductTypeCode is a GDT of type ProductTypeCode. A RecipientLocationUUID is a GDT of type UUID. Logistic relationships that are defined for RecipientLocations on the above level in the location hierarchy are also returned. Logistic relationships that are defined for a RecipientTransportationZone that contains the location are also returned. A RequirementDateTime is a GDT of type _GLOBAL_DateTime. A RequiredLotsizeQuantity is a GDT of type Quantity and is optional. The system returns logistical relationships for which the RequiredLotsizeQuantity is larger or the same as the MinimumLotsizeQuantity, and for which the RequiredLotsizeQuantity is smaller or the same as the MaximumLotsizeQuantity. A SourceOfSupply ProcurementCategoryCode is a GDT of type SourceOfSupply ProcurementCategoryCode and is optional. A OverallLifeCycleStatusCode is a GDT of type SourceOfSupplyLogisticRelationshipLifeCycleStatusCode and is optional.

QueryByProductAndRecipientTransportationZone provides a list of all logistical relationships for a particular product and for a particular transportation zone where the procurement relationship ends. The logistical relationships are valid for the specified point in time and is defined by the data type SourceOfSupplySourceOfSupplyLogisticRelationshipProductAndRecipientTransportationZoneQueryElements that include SourceOfSupplyProductUUID, SourceOfSupplyProductTypeCode, RecipientTransportationZoneUUID, RequirementDateTime, RequiredLotsizeQuantity, SourceOfSupply ProcurementCategoryCode, and OverallLifeCycleStatusCode. A SourceOfSupplyProductUUID is a GDT of type UUID. Logistic relationships that refer to the product category of the specified product, to a product category on the above hierarchy level of the product category of the specified product or to all materials are also returned. A SourceOfSupplyProductTypeCode is a GDT of type ProductTypeCode. A RecipientTransportationZoneUUID is a GDT of type UUID. A RequirementDateTime is a GDT of type _GLOBAL_DateTime and is optional. A RequiredLotsizeQuantity is a GDT of type Quantity and is optional. The system returns logistical relationships for which the RequiredLotsizeQuantity is larger or the same as the MinimumLotsizeQuantity, and for which the RequiredLotsizeQuantity is smaller or the same as the MaximumLotsizeQuantity. A SourceOfSupply ProcurementCategoryCode is a GDT of type SourceOfSupply ProcurementCategoryCode and is optional. A OverallLifeCycleStatusCode is a GDT of type SourceOfSupplyLogisticRelationshipLifeCycleStatusCode and is optional.

QueryByProductAndRecipientSupplyPlanningArea provides a list of all logistical relationships for a particular product and for a particular requirements planning area where the procurement relationship ends. The logistical relationships are valid for the specified point in time and is defined by the data type SourceOfSupplySourceOfSupplyLogisticRelationshipProductAndRecipientSupplyPlanningAreaQueryElements which includes SourceOfSupplyProductUUID, SourceOfSupplyProductTypeCode, RecipientSupplyPlanningAreaUUID, RequirementDateTime, RequiredLotsizeQuantity, SourceOfSupply ProcurementCategoryCode, and OverallLifeCycleStatusCode. A SourceOfSupplyProductUUID is a GDT of type UUID. Logistic relationships that refer to the product category of the specified product, to a product category on the above hierarchy level of the product category of the specified product or to all materials are also returned. A SourceOfSupplyProductTypeCode is a GDT of type ProductTypeCode. A RecipientSupplyPlanningAreaUUID is a GDT of type UUID. Logistic relationships that are defined for RecipientLocations that belong to this supply planning area are also returned.

Logistic relationships that are defined for RecipientOrganisationalCentres that belong to locations of this supply planning area are also returned. A RequirementDateTime is a GDT of type _GLOBAL_DateTime.

The system returns logistical relationships for which the RequirementDateTime is larger or the same as the ValidityPeriodStartDateTime, and for which the RequirementDateTime is smaller or the same as the ValidityPeriodEndDateTime. A RequiredLotsizeQuantity is a GDT of type Quantity. The system returns logistical relationships for which the RequiredLotsizeQuantity is larger or the same as the MinimumLotsizeQuantity, and for which the RequiredLotsizeQuantity is smaller or the same as the MaximumLotsizeQuantity. A SourceOfSupply ProcurementCategoryCode is a GDT of type SourceOfSupply ProcurementCategoryCode. A OverallLifeCycleStatusCode is a GDT of type SourceOfSupplyLogisticRelationshipLifeCycleStatusCode and is optional.

QueryByProductCategoryAndRecipientLocation provides a list of all logistical relationships for a particular production category and a particular geographical end point of the logistical relationship. The logistical relationships are valid for the specified point in time and are defined by the data type SourceOfSupplyLogisticRelationshipProductCategoryAndRecipientLocationQueryElements which includes SourceOfSupplyProductCategoryHierarchyProductCategoryUUID, RecipientLocationUUID, RequirementDateTime, RequiredLotsizeQuantity, and OverallLifeCycleStatusCode. A SourceOfSupplyProductCategoryHierarchyProductCategoryUUID is a GDT of type UUID. Logistic relationships that refer to a product category on the above hierarchy level of the product category are also returned. A RecipientLocationUUID is a GDT of type UUID. A RequirementDateTime is a GDT of type _GLOBAL_DateTime. The system returns logistical relationships for which the RequirementDateTime is larger or the same as the ValidityPeriodStartDateTime, and for which the RequirementDateTime is smaller or the same as the ValidityPeriodEndDateTime. A RequiredLotsizeQuantity is a GDT of type Quantity. The system returns logistical relationships for which the RequiredLotsizeQuantity is larger or the same as the MinimumLotsizeQuantity, and for which the RequiredLotsizeQuantity is smaller or the same as the MaximumLotsizeQuantity. A OverallLifeCycleStatusCode is a GDT of type SourceOfSupplyLogisticRelationshipLifeCycleStatusCode.

QueryBySourceOfSupplyAndRecipientLocation provides a list of all logistical relationships that belong to a particular source of supply, have a particular geographical end point, and that are valid for the specified point in time and is defined by the GDT SourceOfSupplyLogisticRelationshipSourceOfSupplyAndRecipientLocationQueryElements which includes SourceOfSupplyUUID, RecipientLocationUUID, RequirementDateTime, RequiredLotsizeQuantity, SourceOfSupply ProcurementCategoryCode, and OverallLifeCycleStatusCode. A SourceOfSupplyUUID is a GDT of type UUID. A RecipientLocationUUID is a GDT of type UUID. Logistic relationships that are defined for RecipientLocations on the above level in the location hierarchy are also returned. Logistic relationships that are defined for a RecipientTransportationZone that contains the location are also returned. A RequirementDateTime is a GDT of type _GLOBAL_DateTime. The system returns logistical relationships for which the RequirementDateTime is larger or the same as the ValidityPeriodStartDateTime, and for which the RequirementDateTime is smaller or the same as the ValidityPeriodEndDateTime. A RequiredLotsizeQuantity is a GDT of type Quantity and is optional. The system returns logistical relationships for which the RequiredLotsizeQuantity is larger or the same as the MinimumLotsizeQuantity, and for which the RequiredLotsizeQuantity is smaller or the same as the MaximumLotsizeQuantity. A SourceOfSupply ProcurementCategoryCode is a GDT of type SourceOfSupply ProcurementCategoryCode and is optional.

A OverallLifeCycleStatusCode is a GDT of type SourceOfSupplyLogisticRelationshipLifeCycleStatusCode and is optional.

QueryBySourceOfSupplyAndRecipientSupplyPlanningArea provides a list of all logistical relationships that belong to a particular source of supply, have a particular supply planning area at which the procurement relationship ends, and that are valid for the specified point in time and is defined by the data type SourceOfSupplyLogisticRelationship-SourceOfSupplyAndRecipient-SupplyPlanningAreaQueryElements which include SourceOfSupplyUUID (mandatory) (GDT: UUID)

RecipientSupplyPlanningAreaUUID (Mandatory) (GDT: UUID)

Comment: Logistic Relationships that are Defined for RecipientLocations that Belong to this supply planning area are also returned.

Logistic relationships that are defined for RecipientOrganisationalCentres that belong to locations of this supply planning area are also returned.

RequirementDateTime (Mandatory)

(GDT: _GLOBAL_DateTime) The system returns logistical relationships for which the RequirementDateTime is larger or the same as the ValidityPeriodStartDateTime, and for which the RequirementDateTime is smaller or the same as the ValidityPeriodEndDateTime.

RequiredLotsizeQuantity (Optional)

(GDT: Quantity) The system returns logistical relationships for which the RequiredLotsizeQuantity is larger or the same as the MinimumLotsizeQuantity, and for which the RequiredLotsizeQuantity is smaller or the same as the MaximumLotsizeQuantity.

SourceOfSupply ProcurementCategoryCode (optional)

(GDT: SourceOfSupply ProcurementCategoryCode)

OverallLifeCycleStatusCode (Optional)

(GDT: SourceOfSupplyLogisticRelationshipLifeCycleStatusCode)

QueryByPurchasingContractItemAndRecipientLocation provides a list of all logistical relationships for a particular item of a particular contract and a particular geographical end point that are valid for the specified point in time which are defined by the data type SourceOfSupplyLogisticRelationshipPurchasingContractItemAndRecipientLocationQueryElements includes PurchasingContractItemUUID, RecipientLocationUUID, RequirementDateTime, RequiredLotsizeQuantity, SourceOfSupply ProcurementCategoryCode, and OverallLifeCycleStatusCode. A PurchasingContractItemUUID is a GDT of type UUID. A RecipientLocationUUID is a GDT of type UUID. Logistic relationships that are defined for RecipientLocations on the above level in the location hierarchy are also returned. Logistic relationships that are defined for a RecipientTransportationZone that contains the location are also returned. A RequirementDateTime is a GDT of type _GLOBAL_DateTime. The system returns logistical relationships for which the RequirementDateTime is larger or the same as the ValidityPeriodStartDateTime, and for which the RequirementDateTime is smaller or the same as the ValidityPeriodEndDateTime. A RequiredLotsizeQuantity is a GDT of type Quantity. The system returns logistical relationships for which the RequiredLotsizeQuantity is larger or the same as the MinimumLotsizeQuantity, and for which the RequiredLotsizeQuantity is smaller or the same as the MaximumLotsizeQuantity. A SourceOfSupply ProcurementCategoryCode is a GDT of type SourceOfSupply ProcurementCategoryCode and is optional. A OverallLifeCycleStatusCode is a GDT of type SourceOfSupplyLogisticRelationshipLifeCycleStatusCode and is optional.

QueryByPurchasingContractItemAndRecipientSupplyPlanningArea provides a list of all logistical relationships for a particular item of a particular contract and a particular supply planning area at which the procurement relationship ends, that are valid for the specified point in time and is defined by the data type SourceOfSupplyLogisticRelationshipPurchasingContractItemAndRecipientSupplyPlanningAreaQueryElements which includes PurchasingContractItemUUID, RecipientSupplyPlanningAreaUUID, RequirementDateTime, RequiredLotsizeQuantity, SourceOfSupply ProcurementCategoryCode, and OverallLifeCycleStatusCode. A PurchasingContractItemUUID is a GDT of type UUID. A RecipientSupplyPlanningAreaUUID is a GDT of type UUID. Logistic relationships that are defined for RecipientLocations that belong to this supply planning area are also returned. Logistic relationships that are defined for RecipientOrganisationalCentres that belong to locations of this supply planning area are also returned. A RequirementDateTime is a GDT of type _GLOBAL_DateTime and is optional. The system returns logistical relationships for which the RequirementDateTime is larger or the same as the ValidityPeriodStartDateTime, and for which the RequirementDateTime is smaller or the same as the ValidityPeriodEndDateTime. A RequiredLotsizeQuantity is a GDT of type Quantity and is optional. The system returns logistical relationships for which the RequiredLotsizeQuantity is larger or the same as the MinimumLotsizeQuantity, and for which the RequiredLotsizeQuantity is smaller or the same as the MaximumLotsizeQuantity. A SourceOfSupply ProcurementCategoryCode is a GDT of type SourceOfSupply ProcurementCategoryCode and is optional. A OverallLifeCycleStatusCode is a GDT of type SourceOfSupplyLogisticRelationshipLifeCycleStatusCode and is optional.

QueryByProductIDAndRecipientSupplyPlanningAreaID provides a list of all logistical relationships for a particular product and for a particular requirements planning area where the procurement relationship ends. The logistical relationships are valid for the specified point in time and is defined by the datatype SourceOfSupplyLogisticRelationshipProductIDAndRecipientSupplyPlanningAreaIDQueryElements which includes Product_IdentificationProductID, SourceOfSupplyProductTypeCode, RecipientSupplyPlanningArea_ID, RequirementDateTime, OverallLifeCycleStatusCode, and CreationUserAccountID. A Product_IdentificationProductID is a GDT of type ProductID. A SourceOfSupplyProductTypeCode is a GDT of type ProductTypeCode and is optional. A RecipientSupplyPlanningArea_ID is a GDT of type SupplyPlanningAreaID. Logistic relationships that are defined for RecipientLocations that belong to this supply planning area are also returned. Logistic relationships that are defined for RecipientOrganisationalCentres that belong to locations of this supply planning area are also returned. A RequirementDateTime is a GDT of type GLOBAL_DateTime. The system returns logistical relationships for which the RequirementDateTime is larger or the same as the ValidityPeriodStartDateTime, and for which the RequirementDateTime is smaller or the same as the ValidityPeriodEndDateTime. A OverallLifeCycleStatusCode is a GDT of type SourceOfSupplyLogisticRelationshipLifeCycleStatusCode and is optional. A CreationUserAccountID is a GDT of type UserAccountID and is optional.

QueryByRecipientLocationIDAndRecipientTransportationZoneID provides a list of all logistical relationships for a particular location or transportation zone where the procurement relationship ends is defined by the datatype SourceOfSupplyLogisticRelationshipRecipientLocationIDAndRecipientTransportationZoneIDQuery Elements which includes RecipientLocation_ID, RecipientTransportationZone_ID, and OverallLifeCycleStatusCode. A RecipientLocation_ID is a GDT of type LocationID and is optional. A RecipientTransportationZone_ID is a GDT of type TransportationZoneID and is optional. A OverallLifeCycleStatusCode is a GDT of type SourceOfSupplyLogisticRelationshipLifeCycleStatusCode and is optional.

QueryByElements provides a list of all logistical relationships which refer to a particular business object or to a node of a business object and is defined by the data type SourceOfSupplyLogisticRelationshipElementsQueryElements which includes LocationUUID, TransportationZoneUUID, SupplyPlanningAreaUUID, BaseObjectNodeReference, and OverallLifeCycleStatusCode. A LocationUUID is a GDT of type UUID and is optional. A TransportationZoneUUID is a GDT of type UUID and is optional. A SupplyPlanningAreaUUID is a GDT of type UUID and is optional. A BaseObjectNodeReference is a GDT of type ObjectNodeReference and is optional.

A OverallLifeCycleStatusCode is a GDT of type SourceOfSupplyLogisticRelationshipLifeCycleStatusCode and is optional.

QueryByPurchasingContractIdAndPurchasingContractItemID provides a list of all logistical relationships which refer to a particular purchasing contract item and is defined by the data type The query elements are defined by the data type SourceOfSupplyLogisticRelationshipPurchasingContractIdAndPurchasingContractItemIdQueryElements which includes LogisticRelationshipReferenceCollectionPurchasingContractID, LogisticRelationshipReferenceCollectionPurchasingContractItemID, and OverallLifeCycleStatusCode.

A LogisticRelationshipReferenceCollectionPurchasingContractID is a GDT of type BusinessTransactionDocumentID.

A LogisticRelationshipReferenceCollectionPurchasingContractItemID is a GDT of type BusinessTransactionDocumentItemID.

A OverallLifeCycleStatusCode is a GDT of type SourceOfSupplyLogisticRelationshipLifeCycleStatusCode and is optional. A LogisticRelationshipReferenceCollection contains the human-readable Identifiers for the References of the LogisticRelationship. The node LogisticRelationshipReferenceCollection contains the following elements, which are defined by the data type SourceOfSupplyLogisticRelationshipReferenceCollectionElements and include PurchasingContractID, PurchasingContractItemID, and PurchasingContractItemKey. A PurchasingContractID is a GDT of type BusinessTransactionDocumentID which is a unique identifier of a contract that defines the business relationship. A PurchasingContractItemID is a GDT of type BusinessTransactionDocumentItemID which is a unique identifier of an item of the contract that defines the business relationship. PurchasingContractItemKey which is the Alternative key LogisticRelationshipReferenceCollection for the PurchasingContractId and the PurchasingContractItemId.

Business Object SourcingList

FIGS. 167-1 through 167-7 illustrate an example SourcingList business object model 167024. Specifically, this model depicts interactions among various hierarchical components of the SourcingList, as well as external components that interact with the SourcingList (shown here as 167000 through 167022 and 167026 through 167074).

Business Object SourcingList is a list of internal and external procurement options. The procurement option defines a source of supply with an (optional) transportation lane and/or a supply quota arrangement. The business object SourcingList SourcingList is part of the foundation layer. It is part of the process component SourceOfSupplyDetermination. The TO SourcingList can be used to select procurement options based on freely-defined business criteria and to sort the procurement options according to priority. The selection and sorting itself is guaranteed by the Reuse Component SourcingEngine. Different procurement options can relate to the same source of supply. For example, the rule for prioritizing procurement options can be chosen in business configuration. If the user chooses Procurement Priority the list is sorted according to procurement priority.

The TO SourcingList is the list of procurement options. The Node Structure of Business Object SourcingListSourcingList 167072 is a list of internal and external procurement options. The procurement option defines a source of supply with an (optional) transportation lane and/or a supply quota arrangement. The root node SourcingList contains elements which are defined by the data type SourcingListElements, which can include ConsumerBusinessObjectNodeReference, SourcingContextCode, and SourceOfSupplyPriorityRuleCode. ConsumerBusinessObjectNodeReference, an alternative key, is a reference to the hosting BO node, and may be based on GDT: ObjectNodeReference. In some implementations, UUID must be specified and ObjectID must not be specified. SourcingContextCode is the SourcingContextCode is the context in which the source of supply determination takes place and may be based on GDT: SourcingContextCode. SourceOfSupplyPriorityRuleCode is optional, is the priority rule by which sources of supply are listed, and may be of based on GDT: SourceOfSupplyPriorityRuleCode.

A number of Composition Relationships to subordinate nodes can exist, such as Item 167074, with a cardinality of 1:cn.

An enterprise service infrastructure action CreateSourcingList can create a sorted list of sources of supply. The action can set up a sorted list of sources of supply. One item can be created for each source of supply or for each logistic relationship of a source of supply. The content of the items is defined by the RC SourcingEngine. The action elements are defined by the data type SourcingList SourcingListCreateSourcingListActionElements. These elements can include ItemSourceOfSupplyProductUUID, ItemSourceOfSupplyProductTypeCode, ItemSourceOfSupplyProductCategoryUUID, ItemSourceOfSupplyCatalogueReference, ItemSourceOfSupplyProductSellerID, ItemSourceOfSupplySenderBusinessPartnerUUID, ItemSourceOfSupplyRecipientBusinessPartnerUUID, ItemSourceOfSupplyRecipientOrganisationalCentreUUID, ItemSourceOfSupplyRecipientOrganisationalCentreBusinessCharacterCode, ItemSourceOfSupplyLogisticalRelationshipRecipientTransportationZoneUUID, ItemSourceOfSupplyLogisticalRelationshipRecipientLocationUUID, ItemSourceOfSupplyLogisticalRelationshipRecipientSupplyPlanningAreaUUID, RequirementDateTime, RequirementLotsizeQuantity, RequirementLotsizeQuantityTypeCode, MaximumLatenessDuration, ItemSourceOfSupplyProcurementCategoryCode, ItemSourceOfSupplyUUID, and EarliestPlanningStartDateTime.

ItemSourceOfSupplyProductUUID is the ProductUUID is a universally unique identification of the material/service, is optional and may be based on GDT: UUID. ItemSourceOfSupplyProductTypeCode is the type of the product to be procured. The following codes can be used: Material (tangible product), ServiceProduct (intangible product that describes the rendering services). ItemSourceOfSupplyProductUUID is optional and may be based on GDT: ProductTypeCode. ItemSourceOfSupplyProductCategoryUUID is a universally unique identification of the product category, is optional and may be based on GDT: UUID. ItemSourceOf- SupplyCatalogueReference is a universally unique identification of the catalog item, is optional and may be based on GDT: CatalogueReference. ItemSourceOfSupplyProductSellerID is a universally unique identification of a manufacturer part number, is optional and may be based on GDT: ProductPartyID. ItemSourceOfSupplySenderBusinessPartnerUUID is a universally unique identification of the business partner, is optional and may be based on GDT: UUID.

ItemSourceOfSupplyRecipientBusinessPartnerUUID is a universally unique identification of the business partner, is optional and may be based on GDT: UUID. ItemSourceOfSupplyRecipientOrganisationalCentreUUID is a universally unique identification of a Company, is optional and may be based on GDT: UUID. ItemSourceOfSupplyRecipientOrganisationalCentreBusinessCharacterCode is a business role of the RecipientOrganisationalCentre, is optional and may be based on GDT: ORGANISATIONALCENTRE_PartyBusinessCharacterCode. ItemSourceOfSupplyLogisticalRelationshipRecipientTransportationZoneUUID is the RecipientTransportationZoneUUID is a universally unique identification of a transportation zone, is optional and may be based on GDT: UUID. ItemSourceOfSupplyLogisticalRelationshipRecipientLocationUUID is a universally unique identification of a location, is optional and may be based on GDT: UUID. ItemSourceOfSupplyLogisticalRelationshipRecipientSupplyPlanningAreaUUID is a universally unique identification of a planning area, is optional and may be based on GDT: UUID. RequirementDateTime is a time stamp that defines when something is required, and may be based on GDT: _LOCALNORMALISED_DateTime and Qualifier: Requirement. RequirementLotsizeQuantity is the lotsize that is to be required, and may be based on GDT: Quantity and Qualifier: Lotsize. RequirementLotsizeQuantityTypeCode is the type code of the RequirementLotsizeQuantity, and may be based on GDT: QuantityTypeCode and Qualifier: Lotsize. MaximumLatenessDuration is the maximum delay, and may be based on GDT: Time_Duration and Qualifier: Lateness. ItemSourceOfSupplyProcurementCategoryCode represents the procurement category, is optional and may be based on GDT: ProcurementCategoryCode. ItemSourceOfSupplyUUID is a universally unique identification of a source of supply, is optional and may be based on GDT: UUID. EarliestPlanningStartDateTime is a point in time that defines the earliest start when planning can take place, is optional and may be based on GDT: _GLOBAL_DateTime and Qualifier: Start. The action parameters serve as selection parameters for the desired sources of supply. These selection parameters are used to determine sources of supply/logistic relationships and supplementary information during the source of supply determination. The action is carried out by the consuming application.

Item

Item is an item in a prioritized list of sources of supply that consists of a source of supply with information on means of transport and on quota arrangements. An item in the list of sources of supply can be both a SourceOfSupply and a LogisticRelationship. The source of supply determination itself can be carried out by the RC SourcingEngine. The node Item can contain the following elements, which are defined by the data type SourcingListItemElements: SourceOfSupplyUUID, SourcingBaseObjectNodeReference, SourceOfSupplySenderBusinessPartnerUUID, SourceOfSupplySenderOrganisationalCentreUUID, SourceOfSupplySenderOrganisationalCentreBusinessCharacterCode, SourceOfSupplyRecipientBusinessPartnerUUID, SourceOfSupplyRecipientOrganisationalCentreUUID, SourceOfSupplyRecipientOrganisationalCentreBusinessCharacterCode, SourceOfSupplyProductUUID, SourceOfSupplyProductTypeCode, SourceOfSupplyProductHierarchyProductCategoryUUID, SourceOfSupplyCatalogueReference, SourceOfSupplyProductSellerID, SourceOfSupplyProductsSpecificationDetailLevelCode, SourceOfSupplyTargetQuantity, SourceOfSupplyTargetQuantityTypeCode, SourceOfSupplyPlannedDeliveryDuration, SourceOfSupplyLogisticRelationshipUUID, SourceOfSupplyLogisticRelationshipSenderLocationUUID, SourceOfSupplyLogisticRelationshipRecipientLocationUUID, SourceOfSupplyLogisticRelationshipSenderTransportationZoneUUID, SourceOfSupplyLogisticRelationshipRecipientTransportationZoneUUID, SourceOfSupplyLogisticRelationshipSenderSupplyPlanningAreaUUID, SourceOfSupplyLogisticRelationshipRecipientSupplyPlanningAreaUUID, SourceOfSupplyLogisticRelationshipGoodsIssueDuration, SourceOfSupplyLogisticRelationshipGoodsReceiptDuration, SourceOfSupplyLogisticRelationshipPlannedProductionFixedDuration, SourceOfSupplyLogisticRelationship-PlannedProductionVariableDuration, TotalPlannedProductionDuration, TransportationLaneValidTransportMeansUUID, TransportationLaneValidTransportMeansTypeCode, TransportationLaneValidTransportMeansTransportMeansSpecification DetailLevelCode, TransportationLaneValidTransportMeansTransportDistanceDurationDeterminationMethodCode, TransportationLaneValidTransportMeansShippingDuration, TransportationLaneValidTransportMeansShippingDurationFixedIndicator, TransportationLaneValidTransportMeansShippingDistanceMeasure, TransportationLaneValidTransportMeansShippingDistanceMeasureFixedIndicator, TransportationLaneValidTransportMeansPriorityValue, SupplyQuotaArrangementUUID, SupplyQuotaArrangementItemUUID, SupplyQuotaArrangementSupplyQuotaDirectionCode, SupplyQuotaArrangementItemSourceOfSupplySpecificationDetailLevelCode, SupplyQuotaArrangementItemQuotaValue, SupplyQuotaArrangementItemCorrectionQuantity, SupplyQuotaArrangementItemCorrectionQuantityTypeCode, SourceOfSupplyAllocatedQuantity, SourceOfSupplyAllocatedQuantityTypeCode, SupplyQuotaArrangementItemAllocatedQuantity, SupplyQuotaArrangementItemAllocatedQuantityTypeCode, SourceOfSupplyTargetQuantityExceededFulfillmentPercent, LatenessDuration, SupplyQuotaFulfillmentPercent, SourcingValidityPeriod, SortOrdinalNumberValue, Sourcing, SourcingPriorityValue, MinimumLotsizeQuantity, MinimumLotsizeQuantityTypeCode, MaximumLotSizeQuantity, MaximumLotSizeQuantityTypeCode, ExplosionDateTime, SourcingBaseObjectNodeReference, and TransportationLaneValidTransportMeansUUID.

SourceOfSupplyUUID is a universal identifier of the source of supply, and may be based on GDT: UUID. SourcingBaseObjectNodeReference is a type of object from which the source of supply or the logistic relationship was replicated from, and may be based on GDT: ObjectNodeReference and Qualifier Base. SourceOfSupplySenderBusinessPartnerUUID is a business partner that supplies the product that is to be procured, is optional and may be based on GDT: UUID. SourceOfSupplySenderOrganisationalCentreUUID is a company (or permanent establishment), that supplies the product, that is to be procured, is optional and may be based on GDT: UUID. SourceOfSupplySenderOrganisationalCentreBusinessCharacterCode is a business role of the SenderOrganisationalCentre, is optional and may be based on GDT: ORGANISATIONALCENTRE_PartyBusinessCharacterCode. SourceOfSupplyRecipientBusinessPartnerUUID is a business partner that receives the product that is to be procured, is optional and may be based on GDT: UUID. SourceOfSupplyRecipientOrganisationalCentreUUID is a company (or permanent establishment) that receives the product that is to be procured, is optional and may be based on GDT: UUID. SourceOfSupplyRecipientOrganisationalCentreBusinessCharacterCode is a business role of the RecipientOrganisationalCentre, is optional and may be based on GDT: ORGANISATIONALCENTRE_PartyBusinessCharacterCode. SourceOfSupplyProductUUID is a universal identifier of the product to be procured, is optional and may be based on GDT: UUID. SourceOfSupplyProductTypeCode is the type of the product to be procured, is optional and may be based on GDT: ProductTypeCode. The possible types include Material and ServiceProduct. SourceOfSupplyProductHierarchyProductCategoryUUID is a universal identifier of the product category to be procured, is optional and may be based on GDT: UUID. SourceOfSupplyCatalogueReference is a unique reference to a catalog or an object in a catalog, is optional and may be based on GDT: CatalogueReference. SourceOfSupplyProductSellerID is an identifier that a party assigns to a product, is optional and may be based on GDT: ProductPartyID. SourceOfSupplyProductsSpecificationDetailLevelCode is the type of the specification level of the product to be procured, is optional and may be based on GDT: ProductsSpecificationLevelTypeCode. SourceOfSupplyTargetQuantity is the target quantity for a material to be delivered, for example, in a contract item, is optional and may be based on GDT: Quantity and Qualifier: Target. SourceOfSupplyTargetQuantityTypeCode is the type code of SourceOfSupplyTargetQuantity, is optional and may be based on GDT: QuantityTypeCode and Qualifier: Target. SourceOfSupplyPlannedDeliveryDuration is a planned delivery time, including transportation time, is optional and may be based on GDT: TIME_Duration and Qualifier: Delivery. In some implementations, restriction to the GDTs Duration may exist such that the PlannedDeliveryDuration is an exact time in minutes. SourceOfSupplyLogisticRelationshipUUID is a universal identifier of the logistical relationship, is optional and may be based on GDT: UUID. SourceOfSupplyLogisticRelationshipSenderLocationUUID is a universal identifier of the geographical starting point of the logistical relationship, is optional and may be based on GDT: UUID. SourceOfSupplyLogisticRelationshipRecipientLocationUUID is a universal identifier of a geographical end point of the logistical relationship or the location that produces the material, is optional and may be based on GDT: UUID. SourceOfSupplyLogisticRelationshipSenderTransportationZoneUUID is a universal identifier of the transportation zone where the procurement relationship starts, is optional and may be based on GDT: UUID. SourceOfSupplyLogisticRelationshipRecipientTransportationZoneUUID is a universal identifier of the transportation zone where the procurement relationship ends, is optional and may be based on GDT: UUID. SourceOfSupplyLogisticRelationshipSenderSupplyPlanningAreaUUID is a universal identifier of the requirements planning area where the procurement relationship starts, is optional and may be based on GDT: UUID. SourceOfSupplyLogisticRelationshipRecipientSupplyPlanningAreaUUID is a universal identifier of the requirements planning area where procurement relationship ends or the requirements planning area where the material is produced, is optional and may be based on GDT: UUID. SourceOfSupplyLogisticRelationshipGoodsIssueDuration is the duration of the goods issue process, is optional and may be based on GDT: TIME_Duration and Qualifier: Issue. A restriction may exist such that the GoodsIssueDuration is an exact time in minutes. SourceOfSupplyLogisticRelationshipGoodsReceiptDuration is a duration of the goods receipt process, is optional and may be based on GDT: TIME_Duration and Qualifier: Receipt. A restriction of the GDT Duration can exist such that the GoodsReceiptDuration is an exact time in minutes. SourceOfSupplyLogisticRelationshipPlannedProductionFixedDuration is a planned, fixed duration of production, is optional and may be based on GDT: TIME_Duration and Qualifier: Fixed. A restriction of the GDT Duration can exist such that the PlannedProductionFixedDuration is an exact time in seconds. SourceOfSupplyLogisticRelationshipPlannedProductionVariableDuration is a planned, variable duration of production. The duration depends on the lot size that is to be produced. SourceOfSupplyLogisticRelationshipPlannedProductionVariableDuration is optional and may be based on GDT: TIME_Duration and Qualifier: Variable. A restriction of the GDT Duration can exist such that the PlannedProductionVariableDuration is an exact time in seconds. TotalPlannedProductionDuration is a planned total duration of production, is optional and may be based on GDT: TIME_Duration Qualifier: Production. TransportationLaneValidTransportMeansUUID is a universal identifier of the ValidTransportMeans, is optional and may be based on GDT: UUID. TransportationLaneValidTransportMeansTypeCode determines the detailed type of a means of transport Part of Business Configuration, is optional and may be based on GDT: TransportMeansTypeCode. TransportationLaneValidTransportMeansTransportMeansSpecificationDetailLevelCode is a type of specification level of means of transport, is optional and may be based on GDT: TransportMeansSpecificationDetailLevelCode. TransportationLaneValidTransportMeansTransportDistanceDurationDeterminationMethodCode is a method used to determine the transport distance and the duration of the transport and may be based on GDT: TransportDistanceDurationDeterminationMethodCode. TransportationLaneValidTransportMeansShippingDuration is a duration of the transport, is optional and may be based on GDT: TIME_Duration and Qualifier: Shipping. A restriction of the GDT Duration can exist such that the ShippingDuration is an exact time in minutes. TransportationLaneValidTransportMeansShippingDurationFixedIndicator specifies whether the duration of the transport is fixed, is optional and may be based on GDT: Indicator and Qualifier: Fixed. TransportationLaneValidTransportMeansShippingDistanceMeasure is a distance of the transport, is optional and may be based on GDT: Measure and Qualifier: Distance. TransportationLaneValidTransportMeansShippingDistanceMeasureFixedIndicator specifies whether the distance of the transport is fixed, is optional and may be based on GDT: Indicator and Qualifier: Fixed. TransportationLaneValidTransportMeansPriorityValue is a priority that defines how a transportation lane is considered in procurement, is optional and may be based on GDT: PriorityValue. SupplyQuotaArrangementUUID is a universal identifier of the supply quota arrangement, is optional and may be based on GDT: UUID. SupplyQuotaArrangementItemUUID is a universal identifier of the item of supply quota arrangement, is optional and may be based on GDT: UUID. SupplyQuotaArrangementSupplyQuotaDirectionCode specifies whether this is an incoming or outgoing supply quota arrangement, is optional and may be based on GDT: SupplyQuotaDirectionCode. SupplyQuotaArrangementItemSourceOfSupplySpecificationDetailLevelCode is a level of detail for specifying sources of supply, and may be based on GDT: SourceOfSupplySpecificationDetailLevelCode. SupplyQuotaArrangementItemQuotaValue is the quota value assigned to the Item. The reference value of the QuotaValue is the sum of the QuotaValue of all quota value items. SupplyQuotaArrangementItemQuotaValue may be based on GDT: QuotaValue. SupplyQuotaArrangementItemCorrectionQuantity is a quantity that corrects the proportion of FulfilledQuantity in relation to other instances of FulfilledQuantity, describes a quantity with base unit, is optional and may be based on GDT: Quantity and Qualifier: Correction. SupplyQuotaArrangementItemCorrectionQuantityTypeCode is a type code of SupplyQuotaArrangementItemCorrectionQuantity, describes a quantity with base unit, is optional and may be based on GDT: QuantityTypeCode and Qualifier: Correction. SourceOfSupplyAllocatedQuantity is an allocated quantity of the source of supply, is optional and may be based on GDT: Quantity and Qualifier: Allocated. SourceOfSupplyAllocatedQuantityTypeCode is a type code of the allocated quantity of the source of supply, is optional and may be based on GDT: QuantityTypeCode and Qualifier: Allocated. SupplyQuotaArrangementItemAllocatedQuantity is an allocated quantity of the item of the supply quota arrangement, is optional and may be based on GDT: Quantity and Qualifier: Allocated. SupplyQuotaArrangementItemAllocatedQuantityTypeCode is a type code of the allocated quantity of the item of the supply quota arrangement, is optional and may be based on GDT: QuantityTypeCode and Qualifier: Allocated. SourceOfSupplyTargetQuantityExceededFulfillmentPercent is a degree of exceeded fulfillment of the target quantity of a contract, is optional and may be based on GDT: Percent and Qualifier: Exceeded, Fulfillment. LatenessDuration is a calculated delay, is optional and may be based on GDT: TIME_Duration and Qualifier: Lateness. SupplyQuotaFulfillmentPercent is a degree of fulfilment of supply quota arrangement, is optional and may be based on GDT: Percent and Qualifier: Fulfillment. SourcingValidityPeriod defines the validity of a source of supply, a logistical relationship, a means of transport or a supply quota arrangement, is optional and may be based on GDT: _GLOBAL_DateTimePeriod and Qualifier: Validity. SortOrdinalNumberValue is a position in a sorted sequence, is optional and may be based on GDT: OrdinalNumberValue. SourcingProcurementCategoryCode is a category of procurement used for sourcing and may be based on GDT: ProcurementCategoryCode. SourcingPriorityValue is a priority that defines how a source of supply, a logistical relationship or a means of transport is considered in procurement, and may be based on GDT: Priority Value. MinimumLotsizeQuantity is the smallest permitted lotsize and may be based on GDT: Quantity and Qualifier: Lotsize. MinimumLotsizeQuantityTypeCode is a type code of MinimumLotsizeQuantity and may be based on GDT: QuantityTypeCode and Qualifier: Lotsize. MaximumLotSizeQuantity is the greatest permitted lotsize and may be based on GDT: Quantity and Qualifier: Lotsize. MaximumLotSizeQuantityTypeCode is the greatest permitted lotsize and may be based on GDT: QuantityTypeCode and Qualifier: Lotsize. ExplosionDateTime is a time point at which the explosion of, for example, a bill of materials take place, and may be based on GDT: GLOBAL_DateTime, and Qualifier: Explosion. Key can be an alternative key. The Key can consist of SourcingBaseObjectNodeReference and an optional TransportationLaneValidTransportMeansUUID.

A number of inbound aggregation relationships can exist, such as 1) From BO SourceOfSupply, a SourceOfSupply relationship, with a cardinality of 1:cn, which references the relevant SourceOfSupply; 2) From BO SourceOfSupply/LogisticRelationship, a SourceOfSupplyLogisticRelationship relationship with a cardinality of 1:cn, which references the relevant LogisticRelationship; and 3) From BO TransportationLane/ValidMeansOfTransport, a TransportationLaneValidMeansOfTransport relationship with a cardinality of c:cn, the transportation lane from which the source of supply was created.

A number of inbound associations can exist, such as 1) From the business object Supplier, a Supplier relationship with a cardinality of c:cn, the supplier of the material to be obtained; 2) From the business object Customer, a Customer relationship with a cardinality of c:cn, the customer of the material to be obtained; 3) From the business object Company, a SenderCompany relationship with a cardinality of c:cn, a financially and legally independent, geographically unbound organizational center registered under business law and the sender of the material to be obtained; 4) From the business object Company, a RecipientCompany relationship with a cardinality of c:cn, a financially and legally independent, geographically unbound organizational center registered under business law and the recipient of the material to be obtained; 5) From the business object PermanentEstablishment, a SenderPermanentEstablishment relationship with a cardinality of c:cn, an organizational unit that represents a logistical unit within a site where logistical processes are executed (for example, stock movements, production, inventory management). It can be, for example, a warehouse (where stock is managed), a manufacturing plant, or department in a store and the sender of the material to be obtained.

Other inbound associations can exist, such as from the business object PermanentEstablishment, a RecipientPermanentEstablishment relationship with a cardinality of c:cn, an organizational unit that represents a logistical unit within a site where logistical processes are executed (for example, stock movements, production, inventory management. It can be, for example, a warehouse (where stock is managed), a manufacturing plant, or department in a store, and a recipient of the material to be obtained.

Other inbound associations can exist, such as 1) From the business object Material, a Material relationship with a cardinality of c:cn, the material for the material-specific source of supply; 2) From the business object ServiceProduct, a ServiceProduct relationship with a cardinality of c:cn, the service for a service specific source of supply; 3) From the business object ProductCategoryHierarchy/ProductCategory, a ProductCategory relationship with a cardinality of c:cn, the product category for the product-category-specific source of supply; 4) From the business object PurchasingContract/Item, a PurchasingContractItem relationship with a cardinality of c:cn, the purchasing contract item for which the source of supply was created (Cross-DU); 5) From the business object SupplyQuotaArrangement, a SupplyQuotaArrangement relationship with a cardinality of c:cn, references the relevant quota arrangement; 6) From the business object SupplyQuotaArrangement, a SupplyQuotaArrangementItem relationship with a cardinality of c:cn, references the relevant quota arrangement item; 7) From the business object TransportationLane/ValidMaterials, a TransportationLaneValidMaterials relationship with a cardinality of c:cn, the material-specific transportation lane from which the source of supply was created; 8) From the business object ProductionModel, a ProductionModel relationship with a cardinality of c:cn, the ProductionModel for which the source of supply was created; 9) From the business object Location, a SenderLocation relationship with a cardinality of c:cn, which identifies the starting location of the geographical points that are linked logistically; 10) From the business object Location, a RecipientLocation relationship with a cardinality of c:cn, which identifies the target location of the geographical point that is linked logistically; 11) From the business object TransportationZone, a SenderTransportationZone relationship with a cardinality of c:cn, a transportation zone where the procurement relationship starts; 12) From the business object TransportationZone, a RecipientTransportationZone relationship with a cardinality of c:cn, a transportation zone where the procurement relationship ends; 13) From the business object SupplyPlanningArea, a SenderSupplyPlanningArea relationship with a cardinality of c:cn, which identifies the initial planning area; 14) From the business object SupplyPlanningArea, a RecipientSupplyPlanningArea relationship with a cardinality of c:cn, which identifies the target planning area; and 15) From the business object ReleasedPlanningProductionModel, a ReleasedPlanningProductionModel relationship with a cardinality of c:cn, the released planning production model to which the source of supply refers.

An Enterprise Service Infrastructure AssignItem action associates the selected entry of the source of supply in the list of sources of supply with the requesting business object. In some implementations, there must be at least one instance of the node Item. The AssignItem action transfers the selected source of supply entry to the associated business object and associates the selected source of supply object with the requesting business-object. In some implementations, the action may be executed by the UI.

Business Object StorageBehaviourMethod

FIG. 168 illustrates an example StorageBehaviourMethod business object model 168002. Specifically, this model depicts interactions among various hierarchical components of the StorageBehaviourMethod, as well as external components that interact with the StorageBehaviourMethod (shown here as 168000 and 168004 and 168006 through 168014).

StorageBehaviorMethod is a set of rules that defines the manner in which a storage location is managed. The StorageBehaviourMethod resides in the Logistics Area and Storage Management Process Component, which is located in the Foundation Layer. A storage location can be either a logistics area or a resource. StorageControl is a dependent object of a logistics area, a resource or a storage behaviour method. StorageControl that is hosted by a Logistics Area or a Resource may hold a reference to a StorageBehaviourMethod. StorageBehaviourMethod contains a name, allowed logistics area types and a storage control. The StorageControl DO contains inventory items' constraints and rules.

For example, Bin 021 is referenced to a storage control 999 which defines material 4711 as a designated material of Bin 021. Storage control 999 is referenced to a Bulk storage behaviour method, which is a set of bulk storage rules according to which a logistics area or a resource behaves.

StorageBehaviourMethod contains the following: Information on the storage locations of a specified logistics area type which are allowed to use the StorageBehaviourMethod (AllowedLogisticsAreaType) 168008. Information on inventory items' constraints and inventory items' rules (StorageControl) 168010

Business Object StorageBehaviourMethod us a set of rules that defines the manner in which a storage location is managed. StorageBehaviourMethod includes a storage behaviour method name and system administrative data of a storage location.

The elements located at the node StorageBehaviourMethod are defined by the data type: StorageBehaviourMethodElements. These elements can include UUID, ID, Name, SystemAdministrativeData, Status. The UUID is a GDT of type UUID. The UUID is the universally unique identifier of a storage behaviour method for referencing purposes. The ID is a GDT of type StorageBehaviorMethodID. The ID is the unique identifier within a storage behaviour method. The Name is a GDT of type MEDIUM_NAME. In some implementations it has a StorageBehaviourMethod qualifier. The Name is the name of the storage behaviour method and is optional. The SystemAdministrativeData is a GDT of type SystemAdministrativeData. The SystemAdministrativeData is the administrative data that is stored in a system. This data includes system users and change dates/times. The Status is a GDT of type StorageBehaviourMethodLifeCycleStatusCode, additionally it can be a IDT StorageBehaviourMethodStatus and can also be a LifeCycleStatusCode. The Status is the coded representation of the current step in the life cycle of a StorageBehaviourMethod.

An CreationIdentity may have a cardinality of 1:cn. The CreationIdentity denotes the user that created the StorageBehaviourMethod. An LastChangeIdentity may have a cardinality of 1:cn. The LastChangeIdentity denotes the user that last changed the StorageBehaviourMethod Enterprise Service Infrastructure Actions The action Block (S&AM action) blocks the StorageBehaviourMethod. In some implementation, preconditions may include that the StorageBehaviourMethod can be in Active status and is not being used. Changes to the object may include that the StorageBehaviourMethod cannot be referenced. Changes to the status may include that the status is changed to Blocked. In some implementation, the action is accessed from UI.

The action Activate (S&AM action) activates the StorageBehaviourMethod. In some implementation, preconditions may include that the StorageBehaviourMethod can be in InPreparation status. Changes to the object may include that the StorageBehaviourMethod can be referenced. Changes to the status may include that The status is changed to Active. In some implementation, the action is accessed from UI.

The action Unblock (S&AM action) unblocks the StorageBehaviourMethod. In some implementation, preconditions may include that the StorageBehaviourMethod can be in Block status. Changes to the object may include that the StorageBehaviourMethod can be referenced. Changes to the status may include that the status is changed to Active. In some implementation, the action is accessed from UI.

The action UndoObsoleteness (S&AM action) undoes the obsoleteness from the StorageBehaviourMethod. In some implementation, preconditions may include that the StorageBehaviourMethod can be in Obsolete status. Changes to the status may be that the status is changed to Blocked. In some implementation, the action is accessed from UI.

The action FlagAsObsolete (S&AM action) flags the StorageBehaviourMethod as obsolete. In some implementation, preconditions may include that the StorageBehaviourMethod can be in Blocked or Active status. Changes to the status may include that the status is changed to Flag As Obsolete. In some implementation, the action is accessed from UI.

A QueryByElements query provides a list of all the Storage Behaviour Methods which satisfy the selection criteria specified by the query elements. The query elements are defined by the data type StorageBehaviourMethodElementsQueryElements. These elements can include ID, Name, SystemAdministrativeDataCreationDateTime, CreationBusinessPartner_CommonPersonNameGivenName, CreationBusinessPartner_CommonPersonNameFamilyName, SystemAdministrativeDataLastChangeDateTime, LastChangeBusinessPartner_CommonPersonNameGivenName, LastChangeBusinessPartner_CommonPersonNameFamilyName, LifeCycleStatusCode, AllowedLogisticsAreaTypeCode, SiteID, LogisticsAreaUUID, LogisticsAreaID, ResourceUUID, ResourceID. The ID is a GDT of type StorageBehaviourMethodID and is optional. The Name is a GDT of type MEDIUM_Name, and is optional. In some implementations it has a StorageBehaviourMethod qualifier. The SystemAdministrativeDataCreationDateTime is a GDT of type Global_DateTime and is optional. The CreationBusinessPartner_CommonPersonNameGivenName is a GDT of type LANGUAGEINDEPENDENT_MEDIUM_Name and is optional. The CreationBusinessPartner_CommonPersonNameFamilyName is a GDT of type LANGUAGEINDEPENDENT_MEDIUM_Name and is optional. The SystemAdministrativeDataLastChangeDateTime is a GDT of Global_DateTime and is optional. The LastChangeBusinessPartner_CommonPersonNameGivenName is a GDT of type LANGUAGEINDEPENDENT_MEDIUM_Name and is optional. The LastChangeBusinessPartner_CommonPersonNameFamilyName is a GDT of type LANGUAGEINDEPENDENT_MEDIUM_Name and is optional. The LifeCycleStatusCode is a GDT of type StorageBehaviourMethodLifeCycleStatusCode and is optional. The AllowedLogisticsAreaTypeCode is a GDT of type LogisticsAreaTypeCode and is optional. The SiteID is a GDT of type LocationID and is optional. The LogisticsAreaUUID is a GDT of type UUID and is optional. The LogisticsAreaID is a GDT of type LogisticsAreaID and is optional. The ResourceUUID is a GDT of type UUID and is optional. The ResourceID is a GDT of type ResourceID and is optional.

AllowedLogisticsAreaType 168008 specifies for a StorageBehaviourMethod the storage locations of a specified logistics area type which are allowed to use the StorageBehaviourMethod. The elements located at the node AllowedLogisticsAreaType are defined by the data type: StorageBehaviourMethodAllowedLogisticsAreaTypeElements. These elements can include UUID, Code. The UUID is a GDT of type UUID. The UUID is the universally unique identifier of an allowed logistics area type for referencing purposes. The Code is a GDT of type LogisticsAreaTypeCode. The Code is the type of logistics area that is allowed to use the StorageBehaviourMethod.

StorageControl specifies for a StorageBehaviourMethod a list of inventory items' constraints and inventory items' rules.

AccessControlList 168014 specifies for a StorageBehaviourMethod a list of access groups that have access to a StorageBehaviourMethod during a validity period.

Description 168012 specifies for a StorageBehaviourMethod a language-dependent descriptive statement of a storage behaviour method. The elements located at the node Description are defined by the data type: StorageBehaviourMethodDescriptionElements. These elements can include StorageBehaviourMethodDescription. The StorageBehaviourMethodDescription is a GDT of type LONG_Description. Some implementations it has is StorageBehaviourMethod qualifier. The StorageBehaviourMethodDescription is the language dependent description of the storage behaviour method. In some implementations there can be only one description per language.

Dependent Object StorageControl

FIG. 169 illustrates an example StorageControl business object model 169014. Specifically, this model depicts interactions among various hierarchical components of the StorageControl, as well as external components that interact with the StorageControl (shown here as 169000 through 169012 and 169016 through 169032).

Dependent Object StorageControl is a specification of inventory items' constraints and inventory items' rules applied in a storage location (such as, logistics area or resource), as well as requirements for actions (such as replenishment or cleanup).

Storage Control is a dependent object of a logistics area, a resource or a StorageBehaviorMethod. Storage Control that is hosted by a logistics area or a resource may hold a reference to a StorageBehaviorMethod. In some implementations, the DO StorageControl 169034 does not reside in a Process Component. Additionally, it may be a Dependent Object in the Foundation Layer.

StorageControl may contain the following: LocationLogisticsUsage 169036, LastCountDate 169038, InventoryLevelControlRequirement 169040, InventoryLevelControlRule 169050, InventoryAllocationRule 169056, UniformityCriteria 169058, InventoryItemConstraint 169060, PhysicalCapacity 169062, DesignatedMaterial 169064. LocationLogisticsUsage is information on the location logistics usages of the storage location. LastCountDate is information on the last physical inventory count in the storage location. InventoryLevelControlRequirement is information on the storage required actions. InventoryLevelControlRule is information on the storage set of replenishment and cleanup behavior rules that defines the manner in which a storage location replenishes and cleans a material. InventoryAllocationRule is information on the inventory allocation rule that applies for the storage location and a material. UniformityCriteria is information on the required level of inventory uniformity, in terms of material and logistic unit. InventoryItemConstraint is information on the material categories and logistic units that can be maintained in the storage location. PhysicalCapacity is information on the physical constraints of the storage location. DesignatedMaterial is information on material constraints.

Node Structure of Dependent Object StorageControl

The elements located at the node StorageControl are defined by the type GDT: StorageControlElements. These elements include UUID, StorageBehaviorMethodCopyIndicator, StorageBehaviorMethodUUID, StorageBehaviorMethodID, HostObjectNodeReference, SystemAdministrativeData, InventoryManagedIndicator, NegativeInventoryAllowedIndicator, ReplenishmentRelevanceIndicator, CleanupRelevanceIndicator, InventoryItemConstraintRelevanceIndicator, AllocationRelevanceIndicator, StorageLocationLogisticUnitManagementCode, Status, BlockingStatusCode, PickingBlockingStatusCode, PutawayBlockingStatusCode. The UUID is a GDT of type UUID. The UUID is a universal unique identifier of the storage control for referencing purposes. The StorageBehaviorMethodCopyIndicator is a GDT of type Indicator. In some implementations, it may have a Copy qualifier. The StorageBehaviorMethodCopyIndicator indicates whether storage control is a copy of a storage behavior method or not. In some implementations, this indicator is relevant only if StorageBehaviorMethodUUID and StorageBehaviorMethodID fields are filled. In some implementations wherein this indicator is false, the storage control may be referencing a storage behavior method. The StorageBehaviorMethodUUID is a GDT of type UUID. The StorageBehaviorMethodUUID is a universal unique identifier of the storage behavior method, which is assigned in order to reference the relevant storage behavior method to the storage control and is optional. The StorageBehaviorMethodID is a GDT of type StorageBehaviorMethodID. The StorageBehaviorMethodID is a unique identifier of the storage behavior method, which is assigned in order to reference the relevant storage behavior method to the storage control and is optional. The HostObjectNodeReference is a GDT of type ObjectNodeReference. In some implementations it has a Host qualifier. The HostObjectNodeReference is the hosting object of the StorageControl. The SystemAdministrativeData is a GDT of type SystemAdministrativeData. The SystemAdministrativeData is a Administrative data that is stored in a system. This data includes system users and change dates/times. The InventoryManagedIndicator is a GDT of type Indicator. In some implementations it has a InventoryManaged qualifier. The InventoryManagedIndicator indicates whether inventory is managed in the storage location or not. The NegativeInventoryAllowedIndicator is a GDT of type Indicator. In some implementations it has a Allowed qualifier. NegativeInventoryAllowedIndicator indicates whether inventory is allowed to record a negative inventory quantity in a storage location. The ReplenishmentRelevanceIndicator is a GDT of type Indicator. In some implementations it has a Relevance qualifier. The ReplenishmentRelevanceIndicator indicates whether a replenishment rule is relevant for a storage location. The CleanupRelevanceIndicator is a GDT of type Indicator. In some implementations it has a Relevance qualifier. The CleanupRelevanceIndicator indicates whether a cleanup rule is relevant for a storage location. The InventoryItemConstraintRelevanceIndicator is a GDT of type Indicator. In some implementations it has a Relevance qualifier. The InventoryItemConstraintRelevanceIndicator indicates whether an inventory item constraint is relevant for a storage location. The AllocationRelevanceIndicator is a GDT of type Indicator. In some implementations it has a Relevance qualifier. The AllocationRelevanceIndicator indicates whether an allocation rule is relevant for a storage location. The StorageLocationLogisticUnitManagementCode is a GDT of type StorageLocationLogisticUnitManagementCode. The StorageLocationLogisticUnitManagementCode is a coded representation for the management of a storage location in regards to Logistic Unit. The Status is a IDT of type StorageControlStatus. The BlockingStatusCode is a GDT of type NOTBLOCKEDBLOCKEDBlockingStatusCode. The BlockingStatusCode is a coded representation of the blocking status of a storage location that is. Blocked for Not blocked. The PickingBlockingStatusCode is a GDT of type NOTBLOCKEDBLOCKEDBlockingStatusCode. The PickingBlockingStatusCode is a coded representation of the blocking status of a storage location for picking that may have a value “Blocked for picking” or “Not blocked for picking”. The PutawayBlockingStatusCode is a GDT of type NOTBLOCKEDBLOCKEDBlockingStatusCode. The PutawayBlockingStatusCode is a coded representation of the blocking status of a storage location for putaway, with values of either “Blocked for putaway” or “Not blocked for putaway.”

The LocationLogisticsUsage has a cardinality of 1:cn. The LastCountDate has a cardinality of 1:c. The InventoryLevelControlRequirement has a cardinality of 1:cn. The InventoryLevelControlRule has a cardinality of 1:cn. The InventoryAllocationRule has a cardinality of 1:cn. The UniformityCriteria has a cardinality of 1:cn. The InventoryItemConstraint has a cardinality of 1:cn. The PhysicalCapacity has a cardinality of 1:c. The DesignatedMaterial has a cardinality of 1:cn.

A StorageBehaviorMethod has the cardinality of c:cn. The StorageBehaviorMethod is a Storage Behavior Method that is assigned to a storage control. A CreationIdentity has the cardinality of 1:cn. The CreationIdentity denotes the user that created the StorageControl. A LastChangeIdentity has the cardinality of 1:cn. The LastChangeIdentity denotes the user that last changed the StorageControl.

OptimizeInventoryLevel is used to optimize the inventory level according to the inventory level control rules by determining whether replenishment or clean up are required. The resulting action depends on the result of the determination. It can be either a request for cleanup, replenishment, or no change. In some implementations, OptimizeInventoryLevel may have some preconditions, for example, rules for storage behavior method (for example, replenishment or cleanup) can be defined. Changes to the object may include that the RequiredIndicator flag in the node InventoryLevelControlRequirement is changed to false. In some implementations, changes to other objects may create a site logistic request if replenishment or cleanup are required. OptimizeInventoryLevel can be performed by the host business object (i.e. Logistic area, Resource) and the host business object can be processed by UI or MDRO.

LocationLogisticsUsage

The LocationLogisticsUsage specifies for a StorageControl the logistics usage of a storage location. The location logistics usage defines what the storage location is used for. For example, bin and aisle are both used to store inventory meaning they both have a Storage usage. The elements located at the node LocationLogisticsUsage are defined by the type GDT: StorageControlLocationLogisticsUsageElements. These elements include UUID and Code. The UUID is a GDT of type UUID. The UUID is a universal unique identifier of the location logistics usage for referencing purposes. The Code is a GDT of type LocationLogisticsUsageCode. The Code is the logistics usage of a storage location. The LastCountDate specifies for a StorageControl the last date in which the physical inventory in a storage location was counted.

The elements located at the node LastCountDate are defined by the type GDT:

StorageControl LastCountDateElements. These elements may include UUID and DateTime. The UUID is a GDT of type UUID. The UUID is a universal unique identifier of the last count date for referencing purposes. The DateTime is a GDT of type Global_DateTime. The DateTime is the last date and time in which the physical inventory in the storage location was counted.

InventoryLevelControlRequirement

The InventoryLevelControlRequirement specifies for a StorageControl a requirement for examining inventory quantities and controlling inventory shortages and surpluses. In some implementations, all the information in this node is transient. InventoryLevelControlRequirement occurs in the following complete and non disjoint specializations: ReplenishmentRequirement 169046 and CleanupRequirement 169048. ReplenishmentRequirement is a requirement for initiation of a replenishment check in order to avoid inventory shortage by verifying that the inventory quantity is above a predefined inventory level. CleanupRequirement is a requirement for initiation of a cleanup check in order to avoid inventory surplus by verifying that the inventory quantity is below a predefined inventory level.

The elements located at the node InventoryLevelControlRequirement are defined by the type GDT: StorageControlInventoryLevelControlRequirementElements. These elements may include UUID, SystemAdministrativeData, TypeCode, MaterialUUID, MaterialID, SupplyPlanningAreaUUID, SupplyPlanningAreaID, IdentifiedStockUUID, IdentifiedStockKey, IdentifiedStockID, MaterialID, LogisticUnitUUID, LogisticUnitID, RequestedQuantity, RequestedQuantityTypeCode, LogisticUnitRequestedQuantity, LogisticUnitRequestedQuantityTypeCode. The UUID is a GDT of type UUID. The UUID is a universal unique identifier of the inventory level control requirement for referencing purposes. The SystemAdministrativeData is a GDT of type SystemAdministrativeData. The SystemAdministrativeData is an administrative data that is stored in a system. This data includes system users and change dates/times. The TypeCode is a GDT of type InventoryLevelControlRequirementTypeCode. The TypeCode is a coded representation of a requirement for examining inventory quantities and controlling inventory shortages and surpluses (e.g. requirement for replenishment, requirement for cleanup). The MaterialUUID is a GDT of type UUID. The MaterialUUID is a unique, global identifier for a material for which a replenishment or cleanup check is required. The MaterialID is a GDT of type ProductID. The MaterialID is an identifier for a material for which a replenishment or cleanup check is required. The SupplyPlanningAreaUUID is a GDT of type UUID. The SupplyPlanningAreaUUID is a unique, global identifier for an area in planning for which the availability of products on time is guaranteed and for which a replenishment or cleanup check is required and it is optional. The SupplyPlanningAreaID is a GDT of type SupplyPlanningAreaID. The SupplyPlanningAreaID is an Identifier for an area in planning for which the availability of products on time is guaranteed and a replenishment or cleanup check is required and it is optional. The IdentifiedStockUUID is a GDT of type UUID. The IdentifiedStockUUID is a universal unique identifier of the identified stock, which is assigned in order to reference the relevant identified stock to the inventory level control requirement and it is optional. The IdentifiedStockKey is a IDT of type IdentifiedStockKey. The IdentifiedStockKey consists of the following elements and is optional. The IdentifiedStockID is a GDT of type IdentifiedStockID. The IdentifiedStockID is an identifier for an identified stock, which is assigned in order to reference the relevant identified stock to the inventory level control requirement. The MaterialID is a GDT of type ProductID. The MaterialID is an identifier of a material to which an identified stock belongs. The LogisticUnitUUID is a GDT of type UUID. The LogisticUnitUUID is an universal unique identifier of the logistic unit, which is assigned in order to reference the relevant logistic unit to the inventory level control requirement and it is optional. The LogisticUnitID is a GDT of type LogisticUnitID. The LogisticUnitID is an identifier of the logistic unit, which is assigned in order to reference the relevant logistic unit to the inventory level control requirement and is optional. The RequestedQuantity is a GDT of type Quantity. In some implementations it has a Requested qualifier. The RequestedQuantity is a numerical specification of a requested quantity with the corresponding quantity unit, to be replenished or cleaned up and it is optional. The RequestedQuantityTypeCode is a GDT of type QuantityTypeCode. In some implementations it has a Requested qualifier. The RequestedQuantityTypeCode is a quantity type used to define the material to be replenished or cleaned up and it is optional. The LogisticUnitRequestedQuantity is a GDT of type Quantity. In some implementations it has a Requested qualifier. The LogisticUnitRequestedQuantity is a quantity of logistic units used to define the logistic unit to be replenished or cleaned up and it is optional. The LogisticUnitRequestedQuantityTypeCode is a GDT of type QuantityTypeCode. In some implementations it has a Requestedqualifier. The LogisticUnitRequestedQuantityTypeCode is a quantity type used to define the logistics unit to be replenished or cleaned up and it is optional.

The Material has a cardinality of c:cn. The Material is a material that is required to be replenished or cleaned up. The LogisticUnit has a cardinality of c:cn. The LogisticUnit is a LogisticUnit that is required to be replenished or cleaned up. The IdentifiedStock has a cardinality of c:cn. The IdentifiedStock is an inventory of the identified stock that is required to be replenished or cleaned up. The SupplyPlanningArea has a cardinality of c:cn. The SupplyPlanningArea is an inventory of the supply planning area that is required to be replenished or cleaned up. The CreationIdentity has a cardinality of 1:cn. The CreationIdentity denotes the user that created the InventoryLevelControlRequirement. The CreationIdentity has a cardinality of 1:cn. The CreationIdentity denotes the user that last changed the InventoryLevelControlRequirement.

An InventoryLevelControlRule specifies for StorageControl and a material or a material category a rule that specifies an execution method which is triggered if a specific condition is met, for adjusting the inventory level. InventoryLevelControlRule occurs in the following complete and disjoint specializations: ReplenishmentRule 169052 and CleanupRule 169054. ReplenishmentRule is an InventoryLevelControlRule that defines how inventory should be replenished when a certain condition is met. CleanupRule is an InventoryLevelControlRule that defines how inventory cleanup should be done when a certain condition is met. An example is if current inventory quantity in bin 021 is less than 25 cases (condition), a request for replenishment of 50 cases of milk to bin 021 is to be executed (execution method).

The elements located at the node InventoryLevelControlRule are defined by the data type: StorageControlInventoryLevelControlRuleElements. These elements may include UUID, MaterialUUID, MaterialID, ProductCategoryUUID, ProductCategoryHierarchyProductCategoryIDKey, ProductCategoryHierarchyID, ProductCategoryInternalID, TypeCode, InventoryLevelControlRuleExecutionMethodQuantityDeterminationMethodCode, InventoryReplenishmentMethodCode, InventoryDemandBasedReplenishmentMethodCode, ConditionThresholdPercent, ConditionThresholdQuantity, ConditionThresholdQuantityTypeCode, ConditionThresholdLogisticUnitUUID, ConditionThresholdLogisticUnitID, ConditionLogisticUnitThresholdQuantity, ConditionLogisticUnitThresholdQuantityTypeCode, DemandBasedReplenishmentCoverageDuration, ExecutionMethodRequiredInventoryQuantity, ExecutionMethodRequiredInventoryQuantityTypeCode, ExecutionMethodRequiredInventoryLogisticUnitUUID, ExecutionMethodRequiredInventoryLogisticUnitID, ExecutionMethodLogisticUnitRequiredInventoryQuantity, ExecutionMethodLogisticUnitRequiredInventoryQuantity, ExecutionMethodLogisticUnitRequiredInventoryQuantityTypeCode. The UUID is a GDT of type UUID. The UUID is a universally unique identifier of an inventory level control rule for referencing purposes. The MaterialUUID is a GDT of type UUID. The MaterialUUID is a unique identifier of a material which serves as a selection criterion for the inventory level control rule and it is optional.

The MaterialID is a GDT of type ProductID. The MaterialID is a unique identifier of a material which serves as a selection criterion for the inventory level control rule and it is optional. The ProductCategoryUUID is a GDT of type UUID. The ProductCategoryUUID is a Universally unique identifier of a product category, which serves as a selection criteria for the inventory level control rule and it is optional. The ProductCategoryHierarchyProductCategoryIDKey is a IDT of ProductCategoryHierarchyProductCategoryIDKey. The ProductCategoryHierarchyProductCategoryIDKey is a unique identifier of a product category serving as a selection criteria for the inventory level control rule and it is optional. The ProductCategoryHierarchyID is a GDT of type ProductCategoryHierarchyID. The ProductCategoryHierarchyID is a unique identifier of the product category hierarchy which the product category belongs to. The ProductCategoryInternalID is a GDT of type ProductCategoryInternalID. The ProductCategoryInternalID is an alternative identifier for a product category. The TypeCode is a GDT of type InventoryLevelControlRuleTypeCode. The TypeCode is a coded representation of the type of inventory level control rule, which determines if and how replenishment or cleanup should be executed. (For example replenishment rule, cleanup rule). The InventoryLevelControlRuleExecutionMethodQuantityDeterminationMethodCode is a GDT of type InventoryLevelControlRuleExecutionMethodQuantityDeterminationMethodCode. The InventoryLevelControlRuleExecutionMethodQuantityDeterminationMethodCode is a coded representation of a method to determine the quantity required to be replenished or cleaned up for a particular inventory level control execution method. The InventoryReplenishmentMethodCode is a GDT of type InventoryReplenishmentMethodCode. The InventoryReplenishmentMethodCode is a method of replenishment required for controlling inventory levels (that is consumption based or demand based). It is relevant if a Replenishment type is chosen in the TypeCode field above and it is optional. The InventoryDemandBasedReplenishmentMethodCode is a GDT of type InventoryDemandBasedReplenishmentMethodCode. The InventoryDemandBasedReplenishmentMethodCode is a method of demand based replenishment required for controlling inventory levels (that is ASAP, ALAP, JIT). It is relevant if a Demand Based replenishment type is chosen in the ReplenishmentTypeCode field above and it is optional. The ConditionThresholdPercent is a GDT of type Percent. In some implementations it has a Threshold qualifier. The ConditionThresholdPercent is a percent of the maximum capacity of the storage location that when crossed, inventory leveling (such as Replenishment or Cleanup) is triggered (i.e. the threshold of bin 021 is 16% of the maximum weight allowed in bin 021) and it is optional. The ConditionThresholdQuantity is a GDT of type Quantity. In some implementations, ConditionThresholdQuantity has a Threshold qualifier. The ConditionThresholdQuantity is a quantity with unit of measure used to define the threshold of inventory level control rule condition and it is optional. The ConditionThresholdQuantityTypeCode is a GDT of type QuantityTypeCode. In some implementations it has a Threshold qualifier. The ConditionThresholdQuantityTypeCode is a quantity type used to define the threshold of inventory level control rule condition and it is optional. The ConditionThresholdLogisticUnitUUID is a GDT of type UUID. The ConditionThresholdLogisticUnitUUID is a universally unique identifier of a logistic unit which is used to define the threshold of an inventory level control rule condition and is optional. The ConditionThresholdLogisticUnitID is a GDT of type LogisticUnitID. The ConditionThresholdLogisticUnitID is a universally unique identifier of a logistic unit which is used to define the threshold of an inventory level control rule condition and is optional. The ConditionLogisticUnitThresholdQuantity is a GDT of type Quantity. In some implementations the ConditionLogisticUnitThresholdQuantity has a Threshold qualifier. The ConditionLogisticUnitThresholdQuantity is a quantity of logistic units used to define the threshold of inventory level control rule condition and is optional. The ConditionLogisticUnitThresholdQuantityTypeCode is a GDT of type QuantityTypeCode. In some implementations the ConditionLogisticUnitThresholdQuantityTypeCode has a Inventory qualifier. The ConditionLogisticUnitThresholdQuantityTypeCode is a quantity type used to define the logistic unit threshold of inventory level control rule condition and is optional. The DemandBasedReplenishmentCoverageDuration is a GDT of type Duration, and is optional. The DemandBasedReplenishmentCoverageDuration is a period of time for which replenishment is planned. This period of time can be expressed in years, months, days, hours or minutes. The default value is infinite duration. The ExecutionMethodRequiredInventoryQuantity is a GDT of type Quantity. In some implementations the ExecutionMethodRequiredInventoryQuantity has a qualifier of Inventory and maybe optional. The ExecutionMethodRequiredInventoryQuantity is an inventory quantity that is either maintained in a storage location to meet the inventory required limits or the fixed quantity that will be replenished or cleaned up. The determination of the required inventory quantity is based on the InventoryLevelControlRuleExecutionMethodQuantityDeterminationMethodCode field above. The ExecutionMethodRequiredInventoryQuantityTypeCode is a GDT of type QuantityTypeCode and maybe optional. In some implementations the ExecutionMethodRequiredInventoryQuantityTypeCode has a qualifier of Inventory. The ExecutionMethodRequiredInventoryQuantityTypeCode is a quantity type used to define either the inventory maintained in a storage location to meet the inventory required limits or the fixed quantity that will be replenished or cleaned up. The ExecutionMethodRequiredInventoryLogisticUnitUUID is a GDT of type UUID and maybe optional. The ExecutionMethodRequiredInventoryLogisticUnitUUID is a universally unique identifier of a logistic unit which is required for defining either the required inventory quantity or the fixed quantity that will be replenished or cleaned up. The ExecutionMethodRequiredInventoryLogisticUnitID is a GDT of type LogisticUnitID and may be optional. The ExecutionMethodRequiredInventoryLogisticUnitID is a unique identifier of the logistic unit which is required for defining either the required inventory quantity or the fixed quantity that will be replenished or cleaned up. The ExecutionMethodLogisticUnitRequiredInventoryQuantity is a GDT of type Quantity and may be optional. In some implementations the ExecutionMethodLogisticUnitRequiredInventoryQuantity has a qualifier of Inventory. The ExecutionMethodLogisticUnitRequiredInventoryQuantity is an inventory quantity of the logistic units that is either maintained in a storage location to meet the inventory required limits or the fixed quantity that will be replenished or cleaned up. The determination of the required inventory quantity is based on the InventoryLevelControlRuleExecutionMethodQuantityDeterminationMethodCode field above. The ExecutionMethodLogisticUnitRequiredInventoryQuantityTypeCode is a GDT of type QuantityTypeCode and may be optional. In some implementations the ExecutionMethodLogisticUnitRequiredInventoryQuantityTypeCode has a qualifier of Inventory. The ExecutionMethodLogisticUnitRequiredInventoryQuantityTypeCode is a quantity type used to define the logistic unit that is either maintained in a storage location to meet the inventory required limits or the fixed quantity that will be replenished or cleaned up.

A ConditionThresholdLogisticUnit has a cardinality of c:cn. The ConditionThresholdLogisticUnit specifies a LogisticUnit which defines an inventory level control rule condition threshold. A ExecutionMethodLogisticUnit has a cardinality of c:cn. The ExecutionMethodLogisticUnit specifies a LogisticUnit which defines a storage location's maximum required quantity for replenishment or a safety stock quantity for cleanup. A Material has the cardinality of c:cn. The Material specifies a material for which a replenishment or cleanup rule is defined. A ProductCategoryHierarchyProductCategory has a cardinality of c:cn. The ProductCategoryHierarchyProductCategory specifies a ProductCategory for which a replenishment or cleanup rule is defined.

QueryBySelectionCriteria provides the relevant InventoryLevelControlRule for the given logistics area and material. The query elements are defined by the data type: StorageControlInventoryLevelControlRuleSelectionCriteriaQueryElements. These elements may include MaterialUUID, MaterialID, HostObjectNodeReference, TypeCode. The MaterialUUID is a GDT of type UUID and may be optional. The MaterialID is a GDT of type ProductID and maybe optional. The HostObjectNodeReference is a GDT of type ObjectNodeReference. In some implementations the HostObjectNodeReference has a qualifier of Host. The TypeCode is a GDT of type InventoryLevelControlRuleTypeCode.

InventoryAllocationRule

An InventoryAllocationRule specifies for StorageControl and a material a rule for determining if required inventory is based on on-hand or expected inventory. The elements located at the node InventoryAllocationRule are defined by the data type StorageControlInventoryAllocationRuleElements. These elements may include UUID, MaterialUUID, MaterialID, InventoryAllocationTypeCode. The UUID is a GDT of type UUID. The UUID is the universally unique identifier of an inventory allocation rule for referencing purposes. The MaterialUUID is a GDT of type UUID and may be optional. The MaterialUUID is the unique identifier of a material which serves as a selection criterion for the inventory allocation rule. The MaterialID is a GDT of type ProductID and may be optional. The MaterialID is the unique identifier of a material which serves as a selection criterion for the inventory allocation rule. The InventoryAllocationTypeCode is a GDT of type InventoryAllocationTypeCode. The InventoryAllocationTypeCode is the coded representation of the type of inventory allocation for a source storage location. An inventory allocation is the reservation of inventory for anticipated consumers.

A Material has a cardinality of c:cn. The Material specifies a material for which an inventory allocation rule is defined.

UniformityCriteria

UniformityCriteria specifies for a StorageControl the criteria of uniformity of the inventory that needs to be maintained in a storage location. The criteria are described in terms of material and logistic unit. The elements located at the node UniformityCriteria are defined by the data type: StorageControlUniformityCriteriaElements. These elements include UUID, InventoryUniformityCode. The UUID is a GDT of type UUID. The UUID is the universally unique identifier of uniformity criteria for referencing purposes. The InventoryUniformityCode is a GDT of type InventoryUniformityCode. The InventoryUniformityCode is the coded representation of the uniformity of inventory that needs to be maintained in a storage location. It defines the level of inventory uniformity, in terms of material and logistic unit.

InventoryItemConstraint

An InventoryItemConstraint specifies for a StorageControl a constraint of a logistic unit or a material that belongs to a material category. The Constraint determines whether the logistic unit or the material is allowed to be stored in a storage location. The elements located at the node InventoryItemConstraint are defined by the data type: StorageControlInventoryItemConstraint Elements. These elements may include UUID, ProductCategoryUUID, ProductCategoryHierarchyProductCategoryIDKey, ProductCategoryHierarchyID, ProductCategoryInternalID, AllowedLogisticUnitUUID, AllowedLogisticUnitID, AllowedLogisticUnitMaximumQuantity, AllowedLogisticUnitMaximumQuantityTypeCode. The UUID is a GDT of type UUID. The UUID is the universally unique identifier of a logistic unit or a material category constraint for referencing purposes. The ProductCategoryUUID is a GDT of type UUID and may be optional. The ProductCategoryUUID is the Universally unique identifier of a product category, which is assigned in order to reference the relevant product category which is allowed to be stored in the storage location. The ProductCategoryHierarchyProductCategoryIDKey is a IDT of type ProductCategoryHierarchyProductCategoryIDKey and may be optional. The ProductCategoryHierarchyProductCategoryIDKey is the unique identifier of a product category, which is assigned in order to reference the relevant product category which is allowed to be stored in the storage location. The ProductCategoryHierarchyID is a GDT of type ProductCategoryHierarchyID. The ProductCategoryHierarchyID is the unique identifier of the product category hierarchy which the product category belongs to. The ProductCategoryInternalID is a GDT of type ProductCategoryInternalID. The ProductCategoryInternalID is the alternative identifier for a product category. The AllowedLogisticUnitUUID is a GDT of type UUID and may be optional. The AllowedLogisticUnitUUID is the Universally unique identifier of a logistic unit, which is assigned in order to reference the relevant logistic unit which is allowed to be stored in the storage location. The AllowedLogisticUnitID is a GDT of type LogisticUnitID and may be optional. The AllowedLogisticUnitID is the universally unique identifier of a logistic unit, which is assigned in order to reference the relevant logistic unit which is allowed to be stored in the storage location. The AllowedLogisticUnitMaximumQuantity is a GDT of type Quantity and may be optional. In some implementations the AllowedLogisticUnitMaximumQuantity has a qualifier of Maximum. The AllowedLogisticUnitMaximumQuantity is the maximum quantity of logistic units allowed to be stored in a storage location. The AllowedLogisticUnitMaximumQuantityTypeCode is a GDT of type QuantityTypeCode and may be optional. In some implementations the AllowedLogisticUnitMaximumQuantityTypeCode has a qualifier of Maximum. The AllowedLogisticUnitMaximumQuantityTypeCode is the quantity type used to define the logistic unit allowed to be stored in a storage location.

A MaterialCategory has the cardinality of c:cn. The MaterialCategory specifies a MaterialCategory of which materials are allowed to be stored in a storage location. An AllowedLogisticUnit has a cardinality of c:cn. The AllowedLogisticUnit specifies a LogisticUnit that is allowed to be stored in a storage location. InventoryItemConstraint of a material category is to be referenced to the MaterialCategory in which the material is of type material.

PhysicalCapacity

PhysicalCapacity specifies for a StorageControl dimensional physical constraints of a storage location (for example, the maximum weight of Bin 021 is 200 kilos). The elements located at the node PhysicalCapacity are defined by the data type StorageControlPhysicalCapacity. These elements include UUID, MaximumWeightMeasure, MaximumWeightMeasureTypeCode, MaximumVolumeMeasure, MaximumVolumeMeasureTypeCode. The UUID is a GDT of type UUID. The UUID is the universally unique identifier of physical capacity for referencing purposes. The MaximumWeightMeasure is a GDT of type Measure and may be optional. In some implementations the MaximumWeightMeasure has a qualifier of MaximumWeight. The MaximumWeightMeasure is the maximum weight allowed in a storage location. The MaximumWeightMeasureTypeCode is a GDT of type MeasureTypeCode and may be optional. In some implementations the MaximumWeightMeasureTypeCode has a qualifier of MaximumWeight. The MaximumWeightMeasureTypeCode is the measure type used to define the maximum weight allowed in a storage location. The MaximumVolumeMeasure is a GDT of type Measure and may be optional. In some implementations the MaximumVolumeMeasure has a qualifier of MaximumVolume. The MaximumVolumeMeasure is the maximum volume allowed in a storage location. The MaximumVolumeMeasureTypeCode is a GDT of type MeasureTypeCode and may be optional. In some implementations the MaximumVolumeMeasureTypeCode has a qualifier of MaximumVolume. The MaximumVolumeMeasureTypeCode is the measure type used to define the maximum volume allowed in a storage location.

DesignatedMaterial

A DesignatedMaterial specifies for a StorageControl a material that is allowed to be stored in a storage location. The elements located at the node DesignatedMaterial are defined by the type GDT StorageControlDesignatedMateriallElements. These elements may include UUID, MaterialUUID, MaterialID. The UUID has a GDT of type UUID. The UUID is the universal unique identifier of the material constraint for referencing purposes. The MaterialUUID is a GDT of type UUID and may be optional. The MaterialUUID is the unique identifier of a material which can be stored in the storage location. The MaterialID is a GDT of type ProductID and may be optional. The MaterialID is the Unique identifier of a material which can be stored in the storage location.

The Material has the cardinality of c:cn. The Material specifies a material that can be stored in a place capable of storing inventory. In certain implementations, DesignatedMaterial is to be referenced to a Product of type material.

Business Object SupplyPlanningArea

FIG. 170 illustrates an example SupplyPlanningArea business object model 170004. Specifically, this model depicts interactions among various hierarchical components of the SupplyPlanningArea, as well as external components that interact with the SupplyPlanningArea (shown here as 170000 through 170002 and 170006 through 170008).

A SupplyPlanningArea is an area for which a separate planning ensures the availability of products on time. To achieve this, the Supply Planning Area groups requirements, stocks, and further requirement coverage elements of a site for consumption in the net requirements calculation in material requirements planning. The business object SupplyPlanningArea is a master data and is located in the DU Foundation Layer as it is used by several DUs. A separate process component is not necessary as no B2B messages are required and no business object messages are to be sent from the Foundation Layer to other LDUs. The SupplyPlanningArea contains attributes for material requirements planning and descriptions. It groups requirements, stocks, and further requirement coverage elements of a Location for consumption in the net requirements calculation in material requirements planning (MRP).

In some implementations the Supply Chain Coordination (SCC), stocks, requirements and procurement elements may be assigned to one SupplyPlanningArea. Therefore, you can perform material requirements planning for a product separately per SupplyPlanningArea. When a Location is planned, it may have one SupplyPlanningArea initially. This is indicated as the default SupplyPlanningArea. Using the introduction of further SupplyPlanningAreas to the Location, the objects of a Location that are relevant to planning can be further subdivided. You need to define further SupplyPlanningAreas if planning at site level is not detailed enough—that is, if you want to execute the MRP run separately for your "series products" and your "spare parts", or for "important customers" and "other customers" for example.

There will be no hierarchies of SupplyPlanningAreas or other relationships between SupplyPlanningAreas.

The SupplyPlanningArea is an area in planning for which the availability of products on time is guaranteed. It contains identifying and administrative information for a SupplyPlanningArea can contains the data valid for the complete object. The node SupplyPlanningArea contains attributes that are required for material requirements planning.

The elements located at the SupplyPlanningArea root node 170010 are defined by the datatype: SupplyPlanningAreaElements. These elements include ID, UUID, SystemAdministrativeData, DefaultIndicator, Status, LifeCycleStatusCode. The ID is a GDT of type SupplyPlanningAreaID. The ID is the unique identifier of a SupplyPlanningArea. The UUID is a GDT of type UUID. The UUID is the universally unique identifier of a SupplyPlanningArea. The SystemAdministrativeData is a GDT of type SystemAdministrativeData. The SystemAdministrativeData is the general administrative data on the SupplyPlanningArea that is stored in a system. The Def-aultIndicator is a GDT of type Indicator and may be optional. In some implementations the DefaultIndic-ator has a qualifier of Default. The DefaultIndicator specifies whether the SupplyPlanningArea in question is the default SupplyPlanningArea for a certain Location. The Status Indicates the Status of a Supply-PlanningArea. The IDT SupplyPlanningAreaStatus consists of the status variable LifeCycleStatusCode. The LifeCycleStatusCode is a GDT of type SupplyPlanningAreaLifeCycleStatusCode. The LifecycleStatusCode can be the status variable is used to give the lifecycle status of a SupplyPlanning-Area.

The CreationIdentity has a cardinality of 1:cn. The CreationIdentity can be the association to the Identity that has created the Supply Planning Area The LastChangeIdentity has a cardinality of c:c. The LastChangeIdentity can be the association the Identity that has last changed the Supply Planning Area.

The TextCollection 170014 has a cardinality of 1:c, can be (language-dependent). The Location 170012 has a cardinality of 1:1. The Description 170016 has a cardinality of 1:cn.

The action Block (S&AM action) blocks an active SupplyPlanningArea. In some implementations, preconditions may include that the action may only be called if the SupplyPlanningArea is not flagged for deletion, it is active, and it is not blocked. Changes to the status may include that the status of the SupplyPlanningArea is set to "Blocked".

The action Activate (S&AM action) activates a SupplyPlanningArea. In some implementations, preconditions may include that the SupplyPlanningArea can have the status "In Preparation". Changes to the status may include that when the action is executed, a consistency check is carried out for the SupplyPlanningArea. The SupplyPlanningArea is only activated if it is consistent.

The action Unblock (S&AM action) unblocks a SupplyPlanningArea. In some implementations, preconditions may include that the SupplyPlanningArea can have the status "Blocked". Changes to the status may include that the SupplyPlanningArea is set to "Active" status.

The action Delete (S&AM action) deletes a SupplyPlanningArea. In some implementations, preconditions may include that the SupplyPlanningArea can be in "In Preparation" state. Changes to the object may include that the SupplyPlanningArea is deleted.

The action FlagAsObsolete (S&AM action) marks a SupplyPlanningArea as obsolete. In some implementations, preconditions may include that the SupplyPlanningArea should not be used in any processes. Changes to the status may include that the SupplyPlanningArea has the status "Obsolete".

The action RevokeObsolescence (S&AM action) revokes the obsolescence for a SupplyPlanningArea and sets it as "Blocked". In some implementations, preconditions may include that the SupplyPlanningArea can have the status "Obsolete". Changes to the status may include that the SupplyPlanningArea has the status "Blocked".

QueryByIdentifier Provides a quantity of SupplyPlanningAreas. You can search with identifiers that can be interpreted manually (ID) or automatically (UUID). The query elements are defined by the datatype: SupplyPlanningAreaIdentifierQueryElements. These elements include ID, UUID, SupplyPlanningArea-Status. The ID is a GDT of type SupplyPlanningAreaID and is optional. The UUID is a GDT of type UUID and is optional. The SupplyPlanningAreaStatus is a GDT of type SupplyPlanningAreaStatus. The Supply-PlanningAreaStatus Indicates the status of a SupplyPlanningArea.

QueryByLocation provides the quantity of the SupplyPlanningAreas that belong to the specified Location. You can search using the unique identifiers of the Location. The query elements are defined by the datatype: SupplyPlanningAreaLocationQueryElements. These elements include LocationLocationUUID, LocationLocationID, LocationLocationStandardID, SupplyPlanningAreaStatus. The LocationLocationUUID is a GDT of type UUID and is optional. The LocationLocationID is a GDT of LocationID and is optional. The LocationLocationStandardID is a GDT of type LocationStandardID and is optional. The SupplyPlanningAreaStatus is a IDT of type SupplyPlanningAreaStatus. The SupplyPlanningAreaStatus indicates the status of a SupplyPlanningArea.

QueryByLocationAndDefault provides the quantity of the SupplyPlanningAreas that belong to the specified Locations and that each represent the DefaultSupplyPlanningArea for a Location. You can search using the unique identifiers of the Location. If nothing is filled, all the SupplyPlanningAreas are listed that represent the default for a certain Location. The DefaultIndicator is set to "True" for this query. The query elements are defined by the datatype: SupplyPlanningAreaLocationAndDefaultQuery-Elements. These include LocationLocationUUID, LocationLocationID, LocationLocationStandardID, SupplyPlanningAreaStatus. The LocationLocationUUID is a GDT of type UUID and is optional. The LocationLocationID is a GDT of type LocationID and is optional. The LocationLocationStandardID is a GDT of type LocationStandardID and is optional. The SupplyPlanningAreaStatus is a IDT of type SupplyPlanningAreaStatus. The SupplyPlanningAreaStatus indicates the status of a SupplyPlanningArea.

The node TextCollection contains a short description for the responsible planner that describes the SupplyPlanningArea more precisely. That is, it explains which requirements and procurement elements can be found in the SupplyPlanningArea.

Location contains the information for which Location planning is executed.

In alternative implementations, the association to the Location is to receive the cardinality 1..n instead of the cardinality 1. In this alternate implementation, a SupplyPlanningArea can plan several Locations.

The elements located at the node Location are defined by the datatype: SupplyPlanningAreaLocation-Elements. These elements include LocationUUID and LocationID. The LocationUUID is a GDT of type UUID. The LocationUUID can be a universally unique identifier of a Location. The LocationID is a GDT of type LocationID and is optional. The LocationID can be a unique identifier of a Location.

The PlannedLocation has a cardinality of 1:cn. The PlannedLocation is the association PlannedLocation defines for which Location the Supply Planning Area is related to.

If several SupplyPlanningAreas exist for one Location, one of them could be indicated as the default planning area.

Description contains a language-dependent description of the Supply Planning Area.

The elements located at the node Description are defined by the datatype SupplyPlanningArea-DescriptionElements. These elements include Description. The Description is a GDT of type SHORT_Description.

Node Structure of Business Object SupplyQuotaArrangement

FIGS. 171-1 through 171-4 illustrate an example SupplyQuotaArrangement business object model 171000. Specifically, this model depicts interactions among various hierarchical components of the SupplyQuotaArrangement, as well as external components that interact with the SupplyQuotaArrangement (shown here as 171002 through 171012 and 171046 through 171072).

The distribution of material requirements or material issues to different sources of supply, business partners, or internal organizational units. Some supply quota arrangements can be used, for example, to distribute material requirements and issues between internal production and external procurement. In some examples, supply quota arrangements can also be used to distribute goods to different customers in case of a surplus or shortage of goods. The business object SupplyQuotaArrangement belongs to the process component SourceOfSupplyDetermination, which can be in the foundation layer. The business object SupplyQuotaArrangement can include the definition of the object (root) to which the supply quota arrangement can be to be applied, and the supply quota arrangements for sources of supply, business partners, or internal organizational units (item).

The SupplyQuotaArrangement can be the distribution of material requirements or material issues to different sources of supply, business partners, or internal organizational units. Supply quota arrangements can be used, for example, to distribute material requirements and issues between internal production and external procurement. In some examples, supply quota arrangements can also be used to distribute goods to different customers in case of a surplus or shortage of goods. In some implementations, the root node Supply- QuotaArrangement can restrict the material reference to business partners or organizational units within your own company, and their locations. In one example, a SupplyQuotaArrangement defines a material reference including a time-based validity for an incoming or outgoing supply quota arrangement.

A SupplyQuotaArrangement can be characterized by two specialization types: A SupplyQuotaArrangement occurs in the following complete and disjoint specializations. For example, an IncomingSupplyQuotaArrangement 171018 can be an incoming supply quota arrangement can be the quota arrangement of a material requirement. The corresponding SupplyQuotaDirectionCode has the value 'Incoming Supply Quota Arrangement. In some examples, the OutgoingSupplyQuotaArrangement 171020 can be an outgoing supply quota arrangement can be the quota arrangement of a material issue. The corresponding SupplyQuotaDirectionCode has the value 'Outgoing Supply Quota Arrangement'.

A SupplyQuotaArrangement occurs in the following complete and disjoint specializations, such as MaterialQuotaArrangement 171022, ServiceProductQuotaArrangement 171024, ProductCategoryQuotaArrangement 171026, and AllMaterialsQuotaArrangement 171028. For example, a MaterialQuotaArrangement can be a supply quota arrangement for one material. In this case the ProductUUID contains a MaterialUUID. For example, a ServiceProductQuotaArrangement can be a supply quota arrangement for a Service. In this case the ProductUUID contains a ServiceProductUUID. For example, a ProductCategoryQuotaArrangement can be a supply quota arrangement for a product category. In some cases, a ProductCategoryHierarchyProductCategoryUUID can be specified. For example, an AllMaterialsQuotaArrangement can be a supply quota arrangement that applies to all materials. In some cases, neither a ProductUUID nor a ProductCategoryHierarchyProductCategoryUUID can be specified.

The Root node SupplyQuotaArrangement 171014 contains the following elements, which are defined by the data type SupplyQuotaArrangementElements. The elements can include: UUID, ID, SystemAdministrativeData, OrganisationalCentreUUID, OrganisationalCentreBusinessCharacterCode, ProductUUID, ProductsSpecificationDetailLevelCode, ProductTypeCode, ProductCategoryHierarchyProductCategoryUUID, SupplyQuotaDirectionCode, ValidityPeriod, Status, and Key.

The UUID can be a Universal identifier of the SupplyQuotaArrangement. The UUID can be a GDT of type UUID. In some implementations, the UUID, and can be an alternative key. The ID can be a unique identifier of the SupplyQuotaArrangement. The ID can be a GDT of type SupplyQuotaArrangementID. The SystemAdministrativeData can be administrative data that can be stored in a system. This data includes system users and change times. The SystemAdministrativeData can be a GDT of type SystemAdministrativeData. The OrganisationalCentreUUID can be a universal identifier of your own company or of the permanent establishment of your own company for which the supply quota arrangement can be defined. The OrganisationalCentreUUID can be a GDT of type UUID, and can be optional.

The OrganisationalCentreBusinessCharacterCode can be coded representation of the business role of the OrganisationalCentre that can be uniquely identified by the element OrganisationalCentreUUID. The OrganisationalCentreBusinessCharacterCode can be a GDT of type ORGANCAN BEATIONALCENTRE_PartyBusinessCharacterCode, and can be optional. The ProductUUID can be a universal identifier of the product to which a supply quota arrangement can be to be applied.

GDT of type UUID, and can be optional. The ProductsSpecificationDetailLevelCode can be a coded representation of the level of detail for specifying materials. The ProductsSpecificationDetailLevelCode can be a GDT of type ProductsSpecificationDetailLevelCode. The ProductTypeCode can be a coded representation of the product type. In some examples, two types 'Material' and 'Service Product' are allowed. The ProductTypeCode can be a GDT of type ProductTypeCode, and can be optional. The ProductCategoryHierarchyProductCategoryUUID can be a universal identifier of the product category to be procured. The ProductCategoryHierarchyProductCategoryUUID can be a GDT of type UUID, and can be optional. The SupplyQuotaDirectionCode specifies, whether this can be an incoming or outgoing supply quota arrangement. The SupplyQuotaDirectionCode can be a GDT of type SupplyQuotaDirectionCode. The ValidityPeriod can be the validity period of the supply quota arrangement. The ValidityPeriod can be a GDT of type UPPEROPEN_LOCALNORMALIZED_DateTimePeriod. In some implementations, the ValidityPeriod has a Validity qualifier. The Status can be the current status of the SupplyQuotaArrangement. It can be defined by the data type SupplyQuotaArrangementStatus. The Status conscan bets of the following status variables:

The LifeCycleStatusCode can be a GDT of type SupplyQuotaArrangementLifeCycleStatusCode and describes stages in the life of a SupplyQuotaArrangement. The Key can be an alternative key of the SupplyQuotaArrangement. Some elements of the alternative key may include: OrganisationalCentralUUID (optional), ProductUUID (optional), ProductCategoryUUID (optional), SupplyQuotaDirector Code, and ValidityPeriod.

There may be a number of Inbound Aggregation Relationships including:

(1) From the business object Material, the Material may be a cardinality relationship of c:cn. The Material identifies the material to which a supply quota arrangement can be to be applied.

(2) From the business object ServiceProduct, the ServiceProduct may be a cardinality relationship of c:cn. The ServiceProduct identifies the service to which a supply quota arrangement can be to be applied.

(3) From the business object ProductCategoryHierarchy/ProductCategory, the ProductCategory may be a cardinality relationship of c:cn. The ProductCategory identifies the product category to which a supply quota arrangement can be to be applied.

(4) From the business object Company, the Company may be a cardinality relationship of c:cn. The Company can be your own company for which the supply quota arrangement can be defined.

(5) From the business object PermanentEstablishment, the PermanentEstablishment may be a cardinality relationship of c:cn. The PermanentEstablishment can be your own permanent establishment for which the supply quota arrangement can be defined.

(6) From business object Identity, the CreationIdentity may be a cardinality relationship of 1:cn. The CreationIdentity identifies the identity that created the SupplyQuotaArrangement.

From business object Identity, the LastChangedIdentity may be a cardinality relationship of c:cn. The LastChangedIdentity identifies the identity that changed the SupplyQuotaArrangement.

In some examples, the composition relationships to subordinate nodes can include an Item 171016 having a cardinality of 1:n, and/or a ReferenceCollection 171030 having a cardinality of 1:1.

The MaterialQuotaArrangement and ServiceProductQuotaArrangement override the settings in ProductCategoryQuotaArrangement and the settings in AllMaterialsQuotaArrangement. A ProductCategoryQuotaArrangement overrides only the settings in AllMaterialsQuotaArrangement. Either ProductCategoryUUID or ProductUUID can be specified. If neither ProductCategoryUUID nor ProductUUID can be specified, the supply quota arrangement refers to the specialization AllMaterialsQuotaArrangement. The location can belong to your own company.

The OrganisationalCentreUUID can contain either CompanyUUID or PermanentEstablishmentUUID.

The ProductUUID can contain MaterialUUID or ServiceProductUUID.

The Activate (S&AM action) activates a SupplyQuotaArrangement. In some implementations, preconditions may be that the SupplyQuotaArrangement can be consistent and has the LifeCycleStatus 'In Preparation'. Changes to the status may include that the action sets the LifeCycleStatus to 'Active'. In some implementations, the action can be called from UI.

The Block (S&AM action) blocks a SupplyQuotaArrangement. In some implementations, preconditions may be that the SupplyQuotaArrangement has the LifeCycleStatus 'Active'. Changes to the status may include that the action sets the LifeCycleStatus to 'Blocked'. In some implementations, the action can be called from UI.

The Unblock (S&AM action) puts a SupplyQuotaArrangement back to 'Active'. In some implementations, preconditions may be that the SupplyQuotaArrangement has the LifeCycleStatus 'Blocked'. Changes to the status may include the action sets the LifeCycleStatus to 'Active'. In some implementations, the action can be called from UI.

The FlagAsObsolete (S&AM action) flags a SupplyQuotaArrangement as obsolete. In some implementations, preconditions may be that the SupplyQuotaArrangement has the LifeCycleStatus 'Active' or 'Blocked'. Changes to the status may include that the action sets the LifeCycleStatus to 'Obsolete'. In some implementations, the action can be called from UI.

RevokeObsolescence (S&AM action) puts a SupplyQuotaArrangement back to 'Blocked'. In some implementations, preconditions may be that the SupplyQuotaArrangement has the LifeCycleStatus 'Obsolete'.

Changes to the status may include that the action sets the LifeCycleStatus to 'Blocked'. In some implementations, the action can be called from UI.

The ActivateAll (ESI action) activates a SupplyQuotaArrangement including all subordinated nodes Item. In some implementations, preconditions may be that the SupplyQuotaArrangement and its subordinated nodes Item are consistent and have the LifeCycleStatus 'In Preparation'. Changes to the status may include that the action sets the LifeCycleStatus of the SupplyQuotaArrangement and of its subordinated nodes Item to 'Active'. In some implementations, the action can be called from UI.

The QueryByProductAndOrganisationalCentre provides a list of all supply quota arrangements for a particular material and a particular organizational unit. The supply quota arrangements have a particular direction and are valid for the period specified. The query can be not called from the UI. The query elements are defined by the data type SupplyQuotaArrangementProductAndOrganisationalCentreQueryElements. These elements include: ProductUUID, ProductTypeCode, OrganisationalCentreUUID, SupplyQuotaDirectionCode, ValidityDateTime, LifeCycleStatusCode, QueryByProductCategoryAndOrganisationalCentre, ProductCategoryHierarchyProductCategoryUUID, OrganisationalCentreUUID, SupplyQuotaDirectionCode, and LifeCycleStatusCode.

The ProductUUID can be a GDT of type UUID. The supply quota arrangements that refer to the product category of the specified material or to all materials are also returned. The ProductTypeCode can be a GDT of type ProductTypeCode. The OrganisationalCentreUUID can be a GDT of type UUID. The SupplyQuotaDirectionCode can be a GDT of type SupplyQuotaDirectionCode. The ValidityDateTime can be a GDT of type _GLOBAL_DateTime. The system returns those supply quota arrangements with a ValidityDateTime that lies within the ValidityPeriod. The LifeCycleStatusCode can be a GDT of type SupplyQuotaArrangementLifeCycleStatusCode, and can be optional. The QueryByProductCategoryAndOrganisationalCentre provides a list of all supply quota arrangements for a particular product category and a particular organizational unit. The supply quota arrangements have a particular direction and are valid for the period specified. The query can be not called from the UI. The query elements are defined by the data type SupplyQuotaArrangementProductCategoryAndOrganisationalCentreQueryElements. The ProductCategoryHierarchyProductCategoryUUID can be a GDT of type UUID. The supply quota arrangements that refer to a product category on the above hierarchy level of the product category are also returned. The OrganisationalCentreUUID can be a GDT of type UUID. The SupplyQuotaDirectionCode can be a GDT of type SupplyQuotaDirectionCode. The LifeCycleStatusCode can be a GDT of type SupplyQuotaArrangementLifeCycleStatusCode, and can be optional.

The QueryByElements provides a list of all supply quota arrangements for a particular MaterialID or ServiceProductID or ProductCategoryID and a particular Company ID. The supply quota arrangements have a particular direction and are valid for a particular period. The query can be called from the UI.

The query elements are defined by the data type SupplyQuotaArrangementElementsQueryElements. These elements include: ID, ReferenceCollectionProductID, ProductTypeCode, ProductsSpecificationDetailLevelCode, ReferenceCollectionProductCategoryHierarchyProductCategoryIDKey, ReferenceCollectionCompanyID, SupplyQuotaDirectionCode, ItemReferenceCollectionBusinessPartnerInternalID, ValidityDateTime, OrganisationalCentreUUID, ProductUUID, ProductCategoryHierarchyProductCategoryUUID, ItemBusinessPartnerUUID, ItemSourceOfSupplyUUID, and LifeCycleStatusCode.

The ID can be a unique identifier of the SupplyQuotaArrangement. The ID can be a GDT of type SupplyQuotaArrangementID, and can be optional. The ReferenceCollectionProductID can be a GDT of type ProductID, and can be optional. The ProductTypeCode can be a GDT of type ProductTypeCode, and can be optional. The ProductsSpecificationDetailLevelCode can be coded representation of the level of detail for specifying materials. The ProductsSpecificationDetailLevelCode can be a GDT of type ProductsSpecificationDetailLevelCode, and can be optional. The ReferenceCollectionProductCategoryHierarchyProductCategoryIDKey can be an IDT of type ProductCategoryHierarchyProductCategoryIDKey, and can be optional. The ReferenceCollectionCompanyID can be a GDT of type OrganisationalCentreID, and can be optional. The SupplyQuotaDirectionCode can be a GDT of type SupplyQuotaDirectionCode. The ItemReferenceCollectionBusinessPartnerInternalID can be a GDT of type BusinessPartnerInternalID, and can be optional. The system returns those supply quota arrangements with the Item that can be related to the BusinessPartnerInternalID. The ValidityDateTime can be a GDT of type _GLOBAL_DateTime. The OrganisationalCentreUUID can be a GDT of type UUID, and can be optional. The ProductUUID can be a GDT of type UUID, and can be optional. ProductCategoryHierarchyProductCategoryUUID can be a GDT of type UUID, and can be optional. The ItemBusinessPartnerUUID can be a GDT of type UUID, and can be optional. The system returns those supply quota arrangements with the Item that can be related to the BusinessPartnerUUID. The ItemSourceOfSupplyUUID can be a universal identifier of the source of supply. The ItemSourceOfSupplyUUID can be a GTD of type UUID, and can be optional. The LifeCycleStatusCode can be a GDT of type SupplyQuotaArrangementLifeCycleStatusCode, and can be optional.

A ReferenceCollection contains the Identifiers that can be displayed for the references of the SupplyQuotaArrangement. The node ReferenceCollection contains the following elements, which are defined by the data type SupplyQuotaArrangementReferenceCollectionElements. These elements include: CompanyID, PermanentEstablishmentID, ProductID, and ProductCategoryHierarchyProductCategoryIDKey.

The CompanyID can be a unique identifier of your own company for which the supply quota arrangement can be defined. The CompanyID can be a GDT of type OrganisationalCentreID, and can be optional. The PermanentEstablishmentID can be a unique identifier of the permanent establishment of your own company for which the supply quota arrangement can be defined. The PermanentEstablishmentID can be a GDT of type OrganisationalCentreID, and can be optional. The ProductID can be a unique identifier of the service to which a supply quota arrangement can be to be applied. The ProductID can be a GDT of type ProductID, and can be optional. The ProductCategoryHierarchyProductCategoryIDKey can be a unique identifier of the product category hierarchy and product category to which a supply quota arrangement can be to be applied. The ProductCategoryHierarchyProductCategoryIDKey can be an IDT of type ProductCategoryHierarchyProductCategoryIDKey, and can be optional.

The IDs can be filled according to the UUIDs of the SupplyQuotaArrangement. The Item defines the portion of the supply quota arrangement that can be covered by a source of supply and contains the current quantity in the supply quota arrangement. A supply quota arrangement item can directly reference the following sources of supply: Internal production, External procurement, and Internal procurement For general supply quota arrangement items, the Item node can refer to business partners or organizational units within your own company, or it can refer explicitly to sources of supply. An Item can be characterized by two specialization types: An Item occurs in the following complete and disjoint specializations:

The ExternalProcurementSupplyQuotaArrangementItem 171038 can be the portion of the material requirements or material issues that can be covered by external procurement relationships. In this case the ProcurementCategoryCode has the value 'External Procurement. The InternalProcurementSupplyQuotaArrangementItem 171040 can be the portion of the material requirements or issues that can be covered by internal procurement relationships.

In this case the ProcurementCategoryCode has the value 'Internal Procurement. The InternalProductionSupplyQuotaArrangementItem 171042 can be the portion of the material requirements or issues that can be covered by internal procurement. In this case the ProcurementCategoryCode has the value 'In-house production'.

An Item occurs in the some complete and disjoint specializations. The LogisticRelationshipSupplyQuotaArrangementItem 171032 can be the Supply Quota Arrangement Item that refers to a logistical relationship of a source of supply. In this case a SourceOfSupplyLogisticalRelationshipUUID can be specified and the SourceOfSupplySpecificationDetailLevelCode has the value 'Logistical Relationship of a Source of Supply.

The SourceOfSupplyQuotaArrangementItem 171034 can be the Supply quota arrangement item that refers to a particular source of supply. If there are supply quota arrangement items that refer to a logistical relationship of this particular source of supply the logistical relationships are excluded from the supply quota arrangement item.

In this case a SourceOfSupplyUUID can be specified and the SourceOfSupplySpecificationDetailLevelCode has the value 'Source of Supply'.

The PartySupplyQuotaArrangementItem 171036 can be the Supply quota arrangement item that refers to all sources of supply of a party. If there are supply quota arrangement items that refer to location or a source of supply of this party these locations and sources of supply are excluded from the supply quota arrangement item.

In this case a BusinessPartnerUUID or a PartnerPermanentEstablishmentUUID can be specified and the SourceOfSupplySpecificationDetailLevelCode has the value 'Source of Supply of a Party'. The node Item contains the following elements which are defined by the data type SupplyQuotaArrangementItemElements. These elements include: UUID, BusinessPartnerUUID, PartnerOrganisationalCentreUUID, PartnerOrganisationalCentreBusinessCharacterCode, SourceOfSupplyUUID, SourceOfSupplyLogisticalRelationshipUUID, ProcurementCategoryCode, SourceOfSupplySpecificationDetailLevelCode, GDT: SourceOfSupplySpecificationDetailLevelCode, QuotaValue, CorrectionQuantity, CorrectionQuantityTypeCode, and Status.

The UUID can be a universal identifier of the item of the SupplyQuotaArrangement. The UUID can be a GDT of type UUID. The BusinessPartnerUUID can be a universal identifier of the customer or supplier for the portion of the supply quota arrangement for an outgoing or incoming supply quota arrangement. Depending on SupplyQuotaDirectionCode, BusinessPartnerUUID refers to the business partner with the role Supplier for incoming supply quota arrangements, or the role Customer for outgoing supply quota arrangements. The BusinessPartnerUUID can be a GDT of type UUID, and can be optional. The PartnerOrganisationalCentreUUID can be a universal identifier of the company or the permanent establishment participating in the supply quota arrangement. GDT: UUID, and can be optional. The PartnerOrganisationalCentreBusinessCharacterCode can be a coded representation of the business role of the OrganisationalCentre that can be uniquely identified by the element OrganisationalCentreUUID. The PartnerOrganisationalCentreBusinessCharacterCode can be a GDT of type ORGANISATIONALCENTRE_PartyBusinessCharacterCode, and can be optional.

The SourceOfSupplyUUID can be a universal identifier of the source of supply. The SourceOfSupplyUUID can be a GTD of type UUID, and can be optional. The SourceOfSupplyLogisticalRelationshipUUID can be a universal identifier of the logistical relationship in the source of supply. The SourceOfSupplyLogisticalRelationshipUUID can be a GTD of type UUID, and can be optional. The ProcurementCategoryCode can be a procurement category of the products. The ProcurementCategoryCode can be a GDT of type ProcurementCategoryCode. The SourceOfSupplySpecificationDetailLevelCode can be a coded representation of the level of detail for specifying sources of supply. The SourceOfSupplySpecificationDetailLevelCode can be a GDT of type SourceOfSupplySpecificationDetailLevelCode.

The QuotaValue can be the quota value assigned to the Item. The reference value of the QuotaValue can be the sum of the QuotaValue of all quota value items. The QuotaValue can be a GDT of type QuotaValue. The CorrectionQuantity is the quantity that corrects the proportion of FulfilledQuantity in relation to other instances of FulfilledQuantity. The CorrectionQuantity describes a quantity with base unit. The CorrectionQuantity can be a GDT of type Quantity. In some implementations, The CorrectionQuantity has a Correction qualifier, and can be optional. To represent the defined quotas (QuotaValues) according to the actual flow of goods, the goods quantities are added up to form the FulfilledQuantity. The aim of the quota arrangement algorithm can be to set the proportions of the FulfilledQuantity to those defined by the QuotaValue. If you add a new source of supply, it has no FulfilledQuantity at first and can be thereby disproportionate to the other sources of supply. This can be corrected using the CorrectionQuantity. The CorrectionQuantityTypeCode can be a type of CorrectionQuantity. The CorrectionQuantityTypeCode can be a GDT of type QuantityTypeCode. In some implementations, the CorrectionQuantityTypeCode has a Correction, qualifier and can be optional.

The Current status of the SupplyQuotaArrangementItem can be defined by data type SupplyQuotaArrangementItemStatus and Consists of the some status variables. The LifeCycleStatusCode describes stages in the life of a SupplyQuotaArrangementItem. The SupplyQuotaArrangementLifeCycleStatusCode describes the LifeCycle stage of the root node. The OverallLifeCycleStatusCode summarizes the LifeCycleStatus and the SupplyQuotaArrangementLifeCycleStatus.

There may be a number of Inbound Aggregation Relationships including:

(1) From the business object SourceOfSupply may have a cardinality relationship of c:cn. The SourceofSupply references the relevant SourceOfSupply to define the assignment of the quota to the source of supply.

(2) From the business object SourceOfSupply/LogisticRelationship may have a cardinality relationship of c:cn. The SourceOfSupply/LogisticRelationship references the relevant LogisticRelationship to define the assignment of the quota to the logistical relationship.

(3) From the business object Supplier may have a cardinality relationship of c:cn. The supplier of the material to which a supply quota arrangement can be to be applied for incoming supply quota arrangements.

(4) From the business object Customer may have a cardinality relationship of c:cn. The customer of the material to which a supply quota arrangement can be to be applied for outgoing supply quota arrangements.

(5) From the business object Company may have a cardinality relationship of c:cn. The PartnerCompany can be your own company that can be the supplier or customer of the material to which a supply quota arrangement can be to be applied for incoming and outgoing supply quota arrangements.

(6) From the business object PermanentEstablishment may have a cardinality relationship of c:cn. The PartnerPermanentEstablishment can be your own permanent establishment that can be the supplier or customer of the material to which a supply quota arrangement can be to be applied for incoming and outgoing supply quota arrangements.

Some composition relationships to subordinate nodes can include an ItemReferenceCollection 171044 having a cardinality of 1:1. In some implementations, some attributes can and can be specified, such as BusinessPartnerUUID, PartnerOrganisationalCentreUUID, SourceOfSupplyUUID and SourceOfSupplyLogisticRelationshipUUID. If the PartnerOrganisationalCentreUUID can be specified and can be the same as the OrganisationalCentreUUID of the Root, the Item exists in the specialization InternalProductionSupplyQuotaArrangementItem. If the PartnerOrganisationalCentreUUID can be specified and can be not the same as the OrganisationalCentreUUID of the Root, the Item exists in the specialization InternalProcurementSupplyQuotaArrangementItem. If the BusinessPartnerUUID can be specified, the Item exists in the specialization ExternalProcurementSupplyQuotaArrangementItem. If the SourceOfSupply or SourceOfSupplyLogisticRelationship can be specified, the Item exists in the same specification as the SourceOfSupply or SourceOfSupplyLogisticRelationship.

Some table can include the allowed combinations of the fields BusinessPartnerUUID/PartnerOrganisationalCentreUUID, SourceOfSupplyUUID and SourceOfSupplyLogisticRelationshipUUID. In the supply quota arrangement item, a supply quota arrangement that applies to all products can only refer to sources of supply that apply to all products. In the supply quota arrangement item, a supply quota arrangement that can be specific to a product category can only refer to sources of supply that are specific to a product category or to all products. In the supply quota arrangement item, a product-specific supply quota arrangement can refer to sources of supply that are specific to a product or to a product category or to all products.

The AddProductFulfilledQuantity can be the action that adds the transferred quantities of the product to the FulfilledQuantity. This action can be not called from the UI. For example, the AddProductFulfilledQuantity can be the action that adds the transferred quantities of the product categories to the FulfilledQuantity. This action can be not called from the UI.

The Activate (S&AM action) activates an Item. In some implementations, preconditions may be that the Item may be consistent and has the LifeCycleStatus 'In Preparation'. Changes to the status may include that the action sets the LifeCycleStatus to 'Active'. In some implementations, the action can be called from UI The Block (S&AM action) blocks an Item. In some implementations, preconditions may be that the Item has the LifeCycleStatus 'Active'. Changes to the status may include that the action sets the LifeCycleStatus to 'Blocked'. In some implementations, the action can be called from UI.

The Unblock (S&AM action) puts an Item back to 'Active'. In some implementations, preconditions may be that the Item has the LifeCycleStatus 'Blocked'. Changes to the status may include that the action sets the LifeCycleStatus to 'Active'. In some implementations, the action can be called from UI.

The FlagAsObsolete (S&AM action) flags an Item as obsolete. In some implementations, preconditions may be that the Item has the LifeCycleStatus 'Active' or 'Blocked'. Changes to the status may include that the action sets the LifeCycleStatus to 'Obsolete'. In some implementations, the action can be called from UI.

The RevokeObsolescence (S&AM action) puts an Item back to 'Blocked'. In some implementations, preconditions may be that the Item has the LifeCycleStatus 'Obsolete'. Changes to the status may include that the action sets the LifeCycleStatus to 'Blocked'. In some implementations, the action can be called from UI.

The QueryBySourceOfSupply provides a list of all supply quota arrangement items for a particular Source of Supply. The supply quota arrangement items have an overall life cycle status code to indicate the status. The query can be not called from the UI. The query elements are defined by the data type SupplyQuotaArrangementItem-SourceOfSupplyQueryElements. These elements include: SourceOfSupplyUUID, OverallLifeCycleStatusCode, SupplyQuotaArrangementValidityDateTime, QueryByBusinessPartner, BusinessPartnerUUID, OverallLifeCycleStatusCode, SupplyQuotaArrangementProductUUID, and SupplyQuotaArrangementValidityDateTime.

The SourceOfSupplyUUID can be a universal identifier of the source of supply. The SourceOfSupplyUUID can be a GTD of type UUID. The OverallLifeCycleStatusCode can be a GDT of type SupplyQuotaArrangementItemLifeCycleStatusCode, and can be optional. The SupplyQuotaArrangementValidityDateTime can be a GDT of type GLOBAL_DateTime. The QueryByBusinessPartner provides a list of all supply quota arrangement items for a particular Business Partner. The supply quota arrangement items have an overall life cycle status code to indicate the status. The query can be not called from the UI. The query elements are defined by the data type SupplyQuotaArrangementItem-BusinessPartnerQueryElements. These elements include: BusinessPartnerUUID, OverallLifeCycleStatusCode, SupplyQuotaArrangementProductUUID, and SupplyQuotaArrangementValidityDateTime.

The BusinessPartnerUUID can be a universal identifier of the business partner. The BusinessPartnerUUID can be a GTD of type UUID. The OverallLifeCycleStatusCode can be a GDT of type SupplyQuotaArrangementItemLifeCycleStatusCode, and can be optional. The SupplyQuotaArrangementProductUUID can be a GDT of type UUID. The SupplyQuotaArrangementValidityDateTime can be a GDT of type_GLOBAL_DateTime.

The QueryByProductAndCompany provides a list of all supply quota arrangement items that are created under the supply quota arrangement for a particular product ID and a particular organisation centre ID. The supply quota arrangements have a particular direction and are valid for a particular period. The query elements are defined by the data type SupplyQuotaArrangementItemProductAndCompanyElements. These elements include: SupplyQuotaArrangementCreationUserAccountID, SupplyQuotaArrangementReferenceCollectionProductID, SupplyQuotaArrangementProductTypeCode, SupplyQuotaArrangementReferenceCollectionCompanyID, SupplyQuotaArrangementSupplyQuotaDirectionCode, (GDT: SupplyQuotaDirectionCode), SupplyQuotaArrangementValidityDateTime, BusinessPartnerInternalID, BusinessPartnerInternalID, and OverallLifeCycleStatusCode. The SupplyQuotaArrangementCreationUserAccountID can be a GDT of type UserAccountID, and can be optional. The SupplyQuotaArrangementReferenceCollectionProductID can be a GDT of type ProductID. The Supply quota arrangements that refer to the product category of the specified material or to all materials are also returned. The SupplyQuotaArrangementProductTypeCode can be a GDT of type ProductTypeCode, and can be optional. The SupplyQuotaArrangementReferenceCollectionCompanyID can be a GDT type of OrganisationalCentreID. The SupplyQuotaArrangementSupplyQuotaDirectionCode can be a GDT of type SupplyQuotaDirectionCode. The SupplyQuotaArrangementValidityDateTime can be a GDT of type _GLOBAL_DateTime. The BusinessPartnerInternalID can be a GDT of type BusinessPartnerInternalID, and can be optional. The system returns those supply quota arrangements with the Item that can be related to the BusinessPartnerInternalID. The OverallLifeCycleStatusCode can be a GDT of type SupplyQuotaArrangementItemLifeCycleStatusCode, and can be optional.

An ItemReferenceCollection contains the Identifiers that can be displayed for the references of the SupplyQuotaArrangementItem. The node ItemReferenceCollection contains the following elements, which are defined by the data type SupplyQuotaArrangementReferenceCollectionElements. These elements include:

BusinessPartnerInternalID, PartnerCompanyID, PartnerPermanentEstablishmentID, SourceOfSupplyPurchasingContractID, SourceOfSupplyPurchasingContractItemID, SourceOfSupplyProductID, SourceOfSupplyProductCategoryHierarchyProductCategoryIDKey, SourceOfSupplyProductsSpecificationDetailLevelCode, SourceOfSupplyTransportationLaneID, SourceOfSupplyLogisticRelationshipSenderLocationID, SourceOfSupplyLogisticRelationshipRecipientLocationID, SourceOfSupplyLogisticRelationshipSenderSupplyPlanningAreaID, SourceOfSupplyLogisticRelationshipReceiverSupplyPlanningAreaID, SourceOfSupplyLogisticRelationshipReleasedPlanningProductionModelID, SourceOfSupplyLogisticRelationshipReleasedPlanningProductionModelVersionID, and SourceOfSupplyLogisticRelationshipValidityPeriod.

The BusinessPartnerInternalID can be a unique identifier of the customer or the supplier for the portion of the supply quota arrangement for an outgoing or incoming supply quota arrangement. The BusinessPartnerInternalID can be a GDT of type BusinessPartnerInternalID, and can be optional. The PartnerCompanyID can be a unique identifier of the company participating in the supply quota arrangement. The PartnerCompanyID can be a GDT of type OrganisationalCentreID, and can be optional.

The PartnerPermanentEstablishmentID can be a unique identifier of the permanent establishment participating in the supply quota arrangement. The PartnerPermanentEstablishmentID can be a GDT of type OrganisationalCentreID, and can be optional. The SourceOfSupplyPurchasingContractID can be a unique identifier of the underlying contract for the source of supply. The SourceOfSupplyPurchasingContractID can be a GDT of type BusinessTransactionDocumentID, and can be optional. The SourceOfSupplyPurchasingContractItemID can be a unique identifier of an item in the underlying contract for the source of supply. The SourceOfSupplyPurchasingContractItemID can be a GDT of type BusinessTransactionDocumentID, and can be optional. The SourceOfSupplyProductID can be a unique identifier of the product that can be procured using the source of supply. The SourceOfSupplyProductID can be a GDT of type ProductID, and can be optional. The SourceOfSupplyProductCategoryHierarchyProductCategoryIDKey can be a unique identifier of the product category hierarchy and product category that can be procured using the source of supply. The SourceOfSupplyProductCategoryHierarchyProductCategoryIDKey can be a IDT of type ProductCategoryHierarchyProductCategoryIDKey, and can be optional.

The SourceOfSupplyProductsSpecificationDetailLevelCode can be a coded representation of the level of detail for specifying materials in the source of supply. The SourceOfSupplyProductsSpecificationDetailLevelCode can be a GDT of type ProductsSpecificationDetailLevelCode, and can be optional. The SourceOfSupplyTransportationLaneID can be a unique identifier of the underlying transportation lane for the source of supply. The SourceOfSupplyTransportationLaneID can be a GDT of type TransportationLaneID, and can be optional. The SourceOfSupplyLogisticRelationshipSenderLocationID can be a unique identifier of the geographical starting point of the logistical relationship. The SourceOfSupplyLogisticRelationshipSenderLocationID can be a GTD of type LocationID, and can be optional.

The SourceOfSupplyLogisticRelationshipRecipientLocationID can be a unique identifier of the geographical end point of the logistical relationship. The SourceOfSupplyLogisticRelationshipRecipientLocationID can be a GTD of type LocationID, and can be optional. The SourceOfSupplyLogisticRelationshipSenderSupplyPlanningAreaID can be a unique identifier of the requirements planning area where the procurement relationship starts. The SourceOfSupplyLogisticRelationshipSenderSupplyPlanningAreaID can be a GDT of type SupplyPlanningAreaID, and can be optional. The SourceOfSupplyLogisticRelationshipReceiverSupplyPlanningAreaID can be a unique identifier of the requirements planning area where the procurement relationship ends. The SourceOfSupplyLogisticRelationshipReceiverSupplyPlanningAreaID can be a GDT of type SupplyPlanningAreaID, and can be optional. The SourceOfSupplyLogisticRelationshipReleasedPlanningProductionModelID can be a unique identifier of the released planning production model upon which the logistical relationship can be based. The SourceOfSupplyLogisticRelationshipReleasedPlanningProductionModelID can be a GDT of type ProductionModelID, and can be optional. The SourceOfSupplyLogisticRelationshipReleasedPlanningProductionModelVersionID can be a unique identifier of the generated version of the released planning production model upon which the logistical relationship can be based. The SourceOfSupplyLogisticRelationshipReleasedPlanningProductionModelVersionID can be a GDT of type VersionID, and can be optional. The SourceOfSupplyLogisticRelationshipValidityPeriod can be the validity period of the logistical relationship. The SourceOfSupplyLogisticRelationshipValidityPeriod can be a GDT of type UPPEROPEN_LOCALNORMALIZED_DateTimePeriod. In some implementations, the SourceOfSupplyLogisticRelationshipValidityPeriod has a Validity qualifier, and can be optional.

The IDs can be specified according to the UUIDs of the SupplyQuotaArrangementItem. If SourceOfSupplyUUID and SourceOfSupplyLogisticRelationshipUUID are specified in the SupplyQuotaArrangementItem, the IDs of the semantic key of the SourceOfSupply and the LogisticRelationship can be specified. For permitted combinations of elements, see the business object SourceOfSupply.

Dependent Object Text Collection

FIG. 172 illustrates an example Text Collection business object model 172002. Specifically, this model depicts interactions among various hierarchical components of the Text Collection, as well as external components that interact with the Text Collection (shown here as 172000 and 172004). TextCollection is a collection of all textual descriptions which are related to a Business Object or a part of a Business Object. Each text can be specified in different languages and can include formatting information. The business object Text Collection is a generic object and is available to all process components of all DUs. In some implementations, the business object Text Collection can reside in the foundation layer. The Text Collection can be used in any Business Object. The usage of the Dependent Object Text Collection is not restricted. The cardinality between the Hosting Business Object Node and the Dependent Text Collection can be 1:c. A Text Collection contains the text itself with its formatting and controlling information, The version history, and The relation to the different text languages.

The Text Collection is represented by the root node Text Collection.

Node Structure of Dependent Object Text Collection

A TextCollection 172006 is a collection of all textual descriptions which are related to a Business Object or a part of a Business Object. Each text can be specified in different languages and can include formatting information. For example, the Correspondence or an Accounting Note for a Business Partner is stored as Text in the Text Collection of the particular node. The elements located directly at the node Text Collection are defined by the data type: Text Collection-Elements. In certain implementations, these elements include: UUID, HostObjectNodeReference, ConfigurationProfileCode, and TextExistsIndicator.

UUID is a universal identifier, which is unique, of a TextCollection. UUID may be of GDT typeUUID. HostObjectNodeReference is the name and reference of a Business Object to which the TextCollection is related to. The HostObjectNodeReference may be of GDT typeObjectNodeReference. ConfigurationProfileCode is Text Configuration Profile for the TextCollection. The ConfigurationProfileCode may be of GDT type TextCollectionConfigurationProfileCode. TextExistsIndicator can specify whether a text exists in the TextCollection. The TextExistsIndicator may be of GDT type Indicator, Qualifier TextExists.

The following composition relationships to subordinate nodes exist: Text 172008 has a cardinality relationship of 1:cn. TextByTextTypeCodeAndLanguageCode has a cardinality relationship of 1:cn. In some implementations, this association may retrieve all texts with the specified text type and language.

The filter elements are defined by the data type TextCollectionTextByTypeCodeAndLanguageCodeFilterElements. These elements are: TextTypeCode, LanguageCode, and InternalIndicator. TextTypeCode is optional, is of GDT type TextCollectionTypeCode. LanguageCode is optional, and is of GDT type LanguageCode. InternalIndicator is optional, is of GDT type Indicator, and has qualifier Internal.

The CreateDefaultTexts action creates a new text for each TextTypeCode that is marked as default in the current Configuration Profile. The default texts are created with the current logon language. If the particular Text with the corresponding TextTypeCode in the current logon language already exists, the creation will be skipped and a message is returned. This action can include changes to the object. For example, changes to the object can be a new node Text including the lower-level node TextContent is created for each "Default TextTypeCode."

A Text is a piece of unstructured readable information which also includes formatting information. It is written in a specified language and characterized by its text type. Beside the text content a Text contains additional control and monitoring information. The Correspondence or an Accounting Note for a Business Partner is stored as Text. The elements located directly at the node Text CollectionText are defined by the data type: Text CollectionTextElements. In certain implementations, these elements include: TextID, VersionID, SystemAdministrativeData, CreationDateTime, ReferenceIndicator, InternalIndicator, TypeCode, LanguageCode, Status, ClosureStatusCode, and ReferenceTextID.

TextID is an identifier, which can be unique, of a text. The TextID may be of GDT type TextCollectionTextID. VersionID is an identifier, which can be unique, of a text version. The VersionID may be of GDT type VersionID. SystemAdministrativeData is administrative data that is stored in a system. The SystemAdministrativeData may be of GDT type SystemAdministrativeData. CreationDateTime defines the time when the Text was created, and is optional. The CreationDateTime may be of GDT type GLOBAL_DateTime, and has qualifier Creation. In some implementations, this point of time may define the time when the text was created in its original system, whereas SystemAdministrativeData may define the time when the text was created or changed in the local system. In some embodiments, CreationDateTime is used for the ServiceRequest-scenario where a text is created in the customer another system. ReferenceIndicator can specify whether a text is a reference to another text or not. ReferenceIndicator may be of GDT type Indicator, and has qualifier Reference. InternalIndicator can specify if a text is an internal text or not. The InternalIndicator may be of GDT type Indicator, and has qualifier Internal. TypeCode defines the text type and thus the text's central settings. The TypeCode may be of GDT type TextCollectionTextTypeCode. LanguageCode defines the language in which the text is specified. LanguageCode may be of GDT type LanguageCode. Status is the current Status of Text Collection, and is optional. Status may be of IDT type TextCollectionTextStatus. ClosureStatusCode indicates if a text is closed or not. A closed text can not be changed or deleted any more, and is optional. ClosureStatusCode may be of GDT type ClosureStatusCode ReferenceTextID is an identifier, which can be unique, of a Text to that the reference points to if the text is a reference, and is optional. ReferenceTextID may be of GDT type TextCollectionTextID. TextContent 172010 has a relationship to Text with a cardinality relationship of 1:1

VersionListText has a cardinality relationship of 1:cn, and specifies the list of all preceding text versions. A version is a distinction of texts according to the order in which they were created. LanguageListText has a cardinality relationship of 1:n, and specifies the list of all related variants of the text in different languages.

The ResolveReference action resolves the reference to another text. The content of the referenced text is copied into the selected text. This action can include: Prerequisites: The selected text can be a reference to another text. The selected text can be the current version, and Changes to the object: The node TextContent of the referenced text is copied to the selected text. The ReferenceIndicator is set to False. The ReferenceTextID is cleared.

The Copy action copies a text with a new TextTypeCode or a new LanguageCode into the same Text Collection of the Business Object. This action can include: Prerequisites: The selected text can be the current version, Changes to the object: The node Text including the lower-level node TextContent is copied, and Parameters: The action elements are defined by data type TextCollectionTextCopyActionElements. These actions include: TextTypeCode, and LanguageCode.

TextTypeCode is the Text type of the new text. If no TextTypeCode is specified, the text is created with the same text type as the source, and is optional. TextTypeCode may be of GDT type TextCollectionTextTypeCode.

LanguageCode is the Language of the new text. If no LanguageCode is specified, the text is created with the same language as the source, and is optional. The LanguageCode may be of GDT type LanguageCode.

The SetAsCurrentVersion action makes the selected version the current version. The action can include: Prerequisites: The selected text can not be the current version, and Changes to the object: The current status of the text including the lower-level node TextContent is saved as the new text version beneath the VersionListText association. The data for the current text version is then overwritten with the data from the selected text version. In the process, the Text node including the lower-level node TextContent is overwritten with the corresponding data from the text version.

The Close (S&AM action) action sets the Status of the text to "closed." A closed text may not be changed or deleted anymore. This action can include: Prerequisites: The selected text can be the current version. The selected text can have the status "Not Closed," and Changes to the object: The status is set to "Closed."

The TextContent is a piece of unstructured readable information which also includes formatting information." The node was introduced because, under certain circumstances, these can be very large quantities of data and the determination of this data can lead to performance problems. The elements located directly at the node Text CollectionText are defined by the data type: Text CollectionTextContentElements. In certain implementations, these elements include: Text.

Text is the unstructured text data in a natural language. Text includes all formatting information, templates, snippets, and variables. The Text may be of GDT type Text.

Business Object TransportationLane

FIGS. 173-1 through 173-2 illustrate an example TransportationLane business object model 173010. Specifically, this model depicts interactions among various hierarchical components of the TransportationLane, as well as external components that interact with the TransportationLane (shown here as 173000 through 173008 and 173012 through 173024).

Business Object TransportationLane is a relationship between two locations or transportation zones that specifies which materials can be transported between the locations or transportation zones and/or which means of transport can be used.

The business object SupplyPlanningArea is an area in planning for which the availability of products on time is guaranteed.

The business object TransportationLane is master data and/or may be in the foundation layer.

A TransportationLane includes assignment of the permitted means of transport, assignment of the materials to be transported, exceptions for transporting materials using particular means of transport, and/or material-independent and material-dependent cost functions for transporting materials.

Services Interface Operation

B2B Messages

The business object TransportationLane may not send or receive any B2B messages, in some implementations.

Node Structure of Business Object TransportationLane

The root node TransportationLane 173026 includes, UUID, ID, ShipFromLocation UUID, ShipToLocationU- UID, ShipFromTransportationZoneUUID, ShipToTransportationZoneUUID, AvailableToPromiseRelevanceIndicator, SystemAdministrativeData, SystemAdministrativeData, the Key/Alternative key, and/or Status. The UUID is a GDT of type UUID. The UUID is a Universal identifier of the TransportationLane. The ID is the GDT of the type TransportationLaneID. The ID is a unique identifier of the Transportation lane. The ShipFromLocationUUID is a GDT of type UUID. The ShipFromLocationUUID is the universal identifier of the location at which the transportation starts and may be optional. The ShipToLocationUUID is a GDT of type UUID. The ShipToLocationUUID is a universal identifier of the location at which the transportation arrives and may be optional. The ShipFromTransportationZoneUUID is a GDT of type UUID. The ShipFromTransportationZoneUUID is the universal identifier of the transportation zone where the transportation starts and may be optional. The ShipToTransportationZoneUUID is a universal identifier of the transportation zone where the transportation arrives. The ShipToTransportationZoneUUID may be a GDT of type UUID and/or may be an optional element. The AvailableToPromiseRelevanceIndicator specifies whether the TransportationLane is relevant for ATP. The AvailableToPromiseRelevanceIndicator may be a GDT of type Indicator. In some implementations, the AvailableToPromiseRelevanceIndicator includes a RelevanceIndicator qualifier. SystemAdministrativeData is the administrative data stored in the system. This data includes system users and change times. The SystemAdministrativeData may be a GDT of type SystemAdministrativeData. The Key/Alternative key may be an alternative key of the TransportationLane. Elements of the Alternative key include ShipFromLocationUUID, ShipToLocationUUID, ShipFromTransportationZoneUUID and/or ShipToTransportationZoneUUID.

The current status of the TransportationLane may be defined by the data type TransportationLaneStatus. The Transportation Lane may include status variables, such as LifeCycleStatusCode, which describes stages in the life of a TransportationLane.

A TransportationLane includes nodes, such as ReferenceCollection 173038, ValidTransportMeans 173028, ValidMaterials 173036, ShipFromLocation, ShipToLocation, ShipFromTransportationZone, ShipToTransportationZone, CreationIdentity, and/or LastChangedIdentity. The ReferenceCollection 173046 has a cardinality of 1:1. The ValidTransportMeans has a cardinality of 1:n. The ValidMaterials has a cardinality of 1:n. The ShipFromLocation has a cardinality of c:cn. The ShipToLocation has a cardinality of c:cn. The ShipFromTransportationZone has a cardinality of c:cn. The ShipToTransportationZone has a cardinality of c:cn.

The CreationIdentity has a cardinality of 1:cn. The LastChangedIdentity has a cardinality of c:cn.

An Activate action may activate a Transportation Lane. The preconditions for the Activate action include that the TransportationLane is consistent and/or has a LifeCycleStatus of 'In Preparation'. The Activate action may set the LifecycleStatus to 'Active'. The Activate action may be called from the TransportationLane Header.

lock (S&AM action

An Unblock action may return a Transportation Lane to 'Active'. The preconditions for the Unblock action may include that the TransportationLane has the LifeCycleStatus of 'Blocked'. The Unblock action may set the LifeCycleStatus to 'Active'. The Active action may be called from the TransportationLane Header.

An FlagAsObsolete action flags a Transportation Lane as obsolete. The preconditions for the FlagAsObsolete action may include that the Transportation Lane has a LifeCycleStatus of "Active" or 'Blocked'. The FlagAsObsolete action may be called from the TransportationLane Header.

A Revoke obsolescence action returns a Transportation Lane to 'Blocked'. The preconditions for the Revoke obsolescence action may include that the Transportation Lane has a LifeCycleStatus of 'Obsolete'. The Revoke obsolescence action may be called from TransportationLane Header.

An ActivateAll action activates a Transportation Lane. In some implementations, the ActivateAll action activates at least a portion of the subordinated nodes of the Transportation Lane, Node ValidMaterial, and/or Node ValidTransportMeans. Preconditions of the ActivateAll action may include that the Transportation Lane and associated subordinated nodes ValidMaterial and ValidTransportMeans are consistent and/or have a LifeCycleStatus of 'In Preparation'. The LifecycleStatus of the Transportation Lane and at least a portion of its associated subordinated nodes, Node ValidMaterial, and/or Node ValidTransportMeans may be set to 'Active'. The ActivateAll action may be called from TransportationLane Header.

Queries may be performed, such as QueryByElements, which provides a list of at least a portion of instances of TransportationLane that have a particular ID and/or that are defined within two particular locations. The query may be called from the UI. The query may be defined by the data type TransportationLaneElementsQueryElements. The elements may include System Administrative Data, Material ID, ProductCategoryHeirarchyProductCategoryIDKey, MeansOfTransportTypeCodeID, ShipFromLocationID, ShipToLocationID, ShipFromTransportationZoneID, ShipToTransportationZoneID and/or LifeCycleStatusCode.

A ReferenceCollection contains the Identifiers that can be displayed for the references of the TransportationLane.

The node ReferenceCollection includes the following elements, which are defined by the data type TransportationLaneReferenceCollectionElements. The ShipFromLocationID, which is a universal identifier of the location at which the transportation starts, is a GDT of type LocationID, and is optional. The ShipToLocationID is a universal identifier of the location at which the transportation arrives, is a GDT of type LocationID, and is optional. The ShipFromTransportationZoneID is a universal identifier of the transportation zone where the transportation starts, is a GDT of type TransportationZoneID, and is optional. The ShipToTransportationZoneID is an identifier of the transportation zone where the transportation arrives, is a GDT of type TransportationZoneID, and is optional.

A ValidTransportMeans is the valid means of transport that can be used in a Transportation Lane to transport materials. The ValidTransportMeans occurs in the complete and disjoint specializations of the ArbitraryTransportMeans 173032 and the ExplicitTransportMeans 173034. The ArbitraryTransportMeans is the generic means of transport that represents all possible means of transport. The ExplicitTransportMeans is the explicit means of transport that may be used to transport materials for the TransportationLane.

The node ValidTransportMeans structure includes the following elements, that are defined by the data type ValidTransportMeansElements. The UUID, the TransportMeansTypeCode, the SpecificationDetailLevelTypeCode, the ValidityPeriod, the GeneralUsageAllowedIndicator, the PriorityValue, the TransportDistanceDurationDeterminationMethodCode, the ShippingDuration, the ShippingDurationFixedIndicator, the ShippingDistanceMeasure, ShippingDistanceMeasureFixedIndicator, SpecialRuleRelevanceIndicator, and the Status. The UUID is a GDT of type UUID, is a universal identifier of the ValidTransportMeans. The TransportMeansTypeCode is a GDT of type TransportMeansTypeCode, and determines the detailed type of a means of transport and is part of business configuration. The SpecificationDetailLevelTypeCode is a GDT of type SpecificationDetailLevelTypeCode and the coded representation of the type of specification level of means of transport. The ValidityPeriod is a GDT of type UPPEROPEN_LOCAL_NORMALISED_DateTimePeriod, and is the time period during which the assignment of the means of transport to the transportation lane is valid. In some implementations it has a Validity qualifier. GeneralUsageAllowedIndicator is a GDT of type Indicator and specifies whether a means of transport can be used for all materials. In some implementations it has an Allowed qualifier. Priority Value is a GDT of type PriorityValue, and is the priority according to which the means of transport assigned to the TransportationLane is taken into account. TransportDistanceDurationDeterminationMethodCode is a GDT of type TransportDistanceDurationDeterminationMethodCode, and is coded representation of the precision of the transport distance and the duration of the transport. Shipping Duration is a GDT of type TIME_Duration Qualifier, is restricted to an exact time in hours, minutes and seconds and is optional. The ShippingDuration specifies duration of the transport. In some implementations it has a Shipping qualifier. The ShippingDurationFixedIndicator is a GDT of type Indicator that specifies whether the duration of the transportation is fixed. In some implementations it has a Fixed qualifier. ShippingDistanceMeasure is a GDT of type Measure of transportation distance and is optional. In some implementations it has a Distance qualifier. The ShippingDistanceMeasureFixedIndicator is a GDT of type Indicator and specifies whether the transportation distance if fixed. In some implementations it has a Fixed qualifier. The SpecialRuleRelevanceIndicator is a of type GDT indicator and specifies whether a special Rule 173030 exists for a Means of Transport. In some implementations it has a RelevanceIndicator qualifier.

The Status is the current status of the TransportMeans and/or may be defined by the data type TransportationLaneValidTransportMeansLifeCycleStatusCode. The Status may include status variables, such as LifeCycleStatusCode, which describes stages in the life of a Means of Transport; TransportationLaneLifeCycleStatusCode, which describes the LifeCycle stage of the root node (e.g., ValidTransportMeans); and/or OverallLifeCycleStatusCode, which summarizes the LifeCycleStatus and the TransportationLaneLifeCycleStatus.

The ValidTransportMeans includes nodes, such as the ValidTransportMeansSpecialRule and/or TransportationLane. The ValidTransportMeansSpecialRule and/or the TransportationLane may have cardinalities of 1:cn For integrity purposes, an ExplicitMeansOfTransport overrides the settings in the specialization ArbitraryTransportMeans.

Actions may include CalculateShippingDistanceAndDuration, Activate, Block, Unblock, FlagAsObsolete, and/or RevokeObsolescence. The CalculateShippingDistanceAndDuration action calculates the transportation distance using the specifications for the means of transport and/or the line of flight distance between the starting and target location of the transportation lane. ShippingDistanceMeasure and ShippingDuration may be calculated. ShippingDistanceAndDurationPrecisionCode may be reset to "line of flight distance." The Enterprise Service Infrastructure Action may be called from the UI.

The Activate action activates a ValidTransportMeans. The preconditions of the Activate action may include that the ValidTransportMeans is consistent and/or has a LifeCycleStatus of 'In Preparation'. The Activate action may set the LifeCycleStatus to 'Active'. The Active action may be called from ValidTransportMeans.

The Block action may block a ValidTransportMeans. The preconditions of the Block action may include that the ValidTransportMeans has an LifeCycleStatus of 'Active'. The Block action may set the LifeCycle Status to 'Blocked'. The Blocked action may be called from ValidTransportMeans.

The Unblock action may return a ValidTransportMeans to 'Active'. The preconditions of the Unblock action may include that the ValidTransportMeans has a LifeCycleStatus of 'Blocked'. The Unblock action sets the LifeCycleStatus to 'Active'. The Unblock action may be called from ValidTransportMeans.

The FlagAsObsolete action may flag a ValidTransportMeans as obsolete. The preconditions of the FlagAsObsolete may include the ValidTransportMeans has a LifeCycleStatus of 'Active' or 'Blocked'. The FlagAsObsolete action may set the LifeCycleStatus to 'Obsolete'. The FlagAsObsolete action may be called from ValidTransportMeans.

The RevokeObsolescence action returns a ValidMaterial to 'Blocked'. The preconditions of the RevokeObsolescence include that the ValidTransportMeans has the LifeCycleStatus of 'Obsolete'. The RevokeObsolescence action sets the LifeCycleStatus to 'Blocked'. The Revoke Obsolescence action may be called from ValidTransportMeans.

Queries performed may include a QueryByValidMaterials, which provides a list of means of transport that are valid for the specified point in time and/or that are assigned to transportation lanes that reference a particular TransportationLaneValidMaterials. The QueryByValidMaterials query may not be called from the UI, in some implementations. The query elements are defined by the data type, TransportationLaneValidTransportMeansValidMaterialsQueryElements. Query elements include TransportationLaneValidMaterialsUUID, TransportMeansTypeCode, GeneralUsageAllowedIndicator, ValidityDateTime, and/or OverallLifeCycleStatus. In some implementations, elements may include TransportationLaneValidMaterialsUUID, TransportMeansTypeCode, and ValidityDateTime, and GeneralUsageAllowedIndicator and/or OverallLifeCycleStatus may be optional elements.

The TransportationLaneValidMaterialsUUID may be a GDT of type UUID. The TransportMeansTypeCode may be a GDT of type TransportMeansTypeCode. The GeneralUsageAllowedIndicator may be a GDT type of General Usage Allowed Indicator. If the GeneralUsageAllowedIndicator is specified with a value of "true", then the system may return at least a portion of means of transport that may be used to transport materials. If the GeneralUsageAllowedIndicator is specified with a value of "false", the system may return at least a portion of means of transport with which not all materials may be transported. The ValidityDateTime may be a GDT type of _GLOBAL_DateTime. The system may return the Means of Transport for which the ValidityDateTime lies within the ValidityPeriod. The OverallLifeCycleStatus may be a GDT type of TransportationLaneValidTransportMeansLifeCycleStatusCode.

A ValidTransportMeansSpecialRule may be a special rule for using a means of transport. The ValidTransportMeansSpecialRule may be optional and/or material-dependent. The ValidTransportMeansSpecialRule may specify whether a material or a product category may be transported with a means of transport and/or a material or product group is excluded from transportation with a means of transport. Special characteristics (e.g., a special cost function) may apply to a combination of a material or product group and a means of transport.

The ValidTransportMeansSpecialRule node includes elements defined by the data type ValidTransportMeansSpecialRuleElements. The elements may include UUID, TransportationLaneValidMaterialsUUID, ValidityPeriod, ExcludedIndicator, ExcludedIndicator, ValidTransportMeansPriorityValue, and/or ValidTransportMeansPriorityValue. The UUID may be an alternative key. The UUID is the Universal identifier of the ValidTransportMeansSpecialRule and/or may be a GDT type of UUID. The TransportationLaneValidMaterials UUID is a Universal identifier of the material or product category for which the special rule is defined and/or may be a GDT type of UUID. The ValidityPeriod is the time period during which the material-specific special rule for using a means of transport is valid and/or may be a GDT type of UPPEROPEN_LOCALNORMALISED_DateTimePeriod. The ValidityPeriod may have a Validity Qualifier. The ExcludedIndicator shows whether a material or a product category may not be transported with a means of transport and/or may be a GDT type of Indicator. The ExcludedIndicator may have an Excluded Qualifier. The ValidTransportMeansPriorityValue is a priority according to which the means of transport that is part of the special rule is taken into account and/or may be a GDT type of PriorityValue.

The Inbound Aggregation Relationships includes nodes, such as a ValidTransportMeans and/or a ValidMaterials. The ValidTransportMeans has a cardinality of 1:cn and/or the ValidMaterials has a cardinality of 1:cn. The ValidTransportMeans may have a specialization of ExplicitTransportMeans. The ValidTransportMeans may include means of transport for transporting the materials. The ValidMaterials may be material or product category that is excluded from transportation with a means of transport, that is allowed to be transported with a means of transport, and/or that has been given special characteristics.

To maintain integrity, the time period during which the use of a means of transport is restricted may lie within the time period during which the material assignment and the assignment of the means of transport are valid. In addition, a ValidTransportMeansSpecialRule may exist if ValidTransportMeans occurs in the specialization ExplicitTransportMeans and ValidMaterials occurs in the specialization ProductCategory or Material.

Actions may include Block and Unblock actions. The Block action blocks a ValidTransportMeansSpecialRule. The Block action may be called from the UI, from ValidTransportMeans, and/or from ValidMaterials. To call this action, the TransportationLane (e.g., root node) may be required to be active, in some implementations. The Unblock action unblocks a ValidTransportMeansSpecialRule. The Unblock action may be called from the UI, from ValidTransportMeans, or from ValidMaterials. To call the Unblock action, the TransportationLane (e.g., root node) may be required to be active, in some implementations.

Queries may include a QueryByValidTransportMeans, which provides a list of at least a portion of or all of the special rules that belong to a particular TransportationLaneValidTransportMeans and/or that are valid for the point in time specified. The query may not be called from the UI. The query elements may be defined by a data type TransportationLaneValidTransportMeansSpecialRuleValidTransportMeansQueryElements.

The elements may include TransportationLaneValidMaterialsUUID, TransportationLaneValidMaterialsUUID and/or ValidityDateTime. In some implementations, the elements may include TransportationLaneValidMaterialsUUID and TransportationLaneValidMaterialsUUID and ValidityDateTime may be optional. The TransportationLaneValidTransportMeansUUID may be a GDT type of UUID. The TransportationLaneValidMaterialsUUID may be a GDT type of UUID. The ValidityDateTime may be a GDT type of GLOBAL_DateTime. The special rules for which the ValidityDateTime lies within the ValidityPeriod may be returned.

ValidMaterials

ValidMaterials assigns one or more materials to a TransportationLane. A material may be defined directly, several materials may be defined using a product category, and/or all materials may be defined without specifying a restriction. Time restrictions may be applied to the use of the material.

A Material occurs in the following complete and disjoint specializations: AllMaterials 173040, ProductCategory 173044, and/or Material 173042. The AllMaterials defines a generic material that may represent all or a portion of materials in the system at runtime that may be transported using the TransportationLane. The ProductCategory defines a product category that may represent the assigned materials in the system at runtime that may be transported using the TransportationLane. The Material defines an explicit material that may be transported using the TransportationLane.

The ValidMaterials node includes the following elements, which are defined by the data type ValidMaterialsElements. The ValidMaterials node includes elements, such as the UUID, the MaterialUUID, the ProductCategoryUUID, the ProductsSpecificDetailLevelTypeCode, the ProductsSpecificationDetailLevelTypeCode, the ShipFromSupplyPlanningAreaUUID, the ShipToSupplyPlanningAreaUUID, the ValidityPeriod, the GoodsReceiptDuration, the GoodsReceiptsDurationRelevanceIndicator, the GoodsIssueDuration, the GoodsIssueDurationRelevanceIndicator, the MinimumLotsizeQuantity, the MinimumLotsizeQuantityTypeCode, the MaximumLotsizeQuantityTypeCode, the MaximumLotsizeQuantity, and/or the Status. In some implementations, elements may include UUID, the ProductsSpecificDetailLevelTypeCode, the ValidityPeriod, the GoodsIssueDurationRelevanceIndicator, the MinimumLotsizeQuantity, the MaximumLotsizeQuantity, the MinimumLotsizeQuantityTypeCode, the MaximumLotsizeQuantityTypeCode and the Status and the MaterialUUID, the ProductCategoryUUID, the ProductsSpecificationDetailLevelTypeCode, the ShipFromSupplyPlanningAreaUUID, the ShipToSupplyPlanningAreaUUID, the GoodsReceiptsDurationRelevanceIndicator, the GoodsIssueDuration, and/or the GoodsReceiptDuration may be optional elements.

The UUID, the MaterialUUID, the ProductCategoryUUID, The ShipFromSupplyPlanningAreaUUID, the ShipToSupplyPlanningAreaUUID, may be GDTs of type UUID.

The UUID may be an alternative key. The UUID is a Universal identifier of the ValidMaterials. The MaterialUUID is a Universal identifier of the material that is assigned to the transportation lane. The ProductCategoryUUID is a Universal identifier of the product category that is assigned to the transportation lane. The ProductsSpecificationDetailLevelTypeCode is a GDT type of ProductsSpecificationDetailLevelTypeCode. The ProductsSpecificationDetailLevelTypeCode is a coded representation of the type of the specification level of the product. The ShipFromSupplyPlanningAreaUUID is a universal identifier of the requirements planning area to which the location at which the transport starts is assigned. The ShipToSupplyPlanningAreaUUID is a universal identifier of the requirements planning area to which the location at which the transport arrives is assigned. The ValidityPeriod is a GDT type of UPPEROPEN_LOCAL-NORMALISED_DateTimePeriod and/or may include a validity qualifier. The ValidityPeriod is a time period during which the assignment of the material, the product category, and/or materials to the transportation lane is valid. The GoodsReceiptDuration is a GDT type of TIME_Duration and/or may include a Receipt qualifier. The GoodsReceiptDuration is the Duration of the goods receipt process. The GoodsReceiptsDurationRelevanceIndicator is a GDT type of indicator and/or may include a RelevanceIndicator qualifier. The GoodsReceiptsDurationRelevanceIndicator specifies whether the good receipt time overrides the good receipt time from the material master. The GoodsIssueDuration may be a GDT of type Duration or TIME_Duration. The GoodsIssueDuration may have a qualifier of Issue. The GoodsIssueDurationRelevanceIndicator is a GDT of type Indicator and/or may include a RelevanceIndicator qualifier. The GoodsIssueDurationRelevanceIndicator may specify whether the good issue time overrides the good issue time from the material master. The MinimumLotsizeQuantity may be a GDT type of Quantity and/or may include a qualifier of Lotsize. The MinimumLotsizeQuantity may be the smallest permitted lot size for the transportation. The MinimumLotsizeQuantityTypeCode is a GDT type of QuantityTypeCode. The MaximumLotsizequantity is a GDT type of Quantity and/or may include a Lotsize qualifier. MaximumLotsizequantity is the greatest permitted lot size for the transportation. The MaximumLotsizeQuantityTypeCode is a GDT type of GDT QuantityTypeCode.

The Status is the current status of the ValidMaterials. The Status may be defined by the data type TransportationLaneValidMaterialsStatus. The Status may include variables such as LifeCycleStatusCode, TransportationLaneLifeCycleStatusCode, and/or OverallLifeCycleStatusCode. The LifeCycleStatusCode describes stages in the life of a ValidMaterial. The TransportationLaneLifeCycleStatusCode describes the LifeCycle stage of the root node. The OverallLifeCycleStatusCode summarizes the LifeCycleStatus and the TransportationLaneLifeCycleStatus.

Composition Relationships

A ValidMaterials includes nodes, such as a ValidMaterialsReferenceCollection that has a cardinality of 1:1. Inbound Aggregation Relationships include from the TransportationLane node (e.g., the transportation lane), which has a cardinality of 1:cn.

Inbound Association Relationships may exist, for example, from business object Material, from the business object ProductCategory, from the business object SupplyPlanningArea, and/or from the business object SupplyPlanningArea. Material may be the material for the material-specific TransportationLane and have a cardinality of c:cn. ProductCategory Material may be for the material-specific TransportationLane and/or have a cardinality of c:cn. The ShipFromSupplyPlanningArea may be a requirements planning area to which the location at which the transportation starts is assigned from the business object SupplyPlanningArea and/or may have a cardinality of c:cn. The ShipToSupplyPlanningArea may be a requirements planning area to which the location at which the transportation arrives is assigned and/or may have a cardinality of c:cn.

Associations for Navigation may exist to the business object SourceOfSupply/node LogisticRelationship, for example. The SourceOfSupplyLogisticRelationship may have a cardinality of c:cn. The SourceOfSupplyLogisticRelationship may reference the relevant LogisticRelationship to define the assignment of the ValidMaterials to the logistical relationship.

To maintain integrity, a Material may override the settings of the ProductCategory and/or the settings in AllMaterials. A ProductCategory may override the settings in AllMaterials, in some implementations.

If ShipFromLocationUUID is specified in the root node, the ShipFromSupplyPlanningAreaUUID may be specified. If ShipToLocationUUID is specified in the root node, the ShipToSupplyPlanningAreaUUID may be specified.

The Actions include Activate, Block, Unblock, FlagAsObsolete, and/or Revoke Obsolescence. The Activate action activates a ValidMaterial. The preconditions of the Activate action may include that the ValidMaterial is consistent and/or that the Activate action has a LifeCycleStatus of ‘In Preparation’. The Activate Action may set the LifeCycleStatus to ‘Active’. The Activate Action may be called in from ValidMaterial. The The Block action blocks a ValidMaterial. Block preconditions may include that ValidMaterial has a LifeCycleStatus of ‘Active’. The Block action sets the LifeCycleStatus to ‘Blocked’, in some implementations. The Block action may be called from ValidMaterial.

The Unblock action returns a ValidMaterial to ‘Active’. An Unblock action precondition may include that the ValidMaterial has a LifeCycleStatus of ‘Blocked’. The Unblock action sets the LifeCycleStatus to ‘Active’, in some implementations. The Unblock action may be called from called from ValidMaterial.

The FlagAsObsolete action flags a ValidMaterial as obsolete. A precondition of the FlagAsObsolete action may include that the ValidMaterial has a LifeCycleStatus of ‘Active’ or ‘Blocked’. The FlagAsObsolete action sets the LifeCycleStatus to ‘Obsolete’. The FlagAsObsolete action may be called from ValidMaterial.

The RevokeObsolescence action returns a ValidMaterial to ‘Blocked’. A precondition of the RevokeObsolescence action includes that the ValidMaterial has a LifeCycleStatus of ‘Obsolete’. The RevokeObsolescence action sets the LifeCycleStatus to ‘Blocked’. The RevokeObsolescence action may be called from ValidMaterial.

A ValidMaterialsReferenceCollection, which contains the identifiers that can be displayed for the references of the ValidMaterials. The ValidMaterialsReferenceCollection may be a Transformation node. The ValidMaterialsReferenceCollection includes elements defined by the data type ValidMaterialsReferenceCollectionElements. Elements of the ValidMaterialsReferenceCollectionElements may include the ShipFromSupplyPlanningAreaID, the ShipToSupplyPlanningAreaID, the MaterialID, and/or the ProductCategoryHierarchyProductCategoryIDKey. The ShipFromSupplyPlanningAreaID may be a GDT type of SupplyPlanningAreaID and may be a Universal identifier of the requirements planning area to which the location at which the transport starts is assigned. The ShipToSupplyPlanningAreaID may be a GDT type of SupplyPlanningAreaID and may be a Universal identifier of the requirements planning area to which the location at which the transport arrives is assigned. The MaterialID may be a GDT type of ProductID and may be a unique identifier of the material that is assigned to the transportation lane. The ProductCategoryHierarchyProductCategoryIDKey may include a ProductCategoryHierarchyID and/or a ProductCategoryInternalID. The ProductCategoryHierarchyProductCategoryIDKey may be an IDT of ProductCategoryHierarchyProductCategoryIDKey Business Object WorkAgreement FIG. 174 illustrates an example WorkAgreement business object model 174000. Specifically, this model depicts interactions among various hierarchical components of the WorkAgreement, as well as external components that interact with the WorkAgreement (shown here as 174002 through 174004 and 174018 through 174020). Business Object WorkAgreement is a contract between employer and employee according to which the employee is obliged to provide his or her labor while the employer is obliged to provide the agreed compensation. The activities and responsibilities of the employee may be specified in the work agreement. This agreement establishes an employment. The agreement may include the identifying information, necessary classification information and the obligatory associations to Employment. The WorkAgreement includes classification data, organizational assignment, capacity utilisation level and additional clauses. Further particulars, such as working time and salary details specified in other objects, may be based on the agreement.

The business object WorkAgreement is part of the process component Human Capital Master Data Management in the foundation layer. The business object WorkAgreement may be represented by a root node 174006.

The elements of the WorkAgreement include data types, such as WorkAgreementElements. WorkAgreementElements include UUID and/or MigratedDataAdaptationTypeCode, In some implementations, a UUID may be an element of WorkAgreementElements and the MigratedDataAdaptationTypeCode may be an optional element. The UUID is a unique identifier of the work agreement. The UUID may be a GDT of type UUID. The MigratedDataAdaptationTypeCode is a coded representation of the type of data adaptation performed during migration of an Employment. The MigratedDataAdaptationTypeCode may be a GDT of type MigratedDataAdaptationTypeCode. In some implementations, the code value may be set on initial creation of the Employment in the target system and later changes may be inhibited (e.g., the file may be read-only).

Elements may also include ValidityPeriod, EmploymentUUID, TypeCode, and AdministrativeCategoryCode. A ValidityPeriod is the validity period for a work agreement. The ValidityPeriod may be a GDT of type CLOSED_DatePeriod and/or include a Validity Qualifier. An EmploymentUUID is a unique identifier of the employment to which the work agreement refers. The EmploymentUUID may be a GDT of type UUID. A TypeCode specifies the type of work agreement between employer and employee. The TypeCode may be a GDT of type WorkAgreementTypeCode. An AdministrativeCategoryCode categorizes the work agreement according to some administrative criteria. The AdministrativeCategoryCode may be a GDT of type WorkAgreementAdministrativeCategoryCode.

The composition relationships to subnodes includes OrganisationalAssignment 174008, with a cardinality of 1:n. The OrganisationalAssignment may be filtered. The filter elements may be defined by the type GDT WorkAgreementOrganisationalAssignmentFilterElements. The filter elements may include ValidityPeriod and/or RelativeperiodCode. The ValidityPeriod may be a GDT of type DatePeriod and/or include a restriction of CLOSED. The RelativeperiodCode may be a GDT of type RelativePeriodCode and/or include a restriction of CURRENTDAYFROMTODAYON.

The CapacityUtilisationLevel 174012 may have a cardinality of 1:n. AdditionalClauses 174016 may have a cardinality of 1:n and/or be filtered. The filter elements may be defined by the type GDT WorkAgreementAdditionalClausesFilterElements. The filter elements may include ValidityPeriod and/or RelativeperiodCode. The Validity Period may be a GDT of type DatePeriod and/or include a restriction of CLOSED. The RelativeperiodCode may be a GDT of RelativePeriodCode and/or include a restriction CURRENTDAYFROMTODAYON.

RegulatoryCompliancel74014 may have a cardinality of 1:cn and/or be filtered. The filter elements may be defined by the type GDT WorkAgreementRegulatoryComplianceFilterElements. The WorkAgreementRegulatoryComplianceFilterElements elements include ValidityPeriod and/or RelativeperiodCode. The ValidityPeriod may be a GDT of type DatePeriod with a restriction of CLOSED. The RelativeperiodCode may be a GDT of type RelativePeriodCode with a restriction of CURRENTDAYFROMTODAYON.

Elements may include Inbound Aggregation Relationships, such as an Employment (e.g., constituted by a Work Agreement), with a cardinality of 1:n. The Employment may provide access control to a Work Agreement.

(Specialization) Associations for Navigation:

Business object Position (e.g. the main Position assigned to an Employee by this Work Agreement)/Root node may include an association for navigation. CurrentMainPosition may have a cardinality of cn:c.

Enterprise Service Infrastructure may include a variety of actions such as termination. In business context, this action terminates the obligations and rights of employee and employer based on the WorkAgreement. It terminates a WorkAgreement effective at the date LastWorkingDate given in the parameter interface. Preconditions may include that the work agreement is valid at the date LastWorkingDate given in the parameter interface. Changes may be made to the object. For example, the end date of the ValidityPeriod of the root and all nodes is delimited by setting it to the date LastWorkingDate given in the parameter interface. As another example, the PositionEmployeeAssignment at BO Position is also delimited (service provided by BO Position). Parameters of the terminate action may include action elements defined by a data type, such as a WorkAgreementTerminateActionElements. Elements of WorkAgreementTerminateActionElements include LastWorkingDate, which may be a GDT of type Date. This action may be trigged by the personal event Termination. In some implementations, a work agreement may not be terminated through a UI.

Another action includes CheckLastWorkingDate. This action checks if a certain date is valid as the last working date. The action also may check if the date LastWorkingDate given in the parameter interface against the NotificationDate given in the parameter interface and the notice period of the work agreement.

Preconditions for the action may include whether the work agreement is valid at the date NotificationDate given in the parameter interface. The action may not make changes to the object. Parameters of the action element may be defined by a date type, such as a WorkAgreementCheckLastWorkingDateActionElements. Elements of WorkAgreementCheckLastWorkingDateActionElements include NotificationDate (e.g., a GDT of type Date) and LastWorkingDate (e.g. a GDT of type Date. The action may be trigged by the personal event Termination.

Queries may be performed. QueryByElements may provides a list of WorkAgreements which satisfy the selection criteria, specified by the query Elements, combined by logical "AND". The query may be used by UI as entrance point to the personnel file. The data type WorkAgreementElementsQueryElements defines the query elements. Query elements can include EmployeeID, EmployeeFamilyName, Employee-GivenName, CompanyID, PositionID, JobID, ReportingLineUnitID, OrganisationalCentreID, PermanentEstablishmentID, ManagerID, TypeCode, KeyDate, and/or HiringDate. The EmployeeID may include an ID of the employee that holds the work agreement matches to the query element EmployeeID. The EmployeeID may be a GDT of type EmployeeID. The EmployeeFamilyName includes the family name of the employee that holds the work agreement matches to the query element EmployeeFamilyName. The EmployeeFamilyName may be a GDT of type Name or LANGUAGEINDEPENDENT_MEDIUM_Name. The EmployeeGivenName includes the given name of the employee that holds the work agreement matches to the query element EmployeeGivenName. The EmployeeGivenName may be a GDT of type Name or LANGUAGEINDEPENDENT_MEDIUM_Name. The CompanyID may include the ID of the company (employer) of the work agreement matches the query element CompanyID. The CompanyID may be a GDT of type OrganisationalCentreID. The PositionID may include the ID of the position assigned to the employee by the work agreement matches to the query element PositionID. The PositionID may be a GDT of type PositionID. The JobID may include the ID of the Job assigned to the employee by the work agreement matches to the query element JobID. The JobID may be a GDT of type JobID. The ReportingLineUnitID may include the ID of the reporting line unit assigned to the employee by the work agreement matches to the query element ReportingLineUnitID. The ReportingLineUnitID may be a GDT of type OrganisationalCentreID. The OrganisationalCentreID may include the ID of the OrganizationalCentre assigned to the employee by the work agreement matches to the query element OrganisationalCentreID. The OrganisationalCentreID may be a GDT of type OrganisationalCentreID. The PermanentEstablishmentID may include the ID of the permanent establishment assigned to the employee by the work agreement matches to the query element PermanentEstablishmentID. The PermanentEstablishmentID may be a GDT of type OrganisationalCentreID. The ManagerID may include the ID of the manager of the employee that holds the work agreement matches to the query element ManagerID. The ManagerID may be a GDT of type EmployeeID. The TypeCode may be a GDT of type WorkAgreementTypeCode. The KeyDate may include all or at least a portion of query elements that are time-depended are valid in the date specified in the query element KeyDate. The KeyDate may be a GDT of type Date. The HiringDate may be include the beginning date of the work agreement matches to the query element HiringDate. The HiringDate may be a GDT of type Date.

The OrganisationalAssignment

An OrganisationalAssignment may be a time-dependent assignment of a work agreement to the organizational structure of a company through a list of positions. The elements located in the BO node OrganizationalAssignment are defined by the data type, WorkAgreementOrganisationalAssignmentElements. The elements include ValidityPeriod, which is the validity period for an organizational assignment. The ValidityPeriod may be a GDT of type CLOSED_DatePeriod and/or include a Validity Qualifier.

OrganisationalAssignmentPositionAssignment 174010 may have a cardinality of 1:n. Node OrganisationalAssignmentPositionAssignment may have an Associations for Navigation. The OrganisationalAssignmentMainPositionAssignment (e.g., based on the main PositionAssignment of an Employee by this Work Agreement) may have a cardinality of 1:1.

OrganisationalAssignmentPositionAssignment

The PositionAssignment is the assignment to the position within the organizational structure of a company held by the employee by virtue of the work agreement. A PositionAssignment holds an employee assignment percentage and can be designated as the main assignment.

The elements located in the BO sub-node, OrganisationalAssignmentPositionAssignment, are defined by the data type, such as WorkAgreementOrganisationalAssignmentPositionAssignmentElements. The elements of WorkAgreementOrganisationalAssignmentPositionAssignmentElements include PositionUUID, EmployeeAssignmentPercent, and/or PositionMainIndicator. The PositionUUID may be a unique identifier of a position. The PositionUUID may be a GDT of type UUID. The EmployeeAssignmentPercent may be the percentage of the working time of the employee assigned to a position as specified in the work agreement. The EmployeeAssignmentPercent may be a GDT of type SMALLNONNEGATIVE_Percent and/or include an Assignment Qualifier. The PositionMainIndicator is an indicator that states whether the position is a main position. The PositionMainIndicator may be used to determine the manager of the employee. The PositionMainIndicator may be a GDT of type MainIndicator. The PositionAssignment (e.g., the Position an employee is assigned to by the work agreement) may have a cardinality of 1:cn.

In some implementations, the sum of EmployeeAssignmentPercent is 100 and/or one position may be the main position.

CapacityUtilisationLevel

A CapacityUtilisationLevel is the percentage ratio of an employee's agreed working time compared to the working time of a full-time employee. The elements of CapacityUtilisationLevel are defined by the data type, WorkAgreementCapacityUtilisationLevelElements. The elements of WorkAgreementCapacityUtilisationLevelElements include ValidityPeriod and/or Percent. The ValidityPeriod is the validity period for the capacity utilization level. The ValidityPeriod may be a GDT of type CLOSED_DatePeriod and/or include a Validity Qualifier. The Percent may be the percentage ratio of an employee's working time compared to the working time of a full-time employee. The Percent may be a GDT of type SMALLNONNEGATIVE_Percent. The CapacityUtilisationLevel node may be transient.

AdditionalClauses are supplementary stipulations contained in the work agreement. The elements of the AdditionalClauses are defined by the data type, WorkAgreementAdditionalClausesElements. The elements of WorkAgreementAdditionalClausesElements include ValidityPeriod, AgreedWorkingTimeRate, SidelineJobsAllowedIndicator, SidelineJobsAllowedIndicator, WorkAgreementCompetitionClauseIndicator, ProbationPeriodQuantity, ProbationPeriodEndDate, WorkAgreementNoticePeriodCode, and/or RegulatoryCompliance. In some implementations the Additional clauses may include ValidityPeriod and AgreedWorkingTimeRate, and elements, such as SidelineJobsAllowedIndicator, SidelineJobsAllowedIndicator, WorkAgreementCompetitionClauseIndicator, ProbationPeriodQuantity, ProbationPeriodEndDate, WorkAgreementNoticePeriodCode, and/or RegulatoryCompliance, may be optional. A ValidityPeriod is the validity for additional clauses. A ValidityPeriod may be a GDT of type CLOSED_DatePeriod and/or a Validity Qualifier. An AgreedWorkingTimeRate is the agreed working time of the employee expressed as a rate. The AgreedWorkingTimeRate may be a GDT of type WorkingTimeRate. A SidelineJobAllowedIndicator is an indicator that states whether or not the work agreement allows sideline jobs. The SidelineJobsAllowedIndicator may be a GDT of type AllowedIndicator. The WorkAgreementCompetitionClauseIndicator is an indicator that states whether or not the work agreement has competition clause. The WorkAgreementCompetitionClauseIndicator may be a GDT of type WorkAgreementCompetitionClauseIndicator. A ProbationPeriodQuantity is the quantity of the probationary period. The ProbationPeriodQuantity is a GDT of type UNITDAYWEEKMONTHYEAR_SMALLNONNEGATIVEINTEGER_Quantity and/or may include a ProbationPeriod Qualifier. A ProbationPeriodEndDate is the last date of the probation period. The ProbationPeriodEndDate may be a GDT of type Date and/or include an End Qualifier.

A WorkAgreementNoticePeriodCode is the notice period of time that can give before terminating a work agreement. The WorkAgreementNoticePeriodCode may be a GDT of type WorkAgreementNoticePeriodCode.

RegulatoryCompliance

RegulatoryCompliance is the representation of country-specific requirements which govern employers' compliance with legislation regulating employment. The elements of RegulatoryCompliance are defined by the date type, WorkAgreementRegulatoryComplianceElements. The elements of WorkAgreementRegulatoryComplianceElements include ValidityPeriod. The ValidityPeriod is the validity period of the regulatory compliance. The ValidityPeriod may be a GDT of type CLOSED_DatePeriod and/or include a Validity Qualifier.

In some implementations, country specific fields may be included in Globalization Layer.

Enterprise Service Infrastructure Actions include a Delimit action. This action delimits RegulatoryCompliance by setting the end date of its ValidityPeriod to the parameter value. In some implementations, the Delimit action may not be required to satisfy preconditions. Changes may be made to the Objects. For example, if the date provided as action parameter is between the RegulatoryCompliance ValidityPeriod start date and end date, the end date may be set to the parameter date; and, otherwise, the change may be inhibited and/or an error message may be issued. The action elements are defined by the data type DelimitActionElements. The elements of the DelimitActionElements include EndDate, which may be a GDT of type Date.

Business Object WorkAgreement

Definition

A WorkAgreement is the contract between employer and employee by means of which the employee is obliged to provide his or her labor while the employer is obliged to provide the agreed compensation. The activities and responsibilities of the employee are specified in the work agreement. This agreement establishes an employment. It is the foundation for further particulars such as working time and salary details specified in other objects.

WorkAgreement DE Extension captures additional information specific to Germany

Node Structure of Business Object Extension WorkAgreement

The only node that is enhanced with information specific to Germany (DE) is the Additional Clauses Node. All other nodes of the WorkAgreement remain the same. For all GDTs with CountryCode in their context structure, the following restriction applies: Only values with listID valid for Germany are allowed.

AdditionalClauses

Definition

AdditionalClauses are supplementary stipulations contained in the work agreement.

In Germany, additional data about the sickness payment—the rules which can be followed while the employee is sick and unable to attend work, is added to the Additional Clauses.

Enhanced Structure

The elements added directly at the node AdditionalClauses (DataType: WorkAgreementAdditionalClausesElements) are defined by the data type enhancement structure: WorkAgreementAdditionalClausesDE_ExtensionElements. The enhanced elements are below:

SupplementarySickPayRuleCode

The SupplementarySickPayRuleCode is a code representing the type of pay rule followed by the company while the employee is sick.

(GDT: SupplementarySickPayRuleCode Restriction: only values from the code list for Germany are allowed)

Business Object WorkAgreement

Definition

A WorkAgreement is the contract between employer and employee by means of which the employee is obliged to provide his or her labor while the employer is obliged to provide the agreed compensation. The activities and responsibilities of the employee are specified in the work agreement. This agreement establishes an employment. It is the foundation for further particulars such as working time and salary details specified in other objects.

WorkAgreementFR captures additional information specific to France.

Node Structure of Business Object Extension WorkAgreement

The only node that is enhanced with information specific to France (FR) is the RegulatoryCompliance Node. All other nodes of the WorkAgreement remain the same. For all GDTs with CountryCode in their context structure, the following restriction applies: Only values with listID valid for France are allowed.

RegulatoryCompliance

Definition

RegulatoryCompliance is the representation of country-specific requirements which govern employers' compliance with legislation regulating employment.

In France, additional data about the professional category of the employee and electoral groups in which the employee is added to the Regulatory Compliance.

Enhanced Structure

The elements added directly at the node RegulatoryCompliance are defined by the data type enhancement structure: WorkAgreementRegulatoryCompliancеFR_ExtensionElements. The enhanced elements are below:

WorkAgreementOccupationCategoryCode optional

The WorkAgreementOccupationCategoryCode is a coded representation of the occupation category of the workagreement.

(GDT: WorkAgreementOccupationCategoryCode)

SocialSurveyEmployeeQualificationEmployeeGroupCodeOptional

The SocialSurveyEmployeeQualificationEmployeeGroupCode is the employee qualification group for the Social Survey the employee is assigned to.

(GDT: Social SurveyEmployeeQualificationEmployeeGroupCode)

WorksCouncilElectionEmployeeGroupCode optional

The WorkCouncilElectionEmployeeGroupCode is the group for the Works Council Election the employee is assigned to.

(GDT: WorksCouncilElectionEmployeeGroupCode)

SupervisoryBoardElectionEmployeeGroupCode optional

The SupervisoryBoardlElectionEmployeeGroupCode is the group for the Supervisory Board Election the employee is assigned to.

(GDT: SupervisoryBoardElectionEmployeeGroupCode)

LabourDisputesCouncilElectionEmployeeGroupCode optional

The LabourDisputesCouncilElectionEmployeeGroupCode is the group for the Election of the Labour Works Council the employee is assigned to.

(GDT: LabourDisputesCouncilElectionEmployeeGroupCode)

LabourDisputesCouncilElectionEmployeeSubGroupCodeOptional

The LabourDisputesCouncilElectionEmployeeSubGroupCode is the subgroup (bellowing to a group) for the Election of the Labour Works Council the employee is assigned to.

(GDT: LabourDisputesCouncilElectionEmployeeSubGroupCode)

Business Object: CN_EmployeeTaxArrangement

FIG. 175 illustrates an example CN_EmployeeTaxArrangement business object model 175004. Specifically, this model depicts interactions among various hierarchical components of the CN_EmployeeTaxArrangement, as well as external components that interact with the CN_EmployeeTaxArrangement (shown here as 175000 through 175002 and 175006 through 175010).

The CN_EmployeeTaxArrangement 175012 can include information for work agreements of the employee that can be used for correct tax calculation and reporting. The items within each work agreement can be time dependent and can be recorded according to the tax card provided by the employee as well as supplementary details.

The Business Object CN_EmployeeTaxArrangement can be used in a CN Employer Regulatory Compliance_Payroll Processing Process Integration Model. A service interface CN Employer Regulatory Compliance in Payroll Input Maintenance Out can have a technical name of CNEmployerRegulatoryComplianceCNEmployer-RegulatoryComplianceInPayrollInputMaintenance Out. In some implementations, the Service Interface CN Employer Regulatory Compliance in Payroll Input Maintenance Out can be part of a CN Employer Regulatory Compliance_Payroll Processing Process Integration Model. The service interface CN Employer Regulatory Compliance in Payroll Input Maintenance Out groups operations which maintain CN employer regulatory compliance within Payroll Processing.

A Notify of CN_EmployeeTaxArrangement to Payroll (A2A) may have the technical name: CNEmployerRegulatoryComplianceInCNEmployerRegulatoryComplianceInPayrollInputMaintenanceOut. The operation Notify of CN_EmployeeTaxArrangement provides information on an employee's Chinese Tax Arrangement to payroll processing.

A CN_EmployeeTaxArrangementPayrollNotification message can be based on Business Object CN_EmployeeTaxArrangement. After the relevant Chinese employee tax arrangement information is updated in CN Employer Regulatory Compliance, the message type CN_EmployeeTaxArrangementPayrollNotification can be, for example, sent to Payroll Processing to update the corresponding information in the object CN_EmployeePayrollInput.

A CN_EmployeeTaxArrangement business object is the arrangement between the employee and the tax authorities of the People's Republic of China that defines the rules of how the employer can calculate and report taxes for this employee to be compliant with the legal requirements of People's Republic of China.

The CN_EmployeeTaxArrangement business object can include some, none, or all information recorded from the tax card submitted by the employee (e.g., tax id, tax area and employee tax type), and/or supplementary details (e.g. indicator for tax paid by employer and indicator for tax exempted).

The elements located directly at the node CN_EmployeeTaxArrangement can be defined by the data type: CN_EmployeeTaxArrangementElements. These elements are: UUID and Employee UUID. UUID is and ID, which may be unique, that identifies exactly one Chinese employee's tax arrangement. UUID may be based on GDT UUID. Employee UUID is the UUID of the employee for whom the tax arrangement applies. Employee UUID may be based on GDT UUID. The CN_EmployeeTaxArrangement can have a relationship with a WorkAgreementItem 175014 to be 1:cn. An Employee business object can have a 1:c cardinality relationship with the CN_EmployeeTaxArrangement 175012.

The CN_EmployeeTaxArrangement can include a QueryByEmployeeID. The query can provide a list of CN_EmployeeTaxArrangement for the specified employee. In some implementations, the query elements are defined by the data type CN_EmployeeTaxArrangement EmployeeIDQueryElements. The elements can include an Employee UUID, which can be a GDT of type UUID. The elements can also include an EmployeeID, which can be a GDT of type EmployeeID.

A WorkAgreementItem 175014 is the set of information required for People's Republic of China tax calculation and reporting purposes for one Work Agreement. The elements can be located at the node WorkAgreementItem. The elements can be defined by the data type: CN_EmployeeSocialInsuranceArrangementWorkAgreementItem elements. The elements are WorkAgreement UUID. The WorkAgreement UUID can be an identifier. In some examples, the WorkAgreement UUID can be unique for each of the WorkAgreement for which the CN_EmployeeTaxArrangement is valid. WorkAgreement UUID may be based on UUID. In one example, the WorkAgreementItem can have a 1:n cardinality with a WorkAgreementItemPeriodTerms 175016. The WorkAgreementItem can also have a cardinality relationship with a WorkAgreement of 1:c. In some implementations, the WorkAgreementItemPeriodTerms may not overlap (e.g., one node may be valid for any given point in time).

The WorkAgreementItem can include a QueryByEmployeeAndWorkAgreement. The query provides a list of CN_EmployeeTaxArrangement for a particular work agreement of an employee. The query elements are defined by the data type: CN_EmployeeTaxArrangement WorkAgreementItemEmployeeAndWorkAgreementQueryElements. The elements can be CN_EmployeeTaxArrangement EmployeeUUID that can be a GDT of type UUID. The elements can be a WorkAgreementUUID that can be a GDT of type UUID.

A WorkAgreementItemPeriodTerms is the set of additional information relevant to the tax calculation and reporting for People's Republic of China for a particular validity period. The supplementary details can include, amongst others, information on a code for regional regulations and the expatriate category type.

The elements located at the node WorkAgreementItemPeriodTerms can be defined by the data type: CN_EmployeeSocialInsuranceArrangement-WorkAgreementItemPeriodTermsElements. The elements are: UUID, ValidityPeriod, EmployeeRegionalTaxRegulationsCode, EmployeeTaxExpatriateCategoryCode, TaxExemptionAmount, TaxPaidByCompanyIndicator, TaxExemptedIndicator, and TaxExemptedIndicator.

The UUID is an ID, which may be unique. The UUID can identify one WorkAgreementItemPeriodTerms nodes. The UUID may be based on a GDT of type UUID. The ValidityPeriod is the validity period of the work agreement item. The ValidityPeriod may be based on GDT of type DatePeriod (e.g., with restriction of CLOSED, and Qualifier of Validity). EmployeeRegionalTaxRegulationsCode can be a coded representation of the regional regulations that determine the employee tax calculation. The EmployeeRegionalTaxRegulationsCode may be based on GDT EmployeeRegionalTaxRegulationsCode. The EmployeeTaxExpatriateCategoryCode can be a coded representation of the expatriate category of an employee, specific for a workagreement for tax calculation and reporting purposes. The EmployeeTaxExpatriateCategoryCode may be based on a GDT of type EmployeeTaxExpatriateCategoryCode. The TaxExemptionAmount can hold the amount that is exempted from individual income tax. The TaxExemptionAmount may be based on a GDT of type CURRENCYCNY_MEDIUM_Amount. The TaxPaidByCompanyIndicator can specify whether the individual income tax is paid by the Company or not. In some implementations, the TaxPaidByCompanyIndicator can be optional. The TaxPaidByCompanyIndicator may be based on a GDT of type PaidByCompanyIndicator. The TaxExemptedIndicator can indicate whether the employee is exempted for individual income tax or not. In some implementations, the TaxExemptedIndicator can be optional. The TaxExemptedIndicator may be based on a GDT of type ExemptedIndicator.

FIG. 176 illustrates one example logical configuration of CN_EmployeeTaxArrangementMessage message 176000. Specifically, this figure depicts the arrangement and hierarchy of various components such as one or more levels of packages, entities, and datatypes, shown here as 176000 through 176020. As described above, packages may be used to represent hierarchy levels. Entities are discrete business elements that are used during a business transaction. Data types are used to type object entities and interfaces with a structure. For example, CN_EmployeeTaxArrangementMessage message 176000 includes, among other things, CN_EmployeeTaxArrangement 176006. Accordingly, heterogeneous applications may communicate using this consistent message configured as such.

FIG. 177-1 through 177-4 illustrates one example logical configuration of CN_EmployeeTaxArrangementMessage message 177000. Specifically, this figure depicts the arrangement and hierarchy of various components such as one or more levels of packages, entities, and datatypes, shown here as 177000 through 177114. As described above, packages may be used to represent hierarchy levels. Entities are discrete business elements that are used during a business transaction. Data types are used to type object entities and interfaces with a structure. For example, CN_EmployeeTaxArrangementMessage message 177000 includes, among other things, CN_EmployeeTaxArrangement 177028. Accordingly, heterogeneous applications may communicate using this consistent message configured as such.

Message Types and their Signatures

In a signature, the CN_EmployeeTaxArrangement business object is contained as a "leading" business object. The message data type determines the structure of the following message types.

In order for a payroll system to calculate Chinese tax deductions and carry out related legal reporting for an employee, certain employee specific data is stored in the Business Object CN_EmployeeTaxArrangement. The data can be transmitted initially and any changes to it in a timely manner to the payroll provider so these tasks can be performed. In some implementations, the CN_EmployeeTaxArrangement business object can be part of the Process Component CN Employer Regulatory Compliance and/or the Logical Deployable Unit Human Capital Management.

The CN_EmployeeTaxArrangementPayrollNotification can be a notification to the payroll of an employee's tax information. The Employee tax information is required to correctly calculate tax deductions and transfer these to the tax authority. In addition the employee's tax information is used for tax reporting purposes. The structure of this message type is determined by the message data type CN_EmployeeTaxArrangementMessage. The CN_EmployeeTaxArrangementMessage message type is used in operations of business objects: CN_EmployeeTaxArrangement, NotifyOfCN_EmployeeTaxArrangement, CN_EmployeePayrollInput, and/or MaintainCN_EmployeePayrollInputBasedOnTaxArrangement.

A CN_EmployeeTaxArrangementMessage message data type includes CN_EmployeeTaxArrangement object which is contained in the business document, and the business information that is relevant for sending a business document in a message. The CN_EmployeeTaxArrangementMessage message data type includes a MessageHeader package, and CN_EmployeeTaxArrangement package. The CN_EmployeeTaxArrangementMessage message data type can provide the structure for the CN_EmployeeTaxArrangementPayrollNotification message types.

A MessageHeaderPackage is a grouping of business information that is relevant for sending a business document in a message. It includes a MessageHeader entity. The MessageHeader is a grouping of business information from the perspective of the sending application, which may include Information to identify the business document in a message. The business document can include Information about the sender, and optionally Information about the recipient. The MessageHeader can include SenderParty, and RecipientParty. The MessageHeader is a GDT of type BusinessDocumentMessageHeader, and other elements of the GDT can be used. In some implementations, the SenderParty can be the partner responsible for sending a business document at business application level. The SenderParty can be of a GDT of type BusinessDocumentMessageHeaderParty. In some implementations, the RecipientParty can be the partner responsible for receiving a business document at business application level. The RecipientParty is of the type GDT: BusinessDocumentMessageHeaderParty.

The grouping of CN_EmployeeTaxArrangement can have a cardinality relationship with the WorkAgreementItemPackage of 1..n. The CN_EmployeeTaxArrangement includes the elements: UUID and EmployeeUUID. The UUID may be based on a GDT of type UUID. The EmployeeUUID may be based on UUID. The grouping of WorkAgreementItemPackage with a WorkAgreementItemPeriodTermsPackage can have a cardinality of 1:n. The WorkAgreementItemPackage includes the elements: WorkAgreementItemPeriodTermsPackageCompleteTransmissionIndicator, and WorkAgreementUUID. The WorkAgreementItemPeriodTermsPackageCompleteTransmissionIndicator may be optional, and may be based on a GDT of type Indicator with a Qualifier of CompleteTransmission. The WorkAgreementUUID may be based on a GDT of type UUID.

The WorkAgreementItemPeriodTermsPackage includes the elements: ActionCode, UUID, ValidityPeriod, EmployeeRegionalTaxRegulationsCode, EmployeeTaxExpatriateCategoryCode, TaxExemptionAmount, TaxPaidByCompanyIndicator, and TaxExemptedIndicator.

The ActionCode may be based on a GDT of type ActionCode. The UUID may be based on a GDT of type UUID. The UUID may be based on a GDT of type UUID. The ValidityPeriod can be based on a GDT of type DatePeriod (e.g., with restriction of CLOSED, and a Qualifier of Validity). The EmployeeRegionalTaxRegulationsCode may be based on a GDT of type EmployeeRegionalTaxRegulationsCode. The EmployeeTaxExpatriateCategoryCode can be optional, and may be based on a GDT of type EmployeeTaxExpatriateCategoryCode. The TaxExemptionAmount may be based on a GDT of type CURRENCYCNY_MEDIUM_Amount. The TaxPaidByCompanyIndicator can be optional, and may be based on a GDT of type PaidByCompanyIndicator. The TaxExemptedIndicator can be optional, and may be based on a GDT of type ExemptedIndicator. In some implementations, if the value of the attribute @actionCode is "Delete", then the UUID is filled. In some implementation, if the value of the attribute @actionCode is other than "Delete", then ValidityPeriod, EmployeeRegionalTaxRegulationsCode, and TaxExemptionAmount can also be filled.

FIG. 178 illustrates one example of an CompensationStructure business object model 178002. Specifically, this model depicts interactions among various hierarchical components of the CompensationStructure, as well as external components that interact with the CompensationStructure (shown here as 178000 and 178004 through 178026). A CompensationStructure can be an organized structure of pay grade ranges. A pay grade range reflects the value of tasks and activities in the company. Employees can be assigned to a pay grade range based on the tasks and activities they perform. A CompensationStructure can be company-specific or can be predefined according to pay scale regulations. The value of pay grade ranges can be defined in monetary terms. An example of a pay grade range can be a salary group. A CompensationStructure can be used to: Reflect the value of jobs and their associated tasks and activities within a company and in comparison with the market. Propose compensation components in the case of a hiring, organizational reassignment or promotion.

Since the value of jobs at a company and of comparable jobs in industry changes over time, you can regularly adjust a CompensationStructure accordingly. The business object CompensationStructure can be part of the process component Compensation Management. A CompensationStructure comprises classification information, a defined sequence of pay grade ranges including their values, and proposed compensation components.

A CompensationStructure (Root) 178006 can be an organized structure of pay grade ranges. A pay grade range specifies the value of tasks and activities in the company. The elements located directly at the root node are defined by the type GDT: CompensationStructureElements. These elements include: UUID, ID, ValidityPeriod, TypeCode, ActiveIndicator, CountryCode, DefaultCurrencyCode, GradeDefaultRecurrenceFrequencyCode.

UUID can be a unique identifier of a CompensationStructure. UUID may be based on GDT UUID. ID can be an identifier of a CompensationStructure. ID may be based on GDT CompensationStructureID. ValidityPeriod can be the validity period of a CompensationStructure. Validity may be based on GDT CLOSED_DatePeriod, Qualifier: Validity. TypeCode can be the coded representation of the type of a CompensationStructure, differentiated by the pay grade range attributes it contains. Examples are: single point-based structure, range-based structure. TypeCode may be based on GDT CompensationStructureTypeCode. ActiveIndicator indicates whether a CompensationStructure can be active or inactive. Only an active CompensationStructure can be newly assigned in any other Business Object, e.g. the EmployeeCompensationAgreement. ActiveIndicator may be based on GDT Indicator, Qualifier: Active. CountryCode can be the coded representation of the country for which a CompensationStructure can be valid. CountryCode may be based on GDT CountryCode. DefaultCurrencyCode can be the coded representation of the currency that can be defaulted when amounts are edited for the nodes GradeAmountsPerPeriod and GradeCompensationComponentDefaultRatesPerPeriod, and is optional. DefaultCurrencyCode may be based on GDT CurrencyCode; Qualifier: Default. GradeDefaultRecurrenceFrequencyCode can be the coded representation of the frequency that can be proposed by default for the node Grade, and is optional. GradeDefaultRecurrenceFrequencyCode may be based on GDT COMPENSATIONCOMPONENT_RecurrenceFrequencyCode, Qualifier: Default. Composition Relationships may exist including: Name 178008 has a cardinality of 1:n and Grade 178010 has a cardinality of 1:cn. The filter elements are defined by the data type: CompensationStructureGradeFilterElements. These elements include: ValidityPeriod which is optional and is a GDT of type CLOSED_DatePeriod, Qualifier: Validity. RelativePeriodCode which is optional and is a GDT of type CURRENTDAYFROMTODAYON_RelativePeriodCode. Associations for Navigation my exist including: From business object CompensationStructure/node CompensationStructure (Root) to node Grade, FirstGrade has a cardinality of 1:cn. Association with first grade in an ordered sequence of CompensationStructure grades. At any one time, a CompensationStructure (root) has exactly one first grade. The filter elements are defined by the data type: CompensationStructureGradeByKeyDate FilterElements. These elements include KeyDate which is optional and is a GDT of type Date, Qualifier: Key. RelativePeriodCode which is optional and is a GDT of type CURRENTDAY_RelativePeriodCode. Either filter value for KeyDate or RelativePeriodCode may be specified. If no filter can be specified the current date can be used. The validity periods of the node Grade may lie within the validity period of the CompensationStructure.

In some implementations, the Enterprise Service Infrastructure Actions Copy can create a copy of an existing CompensationStructure including all subordinate nodes with a new name and ID. Changes to the object may include: This action creates a copy of a selected CompensationStructure including all subordinate nodes. Parameters: The action elements are defined by the data type: CompensationStructureCopyActionElements and include ID and NameName. ID is optional and is a GDT of type CompensationStructureID and specifies the identifier of the new CompensationStructure. NameName is optional and is GDT of type LONG_Name, Qualifier: CompensationStructure and specifies the name of the new CompensationStructure. CreateWithReference may create a one to one copy of an existing CompensationStructure including all subordinate nodes. Changes to the object may include: This action creates a one to one copy of a selected CompensationStructure including all subordinate nodes.

QueryByElements may provides a list of all CompensationStructures (root node) that satisfy the selection parameters specified. The query elements are defined by the data type: CompensationStructureElementsQueryElements and include ID, NameName, KeyDate, TypeCode, ActiveIndicator, CountryCode, DefaultCurrencyCode, and GradeDefaultRecurrenceFrequencyCode. ID is a GDT of type CompensationStructureID. NameName is a GDT of type LONG_Name, Qualifier: CompensationStructure and can be the name of the CompensationStructure or a specified pattern. KeyDate is a GDT of type Date, Qualifier: Key and can be the validity period of the CompensationStructure overlaps the period of the query element KeyDate. TypeCode can be a GDT of type CompensationStructureTypeCode. ActiveIndicator can be a GDT of type Indicator, Qualifier: Active. CountryCode is a GDT of type CountryCode. DefaultCurrencyCode is a GDT of type CurrencyCode; Qualifier: Default. GradeDefaultRecurrenceFrequencyCode is a GDT of type COMPENSATIONCOMPONENT_RecurrenceFrequencyCode, Qualifier: Default.

QueryByCompensationComponentType can provides a list of all CompensationStructures (root node) that exist in the specified validity period and use a specified CompensationComponentType. The query elements are defined by the data type CompensationStructureCompensationComponentTypeQueryElements and include CompensationComponentTypeUUID and KeyDate. CompensationComponentTypeUUID and is a GDT of type UUID. KeyDate is optional and is a GDT of type Date, Qualifier: Key and can be the validity period of the GradeCompensationComponentDefault overlaps the period of the query element KeyDate.

A Name can be a language-dependent word or combination of words designating or describing a CompensationStructure. The elements located directly at the node Name are defined by the type GDT: CompensationStructureNameElements. The element are: Name. A Name can be a language-dependent word or combination of words designating or describing a CompensationStructure. Name may be based on GDT LONG_Name, Qualifier: CompensationStructure.

A CompensationStructure grade can be a pay grade range with a specific validity period. A pay grade range specifies the value of tasks and activities in the company. For personnel actions such as a hiring, organizational reassignment or a promotion, a grade can be assigned to the business object EmployeeCompensationAgreement. The elements located directly at the node Grade are defined by the type GDT: CompensationStructureGradeElements. These elements are: UUID, ID, ValidityPeriod, AmountsDefaultRecurrenceFrequencyCode, Key. UUID can be an identifier, which may be unique, of a Grade. UUID may be based on GDT UUID. ID can be an identifier, which may be unique, of a Grade. ID may be based on GDT CompensationStructureGradeID. ValidityPeriod can be the validity period of a Grade. ValidityPeriod may be based on GDT CLOSED_DatePeriod, Qualifier: Validity. AmountsDefaultRecurrenceFrequencyCode can be the frequency that can be defaulted when you edit amounts for the node GradeAmountsPerPeriod and used for the association DefaultGradeAmountsPerPeriod at the node GradeAmountsPerPeriod. AmountsDefaultRecurrenceFrequencyCode may be based on GDT COMPENSATIONCOMPONENT_RecurrenceFrequencyCode, Qualifier: Default. Key may be based on GDT CompensationStructureGradeKey. Key may consist of the following elements: CompensationStructureID, and ID. CompensationStructureID can be an identifier of a CompensationStructure. CompensationStructureID may be based on GDT CompensationStructureID. ID can be an identifier of a Grade. ID may be based on GDT CompensationStructureGradeID. Composition Relationships may exist including: GradeName 178012 has a cardinality of 1:n. GradeSuccessor 178014 has a cardinality of 1:cn (Filtered). The filter elements are defined by the data type: CompensationStructureGradeSuccessorFilterElements and include ValidityPeriod and RelativePeriodCode. ValidityPeriod is optional and is a GDT of type CLOSED_DatePeriod, Qualifier: Validity. RelativePeriodCode is optional and is a GDT of type CURRENTDAYFROMTODAYON_RelativePeriodCode. GradeAmounts 178016 has a cardinality of 1:n (Filtered). The filter elements are defined by the data type: CompensationStructureGradeAmountsFilterElements and include ValidityPeriod and RelativePeriodCode. ValidityPeriod is optional and is a GDT of type CLOSED_DatePeriod, Qualifier: Validity. RelativePeriodCode is optional and is a GDT of type CURRENTDAYFROMTODAYON_RelativePeriodCode. GradeCompensationComponentDefault 178018 ValidityPeriod RelativePeriodCode 1:cn (Filtered). The filter elements are defined by the data type: CompensationStructureGradeCompensationComponentDefaultFilterElements an include ValidityPeriod and RelativePeriodCode. ValidityPeriod is optional and is a GDT of type CLOSED_DatePeriod, Qualifier: Validity. RelativePeriodCode is optional and is a GDT of type CURRENTDAYFROMTODAYON_RelativePeriodCode. GradeOrdinalNumber 178020 has a cardinality of 1:n (Filtered). The filter elements are defined by the data type: CompensationStructureGradeOrdinalNumberFilterElements and include ValidityPeriod and RelativePeriodCode. ValidityPeriod is optional and is a GDT of type CLOSED_DatePeriod, Qualifier: Validity. RelativePeriodCode is optional and is a GDT of type CURRENTDAYFROMTODAYON_RelativePeriodCode.

The validity periods of the nodes GradeSuccessor, GradeAmounts, GradeOrdinalNumber and GradeCompensationComponentDefault can lie within the validity period of the corresponding Grade.

The validity periods of the node GradeAmounts can have no overlaps or gaps. The validity periods of the node GradeSuccessor can have no overlaps; gaps are allowed. The validity periods of the node GradeCompensationComponentDefault can have no overlaps for one and the same CompensationComponentType; gaps are allowed. The validity periods of the node GradeOrdinalNumber can have no overlaps or gaps.

In some implementations, the Enterprise Service Infrastructure Actions Copy may create a copy of an existing Grade including all subordinate nodes with a new name and ID. Changes to the object may include:

This action creates a copy of a selected Grade including all subordinate nodes. The newly copied Grade can be inserted as the last Grade in the ordered sequence of Grades. Parameters: The action elements are defined by the data type: CompensationStructureGradeCopyActionElements and include ID and GradeNameName. ID is a GDT of type CompensationStructureGradeID and specifies the identifier of the new Grade. GradeNameName is a GDT of type MEDIUM_Name, Qualifier: CompensationStructureGrade and specifies the name of the new Grade. MoveUp moves an existing Grade by one position up in the ordered sequence of Grades. Changes to the object may include: this action moves an existing Grade by one positions up in the ordered sequence of Grades. This effects changes in node GradeSuccessor. If the Grade can be already the first grade in the ordered sequence of Grades the action has no effect. Parameters: The action elements are defined by the data type: CompensationStructureGrade-MoveUpActionElements and include KeyDate which is a GDT of type Date, Qualifier: Key and specifies the start date of new Grade sequence. MoveDown moves an existing Grade by one position down in the ordered sequence of Grades. Changes to the object may include: this action moves an existing Grade by one positions down in the ordered sequence of Grades. This effects changes in node GradeSuccessor. If the Grade can be already the last grade in the ordered sequence of Grades the action has no effect. Parameters: The action elements are defined by the data type: Compensation-StructureGradeMoveDownActionElements and include KeyDate which is a GDT of type Date, Qualifier: Key and specifies the start date of new Grade sequence.

A QueryByElements may provide a list of all Grades that satisfy the selection parameters specified. The query elements are defined by the data type CompensationStructure-GradeElementsQueryElements and include Compensation-StructureID, ID, GradeNameName, KeyDate, and Amounts-DefaultRecurrenceFrequencyCode.

CompensationStructureID is optional and is a GDT of type CompensationStructureID and can be the ID of the CompensationStructure a Grade can be assigned to. ID is optional and is a GDT of type CompensationStructureGradeID. GradeNameName is optional and is a GDT of type MEDIUM_Name, Qualifier: CompensationStructureGrade and can be the name of the Grade or a specified pattern. KeyDate is optional and is a GDT of type Date, Qualifier: Key and can be the validity period of the Grade overlaps the period of the query element KeyDate. AmountsDefaultRecurrenceFrequencyCode is optional and is a GDT of type COMPENSATIONCOMPONENT_RecurrenceFrequencyCode, Qualifier: Default.

A GradeName can be a language-dependent word or combination of words designating or describing a Grade. The elements located directly at the node GradeName are defined by the type GDT: CompensationStructureGrade-NameElements. These element can be: Name. A Name can be a language-dependent word or combination of words designating or describing a Grade. Name may be based on GDT MEDIUM_Name, Qualifier: CompensationStructureGrade. GradeSuccessor specifies the subsequent Grade within a specific validity period. In this way, an ordered sequence of Grades can be created. For example, groups and their subsequent groups in a pay scale structure. The elements located directly at the node GradeSuccessor are defined by the type GDT: CompensationStructureGradeSuccessorElements. These elements are: SuccessorGradeUUID, and ValidityPeriod. A SuccessorGradeUUID can be a unique identifier that references the successor grade. SuccessorGradeUUID may be based on GDT UUID. ValidityPeriod can be the validity period of a GradeSuccessor. ValidityPeriod may be based on GDT CLOSED_DatePeriod, Qualifier: Validity. There may be a number of Inbound Association Relationships including: From business object CompensationStructure/node Grade, SuccessorGrade has a cardinality of 1:c. Association with successor grade in an ordered sequence of Compensation-Structure grades. At any one time, a grade has exactly one successor grade or, if the grade can be the last grade in the sequence, no successor grade. There can be no cycles in the ordered sequence of grades. Moreover, a grade cannot be its own successor grade. At any one time, there may be only one grade that is not a successor grade. This grade can be the first grade in the ordered sequence of grades. At any one time, there may be only one grade that does not have a successor grade. This grade can be the last grade in the ordered sequence of grades. GradeAmounts specifies the value of a grade within a specific validity period. The value of a grade can be specified in monetary terms. The elements located directly at the node GradeAmounts are defined by the type GDT: CompensationStructureGradeAmountsElements. The element can be: ValidityPeriod. A ValidityPeriod can be the validity period of a GradeAmounts. ValidityPeriod may be based on GDT CLOSED_DatePeriod, Qualifier: Validity. Composition Relationships may exist including: GradeAmountsPerPeriod 178022 has a cardinality of 1:n (Filtered). The filter elements are defined by the data type: CompensationStructureGradeAmountsPerPeriodFilterElements and include RecurrenceFrequencyCode which is optional and is a GDT of type COMPENSATIONCOMPONENT_RecurrenceFrequencyCode.

Associations for Navigation may exist including: From business object CompensationStructure/node GradeAmounts to node GradeAmountsPerPeriod, DefaultGradeAmountsPerPeriod has a cardinality of 1:1. Association for determining the amounts in the frequency specified in the node Grade.

The CurrencyCode of the amounts in node GradeAmountsPerPeriod may be identical within one validity period.

A GradeAmountsPerPeriod specifies the value of a GradeAmounts in different frequencies. The elements located directly at the node GradeAmountsPerPeriod CompensationStructure are defined by the type GDT: CompensationStructureGradeAmountsPerPeriodElements. These elements are: UUID, MinimumAmount, MaximumAmount, AverageAmount, RangeSpreadPercent, TargetAmount, RecurrenceFrequencyCode. UUID can be an identifier, which may be unique, of a GradeAmountsPerPeriod. UUID may be based on GDT of type UUID. MinimumAmount specifies the lower limit of the value. Minimum may be based on GDT of type LARGE_Amount, Qualifier: Minimum. MaximumAmount specifies the upper limit of the value. MaximumAmount may be based on GDT LARGE_Amount, Qualifier: Maximum. AverageAmount can be the arithmetic midpoint from MinimumAmount and MaximumAmount. AverageAmount may be based on GDT of type LARGE_Amount, Qualifier: Average. RangeSpreadPercent can be a percentage value that represents the range of MinimumAmount and MaximumAmount based on the MinimumAmount. RangeSpreadPercent may be based on GDT of type MEDIUMNONNEGATIVE_Percent, Qualifier: RangeSpread. TargetAmount can be the reference value of a pay grade range and the reference value for calculating an employee's Compa-Ratio. Many companies use the AverageAmount to calculate this instead; in other words, the TargetAmount and AverageAmount are the same in this case. TargetAmount may be based on GDT of type LARGE_Amount, Qualifier: Target. RecurrenceFrequencyCode represents the time unit of the frequency which can be used as basis for calculation of an employee's Compa-Ratio. RecurrenceFrequencyCode may be based on GDT of type COMPENSATIONCOMPONENT_RecurrenceFrequencyCode.

The currency of the amounts can be taken over from the DefaultCurrencyCode of the Compensation Structure.

The MinimumAmount can be less than or equal to the MaximumAmount.

The AverageAmount can be the arithmetic midpoint from MinimumAmount and MaximumAmount.

The TargetAmount lies between the MinimumAmount and the MaximumAmount.

The following rules apply to the fields MinimumAmount, MaximumAmount, AverageAmount and RangeSpreadPercent: Of the values MinimumAmount, MaximumAmount and AverageAmount, the missing value can be calculated from the other two values, where these are known. If all three values are known, the AverageAmount can be calculated from the MinimumAmount and MaximumAmount. The value of the field RangeSpreadPercent can be calculated from the fields MinimumAmount and MaximumAmount, where these values are known. If only one of the values MinimumAmount, MaximumAmount or AverageAmount can be known, the value of RangeSpreadPercent can also be known, so that all missing values can be calculated.

The amounts can be maintained in the frequency specified for the node Grade (field AmountsDefaultRecurrenceFrequencyCode). The CurrencyCode can be identical in all amounts.

GradeCompensationComponentDefault specifies default values for compensation components within a specific validity period. For personnel actions such as a hiring, organizational reassignment or promotion, these default values can be used in the business object EmployeeCompensationAgreement. The elements located directly at the node GradeCompensationComponentDefault are defined by the type GDT: CompensationStructureGradeCompensationComponentDefaultElements and include CompensationComponentTypeUUID, CompensationComponentTypeID, ValidityPeriod, DeviationAllowedIndicator. CompensationComponentTypeUUID can be an identifier, which may be unique, of a default CompensationComponentType. The CompensationComponentType can be used as a default for a compensation component when assigning a Grade in the EmployeeCompensationAgreement (for example, in the context of personnel events). CompensationComponentTypeUUID may be based on GDT of type UUID. CompensationComponentTypeID can be an identifier of a default CompensationComponentType, and is optional. The CompensationComponentType can be used as a default for a compensation component when assigning a Grade in the EmployeeCompensationAgreement (for example, in the context of personnel events). CompensationComponentTypeID may be based on GDT of type CompensationComponentTypeID. ValidityPeriod can be the validity period of a GradeCompensationComponentDefault. ValidityPeriod may be based on GDT of type CLOSED_DatePeriod, Qualifier: Validity. DeviationAllowedIndicator indicates whether a different entry can be allowed in the Amount field of the ItemCompensationComponentDetailRate of the business object EmployeeCompensationAgreement. If the DeviationAllowedIndicator can be set in the referenced CompensationComponentType the field can be changed in this node. Otherwise the field can not be changed. DeviationAllowedIndicator may be based on GDT of type Indicator, Qualifier: Allowed.

Composition Relationships may exist including: GradeCompensationComponentDefaultRates has a cardinality of 1:cn (Filtered). The filter elements are defined by the data type: CompensationStructureGradeCompensationComponentDefaultRatesFilterElements including ValidityPeriod and RelativePeriodCode. ValidityPeriod is optional and is a GDT of type CLOSED_DatePeriod, Qualifier: Validity. RelativePeriodCode is optional and is a GDT of type CURRENTDAYFROMTODAYON_RelativePeriodCode. There may be a number of Inbound Association Relationships including: From business object CompensationComponentType/nodeCompensationComponentType (Root), CompensationComponentType has a cardinality of 1:cn. Association with a CompensationComponentType that can be used as a default value for personnel events in the business object EmployeeCompensationAgreement. The validity periods of the node GradeCompensationComponentDefaultRates may lie within the validity period of the corresponding GradeCompensationComponentDefault. The validity periods of a GradeCompensationComponentDefaultRates can have no overlaps; gaps are allowed.

A GradeCompensationComponentDefaultRates specifies the value of a GradeCompensationComponentDefault within a specific validity period. The value of a GradeCompensationComponentDefaultRates can be specified in monetary terms. The elements located directly at the node GradeCompensationComponentDefaultRates 178024 are defined by the type GDT: CompensationStructureGradeCompensationComponentDefaultRatesElements including ValidityPeriod, DefaultPercent, CompensationComponentCalendarDayRecurrence. ValidityPeriod can be the validity period of a GradeCompensationComponentDefaultRates. ValidityPeriod may be based on GDT of type CLOSED_DatePeriod, Qualifier: Validity. DefaultPercent can be a percentage default value for a compensation component that can be based on another compensation component, and is optional. A DefaultPercent can be used together with the CompensationComponentType referenced in the node GradeCompensationComponentDefault as a default compensation component when assigning a Grade in the EmployeeCompensationAgreement. DefaultPercent may be based on GDT of type MEDIUM_Percent, Qualifier: Default. CompensationComponentCalendarDayRecurrence can be the recurrence of the due date of a compensation component within a period, and is optional. CompensationComponentCalendarDayRecurrence may be based on GDT of type CalendarDayRecurrence, Qualifier: CompensationComponent.

Composition Relationships may exist including: GradeCompensationComponentDefaultRatesPerPeriod 178026 has a cardinality of 1:cn (Filtered). The filter elements are defined by the data type: CompensationStructureGradeCompensationComponentDefaultRatesPerPeriodFilterElements including CompensationComponentRecurrenceFrequencyCode which is optional and is a GDT of type COMPENSATIONCOMPONENT_RecurrenceFrequencyCode, Qualifier: CompensationComponent.

Associations for Navigation may exist including: From business object CompensationStructure/node GradeCompensationComponentDefaultRates to node. GradeCompensationComponentDefaultRatesPerPeriod, DefaultGradeCompensationComponentDefaultRatesPerPeriod has a cardinality of 1:c. Association for determining the amount in the frequency specified in the referenced CompensationComponentType, if it has a CompensationComponentOccurrenceTypeCode '1' (Multiple occurrences) Otherwise, only one amount exists in node GradeCompensationComponentDefaultRatesPerPeriod.

In some implementations, the Enterprise Service Infrastructure Action Delimit delimits a GradeCompensationComponentDefaultRates by setting the end date of its ValidityPeriod to the parameter value EndDate. Changes to the object may include: If the EndDate provided as action parameter can between the GradeCompensationComponentDefaultRates ValidityPeriod start date and end date, the end date can be set to the parameter EndDate. Otherwise, the change can be refused by issuing an error message. Parameters: The action elements are defined by the data type: DelimitActionElements and include EndDate which is a GDT of type Date. A DefaultPercent can be mandatory if the CompensationComponentType that can be referenced in the node GradeCompensationComponentDefault can be derived from another CompensationComponentType. Otherwise, you cannot use DefaultPercent. A CompensationComponentCalendarDayRecurrence can be mandatory if the Compensation- ComponentType referenced in the node GradeCompensationComponentDefault has a CompensationComponentOccurrenceTypeCode '3' (Multiple occurrences on fixed due dates). Otherwise, you can not use CompensationComponentCalendarDayRecurrence. A GradeCompensationComponentDefaultRatesPerPeriod can have entries in different frequencies if the CompensationComponentType referenced in the node GradeCompensationComponentDefault has a CompensationComponentOccurrenceTypeCode '1' (Multiple occurrences). Otherwise, there can be only one entry without a frequency. A GradeCompensationComponentDefaultRatesPerPeriod specifies the value of a GradeCompensationComponentDefaultRates in different frequencies. The elements located directly at the node GradeCompensationComponentDefaultRatesPerPeriod are defined by the type GDT of type CompensationStructureGradeCompensationComponentDefaultRatesPerPeriodElements including DefaultAmount, and CompensationComponentRecurrenceFrequencyCode. DefaultAmount can be a monetary default value for a compensation component. A DefaultAmount can be used together with the CompensationComponentType referenced in the node GradeCompensationComponentDefault as a default compensation component when assigning a Grade in the EmployeeCompensationAgreement (for example, in the context of personnel events). DefaultAmount may be based on GDT of type LARGE_Amount, Qualifier: Default. CompensationComponentRecurrenceFrequencyCode can be a coded representation of the frequency of a compensation component which can be due on a recurring basis, and is optional. This recurrence frequency code identifies the time unit of the frequency. CompensationComponentRecurrenceFrequencyCode may be based on GDT of type COMPENSATIONCOMPONENT_RecurrenceFrequencyCode, Qualifier: CompensationComponent.

A DefaultAmount can be mandatory if the CompensationComponentType that can be referenced in the node GradeCompensationComponentDefault is not derived from another CompensationComponentType. Otherwise, you cannot use DefaultAmount. The corresponding currency of a DefaultAmount can be taken over from the CompensationComponentType, if specified there. Otherwise the DefaultCurrencyCode can be derived from the CompensationStructure. The CompensationComponentRecurrenceFrequencyCode can be used only for a CompensationComponentType that has a CompensationComponentOccurrenceTypeCode '1' (Multiple occurrences). GradeOrdinalNumber specifies the absolute position of a Grade in the ordered sequence of Grades within a specific validity period. The GradeOrdinalNumber can be derived by following the composition GradeSuccessor from node Grade to node GradeSuccessor. The elements located at the node GradeOrdinalNumber are defined by the type GDT: CompensationStructureGradeOrdinalNumberElements. These elements are: OrdinalNumberValue, and ValidityPeriod. OrdinalNumberValue indicates the position of a Grade in the ordered sequence of Grades. OrdinalNumberValue may be based on GDT SMALL_OrdinalNumberValue. ValidityPeriod can be the validity period of a GradeOrdinalNumber. ValidityPeriod may be based on GDT CLOSED_DatePeriod, Qualifier: Validity.

In some applications, the Enterprise Service Infrastructure Action MoveUp moves an existing Grade by one position up in the ordered sequence of Grades. The action MoveUp of the node Grade can be called. The parameter KeyDate of the action of the node Grade can be derived from the ValidityPeriod start date of the GradeOrdinalNumber. Changes to the object my include: this action moves an existing Grade by one position up in the ordered sequence of Grades. This effects changes in node GradeSuccessor. If the Grade can be already the first grade in the ordered sequence of Grades the action has no effect. MoveDown moves an existing Grade by one position down in the ordered sequence of Grades. The action MoveDown of the node Grade can be called. The parameter KeyDate of the action of the node Grade can be derived from the ValidityPeriod start date of the GradeOrdinalNumber. Changes to the object my include: This action moves an existing Grade by one position down in the ordered sequence of Grades. This effects changes in node GradeSuccessor. If the Grade can be already the last grade in the ordered sequence of Grades the action has no effect.

FIGS. 179-1 through 179-2 illustrate one example of an DE_EmployeeTaxArrangement business object model 179030. Specifically, this model depicts interactions among various hierarchical components of the DE_EmployeeTaxArrangement, as well as external components that interact with the DE_EmployeeTaxArrangement (shown here as 179002 through 179004 and 179022 through 179026).

Business Object: DE_EmployeeTaxArrangement

A DE_EmployeeTaxArrangement is the arrangement by the German tax authority for the employee concerning calculation and reporting of income tax deductions according to German legal requirements. It may contain information recorded from the tax card supplied to the employee (for example, tax authority, tax class, number of child tax exemptions), supplementary details (for example, tax table to be used, special rules) and details from previous employments in the current calendar year that can be relevant for year-to-date amounts. The DE_EmployeeTaxArrangement may exist for internal employees for each employment. The object is time-dependent per employment. It is German specific and belongs to one Employee entity. The business object DE_EmployeeTaxArrangement is part of the process component DE Employer Regulatory Compliance. A DE_EmployeeTaxArrangement may contain information from all Employments that is used for calculation of income tax. The items within each Employment may be time dependent and can be recorded according to the tax card as well as supplementary details. Additionally, information from previous employments in the same calendar year is recorded within the Employment it relates to. DE_EmployeeTaxArrangement is represented by the Root node. The Business Object DE_EmployeeTaxArrangement 179036 is involved in the following Process Integration Models: DE Employer Regulatory Compliance_Payroll Processing.

Service Interface DE Employer Regulatory Compliance in Payroll Input Maintenance Out DEEmployerRegulatoryComplianceDEEmployerRegulatoryComplianceInPayrollInputMaintenanceOut The Service Interface DE Employer Regulatory Compliance in Payroll Input Maintenance Out is part of the following Process Integration Models: DE Employer Regulatory Compliance_Payroll Processing. The service interface DE Employer Regulatory Compliance in Payroll Input Maintenance Out groups operations which maintain DE employer regulatory compliance within Payroll Processing.

Notify of DE_Employee Tax Arrangement to Payroll (A2A)

DEEmployerRegulatoryComplianceDEEmployerRegulatoryComplianceInPayrollInputMaintenanceOut.

NotifyOfE_EmployeeTaxArrangementToPayrollProcessing. The operation Notify of DE_Employee Tax Arrangement can provide information on an employee's German tax arrangement to payroll processing.

DE_EmployeeTaxArrangementPayrollNotification message is based on Business Object DE_EmployeeTaxArrangement. After the relevant German employee tax arrangement information is updated in DE Employer Regulatory Compliance, the message type DE_EmployeeTaxArrangementPayrollNotification is sent to Payroll Processing to update the corresponding information in the object DE_EmployeePayrollInput.

Node Structure of Business Object: DE_EmployeeTaxArrangement

A DE_EmployeeTaxArrangement is the arrangement by the German tax authority for the employee concerning calculation and reporting of income tax deductions according to German legal requirements. It may contain information recorded from the tax card supplied to the employee (for example, tax authority, tax class, number of child tax exemptions), supplementary details (for example, tax table to be used, special rules) and details from previous employments in the current calendar year that are relevant for year-to-date amounts. In certain implementations, these elements include: UUID, EmployeeUUID, and MigratedDataAdaptationTypeCode.

UUID is a universal identification, which can be unique, of a DE_EmployeeTaxArrangement. The UUID may be based on GDT UUID. Employee UUID is a universal identification which can be unique, of an employee for whom the DE_EmployeeTaxArrangement is valid. The EmployeeUUID may be based on GDT UUID. MigratedDataAdaptationTypeCode is a coded representation of the type of data adaptation performed during migration of DE_EmployeeTaxArrangement data and is in some implementations optional. When migrating data from a source system to a target system this data may be adapted, for example, a business object or business document may be taken over completely or partially. The MigratedDataAdaptationTypeCode may be based on GDT MigratedDataAdaptationTypeCode. The MigratedDataAdaptationTypeCode is used, when a DE_EmployeeTaxArrangement is migrated.

DE_EmployeeTaxArrangement has a cardinality relationship of 1:n with subordinate node EmploymentItem 179038. From business object Employee/Employee to DE_EmployeeTaxArrangement there is a cardinality relationship of 1:c. Employee is the employee for whom the tax arrangement applies. The Employee is also used for access control to a DE_EmployeeTaxArrangement.

QueryByEmployeeID may select a list of DE EmployeeTaxArrangements that satisfy the selection criteria. The query elements are defined by the data type: DE_EmployeeTaxArrangementEmployeeIDQueryElements. In certain implementations, these elements include: EmployeeUUID, and EmployeeIdentificationEmployeeID. EmployeeUUID is a universal identification which can be unique, of the employee to whom the DE_EmployeeTaxArrangement applies and is in some implementations optional. The EmployeeUUID may be based on GDT UUID. EmployeeIdentificationEmployeeID is the ID of the assigned employee and is in some implementations optional. The EmployeeIdentificationEmployeeID may be based on GDT EmployeeID. The EmployeeIdentificationEmployeeID element may be stored on the Employee projection of the Business Object BusinessPartner in node Identification in element EmployeeID.

EmploymentItem

An EmploymentItem is the set of information used for German tax calculation and reporting purposes for one Employment. In certain implementations, these elements include: UUID, and EmploymentUUID. UUID is a universal identification, which can be unique, that identifies one EmploymentItem node and is an alternative. The UUID may be based on GDT UUID. EmploymentUUID is a universal identification, which can be unique, of an Employment for which the DE_EmployeeTaxArrangement is valid. The EmploymentUUID may be based on GDT UUID.

EmploymentItem has relationships with subordinate nodes EmploymentItemTaxCard 179040 and EmploymentItemSupplementaryDetails 179044. EmploymentItemTaxCard has a cardinality relationship of 1:cn. EmploymentItemSupplementaryDetails has a cardinality relationship of 1:cn.

The filter elements of EmploymentItemTaxCard are defined by the data type DE_EmployeeTaxArrangementEmploymentItemTaxCardFilterElements. These elements can include ValidityPeriod and RelativePeriodCode. ValidityPeriod is of type GDT: DatePeriod (with restriction CLOSED) and in certain implementations is optional. RelativePeriodCode is the coded representation of the period relative to the current date, is of type GDT: RelativePeriodCode, and in certain implementations is optional.

The filter elements of EmploymentItemSupplementaryDetails are defined by the data type DE_EmployeeTaxArrangementEmploymentItemSupplementaryDetailsFilterElements. These elements can include ValidityPeriod and RelativePeriodCode. ValidityPeriod is of type GDT: DatePeriod (with restriction CLOSED), and in certain implementations is optional. The RelativePeriodCode is the coded representation of the period relative to the current date. RelativePeriodCode is of type GDT: RelativePeriodCode and in certain implementations is optional.

Source defined Association Relationship

From business object Employment/Root node to Employment there is a cardinality relationship of 1:c. Employment is the employment for which the employee tax-relevant data and rules apply.

QueryByEmployeeAndEmployment selects a list of DE_EmployeeTaxArrangementEmploymentItems that satisfy the selection criteria. The query elements are defined by the data type: DE_EmployeeTaxArrangementEmploymentItemEmployeeAndEmploymentQueryElements. In certain implementations, these elements include: DE_EmployeeTaxArrangementEmployeeUUID, and EmploymentUUID. DE_EmployeeTaxArrangementEmployeeUUID is the employee to whom the DE_EmployeeTaxArrangement applies and is in certain implementations optional. The DE_EmployeeTaxArrangementEmployeeUUID may be based on GDT UUID. EmploymentUUID is in certain implementations optional. The EmploymentUUID may be based on GDT UUID.

Integrity

In certain implementations, the following combinations of elements in the nodes EmploymentItemSupplementaryDetails (IncomeTaxLiabilityCode, TaxExemptionReasonCode, FlatRateTaxRegulationCode) and EmploymentItemTaxCardDetails (EmployeeTaxationChurchCode) are allowed:

IncomeTaxLiabilityCodeTaxExemptionReasonCode FlatRateTaxRegulationCodeEmployeeTaxationChurchCode UnlimitedAllowedProhibitedRequired LimitedAllowedProhibitedProhibited Flat-rate taxProhibitedRequiredAllowed Tax exemptProhibitedProhibitedProhibited In certain implementations, the following shows the allowed combinations of the following elements within the nodes EmploymentItemSupplementaryDetails (IncomeTax- LiabilityCode) and EmploymentItemTaxCardDetails (EmployeeIncomeTaxClassCode). Furthermore, for the following elements within the node EmploymentItemTaxCardDetails it shows, in certain implementations, whether entries are allowed, required or prohibited for these combinations: EmployeeTaxationChildExemptionsValue and SpouseTaxationChurchCode.

| IncomeTaxLiabilityCode | EmployeeIncomeTaxClassCode | EmployeeTaxationChildExemptionsValue | SpouseTaxationChurchCode |
|---|---|---|---|
| Unlimited | 1 | Allowed | Prohibited |
| Unlimited | 2 | Required | Prohibited |
| Unlimited | 3 | Allowed | Allowed |
| Unlimited | 4 | Allowed | Allowed |
| Unlimited | 5 | Prohibited | Allowed |
| Unlimited | 6 | Prohibited | Allowed |
| Limited | None | Allowed | Prohibited |
| Limited | 1 | Allowed | Prohibited |
| Limited | 2 | Allowed | Prohibited |
| Limited | 3 | Allowed | Prohibited |
| Limited | 4 | Allowed | Prohibited |
| Limited | 5 | Allowed | Prohibited |
| Limited | 6 | Allowed | Prohibited |
| Flat-rate tax | None | Prohibited | Prohibited |
| Tax exempt | None | Prohibited | Prohibited |

In certain implementations, if the element IncomeTaxLiabilityCode in the node EmploymentItemSupplementaryDetails has the value 'Limited' and the element EmployeeIncomeTaxClassCode in the node EmploymentItemTaxCardDetails is empty, the value 'Cross border employee' is required in the element TaxExemptionReasonCode in the node EmploymentItemSupplementaryDetails. In certain implementations, if the element IncomeTaxLiabilityCode in the node EmploymentItemSupplementaryDetails has the value 'Flat-rate tax' or 'Tax exempt' no entry is allowed in the elements PersonalAnnualTaxExemptAmount and PersonalMonthlyTaxExemptAmount in the node EmploymentItemTaxCardDetails. In certain implementations, if the element IncomeTaxLiabilityCode in the node EmploymentItemSupplementaryDetails has the value 'Flat-rate tax' or 'Tax exempt' no entry is allowed in the elements AdditionalAnnualAmount and AdditionalMonthlyAmount in the node EmploymentItemTaxCardDetails.

EmploymentItemTaxCard

An EmploymentItemTaxCard is the tax card issued for the employee for a particular calendar year. A tax card is issued by the municipality where the employee is a resident. The tax card may contain the name and tax office number of the tax authority responsible for the employee's taxation, as well as information relevant to calculation of tax during the year. This card is sent by the municipality to the employee, who is then required to hand it in to her/his employer. The tax card is the means of communication between the employer and the municipality via the employee for changes relevant to taxation that occur during the year. An EmploymentItemTaxCard is in certain implementations only ever valid for one calendar year. In certain implementations, elements include UUID, and TaxCardYear. UUID is a universal identification, which can be unique, that identifies one TaxIdentification node. UUID may be based on GDT UUID. TaxCardYear is the year that the EmploymentItemTaxCard is issued for. TaxCardYear may be based on GDT Year, Qualifier TaxCard.

EmploymentItemTaxCard has relationships with subordinate nodes EmploymentItemTaxCardDetails, EmploymentItemTaxCardPreviousEmploymentDetails and DO: EmploymentItemTaxCardAttachmentFolder. EmploymentItemTaxCardDetails 179042 has a cardinality relationship of 1:n. EmploymentItemTaxCardPreviousEmploymentDetails 179046 has a cardinality relationship of 1:cn. DO EmploymentItemTaxCardAttachmentFolder 179050 has a cardinality relationship of 1:c.

The filter elements of EmploymentItemTaxCardDetails can be defined by the data type DE_EmployeeTaxArrangementEmploymentItemTaxCardDetailsFilterElements These elements can include ValidityPeriod and RelativePeriodCode. ValidityPeriod is of type GDT: DatePeriod (with restriction CLOSED) and in certain implementations is optional. The RelativePeriodCode is the coded representation of the period relative to the current date. RelativePeriodCode is of type GDT: RelativePeriodCode and in certain implementations is optional.

The filter elements of EmploymentItemTaxCardPreviousEmploymentDetails can be defined by the data type DE_EmployeeTaxArrangementEmploymentItemTaxCardPreviousEmploymentDetailsFilterElements. These elements can include ValidityPeriod and RelativePeriodCode. ValidityPeriod is of type GDT: DatePeriod (with restriction CLOSED) and in certain implementations is optional. The RelativePeriodCode is the coded representation of the period relative to the current date. RelativePeriodCode is of type GDT: RelativePeriodCode) in certain implementations is optional.

EmploymentItemTaxCardDetails

An EmploymentItemTaxCardDetails is the set of information taken from the tax card provided by the employee for a particular validity period. The tax card information may include, amongst others, information on the tax office to which payments and reporting requirements are submitted to; the municipality where the employee resides and which supplies the tax card to the employee; the employee's tax class; and the employee's entries for church tax. The validity period may be less than the calendar year to which it belongs, for example in the cases of new joiners, leavers, change of tax class, change to number of child exemptions. In certain implementations, an EmploymentItemTaxCardDetails includes UUID, ValidityPeriod, IssuingMunicipalityCode, EmployeeIncomeTaxClassCode, EmployeeTaxationChildExemptionsValue, EmployeeTaxationChurchCode, SpouseTaxationChurchCode, EmployeeTaxationChurchRegionCode, PersonalAnnualTaxExemptAmount, PersonalMonthlyTaxExemptAmount, AdditionalAnnualAmount, AdditionalMonthlyAmount, EmployeeTaxCardMissingReasonCode, and TaxCardIssueDate UUID is a universal identification, which can be unique, that identifies one TaxIdentification node. The UUID may be based on GDT UUID. ValidityPeriod is the validity period of the EmploymentItemTaxCardDetails. The ValidityPeriod may be based on GDT CLOSED_DatePeriod with restriction Duration is not used, Qualifier Validity. IssuingMunicipalityCode is the municipality number of the municipality where the employee resides and which issued the tax card to the employee and is in certain implementations optional. The IssuingMunicipalityCode may be based on GDT MunicipalityCode. EmployeeIncomeTaxClassCode is the class for income tax and is in certain implementations optional. The EmployeeIncomeTaxClassCode may be based on GDT EmployeeIncomeTaxClassCode. EmployeeTaxationChildExemptionsValue is the number of tax exemptions for children and is in certain implementations optional. The EmployeeTaxationChildExemptionsValue may be based on GDT EmployeeTaxationChildExemptionsValue. In certain implementations, only full and half exemptions exist. EmployeeTaxationChurchCode is the code for church denomination for paying church tax for the employee and is in certain implementations optional. The EmployeeTaxationChurchCode may be based on GDT EmployeeTaxationChurchCode.

Integrity: The entry for EmployeeTaxationChurchCode may be for a value allowed for the TaxationChurchRegionCode. SpouseTaxationChurchCode is the code for church denomination for paying church tax for the employee's spouse and is in certain implementations optional. The SpouseTaxationChurchCode may be based on GDT EmployeeTaxationChurchCode. Integrity: An entry for SpouseTaxationChurchCode is not allowed if no entry is made in element EmployeeTaxationChurchCode. The entry for SpouseTaxationChurchCode may be for a value allowed for the TaxationChurchRegionCode. EmployeeTaxationChurchRegionCode is the code for the area which is used for calculation of church tax rates and is in certain implementations optional. This may be determined according to the location of the permanent establishment of employment for the employee. The EmployeeTaxationChurchRegionCode may be based on GDT EmployeeTaxationChurchRegionCode. PersonalAnnualTaxExemptAmount is the annual tax-exempt amount used for tax calculations according to the annual table and is in certain implementations optional. The PersonalAnnualTaxExemptAmount may be based on GDT Amount, Qualifier TaxExempt with restriction CURRENCYEUR_MEDIUMINTEGER. Integrity: If the PersonalAnnualTaxExemptAmount is filled, then an entry may can be made in PersonalMonthlyTaxExemptAmount. PersonalAnnualTaxExemptAmount may can be rounded to a full Euro amount. PersonalMonthlyTaxExemptAmount is the monthly tax-exempt amount used for tax calculations according to the monthly table and is in certain implementations optional. The PersonalMonthlyTaxExemptAmount may be based on GDT Amount, Qualifier TaxExempt with restriction CURRENCYEUR_MEDIUMINTEGER. Integrity: If the PersonalMonthlyTaxExemptAmount is filled, then an entry may can be made in PersonalAnnualTaxExemptAmount. The PersonalMonthlyTaxExemptAmount cannot exceed the PersonalAnnualTaxExemptAmount. PersonalMonthlyTaxExemptAmount may can be rounded to a full Euro amount. AdditionalAnnualAmount is the annual amount to be added to taxable earnings and is in certain implementations optional. This amount may be used for tax calculations according to the annual table. The AdditionalAnnualAmount may be based on GDT Amount, Qualifier Additional with restriction CURRENCYEUR_MEDIUMINTEGER. Integrity: If the AdditionalAnnualAmount is filled, then an entry may can be made in AdditionalMonthlyAmount. AdditionalAnnualAmount may be rounded to a full Euro amount. AdditionalMonthlyAmount is the monthly amount to be added to taxable earnings and is in certain implementations optional. This amount may be used for tax calculations according to the annual table. The AdditionalMonthlyAmount may be based on GDT Amount, Qualifier Additional with restriction CURRENCYEUR_MEDIUMINTEGER. Integrity: If the AdditionalMonthlyAmount is filled, then an entry may can be made in AdditionalAnnualAmount. The AdditionalMonthlyAmount cannot exceed the AdditionalAnnualAmount. AdditionalMonthlyAmount may can be rounded to a full Euro amount. EmployeeTaxCardMissingReasonCode records the reason why the Employee has not submitted the tax card and is in certain implementations optional. The EmployeeTaxCardMissingReasonCode may be based on GDT EmployeeTaxCardMissingReasonCode. TaxCardIssueDate is the date that the tax card is handed back to the employee and is in certain implementations optional. The TaxCardIssueDate may be based on GDT Date. Integrity: In certain implementations, a date can only be entered if the EmployeeTaxCardMissingReasonCode has an entry. The date may lie within the validity period of the EmploymentItemTaxCardDetails. The date may not be later than today's date. The validity period shall be completely within the calendar year of the associated EmploymentItemTaxCard.

EmploymentItemTaxCardPreviousEmploymentDetails

An EmploymentItemTaxCardPreviousEmploymentDetails is the set of information of year-to-date amounts from a previous employment with this or another employer in the current calendar year that may be relevant to the calculation of tax for the current employment for a validity period. One entry may be made for each separate employment that the employee has had in the current calendar year. The validity period of the EmploymentItemTaxCardPreviousEmploymentDetails is the period within the year that the employee was employed in the previous employment. In certain implementations, the EmploymentItemTaxCardPreviousEmploymentDetails includes: UUID, ValidityPeriod, EmployeeIncomeTaxClassCode, EmployeeTaxationChildExemptionsValue, EmployeeTaxationChurchCode, SpouseTaxationChurchCode, SpecialIncomeTaxTableApplyIndicator, IncomeTaxLiabilityCode, and PeriodsWithoutEarningsEntitlementNumberValue.

UUID is a identification, which can be unique, that identifies one TaxIdentification node. The UUID may be based on GDT UUID. ValidityPeriod is the validity period of the previous employment. The ValidityPeriod may be based on GDT CLOSED_DatePeriod with restriction Duration is not used, Qualifier: Validity. EmployeeIncomeTaxClassCode is the class for income tax and is in certain implementations optional. The EmployeeIncomeTaxClassCode may be based on GDT EmployeeIncomeTaxClassCode. EmployeeTaxationChildExemptionsValue is the number of tax exemptions for children and is in certain implementations optional. EmployeeTaxationChildExemptionsValue may be based on GDT EmployeeTaxationChildExemptionsValue. In certain implementations, only full and half exemptions may exist.

EmployeeTaxationChurchCode is the code for church denomination for paying church tax for the employee and is in certain implementations optional. EmployeeTaxationChurchCode may be based on GDT EmployeeTaxationChurchCode. Integrity: An entry for EmployeeTaxationChurchCode may be required if EmploymentItemTaxCardPreviousEmploymentDetailsIncomeTaxLiabilityCode is 'Unlimited'. An entry for EmployeeTaxationChurchCode may not be allowed if EmploymentItemTaxCardPreviousEmploymentDetailsIncomeTaxLiabilityCode is 'Limited' or 'Tax exempt'. An entry for EmployeeTaxationChurchCode may be allowed if EmploymentItemSupplementaryDetailsIncomeTaxLiabilityCode is 'Flat-rate tax.'

SpouseTaxationChurchCode is the code for church denomination for paying church tax for the employee's spouse and is in certain implementations optional. SpouseTaxationChurchCode may be based on GDT EmployeeTaxationChurchCode. An entry for SpouseTaxationChurchCode may not be allowed if no entry is made in element EmployeeTaxationChurchCode. SpecialIncomeTaxTableApplyIndicator is an indicator that the special tax table applies for tax calculation according to German tax law. SpecialIncomeTaxTableApplyIndicator may be based on GDT Indicator, Qualifier Apply. Integrity: In the default scenario, this indicator is not set.

IncomeTaxLiabilityCode is the code for the basis for tax deductions depending on the employee's circumstances according to German tax law. The IncomeTaxLiabilityCode may be based on GDT IncomeTaxLiabilityCode. Integrity: The following shows the allowed combinations of the following elements within the node EmploymentItemTaxCardPreviousEmploymentDetails: IncomeTaxLiabilityCode and EmployeeIncomeTaxClassCode. Furthermore, for the following elements within EmploymentItemTaxCardPreviousEmploymentDetails it may show whether entries are allowed, required or prohibited for these combinations: EmployeeTaxationChildExemptionsValue and SpouseTaxationChurchCode.

IncomeTaxLiability EmployeeIncome EmployeeTaxationChild SpouseTaxationChurch
Code TaxClassCode ExemptionsValue Code
Unlimited1AllowedProhibited
Unlimited2RequiredProhibited
Unlimited3AllowedAllowed
Unlimited4AllowedAllowed
Unlimited5ProhibitedAllowed
Unlimited6ProhibitedAllowed
LimitedNoneAllowedProhibited
Limited1AllowedProhibited
Limited2AllowedProhibited
Limited3AllowedProhibited
Limited4AllowedProhibited
Limited5AllowedProhibited
Limited6AllowedProhibited
Flat-rate taxNoneProhibitedProhibited
Tax exemptNoneProhibitedProhibited PeriodsWithoutEarningsEntitlementNumberValue is the number of periods that the employee was not entitled to earnings with the previous employer in the current tax year (e.g. due to unpaid absence) and is in certain implementations optional. The PeriodsWithoutEarningsEntitlementNumberValue may be based on GDT NumberValue with restriction SMALL_, Qualifier PeriodNumberValue.

EmploymentItemTaxCardPreviousEmploymentDetails has a cardinality relationship of 1:cn with subordinate nodes EmploymentItemTaxCardPreviousEmploymentDetailsCertificatedAmounts 179048.

CreateEmploymentItemTaxCardPreviousEmploymentDetailsCertificatedAmountsTypes. This action may create the set of nodes for EmploymentItemTaxCardPreviousEmploymentDetailsCertificatedAmountsTypes that may be valid for the end date of the EmploymentItemTaxCardPreviousEmploymentDetailsValidityPeriod. Precondition:

The node EmploymentItemTaxCardPreviousEmploymentDetails has been created. An individual node may be created for each EmploymentItemTaxCardPreviousEmploymentDetailsCertificatedAmounts TaxDeclarationKeyNumberTypeCode. Each node can be created with an initial value of zero in EmploymentItemTaxCardPreviousEmploymentDetailsCertificatedAmountsTotalAmount. Parameters:

The EmploymentItemTaxCardPreviousEmploymentDetailsCertificatedAmounts TaxDeclarationKeyNumverTypeCodes may be defined as a subset of section V (titled "Lohnsteuerbescheinigung für das Kalenderjahr nnnn und besondere Angaben") of the current German tax card. The time-dependent list of the required certificated amounts types is recorded in ListID 'DE2' of the GDT TaxDeclarationKeyNumberTypeCode. Delimit: This action may delimit EmploymentItemTaxCardPreviousEmploymentDetails by setting the end date of its ValidityPeriod to the parameter value. If the date provided as action parameter is between the EmploymentItemTaxCardPreviousEmploymentDetails ValidityPeriod start date and end date, the end date may be set to the parameter date. Otherwise, the change can be refused by issuing an error message. The action elements are defined by the data type DelimitActionElements. In certain implementations, this element includes EndDate. The EndDate may be based on GDT Date.

The validity period of an EmploymentItemTaxCardPreviousEmploymentDetails may be completely within the calendar year of the associated EmploymentItemTaxCard. The validity period of an EmploymentItemTaxCardPreviousEmploymentDetails shall not intersect with the validity period of any EmploymentItemTaxCardDetails.

EmploymentItemTaxCardPreviousEmploymentDetailsCertificatedAmounts

An EmploymentItemTaxCardPreviousEmploymentDetailsCertificatedAmounts is the year-to-date amount for a single earnings type from a previous employment with this or another employer in the current calendar year that may be relevant to the calculation of tax with the current employment. Earnings types include, for example, taxable gross pay; income tax paid; reunification surcharge; and employee's church tax.

An EmploymentItemTaxCardPreviousEmploymentDetailsCertificatedAmounts contains, in certain implementations, TaxDeclarationNumberTypeCode and TotalAmount. TaxDeclarationKeyNumberTypeCode is the type of the earning or deduction from a previous employment. The TaxDeclarationKeyNumberTypeCode may be based on GDT TaxDeclarationKeyNumberTypeCode with restriction listID='DE2'. Examples of types of earnings or deductions may include: gross remuneration; income tax; reunification tax. TotalAmount is the value of the certificated amount for the respective type and is in certain implementations optional. The TotalAmount may be based on GDT Amount, Qualifier Total with restriction CURRENCYEUR_MEDIUM.

EmploymentItemTaxCardAttachmentFolder

An EmploymentItemTaxCardAttachmentFolder is the folder that contains tax card relevant documents for an EmploymentItemTaxCard. The scanned document would generally be the tax card for the relevant year. If the tax card is changed during the year, the EmploymentItemTaxCardAttachmentFolder may contain each version of the tax card.

EmploymentItemSupplementaryDetails

An EmploymentItemSupplementaryDetails is the set of information details relevant to the tax calculation and reporting that are not supplied on the tax card. The supplementary details may include, among others, information on a code for tax liability; a code for flat rate tax; a code for regulations for cross border commuters (for example, Belgium; Switzerland); and a code for processing rules for Elster. In certain implementations, EmploymentItemSupplementaryDetails may include: UUID, ValidityPeriod, IncomeTaxLiabilityCode, EmployeeFlatRateTaxRegulationCode, TaxExemptionReasonCode CrossBorderEmployeeDoubleTaxationTreatyResidenceCountryCode, TaxPassOntoEmployeeApplyIndicator, EmployersAllowanceEmploymentMainIndicator, SpecialIncomeTaxTableApplyIndicator, AnnualEmploymentTaxAdjustmentBlockedIndicator, EmployeeRetroactiveTaxationCode, ElectronicTaxpayerIdentificationNumberID, and EmploymentTaxStatementCreationConditionCode.

UUID is an identification, which can be unique, that identifies one TaxIdentification node. The UUID may be based on GDT UUID. ValidityPeriod is the validity period of the EmploymentItemSupplementaryDetails. The ValidityPeriod may be based on GDT CLOSED_DatePeriod with restriction Duration is not used, Qualifier: Validity.

IncomeTaxLiabilityCode is the code for the basis for tax deductions depending on the employee's circumstances according to German tax law and is in certain implementations optional. The IncomeTaxLiabilityCode may be based on GDT IncomeTaxLiabilityCode.

EmployeeFlatRateTaxRegulationCode is the code for making tax deductions at a flat rate according to German tax law and is in certain implementations optional. The EmployeeFlatRateTaxRegulationCode may be based on GDT EmployeeFlatRateTaxRegulationCode.

TaxExemptionReasonCode specifies the reason why the employee is exempt from taxation and is in certain implementations optional. The TaxExemptionReasonCode may be based on GDT TaxExemptionReasonCode. Valid reasons for exemption from tax may be: double taxation convention, waiver due to employment abroad, cross border employee.

CrossBorderEmployeeDoubleTaxationTreatyResidenceCountryCode is a code to show which country an employee who works in Germany and crosses the border daily to travel to work lives in and is in certain implementations optional. Depending on the country the employee is resident in, this may affect her/his liability for tax under German law. In certain implementations, this is only valid for commuters living in Belgium or Switzerland. The CrossBorderEmployeeDoubleTaxationTreatyResidenceCountryCode may be based on GDT CrossBorderEmployeeDoubleTaxationTreatyResidenceCountryCode.

TaxPassOntoEmployeeApplyIndicator is an indicator that the liability for paying flat-rate tax deductions passed on from the employer to the employee applies. TaxPassOntoEmployeeApplyIndicator may be based on GDT Indicator, Qualifier Apply. Integrity: In certain implementations, an entry may only be made for TaxPassOntoEmployeeApplyIndicator if EmploymentItemSupplementaryDetailsIncomeTaxLiabilityCode is entered as ‘Flat-rate tax.’ In certain implementations, the TaxPassOntoEmployeeApplyIndicator can only be set if an entry has been made for the EmploymentItemSupplementaryDetailsFlatRateTaxRegulationCode.

EmployersAllowanceEmploymentMainIndicator is an indicator that this is the main employment that the employee has and that this is subject to a tax allowance when the employee also has further employments that may affect her/his tax liability. The EmployersAllowanceEmploymentMainIndicator may be based on GDT Indicator, Qualifier Main. Integrity: In certain implementations, the EmployersAllowanceEmploymentMainIndicator can only be set if an entry has been made for the EmploymentItemSupplementaryDetailsFlatRateTaxRegulationCode. In certain implementations, this is only valid for public sector employees. In certain implementations, the indicator is only set if the employee has further employments.

SpecialIncomeTaxTableApplyIndicator is an indicator that the special tax table applies for tax calculation according to German tax law. The SpecialIncomeTaxTableApplyIndicator may be based on GDT Indicator, Qualifier Apply. Integrity: In the default scenario, this indicator is not set and the general tax table is used. If the EmploymentItemSupplementaryDetailsIncomeTaxLiabilityCode is recorded as ‘Flat-rate tax’ neither the general nor the special tax table is used in the tax calculation, and any entry in the EmploymentItemSupplementaryDetailsSpecialIncomeTaxTableApplyIndicator may be ignored in the payroll processing.

AnnualEmploymentTaxAdjustmentBlockedIndicator is an indicator that an annual employment tax adjustment cannot be carried out by the employer for the employee. The employee is responsible for this decision. The AnnualEmploymentTaxAdjustmentBlockedIndicator may be based on GDT Indicator, Qualifier Blocked. The employee is responsible for this decision, for example, in specific circumstances such as when the employee may not have been employed for the whole year or may have been employed abroad during the year.

EmployeeRetroactiveTaxationCode records whether backdated calculation of tax is subject to the ‘taxed when paid’ principle or ‘taxed when earned’ principle overriding the standard process and is in certain implementations optional. This code may be set according to specific rules based on employee’s circumstances. The EmployeeRetroactiveTaxationCode may be based on GDT EmployeeRetroactiveTaxationCode.

ElectronicTaxpayerIdentificationNumberID is a means to identify individuals for tax purposes. The Electronic Taxpayer Identification Number, or aTIN, is generated according to a defined algorithm using the taxpayer’s name and date of birth (unfortunately this may not be unique) taken from the tax card. ElectronicTaxpayerIdentificationNumberID may be based on GDT PartyTaxID with restriction: SchemeID ‘DE5.’ In certain implementations, this element is not persistent. The eTIN is currently fourteen characters long (four characters for surname at birth; four characters for first name at birth; two characters for year of birth; one character for letter representing month of birth; two characters for day of birth; one check character according to algorithm of previous thirteen characters). The German Government is planning to expand this to eighteen characters to incorporate the place of birth so as to eliminate the chances of duplicate eTINs with the same employer. The eTIN is sometimes referred to in German as “elektronische TransferIdentifikations-Number.” Although this fits the abbreviation and is comprehensible in the German language, it is an inaccurate and unofficial term for eTIN.

EmploymentTaxStatementCreationConditionCode is the code for the procedure for submitting an electronic tax return and is in certain implementations optional. The code may record whether an electronic tax return can be submitted; cannot be submitted; or can be submitted. The EmploymentTaxStatementCreationConditionCode may be based on GDT EmploymentTaxStatementCreationConditionCode. Integrity: In certain implementations, the EmploymentTaxStatementCreationConditionCode can only be entered as ‘Can be submitted’ if EmploymentItemSupplementaryDetailsIncomeTaxLiabilityCode is entered as ‘Flat-rate tax.’

FIG. 180 illustrates one example logical configuration of DE_EmployeeTaxArrangementMessage message 180000. Specifically, this figure depicts the arrangement and hierarchy of various components such as one or more levels of packages, entities, and datatypes, shown here as 180000 though 180088. As described above, packages may be used to represent hierarchy levels. Entities are discrete business elements that are used during a business transaction. Data types are used to type object entities and interfaces with a structure. For example, DE_EmployeeTaxArrangementMessage message 180000 includes, among other things, DE_EmployeeTaxArrangement 18004. Accordingly, heterogeneous applications may communicate using this consistent message configured as such.

FIG. 181-1 through 181-12 illustrates one example logical configuration of DE_EmployeeTaxArrangementMessage message 181000. Specifically, this figure depicts the arrangement and hierarchy of various components such as one or more levels of packages, entities, and datatypes, shown here as 181000 through 181374. As described above, packages may be used to represent hierarchy levels. Entities are discrete business elements that are used during a business transaction.

Data types are used to type object entities and interfaces with a structure. For example, DE_EmployeeTaxArrangementMessage message 181000 includes, among other things, DE_EmployeeTaxArrangement 181028. Accordingly, heterogeneous applications may communicate using this consistent message configured as such.

Message Types and their Signatures

This section describes the message types and their signatures that are derived from the operations of the business object DE_EmployeeTaxArrangement. In a signature, the business object may be contained as a "leading" business object. The message data type may determine the structure of the following message types. In order for a payroll system to calculate German tax deductions and carry out related legal reporting for an employee, certain employee specific data is stored in the Business Object DE_EmployeeTaxArrangement. This data can be transmitted initially and any changes to it in a timely manner to the payroll provider so these tasks can be performed. The Business Object DE_EmployeeTaxArrangement is part of: the Process Component DE Employer Regulatory Compliance, and the Logical Deployable Unit Human Capital Management Message Type DE_EmployeeTaxArrangementPayrollNotification A DE_EmployeeTaxArrangementPayrollNotification is a notification to the payroll of an employee's tax information. Employee tax information is required to correctly calculate tax deductions and transfer these to the tax authority. In addition, the employee's tax information may be used for tax reporting purposes. The structure of this message type is determined by the message data type DE_EmployeeTaxArrangementMessage. For details of constraints on the structure and integrity conditions of DE_EmployeeTaxArrangementPayrollNotification that may be imposed by message data type DE_EmployeeTaxArrangementMessage. This message type is used in the following operations of business objects: DE_EmployeeTaxArrangement, NotifyOfDE_EmployeeTaxArrangement, and DE_EmployeePayrollInput, MaintainDE_EmployeePayrollInputBasedOnTaxArrangement.

DE_EmployeeTaxArrangementMessage

This message data type contains the object DE_EmployeeTaxArrangement which is contained in the business document, and the business information that is relevant for sending a business document in a message. It contains the packages: MessageHeader package and DE_EmployeeTaxArrangement package. This message data type, therefore, may provide the structure for the following message types and the operations that are based on them: DE EmployeeTaxArrangementPayrollNotification.

MessageHeader Package

A MessageHeaderPackage is a grouping of business information that is relevant for sending a business document in a message. It may contain the entity: MessageHeader. A MessageHeader is a grouping of business information from the perspective of the sending application: Information to identify the business document in a message, Information about the sender, and optionally Information about the recipient. The MessageHeader contains: SenderParty, and RecipientParty. It is of the type GDT: BusinessDocumentMessageHeader, and all elements of the GDT may be used.

A SenderParty is the partner responsible for sending a business document at business application level. The SenderParty is of the type GDT: BusinessDocumentMessageHeaderParty. A RecipientParty is the partner responsible for receiving a business document at business application level. The RecipientParty is of the type GDT: BusinessDocumentMessageHeaderParty.

DE_EmployeeTaxArrangement Package

DE_EmployeeTaxArrangement Package is the grouping of DE_EmployeeTaxArrangement with its entity EmploymentItem. EmploymentItem has a cardinality relationship of 1..n.

DE_EmployeeTaxArrangement

In certain implementations, the elements include: ReconciliationPeriodCounterValue, UUID, and EmployeeUUID. ReconciliationPeriodCounterValue has a cardinality relationship of 1. ReconciliationPeriodCounterValue may be based on GDT ReconciliationPeriodCounterValue. UUID has a cardinality relationship of 1. UUID may be based on GDT UUID. EmployeeUUID has a cardinality relationship of 1. EmployeeUUID may be based on GDT UUID. Integrity conditions may have already been checked by the leading business object.

EmploymentItem

EmploymentItem may be grouped with the following entities: EmploymentItemTaxCard has a cardinality relationship of 0..n, and EmploymentItemSupplementaryDetails has a cardinality relationship of 0..n. No entry. In certain implementations, the elements may include: EmploymentItemTaxCardListCompleteTransmissionIndicator, EmploymentItemSupplementaryDetailsListCompleteTransmissionIndicator, and EmploymentUUID.

EmploymentItemTaxCardListCompleteTransmissionIndicator has a cardinality relationship of 1. EmploymentItemTaxCardListCompleteTransmissionIndicator may be based on GDT Indicator, Qualifier CompleteTransmission. EmploymentItemSupplementaryDetailsListCompleteTransmissionIndicator has a cardinality relationship of 1. EmploymentItemSupplementaryDetailsListCompleteTransmissionIndicator may be based on GDT Indicator, Qualifier CompleteTransmission. EmploymentUUID has a cardinality relationship of 1. EmploymentUUID may be based on GDT UUID. Integrity conditions may have already been checked by the leading business object.

EmploymentItemTaxCard

EmploymentItemTaxCard may be grouped with the following entities: EmploymentItemTaxCardDetails has a cardinality relationship of 0..n, and EmploymentItemTaxCardPreviousEmploymentDetails has a cardinality relationship of 0..n. In certain implementations, the elements may include: ActionCode, EmploymentItemTaxCardDetailsListCompleteTransmissionIndicator, EmploymentItemTaxCardPreviousEmploymentDetailsListCompleteTransmissionIndicator, UUID, and TaxCardYear. ActionCode has a cardinality relationship of 1. ActionCode may be based on GDT ActionCode. EmploymentItemTaxCardDetailsListCompleteTransmissionIndicator has a cardinality relationship of 1. EmploymentItemTaxCardDetailsListCompleteTransmissionIndicator may be based on GDT Indicator, Qualifier CompleteTransmission. EmploymentItemTaxCardPreviousEmploymentDetailsListCompleteTransmissionIndicator has a cardinality relationship of 1. EmploymentItemTaxCardPreviousEmploymentDetailsListCompleteTransmissionIndicator may be based on GDT Indicator, Qualifier CompleteTransmission. UUID has a cardinality relationship of 1. UUID may be based on GDT UUID. TaxCardYear has a cardinality relationship of 0..1. TaxCardYear may be based on GDT Year, Qualifier TaxCard.

If the value of the attribute ActionCode is “Delete” only the UUID may be filled. If the value of the attribute ActionCode is other than “Delete”, then TaxCardYear can also be filled. Integrity conditions for the content of the elements may have already been checked by the leading business object.

EmploymentItemTaxCardDetails

EmploymentItemTaxCardDetails may contain the elements: ActionCode, UUID, ValidityPeriod, IssuingMunicipalityCode, EmployeeIncomeTaxClassCode, EmployeeTaxationChildExemptionsValue, EmployeeTaxationChurchCode, SpouseTaxationChurchCode, EmployeeTaxationChurchRegionCode, PersonalAnnualTaxExemptAmount, PersonalMonthlyTaxExemptAmount, AdditionalAnnualAmount, AdditionalMonthlyAmount, and EmployeeTaxCardMissingReasonCode.

ActionCode has a cardinality relationship of 1. The ActionCode may be based on GDT ActionCode. UUID has a cardinality relationship of 1. The UUID may be based on GDT UUID. ValidityPeriod has a cardinality relationship of 0..1. The ValidityPeriod may be based on GDT CLOSED_DatePeriod with restriction Duration is not used, Qualifier Validity. IssuingMunicipalityCode has a cardinality relationship of 0..1. The IssuingMunicipalityCode may be based on GDT MunicipalityCode. EmployeeIncomeTaxClassCode has a cardinality relationship of 0..1. The EmployeeIncomeTaxClassCode may be based on GDT EmployeeIncomeTaxClassCode. EmployeeTaxationChildExemptionsValue has a cardinality relationship of 0..1. The EmployeeTaxationChildExemptionsValue may be based on GDT EmployeeTaxationChildExemptionsValue. EmployeeTaxationChurchCode has a cardinality relationship of 0..1. The EmployeeTaxationChurchCode may be based on GDT EmployeeTaxationChurchCode. SpouseTaxationChurchCode has a cardinality relationship of 0..1. The Spouse TaxationChurchCode may be based on GDT EmployeeTaxationChurchCode. EmployeeTaxationChurchRegionCode has a cardinality relationship of 0..1. The EmployeeTaxationChurchRegionCode may be based on GDT EmployeeTaxationChurchRegionCode. PersonalAnnualTaxExemptAmount has a cardinality relationship of 0..1. The PersonalAnnualTaxExemptAmount may be based on GDT Amount, Qualifier TaxExempt with restriction CURRENCYEUR_MEDIUMINTEGER. PersonalMonthlyTaxExemptAmount has a cardinality relationship of 0..1. The PersonalMonthlyTaxExemptAmount may be based on GDT Amount, Qualifier TaxExempt with restriction CURRENCYEUR_MEDIUMINTEGER. AdditionalAnnualAmount has a cardinality relationship of 0..1. The AdditionalAnnualAmount may be based on GDT Amount, Qualifier Additional with restriction CURRENCYEUR_MEDIUMINTEGER. AdditionalMonthlyAmount has a cardinality relationship of 0..1 The AdditionalMonthlyAmount may be based on GDT Amount, Qualifier Additional with restriction CURRENCYEUR_MEDIUMINTEGER. EmployeeTaxCardMissingReasonCode has a cardinality relationship of 0..1. The EmployeeTaxCardMissingReasonCode may be based on GDT EmployeeTaxCardMissingReasonCode.

If the value of the attribute ActionCode is “Delete” only the UUID may be filled. If the value of the attribute ActionCode is other than “Delete”, then ValidityPeriod can also be filled. Integrity conditions for the content of the elements may have already been checked by the leading business object.

EmploymentItemTaxCardPreviousEmploymentDetails

The grouping of EmploymentItemTaxCardPreviousEmploymentDetails may contain the entities: EmploymentItemTaxCardPreviousEmploymentDetailsCertificatedAmounts has a cardinality relationship of 0..n.

EmploymentItemTaxCardPreviousEmploymentDetails may contains the elements: ActionCode, UUID, ValidityPeriod, EmployeeIncomeTaxClassCode, EmployeeTaxationChildExemptionsValue, EmployeeTaxationChurchCode, SpouseTaxationChurchCode, SpecialIncomeTaxTableApplyIndicator, IncomeTaxLiabilityCode, and PeriodsWithoutEarningsEntitlementNumberValue.

ActionCode has a cardinality relationship of 1. The ActionCode may be based on GDT ActionCode. UUID has a cardinality relationship of 1. The UUID may be based on GDT UUID. ValidityPeriod has a cardinality relationship of 0..1. The ValidityPeriod may be based on GDT CLOSED_DatePeriod with restriction Duration is not used, Qualifier Validity. EmployeeIncomeTaxClassCode has a cardinality relationship of 0..1. The EmployeeIncomeTaxClassCode may be based on GDT EmployeeIncomeTaxClassCode. EmployeeTaxationChildExemptionsValue has a cardinality relationship of 0..1. The EmployeeTaxationChildExemptionsValue may be based on GDT EmployeeTaxationChildExemptionsValue. EmployeeTaxationChurchCode has a cardinality relationship of 0..1. The EmployeeTaxationChurchCode may be based on GDT EmployeeTaxationChurchCode. SpouseTaxationChurchCode has a cardinality relationship of 0..1. The SpouseTaxationChurchCode may be based on GDT EmployeeTaxationChurchCode. SpecialIncomeTaxTableApplyIndicator has a cardinality relationship of 1. The SpecialIncomeTaxTableApplyIndicator may be based on GDT Indicator, Qualifier Apply. IncomeTaxLiabilityCode has a cardinality relationship of 0..1. The IncomeTaxLiabilityCode may be based on GDT IncomeTaxLiabilityCode. PeriodsWithoutEarningsEntitlementNumberValue has a cardinality relationship of 0..1. PeriodsWithoutEarningsEntitlementValue may be based on GDT SMALL_NumberValue, Qualifier PeriodsNumberValue. If the value of the attribute ActionCode is “Delete” only the UUID may be filled. If the value of the attribute ActionCode is other than “Delete”, then ValidityPeriod andIncomeTaxLiabilityCode can also be filled. Integrity conditions for the content of the elements may have already been checked by the leading business object.

EmploymentItemTaxCardPreviousEmploymentDetailsCertificatedAmounts

EmploymentItemTaxCardPreviousEmploymentDetailsCertificatedAmounts may contain the elements: TaxDeclarationKeyNumberTypeCode, and TotalAmount. TaxDeclarationKeyNumberTypeCode has a cardinality relationship of 1. The TaxDeclarationKeyNumberTypeCode may be based on GDT TaxDeclarationKeyNumberTypeCode with restriction: listID=‘DE2.’ TotalAmount has a cardinality relationship of 0..1. The TotalAmount may be based on GDT Amount with Restriction CURRENCYEUR_MEDIUM, Qualifier: Total.

The entity EmploymentItemTaxCardPreviousEmploymentDetailsCertificatedAmounts may have no attribute ActionCode, therefore the complete list of nodes from the leading business object can be included in the message transmission if information from the entity EmploymentItemTaxCardPreviousEmploymentDetails is included in the message transmission. Integrity conditions for the content of the elements may have already been checked by the leading business object.

EmploymentItemSupplementaryDetails

DE_EmployeeTaxArrangement may contain the elements: ActionCode, UUID, ValidityPeriod, IncomeTaxLiability- Code, EmployeeFlatRateTaxRegulationCode, TaxExemptionReasonCode, CrossBoarderEmployeeDoubleTaxationTreatyResidenceCountryCode, TaxPassOntoEmployeeApplyIndicator, EmployersAllowanceEmploymentMainIndicator, SpecialIncomeTaxTableApplyIndicator, AnnualEmploymentTaxAdjustmentBlockedIndicator, EmployeeRetroactiveTaxationCode, and EmploymentTaxStatementCreationConditionCode.

ActionCode has a cardinality relationship of 1. The ActionCode may be based on GDT ActionCode. UUID has a cardinality relationship of 1. The UUID may be based on GDT UUID. ValidityPeriod has a cardinality relationship of 0..1. The ValidityPeriod may be based on GDT CLOSED_DatePeriod with restriction Duration is not used, Qualifier Validity. IncomeTaxLiabilityCode has a cardinality relationship of 0..1. The IncomeTaxLiabilityCode may be based on GDT IncomeTaxLiabilityCode. EmployeeFlatRateTaxRegulationCode has a cardinality relationship of 0..1. The EmployeeFlatRateTaxRegulationCode may be based on GDT EmployeeFlatRateTaxRegulationCode. TaxExemptionReasonCode has a cardinality relationship of 0..1. The TaxExemptionReasonCode may be based on GDT TaxExemptionReasonCode. CrossBorderEmployeeDoubleTaxationTreatyResidenceCountryCode has a cardinality relationship of 0..1. The CrossBorderEmployeeDoubleTaxationTreatyResidenceCountryCode may be based on GDT CrossBorderEmployeeDoubleTaxationTreatyResidenceCountryCode. TaxPassOntoEmployeeApplyIndicator has a cardinality relationship of 1. The TaxPassOntoEmployeeApplyIndicator may be based on GDT Indicator, Qualifier Apply. EmployersAllowanceEmploymentMainIndicator has a cardinality relationship of 1. The EmployersAllowanceEmploymentMainIndicator may be based on GDT Indicator, Qualifier Main. SpecialIncomeTaxTableApplyIndicator has a cardinality relationship of 1. The SpecialIncomeTaxTableApplyIndicator may be based on GDT Indicator, Qualifier Apply. AnnualEmploymentTaxAdjustmentBlockedIndicator has a cardinality relationship of 1. The AnnualEmploymentTaxAdjustmentBlockedIndicator may be based on GDT Indicator, Qualifier Blocked. EmployeeRetroactiveTaxationCode has a cardinality relationship of 0..1. The EmployeeRetroactiveTaxationCode may be based on GDT EmployeeRetroactiveTaxationCode. EmploymentTaxStatementCreationConditionCode has a cardinality relationship of 0..1. The EmploymentTaxStatementCreationConditionCode may be based on GDT EmploymentTaxStatementCreationConditionCode.

If the value of the attribute ActionCode is "Delete" only the UUID may be filled. If the value of the attribute ActionCode is other than "Delete", then ValidityPeriod can also be filled. Integrity conditions for the content of the elements may have already been checked by the leading business object.

FIG. 182 illustrates an example EmployeeCompensationAgreement business object model 182010. Specifically, this model depicts interactions among various hierarchical components of the EmployeeCompensationAgreement, as well as external components that interact with the EmployeeCompensationAgreement (shown here as 182000 through 182008 and 182012 through 182024).

Business Object EmployeeCompensationAgreement

In some implementations, an EmployeeCompensationAgreement is the set of rules governing an employee's compensation. The business object EmployeeCompensationAgreement is part of the process component Compensation Management. An EmployeeCompensationAgreement can contain items containing compensation-relevant rules pertaining to an employee. EmployeeCompensationAgreement may be represented by the root node EmployeeCompensationAgreement.

Service Interfaces

The Business Object may be involved in the Compensation Management_Payroll Processing Process Component Interaction Model. The technical name of Service Interface ECA Payroll Input Maintenance Out is CompensationManagementEmployeeCompensationAgreementInPayrollInputMaintenanceOut. The Service Interface ECA Payroll Input Maintenance Out is part of the following Process Component Interaction Model: Compensation Management_Payroll Processing. The EmployeeCompensationAgreement Payroll Input Maintenance Out service interface can group the operations that inform Payroll about payroll-relevant data from Compensation.

The technical name of Notify of EmployeeCompensationAgreement is CompensationManagementEmployeeCompensationAgreementInPayrollInputMaintenanceOut.NotifyOfEmployeeCompensationAgreement. The operation may be based on message type EmployeeCompensationAgreementPayrollNotification (derived from business object EmployeeCompensationAgreement).

Node Structure of Business Object EmployeeCompensationAgreement

Employee Compensation Agreement (Root Node)

In some implementations, an EmployeeCompensationAgreement 182026 is the set of rules governing an employee's compensation. In certain implementations, the EmployeeCompensationAgreement contains a UUID and EmployeeUUID. UUID is a universal identifier, which can be unique, of the EmployeeCompensationAgreement and may be based on GDT UUID. EmployeeUUID is a universal identifier, which can be unique, of an employee for whom the EmployeeCompensationAgreement is valid. The EmployeeUUID may be based on GDT UUID.

The EmployeeCompensationAgreement has a cardinality relationship of 1:cn with an Item 182028 subordinate node. Inbound Aggregation Relationships from business object Employee may exist with a cardinality relationship of 1:cn. Compensation rules may apply to Employee and may be used for access control to an Employee Compensation Agreement. In certain implementations, it is not possible to change an employee's assignment to an EmployeeCompensationAgreement.

In some implementations, QueryByElements provides a list of all EmployeeCompensationAgreements, which satisfy the selection criteria, specified by the query Elements, combined by logical "AND". The GDT EmployeeCompensationAgreementElementsQueryElements may define the query elements EmployeeUUID, EmployeeID (GDT of type EmployeeID), EmployeeFamilyName, EmployeeGivenName, UUID (GDT of type UUID), EmploymentUUID (GDT of type UUID), WorkAgreementUUID (GDT of type UUID), KeyDate, ItemCompensationStructureGradeAssignmentCompensationStructureUUID (GDT of type UUID) ItemCompensationStructureGradeAssignmentCompensationStructureID (GDT of type CompensationStructureID), ItemCompensationStructureGradeAssignmentCompensationStructureGradeUUID (GDT of type UUID), ItemCompensationStructureGradeAssignmentCompensationStructureGradeID (GDT of type CompensationStructureGradeID), ItemCompensationComponentCompensationComponentTypeUUID (GDT of type UUID), ItemCompensationComponentCompensationComponentTypeID (GDT of type CompensationComponentTypeID), ItemCompensationComponentEmployeeBankDetailsKey (GDT of type BusinessPartnerBankDetailsKey), ItemCompensationComponentDetailActiveIndicator, ItemCompensationComponentDetailRatePayrollRelevanceIndicator, ReportingLineUnitID, WorkAgreementTypeCode. GDT EmployeeFamilyName is of type LANGUAGEINDEPENDENT_MEDIUM_Name and can have a qualifier such as Family. The family name of the employee that holds the work agreement matches to the query element EmployeeFamilyName. EmployeeGivenName is a GDT of type LANGUAGEINDEPENDENT_MEDIUM_Name and can have a qualifier such as Given. The given name of the employee that holds the work agreement matches to the query element EmployeeGivenName. KeyDate is a GDT of type Date, may have a qualifier such as Key, and is the key date on which time-dependent data of the EmployeeCompensationAgreement is read. ItemCompensationComponentDetailActiveIndicator is a GDT of type Indicator and may have a qualifier such as Active. ItemCompensationComponentDetailRatePayrollRelevanceIndicator is a GDT of type Indicator and may have a qualifier such as Relevance. ReportingLineUnitID is a GDT of type OrganisationalCentreID and may be the ID of the reporting line unit assigned to the employee by the work agreement matches to the query element ReportingLineUnitID. WorkAgreementTypeCode is a GDT of type WorkAgreementTypeCode and may be the type of work agreement between employer and employee. HireDate is a GDT of the type Date and may have a qualifier such as Hire.

Item

In some implementations, an Item is the set of compensation-relevant rules for an employee which apply on the basis of a specific Employment or WorkAgreement. The elements located directly at the node Item can be defined by the type GDT EmployeeCompensationAgreementItemElements. In certain implementations, these elements include UUID, EmploymentUUID, and WorkAgreementUUID. UUID is a universal identifier, which can be unique, of an Item and may be based on GDT UUID. EmploymentUUID is an universal identifier, which can be unique, of an Employment for which the EmployeeCompensationAgreement is valid, and is optional. The EmploymentUUID may be based on GDT UUID. WorkAgreementUUID is an universal identifier, which can be unique, of a WorkAgreement for which the EmployeeCompensationAgreementItem is valid, and is optional. The WorkAgreementUUID may be based on GDT UUID.

There may exist a number of composition relationships to the following subordinate nodes:

1) from ItemCompensationStructureGradeAssignment 182030 may be a cardinality relationship of 1 to cn and may be subject to filter elements. The filter elements are defined by the data type EmployeeCompensationAgreementItemCompensationStructureGradeAssignmentFilterElements. These elements may include ValidityPeriod (GDT of type CLOSED_DatePeriod) and RelativePeriodCode (GDT of type CURRENTDAYFROMTODAYON_RelativePeriodCode). In certain implementations, there can be one assignment to a CompensationStructureGrade at any one time.

2) from ItemCompensationComponent 182032 may be a cardinality relationship of 1 to cn and may be subject to filter elements. The filter elements are defined by the data type EmployeeCompensationAgreementItemCompensationComponentFilterElements. These elements may include CompensationComponentCategoryCode (GDT of type CompensationComponentCategoryCode) and CompensationComponentOccurenceTypeCode (GDT of type CompensationComponentOccurenceTypeCode).

3) from ItemCompaRatio (TN) 182040 may be a cardinality relationship of 1 to cn and may be subject to filter elements. The filter elements are defined by the data type EmployeeCompensationAgreementItemCompaRatioFilterElements. These elements may include KeyDate, which is a GDT of type Date and may have possible qualifiers such as Key. If KeyDate is not passed, then by default system date may be used for calculation. Another exemplary filter is RelativePeriodCode, a GDT of type CURRENTDAY_RelativePeriodCode. In certain implementations, there can be one ItemCompaRatio at any one time.

4) from ItemRangePenetration (TN) 182042 may be a cardinality relationship of 1 to cn and may be subject to filter elements. The filter elements are defined by the data type EmployeeCompensationAgreementItemRangePenetrationFilterElements. These elements may include KeyDate and RelativePeriodCode. KeyDate is a CDT of type Date which may have a qualifier such as Key. If the date KeyDate is not passed, then by default system date may be used for calculation. RelativePeriodCode is a GDT of type CURRENTDAY_RelativePeriodCode. In certain implementations, there can be one ItemCompaRatio at any one time.

5) from ItemEstimatedGrossEarnings (TN) 182042 may be a cardinality relationship of 1 to cn and may be subject to filter elements. The filter elements are defined by the data type EmployeeCompensationAgreementItemEstimatedGrossEarningsFilterElements. These elements may include KeyDate and RelativePeriodCode. KeyDate is a GDT of type Date which may have a qualifier such as Key. If the date KeyDate is not passed, then by default system date may be used for calculation. RelativePeriodCode is a GDT of type CURRENTDAY_RelativePeriodCode.

6) from DO: ItemAttachment Folder may be a cardinality of 1 to c.

There may be a number of inbound association relationships including:

1) from Employment may be a cardinality of c to c to which the compensation-relevant data and rules of the Item apply.

2) from WorkAgreement may be a cardinality of c to c to which the compensation-relevant data and rules of the Item apply.

Associations for navigation may exist to business object ECA or node ItemCompensationStructureGradeAssignment. Association may include LatestValidCompensationStructureGradeAssignment, with a cardinality relationship of c to c, to determine the Grade Assignment of the latest validity.

In some implementations, WorkAgreementUUID and EmploymentUUID may not both be filled. There may not be more than one ItemCompaRatio at any one time. There may not be more than one ItemRangePenetration at any one time. There may not be more than one ItemEstimatedGrossEarnings at any one time.

In certain implementations, the following enterprise service infrastructure actions may exist.

1) CreateCompensationComponentsWithProposal can provide the EmployeeCompensationAgreement with compensation component proposals from the structure. One precondition that may be required is that the EmployeeCompensationAgreementItem is assigned to a CompensationStructureGrade. ItemCompensationComponents may be proposed from the structure if GradeCompensationComponentDefaults have been maintained there. After calling the action, the proposals from the structure are available as new ItemCompensationComponents. The action elements may be defined by the data type EmployeeCompensationAgreementItemCreateCompensationComponentsWith Proposal ActionElements. In certain embodiments, a defined element is KeyDate. KeyDate is a GDT of type Date, may have qualifiers such as Key, and is the key date on which the CompensationComponentTypes to be proposed and their values are read from the CompensationStructureGrade.

2) Terminate may delimit all compensation components of an employee to the leaving date. The associated ItemCompensationComponents can be delimited or deleted. The validity end date of an ItemCompensationComponentDetail can be set to the LastWorkingDate. If the validity start date of the ItemCompensationComponentDetail lies after the LastWorkingDate, the ItemCompensationComponentDetail may deleted. The action elements may be defined by the data type EmployeeCompensationAgreementItemTerminateActionElements. In certain embodiments, a defined element is EmployeeLastWorkingDate. EmployeeLastWorkingDate is a GDT of type Date, may have a qualifier LastWorking, and is the end date of the work agreement.

In some implementations, QueryByElements selects a list of EmployeeCompensationAgreementItems that satisfy the selection criteria. The query elements are defined by the data type EmployeeCompensationAgreementItemElementsQueryElements. These elements may include EmployeeUUID (a GDT of type UUID), EmployeeID (a GDT of type EmployeeID), and EmployeeFamilyName. EmployeeFamilyName may be a GDT of type LANGUAGEINDEPENDENT_MEDIUM_Name with a qualifier such as Family, and may represent the family name of the employee assigned to a CompensationAgreement. The hit list may be restricted to EmployeeCompensationAgreements to which employees are assigned whose family names match the parameter EmployeeFamilyName. Wildcards can be used in the search. An additional element may be EmployeeGivenName. EmployeeGivenName is a GDT of type LANGUAGEINDEPENDENT_MEDIUM_Name with a qualifier such as Given and may represent the given name of the employee assigned to a CompensationAgreement. The hit list can be restricted to EmployeeCompensationAgreements to which employees are assigned whose given names match the parameter EmployeeGivenName. Wildcards can be used in the search. Additional elements may include UUID (a GDT of type UUID), EmploymentUUID (a GDT of type UUID), WorkAgreementUUID (a GDT of type UUID), and KeyDate (a GDT of type Date, which has the possible qualifier, Key). KeyDate can be the key date on which time-dependent data of the EmployeeCompensationAgreement is read. More possible elements may include ItemCompensationStructureGradeAssignmentCompensationStructureUUID (a GDT of type UUID), ItemCompensationStructureGradeAssignmentCompensationStructureID (a GDT of type CompensationStructureID), ItemCompensationStructureGradeAssignmentCompensationStructureGradeUUID (a GDT of type UUID), ItemCompensationStructureGradeAssignmentCompensationStructureGradeID (a GDT of type CompensationStructureGradeID), ItemCompensationComponentCompensationComponentTypeUUID (a GDT of type UUID), ItemCompensationComponentCompensationComponentTypeID (a GDT of type CompensationComponentTypeID), ItemCompensationComponentEmployeeBankDetailsKey (a GDT of type BusinessPartnerBankDetailsKey), and ItemCompensationComponentDetailActiveIndicator. ItemCompensationComponentDetailActiveIndicator is a GDT of type Indicator which may have a qualifier such as Active. Additional elements may include ItemCompensationComponentDetailRatePayrollRelevanceIndicator (a GDT of type Indicator with a possible qualifier such as Relevance), and ReportingLineUnitID (a GDT or type OrganisationalCentreID). ReportingLineUnitID may be the ID of the reporting line unit assigned to the employee by the work agreement matches to the query element ReportingLineUnitID. Another element can be WorkAgreementTypeCode which is a GDT of type WorkAgreementTypeCode and is the type of work agreement between employer and employee. An additional example of possible elements is HireDate, a GDT of type Date, which may have a qualifier such as Hire and represents the hiring date of the employee assigned to the CompensationAgreement.

An ItemCompensationStructureGradeAssignment is the time-dependent assignment of an Item to a CompensationStructureGrade. The elements located directly at the node ItemCompensationStructureGradeAssignment are defined by the type GDT EmployeeCompensationAgreementItemCompensationStructureGradeAssignmentElements. In certain implementations, these elements include: UUID, ValidityPeriod, CompensationStructureGradeUUID, and CompensationStructureGradeKey. UUID is an universal identifier, which can be unique, of an ItemCompensationStructureGradeAssignment. The UUID may be based on GDT UUID. ValidityPeriod is the time interval in which the assignment of the CompensationStructureGrade to the Item is valid. The ValidityPeriod may be based on GDT: CLOSED_DatePeriod, Qualifier Validity. CompensationStructureGradeUUID is an universal identifier, which can be unique, of a CompensationStructureGrade that is assigned to the EmployeeCompensationAgreementItem. This assignment specifies which CompensationComponents are proposed for the Agreement from the CompensationStructure. The CompensationStructureGradeUUID may be based on GDT UUID. CompensationStructureGradeKey is an alternative key for the CompensationStructureGrade. The CompensationStructureGradeKey may be based on IDT CompensationStructureGradeKey.

There may be a number of inbound aggregation relationships including from business object CompensationStructure or node Grade the GDT CompensationStructureGrade with a cardinality relationship of 1 to cn. The CompensationStructureGrade assigned to the Item. CompensationStructureGrades of an active Compensation Structure can be assigned to an ECAItem. The Delimit Enterprise Service Infrastructure Action can delimit the assignment of an EmployeeCompensationAgreementItem to a CompensationStructureGrade, with the possibility of no preconditions. If the date provided as action parameter is between the ItemCompensationStructureGradeAssignment ValidityPeriod start date and end date, the end date may be set to the parameter date. Otherwise, the change is refused by issuing an error message. The action elements may be defined by the data type DelimitActionElements. An exemplary elements is EndDate, a GDT of type Date, with a qualifier such as End.

An ItemCompensationComponent is a single rule pertaining to an employee's compensation component. Examples of ItemCompensationComponents are: rules governing basic pay, special payments, and company cars. The elements located directly at the node ItemCompensationComponent are defined by the type GDT EmployeeCompensationAgreementItemCompensationComponentElements. In certain implementations, these elements include: UUID, CompensationComponentTypeUUID, and CompensationComponent- TypeID. UUID is an universal identifier, which can be unique, of an ItemCompensationComponent. The UUID may be based on GDT UUID. CompensationComponentTypeUUID is an universal identifier, which can be unique, of a CompensationComponentType assigned to the ItemCompensationComponent. The CompensationComponentTypeUUID may be based on GDT UUID. CompensationComponentTypeID is an identifier of a CompensationComponentType. The CompensationComponentTypeID may be based on GDT CompensationComponentTypeID.

In certain implementations, composition relationships to subordinate nodes may exist, one example of which is ItemCompensationComponentDetail 182034 which may have a cardinality relationship of 1 to cn. Filter elements may exist and be defined by the data type EmployeeCompensationAgreementItemCompensationComponentDetailFilterElements. Examples of elements are ValidityPeriod (a GDT of type CLOSED_DatePeriod), RelativePeriodCode (a GDT of type CURRENTDAYFROMTODAYON_RelativePeriodCode), and ActiveIndication (a GDT of type Indicator, with a potential qualifier such as Active).

In some implementations, inbound association relationships, such as from business object CompensationComponent or root node may exist. An example is CompensationComponentType which may have a cardinality relationship of 1 to cn. The CompensationComponentType from which the compensation component is derived.

In exemplary implementations, enterprise service infrastructure actions such as ProposeValue may exist. The ProposeValue action may set the amount or the percentage of the compensation component using the default value from the structure. A Precondition that EmployeeCompensationAgreementItem is assigned to a CompensationStructureGrade may exist. ItemCompensationComponentDetailRates amounts or the percentage may be proposed from the structure if amounts have been maintained there. The action elements may be defined by the data type EmployeeCompensationAgreementItemCompensationComponentProposeValue ActionElements. These elements may include KeyDate (a GDT of type Date, with a potential qualifier such as Key).

An ItemCompensationComponentDetail is a time-dependent detail pertaining to a compensation component. The elements located directly at the node ItemCompensationComponentDetail are defined by the type GDT EmployeeCompensationAgreementItemCompensationComponentDetailElements. In certain implementations, these elements include: UUID, ValidityPeriod, ActiveIndicator, CompensationComponentPercent, CompensationComponentCalendarDayRecurrence, EmployeeBankDetailsKey, and NoteToPayeeNote. UUID is an universal identifier, which can be unique, of an ItemCompensationComponent. The UUID may be based on GDT UUID. ValidityPeriod is the time interval in which the compensation component is valid. The ValidityPeriod may be based on GDT CLOSED_DatePeriod, Qualifier Validity. ActiveIndicator can indicate whether the data are active or planned. The ActiveIndicator may be based on GDT Indicator, Qualifier: Active. There is typically one active record at any one time for an ItemCompensationComponentDetail.

CompensationComponentPercent can indicate what portion an ItemCompensationComponentDetail represents of one or more ItemCompensationComponentDetails, and is optional. CompensationComponentPercent can be expressed as a percentage. The GDT MEDIUM_Percent, Qualifier: CompensationComponent. Which ItemCompensationComponents are referenced may be determined by the corresponding CompensationComponentType.

CompensationComponentCalendarDayRecurrence is the recurrence of the due date of a compensation component within a period, and is optional. The CompensationComponentCalendarDayRecurrence may be based on GDT CalendarDayRecurrence, Qualifier: CompensationComponent. The DueDateRecurrence can contain information about the start date and the recurrence frequency of the due date for recurring payments (e.g., one-time special payment on 1 Mar. 2005, holiday bonus once a year in December, etc.

EmployeeBankDetailsKey can specify the different account to which this compensation component should be transferred, and is optional. The EmployeeBankDetailsKey may be based on GDT BusinessPartnerBankDetailsKey. EmployeeBankDetailsKey may be required, for example, for capital formation saving payments. This field can be maintained if it is allowed for the CompensationComponentType. This may be controlled in the CompensationComponentType by the parameter BankDetailsAllowed.

NoteToPayeeNote is a user-defined payment note, and is optional. The NoteToPayeeNote may be based on GDT MEDIUM_Note, Qualifier: NoteToPayee. NoteToPayeeNote can be used for a contract number of a capital formation saving payment.

Composition relationships to subordinate nodes may exist, an example of which is ItemCompensationComponentDetailRate 182046 which may have a cardinality relationship of 1 to cn. Filter elements may exist and can be defined by the data type EmployeeCompensationAgreementItemCompensationComponentDetailRateFilterElements. Exemplary elements include CompensationComponentRecurrenceFrequencyCode (a GDT of type COMPENSATIONCOMPONENT_RecurrenceFrequencyCode with a potential qualifier such as CompensationComponent) and PayrollRelevanceIndicator (a GDT of type Indicator with a potential qualifier such as Relevance).

Exemplary integrity conditions include the following. CompensationComponentPercent can be filled if the node CompensationDetailsBaseCompensationComponent exists in the CompensationComponentType. If a CompensationComponentPercent is maintained, the ItemCompensationComponentDetailRate may not exist. If the CompensationComponentAmount is maintained, CompensationComponentPercent may not be filled. CompensationComponentCalendarDayRecurrence is maintained for recurring payments with fixed due dates. The ItemCompensationComponentDetail may be within the validity period of the assigned EmployeeBankDetailsKey.

In some embodiments, associations for navigation to business object ECA and/or node ItemCompensationComponentDetailRate may determine the amount of frequency as specified in the referenced CompensationComponentType. DefaultItemCompensationComponentDetailRate may have a cardinality relationship of 1 to c. This association may determine the amount in the frequency as specified in the referenced CompensationComponentType if this CompensationComponentType has a CompensationComponentOccurrenceTypeCode '1' (Multiple occurrences). If the CompensationComponentType has a CompensationComponentOccurrenceTypeCode '2' (One-time fixed occurrence) or '3' (Multiple occurrences on fixed due dates) one amount may exist in ItemCompensationComponentDetailRate.

In certain embodiments, inbound association relationships may exist, an example of which is from business object Employee and/or node BankDetails. BankDetailsKey may have a cardinality relationship of c to cn.

Enterprise service infrastructure actions, such as Delimit may exist. The Delimit action may delimit the validity of an ECAItemCompensationComponent, with the possibility of no preconditions. If the date provided as action parameter is between the ItemCompensationComponentDetail ValidityPeriod start date and end date, the end date may be set to the parameter date. Otherwise, the change can be refused by issuing an error message. The action elements may be defined by the data type DelimitActionElements and may include EndDate (a GDT of type Date with a possible qualifier such as End).

In some implementations, ItemCompensationComponentDetailRate is the value of a compensation component. The elements located at the node ItemCompensationComponentDetailRate are defined by the type GDT EmployeeCompensationAgreementItemCompensationComponentDetailRateElements. In certain implementations, these elements include: UUID, PayrollRelevanceIndicator, CompensationComponentAmount, and CompensationComponentRecurrenceFrequencyCode. UUID is an universal identifier, which can be unique, of an ItemCompensationComponentDetailRate. It can be used to refer to an ItemCompensationComponentDetailRate. The UUID may be based on GDT UUID. PayrollRelevanceIndicator can indicate whether the ItemCompensationComponentDetailRate is payroll-relevant or is transferred to payroll, and is optional. The PayrollRelevanceIndicator may be based on GDT Indicator, Qualifier: Relevance. CompensationComponentAmount is the amount of a CompensationComponent with the corresponding currency unit. The CompensationComponentAmount may be based on GDT LARGE_Amount, Qualifier: CompensationComponent. CompensationComponentRecurrenceFrequencyCode can describe the frequency of a CompensationComponent, and is optional. The CompensationComponentRecurrenceFrequencyCode may be based on GDT COMPENSATIONCOMPONENT_RecurrenceFrequencyCode with a potential qualifier such as CompensationComponent. CompensationComponentRecurrenceFrequencyCode may be filled if the CompensationComponent is based on a CompensationComponentType with OccurenceTypeCode ‘1’ (Due on recurring basis no fixed dates). Otherwise it may not be filled.

In certain implementations, an ItemCompaRatio is the set of time-dependent Compa-Ratio values. The Compa-Ratio may reflect the ratio of the employee’s pay to the target value in the assigned compensation structure grade. In some examples, this node is not persistent. The elements located at the node ItemCompRatio may be defined by the GDT of the type EmployeeCompensationAgreementItemCompaRatioElements. In certain implementations, these elements may include: UUID, KeyDate, and CompaRatio. UUID is an universal identifier, which can be unique, of an ItemCompRatio. The UUID may be based no GDT UUID. KeyDate may be the date for which the compa-ratio is calculated. The KeyDate may be based on a GDT of type Date, with a possible qualifier such as Key.

In some implementations, CompaRatio is a decimal numerical value that results from the relationship between the employee’s earnings and the target value of the CompensationStructureGrade assigned. This value may denote the relationship between the salary of the employee and the market value of the employee’s job. This value is not persistent; it may be calculated when the object is called. Formula: Compa-Ratio=Employees salary/TargetAmount. The employee’s salary is the sum of several ECAItemCompensationComponentDetailRateAmounts. The TargetAmount may be stored in the node GradeAmountsPerPeriode of the assigned Compensation Structure. This value typically cannot be overwritten by hand. The CompaRatio may be based on GDT SMALLNONNEGATIVE_Ratio with a possible qualifier such as Compa. The ItemCompaRatio may be read only.

In some examples, An ItemRangePenetration is the set of time-dependent RangePenetration values. The RangePenetration can reflect the position of the employees pay in the salary range of the assigned CompensationStructureGrade. This node may not be persistent. The elements located directly at the node ItemRangePenetration are defined by a GDT of the type EmployeeCompensationAgreementItemRangePenetrationElements. In certain implementations, these elements may include: UUID, KeyDate, and RangePenetrationPercent. UUID is an universal identifier, which can be unique, of an ItemRangePenetration. The UUID may be based on GDT UUID. KeyDate is the date on which the RangePenetration is calculated. The KeyDate may be based on GDT Date with a possible qualifier such as Key.

RangePenetrationPercent is a percentage value that indicates the employee’s relative position within the salary range. RangePenetrationPercent can result from the ratio of the employee’s earnings to the maximum and minimum value of the CompensationStructureGrade assigned. This value is not persistent; it is calculated when the object is called. Formula: RangePenetrationPercent=(total earnings—minimum value)/(maximum value—minimum value). The total earnings is the sum of several ECAItemCompensationComponentDetailRateAmounts. The minimum value and maximum value may come from the minimum value and maximum value which may be stored in the assigned CompensationStructure Node GradeAmountsPerPeriod. The RangePenetrationPercent may be based on GDT MEDIUM_Percent; Qualifier: RangePenetration. The ItemRangePenetration may be read only.

In some implementations, The ItemEstimatedGrossEarnings may be a non-persistent node that can contain the estimated sum of the employee’s total income for a specific period, such as a year. The elements located at the node ItemEstimatedGrossEarnings are defined by the type GDT EmployeeCompensationAgreementItemEstimatedGrossEarningsElements. Example elements may include KeyDate. KeyDate is the key date for which the EstimatedGrossEarnings Gross are calculated. The KeyDate may be based on GDT Date and have a possible qualifier such as Key.

In some implementations, composition relationships to subordinate nodes exist, an example of which is ItemEstimatedGrossEarningsRate 182046 which may have a cardinality relationship of 1 to n. Filter elements may be defined by the data type EmployeeCompensationAgreementItemEstimatedGrossEarningsRateFilterElements. Example elements include EstimatedGrossEarningsRecurrenceFrequencyCode (a GDT of type COMPENSATIONCOMPONENT_RecurrenceFrequencyCode with a possible qualifier such as EstimatedGrossEarnings). The ItemRangePenetration may be read only.

In some examples, ItemEstimatedGrossEarningsRate is the employee’s estimated gross earnings in a specific time unit. The elements located at the node ItemEstimatedGrossEarningsRate can be defined by the GDT EmployeeCompensationAgreementItemEstimatedGrossEarningsRateElements. In certain implementations, these elements include: UUID, EstimatedGrossEarningsAmount, and EstimatedGrossEarningsRecurrenceFrequencyCode. UUID is an universal identifier, which can be unique, of an ItemEstimatedGrossEarningsRate. The UUID may be based on GDT UUID. EstimatedGrossEarningsAmount is the calculated sum of all ECAItemCompensationComponent-DetailRates. The EstimatedGrossEarningsAmount may be based on GDT LARGE_Amount with a qualifier such as EstimatedGrossEarnings. EstimatedGrossEarningsRecurrenceFrequencyCode can describe the time unit for which the Amount was calculated. The following are examples of EstimatedGrossEarningsRecurrenceFrequencyCode: EstimatedGrossEarning—25000€/Yearly; 2500 €/monthly. The EstimatedGrossEarningsRecurrenceFrequencyCode may be based on GDT COMPENSATIONCOMPONENT_RecurrenceFrequencyCode with a qualifier such as EstimatedGrossEarnings. The ItemRangePenetration may be read only. The ItemAttachmentFolder 182048 can contain the documents assigned to the Item.

FIG. 183 illustrates one example logical configuration of EmployeeCompensationAgreementMessage message 183050. Specifically, this figure depicts the arrangement and hierarchy of various components such as one or more levels of packages, entities, and datatypes, shown here as 183050 though 183070. As described above, packages may be used to represent hierarchy levels. Entities are discrete business elements that are used during a business transaction. Data types are used to type object entities and interfaces with a structure. For example, EmployeeCompensationAgreementMessage message 183050 includes, among other things, EmployeeCompensationAgreement 183054. Accordingly, heterogeneous applications may communicate using this consistent message configured as such.

FIG. 184-1 through 184-11 illustrates one example logical configuration of EmployeeCompensationAgreementPayrollMessage message 184000. Specifically, this figure depicts the arrangement and hierarchy of various components such as one or more levels of packages, entities, and datatypes, shown here as 184000 through 184244. As described above, packages may be used to represent hierarchy levels. Entities are discrete business elements that are used during a business transaction. Data types are used to type object entities and interfaces with a structure. For example, EmployeeCompensationAgreementPayrollMessage message 184000 includes, among other things, EmployeeCompensationAgreement 184044. Accordingly, heterogeneous applications may communicate using this consistent message configured as such.

FIG. 185-1 through 185-8 illustrates one example logical configuration of EmployeeCompensationAgreementPayrollNotificationMessage message 185000. Specifically, this figure depicts the arrangement and hierarchy of various components such as one or more levels of packages, entities, and datatypes, shown here as 185000 through 1851146. As described above, packages may be used to represent hierarchy levels. Entities are discrete business elements that are used during a business transaction. Data types are used to type object entities and interfaces with a structure. For example, EmployeeCompensationAgreementPayrollNotificationMessage message 185000 includes, among other things, EmployeeCompensationAgreement 185028. Accordingly, heterogeneous applications may communicate using this consistent message configured as such.

Message Types and their Signatures

This section describes exemplary message types and their signatures that are derived from the operations of the business object EmployeeCompensationAgreement. In a signature, the business object may be contained as a "leading" business object.

Motivating Business Scenarios

The EmployeeCompensationAgreementPayrollNotification message type may be motivated by the personnel events business scenario. As soon as compensation relevant data is created or changed in BO EmployeeCompensationAgreement, the payroll processing may can be informed about all payroll relevant changes. For every payroll relevant change in the EmployeeCompensationAgreement, a message can be sent to payroll processing to inform the payroll about this change.

Message Type(s)

An EmployeeCompensationAgreementPayrollNotification is a notification that informs PayrollProcessing which payroll relevant details have been created or changed. The structure of this message type may be determined by the message data type EmployeeCompensation-AgreementMessage. This message type can be used in the following operations of business objects: EmployeeCompensationAgreement (i.e., Notify of EmployeeCompensationAgreement), DE_EmployeePayrollInput (i.e., Maintain Employee Payroll Input Based On Employee Compensation Agreement), US_EmployeePayrollInput (i.e., Maintain Employee Payroll Input Based On Employee Compensation Agreement), CN_EmployeePayrollInput (i.e., Maintain Employee Payroll Input Based On Employee Compensation Agreement) FR_EmployeePayrollInput (i.e., Maintain Employee Payroll Input Based On Employee Compensation Agreement), GB_EmployeePayrollInput (i.e., Maintain Employee Payroll Input Based On Employee Compensation Agreement), and IT_EmployeePayrollInput (i.e., Maintain Employee Payroll Input Based On Employee Compensation Agreement).

EmployeeCompensationAgreementMessage Data Type

This message data type can contain the object EmployeeCompensationAgreement, which is contained in the business document, and the business information that is relevant for sending a business document in a message. EmployeeCompensationAgreement may contain MessageHeader and EmployeeCompensationAgreement.

MessageHeader Package

The Message Header package may be a MessageHeader of the type GDT BusinessDocumentMessageHeader and, in certain implementations, includes the following elements: ID, CreationDateTime, SenderParty, RecipientParty, and ReconciliationMessageIndicator. ID is an identifier of the message. The ID may be based on GDT BusinessDocumentMessageID. CreationDateTime is the date/time of the creation of the message. The CreationDateTime may be based on GDT DateTime. SenderParty is information about the sender. The SenderParty may be based on GDT BusinessDocumentMessageHeaderParty. RecipientParty is information about the recipient. The RecipientParty may be based on GDT BusinessDocumentMessageHeaderParty. ReconciliationMessageIndicator is the reconciliation indicator. The ReconciliationMessageIndicator may be based on GDT Indicator.

In some embodiments, EmployeeCompensationAgreementPackage is defined as the grouping of EmployeeCompensationAgreement with its entity Item and may have a cardinality relationship of 1 to n. In certain implementations, EmployeeCompensationAgreement contains the elements UUID and EmployeeUUID. UUID may be based on GDT UUID. EmployeeUUID may be based on GDT UUID. EmployeeCompensationAgreement may be checked by the leading business object.

In certain exemplary embodiments, ItemPackage is defined as the grouping of EmployeeCompensationAgreementItemPackage with its entity ItemDetail and may have a cardinality relationship of 0 to n.

In some embodiments, Item contains elements such as UUID, EmploymentUUID, WorkAgreementUUID, and CompensationComponentDetailListCompleteTransmissionIndicator. UUID may be based on GDT UUID. EmploymentUUID may be based on GDT UUID. WorkAgreementUUID may be based on GDT UUID. CompensationComponentDetailListCompleteTransmissionIndicator may be based on GDT CompleteTransmissionIndicator Item may contain the entity CompensationComponentDetail and may be checked by the leading business object.

In certain implementations, CompensationComponentDetail contains the following elements: UUID, ValidityPeriod, CompensationComponentTypeUUID, CompensationComponentAmount, CompensationComponentRecurrenceFrequencyCode, CompensationComponentPercent, CompensationComponentCalendarDayRecurrence, BankDetailsKey, NoteToPayeeNote, and ActionCode. UUID is an universal identifier, which can be unique, of an ItemCompensationComponentDetail. The UUID may be based on GDT UUID. ValidityPeriod may be based on GDT CLOSED_DatePeriod, and have a qualifier such as Validity. CompensationComponentTypeUUID may be based on GDT UUID. CompensationComponentAmount may be based on GDT LARGE_Amount and have a qualifier such as CompensationComponent. CompensationComponentRecurrenceFrequencyCode may be based on GDT COMPENSATIONCOMPONENT_RecurrenceFrequencyCode with a qualifier such as CompensationComponent. CompensationComponentPercent may be based on GDT MEDIUM_Percent with a qualifier such as CompensationComponent. CompensationComponentCalendarDayRecurrence may be based on GDT CalendarDayRecurrence with a qualifier such as CompensationComponent. BankDetailsKey may be based on GDT BusinessPartnerBankDetailsKey. NoteToPayeeNote may be based on GDT MEDIUM_Note with a qualifier such as NoteToPayee. ActionCode may be based on GDT ActionCode.

CompensationComponentDetail can be checked by the leading business object. Cardinality typically refers to ActionCode ‘Delete’. If the ActionCode is not ‘Delete’, the cardinality may be as defined in the leading Business Object EmployeeCompensationAgreement. If the ActionCode is “Delete”, then UUID may can be filled.

FIGS. 186-1 through 186-4 illustrate an example EmployeeTime business object model 186000. Specifically, this model depicts interactions among various hierarchical components of the EmployeeTime, as well as external components that interact with the EmployeeTime (shown here as 186002 through 186038).

Business Object EmployeeTime

In some implementations, an EmployeeTime is a document of the working times of an internal or external employee. In addition to planned and actual working times and activities carried out for the company, it also can document absence times, break times, and availability times. Depending on the business process in which the EmployeeTime is to be used or processed, it can be assigned information for use in Controlling, for confirmations for projects or orders, for payroll, and for determining availability. In addition to the recorded data, an EmployeeTime may contain some evaluation results that can be created or changed by time evaluation. Time evaluation can interpret recorded data in accordance with time management regulations. The business object EmployeeTime is part of the process component Time and Labor Management. An EmployeeTime may contain: Information about its status, Document items with their type and validity period, Additional business process data for each document item (the information is relevant for special applications such as time evaluation), Directly related evaluation results for each document item (e.g., net times or time intervals that result from expanding recurring validities).

Business Object EmployeeTime Node Structure

EmployeeTime (Root Node of the Business Object EmployeeTime)

In some implementations, EmployeeTime (Root) 186040 is a document of the working times of an internal or external employee. In addition to planned and actual working times and activities carried out for the company, it may also documents absence times, break times, and availability times. It can contains the planning category (such as actual confirmations, times planned in the long or short term) of the document items. The elements located at the node EmployeeTime may be defined by the type NDT EmployeeTimeElements. In certain implementations, these elements include: UUID, EmployeeTimeAgreementItemUUID, EmployeeUUID, PlanningCategoryCode, VersionID, BusinessTransactionDocumentReference, and Status. UUID is a universal identifier, which can be unique, of an EmployeeTime. The UUID may be based on GDT type UUID. EmployeeTimeAgreementItemUUID is an universal identifier, which can be unique, of the EmployeeTimeAgreementItem to which employee time refers. The EmployeeTimeAgreementItemUUID may be based on GDT type UUID. EmployeeUUID in an universal identifier, which can be unique, of the Employee for whom the Employee Time is valid. The EmployeeUUID may be based on GDT type UUID. PlanningCategoryCode is a coded representation of an employee time planning category according to whether the employee time actually took place or is planned for the short or long term. The PlanningCategoryCode may be based on GDT EmployeeTimePlanningCategoryCode. VersionID is an identifier, which can be unique, of the version of an EmployeeTime. The VersionID may be based on GDT VersionID. BusinessTransactionDocumentReference can contain a reference to another business object, on the basis of which the employee time was created. The BusinessTransactionDocumentReference may be based on GDT BusinessTransactionDocumentReference. Status can contain information about the life cycle of an EmployeeTime. The internal data type EmployeeTimeStatus may have the following structure: LifeCycleStatusCode (which may be based on GDT EmployeeTimeLifeCycleStatusCode) and ApprovalStatusCode (which may be based on GDT ApprovalStatusCode).

Composition Relationships may exist to subordinate nodes such as Item 186042 (with a cardinality of 1 to cn), DO: TextCollection 186046 (with a cardinality of 1 to c), and DO: AttachmentFolder 186052 (with a cardinality of 1 to c). Inbound Aggregation Relationships may exist from business objects or node, examples of which are from EmployeeTimeAgreement/EmployeeTimeAgreementItem. EmployeeTimeAgreementItem may have a cardinality relationship of 1 to cn. An EmployeeTime may be valid for exactly one EmployeeTimeAgreementItem. An EmployeeTimeAgreementItem can have an unlimited number of EmployeeTimes. An EmployeeTimeAgreementItem may represent the employee, work agreement, or employment relationship for which the EmployeeTime is recorded. Inbound association relationships may exists from business object Employee/Root. The relationship with Employee may have a cardinality relationship of 1 to cn. The Employee may represent for whom the EmployeeTime is valid. The Employee may be used also for access control to an EmployeeTime.

The PlanningCategoryCode may not be changed once it has been created.

A distinction can be made between the change scenarios. Create scenario may indicate that a new employee time is created. Change scenario indicates that an active employee time is changed. Deletion scenario indicates that an active employee time is cancelled. Any of these change procedures can require an approval procedure. This can be decided by the user interface or the business configuration.

A distinction can be made between the approval scenarios. The normal approval procedure, in which the requested changes do not become active until they have been approved. The changes are then considered as the basis of the time evaluation. The sign-off procedure, in which the requested changes become active as soon as they are requested. The changes are cancelled if the request is rejected. In one scenario, no approval is required.

The SubmitForApproval S&AM action may be called when a user releases his changes. The action can determine, based on the business configuration, whether and what kind of approval procedure is required.

If no approval is required, the changes can be activated immediately. Action Activate may be called internally. Inactive items can be activated and active items may be deleted. If approval is required, the items may remain unchanged.

In some implementations, the Approve S&AM action is called when a request is approved. The requested changes are activated, thus the changes are taken as the basis of the time evaluation. Depending on the change scenario, the action Activate is called internally. In a normal approval procedure, inactive items are activated and active items are deleted. In a sign-off procedure, all inactive items are deleted. The Reject S&AM action may be called when a request is rejected. In a normal approval procedure, all inactive items are deleted. In a sign-off procedure, items that were previously active, and that are now listed in the history, are reactivated; active items are deleted.

In some implementations, the FlagForCancellation S&AM action is called when a cancellation can be performed in two steps. However, the employee time remains active. The Activate S&AM action may cause changes to the employee time to be activated. All inactive items are activated, and all active items are deleted. The DiscardChanges S&AM action may cause changes to the employee time to be discarded. All inactive items are deleted.

A QueryByElements may exist such that all employee times are selected that have at least one item that satisfies the selection conditions of the parameter. In some embodiments, the following selection criteria are defined for this query (NDT EmployeeTimeElementsQueryElements), EmployeeTimeAgreementItemUUID, ItemDate, LifeCycleStatusCode, ApprovalStatusCode, PlanningCategoryCode, ItemCategoryCode, ItemApproverEmployeeUUID, ItemTypeCode, ItemPaymentTypeCode, BaseEventEmployeeTimeItemGroupID, ItemReasonCode, ItemExternalServiceAcknowledgementEmployeeTimeConfirmationViewOf ServiceTransactionDocumentItemUUID, ItemExternalServiceAcknowledgementPurchaseOrderReference, ItemExternalServiceAcknowledgementServiceProductUUID, Item ExternalServiceAcknowledgementServiceProductID, ItemServiceProvisionAccountingCodingBlockDistributionAccountingCodingBlockAssignmentCostCentreUUID, ItemServiceProvisionAccountingCodingBlockDistributionAccountingCodingBlockAssignmentCostCentreID, ItemServiceProvisionServiceProductID, ItemServiceProvisionServiceProductUUID, ItemServiceProvisionLabourResourceID, ItemServiceProvisionLabourResourceUUID, ItemProjectTaskConfirmationProjectReference, ItemProjectTaskConfirmationEmployeeTimeConfirmationViewOfProjectTaskUUID, ItemProjectTaskConfirmationServiceProductID, and ItemProjectTaskConfirmationServiceProductUUID.

In some implementations, EmployeeTimeAgreementItemUUID is a GDT of type UUID. ItemDate is a GDT of type Date. All employee items are selected that have at least one item whose validity period intersects the interval specified. LifeCycleStatusCode is a GDT of type EmployeeTimeLifeCycleStatusCode. ApprovalStatusCode is a GDT of type ApprovalStatusCode. PlanningCategoryCode is a GDT of type EmployeeTimePlanningCategoryCode. ItemCategoryCode is a GDT of type EmployeeTimeItemCategoryCode. ItemApproverEmployeeUUID is a GDT of type UUID. ItemTypeCode is a GDT of type EmployeeTimeItemTypeCode. ItemPaymentTypeCode is a GDT of type EmployeeTimeItemPaymentTypeCode. BaseEventEmployeeTimeItemGroupID is a GDT of type BaseEventEmployeeTimeItemGroupID. ItemReasonCode is a GDT of type EmployeeTimeItemReasonCode. Item ExternalServiceAcknowledgementEmployeeTimeConfirmationViewOfServiceTransactionDocumentItemUUID is a GDT of type UUID. ItemExternalServiceAcknowledgementPurchaseOrderReference is a GDT of type BusinessTransactionDocumentReference. ItemExternalServiceAcknowledgementServiceProductUUID is a GDT of type UUID. ItemExternalServiceAcknowledgementService ProductID is a GDT of type ProductID. ItemServiceProvisionAccountingCodingBlockDistributionAccounting CodingBlockAssignmentCostCentreUUID is a GDT of type UUID. ItemServiceProvisionAccountingCodingBlockDistributionAccountingCodingBlockAssignmentCostCentreID is a GDT of type CostCentreID. ItemServiceProvisionServiceProductID is a GDT of type ProductID. ItemServiceProvisionServiceProductUUID is a GDT of type UUID. ItemServiceProvisionLabourResourceID is a GDT of type ResourceID. ItemServiceProvisionLabourResourceUUID is a GDT of type UUID. ItemProjectTaskConfirmationProjectReference is a GDT of type ProjectReference. ItemProjectTaskConfirmationEmployeeTimeConfirmationViewOfProjectTaskUUID is a GDT of type UUID. ItemProjectTaskConfirmationServiceProductID is a GDT of type ProductID. ItemProjectTaskConfirmationServiceProductUUID is a GDT of type UUID.

In some embodiments, an Item of an EmployeeTime is a document item concerning an employee's planned or recorded working time or other time (e.g., absence, break, availability). It can contain information about the type and the start and end or duration of the time; it can reference a working time model. An Item can be active or inactive. Typically, active items are considered in time evaluation. The elements located directly at the node Item are defined by the type NDT EmployeeTimeItemElements. In certain implementations, these elements include: UUID, OrdinalNumberValue, OriginalUUID, CategoryCode, TypeCode, PaymentTypeCode, EmployeeTimeValidity, Quantity, QuantityTypeCode, BaseEventEmployeeTimeItemGroupID, ReasonCode, DifferentPaymentIndicator, WorkingTimeModelUUID, ApproverEmployeeUUID, and Status. UUID is an universal ID, which can be unique, for an EmployeeTimeItem. The UUID may be based on GDT UUID. OrdinalNumberValue can be used to number the employee time items. The OrdinalNumberValue may be based on GDT OrdinalNumberValue. OriginalUUID may refer to the original UUID of an employee time item. The OriginalUUID may be based on GDT UUID. CategoryCode is a classification of EmployeeTimeItems into categories that carry the key information about the type of the employee time according to company, collective-agreement, or statutory criteria. The CategoryCode may be based on GDT EmployeeTimeItemCategoryCode. It may be possible to enter the CategoryCode first and then to obtain input help for the TypeCode which displays the exact TypeCodes that are assigned to the CategoryCode. It may also be possible to enter an employee time item which specifies the CategoryCode, but no TypeCode. The appropriate TypeCode can be added later. TypeCode is a coded representation of the type of employee time item classified according to its concrete company, collective-agreement, or statutory significance (e.g., vacation, overtime, or illness with or without a medical certificate), and is optional. The TypeCode may be based on GDT EmployeeTimeItemTypeCode. PaymentTypeCode is a coded representation of the payment type of employee time item, classified according to how the employee time item is paid (e.g., overtime or shift premiums, or premiums for work during vacation), and is optional. The PaymentTypeCode may be based on GDT EmployeeTimeItemPaymentTypeCode.

In some implementations, the EmployeeTimeValidity is a structure describing the date and time and duration of day or time intervals in which the employee time item is valid. The EmployeeTimeValidity may be based on GDT EmployeeTimeValidity. EmployeeTimeValidity may define time periods, examples of which are: On 1 Sep. 2005, from 9:00 to 18:00 (e.g., for normal working time); On 1 Sep. 2005, ½ hour between 10:00 and 11:00 (e.g., for a break); Every Monday from 5 Sep. 2005 to 26 Sep. 2005, from 14:00 to 15:00 (e.g., for a regular meeting); From 27 Sep. 2005 to 5 Oct. 2005 (e.g., for vacation or illness); From 4 Sep. 2005, 22:00 to 8 Sep. 2005, 18:00 (e.g., for availability duty); On 2 Sep. 2005, 2 hours (e.g., for overtime).

In some implementations, Quantity is a quantity belonging to the employee time item that specifies additional, quantitative (i.e., non time-specific) information about the documented working time, and is optional. The Quantity may be based on GDT Quantity. For example, in addition to recording consulting expenses for 4 hours on 1 Sep. 2005, the customer wants to record 120 km travel distance, or in addition to recording overtime from 18:00 to 22:00 on 2 Sep. 2005, you the customer wants to record that 100 items were processed during this time. The semantics of this specification may be derived from the value of the EmployeeTimeItemType, which can define the business context.

In some implementations, QuantityTypeCode is the coded representation type of quantitative change of the document working time, and is optional. The QuantityTypeCode may be based on GDT QuantityTypeCode. BaseEventEmployeeTimeItemGroupID can identify Employee Time Items that belongs to the same employee's professional or private event, and is optional. For instance, absences based on the same illness event will be assigned to the same ID. The BaseEventEmployeeTimeItemGroupID may be based on GDT BaseEventEmployeeTimeItemGroupID. ReasonCode is the coded representation of the reason that led to the working time or activity which is documented by this item, and is optional. The ReasonCode may be based on GDT EmployeeTimeItemReasonCode. DifferentPaymentIndicator can specify if the default payment terms assigned to the TypeCode and PaymentTypeCode are overwritten by different payment terms. If the indicator is set, the payment of the item may be based on the terms specified in node ItemDifferentPayment. Otherwise, the default payment derived from the TypeCode and PaymentTypeCode can apply. The DifferentPaymentIndicator may be based on GDT Indicator, Qualifier: DifferentPayment. WorkingTimeModelUUID is a reference to a time model containing information about the type and validity period of the working time or other time, and is optional. The reference to a WorkingTimeModel can enable the information stored there to be assigned to the employee in this employee time. The WorkingTimeModelUUID may be based on GDT UUID. For example, the time model with the name "Flextime A" contains a list with the following items describing working time or other times: 06:00-20:00 flextime timeframe; ½ hour break between 10:00 and 13:00; 9:00-10:00 core time; 15:00-16:00 core time. The employee time item may now contain the following information: "Flextime A is valid on 23 Sep. 2005". Therefore, in this example, the same applies to the employee time containing this item as if it had the four following items, instead of just one item with a reference to the time model "Flextime A": 23 Sep. 2005, 6:00-20:00 flextime timeframe; 23 Sep. 2005, ½ hour break between 10:00 and 13:00; 23 Sep. 2005, 9:00-10:00 core time; 23 Sep. 2005, 15:00-16:00 core time.

In some embodiments, ApproverEmployeeUUID is the UUID of an employee who may can approve the employee time. Status can contain information about the life cycle of an EmployeeTimeItem. The internal data type EmployeeTimeStatus may have the following structure: LifeCycleStatusCode (which may be based on GDT EmployeeTimeLifeCycleStatusCode), ApprovalStatusCode (which may be based on GDT ApprovalStatusCode), and EmployeeTimeValidity.

Exemplary actions that can exist are Activate, Deactivate, RevokeCancellation, ConfirmCancellation, FlagForCancellation, SkipApproval, StartApproval, Approve, Reject, and SendBackForRevision. In some implementations, Activate is an S&AM action that can cause an item to become active and thus relevant for follow-on processes. Deactivate is an S&AM action that can cause an item to become inactive and thus no longer relevant for follow-on processes. RevokeCancellation is an S&AM action that can cause a request for cancellation of an item to be revoked, and the item becomes relevant for follow-on processes again. This action is called in a sign-off procedure when the cancellation request is rejected. ConfirmCancellation is an S&AM action that causes the cancellation flag to be confirmed and the item is cancelled. The item is no longer relevant for follow-on processes. FlagForCancellation is an S&AM action that can cause a cancellation flag to be created for the item. This happens when a cancellation is performed in two steps. SkipApproval is an S&AM action that can be called when the system determines that no approval is required for the change to the item. StartApproval is an S&AM action that can be called when the system determines that approval is required for the change to the item. Approve is an S&AM action that can be called when the item change is approved. Reject is an S&AM action that can be called when the item change is rejected. SendBackForRevision is an S&AM action that can be called when a request is returned to the requester, for example, for correction purposes.

Composition Relationships may exist with the following entities and cardinality relationships: ItemValuationTerms 186044 (cardinality 1 to c), ItemServiceProvision 186048 (cardinality 1 to c), ItemExternalServiceAcknowledgement 186054 (cardinality 1 to c), ItemProjectTaskConfirmation 186056 (cardinality 1 to c), ItemDifferentPayment 186058 (cardinality 1 to cn), ItemValuatedDuration 186060 (cardinality 1 to c).

In some implementations, exemplary Association Relationships can exist from WorkingTimeModel/Root and from Employee/Root. When coming from WorkingTimeModel/Root, WorkingTimeModel may have a cardinality relationship of c to cn. EmployeeTimeItem can reference a possible maximum of one WorkingTimeModel. A WorkingTimeModel may be used in an unlimited number of EmployeeTimeItems. When coming from Employee/Root, EmployeeApprover may have a cardinality relationship of c to cn. An EmployeeTimeItem may refer to a maximum of one Employee as approver. An Employee may be used in an unlimited number of EmployeeTimeItems.

In some implementations, the CategoryCode can have the category belonging to the TypeCode. The TypeCode can have an employee time item type that is permitted for the TaskTypeCode.

In some implementations, ItemValuationTerms are specifications for the evaluation of a document item. The evaluation specifications can be relevant for specific parts of time evaluation. Examples of valuation specifications are rules governing the assignment of a calendar day to a time document that has been entered as a time interval. The elements located directly at the ItemValuationTerms node are defined by the type NDT EmployeeTimeItemValuationTermsElements. In certain implementations, these elements include: EmployeeTimeValuationTerms. EmployeeTimeValuationTerms is a structure defining the specifications for evaluating a document item. The EmployeeTimeValuationTerms may be based on GDT EmployeeTimeValuationTerms.

In some implementations, An ItemServiceProvision is document item information about the confirmation of an internal service provided. The elements located directly at the ItemServiceProvision node are defined by the type NDT: EmployeeTimeItemServiceProvisionElements. In certain implementations, these elements include: EmployeeTimeServiceProvision. EmployeeTimeServiceProvision is a structure containing information about the provision of an internal service. The EmployeeTimeServiceProvision may be based on GDT EmployeeTimeServiceProvision.

A Composition Relationship may exist to DO: ItemServiceProvision.AccountingCodingBlockDistribution 186050 with a cardinality relationship of 1 to c. Inbound Association Relationships may exist from Resource/Root and from ServiceProduct/Root. When coming from Resource/Root, LabourResource can have a cardinality relationship of c to cn and refer to an association to a Resource whose labor was consumed. When coming from ServiceProduct/Root, ServiceProduct can have a cardinality relationship of c to cn and refer to an association to a Service Product that describes the service provided.

In some implementations, an ItemServiceProvisionAccountingCodingBlockDistribution refers to the cost center for which a service was provided. An ItemExternalServiceAcknowledgement is document item information about the confirmation of a service provided by an external employee. The elements located directly at the node ItemExternalServiceAcknowledgement are defined by the type NDT EmployeeTimeItemExternalServiceAcknowledgementElements. In certain implementations, these elements include: EmployeeTimeExternalServiceAcknowledgement. EmployeeTimeExternalServiceAcknowledgement is a structure containing information about the confirmation of a service provided by an external employee. The EmployeeTimeExternalServiceAcknowledgement may be based on GDT EmployeeTimeExternalServiceAcknowledgement.

Inbound Association Relationships may exist from ServiceProduct/Root and from EmployeeTimeConfirmationViewOfServiceTransactionDocument/Item. When coming from ServiceProduct/Root, ServiceProduct may have a cadinality relationship of c to cn and refer to a ServiceProduct that describes the service provided. When coming from EmployeeTimeConfirmationViewOfServiceTransactionDocument/Item, EmployeeTimeConfirmationViewOfServiceTransactionDocumentItem may have a cardinality relationship of c to cn. And refer to a PurchaseOrderItem that describes the service provided.

In some implementations, an ItemProjectTaskConfirmation is document item information about a confirmation to a project task. It can describe the actual time taken to process a project task. The elements located directly at the node ItemProjectTaskConfirmation are defined by the type NDT EmployeeTimeItemProjectTaskConfirmationElements. Exemplary elements may include: EmployeeTimeProjectTaskConfirmation. EmployeeTimeProjectTaskConfirmation is a structure containing information about a confirmation to a project task. The EmployeeTimeProjectTaskConfirmation may be based on GDT EmployeeTimeProjectTaskConfirmation.

Inbound Association Relationships may exist from EmployeeTimeConfirmationViewOfProject/Task and from ServiceProduct/Root. When coming from From EmployeeTimeConfirmationViewOfProject/Task, ProjectTask may have a cardinality relationship of c to cn and have an association to the task which was executed. When coming from ServiceProduct/Root, ServiceProduct may have a cardinality relationship of c to cn and an association to a Service Product that describes the service provided.

In some implementations, DifferentPayment is a document item for the payment of an EmployeeTimeItem which replaces the rules that are usually applied in payroll calculation for determining the payment of the EmployeeTimeItem. An example of a different payment is a special hourly rate for overtime worked. The elements located directly at the ItemDifferentPayment node are defined by the type NDT EmployeeTimeItemDifferentPaymentElements. In certain implementations, these elements include: EmployeeTimeDifferentPayment. EmployeeTimeDifferentPayment is a structure containing information about different payments. The EmployeeTimeDifferentPayment may be based on GDT EmployeeTimeDifferentPayment.

In some implementations, An ItemValuatedDuration can represent a duration determined by evaluation for the document item (e.g., the net duration minus breaks). An ItemValuatedDuration may depend on the data recorded in the document item; it can be created or changed by time evaluation. Outside time evaluation, the ItemValuationDuration is typically available in read-only mode. The elements located directly at the ItemValuatedDuration node are defined by the type NDT EmployeeTimeItemValuatedDurationElements. In certain implementations, these elements include: DurationDeterminationMethodCode and Duration. DurationDeterminationMethodCode can define the method used to determine the derived duration. The DurationDeterminationMethodCode may be based on GDT EmployeeTimeItemValuatedDurationDeterminationMethodCode. Duration is a duration derived from the recorded employee time item. The Duration may be based on GDT Duration.

DO: TextCollection

A TextCollection of an EmployeeTime may be textual information containing the reasons why the employee time was created or changed, or other comments.

DO: AttachmentFolder

An AttachmentFolder of an EmployeeTime may be a folder where a document containing information about the EmployeeTime can be stored (e.g., a medical certificate).

FIG. 187-1 through 187-2 illustrates an example EmployeeTimeAccount business object model 187000. Specifically, this model depicts interactions among various hierarchical components of the EmployeeTimeAccount, as well as external components that interact with the EmployeeTimeAccount (shown here as 187002 through 187026).

Business Object EmployeeTimeAccount

In some implementations, an EmployeeTimeAccount is a summary of valuated EmployeeTimes and of periodic valuations administered by EmployeeTimeValuation. (An EmployeeTime is a document concerning the planned and actual working times of an internal or external employee of the company.) Valuation results are recorded in EmployeeTimeAccounts in the form of line items, which are the quantitative changes of the EmployeeTimeAccount. Examples of EmployeeTimeAccounts are leave accounts and overtime accounts. In some examples, laws, working time provisions, and collective agreements decide which types of employee time accounts are required. Balances can be formed over a particular period for individual line items in an employee time account, such as the weekly overtime or the monthly flextime balance. The balances can be used to check limits on working times, monitor entitlements and deductions, compile statistics, and to fulfill obligations to record such data for the authorities and employees. The EmployeeTimeAccount business object can be part of the Time & Labor Management process component. An EmployeeTimeAccount may contains information about each quantitative change.

Service Interfaces

The business object EmployeeTimeAccount 187028 may be involved in the Time and Labor Management_Payroll Processing_Calendar and Account Process Component Interaction Model.

In some implementations, the technical name of The Service Interface Employee Time Calendar and Account in Payroll Input Maintenance Out is TimeAndLabourManagementEmployeeTimeCalendarAndAccount in PayrollInputMaintenanceOut and is part of the Process Integration Model Time and Labor Management_Payroll Processing_Calendar and Account. The Service Interface Employee Time Calendar and Account in Payroll Input Maintenance Out comprises operations that triggers the notification of the process component Payroll Processing by the BO EmployeeTimeAccount which contains the information about account balance.

In some implementations, the technical name of Notify of EmployeeTimeAccount is

TimeAndLabourManagementEmployeeTimeCalendarAndAccount in PayrollInputMaintenanceOut NotifyOfEmployeeTimeAccount, the operation of which is to notify the BO XX_Employee Payroll Input about the account balances. The operation may be based on message type Employee Time Account Payroll Notification. (Derived from the business object EmployeeTimeAccount).

Node Structure of Business Object EmployeeTimeAccount

EmployeeTimeAccount

An EmployeeTimeAccount may be a summary of valuation results. Valuation results can be recorded in the form of LineItems, which may be the quantitative changes of the EmployeeTimeAccount. An EmployeeTimeAccount can contain information about its semantic meaning and its quantity unit. The elements located at the EmployeeTimeAccount node can be defined by a GDT of type EmployeeTimeAccountElements. Exemplary elements may include UUID, EmployeeTimeAgreementItemUUID, EmployeeUUID, CategoryCode, TypeCode, IdentifyingPeriod, AutomaticallyGeneratedIndicator, MeasureUnitCode, ProcessingPeriod, CancelledIndicator, and/or Key.

In some implementations, UUID is a universal unique identifier of an EmployeeTimeAccount and is a GDT of type UUID. EmployeeTimeAgreementItemUUID may be the universal unique identifier of an EmployeeTimeAgreementItem for which an EmployeeTimeAccount holds and a GDT of type UUID. EmployeeUUID may be a universally unique identifier of an Employee and a GDT of type UUID. CategoryCode may be a coded representation of a classification of employee time account and a GDT of type EmployeeTimeAccountCategoryCode. TypeCode may be the coded representation of the type of an EmployeeTimeAccount. The TypeCode can be a dividing up of employee time accounts in accordance with criteria resulting from laws, agreements, company requirements, control tasks, and so on. TypeCode can be a GDT of type EmployeeTimeAccountTypeCode. IdentifyingPeriod can identify the time account through a date interval. It can be used for differentiating several EmployeeTimeAccounts of the same type of an employee, e.g. vacation EmployeeTimeAccount for 2004 and 2005. The start date and end date may be mandatory. IdentifyingPeriod can be a GDT of type DatePeriod with a possible restriction CLOSED. AutomaticallyGeneratedIndicator may describe whether EmployeeTimeAccount was created manually or was derived and can be a GDT of type Indicator. MeasureUnitCode may be the unit of all the quantities stored with an EmployeeTimeAccount and a GDT of type MeasureUnitCode. ProcessingPeriod may be the date interval during which a LineItem can be created for the EmployeeTimeAccount and a GDT of type DatePeriod with the possible restriction CLOSED. CancelledIndicator may describe whether EmployeeTimeAccount is cancelled and be a GDT of type Indicator with a qualifier such as Cancelled. Key may be a unique structured key for an EmployeeTimeAccount and be an IDT of type EmployeeTimeAccountKey. Key may consist of elements, examples of which may include EmployeeTimeAgreementItemUUID, TypeCode, IdentifyingPeriod, AutomaticallyGeneratedIndicator.

In some implementations, composition relationships to subordinate nodes exist, examples of which are LineItem 187030 (possible cardinality relationship of 1 to cn) and Balance 187034 (possible cardinality relationship of 1 to cn). Inbound Aggregation Relationships may exist from the Business Object EmployeeTimeAgreement/Node Item. EmployeeTimeAgreementItem may have a cardinality relationship of 1 to cn. An EmployeeTimeAccount may be valid for exactly one EmployeeTimeAgreementItem. An EmployeeTimeAgreementItem can own several EmployeeTimeAccounts.

In some implementations, association for Navigation to business object EmployeeTimeAccountMaintenanceRequest/Node LineItemSpecification may exist where EmployeeTimeAccountMaintenanceRequest LineItemSpecification may have a cardinality relationship of 1 to cn. An EmployeeTimeAccountMaintenanceRequest LineItemSpecification may maintain an EmployeeTimeAccount. Inbound Association Relationships from business object Employee/Root may exist where Employee has a cardinality relationship of 1 to cn. It may refer to the Employee for whom the EmployeeTimeAccount is valid. The Employee may be used for access control to an EmployeeTimeAccount.

In some implementations, once an EmployeeTimeAccount has been created, its type, identifying period, quantity unit, and the assignment of an EmployeeTimeAgreementItem can no longer be changed.

When a LineItem is created in an EmployeeTimeAccount, its posting date can lie within the processing period of that EmployeeTimeAccount. However, the ProcessingPeriod can be changed even if existing LineItems have PostingDates lying outside the new ProcessingPeriod. The units for the quantities stored in the LineItems and the Balances in the EmployeeTimeAccount can be identical to the unit specified in the root node.

An exemplary query, QueryByProcessing Period may provides a list of all EmployeeTimeAccounts with Processing Period which satisfy the selection criteria. The GDT EmployeeTimeAccountProcessingPeriodQueryElements may define the query elements TypeCode (a GDT of type EmployeeTimeAccountTypeCode), CategoryCode (a GDT of type EmployeeTimeAccountCategoryCode), EmployeeTimeAgreementItemUUID (a GDT of type UUID), and/or IdentifyingPeriod (a GDT of type DatePeriod with a possible restriction, CLOSED. The IdentifyingPeriod of the EmployeeTimeAccount may overlap the period range specified by the query element IdentifyingPeriod. The GDT EmployeeTimeAccountProcessingPeriodQueryElements may further define the query elements AutomaticallyGeneratedIndicator (a GDT of type Indicator: AutomaticallyGenerated), CancelledIndicator (a GDT of type Indicator with a qualifier such as Cancelled), and/or ProcessingPeriod (a GDT of type DatePeriod with a possible restriction, CLOSED). The ProcessingPeriod of the EmployeeTimeAccount with ProcessingPeriod may overlap the period range specified by the query element ProcessingPeriod.

LineItem.

In some embodiments, The LineItem is a quantitative change of an EmployeeTimeAccount on a certain date. A LineItem can be characterized by a type. A LineItem may be generated for automatically generated employee time accounts.

In some embodiments, the elements located with the LineItem node may be defined by the GDT type EmployeeTimeAccountLineItemElements. Exemplary elements may include UUID, PostingDate, TypeCode, Quantity, QuantityTypeCode, EmployeeTimeCalendarPeriodItemUUID, EmployeeTimeAccountMaintenanceRequestLineItemSpecificationUUID, and EmployeeTimeValuationStepCode. UUID is a universal unique identifier of a LineItem and a GDT of type UUID. PostingDate is the key date on which the LineItem is valid from a business administration point of view and a GDT of type Date. TypeCode is the coded representation of the type of a line item of an EmployeeTimeAccount according to criteria resulting from laws, agreements, company requirements, control tasks, etc and is GDT of type EmployeeTimeAccountLineItemTypeCode. Quantity is the quantitative change of the EmployeeTimeAccount and a GDT of type Quantity. A QuantityTypeCode is the coded representation of a type of quantity and a GDT of type QuantityTypeCode. EmployeeTimeCalendarPeriodItemUUID is a universal unique identifier of an EmployeeTimeCalendarPeriodItem from which the LineItem results and a GDT of type UUID. EmployeeTimeAccountMaintenanceRequestLineItemSpecificationUUID is a universal unique identifier of an EmployeeTimeAccountMaintenanceRequest LineItemSpecification from which the LineItem results and a GDT of type UUID. EmployeeTimeValuationStepCode is a valuation step for which the results represented in the periods are determined and a GDT of type EmployeeTimeValuationStepCode.

In some embodiments, composition relationships to subordinate nodes exist may exist, an example of which is LineItemDifferentPayment 187032 with a cardinality relationship of 1 to c. Inbound Aggregation Relationships can exist from, for example, the Business Object EmployeeTimeCalendar/Node Item and from the Business Object EmployeeTimeAccountMaintenanceRequest/Node LineItemSpecification. From the Business Object EmployeeTimeCalendar/Node Item can come an EmployeeTimeCalendarPeriodItem with cardinality relationship of c to cn. An EmployeeTimeAccountLineItem may be created from an EmployeeTimeCalendarPeriodItem. An EmployeeTimeCalendarPeriodItem may create several EmployeeTimeAccountLineItems. From the Business Object EmployeeTimeAccountMaintenanceRequest/Node LineItemSpecification can come an EmployeeTimeAccountMaintenanceRequestLineItemSpecification with a cardinality relationship of c to cn. An EmployeeTimeAccountLineItem may be created from an EmployeeTimeAccountMaintenanceRequestLineItemSpecification. An EmployeeTimeAccountMaintenanceRequestLineItem may create several EmployeeTimeAccountLineItems.

It may be possible to delete a LineItem but not to modify it. In some embodiments, for a particular EmployeeTimeAccountLineItem either none of the EmployeeTimeCalendarPeriodItemUUID or EmployeeTimeAccountMaintenanceRequestLineItemSpecificationUUID is specified or if they are specified then at a specific time only one of them is allowed.

Exemplary queries to LineItem include QueryByDates and QueryByOrigin. QueryByDates may provide a list of all EmployeeTimeAccount line items which satisfy the selection criteria. GDT EmployeeTimeAccountLineItemDatesQueryElements may define the query elements EmployeeTimeAccountUUID, TypeCode, PostingDate, and/or EmployeeTimeValuationStepCode. EmployeeTimeAccountUUID is a GDT of type UUID. TypeCode is a GDT of type EmployeeTimeAccountLineItemTypeCode. PostingDate is a GDT of type Date. The PostingDate of EmployeeTimeAccountLineItem may lie within the range specified for query element PostingDate. EmployeeTimeValuationStepCode is a GDT of type EmployeeTimeValuationStepCode. Time valuation may generate EmployeeTimeAccountLineItems in more than one EmployeeTimeAccount. Therefore, the query for line items based on Date may return EmployeeTimeAccountLineItems that belong to more than one EmployeeTimeAccount. QueryByOrigin may provide a list of all EmployeeTimeAccount line items which satisfy the selection criteria. The query may return those EmployeeTimeAccount line items which are originated by either the EmployeeTimeCalendarPeriodItem or the EmployeeTimeAccountMaintenanceRequestLineItemSpecification. GDT EmployeeTimeAccountLineItemOriginQueryElements may define the query elements EmployeeTimeCalendarPeriodItemUUID (a GDT of type UUID) and EmployeeTimeAccountMaintenanceRequestLineItemSpecificationUUID (a GDT of type UUID). Time valuation may generate EmployeeTimeAccountLineItems in more than one EmployeeTimeAccount. Therefore, the query for line items based on origin may return EmployeeTimeAccountLineItems that belong to more than one EmployeeTimeAccount.

LineItemDifferentPayment

In some embodiment, A LineItemDifferentPayment is a document item for the payment of an EmployeeTimeAccountLineItem which replaces the rules which are usually applied in payroll calculation for determining the payment of the EmployeeTimeAccountLineItem. An exemplary different payment is a special hourly rate for overtime payout. The elements located at the LineItemDifferentPayment node may be defined by the type GDT: EmployeeTimeAccountLineItemDifferentPaymentElements. An exemplary elements is EmployeeTimeDifferentPayment. An EmployeeTimeDifferentPayment can be a structure containing information about different payment. A separate GDT is defined here to enable reuse.

Balance

In some implementations, the Balance is sum of line items with a posting date lower or equal to the Date. The BalanceType may represent different balances of EmployeeTimeAccount. It can determine which LineItem enters a particular balance. The elements located with the node Balance can be defined by the GDT type EmployeeTimeAccountBalanceElements. Exemplary elements are TypeCode, Date, Quantity, and/or QuantityTypeCode. TypeCode can be the balance type used to determine the Balance and can be a GDT of type EmployeeTimeAccountBalanceTypeCode. Date can be a GDT of type Date and the date used to determine the Balance. LineItems with a posting date lower or equal to the Date are summed in a Balance. If Date is not specified then LineItems are summed independently of their posting dates. Quantity is quantity of balance for a particular employee time and is a GDT of type Quantity. QuantityTypeCode is the coded representation of a type of quantity and is a GDT of type QuantityTypeCode.

FIG. 188 illustrate one example logical configuration of EmployeeTimeAccount 188000. Specifically, this figure depicts the arrangement and hierarchy of various components such as one or more levels of packages, entities, and datatypes, shown here as 188000 through 188018. As described above, packages may be used to represent hierarchy levels. Entities are discrete business elements that are used during a business transaction. Data types are used to type object entities and interfaces with a structure. For example, EmployeeTimeAccount 188000 includes, among other things, EmployeeTimeAccount 188004. Accordingly, heterogeneous applications may communicate using this consistent message configured as such.

FIG. 189-1 through 189-4 illustrates one example logical configuration of EmployeeTimeAccountPayrollMessage 189000. Specifically, this figure depicts the arrangement and hierarchy of various components such as one or more levels of packages, entities, and datatypes, shown here as 189000 through 189112. As described above, packages may be used to represent hierarchy levels. Entities are discrete business elements that are used during a business transaction. Data types are used to type object entities and interfaces with a structure. For example, EmployeeTimeAccountPayrollMessage 189000 includes, among other things, EmployeeTimeAccount 189004. Accordingly, heterogeneous applications may communicate using this consistent message configured as such.

Message Types and their Signatures

This section describes the message types and their signatures that, in some implementations, are derived from the operations of the business object EmployeeTimeAccount. In a signature, the business object may be contained as a "leading" business object. The message data type can determine the structure of the following message types.

The Motivating Business Scenarios message is used to notify Payroll about the balance of EmployeeTimeAccount. Examples of balances are quantity accrued, quantity deducted, quantity paid out, and remaining balance.

EmployeeTimeAccountPayrollNotification can be a message specifying time account information in a summarized form. The structure of this message type is determined by the message data type EmployeeTimeAccountPayrollMessage. Constraints on the structure and integrity of EmployeeTimeAccountPayrollNotification may be imposed by message data type EmployeeTimeAccountPayrollMessage.

In some implementations, the EmployeeTimeAccountPayrollMessage message data type may contain the object EmployeeTimeAccount which is contained in the business document and the business information that is relevant for sending a business document in a message. It may contain the packages MessageHeader package and EmployeeTimeAccount package. This message data type, therefore, can provide the structure for message types, such as EmployeeTimeAccountPayrollNotification, and the operations that are based on them.

In some implementations, MessageHeader Package can be a grouping of business information that is relevant for sending a business document in a message. It may contain entities, such as MessageHeader.

In some implementations, MessageHeader can be a grouping of business information from the perspective of the sending application. Exemplary business information may include: Identification of the business document in a message, Date/time of the creation of the message, Information about the sender, Information about the recipient, and/or Reconciliation counter.

The MessageHeader can be of the type GDT: BusinessDocumentMessageHeader and may contain the elements, ID, CreationDateTime, SenderParty, RecipientParty, and/or ReconciliationMessageIndicator. ID may be the Identifier of the message and a GDT of type BusinessDocumentMessageID. CreationDateTime may be the Date/time of the creation of the message and a GDT of type DateTime. SenderParty may be information about the sender and a GDT of type BusinessDocumentMessageHeaderParty. RecipientParty may be information about the recipient and a GDT of type BusinessDocumentMessageHeaderParty. ReconciliationMessageIndicator may be a Reconciliation indicator and a GDT of type Indicator.

In some implementations, EmployeeTimeAccount Package is the grouping of EmployeeTimeAccount with its packages, such as Balance package. The EmployeeTimeAccount package may contain one EmployeeTimeAccount. EmployeeTimeAccount may contain elements such as WorkAgreementUUID, (BalanceListCompleteTransmissionIndicator, TypeCode, and/or IdentifyingPeriod. WorkAgreementUUID (a GDT of type.UUID) may be a Unique identifier of the WorkAgreement and have a cardinality relationship of 1. @BalanceListCompleteTransmissionIndicator may be a GDT of type Indicator and have a cardinality of 1. TypeCode may be a GDT of type EmployeeTimeAccountTypeCode and have a cardinality relationship of 1. IdentifyingPeriod may be a GDT of type DatePeriod, with a possible restriction CLOSED and may have a cardinality relationship of 1. EmployeeTimeAccount may belong to an EmployeeTimeAgreement and when there is a message to payroll EmployeeTimeAgreement may have one to one mapping to WorkAgreement.

In some embodiments, the Balance Package may contains the exemplary elements ActionCode, TypeCode, Date, Quantity, and/or QuantityTypeCode. @aActionCode may be a GDT of type ActionCode with a cardinality relationship of 1. TypeCode may be a GDT of type EmployeeTimeAccount- BalanceTypeCode with a cardinality of 1. Date may be a GDT of type Date with a cardinality relationship of 0 to 1. Quantity may be a GDT of type Quantity with a cardinality of 1. QuantityTypeCode may be a GDT of type QuantityTypeCode with a cardinality of 0 to 1.

IdentifyingPeriod and EmployeeTimeAccountTypeCode may not be at the root level but at balance level so as to send multiple messages in a single notification for many accounts for a single employee.

FIGS. 190-1 through 190-4 illustrate one example of an EmployeeTimeAgreement business object model 190000. Specifically, these figures depict interactions among various hierarchical components of the EmployeeTimeAgreement, as well as external components that interact with the EmployeeTimeAgreement (shown here as 190002 through 190030).

Business Object EmployeeTimeAgreement

An EmployeeTimeAgreement is a set of time management stipulations that are derived from legal, company-specific, and pay-related provisions, and terms agreed individually with the employee.

Examples of such provisions are those governing time recording or the annual leave entitlement. Employee-specific business objects in time management such as EmployeeTime or EmployeeTimeCalendar always relate to an EmployeeTimeAgreement.

The business object EmployeeTimeAgreement belongs to the process component Time & Labor Management.

An EmployeeTimeAgreement contains a reference to the employee, and items containing the provisions.

Service Interfaces

The business object EmployeeTimeAgreement 190032 is involved in the following Process Component Interaction Models: Time and Labor Management_Payroll Processing_Agreement The technical name of the object is TimeAndLabourManagementEmployeeTimeAgreementInPayrollInputMaintenanceOut.

The Service Interface Employee Time Agreement in Payroll Input Maintenance Out is part of the following Process Integration Models: Time and Labor Management_Payroll Processing_Agreement.

The Service Interface Employee Time Agreement in Payroll Input Maintenance Out comprises operations that trigger the notification of the process component Payroll Processing by the BO EmployeeTimeAgreement.

The technical name of the Notify of Planned Working Times operation is TimeAndLabourManagementEmployeeTimeAgreementInPayrollInputMaintenanceOut.NotifyOfPlannedWorkingTimes. The operation Notify of Planned Working Times notifies the country specific Employee Payroll Input object about the planned working times. These are: DE_Employee Payroll Input.

The operation is based on message type EmployeeTimeAgreementPlannedWorkingTimesPayrollNotification, and is derived from business object EmployeeTimeAgreement.

Node Structure of the Business Object EmployeeTimeAgreement

An EmployeeTimeAgreement is a set of time management stipulations that are derived from legal, company-specific, and pay-related provisions, and terms agreed individually with the employee.

EmployeeUUID is the universally unique identifier of an Employee, and is of GDT type UUID.

The following composition relationships exist: Item 190034, which has a cardinality of 1:n.

An inbound association relationship from business object Employee, node root, exists. Employee has a cardinality of 1:c, and is the Employee for whom the EmployeeTimeAgreement is valid. The Employee is used also for access control to a EmployeeTimeAgreement.

In some implementations, if there is a link to the business object Employee, it can no longer be changed.

The QueryByElements query lists all EmployeeTimeAgreements that satisfy certain selection criteria. The query elements are defined by the GDT EmployeeTimeAgreementElementsQueryElements. The elements include: EmployeeUUID, which is optional and is of GDT type UUID. Employee_IdentificationEmployeeID, which is optional and is of GDT type EmployeeID. Employee_CommonPersonNameFamilyName, which is optional and is of GDT type Name, LANGUAGEINDEPENDENT_MEDIUM_Name. Employee_CommonPersonNameGivenName, which is optional and is of GDT type Name, LANGUAGEINDEPENDENT_MEDIUM_Name. ReportingLineUnit_ID, which is optional and is of GDT type OrganisationalCentreID. ReportingLineUnit_NameName, which is optional and is of GDT type Name. Employee_EmployeeTypeInternalEmployeeIndicator, which is optional and is of GDT type Indicator, qualifier Employee.

Item

An EmployeeTimeAgreementItem is a set of time management stipulations that are derived from legal, company-specific, and pay-related provisions, and terms agreed individually with the employee that relates either to the employee, a specific employment relationship, or a workagreement.

UUID is the universally unique identifier of an EmployeeTimeAgreementItem, and is of GDT type UUID. ParentItemUUID is optional, is of GDT type UUID, and is the universally unique identifier of another EmployeeTimeAgreementItem. It is used in cases that include: to assign an Item referring to an Employment to an item referring to a WorkAgreement, to assign an Item that represents an Employee to an Item referring to an Employment, from the perspective of the Item, this is the ParentItem. EmploymentUUID is optional, is of GDT type UUID, and is the universally unique identifier of an Employment to which the EmployeeTimeAgreementItem refers. The Employment is the employment relationship to which the Item provisions apply.

WorkAgreementUUID is optional, is of GDT type UUID, and is the universally unique identifier of a WorkAgreement to which the EmployeeTimeAgreementItem refers. The WorkAgreement is the work agreement to which the Item provisions apply.

The following composition relationships exist: ItemPeriodProvisions 190036, which has a cardinality of 1:cn. ItemPlannedWorkingTime 190048, which has a cardinality of 1:cn. ItemTimeAccountProvisions 190052, which has a cardinality of 1:cn. ItemTimeRecordingDefaults 190056, which has a cardinality of 1:cn. ItemTimeRecordingProvisions 190058, which has a cardinality of 1:cn. AttachmentFolder 190060, which has a cardinality of 1:c.

A number of inbound association relationships may exist, including: 1) From the business object Employment/Root: Employment, which has a cardinality of c:c and is the employment relationship to which the provisions of the Item apply. 2) From the business object WorkAgreement/Root: WorkAgreement, which has a cardinality of c:c and is the workagreement to which the provisions of the Item apply.

The inbound aggregation relationship from the business object EmployeeTimeAgreement/Item, ParentItem, which has a cardinality of c:cn, exists. This self-reference is used to:

Assign an Item that refers to an Employment to an Item referring to a WorkAgreement or Assign an item that represents an Employee to an Item referring to an Employment.

A number of associations for navigation may exist, including: 1) To business object EmployeeTimeAccount, node LineItem: EmployeeTimeAccountLineItem has a cardinality of c:cn. These are the LineItems of all EmployeeTimeAccounts referencing a specific EmployeeTimeAgreementItem identified by an EmployeeTimeValuationStepCode and whose PostingDate is included in a given DatePeriod. The filter elements are defined by the data type EmployeeTimeAgreementItemEmployeeTimeAccountLineItemByDatePeriodAndStepCodeFilterElements.

These elements are: DatePeriod is optional and is of GDT type CLOSED_DatePeriod. EmployeeTimeValuationStepCode is optional and is of GDT type EmployeeTimeValuationStepCode. 2) To business object EmployeeTimeAccount, node root: EmployeeTimeAccount has a cardinality of c:cn. These are the EmployeeTimeAccounts valid for an EmployeeTimeAgreementItem and that are identified by a TypeCode, an AutomaticallyGeneratedIndicator, an IdentifyingPeriod, a CancelledIndicator and whose ProcessingPeriod intersects with a given DatePeriod. The filter elements are defined by the data type EmployeeTimeAgreementItemEmployeeTimeAccountByRootElementsFilterElements.

These elements include: TypeCode is optional and is of GDT type EmployeeTimeAccountTypeCode. IdentifyingPeriod is optional and is of GDT type CLOSED_DatePeriod. AutomaticallyGeneratedIndicator is optional and is of GDT type Indicator, qualifier Generated. DatePeriod is optional and is of GDT type CLOSED_DatePeriod. CancelledIndicator is optional and is of GDT type Indicator. 3) To business object EmployeeTimeAccount, node root: AutomaticallyGeneratedEmployeeTimeAccount has a cardinality of c:cn and these are the automatically generated EmployeeTimeAccounts valid for the EmployeeTimeAgreementItem and identified by a specified date period and a type code. The filter elements are defined by the data type EmployeeTimeAgreementItemAutomaticallyGeneratedEmployeeTimeAccountByTypeCodeAndIdentifyingPeriodFilterElements. These elements are: TypeCode is optional and is of GDT type EmployeeTimeAccountTypeCode. IdentifyingPeriod is optional and is of GDT type CLOSED_DatePeriod. 4) To business object EmployeeTimeCalendar, node Period: EmployeeTimeCalendarPeriod has a cardinality of c:cn. These are the Periods of all EmployeeTimeCalendars valid for an EmployeeTimeAgreementItem and that are identified by an EmployeeTimeValuationStepCode and whose DatePeriod intersect with a specified DatePeriod. The filter elements are defined by the data type EmployeeTimeAgreementItemEmployeeTimeCalendarPeriodByDatePeriodAndStepCodeFilterElements. These elements are: DatePeriod is optional, and is of GDT type CLOSED_DatePeriod. EmployeeTimeValuationStepCode is optional, and is of GDT type EmployeeTimeValuationStepCode. 5) To business object EmployeeTimeCalendar, node Root: EmployeeTimeCalendar has a cardinality of c:cn. These are all EmployeeTimeCalendars valid for the EmployeeTimeAgreementItem identified by a valuation step. The filter elements are defined by the data type EmployeeTimeAgreementItemEmployeeTimeCalendarByStepCodeFilterElements. These elements are: EmployeeTimeValuationStepCode is optional and is of GDT type EmployeeTimeValuationStepCode. 6) To business object EmployeeTime, node Item: EmployeeTimeItem has a cardinality of c:cn. These are the EmployeeTimeItems of all EmployeeTimes valid for an EmployeeTimeAgreementItem and whose EmployeeTimeValidity intersects with a given DatePeriod. The filter elements are defined by the data type EmployeeTimeAgreementItemEmployeeTimeItemByDatePeriodFilterElements. These elements are: DatePeriod is optional and is of GDT type CLOSED_DatePeriod. 7) To business object EmployeeTimeAccountMaintenanceRequest, node LineItemSpecification: EmployeeTimeAccountMaintenanceRequestLineItemSpecification has a cardinality of c:cn. These are the EmployeeTimeAccountMaintenanceRequestLineItemSpecifications valid for an EmployeeTimeAgreementItem and whose PostingDate intersects with a given DatePeriod. The filter elements are defined by the data type EmployeeTimeAgreementItemEmployeeTimeAccountMaintenanceRequestLineItemSpecificationBy DatePeriodFilterElements. These elements are: DatePeriod is optional and is of GDT type CLOSED_DatePeriod. 8) To business object EmployeeTimeAccount, node Balance: EmployeeTimeAccountBalance has a cardinality of c:cn. These are the Balances of all EmployeeTimeAccounts referencing a specific EmployeeTimeAgreementItem identified by a given DatePeriod. The filter elements are defined by the data type EmployeeTimeAgreementItemEmployeeTimeAccountBalanceByDatePeriodFilterElements. These elements are: DatePeriod is optional and is of GDT type CLOSED_DatePeriod.

Once a reference to an Employment or WorkAgreement exists, it can no longer be changed. An Item cannot refer to both an Employment and a WorkAgreement. It is not possible to have multiple Items that do not refer either to an Employment or to a WorkAgreement. The ValidityPeriods of the following nodes cannot overlap: ItemTimeRecordingProvisions, ItemTimeRecordingDefaults, ItemPlannedWorkingTime, ItemPeriodProvisions, ItemTimeAccountProvisions.

The QueryByElements query lists all EmployeeTimeAgreementItems that satisfy certain selection criteria. The query elements are defined by the GDT EmployeeTimeAgreementItemElementsQueryElements, and include: KeyDate is optional, is of GDT type Date, and represents all items that are selected that have at least one subnode whose ValidityPeriod includes this date. EmployeeTimeAgreementEmployeeUUID is optional and is of GDT type UUID. Employee_IdentificationEmployeeID is optional and is of GDT type EmployeeID. Employee_CommonPersonNameFamilyName is optional and is of GDT type Name, LANGUAGEINDEPENDENT_MEDIUM_Name. Employee_CommonPersonNameGivenName is optional and is of GDT type Name, LANGUAGEINDEPENDENT_MEDIUM_Name. ReportingLineUnit_ID is optional and is of GDT type OrganisationalCentreID. ReportingLineUnit_NameName is optional and is of GDT type Name. Employee_EmployeeTypeInternalEmployeeIndicator is optional and is of GDT type Indicator, qualifier Employee. EmploymentUUID is optional and is of GDT type UUID. WorkAgreementUUID is optional and is of GDT type UUID. ItemPeriodProvisionsTimeAccountProvisionsEmployeeTimeAccountAccrualRuleCode is optional and is of GDT type EmployeeTimeAccountAccrualRuleCode.

ItemTimeRecordingProvisions are provisions governing the way in which EmployeeTimes are recorded. In some implementations, this node contains the same data as the node ItemPeriodProvisionsTimeRecordingProvisions 190044 taking into consideration the validity period of node ItemPeriodProvisions.

The ValidityPeriod is the validity period for the ItemTimeRecordingProvisions, and is of GDT type CLOSED DatePeriod, qualifier Validity. A CompletenessRequiredIndicator is an indicator that specifies whether the actual working times are recorded completely. If they are not recorded completely, the times recorded are deviations from the planned working times, and is of GDT type Indicator, qualifier Required.

ItemTimeAccountProvisions are provisions for the time accounts of an employee. This node contains the validity period of node ItemPeriodProvisions taking into consideration the cardinality of node ItemPeriodProvisionsTimeAccountProvisions 190046.

The ValidityPeriod is the validity period for the ItemTimeAccountProvisions and is of GDT type CLOSED_DatePeriod, qualifier Validity. The composition relationships include: ItemTimeAccountProvisionsDetail 190054 has a cardinality 1:cn, and is the time account provisions for a certain validity period.

ItemTimeAccountProvisionsDetail are a detained representation of time account provisions for a certain validity period. This node contains the same data as the node ItemPeriodProvisionsTimeAccountProvisions. EmployeeTimeAccountTypeCode is the TypeCode of an EmployeeTimeAccount and is of GDT type EmployeeTimeAccountTypeCode. EmployeeTimeAccountAccrualRuleCode is an EmployeeTimeAccountAccrualRuleCode is a code identifying an accrual rule for an employee time account, and is of GDT typeEmployeeTimeAccountAccrualRuleCode. An accrual rule specifies, for example, how much time (for example, 30 days) is to be posted to an employee time account. DeviatingAccrualQuantity is optional, is of GDT type Quantity, qualifier Accrual, and is a DeviatingAccrualQuantity is the amount of time (for example 32 days) that has to be used for accruals to time accounts and which deviates from the amount of time included in the EmployeeTimeAccountAccrualRuleCode (for example, 30 days).

ItemTimeRecordingDefaults are default values that are used in the recording of employee times. ItemTimeRecordingDefaults can, for example, specify which ServiceProduct is used in recording employee times. This node contains the same data as node ItemPeriodProvisions taking into consideration the validity period of node ItemPeriodProvisions. ValidityPeriod is the validity period of the ItemTimeRecordingDefaults, and is of GDT type CLOSED_DatePeriod, qualifier Validity. ServiceProductUUID is optional, is the universally unique identifier of a ServiceProduct, used as a default value for a resource consumption, and is of GDT type UUID. ServiceProductID is optional, is a human readable identifier of a ServiceProduct, used as a default value for a resource consumption, and is of GDT type ProductID. LabourResourceUUID is optional, is the universally unique identifier of a resource whose labor was consumed, and is of GDT type UUID. LabourResourceID is optional, is a human readable identifier of a resource whose labor was consumed, and is of GDT type ResourceID.

A number of inbound association relationships exist, including: 1) From business object ServiceProduct/Root: ServiceProduct has a cardinality of c:cn, and refers to a ServiceProduct that is used as default value for a resource consumption. 2) From business object LabourResource/Root: LabourResource has a cardinality of c:cn, and refers to a Resource whose labor was consumed.

The ItemPlannedWorkingTime is a description of the time according to which the employee is planned to work. In some implementations, this node contains the same data as node ItemPeriodProvisionsPlannedWorkingTime taking into consideration the validity period of node ItemPeriodProvisions.

The ValidityPeriod is the validity period of ItemPlannedWorkingTime, and is of GDT type CLOSED_DatePeriod, qualifier Validity. EmployeeTimeUUID is optional, the EmployeeTimeUUID is the unique universal identifier for the associated EmployeeTime, and is of GDT type UUID. EmployeePlannedWorkingTimeDayTypeDeterminationRuleCode is optional. An EmployeePlannedWorkingTimeDayTypeDeterminationRuleCode is the coded representation of the rule for determining the day type of the planned working time of an employee, and is of GDT type EmployeePlannedWorkingTimeDayTypeDeterminationRuleCode.

The following composition relationships exist: ItemPlannedWorkingTimeAverageRate 190050, which has a cardinality of 1:cn. In some implementations, there are various rates, multiple ItemPlannedWorkingTimeAverageRates are required.

An association for navigation to business object EmployeeTime/Root exists. EmployeeTime has a cardinality of 1:c. This association references an EmployeeTime describing a long-term planned working time.

The CreateEmployeeTimeItem action is responsible for the creation of EmployeeTimes representing a planned working time. In some embodiments, the action creates an EmployeeTime and an EmployeeTimeItem when it is called the first time. On any further call it creates an EmployeeTimeItem to the already existing EmployeeTime. It changes the field EmployeeTimeUUID. An EmployeeTimeItem is added to an EmployeeTime via CREATE. The action can be called by anybody.

In some implementations, the rate units of the ItemPlannedWorkingTimeAverageRates may differ from one another. A rate unit is the fraction of two time related MeasureUnitCodes, for example hours per day or hours per week.

An ItemPlannedWorkingTimeAverageRate is the average working time with reference to one specific rate unit.

In some implementations, a rate unit is the fraction of two time related MeasureUnitCodes, for example hours per day or hours per week. This node contains the same data as node ItemPeriodProvisionsPlannedWorkingTimeAverageRate 190042 taking into consideration the validity period of node ItemPeriodProvisions.

The Rate is the average working time, and is of GDT type Rate with restriction CurrencyCode and BaseCurrencyCode are not used.

An ItemAttachmentFolder of an EmployeeTimeAgreementItem is a folder where a document containing information about the EmployeeTimeAgreementItem can be stored. Example: a medical certificate.

ItemPeriodProvisions contains the time management stipulations that are derived from legal, company-specific, and pay-related provisions, and terms agreed individually with the employee into specific provisions.

The ValidityPeriod is the validity period for the ItemPeriodProvisions and is of GDT type CLOSED_DatePeriod, qualifier Validity. The following composition relationships exist: ItemPeriodProvisionsTimeRecordingProvisions has a cardinality of 1:c, ItemPeriodProvisionsPlannedWorkingTime has a cardinality of 1:c, ItemPeriodProvisionsTimeAccountProvisions has a cardinality of 1:cn, ItemPeriodProvisionsTimeRecordingDefaults 190038 has a cardinality of 1:c.

The ItemPeriodProvisionsPlannedWorkingTime describes the planned working time of an employee. The EmployeeTimeUUID is the unique universal identifier for the associated EmployeeTime, and is of GDT type UUID. EmployeePlannedWorkingTimeDayTypeDeterminationRuleCode is optional, is an EmployeePlannedWorkingTimeDayTypeDeterminationRuleCode is the coded representation of the rule for determining the day type of the planned working time of an employee, and is of GDT type EmployeePlannedWorkingTimeDayTypeDeterminationRuleCode. The following composition relationship exists. ItemPeriodProvisionsPlannedWorkingTimeAverageRate has a cardinality of 1:cn. Since there are various rates, multiple ItemPeriodProvisionsPlannedWorkingTimeAverageRates are required.

An association for navigation, to business object EmployeeTime/Root exists. EmployeeTime has a cardinality of 1:c, and references an EmployeeTime describing a long-term planned working time.

The CreateEmployeeTimeItem action is responsible for the creation of EmployeeTimes representing a planned working time. In some implementations, the action creates an EmployeeTime and an EmployeeTimeItem when it is called the first time. On any further call it creates an EmployeeTimeItem to the already existing EmployeeTime. It changes the field EmployeeTimeUUID. An EmployeeTimeItem is added to an EmployeeTime via CREATE. The action can be called by anybody. In some implementations, the rate units of the ItemPeriodProvisionsPlannedWorkingTimeAverageRates may differ from one another.

An ItemPeriodProvisionsPlannedWorkingTimeAverageRate is the average working time with reference to one specific rate unit. The Rate is the average working time and is of GDT type Rate with restriction: CurrencyCode and BaseCurrencyCode are not used.

ItemTimeAccountProvisions are provisions for the time accounts of an employee. EmployeeTimeAccountTypeCode is the TypeCode of an EmployeeTimeAccount and is of GDT type EmployeeTimeAccountTypeCode. EmployeeTimeAccountAccrualRuleCode is an EmployeeTimeAccountAccrualRuleCode is a code identifying an accrual rule for an employee time account. An accrual rule specifies, for example, how much time (for example, 30 days) is to be posted to an employee time account, and is of GDT typeEmployeeTimeAccountAccrualRuleCode. DeviatingAccrualQuantity is optional, is a DeviatingAccrualQuantity is the amount of time (for example 32 days) that has to be used for accruals to time accounts and which deviates from the amount of time included in the EmployeeTimeAccountCreationRuleCode (for example, 30 days), and is of GDT type Quantity, qualifier Accrual.

ItemPeriodProvisionsTimeRecordingDefaults are default values that are used in the recording of employee times. In some implementations, ItemTimeRecordingDefaults can, for example, specify which ServiceProduct is used in recording employee times.

ServiceProductUUID is optional, is a universally unique identifier of a ServiceProduct, used as a default value for a resource consumption, and is of GDT type UUID. ServiceProductID is optional, is a human readable identifier of a ServiceProduct, used as a default value for a resource consumption, and is of GDT type UUID. LabourResourceUUID is optional, is a universally unique identifier of a resource whose labor was consumed, and is of GDT type UUID. LabourResourceID is optional, is a human readable identifier of a resource whose labor was consumed, and is of GDT type ResourceID.

A number of inbound association relationships exist, including: 1) From business object ServiceProduct/Root: ServiceProduct has a cardinality of c:c and refers to a ServiceProduct that is used as default value for a resource consumption. 2) From business object LabourResource/Root: LabourResource has a cardinality of c:c and refers to a Resource whose labor was consumed.

ItemPeriodProvisionsTimeRecordingProvisions are provisions governing the way in which EmployeeTimes are recorded.

A CompletenessRequiredIndicator is an indicator that specifies whether the actual working times are recorded completely. If they are not recorded completely, the times recorded are deviations from the planned working times. It is of GDT type Indicator, qualifier Required.

FIG. 191-1 through 191-4 illustrates one example logical configuration of EmployeeTimeAgree-mentNotificationMessage 191000. Specifically, this figure depicts the arrangement and hierarchy of various components such as one or more levels of packages, entities, and datatypes, shown here as 191000 through 191024. As described above, packages may be used to represent hierarchy levels. Entities are discrete business elements that are used during a business transaction. Data types are used to type object entities and interfaces with a structure. For example, EmployeeTimeAgreementNotificationMessage 191000 includes, among other things, EmployeeTimeAgreementNotification 191004. Accordingly, heterogeneous applications may communicate using this consistent message configured as such.

FIG. 192-1 through 192-6 illustrates one example logical configuration of EmployeeTimeAgree-mentNoti-fication-Message 192000. Specifically, this figure depicts the arrangement and hierarchy of various compo-nents such as one or more levels of packages, entities, and datatypes, shown here as 192000 through 192120. As described above, packages may be used to represent hierarchy levels. Entities are discrete business elements that are used during a business transaction. Data types are used to type object entities and interfaces with a structure. For example, EmployeeTimeAgreementNotificationMessage 192000 in-cludes, among other things, EmployeeTimeAgreementNotification 192044. Accordingly, heterogeneous applications may communicate using this consistent message configured as such.

This section describes the message types and their signatures that are derived from the operations of the business object EmployeeTimeAgreement. In a signature, the business object is contained as a "leading" business object. The message data type determines the structure of the following message types.

EmployeeTimePlannedWorkingTimePayrollNotification is a message that transfers data from Em-ployeeTimeAgreement to Payroll Processing. The structure of this message type is determined by the mes-sage data type EmployeeTimeAgreementNotificationMessage. For payroll processing data of the TimeA-greement is needed. This message transfers relevant data from the EmployeeTimeAgreement to payroll processing. This message data type contains: The object EmployeeTimeAgreementNotification which is contained in the business document, and the business information that is relevant for sending a business document in a message. It contains the packages: MessageHeader package, EmployeeTimeAgreementNoti-fication package. This message data type, therefore, provides the structure for the operations that are based on it.

MessageHeader package is a grouping of business information that is relevant for sending a busi-ness document in a message. It contains the entity MessageHeader.

MessageHeader is a grouping of business information from the perspective of the sending applica-tion that includes: Identification of the business document in a message, date/ time of the creation of the message, information about the sender, information about the recipient, reconciliation counter.

The MessageHeader includes: ID, CreationDateTime, SenderParty, RecipientParty, Reconciliation-MessageIndicator. It is of the type is of GDT typeBusinessDocumentMessageHeader, and the elements of the GDT include: BusinessDocumentMessageID, DateTime, BusinessDocumentMessageHeaderParty, BusinessDocumentMessageHeaderParty, Indicator.

SenderParty is the partner responsible for sending a business document at business application level. The SenderParty is of the type is of GDT typeBusinessDocumentMessageHeaderParty.

RecipientParty is the partner responsible for receiving a business document at business application level. The RecipientParty is of the type is of GDT typeBusinessDocumentMessageHeaderParty.

EmployeeTimeAgreementNotification Package is the grouping of EmployeeTimeAgreementNotifica-tion with its packages that include: AverageWorkingTime package, WorkWeek package.

EmployeeTimeAgreementNotification is similar to business object EmployeeTimeAgreement, node root. EmployeeTimeAgreementNotification contains elements that include: WorkagreementUUID has a car-dinality of 1 and is of GDT type UUID, @AverageWorkingTimeListCompleteTransmissionIndicator has a cardinality of 1 and is of GDT type Indicator, @WorkWeekListCompleteTransmissionIndicator has a cardinal-ity of 1 and is of GDT type Indicator, AverageWorkingTime has a cardinality of 0..n and is of IDT type EmployeeTimeAgreementNotificationAverageWorkingTime, WorkWeek has a cardinality of 0..n and is of IDT type EmployeeTimeAgreementNotificationWorkWeek.

AverageWorkingTime Package is the grouping of AverageWorkingTime. AverageWorkingTime is similar to business object EmployeeTimeAgreement, node ItemPlannedWorkingTime. AverageWorkingTime contains the elements that include: ValidityPeriod has a cardinality of 1 and is of GDT type CLOSED_DatePeriod, Rate has a cardinality of 1:n and is of GDT type EmployeeTimeAgreementNotificationAverageWorkingTimeRate.

Rate is similar to business object EmployeeTimeAgreement, node ItemPlannedWorkingTimeAver-ageRate. AverageWorkingTime includes the element: Rate has a cardinality of 1 and is of GDT type Rate.

WorkWeek Package is the grouping of WorkWeek. A WorkWeek is a recurring period of working time which begins and ends within 7-days. WorkWeek includes the elements: ValidityPeriod has a cardinal-ity of 1 and is of GDT type CLOSED_DatePeriod, StartDay has a cardinality of 1 and is of GDT type DayOf-Week, StartTime has a cardinality of 1 and is of GDT type Time.

The list of data types used (GDTs) includes: BusinessDocumentMessageHeader, BusinessDocu-mentMessageID, DateTime, BusinessDocumentMessageHeaderParty, Indicator, UUID, CLOSED_DatePeriod, Rate, DayOfWeek, Time.

Business Object EmployeeTimeConfirmationViewOfProject

FIG. 193 illustrates an example EmployeeTimeConfirmationViewOfProject business object model 193000. Specifically, this model depicts interactions among various hierarchical components of the EmployeeTimeConfirmationViewOfProject, as well as external components that interact with the EmployeeTimeConfirmationViewOfProject (shown here as 193002 through 193008 and 193018 through 193032).

An EmployeeTimeConfirmationViewOfProject is a view on a project, adapted for the confirmation of Employee Times. An EmployeeTime is a document concerning the planned and actual working times of an internal or external employee of the company. EmployeeTimeConfirmationViewOfProject is based on business object Project. Among other advantages, it can provide clearer semantics by decoupling business logic between Process Components Project Processing and Time and Labour Management. In some implementations, it is not a projection of the max Template Project_Template. The business object EmployeeTimeConfirmationViewOfProject can be part of the process component Time & Labour Management. EmployeeTimeConfirmationViewOfProject contains information about project tasks (Task). The Business Object EmployeeTimeConfirmationViewOfProject can be involved in the ProjectProcessing_TimeAndLabourManagement Process Integration Model. The Service Interface Project Task Confirmation In can be part of the ProjectProcessing_TimeAndLabourManagement Process Integration Model. The Project Task Confirmation In Service Interface can group operations which maintain the project view within Time And Labour Management. The operation Maintain EmployeeTimeConfirmationViewOfProject can create, update or delete the project view within Time and Labour Management. This message can be based on Business Object Project. The operation can be based on the message type EmployeeTimeConfirmationViewOfProjectNotification, derived from the business object Project. After relevant project information is updated in Project Processing, the message type ProjectTimeAndLabourManagementNotification can be sent to Time and Labour Management to update the corresponding information in the project view.

Node Structure of Business Object EmployeeTimeConfirmationViewOfProject (Root Node)

An EmployeeTimeConfirmationViewOfProject 193010 is the view of a project, adapted for the confirmation of Employee Times. It can contain information about tasks, and the assignment of employees to these tasks. The elements located directly at the EmployeeTimeConfirmationViewOfProject can be defined by the type GDT: EmployeeTimeConfirmationViewOfProjectElements. In certain implementations, these elements include UUID, ProjectID, ResponsibleCostCentreUUID, ResponsibleCostCentreID, and LanguageCode. UUID is a universal identifier, which can be unique, of an EmployeeTimeConfirmationViewOfProject. UUID may be based on GDT: UUID. ProjectID is a human readable identification of the project. ProjectID may be based on GDT: ProjectID.

ResponsibleCostCentreUUID is a universal identifier, which can be unique, of the cost center that is responsible for the project, and is optional. ResponsibleCostCentreUUID may be based on GDT: UUID.

ResponsibleCostCentreID is the cost center that is responsible for the project and is optional.

ResponsibleCostCentreID may be based on GDT: OrganisationalCentreID. LanguageCode is the code of the project language. LanguageCode may be based on GDT: LanguageCode.

Composition relationships to subordinate nodes may exist, such as a Task 193012 1:n relationship.

Inbound aggregation relationships may exist, such as from business object Project/node Root (Cross DU), such as Project 1:c, related to original project identification. Inbound association relationships from the business object CostCentre/node Root can exist, such as ResponsibleCostCentreC:cn, related to a Cost Centre responsible for the project.

Task

A Task includes activities that can be performed as part of a project so as to achieve the project goals. The elements located directly at the node Task are defined by the type GDT: EmployeeTimeConfirmationViewOfProjectTaskElements. In certain implementations, these elements include UUID, ID, ResponsibleEmployeeUUID, ResponsibleEmployeeID, PlannedPeriod, ConfirmationExtendedApprovalRequiredIndicator, ConfirmationAllowedIndicator, Key, ProjectID, and TaskID. UUID is a universal identifier, which can be unique, of a Task. UUID may be based on GDT: UUID. ID is an identifier of a Task. ID may be based on GDT: ProjectElementID. ResponsibleEmployeeUUID is a universal identifier, which can be unique, of the employee who is responsible for the task and is optional. ResponsibleEmployeeUUID may be based on GDT: UUID. ResponsibleEmployeeID is an Identifier of the employee who is responsible for the task and is optional. ResponsibleEmployeeID may be based on GDT: EmployeeID. PlannedPeriod is a time period during which the assignment of an employee to a task is planned. PlannedPeriod may be based on GDT: DateTimePeriod.

ConfirmationExtendedApprovalRequiredIndicator indicates whether extended confirmation approval is needed for this task. ConfirmationExtendedApprovalRequiredIndicator may be based on GDT: Indicator.

ConfirmationAllowedIndicator indicates whether it is allowed to confirm on this task. ConfirmationAllowedIndicator may be based on GDT: Indicator and Qualifier Allowed. Key is a unique structured key for a Task. Key may be based on IDT: EmployeeTimeConfirmationViewOfProjectTaskKey. In certain implementations, Key may be based on ProjectID and TaskID. ProjectID contains the human readable name of the project, which maps to the ProjectID element at the root node. ProjectID may be based on (GDT: ProjectID). TaskID is an identifier of the Task which maps to the ID element in the same Task node. TaskID may be based on GDT: ProjectElementID.

Since it is possible to uniquely identify the Project Summary Task (the only one that has the same ID as the project root), it is then feasible to retrieve the responsible employee for the whole project without the task hierarchy. Therefore the parent task information may not included in this BO. Since the ID is unique only within a Project, a combination of ProjectID and ID may be necessary to uniquely specify a Task.

Composition relationships to subordinate nodes can exist, such as TaskName 193014 1:cn and TaskService 193016 1:cn. Inbound Aggregation Relationships from business object Project/node Root (Cross DU) can exist, such as Task 1:c, related to an original task identification. Inbound Association Relationships from the business object Employee/node Root can exist, such as ResponsibleEmployee c:cn, related to a relationship to the employee responsible for performing this task.

A QueryByProjectReference can provide a list of Tasks for the given ProjectReference and Employee. The query elements are defined by the data type EmployeeTimeConfirmationViewOfProjectTaskProjectReferenceQueryElements. These elements can include ProjectReference, ResponsibleEmployeeID, ResponsibleEmployeeUUID, TaskServiceAssignedEmployeeID, TaskServiceAssignedEmployeeUUID, and ConfirmationAllowedIndicator. ProjectReference is optional and can be of type GDT: ProjectReference. ProjectID can map to the ProjectID at the root node, ProjectName can map to the Name at the ProjectSummaryTask, ProjectElementID can map to the ID at the Task node, ProjectElementName can map to the Name at the TaskName and ProjectElementTypeCode can be ignored. ResponsibleEmployeeID is optional and can be based on GDT: EmployeeID. ResponsibleEmployeeUUID is optional and can be of type GDT: UUID. TaskServiceAssignedEmployeeID is optional and can be of type GDT: EmployeeID.

TaskServiceAssignedEmployeeID can map to the EmployeeID at the TaskService node. TaskServiceAssignedEmployeeUUID is optional and can be of type GDT: UUID. TaskServiceAssignedEmployeeUUID can map to the EmployeeUUID at the TaskService node. ConfirmationAllowedIndicator is optional and can be of type GDT: Indicator.

TaskName

TaskName is the name of the task. The name of the task can exist in multiple languages. The elements located directly at the node TaskName can be defined by the type GDT: EmployeeTimeConfirmationViewOfProjectTaskNameElements. In certain implementations, these elements include Name. Name is a language dependent name of the task. Name may be based on GDT: MEDIUM_Name. In some implementations, the attribute LanguageCode can be mandatory for the Name field.

TaskService

TaskService assigns a service and a person that is responsible for performing the service to a task. The elements located directly at the node TaskService can be defined by the type GDT: EmployeeTimeConfirmationViewOfProjectTaskServiceElements. In certain implementations, these elements include UUID, ServiceProductUUID, ServiceProductID, AssignedEmployeeUUID, and AssignedEmployeeID. UUID is a universal identifier, which can be unique, of a TaskService. UUID may be based on GDT: UUID. ServiceProductUUID is a universal identifier, which can be unique, of the service product that is assigned to the task, and is optional. ServiceProductUUID may be based on GDT: UUID.

ServiceProductID is an Identifier of the service product that is assigned to the task, and is optional. ServiceProductID may be based on GDT: ProductID. AssignedEmployeeUUID is an universal identifier, which can be unique, of the employee who performs the service for a task, and is optional. AssignedEmployeeUUID may be based on GDT: UUID. AssignedEmployeeID is an identifier of the employee who carries out the service for a task, and is optional. AssignedEmployeeID may be based on GDT: EmployeeID.

Inbound Association Relationships can exist from the business object Employee/node Root, such as AssignedEmployee c:cn, related to an employee assigned to this task service, and from the business object ServiceProduct/node Root, Service Product c:cn, a Service product that is to be carried out within this task service. In some implementations, a TaskService can have at least an association to one of the BOs Employee and ServiceProduct.

EmployeeTimeConfirmationViewOfServiceTransactionDocument Business Object

FIGS. 194-1 through 194-2 illustrate an example EmployeeTimeConfirmationViewOfServiceTransactionDocument business object model 194002. Specifically, this model depicts interactions among various hierarchical components of the EmployeeTimeConfirmationViewOfServiceTransactionDocument, as well as external components that interact with the EmployeeTimeConfirmationViewOfServiceTransactionDocument (shown here as 194000 through 194034).

Is a view on a Business Transaction Document specifying sold or purchased services that are relevant for employee time confirmation. An Employee Time Confirmation is a document concerning the confirmation of actual working times of an internal or external employee of the company. Employee Time Confirmation View Of Service Transaction Document is based on order and contract related business objects.

Currently this Business Object is used to store information out of Purchase Orders and Purchasing Contracts. The business object EmployeeTimeConfirmationViewOfServiceTransactionDocument is part of the process component Time & Labour Management. EmployeeTimeConfirmationViewOfServiceTransactionDocument contains: The item representing the sold or purchased service, a reference to the company that has sold or purchased the service and the sold or purchased service product. The Business Object is involved in the PurchaseOrderProcessing_TimeAndLabourManagement Process Component Interaction Models.

In, Service Interface Employee Time Confirmation View of Service Transaction Document Management In, the Service Interface Purchasing In is part of the PurchaseOrderProcessing_TimeAndLabourManagement Process Integration Models. The EmployeeTimeConfirmationViewOfServiceTransactionDocumentManagementIn Service Interface groups operations which maintain EmployeeTimeConfirmationViewOfServiceTransactionDocument within Time And Labour Management.

Maintain EmployeeTimeConfirmationViewOfServiceTransactionDocument (A2A)

The operation Maintain EmployeeTimeConfirmationViewOfServiceTransactionDocument creates or updates EmployeeTimeConfirmationViewOfServiceTransactionDocument within Time and Labour Management. The operation is based on message type EmployeeTimeConfirmationViewOfServiceTransactionDocumentNotification.

After relevant Purchase Order information is updated in Purchase Order Processing, the message type EmployeeTimeConfirmationViewOfServiceTransactionDocumentNotification is sent to Time and Labour Management to update the corresponding information in the EmployeeTimeConfirmationViewOfServiceTransactionDocument.

Business Object EmployeeTimeConfirmationViewOfServiceTransactionDocument Structure An Employee Time Confirmation View Of Service Transaction Document is a view on a Business Transaction Document specifying sold or purchased services that are relevant for employee time confirmation.

An Employee Time Confirmation View Of Service Transaction Document specifies the company that sold or purchased the service, the sold or purchased service and the performer of the service.

The elements can be located directly at the node. EmployeeTimeConfirmationViewOfServiceTransactionDocument 194036 are defined by the data type EmployeeTimeConfirmationViewOfServiceTransactionDocumentElements. In certain implementations, these elements include UUID, ID, and Name. UUID is an universal identifier, which can be unique, of the EmployeeTimeConfirmationViewOfServiceTransactionDocument for referencing purposes. UUID may be based on GDT: UUID. ID is an Identifier for the EmployeeTimeConfirmationViewOfServiceTransactionDocument ID may be based on GDT: BusinessTransactionDocumentID. Name is a designation or title of the Service Transaction Document, and is optional. Name may be based on GDT: Medium_Name.

A number of composition relationships to subordinate nodes can exist, such as Party 194042 1:1 (in this View BO only one Party, the Company may be relevant) and Item 194038 1:n. Inbound Association Relationships to the business object PurchaseOrder node Root (Cross DU) can exist, such as PurchaseOrder c:cn, an association to the original Purchase Order. To the business object PurchasingContract node Root (Cross DU) a PurchasingContract c:cn relationship can exist, an association to the original Purchasing Contract.

In some implementations, EmployeeTimeConfirmationViewOfServiceTransactionDocument (Root Node) can have exactly one inbound association either to Purchase Order or to PurchasingContract.

Queries

QueryByIDAndName provides a list of all EmployeeTimeConfirmationViewOfServiceTransactionDocument which can be identified by the given selection criteria. The query elements are defined by the data type EmployeeTimeConfirmationViewOfServiceTransactionDocumentIdentificationQueryByIDAndNameElements. These elements can include ID and Name. ID is optional and can be based on GDT: BusinessTransactionDocumentID. Name is optional and can be based on GDT: MEDIUM_Name.

Party

An EmployeeTimeConfirmationViewOfServiceTransactionDocumentParty specifies the company that sold or purchased the service. The EmployeeTimeConfirmationViewOfServiceTransactionDocumentParty contains the following elements that are defined by the data type EmployeeTimeConfirmationViewOfServiceTransactionDocumentPartyElements. In certain implementations, these elements include PartyID, PartyUUID, and RoleCategoryCode. PartyID is an Identifier of the Company that sold or purchased the service, and is optional. Party ID may be based on GDT: PartyID without additional components, i.e., such as schemeAgencyID. PartyUUID is an universal identifier, which an be unique, of the Company that sold or purchased the service, and is optional. PartyUUID may be based on GDT: UUID. RoleCategoryCode is a coded role category of the Party, and is optional. RoleCategoryCode may be based on GDT: PartyRoleCategoryCode. The following codes are permitted for PartyRoleCategoryCode on node Party: BuyerParty, and SellerParty. RoleCode is optional. RoleCode may be based on GDT: PartyRoleCode. The following codes are permitted for PartyRoleCode on node Party: BuyerParty and SellerParty.

PartyTypeCodeType of the business partner, organizational unit, or their specializations referenced by the attribute, and is optional. PartyTypeCode may be based on GDT: BusinessObjectTypeCode. The following codes are permitted for PartyTypeCode on node Party: 154 Company Inbound Association Relationships can exist to the business object Company node Root, such as Company c:cn, an association to a the company this document belongs to. Additionally. Supplier c:cn can exist, an association to the supplier of the Service.

Item

An Item specifies a product purchased or sold by through the Service Transaction Document and additional information including the party that physically provides the service.

The elements located directly at the node Item are defined by the type GDT: EmployeeTimeConfirmationViewOfServiceTransactionDocumentItemElements. In certain implementations, these elements include UUID, ID, Description, Quantity, QuantityTypeCode, and ContractUUID.

UUID is an universal identifier, which can be unique, for the Item. UUID may be based on GDT: UUID.

ID is an identifier for the Item. ID may be based on GDT: BusinessTransactionDocumentItemID.

Description is a designation or title of the Service Transaction Document Item, and is optional. Description may be based on GDT: MEDIUM_description. Quantity of the quantity of the purchased or sold service and is optional. Quantity may be based on GDT: Quantity. QuantityTypeCode is a coded representation of a type of the quantity, and is optional. QuantityTypeCode may be based on GDT: QuantityTypeCode. ContractUUID is an universal identifier, which can be unique, of the contract that specifies the details of the item. The contract is an instance of EmployeeTimeConfirmationViewOfServiceTransactionDocument, and is optional. ContractUUID may be based on GDT: UUID.

Composition relationships to subordinate nodes can exist, such as ItemProduct 194040 1:c, and ItemParty 194044 1:c. In this View BO only one Party, the Service Performer Employee is relevant. Associations for Navigation to the EmployeeTimeConfirmationViewOfServiceTransactionDocument root node, such as BusinessTransactionDocumentReferenceContract c:cn, an association to the contract that specifies the details of the item.

Queries

QueryByElements provides a list of all EmployeeTimeConfirmationViewOfServiceTransactionDocumentItem nodes with the given IDs.

Data type EmployeeTimeConfirmationViewOfServiceTransactionDocumentItemQueryByElementsElements defines the query elements. These elements can include EmployeeTimeConfirmationViewOfServiceTransactionDocumentID, ID, UUID, ItemPartyServicePerformerPartyID, and PartySellerPartyID and EmployeeTimeConfirmationViewOfServiceTransactionDocumentID. EmployeeTimeConfirmationViewOfServiceTransactionDocumentID is optional and can be based on GDT: BusinessTransactionDocumentID. ID is optional and can be based on GDT: BusinessTransactionDocumentItemID. UUID is optional and can be based on GDT: UUID. ItemPartyServicePerformerPartyID is optional and can be based on GDT: PartyID, without additional components, such as schemeAgencyID. PartySellerPartyID is optional and can be based on GDT: PartyID without additional components, such as schemeAgencyID. In some implementations, either the EmployeeTimeConfirmationViewOfServiceTransactionDocumentID and the ID are provided, or the UUID alone.

ItemProduct

An ItemProduct is the purchased or sold product of an Item. The elements located directly at the node are defined by the data type EmployeeTimeConfirmationViewOfServiceTransactionDocumentItemProductElements. In certain implementations, these elements include ProductID, ProductUUID, ProductCategoryUUID, and ProductCategoryID. ProductID is a proprietary identifier for a service product, and is optional. ProductID may be based on GDT: ProductID. ProductUUID is an universal identifier, which can be unique, for a service product, and is optional. ProductUUID may be based on GDT: ProductID. ProductCategoryUUID is an universal identifier, which can be unique, for a product category and is optional. ProductCategoryUUID may be based on GDT: UUID. ProductCategoryID is a proprietary identifier used by the BuyerParty for a product category, and is optional. ProductCategoryID may be based on GDT: ProductCategoryID. The ProductID can only be the ServiceProductID. Either the element ProductID or the element ProductCategoryStandardID is required.

Inbound Association Relationships to the business object Service Product/node Root, such as ServiceProduct c:cn, an association to the service product that will be delivered. From the business object ProductCategoryHierarchy/node ProductCategory, relationships can exist, such as ProductCategoryHierarchyProductCategory c:cn. The node ItemProduct may refer to a ProductCategory that classifies the ordered Material or ServiceProduct.

ItemParty

An ItemParty is the party that physically provides the service. The elements located directly at the node can be defined by the data type EmployeeTimeConfirmationViewOfServiceTransactionDocumentItemPartyElements. In certain implementations, these elements can include PartyID, PartyUUID, RoleCategoryCode, Rolecode, and PartytypeCode. PartyID is an identifier of the ItemParty in that is providing the service and is optional. PartyID may be based on GDT: PartyID without additional components, such as schemeAgencyID.

PartyUUID is a unique identifier of the ItemParty in that is providing the service, and is optional. PartyUUID may be based on GDT: UUID. RoleCategoryCode is a coded role category of the party, and is optional. RoleCategoryCode may be based on GDT: PartyRoleCategoryCode. RoleCode is optional. RoleCode may be based on GDT: PartyRoleCode. PartyTypeCode is the type of the business partner, organizational unit, or their specializations referenced by the attribute, and is optional. PartyTypeCode may be based on GDT: BusinessObjectTypeCode.

Inbound Association Relationships To the business object Employee/node Root can exist, such as ServicePerformerEmployee c:cn, an association to an employee that physically provides the service.

Message Types and their Signatures

This section describes the message types and their signatures that are derived from the operations of the business object EmployeeTimeConfirmationViewOfServiceTransactionDocument. In a signature, the business object is contained as a "leading" business object. The message data type determines the structure of the following message types. This message can be used to inform Time and Labour Management about purchased or sold services that are time confirmation relevant EmployeeTimeConfirmationViewOfServiceTransactionDocumentNotification A message is specifying sold or purchased services that are relevant for employee time confirmation. This message specifies the company that sold or purchased the service, the sold or purchased service and the performer of the service. The structure of this message type is determined by the message data type EmployeeTimeConfirmationViewOfServiceTransactionDocumentMessage. This message type is used in the following operations of business objects: EmployeeTimeConfirmationViewOfService TransactionDocument, and maintain EmployeeTimeConfirmationViewOfServiceTransaction Document EmployeeTimeConfirmationViewOfServiceTransactionDocumentMessage This message data type contains the object EmployeeTimeConfirmationViewOfServiceTransactionDocument which is contained in the business document and the business information that is relevant for sending a business document in a message. It contains the packages: MessageHeader package, and EmployeeTimeConfirmationViewOfServiceTransactionDocument package. This message data type, therefore, provides the structure for the following message types and the operations that are based on them: EmployeeTimeConfirmationViewOfServiceTransactionDocumentNotification MessageHeader Package A grouping of business information that is relevant for sending a business document in a message. It contains the entity MessageHeader. A grouping of business information from the perspective of the sending application: Identification of the business document in a message, and Date/time of the creation of the message, Information about the sender, Information about the recipient, and Reconciliation counter. The MessageHeader is of the type GDT: BusinessDocumentMessageHeader. In certain implementations, these elements include: ID, CreationDateTime, SenderParty, RecipientParty, and ReconciliationMessageIndicator. ID is the identifier of the message. ID may be based on GDT: BusinessDocumentMessageID. CreationDateTime is the date/time of the creation of the message. CreationDateTime may be based on GDT: DateTime. SenderParty is the information about the sender. SenderParty may be based on GDT: BusinessDocumentMessageHeaderParty. RecipientParty is the information about the recipient. RecipientParty may be based on GDT: BusinessDocumentMessageHeaderParty.

ReconciliationMessageIndicator is the reconciliation indicator. ReconciliationMessageIndicator may be based on GDT: Indicator.

EmployeeTimeConfirmationViewOfServiceTransactionDocument Package

The grouping of EmployeeTimeConfirmationViewOfServiceTransactionDocument with its packages contain: Party package, and Item package. The EmployeeTimeConfirmationViewOfServiceTransactionDocument package may include one EmployeeTimeConfirmationViewOfServiceTransactionDocument.

EmployeeTimeConfirmationViewOfServiceTransactionDocument

See business object EmployeeTimeConfirmationViewOfServiceTransactionDocument/node Root. EmployeeTimeConfirmationViewOfServiceTransactionDocument may include information about purchased or sold services. In certain implementations, EmployeeTimeConfirmationViewOfServiceTransactionDocument may include the following elements: ID, Name Designation or title of the Service Transaction Document, and reconciliationPeriodCounterValue—Reconciliation counter.

ID is the readable identifier of the EmployeeTimeConfirmationViewOfServiceTransactionDocument. ID may be based on GDT: BusinessTransactionDocumentID. Name is the designation or title of the Service Transaction Document. Name may be based on GDT: Medium_Name.

ReconciliationPeriodCounterValue is the reconciliation counter. ReconciliationPeriodCounteValue may be based on GDT: ReconciliationPeriodCounterValue.

EmployeeTimeConfirmationViewOfServiceTransaction DocumentParty Package

The Party package groups together all involved parties.

BuyerParty

See business object EmployeeTimeConfirmationViewOfServiceTransactionDocument/node Party. The BuyerParty is of the GDT type: BusinessTransactionDocumentParty. In some implementations, only the Element InternalID of BusinessTransactionDocumentParty might be used.

SellerParty

See business object EmployeeTimeConfirmationViewOfServiceTransactionDocument/node Party. The SellerParty is of the GDT type: BusinessTransactionDocumentParty. In some implementations, only the Element InternalID of BusinessTransactionDocumentParty is used.

EmployeeTimeConfirmationViewOfServiceTransactionDocumentItem Package

The EmployeeTimeConfirmationViewOfServiceTransactionDocumentItem package groups the EmployeeTimeConfirmationViewOfServiceTransactionDocumentItem together along with its packages. It may include the packages: Product-package and ItemParty-package.

EmployeeTimeConfirmationViewOfServiceTransactionDocumentItem

See EmployeeTimeConfirmationViewOfServiceTransactionDocument business object. In certain implementations, EmployeeTimeConfirmationViewOfServiceTransactionDocumentItem may include the following elements: ID, Quantity, QuantityTypeCode, ContractID, and Description.

ID may be based on GDT: BusinessTransactionDocumentID.

Quantity is the quantity of the sold or purchased service. Quantity may be based on GDT: Quantity.

QuantityTypeCode is the coded representation of a type of the quantity. QuantityTypeCode may be based on GDT: QuantityTypeCode. ContractID is the contract. ContractID may be based on GDT: BusinessTransactionDocumentID. Description is the designation or title of the Service Transaction Document Item. Description may be based on GDT: MEDIUM_description.

EmployeeTimeConfirmationViewOfServiceTransactionDocumentItemProductInformation Package The Product Package groups together all information for identification and description of a service product. The ProductInformation package may include the entity: Product Product See EmployeeTimeConfirmationViewOfServiceTransactionDocument business object node ItemProduct. The Product is of type GDT: BusinessTransactionDocumentProduct. Only the Element InternalID of BusinessTransactionDocumentProduct is used.

ProductCategory

The ProductCategory is of type GDT: BusinessTransactionDocumentProductCategory.

In some implementations, only the Element InternalID of BusinessTransactionDocumentProductCategory is used.

EmployeeTimeConfirmationViewOfServiceTransactionDocumentItemParty Package

The Party Package groups together groups together all involved parties. The Party package may include the entity: Party ServicePerformerParty The ServicePerformerParty is of type GDT: BusinessTransactionDocumentParty. Only the Element InternalID of BusinessTransactionDocumentParty is used.

FIG. 195 illustrates one example logical configuration of EmployeeTimeConfirmation-ViewOfServiceTransactionDocumentMessage message 195000. Specifically, this figure depicts the arrangement and hierarchy of various components such as one or more levels of packages, entities, and datatypes, shown here as 195000 through 195028. As described above, packages may be used to represent hierarchy levels. Entities are discrete business elements that are used during a business transaction. Data types are used to type object entities and interfaces with a structure. For example, EmployeeTimeConfirmation-ViewOfServiceTransactionDocument message 195000 includes, among other things, EmployeeTimeConfirmation-ViewOfServiceTransactionDocumentMsg 195004. Accordingly, heterogeneous applications may communicate using this consistent message configured as such.

FIG. 196 illustrates one example logical configuration of EmployeeTimeConfirmation-ViewOfServiceTransactionDocumentMessage message 196000. Specifically, this figure depicts the arrangement and hierarchy of various components such as one or more levels of packages, entities, and datatypes, shown here as 196000 through 196168. As described above, packages may be used to represent hierarchy levels. Entities are discrete business elements that are used during a business transaction. Data types are used to type object entities and interfaces with a structure. For example, EmployeeTimeConfirmation-ViewOfServiceTransactionDocumentMessage message 196000 includes, among other things EmployeeTimeConfirmation-ViewOfServiceTransaction-Document, 196044. Accordingly, heterogeneous applications may communicate using this consistent message configured as such.

Transformation Object EmployeeTimeRecordingView

FIGS. 197-1 through 197-5 illustrate an example EmployeeTimeRecordingView business object model 197000. Specifically, this model depicts interactions among various hierarchical components of the EmployeeTimeRecordingView, as well as external components that interact with the EmployeeTimeRecordingView (shown here as 197002 through 197052).

An EmployeeTimeRecordingView can be a view of several times of one employee for recording purposes. Additional information for recording can be included, for example, working time. The EmployeeTimeRecordingView object can retrieve data from the underlying business objects EmployeeTime and EmployeeTimeCalendar and can modify the underlying object EmployeeTime. The business object EmployeeTimeRecordingView can be part of the process component Time and Labour Management. The EmployeeTimeRecordingView can include an item, which can represent the transformed information of EmployeeTime Items and EmployeeTimeCalendar Period Items. The EmployeeTimeRecordingView can include an overview of time-specific information of a day. The EmployeeTimeRecordingView can include information on the remaining quota applicable for an employee time.

Node Structure of Transformation Object EmployeeTimeRecordingView

The EmployeeTimeRecordingView 197054 can be a Root Node of the EmployeeTimeRecordingView.

The EmployeeTimeRecordingView can be a view of several times of one employee for recording purposes. Additional information for recording can be included, for example, working time. The EmployeeTimeRecordingView object can retrieve data from the underlying business objects EmployeeTime and EmployeeTimeCalendar and can modify the underlying object EmployeeTime. The elements located directly at the node EmployeeTimeRecordingView can be defined by a GDT of type EmployeeTimeRecordingViewElements. These elements can include an EmployeeTimeAgreementItemUUID, and an EmployeeUUID. The EmployeeTimeAgreementItemUUID can be a universal unique identifier of an EmployeeTimeAgreementItem for which an EmployeeTimeRecordingView holds. The EmployeeTimeAgreementItemUUID can be a GDT of type UUID. The EmployeeUUID can be a universally unique identifier of an Employee. The EmployeeUUID can be a GDT of type UUID.

The following composition relationships may exist. Item 197056 has a cardinality relationship of 1:cn. The filter parameters can be defined by a GDT of type EmployeeTimeRecordingViewItemFilterElements. These elements can include a ValidityDatePeriod, and SingleDayIndicator. The ValidityDatePeriod can be a GDT of type DatePeriod, can have a Restriction of CLOSED, and in some implementations, can be optional. The SingleDayIndicator can indicate whether the validity date period of the Item is restricted to a single day or not. The SingleDayIndicator can be a GDT of type Indicator, can have a Qualifier of SingleDay, and in some implementations, can be optional. DayOverview 197064 has a cardinality relationship of 1:n. The filter parameters can be a GDT of type EmployeeTimeRecordingViewDayOverviewFilterElements. These elements can include a DatePeriod, which can correspond to the date interval for which the DayOverview node and its sub-nodes are retrieved. In some implementations, if the user does not specify the value for the DatePeriod, the system will assume the default DatePeriod as the interval between the begin date of the previous month to the end date of the next month, with respect to the system date. The DatePeriod can be a GDT of type DatePeriod, can have a Restriction of CLOSED, and in some implementations, can be optional. RemainingQuota 197070 has a cardinality relationship of 1:n. The filter parameters can be a GDT of type EmployeeTimeRecordingViewRemainingQuotaFilterElements. These elements can include a EmployeeTimeItemTypeCode, a KeyDate, and a QuantityTypeCode. The EmployeeTimeItemTypeCode can be a GDT of type EmployeeTimeItemTypeCode, and in some implementations, can be optional. The KeyDate can be a GDT of type Date, and in some implementations, can be optional. The QuantityTypeCode can be a GDT of type QuantityTypeCode, and in some implementations, can be optional.

The following Inbound Aggregation Relationships from business object EmployeeTimeAgreement/EmployeeTimeAgreementItem may exist. An EmployeeTimeAgreementItem has a cardinality relationship of 1:c. An EmployeeTimeRecordingView can be valid for one EmployeeTimeAgreementItem. In some implementations, an EmployeeTimeAgreementItem can have one EmployeeTimeRecordingView. An EmployeeTimeAgreementItem can include time management provisions, both statutory and those agreed with the employee, that relate either to the employee, a specific employment relationship, or an employment contract.

The following Inbound Association Relationships from business object Employee/Root may exist. An Employee has a cardinality relationship of 1:c. An Employee can be the employee for whom the EmployeeTimeRecordingView can be valid. The Employee can also be used for access control to an EmployeeTimeRecordingView. In some implementations, if there is a link to the business object Employee, it can no longer be changed.

EmployeeTimeRecordingView actions may include a SubmitForApproval. This action can be called when a user submits all the time recording changes performed within a date period, for approval. The SubmitForApproval action can call the action SubmitForApproval of the underlying business object EmployeeTime. In some implementations, the SubmitForApproval action cannot be called if the lifecycle status of the underlying business object EmployeeTime is 'Active'. In some implementations, if the Item of the EmployeeTimeRecordingView is derived from the Business Object EmployeeTimeCalendar, then this action cannot be executed. The action elements can be defined by a GDT of type EmployeeTimeRecordingView SubmitForApprovalActionElements. These elements can include a ValidityDatePeriod. The ValidityDatePeriod can correspond to the date interval within which, the validity date period of Items on which this action is to be executed lies. The ValidityDatePeriod can be a GDT of type DatePeriod, can have a Restriction of CLOSED, and in some implementations, can be optional. The SubmitForApproval action may be called from the UI, especially in employee self service scenarios. In such scenarios, the user does not have sufficient authorization to approve the recorded data, and therefore requests an approval.

Queries of an EmployeeTimeRecordingView can include a QueryByElements, which can be a query that can provide a list of all EmployeeTimeRecordingView(s) which satisfy the selection criteria. The query elements may be described by a GDT of type EmployeeTimeRecordingViewElementsQueryElements. In some implementations, the QueryByElements can include the following elements: EmployeeTimeAgreementItemUUID, ItemEmployeeTimePlanningCategoryCode, ItemEmployeeTimeItemCategoryCode, and ItemEmployeeTimeItemTypeCode. The EmployeeTimeAgreementItemUUID can be a GDT of type UUID, and in some implementations, can be optional. The ItemEmployeeTimePlanningCategoryCode can be a GDT of type EmployeeTimePlanningCategoryCode, and in some implementations, can be optional. The ItemEmployeeTimeItemCategoryCode can be a GDT of type EmployeeTimeItemCategoryCode, and in some implementations, can be optional. The ItemEmployeeTimeItemTypeCode can be a GDT of type EmployeeTimeItemTypeCode, and in some implementations, can be optional.

An Item of an EmployeeTimeRecordingView can provide a unified view of information from the recorded data of an EmployeeTime Item and/or derived data from EmployeeTimeCalendar Period Items. The elements located directly at the node Item can defined by a GDT of type EmployeeTimeRecordingViewItemElements. These elements can include an EmployeeTimeItemUUID, an EmployeeTimePlanningCategoryCode, an EmployeeTimeItemCategoryCode, an EmployeeTimeItemTypeCode, an EmployeeTimeItemPaymentTypeCode, a BaseEventEmployeeTimeItemGroupID, an EmployeeTimeItemReasonCode, a ValidityDatePeriod, a ValidityTimePeriod, a Duration, a Quantity, a QuantityTypeCode, a PartialDayIndicator, an ApproverEmployeeUUID, a DifferentPaymentIndicator, and a Status. The EmployeeTimeItemUUID can be a universal unique identifier of an EmployeeTime Item. The EmployeeTimeItemUUID can be a GDT of type UUID. The EmployeeTimePlanningCategoryCode can be coded representation of an employee time planning category according to whether the employee time actually took place or is planned for the short or long term. The EmployeeTimePlanningCategoryCode can be a GDT of type EmployeeTimePlanningCategoryCode. The EmployeeTimeItemCategoryCode can be a classification of employee time items into categories that carry the key information about the type of the employee time according to company, collective-agreement, or statutory criteria. The EmployeeTimeItemCategoryCode can be a GDT of type EmployeeTimeItemCategoryCode. The EmployeeTimeItemTypeCode can be a coded representation of the type of an EmployeeTime Item. The EmployeeTimeItemTypeCode can be a GDT of type EmployeeTimeItemTypeCode. In some implementations, the EmployeeTimeItemTypeCode can classify an employee time item according to its concrete company, collective-agreement, or statutory significance, such as vacation, overtime, or illness with or without a medical certificate. The EmployeeTimeItemPaymentTypeCode can be a coded representation of the payment type of an employee time item classified according to how the employee time item is paid, e.g. overtime or shift payment, or payment for work during vacation. The EmployeeTimeItemPaymentTypeCode can be a GDT of type EmployeeTimeItemPaymentTypeCode, and in some implementations, can be optional. The BaseEventEmployeeTimeItemGroupID can identify Employee Time Items that belong to the same employee's professional or private event. The EmployeeTimeItemPaymentTypeCode can be a GDT of type BaseEventEmployeeTimeItemGroupID, and in some implementations, can be optional. In some implementations, absences based on the same illness event can be assigned to the same ID. The EmployeeTimeItemReasonCode can be the coded representation of the reason that leads to the working time or activity which is documented by this item. The EmployeeTimeItemReasonCode can be a GDT of type EmployeeTimeItemReasonCode, and in some implementations, can be optional. The ValidityDatePeriod can be the recorded or calculated date interval during which the item applies. The ValidityDatePeriod can be a GDT of type DatePeriod, can have a Restriction of CLOSED, and in some implementations, can be optional. The ValidityTimePeriod can be the recorded or calculated time interval during which the item applies. The ValidityTimePeriod can be a GDT of type TimePeriod, can have a Restriction of UPPER_OPEN, and in some implementations, can be optional. The Duration can be the recorded or calculated duration for the item. The Duration can be a GDT of type Duration, and in some implementations, can be optional. The Quantity can be a quantity belonging to the item that specifies additional, quantitative (non time-specific) information about the documented working time. The Quantity can be a CGDT of type Quantity, and in some implementations, can be optional. In some implementations, in addition to recording consulting expenses for 4 hours on 1 Sep. 2005, you may want to record 120 km travel distance, or in addition to recording overtime from 18:00 to 22:00 on 2 Sep. 2005, you may want to record that 100 items were processed during this time. The semantics of this specification can be derived from the value of the service product, which defines the business context. The QuantityTypeCode can be the coded representation of the type of quantity. The QuantityTypeCode can be a GDT of type QuantityTypeCode, and in some implementations, can be optional. The PartialDayIndicator can indicate whether the Item is valid for less than a single working day. The PartialDayIndicator can be a GDT of type Indicator, and can have a Qualifier of PartialDay. The ApproverEmployeeUUID can be the UUID of an employee who may have to approve the employee time. The ApproverEmployeeUUID can be a GDT of type UUID, and in some implementations, can be optional. The DifferentPaymentIndicator can specify if the default payment terms assigned to the EmployeeTimeItemTypeCode and EmployeeTimeItemPaymentTypeCode can be overwritten by different payment terms. The DifferentPaymentIndicator can be a GDT of type Indicator, and can have a Qualifier of DifferentPayment. In some implementations, if the indicator is set, the payment of the item can be based on the terms specified in the node ItemPayment. Otherwise, the default payment derived from the EmployeeTimeItemTypeCode and EmployeeTimeItemPaymentTypeCode applies.

The Status can include information about the life cycle of an EmployeeTimeRecordingViewItem. The Status can be an IDT of type EmployeeTimeRecordingViewItemStatus. The internal data type EmployeeTimeRecordingViewItemStatus can include a EmployeeTimeLifeCycleStatusCode, and a ApprovalStatusCode. The EmployeeTimeLifeCycleStatusCode can be a GDT of type EmployeeTimeLifeCycleStatusCode. The ApprovalStatusCode can be a GDT of type ApprovalStatusCode. In some implementations, the status can reflect the status of the originating EmployeeTime.

The following composition relationships to subordinate nodes may exist. ItemValuationTerms 197058 has a cardinality relationship of 1:c. ItemServiceProvision 197060 has a cardinality relationship of 1:c. ItemExternalServiceAcknowledgement 197072 has a cardinality relationship of 1:c. ItemProjectTaskConfirmation 197074 has a cardinality relationship of 1:c. ItemPayment 197076 has a cardinality relationship of 1:cn. TextCollection 197078 (DO) has a cardinality relationship of 1:c. AttachmentFolder 197080 (DO) has a cardinality relationship of 1:c.

The following Inbound Aggregation Relationships from EmployeeTime/EmployeeTimeItem may exist. EmployeeTimeItem has a cardinality relationship of 1:c.

The following Inbound Association Relationships from business object Employee/Root may exist. ApproverEmployee has a cardinality relationship of c:cn. The ApproverEmployee can be the Employee who is the approver responsible for approving the employee's time-recording changes.

The following Inbound Association Relationships from EmployeeTimeRecordingViewItem may exist.

SourceItem has a cardinality relationship of 1:c. This can be a self-reference to the EmployeeTimeRecordingView Item which corresponds to the originating EmployeeTimeItem. In some implementations, each Item in EmployeeTimeRecordingView can correspond to exactly one EmployeeTimeItem. In some implementations, the Items retrieved from EmployeeTimeCalendarPeriodItems can be read-only. This association navigates to the EmployeeTimeRecordingViewItem which can be retrieved from the originating EmployeeTimeItem which is modifiable. Hence modification can be possible for those EmployeeTimeRecordingViewItems retrieved from EmployeeTimeCalendarPeriodItems.

EmployeeTimeRecordingView actions may include SubmitForApproval, Approve, and Activate. SubmitForApproval can be called when a user submits the time recording changes, for approval. This can call the action SubmitForApproval of the underlying business object EmployeeTime. In some implementations, this action cannot be called if the lifecycle status of the underlying business object EmployeeTime is 'Active'. Approve can be called when the time recording changes are approved. This can call the action Approve of the underlying business object EmployeeTime. Activate can be called to activate the time recording changes. This can call the action Activate of the underlying business object EmployeeTime.

ItemValuationTerms can be the evaluation specifications belonging to the Item. The evaluation specifications can be relevant only for specific parts of time evaluation. Examples of valuation specifications are rules governing the assignment of a calendar day to a time document that has been entered as a time interval. The elements located directly at the ItemValuationTerms node can be defined by a GDT of type EmployeeTimeRecordingViewItemValuationTermsElements. These elements can include EmployeeTimeValuationTerms. The EmployeeTimeValuationTerms can be a structure defining the specifications for controlling the evaluation of the EmployeeTime item to which the Item relates. The EmployeeTimeValuationTerms can be a GDT of type EmployeeTimeValuationTerms.

An ItemServiceProvision can be the information for the process component Accounting Processing about the confirmation of a service provided. The elements located directly at the node ItemServiceProvision can be defined by a GDT of type EmployeeTimeRecordingViewItemServiceProvisionElements. These elements can include EmployeeTimeServiceProvision. The EmployeeTimeServiceProvision can be a structure of information for the process component AccountingProcessing about the confirmation of a service provided or personnel resource consumption. The EmployeeTimeServiceProvision can be a GDT of type EmployeeTimeServiceProvision.

The following Composition Relationships may exist. DO: ItemServiceProvisionAccountingCodingBlockDistribution 197062 has a cardinality relationship of 1:c.

The following Inbound Association Relationships from LabourResource/Root may exist. LabourResource has a cardinality relationship of c:cn. LabourResource can be an association to a Resource whose labor was consumed.

The following Inbound Association Relationships from ServiceProduct/Root may exist. ServiceProduct has a cardinality relationship of c:cn. ServiceProduct can be an association to a Service Product that describes the service provided. There also exists a DO: ItemServiceProvisionAccountingCodingBlockDistribution. An AccountingCodingBlockDistribution can be a document of business transactions related to posting of an amount or a quantity. The following attributes can be communicated requirements.

An ItemServiceProvisionAccountingCodingBlockDistribution can refer to the cost center for which a service was provided or a resource consumed. A CostCentre can refer to the cost center for which a task was performed. The CostCentre can be a GDT of type open, and in some implementations, can be optional.

The following Inbound Association Relationships from CostCentre/Root may exist. CostCentre has a cardinality relationship of c:cn. The CostCentre can be an association to a cost center for which a service was provided or a resource consumed.

An ItemExternalServiceAcknowledgement can be information for the process component Goods and Service Acknowledgement about the confirmation of a service provided by an external employee. The elements located directly at the node ItemExternalServiceAcknowledgement can be defined by a GDT of type EmployeeTimeRecordingViewItemExternalServiceAcknowledgementElements. These elements can include EmployeeTimeExternalServiceAcknowledgement. The EmployeeTimeExternalServiceAcknowledgement can be a structure of information for the process component Goods and Service Acknowledgement about the confirmation of a service provided by an external employee. The EmployeeTimeExternalServiceAcknowledgement can be a GDT of type EmployeeTimeExternalServiceAcknowledgement.

The following Inbound Association Relationships from ServiceProduct/Root may exist. ServiceProduct has a cardinality relationship of c:cn. The ServiceProduct can be an association to a Service Product that describes the service provided.

The following Inbound Association Relationships from PurchaseOrder/Item (Cross DU) may exist. PurchaseOrderItem has a cardinality relationship of c:cn. The PurchaseOrderItem can be an association to a purchase order item used to order the external employee or service.

An ItemProjectTaskConfirmation can be information for the process component Project Processing about a confirmation to a project task. It can describe the time actually taken to process a Project Task, and the time remaining. The elements located directly at the node ItemProjectTaskConfirmation can be defined by a GDT of type EmployeeTimeRecordingViewItemItemProjectTaskConfirmationElements. These elements can include EmployeeTimeConfirmationViewOfProjectTaskKey, and EmployeeTimeProjectTaskConfirmation. The EmployeeTimeConfirmationViewOfProjectTaskKey can be a unique structured key of the Task of an EmployeeTimeConfirmationViewOfProject. The EmployeeTimeConfirmationViewOfProjectTaskKey can be an IDT of type EmployeeTimeConfirmationViewOfProjectTaskKey. In some implementations, the Task, which is represented by an ID in the Key, is unique only within a Project, a combination of ProjectID and ID is necessary to uniquely specify a Task for time confirmation purposes. The EmployeeTimeProjectTaskConfirmation can be a structure of information for the process component Project Processing about the confirmation to a project task. The EmployeeTimeProjectTaskConfirmation can be a GDT of type EmployeeTimeProjectTaskConfirmation. In some implementations, a separate GDT can be defined here to enable reuse.

The following Inbound Association Relationships from EmployeeTimeConfirmationViewOfProject/Task may exist. ProjectTask has a cardinality relationship of c:cn. The ProjectTask can be an association to a ProjectTask that refers to the project task in the confirmation.

The following Inbound Association Relationships from ServiceProduct/Root may exist. ServiceProduct has a cardinality relationship of c:cn. The ServiceProduct can be an association to a ServiceProduct that describes the service provided.

An ItemPayment can be information for the process component Payroll about the payment of an Item. For example, a payment can be the hourly rate for overtime worked. The elements located directly at the ItemPayment node can be defined by a GDT of type EmployeeTimeRecordingViewItemPaymentElements. These elements can include EmployeeTimePayment. The EmployeeTimePayment can be a structure of information for the Payroll process component about the payment of an EmployeeTime Item. The EmployeeTimePayment can be a GDT of type EmployeeTimeDifferentPayment.

A TextCollection (DO) can be a language-dependent text with additional information of an employee's time recording. For example, while recording a leave request an employee can give the details about the leave here. An Attachment Folder (DO) can include the documents assigned to the Item. For example, while recording an illness an employee can attach relevant documents like a medical certificate.

A DayOverview can summarize the time-specific information for a day. The elements located directly at the node DayOverview can be defined by a GDT of type EmployeeTimeRecordingViewDayOverviewElements. These elements can include Date The Date can be the date for which the DayOverview is valid, and can be a GDT of type Date.

The following Composition Relationships may exist. DayOverviewPlanned 197068 has a cardinality relationship of 1:c. The filter parameters can be defined by a GDT of type EmployeeTimeRecordingViewDayOverviewPlannedFilterElements. These elements can include ItemEmployeeTimePlanningCategoryCode. The ItemEmployeeTimePlanningCategoryCode can specify whether the scheduled information for the day is planned for the short term or long term. The ItemEmployeeTimePlanningCategoryCode can be a GDT of type EmployeeTimePlanningCategoryCode, and in some implementations, can be optional. DayOverviewConfirmed 197066 has a cardinality relationship of 1:c.

A DayOverviewPlanned can summarize the scheduled information for a day according to the work schedule. The elements located directly at the node DayOverviewPlanned can be defined by a GDT of type EmployeeTimeRecordingViewDayOverviewPlannedElements. These elements can include WorkingTimePeriod, WorkingTimeQuantity, DayOffIndicator, and PublicHolidayIndicator. The WorkingTimePeriod can be the planned time for the day according to the work schedule. The WorkingTimePeriod can be a GDT of type TimePeriod, can have a Qualifier of Working, and can have a Restriction of UPPER_OPEN. The WorkingTimeQuantity can be the planned number of working hours for the day according to the work schedule. The WorkingTimeQuantity can be a GDT of type Quantity, can have a Qualifier of WorkingTime, and can have a Restriction of Hours. The DayOffIndicator can indicate whether the particular day is an 'Off Day' for the employee. The DayOffIndicator can be a GDT of type Indicator, and can have a Qualifier of DayOff. In some implementations, an 'Off Day' can be a day when the employee is not scheduled to work. The PublicHolidayIndicator can indicate whether the particular day is a public holiday for the employee. The PublicHolidayIndicator can be a GDT of type Indicator, and can have a Qualifier of PublicHoliday.

A DayOverviewConfirmed can summarize the confirmed time information for a day. The elements located directly at the node ConfirmedTime can be defined by a GDT of type EmployeeTimeRecordingViewDayOverviewConfirmedElements. These elements can include WorkingTimeQuantity, and EmployeeTimeRecordingOverviewStatusCode. The WorkingTimeQuantity can be the number of working hours confirmed for the day which has been recorded by an employee in time recording. The WorkingTimeQuantity can be a GDT of type Quantity, can have a Qualifier of WorkingTime, and a Restriction of Hours. The EmployeeTimeRecordingOverviewStatusCode can be the coded representation of the overview of the recording of employee times for the day. The EmployeeTimeRecordingOverviewStatusCode can be a GDT of type EmployeeTimeRecordingOverviewStatusCode. In some implementations, EmployeeTimeRecordingOverviewStatusCode can have the values 'No Data Recorded', 'Released', 'Partially not Released', 'Partially Rejected'.

A RemainingQuota can be the remaining quota for an employee time based on an EmployeeTimeItemTypeCode and key date. The elements located directly at the node RemainingQuota can be defined by a GDT of type EmployeeTimeRecordingViewRemainingQuotaElements. These elements can include KeyDate, EmployeeTimeItemTypeCode, Quantity, and QuantityTypeCode. The KeyDate can be the effective date on which remaining quota is being calculated. The KeyDate can be a GDT of type Date. The EmployeeTimeItemTypeCode can be a coded representation of the type of the EmployeeTimeItem for which the Remaining- Quota is being derived. The EmployeeTimeItemTypeCode can be a GDT of type EmployeeTimeItemTypeCode. The Quantity can be the unutilized quota applicable for the EmployeeTimeItemTypeCode. The Quantity can be a GDT of type Quantity. The QuantityTypeCode can be the coded representation of the type of quantity. The Quantity can be a GDT of type QuantityTypeCode, and in some implementations, can be optional.

Business Object EmployeeTimeValuation

FIG. 198 illustrates an example EmployeeTimeValuation-business object model 198002. Specifically, this model depicts interactions among various hierarchical components of the EmployeeTimeValuation, as well as external components that interact with the EmployeeTimeValuation (shown here as 198000 and through 198004 through 198006).

EmployeeTimeValuation is an evaluation of time management documents for an internal or external employee. The documents are evaluated according to business factors such as availability, time accounts, or transfer of data to payroll or other target applications. Documents in time management can be employee times, time account posting specifications, time accounts, or period-end data, for example. Time evaluation determines evaluation results from the recorded time data for various business purposes. The business object EmployeeTimeValuation enables time evaluation to be triggered after a data record has been created or changed. In addition, it documents which periods can be treated as completed from a time management perspective and therefore taken into account in time evaluation. The business object EmployeeTimeValuation can be part of the process component Time and Labor Management. An EmployeeTimeValuation can contain information about the periods that are completed from a time management perspective.

EmployeeTimeValuation 198008 (Root Node of Business Object EmployeeTimeValuation) is an evaluation of time management documents for an internal or external employee. The documents are evaluated according to business factors such as availability, time accounts, or transfer of data to payroll or other target applications. The elements found directly at the node EmployeeTimeValuation are defined by the data type EmployeeTimeValuationElements. These elements can include EmployeeTimeAgreementItemUUID, which is a universally unique identifier for the EmployeeTimeAgreementItem to which time evaluation refers, and can be of type GDT: UUID.

Composition relationships to subordinate nodes can be available, such as PeriodClosure 198010 1:cn.

Inbound aggregation relationships can exist, such as from business object EmployeeTimeAgreement or node EmployeeTimeAgreementItem, such as an EmployeeTimeAgreementItem 1:c relationship, where an EmployeeTimeAgreementItem represents the work agreement and therefore is related to the employee for whom time evaluation is run. Associations for Navigation can exist to business object EmployeeTimeValuation or node PeriodClosure, such as a LatestPeriodClosure 1:c relationship, where a display of the chronologically last period for which a period closure exists. Because this implies the closure of all earlier periods, the association can be used to determine which periods as a whole can be viewed as closed, without all other instances of the subnode PeriodClosure having to be read.

Enterprise Service Infrastructure actions can include a Valuate action. The Valuate action evaluates employee time for the recorded time management documents valid as of a given date for an EmployeeTimeAgreement. The Valuate action creates or updates the business object EmployeeTimeCalendar for an EmployeeTimeAgreement, the evaluation results stored in the nodes ItemValuatedDuration and ItemValuatedPeriodList (including subnodes) in the business object EmployeeTime, and the time account postings stored in the node LineItem in the business object EmployeeTimeAccount. The Valuate action elements are defined by the data type EmployeeTimeValuationValuateActionElements. These elements can include ValuationStartDate, which is the earliest validity date of time management documents for which employee time evaluation is triggered, and can be of type GDT: Date. The Valuate action can be used, on the one hand, to trigger employee time evaluation after a time management document has been activated In this case the ValuationStartDate is determined from the date specifications recorded in the document and specified in the action. The Valuate action can also be used directly from the UI if an employee time evaluation is required.

Queries can include a QueryByAgreementItem query. This query lists all EmployeeTimeValuations for the EmployeeTimeAgreementItem specified in the selection. The query elements are defined by the GDT EmployeeTimeValuationAgreementQueryElements, and can include EmployeeTimeAgreementItemUUID, which is optional and may be based on GDT: UUID.

A PeriodClosure of an EmployeeTimeValuation is a document about the closure of a time period for an employee from a time management perspective. It documents that all of the recorded data belonging to this period should be available in its entirety. Periods for which there is such a document can be taken into account in their entirety in time evaluation. Particular parts of time evaluation, such as the deduction of leave days in leave accounts, can be executed without the existence of the PeriodClosure. However, the majority of the evaluation tasks, such as the comparison of planned and confirmed working times, can be performed correctly only if the day to which they are assigned can be regarded as completed and therefore it can be assumed that all recorded data up to this day is available. The elements located directly at the node PeriodClosure can be defined by the data type EmployeeTimeValuationPeriodClosureElements. These elements can include UUID and PeriodClosureDate. UUID is a universally unique ID for a PeriodClosure and can be of type GDT: UUID.

PeriodClosureDate is the date of the last day of a time period that can be regarded as completed from a time management perspective. The days before this date are also considered to be completed, regardless of whether there is a period closure for them or not. PeriodClosureDate can be based on GDT: Date and Qualifier: PeriodClosure. In some implementations, once a PeriodClosure node has been created, it can no longer be changed.

Business Object FR_EmployeeSocialInsuranceArrangement

FIG. 199 illustrates an example FR_EmployeeSocialInsuranceArrangement business object model 199000. Specifically, this model depicts interactions among various hierarchical components of the FR_EmployeeSocialInsuranceArrangement, as well as external components that interact with the FR_EmployeeSocialInsuranceArrangement (shown here as 199002 through 199004 and 199014 through 199018).

A FR_EmployeeSocialInsuranceArrangement can be referred to as the arrangement for the employee by all responsible French bodies that may be legally responsible for administering the employee's social insurance contributions. This arrangement may concern the information required for calculation of French social insurance contributions and reporting according to the French legal requirements. The definition can be for internal employees for each work agreement. The definition may be time-dependent per work agreement. It may be French specific and can belong to one Employee entity. In France, a body can correspond to specific insurance contributions grouping based on common legal rules: State Health Insurance (URSSAF), State Unemployment Insurance (ASSEDIC), Public and Private pension insurance providers and Other public or private insurance providers. The business object FR_EmployeeSocialInsuranceArrangement can be part of the process component FR Employer Regulatory Compliance. A FR_EmployeeSocialInsuranceArrangement can contain information required for the different types of social insurance contributions to various public and private bodies for a Work Agreement. FR_EmployeeSocialInsuranceArrangement can be represented by the Root node. The Business Object FR_EmployeeSocialInsuranceArrangement may be involved in the Process Integration Model: FR Employer Regulatory Compliance_Payroll Processing. FREmployerRegulatoryComplianceFREmployerRegulatoryComplianceInPayrollInputMaintenance Out The Service Interface FR Employer Regulatory Compliance in Payroll Input Maintenance Out can be part of the FR Employer Regulatory Compliance_Payroll Processing Process Integration Model. The service interface FR Employer Regulatory Compliance in Payroll Input Maintenance Out can group operations which maintain FR employer regulatory compliance within Payroll Processing. FREmployerRegulatoryComplianceFREmployerRegulatoryComplianceInPayrollInputMaintenance Out.

NotifyOfFR_EmployeeSocialInsuranceArrangement. The operation Notify of FR_EmployeeSocialInsuranceArrangement can provide information on an employee's French social insurance arrangement to payroll processing. The FR_EmployeeSocialInsuranceArrangement PayrollNotification message may be based on Business Object FR_EmployeeSocialInsuranceArrangement. After the relevant French employee social insurance arrangement information is updated in FR Employer Regulatory Compliance, the message type FR_EmployeeSocialInsuranceArrangementPayrollNotification is sent to Payroll Processing to update the corresponding information in the object FR_EmployeePayrollInput.

Node Structure of Business Object FR_EmployeeSocialInsuranceArrangement

A FR_EmployeeSocialInsuranceArrangement 199006 can be the arrangement for the employee by all responsible French bodies that may be legally responsible for administering the employee's social insurance contributions. This arrangement can concern the information required for calculation of French social insurance contributions and reporting according to the French legal requirements. The elements located directly at the node FR_EmployeeSocialInsuranceArrangement may be defined by the data type FR_EmployeeSocialInsuranceArrangementElements. In certain implementations, these elements include UUID and EmployeeUUID. UUID is a unique ID that can identify one French employee's social insurance arrangement, and may be an Alternative Key. The UUID may be based on GDT: UUID. EmployeeUUID is the UUID of the employee for whom the social insurance arrangement can apply. The EmployeeUUID may be based on GDT: UUID.

The WorkAgreementItem 199008 1:cn composition relationship with subordinate nodes may exist. Inbound Aggregation Relationships may relate from business object Employee/Root, Employee 1:c, as the employee for whom the social insurance arrangement may apply. In some implementations, you cannot change the assignment to the employee. Queries may include QueryByEmployeeID, which can provide a list of all FR_EmployeeSocialInsuranceArrangement for the specified employee. The query elements are defined by the data type FR_EmployeeSocialInsuranceArrangement EmployeeIDQueryElements. In certain implementations, these elements include EmployeeUUID and EmployeeID. EmployeeUUID is optional and may be based on GDT: UUID. EmployeeID is optional and may be based on GDT: EmployeeID.

WorkAgreementItem

A WorkAgreementItem is the set of information that may be required for French Social Insurance calculation and reporting purposes for one Work Agreement. The elements located directly at the node WorkAgreementItem may be defined by the data type FR_EmployeeSocialInsuranceArrangementWorkAgreementItem Elements. In certain implementations, these elements include WorkAgreementUUID, which is an universal identifier, which can be unique, of a WorkAgreement for which the FR_EmployeeSocialInsuranceArrangement is valid, and may be based on GDT UUID. The composition relationships with subordinate nodes that may exist include WorkAgreementItemContributionModel 199010 1:cn and WorkAgreementItemComplementaryContribution 199012 1:cn. Inbound Aggregation Relationships may relate from business object Work Agreement/node WorkAgreement, Work Agreement 1:c, as the work agreement for which the social insurance details may apply. In some implementations, for a given BusinessPartnerRoleCode, the WorkAgreementItemContributionModel may not overlap, that is, one node may be valid for any given point in time for a given BusinessPartnerRoleCode. In some implementations, for a given EmployeeSocialInsuranceContributionTypeCode, the WorkAgreementItemComplementaryContribution may not overlap, that is, one node may be valid for any given point in time for a given EmployeeSocialInsuranceContributionTypeCode. In some implementations, at least one of the two subordinate nodes may exist (WorkAgreementItemContributionModel or WorkAgreementItemComplementaryContribution) for any given point in time.

Queries may include QueryByEmployeeAndWorkAgreement, which can provide a list of all FR_EmployeeSocialInsuranceArrangement for the specified workagreement of an employee. The query elements may be defined by the data type FR_EmployeeSocialInsuranceArrangementWorkAgreementItemEmployeeAndWorkAgreementQueryElements. In certain implementations, these elements include FR_EmployeeSocialInsuranceArrangementEmployeeUUID, which is optional and may be based on GDT: UUID and WorkAgreementUUID, which is optional and may be based on GDT: UUID.

WorkAgreementItemContributionModel

A WorkAgreementItemContributionModel is for given business partner role the assignment for a validity period of a model which can represent a set of contributions for a social insurance body (Business Partner). The elements located directly at the node WorkAgreementItemContributionModel may be defined by the data type FR EmployeeSocialInsuranceArrangementWorkAgreementItemWorkAgreementItemContribution ModelElements. In certain implementations, these elements include UUID, ValidityPeriod, SocialInsuranceTypeCode and EmployeeSocialInsuranceContributionModelCode. UUID is ID, which can be unique, that identifies one WorkAgreementItemContributionModel node. UUID may be based on GDT: UUID.

ValidityPeriod is the validity period of the work agreement item and may be based on GDT: DatePeriod with restriction: CLOSED and Qualifier: Validity. SocialInsuranceTypeCode is a code representing the type of Social Insurance assigned to the contribution model and may be based on GDT: SocialInsuranceTypeCode. EmployeeSocialInsuranceContributionModelCode is a coded representation of a social insurance contribution model for an employee and may be based on GDT: EmployeeSocialInsuranceContributionModelCode. Inbound Aggregation Relationships may relate from business object BusinessPartner, BusinessPartner 1:c.

WorkAgreementItemComplementaryContribution

A WorkAgreementItemComplementaryContribution is the complementary contribution to a Social Insurance body (Business Partner) of an employee for one work agreement for a validity period. The elements located directly at the node WorkAgreementItemComplementaryContribution may be defined by the data type FR_EmployeeSocialInsuranceArrangementWorkAgreementItem-ComplementaryContributionElements. In certain implementations, these elements include UUID, ValidityPeriod, BusinessPartnerUUID and EmployeeSocialInsuranceContributionTypeCode. A UUID is an ID, which can be unique, that identifies one WorkAgreementItemComplementaryContribution node and may be based on GDT: UUID. The ValidityPeriod is the validity period of the work agreement item which may be based on GDT DatePeriod with restriction CLOSED and Qualifier Validity. The BusinessPartnerUUID is an ID, which can be unique, that can identify one Social Insurance Body. The BusinessPartnerUUID may be based on GDT UUID.

An EmployeeSocialInsuranceContributionTypeCode is a coded representation of a social insurance contribution type of an employee and may be based on GDT EmployeeSocialInsuranceContributionTypeCode. Inbound Aggregation Relationships may relate from business object BusinessPartner, BusinessPartner 1:c.

FIG. 200 illustrates one example logical configuration of FR_EmployeeSocialInsuranceArrangementMessage message 200020. Specifically, this figure depicts the arrangement and hierarchy of various components such as one or more levels of packages, entities, and datatypes, shown here as 200000 through 200042. As described above, packages may be used to represent hierarchy levels. Entities are discrete business elements that are used during a business transaction. Data types are used to type object entities and interfaces with a structure. For example, FR EmployeeSocialInsuranceArrangementMessage message 200020 includes, among other things, FR_EmployeeSocialInsuranceArrangement 200024. Accordingly, heterogeneous applications may communicate using this consistent message configured as such.

FIGS. 201-1 through 201-5 illustrate one example logical configuration of FR_EmployeeSocialInsuranceArrangementMessage message 201000. Specifically, this figure depicts the arrangement and hierarchy of various components such as one or more levels of packages, entities, and datatypes, shown here as 201000 through 201138. As described above, packages may be used to represent hierarchy levels. Entities are discrete business elements that are used during a business transaction. Data types are used to type object entities and interfaces with a structure. For example, FR_EmployeeSocialInsuranceArrangementMessage message 201000 includes, among other things, FR_EmployeeSocialInsuranceArrangement 201028. Accordingly, heterogeneous applications may communicate using this consistent message configured as such.

Message Types and their Signatures

The Message Types and Their Signatures section can describe the message types and their signatures that may be derived from the operations of the business object FR_EmployeeSocialInsuranceArrangement. In a signature, the business object can be contained as a "leading" business object. The message data type may determine the structure of the following message types. order for a payroll system to calculate French employee social insurance contributions and carry out related legal reporting for an employee, certain employee specific data can be stored in the Business Object FR_EmployeeSocialInsuranceArrangement. This data may be transmitted initially and any changes to it in a timely manner to the payroll provider so these tasks can be performed. The Business Object FR_EmployeeSocialInsuranceArrangement can be part of the Process Component FR Employer Regulatory Compliance and the Logical Deployable Unit Human Capital Management.

Message Type FR_EmployeeSocialInsuranceArrangementPayrollNotification

An FR_EmployeeSocialInsuranceArrangementPayrollNotification is a notification to the payroll of an employee's social insurance information. Employee social insurance information may be required to correctly calculate social insurance contributions and transfer these to the social insurance organizations. In addition the employee's social insurance information may be used for social insurance contribution reporting purposes. The structure of this message type can be determined by the message data type FR_EmployeeSocialInsuranceArrangementMessage. Details of constraints on the structure and integrity conditions of FR EmployeeSocialInsuranceArrangementPayrollNotification that may be imposed by message data type FR_EmployeeSocialInsuranceArrangementMessage, can be found in another section.

This message type can be used in the following operations of business objects: FR_EmployeeSocialInsuranceArrangement, for NotifyOfFR_EmployeeSocialInsuranceArrangement and FR_EmployeePayrollInput, for MaintainFR_EmployeePayrollInputBasedOnSocialInsuranceArrangement FR_EmployeeSocialInsuranceArrangementMessage This message data type can contain the object FR_EmployeeSocialInsuranceArrangement which is contained in the business document, and the business information that is relevant for sending a business document in a message. It can contain the MessageHeader package and FR_EmployeeSocialInsuranceArrangement package. This message data type, therefore, can provide the structure for the message type and the operation that may be based on them, such as FR_EmployeeSocialInsuranceArrangementPayrollNotification. The MessageHeader Package is a grouping of business information that is relevant for sending a business document in a message and can contain the entity MessageHeader. The MessageHeader is a grouping of business information from the perspective of the sending application, such as information to identify the business document in a message, information about the sender and optionally information about the recipient. The MessageHeader can contain SenderParty and RecipientParty. MessageHeader is of the type GDT BusinessDocumentMessageHeader, and in some implementations, all elements of the GDT may be used. SenderParty is the partner responsible for sending a business document at business application level. The SenderParty can be of the type GDT BusinessDocumentMessageHeaderParty. RecipientParty is the partner responsible for receiving a business document at business application level. The RecipientParty can be of the type GDT BusinessDocumentMessageHeaderParty.

FR_EmployeeSocialInsuranceArrangement Package

FR_EmployeeSocialInsuranceArrangement Package is the grouping of FR_EmployeeSocialInsuranceArrangement with its package WorkAgreementItemPackage 1:n.

FR_EmployeeSocialInsuranceArrangement can contain the elements UUID and EmployeeUUID.

UUID may be based on GDT UUID. EmployeeUUID may be based on GDT UUID. Integrity conditions may have already been checked by the leading business object.

WorkAgreementItemPackage

WorkAgreementItemPackage is the grouping of WorkAgreementItemPackage with its packages: WorkAgreementItemContributionModel, Card. 0..n and WorkAgreementItemComplementaryContribution, Card. 0..n. WorkAgreementItemPackage can contain the elements @workAgreementItemContributionModelListCompleteTransmissionIndicator, @workAgreementItemComplementaryContributionListCompleteTransmissionIndicator and WorkAgreementUUID. @workAgreementItemContributionModelListCompleteTransmissionIndicator is optional and may be based on GDT Indicator and Qualifier CompleteTransmission. @workAgreementItemComplementaryContributionListCompleteTransmissionIndicator is optional and may be based on GDT Indicator and Qualifier CompleteTransmission. WorkAgreementUUID may be based on GDT UUID. In some implementations, integrity conditions may have already been checked by the leading business object WorkAgreementItemContributionModel WorkAgreementItemContributionModel contains the elements @actionCode, UUID, ValidityPeriod, SocialInsuranceTypeCode and EmployeeSocialInsuranceContributionModelCode. @actionCode may be based on GDT ActionCode. UUID may be based on GDT UUID. ValidityPeriod may be based on GDT DatePeriod with restriction CLOSED and Qualifier Validity. SocialInsuranceTypeCode may be based on GDT SocialInsuranceTypeCode. EmployeeSocialInsuranceContributionModelCode may be based on GDT EmployeeSocialInsuranceContributionModelCode. If the value of the attribute @actionCode is "Delete" the UUID may be filled. If the value of the attribute @actionCode is other than "Delete", then ValidityPeriod, SocialInsuranceTypeCode and EmployeeSocialInsuranceContributionModelCode may also be filled. Integrity conditions for the content of the elements may have already been checked by the leading business object.

WorkAgreementItemComplementaryContribution

WorkAgreementItemComplementaryContribution can contain the elements @actionCode, UUID, ValidityPeriod, BusinessPartnerUUID and EmployeeSocialInsuranceContributionTypeCode. @actionCode may be based on GDT ActionCode. UUID may be based on GDT UUID. ValidityPeriod may be based on GDT DatePeriod with restriction CLOSED and Qualifier Validity. BusinessPartnerUUID may be based on GDT UUID. EmployeeSocialInsuranceContributionTypeCode may be based on GDT EmployeeSocialInsuranceContributionTypeCode. If the value of the attribute @actionCode is "Delete" the UUID may be filled. If the value of the attribute @actionCode is other than "Delete", then ValidityPeriod, BusinessPartnerUUID and EmployeeSocialInsuranceContributionTypeCode may also be filled. In some implementations, integrity conditions for the content of the elements may have already been checked by the leading business object.

Business Object GB_EmployeeSocialInsuranceArrangement

FIG. 202 illustrates an example GB_EmployeeSocialInsuranceArrangement business object model 202000. Specifically, this model depicts interactions among various hierarchical components of the GB_EmployeeSocialInsuranceArrangement, as well as external components that interact with the GB_EmployeeSocialInsuranceArrangement (shown here as 202002 through 202010).

A GB_EmployeeSocialInsuranceArrangement is the arrangement for the employee by United Kingdom bodies that may be legally responsible for administering the employee's social insurance contributions and benefits. This arrangement can concern the information required for calculation of United Kingdom social insurance contributions and reporting according United Kingdom social insurance bodies. The business object GB_EmployeeSocialInsuranceArrangement can be part of the process component GB_EmployerRegulatoryCompliance. A GB_EmployeeSocialInsuranceArrangement can contain information that may be required for correct calculation of social insurance provision for a Work Agreement. The items within the Work Agreement may be recorded according to the social insurance details that can be provided by the employee. It may be United Kingdom specific and associated to one Employee entity. GB_EmployeeSocialInsuranceArrangement may be represented by the Root node. The Business Object GB_EmployeeSocialInsuranceArrangement is involved in the GB Employer Regulatory Compliance_Payroll Processing Process Integration Model. The Service Interface GB Employer Regulatory Compliance in Payroll Input Maintenance Out is part of the GB Employer Regulatory Compliance_Payroll Processing Process Integration Model. The service interface GB Employer Regulatory Compliance in Payroll Input Maintenance Out can group operations which maintain GB employer regulatory compliance within Payroll Processing. The operation Notify of GB_EmployeeSocialInsuranceArrangement can provide information on an employee's Great Britain tax arrangement to payroll processing. The GB_EmployeeSocialInsuranceArrangementPayrollNotification message may be based on Business Object GB_EmployeeSocialInsuranceArrangement. After the relevant Great Britain social insurance arrangement information is updated in GB Employer Regulatory Compliance, the message type GB_EmployeeTaxArrangementPayrollNotification may be sent to Payroll Processing to update the corresponding information in the object GB_EmployeePayrollInput.

Node Structure of Business Object GB_EmployeeSocialInsuranceArrangement

A GB_EmployeeSocialInsuranceArrangement 202012 is the arrangement for the employee by Great Britain social insurance authority concerning calculation and reporting of contributions according to the United Kingdom legal requirements. It can contain information of category, certificate held indicator and company director indicators required for social insurance contributions to Her Majesty's Revenue and Customs (HMRC). The elements located directly at the node GB_EmployeeSocialInsuranceArrangement may be defined by the data type GB_EmployeeSocialInsuranceArrangementElements. In certain implementations, these elements include UUID and EmployeeUUID. A UUID is a unique ID that identifies one United Kingdom employee's social insurance arrangement, and may be an alternative key. The UUID may be based on GDT UUID. EmployeeUUID is the UUID of the employee for whom the social insurance arrangement may apply. The EmployeeUUID may be based on GDT UUID. The composition relationship with subordinate nodes, WorkAgreementItem 202014 1:n, may exist. Inbound Aggregation Relationships may relate from business object Employee/node Employee, Employee 1:c, as the employee for whom the social insurance arrangement may apply. In some implementations, you may not change an employee's assignment to an GB_EmployeeSocialInsuranceArrangement. Queries can include QueryByEmployeeID, a query that can provide a list of all GB_EmployeeSocialInsuranceArrangement for the specified employee. The query element may be defined by the data type GB_EmployeeSocialInsuranceArrangement-EmployeeIDQueryElements. In certain implementations, these elements include EmployeeUUID and EmployeeID. EmployeeUUID is optional and may be based on GDT UUID. EmployeeID is optional and may be based on GDT EmployeeID.

WorkAgreementItem

A WorkAgreementItem is the set of information required for United Kingdom social insurance calculation and reporting purposes for one Work Agreement. The elements located directly at the node WorkAgreementItem may be defined by the data type GB_EmployeeSocialInsuranceArrangementWorkAgreementItemElements. In certain implementations, these elements include WorkAgreementUUID, which is the UUID of the work agreement for which the social insurance details apply. The WorkAgreementUUID may be based on GDT UUID. The composition relationship with subordinate nodes, WorkAgreementItemPeriodTerms 1:n, may exist. Inbound Aggregation Relationships may relate from business object Work Agreement/node WorkAgreement, Work Agreement 1:c, as the work agreement for which the social insurance details may apply. Queries may include QueryByEmployeeAndWorkAgreement, which can provide a list of all GB_EmployeeSocialInsuranceArrangement for a particular work agreement of an employee. The query elements are defined by the data type GB_EmployeeSocialInsuranceArrangementWorkAgreementItemEmployeeAndWorkAgreementQueryElements. In certain implementations, these elements include GB_EmployeeSocialInsuranceArrangementEmployeeUUID and WorkAgreementUUID. GB_EmployeeSocialInsuranceArrangementEmployeeUUID is optional and may be based on GDT UUID. WorkAgreementUUID is optional and may be based on GDT UUID.

WorkAgreementItemPeriodTerms

A WorkAgreementItemPeriodTerms is the set of additional information relevant to the social insurance calculation and reporting for a particular validity period. The elements located directly at the node WorkAgreementItemPeriodTerms may be defined by the data type GB EmployeeSocialInsuranceArrangementWorkAgreementItemPeriodTermsElements. In certain implementations, these elements include UUID, ValidityPeriod, EmployeeSocialInsuranceContributionCalculationMethodCode, CertifiedIndicator, Intermediate Data Type Company Director and PaymentRegularIndicator. A UUID is an ID, which can be unique, that identifies one WorkAgreementItemPeriodTerms 202016 node. The UUID may be based on GDT UUID. The ValidityPeriod is the validity period of the work agreement item. The ValidityPeriod may be based on GDT DatePeriod with restriction CLOSED and Qualifier Validity. The EmployeeSocialInsuranceContributionCalculationMethodCode is a coded representation of a method of calculating social insurance contributions for both the employee and employer. The EmployeeSocialInsuranceContributionCalculationMethodCode may be based on GDT EmployeeSocialInsuranceContributionCalculationMethodCode. The CertifiedIndicator indicates whether the National Insurance certificate is certified or not, and is optional. The CertifiedIndicator may be based on GDT CertifiedIndicator. Intermediate Data Type Company Director is optional. The Indicator indicates whether the employee is a company director for the purposes of calculating National Insurance Contribution (NIC) or not, and is optional. The Indicator may be based on GDT CompanyDirectorIndicator. The PaymentRegularIndicator indicates whether the company director receives regular payments for the purposes of calculating National Insurance Contribution (NIC) or not, and is optional. The PaymentRegularIndicator may be based on GDT RegularIndicator. For certain categories defined by GB regulations the certified indicator may have to be true.

FIG. 203 illustrates one example logical configuration of GB_EmployeeSocialInsuranceArrangementMessage message 203000. Specifically, this figure depicts the arrangement and hierarchy of various components such as one or more levels of packages, entities, and datatypes, shown here as 203000 through 203020. As described above, packages may be used to represent hierarchy levels. Entities are discrete business elements that are used during a business transaction. Data types are used to type object entities and interfaces with a structure. For example, GB_EmployeeSocialInsuranceArrangementMessage message 203000 includes, among other things, GB_EmployeeSocialInsuranceArrangement 203004. Accordingly, heterogeneous applications may communicate using this consistent message configured as such.

FIG. 204-1 through 204-5 illustrates one example logical configuration of GB_EmployeeSocialInsuranceArrangementMessage message 204000. Specifically, this figure depicts the arrangement and hierarchy of various components such as one or more levels of packages, entities, and datatypes, shown here as 204000 through 204108. As described above, packages may be used to represent hierarchy levels. Entities are discrete business elements that are used during a business transaction. Data types are used to type object entities and interfaces with a structure. For example, GB_EmployeeSocialInsuranceArrangementMessage message 204000 includes, among other things, GB_EmployeeSocialInsuranceArrangement 204028. Accordingly, heterogeneous applications may communicate using this consistent message configured as such.

Message Types and their Signatures

The Message Types and Their. Signatures section describes the message types and their signatures that may be derived from the operations of the business object GB_EmployeeSocialInsuranceArrangement. In a signature, the business object can be contained as a "leading" business object. The message data type can determine the structure of the following message types. In order for a payroll system to calculate British employee social insurance contributions and carry out related legal reporting for an employee, certain employee specific data may be stored in the Business Object GB_EmployeeSocialInsuranceArrangement. This data may be transmitted initially and any changes to it in a timely manner to the payroll provider so these tasks can be performed. The Business Object GB_EmployeeSocialInsuranceArrangement can be part of the GB Employer Regulatory Compliance and the Logical Deployable Unit Human Capital Management Process Component.

GB_EmployeeSocialInsuranceArrangementPayroll Notification

GB_EmployeeSocialInsuranceArrangementPayrollNotification is a notification to the payroll of an employee's social insurance information. Employee social insurance information may be required to correctly calculate social insurance contributions and transfer these to the social insurance organizations. In addition the employee's social insurance information can be used for social insurance contribution reporting purposes. The structure of this message type may be determined by the message data type GB_EmployeeSocialInsuranceArrangementMessage. For details of constraints on the structure and integrity conditions of GB_EmployeeSocialInsuranceArrangementPayrollNotification that are imposed by message data type GB_EmployeeSocialInsuranceArrangementMessage, one can refer to another section. The GB_EmployeeSocialInsuranceArrangementMessage message type can be used in the following operations of business objects: GB_EmployeeSocialInsuranceArrangement, as NotifyOfGB_EmployeeSocialInsuranceArrangement and GB_EmployeePayrollInput, as MaintainGB_EmployeePayrollInputBasedOnSocialInsuranceArrangement.

GB_EmployeeSocialInsuranceArrangementMessage

The GB_EmployeeSocialInsuranceArrangementMessage message data type can contain the object GB_EmployeeSocialInsuranceArrangement which may be contained in the business document and the business information that may be relevant for sending a business document in a message. It can contain the MessageHeader package and GB_EmployeeSocialInsuranceArrangement package. The GB EmployeeSocialInsuranceArrangementMessage message data type, therefore, can provide the structure for the message types and the operations, GB_EmployeeSocialInsuranceArrangementPayrollNotification, that are based on them. MessageHeader Package is a grouping of business information that is relevant for sending a business document in a message and can contain the entity, MessageHeader. MessageHeader is a grouping of business information from the perspective of the sending application and may include information to identify the business document in a message, information about the sender and optionally information about the recipient. The MessageHeader can contain SenderParty and RecipientParty. It can be of the type GDT BusinessDocumentMessageHeader, and all elements of the GDT may be used. SenderParty is the partner responsible for sending a business document at business application level. The SenderParty can be of the type GDT BusinessDocumentMessageHeaderParty. RecipientParty is the partner responsible for receiving a business document at business application level. The RecipientParty can be of the type GDT BusinessDocumentMessageHeaderParty.

GB_EmployeeSocialInsuranceArrangement Package

GB_EmployeeSocialInsuranceArrangement Package is the grouping of GB_EmployeeSocialInsuranceArrangement with its package. A WorkAgreementItemPackage relationship with cardinality 1:n can exist.

GB_EmployeeSocialInsuranceArrangement

Information on GB_EmployeeSocialInsuranceArrangement can be located on the business object GB_EmployeeSocialInsuranceArrangement/node root-node. GB_EmployeeSocialInsuranceArrangement can contain the elements UUID and EmployeeUUID. UUID may be based on GDT UUID. EmployeeUUID may be based on GDT UUID. In some implementations, integrity conditions may have already been checked by the leading business object.

WorkAgreementItemPackage

Information on WorkAgreementItemPackage may be located on the business object GB_EmployeeSocialInsuranceArrangement/node WorkAgreementItem. The grouping of WorkAgreementItemPackage with its packages can be WorkAgreementItemPeriodTerms, cardinality 1..n. WorkAgreementItemPackage can contain the elements @workAgreementItemPeriodTermsListCompleteTransmissionIndicator and WorkagreementUUID. ≠workAgreementItemPeriodTermsListCompleteTransmissionIndicator is optional and may be based on GDT Indicator and Qualifier CompleteTransmission. WorkagreementUUID may be based on GDT UUID. In some implementations, integrity conditions may have already been checked by the leading business object WorkAgreementItemPeriodTerms Information on WorkAgreementItemPeriodTerms may be located on business object GB_EmployeeSocialInsuranceArrangement/node WorkAgreementItemPeriodTerms. WorkAgreementItemPeriodTerms can contain the elements @actionCode, UUID, ValidityPeriod, EmployeeSocialInsuranceContributionCalculationMethodCode, CertifiedIndicator, CompanyDirectorIndicator and CompanyDirectorPaymentRegularIndicator. @actionCode may be based on GDT ActionCode. UUID may be based on GDT UUID. ValidityPeriod may be based on GDT DatePeriod with restriction CLOSED and Qualifier Validity. EmployeeSocialInsuranceContributionCalculationMethodCode may be based on GDT EmployeeSocialInsuranceContributionCalculationMethodCode. CertifiedIndicator is optional and may be based on GDT CertifiedIndicator. CompanyDirectorIndicator is optional and may be based on GDT CompanyDirectorIndicator. CompanyDirectorPaymentRegularIndicator is optional and may be based on GDT RegularIndicator. In some implementations, if the value of the attribute @actionCode is "Delete" the UUID may be filled. In some implementations, if the value of the attribute @actionCode is other than "Delete", then ValidityPeriod and EmployeeSocialInsuranceContributionCalculationMethodCode may also be filled. I some implementations, integrity conditions for the content of the elements may have already been checked by the leading business object.

Business Object IT_EmployeeSocialInsuranceArrangement

FIG. 205 illustrates an example IT_EmployeeSocialInsuranceArrangement business object model 205000. Specifically, this model depicts interactions among various hierarchical components of the IT_EmployeeSocialInsuranceArrangement, as well as external components that interact with the IT_EmployeeSocialInsuranceArrangement (shown here as 205002 through 205004 and 205016 through 205022).

An IT_EmployeeSocialInsuranceArrangement is the arrangement for the employee by the Italian bodies that are legally responsible for administering the employee's social insurance contributions and benefits. This arrangement concerns the information required for calculation of Italian social insurance contributions and reporting according to the Italian's Social Insurance bodies. This arrangement contains the information required for correct calculation within payroll processing of social insurance according to Italy legislation. Furthermore, this object also contains details required for correct reporting for the Italian Work Accident Insurance Organization (INAIL), the Italian Private Sector Social Insurance Organization (INPS) and other Social Insurance Bodies. The business object IT_EmployeeSocialInsuranceArrangement is part of the process component IT Employer Regulatory Compliance. IT_EmployeeSocialInsuranceArrangement contains information that is required for correct calculation of social insurance provision for a Work Agreement. IT_EmployeeSocialInsuranceArrangement is represented by the Root node.

The Business Object IT_EmployeeSocialInsuranceArrangement is involved in the following Process Integration Model: IT Employer Regulatory Compliance_Payroll Processing. Service Interface IT Employer Regulatory Compliance in Payroll Input Maintenance Out has a technical Name of ITEmployerRegulatoryComplianceITEmployerRegulatoryComplianceInPayrollInputMaintenanceOut. The Service Interface IT Employer Regulatory Compliance in Payroll Input Maintenance Out is part of the following Process Integration Models: IT Employer Regulatory Compliance_Payroll Processing. The service interface IT Employer Regulatory Compliance in Payroll Input Maintenance Out groups operations which maintain IT employer regulatory compliance within Payroll Processing.

A Notify of IT_Employee Social Insurance Arrangement (A2A) has a Technical Name of ITEmployerRegulatoryComplianceITEmployerRegulatoryComplianceInPayrollInputMaintenanceOut. The operation Notify of IT_EmployeeSocialInsuranceArrangement provides information on an employee's Italian social insurance arrangement to payroll processing. The Message Type that defines the structure of the operation is Message Types of Business Object IT_EmployeeSocialInsuranceArrangement IT_EmployeeSocialInsuranceArrangementPayrollNotification. This message is based on Business Object IT_EmployeeSocialInsuranceArrangement. After the relevant Italian employee social insurance arrangement information is updated in IT Employer Regulatory Compliance, the message type IT_EmployeeSocialInsuranceArrangementPayrollNotification is sent to Payroll Processing to update the corresponding information in the object IT_EmployeePayrollInput.

An IT_EmployeeSocialInsuranceArrangement is the arrangement for the employee by the Italian bodies that are legally responsible for administering the employee's social insurance contributions and benefits. This arrangement concerns the information required for calculation of Italian social insurance contributions and reporting according to the Italian's Social Insurance bodies. The elements located directly at the node IT_EmployeeSocialInsuranceArrangement 205006 are defined by the data type: IT_EmployeeSocialInsuranceArrangementElements. These elements are: UUID, a unique ID that identifies exactly one Italian employee's social insurance arrangement and is of type GDT: UUID, and EmployeeUUID, the UUID of the employee for whom the social insurance arrangement applies and is of type GDT: UUID. The following composition relationships with subordinate nodes may exist that WorkAgreementItem 205008 has a cardinality relationship of 1:cn. There may exist Inbound Aggregation Relationships From business object Employee/Root Employee has a cardinality relationship of 1:c and is an Employee for whom the social insurance arrangement applies. One cannot change the assignment to the employee in some implementations.

A QueryByEmployeeID query provides a list of all IT_EmployeeSocialInsuranceArrangement for an employee. The query elements are defined by the data type: IT_EmployeeSocialInsuranceArrangementEmployeeIDQueryElements. These elements are: EmployeeUUID is optional and is of type GDT: UUID, and EmployeeID is optional and is of type GDT: EmployeeID. The personnel ID of the employee that holds the IT_EmployeeSocialInsuranceArrangement matches to the query element EmployeeID.

A WorkAgreementItem is the set of information required for Italian statutory work accident insurance and private social insurance contributions for one Work Agreement. The elements located directly at the node WorkAgreementItem are defined by the data type: IT_EmployeeSocialInsuranceArrangementWorkAgreementItemElements. These elements are: WorkAgreementUUID, a universally unique identifier of a WorkAgreement for which the IT_EmployeeSocialInsuranceArrangement is valid and is of the type GDT: UUID. The following composition relationships with subordinate nodes exist: WorkAgreementItemContributionPeriodTerms 205010 has a cardinality relationship of 1:cn, WorkAgreementItemClassificationGroupingPeriodTerms 205012 has a cardinality relationship of 1:n, WorkAgreementItemWorkAccidentInsurancePeriodTerms 205014 has a cardinality relationship of 1:cn. There may exist Inbound Aggregation Relationships From business object WorkAgreement/Root node that WorkAgreement has a cardinality relationship of 1:c and is the work agreement for which the social insurance details apply.

A QueryByEmployeeAndWorkAgreement query provides a list of all IT_EmployeeSocialInsuranceArrangement for a particular work agreement of an employee. The query elements are defined by the data type: IT_EmployeeSocialInsuranceArrangementWorkAgreementItemEmployeeAndWorkAgreementQueryElements. These elements are: IT_EmployeeSocialInsuranceArrangementEmployeeUUID and is of the type GDT: UUID and WorkAgreementUUID GDT: UUID. WorkAgreementItemClassificationGroupingPeriodTerms may not overlap, i.e. one node may be valid for any given point in time. WorkAgreementItemWorkAccidentInsurancePeriodTerms may not overlap, i.e. one node may be valid for any given point in time.

A WorkAgreementItemContributionPeriodTerms is the contribution to a Social Insurance body (Business Partner) of an employee for one work agreement for a validity period. The elements located directly at the node WorkAgreementItemContributionPeriodTerms are defined by the data type: IT_EmployeeSocialInsuranceArrangementWorkAgreementItemContributionPeriodTermsElements. These elements are: UUID, a unique ID that identifies one WorkAgreementItemContributionPeriodTerms node and is of the type GDT: UUID, ValidityPeriod, the validity period of the WorkAgreementItemPeriodTerms and is of the type GDT: DatePeriod with restriction: CLOSED, and has a Qualifier: Validity, EmployeeSocialInsuranceContributionTypeCode, the coded representation of a social insurance contribution type calculated on employee remuneration and is of the type GDT: EmployeeSocialInsuranceContributionTypeCode, InsuranceBodyUUID, a unique ID of Business Partner that identifies exactly one Social Insurance Body and is of the type GDT: UUID, EmployeeSocialInsuranceContributionRuleCode is optional and is a coded representation of a rule to calculate a social insurance contribution for an employee and is of type GDT: EmployeeSocialInsuranceContributionRuleCode, EmployeeSocialInsurancePaymentRecurrenceCode is optional and is a coded representation of a payment recurrence to pay contributions to the Social insurance fund and is of type GDT: EmployeeSocialInsurancePaymentRecurrenceCode. There may exist Inbound Aggregation Relationships from business object BusinessPartner. BusinessPartner has a cardinality relationship of 1:c.

A WorkAgreementItemClassificationGroupingPeriodTerms is the classification of the Work Agreement from different Social Insurance bodies in a validity period. The elements located directly at the node WorkAgreementItemClassificationGroupingPeriodTerms are defined by the data type: IT_EmployeeSocialInsuranceArrangementWorkAgreementItem-ClassificationGroupingPeriodTerms Elements. These elements are: UUID, a unique ID that identifies one WorkAgreementItemClassificationGroupingPeriodTerms node and is of the type GDT: UUID, ValidityPeriod, the validity period of the WorkAgreementItemPeriodTerms and is of the type GDT: DatePeriod with restriction: CLOSED, and has a Qualifier: Validity, PrivateSectorSocialInsurance, a WorkAgreementItemClassificationGroupingPeriodTermsPrivateSectorSocialInsurance is an IDT containing the following three fields: EmployeeGroupCode is the group for the Italian Private Sector Social Insurance Organization (INPS) the employee is assigned to and is of the type GDT: PrivateSectorSocialInsurance-EmployeeGroupCode, and WorkPlace is a code of the place of work of the employee and is of the type GDT: RegionCode, SocialInsuranceCollaboratorData and is optional, a WorkAgreementItemClassification-GroupingPeriodTermsSocialInsuranceCollaboratorData is an IDT containing the following three fields: SocialInsuranceOccupationCategoryCode and is optional, a OccupationCategoryCode is a coded representation of a type of activity according to the classification of a Social Insurance Organization and is of the type GDT: SocialInsuranceOccupationCategoryCode, SocialInsuranceTypeCode and is optional, The InsuranceTypeCode is a coded representation of the alternative Insurance assigned to the employee by the Social Insurance organization. It is alternative in the sense that an employee may elect to have this type of insurance. This will effect contributions paid by the employer and is of the type GDT: SocialInsuranceTypeCode.

A WorkAgreementItemWorkAccidentInsurancePeriodTerms is the Work Accident Social Insurance details in a validity period. This includes information on category of work accident risk, health risk and if the Work Agreement implies an often traveling. The elements located directly at the node WorkAgreementItemWorkAccidentInsurancePeriodTerms are defined by the data type: IT_EmployeeSocialInsuranceArrangementWorkAgreementItem WorkAccidentInsurancePeriodTermsElements. These elements are: UUID, a unique ID that identifies one WorkAgreementItemWorkAccidentInsurancePeriodTerms node and is of type GDT: UUID, ValidityPeriod, the validity period of the WorkAgreementItemPeriodTerms and is of the type GDT: DatePeriod with restriction: CLOSED, and has a Qualifier: Validity, WorkAccidentInsuranceEmployeeGroupCode, the coded representation the group for Italian Work Accident Insurance Organization (INAIL) the employee is assigned to and if of the type GDT: WorkAccidentInsuranceEmployeeGroupCode, WorkAccidentRiskCategoryCode, the coded representation for the work accident risk category of an employee and is of the type GDT: WorkAccidentRiskCategoryCode, EmployeeWorkAccidentInsuranceContributionDiscountTypeCode, coded representation of the discount type to a Work Accident Insurance which an employee has for the Italian authority INAIL and is of the type GDT: EmployeeWorkAccidentInsuranceContributionDiscountTypeCod, TravelingIndicator and is optional, indicates the employee is traveling and is of the type GDT: TravelingIndicator, AsbestosSilicosisHealthRiskIndicator and is optional, indicates whether a employee has asbestos or silicosis health risk and is of the type GDT: HealthRiskIndicator.

FIG. 206 illustrates one example logical configuration of IT_EmployeeSocialInsuranceArrangementMessage message 206024. Specifically, this figure depicts the arrangement and hierarchy of various components such as one or more levels of packages, entities, and datatypes, shown here as 206024 through 206048. As described above, packages may be used to represent hierarchy levels. Entities are discrete business elements that are used during a business transaction. Data types are used to type object entities and interfaces with a structure. For example, IT_EmployeeSocialInsuranceArrangementMessage message 206024 includes, among other things, IT_EmployeeSocialInsuranceArrangement 206028. Accordingly, heterogeneous applications may communicate using this consistent message configured as such.

FIG. 207 illustrates one example logical configuration of IT_EmployeeSocialInsuranceArrangementMessage message 207000. Specifically, this figure depicts the arrangement and hierarchy of various components such as one or more levels of packages, entities, and datatypes, shown here as 207000 through 207320. As described above, packages may be used to represent hierarchy levels. Entities are discrete business elements that are used during a business transaction. Data types are used to type object entities and interfaces with a structure. For example, EmployeeTimeConfirmationViewOfServiceTransactionDocumentMessage message 207000 includes, among other things IT_EmployeeSocialInsuranceArrangement, 207028. Accordingly, heterogeneous applications may communicate using this consistent message configured as such.

This section describes the message types and their signatures that are derived from the operations of the business object IT_EmployeeSocialInsuranceArrangement. In a signature, the business object is contained as a "leading" business object. The message data type determines the structure of the following message types. In order for a payroll system to calculate Italian employee social insurance contributions and carry out related legal reporting for an employee, certain employee specific data is stored in the Business Object IT_EmployeeSocialInsuranceArrangement. This data may be transmitted initially and any changes to it in a timely manner to the payroll provider so these tasks can be performed. The Business Object IT_EmployeeSocialInsuranceArrangement is part of: the Process Component IT Employer Regulatory Compliance and the Logical Deployable Unit Human Capital Management.

A IT EmployeeSocialInsuranceArrangementPayrollNotification is a notification to the payroll of an employee's social insurance information. Employee social insurance information is required to correctly calculate social insurance contributions and transfer these to the social insurance organizations. In addition the employee's social insurance information is used for social insurance contribution reporting purposes. The structure of this message type is determined by the message data type IT_EmployeeSocialInsuranceArrangementMessage. This message type is used in the following operations of business objects: IT_EmployeeSocialInsuranceArrangement and NotifyOfIT_EmployeeSocialInsuranceArrangement, and IT_EmployeePayrollInput and MaintainIT_EmployeePayrollInputBasedOnSocialInsuranceArrangement.

A IT_EmployeeSocialInsuranceArrangementMessage message data type contains the object IT_EmployeeSocialInsuranceArrangement which is contained in the business document and the business information that is relevant for sending a business document in a message. It contains the packages: MessageHeader package and IT_EmployeeSocialInsuranceArrangement package. This message data type, therefore, provides the structure for the following message types and the operations that are based on them: IT_EmployeeSocialInsuranceArrangementPayrollNotification.

A MessageHeader Package is a grouping of business information that is relevant for sending a business document in a message. It contains the entity: MessageHeader.

A MessageHeader is a grouping of business information from the perspective of the sending application such as Information to identify the business document in a message, Information about the sender and/or optional Information about the recipient. The MessageHeader contains: SenderParty and RecipientParty. It is of the type GDT: BusinessDocumentMessageHeader, and all elements of the GDT are used.

A SenderParty is the partner responsible for sending a business document at business application level. The SenderParty is of the type GDT: BusinessDocumentMessageHeaderParty.

A RecipientParty is the partner responsible for receiving a business document at business application level. The RecipientParty is of the type GDT: BusinessDocumentMessageHeaderParty.

A IT_EmployeeSocialInsuranceArrangement may be in a grouping with its package: WorkAgreementItemPackage that has a cardinality relationship of Card. 1..n.

A IT_EmployeeSocialInsuranceArrangement contains the elements: UUID is of type GDT: UUID, and EmployeeUUID is of type GDT: UUID. Integrity conditions may have already been checked by the leading business object.

A WorkAgreementItemPackage may be in a grouping with its packages: WorkAgreementItemContributionPeriodTerms has a cardinality relationship of Card. 0..n, WorkAgreementItemClassificationGroupingPeriodTerms has a cardinality relationship of Card. 1..n, and WorkAgreementItemWorkAccidentInsurancePeriodTerms has a cardinality relationship of Card. 0..n. WorkAgreementItemPackage contains the elements: @workAgreementItemContributionPeriodTermsListCompleteTransmissionIndicator is optional and is of type GDT: Indicator, Qualifier: CompleteTransmission, @workAgreementItemClassificationGroupingPeriodTermsListCompleteTransmissionIndicator is optional and is of type GDT: Indicator and has a Qualifier: CompleteTransmission, @workAgreementItemWorkAccidentInsurancePeriodTermsListCompleteTransmissionIndicator is optional and is of type GDT: Indicator and has a Qualifier: CompleteTransmission, and WorkAgreementUUID and is of type GDT: UUID. Integrity conditions may have already been checked by the leading business object.

A WorkAgreementItemContributionPeriodTerms contains the elements @actionCode of type GDT: ActionCode, UUID is of type GDT: UUID, ValidityPeriod and of type GDT: DatePeriod with restriction: CLOSED and has a Qualifier: Validity, EmployeeSocialInsuranceContributionTypeCode and is of type GDT: EmployeeSocialInsuranceContributionTypeCode, InsuranceBodyUUID and is of type GDT: UUID, EmployeeSocialInsuranceContributionRuleCode is optional and is of type GDT: EmployeeSocialInsuranceContributionRuleCode, EmployeeSocialInsurancePaymentRecurrenceCode is optional and is of type GDT: EmployeeSocialInsurancePaymentRecurrenceCode. There may exist Integrity Conditions that if the value of the attribute @actionCode is "Delete" the UUID is filled. If the value of the attribute @actionCode is other than "Delete", then ValidityPeriod, ContributionTypeCode and InsuranceBodyUUID may also be filled. Integrity conditions for the content of the elements may have already been checked by the leading business object.

WorkAgreementItemClassificationGroupingPeriodTerms may be grouped with its entities: WorkAgreementItemClassificationGroupingPeriodTermsPrivateSectorSocialInsurance and WorkAgreementItemClassificationGroupingPeriodTermsSocialInsuranceCollaboratorData is optional. WorkAgreementItemClassificationGroupingPeriodTerms contains the elements:

@actionCode of type GDT: ActionCode and UUID is of type GDT: UUID with a ValidityPeriod and is of type GDT: DatePeriod with restriction: CLOSED and has a Qualifier: Validity. There may exist Integrity Conditions that if the value of the attribute @actionCode is "Delete" the UUID is filled. If the value of the attribute @actionCode is other than "Delete", then ValidityPeriod may also be filled and the entities WorkAgreementItemClassificationGroupingPeriodTermsPrivateSectorSocialInsurance and WorkAgreementItemClassificationGroupingPeriodTermsSocialInsuranceCollaboratorData may also be transmitted. Integrity conditions for the content of the elements may have already been checked by the leading business object.

A WorkAgreementItemClassificationGroupingPeriodTermsPrivateSectorSocialInsurance contains the elements: EmployeeGroupCode of type GDT: PrivateSectorSocialInsuranceEmployeeGroupCode and WorkPlace of type GDT: RegionCode. There may exist Integrity Conditions that the entity WorkAgreementItemClassificationGroupingPeriodTermsPrivateSectorSocialInsurance has no attribute @actionCode, therefore the complete list of nodes from the leading business object are included in the message transmission if information from the entity WorkAgreementItemClassificationGroupingPeriodTerms is included in the message transmission. Integrity conditions may have already been checked by the leading business object A WorkAgreementItemClassificationGroupingPeriodTermsSocialInsuranceCollaboratorData contains the elements: SocialInsuranceOccupationCategoryCode is optional and is of type GDT: SocialInsuranceOccupationCategoryCode, and SocialInsuranceTypeCode is optional and is of type GDT: SocialInsuranceTypeCode. There may exist Integrity Conditions that The entity WorkAgreementItemClassificationGroupingPeriodTermsSocialInsuranceCollaboratorData has no attribute @actionCode, therefore the complete list of nodes from the leading business object are included in the message transmission if information from the entity WorkAgreementItemClassificationGroupingPeriodTerms is included in the message transmission. Integrity conditions may have already been checked by the leading business object A WorkAgreementItemWorkAccidentInsurancePeriodTerms contains the elements: @actionCode of type GDT: ActionCode, UUID of type GDT: UUID, ValidityPeriod of type GDT: DatePeriod with restriction: CLOSED and has a Qualifier: Validity, WorkAccidentInsuranceEmployeeGroupCode and is of type GDT: WorkAccidentInsuranceEmployeeGroupCode, WorkAccidentRiskCategoryCode and is of type GDT: WorkAccidentRiskCategoryCode, EmployeeWorkAccidentInsuranceContributionDiscountTypeCode is of type GDT: EmployeeWorkAccidentInsuranceContributionDiscountTypeCode, TravelingIndicator is optional and is of type GDT: TravelingIndicator, and AsbestosSilicosisHealthRiskIndicator is optional and is of type GDT: HealthRiskIndicator. There may exist Integrity Conditions that if the value of the attribute @actionCode is "Delete" the UUID is filled. If the value of the attribute @actionCode is other than "Delete", then ValidityPeriod, EmployeeGroupCode, WorkAccidentRiskCategoryCode and EmployeeContributionDiscountTypeCode may also be filled. Integrity conditions for the content of the elements have already been checked by the leading business object.

In some implementations Data Types Used (GDTs) include: Indicator, UUID, ActionCode, CLOSED_DatePeriod, EmployeeSocialInsuranceContributionTypeCode, EmployeeSocialInsuranceContributionRuleCode, EmployeeSocialInsurancePaymentRecurrenceCode, PrivateSectorSocialInsuranceEmployeeGroupCode, RegionCode, SocialInsuranceOccupationCategoryCode, SocialInsuranceTypeCode, WorkAccidentInsuranceEmployeeGroupCode, WorkAccidentRiskCategoryCode, EmployeeWorkAccidentInsuranceContributionDiscountTypeCode, TravelingIndicator and HealthRiskIndicator.

Business Object WorkingTimeModel

FIG. 208 illustrates one example of an WorkingTimeModel business object model 208000. Specifically, this figure depicts interactions among various hierarchical components of the WorkingTimeModel. A Business Object WorkingTimeModel may be employee-independent. Business Object WorkingTimeModel may be a structured description of working times. In addition to working hours, the Business Object WorkingTimeModel may also describe absence times, break times, and availability times. WorkingTimeModels may be employee-independent and/or used as building blocks for EmployeeTimes. For example, WorkingTimeModels are a Daily work schedule from 09:00 AM to 05:30 PM and a Break Schedule from 12:00 AM to 01:30 PM.

When an EmployeeTime refers to a WorkingTimeModel, the working times described in the model become part of the employee's time record. Additionally, an EmployeeTime may overwrite parts of the data from the WorkingTimeModel. By using WorkingTimeModels in EmployeeTimes, documenting planned and actual working times and activities in EmployeeTimes may be facilitated and faster. In some implementations, the WorkingTimeModel may be an aggregation of other WorkingTimeModels.

The business object WorkingTimeModel belongs to the process component Time & Labour Management. The WorkingTimeModel includes information about its validity, information on its Item with type, and/or information for each item with additional business process data, which may be relevant in each case for special applications, such as time evaluation.

WorkingTimeModel

A WorkingTimeModel 208002 may be employee-independent. The WorkingTimeModel may be a structured description of working times. In addition to working times, it may also describe absence times, break times, and/or availability times. The WorkingTimeModel may be structured as a list of items. Additionally, a working time model may include information about its semantic meaning and validity. The WorkingTimeModels may be used as building blocks for EmployeeTimes. When an EmployeeTimeItem refers to a WorkingTimeModel, the EmployeeTime containing the WorkingTimeModel's items directly may be utilized instead since it contains at least some of the same information. The WorkingTimeModel may also be an aggregation of other WorkingTimeModels which are then referred to by the WorkingTimeModel's items.

The elements of the WorkingTimeModel are defined by the GDT type WorkingTimeModel Elements. The WorkingTimeModel Elements may include UUID, ID, WorkingTimeModelTypeCode, VersionID, and SystemAdministrativeData. The UUID may be a universally unique ID for a working time model and/or have a GDT of type UUID. The ID may be a unique identifier for a working time model and/or have a GDT of type WorkingTimeModelID. The WorkingTimeModelTypeCode is the coded representation to structure the set of all working time models by their semantics and/or may be a GDT of type WorkingTimeModelTypeCode. The VersionID may be a unique identification of the version of a working time model and/or have a GDT of VersionID. The SystemAdministrativeData includes administrative information about the working time model and/or may be a GDT of type SystemAdministrativeData.

The Description 208006 may have a cardinality of 1:cn and/or the WorkingTimePerPeriod 208004 may have a cardinality of 1:cn.

To maintain integrity, once a WorkingTimeModel has been created, changes to its type may be inhibited. In addition, circular reference of working time models may be inhibited to maintain integrity. The WorkingTimeModel may not check for collisions of time. The Type of WorkingTimeModel may determine the types of WorkingTimeModels that can be referenced and/or may determine the data which can be specified in the EmployeeTimeValidity, to maintain integrity.

Queries may be performed, such as QueryByTypeCode. The QueryByTypeCode may provides a list of WorkingTimeModels which satisfy the selection criteria. The query elements may be defined by GDT of type WorkingTimeModelTypeCodeQueryElements. WorkingTimeModelTypeCodeQueryElements may include Type Code, ID, Description, and/or KeyDate. Type Code may be a GDT of type WorkingTimeModelTypeCode. The ID may be a GDT of type WorkingTimeModelID. The Description may be a GDT of type MEDIUM_Description. The KeyDate may be a GDT of type Date.

WorkingTimeModels may be selected that are valid on the specified date. If the date is not specified then the current date is taken as the key date.

Another example of a query that may be performed is a QueryByWhereUsed, which provides a list of all or, in some implementations, at least a portion of WorkingTimeModels that refer to a particular WorkingTimeModel. The QueryByWhereUsed query elements may be defined by a GDT of type WorkingTimeModelWhereUsedQueryElements. The WorkingTimeModelWhereUsedQueryElements may include ItemWorkingTimeModelUUID, which may be a GDT of type UUID.

Description

A Description is a language-dependent description of a WorkingTimeModel. The elements of Description may be defined by a GDT of type WorkingTimeModelDescriptionElements. These elements include Description, which is a natural language display of the attributes of a working time model and/or may be a GDT of type _MEDIUM_Description.

WorkingTimePerPeriod

A WorkingTimePerPeriod is the period for which the working time model is defined. The WorkingTimePerPeriod may signify its validity period. The elements of the WorkingTimePerPeriod node are defined by the GDT of type WorkingTimePerPeriod Elements. These elements include ValidityPeriod, which is a period for which the working time model is valid. The Validity Period may be a GDT of type DatePeriod.

WorkingTimePerPeriodItem 208008 may have a cardinality of 1:c. The WorkingTimePerPeriodAverageRate 208010 may have a cardinality of 1:cn.

WorkingTimePerPeriodItem

A WorkingTimePerPeriodItem of a WorkingTimeModel may be a document item concerning information about the type, duration of the time (e.g.: absence, break, readiness etc.) which can be reused by EmployeeTimeItem. The WorkingTimePerPeriodItem may also refer to another working time model.

The elements of the WorkingTimePerPeriodItem are defined by the GDT of type WorkingTimePerPeriodItemElements. These elements include OrdinalNumberValue, EmployeeTimeItemCategoryCode, EmployeeTimeItemTypeCode, WorkingTimeModelValidity, and/or WorkingTimeModelUUID. In some implementations, the elements include OrdinalNumberValue and EmployeeTimeItemCategoryCode, EmployeeTimeItemTypeCode, WorkingTimeModelValidity, and/or WorkingTimeModelUUID may be optional elements. The OrdinalNumberValue is a number that indicates the position of an item and/or may be a GDT of type OrdinalNumberValue. The EmployeeTimeItemCategoryCode is a division of the type of employee time item into categories that carry the key information of the employee time according to company, collective-agreement, or statutory criteria. The EmployeeTimeItemCategoryCode may be a GDT of type EmployeeTimeItemTypeCategoryCode. The EmployeeTimeItemTypeCode is a coded representation of the type of an employee time item according to its concrete company, collective-agreement, or statutory significance, such as vacation, overtime, or illness with or without a medical certificate. The EmployeeTimeItemTypeCode may be a GDT of type EmployeeTimeItemTypeCode. The WorkingTimeModelValidity is a structure describing the date and time and duration of day or time intervals, which define the validity of the working time. The WorkingTimeModelValidity may be a GDT of type WorkingTimeModelValidity. The WorkingTimeModelUUID is a reference to another working time model and/or may be a GDT of type UUID.

Inbound Association Relationships:

From the Business Object WorkingTimeModel, the WorkingTimeModel may have a cardinality of c:cn. A WorkingTimeModelItem may reference a maximum of one WorkingTimeModel, in some implementations. A WorkingTimeModel may be used in an unlimited number of WorkingTimeModelItems. The reference to a WorkingTimeModel may enable the information stored there to be assigned in this working time model. The resulting combination may create a “bigger” model.

Composition may include WorkingTimePerPeriodItemValuationTerms 208012 with a cardinality of 1:c.

To maintain integrity, The EmployeeTimeItemCategoryCode may have the category belonging to the EmployeeTimeItemTypeCode. In addition, an Item may contain a reference to another working time model and/or an EmployeeTimeItemTypeCode and EmployeeTimeItemCategoryCode. The EmployeeTimeItemTypeCode and EmployeeTimeItemCategoryCode may determine the kind of EmployeeTimeValidity data which can be specified for working time model item, to facilitate maintaining integrity. In some implementations, the DatePeriod may be specified in the EmployeeTimeValidity.

WorkingTimePerPeriodItemValuationTerms

The WorkingTimePerPeriodItemValuationTerms are specifications for the evaluation of a document item. The evaluation specifications may be relevant only for specific parts of time evaluation. For example, evaluation specifications may be rules governing the assignment of a calendar day to a time document that has been entered as a clock time interval.

The elements of the WorkingTimePerPeriodItemValuationTerms may be defined by a GDT of type WorkingTimePerPeriodItemValuationTermsElements. These elements include EmployeeTimeValuationTerms, which is a structure defining the specifications for evaluating a document item. A separate GDT may be defined to enable reuse. The EmployeeTimeValuationTerms may be a GDT of type EmployeeTimeValuationTerms.

WorkingTimePerPeriodAverageRate

A WorkingTimePerPeriodAverageRate is the average working time for a concrete unit of rate (e.g., hours per day, hours per week, hours per month, hours per year, working days per week). The elements of the WorkingTimePerPeriodAverageRate are located directly at the AverageWorkingTimeRate node are defined by a GDT of type WorkingTimePerPeriodAverageRateElements. These elements include Rate, which is the average working time. The Rate may be a GDT of type Rate and/or include constraints. In some implementations, CurrencyCode and BaseCurrencyCode are not used.

BankPaymentOrder Business Object

FIG. 209 illustrates an example BankPaymentOrder business object model 209010. Specifically, this model depicts interactions among various hierarchical components of the BankPaymentOrder, as well as external components that interact with the BankPaymentOrder (shown here as 209000 through 209008, 209012 through 209028 and 209034 through 209036).

The BankPaymentOrder can be the instruction to a house bank to make a bank transfer or direct debit from a specified house bank account to fulfill an internal payment order. The BankPaymentOrder business object can be a part of the PaymentProcessing process component. In certain implementations, the BankPaymentOrder may contain data that can be specific to a payment by means of bank transfer or direct debit, for example, the reference number for the collective posting on the account statement.

The BankPaymentOrder 209030 can be represented by the BankPaymentOrder node. The Business Object BankPaymentOrder may be involved in the following Process Integration Models: Payment Processing_Payment order processing at house bank.

The Service Interface Payment Ordering Out can be a part of the following Process Integration Models: Payment Processing_Payment order processing at house bank. The Interface Payment Ordering Out may contain the operations for instructions to a house bank.

The Operation PaymentProcessingPaymentOrderingOut.RequestCollectivePaymentOrder may instruct a house bank to make a bank transfer or a direct debit. The operation may be based on the CollectivePaymentOrderRequest message type that can be derived from the BankPaymentOrder specialization of the PaymentOrder business object.

BankPaymentOrder can be the instruction to a house bank to make a bank transfer or direct debit from a specified house bank account to fulfill an internal payment order. The BankPaymentOrder (root) may contain a reference to the bank transfer or direct debit that can trigger the PaymentOrder to the split item of the PaymentRegisterItem that has been generated for the PaymentOrder. It may contain the data that is specific to a payment by means of bank transfer or direct debit, for example, the reference number for the collective posting on the account statement. The BankPaymentOrder may also contain information that can be specified when the bank transfer or direct debit is transmitted to the bank.

The PaymentRegisterItem with at least one split item can be generated for a released payment order. For technical reasons, a payment order can be divided into several partial amounts. This results in several split items of the PaymentRegisterItem, each with their own status management. Logically, these split items can still be one payment. If the payment type bank transfer or direct debit was used in the payment order (BankPaymentOrder specialization), exactly one BankPaymentOrder with reference to the split item is generated afterwards to complete the payment order per split item. In some implementations, a payment can only be finished when all split items have been closed, in this example therefore, when the complete bank payment order (confirmation through account statement) has been completed. The elements located at the BankPaymentOrder node can be defined by the data type GDT BankPaymentOrderElements.

In certain implementations, the GDT BankPaymentOrderElements may include the following elements: UUID, a universal unique identifier of a BankPaymentOrderGDT type UUID. PaymentOrderUUID, a universal unique identifier of the internal payment order through which the bank transfer or direct debit was requested. This may be based on GDT type UUID. PaymentRegisterItemSplitItemUUID, a universal unique identifier of a split item of a payment that has been generated on the basis of the PaymentOrder. There are several split items if a payment order has been divided into partial amounts for technical reasons. This may be based on GDT type UUID. HouseBankAccountUUID, a universal unique identifier of the house bank account that is used for the bank transfer or direct debit. This house bank account is a house bank account of the initiator of the payment order. This may be based on GDT type UUID. CompanyUUID, a universal unique identifier of the company whose house bank account is used for the bank transfer or direct debit. This may be based on GDT type UUID. HouseBankCompanyID, can be a unique identifier of the company that was assigned by the house bank. This is the company whose house bank account is used for the bank transfer or direct debit. This may be based on GDT type PartyPartyID. SystemAdministrativeData, can be the administrative data recorded by the system. This data includes system users and change dates/times. This may be based on GDT type SystemAdministrativeData. PaymentMediumExchangeSortCriterionText, can be the text which may determine the sequence of bank transfers or direct debits at an electronic data medium. This may be based on GDT type Text. PaymentCorrespondenceSortCriterionText, can be the text which may determine the sequence in which the document-based bank transfer or document-based direct debit are generated. This may be based on GDT type Text. This element is optional. MessageGranularityText, can be the text which may determine the granularity of the CollectivePaymentOrderRequest-Message. The text can be created for each business object instance by concatenating contents of the attributes that will lead to the creation of a separate CollectivePaymentOrderRequest Message. The granularity of the message can describe which outgoing checks can be contained in one message and for which checks a new message has to be created. For example, only checks with the same format and usually with the same house bank are sent together in one message. This may be based on GDT type Text. MessageSubGranularityText, can be the text which may determine the granularity of sub-bundles of checks in one CollectivePaymentOrder-Request-Message. The text is created for each business object instance by concatenating contents of the attributes that will lead to the creation of a new CollectivePaymentOrderRequest Message. The checks in one CollectivePaymentOrderRequestMessage can be bundled together as defined by the customer in configuration. Each bundle of checks gets a new PaymentMediumExchangeMessageID and other header information like total amount. Depending on the format, payments can be grouped together in one message. This allows one file to be sent with all checks that should be printed by a house bank and checks of different house bank accounts or business partners to be bundled inside. This may be based on GDT type Text. This element is optional. PaymentMediumFormatCode, can be the coded representation of the format in which the bank transfer or direct debit is transferred to the house bank. This may be based on GDT type PaymentMediumFormatCode. PaymentMediumFormatPaymentProcedureCode can be the coded representation of additional information on the format. The payment procedures are described by this for payment medium formats that are used for various payment procedures. This may be based on GDT type PaymentMediumFormatPaymentProcedureCode. PaymentMediumExchangeMessageID, can be the unique identifier of the message in the electronic data medium exchange. This may be based on GDT type PaymentMediumExchangeMessageID. OutgoingCompanyPaymentFileRegisterFileID, can be the internal unique identifier of the Outgoing File of a CompanyPaymentFileRegister that contains the BankPaymentOrder and may be based on GDT type CompanyPaymentFileRegisterFileID with qualifier Outgoing. OutgoingCompanyPaymentFileRegisterUUID is a universal unique identifier of the Outgoing File of a CompanyPaymentFileRegister that contains the BankPaymentOrder. This may be based on GDT type UUID. PaymentAmount, can be the Payment amount. This may be based on GDT type Amount with qualifier Payment. PaymentExecutionDate, can be the date on which the bank should make the bank transfer or direct debit. This may be based on GDT type Date with qualifier PaymentExecution.

BankChargeAmount, can be the amount of the bank charges. In some cases the bank charges are already known when creating the BankPaymentOrder. This may be based on GDT type Amount with qualifier BankCharge. This PaymentMediumCreationRequiredIndicator, can indicate whether or not a Payment Medium has to be created for a BankTransfer. This may be based on GDT type Indicator with qualifier Required. BankPaymentOrderLifeCycleStatus, can be the status of the BankPaymentOrder. This may be based on IDT type BankPaymentOrderLifecycleStatus with the following elements: BankPaymentOrderLifecycleStatusCode. BankPaymentOrderLifecycleStatusCode may be based on GDT type BankPaymentOrderLifecycleStatusCode and can have the values 'Not Transferred', 'In Transfer', 'Confirmed', 'Cancelled' and 'Returned.'

There may be a number of composition relationships to subordinate nodes including the following. DataMediumExchangeFormatSpecificDetails 209032 may have a cardinality relationship of 1:cn.

There may be a number of Inbound Aggregation Relationships including: 1) From business object HouseBankAccount as follows. HouseBankAccount may have a cardinality relationship of 1:cn and is an account with house bank from which the bank transfer or direct debit is carried out. 2)

From business object PaymentOrder as follows. PaymentOrder may have a cardinality relationship of 1:c and is a payment order for which the BankPaymentOrder is performed. The PaymentOrder is used also for access control to a BankPaymentOrder. 3) From business object PaymentRegister as follows. PaymentRegisterItemSplitItem may have a cardinality relationship of 1:c and is a split item of a payment for which the BankPaymentOrder is performed. 4) From business object Company as follows. Company may have a cardinality relationship of 1:c and is a company that generated the BankPaymentOrder. 5) From business object Identity as follows. CreationIdentity may have a cardinality relationship of 1:cn and is the identity that created the BankPaymentOrder. LastChangeIdentity may have a cardinality relationship of c:cn and is the identity that changed the BankPaymentOrder in the last time.

There may be a number of Inbound Association Relationships including: 1) From business object BusinessDocumentFlow as follows. BusinessDocumentFlow may have a cardinality relationship of c:c. A BankPaymentOrder can be a member of a BusinessDocumentFlow. 2) From business object CompanyPaymentFileRegister as follows. CompanyPaymentFileRegisterOutgoingFile may have a cardinality relationship of c:cn and is the Outgoing File entry of a CompanyPaymentFileRegister that was created by the BankPaymentOrder.

Enterprise Service Infrastructure Actions

CreatePaymentMedium (no S&AM action): Generates an electronic payment medium or a print request for paper payment medium. In some implementations, preconditions are that Status can be 'Not transferred'. Changes to the object may be that the action sets PaymentMediumExchangeMessageID and the PaymentMediumCreationRequiredIndicator (for the processing in the agent). In some implementations there are no changes to other objects. Changes to the status may be that the action calls action NotifyOfPaymentMediumCreation, which sets the status to 'In Transfer'. In some implementations, the action is called by mass data run object for payment medium creation or by the UI.

NotifyOfPaymentMediumDeletion (S&AM action) informs a bank payment order that the electronic payment medium or print request was deleted or canceled at the house bank. In some implementations, preconditions that the user who sets the status can have made sure that the payment medium has actually been deleted. Changes to the object may be that the action deletes PaymentMediumExchangeMessageID. In some implementations, there are no changes to other objects. Changes to the status may be that the action sets "No payment medium was created yet". In some implementations, the action is called by the UI after the user has deleted or voided a payment medium outside the Payment component.

Cancel (S&AM action) cancels a bank payment order. Changes to the status may be that the action sets "Payment was canceled". In some implementations, the action is called by PaymentOrder if the payment was canceled.

ConfirmPayment (S&AM action) confirms that the payment was made by the bank. Changes to the status may be that the action sets "Payment was made by the bank". In some implementations, the action is called by PaymentOrder if the bank statement confirms payment execution by the bank.

CancelPaymentConfirmation (S&AM action) cancels the payment confirmation from the bank. Changes to the status may be that the action sets "Payment medium was created". In some implementations, the action is called by PaymentOrder if it is established that the alleged confirmation of payment execution by the bank is invalid according to the bank statement (for example, if the bank statement is canceled).

CreatePaymentAdvice (no S&AM action) creates a payment advice. Preconditions may include that BankPaymentOrder has not been canceled. Changes to other objects may include changing the advice status of PaymentOrder. Changes to the status may be that the action sets "Payment medium was created" in PaymentOrder. In some implementations, the action is called by PaymentOrder if advice printing was triggered manually or at the mass data run for advice creation.

NotifyOfPaymentReturn (S&AM action) informs a BankPaymentOrder when the bank transfer or direct debit of the payment was returned, for example, because of the wrong bank connection data of a payee or if the payer of the direct debit has refused the direct debit. Preconditions may be that status of the BankPaymentOrder can be 'InTransfer'. Changes to the status may be that the action sets Status to 'Returned'. In some implementations, the action is called from the BO PaymentOrder.

NotifyOfPaymentMediumCreation (S&AM action) informs a BankPaymentOrder that a payment medium has been created. Generally it is called by the Action CreatePaymentMedium to change the status to 'In Transfer'. Only in the scenario where a bank transfer form was filled out manually, is this action called explicitly. Preconditions may be that status of BankPaymentOrder can be 'Not Transferred'. Changes to the object may be that the action sets PaymentMediumExchangeMessageID. Changes to the status may be that the action sets 'In Transfer'. In some implementations, the action is called by the UI (for manual payment) and the BO BankPaymentOrder.

QueryByPaymentOrder provides a list of all BankPaymentOrders for which PaymentOrderUUID corresponds to the value of the query element. The query elements are defined by the data type BankPaymentOrderPaymentOrderQueryElements. These elements can include: PaymentOrderUUID, PaymentOrderID, BankPaymentOrderLifeCycleStatus. PaymentOrderUUID is of GDT type UUID. PaymentOrderID is of GDT type BusinessTransactionDocumentID. BankPaymentOrderLifeCycleStatus is of IDT type BankPaymentOrderLifecycleStatus with the following elements: BankPaymentOrderLifecycleStatusCode. BankPaymentOrderLifecycleStatusCode is of GDT type BankPaymentOrderLifecycleStatusCode and can have the values 'Not Transferred', 'In Transfer', 'Confirmed', 'Cancelled' and 'Returned'.

QueryByElements provides a list of all BankPaymentOrders for which the values of the specified elements correspond to the values of the query elements. The query elements are defined by the data type BankPaymentOrderElementsQueryElements. These elements can include: UUID, PaymentOrderUUID, PaymentOrderID, PaymentRegisterItemSplitItemUUID, HouseBankAccountUUID, HouseBankAccountInternalID, CompanyUUID, CompanyID, HouseBankCompanyID, PaymentProcedureCode, PaymentFormCode, SystemAdministrativeData, PaymentMediumFormatCode, PaymentMediumFormatPaymentProcedureCode, PaymentMediumExchangeMessageID, PaymentAmount, PaymentExecutionDate, BankChargeAmount, OutgoingCompanyPaymentFileRegisterFileID, OutgoingCompanyPaymentFileRegisterUUID, BankPaymentOrderLifecycleStatus. UUID is of GDT type UUID. PaymentOrderUUID is of GDT type UUID. PaymentOrderID is an identifier of a payment order and is of GDT type BusinessTransactionDocumentID. PaymentRegisterItemSplitItemUUID is of GDT type UUID. HouseBankAccountUUID is of GDT type UUID. HouseBankAccountInternalID is an identifier of a house bank account and is of GDT type BankAccounInternalID. CompanyUUID is of GDT type UUID. CompanyID is an identifier of a company and is of GDT type OrganisationalCentreID. HouseBankCompanyID is of GDT type PartyPartyID. PaymentProcedureCode is of GDT type PaymentProcedureCode. PaymentFormCode is of GDT type PaymentFormCode. SystemAdministrativeData is of GDT type SystemAdministrativeData. PaymentMediumFormatCode is of GDT type PaymentMediumFormatCode. PaymentMediumFormatPaymentProcedureCode is of GDT type PaymentMediumFormatPaymentProcedureCode. PaymentMediumExchangeMessageID is of GDT type PaymentMediumExchangeMessageID. PaymentAmount is of GDT type Amount with qualifier Payment. PaymentExecutionDate is of GDT type Date with qualifier PaymentExecution. BankChargeAmount is of GDT type Amount with qualifier BankCharge. OutgoingCompanyPaymentFileRegisterFileID is an internal unique identifier of the outgoing file of a CompanyPaymentFile that contains the BankPaymentOrder and is of GDT type CompanyPaymentFileRegisterFileID with qualifier Outgoing. OutgoingCompanyPaymentFileRegisterUUID is a universally unique identifier of the outgoing file a CompanyPaymentFile that contains the BankPaymentOrder and is of GDT type UUID. BankPaymentOrderLifeCycleStatus is of IDT type BankPaymentOrderLifecycleStatus with the following elements: BankPaymentOrderLifecycleStatusCode.

BankPaymentOrderLifecycleStatusCode is of GDT type BankPaymentOrderLifecycleStatusCode and can have the values ‘Not Transferred’, ‘In Transfer’, ‘Confirmed’, ‘Cancelled’ and ‘Returned’.

QueryByPaymentMediaRunSelectionCriteria is a query that is required by the MDRO PaymentMediaRun for selection of the BankPaymentOrders that should be paid. The query elements are defined by the data type BankPaymentOrderPaymentMediaRunSelectionCriteriaQueryElements. These elements can include: PaymentMediumFormatCode, HouseBankInternalID, HouseBankAccountInternalID, CompanyID, BusinessPartnerID, PaymentExecutionDate, PaymentOrderID, CurrencyCode, PaymentProcedureCode, BankPaymentOrderLifeCycleStatus. PaymentMediumFormatCode is of GDT type PaymentMediumFormatCode. HouseBankInternalID is of GDT type BankInternalID. HouseBankAccountInternalID is of GDT type BankAccountInternalID. CompanyID is of GDT type OrganisationalCenterID. BusinessPartnerID is of GDT type BusinessPartnerInternalID. PaymentExecutionDate is of GDT type Date with qualifier Execution. PaymentOrderID is of GDT type BusinessTransactionDocumentID. CurrencyCode is of GDT type CurrencyCode. PaymentProcedureCode is of GDT type PaymentProcedureCode. BankPaymentOrderLifeCycleStatus is of IDT type BankPaymentOrderLifecycleStatus with the following elements: BankPaymentOrderLifecycleStatusCode. BankPaymentOrderLifecycleStatusCode is of GDT type BankPaymentOrderLifecycleStatusCode, can have the values ‘Not Transferred’, ‘In Transfer’, ‘Confirmed’, ‘Cancelled’ and ‘Returned’.

The DataMediumExchangeFormatSpecificDetails can be used by BankPaymentOrder for the bank transfer or direct debit. The DataMediumExchangeFormatSpecificDetails may vary from country to country and depend on the data medium formats that the banks support in the different countries. Some banks (bank and format-specific) may demand extra details from their customers on their data medium if it differs to the format specification of the data medium exchange.

In some implementations, due to the number of different semantics with this data, they are represented by a node DataMediumExchangeFormatSpecificDetails that gets a name-value pair in each instance. For the international data medium format “S.W.I.F.T. MT103,” the service level agreed between the bank customer and their house bank may be specified. An example of GDT type DataMediumExchangeFormatSpecificDetails code is:

<PaymentMediumFormatSpecificField>
<ID>
ServiceLevel
</ID>
<Value>
<Code>
SPRI
<Code>
</Value>
</PaymentMediumFormatSpecificField>

In certain implementations, the GDT type DataMediumExchangeFormatSpecificDetails may include the following element: PaymentMediumFormatSpecificField. The details of the DataMediumFormatSpecificField may be based on GDT type PaymentMediumFormatSpecificField.

CollectivePaymentOrderRequest Interface

The interface CollectivePaymentOrderRequest can be used to transmit payment orders (payment or direct debit) in a B2B process. The Interface can be motivated by the Purchase2 Pay and Order2Cash business scenarios. In both scenarios, CollectivePaymentOrderRequest messages can be sent from the PaymentProcessing component in the ERP system of the payment transaction initiator to the bank of the payment transaction destinated party. The bank can process the payment orders and the resulting bookings are booked on the bank account of the corporate customer in an account management component. The account management component may generate account statements (BankAccountStatementNotification) in order to report all the movements and the start and end balance of the bank account held by the corporate.

In the In-House Cash scenario the interface CollectivePaymentOrderRequest can be motivated mainly by a shared service center version of these business scenarios: The central payment services can replace external banks completely in case of intra-group payment transactions.

CollectivePaymentOrderRequest can be a request with instructions to a bank to carry out one or more payment transactions, for example, bank transfer or direct debit. The structure of the message type CollectivePaymentOrderRequest can be provided by the message-datatype CollectivePaymentOrderMessage. The payment initiator’s bank account can be debited or credited, depending on the type of the payment, for example, direct debit, bank transfer, etc.

The Interface CollectivePaymentOrderRequest_Out can be used to send a CollectivePaymentOrderRequest message asynchronously to a bank or central payment service. The Interface CollectivePaymentOrderRequest in can be used to receive an asynchronous CollectivePaymentOrderRequest message.

The message data type CollectivePaymentOrderRequestMessage may contain the following: The CollectivePaymentOrder included in the business document and the business information that is relevant for sending a business document in a message. It may also contain the following packages: MessageHeader package and PaymentOrder package. The CollectivePaymentOrderRequestMessage may provide the structure for the message type CollectivePaymentOrderRequest, and the interfaces that are based on it.

The MessageHeader package can group the business information that is relevant for sending a business document in a message. It may contain the following entity: MessageHeader. The MessageHeader can group business information from the perspective of the sending application: The MessageHeader may contain the following business information:

Information to identify the business document in a message, Information about the sender, and possibly information about the recipient.

In certain implementations, the MessageHeader may contain the following elements: SenderParty and RecipientParty. The MessageHeader may be based on GDT: BusinessDocumentMessageHeader, therefore, ID and CreationDateTime can also be used. The SenderParty can be the party responsible for sending a business document at business application level. In certain implementations, the SenderParty may be based on GDT: BusinessDocumentMessageHeaderParty. The RecipientParty can be the party responsible for receiving a business document at business application level. In certain implementations, the RecipientParty may be based on GDT: BusinessDocumentMessageHeaderParty.

The CollectivePaymentOrder package can group the CollectivePaymentOrder with its packages. It may contain the following packages: Party package, BankAccount package, and PaymentOrder package. The CollectivePaymentOrder can be an instruction to a credit institution to carry out one ore more payment transactions, for example, bank transfers or direct debits. The Party Package may contain the payment order initiator party. The BankAccount Package may contain the bank details for the payment order initiator party. The PaymentOrder Package may contain one or more instructions to a credit institution to carry out a single payment transaction, for example, bank transfer or direct debit.

In certain implementations, the CollectivePaymentOrder may contain the following elements:

ID, can be a unique identifier for the collective payment order. Created by the payment transaction initiator. This may be based on GDT: BusinessTransactionDocumentID. PaymentFormCode, can be the form of payment (e.g., by cheque, bank transfer, direct debit). Allowed are all values of the GDT PaymentFormCode except “01 Invoice”. This may be based on GDT: PaymentFormCode. PaymentProcedureCode, can be the payment procedure code determines some technical characteristics of payment execution (e.g. EU internal payment, domestic payment, foreign payment). This may be based on GDT: PaymentProcedureCode. AccountDebitIndicator, can indicate whether the account of the payment transaction destinated party is debited (e.g. if the payment form is direct debit) or not. This may be based on GDT: AccountDebitIndicator. PaymentExecutionDate, can be the execution date for the payment. This may be based on GDT: Date. PaymentTransactionInitiatorBankAccountValueDate, can be the expected value date on the payment transaction initiator’s bank account. This may be based on GDT: Date. PaymentTransactionDestinatedBankAccountValueDate, can be the expected value date on the payment transaction destinated party’s bank account. This may be GDT: Date. TotalNetAmount, can be the total of all net amounts contained in the collective payment order. This may be based on GDT: Amount. PaymentOrderTotalNumberValue, can be the total number of all PaymentOrders contained in the collective payment order. This may be based on GDT: TotalNumberValue.

The CollectivePaymentOrderParty Package can group the information concerning the parties involved in the payment transaction. It may contain the following entities: PaymentTransactionInitiator Party. The PaymentTransactionInitiator Party can be the party that initiated the payment, for example, bank transfer or direct debit. The PaymentTransactionInitiator Party may be based on GDT: BusinessTransactionDocumentParty. In certain implementations, the PaymentTransactionInitiator Party may include the following elements: StandardID, PaymentInitiatorID, PaymentRecipientID, Address and ContactPerson.

The CollectivePaymentOrderBankAccount Package can group the information concerning the bank details of the payment transaction initiator and the bank account supposed to used by the bank for bank charges. It may contain the following entities: PaymentTransactionInitiatorBankAccount and BankChargesBankAccount. The PaymentTransactionInitiatorBankAccount can be the bank account of the payment transaction initiator. The PaymentTransactionInitiatorBankAccount may be based on GDT: BusinessTransactionDocumentBankAccount. The BankChargesBankAccount can be the bank account that shall be debited with the bank charges for this payment order. The BankChargesBankAccount may be based on GDT: BusinessTransactionDocumentBankAccount. In some implementations, the BankChargesBankAccount is optional and only filled if it differs from PaymentTransactionInitiatorBankAccount.

The PaymentOrder package can group the PaymentOrder with its packages. It may contain the following packages: Party package, BankAccount package, PaymentInstructions package, StateCentralBankReport package, BusinessTransactionDocumentReference package and PaymentExplanation package. The PaymentOrder can be an instruction to a credit institution to carry out a single payment transaction, for example, bank transfer or direct debit.

The Party Package may contain the payment order for designated party apart other parties. The BankAccount Package may contain the bank details for the designated party of the payment transaction. The PaymentInstructions Package may contain information for the participating banks concerning the payment execution. This allows the initiator to control some aspects of payment execution.

The CentralBankReport Package can be used to provide legal reporting information to the national central bank. It contains the information to satisfy the legal reporting requirement for payments to foreign payees. The BusinessTransactionDocumentReference Package may contain references to different documents involved in the payment transaction, for example, checks. The PaymentExplanation Package may explain the purpose and the amount of the payment. It may contain references to individual invoices or credit memos.

The PaymentOrder may contain the following elements: ID, can be a unique identifier for a payment order and created by the payment transaction initiator. This may be based on GDT: BusinessTransactionDocumentID. BillOfExchangeDueDate, can be the bill of exchange due date in case of bill of exchange payments. This may be based on GDT: Date. NetAmount, can be the payment amount. This may be based on GDT: Amount. GrossAmount, can be the gross amount resulting from the business documents referred to in the PaymentExplanation. This may be based on GDT: Amount.

CashDiscountAmount, can be the cash discount deducted from the gross amount. This may be based on GDT: Amount. WithholdingTaxAmount, can be the amount of withholding tax calculated for this payment transaction. This may be based on GDT: Amount. This can be the additional remarks concerning the payment. This may be based on GDT: BankChargeBearerCode, can determine how bank charges are handled. This may be based on GDT: BankChargeRegulationCode. PriorityCode, can indicate whether execution of a payment is urgent. This may be based on GDT: BusinessTransactionPriorityCode. Allowed values are ‘2’ (urgent) and ‘3’ (normal), default value is ‘3’ (normal).

Payment orders can be generated automatically when payments that are due are settled individually or collectively using the payment program.

The PaymentOrderParty Package can group the information concerning the parties involved in the payment transaction. It may contain the following entities: PaymentTransactionDestinatedParty, OriginalPaymentTransactionInitiator Party and FinalPaymentTransactionDestinatedParty.

In some implementations, OriginalPaymentTransactionInitiator Party and FinalPaymentTransactionDestinatedParty can be optional and may only be used in case they are different from PaymentTransactionInitiator Party respective. PaymentTransactionDestinatedParty. In case the respective party is not filled in PaymentExplanation but it is supplied in the payment order's party package then it is also valid for this PaymentExplanation item.

The PaymentTransactionDestinatedParty can be the party that receives the payment or whose account is debted. The PaymentTransactionDestinatedParty may be based on GDT: BusinessTransactionDocumentParty. In certain implementations, the PaymentTransactionDestinatedParty may use the following elements: StandardID, PaymentInitiatorID, PaymentRecipientID, Address and ContactPerson.

The payment order can optionally be executed by the PaymentTransactionInitiator Party on behalf of the OriginalPaymentTransactionInitiator Party. The OriginalPaymentTransactionInitiator Party may be based on GDT: BusinessTransactionDocumentParty. In certain implementations, the OriginalPaymentTransactionInitiator Party may use the following elements: StandardID, PaymentInitiatorID, PaymentRecipientID, Address and ContactPerson. In some implementations, OriginalPaymentTransactionInitiator Party is optional and may only be supplied in case it is not equal to the PaymentInitiator Party.

The PaymentTransactionDestinatedParty can optionally be received as payment or be debited on behalf of the FinalPaymentTransactionDestinatedParty. The FinalPaymentTransactionDestinatedParty may be based on GDT: BusinessTransactionDocumentParty. In certain implementations, the FinalPaymentTransactionDestinatedParty may use the following elements: StandardID, PaymentInitiatorID, PaymentRecipientID, Address and ContactPerson. In some implementations, the FinalPaymentTransactionDestinatedParty is optional and may only be supplied in case it is different from PaymentTransactionDestinatedParty.

The PaymentOrderBankAccount Package can group the information concerning the bank details of the payment transaction designated party. It may contain the following entity: PaymentTransactionDestinatedBankAccount. In some implementations, BankDetails are optional.

The PaymentTransactionDestinatedBankAccount can be the bank account of the party that the payment transaction is destined for. This bank account can be, for example, automatically debited in case of a direct debit. The PaymentTransactionDestinatedBankAccount may be based on GDT: BusinessTransactionDocumentBankAccount.

The PaymentOrderPaymentInstruction Package can group the information concerning the payment instructions send together with the payment order. It may contain the following entities: PaymentInstruction and CorrespondenceBankDetails.

The PaymentInstruction can be instructions to the executing bank related to the payment order, for example, to send a bank advice to the payee. The PaymentInstruction may be based on GDT: PaymentInstruction.

The CorrespondenceBankDetails may contain the bank details of a correspondence bank that should be used for forwarding the payment order. The correspondence bank can be a bank (typically in a foreign country) to which a bank has a business connection. The correspondence bank can be used as an intermediary, for example, for cross border payments. The CorrespondenceBankDetails may contain the following entities: Bank and BankAccount. In certain implementations, the CorrespondenceBankDetails may contain the following elements: CorrespondenceBankTypeCode, can be the coded representation of the type of correspondence bank, for example, "intermediate bank" or "initiator's correspondence bank".

GDT: CorrespondenceBankTypeCode. The CorrespondenceBankDetailsBank may contain the address or identifier for the respective correspondence bank. The CorrespondenceBankDetailsBank may be based on GDT: Bank.

In some implementations, either only the Bank (if e.g. the bank account is not relevant) or the explicit BankAccount can be supplied but not both at the same time.

CorrespondenceBankDetailsBankAccount

The BankAccount can be a particular correspondence bank account. The BankAccount may be based on GDT: BusinessTransactionDocumentBankAccount. In some implementations, either the Bank or the BankAccount can be supplied but not both at the same time.

The PaymentOrderCentralBankReport Package can group the information required for legal reporting. It contains the following entity: CentralBankReportItem. The CentralBankReportItem can be used to provide legal reporting information for the central bank. It may contain the information to satisfy the legal reporting requirement for payments to foreign payees. The CentralBankReportItem may be based on GDT: CentralBankReportItem.

The PaymentOrderBusinessTransactionDocumentReference Package can group references to business documents involved in or used for the payment transaction, for example, check number. It may contain the following entities: PaymentReference, ChequeReference and BillOfExchangeReference. The PaymentReference can be a reference to the payers payment document representing the actual payment. The PaymentReference may be based on GDT: BusinessTransactionDocumentReference. In certain implementations, the PaymentReference may use the following element: ID. A payment documents a cash flow. This contains at least the payment procedure, the payment currency, the payment amount, the payment date and the payment receiver. Besides other attributes the parties involved and their respective bank details can be contained. The ChequeReference can be the reference to the check (checknumber) that was used for payment. The ChequeReference may be based on GDT: BusinessTransactionDocumentReference. In certain implementations, the ChequeReference may use the following element: ID. The BillOfExchangeReference can be the reference to the bill of exchange (bill of exchange number) that can be used for the payment. The BillOfExchangeReference may be based on GDT: BusinessTransactionDocumentReference. In certain implementations, the BillOfExchangeReference may use the following element: ID.

The PaymentExplanation Package can group the payment explanation items for a payment, in particular explaining the reason for the payment, for example, by referring to one or more invoices, the payment amount, for example, by giving the cash discount amounts, as well as if necessary the difference between the expected and the actual amount for the payment. It may contain the following entity: PaymentExplanationItem. The PaymentExplanationItem can be used to explain the payment amount for the payee. It can refer to one or more invoices or other business documents relevant for the payment amount. This may include potential adjustments applied by the payer.

The information contained can be used to identify the respective invoices or credit memos in the payee's financial accounting. Additionally it may explain potential differences between the invoice and the payment amount. The parties contained in PaymentExplanationItem can differ from the respective parties of the PaymentOrder. In certain implementations, the PaymentExplanationItem may be based on GDT: PaymentExplanationItem.

In certain implementations, the GDT may include the following data types: AccountDebitIndicator, Amount, BankChargeBearerCode, BusinessDocumentMessageHeader, BusinessTransactionDocumentBankAccount, BusinessTransactionDocumentID, BusinessTransactionDocumentParty, BusinessTransactionDocumentReference, BusinessTransactionPriorityCode, CorrespondenceBankTypeCode, CountryCode, Date, Description, MessageHeader, Note, PaymentExplanationItem, PaymentFormCode, PaymentInstruction, PaymentProcedureCode and CentralBankReportItem.

FIG. 210-1 through 210-6 illustrates one example logical configuration of CollectivePaymentOrderMessage message 210038. Specifically, this figure depicts the arrangement and hierarchy of various components such as one or more levels of packages, entities, and datatypes, shown here as 210038 though 210162. As described above, packages may be used to represent hierarchy levels. Entities are discrete business elements that are used during a business transaction. Data types are used to type object entities and interfaces with a structure. For example, CollectivePaymentOrderMessage message 210038 includes, among other things, PaymentOrder 210042. Accordingly, heterogeneous applications may communicate using this consistent message configured as such.

FIG. 211-1 through 211-9 illustrates one example logical configuration of CollectivePaymentOrderMessage message 211000. Specifically, this figure depicts the arrangement and hierarchy of various components such as one or more levels of packages, entities, and datatypes, shown here as 211000 through 2111248. As described above, packages may be used to represent hierarchy levels. Entities are discrete business elements that are used during a business transaction. Data types are used to type object entities and interfaces with a structure. For example, CollectivePaymentOrderMessage message 211000 includes, among other things, CollectivePaymentOrder 211010. Accordingly, heterogeneous applications may communicate using this consistent message configured as such.

Business Object CashTransfer

FIG. 212 illustrates an example CashTransfer business object model 212008. Specifically, this model depicts interactions among various hierarchical components of the CashTransfer, as well as external components that interact with the CashTransfer (shown here as 212000 through 212006 and 212010 through 212020).

CashTransfer is the movement of money/cash between HouseBankAccounts and CashStorage in some implementations. The four possible movements are: transfer from one HouseBankAccount to another HouseBankAccount, transfer from one CashStorage to another CashStorage, transfer from a HouseBankAccount to a CashStorage, and transfer from a CashStorage to a HouseBankAccount.

The business object CashTransfer is part of the process component Payment Processing. CashTransfer is movement of money/cash between HouseBankAccounts and CashStorage. The elements located directly at the CashTransfer 212022 node are defined by the type GDT: CashTransferElements these elements are: UUID, ID, CompanyUUID, CompanyID, CashLiquidityFunctionalUnitUUID, SystemAdministrativeData, PaymentFormCode, PaymentProcedureCode, TransferTransactionCurrencyAmount, TransferExecutionDate, Status.

UUID is an universal identifier of the CashTransfer, which can be unique. UUID may be based on GDT UUID. ID is an identifier of the CashTransfer, which may be unique. ID may be based on GDT BusinessTransactionDocumentID. CompanyUUID is an universal ID, which may be unique, of the company to which CashStorage and/or HouseBankAccount belongs to. CompanyUUID may be based on GDT UUID. CompanyID is an identifier, which may be unique, of the company to which CashStorage and/or HouseBankAccount belongs to. CompanyId may be based on GDT OrganisationalCentreID. CashLiquidityFunctionalUnitUUID is an universal identifier, which may be unique, of the FunctionalUnit working on the CashTransfer, and is optional. Integrity: The FunctionalUnit referenced has to be able to execute the organizational function Cash/Liquidity Management, i.e. the element OrganisationalFunctionCode in one of the instances of the node FunctionalUnitAttributes in the FunctionalUnit references can have the value "17" for Cash/Liquidity Management. CashLiquidityFunctionalUnitUUID may be based on GDT UUID. SystemAdministrativeData is administrative data which stores the user details and the alteration time. SystemAdministrativeData may be based on GDT SystemAdministrativeData. PaymentFormCode is a coded representation of the way (manner) in which the cash is transferred, and is optional. PaymentFormCode may be based on GDT PaymentFormCode. PaymentProcedureCode is a coded representation of a payment procedure. PaymentProcedureCode may be based on GDT PaymentProcedureCode. TransferTransactionCurrencyAmount is an amount which is transferred from Cash Storage or HouseBankAccount. TransferTransactionCurrencyAmount may be based on GDT Amount, Qualifier TransactionCurrency. TransferExecutionDate is the date on which the company made the cash transfer from Cash Storage or House Bank Account. TransferExecutionDate may be based on GDT Date, Qualifier Execution. Status is the status of the Cash transfer. Status may be based on GDT CashTransferStatus.

The following composition relationships to subordinate nodes exist: HouseBankMovement 212024 has a cardinality relationship of 1:cn. CashStorageMovement 212026 has a cardinality relationship of 1:cn. PaymentExplanation 212028 has a cardinality relationship of 1:c. DO: AccessControlList 212030 has a cardinality relationship of 1:1. From the business object Company/node Company: Company has a cardinality relationship of 1:cn and specifies the company executing the CashTransfer. From business object Identity/node Root: CreationIdentity has a cardinality relationship of 1:cn and is an Identity that created the cash transfer, and LastChangeIdentity has a cardinality relationship of c:cn and is an Identity that changed the cash transfer in the last time.

From the business object FunctionalUnit/node FunctionalUnit: CashLiquidityFunctionalUnit has a cardinality relationship of c:cn and identifies the Functional Unit which is working on the CashTransfer. For each CashTransfer the following combinations of node cardinalities may occur: Cardinality of HouseBankMovement node is 1:2 and CashStorageMovement 1:0, Cardinality of HouseBankMovement node is 1:1 and CashStorageMovement 1:1, Cardinality of HouseBankMovement node is 1:0 and CashStorageMovement 1:2. That means there are either 2 HouseBankMovements or 2 CashStorageMovements or one of each kind. For each CashTransfer there has to be a PropertyMovementDirectionCode with value 1 in one movement node and 2 in other node. No other combination is allowed.

Release is a S&AM action and releases the CashTransfer for further processing. All the information related to Cash Transfer is now available. Preconditions can include: the action enrich should be done prior to the release operation to collect all the information relevant to the cash transfer (like payment procedure) and the CashTransfer has to be consistent. Changes to the object can include: The lifecycle status of the Business object will be changed to “Released”. Changes to other objects can include: Depending on the transaction different BOs are created. For HouseBankAccount to another HouseBankAccount; Business Objects PaymentOrder and PaymentAdvice are created. For transfer from one Cash storage to another Cash storage; Two CashPayment Business Object are created. For transfer from a HouseBankAccount to a CashStorage; Business Objects PaymentOrder and CashPayment are created. For transfer from a CashStorage to a HouseBankAccount; Business Objects CashPayment and PaymentAdvice are created. Changes to the status can include: the status of the Business object will be changed to “Released”. This action is called by UI.

Cancel is a S&AM action and cancels the CashTransfer. Preconditions can include: The cash transfer has to be released before. The objects, which were created at the release can also be cancelled. So the cancellation of these objects can be possible. Changes to the object can include: The CashTransfer is cancelled and cannot be further processed. Changes to other objects can include: The Business objects like PaymentOrder, CashPayment, PaymentAdvice, created by CashTransfer can be cancelled. Changes to the status can include: the lifecycle status of the BO is changed to cancelled. This action is called from UI.

Check Consistency is an S&AM action and checks the consistency of the CashTransfer. Changes to the object can include: Consistency status is set based on the consistency check result. Changes to the status can include: consistency status is set based on the check result. This action can be called by the BO itself.

QueryByElements provides a list of all CashTransfers which match by different attributes. The query elements are defined by the data type: CashTransferElementsQueryElements. These elements are: UUID, ID, CompanyID, SystemAdministrativeData, PaymentFormCode, PaymentProcedureCode, TransferTransactionCurrencyAmount, TransferExecutionDate, and Status. UUID is of type GDT: UUID and is optional. ID is optional and is of type GDT: BusinessTransactionDocumentID. CompanyUUID is optional and of type GDT: UUID. CompanyID is optional and of type GDT: OrganisationalCentreID. SystemAdministrativeData is optional and of type GDT: SystemAdministrativeData. PaymentFormCode is optional and of type GDT: PaymentFormCode. PaymentProcedureCode is optional and of type GDT: PaymentProcedureCode. TransferTransactionCurrencyAmount is optional and of type GDT: Amount and has a qualifier TransactionCurrency. TransferExecutionDate is optional and is of type GDT: Date and has a qualifier Execution. Status is optional and is of type IDT: CashTransferStatus.

QuerybyStatus provides a list of all CashTransfers which match by a given status and that can be further restricted by identifying attributes. Most typical status is ‘Finished’ or ‘Released’. The list can be narrowed down further by providing optional parameters like CompanyID and system administrative data. The query elements are defined by the data type: CashTransferStatusQueryElements. These elements are: Status, ID, CompanyID, and SystemAdministrativeDataStatus is optional and is of type GDT: CashTransferStatus and a CashTransfer status explains the different stages of processing the CashTransfer. To get the list of all complete or released CashTransfer, pass ‘Finished’ or ‘Released’ to the status respectively. ID is optional and is of type GDT: BusinessTransactionDocumentID. CompanyID is optional and is of type GDT: OrganisationalCenterID. SystemAdministrativeData is optional and is of type GDT: SystemAdministrativeData.

QueryByCashStorageToHouseBankAccountTransfer provides a list of all Cash Transfers which match by provided one Cash Storage and a House Bank; where cash transfer taken place from given cash storage to House bank Account. The query elements are defined by the data type: CashStorageToHouseBankAccountTransferQueryElements. These elements are optional and include: CashStorageMovementSendingCashStorageID, HouseBankMovementReceivingHouseBankAccountInternalID, CompanyID, SystemAdministrativeData, CashStorageMovementDebitValueDate, HouseBankMovementCreditValueDate, CashPaymentStatus, PaymentAdviceStatus. CashStorageMovementSendingCashStorageID matches the element CashStorageID for at least one CashStorageMovement and is a CashStorage from which a CashTransfer is taken place and is of type GDT: CashStorageID. HouseBankMovementReceivingHouseBankAccountInternalID is a. Housebank Account to which a CashTransfer is taken place, and matches the element HouseBankAccountInternalID for at least one HouseBankMovement and is of type GDT: HouseBankAccountInternalID. CompanyID is of type GDT: OrganisationalCenterID. SystemAdministrativeData is of type GDT: SystemAdministrativeData. CashStorageMovementDebitValueDate matches the element ValueDate for at least one CashStorageMovement and is of type GDT: Date, Qualifier Value. HouseBankMovementCreditValueDate matches the element ValueDate for at least one HouseBankMovement and is of type GDT: Date, Qualifier Value. CashPaymentStatus is of type IDT: PaymentAdviceLifecycleStatus. PaymentAdviceStatus is of type IDT PaymentAdviceLifecycleStatus.

QueryByHouseBankAccountToCashStorageTransfer provides a list of all Cash Transfers which match by provided one House bank account and a CashStorage where cash transfer is taken place from House bank account to cash storage. The query elements are defined by the data type: HouseBankAccountToCashStorageTransferQueryElements. These elements are optional and include: HouseBankMovementSendingHouseBankAccountInternalID, CashStorageMovementReceivingCashStorageID, CompanyID, SystemAdministrativeData, HouseBankMovementDebitValueDate, CashStorageMovementCreditValueDate, PaymentOrderStatus, CashPaymentStatus. HouseBankMovementSendingHouseBankAccountInternalID matches the element HouseBankAccountInternalID for at least one HouseBankMovement and is of type GDT: HouseBankAccountInternalID and is a House bank account from which a Cash transfer is taken place. CashStorageMovementReceivingCashStorageID is a Cash storage to which a Cash transfer is taken place and is of type GDT: CashStorageID. CashStorageMovementReceivingCashStorageID matches the element CashStorageID for at least one CashStorageMovement. CompanyID is of type GDT: OrganisationalCenterID. SystemAdministrativeData is of type GDT: SystemAdministrativeData. HouseBankMovementDebitValueDate matches the element ValueDate for at least one HouseBankMovement and is of type is of type GDT: Date, Qualifier Value. CashStorageMovementCreditValueDate matches the element ValueDate for at least one CashStorageMovement and is of type GDT: Date, Qualifier Value. PaymentOrderStatus is of type GDT: POStatus. CashPaymentStatus is of type IDT: PaymentAdviceLifecycleStatus.

QueryByHouseBankAccount provides a list of all CashTransfers which match by provided two House bank accounts; where cash transfer took place between them. The query elements are defined by the data type: HouseBankAccountTransferQueryElements. These elements are optional and include: HouseBankMovementSendingHouseBankAccountInternalID, HouseBankMovementReceivingHouseBankAccountInternalID, CompanyID, SystemAdministrativeData, HouseBankMovementDebitValueDate, HouseBankMovementCreditValueDate, PaymentOrderStatus, PaymentAdviceStatus. HouseBankMovementSendingHouseBankAccountInternalID matches the element HouseBankAccountInternalID for at least one HouseBankMovement and is of type GDT: HouseBankAccountInternalID. CompanyID is of type GDT: OrganisationalCenterID. SystemAdministrativeData is of type GDT: SystemAdministrativeData. HouseBankMovementDebitValueDate matches the element ValueDate for at least one HouseBankMovement and is of type GDT: Date, Qualifier Value. HouseBankMovementCreditValueDate matches the element ValueDate for at least one HouseBankMovement and is of type GDT: Date, Qualifier Value. PaymentOrderStatus is of type GDT: POStatus. PaymentAdviceStatus is of type IDT: PaymentAdviceLifecycleStatus. The FromHouseBankAccountID and ToHouseBankAccountID and DebitValueDate, CreditValueDate are determined using the value of PropertyMovementDirectionCode in the respective nodes.

QueryByCashStorage provides a list of all CashTransfers which match by provided two Cash Storages; where cash transfer took place between them. The query elements are defined by the data type: CashStorageTransferQueryElements. These elements are optional and include: CashStorageMovementSendingCashStorageID, CashStorageMovementReceivingCashStorageID, CompanyID, SystemAdministrativeData, CashStorageMovementDebitValueDate, CashStorageMovementCreditValueDate, CashPaymentStatusFrom, CashPaymentStatusTo. CashStorageMovementSendingCashStorageID matches the element CashStorageID for at least one CashStorageMovement and can be of type GDT: CashStorageID. CashStorageMovementReceivingCashStorageID matches the element CashStorageID for at least one CashStorageMovement and can be of type GDT: CashStorageID. CompanyID can be of type GDT: OrganisationalCenterID. SystemAdministrativeData can be of type GDT: SystemAdministrativeData. CashStorageMovementDebitValueDate matches the element ValueDate for at least one CashStorageMovement and can be of type GDT: Date, Qualifier Value. CashStorageMovementCreditValueDate matches the element ValueDate for at least one CashStorageMovement and can be of type GDT: Date, Qualifier Value. CashPaymentStatusFrom can be of type IDT: PaymentAdviceLifecycleStatus. CashPaymentStatusTo can be of type IDT: PaymentAdviceLifecycleStatus.

The FromCashStorageId and ToCashStorageID and DebitValueDate, CreditValueDate can be determined using the value of PropertyMovementDirectionCode in the respective nodes.

HouseBankMovement is movement of cash from or to a HouseBankAccount. The elements located directly at the node HouseBankMovement are defined by the type GDT: HouseBankMovementElements. These elements are: UUID, HouseBankAccountUUID, HouseBankAccountInternalID, PaymentOrderUUID, PaymentAdviceUUID, PropertyMovementDirectionCode, FirstPaymentInstruction, SecondPaymentInstruction, ThirdPaymentInstruction, FourthPaymentInstruction, ValueDate, Status. UUID is an universal identifier, which can be unique of the House Bank Movement. UUID may be based on GDT UUID. HouseBankAccountUUID is an universal identifier, which may be unique, of the HouseBankAccount in which CashTransfer takes place. HouseBankAccountUUID may be based on GDT UUID. HouseBankAccountInternalID is an internal identifier of the HouseBankAccount. HouseBankAccountInternalID may be represented by GDT BankAccountInternalID. PaymentOrderUUID is an universal identifier, which may be unique, of the PaymentOrder that is newly created by CashTransfer, and is optional. PaymentOrderUUID may be based on GDT UUID. PaymentAdviceUUID is an universal identifier, which may be unique, of the PaymentAdvice that is newly created by CashTransfer. PaymentAdviceUUID may be based on GDT UUID. PropertyMovementDirectionCode is a Coded representation of the direction of movement of cash. PropertyMovementDirectionCode may be based on GDT PropertyMovementDirectionCode. FirstPaymentInstruction is an instruction on how a transfer should be made and which additional activities should be carried out for a cash transfer, and is optional. FirstPaymentInstruction may be based on GDT PaymentInstruction. SecondPaymentInstruction is a second additional instruction, and is optional. SecondPaymentInstruction may be based on GDT PaymentInstruction. ThirdPaymentInstruction is a third additional instruction, and is optional. ThirdPaymentInstruction may be based on GDT (GDT: PaymentInstruction). FourthPaymentInstruction is a fourth additional instruction, and is optional. FourthPaymentInstruction may be based on GDT: (GDT: PaymentInstruction). ValueDate is the value date of the transfer amount on the House Bank account, and is optional. ValueDate may be based on GDT Date, Qualifier Value. Status is the status of House Bank Account Movement. Status may be based on GDT CashTransferHouseBankAccountMovementStatus.

The business object HouseBankAccount/node HouseBankAccount includes inbound association relationships. HouseBankAccount has a cardinality relationship of 1:cn and specifies the HouseBankAccount which is affected by the cash movement.

InitiatePayment initiates a payment from or to a HouseBankAccount. Preconditions can include: HouseBankMovementExecutionStatus should be in 'NotStarted' status. Changes to the status can include HouseBankMovementExecutionStatus is changed to 'Advised' or 'Ordered'. This action can be called by the BO itself.

ConfirmPayment confirms a Payment from or to a HouseBankAccount. Preconditions can include: HouseBankMovementExecutionStatus should be in 'Adviced' or in 'Ordered' status. Changes to the status can include: HouseBankMovementExecutionStatus is changed to confirmed and CashTransferExecutionstatus is changed to confirmed if both nodes are confirmed. This action can be called by the BO itself.

CancelPaymentConfirmation cancels the confirmation of a payment from or to a HouseBankAccount. Preconditions can include: HouseBankMovementExecutionStatus should be in "Confirmed' status. Changes to the status can include: HouseBankMovementExecutionStatus is changed to 'Adviced' or 'Ordered' from 'Confirmed' status and it is propagated to the root node. This action can be called from PaymentAdvice or Payment Order BO.

QueryByElements provides a list of all CashTransfers which match by different attributes. The query elements are defined by the data type: CashTransferHouseBankMovementQueryElements. These elements are optional and include: UUID of type GDT: UUID, HouseBankAccountUUID of type GDT: UUID, HouseBankAccountInternalID of type GDT: BankAccountInternalID, PaymentOrderUUID of type GDT: UUID, PaymentAdviceUUID of type GDT: UUID, PropertyMovementDirectionCode of type GDT: PropertyMovementDirectionCode, FirstPaymentInstruction of type GDT: PaymentInstruction, SecondPaymentInstruction of type GDT: PaymentInstruction, ThirdPaymentInstruction of type GDT: PaymentInstruction, FourthPaymentInstruction of type GDT: PaymentInstruction and is optional, ValueDate is optional and of type GDT: Date, Qualifier Value, Status is optional and of type IDT CashTransferHouseBankAccountMovementStatus.

CashStorageMovement is the movement of cash from or to a CashStorage. The elements located directly at the node CashStorageMovement are defined by the type GDT: CashStorageMovementElements. These elements are: UUID, CashStorageUUID, CashStorageID, CashPaymentUUID, PropertyMovementDirectionCode, ValueDate, Status. UUID is an universal identifier, which may be unique, of the Cash Storage Movement. UUID may be based on GDT UUID. CashStorageUUID is an universal identifier, which may be unique, of the CashStorage. CashStorageUUID may be based on GDT UUID. CashStorageID is an identifier, which may be unique, for CashStorage from/to cash is transferred. CashStorageID may be based on GDT CashStorageID. CashPaymentUUID is an universal identifier, which may be unique, of the CashPayment which was created by newly created CashTransfer. CashPaymentUUID may be based on GDT UUID. PropertyMovementDirectionCode is a coded representation of the direction of movement of cash. PropertyMovementDirectionCode may be represented by GDT PropertyMovementDirectionCode. ValueDate is the value Date of transfer amount on the Cash Storage, and is optional. ValueDate may be based on GDT Date, Qualifier Value. Status is the status of Cash Storage Movement. Status may be based on GDT CashTransferCashStorageMovementStatus.

From the business object CashStorage/node CashStorage: CashStorage has a cardinality relationship of 1:cn and specifies the CashStorage which is affected by the cash movement.

InitiatePayment initiates a payment from or to a Cash storage. Preconditions can include: CashPaymentExecutionStatus should be in 'NotStarted' status. Changes to the status can include: CashPaymentExecution Status is changed to 'Advised'. In some implementations this action is called by the BO itself.

ConfirmPayment confirms a Payment from or to a Cash storage. Preconditions can include: CashPaymentExecutionStatus should be in 'Advised' status. Changes to the status can include: CashPaymentExecution Status is changed to 'Confirmed' and CashTransferExecutionstatus is changed to 'Confirmed' if both nodes are confirmed. In some implementations this action is called only by the BO itself.

QueryByElements provides a list of all CashTransfers which match by different attributes. The query elements are defined by the data type: CashTransferCashStorageMovementQueryElements. These elements are optional and include: UUID of type GDT: UUID, CashStorageUUID of type GDT: UUID, CashStorageID of type GDT: CashStorageID, CashPaymentUUID of type GDT: UUID, PropertyMovementDirectionCode of type GDT: PropertyMovementDirectionCode, ValueDate of type GDT: Date, Qualifier Value, and Status of type IDT: CashTransferCashStorageMovementStatus.

In Cash Transfer a payment explanation specifies the reason/reasons for a cash transfer. Payment Explanation is an Explanation of payment in structured form by referencing preceding documents in the process or in the form of a user-defined text as a note to payee. In the structured part, the Payment Explanation contains the payment amounts for each business document and an explanation for the difference between the expected and the actual payment amount. The AccessControlList is a list of access groups that have access to a CashTransfer during a validity period.

Business Object ChequeStorage

FIG. 213 illustrates one example of a ChequeStorage business object model 213008. Specifically, this model depicts interactions among various hierarchical components of the ChequeStorage, as well as external components that interact with the ChequeStorage (shown here as 213000 through 213006 and 213010 through 213032). The ChequeStorage can be a location where Incoming Checks are stored. For example, the business object ChequeStorage can be part of the process component Payment Processing. In some implementations, the ChequeStorage can include the permitted limit for the total amounts and the physical storage location (e.g., an address) of incoming checks. For example, the ChequeStorage can be represented by the node ChequeStorage 213026.

The ChequeStorage can be a location where Incoming Checks are stored and contains entries on validity, limits, and currency. For example, the elements located at the node ChequeStorage can be defined by the GDT of type ChequeStorageElements. In certain implementations, the elements can include UUID, InternalID, OperatingPartyID, AddressID, CompanyUUID, CompanyID, HouseBankUUID, HouseBankInternalID, DepositHouseBankAccountUUID, DepositHouseBankAccountInternalID, CashLiquidityFunctionalUnitUUID, PaymentManagementFunctionalUnitUUID, SystemAdministrativeData, ResponsibleEmployeeUUID, ResponsibleEmployeeID, LocationTypeCode, MaximumBalanceAmount, CurrencyCode, BlockedIndicator, ValidityPeriod, LastDayEndClosingCreationIdentityUUID, LastDayEndClosingExecutionDateTime, LastDayEndClosingDeviationIndicator, LastDayEndClosingExplanationText, LastDayEndClosingSystemBalanceAmount, and Status.

In some implementations, the UUID can be a universal identifier, which may be unique of a ChequeStorage. UUID may be based on a GDT of type UUID. InternalID is an internal identifier of the ChequeStorage. The InternalID may be based on a GDT of type ChequeStorageInternalID. In some implementations, the OperatingPartyID can be an identifier, which may be unique for the ChequeStorage (for example, a lockbox account) and can be managed externally assigned by a provider (e.g., HouseBankID). In some example, ChequeStorageOperatingPartyID is filled if it is an external ChequeStorage (e.g., can be recognized by ChequeStorageLocationTypeCode). In some implementations, the OperatingPartyID may be based on a GDT of type ChequeStoragePartyID. In some implementations, the AddressID can be an identifier of an unique address. The AddressID may be based on a GDT of type AddressID. In some implementations, the CompanyUUID can be a universal identifier, which may be unique, of the company to which the ChequeStorage belongs. The CompanyUUID may be based on a GDT of type UUID. In some implementations, the CompanyID is an internal identification of the company to which the ChequeStorage belongs. The CompanyID may be based on a GDT of type OrganisationalCentreID.

In some implementations, the HouseBankUUID is a universal identifier, which may be unique, of a house bank that manages the ChequeStorage as a lockbox provider. For example, HouseBankUUID can be filled if it is an external ChequeStorage (e.g., can be recognized by ChequeStorageTypeCode). The HouseBankUUID may be based on a GDT of type UUID. In some implementations, the HouseBankInternalID is an internalID of a house bank that manages the ChequeStorage as a lockbox provider, and is optional. For example, HouseBankInternalID is filled if it is an external ChequeStorage (e.g., that can be recognized by ChequeStorageTypeCode). The HouseBankInternalID may be based on a GDT of type BusinessPartnerInternalID. In some implementations, the DepositHouseBankAccountUUID is a default house bank account in which checks of this ChequeStorage are deposited, and is optional. For example, if it is an external ChequeStorage (e.g., that can be recognized by ChequeStorageLocationTypeCode), the DepositHouseBankAccount can be specified. The DepositHouseBankAccountUUID may be based on a GDT of type UUID. The DepositHouseBankAccountInternalID can be a default house bank account ID in which checks of this ChequeStorage are deposited, and is optional. For example, if it can be an external ChequeStorage (e.g., that can be recognized by ChequeStorageLocationTypeCode), the DepositHouseBankAccount can be specified. In some implementations, the DepositHouseBankAccountInternalID may be based on a GDT of type BankAccountInternalID. In some implementations, the CashLiquidityFunctionalUnitUUID is a universal identifier, which can be unique, of the FunctionalUnit working on the ChequeStorage, and is optional. Integrity: The FunctionalUnit can be referenced to execute the organizational function Cash/Liquidity Management (e.g., the element OrganisationalFunctionCode) in one of the instances of the node FunctionalUnitAttributes in the FunctionalUnit references can have the value "17" for Cash/Liquidity Management. The CashLiquidityFunctionalUnitUUID may be based on a GDT of type UUID. PaymentManagementFunctionalUnitUUID is a universal identifier, which may be unique, of the FunctionalUnit working on the ChequeStorage, and is optional. Integrity: The FunctionalUnit referenced has to be able to execute the organizational function Payment Management, i.e. the element OrganisationalFunctionCode in one of the instances of the node FunctionalUnitAttributes in the FunctionalUnit references can have the value "22" for Payment Management. In some implementations, the PaymentManagementFunctionalUnitUUID may be based on a GDT of type UUID. SystemAdministrativeData is an administrative data that is stored in a system. This data can include system users and change dates/times. For example, the SystemAdministrativeData may be based on a GDT of type SystemAdministrativeData. In some implementations, the ResponsibleEmployeeUUID is a universal identifier which may be unique, of the employee responsible for the cheque storage, and is optional.

In some implementations, the ResponsibleEmployeeUUID may be based on a GDT of type UUID. The ResponsibleEmployeeID can be an identifier of the employee responsible for the cheque storage, and is optional. ResponsibleEmployeeID may be based on a GDT of type EmployeeID. In some implementations, the LocationTypeCode is a coded representation of the type of ChequeStorage. The LocationTypeCode maybe based on a GDT of type ChequeStorageLocationTypeCode. MaximumBalanceAmount is the maximum amount that the total of checks in this ChequeStorage (e.g., balance of the ChequeStorage) in the CashLocationCurrency should not exceed, and is optional. The MaximumBalanceAmount may be based on a GDT of type Amount (e.g., with a Qualifier: Balance). In some implementations, the CurrencyCode is the currency in which the ChequeStorage is managed, and can be optional. For example, the CurrencyCode may be based on a GDT of type CurrencyCode. In some implementations, the BlockedIndicator indicates if a cheque storage is blocked or can be used, and is optional. The BlockedIndicator may be based on a GDT of type Indicator (e.g., with a Qualifier Blocked). In some implementations, the ValidityPeriod determines the validity of the ChequeStorage. The ValidityPeriod may be based on a GDT of type DatePeriod, but the duration is not filled. In some implementations, the LastDayEndClosingCreationIdentityUUID can be a universal identifier, which may be unique, of the user, who made the last day-end closing. For example, LastDayEndClosingCreationIdentityUUID may be based on GDT UUID. In some implementations, the LastDayEndClosingExecutionDateTime can be the date and time, at which the last day-end closing was made to Financial Accounting. LastDayEndClosingExecutionDateTime may be based on GDT _GLOBAL_DateTime (e.g., with a Qualifier: Execution). In some implementations, the LastDayEndClosingDeviationIndicator can indicate whether with the day-end closing differences arose, and is optional. For example, the LastDayEndClosingDeviationIndicator may be based on a GDT of type Indicator (e.g., with a Qualifier Deviation). In some implementations, the LastDayEndClosingExplanationText can be text, which can be used, in order to explain differences with the day-end closing, and is optional. The LastDayEndClosingExplanationText may be based on GDT Text.

In some implementations, the LastDayEndClosingSystemBalanceAmount can be the balance of the ChequeStorage which was determined from the system at the time of the day-end closing. For example, the LastDayEndClosingSystemBalanceAmount may be based on a GDT of type Amount (e.g., with a Qualifier Balance). In some implementations, the LastDayEndClosingCountedBalanceAmount is the balance, which can be determined when counting the physical cheque's supply for the time of the day-end closing. The LastDayEndClosingCountedBalanceAmount may be based on a GDT of type Amount (e.g., Qualifier Balance). In some implementations, the Status can include status information about the life cycle and approval of the ChequeStorage. The Status may be based on a GDT of type CashLocationStatus. CashLocationLifecycleStatusCode may be based on a GDT of type CashLocationLifecycleStatusCode, can have values such as 'InPreparation', 'InRevision', 'Active' and 'Closed'. In some implementations, ApprovalStatusCode may be based on a GDT of type ApprovalStatusCode, can have the values 'NotStarted', 'InApproval', 'ApprovalNotNecessary', 'Approved' and 'Rejected'. ConsistencyStatusCode may be based on a GDT of type ConsistencyStatusCode, can have the values 'Inconsistent' and 'Consistent'.

The ChequeStorage can have composition relationships to subordinate nodes. In one example, the ChequeStorage can be related to a DO Address 213028 with a cardinality relationship of 1:c. In one example, the ChequeStorage can be related to a Description 213030 with a cardinality of 1:cn. In one example, the ChequeStorage can be related to a DO: AccessControlList 213032 with a cardinality of 1:1.

There are a number of inbound aggregation relationships including:

(1) from business object (or node) Company. For example, the ChequeStorage can be related to a Company with a cardinality of 1:cn. For example, the ChequeStorage can belong to one company.

(2) from business object (or node) HouseBank. For example, the ChequeStorage can be related to HouseBank with cardinality of c:cn. For example, the ChequeStorage can be managed at a house bank. (3) from business object (or node) HouseBankAccount. For example, the ChequeStorage can be related to DepositHouseBankAccount with cardinality of c:cn.

(4) From business object (or node) Identity. For example, the ChequeStorage can be related to CreationIdentity with cardinality of 1:cn. For example, the Identity can create the cheque storage. In another example, the ChequeStorage can be related to LastChangeIdentity with cardinality of c:cn.

There are a number of inbound association relationships including:

(1) From Business object (node) Employee. For example, the ChequeStorage can be related to Employee with a cardinality relationship of c:cn. For example, the Cheque Storage can have a responsible person coworker.

(2) From business object Identity/node Identity. For example, the ChequeStorage can be related to Identity with a cardinality relationship of c:cn. For example, the Identity can be the identity of the user who made the last day-end closing.

(3) From the business object (or node) FunctionalUnit. For example, the ChequeStorage can be related to CashLiquidityFunctionalUnit with a cardinality relationship of c:cn. For example, the CashLiquidityFunctionalUnit can identify the Functional Unit which is working on the ChequeStorage. In another example, the ChequeStorage can be related to PaymentManagementFunctionalUnit with a cardinality of c:cn. For example, the PaymentManagementFunctionalUnit can identify the Functional Unit which is working on the ChequeStorage.

In some implementations, if a ChequeStorage is managed externally at a house bank, then the address of the house bank is used. In this case, ChequeStorageTypeCode can be set accordingly and the ChequeStorageID can be filled. In some examples, the DepositHouseBankAccount is used to specify the default deposit account. The currency of the MaximumBalanceAmount can be the currency of the CurrencyCode.

The ChequeStorage can include enterprise service infrastructure actions. In some implementations, the ChequeStorage can include Check (S&AM Action). For example, the Check action can check consistency and correctness of the CashLocation, when a new CashLocation is created or when the data of an existing is modified. For example, the CashLocation was created or the data of an existing CashLocation was changed. The action can also indicate whether the object is consistent and correct, and whether it can be activated so that the CashLocation can be used in business processes. The status of the object is consistent if the check was successful. For example, the action can be carried out by the system.

In some implementations, the ChequeStorage can include Activate (S&AM action). For example, the action can activate the CashLocation or pending changes of the CashLocation in revision. For example, the CashLocation can be ready for general use within business transactions. In some implementations, the action can be performed if the status of a CashLocation is consistent and correct. In addition, approval has been given according to the dual control principle or no approval was required. Using the action, the SystemAdministrativeData can be updated. In some examples, the action can also change the CashLocation to active. In some implementations, the action can be carried out by the system.

In some implementations, the ChequeStorage can include Close (S&AM action). For example, the action can end the permission to use a CashLocation in business processes. For example, the cannot be confused with the day-end closing. In some examples, the action can be performed if a CashLocation has been released for use in business processes. In addition, the balance can be zero. Using the action, the SystemAdministrativeData is updated. The action can also change the CashLocation is excluded from use in business processes. In some implementations, the action can be performed from a user interface. This is used by a user who wants to close a CashLocation.

In some implementations, the ChequeStorage can include a Submit For Activation (S&AM action). For example, the action can check the approval relevance and starts either the approval process or activates the cash location if no approval is required. For example, the action leads either to the status value "Approval Not Necessary" and starts the action "Activate" or it leads to the status value "In Approval". The action can be performed if the consistency and correctness of a new or changed CashLocation can be verified. Using the action, the SystemAdministrativeData is updated. In some implementations, if no approval process is required, the CashLocation can be activated immediately; otherwise, approval can be given or refused first. In some examples, the action is performed from a UI. When the consistency and correctness of a new or changed CashLocation has been verified, the user wants to start the activation process.

In some implementations, the ChequeStorage can include an Approve (S&AM action). For example, the action can change or the creation of a Cash Location is approved and the Cash Location is activated. In some examples, the action can be performed if it was determined that an approval process was required after a new CashLocation was created or an existing one changed correctly and consistently. Using the action, the SystemAdministrativeData is updated. For example, the data of the CashLocation can be approved and the object is released for use in business processes. In some implementations, the action can be performed from a user interface. For example, the action can be used by a user who can approve the creation or change of data by another user.

In some implementations, the ChequeStorage can include a Reject (S&AM action). For example, the action can be performed to reject a change or creation of a Cash Location. For example, the action can be performed if it was determined that an approval process was required after a new CashLocation was created or an existing one changed correctly and consistently. Using the action, the SystemAdministrativeData can be updated. In some implementations, the creation or change of data can be rejected. The action can change the data to check again whether approval is required. Where relevant, approval may then be given. In some examples, the action can be performed from a UI. This can be used by a user who rejects the creation or change of data by another user.

In some implementations, the ChequeStorage can include a PerformDayEndClosing action. For example, the action can perform a day-end closing (e.g., filling the Day-end closing parameters). In some implementations, the action can be performed if the CashLocation can be blocked and cannot be used in business processes until the block is removed. In some implementations, the actual amount of the cash/cheque storage is compared with the current balance of the Cash or ChequeStorages in the system. For example, if there is a difference between them, the actual amount entered by the user and the system balance are stored. The user can enter a reason for the difference. The information can be stored for the last day-end closing for the Cash or ChequeStorage. In some examples, the relevant CashPayments can be checked individually to determine the reason for the difference. In some examples, when a difference exists, the block can be removed by the system. For example, the block can be removed when the cash payment balance has been corrected in the system. In some implementations, the action is performed from a UI. This is used by a user who wants to perform a day-end closing.

In some implementations, the ChequeStorage can include a BlockUnblock action. For example, the action can set a block or resets the already available block. In some examples, the action can be performed if the CashLocation is unblocked or has been blocked. For example, a Cash Storage was blocked in the course of a day-end closing. For example, a difference can be detected between the actual balance and the balance in the system. In some examples, the action can remove or set the block. In certain implementations, if there is no block and the action is executed, then the block is set, and contrariwise. In some implementations, the action elements can be defined by the data type ChequeStorageBlockUnblockActionElements. The elements can include BusinessProcessVariantTypeCode. For example, if a difference occurred, the CashPayment can remove the block of a CashStorage. In some examples, the action can be carried out by the system or can be performed from a UI.

In some implementations, the ChequeStorage can include QueryByElements that can provide a list of ChequeStorage that are assigned to a company. For example, the query elements can be defined by the data type ChequeStorageElementsQueryElements. The elements can include UUID, InternalID, OperatingPartyID, CompanyUUID, CompanyID, HouseBankUUID, HouseBankInternalID, DepositHouseBankAccountUUID, DepositHouseBankAccountInternalID, SystemAdministrativeData, ResponsibleEmployeeUUID, ResponsibleEmployeeID, LocationTypeCode, MaximumBalanceAmount, CurrencyCode, BlockedIndicator, ValidityPeriod, LastDayEndClosingCreationIdentityUUID, LastDayEndClosingExecutionDateTime, LastDayEndClosingDeviationIndicator, LastDayEndClosingExplanationText, LastDayEndClosingSystemBalanceAmount, LastDayEndClosingCountedBalanceAmount, Status, CashLocationLifecycleStatusCode, ApprovalStatusCode, ConsistencyStatusCode, Address ID, and Description.

In some implementations, the UUID can be optional and can be a GDT of type UUID. In some implementations, the InternalID can be optional and can be a GDT of type ChequeStorageInternalID. In some implementations, the OperatingPartyID can be optional and can be a GDT of type ChequeStoragePartyID. In some implementations, the CompanyUUID can be optional and can be a GDT of type UUID. In some implementations, the CompanyID can be optional and can be a GDT of type OrganisationalCentreID. In some implementations, the HouseBankUUID can be optional and can be a GDT of type UUID. In some implementations, the HouseBankInternalID can be optional and can be a GDT of type BusinessPartnerInternalID. In some implementations, the DepositHouseBankAccountUUID can be optional and can be a GDT of type UUID. In some implementations, the DepositHouseBankAccountInternalID can be optional and can be a GDT of type BankAccountInternalID. In some implementations, the SystemAdministrativeData can be optional and can be a GDT of type SystemAdministrativeData. In some implementations, the ResponsibleEmployeeUUID can be optional and can be a GDT of type UUID. In some implementations, the ResponsibleEmployeeID can be optional and can be a GDT of type EmployeeID. In some implementations, the LocationTypeCode can be optional and can be a GDT of type ChequeStorageLocationTypeCode. In some implementations, the MaximumBalanceAmount can be optional and can be a GDT of type Amount, Qualifier: Balance. In some implementations, the CurrencyCode can be optional and can be a GDT of type CurrencyCode (e.g., with a Qualifier: CashLocationCurrencyCode) In some implementations, the BlockedIndicator can be optional and can be a GDT of type Indicator, Qualifier Blocked. In some implementations, the ValidityPeriod can be optional and can be a GDT of type DatePeriod but the duration is not filled. In some implementations, the LastDayEndClosingCreationIdentityUUID can be optional and can be a GDT of type UUID. In some implementations, the LastDayEndClosingExecutionDateTime can be optional and can be a GDT of type _GLOBAL_DateTime (e.g., with a Qualifier Execution). In some implementations, the LastDayEndClosingDeviationIndicator can be optional and can be a GDT of type Indicator (e.g., Qualifier Deviation). In some implementations, the LastDayEndClosingExplanationText can be optional and can be a GDT of type Text. In some implementations, the LastDayEndClosingSystemBalanceAmount can be optional and can be a GDT of type Amount, Qualifier Balance. In some implementations, the LastDayEndClosingCountedBalanceAmount can be optional and can be a GDT of type Amount (e.g., Qualifier Balance). In some implementations, the Status can be optional and can be an IDT of type CashLocationStatus. In some implementations, the CashLocationLifecycleStatusCode and can be a GDT of type CashLocationLifecycleStatusCode, and can include the value "InPreparation", "InRevision", "Active" and "Closed". In some implementations, the ApprovalStatusCode can be a GDT of type ApprovalStatusCode. The can ApprovalStatusCode have the values "NotStarted", "InApproval", "ApprovalNotNecessary", "Approved" and "Rejected". In some implementations, the ConsistencyStatusCode can be a GDT of type ConsistencyStatusCode, can have the values "Inconsistent" and "Consistent"). In some implementations, the Address ID can be optional and can be a GDT of type AddressID. In some implementations, the Description can be optional and can be a GDT of type Description.

In some implementations, the ChequeStorage can include QuerybyCompanyAndTypeCodeActive. For example, the QuerybyCompanyAndTypeCodeActive can provide a list of ChequeStorage of a company that can be of the specified type and are active at the time of the cusing the ValidityPeriod. For example the query can be used, for example, when entering incoming checks to select a valid ChequeStorage. The query elements can be defined by the data type ChequeStorageCompanyandTypeCodeInternalActiveQueryElements:
These elements can include CompanyUUID, which can be optional and can be a GDT of type UUID, and LocationTypeCode, which can be optional and can be a GDT of type ChequeStorageLocationTypeCode.

In some implementations, the ChequeStorage can include QuerybyIDAndCompanyAndHouseBank. For example, the QuerybyIDAndCompanyAndHouseBank can provide a list of ChequeStorage that can have a specific ID, belonging to a specific company, or managed by a specific HouseBank. For example, the QuerybyIDAndCompanyAndHouseBank can be optionally used in one company to which a ChequeStorage is assigned. In some examples, the UUID of a ChequeStorage can also be selected. In some examples, the query elements can be defined by the data type ChequeStorageIDAndCompanyAndHouseBankQueryElements. The elements can include the UUID, InternalID, CompanyUUID, HouseBankUUID, CompanyID, and HouseBankID.

In some implementations, the UUID can be optional and can be a GDT of type UUID. In some implementations, the InternalID can be optional and can be a GDT of type ChequeStorageInternalID. In some implementations, the CompanyUUID can be optional and can be a GDT of type UUID. In some implementations, the CompanyID can be optional and can be a GDT of type OrganizationalCenterID. In some implementations, the HouseBankUUID can be optional and can be a GDT of type UUID. In some implementations, the HouseBankID can be optional and can be a GDT of type BusinessPartnerInternalID.

In some implementations, the ChequeStorage can include QueryByStatus. For example, the QueryByStatus can provide a list of ChequeStorage that have a specific status. The query elements can be defined by the data type ChequeStorageStatusQueryElements. The elements can be Status, which can be optional and can be an IDT of type CashLocationStatus. The elements can be CashLocationLifecycleStatusCode, which can be a GDT of type CashLocationLifecycleStatusCode and can have the values 'InPreparation', 'InRevision', 'Active' and 'Closed'. The elements can be ApprovalStatusCode, which can be a GDT of type ApprovalStatusCode (e.g., the ApprovalStatusCode can have the values 'NotStarted', 'InApproval', 'ApprovalNotNecessary', 'Approved', and 'Rejected'). The elements can be ConsistencyStatusCode, which can be a GDT of type ConsistencyStatusCode, and can have the values 'Inconsistent' and 'Consistent'.

In some examples, Description can be a language dependent description of the cheque Storage. The elements located directly at the node Description can be defined by the data type ChequeStorageDescriptionElements. These elements can include Description, which can be the description of ChequeStorage, and can be optional. In some implementations, the Description may be based on GDT of type _SHORT_Description.

DO Address determines the physical location of a ChequeStorage. For example, the address can be a dependent object and is described separately in the appropriate document. DO AccessControlList can be a list of access groups that have access to a ChequeStorage during a validity period.

CompanyPaymentFileRegister Business Object

FIG. 214 illustrates one example of a CompanyPaymentFileRegister business object model 214004. Specifically, this model depicts interactions among various hierarchical components of the CompanyPaymentFileRegister, as well as external components that interact with the CompanyPaymentFileRegister (shown here as 214000 through 214002 and 214006 through 214026). CompanyPaymentFileRegister is a company's directory for payment files that are exchanged with house banks. A CompanyPaymentFileRegister can be files a Payment orders to a house bank (e.g., bank transfers, direct debits, or checks), information about movements at house bank accounts (e.g., bank statements, credit memos, or debit memos), or Information about incoming checks (e.g., using a lockbox procedure). The CompanyPaymentFileRegister business object can be part of the PaymentProcessing process component.

In some implementations, the CompanyPaymentFileRegister business object can include administrative data of the register, administrative data and the processing status of incoming and outgoing files, and references to the storage location of the respective files (e.g., Attachment Folder dependent object 214024, 214026). In some examples, CompanyPaymentFileRegister can be represented by the CompanyPaymentFileRegister node 214016.

A CompanyPaymentFileRegister is a company's directory for payment files that are exchanged with house banks. The elements located at the CompanyPaymentFileRegister node can be defined by the CompanyPaymentFileRegisterElements data type. In some implementations, the elements can be: CompanyUUID, CompanyID, and CashLiquidityFunctionalUnitUUID.

The CompanyUUID can be a universal identifier, which can be unique, of a company to which the CompanyPaymentFileRegister belongs. In some implementations, the CompanyUUID may be based on a GDT of type UUID. The CompanyID can be an internal identifier of the company to which the CompanyPaymentFileRegister belongs. In some implementations, the CompanyID may be based on a GDT of type OrganisationalCentreID. The CashLiquidityFunctionalUnitUUID can be a universal identifier, which may be unique, of the FunctionalUnit working on the CompanyPaymentFileRegister. In some examples, the CashLiquidityFunctionalUnitUUID can be optional. In some examples, the FunctionalUnit referenced can execute the organizational function Cash/Liquidity Management (e.g., the element OrganisationalFunctionCode in one of the instances of the node FunctionalUnitAttributes in the FunctionalUnit references can have the value "17" for Cash/Liquidity Management). The CashLiquidityFunctionalUnitUUID may be based on a GDT of type UUID.

In some implementations, the CompanyPaymentFileRegister can have a cardinality relationship with an IncomingFile 214018 of 1:cn, a cardinality relationship with an OutgoingFile 214020 of 1:cn, and a cardinality relationship with a AccessControlList data object 214022 of 1:1. In some implementations, the CompanyPaymentFileRegister can have an inbound aggregation relationship with a Company business object of 1:cn. In some implementations, the CompanyPaymentFileRegister can have a Inbound Association Relationships with a CashLiquidityFunctionalUnit with a cardinality of c:cn.

In some implementations, the CompanyPaymentFileRegister includes a QueryByCompany that can provide a list of CompanyPaymentFileRegister that belong to a company. The query elements can be defined by the CompanyPaymentFileRegisterCompanyQueryElements data type. In some implementations, the elements can be CompanyUUID and/or a CompanyID. The CompanyUUID can be a GDT of type UUID. The CompanyID can be a GDT of type OrganisationalCentreID.

In some implementations, an IncomingFile can be a file with payment data, administrative data, and the processing status that is created by a house bank for processing at the company. The elements located at the IncomingFile node can be defined by the CompanyPaymentFileRegisterIncomingFileElements data type. The elements can be: UUID, ID, HouseBankUUID, HouseBankInternalID, SystemAdministrativeData, ContentTypeCode, LifecycleStatus, and Status.

In some implementations, the UUID is a universal identifier, which may be unique, of an IncomingFile. The UUID may be based on a GDT of type UUID. The ID is an identifier, which may be unique, of an IncomingFile. The ID may be based on a GDT of type CompanyPaymentFileRegisterFileID (e.g., with a Qualifier of Incoming). The HouseBankUUID can be a universal identifier, which may be unique, of the house bank that is the sender of the IncomingFile. The HouseBankUUID may be based on a GDT of type UUID. The HouseBankInternalID can be an internal identifier of the house bank that is the sender of the IncomingFile. The HouseBankInternalID may be based on a GDT of type BusinessPartnerInternalID. The SystemAdministrativeData can be administrative data recorded by the system. For example, the data can include system users and change dates/times. The SystemAdministrativeData may be based on a GDT of type SystemAdministrativeData. The ContentTypeCode is a type of the content of the IncomingFile. The SystemAdministrativeData may be based on GDT CompanyPaymentFileRegisterIncomingFileContentTypeCode. For example, the LifecycleStatus can be the status of the CompanyPaymentFileRegister. The LifecycleStatus may be based on a GDT of type CompanyPaymentFileRegisterIncomingFileLifecycleStatus. The Status can be the current step in the life cycle of the IncomingFile.

In some implementations, the status elements can be defined by the CompanyPaymentFileRegisterIncomingFileStatus data type. The elements are: LifecycleStatusCode, UploadProcessingStatusCode, ReleaseStatusCode, and PaymentUpdateStatusCode. In some implementations, the LifecycleStatusCode can be the Current step in the life cycle of the IncomingFile. The LifecycleStatusCode may be based on a GDT of type LifeCycleStatusCode (e.g., with Qualifier of CompanyPaymentFileRegisterIncomingFile). The UploadProcessingStatusCode can be the status of the upload process of an Incoming File. The UploadProcessingStatusCode may be based on a GDT of type ProcessingStatusCode. The ReleaseStatusCode can be the status of the release step. The ReleaseStatusCode may be based a GDT of type ReleaseStatusCode. The PaymentUpdateStatusCode can be the status of the update of processing the Incoming File. The PaymentUpdateStatusCode may be based on a GDT of type UpdateStatusCode. The IncomingFile can have composition relationship with one or more subordinate nodes. For example, the IncomingFile can have a cardinality relationship with a AttachmentFolder 214024 of 1:1. In some implementations, the IncomingFile can also have an Inbound Aggregation Relationships from business object HouseBank or node HouseBank. For example, the IncomingFile can have a cardinality relationship with HouseBank of 1:cn. For example, the House bank can create the CompanyPaymentFileRegisterIncomingFile. In some examples, the IncomingFile can also have an Inbound Aggregation Relationships from business object Identity/node Root. For example, the IncomingFile can have a cardinality relationship with CreationIdentity of 1:cn. For example, the Identity can create the CompanyPaymentFileRegisterIncomingFile. In another example, the IncomingFile can have a cardinality relationship with LastChangeIdentity of c:cn. For example, the Identity can change the CompanyPaymentFileRegisterIncomingFile in the last time.

In some implementations, the IncomingFile can include one or more Enterprise Service Infrastructure Actions. For example, the IncomingFile can include a StartUpload (S&AM action) that initializes the upload from an incoming file from a local to an exchange infrastructure file system. For example, the StartUpload can be performed, for example, if the ReleaseStatus is “Not Released”. For example, the StartUpload can update the SystemAdministrativeData.

In some implementations, the IncomingFile can also include a RevokeUpload (S&AM action) that can delete an uploaded file. For example, the RevokeUpload can be performed, if the UploadProcessingStatus is “Finished” and ReleaseStatus is “Not Released”. For example, the RevokeUpload can update the SystemAdministrativeData. In some examples, the RevokeUpload performed manually on the UI.

In some implementations, the IncomingFile can include a Release (S&AM action) that can trigger the processing of the incoming file within exchange infrastructure by calling the action “Start Payment Update” of the status variable “PaymentUpdateStatus”. In some examples, the Release action can be performed, if the ReleaseStatus is “Not Released”. For example, the Release action can update the SystemAdministrativeData. For example, the FileInputTrigger business object can be created by the Release action. In some implementations, the Release action can be performed by the user on the UI.

In some implementations, the IncomingFile can include a Discard (S&AM action) that can reject an Incoming File. In some examples, the action can be performed, if the ReleaseStatus is “Not Released”. The action can update the SystemAdministrativeData. In some implementations, the action is performed by the user on the UI.

In some implementations, the IncomingFile can include a StartPaymentUpdate (S&AM action): that can indicate and initiate the processing of the incoming file by the creation of a technical object FileInputControl. In some examples, the action “StartPaymentUpdate” can be performed by the action “Release” of the status variable “Release Status”. At this point, the PaymentUpdateStatus value can be “Not Started” or “Failed”. The SystemAdministrativeData is updated by the action. The status of the IncomingFile can be changed to be “In Process”. In some examples, the action is performed by the system or by the user on the UI.

In some implementations, the IncomingFile can include a NotifyOfPaymentUpdateFailure (S&AM action) that can document information related to a failure in the processing of the incoming file. In some examples, the action “NotifyOfPaymentUpdateFailure” can be performed if the PaymentUpdateStatus is “In Process”. The SystemAdministrativeData is updated by the action. The action can lead to the change of the status to “Failed” and to the change of the ReleaseStatus to “Not Released”. For example, this allows the repetitive processing of an uploaded file using the release action of the ReleaseStatus after corrections (e.g. in configuration or master data). In some implementations, the action can be performed by the system or by the user on the UI.

In some implementations, the IncomingFile can include a NotifyOfPaymentUpdateSuccess (S&AM action) that can document a success of the processing of the incoming file. The action “NotifyOfPaymentUpdateSuccess” can only be performed, if the PaymentUpdateStatus is “In Process”. The SystemAdministrativeData is updated by the action. The action can change the status to “Successful”. In some implementations, the action can be performed by the system or by the user on the UI.

The IncomingFile can include a QueryByStatus that can provide a list of IncomingFiles that have the status specified. In some examples, the query elements can be defined by the CompanyPaymentFileRegisterIncomingFileStatusQueryElements data type. The elements can include a Status element, which may be optional. In some implementations, the Status element can be an IDT of type CompanyPaymentFileRegisterIncomingFileStatus.

The IncomingFile can include a QueryByElements that can provide a list of IncomingFiles that fulfill the attributes specified. In some examples, the query elements can be defined by the CompanyPaymentFileRegisterIncomingFileElementsQueryElements data type. The elements can include one or more an ID, a HouseBankUUID, a SystemAdministrativeData, a ContentTypeCode, and a Status. For example, the ID can be a GDT of type CompanyPaymentFileRegisterFileID with a Qualifier of Incoming. For example, the HouseBankUUID can be a GDT of type UUID. For example, the HouseBankInternalID can be a GDT of type BusinessPartnerInternalID. For example, the SystemAdministrativeData can be a GDT of type SystemAdministrativeData. For example, the ContentTypeCode can be a GDT of type CompanyPaymentFileRegisterIncomingFileContentTypeCode. The Status can be an IDT of type CompanyPaymentFileRegisterIncomingFileStatus.

The OutgoingFile is a file with payment data, administrative data, and the processing status that is created by the company for processing at a house bank. The elements can be located at the CompanyPaymentFileRegister node that are defined by the CompanyPaymentFileRegister-OutgoingFileElements data type. The elements can be UUID, ID, HouseBankUUID, HouseBankInternalID, SystemAdministrativeData, ContentTypeCode, PaymentAmount, OperationalAmount, and Status.

The UUID is a universal identifier, which may be unique, of an OutgoingFile. The UUID may be based on a GDT of type UUID. The ID can be an identifier, which may be unique, of an OutgoingFile. The ID may be based on a GDT of type CompanyPaymentFileRegisterFileID with a Qualifier of Outgoing. The HouseBankUUID can be a universal identifier, which may be unique, of the house bank that is the recipient of the OutgoingFile. The HouseBankUUID may be based on a GDT of type UUID. The HouseBankInternalID can be an internal identifier of the house bank that is the recipient of the OutgoingFile. The HouseBankInternalID may be based on a GDT of type BusinessPartnerInternalID. The SystemAdministrativeData can be administrative data recorded by the system. This data can include system users and change dates/times. The SystemAdministrativeData may be based on a GDT of type SystemAdministrativeData. The ContentTypeCode can represent the type of the content of the OutgoingFile. The ContentTypeCode may be based on a GDT of type CompanyPaymentFileRegister-OutgoingFileContentTypeCode. The PaymentAmount can represent the total payment amount of the OutgoingFile in payment currency. The PaymentAmount can be optional, in some implementations. In some examples, the amount is filled if payments within the file includes the same payment currency. The PaymentAmount may be based on a GDT of type Amount with a Qualifier of Payment. The OperationalAmount can be the total payment amount of the OutgoingFile in operational currency (e.g., currency in which the operational business of the company is controlled). The OperationalAmount may be based on a GDT of type Amount with Qualifier of Operational. The Status can be the current step in the life cycle of a OutgoingFile.

In some implementations, the status elements can be defined by the CompanyPaymentFileRegister-OutgoingFileStatus data type. The elements can include LifecycleStatusCode, FileUpdateStatusCode, ReleaseStatusCode, PaymentExecutionStatusCode. The LifecycleStatusCode can be a current step in the life cycle of a OutgoingFile. For example, the LifecycleStatusCode may be based on a GDT of type LifeCycleStatusCode (e.g., with a Qualifier: CompanyPaymentFileRegisterOutgoingFile). In one example, the FileUpdateStatusCode can be a status of the creation of an OutgoingFile. For example, the FileUpdateStatusCode may be based on a GDT of type UpdateStatusCode. The ReleaseStatusCode can be the status of the release of a OutgoingFile for download. For example, the ReleaseStatusCode may be based on a GDT of type ReleaseStatusCode. The PaymentExecutionStatusCode can be the status of the execution of an outgoing file at the house bank. For example, the PaymentExecutionStatusCode may be based on a GDT of type PaymentExecutionStatusCode.

The OutgoingFile can have cardinality with the AttachmentFolder 214026 of 1:1. In some implementations, the OutgoingFile can have an Inbound Aggregation Relationship from a business object HouseBank or a node HouseBank. For example, the OutgoingFile can have a cardinality with the HouseBank of 1:cn. The OutgoingFile can have an Inbound Aggregation Relationship from a business object Identity or a node Root. The OutgoingFile can have a cardinality of 1:cn with CreationIdentity. The OutgoingFile can have a cardinality of c:cn with LastChangeIdentity.

In some implementations, the OutgoingFile can include a NotifyOfFileCreationFailure (S&AM action) that can document a failure of the creation of the outgoing file within the file system. For example, the action "NotifyOfFileCreationFailure" can be performed, if the FileUpdateStatus is "In Process". For example, the SystemAdministrativeData is updated. For example, the action leads to the change of the status to "Failed". In some implementations, the action can be performed by the system or by the user on the UI.

In some implementations, the OutgoingFile can include a NotifyOfFileCreationSuccess (S&AM action) that can document a success of the creation of the outgoing file within the file system. For example, the action "NotifyOfFileCreationSuccess" can only be performed, if the FileUpdateStatus is "In Process". The OutgoingFile update the SystemAdministrativeData. For example, the action can change the status to "Successful". In some implementations, the action can be performed by the system or by the user on the UI.

In some implementations, the OutgoingFile can include a Release (S&AM action) can permit the download of the outgoing file to a file system. For example, the action can be performed if the ReleaseStatus is "Not Released" and the FileUpdateStatus is "Successful". For example, the OutgoingFile can update the SystemAdministrativeData. For example, the action can change the ReleaseStatus to be "Released". For example, the action is performed by the user on the UI.

In some implementations, the OutgoingFile can include a DiscardRelease (S&AM action) can reject an outgoing file finally. For example, the action can be performed if the ReleaseStatus is "Not Released" and the FileUpdateStatus is "Successful". The DiscardRelease can update the SystemAdministrativeData. In some examples, the action can change the ReleaseStatus to be "Release Discarded". For example, the action can be performed by the user on the UI.

In some implementations, the OutgoingFile can include a CancelRelease (S&AM action) can rejects an outgoing file after the file was released. In some implementations, the action can be performed if the ReleaseStatus is "Released" and the PaymentExecutionStatus is not started. The CancelRelease can update the SystemAdministrativeData. For example, the action changes the ReleaseStatus to be "Release Canceled". In some implementations, the action can be performed by the user on the UI.

In some implementations, the OutgoingFile can include a Download (S&AM action) can download an outgoing file from the exchange infrastructure file system to a local file system. In some examples, the action can only be performed if the ReleaseStatus is "Released". The action can update the SystemAdministrativeData. In some examples, the action can be performed by the user on the UI.

In some implementations, the OutgoingFile can include a NotifyOfTransferToBank (S&AM action) can represent the transfer of the outgoing file to the house bank. For example, the action can be performed if the Release Status is "Released" and the PaymentExecutionStatus is "Not Started". The action can update the SystemAdministrativeData. For example, the action can change the Status to be "In Transfer". In various implementations, the action can be performed manually or automatically.

In some implementations, the OutgoingFile can include a ConfirmPayment (S&AM action) can confirm the execution of the payments of the outgoing file within the house bank. In some implementations, the action can be performed if the Release Status is "Released" and the PaymentExecutionStatus is "In Transfer". The action can update the SystemAdministrativeData. The action changes the Status to be "Confirmed". In various implementations, the action can be performed manually or automatically.

The OutgoingFile can include a QueryByStatus that can provide a list of OutgoingFiles that have the status specified. In some implementations, the query elements can be defined by the CompanyPaymentFileRegisterStatusQueryElements data type. The elements can include a Status. For example, the Status can be an IDT of type CompanyPaymentFileRegister-OutgoingFileStatus.

The OutgoingFile can include a QueryByElements that can provide a list of OutgoingFiles that fulfill the attributes specified. In some implementations, the Query elements can be defined by the CompanyPaymentFileRegister-OutgoingFileElementsQueryElements data type. The elements can include an ID, a HouseBankUUID, a HouseBankInternalID, a SystemAdministrativeData, a ContentTypeCode, a Status. In some implementations, the ID can be optional and the ID can be, for example, a GDT of type CompanyPaymentFileRegisterFileID (e.g., with a Qualifier: Outgoing). The HouseBankUUID can be optional and can be a GDT of type UUID. The HouseBankInternalID can be optional and can be a GDT of type BusinessPartnerInternalID. The SystemAdministrativeData can be optional and can be a GDT of type SystemAdministrativeData. The ContentTypeCode can be optional and can be a GDT of type CompanyPaymentFileRegister-OutgoingFileContentTypeCode. The Status can be optional and can be an IDT of type CompanyPaymentFileRegister-OutgoingFileStatus.

Business Object ExpectedLiquidityItem

FIG. 215 illustrates an example ExpectedLiquidityItem business object model 215002. Specifically, this model depicts interactions among various hierarchical components of the ExpectedLiquidityItem, as well as external components that interact with the ExpectedLiquidityItem (shown here as 215000 through 25010 and 215014 through 215016). The ExpectedLiquidityItem is an expected single amount that increases or reduces the liquidity of a company. Expected Liquidity Item can be used for business processes that are not directly monitored by Liquidity Forecast. For example, to provide a complete overview of the liquidity situation of a company or group of companies, Liquidity Forecast can be taken into account realized or expected incoming or outgoing cash flows (e.g., from sales and purchase orders, customer or supplier invoices or incoming or outgoing payments). While a part of the data can be retrieved automatically from the relevant business objects by the message based integration with Liquidity Forecast, other relevant data have to be considered using the business object "Expected Liquidity Item". The business object ExpectedLiquidityItem is part of the Cash Management process component. The business object ExpectedLiquidityItem consists of data of the inflow or outflow relevant for liquidity analyses and the status of processing. From a liquidity view, some data may be relevant: the classification, amount and expected value date.

In some implementations, the ExpectedLiquidityItem can be an expected inflow or outflow of liquidity in a company. Some elements located at the node ExpectedLiquidityItem 215012 are defined by the type GDT: ExpectedLiquidityItemElements. These elements can include UUID, ID, CompanyUUID, CompanyID, CashLiquidityFunctionalUnitUUID, SystemAdministrativeData, GroupCode, OperationalProcessProgressCategoryCode, BusinessTransactionDocumentStatusCategoryCode, PaymentFromCode, HouseBankAccountUUID, HouseBankAccountInternalID, CashStorageUUID, CashStorageID, Description, TransactionCurrencyAmount, ValueDateTime, Expiration Date, and LifecycleStatus. An UUID can be the universally unique identifier of an ExpectedLiquidityItem, can be a GDT of type UUID, and has an alternative key. An ID can be a unique identifier of an ExpectedLiquidityItem, can be a GDT of type BusinessTransactionDocumentID, and has an Alternative Key. A CompanyUUID can be a universally unique identifier of the company to which the ExpectedLiquidityItem belongs, and can be a GDT of type UUID. A CompanyID can be an internal identifier of the company to which the ExpectedLiquidityItem belongs, and can be a GDT of type OrganisationalCentreID. A CashLiquidityFunctionalUnitUUID can be a universally unique identifier of the FunctionalUnit working on the ExpectedLiquidityItem, can be a GDT of type UUID, and can be optional. A SystemAdministrativeData can be administrative data recorded by the system, and can be a GDT of type SystemAdministrativeData. This data includes system users and change dates/times. A GroupCode can be the coded representation of a group of liquidity items mapped according to business criteria, and can be a GDT of type LiquidityItemGroupCode. An OperationalProcessProgressCategoryCode can be the coded representation of the category of an ExpectedLiquidityItem regarding the processing progress of the underlying operational business process, and can be a GDT of type LiquidityItemOperationalProcessProgressCategoryCode. A BusinessTransactionDocumentStatusCategoryCode can be the coded representation of the category of an ExpectedLiquidityItem dependent on the status of the underlying business transaction document, and can be a GDT of type LiquidityItemBusinessTransactionDocumentStatusCategoryCode. A PaymentFormCode can be a coded representation of the payment form that can be agreed for the payment of the business process based on the item, can be a GDT of type PaymentFormCode, and can be optional. A HouseBankAccountUUID can be the House Bank Account on which the inflow or outflow of liquidity can be expected, can be a GDT of type UUID, and can be optional. A HouseBankAccountInternalID can be the internal identifier of the HouseBankAccount on which the inflow or outflow of liquidity can be expected, can be a GDT of type BankAccountInternalID, and can be optional. A CashStorageUUID can be the Cash Storage on which the inflow or outflow of liquidity can be expected, can be a GDT of type UUID, and can be optional. A CashStorageID can be the internal identifier of the Cash Storage on which the inflow or outflow of liquidity can be expected, can be a GDT of type CashStorageID, and can be optional.

A Description can be the text that contains a description of the ExpectedLiquidityItem, can be a GDT of type_MEDIUM_Description, and can be optional. A TransactionCurrencyAmount can be the amount of the ExpectedLiquidityItem in transaction currency, can be a GDT of type Amount, and in some implementations may have a Qualifier of TransactionCurrencyAmount. A ValueDateTime can be the expected value data of the item, can be a GDT of type Global_DateTime, and in some implementations may have a Qualifier of Value. An Expiration Date can be the date on which the item becomes invalid (expires), can be a GDT of type Date and in some implementations may have a Qualifier of Expiration. LifecycleStatus can be the status of the ExpectedLiquidityItem, and can be a GDT of type ExpectedLiquidityItemLifecycleStatus.

There can be some composition relationships to subordinate nodes. For example, DO: AccessControlList can have a cardinality relationship of 1:1. There may be a number of Inbound Aggregation Relationships including: Company may have a cardinality relationship of 1:cn (e.g., an ExpectedLiquidityItem belongs to exactly one company); House Bank Account may have a cardinality relationship of c:cn (e.g., an ExpectedLiquidityItem may belong to exactly one HouseBankAccount); Cash Storage may have a cardinality relationship of c:cn (e.g., an ExpectedLiquidityItem may belong to exactly one CashStorage); CreationIdentity may have a cardinality relationship of 1:cn (e.g., identity that created the ExpectedLiquidityItem); LastChangeIdentity may have a cardinality relationship of c:cn (e.g., identity that changed the ExpectedLiquidityItem in the last time). There may be a number of Inbound Association Relationships including: CashLiquidityFunctionalUnit may have a cardinality relationship of c:cn (e.g., identifies the Functional Unit which is working on the ExpectedLiquidityItem). An Expected Liquidity Item cannot belong to a House Bank Account and a Cash Storage at the same time.

Release (S&AM action) releases an ExpectedLiquidityItem to be considered in the liquidity forecast. In some implementations preconditions may be that the ExpectedLiquidityItem is in preparation (e.g., LifecycleStatus is "In Preparation"). Changes to the object may include that the SystemAdministrativeData is updated. There are no changes to other objects. Changes to the status may include that the LifecycleStatus gets the value "Released". There are no parameters. In some implementations the action is performed by the user on the UI.

Close (S&AM action) closes an ExpectedLiquidityItem. In some implementations preconditions may be that the ExpectedLiquidityItem has been released (e.g., LifecycleStatus is "Released"). Changes to the object may include that the SystemAdministrativeData is updated. There are no changes to other objects. Changes to the status include that the LifecycleStatus may get the value "Closed". There are no parameters. In some implementations the action is performed by the user on the UI or by the system (e.g., in case that the Expected Liquidity Item expiration date is over).

In some implementations, the query QuerybyCompanyAndStatus provides a list of ExpectedLiquidityItem that belong to the company specified and have the status specified. The query elements are defined by the data type ExpectedLiquidityItemCompanyandStatusQueryElements. These elements are: CompanyID, and LifecycleStatus. CompanyID is a GDT of type OrganisationalCentreID. LifecycleStatus is a GDT of type ExpectedLiquidityItemLifecycleStatus, and is optional.

In some implementations, the query QuerybyElements provides a list of ExpectedLiquidityItem that fulfill the attributes specified. The query elements are defined by the data type ExpectedLiquidityItemElementsQueryElements. These are: ID, CompanyID, SystemAdministrativeData, GroupCode, OperationalProcessProgressCategoryCode, BusinessTransactionDocumentStatusCategoryCode, PaymentFormCode, TransactionCurrencyAmount, ValueDateTime, Expiration Date, LifecycleStatus In some implementations, the ID is a GDT of type BusinessTransactionDocumentID, and is optional. A CompanyID is a GDT of type OrganisationalCentreID, and is optional. A SystemAdministrativeData is a GDT of type SystemAdministrativeData, and is optional. A GroupCode is a GDT of type LiquidityItemGroupCode, and is optional. An OperationalProcessProgressCategoryCode is a GDT of type LiquidityItemOperationalProcessProgressCategoryCode, and is optional. A BusinessTransactionDocumentStatusCategoryCode is a GDT of type LiquidityItemBusinessTransactionDocumentStatusCategoryCode, and is optional. A PaymentFormCode is a GDT of type PaymentFormCode, and is optional. A TransactionCurrencyAmount is a GDT of type Amount, in some implementations it may have a Qualifier of TransactionCurrencyAmount, and is optional. A ValueDateTime is a GDT of type DateTime, in some implementations it may have a Qualifier of Value, and is optional. An Expiration Date is a GDT of type Date, in some implementations it may have a Qualifier of Expiration, and is optional. A LifecycleStatus is a GDT of type ExpectedLiquidityItemLifecycleStatus, and is optional. In some implementations, the AccessControlList is a list of access groups that have access to an ExpectedLiquidityItem during a validity period.

HouseBankStatement Business Object

FIG. 216 illustrates an example HouseBankStatement business object model 216000. Specifically, this model depicts interactions among various hierarchical components of the HouseBankStatement, as well as external components that interact with the HouseBankStatement (shown here as 216002 through 216008 and 216022 through 216034).

A HouseBankStatement Business Object is a legally binding notification from the house bank about the revenues within a specific time period at a house bank account with a defined starting and closing balance. The house bank account is an account of the company from which or to which the money should go. The bank statement can be delivered to the bank statement recipient in different ways (for example, bank statement printer, by post, or as an "electronic" bank statement in the form of a file). If the recipient does not raise any objections within a defined period, it is assumed that the bank statement has been accepted. The HouseBankStatement business object is part of the Payment Processing process component in the Payment DU. A HouseBankStatement contains information on the bank statement such as information about the house bank account (account number), bank statement date, or bank statement number. A HouseBankStatement also contains the individual revenues (items) on the account and the explanation of business partner initiated payments with regard to their usage, such as for invoices.

BankStatement is represented by the HouseBankStatement 216010 node. The business object is involved in the following Process Integration Models: Bank statement creation at bank_Payment Processing and Payment Processing_Accounting The service interface Bank Statement Processing In is part of the following Process Integration Models: Bank statement creation at bank_Payment Processing. Bank Statement Processing In contains operations for creating a bank statement from a specific house bank and house bank account.

Create Bank Statement (B2B) creates a bank statement. Control and revenue information from the message of the bank is represented in the HouseBankStatement business object. The operation is based on the BankAccountStatementNotification message type. (derived from the BO HouseBankStatement)

The Payment Accounting Out service interface is part of the following Process Integration Models: Payment Processing_Accounting. The Payment Accounting service interface groups operations that inform Accounting about incoming or outgoing payments or the cancellation thereof.

Notify of Payment (A2A) forwards information about incoming or outgoing payments to Accounting. The operation is based on the Payment Accounting Notification message type (derived from the Accounting Notification business object).

Notify of Payment Cancellation (A2A) cancels an incoming or outgoing payment that has previously been forwarded to Accounting (using the Notify of Payment operation). The operation is based on the Payment Cancellation Accounting Notification message type (derived from the Accounting Notification business object).

Business Object HouseBankStatement is a legally binding notification from the house bank about the revenues (items) within a specific time period at a house bank account. It also contains information on the house bank account (account number), bank statement date, or bank statement number, or starting and closing balance. In some implementations, during the creation of the bank statement, it is checked whether a bank statement with the same BankID, BankAccount, and Date already exists. It is forbidden to enter such a bank account again in the system.

The elements located at the HouseBankStatement node are defined by the type GDT: HouseBankStatementElements. These elements can include: UUID, ID, BankID, CompanyUUID, CompanyID, HouseBankUUID, HouseBankInternalID, HouseBankAccountUUID, HouseBankAccountID, HouseBankAccount, ID, IDCheckDigitValue, StandardID, TypeCode, CurrencyCode, HolderName, Bank, Name, StandardID, RoutingID, RoutingIDTypeCode, CountryCode, IncomingCompanyPaymentFileRegisterFileUUID, IncomingCompanyPaymentFileRegisterFileID, ApplicationLogUUID, SystemAdministrativeData, ResponsibleEmployeeUUID, AutomaticallyGeneratedIndicator, Date, CurrencyCode, OpeningBalanceAmount, ClosingBalanceAmount, DebitTotalAmount, CreditTotalAmount, ItemTotalNumberValue. UUID is a universally unique identifier of a HouseBankStatement. and is of GDT type UUID. ID is a unique proprietary identifier of a HouseBankStatement that is assigned by the system and is of GDT type BusinessTransactionDocumentID. BankID is a bank statement number. It is generated by the bank and is unique for each fiscal year and house bank account and is of GDT type BusinessTransactionDocumentID. CompanyUUID is a universally unique identifier of the company involved in the role of the house bank account holder and is of GDT type UUID. CompanyID is an internal identifier of the company that manages the HouseBankAccount to which the bank statement belongs and is of GDT type OrganisationalCentreID. HouseBankUUID is a universally unique identifier of a HouseBank and is of GDT type UUID. HouseBankInternalID is a universally unique identifier of the house bank where the HouseBankAccount is managed to which the bank statement belongs and is of GDT type BusinessPartnerInternalID. HouseBankAccountUUID is a universally unique identifier of a HouseBankAccount and is of GDT type UUID. HouseBankAccountID is a unique identifier of a HouseBankAccount and is of GDT type BankAccountInternalID. HouseBankAccount is account information for the house bank account as specified by the house bank in the bank statement. ID is a bank account number (Basic Bank Account Number, BBAN). An account number is assigned by the account-managing bank. It uniquely identifies a bank account in most countries only in combination with the entry of the bank and is of GDT type BankAccountID. IDCheckDigitValue is a check digit for the bank account number (ID) and is of GDT type BankAccountIDCheckDigitValue. StandardID is an international bank account number (IBAN) and is of GDT type BankAccountStandardID. TypeCode is a type of account and is of GDT type BankAccountTypeCode. CurrencyCode is account currency and is of GDT type CurrencyCode. HolderName is a name of account holder and is of GDT type BankAccountHolderName. Bank data for the house bank as specified by the house bank in the bank statement. Name is a name of bank and is of GDT type Name. StandardID is a bank Identification Code (BIC) of the Society for Worldwide Interbank Financial Telecommunications (S.W.I.F.T.) and is of GDT type BankStandardID. RoutingID is the routing number of a bank in a clearing system (for example, bank number, sort code, ABA routing number, CHIPS participant number). The maximum length and structure of the ID depends on the clearing system. RoutingID is of GDT type BankRoutingID. RoutingIDTypeCode is a type of a bank number or routing number and is of GDT type BankRoutingIDTypeCode. CountryCode is a bank country, that is, the country in which the previously identified bank goes about its business. If the bank is a member of a national clearing system, the country to which this clearing system belongs is entered here. CountryCode is of GDT type CountryCode. IncomingCompanyPaymentFileRegisterFileUUID is a universally unique identifier of an incoming payment file (stored in BO CompanyPaymentFileRegister) and is of GDT type UUID. IncomingCompanyPaymentFileRegisterFileID is an identifier of an incoming payment file (stored in BO CompanyPaymentFileRegister) and is of GDT type CompanyPaymentFileRegisterFileID and, in some implementations, can have a Qualifier of Incoming. ApplicationLogUUID is a universally unique identifier of an application log for the HouseBankStatement and is of GDT type UUID. SystemAdministrativeData is administrative data that is stored in a system. This data includes system users and change dates/times and is of GDT type SystemAdministrativeData. ResponsibleEmployeeUUID is the employee responsible for the business processes of this bank statement partner derived using the responsibility concept. This information is not persisted. The responsible employee should solve the problems that occur during processing. ResponsibleEmployeeUUID is of GDT type UUID. AutomaticallyGeneratedIndicator is an indicator for bank statements that are entered electronically and is of GDT type Indicator and, in some implementations, can have a Qualifier of AutomaticallyGenerated. Date is the date of the bank statement delivered by the house bank and is of GDT type Date. CurrencyCode contains the account currency of the house bank account (and thus the bank statement) and is of GDT type CurrencyCode. OpeningBalanceAmount is the account amount before the first item contained in the bank statement. Same as the ClosingBalanceAmount of the directly preceding bank statement for this account. OpeningBalanceAmount is of GDT type Amount and, in some implementations, can have a Qualifier of Balance. ClosingBalanceAmount is the account amount after the last item contained in the bank statement. Same as the OpeningBalanceAmount of the directly succeeding bank statement for this account. ClosingBalanceAmount is of GDT type Amount and, in some implementations, can have a Qualifier of Balance. DebitTotalAmount is the total amount of the account debits and is of GDT type Amount and, in some implementations, can have a Qualifier of Total. CreditTotalAmount is the total amount of the credit memos and is of GDT type Amount and, in some implementations, can have a Qualifier of Total. ItemTotalNumberValue is the total number of line items of the existing bank statement and is of GDT type NumberValue and, in some implementations, can have a Qualifier of Total.

In some implementations, the bank statement number may be a positive natural number. It may be unique within a calendar year. The numbering should start with "1". The numbering should be consecutive (that is, without gaps). The external bank statement number (BankID) with the specified account (BankAccount) in the specified year (from the Date field) may only exist once in the system. OpeningBalanceAmount may be equal to ClosingBalanceAmount of the directly preceding bank statement (if available). ClosingBalanceAmount may be equal to OpeningBalanceAmount of the directly succeeding bank statement (if available). TotalDebitAmount may equal the total of all debits in the existing bank statement. TotalDebitAmount is not negative. TotalCreditAmount may equal the total of all credit memos reported in the existing bank statement. TotalCreditAmount is not negative. ClosingBalanceAmount may be equal to OpeningBalanceAmount+TotalCreditAmount—TotalDebitAmount. ItemTotalNumberValue may equal the number of all sales items contained in the existing bank statement. All amounts occurring in the root node may have the currency specified in CurrencyCode.

There may be a number of composition relationships to subordinate nodes including: HouseBankStatementItem 216012 may have a cardinality relationship of 1:cn. FinancialAuditTrailDocumentation 216014 may have a cardinality relationship of 1:cn. AttachmentFolder 216016 may have a cardinality relationship of 1:c.

There may be a number of Inbound Aggregation Relationships including: HouseBankAccount may have a cardinality relationship of c:cn and is an incoming bank statement is assigned to exactly one house bank account. The HouseBankAccount is used also for access control to a HouseBankStatement. Company may have a cardinality relationship of c:cn and specifies the company for which the bank statement was issued (account holder).

There may be a number of Inbound Aggregation Relationships including: 1) From the business object CompanyPaymentFileRegister/node IncomingFile as follows. IncomingPaymentFile may have a cardinality relationship of c:cn and is a HouseBankStatement can be assigned to one incoming payment file or to none.

2) From business object Identity/node Root as follows. CreationIdentity may have a cardinality relationship of 1:cn and is an identity that created the HouseBankStatement. LastChangeIdentity may have a cardinality relationship of c:cn and is an identity that changed the HouseBankStatement in the last time.

There may be a number of Inbound Association Relationships including: 1) From business object BusinessPartner/node Employee as follows. ResponsibleEmployee may have a cardinality relationship of c:cn and specifies the employee that can be entered as the person responsible for a bank statement.

There may be a number of Associations for Navigation including: 1) To Business Object ApplicationLog/node Root as follows. ApplicationLog may have a cardinality relationship of c:c and is an ApplicationLog for a HouseBankStatement.

A SubmitForRelease (S&AM action) action submits the bank statement for release. In some implementations, the action is either called directly by the inbound agent for bank statements created automatically or by a user for manual bank statements. The action first checks whether the object is without errors. Automatic bank statements with errors are rejected here, that is, the status is set to “rejected”. The action is not performed for an inconsistent, manual bank statement. If the object is consistent, the system checks whether the configuration requires an approval process. If no other check is necessary, the internal action “Release” is called immediately. In some implementations, preconditions may include that for automatic bank statements: the business object may have the life cycle status “imported” and the approval status “not started”. For manual bank statements, in some implementations, the business object may have the life cycle status “in preparation” and the approval status “not started” or “rejected”. Changes to the status may include that the action sets the approval status of the business objects to “in approval” or “approval not necessary”. The status “rejected” is also possible for automatic bank statements. The life cycle status of such automatic bank statements is also set to “rejected” by a synchronizer. In some implementations, the action is called by the UI or the inbound agent.

An Approve (S&AM action) action approves the release of a bank statement. In some implementations, preconditions include that the business object may have the approval status “in approval”. Changes to the status can include that the action sets the approval status of the business object to “approved”. In some implementations, the action is called by the UI.

A Reject (S&AM action) action forbids the release of a bank statement. In some implementations, rejected manual bank statements can be processed again. That is, the user can correct the data of the object and trigger the action “Submit for Release” again. In some implementations, preconditions can include that the business object may have the approval status “in approval”. Changes to the status can include that the action sets the approval status of the business object to “rejected”. The life cycle status of an automatic bank statement is also set to “rejected” by a synchronizer. In some implementations, the action is called by the UI.

A Release (S&AM action) action releases a bank statement for update. In some implementations, this action is only called internally. The items are numbered and the internalID is assigned. In some implementations, preconditions can include that for automatic bank statements: the business object may have the life cycle status “imported” and the approval status “approved” or “approval not necessary”. For manual bank statements: the business object may have the life cycle status “in preparation” and the approval status “approved” or “approval not necessary”. Changes to the object can include that internalIDs are assigned for all items. Changes to other objects can include that a PaymentRegisterItem is created for each bank statement item (HouseBankStatementItem). An action is triggered to assign the payments (Payment Allocation). A FATDoc (operational accounting document) is created and sent that posts to the appropriate bank and bank clearing accounts. Changes to the status can include that the action sets the life cycle status of the business object to “released”. In some implementations, the action is called by the system.

A Cancel (S&AM action) action cancels a bank statement. In some implementations, preconditions can include that the business object may have the status “released”. Changes to other objects can include that the FATDoc is canceled or undone by a new document. The cancel action is also triggered for the dependent objects (PaymentAllocation, PaymentRegisterItem). Changes to the status can include that the action sets the status of the business object to “cancelled”. In some implementations, the action is triggered by the UI.

A QueryPreviousBankStatementByID query returns the directly preceding bank statement. Since the BankID of bank statements is numbered linearly for an account for each year, the directly preceding bank statement is the bank statement whose ID is smaller than the one entered. If the current bank statement is the first one of a year, it is the highest ID of the previous year. The query elements are defined by the BankStatementIDQueryElements data type. These elements can include: BankID, HouseBankAccountUUID, and Date. BankID is of GDT type BusinessTransactionDocumentID. HouseBankAccountUUID is of GDT type UUID. Date is of GDT type Date.

QueryNextBankStatementByID returns the directly succeeding bank statement. Since the BankID of bank statements is numbered linearly for an account for each year, the directly succeeding bank statement is the bank statement whose ID is greater than the one entered. If the current bank statement is the last one of a year, it is the first ID of the next year. The query elements are defined by the HouseBankStatementIDQueryElements data type. These elements can include: BankID, HouseBankAccountUUID, and Date. BankID is of GDT type BusinessTransactionDocumentID. HouseBankAccountUUID is of GDT type UUID. Date is of GDT type Date.

QueryByBankID returns the BankStatement that has the attributes (bank statement number, bank details, date) provided by the bank. The query elements are defined by the HouseBankStatementBankIDQueryElements data type. These elements can include: BankID, BankAccountID, IDCheckDigitValue, StandardID, TypeCode, CurrencyCode, HolderName, and bank elements Name, StandardID, RoutingID, RoutingIDTypeCode, CountryCode, Date. BankID is of GDT type BusinessTransactionDocumentID. BankAccountID is of GDT type BankAccountID. IDCheckDigitValue is of GDT type BankAccountIDCheckDigitValue. StandardID is of GDT type BankAccountStandardID. TypeCode is of GDT type BankAccountTypeCode. CurrencyCode is of GDT type CurrencyCode. HolderName is of GDT type BankAccountHolderName. The following are Bank elements. Name is of GDT type Name. StandardID is of GDT type BankStandardID. RoutingID is of GDT type BankRoutingID. RoutingIDTypeCode is of GDT type BankRoutingIDTypeCode. CountryCode is of GDT type CountryCode. Date is of GDT type Date.

QueryByElements returns a list of all BankStatements that meet the attributes specified. The query elements are defined by the HouseBankStatementElementsQueryElements data type These elements can include: UUID, ID, BankID, CompanyUUID, HouseBankAccountUUID, HouseBankAccountID, BankAccountID, IDCheckDigitValue, StandardID, TypeCode, CurrencyCode, HolderName, BankName, BankStandardID, BankRoutingID, BankRoutingIDTypeCode, BankCountryCode, SystemAdministrativeData, Date, CurrencyCode, OpeningBalanceAmount, ClosingBalanceAmount, DebitTotalAmount, CreditTotalAmount, ItemTotalNumberValue. UUID is of GDT type UUID. ID is of GDT type BusinessTransactionDocumentID. BankID is of GDT type BusinessTransactionDocumentID. CompanyUUID is of GDT type UUID. HouseBankAccountUUID is of GDT type UUID. HouseBankAccountID is of GDT type BankAccountInternalID. BankAccountID is of GDT type BankAccountID. IDCheckDigitValue is of GDT type BankAccountIDCheckDigitValue. StandardID is of GDT type BankAccountStandardID. TypeCode is of GDT type BankAccountTypeCode. CurrencyCode is of GDT type CurrencyCode. HolderName is of GDT type BankAccountHolderName. BankName is of GDT type Name. BankStandardID is of GDT type BankStandardID. BankRoutingID is of GDT type BankRoutingID. BankRoutingIDTypeCode is of GDT type BankRoutingIDTypeCode. BankCountryCode is of GDT type CountryCode. SystemAdministrativeData is of GDT type SystemAdministrativeData. Date is of GDT type Date. CurrencyCode is of GDT type CurrencyCode. OpeningBalanceAmount is of GDT type Amount and, in some implementations, can have a Qualifier of Balance. ClosingBalanceAmount is of GDT type Amount and, in some implementations, can have a Qualifier of Balance. DebitTotalAmount is of GDT type Amount and, in some implementations, can have a Qualifier of Total. CreditTotalAmount is of GDT type Amount and, in some implementations, can have a Qualifier of Total. ItemTotalNumberValue is of GDT type NumberValue and, in some implementations, can have a Qualifier of Total.

QueryByReconciliationElements provides a list of all HouseBankStatements which use the specified Company and AccountingTransactionDate on the associated FinancialAuditTrailDocumentations. This query is to be used for reconciliation with Process Component Financial Accounting. The query elements are defined by the type IDT: HouseBankStatementReconciliationElementsQueryElements. The elements can include: FinancialAuditTrailDocumentationCompanyID and FinancialAuditTrailDocumentationAccountingTransactionDate. FinancialAuditTrailDocumentationCompanyID is of GDT type OrganisationalCentreID. FinancialAuditTrailDocumentationAccountingTransactionDate is of GDT type Date and, in some implementations, can have a Qualifier of AccountingTransaction.

An Item is an individual revenue (credit memo or debit) in the house bank account. Examples of credit memos are cash deposits or check encashments. Examples of debits are cash withdrawals or bank transfers within the non-cash payment transaction.

There may be a number of composition relationships to subordinate nodes including: ItemPaymentExplanation 216018 may have a cardinality relationship of 1:c. ItemBusinessProcessVariantType 216020 may have a cardinality relationship of 1:cn.

The elements located at the Item node are defined by the type GDT: HouseBankStatementItemElements. These elements can include: UUID, ID, BankItemID, BusinessPartnerInternalID, BusinessPartnerUUID, BusinessPartnerPartyRoleCategoryCode, PaymentMediumExchangeMessageID, OutgoingChequeReference, PaymentReference, PaymentOrderReference, BillOfExchangeReference, BankPaymentTransactionReferenceID, BusinessProcessVariantTypeCode, PaymentTransactionTypeCode, PaymentTransactionTypeDescription, PaymentTransactionSupplementCategoryCode, BankChargeBearerCode, PaymentAllocationUUID, PaymentRegisterItemUUID, PostedAmount, BankValueDate, BankPostingDate, BankExchangeRate, HouseBankFeeAmount, OriginalCurrencyAmount, PartnerBankFeeAmount, BankPrimaNotaIDNote, BusinessPartnerName, BusinessPartnerBankAccount, ID, IDCheckDigitValue, StandardID, TypeCode, CurrencyCode, HolderName, and bank elements: Name, StandardID, RoutingID, BankRoutingID. CountryCode. UUID is a Universally unique identifier of a BankStatementItem and is of GDT type UUID. ID is a Unique proprietary identifier of a BankStatementItem that is assigned by the system and is of GDT type BusinessTransactionDocumentItemID. BankItemID is an ItemID of the item (usually the item number used by the bank) and is of GDT type BusinessTransactionDocumentItemID. BusinessPartnerInternalID is an Internal identification of the business partner that is involved in the payment transaction as the second party in addition to the company named in CompanyUUID and is of GDT type BusinessPartnerInternalID. BusinessPartnerUUID is a Universally unique identifier of the business partner that is involved in the payment transaction as the second party in addition to the company named in CompanyUUID and is of GDT type UUID. BusinessPartnerPartyRoleCategoryCode specifies whether the business partner is payer or beneficiary and is of GDT type PartyRoleCategoryCode. PaymentMediumExchangeMessageID is a Unique identifier of a message in the electronic data medium exchange and is of GDT type PaymentMediumExchangeMessageID) OutgoingChequeReference is a Unique identifier of an OutgoingCheque (check number) if the payment based on the bank statement item was settled by check and is of GDT type BusinessTransactionDocumentReference. PaymentReference is a Reference of the payment initiator for the payment on which the bank statement item is based and is of GDT type BusinessTransactionDocumentReference. PaymentOrderReference is a Reference of the payment initiator for the payment order on which the bank statement item is based. The payment order can be an individual or collective payment order and is of GDT type BusinessTransactionDocumentReference. BillOfExchangeReference is a Reference of the payment initiator for the bill of exchange used for the bank statement item and is of GDT type BusinessTransactionDocumentReference. BankPaymentTransactionReferenceID is a Reference generated by the account-managing bank to identify the payment transaction based on the bank statement item and is of GDT type PaymentTransactionReferenceID. BusinessProcessVariantTypeCode is a Coded representation of the business transaction type of the bank statement item and is of GDT type BusinessProcessVariantTypeCode. PaymentTransactionTypeCode is a Bank-specific or country-specific coded representation of the business transaction type of the bank statement item (such as 005 "debit memo") and is of GDT type PaymentTransactionTypeCode. PaymentTransactionTypeDescription is a Textual description of the account transaction type (such as "debit memo automatic debit transfer") and is of GDT type Description. PaymentTransactionSupplementTypeCode is a Bank-specific or format-specific coded representation of supplemental information for the business transaction type of the bank statement item (such as 001 "return payment") and is of GDT type PaymentTransactionSupplementTypeCode. PaymentTransactionSupplementCategoryCode is a Coded representation of the category of the supplemental information for the business transaction and is of GDT type PaymentTransactionSupplementCategoryCode. BankChargeBearerCode describes if the charges of a return to be paid by the account holder or by the business partner (in some implementations, only values "OUR" and "BEN" are possible) and is of GDT type BankChargeBearerCode. PaymentAllocationUUID is a Universally unique identifier of the PaymentAllocation that has been created for this item on release and is of GDT type UUID. PaymentRegisterItemUUID is a Universally unique identifier of the PaymentRegisterItem that has been created for this item on release and is of GDT type UUID. PostedAmount is an Amount of the revenue (debit or credit memo) in account currency and is of GDT type Amount and, in some implementations, can have a Qualifier of Posted. BankValueDate is a Value date based on this revenue by the bank and is of GDT type Date and, in some implementations, can have a Qualifier of Value. BankPostingDate is The posting date used by the bank for this revenue and is of GDT type Date and, in some implementations, can have a Qualifier of Posting. BankExchangeRate is an Exchange rate used by the house bank if the original payment or transaction currency differs from the currency of the house bank account and is of GDT type ExchangeRate) HouseBankFeeAmount represents Fees in account currency that were estimated by the account-managing house bank for the respective revenue. In the case of debits, the fees increase the amount of the bank statement item, for credit memos the amount is reduced and is of GDT type Amount and, in some implementations, can have a Qualifier of Fee. OriginalCurrencyAmount is an Original payment currency in the original payment currency and is of GDT type Amount and, in some implementations, can have a Qualifier of OriginalCurrency. PartnerBankFeeAmount represents Fees in original payment currency or transaction currency that were deducted by the partner bank in the case of credit memos and added in the case of debits. This is only relevant for business partner initiated transactions and is of GDT type Amount and, in some implementations, can have a Qualifier of Fee. BankPrimaNotaID is a batch description assigned by the bank. In case of complaints or necessary inquiries, this can be used to identify and clarify the transaction triggering the posting. Each BankPrimaNotaNote is only assigned once per posting day. BankPrimaNotaID is of GDT type BusinessTransactionDocumentItemID. BusinessPartnerName is a Name of the business partner and is of GDT type LANGUAGEINDEPENDENT_MEDIUM_Name and, in some implementations, can have a Qualifier of BusinessPartner. BusinessPartnerBankAccount is Information on the account details of the business partner that is involved in the payment transaction as the second party in addition to the company named in CompanyUUID ID is a Bank account number (Basic Bank Account Number, BBAN). An account number that is assigned by the account-managing bank. It uniquely identifies a bank account in most countries only in combination with the entry of the bank and is of GDT type BankAccountID. IDCheckDigitValue is a Check digit for the bank account number (ID) and is of GDT type BankAccountIDCheckDigitValue. StandardID is an International bank account number (IBAN and is of GDT type BankAccountStandardID. TypeCode is a Type of account and is of GDT type BankAccountTypeCode. CurrencyCode is a Account currency and is of GDT type CurrencyCode. HolderName is a Name of account holder and is of GDT type BankAccountHolderName. The following elements are Bank elements that describe Bank data for the partner bank as specified by the house bank in the bank statement. Name is a Name of bank and is of GDT type Name. StandardID is a Bank Identification Code (BIC) of the Society for Worldwide Interbank Financial Telecommunications (S.W.I.F.T.) and is of GDT type BankStandardID. RoutingID is the routing number of a bank in a clearing system (for example, bank number, sort code, ABA routing number, CHIPS participant number). The maximum length and structure of the ID depends on the clearing system. RoutingID is of GDT type BankRoutingID. RoutingIDTypeCode is a Type of a bank number or routing number and is of GDT type BankRoutingIDTypeCode. CountryCode is a Bank country, that is, the country in which the previously identified bank goes about its business. If the bank is a member of a national clearing system, the country to which this clearing system belongs is entered here. CountryCode is of GDT type CountryCode.

In some implementations, the currency specified in Amount may correspond to the currency in CurrencyCode of the root node.

There may be a number of Inbound Association Relationships including: BusinessPartner may have a cardinality relationship of c:cn and is an association to the second party that is involved in the payment transaction in addition to the company named in CompanyUUID.

There may be a number of Specialization Associations for Navigation including: ) To BO BusinessDocumentFlow/Root as follows. BusinessDocumentFlow may have a cardinality relationship of c:c. A BankStatementItem can be part of a BusinessDocumentFlow. ItemBusinessProcessVariantType defines the character of a business process variant of an Item in the HouseBankStatement. It represents a typical way of processing of an Item within the process component from a business point of view. The elements located at the node ItemBusinessProcessVariantType are defined by the data type HouseBankStatementItemBusinessProcessVariantTypeElements, derived from BusinessProcessVariantTypeElements. These elements can include: BusinessProcessVariantTypeCode and MainIndicator. BusinessProcessVariantTypeCode is a coded representation of a business process variant type of a HouseBankStatement and is of GDT type BusinessProcessVariantTypeCode. MainIndicator specifies whether the current BusinessProcessVariantTypeCode is the main one or not and is of GDT type Indicator and, in some implementations, can have a Qualifier of Main.

In some implementations, exactly one of the instances of the ItemBusinessProcessVariantType is allowed to be indicated as main.

DO ItemPaymentExplanation specifies the reason(s) for an individual bank account revenue. It can break down payment amounts for each business document and explain a possible difference between the expected and the actual payment amount. Technically, it is a dependent object that is described in a separate document.

DO FinancialAuditTrailDocumentation is a uniform documentation of the changes to receivables and payables and financial transactions linked to a business transaction for audit purposes.

FinancialAuditTrailDocumentation is a dependent object.

DO AttachmentFolder contains the attached documents of the BO HouseBankStatement.

FIG. 217-1 through 217-8 illustrates one example logical configuration of BankAccountStatementMessage message 217000. Specifically, this figure depicts the arrangement and hierarchy of various components such as one or more levels of packages, entities, and datatypes, shown here as 217000 through 217090. As described above, packages may be used to represent hierarchy levels. Entities are discrete business elements that are used during a business transaction. Data types are used to type object entities and interfaces with a structure. For example, BankAccountStatementMessage message 217000 includes, among other things, BankAccountStatement 217004. Accordingly, heterogeneous applications may communicate using this consistent message configured as such.

Bank Account Statement Notification Interface

FIG. 218-1 through 218-12 illustrates one example logical configuration of BankAccountStatementMessage message 218000. Specifically, this figure depicts the arrangement and hierarchy of various components such as one or more levels of packages, entities, and datatypes, shown here as 218000 through 218278. As described above, packages may be used to represent hierarchy levels. Entities are discrete business elements that are used during a business transaction. Data types are used to type object entities and interfaces with a structure. For example, BankAccountStatementMessage message 218000 includes, among other things, BankAccountStatement 218038. Accordingly, heterogeneous applications may communicate using this consistent message configured as such.

The interface BankAccountStatementNotification is used to transmit information about turnovers of a bank account in a B2B process. The account statement serves as a legally binding notification instrument from the bank to its customers. If the customer raises no objection to the settlement results listed within a certain period, the results of the settlement carried out by the bank are thereby accepted by the customer. The interface BankAccountStatementNotification is motivated by the Purchase2 Pay and Order2Cash business scenarios. In both scenarios, a bank processes payment orders and the resulting bookings are booked on the bank account of a corporate customer in an account management component.

The account management component generates account statements in order to report all the movements and the start and end balance of the bank account held by the corporate. The account statements are sent from the bank to the PaymentProcessing component of the corporate customer using the BankAccountStatementNotification interface.

In the In-House Cash scenario the interface BankAccountStatementNotification is a shared service center scenario: The central payment service replaces the external banks in case of intra-group transactions or transactions with external business partners. In this case the In-House Cash center acts as a virtual bank and creates bank account statements for the affiliated companies.

A BankAccountStatementNotification is a notification about a bank account statement from the bank to the bank account holder. A BankAccountStatement is a legally binding statement of a bank about turnovers on a customers bank account. The structure of the message type BankStatementNotification is determined by the message data type BankAccountStatementMessage. The receiver of the BankAccountStatementNotification and the account holder can differ.

The Interface BankAccountStatementNotification_Out is used to send a BankAccountStatementNotification message asynchronously from a bank or central payment service to the bank statement receiver. The Interface BankAccountStatementNotification_In is used to receive an asynchronous BankAccountStatementNotification message.

The message data type BankAccountStatementNotificationMessage contains the BankStatement included in the business document and the business information that is relevant for sending a business document in a message. It contains the packages: MessageHeader package and BankAccountStatement package. The message data type BankAccountStatementNotificationMessage, therefore, provides the structure for the message type BankAccountStatementNotification, and the interfaces that are based on it.

A MessageHeader package groups the business information that is relevant for sending a business document in a message. It contains the entity: MessageHeader. A MessageHeader groups business information from the perspective of the sending application: Information to identify the business document in a message, Information about the sender, and (possibly) information about the recipient. The MessageHeader contains SenderParty and RecipientParty. It is of type GDT: BusinessDocumentMessageHeader, whereby the following elements of the GDT are used: ID and CreationDateTime. A SenderParty is the party responsible for sending a business document at business application level. The SenderParty is of type GDT: BusinessDocumentMessageHeaderParty. A RecipientParty is the party responsible for receiving a business document at business application level. The RecipientParty is of type GDT: BusinessDocumentMessageHeaderParty.

The BankAccountStatement Package groups the BankAccountStatement with its packages. It contains the packages: BankAccount Package, Item Package and BankAccountStatement. A BankAccountStatement is a legally binding statement of a bank about turnovers on a customers bank account. It contains the turnovers (items) for a defined date period or the new turnovers since the previous BankAccountStatement was created. Additionally it optionally contains the opening and closing balance. BankAccountStatement consists of header information and on or more items containing information concerning a single turnover. BankAccountStatement can contain the following elements: ID, IncomingCompanyPaymentFileRegisterFileUUID, IncomingCompanyPaymentFileRegisterFileID, Date, ValidityPeriod, OpeningBalanceAmount, ClosingBalanceAmount, TotalDebitAmount, TotalCreditAmount, ItemTotalNumberValue. ID is a Unique identifier for an account statement (statement number). ID is created by the bank and is of GDT type BusinessTransactionDocumentID. IncomingCompanyPaymentFileRegisterFileUUID is a universally unique identifier of an incoming payment file (stored in BO CompanyPaymentFileRegister). IncomingCompanyPaymentFileRegisterFileUUID is of GDT type UUID, IncomingCompanyPaymentFileRegisterFileID is an Identifier of an incoming payment file (stored in BO CompanyPaymentFileRegister). IncomingCompanyPaymentFileRegisterFileID is of GDT type CompanyPaymentFileRegisterFileID. Date is the date on which the statement was created and is of GDT type Date. ValidityPeriod is The validity period of the account statement and is of GDT type DatePeriod. OpeningBalanceAmount is an Amount in the account before the first transaction reported. OpeningBalanceAmount is equal to the ClosingBalanceAmount of the previous statement for this account and is of GDT type Amount. ClosingBalanceAmount is an Amount in the account after the last transaction reported. ClosingBalanceAmount is equal to the OpeningBalanceAmount of the next statement for this account and is of GDT type Amount. TotalDebitAmount is the total amount of debited items and is of GDT type Amount. TotalCreditAmount is the total amount of credited items and is of GDT type Amount. ItemTotalNumberValue is the total number of items of the actual bank statement and is of GDT type TotalNumberValue.

In some implementations, the ID (statement number) may be a positive natural number. Within a calendar year the ID may be continuous (i.e. without gaps) and unique. Numbering should start with 1. The OpeningBalanceAmount may be equal to the ClosingBalanceAmount of the previous statement for this account. In case the TotalDebitAmount is used then it may be equal to the total number of debit items reported in the respective bank statement. In case the TotalCreditAmount is used then it may be equal to the total number of credit items reported in the respective bank statement. In case ItemTotalNumberValue is used then it may be equal to the total number of bank statement items for the respective bank statement. At most one of the elements IncomingCompanyPaymentFileRegisterFileUUID and IncomingCompanyPaymentFileRegisterFileID may be filled.

The BankAccountStatementBankAccount Package groups the information about the bank account that is reported in the subsequent BankAccountStatement Item. It contains the entities: BankAccount. BankAccountStatementBankAccount (BankAccount) is the bank account whose activities are reported in this account statement. BankAccount is of type GDT: BusinessTransactionDocumentBankAccount.

The BankAccountStatementItem package groups the information concerning a single turnover. It contains the packages: Party Package, BankAccount Package, BusinessTransactionDocumentReference Package and PaymentExplanation Package.

A BankAccountStatementItem is a single turnover (credit or debit) on the bank account. Items are optionally accompanied by payment explanation items. If a payment transaction was the origin of the item then the party package optionally contains information concerning the different parties involved in the associated payment transaction. Apart from the payment transaction initiator and the payment transaction destinated party it can contain other parties (see Party—package).

The BankAccount package contains the bank details for the different parties involved in the payment transaction. The BankAccountStatement optionally contains explanations referring to individual invoices or credit memos (see PaymentExplanation-package).

BankAccountStatementItem can contain the following elements: ID, PaymentTransactionTypeCode, PaymentTransactionTypeDescription, BankValueDate, BankPostingDate, BankPostingTime, Amount, BankExchangeRate, BankChargeAmount, OriginalCurrencyAmount, OriginalBankChargeAmount, BankPaymentTransactionReferenceID, BankPrimaNotaNote, Note.

ID is a unique identifier for the item, normally the item number. ID is created by the bank and is of GDT type BusinessTransactionDocumentItemID. PaymentTransactionTypeCode Describes the type of the payment transaction that is reflected in this item and is of GDT type PaymentTransactionTypeCode. PaymentTransactionTypeDescription is a Textual description of the payment transaction type and is of GDT type Description. BankValueDate is the date from which the bank transaction is reflected in the interest statement and is of GDT type Date. BankPostingDate is a Bank's posting date for this item and is of GDT type Date. BankPostingTime is a Bank's posting time for this item and is of GDT type Time. Amount is an Amount of credit or debit in account currency and is of GDT type Amount. BankExchangeRate is an Exchange rate applied by the bank in case the transaction currency differs from account currency and is of GDT type ExchangeRate. BankChargeAmount is a Charge in account currency that the bank debited and deducted from the incoming payment resp. added to the outgoing payment and is of GDT type Amount. OriginalCurrencyAmount is an Original payment amount in original payment currency and is of GDT type Amount. OriginalBankChargeAmount is a Charge deducted be the payment transaction initiator's house bank in original payment currency and is of GDT type Amount. BankPaymentTransactionReferenceID is a Reference number created by the bank that identifies the payment transaction that is reflected in this item and is of GDT type PaymentTransactionReferenceID. BankPrimaNotaNote is a Bank's daybook note and is used for organizational distinctions and is of GDT type Note. Note is a Explanatory notes for the account holder and is of GDT type Note.

The BankAccountStatementItemParty Package (Party Package) groups the information concerning the parties involved in the payment transaction. It contains the entities:

PaymentTransactionInitiator Party, PaymentTransactionDestinatedParty, OriginalPaymentTransactionInitiator Party, FinalPaymentTransactionDestinatedParty.

In some implementations, PaymentTransactionInitiator Party and PaymentTransactionDestinatedParty are optional. OriginalPaymentTransactionInitiator Party and FinalPaymentTransactionDestinatedParty are optional and should only be used in case they are different from PaymentTransactionInitiator Party resp. PaymentTransactionDestinatedParty. In case the respective party is not filled in PaymentExplanation but it is supplied in the bank account statement's party package then it is also valid for this PaymentExplanation item.

PaymentTransactionInitiator Party is the party that initiated the payment (e.g. bank transfer or direct debit). PaymentTransactionInitiator Party is of type GDT: BusinessTransactionDocumentParty. Only the elements StandardID, PaymentInitiatorID, PaymentRecipientID, Address and ContactPerson are used.

PaymentTransactionDestinatedParty is the party that receives the payment in case of a bank transfer or whose account is debted in case of a direct debit. PaymentTransactionDestinatedParty is of type GDT: BusinessTransactionDocumentParty. Only the elements StandardID, PaymentInitiatorID, PaymentRecipientID, Address and ContactPerson are used.

The payment transaction can optionally be executed by the PaymentTransactionInitiator Party on behalf of the OriginalPaymentTransactionInitiator Party. Original PaymentTransaction Initiator Party is of type GDT: BusinessTransactionDocumentParty. Only the elements StandardID, PaymentInitiatorID, PaymentRecipientID, Address and ContactPerson are used. In some implementations, OriginalPaymentTransactionInitiator Party is optional and should only be supplied in case it is not equal to the PaymentInitiator Party.

The PaymentTransactionDestinatedParty optionally can receive a payment or be debited on behalf of the FinalPaymentTransactionDestinatedParty. FinalPaymentTransactionDestinatedParty is of type GDT: BusinessTransactionDocumentParty. Only the elements StandardID, PaymentInitiatorID, PaymentRecipientID, Address and ContactPerson are used. In some implementations, FinalPaymentTransactionDestinatedParty is optional and should only be supplied in case it is different from PaymentTransactionDestinatedParty.

The BankAccountStatementItemBankAccount-Package groups the information concerning the bank details of the parties involved in case the item resulted from a payment transaction. It contains the entities: PaymentTransactionInitiatorBankAccount, PaymentTransactionDestinatedBankAccount and PartnerBankAccount. In some implementations, All BankAccounts are optional, only one BankAccount may be filled because the respective offsetting account is always the BankAccountStatementBankAccount. If the bank is able to provide the information who initiated the payment, either PaymentTransactionInitiatorBankAccount or PaymentTransactionDestinatedBankAccount should be filled. In case the bank is unable to provide this information, PartnerBankAccount should be used instead.

PaymentTransactionInitiatorBankAccount is the bank account of the payment transaction initiator. PaymentTransactionInitiatorBankAccount is of type GDT: BusinessTransactionDocumentBankAccount.

PaymentTransactionDestinatedBankAccount is the bank account of the PaymentTransactionDestinatedParty, i.e. the party receiving the payment in case of a bank transfer or that is automatically debited in case of a direct debit. PaymentTransactionDestinatedBankAccount is of type GDT: BusinessTransactionDocumentBankAccount.

PartnerBankAccount is the bank account of the partner of a PaymentTransaction. PartnerBankAccount is of type GDT: BusinessTransactionDocumentBankAccount. PartnerBankAccount is filled in case the bank can not provide information about the payment transaction initiator.

The BankAccountStatementItem-BusinessTransactionDocumentReference Package groups references to business documents connected to the bank statement item (currently only a check number). It contains the entities: PaymentReference, PaymentOrderReference, ChequeReference, and BillOfExchangeReference. In some implementations, the BusinessTransactionDocumentReferences are optional.

PaymentReference is a reference to the payment transaction initiators payment document representing the actual payment. PaymentReference is of type GDT: BusinessTransactionDocumentReference. Only the element ID is used. A payment documents a cash flow. This contains at least the payment procedure, the payment currency, the payment amount, the payment date and the payment receiver. Besides other attributes the parties involved and their respective bank details can be contained.

PaymentOrderReference is a reference to the payment transaction initiators payment order that led to the payment transaction reflected in this account statement item. The payment order can be a single or collective payment order. PaymentOrderReference is of type GDT: BusinessTransactionDocumentReference. In some implementations, only the element ID is used.

ChequeReference contains the check number in case of check encashment. ChequeReference is of type GDT: BusinessTransactionDocumentReference. Only the element ID is used. BillOfExchangeReference is the reference to the bill of exchange (bill of exchange number) that was used for the payment. BillOfExchangeReference is of type GDT: BusinessTransactionDocumentReference. Only the element ID is used.

The BankAccountStatementItemPayment-Explanation-Item-Package groups the payment explanation items for the payment, in particular explaining the reason for the payment (e.g. by referring to one or more invoices), the payment amount (e.g. by giving the cash discount amounts) as well as if necessary the difference between the expected and the actual amount for the payment. It contains the entities: PaymentExplanationItem.

PaymentExplanationItem is supposed to explain the payment amount for the payee. It can refer to one or more invoices or other business documents relevant for the payment amount. This includes adjustments applied by the payer. The information contained is supposed to identify the respective invoices or credit memos in the payee's financial accounting. Additionally it should explain potential differences between the invoice and the payment amount. The parties contained in PaymentExplanationItem can differ from the respective parties of the BankAccountStatement. PaymentExplanationItem is of type GDT: PaymentExplanationItem. In some implementations, PaymentExplanationItem may not be filled for self initiated items.

In some implementations the following data types are used: Amount, PaymentTransactionTypeCode, PaymentTransactionTypeCode BusinessTransactionDocumentBankAccount, BusinessTransactionDocumentID, BusinessTransactionDocumentParty, Date, DatePeriod, Description, ExchangeRate, Identifier, MessageHeader, Note, Party, PaymentExplanationItem, Time, TotalNumbervalue.

LiquidityForecast Business Object

FIGS. 219-1 through 219-2 illustrate an example LiquidityForecast business object model 219000. Specifically, this model depicts interactions among various hierarchical components of the LiquidityForecast, as well as external components that interact with the LiquidityForecast (shown here as 219002 through 219012 and 219022 through 219038).

The LiquidityForecast Business Object can be a forecast of the medium- to long-term development of the liquidity situation of a company or a group of companies. The liquidity forecast can be comprised of inflows or outflows of liquidity that have already been realized and inflows and outflows of liquidity expected in the future. The liquidity forecast can be based on operational business processes (for example, sales orders, purchase orders, billing documents, receivables, incoming invoices, payables, payroll, and payments). The inflows or outflows of liquidity can either requested directly from the business object LiquidityForecast by responding to a query or entered using expected liquidity inflows or outflows (ExpectedLiquidityItem business object). The LiquidityForecast business object can be a part of the Cash Management process component.

The liquidity forecast can be used to analyze the liquidity situation. It can be based on receivables and payables from trading transactions and taxes, as well as payment transactions and manually entered liquidity items. Enhancements can include purchase orders, sales orders, and employee settlements. A LiquidityForecast consists of the payment forecast items and the source for these items. LiquidityForecast can be represented by the node LiquidityForecast.

The LiquidityForecast business object can be involved in the Cash Management_Due Item ProcessingProcess Integration Model. The Interface Liquidity Information Out can be a part of the Cash Management_Due Item Processing Process Integration Model. The model is an interface to request and receive data for the liquidity forecast. The Operation CashManagementLiquidityInformationOutQueryLiquidityInformation can send the query and accept the liquidity items delivered by the process component. The operation can be based on the message types Liquidity Information Query and Liquidity Information Response derived from the LiquidityForecast business object. The operation can result in changes to the root node, source node, and the item node of the LiquidityForecast business object. Other business objects may not be affected by the operation.

LiquidityForecast Business Object

The LiquidityForecast business object 219014 of the medium to long-term development of the liquidity situation of a company or a group of companies. The root node may include the status as well as control and administration data to create the liquidity forecast. The liquidity forecast may be complete or restricted using various parameters, such as companies, currencies, and liquidity categories. The elements located directly at the LiquidityForecast node are defined by the data type: LiquidityForecastElements. The elements include UUID which is a universal unique identifier of a LiquidityForecast that may be based on the GDT UUID. The elements also include ID which is a unique identifier of a LiquidityForecast that may be based on GDT BusinessTransactionDocumentID. The elements also include CashLiquidityFunctionalUnitUUID which is a universal unique identifier of the FunctionalUnit working on the LiquidityForecast that may be based on GDT UUID. The FunctionalUnit referenced has to be able to execute the organizational function Cash/Liquidity Management. For example, the element OrganisationalFunctionCode in one of the instances of the node FunctionalUnitAttributes in the FunctionalUnit references may have the value "17" for Cash/Liquidity Management.

The elements further include SystemAdministrativeData which is an Administrative data recorded by the system. This data may include system users and change dates/times. This may be based on the GDT SystemAdministrativeData. The elements also include ProfileCode which can specify the template used to create the LiquidityForecast. This may be based on GDT LiquidityForecastProfileCode. The elements also include Status which may be based on IDT LiquidityForecastStatusElements.

LiquidityForecastStatusElements can be an IDT and it may include DataCollectingProcessingStatusCode, DataSourceDataCompletenessStatusCode, DataCompletenessStatusCode, AcceptanceStatusCode, and LifeCycleStatusCode. The DataCollectingProcessingStatusCode may contain status information regarding the structure of the LiquidityForecast. This may be based on GDT ProcessingStatusCode. The DataSourceDataCompletenessStatusCode may ccountain status information regarding the completeness of the requested liquidity data. This may be based on GDT DataCompletenessStatusCode. The AcceptanceStatusCode may contain status information for further use of the liquidity forecast. This may be based on GDT AcceptanceStatusCode. The LifeCycleStatusCode may contain information on the final status of the LiquidityForecast. This may be based on GDT LiquidityForecastLifeCycleStatusCode.

The following composition relationships to subordinate nodes can be formed with the Item 219016, Source 219018 and AccessControlList 219020: Item 1:cn, Source1:cn, DO: AccessControlList 1:1.

An inbound aggregation relationship exists from the business object Identity/node Root. The CreationIdentity relationship (1:cn) is defined as the identity that created the LiquidityForecast. The LastChangeIdentity relationship (c:cn) is defined as the identity that changed the LiquidityForecast in the last time.

An inbound association relationship exists from the business object FunctionalUnit/node FunctionalUnit. The CashLiquidityFunctionalUnit relationship (c:cn) identifies the Functional Unit which is working on the LiquidityForecast.

Various enterprise service infrastructure actions may be performed. The actions include StartDataCollection, CheckDataCollectionCompletion, Accept, Reject, and Refresh. The StartDataCollection initiates the request and collection of liquidity information from different sources. By requesting data, the query of the Payment Register business object and the query of the Expected Liquidity Item business object are called. As such, the Liquidity Information Query is sent to the process components that provide data for the liquidity forecast. The LiquidityForecast has been created and no liquidity items have been requested yet. There are no changes to the object, other objects, or other parameters. The DataCollectingProcessingStatus of the LiquidityForecast may be assigned the value "In Process." The action may be performed by the UI or the business object itself (automatic start).

The CheckDataCollectionCompletion checks whether the process of collecting the requested liquidity information has been completed. For example, the check can verify the LiquidityForecast has been created and the liquidity items were requested (e.g., LiquidityForecastDataCollectionProcessingStatus has the status "In Process"). There are no changes to the object or parameters. Depending on the result of the check (determination of the DataSourceDataCompletenessStatus), the DataCollectingProcessingStatus has the value "Finished" or retains the value "In Process". The status "Finished" is set if either all DataSourceQueryResponseDataCompletenessStatus have the value "Complete" or a timeout has occurred. The action can be started manually or automatically (periodically).

The Accept accepts the liquidity forecast. The Accept action can be performed if the AcceptanceStatus has the value "Pending" and the DataCollectionProcessingStatus has the value "Finished." A change may be performed on the object, such as adjusting the SystemAdministrativeData. A change in status may include the liquidity forecast being accepted. As such, the AcceptanceStatus gets the value "Accepted." The action may be performed by the UI.

The Reject action rejects the liquidity forecast. The Reject action can be performed if the AcceptanceStatus has the value "Pending" and the DataCollectionProcessingStatus has the value "Finished." A change to the object can include adjusting the SystemAdministrativeData. The liquidity forecast is then rejected and the AcceptanceStatus gets the value "Rejected." The action may be performed by the UI.

The Refresh action refreshes the liquidity forecast by requesting current data from the payment register. The LiquidityForecast can be modified (the LifeCycleStatus is "In Modification"). Changes can be made to the liquidity items. The action can be started manually at the UI or automatically.

A QueryByProfileAndStatus query may be performed. The QueryByProfileAndStatus provides a list of liquidity forecasts that were created with the specified profile and have the specified status. The query elements are defined by the data type LiquidityForecastProfileandStatusQueryElements. These elements are the ProfileCode of type GDT LiquidityForecastProfileCode and LifeCycleStatusCode of type GDT LiquidityForecastLifeCycleStatusCode.

Source

The Source can be the information on which the LiquidityForecast is based together with status information regarding the transfer of this data. The process component can be the sender of the liquidity items of its area of responsibility, for example, liquidity items from outgoing invoices. It can be the recipient of the request to provide liquidity data. The elements located directly at the node Source can be defined by the data type: LiquidityForecastSourceElements. These elements include UUID, ProcessComponentCode, CompletionDateTime, and QueryResponseDataCompletenessStatusCode. The UUID is a universally unique identifier of a LiquidityForecastSource. This may be based on GDT UUID. The ProcessComponentCode is the process component can be the sender of the liquidity data. It can be the recipient of the request to transfer liquidity data. This may be based on GDT ProcessComponentCode. The CompletionDateTime is the time at which the CompletenessStatus was set. This may be based on GDT DateTime having a Qualifier "Completion." The QueryResponseDataCompletenessStatusCode may contain status information on the completeness of the transfer of liquidity items by the sending process component. This may be based on GDT DataCompletenessStatusCode.

Enterprise service infrastructure actions can be performed. For example, a CompleteDataCollection action may create a receipt of liquidity information from a source. The action can be performed if liquidity items were requested (e.g., LiquidityForecastDataCollectionProcessingStatus has the status "In Process") and the data is not complete for this source (e.g., DataSourceDataCompletenessStatus has the value "Incomplete"). In the DataSourceDataCompletenessStatus value, the value is set to "Completed", that is, the requested data was received completely. The action is triggered by the inbound agent of the response message.

Queries

A QuerybyStatus can be performed to provide a list of all sources that have the status specified. The query elements are defined by the data type LiquidityForecastSourceStatusQueryElements. These elements include QueryResponseDataCompletenessStatus of type GDT DataCompletenessStatusCode.

Item

The Item can be a realized or expected inflow or outflow of liquidity of a company that can be examined in the LiquidityForecast on which one operational business process or a combination of similar operational business processes are based. Relevant operational business processes may include sales orders, purchase orders, billing documents, receivables, incoming invoices, payables, payroll, and payments. It may be possible to group similar (from the liquidity forecast perspective) business transactions to one item within a component (for example, group orders from domestic customers to one item for which receipt of money is expected on the same day).

The elements located at the node Item can be defined by the data type: LiquidityForecastItemElements. These elements include UUID, ID, BusinessTransactionDocumentReference, ProcessComponentCode, CompanyUUID, CompanyID, SystemAdministrativeData, LiquidityItemGroupCode, LiquidityItemOperationalProcessProgressCategoryCode, LiquidityItemBusinessTransactionDocumentStatusCategoryCode, PaymentRegisterItemUUID, PaymentFormCode, HouseBankAccountUUID, CashStorageUUID, LiquidityItemDescription, TransactionCurrencyAmount, OperationalCurrencyAmount, ValueDateTime, and ActivationStatusCode.

The UUID is a universally unique identifier of a LiquidityForecastItem. This may be based on GDT UUID. The ID is a unique identifier of a LiquidityForecastItem. This may be based on GDT BusinessTransactionDocumentItemID. The BusinessTransactionDocumentReference can be a reference to the Business Transaction Document that can create this Item. A restriction can be included if the item is based on an aggregation of business transactions. The BusinessTransactionDocumentReference is either filled with the reference to the aggregation business transaction or not filled at all. This may be based on GDT BusinessTransactionDocumentReference, where the included TypeCode is restricted to the values 081=PaymentOrder, 060=IncomingCheque, 022=ChequeDeposit, 015=HouseBankStatement, 080=PaymentAdvice, 021=CashTransfer, 020=CashPayment, 023=ClearingHousePaymentOrder, 067=ExpectedLiquidityItem, 037=DuePayment, 127=SupplierInvoice, and 028=CustomerInvoice. The ProcessComponentCode is the process component can be the sender of the liquidity data. It can also be the recipient of the request to transfer liquidity data. This may be based on GDT ProcessComponentCode. The CompanyUUID is a universal unique identifier of the company to which the item belongs. This may be based on GDT UUID. The CompanyID is an internal identifier of the company to which the item belongs. This may be based on GDT OrganisationalCentreID. The SystemAdministrativeData is an Administrative data recorded by the system. This data may include system users and change dates/times. This may be based on GDT SystemAdministrativeData. The LiquidityItemGroupCode can be a coded representation of the group to which the item belongs. Grouping occurs using business characteristics from the base business process. This may be based on GDT LiquidityItemGroupCode. The LiquidityItemOperationalProcessProgressCategoryCode can be a coded representation of the type of the processing progress of the base business process. This may be based on GDT LiquidityItemOperationalProcessProgressCategoryCode. The LiquidityItemBusinessTransactionDocumentStatusCategoryCode can be a coded representation of the type of the status of the base business process. This may be based on GDT LiquidityItemBusinessTransactionDocumentStatusCategoryCode. The PaymentRegisterItemUUID is a universal unique identifier of a PaymentRegisterItem. This may be based on GDT UUID. The PaymentFormCode can be a coded representation of the payment form of the business process based on the Item. This may be based on GDT PaymentFormCode. The HouseBankAccountUUID is a house bank account at which the inflow or outflow of liquidity took place or will take place. This may be based on GDT UUID. The CashStorageUUID is a storage location for cash in which the inflow or outflow of liquidity took place or will take place. This may be based on GDT UUID.

The LiquidityItemDescription can contain a description of the item. This may be based on GDT LiquidityItemDescription. The TransactionCurrencyAmount can contain the amount of the item in transaction currency. This may be based on GDT Amount with a Qualifier "TransactionCurrencyAmount." The OperationalCurrencyAmount can contain the amount of the Item in the Cash Management display currency (e.g., currency in which the operational business of the company is controlled). This may be based on GDT Amount, Qualifier: OperationalCurrencyAmount. The ValueDateTime can be realized or expected value data of the item. This may be based on GDT GLOBAL_DateTime with the Qualifier "Value." The ActivationStatusCode can contain status information on the item. This may be based on GDT ActivationStatusCode.

An inbound association relationship from business object Company/node Company exists for Company with a 1:cn relationship. The liquidity item belongs to the Company. A c:cn relationship exists from business object Expected Liquidity Item to Expected Liquidity Item. The Expected Liquidity Item is the liquidity inflow or outflow from which this liquidity item originates. A c:cn relationship exists from business object Payment Register/node Item to the Payment Register Item. The Payment Register Item is the payment from which this liquidity item originates. A c:cn relationship exists from business object House Bank Account/node House Bank Account to House Bank Account. The House Bank Account is the house bank account to which this liquidity item refers. A c:cn relationship exists from business object CashStorage/node Cash Storage to Cash Storage. Cash Storage is the storage location of cash to which this liquidity item refers.

An integrity condition may apply, such as a liquidity item cannot refer to a house bank account and storage location for cash at the same time.

Enterprise service infrastructure actions may include deactivate and activate. Deactivate can deactivate an item in the liquidity forecast. Each LiquidityForecastItem contributes on a value basis to the liquidity forecast. Deactivating an item means that this item no longer contributes on a value basis to the liquidity forecast. By reactivating the item, it can be included on a value basis in the liquidity forecast. A precondition may include the item is contained in the liquidity forecast. The LiquidityForecast may be modified (e.g., LiquidityForecastLifeCycleStatus has the status "In Modification"). A change to the object may include an indication to the item as inactive and in some implementations, the system administrative data is updated. In ActivationStatus, the status is set to the value "Inactive." The action is performed by the UI.

Activate may activate an inactive item in the liquidity forecast. Each LiquidityForecastItem contributes on a value basis to the liquidity forecast. Deactivating an item means that this item no longer contributes on a value basis to the liquidity forecast. Subsequent activation means that the item can be included on a value basis in the liquidity forecast again. The item is contained in the liquidity forecast. The LiquidityForecast may be modified (S&AM: LiquidityForecastLifeCycleStatus has the status "In Modification"). The item is inactive (e.g., ActivationStatus has the value "Inactive"). Changes to the object may include a deactivation reversal and system administrative data updates. In LifecycleStatus, the status is set to the value "Active." The action is performed by the UI.

AccessControlList

The AccessControlList can be a list of access groups that have access to a LiquidityForecast during a validity period.

FIG. 220 illustrates one example logical configuration of LiquidityInformationMessage message 220000. Specifically, this figure depicts the arrangement and hierarchy of various components such as one or more levels of packages, entities, and datatypes, shown here as 220000 though 220014. As described above, packages may be used to represent hierarchy levels. Entities are discrete business elements that are used during a business transaction. Data types are used to type object entities and interfaces with a structure. For example, LiquidityInformationMessage message 220000 includes, among other things, LiquityInformation 22004. Accordingly, heterogeneous applications may communicate using this consistent message configured as such.

FIG. 221-1 through 221-4 illustrates one example logical configuration of LiquidityInformationMessage message 221000. Specifically, this figure depicts the arrangement and hierarchy of various components such as one or more levels of packages, entities, and datatypes, shown here as 221000 through 221116. As described above, packages may be used to represent hierarchy levels. Entities are discrete business elements that are used during a business transaction. Data types are used to type object entities and interfaces with a structure. For example, LiquidityInformationMessage message 221000 includes, among other things, LiquidityStatusItem 221038. Accordingly, heterogeneous applications may communicate using this consistent message configured as such.

PaymentAdvice Business Object

FIG. 222 illustrates an example PaymentAdvice business object model 222002. Specifically, this model depicts interactions among various hierarchical components of the PaymentAdvice, as well as external components that interact with the PaymentAdvice (shown here as 222000, 222004 through 222012 and 222020 through 222026).

The PaymentAdvice business object can be a notification of a payment transaction by a business partner that specifies reasons. In some examples, the payment transaction can be a payment, an automatic debit, or a direct debit. Some reasons for a payment can be specified with reference to one or more business documents, such as contracts, invoices, credit memos, or sales orders. For example, the payment amounts can be broken down for each business document and explain a difference between the expected and the actual payment amount.

In some implementations, notifications of payment transactions to a business partner is viewed as correspondence and triggered by the PaymentOrder business object. Therefore, there is not a separate business object for outgoing payment advices.

In some implementations, the PaymentAdvice business object is part of the PaymentProcessing process component in the Payment DU. For example, the PaymentAdvice can be represented by the PaymentAdvice 222002 node. The PaymentAdvice business object can be involved in the process integration models, such as a Payment Processing at Business Partner Payment Processing.

The PaymentAdvice can include a Service Interface Incoming Payment Advicing In. In some examples, the Service Interface Incoming Payment Advicing In can have a Technical name of PaymentProcessingIncomingPaymentAdvicingIn. In some implementations, the Payment Advicing In service interface is part of a Payment Processing at Business Partner_Payment Processing process integration models.

In certain implementations, the Payment Processing at Business Partner_Payment Processing process integration models can include operations for creating a payment advice. In some examples, a PaymentProcessingIncomingPaymentAdvicingIn.CreatePaymentAdvice can create a payment advice that was sent from a business partner or a house bank. The advice can include information regarding payments that will be made in the future. The operation can be based on the message type PaymentAdviceNotification (e.g., derived from the PaymentAdvice business object).

A PaymentAdvice can be a notification of a payment transaction by a business partner that specifies reasons. In some examples, the PaymentAdvice can include some elements located at the PaymentAdvice node and can be defined by the PaymentAdviceElements data type. For example, a UUID can be a universally unique identifier of a payment advice. The UUID can be a GDT of type UUID. For example, the ID can be a unique identifier of a payment advice that is assigned by the receiving company, and can be a GDT of type BusinessTransactionDocumentID. For example, the BusinessPartnerPaymentAdviceID can be a unique identifier of a payment advice in connection with a business partner. This is assigned by the sender of the payment advice and referenced in the usage text of the payment, and can be a GDT of type BusinessTransactionDocumentID. For example, the CompanyUUID can be a universally unique identifier of the company that has a payment transaction notified, and can be a GDT of type UUID. For example, the CompanyID can be an identifier of the company that has a payment transaction notified, and can be a GDT of type OrganisationalCentreID. For example, the HouseBankAccountUUID can be a universally unique identifier of a house bank account for which the payment transaction is notified. It can be incoming (for example, bank transfer initiated by the business partner) and outgoing payments (for example, direct debit initiated by the business partner). A house bank account is involved in both cases, and can be a GDT of type UUID. For example, the HouseBankAccountInternalID can be an unique identifier of a house bank account in connection with the CompanyID, and can be a GDT of type BankAccountInternalID. For example, the HouseBankAccount can include bank details of the house bank account, and can be an IDT of type PaymentAdviceHouseBankAccount. For example, the ID can be a bank account number (e.g., Basic Bank Account Number, BBAN). An account number that is assigned by the account-managing bank. It uniquely identifies a bank account in most countries only in combination with the entry of the bank, and can be a GDT of type BankAccountID. For example, the IDCheckDigitValue can check digit for the bank account number (e.g., the ID), and can be a GDT of type BankAccountIDCheckDigitValue. For example, the StandardID can be International bank account number (e.g., IBAN), and can be a GDT of type BankAccountStandardID. For example, the TypeCode can indicate a type of account, and can be a GDT of type BankAccountTypeCode. For example, the CurrencyCode can indicate an account currency, and can be a GDT of type CurrencyCode. For example, the HolderName can be Name of account holder, and can be a GDT of type BankAccountHolderName. For example, the Bank can include bank data for the house bank account, and can be an IDT of type PaymentAdviceBank. For example, the Name can be a name of bank, and can be a GDT of type MEDIUM_Name. For example, the StandardID can be a Bank Identification Code (BIC) of the Society for Worldwide Interbank Financial Telecommunications (e.g., S.W.I.F.T.), and can be a GDT of type BankStandardID. For example, the RoutingID can be the routing number of a bank in a clearing system (for example, bank number, sort code, ABA routing number, CHIPS participant number). The maximum length and structure of the ID depends on the clearing system, and can be a GDT of type BankRoutingID. For example, the RoutingIDTypeCode can be a type of a bank number or routing number, and can be a GDT of type BankRoutingIDTypeCode. For example, the CountryCode can indicate a bank country (e.g., the country in which the country to which this clearing system belongs is entered here), and can be a GDT of type CountryCode. If the bank is a member of a national clearing system, the BusinessPartnerUUID can be a universally unique identifier of the business partner that is involved in the payment transaction as the second party in addition to the company named in CompanyID, and can be a GDT of type UUID. For example, the BusinessPartnerID can be an internal identifier of the business partner at the company that is involved in the payment transaction as the second party in addition to the company named in CompanyInternalID, and can be a GDT of type BusinessPartnerInternalID. For example, the BusinessPartnerName can be Name of the business partner at the company that is involved in the payment transaction as the second party in addition to the company named in CompanyInternalID, and can be a GDT of type LANGUAGEINDEPENDENT_LONG_Name. For example, the IncomingCompanyPaymentFileRegisterFileUUID can be a universally unique identifier of an incoming payment file (e.g., stored in BO CompanyPaymentFileRegister), and can be a GDT of type UUID. For example, the IncomingCompanyPaymentFileRegisterFileID can be Identifier of an incoming payment file (e.g., stored in BO CompanyPaymentFileRegister), and can be a GDT of type CompanyPaymentFileRegisterFileID. For example, the CashLiquidityFunctionalUnitUUID can be a universally unique identifier of the FunctionalUnit working on the PaymentAdvice.

In various implementations, the FunctionalUnit referenced can be able to execute the organizational function Cash/Liquidity Management, e.g., the element OrganisationalFunctionCode in one of the instances of the node FunctionalUnitAttributes in the FunctionalUnit references can have the value "17" for Cash/Liquidity Management, and can be a GDT of type UUID. For example, the PaymentManagementFunctionalUnitUUID can be a universally unique identifier of the FunctionalUnit working on the PaymentAdvice. In various implementations, the FunctionalUnit referenced can be able to execute the organizational function Payment Management (e.g., the element OrganisationalFunctionCode in one of the instances of the node FunctionalUnitAttributes in the FunctionalUnit references can have the value "22" for Payment Management), and can be a GDT of type UUID. For example, the SystemAdministrativeData can be a documentation of changes to the payment advice (for example, manual correction for entry errors) specifying the user and time stamp, and can be a GDT of type SystemAdministrativeData. For example, the AutomaticallyGeneratedIndicator can be Indicator for electronically entered or created advices, and can be a GDT of type Indicator (e.g., with Qualifier: AutomaticallyGenerated). For example, the TypeCode can be a payment advice type. Some permitted values can include "payment advice", "credit memo advice" and "debit advice", and can be a GDT of type PaymentAdviceTypeCode. For example, the Date can be a date of the Payment Advice set by the issuer (e.g., Partner or House Bank), and can be a GDT of type Date. For example, the PaymentForm Code can be Payment form (for example, by check, bank transfer, bill of exchange).

In some implementations, the BankTransferReference can be a reference to a bank transfer if it concerns the notification of a bank transfer, and can be a GDT of type BusinessTransactionDocumentReference. For example, the DirectDebitReference can be a reference to a direct debit if it concerns the notification of a direct debit (e.g., debit memo procedure/direct debiting procedure), and can be a GDT of type BusinessTransactionDocumentReference. For example, the ChequeReference can be a reference to a check if it concerns a payment by check, and can be a GDT of type BusinessTransactionDocumentReference. For example, the BillOfExchangeReference can be a reference to a bill of exchange if it concerns a payment by bill of exchange, and can be a GDT of type BusinessTransactionDocumentReference. For example, the ChequeDepositReference can be a reference to a check deposit if it concerns the notification of a check deposit, and can be a GDT of type BusinessTransactionDocumentReference. For example, the BillOfExchangePresentationReference can be a reference to a bill of exchange presentation if it concerns the notification of a bill of exchange presentation, and can be a GDT of type BusinessTransactionDocumentReference. For example, the BaseBusinessTransactionDocumentReference can be a reference to the business document that generated the payment advice, and can be a GDT of type BusinessTransactionDocumentReference. In certain implementations, the The BaseBusinessTransactionDocumentReference element may be used in the Cash Transfer scenario. For example, the AccountDebitIndicator can be an indicator of whether the recipient is notified of an account debit or account credit, and can be a GDT of type AccountDebitIndicator. For example, the PaymentDate can be an execution date of the payment, and can be a GDT of type Date, Qualifier: Payment. For example, the PaymentTransactionInitiatorBankAccountValueDate can be an expected value date at the bank account of the payment transaction initiator, and can be a GDT of type Date (e.g., with a Qualifier Value). For example, the PaymentTransactionDestinatedBankAccountValueDate can be an expected value date at the bank account of the payment transaction recipient, and can be a GDT of type Date, Qualifier Value. For example, the BillOfExchangeDueDate can be a bill of exchange due date for payment with bill of exchange, and can be a GDT of type Date, Qualifier Due. For example, the EffectivePaymentAmount can be an effective payment amount. In some implementations, the EffectivePaymentAmount can differ from the expected amount (for example, invoice), and can be a GDT of type Amount, Qualifier: Payment. For example, the EffectiveGrossAmount can be an effective gross amount of the notified payment. It can differ from the expected amount (for example, invoice), and can be a GDT of type Amount, Qualifier Gross. For example, the EffectiveCashDiscountAmount can be an effective deducted cash discount amount of the payment. In certain implementations, the EffectiveCashDiscountAmount can differ from the expected cash discount amount, and can be a GDT of type Amount, Qualifier: CashDiscount. For example, the EffectiveWithholdingTaxAmount can be an effective withholding tax. In various implementations, the EffectiveWithholdingTaxAmount can differ from the expected withholding tax, and can be a GDT of type Amount, Qualifier: WithholdingTax. For example, the EffectiveBankFeeAmount can be effective fees with which the bank debits the recipient and which are deducted from the payment amount, and can be a GDT of type Amount, Qualifier Fee. For example, the BusinessPartnerBankAccount can be involved bank details of the business partner who has initiated the payment transaction, and can be an IDT of type PaymentAdviceBusinessPartnerBankAccount. For example, the ID can be a bank account number (e.g., Basic Bank Account Number, BBAN). In some examples, the account number that is assigned by the account-managing bank. The ID can uniquely identify a bank account in most countries only in combination with the entry of the bank. The ID can be a GDT of type BankAccountID. For example, the IDCheckDigitValue can check digit for the bank account number (ID), and can be a GDT of type BankAccountIDCheckDigitValue. For example, the StandardID can be International bank account number (e.g., IBAN), and can be a GDT of type BankAccountStandardID. For example, the TypeCode can be a type of account, and can be a GDT of type BankAccountTypeCode. For example, the CurrencyCode can be an account currency, and can be a GDT of type CurrencyCode. For example, the HolderName can be Name of account holder, and can be a GDT of type BankAccountHolderName. For example, the Bank can include bank data for the business partner bank account, and can be an IDT of type PaymentAdviceBank. For example, the Name can be a name of bank, and can be a GDT of type MEDIUM_Name. For example, the StandardID can be Bank Identification Code (BIC) of the Society for Worldwide Interbank Financial Telecommunications (S.W.I.F.T.), and can be a GDT of type BankStandardID. For example, the RoutingID can be the routing number of a bank in a clearing system (for example, bank number, sort code, ABA routing number, CHIPS participant number). In some examples, the maximum length and structure of the ID depends on the clearing system, and can be a GDT of type BankRoutingID. For example, the RoutingIDTypeCode can be Type of a bank number or routing number, and can be a GDT of type BankRoutingIDTypeCode. For example, the CountryCode can indicate a bank country, such as, the country in which the previously identified bank goes about its business. If the bank is a member of a national clearing system, the country to which this clearing system belongs is entered here, and can be a GDT of type CountryCode. For example, the Note can be an explanatory note for payment, such as a note to payee, and can be a GDT of type Note. For example, the Status can be the current step in the life cycle of the PaymentAdvice. In various examples, the LifeCycleStatus can include the information on the lifecycle status of the PaymentAdvice, and can be a GDT of type PaymentAdviceLifeCycleStatusCode.

In some embodiments, composition relationships to subordinate nodes, such as a DO of type PaymentExplanation 222016 with a cardinality of 1:c, a DO of type AttachmentFolder 222018 with cardinality of 1:c, and a DO of type AccessControlList with cardinality of 1:1. The PaymentAdvice 222014 can include inbound aggregation relationships from business object Company or node Root. For example, the Company can have a cardinality of 1:cn. For example, the PaymentAdvice can belong to one company. The PaymentAdvice can include inbound aggregation relationships from business object BusinessPartner or node Root. For example, the Partner can have a cardinality relationship of c:cn. In some examples, the PaymentAdvice can be initiated by one business partner or by none. The PaymentAdvice can include inbound aggregation relationships from the business object HouseBankAccount or node Root. For example, the HouseBankAccount can have a cardinality relationship of c:cn. In some examples, the PaymentAdvice can be assigned to one house bank account or to none. The PaymentAdvice can include inbound aggregation relationships from the business object CompanyPaymentFileRegister or node IncomingFile. For example, the IncomingPaymentFile can have a cardinality relationship of c:cn. In some examples, the PaymentAdvice can be assigned to one incoming payment file or to none.

The PaymentAdvice can include inbound aggregation relationships from business object Identity or node Root. For example, the CreationIdentity can have a cardinality relationship of 1:cn. In some examples, the CreationIdentity can be an identity that created the PaymentAdvice. For example, the LastChangeIdentity can have a cardinality relationship of c:cn. For example, the LastChangeIdentity can be an identity that changed the PaymentAdvice in the last time.

The PaymentAdvice can include Inbound association relationships from the business object (or node) FunctionalUnit. For example, the CashLiquidityFunctionalUnit can have a cardinality of c:cn. In some examples, the CashILiquidityFunctionalUnit can identify the Functional Unit which is working on the PaymentAdvice. For example, the PaymentManagementFunctionalUnit can have a cardinality of c:cn. For example, the PaymentManagementFunctionalUnit can identify the Functional Unit which is working on the PaymentAdvice In various implementations, if it is a partner advice (e.g., TypeCode is "payment advice"), then a BusinessPartnerID or a BusinessPartnerUUID can be used. For bank advices (e.g., TypeCode is "credit memo advice" "or "debit advice"), the BusinessPartnerID or BusinessPartnerUUID can be optionally used. In some examples, one of the elements BankTransferReference, DirectDebitReference, ChequeReference, ChequeDepositReference, BillOfExchangeReference, and BillOfExchangePresentationReference can be filled. In some examples, if BankTransferReference is filled, AccountDebitIndicator=false. In some examples, if DirectDebitReference is filled, AccountDebitIndicator=true. In some examples, if ChequeReference is filled, AccountDebitIndicator=false. In some examples, if ChequeDepositReference is filled, AccountDebitIndicator=false and PaymentAdviceTypeCode="credit memo advice". In some examples, if BillOfExchangePresentationReference is filled, PaymentAdviceTypeCode="credit memo advice".

In some examples, the PaymentAdvice can include enterprise service infrastructure actions. The Release (S&AM action) that can release a payment advice for follow-on processes (e.g., allocation of the payment, generation of a register entry). For example, the Release can be called by a user after check. The action can be performed if the business object can have the status "new". In some examples, an instance of the PaymentAllocation business object can be created and a PaymentRegister.SplitItem can be generated for the payment advice using the action. After performing the action, the PaymentAdvice sets the status of the business object to "released". In some implementations, the action can be called by the UI.

In some examples, the PaymentAdvice can include enterprise service infrastructure actions. The Cancel (S&AM action) that can be a cancellation of a payment advice due to a message from the sender of the advice. The action can be performed if the business object can have the status "confirmed" or "released". In some examples, PaymentAllocation is canceled using the action. In some implementations, the action can be triggered by the UI.

In some examples, the PaymentAdvice can include enterprise service infrastructure actions. The ConfirmPayment (S&AM action) that can confirms a payment advice internally (the notified payment has arrived or already exists). The action can be performed if the business object can have the status "released". After performing the action, the PaymentAdvice sets the status of the business object to "confirmed". In some implementations, the action can be called by the PaymentAllocation business object.

In some examples, the PaymentAdvice can include enterprise service infrastructure actions. The CancelPaymentConfirmation (S&AM action) that can cancels the internal confirmation of a payment advice (for example, if the allocation of a payment was incorrect). The action can be performed if the business object can have the status "confirmed". After performing the action, the PaymentAdvice sets the status of the business object to "released". In some implementations, the action can be called by the PaymentAllocation business object.

In some implementations, the PaymentAdvice can include a QueryByBusinessPartnerAdviceID. For example, the QueryByBusinessPartnerAdviceID can provide a list of PaymentAdvices for an identifier that is assigned by a business partner. For example, the query elements can be defined by the data type PaymentAdviceBusinessPartnerAdviceIDQueryElements. These elements can include BusinessPartnerPaymentAdviceID, BusinessPartnerUUID, BusinessPartnerID, and Status. In some examples, the BusinessPartnerPaymentAdviceID can be a GDT of type BusinessTransactionDocumentID. In some examples, the BusinessPartnerUUID can be a GDT of type UUID. In some examples, the BusinessPartnerID cam be a GDT of type BusinessPartnerInternalID. In some examples, the Status can be an IDT of type PaymentAdviceStatus, to be approved.

In some implementations, the PaymentAdvice can include a QueryByElements. For example, the QueryByElements can provide a list of all PaymentAdvices that meet the attributes specified. For example, the query elements can be defined by the data type PaymentAdviceElementsQueryElements. In some implementations, the UUID can be a GDT of type UUID. In some implementations, the ID can be a GDT of type BusinessTransactionDocumentID. In some implementations, the BusinessPartnerPaymentAdviceID can be a GDT of type BusinessTransactionDocumentID. In some implementations, the CompanyUUID can be a GDT of type UUID. In some implementations, the CompanyID can be a GDT of type OrganisationalCentreID. In some implementations, the HouseBankAccountUUID can be a GDT of type UUID. In some implementations, the HouseBankAccountInternalID can be a GDT of type BankAccountInternalID. In some implementations, the BusinessPartnerUUID can be a GDT of type UUID. In some implementations, the BusinessPartnerID can be a GDT of type BusinessPartnerInternalID. In some implementations, the SystemAdministrativeData can be a GDT of type SystemAdministrativeData. In some implementations, the AutomaticallyGeneratedIndicator can be a GDT of type Indicator (e.g., with Qualifier: AutomaticallyGenerated). In some implementations, the TypeCode can be a GDT of type PaymentAdviceTypeCode. In some implementations, the PaymentFormCode can be a GDT of type PaymentFormCode. In some implementations, the BankTransferReference can be a GDT of type BusinessTransactionDocumentReference. In some implementations, the DirectDebitReference can be a GDT of type BusinessTransactionDocumentReference. In some implementations, the ChequeReference can be a GDT of type BusinessTransactionDocumentReference. In some implementations, the BillOfExchangeReference can be a GDT of type BusinessTransactionDocumentReference. In some implementations, the ChequeDepositReference can be a GDT of type BusinessTransactionDocumentReference. In some implementations, the BillOfExchangePresentationReference can be a GDT of type BusinessTransactionDocumentReference. In some implementations, the BaseBusinessTransactionDocumentReference can be a GDT of type BusinessTransactionDocumentReference. In some implementations, the Account- DebitIndicator can be a GDT of type AccountDebitIndicator. In some implementations, the PaymentDate can be a GDT of type Date (e.g., with Qualifier: Payment). In some implementations, the PaymentTransactionInitiatorBankAccountValueDate Optional can be a GDT of type Date (e.g., with Qualifier: Value). In some implementations, the PaymentTransactionDestinatedBankAccountValueDate Optional can be a GDT of type Date (e.g., with Qualifier: Value. In some implementations, the BillOfExchangeDueDate can be a GDT of type Date (e.g., with Qualifier Due). In some implementations, the EffectivePaymentAmount can be a GDT of type Amount (e.g., with Qualifier Payment). In some implementations, the EffectiveGrossAmount can be a GDT of type Amount (e.g., with Qualifier Gross). In some implementations, the EffectiveCashDiscountAmount can be a GDT of type Amount (e.g., with Qualifier CashDiscount). In some implementations, the EffectiveWithholdingTaxAmount can be a GDT of type Amount Qualifier WithholdingTax. In some implementations, the EffectiveBankFeeAmount can be a GDT of type Amount (e.g., with Qualifier Fee). In some implementations, the PaymentTransactionInitiatorBankAccount Involved bank details of the business partner who has initiated the payment transaction. In some implementations, the ID can be a GDT of type BankAccountID. In some implementations, the IDCheckDigitValue can be a GDT of type BankAccountIDCheckDigitValue. In some implementations, the StandardID can be a GDT of type BankAccountStandardID. In some implementations, the TypeCode can be a GDT of type BankAccountTypeCode. In some implementations, the CurrencyCode can be a GDT of type CurrencyCode. In some implementations, the HolderName can be a GDT of type BankAccountHolderName. In some implementations, the Bank can include bank data for the house bank as specified by the house bank in the bank statement. For example, the Name can be a GDT of type Name. In some implementations, the StandardID can be a GDT of type BankStandardID. In some implementations, the RoutingID can be a GDT of type BankRoutingID. In some implementations, the RoutingIDTypeCode can be a GDT of type BankRoutingIDTypeCode. In some implementations, the CountryCode can be a GDT of type CountryCode. In some implementations, the Note can be a GDT of type Note. In some implementations, the Status can be an IDT of type PaymentAdviceStatus, to be approved.

In some implementations, a DO of type PaymentExplanation can be a payment explanation that specifies the reason/reasons for a payment, typically with reference to one or more business documents such as contracts, invoices, credit memos, or sales orders. In some examples, the PaymentExplanation is a dependent object that is described in a separate document. In some implementations, a DO of type AttachmentFolder can include the related attached documents of the BO. In some implementations, a DO of type AccessControlList can be a list of access groups that have access to a PaymentAdvice during a validity period.

FIG. 223-1 through 223-6 illustrates one example logical configuration of PaymentAdviceMessage message 223028. Specifically, this figure depicts the arrangement and hierarchy of various components such as one or more levels of packages, entities, and datatypes, shown here as 223028 through 223114. As described above, packages may be used to represent hierarchy levels. Entities are discrete business elements that are used during a business transaction. Data types are used to type object entities and interfaces with a structure. For example, PaymentAdviceMessage message 223028 includes, among other things, PaymentAdvice 223032. Accordingly, heterogeneous applications may communicate using this consistent message configured as such.

Payment Advice Interface

FIG. 224-1 through 224-12 illustrates one example logical configuration of PaymentAdviceMessage message 224000. Specifically, this figure depicts the arrangement and hierarchy of various components such as one or more levels of packages, entities, and datatypes, shown here as 224000 through 224220. As described above, packages may be used to represent hierarchy levels. Entities are discrete business elements that are used during a business transaction. Data types are used to type object entities and interfaces with a structure. For example, PaymentAdviceMessage message 224000 includes, among other things, PaymentAdvice 224038. Accordingly, heterogeneous applications may communicate using this consistent message configured as such.

A PaymentAdviceNotification interface can be used in a B2B process to send payment advices (e.g., notifications and explanations of payments). In some implementations, the PaymentAdviceNotification interface can be used in a Order2Cash and a Procure2 Pay business scenarios. In some scenarios, payment advices are sent by the Payment Service component of the initiator of the payment transaction to the Payment Service component of the party for which the payment transaction is determined.

In some implementations, the PaymentAdviceNotification interface can use message types, such as a PaymentAdviceNotification and a PaymentAdviceMessage. In some examples, the PaymentAdviceNotification is a notification of a payment with explanations about the reason for payment. For examples, a payment can be an assignment of a specific quantity of money to fulfill a debt. Types of payments include, for example, bank transfer, check and bill of exchange, and/or automatic debit and direct debit. In some implementations, the structure of the PaymentAdviceNotification message type is specified by the PaymentAdviceMessage data type.

In various implementations, the PaymentAdviceNotification message can be sent by the Payment component of the initiator of the payment transaction to the Payment component of the party for which the payment transaction is determined.

In some implementations, the message data type PaymentAdviceMessage can include a PaymentAdvice object. For example, the PaymentAdvice object can be included in a business document. In some examples, business information can be transmitted in a form of a business document. The PaymentAdviceMessage can include a MessageHeader package and a PaymentAdvice package. In some examples, the message data type PaymentAdviceMessage can make the structure available for the message type PaymentAdviceNotification.

In some implementations, the MessageHeader package can combine business information relevant for sending a business document in a message. In some example, the MessageHeader package can include a MessageHeader entity. For example, the MessageHeader entity can group the business information from the perspective of the sending application. In one example, the MessageHeader entity can identify the business document in a message, identify information about the sender, and/or identify information about the recipient. The MessageHeader can be a GDT of type BusinessDocumentMessageHeader.

In some implementations, the PaymentAdvice package groups the PaymentAdvice along with its packages. The PaymentAdvice package can include a Party package, a BankAccount package, a BusinessTransactionDocumentReference package, and a PaymentExplanation package.

In some implementations, the PaymentAdvice is a notification of a payment with explanations about the reason for payment. In some examples, the payment can include automatic debit and direct debit in this context. The PaymentAdvice can include several explanations that refer to individual invoices or credit memos. In addition to the initiator of the payment transaction and the party for which the payment transaction is determined, other parties can be specified. For example, the bank details of those involved in the payment can be specified. For example, references to the payment notified with this payment advice can be specified and the payment medium. In certain implementations, the PaymentAdvice includes some or all of the following elements. In some examples, the PaymentAdvice includes an ID the can be a universally unique identifier of a payment advice. The ID can be assigned by the sender of the message. For examples, the ID can be a GDT of type BusinessTransactionDocumentID. In some examples, the IncomingCompanyPaymentFileRegisterFileUUID can be a universally unique identifier of an incoming payment file (e.g., stored in a BO of type CompanyPaymentFileRegister). For example, the IncomingCompanyPaymentFileRegisterFileUUID can be a GDT of type UUID. In some examples, the IncomingCompanyPaymentFileRegisterFileID can be an identifier of an incoming payment file (e.g., stored in a BO of type CompanyPaymentFileRegister). For example, the IncomingCompanyPaymentFileRegisterFileID can be a GDT of type CompanyPaymentFileRegisterFileID. In some examples, the TypeCode can be a payment advice type that can contain values such as "payment advice", "credit memo advice" and "debit advice". For example, the TypeCode can be a GDT of type PaymentAdviceTypeCode. In some examples, the Date can be a date of the PaymentAdvice set by the issuer (e.g., a business partner or a house bank). For example, the PaymentAdvice can be a GDT of type Date. In some examples, the AccountDebitIndicator can indicate whether an account debit is notified. For example, the AccountDebitIndicator can be a GDT of type AccountDebitIndicator. In some examples, the PaymentFormCode can be a payment form (e.g., by check, bank transfer, bill of exchange). The PaymentFormCode can contain values of the GDT PaymentFormCode except for "01 Invoice". For example, the PaymentFormCode can be a GDT of type PaymentFormCode. In some examples, the PaymentDate can be an execution date of the payment. For example, the PaymentDate can be a GDT of type Date. In some examples, the PaymentTransactionInitiatorBankAccountValueDate can be an expected value date at the bank account of the payment transaction initiator. For example, the PaymentTransactionInitiatorBankAccountValueDate can be a GDT of type Date. In some examples, the PaymentTransactionDestinatedBankAccountValueDate can be an expected value date at the bank account of the payment transaction recipient. For example, the PaymentTransactionDestinatedBankAccountValueDate can be a GDT of type Date. In some examples, the BillOfExchangeDueDate can be a bill of exchange due date for payment with bill of exchange. For example, the BillOfExchangeDueDate can be a GDT of type Date. In some examples, the NetAmount can be an amount of the notified payment. For example, the NetAmount can be a GDT of type Amount. In some examples, the GrossAmount can be a gross amount of the notified payment as it results from the business documents referred to in PaymentExplanation. For example, the GrossAmount can be a GDT of type Amount. In some examples, the CashDiscountAmount can Cash discount amount deducted from the gross amount of the notified payment. For example, the CashDiscountAmount can be a GDT of type Amount. In some examples, the WithholdingTaxAmount can Withholding tax For example, the WithholdingTaxAmount can be a GDT of type Amount. In some examples, the BankFeeAmount can Fees with which the bank debits the recipient and which are deducted from the payment amount. For example, the BankFeeAmount can be a GDT of type Amount. In some examples, the Note can Explanatory note for payment, such as a note to payee. For example, the Note can be a GDT of type Note. In certain implementations, the amounts can be entered in the same currency (e.g., payment currency).

In some implementations, the Party package groups information to the parties involved in the payment. The Party package can include a PaymentTransactionInitiator Party, a PaymentTransactionDestinatedParty, an OriginalPaymentTransactionInitiator Party, and a FinalPaymentTransactionDestinatedParty. In some examples, PaymentTransactionInitiator Party and PaymentTransactionDestinatedParty can be specified. For examples, it can be specified that the OriginalPaymentTransactionInitiator Party and the FinalPaymentTransactionDestinatedParty is optional. In some implementations, an inheritance logic applies to the parties in PaymentExplanation. For example, if a party is not filled, the value of the corresponding party in PaymentAdvice also applies to the PaymentExplanation.

In some implementations, the PaymentTransactionInitiator Party is the party that initiates the payment or the direct debit. For example, the PaymentTransactionInitiator Party can be a GDT of type BusinessTransactionDocumentParty, whereby the elements StandardID, PaymentTransactionInitiatorID, PaymentTransactionDestinatedID, Address, and ContactPerson may be used.

In some implementations, the PaymentTransactionDestinatedParty is the party that receives the payment or from which it is collected. For example, the PaymentTransactionDestinatedParty can be a GDT of type BusinessTransactionDocumentParty, whereby only the elements StandardID, PaymentTransactionInitiatorID, PaymentTransactionDestinatedID, Address, and ContactPerson may be used.

In some implementations, the OriginalPaymentTransactionInitiator Party is the party for which the payment or direct debit is made (e.g., the debtor for a payment or the beneficiary for the automatic debit). For example, the OriginalPaymentTransactionInitiator Party can be a GDT of type BusinessTransactionDocumentParty, whereby only the elements StandardID, PaymentTransactionInitiatorID, PaymentTransactionDestinatedID, Address, and ContactPerson may be used. In certain implementations, the OriginalPaymentTransactionInitiator Party can be optional and can be filled if it differs from PaymentTransactionInitiator Party.

In some implementations, the FinalPaymentTransactionDestinatedParty can be the party for which the payment transaction recipient accepts or collects the payment (e.g., the beneficiary for a payment or the debtor for the automatic debit). For example, the FinalPaymentTransactionDestinatedParty is of the type GDT: BusinessTransactionDocumentParty, whereby only the elements StandardID, PaymentTransactionInitiatorID, PaymentTransactionDestinatedID, Address, and ContactPerson are used. In some examples, the FinalPaymentTransactionDestinatedParty can be optional and can be filled if it differs from PaymentTransactionDestinatedParty.

In some implementations, the BankAccount package is a grouping of information about the bank details of the parties involved. For example, the BankAccount package includes a PaymentTransactionInitiatorBankAccount, and a Payment- TransactionDestinatedBankAccount. For example, the BankAccount package can specify bank details as optional.

In some implementations, the PaymentTransactionInitiatorBankAccount can be the bank account of the initiator of the payment. For examples, the PaymentTransactionInitiatorBankAccount is of the type GDT: BusinessTransactionDocumentBankAccount.

In some implementations, the PaymentTransactionInitiatorBankAccount can be the bank account of the initiator of the payment. In some implementations, the PaymentTransactionDestinatedBankAccount can be the bank account that receives the payment or from which it is collected. For example, the PaymentTransactionDestinatedBankAccount can be a GDT of type BusinessTransactionDocumentBankAccount.

In some implementations, the PaymentAdviceBusinessTransactionDocumentReference package is a grouping of references to business documents that are connected to the payment. The PaymentAdviceBusinessTransactionDocumentReference package can include BankTransferReference DirectDebitReference, ChequeDepositReference, BillOfExchangePresentationReference, ChequeReference, and BillOfExchangeReference.

In some implementations, the BankTransferReference can be a reference to a bank transfer with which the payment was made. For example, the BankTransferReference is of a GDT of type BusinessTransactionDocumentReference.

In some implementations, the DirectDebitReference can be the reference to a debit memo or direct debit with which the payment was made. For example, the DirectDebitReference is of the type GDT: BusinessTransactionDocumentReference.

In some implementations, the ChequeDepositReference is the reference to the check deposit with which the payment was made. For example, the ChequeDepositReference is a GDT of type BusinessTransactionDocumentReference.

In some implementations, the BillOfExchangePresentationReference can be the reference to the bill of exchange presentation with which the payment was made. For example, the BillOfExchangePresentationReference is a GDT of type BusinessTransactionDocumentReference.

In some implementations, the ChequeReference can be the reference to the check (check number) with which the payment was made. For example, the ChequeReference is a GDT of type BusinessTransactionDocumentReference.

In some implementations, the BillOfExchangeReference can be the reference to the bill of exchange (bill of exchange number) with which the payment is made. For example, the BillOfExchangeReference is of a GDT of type BusinessTransactionDocumentReference, whereby only the Element ID is used.

In some implementations, the PaymentAdvicePaymentExplanation package can be a grouping of invoice information or credit memo information to explain the payment amount for the advice recipient. In some examples, the PaymentAdvicePaymentExplanation package can include PaymentExplanationItem and the packages, such as Party Package, BusinessTransactionDocumentReference Package, PaymentDifferenceExplanationItem Package.

In some implementations, the PaymentExplanationItem can be an explanation for the notified payment. For example, the data in the PaymentExplanationItem should explain the payment reason and possible differences between the invoice amount and payment amount to the advice recipient. References to the paid invoices, credit memos or other business documents can also be specified. In some examples, the PaymentExplanationItem can also contain explanations to payment adjustments in which differences of the paid amount from the requested amount and the reasons for this are listed.

Some parties from the parties of the PaymentAdvice can be specified. For example, the PaymentExplanationItem can be a GDT of type PaymentExplanationItem that can include the following elements. An ID can be an identification of a PaymentExplanationItem in the context of a payment advice or a payment. For example, the ID uniquely identifies a PaymentExplanationItem together with the payment advice ID or the payment ID. The OffsettingIndicator can specify whether the amounts of this PaymentExplanationItem are offset with other PaymentExplanationItems on the same level or whether these amounts are included additively in the total amounts (e.g., same elements in PaymentAdvice).

BusinessTransactionDocumentDate can date of the business document to which the PaymentExplanationItem refers. The NetAmount can a paid or collected amount. The GrossAmount can be an amount of the business document to which the PaymentExplanationItem refers, for example, invoice amount or amount of the loan contract. The TransactionCurrencyGrossAmount can be an amount of the business document in transaction currency. The CashDiscountAmount can be a deducted cash discount. The TransactionCurrencyCashDiscountAmount can be a cash discount amount in transaction currency. The WithholdingTaxAmount can be a deducted withholding tax. The BankFeeAmount can be deducted bank fees. The ScandinavianPaymentReferenceID can payment reference common in Scandinavia (e.g., KIDNO). The SwissPaymentReferenceID can be a payment reference common in Switzerland (e.g., ISR reference). The Note can be a user-defined text that explains the payment and the deducted amounts.

In some implementations, the Party package is the grouping of parties to which receivables or payables belong that are related to the notified payment. The parties can differ from the parties at the level of the PaymentAdvice. The Party package can include some entities, such as an OriginalPaymentTransactionInitiator Party (e.g., the party to which the receivable or payable belongs and which originally initiated the payment or debit memo) and/or a FinalPaymentTransactionInitiator Party (e.g., the party for which the payment or debit is determined).

In some implementations, the BusinessTransactionDocumentReference package is a grouping of references to business documents to which the notified payment refers. For example, the BusinessTransactionDocumentReference package can include some entities, such as a PaymentTransactionInitiatorInvoiceReference (e.g., reference to the invoice of the party that initiates the payment transaction). For example, the PaymentTransactionDestinatedInvoiceReference (e.g., identification of the invoice of the party for which the payment transaction is determined). For example, the PaymentTransactionInitiatorContractReference (e.g., reference to the contract of the party that initiates the payment transaction). For example, the PaymentTransactionDestinatedContractReference (e.g., reference to the contract of the party for which the payment transaction is determined). For example, the PaymentTransactionInitiatorPurchaseOrderReference (e.g., reference to the purchase order of the party that initiates the payment transaction). For example, the PaymentTransactionDestinatedPurchaseOrderReference (e.g., reference to the purchase order of the party for which the payment transaction is determined).

In some implementations, the PaymentDifferenceExplanationItem package can be a grouping of explanations for differences from the expected payment amount. The PaymentDifferenceExplanationItem package can include a PaymentDifferenceExplanationItem entity and the package BusinessTransactionDocumentReference package. In some examples, the PaymentDifferenceExplanationItem is an explanation of the difference between the payment amount to be expected and the actual payment amount. In some implementations, the PaymentDifferenceExplanationItem is a GDT of type PaymentDifferenceExplanationItem. The PaymentDifferenceExplanationItem can include an OffsettingIndicator that, for example, can specify whether the difference amount is offset with other PaymentDifferenceExplanationItems on the same level or whether this amount is included additively in an amount at the level PaymentExplanationItem. In some example, the PaymentDifferenceExplanationItem can include an Amount that can be an amount of the adjustment of a payment (e.g., in payment currency). In some implementations, the PaymentDifferenceExplanationItem can include a PaymentDifferenceReasonCode that can be a code for the reason of the payment difference.

In some implementations, the BusinessTransactionDocumentReference package is a grouping of references to business documents to which the payment differences refer. The BusinessTransactionDocumentReference can include some entities, such as a PaymentTransactionInitiatorInvoiceReference (e.g., a reference to the invoice of the party that initiates the payment transaction), a PaymentTransactionDestinatedInvoiceReference (e.g., an identification of the invoice of the party for which the payment transaction is determined), a PaymentTransactionInitiatorContractReference (e.g., a reference to the contract of the party that initiates the payment transaction). For example, the PaymentTransactionDestinatedContractReference (e.g., a reference to the contract of the party for which the payment transaction is determined). For example, the PaymentTransactionInitiatorPurchaseOrderReference (e.g., a reference to the purchase order of the party that initiates the payment transaction). For example, the PaymentTransactionDestinatedPurchaseOrderReference (e.g., a reference to the purchase order of the party for which the payment transaction is determined).

FIG. 225-1 through 225-4 illustrates an example PaymentAllocation business object model 225008. Specifically, this model depicts interactions among various hierarchical components of the PaymentAllocation, as well as external components that interact with the PaymentAllocation (shown here as 225000 through 225006 and 225010 through 225024).

Payment Allocation can be an allocation of a payment to payment reasons. A payment reason can explain the origin of a payment represented by a payment register item. The types of payment reason include: a payment register item (e.g., that originated from an internally initiated or notified payment) that can be confirmed by this allocation (e.g., internal allocation), a business origin of a payment (for example, Accounts Payable Accounting) in which the payment that the payment register item can be based on was accepted or made and that further processes the payment (e.g., external allocation), expense or revenue from fees or interest, and nonoperational inventories.

A PaymentAllocation can refer, regardless of the special payment mediums, to payment register items (e.g., items of the PaymentRegister business object) as representative of the payment (for example, bank statement item, incoming check, and/or payment order). The following includes possible allocations at the level of the specific payment medium. The same categorization can be used as in the definition. An Allocation of a payment confirmed by a bank statement item (e.g., BankStatementItem) can be applied to: a payment order (e.g., PaymentOrder); a check deposit (e.g., ChequeDeposit); a cash transfer (e.g., CashTransfer); a payment notified by the business partner (e.g., IncomingPaymentAdvice); a business origin of the payment (e.g., external allocation) for whom the payment was accepted; expense or revenue from fees or interest; and/or to a nonoperational inventory. An allocation of an incoming check payment (e.g., IncomingCheque) can be allocated to: a payment notified by the business partner (e.g., IncomingPaymentAdvice) or a business origin of the payment (e.g., external allocation) in which the payment was accepted. An allocation of a payment order (e.g., PaymentOrder) or a cash payment (e.g., CashPayment) can be to a business origin of the payment (e.g., external allocation) in which the payment was made. An allocation of a payment notified by the business partner (e.g., IncomingPaymentAdvice) can be to a payment confirmed by a bank statement item (e.g., BankStatementItem), to an incoming check payment (e.g., IncomingCheque), or to a business origin of the payment (e.g., external allocation) in which the payment was accepted.

The Payment Allocation business object can be part of the Payment Processing process component. A Payment Allocation can contain header information. It can also contain any of the following: an internal allocation to a payment register item, an external allocation to a business origin, an allocation to expense from fees or interest, and/or a documentation of the business transaction for the purpose of auditability of postings in Financial Accounting.

The PaymentAllocation business object can be involved in the following Process Integration Models: PaymentProcessing_DueItemProcessing and PaymentProcessing_Accounting. The service interface Clearing Out (e.g., PaymentProcessingClearingOut), can be a part of the following Process Integration Models: PaymentProcessing_DueItemProcessing. The Clearing Out service interface groups operations that can inform another process component about business partner initiated payment transactions. Then payment transactions are involved that refer to trade receivables and payables. The PaymentProcessingClearingOut. RequestClearing (e.g., Request Clearing (A2A)) issues a request to perform a clearing for a business partner initiated payment. The operation can be based on the ClearingRequest message type (derived from the PaymentAllocation business object). The PaymentProcessingClearingOut.RequestClearingCancellation (e.g., Request Clearing Cancellation (A2A)) issues a request to perform a clearing for a business partner initiated payment. The operation can be based on the ClearingCancellationRequest message type (e.g., derived from the PaymentAllocation business object). The Service Interface Clearing In (e.g., PaymentProcessingClearingIn) can be part of the following Process Integration Models: PaymentProcessing_DueItemProcessing. The service interface Clearing In groups all operations with which other process components reject the execution of a clearing for a business partner initiated payment. The PaymentProcessingClearingIn.ChangePaymentAllocationBasedOnClearingRequestConfirmation (e.g., Change Payment Allocation Based On Clearing Request Confirmation (e.g., A2A)) rejects the execution of the requested clearing. The operation can be based on the ClearingConfirmation message type (derived from the PaymentAllocation business object). A request for clearing can be rejected if the authorized process component is not the owner of the open items to be cleared.

The PaymentAllocation can create a new request for clearing at another process component. The PaymentProcessingPaymentAccountingOut (e.g., Service Interface Payment Accounting Out PaymentProcessingPaymentAccountingOut) can be a part of the following process integration models: PaymentProcessing_Accounting. The PaymentProcessingPaymentAccountingOut groups all operations that inform Accounting about incoming or outgoing payments in PaymentProcessing or the cancellation thereof. The PaymentProcessingPaymentAccountingOut.NotifyOfPayment (e.g., Notify of Payment (A2A)) notifies the Accounting process component about incoming or outgoing payments in PaymentProcessing. The operation can be based on the PaymentAccountingNotification message type (e.g., derived from the AccountingNotification business object). The PaymentProcessingPaymentAccountingOut.NotifyOfPaymentCancellation (e.g., Notify of Payment Cancellation (A2A)) notifies the Accounting process component about the cancellation of an incoming or outgoing payment in PaymentProcessing. The operation can be based on the PaymentCancellationAccountingNotification message type (derived from the AccountingNotification business object).

In some implementations, PaymentAllocation 225026 can be the allocation of a payment (e.g., an item of the PaymentRegister business object) to the payment reasons from which the payment register item originated. In addition to the reference to the payment register item, the PaymentAllocation may also contain administrative information and status information. The elements located at the PaymentAllocation node may be defined by the type GDT: PaymentAllocationElements. In certain implementations, these elements may include: UUID, ID, AllocatedPaymentRegisterItemUUID, CompanyUUID, CompanyID, BaseBusinessTransactionDocumentReference, BaseBusinessTransactionDocumentBusinessProcessVariantTypeCodeOptional, BaseBusinessPaymentTransactionSupplementCategoryCode, PaymentManagementFunctionalUnitUUID, SystemAdministrativeData, BankChargeBearerCode, AllocationTransactionCurrencyAmount, TotalAllocatedTransactionCurrencyAmount, ActualPaymentAllocatingPaymentAllocationID, PaymentAdviceID, Status, and PaymentAllocationStatus. An UUID may be the universal identifier, which may be unique, of the PaymentAllocation, and may be a GDT of type UUID. An ID may be the identifier, which may be unique, of the Payment Allocation, and may be a GDT of type BusinessTransactionDocumentID. An AllocatedPaymentRegisterItemUUID may be the alternative key of the payment register item that can be explained by the current PaymentAllocation, and may be a GDT of type UUID. A CompanyUUID may be the universal identifier, which may be unique, of the company involved that processes the payment register items being allocated, and may be a GDT of type UUID. The CompanyUUID can be taken from the payment register item. A CompanyID may be the universal identifier, which may be unique, of the company involved that processes the payment register items being allocated, and may be a GDT of type OrganisationalCentreID. The CompanyID can be taken from the payment register item. A BaseBusinessTransactionDocumentReference may be a reference to the business document that generated the payment register item being allocated, may be a GDT of type BusinessTransactionDocumentReference, and may be optional. The reference can be taken from the payment register item. A BaseBusinessTransactionDocumentBusinessProcessVariantTypeCode may be the coded representation of the business process variant of the business document that generated the payment register item being allocated, may be a GDT of type BusinessProcessVariantTypeCode, and may be optional. A BaseBusinessPaymentTransactionSupplementCategoryCode may be the coded representation of the category of the supplemental information of the payment transaction that created the payment register item being allocated, and may be a GDT of type PaymentTransactionSupplementCategoryCode. A PaymentManagementFunctionalUnitUUID may be a universal identifier, which may be unique, of the FunctionalUnit working on the PaymentAllocation, and may be a GDT of type UUID. In some implementations, the FunctionalUnit referenced can execute the organizational function Payment Management, e.g. the element OrganisationalFunctionCode in one of the instances of the node FunctionalUnitAttributes in the FunctionalUnit references may have the value "22" for Payment Management. A SystemAdministrativeData may be administrative data retained by a system that includes the system users and the change dates/times, can be relevant for the actions "create" and "update", and may be a GDT of type SystemAdministrativeData. A BankChargeBearerCode may be the coded representation of the bearer of the charges of the bank transaction to be allocated, may be a GDT of type BankChargeBearerCode, and may be optional. An AllocationTransactionCurrencyAmount may be the amount of the payment register item in transaction currency, and may be a GDT of type Amount, in some implementations may have a Qualifier of TransactionCurrency. This can be the amount that can be explained by the PaymentAllocation. A TotalAllocatedTransactionCurrencyAmount may be the amount, the use of which as a whole can be explained by the PaymentAllocation, in the currency of the business transaction, may be a GDT of type Amount, and in some implementations may have a Qualifier of TransactionCurrency. The TotalAllocatedTransactionCurrencyAmount may be the total of the AllocatedTransactionCurrencyAmounts of the items. An ActualPaymentAllocatingPaymentAllocationID may be an identifier, which may be unique, of a PaymentAllocation that allocated a confirmed payment register item may be a GDT of type BusinessTransactionDocumentID, and may be optional. This PaymentAllocation can be the current PaymentAllocation itself, or, in the case of a notified payment item being allocated, then it can be a previously created PaymentAllocation. A PaymentAdviceID may be an identifier, which may be unique, of the PaymentAdvice that was used as a notification for an allocated, confirmed payment register item, or that generated a notified payment register item that may be still to be allocated, may be a GDT of type BusinessTransactionDocumentID, and may be optional. A Status may be based on IDT of type PaymentAllocationStatus. A PaymentAllocationStatus may be an IDT with the following elements: PaymentAllocationLifeCycleStatusCode (e.g., Coded representation of the processing status of PaymentAllocation, and/or may be a GDT of type PaymentAllocationLifecycleStatusCode) and ConsistencyStatusCode (e.g., coded representation of the consistency of the PaymentAllocation and/or may be a GDT of type ConsistencyStatusCode).

In some implementations, the following composition relationships to subordinate nodes exist: BusinessProcessVariantType 225042 may have a cardinality relationship of 1:n; Item 225028 may have a cardinality relationship of 1:cn; FinancialAuditTrailDocumentation 225040 may have a cardinality relationship of 1:cn; and/or DO: AccessControlList 225044 may have a cardinality relationship of 1:1. There may be a number of Inbound Aggregation Relationships including: AllocatedPaymentItem may have a cardinality relationship of 1:cn, and may be the payment register item that can be allocated to payment reasons by the PaymentAllocation. CreationIdentity may have a cardinality relationship of 1:cn, and may be the identity that created the PaymentAllocation. LastChangeIdentity may have a cardinality relationship of c:cn, and may be the identity that changed the PaymentAllocation in the last time. There may be a number of Inbound Association Relationships including: PaymentManagementFunctionalUnit, which may have a cardinality relationship of c:cn, and identify the Functional Unit which can be working on the PaymentAllocation. There may be a number of Associations for Navigation including: MainBusinessProcessVariantType, which may have a cardinality relationship of 1:1 and may be an association to the main BusinessProcessVariantType.

The action Propose (S&AM action) creates a proposal which reasons can be allocated to the payment items. The action attempts to allocate one or more payment reasons to the payment items based on the configuration of the PaymentAllocation. Each payment reason corresponds to a PaymentAllocationItem. Subsequently calling the action Release means that PaymentRegisterSplitItems are generated according to PaymentAllocationItems. The respective PaymentAllocationItem refers to them (association AllocatedSplitItem). The preconditions of this action may include that the PaymentAllocation contains a reference to a payment item. Changes to the object may include that the PaymentAllocationItems are generated according to the reasons that are proposed for allocation. The action can be performed by the UI.

The action Release (S&AM action) releases a previously created proposal. The preconditions of this action include that the PaymentAllocation can be consistent (see action CheckConsistency) and that at least one PaymentAllocationItem exists. Changes to the object may include the action results in a status change at the object. If the PaymentAllocation contains an allocation that can be relevant to posting, a FinancialAuditTrailDocumentation can be generated. If the full amount of the PaymentAllocation is not allocated by items, another PaymentAllocation can be generated using the remaining amount.

In case of returns (that means, the BusinessProcessVariantTypeCode can be “Of Outgoing Payment Returns” or “Of Incoming Payment Returns”) an InternalAllocationItem can be created. Changes to other objects include: the payment items to be allocated or allocated payment items are indicated as allocated.

If the PaymentAllocation contains more than one item, a new ItemSplitItem can be generated for each additional PaymentAllocationItem within the payment register item being allocated. This refers to the PaymentAllocationItem. If the allocated amount can be less than the amount of the payment item, the payment item can be split and part of the payment item can be indicated as allocated. In case of an allocation that can be relevant to posting, a FinancialAuditTrailDocumentation can be generated. In case of returns (that means, the BusinessProcessVariantTypeCode can be “Of Outgoing Payment Returns” or “Of Incoming Payment Returns”) a PaymentOrder can be created. This PaymentOrder represents the order to revoke the payment to be allocated. The payment to be allocated can be allocated to this new PaymentOrder. Changes to the status may include: The status of PaymentAllocation can be set from new (proposed) to released. The action can be performed by the UI.

In some implementations, the action Allocate combines the actions Propose and Release in one step. The action Propose can be performed in each case. If the full amount of the payment item can be explained by allocation, the action Release may be performed immediately after the action Propose. The preconditions may be the same as those in propose. Changes to the object are the same as those in the actions Propose and Release. Changes to other objects are the same as those in Propose and Release. Changes to the status are the same as those in the actions Propose and Release. The action may be performed by other business objects from the PaymentProcessing process component.

The action Cancel (S&AM action) may cancel a PaymentAllocation. A cancellation of the PaymentAllocation can be necessary before a payment item to be allocated or an allocated payment item in a PaymentAllocation can be canceled. In some implementations the preconditions may be that the PaymentAllocation was released before. Changes to the object may include: the PaymentAllocation can be indicated as canceled. If a FinancialAuditTrailDocumentation was generated during release, another FinancialAuditTrailDocumentation can be generated that cancels the previous one. Changes to other objects may include: the changes to the payment items that were made during the action Release are undone. If a request for clearing was sent to another process component during the action Release, this can be canceled. Changes to the status may include: The status of PaymentAllocation can be set to canceled. The action can be performed by the UI or other business objects of the PaymentProcessing process component.

In some implementations, the action CheckConsistency (S&AM action) checks the PaymentAllocation for consistency. The action CheckConsistency may check the entire business object for consistency. A consistent PaymentAllocation can be released by the action Release. Changes to the status due to this action may include: The ConsistencyStatus can be set according to the check result. The action can be performed implicitly each time the object can be changed.

The action ProposeAsReturn (S&AM action) declares the payment to be allocated as a return. The action ProposeAsReturn informs the PaymentAllocation, that a returns handling has to be triggered/was triggered for the payment to be allocated. The returns handling can be triggered manually by the user (for example, the user calls the bank). The manual action can be documented by calling the action ProposeAsReturn in the system. Changes to the object may include: The BusinessProcessVariantTypeCode can be set to Of Outgoing Payment Returns or Of Incoming Payment Returns. The action can be performed by the UI.

The query QueryByID may provide a list of all PaymentAllocation with the specified ID. The query elements are defined by the data type PaymentAllocationIDQueryElements. These elements may include: ID. An ID may be a GDT of type BusinessTransactionDocumentID.

In some implementations, the query QueryByStatus provides a list of all PaymentAllocation that have the status specified. The query elements may be defined by the data type PaymentAllocationStatusQueryElements. These elements may include: ID, Status, ItemStatus, and/or SystemAdministrativeData. An ID may be a GDT of type BusinessTransactionDocumentID, and may be optional. A Status may be a GDT of type PaymentAllocationStatus, and may be optional. An ItemStatus may be a GDT of type PaymentAllocationItemStatus, and may be optional. A SystemAdministrativeData may be a GDT of type SystemAdministrativeData, and may be optional.

In some implementations, the query QueryByItemType provides a list of all PaymentAllocation that have items of the type specified. The query elements may be defined by the data type PaymentAllocationItemTypeQueryElements. These elements may include: ID, ItemTypeCode, ItemPaymentCauseOperationalOriginCode, ItemBusinessPartnerID, Item- BusinessPartnerRoleCategoryCode, and SystemAdministrativeData. An ID may be a GDT of type BusinessTransactionDocumentID, and may be optional. An ItemTypeCode may be a GDT of type PaymentAllocationItemType, and may be optional. An ItemPaymentCauseOperationalOriginCode may be a GDT of type PaymentCauseOperationalOriginCode, and may be optional. An ItemBusinessPartnerID may be a GDT of type BusinessPartnerInternalID, and may be optional. An ItemBusinessPartnerRoleCategoryCode may be a GDT of type PartyRoleCategoryCode, and may be optional. An SystemAdministrativeData may be a GDT of type SystemAdministrativeData, and may be optional.

In some implementations, the query QueryByElements provides a list of all PaymentAllocation that meet the selection criteria specified by the query elements. The query elements are defined by the data type PaymentAllocationElementsQueryElements. These elements may include: UUID, ID, AllocatedPaymentRegisterItemUUID, CompanyUUID, CompanyID, BaseBusinessTransactionDocumentReference, BaseBusinessTransactionDocumentBusinessProcessVariantTypeCode, BaseBusinessPaymentTransactionSupplementCategoryCode, SystemAdministrativeData, BankChargeBearerCode, AllocationTransactionCurrencyAmount, ActualPaymentAllocatingPaymentAllocationID, PaymentAdviceID, and Status. An UUID may be a GDT of type UUID, and may be optional. An ID may be a GDT of type BusinessTransactionDocumentID, and may be optional. An AllocatedPaymentRegisterItemUUID may be a GDT of type UUID, and may be optional. A CompanyUUID may be a GDT of type UUID, and may be optional. A CompanyID may be a GDT of type OrganisationalCentreID, and may be optional. A BaseBusinessTransactionDocumentReference may be a GDT of type BusinessTransactionDocumentReference, and may be optional. A BaseBusinessTransactionDocumentBusinessProcessVariantTypeCode may be a GDT of type BusinessProcessVariantTypeCode, and may be optional. A BaseBusinessPaymentTransactionSupplementCategoryCode may be a GDT of type PaymentTransactionSupplementCategoryCode, and may be optional. A SystemAdministrativeData may be a GDT of type SystemAdministrativeData, and may be optional. A BankChargeBearerCode may be a GDT of type BankChargeBearerCode, and may be optional. An AllocationTransactionCurrencyAmount may be a GDT of type Amount, in some implementations may have a Qualifier of TransactionCurrency, and may be optional. An ActualPaymentAllocatingPaymentAllocationID may be a GDT of type BusinessTransactionDocumentID, and may be optional. A PaymentAdviceID, may be a GDT of type BusinessTransactionDocumentID, and may be optional. A Status may be an IDT of type PaymentAllocationStatusElements, and may be optional.

In some implementations, the query QueryByReconciliationElements may provide a list of all PaymentAllocations which use the specified Company and AccountingTransactionDate on the associated FinancialAuditTrailDocumentations. This query can be used for reconciliation with Process Component Financial Accounting. The query elements may be defined by the type IDT: PaymentAllocationReconciliationElementsQueryElements. The elements may include: FinancialAuditTrailDocumentationCompanyID, and/or FinancialAuditTrailDocumentationAccountingTransactionDate. FinancialAuditTrailDocumentationCompanyID may be aGDT of type OrganisationalCentreID, and may be optional. FinancialAuditTrailDocumentationAccountingTransactionDate may be a GDT of type Date, in some implementations may have a Qualifier of AccountingTransaction, and may be optional.

In some implementations, a BusinessProcessVariantType may define the character of a business process variant of the PaymentAllocation. It may represent a typical way of processing of a PaymentAllocation within a process component from a business point of view. A Business Process Variant can be a configuration of a Process Component. A Business Process Variant may belong to one process component. A process component can be a software package that realizes a business process and exposes its functionality as services. The functionality contains business transactions. A process component may contain one or more semantically related business objects. A business object may belong to one process component. The elements located at the node BusinessProcessVariantType may be defined by the data type BusinessProcessVariantTypeElements, which is in some cases derived from BusinessProcessVariantTypeElements (Template). In certain implementations, these elements may include: BusinessProcessVariantTypeCode and/or MainIndicator. A BusinessProcessVariantTypeCode may be a coded representation of a business process variant type of a PaymentAllocation, and may be a GDT of type BusinessProcessVariantTypeCode. A MainIndicator may be an Indicator that specifies whether the current BusinessProcessVariantTypeCode is the main one or not, may be a GDT of type Indicator, and in some implementations may have a Qualifier of Main.

In some implementations, an Item may be the allocation of part of a payment register item to a payment reason. An Item may occur in the following complete and disjoint specializations: InternalAllocationItem 225030(e.g., in the case that part of the payment register item can be allocated to another payment register item), ExternalAllocationItem 225032(e.g., in the case that an allocation to a business origin that can be managed outside the Payment Processing process component), FeeAllocationItem 225034 (e.g., in the case that part of the payment register item can be allocated to a fee that can be normally posted as an expense), InterestAllocationItem 225036(e.g., in the case that part of the payment register item can be allocated to interest that can be normally posted as revenue/expense), NonOperationalInventoryAllocationItem 225038 (e.g., in the case that part of the payment register item can be allocated to a nonoperational inventory). The elements located at the node Item may be defined by the type GDT: PaymentAllocationItemElements. In certain implementations, elements may include: ID, AllocatedPaymentRegisterSplitItemUUID, InternalAllocationPaymentRegisterSplitItemUUID, BusinessPartnerUUID, BusinessPartnerRoleCategoryCode, BusinessPartnerID, AllocatedPaymentRegisterSplitItemBusinessProcessVariantTypeCode, TypeCode, AllocatedTransactionCurrencyAmount, InternalAllocationTransactionCurrencyAmount, PaymentBaseBusinessTransactionTypeCode, and/or Status. An ID may be an identifier of the item, and may be a GDT of type BusinessTransactionDocumentItemID. The Items may be numbered for each instance of a PaymentAllocation. An AllocatedPaymentRegisterSplitItemUUID may be an alternative key of part of the payment register item being allocated by the current PaymentAllocation, may be a GDT of type UUID and may be optional. An InternalAllocationPaymentRegisterSplitItemUUID may be an alternative key of part of the payment register item that may be allocated as the payment reason to part of the payment register item being allocated, may be a GDT of type UUID, and may be optional. A BusinessPartnerUUID may be the universally unique identifier of the business partner who initiated the payment being allocated, may be a GDT of type UUID and may be optional. A BusinessPartnerRoleCategoryCode may be the role of the business partner in this payment, may be a GDT of type PartyRoleCategoryCode and may be optional. A BusinessPartnerID may be an identifier of the business partner who initiated the payment being allocated, and may be a GDT of type BusinessPartnerInternalID. An AllocatedPaymentRegisterSplitItemBusinessProcessVariantTypeCode may be the coded representation of the business process variant of part of the payment register item being allocated by the current PaymentAllocation, may be a GDT of type BusinessProcessVariantTypeCode, and may be optional. A TypeCode may be the coded representation of the type of part of an allocation, and may be a GDT of type BusinessTransactionDocumentItemTypeCode. Allowed code values may include: InternalAllocationItem, ExternalAllocationItem, FeeAllocationItem, InterestAllocationItem. An AllocatedTransactionCurrencyAmount may be the amount that may be allocated by the PaymentAllocationItem, in the transaction currency of the payment register item that may be allocated, may be a GDT of type Amount, and in some implementations may have a Qualifier of TransactionCurrency. An InternalAllocationTransactionCurrencyAmount may be the amount in the transaction currency of the allocated InternalAllocationPaymentRegisterSplitItem, may be a GDT of type Amount, and in some implementations may have a Qualifier of TransactionCurrency. This amount may specify which part of the payment register item may be allocated to which portion of the InternalAllocationPaymentRegisterSplitItems. A PaymentBaseBusinessTransactionTypeCode may be the coded representation of the type of a business transaction that is based on a payment transaction from the view of PaymentProcessing, may be a GDT of type PaymentBaseBusinessTransactionTypeCode, and may be optional. Status may be an IDT of type PaymentAllocationItemStatus, and may be optional. A PaymentAllocationItemStatus may be an IDT that may include the following elements: RejectionStatusCode (e.g., coded representation of the processing status of an allocation that may be outside of PaymentProcessing. May be based on GDT RejectionStatusCode) and/or PaymentAllocationLifecycleStatusCode (e.g., coded representation of the processing status of PaymentAllocation. May be based on GDT PaymentAllocationLifecycleStatusCode). The total of amounts of all items of a PaymentAllocation may correspond to the amount of the PaymentRegisterItem to be assigned that refers to the root node. The elements BusinessPartnerUUID and BusinessPartnerRoleCategoryCode can be filled if the Item occurs in the specialization ExternalAllocationItem.

There may be a number of Inbound Association Relationships including: AllocatedSplitItem, which may have a cardinality relationship of c:c and may be part of the payment register item that is allocated to a payment reason.

In some implementations, the action Reject (S&AM action) may reject an external allocation because it cannot be performed. In some implementations preconditions may be that the PaymentAllocation item can be of the type "external allocation" and the PaymentAllocation was previously released. Changes to the object may include: Status change at the external allocation item. If a FinancialAuditTrailDocumentation was generated previously, this may be canceled by generating a new FinancialAuditTrailDocumentation. Changes to the status may include: The ExternalAllocationStatus can be set from released to rejected. The action can be performed by the ChangePaymentAllocationBasedOnClearingRequestConfirmation inbound agent.

The action DetermineNewOrigin (S&AM action) may prepare the item of the type external allocation to be sent again by determining a new business origin for the payment reason. Preconditions of the action may include that the item can be of the type external allocation and the status of the item can be rejected. Changes to the object may include: Status change at the external allocation item, a new business origin can be determined from Customizing if this was not predefined by the user, and the outbound agent that generates a request for clearing can be triggered. The action can be performed by the UI and other business objects of the PaymentProcessing process component.

In some implementations, the query QueryByElements provides a list of all PaymentAllocation that meet the selection criteria specified by the query elements: The query elements may be defined by the data type PaymentAllocationItemElementsQueryElements. These elements may include: ID, AllocatedPaymentRegisterSplitItemUUID, InternalAllocationPaymentRegisterSplitItemUUID, BusinessPartnerUUID, BusinessPartnerRoleCategoryCode, BusinessPartnerID, TypeCode, BusinessTransactionDocumentItemTypeCode, AllocatedTransactionCurrencyAmount, InternalAllocationTransactionCurrencyAmount, PaymentCauseOperationalOriginCode, and Status. An ID may be a GDT of type BusinessTransactionDocumentItemID, and may be optional. An AllocatedPaymentRegisterSplitItemUUID may be a GDT of type UUID, and may be optional. An InternalAllocationPaymentRegisterSplitItemUUID may be a GDT of type UUID, and may be optional. A BusinessPartnerUUID may be a GDT of type UUID, and may be optional. A BusinessPartnerRoleCategoryCode may be a GDT of type PartyRoleCategoryCode, and may be optional. A BusinessPartnerID may be a GDT of type BusinessPartnerInternalID, and may be optional. A TypeCode may be a GDT of type PaymentAllocationItemTypeCode, and may be optional. A BusinessTransactionDocumentItemTypeCode may be a GDT of type BusinessTransactionDocumentItemTypeCode, and may be optional. An AllocatedTransactionCurrencyAmount may be a GDT of type Amount, Qualifier TransactionCurrency, and may be optional. An InternalAllocationTransactionCurrencyAmount may be a GDT of type Amount, Qualifier TransactionCurrency, and may be optional. A PaymentCauseOperationalOriginCode may be a GDT of type PaymentCauseOperationalOriginCode, and may be optional. A Status may be an IDT of type PaymentAllocationItemStatus, and may be optional.

InternalAllocationItem can be the allocation of part of a payment register item to a payment register item resulting from one of the following processes: A notified payment register item (e.g., PaymentAdviceItem), a payment order (e.g., PaymentOrder, ChequeDeposit, CashTransfer), or a confirmed payment register item (e.g., IncomingCheque). For an InternalAllocationItem, a request for clearing can be sent to a business origin of the payment. In some implementations, the specialization InternalAllocationItem can be realized using an Item with a TypeCode having the value 57 (InternalAllocationItem).

There may be a number of Inbound Association Relationships including: AllocatedToSplitItem may have a cardinality relationship of c:c, and can be a part of a payment register item that was the reason for the existence of the allocated part of the payment register item.

ExternalAllocationItem may be the allocation of a part of a payment register item to a business origin of the payment that can be managed outside Payment Processing. The data can be in the assigned business origin from which the payment register item originated. A request for clearing can be sent to the business origin of the payment for each ExternalAllocationItem. Examples of a business origin of a payment are Accounts Payable Accounting or payroll. The specialization ExternalAllocationItem can be realized using an Item with a TypeCode having the value 58 (ExternalAllocationItem).

There may be a number of Inbound Association Relationships including: Business Partner may have a cardinality relationship of c to cn, and may be an association to the BusinessPartner that initiated the payment to be allocated.

FeeAllocationItem can be the allocation of part of a payment register item to expense or revenue from fees. The specialization FeeAllocationItem can be realized using an Item with a TypeCode having the value 50 (FeeAllocationItem). The following elements may be used: ID, TypeCode, AllocatedTransactionCurrencyAmount, AllocatedPaymentSplitItemUUID and AllocatedPaymentRegisterSplitItemBusinessProcessVariantTypeCode.

InterestAllocationItem can be the allocation of part of a payment register item to expense or revenue from interest. The specialization InterestAllocationItem can be realized using an Item with a TypeCode having the value 51 (InterestAllocationItem). The following elements may be used: ID, TypeCode, AllocatedTransactionCurrencyAmount, AllocatedPaymentRegisterSplitItemUUID and AllocatedPaymentRegisterSplitItemBusinessProcessVariantTypeCode.

NonOperationalInventoryAllocationItem can be the Allocation of part of a payment register item to a nonoperational inventory. For example, if the amount of cash in a cash location is not updated in the directory of payments (PaymentRegister), a cash disbursement that appears on the bank statement cannot be directly allocated to the business transaction of a cash withdrawal. Thus, the allocation takes place without reference to a PaymentRegisterItem. This may mean that in Accounting, a general clearing account can be posted first from which it may be reposted manually to the correct balance sheet account (here cash location). The specialization NonOperationalInventoryAllocationItem can be realized using an Item with a TypeCode with the value 1571 (NonOperationalInventoryAllocationItem). The elements ItemID, ID, TypeCode, AllocatedTransactionCurrencyAmount, AllocatedPaymentRegisterSplitItemUUID, and AllocatedPaymentRegisterSplitItemBusinessProcessVariantTypeCode may be used.

DO FinancialAuditTrailDocumentation can be uniform documentation of business transactions for the purpose of auditability of postings in Financial Accounting, realized technically as a dependent object and described in a separate document. The DO: AccessControlList may be a list of access groups that have access to a PaymentAllocation during a validity period.

FIGS. 226-1 through 226-2 illustrate one example logical configuration of ClearingRequestMessage message 226000. Specifically, this figure depicts the arrangement and hierarchy of various components such as one or more levels of packages, entities, and datatypes, shown here as 226000 through 226018. As described above, packages may be used to represent hierarchy levels. Entities are discrete business elements that are used during a business transaction. Data types are used to type object entities and interfaces with a structure. For example, ClearingRequestMessage message-226000 includes, among other things, ClearingRequest 226004. Accordingly, heterogeneous applications may communicate using this consistent message configured as such.

This section describes the message types and their signatures that are derived from the operations of the business object PaymentAllocation. In a signature, the business object can be contained as a "leading" business object. The message data type can define the structure of the following message types. Business partner initiated payments can be processed in the process component Payment Processing. The Due Item Management component can be informed about these payments using a Clearing Message. The clearing message can contain details regarding the receivables and payables that are to be cleared with the payment. If the payment cannot be assigned to a business partner, a Clearing Confirmation Message can be returned to the Payment Processing process component. The Payment Processing process component can also cancel a clearing by sending a Cancel Clearing Message to the Due Item Management process component. The ClearingRequest can be a request to clear a business partner initiated payment with receivables and payables. The structure of this message type can be determined by the message data type ClearingRequestMessage. This message type can be used in the following operations of business objects: PaymentAllocation (e.g., PaymentProcessingClearingOut.ClearingRequest), DuePayment (e.g., DueItemProcessingClearingIn.CreateClearing), ProductTaxDeclaration (e.g., DueItemProcessingClearingIn.CreateClearing).

In some implementations, a ClearingCancellationRequest can be a request to cancel a clearing of receivables and payables. The structure of this message type can be determined by the message data type ClearingRequestMessage. This message type can be used in the following operations of business objects: PaymentAllocation (e.g., PaymentProcessingClearingOut.ClearingRequestCancellation), DuePayment (e.g., DueItemProcessingClearingIn.CancelClearing), and/or ProductTaxDeclaration (e.g., DueItemProcessingClearingIn.CancelClearing).

In some implementations, a ClearingConfirmation can be notification whether a request to clear a business partner initiated payment with receivables and payables could be performed. This message type can be used in the following operations of business objects: PaymentAllocation (e.g., PaymentProcessingClearingIn.ChangePaymentAllocationBasedOnClearingRequestConfirmation), DuePayment (e.g., DueItemProcessingClearingOut.ConfirmClearing), and/or ProductTaxDeclaration (e.g., DueItemProcessingClearingOut.ConfirmClearing).

A ClearingRequestMessage data type may contain a PaymentAllocation object contained in the business document and the business information that can be relevant for sending a business document in a message. It can contain the following exemplary packages: MessageHeader package and ClearingRequest package. This message data type can provide the structure for the following message types and the operations that are based on them including: ClearingRequest, ClearingCancellationRequest, and/or ClearingConfirmation.

In some implementations, a MessageHeader Package can be a grouping of business information that can be relevant for sending a business document in a message. It can contain the entity MessageHeader. A Message Header can be a grouping of business information from the perspective of the sending application and can contain identification of the business document in a message and/or Information about the sender. The MessageHeader can be of the type GDT: BusinessDocumentMessageHeader. In certain implementations, the following elements of the GDT can be used: ID, ReferenceID, and/or CreationDateTime. The SenderParty can be the partner responsible for sending a business document at business application level. The SenderParty may be a GDT of type BusinessDocumentMessageHeaderParty.

The ClearingRequest Package can be a grouping of the ClearingRequest with its packages: PaymentExplanation package. The PaymentExplanation package may be not used in the message type ClearingCancellationRequest. The PaymentExplanation package may be not used in the message type ClearingConfirmation.

A ClearingRequest can be a business partner initiated payment that has been released for clearing. In certain implementations, ClearingRequest may contain the following elements: BaseBusinessTransactionDocumentReference, BaseBusinessTransactionDocumentDate, OriginBusinessTransactionDocumentReference, BusinessProcessVariantTypeCode, ClearingStatus, PaymentAmount, PayerParty, PayeeParty, HouseBankAccountInternalID, PartnerBankAccountInternalID, DebitValueDate, CreditValueDate, PaymentFormCode, PaymentPaymentAllocation-BusinessTransactionDocumentReference, PaymentReturnInitiatingBusinessTransactionDocumentReference, PaymentReturnSupplementCategoryCode, PaymentReturnBankChargeBearerCode, and/or PaymentAdviceBusinessTransactionDocumentReference. A BaseBusinessTransactionDocumentReference may be a reference to current PaymentAllocation business object, and may be a GDT of type BusinessTransactionDocumentReference. A BaseBusinessTransactionDocumentDate may be the date of the PaymentAllocation business object, and may be a GDT of type Date. An OriginBusinessTransactionDocumentReference may be a reference to original business transaction, and may be a GDT of type BusinessTransactionDocumentReference. A BusinessProcessVariantTypeCode may be a process variant of the business transaction, and may be a GDT of type BusinessProcessVariantTypeCode. A ClearingStatus may be notification whether the business partner initiated payment could be assigned to a business partner may be a GDT of type ClearingStatus, and may be optional. A PaymentAmount may be the payment amount, may be a GDT of type Amount. A PayerParty may be the party that initiated the payment, may be a GDT of type BusinessTransactionDocumentParty. A PayeeParty may be the party that accepted the payment, and may be a GDT of type BusinessTransactionDocumentParty. A HouseBankAccountInternalID may be the house bank account in which the payment took place, may be a GDT of type BankAccountInternalID, and may be optional. A PartnerBankAccountInternalID may be the bank account of the business partner, may be a GDT of type BankAccountInternalID, and may be optional. A DebitValueDate may be the value date, may be a GDT of type Date and may be optional. A CreditValueDate may be the value date, may be a GDT of type Date, and may be optional. A PaymentFormCode may be the coded representation of the payment form, may be a GDT of type PaymentFormCode, and may be optional. A PaymentPaymentAllocation-BusinessTransactionDocumentReference may be an identifier, which may be unique, of a PaymentAllocation that allocated a confirmed payment register item, may be a GDT BusinessTransactionDocumentReference, and may be optional. This PaymentAllocation can be the current PaymentAllocation itself, or, in the case of a notified payment item being allocated, then it can be a previously created PaymentAllocation. A PaymentReturnInitiatingBusinessTransactionDocumentReference may be an identifier, which may be unique, of a payment from which the return can be initiated and may be a GDT of type BusinessTransactionDocumentReference, and may be optional. A PaymentReturnSupplementCategoryCode may be the supplement category code of the returned payment and may be a GDT of type PaymentReturnSupplementCategoryCode, and may be optional. A PaymentReturnBankChargeBearerCode may be the bank charge bearer code of the returned payment and may be a GDT of type BankChargeBearerCode and may be optional. A PaymentAdviceBusinessTransactionDocumentReference may be an identifier, which may be unique, of the PaymentAdvice that was used as a notification for an allocated, confirmed payment register item, or that generated a notified payment register item that is still to be allocated, may be a GDT of type BusinessTransactionDocumentReference and may be optional.

In some implementations, the following integrity conditions and message types may be applicable to ClearingRequestMessage. Several business objects may be used as the basis for the ClearRequest package, however, the PaymentAllocation can be leading. Using the association AllocatedPaymentItem, four fields of the PaymentRegister business object can be filled (node Item): HouseBankAccount, DebitValueDate, CreditValueDate, and PaymentFormCode. If the current PaymentRegister items are based on the type 015 (may indicate Bank Statement), the PartnerBankAccount field can be filled from the bank statement. The ClearingRequest can contain a payment or payment instruction. A payment instruction can, in some examples, arrive a few days before the payment. In this case, the PaymentAdviceBusinessTransactionDocumentReference field can be filled. In some embodiments, the element ClearingRequestBaseBusinessTransactionDocumentReference can be used in the message type ClearingCancellationRequest. The element ClearingRequestBaseBusiness-TransactionDocumentReference may be used in the message type ClearingConfirmation.

In some implementations, a PaymentExplanation-Package groups payment explanations and reasons for differences from expected and actual payment amounts for a ClearingRequest. It may contain the entities PaymentExplanation and PaymentDifferenceExplanation. A payment explanation may specify the reason/reasons for a payment, with reference to one or more business documents such as contracts, invoices, credit memos, or sales orders. Payment amounts can be apportioned for each business document and explain the possible difference between the expected and the actual payment amount. For a PaymentExplanation, differences between expected and made payments can be explained by subordinate PaymentDifferenceExplanations.

In certain implementations, PaymentExplanation can contain the following elements: ID, OffsettingIndicator, BusinessTransactionDocumentDate, NetAmount, GrossAmount, TransactionCurrencyGrossAmount, CashDiscountAmount, TransactionCurrencyCashDiscountAmount, WithholdingTaxAmount, BankFeeAmount, ScandinavianPaymentReferenceID, SwissPaymentReferenceID, Note, OriginalPaymentTransactionInitiator Party, FinalPaymentTransactionDestinatedParty, InternalInvoice, ExternalInvoice, InternalContract, ExternalContract, InternalPurchaseOrderReference, and/or ExternalPurchaseOrderReference. An ID may be an identification of a PaymentExplanationItem in the context of a higher-level object or a payment, and may be a GDT of type PaymentExplanationItemID. This ID may uniquely identify a PaymentExplanationItem together with the ID of the higher-level object or the payment ID. An OffsettingIndicator may specify whether the amounts of this PaymentExplanationItem are offset with other PaymentExplanationItems on the same level or whether these amounts are included additively in the total amounts. It may be a GDT of type Indicator, and in some implementations may have a Qualifier of Offsetting and may be optional. A BusinessTransactionDocumentDate may be the date of the business document to which the PaymentExplanationItem refers, may be a GDT of type Date, and may be optional. A NetAmount may be the paid or collected amount, may be a GDT of type Amount, in some implementations may have a Qualifier of Net, and may be optional. A GrossAmount may be the amount of the business document to which the PaymentExplanationItem refers, for example, invoice amount or amount of the loan contract, may be a GDT of type Amount, in some implementations may have a Qualifier of Gross, and may be optional. A TransactionCurrencyGrossAmount may be the amount of the business document in transaction currency, may be a GDT of type Amount, in some implementations may have a Qualifier of Gross, and may be optional. A CashDiscountAmount may be the deducted cash discount, may be a GDT of type Amount, in some implementations may have a Qualifier of CashDiscount, and may be optional. A TransactionCurrencyCashDiscountAmount may be the cash discount amount in transaction currency, may be a GDT of type Amount, in some implementations may have a Qualifier of CashDiscount, and may be optional. A WithholdingTaxAmount may be the deducted withholding tax, may be a GDT of type Amount, in some implementations may have a Qualifier of WithholdingTax, and may be optional. A BankFeeAmount may be the deducted bank fees, may be a GDT of type Amount, in some implementations may have a Qualifier of Fee, and may be optional. A ScandinavianPaymentReferenceID may be the payment reference common in Scandinavia (i.e., KIDNO), may be a GDT of type Identifier, and may be optional. A SwissPaymentReferenceID may be the payment reference common in Switzerland (i.e., ESR reference), may be a GDT of type Identifier, and may be optional. A Note may be a user-defined text that explains the payment and the deducted amounts, may be a GDT of type Note, and may be optional. An OriginalPaymentTransactionInitiator Party may be the original party that initiated the payment, may be a GDT of type BusinessTransactionDocumentParty, and may be optional. A FinalPaymentTransactionDestinatedParty may be the party that accepts the payment, may be a GDT of type BusinessTransactionDocumentParty, and may be optional. An InternalInvoice may be an identification of the invoice by the company named in CompanyUUID; may be not used for navigation, may be a GDT of type BusinessTransactionDocumentReference, and may be optional. If it can be a company initiated payment, this field can be for information. For business partner initiated payments, this reference can be used during clearing. An ExternalInvoice may be an identification of the invoice of the business partner named in BusinessPartnerInternalID, may be a GDT of type BusinessTransactionDocumentReference, and may be optional. ExternalInvoice may be not used for navigation. If it is a company initiated payment, this field can be for information. For business partner initiated payments, this reference can be used during clearing. An InternalContract may be an identification of the contract by the company named in CompanyUUID, may be a GDT of type BusinessTransactionDocumentReference, and may be optional. InternalContract may not be used for navigation. If it can be a company initiated payment, this field can be for information. For business partner initiated payments, this reference can be used during clearing. An ExternalContract may be an identification of the contract of the business partner named in BusinessPartnerInternalID, may be a GDT of type BusinessTransactionDocumentReference, and may be optional. ExternalContract may be not used for navigation. If it can be a company initiated payment, this field can be for information. For business partner initiated payments, this reference can be used during clearing. An InternalPurchaseOrderReference may be an identification of the purchase order by the company named in CompanyUUID, may be a GDT of type BusinessTransactionDocumentReference, and may be optional. InternalPurchaseOrderReference may be not used for navigation. If it can be a company initiated payment, this field can be for information. For business partner initiated payments, this reference can be used during clearing. An ExternalPurchaseOrderReference may be an identification of the purchase order of the business partner named in BusinessPartnerInternalID may be a GDT of type BusinessTransactionDocumentReference, and may be optional. ExternalPurchaseOrderReference may be not used for navigation. If it can be a company initiated payment, this field can be for information. For business partner initiated payments, this reference can be used during clearing.

In some implementations, the PaymentExplanation package may be not part of the PaymentAllocation business object. These fields can be filled depending on the current payment medium, for example, payment advice and incoming check. The current payment medium can be determined using the association AllocatedPaymentItem in the PaymentRegister business object. The current PaymentRegister items can be based on the following types: 015 can Bank Statement, 018 can be Cash Payment, 021 can be Cash Transfer, 022 can be Check Deposit, 025 can be Clearing House Payment Order, 062 can be Incoming Check, 082 can be Payment Order, 083 can be Payment Advice.

The PaymentExplanation can be read from the appropriate business object depending on the current type. The PaymentDifferenceExplanation can be the documentation of the difference between the expected payment amount and the actual payment amount. In certain implementations, PaymentDifferenceExplanation can contain the following elements: OffsettingIndicator, Amount, ReasonCode, InternalInvoice, ExternalInvoice, InternalContract, ExternalContract, InternalPurchaseOrderReference, ExternalPurchaseOrderReference. An OffsettingIndicator specifies whether the difference amount can be offset with other PaymentDifferenceExplanationItems on the same level or whether this amount can be included additively in an amount at the level Item, may be a GDT of type Indicator, in some implementations may have a Qualifier of Offsetting, and may be optional. An Amount may be the amount of the adjustment of a payment (i.e., in payment currency), may be a GDT of type Amount, and may be optional. A ReasonCode may be the code for the reason of the payment difference may be a GDT of type PaymentDifferenceReasonCode, and may be optional. An InternalInvoice may be a reference to the invoice by the company named in CompanyUUID, may be a GDT of type BusinessTransactionDocumentReference, and may be optional. InternalInvoice may be not used for navigation. If it can be a company initiated payment, this field can be for information. For business partner initiated payments, this reference can be used during clearing. An ExternalInvoice may be an identification of the invoice of the business partner named in BusinessPartnerInternalID, may be a GDT of type BusinessTransactionDocumentReference, and may be optional. ExternalInvoice may be not used for navigation. If it can be a company initiated payment, this field can be information. For business partner initiated payments, this reference can be used during clearing. An InternalContract may be an identification of the contract by the company named in CompanyUUID, may be a GDT of type BusinessTransactionDocumentReference, and may be optional. InternalContract may be not used for navigation. If it can be a company initiated payment, this field can be for information. For business partner initiated payments, this reference can be used during clearing. An ExternalContract may be an identification of the contract of the business partner named in BusinessPartnerInternalID, may be a GDT of type BusinessTransactionDocumentReference, and may be optional. ExternalContract may be not used for navigation. If it is a company initiated payment, this field can be for information For business partner initiated payments, this reference can be used during clearing. An InternalPurchaseOrderReference may be an identification of the purchase order by the company named in CompanyUUID, may be a GDT of type BusinessTransactionDocumentReference. and may be optional. InternalPurchaseOrderReference may be not used for navigation. If it is a company initiated payment, this field may be for information. For business partner initiated payments, this reference can be used during clearing. An ExternalPurchaseOrderReference may be an identification of the purchase order of the business partner named in BusinessPartnerInternalID, may be a GDT of type BusinessTransactionDocumentReference, and may be optional. ExternalPurchaseOrderReference may be not be used for navigation. If it is a company initiated payment, this field can be for information. For business partner initiated payments, this reference can be used during clearing. Data types used (i.e., GDTs) include: BusinessDocumentMessageHeader, BusinessDocumentMessageID, DateTime, Busi nessTransactionDocumentReference, PaymentControlBlockBankAccount, BankAccountInternalID, PaymentFormCode, Note, BusinessTransactionDocumentItemID, Date, Identifier, Note, BusinessTransactionDocumentParty, Indicator, Amount, PaymentDifferenceReasonCode, and ClearingStatus.

FIGS. 227-1 through 227-14 illustrate one example logical configuration of ClearingRequestMessage message 227000. Specifically, this figure depicts the arrangement and hierarchy of various components such as one or more levels of packages, entities, and datatypes, shown here as 227000 through 227350. As described above, packages may be used to represent hierarchy levels. Entities are discrete business elements that are used during a business transaction. Data types are used to type object entities and interfaces with a structure. For example, ClearingRequestMessage message 227000 includes, among other things, ClearingRequest 227032. Accordingly, heterogeneous applications may communicate using this consistent message configured as such.

This section describes the message types and their signatures that are derived from the operations of the business object PaymentAllocation. In a signature, the business object can be contained as a "leading" business object. The message data type can define the structure of the following message types. Business partner initiated payments can be processed in the process component Payment Processing. The Due Item Management component can be informed about these payments using a Clearing Message. The clearing message can contain details regarding the receivables and payables that are to be cleared with the payment. If the payment cannot be assigned to a business partner, a Clearing Confirmation Message can be returned to the Payment Processing process component. The Payment Processing process component can also cancel a clearing by sending a Cancel Clearing Message to the Due Item Management process component. The ClearingRequest can be a request to clear a business partner initiated payment with receivables and payables. The structure of this message type can be determined by the message data type ClearingRequestMessage. This message type can be used in the following operations of business objects: PaymentAllocation (e.g., PaymentProcessingClearingOut.ClearingRequest), DuePayment (e.g., DueItemProcessingClearingIn.CreateClearing), ProductTaxDeclaration (e.g., DueItemProcessingClearingIn.CreateClearing).

In some implementations, a ClearingCancellationRequest can be a request to cancel a clearing of receivables and payables. The structure of this message type can be determined by the message data type ClearingRequestMessage. This message type can be used in the following operations of business objects: PaymentAllocation (e.g., PaymentProcessingClearingOut.ClearingRequestCancellation), DuePayment (e.g., DueItemProcessingClearingIn.CancelClearing), and/or ProductTaxDeclaration (e.g., DueItemProcessingClearingIn.CancelClearing).

In some implementations, a ClearingConfirmation can be notification whether a request to clear a business partner initiated payment with receivables and payables could be performed. This message type can be used in the following operations of business objects: PaymentAllocation (e.g., PaymentProcessingClearingIn.ChangePaymentAllocationBasedOnClearingRequestConfirmation), DuePayment (e.g., DueItemProcessingClearingOut.ConfirmClearing), and/or ProductTaxDeclaration (e.g., DueItemProcessingClearingOut.ConfirmClearing).

A ClearingRequestMessage data type may contain a PaymentAllocation object contained in the business document and the business information that can be relevant for sending a business document in a message. It can contain the following exemplary packages: MessageHeader package and ClearingRequest package. This message data type can provide the structure for the following message types and the operations that are based on them including: ClearingRequest, ClearingCancellationRequest, and/or ClearingConfirmation.

In some implementations, a MessageHeader Package can be a grouping of business information that can be relevant for sending a business document in a message. It can contain the entity MessageHeader. A Message Header can be a grouping of business information from the perspective of the sending application and can contain identification of the business document in a message and/or Information about the sender. The MessageHeader can be of the type GDT: BusinessDocumentMessageHeader. In certain implementations, the following elements of the GDT can be used: ID, ReferenceID, and/or CreationDateTime. The SenderParty can be the partner responsible for sending a business document at business application level. The SenderParty may be a GDT of type BusinessDocumentMessageHeaderParty.

The ClearingRequest Package can be a grouping of the ClearingRequest with its packages: PaymentExplanation package. The PaymentExplanation package may be not used in the message type ClearingCancellationRequest. The PaymentExplanation package may be not used in the message type ClearingConfirmation.

A ClearingRequest can be a business partner initiated payment that has been released for clearing. In certain implementations, ClearingRequest may contain the following elements: BaseBusinessTransactionDocumentReference, BaseBusinessTransactionDocumentDate, OriginBusinessTransactionDocumentReference, BusinessProcessVariantTypeCode, ClearingStatus, PaymentAmount, PayerParty, PayeeParty, HouseBankAccountInternalID, PartnerBankAccountInternalID, DebitValueDate, CreditValueDate, PaymentFormCode, PaymentPaymentAllocationBusinessTransactionDocumentReference, PaymentReturnInitiatingBusinessTransactionDocumentReference, PaymentReturnSupplementCategoryCode, PaymentReturnBankChargeBearerCode, and/or PaymentAdviceBusinessTransactionDocumentReference. A BaseBusinessTransactionDocumentReference may be a reference to current PaymentAllocation business object, and may be a GDT of type BusinessTransactionDocumentReference. A BaseBusinessTransactionDocumentDate may be the date of the PaymentAllocation business object, and may be a GDT of type Date. An OriginBusinessTransactionDocumentReference may be a reference to original business transaction, and may be a GDT of type BusinessTransactionDocumentReference. A BusinessProcessVariantTypeCode may be a process variant of the business transaction, and may be a GDT of type BusinessProcessVariantTypeCode. A ClearingStatus may be notification whether the business partner initiated payment could be assigned to a business partner may be a GDT of type ClearingStatus, and may be optional. A PaymentAmount may be the payment amount, may be a GDT of type Amount. A PayerParty may be the party that initiated the payment, may be a GDT of type BusinessTransactionDocumentParty. A PayeeParty may be the party that accepted the payment, and may be a GDT of type BusinessTransactionDocumentParty. A HouseBankAccountInternalID may be the house bank account in which the payment took place, may be a GDT of type BankAccountInternalID, and may be optional. A PartnerBankAccountInternalID may be the bank account of the business partner, may be a GDT of type BankAccountInternalID, and may be optional. A DebitValueDate may be the value date, may be a GDT of type Date and may be optional. A CreditValueDate may be the value date, may be a GDT of type Date, and may be optional. A PaymentFormCode may be the coded representation of the payment form, may be a GDT of type PaymentFormCode, and may be optional. A PaymentPaymentAllocationBusinessTransactionDocumentReference may be an identifier, which may be unique, of a PaymentAllocation that allocated a confirmed payment register item, may be a GDT BusinessTransactionDocumentReference, and may be optional. This PaymentAllocation can be the current PaymentAllocation itself, or, in the case of a notified payment item being allocated, then it can be a previously created PaymentAllocation. A PaymentReturnInitiatingBusinessTransactionDocumentReference may be an identifier, which may be unique, of a payment from which the return can be initiated and may be a GDT of type BusinessTransactionDocumentReference, and may be optional. A PaymentReturnSupplementCategoryCode may be the supplement category code of the returned payment and may be a GDT of type PaymentReturnSupplementCategoryCode, and may be optional. A PaymentReturnBankChargeBearerCode may be the bank charge bearer code of the returned payment and may be a GDT of type BankChargeBearerCode and may be optional. A PaymentAdviceBusinessTransactionDocumentReference may be an identifier, which may be unique, of the PaymentAdvice that was used as a notification for an allocated, confirmed payment register item, or that generated a notified payment register item that is still to be allocated, may be a GDT of type BusinessTransactionDocumentReference and may be optional.

In some implementations, the following integrity conditions and message types may be applicable to ClearingRequestMessage. Several business objects may be used as the basis for the ClearRequest package, however, the PaymentAllocation can be leading. Using the association AllocatedPaymentItem, four fields of the PaymentRegister business object can be filled (node Item): HouseBankAccount, DebitValueDate, CreditValueDate, and PaymentFormCode. If the current PaymentRegister items are based on the type 015 (may indicate Bank Statement), the PartnerBankAccount field can be filled from the bank statement. The ClearingRequest can contain a payment or payment instruction. A payment instruction can, in some examples, arrive a few days before the payment. In this case, the PaymentAdviceBusinessTransactionDocumentReference field can be filled. In some embodiments, the element ClearingRequestBaseBusinessTransactionDocumentReference can be used in the message type ClearingCancellationRequest. The element ClearingRequestBaseBusiness-TransactionDocumentReference may be used in the message type ClearingConfirmation.

In some implementations, a PaymentExplanation-Package groups payment explanations and reasons for differences from expected and actual payment amounts for a ClearingRequest. It may contain the entities PaymentExplanation and PaymentDifferenceExplanation. A payment explanation may specify the reason/reasons for a payment, with reference to one or more business documents such as contracts, invoices, credit memos, or sales orders. Payment amounts can be apportioned for each business document and explain the possible difference between the expected and the actual payment amount. For a PaymentExplanation, differences between expected and made payments can be explained by subordinate PaymentDifferenceExplanations.

In certain implementations, PaymentExplanation can contain the following elements: ID, OffsettingIndicator, BusinessTransactionDocumentDate, NetAmount, GrossAmount, TransactionCurrencyGrossAmount, CashDiscountAmount, TransactionCurrencyCashDiscountAmount, WithholdingTaxAmount, BankFeeAmount, ScandinavianPaymentReferenceID, SwissPaymentReferenceID, Note, OriginalPaymentTransactionInitiator Party, FinalPaymentTransactionDestinatedParty, InternalInvoice, ExternalInvoice, InternalContract, ExternalContract, InternalPurchaseOrderReference, and/or ExternalPurchaseOrderReference. An ID may be an identification of a PaymentExplanationItem in the context of a higher-level object or a payment, and may be a GDT of type PaymentExplanationItemID. This ID may uniquely identify a PaymentExplanationItem together with the ID of the higher-level object or the payment ID. An OffsettingIndicator may specify whether the amounts of this PaymentExplanationItem are offset with other PaymentExplanationItems on the same level or whether these amounts are included additively in the total amounts. It may be a GDT of type Indicator, and in some implementations may have a Qualifier of Offsetting and may be optional. A BusinessTransactionDocumentDate may be the date of the business document to which the PaymentExplanationItem refers, may be a GDT of type Date, and may be optional. A NetAmount may be the paid or collected amount, may be a GDT of type Amount, in some implementations may have a Qualifier of Net, and may be optional. A GrossAmount may be the amount of the business document to which the PaymentExplanationItem refers, for example, invoice amount or amount of the loan contract, may be a GDT of type Amount, in some implementations may have a Qualifier of Gross, and may be optional. A TransactionCurrencyGrossAmount may be the amount of the business document in transaction currency, may be a GDT of type Amount, in some implementations may have a Qualifier of Gross, and may be optional. A CashDiscountAmount may be the deducted cash discount, may be a GDT of type Amount, in some implementations may have a Qualifier of CashDiscount, and may be optional. A TransactionCurrencyCashDiscountAmount may be the cash discount amount in transaction currency, may be a GDT of type Amount, in some implementations may have a Qualifier of CashDiscount, and may be optional. A WithholdingTaxAmount may be the deducted withholding tax, may be a GDT of type Amount, in some implementations may have a Qualifier of WithholdingTax, and may be optional. A BankFeeAmount may be the deducted bank fees, may be a GDT of type Amount, in some implementations may have a Qualifier of Fee, and may be optional. A ScandinavianPaymentReferenceID may be the payment reference common in Scandinavia (i.e., KIDNO), may be a GDT of type Identifier, and may be optional. A SwissPaymentReferenceID may be the payment reference common in Switzerland (i.e., ESR reference), may be a GDT of type Identifier, and may be optional. A Note may be a user-defined text that explains the payment and the deducted amounts, may be a GDT of type Note, and may be optional. An OriginalPaymentTransactionInitiator Party may be the original party that initiated the payment, may be a GDT of type BusinessTransactionDocumentParty, and may be optional. A FinalPaymentTransactionDestinatedParty may be the party that accepts the payment, may be a GDT of type BusinessTransactionDocumentParty, and may be optional. An InternalInvoice may be an identification of the invoice by the company named in CompanyUUID; may be not used for navigation, may be a GDT of type BusinessTransactionDocumentReference, and may be optional. If it can be a company initiated payment, this field can be for information. For business partner initiated payments, this reference can be used during clearing. An ExternalInvoice may be an identification of the invoice of the business partner named in BusinessPartnerInternalID, may be a GDT of type BusinessTransactionDocumentReference, and may be optional. ExternalInvoice may be not used for navigation. If it is a company initiated payment, this field can be for information. For business partner initiated payments, this reference can be used during clearing. An InternalContract may be an identification of the contract by the company named in CompanyUUID, may be a GDT of type BusinessTransactionDocumentReference, and may be optional. InternalContract may not be used for navigation. If it can be a company initiated payment, this field can be for information. For business partner initiated payments, this reference can be used during clearing. An ExternalContract may be an identification of the contract of the business partner named in BusinessPartnerInternalID, may be a GDT of type BusinessTransactionDocumentReference, and may be optional. ExternalContract may be not used for navigation, If it can be a company initiated payment, this field can be for information. For business partner initiated payments, this reference can be used during clearing. An InternalPurchaseOrderReference may be an identification of the purchase order by the company named in CompanyUUID, may be a GDT of type BusinessTransactionDocumentReference, and may be optional. InternalPurchaseOrderReference may be not used for navigation. If it can be a company initiated payment, this field can be for information. For business partner initiated payments, this reference can be used during clearing. An ExternalPurchaseOrderReference may be an identification of the purchase order of the business partner named in BusinessPartnerInternalID may be a GDT of type BusinessTransactionDocumentReference, and may be optional. ExternalPurchaseOrderReference may be not used for navigation. If it can be a company initiated payment, this field can be for information. For business partner initiated payments, this reference can be used during clearing.

In some implementations, the PaymentExplanation package may be not part of the PaymentAllocation business object. These fields can be filled depending on the current payment medium, for example, payment advice and incoming check. The current payment medium can be determined using the association AllocatedPaymentItem in the PaymentRegister business object. The current PaymentRegister items can be based on the following types: 015 can Bank Statement, 018 can be Cash Payment, 021 can be Cash Transfer, 022 can be Check Deposit, 025 can be Clearing House Payment Order, 062 can be Incoming Check, 082 can be Payment Order, 083 can be Payment Advice.

The PaymentExplanation can be read from the appropriate business object depending on the current type. The PaymentDifferenceExplanation can be the documentation of the difference between the expected payment amount and the actual payment amount. In certain implementations, PaymentDifferenceExplanation can contain the following elements: OffsettingIndicator, Amount, ReasonCode, InternalInvoice, ExternalInvoice, InternalContract, ExternalContract, InternalPurchaseOrderReference, ExternalPurchaseOrderReference. An OffsettingIndicator specifies whether the difference amount can be offset with other PaymentDifferenceExplanationItems on the same level or whether this amount can be included additively in an amount at the level Item, may be a GDT of type Indicator, in some implementations may have a Qualifier of Offsetting, and may be optional. An Amount may be the amount of the adjustment of a payment (i.e., in payment currency), may be a GDT of type Amount, and may be optional. A ReasonCode may be the code for the reason of the payment difference may be a GDT of type PaymentDifferenceReasonCode, and may be optional. An InternalInvoice may be a reference to the invoice by the company named in CompanyUUID, may be a GDT of type BusinessTransactionDocumentReference, and may be optional. InternalInvoice may be not used for navigation. If it can be a company initiated payment, this field can be for information. For business partner initiated payments, this reference can be used during clearing. An ExternalInvoice may be an identification of the invoice of the business partner named in BusinessPartnerInternalID, may be a GDT of type BusinessTransactionDocumentReference, and may be optional. ExternalInvoice may be not used for navigation. If it can be a company initiated payment, this field can be information. For business partner initiated payments, this reference can be used during clearing. An InternalContract may be an identification of the contract by the company named in CompanyUUID, may be a GDT of type BusinessTransactionDocumentReference, and may be optional. InternalContract may be not used for navigation. If it can be a company initiated payment, this field can be for information. For business partner initiated payments, this reference can be used during clearing. An ExternalContract may be an identification of the contract of the business partner named in BusinessPartnerInternalID, may be a GDT of type BusinessTransactionDocumentReference, and may be optional. ExternalContract may be not used for navigation. If it is a company initiated payment, this field can be for information. For business partner initiated payments, this reference can be used during clearing. An InternalPurchaseOrderReference may be an identification of the purchase order by the company named in CompanyUUID, may be a GDT of type BusinessTransactionDocumentReference. and may be optional. InternalPurchaseOrderReference may be not used for navigation. If it is a company initiated payment, this field may be for information. For business partner initiated payments, this reference can be used during clearing. An ExternalPurchaseOrderReference may be an identification of the purchase order of the business partner named in BusinessPartnerInternalID, may be a GDT of type BusinessTransactionDocumentReference, and may be optional. ExternalPurchaseOrderReference may be not be used for navigation. If it is a company initiated payment, this field can be for information. For business partner initiated payments, this reference can be used during clearing. Data types used (i.e., GDTs) include: BusinessDocumentMessageHeader, BusinessDocumentMessageID, DateTime, BusinessTransactionDocumentReference, PaymentControlBlockBankAccount, BankAccountInternalID, PaymentFormCode, Note, BusinessTransactionDocumentItemID, Date, Identifier, Note, BusinessTransactionDocumentParty, Indicator, Amount, PaymentDifferenceReasonCode, and ClearingStatus.

PaymentOrder business object model

FIG. 228-1 through 228-2 illustrates an example PaymentOrder business object model 228008. Specifically, this model depicts interactions among various hierarchical components of the PaymentOrder, as well as external components that interact with the PaymentOrder (shown here as 228000 through 228006 and 228010 through 228022).

A PaymentOrder is an order within a company to make a payment to a business partner at a specified time. A Payment Order can be a collective instruction that contains several separate instructions. The PaymentOrder not only requests the execution of a payment, it also contains all data necessary for the execution. A PaymentOrder can occur in the specializations BankTransferPaymentOrder, DirectDebitPaymentOrder, OutgoingChequePaymentOrder, and PaymentCardPaymentPaymentOrder. A payment order can be executed by the company itself e.g. check printing or by a third party e.g. a bank transfer by the house bank. A payment order is executed using other business objects differentiated according to payment types e.g. OutgoingCheque, BankTransfer. A PaymentOrder is part of the processing component Payment Processing. A PaymentOrder includes information on the time and manner of the payment processing, proposals for the payment processing through a specific payment procedure with the house bank, information on the parties between which the payment should take place, an explanation on the payment with reference to one or more business documents e.g. paid invoices, information on the status of the payment order, information on changes in receivables and payables and financial transactions result in postings in Financial Accounting, and information on all messages from bank and value determination. Instructions can be grouped together in a collective payment instruction to save costs. PaymentOrder can be represented by the root node PaymentOrder.

The Business Object Process Integration includes the following models: Due Item Processing, Payment Processing, Payment Processing Accounting, and Service Interface Payment Request In. The Service Interface Payment Request In is part of the following Process Integration Model: Due Item Processing_Payment Processing. The interface Payment Request In groups all operations, which inform the PaymentProcessing about payment requests, which are initiated in other process components. It supports synchronous operations to get payment relevant data and to reserve liquidity for an upcoming payment and asynchronous operations to transfer requests for payments to the PaymentProcessing.

A PaymentProcessingPaymentRequestIn.CreatePaymentReservation is a reservation of a payment will be created in that case that payment data are checked and determined synchronously by a caller and the result will directly be sent back. The reservation has to be considered during the check of available amount of a house bank account until the payment order has been released. The operation is based on message types PaymentOrderReservationRequest and PaymentOrderReservationConfirmation (Derived from business object PaymentOrder). A PaymentProcessingPaymentRequestIn.CancelPaymentReservation is a method to cancel a previously created payment reservation. The operation is based on message type PaymentOrderReservationCancellationNotification (Derived from business object PaymentOrder). A PaymentProcessingPaymentRequestIn.SyncChangePaymentReservation is a method to change a reservation of payment and confirm the change to the caller. The operation is based on message types PaymentOrderReservationChangeRequest and PaymentOrderReservationChangeConfirmation (Derived from business object PaymentOrder). A PaymentProcessingPaymentRequestIn.ChangePaymentReservation is a method change a reservation of payment without confirming the change to the caller. The operation is based on message type PaymentOrderReservationChangeCancellationNotification (Derived from business object PaymentOrder).

PaymentProcessingPaymentRequestIn.CreatePaymentOrder creates a payment order in status requested. The operation is based on message type PaymentOrderRequest (Derived from business object PaymentOrder). A PaymentProcessingPaymentRequestIn.CancelPaymentOrder is a method to cancel a previously created PaymentOrder with status requested. The operation is based on message type PaymentOrderCancellationRequest (Derived from business object PaymentOrder). A PaymentProcessingPaymentRequestOut.ConfirmPaymentRequest is a confirmation of the creation of a PaymentOrder with status requested. The operation is based on message type PaymentOrderConfirmation (Derived from business object PaymentOrder).

The Service Interface Payment Accounting Out is part of the following Process Integration Model: Payment Processing_Accounting. The service interface Payment Accounting Out groups the operations, which inform the Accounting of changes of cash receipts and cash disbursements in Payment Processing. A PaymentProcessingAccountingOut.NotifyOfPayment is a means to Notify Financial Accounting about (upcoming) cash receipts and cash disbursements. The operation is based on message type PaymentAccountingNotification (Derived from business object Accounting Notification). PaymentProcessingPaymentAccountingOut.RequestPaymentCancellation is a method to cancel an (upcoming) cash receipt or cash disbursement in Financial Accounting. The operation is based on message type PaymentAccountingCancellationRequest (Derived from business object Accounting Notification).

A PaymentOrder 228026 is an order within a company to make a payment to a business partner at a specified time. A Payment Order can be a collective instruction that contains several separate instructions. The PaymentOrder not only requests the execution of a payment, it also contains all data necessary for the execution. In addition to payment-specific information, such as payment amount, payment procedure or house bank account, a PaymentOrder also contains administrative information and information on the processing component that initiated the payment.

A PaymentOrder occurs in incomplete and disjoint specializations including BankTransferPaymentOrder, DirectDebitPaymentOrder, OutgoingChequePaymentOrder, and PaymentCardPaymentPaymentOrder. A BankTransferPaymentOrder 228028 is used in cases where the payment type is a bank transfer. A DirectDebitPaymentOrder 228030 is used in cases where the payment type is a direct debit. A OutgoingChequePaymentOrder 228034 is used in cases where the payment type is a check. A PaymentCardPaymentPaymentOrder 228032 is used in cases where the payment type is a payment card. The elements located at the root node are defined by the type GDT PaymentOrderElements including UUID, ID, BaseBusinessTransactionDocumentReference, CompanyID, CompanyUUID, BusinessPartnerID, BusinessPartnerUUID, BusinessPartnerRoleCategoryCode, HouseBankAccountInternalID, HouseBankAccountUUID, DestinatedHouseBankAccountInternalID, SystemAdministrativeData, PaymentExecutionDate, ReleaseDocumentDate, TypeCode, CompanyContactPersonInternalID, PaymentBlock, PaymentAmount, PaymentFormCode, PaymentProcedureCode, FirstPaymentInstruction, SecondPaymentInstruction, ThirdPaymentInstruction, FourthPaymentInstruction, BankChargeBearerCode, PaymentPriorityCode, PaymentOrderGroupID, PaymentMediumFormatCode, PaymentMediumFormatPaymentProcedureCode, SinglePaymentIndicator, AdviceRequiredIndicator, PaymentCorrespondenceSortCriterionText, ImmediatePrintRequiredIndicator, BusinessPartnerBankDetailsID, ValueDate, Debit, CreditValueDate, BankPaymentOrder, BankChargeAmount, ChequePaymentOrder, ChequeID, ChequeIssueDate, ChequeLotID, CreditCardPaymentOrder, CompanyClearingHouseID, PaymentCardUUID, PaymentCardID, BusinessPartnerPaymentCardDetailsID, PaymentCardPaymentAuthorizationRequestorID, PaymentCardPaymentAuthorizationClearingHouseID, PaymentCard, PaymentCardVerificationValueText, PaymentCardVerificationValueAvailabilityCode, PaymentCardVerificationValueCheckRequiredIndicator, AuthorizationRequiredIndicator, PreAuthorizationIndicator, AuthorizationAppliedIndicator, PaymentAuthorizationDateTime, PaymentCardAuthorizationLimitAmount, PaymentAuthorizedAmount, PaymentAuthorizationExpirationDate, AuthorizationResultCode, AuthorizationPaymentCardAddressVerificationResultCode, AuthorizationPaymentCardVerificationResultCode, AuthorizationPaymentCardVerificationValueVerificationResultCode, AuthorizationResultDescription, PaymentCardDataOriginTypeCode, Busi nessPartnerPaymentCardDetailsKey, BusinessPartnerUUID, and BusinessPartnerPaymentCardDetailsID. A UUID is a universal unique ID of the PaymentOrder and is a GDT of type UUID. An ID is a unique ID of PaymentOrder and is a GDT of type BusinessTransactionDocumentID. A BaseBusinessTransactionDocumentReference to the business document that created the payment order and is a GDT of type BusinessTransactionDocumentReference. This is optional. A CompanyID is a unique identifier of the company to which this payment register belongs and is a GDT of type CompanyID. A CompanyUUID is a universal unique ID of the business involved in the role payer or payee and is a GDT of type UUID. A BusinessPartnerID is a unique identifier of the partner and is a GDT of BusinessPartnerInternalID. A BusinessPartnerUUID is a universal unique ID of the business partner involved in the role payer or payee and is a GDT of type UUID. A BusinessPartnerRoleCategoryCode is the role of the business partner in this payment and is a GDT of type PartyRoleCategoryCode, the codes Payer, Payee apply. A HouseBankAccountInternalID is a universally unique identifier of a HouseBankAccount and is a GDT of type BankAccountInternalID. This is optional. A HouseBankAccountUUID is a foreign key relationship with the house bank account (is saved as GUID in the DB and not as UUID) and is a GDT of type UUID. This can be optional. A DestinatedHouseBankAccountInternalID is an identifier of HouseBankAccount to which the cash is transferred during a cash transfer and is a GDT of type BankAccountInternalID. This is optional. A SystemAdministrativeData is administrative data retained by a system that includes the system users and the change dates/times. Relevant for the actions "Create" and "update" and is a GDT of type SystemAdministrativeData. A PaymentExecutionDate is a date on which the house bank should make the payment (relevant for determining the value date) and is a GDT of type Date and, in some implementations, can have a Qualifier of Execution. This is optional. A ReleaseDocumentDate is a date on which the payment order was released (relevant for the action "release") and is a GDT of type Date and, in some implementations, can have a Qualifier of: Document. A TypeCode is a coded representation of the type of Payment Order and is a GDT of type BusinessProcessVariantTypeCode. A CompanyContactPersonInternalID is a contact person for questions about payment in the company that initiated the payment and is a GDT of type ContactPersonInternalID and is optional. A PaymentBlock is a reason and period for the lock of a business document in payment processes and is a GDT of type PaymentBlock. This is optional. A PaymentAmount is a payment amount in transaction currency and is a GDT of type Amount and, in some implementations, can have a Qualifier of: Payment. A PaymentFormCode is a coded representation of the payment card company. The payment method is the way a product or service is paid for and is a GDT of type PaymentFormCode. The codes 02, 04, 05, 06 may apply. This is optional. A PaymentProcedureCode is a coded representation of a payment procedure. A payment is a technical version of a payment process which itself is a specialization of the payment method and is a GDT of type PaymentProcedureCode. The codes 1-8 may apply. This is optional. A FirstPaymentInstruction is an instruction on how a payment should be made and which activities should be carried out for a payment ("instructions"). Maximal four payment instructions are allowed for one payment order. For some kind of instructions it could be defined which one of the instruction fields should be filled. The FirstPaymentInstruction is a GDT of type PaymentInstruction and is optional. A SecondPaymentInstruction is an additional instruction and is a GDT of type PaymentInstruction. This is optional. A ThirdPaymentInstruction is an additional instruction and is a GDT of type PaymentInstruction. This is optional. A FourthPaymentInstruction is an additional instruction and is GDT of type PaymentInstruction. This is optional. A BankChargeBearerCode is a coded representation of the bearer of the charges of a bank transaction and is a GDT of type BankChargeBearerCode. This is optional. A PaymentPriorityCode indicates that a payment order should be executed quickly and is a GDT of type BusinessTransactionPriorityCode. Codes 2 and 3 may apply and is optional. A PaymentOrderGroupID is a unique indicator of a group of business documents that should be flagged as belonging together in a business process and is a GDT of type BusinessTransactionDocumentGroupID. This is optional. A PaymentMediumFormatCode is a coded representation of the file format in which a payment transaction message is transferred to the bank and is a GDT of type PaymentMediumFormatCode. This is optional. A PaymentMediumFormatPaymentProcedureCode is a coded representation of an additional specification to the file format. With regard to various payment formats, which are used for different payment procedures, the payment procedures are designated by it. PaymentMediumFormatPaymentProcedureCode is a GDT of type PaymentMediumFormatPaymentProcedureCode. A SinglePaymentIndicator indicates that a payment request cannot be put with another payment request and is a GDT of type SinglePaymentIndicator. This is optional. An AdviceRequiredIndicator indicates that a payment advice note should be sent for a payment and is a GDT of type Indicator and, in some implementations, can have a Qualifier of: Required. This is optional. A PaymentCorrespondenceSortCriterionText is text to alphabetically determine the sequence of payment correspondence documents. The text is created for each business object instance by concatenating the contents of the fields by which the payment correspondence may be sorted. The PaymentCorrespondenceSortCriterionText is a GDT of type Text and is optional. A ImmediatePrintRequiredIndicator specifies whether a medium should be printed immediately after the end of the business process provided that the medium can be printed and is a GDT of type ImmediatePrintRequiredIndicator. This is optional. A BusinessPartnerBankDetailsID is the ID of bank details in the context of a business partner and is a GDT of type BusinessPartnerBankDetailsID. This is optional. A DebitValueDate is a due date of the payment amount in the bank account of the business partner who initiated the payment and is a GDT of type Date and, in some implementations, can have a Qualifier of Value. This is optional. A CreditValueDate is a due date of the payment amount in the bank account of the business partner involved in the payment, but did not initiate it and is a GDT of type Date and, in some implementations, can have a Qualifier of Value. This is optional.

A BankPaymentOrder is defined by the type IDT: BankPaymentOrder and includes BankChargeAmount which are Bank charges in transaction currency and is a GDT of type Amount and, in some implementations, can have a Qualifier of BankCharge.

The specialization ChequePaymentOrder is defined by the type IDT: ChequePaymentOrder and includes ChequeID, ChequeIssueDate, ChequeLotID, and Payment Order. A ChequeID is a check number. It can be entered manually. If you do not enter one, a check number is assigned in BO OutgoingCheck. The ChequeID is a GDT of type BusinessTransactionDocumentID and is optional. A ChequeIssueDate is an issue date of a check. If it is not entered manually, the PaymentExecutionDate is entered and is a GDT of type Date and, in some implementations, can have a Qualifier of Issue. This is optional. A ChequeLotID is an ID for a check lot. It can be entered but it is determined in the BO OutgoingCheque, not by the Payment Order. The ChequeLotID is a GDT of type ChequeLotID and is optional.

The specialization CreditCardPaymentOrder is defined by the type IDT: CreditCardPaymentOrder and includes CompanyClearingHouseID, PaymentCardUUID, PaymentCardID, BusinessPartnerPaymentCardDetailsID, PaymentCardPaymentAuthorizationRequestorID, PaymentCardPaymentAuthorizationClearingHouseID, PaymentCard, PaymentCardVerificationValueText, PaymentCardVerificationValueAvailabilityCode, PaymentCardVerificationValueCheckRequiredIndicator, AuthorizationRequiredIndicator, PreAuthorizationIndicator, PaymentAuthorizationDateTime, PaymentCardAuthorizationLimitAmount, PaymentAuthorizedAmount, PaymentAuthorizationExpirationDate, BusinessPartnerPaymentCardDetailsID, AuthorizationResultCode, AuthorizationPaymentCardAddressVerificationResultCode, AuthorizationPaymentCardVerificationResultCode, AuthorizationPaymentCardVerificationValueVerificationResultCode, AuthorizationResultDescription, PaymentCardDataOriginTypeCode, BusinessPartnerPaymentCardDetailsKey, and BusinessPartnerUUID. A CompanyClearingHouseID is an identifier of the company at the clearing house and is a GDT of type PartyPartyID and is optional. A PaymentCardUUID is a unique identifier of the payment card and is a GDT of type UUID. This is optional. A PaymentCardID is the internal id of the payment card and is a GDT of type PaymentCardID. A BusinessPartnerPaymentCardDetailsID is a unique identifier for a payment card details of a business partner and is a GDT of type BusinessPartnerPaymentCardDetailsID. This a optional. A PaymentCardPaymentAuthorizationRequestorID is an identifier for an authorization of a card payment that is assigned by the company and is a GDT of type PaymentCardPaymentAuthorizationPartyID; Role Requestor. This is optional. A PaymentCardPaymentAuthorizationClearingHouseID is an identifier for an authorization of a card payment that is assigned by a clearing house for card payments and is a GDT of type PaymentCardPaymentAuthorizationPartyID; Role ClearingHouse. This is optional. A PaymentCard is an identifier for an authorization of a card payment that is assigned by a clearing house for card payments and is a GDT of type PaymentCard. A PaymentCardVerificationValueText is verification code of payment cards and is a GDT of type PaymentCardVerificationValueText. This is optional. A PaymentCardVerificationValueAvailabilityCode is information regarding the availability of a verification code on a payment card and is a GDT of type PaymentCardVerificationValueAvailabilityCode. This is optional. A PaymentCardVerificationValueCheckRequiredIndicator is optional and is a GDT of type Indicator and, in some implementations, can have a Qualifier of Required. A AuthorizationRequiredIndicator is optional and is a GDT of type Indicator and, in some implementations, can have a Qualifier of Required. A PreAuthorizationIndicator is optional and is a GDT of type Indicator and, in some implementations, can have a Qualifier of PreAuthorization. A PaymentAuthorizationDateTime is optional and is the date on which the authorization check was carried out. A PaymentAuthorizationDateTime is a GDT of type DateTime and, in some implementations, can have a Qualifier of Authorization. A PaymentCardAuthorizationLimitAmount is optional and is the amount limit on the payment card. The PaymentCardAuthorizationLimitAmount is a GDT of type Amount and, in some implementations, can have a Qualifier of Limit. A PaymentAuthorizedAmount is the amount that can be taken from the credit card in TransactionCurrency and is a GDT of type Amount and, in some implementations, can have a Qualifier of Authorized. This is optional. A PaymentAuthorizationExpirationDate is a date until which the authorization is valid and is a GDT of type Date and, in some implementations, can have a Qualifier of Expiration and is optional. An AuthorizationResultCode is the Result of the success of an authorization at the clearing house and is a GDT of type AuthorizationResultCode. This is optional. An AuthorizationPaymentCardAddressVerificationResultCode is the result of the success of an address check at the clearing house and is a GDT of type PaymentCardAddressVerificationResultCode and is optional. An AuthorizationPaymentCardVerificationResultCode is the result of the success of a payment card check at the clearing house and is a GDT of type PaymentCardVerificationResultCode. This is optional. An AuthorizationPaymentCardVerificationValueVerificationResultCode is the result of the success of a check of a card verification value at the clearing house and is GDT of type PaymentCardVerificationValueVerificationResultCode. This is optional. An AuthorizationResultDescription is the result text of the authorization and is a GDT of type _SHORT_Description and, in some implementations, can have a Qualifier of: AuthorizationResult and is optional. A PaymentCardDataOriginTypeCode is the way in which the payment card data was included and is a GDT of type DataOriginTypeCode. This is optional. A BusinessPartnerPaymentCardDetailsKey is a unique identifier for a payment card details of a business partner and is a IDT of type BusinessPartnerPaymentCardDetailsKey. A BusinessPartnerUUID is a universal unique ID of the business partner involved in the role payer or payee and is a GDT of type UUID. This is optional. A BusinessPartnerPaymentCardDetailsID is a unique identifier for a payment card details of a business partner and is a GDT of type BusinessPartnerPaymentCardDetailsID and is optional.

In some applications the definitions in PaymentExecutionDateTime, HouseBankAccountValueDateTime or PartnerBankAccountValueDateTime may be filled.

A BusinessProcessVariantType 228046 has a cardinality of 1:n. A Bundling 228048 has a cardinality of 1:cn. A SplitItem 228036 has a cardinality 1:cn. A ProposedBankAccountPaymentProcedure 228038 has a cardinality of 1:cn. A PaymentExplanation 228040 has a cardinality of 1:cn. A FinancialAuditTrailDocumentation 228042 has a cardinality of 1:cn. A ApplicationLog 228044 has a cardinality of 1:cn. Company has a cardinality of 1:cn and specifies the company executing the PaymentOrder. BusinessPartner has a cardinality of 1:cn and specifies the business partner involved into the payment. A HouseBankAccount has a cardinality of c:cn and determines the house bank account of the company from which or to which the money should go. An ApplicationLog has a cardinality of 1:cn and provides documentation about the steps leading to the current combination of payment procedure, house bank account and partner bank connection necessary for the execution of the PaymentOrder.

Enterprise Service Infrastructure Actions enriches the PaymentOrder by determining the payment procedure, house bank account and partner bank connection depending on the currently filled attributes of the payment order. Additionally the debit value date and credit value date are calculated. According to the filled attributes of the payment order valid combinations of payment procedure, house bank account and partner bank connections will be determined. These combinations are prioritized. The combination with the highest priority is taken into the root node of the PaymentOrder and the data for the bank payment, cheque payment or credit card payment, depending on the payment procedure, will be filled. Additionally for each prioritization one instances of child node ‘ProposedBankAccountPaymentProcedure’ will be created under the header node PaymentOrder. If the payment order has to be split (configuration is defined), child nodes ‘SplitItem’ with the split item details will be created under the root node ‘PaymentOrder’. CheckLiquidity checks if there is enough liquidity on the HouseBankAccount to carry out the payment. Changes to the status include LiquidityStatus to “LiquidityProblem” or “NoLiquidityProblem”. IgnoreLiquidity ignores the liquidity problem on the HouseBankAccount if there is any. In some applications, this action enables the release of a payment although in case of a liquidity problem. Changes to the status may include LiquidityStatus to “NoLiquidityProblem”. Release releases the Payment Order for further processing. All the information related to Payment Order is now available. In some applications, the payment formcode, the IDTs Bank Payment order, Check Payment order or Credit Card Payment Order in the root may be filled with corresponding values for further processing. In some applications, a BusinessObject PaymentRegister may be created. Depending on the payment formcode the business objects ClearingHousePaymentOrder, BankPaymentOrder or OutgoingCheque may be created. Also a dependent object FinancialAuditTrailDocumentation may be created. Changes to the status may include PaymentOrderLifeCycleStatus to “Released” or sets the PaymentExecutionStatus to “Ordered”. NotifyOfPaymentExecution notifies the Payment Order about the execution of a payment. This is reflected in the status of associated objects like ClearingHousePaymentOrder, Bank Payment Order or Outgoing Cheque. Changes to the status may include PaymentExecutionStatus to “Ordered”, “InTransfer” or “Confirmed”.

In some applications, this may be used by Payment Medium business objects like BankPaymentOrder for confirmation. This may be used by business object Payment allocation.

Bundle bundles the PaymentOrders and has 2 alternatives: Bundling the PaymentOrder with another PaymentOrder which will result in a new PaymentOrder and Bundling to a PaymentOrder which already has the bundling nodes. Bundling the PaymentOrder with another PaymentOrder may result in a new PaymentOrder and Released, bundled or cancelled PaymentOrders may not be bundled. A new PaymentOrder may be created. For each PaymentOrder that could be bundled a child node ‘Bundling’ is created under the root node of the new PaymentOrder. This node may reference to the PaymentOrder that was bundled.

Changes to the status may include PaymentOrderLifeCycleStatus to “Bundled”. Bundling to a PaymentOrder which already has the bundling nodes. In this case there may not be a new PaymentOrder. Instead a new instance of a bundle node may be added. Released, bundled or cancelled PaymentOrder may not be bundled. A new node may be added to the bundle. This node may reference to the payment that was bundled. Changes to the status may include PaymentOrderLifeCycleStatus to “Bundled”. The action elements may be defined by the data type: PaymentOrderBundleActionElements and include ID which is a GDT of type BusinessTransactionDocumentID. This is mandatory and may be applicable in some applications for scenario 2. The parameter may hold the id of the PaymentOrder which has bundling nodes. e.g. Let the PaymentOrder (#4711) be bundled to another PaymentOrder (#0815) which has bundling nodes. The action “Bundle” will be called on #4711 with #0815 as ID parameter. Unbundle unbundles the PaymentOrder and does an implicit Enrich process (only if the initial state of the order was ‘Complete’) so as to determine the payment procedure, house bank and partner bank details. Only bundled PaymentOrder can be unbundled. Changes to the objects may include the unbundled PaymentOrder maintaining the statuses it had before bundling. Changes to other object may include removing the references of those unbundled PaymentOrders from the bundling node of the PaymentOrders.

Changes to the status may include PaymentOrderLifeCycleStatus to “Unbundled”. Cancel cancels the PaymentOrder. A PaymentOrder may be cancelled if the POStatus is ‘Released’ and the ExecutionStatus is ‘ReadyForTransfer’, this means no post processing for the PaymentOrder like ‘transferred to bank’ has been started. Changes to the object may include the PaymentOrder being cancelled and may not be further processed. Changes to other objects may include a dependent object FinancialAuditTrailDocumentation being created. Also the payment medium business objects as well as the Business Object PaymentRegister, created as a result of the action release, may have to be cancelled. Changes to the status may include PaymentOrderLifeCycleStatus to “Cancelled”

RequestAuthorization requests an authorization of the data of the incoming card payment. The action may be performed at all times and is called when the clearing house payment order is created during the Release action. CreatePaymentAdvice creates a payment advice and may set the payment advice required indicator to true. Changes to the status may include PaymentAdviceStatus to “IssueRequested”. IssuePaymentAdvice issues a payment advice and may change the status PaymentAdviceStatus to “Issued”. The IssuePaymentAdvice may be called by mass data run object for payment medium creation.

QueryByElements provides a list of all PaymentOrders which match by different attributes.

The query elements are defined by the data type: PaymentOrderElementsQueryElements an include ID, BaseBusinessTransactionDocumentReference, DestinatedHouseBankAccountInternalID, and SystemAdministrativeData. An ID is optional and a GDT of type BusinessTransactionDocumentID. A BaseBusinessTransactionDocumentReference is optional and is a GDT of type BusinessTransactionDocumentReference. A DestinatedHouseBankAccountInternalID is optional and a GDT of type BankAccountInternalID. SystemAdministrativeData is optional and is a GDT of type SystemAdministrativeData.

The specialization BankPaymentOrder is defined by the type IDT: BankPaymentOrder and includes BankChargeAmount. A BankChargeAmount is optional and is a GDT of type Amount and, in some implementations, can have a Qualifier of BankCharge. The specialization ChequePaymentOrder is defined by the type IDT: ChequePaymentOrder and includes ChequeID, ChequeIssueDate, and ChequeLotID. A ChequeID is optional and is a GDT of type BusinessTransactionDocumentID. A ChequeIssueDate is optional and is a GDT: Date and, in some implementations, can have a Qualifier of Issue. A ChequeLotID is optional and is a GDT of type ChequeLotID.

In some implementations, the specialization CreditCardPaymentOrder is defined by the type IDT: CreditCardPaymentOrder and include CompanyClearingHouseID, PaymentCardUUID, PaymentCardID, BusinessPartnerPaymentCardDetailsKey, BusinessPartnerUUID, Busi nessPartnerPaymentCardDetailsID, PaymentCardPaymentAuthorizationRequestorID, PaymentCardPaymentAuthorizationClearingHouseID, PaymentCard, PaymentCardAuthorizationLimitAmount, PaymentCardVerificationValueText, PaymentCardVerificationValueAvailabilityCode, PaymentCardVerificationValueCheckRequiredIndicator, AuthorizationRequiredIndicator, PreAuthorizationIndicator, AuthorizationAppliedIndicator, PaymentAuthorizationDateTime, PaymentAuthorizedAmount, PaymentAuthorizationExpirationDate, AuthorizationResultCode, AuthorizationPaymentCardAddressVerificationResultCode, AuthorizationPaymentCardVerificationResultCode, AuthorizationPaymentCardVerificationValueVerificationResultCode, AuthorizationResultDescription, PaymentCardDataOriginTypeCode, PaymentExecutionDate, ReleaseDocumentDate, TypeCode, CompanyContactPersonInternalID, PaymentBlock, PaymentPriorityCode, SinglePaymentIndicator, PaymentOrderGroupID, PaymentAmount, PaymentFormCode, PaymentProcedureCode, FirstPaymentInstruction, SecondPaymentInstruction, CreditValueDate, FourthPaymentInstruction, BankChargeBearerCode, PaymentMediumFormatCode, PaymentAdviceRequiredIndicator, ImmediatePrintRequiredIndicator, BusinessPartnerBankDetailsID, DebitValueDate, and ThirdPaymentInstruction. A CompanyClearingHouseID can be an identifier of the company at the clearing house and is a GDT of type PartyPartyID. This is optional. A PaymentCardUUID can be a unique identifier of the payment card and is a GDT of type UUID and is optional. A PaymentCardID can be the internal id of the payroll card and is a GDT of type PaymentCardID. This is optional. A BusinessPartnerPaymentCardDetailsKey can be a unique identifier for a payment card details of a business partner and is an IDT of type BusinessPartnerPaymentCardDetailsKey. A BusinessPartnerUUID can be a universal unique ID of the business partner involved in the role payer or payee and is a GDT of type UUID. This is optional. A BusinessPartnerPaymentCardDetailsID can be a unique identifier for a payment card details of a business partner and is a GDT of type BusinessPartnerPaymentCardDetailsID and is optional. A PaymentCardPaymentAuthorizationRequestorID can be an identifier for an authorization of a card payment that may assigned by the company and is a GDT of type PaymentCardPaymentAuthorizationPartyID; Role Requestor. This is optional. A PaymentCardPaymentAuthorizationClearingHouseID can be an identifier for an authorization of a card payment that may be assigned by a clearing house for card payments and is a GDT of type PaymentCardPaymentAuthorizationPartyID). This is optional. A PaymentCard can be an identifier for an authorization of a card payment that can be assigned by a clearing house for card payments and is a GDT of type PaymentCard. This is optional. A PaymentCardAuthorizationLimitAmount is optional and is a GDT of type Amount and, in some implementations, can have a Qualifier of Limit. A PaymentCardVerificationValueText can be verification code of payment cards and is a GDT of type PaymentCardVerificationValueText. This is optional. A PaymentCardVerificationValueAvailabilityCode can be information regarding the availability of a verification code on a payment card and is a GDT of type PaymentCardVerificationValueAvailabilityCode. This is optional. A PaymentCardVerificationValueCheckRequiredIndicator A PaymentCardVerificationValueCheckRequiredIndicator is an indication whether the CardVerificationValue in the authorizing message is to be conveyed or not. PaymentCardVerificationValueCheckRequiredIndicator is a GDT of type Indicator and, in some implementations, can have a Qualifier of Required. AuthorizationRequiredIndicator is an indication whether an authorization should take place or not. PreAuthorizationIndicator is an indication whether it concerns a FirstAuthorizing. AuthorizationRequiredIndicator is a GDT of type Indicator and, in some implementations, can have a Qualifier of Required. PreAuthorizationIndicator is a GDT of type Indicator and, in some implementations, can have a Qualifier of PreAuthorization. AuthorizationAppliedIndicator is an indication whether this authorization in the Settlement was already used or not. AuthorizationAppliedIndicator is a GDT of type AppliedIndicator and, in some implementations, can have a Qualifier of Authorization. A PaymentAuthorizationDateTime can be a date on which the authorization check was carried out and is a GDT: DateTime and, in some implementations, can have a Qualifier of Authorization. This is optional. A PaymentAuthorizedAmount can be a amount that can be taken from the credit card in TransactionCurrency and is a GDT of type Amount and, in some implementations, can have a Qualifier of Authorized. This is optional. A PaymentAuthorizationExpirationDate can be a date until which the authorization is valid and is a GDT of type Date and, in some implementations, can have a Qualifier of Expiration. This is an option. An AuthorizationResultCode can be a result of the success of an authorization at the clearing house and is a GDT of type AuthorizationResultCode and is optional. An AuthorizationPaymentCardAddressVerificationResultCode can be a result of the success of an address check at the clearing house and is a GDT: PaymentCardAddressVerificationResultCode and, in some implementations, can have a Qualifier of Authorization. This is optional. An AuthorizationPaymentCardVerificationResultCode can be a result of the success of a payment card check at the clearing house and is a GDT of type PaymentCardVerificationResultCode and, in some implementations, can have a Qualifier of Authorization. This optional. An AuthorizationPaymentCardVerificationValueVerificationResultCode can be a result of the success of a check of a card verification value at the clearing house and is a GDT of type PaymentCardVerificationValueVerificationResultCode and, in some implementations, can have a Qualifier of Authorization. This is optional. An AuthorizationResultDescription can result in the text of the authorization and is a GDT of type _SHORT_Description and, in some implementations, can have a Qualifier of: AuthorizationResult. This is optional. A PaymentCardDataOriginTypeCode can be the way in which the payment card data was included and is a GDT of type DataOriginTypeCode. This is optional. A PaymentExecutionDate is optional and is a GDT of type Date and, in some implementations, can have a Qualifier of Execution. A ReleaseDocumentDate is optional and is a GDT of type Date and, in some implementations, can have a Qualifier of: Document. A TypeCode is optional and is a GDT of type BusinessProcessVariantTypeCode. A CompanyContactPersonInternalID is optional and is a GDT of type ContactPersonInternalID. A PaymentBlock is optional and is a GDT of type PaymentBlock. A SinglePaymentIndicator is optional and is a GDT of type SinglePaymentIndicator. A PaymentPriorityCode is optional and is a GDT of type BusinessTransactionPriorityCode. Codes 2 and 3 may apply. A PaymentOrderGroupID is optional and is a GDT of type BusinessTransactionDocumentGroupID. A PaymentAmount is optional and is a GDT of type Amount and, in some implementations, can have a Qualifier of: Payment. A PaymentFormCode is optional and is a GDT of type PaymentFormCode. The codes 02, 04, 05, 06 may apply. A PaymentProcedureCode is optional and is a GDT of type PaymentProcedureCode. Codes 1-8 may apply. A FirstPaymentInstruction is optional and is a GDT of type PaymentInstruction. A SecondPaymentInstruction is optional and is a GDT of type PaymentInstruction. A ThirdPaymentInstruction is optional and is a GDT of type PaymentInstruction. A FourthPaymentInstruction is optional and is a GDT of type PaymentInstruction. A BankChargeBearerCode is optional and is a GDT of type BankChargeBearerCode. A PaymentMediumFormatCode is optional and is a GDT of type PaymentMediumFormatCode. A PaymentAdviceRequiredIndicator is optional and is a GDT of type PaymentAdviceRequiredIndicator. An ImmediatePrintRequiredIndicator is optional and is a GDT of type ImmediatePrintRequiredIndicator. A BusinessPartnerBankDetailsID is optional and is a GDT of type BusinessPartnerBankDetailsID. A DebitValueDate is optional and is a GDT of type Date and, in some implementations, can have a Qualifier of Value. A CreditValueDate is optional and is a GDT of type Date and, in some implementations, can have a Qualifier of Value.

QuerybyBaseBusinessTransactionDocumentReference provides a list of all PaymentOrders matched by BaseBusinessTransactionDocument which has triggered the PaymentOrder processing. The query elements are defined by the data type: PaymentOrderDuePaymentBaseBusinessTransactionIdQueryElements and includes BaseBusinessTransactionDocumentReference which is a GDT of type BusinessTransactionDocumentReference. The Base business transactional document reference can be the object which may trigger the PaymentOrder processing.

QuerybyStatus provides a list of all PaymentOrders which match by a given status and that can be further restricted by identifying attributes. The query elements are defined by the data type: PaymentOrderStatusQueryElements and include SystemAdministrativeData, PaymentOrderLiquidityStatusCode, PaymentExecutionStatusCode, PaymentOrderConsistencyStatusCode, PaymentAdviceStatusCode, ID, CompanyAliasID, and PaymentOrderLifeCycleStatus. PaymentOrderLifeCycleStatus can be a PaymentOrder status explains the different stages of processing the PaymentOrder and is a GDT of type PaymentOrderLifecycleStatusCode. This is optional. A PaymentOrderLiquidityStatusCode can be the status defines the liquidity of the house bank account and is a GDT of type PaymentOrderLiquidityStatusCode and is optional. A PaymentExecutionStatusCode can be the status defines the life cycle of payment process and is a GDT: PaymentExecutionStatusCode. This is optional. A PaymentOrderConsistencyStatusCode can be the status defines the consistency of the payment order and is a GDT of type ConsistencystatusCode. A PaymentAdviceStatusCode can be the status that defines payment advice note that should be sent for payment and is a GDT of type PaymentAdviceStatusCode. An ID can be the unique number by which a payment order can be identified and is a GDT of type BusinessTransactionDocumentID. A CompanyAliasID can be the identifier of the society involved in the role of Payer or Payee and is a GDT of type OrganisationalCenterID. A SystemAdministrativeData can be administrative data held by a system, which cover system users and points of alteration time and is a GDT of type SystemAdministrativeData.

BankTransferPaymentOrder can be a specialization of PaymentOrder when the payment type transfer is used for the payment order. There may not be a GDT element structure for the specialization BankTransferPaymentOrder because there may be one in the root node.

DirectDebitPaymentOrder can be a specialization of PaymentOrder when the payment type direct debit is used for the payment order. There may not be a GDT element structure for the specialization DirectDebitPaymentOrder because there may be one in the root node.

OutgoingChequePaymentOrder can be a specialization of PaymentOrder when the payment type check is used for the payment order. There may not be a GDT element structure for the specialization OutgoingChequePaymentOrder because there may be one in the root node.

PaymentCardPaymentPaymentOrder can be a specialization of PaymentOrder when the payment type credit card is used for the payment order. There may not be a GDT element structure for the specialization PaymentCardPaymentPaymentOrder because there may be one in the root node.

Bundling may assign an individual payment order to a collective order in which the individual order can be included. The elements located at the Bundling node are defined by the type GDT: PaymentOrderBundlingElements and include PaymentOrderUUID. PaymentOrderUUID can be a universal unique ID of the PaymentOrder that can be in the newly created PaymentOrder and is a GDT of type UUID. PaymentOrder has a cardinality of 1:c and can specify the payment order included in the request. An individual instruction can first be created. The amount total of the collective instruction can be the same as the total of amounts of the individual orders included.

SplitItem can be the distribution of PaymentOrder into partial amounts. The total of the amounts of all split items should correspond with the payment amount of the payment order. The elements located at the SplitItem node can be defined by the type GDT: PaymentOrderSplitItemElements and include PaymentAmount and BusinessTransactionDocumentItemID. A BusinessTransactionDocumentItemID can be an ID of the SplitItem. The SplitItems are numbers per instance of PaymentOrder and is a GDT of type BusinessTransactionDocumentItemID. A PaymentAmount can be a payment amount per SplitItem in transaction currency. The total of the PaymentAmount of the SplitItem can be the same as the PaymentAmount of the root of a PaymentOrder and is a GDT of type Amount and, in some implementations, can have a Qualifier of: Payment.

ProposedBankAccountPaymentProcedure can be a proposal for a payment procedure with which the payment order could be processed. It can contain the combinations of payment procedure, house bank account and partner bank details calculated by the system and also defines which value data and time are connected with the combination. The elements located at the ProposedBankAccountPaymentProcedure node are defined by the type GDT: PaymentOrderProposedBankAccountPaymentProcedureElements and include PriorityOrdinalNumberValue, HouseBankAccountInternalID, PaymentFormCode, PaymentProcedureCode, PaymentExecutionDate, DebitValueDate, CreditValueDate, BusinessPartnerBankDetailsID, PaymentCard, and OverdraftLimitExceedingIndicator. A PriorityOrdinalNumberValue can be a priority of proposal of bank determination and is a GDT of type OrdinalNumberValue. A HouseBankAccountInternalID can be a readable reference to the house bank account that can be used for the payment and is a GDT of type BankAccountInternalID. A PaymentFormCode can be a coded representation of the payment method assigned to the PaymentProcedure. The payment method can be the way a product or service is paid for and is a GDT of type PaymentFormCode. A PaymentProcedureCode can be a coded representation of a payment procedure that can be used for the payment. A payment procedure can be a technical version of a payment process which itself is a specialization of the payment method and is a GDT of type PaymentProcedureCode. A PaymentExecutionDate can be a date on which the house bank should make the payment and is a GDT of type Date and, in some implementations, can have a Qualifier of Execution. A DebitValueDate can be a due date of the payment amount in the house bank account of the business partner who initiated the payment and is a GDT of type Date and, in some implementations, can have a Qualifier of Value. A CreditValueDate can be a due date of the payment amount in the bank account of the business partner involved in the payment, but did not initiate it and is a GDT of type Date and, in some implementations, can have a Qualifier of Value. A BusinessPartnerBankDetailsID can be the ID of bank details in the context of a business partner and is a GDT of type BusinessPartnerBankDetailsID. This is optional. A PaymentCard can be information on the credit card used to process the payment and is a GDT of type PaymentCard. This is optional. An OverdraftLimitExceedingIndicator can indicate that there is a liquidity problem and is a GDT of type LimitExceedingIndicator. This is optional.

DO Payment Explanation can be the explanation of payment in structured form by referencing preceding documents in the process or in the form of a user-defined text as a note to payee. In the structured part, the Payment Explanation contains the payment amounts for each business document and an explanation for the difference between the expected and the actual payment amount. DO FinancialAuditTrailDocumentation can be uniform documentation of business transactions that can be used for auditing postings in financial accounting.

BusinessProcessVariantType can be a BusinessProcessVariantType defines the character of a business process variant of the Payment Order. It represents a typical way of processing of a <BO Node> within a process component from a business point of view. A process component can be a software package that realizes a business process and exposes its functionality as services. The functionality contains business transactions. A process component contains one or more semantically related business objects. A business object belongs to exactly one process component. The elements located at the node BusinessProcessVariantType are defined by the data type BusinessProcessVariantTypeElements and include MainIndicator and BusinessProcessVariantTypeCode. A BusinessProcessVariantTypeCode can be a coded representation of a business process variant type of a Payment order and is a GDT of type BusinessProcessVariantTypeCode. A MainIndicator can specify whether the current BusinessProcessVariantTypeCode could be the main one or not and is a GDT of type Indicator Qualifier: Main.

This section describes the message types and their signature that are derived from the operations of the business object PaymentOrder. In a signature, the business object can be contained as a "leading" business object. The message data type defines the structure of the following message types. For self initiated payments the business partner can be informed about the payment by a payment advice. This payment advice can hold detailed information about the payment including reference information. The business partner can be informed about the payment in advance by the payment advice or at the same time when he gets the payment itself. A payment advice typically can hold more information then the payment medium itself.

FormPaymentAdviceNotification can be a notification of a payment with explanations about the reason for a payment. It can be sent to a printer to be printed on a business letter. The structure of this message type can be determined by the message data type FormPaymentAdviceMessage data type. This message type can be used in the following operations of business objects including PaymentOrder and Notify Of Payment.

FormPaymentAdviceMessage can be a message data type containing the object FormPaymentAdvice which can be contained in the business document. The business information that may be relevant for sending a business document in a message.

MessageHeader Package can be a grouping of business information that is relevant for sending a business document in a message. It may include the entity MessageHeader. A MessageHeader can be a grouping of business information from the perspective of the sending application and include Information to identify the business document in a message, Information about the sender, and Information about the recipient. The MessageHeader may contain the SenderParty and the RecipientParty. It is of the type GDT: BusinessDocumentMessageHeader, and the following elements of the GDT are used ID and ReferenceID. SenderParty can be the partner responsible for sending a business document at business application level. The SenderParty is of the type GDT: BusinessDocumentMessageHeaderParty. RecipientParty can be the partner responsible for receiving a business document at business application level. The RecipientParty is of the type GDT: BusinessDocumentMessageHeaderParty.

FormPaymentAdvice Package can be the grouping of FormPaymentAdvice with its packages including Party package, BankAccount package, and PaymentExplanation package. FormPaymentAdvice can be a notification of a payment with explanations about the reason for a payment. A payment can also contain automatic debit and direct debit in this context. FormPaymentAdvice can contain several explanations that refer to individual invoices or credit memos. In addition to the initiator of the payment transaction and the party for which the payment transaction can be determined, other parties can be specified. The bank details of those involved in the payment can be specified. FormPaymentAdvice includes PaymentFormCode, PaymentFormCodeName, Date, PaymentDate, PaymentAmount, ChequeID, and Note. PaymentFormCode, which has a cardinality of (1), can be payment form e.g. check, bank transfer, bill of exchange. In some implementations, all values of the GDT PaymentFormCode are permitted except for "01 Invoice". The PaymentFormCode is a GDT of type PaymentFormCode. A PaymentFormCodeName, which has a cardinality of (0..n), can be the name of the PaymentFormCode that can be printed on the payment advice instead of the code value. The name can be derived language dependent. The PaymentFormCodeName is a GDT of type Name. A Date, which has a cardinality of (1), can be the date of the PaymentAdvice set by the issuer (Company) and has a GDT of type Date and, in some implementations, can have a Qualifier of BusinessTransactionDocument. A PaymentDate, which has a cardinality of (1), can be the execution date of the payment and is a GDT of type Date and, in some implementations, can have a Qualifier of Payment. A PaymentAmount, which has a cardinality of (1), can be the amount of the payment and is a GDT of type Amount and, in some implementations, can have a Qualifier of Payment. A ChequeID, which has a cardinality of (0..1), can be an ID of a cheque and is a GDT of type BusinessTransactionDocumentID. A Note, which has a cardinality of (0..1), can be an explanatory note for payment e.g. a note to payee and is a GDT of type Note.

FormPaymentAdviceParty Package can be the Party package groups information to the parties involved in the payment. It includes PaymentTransactionInitiator Party, PaymentTransactionDestinatedParty, OriginalPaymentTransactionInitiator Party, and FinalPaymentTransactionDestinatedParty. PaymentTransactionInitiator Party and PaymentTransactionDestinatedParty can be specified. Specifying OriginalPaymentTransactionInitiator Party and FinalPaymentTransactionDestinatedParty is optional, these can be specified if they differ from PaymentTransactionInitiator Party or PaymentTransactionDestinatedParty. An inheritance logic applies to the parties in PaymentExplanation. If a party is not filled, the value of the corresponding party in FormPaymentAdvice can also applies to this PaymentExplanation. PaymentTransactionInitiator Party can be the party that initiates the payment or the direct debit. PaymentTransactionInitiator Party is of the type GDT: BusinessTransactionDocumentParty. In some applications, element definitions may be exempted. PaymentTransactionDestinatedParty can be the party that receives the payment or from which it is collected. PaymentTransactionDestinatedParty is of the type GDT: BusinessTransactionDocumentParty and in some applications, element definitions may be exempted. OriginalPaymentTransactionInitiator Party can be the party for which the payment or direct debit is made (the debtor for a payment or the beneficiary for the automatic debit). OriginalPaymentTransactionInitiator Party is of the type GDT: BusinessTransactionDocumentParty, and in some applications, element definitions may be exempted. OriginalPaymentTransactionInitiator Party is optional. FinalPaymentTransactionDestinatedParty can be the party for which the payment transaction recipient accepts or collects the payment (the beneficiary for a payment or the debtor for the automatic debit). FinalPaymentTransactionDestinatedParty is of the type GDT: BusinessTransactionDocumentParty, and in some applications, element definitions may be exempted. FinalPaymentTransactionDestinatedParty is optional.

The BankAccount package can be a grouping of information about the bank details of the parties involved and includes PaymentTransactionDestinatedBank and PaymentTransactionDestinatedBankAccount. Specifying bank details is optional. PaymentTransactionDestinatedBank can be the bank that receives the payment or from which it is collected. PaymentTransactionDestinatedBank is of the type GDT: BankStandardID. PaymentTransactionDestinatedBankAccount can be the bank account that receives the payment or from which it is collected. PaymentTransactionDestinatedBankAccount is of the type GDT: BusinessTransactionDocumentBankAccount.

A PaymentAdvicePaymentExplanation Package can be a grouping of invoice information or credit memo information to explain the payment amount for the advice recipient. In can include PaymentExplanationItem and PaymentExplanationItem. A PaymentAdvicePaymentExplanation can be an explanation for the notified payment. The data in the PaymentExplanationItem could explain the payment reason and possible differences between the invoice amount and payment amount to the advice recipient. References to the paid invoices, credit memos or other business documents can also be specified. PaymentExplanationItem can also contain explanations to payment adjustments in which differences of the paid amount from the requested amount and the reasons for this are listed. Different parties from the parties of the PaymentAdvice can be specified. PaymentExplanationItem is of type GDT: PaymentExplanationItem and in some applications, element definitions may be exempted.

FIGS. 229-1 through 229-2 illustrate one example logical configuration of PaymentOrderMessage 229000. Specifically, this figure depicts the arrangement and hierarchy of various components such as one or more levels of packages, entities, and datatypes, shown here as 229000 through 229412. As described above, packages may be used to represent hierarchy levels. Entities are discrete business elements that are used during a business transaction. Data types are used to type object entities and interfaces with a structure. For example, PaymentOrder 229032 includes, among other things, PaymentOrder 229034. Accordingly, heterogeneous applications may communicate using this consistent message configured as such.

In some implementations, this section describes the message types and their signatures that are derived from the operations of the business object PaymentOrder. In a signature, the business object can be contained as a "leading" business object. The message data type determines the structure of the following message types. The process component Payment Processing performs payments for other process components. The further processing of the payment instructions in Payment Processing can be performed by the business object PaymentOrder.

If the instructing component is the Due Item Processing, then it can instruct the payment component to determine payment-relevant data for a future payment and reserve liquidity for this payment. This enables Due Item Processing to determine and process all the payment-relevant data for a Payment Request Message, so that the payment can be performed in the payment component without any further user interaction. The reservation request can be processed by the business object PaymentOrder. A liquidity reservation may be represented by a reserved PaymentOrder.

In some implementations, a PaymentOrderRequest can be an instruction to Payment Processing to create a payment order (business object PaymentOrder). The structure of this message type can be determined by the message data type PaymentOrderMessage. This message type may be used in the operations of business objects including PaymentOrder, PaymentRequestIn.CreatePaymentOrder, DuePayment, PaymentRequestOut.RequestPayment, ProductTaxDeclaration, and PaymentRequestOut.RequestPayment. In some applications, a PaymentOrderCancellationRequest can be a request to Payment Processing to cancel a payment order previously sent. A PaymentOrderCancellationRequest can be used in the operations of business objects including PaymentOrder, PaymentRequestIn.CancelPaymentOrder, DuePayment, and PaymentRequestOut.RequestPaymentCancellation. The object to be cancelled can be identified by a reference on the creating object.

A PaymentOrderConfirmation can be a confirmation of payment processing to the sender of a payment order about the status of the execution of the payment order. In some implementations, this can take place with the confirmation of the payment order by a bank statement item or alternatively after each execution step of the payment order. The structure of a PaymentOrderConfirmation may be determined by the message data type PaymentOrderMessage. A PaymentOrderConfirmation may be used in the operations of business including PaymentOrder, PaymentRequestOut.ConfirmPaymentRequest, DuePayment, PaymentRequestIn.ChangePaymentBasedOnPaymentRequestConfirmation, ProductTaxDeclaration, and PaymentRequestIn.ChangePaymentBasedOnPaymentRequestConfirmation.

In some implementations, a PaymentOrderReservationRequest can be an instruction to Payment Processing to reserve liquidity for a future payment. The structure of this message type can be determined by the message data type PaymentOrderMessage. This message type can be used in the operations of business objects including PaymentOrder, PaymentRequestIn.CreatePaymentReservation, DuePayment, and PaymentRequestOut.RequestPaymentInformationandProvisionalPayment. In the PaymentControl package, you can enter specifications for performing a future payment. In some applications, payment processing then uses these specifications to determine a prioritized list of options for performing the payment. Liquidity can be reserved in payment processing for the payment option with the highest priority.

A PaymentOrderReservationConfirmation can be confirmation by Payment Processing that a liquidity reservation has been made for a future payment. In some applications, in addition to confirming the reservation, this can also provide information on the execution of the future payment. The PaymentOrderReservationConfirmation may also contain a prioritized list of other options for performing the future payment. The structure of this message type can be determined by the message data type PaymentOrderMessage. This message type can be is used in the operations of business objects including PaymentOrder, PaymentRequestIn.CreatePaymentReservation, DuePayment, and PaymentRequestOut.RequestPaymentInformationandProvisionalPayment.

In some applications, a PaymentOrderReservationChangeRequest can be a request to Payment Processing to change the liquidity reservation for a future payment. The structure of this message type may be determined by the message data type PaymentOrderMessage. This message type may be used in the operations of business objects including Payment Order, PaymentRequestIn.SyncChangePaymentReservation, DuePayment, and PaymentRequestOut.RequestPaymentInformationandProvisionalPaymentChangeNotification. In some applications, in the PaymentControl package, you can change specifications for performing the future payment that was transferred with a PaymentOrderReservationRequest. This may mean that the liquidity reservation needs to be adjusted.

A PaymentOrderReservationChangeConfirmation can be a confirmation by Payment Processing that a liquidity reservation has been changed for a future payment. In some applications, in addition to confirming the reservation, this may also provide information on the execution of the future payment.

The PaymentOrderReservationChangeConfirmation can also contain a prioritized list of other options for performing the future payment. The structure of this message type can be determined by the message data type PaymentOrderMessage. This message type can be used in the operations of business objects including PaymentOrder, PaymentRequestIn.SyncChangePaymentReservation, DuePayment, and PaymentRequestOut.RequestPaymentInformationandProvisionalPaymentChangeNotification. In some implementations, In the PaymentControl package, you can enter specifications for performing a future payment. The payment component then can use these specifications to determine a prioritized list of options for performing the payment. Liquidity can be reserved in the payment component for the payment option with the highest priority.

In some applications, a PaymentOrderReservationChangeCancellationRequest can be a instruction to Payment Processing to cancel a previously sent change to a liquidity reservation for a future payment. The structure of this message type is determined by the message data type PaymentOrderMessage. This message type can be used in the operations of business objects including PaymentOrder, PaymentRequestIn.ChangePaymentReservation, DuePayment, and PaymentRequestOut.RegisterProvisionalPaymentChangeNotification. This message type can be a compensate message for a synchronous change to a reservation by a PaymentOrderReservationChangeRequest or a PaymentOrderReservationRequest. In some implementations, it should not be assumed that Payment Processing provides a change history. For this reason, the PaymentOrderReservationChangeCancellationNotification should also include the status of the reservation that was valid before the change request. In the case that the reservation has to be deleted due to the compensation message, en empty message may be sent.

A PaymentOrderMessage may contain data type including; The PaymentRequest object contained in the business document and The business information that is relevant for sending a business document in a message. In some implementations, it may contain packages including MessageHeader package and PaymentRequest package. In some applications, this message data type may provide the structure for the message types and the operations that are based on them including PaymentOrderRequest, PaymentOrderCancellationRequest, PaymentOrderConfirmation, PaymentOrderReservationRequest, PaymentOrderReservationConfirmation, PaymentOrderReservationChangeRequest, PaymentOrderReservationChangeConfirmation, and PaymentOrderReservationChangeCancellationRequest.

In some implementations, a MessageHeader Package can be a grouping of business information that is relevant for sending a business document in a message. It may contain entities including MessageHeader. A MessageHeader can be a grouping of business information from the perspective of the sending application and may contain Information to identify the business document in a message Information about the sender. The MessageHeader is of the type GDT: BusinessDocumentMessageHeader, whereby elements of the GDT are used including ID, ReferenceID, CreationDateTime, ReconciliationIndicator, and BusinessProcessBusinessScope.

A PaymentOrder Package can be the grouping of the PaymentOrder with its packages including Party package, Payment Control package, and Payment Explanation package. The Payment Explanation package can be used in the message type PaymentOrderRequest. The message type PaymentOrderCancellationRequest may contain the entity PaymentOrder and some packages exempted.

In some implementations, the message type PaymentOrderRequest may contain exactly one Payment Control package. In some applications, a PaymentOrderRequest may represent one individual instruction. The PaymentOrderRequest may contain the elements including BaseBusinessTransactionDocumentReference, OriginBusinessTransactionDocumentReference, BusinessProcessVariantType, PaymentExecutionStatus, ReconciliationPeriodCounterValue, and StatusResponseRequiredIndicator. A BaseBusinessTransactionDocumentReference can be a reference to the business object instance that created the request and is a GDT of type BusinessTransactionDocumentReference. An OriginBusinessTransactionDocumentReference can be a reference to the business object instance that created the request and is a GDT of type BusinessTransactionDocumentReference. A BusinessProcessVariantType can be a coded representation of the business variant type and is a GDT of type BusinessProcessVariantTypeCode. A PaymentExecutionStatus can be an execution status of the instructed payment in Payment Processing and is a GDT of type PaymentExecutionStatus. A ReconciliationPeriodCounterValue can be a counter for reconciliation periods and is a GDT of type CounterValue. A StatusResponseRequiredIndicator can be an indicator for whether the component processing the payment should inform the sending component about a status change in every processing step and is a GDT of type Indicator. In some implementations, the element StatusResponseRequiredIndicator can be filled in the message type PaymentOrderRequest.

The element PaymentExecutionStatus may be filled in the message types PaymentOrderConfirmation and PaymentOrderRequest. The OriginBusinessTransactionDocumentReference may be available in the message types PaymentOrderCancellationRequest and PaymentOrderReservationCancellation Request.

The element BusinessProcessVariantType could be contained in the message types PaymentOrderRequest, PaymentOrderReservationRequest, PaymentOrderReservationChangeRequest and PaymentOrderReservationCancellationRequest.

In some implementations, the PaymentOrderParty Package can be a grouping of the business parties that are involved in the processing of the instructed payment and may contain the entities including PayerParty and PayeeParty. A PayerParty can be a business partner whose balance is reduced by the PaymentOrder. The PayerParty is of the GDT type: BusinessTransactionDocumentParty. A PayeeParty can be a business partner whose balance is increased by the PaymentOrder The PayeeParty is of the GDT type: BusinessTransactionDocumentParty. The PaymentControl package can be a grouping of payment-relevant information required to process the payment request and may contain entities including PaymentAuthorisation. The PaymentControl may contain elements including PriorityOrdinalNumberValue, AccountInternalID, HouseBank, HouseBankAccountDescription, PaymentFormCode, PaymentProcedureCode, PaymentProcedureDescription, PaymentAmount, CompanyContactPersonInternalID, PaymentBlock, FirstPaymentInstructionCode, SecondPaymentInstructionCode, ThirdPaymentInstructionCode, FourthPaymentInstructionCode, BankChargeBearerCode, PaymentPriorityCode, SinglePaymentIndicator, PaymentExecutionDate, DebitValueDate, CreditValueDate, BankExecutionDate, BusinessPartnerBankDetailsID, PaymentCardDetailsID, PaymentCard, OverdraftLimitExceedingIndicator, PaymentCardUUID, PaymentCardID, PaymentCardDataOriginTypeCode, PaymentCardVerificationValueAvailabilityCode, PaymentCardVerificationValueCheckRequiredIndicator, PaymentCardAuthorisationRequiredIndicator, and PaymentCardAuthorisationLimitAmount. A PriorityOrdinalNumberValue can be a unique key of a house bank account and is a GDT of type OrdinalNumberValue. A HouseBankAccountInternalID can be a unique key of a house bank account and is a GDT of type BankAccountInternalID. A HouseBankAccountDescription can be a description of the house bank account and is a GDT of type Description. A PaymentFormCode can be a coded representation of the payment form and is a GDT of type PaymentFormCode. A PaymentProcedureCode can be a coded representation of the payment procedure and is a GDT of type PaymentProcedureCode. A PaymentProcedureDescription can be a description of the payment procedure and is a GDT of type PaymentFormCode. A PaymentAmount can be a payment amount in transaction currency and is a GDT of type Amount. A CompanyContactPersonInternalID can be a contact person for payment-relevant matters in the company that initiated the payment and is a GDT of type ContactPersonInternalID. A PaymentBlock can be a reason and period for the lock of a business document in payment processes and is a GDT of type PaymentBlock. A FirstPaymentInstructionCode can be a first instruction key used for instructions to the bank and is a GDT of type PaymentInstructionCode. A SecondPaymentInstructionCode can be a second instruction key used for instructions to the bank and is a GDT of type PaymentInstructionCode. A ThirdPaymentInstructionCode can be a third instruction key used for instructions to the bank and is a GDT of type PaymentInstructionCode. A FourthPaymentInstructionCode can be a fourth instruction key used for instructions to the bank and is a GDT of type PaymentInstructionCode. A BankChargeBearerCode can be a coded representation of the bearer of the charges of a bank transaction and is a GDT of type BankChargeBearerCode. A PaymentPriorityCode can specify that this transaction has priority and is a GDT of type BusinessTransactionPriorityCode. A SinglePaymentIndicator can indicate that a payment instruction cannot be put together with another payment instruction and is a GDT of type SinglePaymentIndicator. A PaymentExecutionDate can be a date on which the payment created from the payment instruction should be executed and is a GDT of type Date. A DebitValueDate can be a value date at the bank of the sender of a payment and is a GDT of type Date. A CreditValueDate can be a value date at the bank of the receiver of a payment and is a GDT of type Date. A BankExecutionDate can be a date at which bank should execute the payment and is a GDT of type Date. A BusinessPartnerBankDetailsID can be the ID of bank details in the context of a business partner and is a GDT of type BusinessPartnerBankDetailsID. A PaymentCardDetailsID can be the ID of payment card details for a business partner and is a GDT of type BusinessPartnerPaymentCardDetailsID. A PaymentCard can be an ID card that authorizes the holder to settle payments without cash at the companies connected to the payment system and is a GDT of type PaymentCard. A OverdraftLimitExceedingIndicator can indicate that the overdraft limit is exceeded for a house bank account and is a GDT of type ExceedingIndicator. A PaymentCardUUID can be a universally unique identifier of a payment card and is a GDT of type UUID. A PaymentCardID can be an identifier of a payment card and is a GDT of type PaymentCardID. A PaymentCardDataOriginTypeCode can be the way in which the payment card data was included and is a GDT of type DataOriginTypeCode. A PaymentCardVerificationValueAvailabilityCode can be information regarding the availability of a verification code on a payment card and is a GDT of type PaymentCardVerificationValueAvailabilityCode. A PaymentCardVerificationValueCheckRequiredIndicator can indicate that the CardVerificationValue should be transferred in the authorisation message and is a GDT of type RequiredIndicator. A PaymentCardAuthorisationRequiredIndicator can indicate that an authorisation should be done and is a GDT of type RequiredIndicator. A PaymentCardAuthorisationLimitAmount can be a maximum amount that can be authorized for the card and is a GDT of type Amount.

In some implementations, the permitted value range for the PaymentPriorityCode can be limited to 2 (urgent) and 3 (normal). The PaymentAuthorisation package may be used in the message type PaymentOrderRequest. One of the elements PaymentExecutionDate, DebitValueDate and CreditValueDate can be filled in the message types PaymentOrderRequest and PaymentOrderReservationRequest. The date filled can be used as a specification for the payment component. The other data may be determined in the payment components when the payment execution options are being determined. In some applications, in the Message type PaymentOrderRequest, the elements Priority and OverdraftLimitExceedingIndicator may not be used. In the Message type PaymentOrderConfirmation, elements of the PaymentControl package may be used including HouseBankAccountID, HouseBankAccountDescription, PaymentFormCode, PaymentProcedureCode, PaymentProcedureCodeDescription, PaymentAmount, PaymentExecutionDate, DebitValueDate, CreditValueDate, BankExecutionDate, BusinessPartnerBankDetailsID, PaymentCardDetailsID, and PaymentCard. In some implementations, in the message types PaymentOrderReservationRequest, PaymentOrderReservationChangeRequest and PaymentOrderReservationCancellationNotification elements of the PaymentControl package may be used including HouseBankAccountID, PaymentFormCode, PaymentProcedureCode, PaymentAmount, PaymentExecutionDate, DebitValueDate, CreditValueDate, BankExecutionDate, BusinessPartnerBankDetailsID, PaymentCardDetailsID, and PaymentCard. In some applications, in message types PaymentOrderReservationConfirmation and PaymentOrderReservationChangeConfirmation elements of the PaymentControl package may be used including PriorityOrdinalNumberValue, HouseBankAccountID, HouseBankAccountDescription, PaymentFormCode, PaymentProcedureCode, PaymentProcedureCodeDescription, PaymentExecutionDate, DebitValueDate, CreditValueDate, BankExecutionDate, BusinessPartnerBankDetailsID, PaymentCardDetailsID, PaymentCard, and OverdraftLimitExceedingIndicator.

PaymentAuthorisation may contain information on the authorisation of a payment card and contains elements including ClearingHouseUUID, DateTime, PreAuthorisationIndicator, RequestorID, ClearingHouseID, AuthorisedAmount, PaymentAuthorisationExpirationDateTime, CompanyClearingHouseID, AppliedIndicator, ResultCode, AddressVerificationResultCode, PaymentCardVerificationResultCode, PaymentCardVerificationValueVerificationresultCode, ResultDescription, and ReferenceCode. A ClearingHouseUUID can be a universally unique identifier of a clearing house and is a GDT of type UUID. A DateTime can be a date and time on which the authorisation was carried out GDT of type DateTime. A PreAuthorisationIndicator can specify whether or not it is a preauthorization and is a GDT of type PreAuthorisationIndicator. A RequestorID can be an identifier for an authorization of a card payment that is assigned by the company and is a GDT of type PaymentCardPaymentAuthorisationPartyID; Role Requestor. A ClearingHouseID can be an identifier for an authorization of a card payment that is assigned by a clearing house for card payments and is a GDT of type PaymentCardPaymentAuthorisationPartyID; Role ClearingHouse. An AuthorisedAmount can be an amount that can be taken from the credit card in the transaction currency and is a GDT of type Amount. A PaymentAuthorisationExpirationDateTime can be a date until which the authorisation is valid and is a GDT of type DateTime. A CompanyClearingHouseID can be an identifier of the company at the clearing house and is a GDT of type PartyPartyID. An AppliedIndicator can be an indicator whether or not this authorization was already used in the settlement and is a GDT of type AuthorisationAppliedIndicator. A ResultCode can be a result of the authorization message to the clearing house and is a GDT of type AuthorisationResultCode. An AddressVerificationResultCode can be a result of the address check during authorization (address result) and is a GDT of type AddressVerificationResultCode. A PaymentCardVerificationResultCode can be a result of the card number check during authorization (response code). A PaymentCardVerificationValueVerificationresultCode can be a result of the card verification value check (CVV) during authorization and is a GDT of type PaymentCardVerificationValueVerificationResultCode. A ResultDescription can be a result text of the authorization and is a GDT of type _SHORT_Description. A ReferenceCode can be an authorisation number specific to the clearing house used and is a GDT of type AuthorisationReferenceCode.

In some implementations, the PaymentExplanation package can be a grouping of information used to explain the payment request and contain entities including PaymentDifferenceExplanationItem. The PaymentExplanation is of the GDT type: PaymentExplanationItem. The PaymentDifferenceExplanationItem can be an explanation of the difference between the payment amount and the gross amount of the referenced receivable or payable, less cash discount. The PaymentDifferenceExplanationItem is of the GDT type: PaymentDifferenceExplanationItem. In some applications, data types utilized by GDT's may include Amount, AuthorisationID, AuthorisationReferenceCode, BankAccountInternalID, BankChargeBearerCode, BusinessDocumentMessageHeader, BusinessDocumentMessageID, BusinessPartnerBankDetailID, BusinessPartnerPaymentCardDetailsID, BusinessTransactionDocumentItemID, BusinessTransactionDocumentParty, BusinessTransactionDocumentReference, BusinessProcessBusinessScope, BusinessProcessVariantTypeCode, ContactPersonInternalID, CounterValue, Date, DateTime, Identifier, Indicator, Note, OrdinalNumberValue, PartyInternalID, PartyStandardID, PaymentBlock, PaymentCard, PaymentDifferenceExplanationItem, PaymentExecutionStatus, PaymentExplanationItem, PaymentFormCode, PaymentInstructionCode, PaymentPriorityCode, PaymentProcedureCode, and SinglePaymentIndictor.

Business Object Inventory

FIGS. 230-1 through 230-9 illustrate an example Inventory business object model 230000. Specifically, this model depicts interactions among various hierarchical components of the Inventory, as well as external components that interact with the Inventory (shown here as 230002 through 230024 and 230072 through 2300110).

The Business Object Inventory is the quantity of materials in a certain location, including the material reservations at this location. Quantities of materials can be physically grouped using IdentifiedLogisticUnit or LogisticUnits. The business object Inventory is part of the process component Confirmation & Inventory. Inventory can be inventory in a warehouse, in production, or in transit, for example.

The business object Inventory is involved in the following Process Integration Models: Inventory_Processing_Supply and Demand_Matching_Reconciliation. Additionally, the service interface "Inventory Reconciliation Out" is part of the following Process Integration Models: Inventory_Processing_Supply and Demand_Matching_Reconciliation. The service interface "Inventory Reconciliation Out" may comprise operations that trigger the notification of the process component "Supply and Demand Matching" about the reconciliation of inventory quantities. In some implementations, an operation "Notify Planning of Inventory Reconciliation" can notify "Supply and Demand_Matching" about the reconciliation of inventory quantities aggregated on Material and Supply Planning Area level. The operation may be based on message type "PlanningViewOnInventoryReconciliationNotification" (derived from the business object PlanningViewOnInventory in the process component Supply And Demand Matching). The service interface Inventory Changing Out can be part of the Process Integration Model Inventory Processing_Supply And Demand Matching_Reconciliation.

Node Structure of Business Object Inventory

In some implementations, Inventory may occur in the following complete and disjoint specializations: LocationInventory (i.e., the current inventory at a certain Location), LogisticsAreaInventory (i.e., the current inventory at a certain place that is represented by a LogisticsArea), ResourceInventory 230036 (i.e., the current inventory at a certain place that is represented by a Resource, which could be an EquipmentResource or VehicleResource), or CustodianPartyInventory 230032 (i.e., the current inventory at a certain business partner with the party role Custodian). The elements located at the node Inventory 230026 are defined by the data type InventoryElements. In certain implementations, these elements include a UUID, TypeCode, LocationUUID, LogisticsAreaUUID, LogisticsAreaTypeCode, InventoryManagedLocationUUID, ResourceUUID, CustodianPartyUUID, ParentInventoryUUID, and Inventory_Key.

UUID is a universal identifier, which can be unique, of an Inventory. UUID can be used as an alternative key, and may be based on GDT UUID.

TypeCode is a coded display of the type of an inventory. Values may include: Location, LogisticsArea, Resource and CustodianParty. TypeCode may be based on GDT InventoryTypeCode.

LocationUUID is a universal identifier, which can be unique, of a Location at which the inventory is located. LocationUUID is optional and may be based on GDT UUID.

LogisticsAreaUUID is a universal identifier, which can be unique, of a LogisticsArea at which the inventory is located. LogisticsAreaUUID is optional and may be based on GDT UUID.

LogisticsAreaTypeCode is a coded representation of the type of the Logistics Area. LogisticsAreaTypeCode is optional and may be based on GDT LogisticsAreaTypeCode.

InventoryManagedLocationUUID is a universal identifier, which can be unique, of a location which can be assigned to a logistics area and can be inventory managed. InventoryManagedLocationUUID is optional and may be based on GDT UUID.

ResourceUUID is a universal identifier, which can be unique, of an Equipment or Vehicle Resource at which the inventory is located. ResourceUUID is optional and may be based on GDT UUID.

CustodianPartyUUID is a universal identifier, which can be unique, of the business partner with the role Custodian at which the inventory can be located. CustodianPartyUUID is optional and may be based on GDT UUID.

ParentInventoryUUID is a universal identifier, which can be unique, of a higher-level inventory location to represent a hierarchy. ParentInventoryUUID may be the UUID of the specializations LocationInventory or LogisticsAreaInventory 230034. ParentInventoryUUID is optional and may be based on GDT UUID.

Inventory_Key is an alternative key for the node Inventory. It may or may not contain the following elements: CustodianPartyUUID, which is optional; LocationUUID, which is optional; LogisticsAreaUUID, which is optional; and ResourceUUID, which is optional.

Inventory has the a 1:cn cardinality relationship with an Item subordinate node, a 1:cn cardinality relationship with a LogisticPackage 230038 subordinate node, a 1:cn cardinality relationship with an ExpectedInventoryChange 230048 subordinate node, a 1:cn cardinality relationship with an Availability 230044 subordinate node, a 1:cn cardinality relationship with an ExpectedStorageCapacityChange subordinate node, and a 1:cn cardinality relationship with an AvailableStorageCapacity 230068 subordinate node.

The composition Availability may have a filter, InventoryAvailabilityFilterElements, which in certain implementations may include the following: CheckScopeCode, which is optional and may be based on GDT InventoryAvailabilityCheckScopeCode; IdentifiedStockAggregationIndicator, which is optional and may be based on GDT Indicator, and in certain implementations may include a qualifier, IdentifiedStockAggregation; LogisiticUnitAggregationIndicator, which is optional and may be based on GDT Indicator, and in certain implementations may include a qualifier, LogisticUnitAggregation; MainInventorySeparatingValues, which is optional and may be based on GDT MainInventorySeparatingValues, and in which the following elements may be used: MaterialUUID, which is optional, OwnerPartyUUID, which is optional, SupplyPlanningAreaUUID, which is optional, and InventoryRestrictedUseIndicator, which is optional; IdentifiedStockInventorySeparatingValues, which is optional and may be based on GDT IdentifiedStockInventorySeparatingValues, and in which the following element may be used: IdentifiedStockUUID, which is optional; SpecialStockInventorySeparatingValues, which is optional and may be based on GDT SpecialStockInventorySeparatingValues, and in which the following elements may be used: OutboundDeliveryItemUUID, which is optional, SiteLogisticsLotUUID, which is optional, MaterialInspectionUUID, and which is optional; and LogisticUnitUUID, which is optional and may be based on GDT UUID.

The composition AvailabilityStorageCapacity may or may not have a filter InventoryAvailableStorageCapacityFilterElements, which in certain implementations may include CheckScopeCode, which is optional and may be based on GDT InventoryAvailableStorageCapacityCheckScopeCode, and LogisticUnitUUID, which is optional and may be based on GDT UUID.

The business object BusinessPartner with node BusinessPartner has an inbound association relationship with CustodianParty. A CustodianParty has a cardinality of 1:c. The Custodian Party specifies the business partner with the role Custodian at which the inventory is located.

The business object Location with node Location has an inbound association relationship with Location and InventoryManagedLocation. A Location has a cardinality of 1:c. The Location is the location at which the inventory is located. An InventoryManagedLocation has a cardinality of 1:c. The InventoryManagedLocation is the inventory managed location at which the inventory located.

The business object LogisticsArea with node LogisticsArea has an inbound association relationship with LogisticsArea. A LogisticsArea has a cardinality of 1:c. The LogisticsArea is the logistics area at which the inventory may or may not be located.

The business object Resource with node Resource has an inbound association relationship with Resource. A Resource has a cardinality of 1:c. The Resource is equipment or a vehicle resource at which the inventory may or may not be located.

The business object Inventory with node Inventory has an inbound association relationship with ParentInventory. A ParentInventory has a cardinality of 1:c. The ParentInventory is the inventory (location, logistics area, resource) that may or may not lie above another inventory.

The business object Inventory with node Inventory has an association for navigation with ChildInventory. ChildInventory has a cardinality of 1:cn. The ChildInventory is the inventory of the specializations “Location”, “Logistics area” and “Resource” that may or may not lie below another inventory of the specialization “Location” and “Logistics area”. The ChildInventory association may not exist for specializations “Resource”.

An Integrity Condition(s) may exist with respect to the node Inventory in that it can be associated to one of the business objects, Location, LogisticsArea, Resource or Business Partner with the role Custodian. In the hierarchy of Inventory specializations, the top level specialization may be a LocationInventory 230030 or a CustodianPartyInventory. In the hierarchy of Inventory specializations, a LocationInventory may exist below a LocationInventory. In the hierarchy of Inventory specializations, a LogisticsAreaInventory may exist below a LocationInventory or a LogisticsAreaInventory. In the hierarchy of Inventory specializations, a ResourceInventory may exist below a LocationInventory or a LogisticsAreaInventory. The hierarchy of the node Inventory may be cyclic.

The CreateWithReference action can create multiple inventory changes on the business object Inventory with reference to LogisticsExecutionConfirmations and can update the necessary nodes. In certain implementations, changes to inventory may be documented via one of the LogisticsExecutionConfirmations. Before executing the action, a confirmation that has not yet been posted may be created. In certain implementations, effected changes in the object may include that when posting inventory changes, the nodes Item and ItemQuantity may be changed or created. In certain implementations, when changing the number of LogisticUnits, the node LogisticPackage may be changed or created. In certain implementations, parameters may include that the action may use the predefined ‘Copy by Reference’ parameter. Further parameters may or may not be required. In certain implementations, limitations may include that the action may be carried out by one of the LogisticsExecutionConfirmations.

QueryByElements can deliver a list of LocationInventory, LogisticsAreaInventory and ResourceInventory that contain inventory for the specified material and fulfill the selection criteria. GDT InventoryElementsQueryElements may define the query elements. In certain implementations, the elements include the following: TypeCode, which is optional and may be based on GDT InventoryTypeCode; LocationUUID, which is optional and may be based on GDT UUID; LocationID, which is optional and may be based on GDT LocationID; CustodianPartyUUID, which is optional and may be based on GDT UUID; CustodianPartyID, which is optional and may be based on GDT BusinessPartnerInternalID; LogisticsAreaUUID, which is optional and may be based on GDT UUID; LogisticsAreaID, which is optional and may be based on GDT LogisticsAreaID; ResourceUUID, which is optional and may be based on GDT UUID; ResourceID, which is optional and may be based on GDT ResourceID; LogisticsAreaTypeCode, which is optional and may be based on GDT LogisticsAreaTypeCode; and MainInventorySeparatingValues, which is optional and may be based on GDT MainInventorySeparatingValues, and in which the elements MaterialUUID and MaterialID may be used. MaterialUUID and Material ID may be optional.

QueryByHierarchy can deliver a list of all LocationInventory, LogisticsAreaInventory and ResourceInventory that are located below the specified LocationInventory or LogisticsAreaInventory which contain inventory for a material and fulfill the selection criteria. GDT InventoryHiearchyQueryElements 230028 defines the query elements, which in certain implementations may include the following: TypeCode, which is optional and may be based on GDT InventoryTypeCode; LocationUUID, which is optional and may be based on GDT UUID; LocationID, which is optional and may be based on GDT LocationID; CustodianPartyUUID, which is optional and may be based on GDT UUID; CustodianPartyID, which is optional and may be based on GDT BusinessPartnerInternalID; LogisticsAreaUUID, which is optional and may be based on GDT UUID; LogisticsAreaID, which is optional and may be based on GDT LogisticsAreaID; LogisticsAreaTypeCode, which is optional and may be based on GDT LogisticsAreaTypeCode; MainInventorySeparatingValues, which is optional and may be based on GDT MainInventorySeparatingValues, and in which the elements MaterialUUID and MaterialID may be used. MaterialUUID and Material ID may be optional.

QueryByEmptyInventory can deliver a list of all LocationInventory, LogisticsAreaInventory and ResourceInventory that are located below the specified LocationInventory or LogisticsAreaInventory which contain no inventory and fulfill the selection criteria. GDT InventoryEmptyInventoryQueryElements defines the query elements, which in certain implementations may include the following: TypeCode, which is optional and may be based on GDT InventoryTypeCode; LocationUUID, which is optional and may be based on GDT UUID; LocationID, which is optional and may be based on GDT LocationID; LogisticsAreaUUID, which is optional and may be based on GDT UUID; LogisticsAreaID, which is optional and may be based on GDT LogisticsAreaID; CustodianPartyUUID, which is optional and may be based on GDT UUID; CustodianPartyID, which is optional and may be based on GDT BusinessPartnerInternalID; LogisticsAreaTypeCode, which is optional and may be based on GDT LogisticsAreaTypeCode; and InventoryManagedIndicator, which indicates whether inventory is managed in the storage location or not. InventoryManagedIndicator is optional, may be based on GDT Indicator, and may include a qualifier, InventoryManaged.

Item

Item is the physically distinguishable material at a certain location that has an owner, is physically grouped (by LogisticPackages) and can be differentiated using other criteria (such as IdentifiedStocks, inventory separating values and usage, for example). An Item may or may not comprise the quantity of the inventory item 230040 in one or more units of measure.

The elements located at the node Item are defined by the data type InventoryItemElements. In certain implementations, these elements include: UUID, MainInventorySeparatingValues, IdentifiedStockInventorySeparatingValues, SpecialStockInventorySeparatingValues, InventoryUUID, LogisticPackageUUID, LastPickupDateTime, and LastPutawayDateTime.

UUID is a universal identifier, which can be unique, of an Item. UUID can be used as an alternative key and may be based on GDT UUID.

MainInventorySeparatingValues are the values of stock-separating attributes that are required for inventory posting. Inventory-separating attributes are criteria that are used to differentiate one inventory from other inventories. MainInventorySeparatingValues may be based on GDT MainInventorySeparatingValues, and in certain implementations may use the following elements: MaterialUUID, OwnerPartyUUID, SupplyPlanningAreaUUID, and InventoryRestrictedUseIndicator.

IdentifiedStockInventorySeparatingValues are the values of selected IdentifiedStock attributes that separate Inventory.IdentifiedStockInventorySeparatingValues is optional and may be based on GDT IdentifiedStockInventorySeparatingValues. In certain implementations, IdentifiedStockInventorySeparatingValues may use the element IdentifiedStockUUID, which is optional.

SpecialStockInventorySeparatingValues are universal identities, which may be unique, that separate special stock. Special Stock are materials that may or may not be managed separately for reasons of logistics processes. SpecialStockInventorySeparatingValues is optional and may be based on GDT SpecialStockInventorySeparatingValues. In certain implementations, SpecialStockInventorySeparatingValues may use the following elements: OutboundDeliveryItemUUID, which is optional, SiteLogisiticsLotUUID, which is optional, and MaterialInspectionUUID, which is optional.

InventoryUUID is a universal identifier, which can be unique, of the business object node Inventory. InventoryUUID is the UUID of the specialization LocationInventory, LogisticsAreaInventory or ResourceInventory, and may be based on GDT UUID.

LogisticPackageUUID is a universal identifier, which may be unique, of the business object node LogisticPackage as a physical package unit for the inventory. A physical package unit may be an IdentifiedLogisticUnit 230058 or a LogisticsUnit. LogisticPackageUUID is optional and may be based on GDT UUID.

LastPickupDateTime is the timestamp of the last pickup of the inventory item. LastPickupDateTime is optional and may be based on GDT GLOBAL_DateTime.

LastPutawayDateTime is the timestamp of the last put away of the inventory item. LastPutawayDateTime is optional and may be based on GDT GLOBAL_DateTime.

Item has the a 1:cn cardinality relationship with an ItemQuantity 230042 subordinate node. The composition ItemQuantity may have a filter, InventoryItemQuantityFilterElements, which in certain implementations includes PrimaryQuantityIndicator, which is optional, and may be based on GDT Indicator. In certain implementations, PrimaryQuantityIndicator may include a qualifier, PrimaryQuantity.

The Item may have an inbound association relationship named Material from the business object Material with node Material. The Material is the material of the inventory item. The Material has a cardinality of 1:cn.

The Item may have an inbound association relationship named OwnerParty from the business object BusinessPartner with node BusinessPartner. The OwnerParty is the owner of the inventory. The OwnerParty has a cardinality of 1:cn.

The Item may have an inbound association relationship named SupplyPlanningArea from the business object SupplyPlanningArea with node SupplyPlanningArea. The SupplyPlanningArea is the supply planning area of the inventory item. The SupplyPlanningArea has a cardinality of 1:cn.

The Item may have an inbound association relationship named IdentifiedStock from the business object IdentifiedStock with node IdentifiedStock. The IdentifiedStock is the identified stock of the inventory item. The InventoryStock has a cardinality of c:cn.

The Item may have an inbound association relationship named LogisticUnit 230060 from the business object LogisticUnit with node LogisticUnit. The LogisticUnit is the LogisticUnit of the inventory item. The LogisticUnit has a cardinality of c:cn.

The Item may have an inbound association relationship named SiteLogisticsLot from the business object SiteLogisticsLot with node SiteLogisticsLot. The SiteLogisticsLot is the SiteLogisticsLot UUID of the inventory item. The SiteLogisticsLot has a cardinality of c:cn.

The Item may have an inbound association relationship named OutboundDeliveryItem from the business object OutboundDelivery with node OutboundDeliveryItem. The OutboundDeliveryItem is the OutboundDeliveryItem UUID of the inventory item. The OutboundDeliveryItem has a cardinality of c:cn.

The Item may have an inbound association relationship named MaterialInspection from the business object MaterialInspection with node MaterialInspection. The MaterialInspection is the MaterialInspection document UUID the inventory item. The MaterialInspection has a cardinality of c:cn.

The Item may have an inbound association relationship named LogisticPackage from the business object LogisticPackage with node LogisticPackage. The LogisticPackage is the LogisticPackage that contains the inventory item. The LogisticPackage has a cardinality of c:cn.

QueryByElements can deliver a list of InventoryItems that fit the selection criteria to retrieve the current inventory without considering existing allocation. In a query, the query elements LocationUUID or Location ID, LogisticsAreaUUID or LocationID, ResourceUUID or ResourceID may or may not be set. GDT InventoryItemElementsQueryElements defines the query elements, which in certain implementations include: InventoryLocationUUID, which is optional and may be based on GDT UUID; InventoryLocationID, which is optional and may be based on GDT LocationID; InventoryCustodianPartyUUID, which is optional and may be based on GDT UUID; InventoryCustodianPartyID, which is optional and may be based on GDT BusinessPartnerInternalID; InventoryLogisticsAreaUUID, which is optional and may be based on GDT UUID; InventoryLogisticsAreaID, which is optional and may be based on GDT LogisticsAreaID; InventoryResourceUUID, which is optional and may be based on GDT UUID; InventoryResourceID, which is optional and may be based on GDT ResourceID; MainInventorySeparatingValues, which is optional and may be based on GDT MainInventorySeparatingValues, and which in certain implementations may use the following elements: MaterialUUID, which is optional, MaterialID, which is optional, OwnerPartyUUID, which is optional, OwnerPartyID, which is optional, SupplyPlanningAreaUUID, which is optional, SupplyPlanningAreaID, which is optional, and InventoryRestrictedUseIndicator, which is optional; IdentifiedStockInventorySeparatingValues, which is optional and may be based on GDT IdentifiedStockInventorySeparatingValues, and which in certain implementations may use the following elements: IdentifiedStockUUID, which is optional, and IdentifiedStockID, which is optional; SpecialStockInventorySeparatingValues, which is optional and may be based on GDT SpecialStockInventorySeparatingValues, and which in certain implementations may use the following elements: OutboundDeliveryItemUUID, which is optional, OutboundDeliveryReference, which is optional, SiteLogisticsLotUUID, which is optional, SiteLogisticsLotID, which is optional, MaterialInspectionUUID, which is optional, and MaterialInspectionID, which is optional; LogisticUnitUUID, which is optional and may be based on GDT UUID; and LogisticUnitID, which is optional and may be based on GDT LogisticUnitID.

ItemQuantity

An ItemQuantity is the quantity of an InventoryItem. An inventory item can be managed simultaneously in several, non-transposable units of measure.

The elements located at the node ItemQuantity are defined by the type GDT InventoryItemQuantityElements. In certain implementations, these elements include: QuantityTypeCode, Quantity, and PrimaryQuantityIndicator.

QuantityTypeCode is a coded representation of the type of quantity that may or may not be based on the measurable characteristic of an object or physical phenomenon, and may be based on GDT QuantityTypeCode.

Quantity is the quantity of an inventory item, and may be based on GDT Quantity.

PrimaryQuantityIndicator indicates the primary InventoryItemQuantity, which may or may not be the quantity to be displayed first out of a number of available quantities, as is possible in the multiple transaction quantities (MTQ) scenario. PrimaryQuantityIndicator is based on GDT Indicator. In certain implementations, PrimaryQuantityIndicator may include a qualifier, PrimaryQuantity.

LogisticPackage

A LogisticPackage is a physical grouping of inventory items due to logistical requirements. LogisticPackage can occur in the following complete and disjoint specializations: an IdentifiedLogisticUnit or a LogisticUnit. An IdentifiedLogisticUnit may be a LogisticPackage that can be identified individually, such as a container or palette that is clearly labeled. A LogisticUnit may be a LogisticPackage that cannot be identified individually, such as containers in a certain storage bin). A typical example is the packing of stocks for storage or shipping.

The elements located at the node LogisticPackage are defined by the data type InventoryLogisticPackageElements. In certain implementations, these elements may include the following: UUID, TypeCode, IdentifiedLogisticUnitUUID, LogisticUnitUUID, InventoryUUID, ParentLogisticPackageUUID 230056, QuantityTypeCode, Quantity, and LogisticPackage_Key.

UUID is a universal identifier, which can be unique, of a LogisticPackage. UUID can be used as an alternative key and may be based on GDT UUID.

TypeCode. A LogisticPackageTypeCode is the coded display of the type of a package unit as it is used in logistics for storing and shipping goods. LogisticPackageTypeCode may be based on GDT LogisticPackageTypeCode, and in certain implementations, may use the following codes: 1, IdentifiedLogisticUnit, and 2, LogisticUnit.

IdentifiedLogisticUnitUUID is a universal identifier, which can be unique, of an IdentifiedLogisticUnit into which inventory items are physically grouped. IdentifiedLogisticUnitUUID is optional and may be based on GDT UUID.

LogisticUnitUUID is a universal identifier, which can be unique, of a LogisticUnit into which inventory items are physically grouped. LogisticUnitUUID is optional and may be based on GDT UUID.

InventoryUUID is a universal identifier, which can be unique, of the business object node Inventory. InventoryUUID may be based on GDT UUID.

ParentLogisticPackageUUID is a universal identifier, which can be unique, of the comprehensive (logically higher-level) LogisticPackage to represent a hierarchy of LogisticPackages. ParentLogisticPackageUUID is optional and may be based on GDT UUID.

QuantityTypeCode is a coded representation of a type of quantity that is based on the measurable characteristic of an object or physical phenomenon. QuantityTypeCode may be based on GDT QuantityTypeCode.

Quantity is the number of LogisticUnits of the same type in a location. Quantity may be based on GDT INTEGER_Quantity.

LogisticPackage_Key is an alternative key for the node LogisticPackage. In certain implementations, LogisticPackage_Key may contain the following elements: LogisticUnitUUID, which is optional, and IdentifiedLogisticUUID, which is optional.

A LogisticPackage may have an inbound association relationship from the business object IdentifiedLogisticUnit with node IdentifiedLogisticUnit to specialization IdentifiedLogisticUnit called IdentifiedLogisticUnit. The IdentifiedLogisticUnit is the IdentifiedLogisticUnit of the inventory item and has a cardinality of 1:c.

A LogisticPackage may have an inbound association relationship from the business object LogisticUnit with node LogisticUnit to specialization LogisticUnit called LogisticUnit. The LogisticUnit is the LogisticUnit of the inventory item and has a cardinality of c:cn.

A LogisticPackage may have an inbound association relationship from the business object Inventory with node LogisticPackage called ParentLogisticPackage. The ParentLogisticPackage is the logistic package (identified logistic unit or logistic unit) that lies above another logistic package. The ParentLogisticPackage has a cardinality of 1:c.

The business object Inventory with node Inventory may have an association for navigation with LogisticPackage named ChildLogisticPackage. ChildLogisticPackage has a cardinality of 1:cn. The ChildLogisticPackage is the logistic package of the specializations "Identified Logistic Unit", "Logistic Unit" that lies below another logistic package of the specialization "Identified Logistic Unit". In some implementations, the ChildLogisticPackage association may not exist for specializations "Logistic Unit".

The business object Inventory with node Inventory may have another association for navigation with LogisticPackage named Item. Item has a cardinality of c:cn. The Item is the items that are contained by the LogisticPackage.

The business object Inventory with the node ExpectedInventoryChange may have an association for navigation with LogisticPackage named ExpectedInventoryChange. ExpectedInventoryChange has a cardinality of c:cn. The ExpectedInventoryChange is the ExpectedInventoryChange of inventory within the LogisticPackage.

The business object Inventory with the node Availability may have an association for navigation with LogisticPackage named Availability. Availability has a cardinality of c:cn. The Availability is the availability of inventory within the LogisticPackage.

QueryByElements delivers a list of all IdentifiedLogisticUnits and LogisticUnits that fit the selection criteria. GDT InventoryLogisticPackageElementsQueryElements defines the query elements. In certain implementations, these elements include: TypeCode, which is optional and may be based on GDT LogisticPackageTypeCode; IdentifiedLogisticUnitUUID, which is optional and may be based on GDT UUID; IdentifiedLogisticUnitID, which is optional and may be based on GDT IdentifiedLogisticUnitID; LogisticUnitUUID, which is optional and may be based on GDT UUID; and LogisticUnitID, which is optional and may be based on GDT LogisticUnitID.

ExpectedInventoryChange

ExpectedInventoryChange is the specification of a future change to inventory quantities. ExpectedInventoryChange can occur in the following complete and disjoint specializations: MaterialAllocation 230050, IdentifiedLogisticUnitAllocation 230054, and/or ExpectedIncomingMaterial 230052. MaterialAllocation may be the specification of an inventory change that may or may not occur when a material quantity is reserved for one consumer, based on a specified material and other relevant inventory separating values. IdentifiedLogisticUnitAllocation may be the specification of an inventory change that may or may not occur when a material quantity is reserved for one consumer, based on a specified IdentifiedLogisticUnit. ExpectedIncomingMaterial may be the specification of an inventory change that may or may not occur when an expected material comes in. The consumer is usually a production order, production request, or a production requisition.

The elements located at the ExpectedInventoryChange node are defined by the data type InventoryExpectedInventoryChangeElements. In certain implementations, these elements include: UUID, TypeCode, AllocationTypeCode, OriginUUID, OriginTypeCode, MainInventorySeparatingValues, IdentifiedStockInventorySeparatingValues, LogisticUnitUUID, InventoryUUID, LogisticPackageUUID, QuantityTypeCode, and Quantity.

UUID is a universal identifier, which can be unique, of an Expected Inventory Change. UUID is an alternative key and may be based on GDT UUID.

TypeCode is the coded display of the type of an expected inventory change, and may be based on GDT ExpectedInventoryChangeTypeCode. In certain implementations, the following codes may be used: MaterialAllocation, IdentifiedLogisticUnitAllocation, and ExpectedIncomingMaterial.

AllocationTypeCode is a coded display of the reservation type. In certain implementations, values may include Immediate, Expected, and None. AllocationTypeCode may be based on GDT InventoryAllocationTypeCode.

OriginUUID is the UUID of the Origin of the ExpectedInventoryChange. OriginUUID may be based on GDT UUID.

OriginTypeCode is the coded display of the Origin of the ExpectedInventoryChange. OriginTypeCode may be based on GDT ExpectedInventoryChangeOriginTypeCode. In certain implementations, OriginTypeCode may use the following codes: ProductionOrder, SiteLogisticsOrder, and InternalMaterialFlow.

MainInventorySeparatingValues are values of stock-separating attributes that may or may not be required for inventory posting. Inventory-separating attributes are criteria that can be used to differentiate one inventory from other inventory. MainInventorySeparatingValues may be based on GDT MainInventorySeparatingValues. In certain implementations, MainInventorySeparatingValues may use the following elements: MaterialUUID, which is optional, OwnerPartyUUID, which is optional, SupplyPlanningAreaUUID, which is optional, and InventoryRestrictedUseIndicator, which is optional.

IdentifiedStockInventorySeparatingValues are values of selected IdentifiedStock attributes that separate Inventory. IdentifiedStockInventorySeparatingValues is optional and may be based on GDT IdentifiedStockInventorySeparatingValues. In certain implementations, IdentifiedStockInventorySeparatingValues may use the element IdentifiedStockUUID, which is optional.

SpecialStockInventorySeparatingValues are the universal unique identities that separate special stock. Special Stock are materials that may or may not be managed separately for reasons of logistics processes. SpecialStockInventorySeparatingValues is optional and may be based on GDT SpecialStockInventorySeparatingValues. In certain implementations, SpecialStockInventorySeparatingValues may use the following elements: OutboundDeliveryItemUUID, which is optional, SiteLogisticsLotUUID, which is optional, and MaterialInspectionUUID, which is optional.

LogisticUnitUUID is a universal identifier, which can be unique, of a LogisticUnit into which Expected Inventory changes can be physically grouped. LogisticUnitUUID is optional and may be based on GDT UUID.

InventoryUUID is a universal identifier, which can be unique, of the business object node Inventory. InventoryUUID may be the UUID of the specializations LocationInventory, LogisticsAreaInventory or ResourceInventory. InventoryUUID may be based on. GDT UUID.

LogisticPackageUUID is a universal identifier, which can be unique, of the business object node LogisticPackage as a physical package unit for which the inventory reservation is made. A physical package unit may or may not be an IdentifiedLogisticUnit or a LocisticsUnit. LogisticPackageUUID is optional and may be based on GDT UUID.

QuantityTypeCode is a coded representation of the details of the quantity of an inventory reservation. QuantityTypeCode may be based on GDT QuantityTypeCode.

Quantity is the quantity of an inventory reservation, and may be based on GDT Quantity.

An ExpectedInventoryChange may have an inbound association relationship from business object Material with node Material called Material. The Material is the reserved material and has a cardinality of 1:cn.

An ExpectedInventoryChange may have an inbound association relationship from business object BusinessPartner with node BusinessPartner called OwnerParty. The OwnerParty is the owner for which the allocation was placed and has a cardinality of 1:cn.

An ExpectedInventoryChange may have an inbound association relationship from business object SupplyPlanningArea with node SupplyPlanningArea called SupplyPlanningArea. The SupplyPlanningArea is the SupplyPlanningArea for which the allocation was placed and has a cardinality of 1:cn.

An ExpectedInventoryChange may have an inbound association relationship from business object IdentifiedStock with node IdentifiedStock called IdentifiedStock. The IdentifiedStock is the IdentifiedStock of the allocation and has a cardinality of c:cn.

An ExpectedInventoryChange may have an inbound association relationship from business object LogisticUnit with node LogisticUnit to specialization LogisticUnit called LogisticUnit. The LogisticUnit is the LogisticUnit of the inventory item and has a cardinality of c:cn.

An ExpectedInventoryChange may have an inbound association relationship from business object SiteLogisticsLot with node SiteLogisticsLot called SiteLogisticsLot. The SiteLogisticsLot is the SiteLogisticsLot UUID for which the allocation was placed and has a cardinality of c:cn.

An ExpectedInventoryChange may have an inbound association relationship from business object OutboundDelivery with node OutboundDeliveryItem called OutboundDeliveryItem. The OutboundDeliveryItem is the OutboundDeliveryItem document item UUID for which the allocation was placed and has a cardinality of c:cn.

An ExpectedInventoryChange may have an inbound association relationship from business object MaterialInspection with node MaterialInspection called MaterialInspection. The MaterialInspection is the MaterialInspection document UUID for which the allocation was placed and has a cardinality of c:cn.

An ExpectedInventoryChange may have an inbound association relationship from the node LogisticPackage called LogisticPackage. The LogisticPackage is the reservations of the material contained in a LogisticPackage and has a cardinality of c:cn.

Availability

In business object Inventory, Availability is the specification of how much material from an Inventory can be used for further business processes.

The elements located at the node Availability are defined by the data type: InventoryAvailabilityElements. In certain implementations, these elements include: UUID, CheckScopeCode, IdentifiedStockAggregationIndicator, LogisticUnitAggregationIndicator, MainInventorySeparatingValues, IdentifiedStockInventorySeparatingValues, SpecialStockInventorySeparatingValues, InventoryUUID, LogisticPackageUUID, LogisticUnitUUID, QuantityTypeCode, Quantity, and AvailabilityKey.

UUID is a universal identifier, which can be unique, of an Availability. UUID is an alternative key and may be based on GDT UUID.

CheckScopeCode is a coded display of the scope of the availability of a material and may be based on GDT InventoryAvailabilityCheckScopeCode. In certain implementations, CheckScopeCode may use the following codes: On Hand Availability, Expected Availability, and On Hand Inventory.

IdentifiedStockAggregationIndicator indicates whether the available quantity is aggregated on IdentifiedStock. IdentifiedStockAggregationIndicator may be based on GDT Indicator. In certain implementations, IdentifiedStockAggregationIndicator may include a qualifier, IdentifiedStockAggregation.

LogisticUnitAggregationIndicator indicates whether the available quantity is aggregated on LogisticUnit level. LogisticUnitAggregationIndicator may be based on GDT Indicator. In certain implementations, LogisticUnitAggregationIndicator may include a qualifier, LogisticUnitAggregation.

MainInventorySeparatingValues are values of stock-separating attributes that may or may not be required for inventory posting. Inventory-separating attributes are criteria that can be used to differentiate one inventory from other inventory. MainInventorySeparatingValues may be based on GDT MainInventorySeparatingValues. In certain implementations, MainInventorySeparatingValues may use the following elements: MaterialUUID, OwnerPartyUUID, SupplyPlanningAreaUUID, and InventoryRestrictedUseIndicator.

IdentifiedStockInventorySeparatingValues are values of selected IdentifiedStock attributes that may or may not separate Inventory. IdentifiedStockInventorySeparatingValues is optional and may be based on GDT IdentifiedStockInventorySeparatingValues. In certain implementations, IdentifiedStockInventorySeparatingValues may use the element IdentifiedStockUUID, which is optional.

SpecialStockInventorySeparatingValues are the universal identities, which can be unique, that separate special stock. Special Stock are materials that may or may not be managed separately for reasons of logistics processes. SpecialStockInventorySeparatingValues is optional and may be based on GDT SpecialStockInventorySeparatingValues. In certain implementations, SpecialStockInventorySeparatingValues may use the following elements: OutboundDeliveryItemUUID, which is optional, SiteLogisticsLotUUID, which is optional, and MaterialInspectionUUID, which is optional.

InventoryUUID is a universal identifier, which can be unique, of the business object node Inventory. InventoryUUID may be the UUID of the specializations: LocationInventory, LogisticsAreaInventory or ResourceInventory. InventoryUUID may be based on GDT UUID.

LogisticPackageUUID is a universal identifier, which can be unique, of the business object node LogisticPackage as a physical package unit for the availability calculation. A physical package unit may or may not be an IdentifiedLogisticUnit or a LogisticsUnit. LogisticPackageUUID is optional and may be based on GDT UUID.

LogisticUnitUUID is a universal identifier, which can be unique, of a LogisticUnit into which inventory items can be physically grouped. LogisticUnitUUID is optional and may be based on GDT UUID.

QuantityTypeCode is a coded representation of details of the available quantity of a material. QuantityTypeCode may be based on GDT QuantityTypeCode.

Quantity is the available quantity of a material, and may be based on GDT Quantity.

AvailabilityKey is an alternative key for the node Availability. In certain implementations, AvailabilityKey may contain the following elements: CheckScopeCode; IdentifiedStockAggregationIndicator; LogisticUnitAggregationIndicator; MainInventorySeparatingValues, in which the following elements may or may not used: MaterialUUID, OwnerPartyUUID, SupplyPlanningAreaUUID, and InventoryRestrictedUseIndicator; IdentifiedStockInventorySeparatingValues, which may or may not use the element IdentifiedStockUUID; SpecialStockInventorySeparatingValues, which may or may not use the following elements: OutboundDeliveryItemUUID, SiteLogisiticsLotUUID, and MaterialInspectionUUID; CustodianPartyUUID; LocationUUID; LogisticAreaUUID; ResourceUUID; and LogisticUnitUUID.

Availability has a 1:cn cardinality relationship with an AvailabilityComponent 230046 subordinate node.

An Availability may have an inbound association relationship from business object Material with node Material called Material. The Material is the available material and has a cardinality of 1:cn.

An Availability may have an inbound association relationship from business object BusinessPartner with node BusinessPartner called OwnerParty. The OwnerParty is the owner of the availability check and has a cardinality of 1:cn.

An Availability may have an inbound association relationship from business object SupplyPlanningArea with node SupplyPlanningArea called SupplyPlanningArea. The SupplyPlanningArea is the SupplyPlanningArea of the availability check and has a cardinality of 1:cn.

An Availability may have an inbound association relationship from business object IdentifiedStock with node IdentifiedStock called IdentifiedStock. The IdentifiedStock is the IdentifiedStock of the availability check and has a cardinality of c:cn.

An Availability may have an inbound association relationship from business object LogisticUnit with node LogisticUnit to specialization LogisticUnit called LogisticUnit. The LogisticUnit is the LogisticUnit of the inventory item and has a cardinality of c:cn.

An Availability may have an inbound association relationship from business object SiteLogisticsLot with node SiteLogisticsLot called SiteLogisticsLot. The SiteLogisticsLot is the SiteLogisticsLot UUID of the availability check and has a cardinality of c:cn.

An Availability may have an inbound association relationship from business object OutboundDelivery with node OutboundDeliveryItem called OutboundDeliveryItem. The OutboundDeliveryItem is the OutboundDeliveryItem document item UUID of the availability check and has a cardinality of c:cn.

An Availability may have an inbound association relationship from business object MaterialInspection with node MaterialInspection called MaterialInspection. The MaterialInspection is the MaterialInspection document UUID of the availability check and has a cardinality of c:cn.

An Availability may have an inbound association relationship from node LogisticPackage called LogisticPackage. The LogisticPackage is the availability of the material contained in a LogisticPackage and has a cardinality of c:cn.

QueryByElements delivers a list of all InventoryAvailability nodes that fit the selection criteria to calculate the available inventory considering the current Inventory and existing Allocations. In a query, the query elements LocationUUID or LocationID, LogisticsAreaUUID or LocationID may or may not be set. GDT InventoryAvailabilityElementsQueryElements defines the query elements, which in certain implementations includes: InventoryLocationUUID, which is optional and may be based on GDT UUID; InventoryLocationID, which is optional and may be based on GDT LocationID; InventoryLogisticsAreaUUID, which is optional and may be based on GDT UUID; InventoryLogisticsAreaID, which is optional and may be based on GDT LogisticsAreaID; CheckScopeCode which may be based on GDT InventoryAvailabilityCheckScopeCode; IdentifiedStockAggregationIndicator, which may be based on GDT Indicator, and in certain implementations may include a qualifier, IdentifiedStockAggregation; LogisticUnitAggregationIndicator, which may be based on GDT Indicator, and in certain implementations may include a qualifier, LogisticUnitAggregation; MainInventorySeparatingValues, which is optional and may be based on GDT MainInventorySeparatingValues, and in which the following elements may or may not be used: MaterialUUID, which is optional, MaterialID, which is optional, OwnerPartyUUID, which is optional, OwnerPartyID, which is optional, SupplyPlanningAreaUUID, which is optional, SupplyPlanningAreaID, which is optional, and InventoryRestrictedUseIndicator, which is optional; IdentifiedStockInventorySeparatingValues, which is optional and may be based on GDT IdentifiedStockInventorySeparatingValues, and in which the following elements may or may not be used: IdentifiedStockUUID, which is optional, and IdentifiedStockID, which is optional; SpecialStockInventorySeparatingValues, which is optional and may be based on GDT SpecialStockInventorySeparatingValues, and in which the following elements may or may not be used: OutboundDeliveryItemUUID, which is optional, OutboundDeliveryReference, which is optional, SiteLogisticsLotUUID, which is optional, SiteLogisticsLotID, which is optional, MaterialInspectionUUID which is optional, and MaterialInspectionID, which is optional; LogisticUnitUUID, which is optional and may be based on GDT UUID; and LogisticUnitID, which is optional and may be based on GDT LogisticUnitID.

Availability may include the AvailabilityComponent. The AvailabilityComponent is the component of an availability calculation. AvailabilityComponents are the different quantities that are the basis for the availability calculations. These are the physical inventory and the different types of ExpectedInventoryChanges, based on the availability calculation parameters The elements located at the node AvailabilityComponent are defined by the data type InventoryAvailabilityComponentElements. In certain implementations, these elements may include the following: QuantityRoleCode, which is a coded representation of the role of a quantity of an availability calculation, and may be based on GDT QuantityRoleCode; QuantityTypeCode, which is a coded representation of a type of a quantity that is based on the measurable characteristic of an object, and may be based on GDT QuantityTypeCode; and Quantity, which is the quantity of an availability calculation and may be based on GDT Quantity.

ExpectedStorageCapacityChange 230062.

The ExpectedStorageCapacityChange is the specification of a future change in the storage capacity of an inventory location. ExpectedStorageCapacityChange can occur in the following complete and disjoint specializations: StorageCapacityAllocationByLogisticUnit 230064 (i.e., the specification of a storage capacity change that will occur when a logistic unit quantity is expected to be received), or ExpectedOutgoingLogisticUnit 230066 (i.e., the specification of a storage capacity change that will occur when a logistic unit quantity is expected to be issued). ExpectedStorageCapacityChanges are allocations of capacity for the put away of Logistic Units, and the expected receipt of Logistic Units, which may or may not decrease the storage capacity when executed. The storage capacity can measure the capability of an inventory location to take additional Logistic Units. The consumer is usually a production order, production request, production requisition, site logistics order or site logistics request.

The elements located at the ExpectedStorageCapacityChange node are defined by the data type InventoryExpectedStorageCapacityChangeElements. In certain implementations, these elements may include the following: UUID, TypeCode, OriginUUID, OriginTypeCode, LogisticUnitUUID, InventoryUUID, LogisticPackageUUID, QuantityTypeCode, and Quantity.

UUID is a universal identifier, which can be unique, of an Expected Storage Capacity Change. UUID may be based on GDT UUID, and is an alternative key.

TypeCode. An ExpectedStorageCapacityChangeTypeCode is the coded display of the type of an expected inventory change and may be based on GDT InventoryExpectedStorageCapacityChangeTypeCode->Waiting for PICC approval. In certain implementations, ExpectedStorageCapacityChangeTypeCode may use the following codes: StorageCapacityAllocationByLogisticUnit and ExpectedOutgoingLogisticUnit.

OriginUUID is the UUID of the Origin of the Expected Storage Capacity Change and may be based on GDT UUID.

OriginTypeCode is a coded representation of the Origin of the Expected Storage Capacity Change and may be based on GDT InventoryExpectedStorageCapacityChangeOriginTypeCode->

Waiting for PICC approval. In certain implementations, OriginTypeCode may use the following codes: ProductionOrder, SiteLogisticsOrder, and InternalMaterialFlow.

LogisticUnitUUID is a universal identifier, which can be unique, of a LogisticUnit into which expected storage capacity changes are physically grouped. LogisticUnitUUID is optional and may be based on GDT UUID.

InventoryUUID is a universal identifier, which can be unique, of the business object root node. InventoryUUID may be the UUID of the specializations LocationInventory, LogisticsAreaInventory or ResourceInventory, and may be based on GDT UUID.

LogisticPackageUUID is a universal identifier, which can be unique, of the business object node LogisticPackage as a physical package unit for which the storage capacity reservation is made. A physical package unit may be an IdentifiedLogisticUnit or a LocisticsUnit. LogisticPackageUUID is optional and may be based on GDT UUID.

QuantityTypeCode is a coded representation of the details of the quantity of a storage capacity reservation. QuantityTypeCode may be based on GDT QuantityTypeCode).

Quantity is the Quantity of a storage capacity reservation. Quantity may be based GDT Quantity.

An ExpectedStorageCapacityChange may have an inbound association relationship from business object LogisticUnit with node LogisticUnit to specialization LogisticUnit called LogisticUnit. The LogisticUnit is LogisticUnit of the storage capacity item and has a cardinality of c:cn.

An ExpectedStorageCapacityChange may have an inbound association relationship from node LogisticPackage called LogisticPackage. The LogisticPackage is reservations contained in a LogisticPackage and has a cardinality of c:cn.

AvailableStorageCapacity

The AvailableStorageCapacity is the specification of how many Logistic Units can be stored in an inventory location for further business processes. The available storage capacity of an inventory location is calculated out of the total capacity of the inventory location, the current inventory and the expected change to storage capacity.

The elements located at the node AvailableStorageCapacity are defined by the data type InventoryAvailableStorageCapacityElements. In certain implementations, these elements may include the following: UUID, CheckScopeCode, LogisticUnitUUID, InventoryUUID, LogisticPackageUUID, QuantityTypeCode, Quantity, and AvailableStorageCapacityKey.

UUID is a universal identifier, which can be unique, of an AvailableStorageCapacity. UUID is an alternative key and may be based on GDT UUID.

CheckScopeCode is a coded representation of the check scope for the calculation of the available storage capacity. The check scope may or may not define which components are used for the availability calculation. In certain implementations, CheckScopeCode may use the following codes: On Hand Storage Capacity and Expected Storage Capacity. CheckScopeCode may be based on GDT InventoryAvailableStorageCapacityCheckScopeCode.

LogisticUnitUUID is a universal identifier, which can be unique, of a LogisticUnit into which inventory items are physically grouped. LogisticUnitUUID is optional and may be based on GDT UUID.

InventoryUUID is a universal identifier, which can be unique, of the business object node Inventory. InventoryUUID may be the UUID of the specializations LocationInventory, LogisticsAreaInventory or ResourceInventory. LogisticUnitUUID may be based on GDT UUID.

LogisticPackageUUID Is a universal identifier, which can be unique, of the business object node LogisticPackage as a physical package unit for the available storage capacity calculation. A physical package unit may be an IdentifiedLogisticUnit or a LocisticsUnit. LogisticPackageUUID is optional and may be base on GDT UUID.

QuantityTypeCode is a coded representation of details of the available storage capacity quantity of a logistic unit. QuantityTypeCode may be based on GDT QuantityTypeCode.

Quantity is the available storage capacity quantity of a logistic unit. Quantity may be based on GDT Quantity.

AvailableStorageCapacityKey is an alternative key for the node Availability. In certain implementations, AvailableStorageCapacityKey may contain the following elements: CheckScopeCode, LogisticUnitUUID, LocationUUID, CustodianPartyUUID, LogisiticsAreaUUID, and ResourceUUID.

AvailableStorageCapacity has a 1:cn cardinality relationship to the AvailableStorageCapacityComponent subordinate node.

An AvailableStorageCapacity may have an inbound association relationship with LogisticUnit called LogisticUnit. The LogisticUnit is the LogisticUnit of the storage capacity item and has a cardinality of c:cn.

An AvailableStorageCapacity may have an inbound association relationship from node LogisticPackage called LogisticPackage. The LogisticPackage is the available storage capacity of the logistic unit contained in a LogisticPackage and has a cardinality of c:cn.

QueryByElements delivers a list of AvailableStorageCapacity nodes that fit the selection criteria to calculate the available storage capacity considering the current Inventory and existing expected storage capacity allocations. In a query, the query elements LocationUUID or LocationID, LogisticsAreaUUID or LocationID may or may not be set. GDT InventoryAvailableStorageCapacityElementsQueryElements defines the query elements, which in certain implementations include: InventoryLocationUUID, which is optional and may be based on GDT UUID; InventoryLocationID, which is optional and may be based on GDT LocationID; InventoryLogisticsAreaUUID, which is optional and may be based on GDT UUID; InventoryLogisticsAreaID, which is optional and may be based on GDT LogisticsAreaID; CheckScopeCode, which is optional and may be based on GDT InventoryAvailableStorageCapacityCheckScopeCode; LogisticUnitUUID, which is optional and may be based on GDT UUID; and LogisticUnitID, which is optional and may be based on GDT LogisticUnitID.

AvailableStorageCapacityComponent 230070

The AvailableStorageCapacityComponent is a component of a calculation of available storage capacity. Components are the different quantities that are the basis for calculating the storage capacity of an inventory location. These are the physical inventory and the different types of ExpectedUnusedCapacityChanges, based on the availability calculation parameters The elements located at the node AvailableStorageCapacityComponent are defined by the data type InventoryAvailableStorageCapacityComponentElements. In certain implementations, these elements may include the following: QuantityRoleCode, QuantityTypeCode, or Quantity.

QuantityRoleCode is a coded representation of the role of a quantity of an availability calculation of storage capacity. QuantityRoleCode may be based on GDT QuantityRoleCode.

QuantityTypeCode is a coded representation of the type of a quantity that is based on the measurable characteristic of an object. QuantityTypeCode may be based on GDT Quantity-TypeCode.

Quantity is the quantity of an availability calculation of storage capacity. Quantity may be based on GDT Quantity.

Business Object LogisticsTaskFolder

FIGS. 231-1 through 231-4 illustrate an example LogisticsTaskFolder business object model 231010. Specifically, this model depicts interactions among various hierarchical components of the LogisticsTaskFolder, as well as external components that interact with the LogisticsTaskFolder (shown here as 231000 through 231008 and 231012 through 231028).

Business Object LogisticsTaskFolder is a folder for storing and grouping logistics tasks according to business criteria. LogisticsTaskFolder can contain details about the processors that are registered at the folder. LogisticsTaskFolder may be used for storing three types of logistics task, that is the business objects ProductionTask, SiteLogisticsTask and PhysicalInventoryTask. Other task types within logistics may also be used. Which types of tasks can be stored in a folder may be defined by the business object Responsibility. In logistics, the parameter set of Responsibility may consist typically of resource, place (LogisticsArea), and activity types to be carried out (such as set up, process, move, pack). Several LogisticsTaskFolders may use the same business criteria, which means that a logistics task can be assigned to more than one LogisticsTaskFolder. The business object LogisticsTaskFolder is part of the Deployment Unit 'Production and Site Logistics Execution'. LogisticsTaskFolder can comprise nodes that are required for the managing and processing of tasks. Persons who are responsible for processing the tasks can be assigned to the logistics task folder. LogisticsTaskFolder can be represented by the root node Root.

Node Structure of Business Object LogisticsTaskFolder

Node Structure of Business Object LogisticsTaskFolder 231030 in the context of LogisticsTaskFolder (Root Node), refers to a folder for storing and grouping of logistics tasks according to business criteria. It can specify, for example, the name of the logistics task folder as well as a rule for sorting the contents of the logistics task folder. The elements located directly at the node LogisticsTaskFolder can be defined by the type NDT: LogisticsTaskFolderElements. These elements may include ID, UUID, TypeCode, LogisticsTaskSortCriterionCode, LogisticsTaskProcessingFunctionalUnitUUID, LogisticsTaskProcessingFunctionalUnitID and SystemAdministrativeData. ID is an identifier, which can be unique, for a logistics task folder. ID may be based on GDT: LogisticsTaskFolderID. UUID is a universal identifier, which can be unique, of a logistics task folder for referencing purposes. UUID may be based on GDT: UUID.

TypeCode is a coded representation of the type of the logistics task folder.

TypeCode may be based on GDT: LogisticsTaskFolderTypeCode. LogisticsTaskSortCriterionCode is a coded representation of a sorting rule, and is optional.

LogisticsTaskSortCriterionCode may be based on GDT: LogisticsTaskSortCriterionCode. LogisticsTaskProcessingFunctionalUnitUUID is a universal identifier, which can be unique, of the functional unit which may be authorized to process the task in the logistics task folder. The functional unit is taken over to AccessControlList. LogisticsTaskProcessingFunctionalUnitUUID may be based on GDT: UUID. LogisticsTaskProcessingFunctionalUnitID is an identifier, which can be unique, of the functional unit which may be authorized to process the task in the logistics task folder. LogisticsTaskProcessingFunctionalUnitID may be based on GDT: OrganisationalCentreID and Qualifier: Processing. SystemAdministrativeData refers to administrative data for a logistics task folder. This data may include system users and change dates/times. SystemAdministrativeData may be based on GDT: SystemAdministrativeData.

A number of composition relationships to subordinate nodes can exist, such as Description 231036 1:cn, Registration 231034 1:cn, Item 231032 1:cn, Summary 231038 1:1 and DO: AccessControlList 231040 1:1. Inbound Association Relationships may relate: from business object Identity/node Root, CreationIdentity 1:cn, as it identifies the Identity that created the logistics task folder; from business object Identity/node Root, LastChangeIdentity c:cn, as it identifies the Identity that changed the logistics task folder last; from business object Responsibility/node Root, ProductionTaskResponsibility c:c, as it identifies the Responsibility regarding production tasks which are maintained for a logistics task folder of type standard folder. The Responsibility defines which production tasks are dispatched to a logistics task folder, SiteLogisticsTaskResponsibility c:c, as it identifies the Responsibility regarding Site Logistics Tasks which are maintained for a logistics task folder of type standard folder. The Responsibility defines which Site Logistics Tasks are dispatched to a logistics task folder; PhysicalInventoryTaskResponsibility c:c, as it identifies the Responsibility regarding Physical Inventory Task which are maintained for a logistics task folder of type standard folder. The Responsibility defines which Physical Inventory Tasks are dispatched to a logistics task folder, ExceptionResponsibility c:c, as it identifies the Responsibility regarding logistics task which are maintained for a logistics task folder of type exception folder. The Responsibility defines to which exception folder a task is dispatched if no standard folder is found; and from business object FunctionalUnit/node Root, LogisticsTaskProcessingFunctionalUnit c:cn, as it identifies the functional unit that is authorized to process the logistics task in the logistics task folder. Associations for Navigation may relate from business object LogisticsTaskFolder/node Item, TaskToBeProcessed c:c, as it identifies the logistics task within a folder that should be processed. The task to be processed results from the sorting of the logistics tasks in the logistics task folder.

Enterprise Service Infrastructure Actions may include SortTasks and Copy. A SortTasks action sorts the logistics tasks (logistics task folder items) of the logistics task folder according to the sorting criteria specified at the logistics task folder. SortTasks may have the following attributes: 1) Preconditions, where the action can be carried out if sorting criteria have been defined for the logistics task folder; 2) Changes to the object, where the action may sort the logistics task folder items of the logistics task folder and changes the OrdinalNumberValue of the logistics task folder items accordingly.

A Copy action creates a new logistics task folder by copying an existing folder and may have the following attributes: 1) Preconditions, where the action can be performed for one logistics task folder; 2) Changes to the object whose action may not affect the logistics task folder; 3) Changes to other objects where the action may create a new logistics task folder, and depending on the actions's parameter settings, other nodes may be copied in addition to the root node.

Queries may include QueryByElements, QueryByRegistration and QueryByResponsibility. QueryByElements may provide a list of all logistics task folders that can match the logistics task folder IDs and the logistics task folder type specified by the query. The query elements may be defined by the data type LogisticsTaskFolderElementsQueryElements.

These elements may include ID, UUID, TypeCode and LogisticsTaskProcessingFunctionalUnitID. ID, which is optional, may be based on GDT: LogisticsTaskFolderID. UUID, which is optional, may be based on GDT: UUID. TypeCode, which is optional, may be based on GDT: LogisticsTaskFolderTypeCode. LogisticsTaskProcessingFunctionalUnitID, which is optional, may be based on GDT: OrganisationalCentreID and Qualifier: Processing). QueryByRegistration may provide a list of all logistics task folders that match the parameters of the registration specified by the query. The query elements may be defined by the data type LogisticsTaskFolderRegistrationQueryElements. These elements may include RegistrationRegistrantTypeCode, RegistrationEmployeeID, RegistrationIdentityUUID, RegistrationDeviceID, RegistrationRegistrantRoleCode and RegistrationActiveIndicator. RegistrationRegistrantTypeCode, which is optional, may be based on GDT: LogisticsTaskFolderRegistrantTypeCode. RegistrationEmployeeID may be based on GDT: EmployeeID. RegistrationIdentityUUID, which is optional, may be based on GDT: UUID. RegistrationDeviceID, which is optional, may be based on GDT: DeviceID. RegistrationRegistrantRoleCode, which is optional, may be based on GDT: RegistrantRoleCode. RegistrationActiveIndicator, which is optional, may be based on GDT: ActiveIndicator.

QueryByResponsibility may provide a list of all logistics task folders that match the Responsibility parameters specified by the query. The query may select logistics task folders by their responsibility. The responsibility of a logistics task folder may be defined by several parameters dependent on the logistics task projection and the LogisticsTaskFolderTypeCode: 1) LogisticsTaskFolderTypeCode “Standard Folder” as: Projection ProductionTask supports LogisticsArea, Resource and OperationActivityTypeCode; 2) Projection SiteLogisticsTask supports InventoryManagedLocation, LogisticsArea and OperationTypeCode; and 3) Projection PhysicalInventoryTask supports InventoryManagedLocation and LogisticsArea. LogisticsTaskFolderTypeCode ‘Exception Folder’ may be limited to support FunctionalUnit for all logistics task projections. Except of the parameter ItemLogisticsTaskTypeCode and LogisticsAreaHierarchyExplosionIndicator the query parameters may be part of the parameter set defined in the reuse component Responsibility for logistics task dispatching. In some implementations, the parameters may not occur as elements in the BO Responsibility but as values during runtime. The Query can select the LogisticsTaskFolder via the parameter sets of Responsibility which may be used for logistics task dispatching. The query elements can be defined by the data type LogisticsTaskFolderResponsibilityQueryElements. These elements may include ItemLogisticsTaskTypeCode, InventoryManagedLocation_ID, LogisticsAreaKey, LogisticsAreaHierarchyExplosionIndicator, Resource_ID, OperationTypeCode, OperationActivityTypeCode and FunctionalUnit_ID.

ItemLogisticsTaskTypeCode, which is optional, may be based on GDT: LogisticsTaskTypeCode and refers to controls for which logistics task projections Responsibility may be called. InventoryManagedLocation_ID, which is optional, may be based on GDT: LocationID and refers to an ID of the BO Location with the role of an InventoryManagedLocation. ProductionTask may not be supported, SiteLogisticsTask may be supported and PhysicalInventoryTask may be supported. LogisticsAreaKey, which is optional, may be based on IDT: LogisticsAreaKey and refers to key of the business object LogisticsArea. ProductionTask may be supported. SiteLogisticsTask may be supported. PhysicalInventoryTask may be supported. Elements of the Key may include LogisticsAreaID, which is optional, and SiteID which is optional, and may indicate a change of LogisticsAreaID to LogisticsAreaKey. LogisticsAreaHierarchyExplosionIndicator, which is optional, may be based on GDT: Indicator and Qualifier: HierarchyExplosion and may indicate whether the Logistics Area hierarchy may be exploited and the underlying Logistics Areas considered for the query. Resource_ID, which is optional, may be based on GDT: ResourceID and can refer to an ID of the business object Resource. ProductionTask may be supported, SiteLogisticsTask may or may not be supported, and PhysicalInventoryTask may not be supported.

OperationTypeCode, which is optional, may be based on GDT: OperationTypeCode.

For site logistics tasks, it may be the OperationTypeCode of the BO SiteLogisticsLot at node Operation.

For physical inventory tasks, it may be the OperationTypeCode of the BO PhysicalInventoryCount at node Operation. ProductionTask can be supported. SiteLogisticsTask may be supported. PhysicalInventoryTask can be supported. OperationActivityTypeCode which is optional, may be based on GDT: OperationActivityTypeCode. For production tasks, it may be the OperationActivityTypeCode of the BO ProductionLot at node OperationActivity. ProductionTask may be supported. SiteLogisticsTask may be supported. PhysicalInventoryTask may be supported. FunctionalUnit_ID which is optional, may be based on GDT: OrganisationalCentreID and may refer to ID of the business object Functional Unit ProductionTask may be supported. SiteLogisticsTask may be supported. PhysicalInventoryTask may be supported.

Description

Description is a language-dependent short text with additional information about a logistics task folder. The elements located directly at the node Description can be defined by the type NDT: LogisticsTaskFolderDescriptionElements. These elements may include Description, which can be referred to Language-dependent short text for a logistics task folder, and may be based on GDT _MEDIUM_DESCRIPTION and Qualifier: LogisticsTaskFolder Registration Registration is the assignment of a person, end-user device, and so on to a logistics task folder. The person assigned or the person logged on at the end-user device assigned may be responsible for processing the tasks or monitors the processing of the tasks stored in the logistics task folder. A supervisor may, for example, assign a person to one or more logistics task folders. This person may then be responsible for processing the logistics tasks that are stored in these logistics task folders. If a person logs on to an end-user device that is assigned to a logistics task folder, this person can process the logistics tasks stored in this folder or monitor their processing. The elements located directly at the node Registration may be defined by the type NDT: LogisticsTaskFolderRegistrationElements. These elements may include ActiveIndicator, RegistrantTypeCode, EmployeeID, IdentityUUID, DeviceID, RegistrantRoleCode and SystemAdministrativeData.

ActiveIndicator is an Indicator that can specify whether a registration is active. ActiveIndicator may be based on GDT: ActiveIndicator. RegistrantTypeCode is a coded representation of the type of an object (for example, person or device) that may be registered at a logistics task folder. RegistrantTypeCode may be based on GDT: LogisticsTaskFolderRegistrantTypeCode. EmployeeID is an identifier, which can be unique, for an employee assigned to a logistics task folder. EmployeeID may be based on GDT: EmployeeID. IdentityUUID is a universal identifier, which can be unique, for the user who is registered at the logistics task folder. IdentityUUID may be based on GDT: UUID. DeviceID is an identifier, which can be unique, for a device or system which can be registered at the logistics task folder. DeviceID may be based on GDT: DeviceID. RegistrantRoleCode is a coded representation of the role of the person or device registered at the logistics task folder. RegistrantRoleCode may be based on GDT: RegistrantRoleCode. SystemAdministrativeData is an administrative data for a logistics task folder. This data can include system users and change dates/times. SystemAdministrativeData may be based on GDT: SystemAdministrative-Data.

Inbound Association Relationships may relate: from business object Identity/node Root, CreationIdentity 1:cn, as it identifies the Identity that created the logistics task folder; from business object Identity/node Root, LastChangeIdentity c:cn, as it identifies the Identity that changed the logistics task folder last; and from business object Identity/node Root, RegistrantIdentity c:cn, as it identifies the Identity registered at the logistics task folder.

Item

Item is a representation of a logistics task in the logistics task folder. In this way, the logistics task may be assigned to the processor that has registered at one or more folders and that may be responsible for processing the logistics tasks. A logistics task can be sent to another logistics task folder from the logistics task folder in which it may be stored to pass on the responsibility for processing the task to another processor. The corresponding item of the sending logistics task folder may then be deleted and a new item may be created in the receiving logistics task folder. The elements located directly at the node Item may be defined by the type NDT: LogisticsTaskFolderItemElements. These elements may include LogisticsTaskTypeCode, LogisticsTaskUUID, SenderLogisticsTaskFolderUUID, SenderIdentityUUID, ReceiptDateTime and OrdinalNumberValue.

LogisticsTaskTypeCode is a coded representation of the type of the logistics task that may be assigned to the logistics task folder. LogisticsTaskTypeCode may be based on GDT: LogisticsTaskTypeCode. LogisticsTaskUUID is a universal identifier, which can be unique, for a logistics task that may be assigned to the logistics task folder. LogisticsTaskUUID may be based on GDT: UUID. SenderLogisticsTaskFolderUUID is a universal identifier, which can be unique, for the logistics task folder from which the logistics task was sent, and is optional. SenderLogisticsTaskFolderUUID may be based on GDT: UUID. SenderIdentityUUID is a universal identifier, which can be unique, for the identity of the user who may have sent the logistics task, and is optional. SenderIdentityUUID may be based on GDT: UUID. ReceiptDateTime refers to date on which the logistics task may have been received by the logistics task folder. ReceiptDateTime may be based on GDT: Global_DateTime and Qualifier: Receipt. OrdinalNumberValue refers to sequence number that may be derived from the sorting of the logistics tasks in the logistics task folder, and is optional. OrdinalNumberValue may be based on GDT: OrdinalNumberValue.

Inbound Association Relationships may relate: from the business object ProductionTask/node Root, ProductionTask c:n, as it may denote the production task that is assigned to the logistics task folder; from the business object SiteLogisticsTask/node Root, SiteLogisticsTask c:n, as it may denote the site logistics task that is assigned to the logistics task folder; from the business object PhysicalInventoryTask/node Root, PhysicalInventoryTask c:n, as if may denote the physical inventory task that is assigned to the logistics task folder; from the business object LogisticsTaskFolder/node Root, SenderLogisticsTaskFolder c:cn, as it may denote the logistics task folder to which the production task was previously assigned and from which it is now sent due to changes in responsibilities for processing; from Transformed Object LogisticsTaskView/node Root, LogisticsTaskView 1:n, as it may denote the logistics task view that results from the task assignment to the logistics task folder; and from Business Object Identity/node Root, SenderIdentity 1:cn, as it may denote the Identity of the user who sent the logistics task.

In some implementations, in a logistics task folder, there may never be several items referring to the same logistics task. In some implementations, one of the associations ProductionTask, SiteLogisticsTask, MaterialInspectionTask, or PhysicalInventoryTask can be active at a time. In some implementations, a logistics task folder may not send a logistics task to itself. The SenderLogisticsTaskFolder can be the logistics task folder to which the logistics task was assigned before it was forwarded to the current logistics task folder.

Queries can include QueryByLogisticsTask, QueryBySender and QueryByLogisticsTaskElements. QueryByLogisticsTask provides a list of all logistics task folder items that can match the parameters specified by the query. The query elements are defined by the data type LogisticsTaskFolderItemLogisticsTaskUUIDQueryElements and may include LogisticsTaskUUID, which is optional, and may be based on GDT: UUID, and LogisticsTaskTypeCode, which is optional and may be based on GDT: LogisticsTaskTypeCode.

QueryBySender may provide a list of all logistics task folder items that can match the logistics task folder specified in the query from which the logistics task may have been sent or the user account of the user that may have sent the logistics task. The query elements are defined by the data type LogisticsTaskFolderItemSenderQueryElements and may include SenderLogisticsTaskFolderID, SenderEmployeeID and SenderIdentityUUID. SenderLogisticsTaskFolderID is an ID of the business object LogisticsTaskFolder from which a logistics task might have been sent, and is optional. SenderLogisticsTaskFolderID may be based on GDT: LogisticsTaskFolderID. SenderEmployeeID is optional and may be based on GDT: EmployeeID. SenderIdentityUUID is optional and may be based on GDT: UUID.

QueryByLogisticsTaskElements provides a list of items which referenced logistics tasks may match by its elements or elements of associated objects to the following query parameters. QueryByLogisticsTaskElements can be dependent on the projection of the LogisticsTask_Template which may be referenced by the item some parameters of the query, that can be supported or not. Restrictions may be found at the parameters. The query elements can be defined by the data type: LogisticsTaskFolderItemLogisticsTaskQueryElements. These elements can include LogisticsTask_ID, LogisticsTaskTypeCode, LogisticsTaskProcessorEmployee_IdentificationEmployeeID, LogisticsTaskProcessorEmployee_CommonFamilyName, LogisticsTaskProcessorEmployee_CommonGivenName, LogisticsTask_EarliestExecutionPeriod, LogisticsTask_LatestExecutionPeriod, LogisticsTask_ProcessingStatusCode, MaterialID, MaterialDescription, LogisticsAreaKey, Resource_ID, IdentifiedStock_ID, LogisticUnit_ID, PurchaseOrder_ID, SupplierPartyID, SupplierPartyName, SalesOrder_ID, CustomerPartyID, CustomerPartyName, ProductionOrder_ID, PhysicalInventoryCount_ID, LogisticsTaskFolder_RegistrationEmployeeID, LogisticsTaskFolder_RegistrationDeviceID, LogisticsTaskFolder_ID and SearchText.

LogisticsTask_ID is an identifier of the logistics task and is optional. LogisticsTask_ID may be based on GDT: BusinessTransactionDocumentID and its source may include ProductionTask: BO: ProductionTask, Node: Root; SiteLogisticsTask: BO: SiteLogisticsTask, Node: Root; PhysicalInventoryTask: BO: PhysicalInventoryTask, and Node: Root. LogisticsTaskTypeCode is a coded representation of the task type that may be derived from the logistics task projection, and is optional. LogisticsTaskTypeCode may be based on GDT: LogisticsTaskTypeCode. LogisticsTaskProcessorEmployee_IdentificationEmployeeID is an identifier of the employee who may be assigned to the logistics task as processor, and is optional. LogisticsTaskProcessorEmployee_IdentificationEmployeeID may be based on GDT: EmployeeID, Qualifier: Processor and its source may include ProductionTask: BO: ProductionTask, Node: Root; SiteLogisticsTask: BO: SiteLogisticsTask, Node: Root; PhysicalInventoryTask: BO: PhysicalInventoryTask, and Node: Root.

LogisticsTaskProcessorEmployee_CommonFamilyName is the family name of the employee that may have been assigned to the logistics task as processor and is optional. LogisticsTaskProcessorEmployee_CommonFamilyName may be based on GDT: LANGUAGEINDEPENDENT_MEDIUM_Name and Qualifier: Family. Its source may include ProductionTask: BO: ProductionTask, Node: Root; SiteLogisticsTask: BO: SiteLogisticsTask, Node: Root; and PhysicalInventoryTask: BO: PhysicalInventoryTask, Node: Root. LogisticsTaskProcessorEmployee_CommonGivenName refers to the first name of the employee that may be assigned to the logistics task as processor, and is optional. LogisticsTaskProcessorEmployee_CommonGivenName may be based on GDT: LANGUAGEINDEPENDENT_MEDIUM_Name and Qualifier: Given. Its source may include ProductionTask: BO: ProductionTask, Node: Root; SiteLogisticsTask: BO: SiteLogisticsTask, Node: Root; and PhysicalInventoryTask: BO: PhysicalInventoryTask, Node: Root.

LogisticsTask_EarliestExecutionPeriod is optional and may be based on GDT: GLOBAL_DateTimePeriod and Qualifier: Execution. Its source may include ProductionTask: BO: ProductionTask, Node: Root; SiteLogisticsTask: BO: SiteLogisticsTask, Node: Root; and PhysicalInventoryTask: BO: PhysicalInventoryTask, Node: Root. LogisticsTask_LatestExecutionPeriod is optional and may be based on GDT: GLOBAL_DateTimePeriod and Qualifier: Execution. Its source may include: ProductionTask: BO: ProductionTask, Node: Root; SiteLogisticsTask: BO: SiteLogisticsTask, Node: Root; and PhysicalInventoryTask: BO: PhysicalInventoryTask, Node: Root. LogisticsTask_ProcessingStatusCode is optional and may be based on GDT: ProcessingStatusCode. Its source may include: ProductionTask: BO: ProductionTask, Node: Root; SiteLogisticsTask: BO: SiteLogisticsTask, Node: Root; and PhysicalInventoryTask: BO: PhysicalInventoryTask, Node: Root.

MaterialID is an identifier of the material that may be produced, transported, packed, counted, or checked by the logistics tasks, and is optional. MaterialID may be based GDT: ProductID. Its source may include: ProductionTask: BO: ProductionOrder, Node: OperationActivityMaterialOutput; SiteLogisticsTask: BO: SiteLogisticsRequest, Node RequestItemProduct; and PhysicalInventoryTask: BO: PhysicalInventoryCount, Node: OperationActivityInventoryItem. MaterialDescription is a description of the material that may be produced, transported, packed, counted, or checked by the logistics tasks, and is optional. MaterialDescription may be based on GDT: SHORT_Description. Its source may include ProductionTask: BO: ProductionOrder, Node: OperationActivityMaterialOutput; SiteLogisticsTask: BO: SiteLogisticsRequest, Node RequestItemProduct; and PhysicalInventoryTask: BO: PhysicalInventoryCount, Node: OperationActivityInventoryItem.

LogisticsAreaKey is key of the LogisticsArea where the logistics task may be executed, and is optional. LogisticsAreaKey may be based on IDT: LogisticsAreaKey. Its source may include ProductionTask: BO: ProductionOrder, Node: Operation; and PhysicalInventorTask: BO: PhysicalInventoryCount, Node: OperationActivityInventory. Elements of the Key can include LogisticsAreaID, which is optional and SiteID LogisticsAreaKey. Resource_ID is an identifier of the Resource which can be used for execution of the task, and is optional. Resource_ID may be based on GDT: ResourceID. Its source may include ProductionTask: BO: ProductionOrder, Node: Operation; and PhysicalInventoryTask: BO: PhysicalInventoryCount, Node: OperationActivityInventory. IdentifiedStock_ID is an identifier of the identified stock that may be produced, transported, packed, counted, or checked by the logistics task, and is optional. IdentifiedStock_ID may be based on (GDT: IdentifiedStockID). Its source may include: ProductionTask: BO: ProductionLot, Node: MaterialOutput; SiteLogisticsTask: BO: SiteLogisticsRequest, Node: RequestItemProduct; and PhysicalInventoryTask: BO: PhysicalInventoryCount, Node: OperationActivityInventoryItem.

LogisticUnit_ID is an identifier of the logistic unit that may be produced, transported, packed, counted, or checked by the logistics task, and is optional. LogisticUnit_ID may be based on GDT: LogisticsUnitID. Its source may include: SiteLogisticsTask: BO: SiteLogisticsLot, Node: LogisticPackageInput and LogisticPackageOutput; and PhysicalInventoryTask: BO: PhysicalInventoryCount, Node: OperationActivityInventoryLogisticPackage. PurchaseOrder_ID is an identifier of the purchase order which may initiate the creation of a Logistics Task, and is optional. PurchaseOrder_ID may be based on GDT: BusinessTransactionDocumentID. Its source may include: SiteLogisticsTask: BO: SiteLogisticsRequest, Node: BusinessTransactionDocumentReference. SupplierPartyID is an identifier of the supplier by which the products of the Site Logistics Task may be delivered, and is optional. SupplierPartyID may be based on GDT: PartyID, Qualifier: Supplier. Its source may include: SiteLogisticsTask: BO: SiteLogisticsRequest, Node: Party.

SupplierPartyName refers to name of the supplier by which the products of the Site Logistics Task may be delivered, and is optional. SupplierPartyName may be based on GDT: LONG_Name, Qualifier: Party. Its source may include: SiteLogisticsTask: BO: SiteLogisticsRequest, Node: Party. SalesOrder_ID refers to ID of the sales order which may have initiated the creation of a Site Logistics Task or Production Task, and is optional. SalesOrder_ID may be based on GDT: BusinessTransactionDocumentID. Its source may include SiteLogisticsTask: BO: SiteLogisticsRequest, Node: BusinessTransactionDocumentReference. CustomerPartyID ID of the customer to which the product is delivered or for which it is produced, and is optional. CustomerPartyID may be based on GDT: PartyID, Qualifier: Customer. Its source may include: SiteLogisticsTask: BO: SiteLogisticsRequest, Node: Party.

CustomerPartyName refers to name of the customer to which the product may be delivered or for which it is produced, and is optional. CustomerPartyName may be based on GDT: LONG_NAME and Qualifier: Party. Its source may include: SiteLogisticsTask: BO: SiteLogisticsRequest, Node: Party. ProductionOrder_ID refers to ID of the production order which may be initiated by the creation of the production task, and is optional. ProductionOrder_ID may be based on GDT: BusinessTransactionDocumentID. Its source may include ProductionTask: BO: ProductionOrder, Node: Root; SiteLogisticsTask. PhysicalInventoryCount_ID is an ID of the physical inventory count which may be initiated by the creation of the physical inventory task, and is optional. PhysicalInventoryCount_ID may be based on GDT: BusinessTransactionDocumentID. Its source may include: PhysicalInventoryTask: BO: PhysicalInventoryCount, Node: Root.

LogisticsTaskFolder_RegistrationEmployeeID refers to an ID of the Employee that may be registered at a logistics task folder, and is optional. LogisticsTaskFolder_RegistrationEmployeeID may be based on GDT: EmployeeID. Its source may include: BO: LogisticsTaskFolder, Node: Registration. LogisticsTaskFolder_RegistrationDeviceID refers to ID of the device that may be registered at a logistics task folder and is optional. LogisticsTaskFolder_RegistrationEmployeeID may be based on GDT: DeviceID. Its source may include: BO: LogisticsTaskFolder, Node: Registration. LogisticsTaskFolder_ID refers to ID of the logistics task folder, and is optional. LogisticsTaskFolder_ID may be based on GDT: LogisticsTaskFolderID. Its source may include BO: LogisticsTaskFolder, Node: Root. SearchText refers to text which can be searched in all character-based elements which are part of this query, and is optional. SearchText may be based on GDT: SearchText.

Enterprise Service Infrastructure Actions may include ForwardTaskByCopy and ForwardTaskByMove. The ForwardTaskByCopy action may forward a logistics task to another logistics task folder without deleting the task from the forwarding logistics task folder and may have the following attributes: 1) Changes to other objects where a new item (LogisticsTaskFolderItem) may be created in the receiving logistics task folder. 2) Parameters where the action elements may be defined by the data type: LogisticsTaskFolderItemInformationForwardTaskByCopyActionElements, which elements can include ReceiverLogisticsTaskFolderID. ReceiverLogisticsTaskFolderID refers to logistics task folder to which the logistics task may be forwarded. ReceiverLogisticsTaskFolderID may be based on GDT: LogisticsTaskFolderID and Qualifier: Receiver. In some implementations, its Use may involve BO ProductionTask, where Logistics task of the type Production Task may not be forwarded to other logistics task folders and BO SiteLogisticsTask, where Logistics tasks of the type Site Logistic Task may be forwarded to other logistics task folders if: 1) a resource of the type Resource Group has been assigned to the sending logistics task folder via the assignment criteria 2) A resource has been assigned to the receiving logistics task folder via the assignment criteria that belongs to the resource group that is assigned to the sending logistics task folder, and 3) No processor has been defined for the logistics task The ForwardTaskByMove action may forward a logistics task to another logistics task folder and can delete the logistics task from the current logistics task folder. ForwardTaskByMove action may have the following attributes: 1) Changes to the object, where the item may be deleted from the logistics task folder. 2) Changes to other objects, where a new item may be created in the receiving logistics task folder. 3) Parameters where the action elements may be defined by the data type: LogisticsTaskFolderItemInformationForwardTaskByMoveActionElements, which elements may include ReceiverLogisticsTaskFolderID. ReceiverLogisticsTaskFolderID refers to logistics task folder to which the logistics task is forwarded. ReceiverLogisticsTaskFolderID may be based on GDT: LogisticsTaskFolderID and Qualifier: Receiver. Use may involve BO ProductionTask, that is, logistics task of the type Production Task may not be forwarded to other logistics task folders and BO SiteLogisticsTask. That is, in some implementations, logistics tasks of the type Site Logistic Task may be forwarded to other logistics task folders if: 1) a resource of the type Resource Group has been assigned to the sending logistics task folder via the assignment criteria 2) a resource has been assigned to the receiving logistics task folder via the assignment criteria that belongs to the resource group that is assigned to the sending logistics task folder and 3) no processor has been defined for the logistics task.

Summary (Transformation Node)

Summary (Transformation Node) is an overview of the number of registrations and assigned logistics tasks. The elements located directly at the node Information can be defined by the type NDT: LogisticsTaskFolderSummaryElements. These elements can include ActiveResponsibleRegistrationNumberValue, ActiveInterestedRegistrationNumberValue, ResponsibilityAssignedIndicator and LogisticsTaskNumberValue.

ActiveResponsibleRegistrationNumberValue may refer to the number of active registrations with role 'Responsible'. In other words, the sum of instances of the node Registration with RegistrantRoleCode 'Responsible'. ActiveResponsibleRegistrationNumberValue may be based on GDT: NumberValue and Qualifier: Registration. ActiveInterestedRegistrationNumberValue may refer to the number of active registrations with role 'Interested', or the sum of instances of the node Registration with RegistrantRoleCode 'Interested'. ActiveInterestedRegistrationNumberValue may be based on GDT: NumberValue and Qualifier: Registration. ResponsibilityAssignedIndicator is an indicator that can show whether a Responsibility is assigned to the logistics task folder. ResponsibilityAssignedIndicator may be based on GDT: Indicator and Qualifier: Assigned. LogisticsTaskNumberValue may refer to the number of logistics task in the logistics task folder. Also, the sum of instances of the node Item. LogisticsTaskNumberValue may be based on (GDT: NumberValue and Qualifier: LogisticsTask. DO: AccessControlList is an AccessControlList that is a list of access groups that have access to a LogisticsTaskFolder.

Business Object PhysicalInventoryCount

FIG. 232-1 through 232-10 illustrates an example PhysicalInventoryCount business object model 232000. Specifically, this model depicts interactions among various hierarchical components of the PhysicalInventoryCount, as well as external components that interact with the PhysicalInventoryCount (shown here as 232000 through 232020 and 232024 through 232066).

PhysicalInventoryCount can be an instruction on how to execute a physical inventory of materials and packages and its approval. A PhysicalInventoryCount also may contain the results of the physical inventory and any differences between this physical inventory and the book inventory. The business object PhysicalInventoryCount can be part of the process component Physical Inventory Processing in the Logical Deployment Unit Logistics Execution (LEX). PhysicalInventoryCount can contain the following information: Information on the physical inventory count as a whole (PhysicalInventoryCount), information on the inventory counting method and a list of book inventory, counted inventory, and the approval inventory (Operation). PhysicalInventoryCount can be represented by the root node PhysicalInventoryCount.

The Service Interface Processing Product And Resource Valuation Out (i.e., A2A) or PhysicalInventoryProcessing-ProductAndResourceValuationOut can be part of the Process Integrations Model: Physical Inventory Processing_Financial Accounting Master Data Management [to be modelled].

The Service Interface Processing Product And Resource Valuation Out can contain the operation that request the product valuation information.

The operation Request Product Valuation (i.e., PhysicalInventoryProcessingProductAndResourceValuationOut.RequestProductValuation) can send a product valuation request to FinancialAccountingMasterDataManagement and retrieve a synchronic response. The operation can be based on messages type ProductAndResourceValuationQuery and ProductAndResourceValuationResponse. (i.e., The message is derived from business object MaterialValuationData).

PhysicalInventoryCount 232068 can be the preparation for a physical inventory count, the counting of the inventory, and the approval of the count result. It contains the results of the physical inventory and any differences between this physical inventory and the book inventory. The elements located at the node PhysicalInventoryCount can be defined by the data type: PhysicalInventoryCountElements. In certain implementations, these elements may include: ID, UUID, SystemAdministrativeData, FunctionalUnitUUID, SiteUUID, SiteID, Status. ID can be an identifier, which may be unique, of a PhysicalInventoryCount that can be used in the User Interface. ID may be based on GDT BusinessTransactionDocumentID. UUID can be a universal identifier, which may be unique, of a PhysicalInventoryCount for referencing purposes. UUID may be based on GDT UUID. SystemAdministrativeData can be administrative data that can be stored in a system. This data includes system users and change dates/times. SystemAdministrativeData may be based on GDT SystemAdministrativeData. FunctionalUnitUUID can be a universal identifier, which may be unique, of a Functional Unit of the specific functional unit in which the count may be executed. FunctionalUnitUUID may be based on GDT UUID. SiteUUID can be a universal identifier, which may be unique, of a Site which can be assigned in order to reference the specific Site in which the count may be executed. SiteUUID may be based on GDT UUID. SiteID can be an identifier, which may be unique, of a Site which can be assigned in order to reference the specific Site in which the count may be executed. SiteID may be based on GDT LocationID. Status can be the current step in the life cycle of the PhysicalInventoryCount. ProcessingStatus can be a basic representation of the process steps of a PhysicalInventoryCount from its creation, through its execution, and finally to its closing. ProcessingStatus may be based on GDT ProcessingStatus. Operation 232070 may have a cardinality of 1:cn. Description may have a cardinality of 1:cn. BusinessProcessVariantType 232102 may have a cardinality of 1:c. DO: AccessControlList may have a cardinality of 1:1.

There may be a number of inbound aggregation relationships. From the Identity/Root business object (or node) to the CreationIdentity business object (or node) there may be a cardinality relationship of 1:cn. CreationIdentity can denotes the user that created the document. From the Identity/Root business object (or node) to the LastChangeIdentity business object (or node) there may be a cardinality relationship of c:cn. LastChangeIdentity can denote the user that last changed the document. From the FunctionalUnit/Root business object (or node) to the FunctionalUnit business object (or node) there may be a cardinality relationship of 1:cn. A FunctionalUnit can be a functional unit which the count can be executed in. From the Location/Root business object (or node) to the Site business object (or node) there may be a cardinality relationship of 1:cn. Site can be a site which the count can be executed in.

In some implementations, there may be a number of Enterprise Service Infrastructure Actions. For example the PrepareApproval action. PrepareApproval can prepares the approval process for a count that has been finished in a specific location. The precondition may exist such that the OperationActivityInventory can be counted, but not yet been sent for approval. Changes to the object can occur, such that the action can create OperationActivityInventory nodes with ApprovalInventory specialization. Additionally, the action can perform one or more of the following: create an instance of the node Operation with Approve specialization (including its subordinated nodes), creates an OperationActivity 232072 under an existing Operation node with Approve specialization, and add OperationActivityInventory nodes to an existing Operation node with Approve specialization and an existing OperationActivity that has not yet been started. Changes to the status can occur such that the status of the OperationActivityInventory nodes can be changed to "Submitted_To_Approval." The action can be performed from the User Interface for Physical Inventory Counting, or triggered automatically from the action EndCount.

There can be multiple queries performed on the object such as a QueryByElements. The QueryByElements can provide a list of all the PhysicalInventoryCounts which satisfy the selection criteria specified by the query elements. If no selection criteria can be specified, the query can retrieve a list of all the PhysicalInventoryCounts. The query elements can be defined by the data type PhysicalInventoryCountElementsQueryElements These elements can include ID, of type GDT; CreationDateTime, which can be the date and time that the PhysicalInventoryCount was created, it can be derived from the SystemAdministrativeData element, of type GDT; CreationBusinessPartnerCommonPersonNameGivenName, of type GDT; CreationBusinessPartnerCommonPersonNameFamilyName, of type GDT; LastChangeDateTime, of type GDT; LastChangeBusinessPartnerCommonPersonNameGivenName, of type GDT; LastChangeBusinessPartnerCommonPersonNameFamilyName, of type GDT; PhysicalInventoryCountProcessingStatus, The step in the life cycle of the PhysicalInventoryCount, of type GDT; OperationActivityResourceUUID, of type GDT; OperationActivityResourceID, GDT; OperationActivityInventoryItemProductUUID, a universally unique identifier of a product that was counted. It can be derived from the node element InventorySeparatingValues; OperationActivityInventoryItemProductID, of type GDT; OperationActivityInventoryLogisticPackageLogisticUnitUUID, of type GDT; OperationActivityInventoryLogisticPackageLogisticUnitID, of type GDT; OperationActivityInventoryLogisticPackageIdentifiedLogisticUnitUUID, of type GDT; OperationActivityInventoryLogisticPackageIdentifiedLogisticUnitID, of type GDT; OperationActivityInventoryLogisticsAreaID, of type GDT; OperationActivityInventoryLogisticsAreaUUID, of type GDT; SiteUUID, of type GDT; SiteID, of type GDT.

Operation can be a self-contained part of the physical inventory count process that can be carried out by one or more resources. An Operation can be distinguished by the count type and any count restrictions that may be applied to it. The Operation may exist in the following complete, nondisjoint specializations: Count 232080 (e.g., Reports the existing stock in a specified location), Approve 232082 (e.g., Approves the count that was carried out on a specified location). The elements located at the node Operation can be defined by the data type: PhysicalInventoryCountOperationElements. In certain implementations, these elements may include: ID, UUID, TypeCode, PhysicalInventoryCountScopeCode, PhysicalInventoryCountDetailLevelCode, PhysicalInventoryCountInventoryItemDetailVisibilityCode, CountRepeatedIndicator, Status, and ProcessingStatus. ID can be an identifier, which may be unique of the Operation that can be used in the User Interface. ID may be based on GDT OperationID. UUID can be a universal identifier, which may be unique, of an Operation for referencing purposes. UUID may be based on GDT UUID. TypeCode can be a coded representation of a type of operation to be performed. For example, a count or an approve operation. TypeCode may be based on GDT OperationTypeCode. PhysicalInventoryCountScopeCode can be a coded representation of what is to be counted and may be optional. For example, count location, specific material, specific logistic unit, or specific IdentifiedLogisticUnit. PhysicalInventoryCountScopeCode may be based on GDT PhysicalInventoryCountScopeCode.
PhysicalInventoryCountDetailLevelCode can be a coded representation of the level of detail required for a count and may be optional. For example, material total, material by stock separators, IdentifiedLogisticUnit top level, logistic unit top level, or all detail levels. PhysicalInventoryCountDetailLevelCode may be based on GDT PhysicalInventoryCountDetailLevelCode. PhysicalInventoryCountInventoryItemDetailVisibilityCode can be a coded representation of a count mode that restricts the amount of information that can be provided to the counter during a count execution and may be optional. For example, a counter may be provided with a list of expected items in a location, or a list of both the expected items and their expected quantities in a location. PhysicalInventoryCountInventoryItemDetailVisibilityCode may be based on GDT PhysicalInventoryCountInventoryItemDetailVisibilityCode. CountRepeatedIndicator can indicate whether the count operation can be repeated or not. CountRepeatedIndicator may be based on GDT Indicator and of Qualifier: Repeated. Status can be the current step in the life cycle of the Operation. ProcessingStatus can be a basic representation of the process steps of a PhysicalInventoryCount operation from its creation, through its execution, and finally to its closing. ProcessingStatus may be based on GDT ProcessingStatus. OperationActivity may have a cardinality of 1:cn. The elements CountScopeCode, CountDetailLevelCode, and CountInventoryVisibilityCode can be used when using the Count specialization. These elements may not be enabled when using the Approve specialization. The element CountRepeatedIndicator can be optional when using the Count specialization. The element may not be enabled when using the Approve specialization. The action Finish can be enabled only for operation nodes with the Count specialization.

Another example of an Enterprise Service Infrastructure Action can be to terminate a physical inventory count in an operation before all inventory in all locations is counted. Preconditions may be that The Operation can not be finished. Changes to the object may include that the action can be executed down through all the operation child nodes that were not yet finished. The Inventory node can be the lowest level that the action can be executed on, triggering the CancelCount action. Changes to the status may include that the status of the Operation node can be changed to "Finished." The status of the subordinated OperationActivity nodes which were not yet finished can be changed to "Finished." The status of the subordinated OperationActivityInventory nodes which were not yet finished can be changed to "Cancelled." The action can be performed from the User Interface for Physical Inventory Counting.

OperationActivity can be an action carried out in order to fulfill the operation. This includes the actual duration taken to complete the activity and the processing resource. The elements located directly at the node OperationActivity are defined by the data type: PhysicalInventoryCountOperationActivityElements.
In certain implementations, these elements may include: ID, UUID, ResourceUUID, ResourceID, ResourceTypeCode, PriorityCode, Status, and ProcessingStatus. ID can be an identifier, which may be unique, of the Operation Activity that can be used in the User Interface. ID may be based on GDT OperationActivityID. UUID can be a universal identifier, which may be unique, of the Operation Activity for referencing purposes. UUID may be based on GDT UUID. ResourceUUID can be a universal identifier, which may be unique, of the Resource, which can be assigned in order to reference the specific resource used for the count or count approval and may be optional. ResourceUUID may be based on GDT UUID. ResourceID can be used for the count or count approval and may be optional. ResourceID may be based on GDT ResourceID. ResourceTypeCode can be the coded representation of a type of resource which can be used for the count or count approval and, may be optional. For example, Equipment Resource, or Labour Resource. ResourceTypeCode may be based on GDT ResourceTypeCode. PriorityCode can be the coded representation of the priority of the count with the values low, normal (i.e., default), urgent and may be optional. PriorityCode may be based on GDT PriorityCode. Status can be the current step in the life cycle of the Activity. ProcessingStatus can be a basic representation of the process steps of a PhysicalInventoryCount activity from its creation, through its execution, and finally to its closing. ProcessingStatus may be based on GDT ProcessingStatus. The following composition relationships to subordinate nodes may exist: OperationActivityInventory 232074 may have a cardinality of 1:n, and OperationActivityTextCollection (DO) may have a cardinality of 1:c. The action Finish can be enabled for activity nodes which can be subordinated to operation nodes with a Count specialization. The action EndCountActivity can be enabled for activity nodes which can be subordinated to operation nodes with a Count specialization. The association PhysicalInventoryTask can be enabled only for activity nodes which can be subordinated to operation nodes with a Count specialization. There may be a number of Inbound Aggregation Relationships, including: From the business object LabourResource/node LabourResource, LabourResource may have a cardinality of c:cn which can be a worker performing the count or count approval. From the business object EquipmentResource/node EquipmentResource, EquipmentResource may have a cardinality of c:cn, which can be an equipment resource used in performing the count or count approval. From the business object PhysicalInventoryTask/node referenced object, PhysicalInventoryTask may have a cardinality of 1:c, and be a physical inventory task executing the count activity Another Enterprise Service Infrastructure Action may be CreateTask which can trigger the creation of physical inventory task. The preconditions may exist such that OperationActivity can be created. Changes to other objects may occur such that, this triggers the creation of the physical inventory task. The action can be performed from the User Interface. Furthermore, another action may be Finish which can terminates a physical inventory count in an activity before all inventory in all locations is counted. Precondition may be that the activity may not yet be finished. Changes to the object may include that the action can be executed down through all the activity child nodes that were not yet finished. The Inventory node can be the lowest level that the action can be executed on, triggering the CancelCount action. Changes to the status may be that the status of the Activity node can be changed to "Finished." The status of the subordinated OperationActivityInventory nodes which were not yet finished is changed to "Cancelled. The action can be performed from the User Interface for Physical Inventory Counting. Furthermore, the action EndCountActivity can end a physical inventory count activity after inventory in all locations has been counted. Precondition may be that The OperationActivity may not be completed. Changes to the object may include that the action triggers the actions StartCount and EndCount for all the inventory nodes which can be subordinated to the activity. Changes to other objects may occur such that the action ends the physical inventory task that can be assigned to the activity. The action can be performed from the User Interface for Physical Inventory Counting.

DO: OperationActivityTextCollection can be the Dependent Object TextCollection which can be a natural language text linked to the Activity that can support the counting processing by adding text instruction to the count document. Its structure may be defined in the dependent object TextCollection.

The OperationActivityInventory can be the book inventory, the counted inventory, or the inventory to be approved or determined by an activity in a specific location. The OperationActivityInventory may exist in the following complete and non-disjoint specializations: BookInventory (e.g., Current inventory maintained in the system which can be used for the preparation phase and updated during the count phase), CountedInventory 232084 (e.g., Inventory which is counted in an activity), ApprovalInventory 232086 (e.g., Inventory which is ready for approval after being counted and used for the calculation of a deviation between CountedInventory and ApprovalInventory). For example: A CountedInventory can be 100 pieces of material in a location and the BookInventory can be 94 pieces. Then the ApprovalInventory can be −6 pieces. The manager gets the approval information and can decide whether to approve despite of the difference or to order a recount.

The logistics area in an OperationActivityInventory can be the same as the stock location in Inventory. For example, if stock is located on a bin level, then the OperationActivityInventory can also be defined at a bin level. The location specified in OperationActivityInventory can be identical for all three specializations, Inventory, Counted Inventory, and Approval Inventory. The elements located at the node OperationActivityInventory can be defined by the data type: PhysicalInventoryCountOperationActivityInventoryElements. In certain implementations, these elements may include: UUID, TypeCode, LogisticsAreaUUID, LogisticsAreaID, ResourceUUID, ResourceID, ResourceTypeCode, IdentifiedLogisticUnitUUID, IdentifiedLogisticUnitID, BookInventoryUUID, SystemAdministrativeData, LogisticsLayoutBlockedIndicator, LastCountByIdentityUUID, Status, ApprovalProcessingStatus, and CountLifeCycleStatus. UUID can be a universal identifier, which may be unique, of the OperationActivityInventory for referencing purposes. UUID may be based on GDT UUID. TypeCode can be a coded representation of a type of physical inventory activity. For example, book inventory, counted inventory, or approval inventory. TypeCode may be based on GDT OperationActivityInventoryTypeCode. LogisticsAreaUUID can be a universal identifier, which may be unique, of the LogisticsArea which can be assigned in order to reference the specific storage area to be counted or approved and may be optional. LogisticsAreaUUID may be based on GDT UUID. LogisticsAreaID can be the LogisticsAreaID in which the stock to be counted or to be approved can be located and may be optional. LogisticsAreaID may be based on GDT LogisticsAreaID. ResourceUUID can be a universal identifier, which may be unique, which can be assigned in order to reference the specific Resource to be counted or approved. ResourceUUID may be based on GDT UUID. ResourceID can be the Resource ID which can be used for the count or count approval and may be optional. ResourceID may be based on GDT ResourceID. ResourceTypeCode can be the coded representation of a type of resource which can be counted or approved and may be optional. For example, Equipment Resource, or Vehicle Resource. ResourceTypeCode may be based on GDT ResourceTypeCode. IdentifiedLogisticUnitUUID can be a universal identifier, which may be unique, of an IdentifiedLogisticUnit which can be assigned in order to reference the specific IdentifiedLogisticUnit in which the stock to be counted or to be approved can be located and may be optional. IdentifiedLogisticUnitUUID may be based on GDT UUID. IdentifiedLogisticUnitID can be a IdentifiedLogisticUnitID in which the stock to be counted or to be approved may be located and it may be optional. IdentifiedLogisticUnitID may be based on GDT IdentifiedLogisticUnitID. BookInventoryUUID can be a universal identifier, which may be unique, which can be assigned in order to reference the corresponding BookInventory from the CountedInventory and may be optional. BookInventoryUUID may be based on GDT UUID. SystemAdministrativeData can be administrative data that can be stored in a system. This data may include system users and change dates/times. SystemAdministrativeData may be based on GDT SystemAdministrativeData.

LogisticsLayoutBlockedIndicator can indicate whether the LogisticsLayout (for example, Logistics Area or Resource) can be blocked during counting for any stock movement. LogisticsLayoutBlockedIndicator may be based on GDT Indicator and of Qualifier: Blocked. LastCountByIdentityUUID can be a universal identifier, which may be unique, of the last counter Identity of the counted location and may be optional. LastCountByIdentityUUID may be based on GDT UUID. Status can be the status of the OperationActivityInventory and may be optional. Status may be based on IDT OperationActivityInventoryStatus. ApprovalProcessingStatus can be a basic representation of the process steps of a PhysicalInventoryCount approval inventory from its creation, through its execution, and finally to its closing and may be optional. ApprovalProcessingStatus may be based on GDT ProcessingStatus and of Qualifier: Approval. CountLifeCycleStatus can be a basic representation of the life cycle of a PhysicalInventoryCount count inventory from its creation, through its execution, submission to approval, and finally to its closing or cancellation and may be optional. CountLifeCycleStatus may be based on GDT PhysicalInventoryCountOperationActivityInventoryLifeCycleStatusCode.

The following composition relationships to subordinate nodes may exist: OperationActivityInventoryItem may have a cardinality of 1:cn, OperationActivityInventoryLogisticPackage 232094 may have a cardinality of 1:cn, and OperationActivityInventoryHierarchyContent 232096 may have a cardinality of 1:cn. There may be a number of Inbound Aggregation Relationships, including: From the business object LogisticsArea/node LogisticsArea LogisticsArea may have a cardinality of c:cn which can be a logistics area (bin, aisle, area, division) in which the stock is located, From the business object IdentifiedLogisticUnit/node IdentifiedLogisticUnit, IdentifiedLogisticUnit may have a cardinality of c:cn, which can be an IdentifiedLogisticUnit which acts as a location in which the stock can be located, From the business object EquipmentResource/node EquipmentResource, EquipmentResource may have a cardinality of c:cn, which can be an equipment resource in which the stock can be located, and From the business object VehicleResource/node VehicleResource, VehicleResource may have a cardinality of c:cn, which can be a vehicle in which the stock is located. There may be a number of Inbound Association Relationships, including: From business object PhysicalInventoryCount/node OperationActivityInventory, BookInventory 232088 may have a cardinality of c:1 and can be the book inventory that corresponds to the counted inventory, From the business object Identity/node Root, LastCountByIdentity may have a cardinality of 1:cn and can denote the user last counted the inventory in the location. The CountedInventory can exist without the BookInventory after the preparation stage, prior to the actual count. After the count execution, instances of OperationActivityInventory with both BookInventory and CountedInventory can exist. The specialization ApprovalInventory can be created after the inventory counting has been completed. In specialization CountedInventory, the BookInventory association can be valid. The BookInventory association can be valid from CountedInventory specialization to BookInventory specialization. One or more of the following inbound aggregations may exist: LogisticsArea, EquipmentResource, and VehicleResource. The actions StartCount and EndCount can be valid for the CountedInventory specialization. The ApprovalProcessingStatus can be valid for the ApprovalInventory specialization. The CountLifeCycleStatus can be valid for the CountedInventory specialization Another Enterprise Service Infrastructure Actions can include StartCount and EndCount. StartCount can start a physical inventory count in a specific location. The precondition may exist such that the OperationActivityInventory can be created, but not yet counted or not yet started to be counted (in process). Changes to the object can occur such that the action creates the subordinated OperationActivityInventoryItem and OperationActivityInventoryLogisticUnit nodes if they haven't been created yet. Changes to the status can occur such that the status of the node OperationActivityInventory can be changed to "In_Process." The action can be performed from the User Interface for Physical Inventory Counting. The EndCount action can end a physical inventory count after inventory in this location has been counted. Precondition may be that the OperationActivityInventory can have started to be counted (in process), but not yet completed. Changes to the object may include that the action creates the equivalent OperationActivityInventory node with a BookInventory specialization, and its subordinated OperationActivityInventoryItem and OperationActivityInventoryLogisticUnit, according to a query from Inventory BO. Changes to other objects may include that the action sets the Last Counted Date in the dependent object StorageControl. Changes to the status may include that the status of the node OperationActivityInventory can be changed to "Finished." The action can be performed from the User Interface for Physical Inventory Counting.

OperationActivityInventoryItem can be an Inventory item in a specific count location, in the context of an operation activity. The Inventory Item can either represent an aggregated quantity of material in a location, or a packaged material located in a specific Logistic Package in a location. The inventory item can be differentiated using stock separators (for example, identified stock or business partners). The OperationActivityInventoryItem node under the ApprovalInventory specialization can also exist when deviations are not found. The elements located at the node OperationActivityInventoryItem can be defined by the data type: PhysicalInventoryCountOperationActivityInventoryItemElements. In certain implementations, these elements may include: UUID, MainInventorySeparatingValues, IdentifiedStockInventorySeparatingValues, SpecialStockInventorySeparatingValues, LogisticPackageUUID, ApprovalInventoryItemUUID, RecountInducingApprovalInventoryItemUUID, InventoryItemNumberValue, RecountCounterValue, DeviationReasonCode, Status, CountApprovalStatus, ApprovalResultStatus, and SystemAdministrativeData.

UUID can be a universal identifier, which may be unique, for an OperationActivityInventoryItem for referencing purposes. UUID may be based on GDT UUID. MainInventorySeparatingValues can be the values of stock-separating attributes that can be used for inventory posting. Inventory-separating attributes can be criteria that can be used to differentiate one inventory from other inventories (for example, material, owner, or supply planning area). MainInventorySeparatingValues may be based on GDT MainInventorySeparatingValues. IdentifiedStockInventorySeparatingValues can be values of selected IdentifiedStock attributes that can separate Inventory and may be optional. IdentifiedStockInventorySeparatingValues may be based on GDT IdentifiedStockInventorySeparatingValues. SpecialStockInventorySeparatingValues can be the values of stock-separating attributes that separate special stock and may be optional. Special Stock can be materials that can be managed separately from usual stock for reasons of logistics processes. (for example, material inspection). SpecialStockInventorySeparatingValues may be based on GDT SpecialStockInventorySeparatingValues. LogisticPackageUUID can be a universal identifier, which may be unique, of the LogisticPackage, which can be assigned in order to reference the logistic package used for the material and can be optional. LogisticPackageUUID may be based on GDT UUID. ApprovalInventoryItemUUID can be a universal identifier, which may be unique, of the ApprovalInventoryItem that can correspond to a CountedInventoryItem and may be optional. Note that one ApprovalInventoryItem may correspond to many CountInventoryItems, in order to support parallel count at the same location at the same time. ApprovalInventoryItemUUID may be based on GDT UUID. RecountInducingApprovalInventoryItemUUID can be a universal identifier, which may be unique, of the recounted Inventory Item based on a previous rejection documented by an approval inventoryItem, that induced a recount of the inventory item. RecountInducingApprovalInventoryItemUUID may be based on GDT UUID. InventoryItemNumberValue can be the number of inventory items in a location and may be optional. InventoryItemNumberValue may be based on GDT NumberValue, Qualifier: InventoryItem. RecountCounterValue can be the counter for repeated counts of an inventory item in a location and may be optional. RecountCounterValue may be based on GDT CounterValue, Qualifier: Recount. DeviationReasonCode can be the coded representation of the reason for the deviation between BookInventoryItem and CountedInventoryItem in the context of an OperationActivityInventoryItem and can be optional. DeviationReasonCode may be based on GDT LogisticsDeviationReasonCode. Status can be the current step in the life cycle of OperationActivityInventoryItem and may be optional. Status may be based on IDT OperationActivityInventoryItemStatus. CountApprovalStatus can be a coded representation of an approval status and may be optional. CountApprovalStatus may be based on GDT ApprovalStatus and of Qualifier: Count. ApprovalResultStatus can be a basic representation of the actions that can be executed during the count approval, for example, recount or post deviations and may be optional. ApprovalResultStatus may be based on GDT PhysicalInventoryCountApprovalResultStatusCode. SystemAdministrativeData can be administrative data that can be stored in a system. This data can include system users and change dates/times in the context of operationActivityInventoryItem. SystemAdministrativeData may be based on GDT SystemAdministrativeData. The following composition relationships to subordinate nodes may exist: OperationActivityInventoryItemQuantity 232078 may have a cardinality of 1:n and OperationActivityInventoryItemTextCollection may have a cardinality of 1:c. There may be a number of Inbound Aggregation Relationships, including: From the business object Product/node Material, Material may have a cardinality of 1:cn, and can be the material in the OperationActivityInventoryItem.

From the business object IdentifiedStock/node IdentifiedStock, IdentifiedStock may have a cardinality of c:cn, and can be the IdentifiedStock of material in the OperationActivityInventoryItem. From the business object BusinessPartner/node BusinessPartner, Business Partner may have a cardinality of 1:cn, and can be the owner of the inventory item. From the business object SupplyPlanningArea/node SupplyPlanningArea, SupplyPlanningArea may have a cardinality of 1:cn, and can be the SupplyPlanningArea of the inventory item. From the business object SiteLogisticsLot/node SiteLogisticsLot, SiteLogisticsLot may have a cardinality of c:cn, the SiteLogisticsLot of the inventory item. From the business object OutboundDelivery/node OutboundDeliveryItem, OutboundDeliveryItem may have a cardinality of c:cn, and can be the OutboundDelivery document item of the inventory item. From the business object MaterialInspection/node MaterialInspection, MaterialInspection may have a cardinality of c:cn and can be the MaterialInspection document of the inventory item. All of the above relationships can be used to represent stock separators for the inventory items. There may be a number of Inbound Association Relationships, including: From business object PhysicalInventoryCount/node OperationActivityInventoryLogisticPackage, OperationActivityInventoryLogisticPackage may have a cardinality of c:cn and can be the logistic package that contains the material From business object PhysicalInventoryCount/node OperationActivityInventoryItem, ApprovalCountedInventoryItem may have a cardinality of c:cn, and can be the approval of the inventory item. InventoryItemRecountReference may have a cardinality of c:cn, and in the case of a recount, this can be the count Approval that may have of triggered the recount. From the business object Identity/node Root, CreationIdentity may have a cardinality of 1:cn, and can denote the user that created the InventoryItem, LastChangeIdentity may have a cardinality of c:cn and can denote the user that last changed the InventoryItem. Associations for Navigation may exist such that To OperationActivityInventoryItemQuantity, DefaultCountMaterialQuantity may have a cardinality of 1:1, which can retrieve the default material quantity. The OperationActivityInventoryItem can exist for an Operation having a Count specialization. The OperationActivityInventoryItem under the ApprovalInventory specialization can exist when the equivalent OperationActivityInventoryItem exists at least once under CountedInventory or BookInventory specialization in the same location (that is, the location in ApprovalInventory specialization can be identical to the one in CountedInventory or BookInventory specialization). If an IdentifiedStock can be associated, the Material and the IdentifiedStock can match (that is, the IdentifiedStock can belong to the material). The association ApprovalCountedInventoryItem can be valid from inventory item under the CountedInventory specialization, to inventory item under the ApprovalInventory specialization. The InventoryItemRecountReference association can be valid from inventory item under either the CountedInventory or the ApprovalInventory specializations, to inventory item under the ApprovalInventory specialization. Enterprise Service Infrastructure Actions may include ApproveCount, RejectCount, RequestRecount, PostDeviations, CreateLogisticPackage, RemoveLogisticPackage, and AssignLogisticPackage. ApproveCount can approve a physical inventory count result. The precondition may exist such that the OperationActivityInventoryItem can be counted, but not yet been approved, rejected, posted, or requested for recount. Changes to the status can occur such that the status of the node OperationActivityInventoryItem can be changed to "Approved." The action can be performed from the User Interface for Physical Inventory Counting. The RejectCount action can rejects a specific physical inventory count result. Precondition may be that the OperationActivityInventoryItem can be counted, but not yet been approved, rejected, posted, or requested for recount. Changes to the status may include that the status of the node OperationActivityInventoryItem can be changed to "Rejected." The action can be performed by the User on the User Interface for a Physical Inventory Count. RequestRecount action can request an additional count of the inventory item. Precondition may be that the OperationActivityInventoryItem can be counted, but not yet been approved, rejected, posted, or requested for recount. Changes to the object may include that The action performs one of the following: create an instance of the node Operation (including its subordinated nodes) and sets the CountRepeatIndicator in the Operation node, create an OperationActivity under an existing Operation node having CountRepeatIndicator set on and elements identical to the action's parameters, add an OperationActivityInventory to an existing Operation node having the same required parameters, and to an existing OperationActivity node that hasn't been started yet. Additionally, the action maintains the association InventoryItemRecountReference and updates the element RecountCounterValue in the OperationActivityInventoryItem node. Changes to the status may be that the status of the node OperationActivityInventoryItem can be changed to "Recount." The action can be performed from the User Interface for a Physical Inventory Count. PostDeviations action can post the differences (deviation) between the Book inventory and the counted inventory results. Precondition may be that the OperationActivityInventoryItem can be counted, but not yet been approved, rejected, posted, or requested for recount. Changes to other objects may include that the action creates an instance of the business object GoodsAndActivityConfirmation. Changes to the status may include that the status of the node OperationActivityInventoryItem can be changed to "posted." The action can be performed from the User Interface for a Physical Inventory Count. CreateLogisticPackage action can create a LogisticPackage for a counted InventoryItem. The parameters may be that the action elements can be defined by the data type: PhysicalInventoryCountCreateLogisticPackageActionElements. These elements can include LogisticUnitID, a unique identifier of a LogisticUnit that can be assigned to the InventoryItem, of type GDT; CountedQuantity, a Quantity of the LogisticUnit, of type GDT; QuantityTypeCode, and Quantity Type Code of the LogisticUnit, of type GDT. The action can be performed from the User Interface for a Physical Inventory Count. The RemoveLogisticPackage action can remove a LogisticPackage from an InventoryItem. The inventory item stays unpacked. The action can be performed from the User Interface for a Physical Inventory Count. The action AssignLogisticPackage can add an inventoryItem to an existing LogisticPackage. The action elements can be defined by the data type: PhysicalInventoryCountAssignLogisticPackageActionElements. These elements can include LogisticUnitID, a unique identifier of a LogisticUnit that can be assigned to the InventoryItem, of type GDT; LogisticUnitUUID, a universally Unique identifier of a LogisticUnit that can be assigned to the InventoryItem and of type GDT; CountedQuantity, a quantity of the LogisticUnit and of type GDT; QuantityTypeCode, Quantity Type Code of the LogisticUnit and of type GDT. The action can be performed from the User Interface for a Physical Inventory Count.

There may be multiple queries that can be performed, such as QueryByInventoryItem. QueryByInventoryItem query can provide a list of all the InventoryItems which may be under the ApprovalInventory specialization, or InventoryItems which can be under the CountedInventory specialization with statuses "Not started" or "In process," that satisfy the selection criteria specified by the query elements. The query elements can be defined by the data type PhysicalInventoryCountOperationActivityInventoryItemElementsQueryElements. These elements can include, of type GDT, PhysicalInventoryCountID; PhysicalInventoryCountOperationActivityInventoryLogisticsAreaUUID; PhysicalInventoryCountOperationActivityInventoryLogisticsAreaID; OperationType; MainInventorySeparatingValues IdentifiedStockInventorySeparatingValues; SpecialStockInventorySeparatingValues; InventoryItemApprovalQuantity; InventoryItemApprovalQuantityTypeCode; CountApprovalStatus; ApprovalResultStatus; PhysicalInventoryCountSiteID; and PhysicalInventoryCountSiteUUID.

DO: OperationActivityInventoryItemTextCollection can be a natural language text linked to the InventoryItem enabling the counter to add text remarks to the count document. Its structure can be defined in the dependent object TextCollection, OperationActivityInventoryItemQuantity can be the inventory item quantity reported booked or approved during physical inventory process. The inventory quantity can enable the count to be in different units of measure simultaneously for the same material. Cheese, for example, can be counted as the unit of measure piece of cheese or whole cheese or can be counted in the unit of measure kilogram. The elements located directly at the node OperationActivityInventoryItemQuantity can be defined by the data type: PhysicalInventoryCountOperationActivityInventoryItemQuantityElements. In certain implementations, these may include the following elements: CountedQuantity, CountedQuantityTypeCode, BookInventoryQuantity, BookInventoryQuantityTypeCode, ApprovalQuantity, ApprovalQuantityTypeCode, ApprovalDiscrepancyAmount, and TotalApprovalDiscrepancyAmount.

CountedQuantity can be a quantity of material that may be counted and can be optional. CountedQuantity may be based on GDT Quantity and of Qualifier: Counted. CountedQuantityTypeCode can be a type of material quantity that can be counted, for example gross_weight, net_weight and may be optional. CountedQuantityTypeCode may be based on GDT QuantityTypeCode. BookInventoryQuantity can be a quantity of material that can be registered in the book inventory and can be optional. BookInventoryQuantity may be based on GDT Quantity and of Qualifier: BookInventory. BookInventoryQuantityTypeCode can be a type of material quantity that can be registered in the book inventory, for example gross_weight, net_weight and may be optional. BookInventoryQuantityTypeCode may be based on GDT QuantityTypeCode. ApprovalQuantity can be a quantity of material that is to be approved and may be optional. ApprovalQuantity may be based on GDT Quantity and of Qualifier: Approval. ApprovalQuantityTypeCode can be a type of material quantity that is to be approved, for example gross_weight, net_weight and may be optional. ApprovalQuantityTypeCode may be based on GDT QuantityTypeCode. ApprovalDiscrepancyAmount can be an Amount in which it can be an amount with currency code and may be optional. The approval discrepancy amount can be the difference between the counted amount to the booked amount of one counted unit of an inventory item. ApprovalDiscrepancyAmount may be based on GDT Amount and of Qualifier: Discrepancy. TotalApprovalDiscrepancyAmount can be the approval discrepancy amount and can be the difference between the counted amount to the booked amount of the entire counted quantity of an inventory item. TotalApprovalDiscrepancyAmount may be based on GDT Amount and of Qualifier: Discrepancy.

OperationActivityInventoryLogisticPackage can be the information about the logistic package in a specific count location. The OperationActivityInventoryLogisticPackage may exist in the following complete and disjoint specializations: IdentifiedLogisticUnit (e.g., the IdentifiedLogisticUnit in a specific count location), LogisticUnit (e.g., the logistic unit in a specific count location). The OperationActivityInventoryLogisticPackage node of the ApprovalInventory specialization can exists also when deviations are not found. The elements located at the node OperationActivityInventoryLogisticPackage can be defined by the data type: PhysicalInventoryCountOperationActivityInventoryLogisticPackageElements. In certain implementations, these elements can include: UUID, TypeCode, ParentIdentifiedLogisticUnitUUID, LogisticUnitUUID, LogisticUnitID, IdentifiedLogisticUnitUUID, IdentifiedLogisticUnitID, CountedQuantity, BookInventoryQuantity, ApprovalQuantity, ApprovalQuantityTypeCode, BookInventoryQuantityTypeCode, CountedQuantityTypeCode, Status, CountApprovalStatus, ApprovalResultStatus, SystemAdministrativeData, ApprovalLogisticPackageUUID, RecountInducingApprovalLogisticPackageUUID, RecountCounterValue, LogisticPackageNumberValue, and DeviationReasonCode. UUID can be a universal identifier, which may be unique, of Operation Activity Inventory Logistic Package for referencing purposes. UUID may be based on GDT UUID. TypeCode can be a coded representation of the type of logistic package. For example, Logistic Unit or IdentifiedLogisticUnit. TypeCode may be based on GDT LogisticPackageTypeCode. ParentIdentifiedLogisticUnitUUID can be a universal identifier, which may be unique, of a ParentIdentifiedLogisticUnit, which can be assigned in order to reference corresponding IdentifiedLogisticUnit in which the logistic package can be placed and may be optional. ParentIdentifiedLogisticUnitUUID may be based on GDT UUID. LogisticUnitUUID can be a universal identifier, which may be unique, of the logistic unit, which can be assigned in order to reference the corresponding logistic unit to the logistic package and may be optional. LogisticUnitUUID may be based on GDT UUID. LogisticUnitID can be a logistic unit ID which corresponding logistic unit to the logistic package and may be optional. LogisticUnitID may be based on GDT LogisticUnitID. IdentifiedLogisticUnitUUID can be a universal identifier, which may be unique, of the IdentifiedLogisticUnit, which can be assigned in order to reference the corresponding IdentifiedLogisticUnit to the logistic package and may be optional. IdentifiedLogisticUnitUUID may be based on GDT UUID. IdentifiedLogisticUnitID can be an IdentifiedLogisticUnit ID as to which corresponding IdentifiedLogisticUnit to the logistic package and may be optional. IdentifiedLogisticUnitID may be based on GDT IdentifiedLogisticUnitID. CountedQuantity can be a quantity of logistic packages that can be counted and may be optional. CountedQuantity may be based on GDT Quantity. BookInventoryQuantity can be a quantity of logistic packages that can be registered in the book inventory and may be optional. BookInventoryQuantity may be based on GDT Quantity. ApprovalQuantity can be a quantity of logistic packages that is to be approved and may be optional. ApprovalQuantity may be based on GDT Quantity. ApprovalQuantityTypeCode can be a type of logistic package quantity that is to be approved and may be optional. ApprovalQuantityTypeCode may be based on GDT QuantityTypeCode. BookInventoryQuantityTypeCode can be a type of logistic package quantity that can be registered in the book inventory and may be optional. BookInventoryQuantityTypeCode may be based on GDT QuantityTypeCode.

CountedQuantityTypeCode can be a type of logistic package quantity that is counted and may be optional. CountedQuantityTypeCode may be based on GDT QuantityTypeCode. Status can be the current step in the life cycle of OperationActivityInventoryLogisticPackage and may be optional. Status may be based on IDT OperationActivityInventoryLogisticPackageStatus 232090. CountApprovalStatus can be a coded representation of an approval status and may be optional. CountApprovalStatus may be based on GDT ApprovalStatus and of Qualifier: Count. ApprovalResultStatus can be a basic representation of the actions that can be executed during the count approval, for example, re-count or post deviations and may be optional. ApprovalResultStatus may be based on GDT PhysicalInventoryCountApprovalResultStatusCode. SystemAdministrativeData can be administrative data that can be stored in a system. This data can include system users and change dates/times in the context of operationActivityInventoryLogisticPackage. SystemAdministrativeData may be based on GDT SystemAdministrativeData. ApprovalLogisticPackageUUID can be a universal identifier, which may be unique, of the ApprovalLogisticPackage that corresponds to the Approval LogisticPackage of the Counted LogisticPackage and may be optional. Note that one ApprovalLogisticPackage may correspond to many CountInventoryItems, in order to support parallel count at the same location at the same time. ApprovalLogisticPackageUUID may be based on GDT UUID. RecountInducingApprovalLogisticPackageUUID can be a universal identifier, which may be unique, of the recounted LogisticPackage based on a previous rejection documented by an approval LogisticPackage, that induced a recount of the LogisticPackage and may be optional. RecountInducingApprovalLogisticPackageUUID may be based on GDT UUID. RecountCounterValue specifies the number of repeated counts for a LogisticPackage in a location and may be optional. RecountCounterValue may be based on GDT CounterValue and of Qualifier: Recount. LogisticPackageNumberValue specifies the number of logistic packages in a location and may be optional. LogisticPackageNumberValue may be based on GDT NumberValue and of Qualifier: LogisticPackage. DeviationReasonCode can be the coded representation of the reason for the deviation and may be optional. DeviationReasonCode may be based on GDT LogisticsDeviationReasonCode. The following composition relationships to subordinate nodes exist: OperationActivityInventoryLogisticPackageTextCollection may have a cardinality of 1:c.

There may be a number of Inbound Aggregation Relationships, including: From the business object IdentifiedLogisticUnit/node IdentifiedLogisticUnit, IdentifiedLogisticUnit 232092 may have a cardinality of c:cn and can be the IdentifiedLogisticUnit of the OperationActivityInventoryLogisticPackage. From the business object LogisticUnit/node LogisticUnit, LogisticUnit 232098 may have a cardinality of c:cn and can be the logistic unit of the OperationActivityInventoryLogisticPackage. There may be a number of Inbound Association Relationships, including: From business object PhysicalInventoryCount/node OperationActivityInventoryLogisticPackage, ApprovalCountedLogisticPackage may have a cardinality of c:cn and can be the approval of the LogisticPackage. LogisticPackageRecountReference may have a cardinality of c:cn and in the case of a recount, this can be the specific count approval that triggered the recount. From the business object Identity/node Root, CreationIdentity may have a cardinality of 1:cn and can denote the user that created the LogisticPackage. LastChangeIdentity may have a cardinality of c:cn and can denote the user that last changed the LogisticPackage. There may be one or more Associations For Navigation including, to business object PhysicalInventoryCount/node OperationActivityInventoryLogisticPackage, InnerIdentifiedLogisticUnit may have a cardinality of c:cn and can be the IdentifiedLogisticUnit contained within an IdentifiedLogisticUnit; InnerLogisticUnit may have a cardinality of c:cn and can be the logistic unit contained within an IdentifiedLogisticUnit.

To business object PhysicalInventoryCount/node OperationActivityInventoryItem, InventoryItem may have a cardinality of c:cn and can be the Inventory items within an IdentifiedLogisticUnit. The OperationActivityInventoryLogisticPackage under the ApprovalInventory specialization can exist when the OperationActivityInventoryLogisticPackage under CountedInventory or BookInventory specializations exists at least once in the same specific location (that is, the location in ApprovalInventory association can be identical to the one in CountedInventory or BookInventory specializations). If the Operation scope code is IdentifiedLogisticUnitCount, the subordinate OperationActivityInventoryLogisticPackage can exist with an IdentifiedLogisticUnit specialization. If the Operation scope code is LogisticUnitCount, the subordinate OperationActivityInventoryLogisticPackage can exist, LogisticUnit specialization. The IdentifiedLogisticUnit aggregation may be valid for IdentifiedLogisticUnit specialization. The LogisticUnit aggregation may be valid for LogisticUnit specialization. The InnerIdentifiedLogisticUnit association can be from the IdentifiedLogisticUnit specialization to the IdentifiedLogisticUnit specialization. The InnerLogisticUnit association can be from the IdentifiedLogisticUnit specialization to the LogisticUnit specialization. The association ApprovalCountedLogisticPackage can be valid from LogisticPackage under the CountedInventory specialization, to LogisticPackage under the ApprovalInventory specialization. The LogisticPackageRecountReference association can be valid from LogisticPackage under either the CountedInventory or the ApprovalInventory specializations, to LogisticPackage under the ApprovalInventory specialization.

OperationActivityInventoryLogisticPackage can have multiple Enterprise Service Infrastructure Actions such as ApproveCount, RejectCount, RequestRecount, and PostDeviations. ApproveCount can approve a physical inventory count result. Precondition may be that the OperationActivityLogisticPackage can be counted, but not yet been approved, rejected, posted, or requested for recount. Changes to the status may include that the status of the node OperationActivityLogisticPackage can be changed to “Approved.” The action can be performed from the User Interface for a Physical Inventory Count. RejectCount action can reject a specific physical inventory count result. Precondition may be that the OperationActivityLogisticPackage can be counted, but not yet been approved, rejected, posted, or requested for recount. Changes to the status may include that the status of the node OperationActivityLogisticPackage can be changed to “Rejected.” The action can be performed from the User Interface for a Physical Inventory Count. The RequestRecount action can request an additional count of the logistic package. The precondition may be that the OperationActivityLogisticPackage can be counted, but not yet been approved, rejected, posted, or requested for recount. Changes to the object may occur such that the action performs one of the following: create an instance of the node Operation (including its subordinated nodes) and sets the CountRepeatIndicator in the Operation node, create an OperationActivity under an existing Operation node having the same required parameters, adds an OperationActivityInventory to an existing Operation node having the same required parameters, and to an existing OperationActivity node that hasn’t been started yet. Additionally, the action can maintain the association LogisticPackageRecountReference and can update the element RecountCounterValue in the OperationActivityInventoryLogisticPackage node. Changes to the status may include that the status of the node OperationActivityLogisticPackage can be changed to “Recount.” The action can be performed from the User Interface for a Physical Inventory Count. PostDeviations action can post the differences (deviation) between the Book inventory and the counted inventory results. Precondition may be that the OperationActivityLogisticPackage can be counted, but not yet been approved, rejected, posted, or requested for recount. Changes to other objects can occur such that the action can create an instance of the business object GoodsAndActivityConfirmation. Changes to the status may include that the status of the node OperationActivityLogisticPackage can be changed to “posted.” The action can be performed from the User Interface for a Physical Inventory Count. DO: OperationActivityInventoryLogisticPackageTextCollection can be the Dependent Object TextCollection which can be a natural language text linked to the LogisticPackage enabling the counter add text remarks to the count document. Its structure may be defined in the dependent object TextCollection. OperationActivityInventoryContentHierarchy (Transformation Node) can be the content hierarchy counted in a location. The content hierarchy root can be a Logistic Package, in which inventory items can reside. A Logistic Package may contain inventory items, but not vice versa. The elements located at the node OperationActivityInventoryContentHierarchy can be defined by the data type: OperationActivityInventoryContentHierarchyElements. In certain implementations these elements may include: ObjectNodeID, ObjectNodeTypeCode, CountedQuantity, CountedQuantityTypeCode, BookInventoryQuantity, BookInventoryQuantityTypeCode, ApprovalQuantity, and ApprovalQuantityTypeCode. ObjectNodeID can be an identifier, which may be unique, of hierarchy content of node ID. ObjectNodeID may be based on GDT ObjectID. ObjectNodeTypeCode can be a coded representation of the type of Hierarchy content. ObjectNodeTypeCode may be based on GDT ObjectNodeTypeCode. CountedQuantity can be a quantity of the content that can be counted and may be optional. CountedQuantity may be based on GDT Quantity, Qualifier: Counted. CountedQuantityTypeCode can be a type of content that can be counted, for example gross_weight, net_weight and may be optional. CountedQuantityTypeCode may be based on GDT QuantityTypeCode. BookInventoryQuantity can be a quantity of content that can be registered in the book inventory and may be optional. BookInventoryQuantity may be based on GDT Quantity and of Qualifier: BookInventory. BookInventoryQuantityTypeCode can be a type of content that can be registered in the book inventory, for example gross_weight, net_weight and may be optional. BookInventoryQuantityTypeCode may be based on GDT QuantityTypeCode. ApprovalQuantity can be a quantity of content that is to be approved and may be optional. ApprovalQuantity may be based on GDT Quantity and of Qualifier: Approval. ApprovalQuantityTypeCode can be a type of content that is to be approved, for example gross_weight, net_weight and may be optional. ApprovalQuantityTypeCode may be based on GDT QuantityTypeCode. One or more Associations For Navigation may exist, for example, to business object PhysicalInventoryCount/node OperationActivityInventoryLogisticPackage, LogisticPackageDetails may have a cardinality of 1:c and can be the Logistic Package information, LogisticsUnitDetails may have a cardinality of 1:c, and can be the Logistics Unit information, and IdentifiedLogisticsUnitDetails may have a cardinality of 1:c and can be the Identified Logistics Unit information. To business object PhysicalInventoryCount/node OperationActivityInventoryItem, InventoryItemDetails may have a cardinality of 1:c and can be the inventory item information. To business object PhysicalInventoryCount/node OperationActivityInventoryHierarchyContent, SubContentHierarchy may have a cardinality of 1:cn and can be a lower hierarchy content level. OperationActivityInventoryLogisticPackageTextCollection can have Enterprise Service Infrastructure Actions such as ApproveCount, RejectCount, RequestRecount, CreateLogisticPackage, RemoveLogisticPackage, and AssignLogisticPackage. ApproveCount can approve a physical inventory count result. The action can be performed from the User Interface for a Physical Inventory Count. RejectCount can reject a specific physical inventory count result. The action is performed from the User Interface for a Physical Inventory Count. The RequestRecount action can request an additional count of counted content. The action can be performed from the User Interface for a Physical Inventory Count. The CreateLogisticPackage can create a LogisticPackage for a counted InventoryItem. The action elements can be defined by the data type: PhysicalInventoryCountCreateLogisticPackageActionElements. These elements may include LogisticUnitID, a unique identifier of a LogisticUnit that can be assigned to the InventoryItem, of type GDT; CountedQuantity, a quantity of the LogisticUnit, of type GDT; QuantityTypeCode, and a quantity Type Code of the LogisticUnit, of type GDT. The action can be performed from the User Interface for a Physical Inventory Count. The RemoveLogisticPackage action can remove a LogisticPackage from an InventoryItem. The action can be performed from the User Interface for a Physical Inventory Count. The AssignLogisticPackage action can add an inventoryItem to an existing LogisticPackage. The action elements can be defined by the data type: PhysicalInventoryCountAssignLogisticPackageActionElements. These elements may include LogisticUnitID, a unique identifier of a LogisticUnit that can be assigned to the InventoryItem, of type GDT; LogisticUnitUUID, a universally Unique identifier of a LogisticUnit that can be assigned to the InventoryItem, of type GDT; CountedQuantity, a quantity of the LogisticUnit, of type GDT; QuantityTypeCode, a Quantity Type Code of the LogisticUnit, of type GDT. The action can be performed from the User Interface for a Physical Inventory Count.

OperationActivityInventoryLogisticPackageTextCollection can have queries performed such as QueryByHierarchyContent which can provide a content which can be under the ApprovalInventory specialization, or content which can be under the CountedInventory specialization with statuses "Not started" or "In process," that satisfy the selection criteria specified by the query elements. The query elements can be defined by the data type PhysicalInventoryCountOperationActivityInventoryHierarchyContentElementsQueryElements. These elements include PhysicalInventoryCountID, of type GDT; PhysicalInventoryCountOperationActivityInventoryLogisticsAreaUUID, of type GDT; PhysicalInventoryCountOperationActivityInventoryLogisticsAreaID; of type GDT; OperationType, of type GDT;

PhysicalInventoryCountOperationActivityInventoryItemMainInventorySeparatingValues, of type GDT; PhysicalInventoryCountOperationActivity InventoryItemIdentifiedStockInventorySeparatingValues, of type GDT; PhysicalInventoryCountOperationActivity InventoryItemSpecialStockInventorySeparatingValues, of type GDT; PhysicalInventoryCountOperationActivityInventoryItemApprovalQuantity, of type GDT; PhysicalInventoryCountOperationActivityInventoryItemApprovalQuantityTypeCode, of type GDT; PhysicalInventoryCountOperationActivityInventoryItemCountApprovalStatus, of type GDT; PhysicalInventoryCountOperationActivityInventoryItemApprovalResultStatus, of type GDT; PhysicalInventoryCountSiteID, of type GDT; and PhysicalInventoryCountSiteUUID, of type GDT. Description 232100 can be a language-dependent textual description of a Physical Inventory Count. The elements located at the node Description can be defined by the data type: PhysicalInventoryCountDescriptionElements. In certain implementations, these elements may include: PhysicalInventoryCountDescription. PhysicalInventoryCountDescription can be a language dependent description of the Physical Inventory Count. PhysicalInventoryCountDescription may be based on GDT MEDIUM_Description and of Qualifier: PhysicalInventoryCount. BusinessProcessVariantType can be a "typical" way of processing within a process component, from a business point of view. The elements located at the node BusinessProcessVariantType can be defined by the data type: PhysicalInventoryCountBusinessProcessVariantTypeElements.

These elements can include: BusinessProcessVariantTypeCode and MainIndicator. BusinessProcessVariantTypeCode may be based on GDT BusinessProcessVariantTypeCode. MainIndicator may be based on GDT Indicator, Qualifier: Main. DO: AccessControlList can be the AccessControlList which can be a list of access groups that have access to an Employment during a validity period. Its structure may be viewed in DO: AccessControlList.

Business Object ProductionRequest

FIGS. 233-1 through 233-2 illustrate an example ProductionRequest business object model 233014. Specifically, this model depicts interactions among various hierarchical components of the ProductionRequest, as well as external components that interact with the ProductionRequest (shown here as 233000 through 233012 and 233016 through 233048).

Business Object ProductionRequest is a request to Production Execution to produce a certain quantity of a specific material by a requested due date that in addition contains confirmed and fulfillment data representing the response from Production Execution. The business object ProductionRequest is part of the process component Production. A ProductionRequest is subdivided into a sequence of ProductionSegments which describes the complete production process of the requested material. The data representing the response from production execution (with respect to the request) is: Confirmation data, explaining what production execution has confirmed, Fulfillment data, explaining what production execution has already fulfilled with respect to the confirmation data. The business object ProductionRequest is represented by the root node ProductionRequest.

The Business Object is involved in the following Process Integration Models: Production Trigger and Response_Production.

The Service Interface Producing In is part of the following Process Integration Models: Production Trigger and Response_Production. The service interface Producing In contains an operation that creates or updates a Production Request.

Maintain Production Request (A2A) maintains (i.e. creates or updates) a Production Request. The operation is based on message type ProductionRequestRequest (Derived from business object ProductionRequest).

The Service Interface Producing Out is part of the following Process Integration Models: Production Trigger and Response_Production. The service interface Producing Out contains operations that provide a response to the creation or update of a Production Request.

Confirm Production Request (A2A) confirms the maintenance of a Production Request and its execution progress. The operation is based on message type ProductionRequestConfirmation (Derived from business object ProductionRequest).

Notify Planning of Production Request Confirmation Reconciliation (A2A) notifies planning system of a reconciliation of a Production Request confirmation. The operation is based on message type ProductionRequestConfirmationReconciliationNotification (derived from the BO ProductionRequest).

Node Structure of Business Object ProductionRequest

ProductionRequest (Root Node) 233050 is a request to produce a certain quantity of a specific material by a requested due date. It contains ProductionSegments that subdivide the entire production process into several sections and that realize at the same time the specifications of the released execution production model. Furthermore it contains identification and administrative information of the request. The released execution production model (BO ReleasedExecutionProductionModel) is a master data reference, which already contains production ProductionSegments describing material inputs, material outputs and operations, that are reflected as main components in the Production Request.

The elements located at the ProductionRequest (Root Node) are defined by the node data type ProductionRequestElements. These elements can include: UUID, ID, BusinessTransactionDocumentReference, FunctionalUnitUUID, ReleasedExecutionProductionModelUUID, ReleasedExecutionProductionModelExplosionDate, SystemAdministrativeData.

UUID is a Universally unique identifier for the ProductionRequest. It is of GDT type UUID. ID is an Identifier for the ProductionRequest. It is of GDT type BusinessTransactionDocumentID. BusinessTransactionDocumentReference is a Reference to the Business Object from which the creation of the ProductionRequest was triggered. It is of GDT type BusinessTransactionDocumentReference. Typically, the referenced Business Object is a ProductionRequisition, located in the process component Production Trigger and Response.

However, other scenarios for the creation of a ProductionRequest are possible, like creation from a Sales Order or Creation by a system user. FunctionalUnitUUID is a Universally unique identifier for the FunctionalUnit that is responsible for the execution of the ProductionSegment. It is of GDT type UUID. ReleasedExecutionProductionModelUUID is a Universally unique identifier for the ReleasedExecutionProductionModel that is requested to be the source of master data for describing the execution process. It is of GDT type UUID. ReleasedExecutionProductionModelExplosionDate is a Date that determines the change state of the ReleasedExecutionProductionModel that shall be exploded for master data retrieval. It is of GDT type Date and, in some implementations, has a Qualifier of Explosion. SystemAdministrativeData is a Administrative data for the ProductionRequest. These data contain system user, date and time of creation and last change of the ProductionRequest. It is of GDT type SystemAdministrativeData.

Status is status information of the ProductionRequest, represented by the aggregated data type ProductionRequestStatus, which contains the following status code elements: ProductionOrderCreationProcessingStatusCode, ProductionProductionOrderListLifecycleStatusCode, CancellationStatusCode, ClosureStatusCode. ProductionOrderCreationProcessingStatusCode is a status of the ProductionOrder creation process. It indicates whether the creation of further ProductionOrders for the ProductionRequest is expected or not and is of GDT type ProcessingStatusCode. ProductionProductionOrderListLifecycleStatusCode is an aggregated lifecycle status of all ProductionOrders that have been created for the ProductionRequest. It is of GDT type LogisticsLifecycleStatusCode. CancellationStatusCode is a cancellation status of the ProductionRequest. It indicates whether the Production Request has been cancelled or not. A cancelled ProductionRequest is not changeable and can be deleted. CancellationStatusCode is of GDT type CancellationStatusCode ClosureStatusCode is a closure status of the ProductionRequest. It indicates whether the ProductionRequest has been closed or not. A closed ProductionRequest is not changeable and can be deleted. ClosureStatusCode is of GDT type ClosureStatusCode There may be a number of composition relationships to subordinate nodes including: BusinessProcessVariantType 233078 may have a cardinality relationship of 1:n. AccessControlList 233080 may have a cardinality relationship of 1:1. ProductionSegment 233052 may have a cardinality relationship of 1:n.

There may be a number of Inbound Aggregation Relationships including: 1) From the business object ProductionRequisition/node root (located in the process component Production Trigger and Response) as follows: ProductionRequisition may have a cardinality relationship of c:1 and denotes the ProductionRequisition from which the creation of the ProductionRequest was triggered.

2) From the business object FunctionalUnit/node Root as follows. FunctionalUnit may have a cardinality relationship of 1:cn and denotes the FunctionalUnit that is responsible for the execution of the Production Request.

3) From the business object ReleasedExecutionProductionModel/node root as follows. ReleasedExecutionProductionModel may have a cardinality relationship of 1:cn and denotes the ReleasedExecutionProductionModel that is requested to be the source of master data for describing the execution process.

4) From the business object Identity/node Root as follows. CreationIdentity may have a cardinality relationship of 1:cn and denotes the Identity of the user that has created the ProductionRequest. LastChangeIdentity may have a cardinality relationship of c:cn and denotes the Identity of the user that has made the most recent change to the ProductionRequest.

There may be a number of Associations for Navigation including: 1) To the business object ProductionRequest/node BusinessProcessVariantType as follows. MainBusinessProcessVariantType may have a cardinality relationship of 1:1.

2) To the business object ProductionRequest/node ProductionSegment as follows. FinalProductionSegment may have a cardinality relationship of 1:1 and denotes the final ProductionSegment of a ProductionRequest, which contains the final material output.

3) To the business object BusinessDocumentFlow/node Root as follows. BusinessDocumentFlow may have a cardinality relationship of 1:c and enables navigation to the BusinessDocumentFlow instance that the Production Request takes part in.

Enterprise Service Infrastructure Actions

The Cancel (S&AM Action) leads to the cancellation of a Production Request. In some implementations, preconditions may include that the creation of Production Orders for the Production Request has not yet started. Changes to the object may include that the complete business object is physically deleted.

QueryByElements provides a list of all ProductionSegments that match the selection criteria. The query elements can include defined by the data type: ProductionRequestQueryElements. These elements can include: ID, BusinessTransactionDocumentReference, FunctionalUnitID, CancellationStatusCode, ClosureStatusCode. ID is of GDT type BusinessTransactionDocumentID. BusinessTransactionDocumentReference is of GDT type BusinessTransactionDocumentReference. FunctionalUnitID is of GDT type OrganisationalCentreID. CancellationStatusCode is of GDT type CancellationStatusCode. ClosureStatusCode is of GDT type ClosureStatusCode.

A BusinessProcessVariantType defines the character of a business process variant of the ProductionRequest. It represents a typical way of processing of a ProductionRequest within a process component from a business point of view. A Business Process Variant is a configuration of a Process Component. In some implementations, a Business Process Variant belongs exactly to one process component.

A process component is a software package that realizes a business process and exposes its functionality as services. The functionality contains business transactions. A process component contains one or more semantically related business objects. A business object belongs to exactly one process component.

The elements located at the node BusinessProcessVariantType are defined by the data type: ProductionRequestBusinessProcessVariantTypeElements, derived from BusinessProcessVariantTypeElements (Template). These elements can include: BusinessProcessVariantTypeCode and MainIndicator. BusinessProcessVariantTypeCode is a coded representation of a business process variant type of a ProductionRequestBusinessProcessVariantType. It is of GDT type BusinessProcessVariantTypeCode. In some implementations, restrictions may include production with flexible production execution (main). MainIndicator is an indicator that specifies whether the current BusinessProcessVariantTypeCode is the main one or not. It is of GDT type Indicator and, in some implementations, has a Qualifier of Main An AccessControlList is a list of access groups that have access to a Production Request during a validity period.

ProductionSegment requests the execution of a single production stage, which is characterized by:

a certain (intermediate) material output, material inputs and operations to be executed. The material output of a ProductionSegment can either be an intermediate material output (if it is required by a subsequent ProductionSegment), or, for the final ProductionSegment, a final material output.

Each ProductionSegment triggers the creation of one or (depending on the production lotsize) more Production Orders. Therefore, both ProductionSegment and corresponding Production Orders refer to the same part of the production process.

Structure

The elements located at the node ProductionSegment are defined by the node data type ProductionRequestProductionSegmentElements. These elements can include: UUID, ID, ReleasedExecutionProductionModelProductionSegmentUUID, ScheduledExecutionPeriod, ProductionOrderCreationDueDateTime. UUID is a Universally unique identifier for the ProductionSegment. It is of GDT type UUID. ID is anIdentifier for the ProductionSegment. It is unique in the context of the ProductionRequest. It is of GDT type ProductionSegmentID. ReleasedExecutionProductionModelProductionSegmentUUID is a Universally unique identifier for the referenced ProductionSegment in the ReleasedExecutionProductionModel. It is of GDT type UUID. ScheduledExecutionPeriod is a Period for which production execution is scheduled. It contains the earliest start date at which production may start and the latest end date at which production may end. It is of GDT type UPPER_OPEN_GLOBAL_DateTimePeriod and, in some implementations, has a Qualifier of Execution. ProductionOrderCreationDueDateTime is a Date and time by which ProductionOrders shall be created at the latest, to ensure an undelayed production execution process for the ProductionSegment. It is of GDT type GLOBAL_DateTime and, in some implementations, has a Qualifier of Due.

Status is status information of the ProductionSegment, represented by the aggregated data type ProductionRequestProductionSegmentStatus, which contains the following status code elements: ProductionOrderCreationProcessingStatusCode, ProductionOrderListLifecycleStatusCode, CancellationStatusCode, ClosureStatusCode. ProductionOrderCreationProcessingStatusCode is a status of the ProductionOrder creation process. Indicates whether the creation of further ProductionOrders for the ProductionSegment is expected or not. It is of GDT type ProcessingStatusCode. ProductionOrderListLifecycleStatusCode is an aggregated lifecycle status of all ProductionOrders that have been created for the ProductionSegment. It is of GDT type LogisticsLifecycleStatusCode. CancellationStatusCode is a cancellation status of the ProductionSegment. Indicates whether the ProductionSegment has been cancelled or not. It is of GDT type CancellationStatusCode. ClosureStatusCode is a closure status of the ProductionSegment. Indicates whether the ProductionSegment has been closed or not. It is of GDT type ClosureStatusCode.

There may be a number of composition relationships to subordinate nodes including: ProductionSegmentBusinessProcessVariantType 233076 may have a cardinality relationship of 1:cn. ProductionSegmentPlannedOperation 233054 may have a cardinality relationship of 1:cn. ProductionSegmentMaterialOutputGroup 233060 may have a cardinality relationship of 1:n. ProductionSegmentRequestedMaterialOutput 233066 may have a cardinality relationship of 1:n. ProductionSegmentConfirmedMaterialOutput 233068 may have a cardinality relationship of 1:n. ProductionSegmentMaterialInputGroup 233070 may have a cardinality relationship of 1:cn. ProductionSegmentRequestedMaterialInput 233072 may have a cardinality relationship of 1:cn. ProductionSegmentConfirmedMaterialInput 233074 may have a cardinality relationship of 1:cn.

There may be a number of Inbound Aggregation Relationships including: 1) From the business object ReleasedExecutionProductionModel/node ProductionSegment as follows. ReleasedExecutionProductionModelProductionSegment may have a cardinality relationship of 1:cn and denotes the ProductionSegment of the ReleasedExecutionProductionModel that is requested to be the source of master data for describing the execution process.

There may be a number of Associations for Navigation including: 1) To the business object ProductionRequest/node ProductionSegment as follows. Predecessor ProductionSegment may have a cardinality relationship of 1:cn and provides a navigation from a ProductionSegment to its preceding ProductionSegments, which contain the intermediate input materials of the ProductionSegment as material outputs. Successor ProductionSegment may have a cardinality relationship of 1:c and provides a navigation from a ProductionSegment to its follow-on ProductionSegment, which contains the intermediate output material of the ProductionSegment as material input.

2) To the business object ProductionRequest/node MaterialOutputGroup as follows: MainProductOutputGroup may have a cardinality relationship of 1:1 and provides a navigation from a ProductionSegment to its MainProductOutputGroup.

3) To the business object ProductionOrder/node Root as follows. ProductionOrder may have a cardinality relationship of 1:cn and provides a navigation from a ProductionSegment to the ProductionOrders that have been created with reference to the ProductionSegment.

The action CreateProductionOrder (S&AM Action) creates one ProductionOrder per ProductionSegment. The quantity of the ProductionOrder to be created is automatically determined from the open quantity of the ProductionSegmentConfirmedMaterialOutputs. In some implementations, changes to the object may include that the ConfirmedMaterialOutputs and ConfirmedMaterialInputs of the ProductionSegment are adjusted to the corresponding MaterialOutputs and MaterialInputs of the ProductionOrder. The forwarded quantities are raised and the open quantities are reduced accordingly. Changes to other objects may in clued that a complete instance of the business object ProductionOrder is created with reference to the ProductionSegment.

CreatePartialProductionOrders creates a specified number of Production Orders with a specified quantity for the ProductionSegment. In some implementations, changes to the object may include that the ConfirmedMaterialOutputs and ConfirmedMaterialInputs of the ProductionSegment are adjusted to the corresponding MaterialOutputs and MaterialInputs of the ProductionOrder. The forwarded quantities are raised and the open quantities are reduced accordingly. Changes to other objects may include that One or more complete instances of the business object ProductionOrder are created with reference to the ProductionSegment.

Parameters may include that the action elements can include defined by the data type: ProductionRequestProductionSegmentCreateProductionOrderActionElements. These elements can include: NumberOfProductionOrdersIntegerValue, ForwardedQuantity and ProductionOrderCreationCompletedIndicator. NumberOfProductionOrdersIntegerValue is a number of ProductionOrders to be created for the ProductionSegment. The default value is 1. It is of GDT type IntegerValue. ForwardedQuantity is a quantity that is forwarded from the main material output of the Production- Segment to the main material output of the ProductionOrder. It is of GDT type Quantity and, in some implementations, has a Qualifier of Forwarded. ProductionOrderCreationCompletedIndicator sets the ProductionOrderCreationProcessingStatus to "Finished", indicating that no further creation of ProductionOrders is expected for the ProductionSegment. It is of GDT type Indicator and, in some implementations, has a Qualifier of Completed SynchronizeWithProductionOrders (S&AM Action) synchronizes the data of the ProductionSegment with the data of the corresponding ProductionOrders. In some implementations, changes to the object may include that the status variables of the ProductionSegment and the ProductionSegmentConfirmedMaterialOutputs and ProductionSegmentConfirmedMaterialInputs are adjusted according to the settings in the corresponding ProductionOrders.

CompleteProductionOrderCreation (S&AM Action) states the completion of ProductionOrder creation for the ProductionSegment, indicating that no further creation of ProductionOrders is expected for the ProductionSegment. In some implementations, Changes to the object may include that the ProductionOrderCreationStatus of the ProductionSegment is set to "completed".

For the ProductionSegmentConfirmedMaterialOutputs and ProductionSegmentConfirmedMaterialInputs, the total quantities are set to the values of the forwarded quantities.

UndoProductionOrderCreationCompletion (S&AM Action) states that a further creation of ProductionOrders is expected again for the ProductionSegment. In some implementations, changes to the object may include that the ProductionOrderCreationStatus of the ProductionSegment is reset from "completed" to "initial" or "started".

QueryByElements provides a list of all ProductionSegments that match the selection criteria. The query elements can include defined by the data type ProductionRequestProductionSegmentQueryElements. These elements can include: ID, ProductionRequestID, ProductionOrderID, ProductionRequestFunctionalUnitID, RequestedMaterialOutputMaterialID, RequestedMaterialOutputMaterial_ProductCategoryAssignmentProductCategoryInternalID, RequestedMaterialOutputSupplyPlanningAreaID, RequestedMaterialOutputDueDateTime, ScheduledExecutionPeriod, ProductionOrderCreationDueDateTime, ProductionOrderCreationProcessingStatusCode, ProductionOrderListLifecycleStatusCode, CancellationStatusCode, ClosureStatusCode. ID is of GDT type ProductionSegmentID. ProductionRequestID, From node Root, is of GDT type BusinessTransactionDocumentID. ProductionOrderID, From business object ProductionOrder/node Root, is of GDT type BusinessTransactionDocumentID. ProductionRequestFunctionalUnitID, From node Root, is of GDT type OrganisationalCentreID. RequestedMaterialOutputMaterialID, From node RequestedMaterialOutput, is of GDT type ProductID. RequestedMaterialOutputMaterial_ProductCategoryAssignmentProductCategoryInternalID, From business object Material/node ProductCategoryAssignment, is of GDT type ProductCategoryInternalID. In some implementations, the ProductCategory specified by the ProductCategoryInternalID has to be part of the ProductCategoryHierarchy with usage 'Production'. RequestedMaterialOutputSupplyPlanningAreaID, From node RequestedMaterialOutput, is of GDT type SupplyPlanningAreaID. RequestedMaterialOutputDueDateTime, From node RequestedMaterialOutput, is of GDT type GLOBAL_DateTime and, in some implementations, has a Qualifier of Due. ScheduledExecutionPeriod is of GDT type UPPEROPEN_GLOBAL_DateTimePeriod and, in some implementations, has a Qualifier of Execution. ProductionOrderCreationDueDateTime is of GDT type GLOBAL_DateTime and, in some implementations, has a Qualifier of Due. ProductionOrderCreationProcessingStatusCode is of GDT type ProcessingStatusCode. ProductionOrderListLifecycleStatusCode is of GDT type LogisticsLifecycleStatusCode. CancellationStatusCode is of GDT type CancellationStatusCode. ClosureStatusCode is of GDT type ClosureStatusCode.

A ProductionSegmentBusinessProcessVariantType defines the character of a business process variant of the ProductionSegment-Node. It represents a typical way of processing of a ProductionSegment within a process component from a business point of view. In some implementations, a Business Process Variant is configuration of a Process Component. A Business Process Variant belongs exactly to one process component. A process component is a software package that realizes a business process and exposes its functionality as services. The functionality contains business transactions. A process component contains one or more semantically related business objects. A business object belongs to exactly one process component.

The elements located at the node ProductionSegmentBusinessProcessVariantType are defined by the data type: ProductionRequestProductionSegmentBusinessProcessVariantTypeElements, derived from BusinessProcessVariantTypeElements (Template). These elements can include: BusinessProcessVariantTypeCode and MainIndicator. BusinessProcessVariantTypeCode is a BusinessProcessVariantTypeCode is a coded representation of a business process variant type of a ProductionSegmentBusinessProcessVariantType. It is of GDT type BusinessProcessVariantTypeCode In some implementations, restrictions can include production with detailed execution planning. MainIndicator is an indicator that specifies whether the current BusinessProcessVariantTypeCode is the main one or not. It is of GDT type Indicator and, in some implementations, has a Qualifier of Main.

ProductionSegmentPlannedOperation subdivides further a ProductionSegment into one or more operations. It provides operational information from a gross level planning perspective onto the production execution process and contains scheduling information and the selected planning alternative. The scheduling information and the selected planning alternative are to be considered as constraints for the corresponding production order operations.

The elements located at the node ProductionSegmentPlannedOperation are defined by the node data type ProductionRequestProductionSegmentPlannedOperationElements. These elements can include: UUID, ID, ReleasedExecutionProductionModelProductionSegmentPlanningOperationUUID, ScheduledExecutionPeriod, SelectedReleasedExecutionProductionModelProductionSegmentPlanningOperationAlternativeUUID. UUID is a universally unique identifier for the ProductionSegmentPlannedOperation and is of GDT type UUID. ID is an identifier for the ProductionSegmentPlannedOperation. It is unique in the context of the ProductionSegment. It is of GDT type OperationID. ReleasedExecutionProductionModelProductionSegmentPlanningOperationUUID is a universally unique identifier for the referenced ProductionSegmentPlanningOperation in the ReleasedExecutionProductionModel. It is of GDT type UUID. ScheduledExecutionPeriod is a period for which production execution is scheduled. It contains the earliest start date at which production may start and the latest end date at which production may end. It is of GDT type UPPER_OPEN_GLOBAL_DateTimePeriod and, in some implementations, has a Qualifier of Execution. SelectedReleasedExecutionProductionModelProductionSegmentPlanningOperationAlternativeUUID is a universally unique identifier for the planning operation alternative that has been selected from all available alternatives of the ReleasedExecutionProductionModelProductionSegmentPlanningOperation. It is of GDT type UUID There may be a number of Inbound Aggregation Relationships including: 1) From the business object ReleasedExecutionProductionModel/node ProductionSegmentPlanningOperation as follows. ReleasedExecutionProductionModelProductionSegmentPlanningOperation may have a cardinality relationship of 1:cn and denotes the ProductionSegmentPlanningOperation of the ReleasedExecutionProductionModel that provides master data information for the ProductionSegmentPlannedOperation.

There may be a number of Associations for Navigation including: 1) To the business object ReleasedExecutionProductionModel/node ProductionSegmentPlanningOperation lternative as follows. SelectedReleasedExecutionProductionModelProductionSegmentPlanningOperationAlternative may have a cardinality relationship of c:c and enables navigation to the selected planning operation alternative.

ProductionSegmentMaterialOutputGroup groups material outputs of a ProductionSegment as originally requested from, and as correspondingly confirmed by Production Execution according to several types of outputs (cf. Specialisations). ProductionSegmentMaterialOutputGroup occurs in the following full and disjoint specializations: ProductionSegmentMainMaterialOutputGroup 233062 and ProductionSegmentByProductOutputGroup 233064. ProductionSegmentMainMaterialOutputGroup groups main-material outputs that represent a primary goal of the ProductionSegment. ProductionSegmentByProductOutputGroup groups a byproduct outputs, that are undesired material outputs, produced in addition to the main-material outputs.

The elements located at the node ProductionSegmentMaterialOutputGroup are defined by the node data type ProductionRequestProductionSegmentMaterialOutputGroupElements. These elements can include: UUID, ID, MaterialRoleCode and ReleasedExecutionProductionModelProductionSegmentMaterialOutputChangeStateUUID. UUID is a universally unique identifier for the ProductionSegmentMaterialOutputGroup. It is of GDT type UUID. ID is an identifier for the ProductionSegmentMaterialOutputGroup. It is unique in the context of the ProductionRequest. It is of GDT type MaterialOutputGroupID. MaterialRoleCode specifies the role of the material to be produced for all grouped material outputs. It is of GDT type MaterialRoleCode and, in some implementations, has a Qualifier of MaterialOutputGroup. In some implementations, MaterialRoleCode is restricted to the values: 1—Main Product, 3—By Product, 5—Intermediate Product. ReleasedExecutionProductionModelProductionSegmentMaterialOutputChangeStateUUID is a universally unique identifier for the referenced ProductionSegmentMaterialOutputChangeState in the ReleasedExecutionProductionModel. It is of GDT type UUID There may be a number of composition relationships to subordinate nodes including: ProductionSegmentMaterialOutputGroupConfirmationQuantities 233058 may have a cardinality relationship of 1:c.

There may be a number of Inbound Association Relationships including: 1) From the business object ReleasedExecutionProductionModel/node ProductionSegmentMaterialOutputChangeState as follows. ReleasedExecutionProductionModelProductionSegmentMaterialOutputChangeState may have a cardinality relationship of c:cn and denotes the ProductionSegmentMaterialOutputChangeState of the ReleasedExecutionProductionModel that provides master data information for the grouped material outputs.

There may be a number of Associations for Navigation including: 1) To the business object ProductionRequest/node RequestedMaterialOutput as follows. RequestedMaterialOutput may have a cardinality relationship of 1:c and provides a navigation from a MaterialOutputGroup to its RequestedMaterialOutput. ConfirmedMaterialOutput may have a cardinality relationship of 1:cn and provides a navigation from a MaterialOutputGroup to its ConfirmedMaterialOutputs.

In some implementations, To a ProductionSegmentMainMaterialOutputGroup, exactly one RequestedMaterialOutput is assigned. For every ProductionSegmentRequestedMaterialOutput that is assigned to a ProductionSegmentMaterialOutputGroup, exactly one corresponding ProductionSegmentConfirmedMaterialOutput with the same MaterialOutputID is assigned to the same ProductionSegmentMaterialOutputGroup.

ProductionSegmentMaterialOutputGroupConfirmationQuantities cumulates the quantities of all ConfirmedMaterialOutputs that are assigned to the MaterialOutputGroup. The elements located at the node ProductionSegmentMaterialOutputGroupConfirmationQuantities are defined by the node data type ProductionRequestProductionSegmentMaterialOutputGroupConfirmationQuantities. These elements can include: CumulatedTotalQuantity, CumulatedTotalQuantityTypeCode, CumulatedForwardedQuantity, CumulatedForwardedQuantityTypeCode, CumulatedOpenQuantity, CumulatedOpenQuantityTypeCode, CumulatedFulfilledQuantity, CumulatedFulfilledQuantityTypeCode. CumulatedTotalQuantity is a Sum of the TotalQuantities of all ConfirmedMaterialOutputs that are assigned to the MaterialOutputGroup. It is of GDT type Quantity and, in some implementations, has a Qualifier of Total. CumulatedTotalQuantityTypeCode is a Type of the cumulated total quantity. It is of GDT type QuantityTypeCode and, in some implementations, has a Qualifier of Total. CumulatedForwardedQuantity is a Sum of the ForwardedQuantities of all ConfirmedMaterialOutputs that are assigned to the MaterialOutputGroup. It is of GDT type Quantity and, in some implementations, has a Qualifier of Forwarded. CumulatedForwardedQuantityTypeCode is a Type of the cumulated forwarded quantity. It is of GDT type QuantityTypeCode and, in some implementations, has a Qualifier of Forwarded. CumulatedOpenQuantity is a Sum of the OpenQuantities of all ConfirmedMaterialOutputs that are assigned to the MaterialOutputGroup. It is of GDT type Quantity and, in some implementations, has a Qualifier of Open. CumulatedOpenQuantityTypeCode is a Type of the cumulated open quantity. It is of GDT type QuantityTypeCode and, in some implementations, has a Qualifier of Open. CumulatedFulfilledQuantity is a Sum of the FulfilledQuantities of all ConfirmedMaterialOutputs that are assigned to the MaterialOutputGroup. It is of GDT type Quantity and, in some implementations, has a Qualifier of Fulfilled. CumulatedFulfilledQuantityTypeCode is a Type of the cumulated fulfilled quantity. It is of GDT type QuantityTypeCode and, in some implementations, has a Qualifier of Fulfilled.

ProductionSegmentRequestedMaterialOutput is a material that shall result from the execution of a ProductionSegment in a predefined quantity, location and date, as requested from Production Execution.

The elements located at the node ProductionSegmentRequestedMaterialOutput are defined by the node data type ProductionRequestProductionSegmentRequestedMaterialOutputElements. These elements can include: ID, MaterialOutputGroupUUID, PlannedOperationUUID, MainInventorySeparatingValues, MaterialUUID, SupplyPlanningAreaUUID, ProductRequirementSpecificationVersionUUID, DueDateTime, TotalQuantity, TotalQuantityTypeCode, FixedIndicator. ID is an Identifier for the ProductionSegmentRequestedMaterialOutput. It is unique in the context of the ProductionRequest. It is of GDT type MaterialOutputID. MaterialOutputGroupUUID is a Universally unique identifier for the ProductionSegmentMaterialOutputGroup to which the requested material output is assigned. It is of GDT type UUID. PlannedOperationUUID is a Universally unique identifier for the ProductionSegmentPlannedOperation at which the material output shall occur. It is of GDT type UUID. MainInventorySeparatingValues is a Specification of the requested material output's main inventory separating attributes. It is of GDT type MainInventorySeparatingValues. MaterialUUID is a universally unique identifier for the material that shall be produced. SupplyPlanningAreaUUID is a universally unique identifier for the SupplyPlanningArea for which the material shall be produced. ProductRequirementSpecificationVersionUUID is a universally unique identifier for the version of the ProductRequirementSpecification that specifies in detail the material that shall be produced. The preceding elements are of GDT type UUID. DueDateTime is a Date and time at which the material output shall be available. It is of GDT type GLOBAL_DateTime and, in some implementations, has a Qualifier of Due. TotalQuantity is a Quantity that shall be produced in total. It is of GDT type Quantity and, in some implementations, has a Qualifier of Total. TotalQuantityTypeCode is a Type of the total quantity. It is of GDT type QuantityTypeCode and, in some implementations, has a Qualifier of Total. FixedIndicator is a Indicates whether the requested material output is fixed or not, due to a deviation of the material output data from the result of master data explosion. It is of GDT type Indicator and, in some implementations, has a Qualifier of Fixed.

There may be a number of Inbound Aggregation Relationships including: 1) From the business object Material/node Root as follows. RequestedOutputMaterial may have a cardinality relationship of 1:cn and denotes the material that shall be produced.

2) From the business object SupplyPlanningArea/node Root as follows. RequestedOutputSupplyPlanningArea may have a cardinality relationship of 1:cn and denotes the SupplyPlanningArea for which the material shall be produced.

3) From the business object ProductRequirementSpecification/node Root as follows. ProductRequirementSpecificationVersion may have a cardinality relationship of c:cn and denotes the version of the ProductRequirementSpecification that specifies in detail the material that shall be produced.

May have a number of Inbound Association Relationships including: 1) From the business object ProductionRequest/node ProductionSegmentMaterialOutputGroup as follows. MaterialOutputGroupAssignment may have a cardinality relationship of 1:c and denotes the ProductionSegmentMaterialOutputGroup to which the requested material output is assigned.

2) From the node ProductionSegmentPlannedOperation as follows. PlannedOperationAssignment may have a cardinality relationship of c:cn and denotes the ProductionSegmentPlannedOperation at which the material output shall occur.

ProductionSegmentConfirmedMaterialOutput is a material that shall result from the execution of a ProductionSegment in a predefined quantity, location and date, as confirmed by Production Execution. The elements located at the node ProductionSegmentConfirmedMaterialOutput are defined by the node type data ProductionRequestProductionSegmentConfirmedMaterialOutputElements. These elements can include: ID, MaterialOutputGroupUUID, PlannedOperationUUID, MainInventorySeparatingValues, MaterialUUID, SupplyPlanningAreaUUID, ProductRequirementSpecificationVersionUUID, DueDateTime, TotalQuantity, TotalQuantityTypeCode, ForwardedQuantity, ForwardedQuantityTypeCode, OpenQuantity, OpenQuantityTypeCode, FulfilledQuantity, FulfilledQuantityTypeCode. ID is an Identifier for the ProductionSegmentConfirmedMaterialOutput. It is unique in the context of the ProductionRequest. It is of GDT type MaterialOutputID. MaterialOutputGroupUUID is a Universally unique identifier for the ProductionSegmentMaterialOutputGroup to which the confirmed material output is assigned. It is of GDT type UUID. PlannedOperationUUID is a Universally unique identifier for the ProductionSegmentPlannedOperation at which the material output shall occur. It is of GDT type UUID. MainInventorySeparatingValues is a Specification of the confirmed material output's main inventory separating attributes. It is of GDT type MainInventorySeparatingValues. MaterialUUID is a universally unique identifier for the material that shall be produced. SupplyPlanningAreaUUID is a universally unique identifier for the SupplyPlanningArea for which the material shall be produced. ProductRequirementSpecificationVersionUUID is a Universally unique identifier for the version of the ProductRequirementSpecification that specifies in detail the material that shall be produced. The preceding elements are of GDT type UUID. DueDateTime is a Date and time at which the material output shall be available. It is of GDT type GLOBAL_DateTime and, in some implementations, has a Qualifier of Due. TotalQuantity is a Quantity that shall be produced in total. It is of GDT type Quantity and, in some implementations, has a Qualifier of Total. TotalQuantityTypeCode is a Type of the total quantity. It is of GDT type QuantityTypeCode and, in some implementations, has a Qualifier of Total. ForwardedQuantity is a Quantity that has already been forwarded to associated ProductionOrder material outputs. It is of GDT type Quantity and, in some implementations, has a Qualifier of Forwarded. ForwardedQuantityTypeCode is a Type of the forwarded quantity. It is of GDT type QuantityTypeCode and, in some implementations, has a Qualifier of Forwarded. OpenQuantity is a Remaining part of the TotalQuantity that has not yet been forwarded to associated ProductionOrder material outputs. It is of GDT type Quantity and, in some implementations, has a Qualifier of Open. OpenQuantityTypeCode is a Type of the open quantity. It is of GDT type QuantityTypeCode and, in some implementations, has a Qualifier of Open. FulfilledQuantity is a Quantity that has already been fulfilled for associated ProductionOrder material outputs. It is of GDT type Quantity and, in some implementations, has a Qualifier of Fulfilled FulfilledQuantityTypeCode is a Type of the fulfilled quantity. It is of GDT type QuantityTypeCode and, in some implementations, has a Qualifier of Fulfilled.

There may be a number of Inbound Aggregation Relationships including: 1) From the business object Material/node Root as follows. ConfirmedOutputMaterial may have a cardinality relationship of 1:cn and denotes the Material that shall be produced.

2) From the business object SupplyPlanningArea/node Root as follows. ConfirmedOutputSupplyPlanningArea may have a cardinality relationship of 1:cn and denotes the SupplyPlanningArea for which the material shall be produced.

3) From the business object ProductRequirementSpecification/node Root as follows. ProductRequirementSpecificationVersion may have a cardinality relationship of c:cn and denotes the version of the ProductRequirementSpecification that specifies in detail the material that shall be produced.

There may be a number of Inbound Association Relationships including: 1) From the business object ProductionRequest/node ProductionSegmentMaterialOutputGroup as follows. MaterialOutputGroupAssignment may have a cardinality relationship of 1:cn and denotes the ProductionSegmentMaterialOutputGroup to which the confirmed material output is assigned.

2) From the node business object ProductionRequest/ProductionSegmentPlannedOperation as follows. PlannedOperationAssignment may have a cardinality relationship of c:cn and denotes the ProductionSegmentPlannedOperation at which the material output shall occur.

In some implementations, OpenQuantity is equal to TotalQuantity minus ForwardedQuantity. TotalQuantity is greater than or equal to ForwardedQuantity QueryByElements provides a list of ProductionSegmentConfirmedMaterialOutputs that match the selection criteria. The query elements can include defined by the data type: ProductionRequestProductionSegmentConfirmedMaterialOutputQueryElements. These elements can include: MaterialUUID, SupplyPlanningAreaUUID and DueDateTime. MaterialUUID is of GDT type UUID. SupplyPlanningAreaUUID is of GDT type UUID. DueDateTime is of GDT type GLOBAL_DateTime and, in some implementations, has a Qualifier of Due.

ProductionSegmentMaterialInputGroup groups material inputs of a ProductionSegment as originally requested from, and as correspondingly confirmed by Production Execution. The elements located at the node ProductionSegmentMaterialInputGroup are defined by the node data type ProductionRequestProductionSegmentMaterialInputGroupElements. These elements can include: UUID, ID, MaterialRoleCode, ReleasedExecutionProductionModelProductionSegmentMaterialInputChangeStateUUID. UUID is a universally unique identifier for the ProductionSegmentMaterialInputGroup. It is of GDT type UUID. ID is an identifier for the ProductionSegmentMaterialInputGroup. It is unique in the context of the ProductionRequest. It is of GDT type MaterialInputGroupID. MaterialRoleCode specifies the role of the material to be consumed for all grouped material inputs. It is of GDT type MaterialRoleCode and, in some implementations, has a Qualifier of MaterialInputGroup. In some implementations, MaterialRoleCode is restricted to the values: 5—Intermediate Product, 6—Component. ReleasedExecutionProductionModelProductionSegmentMaterialInputChangeStateUUID is a universally unique identifier for the referenced ProductionSegmentMaterialInputChangeState in the ReleasedExecutionProductionModel. It is of GDT type UUID There may be a number of Inbound Association Relationships including: 1) From the business object ReleasedExecutionProductionModel/node ReleasedExecutionProductionModelProductionSegmentMaterialInputChangeState as follows. ProductionSegmentMaterialInputChangeState may have a cardinality relationship of c:cn and denotes the ProductionSegmentMaterialInputChangeState of the ReleasedExecutionProductionModel that provides master data information for the ProductionSegmentMaterialInputGroup.

There may be a number of Associations for Navigation including: 1) To the business object ProductionRequest/node RequestedMaterialOutput as follows. RequestedMaterialInput may have a cardinality relationship of 1:c and provides a navigation from a MaterialInputGroup to its RequestedMaterialInput. ConfirmedMaterialInput may have a cardinality relationship of 1:cn and provides a navigation from a MaterialInputGroup to its ConfirmedMaterialInputs.

In some implementations, For every ProductionSegmentRequestedMaterialInput that is assigned to a ProductionSegmentMaterialInputGroup, exactly one corresponding ProductionSegmentConfirmedMaterialInput with the same MaterialInputID is assigned to the same ProductionSegmentMaterialInputGroup.

ProductionSegmentRequestedMaterialInput is a material that shall be consumed for the execution of a ProductionSegment in a predefined quantity, location and date, as requested from Production Execution. The elements located at the node ProductionSegmentRequestedMaterialInput are defined by the node data type ProductionRequestProductionSegmentRequestedMaterialInputElements. These elements can include: ID, MaterialInputGroupUUID, PlannedOperationUUID, MainInventorySeparatingValues, MaterialUUID, SupplyPlanningAreaUUID, DueDateTime, TotalQuantity, TotalQuantityTypeCode, FixedIndicator. ID is a Identifier for the ProductionSegmentRequestedMaterialInput. It is unique in the context of the ProductionRequest. It is of GDT type MaterialInputID. MaterialInputGroupUUID is a Universally unique identifier for the ProductionSegmentMaterialInputGroup to which the requested material input is assigned. It is of GDT type UUID. PlannedOperationUUID is a Universally unique identifier for the ProductionSegmentPlannedOperation at which the material input shall occur. It is of GDT type UUID. MainInventorySeparatingValues is a Specification of the requested material input's main inventory separating attributes. It is of GDT type MainInventorySeparatingValues. MaterialUUID is a Universally unique identifier for the material that shall be produced. SupplyPlanningAreaUUID is a Universally unique identifier for the SupplyPlanningArea for which the material shall be produced. DueDateTime is a Date and time at which the material input shall be consumed. It is of GDT type GLOBAL_DateTime and, in some implementations, has a Qualifier of Due. TotalQuantity is a Quantity that shall be consumed in total. It is of GDT type Quantity and, in some implementations, has a Qualifier of Total. TotalQuantityTypeCode is a Type of the total quantity. It is of GDT type QuantityTypeCode and, in some implementations, has a Qualifier of Total. FixedIndicator is a Indicates whether the requested material input is fixed or not, due to a deviation of the material input data from the result of master data explosion. It is of GDT type Indicator and, in some implementations, has a Qualifier of Fixed.

There may be a number of Inbound Aggregation Relationships including: 1) From the business object Material/node Root as follows. RequestedInputMaterial may have a cardinality relationship of 1:cn and denotes the material that shall be consumed.

2) From the business object SupplyPlanningArea/node Root as follows. RequestedInputSupplyPlanningArea may have a cardinality relationship of 1:cn and denotes the SupplyPlanningArea from which the material shall be consumed.

There may be a number of Inbound Association Relationships including: 1) From the business object ProductionRequest/node ProductionSegmentMaterialInputGroup as follows. MaterialInputGroupAssignment may have a cardinality relationship of 1:cn and denotes the ProductionSegmentMaterialInputGroup to which the requested material input is assigned.

2) From the business object ProductionRequest/node ProductionSegmentPlannedOperation PlannedOperationAssignment may have a cardinality relationship of c:cn and denotes the ProductionSegmentPlannedOperation at which the material input shall occur.

ProductionSegmentConfirmedMaterialInput is a material that shall be consumed for the execution of a ProductionSegment in a predefined quantity, location and date, as confirmed by Production Execution. The elements located at the node ProductionSegmentConfirmedMaterialInput are defined by the node data type ProductionRequestProductionSegmentConfirmedMaterialInputElements. These elements can include: ID, MaterialInputGroupUUID, PlannedOperationUUID, MainInventorySeparatingValues, MaterialUUID, SupplyPlanningAreaUUID, DueDateTime, TotalQuantity, TotalQuantityTypeCode, ForwardedQuantity, ForwardedQuantityTypeCode, OpenQuantity, OpenQuantityTypeCode, FulfilledQuantity, FulfilledQuantityTypeCode.

ID is a Identifier for the ProductionSegmentConfirmedMaterialInput. It is unique in the context of the ProductionRequest. It is of GDT type MaterialInputID. MaterialInputGroupUUID is a Universally unique identifier for the ProductionSegmentMaterialInputGroup to which the confirmed material input is assigned. It is of GDT type UUID. PlannedOperationUUID is a Universally unique identifier for the ProductionSegmentPlannedOperation at which the material input shall occur. It is of GDT type UUID. MainInventorySeparatingValues is a Specification of the requested material input's main inventory separating attributes. It is of GDT type MainInventorySeparatingValues. MaterialUUID is a Universally unique identifier for the material that shall be produced. SupplyPlanningAreaUUID is a Universally unique identifier for the SupplyPlanningArea for which the material shall be produced. DueDateTime is a Date and time at which the material input shall be consumed. It is of GDT type GLOBAL_DateTime and, in some implementations, has a Qualifier of Due. TotalQuantity is a Quantity that shall be consumed in total. It is of GDT type Quantity and, in some implementations, has a Qualifier of Total. TotalQuantityTypeCode is a Type of the total quantity. It is of GDT type QuantityTypeCode and, in some implementations, has a Qualifier of Total. ForwardedQuantity is a Quantity that has already been forwarded to associated ProductionOrder material inputs. It is of GDT type Quantity and, in some implementations, has a Qualifier of Forwarded. ForwardedQuantityTypeCode is a Type of the forwarded quantity. It is of GDT type QuantityTypeCode and, in some implementations, has a Qualifier of Forwarded. OpenQuantity is a Remaining part of the TotalQuantity that has not yet been forwarded to associated ProductionOrder material inputs. It is of GDT type Quantity and, in some implementations, has a Qualifier of Open. OpenQuantityTypeCode is a Type of the open quantity. It is of GDT type QuantityTypeCode and, in some implementations, has a Qualifier of Open. FulfilledQuantity is a Quantity that has already been fulfilled for associated ProductionOrder material inputs. It is of GDT type Quantity and, in some implementations, has a Qualifier of Fulfilled. FulfilledQuantityTypeCode is a Type of the fulfilled quantity. It is of GDT type QuantityTypeCode and, in some implementations, has a Qualifier of Fulfilled.

There may be a number of Inbound Aggregation Relationships including: 1) From the business object Material/node Root as follows. ConfirmedInputMaterial may have a cardinality relationship of 1:cn and denotes the material that shall be consumed.

2) From the business object SupplyPlanningArea/node Root as follows. ConfirmedInputSupplyPlanningArea may have a cardinality relationship of 1:cn and denotes the SupplyPlanningArea from which the material shall be consumed.

There may be a number of Inbound Association Relationships including: 1) From the business object ProductionRequest/node ProductionSegmentMaterialInputGroup as follows. MaterialInputGroupAssignment may have a cardinality relationship of 1:cn and denotes the ProductionSegmentMaterialInputGroup to which the confirmed material input is assigned.

2) From the business object ProductionRequest/node ProductionSegmentPlannedOperation PlannedOperationAssignment may have a cardinality relationship of c:cn and denotes the ProductionSegmentPlannedOperation at which the material input shall occur.

In some implementations, OpenQuantity is equal to TotalQuantity minus ForwardedQuantity. TotalQuantity is greater than or equal to ForwardedQuantity QueryByElements provides a list of ProductionSegmentConfirmedMaterialInputs that match the selection criteria. The query elements can include defined by the data type: ProductionRequestProductionSegmentConfirmedMaterialInputQueryElements. These elements can include: MaterialUUID, SupplyPlanningAreaUUID, DueDateTime. MaterialUUID is of GDT type UUID. SupplyPlanningAreaUUID is of GDT type UUID. DueDateTime is of GDT type GLOBAL_DateTime and, in some implementations, has a Qualifier of Due.

Business Object ProductionRequest

FIGS. 234-1 through 234-11 illustrate one example logical configuration of ProductionRequestConfirmationMessage 234000. Specifically, this figure depicts the arrangement and hierarchy of various components such as one or more levels of packages, entities, and datatypes, shown here as 234000 through 234280. As described above, packages may be used to represent hierarchy levels. Entities are discrete business elements that are used during a business transaction. Data types are used to type object entities and interfaces with a structure. For example, ProductionRequestConfirmationMessage 234000 includes, among other things, ProductionRequest 234014. Accordingly, heterogeneous applications may communicate using this consistent message configured as such.

FIGS. 235-1 through 235-14 illustrate one example logical configuration of ProductionRequestConfirmationReconciliationMessage 235000. Specifically, this figure depicts the arrangement and hierarchy of various components such as one or more levels of packages, entities, and datatypes, shown here as 235000 through 235268. As described above, packages may be used to represent hierarchy levels. Entities are discrete business elements that are used during a business transaction. Data types are used to type object entities and interfaces with a structure. For example, ProductionRequestConfirmationReconciliationMessage 235000 includes, among other things, ProductionRequest 235044. Accordingly, heterogeneous applications may communicate using this consistent message configured as such.

FIGS. 236-1 through 236-10 illustrate one example logical configuration of ProductionRequestRequestMessage 236000. Specifically, this figure depicts the arrangement and hierarchy of various components such as one or more levels of packages, entities, and datatypes, shown here as 236000 through 236270. As described above, packages may be used to represent hierarchy levels. Entities are discrete business elements that are used during a business transaction. Data types are used to type object entities and interfaces with a structure. For example, ProductionRequestRequestMessage 236000 includes, among other things, ProductionRequest 236014. Accordingly, heterogeneous applications may communicate using this consistent message configured as such.

Message Types and their Signatures

The operations of the business object Production Request are needed to exchange information between a supply planning system (e.g. Supply Chain Control) and a manufacturing execution system (e.g. Logistics Execution). The supply planning system requests for production and the manufacturing execution provides feedback to supply planning about deviations from the deliverables as specified in this request and about the execution progress with respect to the request.

This section describes the message types and their signatures that are derived from the operations of the business object Production Request. In a signature, the business object is contained as a "leading" business object. The message data type determines the structure of the following message types.

The motivating business scenarios for the ProductionRequestRequest, ProductionRequestConfirmation and ProductionRequestConfirmationReconciliationNotification message types are Make to Stock (MTS) and Make to Order (MTO) scenarios.

In order to cover the demands, a supply planner has to generate supply proposals. A very common supply type is a production planning order, an object that defines the intended production of a material in a specific quantity and at a specific availability date. The release of a planned production order to production will trigger the ProductionRequestRequest message and creation of a Production Request in the manufacturing execution system. During the production execution process that is related to a certain Production Request, feedback is provided from manufacturing execution system to supply planning system about progress and deviations of the production process with reference to a Production Request.

ProductionRequestRequest in reconciliation mode or ProductionRequestConfirmationReconciliationNotification should be used in order to generate a shared point of synchronization between a Production Request and a Production Requisition.

Message Types

ProductionRequestRequest is a request to maintain (i.e. create or update) a Production Request. The structure of this message type is determined by the message data type ProductionRequestRequestMessage.

This message type is used in the following operations of interfaces: ProductionTriggerandResponseProducingOut, ProductionTriggerAndResponseProducingOut.RequestProduction, ProductionProducingIn, ProductionProducingIn.MaintainProductionRequest.

ProductionRequestConfirmation is a confirmation to a maintenance request for a Production Request and its execution progress. The data of this confirmation may deviate from the data of the maintenance request. The structure of this message type is determined by the message data type ProductionRequestConfirmationMessage.

This message type is used in the following operations of interfaces: ProductionProducingOut, ProductionProducingOut.ConfirmProductionRequest, ProductionTriggerAndResponseProducingIn, ProductionTriggerAndResponseProducingIn, ChangeProduction RequisitionBasedOnProductionRequestConfirmation.

ProductionRequestConfirmationReconciliationNotification is a reconciliation of the confirmation view of a Production Request. The message generates a shared point of synchronization between a Production Request and a Production Requisition. It ensures that the business object Production Requisition is updated so that the data in both business objects is consistent. The structure of this message type is determined by the message data type ProductionRequestConfirmationReconciliationMessage.

This message type is used in the following operations of interfaces: ProductionProducingOut, ProductionProducingOut.NotifyPlanningOfProductionRequestConfirmationReconciliation, ProductionTriggerAndResponseProducingIn, ProductionTriggerAndResponseProducingIn. ChangeProductionRequisitionOnProductionRequestConfirmationReconci liation The message data type ProductionRequestRequestMessage contains the object Production Request which is contained in the business document and the business information that is relevant for sending a business document in a message.

It contains the packages: MessageHeader package and ProductionRequest package. This message data type, therefore, provides the structure for the ProductionRequestRequest message type and the operations that are based on it.

MessageHeader Package is a grouping of business information that is relevant for sending a business document in a message. It contains the entity MessageHeader.

MessageHeader is a grouping of business information from the perspective of the sending application including: Information to identify the business document in a message, Information about the sender, Information about the recipient. The MessageHeader contains: SenderParty and RecipientParty.

It is of the type GDT BusinessDocumentMessageHeader, and the following elements of the GDT are used: ID, CreationDateTime, ReconciliationIndicator.

SenderParty is the partner responsible for sending a business document at business application level. The SenderParty is of the type GDT BusinessDocumentMessageHeaderParty.

RecipientParty is the partner responsible for receiving a business document at business application level. The RecipientParty is of the type GDT BusinessDocumentMessageHeaderParty.

ProductionRequest Package is the grouping of ProductionRequest with its package ProductionSegment. ProductionRequest contains the elements and attributes: actionCode, reconciliationPeriodCounterValue, ID, ReleasedExecutionProductionModelID, ReleasedExecutionProductionModelVersionID, ReleasedExecutionProductionModelExplosionDate, BusinessTransactionDocumentReference. ActionCode is a coded representation of instructions for processing the ProductionRequest for the recipient of a message and is of GDT type ActionCode. reconciliationPeriodCounterValue is a Reconciliation Period of the Production Request and is of GDT type CounterValue and, in some implementations, can have a Qualifier of ReconciliationPeriod. ID is an Identifier for the ProductionRequest and is of GDT type BusinessTransactionDocumentID. ReleasedExecutionProductionModelID is an Identifier for the ReleasedExecutionProductionModel that is requested to be the source of master data for describing the execution process and is of GDT type ProductionModelID. ReleasedExecutionProductionModelVersionID is a Version counter for generation of the ReleasedExecutionProductionModel and is of GDT type VersionID. ReleasedExecutionProductionModelExplosionDate is a Date that determines the change state of the ReleasedExecutionProductionModel that shall be exploded for master data retrieval and is of GDT type Date and, in some implementations, can have a Qualifier of Explosion. BusinessTransactionDocumentReference is a Reference to the Business Object from which the creation of the ProductionRequest was triggered and is of GDT type BusinessTransactionDocumentReference.

In some implementations, the only allowed values for action code are "01" (create) and "04" (save).

BusinessTransactionDocumentReference is a BusinessTransactionDocumentReference is the reference to the Business Object from which the creation of the ProductionRequest was triggered. Typically, the referenced Business Object is a ProductionRequisition, located in the process component Production Trigger and Response. However, other scenarios for the creation of a ProductionRequest are possible, like creation from a Sales Order or by a system user. BusinessTransactionDocumentReference is of the type GDT BusinessTransactionDocumentReference.

ProductionSegment Package is the grouping of ProductionSegment with its entities: PlannedOperation, MaterialOutputGroup, RequestedMaterialOutput, MaterialInputGroup, RequestedMaterialInput.

ProductionSegment contains the elements: ID, ProductionModelProductionSegmentID. ID is an identifier for the ProductionSegment and is of GDT type ProductionSegmentID. ProductionModelProductionSegmentID is an identifier for the referenced ProductionSegment in the ProductionProcessModel and is of GDT type ProductionSegmentID.

PlannedOperation contains the entity ScheduledExecutionPeriod.

PlannedOperation contains the elements: ID, BillOfOperationsPlanningOperationID, SelectedOperationAlternativeID. ID is an identifier for the PlannedOperation and is of GDT type OperationID. BillOfOperationsPlanningOperationID is an identifier for the PlanningOperation in BillOfOperations and is of GDT type OperationID. SelectedOperationAlternativeID is an identifier for the selected planning operation alternative and is of GDT type OperationAlternativeID.

ScheduledExecutionPeriod is a ScheduledExecutionPeriod is the period for which production execution that was scheduled by the supply planning system. It contains the earliest start date at which production may start and the latest end date at which production may end. ScheduledExecutionPeriod is of the type GDT UPPEROPEN_GLOBALDateTimePeriod and has the qualifier Execution. In some implementations, only StartDateTime and EndDateTime are used.

In some implementations, only requested material outputs of a ProductionSegment are part of the message data type MaterialOutputGroup. MaterialOutputGroup contains the elements: ID, MaterialRoleCode, BillOfMaterialVariantID. ID is an identifier for the MaterialOutputGroup and is of GDT type MaterialOutputGroupID. MaterialRoleCode specifies the role of the material to be produced for all grouped material outputs and is of GDT type MaterialRoleCode and, in some implementations, can have a Qualifier of MaterialOutputGroup. BillOfMaterialVariantID is an identifier for the BillOfMaterialVariant in BillOfMaterial and is of GDT type BillOfMaterialVariantID.

In some implementations, If provided, BillOfMaterialVariantID can be unique in the production segment which contains the material input group.

RequestedMaterialOutput contains the elements: ID, MaterialOutputGroupID, PlannedOperationID, MaterialID, SupplyPlanningAreaID, DueDateTime, TotalQuantity, TotalQuantityTypeCode, FixedIndicator. ID is an identifier for the RequestedMaterialOutput and is of GDT type MaterialOutputID. MaterialOutputGroupID is an Identifier for the MaterialOutputGroup to which the requested material output is assigned and is of GDT type MaterialOutputID. PlannedOperationID is an Identifier of the planned operation at which the material output shall occur and is of GDT type OperationID. MaterialID is an identifier for the Material to be produced and is of GDT type ProductID. SupplyPlanningAreaID is an identifier for the SupplyPlanningArea for which the material output is produced and is of GDT type SupplyPlanningAreaID. DueDateTime is a global date and time at which the material output shall be available and is of GDT type GLOBALDateTime and, in some implementations, can have a Qualifier of Due. TotalQuantity is a Quantity to be produced in total and is of GDT type Quantity and, in some implementations, can have a Qualifier of Total. TotalQuantityTypeCode is a Type of the total quantity and is of GDT type QuantityTypeCode and, in some implementations, can have a Qualifier of Total. FixedIndicator is a Indicates whether the requested material output is fixed or not, due to a deviation of the material output data from the result of master data explosion and is of GDT type Indicator and, in some implementations, can have a Qualifier of Fixed.

In some implementations, MaterialOutputGroupID refers to an ID of the entity MaterialOutputGroup. Therefore it is not allowed to use a value for MaterialOutputGroupID that does exist as ID in no MaterialOutputGroup entity. PlannedOperationID refers to an ID of the entity PlannedOperation. Therefore it is not allowed to use a value for PlannedOperationID that does exist as ID in no PlannedOperationID entity. For the MaterialID, the only allowed value for schemeID is "MaterialID".

MaterialInputGroup contains the elements: ID, MaterialRoleCode, BillOfMaterialItemGroupID, BillOfMaterialItemGroupItemID, EngineeringChangeOrderID. ID is an identifier for the MaterialInputGroup and is of GDT type MaterialInputGroupID. MaterialRoleCode specifies the role of the material to be consumed for all grouped material inputs and is of GDT type MaterialRoleCode and, in some implementations, can have a Qualifier of MaterialInputGroup. BillOfMaterialItemGroupID is an identifier for the BillOfMaterialItemGroup in BillOfMaterial and is of GDT type BillOfMaterialItemGroupID. BillOfMaterialItemGroupItemID is an identifier for the BillOfMaterialItemGroupItem in BillOfMaterial and is of GDT type BillOfMaterialItemGroupItemID. EngineeringChangeOrderID is a readable alternative unique identifier of the EngineeringChangeOrder of the BillOfMaterial ItemGroupItemChangeState and is of GDT type EngineeringChangeOrderID.

In some implementations, If one of BillOfMaterialItemGroupID, BillOfMaterialItemGroupItemID and EngineeringChangeOrderID are filled, the other fields can be filled too. In this case the combination of the three elements can be unique in the production segment which contains the material input group. RequestedMaterialInput contains the elements: ID, MaterialInputGroupID, MaterialID, DueDateTime, TotalQuantity, TotalQuantityTypeCode, FixedIndicator. ID is an identifier for the RequestedMaterialInput and is of GDT type MaterialInputID. MaterialInputGroupID is an identifier for the MaterialInputGroup to which the requested material input is assigned and is of GDT type MaterialInputID. PlannedOperationID is an identifier of the planned operation at which the material input shall occur and is of GDT type OperationID. MaterialID is an identifier for the Material that shall be consumed and is of GDT type ProductID. SupplyPlanningAreaID is an identifier for the SupplyPlanningArea from which the Material shall be consumed and is of GDT type SupplyPlanningAreaID. DueDateTime is a global date and time at which the material input shall be consumed and is of GDT type GLOBALDateTime and, in some implementations, can have a Qualifier of Due. TotalQuantity is a quantity that shall be consumed in total and is of GDT type Quantity and, in some implementations, can have a Qualifier of Total. TotalQuantityTypeCode is a type of the total quantity and is of GDT type QuantityTypeCode and, in some implementations, can have a Qualifier of Total. FixedIndicator indicates whether the requested material input is fixed or not, due to a deviation of the material input data from the result of master data explosion and is of GDT type Indicator and, in some implementations, can have a Qualifier of Fixed.

In some implementations, MaterialInputGroupID refers to an ID of the entity MaterialInputGroup. Therefore it is not allowed to use a value for MaterialInputGroupID that does exist as ID in no MaterialInputGroup entity. PlannedOperationID refers to an ID of the entity PlannedOperation. Therefore it is not allowed to use a value for PlannedOperationID that does exist as ID in no PlannedOperationID entity. For the MaterialID, the only allowed value for schemeID is "MaterialID".

In some implementations, an intermediate requested material input can have a corresponding requested material output in the preceding production segment.

The following data types (GDT) may be used: BillOfMaterialItemGroupID, BillOfMaterialItemGroupItemID, BillOfMaterialVariantID, BusinessDocumentMessageHeader, BusinessDocumentMessageHeaderParty, BusinessDocumentMessageID, BusinessTransactionDocumentID, BusinessTransactionDocumentReference, BusinessTransactionDocumentReferenceID, GLOBALDateTime, MaterialInputGroupID, MaterialInputGroupMaterialRoleCode, MaterialInputID, MaterialOutputGroupID, MaterialOutputGroupMaterialRoleCode, MaterialOutputID, OperationAlternativeID, OperationID, PartyID, ProductID, ProductionModelID, ProductionSegmentID, Quantity, QuantityTypeCode, SupplyPlanningAreaID, UPPEROPEN_GLOBALDateTimePeriod, VersionID.

The message data type ProductionRequestConfirmationMessage contains The object Production Request which is contained in the business document and The business information that is relevant for sending a business document in a message. It contains the packages: MessageHeader package and ProductionRequest package. This message data type, therefore, provides the structure for the ProductionRequestConfirmation message type and the operations that are based on it.

MessageHeader Package is a grouping of business information that is relevant for sending a business document in a message. It contains the entity MessageHeader.

MessageHeader is a grouping of business information from the perspective of the sending application including: Information to identify the business document in a message, Information about the sender, Information about the recipient.

The MessageHeader contains: SenderParty and RecipientParty. It is of the type GDT BusinessDocumentMessageHeader, and the following elements of the GDT are used: ID, ReferenceID, CreationDateTime, Reconciliation Indicator.

SenderParty is the partner responsible for sending a business document at business application level. The SenderParty is of the type GDT BusinessDocumentMessageHeaderParty.

RecipientParty is the partner responsible for receiving a business document at business application level. The RecipientParty is of the type GDT BusinessDocumentMessageHeaderParty.

ProductionRequest Package is the grouping of ProductionRequest with its package ProductionSegment.

The ProductionRequest contains the entity: Status. ProductionRequest contains the elements and attributes: ID, actionCode, listCompleteTransmissionIndicator, reconciliationPeriodCounterValue. ID is an identifier for the ProductionRequest and is of GDT type BusinessTransactionDocumentID. actionCode is a coded representation of instructions for processing the ProductionRequest for the recipient of a message. It is of GDT type ActionCode. listCompleteTransmissionIndicator indicates whether all transferred lists of similar elements of the entity ProductionRequest are transferred completely or not. It is of GDT type Indicator and, in some implementations, can have a Qualifier of CompleteTransmission. reconciliationPeriodCounterValue is a reconciliation Period of the Production Request. It is of GDT type CounterValue and, in some implementations, can have a Qualifier of ReconciliationPeriod.

Status contains the elements: ProductionOrderCreationProcessingStatusCode, ProductionOrderListLifecycleStatusCode, CancellationStatusCode. ProductionOrderCreationProcessingStatusCode is a status of the ProductionOrder creation process. Indicates whether the creation of further ProductionOrders for the ProductionRequest is expected or not. It is of GDT type ProcessingStatusCode. ProductionOrderListLifecycleStatusCode is an aggregated lifecycle status of all ProductionOrders that have been created for the ProductionRequest. It is of GDT type LogisticsLifecycleStatusCode. CancellationStatusCode is a cancellation status of the ProductionRequest. Indicates whether the Production Request has been cancelled or not. In some implementations, a cancelled ProductionRequest is not changeable and can be deleted. It is of GDT type CancellationStatusCode.

ProductionSegment Package is the grouping of ProductionSegment with its entities: MaterialOutputGroup, ConfirmedMaterialOutput, MaterialInputGroup, ConfirmedMaterialInput, InventoryItemChange.

ProductionSegment contains the elements and attributes: ID, actionCode, listCompleteTransmissionIndicator. ID is an identifier for the ProductionSegment. It is of GDT type ProductionSegmentID. actionCode is a coded representation of instructions for processing the ProductionSegment for the recipient of a message. It is of GDT type ActionCode listCompleteTransmissionIndicator indicates whether all transferred lists of similar elements of the entity ProductionSegment are transferred completely or not. It is of GDT type Indicator and, in some implementations, can have a Qualifier of CompleteTransmission.

In some implementations, the attribute listCompleteTransmissionIndicator can have the same value in the entities ProductionRequest and ProductionSegment.

MaterialOutputGroup has the same definition as object ProductionRequest/node ProductionSegmentMaterialOutputGroup.

MaterialOutputGroup contains the elements and attributes: ID, MaterialRoleCode, actionCode. ID is an identifier for the MaterialOutputGroup. It is of GDT type MaterialOutputGroupID. MaterialRoleCode specifies the role of the material to be produced for all grouped material outputs. It is of GDT type MaterialRoleCode and, in some implementations, can have a Qualifier of MaterialOutputGroup. actionCode is a coded representation of instructions for processing the MaterialOutputGroup for the recipient of a message. It is of GDT type ActionCode.

ConfirmedMaterialOutput has the same definition as business object ProductionRequest/node ProductionSegmentConfirmedMaterialOutput.

ConfirmedMaterialOutput contains the elements and attributes: ID, MaterialOutputGroupID, PlannedOperationID, MaterialID, SupplyPlanningAreaID, DueDateTime, TotalQuantity, TotalQuantityTypeCode, FulfilledQuantity, FulfilledQuantityTypeCode, actionCode. ID is an identifier for the ConfirmedMaterialOutput. It is of GDT type MaterialOutputID. MaterialOutputGroupID is an identifier for the MaterialOutputGroup to which the confirmed material output is assigned. It is of GDT type MaterialOutputID. PlannedOperationID is an identifier of the planned operation at which the material output shall occur. It is of GDT type OperationID. MaterialID is an identifier for the Material to be produced. It is of GDT type ProductID. SupplyPlanningAreaID is an identifier for the SupplyPlanningArea for which the material output is produced. It is of GDT type SupplyPlanningAreaID. DueDateTime is a global date and time at which the material output shall be available. It is of GDT type GLOBALDateTime and, in some implementations, can have a Qualifier of Due. TotalQuantity is a quantity to be produced in total. It is of GDT type Quantity and, in some implementations, can have a Qualifier of Total. TotalQuantityTypeCode is a type of the total quantity. It is of GDT type QuantityTypeCode and, in some implementations, can have a Qualifier of Total. FulfilledQuantity is a part of total quantity that has already been fulfilled in the production process. It is of GDT type Quantity and, in some implementations, can have a Qualifier of Fulfilled. FulfilledQuantityTypeCode is a type of the fulfilled quantity. It is of GDT type QuantityTypeCode and, in some implementations, can have a Qualifier of Fulfilled. actionCode is a coded representation of instructions for processing the ConfirmedMaterialOutput for the recipient of a message. It is of GDT type ActionCode In some implementations, For the MaterialID, the only allowed value for schemeID is “MaterialID”. The elements MaterialOutputGroupID, MaterialID, SupplyPlanningAreaID, DueDateTime, TotalQuantity, TotalQuantityTypeCode, FulfilledQuantity, FulfilledQuantityTypeCode can be mandatory if the attribute actionCode has the value ‘01’, ‘02’ or ‘04’.

MaterialInputGroup has the same definition as business object ProductionRequest/node ProductionSegmentMaterialInputGroup.

MaterialInputGroup contains the elements and attributes: ID, MaterialRoleCode, actionCode. ID is an identifier for the MaterialInputGroup. It is of GDT type MaterialInputGroupID. MaterialRoleCode specifies the role of the material to be consumed for all grouped material inputs. It is of GDT type MaterialRoleCode and, in some implementations, can have a Qualifier of MaterialInputGroup. actionCode is a coded representation of instructions for processing the MaterialInputGroup for the recipient of a message. It is of GDT type ActionCode.

ConfirmedMaterialInput has the same definition as business object ProductionRequest/node ProductionSegmentConfirmedMaterialInput.

RequestedMaterialInput contains the elements and attributes: ID, MaterialInputGroupID, PlannedOperationID, MaterialID, SupplyPlanningAreaID, DueDateTime, TotalQuantity, TotalQuantityTypeCode, FulfilledQuantity, FulfilledQuantityTypeCode, actionCode. ID is an identifier for the ConfirmedMaterialInput. It is of GDT type MaterialInputID. MaterialInputGroupID is an identifier for the MaterialInputGroup to which the confirmed material input is assigned. It is of GDT type MaterialInputID. PlannedOperationID is an identifier of the planned operation at which the material input shall occur. It is of GDT type OperationID. MaterialID is an identifier for the Material that shall be consumed. It is of GDT type ProductID. SupplyPlanningAreaID is an identifier for the SupplyPlanningArea from which the Material shall be consumed. It is of GDT type SupplyPlanningAreaID. DueDateTime is a global date and time at which the material input shall be consumed. It is of GDT type GLOBALDateTime and, in some implementations, can have a Qualifier of Due. TotalQuantity is a quantity that shall be consumed in total. It is of GDT type Quantity and, in some implementations, can have a Qualifier of Total. TotalQuantityTypeCode is a type of the total quantity. It is of GDT type QuantityTypeCode and, in some implementations, can have a Qualifier of Total. FulfilledQuantity is a part of total quantity that has already been fulfilled in the production process. It is of GDT type Quantity and, in some implementations, can have a Qualifier of Fulfilled. FulfilledQuantityTypeCode is a type of the fulfilled quantity. It is of GDT type QuantityTypeCode and, in some implementations, can have a Qualifier of Fulfilled. actionCode is a coded representation of instructions for processing the MaterialInputGroup for the recipient of a message. It is of GDT type ActionCode.

In some implementations, for the MaterialID, the only allowed value for schemeID is “MaterialID”. The elements MaterialInputGroupID, MaterialID, SupplyPlanningAreaID, DueDateTime, TotalQuantity, TotalQuantityTypeCode, FulfilledQuantity, FulfilledQuantityTypeCode can be mandatory if the attribute actionCode has the value ‘01’, ‘02’ or ‘04’.

InventoryItemChange is a change of inventory which is relevant for inventory planning. This entity is derived from the BO Node “InventoryChangeItem” of the BO “ProductionConfirmation”. This Node is assigned to the BO ProductionRequest via the following Associations: Production Confirmation->ProductionLot->ProductionOrder->ProductionRequest. As no Information from the ProductionLot or from the ProductionOrder is needed in the message, these BO are not included.

InventoryItemChange contains the elements and attributes: ConfirmedMaterialOutputID, ConfirmedMaterialInputID, InventoryMovementDirectionCode, MaterialID, SupplyPlanningAreaID, InventoryRestrictedUseIndicator, Quantity, QuantityTypeCode, reconciliationPeriodCounterValue.

ConfirmedMaterialOutputID is a reference the ConfirmedMaterialOutput which was fulfilled due to the current InventoryItemChange. It is of GDT type MaterialOutputID. ConfirmedMaterialInputID is a reference the ConfirmedMaterialInput which was fulfilled due to the current InventoryItemChange. It is of GDT type MaterialInputID. InventoryMovementDirectionCode is the coded representation of the direction of the inventory movement (inventory receipt, inventory issue). It is of GDT type InventoryMovementDirectionCode. MaterialID identifies the material of which the inventory is changed. It is of GDT type ProductID. SupplyPlanningAreaID identifies the planning-relevant area in which the inventory is changed. It is of GDT type SupplyPlanningAreaID. InventoryRestrictedUseIndicator is an indicator which specifies whether or not inventory is restricted for use for further business processes It is of GDT type Indicator and, in some implementations, can have a Qualifier of InventoryRestrictedUse. Quantity is the quantity of a material by which the inventory is changed. It is of GDT type Quantity. QuantityTypeCode is a type of the quantity. It is of GDT type QuantityTypeCode. reconciliationPeriodCounterValue is a reconciliation period of the main inventory. The separating values of the main inventory are MaterialID and SupplyPlanningAreaID. It is of GDT type CounterValue and, in some implementations, can have a Qualifier of ReconciliationPeriod.

In some implementations, It is not allowed that both ConfirmedMaterialOutputID and ConfirmedMaterialInputID are filled in one InventoryItemChange entity.

The following Data Types (GDTs) may be used: ActionCode, BusinessDocumentMessageHeader, BusinessDocumentMessageHeaderParty, BusinessDocumentMessageID, BusinessTransactionDocumentID, CancellationStatusCode, CounterValue, GLOBALDateTime, Indicator, InventoryMovementDirectionCode, LogisticsLifecycleStatusCode, MaterialInputGroupID, MaterialInputID, MaterialOutputGroupID, MaterialOutputID, OperationID, PartyID, ProcessingStatusCode, ProductID, ProductionSegmentID, Quantity, QuantityTypeCode, SupplyPlanningAreaID, VersionID.

The message data type ProductionRequestConfirmationReconciliationNotification contains The object Production Request which is contained in the business document and The business information that is relevant for sending a business document in a message. It contains the packages: MessageHeader package and ProductionRequest package. This message data type, therefore, provides the structure for the ProductionRequestConfirmationReconciliationNotification message type and the operations that are based on it.

MessageHeader Package is a grouping of business information that is relevant for sending a business document in a message. It contains the entity MessageHeader.

MessageHeader is a grouping of business information from the perspective of the sending application including: Information to identify the business document in a message, Information about the sender, Information about the recipient.

The MessageHeader contains: SenderParty and RecipientParty. It is of the type GDT BusinessDocumentMessageHeader, and the following elements of the GDT are used: ID, ReferenceID, CreationDateTime, ReconciliationIndicator.

SenderParty is the partner responsible for sending a business document at business application level. The SenderParty is of the type GDT BusinessDocumentMessageHeaderParty.

RecipientParty is the partner responsible for receiving a business document at business application level. The RecipientParty is of the type GDT BusinessDocumentMessageHeaderParty.

ProductionRequest Package is the grouping of ProductionRequest with its package ProductionSegment.

ProductionRequest has the same definition as the business object ProductionRequest/node Root.

The ProductionRequest contains the entity: Status. ProductionRequest contains the elements and attributes: ID, reconciliationPeriodCounterValue. ID is an identifier for the ProductionRequest. It is of GDT type BusinessTransactionDocumentID. reconciliationPeriodCounterValue is a reconciliation Period of the Production Request. It is of GDT type CounterValue and, in some implementations, can have a Qualifier of ReconciliationPeriod.

Status has the same definition as business object ProductionRequest/node Root.

Status contains the elements: ProductionOrderCreationProcessingStatusCode, ProductionOrderListLifecycleStatusCode, CancellationStatusCode. ProductionOrderCreationProcessingStatusCode is a status of the ProductionOrder creation process. Indicates whether the creation of further ProductionOrders for the ProductionRequest is expected or not. It is of GDT type ProcessingStatusCode. ProductionOrderListLifecycleStatusCode is an aggregated lifecycle status of all ProductionOrders that have been created for the ProductionRequest. It is of GDT type LogisticsLifecycleStatusCode. CancellationStatusCode is a cancellation status of the ProductionRequest. Indicates whether the Production Request has been cancelled or not. A cancelled ProductionRequest is not changeable and can be deleted. It is of GDT type CancellationStatusCode.

ProductionSegment Package is the grouping of ProductionSegment with its entities: MaterialOutputGroup, ConfirmedMaterialOutput, MaterialInputGroup, ConfirmedMaterialInput In some implementations, if action code is "04", the production request can include at least one production segment.

ProductionSegment has the same definition as business object ProductionRequest/node ProductionSegment. ProductionSegment contains the elements and attributes: ID. ID is an identifier for the ProductionSegment. It is of GDT type ProductionSegmentID.

MaterialOutputGroup has the same definition as business object ProductionRequest/node ProductionSegmentMaterialOutputGroup. MaterialOutputGroup contains the elements and attributes: ID, MaterialRoleCode. ID is an identifier for the MaterialOutputGroup. It is of GDT type MaterialOutputGroupID. MaterialRoleCode specifies the role of the material to be produced for all grouped material outputs. It is of GDT type MaterialRoleCode and, in some implementations, can have a Qualifier of MaterialOutputGroup.

ConfirmedMaterialOutput has the same definition as business object ProductionRequest/node ProductionSegmentConfirmedMaterialOutput. ConfirmedMaterialOutput contains the elements and attributes: ID, MaterialOutputGroupID, PlannedOperationID, MaterialID, SupplyPlanningAreaID, DueDateTime, TotalQuantity, TotalQuantityTypeCode, FulfilledQuantity, FulfilledQuantityTypeCode. ID is an identifier for the ConfirmedMaterialOutput. It is of GDT type MaterialOutputID. MaterialOutputGroupID is an identifier for the MaterialOutputGroup to which the confirmed material output is assigned. It is of GDT type MaterialOutputID. PlannedOperationID is an identifier of the planned operation at which the material output shall occur. It is of GDT type OperationID. MaterialID is an identifier for the Material to be produced. It is of GDT type ProductID. SupplyPlanningAreaID is an identifier for the SupplyPlanningArea for which the material output is produced. It is of GDT type SupplyPlanningAreaID. DueDateTime is a global date and time at which the material output shall be available. It is of GDT type GLOBALDateTime and, in some implementations, can have a Qualifier of Due. TotalQuantity is a quantity to be produced in total. It is of GDT type Quantity and, in some implementations, can have a Qualifier of Total. TotalQuantityTypeCode is a type of the total quantity. It is of GDT type QuantityTypeCode and, in some implementations, can have a Qualifier of Total. FulfilledQuantity is a part of total quantity that has already been fulfilled in the production process. It is of GDT type Quantity and, in some implementations, can have a Qualifier of Fulfilled. FulfilledQuantityTypeCode is a type of the fulfilled quantity. It is of GDT type QuantityTypeCode and, in some implementations, can have a Qualifier of Fulfilled.

In some implementations, for the MaterialID, the only allowed value for schemeID is "MaterialID".

MaterialInputGroup has the same definition as business object ProductionRequest/node ProductionSegmentMaterialInputGroup. MaterialInputGroup contains the elements and attributes: ID, MaterialRoleCode. ID is an identifier for the MaterialInputGroup. It is of GDT type MaterialInputGroupID. MaterialRoleCode specifies the role of the material to be consumed for all grouped material inputs. It is of GDT type MaterialRoleCode and, in some implementations, can have a Qualifier of MaterialInputGroup.

ConfirmedMaterialInput has the same definition as business object ProductionRequest/node ProductionSegment-ConfirmedMaterialInput. RequestedMaterialInput contains the elements and attributes: ID, MaterialInputGroupID, PlannedOperationID, MaterialID, SupplyPlanningAreaID, DueDateTime, TotalQuantity, TotalQuantityTypeCode, FulfilledQuantity, FulfilledQuantityTypeCode. ID is an identifier for the ConfirmedMaterialInput. It is of GDT type MaterialInputID. MaterialInputGroupID is an identifier for the MaterialInputGroup to which the confirmed material input is assigned. It is of GDT type MaterialInputID. PlannedOperationID is an identifier of the planned operation at which the material input shall occur. It is of GDT type OperationID. MaterialID is an identifier for the Material that shall be consumed. It is of GDT type ProductID. SupplyPlanningAreaID is an identifier for the SupplyPlanningArea from which the Material shall be consumed. It is of GDT type SupplyPlanningAreaID. DueDateTime is a global date and time at which the material input shall be consumed. It is of GDT type GLOBALDateTime and, in some implementations, can have a Qualifier of Due. TotalQuantity is a quantity that shall be consumed in total. It is of GDT type Quantity and, in some implementations, can have a Qualifier of Total. TotalQuantityTypeCode is a type of the total quantity. It is of GDT type QuantityTypeCode and, in some implementations, can have a Qualifier of Total. FulfilledQuantity is a part of total quantity that has already been fulfilled in the production process. It is of GDT type Quantity and, in some implementations, can have a Qualifier of Fulfilled. FulfilledQuantityTypeCode is a type of the fulfilled quantity. It is of GDT type QuantityTypeCode and, in some implementations, can have a Qualifier of Fulfilled.

In some implementations, for the MaterialID, the only allowed value for schemeID is "MaterialID".

The following Data Types (GDTs) may be used: BusinessDocumentMessageHeader, BusinessDocumentMessageHeaderParty, BusinessDocumentMessageID, BusinessTransactionDocumentID, CancellationStatusCode, CounterValue, GLOBALDateTime, Indicator, LogisticsLifecycleStatusCode, MaterialInputGroupID, MaterialInputID, MaterialOutputGroupID, MaterialOutputID, OperationID, PartyID, ProcessingStatusCode, ProductID, ProductionSegmentID, Quantity, QuantityTypeCode, SupplyPlanningAreaID, VersionID.

Business Object SiteLogisticsRequest

FIGS. 237-1 through 237-14 illustrate an example SiteLogisticsRequest business object model 237032. Specifically, this model depicts interactions among various hierarchical components of the SiteLogisticsRequest, as well as external components that interact with the SiteLogisticsRequest (shown here as 237000 through 237030 and 237034 through 237092).

A business object SiteLogisticsRequest is an internal request for Site Logistics to prepare and perform, within a certain time period, an outbound, inbound, or internal site logistics process. Site Logistics Request communicates with the requester from Supply Chain Control (Site Logistics Requisition), and triggers the creation of either a site logistics order or a site logistics lot. The business object SiteLogisticsRequest is part of the process component Site Logistics Processing of the LDU LogisticsExecution.

A SiteLogisticsRequest contains information that includes the site logistics segments upon which the request is based, including the material, logistic unit and scheduling information (Segment). The material and logistic unit to be processed by the Site Logistics Request (RequestedItem). The material confirmed for processing, and its quantities that have been acknowledged and fulfilled (ConfirmationItem).

SiteLogisticsRequest is represented by the root node SiteLogisticsRequest 237094. The Business Object Site Logistics Request is involved in the following Process Integration Models that include, Logistics Execution Control_Site Logistics Processing, Service Interface Site Logistics Processing In (A2A), and SiteLogisticsProcessingSiteLogisticsProcessingIn The Service Interface Site Logistics Processing In is part of the following Process Integration Models that include, Logistics Execution Control_Site Logistics Processing This interface contains the operations that notify Logistics Execution Control about the confirmation and fulfilment of the SiteLogisticsRequisition by site logistics.

The service interface between the following two process components, Logistics Execution Control (Site Logistics Requisition business object) and Site Logistics Processing (Site Logistics Request business object) is used to execute site logistics processing. The interface defines the operation to be performed by site logistics processing. The operation to be performed is defined in the inbound message and can be either creation or updating of a site logistics request.

Operation Maintain Site Logistics Request is based on Site Logistics Requisition (A2A)

SiteLogisticsProcessingSiteLogisticsProcessingIn.MaintainSiteLogisticsRequest. The Site Logistics Processing Request Creation or Update operation receives the request for site logistics processing from SiteLogisticsRequisition. It is used when there is a need to maintain a site logistics request. The operation is based on message type SiteLogisticsRequestRequest, derived from business object SiteLogisticsRequest.

The Service Interface SiteLogisticsProcessingOut is part of the following Process Integration Models:

Logistics Execution Control_Site Logistics Processing. This interface contains the operation that notifies the SiteLogisticsRequisition about the progress of the site logistics request.

Operation ConfirmSiteLogisticsRequest confirms receipt of request and acknowledges quantities and delivery dates. Furthermore Logistics Execution Control is informed about inventory changes and fulfillment of Site Logistics Processing. The operation is based on message type SiteLogisticsRequestConfirmation, derived from business object SiteLogisticsRequest.

SiteLogisticsRequest Node Structure

The node structure of Business Object SiteLogisticsRequest describes an internal request for Site Logistics to prepare and perform, within a certain time period, an outbound, inbound, or internal site logistics process. The request contains information about the site logistics segments upon which the request is based, scheduling information, and general administrative data. It also contains the material and logistic unit to be processed, the material confirmed for processing, and the quantities that have been acknowledged and fulfilled.

SiteLogisticsRequest occurs in the following complete and disjoint specializations that include OutboundRequest, InboundRequest, and In-houseRequest. OUTboundRequest is a request for an outbound logistics process to be performed. An InboundRequest is a request for an inbound logistics process to be performed. In-houseRequest is a request for an in-house logistics process to be performed The node SiteLogisticsRequest is of the data type SiteLogisticsRequestElements and is defined by the data types, UUID, ID, ReleasedSiteLogisticsProcessModelIUUID, SiteLogisiticsProcessTypeCode, SiteLogisiticsProcessTypeCode, FollowUpBusinessTransactionDocumentRequirementCode, SystemAdministrativeData, and Status.

A UUID is a GDT of type UUID. The UUID is a universally unique identifier of the SiteLogisticsRequest for referencing purposes. ID is a GDT of type ID. The ID is a unique identifier of the SiteLogisticsRequest. ReleasedSiteLogisticsProcessModelUUID is a GDT of type UUID. The ReleasedSiteLogisticsProcessModelUUID is a universally unique identifier of the ReleasedSiteLogisticsProcessModel, which is assigned in order to reference the specific ReleasedSiteLogisticsProcessModel from which the SiteLogisticsRequest was created as in optional. The SiteLogisiticsProcessTypeCode is a GDT of type SiteLogisiticsProcessTypeCode. Coded representation that specifies the type of logistics execution processing.

The logistics execution processing includes Inbound site logistics processing, Outbound site logistics processing, and In-house site logistics processing. The FollowUpBusinessTransactionDocumentRequirementCode is a GDT of type FollowUpBusinessTransactionDocumentRequirementCode and is a coded representation of the need for a delivery document ranges from 01=Required and 05=Forbidden and is optional. A SystemAdministrativeData if a GDT of type SystemAdministrativeData comprised of administrative data that is stored in a system. This data includes system users and change dates/times. Status is a GDT of type LogisticsLifeCycleStatusCode. The status elements are defined by the data type SiteLogisticsRequestStatus and include SiteLogisticsRequestLifeCycleStatusCode. The current status in the life cycle of the Site Logistics Request.

The node SiteLogisticsRequest is of the data type SiteLogisticsRequestElements. The composition relationships to subordinate nodes exist. A Date has a cardinality of 1:1. Party has a cardinality of 1:n. cardinality of Location 237122 is 1:cn. BusinessTransactionDocumentReference 237176 has a cardinality of 1:cn. Delivery Terms has a cardinality of 1:c. Transportation Terms has a cardinality of 1:c. TotalMeasure 237134 has a cardinality of 1:cn. Material 237144 has a cardinality of 1:cn. Segment 237100 has a cardinality of 1:cn. LogisticPackage 237170 has a cardinality of 1:cn. RequestItem 237096 has a cardinality of 1:cn. ConfirmationItem 237150 has a cardinality of 1:cn. BusinessProcessVariantType 237178 has a cardinality of 1:n. DO: TextCollection has a cardinality of 1:c. DO: AccessControlList 237180 has a cardinality of 1:1. TO: HierarchicalViewElement 237174 has a cardinality of 1:1. The ReleasedSiteLogisticsProcessModel has a cardinality of c:cn.

The following entities can exist for SiteLogisticsRequests. The MainBusinessProcessVariantType has a cardinality of 1:1. Vendor Party has a cardinality of c:c. ProductRecipientParty has a cardinality of c:c. ProductRecipientParty has a cardinality of c:c. CarrierParty has a cardinality of c.c. FreightForwarderParty has a cardinality of c:c. PickupParty has a cardinality of c:c. ResponsibleFunctionalUnit has a cardinality of c:c. ShipFromLocation has a cardinality of c:c. A ShipToLocationSite has a cardinality of c:c. ArrivalTimePoint has a cardinality of c:c. ShippingTimePoint has a cardinality of c:c. PickupTimePoint has a cardinality of c:c. DueDateTimePoint has a cardinality of c:c. StandardRequestItem has a cardinality of c:cn. SparePartRequestItem has a cardinality of c:cn. A ReturnRequestItem has a cardinality of c:cn. ReplenishmentRequestItem has a cardinality of c:cn. CleanUpRequestItem has a cardinality of c:cn. StandardConfirmationItem has a cardinality of c:cn. SparePartConfirmationItem has a cardinality of c:cn. ReturnConfirmationItem has a cardinality of c:cn. ReplenishmentConfirmationItem has a cardinality of c:cn. CleanUpConfirmationItem has a cardinality of c:cn. GrossVolumeMeasure has a cardinality of c:c. NetVolumeMeasure has a cardinality of c:c. GrossWeightMeasure has a cardinality of c:c. NetWeightMeasure has a cardinality of c:c. TareWeightMeasure has a cardinality of c:c. HeightMeasure has a cardinality of c:c. WidthMeasure has a cardinality of c:c. LengthMeasure has a cardinality of c:c. PurchaseOrder has a cardinality of c:c. SalesOrder has a cardinality of c:c. ServiceOrder has a cardinality of c:c. SiteLogisticsRequisition has a cardinality of c:c. LogisticsExecutionRequisition has a cardinality of c:c. InboundDelivery has a cardinality of c:c. BaseBusinessTransactionDocumentReference has a cardinality of c:c. A LogisticUnit has a cardinality of c:cn. IdentifiedLogisticUnit has a cardinality of c:cn. LogisticUnitMaterial has a cardinality of 1:cn. Materials included in a LogisticUnit IdentifiedLogisticUnitMaterial has a cardinality of 1:cn. Materials included in an IdentifiedLogisticUnit UnpackedMaterial has a cardinality of 1:cn. Materials not included in a LogisticPackage. BusinessDocumentFlow has a cardinality of 1:c and enables navigation to the BusinessDocumentFlow instance that the Site Logistics Request takes part in.

The action optionally checks the availability of the Requested Items and allocates the required stock to fulfil the Site Logistics Request (high level allocation) and creates the Confirmation Items. In some implementations, the Site Logistics Request has been created (Request Header and Request Items) and the Life Cycle Status of the Site Logistics Request is “In preparation”. Changes to the object may include confirmation Items are created. In some implementations, the action is called from the UI of the Site Logistic Request or by the Inbound Process Agent.

The Cancel action cancels Site Logistics Request and all Business Objects that have been created afterwards. In some of the implementations, a preconditions can be that the Site Logistics Request has been created (Request Header, Request Items and Confirmation Items). Root and Confirmation Items status and Confirmation Items quantities change. Site Logistics Order and Site Logistics Lot status and quantities change. The Root status is changed to “Cancelled”.

The action checks if the Confirmation Items have been created, builds the Segments that manage further execution. In addition, this action checks if Site Logistics Order is required and if not, creates confirmation items logistics area. In some implementations, the Site Logistics Request has been created (Request Header and Request Items). Confirmation Items have been created. Changes to the object may include segments which are created and optionally confirmation item logistics area nodes are created. In some implementations, the action is called from the UI of the Site Logistic Request or by a determination following the action “Confirm Request Items”. The action closes the request and remaining quantity of any confirmation item will not be fulfilled. In some implementations, the Site Logistics Request has been created and released for execution. Changes to the object may include the rejected quantity for each confirmation item is calculated as the difference between the confirmed and the fulfilled quantity and the reason code is updated. The open quantities in the relevant segment material input and output nodes are set to zero. Changes to other objects: the related Site Logistics Order and Lot are closed. The action elements are defined by the data type: SiteLogisticsRequestForceCompleteActionElements which include LogisticsDeviationReasonCode and is a GDT of type LogisticsDeviationReasonCode. In some implementations, the action is called from the UI of the Site Logistics Request. The action reprocesses the unfulfilled quantity of the confirmation items. In some implementations, the Site Logistics Request has been created and released for execution. Changes to other objects may include new activities in the Site Logistics Lot and the corresponding tasks are created. In some implementations, the action is called from the UI of the Site Logistics Request.

The QueryByInbound Request is defined by the data type SiteLogisticsRequestInboundRequestQueryElements and include, DateArrivalTimePoint, ID, RequestItemBusinessTransactionDocumentReferencePurchaseOrderReference, PartyVendor PartyID, ShipToLocationID, TransportationTermsTransportMeans, RequestItemProductProductID, and SiteLogisticsRequestLifeCycleStatusCode. The DateArrivalTimePoint is of GDT type TimePoint and is optional. The ID is of GDT type BusinessTransactionDocumentID and is optional. The RequestItemBusinessTransactionDocumentReferencePurchaseOrderReference is of GDT type BusinessTransactionDocumentReference and is optional. The PartyVendor PartyID is of GDT type PartyID and is optional. The ShipToLocationID is of GDT type LocationID and is optional. is of GDT type The TransportationTermsTransportMeans is of GDT type TransportMeans and is optional. The RequestItemProductProductID is of GDT type ProductID and is optional. The SiteLogisticsRequestLifeCycleStatusCode is of GDT type LogisticsLifeCycleStatusCode and is optional.

The QueryByOutboundRequest is defined by the data type SiteLogisticsRequestOutboundRequestQueryElements which includes DateShippingTimePoint, ID, RequestItemBusinessTransactionDocumentReferenceSalesOrderReference, PartyProductRecipientPartyID, PartyCarrierPartyID, ShipFromLocationID, TransportationTermsTransportMeans, RequestItemProductProductID, SiteLogisticsRequestLifeCycleStatusCode, and PickupIndicator. The DateShippingTimePoint is of GDT type TimePoint and is optional. ID is of GDT type BusinessTransactionDocumentID and is optional. A RequestItemBusinessTransactionDocumentReferenceSalesOrderReference is of GDT type BusinessTransactionDocumentReference and is optional. PartyProductRecipientPartyID is of GDT type PartyID and is optional. PartyCarrierPartyID is of GDT type PartyID and is optional. ShipFromLocationID is of GDT type LocationID and is optional. TransportationTermsTransportMeans is of GDT type TransportMeans and is optional. A RequestItemProductProductID is of GDT type ProductID and is optional. SiteLogisticsRequestLifeCycleStatusCode is of GDT type LogisticsLifeCycleStatusCode and is optional. PickupIndicator is of GDT type Indicator and is optional.

The QueryByInternalRequest is defined by the data type SiteLogisticsRequestInternalRequestQueryElements which includes DateDueTimePoint, ID, DeliveryTermsPriorityCode, RequestItemProductProductID, RequestItemProductProductID, and SiteLogisticsRequestLifeCycleStatusCode. DateDueTimePoint is of GDT type TimePoint and is optional. ID is of GDT type BusinessTransactionDocumentID and is optional. DeliveryTermsPriorityCode is of GDT type BusinessTransactionPriority Code and is optional. RequestItemProductProductID is of GDT type ProductID and is optional. SiteLogisticsRequestLifeCycleStatusCode is of GDT type LogisticsLifeCycleStatusCode and is optional.

QueryByBaseBusinessTransactionDocumentReference is defined by data type SiteLogisticsRequestBaseBusinessTransactionDocumentReferenceQueryElements which includes a BaseBusinessTransactionDocumentReference. BaseBusinessTransactionDocumentReference is of GDT type BusinessTransactionDocumentReference/BusinessProcessVariantType and is optional.

A BusinessProcessVariantType defines the character of a business process variant of the Site Logistics Request. It represents a typical way of processing of a Site Logistics Request within a process component from a business point of view. A Business Process Variant is configuration of a Process Component. A Business Process Variant belongs exactly to one process component.

A process component is a software package that realizes a business process and exposes its functionality as services. The functionality contains business transactions. A process component contains one or more semantically related business objects. A business object belongs to exactly one process component.

The elements located at the node BusinessProcessVariantType are defined by the data type: SiteLogisticsRequest RequestBusinessProcessVariantTypeElements, derived from BusinessProcessVariantTypeElements (Template). These elements include BusinessProcessVariantTypeCode and MainIndicator. The BusinessProcessVariantTypeCode is of GDT type BusinessProcessVariantTypeCode and is a coded representation of a business process variant type of a SiteLogisticsRequestBusinessProcessVariantType. The MainIndicator is of GDT type Indicator, Qualifier: Main and specifies whether the current BusinessProcessVariantTypeCode is the main one or not.

A Date is a time specification (based on the calendar) for dates relevant for the SiteLogisticsRequest. Date 237102 is of the data type: SiteLogisticsRequestDateElements consisting of TimePointRoleCode. The SiteLogisticsRequest is of GDT type TimePointRoleCode. The codes include ArrivalTimePoint, ShippingTimePoint, PickupTimePoint, and DueDateTimePoint. ArrivalTimePoint describes the time that the goods arrive. ShippingTimePoint describes the time that the goods are shipped. PickupTimePoint describes the time that the goods are collected. TimePoint is of GDT type TimePoint and refers to the Time point period with a relevance to the SiteLogisticsRequest. A Party is an individual, organization, or business partner group (inside or outside of the company) that is involved in the SiteLogisticsRequest, for example, a supplier or a goods recipient.

The node Party 237110 is of the data type: SiteLogisticsRequestPartyElements that includes PartyID, PartyUUID, PartyTypeCode, RoleCategoryCode, Role Code, Address Reference, AddressHostUUID, AddressHostTypeCode, MainIndicator and Name. The PartyID identifier of the Party in this PartyRole in the business document or the master data object. PartyID is of GDT type PartyID and is optional. PartyUUID is of GDT type UUID identifier and is unique identifier for a business partner, the organizational unit, or their specializations and is optional. PartyTypeCode is of GDT type BusinessObjectTypeCode, restricted code list for party which is a type of business partner, organizational unit, or their specializations referenced by the attribute PartyUUID and is optional. RoleCategoryCode is of GDT type PartyRoleCategoryCode and is optional. Some of the RoleCategoryCodes include Vendor Party, ProductRecipientParty, FreightForwarderParty, CarrierParty, PickupParty, and ResponsibleFunctionalUnit.

A RoleCode is of GDT type PartyRoleCode which is in the business document or master data object and is optional.

AddressReference is of GDT type PartyAddressReference which is the information to reference the address of a party and is optional. AddressHostUUID is of GDT type UUID.Qualifier: Address Host which is a unique identifier for the address of the business partner, the organizational unit, or their specializations and is optional. AddressHostTypeCode is of GDT type AddressHostTypeCode which is coded representation of the Address host type and is optional.

A MainIndicator is of GDT type Indicator, Qualifier: Main which indicates whether or not a Party is emphasized in a group of parties with the same PartyRole and is optional. Name is of GDT type LONG_Name which indicates the name of the party and is optional. PartyContactParty 237112 has a cardinality of 1:cn. PartyStandardIdentification 237120 has a cardinality of 1:cn. PartyAddress 237118 has a cardinality of 1:c and describes the composition to Dependent Object Address. Inbound Aggregation Relationships described from business object Party as referenced Party in master data has a cardinality of c:cn.

A UsedAddress has a cardinality of c:cn and can be the address used for the Party—a referenced address of the master data object, or The PartyAddress used via the composition relationship. A PartyAddressHostTypeCode element is used to determine the composition relationship. For example, The node ID of the node in the master data object is determined via the PartyTypeCode, PartyAddressUUID and PartyAddressHostTypeCode elements that has the composition relationship to the DO address that is to be represented by the TO UsedAddress. An example of a master address BusinessObjectTypeCode, BusinessObjectNodeTypeCode and Node ID of its own Party node. These are required in case changes to the TO UsedAddress take place. In this case, the master data address is copied by the TO UsedAddress, the changes take place to the copy, and a corresponding DO Address is created at the Party via the PartyAddress composition relationship.

In another example, the TO UsedAddress is informed of the BusinessObjectTypeCode, BusinessObjectNodeTypeCode and Node ID of its own Party. Additionally, information is provided that this is not an example of a referenced address. In this case, the TO UsedAddress represents the DO address used at the Party via the PartyAddress composition relationship. A PartyStandardIdentification is a standardized identifier for the party. PartyStandardIdentification is of the data type: SiteLogisticsRequestPartyStandardIdentificationElements which includes PartyStandardID and is of GDT type PartyStandardID and refers to the identification of the party.

A DO PartyAddress is the Dependent Object Address which contains the document-specific address of the party. The data is defined by the Dependent Object Address. PartyContactParty is a natural person or organizational unit that can be contacted for the party. PartyContactParty is of the data type: SiteLogisticsRequestPartyContactPartyElements and includes PartyID, PartyUUID, PartyTypeCode, AddressReference, AddressHostUUID, AddressHostTypeCode, MainIndicator, PartyRole, and Name.

A PartyID is of GDT type PartyID which is the identifier of the contact in this PartyRole in the business document or the master data object and is optional. PartyUUID is of GDT type UUID which is unique identifier of the contact in this PartyRole in the business document or the master data object and is optional. PartyTypeCode is of GDT type BusinessObjectTypeCode, restricted code list for contact which describes the type of the business partner, organizational unit, or their specializations referenced by the attribute ContactUUID and is optional. AddressReference is of GDT type PartyAddressReference which is the information to reference the address of a party and is optional. AddressHostUUID is of GDT type UUID. Qualifier: Address Host which is a unique identifier for the address of the business partner, the organizational unit or their specializations and is optional. AddressHostTypeCode is of GDT type AddressHostTypeCode which is a coded representation of the Address host type and is optional. MainIndicator is of GDT type Indicator, Qualifier: Main which indicates whether or not a PartyContactParty is emphasized in a group of contact parties with the same PartyRole and is optional. Name is of GDT type Long_Name which references the name of the PartyContact Party and is optional.

A PartyContactPartyAddress 237114 has a cardinality of 1:c and describes the composition to dependent Object Address. Party referenced Party in master data has a cardinality of c:cn. UsedAddress has a cardinality of c:cn which describes a Party. This may be the referenced address of a master data object or an address referenced via the composition to PartyAddress. DO PartyContactPartyAddress is a Dependent Object Address which contains the document-specific address of the contact party. A Location is the source or destination location for goods or materials to be moved within the site, as specified by the requester. A Location may keep references to a business object Location, to the AddressInformation address of the TO Party which is representative of a business partner and an organizational unit, to a business partner or one of its specializations, to the address of the BO InstalledBase and to the BO InstallationPoint.

A Location is of the data type: SiteLogisticsRequestLocationElements and includes the LocationID, Location UUID, AddressReference, AddressHostUUID, BusinessObjectTypeCode, AddressHostTypeCode, PartyID, InstalledBaseID, InstallationPointID, RoleCode, and RoleCategoryCode. LocationID is of GDT type LocationID which identifies the BO Location in this LocationRole and is optional. LocationUUID is of GDT type UUID which identifies the BO location. AddressReference is of GDT type LocationAddressReference which is the information to reference the address of a Business Object and is optional. AddressHostUUID is of GDT type UUID which identifies the address of the business partner, the organizational unit or its specializations, the BO InstalledBase or the BO InstallationPoint and is optional. BusinessObjectTypeCode is of GDT type BusinessObjectTypeCode in which the coded representation of the BusinessObjectTypes of the business object, in which the address referenced in ElementLocationAddressUUID is integrated as a Dependent Object and is optional.

An AddressHostTypeCode is of GDT type AddressHostTypeCode which is the coded representation of the address host type of the address referenced by AddressUUID or the address included via the LocationAddress composition and is optional. PartyID is of GDT type PartyID which identifies a Party, representative of a business partner or an organizational unit which includes the address referenced via AddressUUID and is optional. InstalledBaseID is of GDT type InstalledBaseID which identifies the BO Installed Base and is optional. InstallationPointID is of GDT type InstallationPointID, which identifies a BO Installation Point and is optional. A RoleCode is of GDT LocationRoleCode referring to the location role of the location. RoleCategoryCode is of GDT type LocationRoleCategoryCode and is optional. The Location data codes include ShipFromLocation and ShipToLocation. LocationStandardIdentification 237124 has a cardinality of 1:c. LocationAddress 237126 has a cardinality of 1:c and refers to the composition to Dependent Object Address 237162.

The Root can include the UsedAddress. UsedAddress has a cardinality of c:cn. The UsedAddress is the address for Location. This may be the referenced address of a master data object or an address referenced via the composition to LocationAddress.

In certain implementations, the following integrity conditions are checked. There can be either just one aggregation or composition relationship to the dependent object. If there is an aggregation relationship to the BO Location, the LocationID attribute is filled with the ID of BO Location. All other ID fields (PartyID, InstalledBaseID and InstallationPointID) remain blank. If the address of a party is referenced (representative of a BusinessPartners or an OrganisationalCentre), the PartyID attribute is filled with the ID of the Party. All other ID fields (LocationID, InstalledBaseID and InstallationPointID) remain blank. The reference is kept in the AddressUUID attribute. If there is an aggregation relationship to the address of an InstalledBase, the InstalledBaseID attribute is filled with the ID of the InstalledBase. All other ID fields (LocationID, PartyID and InstallationPointID) remain blank. The reference is kept in the AddressUUID InstalledBaseAddressInformationUUID attribute. If there is an aggregation relationship to the address of an InstallationPoint, the InstallationPointID attribute is filled with the ID of the InstallationPoint. All other ID fields (LocationID, PartyID and InstalledBaseID) remain blank. The reference is kept in the AddressUUID attribute. If an address is referenced via the element AddressUUID, then elements AddressBusinessObjectTypeCode and AddressHostTypeCode can also be filled.

A LocationStandardIdentification is the Standardized identification of a location. LocationStandardIdentification is of the data type: SiteLogisticsRequestLocationStandardIdentificationElements which includes LocationStandardID. LocationStandardID is of GDT type LocationStandardID which refers to the standardized identification of a Location. A DO LocationAddress is the dependent object Address includes the data necessary to describe a physical or logical location.

A BusinessTransactionDocumentReference refers to a different business document related to a Site Logistics Request-BusinessTransactionDocumentReference is of the data type SiteLogisticsRequestBusinessTransactionDocumentReferenceElements which includes BusinessTransactionDocumentReference and is of GDT type BusinessTransactionDocumentReference and which is a clear reference to other business documents that are important for the SiteLogisticsRequest. A BusinessTransactionDocumentRelationshipRoleCode is of GDT type BusinessTransactionDocumentRelationshipRoleCode which is coded representation of the role the referenced document or referenced document item plays in relation to the SiteLogisticsRequest and is optional.

There may be a number of Inbound Aggregation Relationships that may include PurchaseOrder, SalesOrder, LogisticsExecutionRequisition, and SiteLogisticsRequisition. PurchaseOrder may have a cardinality of c:cn. SalesOrder may have a cardinality of c:cn. LogisticsExecutionRequisition may have a cardinality of c:cn. SiteLogisticsRequisition may have a cardinality of c:cn.

DeliveryTerms refers to the delivery conditions and agreements formulated when placing an order. These conditions and agreements should be effective for the execution of the request and/or for the necessary services and activities needed for this request. DeliveryTerms 237136 is of the data type SiteLogisticsRequestDeliveryTermsElements (derived from GDT DeliveryTerms) and includes PriorityCode referring to the priority of the deliveries and is optional. contract formulations for delivery conditions that correspond to the rules defined by the International Chamber of Commerce (ICC) and are optional. PartialDeliveryControlCode which is coded representation to control the partial delivery. The PartialDeliveryControlCode indicates whether to allow partial deliveries, a complete delivery at the requested date or a complete delivery and is optional. A text The transportation conditions and agreements formulated when placing an order. These conditions and agreements should be effective for the transport of the request and/or for the necessary services and activities needed for this transport. TransportationTerms 237138 is of the data type: SiteLogisticsRequestTransportationTermsElements (derived from GDT TransportationTerms) which includes a TransportModeCode, and TransportMeans. representation of the agreed/defined services in terms of the transport of the delivery (as part of the ordered service). For example, refrigeration or overnight delivery. TransportModeCode is of GDT type TransportModeCode which is coded representation of the mode of transportation used for delivery and is optional. TransportMeans is of GDT type TransportMeans which is a means of transporting goods to or from the warehouse site and is optional. A Description is of GDT type LONG_Description, Qualifier: TransportationTerms which is a natural-language representation of the characteristics of the transport conditions of a SiteLogisticsRequest and is optional.

A DO: TextCollection 237106 is the Dependent Object TextCollection is a natural language text linked to the SiteLogisticsRequest that supports the site logistics processing. DO: AccessControlList is a list of access groups that have access to an Employment during a validity period.

TotalMeasure is the total measurements of the SiteLogisticsRequest that is calculated from the physical grouping of the material. TotalMeasure is of the data type SiteLogisticsRequestTotalMeasureElements consisting of Measure, MeasureTypeCode, and QuantityOriginCode.

A Measure is a GDT of type Measure. Physical measurement with the corresponding unit of measure.

A MeasureTypeCode is a GDT of type MeasureTypeCode. Coded representation of the type of a measure. QuantityOriginCode is a GDT of type QuantityOriginCode. Coded representation of the origin of the measure value.

Material is the identification, description, and classification of the material requested to be processed in the SiteLogisticRequest. For example, the material includes both a material to be processed and a packing material (load carrier or auxiliary packing material) in the SiteLogisticRequest. It can contain the material in one or more handling units or logistics units. The node Material is of the data type: SiteLogisticsRequestMaterialElements which is the ProductUUID and is derived from the GDT type UUID which is an identifier of the material in the site logistics Request and is optional. ProductID is of GDT type ProductID which identifies the material in the site logistics Request and is optional. A RequestItemUUID is of GDT type UUID which identifies the Item, which is assigned to the Material and is optional. LogisticPackageUUID is of GDT type UUID and identifies the Logistic Package node to which the material refers and is optional. MaterialQuantity 237146 has a cardinality of 1:n. MaterialMeasure 237148 has a cardinality of 1:cn. RequestedQuantity has a cardinality of c:c. GrossVolumeMeasure has a cardinality of c:c.

NetVolumeMeasure has a cardinality of c:c. GrossWeightMeasure has a cardinality of c:c. NetWeightMeasure has a cardinality of c:c. TareWeightMeasure has a cardinality of c:c. HeightMeasure has a cardinality of c:c. WidthMeasure has a cardinality of c:c. LengthMeasure has a cardinality of c:c.

There are a number of Inbound Aggregation Relationships that may include Material, LogisticPackage, and RequestItem. Material may have a cardinality of c:cn. LogisticPackage may have a cardinality of c:cn. LogisticPackage assigns one or several materials of the Material node to a LogisticPackage. From the RequestItem node, a RequestItem may have a cardinality of c:cn. RequestItem assigns one or several materials of the Material node to a RequestItem. Not every material of the Material node is assigned to a RequestItem. In some implementations, either RequestItemUUID or LogisticPackageUUID can be provided.

MaterialQuantity is the quantity of material required for the delivery. The material can be managed in several, non-transferable units of measure (multiple transaction quantity (MTQ) or catch weight). The node MaterialQuantity is of the data type SiteLogisticRequestMaterialQuantityElements which includes Quantity, QuantityTypeCode, QuantityRoleCode, and QuantityOriginCode. A Quantity is of GDT Quantity which refers to the quantity with the corresponding unit of measure. QuantityTypeCode is of GDT type QuantityTypeCode which is coded representation of the type of a quantity. QuantityRoleCode is of GDT type QuantityRoleCode which is coded representation of the role of quantity which includes Requested Quantity and QuantityOriginCode derived from the GDT QuantityOriginCode which is coded representation of the origin of the quantity value and is optional. Coded representation of the role of a quantity. In some implementations, the complete requested quantity of all materials from Material that refer to a material in the RequestItemProduct 237116 can correspond to the requested quantity in the RequestItem.

MaterialMeasure is the measure of material required for the delivery. MaterialMeasure is of the data type SiteLogisticsRequestMaterialMeasureElements which includes Measure, MeasureTypeCode, QuantityOriginCode, and LogisticPackage. Measure is of GDT type Measure which is the physical measure with the corresponding unit of measure. MeasureTypeCode is of GDT type MeasureTypeCode which is coded representation of the type of a measure. QuantityOriginCode is of GDT QuantityOriginCode which is coded representation of the origin of the measure value and is optional. LogisticPackage is a physical unit consisting of the material to be packed and packaging material (load carrier, additional packaging material). LogisticPackage includes a Logistics Unit, for example a box. In can also include an identifiable physical logistic unit, for example, a clearly labeled container or palette.

LogisticPackage is of the data type SiteLogisticsRequestLogisticPackageElements which includes UUID, LogisticUnitID, TypeCode, LogisticUnitUUID, IdentifiedLogisticUnitUUID, ParentLogisticPackageUUID, Quantity, and QuantityTypeCode. UUID is of GDT type UUID which is identification of the LogisticPackage node for referencing purpose. LogisticUnitID is of GDT type LogisticUnitID which is Identification of a logistic unit. Not filled for Identified Logistic Unit and is optional. TypeCode is of GDT type LogisticPackageTypeCode which is the coded representation of the type of a packing unit as it is used in logistics for storing and shipping goods. Logistic Unit is a non-identifiable, physical, logistical unit (for example, boxes. Identified Logistic Unit: An identifiable, physical unit (for example, a clearly labeled container or palette). LogisticUnitUUID is of GDT type UUID which identifies the Logistic Unit and is optional. IdentifiedLogisticUnitUUID is of GDT type UUID which identifies the Identified Logistic Unit and is optional. ParentLogisticPackageUUID is a GDT type UUID which identifies the parent LogisticPackage and is optional. Quantity is of GDT type UUID which is the number of The number of Logistic Units (LUs). For Identified Logistics Units the number is always 1. A QuantityTypeCode is of GDT type QuantityTypeCode which is representation of the type of quantity.

A LogisticPackageMeasure 237172 has a cardinality of 1:cn. GrossVolumeMeasure has a cardinality of c:c. NetVolumeMeasure has a cardinality of c:c. GrossWeightMeasure has a cardinality of c:c. NetWeightMeasure has a cardinality of c:c. TareWeightMeasure has a cardinality of c:c. HeightMeasure has a cardinality of c:c. WidthMeasure has a cardinality of c:c. LengthMeasure has a cardinality of c:c.

There may be a number of Inbound Aggregation Relationships that include LogisticUnit, IdentifiedLogisticUnit, LogisticPackage, and IdentifiedLogisticUnits. LogisticUnit may have a cardinality of c:cn. IdentifiedLogisticUnit may have a cardinality of c:cn. LogisticPackage may have a cardinality of c:cn. The hierarchy of the LogisticPackages follows. In some implementations, the specialization LogisticUnit (LU) cannot contain any LUs or IdentifiedLogisticUnits within it. That is, in some implementations, it cannot be nested. In some implementations, the specialization IdentifiedLogisticUnit can contain within itself more IdentifiedLogisticUnits or LUs. That is, in some implementations, it can be nested.

From node Material, a Material may have a cardinality of c:cn and is contained in a LogisticPackage. In certain implementations, either LogisticUnitUUID or IdentifiedLogisticUnitUUID can be filled. LogisticPackageMeasure is the measure required for the Logistic Unit. LogisticPackageMeasure is of the data type SiteLogisticsRequestLogisticPackageMeasureElements which includes Measure, MeasureTypeCode, and QuantityOriginCode. Measure is of GDT type Measure which is a physical measurement with the corresponding unit of measure. MeasureTypeCode is of GDT type MeasureTypeCode which is coded representation of the type of a measure. QuantityOriginCode is of GDT type QuantityOriginCode which is a coded representation of the origin of the measure value and is optional. A Segment specifies a part of a site logistics process which is to be performed in order to fulfill a Site Logistics Request.

The node Segment is of the data type: SiteLogisticsRequestSegmentElements which includes UUID, ID, ReleasedSiteLogisticsProcessModelProcessSegmentUUID, PrecedingProcessSegmentUUID, AutomaticProcessingIndicator, and Status. UUID is of GDT type UUID which identifies a segment for referencing purposes. ID is of GDT type SiteLogisticsRequestSegmentID which identifies a segment of the SitLogisticsRequest. ReleasedSiteLogisticsProcessModelProcessSegmentUUID is of GDT UUID which identifies the ProcessSegment in the ReleasedSiteLogisticsProcessModel from which the Segment was created. PrecedingProcessSegmentUUID is of GDT UUID which identifies the segment that preceeds the segment currently being processed. AutomaticProcessingIndicator is of GDT type Indicator, Qualifier: AutomaticProcessing which indicates whether the segment shall be processed automatically. Status is of the GDT type NOTRELEASEDRELEASED_ReleaseStatusCode. SiteLogisticsRequestSegment is defined by the data type SiteLogisticsRequestSegmentStatus and includes the ReleaseStatusCode which indicates if the Segment is released for execution or not.

There may be a number of Inbound Aggregation Relationships that include ProcessSegment, Predeccessor Segment, SiteLogisticLot, and SiteLogisticOrder. ProcessSegment may have a cardinality of 1:1 and refers to the Process Segment from which the Segment takes its execution instructions. Predeccessor Segment has a cardinality of 1:c which is the preceding segment of the segment currently being processed. SiteLogisticsLot has a cardinality of 1:c in which the association is implemented in the target. SiteLogisticsOrder has a cardinality of 1:cn in which the association is implemented in the target. In certain implementations, the referenced ProcessSegment can be a subordinate of the ReleasedSiteLogisticsProcessModel instance that is referenced by the SiteLogisticsRequest root.

The Release for execution action creates and releases a Site Logistics Order. In some implementations, if an order is required, the action creates and releases a Site Logistics Order and released a Site Logistics Lot created by the order. If an order is not required, the action creates and releases a Site Logistics Lot. In some implementations, the Site Logistics Request has been created (e.g., using Request Header and Request Items). In some implementations, Confirmation Items have been created and a Segment has been created. Changes to other objects may include the change that a Site Logistics Order or Site Logistics Lot is created and released. In some implementations, the action is called from the UI of the Site Logistic Request or by a determination if the segment is automatically released.

The Release for planning action creates a Site Logistics Order and may be relevant if order is required. In some implementations, the Site Logistics Request has been created (Request Header and Request Items). Both Confirmation Items and Segment has been created. Changes to other objects may include Site Logistics Order is created. In some implementations, action is called from the UI of the Site Logistic Request or by a determination if the segment is automatically released.

RequestItem is a request to execute a specific site logistics process for a certain product. A site logistics process can be a standard inbound, return inbound, standard outbound, replenishment, or clean-up process. SiteLogisticsRequestItem includes Standard, Return, Replenishment, and Clean-Up. A Standard is an item to be delivered from the site to the customer or from the supplier to the site. A Return is an item to be returned to the site from the customer. A Replenishment is an item to be replenished in a storage location in the site. A Clean-Up is an item to be cleaned up in a storage location in the site.

The node RequestItem is of the data type: SiteLogisticsRequest RequestItem Elements which includes UUID, ID, TypeCode, SystemAdministrativeData, SupplyPlanningAreaID, SupplyPlanningAreaUUID, RequestedQuantity, RequestedQuantityTypeCode, RequestedQuantityOriginCode, UUID is of GDT type UUID which identifies the RequestItem for referencing purposes. ID is of GDT type BusinessTransactionDocumentItemID which identifies the RequestItem of the Site Logistics Request. TypeCode is of GDT type BusinessTransactionDocumentItemTypeCode which is coded representation that specifies the type of the RequestItem. The codes include SiteLogisticsStandardItem, SiteLogisticsSparePartItem, SiteLogisticsReturnItem, SiteLogisticsReplenishmentItem, and SiteLogisticsCleanupItem.

A SystemAdministrativeData is of GDT type SystemAdministrativeData that is stored in a system. This data includes system users and change dates/times. SupplyPlanningAreaID is of GDT type SupplyPlanningAreaID and is assigned in order to specify the SupplyPlanningArea for the RequestItem. SupplyPlanningAreaUUID is of GDT type UUID which identifies the supply planning area. A RequestedQuantity is of GDT type which is the quantity with the corresponding unit of measure. RequestedQuantityTypeCode is of GDT type QuantityTypeCode which is coded representation of the type of quantity. RequestedQuantityOriginCode is of GDT type which is coded representation of the origin of the quantity value. Status the SiteLogisticsRequestRequestItem. The status elements are defined by the data type: SiteLogisticsRequestRequestItemStatus which includesDeliveryBlockingStatusCode.

Indicates if the Request Item is blocked for delivery or not.

A CancellationStatusCode is of GDT type CancellationStatusCode which indicates if the Request Item is cancelled or not. RequestItemDate 237104 has a cardinality of 1:n. RequestItemLocation 237128 has a cardinality of 1:cn. RequestItemLogisiticsArea 237108 has a cardinality of 1:c. RequestItemBusinessTransactionDocumentReference 237182 has a cardinality of 1:cn. RequestItemDeliveryTerms 237140 has a cardinality of 1:c. RequestItemTransportationTerms 237142 has a cardinality of 1:c. RequestItemProduct has a cardinality of 1:1. DO: RequestItemTextCollection 237098 has a cardinality of 1:c. RequestItemInformation 237184 has a cardinality of 1:c.

RequestItemArrivalPeriod has a cardinality of c:c. RequestItemAvailabilityPeriod has a cardinality of c:c. RequestItemPositioningPeriod has a cardinality of c:c. RequestItemIssuePeriod has a cardinality of c:c. RequestItemPickupPeriod has a cardinality of c:c. RequestItemDueDatePeriod has a cardinality of c:c. RequestItemShipToLocation has a cardinality of 1:c. RequestItemShipFromLocation has a cardinality of 1:c. Unpacked Material has a cardinality of 1:c.

RequestItemBaseBusinessTransactionDocumentReferenceItem has a cardinality of c:c. RequestItemPurchaseOrderItem has a cardinality of c:c. RequestItemSalesOrderItem has a cardinality of c:c. RequestItemLogisticsExecutionRequisitionItem has a cardinality of c:c. RequestItemSiteLogisticsRequisitionRequestItem has a cardinality of c:c. RequestItemServiceOrderItem has a cardinality of c:c. RequestItemInboundDeliveryItem has a cardinality of c:c.

A ConfirmationItem has a cardinality of c:cn. DefaultConfirmationItem has a cardinality of c:c (for UI in FRII). BusinessDocumentFlow has a cardinality of 1:c and enables navigation to the BusinessDocumentFlow instance that the Site Logistics Request Item takes part in. SupplyPlanningArea has a cardinality of c:cn. CreationIdentity has a cardinality of 1:cn. LastChangeIdentity has a cardinality of 1:cn and provides a list of all the request items for the execution of an inbound logistics process which satisfy the selection criteria specified by the query elements. The query elements are defined by the data type: SiteLogisticsRequestInboundRequestItemQueryElements which include RequestID, RequestLifeCycleStatusCode, RequestItemID, RequestItemTypeCode, RequestItemArrivalCode, RequestItemArrivalPeriod, RequestItemShipToLocationID, and RequestItemProductID. RequestID is of GDT type BusinessTransactionDocumentID and is optional. RequestLifeCycleStatusCode is of GDT type LogisticsLifeCycleStatusCode and is optional. A RequestItemID is of GDT type BusinessTransactionDocumentID and is optional. RequestItemTypeCode is of GDT typeBusinessTransactionDocumentItemTypeCode and is optional. RequestItemArrivalPeriod is of GDT type TimePointPeriod and is optional. RequestItemShipToLocationID is of GDT type LocationID and is optional. and is optional.

QueryByInboundRequest provides a list of the request items for the execution of an outbound logistics process which satisfy the selection criteria specified by the query elements. The query elements are defined by the data type: SiteLogisticsRequestOutboundRequestItemQueryElements and include, RequestID, RequestLifeCycleStatusCode, RequestItemID, RequestItemTypeCode, RequestItemIssuePeriod, RequestItemShipFromLocationID, PickupIndicator. RequestID is of GDT type BusinessTransactionDocumentID and is optional. RequestLifeCycleStatusCode is of GDT type LogisticsLifeCycleStatusCode and is optional. RequestItemID is of GDT type BusinessTransactionDocumentID and is optional. RequestItemTypeCode is of GDT type BusinessTransactionDocumentItemTypeCode and is optional. RequestItemIssuePeriod is of GDT type TimePointPeriod and is optional. RequestItemShipFromLocationID is of GDT type LocationID and is optional. and is optional. PickupIndicator is of GDT type and is optional.

QueryByOutboundRequest provides a list of the request items for the execution of an internal logistics process which satisfy the selection criteria specified by the query elements. The query elements are defined by the data type: SiteLogisticsRequestInternalRequestItemQueryElements which include, RequestID, RequestLifeCycleStatusCode, RequestItemID, RequestItemTypeCode, and RequestID is a GDT of type BusinessTransactionDocumentID and is optional. RequestLifeCycleStatusCode is a GDT of type LogisticsLifeCycleStatusCode and is optional. RequestItemID is a GDT of type BusinessTransactionDocumentID and is optional. RequestItemTypeCode is a GDT of type BusinessTransactionDocumentItemTypeCode and is optional. and is optional.

The query elements are defined by the data type SiteLogisticsRequestRequestItem-BaseBusinessTransactionDocumentReferenceQueryElements and include BaseBusinessTransactionDocumentReference derived from GDT of type BusinessTransactionDocumentReference and is optional. RequestItemDate is a time specification (based on the calendar) for dates relevant for the requested item.

The node RequestItemDate is of the data type SiteLogisticsRequestRequestItemDateElements and includes PeriodRoleCode derived from the GDT of type PeriodRoleCode which is a coded representation of the semantic of a time point period in the RequestItem. The codes that are used are ArrivalPeriod, AvailabilityPeriod, PositioningPeriod, IssuePeriod, PickUpPeriod, and DueDatePeriod. ArrivalPeriod is the Period that the goods arrive. An AvailabilityPeriod refers to the period that is needed to make the material available. A PositioningPeriod refers to the Period that is needed to make the material available in the warehouse. IssuePeriod is the Period that the goods are issued. A PickUpPeriod is the Period that the goods are collected. DueDatePeriod is of type GDT: TimePoint and is optional. TimePointPeriod is a GDT type of TimePointPeriod which describes the Time point period with a relevance to the RequestItem and is optional. AvailabilityPeriod may occur in inbound case or outbound-return case. PositioningPeriod may occur in outbound case or inbound-return case.

RequestItemLocation is a source or destination location for a good or material that is to move by site logistics according to the SiteLogisticsRequestRequestItem. A Location may keep a reference to a business object Location. A Location may keep a reference to the AddressInformation address of the TO Party (representative of a business partner and an organizational unit). A Location may keep a reference to a business partner or one of its specializations (for example customer or supplier), which is not AddressInformation. A Location may keep a reference to the address of the BO InstalledBase. A Location may keep a reference to the address of the BO InstallationPoint.

The node RequestItemLocation is of the data type SiteLogisticsRequestRequestItemLocationElements includes LocationID, LocationUUID, AddressReference, AddressHostUUID, BusinessObjectTypeCode, AddressHostTypeCode, PartyID, InstalledBaseID, InstallationPointID, RoleCode, and RoleCategoryCode. A LocationID is a GDT of type LocationID and is optional. LocationUUID is a GDT of type UUID which identifies the BO Location and is optional. AddressReference is a GDT of type LocationAddressReference which is the information reference the address of a Business Object and is optional. AddressHostUUID is a GDT of type UUID which is the identifier of the address of the business partner, the organizational unit or its specializations, the BO InstalledBase or the BO InstallationPoint and is optional. BusinessObjectTypeCode is a GDT of type BusinessObjectTypeCode which is the coded representation of the BusinessObjectTypes of the business object, in which the address referenced in Element LocationAddressUUID is integrated as a Dependent Object and is optional. AddressHostTypeCode is a GDT of type AddressHostTypeCode which is the coded representation of the address host type of the address referenced by AddressUUID or the address included via the LocationAddress composition and is optional. PartyID is a GDT of type PartyID which is the identifier for a Party (a representative of a business partner or an organizational unit), which includes the address referenced via AddressUUID and is optional. InstalledBaseID is a GDT of type InstalledBaseID which is the identifier for the BO Installed Base and is optional. InstallationPointID is a GDT of type InstallationPointID which is the Identifier for the BO Installation Point and is optional. RoleCode is a GDT of type LocationRoleCode and is the Location Role of the Location. RoleCategoryCode is a GDT of type LocationRoleCategoryCode and is the Location Role Category of the Location and is optional. ShipFromLocation is the location from where a good is shipped. ShipToLocation is the Location to where a good is shipped. RequestItemLocationStandardIdentification 237130 has a cardinality of 1:c. RequestItemLocationAddress 237132 has a cardinality of 1:c. Location has a cardinality of c:cn. PartyAddressInformation has a cardinality of c:cn. InstalledBaseAddressInformation has a cardinality of c:cn. InstallationPointAddressInformation has a cardinality of c:cn. UsedAddress has a cardinality of c:cn. UsedAddress is the used address for Location. This may be the referenced address of a master data object or an address referenced via the composition to RequestItemLocationAddress In some implementations, the following integrity conditions are checked. There can be either just one aggregation or composition relationship to the dependent object. If there is an aggregation relationship to the BO Location, the LocationID attribute is filled with the ID of BO Location. All other ID fields (PartyID, InstalledBaseID and InstallationPointID) remain blank. If the address of a party is referenced (representative of a BusinessPartners or an OrganisationalCentre), the PartyID attribute is filled with the ID of the Party. All other ID fields (LocationID, InstalledBaseID and InstallationPointID) remain blank. The reference is kept in the AddressUUID attribute. If there is an aggregation relationship to the address of an InstalledBase, the InstalledBaseID attribute is filled with the ID of the InstalledBase. All other ID fields (LocationID, PartyID and InstallationPointID) remain blank. The reference is kept in the AddressUUID InstalledBaseAddressInformationUUID attribute. If there is an aggregation relationship to the address of an InstallationPoint, the InstallationPointID attribute is filled with the ID of the InstallationPoint. All other ID fields (LocationID, PartyID and InstalledBaseID) remain blank. The reference is kept in the AddressUUID attribute. If an address is referenced via the element AddressUUID, then elements AddressBusinessObjectTypeCode and AddressHostTypeCode can also be filled.

A RequestItemLocationStandardIdentification is a Standardized identification of a location. The node RequestItemLocationStandardIdentification is of the data type SiteLogisticsRequestRequestItemLocationStandardIdentification Elements and includes LocationStandardID. LocationStandardID is a GDT of type LocationStandardID which is the Standardised identification of a Location. DO RequestItemLocationAddress is The dependent object Address includes the data necessary to describe a physical or logical location. RequestItemLogisticsArea is a source or destination logistics area for a good or material that is to move by site logistics according to the SiteLogisticsRequestRequestItem. RequestItemLogisticsArea is of the data type: SiteLogisiticsRequestRequestItemLogisticsAreaElements and includes LogisticsAreaID. LogisticsAreaID is a GDT of type LogisiticsAreaID (without additional components, such as schemeAgencyID which identifies the logistics area. LogisticsAreaUUID is a GDT of type UUID which identifies the logistics area. Logistics Area has a cardinality of c:cn.

RequestItemBusinessTransactionDocumentReference is a reference to a different business document for the requested item. The node RequestItemBusinessTransactionDocumentReference is of the data type SiteLogisticsRequestRequestItemBusinessTransactionDocumentReferenceElements which includes, BusinessTransactionDocumentReference and BusinessTransactionDocumentRelationshipRoleCode. BusinessTransactionDocumentReference is a GDT of type BusinessTransactionDocumentReference which is a clear reference to other business documents that are important for the SiteLogisticsRequestRequestItem. Furthermore, a reference to an item within the same business document is possible. A BusinessTransactionDocumentRelationshipRoleCode is a GDT of type BusinessTransactionDocumentRelationshipRoleCode which is coded representation of the role the referenced document or referenced document item plays in relation to the SiteLogisticsRequest and is optional. SiteLogisticsRequisitionRequestItem has a cardinality of 1:c and is the item of the SiteLogisticsRequisition that triggered the SiteLogisticsRequestItem. LogisticsExecutionRequisitionItem has a cardinality of 1:c and is the item of the LogisticsExecutionRequisition that triggered the SiteLogisticsRequestItem. PurchaseOrderItem has a cardinality of c:n and is the item of the PurchaseOrder. SalesOrderItem has a cardinality of c:n and is the item of the SalesOrder. ServiceOrderItem has a cardinality of c:n and is the item of the ServiceOrder.

RequestItemDeliveryTerms is the conditions and agreements formulated when placing an order for an item. These conditions and agreements should be effective for the execution of the request and/or for the necessary services and activities needed for this request. The node RequestItemDeliveryTerms is of the data type SiteLogisticsRequestRequestItemDeliveryTermsElements (derived from GDT DeliveryTerms) which includes PriorityCode and is Incoterms are typical contract formulations for delivery conditions that correspond to the rules defined by the International Chamber of Commerce (ICC) and is optional. OPartialDeliveryControlCode which is coded representation to control the partial delivery. The PartialDeliveryControlCode indicates whether to allow partial deliveries, a complete delivery at the requested date or a complete delivery and is optional. textRequestItemTransportationTerms is the conditions and agreements formulated when placing an order for an item. These conditions and agreements should be effective for the transport of the item and/or for the necessary services and activities needed for this transport.

The node RequestItemTransportationTerms is of the data type SiteLogisticsRequestRequestItemTransportationTermsElements derived from GDT TransportationTerms the includes, TransportModeCode, TransportMeans, and Description. coded representation of the agreed/defined services in terms of the transport of the delivery (as part of the ordered service). For example, refrigeration or overnight delivery and is optional. TransportModeCode is a GDT of type TransportModeCode which is a coded representation of the mode of transportation used for delivery and is optional. TransportMeans is a GDT of type TransportMeans which is a means of transport. Description is a GDT of type LONG_Description, Qualifier: TransportationTerms which is a natural-language representation of the characteristics of the transport conditions of a SiteLogisticsRequest and is optional.

A RequestItemProduct is the identification, description, and classification of a product requested in the RequestItem. The node RequestItemProduct are defined by the data type SiteLogisticsRequestRequestItemProductElements which includes ProductUUID, ProductID, and ProductTypeCode. ProductUUID is a GDT of type UUID which is universally unique identifier of a Product, which is assigned in order to reference the specific Product for the RequestItemProduct and is optional. ProductID is a GDT of type ProductID which is the unique identifier for a product for the requested Item. ProductTypeCode is a GDT of type ProductTypeCode which is a coded representation of the product type. A product type describes the nature of products and determines the basic characteristics for this type of product and is optional.

A Material has a cardinality of c:cn for which the Material has been requested. DO RequestItemTextCollection is the Dependent Object TextCollection is a natural language text linked to the RequestItem that supports the site logistics processing.

The elements located directly at the node RequestItemInformation are defined by the data type SiteLogisticsRequestRequestItemRootInformation Elements which include WeightMeasure, WeightMeasureTypeCode, VolumeMeasure, and VolumeMeasureTypeCode. WeightMeasure is a GDT of type Measure which is the physical measure with the corresponding unit of measure. WeightMeasureTypeCode is the GDT of type MeasureTypeCode. VolumeMeasure is a GDT of type Measure which is the physical measure with the corresponding unit of measure. VolumeMeasureTypeCode is the GDT of type MeasureTypeCode.

ConfirmationItem is the confirmation for the execution of a site logistics process that has been requested for a certain product. The node ConfirmationItem is of the data type: SiteLogisticsRequestConfirmationItemElements which includes UUID, ID, and TypeCode. UUID is a GDT of type UUID which identifies ConfirmationItem for referencing purposes. ID is a GDT of type BusinessTransactionDocumentItemID which identifies the ConfirmationItem of the Site Logistics Request. TypeCode is a GDT of type BusinessTransactionDocumentItemTypeCode which coded representation that specifies the type of the ConfirmationItem. The codes includeSiteLogisticsStandardItem, SiteLogisticsSparePartItem, SiteLogisticsReturnItem, SiteLogisticsReplenishmentItem, and SiteLogisticsCleanupItem.

SystemAdministrativeData is a GDT of type SystemAdministrativeData which is administrative data that is stored in a system. This data includes system users and change dates/times. A SupplyPlanningAreaID is a GDT of type Supply- PlanningAreaID which identifies the SupplyPlanningArea, which is assigned in order to specify the SupplyPlanningArea for the ConfirmationItem. SupplyPlanningAreaUUID is a GDT of UUID which identifies the supply planning area. A RequestItemUUID is a GDT of type UUID which universally unique identifier of the RequestItem that is confirmed by the ConfirmationItem and is optional. A Status is the SiteLogisticsRequestConfirmationItem.

The status elements are defined by the data type: SiteLogisticsRequestConfirmationItemStatus that includes, ConfirmationItemLifeCycleStatusCode. ConfirmationItemLifeCycleStatusCode is a GDT of type LogisiticsLifeCycleStatusCode which is the current status in the life cycle of the Confirmation Item.

A ConfirmationItemDate has a cardinality of 1:n. ConfirmationItemLocation has a cardinality of 1:c. ConfirmationItemLogisticsArea 237154 has a cardinality of 1:c. ConfirmationItemBusinessTransactionDocumentReference 237166 1:cn. ConfirmationItemQuantity 237158 has a cardinality of 1:n. ConfirmationItemProduct 237156 has a cardinality of 1:1. ConfirmationItemShipFromLocation has a cardinality of 1:1. ConfirmationItemShipToLocation has a cardinality of 1:c. ConfirmationItemArrivalPeriod has a cardinality of c:c. ConfirmationItemAvailabilityPeriod has a cardinality of c:c. ConfirmationItemPositioningPeriod has a cardinality of c:c. ConfirmationItemIssuePeriod has a cardinality of c:c. ConfirmationItemPickupPeriod has a cardinality of c:c. ConfirmationItemDueDatePeriod has a cardinality of c:c.

A ConfirmationItemConfirmedQuantity has a cardinality of 1:c. ConfirmationItemWorkInProcessQuantity has a cardinality of 1:c. ConfirmationItemFulfilledQuantity has a cardinality of 1:c. ConfirmationItemForwardedQuantity has a cardinality of 1:c. SupplyPlanningArea has a cardinality of c:cn. CreationIdentity has a cardinality of 1:cn. LastChangeIdentity has a cardinality of 1:cn. RequestItem has a cardinality of 1:c. RequestItem that is confirmed by the ConfirmationItem. SiteLogisticsLot MaterialInput has a cardinality of 1:cn. SiteLogisticsLot MaterialOutput has a cardinality of 1:cn.

Notify of Execution [S&AM Action] is triggered by Site Logistics Order or Site Logistics Lot and notifies the request about the executed quantities. Changes to the object may include the fulfil quantity in the confirmation item and the status are updated. Changes to the status may include the status changes according to the confirmation item fulfill quantity. The action elements are defined by the data type SiteLogisticsRequestConfirmationItemNotifyOfExecutionElements which include PlanningRelevantIndicator and WorkInProcessRelevantIndicator. PlanningRelevantIndicator is a GDT of type Indicator. WorkInProcessRelevantIndicator is a GDT of type Indicator. In some implementations, the action is called from the Site Logistics Order BO or from the Site Logistics Lot BO.

The action closes the unfulfilled quantity of the confirmation item. In some implementations, the Site Logistics Request has been created and released for execution. Changes to the object may include the rejected quantity in the confirmation item is calculated by the action as the difference between the confirmed and the fulfilled quantity and the reason code is updated. The open quantities in the relevant segment material input and output nodes are set to zero. Changes to other objects may include the open quantity in the related material input and output nodes in the Site Logistics Order and Lot is set to zero. The action elements are defined by the data type: SiteLogisticsRequestConfirmationItemForceCompleteActionElements and include A LogisticsDeviationReasonCode which is a GDT of type LogisticsDeviationReasonCode. In some implementations, the action is called from the UI of the Site Logistics Request The action reprocesses the unfulfilled quantity of the confirmation item In some implementations, the Site Logistics Request has been created and released for execution.

Changes to other objects may include new activity in the Site Logistics Lot and the corresponding task are created. In some implementations, the action is called from the UI of the Site Logistics Request.

Cancel (S&AM action) cancels a specific Confirmation Item. In some implementations, the Site Logistics Request has been created (e.g., using Request Header, Request Items and Confirmation Item). Changes to the object may include Status and quantities changes. Changes to other objects may include Status and quantities changes in Site Logistics Order and Site Logistics Lot. Changes to the status may include the status of the Confirmation Item changes to "Cancelled". In some implementations, the action is called from the UI of the Site Logistic Request.

Release (S&AM action) releases a Confirmation Item. In some implementations, the Site Logistics Request has been created (e.g., using Request Header, Request Items and Confirmation Item). Changes to the object may include Status change. Changes to the status may include the status of the Confirmation Item being changed to "Released". In some implementations, the action is called internally in SL Request for status change only.

QueryInboundConfirmationItem provides a list of all the confirmation items for the execution of an inbound logistics process which satisfy the selection criteria specified by the query elements. The query elements are defined by the data type: SiteLogisticsRequestInboundConfirmationItemQueryElements which include ConfirmationItemLifeCycleStatusCode. ConfirmationItemLifeCycleStatusCode is a GDT of type LogisticsLifeCycleStatusCode and is optional.

QueryInboundConfirmationItem provides a list of the Confirmation items for the execution of an outbound logistics process which satisfy the selection criteria specified by the query elements. The query elements are defined by the data type: SiteLogisticsRequestOutboundConfirmationItemQueryElements that includeConfirmationItemLifeCycleStatusCode. ConfirmationItemLifeCycleStatusCode is a GDT of type LogisticsLifeCycleStatusCode and is optional.

QueryInternalConfirmationItem provides a list of the Confirmation items for the execution of an internal logistics process which satisfy the selection criteria specified by the query elements. The query elements are defined by the data type: SiteLogisticsRequestInternalConfirmationItemQueryElements which include ConfirmationItemLifeCycleStatusCode. ConfirmationItemLifeCycleStatusCode is a GDT of type LogisticsLifeCycleStatusCode.

QueryByElements provides a list of all the confirmation items which satisfy the selection criteria specified by the query elements. The query elements are defined by the data type: SiteLogisticsRequestConfirmationItemElementsQueryElements which include ConfirmationItemMainInventorySeparatingValues, ConfirmationItemIdentifiedStockInventorySeparatingValues, ConfirmationItemLocationID, and ConfirmationItemLogisticsAreaKey. ConfirmationItemMainInventorySeparatingValues is a GDT of type and is optional. ConfirmationItemIdentifiedStockInventorySeparatingValues is a GDT of type IdentifiedStockInventorySeparatingValues and is optional. ConfirmationItemLocationID is a GDT of LocationID and is optional. ConfirmationItemLogisticsAreaKey is a GDT to type LogisticsAreaKey and is optional. LogisticsAreaKeyID is mapped to the element LogisticsAreaID maintained in the ConfirmationItemLogisticsArea node. LogisticsAreaKey-SiteID is mapped to the element LocationID maintained in the Location node that represents 'Site'. ConfirmationItemDueDateTimePoint is a GDT of type TimePoint and is optional. ConfirmationItemDate is a time specification (based on the calendar) for dates relevant for the confirmed item.

The node ConfirmationItemDate 237152 is of the data type SiteLogisticsRequestConfirmationItemDateElements and includes the PeriodRoleCode. PeriodRoleCode is a GDT of type PeriodRoleCode and is a coded representation of the semantic of a time point period in the ConfirmationItem. The codes that are used include ArrivalPeriod, AvailabilityPeriod, PositioningPeriod, IssuePeriod, PickUpPeriod, and DueDatePeriod. ArrivalPeriod refers to the period that the goods arrive. AvailabilityPeriod refers to a Period that is needed to make the material available. PositioningPeriod refers to the Period that is needed to make the material available in the warehouse. IssuePeriod is a Period that the goods are issued. PickUpPeriod is a Period that the goods are collected. TimePointPeriod is a GDT of type TimePointPeriod which is a time point period with a relevance to the ConfirmationItem. AvailabilityPeriod may occur in inbound case or outbound-return case. PositioningPeriode may occur in outbound case or inbound-return case. ConfirmationItemLocation is the confirmation of a source or a destination location for a material that has been moved within the site. A Location may keep a reference to a business object Location. A Location may Keep a reference to the AddressInformation address of the TO Party (representative of a business partner and an organizational unit). A Location may Keep a reference to a business partner or one of its specializations (for example customer or supplier), which is not AddressInformation. A Location may Keep a reference to the address of the BO InstalledBase. A Location may Keep a reference to the address of the BO InstallationPoint. The LocationRole describes the role of a Location in the site logistics process.

The node ConfirmationItemLocation 237160 is of the data type SiteLogisticsRequestConfirmationItemLocationElements which includes LocationID, LocationUUID, AddressReference, AddressHostUUID, BusinessObjectTypeCode, AddressHostTypeCode, PartyID, InstalledBaseID, InstallationPointID, RoleCode, and RoleCategoryCode. LocationID is a GDT of type LocationID which is an Identifier of the BO Location in this LocationRole and is optional. LocationUUID is a GDT of type UUID and is universally unique identifier of the BO Location and is optional. AddressReference is a GDT of type LocationAddressReference which is the information to reference the address of a Business Object and is optional.

A AddressHostUUID is a GDT of type UUID which is universally unique identifier of the address of the business partner, the organizational unit or its specializations, the BO InstalledBase or the BO InstallationPoint and is optional. A BusinessObjectTypeCode is a GDT of type BusinessObjectTypeCode which is the coded representation of the BusinessObjectTypes of the business object, in which the address referenced in Element LocationAddressUUID is integrated as a Dependent Object and is optional. AddressHostTypeCode is a GDT of type AddressHostTypeCode which is coded representation of the address host type of the address referenced by AddressUUID or the address included via the LocationAddress composition and is optional. PartyID is a GDT of type PartyID which is the Identifier for a Party (a representative of a business partner or an organizational unit), which includes the address referenced via AddressUUID and is optional. InstalledBaseID is a GDT of type InstalledBaseID which is the Identifier for the BO Installed Base and is optional. InstallationPointID is a GDT of type InstallationPointID which is the Identifier for the BO Installation Point and is optional. RoleCode is a GDT of LocationRoleCode. RoleCategoryCode is a GDT of type LocationRoleCategoryCode which is the location Role category of the location and is optional.

A ShipFromLocation is the location from where a good is shipped. ShipToLocation is the location to where a good is shipped. ConfirmationItemLocationStandardIdentification 237164 has a cardinality of 1:c. ConfirmationItemLocationAddress 237162 has a cardinality of 1:c. Location has a cardinality of c:cn. PartyAddressInformation has a cardinality of c:cn. InstalledBaseAddressInformation has a cardinality of c:cn. InstallationPointAddressInformation has a cardinality of c:cn. UsedAddress has a cardinality of c:cn. Used address for Location. This may be the referenced address of a master data object or an address referenced via the composition to ConfirmationItemLocationAddress.

In some implementations, the following integrity conditions are checked. There can be either just one aggregation or composition relationship to the dependent object. If there is an aggregation relationship to the BO Location, the LocationID attribute is filled with the ID of BO Location. All other ID fields (PartyID, InstalledBaseID and InstallationPointID) remain blank. If the address of a party is referenced (representative of a BusinessPartners or an OrganisationalCentre), the PartyID attribute is filled with the ID of the Party. All other ID fields (LocationID, InstalledBaseID and InstallationPointID) remain blank. The reference is kept in the AddressUUID attribute. If there is an aggregation relationship to the address of an InstalledBase, the InstalledBaseID attribute is filled with the ID of the InstalledBase. All other ID fields (LocationID, PartyID and InstallationPointID) remain blank. The reference is kept in the AddressUUID InstalledBaseAddressInformationUUID attribute. If there is an aggregation relationship to the address of an InstallationPoint, the InstallationPointID attribute is filled with the ID of the InstallationPoint. All other ID fields (LocationID, PartyID and InstalledBaseID) remain blank. The reference is kept in the AddressUUID attribute. If an address is referenced via the element AddressUUID, then elements AddressBusinessObjectTypeCode and AddressHostTypeCode can also be filled. A ConfirmationItemLocationStandardIdentification is a standardized identification of a location.

ConfirmationItemLocationStandardIdentification is of the data type: SiteLogisticsRequestConfirmationItemLocationStandardIdentificationElements which includes LocationStandardID. LocationStandardID is a GDT of type LocationStandardID. DO ConfirmationItemLocationAddress is the dependent object Address includes the data necessary to describe a physical or logical location. ConfirmationItemLogisticsArea is the confirmation of a source or a destination logistics area for a material that has been moved within the site.

ConfirmationItemLogisticsArea is of the data type: SiteLogisiticsRequestConfirmationItemLogisticsAreaElements which includes LogisticsAreaID and LogisticsAreaUUID. LogisticsAreaID is a GDT of type LogisiticsAreaID (without additional components, such as schemeAgencyID). LogisticsAreaUUID is a GDT of type UUID which is the unique identifier for a logistics area. Logistics Area has a cardinality of c:cn ConfirmationItemBusinessTransactionDocumentReference is a reference to a different business document or to the item of a different business document relevant for the SiteLogisticsRequestConfirmationItem. ConfirmationItemBusinessTransactionDocument Reference is of the data type: SiteLogisticsRequestConfirmationItemBusinessTransactionDocumentReferenceElements which includes BusinessTransactionDocumentReference and BusinessTransactionDocumentRelationshipRoleCode. A BusinessTransactionDocumentReference is a GDT of type BusinessTransactionDocumentReference which is a clear reference to other business documents that are important for the SiteLogisticsRequestConfirmationItem. Furthermore, a reference to an item within the same business document is possible. A BusinessTransactionDocumentRelationshipRoleCode is a GDT of type BusinessTransactionDocumentRelationshipRoleCode which is coded representation of the role the referenced document or referenced document item plays in relation to the SiteLogisticsRequest and is optional.

ConfirmationItemBusinessTransactionDocumentReferenceActualValue has a cardinality of 1:c. RequestItem has a cardinality of 1:c and is a RequestItem that is confirmed by the ConfirmationItem. SiteLogisticsLot MaterialInput has a cardinality of 1:cn. SiteLogisticsConfirmationInventoryChangeItem has a cardinality of 1:c. ConfirmationItemBusinessTransactionDocumentReferenceActualValue is the ConfirmationItemBusinessTransactionDocumentReferenceActualValue are the actually achieved values, i.e. quantity and date for a ConfirmationItemBusinessTransactionDocumentReference. It represents the fulfilment.

The elements located directly at the node ConfirmationItemBusinessTransactionDocumentReferenceActualValue are defined by the data type: SiteLogisticsRequestConfirmationItemBusinessTransactionDocumentReferenceActualValueElements which include FulfilledQuantityTypeCode, FulfilledQuantity, FulfilledQuantityOriginCode, TransactionTimePoint, and DocumentCancellationIndicator. FulfilledQuantityTypeCode is a GDT of type QuantityTypeCode, Qualifier Fulfilled which is code representation of the type of a quantity. FulfilledQuantity is a GDT of type Quantity, Qualifier: Fulfilled which the fulfilled quantity with the corresponding unit of measure. FulfilledQuantityOriginCode is a GDT of type QuantityOriginCode which is coded representation of the origin of the quantity value and is optional. TransactionTimePoint is a GDT of type TimePoint, Qualifier: Transaction which is a point in time indicating when the reported changes were performed. DocumentCancellationIndicator is a GDT of type Indicator, Qualifier Cancellation. CancelledSiteLogisticsConfirmationInventoryChangeItemReference is a GDT of type BusinessTransactionDocumentReference and is optional.

This node ActualValue 237168 exists only when the reference is a reference to SiteLogisticsConfirmationInventoryChangeItem. ConfirmationItemQuantity is a quantity that has been confirmed.

ConfirmationItemQuantity is of the data type SiteLogisticsRequestConfirmationItemQuantityElements which includes Quantity, QuantityTypeCode, QuantityRoleCode, and QuantityOriginCode. Quantity is a GDT of type Quantity which is the quantity with the corresponding unit of measure. QuantityTypeCode is a GDT of type QuantityTypeCode which is coded representation of the type of a quantity. QuantityRoleCode is a GDT of type QuantityRoleCode which is a coded representation of the role of a quantity. Some of the codes include ConfirmedQuantity, InventoryQuantity, WorkInProcessQuantity, FulfilledQuantity, and ForwardedQuantity which is the quantity that is used to reduce the planning relevant quantity of he predecessor.

QuantityOriginCode is a GDT of type QuantityOriginCode which is coded representation of the origin of the quantity value. In some implementations, the ConfirmedQuantity may not be less than the FulfilledQuantity. If the ConfirmationItemProduct is the same as the RequestItemProduct the ForwardedQuantity shall be equal to the ConfirmedQuantity. ConfirmationItemProduct is the identification, description, and classification of a product that has been confirmed for processing in the ConfirmationItem.

The node SiteLogisticsRequestConfirmationItemProduct is of the data type: SiteLogisticsRequestConfirmationItemProductElements which includes ProductUUID, ProductID, and ProductTypeCode. ProductUUID is a GDT of type UUID which is a universally unique identifier of a Product, which is assigned in order to reference the specific Product for the ConfirmationItemProduct. ProductID is a GDT of type ProductID. ProductTypeCode is a GDT of type ProductTypeCode which is coded representation of the product type. A product type describes the nature of products and determines the basic characteristics for this type of product. Material has a cardinality of c:cn.

HierarchicalViewElement (Transformation Node) includes the elements located directly at the node HierarchicalViewElement which are defined by the element structure SiteLogisticsRequestHierarchialViewElementElements that include ReferenceObjectNodeReference, NumberOfItems, TotalWeightMeasure, TotalWeightMeasureTypeCode, TotalVolumeMeasure, TotalVolumeMeasureTypeCode, Quantity, and QuantityTypeCode. ReferenceObjectNodeReference is a GDT of type ObjectNodeReference Qualifier: Reference). NumberOfItems is a GDT of type NumberValue and is optional. TotalWeightMeasure is a GDT of type Measure and is optional. TotalWeightMeasureTypeCode is a GDT of type MeasureTypeCode and is optional. TotalVolumeMeasure is a GDT of type Measure and is optional. TotalVolumeMeasureTypeCode is a GDT of type MeasureTypeCode and is optional. is aGDT of type PriorityCode and is optional. Quantity is a GDT of type Quantity and is optional. QuantityTypeCode is a GDT of type QuantityTypeCode and is optional.

A SubhierarchyHierarchicalViewElement has a cardinality of 1:cn. Specifies the hierarchically subordinate elements of an element. LogisticPackage has a cardinality of c:1 and denotes the logistics package that the HierarchicalViewElement is representing. Material has a cardinality of c:1 and denotes the material that the HierarchicalViewElement is representing.

FIGS. 238-1 through 238-3 illustrate one example logical configuration of SiteLogisticsRequestConfirmationMessage message 238000. Specifically, this figure depicts the arrangement and hierarchy of various components such as one or more levels of packages, entities, and datatypes, shown here as 238000-238064. As described above, packages may be used to represent hierarchy levels. Entities are discrete business elements that are used during a business transaction. Data types are used to type object entities and interfaces with a structure. For example, SiteLogisticsRequestConfirmationMessage message 238000 includes, among other things, SiteLogisticsRequest 238004. Accordingly, heterogeneous applications may communicate using this consistent message configured as such.

FIGS. 239-1 through 239-2 illustrate one example logical configuration of SiteLogisticsRequestConfirmationReconciliationMessage message 239000. Specifically, this figure depicts the arrangement and hierarchy of various components such as one or more levels of packages, entities, and datatypes, shown here as 239000-238060. As described above, packages may be used to represent hierarchy levels. Entities are discrete business elements that are used during a business transaction. Data types are used to type object entities and interfaces with a structure. For example, SiteLogisticsRequestConfirmationReconciliationMessage message 239000 includes, among other things, SiteLogisticsRequest 239004. Accordingly, heterogeneous applications may communicate using this consistent message configured as such.

FIGS. 240-1 through 240-2 illustrate one example logical configuration of SiteLogisticsRequestRequestMessage message 240000. Specifically, this figure depicts the arrangement and hierarchy of various components such as one or more levels of packages, entities, and datatypes, shown here as 240000-240092. As described above, packages may be used to represent hierarchy levels. Entities are discrete business elements that are used during a business transaction. Data types are used to type object entities and interfaces with a structure. For example, SiteLogisticsRequestRequestMessage message 240000 includes, among other things, SiteLogisticsRequest 240004. Accordingly, heterogeneous applications may communicate using this consistent message configured as such.

FIGS. 241-1 through 241-9 illustrate one example logical configuration of SiteLogisticsRequestConfirmation message 214000. Specifically, this figure depicts the arrangement and hierarchy of various components such as one or more levels of packages, entities, and datatypes, shown here as 241000-241312. As described above, packages may be used to represent hierarchy levels. Entities are discrete business elements that are used during a business transaction. Data types are used to type object entities and interfaces with a structure. For example, SiteLogisticsRequestConfirmation message 241000 includes, among other things, SiteLogisticsRequestConfirmation 241044. Accordingly, heterogeneous applications may communicate using this consistent message configured as such.

FIGS. 242-1 through 242-12 illustrate one example logical configuration of SiteLogisticsRequestConfirmationReconciliationMessage message 242000. Specifically, this figure depicts the arrangement and hierarchy of various components such as one or more levels of packages, entities, and datatypes, shown here as 242000-242348. As described above, packages may be used to represent hierarchy levels. Entities are discrete business elements that are used during a business transaction. Data types are used to type object entities and interfaces with a structure. For example, SiteLogisticsRequestConfirmationReconciliationMessage message 242000 includes, among other things, SiteLogisticsRequest 242044. Accordingly, heterogeneous applications may communicate using this consistent message configured as such.

FIGS. 243-1 through 243-21 illustrate one example logical configuration of SiteLogisticsRequestRequestMessage message 243000. Specifically, this figure depicts the arrangement and hierarchy of various components such as one or more levels of packages, entities, and datatypes, shown here as 243000-243718. As described above, packages may be used to represent hierarchy levels. Entities are discrete business elements that are used during a business transaction. Data types are used to type object entities and interfaces with a structure. For example, SiteLogisticsRequestRequestMessage message 243000 includes, among other things, SiteLogisticsRequest 243044. Accordingly, heterogeneous applications may communicate using this consistent message configured as such.

This section describes the message types and their signatures that are derived from the operations of the business object SiteLogisticsRequest. In a signature, the business object is contained as a "leading" business object. SiteLogisticsRequestRequestMessage and a SiteLogisticsRequestConfirmationNotificationMessage are the message data types that are used to communicate between Logistics Execution Control and Site Logistics Processing. These message data types include SiteLogisticsRequestRequest which requests either an inbound, outbound or internal site logistics processing. SiteLogisticsRequestConfirmation returns the confirmation and the fulfillment data (inventory changes) of the site logistics processing.

The message type SiteLogisticsRequestConfirmationReconciliation sends the confirmation and the fulfillment data of the site logistics processing for reconciliation purposes. Different to the message type SiteLogisticsRequestConfirmation only data affecting the business object SiteLogisticsRequest is included.

Site Logistics processing supports all preparing and execution tasks concerning internal inventory movements. It also provides stock information including special stocks. SiteLogisticsRequestRequest is the request to site logistics to execute a SiteLogisticsRequest.

If a definition or GDT for an element is not given, the element can be defined by an element of the same name in other business objects. For example, the definition can be derived from that of similarly named entities of the entity that contains it, or by other entities having the same name that are defined else-where.

A site logistics process is a process to move material inside the warehouse. Depending on the overall logistics execution process belongs, the SiteLogisticsRequestRequest message can request a site logistics process which includes Outbound, Inbound, and In-house. The outbound SiteLogisticsRequestRequest message requests that the material be prepared for an outbound process (For example, moves the material from stock to the gate for an outbound delivery). The Inbound SiteLogisticsRequestRequest message requests that the material be moved for an inbound process (For example, moves the material from a gate to the stock). The In-house SiteLogisticsRequestRequest message requests that the material be moved for an internal process.

The SiteLogisticsRequestRequest message can combine multiple sales orders or purchase orders. The structure of this message type is determined by the message data type SiteLogisticsRequestRequestMessage which includes Logistics Execution Control/Site Logistics Processing Out, Request Site Logistics, site Logistics Processing/Site Logistics Processing In, and Maintain Site Logistics Request.

SiteLogisticsRequestConfirmation is the confirmation of a SiteLogisticsRequest about confirmation and fulfillment data together with the related inventory change information. The structure of this message type is determined by the message data type SiteLogisticsRequestConfirmationMessage. The interfaces operations include Site Logistics Processing/Site Logistics Processing Out, Confirm Site Logistics Request, Logistics Execution Control/Site Logistics Processing In, and Change Site Logistics Requisition Based On Site Logistics Request Confirmation.

SiteLogisticsRequestConfirmationReconciliation is the confirmation of a SiteLogisticsRequest about confirmation and fulfillment data for reconciliation purposes.

The structure of this message type is determined by the message data type SiteLogisticsRequestConfirmationReconciliationMessage which interface operations include Site Logistics Processing/Site Logistics Processing Out, Notify Planning of Site Logistics Request Confirmation Reconciliation, Logistics Execution Control/Site Logistics Processing In, Change based on Site Logistics Request Confirmation Reconciliation.

SiteLogisticsRequestRequestMessage is the object Site Logistics Request which is contained in the business document. The business information that is relevant for sending a business document in a message contains the MessageHeader package and Site Logistics Request Request Site Logistics Request package.

MessageHeader Package is a grouping of business information that is relevant for sending a business document in a message and includes the MessageHeader which is a grouping of business information from the perspective of the sending application. Provided in the MessageHeader is the information to identify the business document in a message, Information about the sender, and Information about the recipient (optional). The MessageHeader also contains the SenderParty and RecipientParty. It is of the type GDT: BusinessDocumentMessageHeader that includes the ID and ReferenceID.

SenderParty is the partner responsible for sending a business document at the business application level. The SenderParty is of the type GDT: BusinessDocumentMessageHeaderParty.

RecipientParty is the partner responsible for receiving a business document at the business application level. The RecipientParty is of the type GDT: BusinessDocumentMessageHeaderParty.

SiteLogisticsRequest Package is the grouping of SiteLogisticsRequest package with its packages includes the Date, Party, Location, DeliveryInformation, TransportInformation, Description, Attachment, sand RequestItem.

Message Type SiteLogisticsRequestRequest

SiteLogisticsRequest is the request to site logistics to execute a SiteLogisticsRequest. SiteLogisticsRequestRequestSiteLogisticsRequest contains requestItemListCompleteTransmissionIndicator, reconciliationPeriodCounterValue, actionCode, ID, BaseBusinessTransactionDocumentID, BaseBusinessTransactionDocumentUUID, BaseBusinessTransactionDocumentTypeCode, SiteLogisticsProcessTypeCode, FollowUpDeliveryRequirementCode, and PickupIndicator. A RequestItemListCompleteTransmissionIndicator is a GDT of type Indicator and is optional. A reconciliationPeriodCounterValue is a GDT of type CounterValue. A ActionCode is a GDT of type ActionCode. A ID is a GDT of type BusinessTransactionDocumentID and is optional. A UUID is a GDT of type UUID and is optional. A BaseBusinessTransactionDocumentID is a GDT of type BusinessTransactionDocumentID which refers to the Readable alternative unique identifier of the business document on which the SiteLogisticsRequest is based, for example the ID of the SiteLogisticsRequisition. A BaseBusinessTransactionDocumentUUID is a GDT of type UUID and is optional.

A BaseBusinessTransactionDocumentTypeCode is coded representation of the business transaction document type on which the SiteLogisticsRequest is based. Such a business transaction document includes, A SiteLogisticsRequisition which is a GDT of type BusinessTransactionDocumentTypeCode, A SiteLogisticsProcessTypeCode which is a GDT of type SiteLogisticsProcessTypeCode, A FollowUpDeliveryRequirementCode which is a GDT: FollowUpBusinessTransactionDocumentRequirementCode and is optional. A PickupIndicator which is a GDT of type Indicator and is optional.

ArrivalTimePoint refers to the business object SiteLogisticsRequest/node Date. An ArrivalTimePoint is a time point of the type arrival time point. ShippingTimePoint refers to the business object SiteLogisticsRequest/node Date. A ShippingTimePoint is a time point of the type shipping time point. ShippingDate includes TimePoint. If a definition or GDT for an element is not given, the element is defined by an element of the same name in the business object SiteLogisticsRequest/node Date.

PickupTimePoint refers to the business object SiteLogisticsRequest/node Date. A PickupTimePoint is a time point of the type pickup time point.

SiteLogisticsRequestParty Package

Vendor Party refers to the business object SiteLogisticsRequest/node Party. A Vendor Party is a party who delivers a good or who provides a service. Vendor Party is of type GDT BusinessTransactionDocumentParty.

ProductRecipientParty refers to the business object SiteLogisticsRequest/node Party. A ProductRecipientParty is a party to whom a good is delivered of for whom a service is provided. ProductRecipientParty is of type GDT BusinessTransactionDocumentParty.

FreightForwarderParty refers to the business object SiteLogisticsRequest/node Party. A FreightForwarderParty is a party responsible for organizing the shipment of a good. FreightForwarderParty is of type GDT BusinessTransactionDocumentParty.

CarrierParty refers to the business object SiteLogisticsRequest/node Party. A CarrierParty is a party responsible for the shipment of a good. CarrierParty is of type GDT BusinessTransactionDocumentParty.

PickupParty refers to the business object SiteLogisticsRequest/node Party. PickupParty is of type GDT BusinessTransactionDocumentParty.

SiteLogisticsRequestLocation Package and ShipFromLocation refers to the business object SiteLogisticsRequest/node Location. A ShipFromLocation is a location of the type ShipFromLocation. ShipFromLocation is of type GDT: BusinessTransactionDocumentLocation.

ShipToLocation refers to the business object SiteLogisticsRequest/node Location. A ShipToLocation is a location of the type ShipToLocation. ShipToLocation is of type GDT: BusinessTransactionDocumentLocation.

SiteLogisticsRequestDeliveryInformation Package and DeliveryTerms refers to the business object SiteLogisticsRequest/node DeliveryTerms. DeliveryTerms contains the same elements as the node DeliveryTerms in the business object SiteLogisticsRequest.

SiteLogisticsRequestTransportInformation Package and TransportationTerms refers to the business object SiteLogisticsRequest/node TransportationTerms. TransportationTerms contains the same elements as the node TransportationTerms in the business object SiteLogisticsRequest.

SiteLogisticsRequestRequestItem Package is the grouping of RequestItem package and includes the Date, Location, BusinessTransactionDocumentReference, DeliveryInformation, TransportInformation, ProductInformation, Description, and Attachment.

RequestItem refers to the business object SiteLogisticsRequest/node RequestItem. RequestItem contains: actionCode, ID, BaseBusinessTransactionDocumentRequestItemID, BaseBusinessTransactionDocumentRequestItemUUID, TypeCode, RequestedQuantity, DeliveryBlockedIndicator, and CancelledIndicator.

An actionCode (attribute) is a GDT of type ActionCode. An ID is a GDT of type UUID and is optional. A BaseBusinessTransactionDocumentRequestItemID is a GDT of type BusinessTransactionDocumentItemID and is a readable alternative unique identifier of the business document item on which the SiteLogisticsRequestRequestItem is based, for example the ID of the SiteLogisticsRequisitionRequestItem. A BaseBusinessTransactionDocumentRequestItemUUID is a GDT of type UUID and is optional. Other attributes can include: TypeCode, RequestedQuantity, RequestedQuantityTypeCode, DeliveryBlockedIndicator (e.g., of type GDT: Indicator) and CancelledIndicator (e.g., of type GDT: Indicator).

SiteLogisticsRequestRequestItemDate Package and ArrivalPeriod refers to the business object SiteLogisticsRequest/node RequestItemDate. An ArrivalPeriod is a period of the type arrival period. ArrivalPeriod contains a TimePointPeriod.

AvailabilityPeriod refers to the business object SiteLogisticsRequest/node RequestItemDate. An AvailabilityPeriod is a period of the type availability period. AvailabilityPeriod contains a TimePointPeriod.

PositioningPeriod refers to the business object SiteLogisticsRequest/node RequestItemDate. A PositioningPeriod is a period of the type positioning period. PositioningPeriod contains a TimePointPeriod.

IssuePeriod refers to the business object SiteLogisticsRequest/node RequestItemDate. An IssuePeriod is a period of the type issue period. IssuePeriod contains aTimePointPeriod.

PickupPeriod refers to the business object SiteLogisticsRequest/node RequestItemDate. A PickupPeriod is a period of the type pickup period. PickupPeriod contains a TimePointPeriod.

SiteLogisticsRequestRequestItemLocation Package and ShipFromLocation refers to the business object SiteLogisticsRequest/node RequestItemLocation. A ShipFromLocation is a location of the type ShipFromLocation. ShipFromLocation is of type GDT: BusinessTransactionDocumentLocation.

ShipToLocation refers to the business object SiteLogisticsRequest/node RequestItemLocation. A ShipToLocation is a location of the type ShipToLocation. ShipToLocation is of type GDT: BusinessTransactionDocumentLocation.

SiteLogisticsRequestRequestItemBusinessTransactionDocumentReference Package

LogisticsExecutionRequisitionItemReference refers to the business object SiteLogisticsRequest/node RequestItemBusinessTransactionDocumentReference. A LogisticsExecutionRequisitionItemReference is a reference to a LogisticsExecutionRequisitionItem. LogisticsExecutionRequisitionItemReference includes BusinessTransactionDocumentReference.

PurchaseOrderItemReference refers to the business object SiteLogisticsRequest/node RequestItemBusinessTransactionDocumentReference. A PurchaseOrderItemReference is a reference to a PurchaseOrderItem. PurchaseOrderItem includes BusinessTransactionDocumentReference.

SalesOrderItemReference refers to the business object SiteLogisticsRequest/node RequestItemBusinessTransactionDocumentReference. A SalesOrderItemReference is a reference to a SalesOrderItem. SalesOrderItem includes BusinessTransactionDocumentReference.

ServiceOrderItemReference refers to the business object SiteLogisticsRequest/node RequestItemBusinessTransactionDocumentReference. A ServiceOrderItemReference is a reference to a ServiceOrderItem. ServiceOrderItem contains a BusinessTransactionDocumentReference.

SiteLogisticsRequestRequestItemDeliveryInformation Package and DeliveryTerms refers to the business object SiteLogisticsRequest/node RequestItemDeliveryTerms. DeliveryTerms contains the same elements as the node RequestItemDeliveryTerms in the business object SiteLogisticsRequest.

SiteLogisticsRequestRequestItemTransportInformation Package and TransportationTerms refers to the business object SiteLogisticsRequest/node RequestItemTransportationTerms. TransportationTerms contains the same elements as the node RequestItemTransportationTerms in the business object SiteLogisticsRequest.

SiteLogisticsRequestRequestItemProductInformation Package and Product refers to the business object SiteLogisticsRequest/node RequestItemProduct. Product is of type GDT: BusinessTransactionDocumentProduct includes the Address, BusinessDocumentMessageHeader, BusinessDocumentMessageHeaderParty, BusinessDocumentMessageID, BusinessScope, BusinessTransactionDocumentDeliveryTerms, BusinessTransactionDocumentID, BusinessTransactionDocumentItemGroupID, BusinessTransactionDocumentItemID, BusinessTransactionDocumentItemTypeCode, BusinessTransactionDocumentLocation, BusinessTransactionDocumentParty BusinessTransactionDocumentProduct, BusinessTransactionDocumentReference, BusinessTransactionDocumentTypeCode, BusinessTransactionPriorityCode, ContactPerson, DateTime, DeliveryControlCode, Description, Duration, FollowUpBusinessTransactionDocumentRequirementCode, Incoterms, Indicator, LocationID, LogisticsExecutionActivityTypeCode, Note, NumberValue, PartyInternalID, ProductInternalID, Quantity, QuantityTolerance, QuantityTypeCode, SiteLogisticsProcessTypeCode, SiteLogisticsRequestRequest-SiteLogisticRequest, SiteLogisticsRequestRequest-SiteLogisticRequestRequestItem, SupplyPlanningAreaID, TimePointPeriod, TimeTolerance, TransportMeans, TransportModeCode, TransportServiceLevelCode, and UUID.

Data Model of Message Data Type

SiteLogisticsRequestConfirmationMessage contains the object Site Logistics Request that is contained in the business document and the business information that is relevant for sending a business document in a message which contains the MessageHeader package and the Site Logistics Request Confirmation package.

MessageHeader Package is a grouping of business information that is relevant for sending a business document in a message. It contains the entity MessageHeader which is a grouping of business information from the perspective of the sending application that may include Information to identify the business document in a message, Information about the sender, and Information about the recipient (optional). The MessageHeader may contain the SenderParty and RecipientParty. It is of the type GDT: BusinessDocumentMessageHeader and contains the ID and ReferenceID.

SenderParty is the partner responsible for sending a business document at the business application level. The SenderParty is of the type GDT BusinessDocumentMessageHeaderParty. RecipientParty is the partner responsible for receiving a business document at the business application level. The RecipientParty is of the type GDT: BusinessDocumentMessageHeaderParty.

SiteLogisticsRequest Package is the grouping of SiteLogisticsRequest package with its packages includes ConfirmationItem and InventoryChangeItem.

Message Type SiteLogisticsRequestConfirmation

SiteLogisticsRequest refers to the business object SiteLogisticsRequest/root node. SiteLogisticsRequestConfirmationSiteLogisticsRequest includes confirmationItemListCompleteTransmissionIndicator (attribute), inventoryChangeItemListCompleteTransmissionIndicator (attribute), reconciliationPeriodCounterValue (attribute), actionCode (attribute), ID, UUID, BaseBusinessTransactionDocumentID, BaseBusinessTransactionDocumentTypeCode, and SiteLogisticsProcessTypeCode. A confirmationItemListCompleteTransmissionIndicator (attribute) is a GDT of type Indicator. A inventoryChangeItemListCompleteTransmissionIndicator (attribute) is a GDT of type Indicator. A reconciliationPeriodCounterValue (attribute) Is a GDT of type CounterValue. A actionCode (attribute) is a GDT of type ActionCode. A ID is a GDT of type BusinessTransactionDocumentID). A UUID is a GDT of type UUID and is optional.

A BaseBusinessTransactionDocumentID is a GDT of type BusinessTransactionDocumentID and is optional. A BaseBusinessTransactionDocumentUUID is a GDT of type UUID and is optional. BaseBusinessTransactionDocumentTypeCode is a GDT of type BusinessTransactionDocumentTypeCode and is optional and is coded representation of the business transaction document type on which the SiteLogisticsRequest is based. Such a business transaction document can be: SiteLogisticsRequisition. A SiteLogisticsProcessTypeCode is a GDT of type SiteLogisticsProcessTypeCode and is optional.

The SiteLogisticsProcessTypeCode may be filled if the message does not include a reference to a SiteLogisticsRequisition (for example an unexpected receipt). If a reference to SiteLogisticsRequisition exists the SiteLogisticsProcessTypeCode does not need to be filled. However, if it is filled, in certain implementations it can be identical to the SiteLogisticsRequisition.

SiteLogisticsRequestConfirmationItem Package is the grouping of ConfirmationItem package with its packages includes the Date, Location, BusinessTransactionDocumentReference, Quantity, and ProductInformation.

ConfirmationItem refers to the business object SiteLogisticsRequest/node ConfirmationItem. ConfirmationItem contains siteLogisticsConfirmationInventoryChangeItemListCompleteTransmissionIndicator (attribute) which is a GDT of type Indicator and indicates whether ConfirmationItem includes all inventory change references. A actionCode (attribute) is a GDT of type ActionCode. ID is a GDT of type BusinessTransactionDocumentItemID. UUID is a GDT of type UUID and is optional. A TypeCode is a GDT of type BusinessTransactionDocumentItemTypeCode. A SupplyPlanningAreaID is a GDT of typeSupplyPlanningAreaID and is optional. A BaseBusinessTransactionDocumentRequestItemID is a GDT of type BusinessTransactionDocumentItemID and is optional. A SiteLogisticsProcessingStatusCode is a GDT of type NOTSTARTEDINPROCESSFINISHED_ProcessingStatusCode and is optional.

SiteLogisticsRequestConfirmationItemDate Package and ArrivalPeriod refers to the business object SiteLogisticsRequest/node ConfirmationItemDate. An ArrivalPeriod is a period of the type arrival period. ArrivalPeriod contains a TimePointPeriod.

AvailabilityPeriod refers to the business object SiteLogisticsRequest/node ConfirmationItemDate. An AvailabilityPeriod is a period of the type availability period. AvailabilityPeriod contains a TimePointPeriod.

PositioningPeriod refers to the business object SiteLogisticsRequest/node ConfirmationItemDate. A PositioningPeriod is a period of the type positioning period. PositioningPeriod contains a TimePointPeriod.

IssuePeriod refers to the business object SiteLogisticsRequest/node ConfirmationItemDate. An IssuePeriod is a period of the type issue period. IssuePeriod contains a TimePointPeriod.

PickupPeriod refers to the business object SiteLogisticsRequest/node ConfirmationItemDate. A PickupPeriod is a period of the type pickup period. PickupPeriod contains a TimePointPeriod.

SiteLogisticsRequestConfirmationItemLocation Package and ShipFromLocation refer to the business object SiteLogisticsRequest/node ConfirmationItemLocation. A ShipFromLocation is a location of the type ShipFromLocation. ShipFromLocation is of type GDT: BusinessTransactionDocumentLocation.

ShipToLocation refers to the business object SiteLogisticsRequest/node ConfirmationItemLocation. A ShipToLocation is a location of the type ShipToLocation. ShipToLocation is of type GDT: BusinessTransactionDocumentLocation.

SiteLogisticsRequestConfirmationItemBusinessTransactionDocumentReference Package PurchaseOrderItemReference refers to the business object SiteLogisticsRequest/node ConfirmationItemBusinessTransactionDocumentReference. A PurchaseOrderItemReference is a reference to a PurchaseOrderItem. PurchaseOrderItem contains BusinessTransactionDocumentReference.

SalesOrderItemReference refers to the business object SiteLogisticsRequest/node ConfirmationItemBusinessTransactionDocumentReference. A SalesOrderItemReference is a reference to a SalesOrderItem. SalesOrderItem contains BusinessTransactionDocumentReference.

ServiceOrderItemReference refers to the business object SiteLogisticsRequest/node ConfirmationItemBusinessTransactionDocumentReference. A ServiceOrderItemReference is a reference to a ServiceOrderItem. ServiceOrderItem contains BusinessTransactionDocumentReference.

SiteLogisticsConfirmationInventoryChangeItem refers to the business object SiteLogisticsRequest/node ConfirmationItemBusinessTransactionDocumentReference. A SiteLogisticsConfirmationInventoryChangeItem includes the reference to an inventory change item and its actual values. SiteLogisticsConfirmationInventoryChangeItem includes the Reference, ActualValue, FulfilledQuantity, FulfilledQuantityTypeCode, TransactionTimePoint, DocumentCancellationIndicator and CancelledSiteLogisticsConfirmationInventoryChangeItemReference. A Reference is a GDT of type BusinessTransactionDocumentReference. A ActualValue contains FulfilledQuantity and is a GDT of type Quantity. A FulfilledQuantityTypeCode is a GDT of type QuantityTypeCode.TransactionTimePoint is a GDT of type TimePoint. A DocumentCancellationIndicator is a GDT of type Indicator. A CancelledSiteLogisticsConfirmationInventoryChangeItemReference is a GDT of type BusinessTransactionDocumentReference.

SiteLogisticsRequestConfirmationItemQuantity Package and ConfirmedQuantity refer to the business object SiteLogisticsRequest/node ConfirmationItemQuantity. ConfirmedQuantity contains Quantity.

ConfirmedQuantityTypeCode refers to the business object SiteLogisticsRequest/node ConfirmationItemQuantity. ConfirmedQuantityTypeCode contains QuantityTypeCode.

FulfilledQuantity refers to the business object SiteLogisticsRequest/node ConfirmationItemQuantity. FulfilledQuantity contains Quantity.

FulfilledQuantityTypeCode refers to the business object SiteLogisticsRequest/node ConfirmationItemQuantity. FulfilledQuantityTypeCode contains QuantityTypeCode.

WorkInProcessQuantity refers to the business object SiteLogisticsRequest/node ConfirmationItemQuantity. WorkInProcessQuantity contains Quantity.

WorkInProcessQuantityTypeCode refers to the business object SiteLogisticsRequest/node ConfirmationItemQuantity. WorkInProcessQuantityTypeCode contains QuantityTypeCode.

ForwardedQuantity refers to the business object SiteLogisticsRequest/node ConfirmationItemQuantity. FulfilledQuantity contains Quantity.

ForwardedQuantityTypeCode refers to the business object SiteLogisticsRequest/node ConfirmationItemQuantity. ForwardedQuantityTypeCode contains QuantityTypeCode.

SiteLogisticsRequestConfirmationItemProductInformation Package

Product refers to the business object SiteLogisticsRequest/node ConfirmationItemProduct. Product is of type GDT: BusinessTransactionDocumentProduct. SiteLogisticsRequestInventoryChangeItem Package and InventoryChangeItem is change of inventory which is relevant for inventory planning.

InventoryChangeItem contains reconciliationPeriodCounterValue (attribute) which is a GDT of type CounterValue and is the number of reconciliation periods. A SiteLogisticsConfirmationInventoryChangeItemID is a GDT of type BusinessTransactionDocumentReference and Identifies the relevant InventoryChangeItem in SiteLogisticsConfirmation. A FulfilledConfirmationItemID is a GDT of type BusinessTransactionDocumentID and Identifies the ConfirmationItem to which this InventoryChangeItem is related. A TransferGroupID is a GDT of type BusinessTransactionDocumentItemGroupID and Identifies the group of all InventoryChangeItems involved in a transfer posting. A DirectionCode is a GDT of type InventoryMovementDirectionCode and is coded representation of the direction of the inventory movement (inventory receipt, inventory issue). A MaterialID is a GDT of type ProductID and identifies the material of which the inventory is changed. A SupplyPlanningAreaID is a GDT of type SupplyPlanningAreaID and identifies the planning-relevant area in which the inventory is changed.

InventoryRestrictedUseIndicator is a GDT of type Indicator. Quantity is a GDT of type Quantity and quantity of a material by which the inventory is changed. QuantityTypeCode is a GDT of type QuantityTypeCode.

Element Structure of Message Data Type

SiteLogisticsRequestConfirmationReconciliationMessage is this message data type contains the object Site Logistics Request that is contained in the business document the business information that is relevant for sending a business document in a message. It contains the packages MessageHeader and Site Logistics Request.

MessageHeader Package is grouping of business information that is relevant for sending a business document in a message. It contains the entity MessageHeader MessageHeader is grouping of business information from the perspective of the sending application that includes information to identify the business document in a message, information about the sender and information about the recipient (optional). The MessageHeader contains the SenderParty and RecipientParty. It is of the type GDT: BusinessDocumentMessageHeader and includes the ID and ReferenceID.

SenderParty is the partner responsible for sending a business document at the business application level. The SenderParty is of the type GDT: BusinessDocumentMessageHeaderParty. RecipientParty is the partner responsible for receiving a business document at the business application level. The RecipientParty is of the type GDT: BusinessDocumentMessageHeaderParty.

SiteLogisticsRequest Package is the grouping of SiteLogisticsRequest package with its packages: ConfirmationItem. SiteLogisticsRequest refers to the business object SiteLogisticsRequest/root node. SiteLogisticsRequestConfirmationSiteLogisticsRequest includes reconciliationPeriodCounterValue (attribute) is a GDT of type CounterValue and is a reconciliationPeriodCounterValue is the number of reconciliation periods. ID is a GDT of type BusinessTransactionDocumentID and is a unique identifier of the SiteLogiticsRequest UUID and is optional. A BaseBusinessTransactionDocumentID is a GDT of type BusinessTransactionDocumentID and is optional. Readable alternative unique identifier of the business document on which the SiteLogisticsRequest is based, for example the ID of the SiteLogisticsRequisition. A BaseBusinessTransactionDocumentUUID is a GDT of type UUID and is optional. A BaseBusinessTransactionDocumentTypeCode is a GDT of type BusinessTransactionDocumentTypeCode and is optional. Coded representation of the business transaction document type on which the SiteLogisticsRequest is based. Such a business transaction document can be: SiteLogisticsRequisition. A SiteLogisticsProcessTypeCode is a GDT of type SiteLogisticsProcessTypeCode and is optional.

The SiteLogisticsProcessTypeCode can be filled if the message does not include a reference to a SiteLogisticsRequisition (for example an unexpected receipt). If a reference to SiteLogisticsRequisition exists the SiteLogisticsProcessTypeCode does not need to be filled. However, if it is filled it may be identical to the SiteLogisticsRequisition. SiteLogisticsRequestConfirmationItem Package is the grouping of ConfirmationItem package with its packages and includes the Date, Location, BusinessTransactionDocumentReference, Quantity, and ProductInformation.

ConfirmationItem refers to the business object SiteLogisticsRequest/node ConfirmationItem. ConfirmationItem includes the ID, UUID, SupplyPlanningAreaID, BaseBusinessTransactionDocumentRequestItemID, and SiteLogisticsProcessingStatusCode. A ID is a GDT of type BusinessTransactionDocumentItemID. A UUID is a GDT of type UUID. A TypeCode is a GDT of type BusinessTransactionDocumentItemTypeCode. A SupplyPlanningAreaID is a GDT of type SupplyPlanningAreaID and is optional.

A BaseBusinessTransactionDocumentRequestItemID is a GDT of type BusinessTransactionDocumentItemID and is optional. Identification of the RequestItem of the BaseBusinessTransactionDocument that is confirmed by the ConfirmationItem. A SiteLogisticsProcessingStatusCode is a GDT of type NOTSTARTEDINPROCESSFINISHED_ProcessingStatusCode and is optional.

If a definition or GDT for an element is not given, the element is defined by an element of the same name in the business object SiteLogisticsRequisition/node ConfirmationItem.

SiteLogisticsRequestConfirmationItemDate Package and ArrivalPeriod refer to the business object SiteLogisticsRequest/node ConfirmationItemDate. An ArrivalPeriod is a period of the type arrival period. ArrivalPeriod contains a TimePointPeriod.

AvailabilityPeriod refers to the business object SiteLogisticsRequest/node ConfirmationItemDate. An AvailabilityPeriod is a period of the type availability period. AvailabilityPeriod contains a TimePointPeriod.

PositioningPeriod refers to the business object SiteLogisticsRequest/node ConfirmationItemDate. A PositioningPeriod is a period of the type positioning period. PositioningPeriod contains a TimePointPeriod.

IssuePeriod refers to the business object SiteLogisticsRequest/node ConfirmationItemDate. An IssuePeriod is a period of the type issue period. IssuePeriod contains a TimePointPeriod.

PickupPeriod refers to the business object SiteLogisticsRequest/node ConfirmationItemDate. A PickupPeriod is a period of the type pickup period. PickupPeriod contains a TimePointPeriod.

SiteLogisticsRequestConfirmationItemLocation Package and ShipFromLocation refer to the business object SiteLogisticsRequest/node ConfirmationItemLocation. A ShipFromLocation is a location of the type ShipFromLocation. ShipFromLocation is of type GDT: BusinessTransactionDocumentLocation. ShipToLocation refers to the business object SiteLogisticsRequest/node ConfirmationItemLocation. A ShipToLocation is a location of the type ShipToLocation. ShipToLocation is of type GDT: BusinessTransactionDocumentLocation.

SiteLogisticsRequestConfirmationItemBusinessTransactionDocumentReference Package PurchaseOrderItemReference refers to the business object SiteLogisticsRequest/node ConfirmationItemBusinessTransactionDocumentReference. A PurchaseOrderItemReference is a reference to a PurchaseOrderItem. PurchaseOrderItem contains a BusinessTransactionDocumentReference.

SalesOrderItemReference refers to the business object SiteLogisticsRequest/node ConfirmationItemBusinessTransactionDocumentReference. A SalesOrderItemReference is a reference to a SalesOrderItem. SalesOrderItem contains aBusinessTransactionDocumentReference.

ServiceOrderItemReference refers to the business object SiteLogisticsRequest/node ConfirmationItemBusinessTransactionDocumentReference. A ServiceOrderItemReference is a reference to a ServiceOrderItem. ServiceOrderItem contains aBusinessTransactionDocumentReference.

SiteLogisticsConfirmationInventoryChangeItem refers to the business object SiteLogisticsRequest/node ConfirmationItemBusinessTransactionDocumentReference. A SiteLogisticsConfirmationInventoryChangeItem includes the reference to an inventory change item and its actual values. SiteLogisticsConfirmationInventoryChangeItem includes Reference, ActualValue, FulfilledQuantityTypeCode, TransactionTimePoint, DocumentCancellationIndicator, and CancelledSiteLogisticsConfirmationInventoryChangeItemReference. A Reference is a GDT of type BusinessTransactionDocumentReference which is the reference to the inventory change item. A ActualValue is a GDT of Quantity and contains FulfilledQuantity. A FulfilledQuantityTypeCode is a GDT of type QuantityTypeCode. A TransactionTimePoint is a GDT of type TimePoint. DocumentCancellationIndicator is a GDT of type Indicator and is optional.

SiteLogisticsRequestConfirmationItemQuantity Package

ConfirmedQuantity refers to the business object SiteLogisticsRequest/node ConfirmationItemQuantity. ConfirmedQuantity contains Quantity. ConfirmedQuantityTypeCode refers to the business object SiteLogisticsRequest/node ConfirmationItemQuantity. ConfirmedQuantityTypeCode contains QuantityTypeCode.

FulfilledQuantity refers to the business object SiteLogisticsRequest/node ConfirmationItemQuantity. FulfilledQuantity contains Quantity. FulfilledQuantityTypeCode refers to the business object SiteLogisticsRequest/node ConfirmationItemQuantity. FulfilledQuantityTypeCode contains QuantityTypeCode.

WorkInProcessQuantity refers to the business object SiteLogisticsRequest/node ConfirmationItemQuantity. WorkInProcessQuantity contains Quantity. WorkInProcessQuantityTypeCode refers to the business object SiteLogisticsRequest/node ConfirmationItemQuantity. WorkInProcessQuantityTypeCode contains QuantityTypeCode.

ForwardedQuantity refers to the business object SiteLogisticsRequest/node ConfirmationItemQuantity. FulfilledQuantity contains Quantity. ForwardedQuantityTypeCode refers to the business object SiteLogisticsRequest/node ConfirmationItemQuantity. ForwardedQuantityTypeCode contains QuantityTypeCode.

SiteLogisticsRequestConfirmationItemProductInformation Package

Product refers to the business object SiteLogisticsRequest/node ConfirmationItemProduct. Product is of type GDT: BusinessTransactionDocumentProduct. List of Data Types includes Address, BusinessDocumentMessageHeader, BusinessDocumentMessageHeaderParty, BusinessDocumentMessageID, BusinessScope, BusinessTransactionDocumentID, Busi nessTransactionDocumentItemGroupID, BusinessTransactionDocumentItemID, BusinessTransactionDocumentLocation, BusinessTransactionDocumentItemTypeCode, BusinessTransactionDocumentProduct, BusinessTransactionDocumentReference, BusinessTransactionDocumentTypeCode, CounterValue, DateTime, Indicator, LocationID, Note, ProductID, ProductInternalID, NOTSTARTEDINPROCESSFINISHED_ProcessingStatusCode, Quantity, QuantityTypeCode, SiteLogisticsProcessTypeCode, SiteLogisticsRequestConfirmationSiteLogisticsRequest, SiteLogisticsRequestConfirmationSiteLogisticsRequestConfirmationItem, SiteLogisticsRequestConfirmationSiteLogisticsRequestInventoryChangeItem, SupplyPlanningAreaID, and TimePointPeriod.

Business Object Template: Project_Template

FIGS. 244-1 through 244-6 illustrates one example of a project_Template business object model 244000. Specifically, this model depicts interactions among various hierarchical components of the Project_Template, as well as external components that interact with the Project_Template (shown here as 244002 through 244010 and 244082 through 244102).

Business Object Template: Project_Template is a business undertaking with a defined goal that is to be attained in a specified time frame. It can be achieved using predefined funds and planned resources, while reaching an agreed quality level. The project can be characterized by the fact that it may be unique and that it may involve an element of risk.

The business object template Project_Template can comprise all nodes, associations, actions, and queries of its derivations Project 244024 and ProjectSnapshot 244026. It can be used as a starting point for these derivations. It, however, may not be instantiated.

The business objects derived from the business object template Project_Template are part of the process component Project Processing.

A Project_Template contains: the tasks (i.e., Task) to be processed in the project, structured in a hierarchy, information about the services required to execute the project, information about the employees involved in the project.

Project_Template is represented by the root node Project 244018.

Service Interfaces for Business Object Project

The business object Project can be involved in the following process integration models: Project Processing_Accounting, Project Processing_Time and Labour Management, Expense and Reimbursement Management_Project Processing.

Service Interface ProjectTaskConfirmationIn (i.e., ProjectProcessingProjectTaskConfirmationIn) is part of the following process integration model: Project Processing_Time and Labour Management. Service Interface ProjectTaskConfirmationIn can contain operations for accepting confirmations for tasks in projects.

Change Project Based on Employee Time Calendar (A2A) (i.e., ProjectProcessingProjectTaskConfirmationIn-.ChangeProjectBasedOnEmployeeTimeCalendar) may provide confirmations or cancellations of actual work for tasks in projects. The operation is based on the message type ProjectTaskConfirmationNotification (e.g., derived from the business object template Project_Template).

The inbound data can be updated in the projects. The confirmed work can be added to the actual work of the task. The aggregated values can be recalculated for the summary tasks affected. The start and end time of the task can be calculated using the confirmed data. For the actual work, one confirmation can be created per employee for the respective task.

Service Interface Project Task Accountability In (i.e., ProjectProcessingProjectTaskAccountabilityIn) is part of the following process integration models: Internal Request Processing_Project Processing_Coding Block, Purchase Order Processing_Project Processing_Coding Block, Purchase Request Processing_Project Processing_Coding Block, Goods and Service Acknowledgement_Project Processing_Coding Block, Supplier Invoice Processing_Project Processing_Coding Block.

Service Interface Project Task Accountability In can contain operations that provide information about whether tasks can be posted for accounting.

Check Project Task Accountability (A2A) (i.e., ProjectProcessingProjectTaskAccountabilityIn.CheckProjectTaskAccountability) checks whether a task can be posted for accounting. The operation can be based on the message type AccountingObjectCheckRequest and AccountingObjectCheckConfirmation (derived from the dependent object AccountingCodingBlockDistribution).

Service Interface ProjectTaskConfirmationOut (i.e., ProjectProcessingProjectTaskConfirmationOut) is part of the following process integration models: Project Processing-_Time and Labour Management. Service Interface ProjectTaskConfirmationOut can contain operations that provide project data for Time & Labour Management.

Notify of Project (A2A) (i.e., ProjectProcessingProjectTaskConfirmationOut.NotifyOfProject) provides information about tasks and assigned employees in a project. The notification can be sent as soon as a task is released for processing. The recipient can use the information to create a personalized pool of confirmations for the employees taking part in the project. The operation can be based on the message type EmployeeTimeConfirmationViewOfProjectNotification (e.g., derived from the business object template Project_Template).

Service Interface Project Accounting Out (i.e., ProjectProcessingProjectAccountingOut) is part of the following process integration model: Project Processing_Accounting. Service Interface Project Accounting Out can contain operations that provide accounting with project data.

Notify of Project (A2A) (i.e., ProjectProcessingProjectAccountingOut.NotifyOfProject) provides information about tasks in projects. The information can be transferred to be able to represent the values from the business transactions associated with the project and the costing of the project in accounting. The operation can be based on the message type ProjectAccountingNotification (e.g., derived from the business object AccountingNotification).

There may not be Services for Business Object ProjectSnapshot service interface associated with this business object.

Node Structure of the Business Object Template Project_Template (Root Node)

Project_Template is the description of the project, the tasks that it contains with their hierarchy and the services required to execute the project.

The following composition relationships to subordinate nodes exist: Service, Task, Participant, MarketSegment, BusinessProcessVariantType, AccessControlList. Service 244020 has a cardinality of 1:cn, Task 244034 has a cardinality of 1:n, Participant 244066 has a cardinality of 1:cn, MarketSegment 244068 has a cardinality of 1:c, BusinessProcessVariantType 244070 has a cardinality of 1:n, AccessControlList 244072 has a cardinality of 1:1.

The elements located directly at the node Project are defined by the data type: ProjectElements. In certain implementations, these elements may include the following: UUID, ProjectID, SnapshotID, BaseProjectUUID, BaseProjectID, ResponsibleCostCentreUUID, ResponsibleCostCentreID, RequestingCostCentreUUID, RequestingCostCentreID, ProgrammeUUID, ProgrammeID, TypeCode, LanguageCode, TimeZoneCode, PlannedStartDateTime, PlannedEndDateTime, SystemAdministrativeData, DeletionAllowedIndicator, SnapshotBaselineIndicator.

UUID is a universal identifier, which may be unique, of the project. UUID may be based on GDT UUID.

ProjectID is an identifier of the project and is optional. ProjectID may be based on GDT ProjectID.

SnapshotID is an identifier of the project snapshot and is optional. The SnapshotID may be unique in the context of all project snapshots for an operative project (i.e., element BaseProjectID). SnapshotID may be based on GDT ProjectSnapshotID.

BaseProjectUUID is a universal identifier, which may be unique, of the project in which this business object originated and is optional. BaseProjectUUID may be based on GDT UUID.

BaseProjectID is an identifier of the project in which this business object originated and is optional. BaseProjectID may be based on GDT ProjectID.

ResponsibleCostCentreUUID is a universal identifier, which may be unique, of the cost center that is responsible for the project and is optional. ResponsibleCostCentreUUID may be based on GDT UUID.

ResponsibleCostCentreID is the ID of the cost center that is responsible for the project and is optional. ResponsibleCostCentreID may be based on GDT OrganisationalCentreID.

RequestingCostCentreUUID is a universal identifier, which may be unique, of the cost center that commissioned the project and is optional. RequestingCostCentreUUID may be based on GDT UUID. RequestingCostCentreID is an ID of the cost center that commissioned the project and is optional. RequestingCostCentreID may be based on GDT OrganisationalCentreID.

ProgrammeUUID is a universal identifier, which may be unique, of the program to which the project is assigned and is optional. ProgrammeUUID may be based on GDT UUID.

ProgrammeID is the ID of the program to which the project is assigned and is optional. ProgrammeID may be based on GDT OrganisationalCentreID.

TypeCode is the Project type. The type may control specific functions of the project. No constraints may apply to the code. TypeCode may be based on GDT ProjectTypeCode.

LanguageCode is the language used for all forms of communication in the project and in which texts have to be created, at a minimum. Constraints may not apply to the code. German: Projektsprache LanguageCode may be based on GDT LanguageCode.

TimeZoneCode is the coded representation of the time zone in which all the dates and times in the project are expressed. TimeZoneCode may be based on GDT TimeZoneCode.

PlannedStartDateTime is the point in time at which the project is to start and is optional. PlannedStartDateTime may be based on GDT LOCALNORMALISED_DateTime. Qualifiers may include: Start.

PlannedEndDateTime is the point in time at which the project is to end and is optional. PlannedEndDateTime may be based on GDT LOCALNORMALISED_DateTime. Qualifiers may include: End.

SystemAdministrativeData is the information about when and by whom the project snapshot was created and is optional. The element can be used in the projection ProjectSnapshot. SystemAdministrativeData may be based on GDT SystemAdministrativeData.

DeletionAllowedIndicator specifies whether or not the project snapshot may be deleted and is optional. The element can be used in the projection ProjectSnapshot. DeletionAllowedIndicator may be based on GDT Indicator. Qualifiers may include: Allowed.

SnapshotBaselineIndicator specifies whether the project snapshot is the reference point for comparative analyses and is optional. The element can be used in the projection ProjectSnapshot. SnapshotBaselineIndicator may be based on GDT Indicator. Qualifiers may include: ProjectSnapshotBaseline.

A number of inbound association relationships may exist. From the business object Project, node Root; BaseProject 244012 has a cardinality of c:cn and is project in which this project originated. The BaseProject is used also for access control to a ProjectSnapshot. From the business object CostCentre, node Root; ResponsibleCostCentre has a cardinality of c:cn, and is the cost center that is responsible for the project. From the business object CostCentre, node Root, RequestingCostCentre has a cardinality of c:cn, and is the cost center that commissioned the project. From the business object Programme, node Root, Programme has a cardinality of c:cn, and is program the project belongs to. From the business object Identity, node Root, CreationIdentity has a cardinality of 1:cn, and is the identity of the user who created the project snapshot. LastChangeIdentity has a cardinality of c:cn, and is the identity of the user who last changed the project snapshot.

A number of specialization associations for navigation may exist. To the node Task; ProjectSummaryTask 244032 has a cardinality of 1:1, and is a root task in the task hierarchy of the project, SummaryTask 244030 has a cardinality of 1:cn, and is a task in the task hierarchy of the project. This task has subordinate tasks. To the node BusinessProcessVariantType; MainBusinessProcessVariantType has a cardinality of 1:1. To the business object ProjectSnapshot, node Root; ProjectSnapshot has a cardinality of 1:cn, and are snapshots of the project. To the business object ProjectPurchaseRequest, node Item, ProjectPurchaseRequestItem has a cardinality of 1:cn, and is a ProjectPurchaseRequestItem that refers to the project. The project or a task of the project is the accounting object associated to the item of the ProjectPurchaseRequest.

There is one subordinate node Task in the specialization ProjectSummaryTask. In the projection ProjectSnapshot the cardinality of the Inbound Association Relationship "BaseProject" (from business object Project, node Root) is 1:cn. A maximum of one project snapshot that is defined as a reference point for comparative analyses exists per operative project (indicator SnapshotBaselineIndicator).

Enterprise service infrastructure actions include: Copy, CreateSnapshot. Copy creates a copy of the project. This action is allowed in the projection Project. The project for which the action is used is not changed. A new project is created as a copy of the original project. A new ProjectUUID and ProjectID are assigned. ProjectBaseProjectUUID and ProjectBaseProjectID in the new project are derived from ProjectUUID and ProjectID in the original project. The following information is also copied: Elements ActualStartDateTime, ActualEndDateTime, RemainingWorkQuantity, CompletionPercent, ScheduleActivityStartDateTimeConstraintTypeCode, StartConstraintDateTime, ScheduleActivityEndDateTimeConstraintTypeCode and EndConstraintDateTime at the nodes Service, ServiceSpecialisation, Task, and TaskService. All status information. Node TaskServiceConfirmation 244052. The action elements are defined by the data type: ProjectCopyActionElements. These elements are: AttachmentFolderCopyRelevanceIndicator, StaffingAndResponsibilitiesCopyRelevanceIndicator, PlannedWorkCopyRelevanceIndicator. AttachmentFolderCopyRelevanceIndicator specifies whether or not electronic documents (ServiceSpecialisationAttachmentFolder, TaskAttachmentFolder, and TaskChecklistAttachmentFolder) are also copied, is of GDT type Indicator, and has a qualifier: Relevance. StaffingAndResponsibilitiesCopyRelevanceIndicator specifies whether or not the following are also copied: Staffing of the services for the tasks (elements EmployeeID and EmployeeUUID at node TaskService, and related association), employees responsible for tasks and checklists (elements ResponsibleEmployeeID and ResponsibleEmployeeUUID at the nodes Task and TaskChecklist, as well as the related associations), and the employees participating in the project (node Participant), is of GDT type Indicator, qualifier Relevance. PlannedWorkCopyRelevanceIndicator is information on whether or not the planned work at the node Task, TaskService, Service, and ServiceSpecialisation is also copied, and is of GDT type Indicator, qualifier Relevance. This action can, for example, be executed by the user on the user interface.

CreateSnapshot creates a project snapshot for an operative project. This action is allowed in the projection Project. The project for which the action is used is not changed. A snapshot of the operative project is created. The action elements are defined by the data type ProjectCreateSnapshotActionElements. These elements are: SnapshotID, which is optional, and is an identifier of the project snapshot. The SnapshotID is unique in the context of all project snapshots for an operative project (element BaseProjectID), and is of GDT type ProjectSnapshotID. This action can, for example, be executed by the user on the user interface.

A number of queries may exist, including: QueryByResponsibleEmployeeAndOrganisationalCentres, QueryByCreationIdentity, QueryByIDAndAdministrativeData.

QueryByResponsibleEmployeeAndOrganisationalCentres provides a list of all projects for which an employee is responsible. The query elements are defined by the data type ProjectResponsibleEmployeeAndOrganisationalCentresQueryElements. These elements are: TaskResponsibleEmployeeID, which is optional, is of GDT type EmployeeID, and is the identifier of the employee who is responsible for the ProjectSummaryTask, TaskResponsibleEmployeeCommonPersonNameGivenName which is optional, is of GDT type LANGUAGEINDEPENDENT_MEDIUM_Name with qualifier Given, and is the first name of the employee who is responsible for the ProjectSummaryTask, TaskResponsibleEmployeeCommonPersonNameFamilyName which is optional, is of GDT type LANGUAGEINDEPENDENT_MEDIUM_Name and qualifier Family, and is the last name of the employee who is responsible for the ProjectSummaryTask, ResponsibleCostCentreID which is optional, and is of GDT type OrganisationalCentreID, RequestingCostCentreID which is optional and is of GDT type OrganisationalCentreID, ProgrammeID is optional and is of GDT type OrganisationalCentreID, ProjectID which is optional and is of GDT type ProjectID, TaskName which is optional and is of GDT type MEDIUM_Name and qualifier ProjectTask and is the name of the ProjectSummaryTask of the project, TypeCode which is optional and is of GDT type ProjectTypeCode, TaskProjectLifeCycleStatusCode which is optional and is of GDT type ProjectLifeCycleStatusCode and is the status of the life cycle of the ProjectSummaryTask, TaskBlockingStatusCode is optional and is of GDT type BlockStatusCode and is the information on whether the ProjectSummaryTask is blocked, SearchText is optional and is of GDT type SearchText and is the text for free text search.

QueryByCreationIdentity provides a list of all projects that a given user has created. The query elements are defined by the data type: ProjectCreationIdentityQueryElements. These elements are: ProjectID which is optional and is of GDT type ProjectID, TaskName is optional and is of GDT type MEDIUM_Name, qualifier ProjectTask, and is the name of the ProjectSummaryTask of the project, TypeCode is optional and is of GDT type ProjectTypeCode, TaskProjectLifeCycleStatusCode is optional is of GDT type ProjectLifeCycleStatusCode and is the status of the life cycle of the ProjectSummaryTask, TaskBlockingStatusCode is optional and is of GDT type BlockStatusCode and is the information on whether the ProjectSummaryTask is blocked, TaskSystemAdministrativeDataCreationIdentityEmployeeID is optional and is of GDT type EmployeeID, and is the identifier of the employee who created the ProjectSummaryTask (and therefore also the project), TaskSystemAdministrativeDataCreationIdentityBusinessPartnerCommonPersonNameGivenName is optional and is of GDT type LANGUAGEINDEPENDENT_MEDIUM_Name, qualifier Given, and is the first name of the employee who created the ProjectSummaryTask (and therefore also the project), TaskSystemAdministrativeDataCreationIdentityBusinessPartnerCommonPersonNameFamilyName is optional and is of GDT type LANGUAGEINDEPENDENT_MEDIUM_Name, qualifier Family, and is the last name of the employee who created the ProjectSummaryTask (and therefore also the project), SearchText is optional and is of GDT type SearchText and is the text for free text search.

QueryByIDAndAdministrativeData provides a list of all project snapshots using predefined criteria for the key and the creation date. The query elements are defined by the data type ProjectIDAndAdministrativeDataQueryElements. These elements are: BaseProjectID which is optional and is the identifier of the project in which this business object originated and is of GDT type ProjectID, SnapshotID is optional and is of GDT type ProjectSnapshotID, TaskName is optional and is of GDT type MEDIUM_Name, qualifier ProjectTask, and is the name of the ProjectSummaryTask of the project, TypeCode is optional and is of GDT type ProjectTypeCode, SystemAdministrativeDataCreationDateTime is optional and is of GDT type DateTime, qualifier Creation, DeletionAllowedIndicator is optional and is of GDT type Indicator qualifier Allowed.

Service

Service is the type of service required for a project, and the number of times it is to be performed. The following composition relationships to subordinate nodes exist: ServiceSpecialisation 244022, which as a cardinality of 1:n.

The elements located directly at the node Service are defined by the data type: ProjectServiceElements. In certain implementations, these elements may include the following: UUID, ServiceProductUUID, ServiceProductID, SystemAdministrativeData, TotalPlannedWorkQuantity, TotalPlannedWorkQuantityTypeCode, TotalActualWorkQuantity, TotalActualWorkQuantityTypeCode, TotalRemainingWorkQuantity, TotalRemainingWorkQuantityTypeCode, BaseProjectServiceUUID.

UUID is a universal identifier, which may be unique, of the service in the project. UUID may be based non GDT UUID.

ServiceProductUUID is a universal identifier, which may be unique, of the service product that is assigned to the service and is optional. ServiceProductUUID may be based on GDT UUID.

ServiceProductID is an alternative identifier of the service product that is assigned to the service and is optional. ServiceProductID may be based on GDT ProductID.

SystemAdministrativeData is the information about when and by whom the service was created and last changed. SystemAdministrativeData may be based on GDT SystemAdministrativeData. TotalPlannedWorkQuantity is the planned work for the service and is optional. The value can be the sum of the planned work to be carried out when the service is performed. TotalPlannedWorkQuantity may be based on GDT Quantity. Qualifiers may include: Work. In some implementations, restrictions may include: time units are permitted.

TotalPlannedWorkQuantityTypeCode is the coded representation of the type of quantity of planned work for the service and is optional. TotalPlannedWorkQuantityTypeCode may be based on GDT QuantityTypeCode. Qualifiers may include: Work.

TotalActualWorkQuantity is the actual work for the service and is optional. The value can be the sum of the actual work carried out when the service is performed. TotalActualWorkQuantity may be based on GDT Quantity. Qualifiers may include: Work. In some implementations, restrictions may include: time units are permitted.

TotalActualWorkQuantityTypeCode is the coded representation of the type of quantity of actual work for the service and is optional. TotalActualWorkQuantityTypeCode may be based on GDT QuantityTypeCode, Qualifiers may include: Work.

TotalRemainingWorkQuantity is the remaining work for the service and is optional. The value can be the sum of the remaining work to be carried out when the service is performed. TotalRemainingWorkQuantity may be based on GDT Quantity. Qualifiers may include: Work. In some implementations, restrictions may include: time units are permitted.

TotalRemainingWorkQuantityTypeCode is the coded representation of the type of quantity of remaining work for the service and is optional. TotalRemainingWorkQuantityTypeCode may be based on GDT QuantityTypeCode. Qualifiers may include: Work.

BaseProjectServiceUUID is a universal identifier, which may be unique, of the service in the original project. BaseProjectServiceUUID may be based on GDT UUID.

A number of inbound association relationships exist. From the business object ServiceProduct, node Root: ServiceProduct has a cardinality of c:cn, and specifies the service product that is assigned to the service. From the business object Project_Template, node Service: BaseProjectService 244014 has a cardinality of c:cn and is the service in which this service originated. From the business object Identity, node Root: CreationIdentity has a cardinality of 1:cn and is the identity of the user who created the service in the project, LastChangeIdentity has a cardinality of c:cn and is the identity of the user who last changed the service in the project.

In one project, each service product can have one ProjectService. One ProjectService can exist without a service product. In the costing, the price estimation for using a ProjectService without a service product is 0.

ServiceSpecialisation specifies which specialization of the service is used in the project.

German: Servicespezialisierung. For example, the service for the service product "software development" can have the specializations "ABAP development" and "Java development."

The following composition relationships to subordinate nodes exist: ServiceSpecialisationName 244036 has a cardinality of 1:cn, ServiceSpecialisationWorkCoverage 244038 has a cardinality of 1:1, ServiceSpecialisationTextCollection 244040 has a cardinality 1:cs, ServiceSpecialisationAttachmentFolder 244042 has a cardinality of 1:c.

The elements located directly at the node ServiceSpecialisation are defined by the data type: ProjectServiceSpecialisationElements. In certain implementations, these elements may include the following: UUID, SystemAdministrativeData, TotalPlannedWorkQuantity, TotalPlannedWorkQuantityTypeCode, TotalActualWorkQuantity, TotalActualWorkQuantityTypeCode, TotalRemainingWorkQuantity, TotalRemainingWorkQuantityTypeCode, BaseProjectServiceSpecialisationUUID.

UUID is a universal identifier, which may be unique, of the service specialization. UUID may be based on GDT UUID.

SystemAdministrativeData is the information about when and by whom the service specialization, its name, description, or attachments were created and last changed. SystemAdministrativeData may be based on GDT SystemAdministrativeData.

TotalPlannedWorkQuantity is the planned work for the service specialization and is optional. The value can be the sum of the planned work of the assignments of the service specialization to tasks. TotalPlannedWorkQuantity may be based on GDT Quantity. Qualifiers may include: Work. In some implementations, restrictions may include: only time units are permitted.

TotalPlannedWorkQuantityTypeCode is the coded representation of the type of quantity of planned work for the service specialization and is optional. TotalPlannedWorkQuantityTypeCode may be based on GDT QuantityTypeCode. Qualifiers may include: Work.

TotalActualWorkQuantity is the actual work carried out when the service is performed and is optional. The value can be the sum of the actual work of the assignments of the service specialization to tasks. TotalActualWorkQuantity may be based on the following GDT Quantity. Qualifiers may include: Work. In some implementations, restrictions may include: time units are permitted.

TotalActualWorkQuantityTypeCode is the coded representation of the type of quantity of actual work for the service specialization and is optional. TotalActualWorkQuantityTypeCode may be based on GDT QuantityTypeCode. Qualifiers may include: Work.

TotalRemainingWorkQuantity is the remaining work that is to be carried out when the service is performed and is optional. The value can be the sum of the remaining work of the assignments of the service specialization to tasks. TotalRemainingWorkQuantity may be based on GDT Quantity. Qualifiers may include: Work. In some implementations, restrictions may include: time units are permitted.

TotalRemainingWorkQuantityTypeCode is the coded representation of the type of quantity of remaining work for the service specialization and is optional. TotalRemainingWorkQuantityTypeCode may be based on GDT QuantityTypeCode. Qualifiers may include: Work.

BaseProjectServiceSpecialisationUUID is a universal identifier, which may be unqiue, of the service specialization in the original project and is optional. TotalRemainingWorkQuantityTypeCode may be based on GDT UUID.

An number of inbound association relationships may exist: From the business object Project_Template, node ServiceSpecialisation: BaseProjectServiceSpecialisation 244016 has a cardinality of c:cn and is a service specialization in which this service specialization originated. From the business object Identity, node Root: CreationIdentity has a cardinality of 1:cn and is the identity of the user who created the service specialization, LastChangeIdentity has a cardinality of c:cn and is the identity of the user who last changed the service specialization.

A number of associations for navigation may exist: To the node ServiceSpecialisationName: ProjectLanguageName has a cardinality of 1:c and is the name of the service specialization in the project language. To the node TaskService: AssignedTaskService has a cardinality of 1:cn and is the TaskService where the service specialization is assigned to. To the business object ProjectPurchaseRequest, node Item: ProjectPurchaseRequestItem has a cardinality of c:cn and is the ProjectPurchaseRequestItem that refers to the service specialization. The service is procured via this item of a ProjectPurchaseRequest.

ServiceSpecialisationName is the name used for the service specialization in the project. A service specialization can have a name in more than one language. German: Bezeichnung der Servicespezialisierung im Projekt The elements located directly at the node ServiceSpecialisationName are defined by the data type: ProjectServiceSpecialisationNameElements. In certain implementations, these elements may include: Name.

Name is the language-dependent name for the service specialization. Name may be based on GDT MEDIUM_Name. Qualifiers may include: ProjectServiceSpecialisation. In some implementations, restrictions may include: attribute languagecode can be mandatory. One name may exist per service and language.

ServiceSpecialisationWorkCoverage (Transformation Node) is the coverage of the forecasted work for the service specialization by internal employees or externally procured service agents. The elements located directly at the node ServiceSpecialisationWorkCoverage are defined by the data type: ProjectServiceSpecialisationWorkCoverageElements. In certain implementations, these elements may include the following: ForecastWorkQuantity, ForecastWorkQuantityTypeCode, InternallyStaffedWorkQuantity, InternallyStaffedWorkQuantityTypeCode, ExternallyProcuredWorkQuantity, ExternallyProcuredWorkQuantityTypeCode.

ForecastWorkQuantity is the sum of the actual work and the remaining work for the service specialization and is optional. The actual and the remaining work of the service specialization can be the sums of the corresponding values of task services assigned to the service specialization. ForecastWorkQuantity may be based on GDT Quantity. Qualifiers may include: Work. In some implementations, restrictions may include: time units can be permitted.

ForecastWorkQuantityTypeCode is the coded representation of the type of quantity of the forecast work for the service specialization and is optional. ForecastWorkQuantityTypeCode may be based on GDT QuantityTypeCode. Qualifiers may include: Work.

InternallyStaffedWorkQuantity is the sum of the actual work and the remaining work of internally staffed task services assigned to the service specialization and is optional. InternallyStaffedWorkQuantity may be based on GDT Quantity. Qualifiers may include: Work. In some implementations, restrictions may include: time units can be permitted.

InternallyStaffedWorkQuantityTypeCode is the coded representation of the type of quantity of the internally staffed work for the service specialization and is optional. InternallyStaffedWorkQuantityTypeCode may be based on GDT QuantityTypeCode. Qualifiers may include the following: Work.

ExternallyProcuredWorkQuantity is the sum of externally procured work for the service specialization and is optional. ExternallyProcuredWorkQuantity may be based on GDT Quantity. Qualifiers may include: Work. In some implementations, restrictions may include: time units can be permitted. ExternallyProcuredWorkQuantityTypeCode is the coded representation of the type of quantity of the externally procured work for the service specialization and is optional. ExternallyProcuredWorkQuantityTypeCode may be based on GDT QuantityTypeCode. Qualifiers may include: Work. ServiceSpecialisationTextCollection (DO) is the natural-language text for a service specialization.

ServiceSpecialisationAttachmentFolder (DO) are the electronic documents of any type whose content relates to the service specialization. German: Anlagen zur Servicespezialisierung im Projekt.

Participant

Participant is an employee who is participating in the project. German: Projektbeteiligter. The elements located directly at the node Participant are defined by the data type: ProjectParticipantElements. In certain implementations, these elements may include the following: UUID, EmployeeUUID, EmployeeID, SystemAdministrativeData, PlannedStartDateTime, PlannedEndDateTime, DefaultServiceProductUUID, DefaultServiceProductID.

UUID is a universal identifier, which may be unique, of the node Participant. UUID may be based on GDT UUID.

EmployeeUUID is a universal identifier, which may be unique, of the employee. EmployeeUUID may be based on GDT UUID.

EmployeeID is an identifier of the employee. EmployeeID may be based on GDT EmployeeID.

SystemAdministrativeData is information about when and by whom the project participant was created and last changed. SystemAdministrativeData may be based on GDT SystemAdministrativeData.

PlannedStartDateTime is the point in time from which the employee is scheduled to take part in the project and is optional. PlannedStartDateTime may be based on GDT LOCALNORMALISED_DateTime. Qualifiers may include the following: Start.

PlannedEndDateTime is the point in time up to which the employee is scheduled to take part in the project and is optional. PlannedEndDateTime may be based on GDT LOCALNORMALISED_DateTime. Qualifiers may include: End.

DefaultServiceProductUUID is a universal identifier, which may be unique, of the default service product and is optional. DefaultServiceProductUUID may be based on GDT UUID.

DefaultServiceProductID is an identifier of the default service product and is optional. DefaultServiceProductID may be based on GDT ProductID.

A number of inbound association relationships exist: 1) From the business object Employee, node Root: Employee has a cardinality of 1:cn and is the Employee who is participating in this project. 2) From the business object Identity, node Root: CreationIdentity has a cardinality of 1:cn and is the Identity of the user who created the participant, LastChangeIdentity has a cardinality of c:cn and is the Identity of the user who last changed the participant. 3) From the business object ServiceProduct, node Root: DefaultServiceProduct has a cardinality of c:cn and specifies the default service product that is assigned to the participant.

One Participant exists for each employee who is assigned to a service for a task (elements EmployeeID and EmployeeUUID at the node TaskService), or who is responsible for a task or a checklist (elements ResponsibleEmployeeID and ResponsibleEmployeeUUID at the node Task and TaskChecklist). A Participant is not necessarily assigned to a task or responsible for a task or checklist.

QueryByTaskResponsibility provides a list of all project participants who are responsible for given tasks. In some implementations, the identifiers of the employees who are responsible for a task are located in the elements ResponsibleEmployeeUUID and ResponsibleEmployeeID at the node Task.

Query therefore does not use the reuse component Responsibilities.

The query elements are defined by the data type ProjectParticipantTaskResponsibilityQueryElements. These elements are: EmployeeID is optional and is of GDT type EmployeeID, EmployeeCommonPersonNameGivenName is optional and is of GDT type LANGUAGEINDEPENDENT_MEDIUM_Name, qualifier Given, and is the first name of the project participant. EmployeeCommonPersonNameFamilyName is optional (is of GDT type LANGUAGEINDEPENDENT_MEDIUM_Name, qualifier Family, and is the last name of the project participant, ProjectID is optional and is of GDT type ProjectID, and is the identifier of the project to which the task belongs. The project participant is responsible for this task. ProjectTaskID is optional, is the Identifier of the task for which the project participant is responsible, and is of GDT type ProjectElementID. ProjectTaskName is optional, is of GDT type MEDIUM_Name, qualifier ProjectTask, and is the name of the task for which the project participant is responsible. ProjectTaskLifeCycleStatusCode is optional and is of GDT type ProjectTaskLifeCycleStatusCode, and is the status of the life cycle of the task for which the project participant is responsible. ProjectTaskBlockingStatusCode is optional, is of GDT type BlockStatusCode, and is information about whether the task for which the project participant is responsible is blocked. SearchText is optional, is of GDT type SearchText, and is the text for free text search.

QueryByTaskAssignment provides a list of all project participants who are assigned as processors to given tasks. The identifiers of the employees who are assigned to a task as processors are located in the elements AssignedEmployeeUUID and AssignedEmployeeID at the node TaskService.

The query elements are defined by the data type ProjectParticipantTaskAssignmentQueryElements. These elements are: EmployeeID is optional, is of GDT type EmployeeID. EmployeeCommonPersonNameGivenName is optional, is of GDT type LANGUAGEINDEPENDENT_MEDIUM_Name, qualifier Given, and is the first name of the project participant. EmployeeCommonPersonNameFamilyName is optional, is of GDT type LANGUAGEINDEPENDENT_MEDIUM_Name, qualifier Family, and is the last name of the project participant. ProjectID is optional, is of GDT type ProjectID, and is the identifier of the project to which the task belongs. The project participant is assigned to this task as a processor. ProjectTaskID is optional, is the identifier of the task to which the project participant is assigned as a processor, and is of GDT type ProjectElementID. ProjectTaskName is optional, is of GDT type MEDIUM_Name, qualifier ProjectTask, and is the name of the task to which the project participant is assigned as a processor. ProjectTaskLifeCycleStatusCode is optional, is of GDT type ProjectTaskLifeCycleStatusCode, and is the status of the life cycle of the task to which the project participant is assigned as a processor. ProjectTaskBlockingStatusCode is optional, is of GDT type BlockStatusCode, and is information about whether the task to which the project participant is assigned as a processor is blocked. SearchText is optional, is of GDT type SearchText, and is text for free text search.

Task

Task is work that can be carried out during a project to achieve the project goals. German: Aufgabe. Tasks can be structured in a hierarchy. Task (i.e., German: Aufgabe) can occur in the following specializations (e.g., disjoint and not complete): ProjectSummaryTask (e.g., represents the root node of the hierarchy of task nodes), SummaryTask (e.g., contains more task nodes and represents a node in the hierarchy of task nodes). The node Task can be instantiated without a specialization.

The following composition relationships to subordinate nodes exist: TaskRelationship 244044 has a cardinality of 1:cn, and specifies the relationships to succeeding tasks, TaskName 244046 has a cardinality of 1:cn, TaskSummary 244054 has a cardinality of 1:c, TaskService 244050 has a cardinality of 1:cn, TaskTextCollection 244056 has a cardinality of 1:c, TaskAttachmentFolder 244058 has a cardinality of 1:c, TaskChecklist 244064 has a cardinality of 1:cn.

The elements located directly at the node Task are defined by the data type: ProjectTaskElements. In certain implementations, these elements may include the following: UUID, ID, ParentTaskUUID, RightNeighbourTaskUUID, LeftNeighbourTaskUUID, ProjectTaskChecklistID, ResponsibleEmployeeUUID, ResponsibleEmployeeID, SystemAdministrativeData, PlannedDuration, WorkingDayCalendarCode, ScheduleActivityStartDateTimeConstraintTypeCode, ConstraintStartDateTime, ScheduleActivityEndDateTimeConstraintTypeCode, ConstraintEndDateTime, EarliestPlannedPeriod, LatestPlannedPeriod, TotalFloatDuration, TotalPlannedWorkQuantity, TotalPlannedWorkQuantityTypeCode, TotalActualWorkQuantity, TotalActualWorkQuantityTypeCode, TotalRemainingWorkQuantity, TotalRemainingWorkQuantityTypeCode, ActualStartDateTime, ActualEndDateTime, PhaseIndicator, MilestoneIndicator, ChecklistItemIndicator, SummaryTaskIndicator, ConfirmationExtendedApprovalRequiredIndicator, ImportanceCode, BaseProjectTaskUUID, Status, ProjectStartingStatusCode, ReleaseStatusCode, StoppingStatusCode, ClosureStatusCode, ProjectLifeCycleStatusCode, TaskLifeCycleStatusCode, SchedulingUpToDatenessStatusCode, BlockingStatusCode, ProjectMilestoneStatusCode.

UUID is a universal identifier, which may be unique, of the task. UUID may be based on GDT UUID.

ID is an identifier of the task. ID may be based on GDT ProjectElementID.

ParentTaskUUID is a universal identifier, which may be unique, of the superordinate task and is optional. ParentTaskUUID may be based on GDT UUID.

RightNeighbourTaskUUID is a universal identifier, which may be unique, of the right neighbor task and is optional. The direct subtasks of a summary task can have a fixed sort sequence. The sort sequence can be used to determine the right and left neighbor for displaying the tasks in a hierarchy graphic. It may not have an effect on the sequence in which the tasks are performed. RightNeighbourTaskUUID may be based on GDT UUID.

LeftNeighbourTaskUUID is a universal identifier, which may be unqiue, of the left neighbor task and is optional. The direct subtasks of a summary task may have a fixed sort sequence. The sort sequence can be used to determine the right and left neighbor for displaying the tasks in a hierarchy graphic. It may not have an effect on the sequence in which the tasks are performed. LeftNeighbourTaskUUID may be based on GDT UUID.

ProjectTaskChecklistID is an identifier of the checklist to which the task belongs as a checklist item and is optional. ProjectTaskChecklistID may be based on GDT ProjectElementID.

ResponsibleEmployeeUUID is a universal identifier, which may be unique, of the employee who is responsible for the task and is optional. ResponsibleEmployeeUUID may be based on GDT UUID.

ResponsibleEmployeeID is an identifier of the employee who is responsible for the task and is optional. ResponsibleEmployeeID may be based on GDT EmployeeID.

SystemAdministrativeData is information about when and by whom the following were created and last changed including: task, relationship between two tasks, task name, task status, task description, or task attachments. SystemAdministrativeData may be based on GDT SystemAdministrativeData.

PlannedDuration is the planned duration of the task and is optional. PlannedDuration may be based on GDT Duration. Qualifiers may include: Planned. In some implementations, restrictions may include: DAY.

WorkingDayCalendarCode is a factory calendar that is assigned to the task and is optional. If a factory calendar has not been assigned to the task, the factory calendar from the superordinate tasks may be used for scheduling. If a factory calendar has also not been assigned to these tasks, the Gregorian calendar can be used. Constraints may not apply to the code. WorkingDayCalendarCode may be based on GDT WorkingDayCalendarCode.

ScheduleActivityStartDateTimeConstraintTypeCode is the constraint type for the start time of the task. No constraints apply to the code and is optional. ScheduleActivityStartDateTimeConstraintTypeCode may be based on GDT ScheduleActivityStartDateTimeConstraintTypeCode.

ConstraintStartDateTime is the point in time to which the constraint for the start time of the task applies and is optional. ConstraintStartDateTime may be based on GDT LOCALNORMALISED_DateTime. Qualifiers may include the following: Start.

ScheduleActivityEndDateTimeConstraintTypeCode is a constraint type for the end time of the task. No constraints apply to the code and is optional. ScheduleActivityEndDateTimeConstraintTypeCode may be based on GDT ScheduleActivityEndDateTimeConstraintTypeCode ConstraintEndDateTime is the point in time to which the constraint for the end time of the task applies and is optional. ConstraintEndDateTime may be based on GDT LOCALNORMALISED_DateTime. Qualifiers may include: End.

EarliestPlannedPeriod is the earliest planned time period during which the task is to be completed and is optional. EarliestPlannedPeriod may be based on GDT UPPEROPEN_LOCALNORMALISED_DateTimePeriod. Qualifiers may include: Planned. In some implementations, restrictions may include: element Duration may not be used.

LatestPlannedPeriod is the latest planned time period during which the task is to be completed and is optional. LatestPlannedPeriod may be based on GDT UPPEROPEN_LOCALNORMALISED_DateTimePeriod. Qualifiers may include: Planned. In some implementations, restrictions may include: element Duration may not be used.

TotalFloatDuration is the total float for the task and is optional. TotalFloatDuration may be based on GDT Duration. Qualifiers may include: Float.

TotalPlannedWorkQuantity is the planned work for the task and is optional. The value can be the sum of the planned work to be carried out when the services related to the task are performed (i.e., node TaskService). TotalPlannedWorkQuantity may be based on GDT Quantity. Qualifiers may include: Work. In some implementations, restrictions may include: time units can be permitted.

TotalPlannedWorkQuantityTypeCode is the coded representation of the type of quantity of planned work for the task and is optional. TotalPlannedWorkQuantityTypeCode may be based on GDT QuantityTypeCode. Qualifiers may include: Work.

TotalActualWorkQuantity is the actual work confirmed for the task and is optional. The value can be the sum of the actual work carried out when the services related to the task are performed (i.e., node TaskService). TotalActualWorkQuantity may be based on GDT Quantity. Qualifiers may include: Work. In some implementations, restrictions may include: time units can be permitted.

TotalActualWorkQuantityTypeCode is the coded representation of the type of quantity of actual work for the task and is optional. TotalActualWorkQuantityTypeCode may be based on GDT QuantityTypeCode. Qualifiers may include: Work.

TotalRemainingWorkQuantity is the work still to be performed before the task is completed and is optional. The value can be the sum of the remaining work to be carried out when the services related to the task are performed (i.e., node TaskService). TotalRemainingWorkQuantity may be based on GDT Quantity. Qualifiers may include: Work. In some implementations, restrictions may include: time units can be permitted.

TotalRemainingWorkQuantityTypeCode is the coded representation of the type of quantity of remaining work for the task and is optional. TotalRemainingWorkQuantityTypeCode may be based on GDT QuantityTypeCode. Qualifiers may include: Work.

ActualStartDateTime is the point in time at which the task actually starts and is optional. ActualStartDateTime may be based on GDT LOCALNORMALISED_DateTime. Qualifiers may include: Start.

ActualEndDateTime is the point in time at which the task actually ends and is optional. ActualEndDateTime may be based on GDT LOCALNORMALISED_DateTime. Qualifiers may include: End.

PhaseIndicator is the information on whether the task is a phase. A phase can be a section of a project that is executed in a defined period of time, and that is distinct from other sections in term of its content. PhaseIndicator may be based on GDT ProjectTaskPhaseIndicator Qualifier ProjectTaskPhase. MilestoneIndicator is the information on whether the task is a milestone. A milestone can be an important intermediate goal that is to be achieved during a project. MilestoneIndicator may be based on GDT ProjectTaskMilestoneIndicator, Qualifier ProjectTaskMilestone.

ChecklistItemIndicator is information on whether the task is a checklist item. ChecklistItemIndicator may be based on GDT ProjectTaskChecklistItemIndicator, Qualifier ProjectTaskChecklistItem.

SummaryTaskIndicator is the information on whether the task represents a summary task. SummaryTaskIndicator may be based on GDT ProjectTaskSummaryTaskIndicator, Qualifier ProjectTaskSummaryTask.

ConfirmationExtendedApprovalRequiredIndicator specifies whether an extended approval process is required for the confirmation. ConfirmationExtendedApprovalRequiredIndicator may be based on GDT Indicator. Qualifiers may include: Required.

ImportanceCode is the coded representation of the importance of the task and is optional. It can describe how important the task is for the success of the project. ImportanceCode may be based on GDT ImportanceCode.

BaseProjectTaskUUID is a universal identifier, which may be unique, of the task in the original project and is optional. BaseProjectTaskUUID may be based on GDT UUID.

Status is the current step in the life cycle of the task. The status elements can be defined by the data type: ProjectTaskStatus. In certain implementations, these elements may include the following: ProjectStartingStatusCode, ReleaseStatusCode, StoppingStatusCode, ClosureStatusCode, ProjectLifeCycleStatusCode, TaskLifeCycleStatusCode, SchedulingUpToDatenessStatusCode, BlockingStatusCode, ProjectMilestoneStatusCode.

ProjectStartingStatusCode is information about whether the project has already started and is optional. ProjectStartingStatusCode, may be based on GDT StartingStatusCode/ReleaseStatusCode is the information about whether the project or task has been released and is optional. ReleaseStatusCode may be based on GDT ReleaseStatusCode.

StoppingStatusCode is the information about whether the project or task has been stopped and is optional. StoppingStatusCode may be based on GDT StoppingStatusCode.

ClosureStatusCode is the information about whether the project or task has been closed and is optional. ClosureStatusCode may be based on GDT ClosureStatusCode.

ProjectLifeCycleStatusCode is the current step in the life cycle of the project and is optional. ProjectLifeCycleStatusCode may be based on GDT ProjectLifeCycleStatusCode.

TaskLifeCycleStatusCode is the current step in the life cycle of the task and is optional. TaskLifeCycleStatusCode may be based on GDT ProjectTaskLifeCycleStatusCode.

SchedulingUpToDatenessStatusCode is the information about whether the scheduled data is up-to-date or out-of-date and is optional. SchedulingUpToDatenessStatusCode may be based on GDT UpToDatenessStatusCode.

BlockingStatusCode is the information about whether the task is blocked and is optional. BlockingStatusCode may be based on GDT BlockingStatusCode.

ProjectMilestoneStatusCode is the information about whether a milestone is reached and is optional. ProjectMilestoneStatusCode may be based on GDT ProjectMilestoneStatusCode.

A number of inbound association relationships exist. 1) From the node Task: ParentTask has a cardinality of c:cn and specifies the superordinate task node in the hierarchy. 2) From the business object Employee, node Root: ResponsibleEmployee has a cardinality of c:cn Specifies the employee who is responsible for this task. 3) From the business object Project_Template, node Task: BaseProjectTask 244028 has a cardinality of c:cn, and is the task in which this task originated. 4) From the business object Identity, node Root: CreationIdentity has a cardinality of 1:cn, and is the identity of the user who created the task. LastChangeIdentity has a cardinality of c:cn, and is the identity of the user who last changed the task.

A number of associations for navigation exist. 1) To the node Task: ChildTask has a cardinality of c:cn and specifies the subordinate task nodes in the hierarchy, RightNeighbourTask has a cardinality of c:c and is right neighbour task in the sort sequence of the subtasks of a summary task, LeftNeighbourTask has a cardinality of c:c and is the left neighbour task in the sort sequence of the subtasks of a summary task, ProjectSummaryTask has a cardinality of cn:1 and is the root task in the task hierarchy of the project. 2) To the node TaskName: ProjectLanguageName has a cardinality of 1:c and is the name of the task in the project language.

In some implementations, there is no outbound ParentTask association relationship from a task node in the specialization ProjectSummaryTask. There is at least one inbound ParentTask association relationship to a task node in the specialization SummaryTask. For each ParentTask association relationship, there is one ChildTask association relationship that runs in the opposite direction between the same two task nodes. SummaryTaskIndicator has the value “true” if the task has at least one subordinate task. PhaseIndicator can only have the value “true” if the task is located directly under ProjectSummaryTask or under a task that is also a phase. ChecklistItemIndicator has the value “true” if there is an association ChecklistItemTask from the task to the node TaskChecklistItem.

In some implementations, if ScheduleActivityStartDateTimeConstraintTypeCode is specified, ConstraintStartDateTime can also be specified (exception: no reference time is required for code 1=“earliest possible”). If ScheduleActivityEndDateTimeConstraintTypeCode is specified, ConstraintEndDateTime can also be specified (exception: no reference time is required for code 1=“latest possible”). If the task is a ProjectSummaryTask, the element SystemAdministrativeData also contains the corresponding information about the root node or the status of the root node. In the specialization ProjectSummaryTask, the elements UUID and ID contain the same values as the elements UUID and ProjectID (in the business object Project), or UUID and BaseProjectID (in the business object ProjectSnapshot) of the root node. The associations RightNeighbourTask and LeftNeighbourTask define the sort sequence of the subordinate tasks of one summary task. Exactly one of the subordinate tasks of a summary task has no left neighbour and exactly one has no right neighbour. When navigating repeatedly along the RightNeighbourTask association, starting from an arbitray task, no task is reached twice.

The Copy action copies a task within a project. In some implementations, this action is allowed in the projection Project. This action may not allowed for the ProjectSummaryTask. The task for which the action is used is not changed. A new task is created in the project. In addition to the task itself, the following are also copied: the subtasks of the task, the relationship between these subtasks, the services for the tasks (node TaskService), and the assigned checklists. The following information is also copied: the elements UUID, ID, ActualStartDateTime, ActualEndDateTime, RemainingWorkQuantity, CompletionPercent, StartConstraintDateTime, StartConstraintType, EndConstraintDateTime, EndConstraintType, all relationships to tasks that are not copied, all status information.

The action elements are defined by the data type: ProjectTaskCopyActionElements. These elements are: TargetParentTaskUUID, TargetRightNeighbourTaskUUID. TargetParentTaskUUID is optional and is the identifier of the task below which the new task is added to the task hierarchy and is of GDT type UUID, TargetRightNeighbourTaskUUID is optional and is the identifier of the task to the left of which the new task is added to the task hierarchy. The direct subtasks of a summary task have a fixed sort sequence. The sort sequence is only used for displaying the tasks. It has no effect on the sequence in which the tasks are performed. TargetRightNeighbourTaskUUID is of GDT type UUID.

One parameter can always exist. TargetParentTaskUUID is used if the new task is to be added to the hierarchy below a task that has no subtasks yet, or if there is to be no task to the right of the new task. In all other cases, TargetRightNeighbourTaskUUID is used. The action cannot be called directly from the user interface.

The Move action moves a task within a project. In some implementations, this action is only allowed in the projection Project. This action is not allowed for the ProjectSummaryTask. This action can be performed if the TaskLifeCycle status variable has the value “In Planning” or “Released.” The task is moved to another position in the task hierarchy of the project. The ParentTaskUUID, RightNeighbourTaskUUID and LeftNeighbourTaskUUID can change. All other relationships of the task remain unchanged. The action elements are defined by the data type: ProjectTaskMoveActionElements. These elements are: TargetParentTaskUUID, which is optional and is the identifier of the task below which the task is added to the task hierarchy and is of GDT type UUID, TargetRightNeighbourTaskUUID is optional and is the identifier of the task to the left of which the task is added to the task hierarchy. In some implementations, the direct subtasks of a summary task have a fixed sort sequence. The sort sequence is only used for displaying the tasks. It has no effect on the sequence in which the tasks are performed, and is of GDT type UUID. One parameter can always exist. TargetParentTaskUUID is used if the task is to be added to the hierarchy below a task that has no subtasks yet, or if there is to be no task to the right of the new task. In all other cases, TargetRightNeighbourTaskUUID is used. The action cannot be called directly from the user interface.

The StartProject action officially starts the project. The value of the Start status variable will be set to “Started.” The action is only allowed for tasks in the specialization ProjectSummaryTask. This action can be performed if the ProjectStarting status variable has the value “Not Started.” The value of the ProjectStarting status variable will be set to “Started.” This action can, for example, be executed by the user on the user interface.

The Delete action caused the task to be deleted when this action is performed. This action will first determine the entire hierarchy which belongs to the task. As a next step, it has to check if the entire substructure can be deleted. If this is possible, the entire hierarchy will be deleted. This action can be performed if the TaskLifeCycle status variable has the value "In Planning" This action can be performed if the ProjectLifeCycle status variable has the value "In Planning." The task is deleted. This action can, for example, be executed by the user on the user interface.

The Release action releases the task for further processing and work confirmation when this action is performed. The value of the Release status variable will be set to "Released." This action will first determine the entire hierarchy which belongs to the task. As a next step, it has to check if the entire substructure can be released (an already released, canceled or closed sub structure will not prevent the release action). If this is possible, the entire hierarchy will be released by performing the Release action on every single sub-node, setting the value of the Release status variable to "Released." This action is enabled when the Release status variable has the value "Not Released" and when the ProjectStarting variable is set to "Started." In the case of the ProjectSummaryTask, this action is allowed when the Release status variable has the value "Not Released." The value of the Release status variable will be set to "Released." This action can, for example, be executed by the user on the user interface.

The Stop action stops the task when this action is performed. When a ProjectSummaryTask is stopped, it means that the project has not been successfully completed. When a task is stopped, it means that the task does not need to be completed in order to successfully finish the project. When the action is performed you can no longer change or confirm work on the task. The remaining work will be set back to 0 and the relevant relationships will be invalidated (task relationships are used by the scheduling process).

This action will first determine the entire hierarchy which belongs to the task. As a next step, it has to check if the entire substructure can be stopped (an already stopped or a closed substructure will not prevent stopping). If this is possible, the entire hierarchy will be stopped by performing the Stop action on every single sub-node, setting the value of the Stopping status variable to "Stopped." This action is enabled when the Stopping status variable has the value "Not Stopped." The remaining work (element RemainingWorkQuantity in the node TaskPlannedWork) is set to zero. The value of the Stopping status variable will be set to "Stopped." When a task is stopped every subordinate task in the hierarchy is also stopped. This action can, for example, be executed by the user on the user interface.

When the RevokeStopping action is performed changes to the task are again permitted. This action will first determine the entire hierarchy which belongs to the task. As a next step, it has to check if the RevokeStopping can be performed on the entire substructure. If this is possible, the entire hierarchy will be reset to "Not Stopped" by performing the RevokeStopping action on every sub-node. The value of the Stopping status variable will be reset to "Not Stopped" on every subnode. In some implementations, the action has to check if the superordinated task is released. If this is the case, the task and its underlying sub tree have to be automatically released. This action is enabled when the Stopping status variable has the value "Stopped." The remaining work (element RemainingWorkQuantity in the node TaskPlannedWork) is reset to the value that was valid before the Stop action was executed. The value of the Stopping status variable will be reset to "Not Stopped." This action can, for example, be executed by the user on the user interface.

When the Close action is performed, the task is closed. When a task or project is closed it means that it has been successfully completed. When the action is performed you can no longer change or confirm work on the task. The remaining work will be set to 0 and the relevant task relationships will be invalidated. This action will first determine the entire hierarchy which belongs to the task. As a next step, it has to check if the entire substructure can be closed (an already closed or a canceled substructure will not prevent the close action). If this is possible, the entire hierarchy will be closed by performing the Closure action on every sub-node. The value of the Closure status variable will be set to "Closed" on every sub-node. This action is enabled when the Closure status variable has the value "Not Closed" and when the Release variable has the value "Released." The remaining work (element RemainingWorkQuantity) is set to zero. The value of the Closure status variable will be set to "Closed." This action can, for example, be executed by the user on the user interface.

When the RevokeClosure action is performed changes to the task are again permitted, the remaining work will be set back to its value prior to the execution of the Close action, and the relevant task relationships will be reactivated. This action will first determine the entire hierarchy which belongs to the task. As a next step, it has to check if the RevokeClosure can be performed on the entire substructure. If this is possible, the entire hierarchy will be reset to "Not Closed" by performing the RevokeClosure action on every sub-node. The value of the Closure status variable will be reset to "Not Closed" on every sub-node. This action is enabled when the Closure status variable has the value "Closed." The remaining work (element RemainingWorkQuantity) is reset to the value that was valid before the Close action was executed. The value of the Closure status variable will be reset to "Not Closed." This action can, for example, be executed by the user on the user interface.

When the Block action is performed, the task is blocked. The blocking process has a temporary nature then the cancellation process. When the action is performed you can no longer change or confirm work on the task. When a task is blocked every subordinate task in the hierarchy is also blocked. The Block action will first determine the entire hierarchy which belongs to the task. As a next step it has to check if the entire substructure can be blocked (an already blocked substructure will not prevent the block action). If this is possible the entire hierarchy will be blocked by performing the Block action on every sub-node. The value of the Blocking status variable will be set to "Blocked" on every node where the action is performed. This action is enabled when the Blocking variable has the value "Not Blocked" and the Stopping variable has the value "Not Stopped" and the Closure variable has the value "Not Closed." The value of the Blocking status variable will be set to "Blocked." This action can, for example, be executed by the user on the user interface.

When the Unblock action is performed, changes to the task and work confirmation are again permitted as long as the task is not canceled or closed. This action will first determine the entire hierarchy which belongs to the task. As a next step, it has to check if the Unblock action can be performed on the entire substructure. If this is possible, the entire hierarchy will be reset to "Not Blocked", by performing the Unblock action on every sub-node. The value of the Blocking status variable will be reset to "Not Blocked" on every sub-node. This action is enabled when the Blocking status variable has the value "Blocked." The value of the Blocking status variable will be reset to "Not Blocked." This action can, for example, be executed by the user on the user interface.

When the Schedule action is performed, the project itself and all dependent tasks are scheduled. When the Schedule action is successfully performed, the status variable will be set to "Up to date." In some implementations, the action is allowed for tasks in the specialization ProjectSummaryTask. This action can be performed if the SchedulingUpToDateness variable has the value "Not up to date." The elements EarliestPlannedPeriod, LatestPlannedPeriod, and TotalFloatDuration are calculated for all tasks. The element PlannedDuration of the summary tasks (SummaryTask) and the project summary task (ProjectSummaryTask) is calculated. When the Schedule action is successfully performed, the status variable will be set to "Up to date." This action can, for example, be executed by the user on the user interface.

When the ReachMilestone action is successfully performed the ProjectMilestone status variable will be set to "Reached." This action can be performed if the ProjectMilestone variable has the value "Not Reached" and the Release status variable has the value "Released." When the ReachMilestone action is successfully performed the ProjectMilestone status variable will be set to "Reached." This action can, for example, be executed by the user on the user interface.

When the CheckMilestoneRelevance action is successfully performed the ProjectMilestone status variable will be set to "Not Reached" or "Not Relevant" depending of the value of the milestone indicator. This action can be performed if the ProjectMilestone variable has the value "Not Reached" or "Not Relevant" and the TaskLifeCycle variable is "In Planning." When the CheckMilestoneRelevance action is performed the ProjectMilestone status variable will be set to "Not Reached" or "Not Relevant" depending of the value of the milestone indicator. This action is used internally.

When the RevokeReachMilestone action is successfully performed the ProjectMilestone status variable will be set to "Not Reached." This action can be performed if the ProjectMilestone variable has the value "Reached." When the RevokeReachMilestone action is successfully performed the ProjectMilestone status variable will be set to "Not Reached." This action can, for example, be executed by the user on the user interface.

The AddServiceConfirmation action can add a TaskServiceConfirmation. In some implementations, this action is only allowed in the projection Project. The task has to be released. If the task is a ProjectSummaryTask it has to be released or started. The system adds a TaskServiceConfirmation to the TaskService specified by the service product and the employee given as parameters. If no appropriate TaskService exists, the system creates a TaskService. If no ProjectService for the given service product exists, the system creates a ProjectService. The action elements are defined by the data type: ProjectTaskAddServiceConfirmationActionElements. These elements are: •ServiceProductID, •AssignedEmployeeID, •EmployeeTimeCalendarPeriodItemID, •ConfirmationPeriod, •ConfirmedWorkQuantity, •ConfirmedWorkQuantityTypeCode, •CompletedIndicator. ServiceProductID is optional, is an identifier of the service that has been performed, and is of GDT type ProductID. AssignedEmployeeID is an identifier of the employee whose work has been confirmed and is of GDT type EmployeeID. EmployeeTimeCalendarPeriodItemID is optional, is the identifier of the employee time item from the business object EmployeeTimeCalendar under which the confirmation was entered, and is of GDT type BusinessTransactionDocumentID. ConfirmationPeriod is the time period for which the actual work for the task was confirmed, and is of GDT type UPPEROPEN_LOCALNORMALISED_DateTimePeriod. ConfirmedWorkQuantity is optional, is the actual work confirmed for the task, and is of GDT type Quantity, qualifier Work. ConfirmedWorkQuantityTypeCode is optional, is the coded representation of the type of quantity of actual work confirmed for the task, and is of GDT type QuantityTypeCode, qualifier Work. CompletedIndicator is the information about whether the employee's work is complete as regards the service for the task, and is of GDT type Indicator, qualifier Completed. The action is used in the operation ChangeProjectBasedOnEmployeeTimeCalendar of service interface ProjectTaskConfirmationIn.

QueryByResponsibleEmployee provides a list of all tasks for which an employee is responsible. The query elements are defined by the data type ProjectTaskResponsibleEmployeeQueryElements. These elements include: ResponsibleEmployeeID, ResponsibleEmployeeCommonPersonNameGivenName, ResponsibleEmployeeCommonPersonNameFamilyName, ProjectID, ProjectTypeCode, ID, ProjectTaskName, LifeCycleStatusCode, BlockingStatusCode, SearchText. ResponsibleEmployeeID is optional, is of GDT type EmployeeID, and is the identifier of the employee who is responsible for the task. ResponsibleEmployeeCommonPersonNameGivenName is optional, is of GDT type LANGUAGEINDEPENDENT_MEDIUM_Name, qualifier Given, and is the first name of the employee who is responsible for the task. ResponsibleEmployeeCommonPersonNameFamilyName is optional, is of GDT type LANGUAGEINDEPENDENT_MEDIUM_Name, qualifier Family, and is the last name of the employee who is responsible for the task. ProjectID is optional, and is of GDT type ProjectID. ProjectTypeCode is optional, is of GDT type ProjectTypeCode, and is the project type. ID is optional, and is of GDT type ProjectElementID. ProjectTaskName is optional, and is of GDT type MEDIUM_Name, qualifier ProjectTask. LifeCycleStatusCode is optional, and is of GDT type ProjectTaskLifeCycleStatusCode. BlockingStatusCode is optional, and is of GDT type BlockingStatusCode. SearchText is optional, is of GDT type SearchText, and is the text for free text search.

TaskRelationship is the relationship of one task to another task that is to be processed subsequently. TaskRelationship can define the type of relationship and how much time there is between processing the tasks. The elements located directly at the node TaskRelationship are defined by the data type: ProjectTaskRelationshipElements. In certain implementations, these elements may include the following: UUID, PredecessorTaskUUID, PredecessorTaskID, SuccessorTaskUUID, SuccessorTaskID, NetworkPlanElementSuccessionTypeCode, LagDuration, WorkingDayCalendarCode.

UUID is a universal identifier, which may be unique, of the relationship. UUID may be based on GDT UUID.

PredecessorTaskUUID is a universal identifier, which may be unique, of the preceding task. PredecessorTaskUUID may be based on GDT UUID.

PredecessorTaskID is an identifier of the preceding task. PredecessorTaskID may be based on GDT ProjectElementID.

SuccessorTaskUUID is a universal identifier, which may be unique, of the succeeding task. SuccessorTaskUUID may be based on GDT UUID.

SuccessorTaskID is an identifier of the succeeding task. SuccessorTaskID may be based on GDT ProjectElementID.

NetworkPlanElementSuccessionTypeCode is the relationship type. Constraints may not apply to the code. NetworkPlanElementSuccessionTypeCode may be based on GDT NetworkPlanElementSuccessionTypeCode.

LagDuration is the time span between the preceding and succeeding task, which are linked by the relationship and is optional. LagDuration may be based on is of GDT type Duration, Qualifier Lag. In some implementations, restrictions may include: DAY.

WorkingDayCalendarCode is the factory calendar that is assigned to the relationship and is optional. If a factory calendar has not been assigned, the factory calendar from the superordinate tasks can be used for scheduling. If a factory calendar has also not been assigned to these tasks, the Gregorian calendar can be used. Constraints may not apply to the code. WorkingDayCalendarCode may be based on GDT WorkingDayCalendarCode.

An inbound aggregation relationship from the node Task exists. PredecessorTaskRelationship has a cardinality of 1:cn and specifies the relationships to preceding tasks.

TaskName is a name for a task. A task can have a name in more than one language. The elements located directly at the node TaskName are defined by the data type: ProjectTaskNameElements. In certain implementations, these elements may include the following: Name.

Name is the language-dependent name for the task. Name may be based on GDT MEDIUM_Name, Qualifier ProjectTask. In some implementations, restrictions may include: attribute languagecode can be mandatory. In some implementations, a maximum of one name may exist per task and language.

TaskSummary is the aggregation of values from the tasks that are subordinate to a task. The elements located directly at the node TaskSummary are defined by the data type: ProjectTaskSummaryElements. In certain implementations, these elements may include the following: TotalPlannedWorkQuantity, TotalPlannedWorkQuantityTypeCode, TotalActualWorkQuantity, TotalActualWorkQuantityTypeCode, TotalRemainingWorkQuantity, TotalRemainingWorkQuantityTypeCode, AggregatedActualStartDateTime, AggregatedActualEndDateTime.

TotalPlannedWorkQuantity is the total planned work of all subordinate tasks and is optional. TotalPlannedWorkQuantity may be based on GDT Quantity, Qualifier Work. In some implementations, restrictions may include: time units can be permitted.

TotalPlannedWorkQuantityTypeCode is the coded representation of the type of quantity of planned work of all subordinate tasks and is optional. TotalPlannedWorkQuantityTypeCode may be based on GDT QuantityTypeCode. Qualifiers may include: Work.

TotalActualWorkQuantity is the total actual work carried out by all subordinate tasks and is optional. TotalActualWorkQuantity may be based on GDT Quantity, Qualifier Work. In some implementations, restrictions may include: time units can be permitted.

TotalActualWorkQuantityTypeCode is the coded representation of the type of quantity of actual work of all subordinate tasks and is optional. TotalActualWorkQuantityTypeCode may be based on GDT QuantityTypeCode. Qualifiers may include: Work.

TotalRemainingWorkQuantity is the total work still to be carried out by all subordinate tasks and is optional. TotalRemainingWorkQuantity may be based on GDT Quantity, Qualifier Work. In some implementations, restrictions may include: time units can be permitted.

TotalRemainingWorkQuantityTypeCode is the coded representation of the type of quantity of remaining work of all subordinate tasks and is optional. TotalRemainingWorkQuantityTypeCode may be based on GDT QuantityTypeCode. Qualifiers may include: Work.

AggregatedActualStartDateTime is the carliest of the actual starting date/times for all subordinate tasks and is optional. AggregatedActualStartDateTime may be based on GDT LOCALNORMALISED_DateTime. Qualifiers may include: Start.

AggregatedActualEndDateTime is the latest of the actual end date/times for all subordinate tasks and is optional. AggregatedActualEndDateTime may be based on GDT LOCALNORMALISED_DateTime. Qualifiers may include: End.

TaskService is the definition of a service for a task and an employee who is responsible for processing the task. The following composition relationships to subordinate nodes exist: TaskServiceConfirmation has a cardinality of 1:cn.

The elements located directly at the node TaskService are defined by the data type: ProjectTaskServiceElements. In certain implementations, these elements may include the following: UUID, ServiceProductUUID, ServiceProductID, ProjectServiceSpecialisationUUID, AssignedEmployeeUUID, AssignedEmployeeID, SystemAdministrativeData, PlannedWorkQuantity, PlannedWorkQuantityTypeCode, TotalActualWorkQuantity, TotalActualQuantityTypeCode, RemainingWorkQuantity, RemainingWorkQuantityTypeCode, ActualStartDateTime, ActualEndDateTime, BaseProjectTaskServiceUUID.

UUID is a universal identifier, which may be unique, of the service for the task. UUID may be based on GDT UUID.

ServiceProductUUID is a universal identifier, which maybe unique, of the service product that is assigned to the task and is optional. ServiceProductUUID may be based on GDT UUID.

ServiceProductID is an identifier of the service product that is assigned to the task and is optional. ServiceProductID may be based on GDT ProductID.

ProjectServiceSpecialisationUUID is a universal identifier, which may be unique, of the service specialization and is optional. ProjectServiceSpecialisationUUID may be based on GDT UUID.

AssignedEmployeeUUID is a universal identifier, which may be unique, of the employee who performs the service for a task and is optional. AssignedEmployeeUUID may be based on GDT UUID.

AssignedEmployeeID is an identifier of the employee who carries out the service for a task and is optional. AssignedEmployeeID may be based on GDT EmployeeID.

SystemAdministrativeData is the information about when and by whom the service for the task was created and last changed. SystemAdministrativeData may be based on GDT SystemAdministrativeData.

PlannedWorkQuantity is the planned work of the service for the task and is optional. PlannedWorkQuantity may be based on GDT Quantity. Qualifiers may include: Work. In some implementations, restrictions may include: time units can be permitted.

PlannedWorkQuantityTypeCode is the coded representation of the type of quantity of planned work of the service for the task and is optional. PlannedWorkQuantityTypeCode may be based on GDT QuantityTypeCode. Qualifiers may include: Work.

TotalActualWorkQuantity is the actual work that has been confirmed for the service of the task and is optional. The value can be the sum of the confirmed actual work of the service for the task (i.e., node TaskServiceConfirmation). TotalActualWorkQuantity may be based on GDT Quantity. Qualifiers may include: Work. In some implementations, restrictions may include: time units can be permitted.

TotalActualQuantityTypeCode is the coded representation of the type of quantity of actual work of the service for the task and is optional. TotalActualQuantityTypeCode may be based on GDT QuantityTypeCode. Qualifiers may include: Work.

RemainingWorkQuantity is the work still to be performed before the task is completed and is optional. RemainingWorkQuantity may be based on GDT Quantity. Qualifiers may include: Work. In some implementations, restrictions may include: time units can be permitted.

RemainingWorkQuantityTypeCode is the coded representation of the type of quantity of remaining work of the service for the task and is optional. RemainingWorkQuantityTypeCode may be based on GDT QuantityTypeCode. Qualifiers may include: Work.

ActualStartDateTime is the point in time from which the service for the task was actually performed and is optional. ActualStartDateTime may be based on GDT LOCALNORMALISED_DateTime, Qualifier Start.

ActualEndDateTime is the point in time up to which the service for the task was actually performed and is optional. ActualEndDateTime may be based on GDT LOCALNORMALISED_DateTime, Qualifier End.

BaseProjectTaskServiceUUID is a universal identifier, which may be unique, of the service for the task in the original project and is optional. BaseProjectTaskServiceUUID may be based on GDT UUID.

A number of inbound association relationships exist, including: 1) From the node ServiceSpecialisation: ServiceSpecialisation has a cardinality of 1:cn, and is the service specialization that is assigned to the node TaskService. 2) From the business object Employee, node Root: AssignedEmployee has a cardinality of c:cn, and is the employee who processes the task. 3) From the business object ServiceProduct, node Root: ServiceProduct has a cardinality of c:cn, and is the service product that is carried out for the task. 4) From the business object Project_Template, node TaskService: BaseProjectTaskService 244048 has a cardinality of c:cn, and is the service for the task in which this service for the task originated. 5) From the business object Identity, node Root: CreationIdentity has a cardinality of 1:cn, and is the identity of the user who created the task service. LastChangeIdentity has a cardinality of c:cn, and is the identity of the user who last changed the task service.

Associations for navigation to the business object ProjectPurchaseRequest, node Item include: ProjectPurchaseRequestItem has a cardinality of c:cn and is the ProjectPurchaseRequestItem that refers to the task service. The service for the task service is procured via this item of a ProjectPurchaseRequest.

Each task has a maximum of one service with the same combination of service specialization and employee. A task, however, can have several services with the same service specializations, but without assigned employees.

QueryByAssignedEmployeeAndServiceProduct provides a list of all tasks services with a given service product and to which an employee is assigned, that is, on which an employee is working. The query elements are defined by the data type ProjectTaskServiceAssignedEmployeeAndServiceProductQueryElements. These elements include: AssignedEmployeeID is optional, is of GDT type EmployeeID, and is the identifier of the employee who performs the service for the task. AssignedEmployeeCommonPersonNameGivenName is optional, is of GDT type LANGUAGEINDEPENDENT_MEDIUM_Name, qualifier Given, and is the first name of the employee who performs the service for the task. AssignedEmployeeCommonPersonNameFamilyName is optional, is of GDT type LANGUAGEINDEPENDENT_MEDIUM_Name, qualifier Family, and is the last name of the employee who performs the service for the task. ServiceProductID is optional, and is of GDT type ProductID. ProjectID is optional, and is of GDT type ProjectID. ProjectTypeCode is optional and is of GDT type ProjectTypeCode. ProjectTaskID is optional and is of GDT type ProjectElementID. ProjectTaskName is optional and is of GDT type MEDIUM_Name, qualifier ProjectTask. ProjectTaskLifeCycleStatusCode is optional and is of GDT type ProjectTaskLifeCycleStatusCode. ProjectTaskBlockingStatusCode is optional and is of GDT type BlockingStatusCode. SearchText is optional, is of GDT type SearchText, and is the Text for free text search.

TaskServiceConfirmation is a confirmation of the work that has actually been carried out by an employee when performing a service for a task. The elements located directly at the node TaskServiceConfirmation are defined by the data type: ProjectTaskServiceConfirmationElements. In certain implementations, these may include the following elements: UUID, EmployeeUUID, EmployeeTimeCalendarPeriodItemID, SystemAdministrativeData, Period, ConfirmedWorkQuantity, ConfirmedWorkQuantityTypeCode, RemainingWorkQuantity, RemainingWorkQuantityTypeCode, CompletedIndicator, CancelledIndicator.

UUID is a universal identifier, which may be unique, of the confirmation for the task. UUID may be based on GDT UUID.

EmployeeUUID is an identifier of the employee whose work has been confirmed and is optional. EmployeeUUID may be based on GDT UUID.

EmployeeTimeCalendarPeriodItemID is an identifier of the employee time item from the business object EmployeeTimeCalendar under which the confirmation was entered and is optional. EmployeeTimeCalendarPeriodItemID may be based on GDT BusinessTransactionDocumentID.

SystemAdministrativeData is the information about when and by whom the confirmation for the task was created and last changed. SystemAdministrativeData may be based on GDT SystemAdministrativeData.

Period is the time period for which the actual work for the task was confirmed. Period may be based on GDT UPPEROPEN_LOCALNORMALISED_DateTimePeriod Qualifier Confirmation. In some implementations, restrictions may include the following: Duration may not be used.

ConfirmedWorkQuantity is the actual work confirmed for the task and is optional. ConfirmedWorkQuantity may be based on GDT Quantity, Qualifier Work. In some implementations, restrictions may include: time units can be permitted.

ConfirmedWorkQuantityTypeCode is the coded representation of the type of quantity of work confirmed for the task and is optional. ConfirmedWorkQuantityTypeCode may be based on GDT QuantityTypeCode. Qualifiers may include: Work.

RemainingWorkQuantity is the oork still to be performed before the task is completed and is optional. RemainingWorkQuantity may be based on GDT Quantity. Qualifiers may include: Work. In some implementations, restrictions may include: time units can be permitted.

RemainingWorkQuantityTypeCode is the coded representation of the type of quantity of remaining work and is optional. RemainingWorkQuantityTypeCode may be based on GDT QuantityTypeCode. Qualifiers may include: Work.

CompletedIndicator is information about whether the employee's work is complete as regards the service for the task. CompletedIndicator may be based on GDT Indicator. Qualifiers may include: Completed.

CancelledIndicator is the information about whether the confirmation was canceled. CancelledIndicator may be based on GDT Indicator. Qualifiers may include: Cancelled.

A number of inbound association relationships exist, including: 1) From the business object Employee, node Root: Employee has a cardinality of c:cn, and is an employee whose work was confirmed. 2) From business object EmployeeTimeCalendar, node PeriodItem: EmployeeTimeCalendarPeriodItem has a cardinality of c:c, and specifies the employee time that was confirmed. 3) From the business object Identity, node Root: CreationIdentity has a cardinality of 1:cn Identity of the user who created the task service confirmation. LastChangeIdentity has a cardinality of c:cn, and is the identity of the user who last changed the task service confirmation.

For the GDT Quantity, time units are permitted as the unitCode.

QueryByEmployeeTimeCalendarPeriodItemID provides a list of all confirmations for task services for a given period item of the employee time calendar. The query elements are defined by the data type ProjectTaskServiceConfirmationEmployeeTimeCalendarPeriodItemIDQueryElements. These elements include: EmployeeTimeCalendarPeriodItemID is optional, and is of GDT type BusinessTransactionDocumentID.

TaskTextCollection (DO) is the natural-language text for a task.

TaskAttachmentFolder (DO) are the electronic documents of any type whose content relates to the task.

TaskChecklist may define which list of tasks can be executed or checked for a task. In some implementations, checklists can be used for quality assurance, among other things.

The following composition relationships to subordinate nodes exist: TaskChecklistName 244076 has a cardinality of 1:cn, TaskChecklistItem 244074 has a cardinality of 1:cn, TaskChecklistTextCollection 244078 has a cardinality of 1:c, TaskChecklistAttachmentFolder 244080 has a cardinality of 1:c.

The elements located directly at the node TaskChecklist are defined by the data type: ProjectTaskChecklistElements. In certain implementations, these elements may include the following: UUID, ID, ResponsibleEmployeeUUID, ResponsibleEmployeeID, SystemAdministrativeData, ImportanceCode, BaseProjectTaskChecklistUUID, Status, ItemsChecklistResultStatusCode, ResultStatusCode, BlockingStatusCode, TaskLifeCycleStatusCode.

UUID is a universal identifier, which may be unqiue, of the checklist. UUID may be based on GDT UUID.

ID is an identifier of the checklist. ID may be based on GDT ProjectElementID.

ResponsibleEmployeeUUID is a universal identifier, which may be unique, of the employee who is responsible for the checklist and is optional. ResponsibleEmployeeUUID may be based on GDT UUID.

ResponsibleEmployeeID is an identifier of the employee who is responsible for the checklist and is optional. ResponsibleEmployeeID may be based on GDT EmployeeID.

SystemAdministrativeData is the information about when and by whom the following were created or last changed: checklist, checklist name, checklist status, checklist description, or checklist attachments. SystemAdministrativeData may be based on GDT SystemAdministrativeData.

ImportanceCode is the coded representation of the importance of the checklist and is optional. It can describe how important the checklist is for the success of the project. ImportanceCode may be based on GDT ImportanceCode.

BaseProjectTaskChecklistUUID is a universal identifier, which may be unique, of the checklist and is optional. BaseProjectTaskChecklistUUID may be based on GDT UUID.

Status is the current step in the life cycle of the checklist. The status elements can be defined by the data type: ProjectTaskChecklistStatus. These elements may include the following: ItemsChecklistResultStatusCode, ResultStatusCode, BlockingStatusCode, TaskLifeCycleStatusCode.

ItemsChecklistResultStatusCode is the result of the checklist and is optional. ItemsChecklistResultStatusCode may be based on GDT ChecklistResultStatusCode.

ResultStatusCode is the aggregated result of the checklist points and is optional. ResultStatusCode may be based on GDT ChecklistResultStatusCode.

BlockingStatusCode is the information about whether the relevant task is blocked and is optional. BlockingStatusCode may be based on GDT BlockingStatusCode.

TaskLifeCycleStatusCode is the current step in the life cycle of the relevant task and is optional. TaskLifeCycleStatusCode may be based on GDT ProjectTaskLifeCycleStatusCode.

Associations for navigation include: To the node TaskChecklistName, ProjectLanguageName has a cardinality of 1:c, and is the name of the checklist in the project language.

A number of inbound association relationships may exist, including: 1) From the business object Employee, node Root: ResponsibleEmployee has a cardinality of c:cn, and specifies which employee is responsible for this checklist. 2) From the business object Project_Template, node TaskChecklist: BaseProjectTaskChecklist 244060 has a cardinality of c:cn, and is a checklist in which this checklist originated. 3) From the business object Identity, node Root: CreationIdentity has a cardinality 1:cn, and is the iIdentity of the user who created the checklist. LastChangeIdentity has a cardinality of c:cn, and is identity of the user who last changed the checklist.

Move moves a checklist within a project. In some implementations, this action is allowed in the projection Project. The checklist is assigned to a different task in the project. The checklist items remain unchanged. The action elements are defined by the data type ProjectTaskChecklistMoveActionElements. These elements include: TargetTaskUUID, which is optional, is the identifier of the task to which the checklist is assigned, and is of GDT type UUID. The action cannot be called directly from the user interface.

The SetToOpen action is performed when you want to mark the result of the Checklist as open. The value of the Result status variable will be set to "Open." This action can be performed if the Result variable has the value "Ok", "Not OK", or "No relevant." The value of the CheckListResult status variable will be set to "Open." This action can, for example, be executed by the user on the user interface.

The SetToOk action is performed when you want to mark the result of the Checklist as OK. The value of the Result status variable will be set to "OK." This action can be performed if the Result variable has the value "Open," "Not OK", or "No relevant." The value of the CheckListResult status variable will be set to "OK." This action can, for example, be executed by the user on the user interface.

The SetToNotOk action is performed when you want to mark the result of the Checklist as not OK. The value of the Result status variable will be set to "Not OK." This action can be performed if the Result variable has the value "Open", "OK", or "No relevant." The value of the CheckListResult status variable will be set to "Not OK." This action can, for example, be executed by the user on the user interface.

The SetToNotRelevant action is performed when you want to mark the result of the Checklist as not relevant. The value of the Result status variable will be set to "Not relevant." This action can be performed if the Result variable has the value "Open," "Not OK," or "OK." The value of the CheckListResult status variable will be set to "Not relevant." This action can, for example, be executed by the user on the user interface.

TaskChecklistName is a name for a checklist. A checklist can have a name in more than one language. The elements located directly at the node TaskChecklistName are defined by the data type: ProjectTaskChecklistNameElements. In certain implementations, these elements may include the following: Name.

Name is the language-dependent name for the checklist. Name may be based on GDT MEDIUM_Name, Qualifier ProjectTaskChecklist. In some implementations, restrictions may include: attribute languageCode can be mandatory. A maximum of one name may exist per checklist and language.

TaskChecklistItem is a link between a task and a checklist. The task becomes part of the checklist via this link. German: Checklistenpunkt. The elements located directly at the node TaskChecklistItem are defined by the data type: ProjectTaskChecklistItemElements. In certain implementations, this may include the following elements: UUID, AssignedTaskUUID, BaseProjectTaskChecklistItemUUID, Status, ChecklistResultStatusCodem BlockingStatusCode, TaskLifeCycleStatusCode.

UUID is a universal identifier, which may be unique, of the checklist item. UUID may be based on GDT UUID.

AssignedTaskUUID is an identifier of the task that is assigned to the checklist item. AssignedTaskUUID may be based on GDT UUID.

BaseProjectTaskChecklistItemUUID is a universal identifier, which may be unique, of the checklist item and is optional. BaseProjectTaskChecklistItemUUID may be based on GDT UUID.

Status is the current step in the life cycle of the checklist item. The status elements can be defined by the data type: ProjectTaskChecklistItemStatus. These elements may include: ChecklistResultStatusCode, BlockingStatusCode, TaskLifeCycleStatusCode.

ChecklistResultStatusCode is the result of the checklist item and is optional. TaskLifeCycleStatusCode may be based on GDT ChecklistResultStatusCode.

BlockingStatusCode is the information about whether the superordinate task is blocked and is optional. BlockingStatusCode may be based on GDT BlockingStatusCode.

TaskLifeCycleStatusCode is the current step in the life cycle of the superior task and is optional. TaskLifeCycleStatusCode may be based on GDT ProjectTaskLifeCycleStatusCode.

A number of inbound association relationships may exist, including: 1) From the node Task, ChecklistItemTask has a cardinality of 1:c, and specifies the task of the project that represents the checklist item. 2) From the business object Project_Template, node TaskChecklistItem, BaseProjectTaskChecklistItem 244062 has a cardinality of c:cn, and is a Checklist item in which this checklist item originated.

MoveUp moves a checklist item up one position within a checklist. In some implementations, this action is allowed in the projection Project. The sequence of the checklist items changes. In some implementations, the items of a checklist have a fixed sort sequence. The access methods return the checklist items in this sequence. This action can, for example, be executed by the user on the user interface.

MoveDown moves a checklist item down one position within a checklist. In some implementations, this action is allowed in the projection Project. The sequence of the checklist items changes. The items of a checklist have a fixed sort sequence. The access methods return the checklist items in this sequence. This action can, for example, be executed by the user on the user interface.

The SetToOpen action is performed when you want to mark the result of the checklist item as open. The value of the Result status variable will be set to "Open." This action can be performed if the CheckListResult variable has the value "OK", "Not OK", or "Not relevant." The value of the CheckListResult status variable will be set to "Open." This action can, for example, be executed by the user on the user interface.

The SetToOk action is performed when you want to mark the result of the checklist item as OK. The value of the Result status variable will be set to "OK." This action can be performed if the CheckListResult variable has the value "Open", "Not OK", or "Not relevant." The value of the CheckListResult status variable will be set to "OK." This action can, for example, be executed by the user on the user interface.

The SetToNotOk action is performed when you want to mark the result of the checklist item as not OK. The value of the Result status variable will be set to "Not OK." This action can be performed if the CheckListResult variable has the value "Open", "OK", or "Not relevant." The value of the CheckListResult status variable will be set to "Not OK." This action can, for example, be executed by the user on the user interface.

The SetToNotRelevant action is performed when you want to mark the result of the checklist item as not relevant. The value of the Result status variable will be set to "Not relevant." This action can be performed if the CheckListResult variable has the value "Open", "Not OK", or "OK." The value of the CheckListResult status variable will be set to "Not relevant." This action can, for example, be executed by the user on the user interface.

TaskChecklistTextCollection is the natural-language text for a checklist.

TaskChecklistAttachmentFolder are the electronic documents of any type whose content relates to the checklist.

MarketSegment (DO) is the market segment to which the project is assigned.

BusinessProcessVariantType

A BusinessProcessVariantType defines the character of a business process variant of the project. It can represent a typical way of processing of a project within a process component from a business point of view. A Business Process Variant can be a configuration of a Process Component. A Business Process Variant may belong to one process component.

A process component can be a software package that realizes a business process and exposes its functionality as services. The functionality can contain business transactions. A process component can contain one or more semantically related business objects. A business object may belong to one process component.

The elements located directly at the node BusinessProcessVariantType are defined by the data type: ProjectBusinessProcessVariantTypeElements, derived from BusinessProcessVariantTypeElements (Template). In certain implementations, these elements may include the following: BusinessProcessVariantTypeCodem MainIndicator.

A BusinessProcessVariantTypeCode is a coded representation of a business process variant type of a BusinessProcessVariantType. BusinessProcessVariantTypeCode may be based on GDT BusinessProcessVariantTypeCode. In some implementations, restrictions may include: The following code values can be allowed: "For Overhead Cost Projects," "For Other Direct Cost Projects," "With Time Recording," and "With Purchasing."

MainIndicator is the indicator that specifies whether the current BusinessProcessVariantTypeCode is the main one or not. MainIndicator may be based on GDT Indicator. Qualifiers may include: Main.

The following Integrity Conditions may apply: one of the instances of the ProjectBusinessProcessVariantType can be allowed to be indicated as main; the code values "For Overhead Cost Projects" and "For Other Direct Cost Projects" can be marked as main business process variant types.

AccessControlList (DO)

AccessControlList (DO) is a list of access groups that have access to a Project during a validity period. The node AccessControlList can be relevant for the projection Project. (e.g., For the projection ProjectSnapshot the associated BaseProject is used for access control.)

Derived Business Objects

The following derivations of the business object template Project_Template have been implemented as business objects: Project, ProjectSnapshot.

The following table shows which nodes are available for these derivations.

| | Business Object | |
|---|---|---|
| Node | Project | ProjectSnapshot |
| Root | X | X |
| Service | X | X |
| ServiceSpecialisation | X | X |
| ServiceSpecialisationName | X | X |
| ServiceSpecialisationWorkCoverage | X | |
| ServiceSpecialisationTextCollection | X | X |
| ServiceSpecialisationAttachmentFolder | X | X |
| Task | X | X |
| TaskRelationship | X | X |
| TaskName | X | X |
| TaskSummary | X | X |
| TaskService | X | X |
| TaskServiceConfirmation | X | |
| TaskTextCollection | X | X |
| TaskAttachmentFolder | X | X |
| TaskChecklist | X | X |
| TaskChecklistItem | X | X |
| TaskChecklistName | X | X |
| TaskChecklistTextCollection | X | X |
| TaskChecklistAttachmentFolder | X | X |
| Participant | X | X |
| MarketSegmentAssignment | X | X |
| BusinessProcessVariantType | X | |
| AccessControlList | X | |

The following integrity matrix describes which actions are available for the above derivations.

| | Business Object | |
|---|---|---|
| Node/Action | Project | ProjectSnapshot |
| Root/Copy | X | |
| Root/CreateSnapshot | X | |
| Task/Copy | X | |
| Task/Move | X | |
| Task/StartProject | X | |
| Task/Delete | X | |
| Task/Release | X | |
| Task/Stop | X | |
| Task/RevokeStopping | X | |
| Task/Close | X | |
| Task/RevokeClosure | X | |
| Task/Block | X | |
| Task/Unblock | X | |
| Task/Schedule | X | |
| Task/AddServiceConfirmation | X | |
| Task/ReachMilestone | X | |
| Task/CheckMilestoneRelevance | X | |
| Task/RevokeReachMilestone | X | |
| TaskChecklist/Move | X | |
| TaskChecklist/SetToOpen | X | |
| TaskChecklist/SetToOk | X | |
| TaskChecklist/SetToNotOk | X | |
| TaskChecklist/SetToNotRelevant | X | |
| TaskChecklistItem/MoveUp | X | |
| TaskChecklistItem/MoveDown | X | |
| TaskChecklistItem/SetToOpen | X | |
| TaskChecklistItem/SetToOk | X | |
| TaskChecklistItem/SetToNotOk | X | |
| TaskChecklistItem/SetToNotRelevant | X | |

The following integrity matrix describes which queries are available for the above

| | Business Object | |
|---|---|---|
| Node/Query | Project | ProjectSnapshot |
| Root/QueryByResponsible-EmployeeAndOrganisationalCentres | X | |
| Root/QueryByCreationIdentity | X | |
| Root/QueryByIDAndAdministrativeData | | X |
| Participant/QueryByTaskResponsibility | X | |
| Participant/QueryByTaskAssignment | X | |
| Task/QueryByResponsibleEmployee | X | |
| TaskService/QueryByAssignedEmployee-AndServiceProduct | X | |
| TaskServiceConfirmation/QueryByEmployee-TimeCalendarPeriodItemID | X | |

Business Object Project

Business Object Project is a Business undertaking with a defined goal that is to be attained in a specified time frame. It can be achieved using predefined funds and planned resources, while reaching an agreed quality level. The project can be characterized by the fact that it may be unique and that it involves an element of risk.

The business object Project belongs to the process component Project Processing.

The business object Project may have almost the same structure as the business object template Project_Template. Differences at element level can be shown in an earlier integrity table.

Business Object ProjectSnapshot

Business Object ProjectSnapshot is a Snapshot of a project that documents the state of a project.

A project snapshot may not be changed.

Usage may be as follows: a project snapshot can be used to determine key performance indicators, for example, in the milestone trend analysis or the earned value analysis, or to compare the planned scope with the actual scope.

The business object ProjectSnapshot belongs to the process component Project Processing.

The business object ProjectSnapshot can have almost the same structure as the business object template Project_Template. The node TaskServiceConfirmation can be omitted. In other words, the individual confirmation records may not be transferred to the snapshot.

FIG. 245 illustrates one example logical configuration of EmployeeTimeConfirmation-ViewOfProjectNotificationMessage message 245000. Specifically, this figure depicts the arrangement and hierarchy of various components such as one or more levels of packages, entities, and datatypes, shown here as 245000 through 245022. As described above, packages may be used to represent hierarchy levels. Entities are discrete business elements that are used during a business transaction. Data types are used to type object entities and interfaces with a structure. For example, EmployeeTimeConfirmation-ViewOfProjectNotificationMessage message 245000 includes, among other things, Project 254004. Accordingly, heterogeneous applications may communicate using this consistent message configured as such.

FIG. 246 illustrates one example logical configuration of ProjectTaskConfirmationMessage message 246000. Specifically, this figure depicts the arrangement and hierarchy of various components such as one or more levels of packages, entities, and datatypes, shown here as 246000 through 246020. As described above, packages may be used to represent hierarchy levels. Entities are discrete business elements that are used during a business transaction. Data types are used to type object entities and interfaces with a structure. For example, ProjectTaskConfirmationMessage message 246000 includes, among other things, Project 246006. Accordingly, heterogeneous applications may communicate using this consistent message configured as such.

FIG. 247-1 through 247-8 illustrates one example logical configuration of EmployeeTimeConfirmation-ViewOfProjectNotification message 247000. Specifically, this figure depicts the arrangement and hierarchy of various components such as one or more levels of packages, entities, and datatypes, shown here as 247000 through 247190. As described above, packages may be used to represent hierarchy levels. Entities are discrete business elements that are used during a business transaction. Data types are used to type object entities and interfaces with a structure. For example, EmployeeTimeConfirmationViewOfProjectNotification message 247000 includes, among other things, Project 247044. Accordingly, heterogeneous applications may communicate using this consistent message configured as such.

FIG. 248-1 through 248-6 illustrates one example logical configuration of ProjectTaskConfirmationNotificationMessage message 248000. Specifically, this figure depicts the arrangement and hierarchy of various components such as one or more levels of packages, entities, and datatypes, shown here as 248000 through 248148. As described above, packages may be used to represent hierarchy levels. Entities are discrete business elements that are used during a business transaction. Data types are used to type object entities and interfaces with a structure. For example, ProjectTaskConfirmationNotificationMessage message 248000 includes, among other things, Project 248044. Accordingly, heterogeneous applications may communicate using this consistent message configured as such.

This section describes the message types and their signatures that can be derived from the operations of the business object template Project_Template. In a signature, the business object can be contained as a "leading" business object. The message data type can define the structure of the message types. Message Types can include ProjectTaskConfirmation-Notification and EmployeeTimeConfirmation-ViewOfProjectNotification.

ProjectTaskConfirmationNotification can be the message that transfers the data that has been entered and approved in the time recording system to the project management system. The structure of this message type can be determined by the message data type ProjectTaskConfirmationNotificationMessage. Integrity Conditions may include the following: one message can contain multiple confirmations relating to different tasks. All of these tasks can belong to the same project. Use may be explained as follows: the message type ProjectTaskConfirmationNotification can be used by the business object Project in the operation Notify of Project. The data can be used to record in the project management system who has worked on what project task, regardless of whether the person for whom confirmations have been entered was scheduled to work on the project task.

EmployeeTimeConfirmationViewOfProjectNotification can be the message that replicates all data in the project management system that is relevant for time recording and transfers it to a time recording system, and/or updates the data in the time recording system. The structure of this message type can be determined by the message data type EmployeeTimeConfirmationViewOfProjectNotificationMessage. The following Integrity Condition may be applicable: the message can contain all confirmation-relevant data for a project. Use may be defined as: the message type EmployeeTimeConfirmationViewOfProjectNotification and can be used by the business object Project in the operation Change Project on Employee Time Calendar. This data may be needed to represent a worklist in the time recording system and to simplify data entry.

ProjectTaskConfirmationMessage message data type can contain the Project_Template object that is in the business document, the business information that is relevant for sending a BusinessDocument in a message. This message data type contains the packages: MessageHeader package, Project package. This message data type, therefore, can provide the structure for the operations that are based on it. MessageHeader Package is a grouping of business information that is relevant for sending a business document in a message. It can contain the entity MessageHeader.

MessageHeader MessageHeader is a grouping of business information from the perspective of the sending application including: Identification of the business document in a message, Date/time of the creation of the message, Information about the sender, Information about the recipient, Reconciliation counter. The MessageHeader is of the type GDT: BusinessDocumentMessageHeader. In certain implementations, these elements may include the following: ID, CreationDateTime, SenderParty, RecipientParty, ReconciliationMessageIndicator. ID can be the Identifier of the message. ID may be based on GDT BusinessDocumentMessageID. CreationDateTime can be the Date/time of the creation of the message. CreationDateTime may be based on GDT DateTime. SenderParty can be the information about the sender. SenderParty may be based on GDT BusinessDocumentMessageHeaderParty. RecipientParty can be the information about the recipient. RecipientParty may be based on GDT BusinessDocumentMessageHeaderParty. ReconciliationMessageIndicator can be the reconciliation counter. ReconciliationMessageIndicator may be based on GDT Indicator. Project Package can be the grouping of the BO Project with its packages: Task package. The following Integrity Condition may apply: the Project package can contain one project.

Project may be defined in business object template Project-_Template/node Root. The use may be defined as follows: Project contains information about the identification of the project, and data that is relevant for all nodes of the project.

The elements located at Project are defined by the type IDT: ProjectTaskConfirmationNotificationProject. In certain implementations, this may include the following: ReconciliationPeriodCounterValue, ID.

ReconciliationPeriodCounterValue can be the number of the current reconciliation period. ReconciliationPeriodCounterValue may be based on GDT CounterValue. The following Qualifier may apply: ReconciliationPeriod. ID can be the readable identifier of the project. ID may be based on GDT ProjectID.

Task Package can be the grouping of the task. The use may be defined as: each task package can contain data that is relevant for time recording for all tasks in a project. Task may be defined in the business object template Project_Template/node Task. Task can contain information that is required to uniquely identify a task. In certain implementations, Task may contain the following elements: taskServiceConfirmationListCompleteTransmissionIndicator, ID, TaskServiceConfirmation.

taskServiceConfirmationListCompleteTransmissionIndicator is an indicator that defines whether all confirmations for tasks are transferred. taskServiceConfirmationListCompleteTransmissionIndicator may be based on GDT Indicator. Qualifiers may include: CompleteTransmission. ID can be the Identifier of the task. ID may be based on GDT ProjectElementID. TaskServiceConfirmation can be the structure containing elements from the confirmation. TaskServiceConfirmation may be based on IDT ProjectTaskConfirmationNotificationProjectTaskServiceConfirmation.

TaskServiceConfirmation TaskServiceConfirmation may be defined in business object template Project_Template/node TaskServiceConfirmation. Use may be defined as: TaskServiceConfirmation can contain data for time confirmations or for the cancellation of time confirmations. In certain implementations, TaskServiceConfirmation can contain the following elements: ServiceProductID, AssignedEmployeeID, EmployeeTimeCalendarPeriodItemID, ConfirmationPeriod, ConfirmedWorkQuantity, ConfirmedWorkQuantityTypeCode, CancelledIndicator, CompletedIndicator. ServiceProductID is an identifier of the confirmed product. ServiceProductID may be based on GDT ProductID. AssignedEmployeeID is an identifier of the employee whose work was confirmed. AssignedEmployeeID may be based on GDT PartyInternalID. EmployeeTimeCalendarPeriodItemID is an identifier of the employee time item from the business object EmployeeTimeCalendar under which the confirmation was entered. EmployeeTimeCalendarPeriodItemID may be based on GDT BusinessTransactionDocumentID. ConfirmationPeriod can be the time period for which the actual work for the task was confirmed. ConfirmationPeriod may be based on GDT UPPEROPEN_GLOBAL_DateTimePeriod. Qualifiers may include: Confirmation. ConfirmedWorkQuantity can be the actual work confirmed for the task. ConfirmedWorkQuantity may be based on GDT Quantity, Qualifiers may include: Work. ConfirmedWorkQuantityTypeCode may be based on GDT QuantityTypeCode. Qualifiers may include: Work. CancelledIndicator is an indicator for a cancellation. CancelledIndicator may be based on GDT Indicator. Qualifiers may include: Cancelled. CompletedIndicator is an indicator for a final confirmation. CompletedIndicator may be based on GDT Indicator. Qualifiers may include: Completed.

The following Integrity Conditions may apply: TaskServiceConfirmation may not have an ActionCode (e.g., this is because new instances can be created from this node—also in the case of a cancellation); ServiceProductID may be empty in the case of a cancellation; AssignedEmployeeID can be identified by specifying the readable key (i.e., SchemeID can be "PartyID"); AssignedEmployeeID may be empty in the case of a cancellation; EmployeeTimeCalendarPeriodItemID can be mandatory; ConfirmationPeriod may be empty in the case of a cancellation; ConfirmationWorkQuantity may be empty in the case of a cancellation; CancelledIndicator can be mandatory: in the case of a cancellation, it has the value "true," and EmployeeTimePeriodItem can be transferred. Everything else can be ignored; In the case of a time confirmation, it can have the value "false."; CompletedIndicator can be mandatory. If it is transferred for an unplanned assignment, it can be ignored. An assignment is unplanned if no TaskService instance exists for the constellation Employee, ServiceProduct, and Task in the BO Project.

List of Data Types Used (GDTs) may include: BusinessDocumentMessageHeader, BusinessDocumentMessageHeaderParty, BusinessDocumentMessageID, BusinessTransactionDocument, BusinessTransactionDocumentReference, DateTime, DateTimePeriod, Indicator, PartyInternalID, ProductID. ProjectID, ProjectElementID, Quantity, UUID.

Element Structure of Message Data Type EmployeeTimeConfirmationViewOfProjectNotification Message data type contains: the Project_Template object that is in the business document, the business information that is relevant for sending a BusinessDocument in a message. This message data type can contain the packages: MessageHeader package, Project package. This message data type, therefore, can provide the structure for the operations that are based on it.

MessageHeader Package is a grouping of business information that is relevant for sending a business document in a message. It can contain the entity MessageHeader.

MessageHeader is a grouping of business information from the perspective of the sending application: Identification of the business document in a message, Date/time of the creation of the message, Information about the sender, Information about the recipient, Reconciliation counter.

The MessageHeader is of the type GDT: BusinessDocumentMessageHeader and in certain implementations, can contain the following elements: ID, CreationDateTime, SenderParty, RecipientParty, ReconciliationMessageIndicator. ID can be the identifier of the message. ID may be based on GDT BusinessDocumentMessageID. CreationDateTime can be the Date/time of the creation of the message. CreationDateTime may be based on GDT DateTime. SenderParty can be the information about the sender. SenderParty may be based on GDT BusinessDocumentMessageHeaderParty. RecipientParty can be the information about the recipient. RecipientParty may be based on GDT BusinessDocumentMessageHeaderParty. ReconciliationMessageIndicator can be the reconciliation counter. ReconciliationMessageIndicator may be based on GDT Indicator.

Project Package is the grouping of the BO Project with its packages: Task package. The following Integrity Condition may apply: the Project package can contain one project. Project may be defined in business object template Project_Template/node Root. The use may be defined as follows: Project can contain information about the identification of the project, and data that can be relevant for all nodes of the project. The elements at Project are defined by the type IDT: EmployeeTimeConfirmationViewOfProjectNotificationProject. In certain implementations, this may include the following: @actionCode, @taskListCompleteTransmissionIndicator, @reconciliationPeriodCounterValue, UUID, ID, ResponsibleCostCentreID, LanguageCode. @actionCode can be the coded instruction to the recipient of a message that states how the recipient is to process a transferred element. @actionCode may be based on GDT ActionCode.

@taskListCompleteTransmissionIndicator is an indicator that specifies whether all project tasks that are relevant to time recording are transferred. @taskListCompleteTransmission-Indicator may be based on GDT Indicator. Qualifiers may include: CompleteTransmission.

@reconciliationPeriodCounterValue can be the reconciliation counter. @reconciliationPeriodCounterValue may be based on GDT CounterValue. Qualifiers may include: ReconciliationPeriod.

UUID is a universal identifier, which may be unique, of the of the project. UUID may be based on GDT UUID.

ID can be the readable identifier of the project. ID may be based on GDT ProjectID ResponsibleCostCentreID can be the ID of the responsible cost center in the project. ResponsibleCostCentreID may be based on GDT OrganisationalCentreID.

LanguageCode can be the language used for all forms of communication in the project and in which texts have to be created, at a minimum. LanguageCode may be based on GDT LanguageCode.

The following Integrity Conditions may apply: the UUID and the ID can be set. The UUID can refer to the same object as the ID; ActionCode can have the value 01 (i.e., Create) or 02 (i.e., Change). If the ActionCode is 01, subordinate ActionCodes can also be 01. If the ActionCode is 02, the Task-ActionCode can be 01 or 02 and the TaskService-ActionCode can be 01, 02, or 03.

The ResponsibleCostCentreID can be used to determine the company in the target system.

The TaskListCompleteTransmissionIndicator can specify that the data for all tasks in this project that are relevant for time recording is transferred. As a result, both the initial state and subsequent changes can be controlled.

In the case of subsequent changes, the indicator may not be set, and the data for the changed tasks can be transferred.

Task Package

Task Package can be the grouping of the task. Each task package can contain data that is relevant for time recording for all tasks in a project. Task may be defined in business object Project_Template/node Task. Task can contain information that uniquely identifies and characterizes a task. The elements located at Task are defined by the type IDT: EmployeeTimeConfirmationViewOfProjectNotificationProjectTask. In certain implementations, these elements may include: @actionCode, @taskServiceListCompleteTransmissionIndicator, UUID, ID, ResponsibleEmployeeID, PlannedPeriod, ConfirmationExtendedApprovalRequiredIndicator, ConfirmationAllowedIndicator, TaskName, TaskService. @actionCode can be the coded instruction to the recipient of a message that states how the recipient is to process a transferred element. @actionCode may be based on GDT ActionCode. @taskServiceListCompleteTransmissionIndicator can be the indicator that specifies whether all TaskServices are transferred. @taskServiceListCompleteTransmissionIndicator may be based on GDT Indicator. Qualifiers may include: CompleteTransmission. UUID is a universal identifier, which may be unique, of the task. UUID may be based on GDT UUID. ID can be the identifier of the task. ID may be based on GDT ProjectElementID. ResponsibleEmployeeID can be the employee who is responsible for the task. ResponsibleEmployeeID may be based on GDT PartyInternalID. PlannedPeriod can be the planned time period for executing the task. PlannedPeriod may be based on GDT UPPEROPEN_GLOBAL_DateTimePeriod. Qualifiers may include: Planned. ConfirmationExtendedApprovalRequiredIndicator is an indicator that specifies the type of approval. ConfirmationExtendedApprovalRequiredIndicator may be based on GDT Indicator. ConfirmationAllowedIndicator is an indicator that specifies whether confirmations are allowed for this task. ConfirmationAllowedIndicator may be based on GDT Indicator. TaskName can be the language-dependent names of the task. TaskName may be based on IDT EmployeeTimeConfirmationViewOf-ProjectNotificationProjectTaskName. TaskService can be the information about the node TaskService and their associations. TaskService may be based on IDT EmployeeTimeConfirmationViewOfProjectNotificationProjectTaskService.

The following Integrity Conditions may apply: either the UUID or the ID can be set. If UUID and ID are set, they can refer to the same object; ActionCode can have the value 01 (i.e., Create) or 02 (i.e., Change). If the ActionCode is 01, all TaskService codes can also be 01. If the ActionCode is 02, the TaskServiceActionCode can be 01, 02, or 03.

The ResponsibleEmployeeID can be the employee who is responsible for the task. It can contain a value for the ProjectSummaryTask. It can be optional for other tasks. The field can be transferred, although at the moment the employee responsible for the project (e.g., employee responsible for the task of the ProjectSummaryTask) can be used in the time recording system.

The ConfirmationExtendedApprovalRequiredIndicator can control the type of approval in the time recording system. If the indicator can be "true," each posting may be approved separately by the employee responsible for the project, regardless of how the time recording system has been configured.

The ConfirmationAllowedIndicator may specify whether a task can be posted. If the indicator is "true," the confirmations (e.g., planned and unplanned) can be entered.

TaskName

TaskName may be defined in business object template Project_Template/node TaskName. The use may be defined as follows: the data of this node can transfer the texts in all languages to the time recording system, and may support the flexible creation of a worklist. The elements at TaskService are defined by the type IDT: EmployeeTimeConfirmationViewOfProjectNotificationProjectTaskName. In certain implementations, these elements may include: Name. Name can be the language-dependent name of the task. Name may be based on GDT MEDIUM_Name. The following Integrity Condition may apply: texts can be transferred in all languages. TaskService may be defined in business object template Project_Template/node TaskService. Use may be defined as: the date of this node informs the time-recording system about the planned staffing of the tasks and the related service products. The data can be used to create the worklist. The elements at TaskService are defined by the type IDT: EmployeeTimeConfirmation-ViewOfProjectNotificationProjectTaskService. In certain implementations, these elements may include: @actionCode, UUID, ServiceProductID, AssignedEmployeeID.

@actionCode can be the coded instruction to the recipient of a message that states how the recipient is to process a transferred element. @actionCode may be based on GDT ActionCode. UUID is a universal identifier, which may be unique, of the service for the task. UUID may be based on GDT UUID. ServiceProductID can be the identifier of the service product. ServiceProductID may be based on GDT ProductID.

AssignedEmployeeID is an identifier of an (e.g., internal or external) employee. AssignedEmployeeID may be based on GDT PartyInternalID. The following Integrity Conditions may be applicable: ActionCode can have the value 01 (i.e., Create), 02 (i.e., Change) or 03(i.e., Delete). If the ActionCode is 02 or 03, the TaskActionCode can be 02. AssignedEmployeeID can be identified by specifying the readable key (SchemeID may be "PartyID").

List of Data Types Used (GDTs) may include: @ActionCode, BusinessDocumentMessageHeader, BusinessDocumentMessageHeaderParty, BusinessDocumentMessageID, BusinessTransactionDocumentParty, BusinessTransactionDocumentReference, CostCentreID, DateTime, DateTimePeriod, Indicator, LanguageCode, PartyInternalID, ProductID, ProjectelementID, ProjectID, ReconciliationPeriodCounterValue, UUID, MEDIUM_Name.

Business Object ProjectPurchaseRequest

FIGS. 249-1 through 249-4 illustrate an example ProjectPurchaseRequest business object model 249000. Specifically, this model depicts interactions among various hierarchical components of the ProjectPurchaseRequest, as well as external components that interact with the ProjectPurchaseRequest (shown here as 249000 through 249026 and 249032 through 249050).

ProjectPurchaseRequest is a request to purchasing to procure products that are required during a project. The request can originate in a project, or it can originate outside a project, in which case the request can be assigned to a project task as an accounting object. It can also be a means of monitoring the follow-up procurement documents.

The business object ProjectPurchaseRequest is part of the process component ProjectProcessing.

A ProjectPurchaseRequest 249014 can contain: items that are to be procured out of a project, items that are to be procured with reference to a project, views of the follow-up purchase orders.

ProjectPurchaseRequest is represented by the node Root.

Service Interfaces

The Business Object is involved in the following Process Integration Models: Project Processing_Purchase Request Processing, Purchase Request Processing_Project Processing, Purchase Order Processing_Project Processing.

The Service Interface Purchasing In (i.e., ProjectProcessingPurchasingIn) is part of the following Process Integration Models: Project Processing_Purchase Request Processing. The Service Interface Purchasing In contains operations that receive confirmations related to the processing of purchase requests.

Change Project Purchase Request based on Purchase Request Confirmation (A2A) (i.e., ProjectProcessingPurchasingIn.ChangeProjectPurchaseRequestBasedOnPurchaseRequestConfirmation) changes the ProjectPurchaseRequest based on a confirmation from purchasing about the degree to which a request has been fulfilled. The operation can be based on the message type PurchaseRequestConfirmation (derived from the business object PurchaseRequest)

Service Interface Purchasing Notification In (i.e., ProjectProcessingPurchasingNotificationIn) is part of the following Process Integration Models: Purchase Request Processing_Project Processing. Service Interface Purchasing Notification In contains operations that receive notifications related to the processing of purchase requests.

Change Project Purchase Request based on Purchase Request Notification (A2A) (i.e., ProjectProcessingPurchasingIn.ChangeProjectPurchaseRequestBasedOnPurchaseRequestNotification) changes the ProjectPurchaseRequest based on a notification about the creation of a new purchase request or a change to an existing purchase request. The operation can be based on the message type PurchaseRequestNotification (derived from the business object PurchaseRequest)

Service Interface Ordering Notification In (i.e., ProjectProcessingOrderingNotificationIn) is part of the following Process Integration Models: Purchase Order Processing_Project Processing. Service Interface Ordering Notification In contains operations that receive notifications related to the processing of purchase orders.

Change Project Purchase Request based on Purchase Order Notification (A2A) (i.e., ProjectProcessingOrderingNotificationIn.ChangeProjectPurchaseRequestBasedOnPurchaseOrderNotification) changes the ProjectPurchaseRequest based on a notification about the creation of a new purchase order or a change to an existing purchase order. The operation can be based on the message type PurchaseOrderNotification (derived from the business object PurchaseOrder).

Service Interface Purchasing Out (i.e., ProjectProcessingPurchasingOut) is part of the following Process Integration Models: Project Processing_Purchase Request. Service Interface Purchasing Out contains operations for creating purchase requests.

Request Purchasing (A2A) (i.e., ProjectProcessingPurchasingOut.RequestPurchasing) request from the ProjectPurchaseRequest to a purchaser to procure services externally. The operation is based on the message type PurchaseRequestRequest (e.g., derived from the business object PurchaseRequest).

Node Structure of Business Object ProjectPurchaseRequest Root

ProjectPurchaseRequest is a request to purchasing to procure products that are required during a project. The request can originate in a project, or it can originate outside a project, in which case the request can be assigned to a project task as an accounting object. The request may provide a detailed description of the products that are to be procured, the quantities required, and the time at which the products need to be available. It can also be a means of monitoring the follow-up procurement documents.

A ProjectPurchaseRequest may exist in the following complete and disjoint specializations: InternalProjectPurchaseRequest 249018 (e.g., Original document for a purchase request that is created from within the project), ExternalProjectPurchaseRequest 249020 (e.g., A view of a purchase request from DU purchasing that was created with reference to a project. It can be either a follow-up document of an InternalProjectPurchaseRequest or it can be created from a shopping cart), OrderedProjectPurchaseRequest 249022 (e.g., A view of a purchase order from DU purchasing that was created with reference to a project. In general an OrderedProjectPurchaseRequest is a follow-up document for an ExternalProjectPurchaseRequest).

The elements located directly at the node Root are defined by the data type: ProjectPurchaseRequestElements. In certain implementations, these elements may contain the following: UUID, ID, TypeCode, InternalProjectPurchaseRequest, ExternalProjectPurchaseRequest, OrderedProjectPurchaseRequest, SystemAdministrativeData, Status, ReleaseStatusCode.

UUID is a universal identifier, which may be unique, of the ProjectPurchaseRequest. UUID may be based on GDT UUID.

ID is an identifier of the ProjectPurchaseRequest. ID may be based on GDT BusinessTransactionDocumentID.

TypeCode is the coded representation of the Type of ProjectPurchaseRequest. The type determines the specialization. There three categories can include: InternalProjectPurchaseRequest, ExternalProjectPurchaseRequest, OrderedProjectPurchaseRequest.

InternalProjectPurchaseRequest is an original document for a purchase request that is created from within the project.

ExternalProjectPurchaseRequest is a view of a purchase request from DU purchasing that was created with reference to a project. It can be either a follow-up document of an InternalProjectPurchaseRequest or it can be created from a shopping cart.

OrderedProjectPurchaseRequest is a view of a purchase order from DU purchasing that was created with reference to a project. In general an OrderedProjectPurchaseRequest can be a follow-up document for an ExternalProjectPurchaseRequest. OrderedProjectPurchaseRequest can be based on GDT ProjectPurchaseRequestTypeCode.

SystemAdministrativeData is the information about when and by whom the ProjectPurchaseRequest was created. SystemAdministrativeData may be based on GDT SystemAdministrativeData.

Status is the current step in the life cycle of the ProjectPurchaseRequest. The status elements may be defined by the data type: ProjectPurchaseRequestStatus. The status elements may include: ReleaseStatusCode. ReleaseStatusCode is information about whether the ProjectPurchaseRequest has been released or is still in preparation and is optional. ReleaseStatusCode may be based on GDT ReleaseStatusCode.

The composition relationship to subordinate nodes, Item 249016, exists. Item has a cardinality of 1:cn.

An associations for navigation to transformed object BusinessDocumentFlow, node Root, BusinessDocumentFlow has a cardinality of 1:1 and is a BusinessDocumentFlow that is related to the ProjectPurchaseRequest.

ReleaseStatusCode is used if the ProjectPurchaseRequest is initiated from a project (specialization “InternalProjectPurchaseRequest”).

Release is an action that ends the preparation phase of the ProjectPurchaseRequest and releases it for further processing. The follow up procurement processes can start. The ProjectPurchaseRequest is not yet released and the assigned project tasks of all items are released and not blocked. The ProjectPurchaseRequest is not changeable anymore. Operation MaintainPurchaseRequest of Service Interface Purchasing in Process Component PurchaseRequestProcessing is called to create a purchase request. The ProjectPurchaseRequest is released. The action has no parameters.

Item

Item specifies a product that is to be procured and contains information about the parties, dates, and quantities that are involved. The elements located directly at the node ProjectPurchaseRequestItem are defined by the data type: ProjectPurchaseRequestItemElements. In certain implementations, these elements may include the following: UUID, ID, TypeCode, RequestedQuantity, RequestedQuantityTypeCode, DeliveryPeriod, CostUpperLimitAmount, ProductUUID, ProductID, ProductCategoryUUID, Description, ProjectUUID, ProjectTaskUUID, ProjectTaskID, ProjectTaskServiceUUID, ProjectServiceSpecialisationUUID.

UUID is a universal identifier, which may be unique, of the project purchase request item. UUID may be based on GDT UUID.

ID is an identifier of the project purchase request item. ID may be based on GDT BusinessTransactionDocumentItemID.

TypeCode is the coded representation of the type of ProjectPurchaseRequestItem. TypeCode may be based on GDT BusinessTransactionDocumentItemTypeCode.

RequestedQuantity is the quantity of the product that is to be procured and is optional. RequestedQuantity may be based on GDT Quantity, Qualifier: Requested.

RequestedQuantityTypeCode is the coded representation of the type of quantity that is to be procured and is optional. RequestedQuantityTypeCode may be based on GDT QuantityTypeCode. Qualifiers may include: Requested.

DeliveryPeriod is the time period during which the goods are delivered or the service is performed and is optional. DeliveryPeriod may be based on GDT UPPEROPEN_GLOBAL_DateTimePeriod. Qualifiers may include: Delivery.

CostUpperLimitAmount is the limit for the total costs that can not be exceeded in an ordering process and is optional. The overall limit amount can be specified for purchasing limit items (e.g., item type code: 20). CostUpperLimitAmount may be based on GDT Amount. Qualifiers may include: Limit.

ProductUUID is a universal identifier, which may be unique, of the product that is to be procured and is optional. ProductUUID may be based on GDT UUID.

ProductID is an identifier of the product that is to be procured and is optional. ProductID may be based on GDT ProductID.

ProductCategoryUUID is a universal identifier, which may be unique, of the product category the requested product belongs to and is optional. ProductCategoryUUID may be based on GDT UUID.

Description is the description of or short comment to the item and is optional. Description may be based on CGDT SHORT_Description.

ProjectUUID is a universal identifier, which may be unique, of the project for which the item of the project purchase request is created. ProjectUUID may be based on GDT UUID.

ProjectTaskUUID is a universal identifier, which may be unique, of the project task for which the item of the project purchase requisition is created. ProjectTaskUUID may be based on GDT UUID.

ProjectTaskID is an identifier of the project task for which the item of the project purchase requisition is created. ProjectTaskID may be based on GDT ProjectElementID.

ProjectTaskServiceUUID is a universal identifier, which may be unique, of the ProjectTaskService for which the item of the project purchase requisition is created and is optional. ProjectTaskServiceUUID may be based on GDT UUID.

ProjectServiceSpecialisationUUID is a universal identifier, which may be unique, of the project service specialization for which the purchase requisition is created and is optional. ProjectServiceSpecialisationUUID may be based on GDT UUID.

Integrity Conditions may include the following: element ProjectServiceSpecialisationUUID can be used in items of the specialization InternalProjectPurchaseRequest, element ProjectTaskServiceUUID can be used in items of the specialization InternalProjectPurchaseRequest.

The following composition relationships to subordinate nodes exist: ItemParty 249024, which as a cardinality of 1:cn, ItemLocation 249026, which has a cardinality of 1:cn, ItemBusinessTransactionDocumentReference 249028, which has a cardinality of 1:cn, ItemAttachmentFolder 249030, which has a cardinality of 1:c, ItemTextCollection 249032, which has a cardinality of 1:c, ItemTotalOrderedQuantity 249034, which has a cardinality of 1:c.

A number of inbound association relationships exist. From business object Project, node Root, Project has a cardinality of c:cn and is a project for which the requisition item is created. From business object Project, node Task, ProjectTask has a cardinality of c:cn, and is a project task for which the requisition item is created. From business object Project, node TaskService, ProjectTaskService has a cardinality of c:cn and is a TaskService in the project to which the requisition item relates. From business object Project, node ServiceSpecialisation, ProjectServiceSpecialisation has a cardinality of c:cn, and is a service specialization in the project to which the requisition item relates. From business object ServiceProduct, node Root, ServiceProduct has a cardinality of c:cn and is a service product that is to be procured. From business object ProductCategoryHierarchy, node ProductCategory, ProductCategory has a cardinality c:cn, and is a ProductCategory the requested product belongs to.

A number of specialization associations for navigation exists. To business object ProjectPurchaseRequest, node ItemParty, the associations include: RequestorItemParty has a cardinality of c:c, and is a party that requests the procurement of a product, ProductRecipientItemParty, has a cardinality of c:c and is a party for which the product is performed, ServicePerformerItemParty has a cardinality of c:c and is a party that performs the service, SellerItemParty has a cardinality of c:c and is a party that sells the product, ProposedSellerItemParty has a cardinality of c:c and is a party that is able to sell the products and will be treated as proposal for the SellerParty. To business object ProjectPurchaseRequest, node ItemLocation, the associations include: ShipToItemLocation has a cardinality c:c and is a place where to the goods are delivered or where a service will be provided. To business object ProjectPurchaseRequest, node ItemBusinessTransactionDocumentReference, the associations include: PurchaseRequestReference has a cardinality of c:cn and is a PurchaseRequestItem that is the basis for the ProjectPurchaseRequestItem, PurchaseOrderReference has a cardinality of c:cn and is a PurchaseOrderItem that is the basis for the ProjectPurchaseRequestItem. To transformed object BusinessDocumentFlow, node Root, the associations include: BusinessDocumentFlow has a cardinality of 1:c and is a BusinessDocumentFlow that is related to the ProjectPurchaseRequestItem.

QueryByElements provides a list of all ProjectPurchaseRequestItem which that refer to a given project task. The query elements are defined by the data type ProjectPurchaseRequestItemElementsQueryElements. These elements include: ProjectID, TaskID, ProductID, ProjectPurchaseRequestReleaseStatusCode. ProjectID is optional, and is of GDT type ProjectID. TaskID is optional, and is of GDT type ProjectElementID. ProductID is optional, and is of GDT type ProductID. ProjectPurchaseRequestReleaseStatusCode is optional, is the ReleaseStatusCode of the root node, and is of GDT type ReleaseStatusCode.

QueryByBusinessTransactionDocumentReference provides a list of all ProjectPurchaseRequestItem which have a reference to a given Business Transaction Document. The query elements are defined by the data type ProjectPurchaseRequestItemBusinessTransactionDocumentReferenceQueryElements. These elements include: BusinessTransactionDocumentReferenceID is optional and is of GDT type BusinessTransactionDocumentID, BusinessTransactionDocumentReferenceTypeCode is optional and is of GDT type BusinessTransactionDocumentTypeCode, BusinessTransactionDocumentReferenceItemID is optional and is of GDT type BusinessTransactionDocumentItemID.

ItemParty is a party that is involved in the item. The party can be an employee or supplier. A ProjectPurchaseRequestItemParty may exist in the following complete and disjoint specializations: Requestor Party (i.e., Party that requests the procurement of a service), ProductRecipientParty (i.e., Party for which the service is performed), ServicePerformerParty (i.e., Party that performs the service), SellerParty (i.e., Party that sells the service), ProposedSellerParty (i.e., Party that is able to sell the products and will be treated as proposal for the SellerParty).

The elements located directly at the node ProjectPurchaseRequestItemParty are defined by the data type: ProjectPurchaseRequestItemPartyElements (derived from data type BusinessTransactionDocumentPartyElements). In certain implementations, these elements may include the following: UUID, PartyKey, PartyTypeCode, PartyID, PartyUUID, PartyRoleCategoryCode, PartyRoleCode.

UUID is a universal identifier, which may be unique, of the requisition item party. UUID may be based on GDT UUID.

PartyKey is an alternative key for a party and is optional. PartyKey may be based on IDT PartyKey.

PartyTypeCode is the object type of the Party. PartyTypeCode may be based on GDT BusinessObjectTypeCode.

PartyID is an identifier of the party. PartyID may be based on GDT PartyID.

PartyUUID is an identifier, which may be unique, for a business partner, the organizational unit, or their specializations and is optional. PartyUUID may be based on GDT UUID.

PartyRoleCategoryCode is the Party Role Category of the ItemParty in the ProjectPurchaseRequestItem and is optional. PartyRoleCategoryCode may be based on GDT PartyRoleCategoryCode.

PartyRoleCode is the Party role of the ItemParty in the ProjectPurchaseRequestItem and is optional. PartyRoleCode may be based on GDT PartyRoleCode.

Integrity Conditions may include the following: a party can occur in the various different specializations. Each of the specializations may occur once per item.

An inbound aggregation relationship from Business-Object Party, node Root, Party has a cardinality of c:cn and is the Referenced Party in Master Data.

ItemLocation is a physical place where the goods are delivered or where a service is provided. A ProjectPurchaseRequestItemLocation may exist in the following complete and disjoint specializations: ShipToLocation: A place, where to the goods are delivered or where a service will be provided.

The elements located directly at the node ProjectPurchaseRequestItemLocation are defined by the data type: ProjectPurchaseRequestItemLocationElements (derived from data type BusinessTransactionDocumentLocationElements). In certain implementations, these elements may include the following: UUID, LocationID, LocationUUID, RoleCategoryCode, RoleCode.

UUID is a universal identifier, which may be unique, of the ProjectPurchaseRequest. UUID may be based on GDT UUID.

LocationID is an identifier of the location and is optional. LocationID may be based on GDT LocationID.

LocationUUID is a universal identifier, which may be unique, of the location and is optional. LocationUUID may be based on GDT UUID.

RoleCategoryCode is the coded representation of the role category of the location in the ProjectPurchaseRequestItem and is optional. RoleCategoryCode may be based on GDT LocationRoleCategoryCode.

RoleCode is the coded representation of the role of the location in the ProjectPurchaseRequestItem and is optional. RoleCode may be based on GDT LocationRoleCode.

Integrity Conditions may include: a location can occur in the various different specializations. Each of the specializations may occur once per item.

An inbound aggregation relationship from business object Location, node Root, exists. ShipToLocation has a cardinality c:cn and is the Place where to the goods are delivered or where a service will be provided.

ItemBusinessTransactionDocumentReference is a reference, which may be unique, to an item of another business transaction document. The elements located directly at the node ProjectPurchaseRequestItem-BusinessTransactionDocumentReference are defined by the data type: ProjectPurchaseRequestItem-BusinessTransactionDocumentReferenceElements (derived from data type BusinessTransactionDocumentReferenceElements). In certain implementations, these elements may include: BusinessTransactionDocumentReference, BusinessTransactionDocumentRelationshipRoleCode.

BusinessTransactionDocumentReference is a reference, which may be unique, to the referred business transaction document. Furthermore, it can be possible to have a reference to a line item within the business transaction document. BusinessTransactionDocumentReference may be based on GDT BusinessTransactionDocumentReference.

BusinessTransactionDocumentRelationshipRoleCode is a coded representation of the relationship role of a business transaction document in this reference. BusinessTransactionDocumentRelationshipRoleCode may be based on GDT BusinessTransactionDocumentRelationshipRoleCode.

A ProjectPurchaseRequestItem-BusinessTransactionDocumentReference may exist in the following complete and disjoint specializations: PurchaseRequestReference (e.g., A reference to an item of a PurchaseRequest, indicating that the ProjectPurchaseRequestItem has been created on the basis of this PurchaseRequestItem), PurchaseOrderReference (e.g., A reference to an item of a PurchaseOrder, indicating that the ProjectPurchaseRequestItem has been created on the basis of this PurchaseOrderItem).

A number of inbound aggregation relationships exist. From the business object PurchaseRequest, node Item, PurchaseRequestItem has a cardinality of c:cn and is a PurchaseRequestItem that is the basis for the ProjectPurchaseRequestItem. From the business object PurchaseOrder, node Item, PurchaseOrderItem has a cardinality of c:cn, and is a PurchaseOrderItem that is the basis for the ProjectPurchaseRequestItem.

ItemTotalOrderedQuantity (Transformation Node) is the aggregation of the total ordered quantity which results from the ProjectPurchaseRequestItem. For a ProjectPurchaseRequest many PurchaseOrders can be created. Also the aggregated quantities of all Purchase Orders may differ from the requested quantity, therefore it can be necessary to provide the information about these quantities. The elements located directly at the node ProjectPurchaseRequestItemTotalOrderedQuantity are defined by the data type: ProjectPurchaseRequestItemTotalOrderedQuantityElements. In certain implementations, these elements may include the following: OrderedQuantity, OrderedQuantityTypeCode.

OrderedQuantity is the quantity of the product that is ordered. OrderedQuantity may be based on GDT Quantity. Qualifiers may be based on: Ordered.

OrderedQuantityTypeCode is the coded representation of the type of quantity that is ordered. OrderedQuantityTypeCode may be based on GDT Quantity. Qualifiers may include: Ordered.

Integrity Conditions may include the following: TotalOrderedQuantity can be relevant if the specialization of the BO instance is either InternalProjectPurchaseRequest or ExternalProjectPurchaseRequest.

ItemAttachmentFolder are the electronic documents of any type whose content relates to the item. ItemTextCollection is the natural language text for an item.

Business Object PurchaseOrder

FIGS. 250-1 through 250-7 illustrate an example PurchaseOrder business object model 250000. Specifically, this model depicts interactions among various hierarchical components of the PurchaseOrder 250000, as well as external components that interact with the PurchaseOrder (shown here as 250002 through 250026 and 250100 through 250146).

A PurchaseOrder is a request from a purchaser to an external supplier to deliver a specified quantity of material, or perform a specified service, at a specified price within a specified time. In this context, the purchaser is a natural person that acts on behalf of a legal entity, e.g. a company. The business object PurchaseOrder is derived from the Procurement Document Template. The Business Object PurchaseOrder is part of Process Component Purchase Order Processing. The Business Object PurchaseOrder is represented by the Root Node PurchaseOrder 250028 and its Associations.

The Business Object PurchaseOrder is involved in the Purchase Order Processing_Accounting, Purchase Order Processing_External Procurement Trigger and Response, Purchase Order Processing_Project Processing, Purchase Order Processing_Sales Order Processing at Supplier, Purchase Order Processing_Supplier Invoice Processing, RFQ Processing_Purchase Order Processing, Purchase Order Processing_Time and Labour Management, Purchase Order Processing_Internal Request Processing Process Integration Models.

The Service Interface Quote Award Notification In includes the RFQ Processing_Purchase Order Processing Process Integration Model.

Interface Quote Award Notification In offers an operation which creates a PurchaseOrder based on notifications of awarded SupplierQuotes.

Create Purchase Order based on Winning Quote (A2A) PurchaseOrderProcessing-QuoteAwardNotificationIn.CreatePurchaseOrderBasedOnWinningQuote The operation Create Purchase Order based on Winning Quote creates a PurchaseOrder based on the data contained in a winnig SupplierQuote. If the SupplierQuote refers to a PurchaseRequest, data from the PurchaseRequestItems are added by the operation in order to complete the PurchaseOrder. The operation is based on message type Supplier Quote Award Notification (Derived from business object SupplierQuote).

The operation does not allow to modify an existing PurchaseOrder that was created on basis of a SupplierQuote. If a Supplier Quote Award Notification for the same SupplierQuote is sent several times, a new PurchaseOrder is created each time.

The Service Interface Fulfillment In is part of the following Process Integration Models:

Purchase Order Processing_External Procurement Trigger and Response Interface Fulfillment In is a grouping of operations which changes a PurchaseOrder based on notifications of delivered goods and rendered services.

Change Purchase Order based on Delivery Values (A2A)

PurchaseOrderProcessingFulfillmentIn.ChangePurchaseOrderBasedOnDeliveryValues

The operation Change Purchase Order based on Delivery Values adds the quantity of a ConfirmedInboundDelivery to the cumulated delivered quantity in node ItemActualValues of a PurchaseOrder. The operation also adds the reference to the ConfirmedInboundDelivery document to the PurchaseOrder. The operation is based on message type Purchase Order Delivery Values Notification (Derived from business object PurchaseOrder).

The Service Interface Invoice Verification In is part of the following Process Integration Models:

Purchase Order Processing_Supplier Invoice Processing Interface Invoice Verification In is a grouping of operations which changes a PurchaseOrder based on notifications of invoiced quantities and amounts.

PurchaseOrderProcessingInvoiceVerificationIn.ChangePurchaseOrderBasedOnInvoiceValues The operation Change Purchase Order based on Invoice Values adds the quantity and amount of a SupplierInvoice to the cumulated invoiced quantity and amount in node ItemActualValues of a PurchaseOrder. The operation also adds the reference to the SupplierInvoice document to the PurchaseOrder.

The operation is based on message type Purchase Order Invoice Values Notification (Derived from business object PurchaseOrder).

The Service Interface Invoice Verification Out is part of the Purchase Order Processing_Supplier Invoice Processing Process Integration Model.

Interface Request Invoice Verification Out is a grouping of operations which informs the Process Component (PC) Supplier Invoice Processing that a PurchaseOrder expects a SupplierInvoice as a follow-on document. It provides the PC Supplier Invoice Processing with the data necessary to create a SupplierInvoiceRequest.

The operation Notify of Invoicing Due informs the PC Supplier Invoice Processing about invoicing relevant changes in a PurchaseOrder. The operation is executed if the PurchaseOrder is created, changed or cancelled. The operation is based on message type Invoicing Due Notification (Derived from business object SupplierInvoiceRequest).

The Service Interface Ordering Out is part of the following Process Integration Models:

Purchase Order Processing_Sales Order Processing at Supplier

Interface Ordering Out is a grouping of operations which inform Sales Order Processing at Supplier about the creation, change or cancellation of a Purchase Order. In case of changes to a PurchaseOrder, Sales Order Processing at Supplier is only informed if the changes are relevant for the Supplier, e.g. if product, material, or price information where changed.

Request Purchase Order Creation (B2B)

PurchaseOrderProcessingOrderingOut.RequestPurchaseOrderCreation

The operation Request Purchase Order Creation transfers an initially created PurchaseOrder to the external Process Component Sales Order Processing at Supplier. The operation sends a copy of the PurchaseOrder that contains all Information that is relevant for the Supplier, i.e. all information that is needed to create a corresponding Sales Order in the business system of the Supplier.

The operation for message output is based on message type Purchase Order Request (Derived from business object PurchaseOrder). The operation for form output is based on message type Form Purchase Order Request (Derived from business object PurchaseOrder). The operation for interactive form output is based on message type Interactive Form Purchase Order Request (Derived from business object PurchaseOrder).

Request Purchase Order Change (B2B)

PurchaseOrderProcessingOrderingOut.RequestPurchaseOrderChange

The operation Request Purchase Order Change transfers a changed PurchaseOrder to the Sales Order Processing at Supplier. The operation is executed, whenever changes that are relevant for the Supplier have been made to the PurchaseOrder. Examples for changes relevant for a Supplier are changes to ordered quantities, product, price, or requested delivery dates. The operation for message output is based on message type Purchase Order Change Request. (Derived from business object PurchaseOrder). The operation for form output is based on message type Form Purchase Order Change Request. (Derived from business object PurchaseOrder).

The operation for interactive form output is based on message type Interactive Form Purchase Order Change Request. (Derived from business object PurchaseOrder).

Request Purchase Order Cancellation (B2B)

PurchaseOrderProcessingOrderingOut.RequestPurchaseOrderCancellation

The operation Request Purchase Order Cancellation informs the external Process Component Sales Order Processing at Supplier that a previously sent PurchaseOrder is no longer valid and has been cancelled. The operation for message output is based on message type Purchase Order Cancellation Request (Derived from business object PurchaseOrder). The operation for form output is based on message type Form Purchase Order Cancellation Request (Derived from business object PurchaseOrder). The operation for interactive form output is based on message type Interactive Form Purchase Order Cancellation Request (Derived from business object PurchaseOrder).

Service Interface Ordering Notification Out

PurchaseOrderProcessingOrderingNotificationOut

The Service Interface Ordering Notification Out is part of the following Process Integration Models:

Purchase Order Processing_External Procurement Trigger and Response

Purchase Order Processing_Project Processing

Purchase Order Processing_Internal Request Processing

Interface Ordering Notification Out is a grouping of operations which informs Process Components External Procurement Trigger and Response and/or Project Processing and/or Internal Request Processing that a PurchaseOrder has been created, changed or cancelled.

Notify of Purchase Order (A2A)

PurchaseOrderProcessingOrderingNotificationOut.NotifyOfPurchaseOrder

The operation Notify of Purchase Order sends a notification to Process Component Project Processing or to External Procurement Trigger and Response or to Internal Request Processing to indicate that a PurchaseOrder has been created, changed or cancelled. The operation is based on message type Purchase Order Notification (Derived from business object PurchaseOrder).

Service Interface Sales And Purchasing Accounting Out
PurchaseOrderProcessingSalesAndPurchasingAccountingOut The Service Interface Sales And Purchasing Accounting Out is part of the following Process Integration Models:

Purchase Order Processing_Accounting

Interface Sales And Purchasing Accounting Out is a grouping of operations which informs PC Accounting about creation or cancellation of a PurchaseOrder or of accounting relevant changes to a PurchaseOrder.

Notify of Purchase Order (A2A)
PurchaseOrderProcessingSalesAndPurchasingAccountingOut.NotifyOfPurchaseOrder The operation Notify of Purchase Order sends a notification to Process Component Accounting to indicate that a PurchaseOrder has been created, changed or cancelled.

The operation is based on message type Sales And Purchasing Accounting Notification (Derived from business object AccountingNotificationY.

Service Interface Employee Time Confirmation View Of Service Transaction Document Management Out
PurchaseOrderProcessingEmployeeTimeConfirmationViewOfServiceTransactionDocument ManagementOut The Service Interface Employee Time Confirmation View Of Service Transaction Document Management Out is part of the following Process Integration Models:

Purchase Order Processing_Time And Labour Management Interface Employee Time Confirmation View Of Service Transaction Document Management Out is a grouping of operations which informs PC Time And Labour Management about creation or cancellation of a PurchaseOrder that requires employee time confirmation or, of relevant changes to such a PurchaseOrder.

Notify of Purchase Order (A2A)
PurchaseOrderProcessingEmployeeTimeConfirmationViewOfServiceTransactionDocument ManagementOut.NotifyOfPurchaseOrder The operation Notify of Purchase Order sends a notification to Process Component Time and Labour Management to indicate that a PurchaseOrder which requires time confirmation has been created, changed or cancelled. The operation is based on message type Employee Time Confirmation View of Service Transaction Document Notification (Derived from business object EmployeeTimeConfirmationViewOfServiceTransactionDocument).

Service Interface Project Task Availability Out
AccountingCodingBlockDistributionProcessingProjectTaskAvailabilityOut The Service Interface Project Task Availability Out is part of the following Process Integration Models:

Purchase Order Processing_Project Processing_Coding Block

The Interface Project Task Availability Out contains the operation to check the account assignment and to receive the result. The account assignment check of accounting objects that are not available locally is performed synchronously.

Request Project Task Availability Information (A2A)
AccountingCodingBlockDistributionProcessingProjectTaskAvailabilityOut.RequestProjectT askAvailabilityInformation The operation Request Project Task Availability Information sends a synchronous request to the process component Project Processing to determine whether the tasks exist and whether they are valid from the business perspective. In the Request role, the operation is based on the AccountingObjectCheckRequest message type. In the Confirmation role, it is based on the AccountingObjectCheckConfirmation message type (derived from the dependent object AccountingCodingBlockDistribution).

A request from a buyer to an external supplier to deliver a specified quantity of goods, or perform a specified service, at a specified price within a specified time.

The elements located directly at the node PurchaseOrder are defined by the data type: ProcurementDocumentElements. The PurchaseOrder includes the ID, an identifier for the PurchaseOrder assigned by the BuyerParty, of type GDT; UUID, a universally unique identifier for the PurchaseOrder for referencing purposes; SystemAdministrativeData, or administrative data stored within the system. These data contain system users and time of change. Of type GDT; ProcessingTypeCode, a coded representation for the processing type of the Purchase Order, The codes which can be permitted for a PurchaseOrder include Manual data entry, Awarded quote, Manual sourcing, Automatic sourcing. This currency code is valid for all the Items of the purchase order. The PurchaseOrder currency code may be changed on the Root node. Point in time that is relevant for price determination. Price conditions of sources of supply have to be valid at this point in time. PriceDateTime is defaulted from the attribute SystemAdministrativeData-CreationDateTime. It can be necessary to change PriceDateTime if a Purchase Order shall be created in advance, i.e. a few days before a source of supply will start to be valid, or if a Purchase Order shall be created calling off a Purchasing Contract that officially is not valid any more, but the Seller agrees to the late call off.

TotalNetAmount

Total net amount of the PurchaseOrder. This amount is calculated by the system as the sum of NetAmount of all items.

TotalTaxAmount

Total tax amount of the PurchaseOrder. This amount is calculated by the system as the sum of TaxAmount of all items. Element Status contains all individual status variables that are relevant for and describe the current state in the life cycle of a PurchaseOrder. Of GDT Type ProcurementDocumentStatus.

PurchaseOrderLifeCycleStatusCode

This status variable is used to give a status summary for a PurchaseOrder. In most states in the life cycle of a PurchaseOrder, the value of one of the status variables that are described in the following is the 'the most important one' from a business point of view. E.g. if a PurchaseOrder is in approval, from a business point of view, it is more interesting that the value of status variable ApprovalStatusCode is 'In Approval' than that variable ConsistencyStatusCode has value 'Consistent' or DeliveryProcessStatusCode has value 'Not Delivered'. Therefore, variable LifeCycleStatusCode always contains the value of one of the following variables that is considered the most important one in the current state of the PurchaseOrder.

ConsistencyStatusCode

This status variable shows whether the PurchaseOrder is consistent or not. A PurchaseOrder is consistent if none of the obligatory data is missing and if ESI Action Check does not return any error messages.

ApprovalStatusCode

This status variable gives information of the progress of an approval process that a PurchaseOrder is in. E.g. the PurchaseOrder may be 'In Approval', 'Rejected', or 'Approved'.

OrderingStatusCode

This status variable indicates whether a PurchaseOrder has been ordered or not.

CancellationStatusCode

This status variable indicates whether a PurchaseOrder has been cancelled or not.

PurchaseOrderDeliveryStatusCode

This status variable provides a summary of the state of delivery of all PurchaseOrderItems. (PurchaseOrderItem contains a similar status variable). E.g. if some Items have already received a delivery, this variable has value 'Partly Delivered'. If all Items have received their required quantity, the value is 'Completely Delivered'.

InvoicingStatusCode

This status variable provides a summary of the state of invoicing of all PurchaseOrderItems. (PurchaseOrderItem contains a similar status variable). E.g., if for some Items invoices have been received, this variable has value 'Partly Invoiced'. If on all Items the required quantity has been invoiced, the value is 'Completely Invoiced'.

DeliveryProcessingStatusCode

This status variable provides a summary of the state of process of delivery of all PurchaseOrderItems. (PurchaseOrderItem contains a similar status variable). E.g. some Items are already delivered completely or the purchaser does not expect any further delivery for some items, this variable has value 'In Process'. If all Items have received their required quantity or the purchaser did not expect any further delivery for all items, the value is 'Finished'.

InvoiceProcessingStatusCode

This status variable provides a summary of the state of process of invoicing of all PurchaseOrderItems. (PurchaseOrderItem contains a similar status variable) e.g., if for some Items invoices have been received or for some items no invoice is expected, this variable has value 'In process'. If on all Items the required quantity has been invoiced or for no item a invoice is expected, the value is 'Finished'.

PurchaseOrderConfirmationStatusCode

This status variable shows the summary of the result of the evaluation of received PurchaseOrderConfirmations for all PurchaseOrderItems. PurchaseOrderItem contains a similar status variable. If PurchaseOrderItems have different values of ProcessOfConfirmationStatusCode, the summarizing variable on node Root contains a value that is representative for the overall situation or that is most useful to the purchaser with respect to what action he should take. E.g. if some PurchaseOrderItems are in status 'ConfirmedBySupplier' but some are in status 'RejectedBySupplier', the status on the Root node is set to 'PartlyRejected'.

The ID may not be changed after creation.

The UUID is determined by the service provider. It can not be changed.

The SystemAdministrativeData is determined by the service provider. It can not be changed.

The ProcessingTypeCode may not be changed after the creation.

The CurrencyCode is the leading coded representation of the PurchaseOrder currency; all other CurrencyCodes (e.g. at TotalNetAmount) are read-only and can not differ from the PurchaseOrder-CurrencyCode.

Item 250030 has a cardinality of 1:cn

Party 250044 has a cardinality of 1:cn

Location 250056 has a cardinality of 1:cn

DeliveryTerms 250070 has a cardinality of 1:c

DO: CashDiscountTerms 250072 has a cardinality of 1:c

DO: PriceCalculation 250074 has a cardinality of 1:c

DO: TaxCalculation 250076 has a cardinality of 1:c

DO: ControlledOutputRequest 250078 has a cardinality of 1:c

BusinessTransactionDocumentReference 250080 has a cardinality of 1:cn

DO: AttachmentFolder 250088 has a cardinality of 1:c

DO: TextCollection 250090 has a cardinality of 1:c

DO: AccessControlList 250092 has a cardinality of 1:1

CreationIdentity has a cardinality of 1:cn LastChangeIdentity has a cardinality of c:cn BusinessDocumentFlow has a cardinality of c:c Association to the BusinessDocumentFlow which is a view on the set of all preceding and succeeding business (transaction) documents for the current procurement document.

PurchasingHierarchyItem has a cardinality of c:cn Association to purchasing hierarchy item(s). A purchasing hierarchy item 250040 is an item which is semantically associated with the root; other items with a parent item in an item hierarchy are subordinate items.

BuyerParty has a cardinality of c:c Association to a Party which appears within the BuyerParty specialisation.

ResponsiblePurchasingUnitParty has a cardinality of c:c Association to a Party which appears within the ResponsiblePurchasingUnitParty specialisation.

EmployeeResponsibleParty has a cardinality of c:c Association to a Party which appears within the EmployeeResponsibleParty specialisation.

SellerParty has a cardinality of c:c Association to a party which appears within the SellerParty specialisation.

ProposedSellerParty has a cardinality of c:c Association to a Party which appears within the ProposedSellerParty specialisation.

ServicePerformerParty has a cardinality of c:c Association to a Party which appears within the ServicePerformerParty specialisation.

Requestor Party has a cardinality of c:c Association to a Party which appears within the Requestor Party specialisation.

ProductRecipientParty has a cardinality of c:c Association to a Party which appears within the ProductRecipientParty specialisation.

ShipFromLocation has a cardinality of c:c Association to a Location which appears within the ShipFromLocation specialisation.

ShipToLocation has a cardinality of c:c Association to a Location which appears within the ShipToLocation specialisation.

ReceivingSite has a cardinality of c:c Association to a Location which appears within the ReceivingSite specialisation.

InternalRequestReference has a cardinality of c:cn Association to a BTDReference which appears within the InternalRequestReference specialisation.

AwardedSupplierQuoteReference has a cardinality of c:c Association to a BTDReference which appears within the AwardedSupplierQuoteReference specialisation.

PurchaseRequestReference has a cardinality of c:cn Association to a BTDReference which appears within the PurchaseRequestReference specialisation.

ProjectPurchaseRequestReference has a cardinality of c:cn Association to a BTDReference which appears within the ProjectPurchaseRequestReference specialisation.

PurchasingContractReference has a cardinality of c:cn Association to a BTDReference which appears within the PurchasingContractReference specialisation.

PurchaseOrderConfirmationReference has a cardinality of c:cn Association to a BTDReference which appears within the PurchaseOrderConfirmationReference specialisation.

GoodsAndServiceAcknowledgementReference has a cardinality of c:cn Association to a BTDReference which appears within the GoodsAndServiceAcknowledgementReference specialisation.

ConfirmedInboundDeliveryReference has a cardinality of c:cn Association to a BTDReference which appears within the ConfirmedInboundDeliveryReference specialisation.

SupplierInvoiceReference has a cardinality of c:cn Association to a BTDReference which appears within the SupplierInvoiceReference specialisation.

PurchaseRequisitionReference has a cardinality of c:cn Association to a BTDReference which appears within the PurchaseRequisitionReference specialisation.

CheckConsistency

Checks whether the data of a PurchaseOrder is consistent. A PurchaseOrder is consistent if none of the data is missing and if the check does not return any error messages. This action is intended to be called either by the user from UI or by an automatic check in XML inbound. This action is allowed when the variable "Consistency" has either the value "Inconsistent" or "Consistent. No further changes to the attributes of the Business Object. This action hands over messages resulting from checks to the ESI message framework.

SubmitForOrder

Used by the purchaser to order the Purchase Order when data entry has been completed and the document is consistent. The action also checks the PurchaseOrder for consistency by executing the implementation of action Check. "Order" may be executed if the PurchaseOrder is consistent. "Order" executes the implementation of action SubmitForApproval to start an approval if necessary. If approval is not necessary it automatically executes the implementation of action ReleaseForOrder to complete ordering of the document. This action is allowed when the status variable ConsistencyStatusCode has value "Consistent" and status variable OrderingStatusCode has value "Not ordered".

The action executes the implementation of action SubmitForApproval in order to determine whether approval is necessary. If approval is necessary, action SubmitForApproval sets status "In Approval" in status variable ApprovalStatusCode. If approval is not necessary, action SubmitForApproval sets status "Approval not necessary" in status Variable ApprovalStatusCode. In addition, action "Order" executes implementation of action ReleaseForOrder which sets status "Ordered" in status variable OrderingStatusCode.

Order

Brings the Purchase Order into status "Ordered". This action is called automatically after the approval process was either finished or after action SubmitForApproval has decided that an approval is not necessary, i.e. that the PurchaseOrder can be ordered right away. When the PurchaseOrder has reached status "Ordered" its is transmitted to the supplier automatically. This action is allowed when the variable "ApprovalStatusCode" has either the value "Approval not necessary" or "Approved".

Executing this action sets status variable OrderingStatusCode to "Ordered". This action is not intended for use by Service Consumers. Property handling controls that the action can not be called by a Service Consumer.

SubmitForApproval

This action is called to check whether approval of a PurchaseOrder is necessary and if yes, to actually start the approval process. This action is allowed when the status variable ConsistencyStatusCode has the value "Consistent" and variable ApprovalStatusCode has value "Not started" or "In Revision" or "Withdrawn". No further changes are done to the attributes of the Business Object.

If approval is necessary for the PurchaseOrder this action leads to setting the status variable Approval.

This action is called automatically during finalization of the object when the action Order has been executed during the transaction.

Reject

This Action is called to reject a PurchaseOrder, which is in approval. It ends the approval process.

This action is allowed when the status variable ApprovalStatusCode has the value "In Approval".

No further changes are done to the attributes of the Business Object. The action brings the object into a state where only Core Service 'Save' can be executed. Execution of this action sets the status variable ApprovalStatusCode to value "Rejected".

Approve

This Action is called to approve a PurchaseOrder. It ends the approval process. After approval of the PurchaseOrder it is possible to send the document to the supplier. This action is allowed when the status variable ApprovalStatusCode has the value "In Approval" and the status variable ConsistencyStatusCode has the value "Consistent". No further changes are done to the attributes of the Business Object. The action brings the object into a state where only Core Service 'Save' can be executed.

Execution this action sets the status variable ApprovalStatusCode to value "Approved".

WithdrawFromApproval

This Action is called to end the approval process of a PurchaseOrder.

This is needed e.g. when the PurchaseOrder is 'In Approval' and the Purchaser needs to do larger improvements after which he wants start the approval process anew. This action is allowed when the status variable ApprovalStatusCode has the value "In Approval" or "Rejected". No further changes are done to the attributes of the Business Object. The action brings the object into a state where only Core Service 'Save' can be executed.

SendBackForRevision

This Action is called to a PurchaseOrder back to purchaser for revision. This is needed e.g. when the PurchaseOrder has done some mistakes which have to be corrected before the PurchaseOrder can be sent out. This action is allowed when the status variable ApprovalStatusCode has the value "InApproval". No further changes are done to the attributes of the Business Object. The action brings the object into a state where only Core Service 'Save' can be executed. Execution this action sets the status variable ApprovalStatusCode to value "In Revision".

Delete

Core Service Delete physically deletes a PurchaseOrder. This Core Service Action Delete is allowed as long as the status variable OrderingStatusCode does not have the value "Ordered". Preparations are taken to delete the Business Object from the data base. The action brings the object into a state where only Core Service 'Save' can be executed.

Cancel

Cancels a PurchaseOrder that has already been sent to the supplier. Such a document can not be deleted physically any more. The action executes the similar action on each of the items of the PurchaseOrder. This action is allowed when the following combination of status values exists:

CancellationStatusCode="NotCancelled" and

OrderingStatusCode="Ordered" and

PurchaseOrderDeliveryStatusCode="Not Delivered" and

InvoicingStatusCode="Not Invoiced".

No further changes to the attributes of the Business Object. The action brings the object into a state where only Core Service 'Save' or action RevokeCancellation can be executed. The action does not directly change a status. Aggregation of the CancellationStatusCode of PurchaseOrderItems to the PurchaseOrder root node sets status "Cancelled" in status variable CancellationStatusCode.

RevokeCancellation

Reactivates a PurchaseOrder that has been cancelled before.

This action is used to undo an earlier cancellation of a PurchaseOrder e.g. when an agreement with the supplier has been made to continue processing of the PurchaseOrder or when a purchaser cancelled the wrong document by mistake. This action executes the similar action on each of the items of the PurchaseOrder.

This action is allowed when the status variable CancellationStatusCode has the value "Cancelled".

The action does not directly change a status on the root node. Aggregation of the CancellationStatusCode of PurchaseOrderItems to the PurchaseOrderRoot sets status "Not Cancelled" in status variable.

FinishDeliveryProcessing

Stops the process of creating GoodsAndServiceAcknowledgement or ConfirmedInboundDelivery documents for the complete PurchaseOrder. The action executes the similar action on each of the items of the PurchaseOrder. This action is allowed when the following combination of status values exists:

CancellationStatusCode="Not Cancelled" and
OrderingStatusCode="Ordered" Or
DeliveryProcessingStatusCode="In Process"

The action does not directly change a status on the root node. Aggregation of the DeliveryProcessingStatusCode of all PurchaseOrderItems to the PurchaseOrder root node sets the status "Finished" in status variable DeliveryProcessingStatusCode.

ResumeDeliveryProcessing

Restarts the process of creating GoodsAndServiceAcknowledgement or ConfirmedInboundDelivery documents for the complete PurchaseOrder. The action executes the similar action on each of the items of the PurchaseOrder. This action is allowed when the following combination of status values exists:

PurchaseOrderDeliveryStatusCode is not "Completely Delivered" and
CancellationStatusCode="Not Cancelled" and
OrderingStatusCode="Ordered" or
DeliveryProcessingStatusCode="In Process"

Changes to other objects: None.

Changes to the status:

The action does not directly change a status on the root node. Aggregation of the DeliveryProcessingStatusCode of all PurchaseOrderItems to the PurchaseOrder root node sets the status "Not Started" or "In Process" in status variable DeliveryProcessingStatusCode depending on what the status values on the items are.

FinishInvoiceProcessing

Stops the process of creating SupplierInvoice documents for the complete PurchaseOrder. The action executes the similar action on each of the items of the PurchaseOrder.

This action is allowed when the following combination of status values exists:

CancellationStatusCode="Not Cancelled" and
OrderingStatusCode="Ordered" or
InvoiceProcessingStatusCode="In Process"

The action does not directly change a status on the root node. Aggregation of the InvoiceProcessingStatusCode of all PurchaseOrderItems to the PurchaseOrder root node sets the status "Finished" in status variable InvoiceProcessingStatusCode.

ResumeInvoiceProcessing

Restarts the process of creating SupplierInvoice documents for the complete PurchaseOrder. The action executes the similar action on each of the items of the PurchaseOrder.

This action is allowed when the following combination of status values exists:

InvoicingStatusCode is not "Invoiced" and
CancellationStatusCode="Not Cancelled" and
OrderingStatusCode="Ordered" or
InvoiceProcessingStatusCode="In Process"

The action does not directly change a status on the root node. Aggregation of the InvoiceProcessingStatusCode of all PurchaseOrderItems to the PurchaseOrder root node sets the status "Not Started" or "In Process" in status variable InvoiceProcessingStatusCode depending on what the status values on the items are.

ConfirmBySupplier

Used to indicate on all items of a PurchaseOrder that they have been confirmed by the supplier. This action is used to manually confirm a PurchaseOrder completely through one click when the information is received that the supplier agrees to execute delivery exactly as requested in the PurchaseOrder. The action executes action CreateWithReference of business object PurchaseOrderConfirmation in order to create a PurchaseOrderConfirmation that fully confirms the PurchaseOrder.

This action is allowed when the following combination of status values exists:

CancellationStatusCode="Not Cancelled" and
OrderingStatusCode="Ordered"

Changes to the object:

The action executes first action CreateWithReference of business object PurchaseOrderConfirmation and then changes attribute PurchaseOrderConfirmation-Item- to value.

The action does not directly change a status in the PurchaserOrder. When the PurchaseOrder and the newly created PurchaseOrderConfirmation are saved, during the Finalize step, the PurchaseOrderConfirmationStatusCode of the PurchaserOrder is changed to value "Confirmed".

RejectBySupplier

Used to indicate on all items of a PurchaseOrder that they have been rejected by the supplier. This action is used to manually reject a PurchaseOrder completely through one click when the information is received that the supplier can not deliver at all as requested in the PurchaseOrder. The action executes action CreateWithReference of business object PurchaseOrderConfirmation in order to create a PurchaseOrderConfirmation that fully rejects the PurchaseOrder. This action is allowed when the following combination of status values exists:

CancellationStatusCode="Not Cancelled" and
OrderingStatusCode="Ordered"

The action executes first action CreateWithReference of business object PurchaseOrderConfirmation and then changes attribute PurchaseOrderConfirmation-Item- to value.

The action does not directly change a status in the PurchaserOrder. When the PurchaseOrder and the newly created PurchaseOrderConfirmation are saved, during the Finalize step, the PurchaseOrderConfirmationStatusCode of the PurchaserOrder is changed to value "Rejected".

RenumberAllItems

This action is used to renumber all items of a PurchaseOrder. Renumbering items can become necessary during creation of a document. When during creation items have to be deleted they leave a gap in the numbering of the remaining items. By renumbering all items the gaps can be closed. This action is only possible as long as the item IDs have not been communicated anywhere. The action can be executed as long as status variable OrderingStatusCode does not have the value 'Ordered'.

The result of this action is that all Items get a new ID. The action renumbers items in ascending order.

ConvertCurrency

Used to process a currency conversion for all relevant amount and price fields within the PurchaseOrder. The action can be executed as long as status variable OrderingStatusCode does not have the value 'Ordered'. All price and amount fields get converted to the new currency The action elements are defined by the data type: ProcurementDocumentRootConvertCurrencyActionElements. These elements include CurrencyCode and The target currently.

QueryByElements

This query provides a list of all PurchaseOrder nodes which satisfy the selection criteria, specified by the query Elements, combined by logical "AND". If, in the following list of selection criteria, no further selection logic is explained, the system will simply check whether the value given in the selection criterion is equal to the value of the corresponding BO node element. The query interface is defined by data type ProcurementDocumentElementsQueryElements. The following elements are included: ID, of type GDT; CreationBusinessPartnerCommonPersonNameGivenName, of type GDT; CreationBusinessPartnerCommonPersonNameFamilyName, of type GDT; LastChangeBusinessPartnerCommonPersonNameGivenName, of type GDT; LastChangeBusinessPartnerCommonPersonNameFamilyName, of type GDT; SystemAdministrativeData, of type GDT; DataOriginTypeCode, of type GDT; CurrencyCode, of type GDT; TotalNetAmount, of type GDT; PartyBuyerPartyID. This selection criterion is matched against node element Party-PartyID. The system may consider node instances of specialisation PartyBuyerParty, of type GDT; PartySellerPartyID. This selection criterion is matched against node element Party-PartyID. The system may consider node instances of specialisation PartySellerParty, of type GDT; PartySellerPartyID, This selection criterion is matched against node element PartyPartyID. The system may consider node instances of specialisation PartySellerParty, of type GDT; PartyProposedSellerPartyID, This selection criterion is matched against node element PartyPartyID. The system may consider node instances of specialisation PreferredSellerParty, of type GDT; BusinessTransactionDocumentReferencePurchasingContractID, This selection criterion is matched against node element BTDReference-Reference-ID. The system may consider node instances of specialisation PurchasingContractReference, of type GDT; BusinessTransactionDocumentReferenceInternalRequestID, This selection criterion is matched against node element BTDReference-Reference-ID. The system may consider node instances of specialisation InternalRequestReference, of type GDT; BusinessTransactionDocumentReferencePurchaseRequestID, This selection criterion is matched against node element BTDReference-Reference-ID. The system may consider node instances of specialisation PurchaseRequestReference, of type GDT; BusinessTransactionDocumentReferenceSupplierQuoteID, This selection criterion is matched against node element BTDReference-Reference-ID. The system may consider node instances of specialisation SupplierQuoteReference, of type GDT; ItemPartyRequestor PartyID, This selection criterion is matched against node element ItemParty-PartyID. The system may consider node instances of specialisation RequestorItemParty, of type GDT; ItemPartyProductRecipientPartyID, This selection criterion is matched against node element ItemParty-PartyID. The system may consider node instances of specialisation ProductRecipientItemParty, of type GDT; ItemPartyServicePerformerPartyID, This selection criterion is matched against node element ItemParty-PartyID. The system may consider node instances of specialisation ServicePerformerItemParty, of type GDT; ItemAccountingCodingBlockDistributionItemCostCentreID, of type GDT; ItemAccountingCodingBlockDistributionItemCostCentreID, of type GDT; ItemAccountingCodingBlockDistributionItemProjectReference, of type GDT; ItemAccountingCodingBlockDistributionItemIndividualMaterialID, The Elements of this data type enabled as selection criteria include PurchaseOrderLifeCycleStatusCode, ApprovalStatusCode, PurchaseOrderDeliveryStatusCode, DeliveryProcessingStatusCode, InvoicingStatusCode, InvoiceProcessingStatusCode, PurchaseOrderConfirmationStatusCode Party A natural or legal person, organization, organizational unit, or group that is involved in a Purchase Order in a party role. Using the inbound aggregation relationship from TO Party, a Party may reference:

a business partner or one of its specializations (for example, customer, supplier, employee)

one of the following specializations of an organizational center: Company, CostCentre, ReportingLineUnit, and FunctionalUnit. A Party may exist without reference to a business partner or an organizational unit. This would be a Casual Party, which is a party without reference to master data in the system. The external identifier and the description are contained in the business document. A Party can occur within the following complete and disjoint specialisations:

BuyerParty

The BuyerParty is the party on the behalf of which the PurchaseOrder is created. The business object Company can be a BuyerParty. A PurchaseOrder may be ordered when the BuyerParty is provided. A PurchaseOrder may contain one BuyerParty.

ResponsiblePurchasingUnitParty

The ResponsiblePurchasingUnitParty specifies, which PurchasingUnit is responsible for processing the PurchaseOrder. In the organisational structure, a purchasing unit has several purchasing employees assigned to it.

EmployeeResponsibleParty

The EmployeeResponsibleParty specifies, which Employee is responsible for processing the PurchaseOrder. This Employee also serves a contact person for the Supplier as well as for all internal departments of his company like Logistics and Invoicing.

The business object Employee can be the EmployeeResponsibleParty. A PurchaseOrder may be ordered when the EmployeeResponsibleParty is provided. A PurchaseOrder may contain one EmployeeResponsibleParty.

SellerParty

The SellerParty is the party that sells the requested material or services.

The business object Supplier can be the SellerParty. A PurchaseOrder may be ordered when the SellerParty is provided. A PurchaseOrder may contain one SellerParty.

For a SellerParty, a PartyContactParty can be maintained.

PreferredSellerParty

A PreferredSellerParty is a proposal for the SellerParty that can be added to an InternalRequest and from there be passed on into the PurchaseOrder. In the PurchaseOrder, if the purchaser accepts the proposal, the PreferredSellerParty can be transformed into the SellerParty.

The business object Supplier can be the PreferredSellerParty. A PurchaseOrder may contain one PreferredSellerParty.

ServicePerformerParty

The ServicePerformerParty is the party that physically provides a service in the name of the Supplier which is referenced by the SellerParty.

The business objects Employee or BusinessPartner can be the ServicePerformerParty.

The PurchaseOrder may contain one ServicePerformerParty. This ServicePerformerParty is then valid for all Item nodes. If ServicePerformerParties differ between Item nodes, the ServicePerformerParty may be specified on Item level. As the ServicePerformerParty referes to a Person already, no PartyContactParty can be maintained for this Party. This party is enabled for propagation to purchase order items.

Requestor Party

The Requestor Party is the party that initiates the purchasing process through a request of some kind. E.g., this can be the person that creates an InternalRequest that is transferred into a PurchaseOrder.

The business object Employee can be the RequesterParty.

A PurchaseOrder may be ordered when the Requestor Party is provided.

The Root node PurchaseOrder may be associated to one Requestor Party. This Requestor Party is then valid for all Item nodes. If Requestor Parties differ between Item nodes, the Requestor Party may be specified on Item level.

This party is enabled for propagation to purchase order items.

ProductRecipientParty

A ProductRecipientParty is the party to which material is delivered or for which services are provided.

The business objects Employee or DistributionCenter can be the ProductRecipientParty.

A PurchaseOrder may be ordered if a ProductRecipientParty or a ShipToLocation is provided.

The PurchaseOrder may contain one ProductRecipientParty. This ProductRecipientParty is then valid for all Item nodes. If ProductRecipientParties differ between Item nodes, the ProductRecipientParty may be specified on Item level. If the ProductRecipientParty is not an Employee, a PartyContactParty can be maintained. This party is enabled for propagation to purchase order items.

The elements located directly at the node Party are defined by the data type ProcurementDocumentPartyElements. (Data type ProcurementDocumentPartyElements is derived from the data type BusinessTransactionDocumentPartyElements.) These elements include UUID, which needed to access this node external as reference; PartyID, an identifier of the RootParty in this PartyRole in the business document or the master data object, of type GDT;

PartyUUID, a unique identifier for a business partner, the organizational unit, or their specializations, of type GDT; PartyTypeCode, a type of the business partner, organizational unit, or their specializations referenced by the attribute, RoleCategoryCode Party Role Category of the <BO Node>Party in the business document or the master data object. The codes permitted for PartyRoleCategoryCode on node Party include BuyerParty, SellerParty, ProductRecipientParty, Requestor Party, ResponsiblePurchasingUnitParty, EmployeeResponsibleParty, ServicePerformerParty, and PreferredSellerParty.

RoleCode describes the Party Role of the RootParty in the business document or the master data object, The codes permitted for PartyRoleCode on node Party include BuyerParty, SellerParty, ProductRecipientParty, Requestor Party, ResponsiblePurchasingUnitParty, EmployeeResponsibleParty, ServicePerformerParty, and PreferredSellerParty.

AddressReference describes a reference to the address of the Party, DeterminationMethodCode describes a coded representation of the determination method of the Party, PartyContactParty has a cardinality of 1:c DO: PartyAddress has a cardinality of 1:c Party has a cardinality of c:cn.

UsedAddress has a cardinality of c:cn

The transformed object UsedAddress represents a uniform way to access a party address of a procurement document whether it's a business partner address, a organization centre address or an address specified within a procurement document. This can include a referenced address of the master data object, or the PartyAddress used via the composition relationship. It is possible to determine which of the two applies by means of the PartyAddressHostTypeCode element The instance of the TO UsedAddress represents this address. The association is implemented.

In case 1) The node ID of the node in the master data object is determined via the PartyTypeCode, PartyAddressUUID and PartyAddressHostTypeCode elements that has the composition relationship to the DO address that is to be represented by the TO UsedAddress. Additionally, the TO UsedAddress in the implemented association is provided with the following information:

That this is an example of a master data address

BusinessObjectTypeCode, BusinessObjectNodeTypeCode and Node ID of its own ItemParty node. These are required in case changes to the TO UsedAddress take place. In this case, the master data address is copied by the TO UsedAddress, the changes take place to the copy, and a corresponding DO Address is created at the ItemParty via the PartyAddress composition relationship.

In case 2) The TO UsedAddress is informed of the BusinessObjectTypeCode, BusinessObjectNodeTypeCode and Node ID of its own ItemParty. Additionally, information is provided that this is not an example of a referenced address. In this case, the TO UsedAddress represents the DO address used at the ItemParty via the PartyAddress composition relationship.

If the PartyUUID exists, the PartyTypeCode may also exist. Parties may be referenced via the Transformed Object Party, that represent at least one of the following business objects: Company, FunctionalUnit, ReportingLineUnit, Supplier, Customer, Employee, BusinessPartner. A Party of specialisation SellerParty can have a composition relationship to a PartyContactParty. A party could be a person, organization, or group within or outside of the company. Propagation is used for all parties, i.e. parties that are specified at Purchase Order Root level are used for all items if not otherwise specified on item level.

AcceptProposedSeller can be used to accept the ProposedSellerParty that has been proposed in an InternalRequest and make it the true SellerParty of the PurchaseOrder. This action can be executed as long as the PurchaseOrder has not yet been ordered and as long as a SellerParty entry has not yet been created. Copies the Party node instance with specialization ProposedSellerParty into a new instance with specialization SellerParty.

PartyContactParty can be a natural person or organizational center that can be contacted for the Party.

The contact may be a contact person or, for example, a secretary's office. Usually, communication data for the contact is available.

The elements located directly at the node PartyContactParty are defined by the data type: ProcurementDocumentPartyContactPartyElements that is derived from the data type BusinessTransactionDocumentPartyElements. These elements include UUID, a globally unique identifier for a procurement document contact party for referencing purposes, of type GDT; PartyID, an identifier of the contact in this party role in the procurement document or the master data object, of type GDT; PartyUUID, a globally unique identifier of the contact in this party role in the procurement document or the master data object, of type GDT; PartyTypeCode, a coded representation of the type of the business partner, organizational center, or their specializations referenced by the element PartyUUID, of type GDT; AddressReference, a Reference to the address of the Party, of type GDT;

The following composition relationships to subordinate nodes exist:

PartyContactPartyAddress (DO) has a cardinality of 1:c.

From business object Party/Node Root

Party has a cardinality of c:cn

To transformed object UsedAddress/Node Root

UsedAddress has a cardinality of c:cn

Address used for the Contact Party can be a procurement document specific address of the Party.

DO: PartyAddress can be a PartyAddress is a procurement document specific address of a Party.

Location is a physical place, which is relevant for the execution of the purchasing process.

Location occurs in the following complete and disjoint specialisations:

ShipToLocation

A ShipToLocation is the place, whereto material is to be delivered or where a service has to be provided.

ShipFromLocation

A ShipToLocation is the place, where the delivery of goods starts. A ShipFromLocation can be specified in order to support tax calculation in countries where tax calculation needs ShipTo-tals well als ShipFromLocation as input, e.g. USA.

ReceivingSite

The ReceivingSite is the Location of type Site where the ShipToLocation is located. It can be used to control whether a PurchasingContract is a valid source of supply. In a PurchasingContract several release authorized Locations can be defined. The ReceivingSite of the PurchaseOrder is matched against this list of Locations when the validity of the Contract is checked.

The elements located directly at the node Location are defined by the data type: ProcurementDocumentLocationElements. (Data type ProcurementDocumentLocationElements is derived from the data type BusinessTransactionDocumentLocationElements.)

These elements include UUID, a globally unique identifier of the procurement document location for referencing purposes, of type GDT; LocationID, an identifier of the referenced Location, of type GDT; LocationUUID, a globally unique identifier of the Location referenced, of type GDT; RoleCategoryCode, a coded representation of the Location role category in the procurement document, of type GDT; RoleCode, a coded representation of the Location role in the procurement document, of type GDT; AddressReference, a reference to the address of the Party, of type GDT; DeterminationMethodCode, a coded representation of the determination method of the Party, LocationAddress has a cardinality of 1:c There may be a number of Inbound Aggregation Relationships, including:

Location may have a cardinality of c:cn

PartyAddressInformation may have a cardinality of c:cn

UsedAddress may have a cardinality of c:cn

The transformed object UsedAddress represents a uniform way to access a Location address of a procurement document whether it's a Location or business partner address, a organization centre address or an address specified within a procurement document.

A logical place for example can be the reception in an office building or gate 3 of a production plant.

Propagation is used for all Locations, i.e. Locations that are specified at PurchaseOrder level are used for all items if not otherwise specified on item level.

A LocationAddress is a procurement document specific address of a location.

DeliveryTerms are the conditions and agreements that are valid for executing the delivery of ordered material and for the necessary services and activities.

The elements located directly at the node DeliveryTerms are defined by the data type: ProcurementDocumentDeliveryTermsElements. (Data type ProcurementDocumentDeliveryTermsElements is derived from the data type BusinessTransactionDocumentDeliveryTermsElements.)

These elements include: Incoterms, a standard contract formulas for the terms of delivery, DeliveryTerms on the root node PurchaseOrder serve as default values for the same type of information on all Item nodes. The default logic only takes Incoterms into account for material items; they are ignored for all other items.

DO: CashDiscountTerms can be the modalities agreed on by business partners of a procurement document for the payment of goods delivered or services provided. These modalities consist of incremental payment periods and the cash discounts that are allowed when payment is made within one of these periods. CashDiscountTerms is used to define terms of payment, for example, for goods and services.

PriceCalculation can be a summary of the determined price components for the procurement document.ProcurementDocument TaxCalculation can be a summary of the determined tax components for the procurement document.ProcurementDocument. For detailed structure see Dependent Object TaxCalculation.

ControlledOutputRequest can be a controller of output requests and processed output requests related to the procurement document. Several output channels are supported for sending out documents.

A Controlled Output Request supports the output to several output channels. Possible output channels are print, email, fax, or XML messaging.

BusinessTransactionDocumentReference describes a reference to another business transaction document that is involved in the same purchasing process as the PurchaseOrder.

BTDReference occurs in certain specialisations, including InternalRequestReference, an InternalRequest in order to indicate that at least one of the Item nodes was created with reference to one of the InternalRequestItem nodes; AwardedSupplierQuoteReference, a SupplierQuoteReference points to a SupplierQuote in order to indicate that at least one of the Item nodes was created with reference to one of the SupplierQuoteItem nodes; PurchaseRequestReference, a PurchaseRequestReference points to a PurchaseRequest in order to indicate that at least one of the Item nodes was created with reference to one of the PurchaseRequestItem nodes; PurchaseRequisitionReference, a PurchaseRequisitionReference points to a PurchaseRequisition in order to indicate that at least one of the Item nodes was created with reference to one of the PurchaseRequisitionItem nodes; ProjectPurchaseRequestReference, a ProjectPurchaseRequestReference points to a ProjectPurchaseRequest in order to indicate that at least one of the Item nodes was created with reference to one of the ProjectPurchaseRequestItem nodes; PurchasingContractReference, a PurchasingContractReference points to a PurchasingContract in order to indicate that at least one of the Item nodes was created using data (especially the price) of one of the PurchasingContractItem nodes;

PurchaseOrderConfirmationReference, a PurchaseOrderConfirmationReference points to a PurchaseOrderConfirmation created against the PurchaseOrder; GoodsAndServiceAcknowledgementReference, indicates that at least one of the Item nodes has received an acknowledgement through one of the GoodsAndServiceAcknowledgementItem nodes; ConfirmedInboundDeliveryReference, a ConfirmedInboundDeliveryReference points to a confirmedInboundDelivery in order to indicate that at least one of the Item nodes has received a delivery from one of the ConfirmedInboundDeliveryItem nodes; SupplierInvoiceReference, A SupplierInvoiceReference points to a SupplierInvoice in order to indicate that at least one of the Item nodes was invoiced by one of the SupplierInvoiceItem nodes.

The elements located directly at the node BusinessTransactionDocumentReference are defined by the data type: ProcurementDocumentBusinessTransactionDocumentReferenceElements.

These elements include BusinessTransactionDocumentReference, a unique reference to the referred business transaction document, of type GDT; BusinessTransactionDocumentRelationshipRoleCode, a coded representation of the role of a BusinessTransactionDocument in this reference, There may be a number of Inbound Association Relationships, including:

InternalRequest may have a cardinality of c:cn.

SupplierQuote may have a cardinality of c:cn

PurchaseRequisition may have a cardinality of c:cn

PurchaseRequest may have a cardinality of c:cn

ProjectPurchaseRequest may have a cardinality of c:cn

PurchasingContract may have a cardinality of c:cn PurchaseOrderConfirmation may have a cardinality of c:cn GoodsAndServiceAcknowledgement may have a cardinality of c:cn ConfirmedInboundDelivery may have a cardinality of c:cn SupplierInvoice may have a cardinality of c:cn The Dependent Object AttachmentFolder is an electronic document linked to the PurchaseOrder that supports the purchasing process.

The Dependent Object TextCollection is a collection of natural-language text linked to the PurchaseOrder that supports the purchasing process.

AccessControlList may describe a list of access groups that have access to the entire Purchase Order for the time a validity period. The AccessControlList is used to control the access to procurement document instances.

Overview 250086 is a general view on the PurchaseOrder. Overview provides the essential information of the PurchaseOrder at a first glance. The elements located directly at the node Overview are defined by the data type: ProcurementDocumentOverviewElements. The data types may include ProcurementDocumentID, an identifier for the PurchaseOrder assigned by the BuyerParty, of type GDT; ProcurementDocumentUUID, a universally unique identifier for the PurchaseOrder for referencing purposes, of type GDT; CreationBusinessPartnerFormattedName, a formatted name of the Employee who created the purchase order, of type GDT; CreationDateTime, a date and time of creation of the purchase order; LastChangeBusinessPartnerFormattedName, a formatted name of the Employee who last changed the purchase order, of type GDT; LastChangeDateTime, a date and time of the last change of the purchase order, of type GDT; DataOriginTypeCode, a coded representation of the data origin type of the purchase order, e.g. “manual data entry”, of type GDT; CurrencyCode, a coded representation of the PurchaseOrder currency, of type GDT; TotalNetAmount, a total net amount of the PurchaseOrder. This amount is calculated by the system as the sum of NetAmount of all items, of type GDT; SellerPartyID, an ID of the Party referenced by a Party node of specialisation SellerParty, of type GDT; SellerPartyFormattedName, a formatted name of the Party referenced by a Party node of specialisation SellerParty, of type GDT; SellerPartyUUID, a UUID of the Party referenced by a Party node of specialisation SellerParty, of type GDT; ResponsiblePurchasingUnitPartyID, an ID of the Party referenced by a Party node of specialisation ResponsiblePurchasingUnitParty, of type GDT; ResponsiblePurchasingUnitPartyFormattedName, a formatted name of the Party referenced by a Party node of specialisation ResponsiblePurchasingUnitParty, of type GDT; EmployeeResponsiblePartyFormattedName, a formatted name of the Party referenced by a Party node of specialisation ResponsiblePurchasingUnitParty, of type GDT; EmployeeResponsiblePartyUUID, a UUID of the Party referenced by a Party node of specialisation EmployeeResponsibleParty, of type GDT; Status, an Element Status contains all individual status variables that are relevant for and describe the current state in the life cycle of a PurchaseOrder. Data type: ProcurementDocumentStatus. The following elements of this data type are used in a PurchaseOrder; PurchaseOrderLifeCycleStatusCode, a status variable is used to give a status summary for a PurchaseOrder, of type GDT; PurchaseOrderDeliveryStatusCode, a status variable provides a summary of the state of delivery of all PurchaseOrderItems, of type GDT; InvoicingStatusCode, a status variable provides a summary of the state of invoicing of all PurchaseOrderItems, of type GDT; PurchaseOrderConfirmationStatusCode, a status variable shows the summary of the result of the evaluation of received PurchaseOrderConfirmations for all PurchaseOrderItems, An Item specifies a product ordered by the PurchaseOrder and additional information including the total required quantity, price information and a cumulated view on delivery period information. In a special case an Item can also serve as a node that groups other items of the type as described in the definition above. This type of Item node then holds mainly a descriptive text.

The elements located directly at the node Item are defined by the data type: ProcurementDocumentItemElements. The elements of this data type used in a PurchaseOrder include SystemAdministrativeData, an administrative data stored within the system. These data contain system users and time of change. Of type GDT; UUID, a universally unique identifier for the Item for referencing purposes, of type GDT; ID, an identifier for the Item assigned by the BuyerParty, of type GDT; TypeCode, a coded representation of the type of the Item. An Item can be a material item/service item/limit item/hierarchy item. The codes permitted for a PurchaseOrderItem include Purchasing Material Item, Purchasing Service Item, Purchasing Limit Item, Purchasing Hierarchy Item.

A HierarchyRelationship is the relationship between a subitem and a higher-level parent item in an item hierarchy. It contains the following elements that are defined by the GDT: ParentItemUUID, an identifier for the parent PurchaseOrderItem; TypeCode, a coded representation of the type of hierarchical relationship between the subitem and its higher-level parent item; Description, a description of or short comment to the requested Item; Quantity, a quantity of material or service that is ordered via the Item. E.g. 10 Each. In case that more than one ItemScheduleLine exists, this quantity is calculated as the sum of quantities from all ItemScheduleLines; QuantityTypeCode, a coded representation of a type of the quantity; DeliveryPeriod, a delivery date for the ordered products or timeframe for rendered services. In case that more than one ItemScheduleLine exists, this value is an accumulated value calculated from the DeliveryPeriods of all ItemScheduleLines. It is calculated as a period starting with the earliest start date to be found in the ItemScheduleLines and ending with the latest end date; ListUnitPrice, a price of the ordered material or service specified with respect to an order price quantity; NetUnitPrice, a price calculated on the base of the list price by taking discounts or surcharge rates into account; NetAmount, a total net amount of the Item calculated from NetUnitPrice and Quantity; TaxAmount, a total tax amount of the Item as calculated on the base of the NetAmount; CostUpperLimitAmount, a limit for the total costs that may not be exceeded in an ordering process. The overall limit amount may be specified for purchasing limit items (item type code: 20). With it it's not allowed to specify the ListUnitPrice, the NetUnitPrice, the NetAmount and the TaxAmount for purchasing limit items; CostUpperLimitExpectedAmount, describing costs that are actually expected within an ordering process. The expected costs may be equal or less than the maximum permitted costs; MiscellaneousPartialCostUpperLimitAmount, a partial limit for the overall limit for miscellaneous costs. The miscellaneous limit may be specified if the limit item has a PurchasingContract reference, because the miscellaneous limit defines the costs that are permitted for non-contract related delivery and invoice items. The miscellaneous limit may be less than the overall limit amount.

An item cost upper limit is used to define the amount of costs that are permitted for limit items within an ordering process. Limit items are used as placeholders in purchase orders if the exact requirements are unknown at the time of ordering. This can be the case, e.g., for repairs, where the time and spare parts required are not known until the repair has been made. Limit items can have a PurchasingContract reference in order to specify prices and products (materials or services) that may be required during delivery and invoicing. Limit items are typically used for service procurement.

It is important to distinguish between the costs in a procurement process and the limits. The total of all the costs may not exceed the specified cost limit.

Example:

Cost upper limit of EUR 10,000 for maintenance of printers according to contract 4711 ExSpected cost of EUR 8,000 for the planned maintenance of the printers. Miscellaneous partial limit of EUR 3,000 for replacing expendable printer parts which are not covered by the contract 4711

A FollowUpPurchaseOrderConfirmation is information about whether and in what form the buyer expects to receive confirmation of the purchase order from the seller. It contains the following elements that are defined by the data type: ProcurementDocumentItemFollowUpPurchaseOrderConfirmation, indicating whether the follow-up document PurchaseOrderConfirmation is expected or unexpected; FollowUpDespatchedDeliveryNotification, a FollowUpDespatchedDeliveryNotification is information about whether the buyer wants to be informed by the seller of any outbound deliveries. It contains the following element that are defined by the data type: ProcurementDocumentItemFollowUpDespatchedDeliveryNotification: This code indicates whether the follow-up message DeliveryNotification is expected or unexpected; A FollowUpDelivery is information about whether the buyer wants to be informed about delivered materials and services. It contains the following elements that are defined by the data type: ProcurementDocumentItemFollowUpDelivery; RequirementCode, indicating whether the follow-up documents GoodsAndServiceAcknowledgement or ConfirmedInboundDelivery are expected or unexpected; EmployeeTimeConfirmationRequiredIndicator, Indicating whether it is required to confirm the performed employee labor time or not; FollowUpSupplierInvoice, information about how to perform the invoice verification whether the buyer expects to receive an invoice from the seller. It contains the following elements that are defined by the data type: ProcurementDocumentItemFollowUpInvoice: RequirementCode, Indicating whether the follow-up document SupplierInvoice is expected or unexpected.

The EvaluatedReceiptSettlementIndicator indicates whether the evaluated receipt settlement (ERS) procedure is to be used for settlement of the Item, Element Status contains all individual status variables that are relevant for and describe the current state in the life cycle of an Item.

PurchaseOrderItemLifeCycleStatusCode

This status variable is used to give a status summary for an Item. In most states in the life cycle of an Item, the value of one of the status variables that are described in the following is the 'the most important one' from a business point of view. E.g. if an Item has received a PurchaseOrderConfirmation that differes from the ordered values, status "Derivation in Confirmation" is, from a business point of view, more interesting than that variable ConsistencyStatusCode has value 'Consistent' or DeliveryProcessingStatusCode still has value 'Not Started'. Therefore, variable PurchaseOrderLifeCycleStatusCode includes CancellationStatusCode, a variable which provides the information whether the Item has been cancelled or not, of type GDT; PurchaseOrderDeliveryStatusCode, a status variable of the relation between the ordered quantity of the Item and the delivered quantity. E.g., if the full quantity has been delivered, the variable gets value 'Completely Delivered', of type GDT; InvoicingStatusCode, a status variable of the relation between the ordered quantity of the Item and the invoiced quantity. E.g., if the full quantity has been invoiced, the variable gets value 'Completely Invoiced', of type GDT; DeliveryProcessingStatusCode, a status variable which provides information about whether a further delivery is expected or not. If the purchaser does not expect any further delivery for the item, the value is 'Finished', of type GDT; InvoiceProcessingStatusCode, a status variable provides information about whether a further invoice is expected or not. If the purchaser does not expect any further invoices for the item, the value is 'Finished', of type GDT; OrderingStatusCode, a status variable provides the information whether Item has been ordered yet or not, of type GDT; PurchaseOrderConfirmationStatusCode, a status variable provides the result of the evaluation of PurchaseOrderConfirmation that was received for the Item. E.g., if the supplier confirms that he can deliver as requested, this variable will get value 'Confirmed by Supplier', ItemScheduleLine 250032 may have a cardinality of 1:n ItemProduct 250042 may have a cardinality of 1:c ItemDeliveryTerms 250064 may have a cardinality of 1:c ItemAccountingCodingBlockDistribution 250068 may have a cardinality of 1:c ItemParty 250050 may have a cardinality of 1:cn ItemLocation 250060 may have a cardinality of 1:cn ItemBusinessTransactionDocumentReference 250082 may have a cardinality of 1:cn ItemActualValues 250094 may have a cardinality of 1:c ItemBusinessProcessVariantType 250066 may have a cardinality of 1:cn ItemAttachmentFolder 250096 may have a cardinality of 1:c ItemTextCollection 250098 may have a cardinality of 1:c There may be a number of Inbound Aggregation Relationships including:

ParentItem may have a cardinality of c:cn Association to a PurchaseOrderItem itself, which is the relationship between a subitem and a higher-level parent item in an item hierarchy. This enables item hierarchies to be mapped. The hierarchies are mapped using the elements HierarchyRelationshipTypeCode and ParentItemUUID.

From business object Identity

CreationIdentity may have a cardinality of 1:cn Identity that created the procurement document.

LastChangeIdentity may have a cardinality of c:cn Identity that changed the procurement document in the last time.

ChildItem may have a cardinality of c:cn (implemented and create-enabled) Child item in an item hierarchy. This association is necessary in order to create item hierarchies.

To transformed object BusinessDocumentFlow

BusinessDocumentFlow may have a cardinality of c:c Association to the BusinessDocumentFlow which is a view on the set of all preceding and succeeding business (transaction) documents for the current procurement document item.

To transformed object SourcingList

SourcingList may have a cardinality of c:c Association to the SourcingList which is a view on the set of all available sources of supply for the current procurement document item.

To the business object PurchaseOrder/node ItemParty:

ServicePerformerItemParty may have a cardinality of c:c Association to an ItemParty which appears within the ServicePerformerItemParty specialisation.

RequestorItemParty may have a cardinality of c:c Association to an ItemParty which appears within the RequestorItemParty specialisation.

ProductRecipientItemParty may have a cardinality c:c Association to an ItemParty which appears within the ProductRecipientItemParty specialisation.

To the business object PurchaseOrder/node ItemLocation:

ShipFromItemLocation: c:c Association to a Location which appears within the ShipFromItemLocation specialisation.

ShipToItemLocation may have a cardinality of c:c Association to an ItemLocation which appears within the ShipToItemLocation specialisation.

ReceivingItemSite may have a cardinality of c:c Association to an ItemSite which appears within the ReceivingItemSite specialisation.

To the business object PurchaseOrder/node ItemBusinessTransactionDocumentReference ItemInternalRequestItemReference may have a cardinality of c:c Association to an ItemBTDReference which appears within ItemInternalRequestItemReference specialisation.

ItemAwardedSupplierQuoteItemReference may have a cardinality of c:c Association to a ItemBTDReference which appears within ItemAwardedSupplierQuoteItemReference specialisation.

ItemPurchaseRequestItemReference may have a cardinality of c:c Association to a ItemBTDReference which appears within ItemPurchaseRequestItemReference specialisation.

ItemPurchaseRequisitionItemReference may have a cardinality of c:c Association to a ItemBTDReference which appears within ItemPurchaseRequisitionItemReference specialisation.

ItemProjectPurchaseRequisitionItemReference may have a cardinality of c:c Association to a ItemBTDReference which appears within ItemProjectPurchaseRequisitionItemReference specialisation.

ItemPurchasingContractItemReference may have a cardinality of c:c Association to a ItemBTDReference which appears within ItemPurchasingContractItemReference specialisation.

ItemPurchasingContractReference may have a cardinality of c:c Association to a ItemBTDReference which appears within ItemPurchasingContractReference specialisation.

ItemPurchaseOrderConfirmationItemReference may have a cardinality of c:cn Association to a ItemBTDReference which appears within ItemPurchaseOrderConfirmationItemReference specialisation.

ItemGoodsAndServiceAcknowledgementItemReference c:cn Association to a ItemBTDReference which appears within ItemGoodsAndServiceAcknowledgementItemReference specialisation.

ItemConfirmedInboundDeliveryItemReference may have a cardinality of c:cn Association to a ItemBTDReference which appears within ItemConfirmedInboundDeliveryItemReference specialisation.

ItemSupplierInvoiceItemReference may have a cardinality of c:cn Association to a ItemBTDReference which appears within ItemSupplierInvoiceItemReference specialisation.

To the business object PurchaseOrder/node ItemBusinessProcessVariantType

MainItemBusinessProcessVariantType may have a cardinality of c:c Association to the instance of node ItemBusinessProcessVariantType which is marked as the main business process variant type.

To an Item, there always exists at least one ItemScheduleLine, even if complete delivery is requested on one single date.

If there is only one ItemScheduleLine, the element OrderedQuantity on node Item can be edited and an update of this field will also update the element OrderedQuantity on the ItemScheduleLine. The same applies to the element DeliveryPeriod.

If more than one ItemScheduleLine exists, element OrderedQuantity is calculated by the system as the sum of all ScheduleLines and can not be edited. Element DeliveryPeriod is treated similarly. It gets filled with the earliest start and the latest end date maintained on the ItemScheduleLines and can not be changed on may Item.

Cancel (S&AM action) is called to cancel an Item that has already been ordered and sent to the supplier. Items that have been sent can not be deleted physically any more. This action leads to resending of the PurchaseOrder. This action is allowed as long as the variable OrderingStatusCode does not have the value "Ordered" and when the status variable DeliveryProcessStatusCode has the value "Not Delivered" and the status variable InvoiceProcessStatusCode has the value "Not-Invoiced".

RevokeCancellation (S&AM action) reactivates an Item that has been cancelled before.

This action is used to undo an earlier cancellation of an Item e.g. when an agreement with the supplier has been made to continue processing of the Item or when a purchaser cancelled the wrong Item by mistake.

This action is allowed when the status variable CancelationStatusCode has the value “Cancel led”.

CheckDeliveredValues (S&AM action) is used to adjust status variable PurchaseOrderDeliveryStatusCode when new information on delivered quantities is received by the PurchaseOrder. The action compares ordered and delivered quantity and sets a status value according to the result of the comparison. This action is allowed when the variable OrderingStatusCode has the value “Ordered”.

This action can set the status variable PurchaseOrderDeliveryStatusCode to one of the following values: “NotDelivered”, “PartlyDelivered” or “CompletelyDelivered”.

CheckInvoicedValues (S&AM action) is used to adjust status variable InvoicingStatusCode when new information on invoiced quantities is received by the PurchaseOrder. The action compares ordered and invoiced quantity and sets a status value according to the result of the comparison.

Preconditions:

This action is allowed when the variable OrderingStatusCode has the value “Ordered”.

Changes to the object: No further changes to the attributes of the Business Object.

FinishDeliveryProcessing (S&AM action) finishes the delivery process for a PurchaseOrderItem so that no further delivery for the item is expected.

This action is allowed when the variable OrderingStatusCode has the value “Ordered”.

ResumeDeliveryProcessing (S&AM action) resumes an already finished delivery process for a PurchaseOrderItem. This action is allowed when the variable DeliveryProcessingStatusCode has the value “Finished”.

SynchronizeDeliveryProcessing (S&AM action) is called to set status values in status variable DeliveryProcessingStatusCode to reflect changes that happened to status variable PurchaseOrderDeliveryStatus Code.

CheckDeliveryRelevance (S&AM action) is called to set status “Not relevant” in the DeliveryProcessingStatusCode in order to indicate that no delivery is required.

Depending on the value to which attribute Item-FollowupDelivery-RequirementCode is set, the action sets different status values in variable DeliveryProcessingStatusCode: If the requirement code is “not expected” status “not relevant” is set.

FinishInvoiceProcessing (S&AM action) finishes the invoice process for a PurchaseOrderItem so that no further invoice for the item is expected. This action is allowed when the variable OrderingStatusCode has the value “Ordered”.

This action sets the status variable InvoiceProcessingStatusCode to the value: “Finished”.

ResumeInvoiceProcessing (S&AM action) resumes an already finished invoice process for a PurchaseOrderItem. This action is allowed when the variable InvoiceProcessingStatusCode has the value “Finished”.

SynchronizeInvoiceProcessing (S&AM action) is called to set status values in status variable InvoiceProcessingStatusCode to reflect changes that happened to status variable InvoicingStatus Code.

CheckInvoicingRelevance (S&AM action) is called to set status “Not relevant” in the InvoiceProcessingStatusCode in order to indicate that no SupplierInvoice is required. This action is used by the business object itself to reflect changes in the attribute Item-FollowupSupplierInvoiceRequirementCode.

It is possible to execute this action whenever it is possible to change the attribute ItemEvaluatePurchaseOrderConfirmation (S&AM action) evaluates the data of a PurchaseOrderConfirmationItem that has been received. E.g., the supplier can accept to deliver the Item as requested or can send a suggestion for changes of e.g. date, price or quantity. The action sets a status according to the result of the evaluation.

Depending on microeconomic checks the status variable “ProcessOfConfirmation” will be set to one of the following values: “DeviationInPurchaseOrderConfirmation”, “NoticedBySupplier”, “RejectedBySupplier”, “PartlyRejectedBySupplier”, “PartlyConfirmedBySupplier” or “ConfirmedBySupplier”.

This ESI Action is not intended for use by a service consumer. It will be executed by the Business Object PurchaseOrderConfirmation when this Business Object is created. PurchaseOrderConfirmation is created by the inbound agent that processes operation ‘Create Purchase Order Confirmation’ of service interface ‘Ordering In’.

CheckPurchaseOrderConfirmationRelevance (S&AM action) called to set status “Not relevant” in the PurchaseOrderConfirmationStatusCode in order to indicate that the PurchaseOrder is not relevant for the process of confirmation of purchase orders by the supplier. This action is used by the business object itself to reflect changes in the attribute Item. It is possible to execute this action whenever it is possible to change the attribute Item-FollowupPurchaseOrderConfirmationRequirementCode.

QueryByElements provides a list of all PurchaseOrderItem nodes which satisfy the selection criteria, specified by the query Elements, combined by logical “AND”. If, in the following list of selection criteria, no further selection logic is explained, the system will simply check whether the value given in the selection criterion is equal to the value of the corresponding BO node element. The query interface is defined by data type ProcurementDocumentItemElementsQueryElements. The following elements of this data type are used in a PurchaseOrder, of type GDT: ProcurementDocumentID; ProcurementDocumentName; SystemAdministrativeData; CreationBusinessPartnerCommonPersonNameGivenName; CreationBusinessPartnerCommonPersonNameFamilyName; LastChangeBusinessPartnerCommonPersonNameGivenName; ID; ProcurementDocumentCurrencyCode; ProcurementDocumentTotalNetAmount; ProcurementDocumentPartyResponsiblePurchasingUnitPartyID—This selection criterion is matched against node element PurchaseOrderParty-Part ID. The system may consider node instances of specialisation ResponsiblePurchasingUnitParty; ProcurementDocumentPartyBuyerPartyID—This selection criterion is matched against node element PurchaseOrderParty-PartyID. The system may consider node instances of specialisation BuyerParty;

ProcurementDocumentPartyProposedSellerPartyID, This selection criterion is matched against node element PurchaseOrderParty-PartyID. The system may consider node instances of specialisation PreferredSellerParty; ItemProductProductID; ItemProductProductCategoryInternalID; ItemPartyRequestor PartyID, This selection criterion is matched against node element PurchaseOrderParty-PartyID. The system may consider node instances of specialisation RequestorItemParty; ItemPartyProductRecipientPartyID, This selection criterion is matched against node element PurchaseOrderParty-PartyID. The system may consider node instances of specialisation ProductRecipientItemParty; ItemPartyServicePerformerPartyID, This selection criterion is matched against node element PurchaseOrderParty-PartyID. The system may consider node instances of specialisation ServicePerformerItemParty; ItemBusinessTransactionDocumentReferenceInternalRequestReference, This selection criterion is matched against node element ItemBusinessTransactionDocumentReference-BusinessTransactionDocumentReference. In this node element the subelements ID and ItemID are enabled as selection criteria. The system may consider node instances of specialisation ItemInternalRequestReference; ItemBusinessTransactionDocumentReferencePurchaseRequestReference, This selection criterion is matched against node element ItemBusinessTransactionDocumentReference-BusinessTransactionDocumentReference. In this node element the subelements ID and ItemID are enabled as selection criteria. The system may consider node instances of specialisation ItemPurchaseRequestReference; ItemBusinessTransactionDocumentReferencePurchasingContractReference, This selection criterion is matched against node element ItemBusinessTransactionDocumentReference-BusinessTransactionDocumentReference. In this node element the subelements ID and ItemID are enabled as selection criteria. The system will consider node instances of specialisation ItemPurchasingContractItemReference or Item; ItemBusinessTransactionDocumentReferenceSupplierQuoteReference, This selection criterion is matched against node element ItemBusinessTransactionDocumentReference-BusinessTransactionDocumentReference. In this node element the subelements ID and ItemID are enabled as selection criteria. The system may consider node instances of specialisation ItemSupplierQuoteItemReference.

The following Elements of this data type are enabled as selection criteria: PurchaseOrderLifeCycleStatusCode and ApprovalStatusCode.

ItemAccountingCodingBlockDistributionItemAccountingDeterminationExpenseGroupCode The following Elements of this data type are enabled as selection criteria: PurchaseOrderItemLifeCycleStatusCode, DeliveryProcessingStatusCode, PurchaseOrderDeliveryStatusCode, InvoiceProcessingStatusCode, InvoicingStatusCode, and PurchaseOrderConfirmationStatusCode.

An ItemProduct is the identification, description and classification of the product of an Item.

The elements located directly at the node are defined by the data type: ProcurementDocumentItemProductElements. (Data type ProcurementDocumentItemProductElements is derived from the data type BusinessTransactionDocumentProductElements.)

These elements include ProductUUID, a universally unique identifier for a product, of type GDT; ProductID, a proprietary identifier for a product; ProductStandardID, a standardized identifier for this product, whose identification scheme is managed by an agency from the DE 3055 code list; ProductSellerID, an identifier that is used proprietarily by the SupplierParty for this product, of type GDT; ProductTypeCode, a coded representation of the type of a product, of type GDT; ProductCategoryUUID, a universally unique identifier for a product category. When a Product is referenced through element ProductID, element ProductCategoryUUID, ProductCategoryInternalID and ProductCategoryStandardID are copied from the referenced Product. The category copied from the Product is the one belonging to the purchasing hierarchy. If there is no reference to a Product, the product category can be chosen freely, of type GDT; ProductCategoryInternalID, a proprietary identifier used by the BuyerParty for a product category, of type GDT; ProductCategoryStandardID, a standardized identifier for a product category, whereby the identification scheme used is managed by an agency from the code list DE 3055, of type GDT; ProductCatalogueReference, a unique reference to a catalog or to an object within a catalog, There are a number of Inbound Aggregation Relationships including:

Material may have a cardinality of c:cn

ServiceProduct may have a cardinality of c:cn

ProductCategory may have a cardinality of c:cn

Node ItemProduct always references a ProductCategory. If the node ItemProduct references a Product, the ProductCategory is the one to which the Product is assigned. If not, a free text description can be specified and the ProductCategory can be choosen freely.

An ItemDeliveryTerms are conditions and agreements, which consider for execution and delivery of ordered products and services.

The elements located directly at the node ItemDeliveryTerms are defined by the data type: ProcurementDocumentItemDeliveryTermsElements. (Data type ProcurementDocumentItemDeliveryTermsElements is derived from data type BusinessTransactionDocumentDeliverTermsElements.)

These elements include Incoterms, standard contract formulas for the terms of delivery, of type GDT; QuantityTolerance, a definition of tolerances for the delivered or acknowledged quantity, DO: ItemAccountingCodingBlockDistribution describes a distribution of value changes from a procurement document item to coding blocks, whereby the distribution may occur on the basis of amounts, quantities, or percentages.

A coding block is a set of accounting objects of different types. An accounting object is a business object to which value changes from business transactions are assigned in Accounting. For example, a cost center or a profit center.

For detailed structure see Dependent Object AccountingCodingBlockDistribution.

An ItemParty is a natural person, organization, or business partner group that is involved in a PurchaseOrder. This could be a person, organization, or group inside or outside of the company. ItemParty occurs in the following specialisations: ServicePerformerItemParty, the party that physically provides a service in the name of the Supplier which is referenced by the SellerParty. The business objects Employee or BusinessPartner can be the ServicePerformerItemParty. The Item may contain one ServicePerformerParty. As the ServicePerformerItemParty referes to a Person already, no PartyContactParty can be maintained for this Party.

The Requestor Party is the party that initiates the purchasing process through a request of some kind. E.g., this can be the person that creates an InternalRequest that is transferred into a PurchaseOrder.

The business object Employee can be the RequesterItemParty. A Item may be ordered when the Requestor Party is provided. The Item may contain one Requestor Party.

A ProductRecipientParty is the party to which material is delivered or for which services are performed.

The business objects Employee or DistributionCenter can be the ProductRecipientItemParty.

A Item may be ordered if a ProductRecipientParty or an instance of node ItemLocation with specialisation ShipToItemLocation is provided. The Item may contain one ProductRecipientParty. When the ProductRecipientItemParty referes to an Employee, no PartyContactParty can be maintained for this Party.

The elements located directly at the node ItemParty are defined by the data type: ProcurementDocumentItemPartyElements Elements. (GDT: ProcurementDocumentItemPartyElements is derived from data type BusinessTransactionDocumentPartyElements.)

These elements include UUID, needed to access this node external as reference;

PartyID, an identifier of the ItemParty in this PartyRole in the business document or the master data object.

Comment: If a business partner or organizational unit are referenced, the attribute contains their identifiers. If an unidentified identifier is, for example, entered by the user, the attribute contains this identifier; PartyUUID, a unique identifier for a business partner, the organizational unit, or their specializations;

PartyTypeCode, a type of the business partner, organizational unit, or their specializations referenced by the attribute, The codes permitted for PartyRoleCategoryCode on node ItemParty include Businesspartner, Employee, Organisational Center, PartyRoleCategoryCode, a Party Role Category of the contact in the business document or the master data object, The codes permitted for PartyRoleCategoryCode on node ItemParty include ProductRecipientParty, Requestor Party, ServicePerformerParty, PartyRoleCode, a Party Role of the contact in the business document or the master data object, of type GDT;

The codes permitted for PartyRoleCode on node ItemParty include ProductRecipientParty, Requestor Party, ServicePerformerParty, AddressHostUUID, a Globally unique identifier of the address of the business partner, the organizational center, or their specializations; AddressHostTypeCode, a coded representation of the address host type, of type GDT; DeterminationMethodCode, a coded representation of the determination method of the contact party, of type GDT; MainIndicator, which indicates whether or not a ItemParty is emphasized in a group of parties with the same PartyRole, of type GDT; ActiveIndicator, which indicates whether or not the ItemParty is active from a business point of view and may be used in a process. If the indicator is false, the Item Party is no longer active even if it is still part of the business document or master data object, DO: PartyAddress has a cardinality of 1:c.

There may be a number of Inbound Aggregation Relationships including:

Party may have a cardinality of c:cn

UsedAddress may have a cardinality of c:cn The transformed object UsedAddress represents a uniform way to access a party address of a procurement document whether it's a business partner address, a organization centre address or an address specified within a procurement document.

An ItemPartyAddress 250054 is a procurement document specific address of an ItemParty.

ItemLocation is a physical or logical place, which is relevant for the execution of the purchasing process.

ItemLocation occurs in the following complete and disjoint specialisations:

ShipToItemLocation. A ShipToLocation is the place, whereto material is to be delivered or where a service has to be provided. ShipFromItemLocation. A ShipFromLocation is the place, where the delivery of goods starts. A ShipFromItemLocation can be specified in order to support tax calculation in countries where tax calculation needs ShipTo—as well as ShipFromItemLocation as input, e.g. USA.

The ReceivingItemSite can be used to control whether a PurchasingContract is a valid source of supply for the Item. In a PurchasingContract several release authorized Locations can be defined. The Receiving Location of the PurchaseOrder is matched against this list of Locations when the validity of the Contract is checked.

The elements located directly at the node ItemLocation are defined by the data type: ProcurementDocumentItemLocationElements. (Data type ProcurementDocumentItemLocationElements is derived from data type BusinessTransactionDocumentLocationElements.)

These elements include UUID, a globally unique identifier of the procurement document location for referencing purposes, of type GDT; LocationID, an identifier of the referenced Location, of type GDT; LocationUUID, a globally unique identifier of the Location referenced, of type GDT; RoleCategoryCode, a coded representation of the Location role category in the procurement document, of type GDT; RoleCode, a coded representation of the Location role in the procurement document, of type GDT; AddressReference, a reference to the address of the Party; AddressHostUUID, a globally unique identifier of the address of the business partner, the organizational center, or their specializations, of type GDT; AddressHostTypeCode, a coded representation of the address host type, of type GDT; PartyID, an identifier of the Party, which contains the referenced address, of type GDT; DeterminationMethodCode, a coded representation of the determination method of the Party, There may be a number of Inbound Aggregation Relationships, including:

Location may have a cardinality of c:cn Location that is related to a PurchaseOrder through specialisation ShipToItemLocation or ReceivingItemLocation.

PartyAddressInformation may have a cardinality of c:cn

To transformed object UsedAddress

UsedAddress has a cardinality of c:cn The transformed object UsedAddress represents a uniform way to access a Location address of a procurement document whether it's a Location or business partner address, a organization centre address or an address specified within a procurement document.

A logical place for example can be the reception in an office building or gate 3 of a production plant.

Propagation is used for all Locations, i.e. Locations that are specified at purchase order header level are used for all items if not otherwise specified on item level.

An ItemLocationAddress 250062 is a procurement document specific address of an ItemLocation.

An ItemBusinessTransactionDocumentReference is a unique reference to an Item of another business transaction document. ItemBusinessTransactionDocumentReference occurs in the following specialisations:

ItemInternalRequestItemReference

An ItemInternalRequestItemReference points to an InternalRequestItem in order to indicate that the Item was created on the basis of the InternalRequestItem.

ItemAwardedSupplierQuoteItemReference

An ItemAwardedSupplierQuoteItemReference points to a SupplierQuoteItem in order to indicate that the Item was created with reference to the SupplierQuoteItem.

ItemPurchaseRequestItemReference

An ItemPurchaseRequestItemReference points to a PurchaseRequestItem in order to indicate that the Item was created with reference to the PurchaseRequestItem.

ItemPurchaseRequisitionItemReference

An ItemPurchaseRequisitionItemReference points to a PurchaseRequisitionItem in order to indicate that the Item was created with reference to the PurchaseRequisitionItem.

ItemProjectPurchaseRequestItemReference

An ItemProjectPurchaseRequestItemReference points to a ProjectPurchaseRequestItem in order to indicate that the Item was created with reference to the ProjectPurchaseRequestItem.

ItemPurchasingContractReference

An ItemPurchasingContractReference points to a PurchasingContract. This relation indicates that one of the items of this contract can be used as a reference for release during creation of a GoodsAndServiceAcknowledgement for the PurchaseOrder Item. This reference is only available for Items of type 'Limit'.

ItemPurchasingContractItemReference

An ItemPurchasingContractItemReference points to a PurchasingContractItem in order to indicate that the Item was created using data (especially the price) of the PurchasingContractItem.

ItemPurchaseOrderConfirmationItemReference

An ItemPurchaseOrderConfirmationItemReference points to a PurchaseOrderConfirmationItem created against the Item.

ItemGoodsAndServiceAcknowledgementItemReference

An ItemGoodsAndServiceAcknowledgementItemReference points to a GoodsAndServiceAcknowledgementItem in order to indicate that the Item has received and acknowledgement through the GoodsAndServiceAcknowledgementItem.

ItemConfirmedInboundDeliveryItemReference

An ItemConfirmedInboundDeliveryItemReference points to a confirmedInboundDeliveryItem in order to indicate that the Item has received a delivery from the ConfirmedInboundDeliveryItem.

ItemSupplierInvoiceItemReference

An ItemSupplierInvoiceItemReference points to a SupplierInvoiceItem in order to indicate that the Item was invoiced by the SupplierInvoiceItem.

The elements located directly at the node ItemBusinessTransactionDocumentReference are defined by the data type: ProcurementDocumentBusinessTransactionDocumentReferenceElements.

These elements include BusinessTransactionDocumentReference, a unique reference to the referred business transaction document, of type GDT; BusinessTransactionDocumentRelationshipRoleCode, a coded representation of the role of a BusinessTransactionDocument in this reference, There may be a number of Inbound Association Relationships, including:

InternalRequestItem may have a cardinality of c:cn

SupplierQuoteItem may have a cardinality of c:cn

SupplierQuoteItem that is referenced through specialisation ItemAwardedSupplierQuoteItemReference.

From the business object PurchaseRequest/node Item:

PurchaseRequestItem may have a cardinality of c:cn PurchaseRequestItem that is referenced through specialisation ItemPurchaseRequestItemReference.

From the business object PurchaseRequisition/node Item:

PurchaseRequisitionItem may have a cardinality of c:cn PurchaseRequisitionItem that is referenced through specialisation ItemPurchaseRequisitionItemReference.

From the business object ProjectPurchaseRequest/node Item:

ProjectPurchaseRequestItem may have a cardinality of c:cn ProjectPurchaseRequestItem that is referenced through specialisation ItemProjectPurchaseRequestItemReference.

From the business object PurchasingContract/node Root:

PurchasingContract may have cardinality of c:cn PurchasingContract that is referenced through specialisation ItemPurchasingContractReference.

From the business object PurchasingContract/node Item:

PurchasingContractItem may have a cardinality of c:cn PurchasingContractItem that is referenced through specialisation ItemPurchasingContractItemReference.

From the business object PurchaseOrderConfirmation/node Item:

PurchaseOrderConfirmationItem may have a cardinality of c:cn PurchaseOrderConfirmationItem that is referenced through specialisation ItemPurchaseOrderConfirmationItemReference.

From the business object GoodsAndServiceAcknowledgement/node Item:

GoodsAndServiceAcknowledgementItem may have a cardinality of c:cn GoodsAndServiceAcknowledgementItem that is referenced through specialisation ItemGoodsAndServiceAcknowledgementItemReference.

From the business object ConfirmedInboundDelivery/node Item:

ConfirmedInboundDeliveryItem may have a cardinality of c:cn ConfirmedInboundDeliveryItem that is referenced through specialisation ItemConfirmedInboundDeliveryItemReference.

From the business object SupplierInvoice/node Item:

SupplierInvoiceItem may have a cardinality of c:cn SupplierInvoiceItem that is referenced through specialisation ItemSupplierInvoiceItemReference.

ItemBusinessTransactionDocumentReferenceActualValues 250084 are the actually achieved or performed values of a business transaction document referenced by a purchase order item.

The elements located directly at the node ItemBusinessTransactionDocumentReferenceActualValues are defined by the data type: ProcurementDocumentItemBusinessTransactionDocumentReferenceActualValuesElements. These elements include ActiveIndicator, which indicates whether the referenced business transaction document is commercially active in a procurement process or not, of type GDT; Amount, the amount of the referenced business transaction document for the procurement document item, of type GDT; AmountRoleCode, the amount role code is a coded representation of the role of the amount in the referenced business transaction document, of type GDT; CancellationDocumentIndicator, which indicates whether the referenced business transaction document is a cancellation document or not, of type GDT; Quantity, the quantity of the referenced business transaction document for the procurement document item, of type GDT; QuantityTypeCode, a coded representation of a type of quantity in the referenced business transaction document for the procurement document item, of type GDT; QuantityRoleCode, The quantity role code is a coded representation of the role of the quantity in the referenced business transaction document, Quantity, QuantityRoleCode and QuantityTypeCode may be specified for purchasing material and service items.

The ItemActualValues are the actually achieved values, i.e. acknowledged or delivered and invoiced quantities and amounts for an Item.

The elements located directly at the node ItemActualValues are defined by the data type: ProcurementDocumentItemActualValuesElements.

These elements include TotalDeliveryQuantity, the Total quantity of all GoodsAndServiceAcknowledgementItems or a confirmedInboundDeliveryItems that have been created with reference to the PurchaseOrderItem, of type GDT; TotalDeliveryQuantityTypeCode, a coded representation of the type of the total delivery quantity; TotalDeliveryNetAmount, a total net amount of all GoodsAndServiceAcknowledgementItems or a confirmedInboundDeliveryItems that have been created with reference to the PurchaseOrderItem; TotalMiscellaneousDeliveryNetAmount, the total miscellaneous net amount of delivered goods or performed services. The total net amount of deliveries which have been captured for a miscellaneous partial cost upper limit of a purchase order limit item; TotalDeliveredQuantity, the total quantity of delivered goods or performed services for the purchase order item; TotalDeliveryedQuantityTypeCode, a coded representation of the type of the total delivered quantity; TotalDeliveredNetAmount, the total net amount of delivered goods or performed services for the purchase order item; TotalMiscellaneousDeliveredNetAmount, a total net amount of delivered goods or performed services for a miscellaneous partial cost upper limit of purchasing limit item; InvoiceQuantity, a total quantity of all SupplierInvoiceItems that have been created with reference to the PurchaseOrderItem; TotalInvoiceQuantityTypeCode, a coded representation of the type of the total invoice quantity; InvoiceNetAmount, a total net amount of all SupplierInvoiceItems that have been created with reference to the PurchaseOrderItem; TotalMiscellaneousInvoiceNetAmount, a total miscellaneous net amount that is invoiced. The total net amount of invoices which have been captured for a miscellaneous partial cost upper limit of purchase order limit item.

On node ItemActualValues, either DeliveredQuantity or InvoicedQuantity have to be specified. In the purchasing process, through cancellation of existing follow on documents, it can happen that all total values go back to zero.

TotalQuantity on the PurchaseOrderItem may not be reduced to a value below the value of DeliveredQuantity and InvoicedQuantity. For purchasing limit items only actual total amounts will be available.

The total values are calculated by cumulation of the relevant item business transaction document reference actual values. The delivery of goods or services is represented by the Business Objects GoodsAndServiceAcknowledgement or ConfirmedInboundDelivery.

The invoice quantities and amounts for example will be cumulated over all the follow up SupplierInvoiceItems that are related to the PurchaseOrderItem.

ItemBusinessProcessVariantType defines the character of a business process variant of the Item-Node. It represents a typical way of processing of a PurchaseOrderItem within a process component from a business point of view.

A Business Process Variant is configuration of a Process Component. A Business Process Variant belongs exactly to one process component.

A process component is a software package that realizes a business process and exposes its functionality as services. The functionality contains business transactions. A process component contains one or more semantically related business objects. A business object belongs to exactly one process component.

The elements located directly at the node ProcurementDocumentBusinessProcessVariantType are defined by the data type: ProcurementDocumentBusinessProcessVariantTypeElements. These elements include BusinessProcessVariantTypeCode, a coded representation of a business process variant type of a procurement document business process variant type, of type GDT; MainIndicator, an indicator that specifies whether the current business process variant type is the main one or not, Only one of the instances of the BusinessProcessVariantType is allowed to be indicated as main.

The Dependent Object ItemAttachmentFolder is an electronic document linked to the Item that is relevant for the purchasing process.

The Dependent Object ItemTextCollection is a collection of natural-language text linked to the Item that is relevant for the purchasing process. As an example, a text contained in ItemTextCollection can be an internal may added by the Requestor Party to detail the request or an approval may added by one of the approvers during an approval workflow for the PurchaseOrder.

An ItemScheduleLine is a line containing the quantity and date of a performance schedule required by the buyer for a PurchaseOrder.

The elements located directly at the node ItemScheduleLine are defined by the data type: ProcurementDocumentItemScheduleLineElements.

These elements include ID, an identifier for the ItemScheduleLine assigned by the BuyerParty, of type GDT;

DeliveryPeriod, a Delivery period for the product or service that is requested via the ItemScheduleLine, of type GDT; Quantity, the quantity of the product or service that is requested via the ItemScheduleLine. E.g. 10 Each, of type GDT; QuantityTypeCode, a coded representation of a type of quantity in procurement document item schedule line, From a procurement perspective schedule lines provide information about which quantities should be delivered until a certain point in time.

PurchaseOrderMessage Message Types and Their Signatures

FIG. 251-1 through 251-49 illustrates one example logical configuration of PurchaseOrderMessage message 251000. Specifically, this figure depicts the arrangement and hierarchy of various components such as one or more levels of packages, entities, and datatypes, shown here as 251000 through 2511270. As described above, packages may be used to represent hierarchy levels. Entities are discrete business elements that are used during a business transaction. Data types are used to type object entities and interfaces with a structure. For example, PurchaseOrderMessage message 251000 includes, among other things, PurchaseOrder 251080. Accordingly, heterogeneous applications may communicate using this consistent message configured as such.

FIG. 252 illustrates one example logical configuration of PurchaseOrderCancellationMessage message 252000. Specifically, this figure depicts the arrangement and hierarchy of various components such as one or more levels of packages, entities, and datatypes, shown here as 252000 through 252034. As described above, packages may be used to represent hierarchy levels. Entities are discrete business elements that are used during a business transaction. Data types are used to type object entities and interfaces with a structure. For example, PurchaseOrderCancellationMessage message 252000 includes, among other things, PurchaseOrderCancellation 252014. Accordingly, heterogeneous applications may communicate using this consistent message configured as such.

FIG. 253-1 through 253-6 illustrates one example logical configuration of PurchaseOrderDeliveryValuesNotificationMessage message 253000. Specifically, this figure depicts the arrangement and hierarchy of various components such as one or more levels of packages, entities, and datatypes, shown here as 253000 through 253120. As described above, packages may be used to represent hierarchy levels. Entities are discrete business elements that are used during a business transaction. Data types are used to type object entities and interfaces with a structure. For example, PurchaseOrderDeliveryValuesNotificationMessage message 253000 includes, among other things, PurchaseOrder 253014. Accordingly, heterogeneous applications may communicate using this consistent message configured as such.

FIG. 254-1 through 254-8 illustrates one example logical configuration of PurchaseOrderInvoiceValuesNotificationMessage message 254000. Specifically, this figure depicts the arrangement and hierarchy of various components such as one or more levels of packages, entities, and datatypes, shown here as 254000 through 254158. As described above, packages may be used to represent hierarchy levels. Entities are discrete business elements that are used during a business transaction. Data types are used to type object entities and interfaces with a structure. For example, PurchaseOrderInvoiceValuesNotificationMessage message 254000 includes, among other things, PurchaseOrder 254014. Accordingly, heterogeneous applications may communicate using this consistent message configured as such.

FIG. 255-1 through 255-19 illustrates one example logical configuration of PurchaseOrderNotificationMessage message 255000. Specifically, this figure depicts the arrangement and hierarchy of various components such as one or more levels of packages, entities, and datatypes, shown here as 255000 through 255510. As described above, packages may be used to represent hierarchy levels. Entities are discrete business elements that are used during a business transaction. Data types are used to type object entities and interfaces with a structure. For example, PurchaseOrderNotificationMessage message 255000 includes, among other things, PurchaseOrder 255014. Accordingly, heterogeneous applications may communicate using this consistent message configured as such.

FIG. 256-1 through 256-48 illustrates one example logical configuration of PurchaseOrderMessage message 256000. Specifically, this figure depicts the arrangement and hierarchy of various components such as one or more levels of packages, entities, and datatypes, shown here as 256000 through 256555. As described above, packages may be used to represent hierarchy levels. Entities are discrete business elements that are used during a business transaction. Data types are used to type object entities and interfaces with a structure. For example, PurchaseOrderMessage message 256000 includes, among other things, PurchaseOrder 256040. Accordingly, heterogeneous applications may communicate using this consistent message configured as such.

The motive behind the Messagetype PurchaseOrderNotification is from the process, in which external process components are notified about a purchase order. The motive behind the Messagetype PurchaseOrderDeliveryValuesNotification is from the processes, in which the purchase order is notified about the scheduling of delivery quantity of a purchase order. The motivation behind the message type PurchaseOrderInvoiceValuesNotification is the need for information about entered invoices in business objects that the supplier invoicing notified about outstanding invoices.

A PurchaseOrderNotification is the notification about the creation of a new purchase order or a change to an existing purchase order.

The structure of the message type PurchaseOrderNotification is specified by the message data type PurchaseOrderNotificationMessage (see Section 2).

Structural limitations or of the PurchaseOrderNotification regarding the message data type PurchaseOrderNotification Message are listed in the respective part of section.

The PurchaseOrderNotification message contains the BusinessObject PurchaseOrder und is implemented by the sending process component PurchaseOrderProcessing.

PurchaseOrderDeliveryValuesNotification

The PurchaseOrderDeliveryValuesNotification is a notification about the scheduling of the delivered quantity.

The structure of the PurchaseOrderDeliveryValuesNotification is specified by the message data type PurchaseOrderDeliveryValuesNotificationMessage.

Structural limitations or of the PurchaseOrderDeliveryValuesNotification regarding the message data type PurchaseOrderDeliveryValuesNotificationMessage are listed in the respective part of section.

The PurchaseOrderDeliveryValuesNotification message is implemented by the receiver process component PurchaseOrderProcessing and sends notification about the quantity delivered.

A PurchaseOrderInvoiceValuesNotification is a message about entered values and quantities in a SupplierInvoiceRequest in a SupplierInvoice.

The structure of the message type PurchaseOrderInvoiceValuesNotification is based on the message data type PurchaseOrderInvoiceValuesNotificationMessage.

The message from message type PurchaseOrderInvoiceValuesNotification is sent from the business object SupplierInvoiceRequest (LDU Supplier Invoicing), to the business object that the Supplier Invoicing informed of the outstanding invoice. It is used to inform the notified business object about the entered values and quantities in the business object SupplierInvoice.

PurchaseOrderNotification Message

The Message-data type PurchaseOrderNotificationMessage contains:

The PurchaseOrder object in the business document, a business information relevant for sending a business document in a message. The PurchaseOrderNotificationMessage data type provides the structure for the PurchaseOrder message type and the operations based on this.

MessageHeader Package

A MessageHeader package groups business information relevant for sending a business document in a message.

A MessageHeader groups together business information from the point of view of the sending application for business document identification in a message.

It is of the type GDT: BusinessDocumentMessageHeader whereby the following element of the GDT is used:

ID.

The PurchaseOrder package groups the PurchaseOrderNotification together along with its packages. It includes Party package, Location package, DeliveryInformation package, PriceInformation package, Description package, FollowUpMessage-package, Item package. The PurchaseOrder includes ID; UUID, of type GDT; ReconciliationPeriodCounterValue, of type GDT; Name, of type GDT; PurchaseOrderParty Package. The Party package includes BuyerParty, SellerParty, ServicePerformerParty, Requestor Party, ProductRecipientParty, BuyerParty. The BuyerParty is of the GDT type: BusinessTransactionDocumentParty. The SellerParty is of type GDT: BusinessTransactionDocumentParty. The ServicePerformerParty is of type GDT: BusinessTransactionDocumentParty. Requestor Party is of type GDT: BusinessTransactionDocumentParty. The ProductRecipientParty is of type GDT: BusinessTransactionDocumentParty. The Location-package groups together all participating cities.

The Location-package includes ShipToLocation, ReceivingSite. The ShipToLocation is of type GDT: BusinessTransactionDocumentShipToLocation. The ReceivingSite is of type GDT: BusinessTransactionDocumentLocation. The DeliveryInformation package groups together terms of delivery.

The DeliveryInformation-package includes IncoTerms, of type GDT.

The PriceInformation package groups the price information. The PriceInformation package includes NetAmount, of type GDT. The Attachment package includes AttachmentFolder, of type GDT.

The TextCollection package groups together texts. The TextCollection package contains TextCollection, of type GDT.

The PurchasingContractItem package groups the PurchasingContractItem together along with its packages; it includes ProductInformation-package, DeliveryInformation-package, ItemPriceInformation-package, ItemParty-package, ItemLocation-package, ItemBusinessTransactionDocumentReference-package, ItemDescription-package, ItemFollowUpMessage-package, ItemScheduleLine-package, PurchaseOrderItem.

The PurchaseOrderItem includes ID; UUID, of type GDT; ItemTypeCode, of type GDT; CostUpperLimitAmount, of type GDT; CostUpperLimitExpectedAmount, of type GDT; PurchaseOrderItemProductInformation Package, which groups together all information for identification, description and classification of a product.

The ProductInformation package includes Product, ProductCategory. The Product is of type GDT: BusinessTransactionDocumentProduct.

The DeliveryInformation package groups together terms of delivery. The DeliveryInformation-package includes IncoTerms, QuantityTolerance, both of type GDT.

PurchaseOrderItemPriceInformation Package

An ItemPriceInformation package groups together price-relevant information. The ItemPriceInformation package includes NetAmount, of type GDT. The ItemParty package groups together all participating parties.

The ItemParty package includes ProductRecipientParty, ServicePerformerParty,

Requestor Party. The ProductRecipientParty is of type GDT: BusinessTransactionDocumentParty.

Requestor Party is of type GDT: BusinessTransactionDocumentParty.

The ItemLocation-package groups together all participating cities. The ItemLocation-package includes ShipToLocation and ReceivingSite, of type GDT.

PurchaseOrderItemBusinessTransactionDocumentReference Package

The ItemBusinessTransactionDocumentReference package groups together documents, which are previous documents of a purchase order.

The ItemBusinessTransactionDocumentReference-package includes PurchaseContractReference, PurchaseRequestReference, PurchaseRequisitionReference, InternalRequestReference ProjectPurchaseRequestReference.

The PurchaseContractReference is of type GDT: BusinessTransactionDocumentReference PurchaseRequestReference. The PurchaseRequestReference is of type GDT: BusinessTransactionDocumentReference. The PurchaseRequisitionReference is of type GDT: BusinessTransactionDocumentReference InternalRequestReference The InternalRequestReference is of type GDT: BusinessTransactionDocumentReference. The ProjectPurchaseRequestReference is of type GDT: BusinessTransactionDocumentReference.

The Attachment package includes an AttachmentFolder, of type GDT. The TextCollection package groups together texts. The TextCollection is of type GDT: TextCollection.

PurchaseOrderItemDescription Package

The Description package groups together descriptions. The FollowUpMessage package groups together follow up messages. The FollowUpMessage package includes FollowUpPurchaseOrderConfirmation, FollowUpDespatchedDeliveryNotification, FollowUpInvoiceRequest, FollowUpDelivery. A FollowUpPurchaseOrderConfirmation is a follow-up document for the PurchaseOrderConfirmation business object. The FollowUpPurchaseOrderConfirmation is of type GDT: FollowUpMessageRequirementCode A FollowUpDespatchedDeliveryNotification is a follow-up document of the DespatchedDeliveryNotification.

The FollowUpDespatchedDeliveryNotification is of type GDT: FollowUpMessageRequirementCode. A FollowUpDelivery is a follow-up document of the Delivery, of type GDT.

A FollowUpInvoiceRequest is a follow-up document for the InvoiceRequest business object, of type GDT.

PurchaseOrderItemScheduleLine Package

The ScheduleLine package groups together schedule lines.

PurchaseOrderItemFulfillingDelivery-Package

The FulfillingDelivery package groups together information about the delivery, with which the ordered products in a PurchaseOrderItem were delivered. It contains DeliveryReferenceInformation.

From the point of view of the delivery item, a DeliveryReferenceInformation indicates the extent to which a PurchaseOrderItem has been fulfilled by the delivery item.

DeliveryReferenceInformation GDT: PurchaseOrderNotificationDeliveryReferenceInformation The DeliveryReferenceInformation includes BusinessTransactionDocumentReference, of type GDT; ActiveIndicator, of type GDT; Amount, of type GDT; CancellationDocumentIndicator, of type GDT; Quantity, of type GDT; QuantityTypeCode, of type GDT.

PurchaseOrderItemFulfillingInvoice-Package

The FulfillingInvoice package groups together information about the invoice, with which the ordered products in a PurchaseOrderItem were invoiced. It contains SupplierInvoiceReferenceInformation.

From the point of view of the delivery item, a SupplierInvoiceReferenceInformation indicates the extent to which a PurchaseOrderItem has been fulfilled by the invoice item; it is of type GDT.

The SupplierInvoiceReferenceInformation includes BusinessTransactionDocumentReference, of type GDT; ActiveIndicator, of type GDT; Amount, of type GDT; CancellationDocumentIndicator, of type GDT; Quantity, of type GDT; QuantityTypeCode, of type GDT.

AccountingObjectSetAssignment is the assignment of the net amount to a set of account assignment objects.

GDT Data Types Used include Data Model of Message Data Type, Element Structure of Message Data Type, PurchaseOrderDeliveryValuesNotification.

The PurchaseOrderDeliveryValuesNotificationMessage data type includes The PurchaseOrder object contained in the business document, Business information relevant for sending a business document in a message.

The PurchaseOrderDeliveryValuesNotificationMessage data type provides the structure for the PurchaseOrderDeliveryValuesNotification message type and the operations based on this.

A MessageHeader package groups business information relevant for sending a business document in a message. A MessageHeader groups together business information from the point of view of the sending application for business document identification in a message.

It is of the type GDT: BusinessDocumentMessageHeader whereby the following element of the GDT is used ID.

The PurchaseOrder package groups the PurchaseOrderDeliveryValuesNotification together along with its packages. The PurchaseOrderDeliveryValuesNotification includes ID, of type GDT; UUID, of type GDT; ReconciliationPeriodCounterValue—Value of the counter for the reconciliation period (GDT: ReconciliationPeriodCounterValue)

The PurchaseOrderItem includes ID, of type GDT; UUID, of type GDT.

PurchaseOrderItemFulfillingDelivery-Package

The FulfillingDelivery package groups all information about completion of a delivery.

The PurchaseOrderItemFulfillingDelivery includes ID, of type GDT; UUID, of type GDT; TypeCode, of type GDT; CancellationDocumentIndicator, of type GDT.

The FulfillingDeliveryItem package includes ID, of type GDT; UUID; of type GDT;

TypeCode, of type GDT; ActiveIndicator, of type GDT; Quantity, of type GDT; QuantityTypeCode, of type GDT.

Data Model of Message Data Type

Element Structure of Message Data Type

PurchaseOrderInvoiceValuesNotificationMessage

The PurchaseOrder object contained in the business document

Business information relevant for sending a business document in a message.

The message data type PurchaseOrderInvoiceValuesNotificationMessage thus provides the structure for the message type PurchaseOrderInvoiceValuesNotification and the interfaces based thereon.

MessageHeader Package

A MessageHeader package groups business information relevant for sending a business document in a message.

A MessageHeader groups together business information from the point of view of the sending application for business document identification in a message, of type GDT.

PurchaseOrder-Package

The PurchaseOrder package groups the PurchaseOrder together along with its packages. It includes ID, of type GDT; UUID, of type GDT; ReconciliationPeriodCounterValue, of type GDT.

The PurchaseOrderItem package groups the PurchaseOrderItem together along with its packages.

It includes FulfillingSupplierInvoice; ID, of type GDT; UUID, of type GDT.

PurchaseOrderItemFulfillingSupplierInvoice-Package

The FulfillingSupplierInvoice package groups information about invoices for a PurchaseOrderItem.

It contains the following package:

FulfillingSupplierInvoiceItem-Package

From the point of view of the invoice, a FulfillingSupplierInvoice indicates the extent to which billing of a PurchaseOrderItem has been invoiced. ID, of type GDT; UUID, of type GDT; TypeCode, of type GDT; CancellationDocumentIndicator, of type GDT.

FulfillingSupplierInvoiceFulfillingSupplierInvoiceItem-Package

The FulfillingSupplierInvoiceItem package groups information about items from invoices to a PurchaseOrder item. The FulfillingSupplierInvoiceItem package includes a FulfillingSupplierInvoiceItem. From the point of view of the invoice item, a FulfillingSupplierInvoiceItem indicates the extent to which billing of a PurchaseOrderItem by an invoice item has been invoiced. It includes ID, of type GDT; UUID, of type GDT; TypeCode, of type GDT; Quantity, of type GDT; QuantityTypeCode, of type GDT; NetAmount, of type GDT.

PurchaseOrder interfaces are the interfaces that are in a B2B process to exchange purchase orders and order confirmations between a buyer and a seller.

Motivating Business Scenario

Traditional methods of communication in an ordering process, such as mail or fax, are cost intensive, prone to error, and relatively slow, since the data has to be entered manually. Electronic communication between the procurement system and a sales system eliminates such problems.

Purchase order interfaces directly integrate the applications that implement the interfaces and form a basis for mapping data to widely-used standard formats, such as RosettaNet.

More than just a simple interface structure, the purchase order interfaces define underlying corporate significance and, at the same time, dispense with the need to exchange proprietary information in straightforward ordering processes. In this way, applications that implement purchase order interfaces can be integrated without the need for complex project work.

Message Types

A total of four messages types exist for mapping a B2B ordering process.

The message type PurchaseOrderRequest is sent from the buyer to the seller. It is used to start a new ordering process. The message type PurchaseOrderChangeRequest is sent from the buyer to the seller. It is used to change an order during the ordering process. Changing a purchase order includes creating new items, changing existing items, and canceling items. The message type PurchaseOrderCancellationRequest is sent from the buyer to the seller. It is used to cancel an order.

The message type PurchaseOrderConfirmation is sent from the seller to the buyer. It is used to confirm an order. It can be sent in direct response to a PurchaseOrderRequest, a PurchaseOrderChangeRequest, or a PurchaseOrderCancellationRequest message, or without a direct preceding message to display changes to the purchase order or its confirmation status. Changing a purchase order also includes the seller creating new items and changing or rejecting existing items.

These four message types are based on two structures: the message data types PurchaseOrderMessage and PurchaseOrderCancellationMessage. The three message types PurchaseOrderRequest, PurchaseOrderChangeRequest, and PurchaseOrderConfirmation are based on the message data type PurchaseOrderMessage. The parts of the structure that are used differ depending on the message. The description of the PurchaseOrderMessage specifies which parts are used in which message.

The PurchaseOrderCancellationRequest is based on the second message data type, the PurchaseOrderCancellationMessage, which has a very simple structure. This message type contains the purchase order number. The structure of the PurchaseOrderCancellationMessage.

In addition, there are six message types for form based output.

The message type FormPurchaseOrderRequest is sent from the buyer to the seller. It is used to render a form starting a new ordering process.

The message type FormPurchaseOrderChangeRequest is sent from the buyer to the seller. It is used to render a form changing an order during the ordering process. Changing a purchase order includes creating new items, changing existing items, and canceling items.

The message type FormPurchaseOrderCancellationRequest is sent from the buyer to the seller. It is used to render a form canceling an order.

The message type InteractiveFormPurchaseOrderRequest is sent from the buyer to the seller. It is used to render a form starting a new ordering process and can be used by seller to confirm an order. The confirmation is sent back from seller to buyer.

The message type InteractiveFormPurchaseOrderChangeRequest is sent from the buyer to the seller. It is used to render a form changing an order during the ordering process and can be used by seller to confirm a changing an order. The confirmation is sent back from seller to buyer. Changing a purchase order includes creating new items, changing existing items, and canceling items.

These five message types are based on the message data type FormPurchaseOrderMessage.

A PurchaseOrderRequest is a buyer's request to the seller to deliver goods or provide services.

The structure of the message type PurchaseOrderRequest is specified in the message data type PurchaseOrderMessage.

Parts of the maximum PurchaseOrderMessage structure are used. The structure specifies which parts are used in which messages.

The PurchaseOrderRequest is the message that a buyer uses to start a new ordering process with a seller.

A PurchaseOrderChangeRequest is a change made to the buyer's request to the seller to deliver goods or provide services.

The structure of the message type PurchaseOrderChangeRequest is specified in the message data type PurchaseOrderMessage. Only parts of the maximum PurchaseOrderMessage structure are used. The structure description specifies which parts are used in which messages.

The PurchaseOrderChangeRequest is the message that a buyer uses to inform the seller of change requests during an ordering process. In a PurchaseOrderChangeRequest, the buyer can change header data, add new items, and change or cancel existing items.

A PurchaseOrderCancellationRequest is a cancellation of the buyer's request to the seller to deliver goods or provide services.

The structure of the message type PurchaseOrderCancellationRequest is specified in the message data type PurchaseOrderCancellationMessage.

The PurchaseOrderCancellationRequest is the message that a buyer uses to inform the seller of a purchase order cancellation request during an ordering process.

A PurchaseOrderConfirmation is a confirmation, partial confirmation, or a change sent from the seller to the buyer concerning the requested (or cancelled) delivery of goods or provision of services.

The structure of the message type PurchaseOrderConfirmation is specified in the message data type PurchaseOrderMessage. Only parts of the maximum PurchaseOrderMessage structure are used. The structure specifies which parts are used in which messages.

The PurchaseOrderConfirmation is the message that a seller uses to confirm a purchase order with the buyer or to inform the buyer of any purchase order change requests during an ordering process.

The seller can use the PurchaseOrderConfirmation message in three ways.

The seller can inform the buyer of the confirmation status of the purchase order. Possible statuses include "AP" (Accepted), "AJ" (Pending), and "RE" (Rejected). The confirmation status can be set at header or item level. Rejection at header level also signifies rejection of all items. Acceptance at header level signifies general acceptance of the purchase order; individual items can be accepted, open, or rejected. The same logic applies from items to subitems in item hierarchies. There are no restrictions for changes to the confirmation status (for example, a change from "AP" (Accepted) to "RE" (Rejected) is permitted). The confirmation status indicates whether a seller will fulfill a purchase order. Accordingly, the seller has to confirm cancellation of a purchase order with the status "RE" (Rejected). If the confirmation status "AP" (Accepted) is set for a purchase order but no additional information is provided about confirmed delivery dates/times, quantities, and so on, the purchase order is regarded as "confirmed as ordered." The seller can explicitly confirm planned delivery dates/times, quantities, and prices with the buyer and propose substitute products.

The seller can inform the buyer of any purchase order change requests.

Each PurchaseOrderConfirmation is regarded as the transfer of the current confirmation status at item level. This means, for example, that a PurchaseOrderConfirmation item that communicates the status "AP" (Accepted) confirms the relevant purchase order (PO) item "as ordered." This also applies if a change was previously requested for this item in a different PurchaseOrderConfirmation message, in other words, the change request is invalid.

FormPurchaseOrderRequest

Same as message type PurchaseOrderRequest except that FormPurchaseOrderRequest is used for form based output instead of XML based output.

FormPurchaseOrderChangeRequest

Same as message type PurchaseOrderChangeRequest except that FormPurchaseOrderChangeRequest is used for form based output instead of XML based output.

FormPurchaseOrderCancellationRequest

Same as message type PurchaseOrderCancellationRequest except that FormPurchaseOrderCancellationRequest is used for form based output instead of XML based output.

InteractiveFormPurchaseOrderRequest

Same as message type PurchaseOrderRequest except that InteractiveFormPurchaseOrderRequest is used for interactive form based output instead of XML based output.

InteractiveFormPurchaseOrderChangeRequest

Same as message type PurchaseOrderChangeRequest except that InteractiveFormPurchaseOrderChangeRequest is used for interactive form based output instead of XML based output.

Message Choreography

The interaction between the purchase order interfaces in an ordering process is described in detail below.

Process Flow

The buyer starts an ordering process by sending a PurchaseOrderRequest message.

Once the ordering process has been started, the buyer can send change requests at any time, using a purchaseOrder- ChangeRequest message. The buyer can cancel the order at any time by sending a PurchaseOrderCancellationRequest message.

After receiving the PurchaseOrderRequest message, the seller can use a PurchaseOrderConfirmation message to inform the buyer of the status of the purchase order or to send change requests at any time.

Once an ordering process has been started, there are no restrictions with regard to the order in which particular messages have to be sent. The buyer does not have to wait for confirmation from the seller before being allowed to send purchase order change requests, using a PurchaseOrderChangeRequest message.

In each PurchaseOrderRequest or PurchaseOrderChangeRequest message, the buyer can explicitly request a PurchaseOrderConfirmation message from the vendor by setting the FollowUpPurchaseOrderConfirmation/RequirementCode to "Expected." In this case, the seller should send a PurchaseOrderConfirmation:

In response to the receipt of a PurchaseOrderRequest, PurchaseOrderChangeRequest, or PurchaseOrderCancellationRequest message. To ensure that the response is sent as promptly as possible, no user interaction is to be required on the seller side. If a buyer's request cannot be automatically accepted or rejected, the confirmation status "AJ" (Pending) can be set. A PurchaseOrderConfirmation in response to a PurchaseOrderChangeRequest can reconfirm all the items that were transferred with the PurchaseOrderChangeRequest.

If the confirmation status of the entire purchase order or of a particular item is changed.

If quantities, prices, or deadlines can be explicitly confirmed, or if changes are made to confirmations that have already been sent.

A PurchaseOrderConfirmation may be sent by the seller, if:

The seller rejects individual items or the entire purchase order

The seller requests changes to be made to the purchase order

The buyer is to use a PurchaseOrderChangeRequest message to confirm the seller's change requests (by accepting the seller's requests as changes) or to reject them (by not accepting the seller's requests). The buyer is not permitted to use a PurchaseOrderChangeRequest message to automatically respond to mere changes to the confirmation status or to the explicit confirmation of delivery dates/times, quantities, and prices; this avoids endless message loops.

Serialization of Messages

In the ordering process, the messages are sent exactly once in order (EOIO) and serialized using message queues. Each ordering process should have its own message queue (as opposed to one queue for all purchase orders) so that one failed message does not block all the other purchase order messages in the entire system.

Error Handling

Forward processing may be used to resolve business errors (see the Communication Paradigms document). A recipient system can accept every formally correct incoming purchase order message. Business problems may be resolved by the buyer, using a PurchaseOrderChangeRequest or PurchaseOrderCancellationRequest message, and by the seller, using a PurchaseOrderConfirmation message. It is up to the recipient system to distinguish between technical and business errors. Borderline cases include incorrect ISO codes for currencies, languages, and so on.

To avoid endless message loops, a procurement system is not permitted to reject a PurchaseOrderConfirmation automatically, using a PurchaseOrderChangeRequest, or it can provide other suitable mechanisms to avoid endless loops (by restricting automatic rejections to a maximum of one after the other, for example).

In order to restart an ordering process that is corrupt as a result of a failed message, the procurement system can provide an option for transferring the current status of the purchase order, together with all the associated data, at any time using a PurchaseOrderChangeRequest message. In this message, the ItemCompleteTransmissionIndicator may be set to "true." The sales and distribution (SD) system is to provide the same functions for the PurchaseOrderConfirmation. In order to restart a process following a failed PurchaseOrderRequest message, the procurement system should be able to restart an ordering process at any time using a PurchaseOrderRequest message.

Message Interfaces

The purchase order messages are implemented by eight message interfaces (four buyer side and four seller side).

Buyer side:

PurchaseOrderRequest_Out

PurchaseOrderChangeRequest_Out

PurchaseOrderCancellationRequest_Out

PurchaseOrderConfirmation_In

Seller side:

PurchaseOrderRequest_In

PurchaseOrderChangeRequest_In

PurchaseOrderCancellationRequest_In

PurchaseOrderConfirmation_Out

Message Data Type PurchaseOrderMessage

The message data type PurchaseOrderMessage groups together:

Business information relevant for sending a business document in a message

The PurchaseOrder object in the business document

It contains the following packages:

MessageHeader package

PurchaseOrder package

The following rules may be observed to ensure that all the elements and entities in the message data type PurchaseOrderMessage are used correctly with regard to their changeability in an ordering process:

If no additional information is provided about the relevant element or the entity under "Use/Notes," both the buyer and the seller are allowed to change the element or entity as required. The receiving system may be able to respond appropriately to such changes at business level.

If it is specified under "Use/Notes" that the element or entity can be changed by either the buyer or the seller, the other party is not permitted to make any changes. Deletion of an element or entity is classed as a change, as is the initial transfer of an element or entity when a purchase order or new item within a purchase order is created. Exceptions to this are explicitly specified under "Use/Notes."

If it is specified under "Use/Notes" that the element or entity is generally not changed, changes are not permitted once the element or entity has been created. The element or entity can be assigned a new value when a purchase order or a new item within a purchase order is created; this value is generally not changed in all other messages.

A "change" is always an actual change and not a different way of representing the same situation (for example, a proprietary or standard ID can be used to reference the same product; both options are simply different ways of representing the same situation and can therefore be used alternatively without being classed as a change). Different IDs for the same object and different sequences for elements that occur more than once are always considered as representing the same situation. For more information, see "Use/Notes" for the relevant element or entity.

The message data type PurchaseOrderMessage makes the structure available for the message types PurchaseOrderRequest, PurchaseOrderChangeRequest, PurchaseOrderConfirmation and the relevant interfaces.

If certain elements or entities in the message data type PurchaseOrderMessage are not to be used in all the message types based on the message data type PurchaseOrderMessage, this is specified explicitly under "Notes."

A MessageHeader package groups business information relevant for sending a business document in a message. A MessageHeader groups the business information from the perspective of the sending application:

to identify the business document in a message; information about the sender; and about the recipient (in some cases).

The MessageHeader is broken down into SenderParty and RecipientParty. This is of the GDT type: BusinessDocumentMessageHeader. The MessageHeader includes ID, ReferenceID, CreationDateTime.

The MessageID is set by the sending application. With the ReferencedMessageID, reference is made in the current BusinessDocument to a previous BusinessDocument.

A SenderParty is the party that is responsible for sending a business document at business application level. The SenderParty is of the type GDT: BusinessDocumentMessageHeaderParty. The SenderParty can be specified by the sending application; in this way, it can name a contact person for any problems that arise with the message. This is especially useful when there is an additional infrastructure, such as a marketplace, between the sender and the recipient.

The SenderParty plays an auxiliary role during message transfer, and so can be ignored by the recipient application. It should be filled by the sender if the PurchaseOrder package cannot be used to transfer the participating parties.

A RecipientParty is the party that is responsible for receiving a business document at business application level. The RecipientParty is of the type GDT: BusinessDocumentMessageHeaderParty.

The RecipientParty can be specified by the sending application; in this way, it can name a recipient contact person for any problems that arise with the message. This is especially useful when there is an additional infrastructure, such as a marketplace, between the sender and the recipient.

The RecipientParty plays an auxiliary role during message transfer, and so can be ignored by the recipient application. It should be filled by the sender if the PurchaseOrder package cannot be used to transfer the participating parties.

PurchaseOrder Package

A PurchaseOrder package groups together the PurchaseOrder and its packages.

It contains Party package, Location package, DeliveryInformation package, PaymentInformation package, Attachment package, Description package, FollowUpBusinessTransactionDocument package, and Item package.

A PurchaseOrder is a buyer's request (or a change to or confirmation of such a request) to a seller to provide or deliver certain quantities of products at one or several dates. The PurchaseOrder is divided into PurchaseOrderItems that each specify an ordered product or additional information relevant for such a product, such as information about bills of material (BOMs) or discount or value limits (see PurchaseOrderItem package). In addition to the buying party and the seller, additional parties can be involved in the PurchaseOrder (see Party package). Locations can be specified for the purchase order delivery (see Location package).

Delivery and payment terms are also agreed upon (see DeliveryInformation package and PaymentInformation package).

Notes or references to attachments can be specified for the PurchaseOrder (see Description package and Attachment package).

The types of follow-up documents that are expected with regard to the PurchaseOrder package can also be specified (see FollowUpBusinessTransactionDocument package).

The PurchaseOrder is of type GDT: PurchaseOrder. The PurchaseOrder includes ID, the unique identifier specified by the buyer for the purchase order;

ReconciliationPeriodCounterValue, a type of GDT: BuyerPostingDateTime—the BuyerPostingDateTime is the creation date/time of the purchase order by the buyer. The BuyerPostingDateTime is of type GDT;

BuyerLastChangeDateTime—the BuyerLastChangeDateTime is the date/time of the last change made to the purchase order by the buyer. The BuyerLastChangeDateTime is of type GDT; SellerPostingDateTime—the SellerPostingDateTime is the creation date/time of the sales order by the seller. The SellerPostingDateTime is of type GDT; SellerLastChangeDateTime—the SellerLastChangeDateTime is the date/time of the last change made to the sales order by the seller. The SellerLastChangeDateTime is of type GDT; AcceptanceStatusCode—the AcceptanceStatusCode is the coded representation for the status of the seller's acceptance of a purchase order. The AcceptanceStatusCode is of type GDT;

AcceptanceStatusCode a short description or the title of the purchase order. It is generally used to provide the user with a simple method for searching for a particular purchase order. The Note is of type GDT; ItemListCompleteTransmissionIndicator—the ItemListCompleteTransmissionIndicator specifies whether all purchase order items are always to be transmitted (items that are not transmitted are implicitly classed as canceled) or whether new, changed purchase order items that have been canceled since the last transmission are to be transmitted. The ItemListCompleteTransmissionIndicator is of type GDT: CompleteTransmissionIndicator.

Within any given purchase order, all monetary amounts and prices may be in the same currency.

The ID is generally not changed once a purchase order has been created.

The SellerID is generally not changed once a purchase order has been created.

The BuyerPostingDateTime is generally not changed once a purchase order has been created.

The BuyerLastChangeDateTime can be changed by the buyer.

The SellerPostingDateTime is generally not changed once a purchase order has been created.

The Note can be changed by the buyer.

The SellerID is generally not used.

The SellerPostingDateTime is generally not used.

The SellerLastChangeDateTime is generally not used.

The AcceptanceStatusCode is generally not used.

The ItemListCompleteTransmissionIndicator may be set to "true."

The ActionCode for all items can be set to "01" (Create).

The header, and all the items that are to be ordered, can be transmitted together with all the associated data.

Items that were deleted by the buyer before the purchase order was first sent to the seller is generally not transmitted.

Integrity (Regarding the Message Type PurchaseOrderChangeRequest)

The SellerID is generally not used.

The SellerPostingDateTime is generally not used.

The SellerLastChangeDateTime is generally not used.

The AcceptanceStatusCode is generally not used.

If an ItemListCompleteTransmissionIndicator is set to "true," the ActionCode for all items may be set to "01" (Create). The header and all items may be transmitted together with all the associated data. Items that are not transmitted are implicitly classified as canceled.

If an ItemListCompleteTransmissionIndicator is set to "false," the ActionCode for the transmitted items may be set to "01" (Create), "02" (Change), or "03" (Delete). The ActionCode "01" (Create) may be set if the item is being transmitted for the first time, "02" (Change) if the item has been changed since the last transmission, and "03" (Delete) if the item has been canceled since the last transmission. The header may be transmitted together with all the associated data. New or changed items may be transmitted together with all the associated data. Canceled items may be transmitted together with the ID and ActionCode and should be transmitted without any additional data. Items that are not transmitted are classified as unchanged and are not implicitly classified as canceled.

Integrity (Regarding the Message Type PurchaseOrderConfirmation) The AcceptanceStatusCode at header and item level may be set to "AP" (Accepted), "AJ" (Pending), or "RE" (Rejected).

If an ItemListCompleteTransmissionIndicator is set to "true," the ActionCode for all items may be set to "01" (Create). The header and all items may be transmitted together with all the associated data. Items that are not transmitted are implicitly classified as canceled.

If an ItemListCompleteTransmissionIndicator is set to "false," the ActionCode for the transmitted items may be set to "01" (Create) or "02" (Change). The ActionCode "01" (Create) may be set if the item is being transmitted for the first time and "02" (Change) if the item has been changed by the seller since the last transmission. The seller cannot cancel items by setting the ActionCode to "03" (Delete), but can reject items by setting the AcceptanceStatusCode "RE" (Rejected). If the header contains changes, it may be transmitted together with all the associated data. Otherwise, the ID and the AcceptanceStatusCode may be transmitted, but not the header data. If an item contains changes, it may be transmitted together with all the associated data, including the ID, ActionCode, AcceptanceStatusCode, ConfirmedNetUnitPrice, and ConfirmedScheduleLines. If the confirmed values in ConfirmedNetUnitPrice or ConfirmedScheduleLine have changed, an item may be transmitted, together with the ID, ActionCode, AcceptanceStatusCode, ConfirmedNetUnitPrice, and ConfirmedScheduleLines; the item data should not be transmitted. If the confirmation status has changed, an item may be transmitted, together with the ID, ActionCode, and AcceptanceStatusCode. ConfirmedNetUnitPrice and ConfirmedScheduleLines should be transmitted, but not the item data. An unchanged item should not be transmitted. Items that are not transmitted are classified as unchanged and are not implicitly classified as canceled.

If items are not transmitted, the confirmation status "AP" (Accepted) or "RE" (Rejected) is copied from the header to all items, that is, to accept or reject an entire purchase order, the purchase order number and the AcceptanceStatusCode have to be transmitted at header level.

The PurchaseOrder object in the message data type PurchaseOrderMessage provides a structure that is not used for purchase order messages but also for changing and confirming a purchase order. The semantics of the PurchaseOrder object is therefore more generic in order to cover these aspects.

To summarize, the structure of the BusinessDocumentObject PurchaseOrder can be divided into the header, item, and schedule line.

A Party package groups together all the business parties involved in the PurchaseOrder. It includes: BuyerParty, SellerParty, ProductRecipientParty, Vendor Party, ServicePerformerParty, ManufacturerParty, BillToParty, PayerParty, CarrierParty Either the ID or the ID and address can be transferred for each party. If the ID is transferred, the ID address defined in the master data is used. If the ID and address are transferred, the ID identifies the party and the address is deemed to be a document address that is different to the master data address. If possible, the ID and address should be sent to avoid misunderstandings. The receiving application should implement a suitable optimization strategy to prevent many identical document addresses from being created.

A default logic is used for all business parties: from the header to the items and within item hierarchies. Business parties specified in the header are used for all the items for which a corresponding party is not explicitly transferred and that are directly assigned to the header. In accordance with the same logic, business parties transferred at item level are used for all subitems assigned to the relevant item in an item hierarchy. The default logic is used for the party as a whole, including the contact party. Parts of a party specified at header level or for a hierarchy item cannot be specified in more detail at item level. The default logic is a simplified version of the transmitted message. Logically, parties at header level and hierarchy items behave as if they have been explicitly transferred for all the subitems of the message. This also means that if changed items are transmitted rather than all items, the parties are used for the transmitted items. Changes made to parties always apply to all items relevant for the party in question.

A BuyerParty is a party that buys goods or services. The BuyerParty is of type GDT: BusinessTransactionParty.

The same BuyerParty may be used for all the items in a purchase order.

The BuyerParty is generally not changed once a purchase order has been created.

Changes can be made to the BuyerParty/Contact and a different BuyerParty/Contact can exist for each item. Changes can be made to the address of the BuyerParty, but different addresses are not permitted for each item. If a ProductRecipientParty is not explicitly specified in the ordering process, the BuyerParty is also used as the ProductRecipientParty. If a ProductRecipientParty and ShipToLocation are not explicitly specified in the ordering process, the BuyerParty address is used as the ship-to address.

If a BillToParty is not explicitly specified in the ordering process, the BuyerParty is also used as the BillToParty. If a BillToParty and PayerParty are not explicitly specified in the ordering process, the BuyerParty is also used as the PayerParty.

A SellerParty is a party that sells goods or services. The SellerParty is of type GDT: BusinessTransactionDocumentParty. The same SellerParty may be used for all the items in a purchase order.

The SellerParty is generally not changed once a purchase order has been created.

Changes can be made to the SellerParty/Contact and a different SellerParty/Contact is permitted for each item.

Changes can be made to the address of the SellerParty, but different addresses are not permitted for each item. If a Vendor Party is not explicitly specified in the ordering process, the SellerParty is also used as the Vendor Party. If a Vendor Party and ShipFromLocation are not explicitly specified in the ordering process, the address of the SellerParty is also used as the ship-from address for the material items. A Vendor Party is a party that delivers goods or provides services. The Vendor Party is of type GDT: BusinessTransactionDocumentParty.

A ProductRecipientParty is a party to which goods are delivered or for whom services are provided.

The ProductRecipientParty is of type GDT: BusinessTransactionDocumentParty.

If a ShipToLocation is not explicitly specified in the ordering process, the ProductRecipientParty address is used as the ship-to address. The ProductRecipientParty is not synonymous with the ShipToLocation and may be used when the ProductRecipientParty (company or person) is actually different from the BuyerParty.

If a ShipFromLocation is not explicitly specified in the ordering process, the address of the Vendor Party is used as the ship-from address for the material items. The Vendor Party is not the company or person that is solely responsible for transporting the goods. The CarrierParty is designated for this.

The Vendor Party is not synonymous with the ShipFromLocation and should be used when the Vendor Party (company or person) is actually different than the SellerParty. ServicePerformerParty The ServicePerformerParty is of type GDT: BusinessTransactionDocumentParty.

A ServicePerformerParty can be used for service items.

With regard to the ServicePerformerParty, the default logic (from header to item to subitems) is used for service items; for other items, the ServicePerformerParty is ignored.

A ManufacturerParty is a party that manufactures goods. The ManufacturerParty is of type GDT: BusinessTransactionDocumentParty. The ManufacturerParty can be used for Material items.

With regard to the ManufacturerParty, the default logic (from header to item to subitems) is used for material items; for other items, the ManufacturerParty is ignored.

The ManufacturerParty can be used to uniquely define the context of a ManufacturerProductID.

A BillToParty is a party to which the invoice for goods or services is sent. The BillToParty is of type GDT: BusinessTransactionDocumentParty. If a PayerParty is not explicitly specified in the ordering process, the BillToParty is also used as the PayerParty. Conversely, the BillToParty is not explicitly derived from the PayerParty. A PayerParty is a party that pays for goods or services. The PayerParty is of the GDT type: BusinessTransactionDocumentParty. A CarrierParty is a party that transports goods. The CarrierParty is of type GDT: BusinessTransactionDocumentParty. The CarrierParty can be used for material items. With regard to the CarrierParty, the default logic (from header to item to subitems) is used for material items.

PurchaseOrderLocation Package

A Location package groups together all the locations relevant for the PurchaseOrder. It includes ShipToLocation, ShipFromLocation.

A similar default logic to that used for parties is also used for all locations.

Either the ID or the address, or both can be transferred to each location. If the ID is transferred, the ID address defined in the master data is used. If the address is transferred, it is this address that is used (if necessary, a location may be assigned at the address recipient). If the ID and address are transferred, the ID identifies the location and the address is deemed to be a document address that is different to the master data address. If possible, the ID and address should be sent to avoid misunderstandings. The receiving application should implement a suitable optimization strategy to prevent many identical document addresses from being created.

A ShipToLocation is the location to which goods are to be delivered or where services are to be provided. The ShipToLocation is of type GDT: BusinessTransactionDocumentShipToLocation. A ShipFromLocation is the location from where goods are to be shipped. The ShipFromLocation is of type GDT: BusinessTransactionDocumentShipFromLocation.

The default logic from header to item to subitems is used for the ShipFromLocation for material items; for all other items, the ShipFromLocation is ignored.

PurchaseOrderDeliveryInformation Package

A DeliveryInformation package groups together all the information for a delivery used for a purchase order.

A similar default logic to that used for Parties is also used for DeliveryTerms.

DeliveryTerms are the conditions and agreements that apply when delivering and transporting the ordered goods and providing the necessary services and activities for this.

The DeliveryTerms are type GDT: DeliveryTerms. The default logic takes Incoterms and Transport into account for material items; they are ignored for all other items.

PurchaseOrderPaymentInformation Package

A PaymentInformation package groups together all the payment information about the purchase order. It includes CashDiscountTerms and PaymentForm. CashDiscountTerms are the terms of payment in an ordering process. The CashDiscountTerms are type GDT: CashDiscountTerms. A PaymentForm is the payment form together with the data required.

The PaymentForm includes PaymentFormCode, the PaymentFormCode is the coded representation of the payment form. The PaymentFormCode is of type GDT: PaymentFormCode. A PaymentCard is a credit card or a customer card. The PaymentCard is of type GDT: PaymentCard. The PaymentCard can be used for the payment form PaymentCard (PaymentFormCode “02”).

PurchaseOrderPriceInformation-Package

A PaymentInformation package groups together all the payment information about the purchase order.

The Price contains the following element:

NetAmount: The NetAmount is the net amount of the ordered goods before tax or deducted cash discount. The NetAmount is of type GDT: Amount.

The NetAmount on the Header level can equal the sum of the NetAmount of all items taking into account the rules for NetAmount in item hierarchies.

PurchaseOrderAttachment Package

An Attachment package groups together all the attachment information regarding the purchase order. It includes Attachment and AttachmentWebAddress An attachment is any document that refers to the purchase order.

The Attachment is of type GDT: Attachment. An AttachmentWebAddress is the address of any document that refers to the purchase order. AttachmentWebAddress is of type GDT: AttachmentWebAddress.

PurchaseOrderDescription Package

A Description package groups together all the texts regarding the purchase order. It includes Description and ConfirmationDescription. A Description is a natural-language text regarding the purchase order, which is visible to business parties. The Description is of type GDT: Description. The Description can be used for all types of textual information about the transferred purchase order and not just the current message. An example of this would be information that the Purchasing employee responsible is on vacation as of a specific date, and indicating the name and telephone number of a substitute as of this date.

A ConfirmationDescription is a natural-language text regarding the order confirmation, which is visible to business parties. The ConfirmationDescription is of type GDT: Description. The ConfirmationDescription can be used for all types of textual information about the order confirmation. An example of this would be the seller's justification for rejecting a particular purchase order.

A FollowUpMessage package groups together all the information about subsequent messages that the buyer expects to receive from the seller with regard to the purchase order. It includes FollowUpPurchaseOrderConfirmation, FollowUpDespatchedDeliveryNotification, FollowUpServiceAcknowledgementRequest, and FollowUpInvoiceRequest. A similar default logic to that used for parties is also used for all locations.

A FollowUpPurchaseOrderConfirmation is information about whether and in what form the buyer expects to receive confirmation of the purchase order from the seller. The FollowUpPurchaseOrderConfirmation contains the following element: RequirementCode—the RequirementCode is a coded representation of information about whether the buyer expects to receive confirmation of the purchase order from the seller. The RequirementCode is of type GDT: FollowUpMessageRequirementCode.

The values "02" (Expected) and "04" (Unexpected) are permitted for the RequirementCode.

The RequirementCode can be changed by the buyer.

For more information about when the buyer expects a PurchaseOrderConfirmation from the vendor.

If the buyer changes the RequirementCode from "Unexpected" to "Expected" during an ordering process, the seller should send the current confirmation status, even for purchase order items that have already been delivered or invoiced. If the buyer changes the RequirementCode from "Expected" to "Unexpected," the seller should not send any more confirmations, except if the purchase order is canceled or if the seller changes it.

The seller can transfer the order confirmation either electronically using a PurchaseOrderConfirmation message or by traditional methods of communication, such as e-mail or fax.

A FollowUpDespatchedDeliveryNotification is information about whether the buyer wants to be informed by the seller of any outbound deliveries.

The FollowUpDespatchedDeliveryNotification contains the following element:

RequirementCode—the RequirementCode is a coded representation of information about whether the buyer expects the seller to send notification of any outbound deliveries of the ordered goods. The RequirementCode is of type GDT: FollowUpMessageRequirementCode.

The values "02" (Expected) and "04" (Unexpected) are permitted for the RequirementCode.

The RequirementCode can be changed by the buyer.

If the buyer changes the RequirementCode from "Unexpected" to "Expected" during an ordering process, the seller should inform the buyer of all the new outbound deliveries for the purchase order once the change has been received. If the buyer changes the RequirementCode from "Expected" to "Unexpected," the seller should not send any further information about outbound deliveries.

The seller can transfer the confirmation of the outbound delivery either electronically using a DespatchedDeliveryNotification message or by traditional methods of communication, such as e-mail or fax.

Confirmation of the outbound delivery can be sent for material items, that is, the RequirementCode "Expected" can be ignored for service items.

A FollowUpServiceAcknowledgementRequest is information about whether the buyer wants to be informed by the seller of any services provided. The FollowUpServiceAcknowledgementRequest contains the following element:

RequirementCode—the RequirementCode is a coded representation of information about whether the buyer wants to be informed by the seller of any services provided. The RequirementCode is of type GDT: FollowUpMessageRequirementCode.

The values "02" (Expected) and "04" (Unexpected) are permitted for the RequirementCode.

The RequirementCode can be changed by the buyer.

If the buyer changes the RequirementCode from "Unexpected" to "Expected" during an ordering process, the seller should inform the buyer of all the new services provided once the change has been received. If the buyer changes the RequirementCode from "Expected" to "Unexpected," the seller should not send any further information about services provided.

The seller can transfer the confirmation of the services either electronically using a ServiceAcknowledgementRequest message or by traditional methods of communication, such as e-mail or fax. A confirmation of a service is not limited to service items. It can also contain planned or unplanned material items for materials that were required when the service was requested.

A FollowUpInvoiceRequest is information about whether the buyer expects to receive an invoice from the seller. The FollowUpInvoiceRequest includes RequirementCode, a coded representation of information about whether the buyer expects to receive an invoice from the seller. The RequirementCode is of type GDT; EvaluatedReceiptSettlementIndicator—the EvaluatedReceiptSettlementIndicator indicates whether or not the purchase order settlement is to be processed automatically by the goods receipt, without an invoice. The EvaluatedReceiptSettlementIndicator is of type GDT: EvaluatedReceiptSettlementIndicator.

The values "01" (Required) and "05" (Forbidden) are permitted for the RequirementCode.

If the EvaluatedReceiptSettlementIndicator is set to "True," the RequirementCode may be set to "Forbidden."

The RequirementCode and the EvaluatedReceiptSettlementIndicator can be changed by the buyer.

If the buyer changes the RequirementCode from "Forbidden" to "Required" during an ordering process, the buyer and seller can agree upon what exactly has to be invoiced. If the buyer changes the RequirementCode from "Required" to "Forbidden," the seller can not send any further invoices once the change has been received.

The seller can transfer the invoice either electronically using an InvoiceRequest message or by traditional methods of communication, such as mail or fax.

Whether or not the buyer expects to receive an invoice from the seller does not depend on the type of payment method.

There are two typical cases in which the buyer does not expect to receive an invoice from the seller:

Purchase orders for goods that are free-of-charge, such as test samples

Purchase orders that are to be settled using the evaluated receipt settlement (ERS) procedure (see EvaluatedReceiptSettlementIndicator)

A PurchaseOrderItem package groups together the PurchaseOrderItem with its packages. It contains ProductInformation package, PricingInformation package, Party package, Location package, DeliveryInformation package, BusinessTransactionDocumentReference package, Attachment package, Description package, ScheduleLine package.

A PurchaseOrderItem specifies a product ordered by the PurchaseOrder or additional information about such a product. This information includes specifications on discounts in kind, substitute products, and value limits.

The PurchaseOrderItem contains detailed information about a particular product (see ProductInformation package) and its price (see PriceInformation package). The quantity of the product and (delivery) dates/times are specified in the schedule line (see ScheduleLine package). For the PurchaseOrderItem (compared to the information of the PurchaseOrder), deviating parties, locations, and delivery terms can be defined (see Party package, Location package, and DeliveryInformation package).

The PurchaseOrderItem can contain references to other business documents that are relevant for the item (see BusinessTransactionDocumentReference package).

Notes or references to attachments can also be specified for the item (see Description package and Attachment package).

PurchaseOrderItem can be subordinate to another PurchaseOrderInformationItem within a hierarchy to represent a business relationship between the two items. This could be information about a discount in kind or substitute product for an ordered product, for example.

This relationship can also be used to group together PurchaseOrder items, that is, a PurchaseOrderItem can group together other PurchaseOrderItems.

The PurchaseOrderItem is of type GDT: PurchaseOrderItem.

The PurchaseOrderItem include ID, the identifier assigned by the buyer to a purchase order item. The identifier is unique within a particular purchase order. The ID is of type GDT; SellerID, the identifier assigned by the seller to a purchase order item. The identifier is unique within a particular purchase order. The SellerID is of type GDT: BusinessTransactionDocumentItemID; ActionCode, the coded representation of the actions used to create, change, and delete items in an ordering process at the message recipient; AcceptanceStatusCode—the AcceptanceStatusCode is the coded representation for the status of the seller's acceptance of a purchase order; UnplannedItemPermissionCode—the UnplannedItemPermissionCode specifies whether unplanned service entry, goods receipt, and invoice items are permitted for a purchase order item later on in the process. The UnplannedItemPermissionCode is of type GDT; UnconfirmedQuantityCanceledIndicator—The UnconfirmedQuantityCanceledIndicator shows, that the seller does not plan to confirm later previously unconfirmed quantities; GoodsReceiptBasedInvoiceVerificationIndicator, specifies whether item invoices on the purchase order should be checked against goods receipt. This information can be used by the biller to decide when to send the invoice (either with goods issue or when goods receipt can already be known to the invoice recipient).

The PurchaseOrderItem contains HierarchyRelationship. The ID is generally not changed once an item has been created. The SellerID is generally not changed once an item has been created. The UnplannedItemPermissionCode is generally not changed once an item has been created. The SellerID is generally not used, The AcceptanceStatusCode is generally not used. The UnconfirmedQuantityCanceledIndicator is generally not used. The AcceptanceStatusCode is generally not used. The UnconfirmedQuantityCanceledIndicator is generally not used. From a semantic point of view, items can contain other items. This enables item hierarchies to be mapped. From a technical point of view, the item type is not defined recursively, since this cannot be handled by some commonly-used XML tools. The hierarchies are mapped using the entity HierarchyRelationship.

There are various types of items, and they are governed by different integrity conditions (constraints). An item can have several integrity types. In this case, the item can satisfy all the constraints of all its constraint types. Which constraint types can be combined with one another and how, is specified in the description of the constraint types. The various integrity types are as follows:

Standard items are all the items to which no lower-level items have been assigned in the hierarchy. An item that is not referenced by the ParentItemID of another item is a standard item.

Hierarchy items are items to which at least one other lower-level item has been assigned in the hierarchy. Any item that is referenced by at least one other item, using the ParentItemID is a hierarchy item. All items are either standard or hierarchy items.

Subitems are items that have been assigned below a hierarchy item and not directly to the purchase order header. Subitems can be both standard items and hierarchy items. Any item that references another item using the ParentItemID is a subitem. Material items are items whose product is a material. Any item that has ProductTypeCode "1" (Material) is a material item. Service items are items whose product is a service. Any item whose ProductTypeCode is "2" (Service) is a service item. Unspecified product items are items for which no information is provided indicating whether they refer to a material or a service. Any item whose ProductTypeCode is not specified is an unspecified product item. All items are material, service, or unspecified product items. An unspecified product item can satisfy all the integrity conditions of a material, service, or limit item.

Grouping hierarchy items are hierarchy items that logically group together other items. Multilevel grouping hierarchies are permitted, i.e., a grouping hierarchy item can contain subitems that are also grouping hierarchy items. Any hierarchy item whose subitems all have HierarchyRelationshipTypeCode "002" (group) is a grouping hierarchy item; subitems with a different HierarchyRelationshipTypeCode are not permitted. Grouping hierarchy items are not permitted as subitems of other types of hierarchy items.

Substitute product hierarchy items are hierarchy items for which there is at least one subitem with a substitute product. Multi-level substitute product hierarchies are not permitted, i.e., a substitute product can itself not be substituted. A Substitute product hierarchy item is each hierarchy item, whose subitems all have the HierarchyRelationshipTypeCode "006" (Substitute Product) Subitems with any other HierarchyRelationshipTypeCode are not permitted. Substitute product hierarchy items can be used as subitems in grouping hierarchies. Substitute product subitems can be transferred in the PurchaseOrderConfirmation message. The buyer can reject proposed substitute products by canceling the entire associated substitute product hierarchy item.

BOM hierarchy items are hierarchy items that group together other items in a BOM. Multilevel BOM hierarchies are permitted. Any hierarchy item with at least one subitem with HierarchyRelationshipTypeCode “001” (bill of material) is a BOM hierarchy item; additional subitems are permitted with the HierarchyRelationshipTypeCode “003” (discount in kind).

Discount in kind hierarchy items are hierarchy items for which a goods discount is granted in the form of an inclusive or exclusive bonus quantity. Multilevel discount in kind hierarchies are not permitted, i.e., no discount in kind can be granted for discount in kind. The goods discount is described in the form of one or more subitems in the discount in kind hierarchy item. Any Hierarchy item with at least one subitem with HierarchyRelationshipTypeCode “003” (discount in kind) is a discount in kind hierarchy item; additional subitems are permitted with the HierarchyRelationshipTypeCode “001” (bill of material). All hierarchy items are grouping, BOM, or discount in kind hierarchy items. A hierarchy item can be both a BOM and a discount-in-kind hierarchy item, if a discount in kind has been granted for a BOM.

Limit items are both standard and unspecified product items for which the exact requirements are unknown at the time of ordering. Items with an UnplannedItemPermissionCode set to “02” (WithContractReferenceOnly) or “03” (Allowed) are limit items. Limit items are not permitted to be subitems of BOM or discount in kind hierarchy items. No substitute product subitems are permitted for limit items.

Dependencies between elements or entities of this item category are described under “Notes” for the relevant element or entity.

If a BOM or discount in kind hierarchy item is canceled in an ordering process, all the subitems are automatically classed as canceled. If a grouping hierarchy item is canceled, the grouping is classified as canceled; the subitems remain valid and may be explicitly canceled individually, if required.

A HierarchyRelationship is the relationship between a subitem and a higher-level parent item in an item hierarchy. The HierarchyRelationship contains the following elements:

ParentItemID—the ParentItemID is the reference to the parent item with the item number assigned by the buyer. The ParentItemID is of type GDT: BusinessTransactionDocumentItemID.

ParentItemSellerID—the ParentItemSellerID is the reference to the parent item with the item number assigned by the seller. The ParentItemSellerID is of type GDT: BusinessTransactionDocumentItemID.

TypeCode—the TypeCode represents the hierarchical relationship between the subitem and its higher-level parent item. The TypeCode is of type GDT: BusinessTransactionDocumentItemHierarchyRelationshipTypeCode.

The ParentItemID cannot be changed once the item has been created.

The ParentItemSellerID is generally not changed once an item has been created.

Either the ParentItemID or the ParentItemSellerID may be specified.

The TypeCode is generally not changed once an item has been created.

PurchaseOrderItemProductInformation Package

A ProductInformation package groups together all the information for identifying, describing, and classifying a product in an ordering process. It includes Product and ProductCategory. The product package is generally not used in grouping hierarchy items.

A Product contains the details about a product as generally understood from a commercial point of view in business documents. These are the details for identifying a product, product type, and the description of the product.

Structure

The Product is of type GDT: BusinessTransactionDocumentProduct. For limit items, the description (note) can be used in the product; the product number and ProductTypeCode is generally not used. The ordered product can be changed by the buyer. The seller can add a product number to a product description without product number or specify a product for a new item that he/she has proposed. The ProductTypeCode is generally not changed once an item has been created. With the exception of grouping hierarchy items, at least either the product number or product description (note) may be provided when a new item is created. If both the product number and description are provided, the description is merely additional information in the message and can be ignored by the recipient. In substitution product subitems, the ProductTypeCode can not differ from the parent item ProductTypeCode.

A product is either a tangible or intangible good, and is a part of the business activities of a company. It can be traded and contributes directly or indirectly to value added. In substitute product subitems, the product is the substitute product proposed by the vendor for the product ordered in the associated substitute product hierarchy item.

A ProductCategory contains the details about a product category as generally understood from a commercial point of view in business transaction documents. It includes details for identifying the product category using an internalID, a standard ID, and IDs assigned by involved parties.

The ProductCategory is of type GDT: BusinessTransactionDocumentProductCategory. A product category is a division of products according to objective criteria. The product category is derived directly from the product if a product number is provided for the product. It can differ for the buyer and seller if they have classified the same product differently. This is permitted and should be tolerated by the systems involved.

PurchaseOrderItemPriceInformation Package

A PriceInformation package groups together all the price information in a purchase order item. It includes Price and ConfirmedPrice. The PriceInformation package is generally not used in grouping hierarchy, limit, and discount in kind items. The PriceInformation package for a purchase order item contains prices and amounts; it does not contain any information about how the prices are calculated (pricing scales, and so on).

A Price is the purchase order price specified by the buyer. Price includes NetAmount, the net price specified by the buyer for the quantity (without tax or cash discount) of the product. The NetAmount is of type GDT: Amount; TheNetUnitPrice is the net price specified by the buyer for the base quantity (without tax or cash discount) of the product. The NetUnitPrice is of type GDT: Price. The Price can generally be changed by the buyer.

In BOM hierarchies, the following rules apply for the Price:

If the price is specified for the item at the top of the BOM hierarchy and not the subitems, this price applies.

If the price is specified for standard items (end nodes in the hierarchy tree) in the BOM hierarchy, these prices apply. The price of the entire BOM is the total of the individual prices.

If a price is specified at different levels in the BOM hierarchy, the price that appears above all the others in the tree always applies. Differences between the total of the individual prices and the price at the next highest hierarchy level are permissible. These may be caused by discounts for the entire BOM.

In substitute product subitems, the Price can be used to transfer substitute product prices. The same rules apply here as for the Price in BOM hierarchies.

A ConfirmedPrice is the purchase order price confirmed by the seller.

The Price includes the NetUnitPrice is the net price (without tax or cash discount) confirmed by the seller for the base quantity of the product. The NetUnitPrice is of type GDT: Price. The ConfirmedPrice is generally not used. In BOM and substitute product hierarchies, the same rules apply for the ConfirmedPrice as for the Price.

The PurchaseOrderItemParty Package is similar to the Party package at header level.

The PurchaseOrderItemLocation Package is similar to the Party package at header level.

The PurchaseOrderItemDeliveryInformation Package is similar to the Party package at header level.

PurchaseOrderItemBusinessTransactionDocumentReference Package

A BusinessTransactionDocumentReference package groups together all the references to business documents that are relevant for the PurchaseOrderItem and have a business relationship with the item.

It includes QuoteReference, PurchaseContractReference, SalesContractReference,

OriginPurchaseOrderReference, BuyerProductCatalogueReference, SellerProductCatalogueReference.

None of the entities in the BusinessTransactionDocumentReference package can be used in grouping hierarchy items.

If possible, individual items in business documents should be referenced in the purchase order messages from item level (quotation item 10 in quotation 4711 is directly referenced from purchase order item 1, for example). If an item assignment is not recognized, an entire document can be referenced (quotation 4711 is referenced in its entirety from purchase order item 1, for example). In this case, the recipient cannot demand that the item numbers in both documents be the same (that item 1 in purchase order 4712 be the same as item 1 in quotation 4711, for example). It is the responsibility of the recipient to try this assignment using other criteria that are not necessarily unique, such as the product number.

References are used for establishing relationships between different documents. If a reference has been provided, all the data relevant to the purchase order can still be transferred from the document referenced in the purchase order message (the product number in a purchase order item may be transferred even if the product number can be derived directly from a bid reference). The data in the purchase order message can differ in any number of ways from the referenced documents. The recipient may be able to respond appropriately to such deviations.

A QuoteReference is a reference to a quotation or an item within a quotation.

The QuoteReference is of type GDT: BusinessTransactionDocumentReference. A QuoteReference can reference one item, that is, one ItemID is permissible.

A PurchaseContractReference is a reference to a purchase contract or item in a purchase contract.

The PurchaseContractReference is of type GDT: BusinessTransactionDocumentReference. In limit items, multiple contract references are possible; a maximum of one contract reference is permissible in all other item types. A PurchaseContractReference can reference one item, that is, one ItemID is permissible.

Unless otherwise agreed, the seller is responsible for determining the correct PurchaseContractReference for a specified SellerContractReference. A SalesContractReference is a reference to a sales contract or an item within a sales contract. The SalesContractReference is of type GDT: BusinessTransactionDocumentReference. A SalesContractReference can reference one item, that is, one ItemID is permissible.

In limit items, multiple contract references are possible; a maximum of one contract reference is permissible in all other item types.

An OriginPurchaseOrderReference is a reference to the origin purchase order or to an item within the origin purchase order in a third-party deal.

The OriginPurchaseOrderReference is of type GDT: BusinessTransactionDocumentReference.

An OriginPurchaseOrderReference can reference one item, that is, one ItemID is permissible.

The OriginPurchaseOrderReference may be used for third-party purchase orders. The OriginPurchaseOrderReference is used in all the purchase orders in a third-party deal, so that the seller can reference the original purchase order of the ProductRecipientParty with the OriginPurchaseOrderReference when the delivery is made.

A BuyerProductCatalogueReference is a reference to the buyer's product catalog or an item within the buyer's product catalog. The BuyerProductCatalogueReference is of type GDT: CatalogueReference. A BuyerProductCatalogueReference can reference one item, that is, one ItemID is permissible.

The BuyerProductCatalogueReference should always be filled if a purchase order item refers to a catalog whose number and item numbers were assigned by the buyer. In the ordering process, the BuyerProductCatalogueReference can be used as a substitute product number if the product is defined in a catalog, rather than having its own master record.

A SellerProductCatalogueReference is a reference to the seller's product catalog or an item within the seller's product catalog. The SellerProductCatalogueReference is of type GDT: CatalogueReference A SellerProductCatalogueReference can reference one item, that is, one ItemID is permissible.

The SellerProductCatalogueReference should always be filled if a purchase order item refers to a catalog whose number and item numbers were assigned by the seller.

In the ordering process, the SellerProductCatalogueReference can be used as a substitute product number if the product is defined in a catalog, rather than having its own master record.

PurchaseOrderItemAttachment Package

Similar to the Party package at header level.

PurchaseOrderItemDescription Package

A Description package groups together all the explanatory texts regarding a purchase order item.

It includes Description and ConfirmationDescription. A Description is a natural-language text regarding a purchase order item, which is visible to business parties. The Description is of type GDT: Description The Description can be used for all types of textual information about the purchase order item. An example is an accurate description of a fault in need of repair.

A ConfirmationDescription is a natural-language text regarding a purchase order item, which is visible to business parties. The ConfirmationDescription is of type GDT: Description. The ConfirmationDescription is generally not used. The ConfirmationDescription can be used for all types of textual information about an item in an order confirmation. An example of this would be the seller's justification for rejecting a particular purchase order item.

PurchaseOrderItemFollowUpMessage-Package

A ScheduleLine package groups together all the quantity and date information about a PurchaseOrderItem.

It includes ScheduleLine and ConfirmedScheduleLine. There is no direct relationship between a ScheduleLine and a ConfirmedScheduleLine. This has the advantage that the case "10 pieces for 01/01 and 10 pieces for 02/01" ordered as "20 pieces for 02/01" can be confirmed simply and without interpretation on the part of the applications. A ScheduleLine is a line containing the quantity and date of a performance schedule required by the buyer for a purchase order.

The ScheduleLine is of type GDT: PurchaseOrderItemScheduleLine. The ScheduleLine includes ID, the ScheduleLine number assigned by the procurement system. The ID is of type GDT; ID—the SellerID is the ScheduleLine number assigned by the sales system. The SellerID is of type GDT: ScheduleLineID; DeliveryPeriod—the DeliveryPeriod is the period in which the buyer expects a product to be delivered or service provided. The DeliveryPeriod is of type GDT: GLOBAL_DateTimePeriod; Quantity—The quantity is the amount ordered. The Quantity is of type GDT: Quantity.

Multiple ScheduleLines for a purchase order item with identical DeliveryPeriod are not permitted.

All the ScheduleLines for a particular item can use the same unit of measure.

ScheduleLines is generally not used for grouping hierarchy items. In this case, the ScheduleLines may be explicitly specified for all subitems. ScheduleLines do not have to be specified for limit items. At least one ScheduleLine may be specified for all other item types. Within a ScheduleLine, the quantity is generally not used for limit items; for all other types of items, the quantity may be specified.

In the ScheduleLines of subitems for discount in kind and BOM hierarchy items, the DeliveryPeriod of all the subitems may be identical to the DeliveryPeriod of the relevant parent items.

The DeliveryPeriod can be changed by buyers. Sellers can specify a DeliveryPeriod for new items they have proposed. In the ScheduleLines of substitute product subitems, the DeliveryPeriod of all the subitems may be identical to the DeliveryPeriod of the relevant parent items. The quantities and confirmed quantities of the subitems should be added to the quantities of the parent items; where deviations occur, the quantities of subitems are regarded as the valid quantities.

The ID is optional; a procurement system does not have to number the ScheduleLines.

The SellerID is optional; a sales system does not have to number the ScheduleLines.

The Quantity can be changed explicitly by the buyer and the seller.

A ConfirmedScheduleLine is a line containing the quantity and date of a performance schedule confirmed by the seller for a purchase order.

The ConfirmedScheduleLine is of type GDT: PurchaseOrderItemScheduleLine. The ConfirmedScheduleLine includes ID, the ConfirmedScheduleLine number assigned by the procurement system. The ID is of type GDT: ScheduleLineID; DeliveryPeriod—the DeliveryPeriod is the period in which the seller provides the buyer with confirmation of a delivery or the provision of a service. The DeliveryPeriod is of type GDT: DateTimePeriod; Quantity, the quantity confirmed by the seller. The Quantity is of type GDT: Quantity.

Multiple ConfirmedScheduleLines are not permitted for a purchase order item with identical DeliveryPeriod.

All the ConfirmedScheduleLines for a particular item can use the same unit of measure. The same rules apply for the use of the ConfirmedScheduleLine for the various item types as described for the ScheduleLine.

The ConfirmedScheduleLine is generally not used.

Confirmation of a partial quantity does not mean cancellation of the remaining quantity. It simply means that the seller has agreed to this partial quantity and has not yet made a decision about the remaining quantity. In order to explicitly cancel a remaining quantity, the seller can reduce the quantity of the ScheduleLine (not that of the ConfirmedScheduleLine) accordingly.

The SellerID is optional; a sales system does not have to number the ConfirmedScheduleLines.

The following list of Data Types may be used (GDTs/CDTs) _MEDIUM_Name, AcceptanceStatusCode, ActionCode, Address, Amount, Attachment, BusinessDocumentMessageHeader, BusinessDocumentMessageHeaderParty, BusinessDocumentMessageID, BusinessTransactionDocumentID, BusinessTransactionDocumentItemGroupID, BusinessTransactionDocumentItemHierarchyRelationshipTypeCode, BusinessTransactionDocumentItemID, BusinessTransactionDocumentItemScheduleLineID, BusinessTransactionDocumentParty, BusinessTransactionDocumentProduct, BusinessTransactionDocumentProductCategory, BusinessTransactionDocumentReference, BusinessTransactionDocumentShipFromLocation, BusinessTransactionDocumentShipToLocation, BusinessTransactionPriorityCode, CanceledIndicator, CashDiscount, CashDiscountTerms, CatalogueID, CatalogueItemID, CatalogueReference, CompleteTransmissionIndicator, ContactPerson, ContactPersonPartyID, Date, GLOBAL_DateTime, GLOBAL_DateTimePeriod, DeliveryTerms, Description, Duration, EvaluatedReceiptSettlementIndicator, FollowUpMessageRequirementCode, Incoterms, LocationPartyID, LocationStandardID, Note PartialDelivery, PartyInternalID, PartyPartyID, PartyStandardID, PaymentCard, PaymentCardID, PaymentFormCode, Percent, Price, ProductCategoryPartyID, ProductCategoryStandardID, ProductPartyID, ProductStandardID, ProductTypeCode, PurchaseOrder, PurchaseOrderItem, PurchaseOrderItemScheduleLine, PurchaseOrderMessage, Quantity, QuantityTolerance, ReconciliationPeriodCounterValue, TransportMeansDescriptionCode, TransportModeCode, TransportServiceLevelCode, UnlimitedIndicator, and UnplannedItemPermissionCode.

The message data type PurchaseOrderMessage groups together:

Business information relevant for sending a business document in a message

The PurchaseOrderCancellation object in the business document

It contains the following packages:

BusinessDocumentMessageHeader-package

PurchaseOrderCancellation-package

The message data type PurchaseOrderMessage makes the structure available for the message types PurchaseOrderCancellationRequest and the relevant interfaces.

The ReferenceID element of the BusinessDocumentMessageHeader entity establishes the reference to the purchase order to be canceled.

MessageHeader Package

Similar to the MessageHeader package in the PurchaseOrderMessage.

PurchaseOrderCancellation Package

A PurchaseOrderCancellation package groups together the PurchaseOrderCancellation.

A PurchaseOrderCancellation is a buying party's (buyer's) request to a provider (seller) to cancel a purchase order. The PurchaseOrderCancellation includes ID, the unique identifier specified by the buyer for the purchase order.

The Data Types used include Address, BusinessDocumentMessageID, BusinessDocumentMessageHeader, BusinessDocumentMessageHeaderParty, BusinessTransactionDocumentID, ContactPerson, ContactPersonPartyID, DateTime, PartyInternalID, PartyPartyID, PartyStandardID.

PurchaseOrderConfirmation Business Object.

FIGS. 257-1 through 257-8 illustrate an example PurchaseOrderConfirmation business object model 257000. Specifically, this model depicts interactions among various hierarchical components of the PurchaseOrderConfirmation, as well as external components that interact with the PurchaseOrderConfirmation (shown here as 257002 through 257024 and 257068 through 257110).

A confirmation from an external supplier to the request of a purchaser to deliver a specified quantity of goods, or perform a specified service, at a specified price within a specified time.

The business object PurchaseOrder is derived from the Procurement Document Template.

The Business Object PurchaseOrderConfirmation is part of the Process Component Purchase Order Processing. (Process Component Purchase Order Processing itself is part of LDU Purchasing). The Business Object PurchaseOrderConfirmation is represented by the Root Node PurchaseOrderConfirmation and its Associations.

PurchaseOrderConfirmation Service Interface is part of Purchase Order Processing Sales Order Processing at Supplier Process Component Interaction Model.

The Service Interface Ordering In is a grouping of operations which creates a PurchaseOrderConfirmation based on acceptance or rejection of the requested products, quantities and delivery period, or on changes to them provided by the Supplier.

The Operation Create Purchase Order Confirmation creates a Purchase Order Confirmation according to the confirmation, partial confirmation, or proposed changes sent from the Seller to the Buyer concerning the requested delivery of product to trigger the creation of a PurchaseOrderConfirmation.

The message "Purchase Order Confirmation" is sent by Sales Order Processing at Supplier side. The operation is based on message type PurchaseOrderConfirmation. (derived from Business Object PurchaseOrderConfirmation)

A PurchaseOrderConfirmation is the reply to a purchase order request with the obligation to deliver requested materials or to provide requested services. It contains the parties involved, the descriptions, the attachments as well as the items that describe the obligation in more detail. A PurchaseOrderConfirmation has always the reference to the request of a purchaser.

The PurchaseOrderConfirmation contains the following elements that are defined by the data type: ProcurementDocumentElements. These elements include ID, an identifier for the PurchaseOrderConfirmation assigned by the BuyerParty, of type GDT; UUID, a universal unique alternative identifier of the PurchaseOrderConfirmation for referencing purposes, of type GDT; SystemAdministrativeData, an administrative data stored within the system. These data contain system users and time of change, of type GDT; ProcessingTypeCode, a coded representation for the processing type of the Purchase Order Confirmation, of type GDT; DataOriginTypeCode, a coded representation of the data origin type of the PurchaseOrderConfirmation, of type GDT; AcceptanceStatusCode, a coded representation of the type of the acceptance (Accepted, Rejected, Pending) from the supplier regarding a Purchase Order that has been sent to the supplier, of type GDT; CurrencyCode, a coded representation of the PurchaseOrderConfirmation currency, of type GDT; Status, Element Status contains all individual status variables that are relevant for and describe the current state in the life cycle of a PurchaseOrderConfirmation; ConsistencyStatusCode, this variable describes the status of our BO after a check process. It may be either consistent or inconsistent, depending upon whether the check process returned error messages or not, that is whether the BO is consistent and error-free. Of type GDT; DataTransferPreparationStatusCode: This status variable indicates the result after the check whether the PurchaseOrder can be updated with the data from PurchaseOrderConfirmation or not. Of type GDT; DataTransferResultStatusCode: This status variable indicates the result whether the data from PurchaseOrderConfirmation were taken over into the PurchaseOrder or not. Of type GDT; UpToDatenessStatusCode: This variable indicates whether the BO is (at least partially) up to date. A document carrying Up to Date status cannot be used in the Business Processes anymore; it exists there only to provide information regarding the History of document flow in the Purchasing Process. Of type GDT.

The CurrencyCode is the leading coded representation of the PurchaseOrderConfirmation currency; all other CurrencyCodes (e.g. at NetAmount) are read-only and can not differ from the PurchaseOrderConfirmationCurrencyCode. The ID can not be changed after creation. The UUID is determined by the service provider. It can not be changed. The SystemAdministrativeData is determined by the service provider. It can not be changed. The ProcessingTypeCode can not be changed after the creation.

Item 257028 may have a cardinality of 1:cn. Party 257044 may have a cardinality of 1:cn. CashDiscountTerms 257052 may have a cardinality of 1:c. DeliveryTerms 257050 may have a cardinality of 1:c. BusinessTransactionDocumentReference 257056 may have a cardinality of 1:cn. AttachmentFolder 257060 may have a cardinality of 1:c. TextCollection 257062 may have a cardinality of 1:c.

There may be a number of Inbound Aggregation Relationships, including:

CreationIdentity may have a cardinality of 1:cn. LastChangeIdentity may have a cardinality of c:cn. Identity that changed the procurement document in the last time. AccessControlByPurchaseOrder may have a cardinality of 1:cn. The PurchaseOrder whose AccessControlList is used for access control to a PurchaseOrderconfirmation.

BusinessDocumentFlow may have a cardinality of c:c and is an association to the BusinessDocumentFlow which is a view on the set of all preceding and succeeding business (transaction) documents for the current procurement document. To node PurchaseOrderConfirmationItem: PurchasingHierarchyItem may have a cardinality of c:cn. Association to purchasing hierarchy item(s). A purchasing hierarchy item is an item which is semantically associated with the root; other items with a parent item in an item hierarchy are subordinate items.

Associations to the PurchaseOrderConfirmationParty may include: BuyerParty may have a cardinality of c:c and is an association to a party which appears within the BuyerParty specialisation. SellerParty may have a cardinality of c:c and is an association to a Party which appears within the SellerParty specialisation. ServicePerformerParty may have a cardinality of c:c, and is an association to a party which appears within the ServicePerformerParty specialisation. Associations to the PurchaseOrderConfirmation-BusinessTransactionDocumentReference include: BaseSalesOrderReference may have a cardinality of c:c and is an association to a BTDReference which appears within the SalesOrder specialisation. BasePurchaseOrderReference may have a cardinality of c:c and is an association to a BTDReference which appears within the PurchaseOrder specialisation.

The RejectPurchaseOrderCompletely action fills in a newly created PurchaseOrderConfirmation which states that the supplier rejects the entire PurchaseOrder. As result we'll get PurchaseOrderConfirmation document which has the status (AcceptanceStatusCode element) Rejected on header level and all its items.

The AcceptPurchaseOrderCompletely action fills a newly created PurchaseOrderConfirmation which states that the supplier accepts the entire PurchaseOrder. As result we'll get PurchaseOrderConfirmation document which has the status (AcceptanceStatusCode element) Accepted on header level and all its items.

The PrepareForManualProcess action prepares a newly created PurchaseOrderConfirmation by initialising its attributes with data copied from corresponding PurchaseOrder or active PurchaseOrderConfirmation. Of course these active PurchaseOrderConfirmation are related to the same PurchaseOrder. As result, we get a PurchaseOrderConfirmation instance, filled in with the copied data, which can be furthermore manually updated. The object is updated as a replication of the originating PurchaseOrder or the active PurchaseOrderConfirmation. CheckPurchaseOrderUpdateProcess (SA&M action) is a wrapper for the Status and Action Management Action CheckPurchaseOrderUpdateProcess, which is to be called by automatic processes as a subsequent step performed after saving the document and checks the comparison between the originating PurchaseOrder and the currently saved PurchaseOrderConfirmation. This action is allowed when the CompleteStatus variable has the value "Complete" and the variable DataTransferPreparationStatus has the value "Not Decided". No further changes to the attributes of the Business Object. The variable DataTransferPreparationStatus will get the value "Necessary" or "Not Necessary", depending upon the comparison between the originating PurchaseOrder and the currently saved PurchaseOrderConfirmation identifies differences or not. This ESI Action is available only for internal processes. It is not intended to be exposed to public access, in any circumstances.

DoNotTakeOverIntoPurchaseOrder (S&AM action) is to be called when the user rejects the proposal made by the supplier through the current PurchaseOrderConfirmation. As result, the PurchaseOrder is not updated with data from PurchaseOrderConfirmation. The PurchaseOrder is once again submitted to the supplier with the very same content.

TakeOverIntoPurchaseOrderCompletely (S&AM action) is to be called when the user or the system accepts the proposal made by the supplier through the current PurchaseOrderConfirmation. As result, the PurchaseOrder is updated with data from all items of PurchaseOrderConfirmation. The updated PurchaseOrder is then submitted to the Supplier with the new content. The update process refers on taking over the proposed products, quantities or times from the PurchaseOrderConfirmation into the referenced PurchaseOrder.

Preconditions: This action is allowed when the DataTransferPreparationStatus variable has the value "Necessary".

CheckConsistency (S&AM action) checks whether the data of a PurchaseOrderConfirmation is consistent.

A PurchaseOrderConfirmation is consistent if none of the data is missing and if the check does not return any error messages.

SelectAll provides a list of all existing PurchaseOrderConfirmations.

QueryByPurchaseOrder provides a list of all PurchaseOrderConfirmation nodes which satisfy the selection criteria, specified by the query Elements, combined by logical "AND". If, in the following list of selection criteria, no further selection logic is explained, the system will simply check whether the value given in the selection criterion is equal to the value of the corresponding BO node element. The query interface is defined by data type ProcurementDocumentPurchaseOrderQueryElements. PurchaseOrderConfirmation includes ID, of type GDT; Status, of type ProcurementDocumentItemStatus; PurchaseOrderID, The ID of the referenced PurchaseOrder matches the query element PurchaseOrderID, of type GDT; PurchaseOrderName, The Name of the referenced PurchaseOrder matches the query element PurchaseOrderName, of type GDT; PurchaseOrderPartyResponsiblePurchasingUnitPartyID, The ID of a responsible purchasing unit in the referenced PurchaseOrder matches the query element PurchaseOrderPartyResponsiblePurchasingUnitPartyID, of type GDT; PurchaseOrderPartySellerPartyID, The ID of a seller party in the referenced PurchaseOrder matches the query element PurchaseOrder-Par-tySellerPartyID, of type GDT; PurchaseOrderPartyPreferredSellerPartyID, The ID of a preferred seller party in the referenced PurchaseOrder matches the query element PurchaseOr-derPartyPreferredSellerPartyID, of type GDT; PurchaseOrderItemPartyRequestor PartyID, The ID of a requester party in the referenced PurchaseOrder matches the query element PurchaseOrde-rItemPartyRequestor PartyID, of type GDT; PurchaseOrderItemPartyProductRecipientPartyID, The ID of a product recipient party in the referenced PurchaseOrder matches the query element PurchaseOrderItemPartyProductRecipientPartyID, of type GDT; PurchaseOrderItemDeliveryPeriod, The DeliveryPeriod of the referenced PurchaseOrder matches the query element PurchaseOrderItemDeliv-eryPeriod, of type GDT; PurchaseOrderItemProductProductID, The ProductID of a product in the referenced PurchaseOrder matches the query element PurchaseOrderItemProductProductID; PurchaseOrderItemProductProductSellerID, The ID of a product by seller in the referenced PurchaseOrder matches the query element PurchaseOrderItemProductProductSellerID, of type GDT; PurchaseOrderItemProductProductCategoryInternalID, The ID of a product category in the referenced PurchaseOrder matches the query element PurchaseOrderItemProductProductCategoryInternalID, of type GDT.

A PurchaseOrderConfirmation Party is a natural or legal person, organization, organizational unit, or group that is involved in a PurchaseOrderConfirmation in a PartyRole.

A Party can be a BusinessPartner in the specialisation Supplier or Business Partner or an OrganisationalCentre in the specialisation Company.

A PurchaseOrderConfirmation Party may exist without reference to a business partner or an organizational unit. This would be a Casual Party, which is a party without reference to the master data in the system. The external identifier and the description are contained in the business document. Casual Party is, for example, used for groupware replication (Outlook). The e-mail address and the description of a party are used by the groupware when replicating, for example, e-mails or appointments.

PurchaseOrderConfirmationParty may occur in BuyerParty, a party that authorized the requested products and/or services; SellerParty, the party that sells the requested material or services. The business object Supplier can be the SellerParty; A PurchaseOrderConfirmation can only be created when the SellerParty is provided. A PurchaseOrderConfirmation can only contain one SellerParty; ServicePerformerParty, the party that physically provides a service in the name of the Supplier which is referenced by the SellerParty; The PurchaseOrderConfirmation can only contain one ServicePerformerParty. This ServicePerformerParty is then valid for all PurchaseOrderConfirmationItem nodes. If ServicePerformerParties differ between PurchaseOrderConfirmationItem nodes, the ServicePerformerParty can only be specified on PurchaseOrderConfirmationItem level.

The PurchaseOrderConfirmationParty contains the following elements that are defined by the data type: ProcurementDocumentPartyElements that is derived from the data type BusinessTransactionDocumentPartyElements.

The elements located directly at the node Party are defined by the type data type ProcurementDocumentPartyElements. (ProcurementDocumentPartyElements will be derived from the data type BusinessTransactionDocumentPartyElements.)

These elements include UUID; ProcurementDocument_TemplateBO NodeParty, of type GDT; PartyID, an identifier of the Party in this PartyRole in the business document or the master data object.

Comment: If a business partner or organizational unit are referenced, the attribute contains their identifiers. If an unidentified identifier is, for example, entered by the user, the attribute contains this identifier, of type GDT; PartyUUID, a unique identifier for a business partner, the organizational unit, or their specializations, of type GDT; PartyTypeCode, a type of the business partner, organizational unit, or their specializations referenced by the attribute PartyUUID, of type GDT; RoleCategoryCode, a party Role Category of the Party in the business document or the master data object, of type GDT; RoleCode, a Party Role of the Party in the business document or the master data object, of type GDT; AddressReference, a reference to the address of the Party, of type GDT; AddressHostUUID, a globally unique identifier of the address of the business partner, the organizational center, or their specializations, of type GDT; AddressHostTypeCode, a coded representation of the address host type, of type GDT; DeterminationMethodCode, a coded representation of the determination method of the Party, of type GDT.

A party could be a person, organization, or group within or outside of the company.

Inheritance is used for all parties, i.e. parties that are specified at PurchaseOrderConfirmation level are used for all items if not otherwise specified on item level. PartyContactParty 257046 has a cardinality of 1:c. PartyAddress (DO) 257048 has a cardinality of 1:c.

There may be a number of Inbound Aggregation Relationships including: Party may have a cardinality of c:cn.

UsedAddress may have a cardinality of c:c. The transformed object UsedAddress represents a uniform way to access a party address of a procurement document whether it's a business partner address, a organization centre address or an address specified within a procurement document.

Inheritance is used for the ServicePerformerParty, i.e. parties that are specified at PurchaseOrderConfirmation level are used for all items if not otherwise specified on item level.

The SellerParty can be same as in the reference PurchaseOrder.

If the ServicePerformerParty is different to the ServicePerformerParty in the reference PurchaseOrder, it can be taken over to the PurchaseOrder.

PartyContactParty is a natural person or organizational center that can be contacted for the Party. The contact may be a contact person or, for example, a secretary's office. Usually, communication data for the contact is available.

UUID, a globally unique identifier for a contact, of type GDT; PartyID, an identifier of the contact in this PartyRole in the business document or the master data object, of type GDT; PartyUUID, unique identifier of the contact in this PartyRole in the business document or the master data object, of type GDT; PartyTypeCode, a type of the business partner, organizational unit, or their specializations referenced by the attribute ContactUUID, of type GDT; AddressReference, a reference to the address of the Party, of type GDT; AddressHostUUID, a globally unique identifier of the address of the business partner, the organizational center, or their specializations, of type GDT; AddressHostTypeCode, a coded representation of the address host type, of type GDT; DeterminationMethodCode, a coded representation of the determination method of the contact party, of type GDT. PartyContactPartyAddress (DO) has a cardinality of 1:c.

There may be a number of Inbound Aggregation Relationships including: Party may have a cardinality of c:cn. To transformed object UsedAddress, node Root, UsedAddress may have a cardinality of c:cn and is the address used for the Contact Party.

PartyContactPartyAddress is a procurement document specific address of the Party. For detailed structure see Dependent Object Address. A PartyAddress is a procurement document specific address of a party.

CashDiscountTerms (DO). The modalities agreed on by business partners of a procurement document for the payment of goods delivered or services provided. These modalities consist of incremental payment periods and the cash discounts that are allowed when payment is made within one of these periods. CashDiscountTerms is used to define terms of payment, for example, for a purchase order or invoice issue for goods and services. For detailed structure see Dependent Object CashDiscountTerms.

The PurchaseOrderConfirmationDeliveryTerms are the conditions and agreements that are valid for executing the delivery of ordered material and for the necessary services and activities. The DeliveryTerms contains the following elements that are defined by the GDT: ProcurementDocumentDeliveryTermsElements that is derived from the GDT BusinessTransactionDocumentDeliveryTermsElements.

DeliveryTerms on the root node PurchaseOrder serve as default values for the same type of information on all Item nodes. The default logic only takes Incoterms into account for material items; they are ignored for all other items.

If the DeliveryTerms is different to the DeliveryTerms in the reference PurchaseOrder, it can be taken over to the PurchaseOrder.

A BusinessTransactionDocumentReference is a reference to another business transaction document that is involved in the same purchasing process as the PurchaseOrderConfirmation. BusinessTransactionDocumentReference occurs in the following specialisations: BaseSalesOrderReference, a reference to a SalesOrder which is the basis of the PurchaseOrderConfirmation. In some implementations, the SalesOrder is the sales order on the side of the external supplier.

BasePurchaseOrderReference is a reference to a PurchaseOrder which is the basis of the PurchaseOrderConfirmation. The elements located directly at the node BusinessTransactionDocumentReference are defined by the type data type: ProcurementDocumentBusinessTransactionDocumentReferenceElements that is derived from the data type: BusinessTransactionDocumentReferenceElements.

BusinessTransactionDocumentReference: Unique reference to the referred business transaction document. Furthermore, it is possible to have a reference to a line item within the business transaction document. (GDT: BusinessTransactionDocumentReference)

BusinessTransactionDocumentRelationshipRoleCode: Coded representation of the role of a BusinessTransactionDocument in this reference. (GDT: BusinessTransactionDocumentReferenceRoleCode)

BusinessTransactionDocumentDataProviderIndicator: Indicates whether the referenced business transaction document is a data provider or not. (GDT: Indicator, Qualifier: BusinessTransactionDocumentDataProvider)

There may be a number of Inbound Association Relationships, including:

PurchaseOrder may have a cardinality of c:cn PurchaseOrder that is referenced through specialisation PurchaseOrderReference.

SalesOrder may have a cardinality of c:cn SalesOrder that is referenced through specialisation SalesOrderReference.

The PurchaseOrderConfirmation can have the reference on a PurchaseOrder.

An AttachmentFolder of all documents attached to the PurchaseOrderConfirmation.

For detailed structure see Dependent Object AttachmentFolder.

A TextCollection of all textual descriptions which are related to the PurchaseOrderConfirmation. Each text can be specified in different languages and can include formatting information.

For detailed structure see Dependent Object TextCollection.

A Item is the obligation to deliver a specified material or to provide a specified service. It contains the material or service, its quantity and price. It can also contain a modification proposal that is deviating to the corresponding purchase order request.

Item occurs within the following complete and disjoint specialisations: PurchasingMaterialItem 257032, PurchasingServiceItem 257034, PurchasingCostUpperLimitItem 257036, PurchasingHierarchyItem 257038.

The Item contains the following elements that are defined by the data type: ProcurementDocumentItemElements. These elements include ID, an identifier for the Item assigned by the BuyerParty, of type GDT; UUID, a universal unique alternative identifier of the PurchaseOrderConfirmation for referencing purposes, of type GDT; SystemAdministrativeDate, administrative data stored within the system. These data contain system users and time of change, of type GDT; AcceptanceStatusCode, a coded representation of the type of the acceptance (Accepted, Rejected, Pending) from the supplier regarding a Purchase Order Item that has been sent to the supplier. Of type GDT; OpenQuantityCancelledIndicator, this indicator indicates whether the supplier can deliver the open quantity of material or service or not, of type GDT; TypeCode, a coded representation of the type of the Item. An Item can be a material item/service item/limit item/hierarchy item, of type GDT.

The following codes are permitted for a PurchaseOrderConfirmationItem:

Purchasing Material Item, Purchasing ServiceProduct Item, Purchasing Limit Item, Purchasing Hierarchy.

A HierarchyRelationship is the relationship between a subitem and a higher-level parent item in an item hierarchy. It contains the following elements that are defined by the data type: ProcurementDocumentItemHierarchyRelationship: ParentItemUUID, an identifier for the parent Item; Designation of the PurchaseOrderConfirmationItem. Quantity, This is the quantity of material or service that is ordered via the Item. E.g. 10 Each, of type GDT; QuantityTypeCode, a coded representation of a type of the quantity, of type GDT; NetUnitPrice, a price of the confirmed material or service specified with respect to a confirmed price quantity. E.g. 0 € per 5 Each, of type GDT; NetAmount, a total net amount of the Item calculated from NetUnitPrice and Quantity. E.g. if NetUnitPrice=10 €/5 Each and Quantity=10 Each→NetAmount=20 €, of type GDT; The NetAmount can not be changed—it is always calculated by the system;

DeliveryPeriod, a delivery date for the confirmed products or timeframe for rendered services, of type GDT. The StartDateTime and EndDateTime are supported.

Element Status contains all individual status variables that are relevant for and describe the current state in the life cycle of a PurchaseOrderConfirmationItem. (data type: ProcurementDocumentItemStatus.);

DataTransferPreparationStatusCode: This status variable indicates the result after the check whether the PurchaseOrderItem can be updated with the data from PurchaseOrderConfirmationItem or not. Of type GDT; DataTransferResultStatusCode: This status variable indicates the result whether the data from PurchaseOrderConfirmationItem were taken over into the PurchaseOrderItem or not. Of type GDT; UpToDatenessStatusCode: This variable indicates whether the BO item is (at least partially) up to date. A document item carrying Up to Date status cannot be used in the Business Processes anymore; it exists there only to provide information regarding the History of document flow in the Purchasing Process, of type GDT.

ItemScheduleLine 257030 has a cardinality of 1:cn. ItemParty 257042 has a cardinality of 1:cn. ItemProduct 257040 has a cardinality of 1:c. ItemDeliveryTerms 257054 has a cardinality of 1:c. ItemBusinessTransactionDocumentReference 257058 has a cardinality of 1:cn. ItemAttachmentFolder (DO) 257064 has a cardinality of 1:c. ItemTextCollection (DO) 257066 has a cardinality of 1:c.

There may be a number of Inbound Aggregation Relationships, Including:

ParentItem may have a cardinality c:cn and is an association to a ProcurementDocument_TemplateItem itself, which is the relationship between a subitem and a higher-level parent item in an item hierarchy. This enables item hierarchies to be mapped. The hierarchies are mapped using the elements HierarchyRelationshipTypeCode and ParentItemID. CreationIdentity has a cardinality of 1:cn. LastChangeIdentity has a cardinality of c:cn. BusinessDocumentFlow has a cardinality of c:c. Association to the BusinessDocumentFlow which is a view on the set of all preceding and succeeding business (transaction) documents for the current procurement document item. ChildItem has a cardinality of c:cn.

To the node ItemParty:

ServicePerformerItemParty has a cardinality of c:c and is an association to a Party which appears within the ServicePerformerParty specialisation.

Associations to the PurchaseOrderConfirmationItemBusinessTransactionDocumentReference:

ItemBaseSalesOrderItemReference has a cardinality of c:c and is an association to a BTDReference which appears within the SalesOrderItem specialisation. ItemBasePurchaseOrderItemReference has a cardinality of c:1 and is an association to a BTDReference which appears within the PurchaseOrderItem specialisation.

To the field Quantity: The Quantity calculated from Quantity in the ItemScheduleLine to the item. If the item has more as one ItemScheduleLine, Quantity can not be changed in Item.

To the field NetUnitPrice: If NetUnitPrice is different to the ListUnitPrice in the referenced Purchase Order, it can be taken over to the Purchase Order in ListUnitPrice.

To the field DeliveryPeriod: If the item has only one ItemScheduleLine, DeliveryPeriod has the same data as the DeliveryPeriod in ItemScheduleLine. If the item has more as one ItemScheduleLine, DeliveryPeriod become in StartDateTime the earliest date from StartDateTime and in EndDateTime the latest date from EndDateTime from all ItemScheduleLine to the Item. If the item has more as one ItemScheduleLine, DeliveryPeriod can not be changed in Item.

ReplaceScheduleLines action modifies the schedule lines for an item, as follows: The current schedule lines are deleted, and then the schedule lines from the corresponding item in PurchaseOrder are copied instead.

This action implies a modify process which allows the external caller to revert the manual changes done to one item's schedule lines to the content which exists in the referenced PurchaseOrder. As result, new schedule lines for the current item are created with data copied from the corresponding PurchaseOrder, while the old schedule lines are deleted.

ReactToChangedPurchaseOrder (SA&M action) is to be called when the referenced PurchaseOrderItem is changed, which makes obsolete the current PurchaseOrderConfirmationItem. This action is allowed when the UpToDatenessStatus variable has the value "UpToDate". No further changes to the attributes of the Business Object. The variable UpToDatenessStatus will get the value "OutOfDate". The variable UpToDatenessStatus on the Root will get the value "PartiallyUpToDate" or "OutOfDate". (See Action 'ReactToChangedPurchaseOrder' on Root). This ESI Action is available only for internal processes. It is not intended to be exposed to public access, in any circumstances.

ReactToNewPurchaseOrderConfirmation (SA&M action) is to be called when newer PurchaseOrderConfirmationItem as part of newer PurchaseOrderConfirmation referencing the same PurchaseOrderItem is created, which makes obsolete the current PurchaseOrderConfirmationItem. This action is allowed when the UpToDatenessStatus variable has the value "UpToDate". No further changes to the attributes of the Business Object. The variable UpToDatenessStatus will get the value "OutOfDate". The variable UpToDatenessStatus on the Root will get the value "PartiallyUpToDate" or "OutOfDate". (See Action 'ReactToNewPurchaseOrderConfirmation' on Root). This ESI Action is available only for internal processes. It is not intended to be exposed to public access, in any circumstances.

TakeOverIntoPurchaseOrder action is to be called when the user or the system accepts the proposal made by the supplier through the current PurchaseOrderConfirmationItem. As result, the PurchaseOrderItem is updated with data from current PurchaseOrderConfirmationItem. The updated PurchaseOrder is then submitted to the Supplier with the new content. The update process refers on taking over the proposed product, quantity or time from the PurchaseOrderConfirmationItem into the referenced PurchaseOrderItem.

Preconditions: This action is allowed when the DataTransferPreparationStatus variable has the value "Necessary". No further changes to the attributes of the PurchaseOrderConfirmation Business Object. As a result of performing this action, the variable DataTransferResultStatus will get the value "Transferred" on item and the variable DataTransferResultStatus the value "Partially Transferred" or "Transferred" on root.

The QueryByPurchaseOrder query provides a list of all PurchaseOrderConfirmationItem nodes belonging to a given PurchaseOrder. If, in the following list of selection criteria, no further selection logic is explained, the system will simply check whether the value given in the selection criterion is equal to the value of the corresponding BO node element. The query interface is defined by data type ProcurementDocumentItemPurchaseOrderQueryElements. The elements used in a PurchaseOrderConfirmation include ProcurementDocumentID, The ID of the PurchaseOrderConfirmation matches the query element ProcurementDocumentID, ProcurementDocumentName, of type GDT; ID, The item ID of the PurchaseOrderConfirmationItem matches the query element ID, of type GDT; PurchaseOrderID, The ID of the referenced PurchaseOrder matches the query element PurchaseOrderID. Of type GDT; PurchaseOrderName, The Name of the referenced PurchaseOrder matches the query element PurchaseOrderName. Of type GDT; PurchaseOrderItemID, The item ID of the referenced PurchaseOrderItem matches the query element PurchaseOrderItemID; Status, of type: ProcurementDocumentItemStatus.

A PurchaseOrderConfirmationItemScheduleLine is a line containing the confirmed quantity and delivery date to the required quantity and delivery date from item in the request of a purchaser. The confirmed quantity can be distributed between different delivery dates.

PurchaseOrderConfirmationItemScheduleLine contains the following elements that are defined by the GDT:

ID, an identifier for the ItemScheduleLine assigned by the BuyerParty; Quantity, the quantity of material or service that is confirmed via the Item. E.g. 10 Each; QuantityTypeCode, a coded representation of a type of quantity in procurement document item schedule line; DeliveryPeriod, a delivery date for the confirmed products or timeframe for rendered services.

A ItemParty is a natural or legal person, organization, organizational unit, or group that is involved in a PurchaseOrderConfirmation in a PartyRole.

A ItemParty can be a BusinessPartner in the specialisation Supplier or Business Partner.

A PurchaseOrderConfirmation ItemParty may exist without reference to a business partner or an organizational unit. This would be a Casual Party, which is a party without reference to the master data in the system. The external identifier[1] and the description are contained in the business document. Casual Party is, for example, used for groupware replication (Outlook). The e-mail address and the description of a party are used by the groupware when replicating, for example, e-mails or appointments.

PurchaseOrderConfirmationItemParty can occur in the following specialisations: ServicePerformerItemParty The ServicePerformerItemParty is the party that physically provides a service in the name of the Supplier which is referenced by the SellerParty. The PurchaseOrderConfirmationItem can only contain one ServicePerformerItemParty. The PurchaseOrderConfirmationItemParty contains the following elements that are defined by the data type: ProcurementDocumentItemPartyElements that is derived from the data type BusinessTransactionDocumentPartyElements.

The elements located directly at the node ItemParty are defined by the type data type ProcurementDocumentPartyElements. (ProcurementDocumentPartyElements will be derived from the data type BusinessTransactionDocument- PartyElements.) These elements include UUID; PartyID, an identifier of the Party in this PartyRole in the business document or the master data object; PartyUUID, a unique identifier for a business partner, the organizational unit, or their specializations; PartyTypeCode, a type of the business partner, organizational unit, or their specializations referenced by the attribute PartyUUID; RoleCategoryCode, a Party Role Category of the Party in the business document or the master data object, of type GDT; RoleCode, a Party Role of the Party in the business document or the master data object. Of type GDT; AddressReference, a reference to the address of the Party, of type GDT; AddressHostUUID, a globally unique identifier of the address of the business partner, the organizational center, or their specializations; AddressHostTypeCode, a coded representation of the address host type; DeterminationMethodCode, a coded representation of the determination method of the Party.

A party could be a person, organization, or group within or outside of the company.

Inheritance is used for all parties, i.e. parties that are specified at PurchaseOrderConfirmation level are used for all items if not otherwise specified on item level. ItemPartyAddress (DO) has a cardinality of 1:c There may be a number of Inbound Aggregation Relationships, including: Party may have a cardinality of c:cn, Referenced Party in Master Data, UsedAddress may have a cardinality of c:c. The transformed object UsedAddress represents a uniform way to access a party address of a procurement document whether it's a business partner address, a organization center address or an address specified within a procurement document.

If the ServicePerformerParty is different to the ServicePerformerParty in the reference PurchaseOrder, it can be taken over to the PurchaseOrder.

ItemPartyAddress (DO) is a procurement document specific address of the Party.

An ItemProduct is the identification, description and classification of the required product of a PurchaseOrderConfirmationItem.

The PurchaseOrderConfirmationItemProduct contains the following elements that are defined by the GDT: ProcurementDocumentItemProductElements that is derived from the GDT BusinessTransactionDocumentProductElements; ProductUUID, a universally unique identifier for a product, of type GDT; ProductID, a proprietary identifier for a product; ProductStandardID is a standardized identifier for this product, whose identification scheme is managed by an agency from the DE 3055 code list, of type GDT; ProductSellerID, an identifier that is used proprietarily by the SupplierParty for this product; ProductTypeCode, a coded representation of the type of a product, of type GDT; ProductCategoryUUID, a globally unique identifier for a product category, of type GDT; ProductCategoryInternalID, a proprietary identifier for a product category, of type GDT; ProductCategoryStandardID, a standardized identifier for a product category, whereby the identification scheme used is managed by an agency from the code list DE 3055. Of type GDT; ProductCatalogueReference, a unique reference to a catalog or to an object within a catalog. Of type GDT.

A product category is a division of products according to objective criteria. The product category is automatically derived from the Material or ServiceProduct if product identification is specified. However, a Material or ServiceProduct can also be specified by natural linguistic text. In this case a ProductCategory can be assigned manually There may be a number of Inbound Aggregation Relationships, including: Material may have a cardinality of c:cn, The PurchaseOrderConfirmationItemProduct may represent the Product specialisation Material if a PurchaseOrderConfirmationItem contains a Material. From the business object ServiceProduct:

ServiceProduct may have a cardinality of c:cn, the PurchaseOrderConfirmationItemProduct may represent the Product specialisation ServiceProduct if a PurchaseOrderConfirmationItem contains a ServiceProduct. From the business object ProductCategoryHierarchy, node ProductCategory: ProductCategoryHierarchyProductCategory: c:cn, the PurchaseOrderConfirmationItemProduct may represent a ProductCategory that classifies the invoiced Material or ServiceProduct.

The PurchaseOrderConfirmationItemDeliveryTerms are the conditions and agreements that are valid for executing the delivery of ordered material and for the necessary services and activities. The PurchaseOrderConfirmationItemDeliveryTerms contains the following elements that are defined by the GDT: ProcurementDocumentDeliveryTermsElements that is derived from the GDT BusinessTransactionDocumentDeliveryTermsElements.

Incoterms. Standard contract formulas for the terms of delivery. Of type GDT. If the ItemDeliveryTerms is different to the ItemDeliveryTerms in the reference PurchaseOrder, it can be taken over to the PurchaseOrder.

A ItemBusinessTransactionDocumentReference is a reference to another business transaction document that is involved in the same purchasing process as the PurchaseOrderConfirmationItem. ItemBusinessTransactionDocumentReference occurs in the following specialisations: ItemBaseSalesOrderItemReference, A reference to a SalesOrder item which is the basis of the PurchaseOrderConfirmationItem. ItemBasePurchaseOrderReference: A reference to a PurchaseOrder item which is the basis of the PurchaseOrderConfirmationItem.

The elements located directly at the node ItemBusinessTransactionDocumentReference are defined by the type data type: ProcurementDocumentBusinessTransactionDocumentReferenceElements that is derived from the data type: BusinessTransactionDocumentReferenceElements.

BusinessTransactionDocumentReference: a unique reference to the referred business transaction document. Furthermore, it is possible to have a reference to a line item within the business transaction document. Of type GDT; BusinessTransactionDocumentRelationshipRoleCode, a coded representation of the role of a BusinessTransactionDocument in this reference; BusinessTransactionDocumentDataProviderIndicator: Indicates whether the referenced business transaction document is a data provider or not. Of type GDT.

There may be a number of Inbound Association Relationships, including: PurchaseOrderItem may have a cardinality of c:cn, PurchaseOrderItem that is referenced through specialisation ItemBasePurchaseOrderItemReference.

Inbound Associations for Navigation may include: 1) From the business object SalesOrder, Node Item:

SalesOrderItem may have a cardinality of c:n, SalesOrderItem that is referenced through specialisation ItemBaseSalesOrderItemReference.

A PurchaseOrderConfirmationItem can have a reference to a PurchaseOrderItem.

An ItemAttachmentFolder of all documents attached to the PurchaseOrderConfirmationItem. For detailed structure see Dependent Object AttachmentFolder.

ItemTextCollection (DO)

An ItemTextCollection of all textual descriptions which are related to the PurchaseOrderConfirmationItem. Each text can be specified in different languages and can include formatting information. For detailed structure see Dependent Object TextCollection.

PurchaseRequest Business Object

FIG. 258 illustrates an example PurchaseRequest business object model 258000. Specifically, this model depicts interactions among various hierarchical components of the PurchaseRequest, as well as external components that interact with the PurchaseRequest (shown here as 258002 through 258026 and 258076 through 258124).

PurchaseRequest can be defined as a request or instruction to the purchasing department to purchase specified goods or services in specified quantities at a specified price within a specified time. The business object PurchaseRequest can be derived from the Procurement Document Template. The system or the processor of the PurchaseRequest can be responsible as to which follow-on actions or process steps will be performed to purchase the goods or the services. Normally the PurchaseRequests can be transferred to PurchaseOrders. This transfer can be triggered direct from the PurchaseRequest. But a RequestForQuote can also be possible as an interim document where a suitable source of supply will be determined. Furthermore a PurchasingContract can be created from a PurchaseRequest. The Business Object PurchaseRequest can be part of the Process Component Purchase Request Processing. Process Component Purchase Request Processing itself can be part of LDU Purchasing. The Business Object PurchaseRequest can be represented by the Root Node PurchaseRequest and its Associations.

The service interface Purchasing In can contain an operation that can create or update a Purchase Request 258028. It can be used in the Process Integration Models External Procurement Trigger and Response_Purchase Request Processing, Internal Request Processing_Purchase Request Processing, Project Processing_Purchase Request Processing and Purchase Request Processing_RFQ Processing.

Maintain Purchase Request (A2A)

PurchaseRequestProcessingPurchasingIn.MaintainPurchaseRequest. Maintain Purchase Request can create or update a request from a requester to the purchasing department to procure materials or services, i.e., it can create or update a Purchase Request. The operation can be based on Message Type Purchase Request Request derived from PurchaseRequest. The fields ThirdPartyDealIndicator, DirectMaterialIndicator and ScheduleLine of the message type may not used by the operation.

The service interface PurchaseRequestProcessingPurchasingOut can be a grouping of operations that can confirm the creation or update of a Purchase Request. It can be used in the Process Integration Models External Procurement Trigger and Response_Purchase Request Processing, Internal Request Processing_Purchase Request Processing, Project Processing_Purchase Request Processing and Purchase Request Processing_RFQ Processing. Confirm Purchase Request (A2A) can refer to PurchaseRequestProcessingPurchasingOut.ConfirmPurchaseRequest. The operation Confirm Purchase Request can confirm the creation, change or cancellation of a PurchaseRequest to the requestor. The operation can be based on Message Type Purchase Request Confirmation derived from PurchaseRequest. The service interface PurchaseRequestProcessingRequestForQuoteIn In can be a grouping of operations that updates a Purchase Request. It can be used in the Process Integration Model Purchase Request Processing_RFQ Processing.

Change Purchase Request based on RFQ Execution (A2A) can relate to PurchaseRequestProcessingRequestForQuoteIn.ChangePurchaseRequestBasedOnRFQExecution. Change Purchase Request based on RFQExecution can update a Purchase Request based on a Request for Quote Execution Confirmation. The operation can be based on Message Type RFQ Execution Confirmation derived from RFQRequest.

The service interface Request for Quote Out is a grouping of operations that requests the Execution of a Request for Quote. It is used in the Process Integration Purchase Request Processing_RFQ Processing.

The operation Request RFQ Execution can request the execution of a Request for Quote for a PurchaseRequest, that was requested from another Process Component. The operation can be based on Message Type RFQ Execution Request derived from RFQRequest. The service interface Purchasing Notification Out can be a grouping of operations that notifies about a Purchase Request. It can be used in the Process Integration Project Processing_Purchase Request Processing. The operation NotifyOfPurchaseRequest can notify about a Purchase Request. The operation can be based on Message Type Purchase Request Notification derived from PurchaseRequest. The Interface Project Task Availability Out can contain the operation to check the account assignment and to receive the result. The account assignment check of accounting objects that are not available locally can be performed synchronously. The Service Interface Project Task Availability Out can be part of the following Process Integration Models: Purchase Request Processing_Project Processing_Coding Block.

In the element AccountingCodingBlockDistributionProcessingProjectTaskAvailabilityOut the operation Request Project Task Availability Information can send a synchronous request to the process component Project Processing to determine whether the tasks exist and whether they are valid from the business perspective. The operation can send a message which is based on the AccountingObjectCheckRequest message type and receives a message which is based on the AccountingObjectCheckConfirmation message type (derived from the dependent object AccountingCodingBlockDistribution). In relation to the AccountingCodingBlockDistributionProcessingProjectTaskAvailability Out.RequestProjectTaskAvailabilityInformation, the PurchaseRequest can request to purchase materials or services. It can contain the items, price and tax information as well as references. Furthermore it can contain identification and administrative information of the request. The elements located at the node PurchaseRequest can be defined by the data type: ProcurementDocumentElements. These elements can include UUID, a universally unique identifier for the PurchaseRequest for referencing purposes; ID, an identifier for the PurchaseRequest assigned by the BuyerParty, of type GDT; ProcessingTypeCode, a coded representation for the processing type of the PurchaseRequest, of type GDT; SystemAdministrativeData, an administrative data stored within the system. These data contain system users and time of creation and last change, of type GDT. Item 258030 may have a cardinality of 1:n. PriceCalculation 258042 (DO) may have a cardinality of 1:1. TaxCalculation 258052 (DO) may have a cardinality of 1:1. BusinessTransactionDocumentReference 258062 may have a cardinality of 1:n. AccessControlList 258074 (DO) may have a cardinality of 1:1. There may be a number of Inbound Aggregation Relationships, including: CreationIdentity may have a cardinality of 1:cn. LastChangeIdentity may have a cardinality of c:cn. Identity that changed the procurement document in the last time. To the business object PurchaseRequest/node Item. PurchasingHierarchyItem may have a cardinality of c:cn Association to purchasing hierarchy item(s). A purchasing hierarchy item can be an item which can be semantically associated with the root; other items with a parent item in an item hierarchy are subordinate items. The Dependent Object PriceCalculation can be a projection of the Dependent Object PriceAndTaxCalculation. It can contain the summary of calculated price information for the PurchaseRequest. The node may contain pricing details for the Items of a PurchaseRequest. Pricing details can be the list of different pricing conditions like ‘manual price’ and ‘discount’ and the calculated resulting price. The Dependent Object TaxCalculation can be a projection of the Dependent Object PriceAndTaxCalculation. It may contain the summary of tax information for the PurchaseRequest. The node may contain tax details for the Items of a PurchaseRequest. Tax details can be the list of contributions of different tax types like ‘value added tax’ or ‘State tax’ to the resulting tax amount. PurchaseRequestBusinessTransactionDocumentReference can be a unique reference to another business transaction document. A PurchaseRequestBusinessTransactionDocumentReference can occur within the following specialisations:

BaseInternalRequestReference: A reference to an InternalRequest which is the basis of the PurchaseRequest.

BasePurchaseRequisitionReference: A reference to a PurchaseRequisition which is the basis of the PurchaseRequest.

BaseProjectPurchaseRequestReference: A reference to a ProjectPurchaseRequest which is the basis of the PurchaseRequest.

PurchaseOrderReference: A PurchaseOrdertReference points to a PurchaseOrder in order to indicate that a PurchaseOrder has been created form the PurchaseRequest.

RFQRequestReference: A RFQRequestReference points to a RFQRequest in order to indicate that a RFQRequest has been created from the PurchaseRequest.

PurchasingContractReference: A PurchasingContractReference points to a PurchasingContract in order to indicate that PurchasingContract has been assigned to the PurchaseRequest as source of supply. The PurchaseRequestBusinessTransactionDocumentReference may contain the following elements that can be defined by the GDT:

ProcurementDocumentBusinessTransactionDocumentReferenceElements that is derived from the GDT BusinessTransactionDocumentReferenceElements.

BusinessTransactionDocumentReference which can be an unique reference to the referred business transaction document. Furthermore, it is possible to have a reference to a line item within the business transaction document. It can be of type GDT: BusinessTransactionDocumentReference.

BusinessTransactionDocumentRelationshipRoleCode may be optional and can be a coded representation of the role of a BusinessTransactionDocument in this reference and can be of type GDT: BusinessTransactionDocumentRelationshipRoleCode. There may be a number of Inbound Association Relationships, including: InternalRequest may have a cardinality of c:c referenced through InternalRequestReference which can occur within the homonymous specialisation. From the business object PurchaseRequisition (cross DU)

PurchaseRequisition may have a cardinality of c:c referenced through PurchaseRequisitionReference which can occur within the homonymous specialisation. From the business object ProjectPurchaseRequest (cross DU) ProjectPurchaseRequest may have a cardinality of c:c referenced through ProjectPurchaseRequestReference which can occur within the homonymous specialisation. From the business object PurchaseOrder PurchaseOrder may have a cardinality of c:cn referenced through PurchaseOrderReference which can occur within the homonymous specialisation. From the business object PurchasingContract PurchasingContract may have a cardinality of c:cn reference to a purchasing contract which may appear in the reference specialization PurchasingContractReference. From the business object RFQRequest (cross DU) RFQRequest may have a cardinality of c:cn referenced through RFQRequestReference which can occur within the homonymous specialisation.

AccessControlList can be defined as a list of access groups that have access to the entire procurement document during a validity period. The AccessControlList is used to control the access to procurement document instances. A PurchaseRequestItem can specify the materials or services which can be purchased and additional information including the required quantity, price information and delivery date information. The PurchaseRequestItem may contain the following elements that can be defined by the data type: ProcurementDocumentItemElements: UUID, a universally unique identifier for the PurchaseRequestItem for referencing purposes, of type GDT; ID, an identifier for the PurchaseRequestItem assigned by the BuyerParty, of type GDT; SystemAdministrativeData, Administrative data stored within the system. These data can contain system users and time of change. It can be of type GDT; TypeCode, and can be a coded representation of the type of the PurchaseRequestItem. The following codes are permitted for a PurchaseRequestItem: Purchasing Material Item 258032, Purchasing Service Item 258034, Purchasing Cost Upper Limit Item 258036, Purchasing Hierarchy Item 258038. A HierarchyRelationship can be the relationship between a subitem and a higher-level parent item in an item hierarchy. It can contain the following elements that can be defined by the IDT: ParentItemUUID, an identifier for the parent PurchaseOrderItem. It can be of type GDT; TypeCode and can be a coded representation of the type of hierarchical relationship between the subitem and its higher-level parent item, of type GDT; Quantity, the quantity of material or service of a PurchaseRequestItem, of type GDT; QuantityTypeCode, a coded representation of a type of the quantity, of type GDT; DeliveryPeriod, a date or timeframe for the requested materials or services; ListUnitPrice, the ordered material or service specified with respect to an order price quantity. E.g. 10 € per 5 Each, of type GDT; NetUnitPrice, a price calculated on the base of the gross price by taking discounts or surcharge rates into account. E.g. 9 € per 5 Each in case of a discount of 10% (see example above), of type GDT; NetAmount, the amount of the PurchaseRequestItem calculated from NetUnitPrice and Quantity. E.g. if NetUnitPrice=9 €/5 Each and Quantity=10 Each→NetAmount=18 €, of type GDT; TaxAmount, the amount of the PurchaseRequestItem calculated from NetAmount, of type GDT; CostUpperLimitAmount, the limit for the total costs that can not be exceeded in an ordering process. The overall limit amount can be specified for purchasing limit items (item type code: 20). With it it's not allowed to specify the ListUnitPrice, the NetUnitPrice, the NetAmount and the TaxAmount for purchasing limit items, of type GDT; CostUpperLimitExpectedAmount, the costs that are actually expected. The expected costs can be equal or less than the maximum permitted costs, of type GDT; MiscellaneousPartialCostUpperLimitAmount, a partial limit for the overall limit for miscellaneous costs. The miscellaneous limit can only be specified if the limit item has a PurchasingContract reference, because the miscellaneous limit defines the costs that are permitted for non-contract related delivery and invoice items. The miscellaneous limit can be less than the overall limit amount. It can be of f type GDT.

An item cost upper limit can be used to define the amount of costs that are permitted for limit items within an ordering process. Limit items are used as placeholders in purchase orders if the exact requirements are unknown at the time of ordering. This can be the case, e.g., for repairs, where the time and spare parts required are not known until the repair has been made. Limit items can have a PurchasingContract reference in order to specify prices and products (materials or services) that may be required during delivery and invoicing. Limit items are typically used for service procurement. It can be important to distinguish between the costs in a procurement process and the limits. The total of all the costs should not exceed the specified cost limit. For example: Cost upper limit of EUR 10,000 for maintenance of printers according to contract 4711. Expected cost of EUR 8,000 for the planned maintenance of the printers. Miscellaneous partial limit of EUR 3,000 for replacing expendable printer parts which are not covered by the contract 4711. A FollowUpDelivery can be information about whether the buyer wants to be informed about delivered materials and services. It may contain the following elements that can be defined by the data type: ProcurementDocumentItemFollowUpDelivery: This code can indicate whether the follow-up documents GoodsAndServiceAcknowledgement or InboundDelivery can be expected or unexpected. Status may contain information about the lifecycle of the PurchaseRequestItem and the results and prerequisites of its processing steps. It may contain the following elements that can be defined by the data type: ProcurementDocumentItemStatus; OrderingStatusCode, the status of the PurchaseRequestItem in regard to the follow-on document PurchaseOrder, e.g. 'ordered', of type GDT; PurchaseRequestBiddingStatusCode, the status of the PurchaseRequestItem in regard to the follow-up document RFQRequest, e.g. 'in bidding', of type GDT; PurchaseRequestFollowUpDocumentStatusCode, the status of the PurchaseRequestItem in regard to the follow-on document, e.g. 'ordered'. This is the overall status for the status variables OrderStatus, TenderingStatus and ContractStatus. Of type GDT; PurchaseRequestSourcingStatusCode, the status of the PurchaseRequestItem, which indicates its state in the sourcing process, e.g. 'manual sourcing'. And can be of type GDT. ItemProduct 258040 may have a cardinality of 1:c.

ItemAccountingCodingBlockDistribution 258060 (DO) may have a cardinality of 1:c. ItemParty 258044 may have a cardinality of 1:cn. ItemLocation 258054 may have a cardinality of 1:cn. ItemBusinessTransactionDocumentReference 258064 may have a cardinality of 1:n. ItemActualValues 258068 may have a cardinality of 1:c. ItemBusinessProcessVariantType 258058 may have a cardinality of 1:cn. ItemAttachmentFolder 258070 (DO) may have a cardinality of 1:c. ItemTextCollection 258072 (DO) may have a cardinality of 1:c. There may be a number of Inbound Association Relationships, including:

ParentItem may have a cardinality of c:cn. Association to a PurchaseRequestItem itself, which can be the relationship between a subitem and a higher-level parent item in an item hierarchy. This can enable item hierarchies to be mapped. The hierarchies can be mapped using the elements HierarchyRelationshipTypeCode and ParentItemUUID.CreationIdentity may have a cardinality of 1:cn and can be the identity that created the procurement document. LastChangeIdentity may have a cardinality of c:cn and can be the identity that changed the procurement document in the last time. From transformed object SourcingList/node Root SourcingList may have a cardinality of 1:cn and can be an association to a SourcingList containing a list of all SourceOfSupply that are valid for the PurchaseRequestItem. Associations to transformed object BusinessDocumentFlow BusinessDocumentFlow may have a cardinality of c:c and can be an association to the BusinessDocumentFlow which can be a view on the set of all preceding and succeeding business (transaction) documents for the current procurement document item. Associations to the node Item can include ChildItem: c:cn (implemented and create-enabled). ChildItem can be a Child item in an item hierarchy. This association can be necessary in order to create item hierarchies. Associations to the node PurchaseRequestItemParty:

BuyerItemParty may have a cardinality of c:c and can be an association to a Party which appears within the BuyerItemParty specialisation. ResponsiblePurchasingUnitItemParty: c:c and can be an association to a party which appears within the ResponsiblePurchasingUnitItemParty specialisation. SellerItemParty may have a cardinality of c:c and can be an association to a Party which appears within the SellerItemParty specialisation. ProposedSellerItemParty may have a cardinality of c:c and can be an association to a Party which appears within the ProposedSellerItemParty specialisation. ServicePerformerItemParty may have a cardinality of c:c and can be an association to a Party which appears within the ServicePerformerItemParty specialisation. RequestorItemParty may have a cardinality of c:c and can be an association to a Party which appears within the RequestorItemParty specialisation. ProductRecipientItemParty may have a cardinality of c:c and can be an association to a Party which appears within the ProductRecipientItemParty specialisation. Associations to the node PurchaseRequestItemLocation: ShipToItemLocation may have a cardinality of c:c and can be an association to a Party which appears within the ShipToLocation specialisation. Associations to the node PurchaseRequestItemBusinessTransactionDocumentReference ItemBaseInternalRequestItemReference may have a cardinality of c:c and can be an association to a BTDReference which appears within InternalBaseRequestItemReference specialisation.ItemBasePurchaseRequisitionItemReference may have a cardinality of c:c and can be an association to a BTDReference which appears within BasePurchaseRequisitionItemReference specialisation. ItemBaseProjectPurchaseRequestItemReference may have a cardinality of c:c and can be an association to a BTDReference which appears within BaseProjectPurchaseRequestItemReference specialisation. ItemPurchaseOrderItemReference may have a cardinality of c:cn and can be an association to a BTDReference which appears within PurchaseOrderItemReference specialization.

ItemRFQRequestItemReference may have a cardinality of c:cn and can be an association to a BTDReference which appears within RFQRequestItemReference specialization. ItemPurchasingContractItemReference may have a cardinality of c:c and can be an association to a BTDReference which appears within PurchasingContractItemReference specialisation. ItemPurchasingContractReference may have a cardinality of c:c and can be an association to a BTDReference which appears within PurchasingContractReference specialisation. There may be a number of associations to the ItemBusinessProcessVariantType.

Including MainItemBusinessProcessVariantType with a cardinality association of c:c which can be an association to a item business process variant type which is the main business process variant type.

There may be a number of Associations to the node PriceCalculationItem including PriceCalculationItem may have a cardinality of 1:1 which can be an association to a PriceCalculationItem. PurchaseRequestItems sometimes could not be assigned automatically or could need a specialist's attendance due to business reasons (high value, critical parts). Therefore a purchaser may need a central point of process flow control for PurchaseRequestItems originating from different scenarios (e.g. self service procurement of end users, project procurement, plant maintenance, MRP) that can result in multiple follow-on documents (PurchaseOrders, RequestsForQuote and PurchasingContracts). Purchaser may have an area where he can process selected PurchaseRequestItems from different PurchaseRequests to find appropriate sources of supply for PurchaseRequestItems, to assure consistence and completeness of PurchaseRequestItems for smooth purchasing processes, to bundle PurchaseRequestItems in order to optimize procurement in terms of processing costs, price advantages etc. and create purchase orders. Furthermore, to create follow-on documents, including seamlessly modify those documents before actual posting.

SubmitToPurchaseOrderGrouping may submit the PurchaseRequestItem to automatic processing for bundled creation of PurchaseOrders. Usually PurchaseRequestItems can be transferred into follow-up documents automatically. Optimization features like rule-based bundling of PurchaseRequestItems can be used in automated processes as well. Sometimes a few PurchaseRequestItems may run into problems and need a purchasers attention. After solving the problem, the regarding PurchaseRequestItems should be sent to automatic processing again, e.g. in order to create PurchaseOrders automatically. There may exist preconditions such as this action can be executed when variable PurchaseRequestSourcing is set to 'In Manual Sourcing'. This action may not be possible when variable PurchaseRequestBidding is set to 'In Bidding'.

There may be changes to the object, in that case, assign the PurchaseRequest to auto grouping process for PurchaseOrder. In the event that there are changes to the status, the Status Grouped for Sourcing By Purchase Order Creation is set in status variable PurchaseRequestSourcing for PurchaseRequestItem.

The action SubmitToRequestForQuoteGrouping can submits PurchaseRequestItem to automatic processing for bundled creation of RequestsForQuote. Usually PurchaseRequestItems can be transferred into follow-up documents automatically. Optimization features like rule-based bundling of PurchaseRequestItems can be used in automated processes as well. Sometimes a few PurchaseRequestItems may run into problems and need a purchasers attention. After solving the problem, the regarding PurchaseRequestItems can be sent to automatic processing again, e.g. in order to create RequestsForQuote automatically. Preconditions may exist including that this action can be executed when variable PurchaseRequestSourcing is set to 'In Manual Sourcing'. This action may not be possible when variable PurchaseRequestBidding is set to 'In Bidding'. Changes to the object can occur, if they do occur, it is possible to assign the PurchaseRequest to auto grouping process for RFQRequest. Changes to the status may occur, if they do occur, the Status Grouped for Sourcing By RFQRequest Creation can be set in status variable PurchaseRequestSourcing for PurchaseRequestItem. The action ChangeOrganisationalAssignment can assigns the organisational assignment of the current purchaser to the PurchaseRequestItem. Should Changes to the object occur, the PurchaseRequestItem can be assigned the organisational assignment of the current purchaser.

The action ProposeSourceOfSupply can proposes a source of supply for the PurchaseRequestItems. PurchaseRequestItems without a source of supply can be assigned one before a PurchaseOrder can be created. Therefore sources of supply can be proposed by this action to be assigned by the purchaser.

The SellerParty can be added or replaced in the PurchaseRequestItem. When a PurchasingContract is given, a PurchasingContractReference can be added to BTDReference and BTDItemReference. The action elements can be defined by the data type: ProcurementDocumentItemAssignSourceOfSupplyActionElements. These elements can include PurchasingContractReference, an ID of a PurchasingContract that will be assigned as SourceOfSupply and can be of type GDT; SellerPartyID; ID of a seller that will be assigned as SourceOfSupply, and can be of type GDT. The seller and the purchasing contract can be possible sources of supply.

The action RemoveSourceOfSupply can remove a SourceOfSupply from the PurchaseRequestItem Preconditions can exist such as a status variable PurchaseRequestSourcing may not set to 'Not in Sourcing'.

Changes to the object can occur and then the SellerParty can be removed from PurchaseRequestItemParty and when available the ContractReference can be removed from BTDReference and BTDItemReference. The action Cancel can cancels the PurchaseRequestItem. When a PurchaseRequestItem shall not be procured because it may contradict a purchasing strategy or it is inefficient to procure a small remaining quantity, it can be canceled. That means, the PurchaseRequestItem may no longer be processed by the organisational purchasing unit. Preconditions may exist such as this action can be executed when variable PurchaseRequestSourcing is set to 'In Manual Sourcing'. Changes to the object can occur such as cancel the PurchaseRequestItem, i.e. the item will not be procured. Should changes to the status occur the Status Canceled can be set in status variable Cancellation for PurchaseRequestItem. The action TransferToManualSourcing can transfers a PurchaseRequestItem that may be scheduled for automatic processing to manual sourcing in order to process the PurchaseRequestItem manually by a purchaser.

Preconditions may exist such that this action can be executed when variable PurchaseRequestSourcing is set to 'Grouped for Sourcing By Purchase Order Creation' or 'Grouped for Sourcing By Request for Quote Creation'. Changes to the object may occur such that an item, which can be in status 'Grouped for Sourcing By Purchase Order Creation' or 'Grouped for Sourcing By Request for Quote Creation' can be transferred to manual sourcing. Changes to the status can occur such that status 'In Manual Sourcing' can be set in status variable PurchaseRequestSourcing for PurchaseRequestItem. The action CreatePurchaseOrder can create and save a PurchaseOrder. Preconditions can exist such that this action can be executed when variable PurchaseRequestSourcing is set to 'In Manual sourcing' or. 'Grouped for Sourcing By Purchase Order Creation'. Changes to the object can occur such that an item, where a follow-up PurchaseOrder can be created for will get an update of BTD references and actual values accordingly. Changes to the status can occur such that the status Ordered can be set in status variable Ordering for PurchaseRequestItem.

Parameters can exist such that the action elements can be defined by the data type: PurchaseRequestItemCreatePurchaseOrderActionElements. These elements can include: DeliveryPeriodGroupRelevanceIndicator, ShipToLocationGroupRelevanceIndicator, and CreateRequestForQuote. DeliveryPeriodGroupRelevanceIndicator may be optional and can be a purchase order creation that can be grouped by DeliveryPeriod. DeliveryPeriodGroupRelevanceIndicator can be of type GDT: Indicator and of Qualifier: RelevanceIndicator. ShipToLocationGroupRelevanceIndicator may be optional and can be a purchase Order creation that can be grouped by ShipToLocation. ShipToLocationGroupRelevanceIndicator can be of type GDT: Indicator and of Qualifier: RelevanceIndicator. CreateRequestForQuote can create and save a RFQRequest in order to create a Request for Quote. Preconditions may exist such that this action can be executed when variable PurchaseRequestSourcing is set to 'In Manual Sourcing' or 'Grouped for Sourcing By Request for Quote Creation'. Changes to the object can occur such that an item, where a follow-up RFQRequest is created for can get an update of BTD references. Changes to the status can occur such that status 'In Bidding' can be set in status variable PurchaseRequestBidding for PurchaseRequestItem. The action CheckOrderQuantity can set the status variable Ordering to 'Not Ordered', 'Ordered' or 'Partially Ordered' according to the difference of ordered and requested quantity, after changing one of those quantities.

The action ReceiveRequestForQuoteFinalisation can set status 'Not in Bidding' in status variable PurchaseRequestBidding for the PurchaseRequestItem. A PurchaseRequestItem that can be in status 'In Bidding' can get the information, that the RFQRequest has been cancelled or has been fulfilled. If an open quantity exists after RFQRequest finalisation, the PurchaseRequestItem can be available for manual sourcing again. PurchaseRequest functionality can be used to inform a purchaser about changes done to a PurchaseRequestItem where requested quantity is less than or equal to the OrderQuantity before and after the change is now covered by BTM task "notify change". This query can provide a list of all PurchaseRequestItemNodes which can satisfy the selection criteria, specified by the query elements, combined by logical "AND". If no selection criterion is specified, it can be checked whether the query element matches to the corresponding element of the Business Object. GDT: PurchaseRequestItemQueryElements can define the query elements: ProcurementDocumentID, of type GDT; ProcurementDocumentName, of type GDT; Description, of type GDT; DeliveryPeriod, of type GDT; Status, of type GDT; PurchaseRequestFollowUpDocumentStatusCode, of type GDT; PurchaseRequestSourcingStatusCode, of type GDT; PurchaseRequest CancellationStatusCode, of type GDT; ItemAccountingCodingBlockDistributionItemProjectReference, of type GDT; ProcurementDocumentBaseBusinessTransactionDocumentID, of type GDT; ProcurementDocumentBusinessTransactionDocumentReferenceTypeCode, of type GDT; ItemBusinessTransactionDocumentReferenceInternalRequestReference, of type GDT; ItemBusinessTransactionDocumentReferencePurchaseOrderReferenceOptional, of type GDT; ItemBusinessTransactionDocumentReferencePurchaseRequisitionReference, of type GDT; ItemBusinessTransactionDocumentReferencePurchasingContractReference, of type GDT;

ItemBusinessTransactionDocumentReferenceProjectPurchaseRequestReference, of type GDT; ItemBusinessTransactionDocumentReferenceRFQRequestReference, of type GDT; ItemProductProductID, of type GDT; ItemProductProductCategoryInternalID, of type GDT; ItemPartySellerID, of type GDT; ItemPartyRequestor PartyID, of type GDT; ItemPartyProductRecipientPartyID, of type GDT; and ItemPartyResponsiblePurchasingUnitItemPartyID, of type GDT. Whenever PurchaseRequestItem is mentioned, the PurchaseRequestItem with its remaining quantity can be considered. PurchaseRequestItemScheduleLines can be omitted on purpose. They can be part of PurchaseRequirementRequest message but can be mapped to a single quantity field in PurchaseRequestItem.

PurchaseRequestItemProduct can be the identification, description and classification of the requested product within the PurchaseRequestItem that can be requested. The PurchaseRequestItemProduct can contain the following elements that can be defined by the data type: ProcurementDocumentItemProductElements that can be derived from the data type BusinessTransactionDocumentProductElements; ProductUUID, a universally unique identifier for a product, of type GDT; ProductID, a proprietary identifier for a product, of type GDT; ProductStandardID, a standardized identifier for this product, whose identification scheme is managed by an agency from the DE 3055 code list, of type GDT; ProductSellerID, an identifier that is used proprietarily by the SupplierParty for this product, of type GDT; ProductTypeCode, a coded representation of the type of a product; ProductCategoryUUID, a universally unique identifier for a product category. When a Product is referenced through element ProductID, element ProductCategoryUUID, ProductCategoryInternalID and ProductCategoryStandardID are copied from the referenced Product. The category copied from the Product is the one belonging to the purchasing hierarchy. If there is no reference to a Product, the product category can be chosen freely. Of type GDT; ProductCategoryInternalID, a proprietary identifier used by the BuyerParty for a product category. Of type GDT; ProductCategoryStandardID, a standardized identifier for a product category, whereby the identification scheme used is managed by an agency from the code list DE 3055. Of type GDT; ProductCatalogueReference, a unique reference to a catalog or to an object within a catalog. Of type GDT. The PurchaseRequestItemProduct can have an aggregation relationship to a Material, ServiceProduct or ProductCatalogItem. If none of these aggregations exist, the product note can be specified.

The PurchaseRequestItemProduct can have an aggregation relationship to a ProductCategory. A product category can be a division of products according to objective criteria. The product category can automatically be derived from the Material or ServiceProduct if product identification is specified. However, a Material or ServiceProduct can also be specified by natural linguistic text. In this case a ProductCategory can be assigned manually. There may be a number of Inbound Association Relationships, including: From the business object Material. Material may have a cardinality of c:cn. The PurchaseRequestItemProduct may represent the Product specialisation Material if a PurchaseRequestItemProduct contains a Material.

From the business object ServiceProduct, ServiceProduct may have a cardinality of c:cn. The PurchaseRequestItemProduct may represent the Product specialisation ServiceProduct if a PurchaseRequestItemProduct contains a ServiceProduct. From the business object ProductCategoryHierarchy/node ProductCategory, ProductCategory: 1:cn. The PurchaseRequestItemProduct may represent a ProductCategory that classifies the invoiced Material or ServiceProduct. Distribution of value changes from a purchase request item to coding blocks, whereby the distribution may occur on the basis of amounts, quantities, or percentages.

A coding block can be a set of accounting objects of different types. An accounting object can be a business object to which value changes from business transactions can be assigned in Accounting. For example, a cost center or a profit center. A ItemParty may reference using the inbound aggregation relationship from TO Party and can have a business partner or one of its specializations (for example, customer, supplier, employee). Furthermore one of the following specializations of an organizational center: Company, CostCentre, ReportingLineUnit, and FunctionalUnit. A ItemParty may exist without reference to a business partner or an organizational unit. This would be a Casual Party, which is a party without reference to master data in the system. The external identifier and the description can be contained in the business document. A PurchaseRequestItemParty can occur within the following specialisations:

BuyerItemParty: The BuyerItemParty can be the party on the behalf of which the PurchaseRequestItem can be created. The BuyerParty can be the business object Company.

A PurchaseRequestItem can be ordered when the BuyerParty is provided. A PurchaseRequestItem can contain one BuyerParty. For a BuyerItemParty, a ItemPartyContactParty 258046 can be maintained.

A ResponsiblePurchasingUnitParty can be the party responsible for operational or strategic purchasing. A PurchaseRequestItem can contain one ResponsiblePurchasingUnitItem-Party. For a ResponsiblePurchasingUnitItemParty, a ItemPartyContactParty can be maintained. A SellerItemParty can be a party that sells products and/or services. The business object Supplier can be the SellerItemParty. A PurchaseRequestItem can contain one SellerItemParty. For a SellerItemParty, an ItemPartyContactParty can be maintained. The ProposedSellerItemParty can be the party that may be able to sell the required materials or services and can be treated as proposal for the SellerItemParty. The business object Supplier can be the ProposedSellerItemParty. The PurchaseRequestItem can contain one ProposedSellerItemParty. For a ProposedSellerItemParty, a ItemPartyContactParty can be maintained. The ServicePerformerItemParty can be the party that physically provides a service in the name of the Supplier which can be referenced by the SellerItemParty. The ServicePerformerItemParty can act in the name of the SellerItemParty assigned to the PurchaseRequestItem node. The PurchaseRequestItem can contain one ServicePerformerItemParty. The ServicePerformerItemParty can be a natural person in service processes. As the ServicePerformerItemParty referes to a Person already, no PartyContactParty can be maintained for this Party. The RequestorItemParty can be the party that initiates the purchasing process through a request of some kind. E.g., this can be the person that creates an InternalRequest that is transferred into a PurchaseRequest. The business object Employee can be the RequesterItemParty. The Requestor Party can be obligatory for the PurchaseRequestItem. The PurchaseRequestItem can contain one RequestorItemParty. If the RequestorItemParty is not an Employee, a PartyContactParty can be maintained. A ProductRecipientItemParty can be the party to which goods are delivered or for which services can be performed. The business object Employee can be the ProductRecipientItemParty. It can be obligatory that the PurchaseRequestItem has either a ProductRecipientItemParty or a ShipToItemLocation. The PurchaseRequestItem can contain one ProductRecipientItemParty. If the ProductRecipientItemParty is not an Employee, a PartyContactParty can be maintained.

The ItemParty can contain the following elements that can be defined by the GDT: ProcurementDocumentItemPartyElements that can be derived from the GDT BusinessTransactionDocumentPartyElements; UUID, This attribute may not be deleted from the template in the projection. Of type GDT; PartyID, an identifier of the <BO Node>Party in this PartyRole in the business document or the master data object. Of type GDT; PartyUUID, a unique identifier for a business partner, the organizational unit, or their specializations. Of type GDT; PartyTypeCode, a type of the business partner, organizational unit, or their specializations referenced by the attribute PartyUUID. Of type GDT; RoleCategoryCode, a Party Role Category of the <BO Node>Party in the business document or the master data object. Of type GDT; RoleCode, a Party Role of the <BO Node>Party in the business document or the master data object, of type GDT; AddressReference, a reference to the address of the Party. Of type GDT; DeterminationMethodCode, a coded representation of the determination method of the Party. Of type GDT. There may be a number of Inbound Aggregation Relationships, including: Party may have a cardinality of c:cn. To transformed object UsedAddress/node Root, UsedAddress may have a cardinality of c:c The transformed object UsedAddress can represent a uniform way to access a party address of a procurement document whether it's a business partner address, a organization center address or an address specified within a procurement document.

A PartyContactParty can be a natural person or organizational unit that can be contacted for the Party. The contact may be a contact person or, for example, a secretary's office. Usually, communication data for the contact can be available. The elements that can be located at the node PartyContact can be defined by the data type ProcurementDocumentPartyContactElements. (Data type ProcurementDocumentPartyContactElements can be derived from the data type BusinessTransactionDocumentPartyContactElements.); UUID, a globally unique identifier for a contact. Of type GDT; PartyID, an identifier of the contact in this PartyRole in the business document or the master data object; PartyUUID, a unique identifier of the contact in this PartyRole in the business document or the master data object, of type GDT; PartyTypeCode, a type of the business partner, organizational unit, or their specializations referenced by the attribute PartyUUID. Of type GDT; AddressReference, a reference to the address of the Party. Of type GDT; DeterminationMethodCode, a coded representation of the determination method of the Party. Of type GDT; ItemPartyContactPartyAddress 258048 (DO) may have a cardinality of 1:c. There may be a number of Inbound Aggregation Relationships, including: Party may have a cardinality of c:cn and can be a referenced Contact Party in Master Data. UsedAddress may have a cardinality of c:cn. ItemPartyContactPartyAddress (DO) can be a procurement document specific address of the ItemParty.

ItemPartyAddress 258050 (DO) can be a PurchaseRequestItemPartyAddress that can be a PurchaseRequestItem specific address of a party. PurchaseRequestItemLocation is a physical place where the goods have been delivered or where a service will be provided. The PurchaseRequestItemLocation can occur within the following specialisations: ShipToItemLocation: A ShipToItemLocation is the place, where to the goods have been delivered or where a service will be provided. ReceivingItemSite: A ReceivingItemSite is a site, for which a Purchasing Contract is valid.

The ItemLocation can contain the following elements that can be defined by the GDT: ProcurementDocumentItemLocationElements that can be derived from the GDT BusinessTransactionDocumentLocationElements; UUID, a globally unique identifier of the procurement document location for referencing purposes. Of type GDT; LocationID, an identifier of the referenced Location. Of type GDT; LocationUUID, a globally unique identifier of the Location referenced. Of type GDT; RoleCategoryCode, a coded representation of the Location role category in the procurement document. Of type GDT; RoleCode, a coded representation of the Location role in the procurement document. Of type GDT; Address- Reference, a reference to the address of the Party. Of type GDT; DeterminationMethodCode, a coded representation of the determination method of the Party. Of type GDT. ItemLocationAddress 258056 (DO) may have a cardinality of 1:c. There may be a number of Inbound Aggregation Relationships, including: Location may have a cardinality of c:cn. A Location can be a place from which or to which goods were shipped or services can be performed that may be relevant for the tax calculation within the purchasing process. From the business object Party/Node AddressInformation, PartyAddressInformation may have a cardinality relationship of c:cn. UsedAddress may have a cardinality of c:c. The transformed object UsedAddress can represent a uniform way to access a location address of a procurement document whether it's a business partner address, a organization center address or an address specified within a procurement document. A logical place for example can be the reception in an office building or gate 3 of a production plant. Propagation can be used for all Locations, i.e. Locations that are specified at ProcurementDocument level are used for all items if not otherwise specified on item level.

A PurchaseRequestItemLocationAddress can be a PurchaseRequestItem specific address of a location. PurchaseRequestItemBusinessTransactionDocumentReference can be a unique reference to an Item of another business transaction document. A PurchaseRequestItemBusinessTransactionDocumentReference can occur within the following specialisations: ItemBaseInternalRequestItemReference: A reference to an InternalRequestItem which is the basis for the PurchaseRequestItem. ItemBasePurchaseRequisitionItemReference: A reference to a PurchaseRequisitionItem which is the basis for the PurchaseRequestItem.

ItemBaseProjectPurchaseRequestItemReference: A reference to a ProjectPurchaseRequestItem which can be the basis for the PurchaseRequestItem. ItemPurchaseOrderItemReference can be a PurchaseOrdertItemReference points to a PurchaseOrderItem in order to indicate that a PurchaseOrderItem has been created form the PurchaseRequestItem. ItemPurchasingContractItemReference can be a PurchasingContractItemReference points to a PurchasingContractItem in order to indicate that the PurchaseRequestItem is using the PurchasingContractItem as source of supply. ItemPurchasingContractReference can be an ItemPurchasingContractReference points to a PurchasingContract. This relation can indicate that the PurchaseRequestItem can be using the PurchasingContract as source of supply. This reference can be available for Items of type 'Limit'. ItemRFQRequestItemReference can be a reference to a RFQRequestItem which can be created for a PurchaseRequestItem in order to execute a RFQ.

The PurchaseRequestItemBusinessTransactionDocumentReference can contain the following elements that are defined by the GDT: ProcurementDocumentItemBusinessTransactionDocumentReferenceElements that can be derived from the GDT BusinessTransactionDocumentReferenceElements. BusinessTransactionDocumentReference which can be an unique reference to the referred business transaction document. Furthermore, it can be possible to have a reference to a line item within the business transaction document. It can be of type GDT: BusinessTransactionDocumentReference. BusinessTransactionDocumentRelationshipRoleCode may be option and can be a coded representation of the relationship role of a BusinessTransactionDocument in this reference. It can be of type GDT: BusinessTransactionDocumentRelationshipRoleCode. There may be a number of Inbound Association Relationships, including: From the business object InternalRequest/node item (cross DU)

InternalRequestItem may have a cardinality of c:c and can be referenced through specialisation InternalRequestItemReference. From the business object PurchaseRequisition/node item (cross DU) PurchaseRequisitionItem may have a cardinality of c:c and can be referenced through specialisation PurchaseRequisitionItemReference. From the business object ProjectPurchaseRequest/node item (cross DU)

ProjectPurchaseRequestItem may have a cardinality of c:c and can be referenced through specialisation ProjectPurchaseRequestItemReference. From the business object PurchaseOrder/node item PurchaseOrderItem may have a cardinality of c:cn and can be referenced through specialisation PurchaseOrderItemReference. From the business object PurchasingContract/node item PurchasingContractItem may have a cardinality of c:cn and can be a reference to a Purchasing Contract Item which may appear in the reference specialization Source of Supply, Master Copy or Purchasing Contract Item that has been created from the Purchase Request Item. From the business object PurchasingContract/node Root PurchasingContract may have a cardinality of c:cn and can be referenced through the specialization ItemPurchasingContractReference. From the business object RFQRequest/node item (cross DU) RFQRequestItem may have a cardinality of c:cn and can be referenced through a RFQRequestItemReference.

ProcurementDocumentItemBusinessTransactionDocumentReferenceActualValues 258066 can be the actually achieved or performed values of a business transaction document referenced by a procurement document item. ProcurementDocumentItemBusinessTransactionDocumentReferenceActualValues can contain the following elements that can be defined by the data type: ProcurementDocumentItemBusinessTransactionDocumentReferenceActualValuesElements. ActiveIndicator, indicates whether the referenced business transaction document can be commercially active in a procurement process or not. Of type GDT; Amount, the amount of the referenced business transaction document for the procurement document item. Of type GDT; AmountRoleCode, The amount role code can be a coded representation of the role of the amount in the referenced business transaction document. Of type GDT; CancellationDocumentIndicator, indicates whether the referenced business transaction document is a cancellation document or not. Of type GDT; Quantity, and can be the quantity of the referenced business transaction document for the procurement document item. Of type GDT; QuantityRoleCode, and can be the quantity role code is a coded representation of the role of the quantity in the referenced business transaction document. Of type GDT; QuantityTypeCode, and can be a coded representation of a type of quantity in the referenced business transaction document for the procurement document item. Of type GDT. Quantity, QuantityRoleCode and QuantityTypeCode can be specified for purchasing material and service items. The PurchaseRequestItemActualValues are the actually achieved or performed values, i.e. acknowledged or delivered and invoiced quantities and amounts for a PurchaseRequestItem. PurchaseRequestItemActualValues can contain the following elements that can be defined by the GDT: ProcurementDocumentItemActualValuesElements.TotalOrderQuantity, Total quantity of order goods and services which have been captured for the PurchaseOrderItem. Of type GDT; TotalOrderQuantityTypeCode, a coded representation of the type of the total order quantity, of type GDT; TotalOrderNetAmount, a total net amount of order goods and services which have been captured for the PurchaseOrderItem. Of type GDT; TotalOrderedQuantity, a total quantity of ordered goods and services for the PurchaseOrderItem. Of type GDT; TotalOrderedQuantityTypeCode, a coded representation of the type of the total ordered quantity. Of type GDT; TotalOrderedNetAmount, a total net amount of ordered goods and services for the PurchaseOrderItem. Of type GDT. A procurement document BusinessProcessVariantType can define the character of a business process variant of the PurchaseRequestItem. It can represent a typical way of processing of a procurement document within a process component from a business point of view. A Business Process Variant can be a configuration of a Process Component. A Business Process Variant can belong to one process component. A process component can be a software package that can realize a business process and exposes its functionality as services. The functionality can contain business transactions. A process component can contains one or more semantically related business objects. A business object can belong to one process component. The elements located at the node PurchaseRequestItemBusinessProcessVariantType can be defined by the data type: ProcurementDocumentBusinessProcessVariantTypeElements. These elements can include:

BusinessProcessVariantTypeCode: A BusinessProcessVariantTypeCode is a coded representation of a business process variant type of a procurement document business process variant type and can be of type GDT: BusinessProcessVariantTypeCode. The MainIndicator can be an indicator that can specify whether the current business process variant type is the main one or not and can be of type GDT: Indicator and of Qualifier: Main. One of the instances of the BusinessProcessVariantType can be indicated as main. Dependent Object ItemAttachmentFolder can be an electronic document linked to the Item that can be relevant for the purchasing process. ItemTextCollection (DO) A PurchaserequestItemTextCollection can be a natural-language text linked to the PurchaseRequestItem that may be relevant for the purchasing process. The following types of text collection can occur: An internal note details the request and is addressed to internal recipients only, an external note gives additional information about request and is addressed to external recipients like supplier, and a note used to enable communication between approval item processors within the approval process.

FIGS. 259-1 through 259-10 illustrate one example logical configuration of PurchaseRequestConfirmation message 259000. Specifically, this figure depicts the arrangement and hierarchy of various components such as one or more levels of packages, entities, and datatypes, shown here as 259000 through 259254. As described above, packages may be used to represent hierarchy levels. Entities are discrete business elements that are used during a business transaction. Data types are used to type object entities and interfaces with a structure. For example, PurchaseRequestConfirmationMessage message 259000 includes, among other things, PurchaseRequest 259014. Accordingly, heterogeneous applications may communicate using this consistent message configured as such.

FIGS. 260-1 through 260-15 illustrate one example logical configuration of PurchaseRequestNotificationMessage message 260000. Specifically, this figure depicts the arrangement and hierarchy of various components such as one or more levels of packages, entities, and datatypes, shown here as 260000 through 260394. As described above, packages may be used to represent hierarchy levels. Entities are discrete business elements that are used during a business transaction. Data types are used to type object entities and interfaces with a structure. For example, PurchaseRequestNotificationMessage message 260000 includes, among other things, PurchaseRequestNotification 260014. Accordingly, heterogeneous applications may communicate using this consistent message configured as such.

FIGS. 261-1 through 261-20 illustrate one example logical configuration of PurchaseRequestMessage message 260000. Specifically, this figure depicts the arrangement and hierarchy of various components such as one or more levels of packages, entities, and datatypes, shown here as 261000 through 261498. As described above, packages may be used to represent hierarchy levels. Entities are discrete business elements that are used during a business transaction. Data types are used to type object entities and interfaces with a structure. For example, PurchaseRequestMessage message 261000 includes, among other things, PurchaseRequestNotification 261014. Accordingly, heterogeneous applications may communicate using this consistent message configured as such.

PurchaseRequest Interfaces

In A2A processes, purchase request interfaces can be used to exchange purchase requisitions for products (materials, services) between a requester (in the PTS scenario, an MRP controller, for example) and a buyer, confirmations that these requisitions have been fulfilled and notifications for external process components to inform about purchase requisitions. The motivating business scenario for the PurchaseRequestRequest and PurchaseRequestConfirmation interfaces can be the Procure to Stock (PTS) scenario. In the PTS scenario, a planning system (SCP) can generate purchase requisitions that can be procured externally by a procurement system (SRM). The message type PurchaseRequestNotification can be motivated by processes, where external process components are notified about the creation of a new PurchaseRequest or the change of an existing one. The motivating business scenario for the PurchaseRequestNotification interface can be the Service Procurement (SP) scenario. In the SP scenario, an InternalRequest with an account assignment to a project system (PRO) creates a PurchaseRequest to be procured by a procurement system (SRM). Project gets the information of the PurchaseRequest via a PurchaseRequestNotification and creates a corresponding ProjectPurchaseRequest in their own DU. Two messages types may be available for mapping an A2A requisition process: The message type PurchaseRequestRequest can be sent from the requester (a requirements planner in the PTS scenario or a planning/requirements system, for example) to the buyer. It can be used to start a new requisitioning process. From now on, this document will simply use the terms 'requester' and 'buyer'. The message type PurchaseRequestConfirmation can be sent from the buyer to the requester. It can inform the requester of the extent to which the requirement has been fulfilled. The message type PurchaseRequestNotification can be sent from the buyer to an external process component e.g. Project, which can be assigned by the accounting data, to inform about the created PurchaseRequest. A PurchaseRequestRequest can be a request from a requester asking a buyer to procure products (materials or services) externally. The structure of the message type PurchaseRequestRequest can be specified by the message data type PurchaseRequestMessage. A PurchaseRequestRequest message can result in the relevant requisition being created or changed in the procurement system. The procurement system can accept all changes made to a requisition (except technical errors). If the procurement system (buyer) cannot procure a requisition or partial quantity of a requisition (rejection), the procurement system can indicate this by outputting the PurchaseRequirementConfirmation message. A PurchaseRequestConfirmation can be a confirmation of the buyer that can inform the requester of the extent to which a requisition has been fulfilled. The structure of the PurchaseRequestConfirmation message type can be specified by the PurchaseRequestConfirmationMessage data type. A PurchaseRequestNotification can be a notification of the buyer that informs an external process component, e.g. Project that a PurchaseRequest was created or an existing one was changed. The structure of the PurchaseRequestNotification message type can be specified by the PurchaseRequestNotificationMessage data type. The PurchaseRequestNotification message can comprise the business object PurchaseRequest and can be implemented from the sending process component PurchaseRequestProcessing. If a procurement system (buyer) cannot fulfill a requisition or partial quantity of a requisition, the buyer can indicate this by outputting the PurchaseRequirementConfirmation message. The buyer may not be able cancel a rejection of a requisition.

Message Choreography

The requester can start the requisition process by sending a PurchaseRequestRequest message. The PurchaseRequestRequest message can request a buyer to fulfill a requisition generated by the requester. The requisition system can use this message when requisitions are created or changed.

The buyer can use the PurchaseRequestConfirmation message to tell the requester which follow-up documents for each item have been created and how much of the required quantity has been procured. The buyer can also tell the requester if a requisition or partial quantity of a requisition can no longer be fulfilled. If the requirements-generating system manages the relevant follow-on documents itself or receives a copy of them and can carry out quantity offsetting in the requisition (as in the PTS scenario), the requirements-generating system can require the Confirmation message if the requisition or a remaining quantity can no longer be procured. The procurement system can send the PurchaseRequestConfirmation if a purchase requisition item has been changed (once a purchase order with reference to a requisition has been created or changed, for example). The current procurement status can be transferred in full with every PurchaseRequest message. Data that has not been transferred can implicitly be classified as deleted. This can especially be the case for items that have not been transferred.

Referring to the serialization of messages, in the requisition process, the messages can be sent once in order (EOIO) and serialized using message queues. Error Handling can be performed in accordance with the communication paradigms, forward processing can be used to resolve errors. A recipient system can accept every formally correct incoming message. Business problems can be resolved on the recipient side.

Interfaces

The PurchaseRequest messages can be implemented by four message interfaces (two requisition side and two buyer side). Requirement side can include PurchaseRequestRequest_Out, PurchaseRequestConfirmation_In, and PurchasingNotification_In. The Buyer side can include PurchaseRequestRequest_In, PurchaseRequestConfirmation_Out, and PurchasingNotification_Out. The message data type PurchaseRequestMessage can contain the PurchaseRequest object contained in the business document in the view for the PurchaseRequest and Business information relevant for sending a business document in a message. A MessageHeader package can group business information relevant for sending a business document in a message. A MessageHeader can group together business information from the point of view of the sending application for business document identification in a message. It can be of the type GDT: BusinessDocumentMessageHeader and whereby the following element of the GDT can be used: ID. The PurchaseRequest package groups the PurchaseRequest together along with its packages. It can include Party package, Location package, and Item package. A PurchaseRequest can be a requirement of the requester for the external procurement of products (materials or services). The PurchaseRequest can be subdivided into PurchaseRequestItems that each specify an ordered product or additional information relevant for such a product, such as information about product category or value limits. In addition to the buying party and the seller as well as the proposed seller, additional parties can be involved in the PurchaseRequest. Locations can be specified for the PurchaseRequest delivery. PurchaseRequest can be of type GDT: PurchaseRequest. PurchaseRequest contains the following elements: BaseBusinessTransactionDocumentID: the BaseBusinessTransactionDocumentID can be the unique identifier assigned by the requisition system for the requisition. The BaseBusinessTransactionDocumentID can be of type GDT: BusinessTransactionDocumentID. BaseBusinessTransactionDocumentUUID: the BaseBusinessTransactionDocumentUUID can be the Universally Unique Identifier assigned by the requisition system for the requisition. The BaseBusinessTransactionDocumentUUID can be of type GDT: UUID.

BaseBusinessTransactionDocumentTypeCode: The BaseBusinessTransactionDocumentTypeCode can be the coded representation of the object type, on which the requirement can be based. The BaseBusinessTransactionDocumentTypeCode can be of type GDT: BusinessTransactionDocumentTypeCode. PostingDateTime: Time of creation of the requisition in the requisition system. PostingDateTime is of the type GDT: DateTime. A short description/title of the requisition. It can be of type GDT: Note. A short description/title of the requisition. Name can be of the type GDT: MEDIUM_Name. Attribute ReconciliationPeriodCounterValue: ReconciliationPeriodCounterValue can be a counter for reconciliation periods and it can be of type GDT: CounterValue. PurchaseRequestParty-Package can includes BuyerParty, SellerParty, Vendor Party, ProposedSellerParty, ProposedVendor Party, ServicePerformerParty, Requestor Party, ProductRecipientParty, ManufacturerParty. Either the ID or the ID and address can be transferred for each party. If the ID can be transferred, the ID address defined in the master data can be used. If the ID and address can be transferred, the ID can identify the party and the address can be deemed to be a document address that can be different from the master data address. If possible, the ID and address should be sent to avoid misunderstandings. The receiving application should implement a suitable optimization strategy to prevent many identical document addresses from being created.

A default logic can be used for all parties: from the header to the items and within item hierarchies. Parties specified in the header can be used for all the items for which a corresponding party can not be explicitly transferred and that can be directly assigned to the header. In accordance with the same logic, parties transferred at item level can be used for subitems assigned to the relevant item in an item hierarchy. The default logic applies for the party as a whole, including the contact person. Parts of a party specified at header level or for a hierarchy item cannot be specified in more detail at item level. The default logic can be a simplified version of the transmitted message. Logically, parties at header level and hierarchy items can behave as if they have been explicitly transferred for all the subitems of the message. A BuyerParty can be a party that buys goods or services. The BuyerParty can be of type GDT: BusinessTransactionDocumentParty, although it can contain the StandardID and InternalID elements, as well as the Address and ContactPerson entities. The ContactPerson contains only the InternalID element and the Address entity. The BuyerParty can be specified if more than one company processes its purchases in the recipient system (hosting scenario). In all other cases, the BuyerParty can be unique and does not need to be specified. Changes can be made to the BuyerParty/Contact and a different BuyerParty/Contact can exist for each item. Changes can be made to the address of the BuyerParty, but different addresses may not be permitted for each item. If the ShipToLocation, ProductRecipientParty, and Requestor Party have not been specified in the requisition process, the address of the BuyerParty can be used as the ship-to address. A SellerParty can be a party that sells goods or services. The SellerParty can be of type GDT: BusinessTransactionDocumentParty, although it may contain the StandardID and InternalID elements, as well as the Address and ContactPerson entities. The ContactPerson may contain the InternalID element and the Address entity. If the Vendor Party and ShipFromLocation have not been specified in the requisition process, the address of the SellerParty can be used as the ship-from address. A Vendor Party can be a party that delivers goods or provides services. The Vendor Party can be of type GDT: BusinessTransactionDocumentParty, although it can contain the StandardID and InternalID elements, as well as the Address and ContactPerson entities. The ContactPerson can contain the InternalID element and the Address entity. If no ShipFromLocation is specified in an invoice, the address of the Vendor Party can be the ship-from address. If the Vendor Party is specified at the time of creation of the requisition in the procurement system, it can then be accepted as the vendor (in contrast to preferred vendor). If the vendor in the requisition system it is found by using the source of supply then, as a rule, the Vendor Party can be adopted. In this case, the source of supply corresponding to the entity BusinessTransactionDocumentReference package can also be given. A ProposedSellerParty can be a preferred party for selling goods or services. The ProposedSellerParty can be of type GDT: BusinessTransactionDocumentParty, although it can contain the StandardID and InternalID elements, as well as the Address and ContactPerson entities. The ContactPerson may contain the InternalID element and the Address entity. When a requisition is created, a user can specify a preferred vendor. In the procurement system, the professional buyer can use the preferred vendor as the actual vendor. A ProposedVendor Party can be a desired party that delivers goods or provides services. The ProposedVendor Party can be of type GDT: BusinessTransactionDocumentParty, although it may contain the StandardID and InternalID elements, as well as the Address and ContactPerson entities. The ContactPerson may contain the InternalID element and the Address entity. When a requisition is created, a user can specify a preferred vendor. In the procurement system, the professional buyer can use the preferred vendor as the actual vendor.

A ServicePerformerParty can be a party that delivers a service. The ServicePerformerParty can be of type GDT: BusinessTransactionDocumentParty, although it may contain the StandardID and InternalID elements, as well as the Address and ContactPerson entities. The ContactPerson may contain the InternalID element and the Address entity. A ServicePerformerParty can be valid for Service items. A Requestor Party can be a party that requests the procurement of goods or services. The Requestor Party can be of type GDT: BusinessTransactionDocumentParty, although it can contain the StandardID and InternalID elements, as well as the Address and ContactPerson entities. The ContactPerson can contain the InternalID element and the Address entity. If a ShipToLocation and ProductRecipientParty are not specified in the requisition process, the Requestor Party address can be used as the ship-to address. In the purchasing process, the Requestor Party (requester) can carry out different follow-up actions. For this reason, it can be specified e (and not just as the Contact). In a Self-Service process, the Requestor Party could enter and approve a goods receipt and invoice, for example.

A ProductRecipientParty can be a party to which goods can be delivered or for whom services can be provided. The ProductRecipientParty can be of type GDT: BusinessTransactionDocumentParty, although it may contain the StandardID and InternalID elements, as well as the Address and ContactPerson entities. The ContactPerson may contain the InternalID element and the Address entity. If a ShipToLocation is not specified in a requisition process, the address of the ProductRecipientParty can be used as the delivery address. If the ProductRecipientParty (goods recipient) is not specified at item or header level, the Requestor Party can also used as the ProductRecipientParty. For a direct material item, the ProductRecipientParty can be optional.

In the third-party process (see BusinessTransactionDocumentItemThirdPartyDealIndicator), the ProductRecipientParty can be the customer. The ProductRecipientParty may not be synonymous with the ShipToLocation and can be used when the ProductRecipientParty (company or person) is different from the BuyerParty. A ManufacturerParty can be a party that manufactures goods. The ManufacturerParty can be of type GDT: BusinessTransactionDocumentParty, although it can contain the StandardID and InternalID elements, as well as the Address and ContactPerson entities. The ContactPerson contains only the InternalID element and the Address entity. The ManufacturerParty can be used for Material items.

With regard to the ManufacturerParty, the default logic (from header to item to subitems) can be used for material items; for other items, the ManufacturerParty can be ignored. The ManufacturerParty can be used to uniquely define the context of a ManufacturerProductID. PurchaseRequestLocation-Package may include the package Location. The Location package can include ShipToLocation, ShipFromLocation, ReceivingSite. A similar default logic to that can be used for parties can also be used for all locations. Either the ID or the address, or both can be transferred to each location. If only the ID is transferred, the ID address defined in the master data can be used (if necessary, a new master record can be created for the message recipient). If only the address is transferred, it is this address that can be used (if necessary, a location can be assigned at the address recipient). If the ID and address are transferred, the ID can identify the location and the address can be deemed to be a document address that can be different to the master data address. If possible, the ID and address can be sent to avoid misunderstandings. The receiving application should implement a suitable optimization strategy to prevent many identical document addresses from being created.

A ShipToLocation can be the location to which goods can be delivered or where services can be provided. The ShipToLocation can be of type GDT: BusinessTransactionDocumentShipToLocation, although it may contain the StandardID and InternalID elements, as well as the Address entity. In a direct material item, the ShipToLocation ID can be specified. A ShipFromLocation can be the location from where goods are to be shipped. The ShipFromLocation can be of type GDT: BusinessTransactionDocumentShipFromLocation, although it may contain the StandardID and InternalID elements, as well as the Address entity. The ShipFromLocation can be used for material items. The default logic from header to item to subitems can be used for the ShipFromLocation for material items; for other items, the ShipFromLocation can be ignored. A ReceivingSite can be the location, for which a contract can be valid. The ReceivingSite can be of type GDT: BusinessTransactionDocumentLocation, although it may contain the StandardID and InternalID elements, as well as the Address entity. The PurchaseRequestItem package can group the PurchaseRequestItem together along with its packages. It can include ProductInformation package, PriceInformation package, Party package, Location package, BusinessDocument ObjectReference package, Accounting package, Attachment package, Description-Package, FollowUp-Package, and ScheduleLine package. A PurchaseRequestItem can specify a product requested by the PurchaseRequest or can provide additional information about such a product. The PurchaseRequestItem may contain detailed information about a particular product and its price. The quantity of the product and (delivery) dates/times can be specified in the schedule line. For the PurchaseRequestItem (compared to the information of the PurchaseRequest), deviating parties or locations can be defined. The PurchaseRequestItem can contain references to other business documents that may be relevant for the item.

Notes or references to attachments can also be specified for the item. A PurchaseRequestItem can be subordinate to another PurchaseRequestItem within a hierarchy to represent a business relationship between the two items. This could be information about a substitute product for an ordered product, for example. This relationship can also be used to group together PurchaseRequest items, that is, a PurchaseRequestItem can group together other PurchaseRequestItems. The PurchaseRequestItem can be of type GDT: PurchaseRequestItem. The PurchaseRequestItem may contain the following elements:

BaseBusinessTransactionDocumentItemID: The BaseBusinessTransactionDocumentItemID is the requisition item number; a unique identifier assigned by the requester for the purchase requisition item. The BaseBusinessTransactionDocumentItemID is of type GDT: BusinessTransactionDocumentItemID.

BaseBusinessTransactionDocumentItemUUID: The BaseBusinessTransactionDocumentItemUUID is the Universally Unique Identifier for the requisition item; a Universally Unique Identifier assigned by the requisition system for the purchase requisition item. The BaseBusinessTransactionDocumentItemUUID is of type GDT: UUID. BaseBusinessTransactionDocumentItemTypeCode: The BaseBusinessTransactionDocumentItemTypeCode is the coded representation of the object type, on which the requirement item is based. The BaseBusinessTransactionDocumentItemTypeCode is of type GDT: BusinessTransactionDocumentItemTypeCode. ThirdPartyDealIndicator: specifies that the purchase requisition item is used as part of a third-party process. ThirdPartyDealIndicator is of type GDT: BusinessTransactionDocumentItemThirdPartyDealIndicator. DirectMaterialIndicator: specifies whether the material in the purchase requisition item is used as part of a direct material process. DirectMaterialIndicator is of type GDT: DirectMaterialIndicator. CostUpperLimitAmount: Limit for the total costs that may not be exceeded in an ordering process. The overall limit amount can be specified for purchasing limit items (item type code: 20). With it, it may not be allowed to specify the ListUnitPrice, the NetUnitPrice, the NetAmount and the TaxAmount for purchasing limit items. GDT: Amount, Qualifier: Limit. CostUpperLimitExpectedAmount: Costs that can be expected within an ordering process. The expected costs can be equal or less than the maximum permitted costs. GDT: Amount and of Qualifier: Expected. The PurchaseRequestItem contains the following entity: HierarchyRelationship. The purchase requisition item ID may not change. From a semantic point of view, items can contain other items. Item hierarchies are mapped in this way. From a technical point of view, the item type may not be defined recursively, since this may not be handled by some commonly-used XML tools. The hierarchies can be mapped using the entity HierarchyRelationship. There can be various types of items, and they can be governed by different integrity conditions. An item can have several integrity types. In this case, the item can satisfy the integrity conditions for its integrity types. The description of the integrity types can indicate which integrity types can be combined with one another and how they can be combined. The various integrity types can be as follows: Standard items can be the items to which no lower-level items have been assigned in the hierarchy. An item that is not referenced by the ParentItemID of another item can be a standard item. Hierarchy items can be items to which one other lower-level item has been assigned in the hierarchy. Any item that is referenced by at least one other item, using the ParentItemID can be a hierarchy item. All items can either be standard or hierarchy items. Subitems can be items that can be assigned below a hierarchy item and not assigned to the requisition header. Subitems can be both standard items and hierarchy items. Any item that references another item using the ParentItemID can be a subitem. Material items can be items whose product can be a material. Any item that has ProductTypeCode "I" (Material) can be a material item. DirectMaterial items can be material items that can be used as part of a direct material process. Service items are items whose product can be a service. Any item whose ProductTypeCode is "2" (Service) can be a service item. Limit items can be items with a cost limit. Limit items can be used as placeholders in a requisition if the exact requirements are unknown at the time the requisition is issued. This can be the case for repairs, where the time and spare parts required are not known until the repair has been made. Grouping hierarchy items can be hierarchy items that logically group together other items. Multi-level grouping hierarchies can be permitted, i.e., a grouping hierarchy item can contain subitems that can also be grouping hierarchy items. Any hierarchy item whose subitems all have HierarchyRelationshipTypeCode "002" (group) can be a grouping hierarchy item; subitems with a different HierarchyRelationshipTypeCode may not be permitted. Grouping hierarchy items may not be permitted as subitems of other types of hierarchy items. BOM hierarchy items can be hierarchy items that group together other items in a BOM. Multi-level BOM hierarchies can be permitted. Any hierarchy item with one subitem with HierarchyRelationshipTypeCode "001" (bill of material) can be a BOM hierarchy item; additional subitems can be permitted with the HierarchyRelationshipTypeCode "003" (discount in kind).

Discount in kind hierarchy items can be hierarchy items for which a goods discount can be granted in the form of an inclusive or exclusive bonus quantity. Multi-level discount in kind hierarchies may not be permitted, i.e., no discount in kind can be granted for discount in kind. The goods discount can described in the form of one or more subitems in the discount in kind hierarchy item. Any Hierarchy item with one subitem with HierarchyRelationshipTypeCode "003" (discount in kind) can be a discount in kind hierarchy item; additional subitems only permitted with the HierarchyRelationshipTypeCode "001" (bill of material). All hierarchy items are grouping, BOM, or discount in kind hierarchy items. A hierarchy item can be both a BOM and a discount-in-kind hierarchy item, if a discount in kind has been granted for a BOM.

A HierarchyRelationship can be the relationship between a subitem and a higher-level parent item in an item hierarchy. The HierarchyRelationship can contain the following elements: ParentItemID—a reference to a parent item. The ParentItemID is of type GDT: BusinessTransactionDocumentItemID. TypeCode—the TypeCode represents the hierarchical relationship between the subitem and its higher-level parent item. The TypeCode is of type GDT: BusinessTransactionDocumentItemHierarchyRelationshipTypeCode. The ParentItemID may not be changed once the item has been created. The TypeCode may not be changed once an item has been created.

PurchaseRequestItemProductInformation-Package includes Product, ProductCategory. The product package may not be used in grouping hierarchy items. A Product may contain the details about a product as generally understood from a commercial point of view in business documents. These are the details for identifying a product and the product type. The description of the product can be stored in the Item/Description field. The Product can be of type GDT: BusinessTransactionDocumentProduct, although it can contain the StandardID, InternalID and TypeCode. Limit items can use the product description which can be stored in the Item/Description field. The product number and ProductTypeCode may not be used in some implementations. In limit items, either a product number or a description along with the ProductTypeCode (material or service) can be specified. The ProductTypeCode should not be changed once an item has been created. With the exception of grouping hierarchy items, at least either the product number or product description (field Item/Description) can be provided when a new item is created. If both the product number and description are provided, the description can be merely additional information in the message and can be ignored by the recipient. In substitution product subitems, the ProductTypeCode may not differ from the parent item ProductTypeCode.

A ProductCategory may contain the details about a product category as generally understood from a commercial point of view in business transaction documents. It can include details for identifying the product category using an internalID, a standard ID, and IDs assigned by involved parties. The ProductCategory can be of type GDT: BusinessTransactionDocumentProductCategory, although it may contain the StandardID and InternalID elements. The product category can be derived directly from the product if a product number is provided for the product.

PurchaseRequestItemPriceInformation-Package includes Price, ProcurementCostUpperLimit. The Price package for a purchase requisition item may contain prices; it may not contain any information about how the prices are calculated (pricing scales, and so on). A Price can be the purchase order price specified by the requester or buyer. The Price may contain the following elements: ListUnitPrice: a ListUnitPrice is the list price (without tax or cash discount) specified by the buyer for the base quantity of the service or material. The ListUnitPrice is of type GDT: Price. NetUnitPrice: a NetUnitPrice is the net price (without tax or cash discount) specified by the buyer for the base quantity of the service or material. The NetUnitPrice is of type GDT: Price. The integrity conditions may exist such that in BOM hierarchies, the following rules apply for the Price. If the price is only specified for the item at the top of the BOM hierarchy and not the subitems, this price can apply. If the price is only specified for standard items (end nodes in the hierarchy tree) in the BDM hierarchy, these prices can apply. The price of the entire BOM can be the total of the individual prices. If a price is specified at different levels in the BOM hierarchy, the price that appears above all the others in the tree can apply. Differences between the total of the individual prices and the price at the next highest hierarchy level are permissible. These may be caused by discounts for the entire BOM. A ProcurementCostUpperLimit can be the cost upper limit for different types of procurement costs. The ProcurementCostUpperLimit can be of type GDT: ProcurementCostUpperLimit. If a limit is specified, this implies that the purchase requisition item can be a limit item; in other words, the requisition item can indicate a requirement for a certain quantity of a particular product or service within a certain period. Limit items can be used as placeholders in a requisition if the exact requirements are unknown at the time the requisition is issued. This can be the case for repairs, where the time and spare parts required may not be known until the repair has been made. A BusinessDocumentObjectReference package can group together references to business documents that may be relevant for the PurchaseRequestItem and have a business relationship with the item. It can include PurchasingContractReference, OriginPurchaseOrderReference, ProjectReference, ProjectElementAssignment, and BuyerProductCatalogueReference. If possible, individual items in business documents can be referenced in the requisition message from item level (contract item 10 can be directly referenced from purchase requisition item 1, for example). If an item assignment is not recognized, an entire document can be referenced (contract 4711 can be referenced in its entirety from purchase requisition item 1, for example). In this case, the recipient may not demand that the item numbers in both documents be the same (that item 1 in requisition 4712 be the same as item 1 in contract 4711, for example). It can be the responsibility of the recipient to try this assignment using other criteria that are not necessarily unique, such as the product number. A PurchasingContractReference can be a reference to a purchase contract or item in a purchase contract. The PurchasingContractReference can be of type GDT: BusinessTransactionDocumentReference. Contract references may not be permitted in limit items; these can be contained in the ProcurementCostUpperLimit entity. A PurchasingContractReference can reference one item, that is, one ItemID may be permissible. An OriginPurchaseOrderReference can be a reference to the origin purchase order or to an item within the origin purchase order in a third-party process. The OriginPurchaseOrderReference can be of type GDT: BusinessTransactionDocumentReference. An OriginPurchaseOrderReference can reference a position, i.e. it can be maximal of an ItemID allowable. The OriginPurchaseOrderReference may be used for stretch orders. The OriginPurchaseOrderReference can be used in all the purchase orders in a third-party deal, so that the seller can reference the original purchase order of the ProductRecipientParty with the OriginPurchaseOrderReference when the delivery is made.

A ProjectReference can be the reference to a project or an element in a project, out of which the requisition emerged. The ProjectReference can be of type GDT: ProjectReference. Either a ProjectReference or a ProjectElementAssignment can be specified. In the ProjectReference the ProjectElementTypeCodes “I” (Task) and “2” (Role) can be allowed. In a procurement process, the ProjectReference can continue to be passed on when goods are received, services entered, and invoicing occurs. This means that a project system can have access to information about the progress of a requirement/requisition. A ProjectElementAssignment can be an assignment between two project elements, out of which the requisition emerged. ProjectElementAssignment can be of the type GDT: ProjectElementAssignment. Either a ProjectReference or a ProjectElementAssignment can be specified. One assignment of a role (ProjectElementTypeCodes="2") to a task (ProjectElementTypeCodes="I") can be permitted. In a procurement process, the ProjectElementAssignment can continue to be passed on when goods are received, services entered, and invoicing occurs. This means that a project system can have access to information about the progress of a requirement/requisition. A BuyerProductCatalogueReference can be a reference to a BuyerProductCatalogue. BuyerProductCatalogueReference can be of the type GDT CatalogueReference. An Accounting package can group together the account assignment information of a purchase requisition item. It can include AmountAccountingObjectSetAssignment, AccountingCodingBlockAssignment, and AmountAccountingObjectSetAssignment. An AmountAccountingObjectSetAssignment can be the assignment of amounts or partial amounts, including percentage, value or quantity, of an item in a purchase requisition to a set of account assignment objects. The AmountAccountingObjectSetAssignment can be of the GDT type: AmountAccountingObjectSetAssignment. An AccountingCodingBlockAssignment can be the assignment of amounts or partial amounts, including percentage, value or quantity, of an item in a purchase—requisition to a set of account assignment objects. The AccountingCodingBlockAssignment can be of the GDT type: AccountingCodingBlockAssignment.

In reference to the PurchaseRequestItemAttachmentPackage, an AttachmentPackage can group together all the relevant attachments with reference to the purchase requisition item. It can include AttachmentFolder, and AttachmentWebAddress. An AttachmentFolder can be a Folder for a document of any type that may be related to the transmitted message or a part of the message. The AttachmentFolder can be of type GDT: AttachmentFolder. An AttachmentWebAddress can be a Web address for a document of any type that may be related to the transmitted message or a part of the message, but is not itself transferred as part of the message. The AttachmentWebAddress can be of type GDT: AttachmentWebAddress. In reference to the PurchaseRequestItemDescriptionPackage, a description package can group together all the texts regarding the requisition item. It can include TextCollection, Description, and InternalDescription. A TextCollection can be a collection of texts regarding the purchase requisition item. The TextCollection can be of type GDT: TextCollection. The TextCollection can be used for textual information about the transferred requisition and not just the current message. An example of this can be a note indicating that the requisition may be required for a particular internal purpose. A Description can be a natural-language text regarding the purchase requisition item, which is visible to all parties. The Description can be of type GDT: SHORT_Description. The Description can be used for product description. An InternalDescription can be a natural-language text regarding the purchase requisition item, which may be visible to all parties within the company. The InternalDescription can be of type GDT: Description. The InternalDescription can be used for all textual information about the transferred requisition and not just the current message. An example of this may be a note indicating that the requisition may be required for a particular internal purpose. Unlike the Description, the InternalDescription may not be included in a message that would be sent to the vendor.

In reference to the PurchaseRequestItemFollowUp-Package, a FollowUp package can group together information about follow-up documents and can include FollowUpDelivery. A FollowUpDelivery can be a delivery that follows up the PurchaseRequest. The FollowUpDelivery may contain the following elements:

RequirementCode: indicates if a FollowUpDelivery is required. The RequirementCode is of type GDT: FollowUpBusinessTransactionDocumentRequirementCode. EmployeeTimeConfirmationRequiredIndicator: indicates if a confirmation about the employee time is required. The EmployeeTimeConfirmationRequiredIndicator is of type GDT: Indicator. In reference to the PurchaseRequestItemScheduleLine-Package, a ScheduleLine package can group together the quantity and date information about a PurchaseRequestItem. A ScheduleLine can be a line containing the quantity and dates of the performance period requested in a requisition. The ScheduleLine may contain the following elements: DeliveryPeriod: the DeliveryPeriod is the period in which the requester expects a product to be delivered or service provided. The DeliveryPeriod is of type GDT: UPPEROPEN_LOCALNORMALISED_DateTimePeriod. Quantity: the Quantity is the required quantity. The Quantity is of type GDT: Quantity. QuantityTypeCode: Coded representation of a type of quantity. GDT: QuantityTypeCode. The quantity can be specified, unless the item in question is a limit item, in which case it can be left empty. A ScheduleLine can be provided in the PurchaseRequestItem.

Multiple data types may be used including AccountingCodingBlockAssignment, Amount, AmountAccountingObjectSetAssignment, AttachmentFolder, AttachmentWebAddress, BusinessDocumentMessageHeader, BusinessTransactionDocumentID, BusinessTransactionDocumentItemHierarchyRelationshipTypeCode, BusinessTransactionDocumentItemID, BusinessTransactionDocumentItemThirdPartyDealIndicator, BusinessTransactionDocumentItemTypeCode, BusinessTransactionDocumentLocation, BusinessTransactionDocumentParty, BusinessTransactionDocumentProduct, BusinessTransactionDocumentProductCategory, BusinessTransactionDocumentReference, BusinessTransactionDocumentShipFromLocation, BusinessTransactionDocumentShipToLocation, BusinessTransactionDocumentTypeCode, CatalogueReference, CounterValue, DateTime, Description, FollowUpBusinessTransactionDocumentRequirementCode, Indicator, MEDIUM_Name, Note, Price, ProcurementCostUpperLimit, ProjectElementAssignment, ProjectReference, PurchaseRequest, PurchaseRequestItem, Quantity, QuantityTypeCode, SHORT_Description, TextCollection, UPPEROPEN_LOCALNORMALISED_DateTimePeriod, and UUID, The message data type PurchaseRequestConformationMessage may contain: the PurchaseRequest object may be contained in the business document in the view for the PurchaseRequestConfirmation and Business information relevant for sending a business document in a message. A MessageHeader package can group business information that may be relevant for sending a business document in a message. A MessageHeader can group together business information from the point of view of the sending application for business document identification in a message. It can be of the type GDT: BusinessDocumentMessageHeader whereby the following element of the GDT can be used: ID. The PurchaseRequestPackage can group together the PurchaseRequest with its packages. A PurchaseRequest, in the point of view of the PurchaseRequestConfirmation, can be a requirement of confirmation from the requester for the external procurement of products (materials or services). The PurchaseRequest can be a subitem in PurchaseRequestItems, which may contain the information about requirement fulfillment (see PurchaseRequestItem package). PurchaseRequest can be of type GDT: PurchaseRequestConfirmation.

PurchaseRequest may contain the following elements: ID: The ID is the unique identifier for the object. The ID is of type GDT: BusinessTransactionDocumentID. UUID: The UUID is the Universally Unique Identifier for the object. The UUID is of type GDT: UUID. BaseBusinessTransactionDocumentID: the BaseBusinessTransactionDocumentID is the unique identifier assigned by the requisition system for the requisition. The BaseBusinessTransactionDocumentID is of type GDT: BusinessTransactionDocumentID.

BaseBusinessTransactionDocumentTypeCode: The BaseBusinessTransactionDocumentTypeCode is the coded representation of the object type, on which the requirement is based. The BaseBusinessTransactionDocumentTypeCode is of type GDT: BusinessTransactionDocumentTypeCode.

Attribute ReconciliationPeriodCounterValue: ReconciliationPeriodCounterValue is a counter for reconciliation periods. GDT: CounterValue. The PurchaseRequestItem package can group the PurchaseRequestItem together along with its packages. It may contain the following packages: FulfillingPurchaseOrder package.

A PurchaseRequestItem specifies a product requested by the PurchaseRequest or provides additional information about such a product. The PurchaseRequestItem may contain information about the degree of fulfillment of a requirement. PurchaseRequestItem can be of type GDT: PurchaseRequestConfirmationItem. The item can include ID, the unique identifier for an item within an object. Of type GDT; UUID, the Universally Unique Identifier for an item within an object. Of type GDT; BaseBusinessTransactionDocumentItemID, the requisition item number; a unique identifier assigned by the requester for the purchase requisition item. Of type GDT; OpenQuantityCancelledIndicator: Indicator, for whether open remaining quantities of a purchase order should be determined by the source of supply or whether they should be considered as canceled. Of type GDT; TotalRequestedQuantity: The total requested amount of requirement items. Of type GDT; TotalRequestedQuantityTypeCode: Coded representation of a type of quantity. GDT: QuantityTypeCode; TotalRequestedNetAmount: The total requested amount of requirement limit items. TotalRequestedNetAmount is of type GDT; Amount. TotalOrderedQuantity: The total ordered amount of requirement items. TotalRequestedQuantity is of type GDT: Quantity. Referring to the PurchaseRequestItemFulfillingPurchaseOrder-Package, the FulfillingPurchaseOrder package can group together information concerning the extent to which a requisition has been fulfilled by a purchase order. It can contain FulfillingPurchaseOrderItem package. From the point of view of the purchase order, a PurchaseRequestItemFulfillingPurchaseOrder can indicate the extent to which a requisition item has been fulfilled. PurchaseRequestItemFulfillingPurchaseOrder can be of type: GDT: PurchaseRequestConfirmationItemFulfillingPurchaseOrder. PurchaseRequestItemFulfillingPurchaseOrder may contain the elements: ID: Order number. The ID is of type GDT: BusinessTransactionDocumentID UUID: Universally Unique Identifier for the order. The UUID is of type GDT: UUID.

TypeCode: TypeCode is the coded representation of the object type. The TypeCode is of type GDT: BusinessTransactionDocumentTypeCode. OrderedIndicator: Indicates that the order has been sent to the vendor. OrderedIndicator is of the type GDT: Indicator PurchaseRequestItemFulfillingPurchaseOrderItem-Package. The PurchaseRequestItemFulfillingPurchaseOrderItem package groups together information concerning the extent to which a requisition has been fulfilled by a purchase order item. It can contain FulfillingPurchaseOrderItem. From the point of view of purchase order item, a PurchaseRequestItemFulfillingPurchaseOrderItem can indicate the extent to which a requisition item has been fulfilled. The PurchaseRequestItemFulfillingPurchaseOrderItem can be of the type GDT: PurchaseRequestConfirmationItemFulfillingPurchaseOrderItem. This can include ID—Purchase order item. The ID can be of type GDT: BusinessTransactionDocumentItemID; UUID, a universally Unique Identifier for the order item. The UUID is of type GDT: UUID; TypeCode: TypeCode is the coded representation of the object type. The TypeCode is of type GDT: BusinessTransactionDocumentItemTypeCode; ActiveIndicator: Indicates if the order item is active or not. ActiveIndicator is of the type GDT: Indicator; Quantity: Ordered amount. Quantity is of type GDT: Quantity; QuantityTypeCode: Coded representation of a type of quantity. GDT: QuantityTypeCode; NetAmount: Ordered amount of limit items. NetAmount is of type GDT: Amount.

In some implementations the data type of Amount, BusinessDocumentMessageHeader BusinessTransactionDocumentID, BusinessTransactionDocumentItemID, BusinessTransactionDocumentItemTypeCode, BusinessTransactionDocumentTypeCode, CounterValue, Indicator, PurchaseRequestConfirmation, PurchaseRequestConfirmationItem, PurchaseRequestConfirmationItemFulfillingPurchaseOrder, PurchaseRequestConfirmationItemFulfillingPurchaseOrderItem, Quantity, QuantityTypeCode, and UUID.

The message data type PurchaseRequestNotificationMessage can contain:

the PurchaseRequestNotification object contained in the business document in the view required for the PurchaseRequest and Business information relevant for sending a business document in a message.

A MessageHeader package can group business information relevant for sending a business document in a message. A MessageHeader can group together business information from the point of view of the sending application for business document identification in a message. It can be of the type GDT: BusinessDocumentMessageHeader whereby the following element of the GDT can be used: ID PurchaseRequestNotification-Package. The PurchaseRequest package can group the PurchaseRequest together along with its packages. It can include Party package, Location package, and Item package. A PurchaseRequest can be a requirement of the requester for the external procurement of products (materials or services). The PurchaseRequestNotification can be subdivided into PurchaseRequestNotificationItems that each specify an ordered product or additional information relevant for such a product, such as information about product category or value limits. In addition to the buying party and the seller as well as the proposed seller, additional parties can be involved in the PurchaseRequestNotification. Locations can be specified for the PurchaseRequestNotification delivery. PurchaseRequestNotification can be of type GDT: PurchaseRequestNotification. PurchaseRequestNotification may contain the following elements:

ReconciliationPeriodCounterValue: ReconciliationPeriodCounterValue can be a counter for reconciliation periods. GDT: CounterValue. ID can be an identification of the requisition in the requisition system. ID can be of the type GDT: BusinessTransactionDocumentID. UUID: Universally Unique Identifier of the requisition in the requisition system. UUID can be of the type GDT: UUID. TypeCode can be the type code of the requisition. TypeCode can be of type GDT: BusinessTransactionDocumentTypeCode.

Referring to the PurchaseRequestNotificationParty-Package, a Party package can group together all the business parties involved in the PurchaseRequestNotification. It can include SellerParty, ProposedSellerParty, ServicePerformerParty, Requestor Party, and ProductRecipientParty. Either the ID or the ID and address can be transferred for each party. If only the ID is transferred, the ID address defined in the master data can be used. If the ID and address are transferred, the ID identifies the party and the address can be deemed to be a document address that can be different from the master data address. If possible, the ID and address can be sent to avoid misunderstandings. The receiving application can implement a suitable optimization strategy to prevent many identical document addresses from being created.

A default logic can be used for all parties: from the header to the items and within item hierarchies. Parties specified in the header can be used for all the items for which a corresponding party is not explicitly transferred and that are directly assigned to the header. In accordance with the same logic, parties transferred at item level can be used for all subitems assigned to the relevant item in an item hierarchy. The default logic can apply for the party as a whole, including the contact person. Parts of a party specified at header level or for a hierarchy item may not be specified in more detail at item level. The default logic may be a simplified version of the transmitted message. Logically, parties at header level and hierarchy items can behave as if they have been explicitly transferred for the subitems of the message. A SellerParty can be a party that sells goods or services. The SellerParty can be of type GDT: BusinessTransactionDocumentParty, although it may contain the StandardID and InternalID elements, as well as the Address and ContactPerson entities. The ContactPerson may contain the InternalID element and the Address entity. If the Vendor Party and ShipFromLocation have not been specified in the requisition process, the address of the SellerParty can be used as the ship-from address. A ProposedSellerParty can be a preferred party for selling goods or services. The ProposedSellerParty can be of type GDT: BusinessTransactionDocumentParty, although it may contain the StandardID and InternalID elements, as well as the Address and ContactPerson entities. The ContactPerson can contain the InternalID element and the Address entity. When a requisition is created, a user can specify a preferred vendor. In the procurement system, the professional buyer can use the preferred vendor as the actual vendor. A ServicePerformerParty can be a party that delivers a service. The ServicePerformerParty can be of type GDT: BusinessTransactionDocumentParty, although it may contain the StandardID and InternalID elements, as well as the Address and ContactPerson entities. The ContactPerson may contain the InternalID element and the Address entity. A ServicePerformerParty can be valid for Service items. A Requestor Party can be a party that requests the procurement of goods or services. The Requestor Party can be of type GDT: BusinessTransactionDocumentParty, although it may contain the StandardID and InternalID elements, as well as the Address and ContactPerson entities. The ContactPerson may contain the InternalID element and the Address entity. If a ShipToLocation and ProductRecipientParty are not explicitly specified in the requisition process, the Requestor Party address can be used as the ship-to address. In the purchasing process, the Requestor Party (requester) carries out different follow-up actions. For this reason, it can be specified explicitly (and not just as the Contact). In a Self-Service process, the Requestor Party could enter and approve a goods receipt and invoice, for example. A ProductRecipientParty can be a party to which goods can be delivered or for whom services can be provided. The ProductRecipientParty can be of type GDT: BusinessTransactionDocumentParty, although it may contain the StandardID and InternalID elements, as well as the Address and ContactPerson entities. The ContactPerson may contain the InternalID element and the Address entity. If a ShipToLocation is not specified in a requisition process, the address of the ProductRecipientParty can be used as the delivery address. If the ProductRecipientParty (goods recipient) is not specified at item or header level, the Requestor Party can also be used as the ProductRecipientParty. For a direct material item, the ProductRecipientParty is optional. In the third-party process, the ProductRecipientParty can be the customer. The ProductRecipientParty may not be synonymous with the ShipToLocation and can be used when the ProductRecipientParty (company or person) is different from the BuyerParty. Referring to the PurchaseRequestNotification-Location-Package, a Location package groups together all the locations relevant for the PurchaseRequestNotification. The Location package may contain the entity ShipToLocation. A similar default logic to that can be used for parties may also be used for all locations. Either the ID or only the address, or both can be transferred to each location.

If the ID is transferred, the ID address defined in the master data can be used (if necessary, a new master record can be created for the message recipient). If only the address is transferred, it can be this address that can be used (if necessary, a location can be assigned at the address recipient). If the ID and address are transferred, the ID identifies the location and the address can be deemed to be a document address that may be different to the master data address. If possible, the ID and address can be sent to avoid misunderstandings. The receiving application can implement a suitable optimization strategy to prevent many identical document addresses from being created. A ShipToLocation can be the location to which goods can be delivered or where services can be provided. The ShipToLocation can be of type GDT: BusinessTransactionDocumentLocation, although it may contain the StandardID and InternalID elements, as well as the Address entity. In a direct material item, the ShipToLocation ID can be specified.

Referring to the PurchaseRequestNotificationItem-Package, the PurchaseRequestItem package can group the PurchaseRequestItem together along with its packages. It can include ProductInformation package, PriceInformation package, Party package, Location package, BusinessDocumentObjectReference package, Accounting package, Attachment package, Description Package, and ScheduleLine package. A PurchaseRequestItem can specify a product requested by the PurchaseRequest or can provide additional information about such a product. The PurchaseRequestNotificationItem can contain detailed information about a particular product and its price. The quantity of the product and (delivery) dates/times can be specified in the schedule line. For the PurchaseRequestNotificationItem (compared to the information of the PurchaseRequestNotification), deviating parties or locations can be defined. The PurchaseRequestNotificationItem can contain references to other business documents that may be relevant for the item. Notes or references to attachments can also be specified for the item. A PurchaseRequestNotificationItem can be subordinate to another PurchaseRequestNotificationItem within a hierarchy to represent a business relationship between the two items. This could be information about a substitute product for an ordered product, for example. This relationship can also be used to group together PurchaseRequestNotification items, that is, a PurchaseRequestNotificationItem can group together other PurchaseRequestNotificationItems. The PurchaseRequestNotificationItem can be of type GDT: PurchaseRequestNotificationItem. The PurchaseRequestNotificationItem may contain the following elements:

ID: The ItemID is the requisition item number; a unique identifier assigned by the requester for the purchase requisition item. ItemID is of type GDT: BusinessTransactionDocumentItemID. UUID: The Item UUID is the requisition item UUID; a Universally Unique Identifier assigned by the requisition system for the purchase requisition. Item UUID is of the type GDT: UUID. TypeCode: The Item type code is the type code of the purchase requisition item, e.g. material. Item TypeCode is of type GDT: BusinessTransactionDocumentItemTypeCode. CostUpperLimitAmount: A CostUpperLimitAmount is the amount of a cost upper limit for different types of procurement costs. CostUpperLimitAmount is of the type GDT: Amount. CostUpperLimitExpectedAmount: A CostUpperLimitExpectedAmount is the expected amount of a cost upper limit for different types of procurement costs. CostUpperLimitExpectedAmount is of the type GDT: Amount. The PurchaseRequestItem may contains the entity HierarchyRelationship. From a semantic point of view, items can contain other items. Item hierarchies are mapped in this way. From a technical point of view, the item type may not defined recursively, since this may not be handled by some commonly-used XML tools. The hierarchies can be mapped using the entity HierarchyRelationship.

There can be various types of items, and they can be governed by different integrity conditions (constraints). An item can have several integrity types. In this case, the item can satisfy all the integrity conditions for all of its integrity types. The description of the integrity types can indicate which integrity types can be combined with one another and how they can be combined. The various integrity types can be as follows: Standard items can be all the items to which no lower-level items have been assigned in the hierarchy. An item that is not referenced by the ParentItemID of another item can be a standard item. Hierarchy items can be items to which at least one other lower-level item has been assigned in the hierarchy. Any item that is referenced by at least one other item, using the ParentItemID can be a hierarchy item. Items can be either standard or hierarchy items. Subitems can be items that can be assigned below a hierarchy item and not directly assigned to the requisition header. Subitems can be both standard items and hierarchy items. Any item that references another item using the ParentItemID can be a subitem. Material items can be items whose product may be a material. Any item that has ProductTypeCode "1" (Material) can be a material item. DirectMaterial items can be material items that can be used as part of a direct material process. Service items can be items whose product can be a service. Any item whose ProductTypeCode is "2" (Service) can be a service item. Limit items can be items with a cost limit. Limit items can be used as placeholders in a requisition if the exact requirements are unknown at the time the requisition is issued. This can be the case for repairs, where the time and spare parts required may not be known until the repair has been made.

Grouping hierarchy items can be hierarchy items that logically group together other items. Multi-level grouping hierarchies may be permitted, i.e., a grouping hierarchy item can contain subitems that are also grouping hierarchy items. Any hierarchy item whose subitems have HierarchyRelationshipTypeCode "002" (group) can be a grouping hierarchy item; subitems with a different HierarchyRelationshipTypeCode may not be permitted. In some implementations, grouping hierarchy items may not permitted as subitems of other types of hierarchy items. BOM hierarchy items can be hierarchy items that group together other items in a BOM. Multi-level BOM hierarchies can be permitted. Any hierarchy item with at least one subitem with HierarchyRelationshipTypeCode "001" (bill of material) can be a BOM hierarchy item; additional subitems can be permitted with the HierarchyRelationshipTypeCode "003" (discount in kind). Discount in kind hierarchy items can be hierarchy items for which a goods discount can be granted in the form of an inclusive or exclusive bonus quantity. Multi-level discount in kind hierarchies may not permitted, i.e., no discount in kind can be granted for discount in kind. The goods discount can be described in the form of one or more subitems in the discount in kind hierarchy item. Any Hierarchy item with at least one subitem with HierarchyRelationshipTypeCode "003" (discount in kind) can be a discount in kind hierarchy item; additional subitems can be permitted with the HierarchyRelationshipTypeCode "001" (bill of material). Hierarchy items can be grouping, BOM, or discount in kind hierarchy items. A hierarchy item can be both a BOM and a discount-in-kind hierarchy item, if a discount in kind has been granted for a BOM. A HierarchyRelationship can be the relationship between a subitem and a higher-level parent item in an item hierarchy. The HierarchyRelationship can contain the following elements: ParentItemID—a reference to a parent item. The ParentItemID can be of type GDT: BusinessTransactionDocumentItemID. TypeCode—the TypeCode can represent the hierarchical relationship between the subitem and its higher-level parent item. The TypeCode can be of type GDT: BusinessTransactionDocumentItemHierarchyRelationshipTypeCode. In some implementations, the ParentItemID may not be changed once the item has been created and the TypeCode may not be changed once an item has been created.

In reference to the PurchaseRequestNotificationItemProductInformation-Package, a ProductInformation package can group together all the information for identifying, describing, and classifying a product in a purchase requisition item. It may include Product and ProductCategory. The product package may not be used in grouping hierarchy items in some implementations. A Product can contain the details about a product as generally understood from a commercial point of view in business documents. These can be the details for identifying a product and the product type. The description of the product can be stored in the Item/Description field. The Product can be of type GDT: BusinessTransactionDocumentProduct, although it may contain the StandardID, InternalID and TypeCode. Limit items can use the product description which can be stored in the Item/Description field. The product number and ProductTypeCode may not be used in some implementations. Except in limit items, either a product number or a description along with the ProductTypeCode (material or service) can be specified. The ProductTypeCode may not be changed once an item has been created in some implementations. With the exception of grouping hierarchy items, either the product number or product description (field Item/Description) can be provided when a new item is created. If both the product number and description are provided, the description can be merely additional information in the message and can be ignored by the recipient. In substitution product subitems, the ProductTypeCode may not differ from the parent item ProductTypeCode. A ProductCategory can contain the details about a product category as generally understood from a commercial point of view in business transaction documents. It can include details for identifying the product category using an internalID, a standard ID, and IDs assigned by involved parties. The ProductCategory can be of type GDT. BusinessTransactionDocumentProductCategory, although it can contain the StandardID and InternalID elements. The product category can be derived directly from the product if a product number is provided for the product.

In reference to the PurchaseRequestNotificationItemPriceInformation-Package, a PriceInformation package groups together price-relevant information. It can include Price. The Price package for a purchase requisition item may contain prices; it may not contain any information about how the prices are calculated (pricing scales, and so on) in some implementations. A Price can be the purchase order price specified by the requester or buyer. The Price can contain the following elements: ListUnitPrice, which can be the list price (without tax or cash discount) specified by the buyer for the base quantity of the service or material. The ListUnitPrice can be of type GDT: Price. In BOM hierarchies, the following Integrity Conditions may apply for the Price: If the price is only specified for the item at the top of the BOM hierarchy and not the subitems, this price applies. If the price can be specified for standard items (end nodes in the hierarchy tree) in the BOM hierarchy, these prices can apply. The price of the entire BOM can be the total of the individual prices.

If a price is specified at different levels in the BOM hierarchy, the price that appears above all the others in the tree can apply. Differences between the total of the individual prices and the price at the next highest hierarchy level may be permissible. These may be caused by discounts for the entire BOM.

In reference to the PurchaseRequestNotificationItemBusinessDocumentObjectReference-Package, a BusinessDocumentObjectReference package can group together references to business documents that may be relevant for the PurchaseRequestItem and may have a business relationship with the item. In some implementations, none of the entities in the BusinessDocumentObjectReference package may be used in grouping hierarchy items. If possible, individual items in business documents can be referenced in the requisition message from item level (contract item 10 is directly referenced from purchase requisition item 1, for example). If an item assignment is not recognized, an entire document can be referenced (contract 4711 is referenced in its entirety from purchase requisition item 1, for example). In this case, the recipient may not be able to demand that the item numbers in both documents be the same (that item 1 in requisition 4712 be the same as item 1 in contract 4711, for example). It can be the responsibility of the recipient to try this assignment using other criteria that may not necessarily be unique, such as the product number. An InternalRequestReference can be a reference to the predecessor internal request or to an item within the internal request. InternalRequestReference can be of type GDT: BusinessTransactionDocumentReference. An Accounting package can group together all the account assignment information of a purchase requisition item. An AccountingCodingBlockAssignment can be the assignment of amounts or partial amounts, including percentage, value or quantity, of an item in a purchase requisition to a set of account assignment objects. The AccountingCodingBlockAssignment can be of the GDT type: AccountingCodingBlockAssignment.

In reference to the PurchaseRequestNotificationItemAttachment-Package, an AttachmentPackage can group together all the relevant attachments with reference to the purchase requisition item. An AttachmentFolder can be a Folder for a document of any type that may be related to the transmitted message or a part of the message. A Description package can group together the texts regarding the requisition item. It can include TextCollection. A TextCollection can be defined as a collection of texts regarding the purchase requisition item. The TextCollection can be used for all textual information about the transferred requisition and not just the current message. An example of this would be information that the Purchasing employee responsible may be on vacation as of a specific date, and indicating the name and telephone number of a substitute as of this date. A Description can be a natural-language text regarding the purchase requisition item, which can be visible to all parties. The Description can be of type GDT: SHORT_Description. The Description can be used for product description.

In reference to the PurchaseRequestNotificationItemScheduleLine-Package, a ScheduleLine package can group together all the quantity and date information about a PurchaseRequestItem. The ScheduleLine package can contain the entity ScheduleLine. A ScheduleLine can be a line containing the quantity and dates of the performance period requested in a requisition. The ScheduleLine may contain the following elements: DeliveryPeriod, Quantity, and QuantityTypeCode. The DeliveryPeriod can be the period in which the requester might expect a product to be delivered or service provided. The DeliveryPeriod can be of type GDT: UPPEROPEN_LOCALNORMALISED_DateTimePeriod. The Quantity can be the required quantity and can be of type GDT: Quantity. QuantityTypeCode can be a coded representation of a type of quantity and can be of type GDT: QuantityTypeCode. The quantity can be specified, unless the item in question is a limit item, in which case it can be left empty. A ScheduleLine can be provided in the PurchaseRequestItem.

InternalRequest Business Object

FIGS. 262-1 through 262-7 illustrate an example InternalRequest business object model 262000. Specifically, this model depicts interactions among various hierarchical components of the InternalRequest, as well as external components that interact with the InternalRequest (shown here as 262002 through 262024 and 262078 through 262126).

The InternalRequest can be a request from an employee of a company for the procurement of goods or services for their own or company use. The InternalRequest can be fulfilled through one of the following objects: PurchaseRequest or InhouseRequirement. The business object InternalRequest can be derived from the Procurement Document Template. The Business Object InternalRequest can be part of the Process Component Internal Request Processing and the Deployable Unit Requisitioning. The Business Object InternalRequest can be represented by the root node InternalRequest and its associations. The interface Purchasing In can contain the operation to receive all information about changes during the procurement progress chain, which may be important for the Internal Request. The technical name of the interface can be InternalRequestProcessingPurchasingIn. The operation Change Internal Request based on Purchase Request can update an Internal Request and can give information about the progress of procurement up to the corresponding Purchase Orders, meaning changes of follow on documents, for example, the creation of Purchase Order. The operation can be based on message type PurchaseRequestConfirmation (derived from business object Purchase Request). The technical name may be InternalRequestProcessingPurchasingIn.ChangeInternalRequestBasedOnPurchaseRequest_In. The interface Order Notification In can contain the operation to receive all information about changes during the procurement progress chain, which may be important for the Internal Request, after the Purchase Order. The technical name of the interface may be InternalRequestProcessingOrderNotificationIn. The operation Change Internal Request can be based on Purchase Order which can update an Internal Request and give information about the progress of procurement, meaning changes of follow on documents, for example, the creation of Goods And Service Acknowledgment, including the amount of received goods, the creation of Supplier Invoice. The operation can be based on message type PurchaseOrderNotification (derived from business object Purchase Order). The technical name may be InternalRequestProcessingPurchasingIn.ChangeInternalRequestBasedOnPurchaseOrder_In. The interface Purchasing Out can contain the operation to trigger the creation of the follow-on document for external procurement (PurchaseRequest). The technical name of the interface may be InternalRequestProcessingPurchasingOut. The operation Request Purchasing can create the message, which can be sent to the Process Component, that handles the creation of a Purchase Request to trigger the order process. If the Internal Request is changed, the operation Request Purchasing can create the message, which can be sent to the related Purchase Request. The operation can be based on message type PurchaseRequestRequest (derived from business object Purchase Request). The technical name may be InternalRequestProcessingPurchasingOut.RequestPurchasing. The interface Internal Acknowledgement Out can contain the operation to trigger the creation of Goods And Service Acknowledgement for the complete amount of requested goods/services. The technical name of the interface may be InternalRequestProcessingInternalAcknowledgementOut.

The operation Notify Of Goods And Service Acknowledgement can create the message, which can be sent to the Process Component, handling the creation of a Goods And Service Acknowledgement for delivered goods and rendered Services to confirm automatically the delivery of the complete open amount of requested goods/services. The operation can be based on message type GoodsAndServiceAcknowledgementRequest (derived from business object Goods And Service Acknowledgement). The technical name may be InternalRequestProcessingInternalAcknowledgementOut.RequestGSABasedOnDeliveryConfirmation. The message of type GoodsAndServiceAcknowledgementRequest may be able to be used in the "one-click process" and sent by the requester of the Internal Request. If the message is received in the Process Component Goods And Service Acknowledgement, a Business Object Goods And Service Acknowledgement may be able to be created automatically without manual interaction and therefore can help to streamline organisational processes. The Interface Project Task Availability Out can contain the operation to check the account assignment and to receive the result. The account assignment check of accounting objects that can be not available locally can be performed synchronously. The Service Interface Project Task Availability Out can be part of the following Process Integration Models: Expense and Reimbursement Management_ Project Processing, Goods and Service Acknowledgement_ Project Processing_Coding Block, Internal Request Processing_Project Processing_Coding Block, Purchase Order Processing_Project Processing_Coding Block, Purchase Request Processing_Project Processing_Coding Block, and Supplier Invoice Processing_Project Processing_Coding Block. The technical name may be AccountingCodingBlockDistributionProcessingProjectTaskAvailabilityOut. The operation Request Project Task Availability Information can send a synchronous request to the process component Project Processing to determine whether the tasks exist and whether they are valid from the business perspective. In the Request role, the operation can be based on the AccountingObjectCheckRequest message type. In the Confirmation role, it can be based on the AccountingObjectCheckConfirmation message type (derived from the dependent object AccountingCodingBlockDistribution). The technical name may be AccountingCodingBlockDistributionProcessingProjectTaskAvailabilityOut.RequestProjectTaskAvailabilityInformation.

The InternalRequest can be a request for the procurement of goods or services. It can contain the parties involved, the items and its status. Furthermore, it can contain identification and administrative information of the request. The elements located directly at the node InternalRequest 262026 can be defined by the data type: ProcurementDocumentElements. In certain implementations, these elements can include: ID, UUID, SystemAdministrativeData, ProcessingTypeCode, CurrencyCode, TemplateIndicator, SurrogateBuyingActiveIndicator, Name, TotalNetAmount, TotalTaxAmount, and Status. ID can be an identifier for the InternalRequest assigned by the BuyerParty. ID can be used as an alternative Key, and may be based on GDT of type BusinessTransactionDocumentID. UUID can be a universal alternative identifier, which can be unique, of the InternalRequest for referencing purposes. UUID can be used as an alternative key, and may be based on GDT of type UUID. SystemAdministrativeData can be administrative data stored within the system. These data may contain system users and time of change. SystemAdministrativeData may be based on GDT of type SystemAdministrativeData. ProcessingTypeCode can be a coded representation for the processing type of the InternalRequest. ProcessingTypeCode may be based on GDT of type BusinessTransactionDocumentProcessingTypeCode. CurrencyCode can be a coded representation of the InternalRequest currency. CurrencyCode may be optional and may be based on GDT of type CurrencyCode. TemplateIndicator can indicate whether the InternalRequest can be a template or not. To process recurring procurement transactions efficiently, templates can be used as references when creating and processing InternalRequests. TemplateIndicator may be optional and may be based on GDT of type Indicator. SurrogateBuyingActiveIndicator can indicate whether the InternalRequest was ordered for someone else. SurrogateBuyingActiveIndicator can be optional and may be based on GDT of type Indicator. Name can be a designation or title of the InternalRequest. Name may be optional and may be based on GDT of type MEDIUM_Name. TotalNetAmount can be the total net amount of the InternalRequest. TotalNetAmount may be optional and may be based on GDT of type Amount. TotalTaxAmount can be the total tax amount of the InternalRequest. TotalTaxAmount can be optional and may be based on GDT of type Amount. Status can be information about the lifecycle of the InternalRequest and the results and prerequisites of its processing steps. In certain implementations, it may contain the following elements which can be defined by the data type ProcurementDocumentStatus: InternalRequestLifeCycleStatusCode, which may be based on GDT of type InternalRequestLifeCycleStatusCode; ApprovalStatusCode, which may be based on GDT ApprovalStatusCode; ConsistencyStatusCode, which may be based on GDT of type ConsistencyStatusCode; and OrderingStatusCode, which may be based on GDT of type OrderingStatusCode. The CurrencyCode can be the leading coded representation of the InternalRequest currency; other CurrencyCodes (e.g., at TotalNetAmount) may or may not be read-only and may or may not differ from the InternalRequestCurrencyCode. The ID may or may not be changed after creation. The UUID can be determined by the service provider and may or may not be changed. The SystemAdministrativeData can be determined by the service provider and may or may not be changed. The ProcessingTypeCode may or may not be changed after the creation. After creation the InternalRequest can be changed if there are no follow-up processes, otherwise it can be cancelled.

InternalRequest may have the following composition relationships to subordinate nodes: Item 262028 may have a cardinality of 1:cn; Party 262048 may have a cardinality of 1:cn; PriceCalculation (DO) 262050 may have a cardinality of 1:c; TaxCalculation (DO) 262052 may have a cardinality of 1:c; TextCollection (DO) 262074 may have a cardinality of 1:c; AccessControlList (DO) 262076 may have a cardinality of 1:1; and Approval 262054 may have a cardinality of 1:c. InternalRequest may have the following relationships node roots: CreationIdentity may have a cardinality of 1:cn. CreationIdentity can be the identity that created the InternalRequest; and LastChangeIdentity may have a cardinality of c:cn. LastChangeIdentity can be the identity that changed the InternalRequest the last time. There may be a number Associations for Navigation including: Associations to the InternalRequestItem, PurchasingHierarchyItem has a cardinality of c:cn. Association to purchasing hierarchy item(s). A purchasing hierarchy item can be an item which is semantically associated with the root; other items with a parent item in an item hierarchy are subordinate items. Associations to the InternalRequest-Party, BuyerParty has a cardinality of c:c. Association to a party which appears within the BuyerParty specialisation, Requestor Party has a cardinality of c:c. Association to a party which appears within the Requestor Party specialisation.

The action Approve may be able to approve an InternalRequest which is in approval. The action CheckConsistency may be able to check an InternalRequest for consistency of entered data. The action CreateAsTemplate may be able to create an InternalRequest as a template. To process recurring procurement transactions efficiently, templates may be able to be used as references when creating and processing InternalRequests. The action Delete may be able to delete an InternalRequest. The action Reject may be able to reject an InternalRequest which is in approval. The action SendBackForRevision may be able to send an InternalRequest back to the requestor for revision. The action SubmitForApproval may be able to determine and start the approval process of an InternalRequest. The action SubmitForOrder may be able to submit for the creation of the Follow-on Document. Internal Request may be able to be saved and may be able to be complete and consistent. The action WithdrawFromApproval may be able to withdraw the InternalRequest from the approval process. The action CreateItemFromProductCatalogue may be able to create a new InternalRequestItem which is copied from a ProductCatalogue. The action parameter elements can be defined by the data type ProcurementDocumentCreateItemFromProductCatalogueActionElements. In certain implementations, Action can map these elements to the InternalRequestItem Structure. These elements may include: Description, which may be based on GDT of type SHORT_Description.

Quantity, which may be based on GDT of type Quantity. Price, which may be based on GDT of type Price. The parameter element Price will be mapped to ListUnitPrice of InternalRequestItem. ProductID, which may be based on GDT of type ProductID. LeadTimeDuration, which may be based on GDT of type DAY_Duration. LeadTimeDuration content can be added to the day of today and mapped to element DeliveryPeriod of InternalRequestItem. SellerPartyID, which may be based on GDT of type PartyID.

ProductSellerID, which may be based on GDT of type ProductPartyID. ProductCategoryInternalID, which may be based on GDT of type ProductCategoryInternalID. ProductTypeCode, which may be based on GDT of type ProductTypeCode. ProductCatalogueReference, which may be based on GDT of type CatalogueReference. PurchasingContractReference, which may be based on GDT of type BusinessTransactionDocumentReference 262064. Attachment, which in certain implementations includes the following elements that can be defined by the data type ProcurementDocumentCreateItemFromProductCatalogueAttachment: Name, which may be based on GDT of type LANGUAGEINDEPENDENT_Name; DocumentTypeCode, which may be based on GDT DocumentTypeCode; WebURI, which may be based on GDT of type AttachmentWebURI (AttachmentWebURI can be a link to the Attachment. With help of AttachmentWebURI the new to InternalRequestItemAttachmentFolder will be created on the InternalRequestItem); and ProductText, which may be based on GDT of type Text. (ProductText will be mapped to the BO TextCollection on the InternalRequestItem). The action CreateItemFromProduct may be able to create a new InternalRequestItem from a product. The action elements are defined by the data type ProcurementDocumentCreateItemFromProductActionElements. In certain implementations, these elements include: ProductID, which may be based on GDT of type ProductID; and Quantity, which may be based on GDT of type Quantity. The action CreateItemFromInternalRequest may be able to create a new InternalRequestItem which is copied from an InternalRequest template item or from an already existing InternalRequest item. The action elements are defined by the data type ProcurementDocumentCreateItemFromInternalRequestItemActionElements. In certain implementations, these elements include: InternalRequestItemReference, which may be based on GDT of type BusinessTransactionDocumentReference; and Quantity, which may be optional and may be based on GDT of type Quantity.QueryByElements may be able to provide a list of all InternalRequests according to the specified selection elements. The query elements can be defined by the data type ProcurementDocumentElementsQueryElements and in certain implementations can include: ID, which may be optional and may be based on GDT BusinessTransactionDocumentID; SystemAdministrativeData, which may be optional and may be based on GDT of type SystemAdministrativeData; CreationBusinessPartnerCommonPersonNameFamilyName, which may be optional and may be based on GDT of type LANGUAGEINDEPENDENT_MEDIUM_Name; CreationBusinessPartnerCommonPersonNameGivenName, which may be optional and may be based on GDT of type LANGUAGEINDEPENDENT_MEDIUM_Name; LastChangeBusinessPartnerCommonPersonNameFamilyName, which may be optional and may be based on GDT of type LANGUAGEINDEPENDENT_MEDIUM_Name; LastChangeBusinessPartnerCommonPersonNameGivenName, which may be optional and may be based on GDT of type LANGUAGEINDEPENDENT_MEDIUM_Name; TemplateIndicator, which may be optional and may be based on GDT of type Indicator; SurrogateBuyingActiveIndicator, which may be optional and may be based on GDT of type indicator; Name, which may be optional and may be based on GDT of type MEDIUM_Name; PartyRequestor PartyID, which may be optional and may be based on GDT of type PartyPartyID; ItemBusinessTransactionDocumentReferencePurchaseOrderID, which may be optional and may be based on GDT of type BusinessTransactionDocumentID; ItemDescription, which may be optional and may be based on GDT of type SHORT_Description; ItemProductProductID, which may be optional and may be based on GDT of type ProductID; ItemProductProductCategoryInternalID, which may be optional and may be based on GDT of type ProductCategoryInternalID; ItemPartySellerPartyID, which may be optional and may be based on GDT of type PartyPartyID; Status, in which the query elements are defined by the data type ProcurementDocumentStatus, which in certain implementations includes InternalRequestLifeCycleStatusCode, which may be optional and may be based on GDT of type InternalRequestLifeCycleStatusCode; and ItemStatus, in which the query elements are defined by the data type ProcurementDocumentItemStatus, which in certain implementations includes DeliveryProcessingStatusCode, which may be optional and may be based on GDT of type ProcessingStatusCode.

The InternalRequestParty can be a natural or legal person, organization, organizational unit or group that may be involved in an InternalRequest in a PartyRole. A party can be a BusinessPartner in the specialisation Employee or Supplier, or an OrganisationalCentre in the specialisation Company. An InternalRequestParty can occur within the following specialisations: a BuyerParty (i.e., a party that authorized the requested goods and/or services), or a Requestor Party (i.e., a party that requests the procurement of goods and/or services). The InternalRequestParty may or may not contain the following elements that can be defined by the data type ProcurementDocumentPartyElements: UUID, PartyID, PartyUUID, PartyTypeCode, RoleCategoryCode, RoleCode, AddressReference, and DeterminationMethodCode. UUID can be an identifier, which can be unique, of the InternalRequestParty. UUID can be used as an alternative key, and may be based on GDT of type UUID. PartyID can be an identifier of the InternalRequestParty in the business document or the master data object. If a business partner or organizational unit are referenced, the attribute can contain their identifiers. If an unidentified identifier is, for example, entered by the user, the attribute can contain this identifier. PartyID may be optional and may be based on GDT of type PartyID. PartyUUID can be an identifier, which can be unique, for the business partner, the organizational unit or their specializations. PartyUUID can be optional and may be based on GDT of type UUID. PartyTypeCode can be a coded representation of the type of the business partner, organizational center or their specializations referenced with the element PartyUUID. PartyTypeCode may be optional and may be based on GDT of type BusinessObjectTypeCode. RoleCategoryCode can be a coded representation of the Party Role Category of the InternalRequestParty in the business document or the master data object. RoleCategoryCode may be optional and may be based on GDT of type PartyRoleCategoryCode. RoleCode can be a coded representation of the Party Role of the InternalRequestParty in the business document or the master data object. RoleCode may be based on GDT of type PartyRoleCode. AddressReference can be a reference to the address of the InternalRequestParty. AddressReference may be optional and may be based on GDT PartyAddressReference. DeterminationMethodCode can be a coded representation of the determination method of the Party. DeterminationMethodCode may be optional and may be based on GDT PartyDeterminationMethodCode. A party could be a person, organization or group within or outside of the company. Propagation can be used for all parties, that is, parties that can be specified at InternalRequest level can be used for all items if not otherwise specified on item level. InternalRequest can have the following composition relationship to the subordinate node PartyAddress (DO) 262040 which has a cardinality of 1:c. InternalRequest can have the following relationship to the node Party which has a cardinality of c:cn. Party can be the referenced party in master data.

InternalRequest can have the following relationship to the Node Root UsedAddress which has a cardinality of c:cn. The transformed object UsedAddress may represent a uniform way to access a party address of an InternalRequest whether it's a business partner address, a organization centre address or an address specified within an InternalRequest for the address used for the Party. This may be: 1) A referenced address of the master data object, or 2) the PartyAddress used via the composition relationship. It may be possible to determine which of the two applies by means of the PartyAddressHostTypeCode element The instance of the TO UsedAddress can represent the address. The association may or may not be implemented. In case 1): The node ID of the node in the master data object may be able to be determined via the PartyTypeCode, PartyAddressUUID and PartyAddressHostTypeCode elements that have the composition relationship to the DO address that may be represented by the TO UsedAddress. Additionally, the TO UsedAddress in the implemented association may be provided with the following information: That this can be an example of a master data address BusinessObjectTypeCode, BusinessObjectNodeTypeCode and Node ID of its own ItemParty node. These may be required if changes to the TO UsedAddress take place. In this case, the master data address can be copied by the TO UsedAddress, the changes can take place to the copy, and a corresponding DO Address can be created at the ItemParty via the PartyAddress composition relationship. In case 2) the TO UsedAddress may be informed of the BusinessObjectTypeCode, BusinessObjectNodeTypeCode and Node ID of its own ItemParty. Additionally, information may be provided that this is not an example of a referenced address. In this case, the TO UsedAddress may represent the DO address used at the ItemParty via the PartyAddress composition relationship. The integrity conditions exist, such that if the PartyUUID exists, the PartyTypeCode may also be able to exist. Parties may be able to be referenced via the Transformed Object Party, that represents at least one of the following business objects: Company, Employee, BusinessPartner.

An InternalRequestPartyAddress can be a procurement document address of a party. The InternalRequestPriceCalculation can contain the summary of the determined price components for the InternalRequest. For detailed structure see Dependent Object PriceCalculation. The InternalRequestTaxCalculation can contain the summary of the determined tax components for the InternalRequest. The InternalRequestTextCollection can be a collection of textual descriptions which can be related to the InternalRequest. Each text can be specified in different languages and can include formatting information. For detailed structure see Dependent Object TextCollection. An InternalRequestTextCollection can be, for example, an approval note added by the requester or by one of the approvers during the approval of the InternalRequest. The InternalRequestAccessControlList can be a list of access groups that have access to the entire InternalRequest during a validity period. It can be used to control the access to InternalRequest instances. For detailed structure see Dependent Object AccessControlList. The Approval (Transformation Node) can be used for official permission for business-relevant changes to an InternalRequest or parts of it. An InternalRequest creation, change or deletion can be applied by a person who is missing the authorization to activate this. Typical examples include employee self-service scenarios, such as the leave request, where the requester requires permission by their manager before the vacation is booked into the system. The elements located directly at the node Approval can be defined by the data type: ProcurementDocumentApprovalElements. In certain implementations, these elements can include: StatusCode, StartDateTime, and EndDateTime. StatusCode can be the approval state of the business object. StatusCode may be based on GDT of type ApprovalStatusCode. StartDateTime can be the point in time when the approval is started (may correspond to the 1 st approval task created on the object). StartDateTime may be optional and may be based on GDT of type GLOBAL_DateTime. EndDateTime can be the point in time when the approval is finished (may correspond to the last approval task completed). EndDateTime can be optional and may be based on GDT of type GLOBAL_DateTime. InternalRequest can have the following composition relationship to the subordinate node ApprovalStep 262056 which has a cardinality of 1:cn. InternalRequest can have the following relationship to the node FirstApprovalStep which has a cardinality of 1:c.

ApprovalStep (Transformation Node) can be part of the approval providing parts of or the full required official permission. In general, one Approver can be authorized to approve an aspect of the object or more than one approver can be required to finally permit the activation. For example, there may be an approver with official permission for the cost of a project, while another may be responsible to approve the risk of potential legal problems. As another example, before a leave request can be approved, the approval of the requestor's line manager and project lead may be required. The elements located directly at the node ApprovalStep can be defined by the data type ProcurementDocumentApprovalStepElements. In certain implementations, these elements can include: StatusCode, StartDateTime, and EndDateTime. StatusCode can be the status of the approval, and may be based on GDT of type ApprovalStatusCode. StartDateTime can be the point in time when the Approval Step is created (such as, the first task for that step is created). StartDateTime may be optional and may be based on GDT GLOBAL_of type DateTime. EndDateTime can be the point in time when the Step is finished (such as, the last task of the step is completed or removed). EndDateTime may be optional and may be based on GDT of type GLOBAL_DateTime. InternalRequest can have the following composition relationship to the subordinate node ApprovalStepApprover 262058 which has a cardinality of 1:n. The Cardinality may be 1:n, in case of approval simulation or before an approval step in process is taken over by an approver. It may be 1:1 after it is taken over, approved or rejected by an approver.

InternalRequest can have the following relationship to the node MainApprovalStepApprover which has a cardinality of c:1. If there is only one approver, then he or she may automatically be the main approver. In other cases, it may be possible that a main approver can be defined. For the status codes 'approval not started', 'withdrawn' and 'in approval' the cardinality of the association from the approval step to the approval step approver often can be 1 to n. For the status codes 'in revision', 'approved' and 'rejected' the cardinality often can be 1 to 1. The status code 'approval not necessary' may or may not be not allowed on step level. An unnecessary approval step may be able to be instanciated. Typically, following the status scheme for approval, there may be a list of one or more approvers responsible (for example, in state 'approval not started', after approval is 'withdrawn' or when the step is 'in approval'). Once an approver from this list can be approving, rejecting or sending the approval task back for revision by the requestor, the approver may become the defined processor of that step. A straightforward live cycle of an approval step can be:

State "not started": a list of n approvers, start- and end times intialled. State "in approval": a list of n approvers, start times filled. State "approved/rejected": a single approver (from the list), start and end time filled. This model may become a bit more complex if states such as "in revision" or "approval withdrawn" are included.

An approver of the approval step can be an employee expected to be responsible for a future approval step (Approval Simulation), or an employee who may be assigned to an approval step in process (Current Approval Situation), or an employee who has processed an approval step in the past (Approval History). The elements located at the node ApprovalStepApprover can be defined by the data type ProcurementDocumentApprovalStepApproverElements. In certain implementations, these elements can include EmployeeUUID. EmployeeUUID can be an identifier, which can be unique, of an employee who is expected to receive an approval task or who is currently owner of an approval task or who has processed an approval task. EmployeeUUID may be based on GDT of type UUID, From the business object Employee, the entity Employee has a relationship 1:cn. This refers to the Employee responsible for approval of the InternalRequest. An InternalRequestItem can specify a product of an InternalRequest and describes additional information including the required quantity, price information and delivery date information. The InternalRequestItem can contain references to other business documents that can be relevant for the item. The InternalRequestItem can contain elements that can be defined by the data type ProcurementDocumentItemElements. In certain implementations, these elements can include: ID, UUID, SystemAdministrativeData, HierarchyRelationship, TypeCode, DeliveryPeriod, Description, Quantity, QuantityTypeCode, NetAmount, TaxAmount, CostUpperLimitAmount, CostUpperLimitExpectedAmount, MiscellaneousPartialCostUpperLimitAmount, ListUnitPrice, NetUnitPrice, FollowUpDelivery, EmployeeTimeConfirmationRequiredIndicator, and Status. ID can be the identifier for the InternalRequestItem assigned by the BuyerParty. ID may be based on GDT of type BusinessTransactionDocumentItemID. UUID can be a universal alternative identifier, which can be unique, of the InternalRequestItem for referencing purposes. UUID can be used as an alternative key and may be based on GDT of type UUID. SystemAdministrativeData can be administrative data stored within the system. These data can contain system users and time of change. SystemAdministrativeData may be based on GDT of type SystemAdministrativData. A HierarchyRelationship can be the relationship between a subitem and a higher-level parent item in an item hierarchy. HierarchyRelationship is optional, and it can contain the following elements that can be defined by the data type ProcurementDocumentItemHierarchyRelationship: ParentItemUUID, which can be an identifier for the parent InternalRequestItem and may be based on GDT of type UUID; and TypeCode, which can be a coded representation of the type of hierarchical relationship between the subitem and its higher-level parent item, and may be based on GDT of type BusinessTransactionDocumentItemHierarchyRelationshipTypeCode. In certain implementations, TypeCode in this context may include a restriction, that only TypeCode 002 (Group) can be used for an InternalRequestItem. TypeCode can be a coded representation for the InternalRequestItem type. TypeCode may be optional and may be based on GDT of type BusinessTransactionDocumentItemTypeCode. In certain implementations, TypeCode may include restrictions, such that the following codes are permitted for an InternalRequestItem: 018, Purchasing Material Item 262030; 019, Purchasing Service Item 262032; 020, Purchasing Limit Item 262034; and 021, Purchasing Hierarchy Item 262036.

DeliveryPeriod can be the delivery date of the product or the time period and duration in which the service should be rendered. DeliveryPeriod may be optional and may be based on GDT of type UPPEROPEN_LOCALNORMALISED_DateTimePeriod. Description can be a textual description of the InternalRequestItem. Description may be optional and may be based on GDT of type SHORT_Description. Quantity can be the quantity of material or service for the InternalRequestItem. Quantity can be optional and may be based on GDT of type Quantity. QuantityTypeCode can be a coded representation of a type of the quantity. QuantityTypeCode may be optional and may be based on GDT of type QuantityTypeCode. NetAmount can be the net amount of the InternalRequestItem calculated from NetUnitPrice and Quantity. NetAmount may be optional and may be based on GDT of type Amount. TaxAmount can be the tax amount of the InternalRequestItem. TaxAmount may be optional and may be based on GDT of type Amount. CostUpperLimitAmount can be the limit for the total costs that may not be exceeded in an ordering process. The overall limit amount can be specified for purchasing limit items (item type code: 20). With it, it may not be allowed to specify the ListUnitPrice, the NetUnitPrice, the NetAmount and the TaxAmount for purchasing limit items. CostUpperLimitAmount may be optional and may be based on GDT of type Amount. CostUpperLimitAmount may include a qualifier, Limit. CostUpperLimitExpectedAmount can be the costs that may be expected within an ordering process. The expected costs can be equal or less than the maximum permitted costs. CostUpperLimitExpectedAmount may be optional and may be based on GDT of type Amount (Qualifier: Expected). MiscellaneousPartialCostUpperLimitAmount can be the partial limit for the overall limit for miscellaneous costs. The miscellaneous limit can be specified if the limit item has a PurchasingContract reference, because the miscellaneous limit defines the costs that can be permitted for non-contract related delivery and invoice items. The miscellaneous limit can be less than the overall limit amount. MiscellaneousPartialCostUpperLimitAmount may be optional and may be based on GDT of type Amount. MiscellaneousPartialCostUpperLimitAmount may include a qualifier, Limit. ListUnitPrice can be the list price for the base quantity of a product. The ListUnitPrice can be the basis for the calculation of the NetUnitPrice. ListUnitPrice may be optional and may be based on GDT of type Price. NetUnitPrice can be the net price for the base quantity of a product that can be used to calculate the net amount. The NetUnitPrice can be calculated out of the ListUnitPrice less rebate. NetUnitPrice may be optional and may be based on GDT of type Price. OpenQuantityCancelledIndicator may be optional and may be based on GDT of type Indicator. OpenQuantityCancelledIndicator may include a qualifier, Cancelled. FollowUpDelivery can be information about whether the buyer wants to be informed about delivered materials and services. FollowUpDelivery may be optional and in certain implementations can include the following element that can be defined by the data type ProcurementDocumentItemFollowUpDelivery: RequirementCode, which can indicate whether the follow-up documents GoodsAndServiceAcknowledgement or InboundDelivery can be expected or unexpected. Values 02 (Expected) and 04 (Unexpected) from GDT of type FollowUpBusinessTransactionDocumentRequirementCode may be used in an Item. RequirementCode may be based on GDT of type FollowUpBusinessTransactionDocumentRequirementCode. EmployeeTimeConfirmationRequiredIndicator can indicate whether it may be required to confirm the performed employee labor time or not. EmployeeTimeConfirmationRequiredIndicator and may be based on GDT of type Indicator. In certain implementations, EmployeeTimeConfirmationRequiredIndicator may include a qualifier, Required. Status can be information about the lifecycle of the InternalRequestItem and the results and prerequisites of its processing steps. The elements can be defined by the data type ProcurementDocumentItemStatus, and in certain implementations can include: InternalRequestLifeCycleStatusCode, which may be based on GDT of type InternalRequestLifeCycleStatusCode; CancellationStatusCode, which may be based on GDT of type CancellationStatusCode; and DeliveryProcessingStatusCode, which may be based on GDT of type ProcessingStatusCode.

InternalRequest can have the following composition relationships to subordinate nodes: ItemProduct 262038 can have a cardinality of 1:c; ItemDeliveryTerms can have a cardinality of 1:c; ItemAccountingCodingBlockDistribution (DO) 262062 can have a cardinality of 1:c; ItemParty 262042 can have a cardinality of 1:cn; ItemLocation 262044 can have a cardinality of 1:c; ItemBusinessTransactionDocumentReference can have a cardinality of 1:cn; ItemActualValues can have a cardinality of 1:c; ItemAttachmentFolder (DO) can have a cardinality of 1:c; ItemTextCollection (DO) can have a cardinality of 1:c; and ItemBusinessProcessVariantType 262060 can have a cardinality of 1:cn. InternalRequest can have the following relationship to the node ParentItem which has a cardinality of c:cn. ParentItem can be an association to a InternalRequestItem itself, which can be the relationship between a subitem and a higher-level parent item in an item hierarchy. This may enable item hierarchies to be mapped. The hierarchies can be mapped using the elements HierarchyRelationshipTypeCode and ParentItemID. InternalRequest can have the following relationships to the nodes: CreationIdentity can have a cardinality of 1:cn. CreationIdentity can be the identity that created the procurement document; and LastChangeIdentity can have a cardinality of c:cn. LastChangeIdentity can be the identity that changed the procurement document the last time.

There may be a number of Associations for Navigation including: Associations to InternalRequestItem, ChildItem has a cardinality of c:cn. Child can be an item in an item hierarchy. The association can be necessary in order to create item hierarchies in some implementations. Associations to transformed object BusinessDocumentFlow, BusinessDocumentFlow has a cardinality of c:c. Association to the BusinessDocumentFlow which can be a view on the set of all preceding and succeeding business (transaction) documents for the current InternalRequest. Associations to the InternalRequestItemParty, ProductRecipientItemParty has a cardinality of c:c. Association to a Party which appears within the ProductRecipientParty specialisation, ServicePerformerItemParty has a cardinality of c:c. Association to a Party which can appear within the ServicePerformerParty specialisation, SellerItemParty can have a cardinality of c:c. Association to a Party which can appear within the SellerParty specialisation, ProposedSellerItemParty can have a cardinality of c:c. Association to a Party which can appear within the ProposedSellerParty specialisation. Associations to the InternalRequestItemLocation, ShipToItemLocation has a cardinality of c:c. Association to a Location which can appear within the ShipToLocation specialisation. Associations to the InternalRequestItemBusinessTransactionDocument Reference, ItemPurchasingContractItemReference has a cardinality of c:c. Association to a BusinessTransactionDocumentReference which can appear within the PurchasingContract specialisation. ItemPurchaseRequestItemReference has a cardinality of c:c. Association to a BusinessTransactionDocumentReference which can appear within the PurchaseRequest specialisation, ItemPurchaseOrderItemReference has a cardinality of c:c. Association to a BusinessTransactionDocumentReference which can appear within the PurchaseOrder specialisation, ItemInhouseRequirementItemReference has a cardinality of c:c. Association to a BusinessTransactionDocumentReference which can appear within the InhouseRequirement specialisation, ItemGoodsAndServiceAcknowledgementItemReference: c:c. Association to a BusinessTransactionDocumentReference which can appear within the GoodsAndServiceAcknowledgement specialisation, Item SupplierInvoiceItemReference has a cardinality of c:c. Association to a BusinessTransactionDocumentReference which can appear within the SupplierInvoice specialisation.

Associations to the ItemBusinessProcessVariantType, MainItemBusinessProcessVariantType has a cardinality of c:c. Association to a item business process variant type which can be the main business process variant type. Associations to the Dependent Object PriceCalculation, PriceCalculationItem has a cardinality of c:c. Association can be to a price calculation item. Associations to the Dependent Object TaxCalculation, TaxCalculationItem has a cardinality of c:c. Association can be to a tax calculation item.

The action CompleteCancellation may be able to complete the cancellation of an InternalRequestItem. The action ConfirmDelivery may be able to confirm the delivery for an InternalRequestItem. The action Copy may be able to copy a specified item in the InternalRequest. The action CreateDelivery may be able to create the delivery by the One Click functionality. The action Delete may be able to delete an InternalRequestItem. The action DiscardCancellation may be able to discard the cancellation of an InternalRequestItem. The action SubmitForCancellation may be able to submit the cancellation of an InternalRequestItem. QueryByProduct can provide a list of all InternalRequestItems which can contain the specified product information. The query elements can be defined by the data type ProcurementDocumentItemProductQueryElements. In certain implementations, these elements can include: ID, which may be optional and may be based on GDT of type BusinessTransactionDocumentItemID; ItemProductProductID, which may be optional and may be based on GDT of type ProductID; ItemProductProductTypeCode, which may be optional and may be based on GDT of type ProductTypeCode; and ItemDescription, which may be optional and may be based on GDT of type SHORT_Description. The InternalRequestItemProduct can be the identification, description and classification of the product within the InternalRequestItem. The InternalRequestItemProduct may or may not contain the following elements that can be defined by the data type ProcurementDocumentItemProductElements: ProductUUID, ProductID, ProductStandardID, ProductSellerID, ProductTypeCode, ProductTypeCode, ProductCategoryInternalID, ProductCategoryStandardID, and ProductCatalogueReference. ProductUUID can be a universal identifier, which can be unique, for a product. ProductUUID may be optional and may be based on GDT of type UUID. ProductID can be a proprietary identifier for a product. ProductID may be optional and may be based on GDT of type ProductID. ProductStandardID can be a standardized identifier for the product, whereby the identification scheme can be managed by an agency from the code list DE 3055. ProductStandardID may be optional and may be based on GDT of type ProductStandardID. ProductSellerID can be an identifier that can be used proprietarily by the SellerParty for this product. ProductSellerID may be optional and may be based on GDT of type ProductPartyID. ProductTypeCode can be a coded representation of the type of a product. ProductTypeCode may be optional and may be based on GDT of type ProductTypeCode. ProductTypeCategoryCode can be a universal identifier, which can be unique, for a product category. ProductTypeCategoryCode may be optional and may be based on GDT of type UUID. ProductCategoryInternalID can be a proprietary identifier for a product category. ProductCategoryInternalID may be optional and may be based on GDT of type ProductCategoryInternalID. ProductCategoryStandardID can be a standardized identifier for a product category, whereby the identification scheme can be managed by an agency from the code list DE 3055. ProductCategoryStandardID may be optional and may be based on GDT ProductCategoryStandardID. ProductCatalogueReference can be a reference, which can be unique, to a catalog or to an object within a catalog. ProductCatalogueReference may be optional and may be based on GDT of type CatalogueReference. A product category can be a division of products according to objective criteria. The product category can be automatically derived from the Material or ServiceProduct if product identification is specified. However, a Material or ServiceProduct can also be specified by natural linguistic text. In this case the product category can be assigned manually. InternalRequest can have the following relationship with the node Material which has a cardinality of c:cn. The InternalRequestItemProduct may represent the Product specialisation Material if an InternalRequestItem contains a Material. InternalRequest can have the following relationship with the node ServiceProduct which has a cardinality of c:cn. The InternalRequestItemProduct may represent the Product specialisation ServiceProduct if an InternalRequestItem contains a ServiceProduct. InternalRequest can have the following relationship with the node ProductCategoryHierarchyProductCategory which has a cardinality of c:cn. The InternalRequestItemProduct may represent a ProductCategory that classifies the requested Material or ServiceProduct.

The InternalRequestItemDeliveryTerms 262046 can be conditions and agreements that can be formulated at the time of the order that apply for the execution of the delivery and the necessary associated services and activities. The InternalRequestItemDeliveryTerms may or may not contain the following elements that can be defined by the data type ProcurementDocumentDeliveryTermsElements:

MaximumLeadTimeDuration, Incoterms, and QuantityTolerance. MaximumLeadTimeDuration may be optional and may be based on GDT of type Duration. Incoterms can be the standard contract formulas for the terms of delivery. Incoterms may be optional and may be based on GDT of type Incoterms. QuantityTolerance can be the definition of tolerances for the quantity. QuantityTolerance may be optional and may be based on GDT of type QuantityTolerance. The InternalRequestItemAccountingCodingBlockDistribution can be a distribution of value changes from an InternalRequestItem to coding blocks, whereby the distribution may occur on the basis of amounts, quantities, or percentages. A coding block can be a set of accounting objects of different types. An accounting object can be a business object to which value changes from business transactions can be assigned in Accounting. For example, a cost center or a profit center. For detailed structure see Dependent Object AccountingCoding- BlockDistribution. The InternalRequestItemParty can be a natural or legal person, organization, organizational unit or group that may be involved in an InternalRequestItem in a PartyRole. A party can be a BusinessPartner in the specialisation Employee or Supplier, or an OrganisationalCentre in the specialisation Company. An InternalRequestItemParty can occur within the following specialisations: a ProductRecipientItemParty (i.e., a party to which goods can be delivered and/or for which services can be provided), a ServicePerformerItemParty (i.e., a party that delivers goods and/or provides services), a SellerItemParty (i.e., a party that sells goods and/or services), or a ProposedSellerItemParty (i.e., a party which is proposed to sell goods and/or services). The InternalRequestItemParty may or may not contain the following elements that can be defined by the data type ProcurementDocumentItemPartyElements: UUID, PartyID, PartyUUID, PartyTypeCode, RoleCategoryCode, RoleCode, AddressReference, and DeterminationMethodCode. UUID can be an identifier, which can be unique, of the InternalRequestItemParty. UUID can be used as an alternative key and may be based on GDT of type UUID. PartyID can be an identifier of the InternalRequestItemParty in the business document or the master data object. If a business partner or organizational unit are referenced, the attribute can contain their identifiers. If an unidentified identifier is, for example, entered by the user, the attribute contains this identifier. PartyID may be optional and may be based on GDT of type PartyID. PartyUUID can be an identifier, which can be unique, for the business partner, the organizational unit or their specializations. PartyUUID may be optional and may be based on GDT of type UUID. PartyTypeCode can be a coded representation of the type of the business partner, organizational center or their specializations referenced with the element PartyUUID. PartyTypeCode may be optional and may be based on GDT of type BusinessObjectTypeCode. RoleCategoryCode can be a coded representation of the Party Role Category of the InternalRequestItemParty in the business document or the master data object. RoleCategoryCode may be optional and may be based on GDT of type PartyRoleCategoryCode. RoleCode can be a coded representation of the Party Role of the InternalRequestItemParty in the business document or the master data object. RoleCode can be obligatory and may be based on GDT of type PartyRoleCode. AddressReference can be a reference to the address of the InternalRequestItemParty. AddressReference may be optional and may be based on GDT of type PartyAddressReference. DeterminationMethodCode can be a coded representation of the determination method of the Party. DeterminationMethodCode may be optional and may be based on GDT of type PartyDeterminationMethodCode. A party could be a person, organization or group within or outside of the company. InternalRequest can have the following composition relationship to the subordinate node ItemPartyAddress (DO) has a cardinality of 1:c. InternalRequest can have the following relationship to the node root Party has a cardinality of c:cn. Party can be the referenced party in Master Data. InternalRequest can have the following relationship to the node root UsedAddress has a cardinality of c:cn. The transformed object UsedAddress may represent a uniform way to access a party address of an InternalRequestItem whether it's a business partner address, a organization centre address or an address specified within an InternalRequest.

The InternalRequestItemLocation can be a physical place, which can be relevant for the delivery of the requested materials and services. An InternalRequestItemLocation can occur within the specialisation ShipToItemLocation (i.e., the place, whereto the goods have been delivered or where a service has been provided). The InternalRequestItemLocation may or may not contain the following elements that can be defined by the data type ProcurementDocumentLocationElements: UUID, LocationID, LocationUUID, AddressReference, RoleCode, RoleCategoryCode, and DeterminationMethodCode. UUID can be a global identifier, which can be unique, of the procurement document location for referencing purposes. UUID can be used as an alternative key and may be based on GDT of type UUID. LocationID can be an identifier of the referenced Location. LocationID may be optional and may be based on GDT of type PartyID. LocationUUID can be a global identifier, which can be unique, of the Location referenced. LocationUUID may be optional and may be based on GDT of type UUID. AddressReference can be a reference to the address of the Party. AddressReference may be optional and may be based on GDT of type LocationAddressReference. RoleCode can be a coded representation of the Location role in the procurement document. RoleCode may be based on GDT of type LocationRoleCode. RoleCategoryCode can be a coded representation of the Location role category in the procurement document. RoleCategoryCode may be optional and may be based on GDT of type LocationRoleCategoryCode. DeterminationMethodCode can be a coded representation of the determination method of the Party. DeterminationMethodCode may be optional and may be based on GDT of type PartyDeterminationMethodCode. InternalRequest can have the following composition relationship to the subordinate node LocationAddress (DO) which has a cardinality of 1:c. InternalRequest can have the following relationship to the node Location which has a cardinality of c:cn. InternalRequest can have the following relationship to the node PartyAddressInformation which has a cardinality of c:cn. InternalRequest can have the following relationship to the node UsedAddress which has a cardinality of c:c. The transformed object UsedAddress may represent a uniform way to access a location address of an InternalRequestItem whether it's a business partner address, a organization center address or an address specified within a procurement document. This can be: 1) a referenced address of a master data object, or 2) the address that can be integrated via the composition relationship LocationAddress. You may be able to see which of the two cases applies by looking at the element AddressHostTypeCode. The instance of the TO UsedAddress may represent the address. The association may be implemented. In case 1), the elements AddressBusinessObjectTypeCode, AddressUUID and AddressHostTypeCode can be used to determine the Node ID of the node in the master data object, which holds the composition relationship with DO Address, which may be represented by TO UsedAddress. Furthermore, the following information may be sent to the TO UsedAddress in the implemented address: The fact that it can be a master data address; the BusinessObjectTypeCode, BusinessObjectNodeTypeCode and Node ID of the own ItemLocation node. These may or may not be required if changes are made to the TO UsedAddress. In this case the TO UsedAddress may copy the master data address, the changes may be applied and the corresponding DO Address may or may not be generated on the ItemLocation node via the composition relationship LocationAddress. In case 2), the BusinessObjectTypeCode, BusinessObjectNodeTypeCode and Node ID of the own ItemLocation may be communicated to the TO UsedAddress. Whether or not it can be a referenced address may also be included. In this case, the TO UsedAddress may represent the DO Address that is integrated via the composition relationship on the ItemLocation node.

An InternalRequestItemLocation can be a procurement document specific address of a location. The InternalRequestItemBusinessTransactionDocumentReference can be a reference, which can be unique, to another business transaction document or an item within this document which is related to the InternalRequestItem. An InternalRequestItemBusinessTransactionDocumentReference can occur within the following specialisations: ItemPurchasingContractItemReference, ItemPurchaseOrderItemReference, ItemPurchaseRequestItemReference, ItemInhouseRequirementItemReference, and ItemGoodsAndServiceAcknowledgementItemReference. PurchasingContractItemReference can be a reference to the PurchasingContractItem that holds agreed conditions between the purchaser (BuyerParty) and the supplier (SellerParty). A PurchaseOrderItemReference points to a PurchaseOrderItem in order to indicate that a PurchaseOrderItem has been created from an InternalRequestItem. A PurchaseRequestItemReference points to a PurchaseRequestItem in order to indicate that a PurchaseRequestItem has been created from an InternalRequestItem. An InhouseRequirementItemReference points to an In-houseRequirementItem in order to indicate that an InhouseRequirementItem has been created from an InternalRequestItem. In reference to ItemGoodsAndServiceAcknowledgementItemReference, a GoodsAndServiceAcknowledgementItemReference can be a reference to the GoodsAndServiceAcknowledgementItem that contains the actual received materials and services. The InternalRequestItemBusinessTransactionDocumentReference may or may not contain the following elements that can be defined by the data type ProcurementDocumentItemBusinessTransactionDocumentReferenceElements: BusinessTransactionDocumentReference, BusinessTransactionDocumentRelationshipRoleCode, and BusinessTransactionDocumentDataProviderIndicator. BusinessTransactionDocumentReference can be a reference, which can be unique, to the referred business transaction document. Furthermore, it can be possible to have a reference to a line item within the business transaction document. BusinessTransactionDocumentReference may be based on GDT BusinessTransactionDocumentReference. BusinessTransactionDocumentRelationshipRoleCode can be a coded representation of the role of a BusinessTransactionDocument in this reference. BusinessTransactionDocumentRelationshipRoleCode may be optional and may be based on GDT BusinessTransactionDocumentReferenceRoleCode. BusinessTransactionDocumentDataProviderIndicator indicates whether the referenced business transaction document can be a data provider or not. BusinessTransactionDocumentDataProviderIndicator may be based on GDT: Indicator. In certain implementations, BusinessTransactionDocumentDataProviderIndicator may include a qualifier, BusinessTransactionDocumentDataProvider.

From the business object PurchasingContract/node Item (Cross-DU), the PurchasingContractItem has a relationship c:cn. An InternalRequestItem may refer to a PurchasingContractItem. From the business object PurchaseOrder/node Item (Cross-DU), the PurchaseOrderItem has a relationship c:cn. An InternalRequestItem may refer to a PurchaseOrderItem. From the business object PurchaseRequest/node Item (Cross-DU), the PurchaseRequestItem has a relationship c:c. An InternalRequestItem may refer to a PurchaseRequestItem. From the business object InhouseRequirement/node Item (Cross-DU), the InhouseRequirementItem has a relationship c:c. An InternalRequestItem may refer to an InhouseRequirementItem. From the business object GoodsAndServiceAcknowledgement/node Item (Cross-DU), the GoodsAndServiceAcknowledgement has a relationship c:cn. An InternalRequestItem may refer to a GoodsAndServiceAcknowledgementItem. From the business object SupplierInvoice/node Item (Cross-DU), the SupplierInvoice has a relationship c:cn. An InternalRequestItem may refer to a SupplierInvoiceItem.

InternalRequestItemBusinessTransactionDocumentReferenceActualValues 262066 can be the actually achieved or performed values of a business transaction document referenced by an InternalRequestItem. InternalRequestItemBusinessTransactionDocumentReferenceActualValues may or may not contain the following elements that can be defined by the data type ProcurementDocumentItemBusinessTransactionDocumentReferenceActualValuesElements: ActivefIndicator, Amount, AmountRoleCode, CancellationDocumentIndicator, Quantity, QuantityRoleCode, and QuantityTypeCode. ActiveIndicator indicates whether the referenced business transaction document is commercially active in a procurement process or not. ActiveIndicator may be based on GDT of type Indicator. In certain implementations, ActiveIndicator may include a qualifier, Active. Amount can be the amount of the referenced business transaction document for the procurement document item. Amount may be based on GDT of type Amount. AmountRoleCode can be the amount role code can be a coded representation of the role of the amount in the referenced business transaction document. AmountRoleCode may be based on GDT of type AmountRoleCode. In certain implementations, AmountRoleCode may include the following restrictions: 55-OrderedNetAmount, 56-DeliveredNetAmount, 57-InvoicedNetAmount, 58-OrderNetAmount, 59-DeliveryNetAmount, 60-InvoiceNetAmount, 61-MiscellaneousDeliveryNetAmount, 62-MiscellaneousDeliveredNetAmount, 63-MiscellaneousInvoiceNetAmount, 64-MiscellaneousInvoicedNetAmount. CancellationDocumentIndicator indicates whether the referenced business transaction document can be a cancellation document or not. CancellationDocumentIndicator may be based on GDT Indicator. In certain implementations, CancellationDocumentIndicator may include a qualifier, CancellationDocument. Quantity can be the quantity of the referenced business transaction document for the procurement document item. Quantity may be optional and may be based on GDT of type Quantity. QuantityRoleCode can be a coded representation of the role of the quantity in the referenced business transaction document. Quantity may be optional and may be based on GDT of type QuantityRoleCode. In certain implementations, Quantity may include the following restrictions: 17-DeliveredQuantity, 18-DeliveryQuantity, 28-InvoicedQuantity, 29-InvoiceQuantity, 36-OrderQuantity, 37-OrderedQuantity). QuantityTypeCode can be a coded representation of a type of quantity in the referenced business transaction document for the procurement document item. QuantityTypeCode may be optional and may be based on GDT of type QuantityTypeCode. Quantity, QuantityRoleCode and QuantityTypeCode may or may not be specified for purchasing material and service items.

The InternalRequestItemActualValues can be the actually achieved or performed values, e.g. delivered and invoiced quantities and amounts for an InternalRequestItem. InternalRequestItemActualValues may or may not contain the following elements that can be defined by the data type ProcurementDocumentItemActualValuesElements: TotalOrderQuantity, TotalOrderQuantityTypeCode, TotalOrderNetAmount, TotalOrderedQuantity, TotalOrderedQuantityTypeCode, TotalOrderedNetAmount, TotalDeliveryQuantity, TotalDeliveryQuantityTypeCode, TotalDeliveryNetAmount, TotalMiscellaneousDeliveryNetAmount, TotalDeliveredQuantity, TotalDeliveryedQuantityTypeCode, TotalDeliveredNetAmount, TotalMiscellaneousDeliveredNetAmount, TotalInvoiceQuantity, TotalInvoiceQuantityTypeCode, TotalInvoiceNetAmount, TotalMiscellaneousInvoiceNetAmount, TotalInvoicedQuantity, TotalInvoicedQuantityTypeCode, TotalInvoicedNetAmount, and TotalMiscellaneousInvoicedNetAmount. TotalOrderQuantity can be the total quantity of order goods and services which have been captured for the procurement document item. TotalOrderQuantity may be optional and may be based on GDT of type Quantity. In certain implementations, TotalOrderQuantity may include a qualifier, Order. TotalOrderQuantityTypeCode can be a coded representation of the type of the total order quantity. TotalOrderQuantityTypeCode may be optional and may be based on GDT of type QuantityTypeCode. TotalOrderNetAmount can be the total net amount of order goods and services which have been captured for the procurement document item. TotalOrderNetAmount may be optional and may be based on GDT of type Amount. In certain implementations, TotalOrderNetAmount may include a qualifier, OrderNet. TotalOrderedQuantity can be the total quantity of ordered goods and services for the procurement document item. TotalOrderedQuantity may be optional and may be based on GDT of type Quantity. In certain implementations, TotalOrderedQuantity may include a qualifier, Ordered. TotalOrderedQuantityTypeCode can be a coded representation of the type of the total ordered quantity. TotalOrderedQuantityTypeCode may be optional and may be based on GDT of type QuantityTypeCode. TotalOrderedNetAmount can be the total net amount of ordered goods and services for the procurement document item. TotalOrderedNetAmount may be optional and may be based on GDT of type Amount. In certain implementations, TotalOrderedNetAmount may include a qualifier, OrderedNet. TotalDeliveryQuantity can be the total quantity of delivery goods or performed services which have been captured for the procurement document item. TotalDeliveryQuantity may be optional and may be based on GDT of type Quantity. In certain implementations, TotalDeliveryQuantity may include a qualifier, Delivery. TotalDeliveryQuantityTypeCode can be a coded representation of the type of the total delivery quantity. TotalDeliveryQuantityTypeCode may be optional and may be based on GDT of type QuantityTypeCode. TotalDeliveryNetAmount can be the total net amount of delivery goods or performed services which have been captured for the procurement document item. TotalDeliveryNetAmount may be optional and may be based on GDT of type Amount. In certain implementations, TotalDeliveryNetAmount may include a qualifier, DeliveryNet. TotalMiscellaneousDeliveryNetAmount can be the total net amount of deliveries which have been captured for a miscellaneous partial cost upper limit of purchasing limit item. TotalMiscellaneousDeliveryNetAmount may be optional and may be based on GDT of type Amount. In certain implementations, TotalMiscellaneousDeliveryNetAmount may include a qualifier, MiscellaneousDeliveryNet. TotalDeliveredQuantity can be the total quantity of delivered goods or performed services for the procurement document item. TotalDeliveredQuantity may be optional and may be based on GDT of type Quantity. In certain implementations, TotalDeliveredQuantity may include a qualifier, Delivered. TotalDeliveryedQuantityTypeCode can be a coded representation of the type of the total delivered quantity. TotalDeliveryedQuantityTypeCode may be optional and may be based on GDT of type QuantityTypeCode. TotalDeliveredNetAmount can be the total net amount of delivered goods or performed services for the procurement document item. TotalDeliveredNetAmount may be optional and may be based on GDT of type Amount. In certain implementations, TotalDeliveredNetAmount may include a qualifier, DeliveredNet. TotalMiscellaneousDeliveredNetAmount can be the Total net amount of delivered goods or performed services for a miscellaneous partial cost upper limit of purchasing limit item. TotalMiscellaneousDeliveredNetAmount may be optional and may be based on GDT of type Amount. In certain implementations, TotalMiscellaneousDeliveredNetAmount may include a qualifier, MiscellaneousDeliveredNet. TotalInvoiceQuantity can be the total quantity of invoice goods and performed services which have been captured for the procurement document item. TotalInvoiceQuantity may be optional and may be based on GDT of type Quantity. In certain implementations, TotalInvoiceQuantity may include a qualifier, Invoice. TotalInvoiceQuantityTypeCode can be the Coded representation of the type of the total invoice quantity. TotalInvoiceQuantityTypeCode may be optional and may be based on GDT of type QuantityTypeCode. TotalInvoiceNetAmount can be the total net amount of invoice goods and services which have been captured for the procurement document item. TotalInvoiceNetAmount may be optional and may be based on GDT of type Amount. In certain implementations, TotalInvoiceNetAmount may include a qualifier, InvoiceNet. TotalMiscellaneousInvoiceNetAmount can be the total net amount of invoices which have been captured for a miscellaneous partial cost upper limit of purchasing limit item. TotalMiscellaneousInvoiceNetAmount may be optional and may be based on GDT of type Amount. In certain implementations, TotalMiscellaneousInvoiceNetAmount may include a qualifier, MiscellaneousInvoiceNet. TotalInvoicedQuantity can be the total quantity of invoices which have been posted for the procurement document item. TotalInvoicedQuantity may be optional and may be based on GDT of type Quantity. In certain implementations, TotalInvoicedQuantity may include a qualifier, Invoiced. TotalInvoicedQuantityTypeCode can be a coded representation of the type of the total posted invoice quantity. TotalInvoicedQuantityTypeCode may be optional and may be based on GDT of type QuantityTypeCode. TotalInvoicedNetAmount can be the total net amount of invoices which have been posted for the procurement document item. TotalInvoicedNetAmount may be optional and may be based on GDT of type Amount. In certain implementations, TotalInvoicedNetAmount may include a qualifier, InvoicedNet. TotalMiscellaneousInvoicedNetAmount can be the total net amount of invoices which have been posted for a miscellaneous partial cost upper limit of purchasing limit item. TotalMiscellaneousInvoicedNetAmount may be optional and may be based on GDT of type Amount. In certain implementations, TotalMiscellaneousInvoicedNetAmount may include a qualifier MiscellaneousInvoicedNet.

Planned values (quantity and amount) in a procurement process may or may not be changed or reduced respectively to a value below the actually performed value. For purchasing limit items, actual total amounts will be available. The total values can be calculated by cumulation of the relevant item business transaction document reference actual values. The delivery of goods or services can be represented by the Business Objects GoodsAndServiceAcknowledgement or InboundDelivery. The delivered quantities and amounts, for example, can be cumulated over all the follow up GoodsAndServiceAcknowledgementItems that can be related to the InternalRequesItem. The InternalRequestItemAttachmentFolder can be a folder of all documents attached to the InternalRequestItem. The InternalRequestItemTextCollection can be a collection of all textual descriptions which are related to the InternalRequestItem. Each text can be specified in different languages and can include formatting information. The following types of texts can occur: an Internal Note, which can be addressed to internal recipients, an External Note, which gives additional information about the request and can be addressed to external recipients, or an Approval Note, which can enable the communication between approval item processors within the approval process.

An InternalRequestItemBusinessProcessVariantType defines the character of a business process variant of the InternalRequestItem. It represents a typical way of processing of an InternalRequestItem within a process component from a business point of view. A Business Process Variant is configuration of a Process Component. A Business Process Variant belongs exactly to one process component. A process component can be a software package that realizes a business process and exposes its functionality as services. The functionality contains business transactions. A process component contains one or more semantically related business objects. A business object belongs to exactly one process component. The elements located directly at the node InternalRequestItemBusinessProcessVariantType are defined by the data type ProcurementDocumentItemBusinessProcessVariantTypeElements. In certain implementations, these elements include: BusinessProcessVariantTypeCode and MainIndicator. BusinessProcessVariantTypeCode can be a coded representation of a business process variant type of an InternalRequest business process variant type. BusinessProcessVariantTypeCode may be based on GDT BusinessProcessVariantTypeCode. MainIndicator can be an indicator that can specify whether the current business process variant type can be the main one or not. MainIndicator may be based on GDT Indicator. In certain implementations, MainIndicator includes a qualifier, Main. The Integrity Conditions may exist such that one of the instances of the BusinessProcessVariantType may or may not be allowed to be indicated as main. A variant of Internal Request Processing, which can enable both the external procurement of goods that employees may order for their own use or services for company use. A variant of Internal Request Processing for External Procurement. By using one click, the employee may be able to confirm delivery of the complete amount of materials or the complete fulfillment of services for each item of the Internal Request. Internal Request Processing internal supplyA variant of Internal Request Processing, which may enable the internal reservation of goods that employees order for their own use. The internal request may be fulfilled by issuing an in-house requirement that reserves goods from stock.

Business Object RequestForQuote (RFQ)

FIGS. 263-1 through 263-9 illustrate an example RequestForQuote business object model 263022. Specifically, this model depicts interactions among various hierarchical components of the RequestForQuote, as well as external components that interact with the RequestForQuote (shown here as 263000 through 263020 and 263024 through 263066 and 263124).

BO RequestForQuote may be part of the process component RFQ Processing. It is represented by the root node RequestForQuote and its associations.

A RequestforQuote is a request from a buyer to a bidder to submit a quote for goods or services according to specified criteria.

The basic structure of a RequestForQuote may contain the following: detailed information on the purchaser's requests; control data for the bidding process (BiddingRule); control data for the SupplierQuote evaluation, if required (BiddingCriteriaAssessment); multiple currencies for the bidding process, if required (BiddingCurrency); additional questions—in a form—to be asked of the bidder (BidderQuestions).

Service Interfaces

BO RequestForQuote 263068 may be involved in the following Process Integration Models: Purchase Request Processing_RFQ Processing; RFQ Processing_Opportunity/Customer Quote Processing at Supplier; RFQ Processing_Purchasing Contract Processing.

Service Interface Request for Quote In (A2A)

SI Request for Quote In has the technical name RFQProcessingRequestForQuoteIn. It represents a grouping of operations which create and update a RequestForQuote based on requests from business objects which may be involved in the bidding process, such as BO PurchasingContract or BO PurchaseRequest.

SI Request for Quote In may be part of the following Process Integration Models: Purchase Request Processing_RFQ Processing; Purchasing Contract Processing_RFQ Processing.

SI Operation Maintain Request for Quote (A2A)

SI Operation Maintain Request for Quote has the technical name RFQProcessingRequestForQuoteIn.MaintainRequestForQuote. It is based on the message type RFQExecutionRequest (derived from Business Object RequestForQuote).

SI Operation Maintain Request for Quote may create or update a RequestForQuote based on requests from business objects which initiate the bidding process, such as BO PurchasingContract or BO PurchaseRequest.

A PurchasingContract which has to be negotiated may use operation Maintain Request for Quote to create or update a RequestForQuote. A PurchaseRequest may use this operation to create a RequestForQuote to find new sources of supply.

SI Operation Cancel Request for Quote (A2A)

SI Operation Cancel Request for Quote has the technical name RFQProcessingRequestForQuoteIn.CancelRequestForQuote. It is based on the message type RFQExecutionCancellationRequest (derived from Business Object RequestForQuote).

SI Operation Cancel Request for Quote may cancel the bidding process without any results based on request from Business Object PurchasingContract that initiated the bidding process.

Service Interface Request for Quote Out (A2A)

SI Request for Quote Out has the technical name RFQProcessingRequestForQuoteOut. It represents a grouping of operations which send a confirmation to business objects which have requested the creation or update of a RequestForQuote using SI Request for Quote In.

SI Request for Quote Out may be part of the following Process Integration Models: Purchase Request Processing_RFQ Processing; RFQ Processing_Purchasing Contract Processing.

SI Operation Confirm Request for Quote (A2A)

SI Operation Confirm Request for Quote has the technical name RFQProcessingRequestForQuoteOut.ConfirmRequestForQuote. It is based on the message type RFQExecutionConfirmation (derived from Business Object RequestForQuote).

SI Operation Confirm Request for Quote may confirm the creation or update of a RequestForQuote to business objects which may have sent the corresponding request using the Maintain Request for Quote operation; such business objects may include BO PurchasingContract or BO PurchaseRequest.

Service Interface Request Quote Processing Out (B2B)

SI Request Quote Processing Out has the technical name RFQProcessingRequestQuoteProcessingOut. It represents a grouping of operations which send the RequestForQuote, the RequestForQuote's changes and the RequestForQuote's cancellation to the supplier or to another bidding portal.

SI Request Quote Processing Out may be part of the following Process Integration Models: RFQ Processing_Opportunity/Customer Quote Processing at Supplier.

Operation Request Quote Creation (B2B)

SI Operation Request Quote Creation has the technical name RFQProcessingRequestQuoteProcessingOut.RequestQuoteCreation. It is based on the message type RFQRequest (derived from Business Object RequestForQuote).

SI Operation Request Quote Creation may request the participation of the supplier in a bidding process. The RFQRequest may be sent once for each invited bidder.

The address for a message may also be a tendering platform, for example, which means that the actual bidders are not known when the RFQRequest is issued. RFQs issued by public authorities are published with general access. Rather than being invited directly, bidders apply to participate, via the platform. The aim of the platform is to avoid giving certain bidders preferential treatment as a result of not inviting or informing (in other words, by implicitly excluding) other bidders.

Operation Notify of Request for Quote Cancellation (B2B)

SI Operation Notify of Request for Quote Cancellation has the technical name PFQProcessingRequestQuoteProcessingOut.NotifyOfRequestForQuoteCancellation. It is based on the message type RFQCancellationRequest (derived from Business Object RequestForQuote).

SI Operation Notify of Request for Quote Cancellation may notify the supplier about the cancellation of RequestForQuote. The RFQCancellationRequest may be sent at any time up to the submission deadline. After the RFQCancellationRequest has been sent, further messages are generally not expected.

The RFQCancellationRequest may be sent to all the invited bidders, regardless of whether a quotation already exists. In the case of a tendering platform, the RFQCancellationRequest may be sent to the tendering platform and to all the bidders who have already submitted a quotation.

Operation Notify of Request for Quote Change (B2B)

SI Operation Notify of Request for Quote Change has the technical name RFQProcessingRequestQuoteProcessingOut.NotifyOfRequestForQuoteChange. It is based on the message type RFQChangeRequest (derived from Business Object RequestForQuote).

SI Operation Notify of Request for Quote Change may notify the supplier about changes of the RequestForQuote. The RFQChangeRequest may be sent once for each invited bidder. This may be independent of whether a quotation has already been submitted.

In the case of a publication platform, which may be used only to publish a RequestForQuote, the RFQChangeRequest may be sent to the platform and to all the bidders who have already submitted a quotation. In the case of a tendering platform, which also manages the quotation process (such as in the public sector), the RFQChangeRequest may be sent to the tendering platform. The platform then provides the bidders with information.

An RFQChangeRequest can be sent as often as required and at any time, provided that RFQCancellationRequest or RFQResultNotification messages have not been sent.

NODE STRUCTURE

BO RequestForQuote/Root Node

A RequestForQuote is a request from a purchaser to external bidders or to a public portal to submit a quote for a material or a service. It may contain the parties involved, the items, conditions and agreements for the bidding process, its status as well as references. Furthermore it may contain identification and administrative information of the request.

Bidders are invited to respond to the requirements contained in the RequestForQuote by submitting a SupplierQuote. A RequestForQuote may be issued by a purchaser to bidders in situations such as the following: the purchaser requires a material or service and wishes to obtain (pricing) information from several bidders; the purchaser has specified their requirement in terms of functions & features and wishes to obtain suitable materials from bidders; the purchaser has to renegotiate a contract with the original supplier.

The structure elements located directly at BO RequestForQuote/Root Node are defined by data type RequestForQuoteElements, which is derived from data type ProcurementDocumentElements. In certain implementations these elements may include the following: SystemAdministrativeData, UUID, ID, TypeCode, NegotiationTypeCode, ProcessingTypeCode, TemplateIndicator, PublicIndicator, Name, CurrencyCode, ProductCategory, TimeSettings, FollowUpPurchasingContract, FollowUpPurchaseOrder, Status.

SystemAdministrativeData specifies administrative data stored within the system. These data contain system users and time of change. This element may be based on GDT SystemAdministrativeData.

UUID is an identifier, which may be unique, of the RequestForQuote for referencing purposes. This element may be based on GDT UUID.

ID is an identifier for the RequestForQuote which can either be entered manually or is determined by the system. This element may be based on GDT BusinessTransactionDocumentID.

TypeCode is the coded representation of the RequestForQuote type. For example: RFx or Live Auction. This element may be based on GDT BusinessTransactionDocumentTypeCode, value 111-RequestForQuote.

NegotiationTypeCode is a coded representation of a negotiation type of a Request for Quote. The negotiation in the Request for Quote may be operational or strategic. This element may be based on GDT RequestForQuoteNegotiationTypeCode.

ProcessingTypeCode is the coded representation of the processing type of the RequestForQuote. Possible examples are a request for Information without requested price information, or a contract negotiation with complex price information. This element may be based on GDT BusinessTransactionDocumentProcessingTypeCode.

TemplateIndicator specifies whether the RequestForQuote is a template or not. This element may be based on GDT Indicator.

PublicIndicator specifies whether the RequestForQuote is restricted, that is, only accessible by explicitly invited BidderParties or public, that is, accessible to BidderParties that have not been explicitly invited. This element may be based on GDT Indicator.

Name is the designation or title of the RequestForQuote. This element may be based on GDT MEDIUM_Name. It may be optional.

CurrencyCode is the coded representation of the RequestForQuote currency. This element may be based on GDT CurrencyCode. It may be optional.

ProductCategory contains the details for identifying the product category. It may be optional. The ProductCategory is a division of products according to objective criteria that is used to group RFQs mainly for information purposes, such as when specifying the most appropriate product category will increase the chances of the right bidder finding the RFQ and responding.

Sub-elements of structure element ProductCategory are defined by GDT ProcurementDocumentProductCategory. In certain implementations these may include the following. UUID is an identifier, which may be unique, for the product category; it may be based on GDT UUID and may be optional. ID is an identifier, which may be proprietary, for the product category; it may be based on GDT ProductCategoryID and may be optional.

TimeSettings contains all dates and times which are relevant for the bidding process. It may be optional.

Sub-elements of structure element TimeSettings are defined by data type ProcurementDocumentTimeSettings. In certain implementations these may include the following. SubmissionPeriod specifies the period of time in which the SupplierQuote is to be submitted; this sub-element may be based on GDT GLOBAL_DateTimePeriod and may be optional. BidderApplicationDateTime specifies the deadline up to which the BidderParty has been applied for the bidding process; this sub-element may be based on GDT GLOBAL_DateTime and may be optional. SupplierQuoteBindingDateTime specifies the deadline up to which the BidderParty is bound by the submitted SupplierQuote; this sub-element may be based on GDT GLOBAL_DateTime and may be optional. SupplierQuoteOpeningDateTime specifies a date and time subsequent to which the received SupplierQuotes for the RequestForQuote are open for viewing by BuyerParty; this sub-element may be based on GDT GLOBAL_DateTime and may be unique.

FollowUpPurchasingContract specifies information about whether the buyer expects a PurchasingContract as follow-up document or not. It may be optional.

Sub-elements of structure element FollowUpPurchasingContract are defined by data type ProcurementDocumentFollowUpPurchasingContract. In certain implementations these may include the following. RequirementCode specifies the coded representation of the need for a follow-up PurchasingContract that should be created out of the accepted SupplierQuote; this sub-element may be based on GDT FollowUpBusinessTransactionDocumentRequirementCode, values 02-Expected and/or 04-Unexpected. TotalTargetAmount specifies the total target amount of the RequestForQuote as default for contract negotiation process; this sub-element may be based on GDT Amount, Qualifier Target, and may be optional. ValidityPeriod specifies the period of time in which the pending PurchasingContract is valid; this sub-element may be based on GDT GLOBAL_DateTimePeriod and may be optional.

FollowUpPurchaseOrder specifies information about whether the buyer expects a PurchaseOrder as follow-up document or not. It may be optional.

Sub-elements of structure element FollowUpPurchaseOrder are defined by data type ProcurementDocumentFollowUpPurchaseOrder. In certain implementations these may include the following. RequirementCode, which specifies the coded representation of the need for a follow-up PurchaseOrder that should be created out of the accepted SupplierQuote; this sub-element may be based on GDT FollowUpBusinessTransactionDocumentRequirementCode, values 02-Expected and/or 04-Unexpected.

Status contains status information about the lifecycle of the RequestForQuote and the results and prerequisites of its processing steps.

Sub-elements of structure element Status are defined by data type ProcurementDocumentFollowUpPurchasingContract. In certain implementations these may include the following. RequestForQuoteLifecycleStatusCode is a status variable that indicates the state of the RequestForQuote in its Lifecycle; this sub-element may be based on GDT RequestForQuoteLifecycleStatusCode). PublishingStatusCode is a status variable that indicates the Publishing status of the RequestForQuote; this sub-element may be based on GDT PublishingStatusCode and may be optional. ReleaseStatusCode is a status variable that indicates the Release status of the RequestForQuote's Template; this sub-element may be based on GDT ReleaseStatusCode and may be optional. CancellationStatusCode is a status variable indicating the Cancellation status of the RequestForQuote; this sub-element may be based on GDT CancellationStatusCode and may be optional. ClosureStatusCode is a status variable indicating the Closure status of the RequestForQuote; this sub-element may be based on GDT ClosureStatusCode. ConsistencyStatusCode is a variable describing the status of the BO after a check process; this sub-element may be either consistent or inconsistent depending upon whether the check process returned error messages or not; this sub-element may be based on GDT ConsistencyStatusCode and may be optional. TransferStatusCode is a status variable indicating the Transfer status of the RequestForQuote change version; this sub-element may be based on GDT TransferStatusCode and may be optional. ApprovalStatusCode is a status variable indicating the status of the RequestForQuote's approval and publishing process; this sub-element may be based on GDT ApprovalStatusCode. ArchivingStatusCode is a status variable indicating the Archiving status of the RequestForQuote; this sub-element may be based on GDT ArchivingStatusCode and may be optional. FinalizationStatusCode is a status variable indicating the Finalization status of the RequestForQuote; this sub-element may be based on GDT FinalizationStatusCode.

CurrencyCode may be the leading coded representation of the RequestForQuote currency, and all other CurrencyCodes may be read-only codes that do not differ from the CurrencyCode specified in the root node.

ID and/or ProcessingTypeCode may be non-changeable after creation. Also, UUID and/or SystemAdministrativeData may be determined by the service provider and may be unchangeable.

SubmissionPeriodEndDateTime may occur after the BidderApplicationDateTime, SupplierQuoteOpeningDateTime may occur after SubmissionPeriodEndDateTime, and SupplierQuoteBindingDateTime may occur after SupplierQuoteOpeningDateTime. Also, when publishing the RequestForQuote, the dates of TimeSettings may not be able to be in the past.

For a RequestForQuote, one of the two Lifecycles status variables may be valid. A RequestForQuote may contain exactly one Lifecycle.

PublishingStatusCode may be used in the status scheme for active RequestForQuotes and RequestForQuote change versions and not the scheme for RequestForQuote Templates. ReleaseStatusCode may be used in the status scheme for RequestForQuote Templates. CancellationStatusCode may be used in the status scheme for active RequestForQuotes. ConsistencyStatusCode may be used in the status scheme for active RequestForQuotes and RequestForQuote change versions. TransferStatusCode may be used in the status scheme for RequestForQuote change versions. ArchivingStatusCode may be used in the status scheme for active RequestForQuotes and RequestForQuote Templates.

In certain implementations of Root Node, the following composition relationships to subordinate nodes may exist: Item 263070 may have a cardinality relationship of 1:cn; Party 263084 may have a cardinality relationship of 1:cn; Location 263104 may have a cardinality relationship of 1:cn; PriceSpecification may have a cardinality relationship of 1:c (DO); BusinessTransactionDocumentReference 263110 may have a cardinality relationship of 1:cn; BiddingRules may have a cardinality relationship of 1:c; BiddingCurrency may have a cardinality relationship of 1:cn; BiddingCriteriaAssessment may have a cardinality relationship of 1:cn; BidderPartyQuestion may have a cardinality relationship of 1:cn; ControlledOutputRequest 263108 may have a cardinality of 1:c. AttachmentFolder 263114 may have a cardinality relationship of 1:c (DO); TextCollection 263116 may have a cardinality relationship of 1:c (DO). AccessControlList 263118 may have a cardinality of 1:1. Statistics may have a cardinality of 1:c. SupplierQuoteEvaluation may have a cardinality of 1:cn (TN)

In certain implementations of Root Node, navigation associations may exist as follows. SuperordinateItem may have a cardinality relationship of c:cn, which is an association to node Item representing an association to superordinate item(s), a superordinate item being an item which is semantically associated with the root while other items with a parent item in an item hierarchy are subordinate items. BuyerParty c:c, which is an association to node Party representing an association to a party which appears within the BuyerParty specialisations. ResponsiblePurchasingOrganisationParty c:c, which is an association to node Party representing an association to a party which appears within the ResponsiblePurchasingOrganisationParty specialisations. ResponsiblePurchasingGroupParty c:c, which is an association to node Party representing an association to a party which appears within the ResponsiblePurchasingGroupParty specialisations. Requestor Party c:c, which is an association to node Party representing an association to a party which appears within the Requestor Party specialisation. ProductRecipientParty c:c, which is an association to node Party representing an association to a party which appears within the ProductRecipientParty specialisation. BidderParty may have a cardinality relationship of c:cn, which is an association to node Party representing an association to a party which appears within the BidderParty specialisation. PortalProviderParty c:c, which is an association to node Party representing an association to a party which appears within the PortalProviderParty specialisation. ShipToLocation c:c, which is an association to node Location representing a location which appears within the ShipToLocation specialisation. PurchaseRequestReference c:c, which is an association to node BusinessTransactionDocumentReference representing an association to a business transaction document reference which appears within the PurchaseRequest specialisation. Renegotiation PurchasingContractReference c:c, which is an association to node BusinessTransactionDocumentReference representing association to a business transaction document reference which appears within the PurchasingContract specialisation. RequestForQuoteReference c:c, which is an association to node BusinessTransactionDocumentReference representing association to a business transaction document reference which appears within the RequestForQuote specialisation. SupplierQuoteReference c:c, which is an association to node BusinessTransactionDocumentReference representing an association to a business transaction document reference which appears within the Supplier Quote specialisation.

In certain implementations of Root Node, the following ESI actions (Enterprise Service Infrastructure) may be implemented: SubmitForPublishing, Publish, SubmitForRelease, Release, Cancel, Close, Duplicate, CheckApprovalRelevance, Approve, Reject, WithdrawApproval, SendBackForRevision, CreateChangeVersion, TransferToActiveVersion, RegisterAsBidder, CreateSupplierQuote, CreateSupplierQuoteBySurrogate.

SubmitForPublishing may be used to start the RequestForQuote's approval and publish process to make it available for bidders. this action may additionally call the action CheckApprovalRelevance.

Publish (S&AM action) may be used after successful approval to publish the RequestForQuote to the bidder parties and to the portal provider parties.

SubmitForRelease may be used to start the RequestForQuote Template's approval and release process to make it available as master copy. This action may additionally call the action CheckApprovalProcess.

Release (S&AM action) may be used after successful approval to release RequestForQuote Templates as master copy.

Cancel (S&AM action) may cancel an already published RFQ to stop a running bidding processing and prevent any further changes to it.

Close (S&AM action) may be used to permanently close the RequestForQuote and prevent any further changes to it. SupplierQuotes which are referring to the closed RequestForQuote may also be closed.

Duplicate may be used to create a new RequestForQuote from the data of an existing one.

CheckApprovalRelevance (S&AM action) may be used to check whether the approval for the acceptance of the RequestForQuote is necessary or not. If necessary, the action may also start the approval workflow of the RequestForQuote. This action is generally not called manually by a user (from the UI).

Approve (S&AM action) may be used to accept the RequestForQuote which is in an approval process.

Reject (S&AM action) may be used to reject the RequestForQuote which is in an approval process.

WithdrawApproval (S&AM action) may be used to break and to reset the approval process; for this document the approval process may be re-started.

SendBackForRevision (S&AM action) may be used to break the approval process and return the RequestForQuote to the purchaser for revision.

CreateChangeVersion (S&AM action) may be used to create a change Version to an already published RequestForQuote.

TransferToActiveVersion (S&AM action) may be used to move the contents of the change version to the active version in a RequestForQuote.

RegisterAsBidder may be used as self registration functionality for a potential bidder to be assigned as a bidder party to the RequestForQuote.

CreateSupplierQuote may be used to create a SupplierQuote from the published RequestForQuote.

CreateSupplierQuoteBySurrogate may be used to create a SupplierQuote from the published RequestForQuote on the BidderParty's behalf for example by the purchaser. parameters for ESI CreateSupplierQuoteBySurrogate are defined by data type ProcurementDocumentRootCreateSupplierQuoteBySurrogateActionElements; in certain implementations these elements may include BidderPartyID, which specifies for whom the purchaser creates and submits the SupplierQuote.

In certain implementations of Root Node the following queries may be called: QuerySelectAll, QueryByElements, QueryByIdentification, QueryByBidderParty.

QuerySelectAll provides Root Node with a list of all RequestForQuotes.

QueryByElements contains a list of all relevant parameters which may be used to search for RequestForQuotes. It returns a list of all RequestForQuotes which satisfy the selection criteria, specified by the query elements. If in the following list of selection criteria no further selection logic is explained, the system will simply check whether the value given in the selection criterion is equal to the value of the corresponding BO node element.

QueryByElements query elements are defined by data type RequestForQuoteElementsQueryElements, which may be derived from data type ProcurementDocumentQueryElements. In certain implementations these elements may include the following. ID, which may be based on GDT BusinessTransactionDocumentID. Name, which may be based on GDT MEDIUM_Name. ProcessingTypeCode, which may be based on GDT BusinessTransactionDocumentProcessingTypeCode. TypeCode, which may be based on GDT BusinessTransactionDocumentTypeCode. TemplateIndicator, which may be based on GDT Indicator. PartyPurchasingOrganisationPartyID, which may be based on GDT BTDPartyID. PartyPurchasingGroupPartyID, which may be based on GDT BTDPartyID. PartyBidderPartyID, which may be based on GDT BTDPartyID. TimeSettings, which may contain all dates and times which are relevant for the bidding process; may be based on IDT ProcurementDocumentTimeSettings. ProductCategoryID, which may be based on GDT ProductCategoryID. ItemProductProductID, which is a proprietary identifier for the RequestForQuote a product matches with query element ProductID; may be based on GDT ProductID. ItemProductCategoryID, which is a proprietary identifier for a product category; may be based on GDT ProductCategoryID. ItemDescription, which is a description of the RequestForQuoteItem; may be based on GDT MEDIUM_Description. SystemAdministrativeData, which specifies administrative data stored within the system containing system users and time of change; may be based on GDT SystemAdministrativeData. RequestForQuoteLifecycleStatusCode, that indicates the state of the RequestForQuote in its Lifecycle and may be based on GDT RequestForQuoteLifecycleStatusCode. The above elements may be optional.

QueryByIdentification contains the important identifiers which may be used to search for RequestForQuotes. It returns a list of all RequestForQuotes which satisfy the selection criteria, specified by the query elements. If in the following list of selection criteria, no further selection logic is explained, the system will simply check whether the value given in the selection criterion is equal to the value of the corresponding BO node element. Query elements are defined by data type RequestForQuoteIdentificationQueryElements, which is derived from data type ProcurementDocumentIdentificationQueryElements. In certain implementations these elements may include the following: ID, which may be based on GDT BusinessTransactionDocumentID. Name, which may be based on GDT MEDIUM_Name. ProcessingTypeCode, which may be based on GDT BusinessTransactionDocumentProcessingTypeCode. TypeCode, which may be based on GDT BusinessTransactionDocumentTypeCode. ProductCategoryID, which may be based on GDT ProductCategoryID. SystemAdministrativeData, which represents administrative data stored within the system containing system users and time of change; may be based on GDT SystemAdministrativeData. RequestForQuoteLifecycleStatusCode, that indicates the state of the RequestForQuote in its Lifecycle and may be based on GDT RequestForQuoteLifecycleStatusCode. The above elements may be optional.

QueryByBidderParty contains the bidder specific parameters which may be used to search for RequestForQuotes by an external business partner, such as the contact person of a bidder party. It returns a list of RequestForQuotes which satisfy the selection criteria, specified by the query elements. Query elements are defined by data type RequestForQuoteBidderPartyQueryElements, which may be derived from data type ProcurementDocumentBidderPartyQueryElements. In certain implementations these elements may include the following: ID, which may be based on GDT BusinessTransactionDocumentID. Name, which may be based on GDT MEDIUM_Name. ProcessingTypeCode, which may be based on GDT BusinessTransactionDocumentProcessingTypeCode. TypeCode, which may be based on GDT BusinessTransactionDocumentTypeCode. PartyBidderPartyID, which may be based on GDT BTDPartyID. ProductCategoryID, which may be based on GDT ProductCategoryID. TimeSettings, which contains dates and times relevant for the bidding process; may be based on IDT ProcurementDocumentTimeSettings. The above elements may be optional.

A QueryByBidderParty may consider RequestForQuotes with the status values Published or Cancelled. A QueryByBidderParty may consider all public RequestForQuotes. In some implementations, the restricted RequestForQuotes may only be listed as a result list of the Query, if the BidderParty has been assigned to it.

Party

BO RequestForQuote/node Party represents a natural person, a legal person, organisation, organisational unit, or group that is involved in a RequestForQuote in a party role. For example, a party can be a BusinessPartner in the specialisation Employee, Supplier or BusinessPartner; or it can be an OrganisationalCentre in the specialisation Company A party can be a person, portal, organisation, or group within or outside of the company. Inheritance is used for Requestor Party and ProductRecipientParty. These parties may be specified at RequestForQuote level and may be used for all items if not otherwise specified on item level.

Node RequestForQuoteParty may keep a reference to a business partner or to one of its specialisations (such as customer, supplier, employee); a RequestForQuoteParty may also keep a reference to a specialisation of an organisational unit such as "company".

Node RequestForQuote Party may exist without reference to a business partner or an organisational unit. This would be a Casual Party, which is a party without reference to the master data in the system. The external identifier and the description may be contained in the business document. For example, Casual Party could be used for groupware replication (Outlook). The e-mail address and the description of a party would be used by the groupware when replicating, such as with e-mails or appointments.

A Party may exist within specialisations such as the following: BuyerParty, ResponsiblePurchasingOrganisationParty, ResponsiblePurchasingGroupParty, Requestor Party, ProductRecipientParty, BidderParty, PortalProviderParty.

A BuyerParty is the party on behalf of which the RequestForQuote is created. An example of the Business Object Company is the BuyerParty. A BuyerParty may have a contact person.

A ResponsiblePurchasingOrganisationParty specifies which PurchasingUnit in the organisational structure of the company referred to by the BuyerParty is responsible for processing RequestForQuote on higher level. In the organisational structure, a purchasing organisation may group together a number of purchasing groups. An example of the business object PurchasingUnit which is flagged as a purchasing organisation is the ResponsiblePurchasingOrganisationParty.

A ResponsiblePurchasingGroupParty specifies which PurchasingUnit below the unit referred to by the ResponsiblePurchasingOrganisationParty is directly responsible for processing the RequestForQuote. In the organisational structure, a purchasing group may have several purchasing employees assigned to it. An example of the business object PurchasingUnit which is flagged as a purchasing group is the ResponsiblePurchasingGroupParty.

A Requestor Party is the party that initiates the bidding process through a request for materials or services (e.g. without a corresponding source of supply). For example, this can be the person that creates an InternalRequest that is transferred into a PurchaseRequest and then into RequestForQuote. An example of the business object Employee is the Requestor Party.

A ProductRecipientParty is the party to which products are delivered or for which services are provided. An example of the business object Employee is the ProductRecipientParty.

A BidderParty is the party on behalf of which the Supplier Quote is submitted. The BidderParty may also have a contact person who submits the Supplier Quote. The contact person may be a BusinessPartner of the specialisation BusinessPartner.

A PortalProviderParty is the party to which a public RequestForQuote can be provided.

The structure elements located directly at node Party are defined by data type ProcurementDocumentPartyElements, which is derived from data type BusinessTransactionDocumentPartyElements. In certain implementations these elements may include the following: UUID, Party ID, PartyUUID, PartyTypeCode, PartyRoleCategoryCode, PartyRoleCode, PartyAddressUUID, MainIndicator, ActiveIndicator, ValidityPeriod, Name.

UUID is used in the template in the projection. This element may be based on GDT UUID.

PartyID is an identifier of the Party in this PartyRole in the business document or the master data object. This element may be based on GDT PartyID (without additional components such as schemeAgencyID). This element may be optional. If a business partner or organisational unit are referenced, the attribute may contain their identifiers; if an unidentified identifier is, for example, entered by the user, the attribute may contain this identifier.

PartyUUID is an identifier, which may be unique, for a business partner, the organisational unit, or their specialisations. This element may be based on GDTUUID.

PartyTypeCode specifies the type of the business partner, organisational unit, or their specialisations referenced by the attribute PartyUUID. This element may be based on GDT PartyTypeCode. It may be optional.

PartyRoleCategoryCode specifies the Party Role Category of the Party in the business document or the master data object. This element may be based on GDT PartyRoleCategoryCode, values 1-BuyerParty, 5-ProductRecipientParty, 13-Requestor Party, 14-PortalProviderParty, 16-BidderParty, and/or ServicePerformerParty. It may be optional.

PartyRoleCode specifies the Party Role of the Party in the business document or the master data object. This element may be based on GDT PartyRoleCode. It may be optional.

PartyAddressUUID is an identifier, which may be unique, for the address of the business partner, the organisational unit, or their specialisations. This element may be based on GDT UUID. It may be optional.

MainIndicator indicates whether or not a Party is emphasized in a group of parties with the same PartyRole. This element may be based on GDT Indicator, Qualifier PartyMain. It may be optional.

ActiveIndicator indicates whether or not the Party is active from a business point of view and may be used in a process. If the indicator is false, the Party may be inactive even if it is still part of the business document or master data object. This element may be based on GDT ActiveIndicator. It may be optional.

ValidityPeriod specifies the validity period of the Party in the business document or the master data object. This element may be based on GDT DateTimePeriod. It may be optional. It may be replaced by a new GDT that optionally provides for time entry, if available.

Name specifies the name of the Party. This element may be based on GDT LONG_Name. It may be optional.

In certain implementations of node Party, the following composition relationships to subordinate nodes may exist: PartyContactParty 263086 may have a cardinality relationship of 1:c. PartyAddress 263102 1:c.

In certain implementations of node Party, the following inbound aggregation relationships may exist: Supplier may have a cardinality relationship of c:cn. SupplierAddressInformation may have a cardinality relationship of c:cn, which may originate from BO Supplier. Employee may have a cardinality relationship of c:cn. EmployeeAddressInformation may have a cardinality relationship of c:cn, which may originate from BO Employee. Business Partner may have a cardinality relationship of c:cn. BusinessPartnerAddressInformation may have a cardinality relationship of c:cn, which may originate from BO BusinessPartner. Purchasing Unit may have a cardinality relationship of c:cn. PurchasingUnitAddressInformation may have a cardinality relationship of c:cn. Company may have a cardinality relationship of c:cn. CompanyAddressInformation may have a cardinality relationship of c:cn.

A RequestForQuote may be published after the BuyerParty is provided; also, a RequestForQuote may contain exactly one BuyerParty. A RequestForQuote may be published after the ResponsiblePurchasingOrganisationParty is provided; also, a RequestForQuote may contain exactly one ResponsiblePurchasingOrganisationParty. A RequestForQuote may be published after the ResponsiblePurchasingGroupParty is provided; also, a RequestForQuote may contain exactly one ResponsiblePurchasingGroupParty. A RequestForQuote may be published after the Requestor Party is provided; also, a RequestForQuote may contain exactly one Requestor Party; this Requestor Party may be valid for all RequestForQuoteItem nodes, and if Requestor Parties differ between RequestForQuoteItem nodes the Requestor Party may be specified on each item level. The RequestForQuote may contain exactly one ProductRecipientParty; this ProductRecipientParty may be valid for all RequestForQuoteItem nodes, and if ProductRecipientParties differ between RequestForQuoteItem nodes the ProductRecipientParty may be specified on each item level.

In certain implementations of node Party, Enterprise Service Infrastructure/ESI action InformBiddersAndSendBackQuote may be implemented. InformBidders may be used to inform the bidders about changes of the RequestForQuote. With the action, the submitted bids may be sent back to the bidders so that they have the chance to react on the changes.

PartyContactParty

BO RequestForQuote/node PartyContactParty represents a natural person or organizational unit that can be contacted for the RequestForQuoteParty. For example, the contact may be a contact person or a secretarial office. Communication data for the contact is usually available.

The structure elements located directly at node PartyContactParty are defined by data type ProcurementDocumentPartyContactPartyElements, which is derived from data type ProcurementDocumentPartyElements. In certain implementations these elements may include the following: UUID, PartyID, PartyUUID, ContactPartyTypeCode, PartyRoleCategoryCode, PartyRoleCode, PartyAddressUUID, MainIndicator, ActiveIndicator, Name.

UUID is an identifier, which may be unique, for a contact. This element may be based on GDT UUID.

PartyID is an identifier of the contact in this PartyRole in the business document or the master data object. If a business partner or organisational unit is referenced, the attribute may contain their identifiers. This element may be based on GDT PartyID (without additional components such as schemeAgencyID).

PartyUUID is an identifier, which may be unique, of the contact in this PartyRole in the business document or the master data object. This element may be based on GDT UUID. It may be optional.

ContactPartyTypeCode specifies the type of the business partner, organisational unit, or their specialisations referenced by the attribute ContactUUID. This element may be based on GDT ContactPartyTypeCode. It may be optional.

PartyRoleCategoryCode specifies the Party Role Category of the contact in the business document or the master data object. This element may be based on GDT PartyRoleCategoryCode ContactPersonParty. It may be optional.

PartyRoleCode specifies the Party Role of the contact in the business document or the master data object. This element may be based on GDT PartyRoleCode. It may be optional.

PartyAddressUUID is an identifier, which may be unique, for the address of the business partner, the organisational unit, or their specialisations. This element may be based on GDT UUID. It may be optional.

MainIndicator indicates whether or not a PartyPartyContactParty is emphasized in a group of contact parties with the same PartyRole. This element may be based on GDT Indicator, Qualifier PartyMain. It may be optional.

ActiveIndicator indicates whether or not the contact is active from a business point of view and may be used in a process. If the indicator is false, the contact is no longer active even if it is still part of the business document or master data object. This element may be based on GDT Indicator, Qualifier Active. It may be optional.

Name specifies the name of the PartyContactParty. This element may be based on GDT LONG_Name. It may be optional.

There may be a number of composition relationships including: PartyContactPartyAddress 263092 (DO) may have a cardinality relationship of 1:c.

In certain implementations of node PartyContactParty the following inbound aggregation relationships may exist. Business Partner may have a cardinality relationship of c:cn. BusinessPartnerAddressInformation may have a cardinality relationship of c:cn. Employee may have a cardinality relationship of c:cn. EmployeeAddressInformation may have a cardinality relationship of c:cn.

There may be exactly one association of the address. This address may be a master data address of the business partner, organisational unit, or their specialisations referenced by PartyUUID.

Location

BO RequestForQuote/node Location represents a physical place that is relevant to the bidding process.

A Location may exist within specialisations such as the following: ShipToLocation, which may be the place where material may be delivered or where a service may be provided. Logical examples are the reception area in an office building, or gate 3 of a production plant.

Inheritance may be used for all Locations. That is, Locations specified at RequestForQuote level may be used for all items if not otherwise specified on item level.

The structure elements located directly at node Location are defined by data type ProcurementDocumentLocationElements, which is derived from data type BusinessTransactionDocumentLocationElements.

In certain implementations of node Location, the following inbound aggregation relationships may exist: Location may have a cardinality relationship of c:cn, which is a relationship represented through the specialisation ShipToLocation.

In some implementations, the following composite relationships may exist: LocationAddress 263106 may have a cardinality relationship of 1:c.

For operational negotiations, the RequestForQuote may contain exactly one Location. This Location may be valid for all RequestForQuoteItem nodes. If Location differs between RequestForQuoteItem nodes, the Location may be specified on each item level.

For strategic negotiations, the RequestForQuote may contain multiple Locations.

PriceSpecification (DO)

BO RequestForQuote/node PriceSpecification contains price calculation detail information, such as discounts proposed to bidders.

BusinessTransactionDocumentReference

BO RequestForQuote/node BusinessTransactionDocumentReference is a unique reference to another business transaction document, or to an item with document, which is directly involved in the same business process as the RequestForQuote.

A BusinessTransactionDocumentReference may exist within specialisations such as the following. PurchaseRequestReference, which is a reference to the PurchaseRequest indicating that at least one of the RequestForQuoteItem nodes was created with reference to one of the PurchaseRequestItem nodes. RenegotiationPurchasingContractReference, which is a reference to the PurchasingContract indicating that the RequestForQuote was created to renegotiate the PurchasingContract with the primal SupplierParty. RequestForQuoteReference, which is a reference to the RequestForQuote indicating that the RequestForQuote was replaced by another one. SupplierQuoteReference, which is a reference to the SupplierQuote which was created as response to the RequestForQuote.

The structure elements located directly at node BusinessTransactionDocumentReference are defined by data type ProcurementDocumentBusinessTransactionDocumentReferenceElements, which is derived from data type BusinessTransactionDocumentReferenceElements. In certain implementations these elements may include the following: UUID, Reference, TypeCode, Name, RoleCode.

UUID is an identifier, which may be unique, of the referred business transaction document. This element may be based on GDT UUID.

Reference is a reference, which may be unique, to the referred business transaction document. Furthermore, it is possible to have a reference to a line item within the business transaction document. This element may be based on GDT BusinessTransactionDocumentReference.

TypeCode is a coded representation of the referred business transaction document. This element may be based on GDT BusinessTransactionDocumentTypeCode, values 108-PurchaseRequest, 110-PurchasingContract, and/or 111-RequestForQuote.

Name is a designation or title of the referred business transaction document for displaying purposes. This element may be based on GDT MEDIUM_Name. It may be optional.

RoleCode is a coded representation of the role of a BusinessTransactionDocument in this reference. This element may be based on GDT BusinessTransactionDocumentReferenceRoleCode. It may be optional.

In certain implementations of node BusinessTransactionDocumentReference, the following inbound aggregation relationships may exist: SupplierQuote may have a cardinality relationship of c:cn, which may originate from BO SupplierQuote. RequestForQuote may have a cardinality relationship of c:cn, which may originate from BO RequestForQuote. PurchaseRequest may have a cardinality relationship of c:cn, which may originate from BO PurchaseRequest (cross LDU). PurchasingContract may have a cardinality relationship of c:cn, which may originate from BO PurchasingContract (Cross LDU).

BiddingRules

BO RequestForQuote/node BiddingRules specifies conditions which control or restrict the bidding process, especially the follow-on business object SupplierQuote.

BiddingRules may affect other aspects of the bidding process, such as: the type of information requested, for example price information details (no price, simple price, or complex prices); additional information that can be displayed in Supplier Quotes, such as BiddingCriteriaAssessment information; additional functions that are available in the Supplier Quote, such as add new items, or change submitted Supplier Quotes; the changeability of fields, such as the quantity requested; additional checks, such as specifying that quotes on all items in the Request For Quote are expected.

The structure elements located directly at node BiddingRules are defined by data type ProcurementDocumentBiddingRules. In certain implementations these elements may include the following: PriceDetailLevelCode, QuantityChangeAllowedIndicator, SubmittedSupplierQuoteChangeAllowedIndicator, UnplannedItemPermissionCode, BidOnAllItemsRequiredIndicator.

PriceDetailLevelCode is a coded representation of the requested detailed price information for a RequestForQuote. For example, the purchaser can request simple prices, complex prices (discounts scale price) or no price information. This element may be based on GDT PriceDetailLevelCode, values 1—Simple Price and/or 3—No Price. It may be optional.

QuantityChangeAllowedIndicator specifies whether the BidderParty is allowed to enter in the SupplierQuote a quantity other than the requested quantity. This element may be based on GDT Indicator, Qualifier ChangeAllowed.

SubmittedSupplierQuoteChangeAllowedIndicator specifies whether the BidderParty is allowed to change a submitted SupplierQuote. This element may be based on GDT Indicator, Qualifier ChangeAllowed.

UnplannedItemPermissionCode specifies whether the BidderParty's SupplierQuote is allowed to contain own items with additional quotations. This element may be based on GDT UnplannedItemPermissionCode, values 1—Not Allowed and/or 3—Allowed. It may be optional.

BidOnAllItemsRequiredIndicator specifies whether the BidderParty has to quote for all items. This element may be based on GDT Indicator. Qualifier Required.

BiddingCurrency

BO RequestForQuote/node BiddingCurrency represents a currency that is available in a bidding process.

The Supplier Quote may be submitted in one of the predefined currencies. The currency chosen on the Supplier Quote's root node level may be valid for all items of the Supplier Quote.

For contract negotiations, the currency on the Supplier Quote's root and item nodes are generally not changed. However, the currency can be changed in the pricing conditions.

The currency of the Request for Quote may be one of the currencies contained in Currency.

BiddingCriteriaAssessment

BO RequestForQuote/node BiddingCriteriaAssessment represents a valuation function or weighting factor. A BiddingCriteriaAssessment may be assigned to BidderQuestion or fields of the RequestForQuote.

BidderPartyQuestion

BO RequestForQuote/node BidderPartyQuestion represents a request for additional information from the bidder.

A BidderPartyQuestion may refer to specific characteristics at root or item node level. It may be incorporated into the bidding process.

Node BidderPartyQuestion may be used to add further criteria to the RequestForQuote. It may request additional information from the bidder in a Q&A format—the purchaser may define the BidderPartyQuestion node as one or more questions and may have the option to predefine multiple choice answers.

AttachmentFolder (DO)

BO RequestForQuote/node AttachmentFolder is a container of electronic documents of any type relating to the RequestForQuote.

As an example, an AttachmentFolder can be a PDF document with technical specifications of the requested products.

TextCollection (DO)

BO RequestForQuote/node TextCollection is a container of natural-language texts linked to a RequestForQuote.

As an example, a TextCollection can contain a text that describes the conditions of being a participant.

Item

BO RequestForQuote/node Item specifies the quantity, pricing specifications and delivery terms of a product or for a requested service.

Deviating parties and locations may be defined for an Item (by comparing to other information in the RequestForQuote). An Item may contain references to other business documents that are relevant to the item. Descriptions and/or attachments may also be specified for the item.

The structure elements located directly at node Item are defined by data type RequestForQuoteItemElements, which is derived from data type ProcurementDocumentItemElements. In certain implementations these elements may include the following: SystemAdministrativeData, UUID, ID, TypeCode, HierarchyRelationship, Description, Quantity, TargetAmount.

SystemAdministrativeData represents administrative data stored within the system. These data contain system users and time of change. This element may be based on GDT SystemAdministrativeData.

UUID is an identifier, which may be unique, of the RequestForQuoteItem for referencing purposes. This element may be based on GDT UUID.

ID is an identifier for the RequestForQuoteItem assigned by the BuyerParty. This element may be based on GDT BusinessTransactionDocumentItemID.

TypeCode is the coded representation for the RequestForQuoteItem type a material item 263074/service item 263076/productcategory item/hierarchy item 263078/Lot item 263080. This element may be based on GDT BusinessTransactionDocumentItemTypeCode, values 018-Purchasing Material Item, 019-Purchasing Service Item, 021-Purchasing Hierarchy Item, and/or 0??-Purchasing Lot Item. It may be optional.

HierarchyRelationship is the relationship between a subitem and a higher-level parent item in an item hierarchy. It may be optional.

Sub-elements of structure element HierarchyRelationship are defined by IDT ProcurementDocumentItemHierarchyRelationship. In certain implementations these may include the following. ParentItemUUID is an identifier for the parent RequestForQuoteItem; this element may be based on GDT UUID. TypeCode is the coded representation of the type of hierarchical relationship between the subitem and its higher-level parent item; this element may be based on GDT BusinessTransactionDocument-ItemHierarchyRelationshipTypeCode, value 02-Group.

Description is a characterization of the item. This element may be based on GDT MEDIUM_Description. It may be optional.

Quantity is the quantity of material or service that is requested via the Item. E.g. 10 Each. (In case that more than one ItemScheduleLine 263072 exists, this quantity may be calculated as the sum of quantities from all ItemScheduleLines). This element may be based on GDT Quantity. It may be optional.

TargetAmount represents the target amount of a RequestForQuoteItem if the follow-on document of the bidding process is PurchasingContract. This element may be based on GDT Amount, Qualifier Target. It may be optional.

Status contains information about the RequestForQuoteItem.

Sub-elements of structure element Status are defined by data type RequestForQuoteItemStatus. In certain implementations these may include the following. ActivationStatusCode indicates whether a RequestForQuote item is relevant within the bidding process or not; this sub-element may be based on GDT ActivationStatusCode, values 01-Active and/or 02-Inactive.

A complete RequestForQuoteItem of item type 'Normal' may contain at least a product type, a product description and a quantity (If the follow-on document is a PurchasingContract, the item of type 'Normal' may also contain a target amount or a target quantity). 'Product Category' may contain at least a product type, a product description and a product category. 'Hierarchy' and 'Lot' may contain at least a description.

TargetAmount may be relevant depending on whether the follow-on document is a PurchasingContract. Also the item type product category may be relevant depending on whether the follow-on document is a PurchasingContract.

In certain implementations of node Item, the following composition relationships to subordinate nodes may exist: ItemProduct 263082 may have a cardinality relationship of 1:c; ItemPriceSpecification may have a cardinality relationship of 1:cn (DO); ItemParty 263088 may have a cardinality relationship of 1:cn; ItemLocation 263100 may have a cardinality relationship of 1:cn; ItemBusinessTransactionDocumentReference 263112 may have a cardinality relationship of 1:cn; ItemBiddingCriteriaAssessment may have a cardinality relationship of 1:cn; ItemBidderPartyQuestion may have a cardinality relationship of 1:cn; ItemAttachmentFolder 263120 may have a cardinality relationship of 1:c (DO); ItemTextCollection 263122 may have a cardinality relationship of 1:cn (DO); ItemScheduleLine 263072 may have a cardinality relationship of 1:cn.

In certain implementations of node Item, the following inbound aggregation relationships may exist: ParentItem may have a cardinality relationship of c:cn, which is an association to a RequestForQuoteItem itself, that is, the relationship between a sub item and a higher-level parent item in an item hierarchy. This may enable item hierarchies to be mapped. The hierarchies may be mapped using the elements HierarchyRelationshipTypeCode and ParentItemID.

In certain implementations of node Item, navigation associations may exist as follows: RequestorItemParty may have a cardinality relationship of c:c; this is an association to node ItemParty representing an association to a Party that occurs within the RequestorItemParty specialisation. ProductRecipientItemParty may have a cardinality relationship of c:c; this is an association to node ItemParty representing a Party that occurs within the ProductRecipientItemParty specialisation. ServicePerformerItemParty may have a cardinality relationship of c:c; this is an association to node ItemParty representing a Party that occurs within the ServiceAgentItemParty specialisation. ShipToItemLocation may have a cardinality relationship of c:c; this is an association to node ItemLocation that occurs within the ShipToLocation specialisation. PurchaseRequirementItemReference may have a cardinality relationship of c:c; this is an association to node ItemBusinessTransactionDocumentReference representing a BusinessTransactionDocumentReference that occurs within the PurchaseRequirement specialisation. RenegotiationPurchasingContractItemReference may have a cardinality relationship of c:c; this is an association to node ItemBusinessTransactionDocumentReference representing a BusinessTransactionDocumentReference that occurs within the PurchasingContract specialisation. RequestForQuoteItemReference may have a cardinality relationship of c:c; this is an association to node ItemBusinessTransactionDocumentReference representing a BusinessTransactionDocumentReference that occurs within the RequestForQuote specialisation. SupplierQuoteItemReference may have a cardinality relationship of c:c; this is an association to node ItemBusinessTransactionDocumentReference representing a BusinessTransactionDocumentReference that occurs within the SupplierQuote specialisation.

In certain implementations of node Item, the following ESI actions (Enterprise Service Infrastructure) may be implemented. Duplicate, which duplicates a new RequestForQuoteItem from data of an existing one. Activate (S&AM action), which is used to permit a RequestForQuoteItem which was previously inactivated from the further bidding process. Deactivate (S&AM action), which is used to bar a RequestForQuoteItem from being in the further bidding process.

In certain implementations of Node Item a QueryByProduct may be called. This query returns a list of all RequestForQuoteItems which satisfy the selection criteria, specified by the query element, combined by logical 'AND'. If in the following list selection criteria, no further selection logic is explained, the system may check whether the value given in the selection criterion is equal to the value of the corresponding BO node element. QueryByElements query elements are defined by data type GDT RequestForQuoteItemProductQueryElements. In certain implementations these elements may include the following: ItemID, which may be based on GDT BusinessTransactionDocumentItemID; ItemDescription, which may be based on GDT MEDIUM_Description; ItemProductID, which may be based on GDT ProductID; ItemProductProductTypeCode, which may be based on GDT ProductTypeCode; ItemProductNote, which may be based on GDT Note; ItemProductProductCategoryID, which may be based on GDT ProductCategoryID. The above elements may be optional.

ItemProduct

BO RequestForQuote/node ItemProduct represents the identification, description and classification of the product within the Item.

A product category is a division of products according to objective criteria. Product category may be derived from the Material or ServiceProduct if product identification is specified. However, a Material or ServiceProduct may also be specified by natural linguistic text, in which case a ProductCategory may be assigned manually.

The structure elements located directly at node ItemProduct 263082 are defined by data type ProcurementDocumentItemProductElements, which is derived from data type BusinessTransactionDocumentProductElements. In certain implementations these elements may include the following: ProductUUID, ProductID, ProductStandardID, ProductManufacturerID, ProductTypeCode, ProductCategoryUUID, ProductCategoryID, ProductCategoryStandardID, ProductCatalogueReference.

ProductUUID is an identifier, which may be unique, for a product. This element may be based on GDT UUID. It may be optional.

ProductID is a proprietary identifier for a product. This element may be based on GDT ProductID. It may be optional.

ProductStandardID is a standardized identifier for this product, whose identification scheme is managed by an agency from the DE 3055 code list. This element may be based on GDT ProductStandardID. It may be optional.

ProductManufacturerID is an identifier, which may be proprietary, that is used by the Manufacturer for this product. This element may be based on GDT ProductPartyID. It may be optional.

ProductTypeCode is a coded representation of the type of a product (material or serviceproduct). This element may be based on GDT ProductTypeCode, values 1-Material and/or 2-Service. It may be optional.

ProductCategoryUUID is an identifier, which may be unique, for a product category. This element may be based on GDT UUID. It may be optional.

ProductCategoryID is an identifier, which may be proprietary, for a product category. This element may be based on GDT ProductCategoryID. It may be optional.

ProductCategoryStandardID is an identifier for a product category, whereby the identification scheme used is managed by an agency from the code list DE 3055. This element may be based on GDT ProductCategoryStandardID. It may be optional.

ProductCatalogueReference is a reference, which may be unique, to a catalog or to an object within a catalog. This element may be based on GDT CatalogueReference. It may be optional.

In certain implementations of node ItemProduct, the following inbound aggregation relationships may exist: MaterialProcurementProcessControl may have a cardinality relationship of c:cn. ServiceProductProcurementProcessControl may have a cardinality relationship of c:cn. ProductCategoryHierarchyProductCategory may have a cardinality relationship of c:cn.

ItemPriceSpecification (DO)

See specification of the dependent object BO RequestForQuote/node PriceSpecification.

ItemParty

BO RequestForQuote/node ItemParty 263088 represents a natural or legal person, organisation, organisational unit, or group that is involved in an Item in a PartyRole.

A RequestForQuoteItemParty may keep a reference to a business partner or one of its specialisations (for example, customer, supplier, employee).

A RequestForQuoteItemParty may exist without reference to a business partner or an organisational unit. This may be a Casual Party, which is a party without reference to the master data in the system. The external identifier and the description may be contained in the business document. Casual Party, for example, may be used for groupware replication (Outlook). The e-mail address and the description of a party may be used by the groupware when replicating, for example, e-mails or appointments.

Node ItemParty 263088 may exist within specialisations such as the following: Requestor Party, ProductRecipientParty, ServicePerformerParty.

A Requestor Party is the party to which products are delivered or for which services are provided. A ProductRecipientParty is the party to which products are delivered or for which services are provided. A ServicePerformerParty is a party that provides services. A ServicePerformerParty typically acts in the name of the BidderParty, which my be specified as well. The ServicePerformerParty may be submitted as a proposal to the bidder in a RequestForQuote.

The structure elements located directly at node Party are defined by data type ProcurementsDocumentItemPartyElements, which is derived from data type BusinessTransactionDocumentPartyElements. In certain implementations these elements may include the following: UUID, PartyID, PartyUUID, PartyTypeCode, PartyRoleCategoryCode, PartyRoleCode, PartyAddressUUID, MainIndicator, ActiveIndicator, ValidityPeriod, Name.

UUID is RequestForQuote NodeParty. This element may be based on GDT UUID.

PartyID is an identifier of the SupplierQuoteParty in this PartyRole in the business document or the master data object. If a business partner or organisational unit are referenced, the attribute may contain their identifiers; if an unidentified identifier is, for example, entered by the user, the attribute may contain this identifier. This element may be based on GDT PartyID (without additional components, such as schemeAgencyID). It may be optional.

PartyUUID is an identifier, which may be unique, for a business partner, the organisational unit, or their specialisations. This element may be based on GDT UUID. It may be optional.

PartyTypeCode specifies the type of business partner, organisational unit, or their specialisations referenced by the attribute PartyUUID. This element may be based on GDT PartyTypeCode. It may be optional.

PartyRoleCategoryCode specifies the Party Role Category of the SupplierQuoteParty in the business document or the master data object. This element may be based on GDT PartyRoleCategoryCode, values 5-ProductRecipientParty and/or 13-Requestor Party, ServicePerformerParty. It may be optional.

PartyRoleCode specifies the Party Role of the SupplierQuoteParty in the business document or the master data object. This element may be based on GDT PartyRoleCode. It may be optional.

PartyAddressUUID is an identifier, which may be unique, for the address of the business partner, the organisational unit, or their specialisations. This element may be based on GDT UUID. It may be optional.

MainIndicator indicates whether or not a SupplierQuoteParty is emphasized in a group of parties with the same PartyRole. This element may be based on GDT Indicator, Qualifier PartyMain. It may be optional.

ActiveIndicator indicates whether or not the SupplierQuoteParty is active from a business point of view and may be used in a process. If the indicator is false, the SupplierQuoteParty is no longer active even if it is still part of the business document or master data object. This element may be based on GDT Indicator, Qualifier Active. It may be optional.

ValidityPeriod specifies the validity period of the SupplierQuoteParty in the business document or the master data object. This element may be based on GDT DateTimePeriod. It may be optional.

Name specifies the name of the SupplierQuoteParty. This element may be based on GDT LONG_Name. It may be optional.

In certain implementations of node ItemParty, the following composition relationships to subordinate nodes may exist: ItemPartyContactParty 263090 may have a cardinality relationship of 1:c. ItemPartyAddress 263096 may have a cardinality of 1:c. ItemPartyRelationship 263096 may have a cardinality of 1:cn.

In certain implementations of node ItemParty, the following inbound aggregation relationships may exist. Employee may have a cardinality relationship of c:cn. EmployeeAddressInformation may have a cardinality relationship of c:cn. BusinessPartner may have a cardinality relationship of c:cn. BusinessPartnerAddressInformation may have a cardinality relationship of c:cn.

In some implementations, an Item may contain exactly one Requestor Party, or an Item can only be published when the Requestor Party is provided. In some implementations, an Item may contain exactly one ProductRecipientParty; the ServicePerformerParty may be assigned to the Item node. In some implementations, an Item may contain exactly one ServicePerformerParty per BidderParty.

ItemPartyContactParty

BO RequestForQuote/node ItemPartyContactParty represents a natural person or organisational unit that can be contacted for the RequestForQuoteItemParty. For example, the contact may be a contact person or a secretarial office. Usually, communication data for the contact is available.

The structure elements located directly at node ItemPartyContactParty are defined by data type ProcurementDocumentPartyContactPartyElements, which is derived from data type ProcurementDocumentPartyElements. In certain implementations these elements may include the following: UUID, PartyID, PartyUUID, ContactPartyTypeCode, PartyRoleCategoryCode, PartyRoleCode, PartyAddressUUID, MainIndicator, ActiveIndicator, Name.

UUID is an identifier, which may be unique, for a contact. This element may be based on GDT UUID.

PartyID is an identifier of the contact in this PartyRole in the business document or the master data object. If a business partner or organisational unit is referenced, the attribute may contain their identifiers. This element may be based on GDT PartyID (without additional components, such as schemeAgencyID).

PartyUUID is an identifier, which may be unique, of the contact in this PartyRole in the business document or the master data object. This element may be based on GDT UUID. It may be optional.

ContactPartyTypeCode specifies the type of business partner, organisational unit, or their specialisations referenced by the attribute ContactUUID. This element may be based on GDT ContactPartyTypeCode. It may be optional.

PartyRoleCategoryCode specifies the Party Role Category of the contact in the business document or the master data object. This element may be based on GDT PartyRoleCategoryCode, value ContactPersonParty. It may be optional.

PartyRoleCode specifies the Party Role of the contact in the business document or the master data object. This element may be based on GDT PartyRoleCode. It may be optional.

PartyAddressUUID is an identifier, which may be unique, for the address of the business partner, the organisational unit, or their specialisations. This element may be based on GDT UUID. It may be optional.

MainIndicator indicates whether or not a PartyPartyContactParty is emphasized in a group of contact parties with the same PartyRole. This element may be based on GDT Indicator, Qualifier Main. It may be optional.

ActiveIndicator indicates whether or not the contact is active from a business point of view and may be used in a process. If the indicator is false, the contact is no longer active even if it is still part of the business document or master data object. This element may be based on GDT Indicator, Qualifier Active. It may be optional.

Name specifies the name of the PartyPartyContactParty. This element may be based on GDT LONG_Name. It may be optional.

In certain implementations of node ItemPartyContactParty, the following inbound aggregation relationships may exist. Employee may have a cardinality relationship of c:cn. EmployeeAddressInformation may have a cardinality relationship of c:cn. BusinessPartner may have a cardinality relationship of c:cn. BusinessPartnerAddressInformation may have a cardinality relationship of c:cn.

There may be exactly one association to the address. This address may be a master data address of the business partner, organisational unit, or their specialisations referenced by PartyUUID.

ItemLocation

BO RequestForQuote/node ItemLocation represents a logical or a physical place which is relevant within the RequestForQuoteItem.

An ItemLocation may exist within specialisations such as the following: ShipToLocation, which is a place, whereto the products have been delivered or where a service has been provided.

The structure elements located directly at node ItemLocation are defined by data type ProcurementsDocumentItemLocationElements, which is derived from data type BusinessTransactionDocumentLocationElements. There may be a number of composition relationships including ItemLocationAddress 263098 may have a cardinality of 1:c.

In certain implementations of node ItemLocation, the following inbound aggregation relationships may exist: Location may have a cardinality relationship of c:cn, which is represented through the specialisations ShipToLocation.

If the RequestForQuote is defined as an operational negotiation, an Item may contain exactly one ItemLocation. If the RequestForQuote is defined as a strategic negotiation, an Item may contain multiple ItemLocations.

ItemBusinessTransactionDocumentReference

BO RequestForQuote/node ItemBusinessTransactionDocumentReference is a unique reference to an item of another business transaction document.

An ItemBusinessTransactionDocumentReference may exist within specialisations such as the following: PurchaseRequestItemReference, which points to a PurchaseRequestItem in order to indicate that the RequestForQuoteItem was created with reference to the PurchaseRequestItem; RenegotiationPurchasingContractItemReference, which points to a RenegotiationPurchasingContractItem in order to indicate that the RequestForQuoteItem was created with reference to the RequestForQuoteItem; RequestForQuoteItemReference, which points to a RequestForQuoteItem in order to indicate that the RequestforQuoteItem was created with reference to the RequestForQuoteItem; SupplierQuoteItemReference, which points to a SupplierQuoteItem which was created as respond to the RequestForQuoteItem.

The structure elements located directly at node ItemBusinessTransactionDocumentReference are defined by data type ProcurementDocumentItemBusinessTransactionDocumentReferenceElements, which is derived from data type BusinessTransactionDocumentReferenceElements. In certain implementations these elements may include the following: UUID, Reference is, TypeCode, Name, RoleCode.

UUID is an identifier, which may be unique, of the referred business transaction document. This element may be based on GDT UUID.

Reference is a reference, which may be unique, to the referred business transaction document. Furthermore, it may be possible to have a reference to a line item within the business transaction document. This element may be based on GDT BusinessTransactionDocumentReference.

TypeCode is a coded representation of the referred business transaction document. This element may be based on GDT BusinessTransactionDocumentTypeCode, Possible Restrictions: 108 (PurchaseRequest), 110 (PurchasingContract), 111 (RequestForQuote).

Name is the Designation or title of the referred business transaction document for displaying purposes. This element may be based on GDT MEDIUM_Name. It may be optional.

RoleCode is a coded representation of the role of a BusinessTransactionDocument in this reference. This element may be based on GDT BusinessTransactionDocumentReferenceRoleCode. It may be optional.

In certain implementations of node ItemBusinessTransactionDocumentReference, the following inbound aggregation relationships may exist: SupplierQuoteItem may have a cardinality relationship of c:cn. RequestForQuoteItem may have a cardinality relationship of c:cn. PurchaseRequestItem may have a cardinality relationship of c:cn. PurchasingContractItem may have a cardinality relationship of c:cn.

ItemBiddingCriteriaAssessment

BO RequestForQuote/node ItemBiddingCriteriaAssessment represents a valuation function or weighting factor. ItemBiddingCriteriaAssessment is a valuation function or weighting factor which may be assigned to ItemBidderQuestion or fields of the Item.

A valuation function may calculate a value from given valuation criteria (field or attribute value). Types of valuation functions may include: linear, stepladder, fixed or manual.

The BiddingCriteriaAssessment weighting factor is a percentage, by which a valuation value is multiplied to give it greater or less influence on the overall score.

ItemBidderPartyQuestion

BO RequestForQuote/node ItemBidderPartyQuestion represents a request for additional information from the bidder.

An ItemBidderPartyQuestion may be in Q&A format. It may refer to specific characteristics at item node level.

Node ItemBidderPartyQuestion may be used to add further criteria to the RequestForQuoteItem. It may request additional information from the bidder. The purchaser may define the ItemBidderPartyQuestion node as one or more questions and may have the option to predefine multiple choice answers.

ItemAttachmentFolder (DO)

BO RequestForQuote/node ItemAttachmentFolder contains electronic documents of any type that relates to the RequestForQuote Item. For example, it may contain a PDF document with details to the requested item.

ItemTextCollection (DO)

BO RequestForQuote/node ItemTextCollection contains natural-language texts linked to the RequestForQuoteItem. For example, an ItemTextCollection can be added by the Requestor Party to detail the requested item.

ItemScheduleLine

BO RequestForQuote/node ItemScheduleLine represents a line containing the quantity and date of a performance schedule required by the buyer for RequestForQuote.

From a procurement perspective, schedule lines may provide information about which quantities should be delivered until a certain point in time.

The structure elements located directly at node ItemScheduleLine are defined by data type Procurement-Document-ItemScheduleLineElements, which is derived from data type BusinessTransactionDocu-mentScheduleLineElements. In certain implementations these elements may include the following: ID, DeliveryPeriod, Quantity.

ID is an identifier for the ItemScheduleLine assigned by the BuyerParty. This element may be based on GDT BusinessTransactionDocumentItemScheduleLineID.

DeliveryPeriod specifies the Delivery Date for the requested products of timeframe for the requested services. This element may be based on GDT GLOBAL_DateTimePeriod. It may be optional.

Quantity specifies the requested quantity of the product or service. This element may be based on GDT Quantity.

A RequestForQuoteItem may contain exactly one ItemScheduleLine. The ItemScheduleLineDeliveryPeriod may be scheduled after the RequestForQuoteTimeSettingsSupplierQuoteOpeningDateTime and after the RequestForQuoteTimeSettings EndDateTime.

Node ItemScheduleLine may be exclusive of items of type Product Category.

RFQ, RFQCancellation, RFQResult, Quote Interfaces

FIG. 264-1 through 264-18 illustrates one example logical configuration of QuoteMessage message 264000. Specifically, this figure depicts the arrangement and hierarchy of various components such as one or more levels of packages, entities, and datatypes, shown here as 264000 through 264172. As described above, packages may be used to represent hierarchy levels. Entities are discrete business elements that are used during a business transaction. Data types are used to type object entities and interfaces with a structure. For example, QuoteMessage message 264000 includes, among other things, Quote 264006. Accordingly, heterogeneous applications may communicate using this consistent message configured as such.

FIG. 265 illustrates one example logical configuration of RFQCancellationMessage message 265004. Specifically, this figure depicts the arrangement and hierarchy of various components such as one or more levels of packages, entities, and datatypes, shown here as 265004 through 265014. As described above, packages may be used to represent hierarchy levels. Entities are discrete business elements that are used during a business transaction. Data types are used to type object entities and interfaces with a structure. For example, RFQCancellationMessage message 265004 includes, among other things, RFQCancellation 265002. Accordingly, heterogeneous applications may communicate using this consistent message configured as such.

FIG. 266-1 through 266-18 illustrates one example logical configuration of RFQMessage message 266020. Specifically, this figure depicts the arrangement and hierarchy of various components such as one or more levels of packages, entities, and datatypes, shown here as 266020 through 266208. As described above, packages may be used to represent hierarchy levels. Entities are discrete business elements that are used during a business transaction. Data types are used to type object entities and interfaces with a structure. For example, RFQMessage message 266020 includes, among other things, RFQ 266018. Accordingly, heterogeneous applications may communicate using this consistent message configured as such.

FIG. 267 illustrates one example logical configuration of RFQResultMessage message 267000. Specifically, this figure depicts the arrangement and hierarchy of various components such as one or more levels of packages, entities, and datatypes, shown here as 267000 through 267040. As described above, packages may be used to represent hierarchy levels. Entities are discrete business elements that are used during a business transaction. Data types are used to type object entities and interfaces with a structure. For example, RFQResultMessage message 267000 includes, among other things, RFQResult 267004. Accordingly, heterogeneous applications may communicate using this consistent message configured as such.

FIG. 268-1 through 268-27 illustrates one example logical configuration of RFQMessage message 268000. Specifically, this figure depicts the arrangement and hierarchy of various components such as one or more levels of packages, entities, and datatypes, shown here as 268000 through 268674. As described above, packages may be used to represent hierarchy levels. Entities are discrete business elements that are used during a business transaction. Data types are used to type object entities and interfaces with a structure. For example, RFQMessage message 268000 includes, among other things, RFQ 268014. Accordingly, heterogeneous applications may communicate using this consistent message configured as such.

FIG. 269-1 through 269-10 illustrates one example logical configuration of RFQResultMessage message 269000. Specifically, this figure depicts the arrangement and hierarchy of various components such as one or more levels of packages, entities, and datatypes, shown here as 269000 through 269236. As described above, packages may be used to represent hierarchy levels. Entities are discrete business elements that are used during a business transaction. Data types are used to type object entities and interfaces with a structure. For example, RFQResultMessage message 269000 includes, among other things, RFQResult 269014. Accordingly, heterogeneous applications may communicate using this consistent message configured as such.

FIG. 270-1 through 270-31 illustrates one example logical configuration of RFQMessage message 270000. Specifically, this figure depicts the arrangement and hierarchy of various components such as one or more levels of packages, entities, and datatypes, shown here as 270000 through 270816. As described above, packages may be used to represent hierarchy levels. Entities are discrete business elements that are used during a business transaction. Data types are used to type object entities and interfaces with a structure. For example, RFQMessage message 270000 includes, among other things, RFQ 270020. Accordingly, heterogeneous applications may communicate using this consistent message configured as such.

FIG. 271-1 through 271-20 illustrates one example logical configuration of QuoteMessage message 271000. Specifically, this figure depicts the arrangement and hierarchy of various components such as one or more levels of packages, entities, and datatypes, shown here as 271000 through 271656. As described above, packages may be used to represent hierarchy levels. Entities are discrete business elements that are used during a business transaction. Data types are used to type object entities and interfaces with a structure. For example, QuoteMessage message 271000 includes, among other things, Quote 271086. Accordingly, heterogeneous applications may communicate using this consistent message configured as such.

FIG. 272-1 through 272-3 illustrates one example logical configuration of RFQCancellationMessage message 272000. Specifically, this figure depicts the arrangement and hierarchy of various components such as one or more levels of packages, entities, and datatypes, shown here as 272000 through 272106. As described above, packages may be used to represent hierarchy levels. Entities are discrete business elements that are used during a business transaction. Data types are used to type object entities and interfaces with a structure. For example, RFQCancellationMessage message 272000 includes, among other things, RFQCancellation 272086. Accordingly, heterogeneous applications may communicate using this consistent message configured as such.

FIG. 273-1 through 273-33 illustrates one example logical configuration of RFQMessage message 273000. Specifically, this figure depicts the arrangement and hierarchy of various components such as one or more levels of packages, entities, and datatypes, shown here as 273000 through 273886. As described above, packages may be used to represent hierarchy levels. Entities are discrete business elements that are used during a business transaction. Data types are used to type object entities and interfaces with a structure. For example, RFQMessage message 273000 includes, among other things, RFQ 273086 Accordingly, heterogeneous applications may communicate using this consistent message configured as such.

FIG. 274-1 through 274-6 illustrates one example logical configuration of RFQResultMessage message 274000. Specifically, this figure depicts the arrangement and hierarchy of various components such as one or more levels of packages, entities, and datatypes, shown here as 274000 through 274198. As described above, packages may be used to represent hierarchy levels. Entities are discrete business elements that are used during a business transaction. Data types are used to type object entities and interfaces with a structure. For example, RFQResultMessage message 274000 includes, among other things, RFQResult 274086. Accordingly, heterogeneous applications may communicate using this consistent message configured as such.

Request for quotation (RFQ) interfaces are the interfaces that are required in a B2B process to exchange RFQs and quotations between a buyer and a bidder and finally to communicate the quotation acceptance. RFQ (Request for Quotation) is a fixed phrase that can be translated as bid invitation. The following describes the message types and their signatures that are derived from the operations of the business object RequestForQuote. In a signature, the business object is contained as a "leading" business object. Because of the B2B process, there currently is no receiving and sending business object respectively in addition to the RFQ.

Traditional methods of communication, such as mail or fax, in an RFQ process are cost intensive, prone to error, and relatively slow, since data has to be entered manually several times. An initial solution would be to manage the RFQ process online, in other words, to enable the bidder to log on directly to the buyer's system and enter the quotation there. However, this entails certain problems, including security issues regarding direct system access, legal issues regarding the sealing of competitive information in the public sector, and difficulties involved in mapping a collaborative process in cases where several people or departments are involved in creating the quotation.

Electronic communication between the buyer and the bidder eliminates such problems. The RFQ interfaces directly integrate the applications described below.

A public tendering platform.

Public authorities (such as government agencies, corporations, political entities, and ministries) are bound to certain statutory specifications. Within the European Union, there is standardization for the specifications. These specifications stipulate, for example, that RFQs have to be published on certain platforms to ensure that all potential bidders can apply to participate in an RFQ process. The aim of this is to avoid a situation whereby other bidders are excluded as a result of certain bidders being invited directly, which is to the detriment of the public authorities. Other statutory requirements include the provision of electronic signatures and the encryption of submitted quotations. The objective of this is to avoid certain bidders being leaked information about quotations from competitors. Tendering platforms are therefore used to process the entire RFQ process for a public sold-to party and to centrally collect all the quotations. The quotations are not transferred to the public sold-to party and decrypted until the submission deadline has passed. The RFQ interfaces form the basis for mapping data to widely-used standard formats, such as RosettaNet. Adobe can be integrated in the Web Application Server so that messages can be added to a PDF form and sent in PDF format. Data can be downloaded from and uploaded to Microsoft Excel XP.

Control parameters can be used to define the different variants that can exist for a particular scenario. For example, in certain cases, a decisive factor will be the price, while in other cases, a decisive factor will be the exchange of information about the physical properties of the item involved in the RFQ.

More than just a simple interface structure, the RFQ interfaces define the underlying business logic and, at the same time, dispense with the need to exchange proprietary information in straightforward RFQ processes. In this way, applications that implement the RFQ interfaces can be integrated without the need for complex project work.

Message Types

There are five messages that are to be used to map a B2B RFQ process that include: RFQRequest, RFQChangeRequest, RFQCancellationRequest, QuoteNotification and RFQResultNotification.

The RFQRequest message is sent from the buyer to the bidder. It is used to start a new bidding process.

The RFQChangeRequest message is sent from the buyer to the bidder. It is used to change an RFQ during the RFQ process. Changing an RFQ includes creating new items, changing existing items, and deleting items. This message is also used when a buyer returns the bidder's quotation for revision.

The RFQCancellationRequest message is sent from the buyer to the bidder. It is used to cancel an RFQ that is no longer required.

The QuoteNotification message is sent from the buyer to the bidder. It contains the bidder's quotation in response to the buyer's invitation to submit a quotation.

The RFQResultNotification message is sent from the buyer to the bidder. This message either contains a notification about the RFQ items for which the bidder's quotation has been accepted including the extent of the award or a negative notification if the bidder's quotation was not successful.

For the sake of completeness, further messages can be provided, which can include: RFQAcceptanceConfirmation and RFQResultAcceptanceConfirmation.

The RFQAcceptanceConfirmation message is sent from the bidder to the buyer. With this message, the buyer is notified about whether the bidder will participate in the bid invitation. This provides the buyer with an early indication of whether the bidders that were expected to participate are in fact participating. In the case of a public RFQ process, the bidder can also use this message to apply to participate and to ask for the RFQ documents to be sent.

The RFQResultAcceptanceConfirmation message is sent from the bidder to the buyer. It contains the bidder's acceptance or rejection of the quotation accepted by the buyer. This message is particularly important if the quotation accepted by the buyer represents only a part of the bidder's quotation, since individual items and/or partial quantities in the RFQ are being distributed to several bidders.

The structures of the five message types to be implemented are specified in the four message data types RFQMessage, RFQCancellationMessage, QuoteMessage, and RFQResultMessage. The structure of the two message types RFQRequest and RFQChangeRequest is specified by the message data type RFQMessage. The parts of the structure that are used differ depending on the message. The description of the RFQMessage specifies which parts are used in which message. The structure of the message type RFQCancellationRequest is specified in the message data type RFQCancellationMessage, which has a very simple structure. This message type contains only the RFQ number. The structure of the message type QuoteNotification is specified in the message data type QuoteMessage. The structure of the message type RFQResultNotification is specified in the message data type RFQResultMessage.

In addition, there are six message types for form based output. The messages are now described.

The message type FormRFQRequest is sent from the buyer to the bidder. It is used to render a form starting a new bidding process. The message type is based on the message data type FormRFQMessage.

The message type FormRFQChangeRequest is sent from the buyer to the bidder. It is used to render a form changing a bid invitation during the bidding process. Changing an RFQ includes creating new items, changing existing items, and deleting items. The message type is based on the message data type FormRFQMessage.

The message type FormRFQCancellationRequest is sent from the buyer to the bidder. It is used to render a form canceling a bid invitation. The message type is based on the message data type FormRFQMessage.

The message type InteractiveFormRFQRequest is sent from the buyer to the bidder. It is used to render an interactive form starting a new bidding process. The interactive form can be used by the bidder to submit his/her quotation to the buyer. The message type is based on the message data type InteractiveFormRFQMessage.

The message type InteractiveFormRFQChangeRequest is sent from the buyer to the bidder. It is used to render an interactive form changing a bid invitation during the bidding process. Changing an RFQ includes creating new items, changing existing items, and deleting items. The interactive form can be used by the bidder to re-submit his/her quotation to the buyer based upon the changed RFQ.

The message type is based on the message data type InteractiveFormRFQMessage.

The message type FormRFQResultNotification is sent from the buyer to the bidder. It is used to render a form which either contains a notification about the items for which the bidder's quotation has been accepted or a rejection if the bidder's quotation was not successful. The message type is based on the message data type FormRFQResultMessage.

RFQRequest

An RFQRequest is a request from a buyer to a bidder to participate in an RFQ process for a product. The structure of the message type RFQRequest is specified in the message data type RFQMessage.

The RFQRequest is sent once for each invited bidder. Since the RFQ can be used for contractual negotiations, the structure also contains contract-specific fields. These fields contain information that is required to create a contract from a successful quotation. The addressee for a message can also be a tendering platform, for example, this means that the actual bidders are not known when the RFQRequest is issued. RFQs issued by public authorities can be published with general access. Rather than being invited directly, bidders apply to participate, via the platform. The aim of the platform is to avoid giving certain bidders preferential treatment as a result of not inviting or informing (in other words, by implicitly excluding) other bidders.

RFQChangeRequest

An RFQChangeRequest is a change to the buyer's request to a bidder to participate in an RFQ process for a product. The structure of the message type RFQRequest is specified in the message data type RFQMessage. The RFQChangeRequest is sent once for each invited bidder. This is independent of whether a quotation has already been submitted. In the case of a publication platform (such as a bulletin board), which is used only to publish an RFQ, the RFQChangeRequest is sent to the platform and to all the bidders who have already submitted a quotation. In the case of a tendering platform, which also manages the quotation process (such as in the public sector), the RFQChangeRequest is sent only to the tendering platform. The platform then provides the bidders with information. The scenario that applies depends on the configuration.

An RFQChangeRequest can be sent as often as required and at any time, provided that RFQCancellationRequest or RFQResultNotification messages have not been sent. This message can be used to return a quotation from a particular bidder to this bidder for revision. This message asks the bidder in question to revise the quotation and resubmit it, before the buyer can consider it. The RFQChangeRequest is the basis for all further quotations.

RFQCancellationRequest

An RFQCancellationRequest is a cancellation of an RFQ for a product by a buyer. The structure of the message type RFQCancellationRequest is specified in the message data type RFQCancellationMessage. The RFQCancellationRequest can be sent at any time up to the submission deadline. After the RFQCancellationRequest has been sent, no further messages are expected. This message is sent to all the invited bidders, regardless of whether a quotation already exists. In the case of a tendering platform, the RFQCancellationRequest is sent to the tendering platform and to all the bidders who have already submitted a quotation. The RFQCancellationRequest message has its own structure, that is, the structure of the RFQCancellationMessage, with the object ID of the canceled RFQ.

QuoteNotification

A QuoteNotification is a quotation submitted by a bidder to a buyer in response to the RFQ for a product issued by the buyer. The structure of the message type QuoteNotification is specified in the message data type QuoteMessage. Each invited bidder can submit precisely one quotation. If the bidder wants to make changes to a submitted quotation, depending on the RFQ bidding rules the bidder either can ask the buyer who issued the RFQ to return the quotation for revision or can resubmit the quotation directly. The QuoteNotification can be submitted only up to the submission deadline. A quotation can be exchanged between the buyer and the bidder as many times as required, up to the submission deadline. The QuoteNotification message has a separate structure, the QuoteMessage. The reason behind having another structure in addition to the RFQMessage is to encourage bidders to submit quotations in future on their own initiative, not necessarily in response to an RFQRequest.

RFQResultNotification

An RFQResultNotification is a notification by a buyer to a bidder of the type and extent of the acceptance or rejection of the quotation. The structure of the message type RFQResultNotification is specified in the message data type RFQResultMessage. If a submitted quotation is awarded or declined, the RFQResultNotification is sent to the bidder. Successful bidders are sent precise information about the quotation acceptance. Unsuccessful bidders are sent a standard rejection. In the case of a tendering platform, a copy of the RFQResultNotification for the successful bidders can also be sent to the tendering platform so that the result can be published. In the public sector, the decision regarding whose quotation has been accepted can be made public.

Other Messages

FormRFQRequest can be the same as message type RFQRequest except that FormRFQRequest is used for form based output instead of XML based output. FormRFQChangeRequest can be the same as message type RFQChangeRequest except that FormRFQChangeRequest is used for form based output instead of XML based output. FormRFQCancellationRequest can be the same as message type RFQCancellationRequest except that FormRFQCancellationRequest is used for form based output instead of XML based output. InteractiveFormRFQRequest can be the same as message type RFQRequest except that InteractiveFormRFQRequest is used for interactive form based output instead of from or XML based output. InteractiveFormRFQChangeRequest can be the same as message type RFQChangeRequest except that InteractiveFormRFQChangeRequest is used for interactive form based output instead of from or XML based output. FormRFQResultNotification can be the same as message type RFQResultNotification except that FormRFQResultNotification is used for form based output instead of XML based output.

Message Choreography

The interaction between the RFQ interfaces in an RFQ process is described in detail below.

Basic Flow

The buyer initiates the RFQ process and invites bidders to submit quotations. Up to the submission deadline, the bidder and buyer play "ping pong;" this can involve quotations, queries, revised quotations, and changes to the RFQ. Once the submission deadline has passed, the buyer compares all the quotations and decides to accept the quotation submitted by one particular bidder or several bidders. The buyer can also decide to reject all quotations.

Detailed Flow

The buyer starts an RFQ process by sending an RFQRequest message. Each invited bidder or addressed public platform receives a separate invitation. Once the RFQ process has been started, the buyer can send change requests at any time, using an RFQChangeRequest message. Quotations that have already been submitted can be resent to the bidder in question. The bidder can then resubmit the quotation before it can be considered by the buyer. At any time up to the submission deadline, the buyer can end the RFQ process by sending an RFQCancellationRequest message. If the submission deadline has already passed, the RFQCancellationRequest can no longer be used. However, the buyer can decide against all the quotations submitted and therefore reject them. Provided the RFQ has not been set to complete, the buyer can make changes to the RFQ in order to obtain additional quotations or revisions to the submitted quotations by extending the submission deadline. Alternatively, the buyer can simply draw up a new RFQ with the same contents or with different contents.

After receiving the RFQRequest message, the bidder can send a quotation to the buyer, using the QuoteNotification message. Each invited bidder is allowed to submit one quotation in response to an RFQRequest. To make changes to a submitted QuoteNotification, depending on the RFQ bidding rules the bidder either can ask the buyer who issued the RFQ to return the quotation for revision or can resubmit the quotation directly. The bidder can enter any queries in the quotation and wait for the quotation to be returned, together with a note from the buyer. The quotation can be exchanged any number of times. To withdraw the quotation, the bidder contacts the buyer, who then withdraws the quotation on behalf of the bidder.

The buyer can also take the initiative and return a submitted quotation to the bidder, using the RFQChangeRequest, asking for revisions to be made. In this case, the bidder can resubmit the quotation for it to be considered in the quotation comparison.

The quotation process is completed either as a result of the RFQCancellationRequest being sent or the submission deadline passing. Once the submission deadline has passed, the buyer compares all the quotations that have been submitted and decides to accept the quotation(s) from one bidder/several bidders. The buyer can also decide to reject one or all of the submitted quotations.

Serialization of Messages

In the RFQ process, messages are transferred exactly once in order (EOIO) and serialized using message queues. Each RFQ process should have its own message queue (as opposed to one queue for all RFQ processes) so that one failed message does not block all the other RFQ messages in the entire system.

Error Handling

Forward processing can be used to resolve business errors. A recipient system can accept every formally correct incoming RFQ message. Business problems can be resolved on the buyer side, using an RFQChangeRequest or RFQCancellationRequest message, and on the seller side, using a QuoteNotification message. It is up to the recipient system to distinguish between technical and business errors. Borderline cases include incorrect ISO codes for currencies, languages, and so on. In order to restart an RFQ process that is corrupt as a result of a failed message, the procurement system can provide an option for transferring the current status of the RFQ, together with all the associated data, at any time using an RFQChangeRequest message. In order to restart a process following a failed RFQRequest message, the procurement system should be able to restart an RFQ process at any time using an RFQRequest message. The RFQResultNotification has legal implications. Following a failed RFQResultNotification, the procurement system should therefore be able to repeat this message.

Message Interfaces

The RFQ messages are implemented by 10 message interfaces (five buyer side and five bidder side).

The Buyer side interfaces include: RFQRequest_Out, RFQChangeRequest_Out, RFQCancellationRequest_Out, QuoteNotification_In and RFQResultNotification_Out.

The Seller side interfaces include: RFQRequest_In, RFQChangeRequest_In, RFQCancellationRequest_In, QuoteNotification_Out and RFQResultNotification_In.

Message Data Type RFQMessage

The message data type RFQMessage groups together. RFQMessage includes business information relevant for sending a business document in a message and the RFQ object in the document. It contains the following packages: MessageHeader and RFQ.

The following rules can be observed to ensure that all the elements and entities in the message data type RFQMessage are used correctly with regard to their changeability in an RFQ process. If it is specified under "Notes" that the element or entity can not be changed, changes are not permitted once the element or entity has been created. The element or entity can be assigned a new value only when an RFQ or a new item within an RFQ is created; this value can no longer be changed in all other messages.

A "change" is always an actual change and not a different way of representing the same situation (for example, a proprietary or standard ID can be used to reference the same product; both options are simply different ways of representing the same situation and can therefore be used alternatively without being classed as a change). Different IDs for the same object and different sequences for elements that occur more than once are always considered as representing the same situation.

The message data type RFQMessage makes the structure available for the message types RFQRequest and RFQChangeRequest and the relevant interfaces.

MessageHeader Package

A MessageHeader package groups business information relevant for sending a business document in a message. It contains the entity MessageHeader.

MessageHeader

A MessageHeader groups the business information from the perspective of the sending application: to identify the business document in a message, information about the sender, and information about the recipient (in some cases).

The MessageHeader is broken down into the following entities: SenderParty and RecipientParty. This is of the GDT type: BusinessDocumentMessageHeader. The MessageHeader includes the elements: ID, ReferenceID and CreationDateTime.

The MessageID is set by the sending application. With the ReferenceMessageID, reference is made in the current BusinessDocument to a previous BusinessDocument. The ReferenceMessageID should always be filled in order to avoid inconsistencies that can arise as a result of sending messages in the pipeline at the same time. For example, the buyer changes the RFQ and sends the message with the changes (RFQChangeRequest) to the bidders. At the same time, a bidder sends a QuoteNotification. Without the ReferenceMessageID in the message header in the QuoteNotification and in the case of longer transmission times for the messages, it is no longer possible to determine clearly whether the QuoteNotification sent by the bidder refers to the old RFQ or to the new, changed RFQ.

SenderParty is the party that is responsible for sending a business document at business application level. SenderParty is of the type GDT: BusinessDocumentMessageHeaderParty. The SenderParty can be specified by the sending application; in this way, it can name a contact person for any problems that arise with the message. This is particularly useful if an additional infrastructure (such as a marketplace or a tendering platform) is located between the sender and the recipient. The SenderParty is simply used to transfer the message and can be ignored by the recipient application. It should be specified by the sender particularly if the participating parties are not transferred with the RFQ package.

RecipientParty is the party that is responsible for receiving a business document at business application level. RecipientParty is of the type GDT: BusinessDocumentMessageHeaderParty. RecipientParty can be specified by the sending application; in this way, it can name a recipient contact person for any problems that arise with the message. This is particularly useful if an additional infrastructure (such as a marketplace or a tendering platform) is located between the sender and the recipient. The RecipientParty is simply used to transfer the message and can be ignored by the recipient application. It should be specified by the sender particularly if the participating parties are not transferred with the RFQ package.

RFQ Package

An RFQ package groups together an RFQ and its packages. The RFQ package contains the following packages: ProductInformation package, Party package, Location package, DeliveryInformation package, BusinessTransactionDocumentReference package, PaymentInformation package, PriceInformation package, FollowUpBusinessTransactionDocument package, Attachment package, Description package and Item package.

RFQ

A RequestForQuotation (RFQ) is a request (or a change to a request) from a buyer to a bidder to submit a quotation for the products (goods or services) specified in the RFQ. It can also be about a change or cancellation of an RFQ. The RFQ is subdivided into RFQItems, which each contain a product specified for the RFQ or additional information for this product. In addition to the buying party and the bidder, additional parties can be involved in the RFQ. The delivery location can also be specified. Delivery and payment terms are also agreed upon. The RFQ can contain a reference to a quote if the bidder has a question or if the buyer has changed the RFQ. Notes or references to attachments can be specified for the RFQ.

The RFQ is of type GDT: RFQ. The RFQ contains: ID, VersionID, ReconciliationPeriodCounterValue, PostingDateTime, LastChangeDateTime, PublishDateTime, DisplayDateTime, BiddingStartDateTime, QuoteSubmissionDateTime, QuoteOpeningDateTime, QuoteBindingDateTime, ContractValidityDateTimePeriod, Note, Name, RFQPublicIndicator, QuotePricingIndicator, QuoteChangeAllowedIndicator, QuoteUnplannedItemPermissionCode, QuotePriceBiddingConditionCode, QuoteQuantityBiddingConditionCode, QuoteItemBiddingConditionCode, PriceDetailLevelCode, QuantityChangeAllowedIndicator, BidOnAllItemsRequiredIndicator, QuoteBindingIndicator, FollowUpQuoteRequirementCode, RequestedQuoteCurrencyCode and ContractTargetAmount.

ID is the unique identifier specified by the buyer for the RFQ. The ID is of type GDT: BusinessTransactionDocumentID. The VersionID is the unique identifier specified by the buyer for the version of the RFQ. The VersionID is of type GDT: VersionID. ReconciliationPeriodCounterValue is a counter for reconciliation periods. The ReconciliationPeriodCounterValue is of type GDT: ReconciliationPeriodCounterValue.

The PostingDateTime is the creation date/time of the RFQ by the buyer. The PostingDateTime is of type GDT: GLOBAL_DateTime. The LastChangeDateTime is the date/time of the last change made to the RFQ by the buyer. The LastChangeDateTime is of type GDT: GLOBAL_DateTime. PublishDateTime is the date/time when the RFQ is sent. The PublishDateTime is of type GDT: GLOBAL_DateTime. The DisplayDateTime is the date/time as of which the published RFQ is displayed on a tendering platform. DisplayDateTime is of type GDT: GLOBAL_DateTime.

BiddingStartDateTime is the date/time as of which quotations can be submitted. The BiddingStartDateTime is of type GDT: LOCALNORMALISED_DateTime. QuoteSubmissionDateTime is the date/time after the BiddingStartDateTime up to which quotations can be submitted. The QuoteSubmissionDateTime is of type GDT: LOCALNORMALISED_DateTime. The QuoteOpeningDateTime is the date/time when the quotations are opened and displayed for the quotation comparison. The QuoteOpeningDateTime is of type GDT: LOCALNORMALISED_DateTime. The QuoteBindingDateTime is the date/time up to which bidders are bound to the quotations they have submitted. The QuoteBindingDateTime is of type GDT: LOCALNORMALISED_DateTime.

The ContractValidityDateTimePeriod is the validity period of the contract that is to be assigned using the RFQ. The ContractValidityDateTimePeriod is of type GDT: UPPEROPEN_GLOBAL_DateTimePeriod. The Note is a short description or the title of the RFQ. It is generally used to provide the user with a simple method for searching for a particular RFQ. The Note is of type GDT: Note. The Name is a short description or the title of the RFQ. Name is of the type GDT: MEDIUM_Name The RFQPublicIndicator specifies whether the RFQ process is a closed RFQ process with only bidders that have been explicitly invited or an open RFQ process in which bidders who have not been explicitly invited can also participate. The RFQPublicIndicator is of type GDT: BusinessTransactionDocumentPublicIndicator.

The QuotePricingIndicator indicates whether conditions in the RFQ process may be applied or not. The QuotePricingIndicator is of type GDT: BusinessTransactionDocumentPricingIndicator. The QuoteChangeAllowedIndicator specifies whether a submitted quotation can be changed by the bidder or not. 'True' means that changes to offer are allowed. 'False' means that only an offer without further changes is allowed. The QuoteChangeAllowedIndicator is of type GDT: Indicator. The QuoteUnplannedItemPermissionCode specifies whether the bidder's quotation is allowed to contain own items with alternative quotations. The QuoteUnplannedItem- PermissionCode is of type GDT: UnplannedItemPermissionCode. The QuotePriceBiddingConditionCode specifies whether the bidder is allowed to specify pricing information. If the RFQ is used to check the bidder's ability to meet certain technical requirements, for example, prices might not be required. The QuotePriceBiddingConditionCode is of type GDT: BiddingConditionCode.

The QuoteQuantityBiddingConditionCode specifies whether the bidder is allowed to enter in the quotation a quantity other than the requested quantity. The QuoteQuantityBiddingConditionCode is of type GDT: BiddingConditionCode. The QuoteItemBiddingConditionCode specifies whether the bidder has to submit a quotation for all items. The QuoteItemBiddingConditionCode is of type GDT: BiddingConditionCode. The PriceDetailLevelCode is a coded representation of the requested detailed price information for the RFQ. For example, the buyer can request simple prices, complex prices (discounts scale price) or no price information. The PriceDetailLevelCode is of type GDT: PriceDetailLevelCode. (Restriction: The following codes are permitted: 1 (Simple Price), 2 (Complex Price), 3 (No Price)) The QuantityChangeAllowedIndicator specifies whether the BidderParty is allowed to offer a quantity other than the requested quantity. The QuantityChangeAllowedIndicator is of type GDT: Indicator.

The BidOnAllItemsRequiredIndicator specifies whether the bidder has to quote for all items. The BidOnAllItemsRequiredIndicator is of type GDT: Indicator. The QuoteBindingIndicator specifies whether the submitted quotations are binding. The QuoteBindingIndicator is of type GDT: Indicator. The FollowUpQuoteRequirementCode is a coded representation of the need for the bidder's quotation. The FollowUpQuoteRequirementCode is of type GDT: FollowUpBusinessTransactionDocumentRequirementCode. (In some implementations, restrictions: The following codes are permitted: 02 (Expected), 03 (Optional), 05 (Forbidden)) The RequestedQuoteCurrencyCode specifies the currency the quotation shall be submitted in. The RequestedQuoteCurrencyCode is of type GDT: CurrencyCode. The ContractTargetAmount is the target amount in contractual negotiations. The ContractTargetAmount is of type GDT: Amount.

The RFQ object contained in the message data type RFQMessage provides a structure that is not used only for RFQs but also for changing RFQs. The semantic of the RFQ object is, therefore, more generic in order to cover both aspects. The ContractTargetAmount in the QuoteNotification is information provided to the buyer by the bidder. The ContractTargetAmount is used if a contract is to be negotiated and assigned using an RFQ. Differences between the RFQContractTargetAmount and the QuoteContractTargetAmount are allowed and are subject to the business framework of the negotiation process as defined by the buyer and bidder. There are no dependencies between how the ContractTargetAmount is used at header and/or item level. The bidder has to decide which information to supply to the buyer. To summarize, the structure of the BusinessDocumentObject RFQ can be divided into the header, item, and schedule line.

RFQParty Package

A Party package groups together all the business parties that can occur in one of the RFQ messages. It contains: BuyerParty, BidderParty, BidderPortalProviderParty, ProductRecipientParty, Vendor Party, ServicePerformerParty, ManufacturerParty and PayerParty.

Either only the ID or the ID and address can be transferred for each party. If only the ID is transferred, the ID address defined in the master data is used. If the ID and address are transferred, the ID identifies the party and the address is deemed to be a document address that is different from the master data address. If possible, the ID and address should be sent to avoid misunderstandings. The receiving application should implement a suitable optimization strategy to prevent many identical document addresses from being created.

A default logic is used for all parties: from the header to the items and within item hierarchies. Parties specified in the header are used for all the items for which a corresponding party is not explicitly transferred and that are directly assigned to the header. In accordance with the same logic, parties transferred at item level are used for all subitems assigned to the relevant item in an item hierarchy. The default logic applies to the party as a whole, including the contact person. Parts of a party specified at header level or for a hierarchy item cannot be specified in more detail at item level. The default logic is only a simplified version of the transmitted message. Logically, parties at header level and hierarchy items behave as if they have been explicitly transferred for all the subitems of the message. This also means that if only changed items are transmitted rather than all items, the parties are used for the transmitted items only. Changes made to parties always apply to all items relevant for the party in question.

A BuyerParty is a party that buys goods or services. The BuyerParty is of type GDT: BusinessTransactionParty. The same BuyerParty can be used for all the items in an RFQ.

The BuyerParty can not be changed once an RFQ has been created. The BuyerParty can be specified.

Changes can be made to the BuyerParty/Contact and a different BuyerParty/Contact can exist for each item. Changes can be made to the address of the BuyerParty, but different addresses are not permitted for each item. If a ProductRecipientParty is not explicitly specified in an RFQ process, the BuyerParty is also used as the ProductRecipientParty. If a ProductRecipientParty and ShipToLocation are not explicitly specified in the RFQ process, the BuyerParty address is also used as the ship-to address. If a PayerParty is not explicitly specified in an RFQ process, the BuyerParty is also used as the PayerParty.

A BidderParty is a party that bids for goods or services. The BidderParty is of type GDT: BusinessTransactionDocumentParty. The same BidderParty can be used for all the items in an RFQ.

The BidderParty can not be changed once an RFQ has been created. The BidderParty can be specified. Changes can be made to the BidderParty/Contact and a different BidderParty/Contact is permitted for each item. Changes can be made to the address of the BidderParty, but different addresses are not permitted for each item. If a Vendor Party is not explicitly specified in an RFQ process, the BidderParty is also used as the Vendor Party. If a Vendor Party and ShipFromLocation are not explicitly specified in an RFQ process, the address of the BidderParty is used as the ship-from address for the material items.

A BidderPortalProviderParty is a party that runs a portal that brings business partners together for a business transaction. The BidderPortalProviderParty is of type GDT: BusinessTransactionDocumentParty. The BidderPortalProviderParty can be explicitly specified if an RFQ is to be sent to a public tendering platform.

The ProductRecipientParty is the party to which goods are delivered or for whom services are provided. The ProductRecipientParty is of type GDT: BusinessTransactionDocumentParty. If a ShipToLocation is not explicitly specified in an RFQ process, the ProductRecipientParty address is used as the ship-to address. The ProductRecipientParty is not synonymous with the ShipToLocation and is only to be used when the ProductRecipientParty (company or person) is actually different from the BuyerParty.

A Vendor Party is a party that delivers goods or provides services. The Vendor Party is of type GDT: BusinessTransactionDocumentParty. If a ShipFromLocation is not explicitly specified in an RFQ process, the address of the Vendor Party is used as the ship-from address for the material items. The Vendor Party is not the company or person that is solely responsible for transporting the goods. The CarrierParty is responsible for this; however, this party is not used in the RFQ interfaces. The Vendor Party is not synonymous with the ShipFromLocation and should be used only when the Vendor Party (company or person) is actually different than the BidderParty.

A ServicePerformerParty is a party that delivers a service. The ServicePerformerParty is of type GDT: BusinessTransactionDocumentParty. A ServicePerformerParty can be used for service items only. With regard to the ServicePerformerParty, the default logic (from header to item to subitems) is used for service items only; for other items, the ServicePerformerParty is ignored.

A ManufacturerParty is a party that manufactures goods. The ManufacturerParty is of type GDT: BusinessTransactionDocumentParty. Integrity (Regarding the Message Data Type)

The ManufacturerParty can only be used for Material items. With regard to the ManufacturerParty, the default logic (from header to item to subitems) is used for material items only; for other items, the ManufacturerParty is ignored. The ManufacturerParty can be used to uniquely define the context of a ManufacturerProductID.

A PayerParty is a party that pays for goods or services. The PayerParty is of the GDT type: BusinessTransactionDocumentParty. The PayerParty is used for the ContractPayer. The ContractPayer is the party paying for contractual negotiations.

RFQLocation Package

A Location package groups together all the locations that can occur in one of the RFQ messages. It contains: ReceivingSite, ShipToLocation and ContractReleaseAuthorisedLocation. A similar default logic to that used for parties is also used for all locations. Either only the ID or only the address, or both can be transferred to each location. If only the ID is transferred, the ID address defined in the master data is used. If only the address is transferred, it is this address that is used (if necessary, a location can be assigned at the address recipient). If the ID and address are transferred, the ID identifies the location and the address is deemed to be a document address that is different to the master data address. If possible, the ID and address should be sent to avoid misunderstandings. The receiving application should implement a suitable optimization strategy to prevent many identical document addresses from being created.

A ReceivingSite is the place, where parts of a company are located. The ReceivingSite is of type GDT: BusinessTransactionDocumentLocation.

A ShipToLocation is the location to which goods are to be delivered or where services are to be provided. The ShipToLocation is of type GDT: BusinessTransactionDocumentLocation.

A ContractReleaseAuthorisedLocation is a place which is authorised to make releases against the follow-up document PurchasingContract.

GDT: BusinessTransactionDocumentLocation.

RFQDeliveryInformation Package

A DeliveryInformation package groups together all the information about a required delivery in an RFQ process. It contains the entity DeliveryTerms. The default logic used for DeliveryTerms is similar to that used for Parties.

DeliveryTerms are the conditions and agreements that are valid for executing the delivery and transporting the tendered goods and for the necessary services and activities. The DeliveryTerms are type GDT: DeliveryTerms.

Of the DeliveryTerms, only Incoterms and MaximumLeadTimeDuration are allowed to be used for material items. The MaximumLeadTimeDuration is the maximum lead time from the time of the order to the receipt of the delivery. This duration can be agreed in RFQs or contractual negotiations and represents the basis (that is binding) for the calculation of the received delivery date for an order date.

The default logic takes Incoterms and the MaximumLeadTimeDuration into account for material items only. For all other items, DeliveryTerms are ignored.

RFQPaymentInformation Package

A PaymentInformation package groups together all the payment information in an RFQ process. It contains the following entities: CashDiscountTerms and PaymentForm.

CashDiscountTerms are the terms of payment in an RFQ process. The CashDiscountTerms are type GDT: CashDiscountTerms.

A PaymentForm is the form of payment together with the data required. The PaymentForm contains the element: PaymentFormCode. PaymentFormCode is the coded representation of the payment form. The PaymentFormCode is of type GDT: PaymentFormCode.

RFQPriceInformation Package

The RFQPriceInformation package groups together all price information in a RFQ. It contains the entity: PriceSpecificationElement.

The PriceSpecificationElement contains price calculation detail information, such as discounts or sur-charges, proposed by the purchaser. The PriceSpecificationElement is of type GDT: PriceSpecificationElement.

RFQProductInformation Package

A ProductInformation package groups together the product category. It contains the entity: ProductCategory.

ProductCategory contains the details about a product category as generally understood from a commercial point of view in business transaction documents. It includes details for identifying the product category using an internalID, a standard ID, and IDs assigned by involved parties. The ProductCategory is of type GDT: BusinessTransactionDocumentProductCategory.

The product category at header level can be used to classify the RFQ and provide the bidders with an initial indication of what is involved in the RFQ. The product category can differ between the buyer and seller. This is permitted and should be tolerated by the systems involved.

RFQBusinessTransactionDocumentReference Package

A BusinessTransactionDocumentReference package groups together business document references that can occur in one of the RFQ messages. It contains the entity: QuoteReference.

A QuoteReference is a reference to a quotation. The QuoteReference is of type GDT: BusinessTransactionDocumentReference.

A QuoteReference can reference one quotation only, that is, only one ID is permissible.

As far as the referenced quotation is concerned, there can not be any conflicts with a QuoteReference at item level. If a reference is used at both header and item level, it can refer to one (the same) quotation.

The reference to a quotation is required at both header and item level, since RFQs do not always have item data. The QuoteReference is used when questions and answers are exchanged between the bidder and buyer and if the RFQ is changed.

RFQFollowUpBusinessTransactionDocument Package

A FollowUpBusinessTransactionDocument package groups together all the information about which business transaction documents the buyer is expecting as a result of the RFQ process. It contains the following entities: FollowUpPurchaseOrder and FollowUpPurchaseContract.

In the FollowUpBusinessTransactionDocument, the buyer provides the bidders with information about whether the RFQ is to result in a contract or a purchase order. However, the buyer can also leave this open by not providing any information.

A FollowUpPurchaseOrder provides information about whether the buyer expects a purchase order as a result of the RFQ process. The FollowUpPurchaseOrder contains the following element: RequirementCode.

The RequirementCode is a coded representation of information about whether the buyer expects a purchase order as a result of the RFQ process. The RequirementCode is of type GDT: FollowUpBusinessTransactionDocumentRequirementCode. In certain implementations, only the value "02" (Expected) is permitted for the RequirementCode, and the RequirementCode can only be changed by the buyer.

A FollowUpPurchaseContract provides information about whether the buyer expects a contract as the result of the RFQ process. The FollowUpPurchaseContract contains the following element: RequirementCode.

The RequirementCode is a coded representation of information about whether the buyer expects a contract as a result of the RFQ process. The RequirementCode is of type GDT: FollowUpBusinessTransactionDocumentRequirementCode. In certain implementations, only the value "02" (Expected) is permitted for the RequirementCode, and the RequirementCode can only be changed by the buyer.

RFQAttachment Package

An Attachment package groups together all the attachment information regarding the RFQ. The Attachment package contains the following entities: Attachment and AttachmentFolder.

Attachment is any document that refers to the RFQ. The Attachment is of type GDT: Attachment.

AttachmentFolder can contain any document that refers to the RFQ. AttachmentFolder is of type GDT: AttachmentFolder.

RFQDescription Package

A Description package groups together all the texts regarding the RFQ. The Description package contains the following entities: Description and TextCollection.

A Description is a natural-language text regarding the RFQ, which is visible to parties. The Description is of type GDT: Description. The Description can be used for all textual information about the transferred RFQ and not just the current message. An example of this would be information that the Purchasing employee responsible is on vacation as of a specific date, and indicating the name and telephone number of a substitute as of this date. The Description can also be used for communication between the buyer and bidder in order to process queries, for example.

In the case of a public tendering platform, measures can be taken to ensure that individual communications with individual bidders, which contain explanatory information about the RFQ, are also made available to all other RFQ participants. This is ensured by sending a copy of the description to the tendering platform, where it is published. This is a configuration issue.

A TextCollection is a collection of natural-language text regarding the RFQ, which is visible to parties. The TextCollection is of type GDT: TextCollection.

RFQItem Package

An RFQItem package groups together the RFQItem and its packages. The RFQItem package contains the packages: ProductInformation, Party, Location, DeliveryInformation, BusinessTransactionDocumentReference, PriceInformation, Attachment, Description and ScheduleLine.

An RFQItem specifies a product tendered by an RFQ with additional information on a product. The RFQItem contains detailed information about a particular product. The quantity of the product and (delivery) dates/times are specified in the schedule line. For the RFQItem (compared to the information of the RFQ), deviating parties, locations, and delivery terms can be defined.

The RFQItem can contain references to other business documents that are relevant for the item. Notes or references to attachments can also be specified for the RFQItem. An RFQItem can be subordinate to another RFQItem within a hierarchy in order to represent a business relationship between the two items. The RFQItem is of type GDT: RFQItem. The RFQItem contains the following elements: ID and ContractTargetAmount.

The ID is an identifier assigned by the buyer to an RFQ item. The identifier is unique within a particular RFQ. The ID is of type GDT: BusinessTransactionDocumentItemID. The ContractTargetAmount is the target amount in contractual negotiations. The ContractTargetAmount is of type GDT: Amount. The RFQItem contains the following entity: HierarchyRelationship.

A HierarchyRelationship is the relationship between a subitem and a higher-level parent item in an item hierarchy. The HierarchyRelationship contains the following elements: ParentItemBuyerID, ParentItemVendorID and TypeCode.

The ParentItemBuyerID is the reference to a parent item with the item number assigned by the buyer. The ParentItemBuyerID is of type GDT: BusinessTransactionDocumentItemID.

The ParentItemVendorID is the reference to a parent item with the item number assigned by the seller. The ParentItemVendorID is of type GDT: BusinessTransactionDocumentItemID.

The TypeCode represents the hierarchical relationship between the subitem and its higher-level parent item. The TypeCode is of type GDT: BusinessTransactionDocumentItemHierarchyRelationshipTypeCode.

In certain implementations, the ParentItemBuyerID can not be changed once an item has been created. In certain implementations, the ParentItemVendorID can not be changed once an item has been created. In certain implementations, either the ParentItemBuyerID or the ParentItemVendorID can be specified. In certain implementations, the TypeCode can not be changed once an item has been created.

RFQItemProductInformation Package

A ProductInformation package groups together the product and the product category. It contains the following entities: Product and ProductCategory.

Product contains the details about a product as generally understood from a commercial point of view in business documents. These are the details for identifying a product, product type, and the description of the product. The Product is of type GDT: BusinessTransactionDocumentProduct.

ProductCategory contains the details about a product category as generally understood from a commercial point of view in business transaction documents. It includes details for identifying the product category using an internalID, a standard ID, and IDs assigned by involved parties. The ProductCategory is of type GDT: BusinessTransactionDocumentProductCategory.

The product category is derived directly from the product if a product number is provided for the product. It can differ for the buyer and seller if they have classified the same product differently. This is permitted and should be tolerated by the systems involved. The product category at item level can differ from the product category at header level.

RFQItemParty Package

A Party package groups together all the business parties that can occur in one of the RFQ messages at item level and represents part of the Party package at header level. It contains the following entities: BuyerParty, BidderParty, ProductRecipientParty, Vendor Party, ServicePerformerParty and ManufacturerParty.

BuyerParty is similar to the BuyerParty at header level. BidderParty is similar to the BidderParty at header level. ProductRecipientParty is similar to the ProductRecipientParty at header level. Vendor Party is similar to the Vendor Party at header level. ServicePerformerParty is similar to the ServicePerformerParty at header level. ManufacturerParty is similar to the ManufacturerParty at header level.

RFQItemLocation Package

A Location package groups together all the locations that can occur in one of the RFQ messages. It contains the entities: ReceivingSite and ShipToLocation. ReceivingSite is similar to the ReceivingSite at header level. ShipToLocation is similar to the ShipToLocation at the header level.

RFQItemDeliveryInformation Package

RFQItemDeliveryInformation can be similar to the DeliveryInformation package at header level.

RFQItemBusinessTransactionDocumentReference Package

A BusinessTransactionDocumentReference package groups together all the business document references that can occur in one of the RFQ messages. It contains the following entities: QuoteReference, PurchaseContractReference and BuyerProductCatalogueReference.

A QuoteReference is a reference to the quotation or the item within the quotation. The QuoteReference is of type GDT: BusinessTransactionDocumentReference. As far as the referenced quotation is concerned, there can not be any conflicts with a QuoteReference at header level. If a quotation reference is maintained at both header and item level, it can refer to one (the same) quotation.

A PurchaseContractReference is a reference to a purchase contract or item in a purchase contract. The PurchaseContractReference is of type GDT: BusinessTransactionDocumentReference. A PurchaseContractReference can reference one item only, that is, only one ItemID is permissible. In certain implementations, unless otherwise agreed, the seller may be responsible for determining the correct PurchaseContractReference for a specified SellerContractReference.

A BuyerProductCatalogueReference is a reference to the buyer's product catalog or an item within the buyer's product catalog. The BuyerProductCatalogueReference is of type GDT: CatalogueReference. In certain implementations, a BuyerProductCatalogueReference can reference one item only, that is, only one ItemID is permissible.

The BuyerProductCatalogueReference should always be filled if an RFQ item refers to a catalog whose number and item numbers were assigned by the buyer. In the RFQ process, the BuyerProductCatalogueReference can be used as a substitute product number if the product is defined in a catalog only rather than having its own master record.

RFQItemPriceInformation Package

The RFQItemPriceInformation package groups together all price information in a RFQ item. It contains the entity Price.

A Price is a quotation price that has been defined by the bidder in an RFQ. The Price contains the following elements: NetUnitPrice and PriceSpecificationElement.

The NetUnitPrice is the net price (without tax or cash discount) specified by the bidder for the base quantity for the quotation in an RFQ. The NetUnitPrice is of type GDT: Price.

The PriceSpecificationElement contains price calculation detail information, such as discounts or sur-charges, proposed by the purchaser. The PriceSpecificationElement is of type GDT: PriceSpecificationElement.

RFQItemAttachment Package

RFQItemAttachment may be similar to the Attachment package at header level.

RFQItemDescription Package

RFQItemDescription may be similar to the Description package at header level.

RFQItemScheduleLine Package

The ScheduleLine package groups together all the quantity and date information about an RFQItem. It contains the entity ScheduleLine.

A ScheduleLine is a line containing the quantity and date of the performance schedule requested by the buyer in an RFQ. The ScheduleLine is of type GDT: RFQItemScheduleLine. The ScheduleLine contains the following elements: ID, DeliveryPeriod, Quantity and QuantityTypeCode.

ID is the ScheduleLine number assigned by the procurement system. The ID is of type GDT: BusinessTransactionDocumentItemScheduleLineID.

The DeliveryPeriod is the period in which the buyer expects a product to be delivered or service provided. The DeliveryPeriod is of type GDT: UPPEROPEN_LOCALNORMALISED_DateTimePeriod.

The Quantity is the RFQ quantity or the target quantity in contractual negotiations. The Quantity is of type GDT: Quantity.

The QuantityTypeCode is a coded representation of the type of quantity in the item schedule line. The QuantityTypeCode is of type GDT: QuantityTypeCode.

In certain implementations, only one ScheduleLine is allowed for each RFQ item. In certain implementations, when used more than once, the information in the ScheduleLine and DeliveryInformation can be consistent (for example, if used twice, the delivery date can be identical in both cases).

The ID is optional; a procurement system does not have to number the ScheduleLines.

Message Data Type RFQCancellationMessage

The message data type RFQCancellationMessage groups together and includes business information relevant for sending a business document in a message. The RFQCancellation object in the document. It contains the following packages: BusinessDocumentMessageHeader and RFQCancellation. The message data type RFQCancellationMessage makes the structure available for the message type RFQCancellationRequest and the relevant interfaces.

MessageHeader Package

MessageHeader can be similar to the MessageHeader package in the RFQMessage.

RFQCancellation Package

The RFQCancellation package groups together the RFQCancellations. An RFQCancellation is a cancellation of an RFQ from a buyer to a bidder. The RFQCancellation is of type GDT: RFQCancellation. The RFQCancellation contains the following elements: ID and ReconciliationPeriodCounterValue.

The ID is the unique identifier specified by the buyer for the RFQ. The ID is of type GDT: BusinessTransactionDocumentID.

ReconciliationPeriodCounterValue is a counter for reconciliation periods. The ReconciliationPeriodCounterValue is of type GDT: ReconciliationPeriodCounterValue.

Message Data Type QuoteMessage

The message data type QuoteMessage groups together such as business information relevant for sending a business document in a message. The Quote object in the document. It contains the following packages: BusinessDocumentMessageHeader and Quote. The message data type QuoteMessage makes the structure available for the message type QuoteNotification and the relevant interfaces.

MessageHeader Package

MessageHeader can be similar to the MessageHeader package in the RFQMessage.

Quote Package

A Quote package groups together the Quote and its packages. The Quote package contains the packages: ProductInformation, Party, Location, DeliveryInformation, BusinessTransactionDocumentReference, PaymentInformation, PriceInformation, Attachment, Description and Item.

A Quote is a quotation submitted by a bidder to a buyer in response to a request for quotation (RFQ) issued for a product by the buyer. The Quote is subdivided into QuoteItems, which contain the concrete quotation submitted by the bidder with reference to the relevant item in the buyer's RFQ. The structure of the packages in the Quote is the same as the structure of the packages in the RFQ. The Quote is of type GDT: Quote.

The Quote contains the following elements: ID, ReconciliationPeriodCounterValue, PostingDateTime, LastChangeDateTime, BindingDateTime, Note, Name and ContractTargetAmount.

The ID is the unique identifier specified by the buyer for the quotation. The ID is of type GDT: BusinessTransactionDocumentID.

ReconciliationPeriodCounterValue is a counter for reconciliation periods. The ReconciliationPeriodCounterValue is of type GDT: ReconciliationPeriodCounterValue.

The PostingDateTime is the creation date/time of the quotation at the bidder. The PostingDateTime is of type GDT: GLOBAL_DateTime.

The LastChangeDateTime is the date/time of the last change made to the quotation by the bidder. The LastChangeDateTime is of type GDT: GLOBAL_DateTime.

BindingDateTime is the date/time up to which bidders are bound to the quotations they have submitted. The BindingDateTime is of type GDT: LOCALNORMALISED_DateTime.

The Note is a short description or the title of the quotation. It is generally used to provide the user with a simple method for searching for a particular quotation. The Note is of type GDT: Note.

The Name is a short description or the title of the RFQ. Name is of the type GDT: MEDIUM_Name.

The ContractTargetAmount is the target amount in contractual negotiations. The ContractTargetAmount is of type GDT: Amount.

To summarize, the structure of the BusinessDocumentObject Quote can be divided into the header, item, and schedule line.

QuoteParty Package

QuoteParty can be similar to Party package at header level in the RFQ message.

QuoteLocation Package

A Location package groups together all the locations that can occur in one of the RFQ messages. It contains the entity: ShipToLocation. ShipToLocation can be similar to the ShipToLocation at the header level in the RFQ message.

QuoteDeliveryInformation Package

QuoteDeliveryInformation can be similar to the DeliveryInformation package in the RFQ message.

QuotePaymentInformation Package

QuotePaymentInformation can be similar to the PaymentInformation package in the RFQ message.

QuotePriceInformation Package

The QuotePriceInformation package groups together all price information in a quotation. It contains the entity: PriceSpecificationElement. The PriceSpecificationElement contains price calculation detail information, such as discounts or sur-charges, offered by the bidder. The PriceSpecificationElement is of type GDT: PriceSpecificationElement.

QuoteProductInformation Package

QuoteProductInformation can be similar to ProductInformation package at header level in the RFQ message.

QuoteBusinessTransactionDocumentReference Package

A BusinessTransactionDocumentReference package groups together the business document references that can occur in the Quote message. It contains the entity RFQReference. The RFQReference is a reference to a request for quotation. The RFQReference is of type GDT: BusinessTransactionDocumentReference. In certain implementations, an RFQReference can reference only one RFQ, that is, only one ID is permissible. In certain implementations, as far as the referenced RFQ is concerned, there can not be any conflicts with an RFQReference at item level. If a reference is used at both header and item level, it can refer to one (the same) RFQ. In certain implementations, the reference to an RFQ is required at both header and item level, since RFQs do not always have item data. In certain implementations, unless otherwise agreed, the bidder can use the RFQID assigned by the buyer.

QuoteAttachment Package

QuoteAttachment can be similar to the Attachment package in the RFQ message.

QuoteDescription Package

QuoteDescription can be similar to the Description package in the RFQ message.

QuoteItem Package

A QuoteItem package groups together the QuoteItem and its packages. The QuoteItem package contains the following packages: ProductInformation, PriceInformation, Party, Location, DeliveryInformation, BusinessTransactionDocumentReference, Attachment, Description and ScheduleLine.

A QuoteItem contains the bidder's quotation for a product tendered in an item of a request for quotation (RFQItem) or additional information about this product. Quantities and delivery dates can also be specified here. The structure is the same as the structure of the RFQItem. The QuoteItem is of type GDT: QuoteItem. The QuoteItem contains the following elements: ID, ContractTargetAmount and HierarchyRelationship The ID is the unique identifier specified by the buyer for a quotation item within an RFQ. The ID is of type GDT: BusinessTransactionDocumentItemID. The ContractTargetAmount is the target amount in contractual negotiations. The ContractTargetAmount is of type GDT: Amount. HierarchyRelationship can be similar to the HierarchyRelationship package in the RFQ message.

QuoteItemProductInformation Package

QuoteItemProductInformation can be similar to the ProductInformation package in the RFQItem in the RFQ message.

QuoteItemPriceInformation Package

The PriceInformation package groups together all price information in a quotation item. It contains the entity Price. A Price is a quotation price that has been defined by the bidder in an RFQ. The Price contains the following elements: NetUnitPrice and PriceSpecificationElement.

The NetUnitPrice is the net price (without tax or cash discount) specified by the bidder for the base quantity for the quotation in an RFQ. The NetUnitPrice is of type GDT: Price.

The PriceSpecificationElement contains price calculation detail information, such as discounts or sur-charges, offered by the bidder. The PriceSpecificationElement is of type GDT: PriceSpecificationElement.

QuoteItemParty Package

QuoteItemParty can be similar to the Party package in the RFQItem in the RFQ message.

QuoteItemLocation Package

A Location package groups together all the locations that can occur in one of the RFQ messages. It contains the entity: ShipToLocation. ShipToLocation can be similar to the ShipToLocation at the header level in the RFQ message.

QuoteItemDeliveryInformation Package

Similar to the DeliveryInformation package at item level in the RFQ message.

QuoteItemBusinessTransactionDocumentReference Package

A BusinessTransactionDocumentReference package groups together all the business document references that can occur in the QuoteNotification message. It contains the entity: RFQReference.

An RFQReference is a reference to the RFQ or the item within the RFQ. The RFQReference is of type GDT: BusinessTransactionDocumentReference.

In certain implementations, an RFQReference can reference one item only, that is, only one ItemID is permissible. In certain implementations, as far as the referenced RFQ is concerned, there can not be any conflicts with an RFQReference at header level. In certain implementations, if an RFQ reference is maintained at both header and item level, it can refer to one (the same) RFQ. In certain implementations, unless otherwise agreed, the bidder can use the RFQID and RFQItemID assigned by the buyer.

QuoteItemAttachment Package

QuoteItemAttachment can be similar to the Attachment package in the RFQMessage

QuoteItemDescription Package

QuoteItemDescription can be similar to the Description package in the RFQ message QuoteItemScheduleLine Package QuoteItemScheduleLine can be similar to the ScheduleLine package in the RFQ message Message Data Type RFQResultMessage The message data type RFQResultMessage groups together business information relevant for sending a business document in a message. The RFQResult object in the document. It contains the following packages: BusinessDocumentMessageHeader and RFQCancellation. The message data type RFQCancellationMessage makes the structure available for the message type RFQCancellationRequest and the relevant interfaces.

MessageHeader Package

MessageHeader can be similar to the MessageHeader package in the RFQMessage.

RFQResult Package

An RFQResult package groups together the RFQResult and its package. The RFQResult package contains the following packages: Party, Description and Item.

An RFQResult is the acceptance or rejection of a bidder's quotation by the buyer. The RFQResult is of type GDT: RFQResult. The RFQResult contains the elements: ID, ReconciliationPeriodCounterValue and QuoteAwardingStatusCode.

The ID is the unique identifier specified by the buyer for the RFQ. ReconciliationPeriodCounterValue is a counter for reconciliation periods. This status variable indicates the status of the bidder's quotation awarding process. The QuoteAwardingStatusCode is of type GDT: SupplierQuoteAwardingStatusCode.

RFQResult Party Package

A Party package groups together all the parties that can occur in one of the RFQResult messages. The Party package contains the following entity: BidderParty A BidderParty is a party that bids for goods or services. The BidderParty is of type GDT: BusinessTransactionDocumentParty. The BidderParty can be required for the RFQResult message if the result of the RFQ is to be published on a tendering platform. The configuration determines whether this scenario applies.

RFQResultDescription Package

RFQResultDescription can be similar to the Description package in the RFQ message.

RFQResultItem Package

An RFQResult package groups together the RFQResultItem and its packages. The RFQResult package contains the following packages: BusinessTransactionDocumentReference and ScheduleLine.

An RFQResultItem specifies the rejection or the extent of the acceptance of a bidder's quotation for a product of an RFQ item. The RFQResultItem is of type GDT: RFQResultItem. The RFQResultItem contains the following element ID. The ID is an identifier assigned by the buyer to an RFQ item. The identifier is unique within a particular RFQ. The ID is of type GDT: BusinessTransactionDocumentItemID.

The QuoteItem contains the following entity HierarchyRelationship. HierarchyRelationship can be similar to the HierarchyRelationship package in the RFQ message.

RFQResultItemBusinessTransactionDocumentReference Package

A BusinessTransactionDocumentReference package groups together all the business document references that can occur in one of the RFQResult messages. It contains the entity: QuoteReference.

A QuoteReference is a reference to the quotation or the item within the quotation. QuoteReference is of type GDT: BusinessTransactionDocumentReference. In certain implementations, QuoteReference can reference one item only, that is, only one ItemID is permissible.

RFQResultItemScheduleLine Package

RFQResultItemScheduleLine can be similar to the ScheduleLine package in the RFQ message.

Message Data Type FormRFQMessage

The message data type FormRFQMessage has the same structure and semantic as the message data type RFQMessage except for providing formatted addresses in addition to the normal addresses providing the name for every code value. It is used to render forms (e.g., for printing, mail, fax).

Message Data Type InteractiveFormRFQMessage

The message data type InteractiveFormRFQMessage has the same structure and semantic as the message data type RFQMessage except for providing formatted addresses in addition to the normal addresses, providing the name for every code value, and including fields for the interactive reply of the bidder (e.g., confirmed values and amounts, price information, delivery and payment details). It is used to render interactive forms (e.g., for mail).

Message Data Type FormRFQResultMessage

The message data type FormRFQResultMessage has the same structure and semantic as the message data type RFQResultMessage except for providing formatted addresses in addition to the normal addresses, providing the name for every code value, and providing additional information needed for proper form output (e.g., the responsible purchasing unit party or item product details). It is used to render forms (e.g. for printing, mail, fax).

Business Object RFQRequest

FIGS. 275-1 through 275-9 illustrate one example of an RFQRequest business object model 275024. Specifically, this model depicts interactions among various hierarchical components of the RFQRequest, as well as external components that interact with the RFQRequest (shown here as 275000 through 2750022 and 275026 through 275122). BO RFQRequest represents a request to the purchasing department to prepare a request for quote. This request can be triggered, for example, by expiring purchasing contracts or purchase requests without an assigned source of supply.

The RFQRequest business object is part of the RFQProcessing process component which is located in the RFQProcessing deployment unit.

Service Interfaces

BO RFQRequest may be involved in the following Process Integration Models: Purchase Request Processing_RFQ Processing; PurchasingContractProcessing_RFQ Processing.

Service Interface Request for Quote In (A2A) SI Request for Quote In has the technical name RFQProcessingRequestForQuoteIn. It represents a grouping of operations which create an RFQRequest based on requests from BOs like PurchasingContract and PurchaseRequest that are involved in the bidding process.

SI Request for Quote In may be part of the following Process Integration Models: Purchase Request Processing_RFQ Processing; Purchasing Contract Processing_RFQ Processing.

Operation Maintain RFQ Request (A2A)

SI Operation Maintain RFQ Request has the technical name RFQProcessingRequestForQuoteIn.MaintainRFQRequest. It may be based on the message type RFQExecutionRequest, which may be derived from BO RFQRequest.

SI Operation Maintain Request for Quote may create an RFQRequest out of business documents that are involved in the bidding process or in the negotiation process. A PurchasingContract which has to be negotiated may use this Operation to create the RFQRequest. A PurchaseRequest may use this Operation to create an RFQRequest to find new sources of supply.

Operation Cancel RFQ Request (A2A)

SI Operation Cancel RFQ Request has the technical name RFQProcessingRequestForQuoteIn.CancelRFQRequest. It may be based on the message type RFQExecutionCancellationRequest, which may be derived from BO RFQRequest.

SI Operation Cancel Request For Quote may cancel an RFQRequest and cancel the corresponding bidding process (i.e., cancel the corresponding RequestForQuote if one has been initiated).

Service Interface Request for Quote Out (A2A)

SI Request for Quote Out has the technical name RFQProcessingRequestForQuoteOut. It is a grouping of operations which send a confirmation to Business Objects which had requested the creation of an RFQRequest using the Request for Quote In service interface.

SI Request for Quote Out may be part of the following Process Integration Models: Purchase Request Processing_RFQ Processing; PurchasingContractProcessing_RFQ Processing.

Operation Confirm RFQ Request (A2A)

SI Operation Confirm RFQ Request has the technical name RFQProcessingRequestForQuoteOut.ConfirmRFQRequest. This operation confirms the RFQ Execution.

SI Operation Confirm RFQ Request may be based on the message type RFQExecutionConfirmation, which may be derived from BO RFQRequest.

BO RFQRequest Node Structure

Root Node

BO RFQRequest/Root Node 275070 represents a request to the purchasing department to prepare a request for quote.

An RFQ Request may contain the parties involved, the items, conditions and agreements for the bidding process, the status of the RFQRequest, as well as references. Furthermore, it may contain identification and administrative information of the RFQRequest.

An RFQRequest may be sent to a purchaser in situations such as the following. An expiring PurchasingContract triggers an RFQRequest for the purpose of renegotiation. A PurchaseRequest without any assigned sources of supply is converted to an RFQRequest in order to determine sources of supply. Strategic purchasers may create an RFQRequest manually if they want to bundle or strengthen certain purchasing activities (merge existing PurchasingContracts or create new PurchasingContracts for goods and services that have been previously purchased without a PurchasingContract).

BO RFQRequest may be derived from the ProcurementDocumentTemplate.

The structure elements located directly at Root Node are defined by data type ProcurementDocumentElements. In certain implementations these elements may include the following: ID, UUID, SystemAdministrativeData, TypeCode, ProcessingTypeCode, Name, CurrencyCode, TotalTargetAmount, ValidityPeriod, ProductCategory, ProductCategory, FollowUpObjectTypeCode, NegotiationTypeCode.

ID is an identifier for the RFQRequest. It may be based on GDT BusinessTransactionDocumentID.

UUID is an identifier, which may be unique, of the RFQRequest for referencing purposes. It may be based on GDT UUID.

SystemAdministrativeData specifies administrative data stored within the system. These data may contain system users and time of change. This element may be based on GDT SystemAdministrativData.

TypeCode is a coded representation of the RFQRequest type. This element may be based on GDT BusinessTransactionDocumentTypeCode. The single value 255 (RFQRequest) may be permitted.

ProcessingTypeCode is a coded representation for the processing type of the RFQRequest. This element may be based on GDT BusinessTransactionDocumentProcessingTypeCode.

Name is the Designation or title of the RFQRequest. This element may be based on GDT MEDIUM_Name. It may be optional.

CurrencyCode is the coded representation of the RequestForQuote currency. This element may be based on GDT CurrencyCode. It may be optional.

TotalTargetAmount is the total target amount of an RFQRequest. This element may be based on GDT Amount. It may be optional.

ValidityPeriod specifies a period of validity of an RFQRequest. This element may be based on GDT UPPEROPEN_GLOBAL_DateTimePeriod. It may be optional.

ProductCategory contains the details for identifying the product category. The ProductCategory is a classification of products according to objective criteria that is used to assemble followup RFQs mainly for information purposes. For example, specifying the most appropriate product category will increase the chances of the right bidder finding the RFQ and responding.

ProductCategory sub-elements may include the following, which may be defined by data type ProcurementDocumentProductCategory and may be optional. UUID is an identifier, which may be unique, for the product category; this element may be based on GDT UUID. InternalID is a proprietary identifier for the product category; This element may be based on GDT ProductCategoryInternalID.

FollowUpObjectTypeCode is relevant for the succeeding RFQ which may be created from one or more RFQRequestItems. In the RequestForQuote, the FollowUpObjectTypeCode is the coded representation of the need for a follow-up PurchasingContract or for a follow-up PurchaseOrder that should be created out of the accepted SupplierQuote. This element may be based on GDT ObjectTypeCode, values 110-PurchaseContract and/or 001-PurchaseOrder. It may be optional.

NegotiationTypeCode is the coded representation of a negotiation type of a RequestForQuote that is requested with the RFQRequest. This element may be based on GDT RequestForQuoteNegotiationTypeCode.

The CurrencyCode is the leading coded representation of the RFQRequest currency; all other CurrencyCodes (e.g. at TotalGrossAmount) may be read-only and may be the same as the RFQRequestCurrencyCode.

The ID may remain constant after creation. The UUID may be determined by the service provider and may remain constant. The SystemAdministrativeData is determined by the service provider and may remain constant. The ProcessingTypeCode may remain constant after creation.

In certain implementations of Root Node, the following composition relationships to subordinate nodes may exist: Item 275072 may have a cardinality relationship of 1:cn; Party 275086 may have a cardinality relationship of 1:cn; Location 275102 may have a cardinality relationship of 1:cn; BusinessTransactionDocumentReference 275110 may have a cardinality relationship of 1:cn; BusinessProcessVariantType may have a cardinality relationship of 1:cn; AttachmentFolder 275114 may have a cardinality relationship of 1:c (DO); TextCollection 275116 may have a cardinality relationship of 1:c (DO); AccessControlList 275118 may have a cardinality relationship of 1:1 (DO).

In certain implementations of Root Node, the following inbound aggregation relationships may exist. CreationIdentity may have a cardinality relationship of 1:cn, and indicates the Identity that created the procurement document. LastChangeIdentity may have a cardinality relationship of c:cn, and indicates the identity that changed the procurement document in the last time. ProductCategoryHierarchyProductCategory may have a cardinality relationship of c:cn.

In certain implementations of Root Node, (specialisation) navigation associations may exist to the following nodes: Item, Party, Location, BusinessTransactionDocumentReference, BusinessProcessVariantType.

(Specialisation) navigation Associations to node Item may include: PurchasingHierarchyItem may have a cardinality relationship of c:cn, and indicates association to purchasing hierarchy item(s). A purchasing hierarchy item is an item which is semantically associated with the root; other items with a parent item in an item hierarchy may be subordinate items.

(Specialisation) navigation Associations to node Party may include: BuyerParty may have a cardinality relationship of c:c, and indicates association to a party which appears within the BuyerParty specialisation; Requestor Party may have a cardinality relationship of c:c, and indicates association to a party which appears within the Requestor Party specialisation; ProductRecipientParty may have a cardinality relationship of c:c, and indicates association to a party which appears within the ProductRecipientParty specialisation; InvitedBidderParty may have a cardinality relationship of c:cn, and indicates association to a party which appears within the BidderParty specialisation; PortalProviderParty may have a cardinality relationship of c:cn, and indicates association to a party which appears within the PortalProviderParty specialisation.

(Specialisation) navigation Associations to node Location may include: ShipToLocation may have a cardinality relationship of c:c, and indicates association to a location which appears within the ShipToLocation specialisation; ReceivingSite may have a cardinality relationship of c:c, and indicates association to a location which appears within the ReceivingSite specialisation; ContractReleaseAuthorisedLocation may have a cardinality relationship of c:cn, and indicates association to a location which appears within the ContractReleaseAuthorisedLocation specialisation.

(Specialisation) navigation Associations to node BusinessTransactionDocumentReference may include: RequestForQuoteReference may have a cardinality relationship of c:cn, and indicates association to a business transaction document reference which appears within the RequestForQuoteReference specialisation; BasePurchaseRequestReference may have a cardinality relationship of c:c, and indicates association to a business transaction document reference which appears within the BasePurchaseRequestReference specialisation. BasePurchasingContractReference may have a cardinality relationship of c:c, and indicates association to a business transaction document reference which appears within the BasePurchasingContractReference specialisation.

(Specialisation) navigation Associations to node BusinessProcessVariantType may include: MainBusinessProcessVariantType may have a cardinality relationship of c:c, and indicates association to a business process variant type which is the main business process variant type.

In certain implementations of Root Node, the following ESI actions (Enterprise Service Infrastructure) may be implemented. Cancel, which cancels the RFQRequest and all the underlying RFQRequestItems and cancel any follow-on documents. Close, which closes the RFQRequest and may also close underlying RFQRequestItems and follow-on documents. CreateRequestForQuote, which creates a RequestForQuote from the RFQRequest; data contained in the RFQRequest including the Items and the parties may be used to create a new RequestForQuote.

In certain implementations of Root Node the query SelectAll may be called, which provides a list of all RFQRequests in the system.

Party

BO RFQRequest/node Party represents a natural person, a legal person, organisation, organisational unit, or group that is involved in an RFQRequest in a party role. A party could be a person, organisation, or group within or outside of the company.

Inheritance may be used for parties. That is, parties that are specified at RFQRequest level may be used for all items if not otherwise specified on item level.

A Party may exist within specialisations such as the following: BuyerParty, Requestor Party, ProductRecipientParty, BidderParty, PortalProviderParty.

BuyerParty is a party that buys goods or services and on behalf of which the RFQRequest is created. An instance of the Business Object Company can be the BuyerParty. A BuyerParty may have a contact person. For a BuyerParty, a PartyContactParty may be maintained.

Requestor Party is the party that initiates the bidding process through a request for materials or services (e.g., without a corresponding source of supply). For example, this can be the person that creates an InternalRequest, which is transferred into a PurchaseRequest, from which an RFQRequest is created. An instance of the business object Employee may be the Requestor Party. This party may be enabled for propagation.

ProductRecipientParty is the party to which products are delivered or for which services are provided. An instance of the business object Employee may be the ProductRecipientParty. This party may be enabled for propagation.

BidderParty is the party to which the RequestForQuote is submitted. The BidderParty may also have a contact person who submits the Supplier Quote. The contact person may be a BusinessPartner of the specialisation BusinessPartner. For a BidderParty, a PartyContactParty may be maintained.

PortalProviderParty is the party that represents a portal on which a public RequestForQuote is published. For a PortalProviderParty, a PartyContactParty may be maintained.

The structure elements located directly at node RFQRequestParty are defined by data type RFQRequestPartyElements, which is derived from data type BusinessTransactionDocumentPartyElements. In certain implementation these elements may include the following: UUID, PartyID, PartyUUID, PartyTypeCode, RoleCategoryCode, RoleCode, AddressReference, DeterminationMethodCode.

UUID is an identifier, which may be unique, of the procurement document party for referencing purposes. This element may be based on GDT UUID.

PartyID is an identifier of the Party in this party role in the procurement document or the master data object. This element may be based on GDT PartyID. It may be optional.

PartyUUID is an identifier, which may be unique, for a business partner, the organisational center, or their specialisations. This element may be based on GDT UUID. It may be optional.

PartyTypeCode specifies the type of the business partner, organisational center, or their specialisations referenced with the element PartyUUID. This element may be based on GDT PartyTypeCode. It may be optional.

RoleCategoryCode is the party role category of the Party in the procurement document or the master data object. This element may be based on GDT PartyRoleCategoryCode. It may be optional.

RoleCode is the party role of the Party in the procurement document or the master data object. This element may be based on GDT PartyRoleCode. It may be optional.

AddressReference is a reference to the address of the Party. This element may be based on GDT PartyAddressReference. It may be optional.

DeterminationMethodCode is a coded representation of the determination method of the Party. This element may be based on GDT PartyDeterminationMethodCode. It may be optional.

With respect to the above elements, if the PartyUUID exists, the PartyTypeCode may be required. Parties may be referenced via the Transformed Object Party that represents at one or more of the following business objects: Company, FunctionalUnit, ReportingLineUnit, Supplier, Customer, Employee, BusinessPartner.

In certain implementations of node Party, the following composition relationships to subordinate nodes may exist: PartyContactParty 275088 may have a cardinality relationship of 1:c; PartyAddress (DO) 275100 may have a cardinality relationship of 1:c.

In certain implementations of node Party, the following inbound aggregation relationships from BO Party/Root Node may exist: Party may have a cardinality relationship of c:cn, and indicates that Referenced Party in Master Data.

In certain implementations of node Party, navigation associations to transformed object UsedAddress/Root Node may exist as follows: UsedAddress may have a cardinality relationship of c:c. The transformed object UsedAddress may represent a uniform way to access a party address of a procurement document whether it's a business partner address, a organization center address or an address specified within a procurement document.

The address used for the Party may be a referenced address of the master data object, or The PartyAddress used via the composition relationship.

It may be possible to determine which of the two applies by means of the PartyAddressHostTypeCode element. The instance of the TO UsedAddress may represent this address. The association may be implemented.

When the address used for the Party is a referenced address of the master data object, the node ID of the node in the master data object can be determined via the PartyTypeCode, PartyAddressUUID and PartyAddressHostTypeCode elements that has the composition relationship to the DO address that may be represented by the TO UsedAddress. Additionally, the TO UsedAddress in the implemented association may be provided with the following information (as part of an example of a master data address): BusinessObjectTypeCode, BusinessObjectNodeTypeCode and Node ID of its own Party node. In some implementations, these may be required in case changes to the TO UsedAddress take place. In this case, the master data address may be copied by the TO UsedAddress, the changes may take place to the copy, and a corresponding DO Address may be created at the Party via the PartyAddress composition relationship.

When address used for the Party is the PartyAddress, the TO UsedAddress is informed of the BusinessObjectTypeCode, BusinessObjectNodeTypeCode and Node ID of its own Party. Moreover, information may be provided that this is not an example of a referenced address. In this case, the TO UsedAddress may represent the DO address used at the Party via the PartyAddress composition relationship. With respect to node Party, there may be exactly one aggregation relationship to the business partner, the organisational unit, or their specialisations.

PartyContactParty

BO RFQRequest/node PartyContactParty represents a natural person that can be contacted for the RFQRequest-Party. The contact may be a contact person or, for example, a secretarial office. Usually, communication data for the contact is available.

In certain implementations of node PartyContactParty, structure elements may include the following: UUID, PartyID, PartyUUID, PartyTypeCode, AddressReference, DeterminationMethodCode.

UUID is an identifier, which may be unique, for a procurement document contact party for referencing purposes. This element may be based on GDT UUID.

PartyID is an identifier of the contact in this party role in the procurement document or the master data object. This element may be based on GDT PartyID. It may be optional.

PartyUUID is an identifier, which may be unique, of the contact in this party role in the procurement document or the master data object. This element may be based on GDT UUID. It may be optional.

PartyTypeCode is a coded representation of the type of the business partner, organisational center, or their specialisations referenced by the element PartyUUID. This element may be based on GDT BusinessObjectTypeCode. It may be optional.

AddressReference is a reference to the address of the Party. This element may be based on GDT PartyAddressReference. It may be optional.

DeterminationMethodCode is a coded representation of the determination method of the contact party. This element may be based on GDT PartyDeterminationMethodCode. It may be optional.

In certain implementations of node PartyContactParty, the following inbound aggregation relationships from BOParty/Root Node may exist: Party may have a cardinality relationship of c:cn, and indicates the Referenced Contact Party in Master Data.

In certain implementations of node PartyContactParty, navigation associations to transformed object UsedAddress/Root Node may exist as follows: UsedAddress may have a cardinality relationship of c:cn, and indicates that Address used for the Contact Party.

There may be exactly one association to the address. This address may be a master data address of the business partner, organisational unit, or their specialisations referenced by PartyUUID.

PartyContactPartyAddress (DO)

BO RFQRequest/node PartyContactPartyAddress represents a procurement document specific address of the Party.

PartyAddress (DO)

BO RFQRequest/node PartyAddress represents a procurement document specific address of a party.

Location

BO RFQRequest/node Location represents a physical place which is relevant for the bidding process. For example, a Location may be the reception in an office building or gate 3 of a production plant.

Inheritance may be used for Locations. That is, Locations that are specified at RFQRequest level may be used for all items if not otherwise specified on item level.

A Location may occur in specialisations such as the following. ShipToLocation, which is the place where material may be delivered or where a service is be provided. ReceivingSite, which is the place where parts of a company are located. ContractReleaseAuthorisedLocation, which is a place that is authorised to make releases against the PurchasingContract; ContractReleaseAuthorisedLocations may be needed in the RFQRequest when a PurchasingContract requests the execution of a RequestForQuote for the purpose of renegotiating it.

The structure elements located directly at node Location are defined by data type ProcurementDocumentLocationElements, which is derived from data type BusinessTransactionDocumentLocationElements. In certain implementations these elements may include the following: UUID, LocationID, LocationUUID, RoleCategoryCode, AddressReference, DeterminationMethodCode.

UUID is an identifier, which may be unique, of the procurement document location for referencing purposes. This element may be based on GDT UUID.

LocationID is an identifier of the referenced Location. This element may be based on GDT LocationID. It may be optional.

LocationUUID is an identifier, which may be unique, of the Location referenced. This element may be based on GDT UUID. It may be optional.

RoleCategoryCode is a coded representation of the Location role category in the procurement document. This element may be based on GDT LocationRoleCategoryCode is a coded representation of the Location role in the procurement document. This element may be based on GDT LocationRoleCode.

AddressReference is a reference to the address of the Party. This element may be based on GDT LocationAddressReference. It may be optional.

DeterminationMethodCode is a coded representation of the determination method of the Party. This element may be based on GDT LocationDeterminationMethodCode. It may be optional.

In certain implementations of node Location, the following composition relationships to subordinate nodes may exist: LocationAddress (DO) 275104 may have a cardinality relationship of 1:c.

In certain implementations of node Location, the following inbound aggregation relationships from BO Location may exist: Location may have a cardinality relationship of c:cn; PartyAddressInformation may have a cardinality relationship of c:cn.

In certain implementations of node Location, navigation associations to transformed object UsedAddress/Root Node may exist as follows: UsedAddress may have a cardinality relationship of c:c. The transformed object UsedAddress may represent a uniform way to access a location address of a procurement document whether it's a business partner address, an organization center address or an address specified within a procurement document.

This may be a referenced address of a master data object, or the address that is integrated via the composition relationship LocationAddress.

You can see which of the two cases applies by looking at the element AddressHostTypeCode. The instance of the TO UsedAddress may represent this address. The association may be implemented:

In case 1, the elements AddressBusinessObjectTypeCode, AddressUUID and AddressHostTypeCode may be used to determine the Node ID of the node in the master data object, which may hold the composition relationship with DO Address, which may be represented by TO UsedAddress. Furthermore, the following information is sent to the TO UsedAddress in the implemented address:

First, the fact that it is a master data address. Second, the BusinessObjectTypeCode, BusinessObjectNodeTypeCode and Node ID of the own Location node. These may be required if changes are made to the TO UsedAddress. In this case the TO UsedAddress copies the master data address, the changes may be applied and the corresponding DO Address may be generated on the Location node via the composition relationship LocationAddress.

In case 2, the BusinessObjectTypeCode, BusinessObjectNodeTypeCode and Node ID of the own Location may be communicated to the TO UsedAddress. Whether or not it is a referenced address may also be included. In this case, the TO UsedAddress may represent the DO Address that is integrated via the composition relationship on the Location node.

LocationAddress (DO)

BO RFQRequest/node LocationAddress represents an RFQRequest specific address of a location.

BusinessTransactionDocumentReference

BO RFQRequest/node BusinessTransactionDocumentReference represents a unique reference to another business transaction document or an item within this document which is directly involved in the same business process as the RFQRequest.

A RFQRequestBusinessTransactionDocumentReference can occur within specialisations such as the following: RequestForQuoteReference, which is a reference to a RequestForQuote in order to indicate that the RequestForQuote was created from the RFQRequest; BasePurchaseRequestReference, which is a PurchaseRequestReference is a reference to the PurchaseRequest in order to indicate that at least one of the RFQRequestRequestItem nodes was created with reference to one of the PurchaseRequestItem nodes; BasePurchasingContractReference, which is a BasePurchasingContractReference is a reference to the PurchasingContract in order to indicate that the RFQRequest was created to re-negotiate the PurchasingContract with the primal SupplierParty.

The structure elements located directly at node BusinessTransactionDocumentReference are defined by data type ProcurementDocumentBusinessTransactionDocumentReferenceElements, which is derived from data type BusinessTransactionDocumentReferenceElements. In certain implementations these may include the following: BusinessTransactionDocumentReference, BusinessTransactionDocumentRelationshipRoleCode.

BusinessTransactionDocumentReference is a reference, which may be unique, to the referred business transaction document. Furthermore, it may be possible to have a reference to a line item within the business transaction document. This element may be based on GDT BusinessTransactionDocumentReference.

BusinessTransactionDocumentRelationshipRoleCode is a coded representation of the role of a BusinessTransactionDocument in this relationship. This element may be based on GDT BusinessTransactionDocumentRelationshipRoleCode. The single value 1 (Predecessor) may be assigned.

In certain implementations of node BusinessTransactionDocumentReference, the following inbound aggregation relationships may exist. RequestForQuote may have a cardinality relationship of n:cn. PurchaseRequest may have a cardinality relationship of c:c. PurchasingContract may have a cardinality relationship of c:cn.

BusinessProcessVariantType

BO RFQRequest/node BusinessProcessVariantType. A procurement document BusinessProcessVariantType defines the character of a business process variant of the <BO>-Node. It represents a typical way of processing of a procurement document within a process component from a business point of view.

A ProcurementDocumentBusinessProcessVariantType can occur within the following specialisations: MainBusinessProcessVariantType; AdditionalBusinessProcessVariantType.

A Business Process Variant is configuration of a Process Component. A Business Process Variant may belong to exactly one process component.

A process component is a software package that realizes a business process and exposes its functionality as services. The functionality may contain business transactions. A process component may contain one or more semantically related business objects. A business object may belong to exactly one process component.

The structure elements located directly at node BusinessProcessVariantType are defined by data type ProcurementDocumentBusinessProcessVariantTypeElements. In certain implementations these elements may include the following: BusinessProcessVariantTypeCode, MainIndicator.

BusinessProcessVariantTypeCode is a coded representation of a business process variant type of a procurement document business process variant type. This element may be based on GDT BusinessProcessVariantTypeCode.

Restrictions with regards to BusinessProcessVariantTypeCode may exist as follows (in format RFQ Processing Code/Name/Definition): Code 153 (i.e., for Negotiating Long-Term Agreements [Main]), which is a variant of RFQ Processing which may enable the negotiation of Long-Term Agreements; Code 154 (i.e., for Negotiating Purchase Orders [Main]), which is a variant of RFQ Processing which may enable the negotiation of purchase orders and the creation of purchase orders based on the winning quotes; Code 155 (i.e., for Requesting Information [Main]), which is a variant of RFQ Processing which may enable the request for information; Code 156 (i.e., with Purchasing Contract Integration [Additional]), which this is a variant of RFQ Processing which is used for purchasing contract creation—new purchasing contracts may be negotiated and created, and existing purchasing contracts may be renegotiated and updated, based on the winning quotes.

MainIndicator specifies whether the current business process variant type is the main one or not. This element may be based on GDT Indicator, Qualifier Main.

Exactly one instance of the BusinessProcessVariantType may be allowed to be indicated as main.

AttachmentFolder (DO)

BO RFQRequest/node AttachmentFolder contains electronic documents of any type that relates to the RFQRequest.

For example, an attachment referred to with the AttachmentFolder can be a PDF document with technical specifications of the requested products.

TextCollection (DO)

BO RFQRequest/node TextCollection represents a collection of textual descriptions linked to the RFQRequest that support the bidding process For example, aTextCollection can contain a text that describes, for example, the conditions of participating.

AccessControlList (DO)

BO RFQRequest/node AccessControlList represents a list of access groups that have access to the entire procurement document during a validity period.

The AccessControlList may be used to control the access to procurement document instances.

Item

BO RFQRequest/node Item specifies the quantity, pricing specifications and delivery terms of a product or for a service that has been requested to be included in a RequestForQuote.

For the Item (compared to the information of the RFQRequest), deviating parties and locations may be defined. The Item may contain references to other business documents that are relevant for the item. Descriptions and/or attachments may also be specified for the item.

The structure elements located directly at node RFQRequestItem are defined by data type ProcurementDocumentItemElements. In certain implementations these elements may include the following: SystemAdministrativeData, ID, UUID, TypeCode, HierarchyRelationship, Description, DeliveryPeriod, GroupID, Quantity, QuantityTypeCode, TargetQuantity, TargetQuantityTypeCode, TargetAmount, Status.

SystemAdministrativeData specifies administrative data stored within the system. These data contain system users and time of change. This element may be based on GDT SystemAdministrativData.

ID is an identifier for the RFQRequestItem assigned by the BuyerParty. This element may be based on GDT BusinessTransactionDocumentItemID.

UUID is an identifier, which may be unique, of the RFQRequestItem for referencing purposes. This element may be based on GDT UUID.

TypeCode is the coded representation for the RequestForQuoteItem type a material item/service item/productcategory item/hierarchy item/Lot item. This element may be based on GDT BusinessTransactionDocumentItemTypeCode, values 018-Purchasing Material Item, 019-Purchasing Service Item, 021-Purchasing Hierarchy Item, 0??-Purchasing Lot Item, and/or 47-Purchasing Product Category Item. It may be optional HierarchyRelationship is the relationship between a subitem and a higher-level parent item in an item hierarchy. This element may be defined by GDT ProcurementDocumentItemHierarchyRelationship. It may be optional.

HierarchyRelationship sub-elements are defined by GDT ProcurementDocumentItemHierarchyRelationship. In certain implementations these may include: ParentItemUUID, TypeCode. ParentItemUUID is an identifier for the parent RFQRequestItem; this element may be based on GDT UUID. TypeCode is the coded representation of the type of hierarchical relationship between the subitem and its higher-level parent item; this element may be based on GDT BusinessTransactionDocumentItem-HierarchyRelationshipTypeCode, value 002-Group.

Description is a characterization of the item. This element may be based on GDT SHORT_description. It may be optional DeliveryPeriod is a representation of the delivery date for the requested products or timeframe for rendered services. In case that more than one ItemScheduleLine exists, this value may be an accumulated value calculated from the DeliveryPeriods of all ItemScheduleLines. It may be calculated as a period starting with the earliest start date to be found in the ItemScheduleLines and ending with the latest end date. This element may be based on GDT DateTimePeriod. It may be optional.

GroupID is a representation of a group of RFQRequestItems. All RFQRequestItems with the same GroupID value (not only within the same but across different RFQRequests) may represent one group; this group can for example be used to perform certain actions on all group members (on all RFQRequestItems belonging to the same group); RFQRequestItems may also be grouped together for the purpose of creating a RequestForQuote from a group of RFQRequestItems. This element may be based on GDT ProcurementDocumentItemGroupID. It may be optional.

Quantity is the quantity of material or service that is requested via the Item. 10 Each, for example. (In case that more than one ItemScheduleLine exists, this quantity may be calculated as the sum of quantities from all ItemScheduleLines). This element may be based on GDT Quantity. It may be optional.

QuantityTypeCode is a coded representation of a type of the quantity. This element may be based on GDT QuantityTypeCode. It may be optional.

TargetQuantity is the target quantity of a RFQRequestItem. This information may be derived from the Quantity information supplied in the RFQExecutionRequest (by the PurchasingContract for example). This element may be based on GDT Quantity. It may be optional.

TargetQuantityTypeCode is a coded representation of a type of the target quantity. This information may be derived from the QuantityTypeCode information supplied in the RFQExecutionRequest (by the PurchasingContract for example). This element may be based on GDT QuantityTypeCode. It may be optional.

TargetAmount is the target amount of an RFQRequestItem. This information may be derived from the Amount information supplied in the RFQExecutionRequest (by the PurchasingContract for example). This element may be based on GDT Amount. It may be optional.

Status contains information about the lifecycle of the RFQRequestItem and the results and prerequisites of its processing steps.

Status sub-elements are defined by data type ProcurementDocumentItemStatus. In certain implementations these may include the following: ActivationStatusCode, CancellationStatusCode, ClosureStatusCode.

ActivationStatusCode. Activation is a Boolean status variable that determines whether an RFQRequest item is involved in the processing of a RequestForQuote. The value 'Active' may be set as default when the item is instantiated. This element may be based on GDT ActivationStatusCode.

CancellationStatusCode. Cancellation is a Boolean status variable that describes whether the business transaction for an RFQRequest item is cancelled or not. This element may be based on GDT CancellationStatusCode, values 1—Not Cancelled and/or 4—-Cancelled.

ClosureStatusCode. Closure is a Boolean status variable that describes whether the business transaction for an RFQRequest item is closed or not. This element may be based on GDT ClosureStatusCode.

In certain implementations of node Item, the following composition relationships to subordinate nodes may exist: ItemProduct 275084 may have a cardinality relationship of 1:c; ItemParty 275090 may have a cardinality relationship of 1:cn; ItemLocation 275106 may have a cardinality relationship of 1:cn; ItemBusinessTransactionDocumentReference 275112 may have a cardinality relationship of 1:cn; ItemAttachmentFolder (DO) 275120 may have a cardinality relationship of 1:c; ItemTextCollection (DO) 275122 may have a cardinality relationship of 1:c; ItemScheduleLine 275074 may have a cardinality relationship of 1:cn.

In certain implementations of node Item, the following inbound aggregation relationships from BO RFQRequest/node Item may exist: ParentItem may have a cardinality relationship of c:cn, and indicates association to a RFQRequestRequestItem itself, which is the relationship between a sub item and a higher-level parent item in an item hierarchy. From a semantic point of view, items may contain other items, thus enabling item hierarchies to be mapped. The hierarchies may be mapped using the elements HierarchyRelationshipTypeCode and ParentItemID.

In certain implementations of node Item, the following inbound aggregation relationships from BO Identity may exist: CreationIdentity may have a cardinality relationship of 1:cn, and indicates the identity that created the procurement document; LastChangeIdentity may have a cardinality relationship of c:cn, and indicates the Identity that changed the procurement document in the last time.

In certain implementations of node Item, (specialisation) navigation associations may exist to the following nodes: Item, BusinessDocumentFlow, ItemParty, ItemLocation, ItemBusinessTransactionDocumentReference.

(Specialisation) navigation Associations to node Item may include: ChildItem may have a cardinality relationship of c:cn (implemented and create-enabled), and indicates a child item in an item hierarchy. This association may be necessary in order to create item hierarchies.

(Specialisation) navigation Associations to transformed object BusinessDocumentFlow may include: BusinessDocumentFlow may have a cardinality relationship of c:c, an association to the BusinessDocumentFlow which is a view on the set of all preceding and succeeding business (transaction) documents for the current procurement document item.

(Specialisation) navigation Associations to node ItemParty may include: RequestorItemParty may have a cardinality relationship of c:c, and indicates association to a Party which appears within the RequestorItemParty specialization; ProductRecipientItemParty may have a cardinality relationship of c:c, and indicates association to a Party which appears within the ProductRecipientItemParty specialization; ServicePerformerItemParty may have a cardinality relationship of c:c, and indicates association to a Party which appears within the ServicePerformerItemParty specialization; ResponsiblePurchasingUnitItemParty may have a cardinality relationship of c:c, and indicates association to a Party which appears within the ResponsiblePurchasingUnitItemParty specialization; BuyerItemParty may have a cardinality relationship of c:c, and indicates association to a Party which appears within the BuyerItemParty specialization.

(Specialisation) navigation Associations to node ItemLocation may include: ShipToItemLocation may have a cardinality relationship of c:c, and indicates association to a Location that appears within the ShipToItemLocation specialisation. ReceivingItemSite may have a cardinality relationship of c:c, and indicates association to a Location that appears within the ReceivingSite specialisation.

(Specialisation) navigation Associations to node ItemBusinessTransactionDocumentReference may include: ItemBasePurchaseRequestItemReference may have a cardinality relationship of c:c, and indicates association to a BusinessTransactionDocumentReference which appears within the ItemBasePurchaseRequestItemReference specialization; ItemBasePurchasingContractItemReference may have a cardinality relationship of c:c, and indicates association to a BusinessTransactionDocumentReference which appears within the ItemBasePurchasingContractItemReference specialization; ItemRequestForQuoteItemReference may have a cardinality relationship of c:cn, and indicates that Association to a BusinessTransactionDocumentReference which appears within the ItemRequestForQuoteItemReference specialisation.

In certain implementations of node Item, the following ESI actions (Enterprise Service Infrastructure) may be implemented: Activate, Deactivate, Close, Cancel, SetItemGroupAssignment, DiscardItemGroupAssignment, CreateRequestForQuote, CreateRequestForQuoteFromItemGroup.

Activate (S&AM action) activates a previously inactive RFQRequestItem.

Deactivate (S&AM action) deactivates a previously active RFQRequestItem.

Close (S&AM action) closes the RFQRequestItem and all succeeding follow-on documents which were created from it.

Cancel (S&AM action) cancels the RFQRequestItem and all succeeding follow-on documents which were created from it.

SetItemGroupAssignment assigns the RFQRequestItem to an group provided (as an action parameter). This action may set the value of the RFQRequestItem's GroupID element to the value provided (as an action parameter). The parameter structure of the SetItemGroupAssignment action may contain the following elements defined by data type ProcurementDocumentItemSetItemGroupAssignmentActionElements: GroupID, which is a representation of a group of RFQRequestItems; this element may be based on GDT ProcurementDocumentItemGroupID.

DiscardItemGroupAssignment removes the RFQRequestItem from the item group to which it is currently assigned. This action may removes the value stored in the GroupID of the RFQRequestItem.

CreateRequestForQuote creates a RequestForQuote from the selected RFQRequestItems. The data contained in the selected RFQRequestItems along with the underlying nodes (such as parties and schedule lines) may used to create a new RequestForQuote. This action may create a new RequestForQuote and creates a new RequestForQuoteItem for each selected RFQRequestItem; the data belonging to the RFQRequestItem and the underlying nodes may be copied over to the corresponding RequestForQuoteItem. The selected RFQRequestItems may belong to different RFQRequest instances, that is, this action may work across multiple instances of RFQRequest.

CreateRequestForQuoteFromItemGroup creates a RequestForQuote from all the RFQRequestItems which have the same GroupID as the selected RFQRequestItem. This action may create a new RequestForQuote and create a new RequestForQuoteItem for each RFQRequestItem in the system which has the same GroupID as the selected RFQRequestItem. The data directly belonging to the RFQRequestItem and the underlying nodes may be copied over to the corresponding RequestForQuoteItem. The RFQRequestItems may belong to different RFQRequest instances, that is, this action may work across multiple instances of RFQRequest.

In certain implementations of node Item a QueryByElements may be called. This provides a list of all RFQRequestItem according to the specified selection elements.

Query elements are defined by data type RFQRequestItemElementsQueryElements, which is derived from GDT ProcurementDocumentItemElementsQueryElements. In certain implementations these elements may include the following: ProcurementDocumentID, which may be based on GDT BusinessTransactionDocumentID and may be optional; ProcurementDocumentName, which may be based on GDT MEDIUM_Name and may be optional; SystemAdministrativeData, which may be based on GDT SystemAdministrativeData and may be optional; CreationBusinessPartnerCommonPersonNameGivenName, which may be based on GDT GivenName; CreationBusinessPartnerCommonPersonNameFamilyName, which may be based on GDT FamilyName; LastChangeBusinessPartnerCommonPersonNameGivenName, which may be based on GDT GivenName; LastChangeBusinessPartnerCommonPersonNameFamilyName, which may be based on GDT FamilyName; ID, which may be based on GDT BusinessTransactionDocumentItemID; DeliveryPeriod, which may be based on GDT DateTimePeriod and may be optional; ProcurementDocumentCurrencyCode, which may be based on GDT CurrencyCode and may be optional; ProcurementDocumentPartyBuyerPartyID, which may be based on GDT PartyPartyID and may be optional; ProcurementDocumentPartyRequestor PartyID, which may be based on GDT PartyPartyID and may be optional; ProcurementDocumentPartyProductRecipientPartyID, which may be based on GDT PartyPartyID and may be optional; ProcurementDocumentPartyBidderPartyID, which may be based on GDT PartyPartyID and may be optional; ProcurementDocumentPartyPortalProviderPartyID, which may be based on GDT PartyPartyID and may be optional; ProcurementDocumentBaseBusinessTransactionDocumentID, which may be based on GDT BusinessTransactionDocumentID and may be optional; Description, which may be based on GDT SHORT_Description and may be optional; ItemProductProductID, which may be based on GDT ProductID and may be optional; ItemProductProductTypeCode, which may be based on GDT ProductTypeCode and may be optional; ItemProductProductBidderID, which may be based on GDT PartyPartyID and may be optional; ItemProductProductCategoryInternalID, which may be based on GDT ProductCategoryInternalID and may be optional; ItemPartyRequestor PartyID, which may be based on GDT PartyPartyID and may be optional; ItemPartyProductRecipientPartyID, which may be based on GDT PartyPartyID and may be optional; ItemPartyResponsiblePurchasingUnitPartyID, which may be based on GDT PartyPartyID and may be optional; ItemPartyBuyerPartyID, which may be based on GDT PartyPartyID and may be optional; ItemPartyServicePerformerPartyID, which may be based on GDT PartyPartyID and may be optional; ItemLocationShipToLocationID, which may be based on GDT LocationID and may be optional; ItemBusinessTransactionDocumentReferencePurchasingContractReference, which may be based on GDT BusinessTransactionDocumentReference and may be optional; ItemBusinessTransactionDocumentReferencePurchaseRequestReference, which may be based on GDT BusinessTransactionDocumentReference and may be optional; ItemBusinessTransactionDocumentReferenceRequestForQuoteReference, which may be based on GDT BusinessTransactionDocumentReference and may be optional; GroupID, which may be based on GDT ProcurementDocumentItemGroupID and may be optional; ProcurementDocumentBusinessTransactionDocumentReferenceTypeCode, which may be based on GDT BusinessTransactionDocumentTypeCode and may be optional; Status, which may be optional.

Query element Status sub-elements may include: ActivationStatusCode, which may be based on GDT ActivationStatusCode; CancellationStatusCode, which may be based on GDT CancellationStatusCode; ClosureStatusCode, which may be based on GDT ClosureStatusCode. The above sub-elements may be optional.

ItemProduct

BO RFQRequest/node ItemProduct provides the identification, description and classification of the product of an Item.

The structure elements located directly at node RFQRequestItemProduct are defined by the GDT: ProcurementDocumentItemProductElements, that is derived from the GDT BusinessTransactionDocumentProductElements. In certain implementations these elements may include the following: ProductUUID, ProductID, ProductStandardID, ProductBidderID, ProductTypeCode, ProductCategoryUUID, ProductCategoryInternalID, ProductCategoryStandardID, ProductCatalogueReference.

ProductUUID is an identifier, which may be unique, for a product. This element may be based on GDT UUID. It may be optional.

ProductID is an identifier for a product. This element may be based on GDT ProductID. It may be optional.

ProductStandardID is a standardized identifier for this product, whose identification scheme is managed by an agency from the DE 3055 code list. This element may be based on GDT ProductStandardID.

ProductBidderID is an identifier for the BidderParty for this product. This element may be based on GDT ProductPartyID. It may be optional.

ProductTypeCode is a coded representation of the type of a product. This element may be based on GDT ProductTypeCode, values 1-Material and/or 2-Service Product. It may be optional.

ProductCategoryUUID is an identifier, which may be unique, for a product category. This element may be based on GDT UUID. It may be optional.

ProductCategoryInternalID is an identifier for a product category. This element may be based on GDT ProductCategoryInternalID.

ProductCategoryStandardID is a Standardized identifier for a product category, whereby the identification scheme used is managed by an agency from the code list DE 3055. This element may be based on GDT ProductCategoryStandardID. It may be optional.

ProductCatalogueReference specifies a reference to a catalog or to an object within a catalog. This element may be based on GDT CatalogueReference. It may be optional.

In certain implementations of node ItemProduct, the following inbound aggregation relationships may exist: Material may have a cardinality relationship of c:c. ServiceProduct may have a cardinality relationship of c:c. ProductCategoryHierarchyProductCategory may have a cardinality relationship of c:c, and indicates that the ItemProduct may represent a ProductCategoryHierarchyProductCategory that classifies the requested Material, ServiceProduct, or free text.

Node ItemProduct may reference a ProductCategory. If the node ItemProduct references a Product, the ProductCategory may be the one to which the Product is assigned. If not, a free text description may be specified and the ProductCategory may be chosen freely.

ItemParty

BO RFQRequest/node ItemParty represents a natural or legal person, organisation, organisational unit, or group that is involved in an Item in a PartyRole.

A RequestForQuoteItemParty may keep a reference to a business partner or one of its specialisations (for example, customer, supplier, employee).

An ItemParty may exist within specialisations such as the following. RequestorItemParty, which is the party that requests the procurement of materials and services. ProductRecipientItemParty, which is the party to which products are delivered or for which services are provided. ServicePerformerItemParty, which is a party that provides services; for a ServicePerformerItemParty, a PartyContactParty can be maintained. BuyerItemParty, which is a party that buys goods or services and on behalf of which the RFQRequest is created; an instance of the Business Object Company may be the BuyerParty; a BuyerParty may have a contact person; for a BuyerItemParty, a PartyContactParty may be maintained. ResponsiblePurchasingUnitItemParty, which is the party responsible for operational or strategic purchasing.

The structure elements located directly at node ItemParty are defined by data type ProcurementsDocumentItemPartyElements, which is derived from data type BusinessTransactionDocumentPartyElements. In certain implementations these elements may include the following: UUID, PartyID, PartyUUID, PartyTypeCode, RoleCategoryCode, RoleCode, AddressReference, DeterminationMethodCode.

UUID is an identifier, which may be unique, of the procurement document party for referencing purposes. This element may be based on GDT UUID.

PartyID is an identifier of the Party in this party role in the procurement document or the master data object. This element may be based on GDT PartyID. It may be optional.

PartyUUID is an identifier, which may be unique, for a business partner, the organisational center, or their specialisations. This element may be based on GDT UUID. It may be optional.

PartyTypeCode specifies the type of the business partner, organisational center, or their specialisations referenced with the element PartyUUID. This element may be based on GDT PartyTypeCode. It may be optional.

RoleCategoryCode specifies the party role category of the Party in the procurement document or the master data object. This element may be based on GDT PartyRoleCategoryCode. It may be optional.

RoleCode specifies the party role of the Party in the procurement document or the master data object. This element may be based on GDT PartyRoleCode. It may be optional.

AddressReference specifies a reference to the address of the Party. This element may be based on GDT PartyAddressReference. It may be optional.

DeterminationMethodCode is a coded representation of the determination method of the Party. This element may be based on GDT PartyDeterminationMethodCode. It may be optional.

An Item may contain exactly one Requestor Party. An Item may contain exactly one ProductRecipientParty. The ServicePerformerParty may be assigned to the Item node. An Item may contain exactly one ServicePerformerParty per related InvitedBidderParty.

In certain implementations of node ItemParty, the following composition relationships to subordinate nodes may exist: ItemPartyContactParty 275092 may have a cardinality relationship of 1:c; ItemPartyAddress (DO) 275098 may have a cardinality relationship of 1:c; ItemPartyRelationship 275096 may have a cardinality relationship of 1:cn.

In certain implementations of node ItemParty, the following inbound aggregation relationships from BO Party/Root Node may exist: Party may have a cardinality relationship of c:cn, and indicates that Referenced Party in Master Data.

In certain implementations of node ItemParty, navigation associations to node ItemPartyRelationship may exist as follows: ServicePerformerItemPartyRelationship may have a cardinality relationship of c:c, which is an Item party relationship that may occur in the ServicePerformerItemPartyRelationship specialization.

In certain implementations of node ItemParty, navigation associations to transformed object UsedAddress/Root Node may exist as follows: UsedAddress may have a cardinality relationship of c:c. The transformed object UsedAddress may represent a uniform way to access a party address of a procurement document whether it's a business partner address, an organization center address or an address specified within a procurement document.

For the address used for the ItemParty, this can be a referenced address of the master data object or The PartyAddress used via the composition relationship. It may be possible to determine which of the two applies by means of the PartyAddressHostTypeCode element The instance of the TO UsedAddress may represent this address. The association may be implemented:

In case 1, the node ID of the node in the master data object may be determined via the PartyTypeCode, PartyAddressUUID and PartyAddressHostTypeCode elements that has the composition relationship to the DO address that may be represented by the TO UsedAddress. Additionally, the TO UsedAddress in the implemented association may be provided with the following information:

First, that this is an example of a master data address. Second, the BusinessObjectTypeCode, BusinessObjectNodeTypeCode and Node ID of its own ItemParty node. These may be required in case changes to the TO UsedAddress take place. In this case, the master data address may be copied by the TO UsedAddress, the changes may take place to the copy, and a corresponding DO Address may be created at the ItemParty via the PartyAddress composition relationship.

In case 2, the TO UsedAddress may be informed of the BusinessObjectTypeCode, BusinessObjectNodeTypeCode and Node ID of its own ItemParty. Additionally, information may be provided that this is not an example of a referenced address. In this case, the TO UsedAddress may represent the DO address used at the ItemParty via the PartyAddress composition relationship.

ItemPartyContactParty

BO RFQRequest/node ItemPartyContactParty represents a natural person or organisational unit that can be contacted for the RFQRequestItemParty The structure elements located directly at node ItemPartyContactParty are defined by data type ProcurementDocumentPartyContactPartyElements, which is derived from data type ProcurementDocumentPartyElements. In certain implementations these elements may include the following: UUID, PartyID, PartyUUID, PartyTypeCode, AddressReference, DeterminationMethodCode.

UUID is an identifier, which may be unique, for a procurement document contact party for referencing purposes. This element may be based on GDT UUID.

PartyID is an identifier of the contact in this party role in the procurement document or the master data object. This element may be based on GDT PartyID. It may be optional.

PartyUUID is an identifier, which may be unique, of the contact in this party role in the procurement document or the master data object. This element may be based on GDT UUID. It may be optional.

PartyTypeCode is a coded representation of the type of the business partner, organisational center, or their specialisations referenced by the element PartyUUID. This element may be based on GDT BusinessObjectTypeCode. It may be optional.

AddressReference is a reference to the address of the Party. This element may be based on GDT PartyAddressReference. It may be optional.

DeterminationMethodCode is a coded representation of the determination method of the contact party. This element may be based on GDT PartyDeterminationMethodCode. It may be optional.

In certain implementations of node ItemPartyContactParty, the following composition relationships to subordinate nodes may exist: ItemPartyContactPartyAddress (DO) 275094 may have a cardinality relationship of 1:c.

In certain implementations of node ItemPartyContactParty, the following inbound aggregation relationships BOParty/Root Node may exist: Party may have a cardinality relationship of c:cn, and indicates that Referenced Contact Party in Master Data.

In certain implementations of node, navigation associations to transformed object UsedAddress/Root Node may exist as follows: UsedAddress may have a cardinality relationship of c:cn, and indicates that Address used for the Contact Party.

ItemPartyContactPartyAddress (DO)

BO RFQRequest/node ItemPartyContactPartyAddress represents a procurement document specific address of the ItemParty.

ItemPartyAddress (DO)

BO RFQRequest/node ItemPartyAddress represents a procurement document specific address of an item's party.

ItemPartyRelationship

BO RFQRequest/node ItemPartyRelationship represents a relationship between two parties of the procurement document.

An ItemPartyRelationship may occur in specializations such as the following: ServicePerformerItemPartyRelationship, which is an item relationship of a service performer item party that is working for a bidder party.

The structure elements located directly at node ItemPartyRelationship are defined by data type ProcurementDocumentItemPartyRelationshipElements. In certain implementations these elements may include the following: PartyReference, TypeCode.

PartyReference is a reference, which may be unique, to the party. This element may be based on GDT ObjectNodeReference.

TypeCode is a coded representation of the type of relationship between the party and referenced party. This element may be based on GDT PartyRelationshipTypeCode.

ItemPartyRelationship may have a cardinality relationship of 1:cn.

ItemLocation

BO RFQRequest/node ItemLocation represents a physical or logical place which is relevant for the bidding process. An example of a logical place can be the reception in an office building or gate 3 of a production plant.

An ItemLocation may occur in specializations such as the following: ShipToItemLocation, which is the place where have been delivered or where a service has been provided; ReceivingItemSite, which is the place where parts of a company is located.

Propagation may be used for Locations. That is, Locations that are specified at RFQRequest level may be used for all items if not otherwise specified on item level.

The structure elements located directly at node RFQRequestItemLocation are defined by data type ProcurementDocumentItemLocationElements, which is derived from data type BusinessTransactionDocumentItemLocationElements. In certain implementations these elements may include the following: UUID, LocationID, LocationUUID, RoleCategoryCode, RoleCode, AddressReference, DeterminationMethodCode.

UUID is an identifier, which may be unique, of the procurement document location for referencing purposes. This element may be based on GDT UUID.

LocationID is an identifier of the referenced Location. This element may be based on GDT LocationID. It may be optional.

LocationUUID is an identifier, which may be unique, of the Location referenced. This element may be based on GDT UUID. It may be optional.

RoleCategoryCode is a coded representation of the Location role category in the procurement document. This element may be based on GDT LocationRoleCategoryCode.

RoleCode is a coded representation of the Location role in the procurement document. This element may be based on GDT LocationRoleCode.

AddressReference is a reference to the address of the Party. This element may be based on GDT LocationAddressReference. It may be optional.

DeterminationMethodCode is a coded representation of the determination method of the Party. This element may be based on GDT LocationDeterminationMethodCode. It may be optional.

In certain implementations of node ItemLocation, the following composition relationships to subordinate nodes may exist: LocationAddress (DO) 275108 may have a cardinality relationship of 1:c.

In certain implementations of node ItemLocation, the following inbound aggregation relationships from BO Location may exist: Location may have a cardinality relationship of c:cn; PartyAddressInformation may have a cardinality relationship of c:cn.

In certain implementations of node ItemLocation, navigation associations may exist as follows: UsedAddress may have a cardinality relationship of c:c. The transformed object UsedAddress may represent a uniform way to access a location address of an RFQRequest (item) whether it's a business partner address, an organisation center address or an address specified within a procurement document.

This can be a referenced address of a master data object, or the address that is integrated via the composition relationship LocationAddress.

You can see which of the two cases applies by means of the AddressHostTypeCode element. The instance of the TO UsedAddress may represent this address. The association may be implemented:

In case 1) the elements AddressBusinessObjectTypeCode, AddressUUID and AddressHostTypeCode may be used to determine the Node ID of the node in the master data object, which may hold the composition relationship with DO Address, which may be represented by TO UsedAddress. Furthermore, the following information may be sent to the TO UsedAddress in the implemented address:

First, the fact that it is a master data address. Second, the BusinessObjectTypeCode, BusinessObjectNodeTypeCode and Node ID of the own ItemLocation node. This may be required if changes are made to the TO UsedAddress. In this case the TO UsedAddress may copy the master data address, the changes may be applied and the corresponding DO Address may be generated on the ItemLocation node via the composition relationship LocationAddress.

In case 2) the BusinessObjectTypeCode, BusinessObjectNodeTypeCode and Node ID of the own ItemLocation may be communicated to the TO UsedAddress. Whether or not it is a referenced address may also be included. In this case, the TO UsedAddress represents the DO Address that may be integrated via the composition relationship on the ItemLocation node.

ItemLocationAddress (DO)

BO RFQRequest/node ItemLocationAddress represents an RFQRequestItem specific address of a location.

Item BusinessTransactionDocumentReference

BO RFQRequest/node ItemBusinessTransactionDocumentReference represents a unique reference to an item of another business transaction document.

An ItemBusinessTransactionDocumentReference may occurs in specializations such as the following: ItemBasePurchaseRequestItemReference, which points to a PurchaseRequestItem in order to indicate that the RFQRequestItem was created with reference to the PurchaseRequestItem; Item- BasePurchasingContractItemReference, which points to a PurchasingContractItem in order to indicate that the RFQRequestItem was created with reference to the PurchasingContractItem; ItemRequestForQuoteItemReference, which points to a RequestForQuoteItem in order to indicate that the RequestforQuoteItem was created with reference to the RFQRequestItem.

The structure elements located directly at node RFQRequestItemBusinessTransactionDocumentReference are defined by data type ProcurementDocumentBusinessTransactionDocumentReferenceElements, which is derived from data type BusinessTransactionDocumentReferenceElements. In certain implementations these elements may include the following: BusinessTransactionDocumentReference, BusinessTransactionDocumentRelationshipRoleCode.

BusinessTransactionDocumentReference is a reference, which may be unique, to the referred business transaction document. Furthermore, it is possible to have a reference to a line item within the business transaction document. This element may be based on GDT BusinessTransactionDocumentReference.

BusinessTransactionDocumentRelationshipRoleCode is a coded representation of the role of a BusinessTransactionDocument in this relationship. This element may be based on GDT BusinessTransactionDocumentRelationshipRoleCode. The values 1 (Predecessor) or 2 (Successor) may be assigned.

In certain implementations of node ItemBusinessTransactionDocumentReference, the following inbound association relationships from BO RFQRequest/node ItemBusinessTransactionDocumentReference may exist: PurchaseRequestItem may have a cardinality relationship of c:c (this may be a Cross-DU Association), and indicates that an RFQRequestItem may refer to a Purchase RequestItem; PurchasingContractItem may have a cardinality relationship of c:cn (this may be a Cross-DU Association), and indicates that an RFQRequestItem may refer to a Purchasing ContractItem; RequestForQuoteItem may have a cardinality relationship of c:cn, and indicates that an RFQRequestItem may refer to one or more Request For Quote Items.

ItemAttachmentFolder (DO)

BO RFQRequest/node ItemAttachmentFolder contains electronic documents of any type that relates to the RFQRequest Item.

For example, an ItemAttachmentFolder can contain, a PDF document with details to the requested item.

ItemTextCollection (DO)

BO RFQRequest/node ItemTextCollection contains natural-language texts linked to the RFQRequestRequestItem.

For example, an ItemTextCollection can be added by the Requestor Party to detail the requested item.

ItemScheduleLine

BO RFQRequest/node ItemScheduleLine is a line containing the quantity and date of a delivery or performance schedule required by the buyer for the RequestForQuote.

From a procurement perspective, schedule lines may provide information about which quantities should be delivered until a certain point in time.

The structure elements located directly at node RFQRequestItemScheduleLine are defined by GDT ProcurementDocumentScheduleLineElements. In certain implementations these elements may include the following: ID, DeliveryPeriod, Quantity, QuantityTypeCode.

ID is an identifier for the ItemScheduleLine assigned by the BuyerParty. This element may be based on GDT BusinessTransactionDocumentItemScheduleLineID. It may be optional.

DeliveryPeriod specifies the delivery date for the confirmed products or timeframe for rendered services. This element may be based on GDT UPPEROPEN_LOCALNORMALISED_DateTimePeriod. It may be optional.

Quantity is the quantity of material or service that is confirmed via the Item. E.g. 10 Each. This element may be based on GDT Quantity. It may be optional.

QuantityTypeCode is a coded representation of a type of quantity in procurement document item schedule line. This element may be based on GDT QuantityTypeCode. It may be optional.

A RFQRequestItem may contain exactly one ItemScheduleLine. The ItemScheduleLines node may be exclusive of items of type product category.

Message Type(s)

FIG. 276 illustrates one example logical configuration of RFQExecutionCancellationRequestMessage message 276000. Specifically, this figure depicts the arrangement and hierarchy of various components such as one or more levels of packages, entities, and datatypes, shown here as 276000-276014. As described above, packages may be used to represent hierarchy levels. Entities are discrete business elements that are used during a business transaction. Data types are used to type object entities and interfaces with a structure. For example, RFQExecutionCancellationRequestMessage message 276000 includes, among other things, RFQRequest 276004. Accordingly, heterogeneous applications may communicate using this consistent message configured as such.

FIG. 277 illustrates one example logical configuration of RFQExecutionConfirmationMessage message 277000. Specifically, this figure depicts the arrangement and hierarchy of various components such as one or more levels of packages, entities, and datatypes, shown here as 277000-277018. As described above, packages may be used to represent hierarchy levels. Entities are discrete business elements that are used during a business transaction. Data types are used to type object entities and interfaces with a structure. For example, RFQExecutionConfirmationMessage message 277000 includes, among other things, RFQRequest 277004. Accordingly, heterogeneous applications may communicate using this consistent message configured as such.

FIGS. 278-1 through 278-8 illustrate one example logical configuration of RFQExecutionExecutionRequestMessage message 278020. Specifically, this figure depicts the arrangement and hierarchy of various components such as one or more levels of packages, entities, and datatypes, shown here as 278020-278124. As described above, packages may be used to represent hierarchy levels. Entities are discrete business elements that are used during a business transaction. Data types are used to type object entities and interfaces with a structure. For example, RFQExecutionExecutionRequestMessage message 278020 includes, among other things, RFQRequest 278024. Accordingly, heterogeneous applications may communicate using this consistent message configured as such.

FIGS. 279-1 through 279-2 illustrate one example logical configuration of RFQExecutionCancellationRequestMessage message 279000. Specifically, this figure depicts the arrangement and hierarchy of various components such as one or more levels of packages, entities, and datatypes, shown here as 279000-280092. As described above, packages may be used to represent hierarchy levels. Entities are discrete business elements that are used during a business transaction. Data types are used to type object entities and interfaces with a structure. For example, RFQExecutionCancellationRequestMessage message 280000 includes, among other things, RFQRequest 279014. Accordingly, heterogeneous applications may communicate using this consistent message configured as such.

FIGS. 280-1 through 280-3 illustrate one example logical configuration of RFQExecutionConfirmationMessage message 280000. Specifically, this figure depicts the arrangement and hierarchy of various components such as one or more levels of packages, entities, and datatypes, shown here as 280000-277018. As described above, packages may be used to represent hierarchy levels. Entities are discrete business elements that are used during a business transaction. Data types are used to type object entities and interfaces with a structure. For example, RFQExecutionConfirmationMessage message 280000 includes, among other things, RFQRequest 280014. Accordingly, heterogeneous applications may communicate using this consistent message configured as such.

FIGS. 281-1 through 281-22 illustrate one example logical configuration of RFQExecutionExecutionRequestMessage message 281000. Specifically, this figure depicts the arrangement and hierarchy of various components such as one or more levels of packages, entities, and datatypes, shown here as 281000-281570. As described above, packages may be used to represent hierarchy levels. Entities are discrete business elements that are used during a business transaction. Data types are used to type object entities and interfaces with a structure. For example, RFQExecutionExecutionRequestMessage message 281000 includes, among other things, RFQRequest 281014. Accordingly, heterogeneous applications may communicate using this consistent message configured as such.

RFQExecutionRequest Message Types and Their Signatures

The message types RFQExecutionRequest, RFQExecutionCancellationRequest and RFQExecutionConfirmation is based on the processes, in which the execution of the bid invitation for required goods or services can be requested.

Message Type(s)

The RFQExecutionRequest message is the request to carry out the RFQ process. The structure of the RFQExecutionRequest message type is specified by the RFQExecutionRequestMessage data type. The execution of a RFQ process contains the creation of a request for a bid invitation. The RFQExecutionRequest message contains parts of the BusinessObject RFQRequest and is implemented by the sending process component PurchasingProcessing.

The RFQExecutionConfirmation message is a confirmation of the execution or end of the RFQ process. The RFQExecutionConfirmation message confirms the successful creation of a request for a bid invitation and communicates the close of individual items or the entire request.

The RFQExecutionCancellationRequest message is the request to cancel the RFQ process. The structure of the RFQExecutionCancellationRequest message type is specified by the RFQExecutionCancellationRequestMessage data type.

RFQExecutionRequestMessage

The message data type RFQExecutionRequestMessage contains: the RFQRequest object contained in the business document, and business information relevant for sending a business document in a message. It contains the following packages: MessageHeader and RFQ.

The RFQExecutionRequestMessage data type thus provides the structure for the RFQExecutionRequest message type and the operations based on this.

If a definition or GDT for an element is not given, the element can be defined by an element of the same name in other business objects. For example, the definition can be derived from that of similarly named entities of the entity that contains it, or by other entities having the same name that are defined elsewhere.

MessageHeader Package

A MessageHeader package groups business information relevant for sending a business document in a message. It contains the entity: MessageHeader.

A MessageHeader groups together business information from the point of view of the sending application for business document identification in a message. It is of the type GDT: BusinessDocumentMessageHeader whereby the following elements of the GDT are used: ID. ID is the business documentID of sending business application which generate the message (GDT: BusinessDocumentMessageID).

RFQRequest Package

The RFQRequest package groups the RFQExecutionRequest together with its packages. It contains the packages: ProductInformation, Party, Location, Attachment, Description and Item.

The RFQRequest package contains the elements: BaseBusinessTransactionDocumentID, BaseBusinessTransactionDocumentUUID, BaseBusinessTransactionDocumentTypeCode, ReconciliationPeriodCounterValue, Name, CurrencyCode, FollowUpObjectTypeCode, TotalTargetAmount and ValidityPeriod.

BaseBusinessTransactionDocumentID is the unique reference for the object that forms the basis for the RFQ assigned by the requirement system, and can be of type GDT: BusinessTransactionDocumentID. BaseBusinessTransactionDocumentUUID—Universal unique alternative identifier of the RFQRequest for referencing purposes, and can be of type CDT: UUID).

BaseBusinessTransactionTypeCode is the object type on which the RFQ is based, and can be of type GDT: BaseBusinessTransactionDocumentTypeCode). ReconciliationPeriodCounterValue is a counter for reconciliation periods, and can be of type CDT: CounterValue).

Name can be of type GDT: MEDIUM_Name. CurrencyCode can be of type GDT: CurrencyCode. FollowUpObjectTypeCode is a coded representation of the type of the followup object that occurs in business transactions, and can be of type GTD ObjectTypeCode).

TotalTargetAmount can be of type CDT Amount. ValidityPeriod can be of type GDT Upperopen_Global_DateTimePeriod.

The ProductInformation package groups the product category. It contains the entity ProductCategory. The ProductCategory is of type GDT: BusinessTransactionDocumentProductCategory.

The Party package groups together all involved parties. It contains the following entities: BuyerParty, Requestor Party, ProductRecipientParty, BidderParty and PortalProviderParty. The BuyerParty is of the GDT type: BusinessTransactionDocumentParty. The Requestor Party is of type GDT: BusinessTransactionDocumentParty. The ProductRecipientParty is of type GDT: BusinessTransactionDocumentParty. The BidderParty is of type GDT: BusinessTransactionDocumentParty. The PortalProviderParty is of the GDT type: BusinessTransactionDocumentParty.

The Location-package groups together all participating locations. It contains the entities: ShipToLocation; ReceivingSite and ContractReleaseAuthorisedLocation. The ShipToLocation is of type GDT: BusinessTransactionDocumentShipToLocation. The ReceivingSite is of type GDT: BusinessTransactionDocumentLocation. The ContractReleaseAuthorisedLocation is of type GDT: BusinessTransactionDocumentLocation.

The Attachment package groups together attachments. It contains the following entity AttachmentFolder. An AttachmentFolder is a Folder for a document of any type that is related to the transmitted message. The AttachmentFolder is of type GDT: AttachmentFolder.

The Description package groups together text descriptions. It contains the following entity TextCollection. A TextCollection is a collection of texts related to the transmitted message. The TextCollection is of type GDT: TextCollection.

The RFQItem package groups the RFQExecutionRequestItem together along with its packages. It contains the packages: ItemProductInformation, ItemParty, ItemLocation, ItemAttachment, ItemDescription and ItemScheduleLine. The RFQItem contains the following elements: BaseBusinessTransactionDocumentItemID, BaseBusinessTransactionDocumentItemUUID, BaseBusinessTransactionDocumentItemTypeCode, TargetAmount, GroupCategoryName and HierarchyRelationship. BaseBusinessTransactionDocumentItemID is the unique identifier for the item object that forms the basis for the RFQRequest assigned by the requirement system, and can be of type GDT: BusinessTransactionDocumentItemID. BaseBusinessTransactionDocumentItemUUID is a universal unique alternative identifier of the item for referencing purposes, and can be of type CDT: UUID. BaseBusinessTransactionDocumentItemTypeCode can be of type GDT: BusinessTransactionDocumentItemTypeCode. TargetAmount can be of type CDT: Amount. GroupCategoryName can be of type CDT: LANGUAGEINDEPENDENT_MEDIUM_Name.

The ItemProductInformation package groups together all information for identification, description and classification of a product. The ProductInformation package contains the entities: Product, ProductCategory and BuyerProductCatalogueReference. The Product is of type GDT: BusinessTransactionDocumentProduct. The ProductCategory is of type GDT: BusinessTransactionDocumentProductCategory. The BuyerProductCatalogueReference is of type GDT: CatalogueReference.

The ItemParty package groups together all participating parties. The ItemParty package contains the entities: BuyerParty, Requestor Party, ProductRecipientParty, ServicePerformerParty and ResponsiblePurchasingUnitParty. BuyerParty is of type GDT: BusinessTransactionDocumentParty. Requestor Party is of type GDT: BusinessTransactionDocumentParty. The ProductRecipientParty is of type GDT: BusinessTransactionDocumentParty. The ServicePerformerParty is of type GDT: BusinessTransactionDocumentParty. The ResponsiblePurchasingUnitParty is of type GDT: BusinessTransactionDocumentParty.

The ItemLocation package groups together all participating locations on item. It contains the entities ShipToLocation and ReceivingSite. The ShipToLocation is of type GDT: BusinessTransactionDocumentShipToLocation. The ReceivingSite is of type GDT: BusinessTransactionDocumentLocation.

The ItemAttachment Package can be similar to the Location Package.

The ItemDescription package groups together text descriptions. It contains the following entities: Description and TextCollection. A Description is a natural language text visible for all parties. The Description is of type GDT: SHORT_Description. A TextCollection is a collection of texts related to the transmitted item. The TextCollection is of type GDT: TextCollection.

The ItemScheduleLine package contains all quantities and dates of a performance schedule. It contains the entity ScheduleLine. The ScheduleLine is of type GDT: BusinessTransactionDocumentScheduleLine.

RFQExecutionConfirmationMessage

The message data type RFQExecutionConfirmationMessage contains: the RFQRequest object contained in the business document, and business information relevant for sending a business document in a message. It contains the following packages: MessageHeader and RFQRequest. The RFQExecutionConfirmationMessage data type thus provides the structure for the RFQExecutionConfirmation message type and the operations based on this.

A MessageHeader package groups business information relevant for sending a business document in a message. It contains the entity: MessageHeader. A MessageHeader groups together business information from the point of view of the sending application for business document identification in a message.

The RFQRequest package groups the RFQExecutionConfirmation together with its packages. It contains the package Item.

RFQRequest

The RFQRequest package contains the elements: BaseBusinessTransactionDocumentID, BaseBusinessTransactionDocumentTypeCode, ID, UUID, ReconciliationPeriodCounterValue and CompletedIndicator.

BaseBusinessTransactionDocumentID is the unique reference for the object that forms the basis for the RFQ assigned by the requirement system, and can be of type GDT: BusinessTransactionDocumentID. BaseBusinessTransactionTypeCode is the object type on which the RFQ is based, and can be of type GDT: BaseBusinessTransactionDocumentTypeCode. ID can be of type GDT: BusinessTransactionDocumentID. UUID is the Universal unique alternative identifier of the RFQRequest for referencing purposes, and can be of type CDT: UUID. ReconciliationPeriodCounterValue is a counter for reconciliation periods, and can be of type CDT: CounterValue. Indicator that the bidding process has been completed and can be of type GDT: Indicator.

The Item package groups the RFQExecutionConfirmationItem. The RFQExecutionConfirmation-Item contains the elements: BaseBusinessTransactionDocumentItemID, ID, UUID and CompletedIndicator. BaseBusinessTransactionDocumentItemID is the unique reference for the object item that forms the basis for the RFQRequest assigned by the requirement system, and can be of type GDT: BusinessTransactionDocumentItemID. ID can be of type GDT: BusinessTransactionDocumentItemID. UUID is the universal unique alternative identifier of the RFQRequestItem for referencing purposes, and can be of type CDT: UUID. CompletedIndicator is the indicator that the bidding process for this item has been completed, and can be of type GDT: Indicator.

RFQExecutionCancellationRequestMessage

The message data type RFQExecutionCancellationRequestMessage contains: the RFQRequest object contained in the business document, and business information relevant for sending a business document in a message. It contains the following packages: MessageHeader and RFQRequest. The RFQExecutionCancellationRequestMessage data type thus provides the structure for the RFQExecutionCancellationRequest message type and the operations based on this.

A MessageHeader package groups business information relevant for sending a business document in a message. It contains the entity MessageHeader. A MessageHeader groups together business information from the point of view of the sending application for business document identification in a message.

The RFQRequest Package groups the RFQExecutionCancellationRequest. The RFQRequest package contains the elements: BaseBusinessTransactionDocumentID, BaseBusinessTransactionDocumentTypeCode, ID and ReconciliationPeriodCounterValue. BaseBusinessTransactionDocumentID is the unique reference for the object that forms the basis for the RFQRequest assigned by the requirement system, and can be of type GDT: BusinessTransactionDocumentID. The BaseBusinessTransactionTypeCode is the object type on which the RFQ is based, and can be of type GDT: BaseBusinessTransactionDocumentTypeCode. ID can be of type GDT: BusinessTransactionDocumentID. ReconciliationPeriodCounterValue is a counter for reconciliation periods, and can be of type CDT: CounterValue.

SupplierQuote Business Object

FIG. 282 illustrates one example of a SupplierQuote business object model 282000. Specifically, this model depicts interactions among various hierarchical components of the SupplierQuote, as well as external components that interact with the SupplierQuote (shown here as 282002 through 282024 and 282096 through 282138).

A SupplierQuote Business Object is a response to a request for quote in which a bidder offers to sell goods and services to a buyer according to the requested criteria. The quotation criteria are typically specified by the buyer in the RequestForQuote. Thus a SupplierQuote is typically created in response to a RequestForQuote. In the Business Process Application Platform it is currently only possible to create a SupplierQuote with a reference to a RequestForQuote. The business object SupplierQuote is derived from the Procurement Document Template. The Business Object SupplierQuote is part of the Process Component RFQ Processing and the Local Deployment Unit RFQ Processing. A SupplierQuote contains detail information about the corresponding request and the offer including involved parties, cash discounts and delivery terms, price specifications. Data for the comparison of the SupplierQuote (SupplierQuote Evaluation). If defined in the corresponding RequestForQuote, control data of the bidding process If defined in the corresponding RequestForQuote, data for the SupplierQuote Evaluation (BiddingCrite-riaAssessment). If defined in the corresponding RequestForQuote, multiple currencies as suggestions for the quote currency. If defined in the corresponding RequestForQuote, additional questions to the bidder as well as the answers The Business Object SupplierQuote is represented by the root node SupplierQuote 282026 and its associations. The Business Object is involved in the Process Integration Models which include RFQ Processing_Purchase Order Processing, RFQ Processing_Opportunity/Customer Quote Processing at Supplier, and RFQ Processing_Purchasing Contract Processing.

Service Interface Quote Processing In (B2B) is the RFQProcessingQuoteProcessingIn. The interface Quote Processing In is part of the following Process Interaction Model:

RFQ Processing_Opportunity/Customer Quote Processing at Supplier which refers to the service inter-face Quote Processing In is a grouping of operations which create or update a SupplierQuote based on the information in the received Customer Quote notification. Maintain Supplier Quote (B2B) is also known as the RFQProcessingQuoteProcessingIn.MaintainSupplierQuote. The operation Maintain Supplier Quote creates or updates a SupplierQuote on the basis of the received Customer Quote which was sent in response to the buyer's invitation to submit a quotation. This operation is based on the message type QuoteNotification (Derived from the Business Object SupplierQuote).

Service Interface Purchasing Contract Out is also known as RFQProcessingPurchasingContractOut. The interface Purchasing Contract Out is part of the following Process Interaction Model:

RFQ Processing_Purchasing Contract Processing which is the service interface Purchasing Contract Out is a grouping of operations which request the creation or update of a PurchasingContract based on the winning SupplierQuote.

Request Contract from Winning Quote (A2A) also known as the RFQProcessingPurchasingContrac-tOut.RequestContractFromWinningQuote. The operation Request Contract from Winning Quote requests the creation or update of a PurchasingContract based on the awarded respective winning SupplierQuote. This operation is based on the message type PurchasingContractRequest (Derived from the Business Object PurchasingContract).

Service Interface Quote Award Notification Out (A2A) also known as the RFQProcessingQuoteAwardNo-tification-Out. The interface Quote Award Notification Out is part of the following Process Interaction Model: RFQ Processing_Purchase Order Processing. The service interface Quote Award-Notification Out is a grouping of operations which notify the PurchaseOrder about the winning SupplierQuote.

Request Purchase Order from Winning Quote (A2A) also known as the RFQProcessingQuoteAwardNoti-fication-Out.RequestPurchaseOrderFromWinningQuote is the operation Request Purchase Order from Winning Quote notifies the PurchaseOrder about the awarded respective winning SupplierQuote.

This operation is based on the message type SupplierQuoteAwardNotification (Derived from the Business Object SupplierQuote). Service Interface Quote Processing Out (B2B) is also known as the RFQProc-essingQuoteProcessingOut. The interface Quote Processing Out is part of the following Process Interac-tion Model: RFQ Processing_Opportunity/Customer Quote Processing at Supplier. The service Quote Processing Out is a grouping of operations which are used to request a SupplierQuote revision and finally communicate the quotation acceptance.

Request Quote Change (B2B) is also known as the RFQProcessingQuoteProcessingOut.RequestQuoteChange is the operation Request Quote Change requests the change of the customer quote. It returns the quotation to the bidder for revision. In doing so, the bidder is asked to revise the quotation and resubmit it; otherwise the buyer can not consider it again. This operation for message output is based on the message type RFQChangeRequest (Derived from the Business Object RequestForQuote).

Notify of Quote Award (B2B) also known as the RFQProcessingQuoteProcessingOut.NotifyOfQuoteAward. The operation Notify of Quote Award notifies the bidder either about the SupplierQuote items for which the bidder's quotation has been awarded including the extend of the award or about a rejection if the bidder's quotation was not successful. This operation for message output is based on the message type RFQResultNotification (Derived from the Business Object Request-ForQuote). The operation for form output is based on message type FormRFQResultNotification (Derived from Business Object RequestForQuote). The SupplierQuote (Root) is a response to a RequestForQuote (RFQ). The response contains detailed information about the materials or services offered, prices, deliv-ery dates, payment terms and conditions of business. The offer may legally bind the supplier company for a certain period of time. Furthermore it contains identification and administrative information of the re-sponse. The elements located directly at the node SupplierQuote (Root Node) are defined by the data type: ProcurementDocumentElements which include SystemAdministrativeData, UUID, ID, Proc-essTypeCode, ReceiptDateTime, DataOriginTypeCode, Name, CurrencyCode, TotalNetAmount, Time-Settings, SupplierQuoteBindingDateTime, FollowUpObjectTypeCode, TotalTargetAmount, ValidityPeriod, Status, SupplierQuoteLifecycleStatusCode, SubmissionStatusCode, SupplierQuoteAwardingStatusCode, ConsistencyStatusCode, ClosureStatusCode, and SupplierQuotePreparationStatusCode.

A SystemAdministrativeData is a GDT of type SystemAdministrativeData which is an administrative data stored within the system and is obligatory. These data contain system users and time of change. A UUID is a GDT of type UUID which is a universal unique alternative identifier of the SupplierQuote for referencing purposes and is obligatory.

ID is a GDT of type BusinessTransactionDocumentIID which is an identifier for the SupplierQuote as-signed by the BuyerParty and is obligatory.

A ProcessingTypeCode is a GDT of type BusinessTransactionDocumentProcessingTypeCode and is Obligatory. The ProcessingTypeCode is the coded representation for the processing type of the SupplierQuote. A ReceiptDateTime is a GDT of type LOCALNORMALISED_DateTime which is a point in time at which a SupplierQuote has been receipt by the BuyerParty and is optional. The field is used par-ticularly in case a SupplierQuote has been submitted e.g. by fax or email and is entered into the applica-tion as a surrogate bid.

A DataOriginTypeCode is a GDT of type ProcurementDocumentDataOriginTypeCode, Restrictions: 1 (Manual data entry), 2 (B2B message)) which is coded representation of the data origin type of the pro-curement document and is optional. A Name is a GDT of type MEDIUM_Name which is designation or title of the SupplierQuote and is optional.

A CurrencyCode is a GDT of type CurrencyCode which is the CurrencyCode is the coded representation of the SupplierQuote currency and is optional.

A TotalNetAmount is a GDT of type Amount, Qualifier: Net which is the total net amount of the SupplierQuote. The amount is calculated by the system as the sum of NetAmount of all items and is op-tional.

TimeSettings contain all dates and times which are relevant for the bidding process. It contains the following elements that are defined by the IDT: SupplierQuoteTimeSettings that is derived from the IDT: Pro-curementDocumentTimeSettings.

A SupplierQuoteBindingDateTime is a GDT of type LOCALNORMALISED_DateTime which is a deadline up to which the BidderParty is bound by the submitted SupplierQuote and is optional.

The FollowUpObjectTypeCode is a GDT of type ObjectTypeCode, Restrictions: 001 (PurchaseOrder), 110 (PurchasingContract)) is the coded representation of the expected follow-up object of the Supplier-Quote and is optional.

A TotalTargetAmount is a GDT of type Amount, Qualifier: Target which is the total target amount of the SupplierQuote. The field is used particularly in case the SupplierQuote is part of a contract negotiation process and is optional. A ValidityPeriod is a GDT of type UPPEROPEN_GLOBAL_DateTimePeriod which is a period of validity of the follow-up document PurchasingContract and is optional. A Status contains status information about the lifecycle of the SupplierQuote and the results and prerequisites of its processing steps and is obligatory. It contains the following elements that are defined by the data type: SupplierQuoteStatus that is derived from the data type: ProcurementDocumentStatusElements. A Sup-plierQuoteLifecycleStatusCode is a GDT of type SupplierQuoteLifecycleStatusCode which is the status variable indicates the status of the SupplierQuote in its Lifecycle including the submission and awarding process and is obligatory. A SubmissionStatusCode is a GDT of type SubmissionStatusCode and is obligatory. This status variable indicates the status of the SupplierQuote submission process. A SupplierQuoteAwardingStatusCode is a GDT of type SupplierQuoteAwardingStatusCode and is obligatory. This status variable indicates the status of the SupplierQuote awarding process. A ConsistencyStatus-Code is a GDT of type ConsistencyStatusCode, Restrictions: 2 (Inconsistent), 3 (Consistent)) and is Obligatory. This variable describes the status of the Business Object after a check process. It may be either consistent or inconsistent, depending upon whether the check process returned error messages or not. An ApprovalStatusCode is a GDT of type ApprovalStatusCode and is Obligatory.

This variable indicates the status of the SupplierQuote's awarding approval process. A ClosureStatus-Code is a GDT of type ClosureStatusCode and is obligatory. This variable describes whether the busi-ness transaction for a SupplierQuote is closed or not. A SupplierQuotePreparationStatusCode is a GDT of type SupplierQuotePreparationStatusCode and is Obligatory. This variable is an overall status vari-able, which contains information of the status variables Closure and Lifecycle.

A Party 282038 has a cardinality of 1:n. A Location 282060 has a cardinality of 1:cn. A DeliveryTerms 282062 has a cardinality of 1:c. A CashDiscountTerms 282064 has a cardinality of 1:c. A PriceSpecifica-tion 282066 has a cardinality of 1:cn. A BusinessTransactionDocumentReference 282078 has a cardinal-ity of 1:n. A BiddingRules 282084 has a cardinality of 1:c. A BiddingCurrency has a cardinality of 1:cn. A BiddingCriteriaAssessment has a cardinality of 1:cn. A BidderPartyQuestion has a cardinality of 1:cn. A Evaluation has a cardinality of 1:cn. A BusinessProcessVariantType 282072 1:cn. An AttachmentFolder 282086 has a cardinality of: 1:c. A TextCollection 282088 1:c. A ControlledOutputRequest 282076 has a cardinality of 1:c. An AccessControlList 282090 has a cardinality of 1:1. A Statistics 282074 has a cardinality of 1:c. An Item 282028 has a cardinality of 1:cn. There may be a number of Inbound Aggrega-tion Relationships including CreationIdentity and LastChangeIdentity. From business object Identity/node Root, CreationIdentity has a cardinality of 1:cn. Identity that created the procurement document. A LastChangeIdentity has a cardinality of c:cn that changed the procurement document in the last time.

The SupplierQuote has subtype associations to the following nodes:

To transformed object BusinessDocumentFlow/node Root, BusinessDocumentFlow has a cardinality of c:c. Association to the BusinessDocumentFlow which is a view on the set of all preceding and succeeding business (transaction) documents for the current procurement document. To the node SupplierQuoteItem, PurchasingHierarchyItem has a cardinality of c:cn. A purchasing hierarchy item is an item which is semantically associated with the root; other items with a parent item in an item hierarchy are subordinate items.

To the node Party, BidderParty has a cardinality of c:c which is association to a party which appears within the BidderParty specialisation. A BuyerParty has a cardinality of c:c which is an association to a party which appears within the BuyerParty specialisation. A ProductRecipientParty has a cardinality of c:c which is an association to a party which appears within the ProductRecipientParty specialisation.

To the node Location, ShipToLocation has a cardinality of c:c and is an association to a location which appears within the ShipToLocation specialisation.

A ReceivingSite has a cardinality of c:c which is an association to a location which appears within the ReceivingSite specialisation. A ContractReleaseAuthorisedLocation has a cardinality of c:cn in which an association to a location which appears within the ContractReleaseAuthorisedLocation specialization.

To the node BusinessTransactionDocumentReference, BaseRequestForQuoteReference has a cardinal-ity of c:c which an association to a business transaction document reference which appears within the BaseRequestForQuote specialisation. A CustomerQuoteReference has a cardinality of c:c in which an association to a business transaction document reference which appears within the SupplierQuote specialisation. To the node BusinessProcessVariantType, MainBusinessProcessVariantType has a cardinal-ity of c:c which an association to a business process variant type which is the main business process variant type. The CurrencyCode is the leading coded representation of the SupplierQuote currency; all other CurrencyCodes (e.g. an Amount), except for the ones used in the pricing conditions, are read-only and can not differ from the CurrencyCode.

The ID may not be changed after creation. The UUID is determined by the service provider and may not be changed. The SystemAdministrativeData is determined by the service provider and may not be changed. The ProcessingTypeCode may not be changed after the creation. The TotalNetAmount is used in case the follow-on document is a PurchaseOrder or unknown. The SupplierQuoteBindingDateTime is defined in the corresponding RequestForQuote and may not bechangeable within the SupplierQuote. The FollowUpBusinessTransactionDocumentTypeCode is defined in the corresponding RequestForQuote and may not be changeable within the SupplierQuote. The TotalTargetAmount is used in case the follow-up document is a PurchasingContract. The ValidityPeriod is defined in the corresponding RequestForQuote and may not be changeable within the SupplierQuote. The field is used in case the follow-up document is a PurchasingContract. A complete SupplierQuote may contain at least one RequestForQuoteReference and exactly one BidderParty reference.

Submit S&AM Action is used to submit the SupplierQuote to the buyer party. The action is allowed during the submission period as defined in the corresponding RequestForQuote and if the corresponding RequestForQuote has not been cancelled. In addition, if the SupplierQuote is already submitted, the de-fined bidding rules may allow the bidder to change a submitted SupplierQuote.

Withdraw (S&AM Action) is used to withdraw an already submitted SupplierQuote. The action is intended to be called by the bidder party. The action is allowed only during the submission period as defined in the corresponding RequestForQuote and if the corresponding RequestForQuote has not been cancelled. In addition, if the SupplierQuote is already submitted, the defined bidding rules allow the bidder to change a submitted SupplierQuote. SendBack (S&AM Action) is used to return an already submit-ted SupplierQuote to the bidder party, because it needs further clarification or has to be reworked. The action is intended to be called by the buyer party. The action is allowed during the submission period as defined in the corresponding RequestForQuote and if the corresponding RequestForQuote has not been cancelled. Decline (S&AM Action) is used to decline the submitted SupplierQuote. A declined SupplierQuote can not be awarded later on. The action is intended to be called by the buyer party. The action is allowed when the opening date as defined in the corresponding RequestForQuote has been reached. Accept (S&AM Action) is used to accept the submitted SupplierQuote and start the approval process. This action is intended to be called by the buyer party. The action is allowed when the opening date as defined in the corresponding RequestForQuote has been reached. In addition, the bidder may already be maintained as a supplier. SubmitForApproval (S&AM Action) is used to submit the document to the approval process for the acceptance of the SupplierQuote and decides if an approval is necessary or not. SendBackForRevision (S&AM Action) is used to break the approval process and return the SupplierQuote to the buyer party for revision. WithdrawFromApproval: (S&AM Action) is used to withdraw the approval of the acceptance of the SupplierQuote. Reject (S&AM Action) is used to reject the acceptance of the SupplierQuote, which is in an approval process. Approve (S&AM Action) is used to approve the acceptance of the SupplierQuote, which is in an approval process. Award (S&AM Action) is used to award a SupplierQuote after a successful approval. The action should not be called manually by a user (from the UI).

Close: (S&AM Action) is used to permanently close the SupplierQuote and prevent any further changes. The action may not be called manually by a user (from the UI). The action is called when the corresponding RequestForQuote is closed or cancelled. Due to this reason this action is allowed.

InitiatePurchaseOrder is used to initiate the follow on document PurchaseOrder. The action is allowed when the requested follow on document of the SupplierQuote is a PurchaseOrder and the SupplierQuote has already been awarded and is not closed. InitiatePurchasingContract is used to initiate the follow on document PurchasingContract. This may be an update or creation of a PurchasingContract. The action is allowed when the requested follow on document of the SupplierQuote is a PurchasingContract and the SupplierQuote has already been awarded and is not closed.

CheckConsistency (S&AM Action) is used to check whether the SupplierQuote is complete, consistent and error-free. In addition to other possible preconditions, ESI actions that correspond to S&AM actions are allowed only if the related S&AM actions are allowed.

QueryByBidderParty provides a list of all SupplierQuotes which are assigned to a specific bidder party or contact person. The list can be limited to SupplierQuotes of a specific lifecycle status, name, product category id or and date. Additionally the possibility is provided to limit the list to quotes that have been changed or created within a specific time frame. Main business case is the support of a bidder work cen-tre that presents all created SupplierQuotes of that bidder. The query elements are defined by the data type: ProcurementDocumentBidderPartyQueryElements which includes SystemAdministrativeData, Crea-tionBusinessPartnerCommonPersonNameGivenName, CreationBusinessPartnerCommonPersonName-FamilyName, LastChangeBusinessPartnerCommonPersonNameGivenName, LastChangeBusinessPartnerCommonPersonNameFamilyName, SupplierQuoteLifecycleStatusCode, Name, RequestForQuote_ProcessingTypeCode, RequestForQuote_SubmissionPeriod BusinessTransactionDocumen-tReferenceRequestForQuoteID, PartyBidderPartyID, PartyBidderPartyContactID, and Request-For-Quote_ProductCategoryInternalID. A SystemAdministrativeData is a GDT of type SystemAdministra-tiveData and is optional. A CreationBusinessPartnerCommonPersonNameGivenName is a GDT of type Given- Name and is optional. A CreationBusinessPartnerCommonPersonNameFamilyName is a GDT of type FamilyName and is optional. A LastChange-BusinessPartnerCommonPersonNameGivenName is a GDT of type GivenName and is optional. A LastChangeBusiness-PartnerCommonPersonNameFamily-Name is a GDT of type FamilyName and is optional. A SupplierQuoteLifecycleSta-tusCode is a GDT of type SupplierQuoteLifecycleStatus-Code which refers to the Lifecycle status value of the status variable Lifecycle of the SupplierQuote Root node and is optional. A Name is a GDT of type MEDIUM_Name and is optional. A RequestForQuote_ProcessingTypeCode is a GDT of type BusinessTransactionDocument-Processing-TypeCode and is optional. ProcessingTypeCode of the corre-sponding RequestForQuote Root node the SupplierQuotes are created for.

A RequestForQuote_SubmissionPeriod is a GDT of type UPPEROPEN_LOCALNORMALISED_DateTimePeriod and is optional. The SubmissionPeriod of the corresponding RequestForQuote Root node the SupplierQuotes are created for the following; Business-TransactionDocumentRefer-enceRequestForQuoteID, PartyBidderPartyID, PartyBidder-PartyContactID, and RequestForQuote_ProductCatego-ryInternalID. A BusinessTransactionDocumen-tReferenceRequestForQuoteID is a GDT of type Busi-nessTransactionDocumentID. The Reference to the corre-sponding RequestForQuote Root node. A PartyBidderPartyID is a GDT of type PartyPartyID. The Par-tyID of the BidderParty the SupplierQuote belongs to. A PartyBidderPartyContactID is a GDT of type PartyPartyID and is optional. The ContactID of the contact person of the BidderParty the SupplierQuote belongs to.

A requestForQuote_ProductCategoryInternalID is a GDT of type ProductCategoryInternalID. The Pro-ductCategory-InternalID of the RequestForQuote Root node the Supplier-Quote belongs to.

QueryByRFQ provides a list of all SupplierQuotes which belong to a given RequestForQuote. The list can be limited additionally by SupplierQuote life cycle status values. Main business case: Display of all SupplierQuotes of a displayed RequestForQuote in the strategic purchaser's work centre. The query ele-ments are defined by the data type: Procure-mentDocumentRFQQueryElements which includes RequestForQuote_ID and SupplierQuoteLifecycleStatus-Code. A RequestForQuote_ID is a is of GDT type Busi-nessTransactionDocumentID and is optional. The ID of at least one RequestForQuote Root node the SupplierQuotes are queried for. A SupplierQuoteLifecycleStatusCode is a GDT of type SupplierQuoteLifecycleStatusCode. The Lifecycle status value of the status variable Lifecycle of the Supplier-Quote Root node.

QueryByIdentification provides a list of all Supplier-Quotes which can be identified by the given search criteria. The query elements are defined by the data type: Procure-mentDocumentIdentificationQueryEle-ments which include ID, Name, SystemAdministrativeData, CreationBusiness-PartnerCommonPerson-NameGivenName, CreationBusi-nessPartnerCommonPersonNameFamilyName, LastChangeBusinessPartnerCom-monPersonNameGivenName, and LastChangeBusinessPart-nerCommonPersonNameFam-ilyName. An ID is a GDT of type BusinessTransactionDocumentID and is optional. A Name is a GDT of type MEDIUM_Name and is optional. A SystemAdministrativeData is a GDT of type SystemAdmin-istra-tiveData and is optional. A CreationBusinessPartner-CommonPersonNameGivenName is a GDT of type Given-Name and is optional. A CreationBusinessPartnerCommonPersonNameFamilyName is a GDT of type FamilyName and is optional. A LastChange-BusinessPartnerCommonPersonNameGivenName is a GDT of type GivenName and is optional. A LastChangeBusiness-PartnerCommonPersonNameFamily-Name is a GDT of type FamilyName and is optional.

QueryByProductCategory provides a list of all Supplier-Quotes which can be identified by the given search criteria and are defined by the data type: ProcurementDocumentPro-ductCategoryQueryElements which include ProductCatego-ryInternalID. A ProductCategoryInternalID is a GDT of type ProductCategoryInter-nalID and is optional. The ProductCat-egoryInternalID can be either the ProductCategoryInternalID of the corresponding RequestForQuote Root node the Sup-plierQuotes are created for or the ProductCategory-Inter-nalID of a SupplierQuote Item ItemProduct node. A Submis-sionStatusCode is a GDT of type Sub-missionStatusCode and is optional.

The Party is a natural or legal person, organization, orga-nizational unit, or group that is involved in a SupplierQuote in a PartyRole. A party can be a BusinessPartner in the speciali-sation Employee, Supplier or BusinessPartner an Organisa-tionalCentre in the specialisation Company. A Supplier-QuoteParty may keep a reference to a business partner or one of its special-izations (for example, customer, supplier, em-ployee) or keep a reference to one of the following specializations of an organizational unit:

Company

A SupplierQuote Party may exist without reference to a business partner or an organizational unit. This would be a Casual Party, which is a party without reference to the master data in the system. The exter-nal identifier and the description are contained in the business document. Casual Party is, for example, used for groupware replication (Outlook). The e-mail address and the description of a party are used by the groupware when replicating, for example, e-mails or appoint-ments.

A Party can occur within the following complete and dis-joint specialisations:

BidderParty: A BidderParty is a party that bids for products and/or services. The BidderParty may also have a contact person, who creates and submits the quotation. The contact person is a BusinessPartner of the specialisation Business-Partner. A BuyerParty is the party on behalf of which the corresponding RequestForQuote has been created. A Buyer-Party may have a contact person.

ProductRecipientParty: A ProductRecipientParty is the party to which products are delivered or for which services are provided. The Party contains the following elements that are defined by the data type: ProcurementDocumentPartyEle-ments that is derived from the data type: BusinessTransac-tionDocumentPartyElements which include UUID, PartyID, PartyUUID, PartyTypeCode, RoleCategoryCode, RoleCode, AddressReference, and DeterminationMethodCode. A UUID is a GDT of type UUID in which the UUID is needed to access this node external as reference and is optional. A PartyID is a GDT of type PartyID (without additional com-ponents, such as schemeAgencyID)) is an identifier of the SupplierQuoteParty in this PartyRole in the business docu-ment or the master data object and is optional. If a business partner or organizational unit are referenced, the attribute contains their identifiers. If an unidentified identifier is, for example, entered by the user, the attribute contains this iden-tifier. A PartyUUID is a GDT of type UUID which is a unique identifier for a business partner, the organizational unit, or their specializations and is optional. A PartyTypeCode is a GDT of type BusinessObjectType-Code, Restrictions: 154 (Company), 167 (Employee). 266 (Supplier)) and refers to the business partner, organizational unit, or their specializations referenced by the attribute PartyUUID and is optional. A Role-CategoryCode is a GDT of type PartyRoleCategory-Code, Restrictions: 1 (BuyerParty), 5 (ProductRecipi-entParty), 16 (BidderParty)) in which the party Role Category of the SupplierQuoteParty in the business document or the master data object and is optional. A RoleCode is a GDT of type PartyRoleCode in which the party Role of the SupplierQuoteParty in the business document or the master data object and is optional. An AddressReference is a GDT of type PartyAddressReference which reference to the address of the Party and is optional. A DeterminationMethodCode is a GDT of type PartyDeterminationMethod-Code which is coded representation of the determination method of the Party and is optional. A party could be a person, organization, or group within or outside of the company. Inheritance is used for all parties, i.e. parties that are specified at SupplierQuote level are used for all items if not otherwise specified on item level. A PartyContactParty 282040 has a cardinality of 1:c. A PartyAddress 282056 has a cardinality of 1:c. There are a number of Inbound Aggregation Relationships including Party. From business object Party/Node Root, Party has a cardinality of c:cn.

To transformed object UsedAddress/Node Root, a UsedAddress has a cardinality of c:c. The trans-formed object UsedAddress represents a uniform way to access a party address of a procurement document whether it's a business partner address, a organization centre address or an address specified within a procurement document. For the address used for the Party this can be a referenced address of the master data object, or the PartyAddress used via the composition relationship. It is possible to determine which of the two applies by means of the PartyAddressHostTypeCode element The instance of the TO UsedAddress represents this address. The association is implemented.

For example, the node ID of the node in the master data object is determined via the PartyTypeCode, PartyAddressUUID and PartyAddressHostTypeCode elements that has the composition relationship to the DO address that is to be represented by the TO UsedAddress. Additionally, the TO UsedAddress in the implemented association is provided with the following information:

That this is an example of a master data address

BusinessObjectTypeCode, BusinessObjectNodeTypeCode and Node ID of its own ItemParty node. These are required in case changes to the TO UsedAddress take place. In this case, the master data address is copied by the TO UsedAddress, the changes take place to the copy, and a corresponding DO Address is created at the ItemParty via the PartyAddress composition relationship.

For example, the TO UsedAddress is informed of the BusinessObjectTypeCode, BusinessObjectNodeTypeCode and Node ID of its own ItemParty. Additionally, information is provided that this is not an example of a referenced address. In this case, the TO UsedAddress represents the DO address used at the ItemParty via the PartyAddress composition relationship.

If the PartyUUID exists, the PartyTypeCode may also exist. Parties may only be referenced via the Transformed Object Party, that represent at least one of the following business objects: Company, FunctionalUnit, ReportingLineUnit, Supplier, Customer, Employee, BusinessPartner. A SupplierQuote can contain a BidderParty, a BuyerParty and a ProductRecipientParty. A SupplierQuote may contain a BidderParty. The ProductRecipientParty is valid for all Item nodes. If ProductRecipientParty's differ be-tween Item nodes, the ProductRecipientParty has to be specified on each item level.

The BuyerParty and ProductRecipientParty are defined in the corresponding Business Object RequestForQuote and may not be changeable in the SupplierQuote.

A SupplierQuotePartyContactParty is a natural person or organizational unit that can be contacted for the SupplierQuoteParty. The contact may be a contact person or, for example, a secretary's office. Usually, communication data for the contact is available. The ContactParty contains the following elements that are defined by the data type: ProcurementDocumentPartyContactPartyElements that is derived from the data type: ProcurementDocumentPartyElements which include UUID, PartyID, PartyUUID, PartyTypeCode, AddressReference, and DeterminationMethodCode. A UUID is a GDT of type UUID which is a globally unique identifier for a contact and is optional. A PartyID is a GDT of type PartyID which is an identifier of the contact in this PartyRole in the business document or the master data object and is optional. If a business partner or organizational unit is referenced, the attribute contains their identi-fiers. A PartyUUID is a GDT of type UUID which is a unique identifier of the contact in this PartyRole in the business document or the master data object and is optional. A PartyTypeCode is a GDT of type BusinessObjectTypeCode, Restrictions: 147 (Business Partner), 167 (Employee)) and refers to the type of the business partner, organizational unit, or their specializations referenced by the attribute Contac-tUUID and is optional. An AddressReference is a GDT of type PartyAddressReference and references to the address of the Party which is optional. A DeterminationMethodCode is a GDT of type PartyDeterminationMethodCode which is coded representation of the determination method of the contact party and is optional. A PartyContactPartyAddress (DO) 282042 has a cardinality of 1:c.

There may be a number Inbound Aggregation Relationships including Party. From business object Party/Node Root, Party has a cardinality of c:cn as Referenced Contact Party in Master Data. To transformed object UsedAddress/Node Root, UsedAddress has a cardinality of c:cn as Address used for the Contact Party.

There may be one of the associations to the address. This address is a master data address of the busi-ness partner, organizational unit, or their specializations referenced by PartyUUID.

A PartyContactPartyAddress (DO) is a Supplier Quote specific address of the Party.

A PartyAddress (DO) is a PartyAddress is a SupplierQuote specific address of a party.

The Location is a physical place, which is relevant for the SupplierQuote.

A Location can occur within the specialisations of ShipToLocation and ReceivingSite. A ShipToLocation is the place where the products will be delivered or where a service will be provided. A ReceivingSite is the place where parts of a company are located. A ContractReleaseAuthorisedLocation is a place which is authorised to make releases against the follow-up document PurchasingContract. The elements lo-cated directly at the node Location are defined by the data type: ProcurementDocumentLocationElements that is derived from the data type BusinessTransactionDocumentLocationElements which include UUID, LocationID, LocationUUID, RoleCategoryCode, RoleCode, AddressReference, and DeterminationMethod-Code. A UUID is a GDT of type UUID and is a globally unique identifier of the procurement document location for referencing purposes. A LocationID is a GDT of type LocationID which is an identifier of the referenced Location and is optional. A LocationUUID is a GDT of type UUID which is a globally unique identifier of the Location referenced and is optional. A RoleCategoryCode is a GDT of type LocationRole-CategoryCode which is a coded representation of the Location role category in the procurement docu-ment and is optional. A RoleCode is a GDT of type LocationRoleCode which is a coded representation of the Location role in the procurement document and is optional. An AddressReference is a GDT of type Location-AddressReference in reference to the address of the Location and is optional. A Determination-MethodCode is a GDT of type LocationDeterminationMethodCode which is coded representation of the determination method of the Location and is optional. A LocationAddress (DO) 282058 has a cardinality of 1:c.

There may be a number of Inbound Aggregation Relationships including Location. From the business object Location, Location has a cardinality of c:cn. A PartyAddressInformation has a cardinality of c:cn.

A UsedAddress has a cardinality of c:c. The transformed object UsedAddress represents a uniform way to access a location address of a procurement document whether it's a business partner address, a organization center address or an address specified within a procurement document.

This can be a referenced address of a master data object or the address that is integrated via the compo-sition relationship LocationAddress. You can see which of the two cases applies by looking at the element AddressHostTypeCode. The instance of the TO UsedAddress represents this address. The association is implemented. For example, the elements AddressBusinessObjectTypeCode, AddressUUID and Ad-dressHostTypeCode are used to determine the Node ID of the node in the master data object, which holds the composition relationship with DO Address, which is to be represented by TO UsedAddress. Furthermore, the following information is sent to the TO UsedAddress in the implemented address: the fact that it is a master data address; the BusinessObject-TypeCode, BusinessObjectNodeTypeCode and Node ID of the own ItemLocation node. This are required if changes are made to the TO UsedAddress. In this case the TO UsedAddress copies the master data address, the changes are applied and the corresponding DO Address is generated on the Item-Location node via the composition relationship LocationAddress.

For example, the BusinessObjectTypeCode, BusinessObjectNodeTypeCode and Node ID of the own ItemLocation are communicated to the TO UsedAddress. Whether or not it is a referenced address may also be included. In this case, the TO UsedAddress represents the DO Address that is integrated via the compo-sition relationship on the ItemLocation node. A logical place for example can be the reception in an office building or gate 3 of a production plant. Propagation is used for all Locations, i.e. Locations that are specified at ProcurementDocument level are used for all items if not otherwise specified on item level.

In some implementations, the Location is defined in the corresponding Business Object RequestForQuote and may not be changeable in the SupplierQuote. The ShipToLocation and ReceivingSite are allowed in case the follow-up document is a PurchaseOrder. The ContractReleaseAuthorisedLocation is allowed in case the follow-up document is a PurchasingContract.

LocationAddress (DO) is a LocationAddress is a SupplierQuote specific address of a location. The Deliv-eryTerms are conditions and agreements formulated at the time of the bidding that apply for the execution of the delivery and the necessary associated services and activities. The DeliveryTerms contains the following elements that are defined by the data type: ProcurementDocumentDeliveryTermsElements that is derived from the data type: BusinessTransactionDocumentDeliveryTermsElements which include Inco-terms and MaximumLeadTimeDuration.

Incoterms is a is of GDT type Incoterms which refer to the standard contract formulas for the terms of delivery and is optional.

A MaximumLeadTimeDuration is a GDT of type Duration, Qualifier: LeadTime which is the Maximum lead time from the time of the order to the receipt of the delivery and is optional. Inheritance is used for Delive-ryTerms, i.e. Incoterms that are specified at SupplierQuote level are used for all items if not otherwise specified on item level. The inheritance only takes DeliveryTerms into account for material items; they are ignored for all other items.

CashDiscountTerms (DO) is the CashDiscountTerms are conditions and agreements that apply for the payment of the SupplierQuote. The CashDiscountTerms include for example multilevel payment condi-tions, like 14 days 3%, 30 days 2%, 45 days net.

PriceSpecification (DO) is the PriceSpecification contains price calculation detail information, such as discounts or surcharges, offered by the bidder. If the corresponding RequestForQuote already contains PriceSpecifications as proposal for the bidder, these PriceSpecifications are taken over. PriceSpecifica-tions are allowed only for SupplierQuotes with follow-up document PurchasingContract.

BusinessTransactionDocumentReference is the BusinessTransactionDocumentReference is a unique reference to another business transaction document or an item within this document which is related to the SupplierQuote. A BusinessTransactionDocumentReference can occur within the following complete and non-disjoint specialisations: BaseRequestForQuoteReference is a reference to the RequestForQuote which is the basis of the Supplier Quote. The RequestForQuote holds all necessary information to initiate the bidding process. The RequestForQuote was issued in the previous process step. A Customer-QuoteReference is a reference to a customer quotation this SupplierQuote is based on. The Supplier-QuoteBusinessTransactionDocumentReference contains the following elements that are defined by the data type: ProcurementDocumentBusinessTransactionDocumentReferenceElements that is derived from the data type: BusinessTransactionDocumentReferenceElements which include BusinessTransactionDocumentReference and BusinessTransactionDocumentRelationshipRoleCode. A BusinessTransactionDocumentReference is a GDT of type BusinessTransactionDocumentReference which is a unique reference to the referred business transaction document and is optional. Furthermore, it is possible to have a reference to a line item within the business transaction document. A BusinessTransactionDocu-mentRelationshipRoleCode is a GDT of type BusinessTransactionDocumentRelationshipRoleCode, Re-strictions: 1 (Predecessor)) which is coded representation of the role of a BusinessTransactionDocument in this relationship and is optional. An ActualValues 282082 has a cardinality of 1:c.

There are a number of Inbound Aggregation Relationships including SupplierQuote. From the business object RequestForQuote, RequestForQuote has a cardinality of c:cn. A SupplierQuote may refer to a RequestForQuote. A SupplierQuote may contain a BaseRequestForQuoteReference.

BiddingRules are conditions which control or restrict the bidding process. The BiddingRules contain the following elements that are defined by the data type: ProcurementDocumentBiddingRulesElements which include PriceDetailLevelCode, QuantityChangeAllowedIndicator, SubmittedSupplierQuoteChangeAllow-edIndicator, UnplannedItemPermissionCode, and BidOnAllItemsRequiredIndicator.

A PriceDetailLevelCode is a GDT of type PriceDetailLevelCode which is the PriceDetailLevelCode is a coded representation of the requested detailed price information for a RequestForQuote and is optional. For example, the purchaser can request simple prices, complex prices (discounts scale price) or no price information.

A QuantityChangeAllowedIndicator is a GDT of type Indicator, Qualifier: ChangeAllowed which is the QuantityChangeAllowedIndicator which specifies whether the BidderParty is allowed to enter in the Sup-plierQuote a quantity other than the requested quantity and is optional. SubmittedSupplierQuote-ChangeAllowedIndicator is a GDT of type Indicator, Qualifier: ChangeAllowed and is obligatory. The SubmittedSupplierQuoteChangeAllowedIndicator specifies whether the BidderParty is allowed to change a submitted SupplierQuote. An UnplannedItemPermissionCode is a GDT of type UnplannedItemPermis-sionCode, Restrictions: 01 (Not Allowed), 03 (Allowed)) and is optional.

The UnplannedItemPermissionCode specifies whether the BidderParty's SupplierQuote is allowed to contain own items with additional quotations.

A BidOnAllItemsRequiredIndicator is a GDT of type Indicator. Qualifier: Required and is obligatory.

The BidOnAllItemsRequiredIndicator specifies whether the BidderParty has to quote for all items. These rules affect the type of the information requested in the corresponding BusinessObject Request-ForQuote. For example price information details (no price, simple price, or complex prices)

Additional information that can be displayed in the SupplierQuote (for example weighting information)

Additional functions that are available in the SupplierQuote (for example, add new items)

The changeability of fields (for example the quantity requested)

Additional checks (for example, that quotes on all items in the corresponding BusinessObject RequestForQuote are expected). The BiddingRules are defined in the corresponding Business Object RequestForQuote and are not changeable in the SupplierQuote.

A BiddingCurrency is a currency that is available in a bidding process. The BiddingCurrency contains the following elements that are defined by the data type: ProcurementDocumentBiddingCurrencyElements. The SupplierQuote has to be submitted in one of the predefined currencies. The currency chosen on the SupplierQuote's root node level is valid for all items of the SupplierQuote.

For contract negotiations, the currency on the SupplierQuote's root and item nodes cannot be changed. However, the currency can be changed in the pricing conditions. The BiddingCurrency is defined in the corresponding Business Object RequestForQuote and is not changeable in the SupplierQuote. The cur-rency of the corresponding Business Object RequestForQuote is always one of the currencies contained in BiddingCurrency.

The BiddingCriteriaAssessment is a valuation function or weighting factor. These are assigned to BidderQuestion or fields of a root node. The BiddingCriteriaAssessment contains the following elements that are defined by the data type: ProcurementDocumentWeightingElements. A valuation function calcu-lates a value from given valuation criteria (field or attribute value). There are currently four types of valua-tion functions: linear, stepladder, fixed, and manual. The weighting factor is a percentage, by which a valuation value is multiplied to give it greater or less influence on the overall score. The valuation func-tions and weighting factors are defined in the corresponding Business Object RequestForQuote. The BiddingCriteriaAssessment node is also required in the SupplierQuote. This is because the bidding proc-ess may require the weighting information to be visible to the bidder. Additionally, the purchaser stores manual valuation values per SupplierQuote.

The BiddingCriteriaAssessment contains currency of the quotation that is weighted with 60% by using a linear valuation function. In addition, the selected payment condition is weighted with 40% by using a manual valuation function. The weighting entries in the BiddingCriteriaAssessment node are defined in the corresponding Business Object RequestForQuote BiddingCriteriaAssessment and are not change-able in the SupplierQuote. Only the manual valuations can be added in the BiddingCriteriaAssessment node.

A BidderPartyQuestion is a request for additional information from the bidder. It appears in the form of question and answer. A BidderPartyQuestion refers to specific characteristics at root or item node level, and can be incorporated into the bidding process. The BidderPartyQuestion contains the following elements that are defined by the data type: ProcurementDocumentBidderPartyQuestionElements. The BidderPartyQuestion is used to gather additional information from the bidder. Based on the RequestForQuoteBidderPartyQuestion in the corresponding Business Object RequestForQuote it can be Free Text, Multiple choice, or Amounts, quantities, dates, and times. The questions in the BidderPartyQuestion node are defined in the corresponding RequestForQuoteBidderPartyQuestion node and may not be changeable in the SupplierQuote.

The Evaluation is the consolidated and selected information to compare the SupplierQuote with other SupplierQuotes submitted to the same RequestForQuote. An Evaluation contains a valuation criteria and the corresponding result of the valuation function needed for the valuation of the SupplierQuote which includes all characteristics of a SupplierQuote that are used to determine the winning SupplierQuote, the results of the predefined weighting functions, and the aggregation at all hierarchy levels. In addition, the Evaluation forms the basis for a holistic comparison of different SupplierQuotes. The Evaluation are defined by the IDT of type ProcurementDocumentEvaluationElements. The intention of this node is to allow a complete award decision at document, hierarchy, and item level through the selection and consolidation of evaluation criteria. The node is aggregated at runtime and contains the evaluation criteria. These can be enriched with the specified weighting factors, valuation values, and scores of each valuated item field. The node can aggregate these scores at hierarchy level. Within the element FieldReferenceName the optional attribute for the language code representation may not be used.

A BusinessProcessVariantType is a procurement document BusinessProcessVariantType defines the character of a business process variant of the SupplierQuote-Node. It represents a typical way of proc-essing of a procurement document within a process component from a business point of view. A ProcurementDocumentBusinessProcessVariantType can occur within MainBusinessProcessVariantType and AdditionalBusinessProcessVariantType. A Business Process Variant is configuration of a Process Component. A Business Process Variant belongs exactly to one process component. A process compo-nent is a software package that realizes a business process and exposes its functionality as services. The functionality contains business transactions. A process component contains one or more semantically related business objects. A business object belongs to exactly one process component. The elements located directly at the node ProcurementDocumentBusinessProcessVariantType are defined by the data type: ProcurementDocumentBusinessProcessVariantTypeElements which includes BusinessProcessVariantTypeCode and a MainIndicator. A BusinessProcessVariantTypeCode is a GDT of type BusinessProcessVariantTypeCode. A BusinessProcessVariantTypeCode is a coded representation of a business process variant type of a procurement document business process variant type. A MainIndica-tor is a GDT of type Indicator, Qualifier: Main and is an indicator that specifies whether the current busi-ness process variant type is the main one or not.

Only one of the instances of the BusinessProcessVariantType is allowed to be indicated as main. An AttachmentFolder (DO) is the AttachmentFolder is a document of any type that relates to the SupplierQuote. For Example: An AttachmentFolder can contain for example a PDF document with the general terms and conditions of the BidderParty. A TextCollection (DO) is the TextCollection is a natural language text relating to the SupplierQuote. For Example: A TextCollection can be for example an ac-knowledgement for the business transaction or an advertising text.

A ControlledOutputRequest (DO) is a controller of output requests and processed output requests related to the SupplierQuote. Several output channels are supported for sending out documents. A Controlled Output Request supports the output to several output channels. Possible output channels are print, email, fax, or XML messaging. The ControlledOutputRequest is used to display the output history of the SupplierQuote. In addition it is used to define output channel and bidder specific parameters.

An AccessControlList (DO) is a list of access groups that have access to the entire procurement document during a validity period. The AccessControlList is used to control the access to procurement document instances. The Statistics comprise statistical information of a SupplierQuote. The Statistics con-tains the following elements that are defined by the data type: ProcurementDocumentStatisticsElements which include IncludedRequestedSupplierQuoteItemNumberValue and IncludedUnplannedSupplierQuoteItemNumberValue. An IncludedRequestedSupplierQuoteItemNumberValue is a GDT of type NumberValue which is the number of SupplierQuote items that are included in the quote and have been requested in the corresponding RequestForQuote and is optional. An IncludedUnplannedSupplierQuoteItemNumberValue is a GDT of type NumberValue which refer to the number of SupplierQuote items that are included in the quote and have been added by the Bidder although they are not requested in the corresponding RequestForQuote.

An Item specifies information about products or services tendered by the corresponding Business Object RequestForQuote. For the Item (compared to the information of the SupplierQuote), deviating parties and delivery terms can be defined. The Item can contain references to other business documents that are relevant for the item. Notes and/or attachments can also be specified for the item. An Item contains de-tailed information about a particular product or service, quantities, pricing conditions, delivery dates. The Item contains the following elements that are defined by the data type: ProcurementDocumentItemElements.

A SystemAdministrativeData is a GDT of type SystemAdministrativeData which is administrative data stored within the system and is obligatory. These data contain system users and time of change.

An UUID is a GDT of type UUID which is a universal unique alternative identifier of the SupplierQuote Item for referencing purposes and is obligatory.

An ID is a GDT of type BusinessTransactionDocumentItemID which is an identifier for the SupplierQuote Item assigned by the BuyerParty and is optional.

A TypeCode is a GDT of type BusinessTransactionDocumentItemTypeCode, Restrictions: 018 (Purchasing Material Item 282030), 019 (Purchasing Service Item 282032), 021 (Purchasing Hierarchy Item 282034), 048 (Purchasing Lot Item 282036), 047 (Purchasing Product Category Item)) and is optional. The TypeCode is the coded representation of the SupplierQuoteItem type which can be a usual SupplierQuoteItem, a ProductCategoryItem, a HierarchyItem or a LotItem. A HierarchyRelationship is the relationship between a subitem and a higher-level parent item in an item hierarchy. It contains the following elements that are defined by the IDT of type ProcurementDocumentItemHierarchyRelationship and is optional. A ParentItemUUID is a GDT of type UUID which is universally unique identifier for the parent SupplierQuoteItem and is obligatory. A TypeCode is a GDT of type BusinessTransactionDocumentItem-HierarchyRelationshipTypeCode, Restrictions: 02 (Group) in which the TypeCode is the coded represen-tation of the type of hierarchical relationship between the subitem and its higher-level SupplierQuote par-ent item and is obligatory. A Description is a GDT of type SHORT_Description where the description is the textual description of the item usually the name of the product and is obligatory. A Quantity is a GDT of type Quantity which refers to the quantity of material or service that is offered via the Item. E.g. 10 Each and is obligatory (In case that more than one ItemScheduleLine exists, this quantity is calculated as the sum of quantities from all ItemScheduleLines.). A QuantityTypeCode is a GDT of type QuantityType-Code which is coded representation of a type of the quantity and is optional. A TargetQuantity is a GDT of type Quantity, Qualifier: Target which is the target quantity of the follow-on PurchasingContract item and is optional. A TargetQuantityTypeCode is a GDT of type QuantityTypeCode which is coded representa-tion of a type of the target quantity and is optional. A DeliveryPeriod is a GDT of type UPPEROPEN_LOCALNORMALISED_DateTimePeriod and is optional. Delivery date for the requested products or timeframe for rendered services. In case that more than one ItemScheduleLine exists, this value is an accumulated value calculated from the DeliveryPeriods of all ItemScheduleLines. It is calcu-lated as a period starting with the earliest start date to be found in the ItemScheduleLines and ending with the latest end date. A NetAmount is a GDT of type Amount, Qualifier: Net which is the net amount of a SupplierQuoteItem. The amount is calculated from the NetUnitPrice and the Quantity (which is defined in the ScheduleLine node and is optional. A TargetAmount is a GDT of type Amount, Qualifier: Target which is a target amount of the follow-on PurchasingContract item and is optional. A NetUnitPrice is a GDT of type Price which is a net price for the base quantity of a product that was used to calculate the net amount and is optional. For example: € 10 for 5 pieces. A Status contains state information of the SupplierQuote item. It contains the following elements that are defined by the IDT: SupplierQuoteItem-Status that is derived from the IDT: ProcurementDocumentItemStatusElements and is obligatory. A QuoteInclusionStatusCode is a GDT of type InclusionStatus- Code in which the variable describes whether the bidder made an offer for this item or not and is obligatory.

An ActivationStatusCode is a GDT of type ActivationStatusCode in which this variable indicates whether a SupplierQuote item is relevant within the bidding process or not and is obligatory. A RejectionStatus-Code is a GDT of type RejectionStatusCode in which this variable represents the status of the SupplierQuote item rejection and is obligatory. A SupplierQuotePreparationStatusCode is a GDT of type SupplierQuotePreparationStatusCode and is Obligatory. This variable is an overall status variable, which inherits the status value of the root node status variable Item Processes Allowed. It contains information of the root node status variables Closure and Lifecycle. It is used to control the feasible actions at item level. A ClosureStatusCode is a is of GDT type ClosureStatusCode in which this variable describes whether the business transaction for a SupplierQuote is closed or not and is obligatory.

A ItemProduct 282044 has a cardinality of 1:c. A ItemDeliveryTerms 282054 has a cardinality of 1:c. A ItemCurrentValidBasePrice 282070 has a cardinality of 1:c. A ItemPriceSpecification 282068 has a cardi-nality of 1:cn. A ItemParty 282046 has a cardinality of 1:cn. A ItemLocation 282052 has a cardinality of 1:cn. A ItemBusinessTransactionDocumentReference 282080 has a cardinality of 1:cn. A ItemBiddingCriteriaAssessment has a cardinality of 1:cn. A ItemBidderPartyQuestion has a cardinality of 1:cn. A ItemEvaluation has a cardinality of 1:cn. A ItemAttachmentFolder 282092 has a cardinality of 1:c. A ItemTextCollection 282094 has a cardinality of 1:c. A ItemScheduleLine 282140 has a cardinality of 1:cn.

There are a number of Inbound Aggregation Relationships including ParentItem. From the business ob-ject SupplierQuote/node Item, ParentItem has a cardinality of c:cn. Association to a SupplierQuoteItem itself, which is the relationship between a subitem and a higher-level parent item in an item hierarchy. This enables item hierarchies to be mapped. The hierarchies are mapped using the elements HierarchyRelationshipTypeCode and ParentItemID.

From business object Identity, a CreationIdentity has a cardinality of 1:cn which is the identity that created the procurement document. A LastChangeIdentity has a cardinality of c:cn in which the Identity that changed the procurement document in the last time.

(Specialization) Associations for Navigation

The Item has associations to the following nodes:

To Node Item

ChildItem: c:cn (implemented and create-enabled)

Child item in an item hierarchy. This association is necessary in order to create item hierarchies.

To transformed object BusinessDocumentFlow

BusinessDocumentFlow: c:c

Association to the BusinessDocumentFlow which is a view on the set of all preceding and succeeding business (transaction) documents for the current procurement document item.

To the node ItemParty

ServicePerformerItemParty c:c

Association to a Party which appears within the ServicePerformerItemParty specialisation.

ProductRecipientItemParty: c:c

Association to a party which appears within the ProductRecipientItemParty specialisation.

To the node ItemLocation

ShipToItemLocation: c:c

Association to a Location which appears within the ShipToLocation specialisation.

ReceivingItemSite: c:c

Association to a Location which appears within the ReceivingSite specialisation.

To the node ItemBusinessTransactionDocumentReference

ItemBaseRequestForQuoteItem Reference: c:c

Association to a BusinessTransactionDocumentReference which appears within the BaseRequestForQuote specialisation.

ItemCustomerQuoteItemReference: c:c

Association to a business transaction document reference which appears within the SupplierQuote spe-cialisation.

Constraints

The NetAmount is used only in case the follow-on document is a PurchaseOrder or unknown.

The TargetAmount is used only in case the follow-on business document is a PurchasingContract.

The TargetQuantity is used only in case the follow-on business document is a PurchasingContract.

The NetUnitPrice is used only in case the requested price information is Simple Price.

If the item has a reference to a RequestForQuote item, only the following fields can be changed by the bidder: NetUnitPrice, TargetQuantity, TargetQuantityTypeCode TargetAmount. If allowed by the Biddin-gRules, the Quantity and QuantityTypeCode may be changed by the bidder additionally.

Enterprise Service Infrastructure Actions

IncludeInQuote is used to include this SupplierQuote item into the offer of the bidder. The action is in-tended to be called by the bidder party.

ExcludeFromQuote is used to exclude the SupplierQuote item from the offer. The action is intended to be called by the bidder party.

Activate is used to indicate that the current SupplierQuote item is (again) relevant within the bidding proc-ess.

In some implementations, the bidder party is allowed only to use this action on items that have been added by him-/herself, thus having no reference to a RequestForQuote item.

In some implementations, Deactivate is used to indicate that the current SupplierQuote item is temporarily not relevant within the bidding process.

In some implementations, the bidder party is allowed only to use this action on items that have been added by him-/herself, thus having no reference to a RequestForQuote item.

RevokeRejection is used to revoke the rejection of the current SupplierQuote item. The action is intended to be called by the buyer party.

Reject is used to reject the current SupplierQuote item. If the SupplierQuote will be awarded, such an item will not be transferred to a follow on document. The action is intended to be called by the buyer party.

In some implementations, in addition to other possible preconditions, ESI actions that correspond to S&AM actions are allowed only if the related S&AM actions are allowed.

QueryByElements provides a list of all SupplierQuote items which contain the specified selection ele-ments.

The query elements are defined by the data type: ProcurementDocumentItemElementsQueryElements. These elements are:

ProcurementDocumentID is optional, and is of GDT type BusinessTransactionDocumentID.

ProcurementDocumentName is optional, and is of GDT type MEDIUM_Name.

SystemAdministrativeData is optional, and is of GDT type SystemAdministrativeData.

CreationBusinessPartnerCommonPersonNameGivenName is of GDT type MEDIUM_Name.

CreationBusinessPartnerCommonPersonNameFamilyName is of GDT type MEDIUM_Name.

LastChangeBusinessPartnerCommonPersonNameGivenName is of GDT type MEDIUM_Name.

LastChangeBusinessPartnerCommonPersonNameFamilyName is of GDT type MEDIUM_Name.

ID is optional and is of GDT type BusinessTransactionDocumentItemID.

DeliveryPeriod is optional and is of GDT type DateTimePeriod.

Description is optional and is of GDT type MEDIUM_Description.

StatusQuoteInclusionStatusCode is optional, and is of GDT type InclusionStatusCode.

StatusRejectionStatusCode is optional, and is of GDT type RejectionStatusCode.

StatusActivationStatusCode is optional and is of GDT type ActivationStatusCode.

ItemProductProductID is optional and is of GDT type ProductID.

ItemProductProductTypeCode is optional, is of GDT type ProductTypeCode.

ItemProductProductBidderID is optional and is of GDT type ProductPartyID.

ItemProductProductCategoryInternalID is optional and is of GDT type ProductCategoryInternalID.

The ItemProduct is the identification, description and classification of the product within the Item. The ItemProduct contains the following elements that are defined by the data type: ProcurementDocumentItemProductElements that is derived from the data type: BusinessTransactionDocumentProductElements.

ProductUUID is optional, is a universally unique identifier for a product, and is of GDT type UUID.

ProductID is optional, is a proprietary identifier for a product, and is of GDT type ProductID.

ProductStandardID is optional, is the standardized identifier for this product, whose identification scheme is managed by an agency from the DE 3055 code list, and is of GDT type ProductStandardID.

ProductBidderID is optional, is an identifier that is used proprietarily by the BidderParty for this product, and is of GDT type ProductPartyID.

ProductTypeCode is optional, is the coded representation of the type of a product (material or servicepro-duct), and is of GDT type ProductTypeCode, restrictions: 1 (Material), 2 (Service).

ProductCategoryUUID is optional, is a universally unique identifier for a product category, and is of GDT type UUID.

ProductCategoryInternalID is optional, is a proprietary identifier for a product category, and is of GDT type ProductCategoryInternalID.

ProductCategoryStandardID is optional, is a standardized identifier for a product category, whereby the identification scheme used is managed by an agency from the code list DE 3055, and is of GDT type ProductCategoryStandardID.

ProductCatalogueReference is optional, is a unique reference to a catalog or to an object within a cata-log, and is of GDT type CatalogueReference.

In some implementations, a product category is a division of products according to objective criteria. The product category is automatically derived from the Material or ServiceProduct if product identification is specified. However, a Material or ServiceProduct can also be specified by natural linguistic text. In this case a ProductCategory can be assigned manually.

A number of inbound aggregation relationships can exist, including: 1) From the business object Material: Material has a cardinality of c:cn, and the ItemProduct may represent the Product specialisation Material if a Item contains a Material. 2) From the business object ServiceProduct: ServiceProduct: has a cardi-nality of c:cn. The ItemProduct may represent the Product specialisation ServiceProduct if a Item con-tains a ServiceProduct. 3) From the business object ProductCategoryHierarchy/node ProductCategory: ProductCategoryHierarchyProductCategory has a cardinality of c:cn. The ItemProduct may represent a ProductCategory that classifies the requested Material or ServiceProduct.

If the item has a reference to a RequestForQuote item, the product information can not be changed ex-cept for the ProductSellerID. For unplanned items, only the product category information as well as the ProductSellerID can be maintained.

The ItemDeliveryTerms are conditions and agreements formulated at the time of the bidding that apply for the execution of the delivery and the necessary associated services and activities. The ItemDeliveryTerms contains the following elements that are defined by the data type: ProcurementDocumentItemDeliveryTermsElements that is derived from the data type: BusinessTransactionDocumentDeliveryTermsElements. Incoterms is optional, are the standard contract formulas for the terms of delivery, and are of GDT type Incoterms. MaximumLeadTimeDuration is optional, is the maximum lead time from the time of the order to the receipt of the delivery, and is of GDT type Duration, Qualifier: LeadTime.

Inheritance is used for Incoterms, i.e. Incoterms that are specified at SupplierQuote level are used for all items if not otherwise specified on item level. The inheritance only takes Incoterms into account for mate-rial items; they are ignored for all other items.

The ItemDeliveryTerms are not used for items that contain a ServiceProduct.

The ProcurementDocumentCurrentValidBasePrice is the currently valid base price of the procurement document item price specification.

ProcurementDocumentCurrentValidBasePrice contains the following elements that are defined by the data type: ProcurementDocumentItemCurrentValidBasePriceElements.

BasePrice is optional, is the currently valid base price, and is of GDT type Price.

BasePriceDetailedIndicator specifies whether or not the base price is detailed by complex item price specifications using validity dates, scales or discounts. If the base price is uniquely specified (in terms of not detailed) then validity dates, scales or discounts are not used in the item price specification, and is of GDT type Indicator, qualifier Detailed.

The transformation node will only be used when the requested price information is Complex Price.

The BasePrice is only available if the base price detailed indicator is false.

The ItemPriceSpecification contains price calculation detail information, such as discounts or sur-charges, offered by the bidder for this item.

See specification of the dependent object PriceSpecification.

In some implementations, if the corresponding RequestForQuote item already contains PriceSpecifica-tions as proposal for the bidder, these PriceSpecifications are taken over.

ItemPriceSpecifications are allowed only for SupplierQuotes with follow-up document PurchasingCon-tract. In addition, they will only be used when the requested price information is Complex Price.

The SupplierQuoteItemParty is a natural or legal person, organization, organizational unit, or group that is involved in an Item in a PartyRole. A party can be a BusinessPartner in the specialisation Employee or BusinessPartner. A SupplierQuoteItemParty may keep a reference to a business partner or one of its specializations (for example, customer, supplier, employee). A SupplierQuote ItemParty may exist with-out reference to a business partner or an organizational unit. This would be a Casual Party, which is a party without reference to the master data in the system. The external identifier and the description are contained in the business document. Casual Party is, for example, used for groupware replication (Outlook). The e-mail address and the description of a party are used by the groupware when replicating, for example, e-mails or appointments.

An ItemParty can occur within the following complete and disjoint specialisations: ServicePerformerItem-Party: A ServicePerformerItemParty is a party that provides services. A ServicePerformerItemParty belongs to the BidderParty. ProductRecipientItemParty: A ProductRecipientItemParty is a party to which materials are delivered or for which services are provided.

The ItemParty contains the following elements that are defined by the data type: ProcurementDocumentItemPartyElements that is derived from the data type: BusinessTransactionDocumentPartyElements.

UUID is of GDT type UUID, and is an alternative key.

PartyID is optional, and is the identifier of the SupplierQuoteParty in this PartyRole in the business document or the master data object and is of GDT type PartyID (without additional components, such as schemeAgencyID).

In some implementations if a business partner or organizational unit are referenced, the attribute contains their identifiers. If an unidentified identifier is, for example, entered by the user, the attribute contains this identifier.

PartyUUID is optional, is the unique identifier for a business partner, the organizational unit, or their spe-cializations, and is of GDT type UUID.

PartyTypeCode is optional, is the type of the business partner, organizational unit, or their specializations referenced by the attribute PartyUUID, and is of GDT type BusinessObjectTypeCode, Restrictions: 147 (Business Partner), and 167 (Employee).

RoleCategoryCode is optional, is the Party Role Category of the SupplierQuoteParty in the business document or the master data object, and is of GDT type PartyRoleCategoryCode, Restrictions: 5 (Produc-tRecipientParty), 43 (ServicePerformerParty).

RoleCode is optional, is the Party Role of the SupplierQuoteParty in the business document or the master data object, and is of GDT type PartyRoleCode. AddressReference is optional, is a reference to the ad-dress of the Party, and is of GDT type PartyAddressReference.

DeterminationMethodCode is optional, is a coded representation of the determination method of the Party, and is of GDT type PartyDeterminationMethodCode.

In some implementations, a party could be a person, organization, or group within or outside of the com-pany. Inheritance is used for all parties, i.e. parties that are specified at SupplierQuote level are used for all items if not otherwise specified on item level.

A composition relationship exists: ItemPartyAddress 282048 has a cardinality of 1:c.

An inbound aggregation relationship exists from business object Party, Node Root: Party has a cardinality of c:cn, and is the referenced Party in Master Data.

A number of association for navigation exist, including:

To transformed object UsedAddress, node Root:

UsedAddress has a cardinality of c:c, and is the transformed object UsedAddress that represents a uni-form way to access a party address of a procurement document whether it's a business partner address, a organization center address or an address specified within a procurement document. For the address used for the Party. This can be: A referenced address of the master data object, or The PartyAddress used via the composition relationship. In some implementations it is possible to deter-mine which of the two applies by means of the PartyAddressHostTypeCode element the instance of the TO UsedAddress represents this address. The association is implemented.

In case 1) The node ID of the node in the master data object is determined via the PartyTypeCode, PartyAddressUUID and PartyAddressHostTypeCode elements that has the composition relationship to the DO address that is to be represented by the TO UsedAddress. Additionally, the TO UsedAddress in the implemented association is provided with the following information:

That this is an example of a master data address

BusinessObjectTypeCode, BusinessObjectNodeTypeCode and Node ID of its own ItemParty node. These are required in case changes to the TO UsedAddress take place. In this case, the master data address is copied by the TO UsedAddress, the changes take place to the copy, and a corresponding DO Address is created at the ItemParty via the PartyAddress composition relationship.

In case 2) The TO UsedAddress is informed of the BusinessObjectTypeCode, BusinessObject-NodeTypeCode and Node ID of its own ItemParty. Additionally, information is provided that this is not an example of a referenced address. In this case, the TO UsedAddress represents the DO address used at the ItemParty via the PartyAddress composition relationship.

In some implementations, if the PartyUUID exists, the PartyTypeCode should, in some implementations, also exist. Parties may only be referenced via the Transformed Object Party, that represent at least one of the following business objects: Company, FunctionalUnit, ReportingLineUnit, Supplier, Customer, Employee, BusinessPartner.

An Item can contain one ProductRecipientItemParty and one ServicePerformerItemParty only. The Item ProductRecipientItemParty is defined in the corresponding Business Object RequestForQuote and is not changeable in the SupplierQuote. A ServicePerformerItemParty can only be added to an item if the item contains a ServiceProduct.

An ItemPartyAddress is a SupplierQuote item specific address of a party. For detailed structure see De-pendent Object Address.

The ItemLocation is a physical place, which is relevant for the SupplierQuote item. An ItemLocation can occur within the following specialisations:

ShipToLocation: A ShipToLocation is the place, whereto the products will be delivered or where a service will be provided.

ReceivingSite: A ReceivingSite is the place, where parts of a company are located.

The elements located directly at the node Location are defined by the data type: ProcurementDocument-LocationElements that is derived from the data type BusinessTransactionDocumentLocationElements. The elements include:

UUID, is an Alternative Key, is a globally unique identifier of the procurement document location for refer-encing purposes, and is of GDT type UUID.

LocationID is optional, is an identifier of the referenced Location, and is of GDT type LocationID.

LocationUUID is optional, is the globally unique identifier of the Location referenced, and is of GDT type UUID.

RoleCategoryCode is optional, is a coded representation of the Location role category in the procurement document, and is of GDT type LocationRoleCategoryCode.

RoleCode is a coded representation of the Location role in the procurement document, and is of GDT type Location-RoleCode.

AddressReference is optional, is a reference to the address of the Location, and is of GDT type Location-AddressReference.

DeterminationMethodCode is optional, is a coded representation of the determination method of the Lo-cation, and is of GDT type LocationDeterminationMethodCode.

A composition relationship exists: ItemLocationAddress 282050 has a cardinality of 1:c.

Inbound aggregation relationships exist, including: From the business object Location, Location, which has a cardinality of c:cn, and PartyAddressInformation, which has a cardinality of c:cn.

Associations for navigation include:

UsedAddress has a cardinality of c:c, and is represents a uniform way to access a location address of a procurement document whether it's a business partner address, a organization center address or an ad-dress specified within a procurement document. In some implementations, this can be:

A referenced address of a master data object or the address that is integrated via the composition rela-tionship Location-Address. You can see which of the two cases applies by looking at the element Ad-dressHostTypeCode. The instance of the TO UsedAddress represents this address. The association is implemented.

In case 1) the elements AddressBusinessObjectTypeCode, AddressUUID and AddressHostTypeCode are used to determine the Node ID of the node in the master data object, which holds the composition relationship with DO Address, which is to be represented by TO UsedAddress. Furthermore, the following information is sent to the TO UsedAddress in the implemented address:

The fact that it is a master data address;

the BusinessObjectTypeCode, BusinessObjectNodeTypeCode and Node ID of the own ItemLocation node. This are required if changes are made to the TO UsedAddress. In this case the TO UsedAddress copies the master data address, the changes are applied and the corresponding DO Address is gener-ated on the ItemLocation node via the composition relationship LocationAddress.

In case 2) the BusinessObjectTypeCode, BusinessObjectNodeTypeCode and Node ID of the own Item-Location are communicated to the TO UsedAddress. Whether or not it is a referenced address is also included. In this case, the TO UsedAddress represents the DO Address that is integrated via the compo-sition relationship on the ItemLocation node.

In some implementations, a logical place for example can be the reception in an office building or gate 3 of a production plant. Propagation is used for all Locations, i.e. Locations that are specified at ProcurementDocument level are used for all items if not otherwise specified on item level. The ItemLocation is defined in the corresponding Business Object RequestForQuote and is not changeable in the SupplierQuote. The node ItemLocation is used only in case the follow-up document is a PurchaseOrder.

A ItemLocationAddress is a SupplierQuote item specific address of a location. For detailed structure see Dependent Object Address.

The ItemBusinessTransactionDocumentReference is a unique reference to another business transaction document or an item within this document which is related to the SupplierQuote item.

An ItemBusinessTransactionDocumentReference can occur within the following complete and non-disjoint specialisations:

ItemBaseRequestForQuoteItemReference: A reference to the RequestForQuote item which is the basis of the Supplier Quote item.

ItemCustomerQuoteItemReference: A CustomerQuoteItemReference is a reference to a customer quota-tion item this SupplierQuote item is based on.

The ItemBusinessTransactionDocumentReference contains the following elements that are defined by the data type: ProcurementDocumentBusinessTransactionDocumentReferenceElements that is derived from the data type: BusinessTransactionDocumentReferenceElements.

BusinessTransactionDocumentReference: Obligatory

Unique reference to the referred business transaction document. Furthermore, it is possible to have a reference to a line item within the business transaction document.

(is of GDT type BusinessTransactionDocumentReference)

BusinessTransactionDocumentRelationshipRoleCode: is optional

Coded representation of the role of a BusinessTransactionDocument in this relationship.

(is of GDT type BusinessTransactionDocumentRelationshipRoleCode)

Inbound aggregation relationships include: From the business object RequestForQuoteItem: Request-ForQuoteItem has a cardinality of c:cn. A SupplierQuote item should refer to a RequestForQuote item.

The ItemBiddingCriteriaAssessment is a valuation function or weighting factor. These are assigned to ItemBidderQuestion's or fields of an item node. The ItemBiddingCriteriaAssessment contains the following elements that are defined by the data type: ProcurementDocumentBiddingCriteriaAssessmentEle-ments. In some embodiments, a valuation function calculates a value from given valuation criteria (field or attribute value). There are currently four types of valuation functions: linear, stepladder, fixed, and manual. The weighting factor is a percentage, by which a valuation value is multiplied to give it greater or less influence on the overall score.

The valuation functions and weighting factors are defined in the corresponding Business Object RequestForQuote. The BiddingCriteriaAssessment node is also required in the SupplierQuote. This is because the bidding process may require the weighting information to be visible to the bidder. Addition-ally, the purchaser stores manual valuation values per SupplierQuote.

In some implementations, fields on header or item that can be maintained by the bidder are evaluated. Example: The ItemBiddingCriteriaAssessment contains quantity of the item that is weighted with 60% by using a linear valuation function. In addition, the selected delivery term is weighted with 40% by using a manual valuation function.

The weighting entries in the ItemBiddingCriteriaAssessment node are defined in the corresponding Business Object RequestForQuoteItemBiddingCriteriaAssessment and are not changeable in the SupplierQuote. Only the manual valuations can be added in the ItemBiddingCriteriaAssessment node.

An ItemBidderPartyQuestion is a request for additional information from the bidder. It appears in the form of question and answer. An ItemBidderPartyQuestion refers to specific characteristics at root or item node level, and can be incorporated into the bidding process.

The ItemBidderPartyQuestion contains the following elements that are defined by the data type: Pro-curementDocumentBidderPartyQuestionElements.

In some implementations, the ItemBidderPartyQuestion is used to gather additional information from the bidder. Based on the RequestForQuoteItemBidderPartyQuestion in the corresponding Business Object RequestForQuote, it can be: free text, multiple choice, amounts, quantities, dates, or times.

The questions in the ItemBidderPartyQuestion node are defined in the corresponding RequestForQuoteItemBidderPartyQuestion node and are not changeable in the SupplierQuote. The ItemEvaluation is the consolidated and selected information to compare the SupplierQuote item with its counterpart in other SupplierQuotes submitted to the same RequestForQuote.

An ItemEvaluation contains a valuation criteria and the corresponding result of the valuation function needed for the evaluation of the SupplierQuote. This includes: All characteristics of a SupplierQuote that are used to determine the winning SupplierQuote, the results of the predefined weighting functions, and the aggregation at all hierarchy levels. In addition, the ItemEvaluation forms the basis for a holistic com-parison of different SupplierQuotes. The ItemEvaluation contains the following elements that are defined by the IDT: ProcurementDocumentEvaluationElements.

In some implementations, the intention of this node is to allow a complete award decision at document, hierarchy, and item level through the selection and consolidation of evaluation criteria. The node is ag-gregated at runtime. The node contains the evaluation criteria. These can be enriched with the specified weighting factors, valuation values, and scores of each valuated item field. The node can aggregate these scores at hierarchy level.

The ItemAttachmentFolder contains electronic documents of any type that relates to the SupplierQuote item. For structure information, see specification of the dependent object AttachmentFolder. In some implementations, an ItemAttachmentFolder can contain for example a PDF document with the general terms and conditions of the BidderParty.

The ItemTextCollection contains natural-language texts relating to the SupplierQuote item. For structure information, see specification of the dependent object TextCollection. Example: An ItemTextCollection can be for example an acknowledgement for the business transaction or an advertising text.

An ItemScheduleLine is a line containing the quantity and date of a performance schedule required by the requester. The ItemScheduleLine contains the following elements that are defined by the data type: ProcurementDocumentItemScheduleLineElements that is derived from the data type: BusinessTransactionDocumentScheduleLineElements.

ID is the identifier for the ItemScheduleLine assigned by the BuyerParty, and is of GDT type Business-Transaction-DocumentItemScheduleLineID. DeliveryPeriod is optional, is the delivery date for the re-quested products or timeframe for the requested services, and is of GDT type UPPEROPEN-_LOCALNORMALISED_DateTimePeriod. Quantity is the offered quantity of the product or service, and is of GDT type Quantity. QuantityTypeCode is optional, is the coded representation of a type of quantity in procurement document item schedule line, and is of GDT type QuantityTypeCode.

In some implementations, from a procurement perspective schedule lines provide information about which quantities should be delivered until a certain point in time. An Item can contain one ItemSched-uleLine only. The node ItemScheduleLines, in some implementations, should not be used for items of type product category.

FIG. 283-1 through 283-13 illustrates one example logical configuration of SupplierQuoteAwardNotificationMessage message 283000. Specifically, this figure depicts the arrangement and hierarchy of various components such as one or more levels of packages, entities, and datatypes, shown here as 283000 through 283476. As described above, packages may be used to represent hierarchy levels. Entities are discrete business elements that are used during a business transaction. Data types are used to type object entities and interfaces with a structure. For example, SupplierQuoteAwardNotificationMessage message 283000 includes, among other things, SupplierQuote 283016. Accordingly, heterogeneous applications may communicate using this consistent message configured as such.

The motivation behind the message type SupplierQuoteAwardNotification is the process of informing those systems, which requested the execution of the bid invitation, about awarded bids.

The SupplierQuoteAwardNotification message is the message about which items of a bid have been awarded and under which conditions. The structure of the SupplierQuoteAwardNotification message type is specified by the SupplierQuoteAwardNotificationMessage data type. Structural limitations or integrity conditions of the SupplierQuoteAwardNotification regarding the message data type SupplierQuoteAwardNotificationMessage are listed elsewhere. The SupplierQuoteAwardNotification message contains the BusinessObject SupplierQuote and is implemented by the sending process component RFQProcessing.

The message data type SupplierQuoteAwardNotificationMessage includes: the SupplierQuote object contained in the business document, business information relevant for sending a business document in a message. It includes the following packages: MessageHeader package, SupplierQuote package. The SupplierQuoteAwardNotificationMessage data type thus provides the structure for the SupplierQuoteAwardNotification message type and the operations based on this.

A MessageHeader package groups business information relevant for sending a business document in a message. It contains the entity: MessageHeader.

A MessageHeader groups together business information from the point of view of the sending application for business document identification in a message. It is of the type GDT: BusinessDocumentMessageHeader whereby the following elements of the GDT are used: ID.

The SupplierQuote package groups the SupplierQuoteAwardNotification together with its packages. It contains the following packages: Party package, Location package, DeliveryInformation package, PaymentInformation package, Attachment package, Description package, Item package.

A description of SupplierQuote can be found in the description for the SupplierQuote business object. The SupplierQuote package contains the elements: ID—See Business Object (GDT: BusinessTransactionDocumentID), UUID—See Business Object (GDT: UUID)

ReconciliationPeriodCounterValue is a counter for reconciliation periods. It is of GDT type ReconciliationPeriodCounterValue.

Name—See Business Object (GDT: MEDIUM_Name)

The SupplierQuoteParty-Package package groups together all involved parties. It contains the following entities: BuyerParty, Requestor Party, ProductRecipientParty, BidderParty, ResponsiblePurchasingUnitParty, BuyerParty. See SupplierQuote business object.

The BuyerParty is of the GDT type: BusinessTransactionDocumentParty.

Requestor Party—see RequestForQuote business object. The Requestor Party is of type GDT: BusinessTransactionDocumentParty.

ProductRecipientParty—see SupplierQuote business object. The ProductRecipientParty is of type GDT: BusinessTransactionDocumentParty.

BidderParty—see SupplierQuote business object. The BidderParty is of type GDT: BusinessTransactionDocumentParty.

ResponsiblePurchasingUnitParty—see RequestForQuote business object. Structure

The ResponsiblePurchasingUnitParty is of the GDT type: BusinessTransactionDocumentParty.

The SupplierQuoteLocation package groups together all participating locations. It includes the entities: ShipToLocation, ReceivingSite.

ShipToLocation—see SupplierQuote business object. The ShipToLocation is of type GDT: BusinessTransactionDocumentShipToLocation.

ReceivingSite—see SupplierQuote business object. The ReceivingSite is of type GDT: BusinessTransactionDocumentLocation.

The SupplierQuoteDeliveryInformation package groups together terms of delivery. The DeliveryInformation package includes the elements: MaximumLeadTimeDuration—See Business Object (GDT: Duration). In addition, it contains the entity: DeliveryTerms.

DeliveryTerms—see SupplierQuote business object. The DeliveryTerms are type GDT: DeliveryTerms.

The SupplierQuotePaymentInformation package groups together terms of payment. It includes the following entities: CashDiscountTerms.

CashDiscountTerms—see SupplierQuote business object. The CashDiscountTerms are type GDT: CashDiscountTerms.

The SupplierQuoteAttachment package groups together attachments. It includes the following entities: AttachmentFolder.

An AttachmentFolder can contain any attachment that refers to the SupplierQuote. The AttachmentFolder is of type GDT: AttachmentFolder.

The SupplierQuoteDescription package groups together descriptions. It contains the following entities: TextCollection.

A TextCollection is a collection of natural language text. The TextCollection is of type GDT: TextCollection.

The SupplierQuoteItem package groups the SupplierQuoteAwardNotificationItem along with its packages.

It includes the following packages: ItemProductInformation package, ItemPriceInformation package, ItemParty package, ItemLocation package, ItemDeliveryInformation package, ItemBusinessTransactionDocument package, ItemAttachment package, ItemDescription package, ItemScheduleLine package.

SupplierQuoteItem—see SupplierQuote business object. The SupplierQuoteItem includes the elements: ID—See Business Object (GDT: BusinessTransactionDocumentItemID), UUID—See Business Object (GDT: UUID), TypeCode—See Business Object (GDT: BusinessTransactionDocumentItemTypeCode), HierarchyRelationship—See Business-Object.

The SupplierQuoteItemProductInformation package groups together all information for identification, description and classification of a product. It includes the following entities: Product, ProductCategory.

Product—see SupplierQuote business object. The Product is of type GDT: BusinessTransactionDocumentProduct.

ProductCategory—see SupplierQuote business object. The ProductCategory is of type GDT: BusinessTransactionDocumentProductCategory.

The SupplierQuoteItemPriceInformation package groups the price information. It contains the entity:

NetUnitPrice.

NetUnitPrice—see SupplierQuote business object. The NetUnitPrice is of type GDT: Price.

The SupplierQuoteItemParty package groups together all participating parties. It includes the following entities: Requestor Party, ProductRecipientParty, ServicePerformerParty, Requestor Party. See RequestForQuote business object. Requestor Party is of type GDT: BusinessTransactionDocumentParty.

ProductRecipientParty—See SupplierQuote business object. The ProductRecipientParty is of type GDT: BusinessTransactionDocumentParty.

ServicePerformerParty—See SupplierQuote business object. The ServicePerformerParty is of type GDT: BusinessTransactionDocumentParty.

SupplierQuoteItemBusinessTransactionDocument package groups together all references. It includes the entities: PurchaseRequestReference, BuyerProductCatalogueReference.

PurchaseRequestReference—See SupplierQuote business object. The PurchaseRequestReference is of type GDT: BusinessTransactionDocumentReference.

BuyerProductCatalogueReference—See SupplierQuote business object. The BuyerProductCatalogueReference is of type GDT: CatalogueReference.

SupplierQuoteItemDescription package groups together descriptions. It includes the following entities: Description, TextCollection.

A Description is a natural language text. The Description is of type GDT: SHORT_Description SupplierQuoteItemScheduleLine package contains all quantities and dates of a performance schedule. It includes the entity: ScheduleLine.

ScheduleLine—See SupplierQuote business object. The ScheduleLine is of type GDT: BusinessTransactionDocumentScheduleLine.

Business Object SupplierInvoice

FIGS. 284-1 through 284-8 illustrate an example SupplierInvoice business object model 284028. Specifically, this model depicts interactions among various hierarchical components of the SupplierInvoice, as well as external components that interact with the SupplierInvoice (shown here as 284000 through 284026 and 284030 through 284084).

Business Object SupplierInvoice can be a recipient's (usually purchaser's) obligation to pay a supplier for goods received or services rendered. An invoice may be created after goods and service acknowl-edgment has been confirmed. A business object SupplierInvoice may be derived from a Procurement Document Template. A Business Object SupplierInvoice can be part of a Process Component Supplier Invoice Processing and a Deployable Unit Supplier Invoicing. A Business Object SupplierInvoice may be represented by root node SupplierInvoice and its associations.

A Business Object may be involved in the following Process Integration Models: Internal Request Proc-essing_Supplier Invoice Processing, Customer Invoice Processing at Supplier_Supplier Invoice Processing, Document Inbound Service_Supplier Invoice Processing, Supplier Invoice Processing_Accounting, Supplier Invoice Processing_Due Item Processing, Supplier Invoice Processing_Customer Invoice Proc-essing, and/or Supplier Invoice Processing_Purchasing Contract Processing. Service Interface Invoicing In (B2B) can also be referred to as SupplierInvoiceProcessingInvoicingIn. Service Interface Invoicing In Interface may be part of Process Integration Model Customer Invoice Processing at Supplier_Supplier Invoice Processing. Invoicing in Interface can be a grouping of operations, which may create a Supplier Invoice out of legally binding requests of payables or receivables for delivered goods and rendered ser-vices—usually, a payment request for se goods and services.

Create Invoice can be also be referred to as SupplierInvoiceProcessingInvoicingIn. Create Invoice can create a SupplierInvoice according to legally binding claims or liabilities for delivered goods and rendered services. This operation may be based on message type InvoiceRequest and may be derived from Busi-ness Object SupplierInvoice. A message type InvoiceRequest can be sent from invoicing party to an invoice recipient, and can be used to start a new invoicing process. In some implementations, it transfers invoices such as specific invoice, and/or credit memo.

Service Interface Image Recognition Invoicing In (B2B) can also be referred to as SupplierInvoiceProc-essingImageRecognitionInvoicingIn. In some implementations, Service Interface Image Recognition Invoicing In Interface can be part of Process Integration Model Document Inbound Service_Supplier In-voice Processing. Image Recognition Invoicing In Interface can be a grouping of operations, which cre-ates a Supplier Invoice out of legally binding invoice image.

Create Invoice based on Attachment can also be referred to as SupplierInvoiceProcessingImageRecogni-tionInvoicingIn. An operation Create Invoice based on Attachment may create an empty SupplierInvoice with an attachment of an invoice image according to legally binding claims or liabilities for delivered goods and rendered services. This operation can be based on message type BusinessTransactionDocumentI-mageRecognitionRequest. A message type BusinessTransactionDocumentImageRecognitionRequest can be sent from a Document Inbound Service, can be used to start a new invoicing process and may transfer an image of an invoice. This may include an invoice, and/or a credit memo.

Service Interface Internal Invoicing In (A2A) can also be referred to as SupplierInvoiceProcessingInter-nalInvoicingIn. Service Interface Internal Invoicing In Interface can be part of Process Integration Model Internal Request Processing_Supplier Invoice Processing. Internal Invoicing In Interface can be a grouping of operations, which creates a Supplier Invoice out of legally binding requests of payables or receivables for delivered goods and rendered services (e.g., a payment request for goods and services). This operation may be used by trusted process components, which may not require checks for factual correct-ness. It may be used if a settlement with an invoicing party/service provider exists, which enables an in-voice recipient/service consumer to issue an invoice himself.

In some implementations, Create Invoice can also be referred to as SupplierInvoiceProcessingInternalIn-voicingIn. An operation Create Invoice may create a SupplierInvoice according to delivered goods and rendered services. Create Invoice can be based on message type SupplierInvoiceRequestand and may be derived from business object SupplierInvoice. In some implementations, a "one-click process" mes-sage type SupplierInvoiceRequest may be sent from requestor party to invoice recipient for invoice verification purposes. This may create automatically a SupplierInvoice without manual interaction and helps to streamline organisational processes.

In some implementations, Service Interface Request Invoicing Out (A2A) can also be referred to as Sup-plierInvoiceProcessingRequestInvoicingOut. Service Interface Request Invoicing Out Interface can be part of Process Integration Model Supplier Invoice Processing_Customer Invoice Processing. Request Invoicing Out Interface can be a grouping of operations which request a Customer Invoice from Cus-tomer Invoice Processing in third party direct ship scenario. Request Invoicing can also be referred to as SupplierInvoiceProcessingRequestInvoicingOut.

In some implementations, operation Request Invoicing requests a customer invoice. This operation may be based on message type CustomerInvoiceRequestRequest and derived from Business Object Cus-tomerInvoiceRequest. Service Interface Invoice Accounting Notification Out (A2A) can also be referred to as SupplierInvoiceProcessingInvoiceAccountingNotificationOut. Service Interface Invoice Accounting Notification Out Interface can be part of Process Integration Model Supplier Invoice Processing_Accounting.

Invoice Accounting Notification Out Interface can be a grouping of operations which notifies financial accounting about a Supplier Invoice. Notify of Invoice can also referred to as SupplierInvoiceProcessingInvoiceAccountingNotificationOut. The operation Notify of SupplierInvoice may notify financial ac-counting about accounting relevant SupplierInvoice information. This operation may be based on mes-sage type InvoiceAccountingNotification and be derived from Business Object AccountingNotification. It may contain information about accounting objects to be charged. This message may be sent whenever a Supplier Invoice may be posted.

Notify of Invoice Cancellation can also be referred to as SupplierInvoiceProcessingInvoiceAccountingNotificationOut. An operation Notify of Invoice Cancellation notifies about cancellation of a Supplier Invoice. This operation may be based on message type InvoiceCancellationAccountingNotification and may be derived from Business Object AccountingNotification. It may include a Supplier Invoice reference to be cancelled. This message may be sent whenever a previously posted Supplier Invoice may be cancelled.

Service Interface Receivables Payables Out (A2A) can also be referred to as SupplierInvoiceProcessin-gReceivablesPayablesOut. Service Interface Receiveables Payables Out Interface may be part of Process Integration Model Supplier Invoice Processing_Due Item Processing. Receivables Payables Out Interface can be a grouping of operations which notifies Due Item Processing about a Supplier Invoice.

Notify of Invoice can also be referred to as SupplierInvoiceProcessingReceivablesPayablesOut. This op-eration Notify of Invoice may notify financial operations about payments due and tax due and may be based on message type ReceivablesPayablesNotification and be derived from Business Objects TradeReceiveablesPayablesRegister and TaxReceiveablesPayablesRegister.

Notify of Invoice Cancellation can also be referred to as SupplierInvoiceProcessingReceivablesPayable-sOut. An operation Notify of Invoice Cancellation notifies Due Item Processing about previously sent ReceiveablesPayablesNotification that may no longer be valid and may need to be cancelled. This opera-tion can be based on message type ReceivablesPayablesCancellationNotification and may be derived from Business Objects TradeReceiveablesPayablesRegister and TaxReceiveablesPayablesRegister.

Service Interface Invoicing Out (B2B) can also be referred to as SupplierInvoiceProcessingInvoicingOut. Service Interface Invoicing Out Interface can be part of Process Integration Model Customer Invoice Processing at Supplier_Supplier Invoice Processing. An Invoicing Out Interface can be a grouping of operations which informs to invoicing party about acceptance of a Supplier Invoice.

Confirm Invoice can also be referred to as SupplierInvoiceProcessingInvoicingOut. Confirm Invoice can be a response sent by a recipient to an invoicing party confirming or rejecting an entire invoice received or stating that, for example, it has been assigned temporarily status "pending". This operation may be based on message type InvoiceConfirmation and be derived from Business Object SupplierInvoice.

Service Interface Evaluated Receipt Settlement Invoicing Out (B2B) can also be referred to as Service Interface Evaluated Receipt Settlement Invoicing Out Interface and can be part of Process Integration Model Customer Invoice Processing at Supplier_Supplier Invoice Processing.

In some implementations, Evaluated Receipt Settlement Invoicing Out Interface can be a grouping of operations which informs SellerParty about a Supplier Invoice. Request Evaluated Receipt Settlement Invoice can also be referred to as SupplierInvoiceProcessingERSInvoicingOut. This operation Request EvaluatedReceiptSettlement Invoice informs SellerParty about a SupplierInvoice created by BuyerParty using, for example, a credit memo procedure. This operation may be based on message type InvoiceRequest and derived from Business Object SupplierInvoice.

Service Interface Contract Release Out (A2A) can also be referred to as SupplierInvoiceProcessingCon-tractReleaseOut. Service Interface Contract Release Out can be part of Process Integration Model Sup-plier Invoice Processing_Purchasing Contract Processing. Contract Release Out Interface can be a grouping of operations which notifies PurchasingContract about Invoices amounts and values in a Sup-plierInvoice.

Notify of Contract Release can also be referred to as SupplierInvoiceProcessingContractReleaseOut. An operation Notify of Contract Release may notify PurchasingContract about a contract release by a Supplier Invoice. This operation may be based on message type PurchasingContractReleaseNotification.

In some embodiments, SupplierInvoice 284086 may include detail information about claims or liabilities for delivered goods and rendered services between a BillFromParty and a BillToParty. Elements located at node SupplierInvoice may defined by data type ProcurementDocumentElements. Exemplary element SystemAdministrativeData may be used in a SupplierInvoice. SystemAdministrativeData (Administrative data stored within system) may contain system users and time of change. Additional exemplary elements that may be used in SupplierInvoice include: UUID, ID, TypeCode, ProcessingTypeCode, DataOriginTypeCode, Date, TransactionDate, ReceiptDate, CancellationDocumentIndicator, Name, TotalGrossAmount, GrossAmount, TotalNetAmount, TotalTaxAmount, TaxAmount, BalanceAmount, Status, IDT, SupplierInvoiceLifecycleStatusCode, ConsistencyStatusCode, BlockingStatusCode, DataEntryProcessingStatusCode, PostingStatusCode, CancellationStatusCode, and/or ApprovalStatusCode. SystemAdministrativeData may be a GDT of type SystemAdministrativeData. UUID may be a GDT of type UUID. In some implementations UUID may have an Alternative Key. UUID can be a universal unique alternative identifier of SupplierInvoice for referencing purposes. ID may be a GDT of type BusinessTransactionDocumentID. In some implementations ID may have an Alternative Key. ID can be a Identifier for SupplierInvoice assigned by BillToParty. TypeCode may be a GDT of type BusinessTransactionDocumentTypeCode. TypeCode can be a coded representation of SupplierInvoice type (e.g. invoice or credit memo). ProcessingTypeCode may be a GDT of type BusinessTransactionDocumentProcessingTypeCode. ProcessingTypeCode can be a coded representation for processing type of Supplier Invoice. DataOriginTypeCode may be a GDT of type ProcurementDocumentDataOriginTypeCode. DataOriginTypeCode can be way SupplierInvoice may be created (e.g. by ERS, XML, manually, or like). Date may be a GDT of type Date and may be optional. Date can be a point in time for posting of invoice by BillFromParty. TransactionDate may be a GDT of type Date and may be optional. TransactionDate can be point in time goods have been delivered or services have been rendered (e.g., point in time liability may be created). This date may be used to determine posting period for FI posting. ReceiptDate may be a GDT of type Date and may be optional. In some implementations, ReceiptDate may have a qualifier of Receipt. ReceiptDate can be a point in time SupplierInvoice may have been received by BillToParty or may have been created by EvaluatedReceiptSettlementRun. CancellationDocumentIndicator may be a GDT of type CancellationDocumentIndicator and may be optional. CancellationDocumentIndicator can indicate whether SupplierInvoice may be a cancellation invoice or not. Name may be a GDT of type MEDIUM_Name and may be optional. Name can be a designation or title of SupplierInvoice. TotalGrossAmount may be a GDT of type Amount and may be optional. In some implementations TotalGrossAmount may have a qualifier of TotalGross. TotalGrossAmount can be total gross amount of SupplierInvoice (net amount plus tax amount). Calculated by summation of item amounts. GrossAmount may be a GDT of type Amount and may be optional. In some implementations GrossAmount may have a qualifier of Gross. GrossAmount can be a gross amount of SupplierInvoice (net amount plus tax amount). TotalNetAmount may be a GDT of type Amount and may be optional. In some implementations TotalNetAmount may have a qualifier of TotalNet. TotalNetAmount can be a total net amount of SupplierInvoice. Calculated by summation of item net amounts. TotalTaxAmount may be a GDT of type Amount and may be optional. In some implementations TotalTaxAmount may have a qualifier of TotalNet. TotalTaxAmount can be a total tax amount of SupplierInvoice. Calculated by summation of tax amounts (DO Tax). Tax amount may be a GDT of type Amount and may be optional. In some implementations TaxAmount may have a qualifier of Tax. TaxAmount can be tax amount of SupplierInvoice. BalanceAmount may be a GDT of type Amount and may be optional. In some implementations, BalanceAmount may have a qualifier of Balance. BalanceAmount can be balance of SupplierInvoice. While posting a SupplierInvoice balance amount may be required to equal zero. This should support a value based check between amount of all items (within taxes) and total amount of SupplierInvoice. Status may be a IDT of type ProcurementDocumentStatus. Status can be an element Status containing all individual status variables that are relevant for and describe current state in life cycle of a SupplierInvoice.

In some implementations, elements described subsequently can be used in a SupplierInvoice. SupplierInvoiceLifecycleStatusCode may be a GDT of type SupplierInvoiceLifecycleStatusCode. SupplierInvoiceLifecycleStatusCode can be status information of overall SupplierInvoice processing (e.g. Posted). ConsistencyStatusCode may be GDT of type ConsistencyStatusCode. ConsistencyStatusCode can be Check status information of SupplierInvoice. BlockingStatusCode may be GDT of type BlockingStatusCode. BlockingStatusCode can be a status information of SupplierInvoice blocking. DataEntryProcessingStatusCode may be a GDT of type ProcessingStatusCode. In some implementations, DataEntryProcessingStatusCode may have a qualifier of DataEntry. DataEntryProcessingStatusCode can be a status information of SupplierInvoice entry process. PostingStatusCode may be a GDT of type PostingStatusCode. PostingStatusCode can be a status information of SupplierInvoice payment, (e.g. SupplierInvoice may have been paid or payment may have been revoked). CancellationStatusCode may be a GDT of type CancellationStatusCode. CancellationStatusCode can be a status information of SupplierInvoice cancellation. ApprovalStatusCode may be a GDT of type ApprovalStatusCode. ApprovalStatusCode can be a status information of SupplierInvoice approval. In some implementations a complete SupplierInvoice may contain a CustomerInvoice reference and a BillFromParty. In some business scenarios, (e.g. dispute management with duplicate check), it may be necessary to keep an incomplete SupplierInvoice with minimum information only. A relation to a supplier can be represented by node SupplierInvoiceParty and subtype association SellerParty.

Composition relationships to subordinate nodes may exist, examples of which (with indicated cardinality relationships) may include: Item 284088 having a cardinality of 1:cn, Party 284100 having a cardinality of 1:cn, Location 284112 having a cardinality of 1:cn, CashDiscountTerms (DO) 284120 having cardinality of 1:c, PaymentControl (DO) 284122 having a cardinality of 1:c, ExchangeRate 284124 having a cardinality of 1:cn, PriceCalculation (DO) having a cardinality of 1:c, TaxCalculation (DO) 284126 having a cardinality of 1:c, BusinessTransactionDocumentReference 284134 having a cardinality of 1:cn, AttachmentFolder (DO) 284138 having a cardinality of 1:c, TextCollection (DO) 284140 having a cardinality of 1:c, BusinessProcessVariantType 284128 having a cardinality of 1:n, and/or AccessCon-trolList (DO) 284142 having a cardinality of 1:1.

In some implementations, inbound Aggregation Relationships may exist from business object Identity/node Root, examples of which (with associated cardinality relationships) follow. CreationIdentity may have a cardinality of 1:cn and may be an identity that created procurement document. LastChangeIden-tity may have a cardinality of c:cn and may be an identity that changed procurement document in last time.

In some implementations, associations for Navigation may exist, examples of which (with possible cardinality relationships) follow. BusinessDocumentFlow may have a cardinality of c:c and can be an association to a BusinessDocumentFlow which may be a view on a set of all preceding and succeeding business (transaction) documents for current procurement document. InvoicedItem may have a cardinality of c:cn and can be an association to an item which appears within an InvoicedItem specialisation. AssignedItem may have a cardinality of c:cn and can be an association to an item which appears within an AssignedItem specialisation. BillToParty may have a cardinality of c:c and can be association to a party which appears within BillToParty specialisation. BillFromParty may have a cardinality of c:c and can be an association to a party which appears within BillFromParty specialisation. BuyerParty may have a cardinality of c:c and can be an association to a party which appears within BuyerParty specialisation. SellerParty may have a cardinality of c:c and can be an association to a party which appears within SellerParty specialisation. PayerParty may have a cardinality of c:c and can be an association to a party which appears within PayerParty specialization. PayeeParty may have a cardinality of c:c and can be an association to a party which appears within PayeeParty specialisation. EmployeeResponsibleParty may have a cardinality of c:c and can be an association to a party which appears within EmployeeResponsibleParty specialisation. ProductRecipientParty may have a cardinality of c:c and can be an association to a party which appears within ProductRecipientParty specialisation. ServicePerformerParty may have a cardinality of c:c and can be an association to a party which appears within ServicePerformerParty specialisation. Requestor Party may have a cardinality of c:c and can be an association to a party which appears within a Requestor Party specialisation. ResponsibleSupplierInvoicingUnitParty may have a cardinality of c:c and can be an association to a party which appears within ResponsibleSupplierInvoicingUnitParty. ShipToLocation may have a cardinality of c:c and can be an association to a location which appears within a ShipToLocation specialisation. ShipFromLocation may have a cardinality of c:c and can be an association to a location which appears within ShipFromLocation specialisation. PurchasingContractReference may have a cardinality of c:cn and can be an association to a business transaction document reference which appears within a PurchasingContract specialisation. PurchaseOrderReference may have a cardinality of c:cn and can be an association to a business transaction document reference which appears within a PurchaseOrder specialisation. ConfirmedInboundDeliveryReference may have a cardinality of c:cn and can be an association to a business transaction document reference which appears within a ConfirmedInboundDelivery specialisation. OutboundDeliveryReference may have a cardinality of c:cn and can be an association to a business transaction document reference which appears within an OutboundDelivery specialisation. GoodsAndServiceAcknowledgementReference may have a cardainality of c:cn and be an association to a business transaction document reference which appears within a GoodsAndServiceAcknowledgement specialisation. CustomerInvoiceReference may have a cardinality of c:c and can be an association to a business transaction document reference which appears within a CustomerInvoice specialisation. CustomsDutyInvoiceReference may have a cardinality of c:cn and can be an association to a business transaction document reference which appears within a CustomsDutyInvoiceReference specialisation. PurchaseOrderBasedSupplierInvoiceRequestReference may have a cardinality of c:cn and can be an association to a business transaction document reference which appears within a PurchaseOrderBasedSupplierInvoiceRequest specialisation. ConfirmedInboundDeliveryBasedSupplierInvoiceRequestReference may have a cardinality of c:cn and can be an association to a business transaction document reference which appears within a ConfirmedInboundDeliveryBasedSupplierInvoiceRequest specialisation. GoodsAndServiceAcknowledgementBasedSupplierInvoiceRequestReference may have a cardinality of c:cn and can be an association to a business transaction document reference which appears within a GoodsAndServiceAcknowledgementSupplierInvoiceRequest specialisation. PurchasingContractBasedSupplierInvoiceRequestReference may have a cardinality of c:cn and can be an association to a business transaction document reference which appears within a PurchasingContractBasedSupplierInvoiceRequest specialisation. OriginSupplierInvoiceReference may have a cardinality of c:cn and can be an association to a business transaction document reference which appears within a OriginSupplierInvoice specialisation. SupplierInvoiceVerificationExceptionReference may have a cardinality of c:cn and can be an association to a business transaction document reference which appears within a SupplierInvoiceVerificationException specialisation. DeliveryBasedSupplierInvoiceRequestReference may have a cardinality of c:cn and can be an association to a business transaction document reference which appears within a DeliveryBasedSupplierInvoiceRequest specialisation. The previous are exemplary associations for Navigation which may exist.

CalculateGrossAmount may Calculate gross amount of a SupplierInvoice. In some implementations, element TotalGrossAmount can be filled from CalculatedTotalGrossAmount. CalculateTaxAmount can Calculate tax amount of a SupplierInvoice. Element TotalTaxAmount can be filled from CalculatedTotalTaxAmount. FinishDataEntryProcessing can be action declares end of data entry process of SupplierInvoice (in case verification is done by a different user). Block may be an S&AM action and may be set externally for SupplierInvoice. In some implementations, this can be removed externally, not internally by BO. Unblock may be an S&AM action and may release an external block for SupplierInvoice. SubmitForApproval may be an S&AM action and may determine whether an approval may be required and start approval of SupplierInvoice if required. Reject may be an S&AM action and may reject a SupplierInvoice which may be in approval. Approve may be an S&AM action and may approve a SupplierInvoice which may be in approval. SendBackForRevision may be an S&AM action and may be an action that can be triggered when a caller decides that this BO needs to be revised. In some implementations, the BO can be processed afterwards. WithdrawFromApproval may be an S&AM action and may withdraw approval of a SupplierInvoice. Void may be an S&AM action and may void SupplierInvoice for all changes. Post may be an S&AM action and may check whether SupplierInvoice can be posted, and if so, may change the status to "posted" and "instructions to pay issued". This may trigger posting in financial accounting and triggers payment. SubmitForCancellation may be an S&AM action and may submit a SupplierInvoice for cancellation and triggers creation of a correction SupplierInvoice. DiscardCancellation may be an S&AM action and may discard a cancellation process of SupplierInvoice. CompleteCancellation may be an S&AM action and may complete a cancellation process of SupplierInvoice.

In some implementations, ConvertCurrency may change currency of a SupplierInvoice, including a cur-rency conversion. Parameters can be action elements that are defined by data type ProcurementDocu-mentRootConvertCurrencyActionElements. Exemplary elements may include: CurrencyCode, Propose-SupplierInvoiceFromReference, SimulateSupplierInvoiceVerificationException, CreateInvoiceFromRefer-ence, CreateCreditMemoFromReference, CreateSubsequentDebitFromReference, CreateSubsequentCreditFromReference, CheckConsistency. CurrencyCode may be a GDT of type CurrencyCode. CurrencyCode can be target currency. ProposeSupplierInvoiceFromReference can proposes SupplierIn-voice data from referred business transaction documents. SimulateSupplierInvoiceVerificationException can simulate if exceptions will occur after end of data entry of SupplierInvoice. CreateInvoiceFrom-Reference can create a SupplierInvoice with proposal (invoice items) based on supplied reference keys. CreateCreditMemoFromReference can create a SupplierInvoice with proposal (credit memo items) based on supplied reference keys. CreateSubsequentDebitFromReference can create a SupplierInvoice with proposal (subsequent debit items) based on supplied reference keys. CreateSubsequentCreditFrom-Reference can create a SupplierInvoice with proposal (subsequent credit items) based on supplied refer-ence keys. CheckConsistency can check whether SupplierInvoice may be consistent or inconsistent.

In some implementations, QueryByElements can provide a list of some SupplierInvoices, which satisfy selection criteria specified by query elements, combined by logical "AND". If no selection criteria is specified, it may be checked whether query element matches to a corresponding element of Business Object. A Query interface may be defined by data type ProcurementDocumentElementsQueryElements. The following exemplary elements may be used in a SupplierInvoice: SystemAdministrativeData, ID, TypeCode, CreationBusinessPartnerCommonPersonNameGivenName, CreationBusinessPartnerCommonPersonNameFamilyName, LastChangeBusinessPartnerCommonPersonNameGivenName, LastChangeBusinessPartnerCommonPersonNameFamilyName, CancellationDocumentIndicator, DataOriginTypeCode, Name, Date, TransactionDate, ReceiptDate, GrossAmount, CashDiscountTermsFullPaymentEndDate, PartyBillToPartyID, PartyBillFromPartyID, PartySellerPartyID, PartyEmployeeResponsiblePartyID, PartyResponsibleSupplierInvoicingUnitPartyID, PartyEmployeeResponsiblePartyID, Supplier_CommonFormattedName, PartyBuyerPartyID, ItemPartyRequestor PartyID, ItemPartyProductRecipientPartyID, ItemPartyServicePerformerPartyID, ItemLocationShipToLocationID, ItemLocationShipFromLocationID, ItemProductProductID, ItemProductProductSellerID, ItemDescription, ItemProductProductCategoryInternalID, BusinessTransactionDocumentReferencePurchaseOrderID, BusinessTransactionDocumentReferenceGoodsAndServiceAcknowledge-mentID, BusinessTransactionDocumentReferenceConfirmendInboundDeliveryID, BusinessTransactionDocumentReferenceOutboundDeliveryID, BusinessTransactionDocumentReferencePurchasingContractID, BusinessTransactionDocumentReferenceCustomerInvoiceID, BusinessTransactionDocumentReferenceCustomsDutyInvoiceID, BusinessTransactionDocumentReferenceBusinessTransactionDocument-TypeCode, BusinessTransactionDocumentReferenceBusinessTransactionDocumentID, ProcurementDocumentStatus, SupplierInvoiceLifecycleStatusCode, ConsistencyStatusCode, BlockStatusCode, DataEntryProcessingStatusCode, PostingStatusCode, CancellationStatusCode, ApprovalStatusCode, ItemAccountingCodingBlockDistributionItemCostCentreID, ItemAccountingCodingBlockDistributionItemMaterialID, ItemAccountingCodingBlockDistributionItemAccountDeterminationExpenseGroupCode, ItemAccountingCodingBlockDistributionItemProjectReference, SupplierInvoiceVerificationException LifeCycleStatus, SupplierInvoiceVerificationException_ProcessingTypeCode, SupplierInvoiceVerification- Exception_CreationDayNumberValue, SupplierInvoiceVerificationException_ChangeDayNumberValue.

SystemAdministrativeData may be a GDT of type SystemAdministrativeData and may be optional. ID may be a GDT of type BusinessTransactionDocumentID and may be optional. TypeCode may be a GDT of type BusinessTransactionDocumentTypeCode and may be optional. CreationBusinessPartnerCommonPersonNameGivenName may be a GDT of type LANGUAGEINDEPENDENT_MEDIUM_Name and may be optional. CreationBusinessPartnerCommonPersonNameFamilyName may be a GDT of typeLANGUAGEINDEPENDENT_MEDIUM_Name and may be optional. LastChangeBusinessPartnerCommonPersonNameGivenName may be a GDT of type LANGUAGEINDEPENDENT_MEDIUM_Name and may be optional. LastChangeBusinessPartnerCommonPersonNameFamilyName may be a GDT of type LANGUAGEINDEPENDENT_MEDIUM_Name and may be optional. CancellationDocumentIndicator may be a GDT of type Indicator and may be optional. In some implementations CancellationDocumentIndicator may have a qualifier of CancellationDocument. DataOriginTypeCode may be a GDT of type ProcurementDocumentDataOriginTypeCode and may be optional. Name may be a GDT of type MEDIUM_Name and may be optional. Date may be a GDT of type Date and may be optional. TransactionDate may be a GDT of type Date and may be optional. ReceiptDate may be a GDT of type Date and may be optional. GrossAmount may be a GDT of type Amount and may be optional. CashDiscountTermsFullPaymentEndDate may be a GDT of type Date and may be optional. PartyBillToPartyID may be a GDT of type PartyID and may be optional. PartyBillFromPartyID may be a GDT of type PartyID and may be optional. PartySellerPartyID may be a GDT of type PartyID and may be optional. PartyEmployeeResponsiblePartyID may be a GDT of type PartyID and may be optional. PartyResponsibleSupplierInvoicingUnitPartyID may be a GDT of type PartyID and may be optional. PartyEmployeeResponsiblePartyID may be a GDT of type PartyID and may be optional. Supplier_CommonFormattedName may be a GDT of type LANGUAGEINDEPENDENT_LONG_Name and may be optional. PartyBuyerPartyID may be a GDT of type PartyID and may be optional. ItemPartyRequestor PartyID may be a GDT of type PartyID and may be optional. ItemPartyProductRecipientPartyID may be a GDT of type PartyID and may be optional. ItemPartyServicePerformerPartyID may be a GDT of type PartyPartyID and may be optional. ItemLocationShipToLocationID may be a GDT of type LocationID and may be optional. ItemLocationShipFromLocationID may be a GDT of type LocationID and may be optional. ItemProductProductID may be a GDT of type ProductID and may be optional. ItemProductProductSellerID may be a GDT of type ProductPartyID and may be optional. ItemDescription may be a GDT of type Medium_Description and may be optional. ItemProductProductCategoryInternalID may be a GDT of type ProductCategoryInternalID and may be optional. BusinessTransactionDocumentReferencePurchaseOrderID may be a GDT of type BusinessTransactionDocumentID and may be optional. BusinessTransactionDocumentReferenceGoodsAndServiceAcknowledge-mentID may be a GDT of type BusinessTransactionDocumentID and may be optional. BusinessTransactionDocumentReferenceConfirmendInboundDeliveryID may be a GDT of type BusinessTransactionDocumentID and may be optional. BusinessTransactionDocumentReferenceOutboundDeliveryID may be a GDT of type BusinessTransactionDocumentID and may be optional. BusinessTransactionDocumentReferencePurchasingContractID may be a GDT of type BusinessTransactionDocumentID and may be optional. BusinessTransactionDocumentReferenceCustomerInvoiceID may be a GDT of type BusinessTransactionDocumentID and may be optional. BusinessTransactionDocumentReferenceCustomsDutyInvoiceID may be a GDT of type BusinessTransactionDocumentID and may be optional. BusinessTransactionDocumentReferenceBusinessTransaction-DocumentTypeCode may be a GDT of type BusinessTransactionDocumentTypeCode and may be optional. BusinessTransactionDocumentReferenceBusinessTransactionDocumentID may be a GDT of type BusinessTransactionDocumentID and may be optional. ProcurementDocumentStatus may be a Data Type of ProcurementDocumentStatus. SupplierInvoiceLifecycleStatusCode may be a GDT of type SupplierInvoiceLifecycleStatusCode and may be optional. ConsistencyStatusCode may be a GDT of type ConsistencyStatusCode and may be optional. BlockStatusCode may be a GDT of type BlockStatusCode and may be optional. DataEntryProcessingStatusCode may be a GDT of type ProcessingStatusCode and may be optional. PostingStatusCode may be a GDT of type PostingStatusCode and may be optional. CancellationStatusCode may be a GDT of type CancellationStatusCode and may be optional. ApprovalStatusCode may be a GDT of type ApprovalStatusCode and may be optional. ItemAccountingCodingBlockDistributionItemCostCentreID may be a GDT of type OrganisationalCentreID. ItemAccountingCodingBlockDistributionItemMaterialID may be a GDT of type ProductID. ItemAccountingCodingBlockDistributionItemAccountDeterminationExpenseGroupCode may be a GDT of type AccountDeterminationExpenseGroupCode. ItemAccountingCodingBlockDistributionItemProjectRef-erence may be a GDT of type ProjectReference. SupplierInvoiceVerificationExceptionLifeCycleStatus may be a GDT of type SupplierInvoiceVerificationExceptionLifeCycle and may be optional. SupplierInvoiceVerificationException_ProcessingTypeCode may be a GDT of typeBusinessTransactionDocument-ProcessingTypeCode and may be optional. SupplierInvoiceVerificationException_CreationDayNumber-Value may be a GDT of type NumberValue and may be optional. SupplierInvoiceVerificationExcep-tion_ChangeDayNumberValue may be a GDT of type NumberValue and may be optional.

A Party can be a natural or legal person, organization, organizational unit, or group that may be involved in a procurement document ProcurementDocument in a party role. A Party may reference, using inbound aggregation relationship from TO Party, a business partner or one of its specializations (e.g., customer, supplier, employee, or the like) one of following specializations of an organizational center: Company, CostCentre, ReportingLineUnit, and/or FunctionalUnit. A Party may exist without reference to a business partner or an organizational unit. This could be a Casual Party, which can be a party without reference to master data in system. external identifier and description can be contained in business document.

A Party can occur within complete and disjoint specialisations, examples of which may include: A Bill-FromParty can be a party that creates invoice for delivered materials and/or services. This could be supplier or a differing invoicing party. A Contact for a BillFromParty may be available. A BillToParty can be a party to which an invoice for materials or services may be sent. A BuyerParty can be a party that ordered materials or services. A BuyerParty may typically also invoice recipient (BillToParty). A Seller-Party can be a party that sells materials or services. A SellerParty can typically issue invoices too. A Con-tact for SellerParty may be available. A PayeeParty can be a party that receives a payment for invoiced materials and/or services. A PayerParty can be a party that pays for goods or services. A EmployeeRe-sponsibleParty can be a party that may be responsible for invoice verification process. A ResponsibleSupplierInvoicingUnitParty can be a party that may be responsible for processing of supplier invoices. A ProductRecipientParty can be a party to which materials are delivered or for which services are provided. A ServicePerformerParty can be a party that delivers goods or provides services. In some implementations, a Requestor Party could assist in clarifying invoicing disputes. A Requestor Party can be a party that requests procurement of materials or services.

Party may include elements defined by GDT Procurement-Document-PartyElements that may be derived from GDT BusinessTransactionDocumentPartyElements. These elements may include UUID: SupplierInvoiceParty, PartyID, PartyUUID, PartyTypeCode, RoleCategoryCode, RoleCode, Ad-dressReference, and/or DeterminationMethodCode. UUID: SupplierInvoiceParty may be a GDT of type UUID. PartyID may be a GDT of type PartyID (e.g., without additional components, such as sche-meAgencyID and may be optional. PartyID can be identifier of Party in this PartyRole in a business document or master data object. If a business partner or organizational units are referenced, attribute may contains this identifier. PartyUUID may be a GDT of type UUID and may be optional. PartyUUID can be a unique identifier for a business partner, organizational unit, or in specializations. PartyType-Code may be a GDT of type PartyTypeCode and may be optional. PartyTypeCode can be type of busi-ness partner, organizational unit, or in specializations referenced by attribute PartyUUID. RoleCategory-Code may be a GDT of type PartyRoleCategoryCode and may be optional. RoleCategoryCode can be a Party Role Category of Party in business document or master data object. RoleCode may be a GDT of type PartyRoleCode and may be optional. PartyRoleCode can be a Party Role of Party in business document or master data object. AddressReference may be a GDT of type PartyAddressReference and may be optional. AddressReference can be a reference to address of Party. DeterminationMethod-Code may be a GDT of type PartyDeterminationMethodCode and may be optional. Determination-MethodCode can be a coded representation of determination method of Party. A party could be a per-son, organization, or group within or outside of company. In some embodiments, Inheritance may be used for all parties (e.g., parties that are specified at ProcurementDocument_Template level are used for some items if not otherwise specified on item level).

In some implementations, inbound Aggregation Relationships to SupplierInvoice may exist, an example of which may be from business object Party/Node Root. Party may have a cardinality of c:cn and may reference Party in Master Data. Association for Navigation may exist to transformed object UsedAddress/Node Root. UsedAddress may have a cardinality of c:c and can be a transformed object UsedAddress representing a uniform way to access a party address of a procurement document whether it's a busi-ness partner address, a organization center address or an address specified within a procurement docu-ment.

PartyContactParty 284102 can be a natural person or organizational center that can be contacted for a Party. Contact may be a contact person or, for example, a secretary's office. Usually, communication data for contact may be available. Exemplary structure elements may include UUID, PartyID, PartyUUID, Par-tyTypeCode, AddressReference and/or DeterminationMethodCode. UUID may be a GDT of type UUID. UUID can be a globally unique identifier for a contact. PartyID may be a GDT of type PartyID (without additional components, such as schemeAgencyID). PartyID can be an identifier of contact in this Party-Role in business document or master data object. PartyUUID may be GDT of type UUID and may be optional. PartyUUID can be a unique identifier of contact in this PartyRole in business document or master data object. PartyTypeCode may be a GDT of type ContactParty-TypeCode and may be optional. PartyTypeCode can be type of business partner, organizational unit, or in specializations referenced by attribute ContactUUID. AddressReference may be a GDT of type PartyAddressReference and may be optional. AddressReference can be a reference to address of Party. DeterminationMethodCode may be a GDT of type PartyDeterminationMethodCode and may be optional. DeterminationMethodCode can be a coded representation of determination method of contact party.

In some implementations, composition relationships to subordinate nodes may exist, an example of which is with PartyContactPartyAddress (DO) 284104 which may have a cardinality of 1:c. Inbound Aggregation Rela-tionships, an example of which is from business object Party/Node Root. In this relationship, Party may have a cardinality of c:cn and can be a Referenced Contact Party in Master Data. Associations for Navi-gation may exist, an example of which is to transformed object UsedAddress/Node Root. In this association, UsedAddress may have a cardinality of c to cn and may be an address used for the Contact Party.

PartyContactPartyAddress (DO) can be a SupplierInvoice specific address of the Party. PartyAddress (DO) can be a SupplierInvoice specific address of Party. Location may be a physical place, which can be relevant for tax calculation and SupplierInvoice verification. A Location can occur within following specialisations: A ShipToLocation can be place where goods have been delivered or where a service may have been provided; A ShipFromLocation can be a place, from where goods have been delivered.

In some implementations, elements located at a node Location may be defined by data type Procure-mentDocumentLocationElements that may be derived from data type BusinessTransactionDocumentLo-cationElements. Exemplary elements may include UUID, LocationID, LocationUUID, RoleCategoryCode, RoleCode, AddressReference, and/or DeterminationMethodCode. UUID may be GDT of type UUID. In some implementations UUID can have an Alternative Key. UUID can be a globally unique identifier of procurement document location for referencing purposes. LocationID may be a GDT of type LocationID and may be optional. LocationID can be an identifier of referenced Location. LocationUUID may be a GDT of type UUID and may be optional. LocationUUID can be a globally unique identifier of Location referenced. RoleCategoryCode may be a GDT of type LocationRoleCategoryCode. RoleCategoryCode can be a coded representation of Location role category in procurement document. RoleCode may be a GDT of type Location-RoleCode. RoleCode can be a coded representation of Location role in procure-ment document. AddressReference may be a GDT of type LocationAddressReference and may be op-tional. AddressReference can be a reference to address of Location. DeterminationMethodCode may be a GDT of type LocationDeterminationMethodCode and may be optional. DeterminationMethodCode cane be a coded representation of determination method of Location.

In some implementations, composition relationships to subordinate nodes may exist, an example of which is LocationAddress (DO) 284114 which may have a cardinality of 1 to c. Inbound Aggregation Relationships may exist, an example of which is from the business object Location. In this relationship, Location may have a cardinality of c:cn and PartyAddressInformation may have a cardinality of c:cn. Associations for Naviga-tion may exist, an example of which is UsedAddress which may have a cardinality of c:c and the trans-formed object UsedAddress may represent a uniform way to access a location address of a procure-ment document whether it's a business partner address, a organization center address or an address specified within a procurement docu-ment.

LocationAddress (DO) can be a SupplierInvoice specific address of Location. CashDiscountTerms (DO) can be modalities agreed on by business partners of a procurement document for payment of goods delivered or services pro-vided. These modalities may consist of incremental payment periods and cash discounts that are allowed when payment is made within one of these periods. CashDiscountTerms can be used to define terms of payment, for example, for a purchase order or invoice issue for goods and services. PaymentCon-trol (DO) can be an agreement between a company and a business partner on processing payments for an individual procurement document. ProcurementDocument can be used to determine instructions on payment processing, such as an individual order or invoicing for goods and services. In con-trast, a PaymentAgreement may determine possible payment methods and bank ac-counts or credit cards that could be used between a company and a business partner, regardless of business transaction. Payments agreed in ProcurementDocu-ment may be the same in characteristics payment method, execution date, payer party and payee party.

In some embodiments, ExchangeRate may be representa-tion of an exchange rate between SupplierInvoice currency and a second currency (e.g. currency of purchase order) at a defined quotation date and time which can be different from the current exchange rate.

In some implementations, ExchangeRate may include ele-ments that may be defined by data type: Pro-curementDocu-mentExchangeRateElements that may be derived from data type BusinessTransaction-DocumentExchangeRateEle-ments. Exemplary elements may include: ExchangeRate, which may be the exchange rate information for SupplierIn-voice and/or FixedIndicator. Exchange rate can be specified if products ordered are settled in a currency that is different from currency in purchase order. This may be the case with collective invoices, for example. Note that the leading cur-rency may correspond to the Cur-rencyCode in SupplierIn-voice (root node). ExchangeRate may be a GDT of type ExchangeRate. Fixed-Indicator may be a GDT of type Fixed-Indicator. FixedIndicator can indicates whether a specified ex-change rate is fixed for follow up business transaction documents (e.g. PaymentDue) or not. The ex-change rate may be calculated using the formula: 1 UnitCurrency=Rate*QuotedCurrency. A Supplier-Invoice was received with currency Dollar. A different currency may be used for payment. The exchange rate between invoice and payment currency should therefore be specified for Business Object PaymentDue.

TaxCalculation (DO) can be a summary of determined tax components for procurement docu-ment.ProcurementDocu-ment. BusinessTransactionDocumentReference may be a unique reference to another business transaction document or an item which may be related to SupplierInvoice. A Business-TransactionDocumentReference can occur within the follow-ing specialisations: A PurchasingContrac-tReference can be a reference to PurchasingContract that holds agreed conditions between purchaser (BuyerParty) and supplier (SellerParty), which need to be considered during SupplierInvoice verifica-tion. A PurchaseOrderReference can be a reference to Pur-chaseOrder that requested invoiced materials and services. a confirmedInboundDeliveryReference may be a reference to ConfirmedInboundDelivery that contains actual received materials. An OutboundDeliveryReference can be a reference to OutboundDelivery that contains actual delivered materials. A GoodsAndServiceAcknowledgementReference can be a reference to GoodsAndServiceAcknowledgement that con-tains actual received materials and services. A CustomerIn-voiceReference may be reference to CustomerInvoice that can be used to charge a customer (BillToParty or BuyerParty respectively) for delivered materials and services. A Cus-tomsDutyInvoiceReference can be a reference to Customs-DutyInvoice that states purchaser's obligation to pay customs duty and/or product tax on import to a customs authority for import of goods or services rendered. A PurchaseOrder-BasedSupplierInvoiceRequestReference can be a reference to SupplierIn-voiceRequest that holds all necessary Pur-chaseOrder information for SupplierInvoice verification. A Con-firmedInboundDeliveryBased-SupplierInvoiceRequestReference can be a reference to Sup-plierIn-voiceRequest that holds all necessary ConfirmedIn-boundDelivery information for SupplierInvoice verifica-tion. A GoodsAndServiceAcknowledge-mentBasedSupplierInvoiceRequestReference can be a refer-ence to SupplierInvoiceRequest that holds all necessary GoodsAndServiceAcknowledgement information for Sup-plierInvoice verification. A PurchasingContractBasedSup-plierInvoiceRequestReference may be a reference to Suppli-erInvoiceRequest that holds all necessary PurchasingContract information for Sup-plierInvoice verifi-cation. An OriginSupplierInvoiceReference can be a refer-ence to SupplierInvoice that was issued in a previous process step. This reference can only be used if SupplierInvoice rep-resents a cancellation, a credit memo, a subsequent invoice or credit. An SupplierInvoiceVerificationExceptionRef-erence can be a reference to SupplierInvoiceVerificationException that was issued during invoice verifi-cation process. A Deliv-eryBasedSupplierInvoiceRequestReference can be a refer-ence to SupplierIn-voiceRequest that holds all necessary Delivery information (GoodsAndServiceAcknowledgement or ConfirmendInboundDelivery) for SupplierInvoice verifi-cation.

BusinessTransactionDocumentReference includes the fol-lowing elements that are defined by GDT: ProcurementDocu-mentBusinessTransactionDocumentReferenceElements that can be derived from GDT BusinessTransactionDocumen-tReferenceElements. These include the following elements: Business-TransactionDocumentReference, BusinessTrans-actionDocumentRoleCode and BusinessTransaction-Docu-mentDataProviderIndicator. BusinessTransactionDocumen-tReference may be a GDT of type Busi-nessTransactionDocumentReference. BusinessTransactionDocumentReference can be a unique refer-ence to referred business transaction document. Fur-thermore, it may be possible to have a reference to a line item within business transaction document. BusinessTransaction-DocumentRoleCode is a GDT of type BusinessTransaction-DocumentReferenceRoleCode. BusinessTransactionDocu-mentRoleCode can be a coded representation of role of a BusinessTransactionDocument in this reference. Busi-nessTransactionDocumentDataProviderIndicator is a GDT of type Indicator. In some implementations Business-Trans-actionDocumentDataProviderIndicator may have a qualifier of DataProvider. BusinessTransac-tionDocumentDataProviderIndicator can be a coded representation of role of a BusinessTransaction-Document in this reference.

In some implementations, associations for navigation may exist, examples of which follow: from the busi-ness object PurchasingContractPurchasingContract which may have a cardinality of c:cn and can be a SupplierInvoice may refer to a PurchasingContract; from the business object PurchaseOrder which may have a cardinality of c:cn and can be a SupplierInvoice may refer to a PurchaseOrder; from the business object ConfirmedInboundDelivery which may have a cardinality of c:cn and can be a SupplierInvoice may refer to a confirmedInboundDelivery; from the business object OutboundDelivery which may have a cardinality of c:cn and can be a SupplierInvoice may refer to an OutboundDelivery; from the business object GoodsAndServiceAcknowledgement may have a cardinality of c:cn and can be a SupplierInvoice may refer to a GoodsAndServiceAcknowledgement; and/or from the business object CustomerInvoice which may have a cardinality of c:cn and can be a SupplierInvoice may refer to a CustomerInvoice.

In some implementations, Inbound Association Relationships may exist, examples of which are: from the business object SupplierInvoiceRequest which may have a cardinality of c:cn and can be a SupplierInvoice may refer to a SupplierInvoiceRequest; from the business object SupplierInvoice which may have a cardinality of c:cn and can be a SupplierInvoice may refer to another SupplierInvoice; and/or from the business object SupplierInvoiceVerificationException which may have a cardinality of c:cn and can be a SupplierInvoiceVerificationException which may refer to a SupplierInvoiceVerificationException.

AttachmentFolder (DO) can be a folder of some documents attached to procurement document. TextCollection (DO) can be a collection of some textual descriptions which are related to procurement document. Each text can be specified in different languages and can include formatting information. A BusinessProcessVariantType may define a character of a business process variant of procurement document. It represents a typical way of processing of a procurement document within a process compo-nent from a business point of view. In some embodiments, BusinessProcessVariantType can occur within specialisation MainBusinessProcessVariantType. A Business Process Variant can be a configura-tion of a Process Component. A Business Process Variant can belong to one process component. A process component can be a software package that realizes a business process and exposes its func-tionality as services. Exemplary functionality contains business transactions. A process component may contain one or more semantically related business objects. A business object can belong to one process component.

In some implementations, elements located at node BusinessProcessVariantType may be defined by data type ProcurementDocumentBusinessProcessVariantTypeElements. Exemplary elements may in-clude: BusinessProcessVariantTypeCode and/or MainIndicator. BusinessProcessVariantTypeCode may be a GDT of type BusinessProcessVariantTypeCode. BusinessProcessVariantTypeCode can be a BusinessProcessVariantTypeCode and may be a coded representation of a business process variant type of a procurement document business process variant type. MainIndicator may be a GDT of type Indicator. In some implementations MainIndicator may have a qualifier of Main. MainIndicator can indicate whether current business process variant type is main one or not. In some implementations, one instance of BusinessProcessVariantType may be allowed to be indicated as main.

AccessControlList (DO) can be a list of access groups that have access to entire procurement document during a validity period. AccessControlList can be used to control access to procurement document instances.

In some implementations, an Item specifies invoiced or credited amounts and taxes for quantity of a product, service or free text item that may have been delivered or for a service that may have been ren-dered by a supplier (SellerParty or ServicePerformerParty respectively). For Item (compared to informa-tion of SupplierInvoice) deviating parties, locations, and delivery terms may be defined. Item can contain references to or business documents that are relevant for item. Notes and/or attachments can also be specified for item.

In some implementations, elements located at node Item are defined by data type: ProcurementDocumentItemElements. Elements of this data type may be used in a SupplierInvoice. Exemplary elements may include: SystemAdministrativeData, UUID, ID, and/or TypeCode. SystemAdministrativeData is a GDT of type SystemAdministrativeData. SystemAdministrativeData can be a administrative data stored within system and may contain system users and time of change. UUID is a GDT of type UUID. In some implementations UUID can have an Alternative Key. UUID can be a universal unique alternative identifier of Item for referencing purposes. ID is a GDT of type BusinessTransactionDocumentItemID. ID can be an identifier for an Item assigned by BillToParty. TypeCode is a GDT of type BusinessTransactionDocumentItemTypeCode. TypeCode can be a coded representation of Item type (e.g., invoice item 284090/credit memo item 284092/subsequent debit item 284094/subsequent credit item 284096). In some implementations, invoices that contain errors can either be canceled completely and get reissued, or adjusted using debit and credit amounts in another invoice. In this case, only the difference amount required to correct financial data are transferred and not, for example, new absolute values for a product per price unit of measure. It is also important to note that amount to be settled in a subsequent credit or debit item cannot be offset against an open purchase order or delivery quantity.

In some implementations, a HierarchyRelationship may be a relationship between a subitem and a higher-level parent item in an item hierarchy. It may include elements that are defined by GDT: Procure-mentDocumentItemHierarchyRelationship. Exemplary elements may include: ParentItemUUID, Type-Code, Description, DeliveryPeriod, Quantity, QuantityTypeCode, NetAmount and/or NetUnitPrice. Paren-tItemUUID may be a GDT of type UUID. ParentItemUUID can be a universal unique identifier for parent SupplierInvoiceItem. TypeCode may be a GDT of type BusinessTransactionDocumentItemHierarchy-RelationshipTypeCodeContent. TypeCode can be a coded representation of type of hierarchical rela-tionship between subitem and its higher-level parent item. Description may be a GDT of type MEDIUM_Description and may be optional. Description can be description of item. DeliveryPeriod may be a GDT of type UPPEROPEN_LOCALNORMALI-SED_DateTimePeriod and may be optional. DeliveryPeriod can be a delivery date for invoiced products or timeframe for rendered services. Quantity may be a GDT of type Quantity and may be optional. Quantity can be an invoiced quantity. Quanti-tyTypeCode may be a GDT of type QuantityTypeCode and may be optional. QuantityTypeCode can be a coded representation of a type of quantity. NetAmount may be a GDT of type Amount and may be optional. NetAmount can be a net amount of Item. NetUnitPrice may be a GDT of type Price and may be optional. NetUnitPrice can be a net price for base quantity of a product, which may have been used for calculation for net amount.

In some implementations, composition relationships to subordinate nodes exist, examples of which (with their possible cardinality relationships) are: ItemProduct 284098, which may have a cardinality of 1:c; ItemAc-countingCodingBlockDistribution (DO) 284132, which may have a cardinality of 1:c; ItemParty 284108, which may have a cardinality of 1:cn; ItemLocation 284116, which may have a cardinality of 1:cn; ItemBusinessTransactionDocu-mentReference 284136, which may have a cardinality of 1:cn; ItemAttachmentFolder (DO) 284144, which may have a cardinality of 1:c; ItemTextCollection (DO) 284146, which may have a cardinality of 1:c; ItemBusinessProcessVariantType 284130, which may have a cardinality of 1:cn.

In some implementations, inbound Aggregation Relationships may exist, examples of which may include: From node Item and/or from business object Identity. Exemplary relationships from node Item may include ParentItem, which may have a cardinality of c to cn and can be an association to a Item itself, which may be a relationship between a subitem and a higher-level parent item in an item hierarchy. This may enables item hierarchies to be mapped. hierarchies are mapped using elements HierarchyRelationshipTypeCode and ParentItemID. Exemplary relationships from business object Identity may include: CreationIdentity, which may have a cardinality of 1:cn and can be an identity that created procurement document; and/or LastChangeIdentity, which may have a cardinality of c:cn and can be an identity that changed procurement document in last time.

In some implementations, associations for Navigation may exist, examples of which may include: To node Item, To transformed object BusinessDocumentFlow, To node TaxCalculationItem, To node ItemParty, To node and/or ItemBusinessTransactionDocumentReference. Exemplary associations to node Item may include: ChildItem, which may have a cardinality of c:cn, may be a Child item in an item hierarchy, and may be necessary in order to create item hierarchies; BusinessDocumentFlow may have a cardinality of c:c, may be an association to a BusinessDocumentFlow which can be a view on a set of some preceding and succeeding business (transaction) documents for a current procurement document.

Exemplary associations to node TaxCalculationItem may include: TaxCalculationItem, which may have a cardinality of 1:1 and can be an association to Item within a dependent object TaxCalculation.

Exemplary associations to node ItemParty may include: ProductRecipientItemParty, which may have a cardinality of c:c and may be an association to a Party which appears within ProductRecipientParty spe-cialisation; ServicePerformerItemParty, which may have a cardinality of c:c and may be an association to a Party which appears within ServicePerformerParty specialisation; and/or RequestorItemParty, which may have a cardinality of c:c and can be an association to a Party which appears within Requestor Party specialisation.

Exemplary associations to node ItemLocation may include: ShipToItemLocation, which may have a cardi-nality of c:c and can be an association to a Location which appears within ShipToLocation specialisation; and/or ShipFromItemLocation, which may have a cardinality of c:c and can be an association to a Loca-tion which appears within ShipFromLocation specialisation.

Exemplary associations to node ItemBusinessTransactionDocumentReference may include: ItemPur-chasingContractItemReference, which may have a cardinality of c:c and can be an association to a Busi-nessTransactionDocumentReference which appears within a PurchasingContract specialisation; ItemBasePurchaseOrderItemReference, which may have a cardinality of c:c and can be an association to a BusinessTransactionDocumentReference which appears within a PurchaseOrder specialisation; ItemBaseConfirmedInboundDeliveryItemReference, which may have a cardinality of c:c and can be an association to a BusinessTransactionDocumentReference which appears within a ConfirmedInboundDelivery specialisation; ItemOutboundDeliveryItemReference, which may have a cardinality of c:c and can be an association to a BusinessTransactionDocumentReference which appears within a OutboundDelivery specialisation; ItemBaseGoodsAndServiceAcknowledgementItemReference, which may have cardinality of c:c and can be an association to a BusinessTransactionDocumentReference which appears within a GoodsAndServiceAcknowledgement specialisation; ItemCustomerInvoiceItemReference, which may have a cardinality of c:c and can be an association to a BusinessTransactionDocumentReference which appears within CustomerInvoice specialisation; ItemCustomsDutyInvoiceItemReference, which may have a cardinality of c:c and can be association to a BusinessTransactionDocumentReference which appears within a CustomsDutyInvoice specialisation; ItemPurchaseOrderBasedSupplierInvoiceRequestItemReference, which may have a cardinality of c:c and can be an association to a business transaction document reference which appears with in a PurchaseOrderBasedSupplierInvoiceRequest specialisation; ItemConfirmedInboundDeliveryBasedSupplierInvoiceRequestItemReference, which may have a cardinality of c:c and can be an association to a business transaction document reference which appears within ConfirmedInboundDeliveryBasedSupplierInvoiceRequest specialisation; ItemGoodsAndServiceAcknowledgementBasedSupplierInvoiceRequestItemReference, which may have a cardinality of c:c and can be an association to a business transaction document reference which appears within a GoodsAndServiceAcknowledgementBasedSupplierInvoiceRequest specialisation.

ItemPurchasingContractBasedSupplierInvoiceRequestItemReference may have a cardinality of c:c and can be an association to a business transaction document reference which appears within Purchasing-ContractBasedSupplierInvoiceRequest specialisation.

ItemOriginSupplierInvoiceItemReference may have a cardinality of c:c and can be an association to a BusinessTransactionDocumentReference which appears within SupplierInvoiceRequest specialisation.

ItemSupplierInvoiceVerificationExceptionReference may have a cardinality of c:c and can be an associa-tion to a BusinessTransactionDocumentReference which appears within SupplierInvoiceVerificationEx-ception specialisation; MainItemBusinessTransactionDocumentReference, which may have a cardinality of c:c and can be an association to a BusinessTransactionDocumentReference which appears within MainBusinessTransactionDocument specialisation; and/or ItemDeliveryBasedSupplierInvoiceReques-tItemReference, which may have a cardinality of c:c and can be an association to a BusinessTransac-tionDocumentReference which appears within DeliveryBasedSupplierInvoiceRequest specialisation.

In exemplary implementations, Copy may duplicate selected items and proposes the duplicate as addi-tional SupplierInvoiceItems.

In some implementations, ItemProduct can be the identification, description and classification of a product within Item. ItemProduct may include the following exemplary elements that are defined by GDT: ProcurementDocumentItemProductElements that may be derived from GDT BusinessTransactionDocumentProductElements. Exemplary elements may include: ProductUUID, ProductID, ProductStandardID, ProductBillFromID, ProductTypeCode, ProductCategoryUUID, ProductCategoryInternalID, ProductCategoryStandardID, ProductCatalogueReference, and/or CashDiscountDeductibleIndicator. ProductUUID may be a GDT of type UUID and may be optional. ProductUUID can be a universal unique identifier for a product. ProductID may be a GDT of type ProductID and may be optional. ProductID can be a proprietary identifier for a product. ProductStandardID may be a GDT of type ProductStandardID and may be optional. ProductTypeCode may be a GDT of type ProductTypeCode and may be optional. ProductTypeCode can be a coded representation of type of a product and may differ from associated product type. ProductCategoryUUID may be a GDT of type GUID and may be optional. ProductCategoryUUID can be a universal unique identifier for a product category. ProductCategoryInternalID may be a GDT of type ProductCategoryInternalID and may be optional. ProductCategoryInternalID can be a Proprietary identifier for a product category. ProductCategoryStandardID may be a GDT of type ProductCategoryStandardID and may be optional. ProductCategoryStandardID can be a standardized identifier for a product category. ProductCatalogueReference may be a GDT of type CatalogueReference and may be optional. ProductCatalogueReference can be a unique reference to a catalogue or to an object within a catalogue. CashDiscountDeductibleIndicator may be a GDT of type Indicator and may be optional. In some implementations CashDiscountDeductibleIndicator may have a qualifier of CashDiscountDeductable. CashDiscountDeductibleIndicator can be an indicator that cash discount may be deducted for this product.

In some implementations, a product category can be a division of products according to objective criteria. A product category may be automatically derived from Material or ServiceProduct if product identification may be specified. A Material or ServiceProduct may also be specified by natural linguistic text. In this case a ProductCategory may be assigned manually.

In some implementations, inbound Association Relationships may exist, examples of which may include from the business object Material, where Material may have a cardinality of c:cn and the SupplierIn-voiceItemProduct may represent the Product specialisation Material if a ProcurementDocumentItem con-tains a Material; from the business object ServiceProduct, where ServiceProduct may have a cardinality of c:cn and may be SupplierInvoiceItemProduct may represent Product specialisation ServiceProduct if a ProcurementDocumentItem contains a ServiceProduct; and/or from the business object ProductCate-goryHierarchy/node ProductCategory, where ProductCategoryHierarchyProductCategory may have a cardinality of c:cn and the SupplierInvoiceItemProduct may represent a ProductCategory that classifies invoiced Material or ServiceProduct.

In some implementations, ItemAccountingCodingBlockDistribution (DO) can be distribution of value changes from a procurement document item to coding blocks, whereby distribution may occur on basis of amounts, quantities, or percentages. A coding block can be a set of accounting objects of different types. An accounting object can be a business object to which value changes from business transactions are assigned in Accounting.

In some implementations, ItemParty can be a party, which can be involved in a SupplierInvoiceItem. A ItemParty can be a business partner in specialisation Employee. A ItemParty can occur within the following exemplary specialisations: ProductRecipientParty, ServicePerformerParty, and/or Requestor Party. A ProductRecipientParty can be a party to which materials are delivered or for which services are provided. ProductRecipientParty can be relevant for tax calculation and for clarification of invoicing disputes, because it can provide information about delivered materials or services. A ServicePerformerParty can be a party that delivers goods or provides services. A ServicePerformerParty could help to clarify invoicing disputes. A Requestor Party can be a party that requests procurement of materials or services. A Requestor Party could help to clarify invoicing disputes.

In some implementations, composition relationships to subordinate nodes may exist, an example of which is ItemPartyAddress (DO) 284110 which may have a cardinality relationship of 1 to c. Inbound Aggregation Relationships from business object Party/Node Root may exist, where Party may have a cardinality of c:cn and can be referenced Party in Master Data. Associations for Navigation may exist, an example of which is to transformed object UsedAddress/node Root where UsedAddress may have a cardinality of c:c and transformed object UsedAddress may represent a uniform way to access a party address of a procurement document whether it's a business partner address, a organization center address or an ad-dress specified within a procurement document.

In some implementations, ItemPartyAddress (DO) can be a SupplierInvoice specific address of Item-Party. ItemLocation may be a physical or logical place, which may be relevant for procurement docu-ment item. Location may occur in the following complete and disjoint specialisations: ShipFromItemLoca-tion and/or ShipToItemLocation. The elements located at node ItemLocation may be defined by data type: ProcurementDocumentItemLocationElements that can be derived from data type BusinessTransac-tionDocumentLocationElements.

In some implementations, composition relationships to subordinate nodes exist, examples of which are: LocationAddress (DO), which may have a cardinality of 1:c; and/or from the business object Location where Location may have a cardinality of c:cn and PartyAddressInformation may have a cardinality of c:cn.

Associations for Navigation may exist where UsedAddress may have a cardinality of c:c and can be transformed object UsedAddress represents a uniform way to access a location address of a procure-ment document whether it's a business partner address, a organization center address or an address specified within a procurement document.

ItemLocationAddress (DO) 284118 can be a SupplierInvoice specific address of ItemLocation. ItemBusiness-TransactionDocumentReference may be a unique reference to another business transaction document and its item which may be related to Item. An ItemBusinessTransactionDocumentReference can occur within following specialisations: A PurchasingContractReference can be a reference to PurchasingCon-tract and its item that holds agreed conditions between purchaser (BuyerParty) and supplier (Seller-Party), which need to be considered during SupplierInvoice verification; A PurchaseOrderReference can be a reference to PurchaseOrder and its item that requested invoiced materials and services; A ConfirmedInboundDeliveryReference can be a reference to ConfirmedInboundDelivery and its item that con-tains actual received materials; An OutboundDeliveryReference can be a reference to OutboundDelivery and its item that contain actual delivered materials; referring to ItemBaseGoodsAndServiceAcknowl-edgementItemReference, a GoodsAndServiceAcknowledgementReference can be a reference to GoodsAndServiceAcknowledgement and its item that contains actual received materials and services; referring to ItemCustomerInvoiceItemReference, a CustomerInvoiceReference can be reference a to Cus-tomerInvoice and its item that may be used to charge a customer (BillToParty or BuyerParty respectively) for delivered materials and services; A referring to ItemCustomsDutyInvoiceItemReference, a Customs-DutyInvoiceItemReference can be a reference to CustomsDutyInvoiceItem that states purchaser's obli-gation to pay customs duty and/or product tax on import to a customs authority for import of goods or services rendered; referring to ItemPurchaseOrderBasedSupplierInvoiceRequestItemReference, a PurchaseOrderBasedSupplierInvoiceRequestItemReference can be a reference to SupplierInvoiceReques-tItem that holds all necessary PurchaseOrderItem information for SupplierInvoice verification; referring to ItemConfirmedInboundDeliveryBasedSupplierInvoiceRequestItemReference, a ConfirmedInboundDeliveryBasedSupplierInvoiceRequestItemReference can be a reference to Supplier-InvoiceRequestItem that holds some necessary ConfirmedInboundDeliveryItem information for Supplier-Invoice verification; referring to ItemGoodsAndServiceAcknowledgementBasedSupplierInvoiceRequestItemReference, a GoodsAndServiceAcknowledgementBasedSupplierInvoiceRequestItemReference can be a reference to SupplierIn-voiceRequestItem that holds some necessary GoodsAndServiceAcknowledgementItem information for SupplierInvoice verification; referring to ItemPurchasingContractBasedSupplierInvoiceRequestItemRefer-ence, a PurchasingContractBasedSupplierInvoiceRequestItemReference can be a reference to SupplierInvoiceRequestItem that holds some necessary PurchasingContractItem information for SupplierInvoice verification; referring to ItemOriginSupplierInvoiceItemReference, a OriginSupplierInvoiceItemReference can be a reference to SupplierInvoiceItem that was issued in a previous process step. This reference may be used if SupplierInvoice represents a cancellation, a credit memo, a subsequent invoice or credit; referring to ItemSupplierInvoiceVerificationExceptionReference, a SupplierInvoiceVerificationExceptionItemReference can be a reference to SupplierInvoiceVerificationException that was issued during in-voice verification process; referring to MainItemBusinessTransactionDocumentItemReference, a MainBusinessTransactionDocumentItemReference can be a Reference to a SupplierInvoiceItem that can be main reference for invoice verification process; referring to ItemDeliveryBasedSupplierInvoiceReques-tItemReference, a ItemDeliveryBasedSupplierInvoiceRequestItemReference can be a Reference to SupplierInvoiceRequestItem that holds some necessary DeliveryItem (GoodsAndServiceAcknowledgemen-tItem or ConfirmendInboundDeliveryItem) information for SupplierInvoice verification.

ItemBusinessTransactionDocumentReference includes following elements that can be defined by GDT: ProcurementDocumentItemBusinessTransactionDocumentReferenceElements that can be derived from GDT BusinessTransactionDocumentReferenceElements. se elements include BusinessTransactionDocumentReference, BusinessTransactionDocumentRoleCode and BusinessTransactionDocumentDataProviderIndicator. BusinessTransactionDocumentReference may be a GDT of type BusinessTransactionDocumentReference. BusinessTransactionDocumentReference can be a unique reference to referred business transaction. document. Furthermore, it may be possible to have a reference to a line item within business transaction document. BusinessTransactionDocumentRoleCode may be a GDT of type BusinessTransactionDocumentReferenceRoleCode. BusinessTransactionDocumentRoleCode can be a coded representation of role of a BusinessTransactionDocument in this reference. BusinessTransactionDocumentDataProviderIndicator may be a GDT of type Indicator. In some implementations BusinessTransactionDocumentDataProviderIndicator may have a qualifier of DataProvider. BusinessTransactionDocumentDataProviderIndicator can be a coded representation of role of a BusinessTransactionDocument in this reference.

PurchasingContractItem may have a cardinality of c:cn and can be a Item may refer to a PurchasingCon-tractItem.

PurchaseOrderItem may have a cardinality of c:cn and can be a Item may refer to a PurchaseOrderItem.

ConfirmedInboundDeliveryItem may have a cardinality of c:cn and may be a Item may refer to a con-firmedInboundDeliveryItem.

OutboundDeliveryItem may have a cardinality of c:cn and may be a Item may refer to an OutboundDe-liveryItem.

GoodsAndServiceAcknowledgementItem may have a cardinality of c:cn and may be a Item may refer to a GoodsAndServiceAcknowledgementItem.

CustomerInvoiceItem may have a cardinality of c:cn and may be a Item may refer to a customerIn-voiceItem.

SupplierInvoiceRequesItem may have a cardinality of c:cn and may be a Item may refer to a Supplier-InvoiceRequestItem. SupplierInvoiceItem may have a cardinality of c:cn and may be a Item may refer to a SupplierInvoiceItem. SupplierInvoiceVerificationException may have a cardinality of c:cn and may be a Item may refer to a SupplierInvoiceVerificationException.

ItemAttachmentContainer (DO) can be a folder of all documents attached to procurement document item.

ItemTextCollection (DO) can be a collection of all textual descriptions which are related to procurement document item. Each text can be specified in different languages and can include formatting information.

An ItemBusinessProcessVariantType defines character of a business process variant of procurement document item. It represents a typical way of processing of a procurement document item within a process component from a business point of view.

Elements located at node ItemBusinessProcessVariantType may be defined by data type: Procurement-DocumentItemBusinessProcessVariantTypeElements. Exemplary elements include: BusinessProcess-VariantTypeCode and MainIndicator. BusinessProcessVariantTypeCode may be a GDT of type Busi-nessProcessVariantTypeCode. BusinessProcessVariantTypeCode can be a coded representation of a business process variant type of a procurement document business process variant type. MainIndicator may be a GDT of type Indicator. In some implementations MainIndicator may have a qualifier of Main.

MainIndicator can be an indicator that specifies whether current business process variant type may be main one or not. In some implementations there may be one instances of BusinessProcessVariantType may be allowed to be indicated as main.

The SupplierInvoice can state the recipient's, e.g. the purchaser's, obligation to pay the supplier for goods received or services rendered. The extension of SupplierInvoice can capture additional information regarding the legally required document number on an invoice which shall be sequential, chronological and without gaps. This number can be required for reporting to the authorities (e.g. tax authority). In some implementations, an invoice is typically created after the goods and service acknowledgment has been confirmed. The Business Object SupplierInvoice can be part of the Process Component Supplier Invoice Processing in the Deployment Unit Supplier Invoicing. The data type enhancements can be part of Globalisation layer.

SupplierInvoiceProcessingInvoiceAccountingNotificationOut

The Service Interface Invoice Accounting Notification Out Interface can be part of the following Process Integration Model: Supplier Invoice Processing Accounting.

The Invoice Accounting Notification Out Interface can be a grouping of operations which notifies financial accounting about a Supplier Invoice.

SupplierInvoiceProcessingInvoiceAccountingNotificationOut NotifyOfInvoice

The operation Notify of SupplierInvoice can notify financial accounting about accounting relevant SupplierInvoice information. The operation can be based on message type InvoiceAccountingNotification (Derived from Business Object AccountingNotification). InvoiceAccountingNotification can contain information about the accounting objects to be charged. This message can be sent whenever a Supplier Invoice is posted.

The extension of the operation Notify of Invoice can capture additional information which is required for legal accounting purposes in Italy, France and China. In some implementations, the legal requirement is LegallyRequiredSupplierInvoiceID should be reported in the Document Journal report. Based on this requirement, the extension to Accounting from Supplier Invoicing is done.

The elements of the Invoice Accounting Notification can be defined by the data type: InvoiceAccountingNotification. The Invoice Accounting Notification enhancement can be defined by the data type: InvoiceAccountingNotificationLegalIDExtensionElements. These elements can include: 1) LegallyRequiredSupplierInvoiceID can be optional. LegallyRequiredSupplierInvoiceID can be of GDT type BusinessTransactionDocumentID. 2) LegallyRequiredSupplierInvoiceDate can be optional. LegallyRequiredSupplierInvoiceDate can be of GDT type Date.

SupplierInvoiceProcessingReceivablesPayablesOut

The Service Interface Receiveables Payables Out Interface can be part of the following Process Integration Model: Supplier Invoice Processing Due Item Processing.

The Receivables Payables Out Interface can be a grouping of operations which notifies Due Item Processing, e.g. financial operations, about a Supplier Invoice.

SupplierInvoiceProcessingReceivablesPayablesOut.NotifyOfInvoice

The operation Notify of Invoice can notify the financial operations about payments due and tax due. The operation can be based on message type ReceiveablesPayablesNotification, for example derived from Business Objects TradeReceiveablesPayablesRegister and TaxReceiveablesPayablesRegister.

The extension of the operation Notify of Invoice can captures additional information which is legally required for reporting to tax authorities in Italy, France and China.

The elements of the Receivables Payables Notification can be defined by the data type: ReceivablesPayablesNotificationReceivablesPayables. The Receivables Payables Notification enhancement can be defined by the data type: ReceivablesPayablesNotificationReceivablesPayablesLegalIDExtensionElements. These elements can include: 1) LegallyRequiredSupplierInvoiceID can be optional. LegallyRequiredSupplierInvoiceID can be of GDT type BusinessTransactionDocumentID. 2) LegallyRequiredSupplierInvoiceDate can be optional. LegallyRequiredSupplierInvoiceDate can be of GDT type Date.

The SupplierInvoice can include detail information about claims or liabilities for delivered goods and rendered services between a BillFromParty and a BillToParty.

The SupplierInvoice can be extended with additional elements regarding the legally required document number and date which are required in order to fulfill legal regulatory compliance of China, France and Italy.

The elements located at the node SupplierInvoice can be defined by the data type: SupplierInvoiceElements. The SupplierInvoice enhancement can be defined by the data type: SupplierInvoiceLegalIDExtensionElements. These elements can include: 1) LegallyRequiredSupplierInvoiceID can be optional. A LegallyRequiredSupplierInvoiceID can be a unique identifier for a Supplier Invoice which meets the requirements of legal authorities. In some implementations, the requirements for the procedure of generating a legal identifier depends on the country legislation. LegallyRequiredSupplierInvoiceID can be of GDT type BusinessTransactionDocumentID. The LegallyRequiredSupplierInvoiceID can contain a number that a company has to maintain because of country-specific legal requirements. This legal number is typically sequential, chronological and without gaps. Difference between SupplierInvoiceID and LegallyRequiredSupplierInvoiceID. The SupplierInvoiceID can be an identifier for the supplier invoice on the entry into the system whereas the LegallyRequiredSupplierInvoiceID can be an identifier to the Supplier Invoice which is generated when the document is posted (when the action 'post' is executed). The LegallyRequiredSupplierInvoiceID may not be generated when the document is parked. Additionally the LegallyRequiredSupplierInvoiceID shall be sequential, chronological and without gaps. This number can be used for reporting to the Tax authorities. 2) LegallyRequiredSupplierInvoiceDate can be optional. A LegallyRequiredSupplierInvoiceDate can be a Identifier that captures the date when the LegallyRequiredSupplierInvoiceID for a Supplier Invoice was generated. The LegallyRequiredSupplierInvoiceDate can be of GDT type Date. The LegallyRequiredSupplierInvoiceDate can be used for maintaining legal requirements (chronological, sequential).

In some implementations, all the other nodes of the Business object SupplierInvoice remain unchanged, i.e. it's no enhancement for legal identification compliance necessary.

FIG. 285-1 through 285-4 illustrates one example logical configuration of BusinessTransactionDocumentImageRecognitionRequestMessage message 285000. Specifically, this figure depicts the arrangement and hierarchy of various components such as one or more levels of packages, entities, and datatypes, shown here as 285000 through 285070. As described above, packages may be used to represent hierarchy levels. Entities are discrete business elements that are used during a business transaction. Data types are used to type object entities and interfaces with a structure. For example, BusinessTransactionDocumentImageRecognitionRequestMessage message 285000 includes, among other things, BusinessTransactionDocumentImageRecognition 285038. Accordingly, heterogeneous applications may communicate using this consistent message configured as such.

BusinessTransactionDocumentImageRecognitionRequest

The Business Transaction Document Image Recognition Interface can be an interface that is used to record data for a business document from an image template. The image template can be recognized either manually or via OCR software.

A BusinessTransactionDocumentImageRecognitionRequest can be a request to record business document data either manually or automatically from a (digital) image. The structure of the message type BusinessTransactionDocumentImageRecognitionRequest can be predefined by the message data type BusinessTransactionDocumentImageRecognitionRequestMessage.

The Image Recognition Initiator, which can trigger the image recognition, records and digitalizes the image of the business document to be recognized. It can generate a BusinessTransactionDocumentImageRecognitionRequest which can then be accepted by an Image Recognition Executor charged with recognizing the image. The results of the Image Recognition Executor's image recognition are not relevant for the image-recognition-triggering Image Recognition Initiator.

The Image Recognition Executor charged with recognizing the image can accept the information from the BusinessTransactionDocumentImageRecognitionRequest. Based on this information, image recognition can be carried out; and based on the result of the image recognition, a business document can be created. The Image Recognition Executor can be either an application system where a person performs the image recognition manually or a system with OCR software.

The message data type BusinessTransactionDocumentImageRecognitionRequestMessage can contain the object BusinessTransactionDocumentImageRecognition contained in the business document. The BusinessTransactionDocumentImageRecognitionRequestMessage can contain the packages MessageHeader package and BusinessTransactionDocumentImageRecognition Package. The message data type BusinessTransactionDocumentImageRecognitionRequestMessage can provide the structure for the message type BusinessTransactionDocumentImageRecognitionRequest and the interfaces that are based on it.

A MessageHeader package can group business information that is relevant for sending a business document in a message. In some implementations, the MessageHeader package currently does not contain any entries. The reference to the base business document can be made by establishing a reference to the purchase order, delivery, etc. The sender can be identified by means of the reference. In some implementations, the sender does not know who the recipient is and knows only that the message is to be sent to a billing or invoicing application.

The BusinessTransactionDocumentImageRecognitionPackage can group the BusinessTransactionDocumentImage with its packages. The BusinessTransactionDocumentImageRecognitionPackage can contain the package Attachment Package.

BusinessTransactionDocumentImageRecognition can be a request to record business document data either manually or automatically from a delivered, e.g. digital, image. BusinessTransactionDocumentImageRecognition can contain details on the document type to be generated, an attachment with the business information, and a contact person.

BusinessTransactionDocumentTypeCode can be a coded representation of the type of a business document. BusinessTransactionDocumentTypeCode can be of GDT type BusinessTransactionDocumentTypeCode.

ReconciliationPeriodCounterValue can be a counter for reconciliation periods. ReconciliationPeriodCounterValue can be of GDT type ReconciliationPeriodCounterValue.

The AttachmentPackage can be the grouping of all attachment information with reference to the business document to be generated. The AttachmentPackage can contain the entity AttachmentFolder.

BusinessTransactionDocumentImageAttachment can be the attachment with the digitalized image information of the business document. BusinessTransactionDocumentImageAttachment can be of GDT type AttachmentFolder. BusinessTransactionDocumentImageAttachment can include the Data Types: AttachmentFolder, and BusinessTransactionDocumentTypeCode.

FIG. 286-1 through 286-18 illustrates one example logical configuration of InvoiceMessage message 286000. Specifically, this figure depicts the arrangement and hierarchy of various components such as one or more levels of packages, entities, and datatypes, shown here as 286000 through 286554. As described above, packages may be used to represent hierarchy levels. Entities are discrete business elements that are used during a business transaction. Data types are used to type object entities and interfaces with a structure. For example, L InvoiceMessage message 286000 includes, among other things, Invoice 286044. Accordingly, heterogeneous applications may communicate using this consistent message configured as such.

Invoice Interfaces

The interfaces InvoiceRequest and InvoiceConfirmation can be used to exchange invoices and invoice confirmations between an invoicing party and an invoice recipient (e.g. between a seller and a buyer) in a B2B process. The InvoiceInformation message can be used to inform interested applications of received, verified, and accepted invoices and of cancellations of these invoices. The InvoiceSettlementReleaseRequest message can be used to request the release of an invoice for settlement.

The business scenarios for the Invoice Request and Invoice Confirmation messages are the Procure to Stock (PTS) and Sell from Stock (SFS) scenarios. In the PTS scenario, goods are purchased and settled using the invoice interfaces. In the PTS scenario, goods are sold and invoiced using the invoice interfaces. The InvoiceRequest and InvoiceConfirmation messages directly integrate the applications implementing these interfaces, and also form the basis for mapping data to widely-used XML standard formats such as RosettaNet, PIDX, xCBL, CIDX, and so on.

The SupplierInvoiceInformation, SupplierInvoiceSettlementReleaseRequest and SupplierInvoiceCancellationExecutionRequest messages are motivated by the Leasing business scenario. Leasing is a business process that involves three parties: the lessee, lessor, and vendor. In this business process, a vendor provides the lessee with a certain item in return for a payment. The financing for this item is handled by the lessor as an intermediate party.

The details of the leasing process are as follows. A leasing contract is concluded between the lessor and lessee. The lessor orders the relevant product from the vendor. The vendor then delivers this product to the lessor and issues an invoice to the lessor. The lessor does not settle this invoice until he or she has received advance payments (for example, the first installments) from the lessee, as agreed in the leasing contract.

Since the leasing contract is usually modeled in the lessor's sales system, this system first has to be informed by Invoicing that the vendor's invoice has been verified and accepted (InvoiceInformation) before it can request that the invoice be released for settlement (InvoiceSettlementReleaseRequest). However, the lessor's sales system can also come to the conclusion that an invoice has to be canceled because, for example, the lessee has not yet paid any of the lease installments. In this case, Invoicing has to perform suitable follow-on actions since it is the recipient of a request to cancel the invoice (SupplierInvoiceCancellationExecutionRequest).

Message Types

An InvoiceRequest Message Type is a legally binding notification of payables or receivables for delivered goods and rendered services—usually, a payment request for these goods and services. The structure of the message type InvoiceRequest is specified by the message data type InvoiceMessage. The message of message type InvoiceRequest is sent from the invoice recipient to the invoicing party. It can be used to start a new invoicing process. It transfers (as defined) invoices in the broader sense. This includes the specific invoice (request to settle a payable), the debit memo, and the credit memo.

An InvoiceConfirmation Message Type is a response sent by the recipient to the invoicing party confirming or rejecting the entire invoice received or stating that it has been assigned temporarily the status "pending". The structure of the message type InvoiceConfirmation is specified by the message data type InvoiceMessage. The message of message type InvoiceConfirmation is sent from the invoice recipient to the invoicing party. It can be used to confirm or reject an entire invoice, or to assign it temporarily the status "pending". An InvoiceConfirmation is not mandatory in a B2B invoicing process. However, it helps to automate collaborative processes and dispute management.

A SupplierInvoiceInformation Message Type is a piece of information from Invoicing about an accepted invoice or its cancellation. The structure of the message type SupplierInvoiceInformation is specified by the message data type SupplierInvoiceInformationMessage A SupplierInvoiceSettlementReleaseRequest Message Type is the request to release an accepted invoice for settlement. The structure of the message type SupplierInvoiceSettlementReleaseRequest is specified by the message data type SupplierInvoiceSettlementReleaseRequestMessage.

A SupplierInvoiceCancellationExecutionRequest Message Type is the request to cancel a vendor invoice. The structure of the message type SupplierInvoiceCancellationExecutionRequest is specified by the message data type SupplierInvoiceCancellationExecutionRequestMessage. The receiving system can decide how the cancellation request should be implemented. Depending on the extent to which the vendor invoice has been processed, it can simply be deleted and the invoicing party informed of this, for example, or it might be the case that a cancellation invoice has to be generated and posted.

Message Choreography

An invoice is normally created after the goods receipt or service performance has been confirmed. Billing starts the invoicing process by sending an InvoiceRequest message.

Upon receiving the InvoiceRequest message, Invoicing can use the InvoiceConfirmation message to completely accept or reject the invoice received or to assign it temporarily the status "pending".

The InvoiceConfirmation is not a negotiation tool (as is the case in order management), since the only options available are either to accept or reject the entire invoice. The invoice data in the InvoiceConfirmation message merely confirms that the invoice has been forwarded correctly and does not communicate any desired changes to the invoice. Therefore, the InvoiceConfirmation contains the precise invoice data that was received and verified by Invoicing.

If Invoicing rejects an invoice, Billing can send a new invoice after checking the reason for rejection (AcceptanceStatus and ConfirmationDescription at Invoice and InvoiceItem level).

If the invoice recipient does not respond, the invoice is generally regarded as being accepted and the invoicing party can expect payment.

Interested applications are informed by Invoicing of accepted invoices (InvoiceInformation) and authorized recipients of this information can request that Invoicing release the invoice for settlement (InvoiceSettlementReleaseRequest). If the interested application does not accept the invoice, a request that the invoice be canceled can be created instead (SupplierInvoiceCancellationExecutionRequest).

The Evaluated Receipt Settlement, ERS is based on the date of goods received or services rendered. The buyer should have arranged with the seller, that there is no invoice for these orders. Instead, the buyer or the company responsible for verifying invoices posts an invoice based on the purchase order and its confirmation. As a result, invoice variances or communication errors are avoided and transactions are completed more quickly.

In the ERS process, the partner functions of the invoice recipient and the invoicing party are swapped with regard to the invoicing process. Generally speaking, the buyer creates the invoices and then sends a credit memo for the amount of the payable concerned, using the InvoiceRequest message, to either the seller or the company responsible for invoicing.

In the invoicing process, messages are transmitted exactly once in order (EOIO) and serialized using message queues. Each invoicing process should have its own message queue (as opposed to one queue for all invoices) so that one failed message does not block all other messages in the entire system.

In an invoicing process, the IDs of the objects and messages concerned can be used to correlate the individual messages. An InvoiceRequest message is referenced by the ReferenceMessageID in an InvoiceConfirmation or in a subsequent InvoiceRequest (credit memo). The InvoiceConfirmation contains the same Invoice object as the InvoiceRequest to which it is related but has its own MessageID. This procedure corresponds to the RosettaNet standard.

In accordance with Communication Paradigms, forward processing can be used to resolve errors. A recipient system should accept every formally correct incoming message.

In order to restart a process that is corrupt due to a failed message, the invoicing system should provide an option for transmitting the current status of the invoice at any time using an Invoice Request message.

Many different business conflict scenarios are conceivable following receipt of an invoice. A few examples follow: 1) The invoice is not approved due to discrepancies in price and/or quantity. 2) The invoice is approved, posted, and paid, but the triggering purchase order is then canceled Invoicing occurs before goods are received 3) Goods that have been paid for are defective and have to be returned.

Business conflict scenarios (dispute management) are resolved using invoice confirmations and invoice cancellations. For instance, an invoice that was issued prior to goods receipt or which contains excessive price or quantity specifications can initially be assigned the status "pending" using the invoice confirmation. The invoice can then be approved and paid once the goods or credit memo has been checked. If payment has already been made or if the invoice has already been posted in Accounting, an invoice cancellation or a credit memo for partly defective products, for example, should be issued.

Message Interfaces

Invoice messages are implemented by four message interfaces, two on the invoice recipient side and two on the invoicing party side.

In order for an invoice to satisfy local legal requirements, it should often contain additional country-specific information. In Germany, for example, an invoice is only legally accepted if it has a tax evasion combat number, which was given out by the tax office for business partners.

Country-specific invoice information may result in the message data type Invoice being enhanced in the future or in additions made by customers according to their individual requirements. In either case, it is advisable that the specific information be added to the appropriate business objects. The following country-specific elements can be included in the standard B2B data type InvoiceMessage: NotaFiscalTypeCode, BusinessTransactionDocumentPartyTaxID and PaymentReferenceID.

NotaFiscalTypeCode (Invoice Package) is a coded representation of nota fiscal types. Examples of special nota fiscal types are complementary (similar to the credit or debit memo); corrections; cancellations; and conhecimento (freight invoice).

Regarding BusinessTransactionDocumentPartyTaxID (Party Package), pursuant to article 14, paragraph la, of the German Sales Tax Law, which came into effect on Jun. 30, 2002, tax numbers may be included in invoices: “The supplying company is obliged to specify in the invoice the tax number received from the tax office” (German Federal Law Gazette part 1, no. 74, page 3921, dated Dec. 27, 2001).

PaymentReferenceID (PaymentInformation Package)

An identification number that sellers in Scandinavian countries include on outgoing invoices. Sellers in Switzerland, which has adopted the procedure of inpayment slips with reference numbers, also use payment reference numbers. If the purchaser pays the invoice, the payment reference number should be given. Then the seller knows with which invoice the payment settles. The payment reference consists of a sequential number and a check digit. The check digits are calculated differently in every country.

In the schemeAgencyID attribute of the PaymentReferenceID, the number of the participant using the procedure of inpayment slips with reference numbers can be specified. This identification number is issued to each participant in the procedure by the Swiss PostFinance.

The message data type SupplierInvoiceInformationMessage contains the business information that is relevant for sending a business document in a message. The SupplierInvoice object can be contained in the document. It can contain the following packages: SupplierInvoiceInformation package. The message data type SupplierInvoiceInformationMessage can provide the structure for the message type SupplierInvoiceInformation and the interfaces that are based on it.

MessageHeader package

A MessageHeader package can group business information that is relevant for sending a business document in a message. The MessageHeader package may not be required in the SupplierInvoiceInformationMessage.

SupplierInvoiceInformation Package

The SupplierInvoiceInformation package can group together a SupplierInvoice and its packages. It can include: Party Package, Location package, DeliveryInformation package, PaymentInformation package, PriceInformation package, Tax package, Attachment package, Description package, and Item package.

A SupplierInvoice can be a vendor’s list of payables and receivables for delivered goods and rendered services which have to be paid for by a certain time.

SupplierInvoice can provide not only the remuneration and tax to be paid by the participating business partners for products and services, but also provide detailed information about terms of payment and delivery. SupplierInvoice can contain the elements: 1) ID can be an invoice number. ID can be a unique identifier that is assigned to the invoice by the invoicing party. ID can have a GDT of BusinessTransactionDocumentID. 2) BillToID can be a unique identifier that is assigned to the invoice by the invoice recipient. BillToID can have a GDT of BusinessTransactionDocumentID. 3) ReconciliationPeriodCounterValue can be a counter for reconciliation periods. ReconciliationPeriodCounterValue can have a GDT of ReconciliationPeriodCounterValue. 4) TypeCode can be a coded representation for the invoice type (a specific invoice/payment request, debit memo, or credit memo). TypeCode can have a GDT of BusinessTransactionDocumentTypeCode. 5) DateTime can be an invoice date. DateTime can have a GDT of DateTime. 6) CancellationInvoiceIndicator can indicate whether the invoice is a cancellation invoice or not. CancellationInvoiceIndicator can have a GDT of InvoiceCancellationInvoiceIndicator. 7) AcceptanceStatusCode can be coded representation for the status of the invoice recipient’s acceptance of the invoice. AcceptanceStatusCode can have a GDT of AcceptanceStatusCode.

SupplierInvoice can be of type GDT of SupplierInvoice.

All monetary amounts and prices can be in the same currency within any given invoice. The invoice number attributes may not be used. The BillToID can be used only in the InvoiceConfirmation. The AcceptanceStatusCode may not be used. The AcceptanceStatusCode may be set to one of the following options: 1) AP (Accepted) if the Invoice has been accepted. 2) AJ (Pending) if it is not (yet) possible to make a final decision about the invoice. 3) RE (Rejected) if the invoice has been rejected.

In some implementations, the AcceptanceStatusCode, along with the BillToID and the ConfirmationDescription (Section 2.2.9.2) are the only elements that can be used in the InvoiceConfirmation. Continuing the example, no other data may contain discrepancies with the invoice data received.

The Party Package can group together all business partners that can be involved in an invoicing process. It can contain the entities: BillToParty, BillFromParty, BuyerParty, SellerParty, ServicePerformerParty, Requestor Party, ProductRecipientParty, Vendor Party, ManufacturerParty, PayerParty, PayeeParty, and CarrierParty.

In some implementations, a default logic can be used for all business partners: business partners that are specified at the SupplierInvoice level can be used for all items for which corresponding partners are not explicitly transmitted. The default logic can be used for the partner as a whole, including the contact person. For example, at item level, parts of a partner cannot be specified more precisely. The default logic may be only a simplified version of the transmitted message. In terms of logic, partners at SupplierInvoice level can behave as if they have been explicitly transmitted for all the items of the message.

A BillToParty can be a company or person to which the invoice for deliveries received or services rendered is to be sent. BillToParty can be of type GDT of BusinessTransactionDocumentParty. BillToParty can also fulfill the function of BuyerParty, ProductRecipientParty, and PayerParty.

A BillFromParty can be a company or person executing the invoicing process. BillFromParty can be of type GDT of BusinessTransactionDocumentParty. BillFromParty can also fulfill the function of SellerParty, Vendor Party, and PayeeParty.

A BuyerParty can be a company or person authorizing the deliveries or services. BuyerParty can be of type GDT of BusinessTransactionDocumentParty.

As stipulated in Section 14, Paragraph 1, of the German Sales Tax Law, the BuyerParty should always be specified. In some implementations, if no BuyerParty is explicitly specified in an invoice, the BillToParty can act as the BuyerParty.

A SellerParty can be a company or person selling (sales/service area). SellerParty can be of type GDT of BusinessTransactionDocumentParty.

As stipulated in Section 14, Paragraph 1, of the German Sales Tax Law, the SellerParty should always be specified. In some implementations, if no SellerParty is explicitly specified in an invoice, the BillFromParty can act as the SellerParty.

ServicePerformerParty can be the company or person that delivered the ordered goods. In some implementations, if no ServicePerformerParty is explicitly specified in an invoice, the SellerParty can act as the ServicePerformerParty.

Requestor Party can be the person who requests the good/service. Requestor Party can be of type GDT of BusinessTransactionDocumentParty.

A ProductRecipientParty can be a company or person to which goods are delivered or for which services are rendered. ProductRecipientParty can be of type GDT of BusinessTransactionDocumentParty. In some implementations, if no ShipToLocation is explicitly specified in an invoice, the address of the ProductRecipientParty can be the delivery address. If no ProductRecipientParty is explicitly specified in an invoice, the BuyerParty can act as the ProductRecipientParty.

A Vendor Party can be a company or person delivering the goods or providing the service. Vendor Party can be of type GDT of BusinessTransactionDocumentParty. In some implementations, if no ShipFromLocation is explicitly specified in an invoice, the address of the Vendor Party is the ship-from address. If no Vendor Party is explicitly specified in an invoice, the SellerParty can act as the Vendor Party. The Vendor Party may not be the company or person that is solely responsible for transporting the goods, the CarrierParty may be designated for this.

A ManufacturerParty can be a company or person that produced the goods being invoiced. ManufacturerParty can be of type GDT of BusinessTransactionDocumentParty. ManufacturerParty can be used only for invoice items relating to materials. ManufacturerParty can be used to uniquely define the context of a ManufacturerProductID.

A PayerParty can be a company or person that pays for the goods or services rendered. PayerParty can be of type GDT of BusinessTransactionDocumentParty. In some implementations, if no PayerParty is explicitly specified in an invoice, the BillToParty can act as the PayerParty.

A PayeeParty can be a company or person that receives payment for the goods or services rendered. PayeeParty can be of type GDT of BusinessTransactionDocumentParty. In some implementations, if no PayeeParty is explicitly specified in an invoice, the BillFromParty can act as the PayeeParty.

A CarrierParty can be a company or person that transported the goods. CarrierParty can be of type GDT of BusinessTransactionDocumentParty. In some implementations, the CarrierParty may only be used for invoice items relating to materials; it can be ignored by the recipient for services. The CarrierParty may be required for fiscal law purposes in certain business transactions involving delivery across countries.

The Location package can group together all locations that can be involved in an invoicing process. It can contain the entities: ShipToLocation and ShipFromLocation. In some implementations, a default logic can be used for all locations: locations that are specified at SupplierInvoice level can be used for all items for which corresponding locations are not explicitly transmitted. For details, see the default logic for business partners in section 2.5.2.

ShipToLocation and ShipFromLocation can be used to provide a more detailed description of the flow of goods (between delivery point and dispatch point). In certain countries (e.g., USA) this detailed information is required for calculating taxes.

A ShipToLocation can be a location to which goods were delivered or where services were rendered. ShipToLocation can be of type GDT of BusinessTransactionDocumentLocation. For example, a sold-to party (BuyerParty) headquartered in California orders steel beams for a building. The construction site (ShipToLocation) for the building is located in Arizona. The tax amount is calculated using the tax rates that apply in Arizona.

A ShipFromLocation can be the location from which goods were shipped. ShipFromLocation can be of type GDT of BusinessTransactionDocumentLocation.

The DeliveryInformation package can summarize all information for a delivery in the invoicing process. It can contain the entity DeliveryTerms.

DeliveryTerms can be the conditions and agreements that apply when delivering and transporting the ordered goods and providing the necessary services and activities for this. DeliveryTerms can be of type GDT of DeliveryTerms. In some implementations of the GDT DeliveryTerms, the elements Incoterms and Transport can only be used for material items. The default logic may take only Incoterms and Transport into account for material items; they may be ignored for all other items.

The PaymentInformation package can summarize all payment information in the invoicing process. It can contains the entities: CashDiscountTerms and PaymentForm.

CashDiscountTerms can contain the payment conditions (cash discount rates and payment deadlines). CashDiscountTerms can be of type GDT of CashDiscountTerms.

The PaymentForm can specify the method of payment for a product. PaymentForm can contain the element PaymentFormCode—Coded representation of the payment form. PaymentFormCode can be of type GDT of PaymentFormCode. PaymentForm can include the entity PaymentCard.

PaymentCard can be a credit card or customer card. PaymentCard can be of type GDT of PaymentCard.

The PriceInformation package can summarize all information about the total amount invoiced for the products provided or services rendered, which are listed at item level. PriceInformation package can contain the entity Price.

The Price can be the total amount invoiced for products delivered and services rendered, including the tax and net portions. Price can contain the elements: 1) GrossAmount can be the gross invoice amount (net amount plus tax amount). GrossAmount can be of type GDT of Amount. 2) NetAmount can be the net invoice amount. NetAmount can be of type GDT of Amount. 3) TaxAmount can be the tax amount in invoice. TaxAmount can be of type GDT of Amount. 4) ExchangeRate can be the exchange rate information for an invoice. The exchange rate may be specified if the products ordered are settled in a currency that is different than the currency in the purchase order. For example, this is often the case with collective invoices. ExchangeRate can be of type GDT of ExchangeRate.

A default logic can be used for all exchange rate information: exchange rates that are specified at SupplierInvoice level can be used for all items for which corresponding exchange rates are not explicitly transmitted.

The Tax package can summarize all information about tax price components in the total amount invoiced for products delivered or services rendered. The Tax package can contain the entity ProductTax.

The ProductTax can be the tax amount invoiced for products delivered or services rendered, added for all invoice items. ProductTax can be of type GDT of ProductTax.

The Attachment package can group together all attachment information relating to the invoice. The Attachment package can contain the following entity Attachment.

An Attachment can be a document of any type that relates to the invoice and is transmitted with it. Attachment can be of the type GDT of Attachment.

The Description package can group together all explanatory texts relating to the invoice. The Description package can contain the entities: Description and ConfirmationDescription.

A Description can be a natural language text regarding the invoice, and may be visible to all business parties. Description can be of type GDT of Description. Description can be used for all types of textual information relating to the invoice transmitted. One example of this would be information stating that the Sales employee responsible will be is on vacation starting on a specific date and indicating the name and telephone number of a substitute starting on that date.

A ConfirmationDescription can be a natural language text regarding the invoice confirmation, and may be visible to business parties. ConfirmationDescription can be of type GDT of Description. ConfirmationDescription can be used for all types of textual information relating to the invoice confirmation. An example of this would be the invoice recipient's reason for rejecting a particular invoice.

The SupplierInvoiceItem package can group together all information about the amounts invoiced or credited for products, broken down by type and scope of the goods delivered and/or services rendered. The SupplierInvoiceItem can contain the following packages: ProductInformation package, PriceInformation package, Tax package, Party Package, Location package, DeliveryInformation package, BusinessTransactionDocumentReference package, Attachment package, and Description package.

A SupplierInvoiceItem can be a part of an invoice that contains the prices and taxes for the quantity of a product that has been delivered or for a service that has been rendered. In some implementations, in addition to the information about prices and taxes, SupplierInvoiceItem includes information about participating business partners, payment conditions and delivery terms, if these differ from information provided in the invoice header. SupplierInvoiceItem can have the following elements: 1) ID can be the invoice item number; a unique identifier that is assigned to the invoice item by the invoicing party. ID can be of type GDT of BusinessTransactionDocumentItemID. 2) BillToID can be a unique identifier that is assigned to the invoice item by the invoice recipient. BillToID can be of type GDT of BusinessTransactionDocumentItemPartyID. 3) TypeCode can be a coded representation for the invoice item type (invoice item in the sense of a receivable, credit memo item, delivery cost item, subsequent debit item, or subsequent credit item). In some implementations, an invoice cannot be changed for legal reasons, invoices that contain errors can either be canceled completely and get reissued, or adjusted using debit and credit amounts in another invoice. In this case, only the difference amount required to correct the financial data are transferred and not, for example, the new absolute value for a product per price unit of measure.

Example

Purchase order item: 10×pens at € 3 each

Invoice item: 10×pens at € 3 each

Subsequent debit item: 2×pens at € 0.50 each

After the bill has been issued (invoice item 10), it transpires that 2 pens cost € 3.50 rather than € 3. In this case, the invoicing party can send a subsequent debit for the 2 items in a second invoice, which represents a financial adjustment for the total settlement amount.

TypeCode can be of type GDT of BusinessTransactionDocumentItemTypeCode. 4) DeliveryPeriod can be the delivery date of the products invoiced or the time period in which the service was rendered. DeliveryPeriod can be of type GDT of DateTimePeriod. 5) Quantity can be the quantity invoiced. Quantity can be of type GDT of Quantity.

SupplierInvoiceItems can be arranged hierarchically using the following entity: HierarchyRelationship. In some implementations, an invoice should contain at least one item. The BillToID can be used only in the InvoiceConfirmation. An invoice can contain either only payable items, credit memo items and delivery cost items, or subsequent debit items and subsequent credit items. Item categories may not be combined at leisure.

A HierarchyRelationship can be the relationship between a subitem and a higher-level parent item in an item hierarchy. HierarchyRelationship can contain the elements: 1) ParentItemID cam be a reference to a parent item with the item number assigned by the invoicing party. SupplierInvoiceItemHierarchyRelationshipParentItemID can be of type GDT of BusinessTransactionDocumentItemID. 2) ParentItemBillToID can be reference to a parent item with the item number assigned by the invoice recipient. 3) TypeCode can be a coded representation of the type of hierarchical relationship between the subitem and its higher-level parent item. SupplierInvoiceItemHierarchyRelationshipTypeCode can be of type GDT of BusinessTransactionDocumentItemHierarchyRelationshipTypeCode.

In some implementations, there are various types of items, and they are governed by different integrity conditions (constraints). An item can have several integrity types. In this case, the item should satisfy all the integrity conditions for all of its integrity types. The description of the integrity types indicates which integrity types can be combined with one another and how they can be combined. Some of the various integrity types are as follows: 1) Standard items can be items to which no lower-level items have been assigned. Any item that is not referenced by another item using the element ParentItemID in the HierarchyRelationship entity can be a standard item. 2) Hierarchy items can be items to which at least one other lower-level item has been assigned in the hierarchy. Any item that is referenced by at least one other item, using the ParentItemID can be a hierarchy item. In some implementations, all items are either standard or hierarchy items. 3) Subitems can be items that have been assigned below a hierarchy item and not directly to the purchase order header. Subitems can be both standard items and hierarchy items. Any item that references another item using the ParentItemID can be a subitem. 4) Material items can be items in which the product is a material. Any item that has ProductTypeCode "1" (Material) can be a material item. 5) Service items can be items in which the product is a service. Any item whose ProductTypeCode is "2" (Service) can be a service item. 6) Unspecified product items can be items for which no information is provided indicating whether they refer to a material or a service. Any item whose ProductTypeCode is not specified can be an unspecified product item. In some implementations, all items are material, service, or unspecified product items. An unspecified product item may satisfy all the integrity conditions of a material, service, or limit item. 7) Groupings hierarchy items can be hierarchy items that logically group together other items. Multilevel grouping hierarchies are permitted, i.e., a grouping hierarchy item can contain subitems that are also grouping hierarchy items. Any hierarchy item whose subitems all have HierarchyRelationshipTypeCode "002" (group) can be a grouping hierarchy item. In some implementations, subitems with a different HierarchyRelationshipTypeCode are not permitted. In some implementations, grouping hierarchy items are not permitted as subitems of other types of hierarchy items. 8) Substitute product hierarchy items can be hierarchy items for which there is at least one sub-item with a substitute product. In some implementations, multilevel substitute product hierarchies are not permitted, i.e., a substitute product can itself not be substituted. Any hierarchy item whose subitems all have HierarchyRelationshipTypeCode "006" (substitute product) can be a substitute product hierarchy item. In some implementations, subitems with a different HierarchyRelationshipTypeCode are not permitted. Substitute product hierarchy items can be used as subitems in grouping hierarchies. 9) BOM hierarchy items can be hierarchy items that group together other items in a BOM. Multilevel BOM hierarchies can be permitted. Any hierarchy item with at least one subitem with HierarchyRelationshipTypeCode "001" (bill of material) can be a BOM hierarchy item. In some implementations, additional subitems are only permitted with the HierarchyRelationshipTypeCode "003" (discount in kind). 10) Discount in kind hierarchy items can be hierarchy items for which a goods discount is granted in the form of an inclusive or exclusive bonus quantity. In some implementations, multilevel discount in kind hierarchies are not permitted, i.e., no discount in kind can be granted for discount in kind. The goods discount can be described in the form of one or more subitems in the discount in kind hierarchy item. Any Hierarchy item with at least one subitem with HierarchyRelationshipTypeCode "003" (discount in kind) can be a discount in kind hierarchy item. In some implementations, additional subitems are only permitted with the HierarchyRelationshipTypeCode "001" (bill of material). In some implementations, all hierarchy items are grouping, BOM, or discount in kind hierarchy items. In some implementations, a hierarchy item can be both a BOM and a discount-in-kind hierarchy item, if a discount in kind has been granted for a BOM.

The SupplierInvoiceItemProductInformation package can summarize all information for identifying, describing, and classifying a product in an invoice item. The SupplierInvoiceProductInformation can contain the entities: Product and ProductCategory. In some implementations, the SupplierInvoiceItemProductInformation package can not be used in grouping hierarchy items.

Product can identify, describe, and classify the product that has been invoiced. Product can be of the GDT type BusinessTransactionDocumentProduct. In some implementations, with the exception of grouping hierarchy items, at least either the product number or product description should be provided when a new item is created. If both the product number and description are provided, the description can be merely additional information in the message and can be ignored by the recipient.

A ProductCategory can be the assignment of an invoiced product to a higher-level, company-specific category. ProductCategory can be of type GDT of BusinessTransactionDocumentProductCategory. The ProductCategory can be derived directly from the product if a product number is provided for the product. In some implementations, it can differ for the buyer and seller if they have classified the same product differently. This is permitted and should be tolerated by the systems involved.

The SupplierInvoiceItemPriceInformation package can summarize all information about the amount invoiced for a product delivered or a service rendered, including all price components. The SupplierInvoiceItemPriceInformation can contain the entities: Price, and Component.

The Price can be the amount invoiced for a delivered product or a service rendered, including the tax and net portions. Price can contain the elements: 1) GrossAmount can be the gross item amount (net amount plus tax amount). GrossAmount can be of GDT type Amount. 2) NetAmount can be a net item amount. NetAmount can be of GDT type Amount. 3) TaxAmount can be a tax amount for an item. TaxAmount can be of GDT type Amount. 4) NetUnitPrice can be a net price for the base quantity of a product that was used to calculate the net amount.

For example: € 10 for 5 pieces.

NetUnitPrice can be of GDT type Price. 5) ExchangeRate can be the information about the exchange rate. The exchange rate may be specified if the quantity ordered of a product is settled in a currency that is different from the currency in the purchase order item. This can be the case with collective invoices, for example. ExchangeRate can be of GDT type ExchangeRate. 6) PricingDate can be the date on which the price is calculated. PricingDate can be of GDT type Date. In some implementations, the elements NetAmount and GrossAmount should be specified if the invoice item specified is not a grouping hierarchy item. A default logic can be used for the exchange rate information: if an exchange rate is not specified explicitly at item level, the exchange rate at invoice level may applies.

Component can be a non-fiscal part of a price in an invoice item. Component can be of type GDT of PriceComponent. An invoice item can contain several price components. A detailed list of the price components (including, e.g., rounding difference clearing, etc.) can be provided to help the invoice recipient understand how the amount invoiced was calculated. In B2B standards, such as RosettaNet (PIP 3C3 version 1.1) or xCBL 3.0, price components may not be available in this form. As a result, the usual elements in B2B standards, namely, GrossAmount and NetAmount, can be highlighted and shown (redundantly) along with the detailed list that includes price components. Taxes can be price components that are shown explicitly because of legal aspects. Tax information (ProductTax) may not be shown redundantly.

The SupplierInvoiceItemTax package can summarize all information about tax price components in the total amount invoiced for products delivered or services rendered. The SupplierInvoiceItemTax can contain the following entity: ProductTax.

The ProductTax can be a tax component of an invoice item that is incurred for each tax type and rate. ProductTax can be of type GDT of ProductTax.

The SupplierInvoiceItemParty package can group all the business partners that can be involved in an invoice item. The SupplierInvoiceItemParty can contain the entities: BuyerParty, SellerParty, ServicePerformerParty, Requestor Party, ProductRecipientParty, Vendor Party, ManufacturerParty, and CarrierParty.

The SupplierInvoiceItemBusinessTransactionDocumentReference package can group together all references to business documents that can occur in the invoicing process at item level. The SupplierInvoiceItemBusinessTransactionDocumentReference can contain the entities: PurchaseOrderReference, SalesOrderReference, DeliveryReference, ServiceAcknowledgementReference, OriginInvoiceReference, PurchaseContractReference, SalesContractReference, BuyerProductCatalogueReference, SellerProductCatalogueReference, ProjectReference, and ProjectElementAssignment.

In some implementations, individual items should be referenced in the invoice from item level (e.g. purchase order item 10 in purchase order 4711 is directly referenced from purchase order item 1). If an item assignment is not recognized, an entire document can be referenced (e.g., contract 0815 is referenced from purchase order 4712).

A PurchaseOrderReference can be a reference to a purchase order or an item within a purchase order. PurchaseOrderReference can be of the GDT type BusinessTransactionDocumentReference. A PurchaseOrderReference can contain the purchase order number and purchase order item number issued by the buyer. There can be more than one PurchaseOrderReference.

A SalesOrderReference can be a reference to a sales order or an item within a sales order. SalesOrderReference can be of type GDT of BusinessTransactionDocumentReference. A SalesOrderReference can contain the order number and order item number issued by the seller. There can be more than one SalesOrderReference.

A DeliveryReference can be a reference to a delivery. DeliveryReference can be of type GDT of BusinessTransactionDocumentReference. A DeliveryReference can contain the delivery note number assigned by the seller.

A ServiceAcknowledgementReference can be a reference to a confirmation, created by the seller, that a service has been rendered (e.g., in the service entry system). ServiceAcknowledgementReference can be of type GDT of BusinessTransactionDocumentReference. A ServiceAcknowledgementReference can include the service acknowledgment number issued by the service provider.

An OriginInvoiceReference can be a reference to an invoice previously sent. OriginInvoiceReference can be of type GDT BusinessTransactionDocumentReference. In some implementations, an OriginInvoiceReference can contain the invoice number issued by the invoicing party. This reference may be required if a credit memo is issued for an amount that has been invoiced.

A PurchaseContractReference can be a reference to a purchase contract or an item within a purchase contract. PurchaseContractReference can be of type GDT of BusinessTransactionDocumentReference. In some implementations, provided there is no agreement to the contrary, the seller can be responsible for determining the correct SalesContractReference for a specified PurchaseContractReference.

A SalesContractReference can be a reference to a sales contract or an item within a sales contract. SalesContractReference can be of type GDT of BusinessTransactionDocumentReference.

A BuyerProductCatalogueReference can be a reference to a buyer's product catalog or an item within such a catalog. BuyerProductCatalogueReference can be of type GDT of CatalogueReference. In some implementations, a BuyerProductCatalogueReference can be filled when an invoice item refers to a catalog whose number and item numbers were issued by the buyer.

A SellerProductCatalogueReference can be a reference to a seller's product catalog or an item within such a catalog. SellerProductCatalogueReference can be of type GDT of CatalogueReference. In some implementations, a SellerProductCatalogueReference can be filled when an invoice item refers to a catalog whose number and item numbers were issued by the seller.

A ProjectReference can be a reference to a project or an element within a project. ProjectReference can be of type GDT of ProjectReference A ProjectElementAssignment can be an assignment between two project elements to which an invoice item refers. ProjectElementAssignment can be of the type GDT of ProjectElementAssignment. In some implementations, either a ProjectReference or a ProjectElementAssignment can be specified, but not both. Only one assignment of a role (ProjectElementTypeCodes="2") to a task (ProjectElementTypeCodes="1") is permitted. In a procurement process, the ProjectElementAssignment can continue to be passed on when goods are received, services entered, and invoicing occurs. This means that a project system can have access to information about the progress of a requirement/requisition.

The SupplierInvoiceItemAccountingObjectSetAssignment package can group together account assignment information for Accounting. The SupplierInvoiceItemAccountingObjectSetAssignment can contain the following entity: AccountingObjectSetAssignment. The SupplierInvoiceItemAccounting package can contain all information about account assignment objects in Accounting to which an invoice item refers. An account assignment can be divided up (in percentage form) among different objects (e.g. cost center, order, etc.). In some implementations, the total of the various assignments should be 100%.

AccountingObjectSetAssignment can be the assignment of an invoice item net amount or of a partial amount (i.e. a percentage, value-based, or quantity-based amount) to a set of account assignment objects (AccountingObjectSet). AccountingObjectSetAssignment can be of type GDT of AccountingObjectSetAssignment. For example, 40% of the invoice item amount can be assigned to cost center CC1000 and profit center PC3050, and the remaining 60% to sales order 100002345.

For example the SupplierInvoiceItemAccountingObjectSetAssignment package can use the following Data Types: AcceptanceStatusCode, AccountingObjectSetAssignment, Address, Amount, Attachment, BusinessDocumentMessageHeader, BusinessDocumentMessageHeaderParty, BusinessTransactionDocumentID, BusinessTransactionDocumentItemGroupID, BusinessTransactionDocumentItemHierarchyRelationshipTypeCode, BusinessTransactionDocumentItemID, BusinessTransactionDocumentLocation, BusinessTransactionDocumentParty, BusinessTransactionDocumentProduct, BusinessTransactionDocumentProductCategory, BusinessTransactionDocumentReference, BusinessTransactionPriorityCode, CashDiscount, CashDiscountTerms, CatalogueID, CatalogueItemID, CatalogueReference, DateTime, DateTimePeriod, DeliveryTerms, Description, Duration, Incoterms, InvoiceCancellationInvoiceIndicator, LocationPartyID, LocationStandardID, MessageID, Note, PartialDelivery, PartyPartyID, PartyStandardID, PaymentCard, PaymentFormCode, Price, PriceComponent, ProductTax, ProductCategoryPartyID, ProductCategoryStandardID, ProductPartyID, ProductStandardID, ProductTypeCode, ProjectElementAssignment, ProjectReference, Quantity, StandardBusinessDocument- Header, TransportMeansDescriptionCode, TransportModeCode, and TransportServiceLevelCode.

A MessageHeader package can group business information that is relevant for sending a business document in a message. The MessageHeader may not be required for the SupplierInvoiceSettlementReleaseRequest message.

The SupplierInvoice package can group together invoices. A SupplierInvoice in the view required for the SupplierInvoiceSettlementReleaseRequest can contain the information that is necessary to request the release of an accepted invoice for settlement. SupplierInvoice can contain the following element: BillToID can be a unique identifier that is assigned to the invoice by the invoice recipient. BillToID can be of GDT type BusinessTransactionDocumentID. SupplierInvoice can be of type GDT of SupplierInvoiceSettlementReleaseRequest.

The SupplierInvoice package can group the SupplierInvoice.

A SupplierInvoice in the view required for the SupplierInvoiceCancellationExecutionRequest can contain the information that is necessary to request the deletion of a SupplierInvoice. SupplierInvoice can contain the following element: 1) ID can be a unique identifier for a procurement invoice. The ID can be of type GDT of BusinessTransactionDocumentID.

The SupplierInvoice can be of type GDT of SupplierInvoiceCancellationExecutionRequest.

For example the SupplierInvoice can use the following Data Types: BusinessTransactionDocumentID.

The message data type InvoiceMessage can group together the business information that is relevant for sending an invoice in a B2B business process between business partners. The message data type InvoiceMessage can contain: MessageHeader package and Invoice package. In some implementations, the following rules apply to the use and changing of any of the elements or entities in the message data type InvoiceMessage within an invoicing process:

No data relating to the InvoiceRequest may be changed in the InvoiceConfirmation. The only additional information passed on can be the invoice confirmation status and a description of the invoice recipient. In some implementations, if the use of certain elements or entities of the InvoiceMessage message data type is not permitted in all of the message types that are based on the InvoiceMessage message data types, this can be specified explicitly in the "Notes" section. The message data type InvoiceMessage can provide the structure for the message types InvoiceRequest and InvoiceConfirmation, and the interfaces that are based on them.

A MessageHeader package can group business information that is relevant for sending a business document in a message. A MessageHeader can contain the following entity: MessageHeader.

A MessageHeader can group business information from the perspective of the sending application. This can include information: to identify the business document in a message, information about the sender, and about the recipient. The MessageHeader can be broken down into the following entities: SenderParty and RecipientParty. A MessageHeader can be of type GDT of BusinessDocumentMessageHeaderParty. The MessageHeader can contain the following elements: 1) ID can be a means of identifying a business document in a technical message. ID can be of GDT type BusinessDocumentMessageID. 2) ReferenceID can be a means of identifying another instance of a business document in a technical message that the current business document references. ReferenceID can be of GDT type BusinessDocumentMessageID. 3) CreationDateTime can be a date on which a business document in a technical message was generated. CreationDateTime can be of GDT type DateTime.

The MessageID can be set by the sending application, and is not required in the InvoiceInformationMessage message data type.

A SenderParty can be the party that is responsible for sending a business document at business application level. The SenderParty can be of type GDT of BusinessDocumentMessageHeaderParty. The SenderParty can be specified by the sending application; in this way, it can name a contact person for any problems that arise with the message. This can be useful when there is an additional infrastructure, such as a marketplace, between the sender and the recipient. The SenderParty can play an auxiliary role during message transfer, and so can be ignored by the recipient application. However, it can be specified by the sender if the participating partners are not transmitted with the Invoice package.

A RecipientParty can be the party that is responsible for receiving a business document at business application level. The RecipientParty can be of the type GDT of BusinessDocumentMessageHeaderParty. The RecipientParty can be specified by the sending application; in this way, it can name a recipient contact person for any problems that arise with the message. This can be useful when there is an additional infrastructure, such as a marketplace, between the sender and the recipient. The RecipientParty can play an auxiliary role during message transfer, and so can be ignored by the recipient application. However, it can be specified by the sender if the participating partners are not transmitted with the Invoice package.

The Invoice Package can summarize all of the invoice information that is required for a B2B invoicing process. An Invoice can be a list of payables and receivables for delivered goods and rendered services which have to be paid for by a certain time. In some implementations, apart from "SupplierInvoice" changing to "Invoice," the Invoice package in the InvoiceMessage message data type can be identical to the SupplierInvoice package in the SupplierInvoiceInformationMessage message data type, but does not contain the following components: ProjectReference in the SupplierInvoiceInformationItem, ProjectElementAssignment in the SupplierInvoiceInformationItem, AccountingObjectSetAssignment in the SupplierInvoiceInformationItem.

FIG. 287-1 through 287-2 illustrates one example logical configuration of SupplierInvoiceRequestMessage message 287000. Specifically, this figure depicts the arrangement and hierarchy of various components such as one or more levels of packages, entities, and datatypes, shown here as 287000 through 287042. As described above, packages may be used to represent hierarchy levels. Entities are discrete business elements that are used during a business transaction. Data types are used to type object entities and interfaces with a structure. For example, SupplierInvoiceRequestMessage message 287000 includes, among other things, SupplierInvoice 287014. Accordingly, heterogeneous applications may communicate using this consistent message configured as such.

A SupplierInvoiceRequest can be a request that an invoice be created. The structure of the message type SupplierInvoiceRequest can be specified by the message data type SupplierInvoiceRequestMessage. In some implementations, the message of type SupplierInvoiceRequest can be sent from a Business Object to notify supplier invoicing that an invoice was entered. It can be used to start a new invoicing process.

The SupplierInvoiceRequestMessage message data type can group together business information that is relevant for creating an invoice.

A MessageHeader package can group business information relevant for sending a business document in a message. A MessageHeader package can contain the entity: MessageHeader.

A MessageHeader can group together business information from the point of view of the sending application for business document identification in a message. A MessageHeader can be of GDT type BusinessDocumentMessageHeader.

The SupplierInvoice package can group the SupplierInvoice together with its packages. The SupplierInvoice can contain the package: Item package.

ReconciliationPeriodCounterValue can be a counter for reconciliation periods. ReconciliationPeriodCounterValue can be of GDT type CounterValue.

The SupplierInvoiceItem package can group the SupplierInvoiceItem together along with its packages. The SupplierInvoiceItem package can contain the package: BusinessTransactionDocumentReference package.

The BusinessTransactionDocumentReference package can group together references to business documents. The BusinessTransactionDocumentReference can contain the entity: PurchaseOrderReference.

PurchaseOrderReference can be a reference to a purchase order or an item in a purchase order for which an invoice needs to be created. PurchaseOrderReference is of the type GDT of BusinessTransactionDocumentReference. PurchaseOrderReference can include Data Types: BusinessDocumentMessageHeader, and BusinessTransactionDocumentReference.

Business Object SupplierInvoiceVerificationException

FIG. 288 illustrates an example SupplierInvoiceVerificationException business object model 288004. Specifically, this model depicts interactions among various hierarchical components of the SupplierInvoiceVerificationException, as well as external components that interact with the SupplierInvoiceVerificationException (shown here as 288000 and 288002 and 288006 through 288012).

Business object SupplierInvoiceVerificationException can be a group of related issues arising during a supplier invoice verification process. The issues causing the exception can be bundled according to certain business criteria. A complex follow-up clarification process can be required to resolve the issues. SupplierInvoiceVerificationException can be part of the process component Supplier Invoice Processing, and can classify and document exceptions which occur during invoice verification. According to Exception-type the clarification-process can be specified and the necessary actions for clarification can be determined. The consequent clarification-process is complete recorded in processing log. Exception Price Variance is caught for example, when the price in an invoice is different to the price in the related purchase order. As a rule a clarification-process is requested in which the responsible buyer and supplier (on demand) are included. Exception Missing Goods Receipt can occur when there is no necessary goods receipt for a complete invoice.

The root node can contain the exception type, the reference to SupplierInvoice, as well as certain administrative data. The processing log node can contain the log of clarification-process. Typical information written in log can be event type (Exception is created, E-Mail is sent out, Task is created, etc.), receiver, attachments and other data.

The Business Object can be involved in the Process Integration Model Supplier Invoice Processing_Supplier Invoice Verification Exception Resolution.

Service Interface Exception Resolution In can be part of the Process Integration Model Supplier Invoice Processing_Supplier Invoice Verification Exception Resolution. The Interface can be a grouping of operations which update a Supplier Invoice Verification Exception and Supplier Invoices for the resolution of an exception within a supplier invoice. Operation Update Supplier Invoice Verification Exception can update a SupplierInvoiceVerificationException according to the changes made by an external party. The operation can be based on message type SupplierInvoiceVerificationExceptionResolutionConfirmation, which is derived from Business Object SupplierInvoiceVerificationException.

Service Interface Exception Resolution Out can be part of the Process Integration Model Supplier Invoice Processing_Supplier Invoice Verification Exception Resolution. The Interface can be a grouping of operations which request resolution of a exception from an external party. Request Exception Resolution can request the resolution of a exception from an external party. The operation can be based on message type InteractiveFormSupplierInvoiceVerificationExceptionResolutionRequest, which is derived from Business Object SupplierInvoiceVerificationException.

Business Object SupplierInvoiceVerificationException (Root Node) can bundle issues from invoice verification process according to criterion of enterprise control and the type of consequent clarification-process. The root node can contain some administrative data and the exception type. In some implementations, the elements located at node SupplierInvoiceVerificationException are defined by the data type SupplierInvoiceVerificationExceptionElements and include ID, UUID, SystemAdministrativeData, ProcessingTypeCode, CreationDayNumberValue, ChangeDayNumberValue, ApplicationLogUUID, AccessControlSupplierInvoiceUUID, Status, SupplierInvoiceVerificationExceptionLifecycleStatusCode, ForwardingStatusCode, ExceptionStatusCode, AcceptanceStatusCode, ConsistencyStatusCode, and ActivationStatusCode In some implementations, ID is an identifier for the SupplierInvoiceVerificationException and is based on GDT BusinessTransactionDocumentID; UUID is a universal unique alternative identifier of the SupplierInvoiceVerificationException for referencing purposes and is based on GDT UUID; SystemAdministrativeData is administrative data stored within the system, wherein these data contain system users and time of change, and is based on GDT SystemAdministrativeData; ProcessingTypeCode is a coded representation of the SupplierInvoiceVerificationException processing type and is based on GDT BusinessTransactionDocumentProcessingTypeCode; CreationDayNumberValue is a number of days since the exception was created and is based on GDT NumberValue with qualifier Day; ChangeDayNumberValue is a number of days since the exception was changed lastly and is based on GDT NumberValue with qualifier Day; ApplicationLogUUID is the UUID of the ApplicationLog root node for referencing the ApplicationLog that corresponds to current SupplierInvoiceVerificationException and is based on GDT UUID with qualifier ApplicationLog; AccessControlSupplierInvoiceUUID is the UUID of the SupplierInvoice root node for referencing the SupplierInvoice whose AccessControlList is used for access control to a SupplierInvoiceVerificationException and is based on GDT UUID; Status contains all individual status variables that are relevant for and describe the current state in the life cycle of a SupplierInvoiceVerificationException and is based on Data Type SupplierInvoiceVerificationExceptionStatus; SupplierInvoiceVerificationExceptionLifecycleStatusCode is status information of the overall SupplierInvoiceVerificationException processing and is based on GDT SupplierInvoiceVerificationExceptionLifecycleStatusCode; ForwardingStatusCode is forwarding status information of the SupplierInvoiceVerificationException and is based on GDT ForwardingStatusCode; ExceptionStatusCode is exception status information of the SupplierInvoiceVerificationException and is based on GDT ExceptionStatusCode; AcceptanceStatusCode is acceptance status information of the SupplierInvoiceVerificationException and is based on GDT AcceptanceStatusCode; ConsistencyStatusCode defines whether the SupplierInvoiceVerificationException is consistent or inconsistent and is based on GDT ConsistencyStatusCode; and ActivationStatusCode defines whether the SupplierInvoiceVerificationException is active or inactive and is based on GDT ActivationStatusCode.

Root node SupplierInvoiceVerificationException 288014 can have a 1:n cardinality composition relationship to subordinate node ProcessingLog 288016, and a 1:n cardinality composition relationship to subordinate node BusinessTransactionDocumentReference 288020. From Business Object SupplierInvoice/node Root, SupplierInvoiceVerificationException can have a 1:cn inbound association relationship to AccessControlBySupplierInvoice, which is the SupplierInvoice whose AccessControlList is used for access control to a SupplierInvoiceVerificationException. To Business Object ApplicationLog/node Root, SupplierInvoiceVerificationException can have a 1:c association for navigation to ApplicationLog, which is for the root of a SupplierInvoiceVerificationException.

To SupplierInvoiceVerificationExceptionBusinessTransactionDocumentReference, root node SupplierInvoiceVerificationException can have a c:c cardinality complete and disjoint specialization association for navigation to OriginalSupplierInvoiceReference, which is an association to a business transaction document reference which appears within the SupplierInvoice specialisation; a c:c cardinality complete and disjoint specialization association for navigation to OriginalSupplierInvoiceItemReference, which is an association to a business transaction document reference which appears within the SupplierInvoiceItem specialisation; and a c:cn cardinality complete and disjoint specialization association for navigation to DuplicateSupplierInvoiceReference, which is an association to a business transaction document reference which appears within the SupplierInvoice specialisation.

To SupplierInvoiceVerificationExceptionProcessingLog, root node SupplierInvoiceVerificationException can have a c:c cardinality incomplete and disjoint specialization association for navigation to CurrentForwardProcessingLog 288022, which is an association to a log which appears within the CurrentForward specialisation; a c:c cardinality incomplete and disjoint specialization association for navigation to CurrentReplyProcessingLog 288024, which is an association to a log which appears within the CurrentReply specialisation; and a c:c cardinality incomplete and disjoint specialization association for navigation to CorrespondingProcessingLog 288026, which is an association to a log which appears within the Corresponding specialisation.

Enterprise Service Infrastructure Action Simulate can simulate which SupplierInvoiceVerificationExceptions would be created if the supplied SupplierInvoice would be posted now. In some implementations, Simulate changes the object according to an internal logic, creates a reference from and to the SupplierInvoice, and its elements are defined by the data type SupplierInvoiceVerificationExceptionSimulateActionElements, including SupplierInvoiceID, which is the ID of the SupplierInvoice to be simulated and is based on GDT BusinessTransactionDocumentID.

Enterprise Service Infrastructure Action Accept can accept what led to the exception (e.g. the price deviation). In some implementations, Accept creates a new ProcessingLog and changes status to "Accepted."

Enterprise Service Infrastructure Action Reject can rejects what led to the exception (e.g. the price deviation). In some implementations, Reject creates a new ProcessingLog and changes status to "Rejected."

Enterprise Service Infrastructure Action Forward can forward the SupplierInvoiceVerificationException to a recipient via Email or Business Task Management. In some implementations, Forward creates a new ProcessingLog, when object is saved, agents will send messages, and changes status to "Forwarded".

In Enterprise Service Infrastructure Action Return, the caller can trigger this action if he wants to return already forwarded SupplierInvoiceVerificationExceptions. In some implementations, SupplierInvoiceVerificationException should have been forwarded before, and Return changes status to "Not forwarded".

In Enterprise Service Infrastructure Action MarkAsObsolete, the caller can trigger this action if a SupplierInvoiceVerificationException is obsolete because of changes to a referenced SupplierInvoice. In some implementations, MarkAsObsolete creates a new ProcessingLog and changes Status to "Obsolete".

In Enterprise Service Infrastructure Action Activate, the caller can trigger this action if he wants to activate the SupplierInvoiceVerificationException. In some implementations, the referenced SupplierInvoice should be in status "Data Entry finished", and status is changed to "Active".

Enterprise Service Infrastructure Action CheckConsistency can be used to check whether the SupplierInvoiceVerificationException is complete and consistent. In some implementations, this action is allowed only when the variable "Consistency" has either the value "Inconsistent" or "Consistent, and executing this action sets status variable ConsistencyStatusCode to "Inconsistent" or "Consistent", depending upon whether the check went fine or not.

Query QueryByElements can provide a list of all SupplierInvoiceVerificationExceptions which satisfy the selection criteria specified by the query elements, combined by logical "AND". If no selection criteria are specified, it is checked whether the query element matches to the corresponding element of the Business Object. In some implementations, SupplierInvoiceVerificationExceptionElementsQueryElements defines the query elements, including optional elements ID, which is based on GDT BusinessTransactionDocumentID; SystemAdministrativeData, which is based on GDT SystemAdministrativeData; BusinessTransactionDocumentReferenceOriginalSupplierInvoiceReference, which is based on GDT BusinessTransactionDocumentReference; BusinessTransactionDocumentReferenceOriginalSupplierInvoiceItemReference, which is based on GDT BusinessTransactionDocumentReference; ProcessingTypeCode, which is based on GDT BusinessTransactionDocumentProcessingTypeCode; CreationDayNumberValue which is based on GDT NumberValue with qualifier Day; ChangeDayNumberValue, which is based on GDT NumberValue with qualifier Day; Status, which is based on Data Type: SupplierInvoiceVerification-ExceptionStatus; SupplierInvoiceVerification-ExceptionLifecycleStatusCode, which is based on GDT SupplierInvoiceVerificationExceptionLifecycleStatusCode; ForwardingStatusCode, which is based on GDT Forwarding-StatusCode; ExceptionStatusCode, which is based on GDT ExceptionStatusCode; AcceptanceStatusCode, which based on GDT AcceptanceStatusCode; ConsistencyStatus, which is based on GDT ConsistencyStatusCode; and ActivationStatus, which is based on GDT ActivationStatusCode.

ProcessingLog can be a log that collects all relevant processing information, such as forwarding the SupplierInvoice via E-Mail or receiving an answer. A ProcessingLog can occur within the following specialisations: CurrentForwardProcessingLog; CurrentReplyProcessingLog; and CorrespondingProcessingLog. In some implementations, the elements located at the node ProcessingLog are defined by the data type SupplierInvoiceVerification-ExceptionProcessingLogElements and include UUID, SystemAdministrativeData, TypeCode, EmailSentIndicator, BusinessTaskSentIndicator, and ExceptionAutomaticallyForwardedIndicator, and optionally include Note and ApplicationLogUUID, wherein UUID is a universal unique alternative identifier of the SupplierInvoiceVerificationProcessingLog for referencing purposes and is based on GDT UUID; SystemAdministrativeData is administrative data containing system users and time of change stored within the system and is based on GDT SystemAdministrativeData; TypeCode defines the meaning of a log node and is based on GDT SupplierInvoiceVerification-ExceptionProcessingLogTypeCode; EmailSentIndicator indicates whether the SupplierInvoiceVerificationException has been forwarded via Email and is based on GDT Indicator with qualifier ExceptionEmailSent; BusinessTaskSentIndicator indicates whether the SupplierInvoiceVerification-Exception has been forwarded via Business Task Management and is based on GDT Indicator with qualifier ExceptionBusinessTaskSent; ExceptionAutomaticallyForwardedIndicator indicates whether an Exception has been forwarded automatically and is based on GDT Indicator with qualifier ExceptionAutomaticallyForwarded; Note is a short text for the ProcessingLog and is based on GDT Note; and ApplicationLogUUID is the UUID of the ApplicationLog root node for referencing the ApplicationLog that corresponds to current SupplierInvoiceVerificationException and is based on GDT UUID with qualifier ApplicationLog.

ProcessingLog can have a 1:cn cardinality composition relationship to subordinate node ProcessingLogParty 288030, a 1:c cardinality composition relationship to subordinate node ProcessingLogAttachmentFolder (DO), a 1:c cardinality composition relationship to subordinate node ProcessingLogTextCollection (DO), and a 1:c cardinality composition relationship to subordinate node ProcessingLog-ControlledOutputRequest (DO).

To Business Object ApplicationLog/node Root, ProcessingLog can have a 1:c cardinality association for navigation to ApplicationLog, the ApplicationLog for the processing log of a SupplierInvoiceVerificationException. To SupplierInvoiceVerificationExceptionProcessingLogParty, ProcessingLog can have a c:c cardinality complete disjoint specialization associations for navigation to Processor Party, which is an association to a party which appears within the Processor Party specialisation; and a c:c cardinality complete disjoint specialization associations for navigation to DispatcherParty, which is an association to a party which appears within the DispatcherParty specialisation.

Query QueryByElements can provide a list of all SupplierInvoiceVerificationExceptionProcessingLogs which satisfy the selection criteria specified by the query elements. In some implementations, SupplierInvoiceVerification-ExceptionProcessingLogElementsQueryElements defines the query elements, which optionally include SystemAdministrativeData based on GDT SystemAdministrativeDate; TypeCode based on GDT SupplierInvoiceVerification-ExceptionProcessingLogTypeCode; EmailSentIndicator based on GDT Indicator with qualifier ExceptionEmailSent; BusinessTaskSentIndicator based on GDT Indicator with qualifier ExceptionBusinessTaskSent; and ExceptionAutomaticallyForwardedIndicator based on GDT Indicator with qualifier ExceptionAutomaticallyForwarded.

ProcessingLogParty can be a party which is involved in a SupplierInvoiceVerificationExceptionProcessingLog, and can occur within the Processor Party specialisation, wherein a processor party is the party who is processing current SupplierInvoiceVerificationException, and within the DispatcherParty specialisation, wherein a dispatcher party is the party who dispatch the SupplierInvoiceVerificationException to certain processor. In some implementations, the elements located at the node SupplierInvoiceVerification-ExceptionProcessingLogParty are defined by the data type SupplierInvoiceVerification-ExceptionProcessingLogPartyElements based on BusinessTransactionDocumentPartyElements, and include UUID, AddressHostUUID, AddressHostTypeCode, and optionally include PartyID, PartyUUID, PartyTypeCode, RoleCategoryCode, RoleCode, AddressReference, and DeterminationMethodCode, wherein UUID is a universal unique alternative identifier of the SupplierInvoiceVerificationProcessingLogParty for referencing purposes and is based on GDT UUID; PartyID is an identifier of the ProcessingLogParty in this PartyRole in the business document or the master data object and is based on GDT PartyID without additional components, wherein if a business partner or organizational unit are referenced, the attribute contains their identifiers and if an unidentified identifier is, for example, entered by the user, the attribute contains this identifier; PartyUUID is a unique identifier for a business partner, the organizational unit, or their specializations and is based on GDT UUID; PartyTypeCode is a type of the business partner, organizational unit, or their specializations referenced by the attribute PartyUUID and is based on GDT PartyTypeCode; RoleCategoryCode is a Party Role Category of the ProcessingLogParty in the business document or the master data object and is based on GDT PartyRoleCategoryCode; RoleCode is a Party Role of the ProcessingLogParty in the business document or the master data object and is based on GDT PartyRoleCode; AddressReference is a reference to the address of the Party; AddressHostUUID is a globally unique identifier of the address of the business partner, the organizational center, or their specializations and is based on GDT UUID; AddressHostTypeCode is a coded representation of the address host type and is based on GDT AddressHostTypeCode; and DeterminationMethodCode is a coded representation of the determination method of the Party and is based on GDT PartyDeterminationMethodCode.

ProcessingLogParty can have a 1:c cardinality composition relationship to subordinate node ProcessingLogParty-Address (DO) 288028. From business object Party/Node Root, ProcessingLogParty can have a c:cn cardinality inbound aggregation relationship to Party, which is a referenced Party in Master Data. To transformed object UsedAddress/Node Root, ProcessingLogParty can have a c:c association for navigation to UsedAddress, wherein the transformed object UsedAddress represents a uniform way to access a party address of a procurement document whether it's a business partner address, a organization center address or an address specified within a procurement document.

Dependent object ProcessingLogPartyAddress can be a SupplierInvoiceVerificationException specific address of the Party in the processing log. For detailed structure see Dependent Object Address.

Dependent object ProcessingLogAttachmentFolder 288032 can be a folder of all documents attached to the procurement document. For detailed structure see Dependent Object AttachmentFolder.

Dependent object ProcessingLogTextCollection 288034 can be a collection of all textual descriptions which are related to the procurement document, wherein each text can be specified in different languages and can include formatting information. For detailed structure see Dependent Object TextCollection.

Dependent object ProcessingLogControlledOutputRequest 288036 can be a controller of output requests and processed output requests related to the SupplierInvoiceVerificationExceptionProcessingLog, wherein several output channels are supported for sending out documents. A Controlled Output Request can support the output to several output channels. Possible output channels are print, email, fax, or XML messaging. For detailed structure see Dependent Object ControlledOutputRequest.

BusinessTransactionDocumentReference can be a unique reference to another business transaction document or an item within that document which is related to the SupplierInvoiceVerificationException and can occur within the following specialisations:

OriginalSupplierInvoiceReference, wherein an OriginalSupplierInvoiceReference is a reference to the SupplierInvoice which was the reason for the creation of the SupplierInvoiceVerificationException;

OriginalSupplierInvoiceItemReference, wherein an OriginalSupplierInvoiceItemReference is a reference to the SupplierInvoice and its item which was the reason for the creation of the SupplierInvoiceVerificationException; and DuplicateSupplierInvoiceReference, wherein a DuplicateSupplierInvoiceItemReference is a reference to the SupplierInvoice which was detected as a duplicate invoice.

In some implementations, elements located at the node SupplierInvoiceVerificationExceptionBusinessTransactionDocumentReference are defined by the data type SupplierInvoiceVerificationExceptionBusinessTransactionDocumentReferenceElements based on BusinessTransactionDocumentReferenceElements, and include BusinessTransactionDocumentReference, which is a unique reference to the referred business transaction document, wherein it is possible to have a reference to a line item within the business transaction document, based on GDT BusinessTransactionDocumentReference; and BusinessTransactionDocumentRelationshipRoleCode, which is a coded representation of the role of a BusinessTransactionDocument in this reference based on GDT BusinessTransactionDocumentRelationshipRoleCode.

From the business object SupplierInvoice, BusinessTransactionDocumentReference can have a c:c inbound association relationship with SupplierInvoice, wherein a SupplierInvoiceVerificationException may refer to another SupplierInvoice; and a c:c inbound association relationship with SupplierInvoiceItem, wherein a SupplierInvoiceVerificationException may refer to another an item of a SupplierInvoice.

FIG. 289-1 through 289-26 illustrates one example logical configuration of InteractiveFormSupplierInvoiceVerificationExceptionResolutionRequestMessage message 289000. Specifically, this figure depicts the arrangement and hierarchy of various components such as one or more levels of packages, entities, and datatypes, shown here as 289000 through 289688. As described above, packages may be used to represent hierarchy levels. Entities are discrete business elements that are used during a business transaction. Data types are used to type object entities and interfaces with a structure. For example, InteractiveFormSupplierInvoiceVerificationExceptionResolutionRequestMessage message 289000 includes, among other thingsSupplierInvoiceVerificationException 289086. Accordingly, heterogeneous applications may communicate using this consistent message configured as such.

FIG. 290-1 through 290-11 illustrates one example logical configuration of SupplierInvoiceVerificationExceptionResolutionConfirmationMessage message 290000. Specifically, this figure depicts the arrangement and hierarchy of various components such as one or more levels of packages, entities, and datatypes, shown here as 290000 through 290282. As described above, packages may be used to represent hierarchy levels. Entities are discrete business elements that are used during a business transaction. Data types are used to type object entities and interfaces with a structure. For example, SupplierInvoiceVerificationExceptionResolutionConfirmationMessage message 290000 includes, among other things, SupplierInvoiceVerificationException 290080. Accordingly, heterogeneous applications may communicate using this consistent message configured as such.

The InteractiveFormSupplierInvoiceVerificationExceptionResolutionRequest message type is motivated by business processes in which invoices require further analysis, corrections or just feedback from internal or external partners per adobe form as email attachment. For example, an invoicing clerk requires a InteractiveFormSupplierInvoiceVerificationExceptionResolutionRequest per Email communication with adobe form in Requisitioning confirmation of a price variance between current invoice and corresponding purchasing order.

The SupplierInvoiceVerificationExceptionResolutionconfirmation message type is motivated by business processes in which further analysis, corrections or just feedback from internal or external partners is sent to invoice verification process.

An InteractiveFormSupplierInvoiceVerificationExceptionResolutionRequest is an adobe form based request that an invoice is to be corrected, analysed or simply to be given certain feedback. The structure of the message type InteractiveFormSupplierInvoiceVerificationExceptionResolutionRequest is specified by the message data type InteractiveFormSupplierInvoiceVerificationExceptionResolutionRequestMessage. The message of type InteractiveFormSupplierInvoiceVerificationExceptionResolutionRequest sent to certain internal or external partner per email is to triggering an invoice exception resolution process.

A SupplierInvoiceVerificationExceptionResolutionConfirmation is a confirmation that an invoice is already corrected, analysed or simply some feedback/comment is given. The structure of the message type SupplierInvoiceVerification- ExceptionResolutionConfirmation is specified by the message data type SupplierInvoiceVerification-ExceptionResolutionConfirmationMessage. The message of type SupplierInvoiceVerification-ExceptionResolutionConfirmation sent to invoice verification process by internal or external partner is to complete an invoice exception resolution process.

The InteractiveFormSupplierInvoiceVerificationExceptionResolutionRequestMessage message data type groups together business information that is relevant for solving an invoice exception and for correcting an invoice. The message data type InteractiveFormSupplierInvoiceVerificationExceptionResolutionRequestMessage contains: the SupplierInvoiceVerificationException object contained in the business document, the SupplierInvoice object contained in the business document, and business information and form specific information relevant for sending a business document in a message. It contains the packages: MessageHeader and SupplierInvoiceVerification-Exception package. The message data type InteractiveForm SupplierInvoiceVerification-ExceptionResolutionRequestMessage thus provides the structure for the message type InteractiveFormSupplierInvoiceVerificationExceptionResolutionRequest and the interfaces that are based on it.

A MessageHeader package groups business information relevant for sending a business document in a message. It contains the entities: MessageHeader, InteractiveFormReturnURI and ProcessorEmailURI.

A MessageHeader groups together business information from the point of view of the sending application for business document identification in a message. This is of the GDT type: BusinessDocumentMessageHeader.

An InteractiveFormReturnURI is the email address which the email with form attachment can be sent back to. This could be used to enable the automatic mail processing. The InteractiveFormReturnURI is of type GDT: EmailURI, and may be optional.

A ProcessorEmailURI is the email address from the mail processor, is of type GDT: EmailURI, and may be optional.

The SupplierInvoiceVerificationException package groups the SupplierInvoiceVerificationException and SupplierInvoice together with its packages. It contains the einities: AttachmentFolder, TextCollection and ReplyTextCollection. It contains the packages: Message, Invoice, PotentialDuplicateSupplierInvoice and Properties.

The SupplierInvoiceVerification-ExceptionResolutionRequest contains the following elements: ReconciliationPeriodCounterValue, ID, ProcessingTypeCode, ProcessingTypeCodeName, AcceptanceStatusCode, AcceptanceStatusCodeName, AttachmentFolder, TextCollection and ReplyTextCollection.

ReconciliationPeriodCounterValue is a counter for reconciliation periods, is of type GDT: CounterValue, and may be optional. ID is of type GDT: BusinessTransactionDocumentID. ProcessingTypeCode is of type GDT: BusinessTransactionDocumentProcessingTypeCode, and may be optional. ProcessingTypeCodeName is of type GDT: Name, and may be optional. AcceptanceStatusCode is the acceptance Status information of the SupplierInvoiceVerificationException, is of type GDT: AcceptanceStatusCode, and may be optional. AcceptanceStatusCodeName is of type GDT: Name, and may be optional.

The Message package groups error Message information with its packages. Message is the original error messages which cause current invoice exception. The Message contains element: Note of type GDT: Note.

Invoice Package is the Invoice package groups the SupplierInvoice together along with its packages. It contains the entities: CashDiscountTerms, ProductTax and TextCollection. It contains the packages: Party, Location, BusinessTransactionDocumentReference, Item and SupplierInvoiceVerificationExceptionSupplierInvoiceReq.

The SupplierInvoiceVerification-ExceptionSupplierInvoiceReq contains the following elements: ID, BillToId, TypeCode, TypeCodeName, DataOriginTypeCode, DataOriginTypeCodeDescription, Date, TransactionDate, ReceiptDate, CancellationInvoiceIndicator, Name, GrossAmount, TotalGrossAmount, TotalNetAmount, TaxAmount, TotalTaxAmount, BalanceAmount, ExchangeRate, CashDiscountTerms and ProductTax.

ID is of type GDT: BusinessTransactionDocumentID. BillTold is of type GDT: BusinessTransactionDocumentID, and may be optional. TypeCode is of type GDT: BusinessTransactionDocumentTypeCode, and may be optional. TypeCodeName is of type GDT: Name, and may be optional. DataOriginTypeCode is of type GDT: ProcurementDocumentDataOriginTypeCode, and may be optional. DataOriginTypeCodeDescription is of type GDT: Description, and may be optional. Date is of type GDT: Date, and may be optional. TransactionDate is of type GDT: Date, and may be optional. ReceiptDate is of type GDT: Date, and may be optional. CancellationInvoiceIndicator is of type GDT: Indicator, and may be optional.

Name is of type GDT: Name, and may be optional. GrossAmount is of type GDT: Amount, and may be optional. TotalGrossAmount is of type GDT: Amount, and may be optional. TotalNetAmount is of type GDT: Amount, and may be optional. TaxAmount is of type GDT: Amount, and may be optional. TotalTaxAmount is of type GDT: Amount, and may be optional. BalanceAmount is of type GDT: Amount, and may be optional. ExchangeRate is of type GDT: ExchangeRate, and may be optional. ProductTax is of type GDT: FormProductTax.

The Party package groups together all involved parties. It contains the entity: BillToParty, BillFromParty, BuyerParty, SellerParty, ServicePerformerParty, Requestor Party, ProductRecipientParty, PayerParty, PayeeParty, ResponsibleInvoicerParty, BillToParty.

BillToParty is of the type GDT: FormBusinessTransactionDocumentParty. BillFromParty is of the type GDT: FormBusinessTransactionDocumentParty. BuyerParty is of the type GDT: FormBusinessTransactionDocumentParty. SellerParty is of the type GDT: FormBusinessTransactionDocumentParty. ServicePerformerParty is of the type GDT: FormBusinessTransactionDocumentParty. Requestor Party is of the type GDT: FormBusinessTransactionDocumentParty. ProductRecipientParty is of the type GDT: FormBusinessTransactionDocumentParty. PayerParty is of the type GDT: FormBusinessTransactionDocumentParty. PayeeParty is of the type GDT: FormBusinessTransactionDocumentParty. ResponsibleInvoicerParty is of the type GDT: FormBusinessTransactionDocumentParty.

The location package groups location relevant information with its packages. The Location is a physical place, which is relevant for the tax calculation and the SupplierInvoice verification. It contains the entities ShipToLocation and ShipFromLocation.

ShipToLocation is of the type GDT: FormBusinessTransactionDocumentLocation. ShipFromLocation is of the type GDT: FormBusinessTransactionDocumentLocation BusinessTransactionDocumentReference Package contains the entities: PurchaseOrderReference, DeliveryReference, ServiceAcknowledgementReference, OriginInvoiceReference and PurchasingContractReference.

PurchaseOrderReference is of type GDT: BusinessTransactionDocumentReference. DeliveryReference is of type GDT: BusinessTransactionDocumentReference. ServiceAcknowledgementReference is of type GDT: BusinessTransactionDocumentReference. OriginInvoiceReference is of type GDT: BusinessTransactionDocumentReference. PurchasingContractReference is of type GDT: BusinessTransactionDocumentReference.

Item Package groups invoice item information together with its packages. It contains the entities: ProductTax and HierarchyRelationship. It contains the packages: ProductInformation, Party, Location and BusinessTransactionDocumentReference.

An SupplierInvoiceVerificationExceptionSupplierInvoiceItemReq specifies invoiced or credited amounts and taxes for the quantity of a product, service or free text item that has been delivered or for a service that has been rendered by a supplier (SellerParty or ServicePerformerParty respectively).

The SupplierInvoiceVerificationExceptionSupplierInvoiceItemReq contains the following elements: ID, BillToID, TypeCode, TypeCodeDescription, Quantity, QuantityUnitCodeName, PurchaseOrderQuantity, PurchaseOrderquantityUnitCodeName, DeliveryQuantity, DeliveryQuantityUnitCodeName, NetAmount, NetUnitPrice, PurchaseOrderNetUnitPrice, ExchangeRate, CostUpperLimitAmount, CostUpperLimitExpectedAmount, Description and DeliveryPeriod.

ID is of type GDT: BusinessTransactionDocumentItemID, and can be optional. BillToID is of type GDT: BusinessTransactionDocumentItemPartyID, and can be optional. TypeCode is of type GDT: BusinessTransactionDocumentItemTypeCode, and can be optional. TypeCodeDescription is of type GDT: Description, and can be optional. Quantity is of type GDT: Quantity, and can be optional. QuantityUnitCodeName is of type GDT: Name, and can be optional. PurchaseOrderQuantity is of type GDT: Quantity, and can be optional. PurchaseOrderquantityUnitCodeName is of type GDT: Name, and can be optional. DeliveryQuantity is of type GDT: Quantity, and can be optional. DeliveryQuantityUnitCodeName is of type GDT: Name, and can be optional. NetAmount is of type GDT: Amount, and can be optional. NetUnitPrice is of type GDT: FormPrice, and can be optional. PurchaseOrderNetUnitPrice is of type GDT: FormPrice, and can be optional. ExchangeRate is of type GDT: exchangeRate, and can be optional. CostUpperLimitAmount is of type GDT: Amount, and can be optional. CostUpperLimitExpectedAmount is of type GDT: Amount, and can be optional. Description is of type GDT: SHORT_Description, and can be optional. DeliveryPeriod is of type GDT: DateTimePeriod, and can be optional.

SupplierInvoiceVerificationExceptionSupplierInvoiceItemReqs can be arranged hierarchically using the following entity: HierarchyRelationship A HierarchyRelationship is the relationship between a subitem and a higher-level parent item in an item hierarchy. HierarchyRelationship contains the elements: ParentItemID, ParentItemBillToID and TypeCode.

ParentItemID is a reference to a parent item with the item number assigned by the invoicing party, and of type GDT: BusinessTransactionDocumentItemID. ParentItemBillToID is a reference to a parent item with the item number assigned by the invoice recipient, and is of type GDT: BusinessTransactionDocumentItemID. TypeCode is a coded representation of the type of hierarchical relationship between the subitem and its higher-level parent item, and is of type GDT: BusinessTransactionDocumentItemHierarchyRelationshipTypeCode. The ProductTax is of type GDT: FormProductTax.

The ProductInformation package groups product relevant information in packages. It contains the entities: Product and ProductCategory. Product is of the type GDT: BusinessTransactionDocumentProduct. ProductCategory is of the type GDT: BusinessTransactionDocumentProductCategory.

The Party package groups together all involved parties. It contains the entities ServicePerformerParty, Requestor Party and ProductRecipientParty. ServicePerformerParty is of the type GDT: FormBusinessTransactionDocumentParty. Requestor Party is of the type GDT: FormBusinessTransactionDocumentParty. ProductRecipientParty is of the type GDT: FormBusinessTransactionDocumentParty.

BusinessTransactionDocumentReference Package contains the entity: PurchaseOrderReference, DeliveryReference, ServiceAcknowledgementReference, OriginInvoiceReference and PurchasingContractReference.

Properties Package groups the property control information with its packages. It contains the entities: NewSupplierInvoiceReference and PotentialDuplicateInvoiceReference.

SupplierInvoiceProperties control the BO element's property. The SupplierInvoiceProperties contains the following elements: SupplierInvoiceVerificationExceptionCauseCode and SupplierInvoiceVerificationExceptionConflictResolutionCode.

A NewSupplierInvoiceReference is a reference to the new SupplierInvoice which holds all necessary SupplierInvoice information. The NewSupplierInvoiceReference is of type GDT: BusinessTransactionDocumentReference.

A PotentialDuplicateInvoiceReference is a reference to the potential duplicate SupplierInvoice which holds all necessary SupplierInvoice information. The PotentialDuplicateInvoiceReference is of type GDT: BusinessTransactionDocumentReference.

Data Model of Message Data Type

The SupplierInvoiceVerificationExceptionResolutionConfirmationMessage message data type groups together business information that is relevant for solving an invoice exception and for correcting an invoice. The message data type SupplierInvoiceVerificationExceptionResolutionConfirmationMessage contains the SupplierInvoiceVerificationException object contained in the business document, the SupplierInvoice object contained in the business document, and business information and form specific information relevant for sending a business document in a message. It contains the packages: MessageHeader and SupplierInvoiceVerificationException. The message data type SupplierInvoiceVerificationExceptionResolutionConfirmationMessage thus provides the structure for the message type SupplierInvoiceVerificationExceptionResolutionConfirmation and the interfaces that are based on it.

A MessageHeader package groups business information relevant for sending a business document in a message. It contains the entities MessageHeader and ProcessorEmailURI. A MessageHeader groups together business information from the point of view of the sending application for business document identification in a message. This is of the GDT type: BusinessDocumentMessageHeader.

A ProcessorEmailURI is the email address from the mail processor. The ProcessorEmailURI is of type GDT: EmailURI and may be optional.

The SupplierInvoiceVerificationException package groups the SupplierInvoiceVerificationException and SupplierInvoice together with its packages. It contains the entities: AttachmentFolder and TextCollection. It contains the packages: Invoice.

The SupplierInvoiceVerificationExceptionResolutionConfirmation contains the following elements: ReconciliationPeriodCounterValue, ID and AcceptanceStatusCode.

ReconciliationPeriodCounterValue is a counter for reconciliation periods. ID is of type GDT: BusinessTransactionDocumentID. AcceptanceStatusCode is the acceptance Status information of the SupplierInvoiceVerificationException, and is of GDT: AcceptanceStatusCode.

The Invoice package groups the SupplierInvoice together along with its packages. It contains the entity: CashDiscountTerms. It contains the packages: Party, Item and SupplierInvoiceVerificationExceptionSupplierInvoiceConf.

The SupplierInvoiceVerificationExceptionSupplierInvoiceConf contains the following elements: ID, BillTold, Date, TransactionDate, ReceiptDate, GrossAmount, TaxAmount and CashDiscountTerms.

ID is of type GDT: BusinessTransactionDocumentID. BillTold is of type GDT: BusinessTransactionDocumentID, and may be optional. Date is of type GDT: Date, and may be optional. TransactionDate is of type GDT: Date, and may be optional. ReceiptDate is of type GDT: Date, and may be optional. GrossAmount is of type GDT: Amount, and may be optional. TaxAmount is of type GDT: Amount, and may be optional.

The Party package groups together all involved parties. It contains the entities: BillFromParty, BuyerParty, SellerParty and PayeeParty.

BillFromParty is of the type GDT: BusinessTransactionDocumentParty. BuyerParty is of the type GDT: BusinessTransactionDocumentParty. SellerParty is of the type GDT: BusinessTransactionDocumentParty. PayerParty is of the type GDT: BusinessTransactionDocumentParty.

The Item package groups invoice item information together with its packages. It contains the packages: ProductInformation and BusinessTransactionDocumentReference.

A SupplierInvoiceVerificationExceptionSupplierInvoiceItemConf specifies invoiced or credited amounts and taxes for the quantity of a product, service or free text item that has been delivered or for a service that has been rendered by a supplier (SellerParty or ServicePerformerParty respectively).

The SupplierInvoiceVerificationExceptionSupplierInvoiceItemConf contains the following elements: ID, BillToID, Description and Quantity.

ID is of type GDT: BusinessTransactionDocumentItemID, and may be optional. BillToID is of type GDT: BusinessTransactionDocumentItemPartyID, and may be optional. Description is of type GDT: SHORT_Description, and may be optional. Quantity is of type GDT: Quantity, and may be optional.

The ProductInformation package groups product relevant information in packages. It contains the entities Product and ProductCategory.

Product is of the type GDT: BusinessTransactionDocumentProduct. ProductCategory is of the type GDT: BusinessTransactionDocumentProductCategory.

BusinessTransactionDocumentReference Package contains the entities PurchaseOrderReference, DeliveryReference, ServiceAcknowledgementReference and PurchasingContractReference.

PurchaseOrderReference is of type GDT: BusinessTransactionDocumentReference. DeliveryReference is of type GDT: BusinessTransactionDocumentReference. ServiceAcknowledgementReference is of type GDT: BusinessTransactionDocumentReference. PurchasingContractReference is of type GDT: BusinessTransactionDocumentReference.

Business Object DemandForecast

FIG. 291 illustrates one example of an DemandForecast business object model 291000. Specifically, this model depicts interactions among various hierarchical components of the DemandForecast, as well as external components that interact with the DemandForecast (shown here as 291002 through 291004 and 291012 through 291016).

The Business Object DemandForecast is a forecast of a material demand in a particular supply planning area. The forecast is usually created using a forecast from demand planning (business object: DemandPlan) taking additional aspects into account. The business object DemandForecast is part of the process component Demand Forecast Processing. A DemandForecast contains information on the received and processed forecast demands. The business object DemandForecast is involved in the following process integration model: DemandPlanning_DemandForecastProcessing Service Interface Demand Forecasting In Service Interface Demand Forecasting In can have the Technical Name DemandForecastProcessingDemandForecastingIn. The service interface Demand Forecasting In is part of the following process integration model: DemandPlanning_DemandForecastProcessing. The service interface DemandForecastingIn is a grouping of operations that update the process component DemandForecastProcessing with forecast data.

Maintain Demand Forecast A2A

The Technical Name of Maintain Demand Forecast A2A can be DemandForecastProcessingDemandForecastingIn.MaintainDemandForecast. The operation is based on the message type DemandForecastNotification (derived from the business object DemandForecast).

Node Structure of Business Object DemandForecast

DemandForecast (Root Node)

A forecast from demand planning of a material demand in a particular supply planning area.

It contains the identifying and administrative information of a demand forecast.

The elements found directly at the node DemandForecast 291006 are defined by the data type: DemandForecastElements. These elements can include: UUID, MaterialUUID, MaterialID, SupplyPlanningAreaUUID, SupplyPlanningAreaID, ReceivedSupplyPlanningAreaID, ReceivedSiteUUID, ReceivedSiteID, TimeBucketSizeCode, ReceiptDateTime, ReleaseDateTime, ForecastReleasedStatusCode UUID is the universally unique identifier of a DemandForecast, and can be of type GDT: UUID. MaterialUUID is the universally unique identifier of the material for which forecasting was performed, and can be of type GDT: UUID (Qualifier: Material). MaterialID is the unique identifier of the material for which forecasting was performed, and can be of type GDT: ProductID. SupplyPlanningAreaUUID is the universally unique identifier of the supply planning area for which forecasting was performed, and can be of type GDT: UUID (Qualifier: SupplyPlanningArea). SupplyPlanningAreaID is the universally unique identifier of the supply planning area for which forecasting was performed, and can be of type GDT: SupplyPlanningAreaID. ReceivedSupplyPlanningAreaID is the received identifier of a supply planning area, can be of type GDT: UUID (Qualifier: ReceivedSupplyPlanningArea), and can be optional. ReceivedSiteUUID is the received universally unique identifier of a site, can be of type GDT: UUID Qualifier: ReceivedSite, and can be optional. ReceivedSiteID is the received identifier of a site, can be of type GDT: LocationID, and can be optional. TimeBucketSizeCode is the bucket size for the item periods, can be of type GDT: DemandForecastTimeBucketSizeCode, and can be optional. ReceiptDateTime is the date that the last forecast (that is, a message for this business objects) was received and correctly processed, can be of type GDT: LOCALNORMALISED_DateTime (Qualifier: Receipt), and can be optional. ReleaseDateTime is the date that the forecast was released, can be of type GDT: LOCALNORMALISED_DateTime (Qualifier: Release), and can be optional.

Status serves to group the status codes, and can be of type GTD: DemandForecastStatus. ForecastReleasedStatusCode denotes whether the demand forecast has been released and can be of type GDT: ReleasedStatusCode (Qualifier: Forecast).

The following composition relationships to subordinate nodes exist. The DemandPlanningTimeSeriesItem 291008 has a cardinality relationship of 1:cn. ProcessedTimeSeriesItem 291010 has a cardinality relationship 1:cn.

Inbound Association Relationships

There may be a number of inbound aggregation relationships. From Material business object (or node) to the DemandForecast business object (or node) there may be a cardinality relationship of 1:cn. Material specifies the material for which the forecast was performed. From the SupplyPlanningArea business object (or node) to the DemandForecast business object (or node) there may be a cardinality relationship of 1:cn. SupplyPlanningArea specifies the supply planning area for which the forecast was performed.

Specialization Associations for Navigation

There may be a number of specialization associations for navigation, such as aggregation relationships with business objects (or nodes) in other process components. To the business object SupplyPlanningArea/node SupplyPlanningArea there may be a cardinality relationship of cn:c. A ReceivedSupplyPlanningArea association is an association to the receiving supply planning area for which the forecast was performed. To the business object Location/node Location there may be a cardinality relationship of cn:c A Location association is an association to the receiving site for which the forecast was performed. To the business object PlannedIndependentRequirement/node PlannedIndependentRequirement there may be a cardinality relationship of c:c. A PlannedIndependentRequirement association is an association to the planned independent requirement that was created.

Integrity

In certain implementations, the following integrity conditions exist. The MaterialUUID has to correspond to the ProductUUID of the associated material. The SiteUUID has to correspond to the UUID of the associated site. The SupplyPlanningAreaUUID has to correspond to the SupplyPlanningAreaUUID of the associated supply planning area. The ProductInternalID has to correspond to the ProductInternalID of the associated material. The SiteInternalID has to correspond to the internal identifier of the associated site. The SupplyPlanningAreaInternalID has to correspond to the SupplyPlanningArealInternalID of the associated supply planning area.

Enterprise Service Infrastructure Actions

The action "Release" is used to release the demand forecast for further processing. Using this action, the demand forecast is passed on to the business object PlannedIndependentRequirement in the process component Supply and Demand Matching. Changes to the object can include the status variable being set. Changes to the status can include the status ReleasedStatus being set to Released. Changes to the object PlannedIndependentRequirement can include the action triggering the adjustment of the PlannedIndependentRequirements according to the current demand forecast. It is also possible for a PlannedIndependentRequirement to be created or deleted.

Queries

The QueryByElements query provides a list of all DemandForecasts that meet the selection criteria specified by the query elements, linked by a logical "AND". The GDT: DemandForecastElementsQueryByElements can define the query elements: MaterialUUID, MaterialID, ProductProductCategoryAssignmentProductCategoryID, SupplyPlanningAreaDescriptionDescription, TimeBucketSizeCode, ReceiptDateTime, ReleaseDateTime and ForecastReleasedStatusCode. MaterialUUID is of type GDT: UUID (Qualifier: Material). MaterialID is of type GDT: ProductID. ProductProductCategoryAssignmentProductCategoryID is of type GDT: ProductCategoryID. ProductProductCategoryAssignmentCategoryHierarchyID is of type GDT: ProductCategoryHierarchyID. SupplyPlanningAreaUUID is of type GDT: UUID (Qualifier: SupplyPlanningArea). SupplyPlanningAreaID is of type GDT: SupplyPlanningAreaID. SupplyPlanningAreaDescriptionDescription is of type GDT: SHORT_Description (Qualifier: SupplyPlanningArea). TimeBucketSizeCode is of type GDT: DemandForecastTimeBucketSizeCode. ReceiptDateTime is of type GTD: LOCALNORMALISED_DateTime (Qualifier: Receipt). ReleaseDateTime is of type GDT: LOCALNORMALISED_DateTime (Qualifier: Release). ForecastReleasedStatusCode is of type GDT: ReleasedStatusCode (Qualifier: Forecast).

DemandPlanningTimeSeriesItem

An DemandPlanningTimeSeriesItem is an item in a time series that contains the received forecast demands from demand planning. It is used as a basis for the further planning. The elements located directly at the node DemandPlanningTimeSeriesItem are defined by the data type DemandForecastDemandPlanningTimeSeriesItemElements. These elements include: ForecastPeriod, ForecastQuantity and ForecastQuantityTypeCode. ForecastPeriod is the Period in which the demand is expected, is of type GDT: UPPEROPEN_LOCALNORMALISED DateTimePeriod, Qualifier: Forecast), and may be optional. ForecastQuantity is the forecast quantity of the demand, is of type GDT: Quantity (Qualifier: Forecast), and may be optional. ForecastQuantityTypeCode is the type of the forecast quantity, is of type GDT: QuantityTypeCode (Qualifier: Forecast (requested)), and may be optional.

ProcessedTimeSeriesItem

ProcessedTimeSeriesItem is an item in a time series that contains the forecast demands after having been processed by the process component Demand Forecast Processing. The elements located directly at the node ProcessedTimeSeriesItem are defined by the data type DemandForecastProcessedTimeSeriesItemElements. These elements include: ForecastPeriod, ForecastQuantity, ForecastQuantityTypeCode and RequirementDateTime.

ForecastPeriod is the period in which the demand is expected and is of type GDT: UPPEROPEN_LOCALNORMALISED_DateTimePeriod (Qualifier: Forecast). ForecastQuantity is the forecast quantity of the demand and is of type GDT: Quantity (Qualifier: Forecast). ForecastQuantityTypeCode is the type of the forecast quantity and is of type GDT: QuantityTypeCode (Qualifier: Forecast (requested)). RequirementDateTime is the date on which the forecasted demand is required and is of type GDT: LOCALNORMALISED_DateTime (Qualifier: Requirement).

Queries

The QueryByForecastPeriod query provides a list of all ProcessedTimeSeriesItems that meet the selection criteria specified by the query elements, linked by a logical "AND".

GDT: DemandForecastProcessedTimeSeriesItemForecastPeriodQueryElements defines the query elements: DemandForecastMaterialUUID, DemandForecastMaterialID, ProductProductCategoryAssignmentProductCategoryID, ProductProductCategoryAssignmentProductCategoryHierarchy, DemandForecastSupplyPlanningAreaUUID, DemandForecastSupplyPlanningAreaID, SupplyPlanningAreaDescriptionDescription, DemandForecastTimeBucketSizeCode, DemandForecastReceiptDateTime, DemandForecastReleaseDateTime DemandForecastForecastReleasedStatusCode, StartDateTime and EndDateTime.

DemandForecastMaterialUUID is of type GDT: UUID (Qualifier: Material). DemandForecastMaterialID is of type GDT: ProductID. ProductProductCategoryAssignmentProductCategoryID is of type GDT: ProductCategoryID. ProductProductCategoryAssignmentProductCategoryHierarchyID is of type GDT: ProductCategoryHierarchyID. DemandForecastSupplyPlanningAreaUUID is of type GDT: UUID (Qualifier: SupplyPlanningArea). DemandForecastSupplyPlanningAreaID is of type GDT: SupplyPlanningAreaID. SupplyPlanningAreaDescriptionDescription is of type GDT: SHORT_Description (Qualifier: SupplyPlanningArea). DemandForecastTimeBucketSizeCode is of type GDT: DemandForecastTimeBucketSizeCode. DemandForecastReceiptDateTime is of type GTD: LOCALNORMALISED_DateTime (Qualifier: Receipt). DemandForecastReleaseDateTime is of type GDT: LOCALNORMALISED_DateTime (Qualifier: Release). DemandForecastForecastReleasedStatusCode is of type GDT: ReleasedStatusCode (Qualifier: Forecast). StartDateTime is of type GTD: LOCALNORMALISED_DateTime (Qualifier: Start). EndDateTime is of type GTD: LOCALNORMALISED_DateTime (Qualifier: End).

FIG. 292 illustrates one example logical configuration of DemandForecastNotificationMessage message 292000. Specifically, this figure depicts the arrangement and hierarchy of various components such as one or more levels of packages, entities, and datatypes, shown here as 292000 through 292024. As described above, packages may be used to represent hierarchy levels. Entities are discrete business elements that are used during a business transaction. Data types are used to type object entities and interfaces with a structure. For example, The DemandForecastNotificationMessage message 292000 includes, among other things, a DemandForecastNotification 2922004. Accordingly, heterogeneous applications may communicate using this consistent message configured as such.

FIG. 293-1 through 293-6 illustrates one example logical configuration of DemandForecastNotification message 293000. Specifically, this figure depicts the arrangement and hierarchy of various components such as one or more levels of packages, entities, and datatypes, shown here as 293000 through 293138. As described above, packages may be used to represent hierarchy levels. Entities are discrete business elements that are used during a business transaction. Data types are used to type object entities and interfaces with a structure. For example, DemandForecastNotification message 293000 includes, among other things, DemandForecast 293038. Accordingly, heterogeneous applications may communicate using this consistent message configured as such.

DemandForecast Message Types and Its Signatures

This section describes the message types and their signatures that are derived from the operations of the business object DemandForecast. In a signature, the business object is contained as a "leading" business object. The DemandForecastNotification is used in the make-to-stock scenario. The message is used to send forecast demands from DemandPlanning To DemandForecastProcessing. The interface consists of one message type: DemandForecastNotification.

DemandForecastNotification Message Type A notification from demand planning to demand forecast processing about new or changed forecast demands. The structure of this message type is determined by the message data type DemandForecastNotificationMessage.

DemandForecastNotification Message Data Type

The DemandForecastNotification message data type includes the DemandForecastNotification object contained in the business document and the business information that is relevant for sending a business document in a message. The DemandForecastNotification contains the following packages: MessageHeader package and DemandForecastNotification package. The DemandForecastNotification message data type provides the structure for the following message types and the operations that are based on them.

MessageHeader Package

MessageHeader is a grouping of business information that is relevant for sending a business document in a message, and it contains the entity MessageHeader. MessageHeader is a grouping of business information from the perspective of the sending application: identification of the business document in a message, information about the sender, and optionally information about the recipient. MessageHeader can include subordinate entities SenderParty and RecipientParty.

MessageHeader is a GDT of type BusinessDocumentMessageHeader whereby the following elements of the GDT are used. ID is identification of the business document in the technical message. CreationDateTime is the creation date of the business document in the technical message.

SenderParty is the partner responsible for sending a business document at business application level. SenderParty is of the type GDT: BusinessDocumentMessageHeaderParty.

RecipientParty is the partner responsible for receiving a business document at business application level. RecipientParty is of the type GDT: BusinessDocumentMessageHeaderParty.

DemandForecastNotification Package

DemandForecastNotification is a package that groups the following elements of the DemandForecastNotification and can include subordinate entities Product, ShipFromLocation and QuantityTimeSeries.

DemandForecastNotification Entity

A DemandForecastNotification contains the following elements: ActionCode, CompleteTransmissionIndicator, ReconciliationPeriodCounterValue and SupplyPlanningAreaID. ActionCode is a coded representation of instructions to the recipient of a message containing information on how this DemandForecastNotification is to be processed, and is of type GDT: ActionCode. CompleteTransmissionIndicator denotes whether an element that was transferred in a message or in a list was completely transferred, is of type GDT: CompleteTransmissionIndicator, and can be optional. ReconciliationPeriodCounterValue is a counter for reconciliation periods, is of type GDT: ReconciliationPeriodCounterValue, and can be optional. SupplyPlanningAreaID is a unique identifier of the supply planning area for which forecasting was performed, is of type GDT: SupplyPlanningAreaID, and can be optional. In certain implementations, integrity considerations can include the condition that if the ShipFromLocation is not filled, then the SupplyPlanningAreaID should be filled.

DemandForecastNotificationLocation-Package

The DemandForecastNotificationLocation package groups the ShipFromLocation. A ShipFromLocation is the location from which the product (for which the demand is forecast) is delivered. A ShipFromLocation is of the type GDT: INTERNAL_BusinessTransactionDocumentShipFromLocation whereby only the InternalID is used.

In certain implementations, integrity considerations can include the following conditions. If the SupplyPlanningAreaID is not filled, then the ShipFromLocation should be filled. The location that is identified by the InternalID should be of the type Site-Only the InternalID may be filled. The other attributes of the GDT BusinessTransactionDocumentShipFromLocation may not be used.

DemandForecastNotification Product Package

The DemandForecastNotificationProduct package groups Product along with its packages. A Product is a material or immaterial good for which the demand is forecast. A Product is of the type GDT: INTERNAL_BusinessTransactionDocumentProduct whereby only the InternalID is used.

In certain implementations, integrity conditions can include the following. The InternalID is not optional in this message; it always has to be filled. The product that is identified by the InternalID should be of the type: Material. Only the InternalID may be filled. The other attributes of the GDT INTERNAL_BusinessTransactionDocumentProduct may not be used.

DemandForecastNotificationItem-Package

The DemandForecastNotificationItem package groups DemandPlanningTimeSeriesItem. A DemandPlanningTimeSeriesItem is an item in a time series that contains demand planning forecast demands. A DemandPlanningTimeSeriesItem is of the type GDT: DemandPlanningTimeSeriesItem.

Business Object Logistics Execution Requisition

FIGS. 294-1 through 294-15 illustrate an example Logistics Execution Requisition business object model 294032. Specifically, this model depicts interactions among various hierarchical components of the Logistics Execution Requisition, as well as external components that interact with the Logistics Execution Requisition (shown here as 294000 through 294030 and 294034 through 294114).

Business Object Logistics Execution Requisition is a requisition to Logistics that controls, triggers and monitors the execution of a logistic process on a macro logistics level to fulfill an order. The execution of a logistic process on a macro logistics level can comprise: an inbound site logistics execution activity, an outbound site logistics execution activity, an in-house site logistics execution activity and a transportation execution activity. In contrast to the execution of a logistic process on a macro logistics level, the execution of a logistic process on a micro logistics level for example of an outbound site logistics execution activity can comprise: a pick operation, a pack operation and a load operation The business object LogisticsExecutionRequisition does not control, trigger and monitor Manufacturing Execution. The fulfillment of an order within the LogisticsExecutionRequisition does not cover the fulfillment of a Production Order. A SiteLogisticsRequisition in contrast to a LogisticsExecutionRequisition is a request from Supply Chain Control (process component Logistics Execution Control) to Logistics Execution (process component Site Logistics) to execute a site logistics process for a certain quantity of material, by a certain time.

Process Component

The business object LogisticsExecutionRequisition is part of the process component Logistics Execution Control. A LogisticsExecutionRequisition contains the following main components: LogisticsExecutionRequisition contains information about references; Item contains information common to several activities about the item status, parties, delivery terms, transportation terms and item references; ItemActivity contains information about the product to be logistically processed (site logistics processing or transportation) as well as about the status, references, requested date and product; it also contains confirmation information like confirmed date, confirmed quantity and confirmed product.

The business object Logistics Execution Requisition is represented by the root node LogisticsExecutionRequisition 294116.

Service Interfaces

The Business Object LogisticsExecutionRequisition is involved in the following process integration model: LogisticsExecutionControl_OutboundDeliveryProcessing and LogisticsExecutionControl_InboundDeliveryProcessing Service Interface: Fulfillment In (A2A)

LogisticsExecutionControlFulfillmentIn: The Service Interface Fulfillment In is part of the following process integration models: LogisticsExecutionControl_OutboundDeliveryProcessing and LogisticsExecutionControl_InboundDeliveryProcessing. This interface contains the operation that changes a LogisticsExecutionRequisition based on received fulfilment confirmation data.

Operation: Change LogisticsExecutionRequisition based on Delivery Fulfillment

Confirmation

LogisticsExecutionControlFulfillmentIn.ChangeLogisticsExecutionRequisitionBasedOnDeliveryFulfillmentConfirmation: Logistics Execution Control receives fulfillment confirmation data from Delivery Processing. The operation is based on message DeliveryRequestFulfillmentConfirmation. This message type is derived from the business object DeliveryRequest.

Service Interface: Fulfillment Out (A2A) LogisticsExecutionControlFulfillmentOut: The Service Interface Fulfillment Out is part of the following process integration models: LogisticsExecutionControl_OutboundDeliveryProcessing and LogisticsExecutionControl_InboundDeliveryProcessing. This interface contains the operation that sends request data to logistics execution.

Operation: Request Delivery Fulfillment

LogisticsExecutionControlFulfillmentOut.RequestDeliveryFulfillment: LogisticsExecutionControl sends a DeliveryRequestFulfillmentRequest in order to maintain a DeliveryRequest. The operation is based on message DeliveryRequestFulfillmentRequest. This message type is derived from the business object DeliveryRequest.

Logistics Execution Requisition (Root node)

A requisition to Logistics to controls, triggers and monitors the execution of a logistic process on a macro logistics level to fulfill an order. It contains references to the related orders and items to fulfill. An order can be: a purchase order and a sales order. The elements located at the node Logistics Execution Requisition are defined by the data type: Logistics Execution RequisitionElements. These elements are: UUID and ID. UUID is a universal identifier, which can be unique, of the LogisticsExecutionRequisition for referencing purposes. UUID may be based on GDT: UUID. ID is identification for LogisticsExecutionRequisition. ID may be based on GDT:

BusinessTransactionDocumentID. Composition Relationships that exist include: Item 294018 1:n, BusinessTransactionDocumentReference 294200 1:c and AccessControlList 294208 1:1.

Specialization associations for navigation may have the following to business object LogisticsExecutionRequisition/node Item: StandardInboundItem 294128 c:cn, StandardOutboundItem 294126 c:cn and ReturnInboundItem 294124 c:cn. Similarly, to business object LogisticsExecutionRequisition/node BusinessTransactionDocumentReference: BaseBusinessTransactionDocument c:1. Inbound Association Relationships relate to associations for navigation, and thus from business object BusinessDocumentFlow/node Root, is BusinessDocumentFlow c:1. Integrity Conditions, as the LogisticsExecutionRequisition, can thus be based on a CustomerRequirement or on a PlanningViewOnPurchaseOrder, the association BaseBusinessTransactionDocument can navigate either to a CustomerRequirement or to a PlanningViewOnPurchaseOrder, but only to one of both.

Queries can involve QueryByElements and QueryByItemReferencedDocument. QueryByElements provides a list of all LogisticsExecutionRequisitions that satisfy the selection criteria specified by the query elements. GDT LogisticsExecutionRequisitionElementsQueryElements defines the query elements as follows:

ID which is optional and may be based on GDT: BusinessTransactionDocumentID. ItemPartyProductRecipientPartyKey as an identifier for the ProductRecipientParty, which is optional.

The query element is derived from the PartyRoleCode and the PartyKey of the ItemParty node. ItemPartyProductRecipientPartyKey may be based on GDT: PartyKey. ItemPartyVendorPartyKey as an identifier for the Vendor Party, which is optional.

The query element is derived from the PartyRoleCode and the PartyKey of the ItemParty node.

ItemPartyVendorPartyKey may be based on GDT: PartyKey. ItemPartySellerPartyKey as an identifier for the Vendor Party, which is optional. The query element is derived from the PartyRoleCode and the PartyKey of the ItemParty node. ItemPartySellerPartyKey may be based on GDT: PartyKey. ItemPartyBuyerPartyKey as an Identifier for the ProductRecipientParty, which is optional. The query element is derived from the PartyRoleCode and the PartyKey of the ItemParty node. ItemPartyBuyerPartyKey may be based on GDT: PartyKey. ItemPartyFreightForwarderPartyKey as an identifier for the FreightForwarderParty, which is optional. The query element is derived from the PartyRoleCode and the PartyKey of the ItemParty node. ItemPartyFreightForwarderPartyKey may be based on GDT: PartyKey.

Furthermore, ItemPartyCarrierPartyKey as an identifier for the CarrierParty, which is optional. The query element is derived from the PartyRoleCode and the PartyKey of the ItemParty node. ItemPartyCarrierPartyKey may be based on GDT: PartyKey. ItemProductProductID, which is optional and may be based on GDT: ProductID. ItemProductProductCategoryID, which is optional and may be based on GDT: ProductCategoryInternalID. ItemLocationShipFromLocationID, which is optional and maybe based on GDT: LocationID. ItemLocationShipToLocationID which is optional and may be based on GDT: LocationID. ItemLocationTransportationZoneAssignmentTransportationZoneID which is optional and may be based on GDT: TransportationZoneID. ItemTransportationTermsTransportServiceLevelCode which is optional and may be based on GDT: TransportServiceLevelCode. ItemTransportationTermsTransportModeCode which is optional and may be based on GDT: TransportModeCode. ItemTransportationTermsTransportMeans which is optional and may be based on GDT: TransportMeans. ItemDeliveryTermsDeliveryPriorityCode which is optional and may be based on GDT: BusinessTransactionPriorityCode.

QueryByItemReferencedDocument provides a list of LogisticsExecutionRequisitions that contain the entered reference document on item level. GDT: LogisticsExecutionRequisitionItemReferencedDocumentQueryElements defines the Query Element:

ItemBusinessTransactionDocumentReferenceCustomerRequirementItemReference which is optional and may be based on GDT: BusinessTransactionDocumentReference. ItemBusinessTransactionDocumentReferencePlanningViewOnPurchaseOrderItemReference which is optional and may be based on GDT: BusinessTransactionDocumentReference. ItemBusinessTransactionDocumentReferencePurchaseOrderItemReference which is optional and may be based on GDT: BusinessTransactionDocumentReference. ItemBusinessTransactionDocumentReferenceSalesOrderItemReference which is optional and may be based on GDT: BusinessTransactionDocumentReference. ItemBusinessTransactionDocumentReferenceServiceOrderItemReference which is optional and may be based on GDT: BusinessTransactionDocumentReference. ItemBusinessTransactionDocumentReferenceInboundDeliveryReference which is optional and may be based on GDT: BusinessTransactionDocumentReference. ItemBusinessTransactionDocumentReferenceOutboundDeliveryReference which is optional and may be based on GDT: BusinessTransactionDocumentReference. ItemBusinessTransactionDocumentReferenceConfirmedInboundDeliveryReference which is optional and may be based on GDT: BusinessTransactionDocumentReference.

BusinessTransactionDocumentReference

BusinessTransactionDocumentReference is a reference to a different business document or the business document item relevant to the logistics execution requisition. BusinessTransactionDocumentReference is of the data type: LogisticsExecutionRequisitionBusinessTransactionDocumentReferenceElements consisting of: BusinessTransactionDocumentReference, BusinessTransactionDocumentRelationshipRoleCode and DataProviderIndicator. BusinessTransactionDocumentReference is a reference, which can be unique to other business documents that are important for the delivery. Furthermore, it is also possible to have references to one or more line items within the same business document. BusinessTransactionDocumentReference may be based on GDT: BusinessTransactionDocumentReference.

BusinessTransactionDocumentRelationshipRoleCode is a coded representation of the role the referenced document or referenced document item plays in relation to the Logistics Execution Requisition, and is optional. BusinessTransactionDocumentRelationshipRoleCode may be based on GDT: BusinessTransactionDocumentRelationshipRoleCode.

DataProviderIndicator is the indication, whether some data are provided or not, and is optional. The word "some" usually makes reference to an object that takes part to a business process. DataProviderIndicator may be based on GDT: Indicator. Inbound Aggregation Relationships can be illustrated as: from business object PlanningViewOnPurchaseOrder/node PlanningViewOnPurchaseOrder, PlanningViewOnPurchaseOrder c:c, which is the root in a Planning View On Purchase Order. Also from business object CustomerRequirement/node CustomerRequirement, CustomerRequirement c:c, which is the root in a Customer Requirement. For Integrity Conditions, both references to CustomerRequirement and PlanningViewOnPurchaseOrder may not exist at the same time, it may only exists of both. For DO: AccessControlList, the AccessControlList is a list of access groups that have access to a LogisticsExecutionRequisition during a validity period. Defined in the dependent object AccessControlList.

Item

A requisition to Logistics to control, trigger and monitor for a certain quantity of a product the execution of a logistics process on a macro logistics level. It contains item information of a LogisticsExecutionRequisition for identification and administrative purposes and all data valid for the item such as product information with quantities and/or involved parties, status, references, and so on. It also contains references to the items of the orders to fulfill and the references to the successor business object items which fulfill the related orders. Furthermore it includes logistics execution activities to trigger, control and monitor activities of a logistics execution process. Item occurs in the following not complete and disjoint specializations: Standard inbound item, where item related to an ordered good that will be inbound logistically processed; Standard outbound item, where item related to an ordered good that will be outbound logistically processed and Return inbound item, where item related to a returned good. In a special case an Item can also serve as a node that groups other items of the type as described in the definition above. The Item can be specialized further to include: ServiceItem, service to be executed for materials that are delivered. In certain circumstances, these services may be considered separately and are therefore relevant for invoicing.

The elements located at the node Item are defined by the data type: LogisticsExecutionRequisitionItemElements. These elements are UUID, ID, TypeCode, FollowUpDespatchedDeliveryNotificationRequirementCode, FollowUpCustomerInvoiceRequestRequestRequirementCode, FollowUpInvoicingDueNotificationRequirementCode, FollowUpInboundDeliveryRequestFulfillmentRequestRequirementCode, FollowUpOutboundDeliveryRequestFulfillmentRequestRequirementCode, SystemAdministrativeData, SupplyPlanningAreaID and SupplyPlanningAreaUUID and Status.

UUID is an universal identifier, which may be unique, of the Item. UUID may be based on GDT: UUID ID is identification for Item and can be used to refer Item. ID may be based on GDT: BusinessTransactionDocumentItemID. TypeCode is a coded representation of the type of an item of a LogisticsExecutionRequisition and may be based on GDT: BusinessTransactionDocumentItemTypeCode. The following codes may be used: 037 LogisticsExecutionStandardInboundItem, 038 LogisticsExecutionStandardOutboundItem and 039 LogisticsExecutionReturnInboundItem FollowUpDespatchedDeliveryNotificationRequirementCode is a coded representation of the necessity of a Dispatched Delivery Notification as follow-up message FollowUpDespatchedDeliveryNotificationRequirementCode may be based on GDT: FollowUpMessageRequirementCode. FollowUpCustomerInvoiceRequestRequestRequirementCode is a coded representation of the necessity of a customer Invoice Request as a follow-up message. FollowUpCustomerInvoiceRequestRequestRequirementCode may be based on GDT: FollowUpMessageRequirementCode. The following codes may be used: 01 Required and 05 Forbidden. FollowUpInvoicingDueNotificationRequirementCode is a coded representation of the necessity of an Invoice Request as a follow-up message. FollowUpInvoicingDueNotificationRequirementCode may be based on GDT: FollowUpMessageRequirementCode. The following codes may be used: 01 Required and 05 Forbidden.

FollowUpInboundDeliveryRequestFulfillmentRequestRequirementCode is a coded representation of the necessity of an Inbound Delivery as a follow-up message. FollowUpInboundDeliveryRequestFulfillmentRequestRequirementCode may be based on GDT: FollowUpMessageRequirementCode. Only the following codes are used: 01 Required and 05 Forbidden. FollowUpOutboundDeliveryRequestFulfillmentRequestRequirementCode is a coded representation of the necessity of an Outbound Delivery as a follow-up message. FollowUpOutboundDeliveryRequestFulfillmentRequestRequirementCode may be based on GDT: FollowUpMessageRequirementCode. Only the following codes are used: 01 Required and 05 Forbidden.

SystemAdministrativeData may be referred to as administrativeData being administrative data for the item recorded by the system. This data includes system users and change times. SystemAdministrativeData may be based on GDT: SystemAdministrativeData. SupplyPlanningAreaID is a unique identifier of the supply planning area that holds the planning representation of the LogisticsExecutionRequisition. It is valid for all items that do not define an own supply planning area. SupplyPlanningAreaID may be based on GDT: SupplyPlanningAreaID. SupplyPlanningAreaUUID is a universal identifier, which can be unique, of the supply planning area that holds the planning representation of the LogisticsExecutionRequisition. It is valid for all items that do not define an own supply planning area. SupplyPlanningAreaUUID may be based on GDT: SupplyPlanningAreaUUID.

Status can be referred to as the LogisticsExecutionRequisitionItem and may be based on GDT: LogisticsExecutionRequisitionItemStatus. ReleaseStatusCode may be based on GDT: ReleaseStatusCode. ActivityProcessingStatusCode may be based on GDT: NOTSTARTEDINPROCESSFINISHEDProcessingStatusCode and Qualifier: Activity. OrderFulfillmentProcessingStatusCode may be based on GDT: NOTSTARTEDINPROCESSFINISHEDProcessingStatusCode and the Qualifier: OrderFulfillment. DeliveryBlockingStatusCode may be based on GDT: NOTBLOCKEDBLOCKEDBlockingStatusCode and Qualifier: Delivery. ConsistencyStatusCode may be based on GDT: ConsistencyStatusCode. CancellationStatusCode may be based on GDT: CancellationStatusCode.

Composition Relationships

The following composition relationships to subordinate nodes exist: ItemBusinessProcessVariantType 1:1, ItemHierarchyRelationship 1:cn, ItemParty 294174 1:cn, ItemLocation 294184 1:cn, ItemDeliveryTerms 294196 1:c, ItemTransportationTerms 294198 1:c, ItemProduct 294192 1:c, ItemQuantity 294194 1:cn, ItemBusinessTransactionDocumentReference 294202 1:cn, ItemActivity 294132 1:n, ItemScheduleLine 294120 1:cn. Specialization associations for navigation, in addition to business object LogisticsExecutionRequisition/node ItemBusinessProcessVariantTypes: MainBusinessProcessVariantType 294210 1:1. Similarly, business object LogisticsExecutionRequisition/node ItemParty: Vendor Party c:c, ProductRecipientParty c:c, CarrierParty c:c, FreightForwarderParty c:c, BuyerParty c:c, SellerParty c:c, PickupParty c:c and LogisticsRequestResponsibleParty c:c. Also, to business object LogisticsExecutionRequisition/node ItemLocation: ShipFromLocation c:c, ShipToLocation c:c. To business object LogisticsExecutionRequisition/node ItemBusinessTransactionDocumentReference: BaseItemBusinessTransactionDocument c:1. To business object LogisticsExecutionRequisition/node ItemQuantity: RequestedQuantity c:c, FulfilledQuantity c:c, OpenQuantity c:c, LogisticsExecutionRequisitionItemActivityTotalReleasedQuantity c:c, LogisticsExecutionRequisitionItemActivityTotalConfirmedQuantity c:c, LogisticsExecutionRequisitionItemActivityTotalForwardedQuantity c:c, LogisticsExecutionRequisitionItemActivityTotalFulfilledQuantity c:c, LogisticsExecutionRequisitionItemActivityTotalOpenQuantity c:c.

To business object LogisticsExecutionRequisition/node ItemBusinessTransactionDocumentReference: BusinessTransactionDocumentReferenceCustomerRequirement c:c, BusinessTransactionDocumentReferencePlanningViewOnPurchaseOrder c:c, BusinessTransactionDocumentReferenceSalesOrder c:c, BusinessTransactionDocumentReferenceServiceOrder c:c, BusinessTransactionDocumentReferencePurchaseOrder c:c, BusinessTransactionDocumentReferenceInboundDelivery c:cn, BusinessTransactionDocumentReferenceOutboundDelivery c:cn and BusinessTransactionDocumentReferenceConfirmedInboundDelivery c:cn. To business object LogisticsExecutionRequisition/node ItemActivityDate: EarliestRequestedDuePeriod c:c. To business object LogisticsExecutionRequisition/node ItemActivityConfirmationDate: LatestConfirmedDuePeriod c:c and NotReleasedEarliestConfirmedPeriod c:c. Inbound Association Relationshipst thus relate from business object Identity/node Root: CreationIdentity 1:cn, which identifies the identity that has created the Item and LastChangeIdentity c:cn, which Identifies the identity that has changed the Item last. And associations for navigation: From business object BusinessDocumentFlow/node Root BusinessDocumentFlow c:1.

Enterprise Service Infrastructure Actions

CheckOrderFulfillment (S&AM action): This action determines the processing status of the order fulfilment (e.g. fulfilled from the delivery processing). The action is executed when receiving the following messages: The incoming DeliveryRequestFulfillmentConfirmation message if Delivery processing is involved; The incoming SiteLogisticsRequestConfirmation and SiteLogisticsRequestProgressNotification messages if Delivery Processing is not involved; Preconditions: See the S&AM schema; Changes to the object: No other changes than status changes; Changes to other objects: None; Changes to the status: See the S&AM schema; Parameters: OrderFulfillmentProcessingStatus; and Usage: This action may only be performed by the confirmation compound service of the process component, which can be called by a business object in Site Logistics.

And the algorithm may reflect the following options: Default value is not started. If Site Logistics has confirmed anything, the status value is in process. If the following is true, then the status value is finished: the creation of activities for the LER item is complete (such as the sum of requested quantities of all subsequent activities equals the requested item quantity), Site Logistics has confirmed the complete quantity for all activities and the fulfilled quantity of the order fulfilment process (delivered quantity in the normal case) equals the requested quantity. If Delivery Processing is not involved, the last condition is not used.

Queries are listed as: QueryByElements and QueryByItemReferencedDocument. QueryByElements provides a list of all LogisticsExecutionRequisitions Items that satisfy the selection criteria specified by the query elements. GDT LogisticsExecutionRequisitionItemItemElementsQueryElements defines the query elements:

LogisticsExecutionRequisitionID which is optional and may be based on GDT: BusinessTransactionDocumentID. ID which is optional and may be based on GDT: BusinessTransactionDocumentItemID. TypeCode which is optional and may be based on GDT: BusinessTransactionDocumentItemTypeCode. ActivityProcessingStatusCode which is optional and may be based on GDT: ProcessingStatusCode, Qualifier: Activity. ActivityReleaseStatusCode which is optional and may be based on GDT: ReleaseStatusCode, Qualifier: Activity. DeliveryBlockingStatusCode which is optional and may be based on GDT: DeliveryBlockingStatusCode).

SystemAdministrativeData refers to administrative data recorded by the system and is optional. This data includes system users and change times. SystemAdministrativeData may be based on GDT: SystemAdministrativeDate. CreationBusinessPartnerCommonPersonNameGivenName which is optional and may be based on GDT: LANGUAGEINDEPENDANT_MEDIUM_Name. CreationBusinessPartnerCommonPersonNameFamilyName which is optional and may be based on GDT: LANGUAGEINDEPENDANT_MEDIUM_Name.

In addition to the above, LastChangeBusinessPartnerCommonPersonNameGivenName which is optional and may be based on GDT: LANGUAGEINDEPENDANT_MEDIUM_Name. LastChangeBusinessPartnerCommonPersonNameFamilyName which is optional and may be based on GDT: LANGUAGEINDEPENDANT_MEDIUM_Name. PartyProductRecipientPartyKey is an identifier for the ProductRecipientParty, and is optional.

The query element is derived from the PartyRoleCode and the PartyKey of the ItemParty node and may be based on GDT: PartyKey. PartyVendorPartyKey is an identifier for the Vendor Party, and is optional.

The query element is derived from the PartyRoleCode and the PartyKey of the ItemParty node and may be based on GDT: PartyKey. PartySellerPartyKey is an identifier for the Vendor Party, and is optional.

The query element is derived from the PartyRoleCode and the PartyKey of the ItemParty node and may be based on GDT: PartyKey. PartyBuyerPartyKey is an identifier for the ProductRecipientParty, and is optional.

The query element is derived from the PartyRoleCode and the PartyKey of the ItemParty node and may be based on GDT: PartyKey. PartyFreightForwarderPartyKey is an identifier for the FreightForwarderParty, and is optional.

The query element is derived from the PartyRoleCode and the PartyKey of the ItemParty node and may be based on GDT: PartyKey.

PartyCarrierPartyKey is an identifier for the CarrierParty, and is optional.

The query element is derived from the PartyRoleCode and the PartyKey of the ItemParty node and may be based on GDT: PartyKey. BusinessTransactionDocumentReferenceReference which is optional and may be based on GDT: BusinessTransactionDocumentReference. DeliveryTermsIncoterms which is optional and may be based on GDT: Incoterms. ProductProductID which is optional and may be based on GDT: ProductID. ProductProductCategoryID which is optional and may be based on GDT: ProductCategoryInternalID. LocationShipFromLocationID which is optional and may be based on GDT: LocationID. LocationShipToLocationID which is optional and may be based on GDT: LocationID. LocationTransportationZoneAssignmentTransportationZoneID which is optional and may be based on GDT: TransportationZoneID. TransportationTermsTransportServiceLevelCode which is optional and may be based on GDT: TransportServiceLevelCode. TransportationTermsTransportModeCode which is optional and may be based on GDT: TransportModeCode. TransportationTermsTransportMeans which is optional and may be based on GDT: TransportMeans. DeliveryTermsDeliveryPriorityCode which is optional and may be based on GDT: BusinessTransactionPriorityCode.

QueryByItemReferencedDocument provides a list of LogisticsExecutionRequisitions Items that contain the entered reference document on item level.

GDT: LogisticsExecutionRequisitionItemItemReferencedDocumentQueryElements defines the Query Element: BusinessTransactionDocumentReferenceCustomerRequirementItemReference which is optional and may be based on GDT: BusinessTransactionDocumentReference. BusinessTransactionDocumentReferencePlanningViewOnPurchaseOrderItemReference which is optional and may be based on GDT: BusinessTransactionDocumentReference. BusinessTransactionDocumentReferenceSalesOrderItemReference which is optional and may be based on GDT: BusinessTransactionDocumentReference. BusinessTransactionDocumentReferenceServiceOrderItemReference which is optional and may be based on GDT: BusinessTransactionDocumentReference. BusinessTransactionDocumentReferencePurchaseOrderItemReference which is optional and may be based on GDT: BusinessTransactionDocumentReference. BusinessTransactionDocumentReferenceInboundDeliveryItemReference which is optional and may be based on GDT: BusinessTransactionDocumentReference. BusinessTransactionDocumentReferenceOutboundDeliveryItemReference which is optional and may be based on GDT: BusinessTransactionDocumentReference. BusinessTransactionDocumentReferenceConfirmedInboundDeliveryItemReference which is optional and may be based on GDT: BusinessTransactionDocumentReference.

ItemBusinessProcessVariantType

A ItemBusinessProcessVariantType defines the character of a business process variant of the Item. It represents a typical way of processing of a Item within a process component from a business point of view. A Business Process Variant is configuration of a Process Component. A Business Process Variant belongs exactly to one process component. A process component is a software package that realizes a business process and exposes its functionality as services. The functionality contains business transactions. A process component contains one or more semantically related business objects. A business object belongs to exactly one process component. The elements located at the node ItemBusinessProcessVariantType are defined by the data type: LogisticsExecutionRequisitionItem-BusinessProcessVariantTypeElements, derived from BusinessProcessVariantTypeElements (Template). These elements are: BusinessProcessVariantTypeCode and MainIndicator.BusinessProcessVariantTypeCode is a coded representation of a business process variant type of a ItemBusinessProcessVariantType. BusinessProcessVariantTypeCode may be based on GDT: BusinessProcessVariantTypeCode. The following codes are used: Of inbound logistics, Of outbound logistics, Of stock transfer and Of internal logistics. MainIndicator is an indicator that specifies whether the current BusinessProcessVariantTypeCode is the main one or not. MainIndicator may be based on GDT: Indicator and Qualifier: Main. Integrity Conditions may state: exactly one of the instances of the ItemBusinessProcessVariantType is allowed to be indicated as main.

ItemHierarchyRelationship

The relationship between a LogisticsExecutionRequisition item and a higher-level LogisticsExecutionRequisition item. These relationships result in item hierarchies. A hierarchy relationship is assigned to a certain hierarchy type, for example, bills of materials, grouping, and so on. ItemHierarchyRelationship is of the data type: LogisticsExecutionRequisitionItemHierarchyRelationshipElements consisting of: TypeCode and ParentItemUUID. TypeCode is the coded representation of the business type of a hierarchical relationship between Items of a LogisticsExecutionRequisition. TypeCode may be based on GDT: BusinessTransactionDocumentItemHierarchyRelationshipTypeCodeThe code list is not restricted. ParentItemUUID is a general unique identification of the hierarchically higher-levelItem within the LogisticsExecutionRequisition. ParentItemUUID may be based on GDT: UUID.

ItemParty

A Party is a natural or legal person, organization, organizational unit, or group that is involved in a logistics execution processing in a PartyRole. An ItemParty may: Keep a reference to a business partner or one of its specializations (for example, customer, supplier, employee); or Keep a reference to one of the following specializations of an organizational unit: Company, CostCentre or ReportingLineUnit. A Party may exist without reference to a business partner or an organizational unit. Party is of the type GDT: LogisticsExecutionRequisitionItemPartyElements consisting of: PartyKey, PartyUUID, RoleCategoryCode, RoleCode, AddressReference, MainIndicator and Name. PartyKey can be referred to as Key of the Party in this PartyRole in the business document or the master data object, and is optional. If a business partner or organizational unit are referenced, the attribute Party_ID contains their identifiers and the field PartyTypeCode either the Object Type Code of the Business Partner or of Organizational Centre. If an unidentified identifier is, for example, entered by the user, the Party_ID contains this identifier and the PartyTypeCode is empty. PartyKey may be based on GDT: PartyKey.

PartyUUID is an identifier, which can be unique, for a business partner, the organizational unit, or their specializations. PartyUUID may be based on GDT: UUID. RoleCategoryCode relates to Party Role Category of the Party in the business document or the master data object, and is optional. RoleCategoryCode may be based on GDT: PartyRoleCategoryCode. The following codes are used: BuyerParty: A party who purchases a good or service; SellerParty: A party who sells a good or service; ProductRecipientParty: A party to whom a good is delivered or for whom a service is provided; Vendor Party: A party who delivers a good or who provides a service; CarrierParty: A party responsible for the shipment of a good; FreightForwarderParty: A party responsible for organizing the shipment of a good; PickupParty: A party that collects the goods and LogisticsRequestResponsibleParty: A party that is responsible for the logistics request of an item. RoleCode relates to Party Role of the ItemParty in the business document or the master data object, and is optional. RoleCode may be based on GDT: PartyRoleCode. AddressReference is the information to reference the address of a Party, and is optional. AddressReference may be based on PartyAddressReference. MainIndicator indicates whether or not a Party is emphasized in a group of parties with the same PartyRole. MainIndicator may be based on GDT: Indicator and Qualifier: Main. Name which is optional and may be based on GDT: Long_Name. Composition Relationships are detailed as ItemPartyContactParty 294178 1:cn, ItemPartyStandardIdentification 294182 1:cn and ItemPartyAddress 294176 1:c. Composition to Dependent Object Address. Associations for navigation, thus relate to business object LogisticsExecutionRequisition/node ItemPartyContactParty as MainContactParty c:c. and to the transformed object UsedAddress/node Root as UsedAddress c:cn.

For the address used for the Party. This can be a referenced address of the master data object, or the PartyAddress used via the composition relationship.

It is possible to determine which of the two applies by means of the PartyAddressHostTypeCode element The instance of the TO UsedAddress represents this address. The association is implemented. In case 1) The node ID of the node in the master data object is determined via the PartyTypeCode, PartyAddressUUID and PartyAddressHostTypeCode elements that has the composition relationship to the DO address that is to be represented by the TO UsedAddress. Additionally, the TO UsedAddress in the implemented association is provided with the following information: that this is an example of a master data address; and BusinessObjectTypeCode, BusinessObjectNodeTypeCode and Node ID of its own <BO-Node>-Party node. These are required in case changes to the TO UsedAddress take place. In this case, the master data address is copied by the TO UsedAddress, the changes take place to the copy, and a corresponding DO Address is created at the <BO-Node>Party via the PartyAddress composition relationship.

In case 2) The TO UsedAddress is informed of the BusinessObjectTypeCode, BusinessObjectNodeTypeCode and Node ID of its own <BO-Node>-Party. Additionally, information is provided that this is not an example of a referenced address. In this case, the TO UsedAddress represents the DO address used at the <BO-Node>-Party via the PartyAddress composition relationship.

The following integrity conditions are checked: 1) If the PartyUUID exists, the PartyTypeCode may exist as well. Parties may only be referenced via the Transformed Object Party, that represent at least one of the following business objects: Company, CostCentre, Functional Unit, ReportingLineUnit, Supplier, Customer, Employee, BusinessPartner. 2) There may only be one aggregation relationship to the business partner, the organizational unit, or their specializations. 3) If the PartyUUID exists, the BusinessObjectTypeCode may exist as well. 4) There may only be one of the associations to the address. This address is a master data address of the business partner, organizational unit, or their specializations referenced by PartyUUID.

ItemPartyStandardIdentification

A standardized identifier for the party. PartyStandardID is standardized identification of the party PartyStandardID may be based on GDT: PartyStandardID.

DO ItemPartyAddress

The Dependent Object Address contains the document specific address of the party. The data is defined by the Dependent Object Address. Defined by DO Address.

ItemPartyContactParty

A ItemPartyContactParty is a natural person or organizational unit that can be contacted for the ItemParty. The contact may be a contact person or, for example, a secretary's office. Usually, communication data for the contact is available. ItemPartyContactParty is of the type GDT: LogisticsExecutionElementsItemPartyContactPartyElements consisting of: PartyKey, PartyUUID, AddressReference, MainIndicator and Name.

PartyKey can be referred to as Key of the Party in this PartyRole in the business document or the master data object, and is optional. If a business partner or organizational unit are referenced, the attribute Party_ID contains their identifiers and the field PartyTypeCode either the Object Type Code of the Business Partner or of Organizational Centre. If an unidentified identifier is, for example, entered by the user, the Party_ID contains this identifier and the PartyTypeCode is empty. PartyKey may be based on GDT: PartyKey. PartyUUID is an identifier, which can be unique, of the contact in this PartyRole in the business document or the master data object, and is optional. PartyUUID may be based on GDT: UUID. AddressReference is the information to reference the address of a Party, and is optional. AddressReference may be based on GDT: PartyAddressReference. MainIndicator indicates whether or not a PartyContactParty is emphasized in a group of contact parties with the same PartyRole. MainIndicator may be based on GDT: Indicator, Qualifier: main. Name refers to Name of the PartyContactParty, and is optional. Name may be based on GDT: Long_Name.

The composition relationships to subordinate nodes that exists is: ItemPartyContactPartyAddress 294180, 1:c Composition to Dependent Object Address. The Inbound Aggregation Relationships that exists is from business object Party/node Root, Party c:cn, Referenced Party in master data. Associations for navigation relate to the transformed object UsedAddress/node Root as, UsedAddress c:cn as Used address for Party. This may be the referenced address of a master data object or a address referenced via the composition to PartyAddress. The following integrity condition is checked: There may only be one of the associations to the address. This address is a master data address of the business partner, organizational unit, or their specializations referenced by PartyUUID.

DO ItemPartyContactPartyAddress

The Dependent Object Address contains the document specific address of the item contact party. The data is defined by the Dependent Object Address. Defined by DO Address.

ItemLocation

An ItemLocation is a physical place which is part of the logistics execution process. An ItemLocation may keep a reference to: a business object Location, an address, a business partner or one of its specialisations (for example customer, supplier or employee) and one of the following specializations of an organizational unit: ReportingLineUnit. The LocationRole describes the role of a Location in the logistics execution process. Location is of the type GDT: LogisticsExecutionRequisitionLocationElements consisting of LocationID, LocationUUID, AddressReference, AddressHostUUID, BusinessObjectTypeCode, AddressHostTypeCode, PartyKey, InstalledBaseID, InstallationPointID, RoleCategoryCode and RoleCode.

LocationID is identifier of the Location in this LocationRole, and is optional. If a location, business partner or organizational unit are referenced, the attribute contains their identifiers. If an unidentified identifier is, for example, entered by the user, the attribute contains this identifier. LocationID may be based on GDT: LocationID (without additional components, such as schemeAgencyID). LocationUUID is an identifier, which can be unique, for a location, business partner, the organizational unit, or their specializations, and is optional. LocationUUID may be based on GDT: UUID. AddressReference is the information to reference the address of a Party, an InstalledBase or an InstallationPoint, and is optional. AddressReference may be based on IDT: ObjectNodeLocationAddressReference. AddressHostUUID is a universal identifier, which can be unique, of the address of the business partner, the organizational unit or its specializations, the BO InstalledBase or the BO InstallationPoint. AddressHostUUID may be based on GDT: UUID. BusinessObjectTypeCode is the coded representation of the BusinessObjectTypes of the business object, in which the address referenced in Element LocationAddressUUID is integrated as a Dependent Object. BusinessObjectTypeCode may be based on GDT: BusinessObjectTypeCode.

As a continuation of the above, AddressHostTypeCode is the coded representation of the address host type of the address referenced by AddressUUID or the address included via the LocationAddress composition.

AddressHostTypeCode may be based on GDT: AddressHostTypeCode. PartyKey, can be an Alternative Identifier of a Party (represents a business partner or an organizational unit), that references the address via AddressUUID. PartyKey may be based on GDT: PartyKey. InstalledBaseID, is an identifier of the BO InstalledBase, that references the address via AddressUUID.

InstalledBaseID may be based on GDT: InstalledBaseID. InstallationPointID, is an identifier of the BO InstallationPoint, that references the address via AddressUUID. InstallationPointID may be based on GDT: InstallationPointID. RoleCategoryCode can be referred to as Location Role Category of the Location. RoleCategoryCode may be based on GDT: LocationRoleCategoryCode. The following codes are used: ShipFromLocation: Location from where a good is shipped and ShipToLocation: Location to where a good is shipped. RoleCode may be referred to as Location Role of the Location and may be based on GDT: LocationRoleCode.

The following composition relationships to subordinate nodes exist: ItemLocationStandardIdentification 294188 1:c, ItemLocationAddress 294190 1:c as Composition to Dependent Object Address and ItemLocationTransportationZoneAssignment 294186 1:c. Inbound Aggregation Relationships may relate from business object Location/node Root, Location c:cn as Location corresponding to the Location and from business object Party/node AddressInformation, PartyAddressInformation c:cn as AddressInformation of a representative of a Business Partner or Organizational Centre corresponding to the Location. Similarly, they may relate from business object InstalledBase/node AddressInformation, installedBaseAddressInformation c:cn as AddressInformation of an Installed Base corresponding to the Location and from business object InstallationPoint/node AddressInformation, InstallationPointAddressInformation c:cn as AddressInformation of an Installation Point corresponding to the Location.

Associations for Navigation relate to the transformed object UsedAddress/node Root, UsedAddress c:cn as address used for this location. This can be: 1) A referenced address of a master data object or 2) The address that is integrated via the composition relationship LocationAddress. You can see which of the two cases applies by looking at the element AddressHostTypeCode. The instance of the TO UsedAddress represents this address. The association is implemented. In case 1) the elements AddressBusinessObjectTypeCode, AddressUUID and AddressHostTypeCode are used to determine the Node ID of the node in the master data object, which holds the composition relationship with DO Address, which is to be represented by TO UsedAddress. Furthermore, the following information is sent to the TO UsedAddress in the implemented address: The fact that it is a master data address; and the BusinessObjectTypeCode, BusinessObjectNodeTypeCode and Node ID of the own <BO-Node>Location node. This are required if changes are made to the TO UsedAddress. In this case the TO UsedAddress copies the master data address, the changes are applied and the corresponding DO Address is generated on the <BO-Node>Location node via the composition relationship LocationAddress. In case 2) the BusinessObjectTypeCode, BusinessObjectNodeTypeCode and Node ID of the own <BO-Node>Location are communicated to the TO UsedAddress. Whether or not it is a referenced address is also included. In this case, the TO UsedAddress represents the DO Address that is integrated via the composition relationship on the <BO-Node> Location node.

The following integrity conditions are checked: There can be either just one aggregation or composition relationship to the dependent object; If there is an aggregation relationship to the BO Location, the LocationID attribute is filled with the ID of BO Location. All other ID fields (PartyID, InstalledBaseID and InstallationPointID) remain blank; If the address of a party is referenced (representative of a BusinessPartners or an OrganisationalCentre), the PartyID attribute is filled with the ID of the Party. All other ID fields (LocationID, InstalledBaseID and InstallationPointID) remain blank. The reference is kept in the AddressUUID attribute; If there is an aggregation relationship to the address of an InstalledBase, the InstalledBaseID attribute is filled with the ID of the InstalledBase. All other ID fields (LocationID, PartyID and InstallationPointID) remain blank. The reference is kept in the AddressUUID InstalledBaseAddressInformationUUID attribute; If there is an aggregation relationship to the address of an InstallationPoint, the InstallationPointID attribute is filled with the ID of the InstallationPoint. All other ID fields (LocationID, PartyID and InstalledBaseID) remain blank. The reference is kept in the AddressUUID attribute; If an address is referenced via the element AddressUUID, then elements AddressBusinessObjectTypeCode and AddressHostTypeCode may also be filled; and All locations may exist in all derived business objects, if necessary.

ItemLocationStandardIdentification

Standardized identification of an item location. The elements located at the node ItemLocationStandardIdentification are defined by the data type: LogisticsExecutionRequisitionItemLocationStandardIdentificationElements. These elements include LocationStandardID which is a standardised identification of a Location and may be based on GDT: LocationStandardID. An instance of LogisticsExecutionRequisitionItemLocationStandardIdentification is always formed, if standard identifiers can be made available for a LogisticsExecutionRequisitionItemLocation of a higher level than this instance. This can take place from the master data, the messages or by means of user interaction. As for the DO ItemLocationAddress, the dependent object Address includes the data necessary to describe a physical or logical item location. Defined in the dependent object address.

ItemLocationTransportationZoneAssignment

Zone which contains an item location to which goods are shipped. The elements located at the node ItemLocationTransportationZone are defined by the data type: ItemLocationTransportationZoneElements waiting for PIC-Review. These elements are TransportationZoneID and TransportationZoneUUID. TransportationZoneID is an identifier, which can be unique, of a transportation zone to which the goods have to be shipped, and is optional. TransportationZoneID may be based on GDT: TransportationZoneID. TransportationZoneUUID is a universal identifier, which can be unique, of a transportation zone to which the goods have to be shipped. TransportationZoneUUID may be based on GDT: UUID. The integrity condition checked is: The Transportation Zone Assignment only exists under a Ship-To-Location. Inbound Aggregation Relationships may relate from business object TransportationZone/node Root, TransportationZone c:cn as TransportationZone corresponding to the ItemLocationTransportationZoneAssignment.

ItemDeliveryTerms

Conditions and agreements negotiated when the sales order was placed that are valid for shipment or for the services and activities required for the shipment of the item. The elements located at the node ItemDeliveryTerms are defined by the data type: LogisticsExecutionRequisitionItemDeliveryTermsElements. These elements are DeliveryPriorityCode, Incoterms, PartialDeliveryMaximumNumberValue, PartialDeliveryControlCode, QuantityTolerance, TimeTolerance, MaximumLeadTimeDuration, DeliveryItemGroupID, OrderCombinationAllowedIndicator, PickupIndicator and Description.

DeliveryPriorityCode relates to Priority/urgency of the delivery according to the requirements of the purchaser, and is optional. DeliveryPriorityCode may be based on GDT: PriorityCode. Incoterms relate to typical contract formulations for delivery conditions that correspond to the rules defined by the International Chamber of Commerce (ICC), and is optional. Incoterms may be based on GDT: Incoterms. PartialDeliveryMaximumNumberValue specifies the maximum number of partial deliveries that can be carried out to deliver the ordered quantity of the LogisticsExecutionRequisitionItem, and is optional. PartialDeliveryMaximumNumberValue may be based on GDT: NumberValue, Qualifier PartialDeliveryMaximum. PartialDeliveryControlCode is coded information about commonly used combination of the fields below, and is optional. PartialDeliveryControlCode may be based on GDT: PartialDeliveryControlCode.

QuantityTolerance is tolerated difference between a requested and an actual delivered quantity as a percentage, and is optional. QuantityTolerance may be based on GDT: QuantityTolerance. TimeTolerance is tolerated difference between the requested and the confirmed time, for example, shipping date. TimeTolerance may be based on (GDT: TimeTolerance). MaximumLeadTimeDuration relates to maximum lead time from the time the order is placed until the receipt of the delivery. This duration can be specified in the context of a bid invitation or agreed on in a delivery contract and then forms the basis for calculating the latest possible inbound delivery date for a given purchase order date. MaximumLeadTimeDuration may be based on GDT: Duration. DeliveryItemGroupID is an identifier, which can be unique, of a group of items that have to be delivered together. DeliveryItemGroupID may be based on GDT: BusinessTransactionDocumentItemGroupID. OrderCombinationAllowedIndicator is an indicator, if a combination of several orders is allowed.

OrderCombinationAllowedIndicator may be based on GDT: Indicator. PickupIndicator may be based on GDT: Indicator, Qualifier: Pickup. Description is free text to describe additional delivery terms and may be based on GDT: Description.

ItemTransportationTerms

The conditions and agreements that should be effective for the transport of the item and/or for the necessary services and activities needed for this transport. The elements located at the node ItemTransportationTerms are defined by the data type: LogisticsExecutionRequisitionItemTransportationTermsElements. These elements are TransportServiceLevelCode, TransportModeCode, TransportMeans and Description.

TransportServiceLevelCode is a coded representation of the agreed/defined services in terms of the transport of the LogisticsExecutionRequisitionItem (as part of the ordered service), and is optional. For example, refrigeration or overnight delivery. TransportServiceLevelCode may be based on GDT: TransportServiceLevelCode. TransportModeCode is a coded representation of the mode of transportation used for delivery. TransportModeCode may be based on GDT: TransportModeCode. TransportMeans is the description of a means of transport and can also include information for a more detailed identification. TransportMeans may be based on GDT: TransportMeans. Description is a natural-language representation of the characteristics of the transport conditions of a LogisticsExecutionRequisitionItem. Description may be based on GDT: LONG_Description and the Qualifier: TransportationTerms.

ItemProduct

An ItemProduct is the identification, description and classification of the product in the LogisticsExecutionRequisition. ItemProduct is of type GDT: LogisticsExecutionRequisitionItemProductElements consisting of ProductID, ProductSellerID, ProductTypeCode, ProductStandardID, ProductBuyerID, ProductProductRecipientID, ProductVendorID, ProductCategoryHierarchyProductCategoryKey, ProductCategoryHierarchyID, ProductCategoryInternalID and ProductUUID. ProductID is an identifier of a product, which can be unique and may be based on GDT: ProductID. ProductSellerID is an identifier of the product, which can be unique, assigned by the seller and may be based on GDT: ProductPartyID. ProductTypeCode is a coded representation of the product type. A product type describes the nature of products and determines the basic characteristics for products of this type. ProductTypeCode may be based on GDT: ProductTypeCode. Only the following code may be used: 1 Material. ProductStandardID is an identifier of a product, which can be unique, whereby the identification sheet used is managed by an agency from code list DE 3055, and is optional. ProductStandardID may be based on GDT: ProductStandardID. ProductBuyerID is an identifier of the product, which can be unique, assigned by the purchaser.ProductBuyerID may be based on GDT: ProductPartyID, and is optional. ProductProductRecipientID is an identifier of the product, which can be unique, assigned by the goods recipient, and is optional. ProductProductRecipientID may be based on GDT: ProductPartyID. ProductVendorID is an identifier, which can be unique, of the product assigned by the vendor, and is optional. ProductVendorID may be based on GDT: ProductPartyID.

ProductCategoryHierarchyProductCategoryKey is an alternative key of a product category hierarchy, which the IDT ProductCategoryHierarchyProductCategoryIDKey consists of, and is optional. ProductCategoryHierarchyID is an alternative identifier for a product category hierarchy and may be based on GDT: ProductCategoryHierarchyID. ProductCategoryInternalID is an alternative identifier for a product category.

and may be based on GDT: ProductCategoryInternalID. ProductUUID is a universal identifier, which can be unique, of the product in the delivery request and may be based on GDT: UUID. Inbound Aggregation Relationship relate from business object Product/node Product, Material c:cn, as material that is requested and from business object ProductCategoryHierarchy/node ProductCategory as ProductCategoryHierarchy c:cn.

ItemQuantity

The quantity of product to be logistically processed. For example, the goods issue quantity, the delivery quantity in the sales unit, the transported quantity, and so on. The elements located at the node ItemQuantity are defined by the data type: LogisticsExecutionRequisitionItemQuantityElements.

These elements are Quantity, QuantityTypeCode, QuantityRoleCode and QuantityOriginCode. Quantity can relate to the quantity with the corresponding unit of measure and may be based on GDT: Quantity. QuantityTypeCode is a coded representation of the type of the quantity value and may be based on GDT: QuantityTypeCode. QuantityRoleCode is a coded representation of the role of a quantity.

and may be based on GDT: QuantityRoleCode. The following codes will be used: RequestedQuantity, FulfilledQuantity, OpenQuantity, ReleasedQuantity, ConfirmedQuantity, ForwardedQuantity, LogisticsExecutionRequisitionItemActivityFulfil ledQuantity and LogisticsExecutionRequisitionItemActivityOpenQuantity. This open quantity is the difference between the confirmed and the fulfilled quantity. QuantityOriginCode is a coded representation of the origin of the quantity value, and is optional. QuantityOriginCode may be based on GDT: QuantityOriginCode.

ItemBusinessTransactionDocumentReference

A reference to a different business document or the business document item relevant to the logistics execution requisition. The elements located at the node ItemBusinessTransactionDocumentReference are defined by the data type: LogisticsExecutionRequisitionItemBusinessTransactionDocumentReferenceElements. These elements are BusinessTransactionDocumentReference and BusinessTransactionDocumentRelationshipRoleCode. BusinessTransactionDocumentReference may relate as a clear reference to other business documents that are important for the LogisticsExecutionRequisition and may be based on GDT: BusinessTransactionDocumentReference. BusinessTransactionDocumentRelationshipRoleCode is a coded representation of the role the referenced document or referenced document item plays in relation to the Logistics Execution Requisition, and is optional. BusinessTransactionDocumentRelationshipRoleCode may be based on GDT: BusinessTransactionDocumentRelationshipRoleCode. The composition relationships to subordinate nodes that exists is: ItemBusinessTransactionDocumentReferenceActualValue 294204 1:c.

Inbound Aggregation Relationships relate from business object CustomerRequirement/node CustomerRequirementAvailabilityConfirmationItem, CustomerRequirementAvailabilityConfirmationItem c:c, as the availability confirmation item in a Customer Requirement. From business object PlanningViewOnPurchaseOrder/node PlanningViewOnPurchaseOrderItem, PlanningViewOnPurchaseOrderItem c:c, as the item in a Planning View On Purchase Order. From business object SalesOrder/node SalesOrderItem (Cross DU), SalesOrderItem, as the item in a Sales Order. cn:c. From business object ServiceOrder/node ServiceOrderItem (Cross DU), ServiceOrderItem as the item in a Service Order cn:c. From business object PurchaseOrder/node PurchaseOrderItem (Cross DU), PurchaseOrderItem c:c, as the item in a Purchase Order. From business object InboundDelivery/node InboundDeliveryItem (Cross DU), InboundDeliveryItem c:n as the item in an inbound delivery. From business object OutboundDelivery/node OutboundDeliveryItem (Cross DU), OutboundDeliveryItem c:n as the item in an outbound delivery. From business object ConfirmedInboundDelivery/node ConfirmedInboundDeliveryItem: (Cross DU), ConfirmedInboundDeliveryItem c:n, as the item in a confirmed inbound delivery. From business object SiteLogisticsConfirmation/node SiteLogisticsConfirmationInventoryChangeItem, SiteLogisticsConfirmationInventoryChangeItem c:n (Cross DU) as the item in a site logistics confirmation.

ItemBusinessTransactionDocumentReferenceActualValue

The ItemBusinessTransactionDocumentReferenceActualValue are the actually achieved values, i.e. quantity and dates for an ItemBusinessTransactionDocumentReference. It represents the order fulfilment. The elements located at the node ItemBusinessTransactionDocumentReferenceActualValue are defined by the data type: LogisticsExecutionRequisitionItemBusinessTransactionDocumentReferenceActualValueElements. These elements are FulfilledQuantity, FulfilledQuantityTypeCode, FulfilledQuantityOriginCode, CancellationDocumentIndicator and CancelledBusinessTransactionDocumentReference. FulfilledQuantity is the fulfilled quantity with the corresponding unit of measure. FulfilledQuantity may be based on GDT: Quantity, Qualifier: Fulfilled. FulfilledQuantityTypeCode is a coded representation of the type of a quantity.

FulfilledQuantityTypeCode may be based on GDT: QuantityTypeCode, Qualifier Fulfilled. FulfilledQuantityOriginCode is a coded representation of the origin of the quantity value, and is optional.

FulfilledQuantityOriginCode may be based on GDT: QuantityOriginCode. CancellationDocumentIndicator specifies whether or not the document (referenced in the parent node LogisticsExecutionRequisitionItemBusinessTransactionDocumentReference) is a cancellation document.

CancellationDocumentIndicator may be based on GDT: Indicator, Qualifier CancellationDocument. CancelledBusinessTransactionDocumentReference is reference to a cancelled a business transaction document reference, and is optional. CancelledBusinessTransactionDocumentReference may be based on GDT: BusinessTransactionDocumentReference. The composition relationship to subordinate nodes that exists is temBusinessTransactionDocumentReferenceActualValueDate 294210, 1:n. Specialization associations for navigation relate to business object LogisticsExecutionRequisition/node ItemBusinessTransactionDocumentReferenceActualValueDate as ArrivalDateTime 1:c, ShippingDateTime 1:c, PickupDateTime 1:c and TransactionDateTime 1:c. This node ActualValue exists only when the reference is a reference to a successor business document. It can be a reference to: Confirmed inbound delivery, Outbound delivery, Inbound delivery and Site Logistics Confirmation. CancelledBusinessTransactionDocumentReference exists only for SiteLogisticsConfirmationInventoryChangeItem.

ItemBusinessTransactionDocumentReferenceActualValueDate

The ItemBusinessTransactionDocumentReferenceActualValueDate are the actually achieved dates, i.e. shipping and arrival dates for an ItemBusinessTransactionDocumentReference. A date is a (calendar) date and time information about appointments relevant for logistic execution processing. The elements located at the node ItemBusinessTransactionDocumentReferenceActualValueDate are defined by the data type: LogisticsExecutionRequisitionItemBusinessTransactionDocumentReferenceActualValueDateElements. These elements are TimePointRoleCode and TimePoint. TimePointRoleCode is a coded representation of the semantics of a point in time in the delivery. TimePointRoleCode may be based on GDT TimePointRoleCode. The following codes may used: ArrivalTimePoint: Time at which the goods arrive, ShippingTimePoint: Time at which the goods are shipped, PickupTimePoint: Time at which the goods are collected and TransactionTimePoint: A point in time indicating when the reported changes were performed. TimePoint relates to time point with a relevance to the delivery. TimePoint may be based on GDT TimePoint.

ItemScheduleLine

A schedule line 294120 included in the Item; this schedule line covers a partial quantity of the product specified in the item while specifying the delivery date with additional information on the status of logistics execution processing and possibly additional material staging data and shipping date. ItemScheduleLine is of type GDT: LogisticsExecutionRequisitionItemScheduleLineElements consists of ID. ID is an identifier, which can be unique, of ScheduleLine, which can be used to refer to ScheduleLine. ID may be based on GDT: BusinessTransactionDocumentItemScheduleLineID. The composition relationships to subordinate nodes that may exist are: ItemScheduleLineQuantity 294122 1:n, and ItemScheduleLineDate 294130 1:n. Specialization associations for navigation relate to business object LogisticsExecutionRequisition/node ItemScheduleLineQuantity as RequestedQuantity c:c and ForwardedQuantity c:c. To business object LogisticsExecutionRequisition/node ItemScheduleLineDate: Positioning period c:c, Issue period c:c, Arrival period c:c, Pickup period c:c and AvailabilityPeriod c:c.

ItemScheduleLineQuantity

The quantity of product to be logistically processed. For example, the goods issue quantity, the delivery quantity in the sales unit, the transported quantity, and so on. The elements located at the node ItemQuantity are defined by the data type: LogisticsExecutionRequisitionItemScheduleLineQuantityElements. These elements are Quantity, QuantityTypeCode, QuantityRoleCode and QuantityOriginCode. Quantity refers to the quantity with the corresponding unit of measure. Quantity may be based on GDT: Quantity. QuantityTypeCode is a coded representation of the type of the quantity value. QuantityTypeCode may be based on GDT: QuantityTypeCode. QuantityRoleCode is a coded representation of the role of a quantity.

QuantityRoleCode may be based on GDT: QuantityRoleCode. The following codes will be used: RequestedQuantity and ForwardedQuantity. QuantityOriginCode is a coded representation of the origin of the quantity value, and is optional. QuantityOriginCode may be based on GDT: QuantityOriginCode.

ItemScheduleLineDate

A (calendar) date and time information about appointments relevant for logistics execution processing. An appointment can be given with more or less precision. It can be second-precise, minute-precise, day-precise and so forth. The elements located at the node ItemScheduleLineDate are defined by the data type: LogisticsExecutionRequisitionItemScheduleLineDateElements. These elements are PeriodRoleCode and TimePointPeriod. PeriodRoleCode is a coded representation of the semantic of a time point period in a logistics execution activity and may be based on GDT: PeriodRoleCode. Only the following codes are used: Positioningperiod—At this end of this period, the material or goods may be available in the warehouse, Issue period—Period in which the material or goods leave the warehouse, Arrival period—Period in which the materials or goods reach the customer, Pickup period—Period in which the materials or goods are being picked and AvailabilityPeriod—Period in which the materials or goods are available. TimePointPeriod relates to time point period with a relevance to the logistics execution activity. and may be based on GDT: TimePointPeriod.

ItemActivity

An activity requested or taken to fulfill a LogisticsExecutionRequisitionItem. In the context of the business object LogisticsExecutionRequisition an item activity can be: an inbound activity (to trigger a site logistics process), an outbound activity (to trigger a site logistics process), an in-house activity (to trigger a site logistics process) and a transportation activity (to trigger a transportation process). An Item, for example in a stock transfer process, can consist of an outbound activity, a transportation activity and an inbound activity. The elements located at the node ItemActivity are defined by the data type: LogisticsExecutionRequisitionItemActivityElements. These elements are UUID, PredecessorItemActivityUUID, LogisticsExecutionRequisitionItemActivityTypeCode, SupplyPlanningAreaID, SupplyPlanningAreaUUID, SystemAdministrativeData, Status, ReleaseStatusCode, ActivityProcessingStatusCode and ConsistencyStatusCode.

UUID is a universal identifier, which can be unique, of ItemActivity. UUID may be based on GDT: UUID. PredecessorItemActivityUUID is a universal identifier, which can be unique, of the predecessor ItemActivity, and is optional. PredecessorItemActivityUUID may be based on GDT: UUID. LogisticsExecutionRequisitionItemActivityTypeCode is a coded representation of the type of a logistics execution requisition item activity. A LogisticsExecutionRequisitionItemActivity is an activity requested or taken to fulfil a LogisticsExecutionRequisitionItem. In the context of the business object LogisticsExecutionRequisition an item activity can be: an inbound activity (to trigger a site logistics process), an outbound activity (to trigger a site logistics process), an in-house activity (to trigger a site logistics process) and a transportation activity (to trigger a transportation process). LogisticsExecutionRequisitionItemActivityTypeCode may be based on GDT: LogisticsExecutionRequisitionItemActivityTypeCode. SupplyPlanningAreaID is an identifier, which can be unique, of the supply planning area that holds the planning representation of the LogisticsExecutionRequisition, and is optional. It is valid for all items that do not define an own supply planning area. SupplyPlanningAreaID may be based on GDT: SupplyPlanningAreaID.

As a continuation to the above, SupplyPlanningAreaUUID is a universal identifier, which can be unique, of the supply planning area that holds the planning representation of the LogisticsExecutionRequisition, and is optional. It is valid for all items that do not define an own supply planning area. SupplyPlanningAreaUUID may be based on GDT: SupplyPlanningAreaUUID. SystemAdministrativeData refers to an administrative data recorded by the system. This data includes system users and change times. SystemAdministrativeData may be based on GDT: SystemAdministrativeData. Status refers to status of the LogisticsExecutionRequisitionItemLogisticsExecutionActivity. Status may be based on GDT: LogisticsExecutionRequisitionItemActivityStatus. ReleaseStatusCode may be based on GDT: NOTRELEASEDRELEASED_ReleaseStatusCode. ActivityProcessingStatusCode may be based on GDT: NOTSTARTEDINPROCESSFINISHED_ProcessingStatusCode and Qualifier: Activity. ConsistencyStatusCode may be based on GDT: ConsistencyStatusCode.

The composition relationships to subordinate nodes that can exist include: ItemActivityParty 294134 1:cn, ItemActivityQuantity 294162 1:n, ItemActivityBusinessTransactionDocumentReference 294168 1:c, ItemActivityLocation 294144 1:cn, ItemActivityDate 294152 1:n, ItemActivityProduct 294150 1:1 and ItemActivityConfirmation 294154 1:cn. Inbound Aggregation Relationships relate from business object SupplyPlanningArea/node SupplyPlanningArea: SupplyPlanningArea c:cn (Cross-BO). From business object Identity/node Root, CreationIdentity 1:cn, as Identifies the identity that has created the LogisticsExecutionRequisition and LastChangeIdentity c:cn, as identifies the identity that has changed the LogisticsExecutionRequisition last. Specialization associations for navigation relate to business object LogisticsExecutionRequisition/node ItemActivityParty: FreightForwarderParty c:c, CarrierParty c:c and PickupParty c:c. To business object LogisticsExecutionRequisition/node ItemActivityLocation: ShipToLocation c:c and ShipFromLocation c:c. To business object LogisticsExecutionRequisition/node ItemActivityQuantity: RequestedQuantity c:c, ConfirmedQuantity c:c, ForwardedQuantity c:c, FulfilledQuantity c:c and OpenQuantity c:c. To business object LogisticsExecutionRequisition/node ItemActivityDate: PositioningPeriod c:c, IssuePeriod c:c, ArrivalPeriod c:c, PickupPeriod c:c and AvailabilityPeriod c:c. To business object LogisticsExecutionRequisition/node ItemActivityDate: RequestedDuePeriod c:c. To business object LogisticsExecutionRequisition/node ItemActivityConfirmationDate: LatestConfirmedDuePeriod c:c Enterprise Service Infrastructure Actions Release (S&AM action) refers to an action is executed when a logistics activity may be released to Site Logistics (either triggered by UI or by running the MDRO). In this case, this logistics activity is released to Site Logistics Processing. This action only updates the ActivityReleaseStatus and triggers the start of the (ESI) TransferToExecution action. Usually this action will be started by the MDRO 'LogisticsExecutionRequisitionReleaseRun'. It is also possible to perform it from the LogisticsExecutionRequisition user interface.

Queries include QueryByInboundElements and QueryByOutboundElements. QueryByInboundElements provide a list of all LogisticsExecutionRequisitionActivities that satisfy the selection criteria specified by the query elements. GDT LogisticsExecutionRequisitionItemActivityInboundElementsQueryElements defines the query elements: LogisticsExecutionRequisitionItemPartyBuyerKey is an identifier for the Buyer party, and is optional.

The query element is derived from the PartyRoleCategoryCode and the PartyKey of the ItemParty node.

LogisticsExecutionRequisitionItemPartyBuyerKey may be based on GDT: PartyKey. LogisticsExecutionRequisitionItemPartySellerKey is an identifier for the Seller party, and is optional.

The query element is derived from the PartyRoleCategoryCode and the PartyKey of the ItemParty node.

LogisticsExecutionRequisitionItemPartySellerKey may be based on GDT: PartyKey. LogisticsExecutionRequisitionItemPartyProductRecipientPartyKey is an identifier for the ProductRecipient party, and is optional. The query element is derived from the PartyRoleCategoryCode and the PartyKey of the ItemParty node.

LogisticsExecutionRequisitionItemPartyProductRecipientPartyKey may be based on GDT: PartyKey. LogisticsExecutionRequisitionItemPartyFreightForwarderPartyKey is a Identifier for the FreightForwarder party, and is optional. The query element is derived from the PartyRoleCategoryCode and the PartyKey of the ItemParty node. LogisticsExecutionRequisitionItemPartyFreightForwarderPartyKey GDT: PartyKey.

In addition to the above, LogisticsExecutionRequisitionItemPartyCarrierPartyKey is an identifier for the Carrier party, and is optional. The query element is derived from the PartyRoleCategoryCode and the PartyKey of the ItemParty node. LogisticsExecutionRequisitionItemPartyCarrierPartyKey GDT: PartyKey. LogisticsExecutionRequisitionItemPartyVendorPartyKey is an identifier for the Vendor party, and is optional.

The query element is derived from the PartyRoleCategoryCode and the PartyKey of the ItemParty node.

LogisticsExecutionRequisitionItemPartyVendorPartyKey may be based on GDT: PartyKey. LogisticsExecutionRequisitionItemBusinessTransactionDocumentReferencePurchaseOrderItemReference is optional and may be based on GDT: BusinessTransactionDocumentReference. LogisticsExecutionRequisitionItemBusinessTransactionDocumentReferencePlanningViewOnPurchaseOrderItemReference is optional and may be based on GDT: BusinessTransactionDocumentReference. LogisticsExecutionRequisitionItemBusinessTransactionDocumentReferenceInboundDeliveryItemReference is optional and may be based on GDT: BusinessTransactionDocumentReference. LogisticsExecutionRequisitionItemBusinessTransactionDocumentReferenceConfirmedInboundDeliveryItemReference is optional and may be based on GDT: BusinessTransactionDocumentReference. LogisticsExecutionRequisitionItemBusinessTransactionDocumentReferenceSiteLogisticsRequisitionRequestItemReference is optional and may be based on GDT: BusinessTransactionDocumentReference. InitialOrderItemBusinessTransactionDocumentReference is optional and may be based on GDT: BusinessTransactionDocumentReference.

Furthermore, ActivityReleaseStatusCode is optional and may be based on GDT: ReleaseStatusCode and Qualifier: Activity. LogisticsExecutionRequisitionItemDeliveryBlockingStatusCode is optional and may be based on GDT: DeliveryBlockingStatusCode. ProductProductID is optional and may be based on GDT: ProductID. LogisticsExecutionRequisitionItemDeliveryTermsIncoterms is optional and may be based on GDT: Incoterms. ProductProductCategoryID is optional and may be based on GDT: ProductCategoryInternalID. LocationShipToLocationID is optional and may be based on GDT: LocationID. LogisticsExecutionRequisitionItemLocationShipFromLocationID is optional and may be based on (GDT: LocationID). LogisticsExecutionRequisitionItemLocationTransportationAssignmentTransportationZoneID is optional and may be based on (GDT: TransportationZoneID). LogisticsExecutionRequisitionItemTransportationTermsTransportServiceLevelCode is optional and may be based on GDT: TransportServiceLevelCode. LogisticsExecutionRequisitionItemTransportationTermsTransportModeCode is optional and may be based on GDT: TransportModeCode. LogisticsExecutionRequisitionItemTransportationTermsTransportMeans is optional and may be based on GDT: TransportMeans. DateArrivalPeriod relates to the query element derived from the TimePointPeriod of the PeriodRoleCode from the ActivityDate node, and is optional. DateArrivalPeriod may be based on GDT: TimePointPeriod. DateAvailabilityPeriod relates to the query element derived from the TimePointPeriod of the PeriodRoleCode from the ActivityDate node, and is optional.

DateAvailabilityPeriod may be based on GDT: TimePointPeriod. SystemAdministrativeData relates to an administrative data recorded by the system, and is optional. This data includes system users and change times.

SystemAdministrativeData may be based on GDT: SystemAdministrativeDate. CreationBusinessPartnerCommonPersonNameGivenName is optional and may be based on GDT: LANGUAGEINDEPENDANT_MEDIUM_Name. CreationBusinessPartnerCommonPersonNameFamilyName is optional and may be based on GDT: LANGUAGEINDEPENDANT_MEDIUM_Name. LastChangeBusinessPartnerCommonPersonNameGivenName is optional and may be based on GDT: LANGUAGEINDEPENDANT_MEDIUM_Name. LastChangeBusinessPartnerCommonPersonName FamilyName is optional and may be based on GDT: LANGUAGEINDEPENDANT_MEDIUM_Name.

QueryByOutboundElements provides a list of all LogisticsExecutionRequisitionActivities that satisfy the selection criteria specified by the query elements.

GDT LogisticsExecutionRequisitionItemActivityOutboundElementsQueryElements defines the query elements: LogisticsExecutionRequisitionItemPartyBuyerID is an identifier for the Buyer party, and is optional. The query element is derived from the PartyRoleCategoryCode and the PartyID of the ItemParty node.

LogisticsExecutionRequisitionItemPartyBuyerID may be based on GDT: PartyID. LogisticsExecutionRequisitionItemPartySellerID is an identifier for the Seller party, and is optional. The query element is derived from the PartyRoleCategoryCode and the PartyID of the ItemParty node.

LogisticsExecutionRequisitionItemPartySellerID may be based on GDT: PartyID. LogisticsExecutionRequisitionItemPartyProductRecipientPartyID is an identifier for the ProductRecipient party, and is optional. The query element is derived from the PartyRoleCategoryCode and the PartyID of the ItemParty node. LogisticsExecutionRequisitionItemPartyProductRecipientPartyID may be based on GDT: PartyID. LogisticsExecutionRequisitionItemPartyFreightForwarderPartyID is an identifier for the FreightForwarder party, and is optional. The query element is derived from the PartyRoleCategoryCode and the PartyID of the ItemParty node. LogisticsExecutionRequisitionItemPartyFreightForwarderPartyID may be based on GDT: PartyID.

In addition to the above, LogisticsExecutionRequisitionItemPartyCarrierPartyID is an identifier for the Carrier party, and is optional. The query element is derived from the PartyRoleCategoryCode and the PartyID of the ItemParty node.

LogisticsExecutionRequisitionItemPartyCarrierPartyID may be based on GDT: PartyID. LogisticsExecutionRequisitionItemPartyPickupPartyID is an Identifier for the Pickup party, and is optional. The query element is derived from the PartyRoleCategoryCode and the PartyID of the ItemParty node.

LogisticsExecutionRequisitionItemPartyPickupPartyID may be based on GDT: PartyID. LogisticsExecutionRequisitionItemPartyVendor PartyID is an identifier for the Vendor party, and is optional. The query element is derived from the PartyRoleCategoryCode and the PartyID of the ItemParty node.

LogisticsExecutionRequisitionItemPartyVendor PartyID may be based on GDT: PartyID. LogisticsExecutionRequisitionItemBusinessTransaction-DocumentReferenceSalesOrderItemReference is optional and may be based on GDT: BusinessTransactionDocumentReference. LogisticsExecutionRequisitionItemBusinessTransaction-DocumentReferenceServiceOrderItemReference is optional and may be based on GDT: BusinessTransactionDocumentReference. LogisticsExecutionRequisitionItemBusinessTransaction-DocumentReferenceOutboundDeliveryItem Reference is optional and may be based on GDT: BusinessTransactionDocumentReference. LogisticsExecutionRequisitionItemBusinessTransaction-DocumentReferenceSiteLogisticsRequisition RequestItemReference is optional and may be based on GDT: BusinessTransactionDocumentReference. InitialOrderItemBusinessTransactionDocumentReference is optional and may be based on GDT: BusinessTransactionDocumentReference.

In continuation, ActivityReleaseStatusCode is optional and may be based on GDT: ReleaseStatusCode, Qualifier: Activity. LogisticsExecutionRequisitionItemDeliveryBlockingStatusCode is optional and may be based on GDT: DeliveryBlockingStatusCode. LogisticsExecutionRequisitionItemDeliveryTermsIncoterms is optional and may be based on GDT: Incoterms. ProductProductID is optional and may be based on GDT: ProductID. ProductProductCategoryID is optional and may be based on GDT: ProductCategoryInternalID. LocationShipFromLocationID is optional and may be based on GDT: LocationID. LogisticsExecutionRequisitionItemLocationShipToLocationID is an identifier for the ShipTo location, and is optional. The query element is derived from the LocationRoleCategoryCode and the LocationID of the ItemLocation node. LogisticsExecutionRequisitionItemLocationShipToLocationID may be based on GDT: LocationID. LogisticsExecutionRequisitionItemLocationTransportationZoneAssignmentTransportationZoneID is optional and may be based on GDT: TransportationZoneID. LogisticsExecutionRequisitionItemTransportationTermsTransportServiceLevelCode is optional and may be based on GDT: TransportServiceLevelCode. LogisticsExecutionRequisition-ItemTransportationTermsTransportModeCode is optional and may be based on GDT: TransportModeCode). LogisticsExecutionRequisition-ItemTransportationTermsTransportMeans is optional and may be based on GDT: TransportMeans. DatePositioningPeriod relates to the query element derived from the TimePointPeriod of the PeriodRoleCode from the ActivityDate node. DatePositioningPeriod may be based on GDT: TimePointPeriod. DateIssuePeriod where the query element is derived from the TimePointPeriod of the PeriodRoleCode from the ActivityDate node, and is optional. DateIssuePeriod may be based on GDT: TimePointPeriod. SystemAdministrativeData is an administrative data recorded by the system, and is optional. This data includes system users and change times. SystemAdministrativeData may be based on GDT: SystemAdministrativeDate. CreationBusinessPartnerCommonPersonNameGivenName is optional and may be based on GDT: LANGUAGEINDEPENDANT_MEDIUM_Name. CreationBusinessPartnerCommonPersonNameFamilyName is optional and may be based on GDT: LANGUAGEINDEPENDANT_MEDIUM_Name. LastChangeBusinessPartnerCommonPersonNameGivenName is optional and may be based on GDT: LANGUAGEINDEPENDANT_MEDIUM_Name. LastChangeBusinessPartnerCommonPersonNameFamilyName is optional and may be based on GDT: LANGUAGEINDEPENDANT_MEDIUM_Name.

ItemActivityParty

A Party is a natural or legal person, organization, organizational unit, or group that is involved in a logistics execution processing in a PartyRole. An ItemParty may: Keep a reference to a business partner or one of its specializations (for example, customer, supplier, employee); or Keep a reference to one of the following specializations of an organizational unit: Company, CostCentre, ReportingLineUnit. A Party may exist without reference to a business partner or an organizational unit. Party is of the type GDT: LogisticsExecutionRequisitionItemActivityPartyElements consisting of PartyKey, PartyUUID, RoleCategoryCode, RoleCode, AddressReference, MainIndicator and Name.

PartyKey is Key of the Party in this PartyRole in the business document or the master data object, and is optional. If a business partner or organizational unit are referenced, the attribute Party_ID contains their identifiers and the field PartyTypeCode either the Object Type Code of the Business Partner or of Organizational Centre. If an unidentified identifier is, for example, entered by the user, the Party_ID contains this identifier and the PartyTypeCode is empty. PartyKey may be based on GDT: PartyKey. PartyUUID is an identifier, which can be unique, for a business partner, the organizational unit, or their specializations, and is optional. PartyUUID may be based on GDT: UUID. RoleCategoryCode relates to Party Role Category of the Party in the business document or the master data object, and is optional. RoleCategoryCode may be based on GDT: PartyRoleCategoryCode. The following codes are used: CarrierParty: A party responsible for the shipment of a good, FreightForwarderParty: A party responsible for organizing the shipment of a good and PickupParty: A party that collects the goods. RoleCode relates to Party Role of the ItemParty in the business document or the master data object, and is optional. RoleCode may be based on GDT: PartyRoleCode. AddressReference can relate to the information to reference the address of a Party, and is optional. AddressReference may be based on GDT: PartyAddressReference. MainIndicator indicates whether or not a Party is emphasized in a group of parties with the same PartyRole and may be based on GDT: Indicator and Qualifier: Main. Name can relate to Name of the Party, and is optional. Name may be based on GDT: Long_Name.

Composition Relationships may relate to ItemActivityPartyContactParty 294136 1:cn, ItemActivityPartyStandardIdentification 294142 1:cn and ItemActivityPartyAddress 294140 1:c as Composition to Dependent Object Address.

Associations for navigation may relate to business object LogisticsExecutionRequisition/node ItemActivityPartyContactParty, MainContactParty c:c as to business object Party/node Root and Party c:cn as referenced Party in master data. Also to the transformed object UsedAddress/node Root, UsedAddress c:cn, for the address used for the Party. This can be: A referenced address of the master data object, or The PartyAddress used via the composition relationship. It is possible to determine which of the two applies by means of the PartyAddressHostTypeCode element The instance of the TO UsedAddress represents this address. The association is implemented. In case 1) The node ID of the node in the master data object is determined via the PartyTypeCode, PartyAddressUUID and PartyAddressHostTypeCode elements that has the composition relationship to the DO address that is to be represented by the TO UsedAddress. Additionally, the TO UsedAddress in the implemented association is provided with the following information: That this is an example of a master data address, and BusinessObjectTypeCode, BusinessObjectNodeTypeCode and Node ID of its own <BO-Node>-Party node. These are required in case changes to the TO UsedAddress take place. In this case, the master data address is copied by the TO UsedAddress, the changes take place to the copy, and a corresponding DO Address is created at the <BO-Node>Party via the PartyAddress composition relationship. In case 2) The TO UsedAddress is informed of the BusinessObjectTypeCode, BusinessObjectNodeTypeCode and Node ID of its own <BO-Node>-Party. Additionally, information is provided that this is not an example of a referenced address. In this case, the TO UsedAddress represents the DO address used at the <BO-Node>-Party via the PartyAddress composition relationship The following integrity conditions are checked: If the PartyUUID exists, the PartyTypeCode may exist as well. Parties may only be referenced via the Transformed Object Party, that represent at least one of the following business objects: Company, CostCentre, Functional Unit, ReportingLineUnit, Supplier, Customer, Employee, BusinessPartner. There may only be one aggregation relationship to the business partner, the organizational unit, or their specializations. If the PartyUUID exists, the BusinessObjectTypeCode may exist as well. There may only be one of the associations to the address. This address is a master data address of the business partner, organizational unit, or their specializations referenced by PartyUUID.

ItemActivityPartyStandardIdentification

ItemActivityPartyStandardIdentification is a standardized identifier for the item activity party. PartyStandardID is standardized identification of the party and may be based on GDT: PartyStandardID.

DO ItemActivityPartyAddress

The Dependent Object Address contains the document specific address of the item activity party. The data is defined by the Dependent Object Address. The structure is defined by DO Address.

ItemActivityPartyContactParty

A ItemActivityPartyContactParty is a natural person or organizational unit that can be contacted for the ItemActivityParty. The contact may be a contact person or, for example, a secretary's office. Usually, communication data for the contact is available. ItemActivityPartyContactParty is of the type GDT: LogisticsExecutionElementsItemActivityPartyContactPartyElements consisting of: PartyKey, PartyUUID, AddressReference, MainIndicator and Name. PartyKey is Key of the Party in this PartyRole in the business document or the master data object, and is optional. If a business partner or organizational unit are referenced, the attribute Party_ID contains their identifiers and the field PartyTypeCode either the Object Type Code of the Business Partner or of Organizational Centre. If an unidentified identifier is, for example, entered by the user, the Party_ID contains this identifier and the PartyTypeCode is empty. PartyKey may be based on GDT: PartyKey. PartyUUID is an identifier, that can be unique, of the contact in this PartyRole in the business document or the master data object, and is optional. PartyUUID may be based on GDT: UUID. AddressReference is the information to reference the address of a Party, and is optional. AddressReference may be based on GDT: PartyAddressReference. MainIndicator indicates whether or not a PartyContactParty is emphasized in a group of contact parties with the same PartyRole and may be based on GDT: Indicator and Qualifier: main. Name relates to Name of the PartyContactParty and may be based on GDT: Long_Name.

The composition relationship to subordinate nodes that may exist is ItemActivityPartyContactPartyAddress 294138 1:c as composition to Dependent Object Address. Inbound Aggregation Relationships may relate from business object Party/node Root Party c:cn, as referenced Party in master data. Association for navigation may relate to the transformed object UsedAddress/node Root, UsedAddress c:cn, as used address for Party. This may be the referenced address of a master data object or a address referenced via the composition to PartyAddress. The integrity conditions checked is There may only be one of the associations to the address. This address is a master data address of the business partner, organizational unit, or their specializations referenced by PartyUUID.

DO ItemActivityPartyContactPartyAddress

The Dependent Object Address contains the document specific address of the item activity contact party. The data is defined by the Dependent Object Address. Structure is defined by DO Address.

ItemActivityQuantity

The product quantity (requested, confirmed or open) of an ItemActivity. The elements located at the node ItemActivityQuantity are defined by the data type: LogisticsExecutionRequisitionItemActivityQuantityElements. These elements are: Quantity, QuantityTypeCode, QuantityRoleCode and QuantityOriginCode. Quantity relates to the quantity with the corresponding unit of measure. and may be based on GDT: Quantity. QuantityTypeCode is coded representation of the type of the quantity value and may be based on GDT: QuantityTypeCode. QuantityRoleCode is coded representation of the role of a quantity and may be based on GDT: QuantityRoleCode. The following codes will be used: RequestedQuantity, ConfirmedQuantity, Forwarded Quantity, Fulfilled Quantity and OpenQuantity, where this open quantity is the difference between the confirmed and the fulfilled quantity. The confirmed, fulfilled and forwarded quantity are cumulated over all Activity Confirmations that belong to a given activity. QuantityOriginCode is coded representation of the origin of the quantity value, and is optional. QuantityOriginCode may be based on GDT: QuantityOriginCode.

ItemActivityBusinessTransactionDocumentReference

ItemActivityBusinessTransactionDocumentReference is a reference to a business transaction document and one of its items which is related to the ItemActivity. ItemActivityBusinessTransactionDocumentReference occurs in the following complete and nondisjoint specialization: SiteLogisticsRequisition. The elements located at the node ItemActivityBusinessTransactionDocumentReference are defined by the data type: LogisticsExecutionRequisitionItemActivityBusinessTransactionDocumentReferenceElements. These elements are BusinessTransactionDocumentReference and BusinessTransactionDocumentRelationshipRoleCode. BusinessTransactionDocumentReference, where reference is a clear reference to other business documents that are important for the LogisticsExecutionRequisition and may be based on GDT: BusinessTransactionDocumentReference. BusinessTransactionDocumentRelationshipRoleCode is coded representation of the role the referenced document or referenced document item plays in relation to the Logistics Execution Requisition and is optional. BusinessTransactionDocumentRelationshipRoleCode may be based on GDT: BusinessTransactionDocumentRelationshipRoleCode. Inbound Aggregation Relationships may relate from From business object SiteLogisticsRequisition node SiteLogisticsRequisitionRequestItem, SiteLogisticsRequisition RequestItem c:c as the request item of a Site Logistics Requisition.

ItemActivityLocation

A location is a physical place which is part of the logistics execution process in a LocationRole. A Location may: Keep a reference to a business object Location; Keep a reference to an address; Keep a reference to a business partner or one of its specialisations (for example customer, supplier or employee); or Keep a reference to the following specialization of an organizational unit: ReportingLineUnit. The LocationRole describes the role of a Location in the logistics execution process. Location is of the type GDT: LogisticsExecutionRequisitionItemActivityLocationElements consisting of: LocationID, Location UUID, AddressReference, AddressHostUUID, BusinessObjectTypeCode, AddressHostTypeCode, PartyKey, InstalledBaseID, InstallationPointID, RoleCategoryCode and RoleCode.

LocationID is an identifier of the Location in this LocationRole, and is optional. If a location, business partner or organizational unit are referenced, the attribute contains their identifiers. If an unidentified identifier is, for example, entered by the user, the attribute contains this identifier.

LocationID may be based on GDT: LocationID (without additional components, such as schemeAgencyID). LocationUUID is an identifier, which can be unique, for a location, business partner, the organizational unit, or their specializations. LocationUUID may be based on GDT: UUID. AddressReference is the information to reference the address of a Party, an InstalledBase or an InstallationPoint, and is optional. AddressReference may be based on IDT: ObjectNodeLocationAddressReference. AddressHostUUID is a universal identifier, which can be unique, of the address of the business partner, the organizational unit or its specializations, the BO InstalledBase or the BO InstallationPoint. AddressHostUUID may be based on GDT: UUID. BusinessObjectTypeCode is the coded representation of the BusinessObjectTypes of the business object, in which the address referenced in Element LocationAddressUUID is integrated as a Dependent Object.

BusinessObjectTypeCode may be based on GDT: BusinessObjectTypeCode.

AddressHostTypeCode is the coded representation of the address host type of the address referenced by AddressUUID or the address included via the LocationAddress composition. AddressHostTypeCode may be based on GDT: AddressHostTypeCode. PartyKey is an alternative identifier of a Party (represents a business partner or an organizational unit), that reference the address via AddressUUID. PartyKey may be based on GDT: PartyKey. InstalledBaseID is an identifier of the BO InstalledBase, that reference the address via AddressUUID. InstalledBaseID may be based on GDT: InstalledBaseID. InstallationPointID is an identifier of the BO InstallationPoint, that reference the address via AddressUUID. InstallationPointID may be based on GDT: InstallationPointID. RoleCategoryCode is Location Role Category of the Location and may be based on GDT: LocationRoleCategoryCode. The following codes are used: ShipFromLocation: Location from where a good is shipped and ShipToLocation: Location to where a good is shipped. RoleCode is Location Role of the Location and may be based on GDT: LocationRoleCode.

The composition relationships to subordinate nodes that may exist are: ItemActivityLocationStandardIdentification 294146 1:c and ItemActivityLocationAddress 294148 1:c as Composition to Dependent Object Address. Inbound Aggregation Relationships may relate from business object Location/node Root, Location c:cn as Location corresponding to the Location; From business object Party/node AddressInformation, PartyAddressInformation c:cn as AddressInformation of a representative of a Business Partner or Organizational Centre corresponding to the Location; From business object InstalledBase/node AddressInformation, InstalledBaseAddressInformation c:cn as AddressInformation of an Installed Base corresponding to the Location; From business object InstallationPoint/node AddressInformation, InstallationPointAddressInformation c:cn as AddressInformation of an Installation Point corresponding to the Location Association for Navigation may relate to the transformed object UsedAddress/node Root, UsedAddress c:cn as address used for this location. This can be: 1) A referenced address of a master data object or 2) The address that is integrated via the composition relationship LocationAddress. You can see which of the two cases applies by looking at the element AddressHostTypeCode. The instance of the TO UsedAddress represents this address. The association is implemented. In case 1) the elements AddressBusinessObjectTypeCode, AddressUUID and AddressHostTypeCode are used to determine the Node ID of the node in the master data object, which holds the composition relationship with DO Address, which is to be represented by TO UsedAddress. Furthermore, the following information is sent to the TO UsedAddress in the implemented address: The fact that it is a master data address; the BusinessObjectTypeCode, BusinessObjectNodeTypeCode and Node ID of the own <BO-Node>Location node. This are required if changes are made to the TO UsedAddress. In this case the TO UsedAddress copies the master data address, the changes are applied and the corresponding DO Address is generated on the <BO-Node>Location node via the composition relationship LocationAddress. In case 2) the BusinessObjectTypeCode, BusinessObjectNodeTypeCode and Node ID of the own <BO-Node>Location are communicated to the TO UsedAd-dress. Whether or not it is a referenced address is also included. In this case, the TO UsedAddress represents the DO Address that is integrated via the composition relationship on the <BO-Node>Location node.

Integrity Conditions

The integrity conditions checked include: There can be either just one aggregation or composition relationship to the dependent object; If there is an aggregation relationship to the BO Location, the LocationID attribute is filled with the ID of BO Location. All other ID fields (PartyID, InstalledBaseID and InstallationPointID) remain blank; If the address of a party is referenced (representative of a BusinessPartners or an OrganisationalCentre), the PartyID attribute is filled with the ID of the Party. All other ID fields (LocationID, InstalledBaseID and InstallationPointID) remain blank. The reference is kept in the AddressUUID attribute; If there is an aggregation relationship to the address of an InstalledBase, the InstalledBaseID attribute is filled with the ID of the InstalledBase. All other ID fields (LocationID, PartyID and InstallationPointID) remain blank. The reference is kept in the AddressUUID InstalledBaseAddressInformationUUID attribute; If there is an aggregation relationship to the address of an InstallationPoint, the InstallationPointID attribute is filled with the ID of the InstallationPoint. All other ID fields (LocationID, PartyID and InstalledBaseID) remain blank. The reference is kept in the AddressUUID attribute; If an address is referenced via the element AddressUUID, then elements AddressBusinessObjectTypeCode and AddressHostTypeCode may also be filled; and All locations may exist in all derived business objects, if necessary.

ItemActivityLocationStandardIdentification

ItemActivityLocationStandardIdentification is standardized identification of a location. LocationStandardID is standardised identification of a Location and may be based on GDT: LocationStandardID. An instance of LocationStandardIdentification is always formed, if standard identifiers can be made available for a Location of a higher level than this instance. This can take place from the master data, the messages or by means of user interaction.

DO ItemActivityLocationAddress

The dependent object Address includes the data necessary to describe a physical or logical location. Structure is defined in the dependent object address.

ItemActivityDate

A (calendar) date and time information about appointments relevant for logistics execution processing. An appointment can be given with more or less precision. It can be second-precise, minute-precise, day-precise and so forth. The elements located at the node ItemActivityDate are defined by the data type: LogisticsExecutionRequisitionItemActivityDateElements. These elements are: PeriodRoleCode and TimePointPeriod. PeriodRoleCode is coded representation of the semantic of a time point period in a logistics execution activity and may be based on GDT: PeriodRoleCode. Only the following codes are used: Positioning period: At this end of this period, the material or goods may be available in the warehouse; Issue period: Period in which the material or goods leave the warehouse; Arrival period: Period in which the materials or goods reach the customer; Pickup period: Period in which the materials or goods are being picked; and Availability period: Period in which the materials or goods are available. TimePointPeriod relates to time point period with a relevance to the logistics execution activity and may be based on GDT: TimePointPeriod.

ItemActivityProduct

The identification, description and classification of the product relevant for the logistics process. The elements located at the node ItemActivityProduct are defined by the data type: LogisticsExecutionRequisitionItemActivityProductElements. These elements are: ProductID, ProductSellerID, ProductTypeCode, ProductStandardID, ProductBuyerID, ProductProductRecipientID, ProductVendorID, ProductCategoryHierarchyProductCategoryKey, ProductCategoryInternalID and ProductUUID. ProductID is an identifier, which can be unique, of a product. ProductID may be based on GDT: ProductID.

ProductSellerID is an identifier, which can be unique, of the product assigned by the seller, and is optional. ProductSellerID may be based on GDT: ProductPartyID. ProductTypeCode is coded representation of the product type. A product type describes the nature of products and determines the basic characteristics for products of this type. ProductTypeCode may be based on GDT: ProductTypeCode. The following code may be used: 1 Material.

ProductStandardID is an identifier, which can be unique, of a product whereby the identification sheet used is managed by an agency from code list DE 3055, and is optional. ProductStandardID may be based on GDT: ProductStandardID.

ProductBuyerID is an identifier, which can be unique, of the product assigned by the purchaser, and is optional. ProductBuyerID may be based on GDT: ProductPartyID. ProductProductRecipientID is an identifier, which can be unique, of the product assigned by the goods recipient, and is optional. ProductProductRecipientID may be based on GDT: ProductPartyID. ProductVendorID is an identifier, which can be unique, of the product assigned by the vendor, and is optional. ProductVendorID may be based on GDT: ProductPartyID. ProductCategoryHierarchyProductCategoryKey is an alternative key of a product category hierarchy. ProductCategoryHierarchyID is an alternative identifier for a product category hierarchy and may be based on GDT: ProductCategoryHierarchyID. ProductCategoryInternalID is an alternative identifier for a product category and may be based on GDT: ProductCategoryInternalID. ProductUUID is a universal identifier, which can be unique, of the product in the delivery request and may be based on GDT: UUID. Inbound Aggregation Conditions may relate from business object Product/node Product, Material c:cn and from business object ProductCategoryHierarchy/node ProductCategory, ProductCategory c:cn.

ItemActivityConfirmation

An activity taken and confirmed to fulfil a LogisticsExecutionRequisitionItem. Confirmation means that the Logistics Execution plans to execute the ItemActivity as requested or eventually that it is executed as confirmed. The difference between a planned and actual confirmation is specified by the status. The elements located at the node ItemActivityConfirmation are defined by the data type: LogisticsExecutionRequisitionItemActivityConfirmationElements. These elements are UUID, Status and ActivityProcessingStatusCode. UUID is a universal identifier, which can be unique, of ItemActivityConfirmation. UUID may be based on GDT: UUID. Status relates to status of the LogisticsExecutionRequisitionItemActivityConfirmation. Status may be based on GDT: LogisticsExecutionRequisitionItemActivityConfirmationStatus. ActivityProcessingStatusCode may be based on GDT: NOTSTARTEDINPROCESSFINISHED_ProcessingStatusCode and the Qualifier: Activity.

The composition relationships to subordinate nodes that may exist are ItemActivityConfirmationQuantity 294158 1:n, ItemActivityBusinessTransactionDocumentReference 294156 1:c, ItemActivityConfirmationLocation 294164 1:c, ItemActivityConfirmationDate 294160 1:n and ItemActivityConfirmationProduct 294172 1:1. Specialization associations for navigation may relate to: business object LogisticsExecutionRequisition/node ItemActivityConfirmationQuantity, such as: ConfirmedQuantity c:c, ForwardedQuantity c:c and FulfilledQuantity c:c; business object LogisticsExecutionRequisition/node ItemActivityConfirmationLocation as ShipToLocation c:c and ShipFromLocation c:c and business object LogisticsExecutionRequisition/node ItemActivityConfirmationDate as Positioning period c:c, Issue period c:c, Arrival period c:c, Pickup period c:c and AvailabilityPeriod c:c. Enterprise Service Infrastructure Actions include NotifyOfProcessingStatus where this action is triggered by status changes of the linked SiteLogisticsRequisition confirmation and leads to a status transition of the ActivityProcessingStatus.

ItemActivityConfirmationQuantity

The confirmed (acknowledged, rejected or fulfilled) product quantity. The elements located at the node ItemActivityConfirmationQuantity are defined by the data type: LogisticsExecutionRequisitionItemActivityConfirmationQuantity Elements. These elements are Quantity, QuantityTypeCode, QuantityRoleCode and QuantityOriginCode. Quantity is the quantity with the corresponding unit of measure. Quantity may be based on GDT: Quantity. QuantityTypeCode is coded representation of the type of the quantity value. QuantityTypeCode may be based on GDT: QuantityTypeCode. QuantityRoleCode is coded representation of the role of a quantity. QuantityRoleCode may be based on GDT: QuantityRoleCode. The codes that may be used include: ConfirmedQuantity, Forwarded Quantity and FulfilledQuantity. QuantityOriginCode is coded representation of the origin of the quantity value, and is optional. QuantityOriginCode may be based on GDT: QuantityOriginCode.

ItemActivityConfirmation-BusinessTransactionDocumentReference

A reference to a business transaction document and one of its items which is related to the ItemActivityConfirmation. ItemActivityConfirmation-BusinessTransactionDocumentReference occurs in the following complete and non-disjoint specialization: SiteLogisticsRequisition. The elements located at the node ItemActivityConfirmation-BusinessTransactionDocumentReference are defined by the data type: LogisticsExecutionRequisitionItemActivityConfirmation-BusinessTransactionDocumentReferenceElements. These elements are BusinessTransactionDocumentReference and BusinessTransactionDocumentRelationshipRoleCode. BusinessTransactionDocumentReference where Reference is a clear reference to other business documents that are important for the LogisticsExecutionRequisition. BusinessTransactionDocumentReference may be based on GDT: BusinessTransactionDocumentReference. BusinessTransactionDocumentRelationshipRoleCode is coded representation of the role the referenced document or referenced document item plays in relation to the Logistics Execution Requisition, and is optional. BusinessTransactionDocumentRelationshipRoleCode may be based on GDT: BusinessTransactionDocumentRelationshipRoleCode. Inbound Aggregation Relationships may relate from business object SiteLogisticsRequisition/node SiteLogisticsRequisitionRequestItem, SiteLogisticsRequisition ConfirmationItem c:c, as the confirmation item of a Site Logistics Requisition.

ItemActivityConfirmationLocation

A location is a physical place which is part of the logistics execution process in a LocationRole. A Location may: Keep a reference to a business object Location; Keep a reference to an address; Keep a reference to a business partner or one of its specialisations (for example customer, supplier or employee); or Keep a reference to one of the following specializations of an organizational unit: ReportingLineUnit. The LocationRole describes the role of a Location in the logistics execution process. Location is of the type GDT: LogisticsExecutionRequisitionItemActivityConfirmationLocationElements consisting of: LocationID, LocationUUID, AddressReference, AddressHostUUID, BusinessObjectTypeCode, AddressHostTypeCode, PartyKey, InstalledBaseID, InstallationPointID, RoleCategoryCode and RoleCode. LocationID is an identifier of the Location in this LocationRole, and is optional. If a location, business partner or organizational unit are referenced, the attribute contains their identifiers. If an unidentified identifier is, for example, entered by the user, the attribute contains this identifier. LocationID may be based on GDT: LocationID (without additional components, such as schemeAgencyID. LocationUUID is an identifier, which can be unique, for a location, business partner, the organizational unit, or their specializations, and is optional. LocationUUID may be based on GDT: UUID. AddressReference is the information to reference the address of a Party, an InstalledBase or an InstallationPoint, and is optional. AddressReference may be based on IDT: ObjectNodeLocationAddressReference. AddressHostUUID is a universal identifier, which can be unique, of the address of the business partner, the organizational unit or its specializations, the BO InstalledBase or the BO InstallationPoint. AddressHostUUID may be based on GDT: UUID. BusinessObjectTypeCode is the coded representation of the BusinessObjectTypes of the business object, in which the address referenced in Element LocationAddressUUID is integrated as a Dependent Object. BusinessObjectTypeCode may be based on GDT: BusinessObjectTypeCode.

AddressHostTypeCode is the coded representation of the address host type of the address referenced by AddressUUID or the address included via the LocationAddress composition. AddressHostTypeCode may be based on GDT: AddressHostTypeCode. PartyKey is an alternative identifier of a Party (represents a business partner or an organizational unit), that reference the address via AddressUUID. PartyKey may be based on GDT: PartyKey. InstalledBaseID is an identifier of the BO InstalledBase, that reference the address via AddressUUID. InstalledBaseID may be based on GDT: InstalledBaseID. InstallationPointID is an identifier of the BO InstallationPoint, that reference the address via AddressUUID. InstallationPointID may be based on GDT: InstallationPointID. RoleCategoryCode relates to Location Role Category of the Location and may be based on GDT: LocationRoleCategoryCode. The following codes are used: ShipFromLocation: Location from where a good is shipped and ShipToLocation: Location to where a good is shipped. RoleCode relates to Location Role of the Location and may be based on GDT: LocationRoleCode. The composition relationships to subordinate nodes that may exist include: ItemActivityConfirmationLocationStandardIdentification 294170 1:c and RequestItemLocationAddress 294166 1:c as Composition to Dependent Object Address. Inbound Aggregation Relationships may relate from business object Location/node Root, Location c:cn as Location corresponding to the Location; from business object Party/node AddressInformation, PartyAddressInformation c:cn as AddressInformation of a representative of a Business Partner or Organizational Centre corresponding to the Location; from business object InstalledBase/node AddressInformation, InstalledBaseAddressInformation c:cn as AddressInformation of an Installed Base corresponding to the Location; and from business object InstallationPoint/node AddressInformation, InstallationPointAddressInformation c:cn as AddressInformation of an Installation Point corresponding to the Location.

Association for navigation relate to the transformed object UsedAddress/node Root, UsedAddress c:cn as address used for this location. This can be: 1) A referenced address of a master data object or 2) The address that is integrated via the composition relationship LocationAddress. You can see which of the two cases applies by looking at the element AddressHostTypeCode. The instance of the TO UsedAddress represents this address. The association is implemented. In case 1) the elements AddressBusinessObjectTypeCode, AddressUUID and AddressHostTypeCode are used to determine the Node ID of the node in the master data object, which holds the composition relationship with DO Address, which is to be represented by TO UsedAddress. Furthermore, the following information is sent to the TO UsedAddress in the implemented address: The fact that it is a master data address; the BusinessObjectTypeCode, BusinessObjectNodeTypeCode and Node ID of the own <BO-Node>Location node. This are required if changes are made to the TO UsedAddress. In this case the TO UsedAddress copies the master data address, the changes are applied and the corresponding DO Address is generated on the <BO-Node>Location node via the composition relationship LocationAddress. In case 2) the BusinessObjectTypeCode, BusinessObjectNodeTypeCode and Node ID of the own <BO-Node>Location are communicated to the TO UsedAddress. Whether or not it is a referenced address is also included. In this case, the TO UsedAddress represents the DO Address that is integrated via the composition relationship on the <BO-Node>Location node.

The following integrity conditions are checked: There can be either just one aggregation or composition relationship to the dependent object; If there is an aggregation relationship to the BO Location, the LocationID attribute is filled with the ID of BO Location. All other ID fields (PartyID, InstalledBaseID and InstallationPointID) remain blank; If the address of a party is referenced (representative of a BusinessPartners or an OrganisationalCentre), the PartyID attribute is filled with the ID of the Party. All other ID fields (LocationID, InstalledBaseID and InstallationPointID) remain blank. The reference is kept in the AddressUUID attribute; If there is an aggregation relationship to the address of an InstalledBase, the InstalledBaseID attribute is filled with the ID of the InstalledBase. All other ID fields (LocationID, PartyID and InstallationPointID) remain blank. The reference is kept in the AddressUUID InstalledBaseAddressInformationUUID attribute; If there is an aggregation relationship to the address of an InstallationPoint, the InstallationPointID attribute is filled with the ID of the InstallationPoint. All other ID fields (LocationID, PartyID and InstalledBaseID) remain blank. The reference is kept in the AddressUUID attribute; and If an address is referenced via the element AddressUUID, then elements AddressBusinessObjectTypeCode and AddressHostTypeCode may also be filled. All locations may exist in all derived business objects, if necessary.

ItemActivityConfirmationLocationStandardIdentification

Standardized identification of a location. LocationStandardID is standardised identification of a Location.

LocationStandardID GDT: LocationStandardID. An instance of LocationStandardIdentification is always formed, if standard identifiers can be made available for a Location of a higher level than this instance. This can take place from the master data, the messages or by means of user interaction.

DO ItemActivityConfirmationLocationAddress

The dependent object Address includes the data necessary to describe a physical or logical location. Structure can be defined in the dependent object address.

ItemActivityConfirmationDate

A (calendar) date and time information about appointments relevant for logistics execution processing. An appointment can be given with more or less precision. It can be second-precise, minute-precise, day-precise and so forth. The elements located at the node ItemActivityDate are defined by the data type: LogisticsExecutionRequisitionItemActivityConfirmationDateElements. These elements are PeriodRoleCode and TimePointPeriod. PeriodRoleCode is coded representation of the semantic of a time point period in an activity. PeriodRoleCode may be based on GDT: PeriodRoleCode. The following codes may be used: Positioning period: At this end of this period, the material or goods may be available in the warehouse. Issue period: Period in which the material or goods leave the warehouse. Arrival period: Period in which the materials or goods reach the customer. Pickup period: Period in which the materials or goods are being picked. AvailabilityPeriod: Period in which the materials or goods are available. TimePointPeriod relates to time point period with a relevance to the logistics execution activity. TimePointPeriod may be based on GDT TimePointPeriod.

ItemActivityConfirmationProduct

The identification, description and classification of the product relevant for the logistics process. The elements located at the node ItemActivityConfirmationProduct are defined by the data type: LogisticsExecutionRequisitionItemActivityConfirmationProductElements. These elements are: ProductID, ProductSellerID, ProductTypeCode, ProductStandardID, ProductBuyerID, ProductProductRecipientID, ProductVendorID, ProductCategoryHierarchyProductCategoryKey, ProductCategoryHierarchyID, ProductCategoryInternalID and ProductUUID. ProductID is an identifier, which can be unique of a product. ProductID may be based on GDT: ProductID. ProductSellerID is an identifier, which can be unique, of the product assigned by the seller, and is optional. ProductSellerID may be based on GDT: ProductPartyID. ProductTypeCode is a coded representation of the product type. A product type describes the nature of products and determines the basic characteristics for products of this type. ProductTypeCode may be based on GDT: ProductTypeCode. Only the following code is used: 1 Material.

In addition to the above, ProductStandardID is an identifier, which can be unique, of a product whereby the identification sheet used is managed by an agency from code list DE 3055, and is optional. ProductStandardID may be based on GDT: ProductStandardID. ProductBuyerID is an identifier, which can be unique, of the product assigned by the purchaser, and is optional. ProductBuyerID may be based on GDT: ProductPartyID. ProductProductRecipientID is an identifier, which can be unique, of the product assigned by the goods recipient, and is optional. ProductProductRecipientID may be based on GDT: ProductPartyID. ProductVendorID is an identifier, which can be unique, of the product assigned by the vendor, and is optional. ProductVendorID may be based on GDT: ProductPartyID. ProductCategoryHierarchyProductCategoryKey is an alternative key of a product category hierarchy, and is optional. ProductCategoryHierarchyID is an alternative identifier for a product category hierarchy. ProductCategoryHierarchyID may be based on GDT: ProductCategoryHierarchyID. ProductCategoryInternalID is an alternative identifier for a product category and may be based on GDT: ProductCategoryInternalID. ProductUUID is a universal identifier, which can be unique, of the product in the delivery request and may be based on GDT: UUID. Inbound Aggregation Conditions may relate from business object Product/node Product, Material c:cn and from business object ProductCategoryHierarchy/node ProductCategory, ProductCategory c:cn.

PlannedIndependentRequirement Business Object

FIG. 295 illustrates one example of a plannedIndependentRequirement business object model 295004. Specifically, this model depicts interactions among various hierarchical components of the PlannedIndependentRequirement, as well as external components that interact with the PlannedIndependentRequirement (shown here as 295000 through 295002, 295006 through 295008, and 295018).

PlannedIndependentRequirement is an independent requirement derived from the forecast, and planned for a material for a particular time period in a particular supply planning area. Independent Requirements may be defined as follows: Independent requirements can be requirements for a particular Material in a particular SupplyPlanningArea that are unrelated to other requirements. For example, demand for finished goods or service parts can be represented by independent requirements. An example of an independent requirement is the SupplyPlanningRequirement created for the CustomerRequirement.

Dependent Requirements may be defined as follows: in contrast, dependent requirements for a particular Material in a particular SupplyPlanningArea are directly related to or derived from a source of supply (manufacturing or procurement). An example of a dependent requirement is the component requirement of the ProductionPlanningOrder. For a given Material and SupplyPlanningArea, there may be both independent and dependent requirements. For instance, a material may simultaneously be a component in an assembly and also be sold as a service part.

Planned Requirements may be defined as follows: Planned requirements are requirements for a particular Material in a particular SupplyPlanningArea that are created as a prediction of expected actual requirements. For example, DemandPlanning provides a forecast that is used to create PlannedIndependentRequirements, whereas material requirements planning creates planned component requirements that predict the actual production requirements.

Actual Requirements may be defined as follows: In contrast, actual requirements for a particular material in a particular SupplyPlanningArea are composed of SupplyPlanningRequirements created for the CustomerRequirement, or execution-relevant, requested component requirements of the ProductionPlanningOrder.

Open Requirements may be defined as follows: The PlannedIndependentRequirement is a planned and independent requirement and acts as a placeholder for other actual independent and actual or planned dependent requirements (henceforth referred to as open requirements) before these are actually created. This enables the planner to plan in advance. The business object PlannedIndependentRequirement is part of the process component Supply and Demand Matching in the LDU Supply Chain Control (SCC). The structure of a PlannedIndependentRequirement can contain a time series with the planned material requirements. A PlannedIndependentRequirement can be represented by the root node PlannedIndependentRequirement 295010. The business object PlannedIndependentRequirement does not send or receive any messages nor have a services interface operation.

PlannedIndependentRequirement is an independent requirement derived from the forecast, and planned for a material for a particular time period in a particular supply planning area. It can contain a time series with the planned material requirements (items), and also identifying and administrative information. The elements located directly at the node PlannedIndependentRequirement are defined by the data type PlannedIndependentRequirementElements. In certain implementations, these elements may include: UUID, MaterialUUID, MaterialSupplyAndDemandTypeCode, SupplyPlanningAreaUUID, SystemAdministrativeData, PlannedIndependentRequirementKey. A UUID is a universal identifier, which may be unique, of the planned independent requirement. UUID may be based on GDT UUID. A MaterialUUID is a universal identifier, which may be unique, of the material for which the planning was executed. MaterialUUID may be based on GDT UUID. A MaterialSupplyAndDemandTypeCode is the coded representation for the demand type of the PlannedIndependentRequirement. MaterialSupplyAndDemandTypeCode may be based on GDT MaterialSupplyAndDemandTypeCode. A SupplyPlanningAreaUUID is a universal identifier, which may be unique, of the planning area for which the planning was executed. SupplyPlanningAreaUUID may be based on GDT UUID.

SystemAdministrativeData is the administrative data stored in the system that describes when the version was created or changed, and by whom and is optional. SystemAdministrativeData may be based on GDT SystemAdministrativeData PlannedIndependentRequirementKey is an alternative key for the PlannedIndependentRequirement. Elements of the alternative key may include: MaterialUUID, SupplyPlanningAreaUUID. The following composition relationships to subordinate nodes exist: Item 295012 has a cardinality of 1:cn, ClosedRequirementQuantity 295016 has a cardinality of 1:cn. There may be a number of Inbound Aggregation Relationships including: From the business object Material, Material has a cardinality of 1:cn. The material whose independent requirement is being planned. From the business object SupplyPlanningArea, SupplyPlanningArea has a cardinality of 1:cn. The planning area in which the independent requirement for the material is being planned.

In some implementations, the Enterprise Service Infrastructure Action MaintainClosedRequirementQuantity can maintain the PlannedIndependentRequirement ClosedRequirementQuantity node by updating it with a specific quantity for a specific date and for a particular Material in a particular SupplyPlanningArea. The ClosedRequirementQuantity node represents the quantity of goods in open requirements that continue to be relevant for consumption after the open requirements have been closed. The ClosedRequirementQuantity can be required in order to dynamically reduce the OpenQuantity of the ItemCurrentQuantity node to account for closed requirements. The settings in the DemandForecastRequirementProfileCode for a particular Material in a particular SupplyPlanningArea control which open requirements may be accepted for the update of the ClosedRequirementQuantity node. Changes effected in the object may include the PlannedIndependentRequirement node ClosedRequirementQuantity is created or updated. The Data type structure PlannedIndependentRequirementMaintainClosedRequirementQuantityActionElements defines the action parameters and includes ClosedRequirementDateTime, ClosedRequirementQuantity, ClosedRequirementQuantityTypeCode, and ClosedRequirementMaterialSupplyAndDemandType. A ClosedRequirementDateTime can be the date on which goods are requested and is a GDT of type LOCALNORMALISED_DateTime, Qualifier: Requirement. A ClosedRequirementQuantity can be a quantity for which goods are requested and is a GDT of type LARGE_Quantity, Qualifier: Requirement. A ClosedRequirementQuantityTypeCode can specify the type of ClosedRequirementQuantity and is a GDT of type QuantityTypeCode, Qualifier: Requirement. A ClosedRequirementMaterialSupplyAndDemandType can be a coded representation for the type of requirement and is a GDT of type MaterialSupplyAndDemandTypeCode. In some applications, the action MaintainClosedRequirementQuantity can be called when an item of the CustomerRequirement may be completely fulfilled and from the ProductionRequisition when it was closed and is deleted.

A QueryByMaterialAndSupplyPlanningArea can provide a list of PlannedIndependentRequirements that have been created for a material and/or a SupplyPlanningArea. The GDT: PlannedIndependentRequirementMaterialAndSupplyPlanningAreaQueryElements defines the query elements and includes MaterialUUID, Material_ID, SupplyPlanningAreaUUID, and SupplyPlanningArea_ID. A MaterialUUID is optional and can be a universally unique identifier of the material for which the PlannedIndependentRequirements is to be read. It is a GDT of type UUID Qualifier: Material. A Material_ID is optional and can be an identifier of the material for which the PlannedIndependentRequirements is to be read and is a GDT of type ProductID. A SupplyPlanningAreaUUID is optional and can be a universally unique identifier of the requirements planning area for which the PlannedIndependentRequirements is to be read and is a GDT of type UUID Qualifier: SupplyPlanningArea. A SupplyPlanningArea_ID is optional and is an identifier of the requirements planning area for which the PlannedIndependentRequirements is to be read and is a GDT of type SupplyPlanningAreaID.

An item is the planned independent requirement for a material within a particular time period. The values of the following elements are transferred from the business object DemandForecast: PlannedPeriod, PlannedQuantity, RequirementDateTime. The elements located at the node PlannedIndependentRequirementItem are defined by the data type PlannedIndependentRequirementItemElements. In certain implementations, these elements may include: UUID, PlannedPeriod, PlannedQuantity, PlannedQuantityTypeCode, RequirementDateTime. UUID is a universal identifier, which may be unique, of the planned independent requirement item. UUID may be based on GDT UUID. PlannedPeriod is the planning period in which the requirements are used for consumption. PlannedPeriod may be based on GDT PPEROPEN_LOCALNORMALISED_DateTimePeriod, Qualifier: Planned. PlannedQuantity is the planned quantity of the material requirement. PlannedQuantity may be based on DT LARGE_Quantity, Qualifier: Planned. PlannedQuantityTypeCode specifies the type of PlannedQuantity. PlannedQuantityTypeCode may be based on GDT QuantityTypeCode, Qualifier: Planned. RequirementDateTime is the date on which the planned requirement is to be covered. RequirementDateTime may be based on GDT LOCALNORMALISED_DateTime, Qualifier: Requirement.

All quantities have the same unit of measure. The base unit of measure of the material (from the root node) is used as the unit of measure. The following composition relationships to subordinate nodes may exist: ItemCurrentQuantity 295014 has a cardinality of 1:c. There may be a number of Association for Navigation including: To the business object PlannedMaterialFlow, PlannedMaterialFlow has a cardinality of has a cardinality of c:cn. Specifies the material flows that flow into the PlannedIndependentRequirement.

To the transformed object OrderFulfillmentPlanningView, MultiLevelOrderFulfillmentPlanningView has a cardinality of 1:c. Multilevel planning view of the order fulfillment of the PIR item, SingleLevelOrderFulfillmentPlanningView has a cardinality of 1:c. Single-level planning view of the order fulfillment of the PIR item.

In some implementations, a QueryByPlannedPeriod may provide a list all PlannedIndependentRequirementsItems that meet the selection criteria specified by the query elements. The GDT: PlannedIndependentRequirementItemPlannedPeriodQueryElements defines the query elements and includes PlannedIndependentRequirementMaterialUUID, Material_ID, PlannedIndependentRequirementSupplyPlanningAreaUUID, SupplyPlanningArea_ID, StartDateTime, EndDateTime, and RequirementDateTime. A PlannedIndependentRequirementMaterialUUID is optional and can be a universally unique identifier of the material for which the planned independent requirement items are to be read and is a GDT of type UUID Qualifier: Material. A Material_ID is optional and can be an identifier of the material for which the planned independent requirement items are to be read. It is a GDT of type ProductID. A PlannedIndependentRequirementSupplyPlanningAreaUUID is optional and is a universally unique identifier of the requirements planning area for which the planned independent requirement items are to be read and is a GDT of type UUID Qualifier: SupplyPlanningArea. A SupplyPlanningArea_ID is optional and can be an identifier of the requirement planning area for which the planned independent requirement items are to be read and is a GDT of type SupplyPlanningAreaID. A StartDateTime is optional and can be the start date PlanningPeriod in which the requirements are used for consumption and is a GDT of type LOCALNORMALISED_DateTime, Qualifier: Start. A EndDateTime is optional and can be the end date PlanningPeriod in which the requirements are used for consumption. It is a GDT of type LOCALNORMALISED_DateTime, Qualifier: End. A RequirementDateTime is optional and can be the date on which the planned independent requirement items are to be covered and is a GDT of type LOCALNORMALISED_DateTime, Qualifier: Requirement.

An ItemCurrentQuantity is the current quantity of: the open and closed requirements taking part in the PlannedIndependentRequirement consumption, the result created by planned independent requirement consumption. Consumption can be the automatic process of dynamically replacing the PlannedIndependentRequirement items by open and closed requirement quantities. The settings in the DemandForecastRequirementProfileCode for a particular Material in a particular SupplyPlanningArea control which open and closed requirement quantities can be relevant for the consumption. The elements located at the node PlannedIndependentRequirementItemCurrentQuantity are defined by the data type PlannedIndependentRequirementItemCurrentQuantityElements. In certain implementations, these elements may include: OpenQuantity, OpenQuantityTypeCode, AssignedRequirementCumulatedQuantity, AssignedRequirementCumulatedQuantityTypeCode, ActualIndependentRequirementCumulatedQuantity, ActualIndependentRequirementCumulatedQuantityTypeCode, DependentRequirementCumulatedQuantity, DependentRequirementCumulatedQuantityTypeCode, RequirementCumulatedQuantity, RequirementCumulatedQuantityTypeCode, SurplusRequirementCumulatedQuantity, SurplusRequirementCumulatedQuantityTypeCode. OpenQuantity can be the open quantity of the PlannedIndependentRequirement item that can be relevant to material requirements planning. The open quantity can be the result of reducing the PlannedQuantity (e.g., node Item) by open and closed requirement quantities during consumption. Open Quantity may be based on GDT LARGE_Quantity, Qualifier: Open. OpenQuantityTypeCode specifies the type of OpenQuantity. OpenQuantityTypeCode may be based on GDT QuantityTypeCode, Qualifier: Open. AssignedRequirementCumulatedQuantity can be the open and closed requirement quantities that reduce the PlannedQuantity in a PlannedPeriod (node Item). The open and closed requirement quantities can be assigned to the Item during consumption and are cumulated for the PlannedPeriod. AssignedRequirementCumulatedQuantity may be based on GDT LARGE_Quantity, Qualifier: Cumulated. The settings in the DemandForecastRequirementProfileCode for a particular Material in a particular SupplyPlanningArea can control how the open and closed requirement quantities are assigned to the PlannedIndependentRequirement Item. AssignedRequirementCumulatedQuantityTypeCode specifies the type of AssignedRequirementCumulatedQuantity. AssignedRequirementCumulatedQuantityTypeCode may be based on GDT QuantityTypeCode, Qualifier: Cumulated. ActualIndependentRequirementCumulatedQuantity can be the cumulated quantity of open and closed actual independent requirements. ActualIndependentRequirementCumulatedQuantity may be based on GDT LARGE_Quantity, Qualifier: Cumulated. ActualIndependentRequirementCumulatedQuantity TypeCode specifies the type of ActualIndependentRequirementCumulatedQuantity. ActualIndependentRequirementCumulatedQuantity TypeCode may be based on GDT QuantityTypeCode, Qualifier: Cumulated. DependentRequirementCumulatedQuantity can be the cumulated quantity of open and closed dependent requirements. DependentRequirementCumulatedQuantity may be based on GDT LARGE_Quantity, Qualifier: Cumulated. DependentRequirementCumulatedQuantityTypeCode specifies the type of DependentRequirementCumulatedQuantity. DependentRequirementCumulatedQuantityTypeCode may be based on GDT QuantityTypeCode, Qualifier: Cumulated. RequirementCumulatedQuantity can be the sum of ActualIndependentRequirementCumulatedQuantity and DependentRequirementCumulatedQuantity. RequirementCumulatedQuantity may be based on GDT LARGE_Quantity, Qualifier: Cumulated. RequirementCumulatedQuantityTypeCode specifies the type of RequirementCumulatedQuantityTypeCode. RequirementCumulatedQuantityTypeCode may be based on GDT QuantityTypeCode, Qualifier: Cumulated. SurplusRequirementCumulatedQuantity can be the surplus open and closed requirement quantities cumulated for a PlannedPeriod (node Item) that could not be assigned to Items during consumption. SurplusRequirementCumulatedQuantity may be based on GDT LARGE_Quantity, Qualifier: Cumulated. SurplusRequirementCumulatedQuantityTypeCode specifies the type of SurplusRequirementCumulatedQuantity. SurplusRequirementCumulatedQuantityTypeCode may be based on GDT QuantityTypeCode, Qualifier: Cumulated. Quantities may have the same unit of measure. The planning unit of measure of the MaterialSupplyPlanningProcessControl (InventoryInfo node) may be used as the unit of measure.

A ClosedRequirementQuantity is the quantity of closed requirements that continues to be relevant for consumption after the corresponding open requirements have been closed. The quantity can be in a specific time period for a particular Material in a particular SupplyPlanningArea. The ClosedRequirementQuantity can be transferred from the CustomerRequirement (actual independent requirement) when the item of the CustomerRequirement is completely fulfilled and from the ProductionRequisition (dependent requirement) when it was closed and is deleted. The ClosedRequirementQuantity can be required in order to dynamically reduce the OpenQuantity of the ItemCurrentQuantity node to account for closed requirements. The ClosedRequirementQuantity can be maintained with ESI Action MaintainClosedRequirementQuantity of the node PlannedIndependentRequirement. The time period for the closed requirement quantity can be divided into periods of days. The elements located at the PlannedIndependentRequirementClosedRequirementQuantity node are defined by the data type PlannedIndependentRequirementClosedRequirementQuantityElements. In certain implementations, these elements may include: ClosedRequirementRequestPeriod, ClosedActualIndependentRequirementCumulatedQuantity, ClosedActualIndependentRequirementCumulatedQuantityTypeCode, ClosedDependentRequirementCumulatedQuantity, ClosedDependentRequirementCumulatedQuantityTypeCode. ClosedRequirementRequestPeriod is a daily period for the ClosedRequirementCumulatedQuantity and is read-only. ClosedRequirementRequestPeriod may be based on GDT UPPEROPEN_LOCALNORMALISED_DateTimePeriod, Qualifier: Request. ClosedActualIndependentRequirementCumulatedQuantity are the quantities of closed actual independent requirements for the daily ClosedRequirementRequestPeriod and are read-only. ClosedActualIndependentRequirementCumulatedQuantity may be based on GDT LARGE_Quantity, Qualifier: Cumulated. ClosedActualIndependentRequirementCumulatedQuantityTypeCode specifies the type of ClosedActualIndependentRequirementCumulatedQuantity and may be read-only. ClosedActualIndependentRequirementCumulatedQuantityTypeCode may be based on GDT QuantityTypeCode, Qualifier: Cumulated. ClosedDependentRequirementCumulatedQuantity are the quantities of closed dependent requirements for the daily ClosedRequirementRequestPeriod and are read-only. ClosedDependentRequirementCumulatedQuantity may be based on GDT LARGE_Quantity, Qualifier: Cumulated. ClosedDependentRequirementCumulatedQuantityTypeCode specifies the type of ClosedDependentRequirementCumulatedQuantity and may be read-only. ClosedDependentRequirementCumulatedQuantityTypeCode may be based on GDT QuantityTypeCode, Qualifier: Cumulated. All quantities have the same unit of measure. The planning unit of measure of the MaterialSupplyPlanningProcessControl (node InventoryInfo) can be used as the unit of measure.

PlanningViewOfPurchaseOrder Business Object Model

FIG. 296-1 through 296-6 illustrates an example PlanningViewOfPurchaseOrder business object model 296024. Specifically, this model depicts interactions among various hierarchical components of the PlanningViewOfPurchaseOrder, as well as external components that interact with the PlanningViewOfPurchaseOrder (shown here as 296000 through 296022 and 296026 through 296074).

PlanningViewOfPurchaseOrder

PlanningViewOfPurchaseOrder is a planning view of the materials, date, quantities, delivery conditions, parties, and sources of supply of a purchase order that are relevant to planning. A PlanningViewOfPurchaseOrder is intended to be a 'handover' BO between Purchasing, Planning and Logistics Execution without any user interface for maintenance. The business object PlanningViewOfPurchaseOrder is part of the process component ExternalProcurementTriggerAndResponse of the DU SupplyChainControl.

A PlanningViewOfPurchaseOrder contains: information about the materials, dates, quantities, delivery terms, locations, sources of supply and the parties involved, information about quantities forwarded from BO LER to BO SLR, information about delivered quantities. PlanningViewOfPurchaseOrder can be represented by the root node PlanningViewOfPurchaseOrder. The business object PlanningViewOfPurchaseOrder is involved in the following process integration models: Purchase Order Processing_External Procurement Trigger and Response, External Procurement Trigger and Response_Purchase Order Processing. The Service Interface "Ordering Notification In" (e.g., ExternalProcurementTriggerAndResponseOrderingNotificationIn) groups operations that receive information from purchasing. The service interface "Ordering Notification In" is part of the following process integration models: External Procurement Trigger and Response_Purchase Order Processing.

The ExternalProcurementTriggerAndResponseOrderingNotificationIn.MaintainPlanningViewOfPurchaseOrder (e.g., MaintainPlanningViewOfPurchaseOrder (A2A)) is an operation that transfers new purchase orders or changes made to a purchase order in purchasing to the PlanningViewOfPurchaseOrder. The operation can be based on the message type PurchaseOrderNotification. This message type can be derived from the business object PurchaseOrder. This operation can be triggered by the receipt of a PurchaseOrderNotification message. This message can be used to inform planning that a purchase order has been created or changed. This change can then transfer to PlannedExternalProcurementOrder and LogisticsExecutionRequisition. The service interface "Fulfilment Out" (i.e., ExternalProcurementTriggerAndResponseFulfilmentOut) groups operations that transfer purchasing-relevant information regarding PurchaseOrders to purchasing.

The NotifyOfPurchaseOrderDeliveryValues (A2A) (i.e., ExternalProcurementTriggerAndResponseDeliveryValuesOut.NotifyOfPurchaseOrderDeliveryValuesFromPlanningViewOfProcessing), is an operation that transfers the quantity actually delivered and the delivery status for a PlanningViewOfPurchaseOrderItem to purchasing so that the PurchaseOrder can be updated. The operation can be based on the message type PurchaseOrderDeliveryValuesNotification. This message type can be derived from the business object PurchaseOrder. This operation can be used to transfer the quantity actually delivered and the delivery status for a PlanningViewOfPurchaseOrderItem to purchasing.

PlanningViewOfPurchaseOrder (Root Node)

PlanningViewOfPurchaseOrder 296076 is the view of a purchase order. It can contain administrative and descriptive attributes. The elements located directly at the root node PlanningViewOfPurchaseOrder are defined by the data type PlanningViewOfPurchaseOrderElements. In certain implementations, these elements may include: UUID, ID, SystemAdministrativeData.

UUID is a universal identifier, which may be unique, for a PlanningViewOfPurchaseOrder document that can be used as a foreign key in other business objects. UUID may be based on GDT UUID. ID is an identifier, which may be unique, of a PlanningViewOfPurchaseOrder document. ID may be based on GDT BusinessTransactionDocumentID. SystemAdministrativeData is the administrative data that is stored in the system. This data includes system users and change times. Changes of any node updates system administrative data of the root node. SystemAdministrativeData may be based on GDT SystemAdministrativeData.

The following composition relationships to subordinate nodes are available. Item has a cardinality 296078 relationship of 1:n. Party 296082 has a cardinality relationship of 1:cn.

There may be a number of inbound aggregation relationships. From the BusinessDocumentFlow business object (or node) to the PlanningViewOfPurchaseOrder business object (or node) there may be a cardinality relationship of c:c. BusinessDocumentFlow The complete document flow for one anchor object can be displayed.

There may be a number of inbound aggregation relationships. From the business object Identity/node Root business object (or node) to the CreationIdentity business object (or node) there may be a cardinality relationship of 1:cn. CreationIdentity identifies the Identity that created the PlanningViewOfPurchaseOrder There may be a number of inbound aggregation relationships. From the business object Identity/node Root to the LastChangedIdentity business object (or node) there may be a cardinality relationship of c:cn. LastChangedIdentity identifies the Identity that changed the PlanningViewOfPurchaseOrder The QueryByElements query provides a list of PlanningViewOfPurchaseOrders in which the PlanningViewOfPurchaseOrderID, the PlanningViewOfPurchaseOrderItemProductProductID and the PlanningViewOfPurchaseOrderItemBusinessTransactionDocumentReference correspond to the query elements.

If no parameter is specified, all PlanningViewOfPurchaseOrderItems are returned. PlanningViewOfPurchaseOrderElementsQueryElements defines the query elements: ID, ItemProductID and ItemBusinessTransactionDocumentReference. ID is the Unique identifier of a PlanningViewOfPurchaseOrder document, is of type GDT: BusinessTransactionDocumentID, and may be optional. ItemProductID is the unique identifier of a product, is of type GDT: ProductID, and may be optional. ItemBusinessTransactionDocumentReference is a unique reference to an item of another business document that is connected to the Item, is of type GDT: BusinessTransactionDocumentReference, and may be optional.

Party

Party is the party that is involved with all the related items. A party can be: a BusinessPartner in the specialization Supplier or Employee, an OrganisationalCenter in the specialization Company. A Party may exist in the following complete and disjoint specializations: BuyerParty can be the party for which the PlanningViewOfPurchaseOrder is created. The business object Company can occur as the BuyerParty. SellerParty is the party that sells a product. The business object Supplier occurs as the SellerParty, ResponsiblePurchaserParty is the party that initiates the ordering process. The business object Employee occurs as the ResponsiblePurchaserParty.

A party can occur in the various different specializations. Each of the specializations may occur only once. The specialization is complete and disjoint. The elements located directly at the node Party are defined by the data type PlanningViewOfPurchaseOrderPartyElements. PlanningViewOfPurchaseOrderPartyElements is derived from the GDT BusinessTransactionDocumentPartyElements. In certain implementations, this may include: UUID, PartyKey, PartyUUID, PartyTypeCode, RoleCategoryCode, RoleCode, AddressReference, DeterminationMethodCode, MainIndicator, ActiveIndicator, Name.

UUID is a global identifier, which may be unique, for a PlanningViewOfPurchaseOrderParty UUID may be based on GDT UUID. PartyKey is the party key of the PlanningViewOfPurchaseOrderParty in a PlanningViewOfPurchaseOrder document and is optional. PartyKey may be based on GDT: PartyKey. PartyUUID is an identifier, which may be unique, for a business partner, the organizational unit, or their specializations. PartyUUID may be based on GDT UUID. PartyTypeCode is the party type of the PlanningViewOfPurchaseOrderParty in a PlanningViewOfPurchaseOrder document and is optional. PartyTypeCode may be based on GDT BusinessObjectTypeCode. RoleCategoryCode is the party role category of the Party in the business document or the master data object and is optional. RoleCategoryCode may be based on GDT PartyRoleCategoryCode. RoleCode is the party role of the Party in the business document or the master data object and is optional. RoleCode may be based on GDT PartyRoleCode.

AddressReference is the address reference of the PlanningViewOfPurchaseOrderParty in a PlanningViewOfPurchaseOrder document and is optional. AddressReference may be based on GDT PartyAddressReference. DeterminationMethodCode is the determination method of the PlanningViewOfPurchaseOrderParty in a PlanningViewOfPurchaseOrder document and is optional. DeterminationMethodCode may be based on GDT PartyDeterminationMethod. MainIndicator indicates whether or not a party is emphasized in a group of parties with the same PartyRole and is optional. MainIndicator may be based on GDT PartyMainIndicator. ActiveIndicator indicates whether or not an ItemParty is active from a business point of view and may be used in a process and is optional. If the indicator is false, the ItemParty may no longer be active even if it is still part of a PlanningViewOfPurchaseOrder document. ActiveIndicator may be based on GDT ActiveIndicator. Name is the description of the PlanningViewOfPurchaseOrderParty in a PlanningViewOfPurchaseOrder document. Name may be based on GDT Long_Name.

The following associations exist: From the transformed object: Party there may be a cardinality relationship of c:cn.

A Party may reference using the inbound aggregation relationship from TO Party a business partner or one of its specializations (for example, supplier, employee) one of the following specializations of an organizational center: Company or FunctionalUnit. A Party may exist without reference to a business partner or an organizational unit. This would be a Casual Party, which is a party without reference to master data in the system. The external identifier and the description are contained in the business document.

Item

Item specifies a material that is to be procured and contains information about the parties, sources of supply, locations, delivery terms, dates, business transaction document references and quantities that are involved. The elements located directly at the node PlanningViewOfPurchaseOrderItem are defined by the data type PlanningViewOfPurchaseOrderItemElements. In certain implementations, these elements may include: UUID, ID, TypeCode, SupplyPlanningAreaUUID, SourceOfSupplyReference, DeliveryCompletedIndicator, TotalDeliveredQuantity, TotalDeliveredQuantityTypeCode, LogisticsExecutionForwardedQuantity, LogisticsExecutionForwardedQuantityTypeCode, FollowUpDispatchedDeliveryNotificationRequirementCode, FollowUpInvoiceRequestRequirementCode, SystemAdministrativeData.

UUID is a universal identifier, which may be unique, of a PlanningViewOfPurchaseOrderItem that can be used as a foreign key in other business objects. UUID may be based on GDT UUID. ID is an identifier, which may be unique, of an item in a PlanningViewOfPurchaseOrder. This ID is assigned by the system when the item is created. ID may be based on GDT BusinessTransactionDocumentItemID. TypeCode is the BusinessTransactionItemTypeCode is a coded representation of an item in a document that occurs in business transactions. TypeCode may be based on GDT BusinessTransactionDocumentItemTypeCode.

SupplyPlanningAreaUUID is a universal identifier, which may be unique, of the planning area for which the item is created and is optional. SupplyPlanningAreaUUID may be based on GDT UUID. SourceOfSupplyReference is an identifier, which may be unique, of an external source of supply that is used to procure the material of the item and is optional. SourceOfSupplyReference may be based on GDT SourceOfSupplyReference. DeliveryCompletedIndicator specifies whether the delivery of the item has been completed or not and is optional. DeliveryCompletedIndicator may be based on GDT Indicator.

TotalDeliveredQuantity is the actual quantity delivered for the PlanningViewOfPurchaseOrderItem and is optional. TotalDeliveredQuantity may be based on GDT Quantity. TotalDeliveredQuantityTypeCode is the quantity type code of field TotalDeliveredQuantity and is optional. TotalDeliveredQuantityTypeCode may be based on GDT QuantityTypeCode. LogisticsExecutionForwardedQuantity is the actual quantity forwarded from LogisticsExecutionRequisition to SiteLogisticsRequisition for the PlanningViewOfPurchaseOrderItem and is optional. LogisticsExecutionForwardedQuantity may be based on GDT Quantity. LogisticsExecutionForwardedQuantityTypeCode is a quantity type code of field LogisticsExecutionForwardedQuantity and is optional. LogisticsExecutionForwardedQuantityTypeCode may be based on GDT QuantityTypeCode.

FollowUpDispatchedDeliveryNotificationRequirementCode is a coded representation of the requirement for a follow-up message DeliveryNotification. It may specify whether or not a buyer wants to receive confirmations from the supplier or vendor about the delivery quantity. It can be used as follows:

02 (e.g., Expected: The follow-up message is expected in the further process, but is not a mandatory requirement), 04 (e.g., Unexpected: The follow-up message is not expected, but can be received and processed). FollowUpDispatchedDeliveryNotificationRequirementCode may be based on GDT FollowUpMessageRequirementCode.

FollowUpInvoiceRequestRequirementCode is a coded representation of the requirement for a follow-up message from InvoiceRequest. It may specify how invoicing is to be handled, that is, if a buyer receives an invoice from the seller. It can be used as follows: 01 (e.g., Required: The follow-up message is a mandatory requirement for the further process), 05 (e.g., Forbidden: The follow-up message is forbidden. It cannot be received or processed. FollowUpInvoiceRequestRequirementCode may be based on GDT FollowUpMessageRequirementCode. SystemAdministrativeData is the administrative data that is stored in the system. This data includes system users and change times. SystemAdministrativeData may be based on GDT SystemAdministrativeData.

Composition Relationships

PurchaseRequisitionItem contains the following nodes: ItemParty, ItemLocation, ItemProduct, ItemDeliveryTerms, ItemBusinessTransactionDocumentReference and ItemScheduleLine.

ItemParty 296084 has a cardinality relationship of 1:cn. ItemLocation 296090 has a cardinality relationship of 1:cn. ItemProduct 296086 has a cardinality relationship of 1:c. ItemDeliveryTerms 296094 has a cardinality relationship of 1:c. ItemBusinessTransactionDocumentReference 296098 has a cardinality relationship of 1:n. ItemScheduleLine 296080 has a cardinality relationship of 1:n.

There may be a number of inbound aggregation relationships. From the SupplyPlanningArea business object (or node) to the business object Identity/node Root there may be a cardinality relationship of c:cn. SupplyPlanningArea is the planning area where planning is carried out.

From the SourceOfSupply business object (or node) to the business object Identity/node Root there may be a cardinality relationship of c:cn. SourceOfSupply is the source of supply used to procure the material.

From the business object Identity/node Root business object (or node) to the CreationIdentity business object (or node) there may be a cardinality relationship of 1:cn. CreationIdentity identifies the Identity that created the PlanningViewOfPurchaseOrder.

From the business object Identity/node Root business object (or node) to the LastChangedIdentity business object (or node) there may be a cardinality relationship of c:cn. LastChangedIdentity identifies the Identity that changed the PlanningViewOfPurchaseOrder.

ItemProduct

An ItemProduct is the identification, description and classification of the product in the PlanningViewOfPurchaseOrderItem. ItemProduct is of type GDT: PlanningViewOfPurchaseOrderItemProductElements. In certain implementations it may include the following elements: ProductUUID, ProductID, ProductTypeCode, ProductStandardID, ProductBuyerID, ProductSellerID, ProductProductRecipientID, ProductVendorID, IdentifiedStockUUID, IdentifiedStockID.

ProductUUID is a universal identifier, which may be unique, of the product in the delivery request and is optional. ProductUUID may be based on GDT UUID. ProductID is an identifier, which may be unqiue, of a product. ProductID may be based on GDT ProductID. ProductTypeCode is the coded representation of the product type. A product type can describe the nature of products and determines the basic characteristics for products of this type. ProductTypeCode may be based on GDT ProductTypeCode. The following code can be used: 1 (e.g., Material). ProductStandardID is an identifier, which may be unique, of a product whereby the identification sheet used is managed by an agency from code list DE 3055 and is optional. ProductStandardID may be based on GDT ProductStandardID.

ProductBuyerID is an identifier, which may be unique, of the product assigned by the purchaser and is optional. ProductBuyerID may be based on GDT ProductPartyID. ProductSellerID is an identifier which may be unique, of the product assigned by the seller and is optional. ProductSellerID may be based on GDT ProductPartyID. ProductProductRecipientID is an identifier, which may be unique, of the product assigned by the goods recipient and is optional. ProductProductRecipientID may be based on GDT ProductPartyID.

ProductVendorID is an identifier, which may be unique, of the product assigned by the vendor and is optional. ProductVendorID may be based GDT ProductPartyID. IdentifiedStockUUID is a universal identifier, which may be unique, of the IdentifiedStock in the confirmed or completed delivery and is optional. IdentifiedStockUUID may be based on GDT UUID. IdentifiedStockID is an identifier, which may be unique, of the IdentifiedStock in the Logistics Execution Requisition and is optional. IdentifiedStockID may be based on GDT IdentifiedStockID.

There may be a number of inbound aggregation relationships. From the IdentifiedStock business object (or node) there may be a cardinality relationship of c:cn to ItemConsumedQuantity 296096. IdentifiedStock is the IdentifiedStock of the Material to be procured.

There may be a number of inbound aggregation relationships. From the Material business object (or node) there may be a cardinality relationship of c:cn. Material is the Material to be procured.

ItemParty

ItemParty 296084 is a party that is involved with the related item. A party can be: a BusinessPartner in the specializations Supplier or Employee. The elements located directly at the node ItemParty are defined by the data type: PlanningViewOfPurchaseOrderItemPartyElements. PlanningViewOfPurchaseOrderItemPartyElements is derived from the data type BusinessTransactionDocumentPartyElements. In certain implementations this may include: UUID, PartyKey, PartyUUID, PartyTypeCode, RoleCategoryCode, RoleCode, AddressReference, DeterminationMethodCode, MainIndicator, ActiveIndicator, Name.

UUID is a global identifier, which may be unique, for a PlanningViewOfPurchaseOrderItemParty. UUID may be based on GDT UUID. PartyKey is the party key of the PlanningViewOfPurchaseOrderItemParty in a PlanningViewOfPurchaseOrder document and is optional. PartyKey may be based on GDT PartyKey. PartyUUID is an identifier, which may be unique, for a business partner, the organizational unit, or their specializations. PartyUUID may be based on GDT UUID. PartyTypeCode is the party type of the Planning- ViewOfPurchaseOrderItemParty in a PlanningViewOfPurchaseOrder document and is optional. PartyTypeCode may be based on GDT BusinessObjectTypeCode. RoleCategoryCode is a party role category of the Party in the business document or the master data object and is optional. RoleCategoryCode may be based on GDT PartyRoleCategoryCode. RoleCode is the party role of the Party in the business document or the master data object. RoleCode may be based on GDT PartyRoleCode.

AddressReference is an address reference of the PlanningViewOfPurchaseOrderItemParty in a PlanningViewOfPurchaseOrder document and is optional. AddressReference may be based on GDT PartyAddressReference. DeterminationMethodCode is the determination method of the PlanningViewOfPurchaseOrderItemParty in a PlanningViewOfPurchaseOrder document and is optional. DeterminationMethodCode may be based on GDT PartyDeterminationMethod. MainIndicator indicates whether or not a party is emphasized in a group of parties with the same PartyRole and is optional. MainIndicator may be based on GDT PartyMainIndicator.

ActiveIndicator indicates whether or not an ItemParty is active from a business point of view and may be used in a process and is optional. If the indicator is false, the ItemParty is no longer active even if it is still part of a PlanningViewOfPurchaseOrder document. ActiveIndicator may be based on GDT ActiveIndicator. Name is the description of the PlanningViewOfPurchaseOrderItemParty in a PlanningViewOfPurchaseOrder document. Name may be based on GDT Long_Name. An ItemParty may exist in the following complete and disjoint specializations: ItemRequestor Party (e.g., ItemRequestor Party is the party that initiates the ordering process. The business object Employee can assume the role of the Requestor Party), ItemProductRecipientParty (e.g., ItemProductRecipientParty is the party to which the product is delivered. The business object FunctionalUnit can assume the role of the ProductRecipientParty). A party can occur in the various different specializations. Each of the specializations may occur only once. The specialization is complete and disjoint.

The following associations exist. From the transformed object: Party there is a cardinality relationship of c:cn.

An ItemParty may reference using the inbound aggregation relationship from TO Party a business partner or one of its specializations (for example, supplier, employee) one of the following specializations of an organizational center: Company and FunctionalUnit. An ItemParty may exist without reference to a business partner or an organizational unit. This would be a Casual Party, which is a party without reference to master data in the system. The external identifier and the description are contained in the business document.

Item Location

ItemLocation Represents the geographical location to which the material of the item is delivered. ItemLocation can occur in the following complete and non-disjoint specializations: ItemSite (e.g., ItemSite is the location for which this item of the PurchaseRequisition is created), ItemShipToLocation (e.g., ItemShipToLocation is the location to which the material is delivered). The elements located directly at the node ItemLocation are defined by the data type PlanningViewOfPurchaseOrderItemLocationElements. PlanningViewOfPurchaseOrderItemLocationElements is derived from the BusinessTransactionDocumentLocationElements. In certain implementations, this may include the following elements: UUID, LocationID, LocationUUID, AddressReference, AddressHostUUID, BusinessObjectTypeCode, AddressHostTypeCode, PartyKey, InstalledBaseID, InstallationPointID, RoleCategoryCode, RoleCode, DeterminationMethodCode, Name.

UUID is a global identifier, which may be unique, for a PlanningViewOfPurchaseOrderItemLocation. UUID may be based on GDT UUID. LocationID is a global identifier for a location and is optional. LocationID may be based on GDT LocationID. LocationUUID is a global identifier, which may be unique, for a location and is optional. LocationUUID may be based on GDT UUID. AddressReference is the information to reference the address of a party, an InstalledBase or an InstallationPoint and is optional. AddressReference may be based on IDT ObjectNodeLocationAddressReference. AddressHostUUID is a universal identifier, which may be unique, of the address of the business partner, the organizational unit or its specializations, the BO InstalledBase or the BO InstallationPoint. AddressHostUUID may be based on GDT UUID.

BusinessObjectTypeCode is the coded representation of the BusinessObjectTypes of the business object, in which the address referenced in Element LocationAddressUUID is integrated as a Dependent Object. BusinessObjectTypeCode may be based on GDT BusinessObjectTypeCode. AddressHostTypeCode is the coded representation of the address host type of the address referenced by AddressUUID or the address included via the LocationAddress composition. AddressHostTypeCode may be based on GDT AddressHostTypeCode. PartyKey is an alternative Identifier of a Party (e.g., represents a business partner or an organizational unit), that reference the address via AddressUUID. PartyKey may be based on GDT PartyKey. InstalledBaseID is an identifier of the BO InstalledBase, which references the address via AddressUUID. InstalledBaseID may be based on GDT InstalledBaseID.

InstallationPointID is an identifier of the BO InstallationPoint, which references the address via AddressUUID. InstallationPointID may be based on GDT InstallationPointID. RoleCategoryCode is the location role category of the PlanningViewOfPurchaseOrderItemLocation in the business document or the master data object and is optional. RoleCategoryCode may be based on GDT LocationRoleCategoryCode. RoleCode is the location role of the PlanningViewOfPurchaseOrderItemLocation in the business document or the master data object. RoleCode may be based on GDT LocationRoleCode. DeterminationMethodCode is the coded representation of the location determination method and is optional. DeterminationMethodCode may be based on GDT LocationDeterminationMethodCode. Name is the specific name of the PlanningViewOfPurchaseOrderItemLocation and is optional. The element is filled if a specific name of PlanningViewOfPurchaseOrderItemLocation exists, that is, if not just the name of the referenced master data object is used. Name may be based on GDT LONG_Name.

The following associations exist. From the business object: Location there is a cardinality relationship of c:cn. Location is a geographical location that occurs in the specialization ItemSite or ItemShipToLocation. The location is used to determine the delivery address. ItemSite is the location for which this item of the PurchaseRequisition is created. ItemShipToLocation is the location to which the material is delivered.

ItemDeliveryTerms are the terms and conditions that apply to the execution of the delivery of the material of the item that is to be procured. The elements located directly at the node ItemDeliveryTerms can be defined by the data type PlanningViewOfPurchaseOrderItemDeliveryTermsElements. It can be derived from the global data type BusinessTransaction- DocumentDeliveryTermsElements. Possible elements may include: Incoterms, QuantityTolerance.

Incoterms are typical contract formulations for delivery conditions that correspond to the rules defined by the International Chamber of Commerce (i.e., ICC) and is optional. Incoterms may be based on GDT Incoterms. QuantityTolerance is the tolerated difference between a requested and an actual quantity, as a percentage and is optional. QuantityTolerance may be based on GDT QuantityTolerance. The elements "Incoterms" and "QuantityTolerance" may be used for material items. If ItemDeliveryTerms is not filled, DeliveryTerms at the header level is used.

ItemBusinessTransactionDocumentReference is a reference, which can be unique to an item of another business document that is connected to the Item. The elements located directly at the node ItemBusinessTransactionDocumentReference are defined by the data type: PlanningViewOfPurchaseOrderItemBusinessTransactionDocumentReferenceElements. In certain implementations, elements may include: BusinessTransactionDocumentReference. BusinessTransactionDocumentReference is a universal set, which may be unique, of identifiers of a referenced business document. BusinessTransactionDocumentReference may be based on GDT BusinessTransactionDocumentReference.

Integrity

In some implementations, if a reference is made to the item of a business document, the following should contain a value:

UUID, ItemID and TypeCode, or ID, ItemID and TypeCode, or UUID and TypeCode, or ItemUUID, TypeCode and ItemTypeCode.

An ItemBusinessTransactionDocumentReference may exist in the following complete and disjoint specializations: ItemPurchasingContractReference (e.g., Reference to the item of the PurchasingContract that was used during creation of the Item), ItemProcurementPlanningOrderReference (e.g., Reference to the ProcurementPlanningOrderItem that represents this Item in planning), ItemPurchaseOrderReference (e.g., Reference to the purchase order item that represents this Item in the purchase order), ItemPurchaseRequisitionReference (e.g., Reference to the PurchaseRequisitionItem for which a purchase order item was created in the purchase order), ItemLogisticsExecutionRequisitionReference (e.g., Reference to the LogisticsExecutionRequisitionItem that represents this Item in the delivery).

There may be a number of inbound aggregation relationships. From the business object PurchaseRequisitionItem there may be a cardinality relationship of c:cn. PurchaseRequisitionItem is the association to the PurchaseRequisitionItem for which a purchase order item was created in the purchase order. From the business object PurchaseOrderItem there may be a cardinality relationship of c:c. PurchaseOrderItem is the association to the purchase order item that represents this Item in the purchase order. From the ProcurementPlanningOrderItem business object (or node) there may be a cardinality relationship of c:cn. ProcurementPlanningOrderItem is the association to the ProcurementPlanningOrderItem that represents this Item in planning. From the LogisticsExecutionRequisitionItem business object (or node) there may be a cardinality relationship of c:cn. LogisticsExecutionRequisitionItem is the association to the LogisticsExecutionRequisitionItem that represents this Item in the delivery An ItemBusinessTransactionDocumentReference may contain the following reference documents: PurchaseOrderItem and LogisticsExecutionRequisitionItem. ItemScheduleLine is a schedule line for an item of a PlanningViewOfPurchaseOrder that contains information about the ordered quantity, the delivery date and the material availability date of the corresponding item. The elements located directly at the ItemScheduleLine node are defined by the data type PlanningViewOfPurchaseOrderItemScheduleLineElements. In certain implementations, these elements may include: ID, OrderedQuantity, OrderedQuantityTypeCode, OpenQuantity, OpenQuantityTypeCode, DeliveryPeriod, AvailabilityPeriod. ID is an identifier, which may be unique, of the schedule line number of a PlanningViewOfPurchaseOrderItem. ID may be based on GDT BusinessTransactionDocumentItemScheduleLineID. OrderedQuantity is the quantity transmitted from the purchase order. In other words, the quantity that may be relevant for purchasing/the schedule line quantity that is to be procured. OrderedQuantity may be based on GDT: Quantity, Qualifier: Ordered. OrderedQuantityTypeCode is the quantity type code of field OrderedQuantity. OrderedQuantityTypeCode may be based on GDT QuantityTypeCode. OpenQuantity is the quantity that is not yet forwarded by LogisticsExecutionRequisition to SiteLogisticsRequisition and is optional. OpenQuantity may be based on GDT Quantity, Qualifier: Open. OpenQuantityTypeCode is the quantity type code of field OpenQuantity and is optional. OpenQuantityTypeCode may be based on GDT QuantityTypeCode. DeliveryPeriod is the delivery period of the schedule line, that is, the period within which the material is to be delivered. DeliveryPeriod may be based on GDT UPPEROPEN_LOCALNORMALISED_DateTimePeriod. Qualifier: DeliveryPeriod (see also GDT PeriodRoleCode). AvailabilityPeriod is the period in which the materials or goods are available (in the warehouse). AvailabilityPeriod may be based on GDT UPPEROPEN_LOCALNORMALISED_DateTimePeriod. Qualifier: AvailabilityPeriod (see also GDT PeriodRoleCode).

Business Object ProductionRequisition

FIG. 297 illustrates one example of a productionRequisition business object model 297000. Specifically, this model depicts interactions among various hierarchical components of the ProductionRequisition, as well as external components that interact with the ProductionRequisition (shown here as 297002 through 297008 and 297026 through 297050).

A requisition to Production Execution to produce a certain quantity of a specific material by a requested due date. The business object ProductionRequisition is part of the process component Production Trigger and Response.

In the process of requesting production, a ProductionPlanningOrder can be converted to a ProductionRequisition, which triggers the production process. The ProductionPlanningOrder can contain information relevant for planning processes, whereas the ProductionRequisition can contain information on the material to be produced in the production process. After the conversion, ProductionRequisition can trigger Production Execution to produce the specific material by requesting a ProductionRequest to be created in Production Execution.

ProductionRequisition can receive confirmation from ProductionRequest as response to request, and update confirmed information, which can include a confirmed quantity of a specific material, can be confirmed by Production Execution to be produced by a confirmed due date.

ProductionRequisition also receives and updates fulfillment information, which represents execution progress of production process in Production Execution.

A ProductionRequisition can be subdivided into a sequence of ProductionSegments which describes the complete production process of the requested material.

ProductionRequisition can be represented by the root node ProductionRequisition 297010.

Service Interfaces

The Business Object can be involved in the following Process Integration Models: Production Trigger and Response_Production. Service Interfaces for the Business Object ProductionRequisition can include the following: Service Interface ProducingIn, ChangeProductionRequisitionBasedOnProductionRequestConfirmation (A2A), ChangeProductionRequisitionOnProductionRequestConfirmationReconciliation (A2A), Service Interface ProducingOut, RequestProduction (A2A).

Service Interface Producing in (i.e., ProductionTriggerAndResponseProducingIn) is a part of the following Process Integration Models: Production Trigger and Response_Production. The Service Interface ProducingIn groups all operations that receive information from Production. The information can be a confirmation of the corresponding Production Request, or a notification of Production Request Progress.

ChangeProductionRequisitionBasedOnProduction RequestConfirmation (A2A) (i.e., ProductionTriggerAndResponseProducingIn.ChangeProductionRequisition BasedOnProductionRequestConfirmation) and ProductionTriggerAndResponse receive confirmation of the maintenance of a Production Request and its execution. The operation can be based on message type ProductionRequestConfirmation (derived from business object ProductionRequest)

ChangeProductionRequisitionOnProductionRequestConfirmationReconciliation (A2A) (i.e., ProductionTriggerAndResponseProducingIn.ChangeProductionRequisitionOnProductionRequestConfirmationReconciliation). ProductionTriggerAndResponse receives Reconciliation of a Production Request Confirmation. The Reconciliation can contain complete, absolute, and current confirmation information of a Production Request. The operation can be based on message type ProductionRequestConfirmationReconciliationNotification (e.g., derived from business object ProductionRequest).

Service Interface ProducingOut (i.e., ProductionTriggerAndResponseProducingOut) is a part of the following Process Integration Models: Production Trigger and Response_Production. The Service Interface ProducingOut groups all operations that send requests to Production.

RequestProduction (A2A) (i.e., ProductionTriggerAndResponseProducingOut.RequestProduction) or ProductionTriggerAndResponse sends a request to Production to produce a certain quantity of a specific material by a requested due date. The operation can be based on message type ProductionRequestRequest (e.g., derived from business object ProductionRequest).

Node Structure of Business Object ProductionRequisition (Root Node)

ProductionRequisition (Root Node) is a requisition to Production Execution to produce a certain quantity of a specific material by a requested due date. It can contain ProductionSegments that subdivide the entire production process into several sections. In addition it can contain identification and administrative information of the ProductionRequisition.

The elements located directly at the node ProductionRequisition (Root Node) are defined by the type GDT: ProductionRequisitionElements. In certain implementations, these elements may include the following: ID, UUID, ProductionPlanningOrderReference, ProductionPlanningOrderUUID, Status, LifeCycleStatusCode, SystemAdministrativeData.

ID is an identifier, which may be unique, of a ProductionRequisition. ID may be based on GDT BusinessTransactionDocumentID.

UUID is a universal identifier, which may be unique, of a ProductionRequisition. UUID may be based on GDT UUID.

ProductionPlanningOrderReference is a reference to the ProductionPlanningOrder from which the creation of the ProductionRequisition was triggered. ProductionPlanningOrderReference may be based on GDT BusinessTransactionDocumentReference. The ID of BusinessTransactionDocumentReference can be used as reference.

ProductionPlanningOrderUUID is a universal identifier, which may be unique, of a ProductionPlanningOrder. ProductionPlanningOrderUUID may be based on GDT UUID.

Status is the overall status information of the ProductionRequisition, represented by the data type ProductionRequisitionStatus, which can contain the following status code elements: LifeCycleStatusCode. LifeCycleStatusCode is the life cycle Status describes the production process within the life cycle of the Business Object ProductionRequisition. LifeCycleStatusCode may be based on GDT ProductionRequisitionLifeCycleStatusCode.

SystemAdministrativeData is the administrative data that is stored in the system. It can include system user, date and time of creation and last change of the ProductionRequisition. SystemAdministrativeData may be based on GDT SystemAdministrativeData.

The following composition relationships to subordinate nodes exist: ProductionSegment 297012 1:n and BusinessProcessVariantType 297024 1:n.

An Inbound Association Relationship exists from the business object ProductionPlanningOrder/node Root to ConvertedProductionPlanningOrder 1:c and denotes the ProductionPlanningOrder that is converted as ProductionRequisition.

A (Specialization) Association for Navigation exists from node BusinessProcessVariantType to MainBusinessProcessVariantType 1:1 and denotes the main BusinessProcessVariantType of ProductionRequisition.

The ID of the ProductionRequisition is the same as the ID of the ProductionPlanningOrderReference. It cannot be changed after the conversion of the ProductionPlanningOrder.

The SynchronizeWithProductionRequest (S&AM action) sets the life cycle status of ProductionRequisition, with the status information sent from Production Execution. The life cycle status of the Production Requisition may only be changed when it has not yet reached the value "closed". The life cycle status of the Business Object is changed. The new status value is derived from the life cycle status and the production order creation status of the Production Request. Action may only be called by inbound processing agent when receiving feedback from Production on Production Request Confirmation or Production Progress Notification. Action may not be called from UI.

The CheckAndDelete (S&AM action) checks whether the ProductionPlanningOrder corresponding to the given ProductionRequisition can be deleted and, if the check was successful, delete the ProductionRequisition and the corresponding ProductionPlanningOrder. A ProductionPlanningOrder may not be deleted if it occupies capacity within resource-time-buckets that do not lie entirely in the past. The life cycle status of the Production Requisition should have the value "closed". The ProductionRequisition is deleted. The ProductionPlanningOrder is deleted. Action is called when the action SynchronizeWithProductionRequest is called, and the status of the ProductionRequisition is marked as "Closed". Action is called by deletion report. Action may not be called from UI.

The Cancel (S&AM action) deletes the ProductionRequisition and the corresponding ProductionPlanningOrder. The life cycle status of the Production Requisition should have the value "Production requested". The ProductionRequisition is deleted. The ProductionPlanningOrder is deleted. Action may only be called by inbound processing agent when receiving feedback from Production on Production Request Confirmation. Action may not be called from UI.

QueryByID provides a list of all ProductionRequisitions which match the specified ProductionRequisition Identifiers. The query elements are defined by the data type ProductionRequisitionIDQueryElements. These elements include the following.

QueryByID includes ID and is of type GDT: BusinessTransactionDocumentID. QueryByID includes BusinessProcessVariantType. BusinessProcessVariantType defines the character of a business process variant of ProductionRequisition. It can represent a typical way of processing of a ProductionRequisition within the process component from a business point of view. The elements located directly at the node BusinessProcessVariantType are defined by the data type ProductionRequisitionBusinessProcessVariantTypeElements, derived from BusinessProcessVariantTypeElements. In certain implementations, these elements may include the following: BusinessProcessVariantTypeCode, MainIndicator. BusinessProcessVariantTypeCode is the coded representation of a business process variant type of a ProductionRequisition. BusinessProcessVariantTypeCode may be based on GDT BusinessProcessVariantTypeCode. MainIndicator specifies whether the current BusinessProcessVariantTypeCode is the main one or not. MainIndicator may be based on GDT Indicator. Qualifiers may include the following: Main. Integrity Conditions may include the following: One of the instances of the ProductionRequisitionBusinessProcessVariantType can be allowed to be indicated as main. In current release one instance of ProductionRequisitionBusinessProcessVariantType can be allowed, which can be indicated as main. QueryByID includes ProductionSegment. ProductionSegment is a part of production process, which requires the execution of a single production stage. ProductionSegment can have a material output either as an intermediate material output, or main material output, which is the main material output in ProductionPlanningOrder. The elements located directly at the node ProductionSegment are defined by the node data type ProductionRequisitionProductionSegmentElements. In certain implementations, these elements may include the following: UUID, ID. UUID is a universal identifier, which may be unique, for the ProductionSegment. UUID may be based on GDT UUID. ID is an identifier for the ProductionSegment. It can be unique in the context of the ProductionRequisition. ID may be based on GDT ProductionSegmentID.

The following composition relationships to subordinate nodes exist: ProductionSegmentAggregatedMaterialOutput 297014 1:n, ProductionSegmentRequestedMaterialOutput 297016 1:n, ProductionSegmentConfirmedMaterialOutput 297018 1:n, ProductionSegmentRequestedMaterialInput 297020 1:cn, and ProductionSegmentConfirmedMaterialInput 297022 1:cn.

ProductionSegmentAggregatedMaterialOutput (Transformation Node)

ProductionSegmentAggregatedMaterialOutput (Transformation Node) is aggregated information of the ProductionSegmentRequestedMaterialOutput and ProductionSegmentConfirmedMaterialOutput that related to the corresponding ProductionSegment.

The aggregated material output can aggregate the information of node ProductionSegmentRequestedMaterialOutput and ProductionSegmentConfirmedMaterialOutput. The ProductionSegmentRequestedMaterialOutput or ProductionSegmentConfirmedMaterialOutput can be aggregated for the same attribute-values of GroupID and MaterialUUID under the corresponding ProductionSegment. Further separating attributes might be added.

The elements located directly at the node ProductionSegmentAggregatedMaterialOutput are defined by the node data type ProductionRequisitionProductionSegmentAggregatedMaterialOutputElements. In certain implementations, these elements may include the following: GroupID, MaterialUUID, MaterialRoleCode, CumulatedRequestedQuantity, CumulatedRequestedQuantityTypeCode, CumulatedConfirmedQuantity, CumulatedConfirmedQuantityTypeCode, CumulatedFulfilledQuantity, CumulatedFulfilledQuantityTypeCode.

GroupID is an identifier for the MaterialOutputGroup. It can be unique in the context of the ProductionRequisition. Can correspond to the GroupID of node ProductionRequisitionProductionSegmentRequestedMaterialOutput and ProductionRequisitionProductionSegmentConfirmedMaterialOutput, which is to be aggregated. GroupID may be based on GDT MaterialOutputGroupID.

MaterialUUID is a universal identifier, which may be unique, of the material to which the aggregated material output relates. Can correspond to the MaterialUUID of node ProductionRequisitionProductionSegmentRequestedMaterialOutput and ProductionRequisitionProductionSegmentConfirmedMaterialOutput, which can be aggregated. MaterialUUID may be based on GDT UUID.

MaterialRoleCode specifies the role of the material in the production process. Can correspond to the MaterialRoleCode of node ProductionRequisitionProductionSegmentRequestedMaterialOutput and ProductionRequisitionProductionSegmentConfirmedMaterialOutput, which can be aggregated. MaterialRoleCode may be based on GDT MaterialRoleCode, Qualifier: MaterialOutput.

CumulatedRequestedQuantity is a cumulated quantity of the material which is sent to Production.

Can correspond to the sum of all values of the Element TotalQuantity in Node ProductionRequisitionProductionSegmentRequestedMaterialOutput, which can be aggregated. CumulatedRequestedQuantity may be based on GDT Quantity. Qualifiers may include: Requested.

CumulatedRequestedQuantityTypeCode is the type of the cumulated requested quantity. CumulatedRequestedQuantityTypeCode may be based on GDT QuantityTypeCode. Qualifiers may include: CumulatedRequested.

CumulatedConfirmedQuantity is the cumulated quantity of the material which is confirmed by Production. Can correspond to the sum of all values of the Element TotalQuantity in Node ProductionRequisitionProductionSegmentConfirmedMaterialOutput, which can be aggregated. CumulatedConfirmedQuantity may be based on GDT Quantity. Qualifiers may include: Confirmed.

CumulatedConfirmedQuantityTypeCode is the type of the cumulated confirmed quantity. CumulatedConfirmedQuantityTypeCode may be based on GDT QuantityTypeCode. Qualifiers may include the following: CumulatedConfirmed.

CumulatedFulfilledQuantity is the cumulated quantity of the material which has already been fulfilled in Production. Can correspond to the sum of all values of the Element FulfilledQuantity in Node ProductionRequisitionProductionSegmentConfirmedMaterialOutput, which can be aggregated. CumulatedFulfilledQuantity may be based on GDT Quantity. Qualifiers may include: Fulfilled.

CumulatedFulfilledQuantityTypeCode is the type of the cumulated fulfilled quantity. CumulatedFulfilledQuantityTypeCode may be based on GDT QuantityTypeCode. Qualifiers may be based on: CumulatedFulfilled.

ProductionSegmentRequestedMaterialOutput

ProductionSegmentRequestedMaterialOutput is a requested quantity of a specific material to be produced at a requested due date, which represents the expected result of a production process from Supply Planning. There can be a ProductionSegmentRequestedMaterialOutput in a ProductionSegment. It can be possible that there are several ProductionSegmentRequestedMaterialOutput in a ProductionSegment.

The elements located directly at the node ProductionSegmentRequestedMaterialOutput are defined by the type GDT: ProductionRequisitionProductionSegmentRequestedMaterialOutputElements. In certain implementations, elements may include the following: ID, UUID, MaterialRoleCode, ProductionPlanningOrderMaterialOutputUUID, ReleasedPlanningProductionModelProductionSegmentMaterialOutputChangeStateUUID, MaterialOutputGroupID, MaterialUUID, SupplyPlanningAreaUUID, ReleasedPlanningProductionModelProductionSegmentOperationActivityUUID, DueDateTime, TotalQuantity, and TotalQuantityTypeCode.

ID is an identifier for the ProductionSegmentRequestedMaterialOutput. ID may be based on GDT MaterialOutputID.

UUID is a universal identifier, which may be unique, of a ProductionSegmentRequestedMaterialOutput. UUID may be based on GDT UUID.

MaterialRoleCode specifies the role of the material in the production process and therefore the specialization of the RequestedMaterialOutput in the main material, by-product or intermediate product. MaterialRoleCode may be based on GDT MaterialRoleCode. Qualifiers may include: MaterialOutput. Restrictions may include: Main Product, By-Product, Intermediate Product.

ProductionPlanningOrderMaterialOutputUUID is a reference to the MaterialOutput in the corresponding ProductionPlanningOrder. ProductionPlanningOrderMaterialOutputUUID may be based on GDT UUID. ReleasedPlanningProductionModelProductionSegmentMaterialOutputChangeStateUUID is a universal identifier, which may be unique, for the material output from the ReleasedPlanningProductionModel that contains the master data information for the material output of the ProductionRequisition and is optional. ReleasedPlanningProductionModelProductionSegmentMaterialOutputChangeStateUUID may be based on GDT UUID.

MaterialOutputGroupID is an identifier for the MaterialOutputGroup. It can be unique in the context of the ProductionRequisition. MaterialOutputGroupID may be based on GDT MaterialOutputGroupID.

MaterialUUID is a universal identifier, which may be unique, of a material requested to be produced. MaterialUUID may be based on GDT UUID.

SupplyPlanningAreaUUID is a universal identifier, which may be unique, of a SupplyPlanningArea for which the material is produced. SupplyPlanningAreaUUID may be based on GDT UUID.

ReleasedPlanningProductionModelProductionSegmentOperationActivityUUID is a universal identifier, which may be unique, of the activity from the ReleasedPlanningProductionModel to which the material output of the ProductionRequisition is assigned and is optional. ReleasedPlanningProductionModelProductionSegmentOperationActivityUUID may be based on GDT UUID.

DueDateTime is the date time at which the material shall be available. DueDateTime may be based on GDT _LOCALNORMALISED_DateTime. Qualifiers may include: Due.

TotalQuantity is a quantity requested to be produced altogether. TotalQuantity may be based on GDT Quantity. Qualifiers may include: Total.

TotalQuantityTypeCode is the type of the total quantity. TotalQuantityTypeCode may be based on GDT QuantityTypeCode. Qualifiers may include: Total.

The following Inbound Aggregation Relationships exist: from business object Material/node Root to RequestedOutputMaterial 1:cn that denotes the material to be produced, and from business object SupplyPlanningArea/node Root to RequestedOutputSupplyPlanningArea 1:cn that denotes the SupplyPlanningArea for which the material output is produced.

The following Inbound Association Relationships exist: from business object ProductionPlanningOrder/node MaterialOutput to MaterialOutput 1:c that denotes the corresponding MaterialOutput in the corresponding ProductionPlanningOrder, from the business object ReleasedPlanningProductionModel/node ProductionSegmentMaterialOutputChangeState to ReleasedPlanningProductionModelProductionSegmentMaterialOutputChangeState c:cn that specifies the material output from the ReleasedPlanningProductionModel that contains the master data information for the material output of the ProductionRequisition, and from the business object ReleasedPlanningProductionModel/ProductionSegmentOperationActivity to ReleasedPlanningProductionModelProductionSegmentOperationActivity c:cn that specifies the planning activity from the ReleasedPlanningProductionModel to which the material output of the ProductionRequisition is assigned.

Constraints may include the following: For every ProductionSegmentRequestedMaterialOutput, one corresponding ProductionSegmentConfirmedMaterialOutput can exist with the same ID; the ID of the ProductionSegmentRequestedMaterialOutput can be the same as the ID of the corresponding MaterialOutput in the corresponding ProductionPlanningOrder; the ID of the ProductionSegmentRequestedMaterialOutput may not be changed; the TotalQuantity of the ProductionSegmentRequestedMaterialOutput may not be negative; the MaterialOutputGroupID can be derived from the corresponding MaterialOutput of ProductionPlanningOrder. It can be the same as that in the MaterialOutput of ProductionPlanningOrder.

ProductionSegmentConfirmedMaterialOutput

ProductionSegmentConfirmedMaterialOutput is a confirmed quantity of a specific material to be produced at a confirmed due date, which represents the expected result of a production process from Production Execution. By default, it can be assumed that the ProductionSegmentRequestedMaterialOutput may be confirmed by Production Execution without deviation. One ProductionSegmentConfirmedMaterialOutput can be created exactly the same as the corresponding ProductionSegmentRequestedMaterialOutput during the conversion from ProductionPlanningOrder to ProductionRequisition.

The elements located directly at the node ProductionSegmentConfirmedMaterialOutput are defined by the type GDT: ProductionRequisitionProductionSegmentConfirmedMaterialOutputElements. In certain implementations, these elements may include the following: ID, UUID, MaterialRoleCode ProductionPlanningOrderMaterialOutputUUID, ReleasedPlanningProductionModelProductionSegmentMaterialOutputChangeStateUUID, MaterialOutputGroupID, MaterialUUID, SupplyPlanningAreaUUID, ReleasedPlanningProductionModelProductionSegmentOperationActivityUUID, DueDateTime, TotalQuantity, TotalQuantityTypeCode, FulfilledQuantity, FulfilledQuantityTypeCode.

ID is an identifier for the ProductionSegmentConfirmedMaterialOutput. ID may be based on GDT MaterialOutputID.

UUID is a universal identifier, which may be unique, of a ProductionSegmentConfirmedMaterialOutput. UUID may be based on GDT UUID.

MaterialRoleCode specifies the role of the material in the production process and therefore the specialization of the ConfirmedMaterialOutput in the main material, by-product or intermediate product. MaterialRoleCode may be based on GDT MaterialRoleCode. Qualifiers may include: MaterialOutput. Restrictions may include: Main Product, By-Product, Intermediate Product.

ProductionPlanningOrderMaterialOutputUUID is a reference to the MaterialOutput in the corresponding ProductionPlanningOrder. ProductionPlanningOrderMaterialOutputUUID may be based on GDT UUID.

ReleasedPlanningProductionModelProductionSegmentMaterialOutputChangeStateUUID is a universal identifier, which may be unique, for the material output from the ReleasedPlanningProductionModel that contains the master data information for the material output of the ProductionRequisition and is optional. ReleasedPlanningProductionModelProductionSegmentMaterialOutputChangeStateUUID may be based on GDT UUID.

MaterialOutputGroupID is an identifier for the MaterialOutputGroup. It can be unique in the context of the ProductionRequisition. MaterialOutputGroupID may be based on GDT MaterialOutputGroupID.

MaterialUUID is a universal identifier, which may be unique, of a material requested to be produced. MaterialUUID may be based on GDT UUID.

SupplyPlanningAreaUUID is a universal identifier, which may be unique, of a SupplyPlanningArea for which the material is produced. SupplyPlanningAreaUUID may be based on GDT UUID.

ReleasedPlanningProductionModelProductionSegmentOperationActivityUUID is a universal identifier, which may be unique, of the activity from the ReleasedPlanningProductionModel to which the material output of the ProductionRequisition is assigned and is optional. ReleasedPlanningProductionModelProductionSegmentOperationActivityUUID may be based on GDT UUID.

DueDateTime is the Date Time at which the material shall be available. DueDateTime may be based on GDT _LOCAL-NORMALISED_DateTime. Qualifiers may include: Due.

TotalQuantity is the quantity confirmed to be produced altogether. TotalQuantity may be based on GDT Quantity. Qualifiers may include: Total.

TotalQuantityTypeCode is the type of the total quantity. TotalQuantityTypeCode may be based on GDT QuantityTypeCode. Qualifiers may include: Total.

FulfilledQuantity is a quantity that has already been fulfilled in Production Execution. FulfilledQuantity may be based on GDT Quantity. Qualifiers may be based on: Fulfilled.

FulfilledQuantityTypeCode is the type of the fulfilled quantity. FulfilledQuantityTypeCode may be based on GDT QuantityTypeCode. Qualifiers may include the following: Fulfilled.

The following Inbound Aggregation Relationships exist: from business object Material/node Root to ConfirmedOutputMaterial 1:cn that denotes the material to be produced, and from business object SupplyPlanningArea/node Root to ConfirmedOutputSupplyPlanningArea 1:cn that denotes the SupplyPlanningArea for which the material output is produced.

The following Inbound Association Relationships exist: from the business object ReleasedPlanningProductionModel/node ProductionSegmentMaterialOutputChangeState to ReleasedPlanningProductionModelProductionSegmentMaterialOutputChangeState c:cn that specifies the material output from the ReleasedPlanningProductionModel that contains the master data information for the material output of the ProductionRequisition, and to ReleasedPlanningProductionModelProductionSegmentOperationActivity c:cn that specifies the planning activity from the ReleasedPlanningProductionModel to which the material output of the ProductionRequisition is assigned.

QueryByElements is a query provides a list of all ProductionRequisitionProductionSegmentConfirmedMaterialOutput that satisfy the selection by the query elements. The query elements are defined by the data type ProductionRequisitionProductionSegmentConfirmedMaterialOutputElementsQueryElements.

These elements include the following. QueryByElements includes MaterialUUID and is of type GDT: UUID. QueryByElements includes SupplyPlanningAreaUUID and is of type GDT: UUID.

Constraints may include the following: the ID of the ProductionSegmentConfirmedMaterialOutput may not be changed; the TotalQuantity of the ProductionSegmentConfirmedMaterialOutput may not be negative; the FulfilledQuantity of the ProductionSegmentConfirmedMaterialOutput may not be negative; the MaterialOutputGroupID can be derived from the corresponding MaterialOutput of ProductionPlanningOrder. It can be the same as that in the MaterialOutput of ProductionPlanningOrder.

ProductionSegmentRequestedMaterialInput

ProductionSegmentRequestedMaterialInput is a material that shall be consumed for the execution of ProductionSegment in a predefined quantity, and date, as requested from Supply Planning. The elements located directly at the node ProductionSegmentRequestedMaterialInput are defined by the type GDT: ProductionRequisitionProductionSegmentRequestedMaterialInputElements. In certain implementations, these elements may include the following: ID, UUID, MaterialRoleCode, ProductionPlanningOrderMaterialInputUUID, ReleasedPlanningProductionModelProductionSegmentMaterialInputChangeStateUUID, MaterialInputGroupID, MaterialUUID, SupplyPlanningAreaUUID, ReleasedPlanningProductionModelProductionSegmentOperationActivityUUID, DueDateTime, TotalQuantity, TotalQuantityTypeCode.

ID is an identifier for the ProductionSegmentRequestedMaterialInput. ID may be based on GDT MaterialInputID.

UUID is a universal identifier, which may be unique, of a ProductionSegmentRequestedMaterialInput. UUID may be based on GDT UUID.

MaterialRoleCode specifies the role of the material in the production process and therefore the specialization of the RequestedMaterialInput in the intermediate product or component. MaterialRoleCode may be based on GDT MaterialRoleCode. Qualifiers may include the following: MaterialInput. Restrictions may include the following: Intermediate Product, Component. ProductionPlanningOrderMaterialInputUUID is the reference to the MaterialInput in the corresponding ProductionPlanningOrder. ProductionPlanningOrderMaterialInputUUID may be based on GDT UUID.

ReleasedPlanningProductionModelProductionSegmentMaterialInputChangeStateUUID is a universal identifier, which may be unique, for the material input from the ReleasedPlanningProductionModel that contains the master data information for the material Input of the ProductionRequisition and is optional. ReleasedPlanningProductionModelProductionSegmentMaterialInputChangeStateUUID may be based on GDT UUID.

MaterialInputGroupID is an identifier for the MaterialInputGroup. It can be unique in the context of the ProductionRequisition. MaterialInputGroupID may be based on GDT MaterialInputGroupID.

MaterialUUID is a universal identifier, which may be unique, of a material requested to be consumed. MaterialUUID may be based on GDT UUID.

SupplyPlanningAreaUUID is a universal identifier, which may be unique, of a SupplyPlanningArea for which the material is consumed. SupplyPlanningAreaUUID may be based on GDT UUID.

ReleasedPlanningProductionModelProductionSegmentOperationActivityUUID is a universal identifier, which may be unique, of the activity from the ReleasedPlanningProductionModel to which the material input of the ProductionRequisition is assigned and is optional. ReleasedPlanningProductionModelProductionSegmentOperationActivityUUID may be based on GDT UUID.

DueDateTime is the Date Time at which the material shall be consumed. DueDateTime may be based on GDT _LOCALNORMALISED_DateTime. Qualifiers may be based on: Due.

TotalQuantity is the quantity that shall be consumed altogether. TotalQuantity may be based on GDT Quantity. Qualifiers may include the following: Total.

TotalQuantityTypeCode is the type of the total quantity. TotalQuantityTypeCode may be based on GDT QuantityTypeCode. Qualifiers may include: Total.

The following Inbound Aggregation Relationships exist: from business object Material/node Root to RequestedInputMaterial 1:cn that denotes the material to be consumed, and from business object SupplyPlanningArea/node Root to RequestedInputSupplyPlanningArea 1:cn that denotes the SupplyPlanningArea for which the material input is consumed.

The following Inbound Association Relationships exist: from the business object ReleasedPlanningProductionModel/node ProductionSegmentMaterialInputChangeState to ReleasedPlanningProductionModelProductionSegmentMaterialInputChangeState c:cn that specifies the material input from the ReleasedPlanningProductionModel that contains the master data information for the material input of the ProductionRequisition, and to ReleasedPlanningProductionModelProductionSegmentOperationActivity c:cn that specifies the planning activity from the ReleasedPlanningProductionModel to which the material input of the ProductionRequisition is assigned.

Constraints may include the following: the ID of the ProductionSegmentRequestedMaterialInput can be the same as the ID of the corresponding MaterialInput in the corresponding ProductionPlanningOrder; the ID of the ProductionSegmentRequestedMaterialInput may not be changed; the TotalQuantity of the ProductionSegmentRequestedMaterialInput may not be negative; the MaterialInputGroupID can be derived from the corresponding MaterialInput of ProductionPlanningOrder. It can be the same as that in the MaterialInput of ProductionPlanningOrder.

ProductionSegmentConfirmedMaterialInput

ProductionSegmentConfirmedMaterialInput is a material that shall be consumed for the execution of a ProductionSegment in a predefined quantity, and date, as confirmed by Production Execution. By default, it can be assumed that the ProductionSegmentRequestedMaterialInput may be confirmed by Production Execution without deviation. One ProductionSegmentConfirmedMaterialInput can be created the same as the corresponding ProductionSegmentRequestedMaterialInput during the conversion from ProductionPlanningOrder to ProductionRequisition.

The elements located directly at the node ProductionSegmentConfirmedMaterialInput are defined by the type GDT: ProductionRequisitionProductionSegmentConfirmedMaterialInputElements. In certain implementations, these elements may include the following: ID, UUID, MaterialRoleCode, ProductionPlanningOrderMaterialInputUUID, ReleasedPlanningProductionModelProductionSegmentMaterialInputChangeStateUUID, MaterialInputGroupID, MaterialUUID, SupplyPlanningAreaUUID, ReleasedPlanningProductionModelProductionSegmentOperationActivityUUID, DueDateTime, TotalQuantity, TotalQuantityTypeCode, FulfilledQuantity, FulfilledQuantityTypeCode.

ID is an identifier for the ProductionSegmentConfirmedMaterialInput. ID may be based on GDT MaterialInputID.

UUID is a universal identifier, which may be unique, of a ProductionSegmentConfirmedMaterialInput. UUID may be based on GDT UUID.

MaterialRoleCode specifies the role of the material in the production process and therefore the specialization of the ConfirmedMaterialInput in the intermediate product or component. MaterialRoleCode may be based on GDT MaterialRoleCode. Qualifiers may include: MaterialInput. Restrictions may include: Intermediate Product, Component.

ProductionPlanningOrderMaterialInputUUID is the reference to the MaterialInput in the corresponding ProductionPlanningOrder. ProductionPlanningOrderMaterialInputUUID may be based on GDT UUID.

ReleasedPlanningProductionModelProductionSegmentMaterialInputChangeStateUUID is a universal identifier, which may be unique, for the material Input from the ReleasedPlanningProductionModel that contains the master data information for the material input of the ProductionRequisition and is optional. ReleasedPlanningProductionModelProductionSegmentMaterialInputChangeStateUUID may be based on GDT UUID.

MaterialInputGroupID is an identifier for the MaterialInputGroup. It can be unique in the context of the ProductionRequisition. MaterialInputGroupID may be based on GDT MaterialInputGroupID.

MaterialUUID is a universal identifier, which may be unique, of a material requested to be consumed. MaterialUUID may be based on GDT UUID.

SupplyPlanningAreaUUID is a universal identifier, which may be unique, of a SupplyPlanningArea for which the material is consumed. SupplyPlanningAreaUUID may be based on GDT UUID.

ReleasedPlanningProductionModelProductionSegmentOperationActivityUUID is a universal identifier, which may be unique, of the activity from the ReleasedPlanningProductionModel to which the material input of the ProductionRequisition is assigned and is optional. ReleasedPlanningProductionModelProductionSegmentOperationActivityUUID may be based on GDT UUID.

DueDateTime is the Date Time at which the material shall be consumed. DueDateTime may be based on GDT _LOCALNORMALISED_DateTime. Qualifiers may include: Due.

TotalQuantity is the quantity confirmed to be consumed altogether. TotalQuantity may be based on GDT Quantity. Qualifiers may include: Total.

TotalQuantityTypeCode is the type of the total quantity. TotalQuantityTypeCode may be based on GDT QuantityTypeCode. Qualifiers may include: Total FulfilledQuantity is the quantity that has already been fulfilled in Production Execution. FulfilledQuantity may be based on GDT Quantity. Qualifiers may include: Fulfilled.

FulfilledQuantityTypeCode is the type of the fulfilled quantity. FulfilledQuantityTypeCode may be based on GDT QuantityTypeCode. Qualifiers may include: Fulfilled.

The following Inbound Aggregation Relationships exist: from business object Material/node Root to ConfirmedInputMaterial 1:cn that denotes the material to be consumed, and from business object SupplyPlanningArea/node Root to ConfirmedInputSupplyPlanningArea 1:cn that denotes the SupplyPlanningArea for which the material is consumed.

The following Inbound Association Relationships exist: from the business object ReleasedPlanningProductionModel/node ProductionSegmentMaterialInputChangeState to ReleasedPlanningProductionModelProductionSegmentMaterialInputChangeState c:cn that specifies the material input from the ReleasedPlanningProductionModel that contains the master data information for the material input of the ProductionRequisition, and to ReleasedPlanningProductionModelProductionSegmentOperationActivity c:cn that specifies the planning activity from the ReleasedPlanningProductionModel to which the material input of the ProductionRequisition is assigned.

QueryByElements is a query provides a list of ProductionRequisitionProductionSegmentConfirmedMaterialInput that satisfy the selection by the query elements. The query elements are defined by the data type ProductionRequisitionProductionSegmentConfirmedMaterialInputElementsQueryElements. These elements include the following. QueryByElements includes MaterialUUID and is of type GDT: UUID. QueryByElements includes SupplyPlanningAreaUUID and is of type GDT: UUID.

Constraints may include the following: the ID of the ProductionSegmentConfirmedMaterialInput may not be changed; the TotalQuantity of the ProductionSegmentConfirmedMaterialInput may not be negative; the FulfilledQuantity of the ProductionSegmentConfirmedMaterialInput may not be negative; the MaterialInputGroupID can be derived from the corresponding MaterialInput of ProductionPlanningOrder. It can be the same as that in the MaterialInput of ProductionPlanningOrder.

Business Object SiteLogisticsRequisition

FIGS. 298-1 through 298-7 illustrate an example SiteLogisticsRequisition business object model 298032. Specifically, this model depicts interactions among various hierarchical components of the SiteLogisticsRequisition, as well as external components that interact with the SiteLogisticsRequisition (shown here as 298000 through 298030 and 298034 through 298102).

Business Object SiteLogisticsRequisition is a request to Logistics Execution to execute a site logistics process for a certain quantity of material, by a certain time. A site logistics process is a process to move material inside the warehouse. Depending on the overall logistics execution process to which the SiteLogisticsRequisition belongs, the SiteLogisticsRequisition can be one of the following types Outbound 298112, Inbound 298110, and Internal 298108. Outbound is the SiteLogisticsRequisition requests that the material be prepared for an outbound process (For example, moves the material from stock to the gate for an outbound delivery). Inbound is the SiteLogisticsRequisition requests that the material be moved for an inbound process (For example, moves the material from a gate to the stock). Internal is the SiteLogisticsRequisition requests that the material be moved for an internal process. The SiteLogisticsRequisition represents, in contrast to LogisticsExecutionRequisition, the site logistics-based part of Logistics Execution and can combine multiple sales orders or purchase orders The LogisticsExecutionRequisition contains additionally delivery and transportation based information. The business object Site Logistics Requisition is part of the process component Logistics Execution Control. A SiteLogisticsRequisition contains components that include SiteLogisticsRequisition, RequestItem, and ConfirmationItem. A SiteLogisticsRequisition contains information about the status and references. A RequestItem contains information about the product that Site Logistics shall process. A ConfirmationItem contains information about the product Site Logistics plans to process or has already processed.

SiteLogisticsRequisition is represented by the root node SiteLogisticsRequisition 298104. The Business Object Site Logistics Requisition is involved in the Process Integration Models and includes the Logistics Execution and Control_Site Logistics Processing.

Service Interface Site Logistics Processing In (A2A) refers to LogisticsExecutionControlSiteLogisticsProcessingIn The Service Interface Site Logistics Processing In is part of the following Process Integration Models:

Logistics Execution Control_Site Logistics Processing which this interface contains the operation that notify Logistics Execution Control about the confirmation and fulfilment of the SiteLogisticsRequisition by site logistics. Operation Change Site Logistics Requisition based on Site Logistics Request Confirmation (A2A) is the LogisticsExecutionControlSiteLogisticsProcessingIn.ChangeSiteLogisticsRequisitionBasedOnSiteLogisticsRequestConfirmation refers to the operation receives confirmation and fulfillment data with reference to a Site Logistics Requisition from Site Logistics and additionally information on inventory changes.

It is also possible to receive fulfillment and confirmation without reference to a SiteLogisticsRequisition in case of an unexpected receipt of goods. The fulfillment and confirmation updates the node ConfirmationItem and underlying nodes in the SiteLogisticsRequisition. The operation is based on message type SiteLogisticsRequestConfirmation, derived from business object SiteLogisticsRequest.

Service Interface Site Logistics Processing Out (A2A) refers to the LogisticsExecutionControl-SiteLogisticsProcessingOut. The Service Interface Site Logistics Processing Out is part the Process Integration Models, Logistics Execution Control_Site Logistics Processing.

Logistics Execution Control_Site Logistics Processing refers to the interface contains the operations that notify Site Logistics Processing about the request of a site logistics process.

Operation Request Site Logistics (A2A)

LogisticsExecutionControl-SiteLogisticsProcessingOut.RequestSiteLogistics refers to the operation requests site logistics to execute a site logistics process. The request is created by the root node, the RequestItem and underlying nodes of the SiteLogisticsRequisition. The operation is based on message type SiteLogisticsRequestRequest, derived from business object SiteLogisticsRequest.

Node structure of the Business Object SiteLogisticsRequisition (Root node) is the SiteLogisticsRequisition is a request to execute a site logistics process for certain products with certain quantities by a due time.

The SiteLogisticsRequisition consists mainly of the RequestItems that hold the requested data and the ConfirmationItems that are used to hold the confirmation data and the fulfillment data.

Root is of the data type SiteLogisticsRequisitionElements which includes UUID, ID, SiteLogisticsProcessTypeCode, FollowUpDeliveryRequirementCode, and SystemAdministrativeData.

A UUID is a GDT of type UUID which is a universally unique identifier of the SiteLogisticsRequisition for referencing purposes.

ID is a GDT of type BusinessTransactionDocumentID which is a unique identifier of the SiteLogisticsRequisition SiteLogisticsProcessTypeCode is a GDT of type SiteLogisticsProcessTypeCode. Coded representation that specifies the type of logistics execution processing and includes Inbound site logistics processing, Outbound site logistics processing, and In-house site logistics processing.

A FollowUpDeliveryRequirementCode is a GDT of type FollowUpBusinessTransactionDocumentRequirementCode and is optional.

Coded representation of the need for a delivery document and uses the codes; 01=Required 05=Forbidden A SystemAdministrativeData is a GDT of type SystemAdministrativeDate which is an administrative data recorded by the system. This data includes system users and change times. A Date 298114 has a cardinality of 1:1. A Party 298118 has a cardinality of 1:n. A Location 298128 has a cardinality of 1:cn. A BusinessTransactionDocumentReference 298144 has a cardinality of 1:cn. A DeliveryTerms 298140 has a cardinality of 1:c. A TransportationTerms 298142 has a cardinality of 1:c. A RequestItem 298106 has a cardinality of 1:cn. A ConfirmationItem 298154 has a cardinality of 1:cn.

Associations for Navigation to the BusinessTransactionDocumentReference node contains the Party node, the Location node, the Date node, the RequestItem node, and the Confirmation node.

A ProcurementPlanningOrder has a cardinality of c:c. A SupplyPlanningRequirement has a cardinality of c:c. A SiteLogisticsRequest has a cardinality of c:c. A BaseBusinessTransactionDocument has a cardinality of c:c. A Vendor Party has a cardinality of c:c. A ProductRecipientParty has a cardinality of c:c. A FreightForwarderParty has a cardinality of c:c. A CarrierParty has a cardinality of c:c. A PickupParty has a cardinality of c:c. A ShipFromLocation has a cardinality of c:c. A ShipToLocation has a cardinality of c:c. A ArrivalTimePoint has a cardinality of c:c. A ShippingTimePoint has a cardinality of c:c. A PickupTimePoint has a cardinality of c:c. A StandardRequestItem has a cardinality of c:cn. A SparePartRequestItem has a cardinality of c:cn. A StandardConfirmationItem has a cardinality of c:cn. A SparePartConfirmationItem has a cardinality of c:cn There are a number of Inbound Association Relationships that include CreationIdentity and LastChangeIdentity. CreationIdentity has a cardinality of 1:cn which identifies the identity that has created the SiteLogisticsRequisitionConfirmationItem. A LastChangeIdentity has a cardinality of 1:cn and identifies the identity that has changed the SiteLogisticsRequisitionConfirmationItem last.

QueryByElements provides a list of all SiteLogisticsRequisitions that satisfy the selection criteria specified by the query elements.

A SiteLogisticsRequisitions is a GDT of type SiteLogisticsRequisitionElementsQueryElements defines the query elements which include, ID, SystemAdministrativeData, CreationBusinessPartnerCommonPersonNameGivenName, CreationBusinessPartnerCommonPersonNameFamilyName, LastChangeBusinessPartnerCommonPersonNameGivenName, and LastChangeBusinessPartnerCommonPersonNameFamilyName. An ID is a GDT of type BusinessTransactionDocumentID which is an Identifier for the ID of the SiteLogisticsRequisition and is optional. A SystemAdministrativeData is a GDT of type SystemAdministrativeDate and is optional. An administrative data recorded by the system includes system users and change times. A CreationBusinessPartnerCommonPersonNameGivenName is a GDT of type LANGUAGEINDEPENDANT_MEDIUM_Name. A CreationBusinessPartnerCommonPersonNameFamilyName is a GDT of type LANGUAGEINDEPENDANT_MEDIUM_Name. A LastChangeBusinessPartnerCommonPersonNameGivenName is a GDT of type LANGUAGEINDEPENDANT_MEDIUM_Name. A LastChangeBusinessPartnerCommonPersonNameFamilyName is a GDT of type LANGUAGEINDEPENDANT_MEDIUM_Name.

The query provides a list of SiteLogisticsRequisitions that contain the entered document reference which is a GDT of type SiteLogisticsRequisitionReferencedDocument QueryElements and includes RequestItemBusinessTransactionDocumentReferenceLogisticsExecutionRequisition ItemReference, RequestItemBusinessTransactionDocument ReferencePurchaseOrderItemReference, RequestItemBusinessTransactionDocumentReferencePlanningViewOn PurchaseOrderItemReference, RequestItemBusinessTransactionDocumentReferenceSalesOrderItemReference, RequestItemBusinessTransactionDocumentReference CustomerRequirementItemReference, RequestItemBusinessTransactionDocumentReferenceServiceOrderItem Reference, ConfirmationItemBusinessTransaction DocumentReferenceSiteLogisticsConfirmation InventoryChangeItemReference, ConfirmationItemBusinessTransactionDocumentReferenceProcurement PlanningOrderItemReference, and ConfirmationItemBusinessTransactionDocumentReferenceSupplyPlanning RequirementItemReference. A RequestItemBusinessTransactionDocumentReferenceLogisticsExecutionRequisitionItemReference is a GDT of type BusinessTransactionDocumentReference and is optional.

A RequestItemBusinessTransactionDocumentReferencePurchaseOrderItemReference is a GDT of type BusinessTransactionDocumentReference and is optional.

A RequestItemBusinessTransactionDocumentReferencePlanningViewOnPurchaseOrderItemReference is a GDT of type BusinessTransactionDocumentReference and is optional.

A RequestItemBusinessTransactionDocumentReferenceSalesOrderItemReference is a GDT of type BusinessTransactionDocumentReference and is optional.

A RequestItemBusinessTransactionDocumentReferenceCustomerRequirementItemReference is a GDT of type BusinessTransactionDocumentReference and is optional.

A RequestItemBusinessTransactionDocumentReferenceServiceOrderItemReference is a GDT of type BusinessTransactionDocumentReference and is optional.

A ConfirmationItemBusinessTransactionDocumentReferenceSiteLogisticsConfirmationInventoryChangeItemReference is a GDT of type BusinessTransactionDocumentReference and is optional.

A ConfirmationItemBusinessTransactionDocumentReferenceProcurementPlanningOrderItemReference is a GDT of type BusinessTransactionDocumentReference and is optional.

A ConfirmationItemBusinessTransactionDocumentReferenceSupplyPlanningRequirementItemReference is a GDT of type BusinessTransactionDocumentReference and is optional.

The (specialization) association for navigation to the BaseBusinessTransaction document always point to the SiteLogisticsRequest business transaction document reference, if it exists. It can only exist in case of unexpected receipts, where the SiteLogisticsRequistion is created on base of a SiteLogisticsRequest. In case of regular creation with one or several LogisticsExecutionRequisitions as predecessor(s) the BaseBusinessTransaction document on root level may not exist.

A Date refers to a time specification (based on the day month and year) for a SiteLogisticsRequisition. A Date is of the data type SiteLogisticsRequisitionDateElements which includes a TimePointRoleCode. A TimePointRoleCode is a GDT of type TimePointRoleCode. Coded representation of the semantics of a point in time in the SiteLogisticsRequisition and uses the codes ArrivalTimePoint, ShippingTimePoint, PickupTimePoint, and TimePoint. An ArrivalTimePoint refers to the time that the goods arrive. A ShippingTimePoint refers to the time that the goods are shipped. A PickupTimePoint refers to the time that the goods are collected. A TimePoint is a GDT of type TimePoint Time point with a relevance to the SiteLogisticsRequisition.

A Party is a natural or legal person, organization, organizational unit or group that is involved in a SiteLogisticsRequisition processing in a PartyRole. A Party may keep a reference to a business partner or one of its specializations (for example: customer, supplier) and keep a reference to one of the following specializations of an organizational unit.

A Party may exist without reference to a business partner or an organizational unit.

The elements located directly at the node Party are defined by the data type SiteLogisticsRequisitionPartyElements which includes PartyKey, PartyUUID, RoleCategoryCode, RoleCode, AddressReference, MainIndicator, and Name.

A PartyKey is a GDT of type PartyKey and is optional. Key of the Party in this PartyRole in the business document or the master data object. If a business partner or organizational unit are referenced, the attribute Party_ID contains their identifiers and the field PartyTypeCode either the Object Type Code of the Business Partner or of Organizational Centre. If an unidentified identifier is, for example, entered by the user, the Party_ID contains this identifier and the PartyTypeCode is empty. A PartyUUID is a GDT of type UUID which is a universally unique identifier for a business partner, the organizational unit, or their specializations and is optional. A RoleCategoryCode is a GDT of type PartyRoleCategoryCode which party Role Category of the Party in the business document or the master data object and is optional. The Vendor Party is a party (customer in the delivery process, supplier in the return delivery process) who delivers a good or who provides a service. A ProductRecipientParty is a party (customer in the delivery process, supplier in the return delivery process) to whom a good is delivered or for whom a service is provided. A FreightForwarderParty is a party responsible for organizing the shipment of a good. A CarrierParty is a party responsible for the shipment of a good. A PickupParty is a party that collects the goods. A RoleCode is a GDT of type PartyRoleCode in which a party Role of the Party in the business document or the master data object and is optional. A AddressReference is the information to reference the address of a Party and is optional. A MainIndicator is a GDT of type Indicator, Qualifier: Main) indicates whether or not a Party is emphasized in a group of parties with the same PartyRole and is optional. A Name is a GDT of type LONG_Name which refers to the name of the Party and is optional. A PartyContactParty 298120 has a cardinality of 1:cn. A PartyStandardIdentification 298124 has a cardinality of 1:cn. A PartyAddress 298126 has a cardinality of 1:c.

Composition to Dependent Object Address

Associations for navigation to the PartyContactParty node is a MainContactParty.

A MainContactParty has a cardinality of c:c.

There may be a number of Inbound Aggregation Relationships that includes the Party.

From business object Party/node Root, a Party has a cardinality of c:cn.

Associations for Navigation to the business object UsedAddress/node Root. A UsedAddress has a cardinality of c:cn. For the address used for the Party. This can be a referenced address of the master data object, or the PartyAddress used via the composition relationship.

It is possible to determine which of the two applies by means of the PartyAddressHostTypeCode element The instance of the TO UsedAddress represents this address. The association is implemented.

For example, the node ID of the node in the master data object is determined via the PartyTypeCode, PartyAddressUUID and PartyAddressHostTypeCode elements that has the composition relationship to the DO address that is to be represented by the TO UsedAddress. Additionally, the TO UsedAddress in the implemented association is provided with the following information:

That this is an example of a master data address

BusinessObjectTypeCode, BusinessObjectNodeTypeCode and Node ID of its own <BO-Node>-Party node. These are required in case changes to the TO UsedAddress take place. In this case, the master data address is copied by the TO UsedAddress, the changes take place to the copy, and a corresponding DO Address is created at the <BO-Node>Party via the PartyAddress composition relationship.

For example, the TO UsedAddress is informed of the BusinessObjectTypeCode, BusinessObjectNodeTypeCode and Node ID of its own <BO-Node>-Party. Additionally, information is provided that this is not an example of a referenced address. In this case, the TO UsedAddress represents the DO address used at the <BO-Node>-Party via the PartyAddress composition relationship.

If the PartyUUID exists, the PartyTypeCode may exist as well. Parties may be referenced via the Transformed Object Party, that represent at least one of the following business objects: Company CostCentre, FunctionalUnit, ReportingLineUnit, Supplier, Customer, Employee, BusinessPartner.

There may be one of the associations to the address. This address is a master data address of the business partner, organizational unit, or their specializations referenced by PartyUUID.

The SiteLogisticsRequisition can either have an inbound aggregation relationship from a customer or from a purchaser. The Vendor Party may exist, if the SiteLogisticsRequisition is based on PlanningViewsOnPurchaseOrders. The ProductRecipientParty may exist, if the SiteLogisticsRequisition is based on CustomerRequirements.

PartyStandardIdentification is the standardized identifier for the party. A PartyStandardID is a GDT of type PartyStandardID which is the standardized identification of the party.

A DO PartyAddress is the Dependent Object Address contains the document specific address of the party. The data is defined by the Dependent Object Address and is defined by DO Address.

A PartyContactParty refers to the natural person or organizational unit that can be contacted for the party. The contact may be a contact person or, for example, a secretary's office. Usually, communication data for the contact is available. The elements located directly at the node PartyContactParty are defined by the data type SiteLogisticsRequisitionPartyContactPartyElements which includes PartyKey, PartyUUID, AddressReference, MainIndicator, and Name. A PartyKey is a GDT of type PartyKey and is optional. Key of the Party in this PartyRole in the business document or the master data object. If a business partner or organizational unit are referenced, the attribute Party_ID contains their identifiers and the field PartyTypeCode either the Object Type Code of the Business Partner or of Organizational Centre. If an unidentified identifier is, for example, entered by the user, the Party_ID contains this identifier and the PartyTypeCode is empty. A PartyUUID is a GDT of type UUID which is a unique identifier of the contact in this PartyRole in the business document or the master data object and is optional. A AddressReference is a GDT of type PartyAddressReference which refers to the information to reference the address of a Party and optional. A MainIndicator indicates whether or not a PartyContactParty is emphasized in a group of contact parties with the same PartyRole which is a GDT of type Indicator, Qualifier: Main. A Name is a GDT of type Long_Name which is the name of the PartyContactParty and is optional.

A PartyContactPartyAddress 298122 has a cardinality of 1:c.

There are a number of Inbound Aggregation Relationships which may include a Party. From business object Party/node Root, Party has a cardinality of c:cn. Associations for Navigation to the business object UsedAddress/node Root is the UsedAddress. A UsedAddress has a cardinality of c:cn and may be the referenced address of a master data object or an address referenced via the composition to PartyAddress. There may only be one of the associations to the address. This address is a master data address of the business partner, organizational unit, or their specializations referenced by PartyUUID.

A DO PartyContactPartyAddress is the Dependent Object Address contains the document specific address of the contact party. The data is defined by the Dependent Object Address. The Structure is defined by DO Address. A Location refers to a source or destination location for a good or material that is moved by Site Logistics according to the SiteLogisticsRequisition. A Location may keep a reference to a business object Location. A Location may keep a reference to an address. A Location may keep a reference to a business partner or one of its specializations (for example customer or supplier). A Location may keep a reference to one of the following specializations of an organisational unit which is a ReportingLineUnite. The LocationRole describes the role of a Location in the site logistics process. The elements located directly at the node Location are defined by the data type SiteLogisticsRequisitionLocationElements which includes LocationID, LocationUUID, AddressReference, AddressHostUUID, BusinessObjectTypeCode, AddressHostTypeCode, PartyID, InstalledBaseID, InstallationPointID, RoleCategoryCode, and RoleCode.

A LocationID is a GDT of type LocationID (without additional components, such as schemeAgencyID)) which is the identifier of the Location in this LocationRole and is optional. If a location, business partner or organizational unit are referenced, the attribute contains their identifiers. If an unidentified identifier is, for example, entered by the user, the attribute contains this identifier. A LocationUUID is a GDT of type UUID which is a unique identifier for a location, business partner, the organizational unit, or their specializations and is optional. A AddressReference is a IDT of type ObjectNodeLocationAddressReference which is the information to reference the address of a Party, an InstalledBase or an InstallationPoint and is optional. An AddressHostUUID is a GDT of type UUID which is a universally unique identifier of the address of the business partner, the organizational unit or its specializations, the BO InstalledBase or the BO InstallationPoint and is optional. A BusinessObjectTypeCode is a GDT of type BusinessObjectTypeCode which refers to the coded representation of the BusinessObjectTypes of the business object, in which the address referenced in Element LocationAddressUUID is integrated as a Dependent Object and is optional.

A AddressHostTypeCode is a GDT of type AddressHostTypeCode which is the coded representation of the address host type of the address referenced by AddressUUID or the address included via the LocationAddress composition and is optional. A PartyKey is a GDT of type PartyKey which is an alternative Identifier of a Party (represents a business partner or an organizational unit), that reference the address via AddressUUID and is optional. A InstalledBaseID is a GDT of type InstalledBaseID which is an identifier of the BO InstalledBase, that reference the address via AddressUUID. An InstallationPointID is a GDT of type InstallationPointID which is an identifier of the BO InstallationPoint, that reference the address via AddressUUID and is optional. A RoleCategoryCode is a GDT of type LocationRoleCategoryCode which is a Location Role Category of the Location and is optional. The following codes are used in a Location Role Category, ShipFromLocation, ShipToLocation, and RoleCode. ShipFromLocation is the Location from where a good is shipped. A ShipToLocation is the Location to where a good is shipped.

A RoleCode is a GDT of type LocationRoleCode which describes the Location Role of the Location. A LocationStandardIdentification 298132 has a cardinality of 1:c. A LocationAddress 298130 has a cardinality of 1:c.

There may be a number of Inbound Aggregation Relationships including Location, PartyAddressInformation, InstalledBaseAddressInformation, and InstallationPointAddressInformation.

From business object Location/node Root, Location has a cardinality of c:cn. From business object Party/node AddressInformation, PartyAddressInformation has a cardinality of c:cn. AddressInformation of a representative of a Business Partner or Organizational Centre corresponding to the Location From business object InstalledBase/node AddressInformation, InstalledBaseAddressInformation has a cardinality of c:cn. AddressInformation of an Installed Base corresponding to the Location From business object InstallationPoint/node AddressInformation, InstallationPointAddressInformation has a cardinality of c:cn. AddressInformation of an Installation Point corresponding to the Location A UsedAddress has a cardinality of c:cn. A referenced address of a master data object or The address that is integrated via the composition relationship LocationAddress. You can see which of the two cases applies by looking at the element AddressHostTypeCode. The instance of the TO UsedAddress represents this address. The association is implemented.

For example, the elements AddressBusinessObjectTypeCode, AddressUUID and AddressHostTypeCode are used to determine the Node ID of the node in the master data object, which holds the composition relationship with DO Address, which is to be represented by TO UsedAddress. Furthermore, the following information is sent to the TO UsedAddress in the implemented address:

The fact that it is a master data address;

the BusinessObjectTypeCode, BusinessObjectNodeTypeCode and Node ID of the own <BO-Node>Location node. This are required if changes are made to the TO UsedAddress. In this case the TO UsedAddress copies the master data address, the changes are applied and the corresponding DO Address is generated on the <BO-Node>Location node via the composition relationship LocationAddress.

For example, the BusinessObjectTypeCode, BusinessObjectNodeTypeCode and Node ID of the own <BO-Node>Location are communicated to the TO UsedAddress. Whether or not it is a referenced address is also included. In this case, the TO UsedAddress represents the DO Address that is integrated via the composition relationship on the <BO-Node>Location node.

There can be either just one aggregation or composition relationship to the dependent object.

If there is an aggregation relationship to the BO Location, the LocationID attribute is filled with the ID of BO Location. All other ID fields (PartyID, InstalledBaseID and InstallationPointID) remain blank. If the address of a party is referenced (representative of a BusinessPartners or an OrganisationalCentre), the PartyID attribute is filled with the ID of the Party. All other ID fields (LocationID, InstalledBaseID and InstallationPointID) remain blank. The reference is kept in the AddressUUID attribute.

If there is an aggregation relationship to the address of an InstalledBase, the InstalledBaseID attribute is filled with the ID of the InstalledBase. All other ID fields (LocationID, PartyID and InstallationPointID) remain blank. The reference is kept in the AddressUUID InstalledBaseAddressInformationUUID attribute.

If there is an aggregation relationship to the address of an InstallationPoint, the InstallationPointID attribute is filled with the ID of the InstallationPoint. All other ID fields (LocationID, PartyID and InstalledBaseID) remain blank. The reference is kept in the AddressUUID attribute.

If an address is referenced via the element AddressUUID, then elements AddressBusinessObjectTypeCode and AddressHostTypeCode should also be filled.

A LocationStandardIdentification is standardized identification of a location.

A LocationStandardID is a GDT of type LocationStandardID which refers to Standardised identification of a Location. An instance of LocationStandardIdentification is always formed, if standard identifiers can be made available for a Location of a higher level than this instance. This can take place from the master data, the messages or by means of user interaction. A DO LocationAddress is the dependent object Address includes the data necessary to describe a physical or logical location. A BusinessTransactionDocumentReference is a reference to a different business document relevant for the SiteLogisticsRequisition. BusinessTransactionDocumentReference is of the data type SiteLogisticsRequisitionBusinessTransactionDocumentReferenceElements which includes BusinessTransactionDocumentReference and BusinessTransactionDocumentRelationshipRoleCode. A BusinessTransactionDocumentReference is a GDT of type BusinessTransactionDocumentReference which is a clear reference to other business documents that are important for the SiteLogisticsRequisition. Furthermore, a reference to an item within the same business document is possible and is optional. A BusinessTransactionDocumentRelationshipRoleCode is a GDT of type BusinessTransactionDocumentRelationshipRoleCode which is coded representation of the role the referenced document or referenced document item plays in relation to the SiteLogisticsRequisition and is optional.

There may be a number of Inbound Aggregation Relationships which include ProcurementPlanningOrder, SupplyPlanningRequirement, and SiteLogisticsRequest. From business object ProcurementPlanningOrder/node ProcurementPlanningOrder a ProcurementPlanningOrder has a cardinality of c:c. The planning relevant supply element that was created by this SiteLogisticsRequisition. From business object SupplyPlanningRequirement/node SupplyPlanningRequirement a SupplyPlanningRequirement has a cardinality of c:c. The planning relevant requirement that was created by this SiteLogisticsRequisition. From business object SiteLogisticsRequest/node SiteLogisticsRequestSiteLogisticsRequest has a cardinality of c:c. The SiteLogisticsRequest that was created according to the SiteLogisticsRequisition or the SiteLogisticsRequest that is the base of the SiteLogisticsRequisition. The SiteLogisticsRequisition can either have a reference to a PlannedExternalProcurementOrder or to a SupplyPlanningRequirement, but not both at the same time.

A DeliveryTerms is the conditions and agreements formulated when placing an order. These conditions and agreements should be effective for the execution of the items and/or for the necessary services and activities needed for the items. It is valid for all items that do not have their own DeliveryTerms. DeliveryTerms is of the data type SiteLogisticsRequisitionDeliveryTermsElements (derived from GDT DeliveryTerms) which includes DeliveryItemGroupID, DeliveryPriorityCode, Incoterms, OrderCombinationAllowedIndicator, PartialDeliveryControlCode, PartialDeliveryMaximumNumberValue, QuantityTolerance, TimeTolerance, MaximumLeadTimeDuration, PickupIndicator, and Description.

A DeliveryItemGroupID is a GDT of type BusinessTransactionDocumentItemGroupID which identifies a group of items that should be delivered together and is optional. A DeliveryPriorityCode is a GDT of type PriorityCode which refers to the priority of the deliveries and is optional. A Incoterms is a GDT of type Incoterms and is optional. Incoterms are typical contract formulations for delivery conditions that correspond to the rules defined by the International Chamber of Commerce (ICC). A OrderCombinationAllowedIndicator is a GDT of type Indicator which iIndicates if multiple orders can be combined into a single delivery and is optional. A PartialDeliveryControlCode is a GDT of type PartialDeliveryControlCode which is coded representation to control the partial delivery. The PartialDeliveryControlCode indicates whether to allow partial deliveries, a complete delivery at the requested date or a complete delivery and is optional. A PartialDeliveryMaximumNumberValue is a GDT of type NumberValue, Qualifier PartialDeliveryMaximum which specifies the maximum number of partial deliveries that can be carried out to deliver the requested quantity of the SiteLogisticsRequisitionRequestItems and is optional. A QuantityTolerance is a GDT of type QuantityTolerance which is the percentage that represents the tolerated difference between a requested and an actual delivered quantity as a percentage and is optional. A TimeTolerance is a GDT of type TimeTolerance which is the tolerated difference between the requested and the confirmed time, for example, shipping date and is optional. A MaximumLeadTimeDuration is a GDT of type Duration which is a maximum Time the delivery may last and is optional. A PickupIndicator is a GDT of type Indicator, Qualifier: Pickup which specifies, whether someone different (for example the goods recipient himself) shall be responsible for the process of transporting the goods to the goods recipient and is optional. A Description is a GDT of type Description which refers to the free text to describe additional delivery terms and is optional.

TransportationTerms are the conditions and agreements formulated by ordering. These conditions should be effective for the transport of the item and/or for the necessary services and activities needed for this transport. It is valid for all items that do not have their own TransportationTerms. TransportationTerms is of the data type SiteLogisticsRequisitionTransportationTermsElements (derived from GDT TransportationTerms) which includes TransportServiceLevelCode, TransportModeCode, TransportMeans, and Description. A TransportServiceLevelCode is a GDT of type TransportServiceLevelCode which is a coded representation of the agreed/defined services in terms of the transport of the delivery (as part of the ordered service) and is optional. For example, refrigeration or overnight delivery. A TransportModeCode is a GDT of type TransportModeCode which is a coded representation of the mode of transportation used for delivery and is optional. A TransportMeans is a GDT of type TransportMeans which is a means of transport and is optional. A Description is a GDT of type LONG_Description, Qualifier: TransportationTerms which is a natural-language representation of the characteristics of the transport conditions of a SiteLogisticsRequisition and is optional. A RequestItem is an item to request the execution of a site logistics process for a certain product.

RequestItem is of the data type SiteLogisticsRequisitionRequestItemElements which includes UUID, ID, TypeCode, LogisticsExecutionRequisitionItemActivityUUID, SystemAdministrativeData, SupplyPlanningAreaID, SupplyPlanningAreaUUID, RequestedQuantity, RequestedQuantityTypeCode, RequestedQuantityOriginCode, Status, DeliveryBlockingStatusCode, and CancellationStatusCode.

A UUID is a GDT of type UUID which is a universally unique identifier of the SiteLogisticsRequisitionRequestItem and is optional. A ID is a GDT of type BusinessTransactionDocumentItemID which is a unique identifier of the SiteLogisticsRequisitionRequestItem and is optional. A TypeCode is a GDT of type BusinessTransactionDocumentItemTypeCode which is a coded representation that specifies the type of the RequestItem. For example, Standard or Pickup. The following codes are used SiteLogisticsStandardItem and SiteLogisticsSparePartItem. A LogisticsExecutionRequisitionItemActivityUUID is a GDT of type UUID and is a unique identifier of the activity in the corresponding LogisticsExecutionRequisitionItem. A SystemAdministrativeData is a GDT of type SystemAdministrativeData which is administrative data that is stored in a system. This data includes system users and change dates/times. A SupplyPlanningAreaID is a GDT of type SupplyPlanningAreaID and is a unique identifier of SupplyPlanningArea, which is assigned in order to specify the SupplyPlanningArea for the RequestItem. A SupplyPlanningAreaUUID is a GDT of type UUID which a universally unique identifier of the supply planning area. A RequestedQuantity is a GDT of type Quantity which refers to the quantity with the corresponding unit of measure. A RequestedQuantityTypeCode is a GDT of type QuantityTypeCode which is a coded representation of the type of a quantity. A RequestedQuantityOriginCode is a GDT of type QuantityOriginCode which is coded representation of the origin of the quantity value. A Status is a GDT of type SiteLogisticsRequisitionRequestItemStatus and refers to the Status the SiteLogisticsRequisitionRequestItem. DeliveryBlockingStatusCode is a GDT of type NOTBLOCKEDBLOCKED_BlockingStatusCode, Qualifier: Delivery. A CancellationStatusCode is a GDT of type CancellationStatusCode which uses codes as Cancelled and Not Cancelled. A RequestItemDate 298116 has a cardinality of 1:n. A RequestItemLocation 298134 has a cardinality of 1:cn. A RequestItemBusinessTransactionDocumentReference 298152 has a cardinality of 1:cn. A RequestItemDeliveryTerms 298148 has a cardinality of 1:c. A RequestItemTransportationTerms 298150 has a cardinality of 1:c. A RequestItemProduct 298146 has a cardinality of 1:1

Associations for Navigation uses the RequestItemLocation node, the RequestItemDate node, and the RequestItemBusinessTransactionDocument node. A ShipFromLocation has a cardinality of has a cardinality of 1:c. A ShipToLocation has a cardinality of 1:c. A ArrivalPeriod has a cardinality of c:c. A AvailabilityPeriod has a cardinality of c:c. A PositioningPeriod has a cardinality of c:c. A IssuePeriod has a cardinality of c:c. A PickupPeriod has a cardinality of c:c. A LogisticsExecutionRequisitionItem has a cardinality of c:c. A PurchaseOrderItem has a cardinality of c:c. A PlanningViewOnPurchaseOrderItem has a cardinality of c:c. A SalesOrderItem has a cardinality of c:c. A CustomerRequirementItem has a cardinality of c:c. A ServiceOrderItem has a cardinality of c:c. A ConfirmationItem has a cardinality of c:cn.

There may be a number of Inbound Aggregation Relationships which includes ItemActivity and SupplyPlanningArea. From business object LogisticsExecutionRequisition/node ItemActivity, ItemActivity which is the activity in the LogisticsExecutionRequestItem that triggered the site logistics requisition item has a cardinality of 1:c. From business object SupplyPlanningArea/node root, SupplyPlanningArea refers to the supply planning area in the SiteLogisticsRequisitionRequestItem that holds site logistics requisition item and has a cardinality of 1:cn.

Inbound Association Relationships refers to CreationIdentity and LastChangeIdentity. From business object Identity/node Root, CreationIdentity identifies the identity that has created the SiteLogisticsRequisitionRequestItem and has a cardinality of 1:cn. A LastChangeIdentity has a cardinality of 1:cn which identifies the identity that has changed the SiteLogisticsRequisitionRequestItem last.

The query provides a list of SiteLogisticsRequisitionRequestItems that contain the entered document reference.

GDT: SiteLogisticsRequisitionRequestItemItemReferencedDocumentQueryElements defines the query elements BusinessTransactionDocumentReferenceLogisticsExecutionRequisitionItemReference, BusinessTransactionDocumentReferencePurchaseOrderItemReference, BusinessTransactionDocumentReferencePlanningViewOnPurchaseOrderItemReference, BusinessTransactionDocumentReferenceSalesOrderItemReference, BusinessTransactionDocumentReferenceCustomerRequirementItemReference, and BusinessTransactionDocumentReferenceServiceOrderItemReference. A BusinessTransactionDocumentReferenceLogisticsExecutionRequisitionItemReference is a GDT of type BusinessTransactionDocumentReference. A BusinessTransactionDocumentReferencePurchaseOrderItemReference is a GDT of type BusinessTransactionDocumentReference. A BusinessTransactionDocumentReferencePlanningViewOnPurchaseOrderItemReference is a GDT of type BusinessTransactionDocumentReference. A BusinessTransactionDocumentReferenceSalesOrderItemReference is a GDT of type BusinessTransactionDocumentReference. A BusinessTransactionDocumentReferenceCustomerRequirementItemReference is a GDT of type BusinessTransactionDocumentReference. A BusinessTransactionDocumentReferenceServiceOrderItemReference is a GDT of type BusinessTransactionDocumentReference and is optional.

A RequestItemDate is a time period specification (based on the day month and year) for a RequestItem of a SiteLogisticsRequisition. RequestItemDate is of the data type SiteLogisticsRequisitionRequestItemDateElements which includes a PeriodRoleCode.

A PeriodRoleCode is a GDT of type PeriodRoleCode which is coded representation of the semantic of a time point period in the RequestItem. The following codes may be used ArrivalPeriod, AvailabilityPeriod, PositioningPeriod, IssuePeriod, PickupPeriod, and TimePointPeriod. An ArrivalPeriod refers to the period that the goods arrive. An AvailabilityPeriod refers to the period that is needed to make the material available. A PositioningPeriod refers to the period that is needed to make the material available in the warehouse. An IssuePeriod refers to the period that the goods are issued. A PickupPeriod refers to the period that the goods are collected. A TimePointPeriod is a GDT of type TimePointPeriod which is the time point period with a relevance to the RequestItem.

AvailabilityPeriod may occur in inbound case

PositioningPeriod may occur in outbound case.

A RequestItemLocation is a source or destination location for a good or material that is to move by site logistics according to the SiteLogisticsRequisitionRequestItem. A Location may keep a reference to a business object Location. A Location may keep a reference to an address. A Location may keep a reference to a business partner or one of its specializations (for example customer or supplier). A Location may keep a reference to one of the following specializations of an organisational unit:

ReportingLineUnite. The LocationRole describes the role of a Location in the site logistics process. If the requested items have the same location, then the Location node at the header level is used for the source or destination location.

If the requested items have different locations, then the RequestItemLocation node at the item level is used for the source or destination location. The elements located directly at the node RequestItemLocation are defined by the data type SiteLogisticsRequisitionRequestItemLocationElements which includes LocationID, LocationUUID, AddressReference, AddressHostUUID, BusinessObjectTypeCode, AddressHostTypeCode, PartyKey, InstalledBaseID, InstallationPointID, RoleCategoryCode, and RoleCode.

A LocationID is a GDT of type LocationID (without additional components, such as schemeAgencyID)) which is the identifier of the Location in this LocationRole and is optional. If a location, business partner or organizational unit are referenced, the attribute contains their identifiers. If an unidentified identifier is, for example, entered by the user, the attribute contains this identifier.

A LocationUUID is a GDT of type UUID which is a unique identifier for a location, business partner, the organizational unit, or their specializations and is optional. A AddressReference is a IDT of type ObjectNodeLocationAddressReference) which is the information to reference the address of a Party, an InstalledBase or an InstallationPoint and is optional. A AddressHostUUID is a GDT of type UUID which is a universally unique identifier of the address of the business partner, the organizational unit or its specializations, the BO InstalledBase or the BO InstallationPoint. A BusinessObjectTypeCode is a GDT of type BusinessObjectTypeCode which is the coded representation of the BusinessObjectTypes of the business object, in which the address referenced in Element LocationAddressUUID is integrated as a Dependent Object. A AddressHostTypeCode is a GDT of type AddressHostTypeCode which is coded representation of the address host type of the address referenced by AddressUUID or the address included via the LocationAddress composition. A PartyKey is a GDT of type PartyKey which is an alternative Identifier of a Party (represents a business partner or an organizational unit), that reference the address via AddressUUID. An InstalledBaseID is a GDT of type InstalledBaseID which is an Identifier of the BO InstalledBase, that reference the address via AddressUUID. A InstallationPointID is a GDT of type InstallationPointID which is an Identifier of the BO InstallationPoint, that reference the address via AddressUUID. A RoleCategoryCode is a GDT of type LocationRoleCategoryCode which is a Location Role Category of the Location. The following codes are used ShipFromLocation, ShipToLocation, and RoleCode. A ShipFromLocation refers to the Location from where a good is shipped. A ShipToLocation refers to the Location to where a good is shipped. A RoleCode is a GDT of type LocationRoleCode and refers to the Location Role of the Location. A RequestItemLocationStandardIdentification 298136 has a cardinality of 1:c. A RequestItemLocationAddress 298138 has a cardinality of 1:c.

There are a number of Inbound Aggregation Relationships which includes Location, PartyAddressInformation, InstalledBaseAddressInformation, and InstallationPointAddressInformation. From business object Location/node Root, Location has a cardinality of c:cn. From business object Party/node AddressInformation, PartyAddressInformation has a cardinality of c:cn and refers to the AddressInformation of a representative of a Business Partner or Organizational Centre corresponding to the Location. From business object InstalledBase/node AddressInformation, InstalledBaseAddressInformation has a cardinality of c:cn and refers to the AddressInformation of an Installed Base corresponding to the Location. From business object InstallationPoint/node AddressInformation, InstallationPointAddressInformation has a cardinality of c:cn which refers to the AddressInformation of an Installation Point corresponding to the Location.

UsedAddress has a cardinality of c:cn. The address that is integrated via the composition relationship LocationAddress. You can see which of the two cases applies by looking at the element AddressHostTypeCode. The instance of the TO UsedAddress represents this address. The association is implemented.

For example, the elements AddressBusinessObjectTypeCode, AddressUUID and AddressHostTypeCode are used to determine the Node ID of the node in the master data object, which holds the composition relationship with DO Address, which is to be represented by TO UsedAddress. Furthermore, the following information is sent to the TO UsedAddress in the implemented address:

The fact that it is a master data address;

the BusinessObjectTypeCode, BusinessObjectNodeTypeCode and Node ID of the own <BO-Node>Location node. This are required if changes are made to the TO UsedAddress. In this case the TO UsedAddress copies the master data address, the changes are applied and the corresponding DO Address is generated on the <BO-Node>Location node via the composition relationship LocationAddress.

For example, the BusinessObjectTypeCode, BusinessObjectNodeTypeCode and Node ID of the own <BO-Node>Location are communicated to the TO UsedAddress. Whether or not it is a referenced address is also included. In this case, the TO UsedAddress represents the DO Address that is integrated via the composition relationship on the <BO-Node>Location node. There can be either just one aggregation or composition relationship to the dependent object. If there is an aggregation relationship to the BO Location, the LocationID attribute is filled with the ID of BO Location. All other ID fields (PartyID, InstalledBaseID and InstallationPointID) remain blank. If the address of a party is referenced (representative of a BusinessPartners or an OrganisationalCentre), the PartyID attribute is filled with the ID of the Party. All other ID fields (LocationID, InstalledBaseID and InstallationPointID) remain blank. The reference is kept in the AddressUUID attribute. If there is an aggregation relationship to the address of an InstalledBase, the InstalledBaseID attribute is filled with the ID of the InstalledBase. All other ID fields (LocationID, PartyID and InstallationPointID) remain blank. The reference is kept in the AddressUUID InstalledBaseAddressInformationUUID attribute. If there is an aggregation relationship to the address of an InstallationPoint, the InstallationPointID attribute is filled with the ID of the InstallationPoint. All other ID fields (LocationID, PartyID and InstalledBaseID) remain blank. The reference is kept in the AddressUUID attribute.

If an address is referenced via the element AddressUUID, then elements AddressBusinessObjectTypeCode and AddressHostTypeCode may also be filled.

A RequestItemLocationStandardIdentification is standardized identification of a location.

A LocationStandardID is a GDT of type LocationStandardID which is Standardised identification of a Location. An instance of RequestItemLocationStandardIdentification is formed, if standard identifiers can be made available for a RequestItemLocation of a higher level than this instance. This can take place from the master data, the messages or by means of user interaction. A DO RequestItemLocationAddress refers to the dependent object Address includes the data necessary to describe a physical or logical location and is defined in the dependent object address. A RequestItemBusinessTransactionDocumentReference is a reference to a different business document or to the item of a different business document that is relevant for the SiteLogisticsRequisitionrequestItem. A RequestItemBusinessTransaction DocumentReference is of the data type SiteLogisticsRequisitionRequestItemBusinessTransactionDocumentReferenceElements which includes BusinessTransactionDocumentReference and BusinessTransactionDocumentRelationshipRoleCode. A BusinessTransactionDocumentReference is a GDT of type BusinessTransactionDocumentReference which is a clear reference to other business documents that are important for the SiteLogisticsRequisitionRequestItem. Furthermore, a reference to an item within the same business document is possible. A BusinessTransactionDocumentRelationshipRoleCode is a GDT of type BusinessTransactionDocumentRelationshipRoleCode which is coded representation of the role the referenced document or referenced document item plays in relation to the SiteLogisticsRequisition.

There are a number of Inbound Aggregation Relationships including LogisticsExecutionRequisitionItem, PurchaseOrderItem, PlanningViewOnPurchaseOrderItem, SalesOrderItem, ServiceOrderItem, and CustomerRequirementItem. From business object LogisticsExecutionRequisition/node LogisticsExecutionRequisitionItem, LogisticsExecutionRequisitionItem has a cardinality of 1:c which is the item of the LogisticsExecutionRequisition that triggered the SiteLogisticsRequisitionItem. From business object PurchaseOrder/node PurchaseOrderItem, PurchaseOrderItem has a cardinality of c:n and refers to the item of the PurchaseOrder. From business object PlanningViewOnPurchaseOrder/node PlanningViewOnPurchaseOrderItem, PlanningViewOnPurchaseOrderItem has a cardinality of c:n and refers to the item of PlanningViewOnPurchaseOrder. From business object SalesOrder/node, SalesOrderItem has a cardinality of c:n. From business object CustomerRequirement/node AvailabilityConfirmationItem, CustomerRequirementItem has a cardinality of c:n and refers to the item of the CustomerRequirement.

RequestItemDeliveryTerms is the conditions and agreements formulated when placing an order for an item. These conditions and agreements should be effective for the execution of the request and/or for the necessary services and activities needed for this request. RequestItemDeliveryTerms is of the data type: SiteLogisticsRequisitionRequestItemDeliveryTermsElements (derived from GDT DeliveryTerms) which includeDeliveryItemGroupID, DeliveryPriorityCode, Incoterms, OrderCombinationAllowedIndicator, PartialDeliveryControlCode, PartialDeliveryMaximumNumberValue, QuantityTolerance, TimeTolerance, MaximumLeadTimeDuration, PickUpIndicator, and Description. A DeliveryItemGroupID is a GDT of type BusinessTransactionDocumentItemGroupID which identifies a group of items that should be delivered together and is optional. A DeliveryPriorityCode is a GDT of type PriorityCode which refers to the priority of the deliveries and is optional. Incoterms is a GDT of type Incoterms and is optional. Incoterms are typical contract formulations for delivery conditions that correspond to the rules defined by the International Chamber of Commerce (ICC). An OrderCombinationAllowedIndicator is a GDT of type Indicator which indicates if multiple orders can be combined into a single delivery. PartialDeliveryControlCode is coded representation to control the partial delivery and is optional. The PartialDeliveryControlCode indicates whether to allow partial deliveries, a complete delivery at the requested date or a complete delivery. A PartialDeliveryMaximumNumberValue is a GDT of type NumberValue, Qualifier PartialDeliveryMaximum which specifies the maximum number of partial deliveries that can be carried out to deliver the requested quantity of the SiteLogisticsRequisitionRequestItems and is optional.

A QuantityTolerance is a GDT of type QuantityTolerance with a percentage that represents the tolerated difference between a requested and an actual delivered quantity as a percentage and is optional.

A MaximumLeadTimeDuration is a GDT of type Duration which describes a maximum Time the delivery may last and is optional. A PickupIndicator is a GDT of type Indicator, Qualifier: Pickup. A Description is a GDT of type Description which is free text to describe additional delivery terms.

RequestItemTransportationTerms are the conditions and agreements formulated by ordering; these conditions and agreements should be effective for the transport of the item and/or for the necessary services and activities needed for this transport. RequestItemTransportationTerms is of the data type: SiteLogisticsRequisitionRequestItemTransportationTermsElements (derived from GDT TransportationTerms) Elements which includes TransportServiceLevelCode, TransportModeCode, TransportMeans, and Description. A TransportServiceLevelCode is a GDT of type TransportServiceLevelCode and is optional. A coded representation of the agreed/defined services in terms of the transport of the delivery (as part of the ordered service). For example, refrigeration or overnight delivery. A TransportModeCode is a GDT of type TransportModeCode which is a coded representation of the mode of transportation used for delivery and is optional. A TransportMeans is a GDT of type TransportMeans which is a means of transport and is optional.

A Description is a GDT of type LONG_Description, Qualifier: TransportationTerms which is a natural-language representation of the characteristics of the transport conditions of a SiteLogisticsRequisition and is optional.

RequestItemProduct is the identification, description and classification of the requested product of a RequestItem. SiteLogisticsRequisitionRequestItemProductElements which includes ProductUUID, ProductID, and ProductTypeCode. A ProductUUID is a GDT of type UUID and is a universally unique identifier of the Product, which is assigned in order to reference the planned or completed delivery for the product and is optional. A ProductID is a GDT of type ProductID which is a unique identifier for a product. A ProductTypeCode is a GDT of type ProductTypeCode which is a coded representation of the product type. A product type describes the nature of products and determines the basic characteristics for products of this type.

There may be a number of Aggregation Relationships including Material. From business object Product/node Product, Material has a cardinality of c:cn.

ConfirmationItem is an item to confirm the execution of a site logistics process for a certain product. In general a ConfirmationItem belongs to a RequestItem though the existence of a ConfirmationItem that does not belong to a RequestItem is possible: In this case site logistics confirms the execution of a site logistics process for a product that was not requested (for example, if an ASN indicates the delivery of product that has not been ordered). It is also possible that multiple ConfirmationItems exist that belong to the same RequestItem, for example if site logistics decides to split a delivery ConfirmationItem is of the data type: SiteLogisticsRequisitionConfirmationItemElements which includes UUID, ID, TypeCode, PlanningRelevanceIndicator, SystemAdministrativeData, SupplyPlanningAreaID, SupplyPlanningAreaUUID, RequestItemUUID, and Status.

A UUID is a GDT of type UUID which is universally unique identifier of the ConfirmationItem for referencing purposes. A ID is a GDT of type BusinessTransactionDocumentItemID and describes an identifier of the ConfirmationItem. A TypeCode is a GDT of type BusinessTransactionDocumentItemTypeCode which is a coded representation that specifies the type of the ConfirmationItem. For example, Standard or Pickup. ConfirmationItem uses the codes, SiteLogisticsStandardItem and SiteLogisticsSparePartItem A PlanningRelevanceIndicator is a GDT of type Indicator, Qualifier: Relevance which indicates whether the ConfirmationItem is relevant for planning. A SystemAdministrativeData is a GDT of type SystemAdministrativeData in which administrative data that is stored in a system. This data includes system users and change dates/times. A SupplyPlanningAreaID is a GDT of type SupplyPlanningArea and refers to a unique identifier of SupplyPlanningArea, which is assigned in order to specify the SupplyPlanningArea for the ConfirmationItem. A SupplyPlanningAreaUUID is a GDT of type UUID which describes the universally unique identifier of the supply planning area. A RequestItemUUID is a GDT of type UUID which describes the universally unique identifier of the RequestItem that is confirmed by the ConfirmationItem. A Status is a GDT of type SiteLogisticsRequisitionConfirmationItemStatus that describes the status the SiteLogisticsRequisitionConfirmationItem and is optional. A SiteLogisticsProcessingStatusCode is a GDT of type NOTSTARTEDINPROCESSFINISHED_ProcessingStatusCode, Qualifier: SiteLogistics.

A ConfirmationItemDate 298156 has a cardinality of 1:n. A ConfirmationItemLocation 298160 has a cardinality of 1:cn.

A ConfirmationItemBusinessTransactionDocumentReference 298168 has a cardinality of 1:cn. A ConfirmationItemQuantity 298166 has a cardinality of 1:n. A ConfirmationItemProduct 298164 has a cardinality of 1:1.

(Specialization) associations for Navigation includes the ConfirmationItemLocation node, the ConfirmationItem node, the ConfirmationItemBusinessTransactionDocumentReference node, and the ConfirmationItemQuantity node. A ShipFromLocation has the cardinality of 1:c. A ShipToLocation has the cardinality of 1:c. A ArrivalPeriod has the cardinality of c:c. An AvailabilityPeriod has the cardinality of c:c. A PositioningPeriod has the cardinality of c:c. A IssuePeriod has the cardinality of c:c. A PickupPeriod has the cardinality of c:c. A SiteLogisticsConfirmationInventoryChangeItem has the cardinality of c:c. A PurchaseOrderItem has the cardinality of c:c. A ProcurementPlanningOrderItem has the cardinality of c:c.

A SalesOrderItem has the cardinality of c:c. A SupplyPlanningRequirementItem has the cardinality of c:c. A SiteLogisticsRequestConfirmationItem has the cardinality of c:c. A ServiceOrderItem has the cardinality of c:c. A ConfirmedQuantity has the cardinality of 1:c. A WorkInProcessQuantity has the cardinality of 1:c. A FulfilledQuantity has the cardinality of 1:c. A ForwardedQuantity has the cardinality of 1:c There may be a number of Inbound Aggregation Relationships including RequestItem and SupplyPlanningArea. From business object SiteLogisticsRequisition/node RequestItem, RequestItem is a cardinality of c:cn. RequestItem that is confirmed by the ConfirmationItem. From business object SupplyPlanningArea/node root, SupplyPlanningArea has a cardinality of c:cn. There are a number of Inbound Association Relationships including CreationIdentity and LastChangeIdentify. From business object Identity/node Root, CreationIdentity has a cardinality of 1:cn and identifies the identity that has created the SiteLogisticsRequisitionConfirmationItem.

A LastChangeIdentity has a cardinality of 1:cn and identifies the identity that has changed the SiteLogisticsRequisitionConfirmationItem last.

QueryByElements is the query which provides a list of all SiteLogisticsRequisitionConfirmationItems that satisfy the selection criteria specified by the query elements.

GDT: SiteLogisticsRequisitionConfirmationItemElementsQueryElements defines the query elements and includes ProductProductID, ProductProductUUID, SupplyPlanningAreaID, SupplyPlanningAreaUUID, and PlanningRelevanceIndicator. A ProductProductID is a GDT of type ProductID and is optional. A ProductProductUUID is a GDT of type UUID and is optional. A SupplyPlanningAreaID is a GDT of type SupplyPlanningAreaID and is optional. A SupplyPlanningAreaUUID is a GDT of type UUID and is optional. A PlanningRelevanceIndicator is a GDT of type Indicator, Qualifier: Relevance and is optional.

QueryByItemReferencedDocument refers to the query which provides a list of SiteLogisticsRequisitionConfirmationItems that contain the entered document reference and is a GDT of type SiteLogisticsRequisitionConfirmationItemItemReferencedDocumentQueryElements defines the query elements including BusinessTransactionDocumentReferencePurchaseOrderItemReference, BusinessTransactionDocumentReferenceSalesOrderItemReference, BusinessTransactionDocumentReferenceServiceOrderItemReference, BusinessTransactionDocumentReferenceSiteLogisticsConfirmationInventoryChangeItemReference, BusinessTransactionDocumentReferenceProcurementPlanningOrderItemReference, BusinessTransactionDocumentReferenceSupplyPlanningRequirementItemReference, and BusinessTransactionDocumentReferenceSiteLogisticsRequestConfirmationItemReference. A BusinessTransactionDocumentReferencePurchaseOrderItemReference is a GDT of type BusinessTransactionDocumentReference and is optional. A BusinessTransactionDocumentReferenceSalesOrderItemReference is a GDT of type BusinessTransactionDocumentReference and is optional. A BusinessTransactionDocumentReferenceServiceOrderItem Reference is a GDT of type BusinessTransactionDocumentReference and is optional. A BusinessTransactionDocumentReferenceSiteLogisticsConfirmationInventoryChangeItemReference si a GDT of type BusinessTransactionDocumentReference and is optional. A BusinessTransactionDocumentReferenceProcurementPlanningOrderItemReference is a GDT of type BusinessTransactionDocumentReference and is optional. A BusinessTransactionDocumentReferenceSupplyPlanningRequirementItemReference is a GDT of type BusinessTransactionDocumentReference and is optional. A BusinessTransactionDocumentReferenceSiteLogisticsRequestConfirmationItemReference is a GDT of type BusinessTransactionDocumentReference and is optional. ConfirmationItemDate is a time period specification (based on the day month and year) for a ConfirmationItem of a SiteLogisticsRequisition.

ConfirmationItemDate is of the data type SiteLogisticsRequisitionConfirmationItemDateElements which includes PeriodRoleCode and TimePointPeriod. A PeriodRoleCode is a GDT of type PeriodRoleCode which is coded representation of the semantic of a time point period in the ConfirmationItem. A ConfirmationItem uses the following codes; ArrivalPeriod, AvailabilityPeriod, PositioningPeriod, IssuePeriod, and PickupPeriod. An ArrivalPeriod describes the Period that the goods arrive. An AvailabilityPeriod describes the Period that is needed to make the material available. A PositioningPeriod describes the Period that is needed to make the material available in the warehouse. A IssuePeriod describes the Period that the goods are issued. A PickupPeriod describes the Period that the goods are collected. A TimePointPeriod is a GDT of type TimePointPeriod and describes Time point period with a relevance to the ConfirmationItem.

AvailabilityPeriode only may occur in inbound case.

PositioningPeriode only may occur in outbound case.

ConfirmationItemLocation is a source or destination location for a good or material that is to move by site logistics according to the SiteLogisticsRequisitionConfirmationItem. A Location may keep a reference to a business object Location. A Location may keep a reference to an address. A Location may keep a reference to a business partner or one of its specializations (for example customer or supplier). A Location may keep a reference to one of the following specializations of an organisational unit: ReportingLineUnite. The LocationRole describes the role of a Location in the site logistics process and describes elements located directly at the node ConfirmationItemLocation are defined by the data type SiteLogisticsRequisitionConfirmationItemLocationElements and includes LocationID, LocationUUID, AddressReference, AddressHostUUID, BusinessObjectTypeCode, AddressHostTypeCode, PartyKey, InstalledBaseID, InstallationPointID, RoleCategoryCode, and RoleCode. A LocationID is a GDT of type LocationID (without additional components, such as schemeAgencyID)) which is the identifier of the Location in this LocationRole and is optional. If a location, business partner or organizational unit are referenced, the attribute contains their identifiers. If an unidentified identifier is, for example, entered by the user, the attribute contains this identifier. A LocationUUID is a GDT of type UUID which is a unique identifier for a location, business partner, the organizational unit, or their specializations and is optional. An AddressReference is a IDT of type ObjectNodeLocationAddressReference and is optional. The information to reference the address of a Party, an InstalledBase or an InstallationPoint. An AddressHostUUID is a GDT of type UUID and is a universally unique identifier of the address of the business partner, the organizational unit or its specializations, the BO InstalledBase or the BO InstallationPoint and is optional. A BusinessObjectTypeCode is a GDT of type BusinessObjectTypeCode which is the coded representation of the BusinessObjectTypes of the business object, in which the address referenced in Element LocationAddressUUID is integrated as a Dependent Object. An AddressHostTypeCode is a GDT of type AddressHostTypeCode which is the coded representation of the address host type of the address referenced by AddressUUID or the address included via the LocationAddress composition. A PartyKey is a GDT of type PartyKey which is an alternative Identifier of a Party (represents a business partner or an organizational unit), that reference the address via AddressUUID. An InstalledBaseID is a GDT of type InstalledBaseID is an identifier of the BO InstalledBase, that reference the address via AddressUUID. An InstallationPointID is a GDT of type InstallationPointID which is an identifier of the BO InstallationPoint, that reference the address via AddressUUID. A RoleCategoryCode is a GDT of type LocationRoleCategoryCode which is the Location Role Category of the Location for which the following codes are used; ShipFromLocation, ShipToLocation, and RoleLocation. A ShipFromLocation is a Location from where a good is shipped. A ShipToLocation is a Location to where a good is shipped. A RoleCode is a GDT of type LocationRoleCode which refers to the Location Role of the Location.

A ConfirmationItemLocationStandardIdentification 298158 has a cardinality of 1:c. A ConfirmationItemLocationAddress 298162 has a cardinality of 1:c.

Composition to Dependent Object Address

There may be a number of Inbound Aggregation Relationships including Location, PartyAddressInformation, InstalledBaseAddressInformation, and InstallationPointAddressInformation, From business object Location/node Root, Location has a cardinality of c:cn and is the location corresponding to the Location. From business object Party/node AddressInformation, PartyAddressInformation has a cardinality of c:cn. AddressInformation of a representative of a Business Partner or Organizational Centre corresponding to the Location. From business object InstalledBase/node AddressInformation, InstalledBaseAddressInformation has a cardinality of c:cn. AddressInformation of an Installed Base corresponding to the Location. From business object InstallationPoint/node AddressInformation, InstallationPointAddressInformation has a cardinality of c:cn. AddressInformation of an Installation Point corresponding to the Location UsedAddress has a cardinality of c:cn. The address that is integrated via the composition relationship LocationAddress.

You can see which of the two cases applies by looking at the element AddressHostTypeCode. The instance of the TO UsedAddress represents this address. The association is implemented.

For example, the elements AddressBusinessObjectTypeCode, AddressUUID and AddressHostTypeCode are used to determine the Node ID of the node in the master data object, which holds the composition relationship with DO Address, which is to be represented by TO UsedAddress. Furthermore, the following information is sent to the TO UsedAddress in the implemented address:

The fact that it is a master data address; the BusinessObjectTypeCode, BusinessObjectNodeTypeCode and Node ID of the own <BO-Node>Location node. This are required if changes are made to the TO UsedAddress. In this case the TO UsedAddress copies the master data address, the changes are applied and the corresponding DO Address is generated on the <BO-Node>Location node via the composition relationship LocationAddress.

For example, the BusinessObjectTypeCode, BusinessObjectNodeTypeCode and Node ID of the own <BO-Node>Location are communicated to the TO UsedAddress. Whether or not it is a referenced address is also included. In this case, the TO UsedAddress represents the DO Address that is integrated via the composition relationship on the <BO-Node>Location node.

There can be either just one aggregation or composition relationship to the dependent object. If there is an aggregation relationship to the BO Location, the LocationID attribute is filled with the ID of BO Location. All other ID fields (PartyID, InstalledBaseID and InstallationPointID) remain blank. If the address of a party is referenced (representative of a BusinessPartners or an OrganisationalCentre), the PartyID attribute is filled with the ID of the Party. All other ID fields (LocationID, InstalledBaseID and InstallationPointID) remain blank. The reference is kept in the AddressUUID attribute. If there is an aggregation relationship to the address of an InstalledBase, the InstalledBaseID attribute is filled with the ID of the InstalledBase. All other ID fields (LocationID, PartyID and InstallationPointID) remain blank. The reference is kept in the AddressUUID InstalledBaseAddressInformationUUID attribute. If there is an aggregation relationship to the address of an InstallationPoint, the InstallationPointID attribute is filled with the ID of the InstallationPoint. All other ID fields (LocationID, PartyID and InstalledBaseID) remain blank. The reference is kept in the AddressUUID attribute. If an address is referenced via the element AddressUUID, then elements AddressBusinessObjectTypeCode and AddressHostTypeCode should also be filled.

ConfirmationItemLocationStandardIdentification is standardized identification of a location.

A LocationStandardID is a GDT of type LocationStandardID which is the standardized identification of a Location. An instance of ConfirmationItemLocationStandardIdentification is formed, if standard identifiers can be made available for a ConfirmationItemLocation of a higher level than this instance. This can take place from the master data, the messages or by means of user interaction. A DO ConfirmationItemLocationAddress is the dependent object Address includes the data necessary to describe a physical or logical location and is defined in the dependent object address. A ConfirmationItemBusinessTransactionDocumentReference is a reference to a different business document or to the item of a different business document relevant for the SiteLogisticsRequisitionConfirmationItem. ConfirmationItemBusinessTransaction DocumentReference is of the data type SiteLogisticsRequisitionConfirmationItemBusinessTransactionDocument ReferenceElements which includes BusinessTransactionDocumentReference and BusinessTransactionDocumentRelationshipRoleCode. A BusinessTransactionDocumentReference is a GDT of type BusinessTransactionDocumentReference which is a clear reference to other business documents that are important for the SiteLogisticsRequisitionConfirmationItem. Furthermore, a reference to an item within the same business document is possible. A BusinessTransactionDocumentRelationshipRoleCode is a GDT of type BusinessTransactionDocumentRelationshipRoleCode which is coded representation of the role the referenced document or referenced document item plays in relation to the SiteLogisticsRequisition and is optional.

A ConfirmationItemActualValue has a cardinality of 1:c.

There are a number of Inbound Aggregation Relationships which includes SiteLogisticsConfirmationInventoryChangeItem, SiteLogisticsRequestConfirmationItem, ProcurementPlanningOrderItem, PurchaseOrderItem, SupplyPlanningRequirementItem, SalesOrderItem, and ServiceOrderItem. From business object SiteLogisticsConfirmation/node SiteLogisticsConfirmationInventoryChangeItem, SiteLogisticsConfirmationInventoryChangeItem has a cardinality of c:cn. From business object SiteLogisticsRequest/node SiteLogisticsRequestConfirmationItem, SiteLogisticsRequestConfirmationItem has a cardinality of c:c. From business object ProcurementPlanningOrder/node, ProcurementPlanningOrderItem has a cardinality of c:c. The planning relevant supply element item that was created by this SiteLogisticsRequisitionConfirmationItem. From business object PurchaseOrder/node, PurchaseOrderItem has a cardinality of c:n. From business object SupplyPlanningRequirement/node, SupplyPlanningRequirementItem has a cardinality of c:c. The planning relevant requirement item that was created by this SiteLogisticsRequisitionConfirmationItem. From business object SalesOrder/node SalesOrderItem, SalesOrderItem has a cardinality of c:n. From business object ServiceOrder/node ServiceOrderItem, ServiceOrderItem has a cardinality of c:n.

The SiteLogisticsRequisitionConfirmationItem can either have a reference to a PlannedExternalProcurementOrderItem or to a SupplyPlanningRequirementItem but not both simultaneously. It may not be possible for two separate SiteLogisticsRequisitionConfirmationItems to have a reference to a PlannedExternalProcurementOrderItem and the other to a SupplyPlanningRequirementItem. The composition to the actual value can only exist, if the reference is a reference to a SiteLogisticsConfirmationInventoryChangeItem. A ConfirmationItemBusinessTransactionDocumentReferenceActualValue is the ConfirmationItemBusinessTransactionDocumentReferenceActualValue and are actually achieved values, i.e. quantity and date for a confirmationItemBusinessTransactionDocumentReference. It represents the fulfilment.

The elements located directly at the node ConfirmationItemBusinessTransactionDocumentReferenceActualValue are defined by the data type: which includes FulfilledQuantity, FulfilledQuantityTypeCode, FulfilledQuantityOriginCode, TransactionTimePoint, DocumentCancellationIndicator, and CancelledSiteLogisticsConfirmationInventoryChangeItemReference.

A FulfilledQuantity is a GDT of type Quantity, Qualifier: Fulfilled which is the fulfilled quantity with the corresponding unit of measure. A FulfilledQuantityTypeCode is a GDT of type QuantityTypeCode, Qualifier Fulfilled which is coded representation of the type of a quantity and is optional. A FulfilledQuantityOriginCode is a GDT of type QuantityOriginCode which is coded representation of the origin of the quantity value and is optional. A TransactionTimePoint is a GDT of typeTimePoint, Qualifier: Transaction which is a point in time indicating when the reported changes were performed. A DocumentCancellationIndicator is a GDT of type Indicator, Qualifier Cancellation. A CancelledSiteLogisticsConfirmationInventoryChangeItemReference is a GDT of type BusinessTransactionDocumentReference which is a reference to a cancelled Site Logistics Confirmation Inventory Change Item.

The node ActualValue 298170 may exists when the reference is a reference to SiteLogisticsConfirmationInventoryChangeItem. ConfirmationItemQuantity is the quantity that has been confirmed. ConfirmationItemQuantity is of the data type SiteLogisticsRequisitionConfirmationItemQuantityElements which includes Quantity, QuantityTypeCode, QuantityRoleCode and QuantityOriginCode. A Quantity is a GDT of type Quantity and describes the quantity with the corresponding unit of measure. A QuantityTypeCode is a GDT of type QuantityTypeCode which is coded representation of the type of a quantity. A QuantityRoleCode is a GDT of type QuantityRoleCode which is coded representation of the role of a quantity and uses the following codes; ConfirmedQuantity, WorkInProcessQuantity, FulfilledQuantity, and ForwardedQuantity. A QuantityOriginCode is a GDT of type QuantityOriginCode which is a coded representation of the origin of the quantity value.

The ConfirmedQuantity should not be less than the FulfilledQuantity.

If the ConfirmationItemProduct is the same as the RequestItemProduct the ForwardedQuantity shall be equal to the ConfirmedQuantity.

A ConfirmationItemProduct is the identification, description and classification of the confirmed product. ConfirmationItemProduct is of the data type SiteLogisticsRequisitionConfirmationItemProductElements which includes ProductUUID and ProductID. A ProductUUID is a GDT of type UUID which is a universally unique identifier of the product, which is assigned in order to reference the planned or completed delivery of the ConfirmationItem. A ProductID is a GDT of type ProductID which is a unique identifier for a product. A ProductTypeCode is a GDT of type ProductTypeCode is a coded representation of the product type. A product type describes the nature of products and determines the basic characteristics for products of this type of Material.

There may be a number of Inbound Aggregation Relationships including Material. From business object Product/node Product, Material has a cardinality of c:cn.

Business Object SupplyPlanningRequirement

FIG. 299 illustrates one example of an SupplyPlanningRequirement business object model 299008. Specifically, this model depicts interactions among various hierarchical components of the SupplyPlanningRequirement, as well as external components that interact with the SupplyPlanningRequirement (shown here as 299000 through 299006 and 299010 through 299024).

In some implementations, a SupplyPlanningRequirement can be a requirement that is derived from a business document, such as a sales order, an internal requirement, or a scheduling agreement, and to which details on the anticipated availability date have been added. The SupplyPlanningRequirement can include the material quantities required on specific dates, as well as information on which quantities are available on which dates. The business object SupplyPlanningRequirement is part of the process component Supply and Demand Matching.

A SupplyPlanningRequirement includes, for example, items of the SupplyPlanningRequirement 299026 with the item information and its dependent data (e.g., the production information). In some examples, schedule lines for an item that specify when the materials are to be provided and in which quantity. Confirmations for an item that specify when materials are available and in which quantity.

A requirement derived from a business document can provide a certain quantity of materials at a fixed date. In some examples, the SupplyPlanningRequirement includes the items belonging to this requirement, its status as well as references. The SupplyPlanningRequirement can include identifying and administrative information.

The elements located at the node SupplyPlanningRequirement can be defined by the type a GDT of type SupplyPlanningRequirementElements. These elements include UUID, ID, and MaterialSupplyAndDemandType Code.

In some implementations, the UUID is a Universally unique identifier of a SupplyPlanningRequirement. The UUID is a GDT of type UUID. In some implementations, the UUID can be an alternative key. In some implementations, the ID is a unique identifier of a SupplyPlanningRequirement. The ID is a GDT of type BusinessTransactionDocumentID. In some implementations, the ID can be an alternative key. In some implementations, the MaterialSupplyAndDemandTypeCode is a coded representation for the demand of type the supply planning requirement. The MaterialSupplyAndDemandTypeCode can be a GDT of type MaterialSupplyAndDemandTypeCode.

In some implementations, the SupplyPlanningRequirement can have composition relationships to subordinate nodes. For example, the SupplyPlanningRequirement can be related to the Item 299028 with a cardinality of 1:n. In some examples, the ActiveItem has a cardinality of c:cn, and an association to the active Items.

In some implementations, the QueryByElements can provide a bet of SupplyPlanningRequirements that match the search criteria. The Query elements can be defined by the data type SupplyPlanningRequirementElementsQueryElements. The elements can include ID, and MaterialSupplyAndDemandTypeCode. In some implementations, the ID can be a GDT of type BusinessTransactionDocumentID, and can be optional.

The MaterialSupplyAndDemandTypeCode can be a GDT of type MaterialSupplyAndDemandTypeCode, and can be optional.

In some implementations, the Item is an individual requirement at a SupplyPlanningArea to provide a certain quantity of a material at a fixed date. An Item includes the material belonging to the requirement, the scheduling data, the confirmation of the availability, the status, and references. In some implementations, the Item includes identifying and administrative information. In some implementations, from the material requirements planning (MRP) perspective, an Item represents a requirement relevant to planning for a certain material in a certain supply planning area. The elements found directly at the node Item are defined by the GDT of type SupplyPlanningRequirementItemElements. The elements can include UUID, ID, BaseTransactionUUID, SupplyPlanningAreaUUID, SystemAdministrativeData, Status, ActivationStatusCode, MaterialSupplyAndDemandStatusCode, and SimulatedIndicator.

In some implementations, the UUID is a universally unique identifier of a Item. The UUID is a GDT of type UUID. In some implementations, the UUID can be an alternative key.

The ID is a unique identifier for an item within a SupplyPlanningRequirement that (e.g., possibly together with the version) can be used for referencing by other business objects. The ID is a GDT of type BusinessTransactionDocumentItemID.

In some implementations, the BaseTransactionUUID is a universally unique identifier of the transaction that triggered the transaction during which the Item was created or changed. The BaseTransactionUUID is a GDT of type UUID. In some implementations, the BaseTransactionUUID can be an alternative key.

In some implementations, the SupplyPlanningAreaUUID is a universally unique indicator for the supply planning area in which the MRP run is executed for the Item and in which the availability information is to be calculated. The SupplyPlanningAreaUUID is a GDT of type UUID.

In some implementations, the SystemAdministrativeData is the administrative data that is stored in a system. For example, the SystemAdministrativeData can describe who created or changed the Item and when. The SystemAdministrativeData is a GDT of type SystemAdministrativeData.

In some implementations, the Status is the current step in the life cycle of SupplyPlanningRequirementItem. In some implementations, the status elements can be defined by the data type SupplyPlanningRequirementItemStatus. The elements can include ActivationStatusCode, MaterialSupplyAndDemandStatusCode, and SimulatedIndicator.

In some implementations, the ActivationStatusCode describes the activation status of the Item. The ActivationStatusCode can be a GDT of type ActivationStatusCode. In some implementations, the MaterialSupplyAndDemandStatusCode describes the life cycle status of SupplyPlanningRequirement combining planning and execution life cycle status information. The MaterialSupplyAndDemandStatusCode can be a GDT of type DEMAND_MaterialSupplyAndDemandStatusCode. In some implementations, the SimulatedIndicator indicates whether this Item can be simulated. For example, the SimulatedIndicator can be a GDT of type Indicator. In some implementations, the SimulatedIndicator has a qualifier of Simulated, and can be optional.

In some implementations, the SimulatedIndicator may be specified if the ActivationStatusCode can be "inactive". Some items located at the root node can be derived from the same business transaction document.

The SupplyPlanningRequirement can have composition relationships with subordinate nodes. For example, the ItemBusinessTransactionDocumentReference 299036 can have a cardinality of 1:1. The ItemProduct 299032 can have a cardinality of 1:1. The ItemScheduleLine 299030 can have a cardinality of 1:n. The ItemAvailabilityConfirmationScheduleLine 299034 can have a cardinality of 1:cn.

The SupplyPlanningArea can be related to SupplyPlanningRequirement with a cardinality of 1:cn, and can denote the supply planning area in which planning is executed for this Item and in which the confirmation is to be determined. The CreationIdentity can be related to SupplyPlanningRequirement with a cardinality of 1:cn, and can specify the identity of the one who created the Item. The LastChangeIdentity can be related to SupplyPlanningRequirement with a cardinality of 1:cn, and can specify the identity of the one who did the last change of the Item The SupplyPlanningRequirement with can include associations for navigation to business object SupplyPlanningRequirement or node ItemBusinessTransactionDocumentReference. For example, the SupplyPlanningRequirement can be related to CustomerRequirementItemReference with a cardinality of c:c. For example, the CustomerRequirementItemReference can denote an ItemBusinessTransactionDocumentReference that is a reference to CustomerRequirementExternalRequestItem. In some implementations, the SupplyPlanningRequirement can be related to SiteLogisticsRequisitionItemReference with a cardinality of c:c. For example, the SiteLogisticsRequisitionItemReference can denote an ItemBusinessTransactionDocumentReference that is a reference to SiteLogisticsRequisitionConfirmationItem.

The Activate action can activate the provisional items and delete the active items existing before the activation. For the provisional items with ActivationStatusCode "provisional" the ActivationStatusCode is set to "active". active Items existing before the activation are deleted. The action elements are defined by the data type SupplyPlanningRequirementItemActivateActionElements. In some examples, the SupplyPlanningRequirementItemActivateActionElements can include BaseTransactionUUID. For example, the BaseTransactionUUID is a GDT of type UUID. The Activate action may not be triggered directly by the User Interface. The Activate action may be executed by compound service or a core service of the same business object or of a different business object, or during an ESF save sequence.

In some implementations, the GetAvailabilityConfirmation action calculates an availability confirmation or if the CreateReservationIndicator can be set an availability information for the Item and saves the availability confirmation in one or several new or changed ItemAvailabilityConfirmation-ScheduleLines. In some implementations, an availability confirmation reserves the confirmed quantity on the other hand the availability information does not reserve the confirmed quantity. In some implementations, New ItemAvailabilityConfirmationScheduleLines are created or excan beting ones are changed.

The GetAvailabilityConfirmation action elements are defined by the data type SupplyPlanningRequirement-ItemGetAvailabilityConfirmationActionElements and can include: CreateReservationIndicator, and BaseTransactionU-UID.

In some implementations, the CreateReservationIndicator specifies whether the availability confirmation should create a reservation for the confirmed product or not. The CreateReservationIndicator can be a GDT of type Indicator. In some implementations, the CreateReservationIndicator can be false if the SimulatedIndicator of the item can be true.

The BaseTransactionUUID can be a GDT of type UUID. In some implementations, the action may not be triggered directly by the User Interface. It may be executed by compound service or a core service of the same business object or of a different business object.

In some implementations, the ReleaseAvailabilityConfirmation releases the confirmed quantities of the Item saved in one or several ItemAvailabilityConfirmationScheduleLines by informing the availability check about the quantity to be released. This means that the availability check can use this released quantity to confirm other Items. In some implementations, the quantities can be released temporarily can be used in the same transaction. This enables a redistribution of the confirmed quantities between various Items. This action is used e.g. in mass processing. In some implementations, the action elements are defined by the data type SupplyPlanningRequirementItemReleaseAvailabilityConfirmationActionElements can include: BaseTransactionUUID.

The BaseTransactionUUID is a GDT of type UUID. In some implementations, the action may not be triggered directly by the User Interface. It may be executed by compound service or a core service of the same business object or of a different business object.

The PropagateRequestAndAvailabilityConfirmation action informs the availability check about the requirement and the confirmation by sending the requested schedule lines and the availability confirmation schedule lines to the availability check framework. In some implementations, the requested schedule lines and the availability confirmation schedule lines are accepted from the availability check framework without an availability check and are used to update its own data. In some implementations, the action elements are defined by the data type SupplyPlanningRequirement-ItemPropagateRequestAndAvailabilityConfirmationActionElements can include: BaseTransactionUUID. In various examples, the BaseTransactionUUID is a GDT of type UUID. In some implementations, the action may not be triggered directly by the User Interface. It may be executed by compound service or a core service of the same business object or of a different business object.

The QueryByElements can provide a list of SupplyPlanningRequirementItems that match the search criteria. Query elements are defined by the data of type SupplyPlanningRequirementItemElementsQueryElements. These elements include: SupplyPlanningRequirementID, ID. StatusActivationStatusCode, StatusMaterialSupplyAndDemandStatusCode, SystemAdministrativeData, SupplyPlanningArea_ID, Material_ID, and SupplyPlanningRequirementMaterialSupplyAndDemandTypeCode.

The SupplyPlanningRequirementID can be a GDT of type BusinessTransactionDocumentID, and can be optional. The ID can be a GDT of type BusinessTransactionDocument-ItemID, and can be optional. The StatusActivationStatus-Code can be a GDT of type ActivationStatusCode, and can be optional. The StatusMaterialSupplyAndDemandStatusCode can be a GDT of type DEMAND_MaterialSupplyAndDemandStatusCode, and can be optional. The SystemAdministrativeData can be a GDT of type SystemAdministrativeData, and can be optional. The SupplyPlanningArea_ID can be a GDT of type SupplyPlanningAreaID, and can be optional. The Material_ID can be a GDT of type ProductID, and can be optional. The SupplyPlanningRequirementMaterialSupplyAndDemandTypeCode can be a GDT of type MaterialSupplyAndDemandTypeCode, and can be optional.

The QueryByIDAndActivation provides a list of SupplyPlanningRequirementItems with the same IDs and the ActivationStatusCode. Query elements can be, for example, defined by the data type: SupplyPlanningRequirement-ItemIDAndActivationQueryElements. These elements include: SupplyPlanningRequirementID, ID, and StatusActivationStatusCode.

The SupplyPlanningRequirementID can be a GDT: BusinessTransactionDocumentID. The ID can be a GDT of type BusinessTransactionDocumentItemID, and can be optional. The StatusActivationStatusCode can be a GDT of type ActivationStatusCode, and can be optional.

In some implementations, the QueryByReferencedBusinessTransactionDocumentItem provides a list of SupplyPlanningRequirementItems that include the entered document reference. The data type SupplyPlanningRequirement-ItemReferencedBusinessTransactionDocumentQueryElements can define the query elements, such as CustomerRequirement_ID, CustomerRequirement_ExternalRequestItemID, BusinessTransactionDocumentItemID, SiteLogisticsRequisition_ID, SiteLogisticsRequisition_ConfirmationItemID, StatusActivationStatusCode, and ItemScheduleLine.

The CustomerRequirement_ID can be the referenced Customer Requirement. The CustomerRequirement_ID can be a GDT of type BusinessTransactionDocumentID, and can be optional. The CustomerRequirement ExternalRequest-ItemID can be the referenced Customer Requirement External Request Item. The CustomerRequirement_External-RequestItemID can be a GDT of type BusinessTransactionDocumentItemID, and can be optional. The SiteLogisticsRequisition__ID can be the referenced Site LogisticsRequisition. The SiteLogisticsRequisition_ID can be a GDT of type BusinessTransactionDocumentID, and can be optional. The SiteLogisticsRequisition_ConfirmationItemID can be the referenced Site LogisticsRequisition Confirmation Item. The SiteLogisticsRequisition can be a GDT of type BusinessTransactionDocumentItemID, and can be optional. The StatusActivationStatusCode can be a GDT of type ActivationStatusCode, and can be optional. The StatusMaterialSupplyAndDemandStatusCode can be a GDT of type DEMAND_MaterialSupplyAndDemandStatusCode, and can be optional.

The ItemScheduleLine can be a schedule line for an Item of a SupplyPlanningRequirement that includes information about when the material specified in the higher-level item can be to be provided and in which quantity. The elements located directly at the node ItemScheduleLine are defined by the GDT: ItemScheduleLineElements. These elements include: UUID, ID, RequestedQuantity, RequestedQuantityTypeCode, FulfilledQuantity, FulfilledQuantityTypeCode, OpenQuantity, OpenQuantityTypeCode, and RequestedMaterialSupplyPeriod.

In some implementations, UUID can be a universally unique identifier of an ItemScheduleLine. The UUID can be a GDT of type UUID. In some implementations, the UUID can be an alternative key. The ID can be a unique identifier within an Item for a schedule line of an item of a SupplyPlanningRequirement. The ID can be a GDT of type BusinessTransactionDocumentItemScheduleLineID.

The RequestedQuantity can be a requested quantity. The RequestedQuantity can be a GDT of type LARGE_Quantity. In some implementations, the Requested Quantity has a qualifier of Requested. The RequestedQuantityTypeCode can be the coded representation of the of type the RequestedQuantity. The RequestedQuantityTypeCode can be a GDT of type QuantityTypeCode. In some implementations, the RequestedQuantityTypeCode has a qualifier of Requested.

The FulfilledQuantity can be a quantity that has been delivered, moved, produced, checked or packed. The FulfilledQuantity can be a GDT of type LARGE_Quantity. In some implementations, the FulfilledQuantity has a qualifier of Fulfilled. The FulfilledQuantityTypeCode can be the coded representation of a GDT of type the FulfilledQuantity.

The FulfilledQuantityTypeCode can be a GDT of type QuantityTypeCode. In some implementations, the FulfilledQuantityTypeCode has a qualifier of Fulfilled. The OpenQuantity can be quantity that has not yet been released, delivered, moved, produced, checked or packed. The OpenQuantity can be a GDT of type LARGE_Quantity. In some implementations, the OpenQuantity has a qualifier of Open.

The OpenQuantityTypeCode can be a coded representation of the of type the OpenQuantity. The OpenQuantity can be a GDT of type QuantityTypeCode. In some implementations, the OpenQuantity has a qualifier of Open. The RequestedMaterialSupplyPeriod can be a period within which the material are to be provided. The RequestedMaterialSupplyPeriod can be a GDT of type UPPEROPEN_LOCALNORMALIZED_DateTimePeriod. In some implementations, the RequestedMaterialSupplyPeriod has a qualifier of MaterialSupply.

For integrity conditions, the intervals used here can describe a point in time to the second (e.g., start of interval=end of interval) but they can also include less precise time information (e.g., CW50). quantities of the SupplyPlanningRequirement can have the same unit of measure. The base unit of measure may be specified as the unit of measure.

In some implementations, the SupplyPlanningRequirement can include associations for navigation to the business object PlannedMaterialFlow. For example, the SupplyPlanningRequirement can be associated with PlannedMaterialFlow with a cardinality of c:cn. For example, the PlannedMaterialFlow can specify the material flows that meet in the SupplyPlanningRequirementItemScheduleLine (e.g., as a requirement).

In some implementations, the SupplyPlanningRequirement can include associations for navigation to the transformed object OrderFulfillmentPlanningView. For example, the SupplyPlanningRequirement can be associated with SingleLevelOrderFulfillmentPlanningView with a cardinality of c:c. For example, the SingleLevelOrderFulfillmentPlanningView can specify the single-level planning view of the order fulfillment of the supply planning requirement. In some examples, the SupplyPlanningRequirement can be associated with MultiLevelOrderFulfillmentPlanningView with a cardinality of c:c. For example, the MultiLevelOrderFulfillmentPlanningView can specify the multi-level planning view of the order fulfillment of the supply planning requirement.

In certain implementations, the ItemBusinessTransactionDocumentItemReference is a unique reference to an Item of a business document that is related to the Item. An ItemBusinessTransactionDocumentItemReference may exist in the some complete and disjoint specializations:

In some implementations, a CustomerRequirementExternalRequestItemReference can be a reference to the generating item of the generating customer requirement (e.g., a business object CustomerRequirement) from which the Item was derived. The SiteLogisticsRequisitionConfirmationItemReference can be a reference to the generating Item of the delivery requirement (e.g., a business object SiteLogisticsRequisition) from which the Item was derived.

Some elements located at the node ItemBusinessTransactionDocumentItemReference can be defined by the GDT of type ItemBusinessTransactionDocumentItemReferenceElements.

The elements can include: BusinessTransactionDocumentItemUUID, and

BusinessTransactionDocumentTypeCode.

The BusinessTransactionDocumentItemUUID is a universally unique identifier of the referenced item of a business document. The BusinessTransactionDocumentItem is a GDT of type UUID. The BusinessTransactionDocumentTypeCode is a coded representation of a GDT of type the business document of the referenced item. The BusinessTransactionDocumenttypeCode can be a GDT of type BusinessTransactionDocumentTypeCode. In some implementations, the following codes are valid BusinessTransactionDocumentTypeCodes: 31 (Customer Requirement) and 123 (Site Logistics Requisition).

Some objects include inbound association relationships from business object CustomerRequirement of node, ExternalRequestItem. In some implementations, the CustomerRequirementIExternalRequestItem may have cardinality relationship of c:cn with the SupplyPlanningRequirement. In some examples, the CustomerRequirementIExternalRequestItem specifies a BusinessTransactionDocumentItemReference that is a reference to the generating Item of the customer requirement from which the Item was derived.

Some objects include inbound association relationships from business object SiteLogisticsRequisition or node ConfirmationItem. In some implementations, the SiteLogisticsRequisitionConfirmationItem may be a cardinality relationship of c:c with SupplyPlanningRequirement, and can specify a BusinessTransactionDocumentItemReference that is a reference to the generating Item of the delivery requirement from which the Item was derived. In some implementations, exactly one of the above-mentioned references can exist to the node of the business objects CustomerRequirement and SiteLogisticsRequisition.

In some examples, the ItemProduct is the material requested by the Item of a SupplyPlanningRequirement. Some elements located at the node ItemProduct can be defined by the GDT of type ItemProductElements. In some examples, the elements can include MaterialUUID. For example, the MaterialUUID can be a universally unique identifier of the product. The MaterialUUID can be a GDT of typeUUID.

There may be a number Inbound Aggregation Relationships (e.g., from the business object Material or node Root). In some implementations, sMaterial has a cardinality relationship of 1:cn, and denotes the material of the requirements item to be planned. The ItemAvailabilityConfirmationScheduleLine is the confirmation with regard to when and in which quantity the material of an item is estimated to be available or can be provided. The elements located directly at the node ItemAvailabilityConfirmationScheduleLine are defined by the type GDT: ItemAvailabilityConfirmationScheduleLineElements. These elements include:

UUID, ID, ItemScheduleLineUUID, ConfirmedQuantity, ConfirmedQuantityTypeCode, and ConfirmedPeriod.

The UUID is a universally unique identifier of an ItemAvailabilityConfirmationScheduleLine. For example, the UUID can be a GDT of type UUID. The ID can be a unique identifier for the schedule line within an Item that can be used by other business objects for referencing. The ID can be a GDT of type BusinessTransactionDocumentItemScheduleLineID. The ItemScheduleLineUUID can be a ItemScheduleLine for those the ItemAvailabilityConfirmationScheduleLine can be created (or belongs to). The ItemScheduleLineUUID can be a GDT of type UUID. The ConfirmedQuantity can be a The confirmed quantity. The Confirm edQuantity can be a GDT of type LARGE_Quantity. In some implementations, the ConfirmedQuantity has a Confirmed qualifier. The ConfirmedQuantityTypeCode can be a coded representation of the of type the ConfirmedQuantity. The ConfirmedQuantityTypeCode can be a GDT of type QuantityTypeCode. In some implementations, the ConfirmedQuantityTypeCode has a Confirmed qualifier. For example, the ConfirmedPeriod can be a time period within which the provision can be expected to be made. The ConfirmedPeriod can be a GDT of type: UPPEROPEN_LOCAL-NORMALIZED_DateTimePeriod. In some implementations, the ConfirmedPeriod has a Confirmed qualifier.

For Integrity Conditions, the intervals used here can describe a point in time to the second (start of interval=end of interval) but they can also include less time information (such as CW50). Quantities of the SupplyPlanningRequirement can have the same unit of measure. The base unit of measure may be specified as the unit of measure.

There can be inbound association relationships include relationships from business object SupplyPlanningRequirement or node ItemScheduleLine. For example, the ItemScheduleLine may have cardinality relationship of c:cn. In some examples, the ItemScheduleLine can specify the requirement schedule line for which can be confirmation schedule line was created.

Business Object Payroll Process

FIG. 300-1 through 300-3 illustrates an example PayrollProcess business object model 300014. Specifically, this model depicts interactions among various hierarchical components of the PayrollProcess, as well as external components that interact with the PayrollProcess (shown here as 300000 through 300012).

Process that runs the payroll for a group of employees in a payroll period. The business object Payroll Process belongs to the process component Payroll Processing.

Service Interfaces

The Business Object is involved in the following Process Component Interaction Models: Payroll Processing_Employee Payroll Administration, Payroll Processing_Payroll Processing at Provider_Payroll Process and Results, Payroll Processing at Provider_Payroll Processing_Setup Service Interface Payroll Process Employee Payroll Administration Notification Out has a technical name of PayrollProcessingPayrollProcessEmployeePayrollAdministrationNotificationOut. The Service Interface Payroll Process Employee Payroll Administration Notification Out is part of the following Process Component Interaction Models: Payroll Processing_Employee Payroll Administration. Groups the operations that notify the view of the payroll process in the Human Capital Management deployment unit of changes in the payroll process.

Notify of Payroll Process has a technical name of PayrollProcessingPayrollProcessEmployeePayrollAdministrationNotificationOut.NotifyOfPayrollProcess. Notifies changes in the payroll process to the view of the payroll process in the Human Capital Management deployment unit. The operation is based on message type Payroll Process Notification.

Service Interface Payroll Step Execution Requesting In has a technical name PayrollProcessingPayrollStepExecutionRequestingIn. The Service Interface Payroll Step Execution Requesting In is part of the following Process Component Interaction Models: Payroll Processing_Payroll Processing at Provider_Payroll Process and Results.

Maintain Employee Payroll Result has a technical name of PayrollProcessingPayrollStepExecutionRequestingIn.MaintainEmployeePayrollResult. Maintains the individual payroll result for an employee in a payroll process. The operation is based on message type Employee Payroll Result Notification.

Maintain Payroll Result has a technical name of PayrollProcessingPayrollStepExecutionRequestingIn.MaintainPayrollResult. Maintains the payroll result totals for the payroll group included in a payroll process. The operation is based on message type Payroll Result Notification.

Maintain Payroll Process Status based on Execution Confirmation has a technical name PayrollProcessingPayrollStepExecutionRequestingIn.MaintainPayrollProcessStatusBasedOn ExecutionConfirmation. Maintains the payroll process status based on the execution confirmation from the payroll provider. The operation is based on message type Payroll Step Execution Confirmation.

Service Interface Payroll Step Execution Requesting Out has a technical name PayrollProcessingPayrollStepExecutionRequestingOut. The Service Interface Payroll Step Execution Requesting Out is part of the following Process Component Interaction Models: Payroll Processing_Payroll Processing at Provider_Payroll Process and Results. Contains the operation to request the execution of a step in the payroll process.

Request Payroll Step Execution has a technical name PayrollProcessingPayrollStepExecutionRequestingOut.RequestPayrollStepExecution. Requests the execution of a step in the payroll process from the payroll provider. The operation is based on message type Payroll Step Execution Request.

Service Interface Payroll Processing Setup In has a technical name PayrollProcessingPayrollProcessingSetupIn. The Service Interface Payroll Processing Setup In is part of the following Process Component Interaction Models: Payroll Processing at Provider_Payroll Processing Setup. Contains the operation to set up the payroll process.

Maintain Payroll Process has a technical name PayrollProcessingPayrollProcessingSetupIn.MaintainPayrollProcess. Notification from PayrollProvider to Payroll Process that Provider is ready with all the setups required for the country-specific Payroll Run. This run is for a Payroll Group over a specified Payroll Period. The operation is based on message type Payroll Process Setup Notification.

Business Object Payroll Process

Payroll Process (Root Node)

Payroll Process 300016 is the process that runs the payroll for a group of employees in a payroll period. Validity Period is time dependent. The elements located directly at the node Payroll Process are defined by the data type: PayrollProcessElements. These elements include: ID, PayrollProviderID, CountryCode, PayrollGroupCode, PayrollPeriod, SystemAdministrativeData, Status, PayrollDatePeriod, PaymentDate, SelectionDate, PayrollRunDate, CurrentIndicator, ConsistencyIncludeIndicator, LifeCycleStatusCode, DataPreparationProcessingStatusCode, DataConsistencyCheckProcessingStatusCode, ReplicationProcessingStatusCode, PayrollRunProcessingStatusCode, FollowOnProcessingStatusCode, CleanUpProcessingStatusCode.

ID is an alternative key, is an ID of a PayrollProcess, and is of GDT type BusinessTransactionDocumentID.

PayrollProviderID is optional, is an ID for a PayrollProcess issued by the payroll provider. In some implementations, this ID is needed in provider communication; it is used by the payroll provider software to identify the payroll process, and is of GDT type BusinessTransactionDocumentID.

CountryCode identifies the country in which the payroll process is being run. By implication, the country code also indicates the set of legal regulations that govern the payroll process for that particular country. All employees participating in the payroll process can have an Employment in the country, and is of GDT type CountryCode.

PayrollGroupCode is a coded representation of a payroll group, is of GDT type PayrollGroupCode, and is the group of employees with a common pay cycle for which PayrollProcess is being run.

A PayrollPeriod is the period of time for which payroll is run, and is of GDT type PayrollPeriod.

The SystemAdministrativeData contains administrative information about the PayrollProcess and is of GDT type SystemAdministrativeData.

Status is the current status of the PayrollProcess, and is of IDT type PayrollProcessStatus.

A LifeCycleStatusCode is a coded representation of the life cycle status of a PayrollProcess, and is of GDT type PayrollProcessLifeCycleStatusCode.

A DataPreparationProcessingStatusCode is a coded representation of a processing status of overall data preparation for a set of employees, and is of GDT type ProcessingStatusCode.

A DataConsistencyCheckProcessingStatusCode is a coded representation of the processing status of overall consistency check process, and is of GDT type ProcessingStatusCode.

A ReplicationProcessingStatusCode is a coded representation of the processing status of overall replication process for a set of employees, is of GDT type ProcessingStatusCode.

PayrollRunProcessingStatusCode is optional, is a coded representation of the processing status of overall payroll run process, and is of GDT type ProcessingStatusCode.

A FollowOnProcessingStatusCode is a coded representation of a follow on processing status, and is of GDT type ProcessingStatusCode.

A CleanUpProcessingStatusCode is a coded representation of a clean up processing status, and is of GDT type ProcessingStatusCode.

A PayrollDatePeriod is the date period for which PayrollProcess is being run, and is of GDT type CLOSED_DatePeriod. This element contains the concrete begin and end date derived from the element PayrollPeriod.

PaymentDate is optional, is a PaymentDate is the date when the payment is made for the PayrollPeriod for which the PayrollProcess is being run, and is of GDT type Date.

SelectionDate is optional, is a SelectionDate is the date on which employees' master data is selected for a payroll run, and is of GDT type Date.

PayrollRunDate is optional, is a PayrollRunDate is the date when the payroll run is initiated, and is of GDT type Date.

A CurrentIndicator indicates if the PayrollProcess is current or not, is of GDT type Indicator. Current indicator indicates that the payroll process for the payroll group is ready to be started or has already been started.

A ConsistencyIncludeIndicator indicates if the Consistency check is included in data preparation process or not and is of GDT type Indicator.

The following composition relationships to subordinate nodes exist: Employee has a cardinality of 1:cn. The filter elements are defined by the data type: PayrollProcessEmployeeFilterElements These elements are: (See ARIS) Step 300028 has a cardinality of 1:cn. The filter elements are defined by the data type: PayrollProcessStepFilterElements. These elements are: (See ARIS) AccessControlList 300030 has a cardinality of 1:1. AttachmentFolder 300032 has a cardinality of 1:cn.

A number of inbound association relationships may exist, including: 1) From the business object Identity, node Identity: LastChangeIdentity has a cardinality of 1:cn, and identifies the Identity that changed the Payroll Process. 2) From the business object Identity, node Identity: CreationIdentity has a cardinality of 1:cn and identifies the Identity that created the Payroll Process.

Specialization associations for navigation include: NextPayrollProcess has a cardinality of 1:c and is the association to determine the Next Payroll Process. PreviousPayrollProcess has a cardinality of 1:c and is the association to determine the Previous Payroll Process. PayrollStepExecutionRun has a cardinality of 1:cn and is the association to get the PayrollStepExecutionRun for a step. The filter elements are defined by the data type: PayrollProcessPayrollStepExecutionRunFilterElements. These elements are: (See ARIS). There can be only one payroll process for a combination of a payroll group, country and a payroll period. There can be only one active payroll process for a combination of a payroll group, country and a payroll period at a point of time. Active means a process is not in the LifeCycleStatusCode "not started" or "completed". Each payroll process can have only one Employee instance per employee. Payroll process once created can be deleted only by an inbound agent. The PayrollPeriod-Number can lie between 1 and 366.

The action CreateEmployeeItems is triggered to create employee node instances; one for each employee belonging to the payroll group. In some implementations, this action is triggered by the MDRO during the data preparation process. The action will select all the country-specific EEPI BO instances (here country is the country code of current payroll process) based on Payroll Group, Payroll Period and Country Code. Employee node instances will be created under the root node of the PayrollProcess BO corresponding to all the selected EEPI BO instances returned. The DataPreparationProcessingStatus is in "Not Started" State. Creates employee nodes in all country-specific employee payroll input objects for all assigned employees. This action is triggered by the MDRO.

The ChangeCurrentPayrollProcess action will change the specified payroll process to the current payroll process and make the previously current payroll process non-current for a particular payroll group of a country. In some implementations, this action can be triggered by the Inbound agent or the user when it is necessary to manually set a payroll process as current. The PayrollProcess is not started. Changes the specified payroll process to current. Changes the previously current payroll process to non-current. This action is triggered manually by the user or by the Inbound Agent.

The TriggerDataPreparation action triggers/initiates the Payroll process by triggering the data preparation for the payroll process. In some implementations, at this point of time, the MDRO is triggered. This in turn triggers the CreateEmployeeItems action which will create as many EmployeeStatus node instances as the number of employees belonging to the current payroll group for a country for the current payroll period. Each node instance corresponds to one instance of the EmployeePayrollInput BO. DataPreparationProcessingStatus is in "Not Started" State. The creation of Employee node instances for the PayrollProcess instance is started. For every EEPI for the current payroll group, the update of PayrollProcessID is started by the MDRO. After the execution of the action, the DataPreparationProcessingStatus changes to "In Process" state and PayrollProcessLifeCycleStatus is changed to "In Preparation" state. This action is triggered manually by the user (UI).

The NotifyOfDataPreparationCompletion action marks the completion of the data preparation for the payroll process. In some implementations, it is triggered by the MDRO when data preparation is finished. Once the data preparation is complete, data is now ready to be checked for consistency by StartCheck action. The DataPreparationProcessingStatus is in "In Process" State. The creation of Employee node instances is completed by the MDRO. For every EEPI for the current payroll group, the PayrollProcessID is updated. After the execution of the action, the DataPreparationProcessingStatus changes to "Finished" state. This action is triggered MDRO.

The CancelDataPreparation action cancels the data preparation in progress and resets the status back to "Not Started". In some implementations, it is triggered by the MDRO when it is unable to lock the EmployeePayrollInput BO to trigger data preparation. At that point of time, the MDRO retries to lock the EEPI BO instance. If it fails after a certain number of retries, it triggers this action. After the execution of the action, the DataPreparationProcessingStatus is set to "Not Started" state. The DataPreparationProcessingStatus is in "In Process" State. After the execution of the action, the DataPreparationProcessingStatus changes to "Not Started" state. This action is triggered MDRO.

The StartDataConsistencyCheck action triggers/initiates the consistency check of the data for the included employees belonging to the current payroll group. In some implementations, this action is triggered after the data preparation is completed. Upon triggering the action, the MDRO is triggered which in turn triggers each employee payroll input BO to start the check as background job. The DataConsistencyProcessingStatus is in "Not Started" State and DataPreparationProcessingStatus is in "Finished" state. As and when EEPI check is completed, the status of respective employee is updated to "Consistent" or "Inconsistent" state at the employee node. For every EEPI for the current payroll group, the check is carried out and the status gets updated accordingly. After the execution of the action, the DataConsistencyProcessingStatus changes to "In Process" state and PayrollProcessLifeCycleStatus is changed to "Consistency Check" state. This action is triggered by UI.

The CancelDataConsistencyCheck action cancels the data consistency check in progress and resets the status back to "Not Started". In some implementations, it is triggered by the MDRO when it is unable to lock the EmployeePayrollInput BO to trigger a consistency check. At that point of time, the MDRO retries to lock the EEPI BO instance. If it fails again, it triggers this action. After the execution of the action, the DataConsistencyProcessingStatus is set to "Not Started" state. The DataConsistencyProcessingStatus is in "In Process" State. After the execution of the action, the DataConsistencyProcessingStatus changes to "Not Started" state. This action is triggered MDRO.

The NotifyOfDataConsistencyCheckCompletion action is triggered to mark the completion of the consistency check for all included employees belonging to the payroll group. In some implementations, once all the employees status is updated to "Consistent" or "Inconsistent" state, the MDRO will trigger this action and set the status to "finished". This marks the end of the consistency check process. The DataConsistencyProcessingStatus is in "In Process" State. The status of Employee instances are updated by the respective EEPI. EEPI data is checked and status is updated. After the execution of the action, the DataConsistencyProcessingStatus changes to "Finished" state. This action is triggered by MDRO, when all the employees data has been checked.

The StartReplication action triggers/initiates the replication of the data for the employees belonging to the current payroll group. In some implementations, once the check is completed by the MDRO, this action is triggered by the user after inspecting the checked data. The user then triggers this action. Upon triggering this action, the MDRO is triggered which in turn triggers each employee payroll input BO to start the replication as a background job, in the case of ERP. For the ADP provider, the MDRO triggers creation of a CSV file, taking the data from each EmployeePayrollInput BO instance. The ReplicationProcessingStatus is in "Not Started" State State and DataConsistencyStatus is in "Finished" state. As and when EEPI data is replicated, the status of the respective employee is updated to "in process" state at the employee node. In the case of ERP, for every EEPI for the current payroll group, the replication is carried out and the status is updated accordingly. In the case of ADP, the MDRO starts the creation of a CSV file. After the execution of the action, the ReplicationProcessingStatus changes to "In Process" state and PayrollProcessLifeCycleStatus is changed to "Replication" state. This action is triggered by user (UI) after inspecting the checked date.

The NotifyOfReplicationCompletion action marks the end of the replication process and sets the status to "Finished". In some implementations, in the case of ERP, this action is triggered when all employees have been sent the message from the provider if they were successfully replicated or not. Once all the employees are updated to "Successful" or "Failed" state, an event is raised which will set the status to "Finished". In the case of ADP, the action is triggered once the CSV file is created. The ReplicationProcessingStatus is in "In Process" State. The status of Employee instances are updated by the respective EEPI in the case of ERP only. EEPI status was updated in the case of ERP only. After the execution of the action, the ReplicationProcessingStatus changes to "Finished" state. The action is triggered by internal coding.

The CancelReplication action cancels the data replication in progress and resets the status back to "Not Started". In some implementations, in the case of ERP, it is triggered by the MDRO when there is a technical error in the workpackage and the replication cannot be performed. After the execution of the action, the ReplicationProcessingStatus is set to "Not Started" state. In the case of ADP, if there is an error during CSV file creation, then this action is triggered. The ReplicationProcessingStatus is in "In Process" State. After the execution of the action, the ReplicationProcessingStatus changes to "Not Started" state. In the case of ERP, this action is triggered by the MDRO. In the case of ADP, this action is triggered by internal coding.

The RequestPayrollRun action is used to send a request to the payroll provider for a payroll run after the replication is successful. In some implementations, used only by ERP provider. The usage is restricted through separate SAM schemas for different providers. Used only by ERP provider. The usage is restricted through separate SAM schemas for different providers. The status of Employee instances is updated to "In Process" state. After the execution of the action, the PayrollRunProcessingStatus changes to "In Process" state and PayrollProcessLifeCycleStatus is changed to "Payroll Run" state. This action is triggered by the UI after replication is completed.

NotifyOfPayrollRunCompletion (S&AM action)

This action is triggered to set the completion of payroll run for all the included employees belonging to the payroll group.

In some implementations,

This action is triggered when a message is received from the provider with the list of employees that were successful or failed. The status of the employee instances are also updated simultaneously. Constraint: Used only by ERP provider. The usage is restricted through separate SAM schemas for different providers. The PayrollRunProcessingStatus is in "In Process" State. The status of Employee instances are updated to "Successful" or "failed" state. After the execution of the action, the PayrollRunProcessingStatus changes to "Finished" state. This action is triggered when the provider sends a message with run status for all employees.

The CancelPayrollRun action cancels the payroll run already requested and resets the status back to "Not Started". In some implementations, it is triggered when the provider sends back a message that the payroll run request could not be confirmed and that the run is not planned. Constraint: Used only by ERP provider. The usage is restricted through separate SAM schemas for different providers. The PayrollRunProcessingStatus is in "In Process" State. After the execution of the action, the PayrollRunProcessingStatus changes to "Not Started" state. This action is triggered inbound process agent.

The StartFollowOnProcessing action triggers/initiates the follow-on process of the Payroll process. In some implementations, at this point of time, it is confirmed that the payroll run was successful. The user has accepted the payroll results and the provider is informed via message to start the follow on process, such as payment to tax authorities. Used only by ERP provider. The usage is restricted through separate SAM schemas for different providers. The FollowOnProcessingStatus is in "Not Started" State and PayrollRunProcessingStatus is in "Finished" state. After the execution of the action, the FollowOnProcessingStatus changes to "In Process" state and PayrollProcessLifeCycleStatus is changed to "Follow On in Process" state. This action is triggered by the user (UI).

The NotifyOfFollowOnCompletion action triggered to set the completion of follow-on process. At this point of time, the follow on process is completed by the provider and once the provider sends a manual invoice. For ERP, The FollowOnProcessingStatus is in "In Process" State and for ADP, the FollowOnProcessingStatus is in "Not Started" state. After the execution of the action, the FollowOnProcessingStatus changes to "Finished" state. This action is triggered by the user (UI).

The NotifyOfCleanUpCompletion action is triggered to set the completion of the clean-up process. In some implementations, this action marks the end of Payroll process. After the MDRO has finished the clean-up process, it triggers this action to complete the payroll process. The CleanUpProcessingStatus should be in "In Process" state. The CurrentIndicator of this instance is changed from true to false. The CurrentIndicator of next PayrollProcess instance is set to true. After the execution of the action, the CleanUpProcessingStatus changes to "Finished" state and PayrollProcessLifeCycleStatus is changed to "Completed" state. This action is triggered by the MDRO.

The StartCleanUp action is triggered to start the Clean up process. In some implementations, at this point, the MDRO is triggered to start the clean up process. The FollowOnProcessing is in "Finished" state and the CleanUpProcessing Status is in "Not Started" State. The PayrollProcess assignment node of the EEPI Bo instance corresponding to employees in current payroll process, are deleted and the status of the EEPI instance is reset. The CleanUpProcessingStatus changes to "In process" state and the PayrollProcessLifeCycleStatus is in "Clean Up" state. This action is triggered by the User or called directly by NotifyOfFollowOnCompletion.

The CancelCleanUp action is triggered to cancel the clean-up process and reset the status to Not started. In some implementations, the action is triggered by the MDRO when it is unable to lock all the employees to clean up. CleanUpProcessingStatus has to be in "In Process" State. After the execution of the action, CleanUpProcessingStatus changes to Not started state. The action is triggered by the MDRO.

QueryByElements provides a list of all PayrollProcess that comply with the following selection criteria: The query elements are defined by the data type: PayrollProcessElementsQueryElements. These elements include: ID, CountryCode, PayrollGroupCode, PayrollPeriod, Status, LifeCycleStatusCode, DataPreparationProcessingStatusCode, DataConsistencyCheckProcessingStatusCode, ReplicationProcessingStatusCode, PayrollRunProcessingStatusCode, FollowOnProcessingStatusCode, CleanUpProcessingStatusCode, PayrollDatePeriod, CurrentIndicator.

ID is of GDT type BusinessTransactionDocumentID.

CountryCode is optional and is of GDT type CountryCode.

PayrollGroupCode is optional is of GDT type PayrollGroupCode.

PayrollPeriod is optional and is of GDT type PayrollPeriod.

Status is optional, is of IDT type PayrollProcessStatus.

A LifeCycleStatusCode is a coded representation of the life cycle status of a PayrollProcess and is of GDT type PayrollProcessLifeCycleStatusCode.

A DataPreparationProcessingStatusCode is a, coded representation of a processing status of overall data preparation for a set of employees and is of GDT type ProcessingStatusCode.

A DataConsistencyCheckProcessingStatusCode is a coded representation of the processing status of overall consistency check process and is of GDT type ProcessingStatusCode.

A ReplicationProcessingStatusCode is a coded representation of the processing status of overall replication process for a set of employees and is of GDT type ProcessingStatusCode.

PayrollRunProcessingStatusCode is optional, is a PayrollRunProcessingStatusCode is a coded representation of the processing status of overall payroll run process, and is of GDT type ProcessingStatusCode.

A FollowOnProcessingStatusCode is a coded representation of a follow on processing status is of GDT type ProcessingStatusCode.

A CleanUpProcessingStatusCode is a coded representation of a clean up processing status and is of GDT type ProcessingStatusCode.

PayrollDatePeriod is optional and is of GDT type CLOSED_DatePeriod.

CurrentIndicator is optional and is of GDT type Indicator.

Employee

Employee 300018 is the employee participating in this payroll process. The elements located directly at the node Employee are defined by the data type: PayrollProcessEmployeeElements. These elements include: EmployeeUUID, Status, DataPreparationProcessingStatusCode, DataConsistencyStatusCode, ReplicationUpdateStatusCode, PayrollRunUpdateStatusCode, PayrollProcessFollowOnProcessingStatusCode, DataPreparationInclusionStatusCode, DataConsistencyCheckInclusionStatusCode, ReplicationInclusionStatusCode, PayrollRunInclusionStatusCode, FollowOnInclusionStatusCode, EmployeePayrollInputUUID.

EmployeeUUID is a globally unique identifier of the employee that belongs to a PayrollProcess, is of GDT type UUID, and is the employee UUID corresponds to the UUID of the Employee business object.

Status indicates the current step in the life cycle of the PayrollProcess for an employee, is of IDT type PayrollProcessEmployeeStatus.

A DataPreparationProcessingStatusCode is a coded representation of a processing status of data preparation, and is of GDT type ProcessingStatusCode.

A DataConsistencyStatusCode is a coded representation of consistency status of employee data and is of GDT type ConsistencyStatusCode.

A ReplicationUpdateStatusCode is a coded representation of status of the update of replication of employee data and is of GDT type UpdateStatusCode.

A PayrollRunUpdateStatusCode is a coded representation of status of an update of payroll run of an employee and is of GDT type UpdateStatusCode.

A PayrollProcessFollowOnProcessingStatusCode is a coded representation of follow on processing status and is of GDT type ProcessingStatusCode.

A DataPreparationInclusionStatusCode is a coded representation of inclusion of employee in Data Preparation and is of GDT type InclusionStatusCode.

A DataConsistencyCheckInclusionStatusCode is a coded representation of inclusion of employee in Data consistency check and is of GDT type InclusionStatusCode.

A ReplicationInclusionStatusCode is a coded representation of inclusion of employee in Replication and is of GDT type InclusionStatusCode.

A PayrollRunInclusionStatusCode is a coded representation of inclusion of employee in Payroll Run and is of GDT type InclusionStatusCode.

A FollowOnInclusionStatusCode is a coded representation of inclusion of employee in Follow On and is of GDT type InclusionStatusCode.

An EmployeePayrollInputUUID is a globally unique identifier of the EmployeePayrollInput instance of an employee that belongs to a PayrollProcess and is of GDT type UUID.

The following composition relationships to subordinate nodes exist: EmployeeErrorItem 300020 has a cardinality of 1:cn, and the filter elements are defined by the data type: PayrollProcessEmployeeErrorItemFilterElements. These elements are: See ARIS, EmployeePersonnelEvent 300022 has a cardinality of 1:cn and the filter elements are defined by the data type: PayrollProcessEmployeePersonnelEventFilterElements. These elements are: See ARIS, EmployeeWorkAgreement 300024 has a cardinality of 1:cn.

An inbound aggregation relationship exists from the business object Business Partner _Template, node Employee: BusinessPartner has a cardinality of 1:cn and is the employee for which the Employee node is valid. Once created, employee instances cannot be deleted except when the root is deleted.

The NotifyOfDataPreparationCompletion action notifies the completion of data preparation for an employee. In some implementations, when the data preparation at the root node is triggered, the MDRO is triggered. The MDRO then triggers the EmployeePayrollInput business object to start the data (repreparation for the employee. Once it is completed, the EmployeePayrollInput business object triggers this action to notify the completion of the payroll process at the employee level. The DataPreparationProcessingStatus should be in the “Not Started” or “Finished” state and DataPreparationInclusionStatus is “Included” state. The Employee instances are created. The data preparation has been completed at EmployeePayrollInput BO and the status is updated. The DataPreparationProcessingStatus changes to “finished” state. This action is triggered by the Employee Payroll Input business object once the data is updated.

The NotifyOfDataConsistency issues a consistency notification after performing the consistency check for the employee belonging to the payroll group. In some implementations, this action is triggered by the Employee Payroll Input business object instance corresponding to this employee once the MDRO has triggered the consistency check and the check is completed. The DataConsistencyStatus is in “Check Pending” State and DataConsistencyInclusionStatus is “Included” state. After the execution of the action, the DataConsistencyStatus changes to “Consistent” state. This action is triggered by the Employee Payroll Input business object once the check is completed.

NotifyOfDataInconsistency notifies of inconsistency after performing the consistency check for the employee belonging to the payroll group. In some implementations, this action is triggered by the Employee Payroll Input business object instance corresponding to this employee once the MDRO has triggered the consistency check and the check is completed. The DataConsistencyStatus is in “Check Pending” State and DataConsistencyInclusionStatus is “Included” state. After the execution of the action, the DataConsistencyStatus changes to “Inconsistent” state. This action is triggered by the Employee Payroll Input business object once the check is completed.

NotifyOfReplicationStart notifies the replication of data for an employee belonging to the current payroll group. In some implementations, when the replication is started at the root node, the MDRO is triggered. It triggers the data replication for each EmployeePayrollInput business object. The EmployeePayrollInput business object updates the corresponding employee node instance by triggering this action. In some implementations, used only by an ERP provider. The usage is restricted through separate SAM schemas for different providers. ReplicationInclusionStatus is “Included” state. For every EmployeePayrollInput for the current payroll group, the replication is started and the status updated accordingly. After the execution of the action, the ReplicationUpdateStatus changes to “In Process” state. This action is triggered by Employee Payroll Input business object once replication is started.

NotifyOfReplicationSuccess notifies of a successful replication of the data of an employee belonging to the payroll group. In some implementations, this action is triggered when the provider sends a message with the replication status of all employees. In some implementations, used only by an ERP provider. The usage is restricted through separate SAM schemas for different providers. The ReplicationUpdateStatus should be in "In Process" State and ReplicationInclusionStatus is "Included" state. After the execution of the action, the ReplicationUpdateStatus changes to "Successful" state. This action is triggered by Process Agent.

NotifyOfReplicationFailure notifies of failed replication of the data of an employee belonging to the payroll group. In some implementations, this action is triggered when the provider sends a message with the replication status of all employees. In some implementations, used only by an ERP provider. The usage is restricted through separate SAM schemas for different providers. The ReplicationUpdateStatus should be in "In Process" State and ReplicationInclusionStatus is "Included" state. After the execution of the action, the ReplicationUpdateStatus changes to "Failed" state. This action is triggered by Process Agent.

NotifyOfPayrollRunRequested notifies (at the employee level) that a request has been sent to the payroll provider for a payroll run for this employee along with others. In some implementations, this action is triggered when the "RequestRun" action is triggered at the root node when the run request is sent to the provider. In some implementations, used only by an ERP provider. The usage is restricted through separate SAM schemas for different providers. PayrollRunInclusionStatus is "Included" state. After the execution of the action, the PayrollRunUpdateStatus changes to "In Process" state. This action is triggered by the business object itself.

NotifyOfPayrollRunSuccess notifies of a successful run for an employee belonging to the payroll group. In some implementations, this action is triggered when the provider sends a message with the run status of all employees. In some implementations, used only by an ERP provider. The usage is restricted through separate SAM schemas for different providers. The PayrollRunUpdateStatus is in "In Process" State and PayrollRunInclusionStatus is "Included" state. After the execution of the action, the PayrollRunUpdateStatus changes to "Successful" state. This action is triggered by Process Agent.

NotifyOfPayrollRunFailure notifies of a failed run for an employee belonging to the payroll group. In some implementations, this action is triggered when the provider sends a message with the run status of all employees. In some implementations, used only by an ERP provider. The usage is restricted through separate SAM schemas for different providers. The PayrollRunUpdateStatus is in "In Process" State and PayrollRunInclusionStatus is "Included" state. After the execution of the action, the PayrollRunUpdateStatus changes to "Failed" state. This action is triggered by Process Agent.

ExcludeFromDataPreparation excludes the employee from the data preparation process. In some implementations, this action is triggered when the user wants to manually exclude an employee from the data preparation process. The DataPreparationInclusionStatus is in "Included" State. After the execution of the action, the DataPreparationInclusionStatus changes to "Excluded" state. This action is triggered by the User.

IncludeInDataPreparation includes the employee in the data preparation process. In some implementations, this action is triggered when the user wants to manually include an employee in the data preparation process. The DataPreparationInclusionStatus is in "Excluded" State. After the execution of the action, the DataPreparationInclusionStatus changes to "Included" state. This action is triggered by the User.

ExcludeFromDataConsistencyCheck excludes the employee from the data consistency check process. In some implementations, this action is triggered when the user wants to manually exclude an employee from the data consistency check process. The DataConsistencyCheckInclusionStatus is in "Included" State. After the execution of the action, the DataConsistencyCheckInclusionStatus changes to "Excluded" state. This action is triggered by the User.

IncludeInDataConsistencyCheck includes the employee in the data consistency check process. In some implementations, this action is triggered when the user wants to manually include an employee from the data consistency check process. The DataConsistencyCheckInclusionStatus is in "Excluded" State. After the execution of the action, the DataConsistencyCheckInclusionStatus changes to "Included" state. This action is triggered by the User.

ExcludeFromReplication excludes the employee from the replication process. In some implementations, This action is triggered when the user wants to manually exclude an employee from the replication process. The ReplicationInclusionStatus is in "Included" State. After the execution of the action, the ReplicationInclusionStatus changes to "Excluded" state. This action is triggered by the User.

IncludeInReplication includes the employee in the replication process. In some implementations, this action is triggered when the user wants to manually include an employee in the replication process. The ReplicationInclusionStatus is in "Excluded" State. After the execution of the action, the ReplicationInclusionStatus changes to "Included" state. This action is triggered by the User.

ExcludeFromPayrollRun excludes the employee from the payroll run process. In some implementations, This action is triggered when the user wants to manually exclude an employee from the payroll run process.

Preconditions: The PayrollRunInclusionStatus is in "Included" State. After the execution of the action, the PayrollRunInclusionStatus changes to "Excluded" state. This action is triggered by the User.

IncludeInPayrollRun includes the employee in the payroll run process. In some implementations, This action is triggered when the user wants to manually include an employee in the payroll run process. The PayrollRunInclusionStatus is in "Excluded" State. After the execution of the action, the PayrollRunInclusionStatus changes to "Included" state. This action is triggered by the User.

ExcludeFromFollowOnProcessing excludes the employee from the follow-on process. In some implementations, this action is triggered when the user wants to manually exclude an employee from the follow-on process. The FollowOnInclusionStatus is in "Included" State. After the execution of the action, the FollowOnInclusionStatus changes to "Excluded" state. This action is triggered by the User.

IncludeInFollowOnProcessing includes the employee in the data preparation process.

In some implementations, this action is triggered when the user wants to manually include an employee in the data preparation process. The FollowOnInclusionStatus is in "Excluded" State. After the execution of the action, the FollowOnInclusionStatus changes to "Included" state. This action is triggered by the User.

The NotifyOfPayrollRunCancellation is triggered to Cancel the Payroll run requested for the employee. In some implementations, this action is triggered automatically when the action CancelPayrollRun is triggered at the root node. The PayrollRunUpdateStatusCode should be in "In Process" state. The PayrollRunUpdateStatusCode changes to "Not Started" state. This action triggered from the root node.

QueryByElements provides a list of all Employees who comply with the following selection criteria: the query elements are defined by the data type: PayrollProcessEmployeeElementsQueryElements. These elements include: PayrollProcessID, PayrollProcessCountryCode, PayrollProcessPayrollGroupCode, PayrollProcessPayrollPeriod, Status, DataPreparationProcessingStatusCode, DataConsistencyStatusCode, ReplicationUpdateStatusCode, PayrollRunUpdateStatusCode, PayrollProcessFollowOnProcessingStatusCode, DataPreparationInclusionStatusCode, DataConsistencyCheckInclusionStatusCode, ReplicationInclusionStatusCode, PayrollRunInclusionStatusCode, FollowOnInclusionStatusCode, EmployeeUUID, EmployeePayrollInputUUID.

PayrollProcessID is optional, is the Payroll Process the employee belongs to, and is of GDT type BusinessTransactionDocumentID. PayrollProcessCountryCode is optional, identifies the country for which the payroll process is being run, and is of GDT type CountryCode. PayrollProcessPayrollGroupCode is optional, is a coded representation of a payroll group, and is of GDT type PayrollGroupCode. PayrollProcessPayrollPeriod is optional, is the period of time for which payroll is run, and is of GDT type PayrollPeriod. Status is optional, indicates the current step in the life cycle of the PayrollProcess for an employee, and is of IDT type PayrollProcessEmployeeStatus. DataPreparationProcessingStatusCode is a coded representation of a processing status of data preparation and is of GDT type ProcessingStatusCode. A DataConsistencyStatusCode is a coded representation of consistency status of employee data and is of GDT type ConsistencyStatusCode. A ReplicationUpdateStatusCode is a coded representation of status of the update of replication of employee data and is of GDT type UpdateStatusCode. A PayrollRunUpdateStatusCode is a coded representation of status of an update of payroll run of an employee and is of GDT type UpdateStatusCode. PayrollProcessFollowOnProcessingStatusCode A PayrollProcessFollowOnProcessingStatusCode is a coded representation of follow on processing status.

is of GDT type ProcessingStatusCode. A DataPreparationInclusionStatusCode is a coded representation of inclusion of employee in Data Preparation and is of GDT type InclusionStatusCode. A DataConsistencyCheckInclusionStatusCode is a coded representation of inclusion of employee in Data consistency check and is of GDT type InclusionStatusCode. A ReplicationInclusionStatusCode is a coded representation of inclusion of employee in Replication and is of GDT type InclusionStatusCode. A PayrollRunInclusionStatusCode is a coded representation of inclusion of employee in Payroll Run and is of GDT type InclusionStatusCode. A FollowOnInclusionStatusCode is a coded representation of inclusion of employee in Follow On and is of GDT type InclusionStatusCode. EmployeeUUID is optional, is a globally unique identifier of the employee that belongs to a PayrollProcess and is of GDT type UUID. EmployeePayrollInputUUID is optional, is a globally unique identifier of the EmployeePayrollInput instance of an employee that belongs to a PayrollProcess, and is of GDT type UUID.

EmployeeErrorItem is an error in the processing of an employee. The elements located directly at the node EmployeeErrorItem are defined by the data type: PayrollProcessEmployeeErrorItemElements. These elements include: PayrollProcessStepTypeCode is the type code of the step that caused that ErrorItem, and is of GDT type PayrollProcessStepTypeCode. ObjectNodeReference is optional, is the reference to the node in the payroll input object that caused that ErrorItem, and is of GDT type ObjectNodeReference. LogItem is the error message that is generated when a payroll process step is executed, and is of GDT type LogItem. CompletedIndicator indicates if the error item has been completed or not and is of GDT type Indicator.

Complete marks the completion/resolution of the error item for an employee. In some implementations, this action is triggered by the UI when the corresponding BTM task is completed. The error item node instances are marked as completed by setting the complete indicator to true EmployeePersonnelEvent is a personnel event that occurred for the employee in the payroll period of the process. The elements located directly at the node EmployeePersonnelEvent are defined by the data type: PayrollProcessEmployeePersonnelEventElements. These elements include: PersonnelEventTypeCode is the type code of the personnel event and is of GDT type PersonnelEventTypeCode. Date is the date of the personnel event and is of GDT type Date.

EmployeeWorkAgreement is a work agreement of the employee this payroll process runs for. The elements located directly at the node EmployeeWorkAgreement are defined by the data type: PayrollProcessEmployeeWorkAgreementElements. These elements include: PayrollProviderID is a globally unique identifier of the WorkAgreement for the payroll provider, and is of GDT type ObjectID. WorkAgreementUUID is the globally unique identifier of the WorkAgreement of the employee that belongs to a PayrollProcess, and is of GDT type UUID.

Inbound aggregation relationships include: From the business object Work Agreement, node Work Agreement: WorkAgreement has a cardinality of 1:cn.

Step

A step is a particular activity in the payroll process. The step could be data preparation, consistency check, data replication, payroll run or the follow-on processing. The elements located directly at the node Step are defined by the data type: PayrollProcessStepElements. These elements include: ID, TypeCode, StartDateTime, EndDateTime, ConfirmationRequestedIndicator, ConfirmationReceivedIndicator, PayrollRunPlannedDate, CancelledIndicator.

ID is a globally unique identifier of a PayrollProcessStep and is of GDT type PayrollProcessStepID. TypeCode is a coded representation of the type of payroll step and is of GDT type PayrollProcessStepTypeCode. StartDateTime is optional, is the start date and time of a step in the PayrollProcess, and is of GDT type GLOBAL_DateTime. EndDateTime is optional, is the end date and time of a step in the PayrollProcess, and is of GDT type GLOBAL_DateTime. ConfirmationRequestedIndicator indicates whether confirmation from the payroll provider has been requested or not, and is of GDT type Indicator. ConfirmationReceivedIndicator indicates whether confirmation from the payroll provider has been received or not and is of GDT type Indicator. PayrollRunPlannedDate is optional, is the date when the payroll run is planned, and is of GDT type Date. CancelledIndicator indicates if the payroll step was cancelled or not, and is of GDT type Indicator.

The following composition relationships to subordinate nodes exist: StepConfirmation has a cardinality of 1:cn.

The PayrollRunPlannedDate can be used only when the step type code is “Payroll Run request”. The ResponseReceivedIndicator should be set if at least one StepConfirmation exists.

StepConfirmation is a confirmation for a particular activity in the payroll process. There might be different confirmations for sub-activities within one step of payroll process. The elements located directly at the node StepConfirmation are defined by the data type: PayrollProcessStepConfirmationElements. These elements include: TypeCode is a coded representation of the type of confirmation for an execution step of the payroll process and is of GDT type PayrollProcessStepConfirmationTypeCode. ReceiptDateTime is the date and time when confirmation was received for a step in the PayrollProcess and is of GDT type GLOBAL_DateTime.

AccessControlList (DO Inclusion Node

AccessControlList is a list of access groups that have access to the payroll process during a validity period.

AttachmentFolder (DO Inclusion Node

AttachmentFolder is an Attachment Folder (root) is the collection of all documents attached to (or part of) the Payroll Process business object.

FIG. 301-1 through 301-2 illustrates one example logical configuration of PayrollProcessNotification message 301000. Specifically, this figure depicts the arrangement and hierarchy of various components such as one or more levels of packages, entities, and datatypes, shown here as 301000 through 301014. As described above, packages may be used to represent hierarchy levels. Entities are discrete business elements that are used during a business transaction. Data types are used to type object entities and interfaces with a structure. For example, PayrollProcessNotification message 301000 includes, among other things, PayrollProcess 301004. Accordingly, heterogeneous applications may communicate using this consistent message configured as such.

FIG. 302-1 through 302-4 illustrates one example logical configuration of PayrollProcessNotification-Message message 302000. Specifically, this figure depicts the arrangement and hierarchy of various components such as one or more levels of packages, entities, and datatypes, shown here as 302000 through 302116. As described above, packages may be used to represent hierarchy levels. Entities are discrete business elements that are used during a business transaction. Data types are used to type object entities and interfaces with a structure. For example, PayrollProcessNotificationMessage message 302000 includes, among other things, PayrollProcessNotificationPackage 302038. Accordingly, hetero-geneous applications may communicate using this consistent message configured as such.

FIG. 303-1 through 303-5 illustrates one example logical configuration of PayrollStepExecutionCon-firmationMessage message 303000. Specifically, this figure depicts the arrangement and hierarchy of various components such as one or more levels of packages, entities, and datatypes, shown here as 303000 through 303140. As described above, packages may be used to represent hierarchy levels. Entities are discrete business elements that are used during a business transaction. Data types are used to type object entities and interfaces with a structure. For example, PayrollStepExecutionConfirmation-Message message 303000 includes, among other things, PayrollStepExecutionConfirmationPackage 303074. Accordingly, heterogeneous applications may communicate using this consistent message configured as such.

FIG. 304-1 through 304-4 illustrates one example logical configuration of PayrollStepExecutionRe-questMessage message 304000. Specifically, this figure depicts the arrangement and hierarchy of vari-ous components such as one or more levels of packages, entities, and datatypes, shown here as 304000 through 304140. As described above, packages may be used to represent hierarchy levels. Entities are discrete business elements that are used during a business transaction. Data types are used to type object entities and interfaces with a structure. For example, PayrollStepExecutionRequest-Message mes-sage 304000 includes, among other things, PayrollProcessPackage 304074. Accordingly, heterogeneous applications may communicate using this consistent message configured as such.

Message Types and their Signatures

This section describes the message types and their signatures that are derived from the operations of the business object PayrollProcess. In a signature, the business object is contained as a "leading" business object. The message data type determines the structure of the following message types.

Motivating Business Scenarios

The BO PayrollProcess holds information about the payroll process run for a payroll group in a payroll period. This data is transmitted initially to Human Capital Management. Any changes to it are transmitted later.

Message Type(s)

Payroll Process Notification is notification to Human Capital Management of the payroll process for a particular payroll period and payroll group. The structure of this message type is determined by the mes-sage data type PayrollProcessNotificationMessage. For details of constraints on the structure and integ-rity conditions of Payroll Process Notification that are imposed by message data type PayrollProcessNoti-fica-tionMessage, refer to the relevant subsection. This message type is used in the following operations of business objects: HumanCapitalManagementViewOfPayrollProcess, PayrollProcess.

HumanCapitalManagementViewOfPayrollProcess—Maintain View Of Payroll Process. PayrollProcess—Notify Of Payroll Process.

PayrollProcessNotificationMessage

This message data type contains the object PayrollProcessNotification which is contained in the business document. The business information that is relevant for sending a business document in a message.

It includes the packages: MessageHeader package, PayrollProcessNotification package. This message data type, therefore, provides the structure for the following message types and the operations that are based on them: PayrollProcessNotification.

MessageHeader Package

A grouping of business information that is relevant for sending a business document in a message. The MessageHeader contains: SenderParty and RecipientParty. It is of the type GDT: BusinessDocumentMessageHeader, and the following elements of the GDT are used: ID, CreationDateTime, TestDataIndicator, ReconciliationIndicator.

ID is the identifier of the message, and is of GDT type BusinessDocumentMessageID. CreationDateTime is the Date/time of the creation of the message and is of GDT type GLOBAL_DateTime. TestDataIndica-tor indicates if the business data contained in the message is test data or not and is of GDT type Indica-tor. ReconciliationIndicator is the indicator for Reconciliation and is of GDT type Indicator.

PayrollProcessNotification Package

The grouping of PayrollProcessNotification package with its entity: PayrollProcessNotification has a car-dinality of 1. The message data type's integrity is ensured by the data integrity conditions of Business Object PayrollProcess. For further information see the SRS for that BO.

PayrollProcess (see business object PayrollProcess, node Root). PayrollProcess contains the elements: @reconciliationPeriodCounterValue, @actionCode, ID, CountryCode, PayrollGroupCode, PayrollPeriod, PayrollDatePeriod, SelectionDate, PayrollRunDate, CurrentIndicator, and Status.

@reconciliationPeriodCounterValue has a cardinality of 1, and is of GDT type ReconciliationPeriod-CounterValue).

@actionCode has a cardinality of 1, and is of GDT type ActionCode. ID has a cardinality of 1, is the ID of a PayrollProcess, and is of GDT type BusinessTransactionDocumentID. CountryCode has a cardinality of 1, identifies the country for which the payroll process is being set up, and is of GDT type CountryCode. PayrollGroupCode has a cardinality of 1, is a coded representation of a payroll group for which the PayrollProcess runs, and is of GDT type PayrollGroupCode. PayrollPeriod has a cardinality of 1, is the payroll period of the PayrollProcess, and is of GDT type PayrollPeriod. PayrollDatePeriod has a cardinality of 1, and is of GDT type CLOSED_DatePeriod, Qualifier: Payroll. SelectionDate has a cardinality of 0:1, is the date on which employees master data is selected for payroll run, and is of GDT type Date, Qualifier: Selection. PayrollRunDate has a cardinality of 0:1, is the date when the payment is to be made for the PayrollPeriod, and is of GDT type Date, qualifier PayrollRun. CurrentIndicator has a cardi-nality of 1, indicates if the PayrollProcess is current or not, and is of GDT type Indicator, Qualifier: Current. Current indicator indicates that the payroll process for the payroll group is ready to be started or has already been started. Status has a cardinality of 1, and is of IDT type PayrollProcessStatus. It has the following elements: LifeCycleStatusCode has a cardinality of 1, is a coded representation of the life cycle status of a PayrollProcess, and is of GDT type PayrollProcessLifeCycleStatusCode.

Integrity conditions would be checked by the leading business object.

FIG. 305 illustrates one example of a CatalogueChangeList_Template business object model 305002. Specifically, this model depicts interactions among various hierarchical components of the CatalogueChangeList_Template, as well as external components that interact with the CatalogueChangeList_Template (shown here as 305000 and 305004 through 305024).

The CatalogueChangeList Business Object Template is a list of changes to a catalog. Some changes contained in the list can be both approved and published together. For example, the list can include references to catalog parts such as schema, section, or item for which changes can be registered by the system. In some examples, the list also includes statistical information about the number of created, updated or deleted parts. In some implementations, a Catalogue Change List can be represented by the node CatalogueChangeList 305026.

A CatalogueChangeList can specify a list of changed catalog parts (e.g., locales, properties, property data types, schemas, sections, items and views). The parts can be changed from the most recently published version of the catalog. A CatalogueChangeList may involve several versions of a catalog.

The elements located at the node CatalogueChangeList can be defined by the data type CatalogueChangeListElements. In some implementations, the elements can include ID, UUID, CatalogueUUID, SystemAdministrativeData, ReleaseChangeIdentityUUID, ReleaseChangeDateTime, CatalogueApprovalReasonDescription, CataloguePublishingTypeCode, DeletedIndicator, Status, LifeCycleStatusCode, and PublishingUpdateStatusCode.

In some implementations, the ID can be an identifier for a catalog change list. ID may be based on a GDT of type CatalogueChangeListID. The UUID can be a universal identifier, which may be unique, for a catalog change list. For example, the UUID may be based on a GDT of type UUID. The CatalogueUUID can be a universal identifier, which may be unique, for the catalog. The CatalogueUUID may be based on a GDT of type UUID. The SystemAdministrativeData can be administrative data stored within the system. For example, the data can include system users and time of change. The SystemAdministrativeData may be based on a GDT of type SystemAdministrativeData. The ReleaseChangeIdentityUUID can be an identity UUID of user who manually released the change list. In some examples, the ReleaseChangeIdentityUUID can be optional. The ReleaseChangeIdentityUUID may be based on a GDT type of UUID. The ReleaseChangeDateTime can be the timestamp of the acceptance/rejection of the change list. The ReleaseChangeDateTime may be based on a GDT of type GLOBAL_DateTime (e.g., with a Qualifier: Change). The CatalogueApprovalReasonDescription can be the text specifying the reason for accepting/rejecting the change list. In some examples, the CatalogueApprovalReasonDescription can be optional. The CatalogueApprovalReasonDescription may be based on a GDT of type _LONG_Description, with Qualifier: CatalogueApprovalReason. In some implementations, the CataloguePublishingTypeCode can be the code describing the type how the catalog publishing should be executed (e.g., ‘Full’) if the complete catalog should be published. The CataloguePublishingTypeCode can be optional. The CataloguePublishingTypeCode may be based on a GDT of type CataloguePublishingTypeCode In some implementations, the DeletedIndicator can indicate whether the change list is logically deleted (e.g., marked for deletion), or not. For example, the DeletedIndicator may be based on a GDT of type Indicator (e.g., with a Qualifier Deleted). The Status may be based on a GDT of type CatalogueChangeListStatus. The LifeCycleStatusCode can be the current step in the life cycle of a Catalogue Change List. The LifeCycleStatusCode may be based on a GDT of type CatalogueChangeListLifeCycleStatusCode. The PublishingUpdateStatusCode can be the current step in publishing of a Catalogue Change List. PublishingUpdateStatusCode may be based on a GDT of type UpdateStatusCode, with a Qualifier: Publishing.

In some implementations, the CatalogueChangeList can have a composition relationship with one or more subordinate nodes. For example, the CatalogueChangeList can have a cardinality relationship of 1:cn with UploadStatistic 305030 and 1:cn with ObjectReference 305032. In some implementations, the CatalogueChangeList can have an Inbound Aggregation Relationships from business object Product Catalogue 305028 or node Root. For example, the CatalogueChangeList can have a 1:cn cardinality relationship with ProductCatalogue. In some examples, a ProductCatalogue can be a reference to the product catalog, for which this is the change list. In some implementations, the CatalogueChangeList can have an Inbound Association Relationships from business object Identity or node Root. For example, the CatalogueChangeList can be related to CreationIdentity with a cardinality of 1:cn. In some examples, the CreationIdentity may be a reference to the Identity, which created the BO. For example, the CatalogueChangeList can be related to LastChangeIdentity with a cardinality of c:cn. In some examples, the LastChangeIdentity can be a reference to the Identity, which performed the last change on the BO. For example, the CatalogueChangeList can be related to ReleaseChangeIdentity with a cardinality of c:cn. In some examples, the ReleaseChangeIdentity can be a reference to the Identity, which manually released the change list.

The CatalogueChangeList can include Enterprise Service Infrastructure Actions. In some implementations, the CatalogueChangeList can include a ReleaseAndStartPublishing action. In one example, the ReleaseAndStartPublishing action can release a change list (e.g., by calling action ‘Release’) and start the publishing of a change list (e.g., by calling the action 'StartPublishing'). In some implementations, the ReleaseAndStartPublishing action can be performed if the CatalogueChangeList is in approval and the publishing is not started or is failed. The CatalogueChangeList can be released and the publishing process is started.

In some implementations, the CatalogueChangeList can include a StartPublishing (S&AM Action). The action can start the publishing of a change list. In some examples, the StartPublishing can be performed if the change list is approved and the publishing process is not started or is failed. In some implementations, the CatalogueChangeList can include a FinishPublishing (S&AM Action). For example, the action can finish the publishing of a change list and sets the result of the publishing. The FinishPublishing can be performed if the publishing is started. In some examples, the FinishPublishing can change a status of the CatalogueChangeList to either the publishing was successful or has failed. The action elements can be defined by the data type CatalogueChangeListFinishPublishingActionElements. The elements can include SuccessfullyCompletedIndicator. The SuccessfullyCompletedIndicator can specify if the publishing was successful or not. The SuccessfullyCompletedIndicator can be a GDT of type Indicator (e.g., Qualifier: Completed).

In some implementations, the CatalogueChangeList can include a Release (S&AM Action). For example, the action can release a change list. For example, a change list can include an approval decision was made for the objects of the change list and it therefore can be published now. The Release action can be performed if the change list is in release. The Release action can change the status of the CatalogueChangeList to released.

In some implementations, the CatalogueChangeList can include a Close (S&AM Action). For example, the action can close a change list. In some examples, the action can be performed if the change list is released and the publishing process has failed. The action can unlock the catalog. The action can change the status of the CatalogueChangeList to closed In some implementations, the CatalogueChangeList can include a Reopen (S&AM Action). For example, the action can reopen a change list. For example, the action can be performed if either the change list is in release or the change list is released and the publishing process has failed. The action can unlock the catalog. The action can change the status of the CatalogueChangeList to open.

In some implementations, the CatalogueChangeList can include a SubmitForRelease (S&AM Action). For example, the action can request release for a change list. In some examples, the action can be performed if the change list is open. The action can lock the catalog. The action can change the status of the CatalogueChangeList to open.

In some implementations, the CatalogueChangeList can include a StartCleanup. For example, the action starts a ProductCatalogueUpdateRun to cleanup (physically delete) a change list. The action can delete the change list logically (e.g., marked for deletion).

In some implementations, the CatalogueChangeList can include a Cleanup. For example, the action cleanups (physically deletes) a change list. In some examples, the action can be performed if the change list has to be logically deleted (this means it is marked for deletion). The action can delete the change list physically.

In some implementations, the CatalogueChangeList can include a StartCancellation (S&AM Action). For example, the action starts the cancellation of an ongoing publishing process. In some examples, the action can be performed if change list publishing process is running. The action can set publish process to 'In Cancellation'.

In some implementations, the CatalogueChangeList can include a FinishCancellation (S&AM Action). For example, the action finishes the cancellation of an ongoing publishing process. In some examples, the action can be performed if the publishing process is 'In Cancellation'. The action can change status to publishing has failed.

The CatalogueChangeList can include a QueryByCatalogueAndSystemAdministrativeData. For example, the query can provide a list of change lists which correspond to the given catalog and system administrative data (e.g., the creation date). The query elements can be defined by the data type CatalogueChangeListCatalogAndSystemAdministrativeDataQueryElements. The elements can include a CatalogueUUID, a SystemAdministrativeData, a CreationBusinessPartner_CommonPersonNameGivenName, a CreationBusinessPartner_CommonPersonNameFamilyName, a LastChangeBusinessPartner_CommonPersonNameGivenName, and a LastChangeBusinessPartner_CommonPersonNameFamilyName. In some examples, the CatalogueUUID can be optional and can be a GDT of type UUID. In some examples, the SystemAdministrativeData can be optional can be a GDT of type SystemAdministrativeData. In some examples, the CreationBusinessPartner_CommonPersonNameGivenName can be optional and can be a GDT of type LANGUAGEINDEPENDENT_MEDIUM_Name. For example, the CreationBusinessPartner_CommonPersonNameGivenName can be a given name of the Business Partner to which the Creation Identity from SystemAdministrativeData belongs. In some examples, the CreationBusinessPartner_CommonPersonNameFamilyName can be optional and can be a GDT of type LANGUAGEINDEPENDENT_MEDIUM_Name. For example, the CreationBusinessPartner_CommonPersonNameFamilyName can be a family name of the Business Partner to which the Creation Identity from SystemAdministrativeData belongs. In some example, the LastChangeBusinessPartner_CommonPersonNameGivenName can be optional and can be a GDT of type LANGUAGEINDEPENDENT_MEDIUM_Name. For example, the LastChangeBusinessPartner_CommonPersonNameGivenName can be given name of the Business Partner to which the Last Change Identity from SystemAdministrativeData belongs. In some examples, the LastChangeBusinessPartner_CommonPersonNameFamilyName can be optional and can be a GDT of type LANGUAGEINDEPENDENT_MEDIUM_Name. For example, the LastChangeBusinessPartner_CommonPersonNameFamilyName can be a family name of the Business Partner to which the Last Change Identity from SystemAdministrativeData belongs.

The CatalogueChangeList can include a QueryByStatus. For example, the query can provide a list of change lists which have the given status. In some implementations, the query elements can be defined by the data type CatalogueChangeListStatusQueryElements. The elements can include Status that can be optional and can be an IDT of type CatalogueChangeListStatus.

An UploadStatistic is the count of catalog sections and items, which were changed during an upload in the corresponding catalog. For example, the elements located at the node UploadStatistic can be defined by the data type CatalogueChangeListUploadStatisticElements. The elements can include CatalogueVersionUUID, SystemAdministrativeData, CreatedCatalogueSectionTotalNumberValue, UpdatedCatalogueSectionTotalNumberValue, DeletedCatalogue- SectionTotalNumberValue, CreatedCatalogueItemTotalNumberValue, UpdatedCatalogueItemTotalNumberValue, DeletedCatalogueItemTotalNumberValue, and DocumentPathName.

In some implementations, the CatalogueVersionUUID can be a universal identifier, which may be unique, for the catalog version, for which this is the upload statistic. The CatalogueVersionUUID may be based on a GDT of type UUID. The SystemAdministrativeData can be administrative data stored within the system, and is optional. The data can include system users and time of change. The SystemAdministrativeData may be based on a GDT of type SystemAdministrativeData. The CreatedCatalogueSectionTotalNumberValue can specify the number of sections created, and is optional. The CreatedCatalogueSectionTotalNumberValue may be based on a GDT of type NumberValue, with a Qualifier: Total. The UpdatedCatalogueSectionTotalNumberValue can specify the number of sections updated, and is optional. The UpdatedCatalogueSectionTotalNumberValue may be based on a GDT of type NumberValue, with a Qualifier: Total. The DeletedCatalogueSectionTotalNumberValue can specify the number of sections deleted, and is optional. The DeletedCatalogueSectionTotalNumberValue may be based on a GDT of type NumberValue, with a Qualifier: Total. The CreatedCatalogueItemTotalNumberValue can specify the number of items created, and can be optional. The CreatedCatalogueItemTotalNumberValue may be based on a GDT of type NumberValue, with a Qualifier: Total. The UpdatedCatalogueItemTotalNumberValue can specify the number of items updated, and can be optional. The UpdatedCatalogueItemTotalNumberValue may be based on a GDT of type NumberValue, with Qualifier: Total.

The DeletedCatalogueItemTotalNumberValue can specify the number of items deleted, and can be optional. The DeletedCatalogueItemTotalNumberValue may be based on a GDT of type NumberValue, with a Qualifier: Total. The DocumentPathName can specify the name of the document (file)-including the complete path-, whose upload created this upload statistic. For example, the DocumentPathName can be based on a GDT of type _LANGUAGEINDEPENDENT_Name, with a Qualifier DocumentPath.

In some implementations, the UploadStatistic can include Inbound Aggregation Relationships from business object Product Catalogue or node Version. For example, the UploadStatistic can be related to ProductCatalogueVersion with a cardinality relationship of 1:cn. In some examples, the ProductCatalogueVersion can be a reference to the product catalog version, for which this is the upload statistic. In some implementations, the UploadStatistic can include Inbound Association Relationships from business object Identity or node Root. In some examples, the UploadStatistic can be related to CreationIdentity with a cardinality of 1:cn. For example, the CreationIdentity can be a reference to the Identity, which created the node. In some examples, the UploadStatistic can be related to LastChangeIdentity with cardinality of c:cn. For example, the LastChangeIdentity can be a reference to the Identity, which performed the last change on the node.

An ObjectReference references a catalog part (e.g., locale, property, property data type, schema, section, section type, item or view), which was changed since the most recent version of the catalog, which is fully published. In some examples, the elements located at the node ObjectReference can be defined by the data type: CatalogueChangeListObjectReferenceElements. The elements can include CatalogueLocaleUUID, CatalogueSalesAreaUUID, PropertyUUID, PropertyDataTypeUUID, CatalogueSchemaUUID, CatalogueSectionUUID, CatalogueViewUUID, VersionUUID, SystemAdministrativeData, and ActionCode.

In some implementations, the CatalogueLocaleUUID can be a universal identifier, which can be unique, for a changed catalog locale. The CatalogueLocaleUUID may be based on a GDT of type UUID. The CatalogueSalesAreaUUID can be a universal identifier, which may be unique, for a changed catalog sales area, and can be optional. The CatalogueSalesAreaUUID may be based on a GDT of type UUID. The PropertyUUID can be a universal identifier, which may be unique, for a changed catalog property, and can be optional. The PropertyUUID may be based on a GDT of type UUID. The PropertyDataTypeUUID can be a universal identifier, which may be unique, for a changed catalog property data type. The PropertyDataTypeUUID may be based on a GDT of type UUID. The CatalogueSchemaUUID can be a universal identifier, which may be unique for a changed catalog schema, and is optional. The CatalogueSchemaUUID may be based on a GDT of type UUID. The CatalogueSectionUUID can be a universal identifier, which may be unique, for a changed catalog section, and is optional. The CatalogueItemUUID can be a universal identifier, which may be unique, for a changed catalog item, and is optional. The CatalogueItemUUID may be based on a GDT of type UUID. The CatalogueViewUUID can be a universal identifier, which may be unique, for a changed catalog view, and can be optional. The CatalogueViewUUID may be based on a GDT of type UUID. The VersionUUID can be a universal identifier, which may be unique, for the version in which a changed catalog object can be available, and can be optional. The VersionUUID may be based on a GDT of type UUID. The SystemAdministrativeData can be the administrative data stored within the system. The data includes system users and time of change. The SystemAdministrativeData may be based on a GDT of type SystemAdministrativeData. The ActionCode can be a coded representation of the operation executed on the referenced object. The ActionCode may be based on a GDT of type ActionCode.

In some implementations, the ObjectReference can include Inbound Aggregation Relationships from business object Product Catalogue or node VersionCatalogueLocale. In some examples, the ObjectReference can be related to CatalogueLocale with a cardinality of c:cn. For example, the CatalogueLocale can be changed catalog locale. In some example, the ObjectReference can include Inbound Aggregation Relationships from business object Product Catalogue or node VersionCatalogueSalesArea. In some examples, the ObjectReference can be related to CatalogueSalesArea with a cardinality of c:cn. For example, the CatalogueSalesArea can be changed catalog sales area. In some implementations, the can include Inbound Aggregation Relationships from business object Product Catalogue or node VersionCataloguePropertyDataType. In some examples, the ObjectReference can be related to PropertyDataType with a cardinality of c:cn. For example, the PropertyDataType can be changed catalog property data type. In some implementations, the ObjectReference can include Inbound Aggregation Relationships from business object Product Catalogue or node VersionCatalogueProperty. In some examples, the ObjectReference can be related to Property with a cardinality of c:cn. For example, the Property can be changed catalog property. In some implementations, the ObjectReference can include Inbound Aggregation Relationships from business object Product Catalogue or node VersionCatalogueSchema. In some examples, the ObjectReference can be related to CatalogueSchema with a cardinality of c:cn. For example, the CatalogueSchema can be changed catalog schema. In some implementations, the ObjectReference can include Inbound Aggregation Relationships from business object Product Catalogue or node VersionCatalogueSchemaSection. In some examples, the ObjectReference can be related to CatalogueSection with a cardinality of c:cn. For example, the CatalogueSection can be changed catalog section. In some implementations, the ObjectReference can include Inbound Aggregation Relationships from business object Product Catalogue or node VersionCatalogueItem. In some examples, the ObjectReference can be related to CatalogueItem with a cardinality of c:cn. For example, the CatalogueItem can be changed catalog item. In some implementations, the ObjectReference can include Inbound Aggregation Relationships from business object Product Catalogue or node VersionCatalogueView. In some examples, the ObjectReference can be related to CatalogueView with a cardinality of c:cn. For example, the CatalogueView can be changed catalog view.

In some implementations, the ObjectReference can include Inbound Association Relationships from business object Identity or node Root. In some examples, the ObjectReference can be related to CreationIdentity with a cardinality of 1:cn. For example, the CatalogueView can be a reference to the Identity, which created the node. some examples, the ObjectReference can be related to LastChangeIdentity with a cardinality of 1:cn. For example, the LastChangeIdentity can be a reference to the Identity, which performed the last change on the node.

In some implementations, the ObjectReference can include Enterprise Service Infrastructure Actions. For example, the ObjectReference can include a Cleanup action. In some examples, the action cleanups (e.g., physically deletes) an object reference.

In some implementations, the ObjectReference can include QueryByElements. The query can provide a list of object references which correspond to the given identifiers, version and action code.

The query elements can be defined by the data type CatalogueChangeListObjectReferenceElementsQueryElements. The elements can be a VersionUUID, an ActionCodem, a CatalogueLocaleUUID, a CatalogueSalesAreaUUID, a PropertyUUID, a PropertyDataTypeUUID, a CatalogueSchemaUUID, a CatalogueSectionUUID, a CatalogueItemUUID, and a CatalogueViewUUID.

In some implementations, the VersionUUID can be a GDT of type UUID. The ActionCode can be optional and can be a GDT of type ActionCode. The CatalogueLocaleUUID can be optional and a GDT of type UUID. The CatalogueSalesAreaUUID can be optional and can be a GDT of type UUID. The PropertyUUID can be optional and can be a GDT of type UUID. The PropertyDataTypeUUID can be optional and can be a GDT of type UUID. The CatalogueSchemaUUID can be optional and can be a GDT of type UUID. The CatalogueSectionUUID can be optional and can be a GDT of type UUID. The CatalogueItemUUID can be optional and can be a GDT of type UUID. The CatalogueViewUUID can be optional and can be a GDT of type UUID.

Derived Business Objects

In some implementations, business objects can be derived. Some derivations of the business object template Catalogue Change List can be implemented as business objects: Product Catalogue Change List. For example, the nodes CatalogueChangeList (Root), VersionStatistic, and ObjectReference can be available for these derivations.

Product Catalogue Change List is a list of changes to a product catalog changes contained in the list can be both approved and published together. The list mainly consists of references to catalog parts such as schema, section or item for which changes have been registered by the system. In addition it contains statistical information about the number of created, updated or deleted parts. The business object Product Catalogue Change List is part of the process component Product Catalog Authoring.

FIGS. 306-1 through 306-9 illustrate an example US_EmployeePayrollInput business object model 306014. Specifically, this model depicts interactions among various hierarchical components of the US_EmployeePayrollInput, as well as external components that interact with the US_EmployeePayrollInput (shown here as 306000 through 306012 and 306014 through 306056).

A Business Object US_Employee Payroll Input is a Summary of all employee-specific input for US payroll for one employee. The business object US_Employee Payroll Input belongs to the process component Payroll Processing. The object US_Employee Payroll Input contains payroll relevant information on the: employee including US tax information, and employment. There may exist Service Interfaces that the Business Object is involved in the following Process Component Interaction Models: Compensation Management_Payroll Processing, Employee Payroll Administration_Payroll Processing, Expense and Reimbursement Management_Payroll Processing, Payroll Processing_Payroll Processing at Provider_US, Time and Labour Management_Payroll Processing_Agreement, Time and Labour Management_Payroll Processing_Calendar and Account, and US Employer Regulatory Compliance_Payroll Processing.

A Service Interface Employee Compensation Agreement in Payroll Input Maintenance In has a technical name PayrollProcessingEmployeeCompensationAgreementInPayrollInputMaintenanceIn. The Service Interface Employee Compensation Agreement in Payroll Input Maintenance In is part of the following Process Component Interaction Model: Compensation Management_Payroll Processing. Furthermore, it groups the operations that maintain Employee Compensation Agreement information in the Employee Payroll Input business object.

A Maintain Employee Payroll Input based on Employee Compensation Agreement has a technical name PayrollProcessingEmployeeCompensationAgreementInPayrollInputMaintenanceIn.MaintainBasedOnCompensationAgreement and maintains information on an Employee's Compensation Agreement in the Employee Payroll Input business object. The operation can be based on message type Employee Compensation Agreement Payroll Notification.

A Service Interface Employee Payroll Agreement in Payroll Input Maintenance In has a technical name PayrollProcessingEmployeePayrollAgreementInPayrollInputMaintenanceIn and the Service Interface Employee Payroll Agreement in Payroll Input Maintenance In is part of the Process Component Interaction Model Employee Payroll Administration_Payroll Processing, and groups the operations that maintain Employee Payroll Agreement information in the Employee Payroll Input business object.

A Maintain Employee Payroll Input based on Employee Payroll Agreement has a technical name PayrollProcessingEmployeePayrollAgreementInPayrollInputMaintenanceIn.MaintainBasedOnEmployeePayrollAgreement and maintains the business object XX_EmployeePayrollInput based on changes made to business object EmployeePayrollAgreement, where XX represents the country in which the employee is employed. The operation can be based on message type Employee Payroll Agreement Payroll Notification.

A Service Interface Expense Report in Payroll Input Maintenance In has a technical name PayrollProcessingExpenseReportInPayrollInputMaintenanceIn and the Service Interface Expense Report in Payroll Input Maintenance In is part of the Process Component Interaction Modes Expense and Reimbursement Management_Payroll Processing, and groups the operations that maintain Expense Report information in the Employee Payroll Input business object.

A Maintain Employee Payroll Input based on Settlement Result Cancellation has a technical name PayrollProcessingExpenseReportInPayrollInputMaintenanceIn.MaintainBasedOnSettlementResultCancellation and maintains information on a settlement result cancellation in the Employee Payroll Input business object. The operation can be based on message type Expense Report Settlement Result Cancellation Payroll Notification.

A Maintain Employee Payroll Input based on Settlement Result has a technical name PayrollProcessingExpenseReportInPayrollInputMaintenanceIn.MaintainEmployeePayrollInputBasedOnSettlementResult and maintains information on a settlement result in the Employee Payroll Input business object. The operation can be based on message type Expense Report Settlement Result Payroll Notification.

A Service Interface US_Employee Payroll Input Replication In has a technical name PayrollProcessingUS_EmployeePayrollInputReplicationIn and the Service Interface US_Employee Payroll Input Replication In is part of the Process Component Interaction Model Payroll Processing_ Payroll Processing at Provider_US, and groups the operations that maintain information on the status of the US_Employee Payroll Input business object.

A Maintain US_Employee Payroll Input Status has a technical name PayrollProcessingUS_EmployeePayrollInputReplicationIn.MaintainUS_EmployeePayrollInputStatus and maintains information on the status of the US_Employee Payroll Input business object, and the operation can be based on message type Employee Payroll Input Replication Confirmation.

Service Interface US_Employee Payroll Input Replication Out has a technical name PayrollProcessingUS_EmployeePayrollInputReplicationOut and the Service Interface US_Employee Payroll Input Replication Out is part of the Process Component Interaction Model Payroll Processing_ Payroll Processing at Provider_US, and groups the operations that maintain the replication and status of the US_Employee Payroll Input business object.

A Request US_Employee Payroll Input Replication has a technical name PayrollProcessingUS_EmployeePayrollInputReplicationOut.RequestUS_EmployeePayrollInputReplication and requests replication of the US_Employee Payroll Input business object to the payroll provider. The operation can be based on message type US_Employee Payroll Input Replication Request.

A Service Interface Employee Time Agreement in Payroll Input Maintenance In has a technical name PayrollProcessingEmployeeTimeAgreementInPayrollInputMaintenanceIn. The Service Interface Employee Time Agreement in Payroll Input Maintenance In is part of the Process Component Interaction Model Time and Labour Management_Payroll Processing_Agreement, and groups operations that maintain Employee Time Agreement information in the Employee Payroll Input business object.

A Maintain Employee Payroll Input based on Planned Working Times has a technical name PayrollProcessingEmployeeTimeAgreementInPayrollInputMaintenanceIn.MaintainEmployeePayroll InputBasedOnPlannedWorkingTimes, and maintains the business object XX EmployeePayrollInput based on changes to the business object EmployeeTimeAgreement. XX represents the country in which the employee is employed. The operation can be based on message type Employee Time Agreement Planned Working Times Payroll Notification.

A Service Interface Employee Time Calendar and Account in Payroll Input Maintenance In has a technical name PayrollProcessingEmployeeTimeCalendarAndAccountInPayrollInputMaintenanceIn. The Service Interface Employee Time Calendar and Account in Payroll Input Maintenance In is part of the Process Component Interaction Model Time and Labour Management_Payroll Processing_Calendar and Account, and groups operations that maintain employee time calendar and time account information in the Employee Payroll Input business object.

A Maintain Employee Payroll Input based on Employee Time Account has a technical name PayrollProcessingEmployeeTimeCalendarAndAccountInPayrollInputMaintenanceIn.MaintainPayrollInputBasedOnTimeAccount, and maintains information on an employee's time account in the Employee Payroll Input business object. The operation can be based on message type Employee Time Account Payroll Notification.

A Maintain Employee Payroll Input based on Employee Time Calendar has a technical name PayrollProcessingEmployeeTimeCalendarAndAccountInPayrollInputMaintenanceIn.MaintainPayrollInputBasedOnTimeCalendar and maintains information on an employee's time calendar in the Employee Payroll Input business object. The operation is based on message type Employee Time Calendar Payroll Notification.

A Service Interface US Employer Regulatory Compliance in Payroll Input Maintenance In has a technical name PayrollProcessingUSEmployerRegulatoryComplianceInPayrollInputMaintenanceIn. The Service Interface US Employer Regulatory Compliance in Payroll Input Maintenance In is part of the Process Component Interaction Model: US Employer Regulatory Compliance_Payroll Processing, and groups operations that maintain US Employer Regulatory Compliance information in the Employee Payroll Input business object.

A Maintain US_Employee Payroll Input based on Tax Arrangement technical name PayrollProcessingUSEmployerRegulatoryComplianceInPayrollInputMaintenanceIn.MaintainBased OnEmployeeTaxArrangement and maintains information on an employee's US tax arrangement in the US_Employee Payroll Input business object. The operation can be based on message type US_Employee Tax Arrangement Payroll Notification.

A Business Object US_Employee Payroll Input, US_Employee Payroll Input (Root Node) 306058 is a summary of all employee-specific input for US payroll for one employee. These payroll guidelines for input for US payroll include compensation information and reported employee working times, but also legally-required data such as the tax authorities that are responsible for the employee and any additional information required by these tax authorities (for example, allowances, type of tax liability).

This information is copied from the original information in the Business Objects Employee, Employment, WorkAgreement, EmployeePayrollAgreement, EmployeeTimeAgreement, EmployeeTime, EmployeeCompensationAgreement and US_EmployeeTaxArrangement (These Business Objects are referred to as "primary BOs") in some implementations. The data from US_EmployeeTaxArrangement is held in US_EmployeePayrollInput directly; all other data is in dependent objects. These data in the US_EmployeePayrollInput object are never created or modified directly; instead it is maintained in synchronisation processes by inbound agents or the master data change interface, respectively. Hence all integrity conditions for data in the primary Business Objects are valid here, too. The business object contains administrative information and a versioning mechanism which works as follows: The structure of US_EmployeeTaxArrangement corresponds to that of the primary Business Objects. A BO Node <NodeName> in the primary object has a corresponding BO Node <NodeName> in US_EmployeePayrollInput, where it has a subnode <NodeName>Version which contains versions of the actual data copied from the primary BO. The node <NodeName> itself holds administrative data as well as associations to three distinguished versions: NewVersion, ToBeReplicatedVersion and LastSuccessfullyReplicatedVersion.

The elements located directly at the node US_Employee Payroll Input are defined by the data type: US_EmployeePayrollInputElements. These elements are: UUID, EmployeeUUID, Status, ToBeReplicatedVersionUpToDatenessStatusCode, ToBeReplicatedVersionConsistencyStatusCode, ReplicationUpdateStatusCode, EmployeePayrollInputVersionReferences, PrimaryObjectID, ToBeReplicatedVersionDeletedIndicator, ToBeReplicatedVersionValidityPeriod, ToBeReplicatedVersionUUID, NewVersionUUID, and LastSuccessfullyReplicatedVersionUUID. UUID is a globally unique identifier for exactly one EmploymentPayrollInput and is of type GDT: UUID. EmployeeUUID (Alternative Key) is a globally unique identifier of the employee for whom the US_EmployeeTaxArrangement is valid, and is of type GDT: UUID. Status defines the current status in the lifecycle of the US_EmployeePayrollInput business object. and is of type IDT: US_EmployeePayrollInputStatus. ToBeReplicatedVersionUpToDatenessStatusCode is a status variable that is set by SAM. It identifies the status of the ToBeReplicated data of the BO and is of type GDT: UPTODATEOUTOFDATE_UpToDatenessStatusCode with Qualifier: ToBeReplicatedVersion. ToBeReplicatedVersionConsistencyStatusCode is a status variable that is set by SAM. It identifies the consistency of the ToBeReplicated data of the BO and is of type GDT: ConsistencyStatusCode with Qualifier: ToBeReplicatedVerision. ReplicationUpdateStatusCode is a status variable that is set by SAM. It identifies the status of the replication of data to the Payroll Provider and is of type GDT: UpdateStatusCode with Qualifier: Replication. EmployeePayrollInputVersionReferences is the references to a version of the node and is of type IDT: EmployeePayrollInputVersionReferences. PrimaryObjectID is optional and is the identifier of the node in the primary object of type GDT: ObjectID, with Qualifier: Primary Object. ToBeReplicatedVersionDeletedIndicator is the indicator that the primary node for the version that is about to be replicated to the provider or has already been replicated to the provider but not yet been confirmed as a successful replication has been deleted on the primary object and is of type GDT: Indicator with Qualifier: ToBeReplicated Version. ToBeReplicatedVersionValidityPeriod is optional and is the validity period of the version that is about to be replicated to the provider or has already been replicated to the provider but not yet been confirmed as a successful replication and is of type GDT: CLOSED_DatePeriod with Qualifier: ToBeReplicated Version. ToBeReplicatedVersionUUID is optional and is the universally unique identifier for the version that is about to be replicated to the provider or has already been replicated to the provider but not yet been confirmed as a successful replication. The identifier is created or adjusted when the payroll administrator decides to start replication to the provider. Furthermore, it is of type GDT: UUID with Qualifier: ToBeReplicated Version. NewVersionUUID is the universally unique identifier for the version that reflects the latest changes of the primary object and is of type GDT: UUID and Qualifier: New Version. LastSuccessfullyReplicatedVersionUUID is optional and is the universally unique identifier for the version last replicated to the provider where the provider has confirmed that the replication was successful. The identifier is created or adjusted when the provider confirms successful replication of the data. Furthermore, it is of type GDT: UUID withQualifier: LastSuccessfullyReplicated Version.

The following composition relationships to subordinate nodes exist: Version 306060 has a cardinality relationship of 1:N, Changed Node Reference 306062 has a cardinality relationship of 1:cn, and ChangedNodeReferenceFilterElements contains the elements: ValidityPeriod, ToBeReplicatedInformationOutdatedIndicator, ReplicationRequiredIndicator, Payroll Process Assignment 306064 has a cardinality relationship of 1:cn, Employment Item 306066 has a cardinality relationship of 1:cn, Employee Tax Arrangement Federal Tax Arrangement 306082 has a cardinality relationship of 1:cn, and DO EmployeePayrollInput 306110 has a cardinality relationship of 1:c.

There may exist Inbound Aggregation Relationships from the business object Business Partner _Template/node Employee (Cross DU) that Employee has a cardinality relationship of 1:c, and is the employee for whom the US_EmployeePayrollInput business object is valid.

There may exist (Specialization) Associations for Navigation to business object US_EmployeePayrollInput/Version, that LastSuccessfullyReplicatedVersion has a cardinality relationship of 1:c and is the version last replicated to the provider where the provider has confirmed that the replication was successful. The association is created or adjusted when the provider confirms successful replication of the data. Furthermore NewVersion has a cardinality relationship of 1:c and is the version that reflects the latest changes of the primary object. Furthermore, ToBeReplicatedVersion has a cardinality relationship of 1:c and is the version that is about to be replicated to the provider or has already been replicated to the provider but not yet been confirmed as a successful replication. The association is created or adjusted when the payroll administrator decides to start replication to the provider. Furthermore, to business object Payroll Process/Employee that PayrollProcessEmployee has a cardinality relationship of 1:cn and is the payroll process employee for the employee payroll input. This identifies a payroll process which is currently processing this input object.

There may exist the following Enterprise Service Infrastructure Actions. Generate To Be Replicated (S&AM action) is an action that controls the process that creates the ToBeReplicatedVersion. Preconditions can include that the ReplicationUpdateStatusCode does not have the value 'in process'. Changes to the object can include that this action: Call methods on the BO to derive data, and DeriveData actions DO s, and Calls the action NotifyOfToBeReplicatedVersionUpdate. Changes to the status can include that the ToBeReplicatedVersionsUpToDatenessStatusCode is set to 'up-to-date' Parameters can include that the action elements are defined by the data type: US_EmployeePayrollInputGenerateToBeReplicatedVersionsActionElements. These elements are: PayrollProcessID is optional and is an ID of a payroll process, of type GDT: BusinessTransactionDocumentID. It is triggered from PayrollProcess.

A Check To Be Replicated Consistency (S&AM action) action carries out a completeness check for data. Preconditions can include that the ToBeReplicatedConsistencyStatusCode is set to 'inconsistent' or 'check pending'. Changes to the status can include that if data is inconsistent or consistent the value of ToBeReplicatedConsistencyStatusCode is set to 'inconsistent' or 'consistent' respectively. Use is this action is triggered by the user from the payroll process, to check if the data that will be sent to the Payroll Provider is consistent from a business perspective.

A Replicate (S&AM action) sends the data to the Payroll Provider. Preconditions can include that ToBeReplicatedVersionsConsistencyStatusCode does not have the value 'check pending'. Changes to the status can include that ReplicationUpdateStatusCode is set to 'in process'. Use is that this is triggered by the PayrollProcess.

A Notify Of Replication Success (S&AM action) action calls relevant actions when replication of data to the Payroll Provider was successful. Preconditions can include that only NotifyOfReplicationResult may call this, in some implementations. Changes to the object can include that it calls NotifyOfReplicationConfirmation and CleanUp. Changes to other objects can include it calls NotifyOfReplicationSuccess on the PayrollProcess. Changes to the status can include ReplicationUpdate is set to 'successful'.

A Clean Up action cleans up the business object of data relevant only during the replication of data to the Payroll Provider in some implementations. Preconditions can include that only NotifyOfReplicationResult may call this in some implementations. Changes to the object can include that the PayrollProcessAssignment with all its subnodes is deleted.

A Notify Of Replication Failure (S&AM action) action calls relevant actions when replication of data to the Payroll Provider failed. Preconditions can include that only NotifyOfReplicationResult may call this, in some implementations. Changes to other objects can include that it calls NotifyOfReplicationFailure on the PayrollProcess.

A Notify Of Change updates ChangeNodeReference when changes to nodes in the object occur. This action is inactive in the ESR to ensure that a user cannot call it. Changes to the object can include that a new ChangeNodeReference node is created. The elements ObjectNodeReference and ParentObjectNodeReference are filled with the NewVersionUUID and its parent node UUID (when not a root node) respectively. The ActionCode is set according to the information in the message ActionCode. The ToBeReplicatedInformationOutdatedIndicator is set to 'true'. The ReplicationRequiredIndicator is set to 'false'.

Parameters may include that the action elements are defined by the data type: US_EmployeePayrollInputNotifyOfChangeActionElements. These elements are: ObjectNodeReference, ParentObjectNodeReference, ValidityPeriod, and ActionCode. ObjectNodeReference locates a particular node within the business object, is of type GDT: ObjectNodeReference, and contains the VersionIUUID from the node and the ObjectID form the VersionReferences in its parent node. ParentObjectNodeReference is optional and is the parent of the ObjectNodeReference, of type GDT: ObjectNodeReference, and is the parent of the VersionIUUID and the ObjectID form the VersionReferences in that parent's parent node. ValidityPeriod is optional, is a Validity period of the changed records, and is of type GDT: CLOSED_DatePeriod. ActionCode is a coded representation of an instruction to the recipient of a message telling it how to process a transmitted element and is of type GDT: ActionCode. Use may include the service ModifyNewVersion calls this action, whenever it is called by inbound agents from the HCM deployment unit, or Master Data Change Interface (MDCI) implementations for Employee, Employment or WorkAgreement.

A Notify Of To Be Replicated Version Update updates ChangeNodeReference when the ToBeReplicatedVersion is up to date in preparation for sending the data to the provider. This action is inactive in the ESR to ensure that a user cannot call it. Changes to the object can include ToBeReplicatedInformationOutdatedIndicator is set to 'false' and ReplicationRequiredIndicator is set to 'true'. Parameters can include that the action elements are defined by the data type: US_EmployeePayrollInputNotifyOfToBeReplicatedVersionUpdateActionElements. These elements are: ObjectNodeReference locates a particular node within the business object, and is of type GDT: ObjectNodeReference, and contains the VersionIUUID from the node and the ObjectID form the VersionReferences in its parent node, ParentObjectNodeReference is optional and is the parent of the ObjectNodeReference and is of type GDT: ObjectNodeReference, and is the parent of the VersionIUUID and the ObjectID form the VersionReferences in that parent's parent node. ActionCode is a coded representation of an instruction to the recipient of a message telling it how to process a transmitted element, and is of type GDT: ActionCode. A Use may be the action GenerateToBeReplicatedVersion calls this action.

A Notify Of Replication Confirmation updates ChangeNodeReference when replication was successful. This action is inactive in the ESR to ensure that a user cannot call it. Changes to the object can include that the ToBeReplicatedInformationOutdatedIndicator is set to 'false'. (It should already be 'false'). The ReplicationRequiredIndicator is set to 'false'. Parameters can include that the action elements are defined by the data type: US_EmployeePayrollInputNotifyOfReplicationConfirmationActionElements. These elements are: ObjectNodeReference, ParentObjectNodeReference, and ActionCode. ObjectNodeReference locates a particular node within the business object, and is of type GDT: ObjectNodeReference, and contains the VersionIUUID from the node and the ObjectID form the VersionReferences in its parent node. ParentObjectNodeReference is optional and is the parent of the ObjectNodeReference and is of type GDT: ObjectNodeReference, and is the parent of the VersionIUUID and the ObjectID form the VersionReferences in that parent's parent node. ActionCode is a coded representation of an instruction to the recipient of a message telling it how to process a transmitted element and is of type GDT: ActionCode. One use can include Called by action NotifyOfReplicationResult when the payroll provider has reported a successful replication of data in the provider system.

A Notify Of To Be Replicated Versions Out Of Dateness (S&AM action) updates the ToBeReplicatedVersionsUpToDatenessStatusCode when changes to nodes in the object occur. Changes to the status can include that the ToBeReplicatedVersionsUpToDatenessStatusCode is set to 'Out-of-Date', Extract To Payroll Process Attachment.

Reconcile reconciles the data in the object with the primary objects. Changes to the object: This action will instigate changes to the object, for example, by triggering the service ModifyNewVersion. Parameters can include that the action elements are defined by the data type: US_EmployeePayrollInputReconcileActionElements. The optional elements are EmployeeUUID, the employee to whom the US_EmployeePayrollInput applies and is of type GDT: UUID, and EmployeeID, the ID of the assigned employee, and is of type GDT: BusinessPartnerID, and the EmployeeID element is stored on the Employee projection of the BusinessPartner business object, in the node Identification, in the element EmployeeID. Use can include that the user may call this action if for any reason the data in the business object is inconsistent. This may occur, for example, when the action CheckToBeReplicatedConsistency has returned errors, or errors have been detected manually by the user. The action triggers the generation of NewVersions so that data in this business object reflects what is stored in the primary objects.

A Version is a version of the US_EmployeePayrollInput business object. Versions are created to make comparisons of data over a period of time. The elements located directly at the node Version are defined by the data type: US_EmployeePayrollInputVersionElements. These elements are: UUID, DeletedIndicator, and LastChangeDateTime. UUID (Alternative Key) is a globally unique identifier of exactly one Version and is of type GDT: UUID. DeletedIndicator is the indicator that the primary node for the Version has been deleted on the primary object, and is of type GDT: Indicator and Qualifier: Deleted. LastChangeDateTime is the date and time stamp of last change and is of type GDT: GLOBAL_DateTime.

A Changed Node Reference is a reference to a changed node. It may be time dependent on Validity Period. The ChangedNodeReference contains information about the changes that have taken place in any node that is versioned. It allows quick access to the changed nodes. The elements located directly at the node Changed Node Reference are defined by the data type: US_EmployeePayrollInputChangedNodeReferenceElements. These elements are: ObjectNodeReference, ValidityPeriod, ToBeReplicatedVersionInformationOutdatedIndicator, ReplicationRequiredIndicator, and DeletionRequiredIndicator. ObjectNodeReference defines the node that has been changed and is of type GDT: ObjectNodeReference. ValidityPeriod defines the validity period of the changed node, and is of type GDT: CLOSED_DatePeriod. ToBeReplicatedVersionInformationOutdated Indicator is an indicator that determines that the ToBeReplicatedVersion is outdated, and is of type GDT: Indicator, with Qualifier: InformationOutdated. ReplicationRequiredIndicator is an indicator that determines replication of data is required at the provider for the changed node and is of type GDT: Indicator, with Qualifier: Required. DeletionRequiredIndicator is an indicator that determines that the replication to provider is a deletion and is of type GDT: Indicator, with Qualifier: Required. This can be for payroll providers who have not adopted the concept of time-dependency in their record keeping. The equivalent record on the AIS side is delimited in time, but not deleted, in some implementations A Payroll Process Assignment is the assignment of the employee to a payroll process. The elements located directly at the node Payroll Process Assignment are defined by the data type: US_EmployeePayrollInputPayrollProcessAssignmentElements. The elements is: PayrollProcessID and is an ID of a PayrollProcess and is of type GDT: BusinessTransactionDocumentID. There may exist Inbound Aggregation Relationships that from the business object Payroll Process/node Payroll Process, PayrollProcess has a cardinality relationship of 1:cn and specifies the assigned Payroll Process.

An Employment Item is the summary of all employee-specific input for US payroll valid for one employment. The elements located directly at the node Employment Item are defined by the data type: US_EmployeePayrollInputEmploymentItemElements. These elements are: EmploymentUUID, EmployeePayrollInputVersionReferences, PrimaryObjectID, ToBeReplicatedVersionDeletedIndicator, ToBeReplicatedVersionValidityPeriod, ToBeReplicatedVersionUUID, NewVersionUUID, and LastSuccessfullyReplicatedVersionUUID. EmploymentUUID is a globally unique identifier of a employment of an employee for which the Item is valid, and is of type GDT: UUID. EmployeePayrollInputVersionReferences is the references to a version of the node, and is of type IDT: EmployeePayrollInputVersionReferences, PrimaryObjectID is optional and is the identifier of the node in the primary object, and is of type GDT: ObjectID, with Qualifier: Primary Object. ToBeReplicatedVersionDeletedIndicator is the indicator that the primary node for the version that is about to be replicated to the provider or has already been replicated to the provider but not yet been confirmed as a successful replication has been deleted on the primary object, and is of type GDT: Indicator, with Qualifier: ToBeReplicated Version. ToBeReplicatedVersionValidityPeriod is optional and is the validity period of the version that is about to be replicated to the provider or has already been replicated to the provider but not yet been confirmed as a successful replication, and is of type GDT: CLOSED_DatePeriod, with Qualifier: ToBeReplicated Version. ToBeReplicatedVersionUUID is optional and is the universally unique identifier for the version that is about to be replicated to the provider or has already been replicated to the provider but not yet been confirmed as a successful replication. The identifier is created or adjusted when the payroll administrator decides to start replication to the provider, and is of type GDT: UUID, with Qualifier: ToBeReplicated Version. NewVersionUUID is the universally unique identifier for the version that reflects the latest changes of the primary object and is of type GDT: UUID, with Qualifier: New Version. LastSuccessfullyReplicatedVersionUUID is optional and is the universally unique identifier for the version last replicated to the provider where the provider has confirmed that the replication was successful. The identifier is created or adjusted when the provider confirms successful replication of the data and is of type GDT: UUID, with Qualifier: LastSuccessfullyReplicated Version. The following composition relationships to subordinate nodes can exist Employment Item Version 306068 has a cardinality relationship of 1:N, DO Employment Item Employment Payroll Input 306070 has a cardinality relationship of 1:c, and Employment Item WorkAgreement Item 306072 has a cardinality relationship of 1:cn. There may exist Inbound Aggregation Relationships that from the business object Employment/node Employment (Cross DU) Employment has a cardinality relationship of 1:c and is the employment to which the US_EmployeePayrollInput relevant data and rules of the Item apply. There may exist (Specialization) Associations for Navigation that to business object US_EmployeePayrollInput/EmploymentItemVersion (refer to root node for definitions of these associations) that LastSuccessfullyReplicatedEmploymentItemVersion has a cardinality relationship of 1:c, NewEmploymentItemVersion has a cardinality relationship of 1:c, and ToBeReplicatedEmploymentItemVersion has a cardinality relationship of 1:c.

A Employment Item Version is defined as the version of the EmploymentItem. The elements located directly at the node Employment Item Version are defined by the data type: US_EmployeePayrollInputEmploymentItemVersionElements. These elements are: UUID, LastChangeDateTime, DeletedIndicator, and EmploymentUUID. UUID (Alternative Key) is a globally unique identifier of exactly one EmploymentItemVersion and is of type GDT: UUID. LastChangeDateTime is Time (date and time stamp) of last change and is of type GDT: GLOBAL_DateTime. DeletedIndicator is the indicator that the primary node for the Version has been deleted on the primary object and is of type GDT: Indicator, with Qualifier: Deleted. EmploymentUUID is a globally unique identifier of an employment for which the Item is valid and is of type GDT: UUID.

An Employment Item Employment Payroll Input (DO Inclusion Node) is a summary of the country-independent payroll guidelines for input for an employment. These payroll guidelines for input include statements about an employee's disability. As payroll guidelines are only meaningful in a country-specific context, in some implementations, an EmploymentPayrollInput can be used as part of a host object, such as US_EmployeePayrollInput, that provides the country-specific context. Country-independent payroll guidelines that refer to a work agreement are recorded in the dependent object WorkAgreementPayrollInput.

An Employment Item WorkAgreement Item is the summary of all employee-specific input for US payroll valid for one work agreement. The elements located directly at the node Employment Item WorkAgreement Item are defined by the data type: US_EmployeePayrollInputEmploymentItemWorkAgreementItemElements. These elements are: WorkAgreementUUID, EmployeePayrollInputVersionReferences, PrimaryObjectID, ToBeReplicatedVersionDeletedIndicator, ToBeReplicatedVersionValidityPeriod, ToBeReplicatedVersionUUID, NewVersionUUID, and LastSuccessfullyReplicatedVersionUUID. WorkAgreementUUID is a globally unique identifier of a work agreement employee for which the Item is valid and is of type GDT: UUID. EmployeePayrollInputVersionReferences is the references to a version of the node and is of type IDT: EmployeePayrollInputVersionReferences. PrimaryObjectID is optional and is the identifier of the node in the primary object and is of type GDT: ObjectID, with Qualifier: Primary Object. ToBeReplicatedVersionDeletedIndicator is the indicator that the primary node for the version that is about to be replicated to the provider or has already been replicated to the provider but not yet been confirmed as a successful replication has been deleted on the primary object and is of type GDT: Indicator, with Qualifier: ToBeReplicated Version. ToBeReplicatedVersionValidityPeriod is optional and is the validity period of the version that is about to be replicated to the provider or has already been replicated to the provider but not yet been confirmed as a successful replication and is of type GDT: CLOSED_D atePeriod, with Qualifier: ToBeReplicated Version. ToBeReplicatedVersionUUID is optional and is the universally unique identifier for the version that is about to be replicated to the provider or has already been replicated to the provider but not yet been confirmed as a successful replication. The identifier is created or adjusted when the payroll administrator decides to start replication to the provider. Furthermore, it is of type GDT: UUID, with Qualifier: ToBeReplicated Version. NewVersionUUID is the universally unique identifier for the version that reflects the latest changes of the primary object and is of type GDT: UUID, with Qualifier: New Version. LastSuccessfullyReplicatedVersionUUID is optional and is the universally unique identifier for the version last replicated to the provider where the provider has confirmed that the replication was successful. The identifier is created or adjusted when the provider confirms successful replication of the data. Furthermore, it is of type GDT: UUID, with Qualifier: LastSuccessfullyReplicated Version. The following composition relationships to subordinate nodes exist: Employment Item WorkAgreement Item Version 306074 has a cardinality relationship of 1:N, DO Employment Item WorkAgreement Item WorkAgreement Payroll Input 306076 has a cardinality relationship of 1:c, and Employment Item WorkAgreement Item Federal Tax Arrangement 306078 has a cardinality relationship of 1:cn. There may exist Inbound Aggregation Relationships that from the business object Work Agreement/node Work Agreement (Cross DU) Work Agreement has a cardinality relationship of 1:c and is the Work Agreement to which the US_EmployeePayrollInput relevant data and rules of the Item apply. There may exist (Specialization) Associations for Navigation to business object US_EmployeePayrollInput/Employment-ItemWorkagreementItemVersion (See root node for definitions of these associations.): LastSuccessfullyReplicatedEmploymentItemWorkAgreementItemVersion has a cardinality relationship of 1:c, NewEmploymentItemWorkAgreementItemVersion has a cardinality relationship of 1:c, and ToBeReplicatedEmploymentItem-WorkAgreementItemVersion has a cardinality relationship of 1:c.

An Employment Item WorkAgreement Item Version is defined as the version of an EmploymentItemWorkAgreementItem. It can be Time dependent on Validity Period. The elements located directly at the node Employment Item WorkAgreement Item Version are defined by the data type: US_EmployeePayrollInputEmploymentItemWorkAgreementItemVersionElements. These elements are: UUID, DeletedIndicator, LastChangeDateTime, ValidityPeriod and WorkAgreementUUID. UUID (Alternative Key) is a globally unique identifier of exactly oneEmploymentItemWorkAgreementItemVersion and is of type GDT: UUID. DeletedIndicator is the indicator that the primary node for the Version has been deleted on the primary object and is of type GDT: Indicator, and Qualifier: Deleted. LastChangeDateTime is the date and time stamp of the last change and is of type GDT: GLOBAL_DateTime. ValidityPeriod is the validity period of the work agreement and is of type GDT: CLOSED_DatePeriod. WorkAgreementUUID is a globally unique identifier of the work agreement employee for which the Item is valid and is of type GDT: UUID.

An Employment Item Work Agreement Item Work Agreement Payroll Input (DO Inclusion Node) is a summary of country-independent payroll guidelines for input for a work agreement. These payroll guidelines for input include compensation information and reported employee working times. As payroll guidelines are only meaningful in a country-specific context in some implementations, a WorkAgreementPayrollInput is used in US_EmployeePayrollInput that defines the context of the country.

An Employment Item WorkAgreement Item Federal Tax Arrangement is the employee-specific information of the tax arrangement (such as Federal Employer Identification Number, TaxArrangementID) made between the IRS and the employee's company. The elements located directly at the node Employment Item WorkAgreement Item Federal Tax Arrangement are defined by the data type: US_EmployeePayrollInputEmploymentItem-WorkAgreementItemFederalTaxArrangementElements. These elements are: EmployeePayrollInputVersionReferences, PrimaryObjectID, ToBeReplicatedVersionDeletedIndicator, ToBeReplicatedVersionValidityPeriod, ToBeReplicatedVersionUUID, NewVersionUUID, and LastSuccessfullyReplicatedVersionUUID. EmployeePayrollInputVersionReferences is the references to a version of the node and is of type IDT: EmployeePayrollInputVersionReferences. PrimaryObjectID is optional, is the identifier of the node in the primary object, and is of type GDT: ObjectID, with Qualifier: Primary Object. ToBeReplicatedVersionDeletedIndicator is the indicator that the primary node for the version that is about to be replicated to the provider or has already been replicated to the provider but not yet been confirmed as a successful replication has been deleted on the primary object and is of type GDT: Indicator, with Qualifier: ToBeReplicated Version. ToBeReplicatedVersionValidityPeriod is optional and is the validity period of the version that is about to be replicated to the provider or has already been replicated to the provider but not yet been confirmed as a successful replication and is of type GDT: CLOSED_DatePeriod, with Qualifier: ToBeReplicated Version. ToBeReplicatedVersionUUID is optional and is the universally unique identifier for the version that is about to be replicated to the provider or has already been replicated to the provider but not yet been confirmed as a successful replication. The identifier is created or adjusted when the payroll administrator decides to start replication to the provider. Furthermore, it is of type GDT: UUID, with Qualifier: ToBeReplicated Version. NewVersionUUID is the universally unique identifier for the version that reflects the latest changes of the primary object, and is of type GDT: UUID, with Qualifier: New Version. LastSuccessfullyReplicatedVersionUUID is optional and is the universally unique identifier for the version last replicated to the provider where the provider has confirmed that the replication was successful. The identifier is created or adjusted when the provider confirms successful replication of the data. Furthermore it is of type GDT: UUID, with Qualifier: LastSuccessfullyReplicated Version. The composition relationships to subordinate nodes exist: Employment Item WorkAgreement Item Federal Tax Arrangement Version 306080 has a cardinality relationship of 0:N. There may exist Inbound Aggregation Relationships that from the business object US_Employee Tax Arrangement/node Federal Tax Arrangement (Cross DU), a Primary US_Employee Tax Arrangement Federal Tax Arrangement has a cardinality relationship of 1:c and is the primary node for this node.

There may exist (Specialization) Associations for Navigation To business object US_EmployeePayrollInput/EmploymentItemWorkAgreementItemFederalTaxArrangementVersion (See root node for definitions of these associations): LastSuccessfullyReplicatedEmploymentItemWorkAgreementItemFederalTaxArrangementVersion has a cardinality relationship of 1:c, NewEmploymentItemWorkAgreementItemFederalTaxArrangementVersion has a cardinality relationship of 1:c, and ToBeReplicatedEmploymentItemWorkAgreementItemFederalTaxArrangementVersion has a cardinality relationship of 1:c.

An Employment Item WorkAgreement Item Federal Tax Arrangement Version is the version of the EmploymentItemWorkAgreementItemFederalTaxArrangement node. The elements located directly at the node Employment Item WorkAgreement Item Federal Tax Arrangement Version are defined by the data type: US_EmployeePayrollInputEmploymentItemWorkAgreementItemFederalTaxArrangementVersionElements. These elements are: UUID, DeletedIndicator, LastChangeDateTime, and TaxIdentificationNumberID. UUID: (Alternative Key) is a globally unique identifier of exactly one EmploymentItemWorkAgreementItemFederaltaxArrangementVersion, and is of type GDT: UUID. DeletedIndicator is an indicator that the primary node for the Version has been deleted on the primary object and is of type GDT: Indicator, with Qualifier: Deleted. LastChangeDateTime is the date and time stamp of last change and is of type GDT: GLOBAL_DateTime. TaxIdentificationNumberID is optional and is the number allocated to a company by the IRS (Federal Tax Authority and is of type GDT: PartyTaxID.

An Employee Tax Arrangement Federal Tax Arrangement is the employee-specific information of the tax arrangement (such as Federal Employer Identification Number, TaxArrangementID) made between the Internal Revenue Service (IRS) and the employee's company. IRS is a Federal government body, responsible for collecting employee taxes. The elements located directly at the node Employee Tax Arrangement Federal Tax Arrangement are defined by the data type: US_EmployeePayrollInputFederalTaxArrangementElements. These elements are: EmployeePayrollInputVersionReferences, PrimaryObjectID, ToBeReplicatedVersionDeletedIndicator, ToBeReplicatedVersionValidityPeriod, ToBeReplicatedVersionUUID, NewVersionUUID, and LastSuccessfullyReplicatedVersionUUID. EmployeePayrollInputVersionReferences is the references to a version of the node and is of type IDT: EmployeePayrollInputVersionReferences. PrimaryObjectID is optional and is the identifier of the node in the primary object and is of type GDT: ObjectID, with Qualifier: Primary Object. ToBeReplicatedVersionDeletedIndicator is the indicator that the primary node for the version that is about to be replicated to the provider or has already been replicated to the provider but not yet been confirmed as a successful replication has been deleted on the primary object, and is of type GDT: Indicator, with Qualifier: ToBeReplicated Version. ToBeReplicatedVersionValidityPeriod is optional and is the validity period of the version that is about to be replicated to the provider or has already been replicated to the provider but not yet been confirmed as a successful replication and is of type GDT: CLOSED_DatePeriod, with Qualifier: ToBeReplicated Version. ToBeReplicatedVersionUUID is optional and is the universally unique identifier for the version that is about to be replicated to the provider or has already been replicated to the provider but not yet been confirmed as a successful replication. The identifier is created or adjusted when the payroll administrator decides to start replication to the provider. Furthermore, it is of type GDT: UUID, with Qualifier: ToBeReplicated Version. NewVersionUUID is the universally unique identifier for the version that reflects the latest changes of the primary object and is of type GDT: UUID, with Qualifier: New Version. LastSuccessfullyReplicatedVersionUUID is optional and is the universally unique identifier for the version last replicated to the provider where the provider has confirmed that the replication was successful. The identifier is created or adjusted when the provider confirms successful replication of the data. Furthermore, it is of type GDT: UUID, with Qualifier: LastSuccessfullyReplicated Version. The following composition relationships to subordinate nodes can exist: Employee Tax Arrangement Federal Tax Arrangement Version 306086 has a cardinality relationship of 1:N, and Employee Tax Arrangement Federal Tax Arrangement Tax Authority Item 306084 has a cardinality relationship of 1:cn. There may exist Inbound Aggregation Relationships that from the business object US_Employee Tax Arrangement/node Federal Tax Arrangement (Cross DU), Primary US_Employee Tax Arrangement Federal Tax Arrangement has a cardinality relationship of 1:c and is the primary US_Employee Tax Arrangement Federal Tax Arrangement Node for the US_Employee Payroll Input Employee Tax Arrangement Federal Tax Arrangement node. There may exist (Specialization) Associations for Navigation To business object US EmployeePayrollInput/EmployeeTaxArrangementFederalTaxArrangementVersion (See root node for definitions of these associations) that LastSuccessfullyReplicatedEmployeeTaxArrangementFederalTaxArrangementVersion has a cardinality relationship of 1:c, NewEmployeeTaxArrangementFederalTaxArrangementVersion has a cardinality relationship of 1:c, and ToBeReplicatedEmployeeTaxArrangementFederalTaxArrangementVersion has a cardinality relationship of 1:c. An Employee Tax Arrangement Federal Tax Arrangement Version is defined as the version of FederalTaxArrangement. The elements located directly at the node Employee Tax Arrangement Federal Tax Arrangement Version are defined by the data type: US_EmployeePayrollInputFederalTaxArrangementVersionElements. These elements are: UUID, DeletedIndicator, LastChangeDateTime, and TaxIdentificationNumberID. UUID (Alternative Key) is a globally unique identifier of exactly one EmployeeTaxArrangementFederalTaxArrangementVersion and is of type GDT: UUID. DeletedIndicator is the indicator that the primary node for the Version has been deleted on the primary object and is of type GDT: Indicator, with Qualifier: Deleted. LastChangeDateTime is the date and time stamp of last change and is of type GDT: GLOBAL_DateTime. TaxIdentificationNumberID is optional and is the number allocated to a company by the IRS (Federal Tax Authority) and is of type GDT: PartyTaxID. An Employee Tax Arrangement Federal Tax Arrangement Tax Authority Item is the set of information required for tax calculation and reporting for one tax authority. The elements located directly at the node Employee Tax Arrangement Federal Tax Arrangement Tax Authority Item are defined by the data type: US EmployeePayrollInputFederalTaxArrangementTaxAuthorityItemElements. These elements are: EmployeePayrollInputVersionReferences, ToBeReplicatedVersionDeletedIndicator, ToBeReplicatedVersionValidityPeriod, ToBeReplicatedVersionUUID, NewVersionUUID, and LastSuccessfullyReplicatedVersionUUID. EmployeePayrollInputVersionReferences is the references to a version of the node and is of type IDT: EmployeePayrollInputVersionReferences. PrimaryObjectID is optional and is the identifier of the node in the primary object and is of type GDT: ObjectID, with Qualifier: Primary Object. ToBeReplicatedVersionDeletedIndicator is the indicator that the primary node for the version that is about to be replicated to the provider or has already been replicated to the provider but not yet been confirmed as a successful replication has been deleted on the primary object, and is of type GDT: Indicator, with Qualifier: ToBeReplicated Version. ToBeReplicatedVersionValidityPeriod is optional and is the validity period of the version that is about to be replicated to the provider or has already been replicated to the provider but not yet been confirmed as a successful replication and is of type GDT: CLOSED_DatePeriod, with Qualifier: ToBeReplicated Version. ToBeReplicatedVersionUUID is optional and is the universally unique identifier for the version that is about to be replicated to the provider or has already been replicated to the provider but not yet been confirmed as a successful replication. The identifier is created or adjusted when the payroll administrator decides to start replication to the provider. Furthermore, it is of type GDT: UUID, with Qualifier: ToBeReplicated Version. NewVersionUUID is the universally unique identifier for the version that reflects the latest changes of the primary object and is of type GDT: UUID, with Qualifier: New Version. LastSuccessfullyReplicatedVersionUUID is optional and is the universally unique identifier for the version last replicated to the provider where the provider has confirmed that the replication was successful. The identifier is created or adjusted when the provider confirms successful replication of the data. Furthermore, it is of type GDT: UUID, with Qualifier: LastSuccessfullyReplicated Version. The following composition relationships to subordinate nodes can exist: Employee Tax Arrangement Federal Tax Arrangement Tax Authority Item Version 306088 has a cardinality relationship of 1:N, Employee Tax Arrangement Federal Tax Arrangement Tax Authority Item Period Terms 306090 has a cardinality relationship of 1:cn, and EE Tax Arrangement Federal Tax Arrangement Tax Authority Item Withholding Form 306106 has a cardinality relationship of 1:cn. There may exist Inbound Aggregation Relationships that from the business object US_Employee Tax Arrangement/node Federal Tax Arrangement Tax Authority Item (Cross DU), Primary US_Employee Tax Arrangement Federal Tax Arrangement Tax Authority Item has a cardinality relationship of 1:c, and is the primary US_Employee Tax Arrangement Federal Tax Arrangement Tax Authority Item node for the US_Employee Payroll Input Employee Tax Arrangement Federal Tax Arrangement Tax Authority Item node. There may exist (Specialization) Associations for Navigation to business object US_EmployeePayrollInput/EmployeeTaxArrangementFederalTaxArrangementTaxAuthorityItemVersion (See root node for definitions of these associations): LastSuccessfullyReplicatedEmployeeTaxArrangementFederalTaxArrangementTaxAuthorityItemVersion has a cardinality relationship of 1:c, NewEmployeeTaxArrangementFederalTaxArrangementTaxAuthorityItemVersion has a cardinality relationship of 1:c, and ToBeReplicatedEmployeeTaxArrangementFederalTaxArrangementTaxAuthorityItemVersion has a cardinality relationship of 1:c.

An Employee Tax Arrangement Federal Tax Arrangement Tax Authority Item Version is a version of the FederaltaxArrangementTaxAuthorityItem node. The elements located directly at the node Employee Tax Arrangement Federal Tax Arrangement Tax Authority Item Version are defined by the data type: US_EmployeePayrollInputFederalTaxArrangementTaxAuthorityItemVersionElements. These elements are: UUID, DeletedIndicator, LastChangeDateTime, and TaxAuthorityID. UUID (Alternative Key) is a globally unique identifier of exactly one EmployeeTaxArrangementFederalTaxArrangementTaxAuthorityItemVersion and is of type GDT: UUID. DeletedIndicator is the indicator that the primary node for the Version has been deleted on the primary object, and is of type GDT: Indicator, with Qualifier: Deleted. LastChangeDateTime is the date and time stamp of last change and is of type GDT: GLOBAL_DateTime. TaxAuthorityID is a Unique identifier of the tax authority, to which the employee is liable to pay taxes and is of type GDT: BusinessPartnerID.

An Employee Tax Arrangement Federal Tax Arrangement Tax Authority Item Period Terms is the set of additional information required for tax calculation and reporting for a tax authority, describing the employee's residence status and tax calculation status for a particular validity period. The elements located directly at the node Employee Tax Arrangement Federal Tax Arrangement Tax Authority Item Period Terms are defined by the data type: US_EmployeePayrollInputFederalTaxArrangementTaxAuthorityItemPeriodtermsElements. These elements are: EmployeePayrollInputVersionReferences, ToBeReplicatedVersionDeletedIndicator, ToBeReplicatedVersionValidityPeriod, ToBeReplicatedVersionUUID, NewVersionUUID, and LastSuccessfullyReplicatedVersionUUID. EmployeePayrollInputVersionReferences is the references to a version of the node and is of type IDT: EmployeePayrollInputVersionReferences. PrimaryObjectID is optional and is the identifier of the node in the primary object, and is of type GDT: ObjectID, with Qualifier: Primary Object. ToBeReplicatedVersionDeletedIndicator is the indicator that the primary node for the version that is about to be replicated to the provider or has already been replicated to the provider but not yet been confirmed as a successful replication has been deleted on the primary object, and is of type GDT: Indicator, with Qualifier: ToBeReplicated Version. ToBeReplicatedVersionValidityPeriod is optional and is the validity period of the version that is about to be replicated to the provider or has already been replicated to the provider but not yet been confirmed as a successful replication and is of type GDT: CLOSED_DatePeriod, with Qualifier: ToBeReplicated Version. ToBeReplicatedVersionUUID is optional and is the universally unique identifier for the version that is about to be replicated to the provider or has already been replicated to the provider but not yet been confirmed as a successful replication. The identifier is created or adjusted when the payroll administrator decides to start replication to the provider. Furthermore, it is of type GDT: UUID, with Qualifier: ToBeReplicated Version. NewVersionUUID is the universally unique identifier for the version that reflects the latest changes of the primary object and is of type GDT: UUID, with Qualifier: New Version. LastSuccessfullyReplicatedVersionUUID is optional and is the universally unique identifier for the version last replicated to the provider where the provider has confirmed that the replication was successful. The identifier is created or adjusted when the provider confirms successful replication of the data. Furthermore, it is of type GDT: UUID, with Qualifier: LastSuccessfullyReplicated Version. The composition relationships to subordinate nodes can exist: ETA Federal Tax Arrangement Tax Authority Item Period Terms Version 306092 has a cardinality relationship of 1:N. There may exist Inbound Aggregation Relationships that from the business object US_Employee Tax Arrangement/node Federal Tax Arrangement Tax Authority Item Period Terms (Cross DU), a Primary US_Employee Tax Arrangement Federal Tax Arrangement Tax Authority Item Period Terms has a cardinality relationship of 1:c, and is the primary US_Employee Tax Arrangement Federal Tax Arrangement Tax Authority Item Period Terms 1 node for the US_Employee Payroll Input Employee Tax Arrangement Federal Tax Arrangement Tax Authority Item Period Terms. There may exist (Specialization) Associations for Navigation to business object US_EmployeePayrollInput/FederalTaxArrangementTaxAuthorityItemPeriodTermsVersion LastSuccessfullyReplicatedEmployeeTaxArrangementFederalTaxArrangementTaxAuthority ItemPeriodTermsVersion has a cardinality relationship of 1:c, NewEmployeeTaxArrangementFederalTaxArrangementTaxAuthorityItemPeriodTermsVersion has a cardinality relationship of 1:c, and ToBeReplicatedEmployee TaxArrangementFederalTaxArrangementTaxAuthority ItemPeriodTermsVersion has a cardinality relationship of 1:c.

An Employee Tax Arrangement Federal Tax Arrangement Tax Authority Item Period Terms Version is the version of FederaltaxArrangementTaxAuthorityItemPeriodTerms node and can beTime dependent on Validity Period. The elements located directly at the node Employee Tax Arrangement Federal Tax Arrangement Tax Authority Item Period Terms Version are defined by the data type: US_EmployeePayrollInputFederalTaxArrangementTaxAuthorityItemPeriodTerms VersionElements. These elements are: UUID, DeletedIndicator, LastChangeDateTime, and ValidityPeriod. UUID (Alternative Key) is a globally unique identifier of exactly one EmployeeTaxArrangementFederalTaxArrangementtaxAuthorityItemPeriodTermsVersion and is of type GDT: UUID. DeletedIndicator is the indicator that the primary node for the Version has been deleted on the primary object, and is of type GDT: Indicator, with Qualifier: Deleted. LastChangeDateTime is the date and time stamp of last change and is of type GDT: GLOBAL_DateTime. ValidityPeriod is the validity period of the TaxAuthorityItemPeriodTerms and is of type GDT: CLOSED_DatePeriod. The following composition relationships to subordinate nodes can exist: ETA Federal Tax Arrangement Tax Authority Item Period Terms Version Federal 306094 has a cardinality relationship of 1:c, ETA Federal Tax Arrangement Tax Authority Item Period Terms Version State 306096 has a cardinality relationship of 1:c, ETA Federal Tax Arrangement Tax Authority Item Period Terms Version Locality 306098 has a cardinality relationship of 1:c. There may exist Integrity Conditions that Exactly one of the three subnodes: FederalTaxArrangementTaxAuthorityItemPeriodTermsVersionFederal, FederalTaxArrangementTaxAuthorityItemPeriodTermsVersionState, FederalTaxArrangementTaxAuthorityItemPeriodTermsVersionLocality can exist.

An Employee Tax Arrangement Federal Tax Arrangement Tax Authority Item Period Terms Version Federal is the set of federal information required by the IRS for taxation. The IRS requires certain information, for example, that the employee is subject to pay FUTA (Federal Unemployment Tax Act) and so on. The elements located directly at the node Employee Tax Arrangement Federal Tax Arrangement Tax Authority Item Period Terms Version Federal are defined by the data type: US_EmployeePayrollInputFederalTaxArrangementTaxAuthorityItemPeriodTermsVersionFederalElements. These elements are: FederalEmployeeTaxationMethod, FederalIncomeEmployeeTaxationExemptionMethodCode, FederalIncomeModifiedTaxAmount, FederalIncomeModifiedTaxPercent, FederalSocialSecurityEmployeeTaxationExemptionMethodCode, FederalMedicareEmployeeTaxationExemptionMethodCode, FederalUnemploymentTaxActEmployeeTaxationExemptionMethodCode, FederalMaximumIncomeWithholdingTaxExemptionNumberValue, PensionPlanCoverageIncludedIndicator, and FederalMaximumIncomeWithholdingTaxExemptionNumberValue.

FederalEmployeeTaxationMethod defines the taxation method for an employee, to calculate the taxes to be paid to IRS and is of type IDT: FederalEmployeeTaxationMethod. FederalIncomeEmployeeTaxationExemptionMethodCode is optional and defines the Method used for calculating an employee's income tax amount and is of type GDT: EmployeeTaxationExemptionMethodCode. FederalIncomeModifiedTaxAmount is optional and defines the modified amount an employee is liable to pay as an income tax, and is of type GDT: CURRENCYUSD_MEDIUM_Amount. FederalIncomeModifiedTaxPercent is optional and defines the modified percentage in the Income Taxation for an employee and is of type GDT: SMALLNONNEGATIVE_Percent.

FederalSocialSecurityEmployeeTaxationExemptionMethodCode is optional and defines the calculation Method to be applied for getting the Social Security Contributions amount an employee is liable to pay and is of type GDT: EmployeeTaxationExemptionMethodCode. FederalMedicareEmployeeTaxationExemptionMethodCode is optional and defines the calculation Method to be applied for deriving the Medicare Tax amount an employee is liable to pay and is of type GDT: EmployeeTaxationExemptionMethodCode. FederalUnemploymentTaxActEmployeeTaxationExemptionMethodCode is optional and defines the calculation Method to be applied for deriving the Federal Unemployment Tax amount an employee is liable to pay, and is of type GDT: EmployeeTaxationExemptionMethodCode. FederalMaximumIncomeWithholdingTaxExemptionNumberValue is optional and defines the maximum number of allowances for Federal Income Tax withholding for an employee and is of type GDT: SMALL_NumberValue. PensionPlanCoverageIncludedIndicator is optional and defines that an employee is included in a pension plan, and is of type GDT: Indicator, with Qualifier: Included. FederalMaximumIncomeWithholdingTaxExemptionNumberValue is optional and defines the maximum number of allowances for Federal Income Tax withholding for an employee, and is of type GDT: SMALL_NumberValue, with Qualifier: TaxExemption. There may exist Inbound Aggregation Relationships that from the business object US_Employee Tax Arrangement/node Federal Tax Arrangement Tax Authority Item Period Terms Federal (Cross DU), Primary US_Employee Tax Arrangement Federal Tax Arrangement Tax Authority Item Period Terms Federal has a cardinality relationship of 1:c and is the primary US_Employee Tax Arrangement Federal Tax Arrangement Tax Authority Item Period Terms Federal node for the US_Employee Payroll Input Employee Tax Arrangement Federal Tax Arrangement Tax Authority Item Period Terms Version Federal node.

An Employee Tax Arrangement Federal Tax Arrangement Tax Authority Item Period Terms Version State is the set of state-specific information for calculation of state withholding taxes for the employee. In certain circumstances this can also include information for state unemployment insurance. The elements located directly at the node Employee Tax Arrangement Federal Tax Arrangement Tax Authority Item Period Terms Version State are defined by the data type: US_EmployeePayrollInputFederalTaxArrangementTaxAuthorityItemPeriodTermsVersionStateElements. These elements are: EmployeeWorkStateTaxAuthorityRoleIndicator, StateWorkTaxAuthorityTimePercent, EmployeeResidentStateTaxAuthorityRoleIndicator, EmployeeStateUnemploymentInsuranceTaxAuthorityRoleIndicator, StateUnemploymentInsuranceWorksiteCode, EmployeePrimaryWorkStateTaxAuthorityRoleIndicator, StateEmployeeTaxationMethod, StateIncomeEmployeeTaxationExemptionMethodCode, StateIncomeModifiedTaxAmount, StateIncomeModifiedTaxPercent, StateUnemploymentTaxActEmployeeTaxationExemptionMethodCode, StateDisabilityInsuranceEmployeeTaxationExemptionMethodCode, WorkersCompensationEmployeeTaxationExemptionMethodCode, and StateMaximumIncomeWithholdingTaxExemptionNumberValue.

EmployeeWorkStateTaxAuthorityRoleIndicator Indicates whether a tax authority has an employee's work tax authority role and is of type GDT: Indicator, with Qualifier: Role. StateWorkTaxAuthorityTimePercent is optional, defines the percentage of employee's time in his state of work, and is of type GDT: SMALLNONNEGATIVEINTEGER_Percent, with Qualifier: Time. EmployeeResidentStateTaxAuthorityRoleIndicator indicates whether a tax authority has an employee's residence tax authority role and is of type GDT: Indicator, with Qualifier: Role. EmployeeStateUnemploymentInsuranceTaxAuthorityRoleIndicator indicates whether a tax authority has an employee's unemployment insurance tax authority role and may have integrity conditions: If the EmployeeStateUnemploymentInsuranceTaxAuthorityRoleIndicator is set to true, only then is an entry is allowed in StateUnemploymentInsuranceWorksiteCode, in some implementations, and furthermore, is of type GDT: Indicator, with Qualifier: Role. StateUnemploymentInsuranceWorksiteCode is optional, defines the work site of an employee in his state of unemployment and is of type GDT: UnemploymentInsuranceWorksiteCode. EmployeePrimaryWorkStateTaxAuthorityRoleIndicator indicates whether a tax authority has an employee's primary work tax authority role and is of type GDT: Indicator with Qualifier: Role. StateEmployeeTaxationMethod defines the taxation method for an employee, to calculate the taxes to be paid to the state tax authority, and is of type IDT: StateEmployeeTaxationMethod. StateIncomeEmployeeTaxationExemptionMethodCode is optional, defines the method is used to calculate state Income tax for an employee and is of type GDT: EmployeeTaxationExemptionMethodCode. StateIncomeModifiedTaxAmount is optional and defines the Amount calculated for IncomeTax withholding for an employee, to be paid to state tax authority, and is of type GDT: Amount. StateIncomeModifiedTaxPercent is optional, defines the Percentage modification in the Income Tax withholding amount for an employee, to be paid to state tax authority and is of type GDT: Percent. StateUnemploymentTaxActEmployeeTaxationExemptionMethodCode is optional, defines the method that is used to calculate employee's state unemployment tax and is of type GDT: EmployeeTaxationExemptionMethodCode.

StateDisabilityInsuranceEmployeeTaxationExemptionMethodCode is optional, defines the method that calculates an employee's state disability insurance contributions and is of type GDT: EmployeeTaxationExemptionMethodCode.

WorkersCompensationEmployeeTaxationExemptionMethodCode is optional, defines the method that calculates an amount to be paid as workers compensation, and is of type GDT: EmployeeTaxationExemptionMethodCode.

StateMaximumIncomeWithholdingTaxExemptionNumberValue is optional, defines the maximum number of allowances for State IncomeTax withholding and is of type GDT: SMALL_NumberValue, with Qualifier: TaxExemption. There may exist inbound Aggregation Relationships from the business object US_Employee Tax Arrangement/node Federal Tax Arrangement Tax Authority Item Period Terms State (Cross DU), Primary US_Employee Tax Arrangement Federal Tax Arrangement Tax Authority Item Period Terms State has a cardinality relationship 1:c and is the primary US_Employee Tax Arrangement Federal Tax Arrangement Tax Authority Item Period Terms State node for the US_Employee Payroll Input Employee Tax Arrangement Federal Tax Arrangement Tax Authority Item Period Terms Version State node.

An Employee Tax Arrangement Federal Tax Arrangement Tax Authority Item Period Terms Version Locality is the set of locality-specific information for calculation of local withholding taxes for the employee. The elements located directly at the node Employee Tax Arrangement Federal Tax Arrangement Tax Authority Item Period Terms Version Locality are defined by the data type: US_EmployeePayrollInputFederalTaxArrangementTaxAuthorityItemPeriodTermsVersionLocalityElements. These elements are: EmployeeWorkLocalTaxAuthorityRoleIndicator, LocalWorkTaxAuthorityTimePercent, EmployeeResidenceLocalTaxAuthorityRoleIndicator, LocalEmployeeTaxationMethod, LocalIncomeEmployeeTaxationMethodCode, and LocalSchoolDistrictIncomeEmployeeTaxationMethodCode.

EmployeeWorkLocalTaxAuthorityRoleIndicator defines whether the tax authority has an employee's work tax authority role and is of type GDT: Indicator, with Qualifier: Role. LocalWorkTaxAuthorityTimePercent is optional, defines the percentage an employee works in the locality and is of type GDT: SMALLNONNEGATIVEINTEGER_Percent, with Qualifier: Time. EmployeeResidenceLocalTaxAuthorityRoleIndicator defines whether the tax authority has an employee's residence tax authority role, and is of type GDT: Indicator, with Qualifier: Role. LocalEmployeeTaxationMethod is optional, defines the taxation method for local taxes that an employee must pay, and is of type IDT: US_EmployeeTaxArrangementFederalTaxArrangementTaxAuthorityItemPeriodTermsLocalityLocalEmployeeTaxationMethod. LocalIncomeEmployeeTaxationMethodCode is optional, is the method for calculating the employee's local income tax, and is of type GDT: EmployeeTaxationMethodCode. LocalSchoolDistrictIncomeEmployeeTaxationMethodCode is optional, is the method for calculating the employee's local income tax for the school district and is of type GDT: EmployeeTaxationMethodCode. There may exist Inbound Aggregation Relationships From the business object US_Employee Tax Arrangement/node Federal Tax Arrangement Tax Authority Item Period Terms Locality (Cross DU) that Primary US_Employee Tax Arrangement Federal Tax Arrangement Tax Authority Item Period Terms Locality has a cardinality relationship of 1:c and is the primary US_Employee Tax Arrangement Federal Tax Arrangement Tax Authority Item Period Terms Locality node for the US_Employee Payroll Input Employee Tax Arrangement Federal Tax Arrangement Tax Authority Item Period Terms Version Locality node.

An Employee Tax Arrangement Federal Tax Arrangement Tax Authority Item Withholding Form is the set of information from the employee's withholding certificate provided by the tax authority imposing income tax withholding for a particular validity period. The elements located directly at the node Employee Tax Arrangement Federal Tax Arrangement Tax Authority Item Withholding Form are defined by the data type: US_EmployeePayrollInputFederalTaxArrangementTaxAuthorityItemWithholdingFormsElements. These elements are: EmployeePayrollInputVersionReferences, PrimaryObjectID, ToBeReplicatedVersionDeletedIndicator, ToBeReplicatedVersionValidityPeriod, ToBeReplicatedVersionUUID, NewVersionUUID, and LastSuccessfullyReplicatedVersionUUID. EmployeePayrollInputVersionReferences is the references to a version of the node and is of type IDT: EmployeePayrollInputVersionReferences. PrimaryObjectID is optional and is the identifier of the node in the primary object, and is of type GDT: ObjectID, with Qualifier: Primary Object. ToBeReplicatedVersionDeletedIndicator is the indicator that the primary node for the version that is about to be replicated to the provider or has already been replicated to the provider but not yet been confirmed as a successful replication has been deleted on the primary object. and is of type GDT: Indicator, with Qualifier: ToBeReplicated Version. ToBeReplicatedVersionValidityPeriod is optional, is the validity period of the version that is about to be replicated to the provider or has already been replicated to the provider but not yet been confirmed as a successful replication and is of type GDT: CLOSED_DatePeriod, with Qualifier: ToBeReplicated Version. ToBeReplicatedVersionUUID is optional, and is the universally unique identifier for the version that is about to be replicated to the provider or has already been replicated to the provider but not yet been confirmed as a successful replication. The identifier is created or adjusted when the payroll administrator decides to start replication to the provider. Furthermore, it is of type GDT: UUID, with Qualifier: ToBeReplicated Version. NewVersionUUID is the universally unique identifier for the version that reflects the latest changes of the primary object and is of type GDT: UUID, with Qualifier: New Version. LastSuccessfullyReplicatedVersionUUID is optional, and is the universally unique identifier for the version last replicated to the provider where the provider has confirmed that the replication was successful. The identifier is created or adjusted when the provider confirms successful replication of the data. Furthermore, it is of type GDT: UUID, with Qualifier: LastSuccessfullyReplicated Version. The composition relationships to subordinate nodes can exist: ETA Federal Tax Arrangement Tax Authority Item Withholding Form Version 306108 has a cardinality relationship of 1:N. There may exist Inbound Aggregation Relationships From the business object US_Employee Tax Arrangement/node Federal Tax Arrangement Tax Authority Item Withholding Form (Cross DU), a Primary US_Employee Tax Arrangement Federal Tax Arrangement Tax Authority Item Withholding Form has a cardinality relationship of 1:c, and is the primary US_Employee Tax Arrangement Federal Tax Arrangement Tax Authority Item Withholding Form node for the US_Employee Payroll Input Employee Tax Arrangement Federal Tax Arrangement Tax Authority Item Withholding Form node. There may exist (Specialization) Associations for Navigation to business object US_EmployeePayrollInput/EmployeeTaxArrangementFederalTaxArrangementTaxAuthorityItemWithholdingFormVersion (See root node for definitions of these associations): LastSuccessfullyReplicatedEmployeeTaxArrangementFederalTaxArrangementTaxAuthorityItemWithholdingFormVersion has a cardinality relationship of 1:c, NewEmployeeTaxArrangementFederalTaxArrangementTaxAuthorityItemWithholdingFormVersion has a cardinality relationship of 1:c, and ToBeReplicatedEmployeeTaxArrangementFederalTaxArrangementTaxAuthorityItemWithholdingFormVersion has a cardinality relationship of 1:c.

An Employee Tax Arrangement Federal Tax Arrangement Tax Authority Item Withholding Form Version is the version of FederaltaxArrangementTaxAuthorityItemWithholdingForm node and may be time dependent on Validity Period. The elements located directly at the node Employee Tax Arrangement Federal Tax Arrangement Tax Authority Item Withholding Form Version are defined by the data type: US_EmployeePayrollInputFederalTaxArrangementTaxAuthorityItemWithholdingFormVersionElements. These elements are: UUID, DeletedIndicator, LastChangeDateTime, ValidityPeriod, and EmployeeTaxWithholdingExemptionCertificateTypeCode. UUID (Alternative Key) is a globally unique identifier of exactly one EmployeeTaxArrangementFederalTaxArrangementTaxAuthorityItemWithholdingFormVersion, and is of type GDT: UUID. DeletedIndicator is the indicator that the primary node for the Version has been deleted on the primary object, is of type GDT: Indicator and has a Qualifier: Deleted. LastChangeDateTime is the date and time stamp of last change and is of type GDT: GLOBAL_DateTime. ValidityPeriod is the validity period of the withholding certificate of an employee and is of type GDT: CLOSED_DatePeriod. EmployeeTaxWithholdingExemptionCertificateTypeCode is optional, defines the withholding certificate an employee submits to his company, and is of type GDT: EmployeeTaxWithholdingExemptionCertificateTypeCode. The following composition relationships to subordinate nodes exist that ETA Federal Tax Arrangement Tax Authority Item Withholding Form Version Federal 306100 has a cardinality relationship of 1:c, ETA Federal Tax Arrangement Tax Authority Item Withholding Form Version State 306102 has a cardinality relationship of 1:c, and ETA Federal Tax Arrangement Tax Authority Item Withholding Form Version Locality 306104 has a cardinality relationship of 1:c. There may exist Integrity Conditions that exactly one of the three subnodes FederalTaxArrangementTaxAuthorityItemWithholdingFormVersionFederal, FederalTaxArrangementTaxAuthorityItemWithholdingFormVersionState, FederalTaxArrangementTaxAuthorityItemWithholdingFormVersionLocality can exist.

An Employee Tax Arrangement Federal Tax Arrangement Tax Authority Item Withholding Form Version Federal is the set of information taken from an employee's withholding certificate provided by Federal Government. Employees are required to fill out Form W-4 for federal income tax in some implementations. The elements located directly at the node Employee Tax Arrangement Federal Tax Arrangement Tax Authority Item Withholding Form Version Federal are defined by the data type: US_EmployeePayrollInputFederalTaxArrangementTaxAuthorityItemWithholdingFormVersionFederalElements. These elements are: FederalEmployeeTaxationMaritalStatusCode, FederalIncomeAdditionalWithholdingTaxAmount, FederalIncomeWithholdingTaxExemptionNumberValue, FederalIncomeTaxExemptedIndicator, and FederalEarnedIncomeCreditAdvancePaymentEmployeeTaxationMaritalStatusCode. The FederalEmployeeTaxationMaritalStatusCode is optional, defines the marital status of employee for federal tax calculation, and is of type GDT: EmployeeTaxationMaritalStatusCode. FederalIncomeWithholdingTaxExemptionNumberValue is optional, defines the number of exemptions for Federal Income Tax withholding, is of type GDT: SMALL_NumberValue, and has a Qualifier: taxExemption. FederalIncomeAdditionalWithholdingTaxAmount is optional, is the additional amount to be withheld from income tax as elected by the employee, and is of type GDT: CURRENCYUSD_MEDIUM_Amount. FederalIncomeTaxExemptedIndicator defines the exemption status of an employee from federal income tax, is of type GDT: Indicator and has a Qualifier: Exempted. FederalEarnedIncomeCreditAdvancePaymentEmployeeTaxationMaritalStatusCode is optional, defines the marital status of an employee eligible to receive Employee Income Credit (EIC), and is of type GDT: EmployeeTaxationMaritalStatusCode. There may exist Inbound Aggregation Relationships that from the business object US_Employee Tax Arrangement/node Federal Tax Arrangement Tax Authority Item Withholding Form Federal (Cross DU), a Primary US_Employee Tax Arrangement Federal Tax Arrangement Tax Authority Item Withholding Form Federal has a cardinality relationship of 1:c and is the primary US_Employee Tax Arrangement Federal Tax Arrangement Tax Authority Item Withholding Form Federal node for the US_Employee Payroll Input Employee Tax Arrangement Federal Tax Arrangement Tax Authority Item Withholding Form Version Federal node.

An Employee Tax Arrangement Federal Tax Arrangement Tax Authority Item Withholding Form Version State is the set of information taken from an employee's withholding certificate provided by state authorities. Employees are required to fill out Form A-4 for the state of Arizona in some implementations. The elements located directly at the node Employee Tax Arrangement Federal Tax Arrangement Tax Authority Item Withholding Form Version State are defined by the data type: US_EmployeePayrollInputFederalTaxArrangementTaxAuthorityItemWithholdingFromVersionState Elements. These elements are: StateEmployeeTaxationMaritalStatusCode, StateIncomeWithholdingTaxExemptionNumberValue, StateIncomeWithholdingTaxExemptAmount, StateIncomeAdditionalWithholdingTaxAmount, StateIncomeReducedWithholdingTaxAmount, StateIncomeTaxExemptedIndicator, StateIncomeWithholdingPersonalTaxExemptionNumberValue, StateIncomeWithholdingDependentTaxExemptionNumberValue, ArizonaIncomeTaxWithholdingPercentCode, StateNonResidentWorkTimePercent, NewYorkCityResidentIndicator, NewYorkCityIncomeWithholdingTaxExemptionNumberValue, PuertoRicoIncomeWithholdingDeductionTaxExemptionNumberValue, YonkersCityResidentIndicator, YonkersCityIncomeWithholdingTaxExemptionNumberValue, and YonkersNonResidentWorkTimePercent. StateEmployeeTaxationMaritalStatusCode is optional, defines the marital status for determining how the employee's state income tax is calculated, and is of type GDT: EmployeeTaxationMaritalStatusCode. StateIncomeWithholdingTaxExemptionNumberValue is optional, defines the number of exemptions for state income tax withholding, is of type GDT: SMALL_NumberValue and Qualifier: TaxExemption. StateIncomeWithholdingTaxExemptAmount is optional and is the amount exempt from state withholding tax. The employee's taxable earnings are reduced by this amount. StateIncomeWithholdingTaxExemptAmount is of type GDT: CURRENCYUSD_MEDIUM_Amount. StateIncomeAdditionalWithholdingTaxAmount is optional, is the additional amount withheld from income tax as chosen by the employee, and is of type GDT: CURRENCYUSD_MEDIUM_Amount. StateIncomeReducedWithholdingTaxAmount is optional and is the reduced amount withheld from income tax as chosen by the employee and is of type GDT: CURRENCYUSD_MEDIUM_Amount. StateIncomeTaxExemptedIndicator defines the exemption status of an employee from state income tax and is of type GDT: Indicator and has a Qualifier: Exempted. StateIncomeWithholdingPersonalTaxExemptionNumberValue is optional, defines the number of personal exemptions for state income tax withholding, is of type GDT: SMALL_NumberValue and has a Qualifier: TaxExemption. StateIncomeWithholdingDependentTaxExemptionNumberValue is optional, defines the number of dependent exemptions from state income tax withholding, is of type GDT: SMALL_NumberValue, and has a Qualifier: TaxExemption. ArizonaIncomeTaxWithholdingPercentCode is optional, defines the Arizona Income Tax Withholding as a percentage of the federal tax withheld, and is of type GDT: IncomeTaxWithholdingPercentCode. StateNonResidentWorkTimePercent is optional, defines how long an employee works in the state as a non-resident, is of type GDT: SMALLNONNEGATIVEINTEGER_Percent and has a Qualifier: Time. NewYorkCityResidentIndicator defines if the employee is a resident of New York City or not, is of type GDT: Indicator and has a Qualifier: Resident. NewYorkCityIncomeWithholdingTaxExemptionNumberValue is optional, defines the number of exemptions for New York state income tax withholding, is of type GDT: SMALL_NumberValue, with Qualifier: TaxExemption. PuertoRicoIncomeWithholdingDeductionTaxExemptionNumberValue is optional, defines the number of exemptions for Puerto Rico income tax withholding, is of type GDT: SMALL_NumberValue and has a Qualifier: TaxExemption. YonkersCityResidentIndicator defines the residence status of an employee as the city of Yonkers, is of type GDT: Indicator, and has a Qualifier: Resident. YonkersCityIncomeWithholdingTaxExemptionNumberValue is optional, defines the number of exemptions for Yonkers City income tax withholding, is of type GDT: SMALL_NumberValue, and has a Qualifier: TaxExemption. YonkersNonResidentWorkTimePercent is optional, defines the percentage of work of the employee working in Yonkers who is not a resident of Yonkers and is of type GDT: SMALLNONNEGATIVEINTEGER_Percent and has a Qualifier: Time. There may exist Inbound Aggregation Relationships that from the business object US_Employee Tax Arrangement/node Federal Tax Arrangement Tax Authority Item Withholding Form State (Cross DU), a Primary US_Employee Tax Arrangement Federal Tax Arrangement Tax Authority Item Withholding Form State has a cardinality relationship of 1:c and is the primary US_Employee Tax Arrangement Federal Tax Arrangement Tax Authority Item Withholding Form State node for the US_Employee Payroll Input Employee Tax Arrangement Federal Tax Arrangement Tax Authority Item Withholding Form Version State node.

An Employee Tax Arrangement Federal Tax Arrangement Tax Authority Item Withholding Form Version Locality is the set of information taken from an employee's withholding certificate provided by local jurisdiction. The elements located directly at the node Employee Tax Arrangement Federal Tax Arrangement Tax Authority Item Withholding Form Version Locality are defined by the data type: US_EmployeePayrollInputFederalTaxArrangementTaxAuthorityItemWithholdingFormVersionLocalityElements. These elements are: LocalResidentIndicator, LocalIncomeTaxWorkTimePercent, LocalIncomeWithholdingTaxExemptionNumberValue, LocalIncomeWithholdingPersonalTaxExemptionNumberValue, LocalIncomeAdditionalWithholdingTaxAmount, LocalIncomeWithholdingSpouseTaxExemptionNumberValue, and LocalIncomeWithholdingDependantTaxExemptionNumberValue. LocalResidentIndicator is the residence status of the employee. and is of type GDT: Indicator and has a Qualifier: Resident. LocalIncomeTaxWorkTimePercent is optional, defines how long an employee works in the locality, is of type GDT: SMALLNONNEGATIVEINTEGER_Percent and has a Qualifier: Time. LocalIncomeWithholdingTaxExemptionNumberValue is optional, defines the number of exemptions for local income tax withholding, is of type GDT: SMALL_NumberValue and has a Qualifier: TaxExemption. LocalIncomeWithholdingPersonalTaxExemptionNumberValue is optional, is the number of personal exemptions the employee has for withholding tax, is of type GDT: SMALL_NumberValue and has a Qualifier: TaxExemption. Exemptions reduce an employee's taxable income. LocalIncomeAdditionalWithholdingTaxAmount is optional, is the additional amount withheld from income tax as chosen by the employee and is of type GDT: CURRENCYUSD_MEDIUM_Amount.

LocalIncomeWithholdingSpouseTaxExemptionNumberValue is optional, is the number of spouse exemptions the employee has for withholding tax, is of type GDT: SMALL_NumberValue and has a Qualifier: TaxExemption. Exemptions reduce an employee's taxable income. LocalIncomeWithholdingDependantTaxExemptionNumberValue is optional, is the number of dependant exemptions the employee has for withholding tax, is of type GDT: SMALL_NumberValue and has a Qualifier: TaxExemption. Exemptions reduce an employee's taxable income.

There may exist Inbound Aggregation Relationships that from the business object US_Employee Tax Arrangement/node Federal Tax Arrangement Tax Authority Item Withholding Form Locality (Cross DU) is the Primary US_Employee Tax Arrangement Federal Tax Arrangement Tax Authority Item Withholding Form Locality has a cardinality relationship of 1:c and is the primary US_Employee Tax Arrangement Federal Tax Arrangement Tax Authority Item Withholding Form locality node for the US_Employee Payroll Input Employee Tax Arrangement Federal Tax Arrangement Tax Authority Item Withholding Form Version Locality node.

A Employee Payroll Input (DO Inclusion Node) is a summary of country-independent payroll guidelines for input for an employee. These payroll guidelines for input include the employee's name or bank details. As payroll guidelines are meaningful in a country-specific context, an EmployeePayrollInput can be used as part of a host object that provides the country-specific context.

As described in more detail above, variations of the subject matter described herein and all of the functional operations described in this specification can be implemented in digital electronic circuitry, or in computer software, including the structures disclosed in this specification and their structural equivalents, or in combinations of one or more of them. Variations of the subject matter described herein can be implemented as one or more computer program products, i.e., one or more modules of computer program instructions encoded on a computer-readable medium for execution by, or to control the operation of, data processing apparatus. Such computer-readable medium can be a machine-readable storage device, a machine-readable storage substrate, a memory device, a composition of matter effecting a machine-readable propagated signal, or a combination of one or more them. A propagated signal is an artificially generated signal, e.g., a machine-generated electrical, optical, or electromagnetic signal, that is generated to encode information for transmission to suitable receiver apparatus. In short, although a few variations have been described in detail above, other modifications are possible. For example, the logic flow depicted in the accompanying figures and described herein do not require the particular order shown, or sequential order, to achieve desirable results. Other embodiments may be within the scope of the following claims. In short, although this disclosure has been described in terms of certain embodiments and generally associated methods, alterations and permutations of these embodiments and methods will be apparent to those skilled in the art. Accordingly, the above description of example embodiments does not define or constrain the disclosure. Other changes, substitutions, and alterations are also possible without departing from the spirit and scope of this disclosure, and such changes, substitutions, and alterations may be included within the scope of the claims included herewith.

The invention claimed is:

1. A tangible, non-transitory computer readable medium including program code for providing a message-based interface for exchanging information regarding customer invoices, the program code operable when executed by a processor to perform one or more operations, the operations comprising:

receiving via a message-based interface derived from a common business object model, where the common business object model includes business objects having relationships that enable derivation of message-based interfaces and message packages, the message-based interface exposing at least one service as defined in a service registry and from a heterogeneous application executing in an environment of computer systems providing message-based services, a first message for requesting settlement of business transactions related to goods and services associated with a customer invoice that includes first message package derived from the common business object model and hierarchically organized in memory as:

a customer invoice request message entity; and a customer invoice request package comprising a customer invoice request entity, a business process variant package, an item package, where the customer invoice request entity includes a base business transaction document ID and a base business document type code, where the business process variant package includes at least one business process variant type entity, each business process variant type entity including a business process variant type code and a main indicator, and where the item package includes at least one item entity, each item entity including a base business transaction document item ID, a base business transaction document item type code, and a receivables property movement direction code; and processing the first message according to the hierarchical organization of the first message package, where processing the first message includes unpacking the first message package based on the common business object model; and sending a second message to the heterogeneous application responsive to the first message, where the second message includes a second message package derived from the common business object model to provide consistent semantics with the first message package.

2. The tangible, non-transitory computer readable medium of claim 1, wherein the customer invoice request package further comprises at least one of the following: a party package, a location package, a sales and service business area package, a delivery information package, a payment information package, a price information package, an attachment folder package, and a text collection package.

3. A distributed system operating in a landscape of computer systems providing message-based services defined in a service registry, the system comprising:

at least one processor operable to execute computer readable instructions embodied on non-transitory media;

a graphical user interface executable by the at least one processor and comprising computer readable instructions, embedded on tangible media, for requesting settlement of business transactions related to goods and services associated with a customer invoice using a request;

a first memory storing a user interface controller executable by the at least one processor and for processing the request and involving a message including a message package derived from a common business object model, where the common business object model includes business objects having relationships that enable derivation of message-based service interfaces and message packages, the message package hierarchically organized as:

a customer invoice request message entity; and a customer invoice request package comprising a customer invoice request entity, a business process variant package, an item package, where the customer invoice request entity includes a base business transaction document ID and a base business document type code, where the business process variant package includes at least one business process variant type entity, each business process variant type entity including a business process variant type code and a main indicator, and where the item package includes at least one item entity, each item entity including a base business transaction document item ID, a base business transaction document item type code, and a receivables property movement direction code; and a second memory, remote from the graphical user interface, storing a plurality of message-based service interfaces executable by the at least one processor and derived from the common business object model to provide consistent semantics with messages derived from the common business object model, where one of the message-based service interfaces processes the message according to the hierarchical organization of the message package, where processing the message includes unpacking the first message package based on the common business object model.

4. The distributed system of claim 3, wherein the first memory is remote from the graphical user interface.

5. The distributed system of claim 3, wherein the first memory is remote from the second memory.

6. A tangible, non-transitory computer readable medium including program code for providing a message-based interface for exchanging information regarding trade receivables and payables from goods and services of a company to and from its business partners, the program code operable when executed by a processor to perform one or more operations, the operations comprising:

receiving via a message-based interface derived from a common business object model, where the common business object model includes business objects having relationships that enable derivation of message-based interfaces and message packages, the message-based interface exposing at least one service as defined in a service registry and from a heterogeneous application executing in an environment of computer systems providing message-based services, a first message for providing notification of receivables or payables from or to a business partner for a business transaction within goods and services that includes a first message package derived from the common business object model and hierarchically organized in memory as:

a receivables payables notification message entity; and a receivables payables package comprising a receivables payables entity and an item package, where the receivables payables entity includes a base business transaction document reference, a cancelled business transaction document reference, and a company ID, and where the item package includes a tax receivables payables register item entity; and processing the first message according to the hierarchical organization of the first message package, where processing the first message includes unpacking the first message package based on the common business object model; and sending a second message to the heterogeneous application responsive to the first message, where the second message includes a second message package derived from the common business object model to provide consistent semantics with the first message package.

7. The tangible, non-transitory computer readable medium of claim 6, wherein the customer invoice request package further comprises at least one of the following: a party package, a location package, a sales and service business area package, a delivery information package, a payment information package, a price information package, an attachment folder package, and a text collection package.

8. A distributed system operating in a landscape of computer systems providing message-based services defined in a service registry, the system comprising:

at least one processor operable to execute computer readable instructions embodied on non-transitory media;

a graphical user interface executable by the at least one processor and comprising computer readable instructions, embedded on tangible media, for providing notification of receivables or payables from or to a business partner for a business transaction within goods and services using a request;

a first memory storing a user interface controller executable by the at least one processor and for processing the request and involving a message including a message package derived from a common business object model, where the common business object model includes business objects having relationships that enable derivation of message-based service interfaces and message packages, the message package hierarchically organized as:

a receivables payables notification message entity; and a receivables payables package comprising a receivables payables entity and an item package, where the receivables payables entity includes a base business transaction document reference, a cancelled business transaction document reference, and a company ID, and where the item package includes a tax receivables payables register item entity; and a second memory, remote from the graphical user interface, storing a plurality of message-based service interfaces executable by the at least one processor and derived from the common business object model to provide consistent semantics with messages derived from the common business object model, where one of the message-based service interfaces processes the message according to the hierarchical organization of the message package, where processing the message includes unpacking the first message package based on the common business object model.

9. The distributed system of claim 8, wherein the first memory is remote from the graphical user interface.

10. The distributed system of claim 8, wherein the first memory is remote from the second memory.

11. A tangible, non-transitory computer readable medium including program code for providing a message-based interface for exchanging information regarding demand from a creditor company to a debtor business partner for payment, the program code operable when executed by a processor to perform one or more operations, the operations comprising:

receiving via a message-based interface derived from a common business object model, where the common business object model includes business objects having relationships that enable derivation of message-based interfaces and message packages, the message-based interface exposing at least one service as defined in a service registry and from a heterogeneous application executing in an environment of computer systems providing message-based services, a first message for notifying the debtor business partner of a reminder or demand for payment that includes a first message package derived from the common business object model and hierarchically organized in memory as:

a form dunning notification message entity; and a dunning package comprising a dunning entity and a dunning item package, where the dunning entity includes a company formatted address, a business partner formatted address, a document date, and a business partner internal ID, where the dunning item package includes at least one dunning item entity, where each dunning item entity includes a base business transaction document reference, a base business transaction document date, a due item type code, a dunning level value, a base business transaction document amount, an open item amount, a dunning notice legally effective indicator, a due date, and a days overdue total number value; and processing the first message according to the hierarchical organization of the first message package, where processing the first message includes unpacking the first message package based on the common business object model; and sending a second message to the heterogeneous application responsive to the first message, where the second message includes a second message package derived from the common business object model to provide consistent semantics with the first message package.

12. A distributed system operating in a landscape of computer systems providing message-based services defined in a service registry, the system comprising:

at least one processor operable to execute computer readable instructions embodied on non-transitory media;

a graphical user interface executable by the at least one processor and comprising computer readable instructions, embedded on tangible media, for notifying the debtor business partner of a reminder or demand for payment using a request;

a first memory storing a user interface controller executable by the at least one processor and for processing the request and involving a message including a message package derived from a common business object model, where the common business object model includes business objects having relationships that enable derivation of message-based service interfaces and message packages, the message package hierarchically organized as:

a form dunning notification message entity; and a dunning package comprising a dunning entity and a dunning item package, where the dunning entity includes a company formatted address, a business partner formatted address, a document date, and a business partner internal ID, where the dunning item package includes at least one dunning item entity, where each dunning item entity includes a base business transaction document reference, a base business transaction document date, a due item type code, a dunning level value, a base business transaction document amount, an open item amount, a dunning notice legally effective indicator, a due date, and a days overdue total number value; and a second memory, remote from the graphical user interface, storing a plurality of message-based service interfaces executable by the at least one processor and derived from the common business object model to provide consistent semantics with messages derived from the common business object model, where one of the message-based service interfaces processes the message according to the hierarchical organization of the message package, where processing the message includes unpacking the first message package based on the common business object model.

13. The distributed system of claim 12, wherein the first memory is remote from the graphical user interface.

14. The distributed system of claim 12, wherein the first memory is remote from the second memory.

15. A tangible, non-transitory computer readable medium including program code for providing a message-based interface for exchanging information regarding records of accounting documents grouped by period and formatted as stipulated by legal authorities, the program code operable when executed by a processor to perform one or more operations, the operations comprising:

receiving via a message-based interface derived from a common business object model, where the common business object model includes business objects having relationships that enable derivation of message-based interfaces and message packages, the message-based interface exposing at least one service as defined in a service registry and from a heterogeneous application executing in an environment of computer systems providing message-based services, a first message for requesting an accounting document report listing accounting documents grouped by period and formatted as required by legal authorities that includes a first message package derived from the common business object model and hierarchically organized in memory as:

a form accounting document report request message entity; and a form accounting document report package comprising a form accounting document report entity, where the form accounting document report entity includes an accounting document report output format code, a company ID, and an organization name; and processing the first message according to the hierarchical organization of the first message package, where processing the first message includes unpacking the first message package based on the common business object model; and sending a second message to the heterogeneous application responsive to the first message, where the second message includes a second message package derived from the common business object model to provide consistent semantics with the first message package.

16. The tangible, non-transitory computer readable medium of claim 15, wherein the form accounting document report package further includes at least one of the following: a selection package, a description package, and a period total package, where the selection package includes a selection entity, where the description package includes at least one description entity, and where the period total package includes at least one period total entity.

17. A distributed system operating in a landscape of computer systems providing message-based services defined in a service registry, the system comprising:

at least one processor operable to execute computer readable instructions embodied on non-transitory media;

a graphical user interface executable by the at least one processor and comprising computer readable instructions, embedded on tangible media, for requesting an accounting document report listing accounting documents grouped by period and formatted as required by legal authorities using a request;

a first memory storing a user interface controller executable by the at least one processor and for processing the request and involving a message including a message package derived from a common business object model, where the common business object model includes business objects having relationships that enable derivation of message-based service interfaces and message packages, the message package hierarchically organized as:

a form accounting document report request message entity; and a form accounting document report package comprising a form accounting document report entity, where the form accounting document report entity includes an accounting document report output format code, a company ID, and an organization name; and a second memory, remote from the graphical user interface, storing a plurality of message-based service interfaces executable by the at least one processor and derived from the common business object model to provide consistent semantics with messages derived from the common business object model, where one of the message-based service interfaces processes the message according to the hierarchical organization of the message package, where processing the message includes unpacking the first message package based on the common business object model.

18. The distributed system of claim 17, wherein the first memory is remote from the graphical user interface.

19. The distributed system of claim 17, wherein the first memory is remote from the second memory.

20. A tangible, non-transitory computer readable medium including program code for providing a message-based interface for exchanging information regarding balances of a general ledger which are to be migrated from a legacy system to a new enterprise resource management (ERP) system, the program code operable when executed by a processor to perform one or more operations, the operations comprising:

receiving via a message-based interface derived from a common business object model, where the common business object model includes business objects having relationships that enable derivation of message-based interfaces and message packages, the message-based interface exposing at least one service as defined in a service registry and from a heterogeneous application executing in an environment of computer systems providing message-based services, a first message for requesting conversion of information about balances of a general ledger which are to be migrated from a legacy system to a new ERP system into an accounting entry that includes a first message package derived from the common business object model and hierarchically organized in memory as:

an accounting account balance migrate request message entity; and an accounting account balance migrate request package comprising an accounting account balance migrate request entity and an item package, where the accounting account balance migrate request entity includes a company ID and a posting date, and where the item package includes at least one item entity, where each item entity includes a chart of accounts item code and a local currency amount; and processing the first message according to the hierarchical organization of the first message package, where processing the first message includes unpacking the first message package based on the common business object model; and sending a second message to the heterogeneous application responsive to the first message, where the second message includes a second message package derived from the common business object model to provide consistent semantics with the first message package.

21. The tangible, non-transitory computer readable medium of claim 20, wherein each item entity further includes at least one of the following: a general ledger movement type code, a segment ID, a profit center ID, a project reference, a project task reference, a cost center ID, an expense classification functional area code, a partner company ID, a partner segment ID, a partner profit center ID, a note, a set of books currency amount, a hard currency amount, a line item currency amount, an index based currency amount, a quantity, and a quantity type code.

22. A distributed system operating in a landscape of computer systems providing message-based services defined in a service registry, the system comprising:

at least one processor operable to execute computer readable instructions embodied on non-transitory media;

a graphical user interface executable by the at least one processor and comprising computer readable instructions, embedded on tangible media, for requesting conversion of information about balances of a general ledger which are to be migrated from a legacy system to a new enterprise resource management (ERP) system into an accounting entry using a request;

a first memory storing a user interface controller executable by the at least one processor and for processing the request and involving a message including a message package derived from a common business object model, where the common business object model includes business objects having relationships that enable derivation of message-based service interfaces and message packages, the message package hierarchically organized as:

an accounting account balance migrate request message entity; and an accounting account balance migrate request package comprising an accounting account balance migrate request entity and an item package, where the accounting account balance migrate request entity includes a company ID and a posting date, and where the item package includes at least one item entity, where each item entity includes a chart of accounts item code and a local currency amount; and a second memory, remote from the graphical user interface, storing a plurality of message-based service interfaces executable by the at least one processor and derived from the common business object model to provide consistent semantics with messages derived from the common business object model, where one of the message-based service interfaces processes the message according to the hierarchical organization of the message package, where processing the message includes unpacking the first message package based on the common business object model.

23. The distributed system of claim 22, wherein the first memory is remote from the graphical user interface.

24. The distributed system of claim 22, wherein the first memory is remote from the second memory.

25. A tangible, non-transitory computer readable medium including program code for providing a message-based interface for exchanging information regarding at least one entry with main information on banks from within a classified directory of banks, the program code operable when executed by a processor to perform one or more operations, the operations comprising:

receiving via a message-based interface derived from a common business object model, where the common business object model includes business objects having relationships that enable derivation of message-based interfaces and message packages, the message-based interface exposing at least one service as defined in a service registry and from a heterogeneous application executing in an environment of computer systems providing message-based services, a first message for requesting transmission of bank directory entries from an external provider, the bank directory entries comprising entries with information on banks from within a classified directory of banks that includes a first message package derived from the common business object model and hierarchically organized in memory as:

a bank directory transmission request message entity; and a bank directory entry package comprising a bank directory entry entity, a national bank identification package, and an address package, where the bank directory entry entity includes a country code and a bank catalogue ID, where the national bank identification package includes at least one national bank identification entity, where each national bank identification entity includes a bank routing ID and a bank routing ID type code, and where the address package includes an address entity; and processing the first message according to the hierarchical organization of the first message package, where processing the first message includes unpacking the first message package based on the common business object model; and sending a second message to the heterogeneous application responsive to the first message, where the second message includes a second message package derived from the common business object model to provide consistent semantics with the first message package.

26. The tangible, non-transitory computer readable medium of claim 25, wherein the bank directory entry further includes at least one of the following: a bank standard ID, a bank account ID check digit calculation method code, a deleted indicator, and a validity period.

27. A distributed system operating in a landscape of computer systems providing message-based services defined in a service registry, the system comprising:

at least one processor operable to execute computer readable instructions embodied on non-transitory media;

a graphical user interface executable by the at least one processor and comprising computer readable instructions, embedded on tangible media, for requesting transmission of bank directory entries from an external provider, the bank directory entries comprising entries with information on banks from within a classified directory of banks using a request;

a first memory storing a user interface controller executable by the at least one processor and for processing the request and involving a message including a message package derived from a common business object model, where the common business object model includes business objects having relationships that enable derivation of message-based service interfaces and message packages, the message package hierarchically organized as:

a bank directory transmission response message entity; and a bank directory entry package comprising a bank directory entry entity, a national bank identification package, and an address package, where the bank directory entry entity includes a country code and a bank catalogue ID, where the national bank identification package includes at least one national bank identification entity, where each national bank identification entity includes a bank routing ID and a bank routing ID type code, and where the address package includes an address entity; and a second memory, remote from the graphical user interface, storing a plurality of message-based service interfaces executable by the at least one processor and derived from the common business object model to provide consistent semantics with messages derived from the common business object model, where one of the message-based service interfaces processes the message according to the hierarchical organization of the message package, where processing the message includes unpacking the first message package based on the common business object model.

28. The distributed system of claim 27, wherein the first memory is remote from the graphical user interface.

29. The distributed system of claim 27, wherein the first memory is remote from the second memory.

30. A tangible, non-transitory computer readable medium including program code for providing a message-based interface for exchanging information regarding a forecast of the medium- to long-term development of the liquidity situation of a company or a group of companies, the program code operable when executed by a processor to perform one or more operations, the operations comprising:

receiving via a message-based interface derived from a common business object model, where the common business object model includes business objects having relationships that enable derivation of message-based interfaces and message packages, the message-based interface exposing at least one service as defined in a service registry and from a heterogeneous application executing in an environment of computer systems providing message-based services, a first message for requesting data associated with a liquidity forecast comprised of realized and expected inflows or outflows of liquidity for a company that includes a first message package derived from the common business object model and hierarchically organized in memory as:

a liquidity information request message entity; and a liquidity information package comprising a liquidity information entity, where the liquidity information entity includes a liquidity forecast profile code; and processing the first message according to the hierarchical organization of the first message package, where processing the first message includes unpacking the first message package based on the common business object model; and sending a second message to the heterogeneous application responsive to the first message, where the second message includes a second message package derived from the common business object model to provide consistent semantics with the first message package.

31. The tangible, non-transitory computer readable medium of claim 30, wherein the liquidity information package further includes at least one of the following: a liquidity status item package comprising at least one item entity, where each item entity includes a business transaction document reference, a process component code, a company ID, a liquidity item group code, a liquidity item operational process category code, a liquidity item business transaction document status category code, a transaction currency amount, and a value date time.

32. A distributed system operating in a landscape of computer systems providing message-based services defined in a service registry, the system comprising:

at least one processor operable to execute computer readable instructions embodied on non-transitory media;

a graphical user interface executable by the at least one processor and comprising computer readable instructions, embedded on tangible media, for requesting data associated with a liquidity forecast comprised of realized and expected inflows or outflows of liquidity for a company using a request;

a first memory storing a user interface controller executable by the at least one processor and for processing the request and involving a message including a message package derived from a common business object model, where the common business object model includes business objects having relationships that enable derivation of message-based service interfaces and message packages, the message package hierarchically organized as:

a liquidity information request message entity; and a liquidity information package comprising a liquidity information entity, where the liquidity information entity includes a liquidity forecast profile code; and a second memory, remote from the graphical user interface, storing a plurality of message-based service interfaces executable by the at least one processor and derived from the common business object model to provide consistent semantics with messages derived from the common business object model, where one of the message-based service interfaces processes the message according to the hierarchical organization of the message package, where processing the message includes unpacking the first message package based on the common business object model.

33. The distributed system of claim 32, wherein the first memory is remote from the graphical user interface.

34. The distributed system of claim 32, wherein the first memory is remote from the second memory.

35. A tangible, non-transitory computer readable medium including program code for providing a message-based interface for exchanging information regarding a set of rules governing employee compensation, the program code operable when executed by a processor to perform one or more operations, the operations comprising:

receiving via a message-based interface derived from a common business object model, where the common business object model includes business objects having relationships that enable derivation of message-based interfaces and message packages, the message-based interface exposing at least one service as defined in a service registry and from a heterogeneous application executing in an environment of computer systems providing message-based services, a first message for notifying payroll processing regarding relevant changes and additions in an employee compensation agreement that includes a first message package derived from the common business object model and hierarchically organized in memory as:

an employee compensation agreement payroll notification message entity; and an employee compensation agreement package comprising an employee compensation agreement entity and an item package, where the employee compensation agreement entity includes a UUID and an employee UUID, and where the item package includes at least one item entity, each item entity including a UUID and an item compensation component entity; and processing the first message according to the hierarchical organization of the first message package, where processing the first message includes unpacking the first message package based on the common business object model; and sending a second message to the heterogeneous application responsive to the first message, where the second message includes a second message package derived from the common business object model to provide consistent semantics with the first message package.

36. The tangible, non-transitory computer readable medium of claim 35, wherein each item entity information package further includes at least one of the following: an employment UUID, and a work agreement UUID.

37. A distributed system operating in a landscape of computer systems providing message-based services defined in a service registry, the system comprising:

at least one processor operable to execute computer readable instructions embodied on non-transitory media;

a graphical user interface executable by the at least one processor and comprising computer readable instructions, embedded on tangible media, for notifying payroll processing regarding relevant changes and additions in an employee compensation agreement using a request;

a first memory storing a user interface controller executable by the at least one processor and for processing the request and involving a message including a message package derived from a common business object model, where the common business object model includes business objects having relationships that enable derivation of message-based service interfaces and message packages, the message package hierarchically organized as:

an employee compensation agreement payroll notification message entity; and an employee compensation agreement package comprising an employee compensation agreement entity and an item package, where the employee compensation agreement entity includes a UUID and an employee UUID, and where the item package includes at least one item entity, each item entity including a UUID and an item compensation component entity; and a second memory, remote from the graphical user interface, storing a plurality of message-based service interfaces executable by the at least one processor and derived from the common business object model to provide consistent semantics with messages derived from the common business object model, where one of the message-based service interfaces processes the message according to the hierarchical organization of the message package, where processing the message includes unpacking the first message package based on the common business object model.

38. The distributed system of claim 37, wherein the first memory is remote from the graphical user interface.

39. A tangible, non-transitory computer readable medium including program code for providing a message-based interface for exchanging information regarding notifications to an accounting component regarding at least one business transaction documented in an operational document, the program code operable when executed by a processor to perform one or more operations, the operations comprising:

receiving via a message-based interface derived from a common business object model, where the common business object model includes business objects having relationships that enable derivation of message-based interfaces and message packages, the message-based interface exposing at least one service as defined in a service registry and from a heterogeneous application executing in an environment of computer systems providing message-based services, a first message for notifying the accounting component of accounting-relevant data received from a production component regarding production lots that includes a first message package derived from the common business object model and hierarchically organized in memory as:

a production lot accounting notification message entity; and a production lot accounting notification package comprising a production lot accounting notification entity and an expected material output package, where the production accounting notification entity includes a production lot ID, a life cycle status, a status change time date, a company, and a production center, and where the expected material output package includes at least one expected material output entity; and processing the first message according to the hierarchical organization of the first message package, where processing the first message includes unpacking the first message package based on the common business object model; and sending a second message to the heterogeneous application responsive to the first message, where the second message includes a second message package derived from the common business object model to provide consistent semantics with the first message package.

40. The tangible, non-transitory computer readable medium of claim 39, wherein each of the expected material output entities further include at least one of the following: a material role code, a permanent establishment ID, a material ID, and an expected quantity.

41. A distributed system operating in a landscape of computer systems providing message-based services defined in a service registry, the system comprising:

at least one processor operable to execute computer readable instructions embodied on non-transitory media;

a graphical user interface executable by the at least one processor and comprising computer readable instructions, embedded on tangible media, for notifying an accounting component of accounting-relevant data received from a production component regarding production lots using a request;

a first memory storing a user interface controller executable by the at least one processor and for processing the request and involving a message including a message package derived from a common business object model, where the common business object model includes business objects having relationships that enable derivation of message-based service interfaces and message packages, the message package hierarchically organized as:

a production lot accounting notification message entity; and a production lot accounting notification package comprising a production lot accounting notification entity and an expected material output package, where the production accounting notification entity includes a production lot ID, a life cycle status, a status change time date, a company, and a production center, and where the expected material output package includes at least one expected material output entity; and a second memory, remote from the graphical user interface, storing a plurality of message-based service interfaces executable by the at least one processor and derived from the common business object model to provide consistent semantics with messages derived from the common business object model, where one of the message-based service interfaces processes the message according to the hierarchical organization of the message package, where processing the message includes unpacking the first message package based on the common business object model.

42. A tangible, non-transitory computer readable medium including program code for providing a message-based interface for exchanging information regarding demand forecasts for materials in a particular supply planning area, the program code operable when executed by a processor to perform one or more operations, the operations comprising:

receiving via a message-based interface derived from a common business object model, where the common business object model includes business objects having relationships that enable derivation of message-based interfaces and message packages, the message-based interface exposing at least one service as defined in a service registry and from a heterogeneous application executing in an environment of computer systems providing message-based services, a first message for transmitting a notification regarding new or changed demand forecasts for a material that includes a first message package derived from the common business object model and hierarchically organized in memory as:

a demand forecast notification message entity; and a demand forecast package comprising a demand forecast entity and a product entity, where the product package includes a product entity, and where the product entity includes an internal ID; and processing the first message according to the hierarchical organization of the first message package, where processing the first message includes unpacking the first message package based on the common business object model; and sending a second message to the heterogeneous application responsive to the first message, where the second message includes a second message package derived from the common business object model to provide consistent semantics with the first message package.

43. The tangible, non-transitory computer readable medium of claim 42, wherein the demand forecast package further includes at least one of the following: a location package and an item package, where the location package includes a ship from location, and where the item package includes at least one item entity, where each item entity includes a forecast period, a forecast quantity, and a forecast quantity type code.

44. A distributed system operating in a landscape of computer systems providing message-based services defined in a service registry, the system comprising:

at least one processor operable to execute computer readable instructions embodied on non-transitory media;

a graphical user interface executable by the at least one processor and comprising computer readable instructions, embedded on tangible media, for transmitting a notification regarding new or changed demand forecasts for a material in a particular supply planning area using a request;

a first memory storing a user interface controller executable by the at least one processor and for processing the request and involving a message including a message package derived from a common business object model, where the common business object model includes business objects having relationships that enable derivation of message-based service interfaces and message packages, the message package hierarchically organized as:

a demand forecast notification message entity; and a demand forecast package comprising a demand forecast entity and a product entity, where the product package includes a product entity, and where the product entity includes an internal ID; and a second memory, remote from the graphical user interface, storing a plurality of message-based service interfaces executable by the at least one processor and derived from the common business object model to provide consistent semantics with messages derived from the common business object model, where one of the message-based service interfaces processes the message according to the hierarchical organization of the message package, where processing the message includes unpacking the first message package based on the common business object model.

* * * * *